US005701139A

United States Patent [19]

Weinbaum et al.

[11] Patent Number: 5,701,139

[45] Date of Patent: Dec. 23, 1997

[54] SYSTEM FOR TRACKING AND REPLICATING THE OPERATION OF A CURSOR MANIPULATION DEVICE

[75] Inventors: David Weinbaum, Tel Aviv; Daniel Bar-On, Kiryat Ono; Yoav Tamir, Ra'anana, all of Israel

[73] Assignee: Mercury Interactive Corporation, Los Altos Hills, Calif.

[21] Appl. No.: 485,050

[22] Filed: Jun. 6, 1995

Related U.S. Application Data

[62] Division of Ser. No. 298,357, Aug. 30, 1994, Pat. No. 5,511,185, which is a continuation of Ser. No. 690,878, Apr. 23, 1991, abandoned, which is a continuation-in-part of Ser. No. 618,742, Nov. 27, 1990, abandoned.

[51] Int. Cl.[6] .......... G09G 5/08

[52] U.S. Cl. .......... 345/145

[58] Field of Search .......... 345/145, 146; 371/21.1, 21.2, 21.5, 71; 364/516, 517, 410; 434/47, 65, 273; 395/152; 273/434, 437; 382/103; 348/169; 463/31

[56] References Cited

U.S. PATENT DOCUMENTS

| | | | |
|---|---|---|---|
| 4,696,003 | 9/1987 | Kerr | 371/19 |
| 4,763,288 | 8/1988 | Deering | 371/23 |
| 4,819,233 | 4/1989 | Delucia | 371/19 |
| 4,929,889 | 5/1990 | Seiler | 371/25.1 |
| 4,958,345 | 9/1990 | Fujisaka | 371/213 |
| 5,022,028 | 6/1991 | Edmonds | 371/25.1 |
| 5,126,990 | 6/1992 | Efron . | |
| 5,157,782 | 10/1992 | Tuttle | 395/575 |
| 5,218,605 | 6/1993 | Low | 371/161 |
| 5,233,611 | 8/1993 | Triantafyllos | 371/16.1 |
| 5,261,820 | 11/1993 | Slye et al. | 273/434 |

*Primary Examiner*—Jeffery Brier
*Attorney, Agent, or Firm*—Ladas & Parry

[57] ABSTRACT

A system for tracking and replicating the operation of a cursor manipulation device in a computer system is disclosed, wherein the computer system includes a monitor and a cursor manipulation device having an icon representing the location of a cursor on the monitor. The system for tracking and replicating includes recording apparatus for capturing a plurality of data points transmitted by the cursor manipulation device and a first multiplicity of events on the monitor. The datapoints and the events on the monitor occur while the icon travels between a first location and a second location on the monitor and the recording apparatus is also operative to identify the first and second locations. The system also includes apparatus for replicating the movement of the icon which includes apparatus for replaying the data points, apparatus for identifying a third location of the icon on the screen as a result of the replay of the data points and apparatus for causing the icon to move from the third location to the second location, if the third location is not generally identical to the second location.

32 Claims, 54 Drawing Sheets

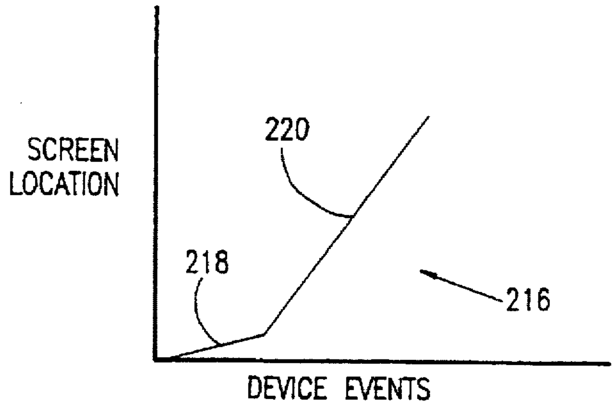
FIG.13
FIG.15A
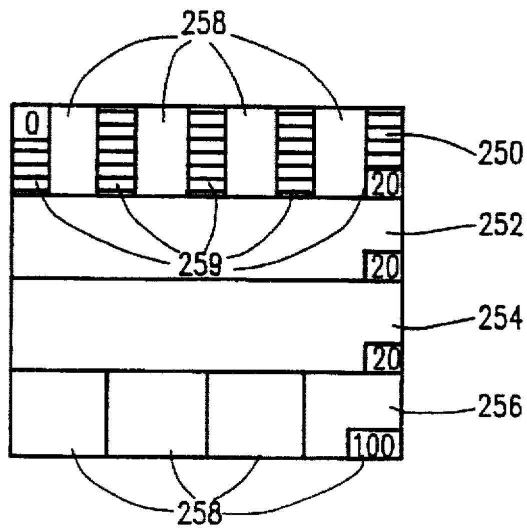
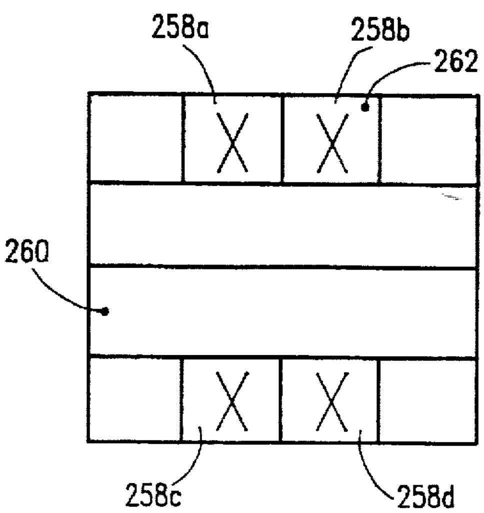
FIG.15B
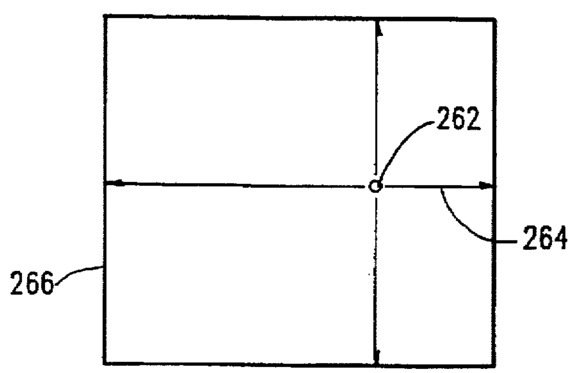
FIG.16

SYSTEM FOR TRACKING AND REPLICATING THE OPERATION OF A CURSOR MANIPULATION DEVICE

This is a divisional of application Ser. No. 08/298,357 filed on Aug. 30, 1994 now U.S. Pat. No. 5,511,185 which is a continuation of Ser. No. 07/690,878 filed on Apr. 23, 1991 (now abandoned) which is a continuation-in-part of Ser. No. 07/618,742 filed on Nov. 27, 1990 (now abandoned).

FIELD OF THE INVENTION

The present invention relates to automatic testing systems for computer systems generally and in particular to testing of computer systems and applications utilizing cursor manipulators.

BACKGROUND OF THE INVENTION

There exist various test execution systems having the capability of recording and replaying input sequences to a system under test and comparing test results to a predefined captured ensemble.

The existing systems may be classified as either intrusive or non-intrusive. Most of the prior art systems are intrusive, in the sense that they employ resources of the system under test, such as CPU time, memory space and various device services. Some examples of such systems are:

Autotester, commercially available from Software Recording Corporation of Dallas, Tex.;

Check*Mate, commercially available from Cinnabar Software, a KMW Systems Company, of Austin, Tex.;

CapBak and SMARTS, both commercially available from Software Research, Inc. of San Francisco, Calif.;

TRAPS, commercially available from TravTech, Inc. of Hartford, Conn.; and

BLOODHOUND, commercially available from Goldbrick Software, of Fullerton, Calif.

A non-intrusive system also exists and is known as the "Evaluator" system and is commercially available from Elverex Ltd. of Limerick, Ireland.

None of the existing systems, whether intrusive or non-intrusive, samples raw frame buffer data. None of the existing systems is universal in that it can be used with any computer system.

It is desired, in computer systems testing applications, to be able to replicate a series of events which occurs during operation of a cursor manipulation device, such as a mouse or computerized stylus, in conjunction with a Central Processing Unit (CPU) and a monitor. In such a system, the location of the device with respect to the monitor is marked on the screen by a cursor or an icon.

Cursor manipulation devices can have absolute positioning or relative positioning where absolute positioning devices provide the precise coordinates of the location of the device and relative positioning devices provide the change in the location of the device. A mouse device typically utilizes relative positioning; computerized styluses typically utilize absolute positioning. For relative positioning devices, the entirety of the data is necessary to know exactly where the device is located.

The data from the device, herein termed "device events" can easily be stored and replayed. However, as is known in the art, due to a non-deterministic loss of device events, simply replaying the device events will not reliably repeat the motion of the icon on the screen. (i.e. the icon will not return to the same location on the screen). The loss typically occurs because recovery operations can occur at any point, and thus, the application software ignores part of the datastream from the cursor manipulation device when the software is occupied with other activities.

Some prior art systems ignore the abovementioned problem and simply replay the device events received from the mouse. Others attempt to solve the problem by assuming that the loss ocurred between the CPU and the application and therefore, record the device events received from the mouse and transmitted between the CPU and the application. However, since the application itself ignores some of the device events, this solution still does not produce completely reliable responses.

The "Evaluator" is one such testing system which attempts to track and replicate mouse action.

SUMMARY OF THE INVENTION

The present invention seeks to provide an improved system for carrying out automatic testing of computer software, including regression testing.

There is thus provided in accordance with a preferred embodiment of the present invention a system for automatic testing of computer software including interface apparatus communicating with a computer system under test, memory apparatus for storing inputs to be supplied to the system under test via the interface apparatus and for storing expected outputs to be received from the system under test via the interface apparatus in response to the inputs and comparison apparatus for indicating differences between the expected outputs and actual outputs and wherein the interface apparatus includes apparatus for sampling the contents of the frame buffer of the system under test.

There is also provided in accordance with a preferred embodiment of the present invention a system for automatic testing of computer software including interface apparatus communicating with a computer system under test, memory apparatus for storing inputs to be supplied to the system under test via the interface apparatus and for storing expected outputs to be received from the system under test via the interface apparatus in response to the inputs and comparison apparatus for indicating differences between the expected outputs and actual outputs.

There is also provided, in accordance with an embodiment of the present invention, a method for automatic testing of computer software including the steps of communicating via interface apparatus with a system under test loaded with software to be tested, storing inputs to be supplied to the system under test via the interface apparatus and storing expected outputs to be received from the system under test via the interface apparatus in response to the inputs and indicating differences between the expected outputs and actual outputs.

There is further provided, in accordance with the present invention, a method for automatic testing of computer software including the steps of communicating via interface apparatus with a system under test loaded with software to be tested, storing inputs to be supplied to the system under test via the interface apparatus and storing expected outputs to be received from the system under test via the interface apparatus in response to the inputs and indicating differences between the expected outputs and actual outputs by comparing the expected and actual frame buffer contents of the system under test.

Some of the principal features of a preferred embodiment of the present invention are summarized hereinbelow:

Sampling real pixel values from the frame buffer of the system under test;

Performing comparisons and other operations on frame buffer contents in real time;

Using screen signatures for comparisons;

Capability for incremental error counting;

Screen stability detection;

Determination of minimum response time of system under test to given commands;

Hardware supported object recognition capability;

Simultaneous monitoring of multiple objects on a screen;

Ability to provide conditional testing;

Fast discrimination between similar objects; and

Capability to respond to asynchronous events.

There is also provided, in accordance with an embodiment of the present invention, a system for tracking and replicating the operation of a cursor manipulation device in a computer system, the computer system including a monitor and a cursor manipulation device having an icon representing the location of a cursor on the monitor. The system for tracking and replicating includes recording apparatus for capturing a plurality of data points transmitted by the cursor manipulation device and a first multiplicity of events on the monitor, the datapoints and the events on the monitor occurring while the icon travels between a first location and a second location on the monitor, the recording apparatus also being operative to identify the first and second locations and apparatus for replicating the movement of the icon which includes apparatus for replaying the data points, apparatus for identifying a third location of the icon on the screen as a result of the replay of the data points and apparatus for causing the icon to move from the third location to the second location, if the third location is not generally identical to the second location.

There is further provided, in accordance with an embodiment of the present invention, a system for tracking and replicating the operation of a cursor manipulation device in a computer system, the computer system including a monitor and a cursor manipulation device having an icon representing the location of a cursor on the monitor. The system for tracking and replicating includes capture apparatus for capturing a plurality of data points transmitted by the cursor manipulation device and a first multiplicity of events on the monitor, the datapoints and the events on the monitor occurring while the icon travels between a first location and a second location on the monitor, identification apparatus, utilizing the first multiplicity of events, for identifying at least the first and second locations, replaying apparatus for replaying the captured data points to cause the icon to travel between the first and a third location and for capturing a second multiplicity of events on the monitor and feedback apparatus for causing the icon to travel between the third location and the second location.

Additionally, there is provided, in accordance with an embodiment of the present invention, a system for tracking the operation of a cursor manipulation device in a computer system, the computer system including a monitor and a cursor manipulation device having an icon representing the location of a cursor on the monitor. The system for tracking includes capture apparatus for capturing a plurality of data points transmitted by the cursor manipulation device and a first multiplicity of events on the monitor, the datapoints and the events on the monitor occurring while the icon travels between a first location and a second location on the monitor and identification apparatus, utilizing the first multiplicity of events, for identifying at least the first and second locations.

Further, in accordance with an embodiment of the present invention, the cursor manipulation device is a relative movement device. Alternatively, it is an absolute pointing device.

Still further, in accordance with an embodiment of the present invention, the apparatus for identifying utilizes an estimated location of the icon and an output to the screen.

Moreover, in accordance with an embodiment of the present invention, the apparatus for identifying include apparatus for preparing to identify operative while the icon travels between the first location to the second location and apparatus for performing the identification operative once the icon arrives at the second location.

Additionally, in accordance with an embodiment of the present invention, the first and second locations are track terminators.

Furthermore, in accordance with an embodiment of the present invention, the apparatus for identifying includes apparatus for actively searching the output to the screen.

Still further, in accordance with an embodiment of the present invention, the feedback apparatus includes apparatus for providing artificial cursor manipulation data points corresponding to the distance between the second and third locations.

Additionally, in accordance with an embodiment of the present invention, the system includes apparatus for learning shape characteristics of an icon. The apparatus for learning shape characteristics of an icon also includes apparatus for identifying the location of a hotpoint of the icon.

There is also provided, in accordance with an embodiment of the present invention, a method for tracking and replicating the operation of a cursor manipulation device in a computer system, the computer system including a monitor and a cursor manipulation device having an icon representing the location of a cursor on the monitor. The method includes the steps of capturing a plurality of data points transmitted by the cursor manipulation device and a first multiplicity of events on the monitor, the datapoints and the events on the monitor occurring while the icon travels between a first location and a second location on the monitor, and identifying the first and second locations and replicating the movement of the icon. The step of identifying includes the steps of replaying the data points, identifying a third location of the icon on the screen as a result of the replay of the data points and causing the icon to move from the third location to the second location, if the third location is not generally identical to the second location.

There is further provided, a method for tracking and replicating the operation of a cursor-manipulation device in a computer system, the computer system comprising a monitor and a cursor manipulation device having an icon representing the location of a cursor on the monitor. The method for tracking and replicating includes the steps of capturing a plurality of data points transmitted by the cursor manipulation device and a first multiplicity of events on the monitor, the datapoints and the events on the monitor occurring while the icon travels between a first location and a second location on the monitor, identifying at least the first and second locations by utilizing the first multiplicity of events, replaying the captured data points to cause the icon to travel between the first and a third location, capturing a second multiplicity of events on the monitor, and artificially causing the icon to travel between the third location and the second location.

Finally, there is provided, in accordance with an embodiment of the present invention, a method for tracking the operation of a cursor manipulation device in a computer system, the computer system comprising a monitor and a cursor manipulation device having an icon representing the location of a cursor on the monitor. The method for tracking includes the steps of capturing a plurality of data points transmitted by the cursor manipulation device and a first multiplicity of events on the monitor, the datapoints and the events on the monitor occurring while the icon travels between a first location and a second location on the monitor and identifying at least the first and second locations by utilizing the first multiplicity of events.

BRIEF DESCRIPTION OF THE DRAWINGS

The present invention will be understood and appreciated more fully from the following detailed description, taken in conjunction with the drawings in which:

FIG. 12A illustrates the recording operation and FIG. 12B illustrates the repeating operation;

FIG. 13 is a graphical illustration of a functional relationship between a cursor manipulation device and locations on a monitor;

FIGS. 15A and 15B are illustrations of block operations on a frame of an image useful in understanding the calculations of the flow chart of FIG. 14B;

FIG. 16 is an illustration of the limits of a passive search algorithm of FIG. 14B;

BRIEF DESCRIPTION OF THE ANNEXES

Annex A is a listing of firmwear of elements of FIG. 4 (contents of PALS)

Annex B is a listing of firmwear of I/O processor (contents of PALS)

Annex C is a listing of the contents of I/O processor's Eprom of FIG. 10, component 5

Annex D describes an installation, environment and operating instructions for object code of Annex E.

Annex E is a preferred object code for implementing the apparatus and method of the present invention.

Annex F describes the operations of graphic processor 30 in Psuedocode format.

DETAILED DESCRIPTION OF A PREFERRED EMBODIMENT

Figure 1:
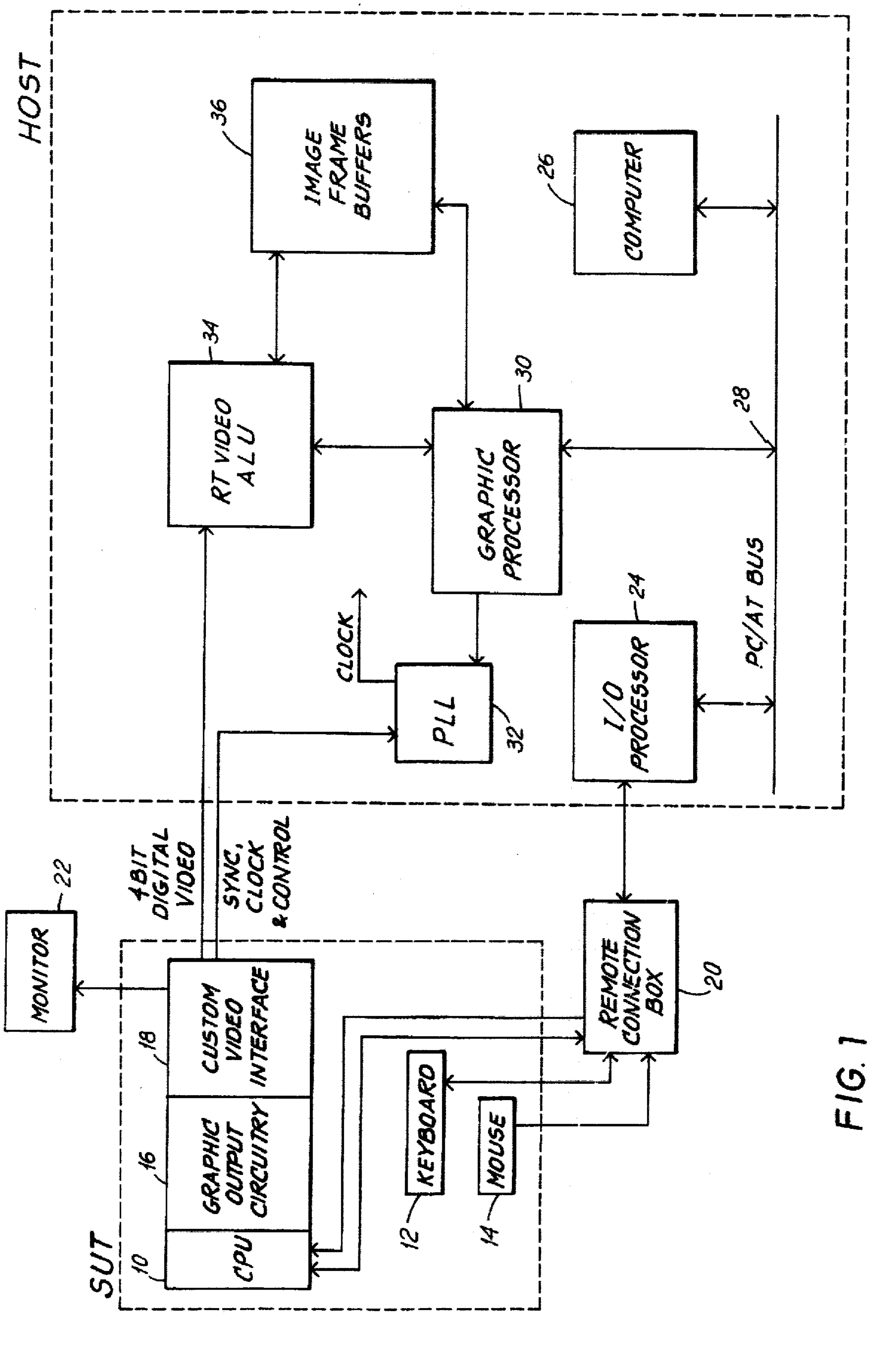
FIG. 1 is a block diagram illustrating an automatic testing system constructed and operative in accordance with a preferred embodiment of the invention.

Reference is now made to FIG. 1 which illustrates a test system constructed and operative in accordance with a preferred embodiment of the present invention. The system of the present invention is intended to test a system under test including hardware and software loaded into a CPU 10, which typically has associated therewith a keyboard 12, a cursor manipulation device 14, such as a mouse, a pen and tablet or a stylus, and graphics output circuitry 16. In accordance with a preferred embodiment of the present invention, a custom video interface 18, which will be described in detail hereinbelow, is installed in the SUT at the time of testing.

For personal computers, based on the DOS operating system, the graphics output circuitry 16 is typically a Video Graphics Adaptor (VGA). It is appreciated that the present invention is not limited to personal computers or to systems employing VGA. The custom video interface 18 is designed to translate the data of the graphics output circuitry 16 into a format used by the apparatus of the present invention.

For the purposes of the present specification and claims, the CPU 10, interface 18, keyboard 12 and mouse 14, to the extent that they are present, are included in the "system under test" (SUT), as indicated by a broken line. The custom video interface 18 is included within the broken line since it typically resides within the SUT.

The SUT is tested by the system of the present invention, denoted on FIG. 1 by the word "Host" and included within a broken line. A remote connection box 20, described hereinbelow in more detail, is, for the purposes of the present specification, also part of the Host system.

In accordance with a preferred embodiment of the present invention, the keyboard 12 and mouse 14 are connected to the CPU 10 by means of the remote connection box 20. The remote connection box 20 is, in turn, connected to the serial and/or parallel inputs of the CPU 10. A monitor 22 is associated with the CPU 10 via the VGA 16.

Associated with the remote connection box 20, for providing thereto input instructions for the CPU 10 is an I/O processor 24, which will be described hereinbelow in detail. The I/O processor 24 communicates with a host computer CPU 26 via a PC/AT bus 28.

A graphic processor 30 interfaces with PC/AT bus 28 and also, via Phase Lock Loop (PLL) circuitry 32 and custom video interface 18, with the graphics circuitry 16. Graphic processor 30, which will be described hereinbelow in detail, cooperates with a Real Time (RT) video Arithmetic Logic Unit (ALU) 34, which is coupled with the custom video interface 18 by means of a 4 bit digital video link. Video ALU 34 also cooperates with image frame buffers 36, which also interface with the graphic processor 30. PLL 32 provides synchronization, timing and control signals.

The overall operation of the apparatus of FIG. 1 will now be briefly summarized. The host computer 26 is operative to record and store input events from the mouse 14 and keyboard 12 of the SUT via the remote connection box 20 and the I/O processor 24, during test preparation.

Host computer 26 replays input events to the SUT via the I/O processor 24 and the remote connection box 20. The I/O processor 24, controlled by the host computer 26 via PC/AT-Bus 28, also has the capability to record and replay timing intervals between the input events.

Screens appearing on the monitor 22 of the SUT are captured via video interface 18 and RT video ALU 34 to the image frame buffers 36 while the PLL 32 provides correct sampling clock inputs.

Specific functions such as screen comparisons, screen compacting and object recognition, are performed on the RT video ALU 34 and image frame buffers 36, controlled by the graphic processor 30 which, in turn, is controlled by the host computer 26 via PC/AT bus 28.

Host computer 26 coordinates all the input activity via the I/O processor 24, and the output activity via the graphic processor 30.

Figure 2A:
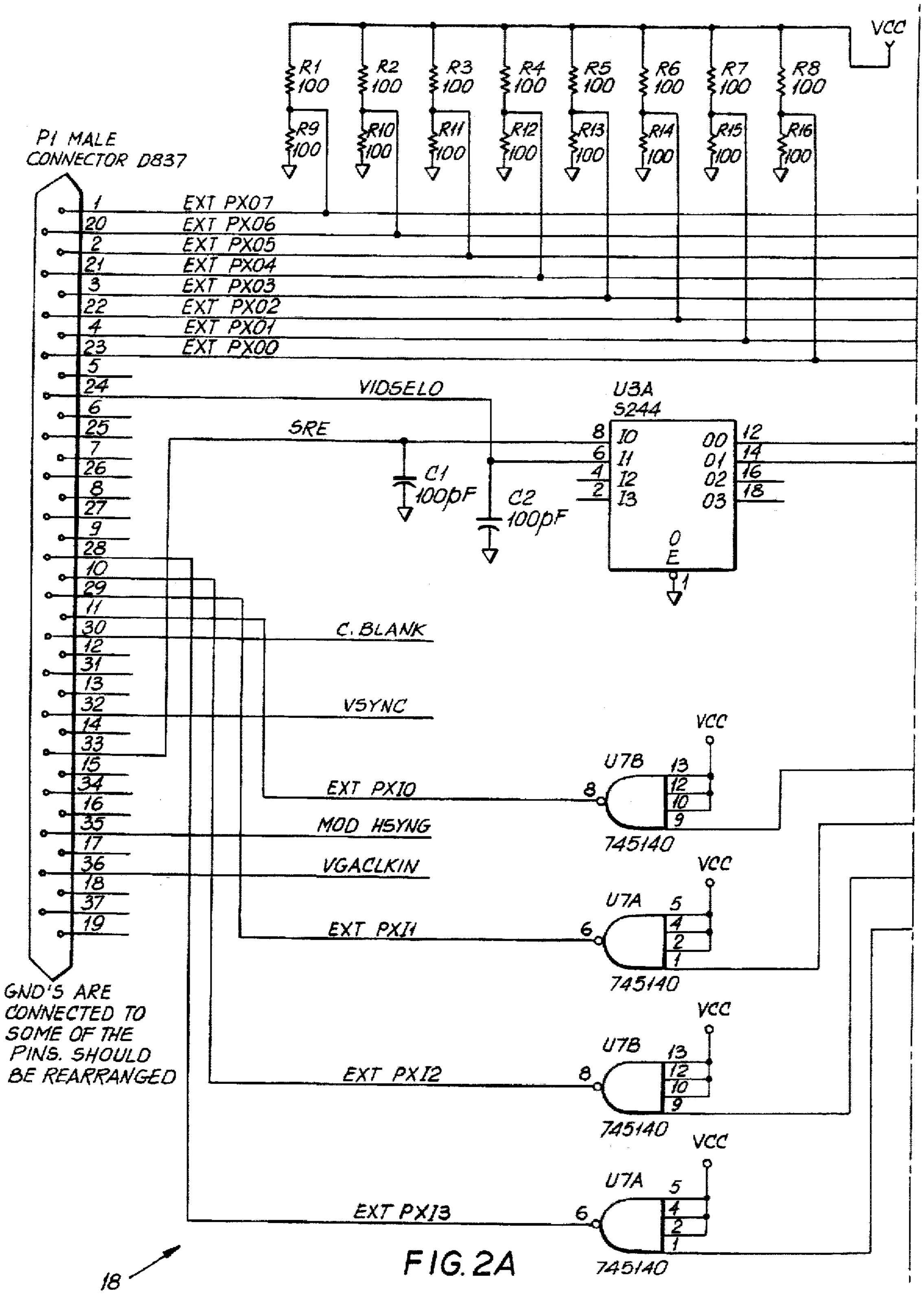
FIGS. 2A, 2B and 2C are schematic illustrations of a VGA adapter forming part of the system of FIG. 1.
Figure 2B:
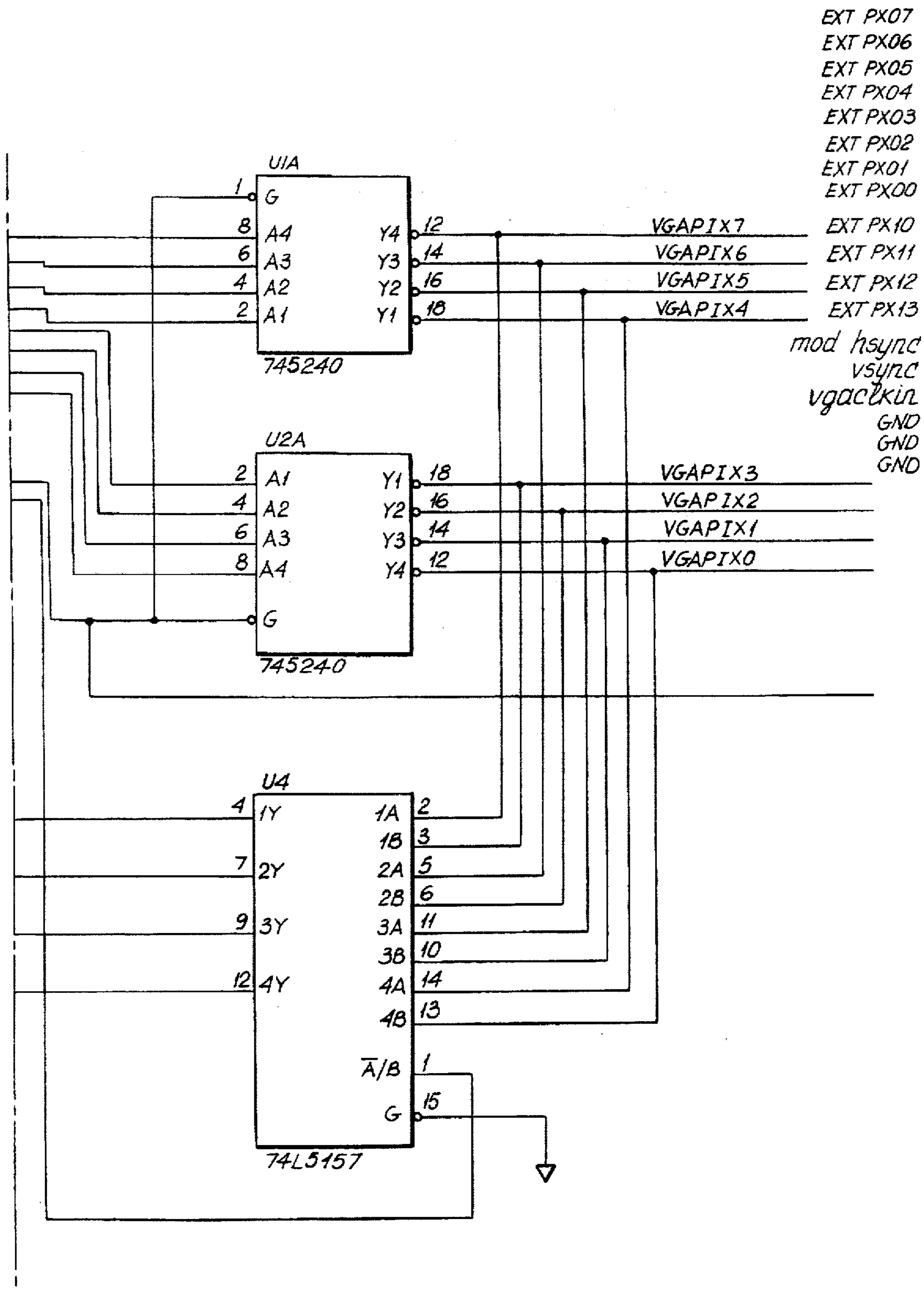
Figure 2C:
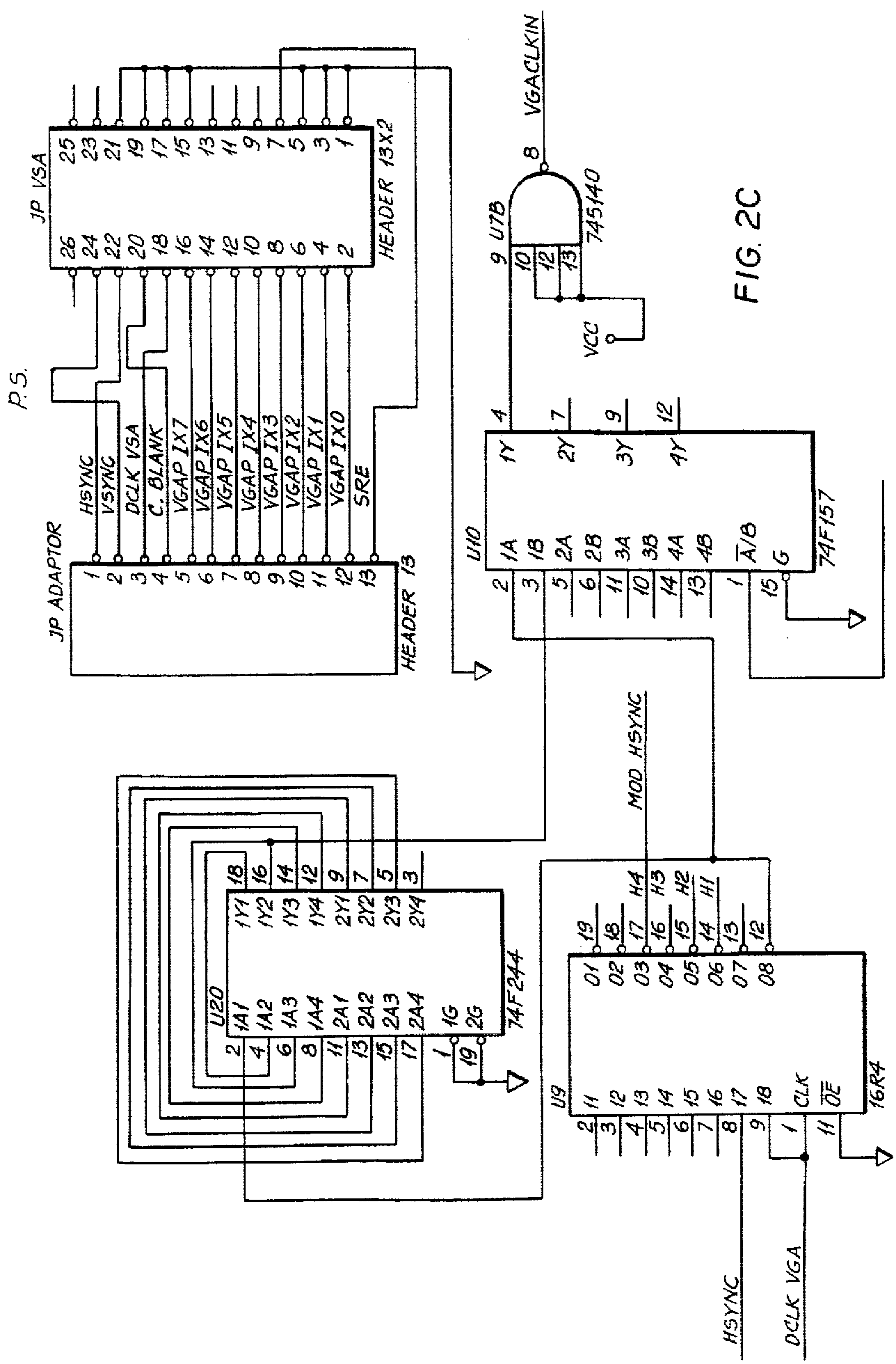
Figure 3A:
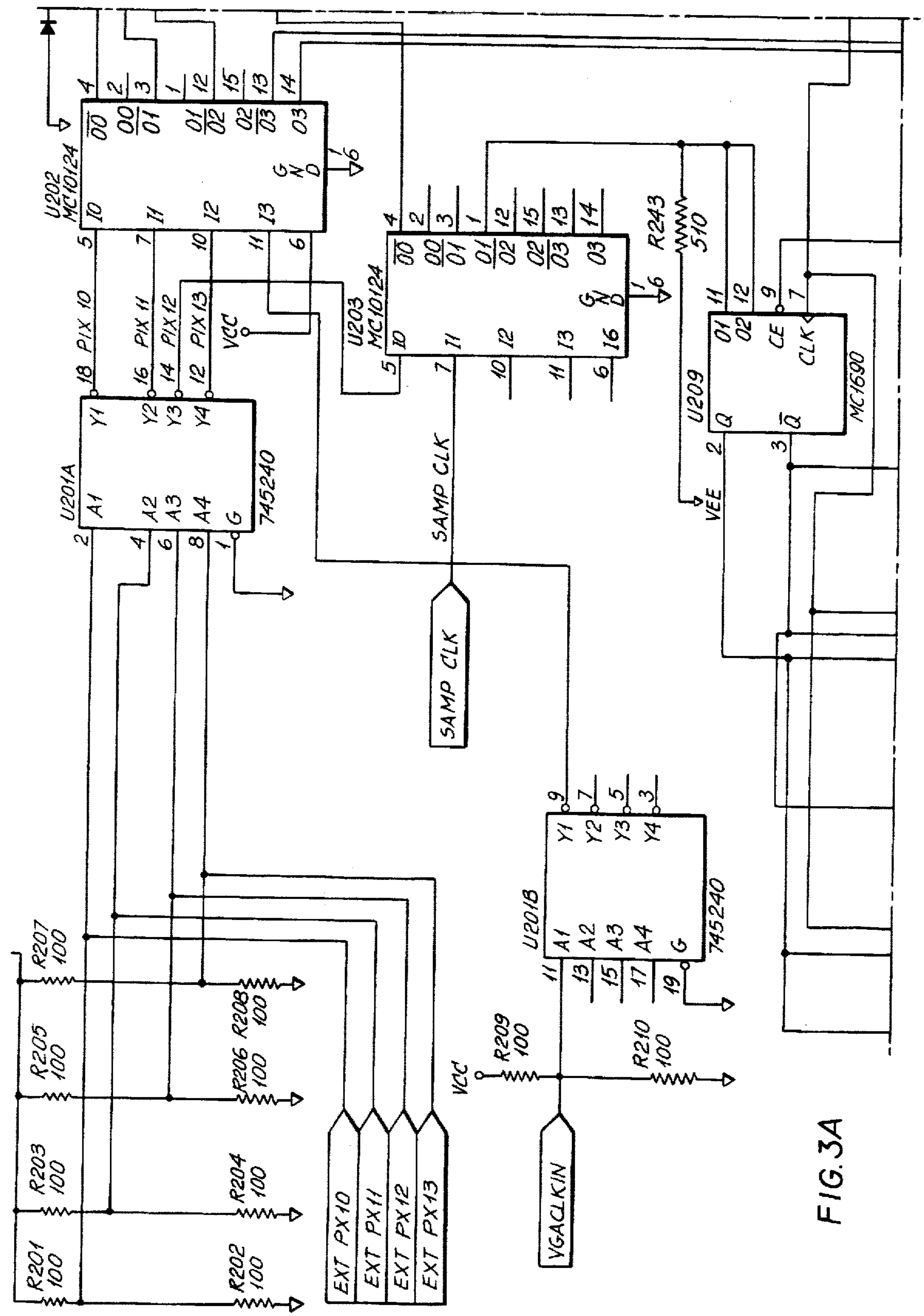
FIGS. 3A, 3B, 3C and 3D are schematic illustrations of phase lock loop circuitry forming part of the system of FIG. 1.
Figure 3B:
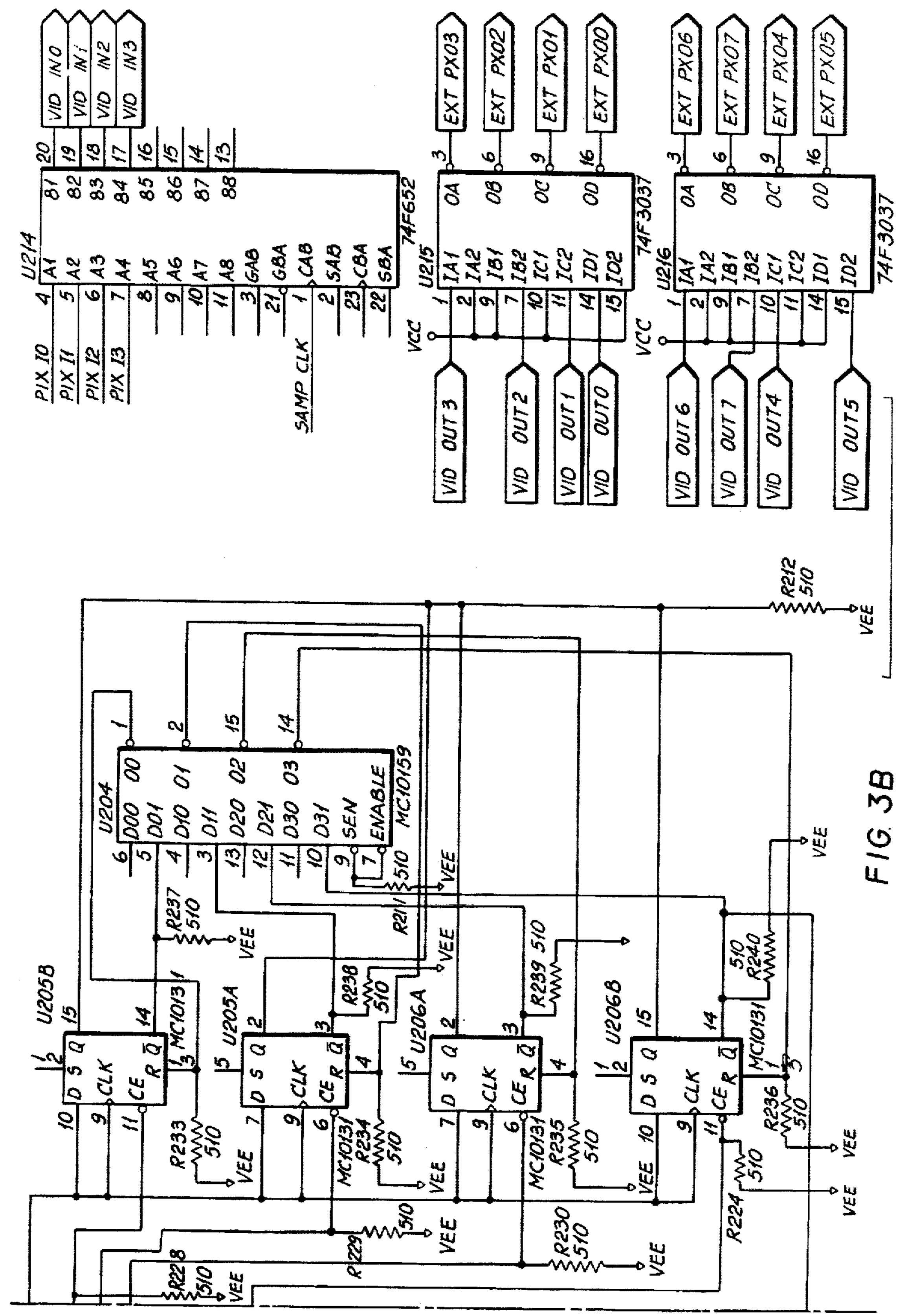
Figure 3C:
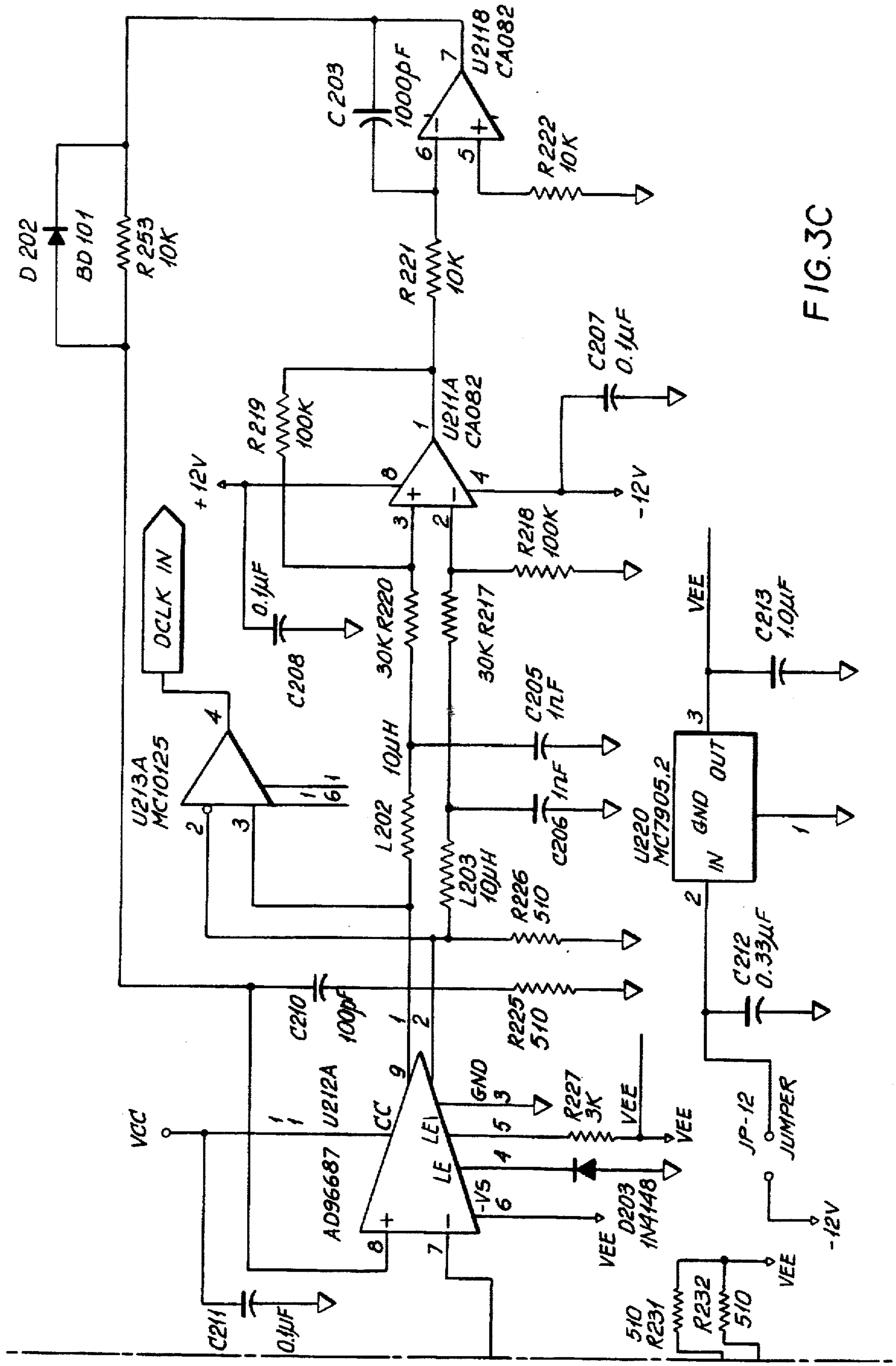
Figure 3D:
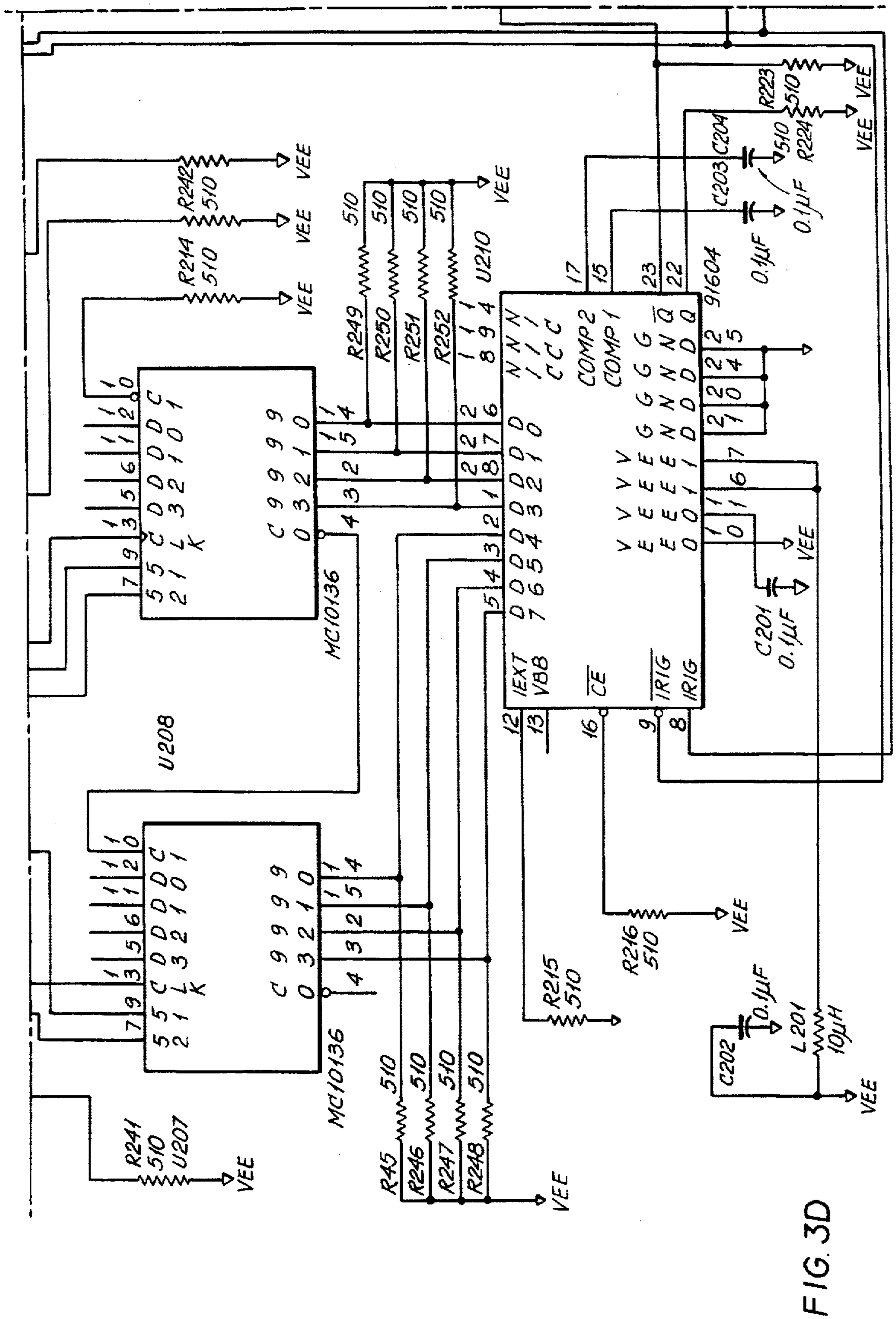

Reference is now made to FIGS. 2A–2C, which illustrate in schematic form video interface circuitry 18, customized to match graphic circuitry 16. In the example shown in FIGS. 2A–2C, graphic circuitry 16 is VGA. The full specification of all of the circuit components appears in the drawing and therefore, for reasons of conciseness, a verbatim description thereof is not provided here.

Reference is now made to FIGS. 3A–3D, which illustrate PLL circuitry 32 in schematic form. The full specification of all of the circuit components appears in the drawing and therefore, for reasons of conciseness, a verbatim description thereof is not provided here.

Figure 4A:
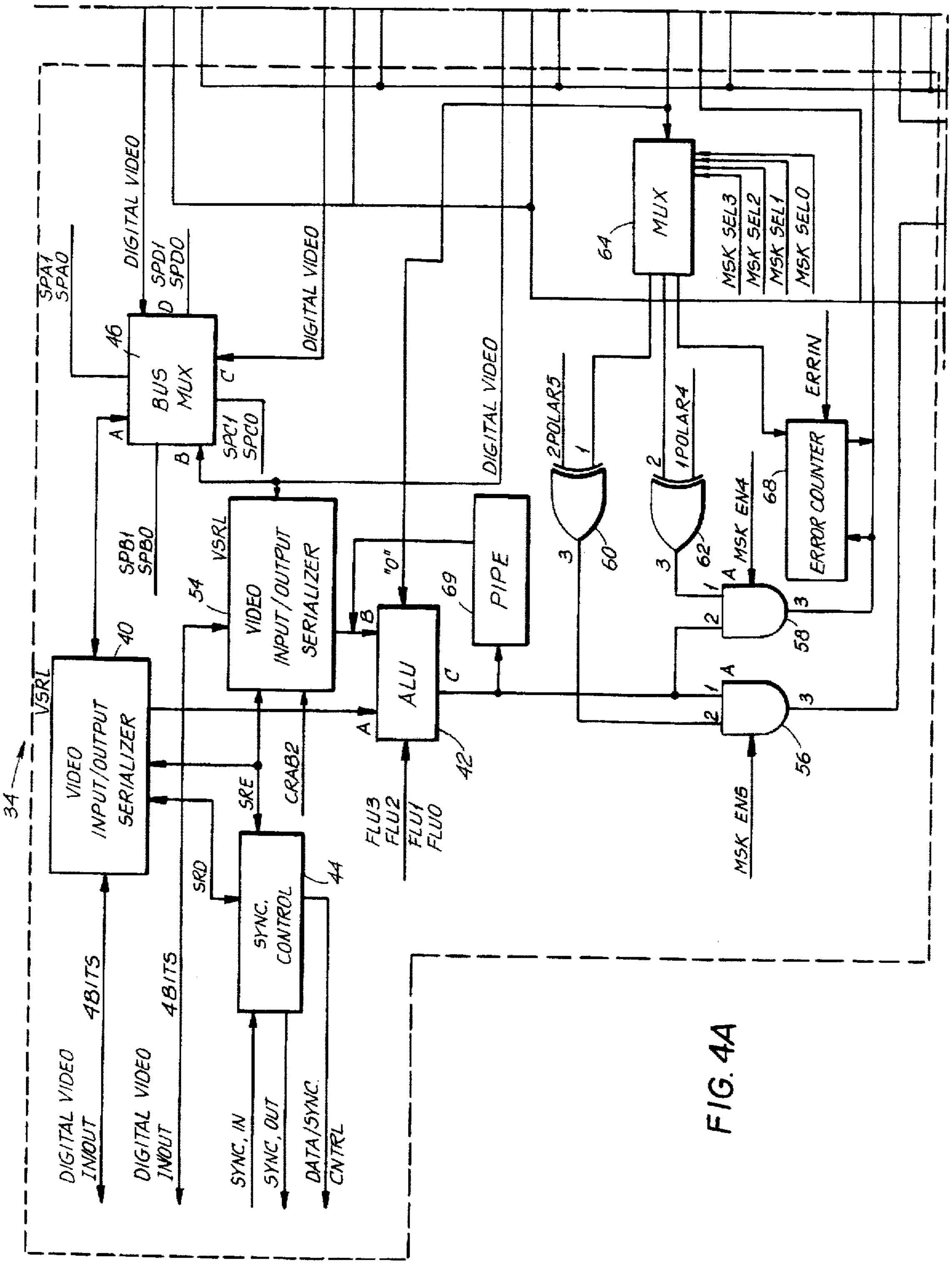
FIGS. 4A and 4B are intermediate level block diagram illustrations of an RT video ALU, a graphic processor and image frame buffers forming part of the system of FIG. 1.
Figure 4B:
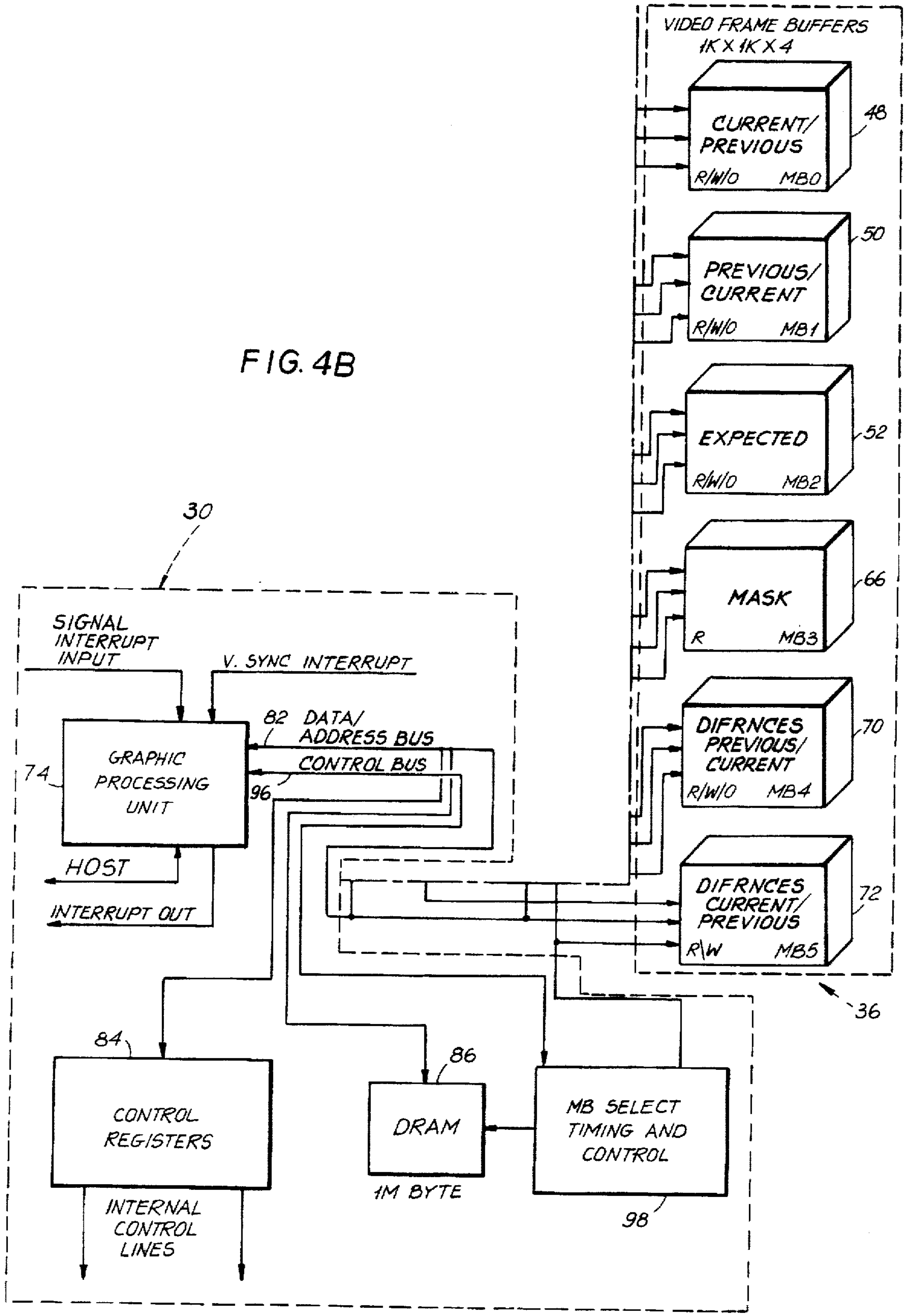
Figure 5A:
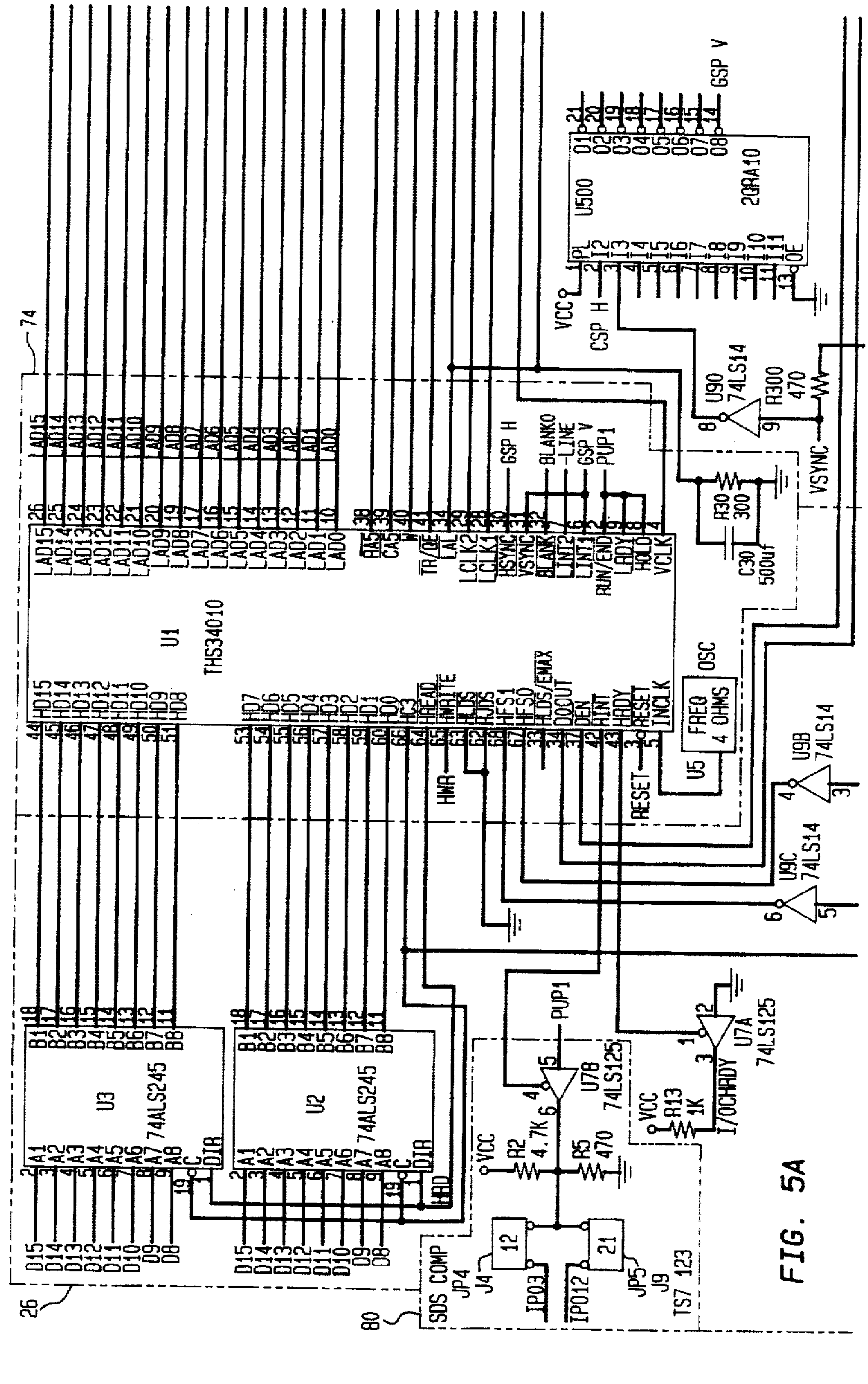
FIGS. 5A, 5B, 5C, 5D and 5E are schematic illustrations of the graphic processor forming part of the system of FIG. 1.
Figure 5B:
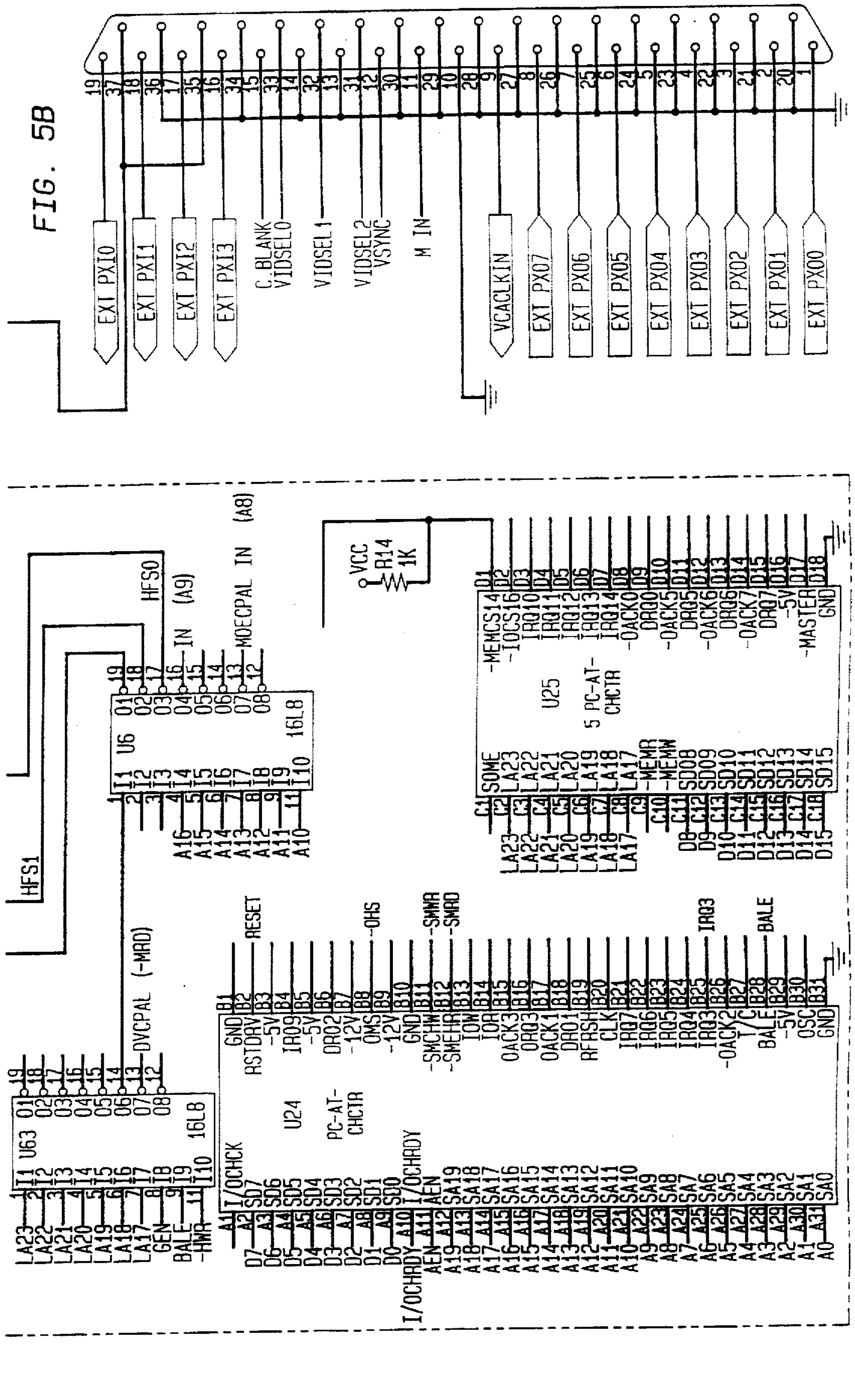
Figure 5C:
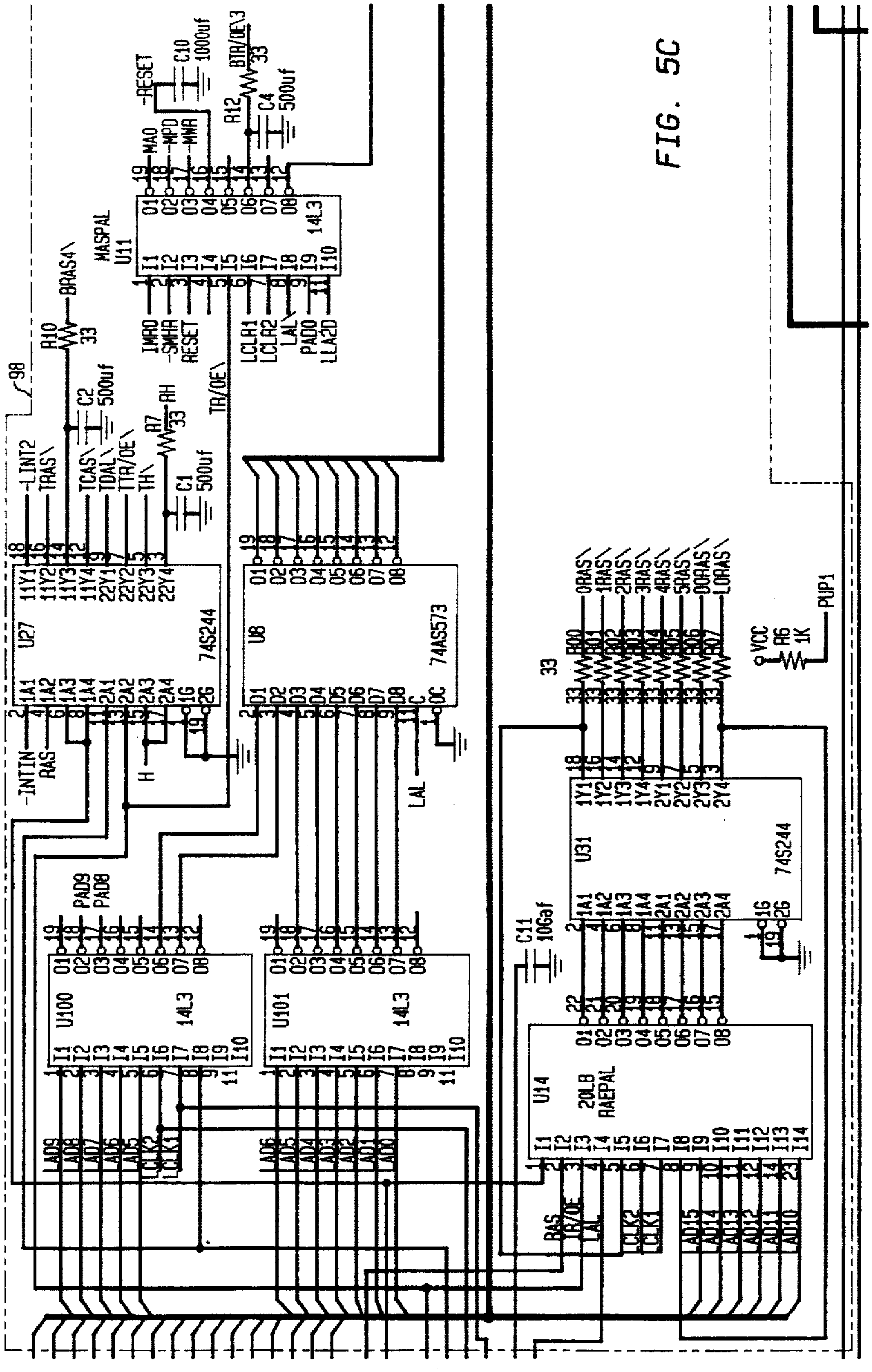
Figure 5D:
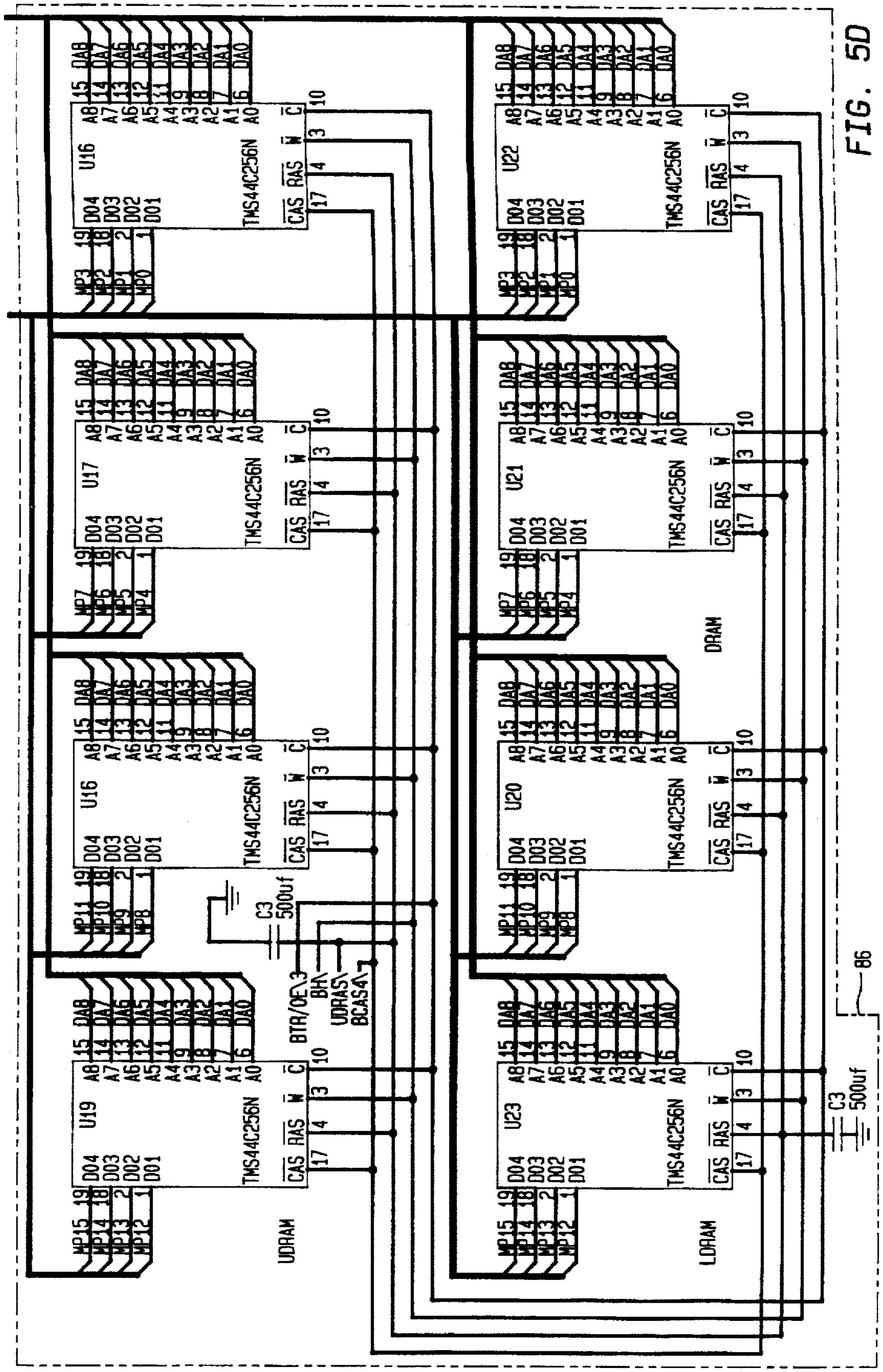
Figure 5E:
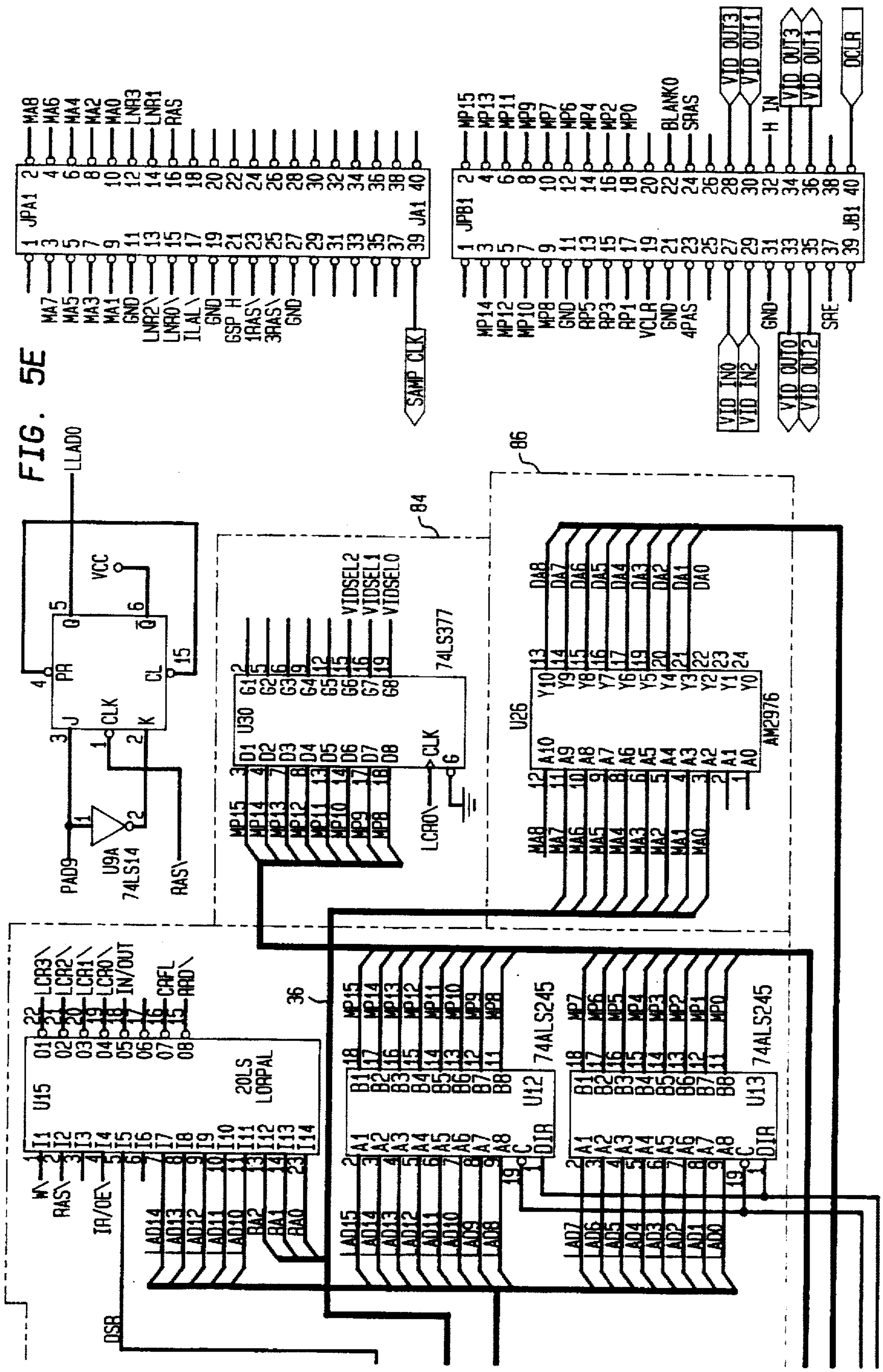
Figure 6A:
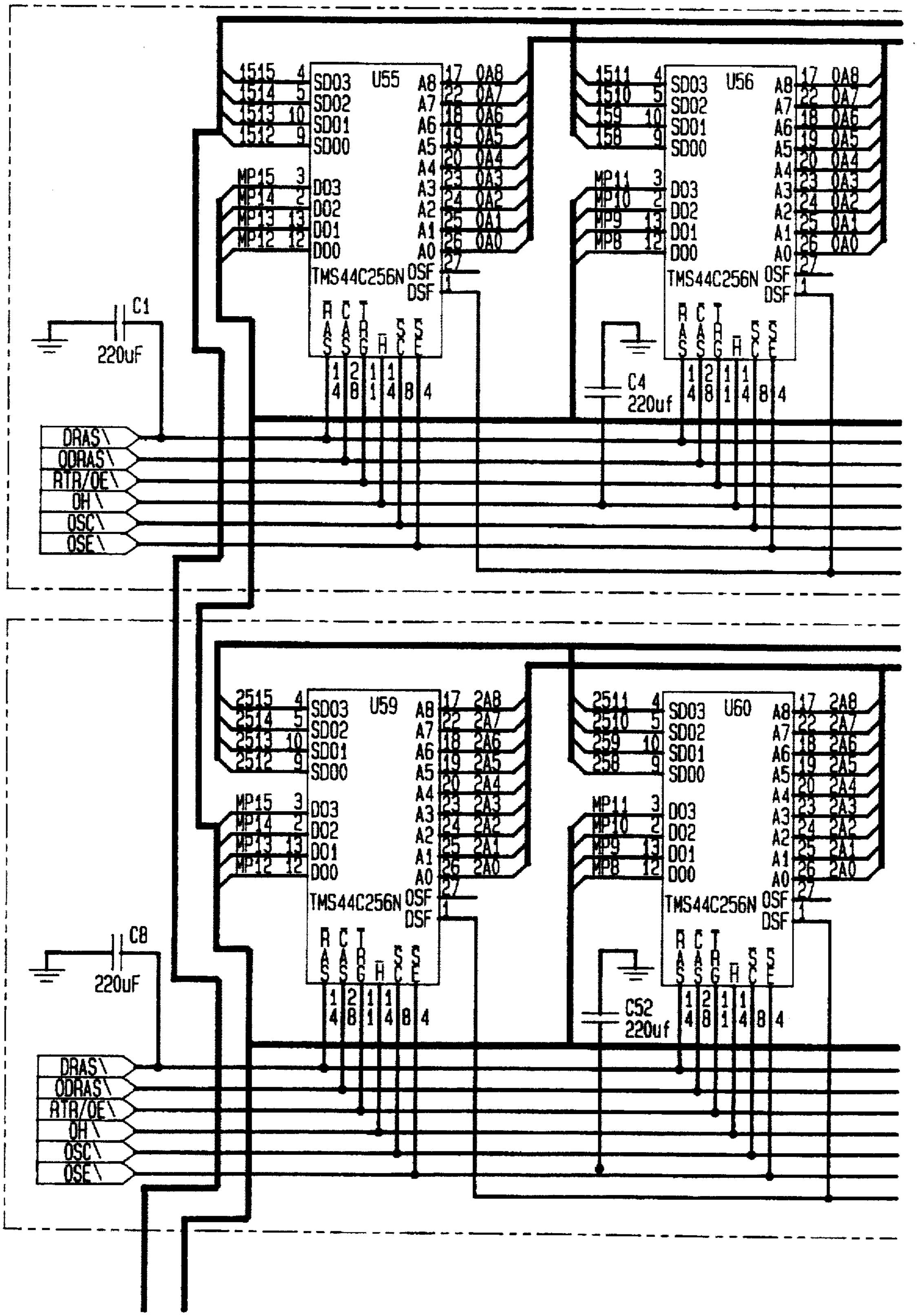
FIGS. 6A, 6B, 6C, 6D, 6E, 6F, 6G and 6H are schematic illustrations of the image frame buffers forming part of the system of FIG. 1.
Figure 6B:
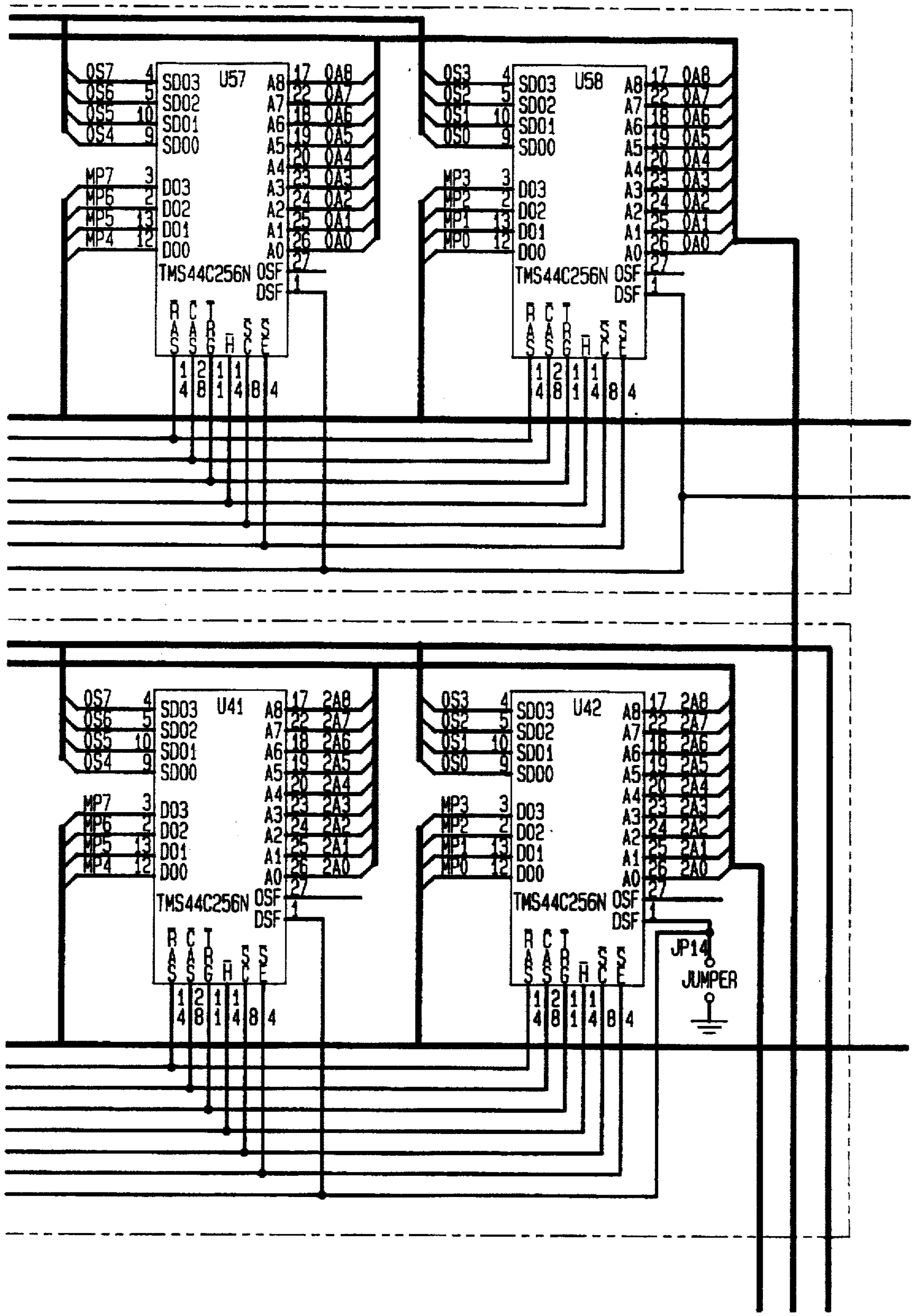
Figure 6C:
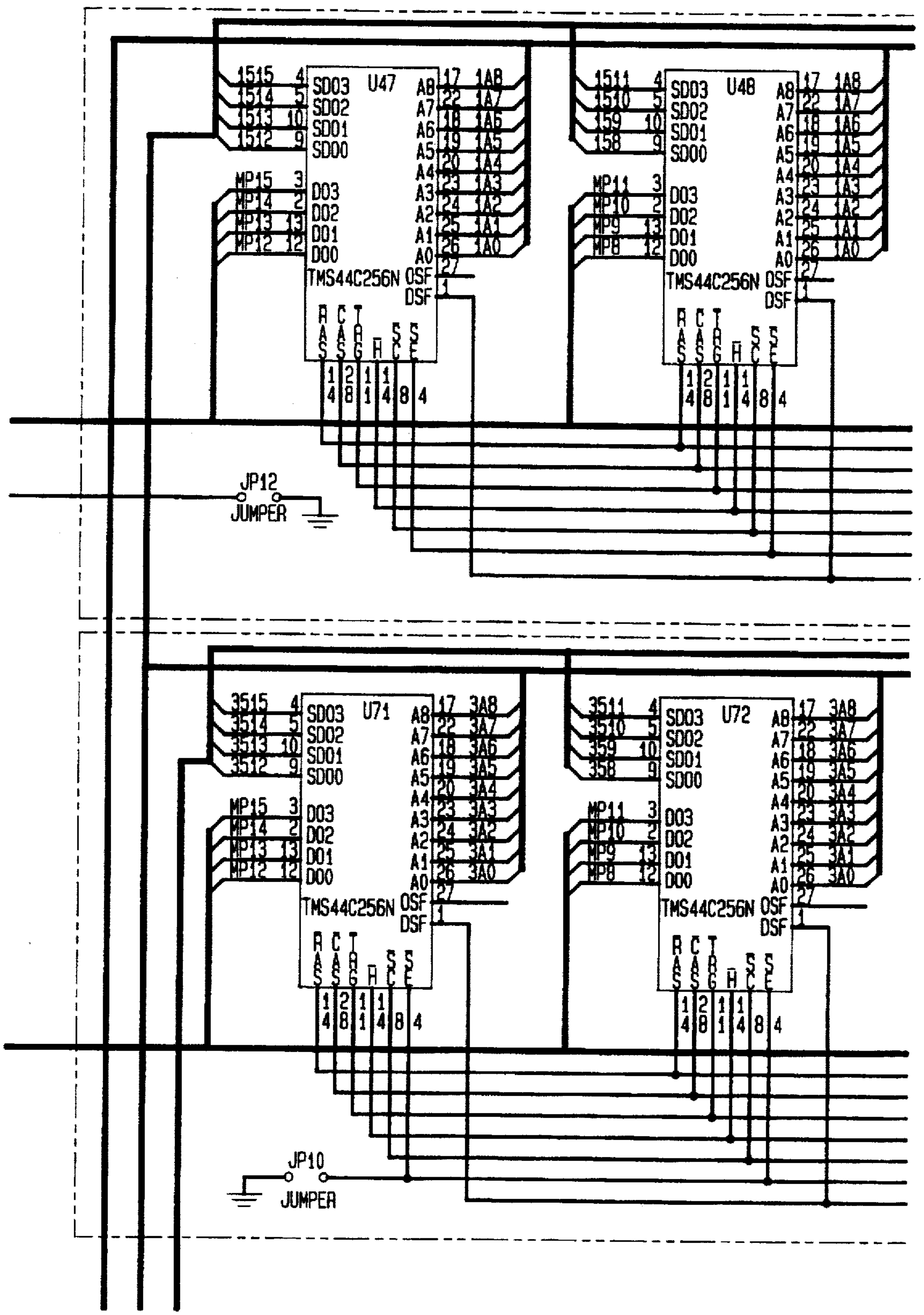
Figure 6D:
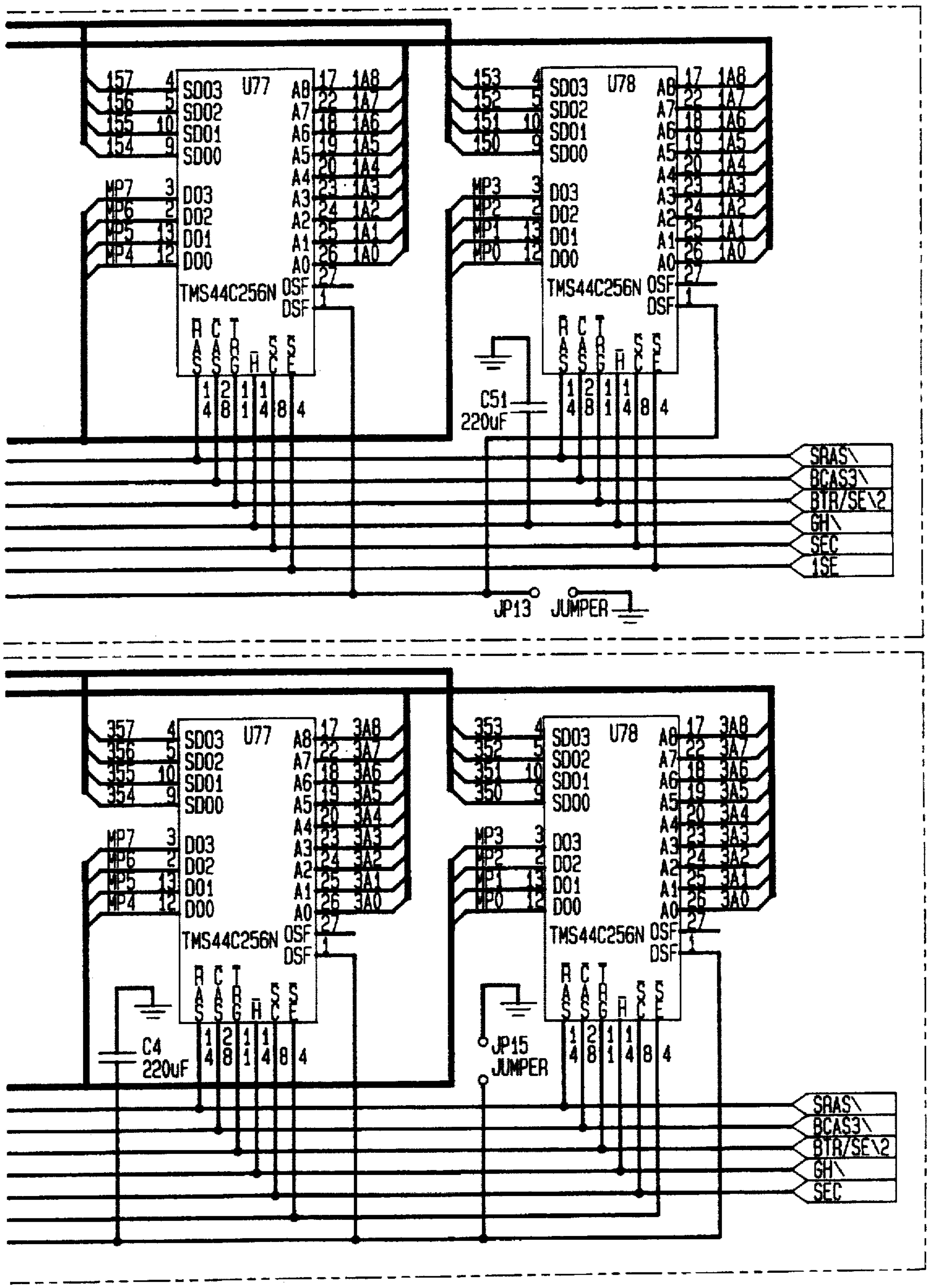
Figure 6E:
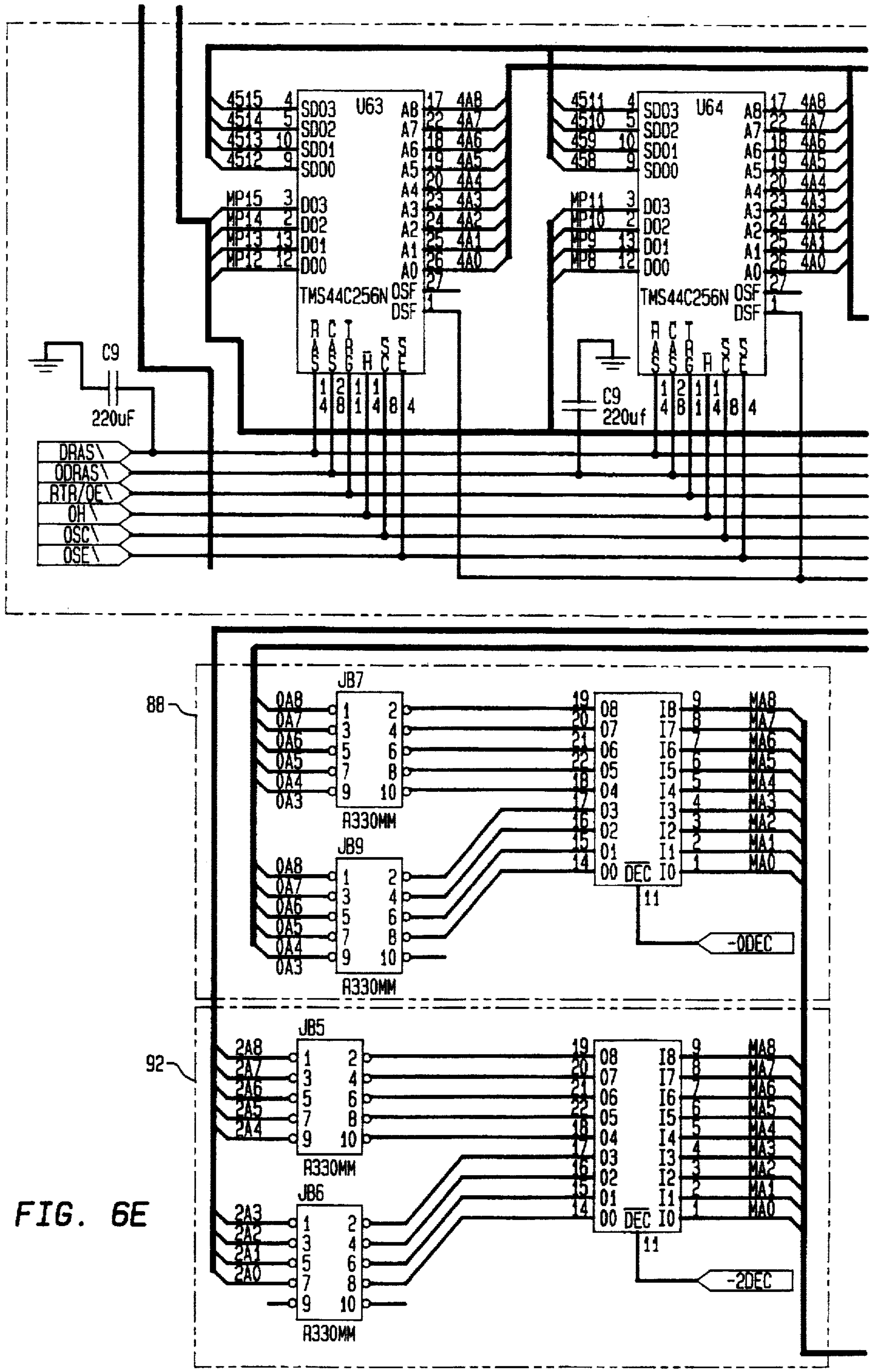
Figure 6F:
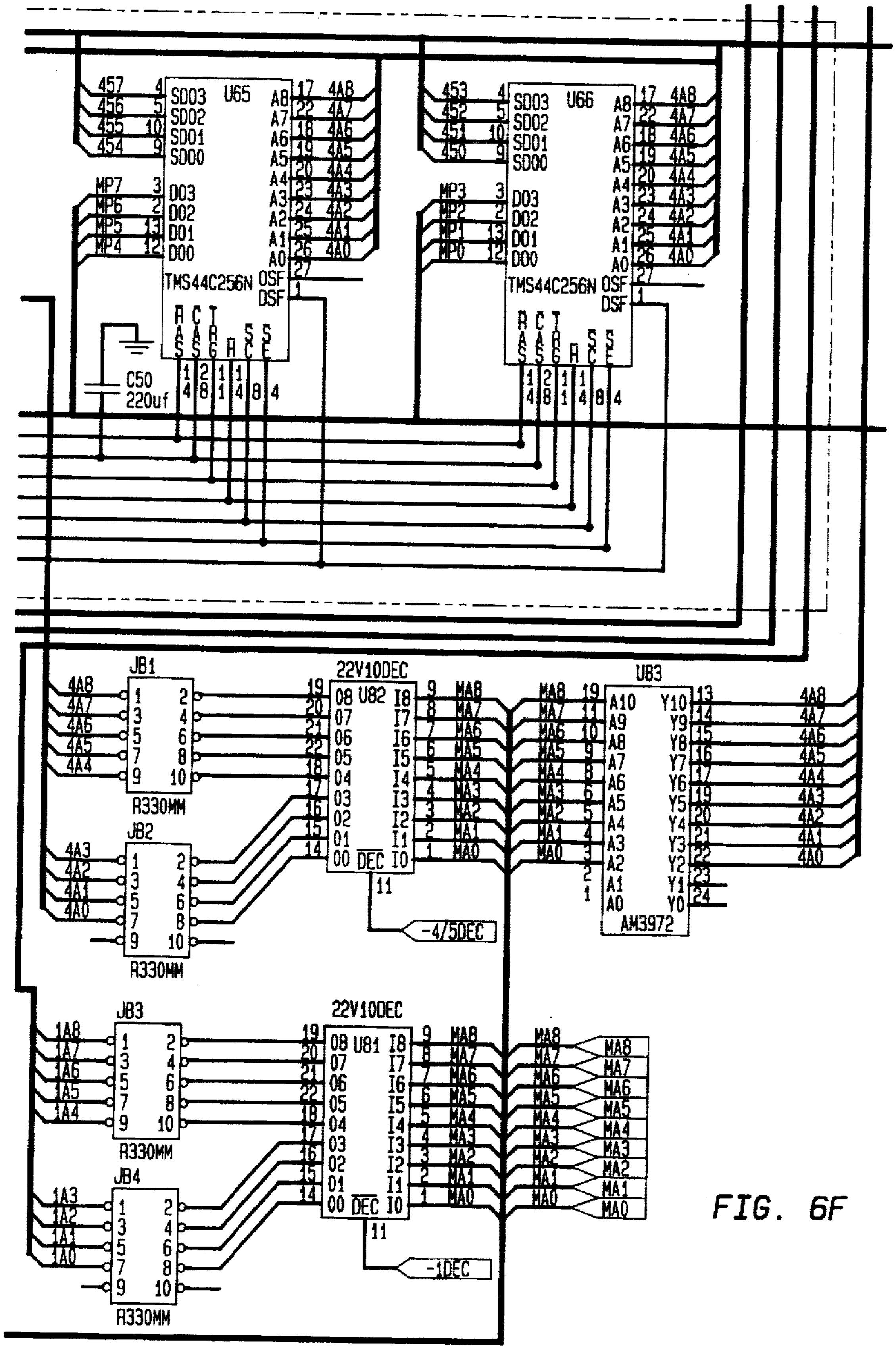
Figure 6G:
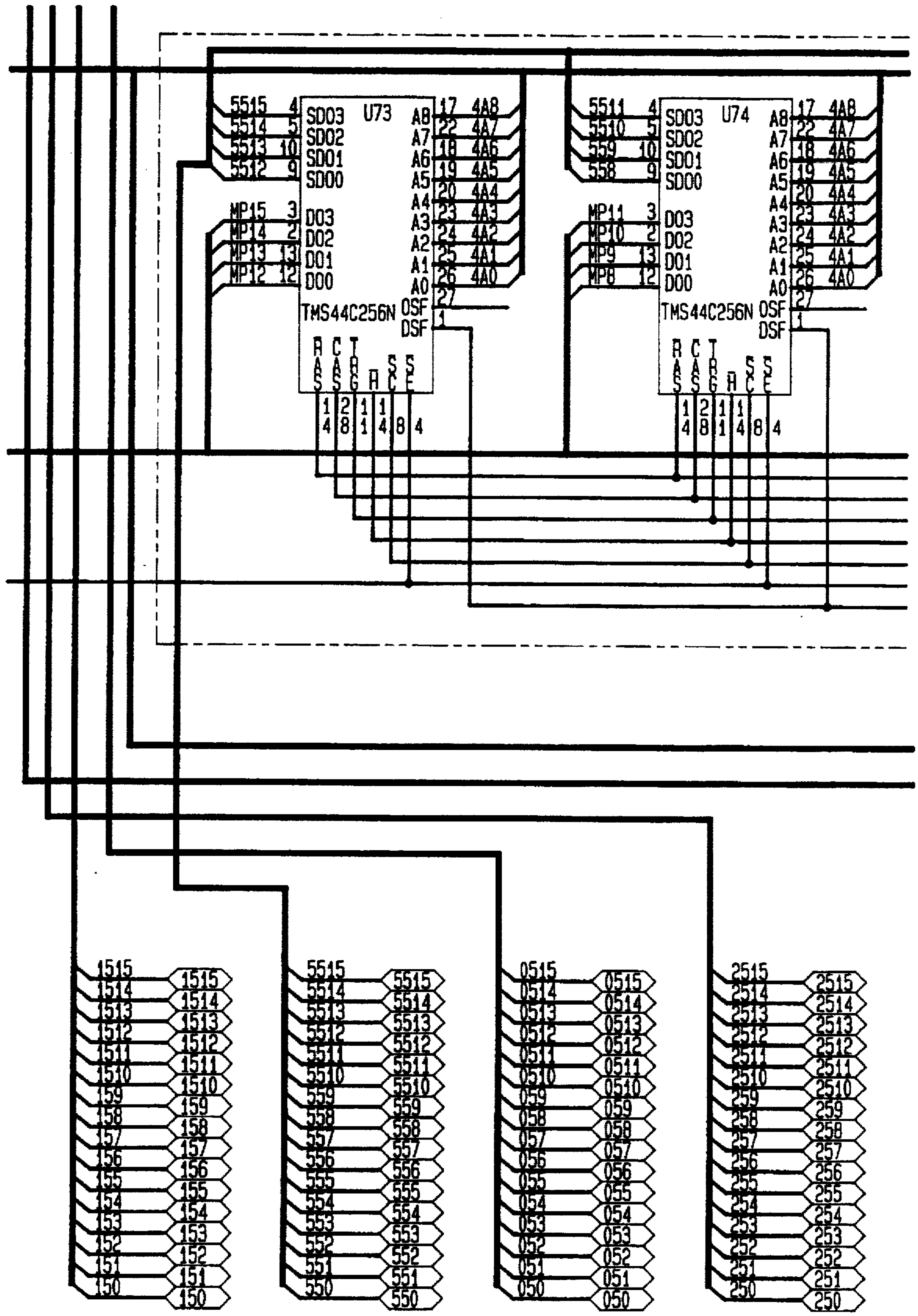
Figure 6H:
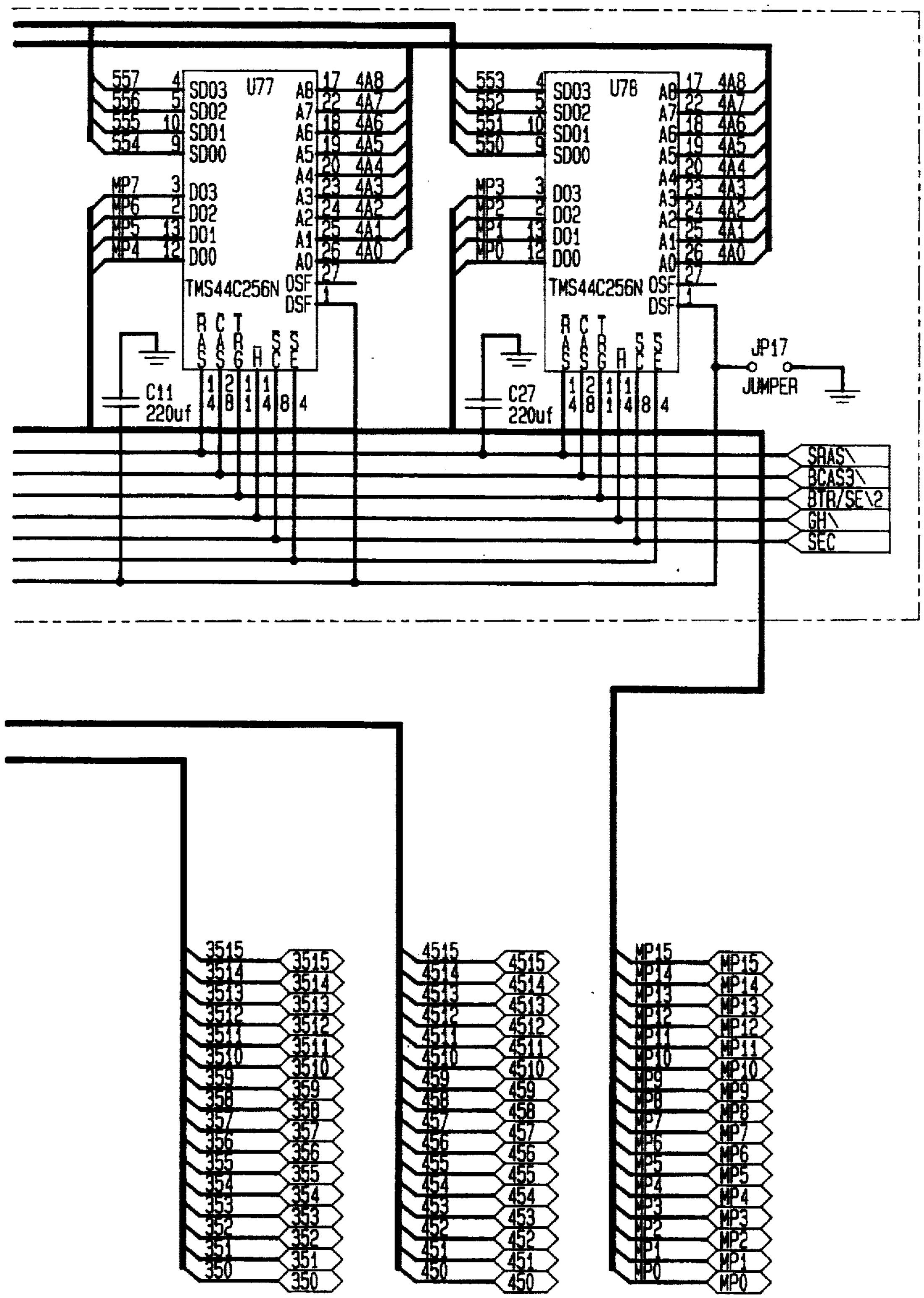
Figure 7A:
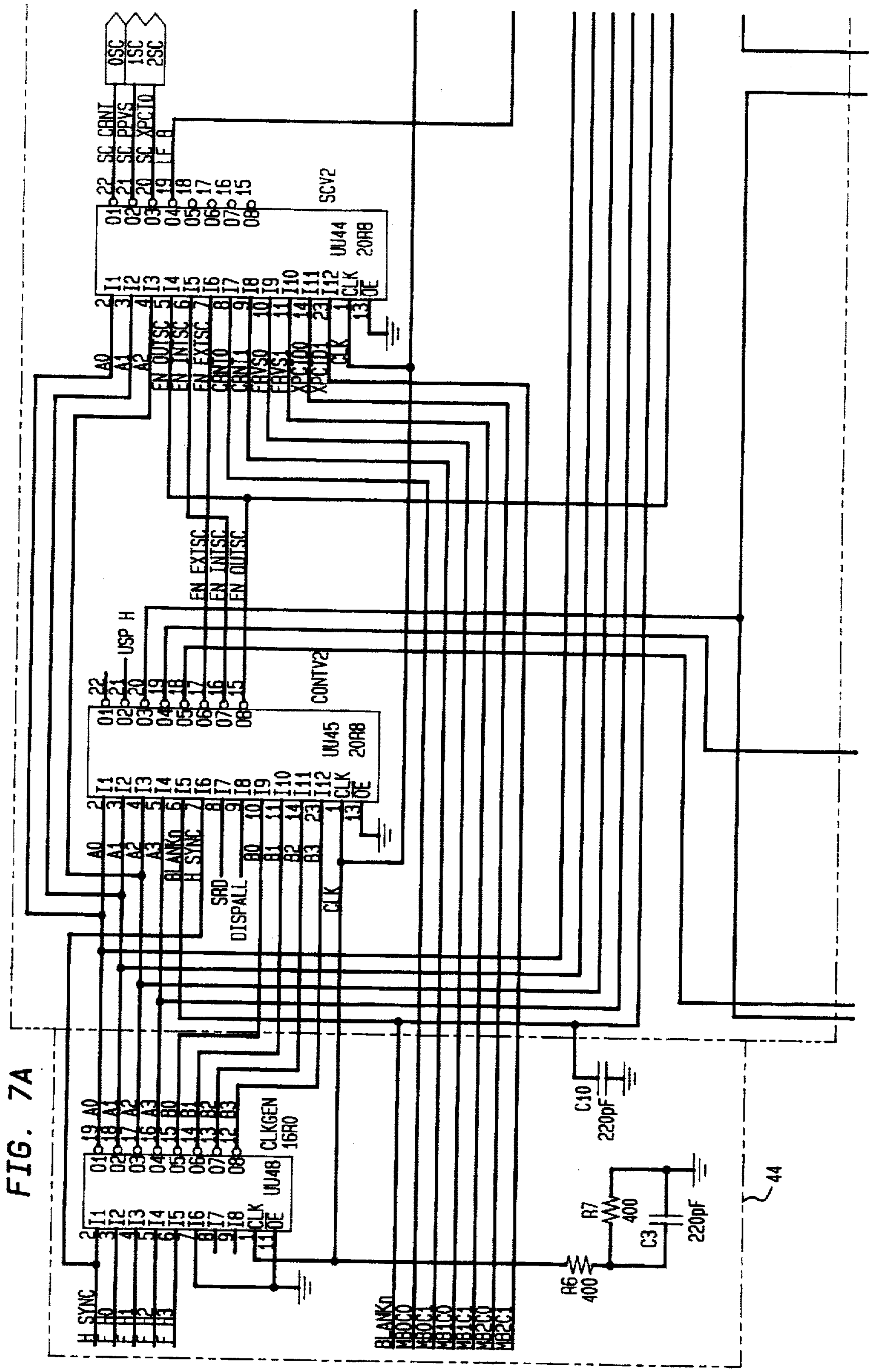
FIGS. 7A, 7B, 7C, 7D, 7E, 7F, 7G, 7H, 7I, 7J, 7K and 7L are schematic illustrations of the RT video ALU forming part of the system of FIG. 1.
Figure 7B:
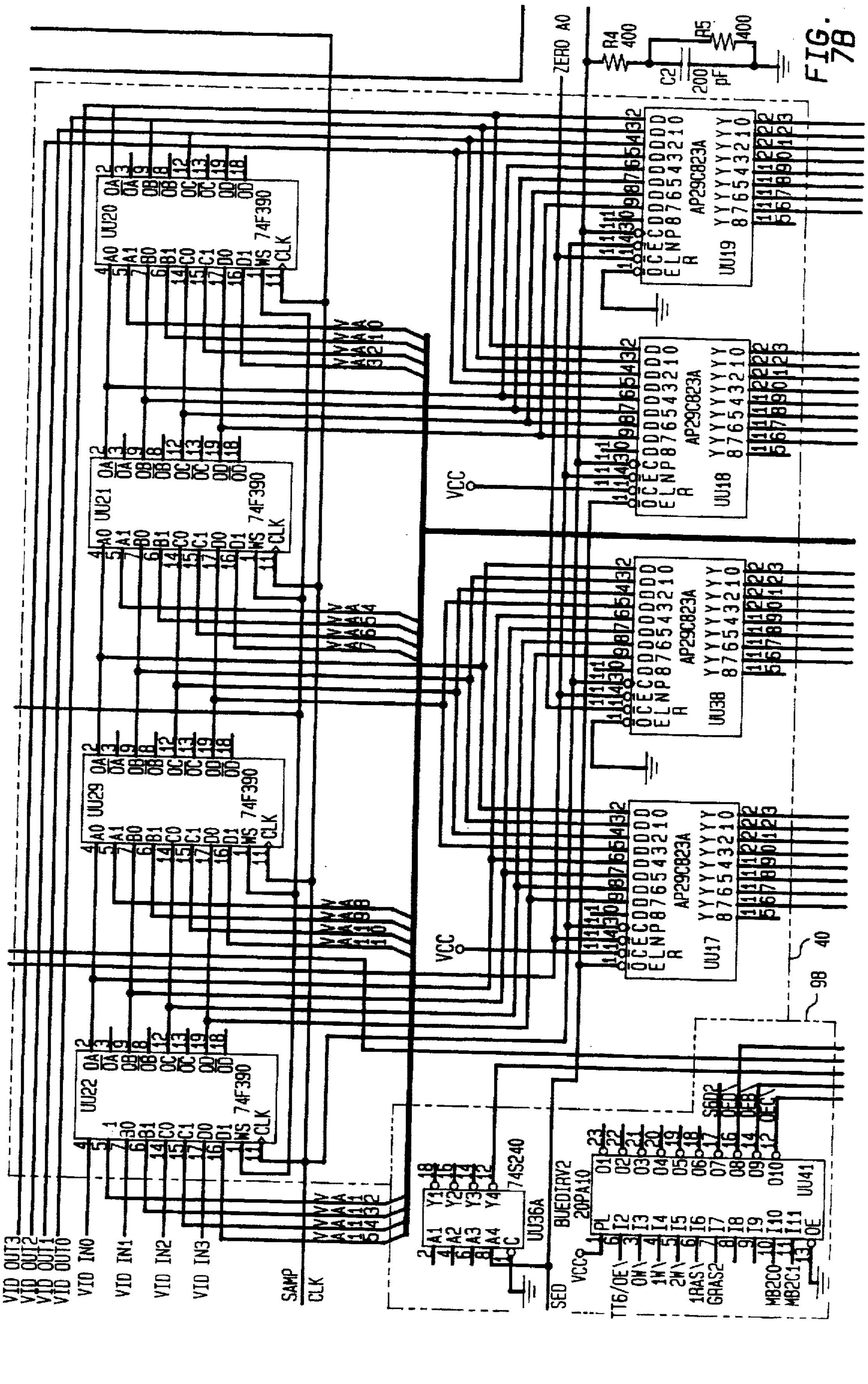
Figure 7C:
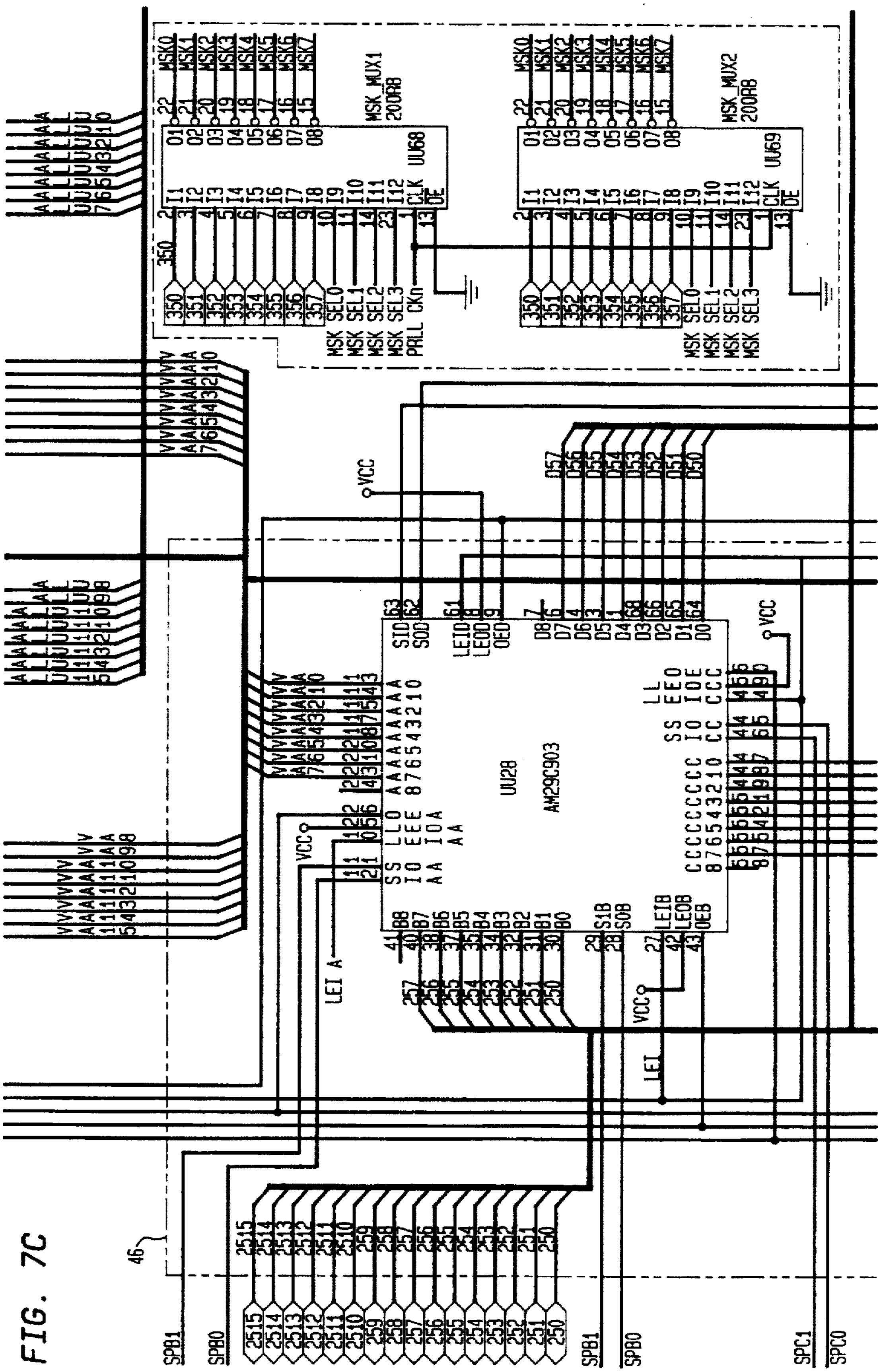
Figure 7D:
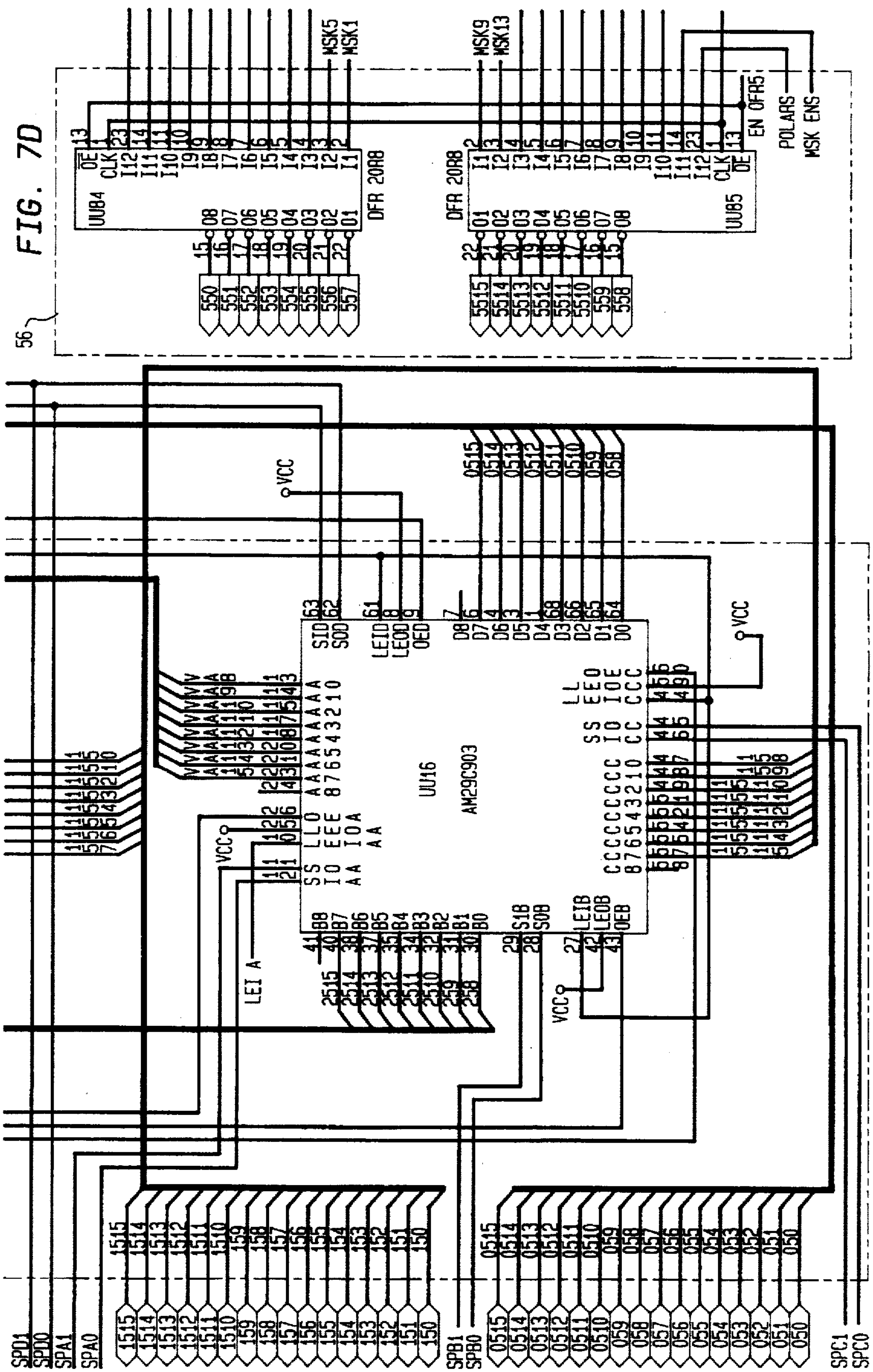
Figure 7E:
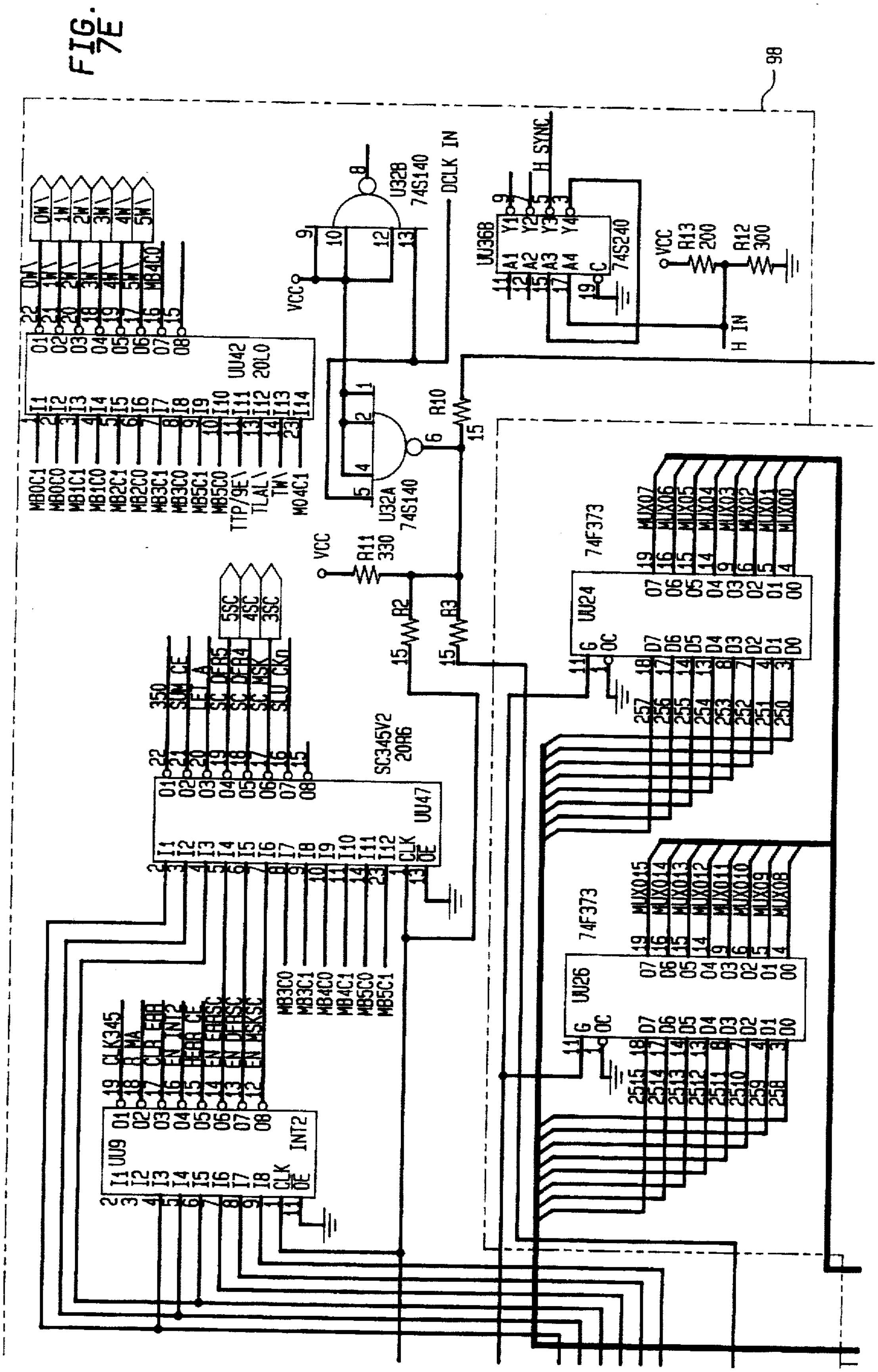
Figure 7F:
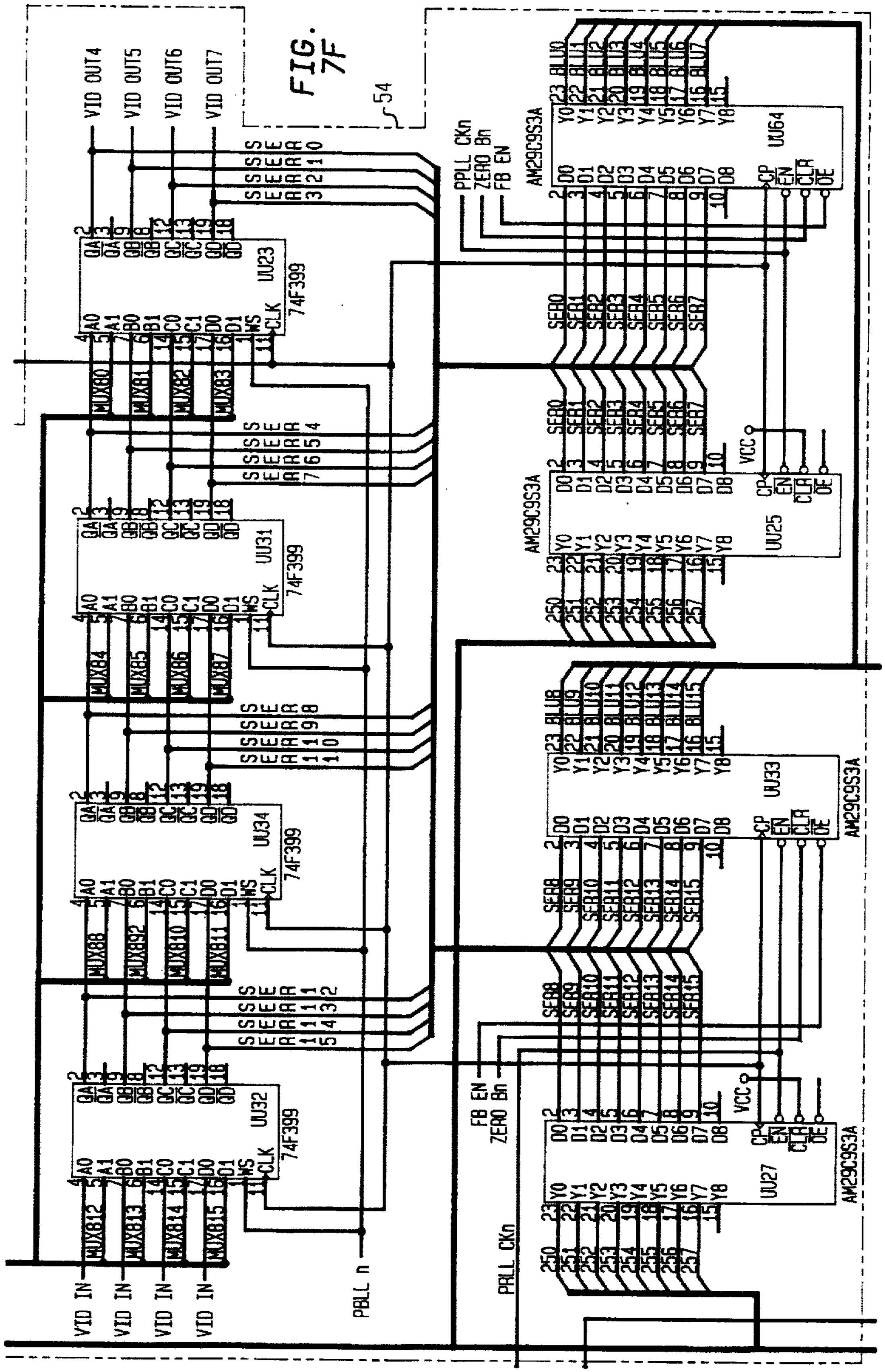
Figure 7G:
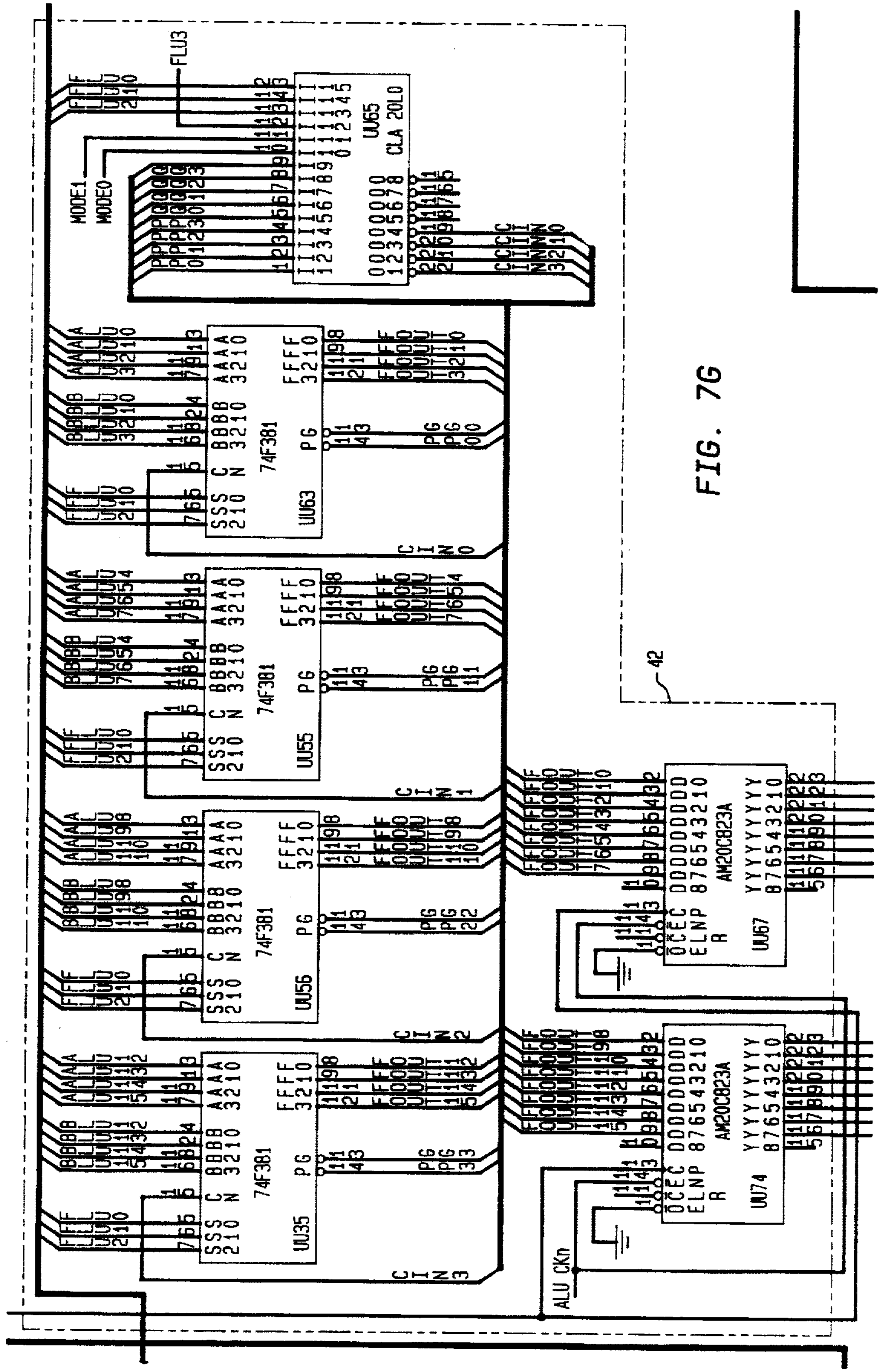
Figure 7H:
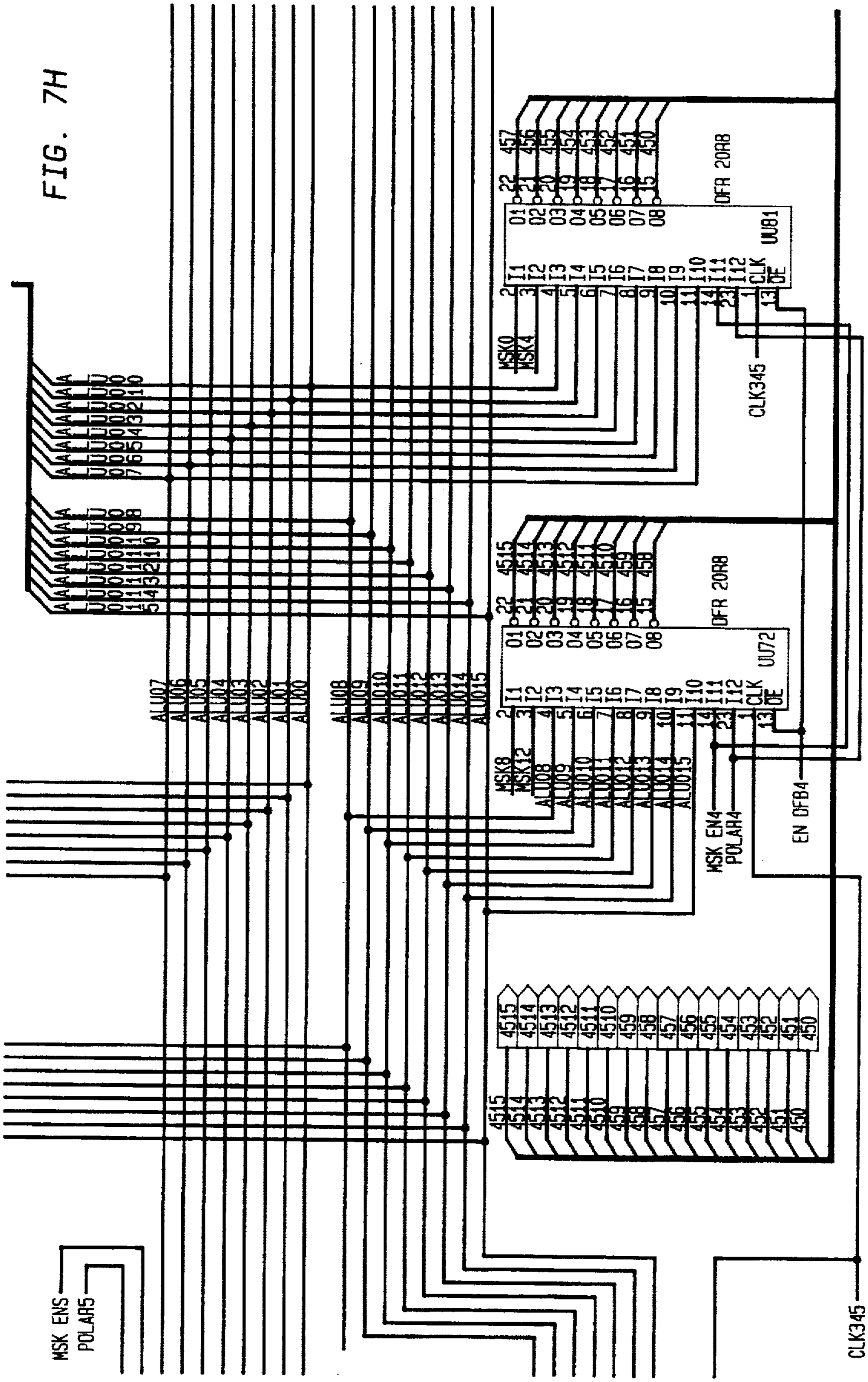
Figure 7I:
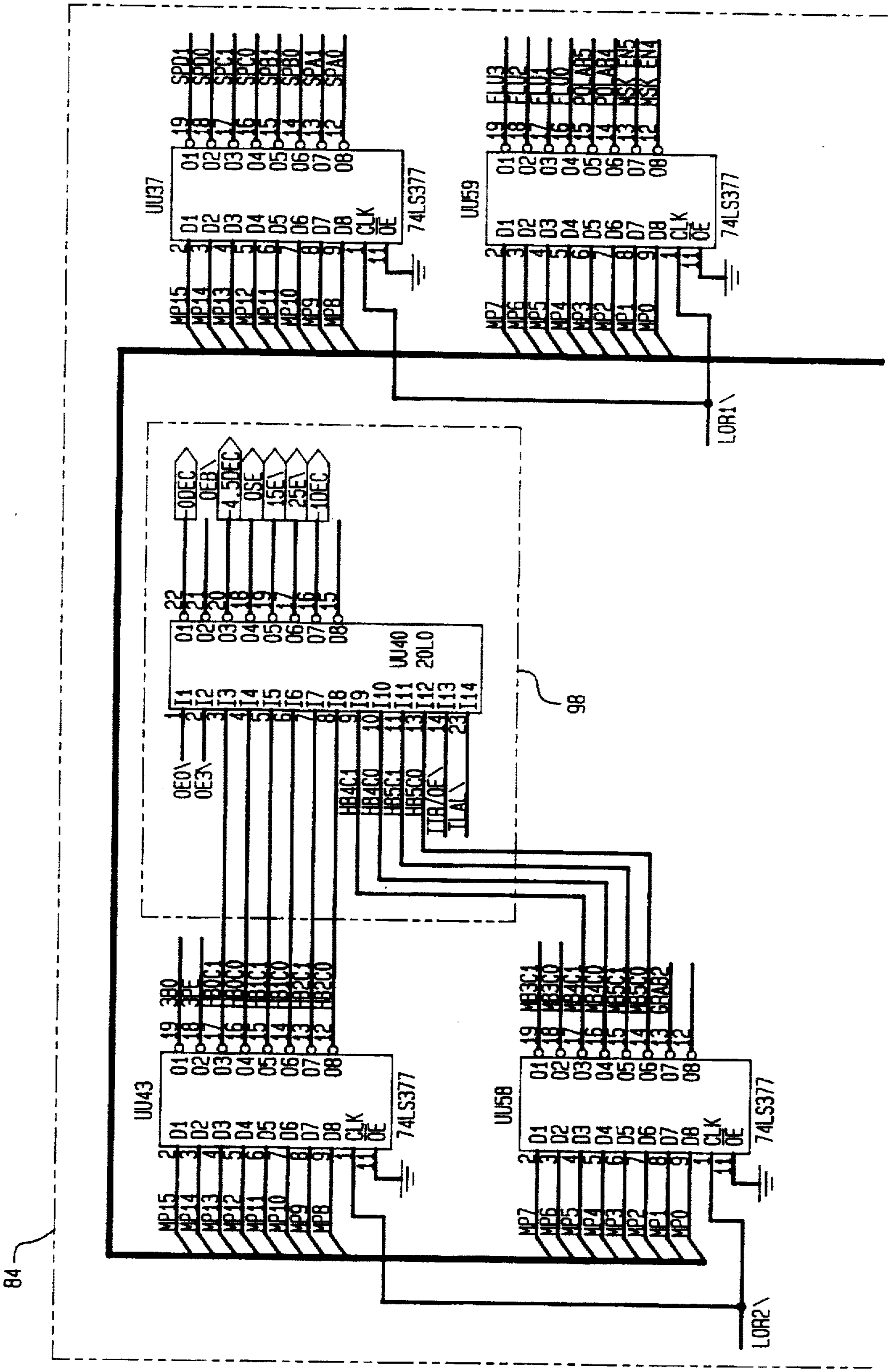
Figure 7J:
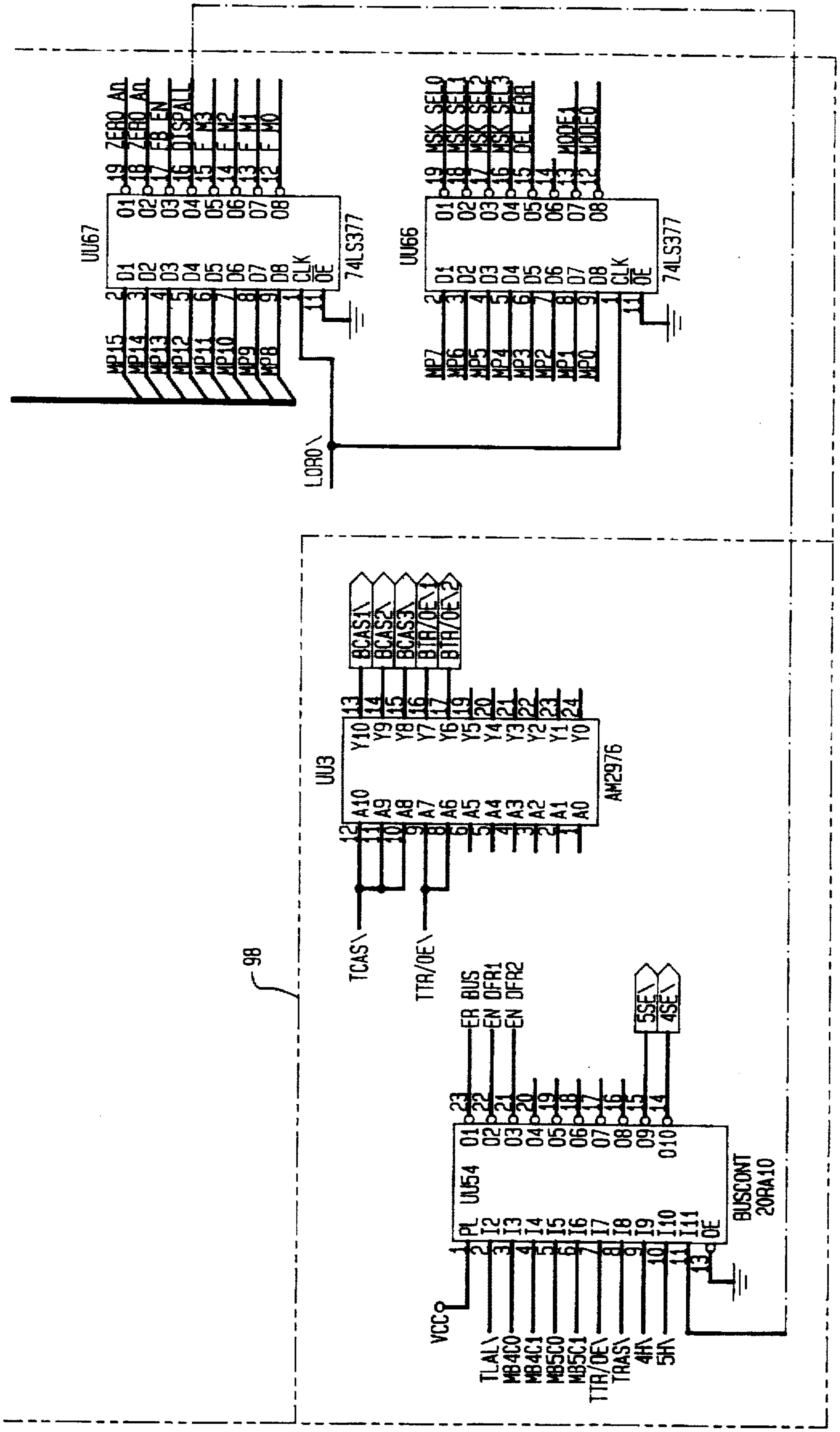
Figure 7K:
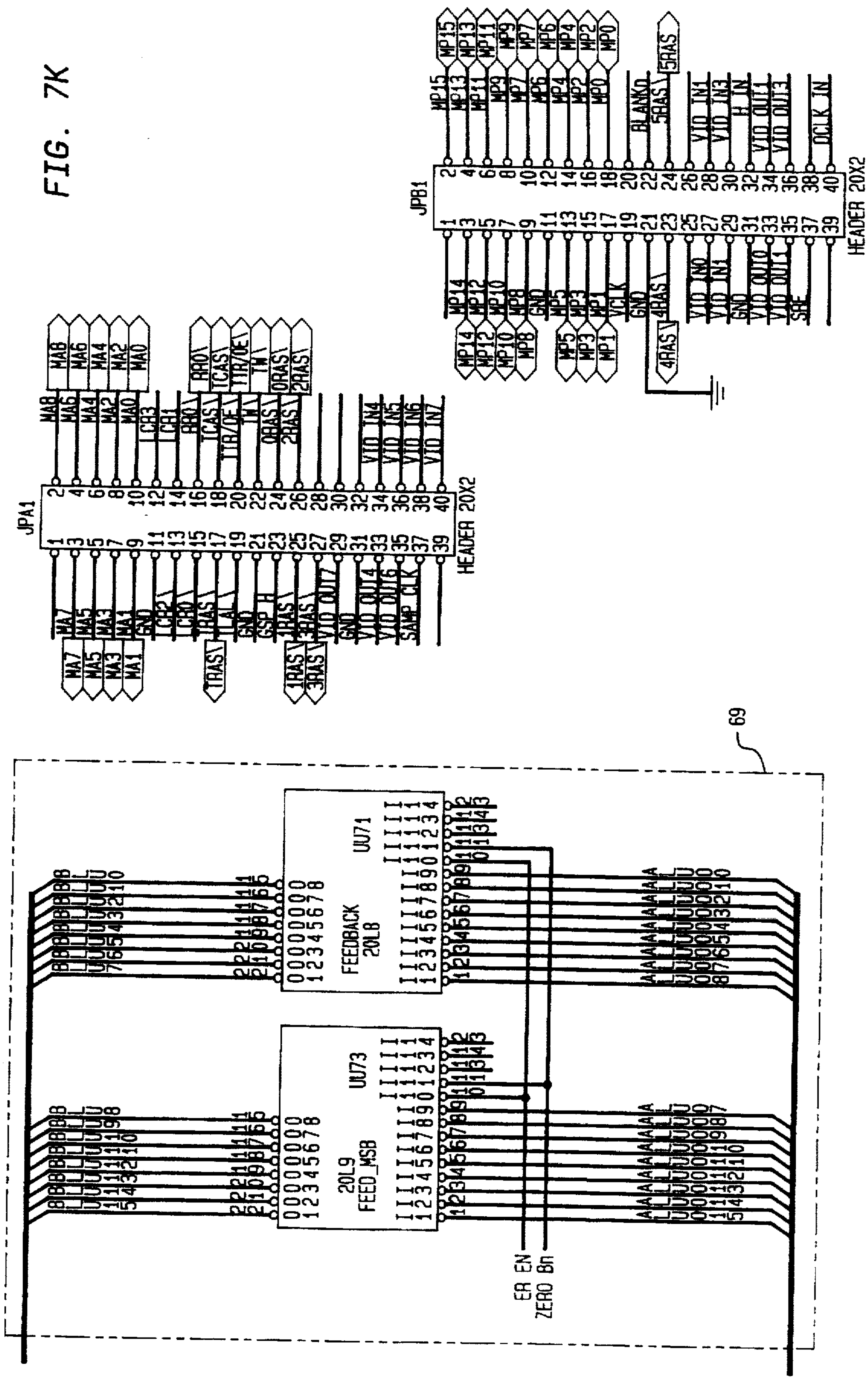
Figure 7L:
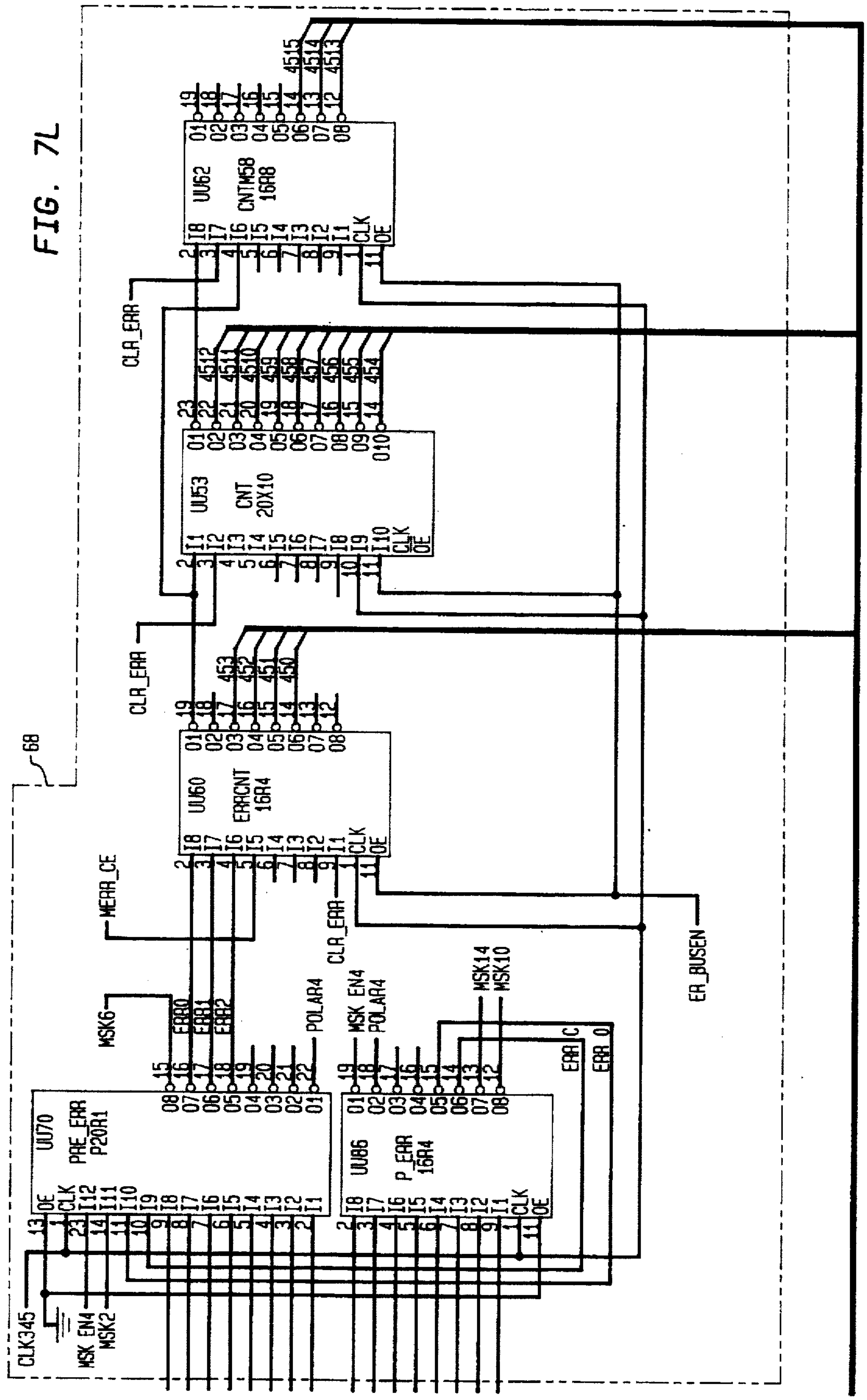

Reference is now made to FIGS. 4A and 4B, which are an intermediate level block diagram illustrations of RT video ALU 34, graphic processor 30 and image frame buffers 36 forming part of the system of FIG. 1. It is seen that the RT video ALU 34 includes a video input/output serializer 40 which communicates with the video interface 18 receiving from it and/or sending to it a stream of pixels. Serializer 40 converts the speed of the stream of pixels by converting every four four-bit pixels from the video ALU 34 into one, sixteen-bit pixel and vice versa. Serializer 40 outputs to an ALU 42. It receives a clocking input from synchronization control circuitry 44, which has a "sync in" input from video interface 18 and a data/sync control output to a corresponding input (shown in detail in FIGS. 5A–5E and FIGS. 7A–7L in the graphic processor 30.

A bus multiplexer 46 interfaces with serializer 40 and also interfaces via separate digital video channels with a CURRENT/PREVIOUS frame buffer 48, a PREVIOUS/CURRENT frame buffer 50 and an EXPECTED frame buffer 52. EXPECTED frame buffer 52 also interfaces with a second serializer 54, which outputs to ALU 42. The second serializer 54 is typically operative to enable communication with monitors with eight-bit pixels.

ALU 42 outputs to a pair of AND gate assemblies 56 and 58, each of which also receives a respective output from XOR gate assemblies 60 and 62. XOR gate assemblies 60 and 62 each receive an input from a multiplexer (MUX) 64, which interfaces with a MASK frame buffer 66. Multiplexer 64 also provides an output to an error counter 68, which also interfaces with a DIFRNCES (previous/current) frame buffer 70 which receives the output of AND gate assembly 58. The output of AND gate assembly 56 is supplied to a DIFRNCES (current/previous) frame buffer 72. A feedback register circuit (PIPE) 69 provides a feedback from a C output of ALU 42 to the B input thereof.

Graphic processor 30 includes a graphic processing unit 74 which interfaces with the host computer 26. Graphic processing unit (GPU) 74 communicates via a data/address bus 82 with control registers 84, a DRAM 86, typically of 1 Mbyte capacity. Graphic processing unit 74 also communicates via a control bus 96 with Memory Bank (MB) select timing and control circuitry 98.

The operation of the circuitry of FIGS. 4A and 4B will now be described briefly. It is seen that the RT video ALU 34 is a processing unit capable of performing various arithmetic and logic operations on frame buffers 36, including XOR, arithmetic addition and error counting.

The operands originate either from the video input/output serializer 40, or from one of three operand buffers 48, 50 and 52. Results are stored in one of the result frame buffers 70 and 72.

Frame buffer 66 contains four separate downloadable mask planes that may be employed using the multiplexer 64 and logic elements 60, 62, 56 and 58, to include or exclude parts of the frame buffer from any computation. Four mask planes can be stored at one time and new ones can be downloaded from the host computer 26 via graphic processor 30 as necessary.

Graphic processor 30 is operative to control, via control registers 84 and MB select timing and control circuitry 98, all RT video ALU 34 operations as well as the operations of frame buffers 48, 50, 52, 66, 70 and 72. Graphic processing unit 74 accesses, loads, reads and performs other operations on each of the frame buffers 48, 50, 52, 66, 70 and 72 via data/address bus 82.

Graphic processor 30 and RT video ALU 34 operations may be carried out in parallel. A DRAM 86 is employed to store programs and data to be utilized, as necessary, by GPU 74.

Error counter 68 typically continuously counts the number of times a comparison made by ALU 42 between two operands produces a non-zero value. For every comparison, regardless of the result, the value of error counter 68 is written to frame buffer 70.

Video I/O serializer 40 streams video data to/from the video interface 18 (FIG. 1). Sync control circuitry 44 provides all necessary timing signals and provides a data/ sync control signal, composed of 4 signals, which is used by graphic interface 18 for properly registering each video frame in frame buffers 48 or 50 such that each pixel of each video frame is located in the frame buffer location allocated to it.

Reference is now made to FIGS. 5A–5E, which illustrate graphic processor 30 in schematic form. The full specification of all of the circuit components appears in the drawing and therefore, for reasons of conciseness, a verbatim description thereof is not provided here.

Reference is now made to FIGS. 6A–6H, which illustrate image frame buffers 36 in schematic form. The full specification of all of the circuit components appears in the drawing and therefore, for reasons Of conciseness, a verbatim description thereof is not provided here.

Reference is now made to FIGS. 7A–7L, which illustrate RT video ALU circuitry 34 in schematic form. The full specification of all of the circuit components appears in the drawings and therefore, for reasons of conciseness, a verbatim description thereof is not provided here.

Firmware for the Programming Array Logic (PAL) elements of FIGS. 5A–5E, 6A–6H and 7A–7L is set forth in Annex A.

Figure 8:
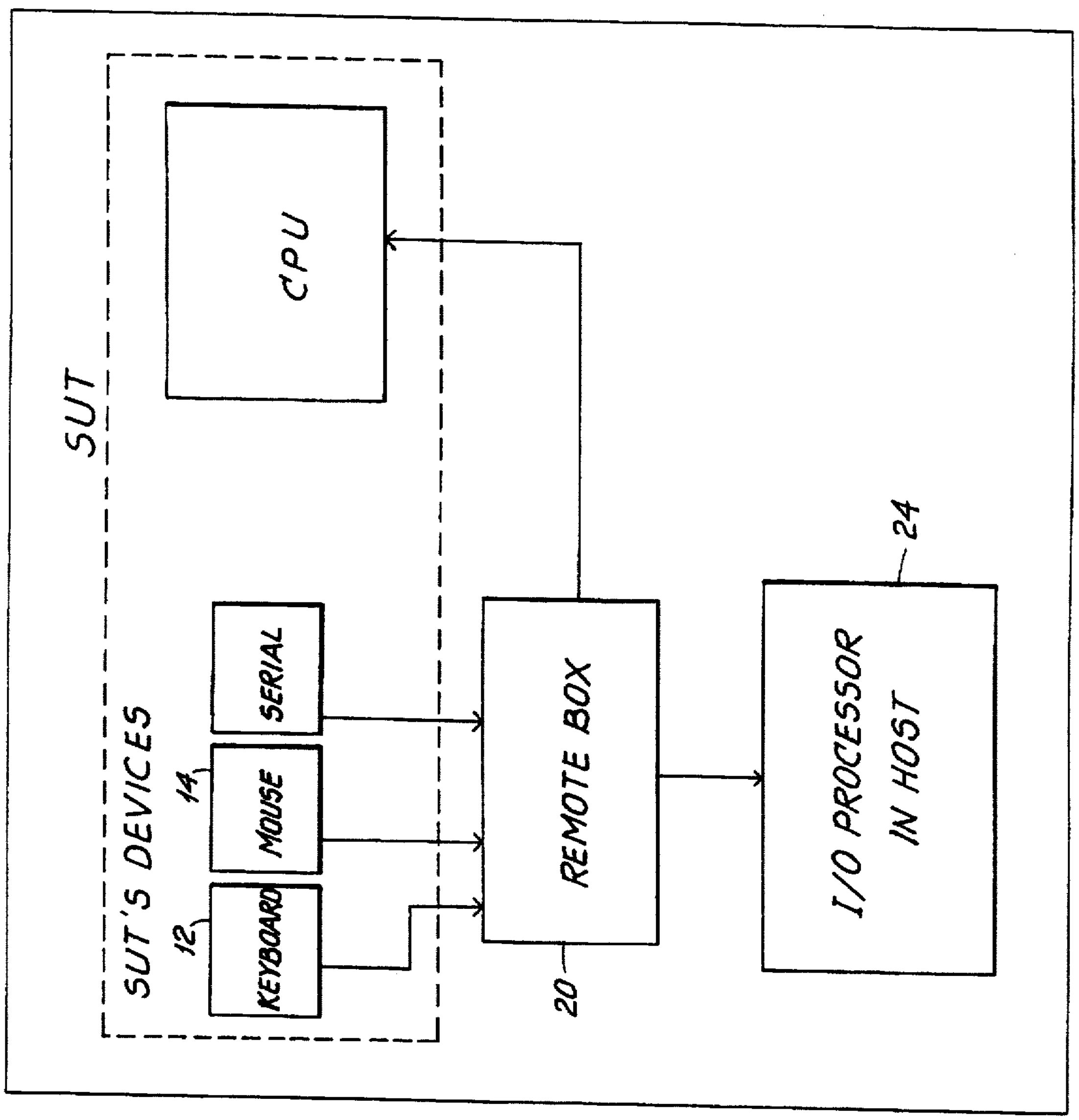
FIG. 8 is a block diagram illustration of the I/O processor and the remote connection box forming part of the system of FIG. 1.

Reference is now made to FIG. 8, which is a block diagram illustration of the I/O processor 24 and the remote connection box 20 forming part of the system of FIG. 1. I/O processor 24 controls the functions of remote box 20, in that it controls a switch in remote box 20 which directs input signals from the keyboard 12 and device 14 to the SUT's CPU 10 or to I/O processor 24. Remote box 20 can also direct signals from I/O processor 24 to the SUT's CPU 10.

Figure 9:
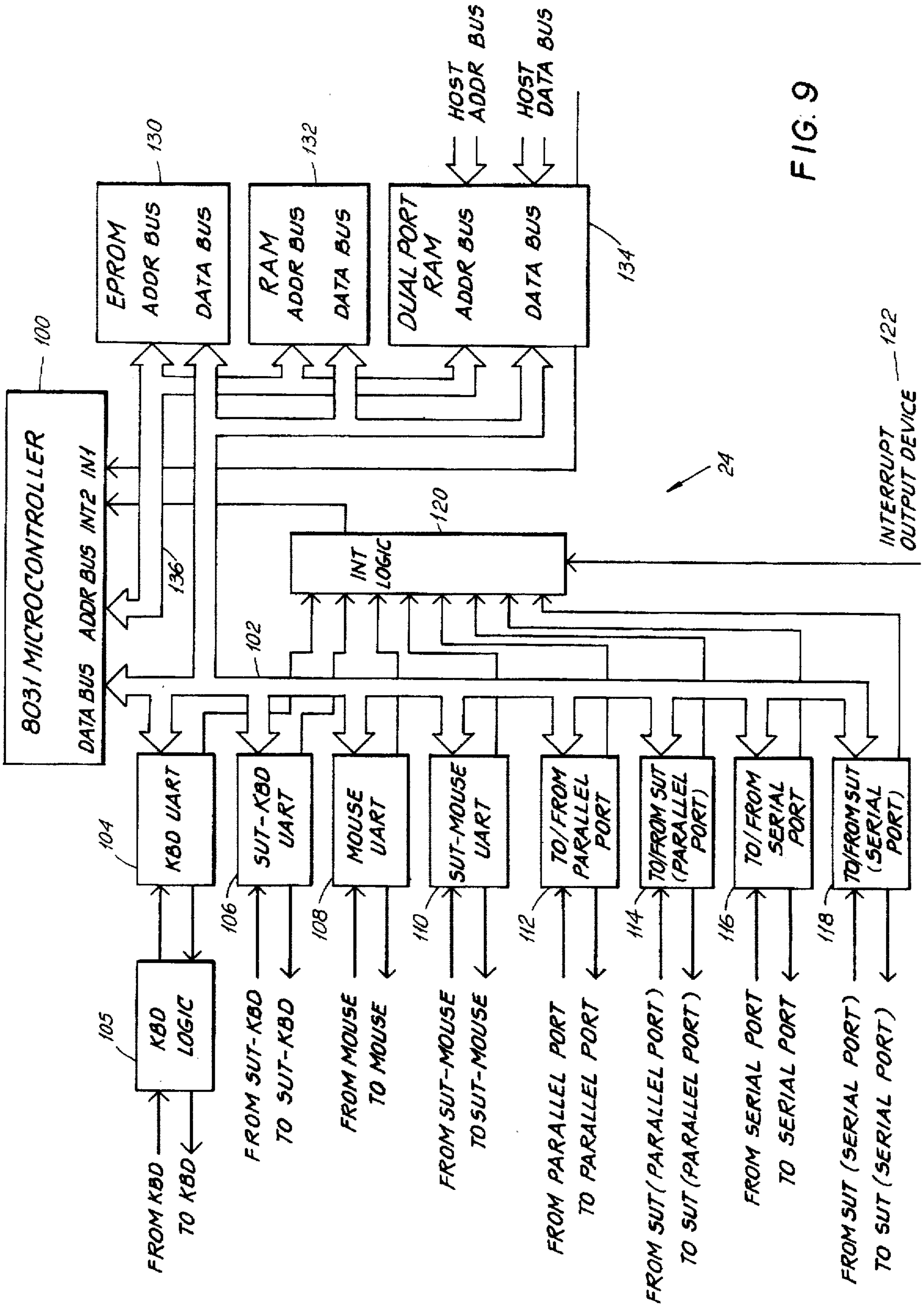
FIG. 9 is an intermediate level block diagram illustration of the I/O processor forming part of the system of FIG. 1.

The I/O processor 24 is illustrated in intermediate block diagram form in FIG. 9 and is seen to comprise a microcontroller 100 which is coupled via a data bus 102 with a plurality of interface elements. The interface elements include the following:

a KBD UART 104, which communicates via a KBD interface 105 with a keyboard (KBD);

a SUT-KBD UART 106, which communicates with a SUT-KBD mouse UART 108, which communicates with a mouse;

a SUT-mouse UART 110, which communicates with a SUT-mouse;

a To/From Parallel Port circuit 112, which communicates with a parallel port of host computer 26;

a To/From SUT Parallel Port circuit 114, which communicates with a parallel port of the SUT 19;

a To/From Serial Port circuit 116, which communicates with a serial port of host computer 26; and a To/From SUT Serial Port circuit 118, which communicates with a serial port of the SUT;

The circuits 104, 106, 108, 110, 112, 114, 116 and 118 each provide an input to internal logic circuitry 120, which receives an interrupt signal from an interrupt output device 122 and outputs to microcontroller 100.

Data bus 102 also communicates with an EPROM 130, a RAM 132 and a dual port RAM 134, which also communicate with the microcontroller 100 via an address bus 136.

The I/O processor 24 is operative to read the input events coming from keyboard 12 and device 14 via connection box 20, temporarily store them and eventually send them to the ports of SUT 19 and of host computer 26 for storage as part of the test sequence. While doing this the I/O processor also records the timing between events which is then passed on to the host 26.

Another mode of operation is a sequence of I/O and timing events sent to the I/O processor 24 by means of dual port RAM 134 (FIG. 9) to be replayed to the SUT. The I/O processor then sends these events, with the correct timings, to the SUT ports via the connection box 20. Dual port RAM 134 is employed as a bidirectional FIFO between host 26 and I/O processor 24.

Firmware for EPROM 130 is set forth in Annex C.

Figure 10A:
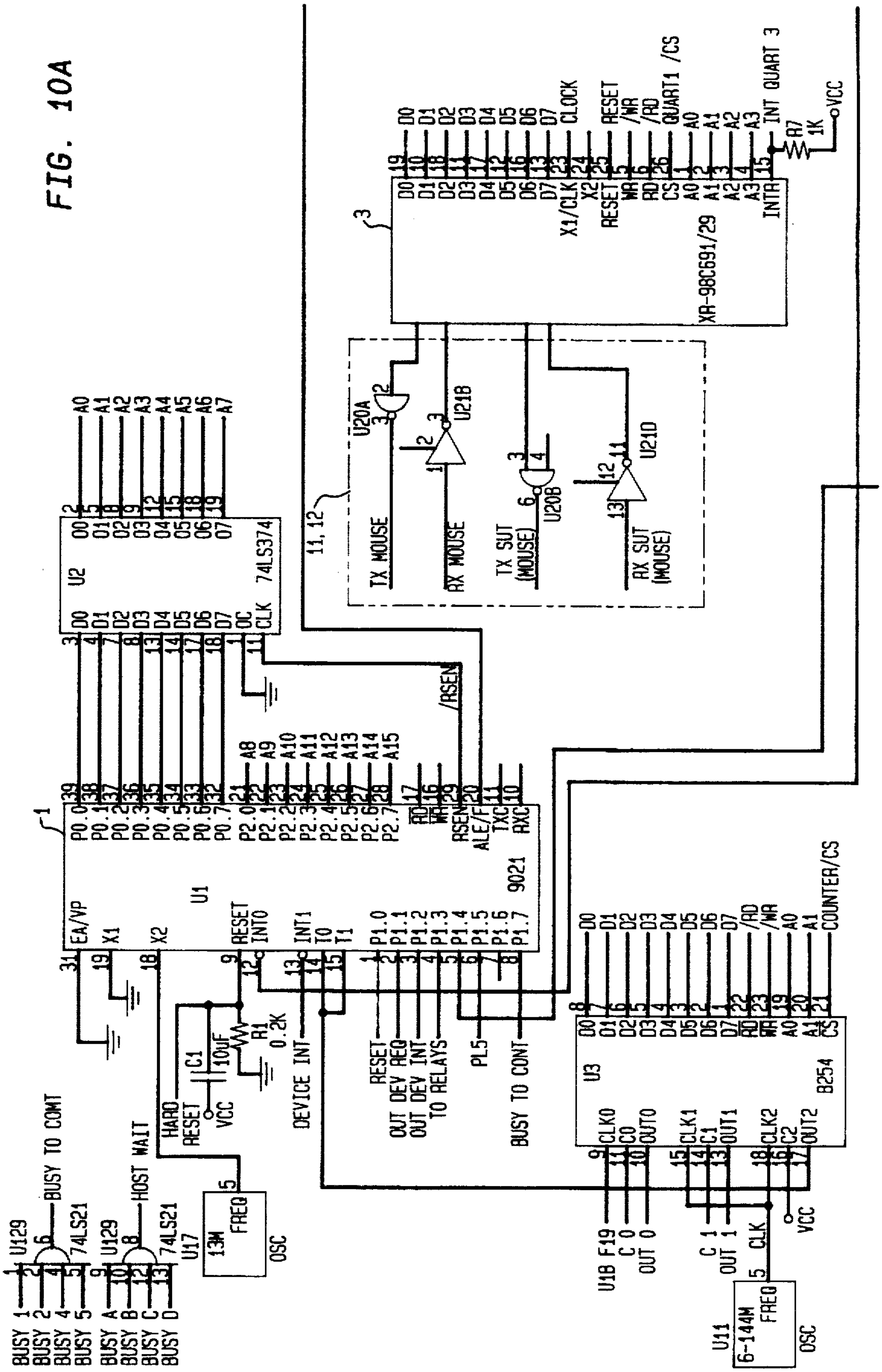
FIGS. 10A, 10B, 10C, 10D, 10E and 10F are schematic illustrations of the I/O processor of FIG. 9.
Figure 10B:
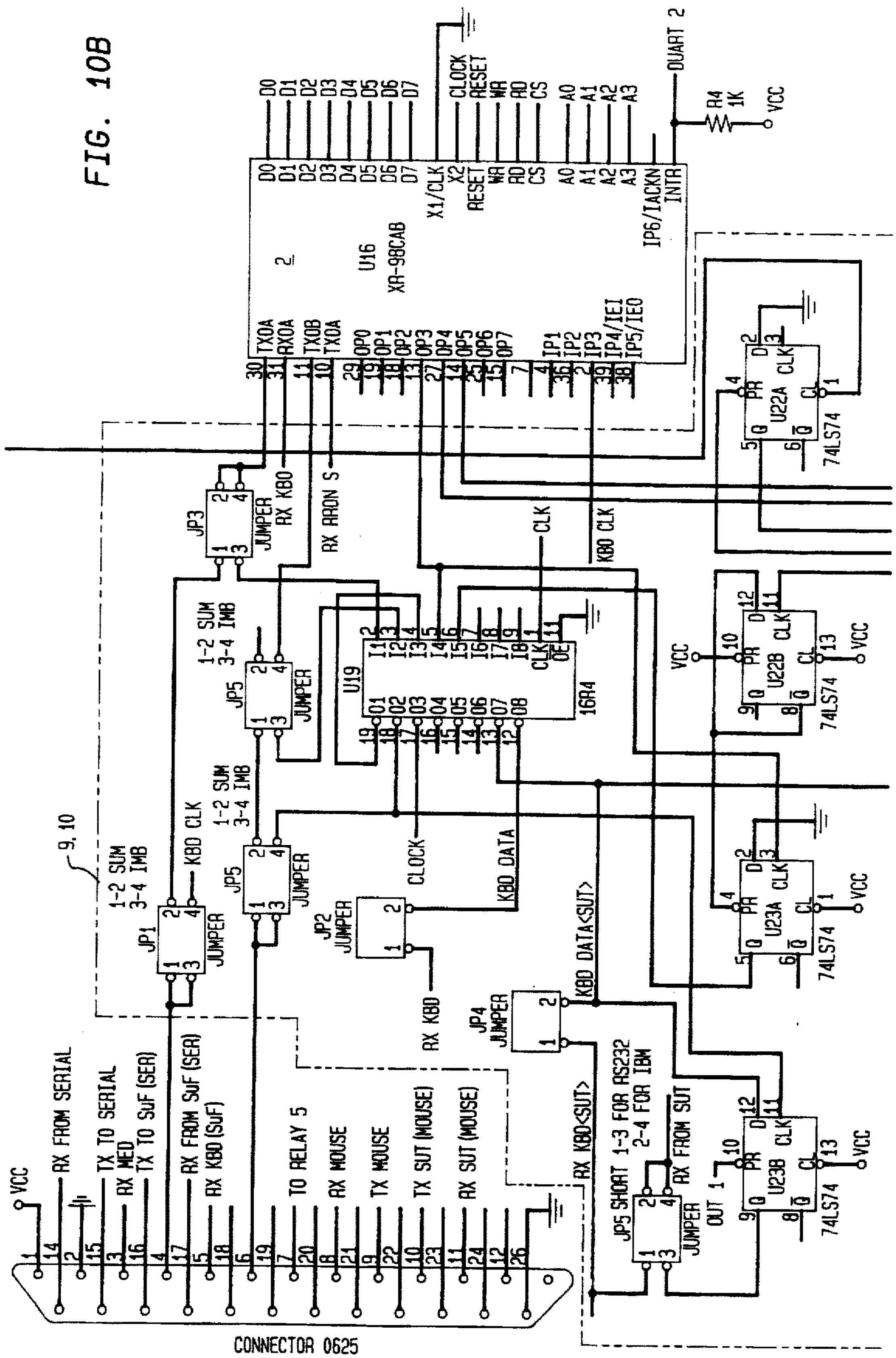
Figure 10C:
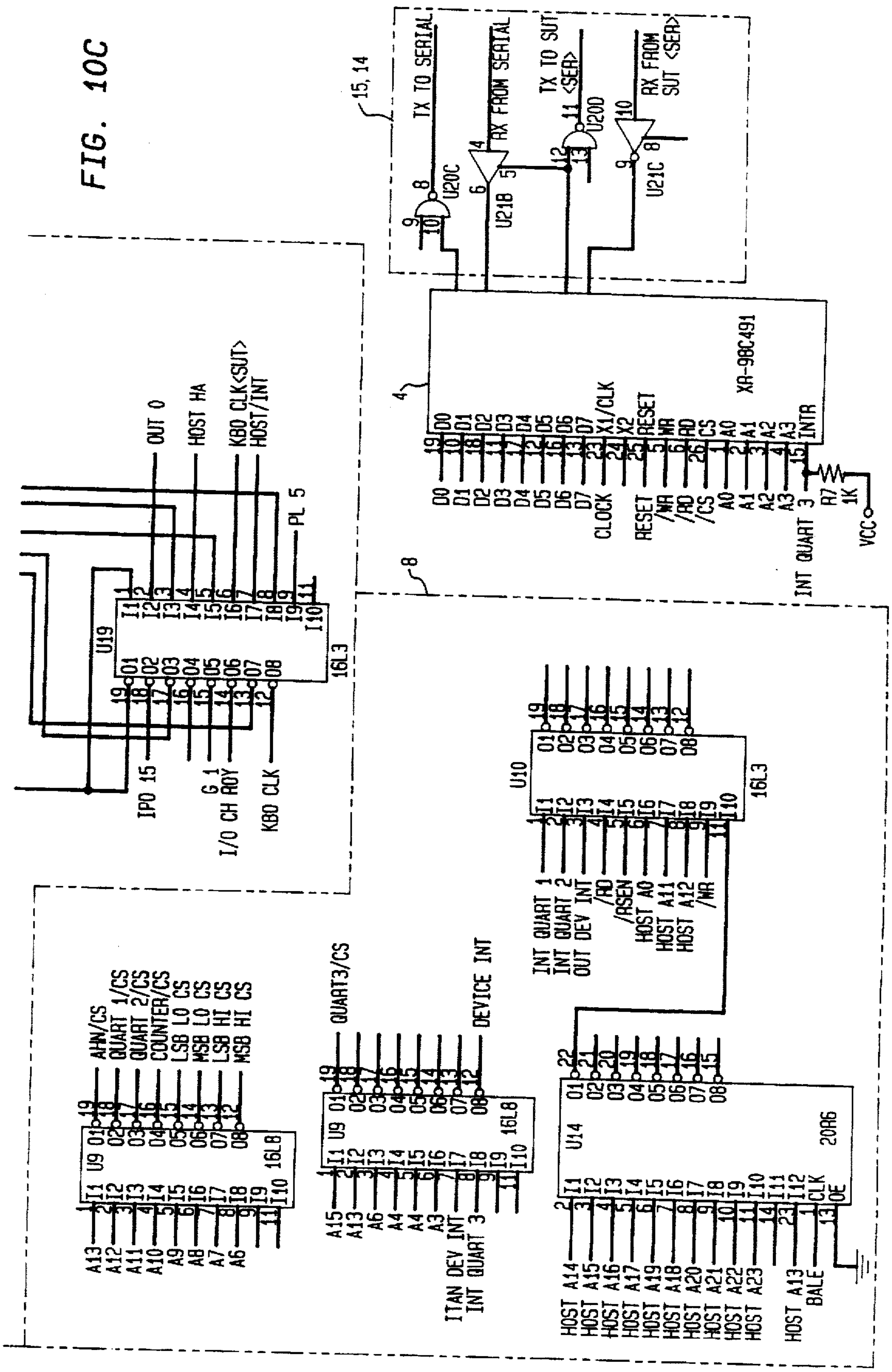
Figure 10D:
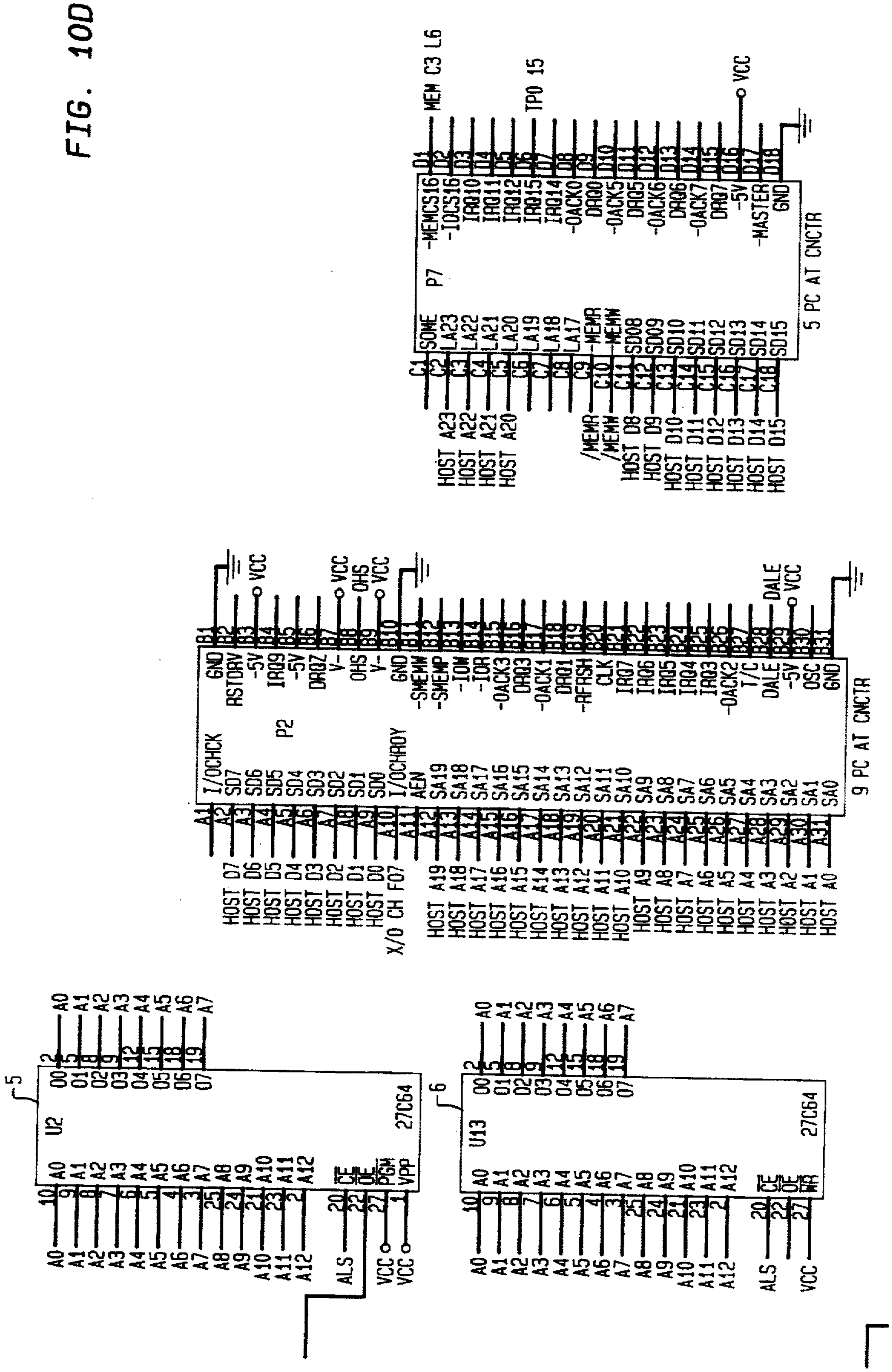
Figure 10E:
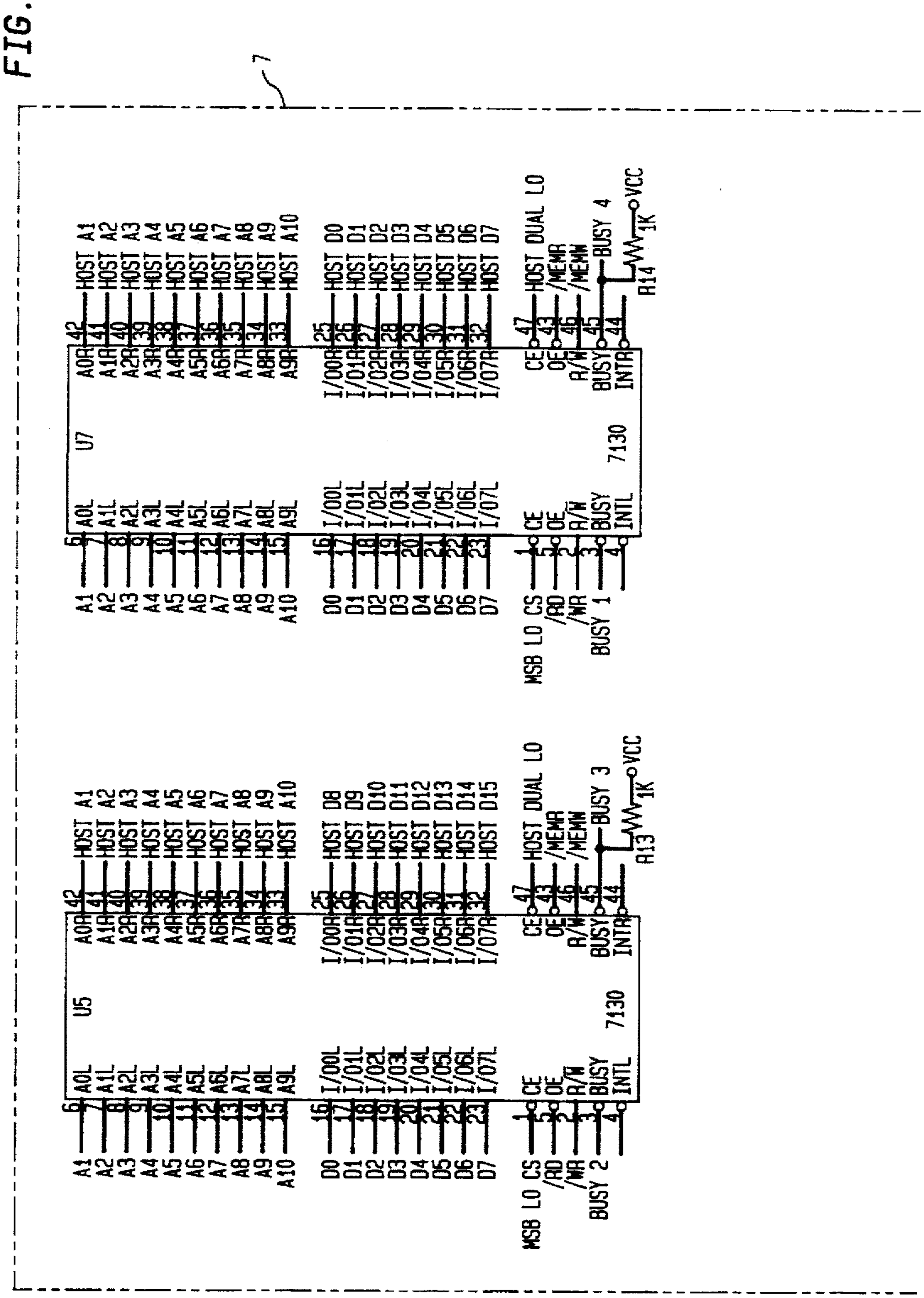
Figure 10F:
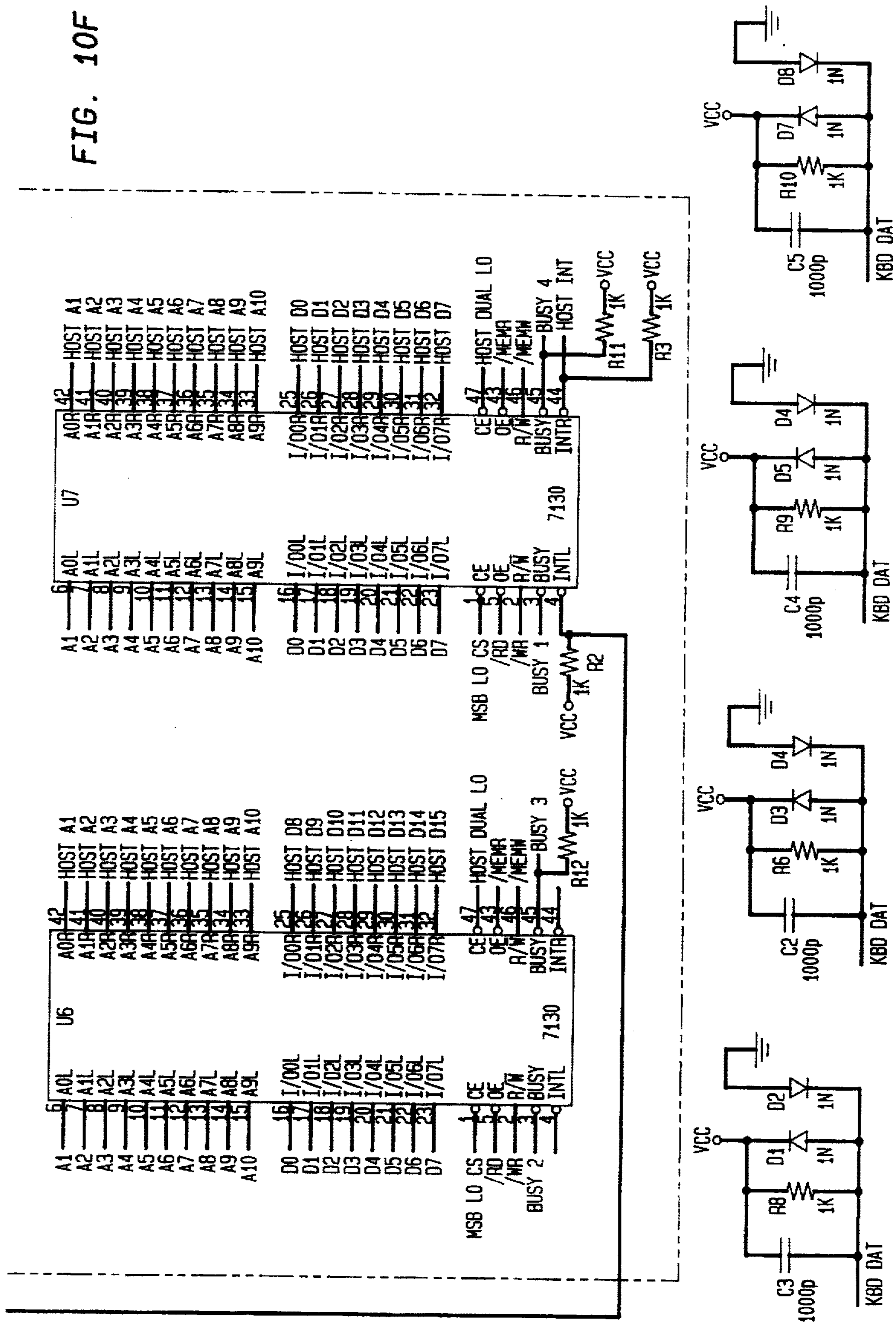

Reference is now made to FIGS. 10A–10F which illustrate the I/O processor circuitry 24 in schematic form. The full specification of all of the circuit components appears in the drawing and therefore, for reasons of conciseness, a verbatim description thereof is not provided here. Firmware for the PALs of FIGS. 10–10F is set forth in Annex B.

Figure 11:
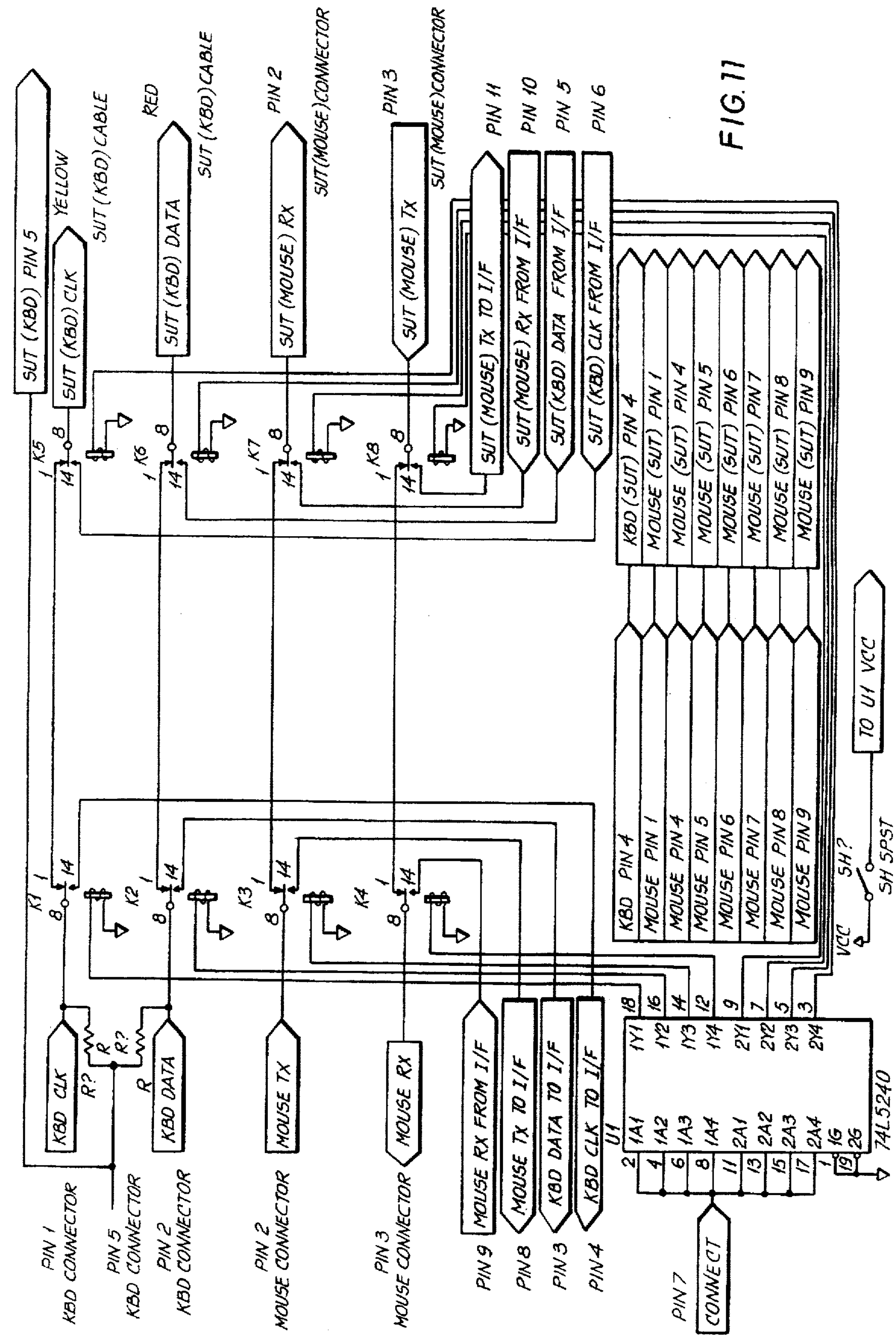
FIG. 11 is a schematic illustration of the remote connection box forming part of the system of FIG. 1.

Reference is now made to FIG. 11, which illustrates the remote connection box 20 in schematic form. The full specification of all of the circuit components appears in the drawings and therefore, for reasons of conciseness, a verbatim description thereof is not provided here.

Referring back to FIGS. 4A and 4B, a method and apparatus for providing operations on frame buffers in real time, whereby the contents of operands frame buffers are selected and selectably directed to A and B inputs of the ALU 42, will now be described in detail:

A result frame buffer 70 or 72 is selected.

A mask is set in frame buffer 66 and is activated by setting the controls MSK-SEL 0 to MSK-SEL 3, MSK-EN4, and MSK-EN5 of multiplexer 64 and gate assemblies 56 and 58, respectively. Through operation of the mask, parts of the frame buffer will be excluded from participation in the operation.

A specific operation is selected by setting FLU 0 to FLU 3 controls on ALU 42.

The above-mentioned actions occur simultaneously during the gap between two consecutive frames, i.e. during the conventional "vertical blank period", and the operation takes place on the frame which arrives after the controls have been set.

As noted above, the present invention provides various operative features including those listed hereinbelow. Descriptions of these features, with reference to the drawings, particularly to FIGS. 4A and 4B, as well as to the software employed therewith will now be provided. The features are as follows:

Sampling real pixel values from the frame buffer of the system under test;

Performing comparisons and other operations on frame buffer contents in real time;

Using screen signatures for comparisons;

Incremental error counting;

Determining screen stability;

Determination of minimum response time of system under test to given commands;

Output synchronization;

Conditional testing; and

Treatment of asynchronous events.

Sampling of Video Frame from the SUT Graphic Output Circuitry 16

When it is desired to capture the image currently on SUT's monitor 22, the custom video interface 18 retrieves the frame currently stored in the SUT graphic output circuitry 16 and outputs it as a digital video signal to serializer 40.

The digital video from video interface 18 streams to serializer 40, wherein the input stream is converted from serial to parallel and every 4 pixels of 4 bits are converted to one 16 bit word. This stream of pixel quartets is directed either to the A input of ALU 42, or through port A of bus multiplexer 46, to any of frame buffers 48, 50 or 52, or via the second serializer 54 to input B of ALU 42. Bus multiplexer 46 is a switching board capable of directing any port A, B, C, D to any other port.

If it is desired to use video signals stored in frame buffers 48, 50 or 52, the data can be streamed through bus multiplexer 46 to serializer 40 which then outputs the data to ALU 42. The data remains as pixel quartets.

Each of frame buffers 48, 50 and 52 can be set to one of three modes: read mode, write mode and open mode. In read mode, data is read from memory, in write mode, data is read into memory, and in open mode the frame buffer is not active. In order to read the video stream into a designated frame buffer, that frame buffer must be set to write mode.

Serializer 54 can perform equivalent functions independent of serializer 40, such that two different 4 bit per pixel video sources may be sampled simultaneously. Each serializer can also be used to output video data from frame buffers 48, 50 and 52 to a display device. Serializers 40 and 54 are controlled by sync control module 44.

The operations described hereinabove and hereinbelow are typically controlled by GPU 74 through the setting of control registers 84.

Performing Comparisons and Other Operations on Frame Buffer Contents in Real Time The GPU 74 can directly write a reference frame into any one of frame buffers 48, 50 or 52 or it can be written via the video frame sampling procedure described hereinabove.

To perform a comparison or any other operation, the following hardware settings should be loaded from GPU 74 into the control registers 84:

A. The frame buffer 48 is set to its read mode.

B. The mode of bus MUX 46 is set to direct data from port D to port B.

C. Serializer 54 is designated to transfer incoming data from port B of bus MUX 46 to port B of ALU 42.

D. Serializer 40 directs incoming video signals to port A of ALU 42.

E. ALU 42 is set to XOR.

F. By setting MUX 64, a mask is selected. In addition, depending on the desired destination of the result, control 56 or 58 should be selected.

G. A result frame buffer, frame buffer 72 in this example, is set to its write mode.

The above settings are made via control registers 84 and are synchronized to the video input so that the setting occurs in the gap between two consecutive video frames, termed the "vertical blank period". Beginning at the start of the immediately following frame, a pixel-wise XOR operation will then be performed between the reference frame buffer 48 and the incoming video signal. The results are stored in frame buffer 72.

Using Screen Signatures for Comparisons

Screen signatures are generally compact representations of screen information that utilize a very small memory space for storage. It is possible that two different screens might have identical signatures but the incidence of that is extremely low. Thus, in accordance with the present invention, screen signatures, rather than the entire screen, can be used for storage and comparisons.

An area of interest is set by choosing an appropriate mask and signature operation is selected through setting of the appropriate control registers 84.

The signature operation may employ a "check-sum" operation, i.e., quartets of pixels are added via a modulo 16 arithmetic operation. The incremental result after every 4 pixels is known as a signature word and is stored in one of the result frame buffers 70 or 72. The actual screen signature is a vector of signature words.

The video output from serializer 40 is directed to input A of ALU 42 for summation with input B of ALU 42. The output from the ALU 42 is streamed via feedback register 69 to the input B of ALU 42. Thus, the output of ALU 42 is the running sum, or checksum, of the video signal.

The signature words are stored on the result frame buffer 70. Each location on frame buffer 70 stores the running sum of all the pixels beginning with the first pixel on the frame and ending with the pixel which resides in that location, exclusive of masked areas on the screen.

By utilizing the GPU 74, the signature data can be further processed to generate the actual signature of a screen.

In accordance with a preferred embodiment of the invention, signatures are calculated utilizing a technique including the following steps:

1. An input frame buffer, either directly from the input video or from one of the frame buffers 48 or 50 is divided into N×N rectangles.

2. One signature word is computed, by means of hardware and graphic processor software, for each rectangle. In other words:

loop i=N×N times where:

a. a mask is set to include only rectangle i.

b. signature computations take place as above.

c. The signature word from the last location in the frame buffer is stored as the i-th signature element.

3. The signature of N×N words, rather than a whole screen, is saved in a data base of host computer 26 and is used for comparisons. Comparisons are done between signatures rather than between screens.

It is appreciated that screen comparisons are essential operations to a regression test execution process. Such a process compares screens at a number of steps during the operation of a program under test. It is therefore necessary to store a large number of reference screens against which the screens of the program under test will be compared. Storing and comparing screen signatures saves storage space and time and, although the amount of information stored using signatures is considerably less (typically by a factor of approximately 1000) than would be the case were the entire screens stored, the screen signature operation is very reliable. As differences occur, they are noted. The technique may be summarized by the following steps:

a. a screen to be checked is captured.

b. signature computations are performed.

c. the signature is compared to the reference, element by element, by means of GPU 74.

d. in the event of dissimilar elements, the corresponding rectangle is flagged.

e. The actual screen to be checked is made available and the dissimilar areas are indicated to the user by means of the graphic display. It will be noted that the original reference screen is represented only by a small signature in memory.

The use of screen signatures greatly enhances the capability of the system to store test results.

Incremental Error Counting

Reference is made to the description hereinabove regarding performance of comparisons on frame buffer contents in real time. If the following additional hardware settings are implemented:

H. Frame buffer 70 is set to write mode

I. Error counter 68 control is set to "on", the error counter 68 will count and write, for each location of frame buffer 70, the incremental number of pixel mismatches found up to that point since the beginning of the frame.

As mentioned hereinabove, MUX 64 can access four different masks. By selecting a suitable setting for MUX 64 and for gate assemblies 56 and 58, a separate mask can be implemented for error counter operation independent of the mask set for the comparison operation.

Incremental error counter 68 is operative to count the errors on a pixel-to-pixel basis. Error counter 68, utilizing the results of the XOR operation carried out by ALU 42, counts the non-zero results and continuously stores, in the frame buffer 70, the current number of errors. The error counter 68 is used to read the number of mismatches occurring within a certain area of interest and to support fast identification of moving objects on the screen by monitoring consecutive changing screens.

Because error counter 68 continuously writes the incremental number of mismatches existing in a frame, it indicates in one reading whether two frames are identical (i.e. if the error value is 0 in the last pixel location of the result frame, the two frames are identical). Error counter 68 does not increment within masked out parts of the screen.

Screen Stability Determination

It may be desirable to determine whether an input screen is stable before certain operations are performed. A stable screen is one which has not changed substantially for a user-defined period of time, known as the "stability time period".

The stability time period is translated into the stability parameter, being the number of frames occurring during that time period, and is stored in the GPU 74 software. The current screen is read from the digital video port into frame buffer 48.

The following procedure may be followed:

1. A comparison is made between typically a masked version of the current video frame and the reference frame stored in frame buffer 48. The masking is done so as to concentrate on the areas of the screen where changes are anticipated. Areas where changes will occur due to cursor or mouse movements are typically masked out. The error counter 68 is read at the end of the comparison and if the value read is 0, indicating that the unmasked portions of the frames are identical, a stability counter typically maintained in software is incremented.

2. If the stability counter contents equals the stability parameter, a stability flag is set to "true" and the system returns to step 1.

3. If the error counter value is non-zero, indicating that the frames are not identical, the system proceeds to step 4.

4. The stability flag is set to "false."

5. The stability counter is set to zero.

6. The system reads the current screen from the serializer 40 to frame buffer 48 and then returns to step 1.

Determination of Minimum Response Time of SUT to Given Commands

The system of the present invention is capable of measuring the time interim between any two commands. To that end, before testing the SUT, the user records a sequence of commands which are stored in a data base of host computer 26. It will be appreciated that the minimum response time to a given command must be recorded, rather than the user's response time since a user may delay between commands. The minimum response time is necessary so as to shorten the SUT testing process.

By monitoring screen stability, the apparatus of the present invention measures the minimal time required to perform the activity requested by the most recent command. A preferred implementation of the above is achieved as follows:

When the user issues the next command to the SUT, the system software counts the number of elapsed frames until the screen reaches stability. Once the screen reaches stability, the SUT is ready for another command. Thus, the number of elapsed frames is the minimal response time for the issued command and is the time used in the replay when testing the SUT.

Output Synchronization

Reference is now made to FIGS. 20A, 20B, 21A and 21B which illustrate two types of output synchronization operations. The output synchronization feature is based on the fact that interactive applications are designed to indicate to the user when the application is ready for the next input. The mechanism of output synchronization uses information from a current screen to schedule the next input event. A principal benefit is that test input flow is tuned to the SUT response.

The synchronization mechanism may utilize three synchronization techniques:

1. Time dependent event scheduling (input synchronization). This technique is known in the art and is based upon measurement of the time intervals between events.

2. Automatic synchronization based on screen signatures; and

3. Synchronization points based on user defined objects.

The latter two techniques are believed to be preferred and will now be described in further detail.

Automatic Synchronization

Automatic synchronization based on signatures requires minimal user intervention. At the beginning of a session the user defines "synchronization hot keys:" (keys such as carriage return (CR), and mouse clicks). During the recording of a test, after any hot key, the following procedure is executed:

a. The next input event is captured by the remote connection box 20 and stored in the host computer 26. It is not yet released to the SUT. Thus, the next input event does not yet appear on the screen.

b. A screen signature is generated.

c. The input event is released to the SUT.

During the replay of a test, after any hot key, the next input is released after the corresponding screen has appeared or after a timeout period.

A preferred automatic synchronization process comprises a test recording procedure and a test replay procedure.

Figure 20A:
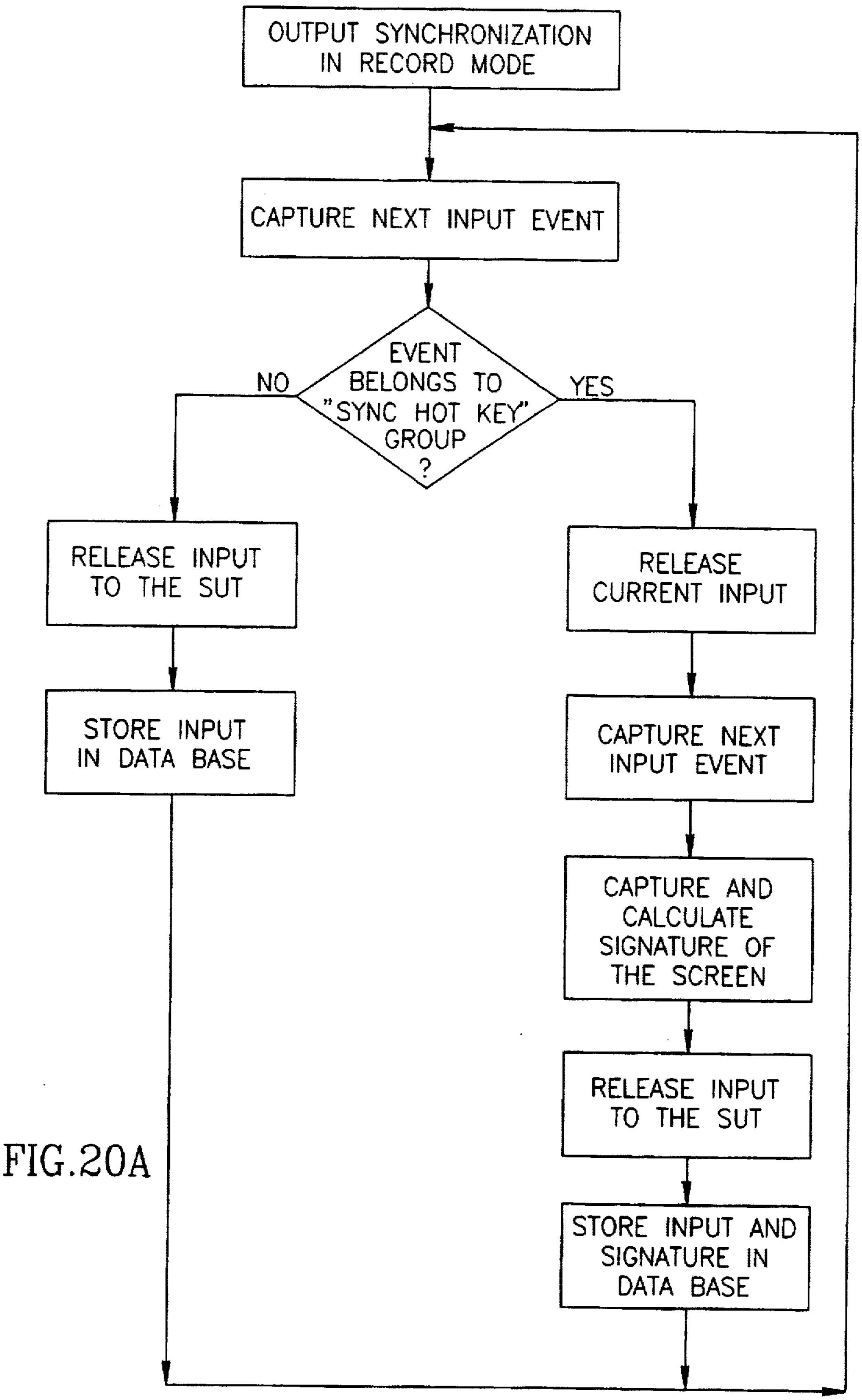
FIGS. 20A and 20B are flow chart illustrations recording and replaying, respectively, of an output synchronization operation.
Figure 20B:
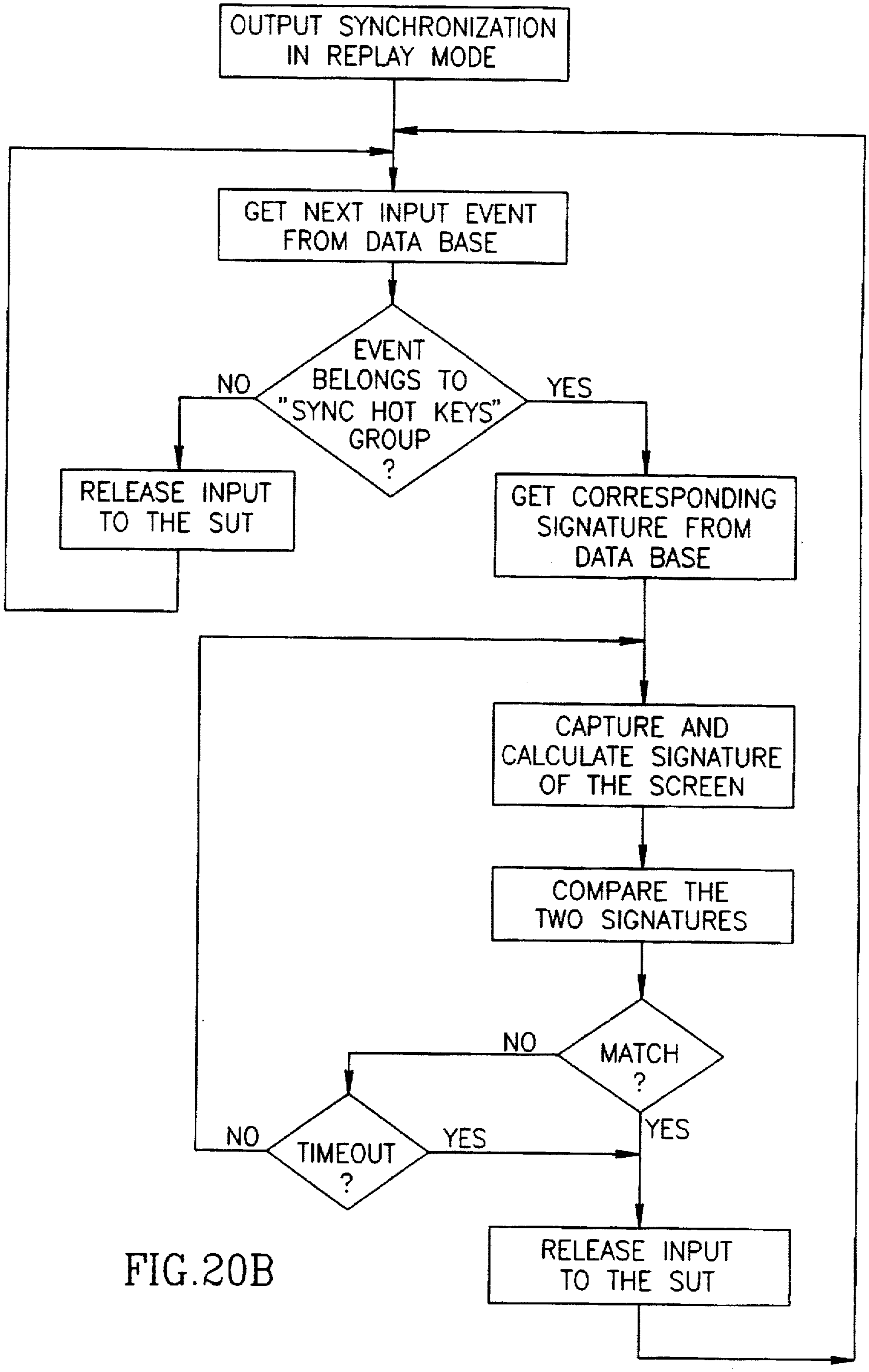

A preferred test recording procedure is as follows, reference being made to the system of FIG. 1 and to the flow chart of FIG. 20A:

1. The host computer 26 captures the next input event via PC/AT-bus 28, I/O processor 24 and connection box 20.

2. The input event is identified and if it belongs to the user defined group of "synchronization hot keys", step 3 is followed. Otherwise, step 11 is followed.

3. The input event is released and something happens on the screen. The next input event is captured as described in step 1.

4. The host computer 26 instructs the graphic processor 30 to acquire the signature of the current screen.

5. Graphic processor 30 activates RT ALU 34 and frame buffers 36 to perform a screen sampling and screen signature computation. The signature computation described hereinabove yields relatively fast results and a relatively small signature.

6. Graphic processor 30 indicates to host computer 26 that operation has been completed.

7. Host computer 26 releases the current event via PC/AT-bus 28, I/O processor 24 and connection box 20 to the SUT CPU 10.

8. The released event is stored in the memory of host computer 26.

9. Host computer 26 reads the signature from the graphic processor 30 and stores it in a location of a input stream data base corresponding to its specific location in the input stream.

10. Return to step 1.

11. The event is released to SUT CPU 10 via remote connection box 20.

12. The released event is stored as described in step 8.

13. Return to step 1.

Figure 21A:
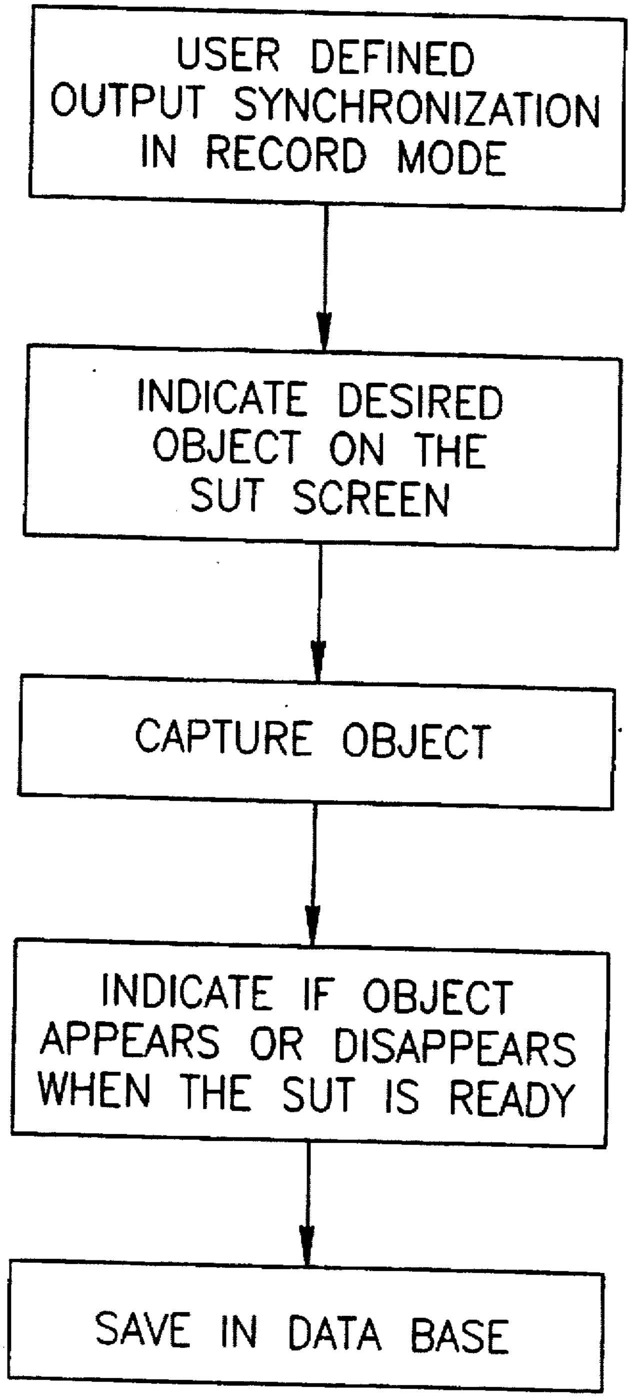
FIGS. 21A and 21B are flow chart illustrations recording and replaying, respectively, of an user-defined output synchronization operation.
Figure 21B:
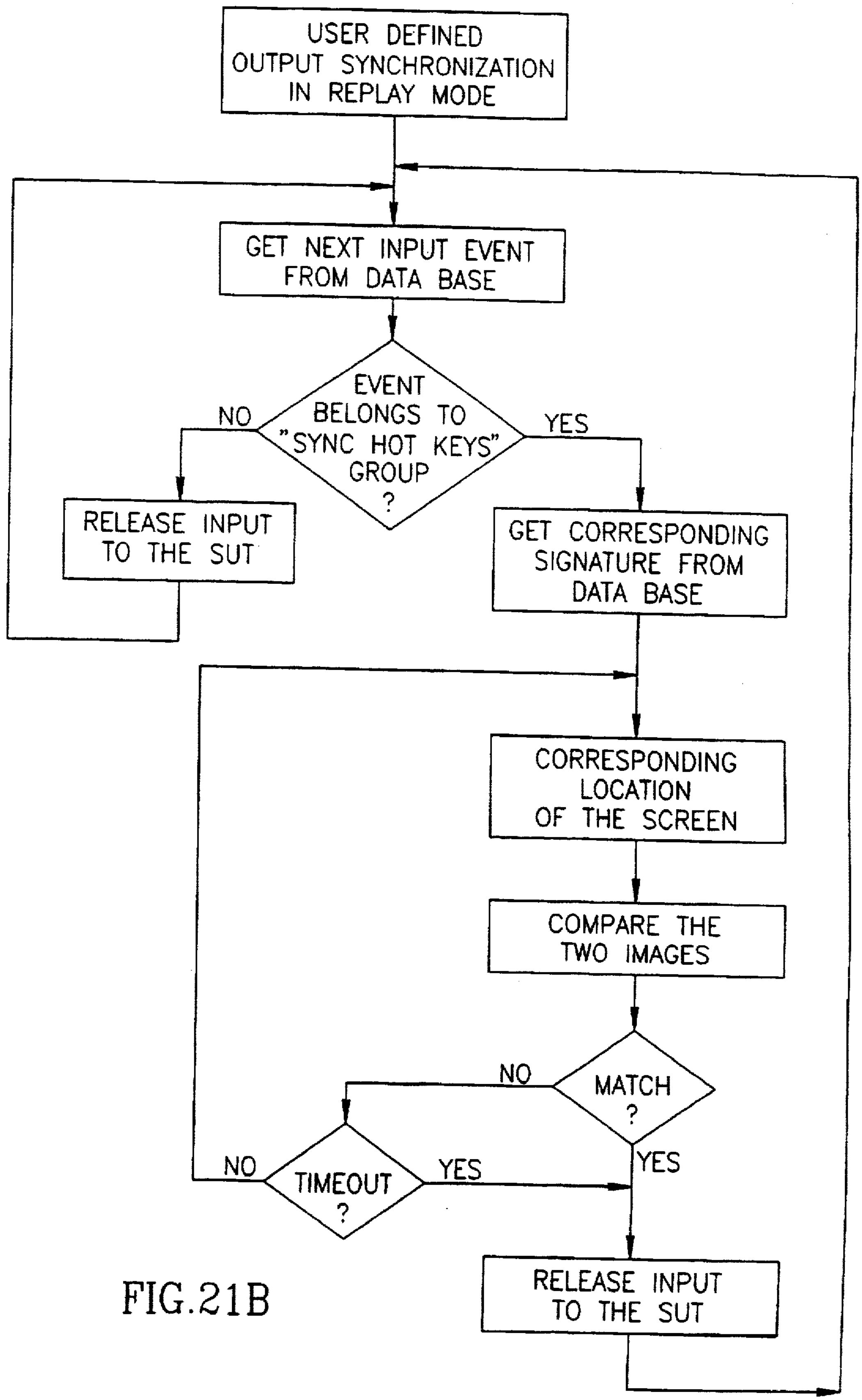

A preferred replay procedure is shown in FIG. 21B and is as follows:

1. The host computer 26 retrieves from memory the input event next to be released to the SUT.

2. The next event is identified and if it belongs to user defined group of "synchronization hot keys", step 3 is activated. If not, the event is released to the SUT as described in recording step 7 above and then the system returns to replay step 1.

3. The event is released to the SUT and the signature which corresponds to the next input event is retrieved by the host computer 26 and reported to graphic processor 30.

4. The graphic processor 30, using RT ALU 34 and image frame buffers 36, monitors the incoming video screens coming from the SUT via graphic interface 18, and the following is carried out:

a. a screen is captured.

b. a signature is computed by using the same computation as described in step 5 of the recording procedure above.

c. the result is compared to the reference signature that was input from the hot keys in replay step 3 above.

5. If a match is found, a message is generated to host computer 26. Otherwise a time-out counter, preferably implemented in software, is updated.

6. If a time-out occurs, a message is generated to host computer 26. If there is no time-out, the system returns to step 4.

7. Upon receipt of the response from graphic processor 30, the next input event is released by the host to the SUT as described above in recording step 7.

The input events to the SUT are released in a form similar to a human operator's response in that the system waits for a certain indication on the screen before releasing the event. This is independent of SUT response times which may react faster or slower.

User-Indicated Object Based Synchronization

User defined synchronization objects include, for example, a "wait" message box provided on the screen, a clock icon, etc. A principal benefit thereof is that the user informs the system that a certain screen object indicates whether or not the application is ready for input. The system captures the specified object and uses it for synchronization during replay. The location of specified objects is either fixed on the screen or connected to the locator's icon. The following recording and reply procedures are preferably provided:

Recording Procedure (see FIG. 21B)

1. The user defines "synchronization hot keys".

2. The user indicates, by means of a graphic user interface, an object on the screen.

3. Host computer 26 indicates to the graphic processor 30 to capture the object.

4. Graphic processor 30 captures the object and separates the indicated object from any marking made by the user and the graphic user interface (such as encircling of the object with lines). The graphic processor 30 sends the pixel map of the indicated object to the host computer 26 for storage. It will be noted that the user's marking is identified by the host computer 26 through recognition of the user's motions with the SUT mouse.

5. The user attributes to the captured object an indication whether the SUT is ready for the next input while the object appears on the screen.

Replay Procedure (see FIG. 21B)

1. The host computer 26 sends an input event.

2. The host computer 26 scans for hot keys as described in steps 1 and 2 of the recording procedure.

3. When hot keys are detected, the host computer 26 commands the graphic processor 30 to wait for the synchronization object to appear on or disappear from the screen.

4. Graphic processor 30 compares stored pixel maps of objects to those on the screen in order to detect specific objects, as follows:

a. Graphic processor 30 imports the object's pixel map from the memory of host computer 26.

b. Graphic processor 30 writes the object's pixel map on frame buffer 48 (FIGS. 4A and 4B) to the location from where it was imported.

c. The graphic processor places a mask which excludes from comparison all pixels that do not belong to the object's pixel map as located in frame buffer 48.

d. The graphic processor initiates a continuous comparison operation between any of the video frames and frame buffer 48.

e. The graphic processor 30 monitors the error counter 68. If its value at the end of the frame is zero, then the expected object appears on the current screen.

f. The graphic processor 30 notifies the host computer 26 that the synchronization object has appeared on the screen.

g. If the expected event fails to occur within a defined period, a timeout message is sent by the graphic processor 30 to the host computer 26.

5. Host computer 26 waits for the message and upon reception releases the next input event to the SUT.

The output synchronization principle employed by the two above-described techniques has the advantage of being sensitive to variations in the SUT's response time, in contrast to state of the art timing synchronization which is based on measuring time intervals between events.

Conditional Testing

The conditional testing feature enables decision points to be defined from which a number of action paths can be taken. The path that will be taken in a certain instance of the test execution will depends on the outcome of an intermediate test result where a test result is any information or any outcome of a computation made during the test execution whose actual value cannot be determined prior to test execution. For example, a test result might be a screen or any part of a screen which is captured during a test or it might be the amount of time measured during the test execution between any two test events, such as between an input event and an output event indicated by a certain screen.

As a further example, a function of the SUT might be characterized in that after a certain sequence of inputs, the SUT can react in one of many modes by displaying one of a plurality of messages on the screen according to some data internal to the SUT whose values cannot be determined in advance. Each message requests a different response in order to conclude the operation.

In order to test such a function of the SUT, a conditional testing procedure is most suitable, a preferred embodiment of which follows.

Recording Procedure

1. The user records an introductory input sequence which must be played prior to the SUT conditional point reaction.

2. The user sets for the SUT the unique conditions that will cause the SUT to respond in one of its possible reaction modes.

3. The user replays the input sequence of step 1 and at the end indicates to the graphic processor 30 to capture the screen and store the result.

4. The user records the response sequence of input events which are the correct response to the mode which appeared on the screen.

5. The user repeats steps 2–4 hereinabove for each of the plurality of screen displays that the SUT can display.

6. The different screens and corresponding response input sequences are associated together by means of test description constructs which are implemented within system software set forth in Annex E.

Replay Procedure

1. After the introductory input sequence is replayed, the test execution reaches the conditional point. Host computer 26 indicates to the graphic processor 30 to capture the current screen.

2. The graphic processor 30 identifies the captured screen by comparing it to each of the possible screens which have been recorded. Comparison is performed according to any of the methods described hereinabove in the sections entitled Performing comparisons and other operations and Using screen signatures for comparisons.

3. The graphic processor 30 provides the host computer 26 with the identified screen.

4. The host computer 26 replays the response sequence associated with the identified screen.

Treatment of Asynchronous Events

Asynchronous events are events regarding the status of an application which have a time of occurrence which cannot be predicted in advance. An example of this type of event is the following: Software working with a modem may display at any time a "modem busy" prompt. This prompt requires a particular response from the user to remove it from the screen. The problems associated with asynchronous events include: a) the SUT's response is not the same during replay as during record; and b) due to their nondeterministic nature, asynchronous events are more difficult to test.

In accordance with a preferred embodiment of the present invention asynchronous events are treated as exceptions, i.e. as interrupts. Asynchronous events are regarded as being related to the test flow just as hardware interrupts are related to a conventional program flow. A preferred method based on this solution is, briefly, as follows:

1. The user identifies to the system screen objects that correspond to asynchronous events.

2. For each object the user records a response sequence of "input events".

3. The data is preprocessed.

4. The system continuously monitors for the appearance of any of the indicated objects.

5. Upon detection of one of the indicated objects, the context of the current test is saved, the response sequence is replayed, the test context is retrieved and the test is continued.

Steps 1 and 2 above are preparation steps which involve the user. Step 1 is based upon step 2 of the recording procedure forming part of the user defined object synchronization technique described above.

Step 2 involves recording input events via the connection box 20 and the I/O processor 24 and storing the input events in a database.

The objects and their corresponding response sequences are caused to be associated by means, of data base software on the host computer 26 in FIG. 1. The data base software is incorporated in the system software set forth in Annex E.

Steps 3 and 4 form part of the algorithm which is described hereinbelow in detail.

Step 5 describes the sequence of actions taken upon the detection of an asynchronous event. The exact nature of the actions would be defined by the user according to the specific behavior of the SUT.

An algorithm described hereinbelow is operative to detect exceptions. The algorithm is based on relatively fast object recognition performed by the graphic processor, hardware and software, and operates on a group of predefined objects whose positions and shapes must be fixed. The indicated objects may overlap each other.

In detecting occurrences of an object on the screen, response times are of importance. In the present embodiment, described hereinbelow, negative indications of occurrence, such as a "no exception objects" prompt from the graphic processor 30 to the host computer 26 in FIG. 1, are provided within 100 milliseconds. Positive indications of occurrence, such as an "exception occurred" prompt and/or an identification of the detected object, are provided within 250 milliseconds.

The exception detector algorithm preferably comprises two separate phases, a first phase for preprocessing the data and a second phase for continuous acquisition of exception objects on the screen. These phases will now be described in detail.

The preprocessing phase is implemented by means of software, set forth in Annex E, and stored on the host computer 26. The input is a set of objects represented as location specific pixel maps of the SUT screen frame. The input is preferably processed as follows:

1. Upon measuring the similarities of the objects within the object set, the object set is divided into subsets of similar objects. The similarities are measured by calculating the relative number of identical pixels.

2. For each subset of similar objects, a representative agent is defined where the pixel map of the representative agent is the collection of pixels common to each object in the subset.

3. For each object within a subset, "discrimination data" are computed. The "discrimination data" is a set of pixels comprising a relatively small number of pixels which are unique to that object. The discrimination pixels for each object are determined by means of a pixel map intersection operation between the object and the representative agent. A preferred order according to which the objects may be checked is also important and will be discussed in the forthcoming description of the acquisition phase.

4. The representative agents of all the subsets are combined to create the following three inputs to the acquisition phase:

a. a combined pixel map being a map of only the representative agents.

b. a combined mask map being a mask which masks out all but the locations of the representative agents.

c. for each representative agent, a list of pixel locations, or "checkpoints", to be checked by the graphic processor software. Each checkpoint is typically a memory location on the result frame buffer whose incremental error counter value is to be read by the software. The incremental error counter value stored in the checkpoint typically indicates whether or not the representative agent is found on an input screen frame. For most objects, only two checkpoints are necessary. For overlapping objects, many checkpoints are necessary to distinguish if one, some or none of the overlapping objects are present.

These inputs are used in conjunction with the RT ALU 34 and image frame buffers 36 of FIGS. 4A and 4B, as controlled by graphic processor 30, to detect the occurrence of one object out of many objects some of which may be fully or partially overlapping.

5. The three inputs are communicated by the host computer 26 to the graphic processor 30. Input "a" is downloaded directly to frame buffer 52 by means of GPU 74 (FIGS. 4A and 4B) and bus 82. Input "b" is downloaded directly to frame buffer 66 to be used as a mask. Input "c" is stored in DRAM 86 to be utilized by GPU 74 software. The discrimination data of step 3 is downloaded by similar means to DRAM 86, there to be utilized by the GPU 74 software.

6. The graphic processor 30, ALU 34, and buffers 36 now operate in accordance with the acquisition phase described below. The host computer 26 may activate or deactivate the acquisition phase by issuing a suitable prompt to the graphic processor 30.

The acquisition phase will now be described with particular reference to FIGS. 4A and 4B.

1. A comparison operation is set between frame buffer 52, in which is stored the combined pixel map, and the incoming video from serializer 40. The mask plane (input b of step 4 of the preprocessing phase) is selected to affect the error counter 68 operation and the results are directed into frame buffer 70. A detailed description of the setting was previously given under the heading Incremental Error Counting. For this operation, though, the incoming video is also captured into frame buffer 48 for later use in step 6 below.

2. The error counter values at predetermined checkpoints are read by using input c from step 4 of the preprocessing phase. Their values indicate whether or not a given agent was detected.

3. If the result in step 2 above is negative, a suitable prompt is sent by graphic processor 30 to the host computer 26. In response, the host computer 26 may command the graphic processor 30 to proceed with the current operation or to terminate it.

4. If the result in step 2 above is positive, a suitable prompt is sent to the host 26, causing a discrimination algorithm, described hereinbelow in step 6, to be activated automatically in the graphic processor.

5. The host computer 26 terminates the current test, but saves its context, and awaits identification of the exception event.

6. The graphic processor 30, preferably by software means, examines the current video image in frame buffer 48 (FIGS. 4A and 4B) for the presence of discrimination data which would identify which object of the identified subset is the object present. The operation performed is a comparison between the discrimination data points and their counterparts in the object in the current video image. Thus, the "discrimination data" of step 3 of the preprocessing phase are used to rapidly identify the object within the subset.

Once the object has been identified, the graphic processor software updates in the data base an objects list which orders the objects within each class according to their likelihood of appearance. This order of objects determines the order by which the objects of each subset are examined by the detection and discrimination procedures described hereinabove, thereby generally shortening the mean time for full object identification.

7. The graphic processor generates an identification prompt to the host computer.

8. The host computer receives the prompt and activates the proper response sequence associated with the identified object as explained in step 5 above.

It is appreciated that the above technique allows an indication of whether particular objects have appeared to provided, wherein objects may overlap partially or fully, and without performing a complete comparison for each object.

A preferred object code for implementing the apparatus and method of the present invention is set forth in Annex E. Annex D describes an installation, environment and operating instructions for the object codes of Annex E.

Cursor Manipulation Device Tracking and Movement Replication

The present invention is also operative to track and replicate the operation of cursor manipulation device 14.

Figure 18:
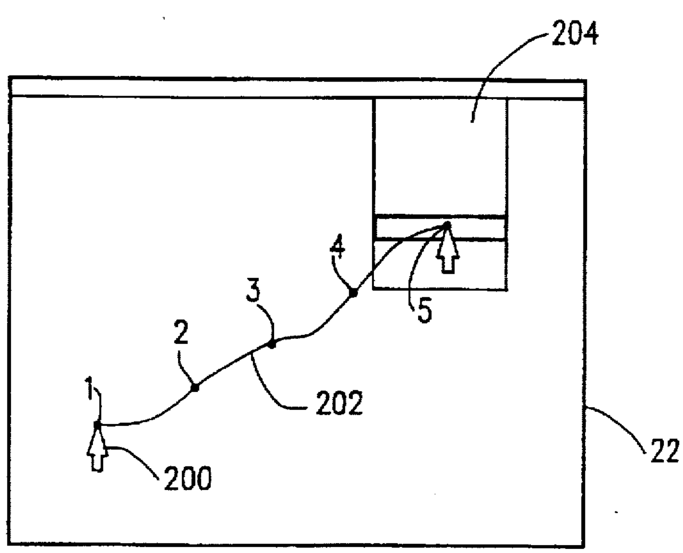
FIG. 18 is a pictorial illustration of a screen of a monitor of a system under test in response to the movement of a cursor manipulation device.

Reference is now made to FIG. 18 which illustrates a path for en example cursor manipulation device. The cursor, represented by an icon 200, begins at a first location, marked 2. As an operator moves the cursor manipulation device 14, the icon 200 travels along a track 202 on the monitor 26, finally arriving at a point, labelled 5, where the operator selects a desired operation.

Movement along track 202 comprises the following four types of operations:

1. Physical level communication operations: These are physical operations performed by the cursor manipulation device 14 in its communications with the system. Example operations are a reset command to the cursor manipulation hardware or a recovery sequence from a transmission error.

2. Cursor manipulation movement events: These are events which signify the movement of the device 14. They are shown on the monitor through movements of the icon 200. Most of the cursor manipulation operations are such events.

3. Cursor manipulation selection events (Clicks): These events, termed "track terminators", are mainly a result of pressing and releasing cursor manipulation buttons. They are typically interpreted by the application as a selection of an object on the monitor and typically cause the application software to change the display.

A typical change in the display is to "drop" a menu 204. The icon 200 is displayed against the menu 204, typically by overlaying the menu 204.

4. Cursor manipulation timing events: The timing is measured between cursor manipulation events. The timing is not an output of the cursor manipulation device but is an important aspect of its operation. If other cursor manipulation events are recorded and replayed without consideration of the time intervals between events, the application will typically not react in the same way.

The actual track 202 is not unique; other tracks reasonably close to track 202 will produce the same results. However, it is desired to replicate track 202, as much as possible, because, as is known in the art, different tracks to the same final location may produce different responses from the application software due to the action of menus and other cursor sensitive locations. Furthermore, from a user-interface point of view, the quality of the replication depends on how closely the sequence of the movements on the monitor 26 matches those of the recording operation.

Thus, the system of the present invention preferably replicates the track 202 by ensuring that:

a) the select events during a replication session are performed while the icon 200 is positioned exactly in the same location on the monitor 26 as it was during a recording session;

b) the timing of the selection events is output synchronized; and c) the track 202 is replicated as closely as possible.

Therefore, the present invention stores the beginning and ending locations, locations 1 and 5, of the icon 200 and a multiplicity of locations along the track 202 between locations 2 and 5. The other locations are labelled 2–4.

Figure 12A:
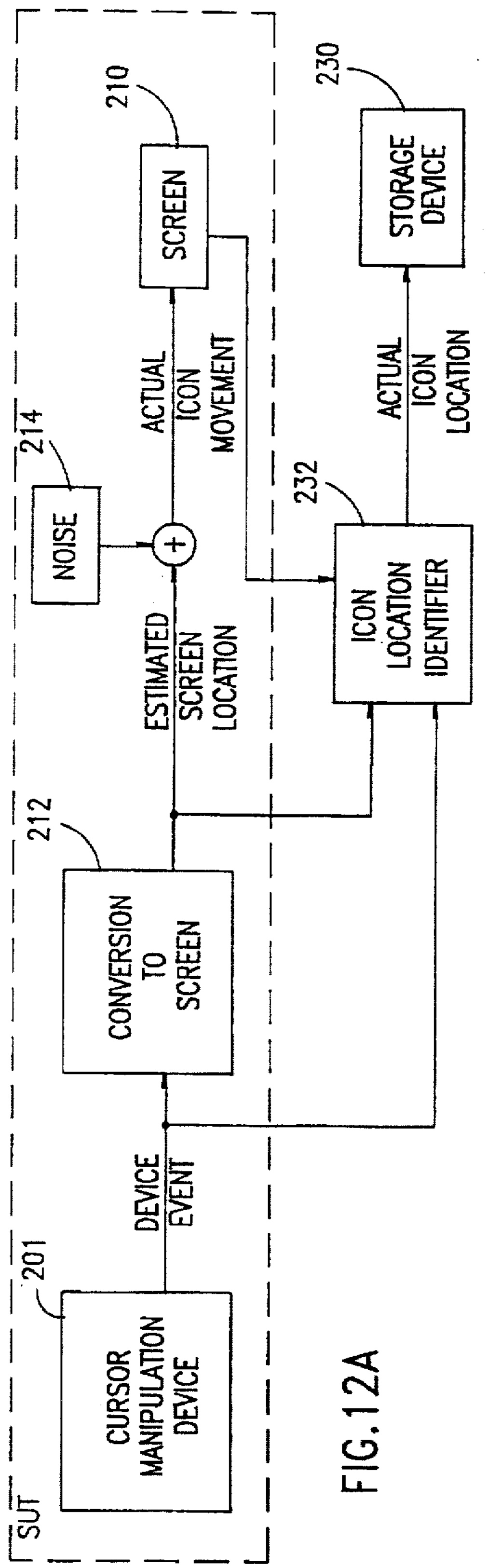
FIGS. 12A and 12B are block diagram illustrations of a system for recording and for repeating the movement of a cursor manipulation device, constructed and operative in accordance with an embodiment of the present invention, where
Figure 12B:
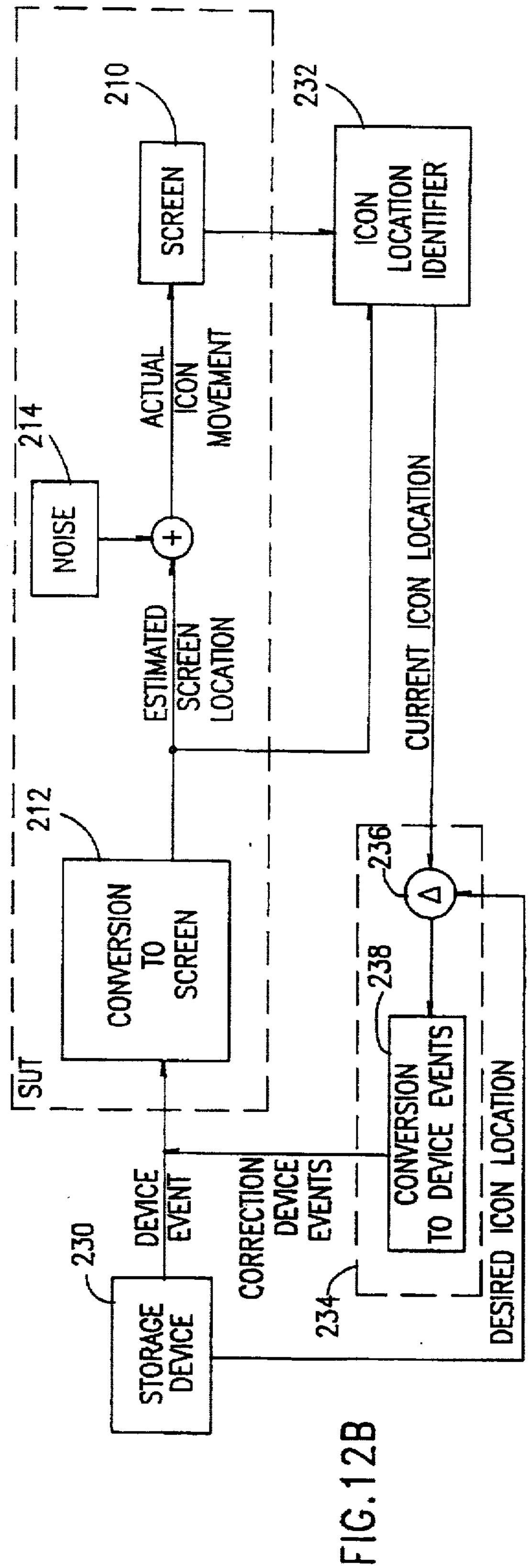

Reference is now made to FIGS. 12A and 12B which illustrate a system for recording and replication the operation of cursor manipulation device 14 forming part of the system of the present invention wherein FIG. 12A illustrate the elements of the system operative during a recording mode and FIG. 12B illustrates the elements operative during a replication mode.

During recording of a series of operations with cursor manipulation device 14, the device 14 produces a datastream of device events which are converted, via the SUT, to movement on a screen 210 of monitor 26. Due to the non-deterministic nature of the conversion, the conversion can be conceived as comprising a deterministic conversion portion 212, which provides an estimated location of icon 200 on the screen, and an unknown random noise source 214 which models the random loss of some of the device events. The noisy signal from the noise source 214 is added to the estimated location of icon 200 and the result is the actual movement of icon 200 which is seen on the screen 210.

The deterministic conversion portion 212 estimates the location of the icon 200 on the screen 210 from a known scaling function between device events and screen movement.

A typical scaling function 216 is shown in FIG. 13 to which reference is now briefly made. The function 216 is typically piecewise linear and typically includes two sections 218 and 220. Section 218 typically has a small slope thereby to amplify small movements of the device and section 220 has a large slope, thereby to provide large movements in response to a large device events.

In accordance with the present invention, the actual location of the icon 200 in a multiplicity of locations between and including track terminators, as well as the entirety of device events between track terminators, are stored in a storage device 230, such as computer memory or a hard disk.

The actual icon location is identified in an icon location identifier 232 which receives the estimated screen location of icon 200 from device 212 and captures the output on screen 210. The estimated location is used to identify areas of the screen 210 where the icon 200 is most likely to be found. These areas are then searched and the location of the icon 200, if it is found, is noted. If the icon 200 is not found in an area of high probability, then the remainder of the output on the screen 210 is searched.

The operation of the identifier 232 is described in more detail hereinbelow. It will be noted that the identifier 232 is comprised of the graphic processor 30, the host computer 26, the frame buffers 36 and the RT video ALU 34 and is operative, for this purpose, to identify the location of icon 200.

In the replication operation, shown in FIG. 12B, the storage device 230 releases the stored device events which are converted to actual icon movements via the SUT, as described hereinabove. The icon location identifier 232 identifies the current icon location from the estimated icon location and the actual output on the screend 210, as described in general herinabove.

In accordance with a preferred embodiment of the present invention, the system for replicating the operation of device 14 additionally comprises feedback apparatus 234 for correcting, if necessary, the icon location to the desired location, as defined by the recording operation and as provided by storage device 230. The feedback apparatus operates on the current icon location, provided by identifier 232, and the desired icon location, to provide a correction signal to the device events datastream to move icon 200 from its current location to the desired location.

Feedback apparatus 234 typically comprises a differencing unit 236 for providing the difference between the current location and the desired location of the icon 200 and a conversion device 238 for converting the difference from a screen difference to a datastream of device events which cause the icon to move from its current location to the desired one. The output of conversion device 238 is provided to the SUT. The operation is repeated until the icon 200 is in the desired location.

Figure 14A:
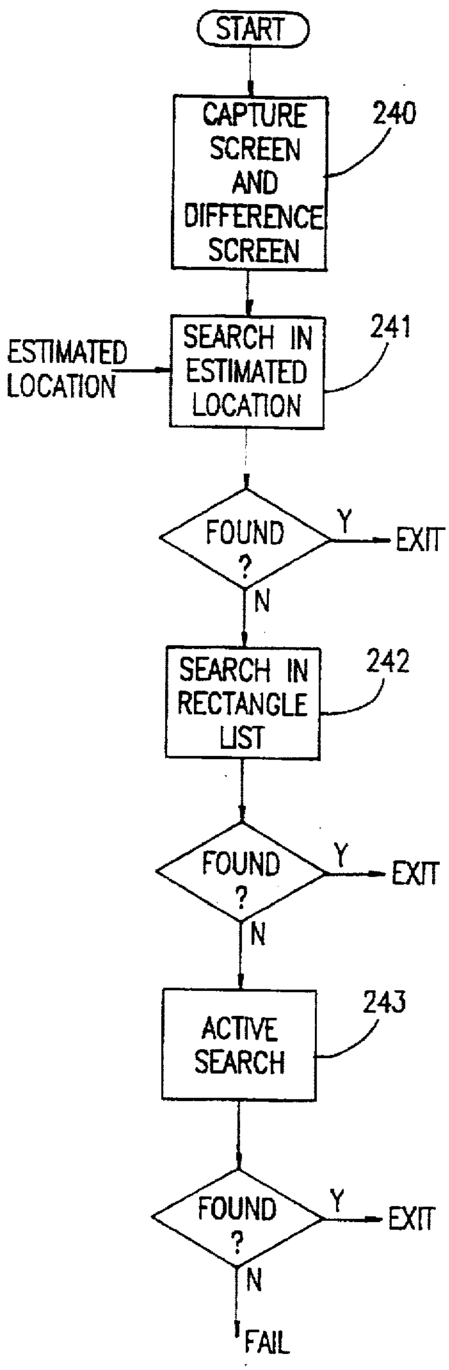
FIGS. 14A, 14B and 14C are flow chart illustrations of the operation of a screen position identifier useful in the system of FIGS. 12A and 12B.
Figure 14B:
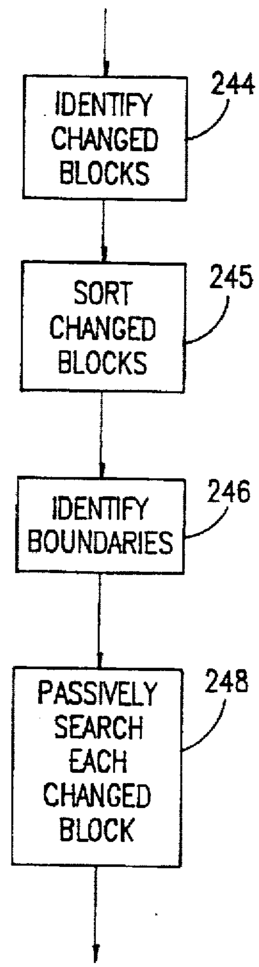
Figure 14C:
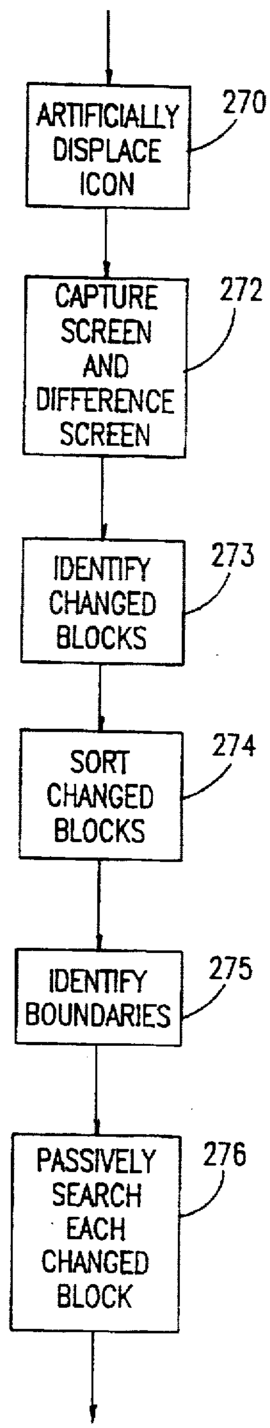

Reference is now made to FIGS. 14A, 14B and 14C which illustrate, in flow chart form, the operation of the icon location identifier 232. Before describing the operation, the following should be noted:

The identifier 232 operates on track 202 which is defined as a data object comprising a set of cursor manipulation device and timing events between two track terminators which are produced by the cursor manipulation device 14 and the I/O processor 24. A track terminator is preferably any of the following events: cursor manipulation or keyboard key press, key release, key click, and capture screen or capture signature commands provided by the host computer 26, as described hereinabove.

In accordance with the present invention, the track data object is characterized by the following data:

a) Initial point (location 1 of FIG. 18): The initial point is the location of the icon 200 at the beginning of a track. The end point (location 5 of FIG. 18) of the track data object is related to the initial point by an offset produced from a measurement on the screen. Thus, a track is a relocateable object.

b) Move events: The move events are the device events transmitted to the application. In the record operation, these events are used to estimate the present location of the icon 200 as accurately as possible.

c) End point: The end point is the point where a track terminator occurred. It is given as an offset, in monitor coordinates, relative to the initial point of the track. The end point also includes additional information which is used to crosscheck the location and timing of the selection event.

d) Time interval: The time interval is the time which elapses between two consecutive device events. It is recorded and is used for synchronization purposes and is necessary since some applications are sensitive to the exact time interval between two device events.

It will be appreciated that the cursor manipulation device behavior during a test is partitioned into tracks, where the end point of one track is typically the initial point of the next one. This holds true except when the application itself displaces the icon independently and thus creates a discontinuity between tracks.

It will be noted that the correct replication of the cursor manipulation behavior during the entirety of the test is equivalent to the correct replication of each track.

With reference to FIG. 14A, the identifier 232 begins by capturing, in step 240, the output to screen 210, as described hereinabove. The identifier 232 also captures the difference screen which is the difference between the present screen and the previous screen for which the calculations of FIG. 14A were performed.

Most of the operations of FIGS. 14A, 14B and 14C are performed on the graphic processor 30. The operations are described in detail in pseudocode format in Annex F. As mentioned hereinabove, the operation of the entire system, including the operations of the identifier 232 are given, in object code format, in Annex D.

In step 241, the system passively searches the captured screen in the estimated location and in the eight neighboring locations of the estimated location. This is detailed in routine Do_passive_search_in_place.

The system attempts to match any of a set of predefined icon shapes, centered on the pixel at the estimated location, to the pixels its neighborhood. The matching is performed for each of the nine pixels to be searched.

The recognition operation comprises direct correlation of the pixel values from the screen 210 with the predefined icon data. A special caching mechanism places the icons most often recognised at the head of the icon list in order to further optimize the search time of the icon shape. The pattern recognition method is described in detail hereinbelow and is outline in detail in routine Shape_correlate of the pseudocode of Annex F.

If an icon is found in the immediate neighborhood of the estimated location, the location of the center of the identified icon 200, or the location of its hotpoint, is stored and the search ended. Otherwise, the method proceeds to step 242.

In step 242, a list of areas which have changed between the present and previous captured screens is generated and the areas are searched in the order of most probable to least probable.

If the icon is found in one of the areas of the list of step 242, the method exits. Otherwise, an active search is performed, in step 243, to find the icon. The active search, described in detail hereinbelow, includes artificially providing device events to the SUT and searching the screen which results. Typically, the icon will be found by this process. If not, the method fails.

The method of step 242 is detailed in FIG. 14B. The list of step 242 is generated as follows. The difference image is a frame of data, as shown in FIGS. 15A and 15B to which reference is now briefly made. In step 244 (FIG. 14B), the frame is divided into a plurality of strips, for example four strips 250, 252, 254 and 256, and the location of changes from the previous frame of data is identified as follows: Error count values are produced, as described hereinabove, for the entirety of the frame. A strip with changes is one whose error count value at the end of the strip is different than that at the beginning of the strip. In FIG. 15A, strips 250 and 256 have changes in them.

Each strip which has changes in it is divided into a plurality of blocks 258 of a predetermined size. The changes are identified by comparing the sum the error count values at the right border of each rectangle with the sum of the error count values at the left border of the rectangle. Example borders are noted by reference numeral 259. In this example, the middle two blocks of strips 250 and 256 of FIG. 15A have changes in them.

Step 244 is described in routine Generate_rect_list of the pseudocode of Annex F.

In step 245, the estimated screen location is utilized to sort the changed blocks 258 according to the probability of the cause of the difference being the movement of icon 200. This is shown in FIG. 15B where the changed blocks, noted **258*a*, 258*b*, 258*c* and 258*d*, are marked with an X, the previous location of icon 200 is noted by reference numeral 260 and the current estimated location of icon 200 is noted by reference numeral 262**.

The blocks 258 are sorted in the following order: **258*b*, 258*a*, 258*d* and 258*c***.

In step 246, the boundaries are defined of the search area where the icon is most likely to be found. This is shown in FIG. 16, to which reference is now briefly made. The possible boundary 266 of the location of icon 200 are determined from its estimated location 262 and the entirety of the device events which were generated since the last known location 260. The boundary is a square defined by four arrows, one in each horizontal and vertical direction. The length of an arrow is defined by the location from the estimated location 262 which would have been achieved if the entirety of the device events in the direction 180° to it had been lost.

For example, if all of the device events for moving to the left were lost, then the only horizontal movement would have been that generated by the device events for moving to the right. Thus, arrow 264 to the right represents the sum of the device events for moving to the left from estimated location 262, typically multiplied by a constant between 0.0 and 1.0 indicating the percentage of the device events in that direction which are estimated to be lost. The boundary 266 identifies the most probable area around the estimated location 262 in which the icon 200 is to be found. It will be noted that boundary 266 grows with the number of device events between the present and previous locations 260 and 262.

The search will first be performed in the area within boundary 266.

Therefore, in step 248, the list is first organized to include the rectangles within the boundary first and those without the boundary second. The passive search method, described hereinabove, is performed, in order, on the rectangles of the present captured screen. This is detailed in routine Do_passive_search_in_rect of Annex F.

In order to reduce the size of the search area, Do_passive_search_in_rect additionally includes a routine Reduce_rect_area which reduces the search area inside of each rectangle as described herein.

Figure 15C:
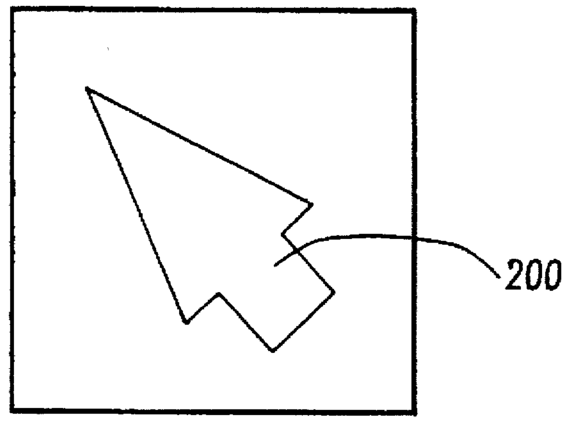
FIGS. 15C, 15D and 15E are illustrations of operations on a block of an image useful in understanding the calculations of the flow chart of FIG. 14B.
Figure 15D:
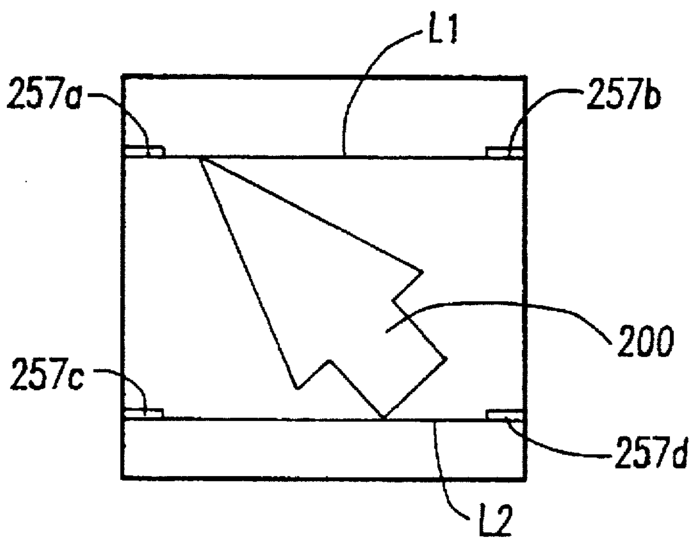
Figure 15E:
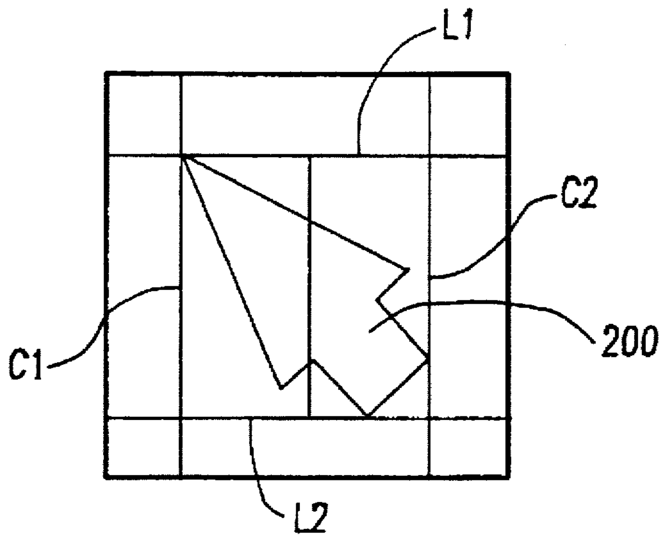

Reference is now briefly made to FIGS. 15C, 15D and 15E. FIG. 15C illustrates a rectangle which includes in it a change comprising an icon 200.

Similar to the operation of step 244, the incremental error counters, labelled 257a–257d in FIG. 15D, at the beginning and end of the rows of the rectangle are searched, in a row-by-row manner, from top to bottom. The first row from the top in which there is a change, labelled L1, is noted, as is the first row from the bottom in which there is a change, labelled L2. A row has a change in it if the difference between the error counter at the beginning of the row and the error counter at the end of the row is non-zero. For example, if the difference between error counter 257b and error counter 257a is non-zero.

The area between lines L1 and L2 is divided into four rectangles and the method of step 242 is utilized to find which of the rectangles is empty. As shown in FIG. 15E, the leftmost column of the leftmost non-empty rectangle is labelled C1 and the rightmost column of the rightmost non-empty rectangle is labelled C2.

The passive search is performed in the area bounded by L1, L2, C1 and C2.

A method for learning and storing the plurality of possible icon shapes is described in detail hereinbelow.

The active search of step 243 is described hereinbelow with respect to FIG. 14C. In step 270, additional artificial device events of a known direction are introduced. In step 272 the screen which results from the artificial device events and a difference screen are captured. The known direction is utilized in steps 273–276, which are identical to steps 244–248 of FIG. 14B, to identify the possible locations of changes which correspond to the artificially produced movements of the icon 200. Typically, only a few change areas will be found.

This process is repeated until the icon 200 is located or a predetermined number of iterations have occurred.

It will be appreciated that the active search operation is also utilized by the feedback apparatus 234 to provide the correction signal. After the correction signal has been provided, the method of FIG. 14A is performed to ensure that the icon 200 has moved to the desired location.

It will also be appreciated that the method of FIGS. 14A, 14B and 14C generally is computationally expensive, both in time and in operations. At least during recording, the cursor manipulation device behavior should not be irregular or disturbing to the user.

Therefore, in accordance with the present invention, the system operation is divided between the graphic processor operation and the host program. The graphic processor 30 performs the calculations of FIGS. 14A, 14B and 14C and the host computer 26 provides the data which the graphic processor 30 uses.

The host computer 26 captures the device events, stores them in a database and transmits them to the SUT. In parallel to the operations of the host computer 26, the RT video ALU 34 provides the graphic processor 30 with the current screen output.

Whenever the graphic processor 30 is in an "idle mode" and not performing the calculations of the method of FIGS. 14A–14C, it performs double buffering.

The double buffering operation includes storing in a first frame buffer 36 a previous screen and capturing into a second frame buffer 36 the first screen which is different than the previous screen, as measured by a difference image. The second frame buffer 36 then becomes the previous screen and the first frame buffer 36 captures the next screen which is different.

When the graphic processor 30 receives a command to begin calculating, it switches to a "track mode" and freezes the data in the buffers 36 as well as the already calculated difference image. The difference image reflects the most recent change which has occurred on the screen 210.

Track mode are those operations of the graphic processor 30 while the cursor manipulation device is moving between two track terminators. Specifically, track mode consists of the operations of step 240 of FIG. 14A and step 244 of FIG. 14B.

It will be appreciated that, due to the above switching operations of the graphic processor, the screen calculations are not performed on every screen which results from a device event. Rather, the method is performed periodically while the device events are continuously transmitted. This is reflected in FIG. 18 where data from only certain locations along the track 202 are utilized for the computation of graphic processor 30.

At a track terminator, the graphic processor switches to "endpoint mode" and performs step 248 of FIG. 14B. If the icon 200 is not found, then the graphic processor 30 switches to "active mode" and performs all of the steps of FIG. 14C. In active mode, the device events are introduced to the SUT while computing the estimated current position on the screen. This is performed in parallel and asynchronously by the graphic processor in order not to disturb the user.

In this way, the system performs the processing so that the user is generally unaffected by the heavy computations carried out on the graphic processor 30.

The passive search of step 248 will now be described in detail. Because the search is bounded in time, the number of pixels to be searched is minimized. The pixels to be searched are ordered so as to yield the shortest average search time.

As described hereinabove, the search order is produced by using information regarding the estimated location of the icon and the device events which brought the icon 200 to its current location.

A correlation procedure is called to correlate each pixel with each of the possible icons in the icon list until one icon is recognized. The correlation procedure is optimized to generally quickly eliminate the checked pixel.

Figure 17:
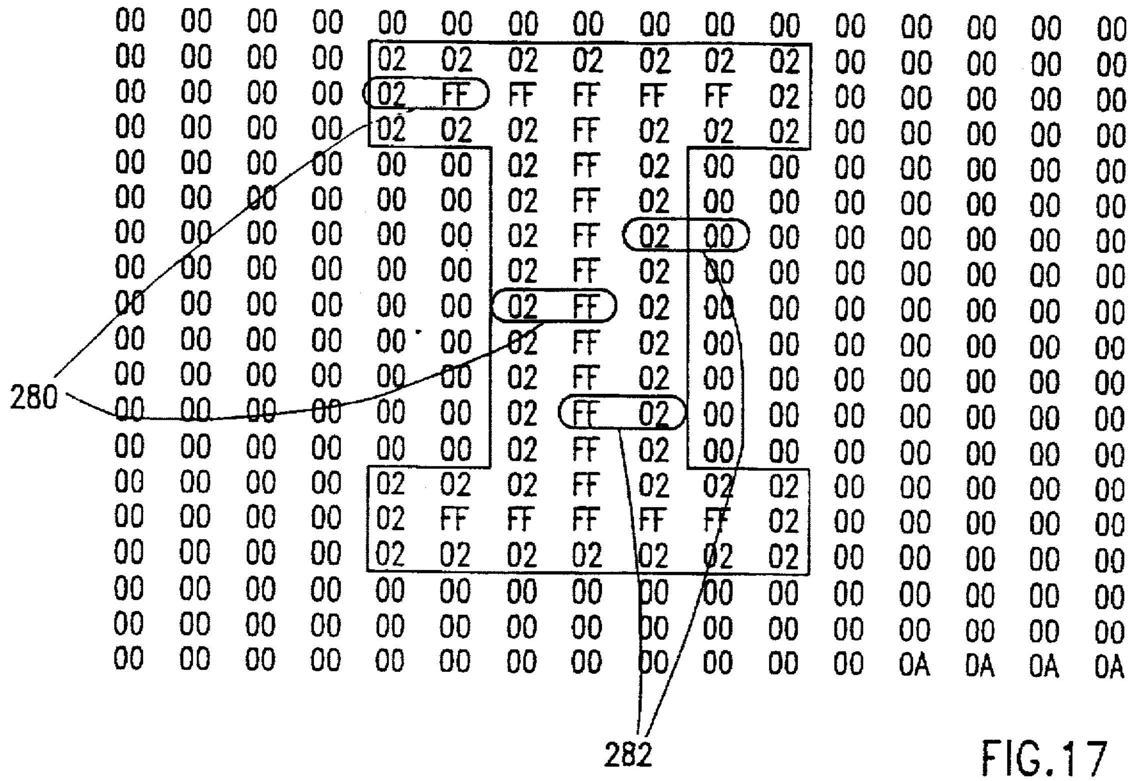
FIG. 17 is an illustration of an icon and its change points, useful in understanding the methods of FIGS. 14A, 14B and 14C.

The passive search method looks for changes in the shape of icon 200, where a change is defined as a pair of adjacent pixels whose pixel values differ. An example rectangle enclosing an icon 200 is shown in FIG. 17 to which reference is now briefly made.

Each icon 200 is characterized by a vector of pairs of distinctive pixels either from the contour of the icon 200 (i.e. one pixel of the pair belongs to the icon shape and the second belongs to the background), or preferably, are from inside the shape (i.e. both pixels belong to the icon shape). These pairs of pixels are termed "change points". Example contour change points, labelled 280, and example internal change points, labelled 282, are shown in FIG. 17.

For some icons, only contour change points can be found. Typically, the change points are evenly distributed about the icon shape.

The change points are provided to the passive search procedure. They are typically determined either by the user or from an automatic icon learning module described in detail hereinbelow.

Each change point is defined as a data structure which includes the pixel values, the attribute of internal or contour, and an offset of the change point relative to the hotpoint of the icon 200.

The hotpoint of the icon 200 is the pixel which defines the location of the icon 200. When the address of the hot point on the screen is given, the relative offset is used to compute the address of the change point on the screen.

The icon correlation procedure receives as input from the host the current search pixel and the current icon 200 to be matched. The procedure tests whether the hotpoint of icon 200 coincides with the current search point.

Since the correlation procedure is repeated for the entirety of search pixels and the entirety of possible icons, it is operative to eliminate generally quickly search pixels where the icon 200 is not drawn while providing no false identification of an icon where none exists.

The correlation procedure is operative to match an icon hotpoint to the current search pixel. Therefore, for each change point in the data structure of an icon, the correlation procedure computes the address of the change point relative to the search pixel and then accesses the screen frame buffer at the computed address. The correlation procedure reads the pair of pixels at the computed address and compares the pixel values of the pair to the pixel values which are stored in the data structure of the present change point.

Internal change points are processed first since a mismatch in an internal change point indicates that the current icon to be matched does not match the icon on the screen.

In order to positively recognize the icon on the screen, the entirety of internal change points must match. If the number of internal change points which match is more then a software defined empirical threshold, the procedure returns with success.

Otherwise, the contour change points are processed as follows: each contour change point is checked as above, but only the value of the pixel which belongs to the icon is compared. As before, a single error eliminates the current search point.

Additionally, for contour change points, each point is checked as to whether or not it is a difference point wherein a difference point is one where the pair of points have different pixel values. The icon is recognized if at least N percent of the contour points are also difference points, where N is a predetermined constant, typically of 75%.

It will be noted that contour change points are less reliable then internal change points since internal change points are part of the shape of the icon 200. For some systems where icons are drawn with a dedicated colour, the internal points which are not necessarily change points can be solely used, because detecting that colour on the screen implies the presence of the icon.

Reference is now made to FIGS. 19A, 19B, 19C and 19D which are useful in understanding a method for acquiring information regarding icon 200 described herein. The method is an off-line operation involving interaction with the user which produces a data structure containing all relevant data about all icons 200 utilized by the SUT 12. The data structure is downloaded into the graphic processor 30 at startup.

The data structure for each icon 200 comprises the shape of the icon 200 represented as a bitmap and the hotpoint of the icon. As mentioned hereinabove, the hotpoint is the reference point on the icon 200 relative to which the icon 200 is drawn on the screen 210.

The icon acquisition method comprises three stages, an interactive stage for acquisition of bitmaps of each icon 200, an internal processing stage for generating data used in the search process, termed "detection data" and a download stage for downloading the detection data to the graphic processor 30.

The interactive stage for each icon 200 comprises the steps of acquiring the bitmap and a mask of the icon 200 and acquiring the information needed to align the detection data according to the hotpoint of the icon.

The shape of each icon 200 is represented by two rectangle bitmaps, the icon bitmap and the icon mask. The icon bitmap contains the bitmap which is drawn every time the icon 200 appears on the screen 210. The icon mask bitmap is a binary bitmap with pixel values of 1 for pixels corresponding to those pixels in the first bitmap which belong to the icon and pixel values of 0 for the remaining pixels.

Figure 19A:
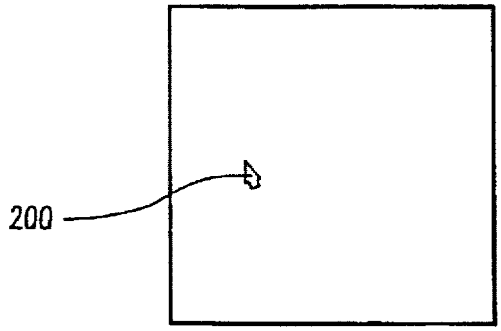
FIGS. 19A–19D are pictorial illustrations useful in understanding a method for acquiring information regarding an icon.

The two bitmaps are acquired in accordance with the following steps and as shown in FIGS. 19A, 19B, 19C and 19D:

1) As shown in FIG. 19A, the user brings the icon 200 to a position on the screen which contains none of the colors of the icon 200.

Figure 19B:
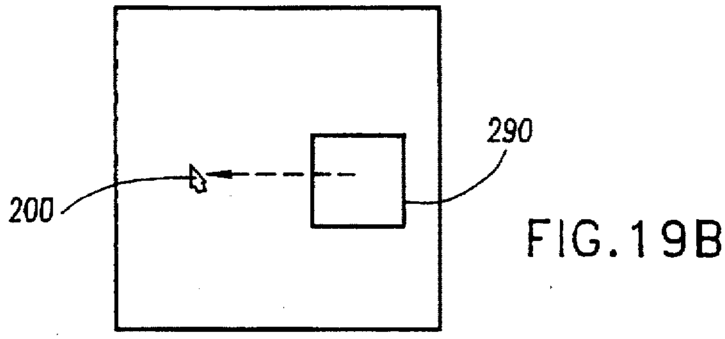

2) The user indicates, by pressing a softkey, that the icon 200 is in the desired location. The method then provides a rectangle 290 on the screen, disconnects the cursor manipulation device 14 from the icon 200 and reconnects device 14 to the movements of the rectangle 290. This is shown in FIG. 19B.

Figure 19C:
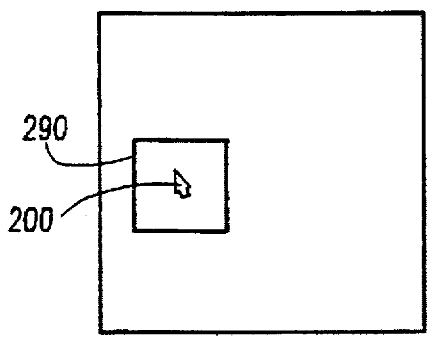

3) The user encloses the icon 200 with the rectangle 290 and presses a softkey to indicate that he did so. This is shown in FIG. 19C. The system then captures the bitmap enclosed by the rectangle 290, which is the icon bitmap, and reconnects the device 14 to icon 200.

Figure 19D:
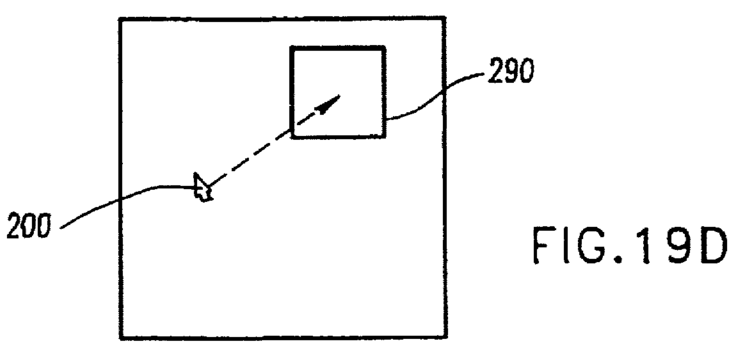

4) As shown in FIG. 19D, the user moves icon 200 outside of the rectangle 290 and presses a softkey to indicate that he did so. The system then captures the bitmap enclosed by the rectangle 290, which is a clean bitmap.

5) The icon bitmap is saved and is XORed with the clean bitmap. The result is the icon mask bitmap which is saved.

6) Typically, steps 2–5 are repeated a number of times to ensure that the results are reliable even if the background of the mask is not always clean. 7) To merge the multiplicity of icon bitmaps and icon mask bitmaps, one set of icon bitmap and icon mask bitmap is defined as the reference mask. For the others, the following steps are performed:

i) The icon bitmap is searched from left to right and from top to bottom. The first pixel which is different from the background is used to align the icon bitmaps.

ii) Each icon bitmap is shifted, one pixel at a time, across the reference icon bitmap. The shifting is performed from the center of the rectangle first to one side and then to the other. Typically, for each horizontal shift, all the possible vertical shifts are performed.

iii) For each shift, two differences images are compared. The difference images are those between the icon bitmap and the reference icon bitmap and the icon mask bitmap and the reference icon mask bitmap.

For each pixel location, if it has a value of 1, the pixel values on the corresponding icon bitmaps are checked and if they are identical a counter is incremented. The correct shift between the icon bitmaps is the one that yields the maximum counter value.

iv) Once the correct shift for the icon bitmap is calculated, it is merged with the reference bitmap. To perform the merging, the two differences images are compared. For each pixel in the difference image of the icon to be merged the following is checked: if it has a pixel value of 0 on the reference mask bitmap and a value of 1 on the icon mask bitmap of the icon to be merged than the pixel is considered as a new pixel. The new pixel is included in the reference icon bitmap by changing the reference mask value to 1 at the location of the new pixel and replacing the pixel value on the reference icon bitmap with the pixel value of the new pixel.

8) The hotpoint of the icon is acquired. Since, as is known in the art, the hotpoint always stays within the borders of screen 210, then when the icon 200 is placed on one edge of the screen the visible part of the icon includes the hotpoint. If the icon 200 is brought to both the horizontal and vertical borders of the screen 210, the intersection of the pixels in the column directly adjacent the horizontal border and in the row directly adjacent the vertical border includes one pixel which is the hotpoint.

The icon hotpoint is acquired as follows:

i) The user brings the icon 200 to one of the screen borders. Part of the icon must be visible.

ii) The user indicates, by pressing a softkey, that the icon 200 is in the right place. The method then provides a rectangle on the screen, disconnects the cursor manipulation device 14 from the icon 200 and reconnects device 14 to the movements of the rectangle.

iii) The user encloses the icon 200 with the rectangle and presses a softkey to indicate that he did so. The system then captures the bitmap enclosed by the rectangle, which is the icon bitmap, and reconnects the device 14 to icon 200.

iv) The user moves icon 200 outside of the rectangle and presses a softkey to indicate that he did so. The system then captures the bitmap enclosed by the rectangle, which is a clean bitmap.

v) The icon bitmap is saved and is XORed with the clean bitmap. The result is the icon mask bitmap which is saved.

vi) The icon bitmap and the icon mask bitmap are aligned, as described hereinabove, with the reference bitmap and mask. The difference in the offsets of the icon and mask bitmaps on the checked axis (if the screen border was vertical, the checked axis is the Y axis, otherwise it is X axis) determines the hotpoint offset, in the reference bitmap, for the checked axis.

vii) Steps i–vi are repeated for the other border.

9) The reference icon bitmap, reference icon mask bitmap and hotpoint location are utilized to generate the detection data as follows:

i) The reference icon bitmap and mask bitmap are searched for internal and contour change points, where, for the two pixels in the internal change points, their corresponding pixels in the reference mask bitmap have pixel values of 1 and for the two pixels in the contour change point, only one of the corresponding pixels in the reference mask bitmap has a pixel value of 1.

ii) An internal change point vector and a contour change point vector are generated.

iii) The two vectors are sorted so as to ensure an optimal separation of the change points. The method of sorting is described hereinbelow.

iv) The vectors are merged together, wherein inner points take precedence over edge points.

v) A detection vector is generated which includes two pixel values for internal change points and one pixel value and an attribute for contour change points. The attribute indicates whether or not the change point is a left or right change point. The data structure of the detection vector is that of a double linked list which, as is known in the art, enables a fast manipulation of the list for caching purposes.

An exemplary method for generating a list of change points evenly distributed about the area of the icon 200 is described hereinbelow. Since the method is typically performed offline, there is no restriction on the computation time required.

The list of change points can be generated in any suitable manner which provides an even distribution of the points across the area of the icon 200. The following is an exemplary method, detailed in routines Do_generate_corr_points and Do_optimize_data.

1) Prepare the list of change points.

2) Enclose the icon 200 with a square, where the side of the square is S pixels, and S is the smallest power of 2 which yields a square large enough to enclose the icon.

3) Divide the square into four sections and compute the number of change points in each quarter. Each quarter will contribute a number of points to the list based on the relative amount of change points in the quarter.

4) Repeat steps 2–3 within each quarter.

5) After all the points are found, they should be ordered as follows:

i) Model the repeated division into squares as a tree with a square in each node, and the branches of each node are the subdivisions. The tree is travelled from the root up where, for each square, the change point which is chosen is the change point, of the change points not yet chosen, which is closest to the center of the square.

It will be appreciated by persons skilled in the art that the present invention is not limited to what has been particularly shown and described hereinabove. For example, the cursor tracking of the present invention can be implemented entirely in software, or it can be modified to operate with an absolute pointing device. The scope of the present invention is defined only by the claims that follow:

U 010262-4

Annex A

FIRMWARE OF ELEMENTS OF FIG 4.

(contents of PALS)

EP 11 74563 #4

```
Tue Jan  1 00:16:34 1980  a:addsub1.abl  Page 1, Line 1


MODULE   ADDRESS_MODIFIER ;

title

'This module bypasses ,increments ,or decrements the adrs .'


   addsub1 device       'P22V10';

" Constants:
     l              =      0 ;
     h              =      1 ;
     X              =     .X.;              " ABEL 'don't care' symbo
l
     C              =     .C.;              " ABEL 'clocking input' s
ymbol


"PIN NAMES:


MADR0 , MADR1 , MADR2 , MADR3 , MADR4 , MADR5 , MADR6 , MADR7 , MA
DR8      PIN
  1   ,   2   ,   3   ,   4   ,   5   ,   6   ,   7   ,   8   ,
9         ;

PLUS1 ,MINUS1    PIN
 10   ,  11       ;

CADR0  ,CADR1 ,CADR2  ,CADR3 ,CADR4 ,CADR5 ,CADR6 ,CADR7 ,CADR8
 PIN
  14   ,  15  ,  16   ,  17  ,  18  ,  22  ,  21  ,  20  ,  19  ;



MADR     =  [ MADR8 ,MADR7 ,MADR6 ,MADR5 ,MADR4 ,MADR3 ,MADR2 ,MADR
1 ,MADR0 ] ;
CADR     =  [ CADR8 ,CADR7 ,CADR6 ,CADR5 ,CADR4 ,CADR3 ,CADR2 ,CADR
1 ,CADR0  ] ;


"MACROS

Cin    macro   { PLUS1  };
SUB    macro   { MINUS1 };   "ADD / SUB   0 / 1

A0     macro   { MADR0 } ;
A1     macro   { MADR1 } ;
A2     macro   { MADR2 } ;
A3     macro   { MADR3 } ;
A4     macro   { MADR4 } ;
A5     macro   { MADR5 } ;
A6     macro   { MADR6 } ;
A7     macro   { MADR7 } ;
A8     macro   { MADR8 } ;
```

```
Tue Jan  1 00:16:34 1980  a:addsub1.abl  Page 2, Line 53

""""""""""""""""""""""""""""""""""""""""""""""""""""""""""""""""""""""""""""""""
""""""""
 EQUATIONS

!CADR0 =   SUB + !A0 ;

!CADR1 = ( SUB & !A0 ) + !A1 ;

!CADR2 = ( SUB & !A0 & !A1 ) + !A2 ;

!CADR3 = ( SUB & !A0 & !A1 & !A2 ) + !A3 ;

!CADR4 = ( SUB & !A0 & !A1 & !A2 & !A3 ) + !A4 ;

!CADR5 = ( SUB & !A0 & !A1 & !A2 & !A3 & !A4 ) + !A5 ;

!CADR6 = ( SUB & !A0 & !A1 & !A2 & !A3 & !A4 & !A5 ) + !A6 ;

!CADR7 = ( SUB & !A0 & !A1 & !A2 & !A3 & !A4 & !A5 & !A6 ) + !A7 ;


!CADR8 = ( SUB & !A0 & !A1 & !A2 & !A3 & !A4 & !A5 & !A6 & !A7 ) +
 !A8 ;


enable CADR0  =  1;
enable CADR1  =  1;
enable CADR2  =  1;
enable CADR3  =  1;
enable CADR4  =  1;
enable CADR5  =  1;
enable CADR6  =  1;
enable CADR7  =  1;
enable CADR8  =  1;




""""""""""""""""""""""""""""""""""""""""""""""""""""""""""""""""""""""""""""""""
""""""""""""""

test_vectors

([MADR ,MINUS1] -> [ CADR ]);

 [^h000 ,  0  ] -> [ ^h000 ] ;
 [^h000 ,  1  ] -> [ ^h1FF ] ;
 [^h0AA ,  0  ] -> [ ^h0AA ] ;
 [^h055 ,  0  ] -> [ ^h055 ] ;
 [^h0FF ,  0  ] -> [ ^h0FF ] ;

" 00
```

```
Tue Jan  1 00:16:34 1980   a:addsub1.abl  Page 3, Line 108

 [^h010  ,   1   ] -> [  ^h00F  ]  ;
 [^h00F  ,   1   ] -> [  ^h00E  ]  ;
 [^h00E  ,   1   ] -> [  ^h00D  ]  ;
 [^h00D  ,   1   ] -> [  ^h00C  ]  ;
 [^h00C  ,   1   ] -> [  ^h00B  ]  ;
 [^h00B  ,   1   ] -> [  ^h00A  ]  ;
 [^h00A  ,   1   ] -> [  ^h009  ]  ;
 [^h009  ,   1   ] -> [  ^h008  ]  ;
 [^h007  ,   1   ] -> [  ^h006  ]  ;
 [^h006  ,   1   ] -> [  ^h005  ]  ;
 [^h005  ,   1   ] -> [  ^h004  ]  ;
 [^h004  ,   1   ] -> [  ^h003  ]  ;
 [^h003  ,   1   ] -> [  ^h002  ]  ;
 [^h002  ,   1   ] -> [  ^h001  ]  ;
 [^h001  ,   1   ] -> [  ^h000  ]  ;

" 10

 [^h020  ,   1   ] -> [  ^h01F  ]  ;
 [^h01F  ,   1   ] -> [  ^h01E  ]  ;
 [^h01E  ,   1   ] -> [  ^h01D  ]  ;
 [^h01D  ,   1   ] -> [  ^h01C  ]  ;
 [^h01C  ,   1   ] -> [  ^h01B  ]  ;
 [^h01B  ,   1   ] -> [  ^h01A  ]  ;
 [^h01A  ,   1   ] -> [  ^h019  ]  ;
 [^h019  ,   1   ] -> [  ^h018  ]  ;
 [^h017  ,   1   ] -> [  ^h016  ]  ;
 [^h016  ,   1   ] -> [  ^h015  ]  ;
 [^h015  ,   1   ] -> [  ^h014  ]  ;
 [^h014  ,   1   ] -> [  ^h013  ]  ;
 [^h013  ,   1   ] -> [  ^h012  ]  ;
 [^h012  ,   1   ] -> [  ^h011  ]  ;
 [^h011  ,   1   ] -> [  ^h010  ]  ;

" 80

 [^h090  ,   1   ] -> [  ^h08F  ]  ;
 [^h08F  ,   1   ] -> [  ^h08E  ]  ;
 [^h08E  ,   1   ] -> [  ^h08D  ]  ;
 [^h08D  ,   1   ] -> [  ^h08C  ]  ;
 [^h08C  ,   1   ] -> [  ^h08B  ]  ;
 [^h08B  ,   1   ] -> [  ^h08A  ]  ;
 [^h08A  ,   1   ] -> [  ^h089  ]  ;
 [^h089  ,   1   ] -> [  ^h088  ]  ;
 [^h087  ,   1   ] -> [  ^h086  ]  ;
 [^h086  ,   1   ] -> [  ^h085  ]  ;
 [^h085  ,   1   ] -> [  ^h084  ]  ;
 [^h084  ,   1   ] -> [  ^h083  ]  ;
 [^h083  ,   1   ] -> [  ^h082  ]  ;
 [^h082  ,   1   ] -> [  ^h081  ]  ;
 [^h081  ,   1   ] -> [  ^h080  ]  ;

end  ADDRESS_MODIFIER ;
```

```
Mon Mar 19 13:16:20 1990  a:buscont.abl  Page 1, Line 1


module BUS_CONTROL;


title
'THIS MODULE CONTROLS THE VIDEO BUS DIRECTION'


       BUSCONT    device  'X20RA10';


" Constants:

     H              =        1;
     L              =        0;
     X              =       .X.;              " ABEL 'don't care' symbo
l
     C              =       .C.;              " ABEL 'clocking input' s
ymbol

"PIN NAMES:

INT,OE    pin  1,13;

TTR_QEn , W4n ,W5n ,nLAL ,RASn ,DISPALL    PIN
   7    ,  9  ,10  ,   2 ,  8  ,    11   ;

MB4C0 ,MB4C1 ,MB5C0 ,MB5C1     PIN
  3   ,  4   ,  5   ,  6   ;



"Outputs                            Nodes
n4SE    pin 14;    n4SE_S  node 25;    n4SE_R  node 26;  n4SE_C  n
ode 27;
n5SE    pin 15;    n5SE_S  node 28;    n5SE_R  node 29;  n5SE_C  n
ode 30;
Q2     pin 16;    Q2_S  node 31;    Q2_R  node 32;  Q2_C  node 33;
Q3     pin 17;    Q3_S  node 34;    Q3_R  node 35;  Q3_C  node 36;
Q4     pin 18;    Q4_S  node 37;    Q4_R  node 38;  Q4_C  node 39;
Q5     pin 19;    Q5_S  node 40;    Q5_R  node 41;  Q5_C  node 42;
Q6     pin 20;    Q6_S  node 43;    Q6_R  node 44;  Q6_C  node 45;
EN_DFR5   pin 21; EN_DFR5_S  node 46;  EN_DFR5_R   node 47;  EN_DF
R5_C  node 48;
EN_DFR4   pin 22; EN_DFR4_S  node 49;  EN_DFR4_R   node 50;  EN_DF
R4_C  node 51;
ER_BUSEN  PIN 23; ER_BUSEN_S node 52;  ER_BUSEN_R  node 53;  ER_BU
SEN_C node 54;

"MACROS


DFR4_DFR   macro {( !MB4C1 &  !MB4C0   )};
DFR4_ERR   macro {( !MB4C1 &   MB4C0   )};
DFR4_OUT   macro {(  MB4C1 &   MB4C0   )};
DFR4_OPN   macro {(  MB4C1 &  !MB4C0   )};

DFR5_DFR   macro {( !MB5C1 &  !MB5C0   )};
DFR5_SPR   macro {( !MB5C1 &   MB5C0   )};
```

Mon Mar 19 13:16:20 1990 a:buscont.abl Page 2, Line 53

```
DFR5_OUT  macro {(  MB5C1 &   MB5C0  )};
DFR5_OPN  macro {(  MB5C1 &  !MB5C0  )};


"*****************************************************************
*************
Equations

!EN_DFR4  :=  DFR4_DFR & !DISPALL & (!TTR_QEn & !W4n  #  TTR_QEn &
 !EN_DFR4);
 EN_DFR4_S = 0;
 EN_DFR4_R = 0;
 EN_DFR4_C = !RASn;
 enable EN_DFR4  =  1;

!ER_BUSEN :=  DFR4_ERR & !DISPALL & (!TTR_QEn & !W4n  #  TTR_QEn &
 !ER_BUSEN);
 ER_BUSEN_S = 0;
 ER_BUSEN_R = 0;
 ER_BUSEN_C = !RASn;
 enable ER_BUSEN  =  1;

!EN_DFR5  :=  DFR5_DFR & !DISPALL & (!TTR_QEn & !W5n  #  TTR_QEn &
 !EN_DFR5);
 EN_DFR5_S = 0;
 EN_DFR5_R = 0;
 EN_DFR5_C = !RASn;
 enable EN_DFR5  =  1;


n4SE      := (DFR4_DFR & EN_DFR4  #  DFR4_ERR & ER_BUSEN) & !DISPA
LL
           & !TTR_QEn & nLAL
           #  n4SE & !TTR_QEn
           #  DFR4_OPN ;
n4SE_S      = 1;
n4SE_R      = 1;
enable n4SE = 1;


n5SE     :=  (DFR5_DFR & EN_DFR5                      ) & !DISPA
LL
           & !TTR_QEn & nLAL
           #  n5SE & !TTR_QEn
           #  DFR5_OPN ;
n5SE_S      = 1;
n5SE_R      = 1;
enable n5SE = 1;


"*****************************************************************
*************


end BUS_CONTROL;
```

```
Sun May 20 20:07:20 1990   a:busdirv2.abl  Page 1, Line 1


module BUS_DIRECTION_CONTROL;

title
'THIS MODULE CONTROLS THE VIDEO BUS DIRECTION'

      BUSDIRV2     device  'X20RA10';

" Constants:

     H            =      1;
     L            =      0;
     X            =      .X.;              " ABEL 'don't care' symbo
l
     C            =      .C.;              " ABEL 'clocking input' s
ymbol

"PIN NAMES:

INT,OE   pin  1,13;

TTR_QEn ,W0n ,W1n ,W2n , RASn , GRAB2 ,MB2C0 ,MB2C1   PIN
   2    , 3  , 4  , 5  ,  6   ,   7   ,  10  ,  11    ;


"Outputs                        Nodes
OEC       pin 14;   OEC_S     node 25;  OEC_R     node 26;  OEC_C
node 27;
OEB       pin 15;   OEB_S     node 28;  OEB_R     node 29;  OEB_C
node 30;
OED       pin 16;   OED_S     node 31;  OED_R     node 32;  OED_C
node 33;
SRD2      pin 17;   SRD2_S    node 34;   SRD2_R   node 35;   SRD2_C
node 36;
Q4     pin 18;    Q4_S  node 37;     Q4_R   node 38;     Q4_C   node 39
;
Q5     pin 19;    Q5_S  node 40;     Q5_R   node 41;     Q5_C   node 42
;
Q6     pin 20;    Q6_S  node 43;     Q6_R   node 44;     Q6_C   node 45
;
Q7     pin 21;    Q7_S  node 46;     Q7_R   node 47;     Q7_C   node 48
;
Q8     pin 22;    Q8_S  node 49;     Q8_R   node 50;     Q8_C   node 51
;
Q9     PIN 23;    Q9_S  node 52;     Q9_R   node 53;     Q9_C   node 54
;

"MACROS

MB2OPEN macro {( MB2C1 & MB2C0 )};

"***************************************************************
*************
Equations

!OED    :=  !TTR_QEn & !W0n  #  TTR_QEn & !OED ;
OED_S   = 0;
```

Sun May 20 20:07:20 1990   a:busdirv2.abl   Page 2, Line 47

```
OED_R  = 0;
OED_C  = !RASn;
enable  OED = 1;

!OEC    :=  !TTR_QEn & !W1n  #  TTR_QEn & !OEC ;
OEC_S  = 0;
OEC_R  = 0;
OEC_C  = !RASn;
enable  OEC = 1;

!OEB   :=  (!TTR_QEn & !W2n  #  TTR_QEn & !OEB  #  MB2OPEN) & !GRA
B2 ;
OEB_S   = 0;
OEB_R   = 0;
OEB_C   = !RASn;
enable OEB = 1;

SRD2   :=   !( GRAB2 & !TTR_QEn );
SRD2_S  = 0;
SRD2_R  = 0;
SRD2_C  = !RASn;

"*******************************************************************
*************

end     BUS_DIRECTION_CONTROL;
```

```
Sun Mar  4 17:38:00 1990  a:cla.abl  Page 1, Line 1

module   CARRY_LOOK_AHEAD

title
'THIS MODULE IS THE CARRY GENERATOR OF THE ALU '

    CLA  device     'P20L8' ;

" Constants:

     H            =     1;
     L            =     0;
     X            =    .X.;            " ABEL 'don't care' symbol

     C            =    .C.;            " ABEL 'clocking input' sy
mbol

"PIN NAMES:

"FLU0 ,FLU1 & FLU2 SEAMS TO BE REDUNDENT !!!

P0n , P1n ,P2n ,P3n ,G0n ,G1n ,G2n ,G3n ,MODE0 ,MODE1 ,FLU0 ,FLU1
,FLU2    PIN
 1  ,   2 ,  3 ,  4 ,  5 ,  6 ,  7 ,  8 ,   9  ,  10  , 23  , 14
, 13  ;

CIN0 ,CIN1 ,CIN2 ,CIN3    PIN   19 ,20 ,21 ,22  ;

FLU3  PIN  11 ;


"MACROS

MODE16  macro  {( !MODE1 & !MODE0 )};
MODE8   macro  {( !MODE1 &  MODE0 )};
MODE4   macro  {(  MODE1 & !MODE0 )};

CARRY   macro  {( FLU3 )};
"*****************************************************************
*********
EQUATIONS

!CIN1   =  (MODE16  #  MODE8) & (!CIN0 & G0n  #  P0n & G0n)
         #  MODE4 & !CARRY;

!CIN2   =   MODE16 & (G1n & P1n  #  G0n & G1n & P0n  #  !CIN0 & G0
n & G1n)
         # (MODE8  # MODE4) & !CARRY ;

!CIN3   =  MODE16 & (G2n & P2n
                  #  G1n & G2n & P1n
                  #  G0n  & G1n & G2n & P0n
                  # !CIN0 & G2n & G1n & G0n )
         #  MODE8 & (!CIN2 & G2n  #  P2n & G2n)
```

```
Sun Mar  4 17:38:00 1990  a:cla.abl  Page 2, Line 54

         #  MODE4 & !CARRY ;

!CIN0    = !CARRY ;

"***************************************************************************
********

"test_vectors

"([CLK , F_H  ,H_SYNC ,CLRA ,OE  ]  ->  [ AA    ,    BB    ] )
" [C    ,^h0    ,    1    , 1    , 0  ]  ->  [^h0    ,    ^h0    ] ;

end  CARRY_LOOK_AHEAD;
```

```
Tue Jan 23 17:14:10 1990  a:clkgen.abl  Page 1, Line 1


module   CLOCK_GENERATOR


title
'THIS MODULE SYNCHRONIZES THE CLOCKS WITH THE H_SYNC '


    CLKGEN   device      'P16R8' ;

" Constants:

     H           =      1;
     L           =      0;
     X           =      .X.;              " ABEL 'don't care' symbo
l
     C           =      .C.;              " ABEL 'clocking input' S
ymbol


"PIN NAMES:

CLK , OE ,A0 ,A1 ,A2 ,A3 ,B0 ,B1 ,B2 ,B3         PIN
1   , 11 ,19 ,18 ,17 ,16 ,15 ,14 ,13 ,12         ;

" CLR IS USED FOR SIMULATION ONLY!

H_SYNC ,F_H0 ,F_H1 ,F_H2 ,F_H3 ,CLRA   PIN    "F_H = FINE HORIZONT
AL ADJ.
  2    ,  3  , 4   ,  5  ,  6  ,  7   ;


F_H     =    [ F_H3 ,F_H2 ,F_H1 ,F_H0 ] ;
AA      =    [ A3 , A2 , A1 , A0 ];
BB      =    [ B3 , B2 , B1 , B0 ];

"MACROS

ZEROA macro {( !A3 & !A2 & !A1 & !A0 )};
ZEROB macro {( !B3 & !B2 & !B1 & !B0 )};
CE    macro {( H_SYNC # ZEROB # !ZEROA )};
LD    macro {( H_SYNC )};

"*****************************************************************
*********
EQUATIONS

A0     :=   (CE & !A0  #  !CE & A0) & !CLRA ;
A1     :=   (CE & (A1 + A0)  #  !CE & A1) & !CLRA ;
A2     :=   (CE & (A2 + (A1 & A0))  #  !CE & A2) & !CLRA ;
A3     :=   (CE & (A3 + (A2 & A1 & A0))  #  !CE & A3) & !CLRA ;

B0     :=   !LD & !B0                      #  LD & F_H0 ;
B1     :=   !LD & (B1 +  B0)               #  LD & F_H1 ;
B2     :=   !LD & (B2 + (B1 & B0))         #  LD & F_H2 ;
B3     :=   !LD & (B3 + (B2 & B1 & B0))    #  LD & F_H3 ;


"*****************************************************************
```

```
Tue Jan 23 17:14:10 1990  a:clkgen.abl  Page 2, Line 55

********

test_vectors

([CLK , F_H  ,H_SYNC ,CLRA ,OE  ]  ->  [ AA   ,   BB   ] )

 [C   ,^h0   ,   1   , 1   , 0  ]  ->  [^h0   ,  ^h0   ] ;
 [C   ,^h0   ,   1   , 1   , 0  ]  ->  [^h0   ,  ^h0   ] ;
 [C   ,^h0   ,   1   , 0   , 0  ]  ->  [^h1   ,  ^h0   ] ;
 [C   ,^h0   ,   1   , 0   , 0  ]  ->  [^h2   ,  ^h0   ] ;
 [C   ,^h0   ,   1   , 0   , 0  ]  ->  [^h3   ,  ^h0   ] ;
 [C   ,^h0   ,   1   , 0   , 0  ]  ->  [^h4   ,  ^h0   ] ;
 [C   ,^h0   ,   1   , 0   , 0  ]  ->  [^h5   ,  ^h0   ] ;
 [C   ,^h0   ,   1   , 0   , 0  ]  ->  [^h6   ,  ^h0   ] ;
 [C   ,^h0   ,   1   , 0   , 0  ]  ->  [^h7   ,  ^h0   ] ;
 [C   ,^h0   ,   1   , 0   , 0  ]  ->  [^h8   ,  ^h0   ] ;
 [C   ,^h0   ,   1   , 0   , 0  ]  ->  [^h9   ,  ^h0   ] ;
 [C   ,^h0   ,   1   , 0   , 0  ]  ->  [^hA   ,  ^h0   ] ;
 [C   ,^h0   ,   1   , 0   , 0  ]  ->  [^hB   ,  ^h0   ] ;
 [C   ,^h0   ,   1   , 0   , 0  ]  ->  [^hC   ,  ^h0   ] ;
 [C   ,^h0   ,   1   , 0   , 0  ]  ->  [^hD   ,  ^h0   ] ;
 [C   ,^h0   ,   1   , 0   , 0  ]  ->  [^hE   ,  ^h0   ] ;
 [C   ,^h0   ,   1   , 0   , 0  ]  ->  [^hF   ,  ^h0   ] ;
 [C   ,^h0   ,   1   , 0   , 0  ]  ->  [^h0   ,  ^h0   ] ;
 [C   ,^h0   ,   1   , 0   , 0  ]  ->  [^h1   ,  ^h0   ] ;
 [C   ,^h0   ,   0   , 0   , 0  ]  ->  [^h2   ,  ^h1   ] ;
 [C   ,^h0   ,   0   , 0   , 0  ]  ->  [^h3   ,  ^h2   ] ;
 [C   ,^h0   ,   0   , 0   , 0  ]  ->  [^h4   ,  ^h3   ] ;
 [C   ,^h0   ,   0   , 0   , 0  ]  ->  [^h5   ,  ^h4   ] ;
 [C   ,^h0   ,   0   , 0   , 0  ]  ->  [^h6   ,  ^h5   ] ;
 [C   ,^h0   ,   0   , 0   , 0  ]  ->  [^h7   ,  ^h6   ] ;
 [C   ,^h0   ,   0   , 0   , 0  ]  ->  [^h8   ,  ^h7   ] ;
 [C   ,^h0   ,   0   , 0   , 0  ]  ->  [^h9   ,  ^h8   ] ;
 [C   ,^h0   ,   0   , 0   , 0  ]  ->  [^hA   ,  ^h9   ] ;
 [C   ,^h0   ,   0   , 0   , 0  ]  ->  [^hB   ,  ^hA   ] ;
 [C   ,^h0   ,   0   , 0   , 0  ]  ->  [^hC   ,  ^hB   ] ;
 [C   ,^h0   ,   0   , 0   , 0  ]  ->  [^hD   ,  ^hC   ] ;
 [C   ,^h0   ,   0   , 0   , 0  ]  ->  [^hE   ,  ^hD   ] ;
 [C   ,^h0   ,   0   , 0   , 0  ]  ->  [^hF   ,  ^hE   ] ;
 [C   ,^h0   ,   0   , 0   , 0  ]  ->  [^h0   ,  ^hF   ] ;
 [C   ,^h0   ,   0   , 0   , 0  ]  ->  [^h0   ,  ^h0   ] ;
 [C   ,^h0   ,   0   , 0   , 0  ]  ->  [^h1   ,  ^h1   ] ;
 [C   ,^h0   ,   0   , 0   , 0  ]  ->  [^h2   ,  ^h2   ] ;
 [C   ,^h0   ,   0   , 0   , 0  ]  ->  [^h3   ,  ^h3   ] ;

 [C   ,^h5   ,   1   , 0   , 0  ]  ->  [^h4   ,  ^h5   ] ;
 [C   ,^h5   ,   1   , 0   , 0  ]  ->  [^h5   ,  ^h5   ] ;
 [C   ,^h5   ,   1   , 0   , 0  ]  ->  [^h6   ,  ^h5   ] ;
 [C   ,^h5   ,   1   , 0   , 0  ]  ->  [^h7   ,  ^h5   ] ;
 [C   ,^h5   ,   1   , 0   , 0  ]  ->  [^h8   ,  ^h5   ] ;
 [C   ,^h5   ,   1   , 0   , 0  ]  ->  [^h9   ,  ^h5   ] ;

 [C   ,^h5   ,   0   , 0   , 0  ]  ->  [^hA   ,  ^h6   ] ;
 [C   ,^h5   ,   0   , 0   , 0  ]  ->  [^hB   ,  ^h7   ] ;
 [C   ,^h5   ,   0   , 0   , 0  ]  ->  [^hC   ,  ^h8   ] ;
 [C   ,^h5   ,   0   , 0   , 0  ]  ->  [^hD   ,  ^h9   ] ;
 [C   ,^h5   ,   0   , 0   , 0  ]  ->  [^hE   ,  ^hA   ] ;
```

Tue Jan 23 17:14:10 1990 a:clkgen.abl Page 3, Line 114

```
[C   ,^h5   ,   0   , 0   , 0  ]  ->  [^hF   ,   ^hB   ] ;
[C   ,^h5   ,   0   , 0   , 0  ]  ->  [^h0   ,   ^hC   ] ;
[C   ,^h5   ,   0   , 0   , 0  ]  ->  [^h0   ,   ^hD   ] ;
[C   ,^h5   ,   0   , 0   , 0  ]  ->  [^h0   ,   ^hE   ] ;
[C   ,^h5   ,   0   , 0   , 0  ]  ->  [^h0   ,   ^hF   ] ;
[C   ,^h5   ,   0   , 0   , 0  ]  ->  [^h0   ,   ^h0   ] ;
[C   ,^h5   ,   0   , 0   , 0  ]  ->  [^h1   ,   ^h1   ] ;
[C   ,^h5   ,   0   , 0   , 0  ]  ->  [^h2   ,   ^h2   ] ;
[C   ,^h5   ,   0   , 0   , 0  ]  ->  [^h3   ,   ^h3   ] ;


end  CLOCK_GENERATOR;
```

```
Tue Feb 27 18:51:36 1990  a:cnt.abl  Page 1, Line 1


MODULE   REGULAR_UPCOUNTER;

title

'This module serves as  error counter with 3 state outputs .'


   CNT   device      'P20X10';

" Constants:
     l            =      0 ;
     h            =      1 ;
     X          . =     .X.;              " ABEL 'don't care' s
l
     C            =     .C.;              " ABEL 'clocking inpu
ymbol


"PIN NAMES:


CLK   , CEn ,CLR_ERR , OE     PIN
  1   ,  2  ,   3    , 13     ;


ERCNT4 ,ERCNT5 ,ERCNT6 ,ERCNT7 ,ERCNT8 ,ERCNT9 ,ERCNT10 ,ERCNT
ERCNT12  PIN
   14  ,  15   ,   16  ,   17  ,   18  ,   19  ,    20  ,    2
    22  ;

nCE_MSB  PIN
   23   ;



"MADR     =  [ MADR8 ,MADR7 ,MADR6 ,MADR5 ,MADR4 ,MADR3 ,MADR2
R1 ,MADR0 ] ;

Q0  macro  {ERCNT4};
Q1  macro  {ERCNT5};
Q2  macro  {ERCNT6};
Q3  macro  {ERCNT7};
Q4  macro  {ERCNT8};
Q5  macro  {ERCNT9};
Q6  macro  {ERCNT10};
Q7  macro  {ERCNT11};
Q8  macro  {ERCNT12};

CLR macro  {CLR_ERR};

""""""""""""""""""""""""""""""""""""""""""""""""""""""""""""""
""""""""
 EQUATIONS

!Q0  :=   (!CEn & !CLR)
(!Q0 # CLR);
!Q1  :=   (!CEn & Q0 & !CLR)
```

Tue Feb 27 18:51:36 1990 a:cnt.abl Page 2, Line 52

```
(!Q1 # CLR);
!Q2  :=   (!CEn & Q0 & Q1 & !CLR)
(!Q2 # CLR);
!Q3  :=   (!CEn & Q0 & Q1 & Q2 & !CLR)
(!Q3 # CLR);
!Q4  :=   (!CEn & Q0 & Q1 & Q2 & Q3 & !CLR)
(!Q4 # CLR);
!Q5  :=   (!CEn & Q0 & Q1 & Q2 & Q3 & Q4 & !CLR)
(!Q5 # CLR);
!Q6  :=   (!CEn & Q0 & Q1 & Q2 & Q3 & Q4 & Q5 & !CLR)
(!Q6 # CLR);
!Q7  :=   (!CEn & Q0 & Q1 & Q2 & Q3 & Q4 & Q5 & Q6 & !CLR)
(!Q7 # CLR);
!Q8  :=   (!CEn & Q0 & Q1 & Q2 & Q3 & Q4 & Q5 & Q6 & Q7 & !CLR}
(!Q8 # CLR);

nCE_MSB  :=  !( !Q0 & Q1 & Q2 & Q3 & Q4 & Q5 & Q6 & Q7 & Q8 & !
 & !CLR
             #   CEn & !nCE_MSB );

""""""""""""""""""""""""""""""""""""""""""""""""""""""""""""""""""""""
""""""""""""""

"test_vectors

"([MADR ,MINUS1] -> [ CADR ]);

" [^h000 ,  0  ] -> [ ^h000 ] ;

END REGULAR_UPCOUNTER;
```

```
Sun Feb 18 09:44:34 1990  a:cntmsb.abl  Page 1, Line 1


MODULE   REGULAR_UPCOUNTER_MSB;

title

'This module serves as msb error counter with 3 state outputs .'


   CNTMSB   device      'P16R8';

" Constants:
     l           =     0 ;
     h           =     1 ;
     X          .=    .X.;                " ABEL 'don't care' symb
l
     C           =    .C.;                " ABEL 'clocking input'
ymbol


"PIN NAMES:


CLK   , CEn ,CLR_ERR ,PREV_CEn , OE      PIN
  1   ,  2  ,   3     ,    4    , 11      ;


ERCNT13 ,ERCNT14 ,ERCNT15  PIN
   12   ,  13    ,   14     ;




Q0  macro  {ERCNT13};
Q1  macro  {ERCNT14};
Q2  macro  {ERCNT15};


""""""""""""""""""""""""""""""""""""""""""""""""""""""""""""""""""""""""""""
""""""""
 EQUATIONS

!Q0  :=   ((!CEn & !PREV_CEn)          +  !Q0)  #  CLR_ERR;
!Q1  :=   ((!CEn & !PREV_CEn & Q0)     +  !Q1)  #  CLR_ERR;
!Q2  :=   ((!CEn & !PREV_CEn & Q0 & Q1) + !Q2)  #  CLR_ERR;

""""""""""""""""""""""""""""""""""""""""""""""""""""""""""""""""""""""""""""
""""""""""""""

"test_vectors

"([MADR ,MINUS1] -> [ CADR ]);

" [^h000 ,  0  ] -> [ ^h000 ] ;

END REGULAR_UPCOUNTER_MSB;
```

```
Sun Feb 25 20:37:12 1990   a:cont2.abl  Page 1, Line 1


module    TIMMING_CONTROL_GENERATOR2


title
'THIS MODULE GENERATES EN_SC  SIGNALS'


   CONT2  device      'P16R8' ;

" Constants:

     H            =      1;
     L            =      0;
     X            =     .X.;              " ABEL 'don't care' symbo
l
     C            =     .C.;              " ABEL 'clocking input' s
ymbol


"PIN NAMES:
CLK , OE ,A0 ,A1 ,A2 ,A3 ,BLANKn ,EN_OUTSC ,DISPALL ,DEL_ERR  PIN
1   , 11 , 2 , 3 , 4 , 5 ,  6    ,   7     ,   8    ,   9  ;

EN_MSKSC , EN_DFRSC , EN_ERRSC ,HERR_CE ,EN_INT2 , CLR_ERR ,R_HA
,CLK345  PIN
   12    ,    13    ,    14    ,  15    ,   16   ,  17     , 18
,   19   ;


AA      =    [ A3 , A2 , A1 , A0 ];

"MACROS

ZEROA  macro {( !A3 & !A2 & !A1 & !A0 )};
ONE    macro {( !A3 & !A2 & !A1 &  A0 )};
TWO    macro {( !A3 & !A2 &  A1 & !A0 )};
THREE  macro {( !A3 & !A2 &  A1 &  A0 )};
FOUR   macro {( !A3 &  A2 & !A1 & !A0 )};
FIVE   macro {( !A3 &  A2 & !A1 &  A0 )};
SIX    macro {( !A3 &  A2 &  A1 & !A0 )};
SEVEN  macro {( !A3 &  A2 &  A1 &  A0 )};

EIGHT  macro {(  A3 & !A2 & !A1 & !A0 )};
NINE   macro {(  A3 & !A2 & !A1 &  A0 )};
HA     macro {(  A3 & !A2 &  A1 & !A0 )};
HB     macro {(  A3 & !A2 &  A1 &  A0 )};
HC     macro {(  A3 &  A2 & !A1 & !A0 )};
HD     macro {(  A3 &  A2 & !A1 &  A0 )};
HE     macro {(  A3 &  A2 &  A1 & !A0 )};
HF     macro {(  A3 &  A2 &  A1 &  A0 )};



"*****************************************************************
*********
EQUATIONS
```

```
Sun Feb 25 20:37:12 1990  a:cont2.abl  Page 2, Line 55

EN_MSKSC   :=  !DISPALL & (HF     & EN_OUTSC  #  !HF     & EN_MSKSC)
             #  DISPALL & (SEVEN & BLANKn    #  !SEVEN & EN_MSKSC)
;

R_HA       :=   NINE ;

EN_DFRSC   :=  !DISPALL & (R_HA   & EN_MSKSC  #  !R_HA   & EN_DFRSC)
             #  DISPALL & (SEVEN & BLANKn    #  !SEVEN & EN_DFRSC)
;

EN_ERRSC   :=  !DISPALL & (TWO & EN_DFRSC   #  !TWO   & EN_ERRSC)
             #  DISPALL & (SEVEN & BLANKn   #  !SEVEN & EN_ERRSC)

CLK345     :=  !(A0 + A1) ;

HERR_CE    :=   HD & EN_DFRSC  #  !HD & HERR_CE ;

EN_INT2    :=   HD    & EN_OUTSC  #  !HD    & EN_INT2 ;

CLR_ERR    :=   DEL_ERR & EN_OUTSC & !EN_INT2 & EIGHT  #  !EN_INT2
& CLR_ERR ;


"*****************************************************************
********

"test_vectors

"([CLK , LDB  ,H_SYNC ,CLRA ,OE  ]  ->  [ AA   ,   BB   ] )
" [C   ,^h0   ,   1   , 1   , 0  ]  ->  [^h0   ,  ^h0   ] ;
end  TIMMING_CONTROL_GENERATOR2 ;
```

```
Tue May 22 15:00:14 1990  a:contv2.abl  Page 1, Line 1


module   TIMMING_CONTROL_GENERATOR


title
'THIS MODULE GENERATES SOME OF THE VIDEO TIMMING SIGNALS'


    CONTV2  device     'P20R8' ;

" Constants:

     H          =     1;
     L          =     0;
     X          =     .X.;               " ABEL 'don't care' symbo
l
     C          =     .C.;               " ABEL 'clocking input'sy
ymbol


"PIN NAMES:
CLK , OE ,A0 ,A1 ,A2 ,A3 ,BLANKn ,H_SYNC ,SRD   PIN
1   , 13 , 2 , 3 , 4 , 5 ,  6    ,   7   , 8    ;

B0 , B1 , B2 , B3    PIN
10 , 11 , 14 , 23  ;

B4   PIN  22  ;  " B4 IS  USED FOR GENERATING GSP_H ONLY.

EN_OUTSC , EN_INTSC , EN_EXTSC , LEI , PRLL_LD  , PRLL_CKn ,GSP_H
  PIN
   15    ,    16    ,    17    , 18 ,    19    ,    20    ,  21
 ;


AA      =   [ A3 , A2 , A1 , A0 ];

"MACROS

ZEROA  macro {( !A3 & !A2 & !A1 & !A0 )};
ONE    macro {( !A3 & !A2 & !A1 &  A0 )};
TWO    macro {( !A3 & !A2 &  A1 & !A0 )};
THREE  macro {( !A3 & !A2 &  A1 &  A0 )};
FOUR   macro {( !A3 &  A2 & !A1 & !A0 )};
FIVE   macro {( !A3 &  A2 & !A1 &  A0 )};
SIX    macro {( !A3 &  A2 &  A1 & !A0 )};
SEVEN  macro {( !A3 &  A2 &  A1 &  A0 )};

EIGHT  macro {(  A3 & !A2 & !A1 & !A0 )};
NINE   macro {(  A3 & !A2 & !A1 &  A0 )};
HA     macro {(  A3 & !A2 &  A1 & !A0 )};
HB     macro {(  A3 & !A2 &  A1 &  A0 )};
HC     macro {(  A3 &  A2 & !A1 & !A0 )};
HD     macro {(  A3 &  A2 & !A1 &  A0 )};
HE     macro {(  A3 &  A2 &  A1 & !A0 )};
HF     macro {(  A3 &  A2 &  A1 &  A0 )};

LD    macro {( H_SYNC )};
```

```
Tue May 22 15:00:14 1990  a:contv2.abl  Page 2, Line 55

"*****************************************************************
*********
EQUATIONS

EN_OUTSC   :=   SEVEN & BLANKn    #  !SEVEN & EN_OUTSC ;
EN_INTSC   :=   HD    & EN_OUTSC  #  !HD    & EN_INTSC ;
EN_EXTSC   :=   FOUR  & EN_OUTSC  #  !FOUR  & EN_EXTSC ;
LEI        :=   THREE # SEVEN # HB # HF ;
PRLL_LD    :=   SRD & ( TWO # SIX # HA # HE ) ;
PRLL_CKn   :=  !( THREE # SEVEN # HB # HF );

B4     :=  !LD & (B4 + (B3 & B2 & B1 & B0))  ;
!GSP_H :=  B4 & B3 & B2 & B1 & B0 & !H_SYNC & GSP_H
        # !GSP_H & (!H_SYNC  #  !HF ) ;


"*****************************************************************
********


"test_vectors

"([CLK , LDB  ,H_SYNC ,CLRA ,OE  ]  ->  [ AA   ,   BB   ] )

" [C   ,^h0   ,   1    , 1   , 0  ]  ->  [^h0   ,  ^h0   ] ;

end  TIMMING_CONTROL_GENERATOR;
```

```
Tue Jan  1 00:19:48 1980   a:dfr.abl  Page 1, Line 1


module   DIFFERENCES_CONTROL_GENERATOR


title
'THIS MODULE SUPPLIES THE DIFFERENCE PIXEL VALUES TO THE DFRNCS F.
B.'


     DFR  device      'P20R8' ;

" Constants:

     H            =      1;
     L            =      0;
     X            =     .X.;               " ABEL 'don't care' symbo
l
     C            =     .C.;               " ABEL 'clocking input' s
ymbol


"PIN NAMES:
CLK , OE ,MSKA , MSKB ,POLAR ,MSK_EN   PIN
1   , 13 ,  2  ,  3   ,  23  ,  14     ;

PIXA0 ,PIXA1 ,PIXA2 ,PIXA3 ,PIXB0 ,PIXB1 ,PIXB2 ,PIXB3   PIN
  4   ,  5   ,  6  ,  7   ,  8   ,  9   ,  10  ,  11  ;

DFRA0 ,DFRA1 ,DFRA2, DFRA3 ,DFRB0 ,DFRB1 ,DFRB2 ,DFRB3    PIN
  15  ,  16  ,  17 ,  18   ,  19  ,   20 ,  21  ,  22  ;


PIXA   =   [ PIXA3 , PIXA2 , PIXA1 , PIXA0 ];
PIXB   =   [ PIXB3 , PIXB2 , PIXB1 , PIXB0 ];

"MACROS


FMASKA  macro {(( MSKA + POLAR ) # MSK_EN )};
FMASKB  macro {(( MSKB + POLAR ) # MSK_EN )};


"*****************************************************************
*********
EQUATIONS

DFRA0  :=  FMASKA & PIXA0 ;
DFRA1  :=  FMASKA & PIXA1 ;
DFRA2  :=  FMASKA & PIXA2 ;
DFRA3  :=  FMASKA & PIXA3 ;

DFRB0  :=  FMASKB & PIXB0 ;
DFRB1  :=  FMASKB & PIXB1 ;
DFRB2  :=  FMASKB & PIXB2 ;
DFRB3  :=  FMASKB & PIXB3 ;

"*****************************************************************
```

Tue Jan 1 00:19:48 1980 a:dfr.abl Page 2, Line 55

```
"test_vectors

"([CLK , LDB  ,H_SYNC ,CLRA ,OE  ]  ->  [ AA   ,   BB   ] )
" [C    ,^h0   ,   1   , 1   , 0  ]  ->  [^h0   ,  ^h0   ] ;
end  DIFFERENCES_CONTROL_GENERATOR;
```

```
Tue Apr 17 16:19:38 1990  a:dvcpal.abl  Page 1, Line 1


module DVCPAL
title 'host DEVICE decoder PAL
Speiser Zvi 13 March  1990 Mercury Interactive'

        U83   device  'P16L8';


           A23,A22,A21,A20        pin 1,2,3,4;
           A19,A18,A17            pin 5,6,7;
           AEN,BALE               pin 8,9;
           nMRD,nMWR              pin 13,11;

           nEMCS16,nMCS16         pin 14,12;

       MWR   macro   {!nMWR};   -
       MRD   macro   {!nMRD};


equations

"               0CXX H Host address

"   nEMCS16 = !(!A23 & !A22 & !A21 & !A20 & A19 & A18 & !A17 & !AE
N & BALE
"                 # !A23 & !A22 & !A21 & !A20 & A19 & A18 & !A17 &
!nEMCS16
"                 # (MRD # MWR) & !nEMCS16);


"               CCXX H Host address

    nEMCS16 = !(A23 & A22 & !A21 & !A20 & A19 & A18 & !A17 & !AEN
& BALE
                  # A23 & A22 & !A21 & !A20 & A19 & A18 & !A17 & !n
EMCS16
                  # (MRD # MWR) & !nEMCS16);


        nMCS16  = 0;

        ENABLE nMCS16 = !nEMCS16;



end DVCPAL
```

Sat Feb 17 06:10:00 1990 a:errcnt.abl Page 1, Line 1

```
module   ERROR_COUNTER

title
'THIS MODULE COUNTS THE NUMBER OF PIXELS THAT MISSMATCH '

 ERRCNT device      'P16R4' ;

" Constants:

     H          =      1;
     L          =      0;
     X          =      .X.;            " ABEL 'don't care' symbo
l
     C          =      .C.;            " ABEL 'clocking input' s
ymbol

"PIN NAMES:

CLK , OE    PIN
1   , 11    ;

ERR0 ,ERR1 ,ERR2 ,HERR_CE ,CLR_ERR  PIN
  2  ,  3  ,  4  ,  5     ,  9      ;

ERCNT0 ,ERCNT1 ,ERCNT2 ,ERCNT3 , CEOn  ,CIN2n ,CIN3n  PIN
  14   ,  15   ,  16   ,  17   ,  19   , 12   , 13 ;

ERR    =   [ ERR2    , ERR1 , ERR0 ];
ERCNT =   [ ERCNT2 , ERCNT1 , ERCNT0 ];

"MACROS

"*****************************************************************
*********
EQUATIONS

ERCNT0   := (HERR_CE & (ERCNT0 + ERR0)
           # !HERR_CE & ERCNT0) & !CLR_ERR ;

ERCNT1   := (HERR_CE & (ERCNT1 + ERR1 + (ERCNT0 & ERR0))
           # !HERR_CE & ERCNT1) & !CLR_ERR  ;

!CIN2n    =  (ERCNT0 & ERR0) & (ERCNT1 # ERR1) # (ERCNT1 & ERR1) ;

ERCNT2   :=  (HERR_CE & (ERCNT2 + ERR2 + !CIN2n)
            # !HERR_CE  & ERCNT2) & !CLR_ERR ;

!CIN3n    = (ERCNT0 & ERR0) & (ERCNT1 # ERR1) & (ERCNT2 # ERR2)
           # (ERCNT1 & ERR1) & (ERCNT2 # ERR2)
           # (ERCNT2 & ERR2) ;
```

```
Sat Feb 17 06:10:00 1990  a:errcnt.abl  Page 2, Line 57

ERCNT3  := (HERR_CE & (ERCNT3 + !CIN3n)
         # !HERR_CE & ERCNT3) & !CLR_ERR ;

!CEOn    = ((ERCNT0 & ERR0) & (ERCNT1 # ERR1) & (ERCNT2 # ERR2)  &
 ERCNT3
          # (ERCNT1 & ERR1) & (ERCNT2 # ERR2)                    &
 ERCNT3
          # (ERCNT2 & ERR2)                          & ERCNT3)  &
 HERR_CE ;

"****************************************************************
********

"test_vectors

"([CLK , LDB  ,H_SYNC ,CLRA ,OE  ]  ->  [ AA   ,   BB   ] )
" [C   ,^h0   ,   1   , 1   , 0  ]  ->  [^h0   ,  ^h0   ] ;

end   ERROR_COUNTER;
```

```
Tue Mar 27 18:52:34 1990  a:feed_msb.abl  Page 1, Line 1


module   FEEDBACK_TO_ALU_MSB


title
'THIS MODULE GENERATES THE FEEDBACK TO THE ALU FOR SIGNATURE '


FEED_MSB  device     'P20L8' ;

" Constants:

     H           =      1;
     L           =      0;
     X           =     .X.;                " ABEL 'don't care' symbol

     C           =     .C.;                " ABEL 'clocking input' sy
mbol


"PIN NAMES:

ALUO15 ,ALUO14 ,ALUO13 ,ALUO12 ,ALUO11 ,ALUO10 ,ALUO9  ,ALUO8  ,AL
UO7   PIN
  1    ,   2   ,   3   ,   4   ,   5   ,   6   ,   7   ,   8   ,
9  ;

BLU8 ,BLU9 ,BLU10 ,BLU11 ,BLU12 ,BLU13 ,BLU14 ,BLU15   PIN
 15   ,  16 , 17   ,  18  , 19   , 20   , 21   ,  22   ;

FB_EN ,ZERO_B   PIN
 10    ,  11    ;


BLU  = [BLU15  ,BLU14  ,BLU13  ,BLU12  ,BLU11  ,BLU10  ,BLU9   ,BL
U8 ] ;
ALUO = [ALUO15 ,ALUO14 ,ALUO13 ,ALUO12 ,ALUO11 ,ALUO10 ,ALUO9  ,AL
UO8] ;

"MACROS


"*****************************************************************
*********
EQUATIONS

BLU8   =   ALUO8  & !ZERO_B ;
BLU9   =   ALUO9  & !ZERO_B ;
BLU10  =   ALUO10 & !ZERO_B ;
BLU11  =   ALUO11 & !ZERO_B ;

BLU12  =   ALUO12 & !ZERO_B ;
BLU13  =   ALUO13 & !ZERO_B ;
BLU14  =   ALUO14 & !ZERO_B ;
BLU15  =   ALUO15 & !ZERO_B ;

enable BLU = FB_EN ;
```

```
Tue Mar 27 18:52:34 1990  a:feed_msb.abl  Page 2, Line 52

"*****************************************************************
********

test_vectors

([ALUO , FB_EN , ZERO_B ]  ->  [ BLU ] )

 [^hAA ,   1   ,   0    ]  ->  [^hAA ] ;
 [^h55 ,   1   ,   0    ]  ->  [^h55 ] ;
 [^h55 ,   1   ,   1    ]  ->  [^h00 ] ;
 [^h55 ,   0   ,   X    ]  ->  [ .Z. ] ;


end  FEEDBACK_TO_ALU_MSB ;
```

```
Mon Mar 26 16:53:24 1990   a:feedback.abl   Page 1, Line 1


module   FEEDBACK_TO_ALU


title
'THIS MODULE GENERATES THE FEEDBACK TO THE ALU FOR SIGNATURE '


FEEDBACK  device     'P20L8' ;

" Constants:

     H            =     1;
     L            =     0;
     X            =     .X.;                " ABEL 'don't care' symbol

     C            =     .C.;                " ABEL 'clocking input' sy
mbol


"PIN NAMES:

ALUO8 ,ALUO7 ,ALUO6 ,ALUO5 ,ALUO4 ,ALUO3 ,ALUO2 ,ALUO1 ,ALUO0  PIN

  1   ,  2   ,  3   ,  4   ,  5   ,  6   ,  7   ,  8   ,  9  ;

BLU0 ,BLU1 ,BLU2 ,BLU3 ,BLU4 ,BLU5 ,BLU6 ,BLU7   PIN
 15  ,  16 , 17  ,  18 , 19  , 20  , 21  , 22  ;

FB_EN ,ZERO_B   PIN
 10   ,  11   ;


BLU  = [BLU7  ,BLU6  ,BLU5  ,BLU4  ,BLU3  ,BLU2  ,BLU1  ,BLU0 ] ;
ALUO = [ALUO7 ,ALUO6 ,ALUO5 ,ALUO4 ,ALUO3 ,ALUO2 ,ALUO1 ,ALUO0] ;

"MACROS

"*****************************************************************
*********
EQUATIONS

BLU0  =  ALUO0 & !ZERO_B ;
BLU1  =  ALUO1 & !ZERO_B ;
BLU2  =  ALUO2 & !ZERO_B ;
BLU3  =  ALUO3 & !ZERO_B ;

BLU4  =  ALUO4 & !ZERO_B ;
BLU5  =  ALUO5 & !ZERO_B ;
BLU6  =  ALUO6 & !ZERO_B ;
BLU7  =  ALUO7 & !ZERO_B ;

enable BLU = FB_EN ;

"*****************************************************************
********
```

Mon Mar 26 16:53:24 1990 a:feedback.abl Page 2, Line 55

```
test_vectors

([ALU0 , FB_EN , ZERO_B ]  ->  [ BLU ] )

 [^hAA ,   1   ,   0    ]  ->  [^hAA ] ;
 [^h55 ,   1   ,   0    ]  ->  [^h55 ] ;
 [^h55 ,   1   ,   1    ]  ->  [^h00 ] ;
 [^h55 ,   0   ,   X    ]  ->  [ .Z. ] ;


end  FEEDBACK_TO_ALU ;
```

```
Wed Mar 21 17:28:10 1990   a:gma8pal.abl  Page 1, Line 1

module GMA8PAL
title 'Generate MA8 and gp functions
Speiser Zvi 21 March 1990 Mercury Interactive'

        U11    device  'P16L8';


        nSMRD,nSMWR,RESET         pin 1,2,3;
        LCLK1,LCLK2               pin 6,7;
        nLAL,PAD8,LLA20           pin 8,9,11;
        MA8,nMRD,nMWR             pin 19,18,17;
        nRESET,DSR                pin 16,12;
        TRQE,BTRQE                pin 5,14;

      LAL     macro    {!nLAL};


equations
        MA8   =   (LLA20 & !LCLK2 # PAD8 & LCLK2 & nLAL);

        DSR   =   !LCLK1 & LCLK2 & nLAL;

        nMRD =   (nSMRD);

        nMWR =   (nSMWR);

        nRESET = (!RESET);

        BTRQE   = TRQE;

end GMA8PAL
```

```
Tue Mar 13 10:28:22 1990  a:hdecpal.abl  Page 1, Line 1


module HDECPAL
title 'Host DECoder PAL
Speiser Zvi 13 March  1990 Mercury Interactive'

        U6    device  'P16L8';

           A16                  pin 4;
           A15,A14,A13,A12      pin 5,6,7,8;
           A11,A10,A9,A8        pin 9,11,16,13;
           nEMCS16              pin 1;

           nHCS,HFS1,HFS0       pin 19,18,17;


equations

        nHCS  = !(!A16 & !A15 & A14 & A13 & A12 & !nEMCS16);

        HFS1  = !(!A16 & !A15 & A14 & A13 & A12
                 & (!A11 # !A10 # !A9) & !nEMCS16);

        HFS0  =!(!A16 & !A15 & A14 & A13 & A12
                 & A11 & A10 & A8 & !nEMCS16);



end HDECPAL
```

```
Tue May 15 11:36:26 1990   a:lcrpal.abl  Page 1, Line 1


module LCRPAL
title 'Load Control Register Decoder
Speiser Zvi 25 February 1990 Mercury Interactive'

        U15   device  'P20L8';


        DSR,nRAS,nTRQE          pin 5,3,4;
        LAD14                   pin 7;
        LAD13,LAD12,LAD11       pin 8,9,10;
        LAD10                   pin 11;
        MA2,MA1,MA0,nW          pin 13,14,23,1;

        nLCR3,nLCR2,nLCR1       pin 22,21,20;
        nLCR0,nRR0,nINTOUT      pin 19,15,18;
        CRPL                    pin 16;

      RAS     macro   {!nRAS};               "RAS    = Positive RAS
                                             "nRAS   = Negative RAS
      TRQE    macro   {!nTRQE};              "!nRAS  = Positive RAS
      A26     macro   {LAD14};
      A25     macro   {LAD13};
      A24     macro   {LAD12};
      A23     macro   {LAD11};
      A22     macro   {LAD10};
      W       macro   {!nW};
      LCR3    macro   {!nLCR3};
      LCR2    macro   {!nLCR2};
      LCR1    macro   {!nLCR1};
      LCR0    macro   {!nLCR0};
      INTOUT  macro   {!nINTOUT};
      RR0     macro   {!nRR0};

      HDRS     =      [A26,A25,A24,A23,A22];
      ADRS     =      [MA2,MA1,MA0];
      LCRS     =      [nINTOUT,nRR0,nLCR3,nLCR2,nLCR1,nLCR0];


equations
        CRPL      = DSR & RAS & !A26 & !A25 & A24 & A23 & A22
                    # RAS & CRPL;

        nLCR3     = !(CRPL & !MA2 & MA1 & MA0 & W);

        nLCR2     = !(CRPL & !MA2 & MA1 & !MA0 & W);

        nLCR1     = !(CRPL & !MA2 & !MA1 & MA0 & W);

        nLCR0     = !(CRPL & !MA2 & !MA1 & !MA0 & W);

        nINTOUT   = !(CRPL & MA2 & MA1 & MA0 & W);

        nRR0      = !(CRPL & MA2 & !MA1 & !MA0 & TRQE);


 test_vectors
        ([DSR,RAS, W ,TRQE,HDRS ,ADRS] ->  [ LCRS ])
```

```
Tue May 15 11:36:26 1990  a:lcrpal.abl  Page 2, Line 60

           [ 0 , 1 , 1 ,  1 ,^o30 ,^o4 ] ->  [ ^o77 ];  "no DSR
           [ 1 , 0 , 1 ,  1 ,^o30 ,^o4 ] ->  [ ^o77 ];  "no RAS
           [ 1 , 1 , 0 ,  0 ,^o30 ,^o4 ] ->  [ ^o77 ];  "no W
           [ 1 , 1 , 1 ,  1 ,^o40 ,^o4 ] ->  [ ^o77 ];  "wrong HAD
RS
           [ 1 , 1 , 1 ,  0 ,^o07 ,^o0 ] ->  [ ^o76 ];  "LCR0 on
           [ 1 , 1 , 1 ,  0 ,^o07 ,^o1 ] ->  [ ^o75 ];  "LCR1 on
           [ 1 , 1 , 1 ,  1 ,^o07 ,^o2 ] ->  [ ^o73 ];  "LCR2 on
           [ 1 , 1 , 1 ,  1 ,^o07 ,^o3 ] ->  [ ^o67 ];  "LCR3 on

end LCRPAL
```

```
Fri Apr 13 10:25:10 1990  a:mod_h.abl  Page 1, Line 1


module   H_SYNC_VERSUS_CLOCK


title
'THIS MODULE STOPS THE CLOCK AROUND THE FALLING OF H_SYNC'


   MOD_H  device     'P16R4' ;

" Constants:

     H            =      1;
     L            =      0;
     X            =     .X.;             " ABEL 'don't care' symbo
l
     C            =     .C.;     .       " ABEL 'clocking input' s
ymbol


"PIN NAMES:
CLK , OE ,H_SYNC,CLK_IN  PIN
1   , 11 ,   8  ,   9    ;

H1 , H2 , H3 , H4 , CLK_OUT     PIN
14 , 15 , 16 , 17 ,    12     ;



"MACROS


"*****************************************************************
*********
EQUATIONS

H1          :=    H_SYNC ;
H2          :=    H1     ;
H3          :=    H2     ;
H4          :=    H3     ;


!CLK_OUT    =     CLK_IN  #  !H1 & H4 ;


"*****************************************************************
********


"test_vectors

"([CLK , LDB  ,H_SYNC ,CLRA ,OE  ] -> [ AA   ,   BB   ] )

" [C   ,^h0   ,   1   , 1   , 0  ] -> [^h0   ,  ^h0   ] ;

end  H_SYNC_VERSUS_CLOCK;
```

```
Sun Feb 11 19:41:56 1990  a:msk_mux.abl  Page 1, Line 1


module  MASK_MULTIPLEXER


title
'THIS MODULE MULTIPLEXES THE MASK PLANES'


 MSK_MUX  device      'P20R8' ;

" Constants:

     H            =       1;
     L            =       0;
     X            =      .X.;              " ABEL 'don't care' symbo
l
     C            =      .C.;              " ABEL 'clocking input' s
ymbol


"PIN NAMES:

CLK , OE   PIN
1   , 13  ;

MSKI0 ,MSKI1 ,MSKI2 ,MSKI3 ,MSKI4 ,MSKI5 ,MSKI6 ,MSKI7      PIN
  2   ,  3   ,  4   ,  5   ,  6   ,  7   ,  8   ,  9   ;

SEL0  ,SEL1   PIN
  10  ,  11   ;

MSK0 ,MSK1 ,MSK2 ,MSK3 ,MSK4 ,MSK5 ,MSK6 ,MSK7      PIN
 22  , 21  , 20  , 19  , 18  , 17  , 16  , 15  ;


"MACROS

AB  macro  {(!SEL1 & !SEL0)};
AA  macro  {(!SEL1 &  SEL0)};
BB  macro  {( SEL1 & !SEL0)};
BA  macro  {( SEL1 &  SEL0)};


"*****************************************************************
*********
EQUATIONS

MSK0   :=  AB & MSKI0  #  AA & MSKI0  #  BB & MSKI4  #  BA & MSKI4
 ;
MSK1   :=  AB & MSKI1  #  AA & MSKI1  #  BB & MSKI5  #  BA & MSKI5
 ;
MSK2   :=  AB & MSKI2  #  AA & MSKI2  #  BB & MSKI6  #  BA & MSKI6
 ;
MSK3   :=  AB & MSKI3  #  AA & MSKI3  #  BB & MSKI7  #  BA & MSKI7
 ;

MSK4   :=  AB & MSKI4  #  AA & MSKI0  #  BB & MSKI4  #  BA & MSKI0
```

Sun Feb 11 19:41:56 1990  a:msk_mux.abl  Page 2, Line 52

```
 ;
MSK5   :=  AB & MSKI5  #  AA & MSKI1  #  BB & MSKI5  #  BA & MSKI1
 ;
MSK6   :=  AB & MSKI6  #  AA & MSKI2  #  BB & MSKI6  #  BA & MSKI2
 ;
MSK7   :=  AB & MSKI7  #  AA & MSKI3  #  BB & MSKI7  #  BA & MSKI3
 ;

"*****************************************************************
********

"test_vectors

"([CLK , LDB  ,H_SYNC ,CLRA ,OE  ]  ->  [ AA   ,   BB   ] )
" [C   ,^h0   ,   1   , 1   , 0  ]  ->  [^h0   ,  ^h0   ] ;
end MASK_MULTIPLEXER ;
```

Wed Feb 28 15:36:14 1990   a:msk_mux1.abl   Page 1, Line 1

```
module  MASK_MULTIPLEXER

title
'THIS MODULE MULTIPLEXES THE MASK PLANES'

 MSK_MUX1 device      'P20R8' ;

" Constants:

     H            =        1;
     L            =        0;
     X            =       .X.;              " ABEL 'don't care' symbo
l
     C            =       .C.;              " ABEL 'clocking input' s
ymbol

"PIN NAMES:

CLK , OE   PIN
1   , 13  ;

MSKI0 ,MSKI1 ,MSKI2 ,MSKI3 ,MSKI4 ,MSKI5 ,MSKI6 ,MSKI7       PIN
  2   ,  3   ,  4   ,  5   ,  6   ,  7   ,  8   ,  9   ;

SEL0  ,SEL1  ,SEL2 ,SEL3  PIN
  10  ,  11  , 14  , 23  ;

MSK0 ,MSK1 ,MSK2 ,MSK3 ,MSK4 ,MSK5 ,MSK6 ,MSK7       PIN
 22  , 21  , 20  , 19  , 18  , 17  , 16  , 15  ;

"MACROS

SEL04    macro {( !SEL3 & !SEL2 & !SEL1 & !SEL0 )};
SEL15    macro {( !SEL3 & !SEL2 & !SEL1 &  SEL0 )};
SEL26    macro {( !SEL3 & !SEL2 &  SEL1 & !SEL0 )};
SEL37    macro {( !SEL3 & !SEL2 &  SEL1 &  SEL0 )};

"****************************************************************
*********
EQUATIONS

!MSK0   := SEL04 & MSKI0  #  SEL15 & MSKI1  #  SEL26 & MSKI2  #  S
EL37 & MSKI3;
!MSK1   := SEL04 & MSKI0  #  SEL15 & MSKI1  #  SEL26 & MSKI2  #  S
EL37 & MSKI3;
!MSK2   := SEL04 & MSKI0  #  SEL15 & MSKI1  #  SEL26 & MSKI2  #  S
EL37 & MSKI3;
!MSK3   := SEL04 & MSKI0  #  SEL15 & MSKI1  #  SEL26 & MSKI2  #  S
EL37 & MSKI3;
```

```
Wed Feb 28 15:36:14 1990  a:msk_mux1.abl  Page 2, Line 52

!MSK4   := SEL04 & MSKI4  #  SEL15 & MSKI5  #  SEL26 & MSKI6  #
EL37 & MSKI7;
!MSK5   := SEL04 & MSKI4  #  SEL15 & MSKI5  #  SEL26 & MSKI6  #
EL37 & MSKI7;
!MSK6   := SEL04 & MSKI4  #  SEL15 & MSKI5  #  SEL26 & MSKI6  #
EL37 & MSKI7;
!MSK7   := SEL04 & MSKI4  #  SEL15 & MSKI5  #  SEL26 & MSKI6  #
EL37 & MSKI7;

"****************************************************************
********

"test_vectors

"([CLK , LDB  ,H_SYNC ,CLRA ,OE  ]  ->  [ AA   ,   BB   ] )
" [C   ,^h0   ,    1    , 1    , 0  ]  ->  [^h0   ,  ^h0   ] ;

end MASK_MULTIPLEXER ;
```

```
Wed Feb 28 15:37:18 1990  a:msk_mux2.abl  Page 1, Line 1


module  MASK_MULTIPLEXER


title
'THIS MODULE MULTIPLEXES THE MASK PLANES'


 MSK_MUX2 device      'P20R8' ;

" Constants:

     H             =      1;
     L             =      0;
     X             =      .X.;              " ABEL 'don't care' symb
l
     C             =      .C.;              " ABEL 'clocking input' s
ymbol


"PIN NAMES:

CLK , OE   PIN
1   , 13  ;

MSKI0 ,MSKI1 ,MSKI2 ,MSKI3 ,MSKI4 ,MSKI5 ,MSKI6 ,MSKI7       PIN
  2   ,  3   ,  4   ,  5   ,  6   ,  7   ,  8   ,  9    ;

SEL2  ,SEL3  ,SEL0 ,SEL1  PIN
  10  ,  11  , 14  , 23  ;

MSK0 ,MSK1 ,MSK2 ,MSK3 ,MSK4 ,MSK5 ,MSK6 ,MSK7      PIN
 22  , 21  , 20  , 19  , 18  , 17  , 16  , 15   ;

"MACROS


SEL04    macro {( !SEL3 & !SEL2 & !SEL1 & !SEL0 )};
SEL15    macro {( !SEL3 & !SEL2 & !SEL1 &  SEL0 )};
SEL26    macro {( !SEL3 & !SEL2 &  SEL1 & !SEL0 )};
SEL37    macro {( !SEL3 & !SEL2 &  SEL1 &  SEL0 )};


"****************************************************************
*********
EQUATIONS


!MSK0   := SEL04 & MSKI0  #  SEL15 & MSKI1  #  SEL26 & MSKI2  #
EL37 & MSKI3;
!MSK1   := SEL04 & MSKI0  #  SEL15 & MSKI1  #  SEL26 & MSKI2  #
EL37 & MSKI3;
!MSK2   := SEL04 & MSKI0  #  SEL15 & MSKI1  #  SEL26 & MSKI2  #
EL37 & MSKI3;
!MSK3   := SEL04 & MSKI0  #  SEL15 & MSKI1  #  SEL26 & MSKI2  #
EL37 & MSKI3;
```

```
Wed Feb 28 15:37:18 1990  a:msk_mux2.abl  Page 2, Line 52

!MSK4    := SEL04 & MSKI4  #  SEL15 & MSKI5  #  SEL26 & MSKI6  # S
EL37 & MSKI7;
!MSK5    := SEL04 & MSKI4  #  SEL15 & MSKI5  #  SEL26 & MSKI6  # S
EL37 & MSKI7;
!MSK6    := SEL04 & MSKI4  #  SEL15 & MSKI5  #  SEL26 & MSKI6  # S
EL37 & MSKI7;
!MSK7    := SEL04 & MSKI4  #  SEL15 & MSKI5  #  SEL26 & MSKI6  #S
EL37 & MSKI7;

"*****************************************************************
********

"test_vectors

"([CLK , LDB  ,H_SYNC ,CLRA ,OE  ]  ->  [ AA   ,   BB   ] )

" [C   ,^h0   ,    1   , 1   , 0  ]  ->  [^h0   ,  ^h0   ] ;

end MASK_MULTIPLEXER ;
```

```
Tue Jan  1 00:21:28 1980   a:p_err.abl  Page 1, Line 1


module   TWO_PIXELS_ERROR_C_D


title
'THIS MODULE DISPLAYS THE MISMACH OF PIXELS C AND D'


   P_ERR  device     'P16R4' ;

" Constants:

     H            =      1;
     L            =      0;
     X            =     .X.;              " ABEL 'don't care' symbo
l
     C            =     .C.;              " ABEL 'clocking input' s
ymbol


"PIN NAMES:

CLK , OE ,MSKC , MSKD ,POLAR ,MSK_EN   PIN
1   , 11 , 12  ,  13  ,  18  ,  19    ;

PIXC0 ,PIXC1 ,PIXC2 ,PIXC3 ,PIXD0 ,PIXD1 ,PIXD2 ,PIXD3   PIN
  2   ,  3   ,  4   ,  5   ,  6   ,  7   ,  8   ,  9   ;

ERR_C , ERR_D    PIN
  14  ,   15    ;


PIXC   =   [ PIXC3 , PIXC2 , PIXC1 , PIXC0 ];
PIXD   =   [ PIXD3 , PIXD2 , PIXD1 , PIXD0 ];

"MACROS

FMASKC  macro {(( MSKC + POLAR ) # MSK_EN )};
FMASKD  macro {(( MSKD + POLAR ) # MSK_EN )};

ERR_CC  macro   {( PIXC0 # PIXC1 # PIXC2 # PIXC3 )} ;
ERR_DD  macro   {( PIXD0 # PIXD1 # PIXD2 # PIXD3 )} ;


"*****************************************************************
*********
EQUATIONS

ERR_C :=   FMASKC & ERR_CC ;
ERR_D :=   FMASKD & ERR_DD ;


"*****************************************************************
********


"test_vectors
```

Tue Jan 1 00:21:28 1980 a:p_err.abl Page 2, Line 56

```
"([CLK , LDB  ,H_SYNC ,CLRA ,OE  ]  ->  [ AA   ,   BB   ] )
" [C   ,^h0   ,   1   , 1   , 0  ]  ->  [^h0   ,  ^h0   ] ;
end TWO_PIXELS_ERROR_C_D;
```

Thu Feb 15 22:28:00 1990 a:pre_err.abl Page 1, Line 1

```
module  FOUR_PIXELS_ERROR_SUM

title
'THIS MODULE OUTPUTS 0,1,2,3 OR 4 AS THE NUMBER OF MISMACH PIXELS'

 PRE_ERR device      'P20R6' ;

" Constants:

     H              =      1;
     L              =      0;
     X              =      .X.;                  " ABEL 'don't care' symbo
l
     C              =      .C.;                  " ABEL 'clocking input' s
ymbol

"PIN NAMES:

CLK , OE ,MSKA , MSKB ,POLAR ,MSK_EN   PIN
1   , 13 , 14  ,  15  ,  22  ,  23     ;

PIXA0 ,PIXA1 ,PIXA2 ,PIXA3 ,PIXB0 ,PIXB1 ,PIXB2 ,PIXB3   PIN
  2   ,  3   ,  4   ,  5   ,  6   ,  7   ,  8   ,  9   ;

ERR_C ,ERR_D    PIN
  10  ,  11   ;

ERR0 ,ERR1 ,ERR2 ,ERR_A ,ERR_B    PIN
 16  , 17  , 18  , 19   ,  20     ;

PIXA  =   [ PIXA3 , PIXA2 , PIXA1 , PIXA0 ];
PIXB  =   [ PIXB3 , PIXB2 , PIXB1 , PIXB0 ];

"MACROS

FMASKA  macro {(( MSKA + POLAR ) # MSK_EN )};
FMASKB  macro {(( MSKB + POLAR ) # MSK_EN )};

ERR_AA  macro   {(PIXA0 # PIXA1 # PIXA2 # PIXA3)} ;
ERR_BB  macro   {(PIXB0 # PIXB1 # PIXB2 # PIXB3)} ;

"*****************************************************************
*********
EQUATIONS

ERR_A :=   FMASKA & ERR_AA ;
ERR_B :=   FMASKB & ERR_BB ;
```

```
Thu Feb 15 22:28:00 1990  a:pre_err.abl  Page 2, Line 56

ERR0  :=  ERR_A + ERR_B + ERR_C + ERR_D ;
ERR1  := (ERR_A & ERR_B  #  ERR_B & ERR_C  #  ERR_C & ERR_D  #  ER
R_D & ERR_A
        # ERR_A & ERR_C  #  ERR_B & ERR_D) & !(ERR_A & ERR_B & ERR
_C & ERR_D) ;
ERR2  :=  ERR_A & ERR_B & ERR_C & ERR_D  ;

"*****************************************************************
********

"test_vectors

"([CLK , LDB  ,H_SYNC ,CLRA ,OE. ]  ->  [ AA   ,   BB   ] )

" [C   ,^h0   ,   1   , 1   , 0  ]  ->  [^h0   ,  ^h0   ] ;

end FOUR_PIXELS_ERROR_SUM ;
```

```
= Feb 20 14:49:30 1990  a:raspalt.abl  Page 1, Line 1

dule RASPALT
tle 'RAS DECODER
eiser Zvi 18 February 1990 Mercury Interactive'

      U14   device  'P20L8';




      nCAS,nRAS,nTRQE          pin 1,2,3;
      nLAL,LAD15,LAD14         pin 4,9,10;
      LAD13,LAD12,LAD11        pin 11,13,14;
      LAD10                    pin 23;
      n0RAS,n1RAS,n2RAS        pin 22,21,20;
      n3RAS,n4RAS,n5RAS        pin 19,18,17;
      nUDRAS,nLDRAS            pin 16,15;
      FB0RAS,FBLDRAS           pin 5,8;
      LCLK1,LCLK2              pin 7,6;



    RAS     macro    {!nRAS};               "RAS    = Positive RAS
    CAS     macro    {!nCAS};              "nRAS   = Negative RAS
    TRQE    macro    {!nTRQE};              "!nRAS = Positive RAS
    RF      macro    {!LAD15};
    LAL     macro    {!nLAL};
    A26     macro    {LAD14};
    A25     macro    {LAD13};
    A24     macro    {LAD12};
    A23     macro    {LAD11};
    A22     macro    {LAD10};
    PON     macro    {(!LCLK2 & !LCLK1 & RAS & RF & CAS)
                      # (LCLK2 & !LCLK1 & TRQE & RAS & nLAL)};
                      "PON = Dynamic refresh & memory <-> serial r
ister
    DSR     macro    {LCLK2 & !LCLK1 & nLAL};

    ADRS     = [A26,A25,A24,A23,A22];
    RASON    = [nUDRAS,nLDRAS,n5RAS,n4RAS,n3RAS,n2RAS,n1RAS,n0RAS

    FB0      = [FB0RAS];
    FBD      = [FBLDRAS];

uations
      n0RAS       = !(DSR & RAS & !A26 & !A25 & !A24 & !A23 & !A22
                  # RAS & !FB0RAS # PON);

      n1RAS       = !(DSR & RAS & !A26 & !A25 & !A24 & !A23 & A22
                  # RAS & !n1RAS # PON);

      n2RAS       = !(DSR & RAS & !A26 & !A25 & !A24 & A23 & !A22
                  # RAS & !n2RAS # PON);

      n3RAS       = !(DSR & RAS & !A26 & !A25 & !A24 & A23 & A22
                  # RAS & !n3RAS # PON);
```

e Feb 20 14:49:30 1990  a:raspalt.abl  Page 2, Line 58

```
n4RAS     = !(DSR & RAS & !A26 & !A25 & A24 & !A23 & !A22
          # RAS & !n4RAS # PON);

n5RAS     = !(DSR & RAS & !A26 & !A25 & A24 & !A23 & A22
          # RAS & !n5RAS # PON);

nUDRAS    = !(DSR & RAS & A26 & A25 & A22
          # !LCLK2 & !LCLK1 & RAS & RF & CAS
          # RAS & !nUDRAS);

nLDRAS    = !(DSR & RAS & A26 & A25 & !A22
          # !LCLK2 & !LCLK1 & RAS & RF & CAS
          # RAS & !FBLDRAS);
```

ıd RASPALT

Wed Apr 18 13:00:52 1990 a:sc345v2.abl Page 1, Line 1

```
module   SC345_SERIAL_VIDEO_CLOCK

title
'THIS MODULE GENERATES ALL THE SC345 SIGNALS FOR THE FRAME BUFFER
ver # 2'

    SC345V2  device    'P20R6' ;

" Constants:

     H            =     1;
     L            =     0;
     X            =     .X.;              " ABEL 'don't care' symbo
l
     C            =     .C.;              " ABEL 'clocking input' s
ymbol

"PIN NAMES:
CLK , OE , A0 , A1 , A2 , EN_ERRSC , EN_DFRSC , EN_MSKSC   PIN
1   , 13 ,  2 ,  3 , 4  ,     5    ,     6    ,     7    ;

MSK0  , MSK1  , DFRA0 , DFRA1 , DFRB0  , DFRB1      PIN
  8   ,   9   ,  10   ,   11  ,   14   ,   23    ;

 SC_MSK   , SC_DFR4 , SC_DFR5 , LEI_A        PIN
    17    ,   18    ,   19    ,   20    ;

SUM_BYPS , ALU_CKn , M3S0 ,  SUM_CE   PIN
   15    ,    16   ,  22  ,   21    ;

AA     =   [ A2 , A1 , A0 ];

"MACROS

ZERO    macro {( !A2 & !A1 & !A0 )};
ONE     macro {( !A2 & !A1 &  A0 )};
TWO     macro {( !A2 &  A1 & !A0 )};
THREE   macro {( !A2 &  A1 &  A0 )};
FOUR    macro {(  A2 & !A1 & !A0 )};
FIVE    macro {(  A2 & !A1 &  A0 )};
SIX     macro {(  A2 &  A1 & !A0 )};
SEVEN   macro {(  A2 &  A1 &  A0 )};


DFR4_DFR   macro   {( !DFRA1 & !DFRA0 )};
DFR4_ERR   macro   {( !DFRA1 &  DFRA0 )};

DFR4_OUT   macro   {(  DFRA1 &  DFRA0 )};
DFR5_OUT   macro   {(  DFRB1 &  DFRB0 )};
MSK_OUT    macro   {(  MSK1  &  MSK0  )};

"*****************************************************************
*********
EQUATIONS
```

```
·d Apr 18 13:00:52 1990  a:sc345v2.abl  Page 2, Line 56


:_MSK    :=  EN_MSKSC & ( ZERO # ONE # FOUR # FIVE );

:_DFR4   :=  DFR4_DFR & EN_DFRSC & !(A0 + A1)
           # DFR4_ERR & EN_ERRSC & !(A0 + A1)
           # DFR4_OUT & EN_DFRSC & !A1 ;

:_DFR5   :=  !DFR5_OUT & EN_DFRSC & !(A0 + A1)
            # DFR5_OUT & EN_DFRSC & (ZERO # ONE # FOUR # FIVE );

:I_A     := TWO # SIX ;

ALU_CKn :=   SUM_BYPS & EN_MSKSC -      & (THREE  #  SEVEN)
           # !SUM_BYPS & EN_MSKSC & M3S0 & (THREE  #  SEVEN) ;

***************************************************************
*******

test_vectors

([CLK , LDB  ,H_SYNC ,CLRA ,OE  ]  ->  [ AA   ,   BB   ] )
 [C   ,^h0   ,   1   , 1   , 0  ]  ->  [^h0   ,  ^h0   ] ;

nd  SC345_SERIAL_VIDEO_CLOCK;
```

```
Mon May 21 18:24:48 1990   a:scv2.abl   Page 1, Line 1


module   SC_SERIAL_VIDEO_CLOCK_GENERATOR


title
'THIS MODULE GENERATES ALL THE SC SIGNALS FOR THE FRAME BUFFER'

      SCV2    device     'P20R8' ;

" Constants:

     H            =      1;
     L            =      0;
     X            =     .X.;               " ABEL 'don't care' symbo
l
     C            =     .C.;               " ABEL 'clocking input' s
ymbol


"PIN NAMES:
CLK , OE , A0 , A1 , A2 , EN_OUTSC , EN_INTSC , EN_EXTSC    PIN
1    , 13 ,  2 ,  3 , 4  ,      5    ,     6    ,     7     ;

CRNT0 , CRNT1 , PRVS0 , PRVS1 , XPCTD0 , XPCTD1      PIN
  8    ,   9    ,  10    ,   11   ,   14    ,   23    ;

LE_B , SC_XPCTD , SC_PRVS   , SC_CRNT , SC_MSK , SC_DFR      PIN
 15   ,    16     ,    17     ,   18     ,   19    ,   20    ;


AA      =    [ A2 , A1 , A0 ];

"MACROS

ZERO    macro {( !A2 & !A1 & !A0 )};
ONE     macro {( !A2 & !A1 &  A0 )};
TWO     macro {( !A2 &  A1 & !A0 )};
THREE   macro {( !A2 &  A1 &  A0 )};
FOUR    macro {(  A2 & !A1 & !A0 )};
FIVE    macro {(  A2 & !A1 &  A0 )};
SIX     macro {(  A2 &  A1 & !A0 )};
SEVEN   macro {(  A2 &  A1 &  A0 )};

CRNT_INT   macro   {( !CRNT1 & !CRNT0 )};
CRNT_EXT   macro   {( !CRNT1 &  CRNT0 )};
CRNT_OUT   macro   {(  CRNT1 & !CRNT0 )};

PRVS_INT   macro   {( !PRVS1 & !PRVS0 )};
PRVS_EXT   macro   {( !PRVS1 &  PRVS0 )};
PRVS_OUT   macro   {(  PRVS1 & !PRVS0 )};

XPCT_INT   macro   {( !XPCTD1 & !XPCTD0 )};
XPCT_EXT   macro   {( !XPCTD1 &  XPCTD0 )};
XPCT_OUT   macro   {(  XPCTD1 & !XPCTD0 )};


"*****************************************************************
*********
```

```
Mon May 21 18:24:48 1990   a:scv2.abl   Page 2, Line 57

EQUATIONS

" SC_CRNT     :=    CRNT_OUT & EN_OUTSC & ( ZERO   # ONE   #   FOUR # F
IVE )
"                #  CRNT_INT & EN_INTSC & ( TWO   # THREE #   SIX   # S
EVEN)
"                #  CRNT_EXT & EN_EXTSC & ( ZERO # ONE    #   FOUR # F
IVE);

SC_CRNT     :=    CRNT_OUT & EN_OUTSC & !A1
              #   CRNT_INT & EN_INTSC &  A1
              #   CRNT_EXT & EN_EXTSC & (A1 + A0) ;

SC_PRVS     :=    PRVS_OUT & EN_OUTSC & !A1
              #   PRVS_INT & EN_INTSC &  A1
              #   PRVS_EXT & EN_EXTSC & (A1 + A0) ;

SC_XPCTD    :=    XPCT_OUT & EN_OUTSC & !A1
              #   XPCT_INT & EN_INTSC &  A1
              #   XPCT_EXT & EN_EXTSC & (A1 + A0) ;

" OLD LE_B        :=    XPCT_OUT & (!A1   #   !A0 )
"                     # !XPCT_OUT & ( !A1 & A0   #   A1 & !A0 ) ;


LE_B        :=    THREE # SEVEN    #    !XPCT_OUT ;


"*****************************************************************
********

"test_vectors

"([CLK , LDB  ,H_SYNC ,CLRA ,OE  ]  ->  [ AA    ,    BB    ] )
" [C    ,^h0    ,    1    , 1    , 0  ]  ->  [^h0    ,   ^h0    ] ;
end  SC_SERIAL_VIDEO_CLOCK_GENERATOR;
```

```
Tue May 22 14:08:54 1990  a:sepal.abl  Page 1, Line 1

module SEPAL
title 'VRAM SERIAL ENABLE
  Speiser Zvi 7 March 1990'

        DCR   device  'P20L8';      "(U34)

        MB5C1,MB5C0,MB4C1,MB4C0      pin 11,13,9,10;
        MB2C1,MB2C0,MB1C1,MB1C0      pin 7,8,5,6;
        MB0C1,MB0C0                  pin 3,4;
        nTTRQE,nTLAL                 pin 14,23;

        n0DEC,n1DEC,n2DEC,n45DEC     pin 22,15,20,19;
        n0SE,n1SE,n2SE               pin 18,17,16;
        nOED,nOEC,nOEB               pin 1,2,21;

        LAL  macro  {!nTLAL};
        TRQE  macro  {!nTTRQE};


equations

 "       n0SE = !MB0C1 & !MB0C0 & TRQE & !LAL & nOED
 "               # !MB0C1 & MB0C0 & TRQE & !LAL & nOED
 "               # MB0C1 & MB0C0
 "              # n0SE & TRQE;
 "
 "      n1SE = !MB1C1 & !MB1C0 & TRQE & !LAL & nOEC
 "              # !MB1C1 & MB1C0 & TRQE & !LAL & nOEC
 "              # MB1C1 & MB1C0
 "              # n1SE & TRQE;
 "
 "      n2SE = !MB2C1 & !MB2C0 & TRQE & !LAL & nOEB
 "              # !MB2C1 & MB2C0 & TRQE & !LAL & nOEB
 "              # MB2C1 & MB2C0
 "              # n2SE & TRQE;

"    Reduced Equations:

       n0SE = !(!MB0C0 & MB0C1 & !n0SE
              # !MB0C0 & nTTRQE
              # !MB0C1 & !n0SE & !nOED
              # !MB0C1 & !n0SE & !nTLAL
              # !MB0C1 & nTTRQE);

       n1SE = !(!MB1C0 & MB1C1 & !n1SE
              # !MB1C0 & nTTRQE
              # !MB1C1 & !n1SE & !nOEC
              # !MB1C1 & !n1SE & !nTLAL
              # !MB1C1 & nTTRQE);

       n2SE = !(!MB2C0 & MB2C1 & !n2SE
              # !MB2C0 & nTTRQE
```

```
Tue May 22 14:08:54 1990  a:sepal.abl  Page 2, Line 60

                # !MB2C1 & !n2SE & !nOEB
                # !MB2C1 & !n2SE & !nTLAL
                # !MB2C1 & nTTRQE);

        n0DEC = (!MB0C1 & !MB0C0 & TRQE & !LAL # !MB0C1 & MB0C0 & T
RQE & !LAL);

        n1DEC = (!MB1C1 & !MB1C0 & TRQE & !LAL # !MB1C1 & MB1C0 & T
RQE & !LAL);

        n2DEC = (!MB2C1 & !MB2C0 & TRQE & !LAL # !MB2C1 & MB2C0 & T
RQE & !LAL);

       n45DEC = (!MB4C1 & !MB4C0 & TRQE & !LAL # !MB4C1 & MB4C0 & T
RQE & !LAL
                 # !MB5C1 & !MB5C0 & TRQE & !LAL # !MB5C1 & MB5C0 &
TRQE & !LAL);



end SEPAL
```

```
Tue May 22 14:07:18 1990  a:wpal.abl  Page 1, Line 1

module WPAL
title 'VRAM WRITE SIGNAL
  Speiser Zvi 25 February 1990'

         WRT  device  'P20L8';   "(U33)


        MB5C1,MB5C0,MB4C1,MB4C0      pin 9,10,23,16;
        MB2C1,MB2C0,MB1C1,MB1C0      pin 5,6,3,4;
        MB0C1,MB0C0                  pin 1,2;
        nTTRQE,nTLAL,nTW             pin 11,13,14;

        n0W,n1W,n2W,n3W              pin 22,21,20,19;
        n4W,n5W                      pin 18,17;


        LAL   macro  {!nTLAL};
        TRQE  macro  {!nTTRQE};
        W     macro  {!nTW};


equations
        n0W = !(!MB0C1 & !MB0C0 & TRQE & !LAL
              # !MB0C1 & MB0C0 & TRQE & !LAL # W);

        n1W = !(!MB1C1 & !MB1C0 & TRQE & !LAL
              # !MB1C1 & MB1C0 & TRQE & !LAL # W);

        n2W = !(!MB2C1 & !MB2C0 & TRQE & !LAL
              # !MB2C1 & MB2C0 & TRQE & !LAL # W);

        n3W = !W;

        n4W = !(!MB4C1 & !MB4C0 & TRQE & !LAL
              # !MB4C1 & MB4C0 & TRQE & !LAL # W);

        n5W = !(!MB5C1 & !MB5C0 & TRQE & !LAL
              # !MB5C1 & MB5C0 & TRQE & !LAL # W);


end WPAL
```

Annex B

FIRMWARE OF I/O PROCESSOR
( CONTENTS OF PALS )

```
Mon Mar 12 13:31:26 1990   a:pal_1.abl   Page 1, Line 1

module   CHIP_SELECT_PAL

title
'THIS MODULE DECODES THE SELECT SIGNALS OF THE INTERFACE '

      U9  device     'P16L8' ;

"PIN NAMES:

A15 , A13 , A11 , A5 , A4 , A0 , RAM_CS , DUART1_CS , DUART2_CS ,C
OUNTER_CS PIN
1   , 2   , 3   , 4  , 5  , 6  , 19     , 18        , 17        ,
16          ;

A6 , A3           PIN
7  , 8            ;

DUAL_LO_LSB , DUAL_LO_MSB , DUAL_HI_LSB , DUAL_HI_MSB   PIN
15          , 14          , 13          , 12            ;

"*****************************************************************
*********
EQUATIONS

RAM_CS          = !A15 ;
DUART1_CS       = A15 # !A13 # A6 # A5 # A4 ;
DUART2_CS       = A15 # !A13 # A6 # A5 # !A4 ;
COUNTER_CS      = A15 # !A13 # A6 # !A5 # A4 # A3 ;
DUAL_LO_LSB     = A15 # A13 # A11 # A0 ;
DUAL_LO_MSB     = A15 # A13 # A11 # !A0 ;
DUAL_HI_LSB     = A15 # A13 # !A11 # A0 ;
DUAL_HI_MSB     = A15 # A13 # !A11 # !A0 ;

"*****************************************************************
********

end CHIP_SELECT_PAL ;
```

```
Thu May  3 17:26:04 1990  a:pal_2.abl  Page 1, Line 1

module   PAL_2

title
'THIS MODULE DECODES SELECT SIGNALS OF THE HOST, INT 1 AND RAM S
E '

      U10  device     'P16L8' ;

"PIN NAMES:

INT_DUART_1 , INT_DUART_2 , INT_OUTPUT_DEVICE , RD , PSEN
 PIN
1           , 2           , 3                 , 4  ,  5
    ;

HOST_A0 , HOST_A11 , HOST_A12 , WR , HI_DECODE , MEM_CS_16    PIN
6       , 7        , 8        , 9  , 11        , 13           ;

OE_RAM , STAN_DEV_INT , HOST_LO , HOST_HI , HARD_RESET
PIN
19     , 18           , 17      , 15      , 14
  ;

"*************************************************************:
*********
EQUATIONS

OE_RAM              = PSEN & RD ;
STAN_DEV_INT        = INT_DUART_1 & INT_DUART_2 & INT_OUTPUT_DEVIC
E ;
HOST_LO             = ! ( !HOST_A11 & HOST_A12 & HI_DECODE ) ;
HOST_HI             = ! (  HOST_A11 & HOST_A12 & HI_DECODE ) ;
ENABLE MEM_CS_16    = HOST_A12 & HI_DECODE ;
MEM_CS_16           = 0 ;
ENABLE HARD_RESET   = !HOST_A12 & HI_DECODE ;
HARD_RESET          = 1 ;

"*************************************************************:
********

end PAL_2 ;
```

```
Thu Apr  5 18:03:52 1990  a:pal_3.abl  Page 1, Line 1

module   PAL_3

title
'THIS MODULE LATCHES HI ADDR BITS, AND DECODES HI ADDRESSES '

      U14  device     'P20R6' ;

"PIN NAMES:

BALE , HOST_A14 , HOST_A15 , HOST_A16 , HOST_A17 , HOST_A18 , HOST
_A19  PIN
1    , 2        , 3        , 4        , 5        , 6        , 7
        ;

HOST_A20 , HOST_A21 , HOST_A22 , HOST_A23 , HOST_A13 , HI_DECODE
     PIN
8        , 9        , 10       , 11       , 23       , 22
     ;

HOST_A20_L , HOST_A21_L , HOST_A22_L , HOST_A23_L , HI_5     PIN
17         , 18         , 19         , 20         , 15       ;

"*****************************************************************
*********
EQUATIONS

HOST_A20_L := HOST_A20 ;
HOST_A21_L := HOST_A21 ;
HOST_A22_L := HOST_A22 ;
HOST_A23_L := HOST_A23 ;
HI_DECODE   = HOST_A14 & HOST_A15 & HOST_A16 & !HOST_A17 & HOST_A1
8 &
              HOST_A13 & HI_5 ;
HI_5 = HOST_A19 & !HOST_A20_L & !HOST_A21_L & HOST_A22_L & HOST_A2
3_L ;

"*****************************************************************
********

end PAL_3 ;
```

```
Mon Mar 12 14:44:44 1990  a:pal_4.abl  Page 1, Line 1

module   PAL_CNTR

title
'THIS MODULE DIVIDES BY 4 THE SYSTEM CLK FOR THE UARTS '

      U18  device     'P16R4' ;

"PIN NAMES:

CLK , Q0  , I1  , I2 , I3 , I4 , I5 , O1 , O2 , O3 , O4      PIN
1   , 17  , 2   , 3  , 4  , 5  , 6  , 12 , 13 , 18 , 19      ;

"***************************************************************
*********
EQUATIONS

Q0 := !Q0    ;
O1 =  0  ;
O2 =  0  ;
O3 =  0  ;
O4 =  !I4 # I5  ;
ENABLE O1 = !I1 ;
ENABLE O2 = !I2 ;
ENABLE O3 = !I3 ;


"***************************************************************
********

end PAL_CNTR ;
```

```
Wed Apr 25 11:22:58 1990  a:pal_5.abl  Page 1, Line 1

module   PAL_5

title
'THIS MODULE DIVIDES BY 4 THE SYSTEM CLK FOR THE UARTS '

      U19  device     'P16L8' ;

"PIN NAMES:

OUT_0, OP4, BUSY_TO_HOST, U22A_Q, HOST_INT, OP5, P1_5   PIN
2    , 3  , 4           , 5     , 7       , 8  , 9      ;

KBD_CLK, U22B_CLK, IO_CH_RDY, KBD_DATA, IRQ_15, BIT_11_LOW  PIN
12     , 13      , 14       , 16      , 17    , 19          ;

SUT_DATA , SUT_CLK , CLK_TRIG  , P1_4 , NOT_OUT_0          PIN
1        , 6       , 18        , 11   , 15                 ;

"*****************************************************************
*********

EQUATIONS

KBD_CLK             =   0 ;
ENABLE KBD_CLK      =   !OP4 ;
U22B_CLK            =   U22A_Q & OUT_0 ;
IO_CH_RDY           =   0 ;
ENABLE IO_CH_RDY    =   !BUSY_TO_HOST ;
KBD_DATA            =   0 ;
ENABLE KBD_DATA     =   !OP5 ;
IRQ_15              =   !HOST_INT ;
BIT_11_LOW          =   0 ;
ENABLE BIT_11_LOW =     !(OUT_0 # P1_5) ;

NOT_OUT_0           =   !OUT_0 ;

CLK_TRIG            =   SUT_DATA # !SUT_CLK ;

"*****************************************************************
********

end PAL_5 ;
```

```
Mon Mar 12 14:55:38 1990  a:pal_6.abl  Page 1, Line 1

module   CHIP_SELECT_PAL

title
'THIS MODULE DECODES THE SELECT SIGNALS OF THE INTERFACE '

      U25 device     'P16L8' ;

"PIN NAMES:

A15 , A13 , A6 , A5 , A4 , A3 , STAN_DEV_INT , INT_DUART_3
PIN
1   , 2   , 3  , 4  , 5  , 6  , 7            , 8
 ;

DUART3_CS , DEVICE_INT
PIN
19        , 12
 ;

"*****************************************************************
*********
EQUATIONS

DUART3_CS       = A15 # !A13 # A6 # !A5 # !A4 ;
DEVICE_INT      = INT_DUART_3 & STAN_DEV_INT ;

"*****************************************************************
********

end CHIP_SELECT_PAL ;
```

U 010262-4

Annex C

CONTENTS OF I/O PROCESSOR'S EPROM:

FIG 10 COMPONENT #5

EF117456344

```
Mon Jul  9 14:42:04 1990  ker_k.dmp  Page 1, Line 0

0000000000   313a   3030   4233   3032   4530   3734   3038
   3730
0000000020   3039   3134   3032   3133   3737   3842   3830
   4142
0000000040   4438   3932   3733   4644   3245   0d38   3a0a
   3031
0000000060   3330   3243   3030   4337   4630   4237   3530
   4338
0000000100   3338   4438   3238   4245   3046   3039   3030
   3030
0000000120   3231   3330   4646   3338   0a0d   313a   3030
   4433
0000000140   3032   3930   4330   3030   4530   3730   3030
   3832
0000000160   4630   3738   3242   3730   3841   3930   4330
   3030
0000000200   4531   3341   0d31   3a0a   3031   3330   3245
   3030
0000000220   3046   4245   3341   3046   4237   3038   4238
   3841
0000000240   3039   3043   3130   3045   4146   3341   3045
   4246
0000000260   3643   0a0d   313a   3030   4633   3032   4330
   3030
0000000300   4333   3030   3932   3030   3030   3130   3032
   3833
0000000320   3031   3032   3633   4536   3734   3038   3830
   0d39
0000000340   3a0a   3031   3430   3230   3030   3937   3430
   3231
0000000360   3330   3731   4237   3030   3039   3043   3330
   4245
0000000400   3046   4237   3030   3039   3043   4443   0a0d
   313a
0000000420   3030   3134   3032   3030   4530   4642   4430
   3832
0000000440   4341   3832   3738   3842   3842   4142   3038
   3032
0000000460   3633   4536   3734   3538   0d39   3a0a   3031
   3430
0000000500   3232   3030   3030   3937   4530   3231   3330
   3731
0000000520   4237   3030   4137   3030   3437   4130   4632
   3546
0000000540   3238   3445   4131   0a0d   313a   3030   3334
   3032
0000000560   3330   4645   3835   4533   4641   4530   4142
   4633
0000000600   3730   4642   3739   3041   3846   3841   3833
   3842
0000000620   3932   0d35   3a0a   3031   3430   3234   3030
   3045
0000000640   4246   4137   3030   4238   3530   4138   3430
   4237
0000000660   3830   3231   3230   3435   4238   3530   4138
   3233
0000000700   0a0d   313a   3030   3534   3032   3030   3734
   4642
0000000720   3738   3041   3846   3841   3833   3842   4532
```

Mon Jul 9 14:42:04 1990 ker_k.dmp Page 2, Line 30

```
     4630
0000000740    3742    3041    4530    3442    4644    4642    0d38
     3a0a
0000000760    3031    3430    3236    3030    4145    4334    4146
     3437
0000001000    3630    4632    3546    3238    3445    4533    3546
     3338
0000001020    4145    3046    4245    3341    3833    0a0d    313a
     3030
0000001040    3734    3032    4630    3730    4642    3742    3041
     3846
0000001060    3841    3833    3842    4532    4630    3742    3041
     3830
0000001100    3042    3835    3041    0d32    3a0a    3031    3430
     3238
0000001120    3030    3430    4237    3830    3231    3230    3435
     4238
0000001140    3530    4138    3430    4237    4146    4137    4630
     4138
0000001160    3338    3235    0a0d    313a    3030    3934    3032
     3830
0000001200    3842    4532    4630    3742    3041    4530    3442
     4644
0000001220    4542    3441    4643    3741    3034    3238    4646
     4635
0000001240    0d35    3a0a    3031    3430    3241    3030    3238
     3445
0000001260    4533    3546    3338    4145    3046    4245    3341
     3046
0000001300    4237    3030    4137    3030    3437    4330    3136
     0a0d
0000001320    313a    3030    4234    3032    3230    4646    3835
     4532
0000001340    3334    4645    3835    4533    4641    4530    4142
     4633
0000001360    3730    3034    3243    4646    4635    0d45    3a0a
     3031
0000001400    3430    3243    3030    3238    3445    4533    3546
     3338
0000001420    3045    4346    3341    3045    4446    3437    3630
     4632
0000001440    3546    3238    3445    4541    0a0d    313a    3030
     4434
0000001460    3032    3330    4645    3835    4533    4630    4141
     4533
0000001500    4630    3142    3032    4630    3745    3030    3033
     3032
0000001520    3835    4643    0d36    3a0a    3031    3430    3245
     3030
0000001540    3437    4330    4632    3546    3238    3445    4533
     3546
0000001560    3338    3045    4146    3341    3045    4246    4138
     3338
0000001600    3545    0a0d    313a    3030    4634    3032    3830
     3842
0000001620    4532    4630    3742    3041    3730    3034    3234
     4646
0000001640    3835    4532    3334    4645    3835    4533    4641
     0d36
```

```
Mon Jul  9 14:42:04 1990  ker_k.dmp  Page 3, Line 59

0000001660    3a0a   3031   3530   3230   3030   3046   4245
  3341
0000001700    3046   3437   3830   4632   3546   3238   3445
  4533
0000001720    3546   3338   3045   4346   3341   3034   0a0d
  313a
0000001740    3030   3135   3032   4530   4630   3744   3034
  3243
0000001760    4646   3835   4532   3334   4645   3835   4533
  4630
0000002000    4141   4533   4630   4542   0d34   3a0a   3031
  3530
0000002020    3232   3030   4245   4432   4246   4145   4333
  4146
0000002040    4238   3530   4138   3430   3437   3430   4632
  3546
0000002060    3238   3445   3637   0a0d   313a   3030   3335
  3032
0000002100    3330   4645   3835   4533   4630   4141   4533
  4630
0000002120    3842   3843   3833   3844   4532   4642   3730
  3034
0000002140    3341   0d34   3a0a   3031   3530   3234   3030
  4632
0000002160    3546   3238   3445   4533   3546   3338   3045
  4346
0000002200    3341   3045   4446   3437   3430   4632   3546
  3137
0000002220    0a0d   313a   3030   3535   3032   3830   4532
  3334
0000002240    4645   3835   4533   4630   4141   4533   4630
  4542
0000002260    3242   4644   4542   3341   4643   4641   0d32
  3a0a
0000002300    3031   3530   3236   3030   4238   3530   4138
  3430
0000002320    4237   4646   4137   3030   4245   4435   4246
  4145
0000002340    4335   4146   3437   4130   3637   0a0d   313a
  3030
0000002360    3735   3032   3230   4646   3835   4532   3334
  4645
0000002400    3835   4533   4641   4530   4142   4633   3730
  3034
0000002420    3243   4646   3342   0d37   3a0a   3031   3530
  3238
0000002440    3030   3445   4533   4146   3231   3130   3244
  3230
0000002460    3230   3430   4542   3437   4330   4632   3546
  3238
0000002500    3445   3839   0a0d   313a   3030   3935   3032
  3330
0000002520    4645   3835   4533   4630   4141   4533   4630
  3842
0000002540    3841   3833   3842   4532   4630   3742   3041
  4430
0000002560    0d43   3a0a   3031   3530   3241   3030   4238
  3530
0000002600    4138   3430   3437   4130   4632   3546   3238
```

```
Mon Jul  9 14:42:04 1990  ker_k.dmp  Page 4, Line 89

   3445
0000002620   4533   3546   3338   3045   4146   3341   3046
   0a0d
0000002640   313a   3030   4235   3032   4530   4630   4542
   3644
0000002660   3742   3030   4532   3643   3641   3030   3732
   4634
0000002700   3046   3634   3130   3735   3744   0d33   3a0a
   3031
0000002720   3530   3243   3030   4546   4337   4630   4237
   3630
0000002740   4338   3338   4438   3238   4245   3046   4237
   3630
0000002760   3039   3043   3430   3135   0a0d   313a   3030
   4435
0000003000   3032   4530   4642   3830   3130   3733   4644
   3745
0000003020   3043   3746   3042   3838   3843   3833   3844
   4532
0000003040   4642   3230   0d39   3a0a   3031   3530   3245
   3030
0000003060   4237   3830   3039   3043   3430   4245   3046
   3230
0000003100   3330   3636   3445   3837   3030   3937   3430
   3231
0000003120   3130   0a0d   313a   3030   4635   3032   3030
   3133
0000003140   3737   4642   3743   3041   3846   3841   3833
   3842
0000003160   4532   4630   4342   3030   3733   3244   3835
   0d35
0000003200   3a0a   3031   3630   3230   3030   3231   3130
   3630
0000003220   3044   3330   3037   3931   4237   3030   3039
   3043
0000003240   3330   4245   3046   4437   4546   4634   0a0d
   313a
0000003260   3030   3136   3032   3730   3043   3946   4330
   3030
0000003300   4534   4630   3842   3843   3833   3844   4532
   4642
0000003320   3030   3032   3936   3837   0d36   3a0a   3031
   3630
0000003340   3232   3030   3043   3330   4437   3331   3231
   3130
0000003360   3630   3044   3330   3037   4630   4237   3030
   3039
0000003400   3043   3330   4333   0a0d   313a   3030   3336
   3032
0000003420   4530   4642   3930   3030   3030   3130   3032
   3234
0000003440   3830   3530   4342   3030   3733   3144   3134
   3032
0000003460   4431   0d35   3a0a   3031   3630   3234   3030
   3630
0000003500   3044   3330   3037   3031   4237   3030   3039
   3043
0000003520   3330   4245   3046   4237   4646   3039   3043
   4344
```

Mon Jul 9 14:42:04 1990 ker_k.dmp Page 5, Line 118

| | | | | | | | | |
|---|---|---|---|---|---|---|---|---|
| 0000003540 | 0a0d | 313a | 3030 | 3536 | 3032 | 3030 | 4530 | 4642 |
| 0000003560 | 3830 | 3430 | 3730 | 3144 | 3135 | 3032 | 3031 | 3736 |
| 0000003600 | 3030 | 3739 | 3042 | 3930 | 4330 | 3030 | 0d45 | 3a0a |
| 0000003620 | 3031 | 3630 | 3236 | 3030 | 3330 | 4245 | 3046 | 3038 |
| 0000003640 | 3033 | 3039 | 3043 | 3330 | 3045 | 3036 | 3531 | 4437 |
| 0000003660 | 4546 | 4337 | 4630 | 4237 | 3144 | 0a0d | 313a | 3030 |
| 0000003700 | 3736 | 3032 | 3030 | 3839 | 3843 | 3833 | 3844 | 4532 |
| 0000003720 | 4642 | 3730 | 3042 | 3939 | 4330 | 3030 | 4534 | 4642 |
| 0000003740 | 3830 | 3130 | 3333 | 0d30 | 3a0a | 3031 | 3630 | 3238 |
| 0000003760 | 3030 | 4237 | 4646 | 3039 | 3043 | 3330 | 4245 | 3046 |
| 0000004000 | 4437 | 4546 | 4337 | 4630 | 4237 | 3330 | 4338 | 3338 |
| 0000004020 | 4438 | 3041 | 0a0d | 303a | 3038 | 3936 | 3032 | 3830 |
| 0000004040 | 4532 | 4642 | 3830 | 3030 | 3030 | 3032 | 3633 | 3136 |
| 0000004060 | 0d38 | 3a0a | 3330 | 3630 | 3946 | 3030 | 3030 | 3038 |
| 0000004100 | 3032 | 4535 | 0a0d | 303a | 3043 | 4630 | 3041 | 3730 |
| 0000004120 | 3041 | 3730 | 3043 | 3130 | 3032 | 3632 | 4546 | 4634 |
| 0000004140 | 3341 | 4633 | 3242 | 3532 | 0d33 | 3a0a | 4630 | 3130 |
| 0000004160 | 3630 | 3030 | 4137 | 3030 | 4337 | 3030 | 3231 | 3230 |
| 0000004200 | 4636 | 3036 | 3430 | 3445 | 4146 | 3430 | 4246 | 4245 |
| 0000004220 | 3232 | 3332 | 0a0d | 313a | 3030 | 3131 | 3035 | 4430 |
| 0000004240 | 3830 | 4433 | 3830 | 3132 | 3032 | 4131 | 3834 | 3030 |
| 0000004260 | 4445 | 3830 | 4433 | 3830 | 3132 | 3032 | 4131 | 3934 |
| 0000004300 | 0d34 | 3a0a | 3031 | 3130 | 3532 | 3030 | 3343 | 3445 |
| 0000004320 | 3939 | 3946 | 3445 | 3839 | 3846 | 3043 | 3238 | 3043 |
| 0000004340 | 3338 | 4138 | 3338 | 4238 | 3238 | 3043 | 4542 | 0a0d |
| 0000004360 | 313a | 3030 | 3331 | 3035 | 3830 | 4332 | 3830 | 3833 |
| 0000004400 | 3230 | 3738 | 3038 | 3730 | 3039 | 3831 | 3030 | 3734 |
| 0000004420 | 4638 | 3746 | 4639 | 4446 | 3130 | 0d38 | 3a0a | 3031 |
| 0000004440 | 3130 | 3534 | 3030 | 3338 | 3044 | 3238 | 3445 | 3339 |
| 0000004460 | 3341 | 3043 | 3238 | 3043 | 3338 | 4138 | 3338 | |

```
Mon Jul  9 14:42:04 1990  ker_k.dmp  Page 6, Line 148

   4238
0000004500    3238    3442    3130    3736    0a0d    313a    303
   3531
0000004520    3035    3030    4535    3230    4639    4642    323
   4332
0000004540    3830    4332    3830    4233    3034    3132    453
   4630
0000004560    4141    4233    0d34    3a0a    3031    3130    353
   3030
0000004600    3045    3932    4246    4145    3833    4146    304
   3338
0000004620    3044    3238    3046    3341    4245    3046    413
   3232
0000004640    4245    0a0d    313a    3030    3731    3035    373
   4635
0000004660    3030    4334    3030    3730    3038    4532    463
   3036
0000004700    4138    4433    4635    4630    3239    4639    374
   0d32
0000004720    3a0a    3031    3130    3538    3030    3044    303
   4345
0000004740    3833    4346    4245    3833    4246    4145    383
   4146
0000004760    3044    3338    3044    3238    3537    3632    0a0
   313a
0000005000    3030    3931    3035    4630    3030    3734    303
   4532
0000005020    4636    4130    3033    4438    4635    4630    343
   3443
0000005040    3442    3241    4532    4334    0d36    3a0a    303
   3130
0000005060    3541    3030    3339    3846    3341    3445    333
   3946
0000005100    3341    3232    3044    3338    3044    3238    323
   3130
0000005120    3441    3038    4230    0a0d    313a    3030    423
   3035
0000005140    3030    4445    3830    4433    3830    3132    303
   4131
0000005160    4334    4533    3934    4639    4539    3934    463
   4338
0000005200    3630    0d33    3a0a    3031    3130    3543    303
   3238
0000005220    3043    3338    4138    3338    4238    3238    304
   3238
0000005240    3043    3338    3038    4132    3837    3030    393
   4232
0000005260    0a0d    313a    3030    4431    3035    3030    383
   3030
0000005300    3734    4638    3746    4639    4446    3830    443
   3830
0000005320    4532    3934    4133    4333    3830    4132    0d3
   3a0a
0000005340    3031    3130    3545    3030    3043    3338    413
   3338
0000005360    4238    3238    3442    3130    3730    3045    393
   3046
0000005400    3343    3939    4246    3232    4637    0a0d    313
   3030
```

Mon Jul 9 14:42:04 1990 ker_k.dmp Page 7, Line 177

```
0000005420   4631   3035   4330   3830   4332   3830   423
  3034
0000005440   3132   4539   4630   4141   4533   3230   463
  4542
0000005460   3341   4638   3041   0d39   3a0a   3031   323
  3530
0000005500   3030   3044   3338   3044   3238   3046   334
  4245
0000005520   3046   3343   3939   4246   4145   3839   414
  4234
0000005540   3232   3639   0a0d   313a   3030   3132   303
  3730
0000005560   4635   3030   4334   3030   3730   3038   453
  4630
0000005600   3036   4138   4433   4635   4630   3239   463
  4444
0000005620   0d31   3a0a   3031   3230   3532   3030   304
  3030
0000005640   4345   3833   4346   4245   3833   4246   414
  3833
0000005660   4146   3044   3338   3044   3238   3537   353
  0a0d
0000005700   313a   3030   3332   3035   4630   3030   433
  3030
0000005720   3730   3038   4532   4636   4130   3033   443
  4635
0000005740   4630   4439   3030   4330   4233   0d39   3a0
  4630
0000005760   3230   3534   3030   3939   4446   4345   383
  4346
0000006000   4245   3839   4246   4145   3839   4146   423
  4334
0000006020   4434   3232   3439   0a0d   313a   3030   353
  3034
0000006040   4530   3642   3130   3231   4634   3530   303
  4534
0000006060   4634   4641   3242   4532   4344   3333   463
  4544
0000006100   3043   0d46   3a0a   4230   3230   3436   303
  3333
0000006120   4346   4244   3746   4338   3230   4438   333
  4145
0000006140   4234   3232   3931   0a0d   303a   3039   363
  3046
0000006160   4530   4344   3933   4642   4542   3943   464
  3441
0000006200   3242   3532   0d33   3a0a   3031   3230   383
  3030
0000006220   3039   3043   3530   4141   3338   4241   323
  3039
0000006240   3043   3330   3231   3230   3344   3039   363
  4346
0000006260   4246   0a0d   313a   3030   3832   3038   413
  3841
0000006300   4133   3842   3932   3030   4636   3143   303
  4432
0000006320   3645   3230   4343   3030   4332   3030   373
  0d37
0000006340   3a0a   3031   3230   3839   3030   3043   323
```

Mon Jul 9 14:42:04 1990 ker_k.dmp Page 8, Line 207

```
 3043
0000006360   3338   3837   3230   3937   3430   3445   3339
 3646
0000006400   3341   3830   3944   3946   4238   3536   0a0d
 313a
0000006420   3030   4132   3038   3830   3832   3841   3833
 3043
0000006440   3832   3044   3133   3032   4432   4433   3830
 4433
0000006460   3830   4432   3030   3333   0d41   3a0a   3031
 3230
0000006500   3842   3030   3044   3230   3341   3341   3341
 3341
0000006520   3038   4643   3231   3230   3745   3630   4346
 3630
0000006540   3946   3043   4443   0a0d   313a   3030   4332
 3038
0000006560   3030   3130   3032   4532   3037   4636   3043
 4636
0000006600   4343   3030   3235   3132   3032   4432   3745
 3030
0000006620   4431   0d44   3a0a   3031   3230   3844   3030
 3232
0000006640   3445   3046   3341   3038   3546   4245   3536
 3238
0000006660   3037   3330   4145   3536   3338   3232   3044
 4646
0000006700   0a0d   313a   3030   4532   3038   3830   4433
 3830
0000006720   3732   3038   3732   3039   4536   3934   4633
 4136
0000006740   3033   4438   4639   4339   3830   3032   0d43
 3a0a
0000006760   3031   3230   3846   3030   3043   3338   4438
 3238
0000007000   4338   3338   3231   3230   4544   3036   3331
 3445
0000007020   3339   3341   4441   3238   3745   0a0d   303a
 3046
0000007040   3033   3038   4130   3843   3833   3846   3832
 3845
0000007060   4633   4130   4133   3846   4132   3845   3833
 4530
0000007100   3234   3132   0d41   3a0a   3031   3330   3731
 3030
0000007120   3036   3931   3043   3030   3043   3130   3043
 3338
0000007140   3043   3238   3846   3435   3130   3432   3230
 3946
0000007160   4245   0a0d   313a   3030   3233   3037   3130
 3032
0000007200   3933   4432   3830   4432   3830   4433   3030
 4431
0000007220   3030   4530   3246   3835   4632   4544   3545
 0d38
0000007240   3a0a   3031   3330   3733   3030   3533   3338
 4346
0000007260   3244   3746   3031   4641   3230   3243   3746
 3343
```

Mon Jul 9 14:42:04 1990 ker_k.dmp Page 9, Line 236

| | | | | | | | | |
|---|---|---|---|---|---|---|---|---|
| 0000007300 | 4645 | 3939 | 3546 | 3238 | 4646 | 4546 | 0a0d | 313a |
| 0000007320 | 3030 | 3433 | 3037 | 4530 | 3945 | 4638 | 4645 | 3835 |
| 0000007340 | 4133 | 4632 | 3937 | 4132 | 4446 | 3030 | 4432 | 3030 |
| 0000007360 | 4433 | 4530 | 4630 | 3830 | 0d42 | 3a0a | 3031 | 3330 |
| 0000007400 | 3735 | 3030 | 3341 | 3044 | 3045 | 3046 | 3341 | 4345 |
| 0000007420 | 3046 | 3341 | 4445 | 3046 | 3043 | 3330 | 3043 | 3230 |
| 0000007440 | 3232 | 4538 | 4631 | 0a0d | 313a | 3030 | 3633 | 3037 |
| 0000007460 | 3830 | 3833 | 3846 | 4532 | 4630 | 4635 | 4130 | 4533 |
| 0000007500 | 4330 | 4530 | 4330 | 4630 | 4130 | 4433 | 3133 | 4130 |
| 0000007520 | 3246 | 0d35 | 3a0a | 3031 | 3330 | 3737 | 3030 | 3130 |
| 0000007540 | 3343 | 3045 | 4546 | 3341 | 3045 | 4646 | 3239 | 4641 |
| 0000007560 | 3232 | 3044 | 3130 | 3044 | 3030 | 3044 | 3045 | 4539 |
| 0000007600 | 0a0d | 303a | 3042 | 3833 | 3037 | 4430 | 4630 | 4330 |
| 0000007620 | 3030 | 4330 | 3030 | 4331 | 4630 | 4330 | 4530 | 3230 |
| 0000007640 | 4232 | 0d38 | 3a0a | 3031 | 3330 | 3239 | 3030 | 3244 |
| 0000007660 | 3746 | 3031 | 4641 | 3230 | 3243 | 3746 | 4645 | 3343 |
| 0000007700 | 3839 | 4646 | 4545 | 3439 | 3030 | 4546 | 3241 | 4441 |
| 0000007720 | 0a0d | 303a | 3045 | 4133 | 3032 | 4630 | 3937 | 4132 |
| 0000007740 | 3846 | 3846 | 3832 | 3845 | 4533 | 4637 | 4130 | 3033 |
| 0000007760 | 4439 | 4638 | 3241 | 3732 | 0d43 | 3a0a | 3330 | 3030 |
| 0000010000 | 3030 | 3030 | 3230 | 3030 | 4142 | 3134 | 0a0d | 303a |
| 0000010020 | 3033 | 3030 | 3033 | 3030 | 3032 | 3130 | 4445 | 0d41 |
| 0000010040 | 3a0a | 3330 | 3030 | 4230 | 3030 | 3230 | 3030 | 3438 |
| 0000010060 | 4336 | 0a0d | 303a | 3033 | 3130 | 3033 | 3030 | 3032 |
| 0000010100 | 3530 | 3931 | 0d37 | 3a0a | 3031 | 3030 | 4231 | 3030 |
| 0000010120 | 3230 | 3030 | 4639 | 3043 | 3045 | 3043 | 3046 | 3043 |
| 0000010140 | 3044 | 3043 | 3338 | 3043 | 3238 | 3043 | 3030 | 3043 |
| 0000010160 | 4634 | 0a0d | 313a | 3030 | 3230 | 3042 | 3030 | 4331 |
| 0000010200 | 3030 | 4332 | 3030 | 4333 | 3030 | 4334 | 3030 | 3935 |
| 0000010220 | 3030 | 3030 | 3130 | 3832 | 3030 | 4430 | 4330 | |

Mon Jul 9 14:42:04 1990 ker_k.dmp Page 10, Line 266

0d34
0000010240 3a0a 3031 3030 4233 3030 3530 304
3430
0000010260 3044 3330 3044 3230 3044 3130 304
3030
0000010300 3044 3238 3044 3338 3044 3132 0a0
313a
0000010320 3030 3430 3042 4430 4430 4630 443
4530
0000010340 3330 4332 4530 4330 4630 4330 443
4330
0000010360 3830 4333 3830 4332 0d45 3a0a 303
3030
0000010400 4235 3030 3043 3030 3043 3130 304
3230
0000010420 3043 3330 3043 3430 3043 3530 303
3030
0000010440 3030 3231 3436 0a0d 313a 3030 363
3042
0000010460 3830 3030 4434 3030 4435 3030 443
3030
0000010500 4433 3030 4432 3030 4431 3030 443
3830
0000010520 4332 0d30 3a0a 3031 3030 4237 303
3044
0000010540 3338 3044 3044 3044 3046 3044 304
3233
0000010560 3043 3045 3043 3046 3043 3044 304
3034
0000010600 0a0d 313a 3030 3830 3042 3830 433
3830
0000010620 3932 3030 4546 4530 3030 4634 443
3830
0000010640 4432 3830 4433 4430 4430 3330 0d3
3a0a
0000010660 3031 3030 4239 3030 3046 3044 304
3233
0000010700 3043 3045 3043 3046 3043 3044 304
3338
0000010720 3043 3238 3039 4630 4637 0a0d 313
3030
0000010740 4130 3042 4530 4531 3030 4634 443
3830
0000010760 4432 3830 4433 4430 4430 4630 443
4530
0000011000 3330 3732 3334 0d35 3a0a 3031 303
4242
0000011020 3030 3030 3241 3345 3239 3344 324
3445
0000011040 3239 3444 3537 3138 3730 3231 323
3837
0000011060 3039 3634 0a0d 313a 3030 4330 304
3030
0000011100 4535 4343 3030 4331 3030 4332 383
4332
0000011120 3830 4433 3030 4431 3030 3932 383
3730
0000011140 0d39 3a0a 3031 3030 4244 3030 303
3437

```
Mon Jul  9 14:42:04 1990  ker_k.dmp  Page 11, Line 295

0000011160    3231    3046    3341    3945    3046    3341    4145
     3046
0000011200    3341    3437    3232    3046    3044    3230    4241
     0a0d
0000011220    303a    3046    4530    3042    4430    3030    3731
     4345
0000011240    3732    3046    3935    3030    3030    3130    3032
     4233
0000011260    3032    3032    4233    3630    0d35    3a0a    3230
     3330
0000011300    3042    3030    3038    4546    4443    0a0d    313a
     3030
0000011320    3936    3041    4530    3934    3030    3030    4530
     3835
0000011340    4632    4130    4533    3835    4233    3034    4646
     4537
0000011360    3835    4232    4134    0d35    3a0a    3031    3630
     4141
0000011400    3030    4546    3246    3341    3545    3238    3046
     3039
0000011420    3030    3030    3045    3542    3238    4333    3341
     3545
0000011440    3338    3836    0a0d    313a    3030    4236    3041
     4230
0000011460    3034    4646    4536    3835    4232    4634    4645
     4131
0000011500    4533    4230    4634    3246    4543    3934    3830
     3130
0000011520    0d37    3a0a    3031    3630    4143    3030    3730
     3341
0000011540    3545    3238    3046    3545    3338    3442    4646
     3746
0000011560    3545    3238    3442    4646    3246    3039    3137
     0a0d
0000011600    313a    3030    4436    3041    3830    3030    4137
     4533
0000011620    4230    3835    3132    4532    3835    4233    4634
     4646
0000011640    4536    3835    4232    4634    3946    0d32    3a0a
     4630
0000011660    3630    4145    3030    3146    3039    4630    4546
     3437
0000011700    3530    3046    3038    3530    3039    4630    4546
     3445
0000011720    3046    3232    3246    0a0d    303a    3030    3030
     3030
0000011740    4631    0d46    450a
0000011745
```

Annex D

I. Hardware Environment:

The following additional equipment is necessary for the operation of a the preferred embodiment of the system:

1. PC 386-SX. (Spring by Circle Computer Inc), equipped with:
2. 80 Mbyte hard disk.
3. VGA color monitor + VGA graphic card.
4. 8 Mbyte of Ram.
5. Mouse device.

The hardware described in the main document should be installed on the PC. as follows:

a. The I/O processor hardware occupies on the PC address space from cde000H up to cdffffH, and utilizes interrupt line IRQ15.
b. The GPU hardware occupies on the PC address space from e7000H up to e7fffH, and utilizes interrupt line IRQ12.
c. Other details are available from the drawings.

II. Software Environment:

The following software products should be installed on the computer prior to installing the system which is described in this document:

1. OS/2 Operating System by MicroSoft Inc.
2. Presentation Manager by MicroSoft Inc.

III. Software Installation:

1. Create new disk drives i: t:
2. Under drive i: create the following directories:
   i. Create directory t123 under the root.
   ii. Under \t123 create directories bin,dll,dat.
   iii. Under \dat create directories cfg,setup.

3. Copy the files from Annex B into the directory tree as follows:
   a. The files with extensions exe, and files, sutfile.hex, and gspmon should be copied into i:\t123\bin.
   b. All the files with the extensions dll and lib should be copied into i:\t123\dll.
   c. The file pcus.kbd should be copied into i:\t123\dat\setup.
   d. Files system.tcf ,master.tcf should be copied into i:\t123\dat\setup.
   e. File ms_mous.tcf should be copied into i:\123\dat\cfg. (may be empty)
   f. File local.tcf should be created under the root c:\. (may be empty).
   g. Files with extention scl should be copied into i:\t123\bin.
   h. Type in the command: setenv T123_CFG_PATH i:\t123\dat.

IV. Operation.

After the hardware and software are installed the system can be operated by the following steps:

1. Open a command window.
2. Change the current directory to i:\t123\bin.
3. type in the command crv.
4. Open a second command window.
5. Change the current directory to i:\t123\bin.
6. Type in the command tm.
7. Alternatively repeat steps 1,2 and then type in the command frame.
8. The application is ready to use.

THU MAR 14 17:19:50 1991 BIP.DLL PAGE 1, LINE 1

| | | | | | | | | |
|---|---|---|---|---|---|---|---|---|
| 0000000000 | 5A4D | 000A | 0007 | 0000 | 0004 | 0000 | FFFF | 0000 |
| 0000000020 | 00B8 | 0000 | 0000 | 0000 | 0040 | 0000 | 0000 | 0000 |
| 0000000040 | 0000 | 0000 | 0000 | 0000 | 0000 | 0000 | 0000 | 0000 |
| 0000000060 | 0000 | 0000 | 0000 | 0000 | 0000 | 0000 | 0080 | 0000 |
| 0000000100 | 1F0E | 0EBA | B400 | CD09 | B821 | 4C01 | 21CD | 6854 |
| 0000000120 | 7369 | 7020 | 6F72 | 7267 | 6D61 | 6320 | 6E61 | 6F6E |
| 0000000140 | 2074 | 6562 | 7220 | 6E75 | 6920 | 206E | 4F44 | 2053 |
| 0000000160 | 6F6D | 6564 | 0D2E | 240A | 0000 | 0000 | 0000 | 0000 |
| 0000000200 | 454E | 0305 | 007B | 0002 | 0BF8 | CD41 | 800E | 0002 |
| 0000000220 | 0400 | 0000 | 001E | 0001 | 0000 | 0000 | 0004 | 0001 |
| 0000000240 | 0013 | 0040 | 0060 | 0068 | 006F | 0071 | 00FD | 0000 |
| 0000000260 | 0000 | 0004 | 0002 | 0001 | 0000 | 0000 | 0000 | 0000 |
| 0000000300 | 0011 | 0799 | 0D00 | 079A | 0096 | 02B0 | 0D01 | 02B0 |
| 0000000320 | 00C2 | 0012 | 1CB1 | 0012 | 00C4 | 0125 | 1CB1 | 0125 |
| 0000000340 | 000B | 0001 | 0004 | 0100 | 4203 | 5049 | 0000 | 0100 |
| 0000000360 | 0000 | 4408 | 534F | 4143 | 4C4C | 0053 | 0F00 | 6942 |
| 0000000400 | 2070 | 6C44 | 206C | 696C | 7262 | 7261 | 0079 | 0000 |
| 0000000420 | 00C8 | 0000 | B81E | FFFF | D88E | C91F | 90CB | 0000 |
| 0000000440 | 0000 | 0000 | 0000 | 0000 | 0000 | 0000 | 0000 | 8B55 |
| 0000000460 | 50EC | C48B | 5016 | FF9A | 00FF | 5800 | E086 | 68A3 |
| 0000000500 | 1E01 | 4468 | 1E00 | 4268 | 9A00 | FFFF | 0000 | 21E8 |
| 0000000520 | E800 | 006C | FF9A | 00FF | B800 | 0001 | E58B | CB5D |
| 0000000540 | 9A50 | FFFF | 0000 | FF9A | 00FF | 6800 | 00FF | 16FF |
| 0000000560 | 004A | BB1E | 000D | FF33 | 068E | 0044 | FFB9 | 267F |
| 0000000600 | 3D80 | 7500 | 4701 | 8026 | 003D | 3174 | 4EBE | 8B01 |
| 0000000620 | 8BD1 | F3CB | 8BA6 | 74CA | 3308 | F2C0 | 74AE | EBE7 |
| 0000000640 | 061C | 071E | F78B | BF1F | 016F | 2CAC | 7241 | C00E |
| 0000000660 | 04E0 | AC92 | 412C | 0572 | C20A | EBAA | 1FED | 00C3 |
| 0000000700 | 02BB | 5200 | D48B | A780 | 016F | 50B7 | C48B | 1653 |
| 0000000720 | 1650 | 9A52 | FFFF | 0000 | C00B | 7558 | B112 | 3D40 |
| 0000000740 | 0001 | 0774 | 023D | 7500 | B106 | 0808 | 6F8F | 4B01 |
| 0000000760 | D479 | 8B5A | C60E | E301 | C41E | C806 | 8C01 | 33C2 |
| 0000001000 | FFDB | C41E | 7301 | E903 | 00CE | 06C4 | 01CC | C28C |
| 0000001020 | 03BB | FF00 | C41E | BE01 | 01D0 | D0BF | E801 | 0080 |
| 0000001040 | D0B8 | 3D01 | 01D0 | 0B74 | 016A | 680E | 0124 | FF9A |
| 0000001060 | 00FF | C300 | 06B8 | 8E00 | BED8 | 01D0 | D0BF | E801 |
| 0000001100 | 005E | 036A | 006A | 006A | 1F9A | 0001 | 5500 | EC8B |
| 0000001120 | B0BE | BF02 | 02B0 | 47E8 | BE00 | 01D0 | D0BF | E801 |
| 0000001140 | 003E | 03EB | 8B55 | BEEC | 01D0 | D0BF | E801 | 0030 |
| 0000001160 | 11B9 | BB00 | 0003 | 87F6 | 016F | 7401 | 5306 | FF9A |
| 0000001200 | 00FF | 4300 | F0E2 | C033 | 8A50 | 0646 | 9A50 | FFFF |
| 0000001220 | 0000 | 0E8B | 01C6 | 07E3 | 02BB | FF00 | C41E | C301 |
| 0000001240 | F73B | 0E73 | EF83 | 8B04 | 0B05 | 0245 | F274 | 1DFF |
| 0000001260 | EEEB | 00C3 | 8B55 | B8EC | 00FC | 9A50 | 0057 | 0000 |
| 0000001300 | 3E83 | 01AA | 7400 | FF04 | A81E | B801 | 00FF | 9A50 |
| 0000001320 | 01AC | 0000 | E58B | CB5D | 02B8 | E900 | FE82 | 14C8 |
| 0000001340 | 0000 | 5657 | F62B | FF2B | 3639 | 0044 | 0375 | F0E9 |
| 0000001360 | 8B00 | 4416 | 2B00 | 89C0 | F046 | 5689 | 89F2 | F646 |
| 0000001400 | 5689 | 6AF8 | FF0C | F876 | 76FF | 1EF6 | 4E68 | 9A01 |
| 0000001420 | 0285 | 0000 | C483 | 0B0A | 74C0 | 4619 | FE81 | 7FFF |
| 0000001440 | 0376 | BCE9 | C400 | F65E | 46FF | 26F6 | 3F80 | 7500 |
| 0000001460 | 47EA | 0CEB | 5EC4 | FFF6 | F646 | 8026 | 003F | F475 |
| 0000001500 | 5E8B | 26F6 | 3F80 | 7500 | 8DBA | 0145 | 6A50 | 9A04 |
| 0000001520 | FFFF | 0000 | C483 | 8904 | EC46 | 5689 | 56EE | FF9A |
| 0000001540 | 00FF | 8300 | 02C4 | 4689 | 89FC | FE56 | 468B | 0BEC |
| 0000001560 | EE46 | 6D74 | 468B | 0BFC | 74C2 | 8B66 | EC46 | 568B |
| 0000001600 | A3EE | 019D | 1689 | 019F | 0C6A | 76FF | FFF2 | F076 |
| 0000001620 | 681E | 014E | FF9A | 00FF | 8300 | 0AC4 | C00B | 2C74 |
| 0000001640 | 5EC4 | 8BEC | FC46 | 568B | 26FE | 0789 | 8926 | 0257 |

APPENDIX E

THU MAR 14 17:19:50 1991 BIP.DLL PAGE 2, LINE 60

| | | | | | | | | |
|---|---|---|---|---|---|---|---|---|
| 0000001660 | 4683 | 04EC | 5EC4 | FFF0 | F046 | 8A26 | C407 | FC5E |
| 0000001700 | 46FF | 26FC | 0788 | C00A | 0E74 | E8EB | 5EC4 | FFF0 |
| 0000001720 | F046 | 8026 | 003F | F475 | 5EC4 | 26F0 | 3F80 | 7500 |
| 0000001740 | 5EA7 | C95F | 90CB | 8B55 | 56EC | B857 | 0125 | D88E |
| 0000001760 | C08E | 568B | BE06 | 01D8 | 3BAD | 74C2 | 4010 | 7496 |
| 0000002000 | 970C | C033 | FFB9 | F2FF | 8BAE | EBF7 | 96EB | 5E5F |
| 0000002020 | E58B | CA5D | 0002 | 8B55 | 57EC | 76FF | 9A06 | FFFF |
| 0000002040 | 0000 | C00B | 1F74 | 8B92 | 33FA | B9C0 | FFFF | AEF2 |
| 0000002060 | D1F7 | 5049 | C48B | 02BB | 5300 | 521E | 1651 | 9A50 |
| 0000002100 | FFFF | 0000 | 5F5B | E58B | CA5D | 0002 | 8B55 | 8BEC |
| 0000002120 | 065E | DB0B | 0474 | 4F80 | 01FE | E58B | CB5D | 8B55 |
| 0000002140 | 56EC | BB57 | 01AC | 3F83 | 7500 | 1E29 | B807 | 0005 |
| 0000002160 | 50E8 | 7502 | 3305 | 99C0 | 24EB | 2440 | A3FE | 01AC |
| 0000002200 | AEA3 | 9601 | 04C7 | 0001 | C683 | C704 | FE44 | FFFE |
| 0000002220 | 3689 | 01B2 | 4E8B | 8C06 | 8ED8 | E8C0 | 00E3 | 5E5F |
| 0000002240 | E58B | CB5D | 8B55 | C4EC | 065E | C08C | C30B | 0574 |
| 0000002260 | 8026 | FE4F | 8801 | 5DE5 | 55CB | EC8B | EC83 | 5602 |
| 0000002300 | 8B57 | 0646 | F13D | 73FF | 831E | B63E | 0001 | 0875 |
| 0000002320 | 25E8 | 7400 | A312 | 01B6 | 8BE8 | 7500 | E815 | 0018 |
| 0000002340 | 0574 | 81E8 | 7500 | FF0B | 0676 | FF9A | 00FF | 8300 |
| 0000002360 | 02C4 | 5E5F | E58B | CB5D | F0BB | 3900 | 065E | 0776 |
| 0000002400 | 5E8B | 4306 | E383 | 89FE | FE5E | C033 | 501E | 8D50 |
| 0000002420 | 0E4F | B051 | 5002 | FF9A | 00FF | 8300 | 08C4 | FA83 |
| 0000002440 | 74FF | 8B41 | 87C2 | B816 | A301 | 01BA | 063B | 01BE |
| 0000002460 | 0376 | BEA3 | 0B01 | 74D2 | 8E05 | A3DA | 0008 | 5E8B |
| 0000002500 | 8EFE | 33D8 | A3C0 | 0008 | 4848 | 4789 | B80C | 000A |
| 0000002520 | 00A3 | A300 | 0002 | 478D | A301 | 000A | 0D05 | A300 |
| 0000002540 | 0006 | D88C | C31F | D88C | C08E | 4E8B | 3306 | 8ED2 |
| 0000002560 | BA1E | E801 | 000B | D20B | C18C | D98E | 00C3 | D0E9 |
| 0000002600 | 4100 | FA74 | E180 | 83FE | EEF9 | F273 | 778B | FC02 |
| 0000002620 | 8BAD | A8FE | 7401 | 4843 | C13B | 1573 | D08B | F003 |
| 0000002640 | A8AD | 7401 | 0335 | 05C2 | 0002 | F78B | 4489 | EBFE |
| 0000002660 | 8BE6 | 74FE | 030C | 89F9 | FE4C | C12B | 8948 | EB05 |
| 0000002700 | 0305 | FEF9 | FE4C | C68B | DA8C | DCB9 | 3B02 | 74D1 |
| 0000002720 | 2605 | 1E8C | 01BA | 7F89 | C302 | C626 | C006 | 0201 |
| 0000002740 | FE3D | 74FF | 8B25 | 03FE | ADF0 | 01A8 | F274 | FE8B |
| 0000002760 | 3B48 | 73C1 | 8BBC | 03D0 | ADF0 | 01A8 | E274 | C203 |
| 0000003000 | 0205 | 8B00 | 89F7 | FE44 | E6EB | 478B | 0B08 | 74C0 |
| 0000003020 | 8E04 | EBD8 | 2615 | 0EFE | 01C0 | 1274 | D88C | BBBF |
| 0000003040 | 3B04 | 74C7 | 2605 | 1E8E | 01B6 | 378B | BBEB | 778B |
| 0000003060 | 3306 | E8C0 | 006B | C63B | 0D74 | 0124 | 4040 | E898 |
| 0000003100 | 005F | 0D74 | 4DFE | E8FE | 001D | 0574 | 4E96 | EB4E |
| 0000003120 | 8C98 | B9D8 | 050F | C13B | 0474 | A326 | 01BA | 078B |
| 0000003140 | 4789 | 3302 | 99C0 | 51C3 | 458B | A8FE | 7401 | 2B03 |
| 0000003160 | 49C8 | 4141 | FFBA | 267F | 163B | 01BC | 0476 | EAD1 |
| 0000003200 | F575 | C18B | C603 | 1572 | C203 | 0D72 | D2F7 | C223 |
| 0000003220 | C62B | 0CE8 | 7500 | F708 | D1D2 | 75EA | 33E5 | 59C0 |
| 0000003240 | 52C3 | E851 | 001D | 1874 | 8B57 | 8BFE | 03F0 | C7F2 |
| 0000003260 | FE44 | FFFE | 7789 | 8B06 | 2BD6 | 4AD7 | 5589 | 58FE |
| 0000003300 | 5A59 | 53C3 | 3350 | 1ED2 | 5252 | B850 | 0001 | 0650 |
| 0000003320 | 9A1F | 0407 | 0000 | C483 | 8308 | FFFA | 5A1F | 745B |
| 0000003340 | 0B02 | C3D2 | 0AC8 | 0000 | 6A56 | FF00 | 0876 | 006A |
| 0000003360 | 76FF | 9A06 | FFFF | 0000 | 4689 | 89F8 | FA56 | C2F7 |
| 0000003400 | FFFF | 0674 | C02B | EB99 | 902F | 768B | 56F8 | 4F9A |
| 0000003420 | 0002 | 8300 | 02C4 | 4689 | 89FC | FE56 | D00B | 1274 |
| 0000003440 | 6A56 | FF00 | FE76 | 9A50 | FFFF | 0000 | C483 | EB08 |
| 0000003460 | 9007 | 468B | 8BFC | FE56 | C95E | 90CB | 8B55 | 56EC |
| 0000003500 | 0657 | 7E83 | 000A | 3875 | 4CBF | 8B00 | 0856 | 468B |
| 0000003520 | 4806 | 0775 | 57E8 | 7200 | EB27 | 8B4C | 4C36 | 4801 |

THU MAR 14 17:19:50 1991 BIP.DLL PAGE 3, LINE 119

```
0000003540  1174  F73B  0D74  448B  8902  0E46  E856  003E
0000003560  735E  8334  04C6  FE81  014C  0473  D20B  0675
0000003600  FFB8  99FF  21EB  8B50  52C4  5016  C033  9A50
0000003620  FFFF  0000  F95B  C085  E675  1489  5C89  8902
0000003640  4C36  8B01  33D3  07C0  5E5F  E58B  CB5D  4E8B
0000003660  8B0E  39F7  024C  0C74  C683  8104  4CFE  7501
0000003700  F9F2  2CEB  DA8B  1C03  2672  D38B  C18E  F73B
0000003720  0675  1E39  0046  1373  5153  FF9A  00FF  8500
0000003740  75C0  3BDE  75F7  8904  4616  9200  0487  D18B
0000003760  00C3  8B55  57EC  1E56  4E8B  E30E  8B27  C4D9
0000004000  067E  F78B  C033  AEF2  D9F7  CB03  FE8B  76C5
0000004020  F30A  8AA6  FF44  C933  3A26  FF45  0477  0474
0000004040  4949  D1F7  C18B  5E1F  8B5F  5DE5  00CB  8B55
0000004060  8BEC  0C4E  38E3  C457  067E  D78B  DAF7  0C74
0000004100  D12B  DB1B  D323  D103  D187  D12B  468B  8A0A
0000004120  D1E0  F3E9  13AB  F3C9  87AA  E3D1  8C10  81C3
0000004140  FFC3  8EFF  D1C3  F3E9  13AB  F3C9  5FAA  468B
0000004160  8B06  0856  CB5D  8B55  8BEC  0846  5E8B  0B0C
0000004200  8BD8  0A5E  0B75  468B  F706  8BE3  5DE5  08CA
0000004220  F700  8BE3  8BC8  0646  66F7  030C  8BC8  0646
0000004240  E3F7  D103  E58B  CA5D  1608  0200  4400  0205
0000004260  0000  0300  7E01  0101  0500  0300  C000  0101
0000004300  0600  0303  3901  0101  0700  0300  3001  0103
0000004320  8A00  0300  1800  0106  1E00  0507  5101  0107
0000004340  8800  0300  8001  0106  2200  0300  5200  0100
0000004360  A400  0301  CB01  0106  2600  0300  FF00  0105
0000004400  A900  0303  C200  0105  2C00  0306  6F01  0101
0000004420  3B00  0300  C401  0100  4000  0300  4500  0100
0000004440  CE00  0301  D800  0103  4E00  0303  4000  0102
0000004460  D400  0305  0E00  0103  D600  0302  3A01  0100
0000004500  5B00  0300  2701  0100  5C00  0300  0000  0102
0000004520  E200  0306  E400  0105  6600  0007  0000  0000
0000004540  0000  0000  0000  0000  534D  5220  6E75  542D
0000004560  6D69  2065  694C  7262  7261  2079  202D  6F43
0000004600  7970  6972  6867  2074  6328  2029  3931  3838
0000004620  202C  694D  7263  736F  666F  2074  6F43  7072
0000004640  0011  0000  0000  02B0  02B0  0154  02B0  FFFF
0000004660  0000  0000  0[illegible]  0000  0000  0000  0000  0000
*
0000005240  0000  0000  0[illegible]  0000  0000  0[illegible]0  004C  435F
0000005260  465F  4C49  5F[illegible]  4E49  4F46  003D  0000  0000
0000005300  0000  0000  0000  0000  0000  0001  1400  8100
0000005320  8181  0000  0000  0000  0000  0000  0000  0000
0000005340  0000  0A00  0A0A  0A0A  0A0A  0A0A  0A0A  0A0A
0000005360  0A0A  0A0A  0A0A  000A  0000  0000  0000  0000
0000005400  0000  0000  0000  0000  0000  0000  0000  0000
0000005420  0000  0000  0000  0000  0000  0000  2000  0000
0000005440  0000  0000  0000  0000  0000  0000  0000  0000
0000005460  3C3C  4D4E  4753  3E3E  0000  3652  3030  0D30
0000005500  2D0A  7320  6174  6B63  6F20  6576  6672  6F6C
0000005520  0D77  000A  0003  3652  3030  0D33  2D0A  6920
0000005540  746E  6765  7265  6420  7669  6469  2065  7962
0000005560  3020  0A0D  0800  5200  3036  3830  0A0D  202D
0000005600  6F6E  2074  6E65  756F  6867  7320  6170  6563
0000005620  6620  726F  C120  6772  6D75  6E65  7374  0A0D
0000005640  0900  5200  3036  3930  0A0D  202D  6F6E  2074
0000005660  6E65  756F  6867  7320  6170  6563  6620  726F
0000005700  6520  766E  7269  6E6F  656D  746E  0A0D  FC00
0000005720  0D00  000A  00FF  7572  2D6E  6974  656D  6520
```

THU MAR 14 17:19:50 1991 BIP.DLL PAGE 4, LINE 178

| | | | | | | | | |
|---|---|---|---|---|---|---|---|---|
| 0000005740 | 7272 | 726F | 0020 | 0002 | 3652 | 3030 | 0D32 | 2D0A |
| 0000005760 | 6620 | 6F6C | 7461 | 6E69 | 2067 | 6F70 | 6E69 | 2074 |
| 0000006000 | 6F6E | 2074 | 6F6C | 6461 | 6465 | 0A0D | FF00 | FFFF |
| 0000006020 | 0001 | 0002 | 004E | 0002 | 0000 | 0000 | 0000 | 0000 |
| 0000006040 | 2E2E | 425C | 5049 | 544D | 425C | 5049 | 4C44 | 2E47 |
| 0000006060 | 0048 | 0000 | 0000 | 0000 | 0000 | 0000 | 0000 | 0000 |
| 0000006100 | 0125 | 0000 | 0352 | 000E | 0001 | FFFF | 0000 | 0000 |
| 0000006120 | 0006 | 0000 | 0001 | 000E | 00E0 | 0090 | 9600 | 002D |
| 0000006140 | 0044 | 00D2 | 0035 | 0100 | FFFF | 00EF | 0000 | 0000 |
| 0000006160 | 0000 | 0003 | 0005 | 00F3 | 0000 | 8002 | 000A | 0005 |
| 0000006200 | 0026 | 000C | 0101 | FFFF | FFFF | 0000 | 0000 | 0000 |
| 0000006220 | 0003 | 0005 | 00F9 | 0000 | 8002 | 0038 | 0005 | 0026 |
| 0000006240 | 000C | 0102 | FFFF | FFFF | 0000 | 0000 | 0000 | 0003 |
| 0000006260 | 0006 | 00FF | 0000 | 8002 | 0067 | 0005 | 0026 | 000C |
| 0000006300 | 0103 | FFFF | FFFF | 0000 | 0000 | 0000 | 0003 | 0005 |
| 0000006320 | 0106 | 0000 | 8002 | 0095 | 0005 | 0026 | 000C | 0104 |
| 0000006340 | FFFF | FFFF | 0000 | 0000 | 0000 | 0003 | 0005 | 010C |
| 0000006360 | 0000 | 8002 | 0094 | 0022 | 0026 | 000C | 0105 | FFFF |
| 0000006400 | FFFF | 0000 | 0000 | 0000 | 0005 | 0012 | 0112 | 0001 |
| 0000006420 | 8001 | 000B | 001F | 005A | 0008 | FFFF | FFFF | FFFF |
| 0000006440 | 6942 | 2070 | 7242 | 6165 | 706B | 696F | 746E | 0100 |
| 0000006460 | 0000 | 7E00 | 6F43 | 746E | 7E00 | 6E49 | 7469 | 7E00 |
| 0000006500 | 6857 | 7265 | 0065 | 7E65 | 6958 | 0074 | 487E | 6C65 |
| 0000006520 | 0070 | 6553 | 656C | 7463 | 2020 | 4942 | 2050 | 704F |
| 0000006540 | 6974 | 6E6F | 0000 | 0000 | 0000 | 0000 | 0000 | 0000 |
| 0000006560 | 424E | 3030 | 062A | 0000 | 0001 | 0000 | 000E | 0000 |
| 0000006600 | 0000 | 0000 | 2E0C | 425C | 5049 | 4C44 | 2E4C | 424F |
| 0000006620 | 014A | 1E00 | 9100 | 0000 | 0100 | 0000 | 0B00 | 6C64 |
| 0000006640 | 5C6C | 7363 | 2E75 | 7361 | 016D | B000 | F300 | 0000 |
| 0000006660 | 0100 | 0000 | 0E00 | 6C64 | 5C6C | 7363 | 6475 | 7461 |
| 0000006700 | 612E | 6D73 | 0001 | 01A4 | 0024 | 0000 | 0001 | 0000 |
| 0000006720 | 6F0F | 3273 | 635C | 7472 | 6D30 | 6773 | 612E | 6D73 |
| 0000006740 | 0001 | 01C8 | 0006 | 0000 | 0001 | 0000 | 630A | 7472 |
| 0000006760 | 6630 | 2E70 | 7361 | 016D | CE00 | 0801 | 0001 | 0100 |
| 0000007000 | 0000 | 0D00 | 6C64 | 5C6C | 6573 | 6574 | 766E | 2E70 |
| 0000007020 | 0163 | D600 | 6602 | 0000 | 0100 | 0000 | 0F00 | 736F |
| 0000007040 | 5C32 | 6D6E | 6773 | 6468 | 2E72 | 7361 | 016D | 3C00 |
| 0000007060 | 5803 | 0000 | 0100 | 0000 | 0B00 | 6D6E | 6C61 | 6F6C |
| 0000007100 | 2E63 | 7361 | 016D | 9400 | D903 | 0000 | 0100 | 0000 |
| 0000007120 | 0B00 | 6D66 | 6C61 | 6F6C | 2E63 | 7361 | 016D | 6E00 |
| 0000007140 | 6604 | 0001 | 0100 | 0000 | 0B00 | 6D61 | 6C61 | 6F6C |
| 0000007160 | 2E63 | 7361 | 016D | D400 | 5805 | 0000 | 0100 | 0000 |
| 0000007200 | 0800 | 6163 | 6C6C | 636F | 632E | 0001 | 062C | 00B5 |
| 0000007220 | 0000 | 0001 | 0000 | 6F0E | 3273 | 625C | 6B72 | 7463 |
| 0000007240 | 2E6C | 7361 | 016D | E200 | 3B06 | 0000 | 0100 | 0000 |
| 0000007260 | 0B00 | 7473 | 6E72 | 6D63 | 2E70 | 7361 | 016D | 1E00 |
| 0000007300 | 4807 | 0000 | 0100 | 0000 | 0B00 | 6D68 | 6D65 | 6573 |
| 0000007320 | 2E74 | 7361 | 016D | 6600 | 3407 | 0000 | 0100 | 0000 |
| 0000007340 | 0800 | 6D6C | 6C75 | 612E | 6D73 | 0000 | 0001 | 0205 |
| 0000007360 | 5F0D | 7862 | 645F | 6C6C | 645F | 6D75 | 796D | 02B0 |
| 0000007400 | 0002 | 0000 | 5F06 | 6465 | 7461 | B061 | 0202 | 0000 |
| 0000007420 | 0400 | 655F | 646E | 004A | 0002 | 0000 | 5F0B | 615F |
| 0000007440 | 7865 | 7469 | 725F | 6E74 | 001E | 0001 | 0000 | 4306 |
| 0000007460 | 495F | 494E | B054 | 0202 | 0000 | 0C00 | 735F | 6174 |
| 0000007500 | 6B63 | 6F62 | 7474 | 6D6F | 014C | 0002 | 0000 | 5F07 |
| 0000007520 | 615F | 7262 | 706B | 0042 | 0002 | 0000 | 5F08 | 615F |
| 0000007540 | 6D63 | 6C64 | 4C6E | 0200 | 0000 | 0800 | 5F5F | 6261 |
| 0000007560 | 6B72 | 6274 | 0046 | 0002 | 0000 | 5F08 | 615F | 6973 |
| 0000007600 | 647A | 4873 | 0200 | 0000 | 0800 | 5F5F | 7461 | 706F |

THU MAR 14 17:19:50 1991 BIP.DLL PAGE 5, LINE 237

| | | | | | | | | |
|---|---|---|---|---|---|---|---|---|
| 0000007620 | 7073 | 014E | 0002 | 0000 | 5F09 | 615F | 6663 | 6E69 |
| 0000007640 | 6F66 | 014C | 0002 | 0000 | 5F09 | 615F | 7262 | 746B |
| 0000007660 | 6562 | 0044 | 0002 | 0000 | 5F09 | 615F | 6E65 | 7376 |
| 0000007700 | 6765 | 9876 | 0000 | 0001 | 5F0A | 615F | 7263 | 7574 |
| 0000007720 | 6573 | 5064 | 0100 | 0000 | 0B00 | 5F5F | 6D61 | 6773 |
| 0000007740 | 655F | 6978 | 6874 | 0201 | 0000 | 0B00 | 5F5F | 736F |
| 0000007760 | 6576 | 7372 | 6F69 | 646E | 0201 | 0000 | 0600 | 655F |
| 0000010000 | 7272 | 6F6E | 0183 | 0002 | 0000 | 5F06 | 705F | 7069 |
| 0000010020 | 5465 | 0101 | 0000 | 0600 | 5F5F | 7865 | 7469 | 01A5 |
| 0000010040 | 0002 | 0000 | 5F07 | 635F | 6968 | 646C | 016D | 0002 |
| 0000010060 | 0000 | 5F07 | 6E5F | 6966 | 656C | 00B0 | 0001 | 0000 |
| 0000010100 | 5F07 | 635F | 6E69 | 7469 | 0197 | 0002 | 0000 | 5F07 |
| 0000010120 | 5F5F | 7261 | 6367 | 0168 | 0002 | 0000 | 5F0D | 645F |
| 0000010140 | 736F | 6576 | 6D72 | 6A61 | 726F | 016B | 0002 | 0000 |
| 0000010160 | 5F07 | 6F5F | 6573 | 7272 | 0199 | 0002 | 0000 | 5F07 |
| 0000010200 | 5F5F | 7261 | 7667 | 0169 | 0002 | 0000 | 5F0D | 645F |
| 0000010220 | 736F | 6576 | 6D72 | 6E69 | 726F | 019D | 0002 | 0000 |
| 0000010240 | 5F08 | 6E65 | 6976 | 6F72 | 6F6E | 0201 | 0000 | 0800 |
| 0000010260 | 5F5F | 736F | 6966 | 656C | 016A | 0002 | 0000 | 5F08 |
| 0000010300 | 6F5F | 6D73 | 646F | C465 | 0201 | 0000 | 0800 | 5F5F |
| 0000010320 | 7066 | 6E69 | 7469 | 01A1 | 0002 | 0000 | 5F08 | 705F |
| 0000010340 | 6D67 | 7470 | 6A72 | 0201 | 0000 | 0900 | 5F5F | 6F64 |
| 0000010360 | 6D73 | 646F | 6865 | 0201 | 0000 | 0900 | 5F5F | 736F |
| 0000010400 | 616D | 6F6A | 6972 | 0201 | 0000 | 0900 | 5F5F | 736F |
| 0000010420 | 696D | 6F6E | 6672 | 0201 | 0000 | 0A00 | 5F5F | 6D75 |
| 0000010440 | 7361 | 766B | 6C61 | 0182 | 0001 | 0000 | 5F0A | 635F |
| 0000010460 | 6574 | 6D72 | 7573 | 6B62 | 0201 | 0000 | 0A00 | 5F5F |
| 0000010500 | 6F64 | 6573 | 7272 | 6F6E | 015C | 0002 | 0000 | 5F05 |
| 0000010520 | 665F | 6361 | 013D | 0001 | 0000 | 5F05 | 7865 | 7469 |
| 0000010540 | 01A4 | 0001 | 0000 | 5F0E | 465F | 5F46 | 534D | 4247 |
| 0000010560 | 4E41 | 454E | A852 | 0201 | 0000 | 0900 | 5F5F | 6461 |
| 0000010600 | 6762 | 736D | 7667 | 0098 | 0100 | 0900 | 5F5F | 6361 |
| 0000010620 | 7472 | 736D | C867 | 0101 | 0000 | 0800 | 5F5F | 7066 |
| 0000010640 | 7274 | 7061 | 01CE | 0001 | 0000 | 5F09 | 735F | 7465 |
| 0000010660 | 6E65 | 7076 | 02D6 | 0001 | 0000 | 5F0B | 4E5F | 534D |
| 0000010700 | 5F47 | 4554 | 5458 | 0306 | 0001 | 0000 | 5F0C | 4E5F |
| 0000010720 | 534D | 5F47 | 5257 | 5449 | 3C45 | 0103 | 0000 | 0700 |
| 0000010740 | 5F5F | 666E | 6572 | AC65 | 0201 | 0000 | 0800 | 5F5F |
| 0000010760 | 7361 | 6765 | 7364 | 034E | 0001 | 0000 | 5F09 | 6E5F |
| 0000011000 | 616D | 6C6C | 636F | 03A9 | 0001 | 0000 | 5F07 | 616D |
| 0000011020 | 6C6C | 636F | 0394 | 0001 | 0000 | 5F07 | 665F | 7266 |
| 0000011040 | 6565 | 03A9 | 0001 | 0000 | 5F09 | 665F | 616D | 6C6C |
| 0000011060 | 636F | 0394 | 0001 | 0000 | 5F05 | 7266 | 6565 | 05B3 |
| 0000011100 | 0001 | 0000 | 5F0C | 615F | 616D | 6C6C | 636F | 7262 |
| 0000011120 | B66B | 0201 | 0000 | 0700 | 5F5F | 7361 | 6765 | BE31 |
| 0000011140 | 0201 | 0000 | 0700 | 5F5F | 7361 | 6765 | B868 | 0201 |
| 0000011160 | 0000 | 0700 | 5F5F | 7361 | 6765 | BA6E | 0201 | 0000 |
| 0000011200 | 0700 | 5F5F | 7361 | 6765 | 9172 | 0105 | 0000 | 0800 |
| 0000011220 | 5F5F | 6D61 | 696C | 6B6E | 01BE | 0002 | 0000 | 5F09 |
| 0000011240 | 515F | 6843 | 6164 | 6174 | 0471 | 0001 | 0000 | 5F09 |
| 0000011260 | 615F | 616D | 6C6C | 636F | 0557 | 0001 | 0000 | 5F0A |
| 0000011300 | 615F | 656D | 7078 | 6E61 | BC64 | 0201 | 0000 | 0A00 |
| 0000011320 | 5F5F | 6D61 | 6C62 | 736B | 7A69 | 05D4 | 0001 | 0000 |
| 0000011340 | 5F07 | 6163 | 6C6C | 636F | 062C | 0001 | 0000 | 5F07 |
| 0000011360 | 7262 | 636B | 6C74 | 06E2 | 0001 | 0000 | 5F08 | 7473 |
| 0000011400 | 6E72 | 6D63 | 1E70 | 0107 | 0000 | 0700 | 6D5F | 6D65 |
| 0000011420 | 6573 | 6674 | 0107 | 0000 | 0800 | 5F5F | 4661 | 6D6C |
| 0000011440 | 6C75 | 0766 | 0001 | 0000 | 5F09 | 615F | 7546 | 6D6C |
| 0000011460 | 6C75 | 0101 | 8000 | 0101 | 8000 | 0101 | 8000 | 0101 |

THU MAR 14 17:19:50 1991 BIP.DLL PAGE 6, LINE 296

| | | | | | | | | |
|---|---|---|---|---|---|---|---|---|
| 0000011500 | 8000 | 0101 | 8000 | 0A01 | 7500 | 8380 | 0081 | 0064 |
| 0000011520 | 0283 | 1B02 | 0001 | 0500 | 0D02 | 0A00 | 0A00 | 0000 |
| 0000011540 | 0400 | 620C | 5F78 | 6C64 | 5F6C | 7564 | 6D6D | 0179 |
| 0000011560 | 0802 | 6962 | 6470 | 6C6C | 632E | 0002 | 0006 | 0000 |
| 0000011600 | 0007 | 000A | 0C00 | 4C4C | 4249 | 4443 | 4C4C | 4C2E |
| 0000011620 | 4249 | 4F07 | 3253 | 4C2E | 4249 | 0022 | 0101 | 0001 |
| 0000011640 | 0008 | 0000 | 0019 | 0102 | 0001 | 017A | 0000 | 0014 |
| 0000011660 | 0103 | 0001 | 05C2 | 0000 | 0021 | 0104 | 0001 | 05E3 |
| 0000011700 | 0000 | 001E | 0105 | 0001 | 0601 | 0000 | 0013 | 0101 |
| 0000011720 | 0002 | 0021 | 0000 | 0018 | 0102 | 0002 | 018E | 0000 |
| 0000011740 | 00E7 | 0101 | 0003 | 0039 | 0000 | 001B | 0102 | 0003 |
| 0000011760 | 0275 | 0000 | 017B | 0101 | 0004 | 0054 | 0000 | 001C |
| 0000012000 | 0102 | 0004 | 03F0 | 0000 | 0035 | 0101 | 0005 | 0070 |
| 0000012020 | 0000 | 0017 | 0102 | 0005 | 0425 | 0000 | 000F | 0101 |
| 0000012040 | 0006 | 0087 | 0000 | 001A | 0102 | 0006 | 0434 | 0000 |
| 0000012060 | 0010 | 0101 | 0007 | 00A1 | 0000 | 001C | 0102 | 0007 |
| 0000012100 | 0444 | 0000 | 0025 | 0101 | 0008 | 00BD | 0000 | 0018 |
| 0000012120 | 0102 | 0008 | 0469 | 0000 | 002D | 0101 | 0009 | 00D5 |
| 0000012140 | 0000 | 0018 | 0102 | 0009 | 0496 | 0000 | 0038 | 0101 |
| 0000012160 | 000A | 00ED | 0000 | 0018 | 0102 | 000A | 04CE | 0000 |
| 0000012200 | 009C | 0101 | 000B | 0105 | 0000 | 0015 | 0102 | 000B |
| 0000012220 | 056A | 0000 | 000E | 0101 | 000C | 011A | 0000 | 001B |
| 0000012240 | 0102 | 000C | 0578 | 0000 | 000E | 0101 | 000D | 0135 |
| 0000012260 | 0000 | 0018 | 0102 | 000D | 0586 | 0000 | 000F | 0101 |
| 0000012300 | 000F | 014D | 0000 | 0018 | 0102 | 000F | 0595 | 0000 |
| 0000012320 | 000E | 0101 | 0010 | 0165 | 0000 | 0015 | 0102 | 0010 |
| 0000012340 | 05A3 | 0000 | 001F | 0106 | 0000 | 0614 | 0000 | 0016 |
| 0000012360 | 424E | 3030 | 0788 | 0000 | | | | |
| 0000012370 | | | | | | | | |

THU MAR 14 17:20:06 1991 BIP.EXE PAGE 1, LINE 1

| | | | | | | | | |
|---|---|---|---|---|---|---|---|---|
| 0000000000 | 5A4D | 00C2 | 001B | 0000 | 0004 | 0000 | FFFF | 0000 |
| 0000000020 | 00B6 | 0000 | 0000 | 0000 | 0040 | 0000 | 0000 | 0000 |
| 0000000040 | 0000 | 0000 | 0000 | 0000 | 0000 | 0000 | 0000 | 0000 |
| 0000000060 | 0000 | 0000 | 0000 | 0000 | 0000 | 0000 | 0080 | 0000 |
| 0000000100 | 1F0E | 0EBA | B400 | CD09 | B821 | 4C01 | 21CD | 6854 |
| 0000000120 | 7369 | 7020 | 6F72 | 7267 | 6D61 | 6320 | 6E61 | 6F6E |
| 0000000140 | 2074 | 7572 | 206E | 6E69 | 4420 | 534F | 6D20 | 646F |
| 0000000160 | 2E65 | 0D0D | 240A | 0000 | 0000 | 0000 | 0000 | 0000 |
| 0000000200 | 454E | 0A05 | 0131 | 000A | 05FD | DA1C | 030A | 0005 |
| 0000000220 | 0400 | 2000 | 0010 | 0001 | 0000 | 0005 | 0008 | 0006 |
| 0000000240 | 001B | 0040 | 0080 | 008C | 00B1 | 00BD | 01BB | 0000 |
| 0000000260 | 0000 | 0004 | 0003 | 0001 | 0000 | 0000 | 0000 | 0000 |
| 0000000300 | 001E | 260C | 0D00 | 260C | 02A1 | 00C6 | 0C01 | 0100 |
| 0000000320 | 0000 | 0000 | 0C01 | 0850 | 0000 | 0000 | 0C01 | 022E |
| 0000000340 | 02AE | 09E8 | 0D01 | 0E70 | 034F | 0120 | 1CB1 | 0120 |
| 0000000360 | 0361 | 004E | 1CB1 | 004E | 0366 | 0010 | 0CB1 | 0010 |
| 0000000400 | 0001 | 0008 | 0003 | 0008 | 0008 | 0008 | 4203 | 5049 |
| 0000000420 | 0000 | 420A | 5F58 | 4957 | 504E | 4F52 | 0143 | 0E00 |
| 0000000440 | 5246 | 4D41 | 5F45 | 4E57 | 5F44 | 5250 | 434F | 0002 |
| 0000000460 | 0100 | 0A00 | 1300 | 1C00 | 2200 | 6D00 | 0000 | 4408 |
| 0000000500 | 534F | 4143 | 4C4C | 0853 | 4956 | 434F | 4C41 | 534C |
| 0000000520 | 4E08 | 4D41 | 4950 | 4550 | 0553 | 4D50 | 4957 | 054E |
| 0000000540 | 4D50 | 5047 | 0C49 | 4956 | 414F | 5353 | 434F | 4149 |
| 0000000560 | 4554 | 560B | 4F49 | 5243 | 4145 | 4554 | 535D | 560C |
| 0000000600 | 4F49 | 4544 | 5453 | 4F52 | 5059 | 1453 | 4956 | 474F |
| 0000000620 | 5445 | 4544 | 4956 | 4543 | 4543 | 4C4C | 4953 | 455A |
| 0000000640 | 5609 | 4F49 | 4553 | 4F54 | 4752 | 5006 | 564D | 4F49 |
| 0000000660 | 0250 | 0101 | 18F4 | 7301 | 0022 | 1700 | 6544 | 6F6D |
| 0000000700 | 6620 | 726F | 5020 | 204D | 6942 | 2070 | 6556 | 7273 |
| 0000000720 | 6F69 | 006E | 0000 | 0000 | 0000 | 0000 | 0000 | 0000 |
| 0000000740 | 0000 | 0000 | 0000 | 0000 | 0000 | 0000 | 0000 | 0000 |
| 0000000760 | A3FC | 0044 | 1E89 | 0042 | 8949 | 4E0E | BB00 | 0050 |
| 0000001000 | 1F8C | E483 | 89FE | 0467 | FEB8 | 50FF | 6789 | F70A |
| 0000001020 | 50D0 | 6789 | 8906 | 0867 | 2689 | 0046 | 681E | 0048 |
| 0000001040 | 681E | 004C | FF9A | 00FF | 8E00 | 4806 | 2600 | 15A1 |
| 0000001060 | A300 | 0086 | 46E8 | 9A00 | 02E0 | FFFF | 689A | 5A04 |
| 0000001100 | 9A00 | 00EA | 005F | 36FF | 0294 | 36FF | 0292 | 36FF |
| 0000001120 | 0290 | 36FF | 028E | 36FF | 028C | 7A9A | 6417 | 5000 |
| 0000001140 | E80E | 00FE | FFB8 | 8EFF | B8D8 | 0003 | 0E50 | 03E8 |
| 0000001160 | 0E02 | A7E8 | B804 | 00FF | 0E50 | ECE8 | BB00 | 000D |
| 0000001200 | FF33 | 068E | 0044 | FFB9 | 267F | 3D80 | 7500 | 4701 |
| 0000001220 | 8026 | 003D | 3174 | 64BE | 8B00 | 8BD1 | F3CB | 8BA6 |
| 0000001240 | 74CA | 3308 | F2C0 | 74AE | EBE7 | 061C | 071E | F78B |
| 0000001260 | BF1F | 008C | 2CAC | 7241 | C00E | 04E0 | AC92 | 412C |
| 0000001300 | 0572 | C20A | EBAA | 16ED | C31F | 286A | FF9A | 00FF |
| 0000001320 | BB00 | 0002 | 8B52 | 80D4 | 8CA7 | B700 | 8B50 | 53C4 |
| 0000001340 | 5016 | 5216 | FF9A | 00FF | 0B00 | 58C0 | 1075 | 40B1 |
| 0000001360 | 013C | 0674 | 023C | 0675 | 08B1 | 8F08 | 008C | 794B |
| 0000001400 | 5AD6 | C033 | 5050 | DC8B | BA50 | 0084 | 520E | 5316 |
| 0000001420 | FF9A | 00FF | 5800 | E858 | 0013 | 72BE | BF08 | 0872 |
| 0000001440 | 3DE8 | BE01 | 0872 | 72BF | E808 | 0134 | 8BCB | 680E |
| 0000001460 | E308 | 8B2E | 4436 | C400 | 6A06 | 8C08 | 33C2 | FFDB |
| 0000001500 | 661E | 7308 | E903 | 014E | 068E | 004C | 8B26 | 061E |
| 0000001520 | 4B00 | 0D75 | 06C4 | 086E | C28C | 03BB | FF00 | 661E |
| 0000001540 | C308 | 8B55 | 33EC | EBC9 | 551A | EC8B | 01B9 | EB00 |
| 0000001560 | 5512 | EC8B | 5756 | 00B9 | EB01 | 5508 | EC8B | 5756 |
| 0000001600 | 01B9 | E801 | 005F | 0A51 | 75C9 | BE12 | 0E68 | 68BF |
| 0000001620 | E80E | 00CC | 72BE | BF08 | 0876 | C3E8 | BE00 | 0876 |
| 0000001640 | 76BF | E808 | 00BA | 76BE | BF08 | 0876 | B1E8 | 9A00 |

THU MAR 14 17:20:06 1991 BIP.EXE PAGE 2, LINE 60

| | | | | | | | | |
|---|---|---|---|---|---|---|---|---|
| 0000001660 | 02BC | 007D | C00B | 1174 | 0A58 | 50E4 | 0B75 | 7E83 |
| 0000001700 | 0006 | 0575 | 46C7 | FF06 | E800 | 0086 | 0A58 | 75E4 |
| 0000001720 | B80D | 0001 | 8A50 | 0646 | 9A50 | FFFF | 0000 | 4EE8 |
| 0000001740 | 5F00 | 5D5E | 55CB | EC8B | 0D6A | 8BE8 | 8306 | 02C4 |
| 0000001760 | 068E | 004C | 8B26 | 061E | 4B00 | 168B | 029C | FA83 |
| 0000002000 | 75FF | 8904 | 9C1E | 3902 | 9C1E | 9F02 | 0D6A | 8DE8 |
| 0000002020 | 8306 | 02C4 | 749E | 6A0A | E80E | 063C | C483 | EB02 |
| 0000002040 | 3BC7 | 74D3 | 6A08 | E80E | 064E | C483 | 5D02 | 55C3 |
| 0000002060 | EC8B | 0D6A | 41E8 | 8306 | 02C4 | 06C7 | 029C | FFFF |
| 0000002100 | 0D6A | 59E8 | 8306 | 02C4 | 0E6A | 51E8 | 8306 | 02C4 |
| 0000002120 | C35D | 0E8B | 0868 | 07E3 | 02BB | FF00 | 661E | C308 |
| 0000002140 | F73B | 0E73 | EF83 | 8B04 | 0B05 | 0245 | F274 | 1DFF |
| 0000002160 | EEEB | 00C3 | 8B55 | B8EC | 00FC | 0E50 | 9DE8 | 8302 |
| 0000002200 | A03E | 0002 | 0474 | 1EFF | 029E | FFB8 | 5000 | E80E |
| 0000002220 | 028A | E58B | CB5D | 02B8 | E900 | FDD0 | 3356 | B9F6 |
| 0000002240 | 0042 | E432 | ACFC | E032 | FBE2 | F480 | 7455 | 0E0F |
| 0000002260 | C1E8 | B8FF | 0001 | 0E50 | 61E8 | B802 | 0001 | CB5E |
| 0000002300 | 068F | 02A4 | 068F | 02A6 | 42A1 | 8E00 | 441E | 8B00 |
| 0000002320 | 4EF0 | 0674 | 7C80 | 00FF | F775 | 8936 | 9636 | 3602 |
| 0000002340 | 1E8C | 0298 | F696 | FF04 | 0175 | 3696 | 3689 | 02A2 |
| 0000002360 | D233 | 01BF | AC00 | 0A42 | 75C0 | ACFA | 203C | FB74 |
| 0000002400 | 093C | F774 | C00A | 6374 | 4E47 | 3CAC | 7420 | 3CEC |
| 0000002420 | 7409 | 0AE8 | 74C0 | 3C54 | 7422 | 3C24 | 745C | 4203 |
| 0000002440 | E8EB | C933 | AC41 | 5C3C | FA74 | 223C | 0474 | D103 |
| 0000002460 | D7EB | C18B | E9D1 | D113 | 01A8 | CE75 | 01EB | AC4E |
| 0000002500 | C00A | 2774 | 223C | C274 | 5C3C | 0374 | EB42 | 33F0 |
| 0000002520 | 41C9 | 3CAC | 745C | 3CFA | 7422 | 0304 | EBD1 | 8BDF |
| 0000002540 | D1C1 | 13E9 | A8D1 | 7501 | EBD6 | 169F | 891F | 8C3E |
| 0000002560 | 0302 | 47D7 | E7D1 | E7D1 | C78B | C203 | 2440 | E8FE |
| 0000002600 | 01D0 | 0673 | 08B8 | E90D | FCE2 | 8EA3 | 8902 | 9016 |
| 0000002620 | 8B02 | 03D8 | 8EF8 | 26C2 | 3F89 | 8C26 | 0247 | C383 |
| 0000002640 | 8B04 | A236 | 8E02 | 441E | AC00 | 0AAA | 75C0 | EBFA |
| 0000002660 | 3303 | AAC0 | 3CAC | 7420 | 3CFB | 7409 | 0AF7 | 74C0 |
| 0000002700 | 2675 | 3F89 | 8C26 | 0247 | C383 | 4E04 | 3CAC | 7420 |
| 0000002720 | 3CE0 | 7409 | 0ADC | 74C0 | 3C5A | 7422 | 3C27 | 745C |
| 0000002740 | AA03 | E8EB | C933 | AC41 | 5C3C | FA74 | 223C | 0674 |
| 0000002760 | 5CB0 | AAF3 | D5EB | 5CB0 | E9D1 | AAF3 | 0673 | 22B0 |
| 0000003000 | EBAA | 4EC9 | 0AAC | 74C0 | 3C2A | 7422 | 3CBF | 745C |
| 0000003020 | AA03 | F0EB | C933 | AC41 | 5C3C | FA74 | 223C | 0674 |
| 0000003040 | 5CB0 | AAF3 | DDEB | 5CB0 | E9D1 | AAF3 | 9E73 | 22B0 |
| 0000003060 | EBAA | 33D1 | AAC0 | C726 | 0007 | 2600 | 47C7 | 0002 |
| 0000003100 | 1600 | FF1F | A42E | 0002 | 8B55 | 83EC | 08EC | 8E1E |
| 0000003120 | 4406 | 8C00 | FC46 | 5E8C | 33FE | 33C0 | 33F6 | B9FF |
| 0000003140 | FFFF | 3A26 | 7405 | F206 | 46AE | 75AE | 8BFA | 40C7 |
| 0000003160 | FE24 | 8B46 | D1FE | D1E6 | E8E6 | 00D6 | 1772 | 5689 |
| 0000003200 | 50F8 | C68B | CBE8 | 7200 | A30C | 0292 | 1689 | 0294 |
| 0000003220 | 5689 | EBFA | B806 | 0009 | D1E9 | 8BFB | 8BCF | 33D8 |
| 0000003240 | 5FF6 | 1E06 | 1F07 | E349 | 8B35 | 8E04 | FE46 | 3B26 |
| 0000003260 | 6406 | 7500 | 510E | 5756 | 64BF | B900 | 0006 | A7F3 |
| 0000003300 | 5E5F | 8E59 | F846 | 0B74 | 5E8E | 89FA | 8C3F | 0247 |
| 0000003320 | C383 | 8E04 | FC5E | AAAC | C00A | FA75 | CBE2 | 5E8E |
| 0000003340 | 89FA | 890F | 024F | 8B1F | 5DE5 | 00CB | 8B55 | 56EC |
| 0000003360 | B857 | 0085 | D88E | C08E | 568B | BE06 | 0886 | 3BAD |
| 0000003400 | 74C2 | 4010 | 7496 | 970C | C033 | FFB9 | F2FF | 8BAE |
| 0000003420 | EBF7 | 96EB | 5E5F | E58B | CA5D | 0002 | 8B55 | 57EC |
| 0000003440 | 76FF | 0E06 | C5E8 | 0BFF | 74C0 | 921F | FA8B | C033 |
| 0000003460 | FFB9 | F2FF | F7AE | 49D1 | 8B50 | BBC4 | 0002 | 1E53 |
| 0000003500 | 5152 | 5016 | FF9A | 00FF | 5B00 | 8B5F | 5DE5 | 02CA |
| 0000003520 | 0000 | 8B55 | 06EC | 00B9 | 8704 | B60E | 5102 | 9A50 |

THU MAR 14 17:20:06 1991 BIP.EXE PAGE 3, LINE 119

| | | | | | | | | |
|---|---|---|---|---|---|---|---|---|
| 0000003540 | 0594 | 01D2 | 8F5B | B606 | 8B02 | 0BCA | 75C8 | F901 |
| 0000003560 | 5D07 | 00C3 | B1EA | 8205 | EA05 | 05D0 | 0597 | 8B55 |
| 0000003600 | 56EC | 76C4 | 8C06 | E3C1 | 2605 | 4C80 | 01FE | 5D5E |
| 0000003620 | 55CB | EC8B | 096A | DFE8 | 8302 | 02C4 | 76FF | 0E06 |
| 0000003640 | 0DE8 | 5B00 | 096A | F5E8 | 8302 | 02C4 | E58B | CB5D |
| 0000003660 | 8B55 | 56EC | 8B57 | 064E | F983 | 77E8 | 1E69 | AAA1 |
| 0000003700 | 0B02 | 74C0 | BF48 | 06B8 | 368B | 02B2 | 1EC5 | 02AC |
| 0000003720 | 561E | FF57 | 5FD7 | 735E | 8C2B | C5DA | 0C5F | D63B |
| 0000003740 | EF75 | 1F58 | C41E | AC36 | 2602 | 748B | C512 | A81E |
| 0000003760 | 8C02 | 3BDA | 75D0 | 1FD9 | 811E | 34FF | 7407 | BF0E |
| 0000004000 | 0734 | C4EB | 815E | B8FF | 7406 | EB0F | 070A | BF06 |
| 0000004020 | 02A8 | E1E8 | 7201 | E80E | 007E | 891F | AE16 | 8902 |
| 0000004040 | AC1E | EB02 | 1F04 | C033 | 5F99 | 5D5E | 00CB | 5706 |
| 0000004060 | F88B | FB03 | 7F89 | 4F04 | 2D4F | 0016 | 778D | C714 |
| 0000004100 | FE05 | 89FF | 0A7F | 8948 | 8C04 | 8B1F | 8CC6 | 8EDA |
| 0000004120 | 8DC2 | 067F | ABFC | 47AB | 3347 | ABC0 | ABAB | 5FAB |
| 0000004140 | C307 | 8B26 | 0245 | C00B | 0975 | 8C26 | 025D | 8926 |
| 0000004160 | EB1D | 0614 | C426 | 0875 | 8C26 | 0E5C | 8926 | 0C5C |
| 0000004200 | 478C | 8912 | 1077 | 2607 | 5D8C | 260A | 5D89 | 2608 |
| 0000004220 | 5D8C | 2606 | 5D89 | C304 | 8041 | FEE1 | FC53 | 778B |
| 0000004240 | 8B08 | 0A5F | FF33 | 23EB | C38B | A85B | 7501 | 534[illegible] |
| 0000004260 | 778B | 8B06 | 085F | DE3B | 3674 | 334B | EBFF | 900C |
| 0000004300 | 548D | 3BFE | 73D3 | 03E1 | 72F0 | AD23 | 01A8 | F074 |
| 0000004320 | FE8B | 3B48 | 73C1 | 0323 | 72F0 | 8B13 | ADD0 | 01A8 |
| 0000004340 | DE74 | C203 | 0205 | 8B00 | 89F7 | FE44 | E4EB | C08B |
| 0000004360 | 8B5B | 0647 | 4789 | F908 | 19EB | 895B | FE4C | 0974 |
| 0000004400 | F903 | C12B | 8948 | 2B05 | 03F9 | 89F9 | 087F | C68B |
| 0000004420 | DA8C | C3F8 | 5751 | 47F6 | 0102 | 6674 | B7E8 | 8B00 |
| 0000004440 | 8BFE | A804 | 7401 | 2B03 | 49C8 | 4141 | 778B | 0B04 |
| 0000004460 | 74F6 | 034F | 73CE | 3309 | BACD | FFF0 | 33E3 | 42EB |
| 0000004500 | 12B8 | 8E05 | 26C0 | B6A1 | 3D02 | 2000 | 1674 | 00BA |
| 0000004520 | 3B80 | 72D0 | D106 | 75EA | EBF8 | 8322 | 08FA | 1D72 |
| 0000004540 | E2D1 | C28B | 8B48 | 03D0 | 73C1 | 3302 | F7C0 | 23D2 |
| 0000004560 | 52C2 | 2EE8 | 5A00 | 0D73 | FA83 | 74F0 | B805 | 0010 |
| 0000004600 | E2EB | EBF9 | 8B1B | 2BD0 | 0457 | 4789 | 8904 | 087F |
| 0000004620 | 778B | 4A0A | 1489 | 0342 | C7F2 | FE04 | 89FF | 0A77 |
| 0000004640 | 595F | 8BC3 | F6D0 | 0247 | 7404 | 4A0F | 778B | 4E04 |
| 0000004660 | D63B | 0572 | 5739 | 73FE | 4218 | 1E50 | FF9A | 00FF |
| 0000004700 | 0B00 | 75C0 | 8B0F | F6C2 | 0247 | 7404 | 4A04 | 5789 |
| 0000004720 | F8FE | 01EB | C3F9 | 8B57 | 0877 | 773B | 750A | 8B03 |
| 0000004740 | 0677 | 3DAD | FFFE | 0874 | FE8B | FE24 | F003 | F2EB |
| 0000004760 | 4F4F | F78B | C35F | D18B | C283 | 8027 | F0E2 | 8B50 |
| 0000005000 | 52C4 | 5016 | C033 | 9A50 | FFFF | 0000 | 0B1F | 75C0 |
| 0000005020 | 3314 | 26DB | 458B | 890C | 0247 | C28B | 0FE8 | E8FE |
| 0000005040 | FE40 | EBF8 | F901 | 00C3 | 8B55 | 50EC | 468B | 0504 |
| 0000005060 | 0014 | 4BEB | 8B55 | 50EC | 468B | 0504 | 0014 | 65EB |
| 0000005100 | 8B55 | 50EC | 468B | 0504 | 0114 | 33EB | 8B55 | 50EC |
| 0000005120 | 468B | 0504 | 0114 | 4DEB | 8B55 | 50EC | 468B | C104 |
| 0000005140 | 02E0 | FF68 | 50FF | FF6A | FF6A | FF9A | 00FF | 0B00 |
| 0000005160 | 75C0 | 5825 | E58B | C35D | 8B55 | 50EC | 468B | C104 |
| 0000005200 | 02E0 | 8368 | 5008 | FF6A | FF6A | FF9A | 00FF | 0B00 |
| 0000005220 | 75C0 | 5805 | E58B | C35D | 11B8 | E900 | F7CE | 8B55 |
| 0000005240 | 50EC | 468B | C104 | 02E0 | A368 | 5008 | FF9A | 00FF |
| 0000005260 | 0B00 | 75C0 | 58E3 | E58B | C35D | 8B55 | FFEC | 0676 |
| 0000005300 | B5E8 | 83FF | 02C4 | E58B | CB5D | 8B55 | FFEC | 0676 |
| 0000005320 | CBE8 | 83FF | 02C4 | E58B | CB5D | 08C8 | 0000 | 5657 |
| 0000005340 | 768B | 8B06 | 2DC6 | 0410 | 0CB9 | 9900 | F9F7 | 4689 |
| 0000005360 | 50FA | 33E8 | 83FF | 02C4 | 561E | E9E8 | 8303 | 04C4 |
| 0000005400 | F88B | 468D | 160E | FF50 | 0C76 | 76FF | 1E0A | 9A56 |

THU MAR 14 17:20:06 1991 BIP.EXE PAGE 4, LINE 178

| | | | | | | | | |
|---|---|---|---|---|---|---|---|---|
| 0000005420 | 0DD6 | 25F6 | C483 | 890C | F846 | 561E | E857 | 043E |
| 0000005440 | C483 | FF06 | FA76 | 0BE8 | 83FF | 02C4 | 468B | 5EF8 |
| 0000005460 | C95F | 90CB | 8B55 | 8BEC | 8BD7 | 1EDE | 76C5 | 8B0A |
| 0000005500 | 8CFE | 8ED8 | 33C0 | B9C0 | FFFF | AEF2 | D1F7 | 7EC4 |
| 0000005520 | 8B06 | A8C7 | 7401 | A402 | D149 | F3E9 | 13A5 | F3C9 |
| 0000005540 | 8BA4 | 8BF3 | 1FFA | C28C | CB5D | 8B55 | 8BEC | C4D7 |
| 0000005560 | 067E | C033 | FFB9 | F2FF | F7AE | 49D1 | 8B91 | 5DFA |
| 0000005600 | 00CB | 8B55 | 57EC | 1E56 | 4E8B | E30E | 8B27 | C4D9 |
| 0000005620 | 067E | F78B | C033 | AEF2 | D9F7 | CB03 | FE8B | 76C5 |
| 0000005640 | F30A | 8AA6 | FF44 | C933 | 3A26 | FF45 | 0477 | 0474 |
| 0000005660 | 4949 | D1F7 | C18B | 5E1F | 8B5F | 5DE5 | 00CB | 8B55 |
| 0000005700 | 1EEC | 8B07 | 0E4E | C90B | 3174 | C1F6 | 7501 | 8B2C |
| 0000005720 | 0C56 | 468B | 8B0A | 0BD8 | 75DA | 5112 | 949A | 3205 |
| 0000005740 | 5909 | D88B | DA0B | 1374 | D88B | EB43 | 0B0A | 74D2 |
| 0000005760 | A80A | 7501 | 8B06 | 03D8 | 73C1 | BA08 | 0016 | C033 |
| 0000006000 | 89E9 | 6A01 | 8BFF | 52CC | 5653 | 0E57 | 6368 | 160A |
| 0000006020 | 5251 | 8B50 | 084E | 568B | 8B06 | 1276 | 7E8B | 9A10 |
| 0000006040 | FFFF | 0000 | 5E5F | C00B | 1374 | F65B | 01C3 | 0A74 |
| 0000006060 | 534B | C09A | FF12 | 8309 | 04C4 | 68E9 | 8301 | 04C4 |
| 0000006100 | 5D58 | 56CB | 0E57 | BF68 | 510A | E852 | 085C | 8E93 |
| 0000006120 | 26C2 | 578B | 0B22 | 74D2 | 5015 | 0653 | 2652 | 77FF |
| 0000006140 | 9A20 | 12C0 | 0A55 | C483 | 0704 | 585B | D233 | 8926 |
| 0000006160 | 2617 | 5789 | 2602 | 5789 | 2608 | 5789 | 260A | 5789 |
| 0000006200 | 2620 | 5789 | A822 | 7401 | 4809 | 8C26 | 2257 | 8926 |
| 0000006220 | 2047 | 0005 | 2602 | 4789 | 3304 | E8ED | F68F | 55CB |
| 0000006240 | EC8B | ADE8 | E8F7 | 0802 | D88B | C28E | C033 | 8926 |
| 0000006260 | 2607 | 4789 | 2602 | 4789 | 2608 | 4789 | 260A | 47C7 |
| 0000006300 | 0004 | 6A02 | 6A00 | 9A00 | 01FA | 0000 | 04C8 | 0000 |
| 0000006320 | 5657 | 126A | A1E8 | 83FD | 02C4 | 06C6 | 0E66 | 8B42 |
| 0000006340 | 0646 | 568B | A308 | 0E62 | 1689 | 0E64 | 5CBE | 890E |
| 0000006360 | 8904 | 0254 | 06C7 | 0E60 | 7FFF | 468D | 160E | FF50 |
| 0000006400 | 0C76 | 76FF | 1E0A | 9A56 | 0DD6 | 0B4D | C483 | 8B0C |
| 0000006420 | FFF8 | 600E | 780E | C40F | 5C1E | FF0E | 5C06 | 260E |
| 0000006440 | 07C6 | EB00 | 900D | 561E | 006A | 209A | 840C | 830A |
| 0000006460 | 06C4 | 126A | 67E8 | 83FD | 02C4 | C78B | 5F5E | CBC9 |
| 0000006500 | 1601 | 0202 | 0203 | 1804 | 0D05 | 0906 | 0C07 | 0C08 |
| 0000006520 | 0C09 | 070A | 080B | 160C | 160D | 020F | 0D10 | 1211 |
| 0000006540 | 0212 | 0235 | 0D41 | 0243 | 0D52 | 0D53 | 0D57 | 0B59 |
| 0000006560 | 0D6C | 206D | 1C70 | 0972 | 1606 | 0A80 | 0A81 | 0982 |
| 0000006600 | 0D84 | 0BA4 | 02CE | 0BD7 | 0D00 | 1608 | 8B52 | E8D8 |
| 0000006620 | 0718 | 8E93 | 5AC2 | 8926 | 0247 | 8926 | B817 | FFFF |
| 0000006640 | 8B99 | 5DE5 | E8CB | 0008 | FFB8 | 99FF | E58B | CB5D |
| 0000006660 | D88B | F5E8 | 9306 | C28E | 8926 | 0247 | BB53 | 0B6D |
| 0000006700 | 24B9 | 0A00 | 75E4 | 2E1B | 073A | 1674 | 4343 | F7E2 |
| 0000006720 | 133C | 0472 | 243C | 0A76 | 3C43 | 72BC | 3C04 | 76CA |
| 0000006740 | 4301 | 8A2E | 0147 | 5B98 | 8926 | C307 | 8B55 | BBEC |
| 0000006760 | 0002 | 05EB | 8B55 | 33EC | E8DB | D6AE | C303 | CB5D |
| 0000007000 | 8B55 | 56EC | 5357 | 0876 | 448A | A80A | 7482 | A864 |
| 0000007020 | 7540 | C760 | 0444 | 0000 | 01A8 | 0B74 | 10A8 | 5374 |
| 0000007040 | 4C8B | 8906 | 240C | 0CFE | 2402 | 88EF | 0A44 | FE8B |
| 0000007060 | EF81 | 0410 | C781 | 05F0 | DB33 | 5C8A | A80B | 7508 |
| 0000007100 | A84B | 7504 | F618 | 0105 | 4275 | FE81 | 041C | 0674 |
| 0000007120 | FE81 | 0428 | 2675 | 87F6 | 008C | 7440 | B91F | 0001 |
| 0000007140 | 1651 | 7E8D | 5706 | 0E53 | E7E8 | 8308 | 08C4 | 01B9 |
| 0000007160 | EB00 | B846 | FFFF | 4C80 | 200A | 65EB | 1E53 | E856 |
| 0000007200 | 06D4 | C483 | 5B04 | 44F6 | 080A | D174 | 0C8B | 548B |
| 0000007220 | 2B06 | 42CA | 1489 | 558B | 4A02 | 5489 | E304 | 5125 |
| 0000007240 | FF51 | 0874 | 74FF | 5306 | E80E | 08A6 | C483 | 5908 |
| 0000007260 | 7CC4 | 8B06 | 0656 | 8826 | 3B15 | 75C1 | 33B6 | 8AC0 |

THU MAR 14 17:20:06 1991 BIP.EXE PAGE 5, LINE 237

| | | | | | | | | |
|---|---|---|---|---|---|---|---|---|
| 0000007300 | 0646 | 1DEB | C033 | 87F6 | 008C | 7420 | B9E3 | 0002 |
| 0000007320 | 5051 | 5350 | E80E | 0802 | C483 | 3308 | 8BC0 | EBC8 |
| 0000007340 | 5FCF | 5D5E | 00CB | 8B55 | 56EC | 8B57 | 0476 | D4BB |
| 0000007360 | 8107 | 1CFE | 7404 | BB09 | 07D8 | FE81 | 0428 | 5875 |
| 0000007400 | FE8B | EF81 | 0410 | C781 | 05F0 | 44F6 | 0C0A | 4875 |
| 0000007420 | 05F6 | 7501 | 8B43 | 8B07 | 0257 | C88B | CA0B | 2174 |
| 0000007440 | 4489 | 8906 | 0854 | 0489 | 5489 | C702 | 0444 | 0200 |
| 0000007460 | 45C7 | 0002 | 8002 | 0A4C | C602 | 1105 | 01B8 | EB00 |
| 0000007500 | 5319 | 00B8 | 5002 | 949A | 2A05 | 5B0B | 0B5B | 74D2 |
| 0000007520 | 8907 | 8907 | 0257 | C8EB | C033 | 5E5F | C35D | 8B55 |
| 0000007540 | 56EC | 8B57 | 0676 | FE8B | EF81 | 0410 | C781 | 05F0 |
| 0000007560 | 05F6 | 7410 | 332D | 8ADB | 0B5C | 87F6 | 008C | 7440 |
| 0000007600 | 1E21 | 0E56 | 61E8 | 8306 | 04C4 | 7E83 | 0004 | 1274 |
| 0000007620 | C033 | 0588 | 4589 | 8902 | 8904 | 0244 | 4489 | 8906 |
| 0000007640 | 0844 | 5E5F | C35D | 0E2E | 0E39 | 0E4F | 0E83 | 0EAF |
| 0000007660 | 0EB7 | 0EE0 | 0F12 | 8B55 | B8EC | 0171 | E80E | 0564 |
| 0000007700 | 5756 | C033 | 4689 | 88F8 | FB46 | 76C4 | 260A | 89AC |
| 0000007720 | 0A76 | 4688 | 0AFE | 74C0 | 8306 | F87E | 7D00 | 8B06 |
| 0000007740 | F846 | B5E9 | BB04 | 07DC | 202C | 583C | 0577 | 24D7 |
| 0000007760 | EB0F | B002 | B100 | D203 | 02E0 | FB46 | FED7 | D2C1 |
| 0000010000 | 88E8 | FB46 | 8B98 | D1D8 | 2EE3 | A7FF | 0DC6 | 568A |
| 0000010020 | B9FE | 0001 | 36E8 | EB04 | 33B1 | 89C0 | F046 | 4689 |
| 0000010040 | 89F6 | EE46 | 46C7 | 20FC | 4800 | 4689 | EBF4 | 8A9B |
| 0000010060 | FE46 | 2D3C | 0675 | 4E80 | 04FC | 8EEB | 2B3C | 0675 |
| 0000010100 | 4E80 | 01FC | 84EB | 203C | 0775 | 4E80 | 02FC | 79E9 |
| 0000010120 | 3CFF | 7523 | 8007 | FC4E | E980 | FF6E | 4E80 | 08FC |
| 0000010140 | 67E9 | 8AFF | FE4E | F980 | 752A | E80F | 035C | C00B |
| 0000010160 | 1779 | D8F7 | 4E80 | 04FC | 0FEB | E980 | 3230 | 8BED |
| 0000010200 | F646 | 0ABB | F700 | 03E3 | 89C1 | F646 | 3BE9 | C7FF |
| 0000010220 | F446 | 0000 | 33E9 | 8AFF | FE4E | F980 | 752A | E80C |
| 0000010240 | 0328 | C00B | 1479 | FFB8 | EBFF | 800F | 30E9 | ED32 |
| 0000010260 | 468B | BBF4 | 000A | E3F7 | C103 | 4689 | E9F4 | FF0A |
| 0000010300 | 468A | 3CFE | 756C | 8006 | FC4E | EB10 | 3C22 | 7546 |
| 0000010320 | 8006 | FC4E | EB20 | 3C18 | 754E | 8006 | FD4E | EB10 |
| 0000010340 | 3C0E | 754C | 8006 | FD4E | EB04 | 8004 | FD4E | E908 |
| 0000010360 | FED8 | 468A | 3CFE | 7564 | E903 | 0194 | 693C | 0375 |
| 0000010400 | 8DE9 | 3C01 | 7575 | E903 | 018A | 583C | 0375 | 89E9 |
| 0000010420 | 3C01 | 7578 | E903 | 0188 | 6F3C | 0375 | A2E9 | 3C01 |
| 0000010440 | 7463 | 3C1A | 7473 | 3C27 | 746E | 3C51 | 7470 | 3C60 |
| 0000010460 | 7445 | 3C07 | 7447 | E903 | 00BB | B5E9 | E800 | 028A |
| 0000010500 | BE8D | FE8F | 0716 | 4FAA | 01B9 | E900 | 01F1 | 90E8 |
| 0000010520 | 0B02 | 75FF | 8C12 | 0BC0 | 75C0 | 1E0C | BF07 | 0835 |
| 0000010540 | 0E8B | 083B | D8E9 | 5701 | 4E8B | E3F4 | 3207 | F2C0 |
| 0000010560 | 75AE | 4F01 | 2B59 | 87F9 | E9CF | 01C3 | 62E8 | 8B02 |
| 0000010600 | F846 | F6AB | FC46 | 7410 | 3303 | ABC0 | 3BE9 | F6FE |
| 0000010620 | FC46 | 7530 | E805 | 0232 | 39EB | 36E8 | F602 | FD46 |
| 0000010640 | 7518 | C630 | FF46 | B907 | 0010 | 0716 | 3352 | 8DD2 |
| 0000010660 | 97BE | BEFE | 0004 | B0E8 | B902 | 0010 | BE8D | FE92 |
| 0000010700 | 3358 | BED2 | 0004 | A0E8 | C602 | 9386 | 3AFE | 09B9 |
| 0000010720 | EB00 | C618 | FF46 | B907 | 0010 | 0716 | D233 | BE8D |
| 0000010740 | FE92 | 04BE | E800 | 0281 | 04B9 | 8D00 | 8FBE | E9FE |
| 0000010760 | 014D | 46FF | 80EE | FC4E | 8A40 | FE46 | 200C | 8B98 |
| 0000011000 | 83F0 | F47E | 7F00 | 7413 | C707 | F446 | 0006 | 0AEB |
| 0000011020 | 673D | 7500 | C705 | F446 | 0001 | BE8D | FE8F | 76FF |
| 0000011040 | FFEE | F476 | 1656 | FF57 | 1076 | 76FF | F60E | FD46 |
| 0000011060 | 7404 | FF0A | 5A1E | 8308 | 0E46 | EB0A | FF08 | 461E |
| 0000011100 | 8308 | 0E46 | 8308 | 0EC4 | 46F6 | 80FC | 0F74 | 7E83 |
| 0000011120 | 00F4 | 0975 | 5716 | 1EFF | 0852 | C483 | 8304 | 67FE |
| 0000011140 | 1075 | 46F7 | 80FC | 7500 | 1609 | FF57 | 4A1E | 8308 |

THU MAR 14 17:20:06 1991 BIP.EXE PAGE 6, LINE 296

| | | | | | | | | |
|---|---|---|---|---|---|---|---|---|
| 0000011160 | 04C4 | 0716 | 8026 | 2D3D | 0575 | 8047 | FD4E | B901 |
| 0000011200 | FFFF | B057 | F200 | 4FAE | 2B59 | 87F9 | E9CF | 00AF |
| 0000011220 | 4E80 | 40FC | 46C6 | 0AFA | 35EB | 46C6 | 07FF | 04EB |
| 0000011240 | 46C6 | 27FF | 46F6 | 80FC | 1174 | 46C7 | 02F0 | C600 |
| 0000011260 | F246 | B230 | 0251 | FF56 | 5688 | C6F3 | FA46 | EB10 |
| 0000011300 | F60E | FC46 | 7480 | 8004 | FD4E | C602 | FA46 | F608 |
| 0000011320 | FC46 | 7410 | E805 | 00FB | 0EEB | EDE8 | F600 | FC46 |
| 0000011340 | 7440 | 9903 | 02EB | D233 | 46F6 | 40FC | 0F74 | D20B |
| 0000011360 | 0B7D | 4E80 | 01FD | D8F7 | D283 | F700 | 83DA | F47E |
| 0000011400 | 7D00 | C707 | F446 | 0001 | 04EB | 6680 | F7FC | D88B |
| 0000011420 | DA0B | 0575 | 46C7 | 00F0 | 8D00 | EB7E | 0716 | 4E8A |
| 0000011440 | 32FA | 8BED | F476 | 40E8 | F601 | FD46 | 7402 | E30E |
| 0000011460 | 2606 | 3D80 | 7430 | 4F06 | C626 | 3005 | EB41 | F600 |
| 0000011500 | FC46 | 7440 | F631 | FD46 | 7401 | C60B | F246 | C72D |
| 0000011520 | F046 | 0001 | 20EB | 46F6 | 01FC | 0B74 | 46C6 | 2BF2 |
| 0000011540 | 46C7 | 01F0 | EB00 | F60F | FC46 | 7402 | C609 | F246 |
| 0000011560 | C720 | F046 | 0001 | 468B | 2BF6 | 2BC1 | F046 | 027D |
| 0000011600 | C033 | 5706 | F651 | FC46 | 750C | 8B07 | B2C8 | E820 |
| 0000011620 | 00BB | 1650 | 8D07 | F27E | 4E8B | E8F0 | 0091 | F658 |
| 0000011640 | FC46 | 7408 | F60D | FC46 | 7504 | 8B07 | B2C8 | E830 |
| 0000011660 | 009B | 5F59 | 5007 | 76E8 | 5800 | 46F6 | 04FC | 0774 |
| 0000011700 | C88B | 20B2 | 86E8 | E900 | FC00 | 76C4 | 260E | 89AD |
| 0000011720 | 0E76 | C4C3 | 0E76 | AD26 | D08B | AD26 | 8992 | 0E76 |
| 0000011740 | F6C3 | FC46 | 7420 | E808 | FFE9 | C28E | F88B | E8C3 |
| 0000011760 | FFD8 | F88B | C00B | 0375 | C08E | 1EC3 | C307 | 0698 |
| 0000012000 | C457 | 065E | FF26 | 044F | 1078 | 8B26 | 263F | 07FF |
| 0000012020 | 8E26 | 0247 | 33AA | 5FC0 | C307 | 5251 | 5306 | 0E50 |
| 0000012040 | DDE8 | 83F9 | 06C4 | 595A | FF3D | 75FF | EBE8 | E3E8 |
| 0000012060 | 8B1B | 01F7 | F84E | 3357 | 26FF | E8AC | FFC0 | F80B |
| 0000012100 | F7E2 | FF0B | 745F | C705 | F846 | FFFF | E3C3 | 0119 |
| 0000012120 | F84E | 3357 | 8AFF | E8C2 | FFA4 | F80B | F7E2 | FF0B |
| 0000012140 | 745F | C705 | F846 | FFFF | FDC3 | 9357 | F60B | 0A7F |
| 0000012160 | DB0B | 0675 | D20B | 0275 | 1AEB | 3392 | F7D2 | 93F1 |
| 0000012200 | F1F7 | 8792 | 04D3 | 3C30 | 7639 | 0203 | FF46 | 8BAA |
| 0000012220 | 4EC2 | D8EB | 2B59 | 47CF | C3FC | 5E5F | E58B | CB5D |
| 0000012240 | 9EEA | 6905 | EA0D | 059E | 12C3 | 068E | 004C | A126 |
| 0000012260 | 0006 | 3B48 | 3E06 | 7708 | C107 | 06E0 | FFBA | C3FF |
| 0000012300 | 5357 | 6A51 | E80F | F5B0 | C483 | 3B02 | 3E06 | 7608 |
| 0000012320 | 8B40 | 05D8 | 0004 | FC25 | 8BFF | C1C8 | 06E0 | DDBA |
| 0000012340 | 5012 | 9A52 | 07DD | 0000 | C00B | 3275 | 8B49 | 87F9 |
| 0000012360 | 3E3E | 2B08 | 51CF | C147 | 06E7 | E1C1 | 5705 | C28E |
| 0000012400 | ABF3 | 595F | C726 | 0445 | 0200 | C783 | E240 | 8BF5 |
| 0000012420 | 6AC3 | E80F | F588 | C483 | 5902 | 5F5B | 9BEB | 10B8 |
| 0000012440 | E900 | ED48 | 5A59 | DC8B | D82B | 1972 | FB81 | 0200 |
| 0000012460 | 1372 | E852 | FF74 | 8E93 | 5AC2 | 3B26 | 0447 | 0572 |
| 0000012500 | E08B | 5152 | 52CB | A151 | 0840 | 7540 | 3305 | E9C0 |
| 0000012520 | ED1A | 2EFF | 0840 | 8B55 | 56EC | 768B | B804 | 0200 |
| 0000012540 | 9A50 | 0594 | 12C8 | 8B59 | 81DE | 10EB | 8104 | F0C3 |
| 0000012560 | 0B05 | 74D2 | 800B | 0A4C | C708 | 0247 | 0200 | 0EEB |
| 0000012600 | 4C80 | 040A | 47C7 | 0102 | 8C00 | 8DDA | 0147 | 5489 |
| 0000012620 | 8902 | 8904 | 0854 | 4489 | C706 | 0444 | 0000 | 5D5E |
| 0000012640 | 00C3 | 04C8 | 0000 | 468B | 0B08 | 0646 | 0875 | 006A |
| 0000012660 | A7E8 | EB00 | 9031 | 468B | 2D06 | 0410 | 0CB9 | 9900 |
| 0000012700 | F9F7 | 4689 | 50FC | 5FE8 | 83F4 | 02C4 | 76FF | FF08 |
| 0000012720 | 0676 | 089A | 4C14 | 8314 | 04C4 | 4689 | FFFE | FC76 |
| 0000012740 | 51E8 | 8BF4 | FE46 | CBC9 | 02C8 | 0000 | 5657 | FF2B |
| 0000012760 | 768B | 8A06 | 0A44 | C88B | 0324 | 023C | 3F75 | C1F6 |
| 0000013000 | 7508 | 8B0D | 81DE | 10EB | F604 | F087 | 0105 | 2D74 |
| 0000013020 | 048B | 442B | 8906 | FE46 | C00B | 217E | FF50 | 0874 |

THU MAR 14 17:20:06 1991 BIP.EXE PAGE 7, LINE 355

| | | | | | | | | |
|---|---|---|---|---|---|---|---|---|
| 0000013040 | 74FF | 8A06 | 0B4C | ED2A | 9A51 | 1572 | 14C9 | C483 |
| 0000013060 | 3908 | FE46 | 0774 | 4C80 | 200A | FFBF | 8BFF | 0644 |
| 0000013100 | 548B | 8908 | 8904 | 0254 | 44C7 | 0004 | 8B00 | 5EC7 |
| 0000013120 | C95F | 90CB | 016A | 01E8 | CB00 | 04C8 | 0000 | 5657 |
| 0000013140 | 10BE | 2B04 | 89FF | FE7E | 026A | 0BE8 | 83F4 | 02C4 |
| 0000013160 | 11EB | 46C7 | FFFE | FFFF | FC76 | B7E8 | 83F3 | 02C4 |
| 0000013200 | C683 | 390C | D036 | 7207 | 8B2B | 2DC6 | 0410 | 0CB9 |
| 0000013220 | 9900 | F9F7 | 4689 | 50FC | 8DE8 | 83F3 | 02C4 | 44F6 |
| 0000013240 | 830A | D374 | 561E | 089A | 8414 | 8313 | 04C4 | 7440 |
| 0000013260 | 47C1 | C3EB | 026A | E5E8 | 83F3 | 02C4 | 7E83 | 0104 |
| 0000013300 | 0475 | C78B | 03EB | 468B | 5EFE | C95F | 02C2 | 9000 |
| 0000013320 | 8B55 | 83EC | 02EC | C033 | 09EB | 8B55 | 83EC | 02EC |
| 0000013340 | FFB8 | 89FF | FE46 | 5E8B | 3B06 | 8A1E | 7200 | BA19 |
| 0000013360 | 0009 | C033 | 95E9 | 8BF6 | FE4E | C90B | 0774 | E853 |
| 0000013400 | F34A | C483 | E902 | F69D | C00B | 0774 | E853 | F330 |
| 0000013420 | C483 | 8302 | 04EC | CC8B | FF53 | 0A76 | 76FF | FF08 |
| 0000013440 | 0C76 | 5116 | FF9A | 00FF | 5900 | 855A | 75C0 | 80C8 |
| 0000013460 | 8CA7 | FD00 | 468B | 0BFE | 74C0 | 5307 | 0DE8 | 83F3 |
| 0000013500 | 02C4 | 8B91 | 5DE5 | 00CB | 8B55 | 83EC | 0EEC | C033 |
| 0000013520 | 09EB | 8B55 | 83EC | 0EEC | FFB8 | 89FF | F246 | 5E8B |
| 0000013540 | 3B06 | 8A1E | 7200 | BA08 | 0009 | C033 | 1DE9 | 0BF6 |
| 0000013560 | 74C0 | 5307 | C9E8 | 83F2 | 02C4 | 87F6 | 008C | 7420 |
| 0000013600 | 5312 | C933 | 5151 | 4141 | 8D51 | F446 | 5016 | 459A |
| 0000013620 | 0015 | F600 | 8C87 | 8000 | 7D74 | 5E8C | 8EFA | 0A46 |
| 0000013640 | 56C5 | 3308 | 89C0 | FE46 | 4689 | FCFC | 5657 | FA8B |
| 0000013660 | F28B | 6689 | 8BF8 | 0C4E | 3FE3 | 0AB0 | AEF2 | 5275 |
| 0000013700 | 8E1E | FA5E | 5C9A | F517 | 3D13 | 00A8 | 4C76 | 831F |
| 0000013720 | 02EC | DC8B | 00BA | 3D02 | 0228 | 0373 | 80BA | 2B00 |
| 0000013740 | 8BE2 | 8BD4 | 16FA | 8B07 | 0C4E | 3CAC | 740A | 3B0D |
| 0000013760 | 74FB | AA1A | F4E2 | 38E8 | E900 | 00AF | 0DB0 | FB3B |
| 0000014000 | 0375 | 2CE8 | AA00 | 0AB0 | 46FF | EBFC | E8E2 | 0021 |
| 0000014020 | E1EB | 5F5E | 5E8E | E9FA | 00C8 | 468B | 0BF2 | 74C0 |
| 0000014040 | FF09 | 0676 | 25E8 | 83F2 | 02C4 | FCB8 | 0EFF | F3E8 |
| 0000014060 | 50FC | 5153 | 061E | 8B1F | 2BCF | E3CA | 5121 | 5E8B |
| 0000014100 | 5306 | 521E | 8D51 | F446 | 5016 | 659A | 0005 | 5900 |
| 0000014120 | C00B | 1175 | 5E8B | 01F4 | FE5E | D93B | 0772 | 591F |
| 0000014140 | 585B | FA8B | 1FC3 | C483 | 8308 | FE7E | 7500 | 0B3C |
| 0000014160 | 74C0 | 3D18 | 006D | 0D74 | 013D | BA00 | 0009 | 0875 |
| 0000014200 | 1CBA | EB00 | BA03 | 0020 | EBF9 | 8E26 | FA5E | 87F6 |
| 0000014220 | 008C | 7440 | 8E0E | 0A5E | 5E8B | 8008 | 1A3F | 0375 |
| 0000014240 | EBF8 | BA0E | 001C | C033 | EBF9 | 8B06 | FE46 | 462B |
| 0000014260 | 8BFC | F866 | 5F5E | 5E8E | 72FA | 8B14 | F25E | DB0B |
| 0000014300 | 0974 | 76FF | E806 | F184 | C483 | 8B02 | 5DE5 | 8BCB |
| 0000014320 | F25E | DB0B | 0974 | 76FF | E806 | F170 | C483 | E902 |
| 0000014340 | F4AA | 4E8B | 0B0C | 75C9 | 8B04 | EBC1 | 1ECE | 56C5 |
| 0000014360 | 5308 | 521E | 8D51 | F446 | 5016 | 6B9A | 0016 | 1E00 |
| 0000014400 | 1F07 | C00B | 1774 | 6D3D | 7400 | 3D0D | 0091 | 09BA |
| 0000014420 | 7500 | BABC | 001C | B7EB | 20BA | EB00 | 8BB2 | F446 |
| 0000014440 | C00B | 9775 | 87F6 | 008C | 7440 | 8B0A | 26DA | 3F80 |
| 0000014460 | 751A | EB02 | BA86 | 001C | C033 | 93EB | 5A59 | E852 |
| 0000014500 | FB68 | D88B | C28E | 265A | 478B | 3B04 | 73C4 | 2B07 |
| 0000014520 | F7C4 | 52D8 | CB51 | C033 | F9EB | 581E | 4590 | 8B55 |
| 0000014540 | 1EEC | D88E | EC81 | 0000 | 5657 | 06C7 | 09FA | 0096 |
| 0000014560 | 006A | FF9A | 00FF | 8E00 | 7606 | 2608 | 00A3 | 2600 |
| 0000014600 | 1689 | 0002 | FF26 | 0236 | 2600 | 36FF | 0000 | C868 |
| 0000014620 | 9A00 | FFFF | 0000 | 068E | 0878 | A326 | 0222 | 8926 |
| 0000014640 | 2416 | 8E02 | 7606 | 2608 | 36FF | 0002 | FF26 | 0036 |
| 0000014660 | 1E00 | 8068 | 6803 | 059C | FF68 | 6AFF | 6A00 | 6A00 |
| 0000014700 | 9A00 | FFFF | 0000 | 006A | 016A | 0068 | 6A80 | 1E00 |

THU MAR 14 17:20:06 1991 BIP.EXE PAGE 8, LINE 414

| | | | | | | | | |
|---|---|---|---|---|---|---|---|---|
| 0000014720 | 8E68 | 1E03 | 8068 | 6A03 | 6A00 | 6A00 | 6A00 | 6A00 |
| 0000014740 | 6A00 | 6808 | FFFF | 2A68 | 9A02 | FFFF | 0000 | 068E |
| 0000014760 | 087A | A326 | 0004 | 8926 | 0616 | 2600 | 36FF | 0006 |
| 0000015000 | FF26 | 0436 | 9A00 | 23BE | 183C | C483 | 8E04 | 7A06 |
| 0000015020 | 2608 | 36FF | 0006 | FF26 | 0436 | 6800 | 17D6 | FF68 |
| 0000015040 | 9AFF | FFFF | 0000 | 068E | 087C | A326 | 0226 | 8926 |
| 0000015060 | 2816 | 8E02 | 7606 | 2608 | 36FF | 0002 | FF26 | 0036 |
| 0000015100 | 6800 | 188B | 0868 | 6A02 | 6A00 | 6A00 | 6A00 | 9A00 |
| 0000015120 | FFFF | 0000 | 003D | 7500 | E903 | 001C | 068E | 0876 |
| 0000015140 | FF26 | 0236 | 2600 | 36FF | 0000 | 0468 | 6818 | 0208 |
| 0000015160 | FF9A | 00FF | E900 | FFBB | 36FF | 09FC | FF9A | 00FF |
| 0000015200 | FF00 | FC36 | 9A09 | FFFF | 0000 | 068E | 087A | FF26 |
| 0000015220 | 0636 | 2600 | 36FF | 0004 | FF9A | 00FF | 8E00 | 7806 |
| 0000015240 | 2608 | 36FF | 0224 | FF26 | 2236 | 9AD2 | FFFF | 0000 |
| 0000015260 | 068E | 0876 | FF26 | 0236 | 2600 | 36FF | 0000 | FF9A |
| 0000015300 | 00FF | B800 | 0000 | 00E9 | 5E00 | 835F | 02ED | E58B |
| 0000015320 | 5D1F | CB4D | 581E | 4590 | 8B55 | 1EEC | D88E | EC81 |
| 0000015340 | 0016 | 5657 | B81E | 0761 | D88E | 468B | E90E | 05EA |
| 0000015360 | 76FF | FF12 | 1076 | FF9A | 00FF | 8900 | F246 | 5689 |
| 0000015400 | B8F4 | 0000 | 00BA | 8900 | FA46 | 5689 | 89FC | F646 |
| 0000015420 | 5689 | 8EF8 | 7606 | 2608 | 36FF | 0002 | FF26 | 0036 |
| 0000015440 | FF00 | F476 | 76FF | 8DF2 | F646 | 5016 | 006A | 0868 |
| 0000015460 | 9A50 | FFFF | 0000 | 12A3 | 890E | 1416 | 1E0E | F068 |
| 0000015500 | FF09 | FA36 | 6A09 | 6A64 | 6A00 | 6A01 | 9A00 | FFFF |
| 0000015520 | 0000 | 76FF | FFF4 | F276 | 36FF | 09F0 | FF9A | 00FF |
| 0000015540 | 1E00 | 0468 | 1E0A | 0268 | FF0A | F036 | 9A09 | FFFF |
| 0000015560 | 0000 | 006A | 016A | 166A | A69A | 0019 | 6A00 | 6A00 |
| 0000015600 | 6A01 | 8B04 | 9AF0 | 19BD | 0000 | E0D1 | C603 | A399 |
| 0000015620 | 09E8 | 1689 | 09EA | 006A | 016A | 176A | CA9A | 0019 |
| 0000015640 | 6A00 | 6A00 | 6A01 | 8B23 | 9AF0 | 19DD | 0000 | 006A |
| 0000015660 | 016A | 1E6A | F88B | 7E89 | 89EE | F056 | F09A | 0019 |
| 0000015700 | 6A00 | 6A00 | 6A01 | 8B05 | 89F8 | EA7E | 5689 | 9AEC |
| 0000015720 | FFFF | 0000 | E0D1 | 4603 | 03EA | EE46 | C603 | A399 |
| 0000015740 | 09EC | 1689 | 09EE | 006A | 006A | FF6A | FF6A | FF6A |
| 0000015760 | 681E | 0392 | 36FF | 09F0 | FF9A | 00FF | FF00 | 1276 |
| 0000016000 | 76FF | 6A10 | 6A05 | 9A00 | 1A48 | 0000 | 5052 | 0768 |
| 0000016020 | 9A80 | 1A52 | 0000 | 0EA3 | 890E | 1016 | FF0E | 1276 |
| 0000016040 | 76FF | 6A10 | 6A05 | 9A00 | FFFF | 0000 | 5052 | 0668 |
| 0000016060 | 9A80 | FFFF | 0000 | 0AA3 | 890E | 0C16 | 8E0E | 7A06 |
| 0000016100 | 2608 | 36FF | 0006 | FF26 | 0436 | 1E00 | 1068 | 9A03 |
| 0000016120 | FFFF | 0000 | CB9A | AF1F | B81A | 0000 | 00BA | E900 |
| 0000016140 | 0502 | 468B | E90A | 0035 | 006A | 016A | 76FF | FF12 |
| 0000016160 | 1076 | 681E | 0395 | 681E | 0380 | 006A | 006A | FF9A |
| 0000016200 | 00FF | B800 | 0000 | 00BA | E900 | 04D8 | B29A | DE21 |
| 0000016220 | B81A | 0000 | 00BA | E900 | 04CA | 13E9 | 2D00 | 0014 |
| 0000016240 | 0375 | C3E9 | 2DFF | 000A | 0375 | DFE9 | E9FF | 0000 |
| 0000016260 | 94E9 | FF04 | 0836 | 1E03 | 0668 | 9A0A | 245D | 1AF0 |
| 0000016300 | C483 | 8306 | 0A3E | 0003 | 0375 | 05E9 | 9A00 | 21EB |
| 0000016320 | 1B0F | 681E | 0374 | CD9A | 0008 | B800 | 0000 | 00BA |
| 0000016340 | E900 | 0480 | 36FF | 0306 | 36FF | 0304 | 8A9A | 2009 |
| 0000016360 | 831B | 04C4 | FF50 | 0636 | FF03 | 0436 | 9A03 | 245D |
| 0000016400 | 1B32 | C483 | 8306 | 0A3E | 0003 | 0375 | 05E9 | 9A00 |
| 0000016420 | 21EB | 1828 | 00B8 | BA00 | 0000 | 47E9 | 8B04 | 0646 |
| 0000016440 | F2A3 | 8B09 | 0846 | F4A3 | A109 | 09F4 | F799 | 043E |
| 0000016460 | A30A | 0A00 | F2A1 | 9909 | 3EF7 | 0A02 | FEA3 | A109 |
| 0000016500 | 09F6 | 0603 | 09FE | 633D | 7F00 | E903 | 000A | 63B8 |
| 0000016520 | 2B00 | FE06 | A309 | 09F6 | 36FF | 0E10 | 36FF | 0E0E |
| 0000016540 | A068 | A101 | 09F6 | D22B | 5052 | 63B8 | 2B00 | FE06 |
| 0000016560 | 2B09 | 50C9 | 9A51 | 1BD7 | 0000 | F8A1 | 0309 | 0006 |

THU MAR 14 17:20:06 1991 BIP.EXE PAGE 9, LINE 473

| | | | | | | | | |
|---|---|---|---|---|---|---|---|---|
| 0000016600 | 8B0A | FA0E | 4909 | C13B | 037F | 0BE9 | A100 | 09FA |
| 0000016620 | 062B | 0A00 | A348 | 09F8 | 36FF | 0E0C | 36FF | 0E0A |
| 0000016640 | A068 | A101 | 09F8 | D22B | 5052 | FAA1 | 2B09 | 0006 |
| 0000016660 | 480A | C92B | 5150 | 969A | 001C | FF00 | F836 | FF09 |
| 0000016700 | F636 | FF09 | F036 | 9A09 | 1CB0 | 0000 | 76FF | FF12 |
| 0000016720 | 1076 | 76FF | FF0E | 0C76 | 76FF | FF0A | 0876 | 76FF |
| 0000016740 | 9A06 | FFFF | 0000 | 00B8 | BA00 | 0000 | 75E9 | 8B03 |
| 0000016760 | 0846 | 2AE9 | FF00 | F60E | E909 | 0045 | 06FF | 09F6 |
| 0000017000 | 3EE9 | 8300 | F62E | 0809 | 36E9 | 8300 | F606 | 0809 |
| 0000017020 | 2EE9 | 8B00 | 0646 | F6A3 | E909 | 0025 | 22E9 | 4800 |
| 0000017040 | 0375 | D0E9 | 48FF | 0375 | D1E9 | 48FF | 0375 | D2E9 |
| 0000017060 | 48FF | 0375 | D4E9 | 48FF | 7548 | E903 | FFD5 | 00E9 |
| 0000017100 | B800 | 0063 | 062B | 09FE | 063B | 09F6 | 037F | 03E9 |
| 0000017120 | A100 | 09F6 | 003D | 7C00 | E903 | 0003 | 00B8 | A300 |
| 0000017140 | 09F6 | 36FF | 0E10 | 36FF | 0E0E | A268 | 6A01 | 6A00 |
| 0000017160 | 6A00 | 6A00 | 9A00 | 1CCB | 0000 | 063B | 09F6 | 0375 |
| 0000017200 | 2CE9 | FF00 | F836 | FF09 | F636 | FF09 | F036 | 9A09 |
| 0000017220 | 1D88 | 0000 | 36FF | 0E10 | 36FF | 0E0E | A168 | A101 |
| 0000017240 | 09F6 | D22B | 5052 | 006A | 006A | 6E9A | 001D | B800 |
| 0000017260 | 0000 | 00BA | E900 | 02AC | 468B | E908 | 0038 | 0EFF |
| 0000017300 | 09F8 | 53E9 | FF00 | F806 | E909 | 004C | F4A1 | 9909 |
| 0000017320 | 3EF7 | 0A04 | 0629 | 09F8 | 3DE9 | A100 | 09F4 | F799 |
| 0000017340 | 043E | 010A | F806 | E909 | 002E | 468B | A306 | 09F8 |
| 0000017360 | 25E9 | E900 | 0022 | 7548 | E903 | FFC2 | 7548 | E903 |
| 0000017400 | FFC3 | 7548 | E903 | FFC4 | 7548 | E903 | FFCD | 4848 |
| 0000017420 | 0375 | D5E9 | E9FF | 0000 | FAA1 | 2B09 | 0006 | 480A |
| 0000017440 | 063B | 09F8 | 037F | 03E9 | A100 | 09F8 | 003D | 7C00 |
| 0000017460 | E903 | 0003 | 00B8 | A300 | 09F8 | 36FF | 0E0C | 36FF |
| 0000017500 | 0E0A | A268 | 6A01 | 6A00 | 6A00 | 6A00 | 9A00 | 1DA3 |
| 0000017520 | 0000 | 063B | 09F8 | 0375 | 2CE9 | FF00 | F836 | FF09 |
| 0000017540 | F636 | FF09 | F036 | 9A09 | FFFF | 0000 | 36FF | 0E0C |
| 0000017560 | 36FF | 0E0A | A168 | A101 | 09F8 | D22B | 5052 | 006A |
| 0000017600 | 006A | CE9A | 001D | B800 | 0000 | 00BA | E900 | 01D4 |
| 0000017620 | 468B | E908 | 0041 | 36FF | 0E10 | 36FF | 0E0E | 76FF |
| 0000017640 | FF0E | 0C76 | 76FF | FF0A | 0876 | 76FF | 9A06 | 1DED |
| 0000017660 | 0000 | AFE9 | FF01 | 0C36 | FF0E | 0A36 | FF0E | 0E76 |
| 0000017700 | 76FF | FF0C | 0A76 | 76FF | FF08 | 0676 | FF9A | 00FF |
| 0000017720 | E900 | 0190 | 23E9 | 2D00 | 0011 | 073D | 7600 | E903 |
| 0000017740 | 0018 | E0D1 | 2E93 | A7FF | 1E0A | 1DD5 | 1DD5 | 1E1A |
| 0000017760 | 1E1A | 1DB6 | 1DD5 | 1DB6 | 1DD5 | 4AE9 | FF01 | 1276 |
| 0000020000 | 76FF | FF10 | 1436 | FF0E | 1236 | 6A0E | 6A00 | 9A00 |
| 0000020020 | FFFF | 0000 | 068E | 087A | FF26 | 0636 | 2600 | 36FF |
| 0000020040 | 0004 | 681E | 0310 | 709A | 001A | FF00 | 1436 | FF0E |
| 0000020060 | 1236 | 9A0E | FFFF | 0000 | 006A | 0669 | 09FA | 00C8 |
| 0000020100 | FF50 | F036 | 9A09 | FFFF | 0000 | 36FF | 0E14 | 36FF |
| 0000020120 | 0E12 | FF9A | 00FF | B800 | 0000 | 00BA | E900 | 0104 |
| 0000020140 | 006A | 006A | 36FF | 09F0 | 7D9A | 0019 | FF00 | F036 |
| 0000020160 | 9A09 | FFFF | 0000 | 36FF | 0E14 | 36FF | 0E12 | FF9A |
| 0000020200 | 00FF | B800 | 0000 | 00BA | E900 | 00D8 | 3E83 | 030E |
| 0000020220 | 7400 | E903 | 000C | 681E | 037C | FF9A | 00FF | E900 |
| 0000020240 | 0009 | 681E | 037C | F79A | 001A | 8300 | 0E3E | 0103 |
| 0000020260 | C01B | D8F7 | 0EA3 | B803 | 0000 | 00BA | E900 | 00A4 |
| 0000020300 | 76FF | FF0C | 0A76 | 76FF | FF12 | 1076 | 069A | 7723 |
| 0000020320 | 831A | 08C4 | 70E9 | E900 | 006D | 313D | 7500 | E903 |
| 0000020340 | FDD6 | 0376 | 27E9 | 4800 | 0375 | 03E9 | 48FA | 0375 |
| 0000020360 | 6DE9 | 2DFF | 0005 | 0375 | 22E9 | 2DFC | 0019 | 0375 |
| 0000020400 | 5FE9 | 2DFB | 0003 | 0375 | F2E9 | E9FE | 0039 | 743D |
| 0000020420 | 7500 | E903 | FF76 | 0376 | 13E9 | 2D00 | 0032 | 0375 |
| 0000020440 | CCE9 | 2DFC | 0013 | 0375 | 95E9 | E9FF | 0019 | 7A2D |

THU MAR 14 17:20:06 1991 BIP.EXE PAGE 10, LINE 532

| | | | | | | | | |
|---|---|---|---|---|---|---|---|---|
| 0000020460 | 7500 | E903 | FE5A | 862D | 750F | E903 | FB75 | 7548 |
| 0000020500 | E903 | FBA0 | 00E9 | FF00 | 1276 | 76FF | FF10 | 0E76 |
| 0000020520 | 76FF | FF0C | 0A76 | 76FF | FF08 | 0676 | FF9A | 00FF |
| 0000020540 | E900 | 0000 | 5E1F | 835F | 02ED | E58B | 5D1F | CA4D |
| 0000020560 | 000E | 581E | 4590 | 8B55 | 1EEC | D88E | EC81 | 000C |
| 0000020600 | 5657 | 76FF | 6A06 | 8D01 | F446 | 5016 | 086A | FF9A |
| 0000020620 | 00FF | 8900 | FC46 | 7E83 | 01FC | C01B | E940 | 0000 |
| 0000020640 | 5F5E | ED83 | 8B02 | 1FE5 | 4D5D | 1ECB | 9058 | 5545 |
| 0000020660 | EC8B | 8E1E | 81D8 | 0AEC | 5700 | 2B56 | 89C0 | F846 |
| 0000020700 | 4689 | 1EF6 | BE68 | 1E03 | FC68 | 6809 | 4082 | 0368 |
| 0000020720 | 6885 | 2000 | 0068 | 6A20 | 6800 | 01F4 | FF9A | 00FF |
| 0000020740 | 8900 | FA46 | 7E83 | 00FA | 0375 | 1AE9 | 1E00 | C868 |
| 0000020760 | 1E03 | 2868 | 9A04 | 08FA | 2022 | C483 | 6A08 | 9A01 |
| 0000021000 | 0182 | 2033 | C483 | 6A02 | 6A00 | 6800 | 2000 | 006a |
| 0000021020 | 006A | 3B68 | 6820 | FFFF | DE9A | EF09 | 831E | 0EC4 |
| 0000021040 | 4689 | 83FC | FC7E | 74FF | E903 | 0006 | FFB8 | E9FF |
| 0000021060 | 0006 | 00B8 | E900 | 0000 | 5F5E | ED83 | 8B02 | 1FE5 |
| 0000021100 | 4D5D | 1ECB | 9058 | 5545 | EC8B | 8E1E | 81D8 | 06EC |
| 0000021120 | 5700 | 8356 | 0C3E | 0003 | 0374 | 23E9 | 6A00 | 6A00 |
| 0000021140 | 9A64 | FFFF | 0000 | 36FF | 09FC | FF9A | 00FF | 3D00 |
| 0000021160 | 0000 | 0374 | 06E9 | C700 | 0C06 | 0103 | E900 | 00CB |
| 0000021200 | 681E | 0378 | EE9A | 0020 | FF00 | FC36 | 1E09 | 7868 |
| 0000021220 | 8D03 | FA46 | 5016 | 681E | 0A06 | FF68 | 1E03 | 0868 |
| 0000021240 | 9A03 | FFFF | 0000 | 4689 | 1EFC | 7868 | 6A03 | 6AFF |
| 0000021260 | 9AFF | 2119 | 0000 | 7E83 | 00FC | 0374 | 8CE9 | 8300 |
| 0000021300 | 083E | 0003 | 0375 | 82E9 | 1E00 | 7468 | 9A03 | 1EBB |
| 0000021320 | 0000 | 068F | C378 | FF26 | 2436 | 2602 | 36FF | 0222 |
| 0000021340 | 0068 | 6A10 | 6A00 | 6A00 | 6A00 | 9A00 | FFFF | 0000 |
| 0000021360 | 681E | 0374 | FF6A | FF6A | 8B9A | 0008 | FF00 | 0836 |
| 0000021400 | 1E03 | 0668 | 9A0A | 2179 | 2149 | C483 | 3D06 | 0000 |
| 0000021420 | 0375 | 36E9 | FF00 | FC36 | 9A09 | 189D | 0000 | 681E |
| 0000021440 | 03E5 | 681E | 0310 | 549A | 1809 | 8320 | 08C4 | 068E |
| 0000021460 | 087A | FF26 | 0636 | 2600 | 36FF | 0004 | 681E | 0310 |
| 0000021500 | 479A | 001E | C700 | 0C06 | 0003 | E900 | FF05 | 5F5E |
| 0000021520 | ED83 | 8B02 | 1FE5 | 4D5D | 1ECB | 9058 | 5545 | EC8B |
| 0000021540 | 8E1E | 81D8 | 00EC | 5700 | 6A56 | 1E05 | F268 | FF03 |
| 0000021560 | 0876 | 76FF | 9A06 | 09A2 | 2128 | C483 | 3D0A | 0001 |
| 0000021600 | C01B | D8F7 | 00E9 | 5E00 | 835F | 02ED | E58B | 5D1F |
| 0000021620 | CB4D | 581E | 4590 | 8B55 | 1EEC | D88E | EC81 | 000D |
| 0000021640 | 5657 | 068E | 0878 | FF26 | 2436 | 2602 | 36FF | 0222 |
| 0000021660 | 0168 | 6A10 | 6A00 | 6A00 | 6A00 | 9A00 | 210C | 0000 |
| 0000021700 | 5F5E | ED83 | 8B02 | 1FE5 | 4D5D | 1ECB | 9058 | 5545 |
| 0000021720 | EC8B | 8E1E | 81D8 | 06EC | 5700 | 8D56 | FC46 | 5016 |
| 0000021740 | 4E8D | 16FA | FF51 | F036 | 9A09 | FFFF | 0000 | FAA1 |
| 0000021760 | 4809 | 463B | 7DFC | E903 | 003C | 3E83 | 030A | 7500 |
| 0000022000 | E903 | 0032 | 068E | 087A | FF26 | 0636 | 2600 | 36FF |
| 0000022020 | 0004 | 316A | 006A | 006A | 468B | 2BFC | 0006 | 3D0A |
| 0000022040 | 0000 | 037C | 03E9 | B800 | 0000 | C08B | 06BA | 5200 |
| 0000022060 | 9A50 | 1B96 | 0000 | FAA1 | 2B09 | FC46 | 7448 | E903 |
| 0000022100 | 0006 | 06C7 | 030A | 0000 | 5F5E | ED83 | 8B02 | 1FE5 |
| 0000022120 | 4D5D | 1ECB | 9058 | 5545 | EC8B | 8E1E | 81D8 | 04EC |
| 0000022140 | 5700 | 1E56 | 06B8 | 8E19 | 8BD8 | 0E46 | 3DE9 | FF00 |
| 0000022160 | 1276 | 76FF | FF10 | 0E76 | 76FF | FF0C | 0A76 | 76FF |
| 0000022200 | FF08 | 0676 | 068E | 087C | FF26 | 261E | 8902 | FC46 |
| 0000022220 | 76FF | FF08 | 0676 | 4B9A | 9823 | 8321 | 04C4 | 468B |
| 0000022240 | 2BFC | E9D2 | 0032 | 0EE9 | E900 | 000B | 4C2D | 7500 |
| 0000022260 | E903 | FFBB | EFE9 | FFFF | 1276 | 76FF | FF10 | 0E76 |
| 0000022300 | 76FF | FF0C | 0A76 | 76FF | FF08 | 0676 | 068E | 087C |
| 0000022320 | FF26 | 261E | E902 | 0000 | 5E1F | 835F | 02ED | E58B |

THU MAR 14 17:20:06 1991 BIP.EXE PAGE 11, LINE 591

| | | | | | | | | |
|---|---|---|---|---|---|---|---|---|
| 0000022340 | 5D1F | CA4D | 000E | 581E | 4590 | 8B55 | 1EEC | D88E |
| 0000022360 | EC81 | 0000 | 5657 | 76FF | FF08 | 0676 | 4C6A | 76FF |
| 0000022400 | FF0C | 0A76 | 681E | 0E16 | 529A | 0022 | FF00 | 0876 |
| 0000022420 | 76FF | 6A06 | 6A00 | 1E00 | 1668 | 9A0E | FFFF | 0000 |
| 0000022440 | 5F5E | ED83 | 8B02 | 1FE5 | 4D5D | 1ECB | 9058 | 5545 |
| 0000022460 | EC8B | 8E1E | 81D8 | 04EC | 5700 | C456 | 065E | 8A26 |
| 0000022500 | 3C47 | 0F24 | 0F3C | 0374 | 06E9 | B800 | 0001 | 03E9 |
| 0000022520 | B800 | 0000 | 4689 | C4FC | 065E | 8326 | 3C4F | 8320 |
| 0000022540 | FC7E | 7500 | E903 | 0006 | 01B8 | E900 | 0005 | 02A1 |
| 0000022560 | D10A | C4F8 | 065E | 8926 | 0447 | 7E83 | 00FC | 0375 |
| 0000022600 | 06E9 | B800 | 0001 | 03E9 | A100 | 0A04 | 5EC4 | 2606 |
| 0000022620 | 4789 | 5E06 | 835F | 02ED | E58B | 5D1F | CB4D | 581E |
| 0000022640 | 4590 | 8B55 | 1EEC | D88E | EC81 | 0024 | 5657 | 76FF |
| 0000022660 | FF08 | 0676 | 468D | 16DC | 9A50 | FFFF | 0000 | 003D |
| 0000022700 | 7400 | E903 | 0003 | 69E9 | C700 | F246 | 0050 | 46C7 |
| 0000022720 | 00F4 | 6B00 | 0406 | 120A | 5005 | 9900 | 4689 | 89FA |
| 0000022740 | FC56 | 46C7 | 64EE | C700 | F046 | 0000 | 066B | 0A02 |
| 0000022760 | 053B | 0064 | 8999 | F646 | 5689 | FFF8 | 0876 | 76FF |
| 0000023000 | 8D06 | EE46 | 5016 | 006A | FF9A | 00FF | FF00 | 0876 |
| 0000023020 | 76FF | 6A06 | 6A00 | FF00 | EE76 | 76FF | 8BF2 | F646 |
| 0000023040 | 462B | 50EE | 468B | 2BFA | F246 | 6A50 | 9A03 | FFFF |
| 0000023060 | 0000 | 5F5E | ED83 | 8B02 | 1FE5 | 4D5D | 1ECB | 9058 |
| 0000023100 | 5545 | EC8B | 8E1E | 81D8 | 00EC | 5700 | FF56 | 0A76 |
| 0000023120 | 76FF | FF08 | 0676 | 9B9A | B924 | 8322 | 06C4 | 76FF |
| 0000023140 | FF08 | 0676 | 76FF | FF0A | F036 | 9A09 | FFFF | 0000 |
| 0000023160 | 5F5E | ED83 | 8B02 | 1FE5 | 4D5D | 1ECB | 9058 | 5545 |
| 0000023200 | EC8B | 8E1E | 81D8 | 6EEC | 5700 | 8356 | 0A7E | 7C04 |
| 0000023220 | E903 | 0006 | 00B8 | E900 | 00B5 | 5EC4 | 2606 | 3F80 |
| 0000023240 | 7440 | E903 | 001F | 036A | 681E | 03F8 | 468B | 8B06 |
| 0000023260 | 0856 | 5240 | 9A50 | 09A2 | 2479 | C483 | 3D0A | 0000 |
| 0000023300 | 0375 | 06E9 | B800 | 0000 | 84E9 | 8B00 | 0646 | 568B |
| 0000023320 | 0508 | 0004 | 4689 | 8996 | 9856 | 5EC4 | FF96 | 9646 |
| 0000023340 | 8A26 | 9807 | 57E9 | 8D00 | 9A46 | 5016 | 76FF | FF98 |
| 0000023360 | 9676 | 7A9A | 3625 | 8325 | 08C4 | 003D | 7500 | E903 |
| 0000023400 | 0030 | 468D | 169A | 1E50 | FC68 | 1E03 | 0968 | 1E04 |
| 0000023420 | 1068 | 9A03 | 0AEC | 24D8 | C483 | 8E10 | 7A06 | 2608 |
| 0000023440 | 36FF | 0006 | FF26 | 0436 | 1E00 | 1068 | 9A03 | 2161 |
| 0000023460 | 0000 | 14E9 | B800 | 0000 | 14E9 | E900 | 000B | 502D |
| 0000023500 | 7500 | E903 | FFA1 | ECE9 | B8FF | 0001 | 00E9 | 5E00 |
| 0000023520 | 835F | 02ED | E58B | 5D1F | CB4D | 581E | 4590 | 8B55 |
| 0000023540 | 1EEC | D88E | EC81 | 006E | 5657 | 468D | 8992 | F646 |
| 0000023560 | 568C | 8BF8 | 0646 | 568B | 8908 | FA46 | 5689 | E9FC |
| 0000023600 | 0003 | 46FF | C4FA | FA5E | 8026 | 003F | 0375 | 1EE9 |
| 0000023620 | C400 | FA5E | 8026 | 7E3F | 0375 | 12E9 | C400 | FA5E |
| 0000023640 | 8A26 | C407 | F65E | 46FF | 26F6 | 0788 | D3E9 | C4FF |
| 0000023660 | FA5E | 8026 | 003F | 0374 | 06E9 | B800 | 0000 | 20E9 |
| 0000023700 | C400 | F65E | C626 | 0007 | 468D | 1692 | FF50 | 0C76 |
| 0000023720 | 76FF | 9A0A | 0954 | 2515 | C483 | B808 | 0001 | 00E9 |
| 0000023740 | 5E00 | 835F | 02ED | E58B | 5D1F | CB4D | 0043 | 0005 |
| 0000023760 | 2036 | 0001 | 2063 | 0002 | 15E7 | 0001 | 0000 | 0002 |
| 0000024000 | 12FF | 0002 | 0000 | 0002 | 08C9 | 0003 | 0000 | 0103 |
| 0000024020 | 0AE8 | 0001 | 0005 | 0103 | 0045 | 0001 | 0008 | 0002 |
| 0000024040 | 1862 | 0004 | 0000 | 0103 | 171B | 0001 | 008A | 0005 |
| 0000024060 | 183F | 0001 | 2273 | 0002 | 2285 | 0005 | 0000 | 0103 |
| 0000024100 | 08AB | 0001 | 008C | 0005 | 17D9 | 0001 | 18F4 | 0103 |
| 0000024120 | 1EC7 | 0001 | 008D | 0103 | 20D2 | 0001 | 008E | 0103 |
| 0000024140 | 1793 | 0004 | 00F6 | 0103 | 18DF | 0004 | 00F7 | 0103 |
| 0000024160 | 1A19 | 0002 | 0007 | 0103 | 20A5 | 0001 | 008F | 0103 |
| 0000024200 | 1FFD | 0003 | 0001 | 0103 | 220A | 0002 | 0009 | 0103 |

THU MAR 14 17:20:06 1991 BIP.EXE PAGE 12, LINE 650

```
0000024220  0A40  0001  0091  0103  1FAF  0003  0002  0103
0000024240  208B  0003  0003  0103  213A  0003  0004  0103
0000024260  20C2  0001  0095  0103  17E2  0004  0003  0103
0000024300  248C  0002  0013  0103  18B9  0004  0007  0103
0000024320  2082  0001  0020  0103  244E  0004  0008  0103
0000024340  0828  0001  0022  0103  23DA  0004  000A  0103
0000024360  1A9F  0004  008B  0103  180A  0004  008C  0103
0000024400  1304  0001  0026  0103  1952  0005  0007  0103
0000024420  2429  0004  008F  0103  254E  0004  0010  0103
0000024440  1E9F  0005  000A  0103  1A32  0004  0013  0103
0000024460  1999  0004  0095  0203  1E89  0002  0028  0103
0000024500  1E54  0005  0010  0103  1A28  0004  0019  0103
0000024520  233C  0004  009A  0103  1E66  0002  002B  0103
0000024540  15AF  0001  003A  0103  18A6  0001  003B  0103
0000024560  1842  0004  0025  0203  196E  0002  0035  0103
0000024600  1917  0004  0029  0103  1E30  0004  002D  0103
0000024620  1C02  0006  001E  0103  1E73  0004  002E  0203
0000024640  1E92  0002  0041  0103  1F7D  0004  00B2  0103
0000024660  0105  0001  004D  0103  17B2  0004  003A  0103
0000024700  18CC  0004  003B  0103  00ED  0001  0055  0103
0000024720  2329  0004  003D  0203  198E  0002  004E  0103
0000024740  0131  0001  0059  0103  1870  0004  0041  0103
0000024760  1891  0004  0044  0103  21DC  0004  0046  0203
0000025000  1BE8  0002  0063  0000  0000  0000  0000  0000
0000025020  0000  0000  1070  0000  0000  0000  0000  0000
0000025040  0000  0000  0000  0000  0000  0000  0000  0000
*
0000025120  0000  0000  0200  0000  0000  0000  0000  0000
0000025140  0000  0000  0000  0000  0000  0000  0000  0000
*
0000025220  0000  0000  0200  0000  0000  0000  0000  0000
0000025240  0000  0000  0000  0000  0000  0000  0000  0000
*
0000025320  0000  0000  0200  0000  0000  0000  0000  0000
0000025340  0000  0000  0000  0000  534D  5220  6E75  542D
0000025360  6D69  2065  694C  7262  7261  2079  202D  6F43
0000025400  7970  6972  6867  2074  6328  2029  3931  3039
0000025420  202C  694D  7263  736F  666F  2074  6F43  7072
0000025440  0018  0000  0000  0000  0000  0006  0000  0000
0000025460  0000  0005  0000  0000  0000  0000  0000  0000
0000025500  0000  0000  435F  465F  4C49  5F45  4E49  4F46
0000025520  003D  0001  FFFF  0000  0000  0000  0000  0000
0000025540  0000  0000  0000  0000  0001  0100  8181  0081
0000025560  0000  0000  0000  0000  0000  0000  0000  0000
*
0000026140  0000  0000  0000  0000  0000  0000  0A0A  0A0A
0000026160  0A0A  0A0A  0A0A  0A0A  0A0A  0A0A  0A0A  0A0A
*
0000026540  0A0A  0A0A  0A0A  0A0A  0A0A  0A0A  0000  0000
0000026560  0000  0000  0000  0000  0000  0000  FFFF  0000
0000026600  0000  0000  0000  0000  0000  0000  0000  0000
0000026620  0000  0000  0003  2000  2D2D  2D2D  2D2D  2D2D
0000026640  2D2D  2D2D  2D2D  2D2D  2D2D  2D2D  2D2D  2D2D
*
0000026740  0A0D  0000  02B8  FFFF  0000  0001  0000  0001
0000026760  6942  2070  6544  7562  6767  7265  0000  0000
0000027000  0000  0000  0000  0000  0000  0000  0000  0000
*
0000027140  6942  2070  6544  7562  6767  7265  0000  CCFF
```

```
THU MAR 14 17:20:06 1991  BIP.EXE  PAGE 13, LINE 709

0000027160  0000  0020  4200  7069  4420  6265  6775  6567
0000027200  2072  3276  312E  0A20  5920  636F  6968  5320
0000027220  6F6C  696E  206D  3931  3039  0000  0020  705C
0000027240  7069  5C65  6962  0070  6143  276E  2074  7263
0000027260  6165  6574  4220  7069  6E20  6D61  6465  7020
0000027300  7069  0A65  4200  7069  4420  6265  6775  6567
0000027320  0072  2840  2926  003E  2628  0029  6942  2070
0000027340  6544  7562  6767  7265  2500  2073  2520  0073
0000027360  0008  0418  0000  0008  087C  0001  0000  0000
0000027400  0000  0000  0000  0102  0000  0000  0000  0000
0000027420  0000  0202  0000  0000  0000  0000  0000  0000
0000027440  00G0  0000  0000  0000  0000  0000  0000  0000
*
0000030320  0001  0200  0000  0000  0000  0000  0000  0000
0000030340  0000  0000  0000  0000  0000  0000  0000  0000
*
0000031260  05E4  0306  0000  0000  0000  0000  0006  0600
0000031300  0100  0000  0010  0603  0600  1002  4504  4545
0000031320  0505  0505  3505  0030  0050  0000  2000  3020
0000031340  5850  0807  3000  3030  5057  0007  2000  0020
0000031360  0000  0000  6008  6060  6060  0060  7000  7870
0000031400  7878  0878  0807  0000  0007  0808  0008  0800
0000031420  0800  0000  2808  756E  6C6C  0629  0000  0003
0000031440  FFFF  FFFF  0000  02B6  0874  02B6  0848  02B6
0000031460  084C  02B6  0850  02B6  0854  02B6  0858  0000
0000031500  0000  0101  0000  0000  0000  0000  0000  0000
0000031520  0000  1474  FFFF  FFFF  0876  0878  087A  3C3C
0000031540  4D4E  4753  3E3E  0000  3652  3030  0D30  2D0A
0000031560  7320  6174  6B63  6F20  6576  6672  6F6C  0D77
0000031600  000A  0003  3652  3030  0D33  2D0A  6920  746E
0000031620  6765  7265  6420  7669  6469  2065  7962  3020
0000031640  0A0D  0800  5200  3036  3830  0A0D  202D  6F6E
0000031660  2074  6E65  756F  6867  7320  6170  6563  6620
0000031700  726F  6120  6772  6D75  6E65  7374  0A0D  0900
0000031720  5200  3036  3930  0A0D  202D  6F6E  2074  6E65
0000031740  756F  6867  7320  6170  6563  6620  726F  6520
0000031760  766E  7269  6E6F  656D  746E  0A0D  FC00  0D00
0000032000  000A  00FF  7572  2D6E  6974  656D  6520  7272
0000032020  726F  0020  0002  3652  3030  0D32  2D0A  6620
0000032040  6F6C  7461  6E69  2D67  6F70  6E69  2074  7573
0000032060  7070  726F  2074  6F6E  2074  6F6C  6461  6465
0000032100  0A0D  0100  5200  3036  3130  0A0D  202D  756E
0000032120  6C6C  7020  696F  746E  7265  6120  7373  6769
0000032140  6D6E  6E65  0D74  000A  0011  3652  3130  0D37
0000032160  2D0A  7520  656E  7078  6365  6574  2064  756D
0000032200  746C  7469  7268  6165  2064  6F6C  6B63  6520
0000032220  7272  726F  0A0D  1000  5200  3036  3631  0A0D
0000032240  202D  6F6E  2074  6E65  756F  6867  7320  6170
0000032260  6563  6620  726F  7420  7268  6165  2064  6164
0000032300  6174  0A0D  FF00  FFFF  0003  0002  085C  0001
0000032320  0000  0002  0412  0004  0000  0002  07D2  0005
0000032340  0000  0000  0000  0000  0000  0000  0000  0000
0000032360  4349  0120  0000  0010  0010  0020  0000  000C
0000032400  0000  0020  0040  0001  0001  0000  FF00  FFFF
0000032420  0000  0000  0000  0000  0000  0000  0000  0000
*
0000032620  FFFF  FFFF  FFE7  FFFF  FFE3  FFE0  FFF1  FFC0
0000032640  C8F8  FFC7  48FC  FF0F  2CFE  FF1F  00E7  FF7F
0000032660  00E3  FF3F  00F2  FF1F  00F8  FF1F  00F8  1F18
```

THU MAR 14 17:20:06 1991 BIP.EXE PAGE 14, LINE 768

| | | | | | | | | |
|---|---|---|---|---|---|---|---|---|
| 0000032700 | 00F2 | 3F18 | 00E2 | 7F18 | 6EE6 | 3B18 | 4CFC | 1399 |
| 0000032720 | CCF8 | 87CF | FFFI | C7E7 | FFC3 | C3E3 | FFC7 | 91E3 |
| 0000032740 | FEFF | B8FF | 1DFC | FCDF | EEFD | FCDF | EDFD | FEDF |
| 0000032760 | EEFD | FFDF | 0DFC | FFC3 | EFFD | FFDD | ECFD | FFDD |
| 0000033000 | 1CFC | FFC3 | FFFF | FFFF | FFFF | FFFF | FFFF | FFFF |
| 0000033020 | 004E | 0000 | 0352 | 0004 | 0002 | 0011 | 0000 | 000A |
| 0000033040 | 467E | 6C69 | 0065 | 002C | 0000 | 0352 | 0004 | 0003 |
| 0000033060 | 0001 | 0000 | 0014 | 7E41 | 6F62 | 7475 | 2E2E | 002E |
| 0000033100 | 0004 | 4000 | FFFF | 0040 | 0000 | 8004 | 7E65 | 6958 |
| 0000033120 | 0074 | 0001 | 0000 | 001E | 4D7E | 7261 | 006B | 0000 |
| 0000033140 | 0002 | 0352 | 0002 | 0021 | 001E | 0002 | 0022 | 8004 |
| 0000033160 | 424E | 3230 | 2E09 | 0000 | 0001 | 0010 | 00DA | 0000 |
| 0000033200 | 0001 | 0001 | 6F0C | 3273 | 635C | 7472 | 2E30 | 7361 |
| 0000033220 | 016D | EA00 | A900 | 0001 | 0100 | 0100 | 0F00 | 736F |
| 0000033240 | 5C32 | 7263 | 3074 | 6164 | 2E74 | 7361 | 016D | 9400 |
| 0000033260 | 2202 | 0000 | 0100 | 0100 | 0F00 | 736F | 5C32 | 7263 |
| 0000033300 | 3074 | 736D | 2E67 | 7361 | 016D | B600 | 0602 | 0000 |
| 0000033320 | 0100 | 0100 | 0A00 | 7263 | 3074 | 7066 | 612E | 6D73 |
| 0000033340 | 0001 | 02BC | 0024 | 0000 | 0001 | 0001 | 630A | 6B68 |
| 0000033360 | 7573 | 2E6D | 7361 | 016D | E000 | 8702 | 0001 | 0100 |
| 0000033400 | 0100 | 0F00 | 736F | 5C32 | 7473 | 6164 | 6772 | 2E76 |
| 0000033420 | 7361 | 016D | 6800 | A304 | 0000 | 0100 | 0100 | 0F00 |
| 0000033440 | 736F | 5C32 | 7473 | 6564 | 766E | 2E70 | 7361 | 016D |
| 0000033460 | 0C00 | 6505 | 0000 | 0100 | 0100 | 0F00 | 736F | 5C32 |
| 0000033500 | 6D6E | 6773 | 6468 | 2E72 | 7361 | 016D | 7200 | 2105 |
| 0000033520 | 0000 | 0100 | 0100 | 1000 | 736F | 5C32 | 7473 | 6164 |
| 0000033540 | 6C6C | 636F | 612E | 6D73 | 0001 | 0594 | 000A | 0000 |
| 0000033560 | 0001 | 0001 | 6D0A | 6C61 | 6F6C | 2E63 | 7361 | 016D |
| 0000033600 | 9E00 | AF05 | 0000 | 0100 | 0100 | 0B00 | 6D66 | 6C61 |
| 0000033620 | 6F6C | 2E63 | 7361 | 006D | 0000 | 0000 | 0000 | 0100 |
| 0000033640 | 0000 | 0900 | 6466 | 7461 | 2E61 | 7361 | 016D | 4E00 |
| 0000033660 | 3406 | 0000 | 0100 | 0100 | 0B00 | 6E69 | 7469 | 6573 |
| 0000033700 | 2E67 | 7361 | 016D | 8200 | 3606 | 0000 | 0100 | 0100 |
| 0000033720 | 0B00 | 696C | 6B6E | 6573 | 2E67 | 7361 | 016D | B800 |
| 0000033740 | 7C06 | 0000 | 0100 | 0100 | 0C00 | 6573 | 7261 | 6863 |
| 0000033760 | 6773 | 612E | 6D73 | 0001 | 0734 | 00E2 | 0000 | 0001 |
| 0000034000 | 0001 | 670B | 6F72 | 7377 | 6765 | 612E | 6D73 | 0001 |
| 0000034020 | 0816 | 0031 | 0000 | 0001 | 0001 | 6E0A | 7765 | 6573 |
| 0000034040 | 2E67 | 7361 | 016D | 4800 | B208 | 0000 | 0100 | 0100 |
| 0000034060 | 0D00 | 736F | 5C32 | 6C6D | 636F | 2E6B | 7361 | 016D |
| 0000034100 | 7A00 | 9217 | 000E | 0300 | 0100 | 0500 | 6962 | 2E70 |
| 0000034120 | 0163 | FA00 | 5A08 | 0000 | 0100 | 0100 | 0900 | 7066 |
| 0000034140 | 6972 | 746E | 2E66 | 0063 | 0000 | 0000 | 0000 | 0100 |
| 0000034160 | 0000 | 0700 | 665F | 6C69 | 2E65 | 0163 | 5400 | 3609 |
| 0000034200 | 0000 | 0100 | 0100 | 0A00 | 7473 | 6372 | 7970 | 612E |
| 0000034220 | 6D73 | 0001 | 098A | 0017 | 0000 | 0001 | 0001 | 730A |
| 0000034240 | 7274 | 656C | 2E6E | 7361 | 016D | A200 | 3B09 | 0000 |
| 0000034260 | 0100 | 0100 | 0B00 | 7473 | 6E72 | 6D63 | 2E70 | 7361 |
| 0000034300 | 016D | DE00 | 0E09 | 0001 | 0100 | 0100 | 0E00 | 6C64 |
| 0000034320 | 5C6C | 6874 | 6572 | 6461 | 612E | 6D73 | 0001 | 0AEC |
| 0000034340 | 0074 | 0000 | 0001 | 0001 | 7309 | 7270 | 6E69 | 6674 |
| 0000034360 | 632E | 0001 | 0B60 | 00C0 | 0000 | 0001 | 0001 | 6F0E |
| 0000034400 | 3273 | 645C | 736F | 6572 | 2E74 | 7361 | 016D | 2000 |
| 0000034420 | E50C | 0000 | 0100 | 0100 | 0B00 | 665F | 736C | 7562 |
| 0000034440 | 2E66 | 7361 | 016D | 0600 | C00D | 0000 | 0100 | 0100 |
| 0000034460 | 0B00 | 735F | 7466 | 7562 | 2E66 | 7361 | 016D | C600 |
| 0000034500 | FA0D | 0004 | 0100 | 0100 | 0A00 | 756F | 7074 | 7475 |
| 0000034520 | 612E | 6D73 | 0001 | 12C0 | 000A | 0000 | 0001 | 0001 |
| 0000034540 | 6608 | 6572 | 2E65 | 7361 | 016D | CA00 | 7A12 | 0000 |

THU MAR 14 17:20:06 1991 BIP.EXE PAGE 15, LINE 827

| | | | | | | | | |
|---|---|---|---|---|---|---|---|---|
| 0000034560 | 0100 | 0100 | 1000 | 6C64 | 5C6C | 6974 | 7464 | 6261 |
| 0000034600 | 656C | 612E | 6D73 | 0001 | 1344 | 0032 | 0000 | 0001 |
| 0000034620 | 0001 | 630A | 6B68 | 7473 | 2E6B | 7361 | 006D | 0000 |
| 0000034640 | 0000 | 0000 | 0100 | 0000 | 0B00 | 635F | 6C66 | 7375 |
| 0000034660 | 2E68 | 7361 | 016D | 7600 | 4B13 | 0000 | 0100 | 0100 |
| 0000034700 | 0B00 | 675F | 7465 | 7562 | 2E66 | 7361 | 016D | C200 |
| 0000034720 | 2E13 | 0001 | 0100 | 0100 | 0800 | 6666 | 756C | 6873 |
| 0000034740 | 632E | 0001 | 14F0 | 0077 | 0000 | 0001 | 0001 | 6F0D |
| 0000034760 | 3273 | 6C5C | 6573 | 6B65 | 612E | 6D73 | 0001 | 1568 |
| 0000035000 | 01F4 | 0000 | 0001 | 0001 | 7709 | 6972 | 6574 | 612E |
| 0000035020 | 6D73 | 0000 | 0000 | 0000 | 0000 | 0001 | 0000 | 630C |
| 0000035040 | 696D | 6373 | 6164 | 2E74 | 7361 | 016D | 5C00 | 1E17 |
| 0000035060 | 0000 | 0100 | 0100 | 0C00 | 7473 | 6361 | 616B | 6176 |
| 0000035100 | 612E | 6D73 | 09E8 | 0005 | 0000 | 5F06 | 6465 | 7461 |
| 0000035120 | 7061 | 050E | 0000 | 0400 | 655F | 646E | 0050 | 0005 |
| 0000035140 | 0000 | 5F0C | 6E5F | 6568 | 7061 | 645F | 7365 | 7663 |
| 0000035160 | 0500 | 0000 | 0C00 | 5F5F | 615F | 4244 | 7773 | 6670 |
| 0000035200 | 676C | 0042 | 0005 | 0000 | 5F08 | 615F | 6D63 | 6C64 |
| 0000035220 | 746E | 0500 | 0000 | 0800 | 5F5F | 7361 | 6765 | 6968 |
| 0000035240 | 0072 | 0005 | 0000 | 5F08 | 615F | 6573 | 6C67 | 4E6F |
| 0000035260 | 0500 | 0000 | 0800 | 5F5F | 7361 | 7A69 | 7364 | 0010 |
| 0000035300 | 0001 | 0000 | 5F08 | 615F | 7473 | 7261 | 4674 | 0500 |
| 0000035320 | 0000 | 0800 | 5F5F | 7461 | 706F | 7073 | 0064 | 0005 |
| 0000035340 | 0000 | 5F09 | 615F | 6663 | 6E69 | 6F66 | D6D6 | 0000 |
| 0000035360 | 0001 | 5F09 | 615F | 4244 | 7375 | 6465 | 0044 | 0005 |
| 0000035400 | 0000 | 5F09 | 615F | 6E65 | 7376 | 6765 | 0084 | 0001 |
| 0000035420 | 0000 | 5F09 | 635F | 6E69 | 4474 | 5649 | 004A | 0005 |
| 0000035440 | 0000 | 5F0A | 745F | 7268 | 6165 | 6964 | 4864 | 0500 |
| 0000035460 | 0000 | 0A00 | 5F5F | 6967 | 666E | 736F | 6765 | D6D6 |
| 0000035500 | 0000 | 0001 | 5F0A | 615F | 4244 | 6F64 | 7773 | 4C70 |
| 0000035520 | 0500 | 0000 | 0A00 | 5F5F | 696C | 666E | 736F | 6765 |
| 0000035540 | 9876 | 0000 | 0001 | 5F0A | 615F | 7263 | 7574 | 6573 |
| 0000035560 | 7864 | 0500 | 0000 | 0B00 | 5F5F | 615F | 4244 | 7472 |
| 0000035600 | 7265 | 8C72 | 0100 | 0000 | 0B00 | 5F5F | 6D61 | 6773 |
| 0000035620 | 655F | 6978 | 8674 | 0500 | 0000 | 0B00 | 5F5F | 736F |
| 0000035640 | 6576 | 7372 | 6F69 | 896E | 0101 | 0000 | 0600 | 5F5F |
| 0000035660 | 7865 | 7469 | 024F | 0001 | 0000 | 5F0C | 755F | 6C6E |
| 0000035700 | 636F | 656B | 6978 | 9A74 | 0502 | 0000 | 0700 | 5F5F |
| 0000035720 | 6863 | 6C69 | 8A64 | 0500 | 0000 | 0700 | 5F5F | 666E |
| 0000035740 | 6C69 | EA65 | 0100 | 0000 | 0700 | 5F5F | 6963 | 696E |
| 0000035760 | 8C74 | 0502 | 0000 | 0700 | 5F5F | 615F | 6772 | 9163 |
| 0000036000 | 0101 | 0000 | 0700 | 5F5F | 6563 | 6978 | 8674 | 0500 |
| 0000036020 | 0000 | 0D00 | 5F5F | 6F64 | 7673 | 7265 | 616D | 6F6A |
| 0000036040 | 8E72 | 0502 | 0000 | 0700 | 5F5F | 615F | 6772 | 8776 |
| 0000036060 | 0500 | 0000 | 0D00 | 5F5F | 6F64 | 7673 | 7265 | 696D |
| 0000036100 | 6F6E | 8C72 | 0501 | 0000 | 0800 | 5F5F | 6970 | 6570 |
| 0000036120 | 6863 | 0292 | 0005 | 0000 | 5F08 | 6E65 | 6976 | 6F72 |
| 0000036140 | 8C6E | 0500 | 0000 | 0800 | 5F5F | 736F | 6966 | 656C |
| 0000036160 | 0088 | 0005 | 0000 | 5F08 | 6F5F | 6D73 | 646F | 4D65 |
| 0000036200 | 0101 | 0000 | 0800 | 5F5F | 6E69 | 7469 | 7066 | 0866 |
| 0000036220 | 0005 | 0000 | 5F08 | 665F | 6970 | 696E | 7274 | 0102 |
| 0000036240 | 0000 | 0800 | 5F5F | 6574 | 6D72 | 7066 | 0296 | 0005 |
| 0000036260 | 0000 | 5F08 | 705F | 6D67 | 7470 | 9B72 | 0101 | 0000 |
| 0000036300 | 0800 | 5F5F | 5F63 | 7865 | 7469 | 0088 | 0005 | 0000 |
| 0000036320 | 5F09 | 645F | 736F | 6F6D | 6564 | 0086 | 0005 | 0000 |
| 0000036340 | 5F09 | 6F5F | 6D73 | 6A61 | 726F | 0087 | 0005 | 0000 |
| 0000036360 | 5F09 | 6F5F | 6D73 | 6E69 | 726F | 0205 | 0001 | 0000 |
| 0000036400 | 5F0A | 6C5F | 636F | 656B | 6978 | 8474 | 0500 | 0000 |
| 0000036420 | 0A00 | 5F5F | 6D75 | 7361 | 766B | 6C61 | 0272 | 0001 |

THU MAR 14 17:20:06 1991 BIP.EXE PAGE 16, LINE 886

| | | | | | | | | |
|---|---|---|---|---|---|---|---|---|
| 0000036440 | 0000 | 5F0A | 635F | 6574 | 6D72 | 7573 | 9C62 | 0502 |
| 0000036460 | 0000 | 0A00 | 5F5F | 7865 | 7469 | 745F | 6469 | 007A |
| 0000036500 | 0005 | 0000 | 5F05 | 665F | 6361 | 0182 | 0001 | 0000 |
| 0000036520 | 5F05 | 7865 | 7469 | 0294 | 0001 | 0000 | 5F0E | 465F |
| 0000036540 | 5F46 | 534D | 4247 | 4E41 | 454E | 9E52 | 0502 | 0000 |
| 0000036560 | 0900 | 5F5F | 6461 | 6762 | 736D | 7667 | 0098 | 0100 |
| 0000036600 | 0900 | 5F5F | 6361 | 7472 | 736D | B667 | 0102 | 0000 |
| 0000036620 | 0800 | 5F5F | 7066 | 7274 | 7061 | 02BC | 0001 | 0000 |
| 0000036640 | 5F0B | 6E5F | 6C75 | 636C | 6568 | 6B63 | 0042 | 0005 |
| 0000036660 | 0000 | 5F0B | 615F | 756E | 6C6C | 6973 | 657A | 02E0 |
| 0000036700 | 0001 | 0000 | 5F09 | 735F | 7465 | 7261 | 7667 | 0468 |
| 0000036720 | 0001 | 0000 | 5F09 | 735F | 7465 | 6E65 | 7076 | 050C |
| 0000036740 | 0001 | 0000 | 5F0B | 4E5F | 534D | 5F47 | 4554 | 5458 |
| 0000036760 | 053C | 0001 | 0000 | 5FDC | 4E5F | 534D | 5F47 | 5257 |
| 0000037000 | 5449 | 7245 | 0105 | 0000 | 0A00 | 5F5F | 7473 | 6164 |
| 0000037020 | 6C6C | 636F | 0594 | 0001 | 0000 | 5F07 | 616D | 6C6C |
| 0000037040 | 636F | 0599 | 0001 | 0000 | 5F0A | 616D | 6C6C | 636F |
| 0000037060 | 6C5F | D06B | 0105 | 0000 | 0C00 | 5F5F | 6D66 | 6C61 |
| 0000037100 | 6F6C | 5F63 | 6B6C | 059E | 0001 | 0000 | 5F07 | 665F |
| 0000037120 | 7266 | 6565 | 05B1 | 0001 | 0000 | 5F09 | 665F | 616D |
| 0000037140 | 6C6C | 636F | 059E | 0001 | 0000 | 5F0A | 665F | 7266 |
| 0000037160 | 6565 | 6C5F | A86B | 0502 | 0000 | 0700 | 5F5F | 6866 |
| 0000037200 | 6165 | 4E70 | 0106 | 0000 | 0900 | 5F5F | 6E69 | 7469 |
| 0000037220 | 6573 | 8267 | 0106 | 0000 | 0900 | 5F5F | 696C | 6B6E |
| 0000037240 | 6573 | B867 | 0106 | 0000 | 0B00 | 5F5F | 6573 | 7261 |
| 0000037260 | 6863 | 6573 | C367 | 0107 | 0000 | 0800 | 5F5F | 6E69 |
| 0000037300 | 7363 | 6765 | 0734 | 0001 | 0000 | 5F09 | 675F | 6F72 |
| 0000037320 | 7377 | 6765 | 07F6 | 0001 | 0000 | 5F0A | 665F | 6E69 |
| 0000037340 | 6C64 | 7361 | B674 | 0502 | 0000 | 0A00 | 5F5F | 6D61 |
| 0000037360 | 6C62 | 736B | 7A69 | 0816 | 0001 | 0000 | 5F08 | 6E5F |
| 0000037400 | 7765 | 6573 | 9867 | 0108 | 0000 | 0600 | 5F5F | 6F6C |
| 0000037420 | 6B63 | 08DA | 0001 | 0000 | 5F07 | 6C5F | 636F | 666B |
| 0000037440 | 086C | 0001 | 0000 | 5F0D | 755F | 6C6E | 636F | 5F6B |
| 0000037460 | 6966 | 656C | 0848 | 0001 | 0000 | 5F0D | 6C5F | 636F |
| 0000037500 | 5F6B | 7473 | 6572 | 6D61 | 08BE | 0001 | 0000 | 5F08 |
| 0000037520 | 755F | 6C6E | 636F | EA6B | 0108 | 0000 | 0900 | 5F5F |
| 0000037540 | 6E75 | 6F6C | 6B63 | 5466 | 0108 | 0000 | 0F00 | 5F5F |
| 0000037560 | 6E75 | 6F6C | 6B63 | 735F | 7274 | 6165 | 786D | 0108 |
| 0000037600 | 0000 | 0A00 | 5F5F | 6177 | 7469 | 6F6C | 6B63 | 0860 |
| 0000037620 | 0001 | 0000 | 5F0B | 6C5F | 636F | 5F6B | 6966 | 656C |
| 0000037640 | 0226 | 0004 | 032F | 5F0D | 6670 | 5F6E | 6C6F | 6664 |
| 0000037660 | 6172 | 656D | 0000 | 0004 | 00C0 | 5F04 | 6168 | 0862 |
| 0000037700 | 0402 | 9800 | 0503 | 715F | 736D | 2267 | 0402 | C000 |
| 0000037720 | 0400 | 685F | 716D | 022A | 0004 | 00C0 | 5FD7 | 7768 |
| 0000037740 | 646E | 7842 | 0004 | 0004 | 00C0 | 5F0D | 7842 | 685F |
| 0000037760 | 6E77 | 4664 | 6172 | 656D | 18F4 | 0001 | 06C2 | 420A |
| 0000040000 | 5F78 | 6977 | 706E | 6F72 | 7A63 | 0117 | C000 | 0506 |
| 0000040020 | 6D5F | 6961 | 736E | 0122 | D600 | 0E06 | 5246 | 4D41 |
| 0000040040 | 5F45 | 4E57 | 5F44 | 5250 | 434F | 0378 | 0005 | 0086 |
| 0000040060 | 5F04 | 6573 | 7C6D | 0503 | 8600 | 0800 | 735F | 6F74 |
| 0000040100 | 7370 | 6D65 | 08FA | 0001 | 0000 | 5F08 | 7066 | 6972 |
| 0000040120 | 746E | 0866 | 0400 | 0000 | 0700 | 5F5F | 7562 | 6966 |
| 0000040140 | 106E | 0504 | 0000 | 0500 | 5F5F | 6F69 | F062 | 0505 |
| 0000040160 | 0000 | 0600 | 5F5F | 6F69 | 3262 | 07D0 | 0005 | 0000 |
| 0000040200 | 5F09 | 6C5F | 7361 | 6974 | 626F | 0954 | 0001 | 0000 |
| 0000040220 | 5F07 | 7473 | 6372 | 7970 | 098A | 0001 | 0000 | 5F07 |
| 0000040240 | 7473 | 6C72 | 6E65 | 09A2 | 0001 | 0000 | 5F08 | 7473 |
| 0000040260 | 6E72 | 6D63 | DE70 | 0109 | 0000 | 0D00 | 5F5F | 6562 |
| 0000040300 | 6967 | 746E | 7268 | 6165 | BF64 | 010A | 0000 | 0B00 |

```
THU MAR 14 17:20:06 1991  BIP.EXE  PAGE 17, LINE 945

0000040320  5F5F  6E65  7464  7268  6165  EC64  010A  0000
0000040340  0800  735F  7270  6E69  6674  0C0C  0001  0000
0000040360  5F0B  5F5F  6F64  6573  7272  6F6E  0C14  0001
0000040400  0000  5F07  655F  7272  6F6E  0BC5  0001  0000
0000040420  5F08  645F  736F  6572  AC74  010B  0000  0900
0000040440  5F5F  6F64  7273  7465  2066  010C  0000  0800
0000040460  5F5F  6C66  6273  6675  0D7E  0001  0000  5F07
0000040500  665F  6274  6675  0D06  0001  0000  5F07  735F
0000040520  6274  6675  0DD6  0001  0000  5F08  6F5F  7475
0000040540  7570  C574  0112  0000  0800  665F  6572  5F65
0000040560  6B6C  12C0  0001  0000  5F05  7266  6565  12CA
0000040600  0001  0000  5F0B  675F  7465  6974  7464  6261
0000040620  083E  0005  0000  5F0B  745F  6469  6174  6D62
0000040640  7861  0840  0005  0000  5F0C  615F  6C61  7374
0000040660  6B74  766F  4472  0113  0000  0800  5F5F  6863
0000040700  736B  6B74  1344  0001  0000  5F0A  615F  6346
0000040720  6B68  7473  446B  0508  0000  0800  5F5F  6663
0000040740  756C  6873  1376  0001  0000  5F08  675F  7465
0000040760  7562  0866  0114  0000  0B00  5F5F  6666  756C
0000041000  6873  6C5F  626B  0113  0000  0700  665F  6C66
0000041020  7375  7468  0114  0000  0900  665F  756C  6873
0000041040  6C61  FA6C  0114  0000  0600  6C5F  6573  6B65
0000041060  14F0  0001  0000  5F0A  6C5F  6573  6B65  6C5F
0000041100  726B  0115  0000  0600  775F  6972  6574  1568
0000041120  0001  0000  5F0A  775F  6972  6574  6C5F  466B
0000041140  0508  0000  0D00  5F5F  6663  746C  7663  5F74
0000041160  6174  6262  0508  0000  0800  5F5F  7361  7A69
0000041200  4365  0863  0005  0000  5F08  615F  6973  657A
0000041220  6044  0508  0000  0B00  5F5F  6973  6967  746E
0000041240  666F  5E66  0508  0000  0B00  5F5F  6973  6967
0000041260  746E  6573  5C67  0117  0000  0B00  735F  6174
0000041300  6B63  7661  6961  016C  000A  8075  8183  6400
0000041320  8300  0201  0101  8000  0101  8000  0101  8000
0000041340  0101  8000  0101  8000  0101  8000  0101  8000
0000041360  1301  7900  0240  0983  8302  020A  0782  505F
0000041400  494F  544E  694C  0701  7F00  8283  8300  0082
0000041420  0901  7F00  0182  0078  0182  0479  0101  8000
0000041440  0101  8000  0101  8000  0101  8000  0101  8000
0000041460  0101  8000  1401  7900  8085  0400  1283  8302
0000041500  0213  0682  525F  4345  4C54  0169  000D  837F
0000041520  0082  8283  8300  0082  8283  0100  0023  827F
0000041540  7805  654C  7466  8200  7907  6F42  7474  6D6F
0000041560  8204  7806  6952  6867  0874  0482  5479  706F
0000041600  010C  0001  0180  0001  0180  0001  0180  0001
0000041620  0180  0001  0180  0001  0180  0001  0180  0001
*
0000041700  0180  0001  0180  0001  0180  0001  0180  0005
0000041720  6878  8083  0100  0001  0180  0001  0180  0001
0000041740  0180  0001  0180  0001  0180  0005  0878  8083
0000041760  0100  0001  0180  0001  0180  0001  0180  0001
0000042000  0180  0001  0180  0001  0180  0001  0180  0001
*
0000043200  0180  0001  0180  0001  0180  0015  4079  8306
0000043220  02D5  D683  8202  5F09  4950  4550  4E49  4F46
0000043240  0169  0013  837F  0085  8583  8300  0084  8483
0000043260  8300  0084  2D83  0102  003A  827F  6305  4F62
0000043300  7475  8200  6304  4962  026E  0982  6263  614D
0000043320  4978  736E  0474  0982  6263  7543  4972  736E
0000043340  0574  0682  6263  614E  656D  8206  7306  4E7A
```

THU MAR 14 17:20:06 1991 BIP.EXE PAGE 18, LINE 1004

```
0000043360  6D61  0765  0101  8000  0101  8000  0101  8000
0000043400  0101  8000  0101  8000  0101  8000  0101  8000
*
0000044120  0101  8000  0701  7A00  8373  0330  0082  0A01
0000044140  7500  8380  00C0  0473  3183  0103  000D  837F
0000044160  00C0  8583  8300  00C0  C083  0100  0001  0180
0000044200  0001  0180  0001  0180  0001  0180  0001  0180
*
0000044460  0001  0180  0012  8579  0090  8307  0361  6283
0000044500  8203  5F04  5753  6950  1601  7F00  8583  8300
0000044520  0081  8183  8300  0081  8183  8300  00C0  C083
0000044540  0100  0032  827F  6602  0073  0282  7963  8202
0000044560  6302  0478  0182  0679  0182  0878  1082  7768
0000044600  646E  6E49  6573  7472  6542  6968  646E  820A
0000044620  6804  6E77  0E64  0101  8000  0101  8000  0101
0000044640  8000  0101  8000  0101  8000  0101  8000  0101
*
0000045140  8000  0101  8000  0101  8000  1301  7900  D085
0000045160  0600  9983  8303  039A  0582  515F  534D  6947
0000045200  1301  7F00  C083  8300  0085  C083  8300  00C0
0000045220  8683  8300  0208  2701  7F00  0482  7768  646E
0000045240  8200  6D03  6773  8204  6D03  3170  8206  6D03
0000045260  3270  820A  7404  6D69  0E65  0382  7470  126C
0000045300  0101  8000  0101  8000  0101  8000  0101  8000
*
0000046440  0101  8000  1801  7900  3085  0F02  3583  8304
0000046460  0436  0A82  545F  4152  4B43  4E49  4F46  0169
0000046500  002E  837F  0081  8183  8300  0081  8183  8300
0000046520  0081  8183  8300  0211  1183  8302  0208  0883
0000046540  8302  0085  8583  8300  0085  8583  8300  0085
0000046560  AB01  7F00  0882  7863  6F42  6472  7265  8200
0000046600  6308  4279  726F  6564  0272  0682  7863  7247
0000046620  6469  8204  6306  4779  6972  0664  0A82  7863
0000046640  654B  6279  616F  6472  8208  630A  4B79  7965
0000046660  6F62  7261  0A64  0882  6372  546C  6172  6B63
0000046700  820C  720B  6C63  6F42  6E75  6164  7972  821C
0000046720  700F  6C74  694D  546E  6172  6B63  6953  657A
0000046740  822C  700F  6C74  614D  5478  6172  6B63  6953
0000046760  657A  8234  6602  3C73  0682  7863  654C  7466
0000047000  823E  6308  4279  746F  6F74  406D  0782  7863
0000047020  6952  6867  4274  0582  7963  6F54  4470  0101
0000047040  8000  0701  7A00  8373  0434  0082  0101  8000
0000047060  0101  8000  0101  8000  0101  8000  0101  8000
*
0000047520  0101  8000  0701  7800  0085  8320  0080  0101
0000047540  8000  0101  8000  0101  8000  0101  8000  0101
*
0000050300  8000  0101  8000  0101  8000  1201  7900  0240
0000050320  E083  8304  04E1  0682  535F  5A49  4C45  0169
0000050340  0007  837F  0082  8283  0100  000B  827F  6302
0000050360  0078  0282  7963  0104  0001  0180  0001  0180
0000050400  0001  0180  0001  0180  0001  0180  0001  0180
*
0000052220  0001  0180  0007  737A  C083  8200  0100  0001
0000052240  0180  0001  0180  0001  0180  0001  0180  0001
*
0000052340  0180  0001  0180  0012  6079  8305  05DD  DE83
0000052360  8205  5F06  6F69  7562  6966  1001  7F00  C083
0000052400  8300  0081  C083  8300  0080  8083  0100  0027
```

THU MAR 14 17:20:06 1991 BIP.EXE PAGE 19, LINE 1063

```
0000052420  827F  5F04  7470  0072  0482  635F  746E  8204
0000052440  5F05  6162  6573  8206  5F05  6C66  6761  820A
0000052460  5F05  6966  656C  010B  0005  0078  DC83  0105
0000052500  0001  0180  0001  0180  0001  0180  0001  0180
*
0000052540  0001  0180  0001  0180  000A  8075  8183  6400
0000052560  8300  0201  0101  8000  0101  8000  0101  8000
0000052600  0101  8000  0101  8000  0101  8000  0101  8000
*
0000053220  0A01  7500  8380  0200  0064  0183  0102  0001
0000053240  0180  0001  0180  0001  0180  0001  0180  0001
*
0000053340  0180  0001  0180  0001  0180  000A  8075  0083
0000053360  6402  8301  0647  0401  7F00  C083  0100  0001
0000053400  0180  0001  0180  0001  0180  0001  0180  0001
*
0000054200  0180  0001  0180  0001  0180  0007  8578  0258
0000054220  8083  0100  0007  8578  0320  8083  0100  0005
0000054240  6878  8083  0100  0001  0180  0001  0180  0001
0000054260  0180  000A  8075  8183  6400  8302  06B2  0701
0000054300  7F00  C083  8300  0081  0A01  7500  8380  0200
0000054320  0264  B483  0106  0007  837F  00C0  C083  0100
0000054340  000A  8075  0083  6402  8301  06B6  0401  7F00
0000054360  3883  0104  000A  8075  0083  6402  8302  06B8
0000054400  0701  7F00  C083  8300  0081  0A01  7500  8380
0000054420  0085  0264  BA83  0106  0007  837F  00C0  8183
0000054440  0100  000A  8075  8583  6400  8302  06BC  0701
0000054460  7F00  C083  8300  00C0  0101  8000  0101  8000
0000054500  0701  7F00  8183  8300  05C9  0A01  7500  8380
0000054520  0081  0264  BF83  0106  000D  837F  00C0  8583
0000054540  8300  00C0  C083  0100  000A  8075  C083  7300
0000054560  8304  06C1  0501  7800  8310  0084  0101  8000
0000054600  0501  7800  8318  0080  0101  8000  0701  7800
0000054620  3085  8301  0080  0101  8000  0401  7F00  8583
0000054640  0100  000A  8075  8183  6400  8301  06C9  0A01
0000054660  7500  8380  0081  0064  0183  0102  0005  5078
0000054700  8083  0100  0007  8578  00E8  8083  0100  0004
0000054720  837F  00C0  0A01  7500  8380  0200  0164  CE83
0000054740  0106  0007  837F  00C0  8183  0100  000A  8075
0000054760  8183  6400  8302  06D0  0501  7800  8330  0080
0000055000  0A01  7500  8380  0200  0064  0183  0102  000A
0000055020  8075  0083  6402  8300  0201  0D01  7F00  C083
0000055040  8300  0085  C083  8300  00C0  0A01  7500  8380
0000055060  00C0  0473  D583  0106  0007  837F  00C0  C083
0000055100  0100  000A  8075  0083  6402  8302  06D7  0401
0000055120  7F00  3883  0104  000A  8075  0083  6402  8301
0000055140  06D9  0401  7F00  C083  0100  000A  8075  0083
0000055160  6402  8301  06DB  0701  7F00  C083  8300  0081
0000055200  0A01  7500  8380  0200  0264  DD83  0106  0007
0000055220  837F  00C0  8183  0100  000A  8075  8583  6400
0000055240  8302  06DF  0501  7800  8320  0080  0501  7800
0000055260  8338  0080  0701  7F00  C083  8300  00C0  0A01
0000055300  7500  8380  0085  0264  E383  0506  0111  0000
0000055320  1300  7A01  C017  7A06  1001  6F00  0001  0400
0000055340  6D04  6961  0A6E  0604  8100  0400  7261  6367
0000055360  040A  0008  05C9  6104  6772  0176  1902  F401
0000055400  C218  9E06  1606  9000  0006  0400  420A  5F78
0000055420  6977  706E  6F72  0A63  1004  C000  0400  7768
0000055440  646E  0409  000E  0085  6D03  6773  0409  000A
```

THU MAR 14 17:20:06 1991 BIP.EXE PAGE 20, LINE 1122

| | | | | | | | | |
|---|---|---|---|---|---|---|---|---|
| 0000055460 | 00C0 | 6D03 | 3170 | 0409 | 0006 | 00C0 | 6D03 | 3270 |
| 0000055500 | 0409 | FFF2 | 00C0 | 6803 | 6364 | 040A | FFF6 | 04DF |
| 0000055520 | 7304 | 7A69 | 126C | BC05 | 0503 | C300 | 0A06 | 4262 |
| 0000055540 | 616C | 6B6E | 6543 | 6C6C | 0513 | 0E0E | 0005 | 00C0 |
| 0000055560 | 680B | 6E77 | 4864 | 6373 | 6F72 | 6C6C | 0513 | 0E0A |
| 0000055600 | 0005 | 00C0 | 680B | 6E77 | 5664 | 6373 | 6F72 | 6C6C |
| 0000055620 | 050B | 0E12 | 0005 | 00C0 | 6803 | 7370 | 0201 | 011A |
| 0000055640 | 1F92 | 06CA | 0039 | 0010 | 002E | 0000 | 0B04 | 7262 |
| 0000055660 | 6B6F | 6E65 | 705F | 7069 | 0865 | 0604 | 8500 | 0200 |
| 0000055700 | 7068 | 0408 | FFFC | 0085 | 7202 | 0863 | F404 | D4FF |
| 0000055720 | 0202 | 6970 | 0201 | 0118 | 1FCB | 06CB | 0098 | 0010 |
| 0000055740 | 008D | 0000 | 0904 | 616D | 656B | 705F | 7069 | 0865 |
| 0000055760 | FA04 | 85FF | 0200 | 6372 | 040B | FFF6 | 00C0 | 7305 |
| 0000056000 | 6174 | 6B63 | 0409 | FFFC | 0085 | 7403 | 6469 | 0201 |
| 0000056020 | 0117 | 2063 | 06CF | 0116 | 0010 | 010B | 0000 | 0804 |
| 0000056040 | 6962 | 5F70 | 6572 | 6461 | 0407 | 0006 | 00C0 | 7001 |
| 0000056060 | 0408 | FFFC | 0085 | 7202 | 0863 | FA04 | 85FF | 0200 |
| 0000056100 | 7375 | 0201 | 0118 | 2179 | 06D1 | 0039 | 0010 | 002E |
| 0000056120 | 0000 | 0904 | 6C63 | 736F | 5F65 | 736D | 0957 | 0604 |
| 0000056140 | C000 | 0300 | 7562 | 0966 | 0A04 | 8100 | 0300 | 656C |
| 0000056160 | 016E | 1A02 | B201 | D321 | 3906 | 1000 | 2E00 | 0000 |
| 0000056200 | 0400 | 690B | 736E | 7265 | 5F74 | 616D | 6B72 | 0201 |
| 0000056220 | 011B | 21EB | 06D4 | 0088 | 0010 | 007D | 0000 | 0C04 |
| 0000056240 | 7274 | 6361 | 5F6B | 6373 | 6F72 | 6C6C | 0409 | FFFC |
| 0000056260 | 0081 | 7203 | 776F | 0409 | FFFA | 0081 | 6303 | 6C6F |
| 0000056300 | 0201 | 011D | 2273 | 06D6 | 0093 | 0016 | 0085 | 0000 |
| 0000056320 | 0E04 | 7266 | 6D61 | 5F65 | 6E77 | 5F64 | 7270 | 636F |
| 0000056340 | 040A | 0010 | 00C0 | 6804 | 6E77 | 0964 | 0E04 | 8500 |
| 0000056360 | 0300 | 736D | 0967 | 0A04 | C000 | 0300 | 706D | 0931 |
| 0000056400 | 0604 | C000 | 0300 | 706D | 0832 | FC04 | 85FF | 0200 |
| 0000056420 | 6372 | 0201 | 011D | 2306 | 06D8 | 0045 | 0010 | 003A |
| 0000056440 | 0000 | 0E04 | 6F64 | 745F | 6172 | 6B63 | 665F | 6172 |
| 0000056460 | 656D | 040A | 0006 | 00C0 | 6804 | 6E77 | 1164 | 0A04 |
| 0000056500 | C000 | 0B00 | 7274 | 6361 | 5F6B | 6C66 | 6761 | 1273 |
| 0000056520 | 1605 | 050E | 3400 | 0A04 | 7274 | 6361 | 5F6B | 6E69 |
| 0000056540 | 6F66 | 0201 | 011F | 234B | 06DA | 0073 | 0010 | 0068 |
| 0000056560 | 0000 | 1004 | 7571 | 7265 | 5F79 | 7274 | 6361 | 5F6B |
| 0000056600 | 6E69 | 6F66 | 0409 | 0006 | 0438 | 7003 | 6974 | 040C |
| 0000056620 | FFFC | 0085 | 6606 | 6D5F | 766F | 0165 | 1B02 | BE01 |
| 0000056640 | DC23 | 9F06 | 1000 | 9400 | 0000 | 0400 | 720C | 7365 |
| 0000056660 | 7A69 | 5F65 | 7266 | 6D61 | 0F65 | 0604 | C000 | 0900 |
| 0000056700 | 7768 | 646E | 7266 | 6D61 | 0965 | EE04 | 11FF | 0302 |
| 0000056720 | 6372 | 096C | DC04 | 60FF | 0303 | 7773 | 0170 | 1902 |
| 0000056740 | 5D01 | DE24 | 3E06 | 1000 | 3300 | 0000 | 0400 | 620A |
| 0000056760 | 7069 | 6F5F | 7475 | 7570 | 0774 | 0604 | C000 | 0100 |
| 0000057000 | 0973 | 0A04 | 8100 | 0300 | 656C | 016E | 1A02 | 9B01 |
| 0000057020 | E024 | DF06 | 1000 | D400 | 0000 | 0400 | 620B | 7069 |
| 0000057040 | 635F | 6D6F | 616D | 646E | 0407 | 0006 | 00CD | 7301 |
| 0000057060 | 0409 | 000A | 0081 | 6C03 | 6E65 | 040C | FF9A | 06AC |
| 0000057100 | 6306 | 646D | 7473 | 0B72 | 9604 | C0FF | 0500 | 7473 |
| 0000057120 | 7261 | 0174 | 1902 | 7A01 | E425 | 9206 | 1000 | 8700 |
| 0000057140 | 0000 | 0400 | 670A | 7465 | 635F | 646D | 7473 | 0B72 |
| 0000057160 | 0604 | C000 | 0500 | 7473 | 7261 | 0C74 | 0A04 | C000 |
| 0000057200 | 0600 | 6D63 | 7364 | 7274 | 0409 | FF92 | 06AC | 6203 |
| 0000057220 | 6675 | 0408 | FFF6 | 00C0 | 6202 | 0770 | FA04 | C0FF |
| 0000057240 | 0100 | 0170 | 1402 | 2605 | 0402 | 2F00 | 0CD3 | 6670 |
| 0000057260 | 5F6E | 6C6F | 6664 | 6172 | 656D | 0512 | 09E8 | 0005 |
| 0000057300 | 0082 | 630A | 4378 | 6E6F | 7473 | 6E61 | 1274 | EC05 |
| 0000057320 | 0509 | 8200 | 0A00 | 7963 | 6F43 | 736E | 6174 | 746E |

THU MAR 14 17:20:06 1991 BIP.EXE PAGE 21, LINE 1181

| | | | | | | | | |
|---|---|---|---|---|---|---|---|---|
| 0000057340 | 0D05 | 0000 | 001A | 050C | 0410 | 0005 | 05DF | 5F04 |
| 0000057360 | 6F69 | 0F62 | 0405 | 0503 | C000 | 0700 | 616D | 6B72 |
| 0000057400 | 7473 | 0E72 | 0805 | 0503 | 8100 | 0600 | 7562 | 6C66 |
| 0000057420 | 6E65 | 0512 | 030A | 0005 | 0081 | 740A | 6172 | 6B63 |
| 0000057440 | 665F | 616C | 0C67 | F005 | 0509 | 8500 | 0400 | 7668 |
| 0000057460 | 7370 | 050A | 09FC | 0005 | 0085 | 6802 | 1670 | 0C05 |
| 0000057500 | 0503 | 8100 | 0E00 | 6970 | 6570 | 635F | 6E6F | 656E |
| 0000057520 | 7463 | 6465 | 050D | 030E | 0005 | 0081 | 7005 | 6972 |
| 0000057540 | 746E | 050D | 09FA | 0005 | 0081 | 6C05 | 6E69 | 7365 |
| 0000057560 | 050B | 0A06 | 0005 | 0483 | 6203 | 6675 | 050B | 0E08 |
| 0000057600 | 0005 | 0081 | 7203 | 776F | 050B | 0E06 | 0005 | 0081 |
| 0000057620 | 6303 | 6C6F | 0511 | 0310 | 0005 | 06AC | 6209 | 7069 |
| 0000057640 | 745F | 7469 | 656C | 0510 | 0374 | 0005 | 0086 | 7708 |
| 0000057660 | 6972 | 6574 | 6573 | 0B6D | 7805 | 0503 | 8600 | 0300 |
| 0000057700 | 6573 | 0F6D | 7C05 | 0503 | 8600 | 0700 | 7473 | 706F |
| 0000057720 | 6573 | 0B6D | 0005 | 0400 | C000 | 0300 | 6168 | 0C62 |
| 0000057740 | 0805 | 0402 | 9800 | 0403 | 6D71 | 6773 | 050B | 0222 |
| 0000057760 | 0004 | 00C0 | 6803 | 716D | 050E | 022A | 0004 | 00C0 |
| 0000060000 | 6806 | 6E77 | 4264 | 1478 | 0405 | 0400 | C000 | 0C00 |
| 0000060020 | 7842 | 685F | 6E77 | 4664 | 6172 | 656D | 0513 | 09F6 |
| 0000060040 | 0005 | 0081 | 730B | 7348 | 7263 | 6C6F | 506C | 736F |
| 0000060060 | 0513 | 09F8 | 0005 | 0081 | 730B | 7356 | 7263 | 6C6F |
| 0000060100 | 506C | 736F | 050E | 0A02 | 0005 | 0081 | 6306 | 4378 |
| 0000060120 | 6168 | 0E72 | 0405 | 050A | 8100 | 0600 | 7963 | 6843 |
| 0000060140 | 7261 | 0510 | 09F2 | 0005 | 0081 | 6308 | 4378 | 696C |
| 0000060160 | 6E65 | 1074 | F405 | 0509 | 8100 | 0800 | 7963 | 6C43 |
| 0000060200 | 6569 | 746E | 050A | 09FE | 0005 | 0081 | 7702 | 0A78 |
| 0000060220 | 0005 | 050A | 8100 | 0200 | 7977 | 0515 | 0380 | 0005 |
| 0000060240 | 0227 | 730D | 437A | 696C | 6E65 | 4374 | 616C | 7373 |
| 0000060260 | 0514 | 038E | 0005 | 0086 | 660C | 466C | 6172 | 656D |
| 0000060300 | 6C46 | 6761 | 0573 | 6962 | 2E70 | 0163 | E300 | B400 |
| 0000060320 | 7A00 | B517 | 8A00 | B717 | 9000 | B817 | A400 | BA17 |
| 0000060340 | C300 | BE17 | E600 | C117 | 1B00 | C418 | 2D00 | C618 |
| 0000060360 | 5300 | C718 | 7C00 | C918 | 9800 | CA18 | A100 | CC18 |
| 0000060400 | AA00 | CD18 | BD00 | CE18 | D000 | CF18 | E300 | D018 |
| 0000060420 | E900 | D918 | F400 | E118 | 0A00 | E519 | 1000 | E619 |
| 0000060440 | 2100 | E819 | 3300 | E919 | 5D00 | EA19 | 7200 | EB19 |
| 0000060460 | 8100 | EE19 | 9200 | F019 | B600 | F619 | 0600 | FC1A |
| 0000060500 | 1D00 | 001A | 3D01 | 041A | 5D01 | 051A | 7401 | 061A |
| 0000060520 | 7901 | 091A | 8201 | 0D1A | 8801 | 0E1A | A301 | 101A |
| 0000060540 | AC01 | 111A | B101 | 121A | BA01 | 131A | D001 | 161A |
| 0000060560 | D301 | 171A | E301 | 181A | ED01 | 191A | F201 | 1A1A |
| 0000060600 | FB01 | 1D1A | 0401 | 1E1B | 2501 | 1F1B | 2F01 | 201B |
| 0000060620 | 3401 | 251B | 3D01 | 261B | 4301 | 281B | 4901 | 291B |
| 0000060640 | 5401 | 2B1B | 5F01 | 2C1B | 6E01 | 311B | 7801 | 331B |
| 0000060660 | 9A01 | 341B | AD01 | 381B | B801 | 3A1B | DB01 | 3C1B |
| 0000060700 | EC01 | 3E1B | 0601 | 431C | 0F01 | 451C | 1501 | 461C |
| 0000060720 | 1901 | 491C | 1C01 | 4A1C | 2001 | 4D1C | 2301 | 4E1C |
| 0000060740 | 2801 | 511C | 2B01 | 521C | 3001 | 551C | 3301 | 561C |
| 0000060760 | 3901 | 571C | 3C01 | 581C | 6101 | 5A1C | 8201 | 5D1C |
| 0000061000 | A301 | 5F1C | B401 | 611C | CF01 | 651C | D801 | 671C |
| 0000061020 | DE01 | 681C | E201 | 6B1C | E501 | 6C1C | E901 | 6F1C |
| 0000061040 | EC01 | 701C | F801 | 731C | FB01 | 741C | 0701 | 771D |
| 0000061060 | 0A01 | 781D | 1001 | 791D | 1301 | 7B1D | 3801 | 7D1D |
| 0000061100 | 5A01 | 801D | 7B01 | 821D | 8C01 | 841D | A701 | 871D |
| 0000061120 | B001 | 8A1D | B601 | 8F1D | D501 | 901D | F401 | 911D |
| 0000061140 | 1A01 | 941E | 1D01 | 951E | 3401 | 961E | 4B01 | 971E |
| 0000061160 | 5801 | 981E | 6A01 | 991E | 7701 | 9C1E | 8001 | 9D1E |
| 0000061200 | 8D01 | 9E1E | 9601 | 9F1E | A301 | A21E | AC01 | A31E |

THU MAR 14 17:20:06 1991 BIP.EXE PAGE 22, LINE 1240

| | | | | | | | | |
|---|---|---|---|---|---|---|---|---|
| 0000061220 | B601 | A41E | BF01 | A51E | CB01 | A61E | D701 | AA1E |
| 0000061240 | E001 | AB1E | F401 | AD1E | F701 | AE1E | 6701 | AF1F |
| 0000061260 | 8401 | B61F | 9201 | BA1F | A201 | BB1F | B601 | BC1F |
| 0000061300 | C001 | C41F | CB01 | C61F | DB01 | CD1F | E301 | CF1F |
| 0000061320 | 0401 | D020 | 0D01 | D120 | 1D01 | D420 | 2701 | D520 |
| 0000061340 | 4301 | D620 | 4C01 | D820 | 5201 | D920 | 5801 | E220 |
| 0000061360 | 6301 | E620 | 7301 | E820 | 7D01 | E920 | 8601 | EA20 |
| 0000061400 | 9701 | ED20 | 9D01 | F120 | A001 | F220 | A901 | F320 |
| 0000061420 | C901 | F520 | D601 | F620 | E901 | F720 | F201 | F820 |
| 0000061440 | 1001 | FA21 | 1D01 | FB21 | 3501 | FC21 | 3E01 | FD21 |
| 0000061460 | 4E01 | FE21 | 6501 | 0221 | 6B02 | 0321 | 6E02 | 2121 |
| 0000061500 | 7902 | 2221 | 8902 | 2321 | A702 | 2B21 | B202 | 2C21 |
| 0000061520 | C202 | 2D21 | E002 | 3521 | EB02 | 3721 | FB02 | 3821 |
| 0000061540 | 0E02 | 3A22 | 2402 | 3B22 | 5602 | 3C22 | 6202 | 3D22 |
| 0000061560 | 6802 | 4C22 | 7302 | 4F22 | 8902 | 5122 | 8F02 | 5222 |
| 0000061600 | B002 | 5322 | BE02 | 5522 | C602 | 5622 | C902 | 5722 |
| 0000061620 | D702 | 5822 | F802 | 6122 | 0602 | 6923 | 1602 | 6A23 |
| 0000061640 | 2D02 | 6B23 | 4002 | 7523 | 4B02 | 8523 | 5B02 | 8623 |
| 0000061660 | 7702 | 8723 | 7F02 | 8823 | 9A02 | 9123 | B302 | 9E23 |
| 0000061700 | BE02 | A323 | CE02 | A423 | E602 | A623 | E902 | A723 |
| 0000061720 | F302 | A923 | 0202 | AA24 | 0C02 | AC24 | 1B02 | B124 |
| 0000061740 | 2D02 | B224 | 5202 | BF24 | 5D02 | C124 | 6D02 | C224 |
| 0000061760 | 7E02 | C324 | 9002 | D324 | 9B02 | D624 | AB02 | D724 |
| 0000062000 | B402 | D924 | BA02 | DA24 | E502 | DE24 | EB02 | DF24 |
| 0000062020 | FA02 | E124 | 0702 | E225 | 2202 | E325 | 3B02 | E525 |
| 0000062040 | 5202 | E725 | 5502 | E825 | 5B02 | E925 | 6902 | EA25 |
| 0000062060 | 6F02 | FB25 | 7A02 | FE25 | 8A02 | FF25 | 9302 | 0025 |
| 0000062100 | BD03 | 0125 | CF03 | 0225 | DB03 | 0425 | E103 | 0525 |
| 0000062120 | E803 | 0625 | FB03 | 0725 | 0103 | 0026 | 6C0B | 696C |
| 0000062140 | 6362 | 746D | 6C2E | 6269 | 6F07 | 3273 | 6C2E | 6269 |
| 0000062160 | 7008 | 6962 | 2E70 | 696C | 5462 | 0100 | 0201 | 0800 |
| 0000062200 | 0000 | 1900 | 0200 | 0201 | D400 | 0003 | 5100 | 0101 |
| 0000062220 | 0301 | 2100 | 0000 | 1C00 | 0200 | 0301 | 2500 | 0005 |
| 0000062240 | C100 | 0101 | 0401 | 3D00 | 0000 | 1C00 | 0200 | 0401 |
| 0000062260 | E600 | 0006 | 3500 | 0100 | 0501 | 5900 | 0000 | 1700 |
| 0000062300 | 0200 | 0501 | 1B00 | 0007 | 0F00 | 0100 | 0601 | 7000 |
| 0000062320 | 0000 | 1700 | 0200 | 0601 | 2A00 | 0007 | 2400 | 0100 |
| 0000062340 | 0701 | 8700 | 0000 | 1C00 | 0200 | 0701 | 4E00 | 0007 |
| 0000062360 | 1000 | 0100 | 0801 | A300 | 0000 | 1C00 | 0200 | 0801 |
| 0000062400 | 5E00 | 0007 | 1000 | 0100 | 0901 | BF00 | 0000 | 1C00 |
| 0000062420 | 0200 | 0901 | 6E00 | 0007 | 2500 | 0100 | 0A01 | DB00 |
| 0000062440 | 0000 | 1D00 | 0200 | 0A01 | 9300 | 0007 | 1100 | 0100 |
| 0000062460 | 0B01 | F800 | 0000 | 1700 | 0200 | 0B01 | A400 | 0007 |
| 0000062500 | 1F00 | 0100 | 0C01 | 0F00 | 0001 | 1800 | 0200 | 0C01 |
| 0000062520 | C300 | 0007 | 4200 | 0100 | 0D01 | 2700 | 0001 | 1600 |
| 0000062540 | 0200 | 0D01 | 0500 | 0008 | 0E00 | 0100 | 0E01 | 3D00 |
| 0000062560 | 0001 | 1800 | 0200 | 0E01 | 1300 | 0008 | 1000 | 0100 |
| 0000062600 | 0F01 | 5500 | 0001 | 1800 | 0200 | 0F01 | 2300 | 0008 |
| 0000062620 | 1000 | 0100 | 1001 | 6D00 | 0001 | 1900 | 0200 | 1001 |
| 0000062640 | 3300 | 0008 | 1200 | 0100 | 1101 | 8600 | 0001 | 1800 |
| 0000062660 | 0200 | 1101 | 4500 | 0008 | 4100 | 0100 | 1201 | 9E00 |
| 0000062700 | 0001 | 1700 | 0200 | 1201 | 8600 | 0008 | 0F00 | 0100 |
| 0000062720 | 1301 | B500 | 0001 | 1A00 | 0200 | 1301 | 9500 | 0008 |
| 0000062740 | 9B00 | 0100 | 2201 | CF00 | 0001 | 1200 | 0200 | 2201 |
| 0000062760 | 3000 | 0009 | A400 | 0300 | 2201 | 5700 | 000C | 0400 |
| 0000063000 | 0418 | 2201 | 5B00 | 0024 | FA00 | 0905 | 2201 | 5500 |
| 0000063020 | 002A | 9600 | 0103 | 2301 | E100 | 0001 | 1600 | 0200 |
| 0000063040 | 2301 | D400 | 0009 | 0F00 | 0100 | 2401 | F700 | 0001 |
| 0000063060 | 1400 | 0200 | 2401 | E300 | 0009 | 3700 | 0100 | 2501 |

THU MAR 14 17:20:06 1991 BIP.EXE PAGE 23, LINE 1299

| | | | | | | | | |
|---|---|---|---|---|---|---|---|---|
| 0000063100 | 0B00 | 0002 | 1700 | 0200 | 2501 | 1A00 | 000A | 0E00 |
| 0000063120 | 0100 | 2601 | 2200 | 0002 | 1700 | 0200 | 2601 | 2800 |
| 0000063140 | 000A | 0E00 | 0100 | 2701 | 3900 | 0002 | 1800 | 0200 |
| 0000063160 | 2701 | 3600 | 000A | 0F00 | 0100 | 2801 | 5100 | 0002 |
| 0000063200 | 1B00 | 0200 | 2801 | 4500 | 000A | 2600 | 0100 | 2901 |
| 0000063220 | 6C00 | 0002 | 1600 | 0200 | 2901 | 6B00 | 000A | 0F00 |
| 0000063240 | 0100 | 2A01 | 8200 | 0002 | 1B00 | 0200 | 2A01 | 7A00 |
| 0000063260 | 000A | 3F00 | 0100 | 2B01 | 9D00 | 0002 | 1800 | 0200 |
| 0000063300 | 2B01 | B900 | 000A | 0F00 | 0100 | 2C01 | B500 | 0002 |
| 0000063320 | 1800 | 0200 | 2C01 | C800 | 000A | 1C00 | 0100 | 2D01 |
| 0000063340 | CD00 | 0002 | 1700 | 0200 | 2D01 | E400 | 000A | 0F00 |
| 0000063360 | 0100 | 2E01 | E400 | 0002 | 1500 | 0200 | 2E01 | F300 |
| 0000063400 | 000A | 1B00 | 0100 | 2F01 | F900 | 0002 | 1D00 | 0200 |
| 0000063420 | 2F01 | 0E00 | 000B | 2400 | 0100 | 3001 | 1600 | 0003 |
| 0000063440 | 1700 | 0200 | 3001 | 3200 | 000B | 3300 | 0100 | 3101 |
| 0000063460 | 2D00 | 0003 | 1800 | 0200 | 3101 | 6500 | 000B | 0F00 |
| 0000063500 | 0100 | 3201 | 4500 | 0003 | 1800 | 0200 | 3201 | 7400 |
| 0000063520 | 000B | 0F00 | 0100 | 3301 | 5D00 | 0003 | 1500 | 0200 |
| 0000063540 | 3301 | 8300 | 000B | 3000 | 0100 | 3401 | 7200 | 0003 |
| 0000063560 | 1A00 | 0200 | 3401 | B300 | 000B | 1E00 | 0100 | 3501 |
| 0000063600 | 8C00 | 0003 | 1600 | 0200 | 3501 | D100 | 000B | 1E00 |
| 0000063620 | 0100 | 3601 | A200 | 0003 | 1900 | 0200 | 3601 | EF00 |
| 0000063640 | 000B | 5600 | 0100 | 3701 | BB00 | 0003 | 1900 | 0200 |
| 0000063660 | 3701 | 4500 | 000C | 1200 | 0600 | 0001 | EB00 | 002D |
| 0000063700 | 1E00 | 4E00 | 3042 | 5B32 | 0031 | 0000 | | |
| 0000063713 | | | | | | | | |

THU MAR 14 17:20:30 1991 BTRCALLS.DLL PAGE 1, LINE 1

```
0000000000  5A4D  01BB  0045  0000  0004  0000  FFFF  0000
0000000020  00B8  0000  0000  0000  0040  0000  0000  0000
0000000040  0000  0000  0000  0000  0000  0000  0000  0000
0000000060  0000  0000  0000  0000  0000  0000  0080  0000
0000000100  1F0E  0EBA  B400  CD09  B821  4C01  21CD  6854
0000000120  7369  7020  6F72  7267  6D61  6320  6E61  6F6E
0000000140  2074  6562  7220  6E75  6920  206E  4F44  2053
0000000160  6F6D  6564  0D2E  240A  0000  0000  0000  0000
0000000200  454E  0005  0072  0009  7DAD  5BF0  800A  0002
0000000220  0000  0000  0000  0000  0000  0000  0002  0001
0000000240  0020  0040  0050  0050  0066  0068  00FB  0000
0000000260  0000  0009  0000  0000  0000  0000  0000  0000
0000000300  0001  78C7  0D00  78C7  003E  0DBB  0C01  0DC6
0000000320  4208  5254  4143  4C4C  0053  0700  5442  4352
0000000340  4C41  014C  0000  0001  0800  4F44  4353  4C41
0000000360  534C  0101  BB03  0174  0000  1C00  7442  6972
0000000400  7665  2065  7944  616E  696D  2063  694C  6B6E
0000000420  4C20  6269  6172  7972  0000  0000  0000  0000
0000000440  0000  0000  0000  0000  0000  0000  0000  0000
*
0000001000  0CC8  0000  5657  06C7  0507  FFFC  00B8  1E00
0000001020  8D50  F446  5016  FF9A  00FF  3D00  0000  0375
0000001040  09E9  B800  0009  4689  8CF4  F65E  5EC4  26F4
0000001060  3F80  7500  E903  0354  5EC4  26F4  3F80  752F
0000001100  E903  000C  5EC4  26F4  3F80  742D  E903  0336
0000001120  46FF  C4F4  F45E  8A26  9807  200D  E900  02E8
0000001140  76FF  FFF6  F476  6DE8  8304  04C4  ACA3  8308
0000001160  AC3E  0108  0373  0AE9  8300  AC3E  4008  0377
0000001200  06E9  B800  03EA  49E9  C104  AC26  0A08  0EFF
0000001220  08AC  EEE9  FF02  F676  76FF  E8F4  0438  C483
0000001240  A304  08A0  3E81  08A0  0200  0373  16E9  8100
0000001260  A03E  0008  7610  E903  000B  06F7  08A0  01FF
0000001300  0375  06E9  B800  03EC  07E9  E904  02B5  76FF
0000001320  FFF6  F476  FFE8  8303  04C4  EEA3  8308  EE3E
0000001340  0108  0373  0AE9  8300  EE3E  4008  0377  06E9
0000001360  B800  03EE  DBE9  C103  EE26  0A08  0EFF  08EE
0000001400  80E9  FF02  F676  76FF  E8F4  03CA  C483  A304
0000001420  08F4  3E83  08F4  7301  E903  000A  3E83  08F4
0000001440  7740  E903  0006  F3B8  E903  03A6  26C1  08F4
0000001460  FF0A  F40E  E908  024B  76FF  FFF6  F476  95E8
0000001500  8303  04C4  A4A3  8308  A43E  0108  0373  0BE9
0000001520  8100  A43E  FF08  7700  E903  0006  EFB8  E903
0000001540  0370  1EE9  C702  B206  FF08  E9FF  0215  46FF
0000001560  C4F4  F45E  46FF  26F4  3F80  753A  E903  0006
0000001600  F0B8  E903  034C  46C7  25FC  C40A  F45E  8026
0000001620  2F3F  0375  24E9  C400  F45E  8026  2D3F  0375
0000001640  18E9  C400  F45E  8026  203F  0375  0CE9  C400
0000001660  F45E  8026  003F  0374  03E9  E900  0014  5E8B
0000001700  FFFC  FC46  76C4  FFF4  F446  8A26  8804  E907
0000001720  FFB9  53E8  C70D  FC46  0A25  76FF  E8FC  5AC8
0000001740  C483  3D02  0000  0375  06E9  B800  03F1  E1E9
0000001760  6A02  6842  04C6  84E8  830B  04C4  07A3  8305
0000002000  073E  0005  037C  0AE9  8300  923E  0508  0375
0000002020  DEE9  83FF  073E  0005  037C  81E9  8300  923E
0000002040  0208  0375  0AE9  8300  923E  6E08  0374  6DE9
0000002060  6A00  6842  04C6  FAE8  830A  04C4  07A3  3D05
0000002100  0000  037C  06E9  B800  03F1  85E9  C602  C606
0000002120  0000  06C6  00C7  6800  0400  C668  FF00  0736
0000002140  E805  0BA0  C483  3D06  0400  0375  06E9  B800
```

THU MAR 14 17:20:30 1991 BTRCALLS.DLL PAGE 2, LINE 60

| | | | | | | | | |
|---|---|---|---|---|---|---|---|---|
| 0000002160 | 03F1 | 5DE9 | FF02 | 0736 | E805 | 0B4B | C483 | 6A02 |
| 0000002200 | 6842 | 04C6 | F6E8 | 830A | 04C4 | 07A3 | 3D05 | 0000 |
| 0000002220 | 037C | 06E9 | B800 | 03F1 | 37E9 | E902 | 0003 | DAE8 |
| 0000002240 | C702 | C206 | FF00 | E9FF | 00D9 | 46FF | C4F4 | F45E |
| 0000002260 | 46FF | 26F4 | 3F80 | 753A | E903 | 0006 | F0B8 | E903 |
| 0000002300 | 0210 | 5EC4 | FFF4 | F446 | 8A26 | A207 | 0C87 | 87A0 |
| 0000002320 | 980C | 4689 | 83F8 | F87E | 7D61 | E903 | 0007 | 6E83 |
| 0000002340 | 61F8 | 04E9 | 8300 | F86E | FF41 | F846 | 76FF | E8F8 |
| 0000002360 | 0B83 | C483 | 3D02 | 0000 | 037C | 06E9 | B800 | 03ED |
| 0000002400 | CFE9 | E901 | 007D | 76FF | FFF6 | F476 | C7E8 | 8301 |
| 0000002420 | 04C4 | 9AA3 | 8308 | 9A3E | 0108 | 0373 | 0BE9 | 8100 |
| 0000002440 | 9A3E | FF08 | 7700 | E903 | 0006 | E9B8 | E903 | 01A2 |
| 0000002460 | 50E9 | E900 | 004D | 06C7 | 08C0 | 0000 | 44E9 | B800 |
| 0000002500 | 03F0 | 8DE9 | E901 | 003B | 622D | 3D00 | 0013 | 0376 |
| 0000002520 | ECE9 | 03FF | 93C0 | FF2E | 5BA7 | CE03 | 6500 | 3F01 |
| 0000002540 | 3303 | 3803 | 3F01 | 3F03 | AA03 | 3F02 | 3F03 | 0603 |
| 0000002560 | 6003 | 3F00 | 3603 | 9503 | 3F00 | 3F03 | 3F03 | 6E03 |
| 0000002600 | 0301 | E901 | 0003 | 46FF | E9F4 | FCA0 | C6B8 | 890D |
| 0000002620 | FC46 | A6A3 | 6B08 | A406 | 5408 | 4689 | 8BFE | FE46 |
| 0000002640 | 0603 | 08A6 | 9CA3 | A108 | 089A | C88B | E0D1 | C103 |
| 0000002660 | E0D1 | 4601 | 8BFE | FE46 | 0603 | 08A6 | AEA3 | A108 |
| 0000002700 | 08AC | 0639 | 08AE | 0373 | 06E9 | B800 | 03EB | 01E9 |
| 0000002720 | FF01 | AC36 | E808 | 0B48 | 9A50 | FFFF | 0000 | 003D |
| 0000002740 | 7500 | E903 | 0006 | EAB8 | E903 | 00E6 | A0A1 | 0508 |
| 0000002760 | 0008 | A2A3 | A108 | 08AC | 062B | 08AE | D22B | 36F7 |
| 0000003000 | 08A2 | 9EA? | ?308 | 9E3E | 2008 | 0372 | 03E9 | E900 |
| 0000003020 | 0009 | 0681 | 08A0 | 0200 | D1E9 | C7FF | FA46 | 0000 |
| 0000003040 | 03E9 | FF00 | FA46 | A2A1 | F708 | 9E26 | 0308 | FE46 |
| 0000003060 | 463B | 77FA | E903 | 000C | 5E8B | FFFC | FC46 | 07C6 |
| 0000003100 | E900 | FFDF | 3E83 | 089E | 7606 | E903 | 0006 | EBB8 |
| 0000003120 | E903 | 007E | F0B8 | 8908 | F446 | 5E8C | FFF6 | EE36 |
| 0000003140 | FF08 | F676 | 76FF | 6AF4 | 9A00 | FFFF | 0000 | 003D |
| 0000003160 | 7500 | E903 | 0006 | EAB8 | E903 | 0056 | 3E83 | 08F6 |
| 0000003200 | 7400 | FF49 | F436 | B808 | 08F6 | 501E | 9090 | 6A90 |
| 0000003220 | 9A00 | 04BA | 0000 | 003D | 7500 | E903 | 0006 | EAB8 |
| 0000003240 | E903 | 002E | F8B8 | 8908 | F446 | 5E8C | FFF6 | F436 |
| 0000003260 | FF08 | F676 | 76FF | 6AF4 | 9A00 | 046A | 0000 | 003D |
| 0000003300 | 7500 | E903 | 0006 | EAB8 | E903 | 0006 | 00B8 | E900 |
| 0000003320 | 0000 | 5F5E | C3C9 | 02C8 | 0000 | 5657 | 46C7 | 00FE |
| 0000003340 | FF00 | 0446 | 5EC4 | FF04 | 0446 | 8026 | 3A3F | 0375 |
| 0000003360 | 06E9 | B800 | FFFF | 7EE9 | C400 | 045E | 8026 | 303F |
| 0000003400 | 037D | 61E9 | C400 | 045E | 8026 | 393F | 037E | 55E9 |
| 0000003420 | C400 | 045E | 46FF | 2604 | 078A | 8B98 | FE4E | D18B |
| 0000003440 | E1D1 | E1D1 | CA03 | E1D1 | C803 | E983 | 8930 | FE4E |
| 0000003460 | 5EC4 | 2604 | 3F80 | 752F | E903 | 0024 | 5EC4 | 2604 |
| 0000003500 | 3F80 | 752D | E903 | 0018 | 5EC4 | 2604 | 3F80 | 7520 |
| 0000003520 | E903 | 000C | 5EC4 | 2604 | 3F80 | 7400 | E903 | 0003 |
| 0000003540 | 0EE9 | E900 | 0008 | 46C7 | FFFE | E9FF | 0003 | 88E9 |
| 0000003560 | 8BFF | FE46 | 00E9 | 5E00 | C95F | C8C3 | 000A | 5700 |
| 0000003600 | 6856 | 0400 | C668 | FF00 | 0736 | E805 | 084E | C483 |
| 0000003620 | 8906 | FA46 | 7E83 | 00FA | 0374 | 06E9 | E900 | 0115 |
| 0000003640 | 10E9 | 8100 | FA7E | 0400 | 0375 | 06E9 | B800 | 03F1 |
| 0000003660 | 02E9 | A001 | 00C6 | 8998 | F846 | 46C7 | 00F6 | E900 |
| 0000003700 | 0003 | 46FF | 8BF6 | F846 | 4639 | 72F6 | E903 | 00E5 |
| 0000003720 | 426A | 466B | 4CF6 | D405 | 5000 | A0E8 | 8307 | 04C4 |
| 0000003740 | 4689 | 3DFC | 0000 | 037C | 06E9 | B800 | 03F2 | C4E9 |
| 0000003760 | FF00 | FC76 | 88E8 | 8308 | 02C4 | 003D | 7500 | E903 |
| 0000004000 | 0010 | 3E83 | 0892 | 7401 | E903 | 0003 | 03E9 | E900 |
| 0000004020 | FFDF | 006A | 006A | 226A | 76FF | E8FC | 080E | C483 |

THU MAR 14 17:20:30 1991 BTRCALLS.DLL PAGE 3, LINE 119

| | | | | | | | | |
|---|---|---|---|---|---|---|---|---|
| 0000004040 | 8908 | FA46 | 003D | 7500 | E903 | 0006 | F2B8 | E903 |
| 0000004060 | 0083 | 026A | 468D | 50FE | 76FF | E8FC | 079E | C483 |
| 0000004100 | 8906 | FA46 | 023D | 7500 | E903 | 0006 | F2B8 | E903 |
| 0000004120 | 0063 | 7E83 | 00FE | 0374 | 45E9 | C700 | FE46 | FFFF |
| 0000004140 | 006A | 006A | 226A | 76FF | E8FC | 07C0 | C483 | 8908 |
| 0000004160 | FA46 | 003D | 7500 | E903 | 0006 | F2B8 | E903 | 0035 |
| 0000004200 | 026A | 468D | 50FE | 76FF | E8FC | 0778 | C483 | 8906 |
| 0000004220 | FA46 | 023D | 7500 | E903 | 0006 | F2B8 | E903 | 0015 |
| 0000004240 | 76FF | E8FC | 080B | C483 | FF02 | FC76 | 18E8 | 8307 |
| 0000004260 | 02C4 | 0DE9 | 5EFF | C95F | C8C3 | 0002 | 5700 | FF56 |
| 0000004300 | 0736 | E805 | 078F | C483 | 8902 | 0446 | 46C7 | 00FE |
| 0000004320 | E900 | 0003 | 46FF | 81FE | FE7E | 0400 | 037C | 0BE9 |
| 0000004340 | 8B00 | FE5E | 87C6 | 00C6 | E900 | FFE8 | 006A | 006A |
| 0000004360 | 006A | 76FF | E804 | 0734 | C483 | 6808 | 0400 | C668 |
| 0000004400 | FF00 | 0476 | FDE8 | 8306 | 06C4 | 76FF | E804 | 06B7 |
| 0000004420 | C483 | E902 | 0000 | 5F5E | C3C9 | 08C8 | 0000 | 5657 |
| 0000004440 | A6A1 | 8908 | FE46 | 46C7 | FFFC | C7FF | F846 | FFFF |
| 0000004460 | 46C7 | 00FA | E900 | 0003 | 46FF | A1FA | 08A4 | 4639 |
| 0000004500 | 72FA | E903 | 0109 | 766B | 54FA | 5E8B | 80FE | 0E78 |
| 0000004520 | 7500 | E903 | 00F6 | 766B | 54FA | 5E8B | 8BFE | FC46 |
| 0000004540 | 4039 | 7652 | E903 | 00E4 | 468B | 40FA | 063B | 00A8 |
| 0000004560 | 0374 | 0DE9 | 8300 | AA3E | 0000 | 0375 | 03E9 | E900 |
| 0000004600 | 00CA | 468B | 40FA | 063B | 0C71 | 0374 | 03E9 | .E900 |
| 0000004620 | 00BA | 766B | 54FA | 5E8B | 83FE | 0678 | 7400 | E903 |
| 0000004640 | 0042 | 766B | 54FA | 5E8B | 83FE | 0878 | 7400 | E903 |
| 0000004660 | 0032 | 76FF | E8FA | 01A6 | C483 | 3D02 | 0000 | 0374 |
| 0000004700 | 21E9 | 6B00 | FA76 | 8B54 | FE5E | 408A | 980A | 7540 |
| 0000004720 | E903 | 0010 | 766B | 54FA | 5E8B | 80FE | 0C78 | 74FC |
| 0000004740 | E903 | 0023 | 766B | 54FA | 5E8B | 83FE | 0278 | 7C00 |
| 0000004760 | E903 | 0013 | 766B | 54FA | 5E8B | 83FE | 0478 | 7C00 |
| 0000005000 | E903 | 0003 | 45E9 | 6B00 | FA5E | 8B54 | FE76 | 3883 |
| 0000005020 | 7C00 | E903 | 0023 | 766B | 54FA | 5E8B | 83FE | 0278 |
| 0000005040 | 7C00 | E903 | 0013 | 766B | 54FA | 5E8B | 83FE | 0478 |
| 0000005060 | 7C00 | E903 | 0003 | 13E9 | 6B00 | FA76 | 8B54 | FE5E |
| 0000005100 | 408B | 8952 | FC46 | 468B | 89FA | F846 | E9E9 | 83FE |
| 0000005120 | F87E | 74FF | E903 | 0006 | 04B8 | E900 | 00FC | 766B |
| 0000005140 | 54F8 | 5E8B | 83FE | 0678 | 7400 | E903 | 007E | 766B |
| 0000005160 | 54F8 | 5E8B | 83FE | 0878 | 7400 | E903 | 006E | 76FF |
| 0000005200 | E8FA | 00DA | C483 | 3D02 | 0000 | 0374 | 5DE9 | 6B00 |
| 0000005220 | F876 | 8B54 | FE5E | 408A | 980A | 7540 | E903 | 004C |
| 0000005240 | 766B | 54F8 | 5E8B | 80FE | 0C78 | 75FC | E903 | 003C |
| 0000005260 | 5E6B | 54F8 | 768B | 83FE | 0038 | 037D | 2DE9 | 6B00 |
| 0000005300 | F85E | 8B54 | FE76 | 30FF | FCE8 | 8304 | 02C4 | 003D |
| 0000005320 | 7D00 | E903 | 0016 | 5E6B | 54F8 | 768B | C7FE | FF00 |
| 0000005340 | 6BFF | F876 | 8B54 | FE5E | 40C6 | 000D | 766B | 54F8 |
| 0000005360 | 5E8B | 83FE | 0278 | 7D00 | E903 | 0024 | 766B | 54F8 |
| 0000005400 | 5E8B | FFFE | 0270 | BEE8 | 8304 | 02C4 | 003D | 7D00 |
| 0000005420 | E903 | 000C | 766B | 54F8 | 5E8B | C7FE | 0240 | FFFE |
| 0000005440 | 766B | 54F8 | 5E8B | 83FE | 0478 | 7D00 | E903 | 0024 |
| 0000005460 | 766B | 54F8 | 5E8B | FFFE | 047D | 8AE8 | 8304 | 02C4 |
| 0000005500 | 003D | 7D00 | E903 | 000C | 766B | 54F8 | 5E8B | C7FE |
| 0000005520 | 0440 | FFFD | 00BB | E900 | 0000 | 5F5E | C3C9 | 04C8 |
| 0000005540 | 0000 | 5657 | 9CA1 | 8908 | FE46 | 46C7 | 00FC | E900 |
| 0000005560 | 0003 | 46FF | A1FC | 089A | 4639 | 72FC | E903 | 001B |
| 0000005600 | 766B | 06FC | 5E8B | 8BFE | 0446 | 4039 | 7404 | E903 |
| 0000005620 | 0006 | FFB8 | E9FF | 0009 | D7E9 | B8FF | 0000 | 00E9 |
| 0000005640 | 5E00 | C95F | C8C3 | 0012 | 5700 | 8A56 | 0446 | E42A |
| 0000005660 | 4689 | 8BEE | 0446 | 0025 | 89FF | F246 | 468B | E9F2 |
| 0000005700 | 02B2 | 468D | 89F6 | FE46 | 5E8B | 83FE | FE46 | 8B02 |

THU MAR 14 17:20:30 1991 BTRCALLS.DLL PAGE 4, LINE 178

| | | | | | | | | |
|---|---|---|---|---|---|---|---|---|
| 0000005720 | 0A46 | 0789 | 5E8B | 8BFE | 0846 | 0789 | 76FF | FF06 |
| 0000005740 | F876 | 76FF | FFF6 | EE76 | 468D | 16F6 | 9A50 | FFFF |
| 0000005760 | 0000 | 4689 | 83F0 | F87E | 7C00 | E903 | 0006 | FFB8 |
| 0000006000 | E9FF | 0321 | 468D | 89F6 | FE46 | 5E8B | 83FE | FE46 |
| 0000006020 | 8B02 | 8907 | 0446 | 5E8B | 8BFE | 8907 | 0A46 | FEE9 |
| 0000006040 | FF02 | 0676 | 76FF | FF10 | 0A76 | 76FF | 8D08 | 0446 |
| 0000006060 | 5016 | FF9A | 00FF | 8900 | F046 | 468B | 3908 | 0446 |
| 0000006100 | 0375 | 05E9 | C700 | F046 | 0005 | D2E9 | FF02 | 0676 |
| 0000006120 | 76FF | FF10 | 0A76 | 76FF | 8D08 | 0446 | 5016 | FF9A |
| 0000006140 | 00FF | 8900 | F046 | 468B | 3908 | 0446 | 0375 | 05E9 |
| 0000006160 | C700 | F046 | 0005 | A6E9 | 8D02 | F646 | 4689 | 8BFE |
| 0000006200 | FE5E | 4683 | 02FE | 468B | 890A | 8B07 | FE5E | 468B |
| 0000006220 | 8908 | 8D07 | FA46 | 4689 | 8BFE | FE5E | 4683 | 02FE |
| 0000006240 | 468B | 890C | 8B07 | FE5E | 468B | 890E | FF07 | 0676 |
| 0000006260 | 7E83 | 01EE | 0374 | 08E9 | 8D00 | F646 | D28C | 06E9 |
| 0000006300 | B800 | 0000 | 00BA | 5200 | 8350 | EE7E | 7400 | E903 |
| 0000006320 | 0008 | 468D | 8CF6 | E9D2 | 0006 | 00B8 | BA00 | 0000 |
| 0000006340 | 5052 | FF9A | 00FF | 8900 | F046 | 7E83 | 00F0 | 0375 |
| 0000006360 | 09E9 | 6A00 | 6A00 | 9A01 | FFFF | 0000 | 20E9 | FF02 |
| 0000006400 | 0676 | FF9A | 00FF | 8900 | F046 | 12E9 | FF02 | 0676 |
| 0000006420 | FF9A | 00FF | 8900 | F046 | 04E9 | FF02 | 1076 | 76FF |
| 0000006440 | 8D0A | 0446 | 5016 | 468D | 16F2 | 6A50 | 6A00 | 6A00 |
| 0000006460 | 6A00 | 8B01 | EE46 | 8005 | 5020 | 006A | 006A | 849A |
| 0000006500 | 000B | 8900 | F046 | 43EB | 8904 | F446 | 7E83 | 00F0 |
| 0000006520 | 0374 | 36E9 | 8B00 | F45E | 3F83 | 7400 | E903 | 002B |
| 0000006540 | 76FF | FF10 | 0A76 | 468D | 1604 | 8D50 | F246 | 5016 |
| 0000006560 | 006A | 006A | 006A | 016A | 468B | 05EE | 2080 | 6A50 |
| 0000006600 | 6A00 | 9A00 | 0C01 | 0000 | 4689 | 83F0 | F07E | 7420 |
| 0000006620 | E903 | 0005 | 46C7 | 05F0 | E900 | 0183 | 76FF | FF10 |
| 0000006640 | 0A76 | 006A | 006A | FF9A | 00FF | 8900 | F046 | 6EE9 |
| 0000006660 | FF01 | 0676 | 468D | 1604 | 9A50 | FFFF | 0000 | 4689 |
| 0000006700 | E9F0 | 015B | 46C7 | 00F0 | E900 | 0153 | 76FF | FF10 |
| 0000006720 | 0A76 | 006A | 006A | FF9A | 00FF | 8900 | F046 | 3EE9 |
| 0000006740 | FF01 | 1076 | 76FF | 8D0A | 0446 | 5016 | 468D | 16F2 |
| 0000006760 | 6A50 | 6A00 | 6A00 | 6A00 | 6810 | 20C2 | 006A | 006A |
| 0000007000 | FF9A | 00FF | 8900 | F046 | 7E83 | 6EF0 | 0374 | 05E9 |
| 0000007020 | C700 | F046 | 0050 | 06E9 | FF01 | 0A76 | 76FF | FF10 |
| 0000007040 | 0E76 | 468D | 16EE | 9A50 | FFFF | 0000 | 4689 | E9F0 |
| 0000007060 | 00ED | 468D | 1604 | 8D50 | F646 | 5016 | FF9A | 00FF |
| 0000007100 | 8900 | F046 | 4EFF | E904 | 00D5 | D2E9 | 8D00 | 0446 |
| 0000007120 | 5016 | FF9A | 00FF | 8900 | F046 | C2E9 | FF00 | 0476 |
| 0000007140 | FF9A | 00FF | 8900 | F046 | B4E9 | B800 | FFD2 | B4E9 |
| 0000007160 | E900 | 00AB | 003D | 7540 | E903 | FDD1 | 037E | 4BE9 |
| 0000007200 | 3D00 | 3B00 | 0375 | 43E9 | 7EFF | E903 | 001B | 003D |
| 0000007220 | 750D | E903 | FF2E | 003D | 7519 | E903 | FF94 | 003D |
| 0000007240 | 752E | E903 | FFB7 | C2E9 | 3DFF | 3C00 | 0375 | 30E9 |
| 0000007260 | 3DFF | 3D00 | 0375 | 62E9 | 3DFE | 3E00 | 0375 | 4CE9 |
| 0000007300 | 3DFE | 3F00 | 0375 | 58E9 | E9FD | FF9F | 003D | 7547 |
| 0000007320 | E903 | FF45 | 037E | 1BE9 | 3D00 | 4100 | 0375 | BBE9 |
| 0000007340 | 3DFE | 4200 | 0375 | D9E9 | 3DFC | 4500 | 0375 | C0E9 |
| 0000007360 | E9FE | FF77 | 003D | 7554 | E903 | FF51 | 003D | 755B |
| 0000007400 | E903 | FEDD | 003D | 755C | E903 | FD6D | 003D | 7568 |
| 0000007420 | E903 | FDEE | 003D | 7570 | E903 | FF2E | 4CE9 | 8BFF |
| 0000007440 | F046 | 00E9 | 5E00 | C95F | C8C3 | 0000 | 5700 | 5E56 |
| 0000007460 | C95F | C8C3 | 0004 | 5700 | 8B56 | 0446 | 501E | 468D |
| 0000007500 | 16FE | 8D50 | FC46 | 5016 | 006A | 006A | 006A | 106A |
| 0000007520 | 468B | 0506 | 2080 | 6A50 | 6A00 | 9A00 | 0B3F | 0000 |
| 0000007540 | 92A3 | 8308 | 923E | 0008 | 0375 | 06E9 | B800 | FFFF |
| 0000007560 | 03E9 | 8B00 | FE46 | 00E9 | 5E00 | C95F | C8C3 | 0004 |

THU MAR 14 17:20:30 1991 BTRCALLS.DLL PAGE 5, LINE 237

| | | | | | | | | |
|---|---|---|---|---|---|---|---|---|
| 0000007600 | 5700 | 8B56 | 0446 | 501E | 468D | 16FE | 8D50 | FC46 |
| 0000007620 | 5016 | 006A | 006A | 006A | 016A | 468B | 0506 | 2080 |
| 0000007640 | 6A50 | 6A00 | 9A00 | 0D5C | 0000 | 92A3 | 8308 | 923E |
| 0000007660 | 0008 | 0375 | 06E9 | B800 | FFFF | 03E9 | 8B00 | FE46 |
| 0000007700 | 00E9 | 5E00 | C95F | C8C3 | 0000 | 5700 | FF56 | 0476 |
| 0000007720 | 119A | 000B | A300 | 0892 | 5F5E | C3C9 | 02C8 | 0000 |
| 0000007740 | 5657 | 76FF | 8B04 | 0646 | 501E | 76FF | 8D08 | FE46 |
| 0000007760 | 5016 | 339A | 000A | A300 | 0892 | 468B | E9FE | 0000 |
| 0000010000 | 5F5E | C3C9 | 02C8 | 0000 | 5657 | 76FF | 8B04 | 0646 |
| 0000010020 | 501E | 76FF | 8D08 | FE46 | 5016 | 5F9A | 000A | A300 |
| 0000010040 | 0892 | 468B | E9FE | 0000 | 5F5E | C3C9 | 00C8 | 0000 |
| 0000010060 | 5657 | 76FF | FF04 | 0876 | 76FF | FF06 | 0A76 | 468D |
| 0000010100 | 1606 | 9A50 | 09EE | 0000 | 92A3 | A108 | 0892 | 00E9 |
| 0000010120 | 5E00 | C95F | C8C3 | 0000 | 5700 | FF56 | 0476 | 468D |
| 0000010140 | 1604 | 9A50 | 0BBA | 0000 | 92A3 | 8B08 | 0446 | 00E9 |
| 0000010160 | 5E00 | C95F | C8C3 | 0000 | 5700 | 5E56 | C95F | C8C3 |
| 0000010200 | 0008 | 5700 | C756 | FC46 | 0000 | 46C7 | 00FE | C730 |
| 0000010220 | F846 | 0002 | 46C7 | 00FA | FF00 | 0476 | 006A | 006A |
| 0000010240 | 468D | 16FC | 9A50 | 0AE3 | 0000 | 00E9 | 5E00 | C95F |
| 0000010260 | C8C3 | 0008 | 5700 | C756 | FC46 | 0000 | 46C7 | 00FE |
| 0000010300 | C730 | F846 | 0002 | 46C7 | 00FA | FF00 | 0476 | 468D |
| 0000010320 | 16FC | 6A50 | 6A00 | 9A00 | 0EA6 | 0000 | 00E9 | 5E00 |
| 0000010340 | C95F | C8C3 | 0000 | 5700 | 5E56 | C95F | C8C3 | 0000 |
| 0000010360 | 5700 | 5E56 | C95F | 00C3 | 068F | 0A1B | 5153 | 5652 |
| 0000010400 | FF57 | 1B36 | C30A | 068F | 0A1B | 5E5F | 595A | F85B |
| 0000010420 | 003D | 7400 | F901 | 36FF | 0A1B | 00C3 | 0000 | 0000 |
| 0000010440 | B81E | FFFF | D88E | C358 | B806 | 0F22 | C08E | C358 |
| 0000010460 | 8B55 | 8EEC | 045E | 468E | 5D06 | 00C3 | B9E8 | E83D |
| 0000010500 | 1FD8 | 0000 | 3E80 | 0889 | 7580 | E903 | 010A | 3E80 |
| 0000010520 | 0889 | 7581 | E903 | 0112 | C033 | 3E8B | 08A6 | 0E8B |
| 0000010540 | 08A4 | BD80 | 000E | 7400 | 400A | C781 | 0054 | F2E2 |
| 0000010560 | 1CE9 | 4001 | 71A3 | C70C | 0285 | FE00 | C7FF | 0485 |
| 0000010600 | FD00 | BAFF | 0B2C | C933 | 3E80 | 0889 | 75FF | B410 |
| 0000010620 | E85B | 65DC | 4473 | 06C7 | 0C39 | 003B | 32E9 | B401 |
| 0000010640 | E85B | 65CC | 3473 | 503D | 7400 | E903 | 00EA | 3DB4 |
| 0000010660 | 12B0 | BBE8 | 7365 | E903 | 00DE | D88B | 3EB4 | AFE8 |
| 0000010700 | 7365 | E903 | 00D2 | 41B4 | A5E8 | 7365 | E903 | 00C8 |
| 0000010720 | 5BB4 | 9BE8 | 7365 | E903 | 00BE | 8589 | 0000 | D88B |
| 0000010740 | 3EB4 | 8BE8 | 7265 | B409 | B03D | E812 | 6582 | 0373 |
| 0000010760 | A5E9 | E800 | 1F85 | 10A0 | 01B8 | A300 | 0A17 | 3AE8 |
| 0000011000 | A004 | E810 | 00DF | 10A0 | 3E83 | 0048 | 7400 | E80A |
| 0000011020 | 034E | 10A0 | CEE8 | A000 | E810 | 06DE | 10A0 | 9BE8 |
| 0000011040 | A003 | 8310 | 4C3E | 0000 | 0575 | D7E8 | A003 | E810 |
| 0000011060 | 457B | 10A0 | 45E8 | A044 | 8B10 | C81E | C708 | 2287 |
| 0000011100 | 0000 | 8900 | E41E | E808 | 4399 | 10A0 | 1E8B | 08DE |
| 0000011120 | 87C7 | 0002 | 0000 | 48EB | 41B4 | 2CBA | CD0B | 7321 |
| 0000011140 | C706 | 3906 | 190C | E900 | 3CA7 | 2CBE | BF0B | 0A25 |
| 0000011160 | 20B9 | F300 | 1EA5 | 36C5 | 0874 | A8E8 | 001E | 1F00 |
| 0000011200 | 25BF | B40A | EB56 | C7D3 | 3906 | 0B0C | EB00 | C711 |
| 0000011220 | 3906 | 560C | EB00 | 9045 | 06C7 | 0C39 | 0019 | 31EB |
| 0000011240 | 36FF | 0C39 | D5E8 | 0043 | 8F00 | 3906 | 8B0C | A63E |
| 0000011260 | E808 | 4804 | F803 | 9D8B | 0000 | 3EB4 | B1E8 | 8364 |
| 0000011300 | 393E | 000C | 0B74 | D78B | C281 | 000E | 41B4 | 9FE6 |
| 0000011320 | 3364 | 81C0 | 06C7 | B900 | 000C | AAF3 | 06C7 | 0C71 |
| 0000011340 | 0000 | 2CE9 | C73C | 1306 | FF0A | C7FF | E006 | 0008 |
| 0000011360 | C700 | E206 | 0008 | C700 | 0D06 | FF0A | E8FF | 4144 |
| 0000011400 | 135D | 1E8B | 08E6 | 1E89 | 08DE | 1E8B | 08E4 | 1E89 |
| 0000011420 | 08C8 | C406 | 7436 | B808 | 0300 | 8789 | 0006 | 3E83 |
| 0000011440 | 004A | 7400 | C706 | 0687 | 0000 | 2604 | 848B | 0002 |

THU MAR 14 17:20:30 1991 BTRCALLS.DLL PAGE 6, LINE 296

| | | | | | | | | |
|---|---|---|---|---|---|---|---|---|
| 0000011460 | 8789 | 0008 | FFBA | 89FF | 0C97 | 8900 | 0E97 | 8900 |
| 0000011500 | 1097 | 8900 | 1297 | 2600 | 8C8B | 0004 | 8F89 | 0014 |
| 0000011520 | 8B26 | 0C94 | 8900 | D897 | 2600 | 948B | 000A | 9789 |
| 0000011540 | 0106 | 8B26 | 0094 | 2600 | 84F7 | 000A | 0010 | 1274 |
| 0000011560 | 87C7 | 0006 | 0500 | 87C7 | 0014 | FFFF | 1689 | 004C |
| 0000011600 | 20EB | F726 | 0A84 | 0800 | 7400 | C717 | 0687 | 0000 |
| 0000011620 | 8905 | 0E97 | BA01 | FFFF | 9789 | 0039 | 9788 | 003B |
| 0000011640 | D233 | 9789 | 0016 | 3E83 | 004C | 74U0 | 8305 | 08C2 |
| 0000011660 | 68EB | 3E81 | 088E | 6176 | 4C75 | F726 | 0A84 | 0100 |
| 0000011700 | 7400 | 5243 | B250 | F614 | 32F2 | BAE4 | FFFF | 9788 |
| 0000011720 | 0038 | 9789 | 0039 | 9788 | 003B | C0BA | 2600 | 9423 |
| 0000011740 | 000A | 0874 | E0D1 | C2D0 | C2D0 | E2F6 | 8789 | 0108 |
| 0000011760 | 5A58 | C283 | 2604 | 84F7 | 000A | 0002 | 0874 | C283 |
| 0000012000 | 8002 | 38B7 | 0200 | F726 | 0A84 | 0800 | 7400 | BA03 |
| 0000012020 | 0005 | 1689 | 0040 | 168B | 0042 | 9789 | 0018 | 01BA |
| 0000012040 | 8900 | 2497 | 8B00 | 83D1 | 483E | 0000 | 0174 | 4242 |
| 0000012060 | 3E83 | 004C | 7500 | 8905 | 2097 | 4200 | 9789 | 0028 |
| 0000012100 | D08B | EA83 | 8906 | 2A97 | 5300 | 8156 | 10C3 | 8101 |
| 0000012120 | 10C6 | 2B00 | 39FF | 483E | 7400 | 4701 | 0C2D | 8300 |
| 0000012140 | 00F9 | 0375 | E8E9 | 5300 | ED2B | 8B26 | 0094 | 4A00 |
| 0000012160 | 9789 | 0014 | 8B26 | 0294 | 8900 | 1697 | 0300 | 26EA |
| 0000012200 | 948B | 0004 | E281 | 037F | 3E83 | 004C | 7400 | 8104 |
| 0000012220 | 00CA | 8940 | 0897 | F700 | 00C2 | 7401 | 2613 | B48A |
| 0000012240 | 000A | FE80 | 750E | 8113 | 088F | 0400 | EB00 | 900B |
| 0000012260 | 00B6 | C2F7 | 0004 | 0274 | 0EB6 | B788 | 001C | 978B |
| 0000012300 | 0008 | C2F7 | 0208 | 0974 | 8A26 | 0BB4 | 8800 | 1DB7 |
| 0000012320 | F700 | 10C2 | 7400 | 810A | 1EC3 | 8100 | 10C6 | EB00 |
| 0000012340 | 8B89 | 5BD3 | 4752 | BF89 | 0002 | AF89 | 000A | 3E83 |
| 0000012360 | 004C | 7400 | 8B09 | 4C2E | 8300 | 08C5 | 1BEB | C583 |
| 0000012400 | F708 | 0887 | 0100 | 7400 | 8310 | 04C5 | 168B | 0040 |
| 0000012420 | 9789 | 0012 | 0683 | 0040 | 8908 | 0CAF | 2B00 | 50D2 |
| 0000012440 | F5F7 | 8789 | 000E | E8D1 | 8789 | 0010 | 8358 | 10BF |
| 0000012460 | 0400 | 0C73 | 06C7 | 0C39 | 001D | 5E5B | 075B | 1DEB |
| 0000012500 | 815B | 1EC3 | 8100 | 10C6 | 4900 | 03E3 | 10E9 | 5EFF |
| 0000012520 | 075B | 87C7 | 0022 | FFFF | 88E8 | 5D40 | E913 | 39B8 |
| 0000012540 | 06C7 | 0A13 | FFFF | 06C7 | 08E0 | 0000 | 06C7 | 08E2 |
| 0000012560 | 0001 | CFE8 | B93E | 8B13 | E43E | 8108 | 06C7 | 8B00 |
| 0000012600 | 4836 | B900 | 0109 | A11E | 0876 | D88E | A4F3 | E81F |
| 0000012620 | 4051 | 13B9 | 3E8B | 08C8 | 85C7 | 010A | 0000 | 85C7 |
| 0000012640 | 010C | 0001 | C781 | 003C | 368B | 0048 | B946 | 0008 |
| 0000012660 | A11E | 0876 | D88E | A4F3 | E91F | 395C | C406 | 7436 |
| 0000012700 | 2608 | 8C8B | 0004 | BA07 | 0001 | 3E83 | 0048 | 7400 |
| 0000012720 | 4201 | 2DE3 | 06C7 | 0A13 | FFFF | 06C7 | 08E0 | 0000 |
| 0000012740 | 1689 | 08E2 | E842 | 3E5C | 1401 | 1E8B | 08E4 | 87C7 |
| 0000012760 | 0008 | FFFF | 87C7 | 000A | FFFF | E6E8 | 013F | E214 |
| 0000013000 | E9D1 | 3914 | C406 | 7436 | 2608 | 948B | 0004 | 4207 |
| 0000013020 | 3E83 | 0048 | 7400 | 4201 | 06C7 | 0A13 | FFFF | 06C7 |
| 0000013040 | 08D0 | FFFF | 06C7 | 08E0 | 0000 | 1689 | 08E2 | 13E8 |
| 0000013060 | 383E | E814 | 3FAD | 1438 | DDE9 | C738 | 4A06 | 0000 |
| 0000013100 | 0600 | 3E81 | 0878 | 0010 | 0373 | A1E9 | C702 | 5006 |
| 0000013120 | 1000 | C400 | 741E | 2608 | 878B | 0002 | 003D | 7402 |
| 0000013140 | 7705 | E90C | 0268 | 06C7 | 0044 | 0008 | 07EB | C790 |
| 0000013160 | 4406 | 1800 | 3D00 | 1000 | 0376 | 51E9 | A302 | 08CE |
| 0000013200 | D22B | 1689 | 0048 | 00B9 | 5002 | F1F7 | 8358 | 00FA |
| 0000013220 | 0374 | 39E9 | 3B02 | A006 | 7608 | E903 | 0230 | 8B50 |
| 0000013240 | A636 | E808 | 4412 | F003 | 8958 | 5084 | 2600 | 8F8B |
| 0000013260 | 0004 | 06C7 | 004C | 0000 | F726 | 0A87 | 1000 | 7400 |
| 0000013300 | 830C | 01F9 | 0374 | 9AE9 | 8900 | 4C0E | 3B00 | 440E |
| 0000013320 | 7600 | E903 | 008D | F38B | C681 | 0010 | 8B26 | 0097 |

THU MAR 14 17:20:30 1991 BTRCALLS.DLL PAGE 7, LINE 355

| | | | | | | | | |
|---|---|---|---|---|---|---|---|---|
| 0000013340 | 8300 | 4C3E | 0000 | 2C75 | 3E81 | 088E | 6176 | 1875 |
| 0000013360 | F726 | 0A87 | 0100 | 7400 | 830F | 04C2 | F726 | 0A87 |
| 0000013400 | 0200 | 7400 | 8303 | 02C2 | F726 | 0A87 | 0800 | 7400 |
| 0000013420 | BA03 | 0005 | FA83 | 7304 | E903 | 01CA | C02B | F983 |
| 0000013440 | 7500 | E903 | 0166 | 8B26 | 04BC | 8100 | 0BE7 | 8902 |
| 0000013460 | 463E | F700 | 01C7 | 7400 | 260E | BC80 | 000A | 750F |
| 0000013500 | E903 | 017A | C283 | 2B08 | 50ED | 0681 | 0050 | 0010 |
| 0000013520 | 50A1 | 3900 | 7806 | 5808 | 0373 | 91E9 | 3B01 | 4406 |
| 0000013540 | 7200 | C709 | 3906 | 1A0C | E900 | 018A | E781 | 020B |
| 0000013560 | 3E39 | 0046 | 0974 | 06C7 | 0C39 | 002D | 77E9 | 2601 |
| 0000013600 | BC8B | 0000 | FF83 | 7500 | E906 | 014A | CDE9 | 2600 |
| 0000013620 | BC8B | 0002 | FF83 | 7400 | 81F3 | FFFF | 7700 | 26ED |
| 0000013640 | BC80 | 000A | 750F | 8305 | 04FF | E077 | EF03 | FD81 |
| 0000013660 | 00FF | D877 | 0326 | 00BC | 4F00 | 3B26 | 00BF | 7700 |
| 0000013700 | 26C8 | BC8B | 0004 | C7F7 | 0020 | 3474 | C7F7 | 0100 |
| 0000013720 | 0975 | C7F7 | 0004 | 2474 | 19EB | 2690 | BC80 | 000A |
| 0000013740 | 740A | 2619 | BC80 | 000A | 740B | 2611 | BC80 | 000A |
| 0000013760 | 7400 | C709 | 3906 | 310C | E900 | 00FA | 06FF | 0048 |
| 0000014000 | C7F7 | 0100 | 0975 | C7F7 | 0004 | 1F75 | 51EB | FF90 |
| 0000014020 | 4A06 | 2600 | BC80 | 000A | 740E | 2610 | BC80 | 000A |
| 0000014040 | 740F | 2608 | BC80 | 000A | 730C | 26C8 | 84F7 | 0002 |
| 0000014060 | 0001 | 2B74 | 8026 | 0ABC | 0000 | 2374 | 8026 | 0ABC |
| 0000014100 | 0E00 | 1874 | 8026 | 0ABC | 0500 | 1072 | 8026 | 0ABC |
| 0000014120 | 0900 | 0874 | 8026 | 0ABC | 0F00 | 0375 | 7FE9 | 4000 |
| 0000014140 | C7F7 | 0010 | 1C74 | 8026 | 0ABC | 0F00 | 5074 | C681 |
| 0000014160 | 0010 | 8026 | 0ABC | 0F00 | 4474 | 8B26 | 04BC | E900 |
| 0000014200 | FEC7 | C681 | 0010 | E349 | E903 | FE92 | 8B26 | 0287 |
| 0000014220 | 2D00 | 0006 | D03B | 4E77 | 1689 | 0042 | 3E83 | 0048 |
| 0000014240 | 7400 | 8153 | 5006 | 0900 | A101 | 0050 | 0639 | 0878 |
| 0000014260 | 3C72 | 3689 | 0048 | ACB8 | 2600 | 0438 | 3874 | 06C7 |
| 0000014300 | 0C39 | 0037 | 30EB | 06C7 | 0C39 | 0030 | 28EB | 06C7 |
| 0000014320 | 0C39 | 0018 | 20EB | 06C7 | 0C39 | 001B | 18EB | 06C7 |
| 0000014340 | 0C39 | 001D | 10EB | 06C7 | 0C39 | 001C | 08EB | 06C7 |
| 0000014360 | 0C39 | 0016 | 00EB | E907 | 361E | FBE8 | 0635 | 1EC4 |
| 0000014400 | 0874 | F726 | 0A87 | 0400 | 7400 | 8B52 | A63E | E808 |
| 0000014420 | 41A6 | F803 | 858B | 0050 | 8B26 | 0E8F | 8B00 | C836 |
| 0000014440 | 8908 | 488C | F700 | 8BE1 | 8BCA | 4AD0 | FA83 | 75FF |
| 0000014460 | 4801 | 9D8B | 0000 | 42B4 | 00B0 | 33E8 | B45E | B940 |
| 0000014500 | 0001 | 2CBA | 8B0B | C6F2 | 0004 | 23E8 | 725E | 3D08 |
| 0000014520 | 0001 | 0375 | 07EB | C790 | 3906 | 120C | 0700 | B0E9 |
| 0000014540 | 0035 | 93E8 | 8B35 | 3E1E | F60C | 9387 | 010D | 0375 |
| 0000014560 | 0CE9 | A101 | 0C75 | C4A3 | A108 | 0C77 | C6A3 | E808 |
| 0000014600 | 4924 | 1897 | BAE8 | 8736 | 8D18 | 4036 | E80C | 3469 |
| 0000014620 | 0000 | 06C7 | 0A0D | FFFF | A9E8 | 973A | 8D18 | D63E |
| 0000014640 | A508 | 8BA5 | E62E | 8908 | D42E | 8B08 | E42E | 8908 |
| 0000014660 | D22E | E808 | 4D4C | 1887 | 2E03 | 0A19 | 1E8B | 08C8 |
| 0000014700 | 978B | 0016 | FA83 | 7500 | E805 | 6007 | 1887 | 8F8B |
| 0000014720 | 0014 | C381 | 0110 | 22E3 | F58B | 3E8D | 0902 | 831E |
| 0000014740 | 00FA | 0775 | 1E8E | 08F8 | 00BE | E800 | 3000 | E81F |
| 0000014760 | 2162 | 1887 | 80E8 | 4930 | DCEB | 1E8B | 08C8 | FA83 |
| 0000015000 | 7400 | 8007 | 38BF | 0000 | 2374 | FD8B | BF03 | 0016 |
| 0000015020 | 058B | 26A3 | 8B05 | 0245 | 28A3 | A105 | 0876 | 4BE8 |
| 0000015040 | 874E | 8318 | 16BF | 0000 | 0375 | 78A3 | 2B08 | 8BC0 |
| 0000015060 | 188F | 8B00 | F3FD | 8BAA | 1097 | 8900 | 0056 | 978B |
| 0000015100 | 0012 | 5689 | 8B02 | D216 | 8908 | E416 | E808 | 3B93 |
| 0000015120 | 1887 | 168B | 08D6 | 9789 | 0010 | 168B | 08D8 | 9789 |
| 0000015140 | 0012 | AF83 | 001C | 8301 | 1A9F | 0000 | 06C7 | 0C40 |
| 0000015160 | FFFF | 3681 | 0C75 | FFFF | 76E8 | 8736 | EB18 | C718 |
| 0000015200 | 3906 | 080C | EB00 | FF27 | 3936 | E80C | 1C24 | 1896 |

THU MAR 14 17:20:30 1991 BTRCALLS.DLL PAGE 8, LINE 414

| | | | | | | | | |
|---|---|---|---|---|---|---|---|---|
| 0000015220 | 068F | 0C39 | 01EB | FF58 | 3936 | E80C | 3DCB | 0000 |
| 0000015240 | 1AE8 | 0037 | E800 | 48CD | 0000 | 068F | 0C39 | 60E9 |
| 0000015260 | 0034 | 43E8 | 8134 | C43E | FF00 | 75FF | E903 | 00CE |
| 0000015300 | 89E8 | AB34 | 8B19 | C81E | FF08 | 0487 | F700 | 0487 |
| 0000015320 | 0000 | 7480 | C706 | 0487 | 0000 | 8B00 | 0487 | A300 |
| 0000015340 | 0C73 | BF83 | 0024 | 7401 | E903 | 0090 | 2BE8 | 0016 |
| 0000015360 | 8B00 | 81FB | 98C7 | B900 | 0040 | 368D | 0B2C | 7C81 |
| 0000015400 | 3A01 | 745C | EB03 | 907E | A4F3 | 168B | 08C8 | C281 |
| 0000015420 | 0098 | C933 | 5BB4 | 57E8 | 735C | EB03 | 9079 | BB50 |
| 0000015440 | 00FF | 063A | 0889 | 3C75 | 3E8B | 08A6 | 89E8 | 033F |
| 0000015460 | 8BF8 | 009D | 8B00 | 8BEF | C83E | B408 | B042 | 3302 |
| 0000015500 | 33D2 | E8C9 | 5C2A | 5772 | 8B50 | 2BC2 | 8BD2 | CE0E |
| 0000015520 | F708 | 89F1 | 6C85 | 5800 | F1F7 | 8589 | 006E | 85C7 |
| 0000015540 | 0044 | FFFF | 1E8B | 08C8 | 87C7 | 0024 | 0002 | 80E8 |
| 0000015560 | 0035 | 5B00 | 3EB4 | F7E8 | EB5B | 902B | 06C7 | 0C39 |
| 0000015600 | 001F | 22EB | C790 | 3906 | 220C | EB00 | 9019 | 06C7 |
| 0000015620 | 0C39 | 0029 | 15EB | 06C7 | 0C39 | 0020 | 08EB | 5890 |
| 0000015640 | 06C7 | 0C39 | 0002 | 14E8 | 0036 | E900 | 3363 | 47E8 |
| 0000015660 | E833 | 3398 | 1A7A | 93E8 | 752C | 0B1A | 75DB | C709 |
| 0000015700 | 3906 | 060C | E900 | 00AD | 6BE8 | 002D | 8100 | 823E |
| 0000015720 | 0808 | 7400 | 8142 | 823E | 0A08 | 7400 | C728 | 3B06 |
| 0000015740 | FF0C | E8FF | 00B0 | 19EA | 3DEB | 3E81 | 0882 | 0005 |
| 0000015760 | 0375 | 80E9 | 8100 | 393E | 040C | 7500 | 8178 | 823E |
| 0000016000 | 0908 | 7400 | C712 | 4006 | FF0C | E8FF | 060C | 1A75 |
| 0000016020 | 6AE8 | 7400 | EBF6 | C710 | 4006 | FF0C | E8FF | 03E0 |
| 0000016040 | 1A75 | 58E8 | 7400 | 8BF6 | E836 | 8108 | 04C6 | 0300 |
| 0000016060 | 0AB7 | F700 | 0887 | 0100 | 7400 | F71B | 0887 | 8000 |
| 0000016100 | 7500 | 8113 | 823E | 0B08 | 7400 | 8108 | 823E | 0A08 |
| 0000016120 | 7500 | 8303 | 04C6 | E5E8 | 002E | 8300 | 393E | 000C |
| 0000016140 | 0874 | 3E81 | 0C39 | 0016 | 0B75 | 39A1 | E80C | 2E84 |
| 0000016160 | 1A75 | 39A3 | E80C | 3545 | 0000 | 94E9 | FF32 | 3B36 |
| 0000016200 | C70C | 3B06 | FF0C | 57FF | 3E8B | 08E8 | 4DE8 | 5F2D |
| 0000016220 | 068F | 0C3B | 90C3 | 5FE8 | BD32 | FFFF | 06C7 | 0C4E |
| 0000016240 | FFFF | 8F8B | 0000 | 0E89 | 08E0 | 8F8B | 0002 | 0E89 |
| 0000016260 | 08E2 | 978B | 000C | 0E8B | 0C83 | 0E89 | 0C37 | 06C7 |
| 0000016300 | 0C83 | 0000 | 13E8 | 902E | E81B | 3778 | 1B90 | 368B |
| 0000016320 | 08E4 | 8C8B | 0006 | F983 | 7500 | E903 | 0086 | FE8B |
| 0000016340 | C781 | 000C | F5E8 | 722C | 742C | 8B48 | E83E | 0308 |
| 0000016360 | E2FA | 81F1 | 08BC | FF00 | 75FF | C708 | E806 | FF08 |
| 0000016400 | EBFF | 8B61 | 088C | 8900 | E00E | 8B08 | 0A8C | 8900 |
| 0000016420 | E20E | EB08 | 8BAF | E836 | 8108 | 00BC | FF00 | 74FF |
| 0000016440 | 8B43 | 008C | 8900 | E00E | 8B08 | 028C | 8900 | E20E |
| 0000016460 | EB08 | 8B91 | C83E | 8308 | 14BD | FF00 | 0874 | 87F7 |
| 0000016500 | 0008 | 0080 | 2C74 | 87F7 | 0008 | 0001 | 2474 | BC81 |
| 0000016520 | 0008 | FFFF | 1C74 | 2E39 | 0C4E | 1674 | B77C | 2E8B |
| 0000016540 | 0C4E | B1EB | FD83 | 74FF | E903 | FF30 | 06C7 | 0C39 |
| 0000016560 | 0004 | 36FF | 0C39 | 0E8B | 0C37 | 0E89 | 0C83 | F981 |
| 0000016600 | 0000 | 0574 | 5BE8 | 8F1A | 8F1B | 3906 | EB0C | 5A01 |
| 0000016620 | 06C7 | 0C3B | 0000 | 78E9 | C731 | 0F06 | FF0A | EBFF |
| 0000016640 | C706 | 0F06 | 000A | E800 | 314E | 9FE8 | 0231 | E81C |
| 0000016660 | 2A9A | 1BFD | DB0B | 0975 | 06C7 | 0C39 | 0006 | 3DEB |
| 0000016700 | 8B90 | 0087 | A300 | 08E0 | 878B | 0002 | E2A3 | C708 |
| 0000016720 | 4E06 | FF0C | E8FF | 002D | 1BFD | 368D | 0C40 | 5DE8 |
| 0000016740 | 002D | 8300 | 393E | 000C | 0874 | 3E81 | 0C39 | 0016 |
| 0000016760 | 0B75 | 39A1 | E80C | 2CFC | 1BFD | 39A3 | E80C | 33BD |
| 0000017000 | 0000 | 0CE9 | E831 | 30F0 | 0E8B | 0C83 | 0E89 | 0C37 |
| 0000017020 | 06C7 | 0C83 | 0000 | C1E8 | AF2C | E81C | 3626 | 1CAF |
| 0000017040 | 368B | 08E4 | BC83 | 0006 | 7400 | 817E | 08BC | FF00 |
| 0000017060 | 74FF | 8120 | 0F3E | FF0A | 75FF | 8107 | 0CC6 | EB00 |

THU MAR 14 17:20:30 1991 BTRCALLS.DLL PAGE 9, LINE 473

| | | | | | | | | |
|---|---|---|---|---|---|---|---|---|
| 0000017100 | 9005 | C681 | 0008 | 048B | E0A3 | 8B08 | 0244 | E2A3 |
| 0000017120 | EB08 | 8BC3 | 370E | 890C | 830E | 810C | 00F9 | 7400 |
| 0000017140 | E805 | 197E | 1CAF | 3E81 | 0A0F | FFFF | 1375 | C681 |
| 0000017160 | 000C | 3689 | 08E8 | C681 | 0004 | B703 | 000A | 1CEB |
| 0000017200 | 8B90 | 0684 | 8B00 | 0C8F | F700 | 81E1 | 0CC6 | 030C |
| 0000017220 | 89F0 | E836 | 2908 | E80E | 8308 | 04EE | 048B | 40A3 |
| 0000017240 | 8B0C | 0244 | 42A3 | EB0C | C706 | 3906 | 090C | E900 |
| 0000017260 | 305F | 43E8 | 8B30 | 821E | 8908 | 981E | F608 | 9387 |
| 0000017300 | 040D | 0574 | F9E8 | F52F | 811D | 423E | 3205 | 7500 |
| 0000017320 | 8118 | 06FB | 7500 | C709 | 8206 | 0808 | EB00 | 9007 |
| 0000017340 | 06C7 | 0882 | 000A | 2AEB | 8B90 | 3E1E | 810C | 37FB |
| 0000017360 | 7200 | 8127 | 3FFB | 7700 | 8B21 | 821E | 8108 | 06FB |
| 0000017400 | 7500 | C709 | 8206 | 0808 | EB00 | 9007 | 06C7 | 0882 |
| 0000017420 | 000A | 99E8 | 00FC | E900 | 00DB | 2FE8 | F530 | E81D |
| 0000017440 | 292A | 1DF0 | DB0B | 0975 | 06C7 | 0C39 | 0006 | BFE9 |
| 0000017460 | 2B00 | A0CD | 0889 | 063B | 0C4C | 0374 | ABE9 | 8100 |
| 0000017500 | 823E | 2408 | 7400 | 8108 | 823E | 0608 | 7500 | 810F |
| 0000017520 | 483E | FF0C | 75FF | E816 | 00A6 | 1DF0 | 4BEB | 3E81 |
| 0000017540 | 0C44 | FFFF | 0775 | B1E8 | F002 | EB1D | 813C | 403E |
| 0000017560 | FF0C | 75FF | E80A | 29BE | 0000 | 19E8 | F0FD | 811D |
| 0000017600 | 823E | 2408 | 7400 | 8108 | 823E | 0608 | 7500 | A10E |
| 0000017620 | 0C48 | 40A3 | A10C | 0C4A | 42A3 | EB0C | A10C | 0C44 |
| 0000017640 | 40A3 | A10C | 0C46 | 42A3 | 8D0C | 4036 | E80C | 2B8E |
| 0000017660 | 0000 | 3E83 | 0C39 | 7400 | 810A | 393E | 160C | 7500 |
| 0000017700 | EB2F | 8B1A | 823E | F608 | 9385 | 040D | 0F74 | 53E8 |
| 0000017720 | 002E | 8300 | 393E | FF0C | 0375 | 62E9 | A1FF | 0C39 |
| 0000017740 | 11E8 | F02B | A31D | 0C39 | 06EB | 06C7 | 0C39 | 0007 |
| 0000017760 | CAE8 | 0031 | 8B00 | 981E | 8908 | 821E | E908 | 2F11 |
| 0000020000 | F5E8 | 8B2E | 4E2E | 830C | 06BF | 0000 | 0A75 | BF83 |
| 0000020020 | 0004 | 7500 | E903 | 01F4 | 06C7 | 0A0F | FFFF | 3E81 |
| 0000020040 | 0C40 | FFFF | 7B75 | 0DE8 | 0029 | E800 | FC68 | 0000 |
| 0000020060 | E0A1 | A308 | 08CA | E2A1 | A308 | 08CC | 3E81 | 0C39 |
| 0000020100 | 0004 | 4574 | 368B | 08E8 | 87F7 | 0008 | 4000 | 0974 |
| 0000020120 | B703 | 000C | EE83 | EB04 | 811B | 04C6 | 0300 | 0AB7 |
| 0000020140 | F700 | 0887 | 0100 | 7400 | F70B | 0887 | 8000 | 7500 |
| 0000020160 | 8303 | 04C6 | 048B | 40A3 | 8B0C | 0244 | 42A3 | 830C |
| 0000020200 | 393E | 000C | 3474 | 8DE9 | C701 | 3906 | 000C | 8100 |
| 0000020220 | E83E | FF08 | 75FF | E903 | 0092 | 368B | 08E8 | 29E9 |
| 0000020240 | E801 | 2869 | 048B | E0A3 | A308 | 08CA | 448B | A302 |
| 0000020260 | 08E2 | CCA3 | E808 | 338C | 2016 | 368B | 08E4 | FE8B |
| 0000020300 | 8C8B | 0006 | C681 | 000C | 87F7 | 0008 | 4000 | 1974 |
| 0000020320 | B703 | 000C | EE83 | FF04 | 4A36 | 8F0C | 4006 | FF0C |
| 0000020340 | 4636 | 8F0C | 4206 | EB0C | 811B | 04C6 | 0300 | 0AB7 |
| 0000020360 | F700 | 0887 | 0100 | 7400 | F70B | 0887 | 8000 | 7500 |
| 0000020400 | 8303 | 04C6 | 42A1 | 3B0C | 0244 | 0775 | 40A1 | 3B0C |
| 0000020420 | 7404 | 0309 | 0CB7 | E200 | E9EB | 00F0 | F983 | 7401 |
| 0000020440 | E903 | 009B | BD81 | 0008 | FFFF | 7E75 | 3E83 | 0C4E |
| 0000020460 | 7500 | E903 | 00D6 | E3E8 | 1627 | E820 | 3306 | 2016 |
| 0000020500 | 3E8B | 08E4 | CCA1 | 3B08 | 0A85 | 7500 | A117 | 08CA |
| 0000020520 | 853B | 0008 | 0E75 | E0A1 | A308 | 08CA | E2A1 | A308 |
| 0000020540 | 08CC | C8EB | C781 | 000C | CCA1 | 3B08 | 0285 | 7500 |
| 0000020560 | A109 | 08CA | 853B | 0000 | 0674 | BF03 | 000C | E8EB |
| 0000020600 | 3E89 | 08E8 | 87F7 | 0008 | 4000 | 0974 | BF03 | 000C |
| 0000020620 | EF83 | EB04 | 8108 | 04C7 | 0300 | 0ABF | 8B00 | A305 |
| 0000020640 | 0C40 | 458B | A302 | 0C42 | 6CEB | 858B | 0008 | E0A3 |
| 0000020660 | 8B08 | 0A85 | A300 | 08E2 | 4AE8 | 16FC | EB20 | 8157 |
| 0000020700 | 08BD | FF00 | 75FF | 832D | 04C6 | 3689 | 08E8 | 87F7 |
| 0000020720 | 0008 | 4000 | 0974 | B703 | 000C | EE83 | EB04 | 8108 |
| 0000020740 | 04C6 | 0300 | 0AB7 | 8B00 | A304 | 0C40 | 448B | A302 |

THU MAR 14 17:20:30 1991 BTRCALLS.DLL PAGE 10, LINE 532

| | | | | | | | | |
|---|---|---|---|---|---|---|---|---|
| 0000020760 | 0C42 | 22EB | C683 | 8B04 | 0084 | A300 | 08E0 | 848B |
| 0000021000 | 0002 | E2A3 | E808 | FBFD | 2016 | 0AEB | 06C7 | 0C39 |
| 0000021020 | 0009 | 2E89 | 0C4E | F8E9 | 002C | DBE8 | 8B2C | 4E2E |
| 0000021040 | 830C | 06BF | 0000 | 0A75 | BF83 | 0004 | 7500 | E903 |
| 0000021060 | 01EC | 06C7 | 0A0F | 0000 | 3E81 | 0C40 | FFFF | 0374 |
| 0000021100 | 8AE9 | E800 | 26F0 | 0000 | 4BE8 | 00FA | A100 | 08E0 |
| 0000021120 | CAA3 | A108 | 08E2 | CCA3 | 8108 | 393E | 040C | 7400 |
| 0000021140 | 8B32 | E836 | F708 | 0887 | 0000 | 7440 | 0309 | 0CB7 |
| 0000021160 | 8300 | 04EE | 08EB | C681 | 0004 | B703 | 000A | 048B |
| 0000021200 | 40A3 | 8B0C | 0244 | 42A3 | 830C | 393E | 000C | 5674 |
| 0000021220 | 95E9 | C701 | 3906 | 000C | 8B00 | E436 | 8B08 | 81FE |
| 0000021240 | 0CC6 | 3B00 | E836 | 7508 | E903 | 009A | 8F8B | 000C |
| 0000021260 | 3E81 | 08E8 | FFFF | 0974 | 368B | 08E8 | F12B | 17E9 |
| 0000021300 | 8B01 | 0685 | 4800 | E1F7 | F003 | 0BE9 | E801 | 263D |
| 0000021320 | 048B | E0A3 | A308 | 08CA | 448B | A302 | 08E2 | CCA3 |
| 0000021340 | E808 | 3160 | 2228 | 368B | 08E4 | FE8B | 8C8B | 0006 |
| 0000021360 | C681 | 000C | 87F7 | 0008 | 4000 | 1974 | B703 | 000C |
| 0000021400 | EE83 | FF04 | 4A36 | 8F0C | 4006 | FF0C | 4636 | 8F0C |
| 0000021420 | 4206 | EB0C | 8108 | 04C6 | 0300 | 0AB7 | A100 | 0C42 |
| 0000021440 | 443B | 7502 | A107 | 0C40 | 043B | 0974 | B703 | 000C |
| 0000021460 | EBE2 | E9E9 | 8100 | 08BD | FF00 | 74FF | E903 | 00B0 |
| 0000021500 | 8D3B | 0006 | 7575 | 3E83 | 0C4E | 7500 | E903 | 00CE |
| 0000021520 | C9E8 | 2825 | E822 | 30EC | 2228 | 3E8B | 08E4 | F78B |
| 0000021540 | C781 | 000C | CCA1 | 3B08 | 0285 | 7500 | A117 | 08CA |
| 0000021560 | 853B | 0000 | 0E75 | E0A1 | A308 | 08CA | E2A1 | A308 |
| 0000021600 | 08CC | C2EB | 8C8B | 0006 | CCA1 | 3B08 | 0285 | 7500 |
| 0000021620 | A109 | 08CA | 853B | 0000 | 0674 | BF03 | 000C | E8E2 |
| 0000021640 | EF83 | 8B04 | A305 | 0C40 | 458B | A302 | 0C42 | C783 |
| 0000021660 | 2B04 | 0CBF | 8900 | E83E | EB08 | F76D | 0887 | 0000 |
| 0000021700 | 7440 | 2B09 | 0CB7 | 8300 | 04C6 | 08EB | B72B | 000A |
| 0000021720 | EE81 | 0004 | B72B | 000C | 3689 | 08E8 | B703 | 000C |
| 0000021740 | EE83 | 8B04 | A304 | 0C40 | 448B | A302 | 0C42 | 38EB |
| 0000021760 | 87F7 | 0008 | 4000 | 0974 | B72B | 000C | C683 | EB04 |
| 0000022000 | 2B08 | 0AB7 | 8100 | 04EE | 8B00 | 0084 | A300 | 08E0 |
| 0000022020 | 848B | 0002 | E2A3 | E808 | F9EB | 2228 | 0AEB | 06C7 |
| 0000022040 | 0C39 | 0009 | 2E89 | 0C4E | E6E9 | 002A | C9E8 | E82A |
| 0000022060 | 2B1A | 22C9 | 1E8B | 08C8 | 3E8D | 0C75 | C51E | 7436 |
| 0000022100 | A508 | 1FA5 | 368D | 0C75 | CBE8 | C302 | F722 | 1487 |
| 0000022120 | FF00 | 74FF | E80F | 2FEC | 22DB | E4A1 | 0308 | 1906 |
| 0000022140 | A30A | 08E8 | D7E8 | 0026 | A100 | 0C39 | 003D | 7400 |
| 0000022160 | 3D07 | 0016 | 5375 | 25EB | D1E8 | B823 | 0B22 | 74DB |
| 0000022200 | 1E1C | 36C5 | 0874 | 3E8D | 0902 | 61E8 | 1F25 | FCE8 |
| 0000022220 | 7425 | E80F | F800 | 22AA | 59E8 | B826 | A322 | 0C39 |
| 0000022240 | 39EB | 06C7 | 0C39 | 002C | 0EEB | 3E81 | 0C39 | 0004 |
| 0000022260 | 0675 | 06C7 | 0C39 | 002B | 003D | 7400 | A30C | 0C39 |
| 0000022300 | 07EB | C790 | 3906 | 2B0C | B900 | 000C | FFB8 | 8DFF |
| 0000022320 | 403E | F30C | A3AA | 0C75 | 77A3 | E80C | 2CDF | 0000 |
| 0000022340 | 2EE9 | E82A | 2A12 | 1E8B | 0882 | 87F6 | 0D93 | 7404 |
| 0000022360 | E805 | 29CC | 24C6 | 3E81 | 0882 | 001F | 0574 | 4BE8 |
| 0000022400 | B92A | 8B24 | C81E | 8D08 | 7536 | 2B0C | 39C0 | 0244 |
| 0000022420 | 1D75 | 0439 | 2275 | 3E83 | 0882 | 7423 | 8307 | 823E |
| 0000022440 | 2708 | 0375 | 7CE9 | A301 | 08E0 | E2A3 | EB08 | 8143 |
| 0000022460 | FF3C | 75FF | E903 | 0163 | BEE8 | B928 | 8324 | 823E |
| 0000022500 | 2708 | 0774 | 3EB3 | 0882 | 7523 | A111 | 0A19 | 06B9 |
| 0000022520 | 3B00 | 76C1 | 2B2B | 1887 | E900 | 0085 | 0E8B | 08CE |
| 0000022540 | 8F2B | 0018 | 19A1 | 030A | 1887 | 3B00 | 76C1 | EB72 |
| 0000022560 | 9049 | 3E83 | 0882 | 7427 | 8307 | 823E | 2308 | 3A75 |
| 0000022600 | 3E83 | 08E2 | 7500 | FF04 | E00E | FF08 | E20E | A108 |
| 0000022620 | 08E0 | 3E83 | 08E2 | 7500 | 3D08 | 0000 | 0375 | 02E9 |

THU MAR 14 17:20:30 1991 BTRCALLS.DLL PAGE 11, LINE 591

| | | | | | | | | |
|---|---|---|---|---|---|---|---|---|
| 0000022640 | A101 | 08CE | 062D | 3300 | 8BD2 | 188F | 5100 | F1F7 |
| 0000022660 | 4859 | E1F7 | 0605 | EB00 | 9028 | 06FF | 08E2 | 3E83 |
| 0000022700 | 08E2 | 7500 | FF04 | E006 | A108 | 08E0 | 8738 | 0026 |
| 0000022720 | 0C75 | E2A1 | 3908 | 2887 | 7500 | E903 | 00C5 | 06B8 |
| 0000022740 | E800 | 2E60 | 2372 | 368B | 08E4 | 84F7 | 0004 | 8000 |
| 0000022760 | 8074 | 19A3 | 030A | 8BF0 | 8BFE | 168F | E300 | 8B30 |
| 0000023000 | 188F | 8300 | 04E9 | 09E3 | C783 | 2B04 | F3C0 | 75AE |
| 0000023020 | 8336 | 003C | 0975 | 7C83 | 0002 | 0375 | 1EE9 | 81FF |
| 0000023040 | FF3C | 75FF | 810A | 027C | FFFF | 0375 | 0EE9 | 83FF |
| 0000023060 | 16BF | 0000 | 0975 | 7C80 | 0004 | 0B75 | FEE9 | E8FE |
| 0000023100 | 00D4 | 2447 | F6E9 | E8FE | 21DA | 0000 | 3E81 | 0542 |
| 0000023120 | 0064 | 097C | 368D | 08C4 | A7E8 | B93D | A124 | 08C4 |
| 0000023140 | 75A3 | A30C | 0C40 | C6A1 | A308 | 0C77 | 42A3 | 810C |
| 0000023160 | 823E | 1F08 | 7400 | E84F | 25EA | 24B9 | AEE8 | AB26 |
| 0000023200 | 8B24 | 823E | F608 | 9385 | 040D | 2D74 | 95E8 | 0027 |
| 0000023220 | 8300 | 393E | FF0C | 2175 | 68E9 | C7FE | 3906 | 080C |
| 0000023240 | EB00 | C716 | 3906 | 090C | EB00 | 810E | 393E | 160C |
| 0000023260 | 7400 | C706 | 3906 | 360C | 8100 | 823E | 1F08 | 7400 |
| 0000023300 | E805 | 2AF9 | 0000 | 48E9 | E828 | 282C | C033 | 75A3 |
| 0000023320 | A30C | 0C77 | 0CE8 | 00FE | E900 | 2835 | 19E8 | 8B28 |
| 0000023340 | A63E | E808 | 33D2 | F803 | C033 | 9D8B | 0000 | 42B4 |
| 0000023360 | 02B0 | C933 | D233 | 77E8 | 8950 | 7516 | A30C | 0C77 |
| 0000023400 | 36FF | 0882 | 06C7 | 0882 | 0023 | D6E8 | 00FD | 8F00 |
| 0000023420 | 8206 | E908 | 27FB | DFE8 | 8327 | 14BF | FF00 | 0C74 |
| 0000023440 | 36FF | 08E0 | 36FF | 08E2 | 36FF | 0A19 | CAE8 | 5B26 |
| 0000023460 | 8D25 | E036 | 8D08 | 26BF | B900 | 0002 | A7F3 | 1B77 |
| 0000023500 | 19A1 | 2D0A | 0006 | D22B | BF83 | 0014 | 75FF | 2D03 |
| 0000023520 | 0006 | B7F7 | 0018 | FA83 | 7400 | C706 | 3906 | FF0C |
| 0000023540 | 83FF | 14BF | FF00 | 0C74 | 068F | 0A19 | 068F | 08E2 |
| 0000023560 | 068F | 08E0 | 9AE9 | E827 | 277E | 04B9 | 3900 | 780E |
| 0000023600 | 7208 | 8D25 | 7536 | 810C | FF3C | 74FF | 8323 | 027C |
| 0000023620 | 7500 | 8305 | 003C | 1874 | C406 | 743E | F308 | 07A4 |
| 0000023640 | 06C7 | 0878 | 0004 | 0EEB | 06C7 | 0C39 | 0016 | 06EB |
| 0000023660 | 06C7 | 0C39 | 0008 | 58E9 | 0027 | 3BE8 | E827 | 3AE6 |
| 0000023700 | 289A | 7CE8 | 7328 | 8B28 | C81E | E808 | 3776 | 2873 |
| 0000023720 | BF83 | 0014 | 75FF | B921 | 0001 | 878B | 001E | 4AA3 |
| 0000023740 | 8B0C | 2087 | A300 | 0C46 | 978B | 0016 | 163B | 0878 |
| 0000023760 | 0376 | 78E9 | E902 | 010B | BF81 | 0010 | FFFF | 2574 |
| 0000024000 | B78D | 0010 | F2E8 | 0025 | C700 | 0D06 | FF0A | E8FF |
| 0000024020 | 2C32 | 2873 | FE8B | 368B | 08E4 | 3603 | 0A19 | 02B9 |
| 0000024040 | F300 | EBA5 | 8B70 | 1887 | 3B00 | 2A87 | 7600 | C73E |
| 0000024060 | 1306 | FF0A | C7FF | D006 | FF08 | 8BFF | 2697 | 8900 |
| 0000024100 | E016 | 8908 | 1E97 | 8B00 | 2897 | 8900 | E216 | 8908 |
| 0000024120 | 2097 | 8B00 | CE16 | 8908 | 2A97 | 8100 | 2AAF | 0600 |
| 0000024140 | FF00 | 2887 | 7500 | FF13 | 2687 | EB00 | 8D0D | 1EB7 |
| 0000024160 | 8D00 | E03E | B908 | 0002 | A5F3 | 06C7 | 0A0D | FFFF |
| 0000024200 | C1E8 | 732B | 8B28 | CE16 | 2B08 | 2A97 | 8900 | 1916 |
| 0000024220 | 290A | 2A87 | 8B00 | E43E | 0308 | 193E | 8B0A | 8BD7 |
| 0000024240 | 168F | 8300 | 0EBF | 0001 | 0474 | 8F8B | 010E | 0E3B |
| 0000024260 | 0878 | 0376 | B6E9 | 8301 | 0EBF | 0001 | 0975 | C51E |
| 0000024300 | 7436 | E808 | 2552 | 8B1F | E63E | 8908 | D43E | 8B08 |
| 0000024320 | E43E | 8908 | D23E | 0308 | 193E | 030A | 16BF | 5700 |
| 0000024340 | 8F8B | 0018 | 8F2B | 0016 | FFB8 | F3FF | E8AA | 1F34 |
| 0000024360 | 0000 | C4A1 | A308 | 0C75 | C6A1 | A308 | 0C77 | 8B58 |
| 0000024400 | 148F | 8D00 | 109F | 8301 | 00F9 | 0375 | CFE9 | 8D00 |
| 0000024420 | 023E | 1E09 | 36C5 | 0874 | D3E8 | 1F20 | BF80 | 001C |
| 0000024440 | 750F | 8315 | 023E | 0009 | 0E75 | BF83 | 0016 | 7402 |
| 0000024460 | 830A | 043E | 0009 | 0374 | 97E9 | 5100 | 878B | 0000 |
| 0000024500 | E0A3 | 8B08 | 0287 | A300 | 08E2 | 06C7 | 0A0F | 0000 |

THU MAR 14 17:20:30 1991 BTRCALLS.DLL PAGE 12, LINE 650

| | | | | | | | | |
|---|---|---|---|---|---|---|---|---|
| 0000024520 | 06C7 | 0C4E | FFFF | ACE8 | 00F4 | 8100 | 393E | 090C |
| 0000024540 | 7400 | 8D12 | 023E | 8B09 | E836 | 8108 | 04C6 | 8B00 |
| 0000024560 | 168F | F300 | 8DA4 | 0036 | 0309 | 16B7 | 8300 | 003C |
| 0000024600 | 147D | 1EF7 | 0902 | BF83 | 0016 | 7402 | 8309 | 0416 |
| 0000024620 | 0009 | 1EF7 | 0904 | 0683 | 0902 | 8301 | 16BF | 0200 |
| 0000024640 | 0574 | 1683 | 0904 | 8D00 | 0236 | 8B09 | D23E | 0308 |
| 0000024660 | 193E | 030A | 14BF | 8B00 | 168F | F300 | 8DA4 | 0236 |
| 0000024700 | 0609 | 3EC4 | 0874 | BF03 | 0014 | 8F8B | 0016 | A4F3 |
| 0000024720 | 5907 | BBE8 | 7313 | E828 | 209D | E949 | FF29 | 1E8B |
| 0000024740 | 08C8 | BF83 | 0014 | 74FF | 833F | 0EBF | 0001 | 0774 |
| 0000024760 | 58E8 | 7350 | EB28 | 8026 | 38BF | 0000 | 1F74 | B5E8 |
| 0000025000 | 7340 | 8828 | A1F8 | 0526 | 0589 | 28A1 | 8905 | 0245 |
| 0000025020 | 87F6 | 0038 | 7502 | A106 | 0531 | 4589 | A104 | 08D2 |
| 0000025040 | E4A3 | E808 | 2BBD | 2873 | C9E8 | 7320 | 2B28 | A0C0 |
| 0000025060 | 0889 | 4CA3 | 8B0C | C81E | FF08 | 1C87 | 7500 | FF04 |
| 0000025100 | 1A87 | 8300 | 14BF | FF00 | 0A75 | 87FF | 0020 | D475 |
| 0000025120 | 87FF | 001E | 06C7 | 0C40 | FFFF | 06C7 | 0C48 | FFFF |
| 0000025140 | 06C7 | 0C44 | FFFF | 88E8 | 7326 | EB28 | C716 | 3906 |
| 0000025160 | 160C | FF00 | 3936 | E80C | 0C38 | 2882 | 068F | 0C39 |
| 0000025200 | 01EB | FF58 | 3936 | E80C | 2DDF | 0000 | 2EE8 | 0027 |
| 0000025220 | E800 | 38E1 | 0000 | 068F | 0C39 | 74E9 | 0024 | 57E8 |
| 0000025240 | 8124 | C43E | FF00 | 75FF | E903 | 00D7 | 9DE8 | 6F24 |
| 0000025260 | 8B29 | A63E | E808 | 3000 | F803 | 79E8 | 003A | 8000 |
| 0000025300 | 703E | FF0C | 0574 | BAE8 | 2B3A | 8B29 | C81E | B808 |
| 0000025320 | 00FE | 0638 | 0C70 | 0375 | 3EEB | F790 | 0A87 | 0000 |
| 0000025340 | 7480 | 8129 | 0AA7 | FF00 | C73F | DC06 | FF08 | C7FF |
| 0000025360 | 8206 | 0208 | 8B00 | EE16 | 8908 | F216 | E808 | 25F1 |
| 0000025400 | 2931 | 06C7 | 0882 | 0001 | 0EFF | 0A15 | BD83 | 0002 |
| 0000025420 | 74FF | E805 | 0079 | 2941 | BF83 | 0024 | 7401 | E805 |
| 0000025440 | 0196 | 2951 | 20E8 | 0001 | EB00 | C734 | 3906 | 000C |
| 0000025460 | E800 | 374B | 0000 | 9D8B | 0002 | 3EB4 | 31E8 | EB4C |
| 0000025500 | E805 | 373B | 0000 | 9D8B | 0004 | 3EB4 | 21E8 | EB4C |
| 0000025520 | E805 | 372B | 0000 | 9D8B | 0000 | 3EB4 | 11E8 | 334C |
| 0000025540 | 81C0 | 06C7 | B900 | 000C | AAF3 | 06C6 | 0C3D | FF00 |
| 0000025560 | 3936 | E80C | 2647 | 0000 | 01E8 | 002B | 8F00 | 3906 |
| 0000025600 | EB0C | C709 | 3906 | 290C | EB00 | 9001 | 82E9 | E823 |
| 0000025620 | 2366 | DF8B | E5E8 | 002A | E800 | 2D1C | ADE8 | 0023 |
| 0000025640 | 3300 | 8BC0 | A40E | 8B08 | A636 | 4008 | C681 | 000E |
| 0000025660 | C781 | 000E | E98B | 3C80 | 7400 | 3911 | 7106 | 740C |
| 0000025700 | B90B | 0040 | 5756 | A6F3 | 6574 | 5E5F | C681 | 0054 |
| 0000025720 | 8B40 | E2CD | 8BDF | 8BFB | 029D | B400 | E83E | 4B90 |
| 0000025740 | 6272 | 85C7 | 0002 | FFFE | 00E8 | 000F | B400 | B03D |
| 0000025760 | E812 | 4B7C | 4E72 | D88B | 3EB4 | 73E8 | B44B | E841 |
| 0000026000 | 4B6E | 47E8 | 4423 | 8B2A | C81E | C708 | 2C87 | 0000 |
| 0000026020 | C700 | 7087 | 0000 | 8900 | E41E | C708 | E006 | 0008 |
| 0000026040 | C700 | E206 | 0008 | E800 | 29B9 | 2A44 | 16EB | 5F90 |
| 0000026060 | 8B5E | 8BFB | 029D | B400 | E83E | 4B34 | 0672 | 85C7 |
| 0000026100 | 0002 | FFFE | CAE9 | E822 | 22AE | 3E8B | 08A6 | 67E8 |
| 0000026120 | 032E | 8BF8 | 009D | 8100 | 823E | 0108 | 7400 | BA33 |
| 0000026140 | 00FC | 9538 | 000C | 0574 | FEE8 | 7239 | B40D | E868 |
| 0000026160 | 4AFE | 85C6 | 000D | EB00 | 903C | 3EB4 | F1E8 | 724A |
| 0000026200 | C608 | 0D85 | 0000 | 27EB | C790 | 3906 | 110C | EB00 |
| 0000026220 | 9024 | EAE8 | 0035 | B400 | E83E | 4AD4 | 0973 | 06C7 |
| 0000026240 | 0C39 | 0011 | 0FEB | 8190 | 823E | 0108 | 7500 | C706 |
| 0000026260 | 0085 | FF00 | E9FF | 2259 | 3DE8 | 8B22 | A63E | E808 |
| 0000026300 | 2DF6 | F803 | 9D8B | 0004 | 3E81 | 0882 | 0001 | 1074 |
| 0000026320 | 3EB4 | 9BE8 | 734A | C721 | 3906 | 110C | EB00 | 901F |
| 0000026340 | 3EB4 | 8BE8 | 734A | C709 | 3906 | 110C | EB00 | 900F |
| 0000026360 | 3E81 | 0882 | 0001 | 0675 | 85C7 | 0004 | FFFD | 10E9 |

THU MAR 14 17:20:30 1991 BTRCALLS.DLL PAGE 13, LINE 709

| | | | | | | | | |
|---|---|---|---|---|---|---|---|---|
| 0000026400 | E822 | 21F4 | C033 | 0E8B | 08A4 | 3E8B | 08A6 | BD80 |
| 0000026420 | 000E | 7400 | 400A | C781 | 0054 | F2E2 | 15E9 | 4002 |
| 0000026440 | 71A3 | C70C | C806 | 0008 | BB00 | 0200 | 1E39 | 08A0 |
| 0000026460 | 0374 | 00BB | 8904 | CE1E | E808 | 02AE | 2D7D | CBB8 |
| 0000026500 | A200 | 0C3D | 06C7 | 0C75 | 0000 | 06C7 | 0C77 | 0000 |
| 0000026520 | 06C7 | 0C44 | FFFF | 06C7 | 0C40 | FFFF | 06C7 | 0C48 |
| 0000026540 | FFFF | E7E8 | 7D21 | 8B2D | C81E | E808 | 31D6 | 2DE2 |
| 0000026560 | 878B | 0016 | 978B | 0008 | 1689 | 08CE | 9589 | 0050 |
| 0000026600 | 00B8 | 3903 | 0687 | 7400 | F775 | 39D8 | 0687 | 7400 |
| 0000026620 | B825 | 0400 | 8739 | 0006 | 6474 | D8F7 | 8739 | 0006 |
| 0000026640 | 1474 | 00B8 | 3905 | 0687 | 7400 | F753 | 39D8 | 0687 |
| 0000026660 | 7400 | E903 | 0187 | 08B9 | 8D00 | 253E | 570A | 20B0 |
| 0000026700 | AAF3 | 1E5F | 36C5 | 0874 | 08B9 | 8000 | 003C | 0374 |
| 0000026720 | E2A4 | 1FF8 | 368D | 0A25 | 3E8D | 0A35 | ACE8 | 0032 |
| 0000026740 | B900 | 0009 | F38B | C681 | 002E | A6F3 | 1074 | FEB8 |
| 0000026760 | A200 | 0889 | 87F6 | 0037 | 7501 | E903 | 0147 | 87F7 |
| 0000027000 | 000A | 4000 | 0C74 | FEB8 | 3A00 | 8906 | 7408 | E92C |
| 0000027020 | 015B | A781 | 000A | 3FFF | FFB8 | 3A00 | 8906 | 7508 |
| 0000027040 | 8B1A | 9E16 | 2B08 | 1516 | 830A | 06FA | 0373 | 44E9 |
| 0000027060 | FF01 | 1506 | 810A | 0A8F | 0000 | 8B80 | 0887 | 3B00 |
| 0000027100 | A006 | 7608 | E903 | 0105 | 368B | 08A6 | 69E8 | 032C |
| 0000027120 | 81F0 | 0EC6 | 8300 | 24BF | 0100 | 0B74 | F38B | C681 |
| 0000027140 | 0040 | 5DE8 | 7D02 | B92D | 0040 | 2CBF | 8B0B | F3C7 |
| 0000027160 | 8BA4 | 80F8 | 873E | 000C | 0674 | 168A | 0C87 | 1588 |
| 0000027200 | 3D80 | 742E | 800B | 003D | 0374 | E247 | C6F3 | 2E05 |
| 0000027220 | 45C7 | 5001 | C752 | 0345 | 0045 | D08B | FEB8 | 3A00 |
| 0000027240 | 8906 | 7508 | B80A | 0000 | 8789 | 0022 | 19E9 | 8101 |
| 0000027260 | 22BF | 0000 | 7400 | 8158 | C43E | FF00 | 75FF | EB03 |
| 0000027300 | 906A | 3DB4 | 42B0 | A7E8 | 7348 | 3D0B | 0004 | 0374 |
| 0000027320 | 92E9 | E900 | 0087 | 8B50 | A63E | E808 | 2BDA | F803 |
| 0000027340 | 8958 | 0285 | 8B00 | 508D | 8900 | CE0E | A108 | 08A0 |
| 0000027360 | D233 | F1F7 | 17A3 | E80A | 0964 | 2D7D | 1E8B | 08C8 |
| 0000027400 | 1E89 | 08E4 | DCE8 | E226 | E82D | 29AC | B9E9 | 8B00 |
| 0000027420 | C81E | 8108 | C43E | FF00 | 75FF | 8A0D | 8916 | 8808 |
| 0000027440 | 7016 | E80C | 2E69 | 2D7D | 9DE9 | C700 | 3906 | 290C |
| 0000027460 | EB00 | 904A | 06C7 | 0C39 | 0056 | AAE9 | C700 | 3906 |
| 0000027500 | 1E0C | EB00 | C738 | 3906 | 330C | EB00 | C730 | 3906 |
| 0000027520 | 180C | EB00 | C728 | 3906 | 0B0C | EB00 | C720 | 3906 |
| 0000027540 | 570C | EB00 | C718 | 3906 | 0E0C | EB00 | C710 | 3906 |
| 0000027560 | 2A0C | EB00 | C708 | 3906 | 2F0C | EB00 | 8B00 | A63E |
| 0000027600 | E808 | 2B34 | F803 | 85C7 | 000E | 0000 | 36FF | 0C39 |
| 0000027620 | 56E8 | 0036 | 8F00 | 3906 | B40C | 8B3E | 009D | E800 |
| 0000027640 | 47CE | 3EB4 | 9D8B | 0002 | C5E8 | B447 | 8B3E | 049D |
| 0000027660 | E800 | 47BC | 36FF | 0C39 | C1E8 | D026 | 8F00 | 3906 |
| 0000027700 | C60C | 3D06 | 000C | 1AEB | 168A | 0889 | 1688 | 0C70 |
| 0000027720 | 3E8B | 08A6 | E1E8 | 032A | 88F8 | 0C95 | E800 | 3609 |
| 0000027740 | 0000 | D8E8 | 0021 | E900 | 1F27 | 0BE8 | 811F | 823E |
| 0000027760 | 0008 | 7400 | E903 | 00C7 | 85C7 | 0000 | FFFF | 85C7 |
| 0000030000 | 0002 | FFFF | 85C7 | 0004 | FFFD | 85C7 | 0006 | 0000 |
| 0000030020 | 85C7 | 0008 | 0000 | 85C7 | 000A | 0000 | 85C6 | 000C |
| 0000030040 | C700 | 4E85 | 0000 | C600 | 0D85 | 0000 | 0E8B | 08CE |
| 0000030060 | E7E8 | 0000 | E800 | 0143 | 2EBF | D78B | C281 | 000E |
| 0000030100 | 3DB4 | 42B0 | BA52 | 00FE | 163A | 0889 | 0575 | 40B0 |
| 0000030120 | 1AEB | BA90 | 00FC | 163A | 0889 | 0974 | FFBA | 3A00 |
| 0000030140 | 8916 | 7508 | B007 | C612 | 0B85 | FF00 | E85A | 4700 |
| 0000030160 | 0D73 | 043D | 7400 | 3D27 | 0005 | 3474 | 3BEB | 8990 |
| 0000030200 | 508D | 8900 | 0085 | C700 | 5285 | 0100 | 8A00 | 8916 |
| 0000030220 | 8808 | 0C95 | 8B00 | E8D8 | 34E9 | 2EA7 | 21EB | 06C7 |
| 0000030240 | 0C39 | 0057 | 19EB | C790 | 3906 | 550C | EB00 | 9010 |

THU MAR 14 17:20:30 1991 BTRCALLS.DLL PAGE 14, LINE 768

| | | | | | | | | |
|---|---|---|---|---|---|---|---|---|
| 0000030260 | 06C7 | 0C39 | 005E | 07EB | C790 | 3906 | 0C0C | E900 |
| 0000030300 | 1E4F | 33E8 | 811E | 823E | 0008 | 7500 | 8B4A | C81E |
| 0000030320 | 8008 | 46BF | 0000 | 3075 | 978D | 0098 | 3DB4 | 42B0 |
| 0000030340 | 8DE8 | 7346 | 3D08 | 0004 | 1574 | 25EB | 5090 | 3E8B |
| 0000030360 | 08A6 | C3E8 | 0329 | 58F8 | 8589 | 0004 | 19EB | C790 |
| 0000030400 | 3906 | 570C | EB00 | 9010 | 06C7 | 0C39 | 001E | 07EB |
| 0000030420 | C790 | 3906 | 0D0C | E900 | 1DF7 | DBE8 | 1E1D | 36C5 |
| 0000030440 | 0884 | 05EB | E890 | 1DD0 | B91E | 0040 | 2CBF | 800B |
| 0000030460 | 203C | 3F76 | 3C80 | 7600 | 803A | 2F3C | 3574 | 3C80 |
| 0000030500 | 752E | 8027 | 017C | 742E | 8021 | FF7C | 742E | 801B |
| 0000030520 | 017C | 745C | 8015 | 027C | 745C | 800F | 037C | 745C |
| 0000030540 | 8009 | 047C | 745C | B903 | 0004 | 148A | 8826 | 4615 |
| 0000030560 | E247 | 26BC | 05C6 | 1F00 | 96E9 | E81D | 1D7A | C781 |
| 0000030600 | 000E | DF8B | C033 | 40B9 | F300 | 8DAA | 2C36 | 8B0B |
| 0000030620 | 80FB | 017C | 753A | 8A15 | 3C04 | 7C61 | 2C02 | 2C20 |
| 0000030640 | FE41 | 80C0 | 027C | 755C | EB21 | 9078 | 19B4 | 00B0 |
| 0000030660 | E850 | D9F1 | 0458 | 8001 | 5C3C | 1075 | 4004 | 0588 |
| 0000030700 | 45C6 | 3A01 | C783 | EB02 | 905A | 4646 | D233 | 168A |
| 0000030720 | 0889 | 8A52 | 8816 | 5208 | 36FF | 0884 | 36FF | 0886 |
| 0000030740 | 89A2 | B008 | A240 | 0888 | 1E8C | 0886 | 1E89 | 0884 |
| 0000030760 | D5E8 | 0028 | 8F00 | 8606 | 8F08 | 8406 | 5A08 | 1688 |
| 0000031000 | 0888 | 885A | 8916 | 8308 | 393E | 000C | 4475 | FB8B |
| 0000031020 | 3D80 | 7400 | 8A05 | 4705 | F6EB | 5C3C | 0574 | D5C7 |
| 0000031040 | 005C | 8B47 | 8BD3 | 2BC7 | B9C2 | 0040 | C82B | A4F3 |
| 0000031060 | FB8B | 40B9 | 8000 | 003D | 1074 | 3D80 | 7F5A | 8008 |
| 0000031100 | 413D | 037C | 0D80 | 4720 | EBE2 | 06E3 | 05C6 | 4700 |
| 0000031120 | F8E2 | BCE9 | 001C | 9FE8 | C71C | 5006 | 0000 | E800 |
| 0000031140 | 1CEA | 322E | 1E8B | 08C8 | C406 | 742E | 8108 | 783E |
| 0000031160 | 1008 | 7300 | E903 | 01AA | 06C7 | 0050 | 0010 | 878B |
| 0000031200 | 0016 | 003D | 7500 | 8B04 | 0E87 | 2601 | 8689 | 0000 |
| 0000031220 | 878B | 0008 | 8926 | 0286 | 8B00 | 1487 | 2600 | 8689 |
| 0000031240 | 0004 | 878B | 001A | 8926 | 0886 | 8B00 | 1C87 | 2600 |
| 0000031260 | 8689 | 0006 | 878B | 00D8 | 8926 | 0C86 | 2600 | 86C7 |
| 0000031300 | 000E | 0000 | 8F8B | 0026 | F983 | 7500 | 8B13 | 288F |
| 0000031320 | 8B00 | 4887 | 2B00 | 74C1 | 7207 | 2605 | 8689 | 000E |
| 0000031340 | C726 | 0A86 | 0000 | 8000 | 38BF | 0000 | 2174 | C726 |
| 0000031360 | 0A86 | 0100 | 8B00 | 0687 | 2501 | 00C0 | 0926 | 0A86 |
| 0000031400 | F600 | 0687 | 0201 | 0774 | 8126 | 0A8E | 0200 | 8300 |
| 0000031420 | 16BF | 0000 | 0775 | 8126 | 0A8E | 0800 | 8300 | 14BF |
| 0000031440 | FF00 | 0E75 | 8126 | 0A8E | 1000 | 2600 | 86C7 | 0004 |
| 0000031460 | 0001 | 3EC4 | 0884 | BF83 | 0024 | 7401 | 8D11 | 98B7 |
| 0000031500 | B900 | 0040 | 08E3 | 80A4 | 003C | 0274 | F6E2 | C02B |
| 0000031520 | 2650 | 0588 | 8F8B | 0014 | F983 | 75FF | F702 | 81D9 |
| 0000031540 | 10C3 | 8101 | 10C5 | 8300 | 00F9 | 0375 | 80E9 | 8B00 |
| 0000031560 | 04B7 | 8B00 | 06BF | A100 | 0050 | 1005 | 3900 | 7806 |
| 0000031600 | 7308 | E903 | 009B | 50A3 | A100 | 0876 | C08E | 878B |
| 0000031620 | 0014 | 2640 | 8689 | 0000 | 878B | 0016 | 8926 | 0286 |
| 0000031640 | 8B00 | 0897 | 2600 | 9689 | 0004 | 8926 | 08B6 | 2600 |
| 0000031660 | BE89 | 0006 | C2F7 | 0020 | 0374 | 4058 | E850 | 0077 |
| 0000031700 | C2F7 | 0208 | 0974 | B78A | 001D | 8826 | 0BB6 | 2600 |
| 0000031720 | 86C7 | 000C | 0000 | C726 | 0E86 | 0000 | 8100 | 1EC3 |
| 0000031740 | 8100 | 10C5 | F700 | 10C2 | 7500 | 498C | 78E9 | 58FF |
| 0000031760 | 0B07 | 74C0 | 8B34 | 500E | 8100 | 09C1 | 3901 | 780E |
| 0000032000 | 7208 | 8920 | 500E | E800 | 1484 | 322E | 368D | 0C8A |
| 0000032020 | FD8B | A106 | 0876 | C08E | 09B9 | F301 | 07A4 | 09EB |
| 0000032040 | 5890 | C707 | 3906 | 160C | E800 | 1D91 | 0000 | 50A1 |
| 0000032060 | A300 | 0878 | DAE9 | 521A | C2F7 | 0100 | 0774 | B78A |
| 0000032100 | 001C | 12EB | 2690 | 8E81 | 0004 | 0100 | 00B6 | C2F7 |
| 0000032120 | 0004 | 0274 | 0EB6 | 8826 | 0AB6 | 5A00 | 00C3 | 97E8 |

THU MAR 14 17:20:30 15>ı BTRCALLS.DLL PAGE 15, LINE 827

| | | | | | | | | |
|---|---|---|---|---|---|---|---|---|
| 0000032140 | 8B1A | 3E1E | F60C | 9387 | 010D | 0375 | E2E9 | 2B01 |
| 0000032160 | A0C0 | 0889 | 063B | 0C4C | 0374 | E4E9 | A101 | 0C75 |
| 0000032200 | C4A3 | A108 | 0C77 | C6A3 | E808 | 2E1A | 3488 | B0E8 |
| 0000032220 | 701B | 8D34 | 4036 | E80C | 195F | 0000 | 06C7 | 0A0D |
| 0000032240 | FFFF | 9FE8 | 701F | A134 | 08E6 | D4A3 | A108 | 08E4 |
| 0000032260 | D2A3 | E808 | 324C | 3470 | 00BD | 8B00 | C81E | 3308 |
| 0000032300 | 8BD2 | 1687 | 3D00 | 0000 | 0F75 | 01B6 | 0E8B | 0878 |
| 0000032320 | 00E8 | 7045 | 8934 | 780E | 8D08 | 5036 | 8D0C | 603E |
| 0000032340 | 1E00 | B907 | 0010 | A5F3 | 8F8B | 0014 | 9F8D | 0110 |
| 0000032360 | 40A1 | A30C | 08C4 | 42A1 | A30C | 08C6 | D22A | F983 |
| 0000032400 | 7500 | E903 | 00A6 | 3E8D | 0902 | 368B | 08D2 | 3603 |
| 0000032420 | 0A19 | 801E | 01FE | 0775 | 1E8E | 08F8 | 00BE | E800 |
| 0000032440 | 14CC | 8D1F | 253E | 1E0A | 36C5 | 0874 | BFE8 | 1F14 |
| 0000032460 | 87F7 | 0008 | 0020 | 0574 | 53E8 | 7013 | 8D34 | 0236 |
| 0000032500 | E809 | 0FD4 | 5D74 | 87F7 | 0008 | 0002 | 0375 | 19E9 |
| 0000032520 | E801 | 0600 | 3470 | 8D51 | 023E | 1E09 | 36C5 | 0874 |
| 0000032540 | 8BE8 | 1F14 | 87F7 | 0008 | 0001 | 1C74 | 87F7 | 0008 |
| 0000032560 | 0080 | 1475 | 3E8B | 08D2 | 3E03 | 0A19 | BF03 | 0012 |
| 0000032600 | 0889 | B800 | FFFF | AAF3 | E859 | D804 | 3470 | 163A |
| 0000032620 | 0889 | 0F75 | 06C7 | 0C48 | FFFF | D6C7 | 0C44 | FFFF |
| 0000032640 | FFBD | FEFF | E8C2 | 14CF | E949 | FF52 | 1E8B | 08C8 |
| 0000032660 | FE80 | 7401 | 8007 | 38BF | 0000 | 4B74 | 3E8B | 08D2 |
| 0000032700 | 3E03 | 0A19 | BF03 | 0016 | 058B | 26A3 | 8B05 | 0245 |
| 0000032720 | 28A3 | A105 | 0878 | 93E8 | 7032 | A334 | 0878 | FE80 |
| 0000032740 | 7501 | E807 | 4465 | 3470 | 1DEB | C9E8 | 7034 | A134 |
| 0000032760 | 0526 | 0589 | 28A1 | 8905 | 0245 | 87F6 | 0038 | 7502 |
| 0000033000 | A106 | 0531 | 4589 | 8B04 | D23E | 0308 | 193E | 8B0A |
| 0000033020 | 168F | 3B00 | 780E | 7708 | 1E40 | 36C5 | 0874 | F7E8 |
| 0000033040 | 1F17 | D2A1 | A308 | 08E4 | B8E8 | 701F | 8134 | FFFD |
| 0000033060 | 75FF | E805 | 14BE | 3470 | C4A1 | A308 | 0C75 | 40A3 |
| 0000033100 | A10C | 08C6 | 77A3 | A30C | 0C42 | A4E8 | 701A | EB34 |
| 0000033120 | C737 | 3906 | 080C | EB00 | C755 | 3906 | 160C | EB00 |
| 0000033140 | C717 | 3906 | 070C | EB00 | 9045 | 06C7 | 0C39 | 000A |
| 0000033160 | 3E81 | 0C39 | 0055 | 1074 | 36FF | 0C39 | 33E8 | 8700 |
| 0000033200 | 8F34 | 3906 | EB0C | 5801 | 3E8D | 0C50 | 368D | 0060 |
| 0000033220 | 071E | 10B9 | F300 | FFA5 | 3936 | E80C | 21CB | 0000 |
| 0000033240 | 1AE8 | 001B | E800 | 2CCD | 0000 | 068F | 0C39 | 60E9 |
| 0000033260 | 0018 | 43E8 | C718 | 8306 | 000C | 8B00 | C81E | 8108 |
| 0000033300 | FFFB | 75FF | E903 | 010B | 3E83 | 0882 | 7400 | E805 |
| 0000033320 | 033E | 0000 | D6E8 | 0020 | C700 | AC06 | FF00 | E8FF |
| 0000033340 | 1F9A | 0000 | 06C7 | 00A4 | FFFF | 0E8B | 0C81 | 8F2B |
| 0000033360 | 002C | 6FE3 | DEE8 | D301 | E835 | 1EE7 | 0000 | E98B |
| 0000033400 | 0349 | 2C8F | B400 | 8B3F | CE16 | 8B08 | E43E | E808 |
| 0000033420 | 01DA | 355B | F983 | 7500 | 810F | C43E | FF00 | 75FF |
| 0000033440 | 8307 | 2CBF | 0000 | 0075 | CD8B | 3E81 | 0882 | 0015 |
| 0000033460 | 2075 | F726 | 0485 | 0000 | 7480 | 5017 | 8B26 | 0485 |
| 0000033500 | 2500 | 7FFF | 2648 | A581 | 0004 | 8000 | 0926 | 0485 |
| 0000033520 | 5800 | 8EE8 | 5B1E | E235 | EBA5 | C708 | 3906 | 0F0C |
| 0000033540 | EB00 | E870 | 1F16 | 0000 | 87F7 | 000A | 8000 | 2C74 |
| 0000033560 | 3E81 | 00C4 | FFFF | 1374 | 3E81 | 0882 | 0015 | 0B74 |
| 0000033600 | 368B | 08C8 | 3689 | 08E4 | 0BEB | 8B90 | E436 | 8908 |
| 0000033620 | C836 | 8B08 | E8DE | 1E4B | 35D3 | 08EB | 3E81 | 00C4 |
| 0000033640 | FFFF | 2F74 | D6C7 | 08DA | FFFF | 9FE8 | D317 | 8B35 |
| 0000033660 | C81E | C708 | 2287 | 0000 | F700 | 0A87 | 0000 | 7580 |
| 0000033700 | E808 | 1E1F | 35D3 | 0BEB | 8B90 | E636 | C708 | 0284 |
| 0000033720 | FF00 | C7FF | DA06 | 0008 | C700 | A406 | 0000 | E900 |
| 0000033740 | 172F | 13E8 | 8B17 | C81E | 8B08 | E436 | 8B08 | 0484 |
| 0000033760 | 2500 | 7FFF | 88A3 | 8B0C | 0487 | 8100 | 04A4 | 0000 |
| 0000034000 | 0980 | 0484 | 8B00 | CE0E | A108 | 08F2 | C13B | 0C73 |

THU MAR 14 17:20:30 1991 BTRCALLS.DLL PAGE 16, LINE 886

| | | | | | | | | |
|---|---|---|---|---|---|---|---|---|
| 0000034020 | EEA1 | 3B08 | 72C1 | E81D | 016A | 365B | 8E06 | F006 |
| 0000034040 | 8B08 | EE3E | 2B08 | F23E | 2908 | F20E | D108 | F3E9 |
| 0000034060 | 07A5 | 27EB | 0E8B | 0C8I | 40B4 | 168B | 08CE | 3E8B |
| 0000034100 | 08E4 | A7E8 | 5500 | E836 | 206E | 06FF | 0C81 | 75E8 |
| 0000034120 | 5B01 | EB36 | C706 | 3906 | 0F0C | E900 | 16B3 | 97E8 |
| 0000034140 | E816 | 0071 | 36A3 | AF8B | 0004 | 3E8B | 08E4 | 3FB4 |
| 0000034160 | 33E8 | A300 | 8B36 | 708F | E300 | 4919 | 168B | 08CE |
| 0000034200 | 69E8 | A300 | 4136 | B58B | 0004 | E681 | 7FFF | F53B |
| 0000034220 | 0274 | E7E2 | 0E89 | 0C81 | 87C7 | 002C | 0000 | 11E8 |
| 0000034240 | A3FE | E936 | 166B | 4FE8 | E816 | D1D1 | 36D2 | 8B53 |
| 0000034260 | A63E | E808 | 2202 | F803 | 9D8B | 0002 | 42B4 | 02B0 |
| 0000034300 | C933 | D233 | A9E8 | 5B3E | 8F8B | 0008 | F1F7 | 8789 |
| 0000034320 | 0070 | 3CE9 | E816 | 1620 | 06C7 | 08E0 | 0000 | 06C7 |
| 0000034340 | 08E2 | 0001 | 5DE8 | E91B | E936 | 1625 | 09E8 | C616 |
| 0000034360 | FD06 | 0008 | 86E8 | 8101 | 5037 | 5752 | 3E8B | 08A6 |
| 0000034400 | B5E8 | 0321 | 8BF8 | 029D | 8B00 | 8BC1 | CE0E | F708 |
| 0000034420 | 8BE1 | 8BCA | B0D0 | B400 | E842 | 3E54 | 595F | 7258 |
| 0000034440 | 535A | 1E8B | 08C8 | BF83 | 0006 | 7F00 | F616 | 3787 |
| 0000034460 | 0200 | 0F74 | 06C6 | 08FD | 80FF | 40FC | 0575 | C3E8 |
| 0000034500 | 0028 | 5B00 | 5706 | 061E | 8B1F | 8BD7 | 50F1 | 1FE8 |
| 0000034520 | 593E | 5F1F | 9C07 | 3E80 | 08FD | 75FF | 8317 | 393E |
| 0000034540 | 000C | 0775 | FD80 | 743F | 8B02 | 51C6 | C88B | 93E8 |
| 0000034560 | 0028 | 5900 | 729D | 3B04 | 74C6 | C706 | 3906 | 0F0C |
| 0000034600 | E900 | 158D | 71E8 | 0615 | 40B4 | 0E8B | 0C81 | 168B |
| 0000034620 | 08EE | 162B | 08F2 | 068E | 08F0 | FF33 | FA83 | 7400 |
| 0000034640 | E821 | FF48 | 37C2 | 0FE8 | 8B1F | 33C2 | F7D2 | CE36 |
| 0000034660 | 0108 | 8106 | 8B0C | EE16 | 8908 | F216 | E808 | 0006 |
| 0000034700 | 0000 | E907 | 154B | 2FE8 | 8B15 | C81E | 8B08 | 810E |
| 0000034720 | 390C | 708F | 7300 | E836 | 00A3 | 380D | 8F89 | 0070 |
| 0000034740 | 87F7 | 000A | 8000 | 2575 | 368B | 08A6 | C9E8 | 0320 |
| 0000034760 | 8BF0 | 029C | B400 | E83E | 3D76 | 0B72 | 84C7 | 0002 |
| 0000035000 | FFFE | B3E8 | EB1E | C706 | 3906 | 0F0C | E900 | 1501 |
| 0000035020 | E5E8 | 8B14 | C81E | 0608 | 8E1E | F006 | 8B08 | EE36 |
| 0000035040 | 2B08 | F236 | 8308 | 00FE | 4674 | 362B | 08CE | 8B26 |
| 0000035060 | 0094 | 8900 | E016 | 2608 | 948B | 0002 | 1689 | 08E2 |
| 0000035100 | 01E8 | 6B1A | 8B38 | E43E | 2608 | 848B | 0004 | FF25 |
| 0000035120 | 397F | 0487 | 7500 | 8B14 | CE0E | D108 | 06E9 | 061E |
| 0000035140 | 071F | A5F3 | 1F06 | 2B07 | CE36 | 8308 | 00FE | BA7F |
| 0000035160 | 071F | 168B | 08EE | 1689 | 08F2 | 94E9 | E814 | 1478 |
| 0000035200 | 3E8B | 08A6 | 31E8 | 0320 | 8BF8 | 0285 | 3D00 | 0000 |
| 0000035220 | 567D | 56E8 | 0000 | B400 | B03D | E842 | 3CD2 | 3273 |
| 0000035240 | 043D | 7400 | B43D | 335B | E8C9 | 3CC4 | 2B72 | 8B53 |
| 0000035260 | C81E | C708 | 2C87 | 0000 | C700 | 7087 | 0000 | 5B00 |
| 0000035300 | D88B | 3EB4 | A9E8 | 723C | B410 | B03D | E842 | 3CA0 |
| 0000035320 | 0772 | 8589 | 0002 | 10EB | C790 | 3906 | 0E0C | EB00 |
| 0000035340 | 9007 | 06C7 | 0C39 | 0057 | 26E9 | 5714 | 5056 | 8B57 |
| 0000035360 | C836 | 8308 | 24BC | 0100 | 0774 | C681 | 0098 | 07EB |
| 0000035400 | 5E90 | 8156 | 0EC6 | 0600 | 40B9 | 1E00 | BF07 | 0B2C |
| 0000035420 | C78B | A4F3 | F88B | 3E80 | 0C87 | 7400 | 8A06 | 8716 |
| 0000035440 | 880C | 8015 | 003D | 0374 | E247 | 4FF8 | 3D80 | 742E |
| 0000035460 | 800E | 5C3D | F575 | 8047 | 003D | FA75 | 05C6 | C72E |
| 0000035500 | 0145 | 5250 | 45C7 | 4503 | 8B00 | 07D0 | 585F | 5F5E |
| 0000035520 | C5E9 | 0013 | A1E8 | 8B13 | 192E | E80A | 0F2F | 0375 |
| 0000035540 | 82E9 | F701 | 0887 | 8000 | 7500 | F708 | 0887 | 0100 |
| 0000035560 | 7500 | E80E | E120 | 3AE5 | E4A1 | A308 | 08EA | 75EB |
| 0000035600 | 8B90 | D236 | 0308 | 1936 | 030A | 12B7 | 8100 | FF3C |
| 0000035620 | 74FF | 8133 | 047C | FFFF | 2C74 | 4FE8 | E501 | 833A |
| 0000035640 | 04C6 | C783 | B904 | 0004 | F356 | 5EA4 | 34E8 | E51A |
| 0000035660 | E83A | 0138 | 3AE5 | EE83 | B904 | 0004 | A4F3 | 22E8 |

THU MAR 14 17:20:30 1991 BTRCALLS.DLL PAGE 17, LINE 945

| | | | | | | | | |
|---|---|---|---|---|---|---|---|---|
| 0000035700 | E51A | E93A | 011F | CDE8 | E5E0 | A13A | 08E4 | EAA3 |
| 0000035720 | 8108 | FF3C | 75FF | 810E | 047C | FFFF | 1774 | C683 |
| 0000035740 | 2B04 | EBD2 | BA03 | 0004 | 01E8 | E501 | E83A | 0128 |
| 0000035760 | 3AE5 | F0E9 | 8B00 | E83E | 8B08 | 0085 | A300 | 08FE |
| 0000036000 | 858B | 0002 | 00A3 | E809 | 013E | 3AE5 | 368D | 08FE |
| 0000036020 | 3C81 | FFFF | 6174 | 06C7 | 0A0D | FFFF | 25E8 | E518 |
| 0000036040 | A13A | 08E6 | ECA3 | 8B08 | 0084 | A300 | 08E0 | 848B |
| 0000036060 | 0002 | E2A3 | C708 | 0FD6 | 000A | E800 | E1C7 | 0000 |
| 0000036100 | 55E8 | E51C | 8B3A | EA16 | A108 | 08E4 | EAA3 | 8D08 |
| 0000036120 | 023E | 8B09 | E836 | 8108 | 04C6 | 8B00 | 0C8F | 830D |
| 0000036140 | 04E9 | A4F3 | E1E8 | E500 | 893A | E416 | E808 | 02E6 |
| 0000036160 | 3AE5 | 6EE8 | E519 | 8B3A | EA36 | 8B08 | 0284 | 3B0D |
| 0000036200 | 0287 | 7500 | 8B0A | 0084 | 3B00 | 0087 | 7400 | 8B0A |
| 0000036220 | 0684 | 3B00 | 1087 | 7200 | 8945 | E436 | E808 | 1943 |
| 0000036240 | 3AE5 | 87F7 | 0008 | 0080 | 2874 | 06C7 | 0C3B | FFFF |
| 0000036260 | 3E8D | 0902 | 368B | 08D2 | F503 | 31E8 | E80D | DFD6 |
| 0000036300 | 3AC4 | 21EB | 3E81 | 0C39 | 0004 | 1975 | 06C7 | 0C39 |
| 0000036320 | 0000 | AF83 | 0006 | 8301 | 049F | 0000 | 07EB | 49E8 |
| 0000036340 | E504 | EB3A | 8992 | 192E | E90A | 1225 | 3C83 | 7500 |
| 0000036360 | 830E | 027C | 7500 | C708 | 3906 | 2B0C | EB0D | E816 |
| 0000036400 | 10F7 | 0000 | 3DE8 | 1517 | 8B3B | E43E | 0308 | 193E |
| 0000036420 | 030A | 12BF | E900 | 1200 | DDE8 | 0311 | B8FA | FFFF |
| 0000036440 | ABAB | BEE8 | 4518 | 8B3B | E83E | 8108 | 04C7 | 0300 |
| 0000036460 | 0ABF | 0300 | P9FA | 0004 | A4F3 | EAA1 | A308 | 08E4 |
| 0000036500 | A0E8 | 4516 | E93B | 11C9 | ADE8 | 8B11 | E43E | 8B08 |
| 0000036520 | 068D | FF00 | 068D | 8100 | 0CC7 | E800 | 0C7E | 0A74 |
| 0000036540 | 3E8B | 08E8 | BF03 | 000C | F1E2 | 878B | 000C | F749 |
| 0000036560 | 8BE1 | E836 | 8B08 | 03FE | 0CB7 | 8B00 | F3C8 | 8BA4 |
| 0000036600 | E83E | 0308 | 2BF8 | 8BC0 | 0C8F | F300 | E9AA | 1181 |
| 0000036620 | 65E8 | 8B11 | 192E | E80A | 0CF3 | 2E75 | 87F7 | 0008 |
| 0000036640 | 0001 | 2374 | 87F7 | 0008 | 0080 | 1B75 | 87F7 | 0008 |
| 0000036660 | 4000 | 1675 | 3E8B | 08D2 | 3E03 | 0A19 | BF03 | 0012 |
| 0000036700 | C02B | 08B9 | F300 | E9AA | 0125 | 06C7 | 0C3B | FFFF |
| 0000036720 | 06C7 | 0C79 | 0000 | BDE8 | 0ADE | F73C | 0887 | 0100 |
| 0000036740 | 7400 | C71E | 7906 | FF0C | F7FF | 0887 | 8000 | 7500 |
| 0000036760 | F70B | 0887 | 0000 | 7540 | E903 | 0094 | 97E8 | 0ADE |
| 0000037000 | C73C | 3906 | 050C | E900 | 00E5 | 3E81 | 0C39 | 0004 |
| 0000037020 | 0374 | DAE9 | C700 | FE06 | FF08 | C7FF | 0006 | FF09 |
| 0000037040 | F7FF | 0887 | 0000 | 7540 | 8D19 | 0236 | 0309 | 0AB7 |
| 0000037060 | A100 | 08C4 | 0489 | 4489 | A104 | 08C6 | 4489 | 8902 |
| 0000037100 | 0644 | 368B | 08E4 | 848B | 0006 | 873B | 000E | 2175 |
| 0000037120 | 3E81 | 08B2 | 0000 | 1274 | 27E8 | 5F03 | EB3C | 8112 |
| 0000037140 | 393E | FF0C | 74FF | E903 | 0085 | DDE8 | EF00 | EB3C |
| 0000037160 | E8D1 | 0082 | 3CEF | 6AE8 | EF17 | 813C | 793E | FF0C |
| 0000037200 | 74FF | FF0A | 0687 | 7500 | FF66 | 0487 | EB00 | 9060 |
| 0000037220 | 0E8B | 08E4 | 368B | 08E8 | C681 | 0004 | B703 | 000A |
| 0000037240 | C683 | 8B04 | D23E | 0308 | 193E | 030A | 12BF | E800 |
| 0000037260 | 0F47 | 0000 | 8DE8 | EF15 | 8B3C | 8B04 | 0254 | 0589 |
| 0000037300 | 5589 | A102 | 08C4 | 168B | 08C6 | 0489 | 5489 | 8B02 |
| 0000037320 | E43E | 0308 | 193E | 030A | 12BF | 8900 | 0445 | 5589 |
| 0000037340 | E806 | 16FF | 3CEF | 0E89 | 08E4 | F6E8 | EF16 | 893C |
| 0000037360 | 192E | E90A | 101B | FFE8 | 8B0F | E43E | 8B08 | 068D |
| 0000037400 | FF00 | 0685 | 8100 | 0CC7 | 8300 | 00F9 | 2E74 | CBE8 |
| 0000037420 | 720A | 8B0C | E83E | 0308 | 0CBF | E200 | EBF1 | 8B1D |
| 0000037440 | 0C87 | F700 | 8BE1 | E836 | 0308 | 4EF0 | FE8B | BF03 |
| 0000037460 | 000C | C88B | F3FD | FCA4 | 3E8B | 08E8 | 368D | 08FE |
| 0000037500 | 8F8B | 000C | D1E8 | E90E | 0FC7 | ABE8 | 8D0F | FE36 |
| 0000037520 | 8D08 | 253E | 8B0A | 0C8F | E800 | 0EBC | 168B | 08E0 |
| 0000037540 | 1689 | 0A1D | 168B | 08E2 | 1689 | 0A1F | 368B | 08E4 |

THU MAR 14 17:20:30 1991 BTRCALLS.DLL PAGE 18, LINE 1004

| | | | | | | | | |
|---|---|---|---|---|---|---|---|---|
| 0000037560 | 40E8 | B001 | 8B3E | E016 | 8908 | 0916 | 8B0A | E216 |
| 0000037600 | 8908 | 0B16 | 8B0A | E43E | 8B08 | 0E8F | D100 | 73E9 |
| 0000037620 | 4101 | 5651 | 8157 | 0CC6 | 8D00 | FE3E | 8B08 | 0C8F |
| 0000037640 | E800 | 0E74 | 895F | E43E | E808 | FF4A | 0000 | 895E |
| 0000037660 | E436 | E808 | FD92 | 0000 | E259 | 56D7 | F757 | 0887 |
| 0000037700 | 2000 | 7400 | E805 | 08C6 | 0000 | 3E8D | 0902 | 368D |
| 0000037720 | 0A25 | C681 | 0004 | 3FE8 | 9C05 | 368D | 0A25 | 3E8D |
| 0000037740 | 08FE | 8F8B | 000C | 2FE8 | 9D0E | 5E5F | 2D77 | 3E89 |
| 0000037760 | 08E4 | 01E8 | 00FF | 8B00 | 0685 | 8B00 | 0C97 | F700 |
| 0000040000 | 05E2 | 000C | 5756 | F78B | 8F8B | 000C | 3E8D | 08FE |
| 0000040020 | F003 | F12B | 01E8 | 5F0E | EB5E | 891C | E436 | E808 |
| 0000040040 | FED4 | 0000 | 5756 | C681 | 000C | 3E8D | 08FE | 8F8B |
| 0000040060 | 000C | E3E8 | 5F0D | E85E | FD0E | 0000 | 8D56 | FE36 |
| 0000040100 | 8B08 | 0094 | 8900 | 0895 | 8B00 | 0294 | 8900 | 0A95 |
| 0000040120 | 8B00 | 0916 | 890A | 0094 | 8B00 | 0B16 | 890A | 0294 |
| 0000040140 | 5E00 | 3E89 | 08E4 | 7AE8 | B015 | 893E | E436 | E808 |
| 0000040160 | 1571 | 3EB0 | 3E83 | 0C4E | 7500 | E82B | 0035 | 3EB0 |
| 0000040200 | 168B | 08E0 | 9789 | 0000 | 168B | 08E2 | 9789 | 0002 |
| 0000040220 | 368B | 08E4 | 168B | 0A1D | 9489 | 0008 | 168B | 0A1F |
| 0000040240 | 9489 | 000A | 0AEB | 73E8 | B008 | E83E | 1396 | 3EB0 |
| 0000040260 | 5EE9 | E80E | 0E42 | 3E8B | 08C8 | BD81 | 000C | FFFF |
| 0000040300 | 2B74 | 958B | 000C | 1689 | 08E0 | 958B | 000E | 1689 |
| 0000040320 | 08E2 | 6FE8 | 2613 | 8B3F | E436 | 8B08 | 0894 | 8900 |
| 0000040340 | 0C95 | 8B00 | 0A94 | 8900 | 0E95 | EB00 | 8B25 | 2695 |
| 0000040360 | 8900 | E016 | 8B08 | 2895 | 8900 | E216 | C708 | 1306 |
| 0000040400 | FF0A | E8FF | 133E | 3F26 | 85FF | 0028 | 0475 | 85FF |
| 0000040420 | 0026 | 3E8B | 08E4 | 85C7 | 0006 | 0000 | 878A | 0018 |
| 0000040440 | E1A2 | 8808 | 0145 | E8E9 | 000D | CBE8 | E80D | 0157 |
| 0000040460 | 3F7F | F983 | 7400 | 830B | 01F9 | 0C74 | BF03 | 000C |
| 0000040500 | 0EEB | BF2B | 000C | 08EB | 3E8B | 08E4 | C781 | 0008 |
| 0000040520 | 058B | E0A3 | 8B08 | 0245 | E2A3 | E808 | 12E6 | 3F7F |
| 0000040540 | 3E8B | 08E4 | 858B | 0006 | 873B | 0010 | 0774 | 65E8 |
| 0000040560 | 7F01 | EB3F | E80A | 0270 | 3F7F | 9FE8 | 0007 | E900 |
| 0000040600 | 0D8F | 73E8 | FF0D | E436 | FF08 | E036 | FF08 | E236 |
| 0000040620 | A108 | 0C83 | 85A3 | C70C | 8306 | 000C | 8B00 | 0284 |
| 0000040640 | 3B00 | 0287 | 7500 | 8B0D | 0084 | 3B00 | 0087 | 7500 |
| 0000040660 | E903 | 00A8 | D0E8 | 7200 | 3B40 | 068E | 7500 | E903 |
| 0000040700 | 009A | FA8E | 058B | E0A3 | 8B08 | 0245 | E2A3 | E808 |
| 0000040720 | 1272 | 4072 | 3E8B | 08E4 | 878B | 000E | 852B | 0006 |
| 0000040740 | 7A74 | E8D1 | 5040 | 85A1 | A30C | 0C83 | E858 | 1254 |
| 0000040760 | 4072 | 8B52 | 0096 | 8900 | E016 | 8B08 | 0296 | 8900 |
| 0000041000 | E216 | 5A08 | 3DE8 | 7212 | 4140 | 5756 | 5F5E | 5257 |
| 0000041020 | C781 | 000C | D78B | C3E8 | 7307 | 561A | 8B51 | 8BFA |
| 0000041040 | 0C8F | 8D00 | FE36 | 8A08 | 8A14 | 8835 | 8815 | 4634 |
| 0000041060 | E247 | 59F4 | 5A5E | E85F | 009C | 4072 | 7548 | 89CF |
| 0000041100 | E436 | E808 | 139D | 4072 | 2E89 | 08E4 | 94E8 | 7213 |
| 0000041120 | 8940 | E43E | E808 | 138B | 4072 | 16EB | 048B | E0A3 |
| 0000041140 | 8B08 | 0244 | E2A3 | E808 | 11DA | 4072 | 06C7 | 0C39 |
| 0000041160 | FFFF | 85A1 | A30C | 0C83 | 068F | 08E2 | 068F | 08E0 |
| 0000041200 | 068F | 08E4 | 8AE9 | 8B0C | 0084 | A300 | 08E0 | 848B |
| 0000041220 | 0002 | E2A3 | E808 | 11AC | 40D3 | 7FE8 | 0006 | E800 |
| 0000041240 | 0838 | 0000 | 9DE8 | D311 | 8B40 | E43E | 8B08 | 8BEF |
| 0000041260 | 068D | 8100 | 0CC7 | 8B00 | 8BD7 | 0284 | 3B00 | 0285 |
| 0000041300 | 7500 | 8B0A | 0084 | 3B00 | 0085 | 7400 | 0306 | 0CBF |
| 0000041320 | E200 | E9E4 | 0C42 | 1FE8 | 560C | 5157 | 368D | 08FE |
| 0000041340 | 3E8D | 0B2C | 8F8B | 000C | A4F3 | F28B | 3E8D | 08FE |
| 0000041360 | 8F8B | 000C | A4F3 | 368D | 08FE | 3E8D | 0A25 | 8F8B |
| 0000041400 | 000C | A4F3 | 5F59 | A15E | 08FE | 33A3 | A10C | 0900 |
| 0000041420 | 35A3 | 890C | E42E | E808 | FA2E | 41E5 | F983 | 7500 |

THU MAR 14 17:20:30 1991 BTRCALLS.DLL PAGE 19, LINE 1063

| | | | | | | | | |
|---|---|---|---|---|---|---|---|---|
| 0000041440 | 8B3F | 0685 | 4800 | A7F7 | 000C | 5756 | 8B51 | 81F7 |
| 0000041460 | 0CC6 | 0300 | 8DF0 | FE3E | 8B08 | 0C8F | F300 | 59A4 |
| 0000041500 | 5E5F | 858B | 0008 | 25A3 | 8B0A | 0A85 | A300 | 0A27 |
| 0000041520 | FEA1 | 8908 | 0885 | A100 | 0900 | 8589 | 000A | 32EB |
| 0000041540 | 5756 | 8B51 | 8DF7 | FE3E | 8108 | 0CC6 | 8B00 | 0C8F |
| 0000041560 | F300 | 59A4 | 5E5F | 848B | 0008 | 25A3 | 8B0A | 0A84 |
| 0000041600 | A300 | 0A27 | FEA1 | 8908 | 0884 | A100 | 0900 | 8489 |
| 0000041620 | 000A | 3E89 | 08E4 | AFE8 | E5F9 | E841 | 1245 | 41E5 |
| 0000041640 | 33A1 | A30C | 08FE | 35A1 | A30C | 0900 | 2E89 | 08E4 |
| 0000041660 | 43E8 | E5FB | E841 | 122B | 41E5 | 8D56 | 2536 | 8D0A |
| 0000041700 | FE3E | 8B08 | 0C8F | F300 | 5EA4 | 3689 | 08E4 | 25E8 |
| 0000041720 | E5FB | 8941 | EA36 | 8D08 | FE3E | 8D08 | 2C36 | 8B0B |
| 0000041740 | 0C8F | F300 | E9A4 | 0B29 | 0DE8 | 510B | 8C8B | 0006 |
| 0000041760 | 5756 | 8D51 | FE3E | 8108 | 0CC6 | 8B00 | 0C8F | F300 |
| 0000042000 | 59A4 | 5E5F | 3689 | 08E4 | 3DE8 | 00F9 | 8900 | E43E |
| 0000042020 | E808 | FAE2 | 0000 | D8E2 | 8B59 | 0884 | A300 | 0A21 |
| 0000042040 | 848B | 000A | 23A3 | 530A | 1E8B | 08C8 | 878B | 000C |
| 0000042060 | 8489 | 0008 | 878B | 000E | 8489 | 000A | A481 | 0000 |
| 0000042100 | 00FF | 848B | 000D | 8789 | 000C | 848B | 0002 | 8789 |
| 0000042120 | 000E | 895B | E436 | E808 | 1189 | 4314 | 5157 | F28B |
| 0000042140 | 8F8B | 000C | 3E8D | 08FE | A4F3 | 2E89 | 08E4 | D7E8 |
| 0000042160 | 00F8 | 5900 | 835F | 00F9 | 2C75 | FEA1 | 8908 | 0886 |
| 0000042200 | A100 | 0900 | 8689 | 000A | 858B | 0008 | FEA3 | 8B08 |
| 0000042220 | 0A85 | A300 | 0900 | 21A1 | 890A | 0885 | A100 | 0A23 |
| 0000042240 | 8589 | 000A | 0CEB | 21A1 | A30A | 08FE | 23A1 | A30A |
| 0000042260 | 0900 | 3E89 | 08E4 | 3DE8 | 00FA | E800 | 1125 | 4314 |
| 0000042300 | BE83 | 0006 | 7500 | 8B49 | C836 | 8B08 | 0C84 | 8900 |
| 0000042320 | 0886 | 8B00 | 0E84 | 8900 | 0A86 | 8100 | 00A6 | FF00 |
| 0000042340 | 8B00 | 0086 | 8900 | 0C84 | 8B00 | 0286 | 8900 | 0E84 |
| 0000042360 | 8B00 | 0085 | 8900 | 0087 | 8B00 | 0285 | 8900 | 0287 |
| 0000042400 | 8900 | E42E | E808 | 10DB | 4314 | 3E89 | 08EA | 04EB |
| 0000042420 | 2E89 | 08EA | FAE9 | 0009 | 5350 | 5251 | 8B55 | 36EE |
| 0000042440 | 3E89 | 0080 | 8936 | 821E | 3300 | 36D2 | 87F7 | 0008 |
| 0000042460 | 0040 | 0274 | 01B6 | 8B36 | 168F | 3600 | 87F7 | 0008 |
| 0000042500 | 4000 | 1174 | F58B | 8B36 | 803E | 3600 | B703 | 0014 |
| 0000042520 | 0336 | 14BF | 3600 | 87F7 | 0008 | 0100 | 1574 | 3353 |
| 0000042540 | 36C0 | 878A | 001C | E0D1 | 0BBB | 0344 | 58D8 | FF2E |
| 0000042560 | EB17 | 3613 | 87F7 | 0008 | 0004 | 0774 | C38B | B2E6 |
| 0000042600 | EB00 | E803 | 005B | 4D75 | 599C | F736 | 0887 | 1000 |
| 0000042620 | 7400 | 8106 | 1EC3 | EB00 | 3690 | 3E81 | 0C3B | FFFF |
| 0000042640 | 3174 | F736 | 0887 | 8000 | 7500 | 3621 | 87F7 | 0008 |
| 0000042660 | 4000 | 1F74 | F58B | 8B36 | 803E | 3600 | 1E8B | 0082 |
| 0000042700 | 8B36 | 0C8F | 8300 | 08E9 | F103 | F903 | 02B9 | F300 |
| 0000042720 | 9CA7 | 5159 | 749D | 9F04 | E632 | 5D9E | 595A | 585B |
| 0000042740 | 36C3 | 87F7 | 0008 | 0020 | 1E74 | 5350 | 9FE8 | 0002 |
| 0000042760 | 8D00 | 931E | AC0C | 8AD7 | 26E0 | 058A | D747 | E03A |
| 0000043000 | 0275 | F1E2 | 585B | 02EB | A6F3 | 2DC3 | 3344 | C044 |
| 0000043020 | 3344 | 3344 | 6144 | 6145 | 2D45 | 6144 | C045 | C044 |
| 0000043040 | DF45 | 2845 | 2B44 | 3344 | 3344 | F944 | 8BC3 | E8D8 |
| 0000043060 | FFAF | 8BC3 | 03D8 | 1EF1 | 4E56 | 034E | 06F9 | 4F57 |
| 0000043100 | FD4F | E9D1 | 8A36 | 1C87 | 3C00 | 750F | 8050 | 017C |
| 0000043120 | 7D00 | 831F | 01F9 | 0974 | 448B | F7FE | 36D8 | 84A3 |
| 0000043140 | 8B00 | 1504 | 0000 | D8F7 | A336 | 0086 | 368D | 0086 |
| 0000043160 | 1F16 | 8026 | 017D | 7D00 | 833F | 01F9 | 0A74 | 8B26 |
| 0000043200 | FE45 | D8F7 | A336 | 0088 | 8B26 | 1505 | 0000 | D8F7 |
| 0000043220 | A336 | 008A | 3E8D | 008A | 0716 | 1CEB | 3C90 | 7501 |
| 0000043240 | 5617 | A757 | 5E5F | 047F | 087C | 0C74 | C033 | F840 |
| 0000043260 | 08EB | C033 | F940 | 02EB | A7F3 | 5FFC | 5E07 | C31F |
| 0000043300 | D88B | F103 | 4E56 | 034E | 57F9 | 4F4F | D1FD | B8E9 |

THU MAR 14 17:20:30 1991 BTRCALLS.DLL PAGE 20, LINE 1122

| | | | | | | | | |
|---|---|---|---|---|---|---|---|---|
| 0000043320 | 8000 | 8036 | 1CBF | 0900 | 0375 | 80B8 | 8500 | 7404 |
| 0000043340 | 2609 | 0585 | 0C74 | 01B2 | 0EEB | 8526 | 7405 | F809 |
| 0000043360 | 08EB | C033 | F940 | 02EB | A7F3 | 74FC | 9F04 | E232 |
| 0000043400 | 5F9E | C35E | 0C30 | 1C31 | 2C32 | 3C33 | 4C34 | 5C35 |
| 0000043420 | 6C36 | 7C37 | 8C38 | 9C39 | 0D7D | 1D4A | 2D4B | 3D4C |
| 0000043440 | 4D4D | 5D4E | 6D4F | 7D50 | 8D51 | 9D52 | 0C7B | 1C41 |
| 0000043460 | 2C42 | 3C43 | 4C44 | 5C45 | 6C46 | 7C47 | 8C48 | 9C49 |
| 0000043500 | 0C2B | 0D2D | 0C20 | BE56 | 4504 | 802E | 203C | 0574 |
| 0000043520 | 382E | 7524 | 4606 | 8A2E | EB24 | 4604 | EB46 | 5EEB |
| 0000043540 | 8BC3 | 03D8 | 03F1 | 56F9 | 574E | 8A4F | 2624 | 058A |
| 0000043560 | 8036 | 1CBF | 0800 | 0A75 | CBE8 | 86FF | E8E0 | FFC6 |
| 0000043600 | E086 | C4F6 | 7402 | 8003 | 03F4 | 02A8 | 0274 | 0334 |
| 0000043620 | C4F6 | 7401 | A808 | 7401 | B20B | EB01 | A80D | 7401 |
| 0000043640 | F809 | 13EB | C033 | F940 | 0DEB | E349 | 2B08 | 2BF1 |
| 0000043660 | F3F9 | 75A6 | 3A02 | 74E0 | 9F04 | E232 | 5F9E | C35E |
| 0000043700 | D88B | 5650 | 5157 | 248A | E13A | 0472 | E18A | CCFE |
| 0000043720 | 8A26 | 3A05 | 72C1 | 8A04 | FEC1 | 46C8 | EB47 | 8B25 |
| 0000043740 | 50D8 | 5756 | 3351 | 56C0 | 8051 | 003C | 0574 | FE46 |
| 0000043760 | E2C4 | 59F6 | 575E | 2651 | 3D80 | 7400 | 4705 | C0FE |
| 0000044000 | F5E2 | 5F59 | E03A | 0472 | C88A | 04EB | CC8A | 00EB |
| 0000044020 | 05E3 | CCE8 | 75FD | 3A02 | 59E0 | 5E5F | 039C | 03F1 |
| 0000044040 | 9DF9 | C358 | D1E8 | 8B06 | CE0E | A108 | 08E0 | E1F7 |
| 0000044060 | C4A3 | A108 | 08E2 | E1F7 | 1601 | 08C4 | 0603 | 0A19 |
| 0000044100 | 0473 | 06FF | 08C4 | C6A3 | E908 | 06C5 | 8B51 | C81E |
| 0000044120 | 2B08 | 8AC9 | 890E | 8308 | 14BF | 0000 | 0575 | DB33 |
| 0000044140 | 28EB | 3B90 | 148F | 7300 | 811B | 10C3 | E301 | E81B |
| 0000044160 | 0205 | FBE2 | 87F7 | 0008 | 8000 | 0E74 | 06C7 | 0C39 |
| 0000044200 | 0038 | 06EB | 06C7 | 0C39 | 0006 | E959 | 068A | 67E8 |
| 0000044220 | 1E06 | BB06 | FFFF | DB8E | C38E | 36FF | 08E4 | 1E8B |
| 0000044240 | 08C8 | B78D | 003C | 3E8D | 0C8B | 04B9 | F300 | 74A7 |
| 0000044260 | FF53 | E036 | FF08 | E236 | C708 | E006 | 0008 | C700 |
| 0000044300 | E206 | 0108 | 8100 | 06BF | 0000 | 7D05 | 8108 | 06BF |
| 0000044320 | 0000 | 7FFB | 8B10 | 0A8F | 8901 | E00E | 8B08 | 0C8F |
| 0000044340 | 8901 | E20E | E808 | 0B5C | 46FC | 368B | 08E4 | C681 |
| 0000044360 | 0006 | 3E8D | 0C8A | 09B9 | E801 | 051C | 068F | 08E2 |
| 0000044400 | 068F | 08E0 | 068F | 08E4 | 1F07 | 04E9 | 8D06 | 5036 |
| 0000044420 | A10C | 0C4E | 02B9 | D300 | 03E0 | C3F0 | D9E8 | FF05 |
| 0000044440 | 4E0E | E80C | FFE7 | 148B | 1689 | 08E0 | 548B | 8902 |
| 0000044460 | E216 | E908 | 05DB | BFE8 | F705 | 0887 | 0000 | 7440 |
| 0000044500 | 8A56 | 880E | 5108 | D233 | 8F8B | 0016 | 20B0 | 3E8D |
| 0000044520 | 0902 | BF03 | 0014 | 5751 | AAF3 | 595F | 0E3A | 0888 |
| 0000044540 | 0476 | 0E8A | 0888 | 0E28 | 0888 | C51E | 8436 | 0308 |
| 0000044560 | 03F2 | E8D1 | 04A2 | F71F | 0887 | 1000 | 7400 | 8106 |
| 0000044600 | 1EC3 | EB00 | 59C3 | 0E88 | 0888 | 3E8D | 0902 | BF03 |
| 0000044620 | 000C | EF83 | EB08 | 8B2F | 0A8F | B000 | 8D20 | 023E |
| 0000044640 | F309 | 8AAA | 880E | 3B08 | 0A8F | 7600 | 8B04 | 0A8F |
| 0000044660 | 8D00 | 023E | 1E09 | 36C5 | 0884 | 5BE8 | 1F04 | 87F7 |
| 0000044700 | 0008 | 0080 | 1374 | 75A1 | A90C | 8000 | 0374 | FF35 |
| 0000044720 | 89FF | A105 | 0C77 | 4589 | E902 | 0535 | 8956 | E83E |
| 0000044740 | 8108 | 04C7 | 8D00 | 0236 | E809 | FB2C | C35E | 5756 |
| 0000044760 | 5350 | 5251 | D233 | 3B36 | 843E | 7508 | 8C0C | 36C0 |
| 0000045000 | 063B | 0886 | 0375 | 01BA | 8B00 | 83C6 | 00FA | 2575 |
| 0000045020 | F736 | 0887 | 0000 | 7440 | 361C | 8F8B | 000C | E983 |
| 0000045040 | E808 | 03F4 | A136 | 0C4A | 8926 | 3605 | 46A1 | 260C |
| 0000045060 | 4589 | EB02 | 8B3B | 36F0 | B703 | 0014 | 8B36 | 168F |
| 0000045100 | E800 | 03D4 | F736 | 0887 | 1000 | 7400 | 8106 | 1EC3 |
| 0000045120 | EB00 | 36E2 | 87F7 | 0008 | 0080 | 1474 | FA83 | 7500 |
| 0000045140 | 360F | 75A1 | 260C | 0589 | A136 | 0C77 | 8926 | 0245 |
| 0000045160 | 595A | 585B | 5E5F | 50C3 | C38B | 1E05 | F700 | 0887 |

THU MAR 14 17:20:30 1991 BTRCALLS.DLL PAGE 21, LINE 1181

| | | | | | | | | |
|---|---|---|---|---|---|---|---|---|
| 0000045200 | 1000 | 7400 | 8B04 | EBD8 | 8BF1 | 58D8 | 50C3 | F753 |
| 0000045220 | 0887 | 0800 | 7402 | 8D38 | 023E | 8B09 | 168F | 8A00 |
| 0000045240 | 1D87 | F300 | 75AE | F716 | 0887 | 0000 | 7502 | F725 |
| 0000045260 | 0887 | 1000 | 7400 | 8120 | 1EC3 | EB00 | F7DE | 0887 |
| 0000045300 | 0000 | 7402 | 030A | F7F9 | 0887 | 1000 | 7500 | 80E8 |
| 0000045320 | 01CB | 03EB | E380 | 5B00 | C358 | 1BE8 | FF04 | 4E06 |
| 0000045340 | E80C | FE29 | 168B | 08E0 | 1489 | 168B | 08E2 | 5489 |
| 0000045360 | E902 | 041D | 01E8 | E804 | FD52 | 493A | DB0B | 3A74 |
| 0000045400 | 8F8B | 000A | DE3A | 0888 | 2A77 | 0E88 | 0888 | C406 |
| 0000045420 | 843E | 8108 | 423E | 3205 | 7500 | 8B0D | E836 | 8108 |
| 0000045440 | 04C6 | E800 | 02F2 | 09EB | C51E | 7436 | E808 | FEBE |
| 0000045460 | 071F | 06EB | 06C7 | 0C39 | 0015 | D4E9 | 9003 | B7E8 |
| 0000045500 | 8103 | 423E | 6405 | 7C00 | 810D | C43E | FF00 | 74FF |
| 0000045520 | E805 | 18AE | 4A61 | 1E8B | 08C8 | BF83 | 0014 | 75FF |
| 0000045540 | E808 | 0144 | 4A61 | F8E9 | 8B00 | A304 | 0C40 | 75A3 |
| 0000045560 | 8B0C | 0244 | 42A3 | A30C | 0C77 | 3E81 | 0542 | 0032 |
| 0000045600 | 1D75 | 40A1 | A30C | 0C44 | 48A3 | A10C | 0C42 | 46A3 |
| 0000045620 | A30C | 0C4A | C02B | 89A0 | A308 | 0C4C | C2E9 | E800 |
| 0000045640 | 0257 | 4A61 | 9DE8 | 6108 | 8B4A | E436 | F708 | 0484 |
| 0000045660 | 0000 | 7580 | E903 | 00A0 | 91E8 | 61FC | 0B4A | 74DB |
| 0000045700 | F734 | 0887 | 0100 | 7400 | F71F | 0887 | 8000 | 7500 |
| 0000045720 | 8B17 | E436 | 0308 | 1936 | 030A | 12B7 | B900 | 0004 |
| 0000045740 | FE8B | C02B | AEF3 | 6774 | C02B | 89A0 | A308 | 0C4C |
| 0000045760 | 59E8 | 61FC | E84A | 006C | 0000 | 3E83 | 0C39 | 7400 |
| 0000046000 | 8108 | 393E | 160C | 7500 | 0B58 | 74DB | F733 | 0887 |
| 0000046020 | 8000 | 7500 | F708 | 0887 | 0100 | 7500 | 8D0E | 443E |
| 0000046040 | B80C | FFFF | 04B9 | F300 | EBAB | 8B15 | E436 | 0308 |
| 0000046060 | 1936 | 030A | 12B7 | B900 | 0004 | 3E8D | 0C44 | A5F3 |
| 0000046100 | 3E83 | 0C39 | 7500 | E81A | 00E3 | 4A61 | 13EB | C790 |
| 0000046120 | 3906 | 520C | EB00 | 900A | 06C7 | 0C39 | 002B | 01EB |
| 0000046140 | E990 | 02AD | 91E8 | 8B02 | C81E | 8B08 | 168F | 3B00 |
| 0000046160 | 780E | 7708 | 8B18 | E436 | 0308 | 1936 | 060A | 3EC4 |
| 0000046200 | 0874 | 93E8 | 0701 | 3689 | 008C | 0DEB | C790 | 3906 |
| 0000046220 | 160C | C700 | 7806 | 0008 | 8B00 | E436 | 8B08 | 048C |
| 0000046240 | 8900 | 7B0E | E90C | 0269 | 4DE8 | 8B02 | 168F | 3B00 |
| 0000046260 | 780E | 7708 | 892E | 780E | 8B08 | E836 | 8308 | 04C6 |
| 0000046300 | C406 | 743E | E808 | 0150 | 8B07 | A304 | 0C4A | 448B |
| 0000046320 | A302 | 0C46 | FFB8 | A3FF | 0C48 | 44A3 | B80C | 0000 |
| 0000046340 | 10EB | C790 | 3906 | 160C | B800 | 0016 | 06C7 | 0878 |
| 0000046360 | 0000 | 368B | 08E4 | 8C8B | 0004 | 0E89 | 0C7B | 368B |
| 0000046400 | 08E8 | 362B | 08E4 | 3689 | 0A19 | 17E8 | 00FB | A300 |
| 0000046420 | 0C39 | C4A1 | A308 | 0C75 | 40A3 | A10C | 08C6 | 77A3 |
| 0000046440 | A30C | 0C42 | 06C7 | 0C4C | 0000 | E4E9 | E801 | 01C8 |
| 0000046460 | 1E8B | 08C8 | BF83 | 0016 | 7400 | E903 | 0082 | 36FF |
| 0000046500 | 0874 | 36FF | 0876 | 36FF | 0878 | 368B | 008C | 048B |
| 0000046520 | 26A3 | 8B05 | 0244 | 28A3 | A105 | 08F4 | 78A3 | A108 |
| 0000046540 | 08F6 | 76A3 | 3308 | A3C0 | 0874 | 13E8 | 001B | 8B00 |
| 0000046560 | 780E | 8F08 | 7806 | 8F08 | 7606 | 8F08 | 7406 | 8308 |
| 0000046600 | 393E | 000C | 1074 | 3E81 | 0C39 | 0016 | 3075 | 06C7 |
| 0000046620 | 0C39 | 003A | 28EB | 3E8B | 0874 | 168B | 0876 | F6A1 |
| 0000046640 | 3308 | 1EF6 | 8E06 | 8EC2 | E8D8 | 2BC4 | 0000 | 1F07 |
| 0000046660 | 3E81 | 0C39 | 003A | 0675 | 06C7 | 0C39 | 0016 | 36EB |
| 0000046700 | 978B | 0016 | BF80 | 0038 | 7400 | 8B25 | 8C36 | 8B00 |
| 0000046720 | A304 | 0526 | 448B | A302 | 0528 | C033 | 87F6 | 0038 |
| 0000046740 | 7502 | 8B03 | 0444 | 31A3 | E805 | 1A94 | 4BF6 | 06EB |
| 0000046760 | 1689 | 0878 | 00EB | 18E9 | E801 | 00FC | D22B | 048B |
| 0000047000 | 0E8B | 08CE | F1F7 | E0A3 | 8B08 | 0244 | F1F7 | E2A3 |
| 0000047020 | 8908 | 1916 | E90A | 00F9 | C1F7 | 0001 | 0174 | D1A4 |
| 0000047040 | F3E9 | C3A5 | D1E8 | 1E00 | 8E06 | F006 | BF08 | 0008 |

THU MAR 14 17:20:30 1991 BTRCALLS.DLL PAGE 22, LINE 1240

| | | | | | | | | |
|---|---|---|---|---|---|---|---|---|
| 0000047060 | 2CBB | 360B | 87C7 | 0008 | 0100 | 8A26 | 3605 | 8788 |
| 0000047100 | 001C | 8B26 | 0145 | 8936 | 1687 | 2600 | 458B | 3603 |
| 0000047120 | 8789 | 0014 | C536 | 7436 | 0308 | 26F0 | 558A | FE05 |
| 0000047140 | 26CA | 758A | 8306 | 07C7 | E857 | F6AC | 9F5F | 8053 |
| 0000047160 | 41E4 | DC8A | E381 | 0001 | 05B9 | D200 | 02EC | 8ADC |
| 0000047200 | B0CA | D201 | 2EE0 | 8722 | 4CBD | 745B | 8007 | 01FE |
| 0000047220 | 2675 | 05EB | FE80 | 7502 | 3607 | BF03 | 0016 | 90EB |
| 0000047240 | FF26 | 040E | 7500 | 360A | 06C7 | 0C39 | 003C | 08EB |
| 0000047260 | 3690 | 06C7 | 0C39 | FFFF | 1F07 | 54E9 | 1A00 | 312C |
| 0000047300 | 35E8 | 0600 | 8E1E | F006 | 3308 | C5FF | 7436 | 8108 |
| 0000047320 | 027C | 4246 | 0374 | 13EB | 8390 | 047C | 7500 | C705 |
| 0000047340 | 0444 | 0FFF | 0C8B | 2FE8 | EBFF | 3607 | 06C7 | 0C39 |
| 0000047360 | 0001 | 071F | 1AE9 | 0000 | 8F36 | 1B06 | 500A | 5153 |
| 0000047400 | 5552 | 5756 | FF36 | 1B36 | 360A | 06C7 | 0C39 | 0000 |
| 0000047420 | 5FC3 | 5D5E | 595A | 585B | 8F36 | 1B06 | 360A | 3E83 |
| 0000047440 | 0C39 | 7400 | 501B | 3653 | 1E8B | 0A1B | 8B2E | 3D07 |
| 0000047460 | 0000 | 0A74 | 8B2E | 2D07 | 0002 | A336 | 0A1B | 585B |
| 0000047500 | 8336 | 1B06 | 020A | FF36 | 1B36 | C30A | A9E8 | 2BFF |
| 0000047520 | 8ADB | 3D1E | 810C | CBFB | 7400 | E903 | 00C2 | C02B |
| 0000047540 | 063B | 0C71 | 0375 | B7E9 | C700 | 9206 | 0000 | 8100 |
| 0000047560 | 423E | 6405 | 7C00 | 801A | 703E | FF0C | 1374 | 3E81 |
| 0000047600 | 00C4 | FFFF | 0B74 | FAE8 | 3E15 | C74E | 9206 | FF00 |
| 0000047620 | E8FF | 02FC | 4E29 | 3E8B | 08A6 | 1BE8 | 030B | 8BF8 |
| 0000047640 | 508D | 8900 | CE0E | A108 | 08A0 | D233 | F1F7 | 17A3 |
| 0000047660 | 330A | A3C0 | 08E0 | E2A3 | C708 | 0D06 | FF0A | E8FF |
| 0000047700 | 0482 | 4E29 | 1E8B | 08E6 | 1E89 | 08DE | 1E8B | 08E4 |
| 0000047720 | 1E89 | 08C8 | 3E81 | 0096 | FFFF | 0D75 | 73A1 | 890C |
| 0000047740 | 0487 | C700 | 9606 | 0000 | 8100 | C43E | FF00 | 75FF |
| 0000047760 | 810D | 823E | 0008 | 7400 | E805 | 0D93 | 4E29 | 06FF |
| 0000050000 | 08AA | 0575 | 09E8 | 2902 | 8B4E | A63E | E808 | 0AA8 |
| 0000050020 | F803 | AAA1 | 8908 | 5285 | E800 | 031B | 4E29 | 1EEB |
| 0000050040 | 06C7 | 0C39 | 0003 | 16EB | 8190 | 923E | FF00 | 75FF |
| 0000050060 | FF0D | 3936 | E80C | 15B1 | 0000 | 068F | 0C39 | D0E9 |
| 0000050100 | E8FE | FEB4 | 06C7 | 08C8 | FFFF | EEA1 | A308 | 08F2 |
| 0000050120 | FEB8 | 3800 | 7006 | 750C | E903 | 0086 | FDB8 | 3800 |
| 0000050140 | 7006 | 750C | E803 | 01FB | E1E8 | EEFE | 8B4E | C81E |
| 0000050160 | 8108 | C43E | FF00 | 74FF | 811D | 22BF | FF00 | 75FF |
| 0000050200 | EB03 | 9057 | 87FF | 0004 | 87F7 | 0004 | 8000 | 0674 |
| 0000050220 | 87C7 | 0004 | 0000 | 878B | 0004 | 73A3 | C70C | 2287 |
| 0000050240 | FF00 | 8BFF | 2C87 | A300 | 0C81 | 06C7 | 0C83 | FFFF |
| 0000050260 | 87F7 | 000A | 4000 | 1375 | 87F7 | 000A | 8000 | 0674 |
| 0000050300 | 8F81 | 000A | 4000 | 47E8 | EE03 | F74E | 0A87 | 0000 |
| 0000050320 | 7480 | E805 | 036E | 0000 | 14EB | 06C7 | 0C39 | 0013 |
| 0000050340 | 0CEB | 06C7 | 0C81 | 0000 | 06C7 | 0C39 | 002E | 20E9 |
| 0000050360 | E8FE | FE04 | 3E81 | 00C4 | FFFF | 0874 | 87F7 | 000A |
| 0000050400 | 8000 | 3E75 | 7DE8 | AEE8 | E84F | 06A1 | 4FAE | 3E81 |
| 0000050420 | 08DC | FFFF | 1074 | 3E8B | 08A6 | 9BE8 | 0309 | 80F8 |
| 0000050440 | 0DBD | FF00 | 2275 | 1EE8 | A8DB | E84F | DEBC | 4FA8 |
| 0000050460 | BF81 | 0044 | FFFF | 0A75 | 7DE8 | A8DB | E84F | DF82 |
| 0000050500 | 4FA8 | 06C7 | 08DC | 0000 | 06C7 | 0C83 | 0000 | 1E8B |
| 0000050520 | 08C8 | 3E81 | 00C4 | FFFF | 2074 | 87C7 | 0022 | 0000 |
| 0000050540 | C02B | 8789 | 002C | 87FF | 0004 | 87F7 | 0004 | 8000 |
| 0000050560 | 0F74 | 87C7 | 0004 | 0000 | 07EB | 81A1 | 890C | 2C87 |
| 0000050600 | A100 | 08EE | F2A3 | 8908 | E41E | E808 | 072A | 3E81 |
| 0000050620 | 00C4 | FFFF | 0874 | 87F7 | 000A | 8000 | 0875 | 42E8 |
| 0000050640 | AE04 | E84F | 0712 | 06EB | 06C7 | 0C39 | 0010 | FDB8 |
| 0000050660 | 3800 | 7006 | 750C | E803 | 00BB | 54E9 | 53FD | A150 |
| 0000050700 | 08EE | F2A3 | 8B08 | C81E | 8308 | 00FB | 3D74 | 878B |
| 0000050720 | 0004 | 73A3 | 810C | 423E | 6405 | 7C00 | 801C | 703E |

THU MAR 14 17:20:30 1991 BTRCALLS.DLL PAGE 23, LINE 1299

| | | | | | | | | |
|---|---|---|---|---|---|---|---|---|
| 0000050740 | FF0C | 1574 | 3E81 | 00C4 | FFFF | 0D74 | 36FF | 0C39 |
| 0000050760 | F6E8 | 0013 | 8F00 | 3906 | F70C | 0A87 | 0000 | 7580 |
| 0000051000 | 8B0A | DE1E | C708 | 0287 | 0000 | 5800 | E95B | FD08 |
| 0000051020 | E5E8 | 8BFC | A61E | 8B08 | A40E | BA08 | FFFF | BF83 |
| 0000051040 | 000E | 7400 | 390A | 5297 | 7700 | 8B04 | 5297 | 8100 |
| 0000051060 | 54C3 | E200 | 4AE9 | 1E8B | 08A6 | 0E8B | 08A4 | 00B8 |
| 0000051100 | 8300 | 0EBF | 0000 | 0E74 | 9729 | 0052 | 8739 | 0052 |
| 0000051120 | 0472 | 878B | 0052 | C381 | 0054 | E5E2 | A340 | 08AA |
| 0000051140 | AEE9 | 50FC | 54B4 | 07E8 | A225 | 08FC | 2EB4 | 01B0 |
| 0000051160 | FDE8 | 5824 | 50C3 | 3E81 | 0882 | 0002 | 107C | 3E81 |
| 0000051200 | 0882 | 0005 | 087D | 2EB4 | FCA0 | E808 | 24E2 | C358 |
| 0000051220 | 65E8 | C7FC | 9606 | 0000 | B800 | 00FF | 0638 | 0C70 |
| 0000051240 | 0375 | 8FE9 | 8B00 | A63E | E808 | 080C | F803 | 9D8B |
| 0000051260 | 0000 | C033 | 42B4 | C933 | 04BA | E800 | 24B2 | 6A72 |
| 0000051300 | 3FB4 | 168D | 0090 | 02B9 | E800 | 24A4 | 5C72 | 163B |
| 0000051320 | 0090 | 1639 | 0C73 | 5C74 | 3E81 | 0882 | 0005 | 1872 |
| 0000051340 | 3E81 | 00C4 | FFFF | 1074 | BD80 | 000A | 74FF | B809 |
| 0000051360 | 00FE | 0638 | 0C70 | 0875 | 81E8 | 0003 | EB00 | 9029 |
| 0000051400 | 80E8 | 0812 | EB51 | 900F | 3E81 | 0C39 | 0055 | 2475 |
| 0000051420 | 06C7 | 0096 | FFFF | 63E8 | 0003 | 8100 | 963E | FF00 |
| 0000051440 | 74FF | E805 | 12C3 | 0000 | 0AEB | 06C7 | 0C39 | 0002 |
| 0000051460 | 02E8 | 5990 | DAE9 | E8FB | FBBE | 3E8B | 08A6 | 77E8 |
| 0000051500 | 0307 | 8AF8 | 0A95 | 8100 | 22BF | 0000 | 7500 | E903 |
| 0000051520 | 0082 | 3E81 | 0882 | 0014 | 3373 | 3E81 | 0882 | 0000 |
| 0000051540 | 2B74 | 3E81 | 08DA | FFFF | 2374 | FEB8 | 3800 | 7006 |
| 0000051560 | 740C | 811A | C43E | FF00 | 74FF | 8012 | 0ABD | FF00 |
| 0000051600 | 1974 | BD83 | 004E | 7400 | FF07 | 4E8D | EB00 | 904B |
| 0000051620 | F0E8 | E311 | C751 | 4E85 | 4000 | 5300 | 9D8B | 0000 |
| 0000051640 | C033 | 42B4 | C933 | D233 | C5E8 | 7223 | 8B47 | C816 |
| 0000051660 | 8B08 | CE0E | B408 | E83F | 23B6 | 3872 | 815B | 22BF |
| 0000051700 | 0000 | 7400 | E836 | E496 | 51FB | FA80 | 74FF | E80B |
| 0000051720 | 1217 | 0000 | 85C7 | 004E | 0000 | 06C7 | 0C39 | 0000 |
| 0000051740 | 2BEB | 8190 | 393E | 550C | 7500 | C722 | 3906 | 000C |
| 0000051760 | EB00 | 901A | 06C7 | 0C39 | 0002 | 805B | FFFA | 0D74 |
| 0000052000 | 36FF | 0C39 | E2E8 | 0011 | 8F00 | 3906 | E90C | FB01 |
| 0000052020 | E5E8 | 8BFA | 52D3 | 9D8B | 0000 | C033 | 42B4 | C933 |
| 0000052040 | D233 | 4BE8 | 5A23 | 1272 | 02B9 | B900 | 0024 | 40B4 |
| 0000052060 | 3DE8 | 7223 | E805 | 0480 | 06EB | 06C7 | 0C39 | 0002 |
| 0000052100 | CEE9 | 00FA | B1E8 | FFFA | C206 | 7508 | E805 | 05FD |
| 0000052120 | 53CE | C02B | A0A3 | A300 | 08B0 | 1E8B | 08AE | C2A1 |
| 0000052140 | 8B08 | 7116 | 8B0C | 9E0E | 3908 | 0097 | 7500 | 5143 |
| 0000052160 | 3350 | 8AC9 | 068F | 8B00 | 173E | 8B0A | 81F3 | 08C6 |
| 0000052200 | A100 | 08E2 | 843B | 0002 | 0975 | E0A1 | 3A08 | 0084 |
| 0000052220 | 7400 | 0309 | CE36 | 4F08 | E7E2 | 05EB | 5958 | EAE9 |
| 0000052240 | 5800 | 8359 | 00FF | 1774 | 1E89 | 00A0 | 3689 | 00A2 |
| 0000052260 | 23EB | BF83 | 0000 | 7500 | 8906 | B01E | 2B08 | 81C0 |
| 0000052300 | 02BF | FF00 | 74FF | 390E | 0487 | 7300 | 8B08 | 0487 |
| 0000052320 | 8900 | B01E | 0308 | A21E | E208 | 838E | A03E | 0000 |
| 0000052340 | 0A74 | 1E8B | 00A0 | 368B | 00A2 | 35EB | 1E8B | 08B0 |
| 0000052360 | FB83 | 7500 | E903 | 00C8 | BF80 | 0007 | 7400 | 8011 |
| 0000052400 | 703E | FF0C | 0574 | 7BE8 | CEE4 | E853 | 01E0 | 53CE |
| 0000052420 | 87C6 | 0006 | C700 | 0087 | 0000 | 8B00 | 81F3 | 08C6 |
| 0000052440 | 8100 | 133E | 000A | 7400 | C73F | DC06 | FF08 | 8BFF |
| 0000052460 | CE0E | 8B08 | 2BFE | D1C0 | F3E9 | A1AB | 08E0 | 8489 |
| 0000052500 | 0000 | E2A1 | 8908 | 0284 | 8000 | 703E | FF0C | 0775 |
| 0000052520 | 40B5 | 79E8 | CE03 | 8153 | D03E | FF08 | 75FF | C724 |
| 0000052540 | 0484 | 0000 | EB80 | 901C | 3FB5 | 61E8 | CE03 | 8B53 |
| 0000052560 | 0084 | 3800 | E006 | 7508 | 8B4F | 0284 | 3900 | E206 |
| 0000052600 | 7508 | FE45 | 0687 | 8900 | 0097 | 8100 | 02BF | FF00 |

THU MAR 14 17:20:30 1991 BTRCALLS.DLL PAGE 24, LINE 1358

| | | | | | | | | |
|---|---|---|---|---|---|---|---|---|
| 0000052620 | 74FF | A107 | 0A0D | 8789 | 0002 | C2A1 | 8908 | 0487 |
| 0000052640 | 8900 | E61E | 8908 | E436 | 8108 | 833E | FF0C | 75FF |
| 0000052660 | 811D | 133E | FF0A | 74FF | E815 | E226 | 53CE | 0EEB |
| 0000052700 | 06C7 | 0C39 | FFFF | 06EB | 06C7 | 0C39 | 0002 | 06C7 |
| 0000052720 | 0A13 | 0000 | 06C7 | 08D0 | 0000 | 06C7 | 0A0D | 0000 |
| 0000052740 | 2EE9 | E8F9 | F912 | 3E81 | 00A4 | FFFF | 0375 | 70EB |
| 0000052760 | 8390 | AA3E | 0000 | 1474 | A8A1 | 3B00 | 7106 | 740C |
| 0000053000 | C70B | AC06 | FF00 | E8FF | 0072 | 5479 | 368B | 08AE |
| 0000053020 | 3E8B | 08E4 | BD83 | 0000 | 7500 | 8307 | 02BD | 0000 |
| 0000053040 | 3E74 | C78B | C62B | 0E8B | 08A2 | D233 | F1F7 | F752 |
| 0000053060 | 03E1 | 58F0 | D233 | 36F7 | 08CE | C88B | 01B0 | E0D2 |
| 0000053100 | 8484 | 0007 | 1875 | 8408 | 0007 | 06FF | 00AA | 168B |
| 0000053120 | 08C8 | 1689 | 00A6 | 948B | 0000 | 1689 | 00A8 | 19EB |
| 0000053140 | 368B | 08E4 | 848B | 0000 | E0A3 | 8B08 | 0284 | A300 |
| 0000053160 | 08E2 | 40B5 | 57E8 | 7902 | E954 | F895 | 79E8 | 8BF8 |
| 0000053200 | AE1E | 8B08 | 9E0E | 8B08 | 7116 | 800C | 07BF | 0000 |
| 0000053220 | 0D74 | 3E81 | 0JAC | FFFF | 0575 | 51E8 | E500 | 3954 |
| 0000053240 | 0097 | 7500 | 812B | AC3E | FF00 | 74FF | C723 | 0087 |
| 0000053260 | 0000 | C700 | 0287 | 0000 | C700 | 0487 | 0000 | C600 |
| 0000053300 | 0787 | 0000 | 1639 | 00A8 | 0675 | 06C7 | 00AA | 0000 |
| 0000053320 | 3E83 | 00AA | 7500 | 8108 | AC3E | FF00 | 74FF | 0306 |
| 0000053340 | A21E | E208 | C7A6 | AC06 | 0000 | E900 | F823 | 07E8 |
| 0000053360 | FFF8 | C836 | FF08 | 7136 | FF0C | CE36 | FF08 | E036 |
| 0000053400 | FF08 | E236 | FF08 | E436 | A108 | 00A6 | C8A3 | 8B08 |
| 0000053420 | 7116 | A10C | 00A8 | 71A3 | 8B0C | A63E | E808 | 0398 |
| 0000053440 | F803 | 858B | 0050 | CEA3 | 8B08 | 81F3 | 08C6 | 3300 |
| 0000053460 | 8AC9 | 068F | 8A00 | 0787 | B400 | C7FE | A406 | FF00 |
| 0000053500 | 33FF | A8ED | 7401 | FF1C | AA0E | 8900 | E436 | 8108 |
| 0000053520 | AE3E | FF00 | 74FF | E807 | FE89 | 5573 | 05EB | A8E8 |
| 0000053540 | 0000 | 2000 | 07A7 | 0300 | CE36 | D008 | D0E8 | E2C4 |
| 0000053560 | EBD2 | 5015 | A8A1 | 3B00 | 58C2 | 0674 | 06C7 | 0C39 |
| 0000053600 | 0034 | 2E8B | 0C39 | DFEB | 2E89 | 0C39 | 06C7 | 00A4 |
| 0000053620 | 0000 | 068F | 08E4 | 068F | 08E2 | 068F | 08E0 | 068F |
| 0000053640 | 08CE | 068F | 0C71 | 068F | 08C8 | 64E9 | E8F7 | F748 |
| 0000053660 | A8A1 | 3900 | 7106 | 750C | C74D | AC06 | FF00 | C7FF |
| 0000053700 | AE06 | FF00 | C7FF | B006 | 0000 | E800 | FEAE | 55F4 |
| 0000053720 | 06C7 | 00A4 | FFFF | 0E8B | 00B0 | F633 | 16E3 | 8E06 |
| 0000053740 | F006 | 2608 | 048B | E4A3 | 0708 | F6E8 | F4FD | 8355 |
| 0000053760 | 06C6 | EAE2 | 06C7 | 00AC | 0000 | 06C7 | 00AE | 0000 |
| 0000054000 | 06C7 | 00A4 | 0000 | 08E9 | E8F7 | F6EC | 8B06 | E41E |
| 0000054020 | 8B08 | 0087 | 8B00 | 0297 | 5200 | 5350 | 068E | 08F0 |
| 0000054040 | FF33 | 0E8B | 00B0 | 2EE3 | 3B26 | 0245 | 0D72 | 3B26 |
| 0000054060 | 0455 | 0772 | C783 | E206 | EBEF | B81B | 0006 | E1F7 |
| 0000054100 | 8B57 | 03F7 | 4EF0 | FE8B | C783 | 8B06 | 1EC8 | 1F06 |
| 0000054120 | F3FD | FCA4 | 5F1F | 8F26 | 2605 | 458F | 2602 | 458F |
| 0000054140 | FF04 | B006 | 0700 | A8E9 | 53F6 | 8B56 | D41E | 3B08 |
| 0000054160 | DE1E | 7408 | 8316 | 00FB | 1174 | 368B | 08C8 | BC83 |
| 0000054200 | 0014 | 74FF | C706 | 0287 | 0000 | 8B00 | 731E | 890C |
| 0000054220 | 7B1E | 5E0C | E95B | F680 | 8B53 | EC1E | 3B08 | D41E |
| 0000054240 | 7408 | 3B11 | DE1E | 7408 | 830B | 00FB | 0674 | 87C7 |
| 0000054260 | 0002 | 0000 | E95B | F660 | 5350 | 1E8B | 08C8 | 87F7 |
| 0000054300 | 000A | 8000 | 0575 | 0DB4 | A5E8 | 5B1E | C358 | 27E8 |
| 0000054320 | C6F6 | FD06 | 0008 | EE8B | E0A1 | 2508 | 00FF | 168B |
| 0000054340 | 08E2 | 3E8B | 08C8 | BCE8 | FC00 | 5056 | 8B57 | A63E |
| 0000054360 | E808 | 01C4 | F803 | 9D8B | 0000 | 1DEB | 06C7 | 0C39 |
| 0000054400 | 0000 | 952B | 006E | 851B | 006C | 5750 | 3E8B | 08A6 |
| 0000054420 | A5E8 | 0301 | 8BF8 | 049D | 5F00 | 5158 | 8B52 | CE0E |
| 0000054440 | F708 | 5AE1 | 8B50 | F7C2 | 8BE1 | 8BCA | 58D0 | C803 |
| 0000054460 | 00B0 | 42B4 | 39E8 | 591E | 5072 | E58A | D58B | 8B51 |

THU MAR 14 17:20:30 1991 BTRCALLS.DLL PAGE 25, LINE 1417

| | | | | | | | | |
|---|---|---|---|---|---|---|---|---|
| 0000054500 | CEDE | 8308 | E23E | 0008 | 0775 | 3E83 | 08E0 | 7400 |
| 0000054520 | 5325 | 8B51 | C81E | 8308 | 06BF | 0000 | 167F | 87F6 |
| 0000054540 | 0037 | 7402 | C60F | FD06 | FF08 | FC80 | 7540 | E805 |
| 0000054560 | 083A | 0000 | 5B59 | F7E8 | 591D | 0E72 | 063B | 08CE |
| 0000054600 | 1074 | 49E8 | 9200 | E957 | FF5C | 06C7 | 0C39 | 0002 |
| 0000054620 | 10EB | 3E80 | 08FD | 75FF | 8B09 | CE0E | E808 | 080C |
| 0000054640 | 0000 | 6CE9 | 83F5 | 00FA | 0575 | 003D | 7400 | 811C |
| 0000054660 | 44BD | FF00 | 75FF | 3914 | 6C85 | 7700 | 720E | 3906 |
| 0000054700 | 6E95 | 7700 | C706 | 3906 | FF0C | E9FF | F54A | 8351 |
| 0000054720 | E23E | 0008 | 0775 | 3E83 | 08E0 | 7400 | 805E | 3FFD |
| 0000054740 | 5974 | BD83 | 0024 | 7401 | 815A | 44BD | FF00 | 74FF |
| 0000054760 | FF52 | E036 | FF08 | E236 | FF08 | 1936 | B40A | B042 |
| 0000055000 | 3302 | 33D2 | E8C9 | 1D68 | 1689 | 00B2 | B4A3 | 8D00 |
| 0000055020 | B236 | E800 | F3E3 | 0000 | E0A1 | 8B08 | E216 | 8908 |
| 0000055040 | 6C85 | 8900 | 6E95 | 8F00 | 1906 | 8F0A | E206 | 8F08 |
| 0000055060 | E006 | C708 | 4485 | FF00 | EBFF | C70E | 3906 | 020C |
| 0000055100 | EB00 | C706 | 3906 | 120C | 5900 | CBE9 | E8F4 | F4AG |
| 0000055120 | 1E8B | 08AE | 0E8B | 089E | FFBA | 83FF | 04BF | 0000 |
| 0000055140 | 1274 | BF81 | 0002 | FFFF | 0A74 | 9739 | 0004 | 0477 |
| 0000055160 | 978B | 0004 | 1E03 | 08A2 | E1E2 | 8B4A | AE1E | 8B08 |
| 0000055200 | 9E0E | B808 | 0000 | BF83 | 0004 | 7400 | 811E | 02BF |
| 0000055220 | FF00 | 75FF | C708 | 0487 | 0100 | EB00 | 290E | 0497 |
| 0000055240 | 3900 | 0487 | 7200 | 8B04 | 0487 | 0300 | A21E | E208 |
| 0000055260 | 40D5 | C2A3 | E908 | F459 | 5251 | 0E8B | 0C71 | B849 |
| 0000055300 | 0054 | E1F7 | 595A | 00C3 | 2DE8 | 80F4 | 883E | 4008 |
| 0000055320 | 2772 | 168A | 0889 | C51E | 8436 | 8008 | 00FA | 0B74 |
| 0000055340 | C28A | 4004 | 0488 | C646 | 3A04 | C646 | 5C04 | B446 |
| 0000055360 | E847 | 1C7C | 721F | EB0A | C70E | 3906 | 150C | EB00 |
| 0000055400 | C706 | 3906 | 230C | E900 | F407 | EBE8 | 1EF3 | 16C5 |
| 0000055420 | 0884 | 3BB4 | ⁵9E8 | 1F1C | 0673 | 06C7 | 0C39 | 0023 |
| 0000055440 | EEE9 | 00F3 | D1E8 | 81F3 | C43E | FF00 | 75FF | EB03 |
| 0000055460 | 9004 | 80E9 | C700 | C406 | 0000 | B800 | 00CB | 3DA2 |
| 0000055500 | 8D0C | C636 | 8B00 | 008C | 8100 | 02C6 | E300 | 8B39 |
| 0000055520 | 0084 | A300 | 0C71 | 3E8B | 08A6 | 5BE8 | 03FF | 8AF8 |
| 0000055540 | 0C85 | A200 | 0C70 | E3E8 | BDF3 | 8B59 | C81E | C708 |
| 0000055560 | 2C87 | 0000 | E800 | DCE6 | 59BD | 40E8 | BDF6 | 8159 |
| 0000055600 | 4CC6 | E200 | EBC8 | 9004 | 3BEB | 8D90 | C636 | 8B00 |
| 0000055620 | 008C | 8100 | 02C6 | 8B00 | 0084 | A300 | 0C71 | 2EE8 |
| 0000055640 | 000A | 8100 | 4CC6 | E200 | 8DEE | C636 | C700 | 0D84 |
| 0000055660 | 0000 | EB00 | C710 | 3906 | 270C | EB00 | C70E | C406 |
| 0000055700 | FF00 | EBFF | C706 | 0906 | 0005 | E900 | F343 | 27E8 |
| 0000055720 | 81F3 | C23E | FF00 | 75FF | 8124 | C43E | FF00 | 74FF |
| 0000055740 | C724 | C406 | FF00 | 81FF | 423E | 0005 | 7500 | C706 |
| 0000055760 | 4206 | 6405 | A100 | 0542 | 09A3 | EB05 | C70E | 3906 |
| 0000056000 | 240C | EB00 | C706 | 3906 | 250C | E900 | F303 | E7E8 |
| 0000056020 | 81F2 | C43E | FF00 | 74FF | E903 | 010B | 3E83 | 0507 |
| 0000056040 | 75FC | 8D13 | C616 | B404 | B03D | E842 | 1B42 | 0373 |
| 0000056060 | FCE9 | A300 | 0507 | 1E8B | 0507 | 42B4 | 02B0 | C933 |
| 0000056100 | D233 | 2BE8 | 731B | 3D08 | 0006 | D774 | E0E9 | 8300 |
| 0000056120 | 00FA | F375 | 003D | 7504 | 8BEE | 071E | B905 | 3000 |
| 0000056140 | 00BA | 3300 | BFF6 | 0002 | 00B0 | 5CB4 | 01E8 | 731B |
| 0000056160 | 3D0D | 0001 | 0874 | 213D | 7400 | E9ED | 00B1 | 42B4 |
| 0000056200 | 00B0 | C933 | D233 | 1E8B | 0507 | E3E8 | 8D1A | C616 |
| 0000056220 | B400 | B940 | 0400 | D7E8 | 731A | E903 | 0091 | 17E8 |
| 0000056240 | C7FC | C406 | 0000 | B800 | 00CB | 3DA2 | 8D0C | C636 |
| 0000056260 | 8B00 | 008C | 8100 | 02C6 | E300 | 8B1F | 0084 | A300 |
| 0000056300 | 0C71 | 87E8 | 35F2 | E85B | F427 | 5B35 | EEE8 | 35F4 |
| 0000056320 | 815B | 4CC6 | E200 | EBE2 | 9004 | 61EB | 8D90 | C636 |
| 0000056340 | 8B00 | 008C | 8100 | 02C6 | 8B00 | 0084 | A300 | 0C71 |

THU MAR 14 17:20:30 1991 BTRCALLS.DLL PAGE 26, LINE 1476

| | | | | | | | | |
|---|---|---|---|---|---|---|---|---|
| 0000056360 | DCE8 | 0008 | 8100 | 4CC6 | E200 | B4EE | B042 | 3300 |
| 0000056400 | 33C9 | 8BD2 | 071E | E805 | 1A66 | 2372 | 168D | 00C6 |
| 0000056420 | F28B | 84C7 | 0000 | 0000 | 40B4 | 00B9 | E804 | 1A50 |
| 0000056440 | 0D72 | 93E8 | EBFB | C716 | 3906 | 270C | EB00 | C731 |
| 0000056460 | 3906 | 260C | C700 | C406 | FF00 | EBFF | FF23 | 3936 |
| 0000056500 | 8B0C | 071E | B905 | 3000 | D233 | F633 | 02BF | B000 |
| 0000056520 | B401 | E85C | 1A1A | 06C7 | 0509 | 0000 | 068F | 0C39 |
| 0000056540 | AEE9 | E8F1 | F192 | 3E8D | 00C6 | 8D8B | 0000 | C781 |
| 0000056560 | 0002 | 71A1 | 830C | 00F9 | 0C74 | 8539 | 0000 | 0874 |
| 0000056600 | C781 | 004C | F4E2 | FF2B | 3E89 | 00C0 | 82E9 | E8F1 |
| 0000056620 | F166 | CEE8 | 00FF | 8300 | C03E | 0000 | 0374 | 04E9 |
| 0000056640 | B801 | 00FE | 0638 | 0C70 | 0375 | F8E9 | 8D00 | C63E |
| 0000056660 | 8100 | 00BD | 0C00 | 7200 | E903 | 00DA | 06C7 | 0C81 |
| 0000056700 | 0000 | 1E8B | 08C8 | 87C7 | 002C | 0000 | B4E8 | A507 |
| 0000056720 | 575C | 3E8B | 08A6 | DFE8 | 03FC | E8F8 | 0758 | 0000 |
| 0000056740 | E85F | 0805 | 0000 | 88E8 | 9F07 | B85C | 004C | A5F7 |
| 0000056760 | 0000 | C781 | 0002 | F803 | 71A1 | 890C | 0085 | 8100 |
| 0000057000 | 0CC7 | 8B00 | A636 | E808 | FCAE | F003 | C681 | 000E |
| 0000057020 | 40B9 | F300 | 8DA4 | C63E | FF00 | 0085 | E800 | F470 |
| 0000057040 | 5CA5 | 06C7 | 0A0D | FFFF | 1E89 | 08E4 | 15E8 | 8EF6 |
| 0000057060 | 8B5C | E61E | 8908 | DE1E | 8B08 | E41E | 8908 | C81E |
| 0000057100 | 8108 | 22BF | FF00 | 75FF | E805 | DA12 | 5C8E | 87FF |
| 0000057120 | 0004 | 87F7 | 0004 | 8000 | 0674 | 87C7 | 0004 | 0000 |
| 0000057140 | 878B | 0004 | 73A3 | A10C | 08EE | F2A3 | C708 | 8106 |
| 0000057160 | 000C | C700 | 8306 | FF0C | E8FF | F5C8 | 5C8E | 03E8 |
| 0000057200 | 8EDB | C75C | 2C87 | 0100 | E800 | F757 | 5C8E | 06C7 |
| 0000057220 | 0C83 | 0000 | 0FEB | 06C7 | 0C39 | 0028 | 07EB | C790 |
| 0000057240 | 3906 | 540C | E900 | F069 | 8B55 | 57EC | 0656 | 8B51 |
| 0000057260 | 0476 | 70E8 | 00D2 | 8D00 | C63E | 8104 | 0EEF | E800 |
| 0000057300 | D2B9 | 5CCA | 00B8 | EB00 | 9004 | 39A1 | 590C | 5E07 |
| 0000057320 | 5D5F | E8C3 | F022 | 0E8B | 0878 | 32E3 | 168A | 0889 |
| 0000057340 | FA80 | 7400 | 8014 | 01FA | 1E75 | 8D1E | C43E | C500 |
| 0000057360 | 7436 | F308 | 1FA4 | 16EB | 0690 | 368D | 00C4 | 3EC4 |
| 0000057400 | 0874 | A4F3 | EB07 | 9007 | 06C7 | 0C39 | 0006 | 00E9 |
| 0000057420 | 00F0 | E3E8 | 06EF | 3EC4 | 0874 | FAA1 | 8608 | 26C4 |
| 0000057440 | 0589 | C783 | 2602 | 05C7 | 0000 | C783 | B802 | 2050 |
| 0000057460 | 8826 | 0705 | DAE9 | 00EF | BDE8 | E8EF | 02D6 | 0000 |
| 0000057500 | CEE9 | 00EF | D1E9 | 00EF | ADE8 | 81EF | C43E | FF00 |
| 0000057520 | 75FF | E903 | 00F9 | 4DE8 | 8803 | E85E | EFEE | 5E76 |
| 0000057540 | 1E8B | 08C8 | 87FF | 0004 | 87F7 | 0004 | 8000 | 0674 |
| 0000057560 | 87C7 | 0004 | 0000 | 878B | 0004 | 73A3 | 830C | 06BF |
| 0000057600 | 0000 | 037F | 84E9 | 8100 | 823E | 1E08 | 7500 | E903 |
| 0000057620 | 00E4 | 1E06 | 3EC4 | 0884 | 36C5 | 0874 | 08B9 | 8000 |
| 0000057640 | 003C | 0675 | 6026 | 003D | 05EB | 75A6 | E202 | 1FF0 |
| 0000057660 | 7407 | E903 | 0089 | 9FF7 | 0006 | 10B9 | 8D00 | 253E |
| 0000057700 | 570A | 20B0 | AAF3 | 1E5F | 36C5 | 0884 | 08B9 | 8000 |
| 0000057720 | 003C | 0374 | E2A4 | 1FF8 | 368D | 0A25 | FB8B | C781 |
| 0000057740 | 002E | A6E8 | 0000 | A000 | 0889 | 8788 | 0037 | 02A8 |
| 0000057760 | 3E74 | 01B4 | 03B0 | 61E8 | 0001 | A000 | 0889 | 8788 |
| 0000060000 | 0037 | 3E83 | 0C39 | 7500 | EB4E | 8125 | 823E | 1E08 |
| 0000060020 | 7500 | B824 | 00FE | 0638 | 0C70 | 2B74 | 87F6 | 0037 |
| 0000060040 | 7402 | B409 | B003 | E801 | 0130 | 5E57 | 9FF7 | 0006 |
| 0000060060 | BEE8 | 00F0 | EB00 | C73F | 3906 | 320C | EB00 | C737 |
| 0000060100 | 3906 | 330C | EB00 | C72F | 3906 | 2E0C | EB00 | C727 |
| 0000060120 | 3906 | 290C | EB00 | C731 | 0A87 | 0000 | FF40 | 3936 |
| 0000060140 | E80C | F08D | 0000 | 54E8 | 00F1 | E800 | 0307 | 0000 |
| 0000060160 | 068F | 0C39 | 12EB | 44E8 | 00F1 | FF00 | 3936 | E80C |
| 0000060200 | 02F3 | 0000 | 068F | 0C39 | 86E9 | E8EE | EE6A | 08B9 |
| 0000060220 | 3300 | 56C0 | 0402 | E246 | 5EFB | 0588 | 0124 | 003C |

THU MAR 14 17:20:30 1991 BTRCALLS.DLL PAGE 27, LINE 1535

| | | | | | | | | |
|---|---|---|---|---|---|---|---|---|
| 0000060240 | 2575 | 048B | 03B1 | C8D3 | 4589 | 8B07 | 0244 | D8F7 |
| 0000060260 | 4589 | 8B01 | 0444 | 05B1 | C0D3 | 4589 | 8B05 | 0644 |
| 0000060300 | C8D1 | 4589 | EB03 | 8B21 | D104 | 89C8 | 0345 | 448B |
| 0000060320 | D102 | 89C0 | 0545 | 448B | F704 | 89D8 | 0145 | 448B |
| 0000060340 | B106 | D303 | 89C0 | 0745 | 26E9 | E8EE | EE0A | 5BE8 |
| 0000060360 | 52EE | 8B5F | C81E | 8308 | 06BF | 0000 | 037E | 52EB |
| 0000060400 | B990 | 0008 | 3E8D | 0A25 | B057 | F320 | 5FAA | C51E |
| 0000060420 | 7436 | B908 | 0008 | 3C80 | 7400 | A403 | F8E2 | 8D1F |
| 0000060440 | 2536 | 8D0A | 353E | E80A | FF61 | 0000 | 09B9 | 8B00 |
| 0000060460 | 81F3 | 2EC6 | F300 | 74A6 | F619 | 3787 | 0100 | 0875 |
| 0000060500 | 06C7 | 0C39 | 0033 | 0AEB | FFB8 | B0FF | A3FE | 0C39 |
| 0000060520 | 00EB | 68E8 | 00F0 | E900 | EDB7 | 9BE8 | 8BED | C81E |
| 0000060540 | C708 | E006 | 0008 | C700 | E206 | 0108 | 8B00 | 268F |
| 0000060560 | 8B00 | 2897 | C700 | A406 | FF00 | 88FF | 37A7 | E800 |
| 0000060600 | F2C2 | 5FA9 | 8788 | 0037 | 58E8 | A9F4 | FF5F | E206 |
| 0000060620 | 7308 | C70A | E206 | 0008 | FF00 | E006 | 3808 | E00E |
| 0000060640 | 7208 | 39D8 | E216 | 7208 | E9D2 | ED65 | 49E8 | 8BED |
| 0000060660 | CE0E | 8B08 | 8BFA | C81E | 8B08 | 81F3 | 2EC6 | 8A00 |
| 0000060700 | 0844 | 0124 | 003C | 1D75 | D18B | 03B1 | EAD3 | CA8B |
| 0000060720 | 00BB | 8B00 | 3100 | 4705 | 4347 | 8343 | 08FB | F37C |
| 0000060740 | EEE2 | 1DEB | BB9D | 0000 | D18B | 03B1 | EAD3 | CA8B |
| 0000060760 | 8B51 | 3100 | 4705 | E247 | 59FA | 4343 | FB83 | 7C08 |
| 0000061000 | E9EF | ED0D | F1E8 | E3EC | 2608 | 1DF7 | 4749 | E247 |
| 0000061020 | E9F8 | ECFD | E1E8 | C7EC | 8206 | 1508 | E800 | F904 |
| 0000061040 | 0000 | 06C7 | 0882 | 0001 | DB33 | 0E8B | 08A4 | 3E8B |
| 0000061060 | 08A6 | 01B8 | 0600 | 071E | 37E3 | BD80 | 000E | 7400 |
| 0000061100 | A320 | 0C71 | 958A | 000C | 1688 | 0C70 | CBBA | 8800 |
| 0000061120 | 3D16 | 8B0C | 5095 | E800 | 0025 | 0000 | 3FE8 | 6BC8 |
| 0000061140 | 4060 | C781 | 0054 | D0E2 | 07EB | 8B90 | 391E | EB0C |
| 0000061160 | 89F0 | 391E | 070C | 06C7 | 0882 | 001C | 92E9 | 52EC |
| 0000061200 | 36FF | 0C39 | 805D | 0BBD | FF00 | 1174 | A7E8 | 0002 |
| 0000061220 | 8000 | 0ABD | FF00 | 0575 | 4EE8 | 0003 | 5800 | 068F |
| 0000061240 | 0C39 | E95A | EC72 | 4FE8 | 2BEC | 8ADB | 3D1E | 810C |
| 0000061260 | CBFB | 7400 | E903 | 00B1 | C02B | 063B | 0C71 | 0375 |
| 0000061300 | A6E9 | 8100 | C43E | FF00 | 75FF | EB03 | 907A | 3E8B |
| 0000061320 | 08A6 | E3E8 | 03F7 | 80F8 | 0BBD | FF00 | 0375 | 91E9 |
| 0000061340 | E800 | 029F | 0000 | 3E81 | 0C39 | 0055 | F374 | 3E83 |
| 0000061360 | 0C39 | 7400 | EB03 | 907B | 3E81 | 0882 | 0002 | 0876 |
| 0000061400 | 3E81 | 0882 | 0005 | 0372 | 68EB | C790 | 1606 | 0005 |
| 0000061420 | 8B00 | 750E | 8B0C | 7716 | 3B0C | 068D | 7500 | 3B06 |
| 0000061440 | 0895 | 7400 | 8D4D | 7536 | E80C | 02F8 | 0672 | 16A3 |
| 0000061460 | EB05 | 903F | 02B9 | 8D00 | 7536 | 8B0C | 009D | E800 |
| 0000061500 | 0367 | 6172 | 2CEB | 8190 | 823E | 0208 | 7400 | 8123 |
| 0000061520 | 7D3E | FF0C | 74FF | C71B | 3906 | 530C | EB00 | 9013 |
| 0000061540 | 06C7 | 0C39 | 0008 | 0AEB | C790 | 3906 | 030C | EB00 |
| 0000061560 | 9001 | 9CE9 | E8EB | EB80 | 3E8B | 08A6 | 39E8 | 03F7 |
| 0000061600 | 81F8 | C43E | FF00 | 74FF | E876 | 025D | 0000 | 3E81 |
| 0000061620 | 0882 | 0002 | 6974 | 3E81 | 0882 | 0004 | 1074 | 3E81 |
| 0000061640 | 0882 | 0003 | 5975 | 3E81 | 0516 | 0000 | 5175 | 02B9 |
| 0000061660 | 8D00 | C436 | 8B08 | 009D | E800 | 02F4 | 61FF | 3E81 |
| 0000061700 | 0516 | 0000 | 1974 | 368B | 0516 | 84C7 | 0000 | 0000 |
| 0000061720 | 84C7 | 0002 | 000D | 84C7 | 0004 | 0000 | 21EB | 8B90 |
| 0000061740 | C40E | 8B08 | C616 | 3B08 | 068D | 7500 | 3B12 | 0895 |
| 0000061760 | 7500 | C70C | 0685 | 0000 | C700 | 0885 | 0000 | E900 |
| 0000062000 | EB0F | F3E8 | 81EA | C43E | FF00 | 75FF | E903 | 0123 |
| 0000062020 | 3E8B | 08A6 | A1E8 | 03F6 | 81F8 | 423E | 2C05 | 7201 |
| 0000062040 | 8116 | 06BD | 000D | 7400 | E903 | 00CC | BD81 | 0008 |
| 0000062060 | 0000 | 3C74 | C1E9 | 8100 | 423E | 6405 | 7200 | 5731 |
| 0000062100 | 3E8B | 089C | 0E8B | 089A | 71A1 | 830C | 00F9 | 0375 |

THU MAR 14 17:20:30 1991 BTRCALLS.DLL PAGE 28, LINE 1594

| | | | | | | | | |
|---|---|---|---|---|---|---|---|---|
| 0000062120 | 9CE9 | 8300 | 04BD | 0000 | 0A74 | 8539 | 0004 | 0475 |
| 0000062140 | E95F | 0094 | C781 | 0006 | E9E2 | E85F | 02F7 | 0000 |
| 0000062160 | 3E81 | 0542 | 012C | 2773 | 3E81 | 0542 | 0064 | 0373 |
| 0000062200 | A3E9 | 8B00 | 8904 | 0685 | 8B00 | 0244 | 8589 | 0008 |
| 0000062220 | 02B9 | 8B00 | 009D | E800 | 020F | 6301 | 87E9 | 8B00 |
| 0000062240 | 9C3E | 8B08 | 9A0E | E308 | E846 | 0178 | 7873 | BD83 |
| 0000062260 | 0004 | 7500 | A117 | 0C71 | 8589 | 0004 | 048B | 8589 |
| 0000062300 | 0000 | 448B | 8902 | 0285 | EB00 | 900A | C781 | 0006 |
| 0000062320 | DCE2 | 1BEB | 5790 | 02B9 | 8B00 | A63E | E808 | F5D8 |
| 0000062340 | F803 | 9D8B | 0000 | C0E8 | 1001 | 5F63 | 38EB | C790 |
| 0000062360 | 3906 | 510C | EB00 | 902F | 06C7 | 0C39 | 005D | 26EB |
| 0000062400 | C790 | 0685 | 0000 | C700 | 0885 | 0000 | EB00 | 9017 |
| 0000062420 | C75F | 0485 | 0000 | C700 | 0085 | 0000 | C700 | 0285 |
| 0000062440 | 0000 | EB00 | 9001 | 36FF | 0C39 | BCE8 | 0000 | 8F00 |
| 0000062460 | 3906 | E90C | E9DB | BFE8 | FFE9 | 8236 | A008 | 0889 |
| 0000062500 | C750 | 8206 | 1B08 | C600 | 8906 | FE08 | 16E8 | 0002 |
| 0000062520 | 5800 | 89A2 | 8F08 | 8206 | 8108 | 06BD | 0000 | 7500 |
| 0000062540 | 8108 | 08BD | 0000 | 7400 | E805 | 01F9 | 0000 | A0E9 |
| 0000062560 | E8E9 | E984 | FFBD | 8DFF | 1036 | C705 | 0244 | 0000 |
| 0000062600 | 10EB | E890 | E972 | 02BD | 8D00 | 1036 | C705 | 0244 |
| 0000062620 | 0002 | 3E8B | 08A6 | 1FE8 | 03F5 | 80F8 | 0ABD | FF00 |
| 0000062640 | 2A74 | 0E8B | 0514 | 8B51 | 8BCD | 009D | E800 | 00F9 |
| 0000062660 | 63BB | C659 | 0A85 | FF00 | 12EB | 5990 | 3E81 | 0C39 |
| 0000062700 | 0054 | 0875 | E0E2 | 06C7 | 0C39 | 0055 | 42E9 | E8E9 |
| 0000062720 | E926 | FFBD | 8DFF | 1036 | C705 | 0244 | 0000 | 3E81 |
| 0000062740 | 00C4 | FFFF | 3B74 | 10EB | E890 | E90C | 02BD | 8D00 |
| 0000062760 | 1036 | C705 | 0244 | 0002 | 3E8B | 08A6 | B9E8 | 03F4 |
| 0000063000 | 80F8 | 0ABD | 0000 | 1974 | CD8B | 9D8B | 0000 | 9FE8 |
| 0000063020 | 1B00 | C664 | 0A85 | 0000 | 07EB | C790 | 3906 | 000C |
| 0000063040 | E900 | E8ED | 5153 | 5652 | 8B57 | 8B1C | 0254 | 3E8B |
| 0000063060 | 089C | 0E8B | 089A | 71A1 | E30C | 831F | 04BD | 0000 |
| 0000063100 | 1274 | 8539 | 0004 | 0C75 | 1D3B | 0875 | 553B | 7502 |
| 0000063120 | EB03 | 900D | C781 | 0006 | E1E2 | C033 | EBF9 | 9004 |
| 0000063140 | C78B | 5FF8 | 5A5E | 5B59 | 50C3 | 5251 | 5756 | BD80 |
| 0000063160 | 000A | 74FF | 812D | 06BD | 0000 | 7500 | C725 | 0885 |
| 0000063200 | 0000 | 7500 | 8B1D | 9C36 | 8B08 | 9A0E | A108 | 0C71 |
| 0000063220 | 0CE3 | 8439 | 0004 | 0A74 | C781 | 0006 | F4E2 | EBF9 |
| 0000063240 | 9002 | 5FF8 | 5A5E | 5859 | E8C3 | E84C | 00B0 | 05EB |
| 0000063260 | 45E8 | B0E8 | 8001 | 0BBD | FF00 | 4374 | B457 | 8B5C |
| 0000063300 | 8BE9 | 8B0C | 0254 | C981 | 3000 | F633 | FD8B | FD83 |
| 0000063320 | 75FF | BE03 | 0FFF | E850 | 1096 | 5F5B | 2173 | 013D |
| 0000063340 | 7500 | C608 | 0B85 | FF00 | 15EB | C790 | 3906 | 540C |
| 0000063360 | 3D00 | 0006 | 0975 | 06C7 | 0C39 | 0002 | 01EB | E990 |
| 0000063400 | E80F | F3E8 | A1E7 | 0C7B | FF25 | 3B7F | 8806 | 740C |
| 0000063420 | 8B51 | A63E | E808 | F3A0 | F803 | 0E8B | 0C75 | 168B |
| 0000063440 | 0C77 | 8D3B | 0006 | 0675 | 953B | 0008 | 3474 | D98B |
| 0000063460 | 368B | 089C | 0E8B | 089A | 71A1 | E30C | 831F | 04BC |
| 0000063500 | 0000 | 1274 | 8439 | 0004 | 0C75 | 1C3B | 0875 | 543B |
| 0000063520 | 7502 | EB03 | 900D | C681 | 0006 | E1E2 | 06C7 | 0C39 |
| 0000063540 | 0050 | ACE9 | E8E7 | E790 | 3E8B | 08A6 | 49E8 | 03F3 |
| 0000063560 | 8BF8 | 009D | 8100 | 823E | 1B08 | 7400 | EB03 | 901B |
| 0000063600 | 89A0 | 8108 | 06BD | 0000 | 7500 | 8108 | 08BD | 0000 |
| 0000063620 | 7400 | 0A37 | 7DC0 | E916 | 00C9 | BD81 | 0006 | 0000 |
| 0000063640 | 0B75 | BD81 | 0008 | 0000 | 0375 | BCE9 | 8B00 | 81F7 |
| 0000063660 | 06C6 | B900 | 0002 | F7E8 | 69FE | C766 | 0685 | 0000 |
| 0000063700 | C700 | 0885 | 0000 | E900 | 009F | FF3C | 3874 | FE3C |
| 0000063720 | 0374 | 8EE9 | 8B00 | 9C36 | 8B08 | 9A0E | 5108 | 848B |
| 0000063740 | 0004 | 0639 | 0C71 | 0E75 | 02B9 | E800 | FEC2 | 65F6 |
| 0000063760 | 84C7 | 0004 | 0000 | 8159 | 06C6 | E200 | C7E0 | 3906 |

THU MAR 14 17:20:30 1991 BTRCALLS.DLL PAGE 29, LINE 1653

| | | | | | | | | |
|---|---|---|---|---|---|---|---|---|
| 0000064000 | 000C | EB00 | 9064 | 3E83 | 0878 | 7204 | 1E4B | C557 |
| 0000064020 | 7436 | BF08 | 0B2C | 04B9 | F300 | 5FA4 | BE1F | 0B2C |
| 0000064040 | 02B9 | E800 | FE8A | 6663 | 3E8B | 089C | 0E8B | 089A |
| 0000064060 | 858B | 0004 | 0639 | 0C71 | 1675 | 058B | 0439 | 1075 |
| 0000064100 | 458B | 3902 | 0244 | 0875 | 85C7 | 0004 | 0000 | 19EB |
| 0000064120 | C781 | 0006 | DAE2 | 0BEB | 06C7 | 0C39 | 0016 | 09EB |
| 0000064140 | EB59 | C706 | 3906 | 510C | E900 | E6A5 | 89E8 | E8E6 |
| 0000064160 | 055D | 06C6 | 0521 | C701 | 3106 | 0005 | EB00 | 9004 |
| 0000064200 | 75E8 | 81E6 | 8E3E | 7608 | 7461 | E903 | 0212 | 1E8B |
| 0000064220 | 08C8 | 0E8B | 0878 | 878B | 0016 | C82B | 22A3 | 8B05 |
| 0000064240 | 7416 | 0308 | 1697 | 8900 | 2416 | 8105 | 263E | FF05 |
| 0000064260 | 75FF | 830D | 313E | 0005 | 0374 | EAC9 | E900 | 01E6 |
| 0000064300 | C033 | 26A0 | A305 | 08E0 | 27A1 | A305 | 08E2 | 29A0 |
| 0000064320 | A205 | 0520 | E432 | D140 | 8BE0 | CE1E | 2B08 | E8D8 |
| 0000064340 | EB62 | 68A6 | 8B53 | E436 | 8B08 | CE1E | 8308 | 02EB |
| 0000064360 | FB81 | 000C | 0377 | DBE9 | 8B00 | 8110 | FFFA | 74FF |
| 0000064400 | 81EC | FFE2 | 817F | 0CFA | 7400 | E903 | 00C6 | 8B5B |
| 0000064420 | E436 | 8B08 | 8B10 | 81EA | FFE2 | 537F | 4B4B | 088B |
| 0000064440 | F981 | FFFF | F674 | 815B | FFE1 | 2B7F | 03CA | F7F2 |
| 0000064460 | 00C5 | 7480 | 8B17 | 8914 | 2616 | 8B05 | 0254 | 1689 |
| 0000064500 | 0528 | E98B | E983 | 8304 | 04C6 | 0EEB | 06C7 | 0526 |
| 0000064520 | FFFF | 06C7 | 0528 | FFFF | E98B | 3E80 | 0521 | 7500 |
| 0000064540 | 8B7D | 243E | 0105 | 240E | 0105 | 220E | 8B05 | 2216 |
| 0000064560 | 3B05 | 7816 | 7608 | 520E | 162B | 0878 | CA2B | 82A1 |
| 0000064600 | A308 | 0C3E | 065A | 068E | 0876 | 3E83 | 0533 | 7400 |
| 0000064620 | B00C | F320 | C7AA | 3306 | 0005 | EB00 | E803 | E478 |
| 0000064640 | 3B07 | 7816 | 7708 | 8124 | 263E | FF05 | 75FF | 8319 |
| 0000064660 | 313E | 0005 | 1274 | 0E8B | 0531 | 06C7 | 0531 | 0000 |
| 0000064700 | 06C7 | 0533 | 0001 | 92EB | E0E9 | C7FE | 3906 | 160C |
| 0000064720 | E900 | 00DA | C75B | 3906 | 2B0C | E900 | 00D0 | 3E8B |
| 0000064740 | 08E4 | 0E01 | 0522 | 5753 | 858B | 000A | D140 | 8BE0 |
| 0000064760 | F711 | 00C2 | 7480 | 8307 | 04EE | E281 | 7FFF | 1E8B |
| 0000065000 | 08CE | D82B | 098B | E181 | 7FFF | CA2B | CD2B | FE8B |
| 0000065020 | F503 | A4F3 | C033 | CD8B | AAF3 | 5B5F | 8D8B | 000A |
| 0000065040 | C033 | 20A0 | 4005 | C13B | 1574 | C82B | C741 | FF01 |
| 0000065060 | 4BFF | 814B | FF39 | 74FF | 2902 | E229 | EBF4 | 8B22 |
| 0000065100 | FE41 | C52B | 41C7 | 00FE | 8900 | FF01 | 0A8D | 8100 |
| 0000065120 | 0279 | FFFF | 0B75 | BD83 | 000A | 7400 | 4304 | EB43 |
| 0000065140 | 80E3 | 07BD | 0000 | 3074 | 018B | D82B | 1E3B | 052E |
| 0000065160 | 2676 | 1E8B | 08C8 | C033 | 878A | 0039 | 978B | 003A |
| 0000065200 | 0E8B | 08E0 | 8F88 | 0039 | 0E8B | 08E2 | 8F89 | 003A |
| 0000065220 | 8589 | 0006 | 9589 | 0008 | 48E8 | A6EB | E968 | FE0B |
| 0000065240 | 06C7 | 0C39 | 0035 | 0E8B | 0522 | 0E89 | 0878 | 06C6 |
| 0000065260 | 0521 | E900 | E45B | 3FE8 | 81E4 | 8E3E | 7608 | 7461 |
| 0000065300 | E903 | 02FA | 08E8 | 8B03 | 780E | 3B08 | 168F | 7300 |
| 0000065320 | E903 | 02F2 | 368B | 0874 | F103 | 894E | 2436 | 2B05 |
| 0000065340 | 168F | 8900 | 220E | C705 | 2606 | FF05 | C7FF | 2806 |
| 0000065360 | FF05 | C7FF | 2A06 | 0005 | 8300 | 0EBF | 0001 | 2875 |
| 0000065400 | 87F6 | 0038 | 7502 | B021 | 5120 | 8E06 | 7606 | FD08 |
| 0000065420 | FE8B | F341 | FCAE | 5807 | C12B | 0629 | 0522 | 31A3 |
| 0000065440 | 4705 | F78B | 3689 | 0524 | 3E83 | 0522 | 7500 | E903 |
| 0000065460 | 029A | BF81 | 0039 | FFFF | 1E74 | D233 | 978A | 0039 |
| 0000065500 | 1689 | 08E0 | 978B | 003A | 1689 | 08E2 | F5E8 | CCE8 |
| 0000065520 | 8B6B | E43E | E908 | 008D | BF81 | 000C | FFFF | 2B74 |
| 0000065540 | 978B | 000C | 1689 | 08E0 | 978B | 000E | 1689 | 08E2 |
| 0000065560 | D1E8 | CCE8 | 8B6B | E43E | 8B08 | 0895 | 8900 | 0C97 |
| 0000065600 | 8B00 | 0A95 | 8900 | 0E97 | EB00 | C729 | 1306 | FF0A |
| 0000065620 | 8BFF | 2697 | 8900 | E016 | 8B08 | 2897 | 8900 | E216 |
| 0000065640 | E808 | E8A0 | 6BCC | 3E8B | 08E4 | 87FF | 0028 | 0475 |

THU MAR 14 17:20:30 1991 BTRCALLS.DLL PAGE 30, LINE 1712

| | | | | | | | | |
|---|---|---|---|---|---|---|---|---|
| 0000065660 | 87FF | 0026 | 85C7 | 000A | 0000 | 85C7 | 0006 | FFFF |
| 0000065700 | 85C6 | 0007 | C700 | 0885 | FF00 | 8BFF | E016 | 8808 |
| 0000065720 | 3997 | 8B00 | E216 | 8908 | 3A97 | 8B00 | CE1E | 4B08 |
| 0000065740 | C74B | 0C01 | 8B00 | 0A85 | 4000 | E0D1 | 1E8B | 08CE |
| 0000065760 | D82B | CB8B | 018B | C82B | D38B | 1E8B | 08CE | 06C6 |
| 0000066000 | 0520 | 4B00 | 3B4B | 74DA | 813F | FF39 | 75FF | 8133 |
| 0000066020 | FE79 | FFFF | 2C74 | BD81 | 000A | 0100 | 0374 | D7E9 |
| 0000066040 | 5300 | 1E8B | 08CE | 06C7 | 052C | 0000 | 4B4B | DA3B |
| 0000066060 | 0C74 | 3981 | FFFF | F475 | 06FF | 052C | EEEB | E95B |
| 0000066100 | 00B6 | 06FE | 0520 | BBEB | 4949 | 85FF | 000A | 3E83 |
| 0000066120 | 052A | 7400 | 830A | 04E9 | 0405 | 8100 | 0009 | 3B80 |
| 0000066140 | 220E | 7305 | 290E | 220E | 8B05 | 4BE9 | 894B | 3319 |
| 0000066160 | EBC9 | 0316 | 2206 | 8B05 | 222E | 4B05 | 894B | 2B01 |
| 0000066200 | 220E | C705 | 2206 | 0005 | 8100 | 0ABD | 0000 | 7201 |
| 0000066220 | 8307 | 2C3E | 0105 | 0676 | 0E3B | 052E | 2073 | 368B |
| 0000066240 | 08C8 | 958B | 0006 | 9488 | 0039 | 958B | 0008 | 9489 |
| 0000066260 | 003A | 85C7 | 0006 | FFFF | 85C7 | 0008 | FFFF | CD8B |
| 0000066300 | 8B57 | 8139 | FFE7 | 037F | E43E | 4F08 | 368B | 0524 |
| 0000066320 | 0E29 | 0524 | 1EFD | 8E26 | 761E | F308 | 1FA4 | 83FC |
| 0000066340 | 2A3E | 0005 | 0E74 | 168B | 0528 | 894F | 8B15 | 2616 |
| 0000066360 | 8905 | FE55 | E95F | 009E | 8B51 | 2236 | 8305 | 2A3E |
| 0000066400 | 0005 | 0374 | C683 | 3B04 | 77F1 | 8B0C | 8BCE | C7EE |
| 0000066420 | 2206 | 0005 | EB00 | 8B10 | 83E9 | 2A3E | 0005 | 0374 |
| 0000066440 | E983 | 2904 | 220E | 8B05 | 53C8 | 4B4B | 3981 | FFFF |
| 0000066460 | F874 | 318B | E681 | 7FFF | CE2B | 8B5B | 03F0 | E436 |
| 0000066500 | 4E08 | 8B57 | 03FE | FDFD | A4F3 | 5FFC | 4B53 | 8B4B |
| 0000066520 | 8109 | FFF9 | 74FF | 81F6 | FFE1 | 5B7F | 3E83 | 052A |
| 0000066540 | 7400 | 8104 | 00C9 | 8980 | 8B09 | 0A8D | 5000 | C033 |
| 0000066560 | 20A0 | 2B05 | 58C8 | 4B53 | 814B | FF39 | 74FF | 0102 |
| 0000066600 | E229 | 5BF4 | 4B4B | 2B59 | 83CD | 2A3E | 0005 | 0374 |
| 0000066620 | ED83 | E904 | FEF3 | 168A | 08E0 | 1688 | 0526 | 168B |
| 0000066640 | 08E2 | 1689 | 0527 | 168A | 0520 | 1688 | 0529 | 32E8 |
| 0000066660 | CCE8 | FF6B | 2A06 | 8B05 | C81E | E908 | FD6A | 06C7 |
| 0000066700 | 0C39 | 0035 | 06EB | 06C7 | DC39 | 0016 | 42E9 | 8BE1 |
| 0000066720 | C81E | 8B08 | 0887 | 0B01 | 75C0 | A109 | 08CE | 36F6 |
| 0000066740 | 0530 | E432 | 2EA3 | C305 | 0DE8 | FFE1 | B236 | C708 |
| 0000066760 | B206 | FF08 | BDFF | 0000 | 3E81 | 00C4 | FFFF | 0375 |
| 0000067000 | 5FE9 | E801 | F4A0 | 6D68 | 36E8 | 68E2 | 8B6D | C81E |
| 0000067020 | C708 | 8306 | 000C | E800 | 0369 | 6D38 | FFB8 | E800 |
| 0000067040 | 0522 | 6C27 | EB48 | E8F8 | 02A4 | 6CFD | 87C7 | 0022 |
| 0000067060 | 0000 | 978B | 0014 | 884A | 8916 | 8B08 | 1697 | E800 |
| 0000067100 | DA0A | 0000 | 8F81 | 0008 | 8000 | 8788 | 0018 | 92E8 |
| 0000067120 | F2E7 | E86C | EA62 | 3E83 | 0540 | 7400 | E805 | 050A |
| 0000067140 | 6CF2 | 4EE8 | F2D2 | 8B6C | E43E | C708 | 0885 | FF00 |
| 0000067160 | C7FF | 0A85 | FF00 | E8FF | E769 | 6CF2 | 3E8B | 08E0 |
| 0000067200 | BF89 | 0000 | 3E8B | 08E2 | BF89 | 0002 | 06C7 | 0C75 |
| 0000067220 | 0000 | 06C7 | 0C77 | 0000 | 48E8 | EAB6 | 836C | 00FA |
| 0000067240 | 2475 | 36FF | 08E4 | 068F | 08D2 | 36FF | 0878 | 36FF |
| 0000067260 | 08F4 | 068F | 0878 | 1AE8 | 000B | 8F00 | 7806 | 8308 |
| 0000067300 | 393E | 000C | 2C75 | 368B | 0A19 | 3603 | 08E4 | 3E8D |
| 0000067320 | 0902 | 831E | 00FA | 0775 | 1E8E | 08F8 | 00BE | E800 |
| 0000067340 | DB0C | E81F | CEAA | 6CF2 | AEEB | 3E81 | 0C39 | 0009 |
| 0000067360 | 5F74 | 2E8B | 0C39 | 83E8 | 0000 | EB00 | 8B3F | 392E |
| 0000067400 | E80C | E778 | 0000 | 8FFF | 0014 | 8F8B | 0014 | C381 |
| 0000067420 | 0110 | 10E3 | FB8B | C381 | 001E | 85F7 | 0008 | 0010 |
| 0000067440 | F275 | F0E2 | 00B0 | FB8B | 85F7 | 0008 | 0010 | 1EB9 |
| 0000067460 | F300 | 75AA | EBF3 | 901A | 2E8B | 0C39 | B2E8 | 00E1 |
| 0000067500 | 8300 | E23E | 0008 | F475 | 3E83 | 08E0 | 7500 | EBED |
| 0000067520 | 810B | 08B7 | 0000 | E880 | E197 | 6CF2 | 2E89 | 0C39 |

THU MAR 14 17:20:30 1991 BTRCALLS.DLL PAGE 31, LINE 1771

| | | | | | | | | |
|---|---|---|---|---|---|---|---|---|
| 0000067540 | 06EB | 06C7 | 0C39 | 0029 | 36FF | 0C39 | 06E8 | 00F4 |
| 0000067560 | 8F00 | 3906 | 8F0C | B206 | E908 | DF95 | 79E8 | BDDF |
| 0000067600 | 0000 | 3E81 | 0882 | 001F | 1B74 | 3E81 | 00C4 | FFFF |
| 0000067620 | 0375 | 0CE9 | E801 | F30E | 6EBE | A4E8 | BEE0 | C76E |
| 0000067640 | 8306 | 000C | 8B00 | C81E | 8B08 | E8F3 | D89E | 0000 |
| 0000067660 | 3E81 | 0C39 | 0006 | 0874 | 87F7 | 0008 | 0080 | 0375 |
| 0000067700 | E7E9 | 8100 | 088F | 0000 | C780 | 2284 | 0000 | E800 |
| 0000067720 | E611 | 6EAD | E1E8 | 33E8 | 89D2 | E?16 | 8A08 | 18B7 |
| 0000067740 | 8900 | E016 | F808 | E45C | 6E49 | 3E8B | 08E4 | 7538 |
| 0000067760 | 7501 | 8B56 | CE0E | 3308 | D1C0 | 57E9 | ABF3 | 8B5F |
| 0000070000 | 0C84 | 8900 | 0885 | 8B00 | 0E84 | 8900 | 0A85 | 3300 |
| 0000070020 | A0C0 | 08E0 | 8589 | 0000 | 8489 | 000C | E2A1 | 8908 |
| 0000070040 | 0285 | 8900 | 0E84 | B500 | 8740 | E8F7 | E8AD | 0000 |
| 0000070060 | 3E83 | 0C39 | 7400 | 8B10 | 0884 | 8900 | 0C85 | 8B00 |
| 0000070100 | 0A84 | 8900 | 0E85 | 8700 | FFF7 | E206 | 8308 | E23E |
| 0000070120 | 0008 | 0475 | 06FF | 08E0 | E0A1 | 3808 | 2684 | 7500 |
| 0000070140 | A184 | 08E2 | 8439 | 0028 | 0374 | 78E9 | 8BFF | 148C |
| 0000070160 | 4900 | 0E2A | 0889 | 8CFF | 0014 | FB8B | 15E3 | F6E8 |
| 0000070200 | 8BD9 | 088C | 0300 | 2BCE | 8BCB | F3F3 | 8BA4 | 2BCE |
| 0000070220 | EBCF | 8B08 | 088C | 0300 | 2BCE | 33CF | F3C0 | EBAA |
| 0000070240 | C70C | 3906 | 290C | EB00 | 9015 | 06BD | 8100 | 823E |
| 0000070260 | 1F08 | 7400 | E816 | E039 | 6EBE | 2E89 | 0C39 | 36FF |
| 0000070300 | 0C39 | B0E8 | 00F2 | 8F00 | 3906 | E90C | DE43 | 27E8 |
| 0000070320 | 06DE | 87FF | 0014 | 878B | 0008 | 0C2D | 8100 | 10C3 |
| 0000070340 | C401 | 7436 | 8308 | 16BF | 0000 | 0674 | C381 | 001E |
| 0000070360 | F3EB | 2B53 | 26ED | 948B | 0000 | 894A | 1497 | 2600 |
| 0000070400 | 948B | 0002 | 9789 | 0016 | EA03 | 8B26 | 0494 | 8100 |
| 0000070420 | 7FE2 | 8103 | 80CA | 8900 | 0897 | F700 | 08C2 | 7402 |
| 0000070440 | 2609 | B48A | 000B | B788 | 001D | C2F7 | 0100 | 0874 |
| 0000070460 | 8A26 | 0AB4 | EB00 | 900B | 00B6 | C2F7 | 0004 | 0274 |
| 0000070500 | DEB6 | B788 | 001C | C2F7 | 0010 | 0A74 | C381 | 001E |
| 0000070520 | C681 | 0010 | 9FEB | 895B | 0AAF | 8300 | 08C5 | AF89 |
| 0000070540 | 000C | D22B | F5F7 | 8789 | 000E | E8D1 | 8789 | 0010 |
| 0000070560 | BF83 | 0010 | 7304 | C708 | 3906 | 1D0C | EB00 | 0700 |
| 0000070600 | 8EE9 | E8DD | DD72 | C706 | 4406 | 1800 | C700 | 4806 |
| 0000070620 | 0000 | C700 | 4006 | 0005 | 8B00 | 0887 | 3D00 | 0200 |
| 0000070640 | 0675 | 06C7 | 0044 | 0008 | C02B | 978B | 0016 | FA83 |
| 0000070660 | 7500 | 8B04 | 0E97 | 8101 | 10C3 | F701 | 0887 | 2000 |
| 0000070700 | 7400 | FF04 | 4806 | 4000 | C381 | 00?E | BF83 | 0016 |
| 0000070720 | 7500 | C4E8 | 7436 | 2608 | BC8B | 0004 | E781 | 020B |
| 0000070740 | 3E89 | 0046 | ED2B | 063B | 0044 | 0972 | 06C7 | 0C39 |
| 0000070760 | 001A | 4BE9 | 8101 | 0BE7 | 3902 | 463E | 7400 | C709 |
| 0000071000 | 3906 | 2D0C | E900 | 0138 | 8B26 | 00BC | 8300 | 00FF |
| 0000071020 | 0675 | 1BE9 | E901 | 00E8 | 8B26 | 02BC | 8300 | 00FF |
| 0000071040 | F374 | FF81 | 00FF | ED77 | EF03 | FD81 | 00FF | E577 |
| 0000071060 | 0326 | 00BC | 4F00 | FA3B | D877 | 8B26 | 04BC | F700 |
| 0000071100 | 20C7 | 7400 | F747 | 00C7 | 7501 | F709 | 04C7 | 7400 |
| 0000071120 | EB24 | 9019 | 8026 | 0ABC | 0A00 | 1974 | 8026 | 0ABC |
| 0000071140 | 0B00 | 1174 | 8026 | 0ABC | 0000 | 0974 | 06C7 | 0C39 |
| 0000071160 | 0031 | CBE9 | 8300 | 483E | 0000 | 1075 | 06FF | 0540 |
| 0000071200 | 0AEB | C790 | 3906 | 300C | E900 | 00B4 | C7F7 | 0100 |
| 0000071220 | 0975 | C7F7 | 0004 | 3F75 | 68EB | 5390 | 1E8B | 08C8 |
| 0000071240 | BF81 | 0006 | 0400 | 1E7D | BF83 | 0006 | 7D00 | 8111 |
| 0000071260 | 06BF | 0000 | 7EFC | C70F | 0687 | 0000 | EBFC | 9007 |
| 0000071300 | 87C7 | 0006 | 0400 | 265B | BC80 | 000A | 740E | 2608 |
| 0000071320 | BC80 | 000A | 730C | 2695 | 84F7 | 0002 | 0001 | 2274 |
| 0000071340 | 8026 | 0ABC | 0000 | 1A74 | 8026 | 0ABC | 0E00 | 1074 |
| 0000071360 | 8026 | 0ABC | 0500 | 0872 | 8026 | 0ABC | 0900 | 0275 |
| 0000071400 | 36EB | 8140 | 10C6 | F700 | 10C7 | 2600 | BC8B | 0004 |

THU MAR 14 17:20:30 1991 BTRCALLS.DLL PAGE 32, LINE 1830

```
0000071420  0374  D1E9  83FE  403E  0005  2474  3689  0048
0000071440  ACB8  2600  0438  1874  06C7  0C39  0030  10EB
0000071460  06C7  0C39  001B  08EB  06C7  0C39  001D  00EB
0000071500  E907  DBCD  B1E8  8BDB  C81E  8B08  148F  8100
0000071520  10C3  E301  3A0C  1887  7400  E80C  D719  EB49
0000071540  C7F2  3906  FF0C  E9FF  DBA7  8BE8  8BDB  C81E
0000071560  8108  06BF  0000  7D05  831E  06BF  0000  117D
0000071600  BF81  0006  FB00  0F7E  87C7  0006  FB00  07EB
0000071620  C790  0687  0000  8B05  2697  8900  E016  8908
0000071640  0A97  8B01  2897  8900  E216  8908  0C97  C701
0000071660  1306  FF0A  FFFF  2887  7500  FF04  2687  E800
0000071700  E082  720A  3E8B  08E4  C781  0006  368B  0048
0000071720  09B9  1E01  76A1  8E08  F3D8  1FA4  04E8  0AE2
0000071740  8B72  C83E  8108  3CC7  8B00  4836  4600  08B9
0000071760  1E00  76A1  8E08  F3D8  1FA4  3E8B  08C8  3E89
0000072000  08E4  DEE8  F2E1  E86C  E4AE  04E9  00DB  5655
0000072020  1E57  EB07  EE0D  8907  F026  8C07  8EDB  BCD0
0000072040  07EC  B9FC  0040  3E8D  0C3D  C51E  7A36  D108
0000072060  F3E9  1FA5  06C7  086C  0000  06C7  0542  0000
0000072100  3E81  0882  0064  0E72  2E81  0882  0064  0681
0000072120  0542  0064  EAEB  1E8B  0882  FB83  7627  8334
0000072140  31FB  2F74  FB83  7430  832A  423E  0005  1A75
0000072160  FB81  0037  1472  FB81  003F  0E77  2E81  0882
0000072200  0032  0681  0542  0032  CCEB  01B8  A300  0C39
0000072220  2AE9  C701  8306  000C  8B00  A40E  8308  713E
0000072240  010C  167C  0E39  0C71  107F  3E8B  08A6  07E8
0000072260  03E6  80F8  0EBD  0000  3875  FB81  0000  3274
0000072300  FB81  000E  2C74  FB81  0011  1D72  FB81  0015
0000072320  2076  FB81  0019  1A74  FB81  001A  1474  FB81
0000072340  001C  0E74  FB83  7431  C709  3906  030C  E900
0000072360  00D5  E3D1  57B8  0374  2ED8  078B  003D  7500
0000072400  E903  FF65  FF2E  0017  8300  6C3E  0008  0674
0000072420  6CA1  A308  0C39  82A1  3D08  000D  1A76  153D
0000072440  7700  E903  0097  163D  7400  3D3B  0021  0873
0000072460  193D  7200  E903  0085  3E83  0C39  7400  8110
0000072500  393E  160C  7400  8108  393E  360C  7500  8117
0000072520  423E  3205  7500  0503  0032  3EA3  A10C  00C4
0000072540  7DA3  EB0C  9047  3E81  0C39  0054  0874  3E81
0000072560  0C39  0055  4775  3E81  0542  0064  1874  3E81
0000072600  0542  012C  1074  3E81  0509  0064  0874  3E81
0000072620  0509  012C  2775  82A1  0308  4206  A305  0882
0000072640  006A  016A  F89A  000A  E900  FE76  40B9  8D00
0000072660  3D36  060C  3EC4  087A  E9D1  A5F3  A107  0882
0000072700  0603  0542  82A3  EB08  0707  D08E  268B  07F0
0000072720  5E5F  A15D  0C39  8CC3  EE16  8907  F026  8C07
0000072740  8ED8  BCD0  07EC  3E83  0890  7400  E810  8C10
0000072760  39A3  090C  75C0  C70C  9006  0008  E800  FE0E
0000073000  39A3  E90C  0127  4545  4144  4545  4144  4545
0000073020  4144  4545  4144  4545  4144  4545  4144  4545
*
0000073120  4144  4545  4144  0145  9E2B  BA28  5E25  6232
0000073140  AE17  B219  B21C  AE1C  AE19  AE19  AE19  9919
0000073160  A11B  3C1B  560F  B230  0A18  C859  CE58  0E59
0000073200  245A  7759  2C25  E322  3822  125D  655D  1465
0000073220  486D  485D  E85D  7C6B  C96D  DC24  E324  B222
0000073240  B21C  E31C  E322  0022  0000  0000  0000  0000
0000073260  0000  0000  0000  EB00  D35E  C85C  0006  5700
0000073300  C756  FA46  0000  57E8  899A  FE46  59E8  899A
0000073320  FC46  468B  A31A  0882  468B  8B16  1856  2605
```

THU MAR 14 17:20:30 1991 BTRCALLS.DLL PAGE 33, LINE 1889

| | | | | | | | | |
|---|---|---|---|---|---|---|---|---|
| 0000073340 | A300 | 087A | 1689 | 087C | 468B | 8B16 | 1856 | 7EA3 |
| 0000073360 | 8908 | 8016 | 8B08 | 1246 | 568B | A314 | 0874 | 1689 |
| 0000073400 | 0876 | 5EC4 | 260E | 078B | 78A3 | 8B08 | 0A46 | 568B |
| 0000073420 | A30C | 0884 | 1689 | 0886 | 468A | A208 | 0888 | 468A |
| 0000073440 | A206 | 0889 | 06C7 | 088E | 6176 | AAE9 | 8BFE | EE1E |
| 0000073460 | 8E07 | 8BD3 | F026 | 8907 | FA46 | 10EB | 0890 | 0000 |
| 0000073500 | 7E83 | 00FA | 0374 | 06E9 | E800 | FCC2 | 4689 | C4FA |
| 0000073520 | 0E5E | 78A1 | 2608 | 0789 | 76FF | FFFC | FE76 | CFE8 |
| 0000073540 | 8399 | 04C4 | 468B | E9FA | 0000 | 5F5E | CAC9 | 0016 |
| 0000073560 | 5106 | 9CF8 | 8F36 | 6A06 | 8008 | 68FC | 0876 | C636 |
| 0000073600 | 0006 | 0008 | 2DEB | 3353 | 8ADB | 36DC | 9F8A | 0801 |
| 0000073620 | 8836 | 001E | F608 | 01C3 | 745B | 8318 | FBFB | 1372 |
| 0000073640 | F636 | 0006 | 0208 | 0374 | 70EB | E890 | 0095 | 0373 |
| 0000073660 | 68EB | 3690 | 06F6 | 0800 | 7404 | 8014 | 0DFC | 0575 |
| 0000073700 | 8B36 | 6E1E | 5008 | 68B4 | 59E8 | 5800 | 4CEB | 5090 |
| 0000073720 | 51E8 | 9C00 | 8F36 | 6A06 | 7308 | 3D3E | 0004 | 3575 |
| 0000073740 | 061E | B850 | FFFF | D88E | C08E | 0BE8 | E899 | 912A |
| 0000073760 | 13E8 | 9C99 | 8F36 | 6A06 | 7208 | 5813 | 1F07 | 5058 |
| 0000074000 | 21E8 | 9C00 | 8F36 | 6A06 | 7308 | EB0E | 9008 | 0759 |
| 0000074020 | 591F | 06EB | 5990 | 02EB | 5990 | FF36 | 6A36 | 9D08 |
| 0000074040 | 0759 | 90C3 | 1E06 | 5756 | 5152 | 5053 | 76E8 | F893 |
| 0000074060 | 003D | 7400 | F905 | EB5B | 9002 | 5B58 | 5A59 | 5E5F |
| 0000074100 | 071F | 83C3 | FDFB | 0F74 | FB83 | 74FF | F90A | 369C |
| 0000074120 | 068F | 086A | 80E9 | 1E00 | 5006 | E4B8 | 8E75 | 8ED8 |
| 0000074140 | 50C0 | 5752 | 8B56 | C816 | 8B08 | A63E | E808 | E248 |
| 0000074160 | F803 | F78B | FB83 | 75FD | 810B | 98C2 | 8100 | 04C7 |
| 0000074200 | EB00 | 900B | D78B | C281 | 000E | C781 | 0000 | 3DB4 |
| 0000074220 | 42B0 | 8FE8 | 9CFF | 8F36 | 6A06 | 7308 | 3D25 | 0004 |
| 0000074240 | 2E75 | 53E8 | E898 | 9072 | 5BE8 | 9C98 | 8F36 | 6A06 |
| 0000074260 | 7208 | B416 | B03D | E842 | FF6A | 369C | 068F | 086A |
| 0000074300 | 0772 | 0589 | D88B | 08EB | 3690 | 06C7 | 086C | 0057 |
| 0000074320 | 5F5E | 585A | 0758 | C31F | 1DE8 | 33D6 | E8D2 | 004F |
| 0000074340 | 8926 | 831D | 02C2 | D303 | 3B36 | F416 | 7708 | 832F |
| 0000074360 | 02C7 | 8B51 | E8CB | D520 | 2B59 | E3CB | E82A | 0058 |
| 0000074400 | C283 | 3603 | 163B | 08F4 | 1477 | 8926 | 8A1D | 2604 |
| 0000074420 | 4588 | 8302 | C3C7 | F303 | CB2B | 0BE3 | BFEB | C736 |
| 0000074440 | 3906 | 3A0C | EB00 | 3605 | 1689 | 0878 | E2E9 | 33D5 |
| 0000074460 | 8ADB | 3A00 | 0140 | 0F75 | 403A | 7502 | 3A0A | 0340 |
| 0000074500 | 0575 | 403A | 7404 | 4305 | D93B | E572 | C18B | C32B |
| 0000074520 | 053D | 7300 | 8B02 | C3D9 | D98B | 5157 | 048A | FE8B |
| 0000074540 | 1E06 | F307 | 07AE | 0275 | 01E3 | 2B4B | 59D9 | C35F |
| 0000074560 | 85E8 | 33D5 | 8BD2 | 8BD9 | 4B0C | 2B4B | 03D9 | 46D1 |
| 0000074600 | 3646 | 163B | 0878 | 2577 | 8DE8 | 83D4 | 00FB | 3B74 |
| 0000074620 | 0C8B | 448A | 8302 | 03C6 | EB83 | 0303 | 36D1 | 163B |
| 0000074640 | 0878 | 1577 | AAF3 | FB83 | 7500 | EBCC | 361E | 162B |
| 0000074660 | 0878 | CA2B | 61E8 | EBD4 | 3609 | 162B | 0878 | CA2B |
| 0000074700 | AAF3 | C736 | 3906 | 3A0C | EB00 | 3605 | 1689 | 0878 |
| 0000074720 | 3EE9 | E8D5 | D522 | 36FF | 0874 | 36FF | 0876 | 36FF |
| 0000074740 | 0878 | 368B | 08D2 | 3603 | 0A19 | 048B | 26A3 | 8B05 |
| 0000074760 | 0244 | 28A3 | A105 | 08F4 | 78A3 | A108 | 08F6 | 76A3 |
| 0000075000 | 3308 | A3C0 | 0874 | 77E8 | 00EE | 8B00 | 780E | 8F08 |
| 0000075020 | 7806 | 8F08 | 7606 | 8F08 | 7406 | 8308 | 393E | 000C |
| 0000075040 | 2675 | 36FF | 0878 | 061E | F4A1 | A308 | 0878 | FF33 |
| 0000075060 | 168B | 08F8 | F6A1 | 3308 | 8EF6 | 8EC2 | E8D8 | FF30 |
| 0000075100 | 0000 | 1F07 | 068F | 0878 | C6E9 | E8D4 | D4AA | BF80 |
| 0000075120 | 0038 | 7400 | 8B06 | 780E | EB08 | 8B04 | 0E8F | FF01 |
| 0000075140 | 7836 | 1E08 | 8E06 | F606 | 3308 | C5FF | 7436 | E808 |
| 0000075160 | FE66 | 0000 | 1F07 | 3E83 | 0C39 | 7500 | FF23 | 7436 |
| 0000075200 | FF08 | 7636 | C708 | 7406 | 0008 | FF00 | F636 | 8F08 |

```
THU MAR 14 17:20:30 1991  BTRCALLS.DLL  PAGE 34, LINE 1948

0000075220  7606  E808  F020  0000  068F  0876  068F  0874
0000075240  068F  0878  3E83  0C39  7400  EB02  8B17  D23E
0000075260  0308  193E  A10A  0526  0589  28A1  8905  0245
0000075300  45C6  0104  4AE9  15D4  0200  9400  0246  8000
0000075320  0200  5B00  0276  0000  0308  F301  010D  8900
0000075340  0300  1B01  010E  8A00  0300  1701  0100  9800
0000075360  0300  A501  0173  2000  0300  9201  0104  2200
0000075400  0300  DA01  0103  2600  0300  0301  010B  3800
0000075420  0300  D701  010B  3900  0300  4401  010E  3A00
0000075440  0300  D101  010D  3B00  0300  A701  010B  3C00
0000075460  0300  6401  010E  3D00  0300  D801  010E  3E00
0000075500  0200  2A00  020F  4000  0300  A601  010D  4600
0000075520  0300  2801  010C  4700  0300  3D01  010C  4800
0000075540  0300  5301  010C  4E00  0300  6101  010C  5600
0000075560  0000  0000  0000  0000  0000  0000  0000  0000
*
0000076000  5442  5052  5241  534D  2F00  3A6D  3233  2F20
0000076020  3A62  3631  2F20  3A66  3032  2F20  3A6C  3032
0000076040  2F20  3A63  2020  2020  2020  2020  2020  2020
0000076060  2020  2020  2020  2020  2020  0020  0000  0000
0000076100  0000  0000  0000  0000  0000  0000  0000  0000
*
0000100420  0000  0000  0014  0000  0000  0000  0000  0000
0000100440  0000  0000  0000  0000  0000  0000  0000  0000
0000100460  0014  0000  0000  0000  0000  0000  0000  0000
0000100500  0000  0000  5353  5353  5353  5353  5353  5353
0000100520  5353  5353  5353  5353  5353  5353  5353  5353
*
0000101740  5353  5353  5353  5353  5353  5353  0000  0000
0000101760  0000  0000  0000  0000  0000  0000  0000  0000
0000102000  0000  0000  0000  0000  0000  0000  0000  0004
0000102020  0000  0000  0000  0000  0000  0000  0000  0000
*
0000102060  0000  0000  0000  0000  0000  0000  0000  0300
0000102100  0101  0100  0000  0005  0000  0000  0000  0000
0000102120  0000  0000  0000  0000  0000  0000  0100  0000
0000102140  0000  0000  0000  0000  0500  0000  0000  0000
0000102160  0000  0000  0000  0000  0000  0000  0000  0000
*
0000102220  0001  0000  0000  0000  0000  0014  0000  0000
0000102240  0200  0000  0014  0000  0000  0001  8000  0000
0000102260  0000  0000  0000  0000  0000  0000  0000  0000
0000102300  0001  0001  0000  0000  0000  0000  0000  0000
0000102320  0000  0000  0000  0000  0000  0000  0000  0000
0000102340  0000  0000  0000  0000  0000  0000  0000  4000
0000102360  0000  0000  0000  0000  0000  0500  0000  0000
0000102400  0000  0000  0000  0000  0000  0000  0000  0000
*
0000104620  0000  0000  0000  0001  0303  0303  0303  0303
0000104640  0003  0000  0000  0000  0000  0303  0000  0000
0000104660  0000  0000  0303  0703  0707  0007
0000104673
```

THU MAR 14 17:21:24 1991 CLIENT.EXE PAGE 1, LINE 1

| | | | | | | | | |
|---|---|---|---|---|---|---|---|---|
| 0000000000 | 5A4D | 01E1 | 009D | 0000 | 0004 | 0000 | FFFF | 0000 |
| 0000000020 | 00B6 | 0000 | 0000 | 0000 | 0040 | 0000 | 0000 | 0000 |
| 0000000040 | 0000 | 0000 | 0000 | 0000 | 0000 | 0000 | 0000 | 0000 |
| 0000000060 | 0000 | 0000 | 0000 | 0000 | 0000 | 0000 | 0080 | 0000 |
| 0000000100 | 1F0E | 0EBA | B400 | CD09 | B821 | 4C01 | 21CD | 6854 |
| 0000000120 | 7369 | 7020 | 6F72 | 7267 | 6D61 | 6320 | 6E61 | 6F6E |
| 0000000140 | 2074 | 7572 | 206E | 6E69 | 4420 | 534F | 6D20 | 646F |
| 0000000160 | 2E65 | 0D0D | 240A | 0000 | 0000 | 0000 | 0000 | 0000 |
| 0000000200 | 454E | 0A05 | 008E | 0002 | BF7A | 0072 | 0202 | 0006 |
| 0000000220 | 0000 | 4000 | 7860 | 0001 | 0000 | 0006 | 0006 | 0002 |
| 0000000240 | 001A | 0040 | 0070 | 0070 | 007A | 007E | 0110 | 0000 |
| 0000000260 | 0000 | 0004 | 0000 | 0001 | 0000 | 0000 | 0000 | 0000 |
| 0000000300 | 0013 | FAF9 | 0D00 | FAFA | 1091 | 00C6 | 0C01 | 0100 |
| 0000000320 | 0000 | 0000 | 0C01 | 0850 | 109E | 007D | 0C01 | 029E |
| 0000000340 | 0000 | 0000 | 0C01 | 0200 | 10A6 | 2F5F | 0D01 | 3070 |
| 0000000360 | 4306 | 696C | 6E65 | 0074 | 0000 | 0001 | 000A | 0800 |
| 0000000400 | 4F44 | 4353 | 4C41 | 534C | 4405 | 5F42 | 4950 | 0000 |
| 0000000420 | 4416 | 2042 | 6C43 | 6569 | 746E | 5420 | 7365 | 2074 |
| 0000000440 | 7270 | 676F | 6172 | 006D | 0000 | 0000 | 0000 | 0000 |
| 0000000460 | 581E | 4590 | 8B55 | 1EEC | D88E | EC81 | 000E | 5657 |
| 0000000500 | 468D | 16F2 | 1E50 | 4268 | 9A00 | 79E2 | FFFF | C483 |
| 0000000520 | 8B08 | F446 | 460B | 74F2 | E903 | 0009 | 463B | 8BF2 |
| 0000000540 | F456 | 51E9 | C700 | F646 | 0000 | 46C7 | 00F8 | 83FF |
| 0000000560 | 067E | 7500 | E903 | 0035 | 468B | 8BF6 | F856 | 4623 |
| 0000000600 | 23F2 | F456 | D00B | 0374 | 22E9 | 8B00 | 0646 | FF25 |
| 0000000620 | 99FF | E08A | C02A | 46C7 | 00FA | 8900 | FC46 | 468B |
| 0000000640 | 8BFA | FC56 | 460B | 0BF2 | F456 | 09E9 | 8B00 | F246 |
| 0000000660 | 568B | E9F4 | 0000 | 5F5E | ED83 | 8B02 | 1FE5 | 4D5D |
| 0000000700 | 1ECB | 9058 | 5545 | EC8B | 8E1E | 81D8 | 0CEC | 5700 |
| 0000000720 | 8D56 | F446 | 5016 | 681E | 0092 | E29A | 1879 | 8301 |
| 0000000740 | 08C4 | 468A | 98F4 | 8CE9 | C400 | 065E | C726 | 0007 |
| 0000000760 | E900 | 00CC | 5EC4 | 2606 | 07C7 | 0002 | C1E9 | 8000 |
| 0000001000 | F57E | 7572 | E903 | 0009 | 7E80 | 52F5 | 0374 | 0BE9 |
| 0000001020 | C400 | 065E | C726 | 0107 | E900 | 0031 | 7E80 | 77F5 |
| 0000001040 | 0375 | 09E9 | 8000 | F57E | 7457 | E903 | 000B | 5EC4 |
| 0000001060 | 2606 | 07C7 | 0003 | 14E9 | C400 | 065E | C726 | 0207 |
| 0000001100 | 1E00 | 0668 | 9A01 | 7994 | 013A | C483 | E904 | 0070 |
| 0000001120 | 5EC4 | 2606 | 07C7 | 0004 | 65E9 | C400 | 065E | C726 |
| 0000001140 | 0207 | 1E00 | 0668 | 9A01 | 7994 | 001C | C483 | E904 |
| 0000001160 | 004E | 4BE9 | 3D00 | 0057 | 0375 | 77E9 | 7EFF | E903 |
| 0000001200 | 001B | 412D | 7500 | E903 | FFC6 | 042D | 7500 | E903 |
| 0000001220 | FF6D | 0D2D | 7500 | E903 | FF4F | BEE9 | 2DFF | 0061 |
| 0000001240 | 0375 | ABE9 | 2DFF | 0004 | 0375 | 52E9 | 2DFF | 000D |
| 0000001260 | 0375 | 34E9 | 2DFF | 0005 | 0375 | 37E9 | E9FF | FF9B |
| 0000001300 | 5F5E | ED83 | 8B02 | 1FE5 | 4D5D | 1ECB | 9058 | 5545 |
| 0000001320 | EC8B | 8E1E | 81D8 | 36EC | 5701 | C456 | 065E | 8A26 |
| 0000001340 | 0147 | E998 | 033A | 681E | 0123 | 949A | D479 | 8301 |
| 0000001360 | 04C4 | 868D | FECA | 5016 | 468D | 16CE | 1E50 | AE68 |
| 0000001400 | 9A00 | 79E2 | 01EA | C483 | 830C | 483E | 0100 | 0374 |
| 0000001420 | 1FE9 | 1E00 | 4968 | 9A01 | 7994 | 01FA | C483 | 1E04 |
| 0000001440 | 4B68 | 1E01 | A868 | 9A23 | 793A | 0250 | C483 | E908 |
| 0000001460 | 0000 | BE80 | FECA | 7430 | E903 | 0009 | 00B8 | BA00 |
| 0000001500 | 0000 | 18E9 | 8000 | CABE | 31FE | 0374 | 08E9 | B800 |
| 0000001520 | 014D | DA8C | 06E9 | 8D00 | CA86 | 8CFE | 89D2 | FA46 |
| 0000001540 | 5689 | 8DFC | CE46 | 5016 | 76FF | FFFC | FA76 | FF9A |
| 0000001560 | 00FF | 8900 | F446 | 76FF | 1EF4 | 4E68 | 9A01 | 7994 |
| 0000001600 | 025F | C483 | E906 | 0307 | 681E | 004A | 949A | 7079 |
| 0000001620 | 8302 | 04C4 | 468D | 16CE | 1E50 | 9268 | 9A00 | 79E2 |
| 0000001640 | 0286 | C483 | 8308 | 483E | 0100 | 0374 | 1FE9 | 1E00 |

THU MAR 14 17:21:24 1991 CLIENT.EXE PAGE 2, LINE 60

| | | | | | | | | |
|---|---|---|---|---|---|---|---|---|
| 0000001660 | 6368 | 9A01 | 7994 | 0296 | C483 | 1E04 | 6568 | 1E01 |
| 0000001700 | A868 | 9A23 | 793A | 02B5 | C483 | E908 | 0000 | 468D |
| 0000001720 | 16CE | 9A50 | FFFF | 0000 | 4689 | FFF4 | F476 | 681E |
| 0000001740 | 0167 | 949A | C479 | 8302 | 06C4 | A2E9 | 1E02 | 4A68 |
| 0000001760 | 9A00 | 7994 | 02D5 | C483 | 8D04 | CE46 | 5016 | 681E |
| 0000002000 | 0092 | E29A | EB79 | 8302 | 08C4 | 3E83 | 0048 | 7401 |
| 0000002020 | E903 | 001F | 681E | 017C | 949A | FB79 | 8302 | 04C4 |
| 0000002040 | 681E | 017E | 681E | 23A8 | 3A9A | 1A79 | 8303 | 08C4 |
| 0000002060 | 00E9 | 8D00 | CE46 | 5016 | FF9A | 00FF | 8900 | F446 |
| 0000002100 | 76FF | 1EF4 | 8068 | 9A01 | 7994 | 00AD | C483 | E906 |
| 0000002120 | 023D | 681E | 004A | 949A | 3A79 | 8303 | 04C4 | 468D |
| 0000002140 | 16CE | 1E50 | 9268 | 9A00 | 79E2 | 0350 | C483 | 8308 |
| 0000002160 | 483E | 0100 | 0374 | 1FE9 | 1E00 | 9368 | 9A01 | 7994 |
| 0000002200 | 0360 | C483 | 1E04 | 9568 | 1E01 | A868 | 9A23 | 793A |
| 0000002220 | 037F | C483 | E908 | 0000 | 468D | 16CE | 9A50 | FFFF |
| 0000002240 | 0000 | 4689 | FFF4 | F476 | 681E | 0197 | 949A | 8E79 |
| 0000002260 | 8303 | 06C4 | D8E9 | 1E01 | AC68 | 9A01 | 7994 | 03A0 |
| 0000002300 | C483 | 8D04 | CA86 | 16FE | 1E50 | 9268 | 9A00 | 79E2 |
| 0000002320 | 03AA | C483 | 6A08 | 9A00 | 0000 | 03C6 | C483 | 8902 |
| 0000002340 | F046 | 5689 | 83F2 | 483E | 0100 | 0374 | 1FE9 | 1E00 |
| 0000002360 | CF68 | 9A01 | 7994 | 03D6 | C483 | 1E04 | D168 | 1E01 |
| 0000002400 | A868 | 9A23 | 793A | 042D | C483 | E908 | 0000 | BE80 |
| 0000002420 | FECA | 7430 | E903 | 0009 | 00B8 | BA00 | 0000 | 18E9 |
| 0000002440 | 8000 | CABE | 31FE | 0374 | 08E9 | B800 | 01D3 | DA8C |
| 0000002460 | 06E9 | 8D00 | CA86 | 8CFE | 89D2 | FA46 | 5689 | FFFC |
| 0000002500 | FC76 | 76FF | FFFA | F276 | 76FF | 9AF0 | FFFF | 0000 |
| 0000002520 | 4689 | FFF4 | F476 | 681E | 01D4 | 949A | 3C79 | 8304 |
| 0000002540 | 06C4 | 2AE9 | 1E01 | F068 | 9A01 | 7994 | 044D | C483 |
| 0000002560 | 8D04 | CA46 | 5016 | 681E | 021B | E29A | 6379 | 8304 |
| 0000002600 | 08C4 | 3E83 | 0048 | 7401 | E903 | 001F | 681E | 021E |
| 0000002620 | 949A | 7379 | 8304 | 04C4 | 681E | 0220 | 681E | 23A8 |
| 0000002640 | 3A9A | 9A79 | 8304 | 08C4 | 00E9 | FF00 | CA76 | 468D |
| 0000002660 | 16CC | 8D50 | F646 | 5016 | FF9A | 00FF | 8900 | F446 |
| 0000002700 | 76FF | 1EF4 | 2268 | 9A02 | 7994 | 04CA | C483 | C706 |
| 0000002720 | EE46 | 0000 | 03E9 | FF00 | EE46 | 468B | 39CC | EE46 |
| 0000002740 | 0372 | 1DE9 | 8B00 | EE46 | E0C1 | 0305 | F646 | 568B |
| 0000002760 | 52F8 | 1E50 | 3668 | 9A02 | 7994 | 04D9 | C483 | E908 |
| 0000003000 | FFD5 | 681E | 009E | 949A | E579 | 8304 | 04C4 | 681E |
| 0000003020 | 009E | 949A | BD79 | 8301 | 04C4 | 72E9 | E900 | 006F |
| 0000003040 | 563D | 7500 | E903 | FF3D | 037E | 2AE9 | 2D00 | 0041 |
| 0000003060 | 0375 | B1E9 | 2DFC | 0003 | 0375 | 4BE9 | 2DFD | 0008 |
| 0000003100 | 0375 | A8E9 | 2DFD | 0007 | 0375 | 6AE9 | 48FE | 7548 |
| 0000003120 | E903 | FDFE | 38E9 | 3D00 | 006C | 0375 | 8EE9 | 7EFD |
| 0000003140 | E903 | 0013 | 612D | 7500 | E903 | FC7A | 032D | 7500 |
| 0000003160 | E903 | FD14 | 18E9 | 2D00 | 0073 | 0375 | 38E9 | 48FE |
| 0000003200 | 7548 | E903 | FDCC | 7548 | E903 | FED9 | 00E9 | 5E00 |
| 0000003220 | 835F | 02ED | E58B | 5D1F | CB4D | 581E | 4590 | 8B55 |
| 0000003240 | 1EEC | D88E | EC81 | 000E | 5657 | 76FF | FF0C | 0A76 |
| 0000003260 | 76FF | FF08 | 0676 | 681E | 023C | 949A | E379 | 8305 |
| 0000003300 | 0CC4 | 7E83 | 000E | 0374 | 06E9 | B800 | 0000 | 21E9 |
| 0000003320 | 6A01 | 6A00 | FF00 | 0C76 | 76FF | 8D0A | FC46 | 5016 |
| 0000003340 | 468D | 16F4 | 9A50 | FFFF | 0000 | 4689 | 83FA | FA7E |
| 0000003360 | 7500 | E903 | 0028 | 7E81 | BCFA | 7401 | E903 | 0009 |
| 0000003400 | 00B8 | E900 | 00EC | 15E9 | FF00 | FA76 | 681E | 024C |
| 0000003420 | 949A | FB79 | 8305 | 06C4 | 468B | E9FA | 00D4 | 681E |
| 0000003440 | 0268 | 76FF | FF12 | 1076 | 5C9A | 237B | 8306 | 08C4 |
| 0000003460 | 46C7 | 00F8 | E900 | 0003 | 46FF | 8BF8 | F846 | 4639 |
| 0000003500 | 77FC | E903 | 007B | 76FF | FF12 | 1076 | 681E | 0092 |
| 0000003520 | 949A | 3D79 | 8306 | 08C4 | 468B | 2BFC | F846 | 7448 |

THU MAR 14 17:21:24 1991 CLIENT.EXE PAGE 3, LINE 119

| | | | | | | | | |
|---|---|---|---|---|---|---|---|---|
| 0000003540 | E903 | 0018 | 76FF | FF12 | 1076 | D89A | 777B | 8306 |
| 0000003560 | 04C4 | F08B | 5EC4 | 2610 | 40C6 | 20FF | 76FF | FF12 |
| 0000003600 | 1076 | 468B | 480E | 6B50 | F85E | C424 | F476 | FF26 |
| 0000003620 | 0270 | FF26 | 6B30 | F846 | 0324 | F446 | 568B | 05F6 |
| 0000003640 | 0004 | 5052 | 6A9A | 9A05 | 8306 | 0EC4 | 4689 | 83FA |
| 0000003660 | FA7E | 7500 | E903 | 0006 | 468B | E9FA | 0034 | 77E9 |
| 0000003700 | FFFF | 1276 | 76FF | 9A10 | 7BD8 | 0329 | C483 | 8B04 |
| 0000003720 | C4F0 | 105E | C626 | FC40 | FF00 | F676 | 76FF | 9AF4 |
| 0000003740 | FFFF | 0000 | C02B | 4689 | 89F6 | F446 | 00B8 | E900 |
| 0000003760 | 0000 | 5F5E | ED83 | 8B02 | 1FE5 | 4D5D | 1ECB | 9058 |
| 0000004000 | 5545 | EC8B | 8E1E | 81D8 | 5EEC | 5704 | 2B56 | 89C0 |
| 0000004020 | F246 | 4689 | C4F0 | 065E | 8A26 | 0147 | E998 | 1042 |
| 0000004040 | 5EC4 | 2606 | 7F80 | 6302 | 0374 | 22E9 | 1E01 | 6D68 |
| 0000004060 | 9A02 | 7994 | 0716 | C483 | 8D04 | A286 | 16FC | 1E50 |
| 0000004100 | 9268 | 9A00 | 79E2 | 0720 | C483 | 6A08 | 9A00 | 0000 |
| 0000004120 | 0744 | C483 | 8902 | EA46 | 5689 | 8DEC | A286 | 16FD |
| 0000004140 | 8D50 | AA86 | 16FE | 8D50 | AC86 | 16FE | 1E50 | B468 |
| 0000004160 | 9A00 | 79E2 | 075A | C483 | 8310 | 483E | 0100 | 0374 |
| 0000004200 | 1FE9 | 1E00 | 9B68 | 9A02 | 7994 | 076A | C483 | 1E04 |
| 0000004220 | 9D68 | 1E02 | A868 | 9A23 | 793A | 0817 | C483 | E908 |
| 0000004240 | 0000 | BE80 | FCA2 | 7430 | E903 | 0009 | 00B8 | BA00 |
| 0000004260 | 0000 | 18E9 | 8000 | A2BE | 31FC | 0374 | 08E9 | B800 |
| 0000004300 | 029F | DA8C | 06E9 | 8D00 | A286 | 8CFC | 89D2 | A286 |
| 0000004320 | 89FE | A496 | 80FE | A2BE | 30FD | 0374 | 09E9 | B800 |
| 0000004340 | 0000 | 00BA | E900 | 0018 | BE80 | FDA2 | 7431 | E903 |
| 0000004360 | 0008 | A0B8 | 8C02 | E9DA | 0006 | 868D | FDA2 | D28C |
| 0000004400 | 4689 | 89F4 | F656 | B6FF | FEA4 | B6FF | FEA2 | 76FF |
| 0000004420 | FFEC | EA76 | 868D | FEAC | 5016 | B6FF | FEAA | 76FF |
| 0000004440 | FFF6 | F476 | 468D | 16DE | 9A50 | FFFF | 0000 | 4689 |
| 0000004460 | FFE8 | E076 | 76FF | FFDE | E076 | 76FF | FFDE | E876 |
| 0000004500 | 681E | 02A1 | 949A | 2679 | 8308 | 0EC4 | F1E9 | 1E00 |
| 0000004520 | D068 | 9A02 | 7994 | 0844 | C483 | 8D04 | A286 | 16FD |
| 0000004540 | 8D50 | AA86 | 16FE | 8D50 | A286 | 16FC | 1E50 | B468 |
| 0000004560 | 9A00 | 79E2 | 085A | C483 | 8310 | 483E | 0100 | 0374 |
| 0000004600 | 1FE9 | 1E00 | F068 | 9A02 | 7994 | 086A | C483 | 1E04 |
| 0000004620 | F268 | 1E02 | A868 | 9A23 | 793A | 090B | C483 | E908 |
| 0000004640 | 0000 | BE80 | FCA2 | 7430 | E903 | 0009 | 00B8 | BA00 |
| 0000004660 | 0000 | 18E9 | 8000 | A2BE | 31FC | 0374 | 08E9 | B800 |
| 0000004700 | 02F4 | DA8C | 06E9 | 8D00 | A286 | 8CFC | 89D2 | A286 |
| 0000004720 | 89FE | A496 | 80FE | A2BE | 30FD | 0374 | 09E9 | B800 |
| 0000004740 | 0000 | 00BA | E900 | 0018 | BE80 | FDA2 | 7431 | E903 |
| 0000004760 | 0008 | F5B8 | 8C02 | E9DA | 0006 | 868D | FDA2 | D28C |
| 0000005000 | 4689 | 89F4 | F656 | B6FF | FEA4 | B6FF | FEA2 | B6FF |
| 0000005020 | FEAA | 76FF | FFF6 | F476 | 468D | 16DE | 9A50 | FFFF |
| 0000005040 | 0000 | 4689 | FFE8 | E076 | 76FF | FFDE | E076 | 76FF |
| 0000005060 | FFDE | E876 | 681E | 02F6 | 949A | 1A79 | 8309 | 0EC4 |
| 0000005100 | 9EE9 | 1E0E | 7868 | 9A00 | 7994 | 092C | C483 | 8D04 |
| 0000005120 | A286 | 16FC | 1E50 | 9268 | 9A00 | 79E2 | 0936 | C483 |
| 0000005140 | 6A08 | 9A00 | 0000 | 094E | C483 | 8902 | DE46 | 5689 |
| 0000005160 | 8DE0 | CC86 | 16FE | 1E50 | 9668 | 9A00 | 79E2 | 0964 |
| 0000005200 | C483 | 8308 | 483E | 0100 | 0374 | 1FE9 | 1E00 | 2068 |
| 0000005220 | 9A03 | 7994 | 0974 | C483 | 1E04 | 2268 | 1E03 | A868 |
| 0000005240 | 9A23 | 793A | 09D8 | C483 | E908 | 0000 | BE80 | FCA2 |
| 0000005260 | 7430 | E903 | 0009 | 00B8 | BA00 | 0000 | 18E9 | 8000 |
| 0000005300 | A2BE | 31FC | 0374 | 08E9 | B800 | 0324 | DA8C | 06E9 |
| 0000005320 | 8D00 | A286 | 8CFC | 89D2 | A286 | 89FE | A496 | FFFE |
| 0000005340 | A4B6 | FFFE | A2B6 | FFFE | E076 | 76FF | FFDE | CCB6 |
| 0000005360 | 8DFE | D846 | 5016 | FF9A | 00FF | 8900 | E846 | 76FF |
| 0000005400 | 1EE8 | 2568 | 9A03 | 7994 | 09F9 | C483 | 8306 | E87E |

THU MAR 14 17:21:24 1991 CLIENT.EXE PAGE 4, LINE 178

| | | | | | | | | |
|---|---|---|---|---|---|---|---|---|
| 0000005420 | 7500 | E903 | 0018 | 76FF | FFDA | D876 | 76FF | FFDA |
| 0000005440 | D876 | 681E | 033C | 949A | 0879 | 830A | 0CC4 | B0E9 |
| 0000005460 | 1E0D | 6468 | 9A00 | 7994 | 0A1A | C483 | 8D04 | A286 |
| 0000005500 | 16FC | 1E50 | 9268 | 9A00 | 79E2 | 0A24 | C483 | 6A08 |
| 0000005520 | 9A00 | 0000 | 0A40 | C483 | 8902 | DE46 | 5689 | 83E0 |
| 0000005540 | 483E | 0100 | 0374 | 1FE9 | 1E00 | 5768 | 9A03 | 7994 |
| 0000005560 | 0A50 | C483 | 1E04 | 5968 | 1E03 | A868 | 9A23 | 793A |
| 0000005600 | 058D | C483 | E908 | 0000 | BE80 | FCA2 | 7430 | E903 |
| 0000005620 | 0009 | 00B8 | BA00 | 0000 | 18E9 | 8000 | A2BE | 31FC |
| 0000005640 | 0374 | 08E9 | B800 | 035B | DA8C | 06E9 | 8D00 | A286 |
| 0000005660 | 8CFC | 89D2 | A286 | 89FE | A496 | FFFE | A4B6 | FFFE |
| 0000005700 | A2B6 | FFFE | E076 | 76FF | 8DDE | F846 | 5016 | FF9A |
| 0000005720 | 00FF | 8900 | E846 | 76FF | 1EE8 | 5C68 | 9A03 | 7994 |
| 0000005740 | 0AF1 | C483 | 8306 | E87E | 7500 | E903 | 0003 | F0E9 |
| 0000005760 | C40C | F85E | 8A26 | 0347 | E42A | 8B50 | F846 | 568B |
| 0000006000 | 05FA | 0004 | 5052 | 5EC4 | 26F8 | 77FF | 2602 | 37FF |
| 0000006020 | 5EC4 | 26F8 | 77FF | 2602 | 37FF | 681E | 0370 | 949A |
| 0000006040 | 1279 | 830B | 12C4 | 3E83 | 0048 | 7500 | E903 | 001A |
| 0000006060 | 5EC4 | 26F8 | 77FF | 264A | 77FF | 1E48 | 9D68 | 9A03 |
| 0000006100 | 7994 | 0B37 | C483 | E908 | 0022 | 5EC4 | 26F8 | 77FF |
| 0000006120 | 264A | 77FF | C448 | F85E | FF26 | 2677 | FF26 | 2477 |
| 0000006140 | 681E | 03B3 | 949A | 5979 | 830B | 0CC4 | 76FF | FFFA |
| 0000006160 | F876 | FF9A | 00FF | 2B00 | 89C0 | FA46 | 4689 | E9F8 |
| 0000006200 | 0C5F | 681E | 03D7 | 949A | 6B79 | 830B | 04C4 | 868D |
| 0000006220 | FCA2 | 5016 | 681E | 0092 | E29A | 8179 | 830B | 08C4 |
| 0000006240 | 3E83 | 0048 | 7401 | E903 | 001F | 681E | 03E6 | 949A |
| 0000006260 | 9179 | 830B | 04C4 | 681E | 03E8 | 681E | 23A8 | 3A9A |
| 0000006300 | 0479 | 8307 | 08C4 | 00E9 | 8000 | A2BE | 30FC | 0374 |
| 0000006320 | 09E9 | B800 | 0000 | 00BA | E900 | 0018 | BE80 | FCA2 |
| 0000006340 | 7431 | E903 | 0008 | EAB8 | 8C03 | E9DA | 0006 | 868D |
| 0000006360 | FCA2 | D28C | 8689 | FEA2 | 9689 | FEA4 | B6FF | FEA4 |
| 0000006400 | B6FF | FEA2 | 468D | 16DE | 9A50 | FFFF | 0000 | 4689 |
| 0000006420 | FFE8 | E076 | 76FF | FFDE | E076 | 76FF | FFDE | E876 |
| 0000006440 | 681E | 03EB | 949A | 0679 | 830C | 0EC4 | B2E9 | 1E0B |
| 0000006460 | 6468 | 9A00 | 7994 | 0C18 | C483 | 8D04 | A286 | 16FC |
| 0000006500 | 1E50 | 9268 | 9A00 | 79E2 | 0C22 | C483 | 6A08 | 9A00 |
| 0000006520 | 0000 | 0C3E | C483 | 8902 | DE46 | 5689 | 83E0 | 483E |
| 0000006540 | 0100 | 0374 | 1FE9 | 1E00 | 1A68 | 9A04 | 7994 | 0C4E |
| 0000006560 | C483 | 1E04 | 1C68 | 1E04 | A868 | 9A23 | 793A | 0CAE |
| 0000006600 | C483 | E908 | 0000 | BE80 | FCA2 | 7430 | E903 | 0009 |
| 0000006620 | 00B8 | BA00 | 0000 | 18E9 | 8000 | A2BE | 31FC | 0374 |
| 0000006640 | 08E9 | B800 | 041E | DA8C | 06E9 | 8D00 | A286 | 8CFC |
| 0000006660 | 89D2 | A286 | 89FE | A496 | FFFE | A4B6 | FFFE | A2B6 |
| 0000006700 | FFFE | E076 | 76FF | 8DDE | F446 | 5016 | FF9A | 00FF |
| 0000006720 | 8900 | E846 | 76FF | 1EE8 | 1F68 | 9A04 | 7994 | 0CD4 |
| 0000006740 | C483 | 8306 | E87E | 7400 | E903 | 0030 | 468B | 0BF6 |
| 0000006760 | F446 | 0375 | 25E9 | FF00 | F676 | 76FF | 1EF4 | 3E68 |
| 0000007000 | 9A04 | 7994 | 0CF6 | C483 | FF08 | F676 | 76FF | 9AF4 |
| 0000007020 | 0E06 | 0000 | C02B | 4689 | 89F6 | F446 | C2E9 | 1E0A |
| 0000007040 | 6468 | 9A00 | 7994 | 0D08 | C483 | 8D04 | A286 | 16FC |
| 0000007060 | 1E50 | 9268 | 9A00 | 79E2 | 0D12 | C483 | 6A08 | 9A00 |
| 0000007100 | 0000 | 0D2E | C483 | 8902 | DE46 | 5689 | 83E0 | 483E |
| 0000007120 | 0100 | 0374 | 1FE9 | 1E00 | 5068 | 9A04 | 7994 | 0D3E |
| 0000007140 | C483 | 1E04 | 5268 | 1E04 | A868 | 9A23 | 793A | 0DA4 |
| 0000007160 | C483 | E908 | 0000 | BE80 | FCA2 | 7430 | E903 | 0009 |
| 0000007200 | 00B8 | BA00 | 0000 | 18E9 | 8000 | A2BE | 31FC | 0374 |
| 0000007220 | 08E9 | B800 | 0454 | DA8C | 06E9 | 8D00 | A286 | 8CFC |
| 0000007240 | 89D2 | A286 | 89FE | A496 | FFFE | A4B6 | FFFE | A2B6 |
| 0000007260 | FFFE | E076 | 76FF | 8DDE | EE46 | 5016 | 868D | FEA6 |

THU MAR 14 17:21:24 1991 CLIENT.EXE PAGE 5, LINE 237

| | | | | | | | | |
|---|---|---|---|---|---|---|---|---|
| 0000007300 | 5016 | B69A | 0005 | 8900 | E846 | 76FF | 1EE8 | 5568 |
| 0000007320 | 9A04 | 7994 | 0DF5 | C483 | 8306 | E87E | 7500 | E903 |
| 0000007340 | 0003 | FCE9 | C709 | D246 | 0000 | 03E9 | FF00 | D246 |
| 0000007360 | 468B | 39D2 | EE46 | 0377 | 32E9 | 6B00 | D25E | C424 |
| 0000007400 | A6B6 | 26FE | 70FF | 2602 | 30FF | 466B | 24D2 | 8603 |
| 0000007420 | FEA6 | 968B | FEA8 | 0405 | 5200 | FF50 | D276 | 681E |
| 0000007440 | D471 | 949A | 1E79 | 830E | 0EC4 | C0E9 | FFFF | A8B6 |
| 0000007460 | FFFE | A6B6 | 9AFE | 06B0 | 0000 | C02B | 8689 | FEA8 |
| 0000007500 | 8689 | FEA6 | 9AE9 | 1E09 | 6468 | 9A00 | 7994 | 0E30 |
| 0000007520 | C483 | 8D04 | A286 | 16FC | 1E50 | 9268 | 9A00 | 79E2 |
| 0000007540 | 0E3A | C483 | 6A08 | 9A00 | 0000 | 0E56 | C483 | 8902 |
| 0000007560 | DE46 | 5689 | 83E0 | 483E | 0100 | 0374 | 1FE9 | 1E00 |
| 0000007600 | 8468 | 9A04 | 7994 | 0E66 | C483 | 1E04 | 8668 | 1E04 |
| 0000007620 | A868 | 9A23 | 793A | 0ECC | C483 | E908 | 0000 | BE80 |
| 0000007640 | FCA2 | 7430 | E903 | 0009 | D0B8 | BA00 | 0000 | 18E9 |
| 0000007660 | 8000 | A2BE | 31FC | 0374 | 08E9 | B800 | 0488 | DA8C |
| 0000007700 | 06E9 | 8D00 | A286 | 8CFC | 89D2 | A286 | 89FE | A496 |
| 0000007720 | FFFE | A4B6 | FFFE | A2B6 | FFFE | E076 | 76FF | 8DDE |
| 0000007740 | EA46 | 5016 | 868D | FEAC | 5016 | FF9A | 00FF | 8900 |
| 0000007760 | E846 | 76FF | 1EE8 | 8968 | 9A04 | 7994 | 0EF0 | C483 |
| 0000010000 | 8306 | E87E | 7500 | E903 | 0003 | D4E9 | 8D08 | AC86 |
| 0000010020 | 16FE | FF50 | EC76 | 76FF | 1EEA | A068 | 9A04 | 7994 |
| 0000010040 | 0EFF | C483 | E90C | 08B9 | 681E | 04C7 | 949A | 1179 |
| 0000010060 | 830F | 04C4 | 868D | FCA2 | 5016 | 681E | 0092 | E29A |
| 0000010100 | 1B79 | 830F | 08C4 | D06A | 009A | 3200 | 830F | 02C4 |
| 0000010120 | 4689 | 89DE | E056 | 468D | 16EE | 1E50 | 9668 | 9A00 |
| 0000010140 | 79E2 | 0F48 | C483 | 8308 | 483E | 0100 | 0374 | 1FE9 |
| 0000010160 | 1E00 | E168 | 9A04 | 7994 | 0F58 | C483 | 1E04 | E368 |
| 0000010200 | 1E04 | A868 | 9A23 | 793A | 0AB0 | C483 | E908 | 0000 |
| 0000010220 | BE80 | FCA2 | 7430 | E903 | 0009 | 00B8 | BA00 | 0000 |
| 0000010240 | 18E9 | 8000 | A2BE | 31FC | 0374 | 08E9 | B800 | 04E5 |
| 0000010260 | DA8C | 06E9 | 8D00 | A286 | 8CFC | 89D2 | A286 | 89FE |
| 0000010300 | A496 | FFFE | A4B6 | FFFE | A2B6 | FFFE | E076 | 76FF |
| 0000010320 | 8DDE | F846 | 5016 | 9F9A | 000A | 8900 | E846 | 7E83 |
| 0000010340 | 00E8 | 0375 | 12E9 | FF00 | E876 | 681E | 04E6 | 949A |
| 0000010360 | EF79 | 830F | 06C4 | E8E9 | C607 | D286 | 00FE | 868D |
| 0000010400 | FED2 | 5016 | 76FF | C4EE | F85E | FF26 | 0277 | FF26 |
| 0000010420 | 8B37 | F846 | 568B | 05FA | 0004 | 5052 | 6A9A | 0705 |
| 0000010440 | 8310 | 0EC4 | 4689 | 83E8 | E87E | 7400 | E903 | 000F |
| 0000010460 | 681E | 0508 | 949A | 1679 | 8310 | 04C4 | 0CE9 | 1E00 |
| 0000010500 | 1768 | 9A05 | 7994 | 0BF7 | C483 | FF04 | FA76 | 76FF |
| 0000010520 | 9AF8 | 0B43 | 0000 | C02B | 4689 | 89FA | F846 | 80E9 |
| 0000010540 | 1E07 | BE68 | 9A00 | 7994 | 104A | C483 | 8D04 | A286 |
| 0000010560 | 16FC | 1E50 | 9268 | 9A00 | 79E2 | 1054 | C483 | 6A08 |
| 0000010600 | 9A00 | 0000 | 106C | C483 | 8902 | DE46 | 5689 | 8DE0 |
| 0000010620 | D286 | 16FE | 1E50 | 9268 | 9A00 | 79E2 | 1076 | C483 |
| 0000010640 | 6A08 | 9A00 | 0000 | 1092 | C483 | 8902 | E246 | 5689 |
| 0000010660 | 83E4 | 483E | 0100 | 0374 | 1FE9 | 1E00 | 2468 | 9A05 |
| 0000010700 | 7994 | 10A2 | C483 | 1E04 | 2668 | 1E05 | A868 | 9A23 |
| 0000010720 | 793A | 10B6 | C483 | E908 | 0000 | 468D | 16E6 | 1E50 |
| 0000010740 | 9668 | 9A00 | 79E2 | 115F | C483 | 8008 | A2BE | 30FC |
| 0000010760 | 0374 | 09E9 | B800 | 0000 | 00BA | E900 | 0018 | BE80 |
| 0000011000 | FCA2 | 7431 | E903 | 0008 | 28B8 | 8C05 | E9DA | 0006 |
| 0000011020 | 868D | FCA2 | D28C | 8689 | FEA2 | 9689 | FEA4 | BE80 |
| 0000011040 | FED2 | 7430 | E903 | 0009 | 00B8 | BA00 | 0000 | 18E9 |
| 0000011060 | 8000 | D2BE | 31FE | 0374 | 08E9 | B800 | 0529 | DA8C |
| 0000011100 | 06E9 | 8D00 | D286 | 8CFE | 89D2 | D446 | 5689 | FFD6 |
| 0000011120 | A4B6 | FFFE | A2B6 | FFFE | E076 | 76FF | FFDE | D676 |
| 0000011140 | 76FF | FFD4 | E476 | 76FF | FFE2 | E676 | 468D | 16E2 |

THU MAR 14 17:21:24 1991 CLIENT.EXE PAGE 6, LINE 296

| | | | | | | | | |
|---|---|---|---|---|---|---|---|---|
| 0000011160 | 9A50 | FFFF | 0000 | 4689 | FFE8 | E476 | 76FF | FFE2 |
| 0000011200 | E476 | 76FF | FFE2 | E876 | 681E | 052A | 949A | 6E79 |
| 0000011220 | 8311 | 0EC4 | 4AE9 | 1E06 | BE68 | 9A00 | 7994 | 1180 |
| 0000011240 | C483 | 8D04 | A286 | 16FC | 1E50 | 9268 | 9A00 | 79E2 |
| 0000011260 | 118A | C483 | 6A08 | 9A00 | 0000 | 11A2 | C483 | 8902 |
| 0000011300 | DE46 | 5689 | 8DE0 | D286 | 16FE | 1E50 | 9268 | 9A00 |
| 0000011320 | 79E2 | 11AC | C483 | 6A08 | 9A00 | 0000 | 11C8 | C483 |
| 0000011340 | 8902 | E246 | 5689 | 83E4 | 483E | 0100 | 0374 | 1FE9 |
| 0000011360 | 1E00 | 5468 | 9A05 | 7994 | 11D8 | C483 | 1E04 | 5668 |
| 0000011400 | 1E05 | A868 | 9A23 | 793A | 11EC | C483 | E908 | 0000 |
| 0000011420 | 468D | 16E6 | 1E50 | 9668 | 9A00 | 79E2 | 1295 | C483 |
| 0000011440 | 8008 | A2BE | 30FC | 0374 | 09E9 | B800 | 0000 | 00BA |
| 0000011460 | E900 | 0018 | BE80 | FCA2 | 7431 | E903 | 0008 | 58B8 |
| 0000011500 | 8C05 | E9DA | 0006 | 868D | FCA2 | D28C | 8689 | FEA2 |
| 0000011520 | 9689 | FEA4 | BE80 | FED2 | 7430 | E903 | 0009 | 00B8 |
| 0000011540 | BA00 | 0000 | 18E9 | 8000 | D2BE | 31FE | 0374 | 08E9 |
| 0000011560 | B800 | 0559 | DA8C | 06E9 | 8D00 | D286 | 8CFE | 89D2 |
| 0000011600 | D446 | 5689 | FFD6 | A4B6 | FFFE | A2B6 | FFFE | E076 |
| 0000011620 | 76FF | FFDE | D676 | 76FF | FFD4 | E476 | 76FF | FFE2 |
| 0000011640 | E676 | 468D | 16E2 | 9A50 | FFFF | 0000 | 4689 | FFE8 |
| 0000011660 | E476 | 76FF | FFE2 | E476 | 76FF | FFE2 | E876 | 681E |
| 0000011700 | 055A | 949A | A479 | 8312 | 0EC4 | 14E9 | 1E05 | 7868 |
| 0000011720 | 9A00 | 7994 | 12B6 | C483 | 8D04 | A286 | 16FC | 1E50 |
| 0000011740 | 9268 | 9A00 | 79E2 | 12C0 | C483 | 6A08 | 9A00 | 0000 |
| 0000011760 | 12D8 | C483 | 8902 | DE46 | 5689 | 8DE0 | CC86 | 16FE |
| 0000012000 | 1E50 | 9668 | 9A00 | 79E2 | 12EE | C483 | 8308 | 483E |
| 0000012020 | 0100 | 0374 | 1FE9 | 1E00 | 8468 | 9A05 | 7994 | 12FE |
| 0000012040 | C483 | 1E04 | 8668 | 1E05 | A868 | 9A23 | 793A | 1368 |
| 0000012060 | C483 | E908 | U000 | BE80 | FCA2 | 7430 | E903 | 0009 |
| 0000012100 | 00B8 | BA00 | 0000 | 18E9 | 8000 | A2BE | 31FC | 0374 |
| 0000012120 | 08E9 | B800 | 0588 | DA8C | 06E9 | 8D00 | A286 | 8CFC |
| 0000012140 | 89D2 | A286 | 89FE | A496 | FFFE | A4B6 | FFFE | A2B6 |
| 0000012160 | FFFE | E076 | 76FF | FFDE | CCB6 | 8DFE | F046 | 5016 |
| 0000012200 | FF9A | 00FF | 8900 | E846 | 76FF | FFE8 | F276 | 76FF |
| 0000012220 | 1EF0 | 8968 | 9A05 | 7994 | 1377 | C483 | E90A | 0441 |
| 0000012240 | 681E | 05A8 | 949A | 8379 | 8313 | 04C4 | 681E | 05BB |
| 0000012260 | 949A | 8F79 | 8313 | 04C4 | 681E | 05E7 | 949A | 9B79 |
| 0000012300 | 8313 | 04C4 | 681E | 060C | 949A | AD79 | 8313 | 04C4 |
| 0000012320 | 868D | FCA2 | 5016 | 681E | 0092 | E29A | B779 | 8313 |
| 0000012340 | 08C4 | 006A | 009A | C100 | 830F | 02C4 | 4689 | 89DE |
| 0000012360 | E056 | 468D | 16DC | 1E50 | 9668 | 9A00 | 79E2 | 13DF |
| 0000012400 | C483 | 8D08 | FC46 | 5016 | 681E | 0096 | E29A | F579 |
| 0000012420 | 8313 | 08C4 | 3E83 | 0048 | 7401 | E903 | 001F | 681E |
| 0000012440 | 0648 | 949A | 0579 | 8314 | 04C4 | 681E | 064A | 681E |
| 0000012460 | 23A8 | 3A9A | 7A79 | 8314 | 08C4 | 00E9 | 8000 | A2BE |
| 0000012500 | 30FC | 0374 | 09E9 | B800 | 0000 | 00BA | E900 | 0018 |
| 0000012520 | BE80 | FCA2 | 7431 | E903 | 0008 | 4CB8 | 8C06 | E9DA |
| 0000012540 | 0006 | 868D | FCA2 | D28C | 8689 | FEA2 | 9689 | FEA4 |
| 0000012560 | B6FF | FEA4 | B6FF | FEA2 | 76FF | FFE0 | DE76 | 76FF |
| 0000012600 | FFDC | FC76 | 468D | 16EE | 8D50 | CE8E | 16FE | 9A51 |
| 0000012620 | FFFF | 0000 | 4689 | 83E8 | EE7E | 7700 | E903 | 027B |
| 0000012640 | 76FF | 1EEE | 4D68 | 9A06 | 7994 | 1486 | C483 | 1E06 |
| 0000012660 | 6A68 | 9A06 | 7994 | 1492 | C483 | 1E04 | 9268 | 9A06 |
| 0000012700 | 7994 | 149E | C483 | 1E04 | E368 | 9A06 | 7994 | 1038 |
| 0000012720 | C483 | C704 | D246 | 0000 | 03E9 | FF00 | D246 | 468B |
| 0000012740 | 39D2 | EE46 | 0377 | 1AE9 | 6B02 | D276 | C430 | CE9E |
| 0000012760 | 26FE | 7883 | 2824 | 037D | 1BE9 | 6B00 | D276 | C430 |
| 0000013000 | CE9E | 26FE | 7883 | 2D24 | 037C | 09E9 | C700 | A286 |
| 0000013020 | 01FB | E900 | 0006 | 86C7 | FBA2 | 0000 | BE83 | FBA2 |

THU MAR 14 17:21:24 1991 CLIENT.EXE PAGE 7, LINE 355

| | | | | | | | | |
|---|---|---|---|---|---|---|---|---|
| 0000013040 | 7500 | E903 | 0040 | 5E6B | 30D2 | B6C4 | FECE | FF26 |
| 0000013060 | 0270 | FF26 | 8D30 | A486 | 16FB | 9A50 | 154D | 0000 |
| 0000013100 | 4689 | 83E8 | E87E | 7500 | E903 | 0017 | 466B | 30D2 |
| 0000013120 | 8603 | FECE | 968B | FED0 | 0405 | 8900 | A486 | 89FB |
| 0000013140 | A696 | E9FB | 0071 | 766B | 30D2 | 9EC4 | FECE | FF26 |
| 0000013160 | 2870 | FF26 | 2670 | 868D | FBA4 | 5016 | FF9A | 00FF |
| 0000013200 | 8900 | E846 | B6FF | FBA6 | B6FF | FBA4 | 868D | FBDA |
| 0000013220 | 5016 | A29A | 777B | 8315 | 08C4 | 681E | 0730 | 868D |
| 0000013240 | FBDA | 5016 | 5C9A | 967B | 8315 | 08C4 | 466B | 30D2 |
| 0000013260 | 8603 | FECE | 968B | FED0 | 0405 | 5200 | 8D50 | DA86 |
| 0000013300 | 16FB | 9A50 | 7B5C | 15C3 | C483 | 8D08 | DA86 | 89FB |
| 0000013320 | A486 | 8CFB | A696 | 6BFB | D276 | C430 | CE9E | 26FE |
| 0000013340 | 408B | E92A | 00B7 | 681E | 0734 | 868D | FBA8 | 5016 |
| 0000013360 | A29A | D87B | 8315 | 08C4 | DCE9 | 1E00 | 4B68 | 8D07 |
| 0000013400 | A886 | 16FB | 9A50 | 7BA2 | 15ED | C483 | E908 | 00C7 |
| 0000013420 | 681E | 076C | 868D | FBA8 | 5016 | A29A | 027B | 8316 |
| 0000013440 | 08C4 | B2E9 | 1E00 | 8468 | 8D07 | A886 | 16FB | 9A50 |
| 0000013460 | 7BA2 | 1617 | C483 | E908 | 009D | 681E | 079E | 868D |
| 0000013500 | FBA8 | 5016 | A29A | 2C7B | 8316 | 08C4 | 88E9 | 1E00 |
| 0000013520 | B568 | 8D07 | A886 | 16FB | 9A50 | 7BA2 | 1641 | C483 |
| 0000013540 | E908 | 0073 | 681E | 07C8 | 868D | FBA8 | 5016 | A29A |
| 0000013560 | 627B | 8316 | 08C4 | 5EE9 | 6B00 | D276 | C430 | CE9E |
| 0000013600 | 26FE | 70FF | 1E2A | E068 | 8D07 | A886 | 16FB | 9A50 |
| 0000013620 | 7C68 | 16CB | C483 | E90A | 003D | 3AE9 | 3D00 | 0065 |
| 0000013640 | 0375 | 80E9 | 7EFF | E903 | 0016 | 4848 | 0375 | 35E9 |
| 0000013660 | 48FF | 0375 | 83E9 | 48FF | 0375 | 92E9 | E9FF | FFB9 |
| 0000013700 | 662D | 7500 | E903 | FF48 | 7548 | E903 | FF2D | 7548 |
| 0000013720 | E903 | FF90 | A2E9 | 8DFF | A886 | 16FB | 6B50 | D25E |
| 0000013740 | C430 | CEB6 | 26FE | 70FF | 2602 | 30FF | B6FF | FBA6 |
| 0000013760 | B6FF | FBA4 | 681E | 07F3 | 949A | CE79 | 8313 | 10C4 |
| 0000014000 | D8E9 | 83FD | FC7E | 7400 | E903 | 000C | 681E | 0804 |
| 0000014020 | 949A | FB79 | 8316 | 04C4 | 27E9 | 8300 | E87E | 7400 |
| 0000014040 | E903 | 000F | 681E | 0826 | 949A | 0D79 | 8317 | 04C4 |
| 0000014060 | 0FE9 | FF00 | E876 | 681E | 083C | 949A | 6579 | 8315 |
| 0000014100 | 06C4 | B6FF | FED0 | B6FF | FECE | 76FF | 9AEE | FFFF |
| 0000014120 | 0000 | C02B | 8689 | FED0 | 8689 | FECE | 82E9 | E900 |
| 0000014140 | 007F | 412D | 3D00 | 0035 | 0376 | 74E9 | D100 | 93E0 |
| 0000014160 | FF2E | 45A7 | F017 | B106 | 3117 | 1310 | B109 | 1717 |
| 0000014200 | 010E | B10A | 5217 | B10B | B117 | EF17 | 670C | B111 |
| 0000014220 | B117 | FF17 | B10B | B117 | 9D17 | F812 | B10E | 7017 |
| 0000014240 | B113 | B117 | B117 | B117 | B117 | B117 | B117 | B117 |
| 0000014260 | B117 | B117 | F317 | B106 | 3117 | 1310 | B109 | 1717 |
| 0000014300 | 010E | B10A | 5217 | B10B | B117 | EF17 | 670C | B111 |
| 0000014320 | B117 | FF17 | B10B | B117 | 9D17 | F812 | B10E | 7017 |
| 0000014340 | 5E13 | 835F | 02ED | E58B | 5D1F | CB4D | 581E | 4590 |
| 0000014360 | 8B55 | 1EEC | D88E | EC81 | 013C | 5657 | C02B | 4689 |
| 0000014400 | 89F6 | F446 | C02B | 4689 | 89E2 | E046 | 5EC4 | 2606 |
| 0000014420 | 478A | 9801 | 1AE9 | 1E08 | 5468 | 9A08 | 7994 | 1800 |
| 0000014440 | C483 | 8D04 | E086 | 16FE | 1E50 | 9268 | 9A00 | 79E2 |
| 0000014460 | 180A | C483 | 6A08 | 9A00 | 0000 | 1821 | C483 | C402 |
| 0000014500 | 0A5E | 8926 | 2607 | 5789 | 8D02 | E446 | 5016 | 919A |
| 0000014520 | 3700 | 8318 | 04C4 | 3E83 | 0048 | 7401 | E903 | 001F |
| 0000014540 | 681E | 0886 | 949A | 4779 | 8318 | 04C4 | 681E | 0888 |
| 0000014560 | 681E | 23A8 | 3A9A | 8079 | 8318 | 08C4 | 00E9 | 8D00 |
| 0000014600 | E086 | 16FE | FF50 | 0C76 | 76FF | 6A0A | 6A00 | FF00 |
| 0000014620 | E476 | 006A | FF9A | 00FF | 8900 | F046 | 5EC4 | 260A |
| 0000014640 | 77FF | 2602 | 37FF | 76FF | 1EF0 | 8A68 | 9A08 | 7994 |
| 0000014660 | 16E3 | C483 | E90A | 07F2 | 681E | 08A1 | 949A | 9979 |
| 0000014700 | 8318 | 04C4 | 006A | 009A | CB00 | 8318 | 02C4 | 4689 |

THU MAR 14 17:21:24 1991 CLIENT.EXE PAGE 8, LINE 414

| | | | | | | | | |
|---|---|---|---|---|---|---|---|---|
| 0000014720 | 89EC | EE56 | 468B | 0BEE | EC46 | 0374 | 10E9 | C400 |
| 0000014740 | 0A5E | 8B26 | 2607 | 578B | 8902 | EC46 | 5689 | 8DEE |
| 0000014760 | E846 | 5016 | 681E | 0096 | E29A | E179 | 8318 | 08C4 |
| 0000015000 | 3E83 | 0048 | 7401 | E903 | 001F | 681E | 08C4 | 949A |
| 0000015020 | F179 | 8318 | 04C4 | 681E | 08C6 | 681E | 23A8 | 3A9A |
| 0000015040 | 1479 | 8319 | 08C4 | 00E9 | FF00 | EE76 | 76FF | FFEC |
| 0000015060 | E876 | FF9A | 00FF | 8900 | F046 | 76FF | 1EF0 | C868 |
| 0000015100 | 9A08 | 7994 | 1923 | C483 | E906 | 075E | 681E | 08D7 |
| 0000015120 | 949A | 2D79 | 8319 | 04C4 | 006A | 009A | 4900 | 8319 |
| 0000015140 | 02C4 | 4689 | 89EC | EE56 | 3E83 | 0048 | 7401 | E903 |
| 0000015160 | 001F | 681E | 08E3 | 949A | 5979 | 8319 | 04C4 | 681E |
| 0000015200 | 08E5 | 681E | 23A8 | 3A9A | 7E79 | 8319 | 08C4 | 00E9 |
| 0000015220 | 8B00 | EC46 | 568B | C4EE | 0A5E | 8926 | 2607 | 5789 |
| 0000015240 | FF02 | EE76 | 76FF | 1EEC | E768 | 9A08 | 7994 | 198D |
| 0000015260 | C483 | E908 | 06F4 | 681E | 08FE | 949A | 9E79 | 8319 |
| 0000015300 | 04C4 | 468D | 16EA | 1E50 | 9668 | 9A00 | 79E2 | 19AB |
| 0000015320 | C483 | 8D08 | E446 | 5016 | 919A | C100 | 8319 | 04C4 |
| 0000015340 | 3E83 | 0048 | 7401 | E903 | 001F | 681E | 0922 | 949A |
| 0000015360 | D179 | 8319 | 04C4 | 681E | 0924 | 681E | 23A8 | 3A9A |
| 0000015400 | FB79 | 8319 | 08C4 | 00E9 | C400 | 0A5E | FF26 | 0277 |
| 0000015420 | FF26 | FF37 | EA76 | 76FF | 9AE4 | FFFF | 0000 | 4689 |
| 0000015440 | FFF0 | F076 | 681E | 0926 | 949A | 0A79 | 831A | 06C4 |
| 0000015460 | 77E9 | 1E06 | 5A68 | 9A00 | 7994 | 1A1B | C483 | 8D04 |
| 0000015500 | EA46 | 5016 | 681E | 0096 | E29A | 3179 | 831A | 08C4 |
| 0000015520 | 3E83 | 0048 | 7401 | E903 | 001F | 681E | 0938 | 949A |
| 0000015540 | 4179 | 831A | 04C4 | 681E | 093A | 681E | 23A8 | 3A9A |
| 0000015560 | 6879 | 831A | 08C4 | 00E9 | C400 | 0A5E | FF26 | 0277 |
| 0000015600 | FF26 | FF37 | EA76 | FF9A | 00FF | 8900 | F046 | 76FF |
| 0000015620 | 1EF0 | 3C68 | 9A09 | 7994 | 1A77 | C483 | E906 | 060A |
| 0000015640 | 681E | 005A | 949A | 8879 | 831A | 04C4 | 468D | 16EA |
| 0000015660 | 1E50 | 9668 | 9A00 | 79E2 | 1A9E | C483 | 8308 | 483E |
| 0000015700 | 0100 | 0374 | 1FE9 | 1E00 | 5068 | 9A09 | 7994 | 1AAE |
| 0000015720 | C483 | 1E04 | 5268 | 1E09 | A868 | 9A23 | 793A | 1AD5 |
| 0000015740 | C483 | E908 | 0000 | 5EC4 | 260A | 77FF | 2602 | 37FF |
| 0000015760 | 76FF | 9AEA | FFFF | 0000 | 4689 | FFF0 | F076 | 681E |
| 0000016000 | 0954 | 949A | 1B79 | 831B | 06C4 | 9DE9 | C405 | 0A5E |
| 0000016020 | FF26 | 0277 | FF26 | 6A37 | 8D00 | F446 | 5016 | FF9A |
| 0000016040 | 00FF | 8900 | F046 | 468B | 0BF6 | F446 | 0374 | 08E9 |
| 0000016060 | B800 | 0968 | DA8C | 06E9 | 8B00 | F446 | 568B | 52F6 |
| 0000016100 | FF50 | F076 | 681E | 0970 | 949A | 4B79 | 831B | 0AC4 |
| 0000016120 | 7E83 | 00F0 | 0374 | 27E9 | C400 | 0A5E | FF26 | 0277 |
| 0000016140 | FF26 | FF37 | F676 | 76FF | 9AF4 | FFFF | 0000 | 4689 |
| 0000016160 | FFF0 | F076 | 681E | 0994 | 949A | 8779 | 831B | 06C4 |
| 0000016200 | 76FF | FFF6 | F476 | E09A | 000C | 2B00 | 89C0 | F646 |
| 0000016220 | 4689 | E9F4 | 0514 | 5EC4 | 260A | 77FF | 2602 | 37FF |
| 0000016240 | 468D | 16F8 | 9A50 | FFFF | 0000 | 4689 | FFF0 | F076 |
| 0000016260 | 681E | 09AC | 949A | 1B79 | 831C | 06C4 | 7E83 | 00F0 |
| 0000016300 | 0375 | 03E9 | E900 | 04E2 | 5EC4 | 26F8 | 7F83 | 2820 |
| 0000016320 | 0374 | 06E9 | B800 | 09C0 | 4FE9 | C400 | F85E | 8326 |
| 0000016340 | 207F | 7429 | E903 | 0006 | C3B8 | E909 | 003C | 5EC4 |
| 0000016360 | 26F8 | 7F83 | 2A20 | 0374 | 06E9 | B800 | 09C6 | 29E9 |
| 0000016400 | C400 | F85E | 8326 | 207F | 742B | E903 | 0006 | C9B8 |
| 0000016420 | E909 | 0016 | 5EC4 | 26F8 | 7F83 | 2C20 | 0374 | 06E9 |
| 0000016440 | B800 | 09CC | 03E9 | B800 | 09CF | 8629 | FED4 | 468B |
| 0000016460 | 8BF8 | FA56 | 2205 | 5200 | 1E50 | B6FF | FED4 | 76FF |
| 0000016500 | FFFA | F876 | 681E | 09D7 | 949A | EE79 | 8317 | 10C4 |
| 0000016520 | 468B | 8BF8 | FA56 | AA05 | 5200 | 8B50 | F846 | 568B |
| 0000016540 | 05FA | 0046 | 5052 | 468B | 8BF8 | FA56 | 4205 | 5200 |
| 0000016560 | 9A50 | 7D0A | 1C52 | C483 | 5204 | 1E50 | FE68 | 9A09 |

THU MAR 14 17:21:24 1991 CLIENT.EXE PAGE 9, LINE 473

| | | | | | | | | |
|---|---|---|---|---|---|---|---|---|
| 0000016600 | 7994 | 1CBE | C483 | C410 | F85E | 8B26 | 1487 | 2601 |
| 0000016620 | 870B | 0112 | 0374 | 08E9 | B800 | 0A1F | DA8C | 0DE9 |
| 0000016640 | C400 | F85E | 8B26 | 1287 | 2601 | 978B | 0114 | 8689 |
| 0000016660 | FED0 | 9689 | FED2 | B6FF | FED2 | B6FF | FED0 | 5EC4 |
| 0000016700 | 26F8 | 878B | 0110 | 0B26 | 0E87 | 7401 | E903 | 0008 |
| 0000016720 | 27B8 | 8C0A | E9DA | 000D | 5EC4 | 26F8 | 878B | 010E |
| 0000016740 | 8B26 | 1097 | 5201 | 1E50 | 2F68 | 9A0A | 7994 | 1D2A |
| 0000016760 | C483 | C40C | F85E | 8B26 | 1C87 | 2601 | 870B | 011A |
| 0000017000 | 0374 | 08E9 | B800 | 0A4B | DA8C | 0DE9 | C400 | F85E |
| 0000017020 | 8B26 | 1A87 | 2601 | 978B | 011C | 8689 | FEC8 | 9689 |
| 0000017040 | FECA | B6FF | FECA | B6FF | FEC8 | 5EC4 | 26F8 | 878B |
| 0000017060 | 0118 | 0B26 | 1687 | 7401 | E903 | 0008 | 53B8 | 8C0A |
| 0000017100 | E9DA | 000D | 5EC4 | 26F8 | 878B | 0116 | 8B26 | 1897 |
| 0000017120 | 5201 | 1E50 | 5B68 | 9A0A | 7994 | 1D36 | C483 | 1E0C |
| 0000017140 | 7C68 | 9A0A | 7994 | 1DB6 | C483 | C704 | E646 | 0000 |
| 0000017160 | 03E9 | FF00 | E646 | 5EC4 | 8BF8 | E646 | 3926 | 2087 |
| 0000017200 | 7701 | E903 | 0068 | 5E6B | 22E6 | 76C4 | 26F8 | B4C4 |
| 0000017220 | 0122 | 8326 | 2078 | 7401 | E903 | 0006 | 89B8 | E90A |
| 0000017240 | 001F | 5E6B | 22E6 | 76C4 | 26F8 | B4C4 | 0122 | 8326 |
| 0000017260 | 2078 | 7402 | E903 | 0006 | 8DB8 | E90A | 0003 | 91B8 |
| 0000017300 | 890A | C486 | 1EFE | B6FF | FEC4 | 5EC4 | 26F8 | 878B |
| 0000017320 | 0122 | 8B26 | 2497 | 6B01 | E64E | 0322 | 52C1 | 1E50 |
| 0000017340 | 9668 | 9A0A | 7994 | 1DC5 | C483 | E90C | FF85 | 681E |
| 0000017360 | 0AB0 | 949A | 8F79 | 8318 | 04C4 | 681E | 0ABD | 949A |
| 0000017400 | F379 | 831D | 04C4 | 468B | 8BF8 | FA56 | AA05 | 5200 |
| 0000017420 | 8B50 | F846 | 568B | 05FA | 0046 | 5052 | 681E | 00AE |
| 0000017440 | E29A | 2779 | 831E | 0CC4 | 5EC4 | 26F8 | 7F80 | 3046 |
| 0000017460 | 0375 | 27E9 | C400 | 0A5E | FF26 | 0277 | FF26 | FF37 |
| 0000017500 | FA76 | 76FF | 9AF8 | FFFF | 0000 | 4689 | FFF0 | F076 |
| 0000017520 | 681E | 0ADA | 949A | 4979 | 831E | 06C4 | 76FF | FFFA |
| 0000017540 | F876 | FF9A | 00FF | 2B00 | 89C0 | FA46 | 4689 | E9F8 |
| 0000017560 | 0238 | 681E | 0AEE | 949A | 5A79 | 831E | 04C4 | 468D |
| 0000017600 | 16FC | 1E50 | 9668 | 9A00 | 79E2 | 1E70 | C483 | 8308 |
| 0000017620 | 483E | 0100 | 0374 | 1FE9 | 1E00 | 0468 | 9A0B | 7994 |
| 0000017640 | 1E80 | C483 | 1E04 | 0668 | 1E0B | A868 | 9A23 | 793A |
| 0000017660 | 1F33 | C483 | E908 | 0000 | 7E83 | 00FC | 0375 | 8AE9 |
| 0000017700 | 6A00 | 6A00 | 8D00 | E046 | 5016 | 006A | 006A | 006A |
| 0000017720 | 4E8D | 16E6 | 9A51 | FFFF | 0000 | 4689 | 83F0 | F07E |
| 0000017740 | 7400 | E903 | 0036 | 76FF | FFE2 | E076 | 681E | 0B08 |
| 0000017760 | 468D | 16F2 | 8D50 | D886 | 16FE | 9A50 | FFFF | 0000 |
| 0000020000 | 4689 | 83F0 | F07E | 7400 | E903 | 0010 | 76FF | FFE2 |
| 0000020020 | E076 | 006A | FF9A | 00FF | 8900 | F046 | 7E83 | 00F0 |
| 0000020040 | 0374 | 23E9 | FF00 | F276 | B6FF | FEDA | B6FF | FED8 |
| 0000020060 | 229A | 001F | 8900 | F046 | 76FF | FFF2 | DAB6 | FFFE |
| 0000020100 | D8B6 | 9AFE | FFFF | 0000 | 0EE9 | 6A00 | 6A00 | 6A00 |
| 0000020120 | 9A00 | FFFF | 0000 | 4689 | FFF0 | F076 | 681E | 0B19 |
| 0000020140 | 949A | 4279 | 831F | 06C4 | 3FE9 | 1E01 | 3268 | 9A0B |
| 0000020160 | 7994 | 1F54 | C483 | 8D04 | E086 | 16FE | 1E50 | 9268 |
| 0000020200 | 9A00 | 79E2 | 1F6A | C483 | 8308 | 483E | 0100 | 0374 |
| 0000020220 | 1FE9 | 1E00 | 4068 | 9A0B | 7994 | 1F7A | C483 | 1E04 |
| 0000020240 | 4268 | 1E0B | A868 | 9A23 | 793A | 1FBC | C483 | E908 |
| 0000020260 | 0000 | 868D | FEE0 | 5016 | 468D | 16EC | 9A50 | FFFF |
| 0000020300 | 0000 | 4689 | 83F0 | F07E | 7400 | E903 | 0014 | 76FF |
| 0000020320 | FFEE | EC76 | 868D | FEDC | 5016 | 0C9A | 0015 | 8900 |
| 0000020340 | F046 | 76FF | 1EF0 | 4468 | 9A0B | 7994 | 1FDF | C483 |
| 0000020360 | 8306 | F07E | 7400 | E903 | 0031 | B6FF | FEDE | B6FF |
| 0000020400 | FEDC | 76FF | FFEE | EC76 | 681E | 0B57 | 949A | 4479 |
| 0000020420 | 831C | 0CC4 | B6FF | FEDE | B6FF | FEDC | 579A | 001B |
| 0000020440 | 2B00 | 89C0 | DE86 | 89FE | DC86 | E9FE | 007C | 79E9 |

THU MAR 14 17:21:24 1991 CLIENT.EXE PAGE 10, LINE 532

| | | | | | | | | |
|---|---|---|---|---|---|---|---|---|
| 0000020460 | 2D00 | 0043 | 323D | 7600 | E903 | 006E | E0D1 | 2E93 |
| 0000020500 | A7FF | 2014 | 1888 | 207A | 207A | 1F3B | 207A | 1B66 |
| 0000020520 | 207A | 207A | 207A | 1986 | 207A | 207A | 17E7 | 1E42 |
| 0000020540 | 207A | 1A70 | 1ADD | 191C | 1A03 | 207A | 207A | 207A |
| 0000020560 | 207A | 207A | 207A | 207A | 207A | 207A | 207A | 207A |
| 0000020600 | 207A | 207A | 1888 | 207A | 207A | 1F3B | 207A | 1B66 |
| 0000020620 | 207A | 207A | 207A | 1986 | 207A | 207A | 17E7 | 1E42 |
| 0000020640 | 207A | 1A70 | 1ADD | 191C | 1A03 | 5F5E | ED83 | 8B02 |
| 0000020660 | 1FE5 | 4D5D | 1ECB | 9058 | 5545 | EC8B | 8E1E | 81D8 |
| 0000020700 | 76EC | 5702 | 8D56 | E47E | 76BE | 8C0B | 8ED0 | B9C0 |
| 0000020720 | 000A | A5F3 | C4A4 | 065E | 8A26 | 0147 | E998 | 072F |
| 0000020740 | 76FF | FF0C | 0A76 | 681E | 0B8B | 949A | DA79 | 8320 |
| 0000020760 | 08C4 | 868D | FEB2 | 5016 | 468D | 16CA | 8D50 | B486 |
| 0000021000 | 16FE | 1E50 | B668 | 9A0B | 79E2 | 20F0 | C483 | 8310 |
| 0000021020 | 483E | 0100 | 0374 | 1FE9 | 1E00 | C068 | 9A0B | 7994 |
| 0000021040 | 2100 | C483 | 1E04 | C268 | 1E0B | A868 | 9A23 | 793A |
| 0000021060 | 216A | C483 | E908 | 0000 | BE80 | FEB4 | 7430 | E903 |
| 0000021100 | 0009 | 00B8 | BA00 | 0000 | 18E9 | 8000 | B4BE | 31FE |
| 0000021120 | 0374 | 08E9 | B800 | 0BC4 | DA8C | 06E9 | 8D00 | B486 |
| 0000021140 | 8CFE | 52D2 | 8D50 | CA46 | 5016 | B6FF | FEB2 | 8E8D |
| 0000021160 | FD8E | 5116 | 568D | 16D0 | 9A52 | 1EA6 | 0000 | 4689 |
| 0000021200 | FFCE | D076 | 868D | FD8E | 5016 | 76FF | FFCC | CA76 |
| 0000021220 | 76FF | 1ECE | C568 | 9A0B | 7994 | 2184 | C483 | E910 |
| 0000021240 | 06C5 | 76FF | FF0C | 0A76 | 468D | 16E4 | 1E50 | F468 |
| 0000021260 | 9A0B | 7994 | 219B | C483 | 8D0C | CA46 | 5016 | 868D |
| 0000021300 | FEB2 | 5016 | 681E | 0C06 | E29A | B179 | 8321 | 0CC4 |
| 0000021320 | 3E83 | 0048 | 7401 | E903 | 001F | 681E | 0C0D | 949A |
| 0000021340 | C179 | 8321 | 04C4 | 681E | 0C0F | 681E | 23A8 | 3A9A |
| 0000021360 | E579 | 8321 | 08C4 | 00E9 | FF00 | CC76 | 76FF | FFCA |
| 0000021400 | B2B6 | 9AFE | 1EE5 | 0000 | 4689 | FFCE | CE76 | 681E |
| 0000021420 | 0C11 | 949A | D179 | 831D | 06C4 | 4AE9 | FF06 | 0C76 |
| 0000021440 | 76FF | 8D0A | E446 | 5016 | 681E | 0C28 | 949A | 1B79 |
| 0000021460 | 8322 | 0CC4 | 868D | FE8E | 5016 | 468D | 16BC | 8D50 |
| 0000021500 | CA46 | 5016 | 681E | 0C49 | E29A | 3179 | 8322 | 10C4 |
| 0000021520 | 3E83 | 0048 | 7401 | E903 | 001F | 681E | 0C53 | 949A |
| 0000021540 | 4179 | 8322 | 04C4 | 681E | 0C55 | 681E | 23A8 | 3A9A |
| 0000021560 | 7B79 | 8322 | 08C4 | 00E9 | 8A00 | BC46 | E998 | 00E7 |
| 0000021600 | 76FF | FFCC | CA76 | 006A | 868D | FE8E | 5016 | 468D |
| 0000021620 | 16C2 | 9A50 | 2298 | 0000 | 4689 | FFCE | C476 | 76FF |
| 0000021640 | FFC2 | CE76 | 681E | 0C57 | 949A | B179 | 8322 | 0AC4 |
| 0000021660 | FFE9 | FF00 | CC76 | 76FF | 6ACA | 8D01 | 8E86 | 16FE |
| 0000021700 | 8D50 | AE86 | 16FE | 9A50 | 22CD | 0000 | 4689 | FFCE |
| 0000021720 | B0B6 | FFFE | AEB6 | FFFE | CE76 | 681E | 0C74 | 949A |
| 0000021740 | E179 | 8322 | 0AC4 | C9E9 | FF00 | CC76 | 76FF | 6ACA |
| 0000021760 | 8D03 | 8E86 | 16FE | 8D50 | BA46 | 5016 | FD9A | 0022 |
| 0000022000 | 8900 | CE46 | 76FF | FFBA | CE76 | 681E | 0C91 | 949A |
| 0000022020 | 1D79 | 8323 | 08C4 | 99E9 | FF00 | CC76 | 76FF | 6ACA |
| 0000022040 | 8D02 | 8E86 | 16FE | 8D50 | E046 | 5016 | FF9A | 00FF |
| 0000022060 | 8900 | CE46 | D99B | E046 | EC83 | 8B08 | 9BDC | DD36 |
| 0000022100 | 901F | FF9B | CE76 | 681E | 0CAD | 949A | 2C79 | 8323 |
| 0000022120 | 0EC4 | 5DE9 | 1E00 | C968 | 9A0C | 7994 | 2397 | C483 |
| 0000022140 | E904 | 0503 | 4BE9 | 3D00 | 0055 | 0375 | 44E9 | 7EFF |
| 0000022160 | E903 | 001B | 422D | 7500 | E903 | FF6D | 042D | 7500 |
| 0000022200 | E903 | FF95 | 062D | 7500 | E903 | FEF4 | C6E9 | 2DFF |
| 0000022220 | 0062 | 0375 | 52E9 | 2DFF | 0004 | 0375 | 7AE9 | 2DFF |
| 0000022240 | 0006 | 0375 | D9E9 | 2DFE | 0009 | 0375 | 04E9 | E9FF |
| 0000022260 | FFA3 | B2E9 | FF04 | 0C76 | 76FF | 8D0A | E446 | 5016 |
| 0000022300 | 681E | 0CDC | 949A | B379 | 8323 | 0CC4 | 868D | FE8E |
| 0000022320 | 5016 | 468D | 16BC | 8D50 | CA46 | 5016 | 681E | 0CFE |

THU MAR 14 17:21:24 1991 CLIENT.EXE PAGE 11, LINE 591

| | | | | | | | | |
|---|---|---|---|---|---|---|---|---|
| 0000022340 | E29A | C979 | 8323 | 10C4 | 3E83 | 0048 | 7401 | E903 |
| 0000022360 | 001F | 681E | 0D08 | 949A | D979 | 8323 | 04C4 | 681E |
| 0000022400 | 0D0A | 681E | 23A8 | 3A9A | 1279 | 8324 | 08C4 | 00E9 |
| 0000022420 | 8A00 | BC46 | E998 | 01E1 | 76FF | FFCC | CA76 | 006A |
| 0000022440 | 868D | FE8E | 5016 | 468D | 16D2 | 8D50 | B646 | 5016 |
| 0000022460 | 749A | 0024 | 8900 | CE46 | 76FF | 1ECE | F468 | 9A00 |
| 0000022500 | 7994 | 2450 | C483 | 8306 | CE7E | 7400 | E903 | 0038 |
| 0000022520 | 46C7 | 00C0 | E900 | 0003 | 46FF | 8BC0 | D246 | 4639 |
| 0000022540 | 72C0 | E903 | 0022 | 5E8B | C1C0 | 02E3 | 76C4 | 26B6 |
| 0000022560 | 70FF | 2602 | 30FF | 76FF | 1EC0 | 0C68 | 9A0D | 7994 |
| 0000022600 | 2485 | C483 | E90A | FFD0 | B9E9 | FF01 | CC76 | 76FF |
| 0000022620 | 6ACA | 8D01 | 8E86 | 16FE | 8D50 | D246 | 5016 | 468D |
| 0000022640 | 16DC | 9A50 | 24E7 | 0000 | 4689 | FFCE | CE76 | 681E |
| 0000022660 | 00F4 | 949A | C379 | 8324 | 06C4 | 7E83 | 00CE | 0374 |
| 0000022700 | 38E9 | C700 | C046 | 0000 | 03E9 | FF00 | C046 | 468B |
| 0000022720 | 39D2 | C046 | 0372 | 22E9 | 8B00 | C05E | E3C1 | C402 |
| 0000022740 | DC76 | FF26 | 0270 | FF26 | FF30 | C076 | 681E | 0D1F |
| 0000022760 | 949A | F879 | 8324 | 0AC4 | D0E9 | E9FF | 0146 | 76FF |
| 0000023000 | FFCC | CA76 | 036A | 868D | FE8E | 5016 | 468D | 16D2 |
| 0000023020 | 8D50 | C646 | 5016 | 559A | 0025 | 8900 | CE46 | 76FF |
| 0000023040 | 1ECE | F468 | 9A00 | 7994 | 2531 | C483 | 8306 | CE7E |
| 0000023060 | 7400 | E903 | 0033 | 46C7 | 00C0 | E900 | 0003 | 46FF |
| 0000023100 | 8BC0 | D246 | 4639 | 72C0 | E903 | 001D | 5E8B | D1C0 |
| 0000023120 | C4E3 | C676 | FF26 | FF30 | C076 | 681E | 0D32 | 949A |
| 0000023140 | 6679 | 8325 | 08C4 | D5E9 | E9FF | 00D8 | 76FF | FFCC |
| 0000023160 | CA76 | 026A | 868D | FE8E | 5016 | 468D | 16D2 | 8D50 |
| 0000023200 | D446 | 5016 | FF9A | 00FF | 8900 | CE46 | 76FF | 1ECE |
| 0000023220 | F468 | 9A00 | 7994 | 20BD | C483 | 8306 | CE7E | 7400 |
| 0000023240 | E903 | 004D | 46C7 | 00C0 | E900 | 0003 | 46FF | 8BC0 |
| 0000023260 | D246 | 4639 | 72C0 | E903 | 002A | 5E8B | C1C0 | 02E3 |
| 0000023300 | 76C4 | 9BD4 | D926 | 8300 | 08EC | DC8B | 369B | 1FDD |
| 0000023320 | 9B90 | 76FF | 1EC0 | 4468 | 9A0D | 7994 | 25BE | C483 |
| 0000023340 | E90E | FFC8 | 5DE9 | 1E00 | 5668 | 9A0D | 7994 | 21FF |
| 0000023360 | C483 | E904 | 0271 | 4BE9 | 3D00 | 0055 | 0375 | 8AE9 |
| 0000023400 | 7EFE | E903 | 001B | 422D | 7500 | E903 | FEF0 | 042D |
| 0000023420 | 7500 | E903 | FF56 | 062D | 7500 | E903 | FDFA | C6E9 |
| 0000023440 | 2DFF | 0062 | 0375 | D5E9 | 2DFE | 0004 | 0375 | 3BE9 |
| 0000023460 | 2DFF | 0006 | 0375 | DFE9 | 2DFD | 0009 | 0375 | 4AE9 |
| 0000023500 | E9FE | FFA3 | 20E9 | E902 | 021D | 76FF | FF0C | 0A76 |
| 0000023520 | 468D | 16E4 | 1E50 | 6968 | 9A0D | 7994 | 2648 | C483 |
| 0000023540 | 8D0C | 8E86 | 16FE | 8D50 | BC46 | 5016 | 468D | 16CA |
| 0000023560 | 1E50 | 8868 | 9A0D | 79E2 | 265E | C483 | 8310 | 483E |
| 0000023600 | 0100 | 0374 | 1FE9 | 1E00 | 9268 | 9A0D | 7994 | 266E |
| 0000023620 | C483 | 1E04 | 9468 | 1E0D | A868 | 9A23 | 793A | 26E1 |
| 0000023640 | C483 | E908 | 0000 | 468A | 98BC | 6FE9 | FF00 | CC76 |
| 0000023660 | 76FF | 6ACA | 8D04 | 8E86 | 16FE | 8D50 | D846 | 5016 |
| 0000023700 | AF9A | 0026 | 8900 | CE46 | 8AE9 | FF00 | CC76 | 76FF |
| 0000023720 | 6ACA | 8D05 | 8E86 | 16FE | 8D50 | D846 | 5016 | FF9A |
| 0000023740 | 00FF | 8900 | CE46 | 6CE9 | FF00 | CC76 | 76FF | 8DCA |
| 0000023760 | 8E86 | 16FE | 8D50 | B446 | 5016 | 468D | 16FA | 9A50 |
| 0000024000 | 1ECC | 0000 | 4689 | E9CE | 004B | 681E | 0D96 | 949A |
| 0000024020 | 2F79 | 8327 | 04C4 | 4EE9 | E901 | 0039 | 543D | 7500 |
| 0000024040 | E903 | FFA7 | 037E | 13E9 | 2D00 | 004C | 0375 | B8E9 |
| 0000024060 | 2DFF | 0007 | 0375 | 74E9 | E9FF | FFCE | 6C2D | 7500 |
| 0000024100 | E903 | FFA5 | 072D | 7500 | E903 | FF61 | 7548 | E903 |
| 0000024120 | FF79 | B5E9 | FFFF | CE76 | 681E | 0DA9 | 949A | 5679 |
| 0000024140 | 8327 | 06C4 | 7E83 | 00CE | 0374 | 90E9 | 8000 | BC7E |
| 0000024160 | 756C | E903 | 0009 | 7E80 | 4CBC | 0374 | 69E9 | 1E00 |
| 0000024200 | 9E68 | 9A00 | 7994 | 278B | C483 | C704 | C046 | 0000 |

THU MAR 14 17:21:24 1991 CLIENT.EXE PAGE 12, LINE 650

| | | | | | | | | |
|---|---|---|---|---|---|---|---|---|
| 0000024220 | 03E9 | FF00 | C046 | 468B | 39B4 | C046 | 0372 | 22E9 |
| 0000024240 | 8B00 | C05E | E3C1 | C402 | FA76 | FF26 | 0270 | FF26 |
| 0000024260 | FF30 | C076 | 681E | 0DBA | 949A | 9A79 | 8327 | 0AC4 |
| 0000024300 | D0E9 | 1EFF | 9E68 | 9A00 | 7994 | 27C5 | C483 | FF04 |
| 0000024320 | B476 | 76FF | FFFC | FA76 | 149A | 001F | 2B00 | 89C0 |
| 0000024340 | FC46 | 4689 | E9FA | 0012 | 76FF | FFDA | D876 | 681E |
| 0000024360 | 0DC5 | 949A | D479 | 8327 | 08C4 | 0CE9 | 1E00 | 9E68 |
| 0000024400 | 9A00 | 7994 | 25AC | C483 | E904 | 005B | 58E9 | 3D00 |
| 0000024420 | 0055 | 0375 | 8BE9 | 7EF9 | E903 | 0022 | 492D | 7500 |
| 0000024440 | E903 | FB91 | 032D | 7500 | E903 | F8B4 | 4848 | 0375 |
| 0000024460 | EAE9 | 2DF9 | 0005 | 0375 | 0FE9 | E9FE | 0029 | 692D |
| 0000024500 | 7500 | E903 | FB6F | 032D | 7500 | E903 | F892 | 4848 |
| 0000024520 | 0375 | C8E9 | 2DF9 | 0005 | 0375 | EDE9 | 48FD | 7548 |
| 0000024540 | E903 | F93E | 00E9 | 5E00 | 835F | 02ED | E58B | 5D1F |
| 0000024560 | CB4D | 581E | 4590 | 8B55 | 1EEC | D88E | EC81 | 000E |
| 0000024600 | 5657 | 00B8 | 8900 | F246 | 4689 | 1EF8 | D268 | 9A0D |
| 0000024620 | 7994 | 286E | C483 | 1E04 | E668 | 9A0D | 7994 | 287A |
| 0000024640 | C483 | 1E04 | 1468 | 9A0E | 7994 | 2886 | C483 | 1E04 |
| 0000024660 | 3868 | 9A0E | 7994 | 289C | C483 | 8D04 | FA46 | 5016 |
| 0000024700 | 468D | 16F6 | 1E50 | 5B68 | 9A0E | 79E2 | 28B2 | C483 |
| 0000024720 | 830C | 483E | 0100 | 0374 | 1FE9 | 1E00 | 6168 | 9A0E |
| 0000024740 | 7994 | 28C2 | C483 | 1E04 | 6368 | 1E0E | A868 | 9A23 |
| 0000024760 | 793A | 2900 | C483 | E908 | 0000 | 76FF | FF0C | 0A76 |
| 0000025000 | 76FF | FFF6 | FA76 | 468D | 16FC | 8D50 | F24E | 5116 |
| 0000025020 | 568D | 16F8 | 9A52 | FFFF | 0000 | 4689 | FFF4 | F876 |
| 0000025040 | 76FF | FFF2 | FC76 | 76FF | 1EF4 | 6568 | 9A0E | 7994 |
| 0000025060 | 262C | C483 | E90C | 0000 | 5F5E | ED83 | 8B02 | 1FE5 |
| 0000025100 | 4D5D | 1ECB | 9058 | 5545 | EC8B | 8E1E | 81D8 | 0AEC |
| 0000025120 | 5702 | 8D56 | FF86 | 89FE | FA86 | 8CFE | FC96 | C4FE |
| 0000025140 | 065E | 8A26 | 0147 | E998 | 01E3 | 681E | 0EA2 | 949A |
| 0000025160 | 5379 | 8329 | 04C4 | 868D | FEFE | 5016 | 681E | 009A |
| 0000025200 | E29A | 7979 | 8329 | 08C4 | BE80 | FEFE | 740A | E903 |
| 0000025220 | 000C | 868D | FEFE | 8689 | FEFA | 968C | FEFC | B6FF |
| 0000025240 | FEFC | B6FF | FEFA | F09A | 8C7B | 8329 | 04C4 | D00B |
| 0000025260 | 0374 | 0FE9 | 1E00 | B168 | 9A0E | 7994 | 29A5 | C483 |
| 0000025300 | E904 | 003B | 3E83 | 0048 | 7401 | E903 | 001F | 681E |
| 0000025320 | 0EC9 | 949A | B579 | 8329 | 04C4 | 681E | 0ECB | 681E |
| 0000025340 | 23A8 | 3A9A | 6279 | 8328 | 08C4 | 00E9 | 8D00 | FE86 |
| 0000025360 | 16FE | 1E50 | CD68 | 9A0E | 7994 | 29D9 | C483 | E908 |
| 0000025400 | 0186 | 681E | 0EDA | 949A | EB79 | 8329 | 04C4 | 868D |
| 0000025420 | FEFE | 5016 | 681E | 009A | E29A | 1179 | 832A | 08C4 |
| 0000025440 | BE80 | FEFE | 740A | E903 | 000C | 868D | FEFE | 8689 |
| 0000025460 | FEFA | 968C | FEFC | B6FF | FEFC | B6FF | FEFA | F09A |
| 0000025500 | 247B | 832A | 04C4 | D00B | 0374 | 0FE9 | 1E00 | EA68 |
| 0000025520 | 9A0E | 7994 | 2A3D | C483 | E904 | 0055 | 3E83 | 0048 |
| 0000025540 | 7401 | E903 | 001F | 681E | 0F04 | 949A | 4D79 | 832A |
| 0000025560 | 04C4 | 681E | 0F06 | 681E | 23A8 | 3A9A | 6279 | 832A |
| 0000025600 | 08C4 | 00E9 | 8D00 | FE86 | 16FE | 1E50 | 0868 | 9A0F |
| 0000025620 | 7994 | 2A6E | C483 | 1E08 | 9C68 | 9A23 | 7A1A | 2A7C |
| 0000025640 | C483 | 8D04 | FE86 | 16FE | 9A50 | 7DDE | 2941 | C483 |
| 0000025660 | E904 | 00D4 | 681E | 0F17 | 868D | FEF8 | 5016 | FF9A |
| 0000025700 | 00FF | 8900 | F686 | 83FD | F6BE | 00FD | 0375 | 1FE9 |
| 0000025720 | 1E00 | 1D68 | 9A0F | 7994 | 2AB8 | C483 | FF04 | F6B6 |
| 0000025740 | 1EFD | A068 | 9A00 | 7994 | 2AE7 | C483 | E906 | 0098 |
| 0000025760 | B6FF | FEF8 | 0068 | 8D01 | F886 | 16FD | 9A50 | FFFF |
| 0000026000 | 0000 | 8689 | FDF6 | BE83 | FDF6 | 7500 | E903 | 0022 |
| 0000026020 | 681E | 0F39 | 949A | F779 | 832A | 04C4 | B6FF | FDF6 |
| 0000026040 | 681E | 00A0 | 949A | 0F79 | 832B | 06C4 | 59E9 | E900 |
| 0000026060 | 0015 | 868D | FDF8 | 5016 | 681E | 0F53 | 949A | CA79 |

THU MAR 14 17:21:24 1991 CLIENT.EXE PAGE 13, LINE 709

| | | | | | | | | |
|---|---|---|---|---|---|---|---|---|
| 0000026100 | 8329 | 08C4 | 41E9 | E900 | 003E | 3BE9 | 3D00 | 0053 |
| 0000026120 | 0375 | ADE9 | 7EFE | E903 | 0013 | 452D | 7500 | E903 |
| 0000026140 | FE08 | 0B2D | 7500 | E903 | FF4A | 1BE9 | 2D00 | 0065 |
| 0000026160 | 0375 | F5E9 | 2DFD | 000B | 0375 | 37E9 | 2DFF | 0003 |
| 0000026200 | 0375 | 7DE9 | E9FE | 0000 | 5F5E | ED83 | 8B02 | 1FE5 |
| 0000026220 | 4D5D | 1ECB | 9058 | 5545 | EC8B | 8E1E | 81D8 | 08EC |
| 0000026240 | 5701 | 2B56 | 89C0 | FC86 | 89FE | FA86 | A1FE | 0FE0 |
| 0000026260 | 060B | 0FDE | 0374 | 78E9 | 6A00 | 6A00 | 8D00 | FA86 |
| 0000026300 | 16FE | 6A50 | 6A00 | 6A00 | 6A00 | 6A00 | 9A00 | 214A |
| 0000026320 | 0000 | 8689 | FEF8 | 006A | 006A | 046A | 681E | 0F67 |
| 0000026340 | 681E | 0FDE | 919A | 0026 | 8900 | F886 | 83FE | F8BE |
| 0000026360 | 00FE | 0375 | 1AE9 | 8100 | F8BE | ABFE | 7501 | E903 |
| 0000026400 | 000F | 681E | 0F78 | 949A | 0E79 | 832C | 04C4 | 38E9 |
| 0000026420 | 8301 | F8BE | 00FE | 0374 | 0CE9 | A100 | 0FE0 | 060B |
| 0000026440 | 0FDE | 0374 | 0AE9 | C700 | DE06 | B20F | 8C0F | E01E |
| 0000026460 | 1E0F | B468 | 8D0F | FE86 | 16FE | 9A50 | 7BA2 | 2C24 |
| 0000026500 | C483 | FF08 | E036 | FF0F | DE36 | 8D0F | FE86 | 16FE |
| 0000026520 | 9A50 | 7B5C | 2C36 | C483 | 1E08 | B968 | 8D0F | FE86 |
| 0000026540 | 16FE | 9A50 | 7B5C | 2C53 | C483 | C408 | 065E | 8A26 |
| 0000026560 | 0147 | E998 | 0098 | 681E | 0FBF | 868D | FEFE | 5016 |
| 0000026600 | 5C9A | 617B | 832C | 08C4 | 868D | FEFE | 5016 | DE9A |
| 0000026620 | 797D | 832C | 04C4 | B0E9 | E900 | 00AD | 681E | 0FC6 |
| 0000026640 | 868D | FEFE | 5016 | 5C9A | 877B | 832C | 08C4 | 868D |
| 0000026660 | FEFE | 5016 | DE9A | A87D | 832A | 04C4 | 8AE9 | E900 |
| 0000026700 | 0087 | 681E | 0FCE | 868D | FEFE | 5016 | 5C9A | AD7B |
| 0000026720 | 832C | 08C4 | 868D | FEFE | 5016 | DE9A | C57D | 832C |
| 0000026740 | 04C4 | 64E9 | E900 | 0061 | 681E | 0FD6 | 868D | FEFE |
| 0000026760 | 5016 | 5C9A | D37B | 832C | 08C4 | 868D | FEFE | 5016 |
| 0000027000 | DE9A | D97D | 832B | 04C4 | 3EE9 | E900 | 003B | 4F3D |
| 0000027020 | 7500 | E903 | FF86 | 037E | 13E9 | 2D00 | 0043 | 0375 |
| 0000027040 | 9FE9 | 2DFF | 0003 | 0375 | 4BE9 | E9FF | FFBA | 632D |
| 0000027060 | 7500 | E903 | FF8C | 032D | 7500 | E903 | FF38 | 092D |
| 0000027100 | 7500 | E903 | FF56 | 9FE9 | 5EFF | 835F | 02ED | E58B |
| 0000027120 | 5D1F | CB4D | 581E | 4590 | 8B55 | 1EEC | D88E | EC81 |
| 0000027140 | 002A | 5657 | 46C7 | D1FC | 8300 | 067E | 7402 | E903 |
| 0000027160 | 0016 | 5EC4 | 2608 | 5FC4 | 2604 | 3F80 | 7462 | E903 |
| 0000027200 | 0006 | 06C7 | 0048 | 0001 | 681E | 0FE9 | 681E | 0FE2 |
| 0000027220 | 006A | 006A | FF9A | 00FF | 8900 | FA46 | 76FF | 1EFA |
| 0000027240 | EE68 | 9A0F | 7994 | 2D8B | C483 | 8306 | FC7E | 7500 |
| 0000027260 | E903 | 021A | 681E | 0FFC | 949A | 9C79 | 832D | 04C4 |
| 0000027300 | 468D | 16D6 | 1E50 | 9268 | 9A00 | 79E2 | 2DB2 | C483 |
| 0000027320 | 8308 | 483E | 0100 | 0374 | 1FE9 | 1E00 | 0468 | 9A10 |
| 0000027340 | 7994 | 2DC2 | C483 | 1E04 | 0668 | 1E10 | A868 | 9A23 |
| 0000027360 | 793A | 2DDE | C483 | E908 | 0000 | 468A | 98D6 | 16E9 |
| 0000027400 | 8D01 | F646 | 5016 | 468D | 16D6 | 9A50 | 17BC | 2DF4 |
| 0000027420 | C483 | E908 | 01B5 | 76FF | FFF8 | F676 | 468D | 16D6 |
| 0000027440 | 9A50 | 403F | 2E0A | C483 | E908 | 019F | 76FF | FFF8 |
| 0000027460 | F676 | 468D | 16D6 | 9A50 | 4CC5 | 2E20 | C483 | E908 |
| 0000027500 | 0189 | 76FF | FFF8 | F676 | 468D | 16D6 | 9A50 | 7484 |
| 0000027520 | 2E36 | C483 | E908 | 0173 | 76FF | FFF8 | F676 | 468D |
| 0000027540 | 16D6 | 9A50 | 65BD | 2E4C | C483 | E9U8 | 015D | 76FF |
| 0000027560 | FFF8 | F676 | 468D | 16D6 | 9A50 | 5F2F | 2E62 | C483 |
| 0000027600 | E908 | 0147 | 76FF | FFF8 | F676 | 468D | 16D6 | 9A50 |
| 0000027620 | 2085 | 2E78 | C483 | E908 | 0131 | 76FF | FFF8 | F676 |
| 0000027640 | 468D | 16D6 | 9A50 | 6A4C | 2E88 | C483 | E908 | 011B |
| 0000027660 | 468D | 16D6 | 9A50 | 019B | 2E98 | C483 | E904 | 010B |
| 0000027700 | 468D | 16D6 | 9A50 | 06CD | 2EAE | C483 | E904 | 00FB |
| 0000027720 | 76FF | FFF8 | F676 | 468D | 16D6 | 9A50 | 2913 | 2EBE |
| 0000027740 | C483 | E908 | 00E5 | 468D | 16D6 | 9A50 | 2B63 | 2ED4 |

THU MAR 14 17:21:24 1991 CLIENT.EXE PAGE 14, LINE 768

| | | | | | | | | |
|---|---|---|---|---|---|---|---|---|
| 0000027760 | C483 | E904 | 00D5 | 76FF | FFF8 | F676 | 468D | 16D6 |
| 0000030000 | 9A50 | 2842 | 2FB2 | C483 | E908 | 00BF | 46C7 | 00FC |
| 0000030020 | E900 | 00B7 | B4E9 | 3D00 | 0054 | 0375 | E2E9 | 7EFE |
| 0000030040 | E903 | 006C | 483D | 7500 | E903 | FFBA | 037E | 38E9 |
| 0000030060 | 3D00 | 0043 | 0375 | 4BE9 | 7EFF | E903 | 0013 | 232D |
| 0000030100 | 7500 | E903 | FF8A | 1E2D | 7500 | E903 | FF4C | 7AE9 |
| 0000030120 | 2D00 | 0044 | 0375 | 57E9 | 48FF | 7548 | E903 | FF0E |
| 0000030140 | 7548 | E903 | FEF2 | 62E9 | 2D00 | 0049 | 093D | 7600 |
| 0000030160 | E903 | 0057 | E0D1 | 2E93 | A7FF | 2F4C | 2DE6 | 2F9B |
| 0000030200 | 2F9B | 2DFC | 2F9B | 2E12 | 2E90 | 2F9B | 2EDC | 2EC6 |
| 0000030220 | 612D | 3D00 | 0013 | 0376 | 30E9 | D100 | 93E0 | FF2E |
| 0000030240 | 73A7 | 6A2F | 9B2E | 542F | 802E | 9B2E | 3E2F | 282E |
| 0000030260 | B62E | E62E | 9B2D | 9B2F | FC2F | 9B2D | 122F | 902E |
| 0000030300 | 9B2E | DC2F | C62E | 9B2E | D12F | E92D | FDDD | 006A |
| 0000030320 | FF9A | 00FF | 8900 | FA46 | 76FF | 1EFA | 0868 | 9A10 |
| 0000030340 | 7994 | 2C9F | C483 | 8306 | 483E | 0000 | 0375 | 10E9 |
| 0000030360 | 1E00 | 9E68 | 1E00 | A868 | 9A23 | 793A | 2D76 | C483 |
| 0000030400 | 5E08 | 835F | 02ED | E58B | 5D1F | CB4D | 581E | 4590 |
| 0000030420 | 8B55 | 1EEC | D88E | EC81 | 0000 | 5657 | 76FF | FF0C |
| 0000030440 | 0A76 | 468B | 8B06 | 0856 | 0405 | 5200 | 9A50 | 7BA2 |
| 0000030460 | 2FCC | C483 | C408 | 065E | C726 | 5447 | 0007 | C726 |
| 0000030500 | 5647 | 0000 | 5EC4 | 2606 | 47C7 | 7848 | C400 | 065E |
| 0000030520 | C726 | 5C47 | 0001 | 5EC4 | 2606 | 47C7 | 035E | C404 |
| 0000030540 | 065E | C726 | 6047 | 0403 | 5EC4 | 2606 | 47C7 | 0862 |
| 0000030560 | C400 | 065E | C726 | 6447 | 0001 | 5F5E | ED83 | 8B02 |
| 0000030600 | 1FE5 | 4D5D | 1ECB | 9058 | 5545 | EC8B | 8E1E | 81D8 |
| 0000030620 | 14EC | 5700 | FF56 | 0C76 | 76FF | 8B0A | 0646 | 568B |
| 0000030640 | 0508 | 0004 | 5052 | A29A | 237B | 8331 | 08C4 | 5EC4 |
| 0000030660 | 2606 | 47C7 | 0754 | 2600 | 47C7 | 0056 | C400 | 065E |
| 0000030700 | C726 | 4847 | 0078 | 5EC4 | 2606 | 47C7 | 015C | C400 |
| 0000030720 | 065E | C726 | 5E47 | 0403 | 5EC4 | 2606 | 47C7 | 0360 |
| 0000030740 | C404 | 065E | C726 | 6247 | 0008 | 5EC4 | 2606 | 47C7 |
| 0000030760 | 0164 | C400 | 065E | 8B26 | 6847 | 8B26 | 6A57 | 4689 |
| 0000031000 | 89F6 | F856 | 5EC4 | 2606 | 478B | 8966 | EC46 | C02B |
| 0000031020 | 4689 | 89F4 | F246 | 08E9 | 8300 | F246 | 8301 | F456 |
| 0000031040 | 8300 | F47E | 7E00 | E903 | 003E | 037D | 09E9 | 8300 |
| 0000031060 | F27E | 720A | E903 | 0030 | 468B | B9EC | 000A | D22B |
| 0000031100 | F1F7 | 8A50 | F246 | 0B04 | 5098 | 76FF | FFF8 | F676 |
| 0000031120 | 969A | C07D | 8331 | 08C4 | 468B | B9EC | 000A | D22B |
| 0000031140 | F1F7 | 4601 | E9F6 | FFB1 | 5EC4 | 2606 | 478B | 2670 |
| 0000031160 | 578B | 8972 | FA46 | 5689 | C4FC | 065E | 8B26 | 6C47 |
| 0000031200 | 8B26 | 6E57 | 4689 | 89EE | F056 | 468B | 0BFC | FA46 |
| 0000031220 | 0375 | 87E9 | 8300 | F07E | 7D00 | E903 | 007E | 037E |
| 0000031240 | 09E9 | 8300 | EE7E | 7700 | E903 | 0070 | C02B | 4689 |
| 0000031260 | 89F4 | F246 | 08E9 | 8300 | F246 | 8301 | F456 | 8300 |
| 0000031300 | F47E | 7E00 | E903 | 0054 | 037D | 09E9 | 8300 | F27E |
| 0000031320 | 720A | E903 | 0046 | 76FF | FFFC | FA76 | 468A | 04F2 |
| 0000031340 | 980B | 6A50 | 6A00 | FF0A | F076 | 76FF | 9AEE | 7EC4 |
| 0000031360 | 31D6 | 5052 | FF9A | 00FF | 6A00 | 6A00 | FF0A | F076 |
| 0000031400 | 76FF | 9AEE | 7EC4 | 3000 | DB2B | C88B | 4E01 | 13FA |
| 0000031420 | B9DA | FFFF | E3D3 | 5E01 | E9FC | FF9B | 5F5E | ED83 |
| 0000031440 | 8B02 | 1FE5 | 4D5D | 1ECB | 9058 | 5545 | EC8B | 8E1E |
| 0000031460 | 81D8 | 06EC | 5700 | C456 | 065E | 8B26 | 6C47 | 8B26 |
| 0000031500 | 6E57 | 012D | 8300 | 00DA | 563B | 7E0C | E903 | 002F |
| 0000031520 | 037D | 08E9 | 3B00 | 0A46 | 0372 | 22E9 | C400 | 065E |
| 0000031540 | 8B26 | 6C47 | 8B26 | 6E57 | 012D | 8300 | 00DA | 5052 |
| 0000031560 | 681E | 1101 | 949A | A979 | 8332 | 08C4 | 62E9 | C400 |
| 0000031600 | 065E | 8B26 | 7047 | 8B26 | 7257 | 4689 | 89FA | FC56 |
| 0000031620 | 468B | 8B0A | 0C56 | 4603 | 83FA | 00D2 | 8BB9 | D332 |

THU MAR 14 17:21:24 1991 CLIENT.EXE PAGE 15, LINE 827

| | | | | | | | | |
|---|---|---|---|---|---|---|---|---|
| 0000031640 | 03E2 | FC56 | C28E | D88B | 8A26 | 2A07 | 50E4 | 468B |
| 0000031660 | 8B0A | 0C56 | 4603 | 83FA | 00D2 | E2B9 | D331 | 03E2 |
| 0000031700 | FC56 | C28E | D88B | 8A26 | 2A07 | 50E4 | 76FF | FF0C |
| 0000031720 | 0A76 | 681E | 1135 | 949A | 7979 | 8330 | 0CC4 | 00E9 |
| 0000031740 | 5E00 | 835F | 02ED | E58B | 5D1F | CB4D | 581E | 4590 |
| 0000031760 | 8B55 | 1EEC | D88E | EC81 | 0010 | 5657 | 468D | 16F8 |
| 0000032000 | 9A50 | FFFF | 0000 | 003D | 7500 | E903 | 000F | 681E |
| 0000032020 | 1159 | 949A | 3279 | 8333 | 04C4 | 81E9 | C400 | 065E |
| 0000032040 | 8B26 | 7047 | 8B26 | 7257 | 4689 | 89FA | FC56 | 76FF |
| 0000032060 | FFFC | FA76 | 468A | 2A0A | 50E4 | 5EC4 | 2606 | 77FF |
| 0000032100 | 266E | 77FF | 9A6C | FFFF | 0000 | 4689 | 89F4 | F656 |
| 0000032120 | 468B | 0BF6 | F446 | 0374 | 0FE9 | 1E00 | 7968 | 9A11 |
| 0000032140 | 7994 | 3366 | C483 | E904 | 0034 | 4E8A | 8BF8 | F646 |
| 0000032160 | 462B | D3FC | 2BE8 | 2BC9 | FA4E | 001D | 0300 | F44E |
| 0000032200 | 0015 | 8900 | F04E | 4689 | FFF2 | F276 | 76FF | 1EF0 |
| 0000032220 | A568 | 9A11 | 7994 | 3247 | C483 | E908 | 0000 | 5F5E |
| 0000032240 | ED83 | 8B02 | 1FE5 | 4D5D | 1ECB | 9058 | 5545 | EC8B |
| 0000032260 | 8E1E | 81D8 | 10EC | 5700 | 8356 | 0C7E | 7C00 | E903 |
| 0000032300 | 000F | 681E | 11B6 | 949A | BA79 | 8333 | 04C4 | 0EE9 |
| 0000032320 | 8D01 | F846 | 5016 | D29A | 0032 | 3D00 | 0000 | 0375 |
| 0000032340 | 0FE9 | 1E00 | E668 | 9A11 | 7994 | 3402 | C483 | E904 |
| 0000032360 | 00ED | 5EC4 | 2606 | 478B | 266C | 578B | 2D6E | 0001 |
| 0000032400 | DA83 | 3B00 | 0C56 | 037E | 2FE9 | 7D00 | E903 | 0008 |
| 0000032420 | 463B | 720A | E903 | 0022 | 5EC4 | 2606 | 478B | 266C |
| 0000032440 | 578B | 2D6E | 0001 | DA83 | 5200 | 1E50 | 0668 | 9A12 |
| 0000032460 | 7994 | 3465 | C483 | E908 | 00A5 | 468B | 8B0A | 0C56 |
| 0000032500 | 5EC4 | 2606 | 4703 | 8370 | 00D2 | 6DB9 | D332 | 26E2 |
| 0000032520 | 5703 | 8972 | FA46 | 5689 | FFFC | FC76 | 76FF | 8AFA |
| 0000032540 | 0E46 | E42A | C450 | 065E | 8B26 | 6C47 | 8B26 | 6E57 |
| 0000032560 | 462B | 1B0A | 0C56 | 5052 | FF9A | 00FF | 8900 | F446 |
| 0000032600 | 5689 | 8BF6 | F646 | 460B | 74F4 | E903 | 000F | 681E |
| 0000032620 | 123E | 949A | A779 | 8334 | 04C4 | 42E9 | 8A00 | F84E |
| 0000032640 | 468B | 2BF6 | FC46 | E8D3 | C92B | 4E2B | 1DFA | 0000 |
| 0000032660 | 4E03 | 15F4 | 0000 | 4E89 | 89F0 | F246 | 468B | 8BF0 |
| 0000032700 | F256 | 4603 | 130A | 0C56 | 5052 | 76FF | FFF2 | F076 |
| 0000032720 | 681E | 1273 | 949A | E579 | 8332 | 0CC4 | 00E9 | 5E00 |
| 0000032740 | 835F | 02ED | E58B | 5D1F | CB4D | 581E | 4590 | 8B55 |
| 0000032760 | 1EEC | D88E | EC81 | 000C | 5657 | 46C6 | 6FF4 | 7E80 |
| 0000033000 | 71F4 | 0375 | 4CE9 | 8001 | F47E | 7551 | E903 | 0143 |
| 0000033020 | 681E | 12AE | 949A | FD79 | 8334 | 04C4 | 468D | 16F6 |
| 0000033040 | 8D50 | F446 | 5016 | 681E | 12F2 | E29A | 9979 | 8333 |
| 0000033060 | 0CC4 | 068E | 2D0A | 8326 | 483E | 0100 | 0374 | 1FE9 |
| 0000033100 | 1E00 | FB68 | 9A12 | 7994 | 3528 | C483 | 1E04 | FD68 |
| 0000033120 | 1E12 | A868 | 9A23 | 793A | 3544 | C483 | E908 | 0000 |
| 0000033140 | 468A | 98F4 | A4E9 | 8A00 | F646 | FF50 | 0876 | 76FF |
| 0000033160 | 9A06 | 32BC | 355B | C483 | E906 | 00D4 | 76FF | FFF8 |
| 0000033200 | F676 | 76FF | FF08 | 0676 | F79A | 6A31 | 8335 | 08C4 |
| 0000033220 | 8DE9 | 1E0C | FF68 | 9A12 | 7994 | 357B | C483 | 8D04 |
| 0000033240 | FA46 | 5016 | 681E | 1320 | E29A | 9679 | 8335 | 08C4 |
| 0000033260 | 068E | 2D0A | 8326 | 483E | 0100 | 0374 | 1FE9 | 1E00 |
| 0000033300 | 2568 | 9A13 | 7994 | 35A6 | C483 | 1E04 | 2768 | 1E13 |
| 0000033320 | A868 | 9A23 | 793A | 35C1 | C483 | E908 | 0000 | 468A |
| 0000033340 | 50F6 | 76FF | FFFC | FA76 | 76FF | FF08 | 0676 | 799A |
| 0000033360 | D333 | 8335 | 0AC4 | 57E9 | E900 | 0057 | 681E | 1329 |
| 0000033400 | 949A | E779 | 8334 | 04C4 | 45E9 | 3D00 | 0056 | 0375 |
| 0000033420 | 54E9 | 7EFF | E903 | 0018 | 4E2D | 7500 | E903 | FF73 |
| 0000033440 | 7548 | E903 | FF56 | 4848 | 0375 | CCE9 | E9FF | FFCC |
| 0000033460 | 6E2D | 7500 | E903 | FF5B | 7548 | E903 | FF3E | 4848 |
| 0000033500 | 0375 | B4E9 | 2DFF | 0005 | 0375 | 1AE9 | E9FF | FFAC |

THU MAR 14 17:21:24 1991 CLIENT.EXE PAGE 16, LINE 886

| | | | | | | | | |
|---|---|---|---|---|---|---|---|---|
| 0000033520 | ABE9 | 5EFE | 835F | 02ED | E58B | 5D1F | CB4D | 581E |
| 0000033540 | 4590 | 8B55 | 1EEC | D88E | EC81 | 0006 | 5657 | 468B |
| 0000033560 | 0B08 | 0646 | 0375 | E0E9 | 8300 | 0A7E | 7700 | E903 |
| 0000033600 | 00D7 | 681E | 1342 | 949A | A779 | 8336 | 04C4 | C02B |
| 0000033620 | 4689 | 89FC | FA46 | 08E9 | 8300 | FA46 | 8301 | FC56 |
| 0000033640 | 8300 | FC7E | 7E00 | E903 | 00AF | 037D | 09E9 | 8300 |
| 0000033660 | FA7E | 720A | E903 | 00A1 | 068E | 2D0A | 8326 | 483E |
| 0000033700 | 0000 | 0375 | 18E9 | C400 | 065E | 8A26 | 2A07 | 50E4 |
| 0000033720 | 681E | 134B | 949A | C579 | 8336 | 06C4 | 1BE9 | C400 |
| 0000033740 | 065E | 8A26 | 2A07 | 50E4 | 76FF | FF08 | 0676 | 681E |
| 0000033760 | 1357 | 949A | F679 | 8336 | 0AC4 | 468B | B90A | 0014 |
| 0000034000 | D22B | F1F7 | 4601 | 8E06 | 0A06 | 262D | 3E83 | 0048 |
| 0000034020 | 7500 | E903 | 0018 | 5EC4 | 2606 | 078A | E42A | 1E50 |
| 0000034040 | 6968 | 9A13 | 7994 | 3518 | C483 | E906 | 001B | 5EC4 |
| 0000034060 | 2606 | 078A | E42A | FF50 | 0876 | 76FF | 1E06 | 7068 |
| 0000034100 | 9A13 | 7994 | 3659 | C483 | 8B0A | 0A46 | 14B9 | 2B00 |
| 0000034120 | F7D2 | 01F1 | 0646 | 40E9 | 5EFF | 835F | 02ED | E58B |
| 0000034140 | 5D1F | CB4D | 581E | 4590 | 8B55 | 1EEC | D88E | EC81 |
| 0000034160 | 0006 | 5657 | 468B | 0B08 | 0646 | 0375 | 14E9 | 8301 |
| 0000034200 | 0C7E | 7D00 | E903 | 010B | 037E | 09E9 | 8300 | 0A7E |
| 0000034220 | 7700 | E903 | 00FD | 681E | 137D | 949A | BB79 | 8337 |
| 0000034240 | 04C4 | C02B | 4689 | 89FC | FA46 | 08E9 | 8300 | FA46 |
| 0000034260 | 8301 | FC56 | 8300 | FC7E | 7E00 | E903 | 00D5 | 037D |
| 0000034300 | 09E9 | 8300 | FA7E | 720A | E903 | 00C7 | 068E | 2D0A |
| 0000034320 | 8326 | 483E | 0000 | 0375 | 18E9 | C400 | 065E | 8A26 |
| 0000034340 | 2A07 | 50E4 | 681E | 1389 | 949A | D979 | 8337 | 06C4 |
| 0000034360 | 1BE9 | C400 | 065E | 8A26 | 2A07 | 50E4 | 76FF | FF08 |
| 0000034400 | 0676 | 681E | 1395 | 949A | EB79 | 8337 | 0AC4 | 006A |
| 0000034420 | 146A | 76FF | FF0C | 0A76 | C49A | 1D7E | 2B38 | 8BDB |
| 0000034440 | 01C8 | 064E | DA13 | 59B9 | D338 | 01E3 | 085E | 068E |
| 0000034460 | 2D0A | 8326 | 483E | 0000 | 0375 | 18E9 | C400 | 065E |
| 0000034500 | 8A26 | 2A07 | 50E4 | 681E | 13A7 | 949A | 3B79 | 8338 |
| 0000034520 | 06C4 | 1BE9 | C400 | 065E | 8A26 | 2A07 | 50E4 | 76FF |
| 0000034540 | FF08 | 0676 | 681E | 13AE | 949A | 4D79 | 8338 | 0AC4 |
| 0000034560 | 006A | 146A | 76FF | FF0C | 0A76 | C49A | 147E | 2B37 |
| 0000034600 | 8BDB | 01C8 | 064E | DA13 | 1BB9 | D334 | 01E3 | 085E |
| 0000034620 | 1AE9 | 5EFF | 835F | 02ED | E58B | 5D1F | CB4D | 581E |
| 0000034640 | 4590 | 8B55 | 1EEC | D88E | EC81 | 0010 | 5657 | 5EC4 |
| 0000034660 | 2606 | 77FF | 266E | 77FF | C46C | 065E | FF26 | 6677 |
| 0000034700 | 5EC4 | 2606 | 77FF | 8B48 | 0646 | 568B | 0508 | 0024 |
| 0000034720 | 5052 | 468B | 8B06 | 0856 | 0405 | 5200 | 1E50 | BB68 |
| 0000034740 | 9A13 | 7994 | 38DC | C483 | C414 | 065E | FF26 | 6277 |
| 0000034760 | 5EC4 | 2606 | 77FF | C460 | 065E | FF26 | 5E77 | 5EC4 |
| 0000035000 | 2606 | 77FF | 1E5C | F868 | 9A13 | 7994 | 3905 | C483 |
| 0000035020 | C40C | 065E | FF26 | 4A77 | 5EC4 | 2606 | 77FF | 264E |
| 0000035040 | 77FF | C44C | 065E | FF26 | 4677 | FF26 | 4477 | 681E |
| 0000035060 | 142C | 949A | 3179 | 8339 | 0EC4 | 5EC4 | 2606 | 478B |
| 0000035100 | 2668 | 578B | 896A | F646 | 5689 | C4F8 | 065E | 8B26 |
| 0000035120 | 6647 | 4689 | FFF0 | F076 | 76FF | FFF8 | F676 | 2E9A |
| 0000035140 | 6736 | 8339 | 06C4 | 5EC4 | 2606 | 478B | 2670 | 578B |
| 0000035160 | 8972 | FA46 | 5689 | C4FC | 065E | 8B26 | 6C47 | 8B26 |
| 0000035200 | 6E57 | 4689 | 89F2 | F456 | 76FF | FFF4 | F276 | 76FF |
| 0000035220 | FFFC | FA76 | 349A | 6D37 | 8337 | 08C4 | 5F5E | ED83 |
| 0000035240 | 8B02 | 1FE5 | 4D5D | 1ECB | 9058 | 5545 | EC8B | 8E1E |
| 0000035260 | 81D8 | DEEC | 5700 | 1E56 | 1C68 | 1E10 | 6268 | 9A14 |
| 0000035300 | 7994 | 39AF | C483 | 8D08 | 2286 | 16FF | 8D50 | F846 |
| 0000035320 | 5016 | 868D | FF24 | 5016 | 681E | 148A | E29A | CA79 |
| 0000035340 | 8339 | 10C4 | 068E | 2D0A | 8326 | 483E | 0100 | 0374 |
| 0000035360 | 1FE9 | 1E00 | 9568 | 9A14 | 7994 | 39DA | C483 | 1E04 |

THU MAR 14 17:21:24 1991 CLIENT.EXE PAGE 17, LINE 945

| | | | | | | | | |
|---|---|---|---|---|---|---|---|---|
| 0000035400 | 9768 | 1E14 | A868 | 9A23 | 793A | 3A10 | C483 | E908 |
| 0000035420 | 0000 | 76FF | FF0C | 0A76 | 868D | FF24 | 5016 | B6FF |
| 0000035440 | FF22 | 76FF | FFFA | F876 | 868D | FF44 | 5016 | FF9A |
| 0000035460 | 00FF | 8900 | FC46 | 76FF | 1EFC | 9968 | 9A14 | 7994 |
| 0000035500 | 3A39 | C483 | 8306 | FC7E | 7400 | E903 | 00B9 | 868D |
| 0000035520 | FF68 | 5016 | 868D | FF48 | 5016 | B6FF | FF46 | B6FF |
| 0000035540 | FF44 | 681E | 14AF | 949A | 5179 | 833A | 10C4 | 76FF |
| 0000035560 | FF8E | 8C76 | 76FF | FF92 | 9076 | 681E | 14D7 | 949A |
| 0000035600 | 5E79 | 833A | 0CC4 | 468D | 1694 | 9A50 | 7D0A | 3A72 |
| 0000035620 | C483 | 5204 | FF50 | 9276 | 76FF | 1E90 | 0D68 | 9A15 |
| 0000035640 | 7994 | 3A8D | C483 | FF0C | A076 | 76FF | FF9E | 9C76 |
| 0000035660 | 76FF | FF9A | 9876 | 681E | 1533 | 949A | A279 | 833A |
| 0000035700 | 0EC4 | 76FF | FFA6 | A476 | 76FF | 1EA2 | 7368 | 9A15 |
| 0000035720 | 7994 | 3AB1 | C483 | FF0A | A876 | 681E | 159D | 949A |
| 0000035740 | C079 | 833A | 06C4 | 76FF | 1EAA | B668 | 9A15 | 7994 |
| 0000035760 | 3AD2 | C483 | FF06 | B276 | 76FF | 1EB0 | CC68 | 9A15 |
| 0000036000 | 7994 | 38B4 | C483 | 5E08 | 835F | 02ED | E58B | 5D1F |
| 0000036020 | CB4D | 581E | 4590 | 8B55 | 1EEC | D88E | EC81 | 0012 |
| 0000036040 | 5657 | 46C7 | 00FA | FF00 | 0876 | 76FF | FF06 | 0C76 |
| 0000036060 | 76FF | FF0A | 0E76 | 76FF | FF10 | 1276 | 468D | 16FC |
| 0000036100 | 8D50 | EE46 | 5016 | FF9A | 00FF | 8900 | FA46 | 7E83 |
| 0000036120 | 00FA | 0375 | 06E9 | 8B00 | FA46 | BEE9 | FF01 | FC76 |
| 0000036140 | 681E | 15E2 | 949A | 9479 | 833B | 06C4 | 5EC4 | 260A |
| 0000036160 | 7F83 | 0066 | 0377 | 1CE9 | FF00 | 0876 | 76FF | FF06 |
| 0000036200 | FC76 | 5EC4 | 260A | 77FF | 266A | 77FF | 9A68 | FFFF |
| 0000036220 | 0000 | 4689 | 83FA | FA7E | 7500 | E903 | 0031 | 76FF |
| 0000036240 | FF08 | 0676 | 76FF | 8DFC | EE46 | 5016 | 76FF | FF16 |
| 0000036260 | 1476 | 999A | 003C | 8900 | F646 | 76FF | 1EF6 | F068 |
| 0000036300 | 9A15 | 7994 | 3C08 | C483 | 8B06 | FA46 | 4CE9 | C401 |
| 0000036320 | 0A5E | 8326 | 6E7F | 7D00 | E903 | 010C | 037E | 0AE9 |
| 0000036340 | 2600 | 7F83 | 006C | 0377 | FDE9 | C700 | F846 | 0000 |
| 0000036360 | 03E9 | FF00 | F846 | 5EC4 | 260A | 478B | 4862 | 5EC4 |
| 0000036400 | 2B0A | 26D2 | 77F7 | 4064 | 463B | 77F8 | E903 | 00D8 |
| 0000036420 | 006A | 76FF | C4F8 | 0A5E | 8B26 | 6247 | C448 | 0A5E |
| 0000036440 | D22B | F726 | 6477 | 6A40 | 5000 | 5EC4 | 260A | 77FF |
| 0000036460 | 266E | 77FF | 9A6C | 7EC4 | 3C0F | 5052 | 5E9A | 597F |
| 0000036500 | C43C | 0A5E | 0326 | 7047 | D283 | B900 | 37F7 | E2D3 |
| 0000036520 | 0326 | 7257 | 4689 | 89F2 | F456 | 76FF | FFF0 | EE76 |
| 0000036540 | 76FF | FFF4 | F276 | 5EC4 | 260A | 478B | 4862 | 5EC4 |
| 0000036560 | 2B0A | 26D2 | 77F7 | 4064 | 006A | C450 | 0A5E | FF26 |
| 0000036600 | 6E77 | FF26 | 6C77 | C49A | AA7E | 523C | 9A50 | FFFF |
| 0000036620 | 0000 | 76FF | FF08 | 0676 | 76FF | FFFC | F876 | 468D |
| 0000036640 | 16EE | 9A50 | FFFF | 0000 | 4689 | 83FA | FA7E | 7500 |
| 0000036660 | E903 | 0031 | 76FF | FF08 | 0676 | 76FF | 8DFC | EE46 |
| 0000036700 | 5016 | 76FF | FF16 | 1476 | CD9A | 003C | 8900 | F646 |
| 0000036720 | 76FF | 1EF6 | 1068 | 9A16 | 7994 | 3992 | C483 | 8B06 |
| 0000036740 | FA46 | 36E9 | E900 | FF0B | 76FF | FF08 | 0676 | 76FF |
| 0000036760 | 8DFC | EE46 | 5016 | 76FF | FF16 | 1476 | FF9A | 00FF |
| 0000037000 | 8900 | FA46 | 76FF | FF08 | 0676 | 76FF | FF0C | 0A76 |
| 0000037020 | FF9A | 00FF | 8B00 | FA46 | 00E9 | 5E00 | 835F | 02ED |
| 0000037040 | E58B | 5D1F | CB4D | 581E | 4590 | 8B55 | 1EEC | D88E |
| 0000037060 | EC81 | 00C0 | 5657 | 76FF | FF08 | 0676 | 76FF | FF0C |
| 0000037100 | 0A76 | 76FF | FF0E | 1276 | 76FF | 6A10 | FF00 | 1676 |
| 0000037120 | 76FF | 9A14 | FFFF | 0000 | 4689 | 83F6 | F67E | 7500 |
| 0000037140 | E903 | 0021 | 76FF | FF08 | 0676 | 5EC4 | 2614 | 77FF |
| 0000037160 | 2602 | 37FF | 006A | 006A | 006A | 3D9A | 003E | 8B00 |
| 0000037200 | F646 | DFE9 | C402 | 145E | C426 | 261F | 77FF | 2672 |
| 0000037220 | 77FF | 6A70 | C400 | 145E | C426 | 261F | 77FF | 266E |
| 0000037240 | 77FF | 9A6C | 31C5 | 0000 | 76FF | FF08 | 0676 | 76FF |

THU MAR 14 17:21:24 1991 CLIENT.EXE PAGE 18, LINE 1004

| | | | | | | | | |
|---|---|---|---|---|---|---|---|---|
| 0000037260 | FF0C | 0A76 | 76FF | FF0E | 1276 | 76FF | 6A10 | 6A00 |
| 0000037300 | 6A00 | 8D00 | FC46 | 5016 | 8E8D | FF40 | 5116 | 568D |
| 0000037320 | 16F8 | 9A52 | FFFF | 0000 | 4689 | C4F6 | 145E | C426 |
| 0000037340 | 261F | 478B | 2668 | 578B | 896A | A846 | 5689 | C4AA |
| 0000037360 | 145E | C426 | 261F | 478B | 2670 | 578B | 8972 | B046 |
| 0000037400 | 5689 | 68B2 | 00B4 | 868D | FF40 | 5016 | 5EC4 | 2614 |
| 0000037420 | 77FF | 2602 | 37FF | 389A | 7B7D | 833F | 0AC4 | 5EC4 |
| 0000037440 | 2614 | 1FC4 | 8326 | 667F | 7700 | E903 | 00A9 | 76FF |
| 0000037460 | FF08 | 0676 | 76FF | C4FC | 145E | C426 | 261F | 77FF |
| 0000037500 | 266A | 77FF | 9A68 | FFFF | 0000 | 4689 | 83F6 | F67E |
| 0000037520 | 7500 | E903 | 0021 | 76FF | FF08 | 0676 | 5EC4 | 2614 |
| 0000037540 | 77FF | 2602 | 37FF | 006A | 006A | 006A | 9D9A | 003E |
| 0000037560 | 8B00 | F646 | EDE9 | FF01 | 0876 | 76FF | FF06 | FC76 |
| 0000037600 | 006A | 5EC4 | 2614 | 1FC4 | FF26 | 6A77 | FF26 | 6877 |
| 0000037620 | FF9A | 00FF | 8900 | F646 | 7E83 | 00F6 | 0375 | 36E9 |
| 0000037640 | FF00 | 0876 | 76FF | FF06 | FC76 | 006A | 468D | 16F8 |
| 0000037660 | 9A50 | 3F25 | 0000 | 76FF | FF08 | 0676 | 5EC4 | 2614 |
| 0000037700 | 77FF | 2602 | 37FF | 006A | 006A | 006A | 409A | 003F |
| 0000037720 | 8B00 | F646 | 8DE9 | C401 | 145E | C426 | 261F | 7F83 |
| 0000037740 | 006E | 037D | 23E9 | 7E01 | E903 | 000A | 8326 | 6C7F |
| 0000037760 | 7700 | E903 | 0114 | 46C7 | 00F4 | E900 | 0003 | 46FF |
| 0000040000 | C4F4 | 145E | C426 | 261F | 478B | 4862 | 5EC4 | 2614 |
| 0000040020 | 1FC4 | D22B | F726 | 6477 | 3B40 | F446 | 0377 | E9E9 |
| 0000040040 | FF00 | 0876 | 76FF | FF06 | FC76 | 76FF | FFF4 | FA76 |
| 0000040060 | 76FF | 9AF8 | FFFF | 0000 | 4689 | 83F6 | F67E | 7500 |
| 0000040100 | E903 | 0036 | 76FF | FF08 | 0676 | 76FF | 6AFC | 8D00 |
| 0000040120 | F846 | 5016 | EB9A | 003F | FF00 | 0876 | 76FF | C406 |
| 0000040140 | 145E | FF26 | 0277 | FF26 | 6A37 | 6A00 | 6A00 | 9A00 |
| 0000040160 | FFFF | 0000 | 468B | E9F6 | 00EA | 006A | 76FF | C4F4 |
| 0000040200 | 145E | C426 | 261F | 478B | 4862 | 5EC4 | 2614 | 1FC4 |
| 0000040220 | D22B | F726 | 6477 | 6A40 | 5000 | 5EC4 | 2614 | 1FC4 |
| 0000040240 | FF26 | 6E77 | FF26 | 6C77 | C49A | 827E | 523F | 9A50 |
| 0000040260 | 7F5E | 3FCE | 5EC4 | 2614 | 1FC4 | 0326 | 7047 | D283 |
| 0000040300 | B900 | 3C1C | E2D3 | 0326 | 7257 | 5052 | 76FF | FFFA |
| 0000040320 | F876 | 5EC4 | 2614 | 1FC4 | 8B26 | 6247 | C448 | 145E |
| 0000040340 | C426 | 2B1F | 26D2 | 77F7 | 4064 | 006A | C450 | 145E |
| 0000040360 | C426 | 261F | 77FF | 266E | 77FF | 9A6C | 7EC4 | 3FFC |
| 0000040400 | 5052 | 5E9A | 003C | E900 | FEF4 | 76FF | FF08 | 0676 |
| 0000040420 | 76FF | 6AFC | 8D00 | F846 | 5016 | FF9A | 00FF | 8900 |
| 0000040440 | F646 | 76FF | 1EF6 | 3068 | 9A16 | 7994 | 3B37 | C483 |
| 0000040460 | FF06 | 0876 | 76FF | C406 | 145E | FF26 | 0277 | FF26 |
| 0000040500 | 6A37 | 6A00 | 6A00 | 9A00 | 3D4B | 0000 | 4689 | FFF6 |
| 0000040520 | F676 | 681E | 1645 | 949A | E979 | 833D | 06C4 | 468B |
| 0000040540 | E9F6 | 0000 | 5F5E | ED83 | 8B02 | 1FE5 | 4D5D | 1ECB |
| 0000040560 | 9058 | 5545 | EC8B | 8E1E | 81D8 | 44EC | 5701 | C756 |
| 0000040600 | F886 | 00FE | 2B00 | 89C0 | FC86 | 89FE | FA86 | C7FE |
| 0000040620 | BE46 | 0000 | 46C7 | 00D0 | 2B00 | 89C0 | CE46 | 4689 |
| 0000040640 | C6CC | D246 | C400 | 065E | 8A26 | 0147 | E998 | 0BC1 |
| 0000040660 | 681E | 1076 | 681E | 1657 | 949A | B279 | 8340 | 08C4 |
| 0000040700 | 468D | 16D0 | 8D50 | BE46 | 5016 | 868D | FEFA | 5016 |
| 0000040720 | 868D | FEF8 | 5016 | 468D | 16D2 | 1E50 | 5A68 | 9A16 |
| 0000040740 | 79E2 | 40CD | C483 | 8E18 | 0A06 | 262D | 3E83 | 0048 |
| 0000040760 | 7401 | E903 | 001F | 681E | 166A | 949A | DD79 | 8340 |
| 0000041000 | 04C4 | 681E | 166C | 681E | 23A8 | 3A9A | 0E79 | 8341 |
| 0000041020 | 08C4 | 00E9 | FF00 | 0C76 | 76FF | FF0A | F8B6 | FFFE |
| 0000041040 | FCB6 | FFFE | FAB6 | 8DFE | CC46 | 5016 | FF9A | 00FF |
| 0000041060 | 8900 | C246 | 76FF | 1EC2 | 6E68 | 9A16 | 7994 | 412D |
| 0000041100 | C483 | 8306 | C27E | 7500 | E903 | 0003 | 9BE9 | 8D0B |
| 0000041120 | D246 | 5016 | 76FF | FFCE | CC76 | 559A | 3930 | 8341 |

THU MAR 14 17:21:24 1991 CLIENT.EXE PAGE 19, LINE 1063

| | | | | | | | | |
|---|---|---|---|---|---|---|---|---|
| 0000041140 | 08C4 | 681E | 1681 | 949A | 5279 | 8341 | 04C4 | 868D |
| 0000041160 | FEC8 | 5016 | FF9A | 00FF | FF00 | 0876 | 76FF | 9A06 |
| 0000041200 | 7BD8 | 4195 | C483 | 3D04 | 0003 | 0374 | 41E9 | C400 |
| 0000041220 | 065E | 8026 | 027F | 756C | E903 | 000D | 5EC4 | 2606 |
| 0000041240 | 7F80 | 4C02 | 0374 | 27E9 | 8D00 | B846 | 5016 | 006A |
| 0000041260 | 76FF | FFD0 | BE76 | 76FF | FFCE | CC76 | 76FF | FF0C |
| 0000041300 | 0A76 | E29A | 293A | 8340 | 12C4 | 4689 | E9C2 | 0021 |
| 0000041320 | 76FF | FF0C | 0A76 | 76FF | FFCE | CC76 | 76FF | FFBE |
| 0000041340 | D076 | 006A | 468D | 16B8 | 9A50 | FFFF | 0000 | 4689 |
| 0000041360 | 8DC2 | F246 | 5016 | F09A | 0042 | 8A00 | F246 | E42A |
| 0000041400 | 8E8A | FEC8 | ED2A | C12B | C06B | 8A3C | C98E | 2AFE |
| 0000041420 | 2BED | 8AC1 | F34E | ED2A | C103 | C06B | 8A3C | CA8E |
| 0000041440 | 2AFE | 2BED | 8AC1 | F44E | ED2A | C103 | 8689 | FEC6 |
| 0000041460 | DF9B | C686 | 8AFE | F546 | E42A | 8E8A | FECB | ED2A |
| 0000041500 | C12B | 8689 | FEC4 | DF9B | C486 | 9BFE | 0ED8 | 2D0C |
| 0000041520 | DE9B | 9BC1 | 5ED9 | 90C4 | 8E9B | 0A06 | 262D | 3E83 |
| 0000041540 | 0048 | 7500 | E903 | 002A | D99B | C446 | 909A | 877F |
| 0000041560 | 2B42 | C7D2 | C286 | 00FE | C700 | C086 | 00FE | 8900 |
| 0000041600 | BE96 | 89FE | BC86 | 9BFE | AEDF | FEBC | D99B | C45E |
| 0000041620 | 9B90 | D99B | C446 | EC83 | 8B08 | 9BDC | DD36 | 901F |
| 0000041640 | FF9B | BA76 | 76FF | FFB8 | BA76 | 76FF | FFB8 | C276 |
| 0000041660 | 681E | 1690 | 949A | 9A79 | 8342 | 16C4 | 2BE9 | 1EDA |
| 0000041700 | 1C68 | 1E10 | BD68 | 9A16 | 7994 | 42B6 | C483 | 8D08 |
| 0000041720 | F686 | 16FE | 8D50 | B846 | 5016 | 468D | 16D2 | 1E50 |
| 0000041740 | E568 | 9A16 | 79E2 | 42D1 | C483 | 8E10 | 0A06 | 262D |
| 0000041760 | 3E83 | 0048 | 7401 | E903 | 001F | 681E | 16EF | 949A |
| 0000042000 | E179 | 8342 | 04C4 | 681E | 16F1 | 681E | 23A8 | 3A9A |
| 0000042020 | FD79 | 8342 | 08C4 | 00E9 | 8D00 | C886 | 16FE | 9A50 |
| 0000042040 | 4376 | 0000 | 76FF | FF08 | 0676 | D89A | 417B | 8343 |
| 0000042060 | 04C4 | 033D | 7400 | E903 | 0042 | 5EC4 | 2606 | 7F80 |
| 0000042100 | 6C02 | 0375 | 0DE9 | C400 | 065E | 8026 | 027F | 744C |
| 0000042120 | E903 | 0028 | 468D | 16CC | FF50 | BA76 | 76FF | FFB8 |
| 0000042140 | F6B6 | 8DFE | D246 | 5016 | 76FF | FF0C | 0A76 | F69A |
| 0000042160 | EE3C | 8343 | 12C4 | 4689 | E9C2 | 0024 | 76FF | FF0C |
| 0000042200 | 0A76 | 468D | 16D2 | FF50 | F6B6 | FFFE | BA76 | 76FF |
| 0000042220 | 6AB8 | 8D00 | CC46 | 5016 | 249A | 003D | 8900 | C246 |
| 0000042240 | 468D | 16F2 | 9A50 | 4145 | 0000 | 468A | 2AF2 | 8AE4 |
| 0000042260 | C88E | 2AFE | 2BED | 6BC1 | 3CC0 | 8E8A | FEC9 | ED2A |
| 0000042300 | C12B | 4E8A | 2AF3 | 03ED | 6BC1 | 3CC0 | 8E8A | FECA |
| 0000042320 | ED2A | C12B | 4E8A | 2AF4 | 03ED | 89C1 | BC86 | 9BFE |
| 0000042340 | 86DF | FEBC | 468A | 2AF5 | 8AE4 | CB8E | 2AFE | 2BED |
| 0000042360 | 89C1 | C486 | 9BFE | 86DF | FEC4 | D89B | 0C0E | 9B2D |
| 0000042400 | C1DE | D99B | C45E | 9B90 | 068E | 2D0A | 8326 | 483E |
| 0000042420 | 0000 | 0375 | 2AE9 | 9B00 | 46D9 | 9AC4 | 7F90 | 442A |
| 0000042440 | D22B | 86C7 | FEC2 | 0000 | 86C7 | FEC0 | 0000 | 9689 |
| 0000042460 | FEBE | 8689 | FEBC | DF9B | BCAE | 9BFE | 5ED9 | 90C4 |
| 0000042500 | 9B9B | 46D9 | 83C4 | 08EC | DC8B | 369B | 1FDD | 9B90 |
| 0000042520 | 76FF | 1EC2 | F368 | 9A16 | 7994 | 4444 | C483 | 830E |
| 0000042540 | C27E | 7500 | E903 | 0003 | 7FE9 | FF08 | CE76 | 76FF |
| 0000042560 | 9ACC | 386E | 446D | C483 | FF04 | 0C76 | 76FF | FF0A |
| 0000042600 | CE76 | 76FF | 6ACC | 6A00 | 6A00 | 9A00 | 4018 | 0000 |
| 0000042620 | 4689 | FFC2 | C276 | 681E | 1713 | 949A | 8079 | 8344 |
| 0000042640 | 06C4 | 45E9 | 1E08 | 1C68 | 1E10 | 2868 | 9A17 | 7994 |
| 0000042660 | 449C | C483 | 8D08 | F686 | 16FE | 8D50 | B846 | 5016 |
| 0000042700 | 468D | 16D2 | 1E50 | 5068 | 9A17 | 79E2 | 44B7 | C483 |
| 0000042720 | 8E10 | 0A06 | 262D | 3E83 | 0048 | 7401 | E903 | 001F |
| 0000042740 | 681E | 175A | 949A | C779 | 8344 | 04C4 | 681E | 175C |
| 0000042760 | 681E | 23A8 | 3A9A | 8B79 | 8340 | 08C4 | 00E9 | 8D00 |
| 0000043000 | C886 | 16FE | 9A50 | 4504 | 0000 | 76FF | FF0C | 0A76 |

THU MAR 14 17:21:24 1991 CLIENT.EXE PAGE 20, LINE 1122

| | | | | | | | | |
|---|---|---|---|---|---|---|---|---|
| 0000043020 | 468D | 16D2 | FF50 | F6B6 | FFFE | BA76 | 76FF | 6AB8 |
| 0000043040 | 8D00 | CC46 | 5016 | 699A | 0043 | 8900 | C246 | 468D |
| 0000043060 | 16F2 | 9A50 | 41C7 | 0000 | 468A | 2AF2 | 8AE4 | C88E |
| 0000043100 | 2AFE | 2BED | 6BC1 | 3CC0 | 8E8A | FEC9 | ED2A | C12B |
| 0000043120 | 4E8A | 2AF3 | 03ED | 6BC1 | 3CC0 | 8E8A | FECA | ED2A |
| 0000043140 | C12B | 4E8A | 2AF4 | 03ED | 89C1 | BC86 | 9BFE | 86DF |
| 0000043160 | FEBC | 468A | 2AF5 | 8AE4 | CB8E | 2AFE | 2BED | 89C1 |
| 0000043200 | C486 | 9BFE | 86DF | FEC4 | D89B | 0C0E | 9B2D | C1DE |
| 0000043220 | D99B | C45E | 9B90 | 068E | 2D0A | 8326 | 483E | 0000 |
| 0000043240 | 0375 | 2AE9 | 9B00 | 46D9 | 9AC4 | 7F90 | 45B8 | D22B |
| 0000043260 | 86C7 | FEC2 | 0000 | 86C7 | FEC0 | 0000 | 9689 | FEBE |
| 0000043300 | 8689 | FEBC | DF9B | BCAE | 9BFE | 5ED9 | 90C4 | 9B9B |
| 0000043320 | 46D9 | 83C4 | 03EC | DC8B | 369B | 1FDD | 9B90 | 76FF |
| 0000043340 | 1EC2 | 5E68 | 9A17 | 7994 | 45E2 | C483 | 830E | C27E |
| 0000043360 | 7500 | E903 | 0003 | F1E9 | C406 | CC5E | 8B26 | 7247 |
| 0000043400 | 0B26 | 7047 | 0375 | 11E9 | FF00 | CE76 | 76FF | 9ACC |
| 0000043420 | 34BA | 45F1 | C483 | E904 | 000C | 681E | 177E | 949A |
| 0000043440 | 1A79 | 8346 | 04C4 | 76FF | FF0C | 0A76 | 76FF | FFCE |
| 0000043460 | CC76 | 006A | 006A | 006A | 5C9A | 0044 | 8900 | C246 |
| 0000043500 | 76FF | 1EC2 | 9768 | 9A17 | 7994 | 462D | C483 | E906 |
| 0000043520 | 0698 | 681E | 101C | 681E | 17AC | 949A | 4979 | 8346 |
| 0000043540 | 08C4 | 868D | FEF6 | 5016 | 468D | 16B8 | 8D50 | D246 |
| 0000043560 | 5016 | 681E | 17D4 | E29A | 6479 | 8346 | 10C4 | 068E |
| 0000043600 | 2D0A | 8326 | 483E | 0100 | 0374 | 1FE9 | 1E00 | DE68 |
| 0000043620 | 9A17 | 7994 | 4674 | C483 | 1E04 | E068 | 1E17 | A868 |
| 0000043640 | 9A23 | 793A | 46A3 | C483 | E908 | 0000 | 76FF | FF0C |
| 0000043660 | 0A76 | 468D | 16D2 | FF50 | F6B6 | FFFE | BA76 | 76FF |
| 0000043700 | 9AB8 | FFFF | 0000 | 4689 | FFC2 | C276 | 681E | 17E2 |
| 0000043720 | 949A | B279 | 8346 | 06C4 | 0FE9 | 1E06 | F668 | 9A17 |
| 0000043740 | 7994 | 46CA | C483 | 8D04 | F686 | 16FE | 8D50 | F486 |
| 0000043760 | 16FE | 1E50 | 3A68 | 9A18 | 79E2 | 46E5 | C483 | 8EDC |
| 0000044000 | 0A06 | 262D | 3E83 | 0048 | 7401 | E903 | 001F | 681E |
| 0000044020 | 1840 | 949A | F579 | 8346 | 04C4 | 681E | 1842 | 681E |
| 0000044040 | 23A8 | 3A9A | 2879 | 8347 | 08C4 | 00E9 | FF00 | 0C76 |
| 0000044060 | 76FF | FF0A | F6B6 | FFFE | F4B6 | 8DFE | C046 | 5016 |
| 0000044100 | 868D | FEFE | 5016 | FF9A | 00FF | 8900 | C246 | 76FF |
| 0000044120 | 1EC2 | 4468 | 9A18 | 7994 | 4740 | C483 | 8306 | C27E |
| 0000044140 | 7500 | E903 | 0003 | 81E9 | 1E05 | 5668 | 9A18 | 7994 |
| 0000044160 | 4785 | C483 | C704 | B646 | 0000 | 03E9 | FF00 | B646 |
| 0000044200 | 468B | 39C0 | B646 | 0372 | 32E9 | 6B00 | B65E | C424 |
| 0000044220 | FEB6 | 26FE | 70FF | 2602 | 30FF | 466B | 24B6 | 8603 |
| 0000044240 | FEFE | 968B | FF00 | 0405 | 5200 | FF50 | B676 | 681E |
| 0000044260 | 186D | 949A | AE79 | 8347 | 0EC4 | C0E9 | FFFF | 00B6 |
| 0000044300 | FFFF | FEB6 | 9AFE | 1FED | 0000 | C02B | 8689 | FF00 |
| 0000044320 | 8689 | FEFE | 13E9 | 1E05 | 7E68 | 9A18 | 7994 | 47C0 |
| 0000044340 | C483 | 8D04 | D486 | 16FE | 1E50 | 8D68 | 9A18 | 79E2 |
| 0000044360 | 47DB | C483 | 8E08 | 0A06 | 262D | 3E83 | 0048 | 7401 |
| 0000044400 | E903 | 001F | 681E | 1890 | 949A | EB79 | 8347 | 04C4 |
| 0000044420 | 681E | 1892 | 681E | 23A8 | 3A9A | 3279 | 8348 | 08C4 |
| 0000044440 | 00E9 | FF00 | 0C76 | 76FF | 6A0A | 8078 | D4BE | 30FE |
| 0000044460 | 0374 | 09E9 | B800 | 0000 | 00BA | E900 | 0006 | 868D |
| 0000044500 | FED4 | D28C | 5052 | 468D | 16D2 | 9A50 | FFFF | 0000 |
| 0000044520 | 4689 | 8DC2 | D246 | 5016 | 76FF | 1EC2 | 9468 | 9A18 |
| 0000044540 | 7994 | 4843 | C483 | E90A | 0480 | 76FF | FF08 | 0676 |
| 0000044560 | D89A | 5F7B | 8348 | 04C4 | 033D | 7400 | E903 | 0017 |
| 0000044600 | 76FF | FF0C | 0A76 | 76FF | FF08 | 0676 | 779A | 7239 |
| 0000044620 | 8348 | 08C4 | 53E9 | 1E04 | 1C68 | 1E10 | B668 | 9A18 |
| 0000044640 | 7994 | 423F | C483 | 8D08 | BC46 | 5016 | 468D | 16C8 |
| 0000044660 | 8D50 | F686 | 16FE | 8D50 | B846 | 5016 | 468D | 16D2 |

THU MAR 14 17:21:24 1991 CLIENT.EXE PAGE 21, LINE 1181

| | | | | | | | | |
|---|---|---|---|---|---|---|---|---|
| 0000044700 | 1E50 | F268 | 9A18 | 79E2 | 48B3 | C483 | 8E18 | 0A06 |
| 0000044720 | 262D | 3E83 | 0048 | 7401 | E903 | 001F | 681E | 1904 |
| 0000044740 | 949A | C379 | 8348 | 04C4 | 681E | 1906 | 681E | 23A8 |
| 0000044760 | 3A9A | 0379 | 8349 | 08C4 | 00E9 | 8D00 | C886 | 16FE |
| 0000045000 | 9A50 | 44D6 | 0000 | 76FF | FF0C | 0A76 | 468D | 16D2 |
| 0000045020 | FF50 | F6B6 | FFFE | BA76 | 76FF | 8DB8 | 0286 | 16FF |
| 0000045040 | 9A50 | 39FF | 0000 | 4689 | FFC2 | C276 | 681E | 1908 |
| 0000045060 | 949A | 4479 | 8349 | 06C4 | 7E83 | 00C2 | 0374 | 38E9 |
| 0000045100 | 8B00 | BC46 | 8689 | FF4C | 468B | 8BC8 | CA56 | 8689 |
| 0000045120 | FF4E | 9689 | FF50 | 76FF | FF0C | 0A76 | 868D | FF02 |
| 0000045140 | 5016 | FF9A | 00FF | 8900 | C246 | 76FF | 1EC2 | 1E68 |
| 0000045160 | 9A19 | 7994 | 457C | C483 | 8D06 | F246 | 5016 | 739A |
| 0000045200 | 004A | 8A00 | F246 | E42A | 8E8A | FEC8 | ED2A | C12B |
| 0000045220 | C06B | 8A3C | C98E | 2AFE | 2BED | 8AC1 | F34E | ED2A |
| 0000045240 | C103 | CD6B | 8A3C | CA8E | 2AFE | 2BED | 8AC1 | F44E |
| 0000045260 | ED2A | C103 | 8689 | FEBC | DF9B | BC86 | 8AFE | F546 |
| 0000045300 | E42A | 8E8A | FECB | ED2A | C12B | 8689 | FEC4 | DF9B |
| 0000045320 | C486 | 9BFE | 0ED8 | 2D0C | DE9B | 9BC1 | 5ED9 | 90C4 |
| 0000045340 | 8E9B | 0A06 | 262D | 3E83 | 0048 | 7500 | E903 | 002A |
| 0000045360 | D99B | C446 | 909A | 007F | 2B4A | C7D2 | C286 | 00FE |
| 0000045400 | C700 | C086 | 00FE | 8900 | BE96 | 89FE | BC86 | 9BFE |
| 0000045420 | AEDF | FEBC | D99B | C45E | 9B90 | D99B | C446 | EC83 |
| 0000045440 | 8B08 | 9BDC | DD36 | 901F | 1E9B | 3168 | 9A19 | 7994 |
| 0000045460 | 4A13 | C483 | E90C | 02B2 | 681E | 101C | 681E | 193E |
| 0000045500 | 949A | 3979 | 834A | 08C4 | 468D | 16BC | 8D50 | C846 |
| 0000045520 | 5016 | 868D | FEF6 | 5016 | 468D | 16B8 | 8D50 | D246 |
| 0000045540 | 5016 | 681E | 197A | E29A | 5479 | 834A | 18C4 | 068E |
| 0000045560 | 2D0A | 8326 | 483E | 0100 | 0374 | 1FE9 | 1E00 | 8C68 |
| 0000045600 | 9A19 | 7994 | 4A64 | C483 | 1E04 | 8E68 | 1E19 | A868 |
| 0000045620 | 9A23 | 793A | 4B1B | C483 | E908 | 0000 | 868D | FEC8 |
| 0000045640 | 5016 | A39A | 004A | FF00 | 0C76 | 76FF | 8D0A | D246 |
| 0000045660 | 5016 | B6FF | FEF6 | 76FF | FFBA | B876 | 76FF | FFCA |
| 0000045700 | C876 | 76FF | 9ABC | FFFF | 0000 | 4689 | 8DC2 | F246 |
| 0000045720 | 5016 | D29A | 0048 | 8A00 | F246 | E42A | 8E8A | FEC8 |
| 0000045740 | ED2A | C12B | C06B | 8A3C | C98E | 2AFE | 2BED | 8AC1 |
| 0000045760 | F34E | ED2A | C103 | C06B | 8A3C | CA8E | 2AFE | 2BED |
| 0000046000 | 8AC1 | F44E | ED2A | C103 | 8689 | FEBC | DF9B | BC86 |
| 0000046020 | 8AFE | F546 | E42A | 8E8A | FECB | ED2A | C12B | 8689 |
| 0000046040 | FEC4 | DF9B | C486 | 9BFE | 0ED8 | 2D0C | DE9B | 9BC1 |
| 0000046060 | 5ED9 | 90C4 | 8E9B | 0A06 | 262D | 3E83 | 0048 | 7500 |
| 0000046100 | E903 | 002A | D99B | C446 | 909A | 577F | 2B4B | C7D2 |
| 0000046120 | C286 | 00FE | C700 | C086 | 00FE | 8900 | BE96 | 89FE |
| 0000046140 | BC86 | 9BFE | AEDF | FEBC | D99B | C45E | 9B90 | D99B |
| 0000046160 | C446 | EC83 | 8B08 | 9BDC | DD36 | 901F | FF9B | C276 |
| 0000046200 | 681E | 1990 | 949A | 6679 | 834B | 0EC4 | 5BE9 | 1E01 |
| 0000046220 | B468 | 9A19 | 7994 | 4B78 | C483 | 8D04 | F886 | 16FE |
| 0000046240 | 1E50 | BE68 | 9A19 | 79E2 | 4B93 | C483 | 8E08 | 0A06 |
| 0000046260 | 262D | 3E83 | 0048 | 7401 | E903 | 001F | 681E | 19C1 |
| 0000046300 | 949A | A379 | 834B | 04C4 | 681E | 19C3 | 681E | 23A8 |
| 0000046320 | 3A9A | D979 | 834B | 08C4 | 00E9 | FF00 | 0C76 | 76FF |
| 0000046340 | FF0A | F8B6 | 6AFE | 6A00 | 8D00 | CC46 | 5016 | FD9A |
| 0000046360 | 0040 | 8900 | C246 | 7E83 | 00C2 | 0375 | 12E9 | FF00 |
| 0000046400 | C276 | 681E | 19C5 | 949A | EE79 | 834B | 06C4 | D9E9 |
| 0000046420 | 1E00 | D868 | FF19 | CE76 | 76FF | 9ACC | 3055 | 4C25 |
| 0000046440 | C483 | C408 | CC5E | C726 | 4847 | 007A | 76FF | FF0C |
| 0000046460 | 0A76 | 76FF | FFCE | CC76 | 468D | 16B8 | 9A50 | FFFF |
| 0000046500 | 0000 | 4689 | FFC2 | BA76 | 76FF | FFB8 | C276 | 681E |
| 0000046520 | 19D9 | 949A | 9879 | 8348 | 0AC4 | 76FF | FF0C | 0A76 |
| 0000046540 | 76FF | FFCE | CC76 | E19A | 003C | E900 | 007C | 79E9 |

THU MAR 14 17:21:24 1991 CLIENT.EXE PAGE 22, LINE 1240

| | | | | | | | | |
|---|---|---|---|---|---|---|---|---|
| 0000046560 | 2D00 | 0041 | 323D | 7600 | E903 | 006E | E0D1 | 2E93 |
| 0000046600 | A7FF | 4C54 | 4080 | 4CBA | 4B5F | 4622 | 4CBA | 4CBA |
| 0000046620 | 428F | 483A | 4CBA | 4CBA | 4CBA | 46AB | 4CBA | 47A7 |
| 0000046640 | 4CBA | 4CBA | 4CBA | 4A08 | 4475 | 4CBA | 4CBA | 4CBA |
| 0000046660 | 4CBA | 4CBA | 4CBA | 4CBA | 4CBA | 4CBA | 4CBA | 4CBA |
| 0000046700 | 4CBA | 4CBA | 4080 | 4CBA | 4B5F | 4622 | 4CBA | 4CBA |
| 0000046720 | 428F | 483A | 4CBA | 4CBA | 4CBA | 46AB | 4CBA | 47A7 |
| 0000046740 | 4CBA | 4CBA | 4CBA | 4A08 | 4475 | 5F5E | ED83 | 8B02 |
| 0000046760 | 1FE5 | 4D5D | 1ECB | 9058 | 5545 | EC8B | 8E1E | 81D8 |
| 0000047000 | 6EEC | 5700 | 2B56 | 89C0 | CA46 | 4689 | C7C8 | B246 |
| 0000047020 | 0000 | C02B | 4689 | 89B6 | B446 | 46C7 | 00C0 | C700 |
| 0000047040 | EE46 | 0000 | 5EC4 | 2606 | 478A | 9801 | 9BE9 | 1E11 |
| 0000047060 | 7668 | 1E10 | F568 | 9A19 | 7994 | 4D2F | C483 | 8D08 |
| 0000047100 | EE46 | 5016 | 468D | 16C0 | 8D50 | B446 | 5016 | 468D |
| 0000047120 | 16B2 | 8D50 | CE46 | 5016 | 681E | 19F8 | E29A | 4A79 |
| 0000047140 | 834D | 18C4 | 068E | 2D0A | 8326 | 483E | 0100 | 0374 |
| 0000047160 | 1FE9 | 1E00 | 0868 | 9A1A | 7994 | 4D5A | C483 | 1E04 |
| 0000047200 | 0A68 | 1E1A | A868 | 9A23 | 793A | 4D6A | C483 | E908 |
| 0000047220 | 0000 | B468 | 6A00 | 9A01 | 7CDC | 4D87 | C483 | 8904 |
| 0000047240 | C846 | 5689 | 8BCA | CA46 | 460B | 74C8 | E903 | 000F |
| 0000047260 | 681E | 1A0C | 949A | 9D79 | 834D | 04C4 | 92E9 | 8D11 |
| 0000047300 | CE46 | 5016 | 76FF | FFCA | C876 | DC9A | E22F | 834D |
| 0000047320 | 08C4 | 468B | C4B2 | C85E | 8926 | 6647 | 5EC4 | 2BC8 |
| 0000047340 | 26C0 | 4789 | 266A | 4789 | 8B68 | B446 | 568B | C4B6 |
| 0000047360 | C85E | 8926 | 6C47 | 8926 | 6E57 | 5EC4 | 2BC8 | 26C0 |
| 0000047400 | 4789 | 2672 | 4789 | 1E70 | DE68 | 1E10 | 2468 | 9A1A |
| 0000047420 | 7994 | 49C7 | C483 | 8D08 | F046 | 5016 | 468D | 16Bu |
| 0000047440 | 1E50 | 2768 | 9A1A | 79E2 | 4E13 | C483 | 8E0C | 0A06 |
| 0000047460 | 262D | 3E83 | 0048 | 7401 | E903 | 001F | 681E | 1A2D |
| 0000047500 | 949A | 2379 | 834E | 04C4 | 681E | 1A2F | 681E | 23A8 |
| 0000047520 | 3A9A | 4779 | 834E | 08C4 | 00E9 | 8B00 | B046 | 5EC4 |
| 0000047540 | 26C8 | 4789 | 8B62 | F046 | 5EC4 | 26C8 | 4789 | 6A64 |
| 0000047560 | FF01 | B276 | DC9A | 257C | 834F | 04C4 | 5EC4 | 26C8 |
| 0000047600 | 4789 | 2668 | 5789 | 8D6A | 9E46 | 5016 | 8D9A | 004E |
| 0000047620 | FF00 | 0C76 | 76FF | FF0A | CA76 | 76FF | FFC8 | C076 |
| 0000047640 | 76FF | 6AEE | 8D00 | C246 | 5016 | 4E8D | 16AA | 9A51 |
| 0000047660 | 3B17 | 0000 | 4689 | 8DBE | F246 | 5016 | 4F9A | 0049 |
| 0000047700 | 8A00 | F246 | E42A | 4E8A | 2A9E | 2BED | 6BC1 | 3CC0 |
| 0000047720 | 4E8A | 2A9F | 2BED | 8AC1 | F34E | ED2A | C103 | C06B |
| 0000047740 | 8A3C | A04E | ED2A | C12B | 4E8A | 2AF4 | 03ED | 89C1 |
| 0000047760 | 9C46 | DF9B | 9C46 | 468A | 2AF5 | 8AE4 | A14E | ED2A |
| 0000050000 | C12B | 4689 | 9B9A | 46DF | 9B9A | 0ED8 | 2D0C | DE9B |
| 0000050020 | 9BC1 | 5ED9 | 90C4 | 839B | BE7E | 7400 | E903 | 008D |
| 0000050040 | 468B | 8BAA | AC56 | 5E6B | 16C2 | 8789 | 2F64 | 9789 |
| 0000050060 | 2F66 | 5EC4 | 26C8 | 478B | 4862 | 5EC4 | 2BC8 | 26D2 |
| 0000050100 | 77F7 | 4064 | 006A | C450 | C85E | FF26 | 6E77 | FF26 |
| 0000050120 | 6C77 | C49A | 0A7E | 6B4D | C25E | 8916 | 6887 | 892F |
| 0000050140 | 6A97 | C42F | C85E | 8B26 | 6847 | 8B26 | 6A57 | 5E6B |
| 0000050160 | 16C2 | 8789 | 2F6C | 9789 | 2F6E | 5EC4 | 26C8 | 478B |
| 0000050200 | 6B66 | C25E | 8916 | 7087 | 8B2F | C846 | 568B | 6BCA |
| 0000050220 | C25E | 8916 | 6087 | 892F | 6297 | 8B2F | C446 | 568B |
| 0000050240 | 6BC6 | C25E | 8916 | 7287 | 892F | 7497 | 8E2F | 0AU6 |
| 0000050260 | 262D | 3E83 | 0048 | 7500 | E903 | 000D | 10A1 | 8B2D |
| 0000050300 | 1216 | 892D | C446 | 5689 | 9BC6 | 46D9 | 83C4 | 08EC |
| 0000050320 | DC8B | 369B | 1FDD | 9B90 | 76FF | FFC2 | BE76 | 681E |
| 0000050340 | 1A31 | 949A | C879 | 834F | 10C4 | 64E9 | 1E0F | 3868 |
| 0000050360 | 1E10 | 6468 | 9A1A | 7994 | 4FDE | C483 | 8D08 | CC46 |
| 0000050400 | 5016 | 468D | 16C2 | 1E50 | 5868 | 9A10 | 79E2 | 4FF9 |
| 0000050420 | C483 | 8E0C | 0A06 | 262D | 3E83 | 0048 | 7401 | E903 |

THU MAR 14 17:21:24 1991 CLIENT.EXE PAGE 23, LINE 1299

| | | | | | | | | |
|---|---|---|---|---|---|---|---|---|
| 0000050440 | 001F | 681E | 1A67 | 949A | 0979 | 8350 | 04C4 | 681E |
| 0000050460 | 1A69 | 681E | 23A8 | 3A9A | 1C79 | 8350 | 08C4 | 00E9 |
| 0000050500 | 1E00 | AE68 | 1E10 | 6B68 | 9A1A | 7994 | 502D | C483 |
| 0000050520 | 8D08 | BC46 | 5016 | 681E | 1A6E | E29A | 2279 | 8351 |
| 0000050540 | 08C4 | 5E6B | 16C2 | B7FF | 2F66 | B7FF | 2F64 | 76FF |
| 0000050560 | 6BBC | C25E | FF16 | 6AB7 | FF2F | 68B7 | 9A2F | 5209 |
| 0000050600 | 0000 | 468D | 169E | 9A50 | 507F | 0000 | 76FF | FF0C |
| 0000050620 | 0A76 | 76FF | FFC2 | CC76 | 466B | 16C2 | 6405 | 1E2F |
| 0000050640 | 9A50 | 3C74 | 0000 | 4689 | 8DBE | F246 | 5016 | A09A |
| 0000050660 | 0051 | 8A00 | F246 | E42A | 4E8A | 2A9E | 2BED | 6BC1 |
| 0000050700 | 3CC0 | 4E8A | 2A9F | 2BED | 8AC1 | F34E | ED2A | C103 |
| 0000050720 | C06B | 8A3C | A04E | ED2A | C12B | 4E8A | 2AF4 | 03ED |
| 0000050740 | 89C1 | 9A46 | DF9B | 9A46 | 468A | 2AF5 | 8AE4 | A14E |
| 0000050760 | ED2A | C12B | 4689 | 9B9C | 46DF | 9B9C | 0ED8 | 2D0C |
| 0000051000 | DE9B | 9BC1 | 5ED9 | 90C4 | 9B9B | 46D9 | 6BC4 | C25E |
| 0000051020 | 9B16 | 87D8 | 2F72 | D99B | 729F | 902F | 8E9B | 0A06 |
| 0000051040 | 262D | 3E83 | 0048 | 7500 | E903 | 000D | 10A1 | 8B2D |
| 0000051060 | 1216 | 892D | C446 | 5689 | 9BC6 | 46D9 | 83C4 | U8EC |
| 0000051100 | DC8B | 369B | 1FDD | 9B90 | 76FF | 1EBE | 7268 | 9A1A |
| 0000051120 | 7994 | 5133 | C483 | E90E | 0DF7 | 76FF | FF08 | 0676 |
| 0000051140 | D89A | 4B7B | 8351 | 04C4 | 033D | 7400 | E903 | 02BE |
| 0000051160 | 681E | 1060 | 681E | 1A91 | 949A | 5C79 | 8351 | 08C4 |
| 0000051200 | 468D | 16C2 | 1E50 | 7268 | 9A10 | 79E2 | 5177 | C483 |
| 0000051220 | 8E08 | 0A06 | 262D | 3E83 | 0048 | 7401 | E903 | 001F |
| 0000051240 | 681E | 1A94 | 949A | 8779 | 8351 | 04C4 | 681E | 1A96 |
| 0000051260 | 681E | 23A8 | 3A9A | AB79 | 8351 | 08C4 | 00E9 | C400 |
| 0000051300 | 065E | 8A26 | 0247 | E998 | 0241 | 468D | 169E | 9A50 |
| 0000051320 | 5230 | 0000 | 681E | 1A98 | 949A | BC79 | 8351 | 04C4 |
| 0000051340 | 468D | 16BC | 1E50 | B168 | 9A1A | 79E2 | 51D7 | C483 |
| 0000051360 | 8E08 | 0A06 | 262D | 3E83 | 0048 | 7401 | E903 | 001F |
| 0000051400 | 681E | 1AB5 | 949A | E779 | 8351 | 04C4 | 681E | 1AB7 |
| 0000051420 | 681E | 23A8 | 3A9A | F879 | 834D | 08C4 | 00E9 | 6B00 |
| 0000051440 | C25E | FF16 | 6EB7 | FF2F | 6CB7 | FF2F | BC76 | 5E6B |
| 0000051460 | 16C2 | 006A | B7FF | 2F70 | 749A | 003D | FF00 | 0C76 |
| 0000051500 | 76FF | FF0A | C276 | 5E6B | 16C2 | B7FF | 2F6E | B7FF |
| 0000051520 | 2F6C | 5E9A | 003B | 8900 | BE46 | 468D | 16F2 | 9A50 |
| 0000051540 | 4E5D | 0000 | 468A | 2AF2 | 8AE4 | 9E4E | ED2A | C12B |
| 0000051560 | C06B | 8A3C | 9F4E | ED2A | C12B | 4E8A | 2AF3 | 03ED |
| 0000051600 | 6BC1 | 3CC0 | 4E8A | 2AA0 | 2BED | 8AC1 | F44E | ED2A |
| 0000051620 | C103 | 4689 | 9B9A | 46DF | 8A9A | F546 | E42A | 4E8A |
| 0000051640 | 2AA1 | 2BED | 89C1 | 9C46 | DF9B | 9C46 | D89B | 0C0E |
| 0000051660 | 9B2D | C1DE | D99B | C45E | 9B90 | D99B | C446 | 5E6B |
| 0000051700 | 16C2 | D89B | 7287 | 9B2F | 9FD9 | 2F72 | 9B90 | 068E |
| 0000051720 | 2D0A | 8326 | 483E | 0000 | 0375 | 0DE9 | A100 | 2D10 |
| 0000051740 | 168B | 2D12 | 4689 | 89C4 | C656 | D99B | C446 | EC83 |
| 0000051760 | 8B08 | 9BDC | DD36 | 901F | FF9B | BE76 | 681E | 1AB9 |
| 0000052000 | 949A | AB79 | 8353 | DEC4 | 23E9 | 8D01 | 9E46 | 5016 |
| 0000052020 | 089A | 0053 | FF00 | 0C76 | 76FF | FF0A | C276 | 5E6B |
| 0000052040 | 16C2 | B7FF | 2F6E | B7FF | 2F6C | 169A | 003E | 8900 |
| 0000052060 | BE46 | 468D | 16F2 | 9A50 | 5477 | 0000 | 468A | 2AF2 |
| 0000052100 | 8AE4 | 9E4E | ED2A | C12B | C06B | 8A3C | 9F4E | ED2A |
| 0000052120 | C12B | 4E8A | 2AF3 | 03ED | 6BC1 | 3CC0 | 4E8A | 2AA0 |
| 0000052140 | 2BED | 8AC1 | F44E | ED2A | C103 | 4689 | 9B9A | 46DF |
| 0000052160 | 8A9A | F546 | E42A | 4E8A | 2AA1 | 2BED | 89C1 | 9C46 |
| 0000052200 | DF9B | 9C46 | D89B | 0C0E | 9B2D | C1DE | D99B | C45E |
| 0000052220 | 9B90 | D99B | C446 | 5E6B | 16C2 | D89B | 7287 | 9B2F |
| 0000052240 | 9FD9 | 2F72 | 9B90 | 068E | 2D0A | 8326 | 483E | 0000 |
| 0000052260 | 0375 | 0DE9 | A100 | 2D10 | 168B | 2D12 | 4689 | 89C4 |
| 0000052300 | C656 | D99B | C446 | EC83 | 8B08 | 9BDC | DD36 | 901F |

THU MAR 14 17:21:24 1991 CLIENT.EXE PAGE 24, LINE 1358

| | | | | | | | | |
|---|---|---|---|---|---|---|---|---|
| 0000052320 | FF9B | BE76 | 681E | 1AD6 | 949A | D079 | 8353 | 0EC4 |
| 0000052340 | 7E83 | 00BE | 0374 | 1CE9 | 6B00 | C25E | FF16 | 70B7 |
| 0000052360 | 6B2F | C25E | FF16 | 6EB7 | FF2F | 6CB7 | 9A2F | 362E |
| 0000052400 | 540A | C483 | E906 | 0026 | 23E9 | 2D00 | 0041 | 0375 |
| 0000052420 | F8E9 | 2DFE | 0016 | 0375 | AFE9 | 2DFD | 000A | 0375 |
| 0000052440 | E8E9 | 2DFE | 0016 | 0375 | 9FE9 | E9FD | 0000 | 20E9 |
| 0000052460 | FF0B | 0876 | 76FF | 9A06 | 7BD8 | 5422 | C483 | 3D04 |
| 0000052500 | 0003 | 0374 | 55E9 | 1E03 | 6068 | 1E10 | FA68 | 9A1A |
| 0000052520 | 7994 | 5433 | C483 | 8D08 | C246 | 5016 | 681E | 1072 |
| 0000052540 | E29A | 4E79 | 8354 | 08C4 | 068E | 2D0A | 8326 | 483E |
| 0000052560 | 0100 | 0374 | 1FE9 | 1E00 | FD68 | 9A1A | 7994 | 545E |
| 0000052600 | C483 | 1E04 | FF68 | 1E1A | A868 | 9A23 | 793A | 5524 |
| 0000052620 | C483 | E908 | 0000 | 5EC4 | 2606 | 478A | 9802 | D8E9 |
| 0000052640 | 8D02 | 9E46 | 5016 | A09A | 0054 | FF00 | 0C76 | 76FF |
| 0000052660 | FF0A | C276 | 466B | 16C2 | 6405 | 1E2F | 8D50 | B846 |
| 0000052700 | 5016 | 839A | 003B | 8900 | BE46 | 468D | 16F2 | 9A50 |
| 0000052720 | 560D | 0000 | 468A | 2AF2 | 8AE4 | 9E4E | ED2A | C12B |
| 0000052740 | C06B | 8A3C | 9F4E | ED2A | C12B | 4E8A | 2AF3 | 03ED |
| 0000052760 | 6BC1 | 3CC0 | 4E8A | 2AA0 | 2BED | 8AC1 | F44E | ED2A |
| 0000053000 | C103 | 4689 | 9B9A | 46DF | 8A9A | F546 | E42A | 4E8A |
| 0000053020 | 2AA1 | 2BED | 89C1 | 9C46 | DF9B | 9C46 | D89B | 0C0E |
| 0000053040 | 9B2D | C1DE | D99B | C45E | 9B90 | D99B | C446 | 5E6B |
| 0000053060 | 16C2 | D89B | 7287 | 9B2F | 9FD9 | 2F72 | 9B90 | 068E |
| 0000053100 | 2D0A | 8326 | 483E | 0000 | 0375 | 54E9 | 9B00 | 46D9 |
| 0000053120 | 9AC4 | 7F90 | 554E | D22B | 46C7 | 0098 | C700 | 9646 |
| 0000053140 | 0000 | 5689 | 8994 | 9246 | DF9B | 926E | D99B | C45E |
| 0000053160 | 9B90 | 5E6B | 16C2 | D99B | 7287 | 9A2F | 7F90 | 5581 |
| 0000053200 | D22B | 46C7 | 0098 | C700 | 9646 | 0000 | 5689 | 8994 |
| 0000053220 | 9246 | DF9B | 926E | 5E6B | 16C2 | D99B | 729F | 902F |
| 0000053240 | FF9B | BA76 | 76FF | FFB8 | BE76 | 681E | 1B01 | 949A |
| 0000053260 | B079 | 8355 | 0AC4 | 5E6B | 16C2 | D99B | 7287 | 832F |
| 0000053300 | 08EC | DC8B | 369B | 1FDD | 9B90 | D99B | C446 | EC83 |
| 0000053320 | 8B08 | 9BDC | DD36 | 901F | 1E9B | 1E68 | 9A1B | 7994 |
| 0000053340 | 55C3 | C483 | E914 | 01B4 | 681E | 10C4 | 681E | 1B3C |
| 0000053360 | 949A | D479 | 8355 | 08C4 | 468D | 16C0 | 1E50 | 3F68 |
| 0000053400 | 9A1B | 79E2 | 55EF | C483 | 8E08 | 0A06 | 262D | 3E83 |
| 0000053420 | 0048 | 7401 | E903 | 001F | 681E | 1B43 | 949A | FF79 |
| 0000053440 | 8355 | 04C4 | 681E | 1B45 | 681E | 23A8 | 3A9A | B579 |
| 0000053460 | 834F | 08C4 | 00E9 | 8D00 | 9E46 | 5016 | 349A | 0056 |
| 0000053500 | FF00 | 0C76 | 76FF | FF0A | C276 | 76FF | 6BC0 | C246 |
| 0000053520 | 0516 | 2F64 | 501E | 829A | 003E | 8900 | BE46 | 468D |
| 0000053540 | 16F2 | 9A50 | 5058 | 0000 | 468A | 2AF2 | 8AE4 | 9E4E |
| 0000053560 | ED2A | C12B | C06B | 8A3C | 9F4E | ED2A | C12B | 4E8A |
| 0000053600 | 2AF3 | 03ED | 6BC1 | 3CC0 | 4E8A | 2AA0 | 2BED | 8AC1 |
| 0000053620 | F44E | ED2A | C103 | 4689 | 9B92 | 46DF | 8A92 | F546 |
| 0000053640 | E42A | 4E8A | 2AA1 | 2BED | 89C1 | 9A46 | DF9B | 9A46 |
| 0000053660 | D89B | 0C0E | 9B2D | C1DE | D99B | C45E | 9B90 | D99B |
| 0000053700 | C446 | 5E6B | 16C2 | D89B | 7287 | 9B2F | 9FD9 | 2F72 |
| 0000053720 | 9B90 | 068E | 2D0A | 8326 | 483E | 0000 | 0375 | 54E9 |
| 0000053740 | 9B00 | 46D9 | 9AC4 | 7F90 | 56E2 | D22B | 46C7 | 0098 |
| 0000053760 | C700 | 9646 | 0000 | 5689 | 8994 | 9246 | DF9B | 926E |
| 0000054000 | D99B | C45E | 9B90 | 5E6B | 16C2 | D99B | 7287 | 9A2F |
| 0000054020 | 7F90 | 570F | D22B | 46C7 | 0098 | C700 | 9646 | 0000 |
| 0000054040 | 5689 | 8994 | 9246 | DF9B | 926E | 5E6B | 16C2 | D99B |
| 0000054060 | 729F | 902F | FF9B | BE76 | 681E | 1B47 | 949A | 3E79 |
| 0000054100 | 8357 | 06C4 | 5E6B | 16C2 | D99B | 7287 | 832F | 08EC |
| 0000054120 | DC8B | 369B | 1FDD | 9B90 | D99B | C446 | EC83 | 8B08 |
| 0000054140 | 9BDC | DD36 | 901F | 1E9B | 5868 | 9A1B | 7994 | 577A |
| 0000054160 | C483 | E914 | 0026 | 23E9 | 2D00 | 0041 | 0375 | 67E9 |

THU MAR 14 17:21:24 1991 CLIENT.EXE PAGE 25, LINE 1417

| | | | | | | | | |
|---|---|---|---|---|---|---|---|---|
| 0000054200 | 2DFE | 0016 | 0375 | 18E9 | 2DFD | 000A | 0375 | 57E9 |
| 0000054220 | 2DFE | 0016 | 0375 | 08E9 | E9FD | 0000 | B2E9 | 1E07 |
| 0000054240 | 1C68 | 1E10 | 7668 | 9A1B | 7994 | 579A | C483 | 8D08 |
| 0000054260 | EE46 | 5016 | 468D | 16AE | 8D50 | B846 | 5016 | 468D |
| 0000054300 | 16CE | 1E50 | 8968 | 9A1B | 79E2 | 57B5 | C483 | 8E14 |
| 0000054320 | 0A06 | 262D | 3E83 | 0048 | 7401 | E903 | 001F | 681E |
| 0000054340 | 1B93 | 949A | C579 | 8357 | 04C4 | 681E | 1B95 | 681E |
| 0000054360 | 23A8 | 3A9A | D579 | 8357 | 08C4 | 00E9 | 6800 | 00B4 |
| 0000054400 | 016A | DC9A | D37C | 8352 | 04C4 | 4689 | 89C8 | CA56 |
| 0000054420 | 468B | 0BCA | C846 | 0374 | 0FE9 | 1E00 | 9768 | 9A1B |
| 0000054440 | 7994 | 58D5 | C483 | E904 | 0727 | 468D | 169E | 9A50 |
| 0000054460 | 583D | 0000 | 76FF | FF0C | 0A76 | 468D | 16CE | FF50 |
| 0000054500 | AE76 | 76FF | FFBA | B876 | 026A | 76FF | 6AEE | 8D00 |
| 0000054520 | C246 | 5016 | 76FF | FFCA | C876 | 4E8D | 16AA | 9A51 |
| 0000054540 | 3DA4 | 0000 | 4689 | 8DBE | F246 | 5016 | E39A | 0059 |
| 0000054560 | 8A00 | F246 | E42A | 4E8A | 2A9E | 2BED | 6BC1 | 3CC0 |
| 0000054600 | 4E8A | 2A9F | 2BED | 8AC1 | F34E | ED2A | C103 | C06B |
| 0000054620 | 8A3C | A04E | ED2A | C12B | 4E8A | 2AF4 | 03ED | 89C1 |
| 0000054640 | 9246 | DF9B | 9246 | 468A | 2AF5 | 8AE4 | A14E | ED2A |
| 0000054660 | C12B | 4689 | 9B9A | 46DF | 9B9A | 0ED8 | 2D0C | DE9B |
| 0000054700 | 9BC1 | 5ED9 | 90C4 | 839B | BE7E | 7400 | E903 | 00A9 |
| 0000054720 | 468B | 8BAA | AC56 | 5E6B | 16C2 | 8789 | 2F64 | 9789 |
| 0000054740 | 2F66 | 5EC4 | 26C8 | 478B | 4862 | 5EC4 | 2BC8 | 26D2 |
| 0000054760 | 77F7 | 4064 | 006A | C450 | C85E | FF26 | 6E77 | FF26 |
| 0000055000 | 6C77 | C49A | EF7E | 6B58 | C25E | 8916 | 6887 | 892F |
| 0000055020 | 6A97 | 6A2F | C401 | C85E | FF26 | 6677 | DC9A | 817C |
| 0000055040 | 8359 | 04C4 | 5EC4 | 26C8 | 4789 | 2668 | 5789 | C46A |
| 0000055060 | C85E | 8B26 | 6847 | 8B26 | 6A57 | 5E6B | 16C2 | 8789 |
| 0000055100 | 2F6C | 9789 | 2F6E | 5EC4 | 26C8 | 478B | 6B66 | C25E |
| 0000055120 | 8916 | 7087 | 8B2F | C846 | 568B | 6BCA | C25E | 8916 |
| 0000055140 | 6087 | 892F | 6297 | 8B2F | C446 | 56BB | 6BC6 | C25E |
| 0000055160 | 8916 | 7287 | 892F | 7497 | 8E2F | 0A06 | 262D | 3E83 |
| 0000055200 | 0048 | 7500 | E903 | 000D | 10A1 | 8B2D | 1216 | 892D |
| 0000055220 | C446 | 5689 | 9BC6 | 46D9 | 83C4 | 08EC | DC8B | 369B |
| 0000055240 | 1FDD | 9B90 | 76FF | FFC2 | BE76 | 681E | 1BAF | 949A |
| 0000055260 | 9479 | 8359 | 10C4 | 98E9 | 1E05 | 3868 | 1E10 | E168 |
| 0000055300 | 9A1B | 7994 | 59AA | C483 | 8D08 | CC46 | 5016 | 468D |
| 0000055320 | 16C2 | 1E50 | 5868 | 9A10 | 79E2 | 59C5 | C483 | 8E0C |
| 0000055340 | 0A06 | 262D | 3E83 | 0048 | 7401 | E9D3 | 001F | 681E |
| 0000055360 | 1BE4 | 949A | D579 | 8359 | 04C4 | 681E | 1BE6 | 681E |
| 0000055400 | 23A8 | 3A9A | B079 | 835A | 08C4 | 00E9 | 8D00 | 9E46 |
| 0000055420 | 5016 | 0D9A | 005A | FF00 | 0C76 | 76FF | FF0A | C276 |
| 0000055440 | 76FF | 6BCC | C25E | FF16 | 66B7 | FF2F | 64B7 | 9A2F |
| 0000055460 | 3F04 | 0000 | 4689 | 8DBE | F246 | 5016 | E19A | 0052 |
| 0000055500 | 8A00 | F246 | E42A | 4E8A | 2A9E | 2BED | 6BC1 | 3CC0 |
| 0000055520 | 4E8A | 2A9F | 2BED | 8AC1 | F34E | ED2A | C103 | C06B |
| 0000055540 | 8A3C | A04E | ED2A | C12B | 4E8A | 2AF4 | 03ED | 89C1 |
| 0000055560 | 9246 | DF9B | 9246 | 468A | 2AF5 | 8AE4 | A14E | ED2A |
| 0000055600 | C12B | 4689 | 9B9A | 46DF | 9B9A | 0ED8 | 2D0C | DE9B |
| 0000055620 | 9BC1 | 5ED9 | 90C4 | 9B9B | 46D9 | 6BC4 | C25E | 9B16 |
| 0000055640 | 87D8 | 2F72 | D99B | 729F | 902F | 8E9B | 0A06 | 262D |
| 0000055660 | 3E83 | 0048 | 7500 | E903 | 000D | 10A1 | 8B2D | 1216 |
| 0000055700 | 892D | C446 | 5689 | 9BC6 | 46D9 | 83C4 | 08EC | DC8B |
| 0000055720 | 369B | 1FDD | 9B90 | 76FF | 1EBE | E868 | 9A1B | 7994 |
| 0000055740 | 5AD9 | C483 | 830E | BE7E | 7400 | E903 | 006A | 5E6B |
| 0000055760 | 16C2 | B7FF | 2F6A | B7FF | 2F68 | 5E6B | 16C2 | B7FF |
| 0000056000 | 2F66 | B7FF | 2F64 | 349A | E937 | 835A | 08C4 | 681E |
| 0000056020 | 10AE | 681E | 1C0A | 949A | FA79 | 835A | 08C4 | 468D |
| 0000056040 | 16BC | 1E50 | 0D68 | 9A1C | 79E2 | 5B34 | C483 | 8308 |

THU MAR 14 17:21:24 1991 CLIENT.EXE PAGE 26, LINE 1476

| | | | | | | | | |
|---|---|---|---|---|---|---|---|---|
| 0000056060 | BC7E | 7500 | E903 | 0020 | 5E6B | 16C2 | B7FF | 2F66 |
| 0000056100 | B7FF | 2F64 | 76FF | 6BBC | C25E | FF16 | 6AB7 | FF2F |
| 0000056120 | 68B7 | 9A2F | 504E | 0000 | F6E9 | FF03 | 0876 | 76FF |
| 0000056140 | 9A06 | 7BD8 | 5B57 | C483 | 3D04 | 0003 | 0374 | D8E9 |
| 0000056160 | C402 | 065E | 8A26 | 0247 | E998 | 02AA | 681E | 1038 |
| 0000056200 | 681E | 1C11 | 949A | 6D79 | 835B | 08C4 | 468D | 16CC |
| 0000056220 | 8D50 | C246 | 5016 | 681E | 1058 | E29A | 8879 | 835B |
| 0000056240 | 0CC4 | 068E | 2D0A | 8326 | 483E | 0100 | 0374 | 1FE9 |
| 0000056260 | 1E00 | 1468 | 9A1C | 7994 | 5B98 | C483 | 1E04 | 1668 |
| 0000056300 | 1E1C | A868 | 9A23 | 793A | 56B8 | C483 | E908 | 0000 |
| 0000056320 | 681E | 10C4 | 681E | 1C18 | 949A | BC79 | 835B | 08C4 |
| 0000056340 | 468D | 16C0 | 1E50 | 1B68 | 9A1C | 79E2 | 5BD7 | C483 |
| 0000056360 | 8E08 | 0A06 | 262D | 3E83 | 0048 | 7401 | E903 | 001F |
| 0000056400 | 681E | 1C1F | 949A | E779 | 835B | 04C4 | 681E | 1C21 |
| 0000056420 | 681E | 23A8 | 3A9A | C279 | 835C | 08C4 | 00E9 | 8D00 |
| 0000056440 | 9E46 | 5016 | 1F9A | 005C | FF00 | 0C76 | 76FF | FF0A |
| 0000056460 | C276 | 76FF | FFC0 | CC76 | 466B | 16C2 | 6405 | 1E2F |
| 0000056500 | 9A50 | FFFF | 0000 | 4689 | 8DBE | F246 | 5016 | 009A |
| 0000056520 | 0058 | 8A00 | F246 | E42A | 4E8A | 2A9E | 2BED | 6BC1 |
| 0000056540 | 3CC0 | 4E8A | 2A9F | 2BED | 8AC1 | F34E | ED2A | C103 |
| 0000056560 | C06B | 8A3C | A04E | ED2A | C12B | 4E8A | 2AF4 | 03ED |
| 0000056600 | 89C1 | 9246 | DF9B | 9246 | 468A | 2AF5 | 8AE4 | A14E |
| 0000056620 | ED2A | C12B | 4689 | 9B9A | 46DF | 9B9A | 0ED8 | 2D0C |
| 0000056640 | DE9B | 9BC1 | 5ED9 | 90C4 | 9B9B | 46D9 | 6BC4 | C25E |
| 0000056660 | 9B16 | 87D8 | 2F72 | D99B | 729F | 902F | 8E9B | 0A06 |
| 0000056700 | 262D | 3E83 | 0048 | 7500 | E903 | 000D | 10A1 | 8B2D |
| 0000056720 | 1216 | 892D | C446 | 5689 | 9BC6 | 46D9 | 83C4 | 08EC |
| 0000056740 | DC8B | 369B | 1FDD | 9B90 | 76FF | 1EBE | 2368 | 9A1C |
| 0000056760 | 7994 | 57F2 | C483 | E90E | 014F | 681E | 1060 | 681E |
| 0000057000 | 1C41 | 949A | E679 | 835C | 08C4 | 468D | 16C2 | 1E50 |
| 0000057020 | 7268 | 9A10 | 79E2 | 5D01 | C483 | 8E08 | 0A06 | 262D |
| 0000057040 | 3E83 | 0048 | 7401 | E903 | 001F | 681E | 1C44 | 949A |
| 0000057060 | 1179 | 835D | 04C4 | 681E | 1C46 | 681E | 23A8 | 3A9A |
| 0000057100 | EB79 | 835D | 08C4 | 00E9 | 8D00 | 9E46 | 5016 | 489A |
| 0000057120 | 005D | FF00 | 0C76 | 76FF | FF0A | C276 | 006A | 5E6B |
| 0000057140 | 16C2 | B7FF | 2F6E | B7FF | 2F6C | 619A | 003E | 8900 |
| 0000057160 | BE46 | 468D | 16F2 | 9A50 | 5BF5 | 0000 | 468A | 2AF2 |
| 0000057200 | 8AE4 | 9E4E | ED2A | C12B | C06B | 8A3C | 9F4E | ED2A |
| 0000057220 | C12B | 4E8A | 2AF3 | 03ED | 6BC1 | 3CC0 | 4E8A | 2AA0 |
| 0000057240 | 2BED | 8AC1 | F44E | ED2A | C103 | 4689 | 9B92 | 46DF |
| 0000057260 | 8A92 | F546 | E42A | 4E8A | 2AA1 | 2BED | 89C1 | 9A46 |
| 0000057300 | DF9B | 9A46 | D89B | 0C0E | 9B2D | C1DE | D99B | C45E |
| 0000057320 | 9B90 | D99B | C446 | 5E6B | 16C2 | D89B | 7287 | 9B2F |
| 0000057340 | 9FD9 | 2F72 | 9B90 | 068E | 2D0A | 8326 | 483E | 0000 |
| 0000057360 | 0375 | 0DE9 | A100 | 2D10 | 168B | 2D12 | 4689 | 89C4 |
| 0000057400 | C656 | D99B | C446 | EC83 | 8B08 | 9BDC | DD36 | 901F |
| 0000057420 | FF9B | BE76 | 681E | 1C48 | 949A | 2779 | 835E | 0EC4 |
| 0000057440 | 26E9 | E900 | 0023 | 472D | 7500 | E903 | FECC | 052D |
| 0000057460 | 7500 | E903 | FD46 | 1B2D | 7500 | E903 | FEBC | 052D |
| 0000057500 | 7500 | E903 | FD36 | 00E9 | E900 | 0105 | 681E | 1060 |
| 0000057520 | 681E | 1C6A | 949A | 3879 | 835E | 08C4 | 468D | 16C2 |
| 0000057540 | 1E50 | 7268 | 9A10 | 79E2 | 5E53 | C483 | 8E08 | 0A06 |
| 0000057560 | 262D | 3E83 | 0048 | 7401 | E903 | 001F | 681E | 1C6D |
| 0000057600 | 949A | 6379 | 835E | 04C4 | 681E | 1C6F | 681E | 23A8 |
| 0000057620 | 3A9A | 8F79 | 835E | 08C4 | 00E9 | FF00 | 0C76 | 76FF |
| 0000057640 | FF0A | C276 | 466B | 16C2 | 6405 | 1E2F | 9A50 | FFFF |
| 0000057660 | 0000 | 4689 | FFBE | BE76 | 681E | 1C71 | 949A | AB79 |
| 0000057700 | 835B | 06C4 | 8AE9 | E900 | 0087 | 573D | 7500 | E903 |
| 0000057720 | F11B | 037E | 39E9 | 2D00 | 0041 | 123D | 7600 | E903 |

THU MAR 14 17:21:24 1991 CLIENT.EXE PAGE 27, LINE 1535

| | | | | | | | | |
|---|---|---|---|---|---|---|---|---|
| 0000057740 | 006F | E0D1 | 2E93 | A7FF | 5EBA | 576F | 5F21 | 5E1C |
| 0000057760 | 5F21 | 5401 | 5F21 | 512A | 5F21 | 5F21 | 5F21 | 5F21 |
| 0000060000 | 5989 | 5F21 | 5F21 | 5F21 | 5F21 | 5F21 | 5B2B | 4CFF |
| 0000060020 | 612D | 3D00 | 0016 | 0376 | 36E9 | D100 | 93E0 | FF2E |
| 0000060040 | F3A7 | 6F5E | 2157 | 1C5F | 215E | 015F | 2154 | 2A5F |
| 0000060060 | 2151 | 215F | 215F | 215F | 895F | 2159 | 215F | 215F |
| 0000060100 | 215F | 215F | 2B5F | FF5B | 214C | 215F | 215F | BD5F |
| 0000060120 | E94F | 0000 | 5F5E | ED83 | 8B02 | 1FE5 | 4D5D | 1ECB |
| 0000060140 | 9058 | 5545 | EC8B | 8E1E | 81D8 | 94EC | 5700 | C756 |
| 0000060160 | 7A86 | 00FF | 2B00 | 89C0 | 7086 | 89FF | 6E86 | C6FF |
| 0000060200 | DE46 | C400 | 065E | 8A26 | D147 | E998 | 044C | 681E |
| 0000060220 | 1C84 | 949A | 9579 | 835F | 04C4 | 868D | FF7A | 5016 |
| 0000060240 | 468D | 16A8 | 8D50 | A646 | 5016 | 468D | 16A4 | 8D50 |
| 0000060260 | A246 | 5016 | 468D | 16A0 | 8D50 | 8046 | 5016 | 681E |
| 0000060300 | 1CB3 | E29A | B079 | 835F | 20C4 | 068E | 2D0A | 8326 |
| 0000060320 | 483E | 0100 | 0374 | 1FE9 | 1E00 | C868 | 9A1C | 7994 |
| 0000060340 | 5FC0 | C483 | 1E04 | CA68 | 1E1C | A868 | 9A23 | 793A |
| 0000060360 | 5FEE | C483 | E908 | 0000 | 006A | 006A | 76FF | FF0C |
| 0000060400 | 0A76 | 868D | FF7C | 5016 | B6FF | FF7A | FF9A | 00FF |
| 0000060420 | 8900 | D446 | 76FF | 1ED4 | CC68 | 9A1C | 7994 | 5FFD |
| 0000060440 | C483 | E906 | 040F | 681E | 1026 | 949A | 0E79 | 8360 |
| 0000060460 | 04C4 | 468D | 16DE | 1E50 | E168 | 9A1C | 79E2 | 6029 |
| 0000060500 | C483 | 8E08 | 0A06 | 262D | 3E83 | 0048 | 7401 | E903 |
| 0000060520 | 001F | 681E | 1CE4 | 949A | 3979 | 8360 | 04C4 | 681E |
| 0000060540 | 1CE6 | 681E | 23A8 | 3A9A | 6279 | 8360 | 08C4 | 00E9 |
| 0000060560 | 6A00 | 6A00 | FF00 | 0C76 | 76FF | 8D0A | DE46 | 5016 |
| 0000060600 | FF9A | 00FF | 8900 | D446 | 76FF | 1ED4 | E868 | 9A1C |
| 0000060620 | 7994 | 6071 | C483 | E906 | 039B | 681E | 1026 | 949A |
| 0000060640 | 8279 | 8360 | 04C4 | 468D | 16DE | 1E50 | FF68 | 9A1C |
| 0000060660 | 79E2 | 609D | C483 | 8E08 | 0A06 | 262D | 3E83 | 0048 |
| 0000060700 | 7401 | E903 | 001F | 681E | 1D02 | 949A | AD79 | 8360 |
| 0000060720 | 04C4 | 681E | 1D04 | 681E | 23A8 | 3A9A | DC79 | 8360 |
| 0000060740 | 08C4 | 00E9 | 6A00 | 6A00 | FF00 | 0C76 | 76FF | 8D0A |
| 0000060760 | DE46 | 5016 | 868D | FF7C | 5016 | FF9A | 00FF | 8900 |
| 0000061000 | D446 | 76FF | 1ED4 | 0668 | 9A1D | 7994 | 6135 | C483 |
| 0000061020 | 8306 | D47E | 7500 | E903 | 0003 | 18E9 | 8D03 | 7C86 |
| 0000061040 | 89FF | 6E86 | 8CFF | 7096 | C4FF | 6E9E | 26FF | 77FF |
| 0000061060 | C42C | 6E9E | 26FF | 77FF | C42A | 6E9E | 26FF | 77FF |
| 0000061100 | C428 | 6E9E | 26FF | 77FF | C426 | 6E9E | 26FF | 77FF |
| 0000061120 | 8B24 | 6E86 | 8BFF | 7096 | 05FF | 0004 | 5052 | 681E |
| 0000061140 | 1D1B | 949A | 4479 | 8361 | 12C4 | C8E9 | 1E02 | 4A68 |
| 0000061160 | 9A1D | 7994 | 6156 | C483 | 8D04 | 6C86 | 16FF | 1E50 |
| 0000061200 | 6C68 | 9A1D | 79E2 | 6171 | C483 | 8E08 | 0A06 | 262D |
| 0000061220 | 3E83 | 0048 | 7401 | E903 | 001F | 681E | 1D6F | 949A |
| 0000061240 | 8179 | 8361 | 04C4 | 681E | 1D71 | 681E | 23A8 | 3A9A |
| 0000061260 | D579 | 835C | 08C4 | 00E9 | FF00 | 0C76 | 76FF | FF0A |
| 0000061300 | 6CB6 | 8DFF | D646 | 5016 | 868D | FF72 | 5016 | FF9A |
| 0000061320 | 00FF | 8900 | D446 | 76FF | 1ED4 | 7368 | 9A1D | 7994 |
| 0000061340 | 61F6 | C483 | 8306 | D47E | 7500 | E903 | 0003 | 44E9 |
| 0000061360 | C702 | 7886 | 00FF | E900 | 0004 | 86FF | FF78 | 868B |
| 0000061400 | FF78 | 4639 | 77D6 | E903 | 0024 | 868B | FF78 | E0C1 |
| 0000061420 | 0305 | 7286 | 8BFF | 7496 | 52FF | FF50 | 78B6 | 1EFF |
| 0000061440 | 8968 | 9A1D | 7994 | 621F | C483 | E90A | FFCC | B6FF |
| 0000061460 | FF74 | B6FF | FF72 | 989A | 0063 | 2B00 | 89C0 | 7486 |
| 0000061500 | 89FF | 7286 | E9FF | 01ED | 681E | 1D93 | 949A | 3079 |
| 0000061520 | 8362 | 04C4 | 468D | 16D8 | 1E50 | A368 | 9A1D | 79E2 |
| 0000061540 | 624B | C483 | 8E08 | 0A06 | 262D | 3E83 | 0048 | 7401 |
| 0000061560 | E903 | 001F | 681E | 1DA6 | 949A | 5B79 | 8362 | 04C4 |
| 0000061600 | 681E | 1DA8 | 681E | 23A8 | 3A9A | 6D79 | 8362 | 08C4 |

THU MAR 14 17:21:24 1991 CLIENT.EXE PAGE 28, LINE 1594

| | | | | | | | | |
|---|---|---|---|---|---|---|---|---|
| 0000061620 | 00E9 | 8B00 | D846 | E0C1 | 5005 | 489A | AB7B | 8362 |
| 0000061640 | 02C4 | 8689 | FF72 | 9689 | FF74 | 86C7 | FF78 | 0000 |
| 0000061660 | 04E9 | FF00 | 7886 | 8BFF | D846 | 8639 | FF78 | 0372 |
| 0000061700 | 20E9 | 8B00 | 7886 | C1FF | 05E0 | 8603 | FF72 | 968B |
| 0000061720 | FF74 | 5052 | 681E | 1DAA | E29A | E179 | 8362 | 08C4 |
| 0000061740 | D0E9 | FFFF | 0C76 | 76FF | FF0A | D876 | B6FF | FF74 |
| 0000061760 | B6FF | FF72 | 868D | FF76 | 5016 | 468D | 16DA | 9A50 |
| 0000062000 | FFFF | 0000 | 4689 | FFD4 | D476 | 681E | 1DAD | 949A |
| 0000062020 | F179 | 8362 | 06C4 | B6FF | FF74 | B6FF | FF72 | 529A |
| 0000062040 | 137B | 8363 | 04C4 | 7E83 | 00D4 | 0375 | 0DE9 | 8100 |
| 0000062060 | D47E | 01AB | 0375 | 03E9 | E900 | 00F9 | 681E | 1DC5 |
| 0000062100 | 949A | 8979 | 8363 | 04C4 | 86C7 | FF78 | 0000 | 04E9 |
| 0000062120 | FF00 | 7886 | 8BFF | 7886 | 39FF | 7686 | 77FF | E903 |
| 0000062140 | 005F | B66B | FF78 | C458 | DA5E | FF26 | 2C70 | B66B |
| 0000062160 | FF78 | C458 | DA5E | FF26 | 2A70 | B66B | FF78 | C458 |
| 0000062200 | DA5E | FF26 | 2870 | B66B | FF78 | C458 | DA5E | FF26 |
| 0000062220 | 2670 | B66B | FF78 | C458 | DA5E | FF26 | 2470 | 866B |
| 0000062240 | FF78 | 0358 | DA46 | 568B | 05DC | 0004 | 5052 | B6FF |
| 0000062260 | FF78 | 681E | 1DD6 | 949A | 6579 | 835F | 14C4 | 90E9 |
| 0000062300 | FFFF | DC76 | 76FF | 9ADA | 4796 | 0000 | C02B | 4689 |
| 0000062320 | 89DC | DA46 | 5EE9 | E900 | 005B | 533D | 7500 | E903 |
| 0000062340 | FE66 | 037E | 23E9 | 2D00 | 0D41 | 0375 | 9FE9 | 2DFB |
| 0000062360 | 0003 | 0375 | 2FE9 | 2DFC | 0003 | 0375 | 9BE9 | 2DFC |
| 0000062400 | 0005 | 0375 | 66E9 | E9FD | 002B | 612D | 7500 | E903 |
| 0000062420 | FB7C | 032D | 7500 | E903 | FC0C | 032D | 7500 | E903 |
| 0000062440 | FC78 | 052D | 7500 | E903 | FD43 | 072D | 7500 | E903 |
| 0000062460 | FE16 | 00E9 | 5E00 | 835F | 02ED | E58B | 5D1F | CB4D |
| 0000062500 | 581E | 4590 | 8B55 | IEEC | D88E | EC81 | 000C | 5657 |
| 0000062520 | 468B | 8B0A | 0C56 | 5EC4 | 2606 | 0789 | 8926 | 0257 |
| 0000062540 | 468B | C40E | 065E | 8926 | 0447 | 7E83 | 280E | 0372 |
| 0000062560 | 03E9 | E900 | 005D | 468B | 8B06 | 0856 | 2805 | 8900 |
| 0000062600 | FA46 | 5689 | 8BFC | 0E46 | 282D | 8900 | F446 | 46C7 |
| 0000062620 | 00F8 | E900 | 0003 | 46FF | 83F8 | F87E | 720A | E903 |
| 0000062640 | 0031 | 46C7 | 00F6 | E900 | 0003 | 46FF | 8BF6 | F446 |
| 0000062660 | 0AB9 | 2B00 | F7D2 | 3BF1 | F646 | 0377 | 11E9 | 8A00 |
| 0000062700 | F846 | 0B04 | 5EC4 | FFFA | FA46 | 8826 | E907 | FFDA |
| 0000062720 | C3E9 | 5EFF | 835F | 02ED | E58B | 5D1F | CB4D | 581E |
| 0000062740 | 4590 | 8B55 | 1EEC | D88E | EC81 | 000A | 5657 | 5EC4 |
| 0000062760 | 2606 | 77FF | C404 | 065E | FF26 | 0277 | FF26 | C437 |
| 0000063000 | 065E | FF26 | 0277 | FF26 | 1E37 | 0A68 | 9A1E | 7994 |
| 0000063020 | 6533 | C483 | 8B0E | 0646 | 568B | 0508 | 0028 | 4689 |
| 0000063040 | 89FA | FC56 | 5EC4 | 2606 | 478B | 2D04 | 0028 | 4689 |
| 0000063060 | C7F6 | F846 | 0000 | 03E9 | FF00 | F846 | 7E83 | 0AF8 |
| 0000063100 | 0372 | 9DE9 | 8E00 | 0A06 | 262D | 3E83 | 0048 | 7500 |
| 0000063120 | E903 | 0017 | 5EC4 | 26FA | 078A | 5098 | 681E | 1E27 |
| 0000063140 | 949A | 5079 | 8365 | 06C4 | 1AE9 | C400 | FA5E | 8A26 |
| 0000063160 | 9807 | FF50 | FC76 | 76FF | 1EFA | 3368 | 9A1E | 7994 |
| 0000063200 | 6580 | C483 | 8B0A | F646 | 14B9 | 2B00 | F7D2 | 01F1 |
| 0000063220 | FA46 | 068E | 2D0A | 8326 | 483E | 0000 | 0375 | 17E9 |
| 0000063240 | C400 | FA5E | 8A26 | 9807 | 1E50 | 4568 | 9A1E | 7994 |
| 0000063260 | 659D | C483 | E906 | 001A | 5EC4 | 26FA | 078A | 5098 |
| 0000063300 | 76FF | FFFC | FA76 | 681E | 1E4C | 949A | B079 | 8361 |
| 0000063320 | 0AC4 | 468B | B9F6 | 0014 | D22B | F1F7 | 4601 | E9FA |
| 0000063340 | FF57 | 5F5E | ED83 | 8B02 | 1FE5 | 4D5D | 1ECB | 9058 |
| 0000063360 | 5545 | EC8B | 8E1E | 81D8 | 1AEC | 5700 | C756 | EE46 |
| 0000063400 | 0000 | 46C7 | 00F2 | 2B00 | 89C0 | E846 | 4689 | 2BE6 |
| 0000063420 | 89C0 | FA46 | 4689 | C7F8 | FC46 | 0000 | 5EC4 | 2606 |
| 0000063440 | 478A | 9801 | E6E9 | 1E03 | 5968 | 9A1E | 7994 | 6608 |
| 0000063460 | C483 | 6A04 | 9A00 | 0000 | 6624 | C483 | 8902 | F846 |

THU MAR 14 17:21:24 1991 CLIENT.EXE PAGE 29, LINE 1653

| | | | | | | | | |
|---|---|---|---|---|---|---|---|---|
| 0000063500 | 5689 | 8DFA | EE46 | 5016 | 468D | 16FC | 1E50 | 7268 |
| 0000063520 | 9A1E | 79E2 | 663F | C483 | 8E0C | 0A06 | 262D | 3E83 |
| 0000063540 | 0048 | 7401 | E903 | 001F | 681E | 1E78 | 949A | 4F79 |
| 0000063560 | 8366 | 04C4 | 681E | 1E7A | 681E | 23A8 | 3A9A | 5D79 |
| 0000063600 | 8366 | 08C4 | 00E9 | FF00 | EE76 | 489A | 7A7B | 8366 |
| 0000063620 | 02C4 | 4689 | 89E6 | E856 | 468B | 0BE8 | E646 | 0374 |
| 0000063640 | 0FE9 | 1E00 | 7C68 | 9A1E | 7994 | 6694 | C483 | E904 |
| 0000063660 | 03BF | 76FF | FFEE | FA76 | 76FF | FFF8 | E876 | 76FF |
| 0000063700 | 9AE6 | 6410 | 66A0 | C483 | 1E0A | 9168 | 9A1E | 7994 |
| 0000063720 | 66DA | C483 | FF04 | 0C76 | 76FF | FF0A | FC76 | 76FF |
| 0000063740 | FFE8 | E676 | FF9A | 00FF | 8900 | F646 | 5EC4 | 26E6 |
| 0000063760 | 77FF | 2602 | 37FF | 5EC4 | 26E6 | 77FF | 2602 | 37FF |
| 0000064000 | 76FF | 1EF6 | A068 | 9A1E | 7994 | 66E8 | C483 | FF0E |
| 0000064020 | E876 | 76FF | 9AE6 | 7B52 | 66F7 | C483 | E904 | 0351 |
| 0000064040 | 681E | 1EC9 | 949A | 0279 | 8367 | 04C4 | 8C68 | 9A00 |
| 0000064060 | 0000 | 6719 | C483 | 8902 | F846 | 5689 | 8DFA | EE46 |
| 0000064100 | 5016 | 681E | 1ED5 | E29A | 3479 | 8367 | 08C4 | 068E |
| 0000064120 | 2D0A | 8326 | 483E | 0100 | 0374 | 1FE9 | 1E00 | D868 |
| 0000064140 | 9A1E | 7994 | 6744 | C483 | 1E04 | DA68 | 1E1E | A86S |
| 0000064160 | 9A23 | 793A | 6752 | C483 | E908 | 0000 | 76FF | 9AEE |
| 0000064200 | 7B48 | 676F | C483 | 8902 | E646 | 5689 | 8BE8 | E846 |
| 0000064220 | 460B | 74E6 | E903 | 000F | 681E | 1EDC | 949A | 8979 |
| 0000064240 | 8367 | 04C4 | CAE9 | FF02 | EE76 | 76FF | FFFA | F876 |
| 0000064260 | 76FF | FFE8 | E676 | 109A | 9564 | 8367 | 0AC4 | 681E |
| 0000064300 | 1EF1 | 949A | B879 | 8367 | 04C4 | 76FF | FF0C | 0A76 |
| 0000064320 | 76FF | FFE8 | E676 | FF9A | 00FF | 8900 | F646 | 76FF |
| 0000064340 | 1EF6 | 0068 | 9A1F | 7994 | 67C6 | C483 | FF06 | E876 |
| 0000064360 | 76FF | 9AE6 | 7B52 | 67D5 | C483 | E904 | 0273 | 681E |
| 0000064400 | 1030 | 949A | E079 | 8367 | 04C4 | 8C68 | 9A00 | 0000 |
| 0000064420 | 6801 | C483 | 8902 | F846 | 5689 | 8EFA | 0A06 | 262D |
| 0000064440 | 3E83 | 0048 | 7401 | E903 | 001F | 681E | 1F19 | 949A |
| 0000064460 | 1179 | 8368 | ?4C4 | 681E | 1F1B | 681E | 23A8 | 3A9A |
| 0000064500 | 3C79 | 8368 | 08C4 | 00E9 | FF00 | 0C76 | 76FF | FF0A |
| 0000064520 | FA76 | 76FF | 8DF8 | E646 | 5016 | FF9A | 00FF | 8900 |
| 0000064540 | F646 | 76FF | 1EF6 | 1D68 | 9A1F | 7994 | 6856 | C483 |
| 0000064560 | 8306 | F67E | 7500 | E903 | 0003 | F4E9 | FF01 | E876 |
| 0000064600 | 76FF | 9AE6 | 64AE | 6878 | C483 | FF04 | E876 | 76FF |
| 0000064620 | 9AE6 | 6207 | 0000 | C02B | 4689 | 89E8 | E646 | D0E9 |
| 0000064640 | 1E01 | 3068 | 9A10 | 7994 | 6883 | C483 | 6804 | 008C |
| 0000064660 | 009A | A400 | 8368 | 02C4 | 4689 | 89F8 | FA56 | 068E |
| 0000064700 | 2D0A | 8326 | 483E | 0100 | 0374 | 1FE9 | 1E00 | 3368 |
| 0000064720 | 9A1F | 7994 | 68B4 | C483 | 1E04 | 3568 | 1E1F | A868 |
| 0000064740 | 9A23 | 793A | 68DA | C483 | E908 | 0000 | 76FF | FF0C |
| 0000064760 | 0A76 | 76FF | FFFA | F876 | FF9A | 00FF | 8900 | F646 |
| 0000065000 | 76FF | 1EF6 | 3768 | 9A1F | 7994 | 68E9 | C483 | E906 |
| 0000065020 | 015F | 681E | 1F47 | 949A | FA79 | 8368 | 04C4 | 468D |
| 0000065040 | 16FC | 1E50 | 5668 | 9A1F | 79E2 | 64ED | C483 | FF08 |
| 0000065060 | 0C76 | 76FF | FF0A | FC76 | 468D | 16F4 | 8D50 | EA46 |
| 0000065100 | 5016 | FF9A | 00FF | 8900 | F646 | 76FF | FFF6 | FC76 |
| 0000065120 | 681E | 1F5A | 949A | 6879 | 8369 | 08C4 | 7E83 | 00F6 |
| 0000065140 | 0375 | 03E9 | E900 | 0109 | 46C7 | 00F0 | E900 | 0003 |
| 0000065160 | 46FF | 8BF0 | F446 | 4639 | 72F0 | E903 | 0022 | 5E8B |
| 0000065200 | C1F0 | 02E3 | 76C4 | 26EA | 70FF | 2602 | 30FF | 76FF |
| 0000065220 | 1EF0 | 7868 | 9A1F | 7994 | 698D | C483 | E90A | FFD0 |
| 0000065240 | 76FF | FFEC | EA76 | 629A | 0068 | 2B00 | 89C0 | EC46 |
| 0000065260 | 4689 | E9EA | 00BB | 681E | 1F82 | 949A | 9E79 | 8369 |
| 0000065300 | 04C4 | 468D | 16FC | 1E50 | 9268 | 9A1F | 79E2 | 69C9 |
| 0000065320 | C483 | FF08 | 0C76 | 76FF | FF0A | FC76 | 468D | 16F8 |
| 0000065340 | 9A50 | FFFF | 0000 | 4689 | FFF6 | FA76 | 76FF | FFF8 |

THU MAR 14 17:21:24 1991 CLIENT.EXE PAGE 30, LINE 1712

| | | | | | | | | |
|---|---|---|---|---|---|---|---|---|
| 0000065360 | F676 | 681E | 1F96 | 949A | FE79 | 8365 | 0AC4 | 7E83 |
| 0000065400 | 00F6 | 0375 | 03E9 | E900 | 0067 | 64E9 | 3D00 | 004D |
| 0000065420 | 0375 | 0BE9 | 7EFD | E903 | 002A | 412D | 7500 | E903 |
| 0000065440 | FC05 | 032D | 7500 | E903 | FE77 | 032D | 7500 | E903 |
| 0000065460 | FDCC | 4848 | 0375 | 7DE9 | 2DFF | 0003 | 0375 | D1E9 |
| 0000065500 | E9FE | 002D | 612D | 3D00 | 000C | 0376 | 22E9 | D100 |
| 0000065520 | 93E0 | FF2E | 27A7 | F76A | 4165 | 416A | 716A | 4168 |
| 0000065540 | 416A | CE6A | 4167 | 866A | 4169 | 416A | E26A | F068 |
| 0000065560 | 5E66 | 835F | 02ED | E58B | 5D1F | CB4D | 581E | 4590 |
| 0000065600 | 8B55 | 1EEC | D88E | EC81 | 00BA | 5657 | 86C7 | FF78 |
| 0000065620 | 0000 | C02B | 8689 | FF4C | 8689 | FF4A | C02B | 4689 |
| 0000065640 | 89D8 | D646 | C02B | 8689 | FF50 | 8689 | FF4E | C02B |
| 0000065660 | 4689 | 89FC | FA46 | 5EC4 | 2606 | 478A | 9801 | CBE9 |
| 0000065700 | 1E06 | BE68 | 9A1F | 7994 | 6AA2 | C483 | 6A04 | 9A17 |
| 0000065720 | 0000 | 6ABA | C483 | 8902 | D646 | 5689 | 8DD8 | 7886 |
| 0000065740 | 16FF | 1E50 | E168 | 9A1F | 79E2 | 6AD5 | C483 | 8E08 |
| 0000065760 | 0A06 | 262D | 3E83 | 0048 | 7401 | E903 | 001F | 681E |
| 0000066000 | 1FE4 | 949A | E579 | 836A | D4C4 | 681E | 1FE6 | 681E |
| 0000066020 | 23A8 | 3A9A | 0E79 | 836B | 08C4 | 00E9 | 9A00 | FFFF |
| 0000066040 | 0000 | 8689 | FF4A | 9689 | FF4C | 868B | FF4C | 860B |
| 0000066060 | FF4A | 0374 | 0FE9 | 1E00 | E868 | 9A1F | 7994 | 6B48 |
| 0000066100 | C483 | E904 | 069E | 468B | 8BD6 | D856 | 9EC4 | FF4A |
| 0000066120 | 8926 | 2607 | 5789 | C402 | 4A9E | 26FF | 47C7 | 0124 |
| 0000066140 | C400 | 4A9E | 26FF | 47C7 | 0026 | 8D00 | 5686 | 16FF |
| 0000066160 | 1E50 | FD68 | 9A1F | 79E2 | 6B80 | C483 | 8008 | 56BE |
| 0000066200 | 30FF | 0375 | 46E9 | 8D00 | 4A86 | 16FF | 6A50 | 8DFF |
| 0000066220 | 5686 | 16FF | 9A50 | FFFF | 0000 | 4689 | 83D4 | D47E |
| 0000066240 | 7500 | E903 | 0012 | 76FF | 1ED4 | 0068 | 9A20 | 7994 |
| 0000066260 | 6B95 | C483 | E906 | 062C | 868D | FF56 | 5016 | 681E |
| 0000066300 | 2021 | E29A | A479 | 836B | 08C4 | B0E9 | 1EFF | 2468 |
| 0000066320 | 9A20 | 7994 | 6BE3 | C483 | FF04 | 0C76 | 76FF | FF0A |
| 0000066340 | 4CB6 | FFFF | 4AB6 | FFFF | 78B6 | 9AFF | FFFF | 0000 |
| 0000066360 | 4689 | C4D4 | 4A9E | 26FF | 77FF | 2602 | 37FF | 9EC4 |
| 0000066400 | FF4A | FF26 | 0277 | FF26 | FF37 | D476 | 681E | 2033 |
| 0000066420 | 949A | 1379 | 836C | 0EC4 | B6FF | FF4C | B6FF | FF4A |
| 0000066440 | 779A | 0069 | 2B00 | 89C0 | 4C86 | 89FF | 4A86 | 2BFF |
| 0000066460 | 89C0 | 4C86 | 89FF | 4A86 | E9FF | 05A8 | 681E | 1030 |
| 0000066500 | 949A | 1D79 | 836C | 04C4 | 176A | 009A | 3E00 | 836C |
| 0000066520 | 02C4 | 4689 | 89D6 | D856 | 068E | 2D0A | 8326 | 483E |
| 0000066540 | 0100 | 0374 | 1FE9 | 1E00 | 5568 | 9A20 | 7994 | 6C4E |
| 0000066560 | C483 | 1E04 | 5768 | 1E20 | A868 | 9A23 | 793A | 6C7A |
| 0000066600 | C483 | E908 | 0000 | 76FF | FF0C | 0A76 | 76FF | FFD8 |
| 0000066620 | D676 | 868D | FF4A | 5016 | FF9A | 00FF | 8900 | D446 |
| 0000066640 | 76FF | 1ED4 | 5968 | 9A20 | 7994 | 6927 | C483 | 8306 |
| 0000066660 | D47E | 7500 | E903 | 0003 | 29E9 | C405 | 4A9E | 26FF |
| 0000066700 | 77FF | C426 | 4A9E | 26FF | 77FF | C424 | 4A9E | 26FF |
| 0000066720 | 77FF | 2602 | 37FF | 9EC4 | FF4A | FF26 | 0277 | FF26 |
| 0000066740 | 1E37 | 6B68 | 9A20 | 7994 | 6CF6 | C483 | C710 | 5486 |
| 0000066760 | 00FF | E900 | 0004 | 86FF | FF54 | 9EC4 | FF4A | 868B |
| 0000067000 | FF54 | 3926 | 2647 | 0377 | 23E9 | 8B00 | 5486 | C1FF |
| 0000067020 | 05E0 | 8603 | FF4A | 968B | FF4C | 4C05 | 5200 | 1E50 |
| 0000067040 | 9568 | 9A20 | 7994 | 6D1F | C483 | E908 | FFC8 | 5EC4 |
| 0000067060 | 2606 | 7F80 | 6601 | 0375 | 0DE9 | C400 | 065E | 8026 |
| 0000067100 | 017F | 7446 | E903 | 0321 | 681E | 20A4 | 949A | 3A79 |
| 0000067120 | 836D | 04C4 | 068E | 2D0A | 8326 | 483E | 0100 | 0374 |
| 0000067140 | 1FE9 | 1E00 | C268 | 9A20 | 7994 | 6D4A | C483 | 1E04 |
| 0000067160 | C468 | 1E20 | A868 | 9A23 | 793A | 6D6A | C483 | E908 |
| 0000067200 | 0000 | 868D | FF56 | 5016 | 868D | FF76 | 5016 | 468D |
| 0000067220 | 16DA | 1E50 | C668 | 9A20 | 79E2 | 6DE8 | C483 | 8010 |

THU MAR 14 17:21:24 1991 CLIENT.EXE PAGE 31, LINE 1771

| | | | | | | | | |
|---|---|---|---|---|---|---|---|---|
| 0000067240 | DA7E | 7571 | E903 | 024E | 7E80 | 51DA | 0375 | 45E9 |
| 0000067260 | 8A02 | DA46 | E998 | 0199 | 868D | FF4A | 5016 | B6FF |
| 0000067300 | FF76 | 868D | FF56 | 5016 | 669A | 006B | 8900 | D446 |
| 0000067320 | C9E9 | 8D01 | 4A86 | 16FF | FF50 | 76B6 | 8DFF | 5686 |
| 0000067340 | 16FF | 9A50 | FFFF | 0000 | 4689 | E9D4 | 01AE | 76FF |
| 0000067360 | FF0C | 0A76 | B6FF | FF4C | B6FF | FF4A | B6FF | FF76 |
| 0000067400 | 868D | FF7A | 5016 | FF9A | 00FF | 8900 | D446 | 76FF |
| 0000067420 | 1ED4 | CF68 | 9A20 | 7994 | 6E41 | C483 | 8306 | D47E |
| 0000067440 | 7500 | E903 | 0003 | BBE9 | 8D03 | 7A86 | 89FF | 4E86 |
| 0000067460 | 8CFF | 5096 | C4FF | 4E9E | 26FF | 77FF | C42C | 4E9E |
| 0000067500 | 26FF | 77FF | C42A | 4E9E | 26FF | 77FF | C428 | 4E9E |
| 0000067520 | 26FF | 77FF | C426 | 4E9E | 26FF | 77FF | 8B24 | 4E86 |
| 0000067540 | 8BFF | 5096 | 05FF | 0004 | 5052 | 681E | 20E8 | 949A |
| 0000067560 | 7479 | 836E | 12C4 | 23E9 | FF01 | 0C76 | 76FF | FF0A |
| 0000067600 | 4CB6 | FFFF | 4AB6 | 8DFF | 5286 | 16FF | 8D50 | FA46 |
| 0000067620 | 5016 | FF9A | 00FF | 8900 | D446 | 76FF | 1ED4 | 1768 |
| 0000067640 | 9A21 | 7994 | 6F00 | C483 | 8306 | D47E | 7500 | E903 |
| 0000067660 | 000D | 7E81 | ABD4 | 7501 | E903 | 0003 | 25E9 | C703 |
| 0000067700 | 5486 | 00FF | E900 | 0004 | 86FF | FF54 | 868B | FF52 |
| 0000067720 | 8639 | FF54 | 0372 | 5FE9 | 6B00 | 54B6 | 58FF | 5EC4 |
| 0000067740 | 26FA | 70FF | 6B2C | 54B6 | 58FF | 5EC4 | 26FA | 70FF |
| 0000067760 | 6B2A | 54B6 | 58FF | 5EC4 | 26FA | 70FF | 6B28 | 54B6 |
| 0000070000 | 58FF | 5EC4 | 26FA | 70FF | 6B26 | 54B6 | 58FF | 5EC4 |
| 0000070020 | 26FA | 70FF | 6B24 | 5486 | 58FF | 4603 | 8BFA | FC56 |
| 0000070040 | 0405 | 5200 | FF50 | 54B6 | 1EFF | 3168 | 9A21 | 7994 |
| 0000070060 | 6F73 | C483 | E914 | FF90 | 76FF | FFFC | FA76 | F19A |
| 0000070100 | 006B | 2B00 | 89C0 | FC46 | 4689 | E9FA | 004E | 4BE9 |
| 0000070120 | 3D00 | 004C | 0375 | 20E9 | 7EFF | E903 | 001B | 412D |
| 0000070140 | 7500 | E903 | FE52 | 032D | 7500 | E903 | FE65 | 032D |
| 0000070160 | 7500 | E903 | FE78 | 23E9 | 2D00 | 0061 | 0375 | 37E9 |
| 0000070200 | 2DFE | 0003 | 0375 | 4AE9 | 2DFE | 0003 | 0375 | 5DE9 |
| 0000070220 | 2DFE | 0005 | 0375 | E0E9 | E9FE | 0000 | 681E | 2165 |
| 0000070240 | 949A | 8E79 | 836F | 04C4 | 068E | 2D0A | 8326 | 483E |
| 0000070260 | 0100 | 0374 | 1FE9 | 1E00 | 7F68 | 9A21 | 7994 | 6F9E |
| 0000070300 | C483 | 1E04 | 8168 | 1E21 | A868 | 9A23 | 793A | 6FBE |
| 0000070320 | C483 | E908 | 0000 | 868D | FF56 | 5016 | 868D | FF76 |
| 0000070340 | 5016 | 468D | 16DA | 1E50 | 8368 | 9A21 | 79E2 | 6FF3 |
| 0000070360 | C483 | E910 | FDA9 | 9EC4 | FF4A | FF26 | 2677 | 9EC4 |
| 0000070400 | FF4A | FF26 | 2477 | 9EC4 | FF4A | FF26 | 0277 | FF26 |
| 0000070420 | C437 | 4A9E | 26FF | 77FF | 2602 | 37FF | 681E | 218C |
| 0000070440 | 949A | 3179 | 8370 | 10C4 | 86C7 | FF54 | 0000 | 04E9 |
| 0000070460 | FF00 | 5486 | C4FF | 4A9E | 8BFF | 5486 | 26FF | 4739 |
| 0000070500 | 7726 | E903 | 0023 | 868B | FF54 | E0C1 | 0305 | 4A86 |
| 0000070520 | 8BFF | 4C96 | 05FF | 004C | 5052 | 681E | 21B6 | 949A |
| 0000070540 | 9879 | 836A | 08C4 | C8E9 | FFFF | 4CB6 | FFFF | 4AB6 |
| 0000070560 | 9AFF | 7148 | 0000 | C02B | 8689 | FF4C | 8689 | FF4A |
| 0000070600 | C02B | 8689 | FF4C | 8689 | FF4A | 57E9 | 1E01 | 3068 |
| 0000070620 | 9A10 | 7994 | 706E | C483 | 6A04 | 9A17 | 0000 | 708F |
| 0000070640 | C483 | 8902 | D646 | 5689 | 8ED8 | 0A06 | 262D | 3E83 |
| 0000070660 | 0048 | 7401 | E903 | 001F | 681E | 21C5 | 949A | 9F79 |
| 0000070700 | 8370 | 04C4 | 681E | 21C7 | 681E | 23A8 | 3A9A | C579 |
| 0000070720 | 8370 | 08C4 | 00E9 | FF00 | 0C76 | 76FF | FF0A | D876 |
| 0000070740 | 76FF | 9AD6 | FFFF | 0000 | 4689 | FFD4 | D476 | 681E |
| 0000070760 | 21C9 | 949A | F079 | 8370 | 06C4 | E7E9 | FF00 | 0C76 |
| 0000071000 | 76FF | 8D0A | D246 | 5016 | 868D | FF46 | 5016 | FF9A |
| 0000071020 | 00FF | 8900 | D446 | 76FF | 1ED4 | D968 | 9A21 | 7994 |
| 0000071040 | 7137 | C483 | 8306 | D47E | 7500 | E903 | 0003 | B3E9 |
| 0000071060 | C700 | 5486 | 00FF | E900 | 0004 | 86FF | FF54 | 868B |
| 0000071100 | FF54 | 4639 | 77D2 | E903 | 0025 | 9E8B | FF54 | E3C1 |

THU MAR 14 17:21:24 1991 CLIENT.EXE PAGE 32, LINE 1830

| | | | | | | | | |
|---|---|---|---|---|---|---|---|---|
| 0000071120 | C402 | 46B6 | 26FF | 70FF | 2602 | 30FF | B6FF | FF54 |
| 0000071140 | 681E | 21EC | 949A | B879 | 836C | 0AC4 | CBE9 | FFFF |
| 0000071160 | 48B6 | FFFF | 46B6 | 9AFF | 6F0F | 0000 | C02B | 8689 |
| 0000071200 | FF48 | 8689 | FF46 | 5BE9 | E900 | 0058 | 4C3D | 7500 |
| 0000071220 | E903 | FF69 | 037E | 20E9 | 2D00 | 0041 | 0375 | 20E9 |
| 0000071240 | 2DF9 | 0003 | 0375 | E4E9 | 48FE | 7D48 | E903 | 0034 |
| 0000071260 | 7F48 | E903 | FA86 | 2BE9 | 2D00 | 0061 | 0B3D | 7600 |
| 0000071300 | E903 | 0020 | E0D1 | 2E93 | A7FF | 719C | 6A91 | 71B4 |
| 0000071320 | 71B4 | 705D | 71B4 | 6C0C | 6C0C | 71B4 | 71B4 | 71B4 |
| 0000071340 | 71B4 | 70CD | 5F5E | ED83 | 8B02 | 1FE5 | 4D5D | 1ECB |
| 0000071360 | 9058 | 5545 | EC8B | 8E1E | 81D8 | 0AEC | 5700 | FF56 |
| 0000071400 | 0876 | 76FF | 8B06 | 0A46 | 568B | 050C | 0004 | 5052 |
| 0000071420 | A29A | 647B | 8370 | 08C4 | 5EC4 | 260A | 47C7 | 0328 |
| 0000071440 | C400 | 0A5E | C726 | 2A47 | 0002 | 5EC4 | 260A | 478B |
| 0000071460 | 265C | 578B | 895E | FA46 | 5689 | C7FC | F846 | 0000 |
| 0000071500 | 03E9 | FF00 | F846 | 7E83 | 0AF8 | 0372 | 35E9 | C700 |
| 0000071520 | F646 | 0000 | 03E9 | FF00 | F646 | 5EC4 | 260A | 478B |
| 0000071540 | B944 | 000A | D22B | F1F7 | 463B | 77F6 | E903 | 0011 |
| 0000071560 | 468A | FEF8 | C4C0 | FA5E | 46FF | 26FA | 0788 | D6E9 |
| 0000071600 | E9FF | FFBF | 5EC4 | 260A | 478B | 2660 | 578B | 8962 |
| 0000071620 | FA46 | 5689 | C7FC | F846 | 0000 | 03E9 | FF00 | F846 |
| 0000071640 | 7E83 | 0AF8 | 0372 | 35E9 | C700 | F646 | 0000 | 03E9 |
| 0000071660 | FF00 | F646 | 5EC4 | 260A | 478B | B944 | 000A | D22B |
| 0000071700 | F1F7 | 463B | 77F6 | E903 | 0011 | 468A | 04F8 | C40B |
| 0000071720 | FA5E | 46FF | 26FA | 0788 | D6E9 | E9FF | FFBF | 5EC4 |
| 0000071740 | 260A | 478B | 2668 | 578B | 896A | FA46 | 5689 | C7FC |
| 0000071760 | F846 | 0000 | 03E9 | FF00 | F846 | 7E83 | 0AF8 | 0372 |
| 0000072000 | 35E9 | C700 | F646 | 0000 | 03E9 | FF00 | F646 | 5EC4 |
| 0000072020 | 260A | 478B | B966 | 000A | D22B | F1F7 | 463B | 77F6 |
| 0000072040 | E903 | 0011 | 468A | 04F8 | C415 | FA5E | 46FF | 26FA |
| 0000072060 | 0788 | D6E9 | E9FF | FFBF | 5F5E | ED83 | 8B02 | 1FE5 |
| 0000072100 | 4D5D | 1ECB | 9058 | 5545 | EC8B | 8E1E | 81D8 | 08EC |
| 0000072120 | 5700 | C456 | 065E | FF26 | 6677 | 5EC4 | 2606 | 77FF |
| 0000072140 | C444 | 065E | FF26 | 2A77 | 5EC4 | 2606 | 77FF | 8B28 |
| 0000072160 | 0646 | 568B | 0508 | 0004 | 5052 | 681E | 21F6 | 949A |
| 0000072200 | 9679 | 8373 | 10C4 | 7E83 | 000A | 0374 | 03E9 | E900 |
| 0000072220 | 0117 | 5EC4 | 2606 | 478B | 265C | 578B | 895E | FA46 |
| 0000072240 | 5689 | C7FC | F846 | 0000 | 03E9 | FF00 | F846 | 7E83 |
| 0000072260 | 0AF8 | 0372 | 2EE9 | C400 | FA5E | 8A26 | 9807 | 1E50 |
| 0000072300 | 3568 | 9A22 | 7994 | 73AD | C483 | 6A06 | 6A00 | C40A |
| 0000072320 | 065E | FF26 | 4677 | FF26 | 4477 | C49A | BC7E | 0173 |
| 0000072340 | FA46 | C6E9 | 1EFF | 3D68 | 9A22 | 7994 | 73F5 | C483 |
| 0000072360 | C404 | 065E | 8B26 | 6047 | 8B26 | 6257 | 4689 | 89FA |
| 0000072400 | FC56 | 46C7 | 00F8 | E900 | 0003 | 46FF | 83F8 | F87E |
| 0000072420 | 720A | E903 | 002E | 5EC4 | 26FA | 078A | 5098 | 681E |
| 0000072440 | 223F | 949A | 0C79 | 8374 | 06C4 | 006A | 0A6A | 5EC4 |
| 0000072460 | 2606 | 77FF | 2646 | 77FF | 9A44 | 7EC4 | 741B | 4601 |
| 0000072500 | E9FA | FFC6 | 681E | 2247 | 949A | 5479 | 8374 | 04C4 |
| 0000072520 | 5EC4 | 2606 | 478B | 2668 | 578B | 896A | FA46 | 5689 |
| 0000072540 | C7FC | F846 | 0000 | 03E9 | FF00 | F846 | 7E83 | 0AF8 |
| 0000072560 | 0372 | 2BE9 | C400 | FA5E | 8A26 | 9807 | 1E50 | 4968 |
| 0000072600 | 9A22 | 7994 | 7474 | C483 | C406 | 065E | 8B26 | 6647 |
| 0000072620 | 0AB9 | 2B00 | F7D2 | 01F1 | FA46 | CCE9 | 1EFF | 5168 |
| 0000072640 | 9A22 | 7994 | 71E3 | C483 | 5E04 | 835F | 02ED | E58B |
| 0000072660 | 5D1F | CB4D | 581E | 4590 | 8B55 | 1EEC | D88E | EC81 |
| 0000072700 | 00E4 | 5657 | 86C7 | FF2C | 0000 | C02B | 8689 | FF1E |
| 0000072720 | 8689 | FF1C | 46C6 | 00DE | 5EC4 | 2606 | 478A | 9801 |
| 0000072740 | 39E9 | 1E03 | 5368 | 9A22 | 7994 | 74DD | C483 | 8D04 |
| 0000072760 | 2C86 | 16FF | 8D50 | 2886 | 16FF | 8D50 | 2286 | 16FF |

THU MAR 14 17:21:24 1991 CLIENT.EXE PAGE 33, LINE 1889

| | | | | | | | | |
|---|---|---|---|---|---|---|---|---|
| 0000073000 | 8D50 | DE46 | 5016 | 681E | 2282 | E29A | F879 | 8374 |
| 0000073020 | 14C4 | 068E | 2D0A | 8326 | 483E | 0100 | 0374 | 1FE9 |
| 0000073040 | 1E00 | 8E68 | 9A22 | 7994 | 7508 | C483 | 1E04 | 9068 |
| 0000073060 | 1E22 | A868 | 9A23 | 793A | 7351 | C483 | E908 | 0000 |
| 0000073100 | B6FF | FF22 | B6FF | FF28 | 868D | FF1C | 5016 | FF9A |
| 0000073120 | 00FF | 8900 | 3086 | 83FF | 30BE | 00FF | 0375 | 13E9 |
| 0000073140 | FF00 | 30B6 | 1EFF | 9268 | 9A22 | 7994 | 7554 | C483 |
| 0000073160 | E906 | 0301 | B6FF | FF1E | B6FF | FF1C | 468D | 16DE |
| 0000073200 | 9A50 | 71BF | 757E | C483 | 6A08 | 6800 | 00D2 | B6FF |
| 0000073220 | FF1E | B6FF | FF1C | B6FF | FF2C | FF9A | 00FF | 8900 |
| 0000073240 | 3086 | FFFF | 30B6 | 1EFF | AE68 | 9A22 | 7994 | 759A |
| 0000073260 | C483 | FF06 | 1EB6 | FFFF | 1CB6 | 9AFF | 76BA | 0000 |
| 0000073300 | B2E9 | 1E02 | 2668 | 9A10 | 7994 | 75AB | C483 | 8D04 |
| 0000073320 | DE46 | 5016 | 681E | 22C1 | E29A | C679 | 8375 | 08C4 |
| 0000073340 | 068E | 2D0A | 8326 | 483E | 0100 | 0374 | 1FE9 | 1E00 |
| 0000073360 | C468 | 9A22 | 7994 | 75D6 | C483 | 1E04 | C668 | 1E22 |
| 0000073400 | A868 | 9A23 | 793A | 75FC | C483 | E908 | 0000 | 006A |
| 0000073420 | D268 | 8D00 | DE46 | 5016 | FF9A | 00FF | 8900 | 3086 |
| 0000073440 | FFFF | 30B6 | 1EFF | C868 | 9A22 | 7994 | 760B | C483 |
| 0000073460 | E906 | 0241 | 681E | 1026 | 949A | 1C79 | 8376 | 04C4 |
| 0000073500 | 468D | 16DE | 1E50 | DD68 | 9A22 | 79E2 | 7637 | C483 |
| 0000073520 | 8E08 | 0A06 | 262D | 3E83 | 0048 | 7401 | E903 | 001F |
| 0000073540 | 681E | 22E0 | 949A | 4779 | 8376 | 04C4 | 681E | 22E2 |
| 0000073560 | 681E | 23A8 | 3A9A | 8D79 | 8376 | 08C4 | 00E9 | C400 |
| 0000073600 | 065E | 8026 | 017F | 7567 | E903 | 000D | 5EC4 | 2606 |
| 0000073620 | 7F80 | 4701 | 0374 | 58E9 | 6A00 | 6800 | 00D2 | 468D |
| 0000073640 | 16DE | 8D50 | 1C86 | 16FF | 9A50 | FFFF | 0000 | 8689 |
| 0000073660 | FF30 | B6FF | FF30 | 681E | 22E4 | 949A | AC79 | 8376 |
| 0000073700 | 06C4 | BE83 | FF30 | 7500 | E903 | 0003 | A6E9 | 6A01 |
| 0000073720 | FF01 | 1EB6 | FFFF | 1CB6 | 9AFF | 7313 | 76E5 | C483 |
| 0000073740 | FF06 | 1EB6 | FFFF | 1CB6 | 9AFF | FFFF | 0000 | 46E9 |
| 0000073760 | 6A00 | 6800 | 00D2 | 468D | 16DE | 8D50 | 3286 | 16FF |
| 0000074000 | 9A50 | FFFF | 0000 | 8689 | FF30 | B6FF | FF30 | 681E |
| 0000074020 | 22F7 | 949A | 0279 | 8377 | 06C4 | BE83 | FF30 | 7500 |
| 0000074040 | E903 | 0003 | 4EE9 | 6A01 | 8D00 | 3286 | 16FF | 9A50 |
| 0000074060 | 7313 | 7711 | C483 | E906 | 013B | 681E | 2311 | 949A |
| 0000074100 | 2379 | 8377 | 04C4 | 868D | FF20 | 5016 | 681E | 2333 |
| 0000074120 | E29A | 3E79 | 8377 | 08C4 | 068E | 2D0A | 8326 | 483E |
| 0000074140 | 0100 | 0374 | 1FE9 | 1E00 | 3668 | 9A23 | 7994 | 774E |
| 0000074160 | C483 | 1E04 | 3868 | 1E23 | A868 | 9A23 | 793A | 777F |
| 0000074200 | C483 | E908 | 0000 | 006A | D268 | FF00 | 20B6 | 8DFF |
| 0000074220 | 2E86 | 16FF | 8D50 | 2486 | 16FF | 9A50 | FFFF | 0000 |
| 0000074240 | 8689 | FF30 | B6FF | FF30 | 681E | 233A | 949A | C779 |
| 0000074260 | 8377 | 06C4 | BE83 | FF30 | 7500 | E903 | 0003 | B4E9 |
| 0000074300 | C700 | 2A86 | 00FF | E900 | 0004 | 86FF | FF2A | 868B |
| 0000074320 | FF2E | 8639 | FF2A | 0372 | 24E9 | 8B00 | 2A86 | C1FF |
| 0000074340 | 05E0 | 8603 | FF24 | 968B | FF26 | 5052 | B6FF | FF2A |
| 0000074360 | 681E | 234E | 949A | BA79 | 8374 | 0AC4 | CBE9 | FFFF |
| 0000074400 | 26B6 | FFFF | 24B6 | 9AFF | 7042 | 0000 | C02B | 8689 |
| 0000074420 | FF26 | 8689 | FF24 | 5CE9 | E900 | 0059 | 4C3D | 7500 |
| 0000074440 | E903 | FF16 | 037E | 21E9 | 2D00 | 0041 | 0375 | B2E9 |
| 0000074460 | 2DFC | 0003 | 0375 | 8AE9 | 2DFD | 0003 | 037D | 34E9 |
| 0000074500 | 4800 | 037F | EDE9 | E9FD | 002B | 612D | 3D00 | 000B |
| 0000074520 | 0376 | 20E9 | D100 | 93E0 | FF2E | 2DA7 | B378 | 4574 |
| 0000074540 | 4578 | 9378 | 4575 | 4578 | 0478 | 0476 | 4576 | 4578 |
| 0000074560 | 4578 | 0A78 | 5E77 | 835F | 02ED | E58B | 5D1F | CB4D |
| 0000074600 | 0000 | 0000 | 0000 | 0000 | 0000 | 0000 | 0000 | 0000 |
| 0000074620 | A3FC | 235A | 1E89 | 2358 | 8949 | 640E | BB23 | 2366 |
| 0000074640 | 1F8C | E483 | 89FE | 0467 | FEB8 | 50FF | 6789 | F70A |

THU MAR 14 17:21:24 1971 CLIENT.EXE PAGE 34, LINE 1948

| | | | | | | | | |
|---|---|---|---|---|---|---|---|---|
| 0000074660 | 50D0 | 6789 | 8906 | 0867 | 2689 | 235C | 681E | 235E |
| 0000074700 | 681E | 2362 | FF9A | 00FF | 8E00 | 5E06 | 2623 | 15A1 |
| 0000074720 | A300 | 2798 | 46E8 | 9A00 | 81A4 | 753C | 2C9A | AA83 |
| 0000074740 | 9A78 | 7FD8 | 78AF | 36FF | 29A6 | 36FF | 29A4 | 36FF |
| 0000074760 | 29A2 | 36FF | 29A0 | 36FF | 299E | 249A | B42D | 5078 |
| 0000075000 | E80E | 079C | FFB8 | 8EFF | B8D8 | 0003 | 0E50 | A1E8 |
| 0000075020 | 0E08 | 1BE8 | B80B | 00FF | 0E50 | 8AE8 | BB07 | 000D |
| 0000075040 | FF33 | 068E | 235A | FFB9 | 267F | 3D80 | 7500 | 4701 |
| 0000075060 | 8026 | 003D | 3174 | 7ABE | 8B23 | 8BD1 | F3CB | 8BA6 |
| 0000075100 | 74CA | 3308 | F2C0 | 74AE | EBE7 | 061C | 071E | F78B |
| 0000075120 | BF1F | 279E | 2CAC | 7241 | C00E | 04E0 | AC92 | 412C |
| 0000075140 | 0572 | C20A | EBAA | 16ED | C31F | 08C8 | 0000 | 5657 |
| 0000075160 | 768B | 8B06 | 2DC6 | 2390 | 0CB9 | 9900 | F9F7 | 4689 |
| 0000075200 | 50FA | 51E8 | 831E | 02C4 | 561E | 1BE8 | 830D | 04C4 |
| 0000075220 | F88B | 468D | 160E | FF50 | 0C76 | 76FF | 1E0A | 9A56 |
| 0000075240 | 8F72 | 78CD | C483 | 890C | F846 | 561E | E857 | 0D70 |
| 0000075260 | C483 | FF06 | FA76 | 29E8 | 831E | 02C4 | 468B | 5EF8 |
| 0000075300 | C95F | 90CB | 08C8 | 0000 | B857 | 0001 | E850 | 1E06 |
| 0000075320 | C483 | 1E02 | 9C68 | E823 | 0CCE | C483 | 8B04 | 8DF8 |
| 0000075340 | 0A46 | 5016 | 76FF | FF08 | 0676 | 681E | 239C | 729A |
| 0000075360 | 728F | 8379 | 0CC4 | 4689 | 1EF8 | 9C68 | 5723 | 1FE8 |
| 0000075400 | 830D | 06C4 | 016A | D9E8 | 831D | 02C4 | 468B | 5FF8 |
| 0000075420 | CBC9 | 06C8 | 0000 | 5657 | C02B | E850 | 1DB8 | C483 |
| 0000075440 | 8D02 | 0A46 | 5016 | 76FF | FF08 | 0676 | 90BE | 1E23 |
| 0000075460 | 9A56 | 8738 | 79C1 | C483 | 8B0C | 6AF8 | E800 | 1DA2 |
| 0000075500 | C483 | 8B02 | 5EC7 | C95F | 90CB | 04C8 | 0000 | 468B |
| 0000075520 | 0B08 | 0646 | 0875 | 006A | A7E8 | EBP0 | 9031 | 468B |
| 0000075540 | 2D06 | 2390 | 0CB9 | 9900 | F9F7 | 4689 | 50FC | 65E8 |
| 0000075560 | 831D | 02C4 | 76FF | FF08 | 0676 | 609A | A47A | 837A |
| 0000075600 | 04C4 | 4689 | FFFE | FC76 | 57E8 | 8B1D | FE46 | CBC9 |
| 0000075620 | 02C8 | 0000 | 5657 | FF2B | 768B | 8A06 | 0A44 | C88B |
| 0000075640 | 0324 | 023C | 3F75 | C1F6 | 7508 | 8B0D | 81DE | 90EB |
| 0000075660 | F623 | 7087 | 0125 | 2D74 | 048B | 442B | 8906 | FE46 |
| 0000075700 | C00B | 217E | FF50 | 0874 | 74FF | 8A06 | 0B4C | ED2A |
| 0000075720 | 9A51 | 9466 | 7B21 | C483 | 3908 | FE46 | 0774 | 4C80 |
| 0000075740 | 200A | FFBF | 8BFF | 0644 | 548B | 8908 | 8904 | 0254 |
| 0000075760 | 44C7 | 0004 | 8B00 | 5EC7 | C95F | 90CB | 016A | 01E8 |
| 0000076000 | CB00 | 04C8 | 0000 | 5657 | 90BE | 2B23 | 89FF | FE7E |
| 0000076020 | 026A | 11E8 | 831D | 02C4 | 11EB | 46C7 | FFFE | FFFF |
| 0000076040 | FC76 | BDE8 | 831C | 02C4 | C683 | 390C | 5036 | 7227 |
| 0000076060 | 8B2B | 2DC6 | 2390 | 0CB9 | 9900 | F9F7 | 4689 | 50FC |
| 0000076100 | 93E8 | 831C | 02C4 | 44F6 | 830A | D374 | 561E | 609A |
| 0000076120 | 047A | 837A | 04C4 | 7440 | 47C1 | C3EB | 026A | EBE8 |
| 0000076140 | 831C | 02C4 | 7E83 | 0104 | 0475 | C78B | 03EB | 468B |
| 0000076160 | 5EFE | C95F | 02C2 | 9000 | 63EA | 4D96 | EA7A | 9682 |
| 0000076200 | 7B4B | 50EA | 5096 | EA7B | 9650 | 7B55 | 8B55 | 8BEC |
| 0000076220 | 8BD7 | 1EDE | 7EC4 | 3306 | B9C0 | FFFF | AEF2 | 758D |
| 0000076240 | C4FF | 0A7E | FFB9 | F2FF | F7AE | 2BD1 | 8CF9 | 8EC0 |
| 0000076260 | 8ED8 | 0846 | FE87 | 468B | F706 | 01C6 | 7400 | A402 |
| 0000076300 | D149 | F3E9 | 13A5 | F3C9 | 8BA4 | 8BF3 | 1FFA | C28C |
| 0000076320 | CB5D | 8B55 | 8BEC | 8BD7 | 1EDE | 76C5 | 8B0A | 8CFE |
| 0000076340 | 8ED8 | 33C0 | B9C0 | FFFF | AEF2 | D1F7 | 7EC4 | 8B06 |
| 0000076360 | A8C7 | 7401 | A402 | D149 | F3E9 | 13A5 | F3C9 | 8BA4 |
| 0000076400 | 8BF3 | 1FFA | C28C | CB5D | 8B55 | 8BEC | C4D7 | 067E |
| 0000076420 | C033 | FFB9 | F2FF | F7AE | 49D1 | 8B91 | 5DFA | 00CB |
| 0000076440 | 8B55 | 56EC | B857 | 0000 | E850 | 1BAA | C483 | BB02 |
| 0000076460 | 2390 | 7EC4 | 8B06 | 044F | 17E3 | C51E | B437 | 510A |
| 0000076500 | AAAC | C43A | FAE0 | 1F58 | 3789 | 2E74 | 4729 | EB04 |
| 0000076520 | 06E4 | 1E53 | 0E53 | CDE8 | 8308 | 04C4 | 075B | 0A3C |

THU MAR 14 17:21:24 1991 CLIENT.EXE PAGE 35, LINE 2007

| | | | | | | | | |
|---|---|---|---|---|---|---|---|---|
| 0000076540 | 1E74 | FF3D | 74FF | AA03 | CBEB | 7E3B | 7406 | F606 |
| 0000076560 | 0A47 | 7420 | 330B | 99C0 | 0FEB | C12B | 4729 | 4F04 |
| 0000076600 | C033 | 8BAA | 0646 | 568B | BB08 | 0000 | E853 | 1B52 |
| 0000076620 | C483 | 5F02 | 5D5E | 00CB | 04C8 | 0000 | 5657 | 126A |
| 0000076640 | 83E8 | 831B | 02C4 | 06C6 | 3046 | 8B42 | 0646 | 568B |
| 0000076660 | A308 | 3042 | 1689 | 3044 | 3CBE | 8930 | 8904 | 0254 |
| 0000076700 | 06C7 | 3040 | 7FFF | 468D | 160E | FF50 | 0C76 | 76FF |
| 0000076720 | 1E0A | 9A56 | 8F72 | 7CC9 | C483 | 8B0C | FFF8 | 400E |
| 0000076740 | 7830 | C40F | 3C1E | FF30 | 3C06 | 2630 | 07C6 | EB00 |
| 0000076760 | 900D | 561E | 006A | 929A | 5A85 | 837B | 06C4 | 126A |
| 0000077000 | 49E8 | 831B | ^2C4 | C78B | 5F5E | CBC9 | 8B55 | 57EC |
| 0000077020 | 468B | F706 | 0866 | 0573 | C033 | EB99 | 501A | 489A |
| 0000077040 | A67B | 597C | D88B | DA0B | 0D74 | 8B50 | 8EF8 | 33C2 |
| 0000077060 | 41C0 | E9D1 | ABF3 | 5F58 | CB5D | 04C8 | 0000 | 76FF |
| 0000077100 | FF08 | 0676 | F49A | 2A99 | 837D | 04C4 | 5689 | 0BFE |
| 0000077120 | 74D0 | FF0F | FE76 | 9A50 | 988E | 7CF1 | C483 | EB04 |
| 0000077140 | 9004 | C02B | C999 | 90CB | 8B55 | 8BEC | 0E4E | 571E |
| 0000077160 | E356 | C548 | 0A76 | 7EC4 | 8B06 | 48C1 | D78B | D2F7 |
| 0000077200 | C22B | DB1B | C323 | C203 | D68B | D2F7 | C22B | DB1B |
| 0000077220 | C323 | C203 | 9140 | C12B | E9D1 | A5F3 | C913 | A4F3 |
| 0000077240 | E391 | 0B18 | 75F6 | 8C07 | 05D8 | FFFF | D88E | FF0B |
| 0000077260 | C775 | C08C | 7A05 | 8E7D | EBC0 | 8BBE | 0646 | 568B |
| 0000077300 | 5E08 | 1F5F | CB5D | 8B55 | 8BEC | 0C4E | 38E3 | C457 |
| 0000077320 | 067E | D78B | DAF7 | 0C74 | D12B | DB1B | D323 | D103 |
| 0000077340 | D187 | D12B | 468B | 8A0A | D1E0 | F3E9 | 13AB | F3C9 |
| 0000077360 | 87AA | E3D1 | 8C10 | 81C3 | 85C3 | 8E7D | D1C3 | F3E9 |
| 0000077400 | 13AB | F3C9 | 5FAA | 468B | 8B06 | 0856 | CB5D | 581E |
| 0000077420 | 4590 | 8B55 | 1EEC | D88E | EC83 | 1E18 | 5468 | 9A27 |
| 0000077440 | 9700 | 7E0E | C483 | 8904 | EE46 | 5689 | 8BF0 | 0846 |
| 0000077460 | 460B | 7506 | 6A1F | 5200 | 76FF | 9AEE | 9FDA | 7E60 |
| 0000077500 | C483 | 0B06 | 75C0 | B807 | 0001 | 9FE9 | 9000 | C02B |
| 0000077520 | 99E9 | 9000 | 46C7 | 5CF2 | 8C27 | F45E | 468B | 8B06 |
| 0000077540 | 0856 | 4689 | 89F6 | F856 | C02B | 4689 | 89FC | FA46 |
| 0000077560 | 468B | 0BF0 | EE46 | 4674 | 36FF | 29A6 | 36FF | 29A4 |
| 0000077600 | 468D | 16EE | FF50 | F076 | 76FF | 6AEE | 9A00 | 9BDA |
| 0000077620 | 7E6E | C483 | 890E | EC46 | 7540 | 9A1E | 84EA | 7E7D |
| 0000077640 | C28E | D88B | 8326 | 023F | 1474 | EA9A | BA84 | 8E7E |
| 0000077660 | 8BC2 | 26D8 | 3F83 | 740D | 8B05 | EC46 | 2EEB | 3E80 |
| 0000077700 | 279A | 7400 | C707 | EE46 | 275F | 05EB | 46C7 | 67EE |
| 0000077720 | 8C27 | F05E | 36FF | 29A6 | 36FF | 29A4 | 468D | 16EE |
| 0000077740 | 1E50 | 76FF | 6AEE | 9A00 | 9E0C | 7D17 | 4D4D | E58B |
| 0000077760 | 5D1F | CB4D | 8B55 | 57EC | 5356 | FF33 | 468B | 0B08 |
| 0000100000 | 7DC0 | 4711 | 568B | F706 | F7D8 | 1DDA | 0000 | 4689 |
| 0000100020 | 8908 | 0656 | 468B | 0B0C | 7DC0 | 4711 | 568B | F70A |
| 0000100040 | F7D8 | 1DDA | 0000 | 4689 | 890C | 0A56 | C00B | 1575 |
| 0000100060 | 4E8B | 8B0A | 0846 | D233 | F1F7 | D88B | 468B | F706 |
| 0000100100 | 8BF1 | EBD3 | 8B38 | 8BD8 | 0A4E | 568B | 8B08 | 0646 |
| 0000100120 | EBD1 | D9D1 | EAD1 | D8D1 | DB0B | F475 | F1F7 | F08B |
| 0000100140 | 66F7 | 910C | 468B | F70A | 03E6 | 72D1 | 3B0C | 0856 |
| 0000100160 | 0777 | 0672 | 463B | 7606 | 4E01 | D233 | 4F96 | 0775 |
| 0000100200 | DAF7 | D8F7 | DA83 | 5B00 | 5F5E | CA5D | 0008 | 8B55 |
| 0000100220 | 8BEC | 0846 | 4E8B | 0B0C | 8BC8 | 0A4E | 0975 | 468B |
| 0000100240 | F706 | 5DE1 | 08CA | 5300 | E1F7 | D88B | 468B | F706 |
| 0000100260 | 0C66 | D803 | 468B | F706 | 03E1 | 5BD3 | CA5D | 0008 |
| 0000100300 | 8B55 | 83EC | 0CEC | 5153 | 5756 | D99B | FE7E | 9B90 |
| 0000100320 | 468B | 80FE | 0CCC | 4689 | 9BFC | 6ED9 | 9BFC | 7EDF |
| 0000100340 | 9BF4 | 6ED9 | 8BFE | F446 | 568B | 5FF6 | 595E | 8B5B |
| 0000100360 | 5DE5 | 00CB | 5756 | D88C | C08E | 74BE | BF27 | 2A2C |
| 0000100400 | 0CB9 | F300 | 5FA5 | CB5E | 286A | FF9A | 00FF | BB00 |

THU MAR 14 17:21:24 1991 CLIENT.EXE PAGE 36, LINE 2066

| | | | | | | | | |
|---|---|---|---|---|---|---|---|---|
| 0000100420 | 0002 | 8B52 | 80D4 | 9EA7 | B727 | 8B50 | 53C4 | 5016 |
| 0000100440 | 5216 | FF9A | 00FF | 0B00 | 58C0 | 1075 | 40B1 | 013C |
| 0000100460 | 0674 | 023C | 0675 | 08B1 | 8F08 | 279E | 794B | 5AD6 |
| 0000100500 | C033 | 5050 | DC8B | BA50 | 78D4 | 520E | 5316 | FF9A |
| 0000100520 | 00FF | 5800 | E858 | 0013 | 06BE | BF2D | 2D06 | 3DE8 |
| 0000100540 | BE01 | 2D02 | 06BF | E82D | 0134 | 8BCB | F80E | E32C |
| 0000100560 | 8B2E | 5A36 | C423 | FA06 | 8C2C | 33C2 | FFDB | F61E |
| 0000100600 | 732C | E903 | 2AA6 | 068E | 2362 | 8B26 | 061E | 4B00 |
| 0000100620 | 0D75 | 06C4 | 2CFE | C28C | 03BB | FF00 | F61E | C32C |
| 0000100640 | 8B55 | 33EC | EBC9 | 551A | EC8B | 01B9 | EB00 | 5512 |
| 0000100660 | EC8B | 5756 | 00B9 | EB01 | 5508 | EC8B | 5756 | 01B° |
| 0000100700 | E801 | 005F | 0A51 | 75C9 | BE12 | 3064 | 64BF | E830 |
| 0000100720 | 00CC | 06BE | BF2D | 2D0A | C3E8 | BE00 | 2D0A | 0ABF |
| 0000100740 | E82D | 00BA | 0ABE | BF2D | 2D0A | B1E8 | 9A00 | AB34 |
| 0000100760 | 7DF2 | C00B | 1174 | 0A58 | 50E4 | 0B75 | 7E83 | 0006 |
| 0000101000 | 0575 | 46C7 | FF06 | E800 | 0086 | 0A58 | 75E4 | B80D |
| 0000101020 | 0001 | 8A50 | 0646 | 9A50 | FFFF | 0000 | 4EE8 | 5F00 |
| 0000101040 | 5D5E | 55CB | EC8B | 0D6A | FBE8 | 8316 | 02C4 | 068E |
| 0000101060 | 2362 | 8B26 | 061E | 4B00 | 168B | 29AE | FA83 | 75FF |
| 0000101100 | 8904 | AE1E | 3929 | AE1E | 9F29 | 0D6A | FDE8 | 8316 |
| 0000101120 | 02C4 | 749E | 6A0A | E80E | 16AC | C483 | EB02 | 3BC7 |
| 0000101140 | 74D3 | 6A08 | E80E | 16BE | C483 | 5D02 | 55C3 | EC8B |
| 0000101160 | 0D6A | B1E8 | 8316 | 02C4 | 06C7 | 29AE | FFFF | 0D6A |
| 0000101200 | C9E8 | 8316 | 02C4 | 0E6A | C1E8 | 8316 | 02C4 | C35D |
| 0000101220 | 0E8B | 2CF8 | ü7E3 | 02BB | FF00 | F61E | C32C | F73B |
| 0000101240 | 0E73 | EF83 | 8B04 | 0B05 | 0245 | F274 | 1DFF | EEEB |
| 0000101260 | 00C3 | 8B55 | B8EC | 00FC | 0E50 | 73E8 | 8302 | B23E |
| 0000101300 | 0029 | 0474 | 1EFF | 29B0 | FFB8 | 5000 | E80E | 0260 |
| 0000101320 | E58B | CB5D | 068F | 29B6 | 068F | 29B8 | 58A1 | 8E23 |
| 0000101340 | 5A1E | 8B23 | 4EF0 | 0674 | 7C80 | 00FF | F775 | 8936 |
| 0000101360 | A836 | 3629 | 1E8C | 29AA | F696 | FF04 | 0175 | 3696 |
| 0000101400 | 3689 | 29B4 | D233 | 01BF | AC00 | 0A42 | 75C0 | ACFA |
| 0000101420 | 203C | FB74 | 093C | F774 | C00A | 6374 | 4E47 | 3CAC |
| 0000101440 | 7420 | 3CEC | 7409 | 0AE8 | 74C0 | 3C54 | 7422 | 3C24 |
| 0000101460 | 745C | 4203 | E8EB | C933 | AC41 | 5C3C | FA74 | 223C |
| 0000101500 | 0474 | D103 | D7EB | C18B | E9D1 | D113 | 01A8 | CE75 |
| 0000101520 | 01EB | AC4E | C00A | 2774 | 223C | C274 | 5C3C | 0374 |
| 0000101540 | EB42 | 33F0 | 41C9 | 3CAC | 745C | 3CFA | 7422 | 0304 |
| 0000101560 | EBD1 | 8BDF | D1C1 | 13E9 | A8D1 | 7501 | EBD6 | 169F |
| 0000101600 | 891F | 9E3E | 0329 | 47D7 | E7D1 | E7D1 | C78B | C203 |
| 0000101620 | 2440 | E8FE | 28F2 | 0673 | 08B8 | E900 | F66E | A0A3 |
| 0000101640 | 8929 | A216 | 8B29 | 03D8 | 8EF8 | 26C2 | 3F89 | 8C26 |
| 0000101660 | 0247 | C383 | 8B04 | B436 | 8E29 | 5A1E | AC23 | 0AAA |
| 0000101700 | 75C0 | EBFA | 3303 | AAC0 | 3CAC | 7420 | 3CFB | 7409 |
| 0000101720 | 0AF7 | 74C0 | 2675 | 3F89 | 8C26 | 0247 | C383 | 4E04 |
| 0000101740 | 3CAC | 7420 | 3CE0 | 7409 | 0ADC | 74C0 | 3C5A | 7422 |
| 0000101760 | 3C27 | 745C | AA03 | E8EB | C933 | AC41 | 5C3C | FA74 |
| 0000102000 | 223C | 0674 | 5CB0 | AAF3 | D5EB | 5CB0 | E9D1 | AAF3 |
| 0000102020 | 0673 | 22B0 | EBAA | 4EC9 | 0AAC | 74C0 | 3C2A | 7422 |
| 0000102040 | 3CBF | 745C | AA03 | F0EB | C933 | AC41 | 5C3C | FA74 |
| 0000102060 | 223C | 0674 | 5CB0 | AAF3 | DDEB | 5CB0 | E9D1 | AAF3 |
| 0000102100 | 9E73 | 22B0 | EBAA | 33D1 | AAC0 | C726 | 0007 | 2600 |
| 0000102120 | 47C7 | 0002 | 1600 | FF1F | B62E | 0029 | 8B55 | 83EC |
| 0000102140 | 08EC | 8E1E | 5A06 | 8C23 | FC46 | 5E8C | 33FE | 33C0 |
| 0000102160 | 33F6 | B9FF | FFFF | 3A26 | 7405 | F206 | 46AE | 75AE |
| 0000102200 | 8BFA | 40C7 | FE24 | 8B46 | D1FE | D1E6 | E8E6 | 27F8 |
| 0000102220 | 1772 | 5689 | 50F8 | C68B | EDE8 | 7227 | A30C | 29A4 |
| 0000102240 | 1689 | 29A6 | 5689 | EBFA | B806 | 0009 | 5DE9 | 8BF5 |
| 0000102260 | 8BCF | 33D8 | 5FF6 | 1E06 | 1F07 | E349 | 8B35 | 8E04 |

THU MAR 14 17:21:24 1991 CLIENT.EXE PAGE 37, LINE 2125

| | | | | | | | | |
|---|---|---|---|---|---|---|---|---|
| 0000102300 | FE46 | 3B26 | 7A06 | 7523 | 510E | 5756 | 7ABF | B923 |
| 0000102320 | 0006 | A7F3 | 5E5F | 8E59 | F846 | 0B74 | 5E8E | 89FA |
| 0000102340 | 8C3F | 0247 | C383 | 8E04 | FC5E | AAAC | C00A | FA75 |
| 0000102360 | CBE2 | 5E8E | 89FA | 890F | 024F | 8B1F | 5DE5 | 00CB |
| 0000102400 | 8B55 | 56EC | B857 | 78D5 | D88E | C08E | 568B | BE06 |
| 0000102420 | 2D26 | 3BAD | 74C2 | 4010 | 7496 | 970C | C033 | FFB9 |
| 0000102440 | F2FF | 8BAE | EBF7 | 96EB | 5E5F | E58B | CA5D | 0002 |
| 0000102460 | 8B55 | 57EC | 76FF | 0E06 | C5E8 | 0BFF | 74C0 | 921F |
| 0000102500 | FA8B | C033 | FFB9 | F2FF | F7AE | 49D1 | 8B50 | BBC4 |
| 0000102520 | 0002 | 1E53 | 5152 | 5016 | FF9A | 00FF | 5B00 | 8B5F |
| 0000102540 | 5DE5 | 02CA | 0000 | 1601 | 0202 | 0203 | 1804 | 0D05 |
| 0000102560 | 0906 | 0C07 | 0C08 | 0C09 | 070A | 080B | 160C | 160D |
| 0000102600 | 020F | 0D10 | 1211 | 0212 | 0235 | 0D41 | 0243 | 0D52 |
| 0000102620 | 0D53 | 0D57 | 0B59 | 0D6C | 206D | 1C70 | 0972 | 1606 |
| 0000102640 | 0A80 | 0A81 | 0982 | 0D84 | 0BA4 | 02CE | 0BD7 | 0D00 |
| 0000102660 | 1608 | 8B52 | E8D8 | 2CAA | 8E93 | 5AC2 | 8926 | 0247 |
| 0000102700 | 8926 | B817 | FFFF | 8B99 | 5DE5 | E8CB | 0008 | FFB8 |
| 0000102720 | 99FF | E58B | CB5D | D88B | 87E8 | 932C | C28E | 8926 |
| 0000102740 | 0247 | BB53 | 8436 | 24B9 | 0A00 | 75E4 | 2E1B | 073A |
| 0000102760 | 1674 | 4343 | F7E2 | 133C | 0472 | 243C | 0A76 | 3C43 |
| 0000103000 | 72BC | 3C04 | 76CA | 4301 | 8A2E | 0147 | 5B98 | 8926 |
| 0000103020 | C307 | 8B55 | BBEC | 0002 | 05EB | 8B55 | 33EC | E8DB |
| 0000103040 | 2C40 | C303 | CB5D | 8B55 | 56EC | 8B57 | 0676 | 448A |
| 0000103060 | A80A | 7483 | A85F | 7540 | A85B | 7502 | 0C48 | 8801 |
| 0000103100 | 0A44 | FE8B | EF81 | 2390 | C781 | 2570 | 0CA8 | 0D75 |
| 0000103120 | 05F6 | 7501 | 1E08 | E856 | 2650 | C483 | 8B04 | 0644 |
| 0000103140 | 0489 | 75FF | FF02 | 0874 | 3350 | 8ADB | 0B5C | 0E53 |
| 0000103160 | A5E8 | 8327 | 08C4 | C00B | 1174 | FF3D | 75FF | 801A |
| 0000103200 | 0A4C | EB20 | 800A | 0A4C | EB20 | 8009 | 0A4C | C710 |
| 0000103220 | 0444 | 0000 | FFB8 | EBFF | 8A25 | 9EBF | 8027 | 82E7 |
| 0000103240 | FF80 | 7582 | 8A0B | 0A7C | C7F6 | 7582 | 8003 | 200D |
| 0000103260 | 8948 | 0444 | 1CC4 | C033 | 8A26 | 4307 | 1C89 | 5E5F |
| 0000103300 | CB5D | 8B55 | 56EC | 8B57 | 0876 | 448A | A80A | 7482 |
| 0000103320 | A864 | 7540 | C760 | 0444 | 0000 | 01A8 | 0B74 | 10A8 |
| 0000103340 | 5374 | 4C8B | 8906 | 240C | 0CFE | 2402 | 88EF | 0A44 |
| 0000103360 | FE8B | EF81 | 2390 | C781 | 2570 | DB33 | 5C8A | A80B |
| 0000103400 | 7508 | A84B | 7504 | F618 | 0105 | 4275 | FE81 | 239C |
| 0000103420 | 0674 | FE81 | 23A8 | 2675 | 87F6 | 279E | 7440 | B91F |
| 0000103440 | 0001 | 1651 | 7E8D | 5706 | 0E53 | 69E8 | 830E | 08C4 |
| 0000103460 | 01B9 | EB00 | B846 | FFFF | 4C80 | 200A | 65EB | 1E53 |
| 0000103500 | E856 | 2566 | C483 | 5B04 | 44F6 | 080A | D174 | 0C8B |
| 0000103520 | 548B | 2B06 | 42CA | 1489 | 558B | 4A02 | 5489 | E304 |
| 0000103540 | 5125 | FF51 | D874 | 74FF | 5306 | E80E | 0E28 | C483 |
| 0000103560 | 5908 | 7CC4 | 8B06 | 0656 | 8826 | 3B15 | 75C1 | 33B6 |
| 0000103600 | 8AC0 | 0646 | 1DEB | C033 | 87F6 | 279E | 7420 | B9E3 |
| 0000103620 | 0002 | 5051 | 5350 | E80E | 2610 | C483 | 3308 | 8BC0 |
| 0000103640 | EBC8 | 5FCF | 5D5E | 00CB | 8B55 | 56EC | 8B57 | 0476 |
| 0000103660 | BABB | 8129 | 9CFE | 7423 | BB09 | 29BE | FE81 | 23AB |
| 0000103700 | 5875 | FE8B | EF81 | 2390 | C781 | 2570 | 44F6 | 0C0A |
| 0000103720 | 4875 | 05F6 | 7501 | 8B43 | 8B07 | 0257 | C88B | CAUB |
| 0000103740 | 2174 | 4489 | 8906 | 0854 | 0489 | 5489 | C702 | 0444 |
| 0000103760 | 0200 | 45C7 | 0002 | 8002 | 0A4C | C602 | 1105 | 01B8 |
| 0000104000 | EB00 | 5319 | 00B8 | 5002 | 489A | C07B | 5B80 | 0B5B |
| 0000104020 | 74D2 | 8907 | 8907 | 0257 | C8EB | C033 | 5E5F | C35D |
| 0000104040 | 8B55 | 56EC | 8B57 | 0676 | FE8B | EF81 | 2390 | C781 |
| 0000104060 | 2570 | 05F6 | 7410 | 332D | 8ADB | 0B5C | 87F6 | 279E |
| 0000104100 | 7440 | 1E21 | 0E56 | 47E8 | 83F3 | 04C4 | 7E83 | 0004 |
| 0000104120 | 1274 | C033 | 0588 | 4589 | 8902 | 8904 | 0244 | 4489 |
| 0000104140 | 8906 | 0844 | 5E5F | C35D | 8B55 | B8EC | 01B4 | 029A |

THU MAR 14 17:21:24 1991 CLIENT.EXE PAGE 38, LINE 2184

| | | | | | | | | |
|---|---|---|---|---|---|---|---|---|
| 0000104160 | F2AB | 5788 | C656 | B846 | 2B00 | 89C0 | E846 | 4689 |
| 0000104200 | C4C6 | 0A5E | 8026 | 003F | 0375 | 5FE9 | 2607 | 1F8A |
| 0000104220 | FF2A | 87F6 | 2AC5 | 7408 | FF2D | E84E | 468D | 16E8 |
| 0000104240 | FF50 | 0876 | 76FF | E806 | 07C6 | FF50 | 0876 | 76FF |
| 0000104260 | E806 | 07A0 | 46FF | C40A | 0A5E | 8A26 | 2A1F | F6FF |
| 0000104300 | C587 | 082A | EE75 | 5E8B | 260A | 3F80 | 7425 | E903 |
| 0000104320 | 06F2 | 46C6 | 00C0 | C02A | 4688 | 88FC | B646 | 4688 |
| 0000104340 | 88F2 | F646 | 4688 | 88EE | 5286 | 2BFE | 89C0 | EA46 |
| 0000104360 | 4689 | 89BA | FE46 | 4689 | 89C4 | C246 | 68EB | 9090 |
| 0000104400 | 46FF | C40A | 0A5E | 8A26 | 2A07 | 8BE4 | F6F8 | C585 |
| 0000104420 | 042A | 1A74 | 46FF | 8BBA | FE46 | C88B | E0C1 | 0302 |
| 0000104440 | D1C1 | 03E0 | 2DC7 | 0030 | 4689 | EBFE | 9039 | 6C3D |
| 0000104460 | 7400 | 771C | 3C2D | 744C | 7F13 | 2C1F | 742A | 2C15 |
| 0000104500 | 741C | EB23 | 901D | 46FE | EBFC | 901B | 46FE | FEF6 |
| 0000104520 | F646 | 12EB | 46FE | EBEE | 900D | 4E2C | 0874 | 1A2C |
| 0000104540 | E474 | 86FE | FE52 | BE80 | FE52 | 7400 | 8093 | EE7E |
| 0000104560 | 7500 | C414 | 0E5E | 4683 | 040E | 8B26 | 2607 | 578B |
| 0000104600 | 8902 | F846 | 5689 | C6FA | 5286 | 00FE | 5EC4 | 260A |
| 0000104620 | 078A | 200C | E42A | F88B | FF83 | 746E | 8329 | 63FF |
| 0000104640 | 1674 | FF83 | 747B | 8D11 | E846 | 5016 | 76FF | FF08 |
| 0000104660 | 0676 | BBE8 | EB06 | 900D | 46FF | FFE8 | 0876 | 76FF |
| 0000104700 | E806 | 0662 | F08B | 7E83 | 00BA | 0974 | 7E83 | 00FE |
| 0000104720 | 0375 | 83E9 | 8B05 | E9C7 | 05A0 | 7E83 | 00BA | 0675 |
| 0000104740 | 46FF | FFBA | FE46 | 46C7 | C8BC | 8C29 | BE5E | 23EB |
| 0000104760 | 46C7 | C2BC | EB29 | 90F4 | 46FF | C40A | 0A5E | 5E89 |
| 0000105000 | 8CBC | BE46 | 8026 | 5E3F | 0C75 | 478D | 8901 | BC46 |
| 0000105020 | 468C | FEBE | B64E | 206A | 006A | 468D | 16C8 | 9A50 |
| 0000105040 | 7D96 | 86DB | C483 | 8308 | 7BFF | 0374 | A9E9 | C400 |
| 0000105060 | BC5E | 8026 | 5D3F | 0374 | 9DE9 | C600 | C046 | FF5D |
| 0000105100 | BC46 | 46C6 | 20D3 | 8FE9 | 9000 | 8A26 | 8807 | F446 |
| 0000105120 | 46FF | 3CBC | 752D | 800F | C07E | 7400 | 8B09 | BC5E |
| 0000105140 | 8026 | 5D3F | 1E75 | 5E8A | 88F4 | C05E | 01B0 | CB8A |
| 0000105160 | E180 | C007 | 03EB | FF2A | 568D | 03C8 | D2DA | 36E0 |
| 0000105200 | 0708 | 54EB | 46FF | 26BC | 078A | 4688 | 3AF4 | C046 |
| 0000105220 | 0676 | 4688 | EBF0 | 900D | 468A | 88C0 | F046 | 468A |
| 0000105240 | 88F4 | C046 | 468A | 88C0 | F446 | 1CEB | 5E8A | B0F4 |
| 0000105260 | 8A01 | 80CB | 07E1 | EBC0 | 2A03 | 8DFF | C856 | DA03 |
| 0000105300 | E0D2 | 0836 | FE07 | F446 | 468A | 98F0 | 4E8A | 2AF4 |
| 0000105320 | 3BED | 7DC1 | 88D7 | C06E | 5EC4 | 26BC | 3F80 | 745D |
| 0000105340 | E903 | FF66 | 8026 | 003F | 0375 | FFE9 | 8304 | 7BFF |
| 0000105360 | 0A75 | C38B | C28C | 4689 | 890A | 0C56 | 468B | 8BF8 |
| 0000105400 | FA56 | 8689 | FE54 | 9689 | FE56 | 7E83 | 00BA | 0A74 |
| 0000105420 | 468B | FFFE | FE4E | C00B | 4E74 | FE83 | 74FF | 8B49 |
| 0000105440 | C1DE | 03FB | 468D | 03C8 | 36D8 | 078A | 4632 | 98B6 |
| 0000105460 | 01BA | 8B00 | 8BCE | 80D9 | 07E1 | E2D3 | C285 | 2874 |
| 0000105500 | 7E80 | 00EE | 0E75 | C68B | 5EC4 | FFF8 | F846 | 8826 |
| 0000105520 | EB07 | 9005 | 86FF | FE54 | 46FF | FFE8 | 0876 | 76FF |
| 0000105540 | E806 | 04C2 | F08B | A2EB | 4EFF | 56E8 | 76FF | FF08 |
| 0000105560 | 0676 | DFE8 | 8B04 | F846 | 568B | 39FA | 5486 | 75FE |
| 0000105600 | 3909 | 5696 | 75FE | E903 | 0462 | 7E80 | 00EE | 0374 |
| 0000105620 | 29E9 | FF04 | C546 | FF83 | 7563 | E903 | 041E | C28E |
| 0000105640 | D88B | C626 | 0007 | 13E9 | 9004 | 64BF | 8300 | 2DFE |
| 0000105660 | 0675 | 46FE | EBF2 | 9006 | FE83 | 752B | FF1F | FE4E |
| 0000105700 | 0C75 | 7E83 | 00BA | 0674 | 86FE | FE52 | 0EEB | 46FF |
| 0000105720 | FFE8 | 0876 | 76FF | E806 | 044C | F08B | FE83 | 7430 |
| 0000105740 | E903 | 0155 | 46FF | FFE8 | 0876 | 76FF | E806 | 0436 |
| 0000105760 | F08B | 783C | 0474 | 583C | 1475 | 46FF | FFE8 | 0876 |
| 0000106000 | 76FF | E806 | 0420 | F08B | 78BF | E900 | 012B | 46FF |
| 0000106020 | 83EA | 78FF | 0674 | 6FBF | E900 | 011D | 4EFF | 56E8 |

THU MAR 14 17:21:24 1991 CLIENT.EXE PAGE 39, LINE 2243

| | | | | | | | | |
|---|---|---|---|---|---|---|---|---|
| 0000106040 | 76FF | FF08 | 0676 | 2BE8 | BE04 | 0030 | 0AE9 | 9001 |
| 0000106060 | 7E80 | 00FC | 0675 | 46FE | BFF6 | 0046 | FE83 | 752D |
| 0000106100 | FE05 | F246 | 08EB | FE83 | 742B | E903 | 00EB | 4EFF |
| 0000106120 | 74FE | E903 | 0095 | 7E83 | 00BA | 0375 | 8CE9 | FE00 |
| 0000106140 | 5286 | E9FE | 00D3 | FF83 | 7478 | 830D | 70FF | 0874 |
| 0000106160 | FF83 | 7446 | E903 | 0084 | 84F6 | 2AC5 | 7480 | 6A15 |
| 0000106200 | 8D04 | C246 | 5016 | D49A | E7BD | 568B | 79E8 | 8B03 |
| 0000106220 | EBF0 | 9036 | FF83 | 7546 | 832C | EA7E | 7400 | 8326 |
| 0000106240 | 3AFE | 1C75 | 468B | 89C2 | EC46 | C02B | 4689 | 89C4 |
| 0000106260 | C246 | 46C7 | FFEA | BFFF | 0070 | 30BE | EB00 | 900A |
| 0000106300 | 46C7 | 00EA | FE00 | 5286 | 80FE | 52BE | 00FE | 5C75 |
| 0000106320 | 46FF | 8DEA | D044 | 0199 | C246 | 5611 | 83C4 | BA7E |
| 0000106340 | 7400 | FF08 | FE4E | 0375 | 74E9 | FFFF | E846 | 76FF |
| 0000106360 | FF08 | 0676 | 2FE8 | 8B03 | EBF0 | 903E | 84F6 | 2AC5 |
| 0000106400 | 7404 | 83C2 | 6FFF | 1475 | FE83 | 7D38 | 6AB8 | 8D03 |
| 0000106420 | C246 | 5016 | D49A | F8BD | EB8B | 90AE | 006A | 0A6A |
| 0000106440 | 468D | 16C2 | 9A50 | BDB2 | 8741 | 9DEB | 4EFF | 56E8 |
| 0000106460 | 76FF | FF08 | 0676 | 1BE8 | 8003 | 52BE | 00FE | 0375 |
| 0000106500 | 23E9 | 83FF | 70FF | 0F75 | 7E80 | 00F6 | 0974 | 468B |
| 0000106520 | 8BEC | C24E | 4689 | 80C4 | F27E | 7400 | F70A | C25E |
| 0000106540 | 5683 | 00C4 | 5EF7 | 83C4 | 46FF | 0575 | 46C7 | 00EA |
| 0000106560 | 8300 | EA7E | 7500 | E903 | 0272 | 7E80 | 00EE | 0374 |
| 0000106600 | 39E9 | FF02 | C646 | 7E80 | 00F6 | 1474 | 468B | 8BC2 |
| 0000106620 | C456 | 5EC4 | 26F8 | 0789 | 8926 | 0257 | 1DE9 | 9002 |
| 0000106640 | 468B | C4C2 | F85E | 8926 | E907 | 0210 | 468B | 99E8 |
| 0000106660 | 4689 | 89C2 | C456 | CEEB | 868D | FE58 | 4689 | 8CBC |
| 0000106700 | BE56 | FE83 | 752D | 8B13 | 36D8 | 07C6 | 8D2D | 5986 |
| 0000106720 | 89FE | BC46 | 568C | EBBE | 9006 | FE83 | 752B | FF11 |
| 0000106740 | FE4E | 46FF | FFE8 | 0876 | 76FF | E806 | 023B | F08B |
| 0000106760 | 7E83 | 00BA | 0774 | 7E81 | 5DFE | 7E01 | C72D | FE46 |
| 0000107000 | 015D | 26EB | 468B | FFFE | FE4E | C00B | 2374 | 46FF |
| 0000107020 | 8BEA | C4C6 | BC5E | 46FF | 26BC | 0788 | 46FF | FFE8 |
| 0000107040 | 0876 | 76FF | E806 | 01FE | F08B | 84F6 | 2AC5 | 7504 |
| 0000107060 | 83D3 | 2EFE | 4375 | 468B | FFFE | FE4E | C00B | 3974 |
| 0000107100 | 5EC4 | FFBC | BC46 | C626 | 2E07 | 18EB | 468B | FFFE |
| 0000107120 | FE4E | C00B | 2374 | 46FF | 8BEA | C4C6 | BC5E | 46FF |
| 0000107140 | 26BC | 0788 | 46FF | FFE8 | 0876 | 76FF | E806 | 01B6 |
| 0000107160 | F08B | 84F6 | 2AC5 | 7504 | 83D3 | EA7E | 7500 | E903 |
| 0000107200 | 0081 | C68B | 653C | 0474 | 453C | 7775 | 468B | FFFE |
| 0000107220 | FE4E | C00B | 6D74 | 5EC4 | FFBC | BC46 | C626 | 6507 |
| 0000107240 | 46FF | FFE8 | 0876 | 76FF | E806 | 017A | F08B | FE83 |
| 0000107260 | 752D | C40F | BC5E | 46FF | 26BC | 07C6 | EB2D | 9008 |
| 0000107300 | 9090 | FE83 | 752B | 8B35 | FE46 | 4EFF | 0BFE | 75C0 |
| 0000107320 | FF1D | FE46 | 26EB | 468B | FFFE | FE4E | C00B | 2374 |
| 0000107340 | 46FF | 8BEA | C4C6 | BC5E | 46FF | 26BC | 0788 | 46FF |
| 0000107360 | FFE8 | 0876 | 76FF | E806 | 012C | F08B | 84F6 | 2AC5 |
| 0000107400 | 7504 | FFD3 | E84E | FF56 | 0876 | 76FF | E806 | 0144 |
| 0000107420 | 7E83 | 00EA | 0375 | D3E9 | 8000 | EE7E | 7400 | E903 |
| 0000107440 | 009A | 46FF | C4C6 | BC5E | C626 | 0007 | 868D | FE58 |
| 0000107460 | 5016 | 76FF | FFFA | F876 | 468A | 98F6 | 8E50 | 1406 |
| 0000107500 | 262D | 1EFF | 2A34 | C483 | EB0A | 9071 | 5EC4 | 260A |
| 0000107520 | 078A | E42A | C63B | 1274 | 4EFF | 56E8 | 76FF | FF08 |
| 0000107540 | 0676 | EFE8 | E900 | 0084 | 9090 | 4EFE | 80B8 | EE7E |
| 0000107560 | 7500 | 8349 | 0E6E | EB04 | 9043 | 632D | 3D00 | 0018 |
| 0000107600 | CA77 | E0D1 | 2E93 | A7FF | 8E5A | 88AA | 8B0C | 8C88 |
| 0000107620 | 8C88 | 8C88 | 8E1C | 8A7A | 8E1C | 8E1C | 8E1C | 8E1C |
| 0000107640 | 8C7C | 8B0C | 8B00 | 8E1C | 8E1C | 88C0 | 8E1C | 8B0C |
| 0000107660 | 8E1C | 8E1C | 8A7D | 8E1C | 8E1C | 88C8 | 46FE | FFB8 |
| 0000107700 | 0A46 | 20EB | 46FF | FFE8 | 0876 | 76FF | E806 | 0056 |

THU MAR 14 17:21:24 1991 CLIENT.EXE PAGE 40, LINE 2302

| | | | | | | | | |
|---|---|---|---|---|---|---|---|---|
| 0000107720 | F08B | 5EC4 | FF0A | 0A46 | 8A26 | 2A07 | 3BE4 | 74F0 |
| 0000107740 | E903 | FF74 | FE83 | 74FF | E903 | F895 | FE83 | 75FF |
| 0000107760 | 830C | C67E | 7500 | 8006 | B87E | 7400 | 8B05 | C646 |
| 0000110000 | 02EB | C68B | 5F5E | CBC9 | 8B55 | 8BEC | 045E | 87F6 |
| 0000110020 | 2AC5 | 7404 | 8B05 | EBC3 | 9008 | C38B | DF24 | 072D |
| 0000110040 | C900 | 02C2 | 9000 | 04C8 | 0000 | 5EC4 | 2604 | 4FFF |
| 0000110060 | 7804 | 2615 | 078B | 8B26 | 0257 | FF26 | 8B07 | 8ED8 |
| 0000110100 | 26C2 | 078A | E42A | 07EB | 5306 | F69A | 3984 | C98F |
| 0000110120 | 04C2 | 9000 | 8B55 | 83EC | 087E | 74FF | FF0E | 0676 |
| 0000110140 | 76FF | FF04 | 0876 | 069A | 59AC | C98B | 06C2 | 9000 |
| 0000110160 | 8B55 | 56EC | 5EC4 | 2608 | 07FF | 76FF | FF06 | 0476 |
| 0000110200 | A3E8 | 8BFF | F6F0 | C584 | 082A | E875 | C95E | 08C2 |
| 0000110220 | 9000 | 8FCA | 8FD5 | 8FEB | 901F | 904B | 9053 | 907C |
| 0000110240 | 90AE | 8B55 | B8EC | 0171 | E80E | 1B86 | 5756 | C033 |
| 0000110260 | 4689 | 88F8 | FB46 | 76C4 | 260A | 89AC | 0A76 | 4688 |
| 0000110300 | 0AFE | 74C0 | 8306 | F87E | 7D00 | 8B06 | F846 | B5E9 |
| 0000110320 | BB04 | 29CA | 202C | 583C | 0577 | 24D7 | EB0F | B002 |
| 0000110340 | B100 | D203 | 02E0 | FB46 | FED7 | D2C1 | 88E8 | FB46 |
| 0000110360 | 8B98 | D1D8 | 2EE3 | A7FF | 8F62 | 568A | B9FE | 0001 |
| 0000110400 | 36E8 | EB04 | 33B1 | 89C0 | F046 | 4689 | 89F6 | EE46 |
| 0000110420 | 46C7 | 20FC | 4800 | 4689 | EBF4 | 8A9B | FE46 | 2D3C |
| 0000110440 | 0675 | 4E80 | 04FC | 8EEB | 2B3C | 0675 | 4E80 | 01FC |
| 0000110460 | 84EB | 203C | 0775 | 4E80 | 02FC | 79E9 | 3CFF | 7523 |
| 0000110500 | 8007 | FC4E | E980 | FF6E | 4E80 | 08FC | 67E9 | 8AFF |
| 0000110520 | FE4E | F980 | 752A | E80F | 035C | C00B | 1779 | D8F7 |
| 0000110540 | 4E80 | 04FC | 0FEB | E980 | 3230 | 8BED | F646 | 0ABB |
| 0000110560 | F700 | 03E3 | 89C1 | F646 | 3BE9 | C7FF | F446 | 0000 |
| 0000110600 | 33E9 | 8AFF | FE4E | F980 | 752A | E80C | 0328 | C00B |
| 0000110620 | 1479 | FFB8 | EBFF | 800F | 30E9 | ED32 | 468B | BBF4 |
| 0000110640 | 000A | E3F7 | C103 | 4689 | E9F4 | FF0A | 468A | 3CFE |
| 0000110660 | 756C | 8006 | FC4E | EB10 | 3C22 | 7546 | 8006 | FC4E |
| 0000110700 | EB20 | 3C18 | 754E | 8006 | FD4E | EB10 | 3C0E | 754C |
| 0000110720 | 8006 | FD4E | EB04 | 8004 | FD4E | E908 | FED8 | 468A |
| 0000110740 | 3CFE | 7564 | E903 | 0194 | 693C | 0375 | 8DE9 | 3C01 |
| 0000110760 | 7575 | E903 | 018A | 583C | 0375 | 89E9 | 3C01 | 7578 |
| 0000111000 | E903 | 0188 | 6F3C | 0375 | A2E9 | 3C01 | 7463 | 3C1A |
| 0000111020 | 7473 | 3C27 | 746E | 3C51 | 7470 | 3C60 | 7445 | 3C07 |
| 0000111040 | 7447 | E903 | 00BB | B5E9 | E800 | 028A | BE8D | FE8F |
| 0000111060 | 0716 | 4FAA | 01B9 | E900 | 01F1 | 90E8 | 0B02 | 75FF |
| 0000111100 | 8C12 | 0BC0 | 75C0 | 1E0C | BF07 | 2A23 | 0E8B | 2A29 |
| 0000111120 | D8E9 | 5701 | 4E8B | E3F4 | 3207 | F2C0 | 75AE | 4F01 |
| 0000111140 | 2B59 | 87F9 | E9CF | 01C3 | 62E8 | 8B02 | F846 | F6AB |
| 0000111160 | FC46 | 7410 | 3303 | ABC0 | 3BE9 | F6FE | FC46 | 7530 |
| 0000111200 | E805 | 0232 | 39EB | 36E8 | F602 | FD46 | 7518 | C630 |
| 0000111220 | FF46 | B907 | 0010 | 0716 | 3352 | 8DD2 | 97BE | BEFE |
| 0000111240 | 0004 | B0E8 | B902 | 0010 | BE8D | FE92 | 3358 | BED2 |
| 0000111260 | 0004 | A0E8 | C602 | 9386 | 3AFE | 09B9 | EB00 | C618 |
| 0000111300 | FF46 | B907 | 0010 | 0716 | D233 | BE8D | FE92 | 04BE |
| 0000111320 | E800 | 0281 | 04B9 | 8D00 | 8FBE | E9FE | 014D | 46FF |
| 0000111340 | 80EE | FC4E | 8A40 | FE46 | 200C | 8B98 | 83F0 | F47E |
| 0000111360 | 7F00 | 7413 | C707 | F446 | 0006 | 0AEB | 673D | 7500 |
| 0000111400 | C705 | F446 | 0001 | BE8D | FE8F | 76FF | FFEE | F476 |
| 0000111420 | 1656 | FF57 | 1076 | 76FF | F60E | FD46 | 7404 | FF0A |
| 0000111440 | 401E | 832A | 0E46 | EB0A | FF08 | 2C1E | 832A | 0E46 |
| 0000111460 | 8308 | 0EC4 | 46F6 | 80FC | 0F74 | 7E83 | 00F4 | 0975 |
| 0000111500 | 5716 | 1EFF | 2A38 | C483 | 8304 | 67FE | 1075 | 46F7 |
| 0000111520 | 80FC | 7500 | 1609 | FF57 | 301E | 832A | 04C4 | 0716 |
| 0000111540 | 8026 | 2D3D | 0575 | 8047 | FD4E | B901 | FFFF | B057 |
| 0000111560 | F200 | 4FAE | 2B59 | 87F9 | E9CF | 00AF | 4E80 | 40FC |

THU MAR 14 17:21:24 1991 CLIENT.EXE PAGE 41, LINE 2361

| | | | | | | | | |
|---|---|---|---|---|---|---|---|---|
| 0000111600 | 46C6 | 0AFA | 35EB | 46C6 | 07FF | 04EB | 46C6 | 27FF |
| 0000111620 | 46F6 | 80FC | 1174 | 46C7 | 02F0 | C600 | F246 | B230 |
| 0000111640 | 0251 | FF56 | 5688 | C6F3 | FA46 | EB10 | F60E | FC46 |
| 0000111660 | 7480 | 8004 | FD4E | C602 | FA46 | F608 | FC46 | 7410 |
| 0000111700 | E805 | 00FB | 0EEB | EDE8 | F600 | FC46 | 7440 | 9903 |
| 0000111720 | 02EB | D233 | 46F6 | 40FC | 0F74 | D20B | 0B7D | 4E80 |
| 0000111740 | 01FD | D8F7 | D283 | F700 | 83DA | F47E | 7D00 | C707 |
| 0000111760 | F446 | 0001 | 04EB | 6680 | F7FC | D88B | DA0B | 0575 |
| 0000112000 | 46C7 | 00F0 | 8D00 | EB7E | 0716 | 4E8A | 32FA | 8BED |
| 0000112020 | F476 | 40E8 | F601 | FD46 | 7402 | E30E | 2606 | 3D80 |
| 0000112040 | 7430 | 4F06 | C626 | 3005 | EB41 | F600 | FC46 | 7440 |
| 0000112060 | F631 | FD46 | 7401 | C60B | F246 | C72D | F046 | 0001 |
| 0000112100 | 20EB | 46F6 | 01FC | 0B74 | 46C6 | 2BF2 | 46C7 | 01F0 |
| 0000112120 | EB00 | F60F | FC46 | 7402 | C609 | F246 | C720 | F046 |
| 0000112140 | 0001 | 468B | 2BF6 | 2BC1 | F046 | 027D | C033 | 5706 |
| 0000112160 | F651 | FC46 | 750C | 8B07 | B2C8 | E820 | 00BB | 1650 |
| 0000112200 | 8D07 | F27E | 4E8B | E8F0 | 0091 | F658 | FC46 | 7408 |
| 0000112220 | F60D | FC46 | 7504 | 8B07 | B2C8 | E830 | 009B | 5F59 |
| 0000112240 | 5007 | 76E8 | 5800 | 46F6 | 04FC | 0774 | C88B | 20B2 |
| 0000112260 | 86E8 | E900 | FCD0 | 76C4 | 260E | 89AD | 0E76 | C4C3 |
| 0000112300 | 0E76 | AD26 | D08B | AD26 | 8992 | 0E76 | F6C3 | FC46 |
| 0000112320 | 7420 | E808 | FFE9 | C28E | F88B | E8C3 | FFD8 | F88B |
| 0000112340 | C00B | 0375 | C08E | 1EC3 | C307 | 0698 | C457 | 065E |
| 0000112360 | FF26 | 044F | 1078 | 8B26 | 263F | 07FF | 8E26 | 0247 |
| 0000112400 | 33AA | 5FC0 | C307 | 5251 | 5306 | 0E50 | B3E8 | 83F1 |
| 0000112420 | 06C4 | 595A | FF3D | 75FF | EBE8 | E3E8 | 8B1B | 01F7 |
| 0000112440 | F84E | 3357 | 26FF | E8AC | FFC0 | F80B | F7E2 | FF0B |
| 0000112460 | 745F | C705 | F846 | FFFF | E3C3 | 0119 | F84E | 3357 |
| 0000112500 | 8AFF | E8C2 | FFA4 | F80B | F7E2 | FF0B | 745F | C705 |
| 0000112520 | F846 | FFFF | FDC3 | 9357 | F60B | 0A7F | DB0B | 0675 |
| 0000112540 | D20B | 0275 | 1AEB | 3392 | F7D2 | 93F1 | F1F7 | 8792 |
| 0000112560 | 04D3 | 3C30 | 7639 | 0203 | FF46 | 8BAA | 4EC2 | D8EB |
| 0000112600 | 2B59 | 47CF | C3FC | 5E5F | E58B | CB5D | 8B55 | 83EC |
| 0000112620 | 0EEC | C033 | 09EB | 8B55 | 83EC | 0EEC | FFB8 | 89FF |
| 0000112640 | F246 | 5E8B | 3B06 | 9C1E | 7227 | BA08 | 0009 | C033 |
| 0000112660 | FFE9 | 0BEF | 74C0 | 5307 | 33E8 | 8303 | 02C4 | 87F6 |
| 0000112700 | 279E | 7420 | 5312 | C933 | 5151 | 4141 | 8D51 | F446 |
| 0000112720 | 5016 | FF9A | 00FF | F600 | 9E87 | 8027 | 7D74 | 5E8C |
| 0000112740 | 8EFA | 0A46 | 56C5 | 3308 | 89C0 | FE46 | 4689 | FCFC |
| 0000112760 | 5657 | FA8B | F28B | 6689 | 8BF8 | 0C4E | 3FE3 | 0AB0 |
| 0000113000 | AEF2 | 5275 | 8E1E | FA5E | 469A | 1DAE | 3D8F | 00A8 |
| 0000113020 | 4C76 | 831F | 02EC | DC8B | 00BA | 3D02 | 0228 | 0373 |
| 0000113040 | 80BA | 2B00 | 8BE2 | 8BD4 | 16FA | 8B07 | 0C4E | 3CAC |
| 0000113060 | 740A | 3B0D | 74FB | AA1A | F4E2 | 38E8 | E900 | 00AF |
| 0000113100 | 0DB0 | FB3B | 0375 | 2CE8 | AA00 | 0AB0 | 46FF | EBFC |
| 0000113120 | E8E2 | 0021 | E1EB | 5F5E | 5E8E | E9FA | 00C8 | 468B |
| 0000113140 | 0BF2 | 74C0 | FF09 | 0676 | 8FE8 | 8302 | 02C4 | FCB8 |
| 0000113160 | 0EFF | BDE8 | 5015 | 5153 | 061E | 8B1F | 2BCF | E3CA |
| 0000113200 | 5121 | 5E8B | 5306 | 521E | 8D51 | F446 | 5016 | 299A |
| 0000113220 | 0084 | 5900 | C00B | 1175 | 5E8B | 01F4 | FE5E | D93B |
| 0000113240 | 0772 | 591F | 585B | FA8B | 1FC3 | C483 | 8308 | FE7E |
| 0000113260 | 7500 | 0B3C | 74C0 | 3D18 | 006D | 0D74 | 013D | BA00 |
| 0000113300 | 0009 | 0875 | 1CBA | EB00 | BA03 | 0020 | EBF9 | 8E26 |
| 0000113320 | FA5E | 87F6 | 279E | 7440 | 8E0E | 0A5E | 5E8B | 8008 |
| 0000113340 | 1A3F | 0375 | EBF8 | BA0E | 001C | C033 | EBF9 | 8B06 |
| 0000113360 | FE46 | 462B | 8BFC | F866 | 5F5E | 5E8E | 72FA | 8B14 |
| 0000113400 | F25E | DB0B | 0974 | 76FF | E806 | 01EE | C483 | 8B02 |
| 0000113420 | 5DE5 | 8BCB | F25E | DB0B | 0974 | 76FF | E806 | 01DA |
| 0000113440 | C483 | E902 | EE8C | 4E8B | 0B0C | 75C9 | 8B04 | EBC1 |

THU MAR 14 17:21:24 1991 CLIENT.EXE PAGE 42, LINE 2420

| | | | | | | | | |
|---|---|---|---|---|---|---|---|---|
| 0000113460 | 1ECE | 56C5 | 5308 | 521E | 8D51 | F446 | 5016 | 5F9A |
| 0000113500 | 0095 | 1E00 | 1F07 | C00B | 1774 | 6D3D | 7400 | 3D0D |
| 0000113520 | 0001 | 09BA | 7500 | BABC | 001C | B7EB | 20BA | EB00 |
| 0000113540 | 8BB2 | F446 | C00B | 9775 | 87F6 | 279E | 7440 | 8B0A |
| 0000113560 | 26DA | 3F80 | 751A | EB02 | BA86 | 001C | C033 | 93EB |
| 0000113600 | 8B55 | 56EC | 76C4 | 8C06 | E3C1 | 2605 | 4C80 | 01FE |
| 0000113620 | 5D5E | 55CB | EC8B | 096A | 8BE8 | 8301 | 02C4 | 76FF |
| 0000113640 | 0E06 | 0DE8 | 5B00 | 096A | A1E8 | 8301 | 02C4 | E58B |
| 0000113660 | CB5D | 8B55 | 56EC | 8B57 | 064E | F983 | 77E8 | 1E69 |
| 0000113700 | B6A1 | 0B2A | 74C0 | BF48 | AE64 | 368B | 2ABE | 1EC5 |
| 0000113720 | 2AB8 | 561E | FF57 | 5FD7 | 735E | 8C2B | C5DA | 0C5F |
| 0000113740 | D63B | EF75 | 1F58 | C41E | B836 | 262A | 748B | C512 |
| 0000113760 | B41E | 8C2A | 3BDA | 75D0 | 1FD9 | 811E | E0FF | 74AE |
| 0000114000 | BF0E | AEE0 | C4EB | 815E | 64FF | 74AE | EB0F | 070A |
| 0000114020 | BF06 | 2AB4 | DBE8 | 7218 | E80E | 1778 | 891F | BA16 |
| 0000114040 | 892A | B81E | EB2A | 1F04 | C033 | 5F99 | 5D5E | 00CB |
| 0000114060 | 04C8 | 0000 | A156 | 29A4 | 168B | 29A6 | 4689 | 89FC |
| 0000114100 | FE56 | 0C6A | DFE8 | 8300 | 02C4 | 468B | 0BFE | FC46 |
| 0000114120 | 7674 | 468B | 0B08 | 0646 | 6E74 | 76FF | FF08 | 0676 |
| 0000114140 | D89A | 507B | 8397 | 04C4 | F08B | 5EC4 | 26FC | 478B |
| 0000114160 | 2602 | 070B | 5274 | FF26 | 0277 | FF26 | 9A37 | 7BD8 |
| 0000114200 | 9771 | C483 | 3B04 | 7EC6 | C439 | FC5E | C426 | 261F |
| 0000114220 | 3880 | 753D | 562D | 76FF | FF08 | 0676 | 5306 | F49A |
| 0000114240 | DBAF | 8394 | 0AC4 | C00B | 1875 | 0C6A | 9DE8 | 8300 |
| 0000114260 | 02C4 | 5EC4 | 26FC | 078B | 8B26 | 0257 | C603 | EB40 |
| 0000114300 | 9012 | 4683 | 04FC | A2EB | 0C6A | 7FE8 | 8300 | 02C4 |
| 0000114320 | C02B | 5E99 | CBC9 | 8B55 | 50EC | 468B | 0504 | 0014 |
| 0000114340 | 4BEB | 8B55 | 50EC | 468B | 0504 | 0014 | 65EB | 8B55 |
| 0000114360 | 50EC | 468B | 0504 | 0114 | 33EB | 8B55 | 50EC | 468B |
| 0000114400 | 0504 | 0114 | 4DEB | 8B55 | 50EC | 468B | C104 | 02E0 |
| 0000114420 | FF68 | 50FF | FF6A | FF6A | FF9A | 00FF | 0B00 | 75C0 |
| 0000114440 | 5825 | E58B | C35D | 8B55 | 50EC | 468B | C104 | 02E0 |
| 0000114460 | E168 | 5097 | FF6A | FF6A | FF9A | 00FF | 0B00 | 75C0 |
| 0000114500 | 5805 | E58B | C35D | 11B8 | E900 | E0C0 | 8B55 | 50EC |
| 0000114520 | 468B | C104 | 02E0 | 0168 | 5098 | FF9A | 00FF | 0B00 |
| 0000114540 | 75C0 | 58E3 | E58B | C35D | 8B55 | FFEC | 0676 | B5E8 |
| 0000114560 | 83FF | 02C4 | E58B | CB5D | 8B55 | FFEC | 0676 | CBE8 |
| 0000114600 | 83FF | 02C4 | E58B | CB5D | 8B55 | 56EC | 768B | 8B04 |
| 0000114620 | B9C6 | 000A | F799 | 04F9 | C430 | 065E | 46FF | 2606 |
| 0000114640 | 0788 | C68B | F799 | 80F9 | 30C2 | 5E8B | FF06 | 0646 |
| 0000114660 | 8826 | 8B17 | 0646 | C28C | C95E | 06C2 | 9000 | 12C8 |
| 0000114700 | 0000 | E856 | 189C | C28E | D88B | 5E89 | 8CF2 | F446 |
| 0000114720 | 8B26 | 1A47 | 0B26 | 1847 | 2E75 | 1A6A | 489A | 337B |
| 0000114740 | 8397 | 02C4 | 5EC4 | 26F2 | 4789 | 2618 | 5789 | 8B1A |
| 0000114760 | 26C2 | 470B | 7518 | C70B | EE46 | 3048 | 5E8C | EBF0 |
| 0000115000 | 9015 | 8B26 | 1847 | 08EB | 8B26 | 1847 | 8B26 | 1A57 |
| 0000115020 | 4689 | 89EE | F056 | 468B | 8BEE | F056 | 4689 | B9F6 |
| 0000115040 | F856 | 5EC4 | 2606 | 478B | 8B0C | D1C8 | 03E0 | 89C1 |
| 0000115060 | FA46 | 8B26 | 0847 | C88B | E0D1 | C103 | 4689 | C7FC |
| 0000115100 | FE46 | 0000 | 768B | 8BFE | FA5E | 808A | 2BF4 | 5EC4 |
| 0000115120 | 26EE | 0788 | 5E8B | 8AFC | 0A80 | 8B2C | EE5E | 8826 |
| 0000115140 | 0447 | 46FF | FFFE | EE46 | 7E83 | 03FE | D67C | 5E8B |
| 0000115160 | 83EE | EE46 | 2604 | 07C6 | 8B20 | EE5E | 46FF | 26EE |
| 0000115200 | 07C6 | 0620 | 76FF | C4EE | 065E | FF26 | 0677 | F7E8 |
| 0000115220 | 8EFE | 8BC2 | 26D8 | 07C6 | 8D20 | 0147 | 5006 | 5EC4 |
| 0000115240 | 2606 | 77FF | E804 | FEE0 | C28E | D88B | C626 | 3A07 |
| 0000115260 | 478D | 0601 | C450 | 065E | FF26 | 0277 | C9E8 | 8EFE |
| 0000115300 | 8BC2 | 26D8 | 07C6 | 8D3A | 0147 | 5006 | 5EC4 | 2606 |
| 0000115320 | 37FF | B3E8 | 8EFE | 8BC2 | 26D8 | 07C6 | 8D20 | 0147 |

THU MAR 14 17:21:24 1991 CLIENT.EXE PAGE 43, LINE 2479

| | | | | | | | | |
|---|---|---|---|---|---|---|---|---|
| 0000115340 | 5006 | 5EC4 | 2606 | 478B | B90A | 0064 | D88B | F799 |
| 0000115360 | 05F9 | 0013 | 8B50 | E8F3 | FE8E | 5052 | 64B9 | 8B00 |
| 0000115400 | 99C6 | F9F7 | E852 | FE80 | C28E | D88B | C626 | 0A07 |
| 0000115420 | 8943 | EE5E | 468C | 26F0 | 07C6 | 8B00 | F646 | 568B |
| 0000115440 | 5EF8 | CBC9 | 08C8 | 0000 | F29A | 1DB3 | C49A | 065E |
| 0000115460 | 8B26 | 2607 | 578B | 2B02 | E606 | 1B2B | E816 | 892B |
| 0000115500 | FC46 | 5689 | 8DFE | FC46 | 5016 | AC9A | 40B1 | 839A |
| 0000115520 | 04C4 | 4689 | 89F8 | FA56 | D00B | 0675 | C02B | EB99 |
| 0000115540 | 9044 | 3E83 | 2BEA | 7400 | FF36 | FA76 | 9A50 | B4EC |
| 0000115560 | 9A5A | C483 | 0B04 | 74C0 | 8126 | FC46 | 0E1D | 5683 |
| 0000115600 | 00FE | 468D | 16FC | 9A50 | B1AC | 98AF | C483 | 8E04 |
| 0000115620 | 8BC2 | 89D8 | F85E | 468C | 26FA | 47C7 | 0110 | 8B00 |
| 0000115640 | F846 | 568B | C9FA | 90CB | 581E | 4590 | 8B55 | 1EEC |
| 0000115660 | D88E | 1AB8 | 9A00 | AB02 | 9AAB | 46C7 | 00F8 | 8300 |
| 0000115700 | 147E | 7400 | E903 | 00AC | 468B | 8B08 | 0A56 | 4689 |
| 0000115720 | 89EC | EE56 | 681E | 2A4A | 009A | E097 | 839A | 04C4 |
| 0000115740 | 4689 | 890E | 0A56 | 4689 | 89FA | FC56 | D00B | 0374 |
| 0000115760 | 89E9 | 8000 | 9A3E | 0027 | 0874 | 46C7 | 5208 | EB2A |
| 0000116000 | 9006 | 46C7 | 5A08 | 8C2A | 0A5E | 0468 | 9A01 | 7B48 |
| 0000116020 | 9B0A | C483 | 8902 | FA46 | 5689 | 0BFC | 75D0 | B807 |
| 0000116040 | FFFF | DDE9 | 9000 | 46FF | FFF8 | FC76 | 1E50 | 6668 |
| 0000116060 | FF2A | 0A76 | 76FF | 9A08 | B7EA | 9B1D | C483 | C40C |
| 0000116100 | FA5E | 8026 | 003F | 2075 | 5306 | 529A | 257B | 839B |
| 0000116120 | 04C4 | EA9A | 7784 | 899B | E646 | 5689 | C4E8 | E65E |
| 0000116140 | C726 | 0807 | EB00 | 90B8 | C38B | C28C | 4689 | 8908 |
| 0000116160 | 0A56 | 08EB | C02B | 4689 | 89FC | FA46 | 76FF | FFEE |
| 0000116200 | EC76 | 76FF | FFFC | FA76 | 76FF | FF0A | 0876 | 468D |
| 0000116220 | 16F4 | 8D50 | F046 | 5016 | 76FF | FF12 | 1076 | 76FF |
| 0000116240 | FF0E | 0C76 | F69A | 9AB8 | 839B | 1CC4 | 7540 | E903 |
| 0000116260 | FF6D | 76FF | FFF6 | F476 | 76FF | FFF2 | F076 | 76FF |
| 0000116300 | FF0A | 0876 | 76FF | 9A06 | BD30 | 9BB1 | C483 | 890E |
| 0000116320 | EA46 | 7E83 | 00F8 | 0E74 | 76FF | FFFC | FA76 | 529A |
| 0000116340 | BF7B | 839B | 04C4 | 76FF | FFF2 | F076 | 529A | CD7B |
| 0000116360 | 839B | 04C4 | 76FF | FFF6 | F476 | 529A | EA7B | 8B9B |
| 0000116400 | EA46 | 4D4D | E58B | 5D1F | CB4D | 581E | 4590 | 8B55 |
| 0000116420 | 1EEC | D88E | 16B8 | 9A00 | AB02 | 9C11 | 3E80 | 279A |
| 0000116440 | 7400 | B805 | 2A75 | 03EB | 7AB8 | A32A | 2A82 | 5C6A |
| 0000116460 | 468B | 8B08 | 0A56 | 4689 | 89EA | EC56 | 5052 | 2E9A |
| 0000116500 | 27B6 | 839C | 06C4 | 4689 | 89EE | F056 | 2F6A | 76FF |
| 0000116520 | FFEC | EA76 | 2E9A | 4CB6 | 839C | 06C4 | 4689 | 89FA |
| 0000116540 | FC56 | D00B | 7E75 | 468B | 0BF0 | EE46 | 0374 | 8FE9 |
| 0000116560 | 6A00 | FF3A | EC76 | 76FF | 9AEA | B5BA | 9C64 | C483 |
| 0000116600 | 8906 | EE46 | 5689 | 0BF0 | 75D0 | FF75 | EC76 | 76FF |
| 0000116620 | 9AEA | 7BD8 | 9C70 | C483 | 0504 | 0003 | 9A50 | 7B48 |
| 0000116640 | 9C91 | C483 | 8902 | EA46 | 5689 | 0BEC | 75D0 | B807 |
| 0000116660 | FFFF | 7EE9 | 9001 | 681E | 2A7F | 76FF | 50EC | A29A |
| 0000116700 | A57B | 839C | 08C4 | 76FF | FF0A | 0876 | 76FF | FFEC |
| 0000116720 | EA76 | 5C9A | DB7B | 839C | 08C4 | 468B | 8BEA | EC56 |
| 0000116740 | 4040 | 16EB | 468B | 0BF0 | EE46 | 0874 | 468B | 39EE |
| 0000116760 | FA46 | 0C76 | 468B | 8BFA | FC56 | 4689 | 89EE | F056 |
| 0000117000 | 2E6A | 76FF | FFF0 | EE76 | 2E9A | F6B6 | 839C | 06C4 |
| 0000117020 | 4689 | 89F6 | F856 | D00B | 3674 | FF1E | 8236 | FF2A |
| 0000117040 | F876 | 9A50 | B5E8 | 9D14 | C483 | 5008 | 76FF | FF12 |
| 0000117060 | 1076 | 76FF | FF0E | 0C76 | 76FF | FFEC | EA76 | 76FF |
| 0000117100 | 9A06 | 9A78 | 9D29 | C483 | 8910 | F446 | C6E9 | 9000 |
| 0000117120 | 76FF | FFEC | EA76 | D89A | 357B | 839D | 04C4 | 0505 |
| 0000117140 | 5000 | 489A | 547B | 839D | 02C4 | 4689 | 89EE | F056 |
| 0000117160 | D00B | 0375 | 38E9 | FFFF | EC76 | 76FF | FFEA | F076 |
| 0000117200 | 9A50 | 7BA2 | 9D62 | C483 | FF08 | EC76 | 76FF | 9AEA |

THU MAR 14 17:21:24 1991 CLIENT.EXE PAGE 44, LINE 2538

| | | | | | | | | |
|---|---|---|---|---|---|---|---|---|
| 0000117220 | 7BD8 | 9D9C | C483 | 0304 | EE46 | 568B | 89F0 | F646 |
| 0000117240 | 5689 | C7F8 | F446 | FFFF | 46C7 | 02F2 | EB00 | 9004 |
| 0000117260 | 4EFF | 83F2 | F27E | 7C00 | 8B4E | F25E | E3D1 | FF1E |
| 0000117300 | 82B7 | FF2A | F876 | 76FF | 9AF6 | 7BA2 | 9DAC | C483 |
| 0000117320 | 6A08 | FF00 | F076 | 76FF | 9AEE | 9FDA | 9DCF | C483 |
| 0000117340 | 4006 | CC74 | 76FF | FFF2 | 1276 | 76FF | FF10 | 0E76 |
| 0000117360 | 76FF | FF0C | F076 | 76FF | FFEE | 0676 | 789A | E09A |
| 0000117400 | 839D | 10C4 | 4689 | FFF4 | F076 | 76FF | 9AEE | 7B52 |
| 0000117420 | 9DFE | C483 | 8B04 | 0846 | 568B | 390A | EA46 | 0575 |
| 0000117440 | 5639 | 74EC | FF0B | EC76 | 76FF | 9AEA | 7B52 | 99FB |
| 0000117460 | 468B | 4DF4 | 8B4D | 1FE5 | 4D5D | 90CB | 581E | 4590 |
| 0000117500 | 8B55 | 1EEC | D88E | EC83 | 5610 | C02B | 4689 | 89F2 |
| 0000117520 | F046 | 76FF | FF12 | 1076 | 76FF | FF0E | 0C76 | 76FF |
| 0000117540 | FF0A | 0876 | 76FF | 9A06 | 9BDA | 9E4B | C483 | 890E |
| 0000117560 | FC46 | 7440 | E903 | 0170 | EA9A | 6584 | 8E9E | 8BC2 |
| 0000117600 | 26D8 | 3F83 | 7402 | E903 | 015E | 2F6A | 76FF | FF0A |
| 0000117620 | 0876 | BA9A | 7CB5 | 839E | 06C4 | D00B | 0374 | 47E9 |
| 0000117640 | 6A01 | FF5C | 0A76 | 76FF | 9A08 | B5BA | 9EA2 | C483 |
| 0000117660 | 0B06 | 74D0 | E903 | 0130 | 5EC4 | 2608 | 3F80 | 7400 |
| 0000117700 | 260A | 7F80 | 3A01 | 0375 | 1DE9 | 1E01 | 8868 | 9A2A |
| 0000117720 | 9700 | 9EBA | C483 | 8904 | F446 | 5689 | 0BF6 | 75D0 |
| 0000117740 | E903 | 0104 | 0468 | 9A01 | 7B48 | 9EFF | C483 | 8902 |
| 0000117760 | F046 | 5689 | 0BF2 | 75D0 | E903 | 00EC | 0368 | FF01 |
| 0000120000 | F276 | 76FF | FFF0 | F676 | 76FF | E8F4 | 1848 | C483 |
| 0000120020 | 890A | F446 | 5689 | 0BF6 | 75D0 | E903 | 00CA | 5EC4 |
| 0000120040 | 26F0 | 3F80 | 7500 | E903 | 00BE | 5306 | D89A | 217B |
| 0000120060 | 839F | 04C4 | 5EC4 | 03F0 | 4BD8 | 8026 | 5C3F | 1674 |
| 0000120100 | 8026 | 2F3F | 1074 | 681E | 2A8D | FF06 | F076 | 5C9A |
| 0000120120 | 2F7B | 839F | 08C4 | 76FF | FF0A | 0876 | D89A | 3F7B |
| 0000120140 | 839F | 04C4 | 75FF | FFF2 | F076 | F08B | D89A | 5B7B |
| 0000120160 | 839F | 04C4 | F003 | FE81 | 0104 | 6C73 | 76FF | FF0A |
| 0000120200 | 0876 | 76FF | FFF2 | F076 | 5C9A | 787B | 839F | 08C4 |
| 0000120220 | 76FF | FF12 | 1076 | 76FF | FF0E | 0C76 | 76FF | FFF2 |
| 0000120240 | F076 | 76FF | 9A06 | 9BDA | 9F86 | C483 | 890E | FC46 |
| 0000120260 | 7540 | 9A35 | 84EA | 9FC9 | C28E | D88B | 8326 | 023F |
| 0000120300 | 0375 | 37E9 | C4FF | F05E | 8026 | 5C3F | 0674 | 8026 |
| 0000120320 | 2F3F | 1475 | 8026 | 017F | 755C | E903 | FF1E | 8026 |
| 0000120340 | 017F | 752F | E903 | FF14 | 468B | 0BF2 | F046 | 0E74 |
| 0000120360 | 76FF | FFF2 | F076 | 529A | 887B | 839A | 04C4 | 468B |
| 0000120400 | 5EFC | 4D4D | E58B | 5D1F | CB4D | 8B55 | 83EC | 02EC |
| 0000120420 | 76FF | FF08 | 0676 | 8D16 | FE46 | 3350 | 50C0 | 9A50 |
| 0000120440 | FFFF | 0000 | C00B | 1675 | 46F6 | 020A | 1374 | 46F7 |
| 0000120460 | 01FE | 7400 | BA0C | 000D | 05B8 | E900 | E474 | 8AE9 |
| 0000120500 | 8BE4 | 5DE5 | 00CB | 8B55 | 83EC | 0AEC | 5EC4 | 2606 |
| 0000120520 | 078A | 8B98 | F6D8 | C587 | 012A | 0674 | 478D | EB20 |
| 0000120540 | 9008 | 5E8B | 2606 | 078A | 3D98 | 0065 | 1374 | 46FF |
| 0000120560 | C406 | 065E | 8A26 | 9807 | D88B | 87F6 | 2AC5 | 7504 |
| 0000120600 | C4ED | 065E | 8A26 | 8807 | FE46 | C626 | 2E07 | 46FF |
| 0000120620 | C406 | 065E | 8A26 | 8807 | FC46 | 468A | 26FE | 0788 |
| 0000120640 | 468A | 88FC | FE46 | 5EC4 | FF06 | 0646 | 8026 | 003F |
| 0000120660 | DF75 | E58B | CB5D | 8B55 | 83EC | 08EC | 09EB | 8026 |
| 0000120700 | 2E3F | 0C74 | 46FF | C406 | 065E | 8026 | 003F | EE75 |
| 0000120720 | 46FF | 2606 | 3F80 | 7400 | EB56 | 9010 | 8026 | 653F |
| 0000120740 | 1274 | 8026 | 453F | 0C74 | 46FF | 8B06 | 065E | 8026 |
| 0000120760 | 003F | E875 | C38B | C28C | 4EFF | 8906 | FC46 | 5689 |
| 0000121000 | EBFE | 9004 | 4EFF | 8B06 | 065E | 8026 | 303F | F474 |
| 0000121020 | 8026 | 2E3F | 0375 | 4EFF | C406 | FC5E | 46FF | 26FC |
| 0000121040 | 078A | 46FF | C406 | 065E | 8826 | 0A07 | 75C0 | 8BEA |
| 0000121060 | 5DE5 | 90CB | 8B55 | 83EC | 02EC | 5EC4 | 9B06 | DD26 |

THU MAR 14 17:21:24 1991  CLIENT.EXE  PAGE 45, LINE 2597

| | | | | | | | | |
|---|---|---|---|---|---|---|---|---|
| 0000121100 | 9B07 | 16DC | 2D16 | DD9B | 9BD8 | 7EDD | 90FE | 8A9B |
| 0000121120 | FF66 | 729E | B807 | 0001 | E58B | CB5D | C02B | E58B |
| 0000121140 | CB5D | 8B55 | 83EC | 10EC | 5657 | 468B | 4806 | 4074 |
| 0000121160 | 7448 | FF1F | 0E76 | 76FF | 8D0C | F046 | 9A50 | B030 |
| 0000121200 | A16B | D88B | 369B | 07DD | 5EC4 | 9B08 | D926 | EB1F |
| 0000121220 | 9016 | 76FF | FF0E | 0C76 | 3E9A | 8DBE | 83A1 | 04C4 |
| 0000121240 | 5EC4 | 9B08 | DB26 | 903F | 5E9B | 8B5F | 5DE5 | 90CB |
| 0000121260 | 76FF | FF0E | 0C76 | 468D | 50F8 | 309A | 3AB0 | 8BA2 |
| 0000121300 | 1EF0 | 1F16 | 7EC4 | A508 | A5A5 | 1FA5 | 5F5E | E58B |
| 0000121320 | CB5D | 8B55 | 83EC | 06EC | 5657 | 5EC4 | 2612 | 478B |
| 0000121340 | 4802 | 7E80 | 0016 | 2E74 | 8326 | 2D3F | 0675 | 01B8 |
| 0000121360 | EB00 | 9003 | C02B | 4603 | 8B0A | 0C56 | 4689 | 89FA |
| 0000121400 | FC56 | 5052 | 7E83 | 000E | 067E | 01B8 | EB00 | 9003 |
| 0000121420 | C02B | E850 | 045C | 468B | 8B0A | 0C56 | 4689 | 89FA |
| 0000121440 | FC56 | 5EC4 | 2612 | 3F83 | 752D | 8E0C | 8BC2 | 26D8 |
| 0000121460 | 07C6 | 402D | 4689 | 83FA | 0E7E | 7E00 | C412 | FA5E |
| 0000121500 | 8A26 | 0147 | 8826 | 4307 | 5E89 | 26FA | 07C6 | B82E |
| 0000121520 | 2A90 | 501E | 7E80 | 0116 | C01B | D8F7 | 4603 | 8BFA |
| 0000121540 | FC56 | 4603 | 520E | 9A50 | 7BA2 | A2ED | C483 | 8908 |
| 0000121560 | FA46 | 5689 | 83FC | 107E | 7400 | C407 | FA5E | C626 |
| 0000121600 | 4507 | 46FF | C4FA | 125E | C426 | 067F | 8026 | 303D |
| 0000121620 | 5C74 | 468E | 2614 | 778B | 4E02 | 0D79 | C68B | D8F7 |
| 0000121640 | F08B | 5EC4 | 26FA | 07C6 | FF2D | FA46 | FE83 | 7C64 |
| 0000121660 | 8B15 | B9C6 | 0064 | F799 | C4F9 | FA5E | 0026 | 8B07 |
| 0000121700 | 99C6 | F9F7 | F28B | 46FF | 83FA | 0AFE | 157C | C68B |
| 0000121720 | 0AB9 | 9900 | F9F7 | 5EC4 | 26FA | 0700 | C68B | F799 |
| 0000121740 | 8BF9 | 8BF2 | FFC6 | FA46 | 5EC4 | 26FA | 0700 | 468B |
| 0000121760 | 8B0A | 0C56 | 5F5E | E58B | CB5D | 8B55 | 83EC | 28EC |
| 0000122000 | 468D | 50EA | 468D | 50DC | 5EC4 | 2606 | 77FF | 2606 |
| 0000122020 | 77FF | 2604 | 77FF | 2602 | 37FF | F49A | 3ABD | 83A3 |
| 0000122040 | 0CC4 | 468D | 89DC | E646 | 568C | 16E8 | 8B50 | 0E4E |
| 0000122060 | 5141 | 7E83 | 000E | 067E | 01B8 | EB00 | 9003 | C02B |
| 0000122100 | 5EC4 | 89E6 | DA46 | 2650 | 078B | 4689 | 58D8 | 8326 |
| 0000122120 | 2D3F | 0675 | 01B8 | EB00 | 9003 | C02B | 4603 | 03DA |
| 0000122140 | 0A46 | 568B | 520C | 9A50 | B090 | A45F | C483 | 2ADA |
| 0000122160 | 50C0 | 76FF | FFE8 | E676 | 76FF | FF10 | 0E76 | 76FF |
| 0000122200 | FF0C | 0A76 | 76FF | FF08 | 0676 | E80E | FE44 | 468B |
| 0000122220 | 8B0A | 0C56 | E58B | CB5D | 8B55 | 83EC | 0CEC | C456 |
| 0000122240 | 105E | 8B26 | 0247 | 8948 | FE46 | 7E80 | 0014 | 3474 |
| 0000122260 | 8326 | 2D3F | 0675 | 01B8 | EB00 | 9003 | C02B | 4603 |
| 0000122300 | 8B0A | 0C56 | 4689 | 89F4 | F656 | 4E8B | 390E | FE4E |
| 0000122320 | 1275 | C28E | D88B | 768B | 26FE | 00C6 | 0330 | 43DE |
| 0000122340 | C626 | 0007 | 468B | 8B0A | 0C56 | 4689 | 89F4 | F656 |
| 0000122360 | 5EC4 | 2610 | 3F83 | 752D | 8E0C | 8BC2 | 26D8 | 07C6 |
| 0000122400 | 402D | 4689 | C4F4 | 105E | 8326 | 027F | 7F00 | FF19 |
| 0000122420 | F676 | 76FF | B8F4 | 0001 | E850 | 0256 | 5EC4 | 26F4 |
| 0000122440 | 07C6 | FF30 | F446 | 07EB | 8B26 | 0247 | 4601 | 83F4 |
| 0000122460 | 0E7E | 7E00 | FF5F | F676 | 76FF | B8F4 | 0001 | E850 |
| 0000122500 | 0230 | 5EC4 | 26F4 | 07C6 | FF2E | F446 | 5EC4 | 2610 |
| 0000122520 | 7F83 | 0002 | 3E7D | 7E80 | 0014 | 0874 | 8B26 | 0247 |
| 0000122540 | D8F7 | 0EEB | 8B26 | 0247 | D8F7 | 463B | 7E0E | 8B03 |
| 0000122560 | 0E46 | 4689 | FF0E | F676 | 76FF | 50F4 | F3E8 | FF01 |
| 0000122600 | 0E76 | 30B8 | 5000 | 76FF | FFF6 | F476 | 969A | 937D |
| 0000122620 | 83A4 | 08C4 | 468B | 8B0A | 0C56 | 8B5E | 5DE5 | 90CB |
| 0000122640 | 8B55 | 83EC | 26EC | 468D | 50EA | 468D | 50DC | 5EC4 |
| 0000122660 | 2606 | 77FF | 2606 | 77FF | 2604 | 77FF | 2602 | 37FF |
| 0000122700 | F49A | 3ABD | 839E | 0CC4 | 468D | 89DC | E646 | 568C |
| 0000122720 | 16E8 | 8B50 | DE4E | 4E03 | 510E | D88B | 3650 | 078B |
| 0000122740 | 4689 | 58DA | 8336 | 2D3F | 0675 | 01B8 | EB00 | 9003 |

THU MAR 14 17:21:24 1991 CLIENT.EXE PAGE 46, LINE 2656

| | | | | | | | | |
|---|---|---|---|---|---|---|---|---|
| 0000122760 | C02B | 4603 | 8B0A | 0C56 | 5052 | 909A | 1BB0 | 83A5 |
| 0000123000 | 0AC4 | C02A | FF50 | E876 | 76FF | FFE6 | 0E76 | 76FF |
| 0000123020 | FF0C | 0A76 | 76FF | FF08 | 0676 | E80E | FE7A | 468B |
| 0000123040 | 8B0A | 0C56 | E58B | CB5D | 8B55 | 83EC | 32EC | 468D |
| 0000123060 | 50E4 | 468D | 50D8 | 5EC4 | 2606 | 77FF | 2606 | 77FF |
| 0000123100 | 2604 | 77FF | 2602 | 37FF | F49A | 55BD | 83A5 | 0CC4 |
| 0000123120 | 468B | 48DA | 4689 | 8DE2 | D846 | 4689 | 8CD4 | D656 |
| 0000123140 | 5016 | 76FF | 8B0E | 36D8 | 3F83 | 752D | B805 | 0001 |
| 0000123160 | 02EB | C02B | 4603 | 8B0A | 0C56 | 4689 | 89FC | FE56 |
| 0000123200 | 5052 | 909A | 54B0 | 83A6 | 0AC4 | 468B | 48DA | 4689 |
| 0000123220 | 3BD2 | E246 | 047E | 01B0 | 02EB | C02A | 4688 | 8BFA |
| 0000123240 | D246 | 4689 | 3DE2 | FFFC | 057C | 463B | 7C0E | B027 |
| 0000123260 | 5001 | 76FF | FFD6 | D476 | 76FF | FF10 | 0E76 | 76FF |
| 0000123300 | FF0C | 0A76 | 76FF | FF08 | 0676 | E80E | FC04 | C483 |
| 0000123320 | 8B12 | 5DE5 | 90CB | 7E80 | 00FA | 1474 | 5EC4 | FFFC |
| 0000123340 | FC46 | 8026 | 003F | F475 | 5E8B | 26FC | 47C6 | 00FE |
| 0000123360 | 01B0 | FF50 | D676 | 76FF | FFD4 | 0E76 | 76FF | FF0C |
| 0000123400 | 0A76 | 76FF | FF08 | 0676 | E80E | FD8C | E58B | CB5D |
| 0000123420 | 8B55 | 83EC | 0E7E | 7465 | 8306 | 0E7E | 7545 | FF1D |
| 0000123440 | 1276 | 76FF | FF10 | 0C76 | 76FF | FF0A | 0876 | 76FF |
| 0000123460 | 0E06 | C5E8 | 8BFC | 8BE5 | 5DE5 | 90CB | 7E83 | 660E |
| 0000123500 | 1675 | 76FF | FF10 | 0C76 | 76FF | FF0A | 0876 | 76FF |
| 0000123520 | 0E06 | 4BE8 | EBFE | 90DE | 76FF | FF12 | 1076 | 76FF |
| 0000123540 | FF0C | 0A76 | 76FF | FF08 | 0676 | E80E | FEBA | E58B |
| 0000123560 | CB5D | 8B55 | 83EC | 047E | 7400 | FF25 | 0876 | 76FF |
| 0000123600 | 9A06 | 7BD8 | A66E | E58B | 5040 | 76FF | FF08 | 0676 |
| 0000123620 | 468B | 8B06 | 0856 | 4603 | 5204 | 9A50 | B65C | A150 |
| 0000123640 | E58B | C25D | 0006 | 5A5A | D6BA | 8E83 | 55DA | EC8B |
| 0000123660 | EC83 | C708 | FA46 | 4D05 | 46C7 | 36FC | C731 | FE46 |
| 0000123700 | 7878 | E42A | 2D50 | 0081 | 4689 | 6AF8 | E802 | F11E |
| 0000123720 | C483 | 9A02 | 8182 | A4CD | 5E8B | D1F8 | 8BE3 | 968F |
| 0000123740 | 8D2A | FA5E | 8936 | 044F | 8C1E | 8ED0 | 9AD8 | B7D0 |
| 0000123760 | A6A6 | B81F | 00FD | 9A50 | 8400 | A6C0 | 468B | 05F8 |
| 0000124000 | 0065 | 9A50 | 8400 | A6CA | 026A | EDE8 | 83F0 | 02C4 |
| 0000124020 | 779A | D680 | 00A6 | 8B55 | 83EC | 1AEC | 5EC4 | 2606 |
| 0000124040 | 77FF | 2608 | 77FF | 2606 | 77FF | 2604 | 77FF | 2602 |
| 0000124060 | 37FF | 468B | 400E | 013D | 7D00 | B803 | 0001 | 2B50 |
| 0000124100 | 50C0 | 468D | 50E6 | AE9A | DBF0 | FFA8 | 1076 | 76FF |
| 0000124120 | FF0E | 0C76 | 76FF | 8D0A | E646 | 5016 | E80E | 0004 |
| 0000124140 | E58B | CB5D | 8B55 | 83EC | 0CEC | 468B | 8B0A | 0C56 |
| 0000124160 | 4689 | 89FC | FE56 | 4E8B | 8B06 | 085E | C183 | 8904 |
| 0000124200 | F64E | 5E89 | C4F8 | 065E | 8026 | 027F | 752D | 8E0C |
| 0000124220 | 8BC2 | 26D8 | 07C6 | 402D | 4689 | C4FC | 065E | 8026 |
| 0000124240 | 037F | 7400 | C415 | F65E | 46FF | 26F6 | 078A | 5EC4 |
| 0000124260 | FFFC | FC46 | 8826 | EB07 | 9015 | 5EC4 | FFFC | FC46 |
| 0000124300 | C626 | 3007 | 5EC4 | 2606 | 47FE | 2603 | 07FF | 7E83 |
| 0000124320 | 000E | 497E | 5EC4 | FFFC | FC46 | C626 | 2E07 | 5EC4 |
| 0000124340 | 2606 | 478A | 9803 | 8948 | FA46 | 4629 | EB0E | 9016 |
| 0000124360 | 5EC4 | FFF6 | F646 | 8A26 | C407 | FC5E | 46FF | 26FC |
| 0000124400 | 0788 | 4EFF | 83FA | FA7E | 7500 | EBE5 | 900B | 5EC4 |
| 0000124420 | FFFC | FC46 | C626 | 3007 | 4EFF | 790E | 83F1 | 107E |
| 0000124440 | 7400 | C40D | FC5E | 46FF | 26FC | 07C6 | EB45 | 900B |
| 0000124460 | 5EC4 | FFFC | FC46 | C626 | 6507 | 5EC4 | 2606 | 078B |
| 0000124500 | 8948 | F446 | C00B | 127D | D8F7 | 4689 | C4F4 | FC5E |
| 0000124520 | 46FF | 26FC | 07C6 | EB2D | 900B | 5EC4 | FFFC | FC46 |
| 0000124540 | C626 | 2B07 | E83D | 7C03 | B91A | 03E8 | F799 | 04F9 |
| 0000124560 | 8B30 | FC5E | [illegible]FF | 26FC | 0788 | 468B | 99F4 | F9F7 |
| 0000124600 | 5689 | 8BF4 | F446 | 64B9 | 9900 | F9F7 | 3004 | 5E8B |
| 0000124620 | FFFC | FC46 | 8826 | 8B07 | F446 | F799 | 89F9 | F456 |

THU MAR 14 17:21:24 1991 CLIENT.EXE PAGE 47, LINE 2715

| | | | | | | | | |
|---|---|---|---|---|---|---|---|---|
| 0000124640 | C28B | 0AB9 | 9900 | F9F7 | 3004 | 5E8B | FFFC | FC46 |
| 0000124660 | 8826 | 8B07 | F446 | F799 | 80F9 | 30C2 | 5E8B | FFFC |
| 0000124700 | FC46 | 8826 | 8B17 | FC5E | 46FF | 26FC | 07C6 | 8B00 |
| 0000124720 | 0A46 | 568B | 8B0C | 5DE5 | 90CB | 8B55 | 83EC | 1AEC |
| 0000124740 | 5EC4 | 2606 | 77FF | 2608 | 77FF | 2606 | 77FF | 2604 |
| 0000124760 | 77FF | 2602 | 37FF | 468B | 0B0E | 7DC0 | 2B02 | 50C0 |
| 0000125000 | 01B8 | 5000 | 468D | 50E6 | AE9A | 4CF0 | FFAA | 0E76 |
| 0000125020 | 76FF | FF0C | 0A76 | 468D | 16E6 | 0E50 | 05E8 | 8B00 |
| 0000125040 | 5DE5 | 90CB | 8B55 | 83EC | 0EEC | 468B | 8B0A | 0C56 |
| 0000125060 | 4689 | 89FC | FE56 | 5EC4 | 2606 | 0F8B | 4E89 | 8DF4 |
| 0000125100 | 044F | 4E89 | 8CF6 | F846 | 8026 | 027F | 752D | 8E0F |
| 0000125120 | 8BC2 | 26D8 | 07C6 | 402D | 4689 | 89FC | FE56 | 7E83 |
| 0000125140 | 00F4 | 527E | 5EC4 | 2606 | 478A | 9803 | 463B | 7EF4 |
| 0000125160 | 8B03 | F446 | 4689 | 29FA | F446 | 468A | 26FA | 4728 |
| 0000125200 | EB03 | 9013 | 5EC4 | FFF6 | F646 | 8A26 | C407 | FC5E |
| 0000125220 | 46FF | 26FC | 0788 | 468B | FFFA | FA4E | C00B | E475 |
| 0000125240 | 7E83 | 00F4 | 1A74 | 4EFF | C4F4 | FC5E | 46FF | 26FC |
| 0000125260 | 07C6 | EB30 | 90EB | 5EC4 | FFFC | FC46 | C626 | 3007 |
| 0000125300 | 7E83 | 000E | 707E | 5EC4 | FFFC | FC46 | C626 | 2E07 |
| 0000125320 | 5EC4 | 2606 | 478A | 9803 | 462B | F7F4 | 01D8 | 0E46 |
| 0000125340 | 0AEB | 5EC4 | FFFC | FC46 | C626 | 3007 | 468B | FFF4 |
| 0000125360 | F446 | C00B | EC7C | 5EC4 | 2606 | 478A | 9803 | 4689 |
| 0000125400 | EBFA | 9013 | 5EC4 | FFF6 | F646 | 8A26 | C407 | FC5E |
| 0000125420 | 46FF | 26FC | 0788 | 468B | FFFA | FA4E | C00B | E475 |
| 0000125440 | 0AEB | 5EC4 | FFFC | FC46 | C626 | 3007 | 468B | FF0E |
| 0000125460 | 0E4E | C00B | EC7F | 5EC4 | 26FC | 07C6 | 8B00 | 0A46 |
| 0000125500 | 568B | 8B0C | 5DE5 | 90CB | 8B55 | 83EC | 1AEC | 7E83 |
| 0000125520 | 000E | 057F | 46C7 | 010E | C400 | 065E | FF26 | 0877 |
| 0000125540 | FF26 | 0677 | FF26 | 0477 | FF26 | 0277 | FF26 | FF37 |
| 0000125560 | 0E76 | C02B | 8D50 | E646 | 9A50 | F0AE | A6E3 | 7E83 |
| 0000125600 | FCE6 | 087E | 468B | 39E6 | 0E46 | 1E7D | 76FF | 8B10 |
| 0000125620 | 0E46 | 5048 | 76FF | FF0C | 0A76 | 468D | 16E6 | 0E50 |
| 0000125640 | C1E8 | 83FC | 0CC4 | E58B | CB5D | 468B | 2B0E | E646 |
| 0000125660 | FF50 | 0C76 | 76FF | 8D0A | E646 | 5016 | E80E | FE64 |
| 0000125700 | E58B | CB5D | 8B55 | 83EC | 0E7E | 7465 | 8306 | 0E7E |
| 0000125720 | 7545 | FF1D | 1276 | 76FF | FF10 | 0C76 | 76FF | FF0A |
| 0000125740 | 0876 | 76FF | 0E06 | 2DE8 | 8BFC | 8BE5 | 5DE5 | 90CB |
| 0000125760 | 7E83 | 660E | 0674 | 7E83 | 460E | 1675 | 76FF | FF10 |
| 0000126000 | 0C76 | 76FF | FF0A | 0876 | 76FF | 0E06 | CBE8 | EBFD |
| 0000126020 | 90D8 | 76FF | FF12 | 1076 | 76FF | FF0C | 0A76 | 76FF |
| 0000126040 | FF08 | 0676 | E80E | FF20 | E58B | CB5D | 02B8 | E900 |
| 0000126060 | CDDA | 5A59 | DC8B | D82B | 1972 | FB81 | 0200 | 1372 |
| 0000126100 | E852 | 061E | 8E93 | 5AC2 | 3B26 | 0447 | 0572 | E08B |
| 0000126120 | 5152 | 52CB | A151 | 2AAE | 7540 | 3305 | E9C0 | CDAC |
| 0000126140 | 2EFF | 2AAE | 3356 | B9F6 | 0042 | E432 | ACFC | E032 |
| 0000126160 | FBE2 | F480 | 7455 | 0E0F | 37E8 | B8D6 | 0001 | 0E50 |
| 0000126200 | ADE8 | B8D8 | 0001 | CB5E | 8B55 | 06EC | 00B9 | 8704 |
| 0000126220 | C20E | 512A | 9A50 | 7B48 | D1EB | 8F5B | C206 | 8B2A |
| 0000126240 | 0BCA | 75C8 | F901 | 5D07 | 00C3 | 8B55 | 56EC | 768B |
| 0000126260 | B804 | 0200 | 9A50 | 7B48 | AB68 | 8B59 | 81DE | 90EB |
| 0000126300 | 8123 | 70C3 | 0B25 | 74D2 | 800B | 0A4C | C708 | 0247 |
| 0000126320 | 0200 | 0EEB | 4C80 | 040A | 47C7 | 0102 | 8C00 | 8DDA |
| 0000126340 | 0147 | 5489 | 8902 | 8904 | 0854 | 4489 | C706 | 0444 |
| 0000126360 | 0000 | 5D5E | 00C3 | 04C8 | 0000 | 8B56 | 0676 | 468B |
| 0000126400 | 2D08 | 2390 | 0CB9 | 9900 | F9F7 | 4689 | 50FE | C5E8 |
| 0000126420 | 83EB | 02C4 | 76FF | FF0A | 0876 | 9A56 | AC06 | AB88 |
| 0000126440 | C483 | 8906 | FC46 | 76FF | E8FE | EBB6 | C483 | 8B02 |
| 0000126460 | FC46 | C95E | 90CB | 8B55 | 57EC | 8B56 | 0676 | 7E8B |
| 0000126500 | 8308 | FFFE | 1274 | 45F6 | 010A | 1275 | 45F6 | 800A |

THU MAR 14 17:21:24 1991 CLIENT.EXE PAGE 48, LINE 2774

| | | | | | | | | |
|---|---|---|---|---|---|---|---|---|
| 0000126520 | 0674 | 45F6 | 020A | 0674 | FFB8 | EBFF | 903E | 458B |
| 0000126540 | 0B08 | 0645 | 0875 | 571E | 3FE8 | 83FF | 04C4 | 058B |
| 0000126560 | 558B | 3902 | 0645 | 0D75 | 5539 | 7508 | 8308 | 047D |
| 0000126600 | 7500 | FFD5 | FF05 | 0445 | C68B | 0DFF | 1DC4 | 8826 |
| 0000126620 | 8007 | 0A65 | 80EF | 0A4D | 2A01 | 5EE4 | C95F | 90CB |
| 0000126640 | 8B55 | 83EC | 02EC | C033 | 09EB | 8B55 | 83EC | 02EC |
| 0000126660 | FFB8 | 89FF | FE46 | 5E8B | 3B06 | 9C1E | 7227 | BA19 |
| 0000126700 | 0009 | C033 | EBE9 | 8BD7 | FE4E | C90B | 0774 | E853 |
| 0000126720 | EB28 | C483 | E902 | D7F3 | C00B | 0774 | E853 | EB0E |
| 0000126740 | C483 | 8302 | 04EC | CC8B | FF53 | 0A76 | 76FF | FF08 |
| 0000126760 | 0C76 | 5116 | A39A | 0094 | 5900 | 855A | 75C0 | 80C8 |
| 0000127000 | 9EA7 | FD27 | 468B | 0BFE | 74C0 | 5307 | EBE8 | 83EA |
| 0000127020 | 02C4 | 8B91 | 5DE5 | 00CB | 8B55 | 83EC | 08EC | C033 |
| 0000127040 | 5E8B | 3B06 | 9C1E | 7327 | 534D | C1E8 | 83EA | 02C4 |
| 0000127060 | 4E8B | E30C | F647 | 9E87 | 0227 | 4075 | 3357 | 8BD2 |
| 0000127100 | 0C4E | 7EC4 | F608 | 9E87 | 0827 | 1074 | 878A | 289E |
| 0000127120 | 0A3C | 0874 | 42AA | C649 | 9E87 | 0A28 | 0653 | 5157 |
| 0000127140 | 468D | 16FA | 9A50 | FFFF | 0000 | 0B5F | 74C0 | 530F |
| 0000127160 | 87E8 | 83EA | 02C4 | 09BA | E900 | D736 | 4AEB | 468B |
| 0000127200 | 03FA | F6C2 | 9E87 | 8027 | 3E74 | A780 | 279E | 56FB |
| 0000127220 | 1E57 | C507 | 0876 | FE8B | C88B | 28E3 | 0DB4 | 3C80 |
| 0000127240 | 750A | 2606 | 8F80 | 279E | AC04 | C43A | 2574 | 1A3C |
| 0000127260 | 0875 | 8026 | 9E8F | 0227 | 05EB | 0588 | E247 | 8BEA |
| 0000127300 | 2BC7 | 0846 | 1F06 | 5E5F | E853 | EA2E | C483 | 8B02 |
| 0000127320 | 5DE5 | 83CB | 01F9 | 0774 | 3C80 | 740A | EBE0 | 26DB |
| 0000127340 | 87F6 | 279E | 7440 | 0B2B | 75DB | 5323 | 468D | 16F9 |
| 0000127360 | 5150 | 468D | 16FA | 9A50 | AD36 | 0000 | C085 | 0E74 |
| 0000127400 | 1F06 | 5E5F | E853 | E9F2 | C483 | E902 | D6BD | 0AB0 |
| 0000127420 | A8EB | 46C6 | 00F9 | 8D53 | F946 | 5016 | 8D51 | FA46 |
| 0000127440 | 5016 | C89A | 00AD | 0B00 | 75C0 | F7D5 | FA46 | FFFF |
| 0000127460 | 3674 | 7E83 | 010C | 3574 | F626 | 9E87 | 0827 | 1C75 |
| 0000127500 | B853 | FFFF | 5050 | D8F7 | 8D50 | FC46 | 5016 | C59A |
| 0000127520 | 00AC | 8000 | F97E | 750A | E90F | FF61 | 468A | 26F9 |
| 0000127540 | 8788 | 289E | 0A3C | 0274 | 0DB0 | 4DE9 | 80FF | F97E |
| 0000127560 | 750A | EBC5 | 0099 | 5A59 | E852 | 02E6 | D88B | C28E |
| 0000127600 | 265A | 478B | 3B04 | 73C4 | 2B07 | F7C4 | 52D8 | CB51 |
| 0000127620 | C033 | F9EB | 8041 | FEE1 | FC53 | 778B | 8B08 | 0A5F |
| 0000127640 | FF33 | 23EB | C38B | A85B | 7501 | 5342 | 778B | 8B06 |
| 0000127660 | 085F | DE3B | 3674 | 334B | EBFF | 900C | 548D | 3BFE |
| 0000127700 | 73D3 | 03E1 | 72F0 | AD23 | 01A8 | F074 | FE8B | 3B48 |
| 0000127720 | 73C1 | 0323 | 72F0 | 8B13 | ADD0 | 01A8 | DE74 | C203 |
| 0000127740 | 0205 | 8B00 | 89F7 | FE44 | E4EB | C08B | 8B5B | 0647 |
| 0000127760 | 4789 | F908 | 19EB | 895B | FE4C | 0974 | F903 | C12B |
| 0000130000 | 8948 | 2B05 | 03F9 | 89F9 | 087F | C68B | DA8C | C3F8 |
| 0000130020 | 5751 | 47F6 | 0102 | 6674 | B7E8 | 8B00 | 8BFE | A804 |
| 0000130040 | 7401 | 2B03 | 49C8 | 4141 | 778B | 0B04 | 74F6 | 034F |
| 0000130060 | 73CE | 3309 | BAC0 | FFF0 | 33E3 | 42EB | FEB8 | 8ED7 |
| 0000130100 | 26C0 | C2A1 | 3D2A | 2000 | 1674 | 00BA | 3B80 | 72D0 |
| 0000130120 | D106 | 75EA | EBF8 | 8322 | 08FA | 1D72 | E2D1 | C28B |
| 0000130140 | 8B48 | 03D0 | 73C1 | 3302 | F7C0 | 23D2 | 52C2 | 2EE8 |
| 0000130160 | 5A00 | 0D73 | FA83 | 74F0 | B805 | 0010 | E2EB | EBF9 |
| 0000130200 | 8B1B | 2BD0 | 0457 | 4789 | 8904 | 087F | 778B | 4A0A |
| 0000130220 | 1489 | 0342 | C7F2 | FE04 | 89FF | 0A77 | 595F | 8BC3 |
| 0000130240 | F6D0 | 0247 | 7404 | 4A0F | 778B | 4E04 | D63B | 0572 |
| 0000130260 | 5739 | 73FE | 4218 | 1E50 | FF9A | 00FF | 0B00 | 75C0 |
| 0000130300 | 8B0F | F6C2 | 0247 | 7404 | 4A04 | 5789 | F8FE | 01EB |
| 0000130320 | C3F9 | 8B57 | 0877 | 773B | 750A | 8B03 | 0677 | 3DAD |
| 0000130340 | FFFE | 0874 | FE8B | FE24 | F003 | F2EB | 4F4F | F78B |
| 0000130360 | C35F | D18B | C283 | 8027 | F0E2 | 8B50 | 52C4 | 5016 |

THU MAR 14 17:21:24 1991 CLIENT.EXE PAGE 49, LINE 2833

| | | | | | | | | |
|---|---|---|---|---|---|---|---|---|
| 0000130400 | C033 | 9A50 | CB69 | 0000 | 0B1F | 75C0 | 3314 | 26DB |
| 0000130420 | 458B | 890C | 0247 | C28B | 7FE8 | E80E | 0EB0 | EBF8 |
| 0000130440 | F901 | 00C3 | 8B55 | 57EC | 1E56 | 4E8B | E30E | 8B27 |
| 0000130460 | C4D9 | 067E | F78B | C033 | AEF2 | D9F7 | CB03 | FE8B |
| 0000130500 | 76C5 | F30A | 8AA6 | FF44 | C933 | 3A26 | FF45 | 0477 |
| 0000130520 | 0474 | 4949 | D1F7 | C18B | 5E1F | 8B5F | 5DE5 | 00CB |
| 0000130540 | 12C8 | 0000 | 5657 | 03EB | 46FF | C408 | 085E | 8A26 |
| 0000130560 | 9807 | D88B | 87F6 | 2AC5 | 7508 | 6AED | 6A00 | 0600 |
| 0000130600 | 76FF | 9A08 | 7BD8 | B069 | C483 | 5004 | 76FF | FF0A |
| 0000130620 | 0876 | 468D | 50F0 | EB9A | EEC3 | 83AB | 0CC4 | 0805 |
| 0000130640 | 8B00 | 065E | FB8B | F08B | 0716 | 8E1E | A5DA | A5A5 |
| 0000130660 | 1FA5 | 5E89 | 8BEE | 8CC3 | 5ED2 | C95F | 06CA | 9000 |
| 0000130700 | 08C8 | 0000 | 5EC4 | 260C | 478B | 2606 | 578B | 8908 |
| 0000130720 | F846 | 5689 | C4FA | 065E | C626 | 3007 | 478D | 8901 |
| 0000130740 | FC46 | 468C | EBFE | 9026 | 5EC4 | 26F8 | 3F80 | 7400 |
| 0000130760 | 260F | 078A | 5EC4 | 26FC | 0788 | 46FF | EBF8 | 9008 |
| 0000131000 | 5EC4 | 26FC | 07C6 | FF30 | FC46 | 4EFF | 830A | 0A7E |
| 0000131020 | 7F00 | C4D5 | FC5E | C626 | 0007 | 7E83 | 000A | 1F7C |
| 0000131040 | 5EC4 | 26F8 | 3F80 | 7C35 | EB16 | 9005 | C626 | 3007 |
| 0000131060 | 4EFF | C4FC | FC5E | 8026 | 393F | F074 | FE26 | C407 |
| 0000131100 | 065E | 8026 | 313F | 0A75 | 5EC4 | 260C | 47FF | EB02 |
| 0000131120 | 900F | C38B | C28C | 5240 | 5250 | 9A53 | 7BA2 | B056 |
| 0000131140 | CBC9 | 068E | 2362 | A126 | 0006 | 3B48 | C606 | 772B |
| 0000131160 | C107 | 06E0 | FFBA | C3FF | 5357 | 6A51 | E80F | E6A6 |
| 0000131200 | C483 | 3B02 | C606 | 762B | 8B40 | 05D8 | 0004 | FC25 |
| 0000131220 | 8BFF | C1C8 | 06E0 | 45BA | 50B1 | 9A52 | AF89 | 0000 |
| 0000131240 | C00B | 3275 | 8B49 | 87F9 | C63E | 2B2B | 51CF | C147 |
| 0000131260 | 06E7 | E1C1 | 5705 | C28E | ABF3 | 595F | C726 | 0445 |
| 0000131300 | 0200 | C783 | E240 | 8BF5 | 6AC3 | E80F | E67E | C483 |
| 0000131320 | 5902 | 5F5B | 9BEB | 10B8 | E900 | C730 | 14C8 | 0000 |
| 0000131340 | 5657 | 5EC4 | 2606 | 7F81 | CE02 | 7712 | 720F | 2607 |
| 0000131360 | 3F81 | A600 | 0673 | C02B | E999 | 0222 | 63E8 | 8EFF |
| 0000131400 | 8BC2 | 89D8 | F45E | 468C | 26F6 | 478B | 261E | 470B |
| 0000131420 | 751C | 6A2D | 9A12 | 7B48 | B231 | C483 | C402 | F45E |
| 0000131440 | 8926 | 1C47 | 8926 | 1E57 | C28B | 0B26 | 1C47 | 0A75 |
| 0000131460 | 46C7 | C8F8 | 8C2B | FA5E | 14EB | 8B26 | 1C47 | 08EB |
| 0000131500 | 8B26 | 1C47 | 8B26 | 1E57 | 4689 | 89F8 | FA56 | E168 |
| 0000131520 | 6801 | 3380 | 5EC4 | 2606 | 77FF | 2602 | 37FF | 8A9A |
| 0000131540 | 4FC1 | 6AB2 | 68FE | AE80 | E168 | 6801 | 3380 | 5EC4 |
| 0000131560 | 2606 | 77FF | 2602 | 37FF | F08B | FA8B | 2A9A | 75C1 |
| 0000131600 | C4B2 | F85E | 8926 | 0A47 | 9940 | C233 | C22B | F8C1 |
| 0000131620 | 3302 | 2BC2 | 8BC2 | 8BCE | 6AF0 | 5600 | 4E89 | 89EC |
| 0000131640 | EE7E | 5E9A | 157F | 03B3 | EC46 | D713 | 4689 | 89FC |
| 0000131660 | FE56 | 468E | 83FA | FE7E | 7D00 | 812D | FC46 | 3380 |
| 0000131700 | 5681 | E1FE | 8B01 | F85E | 8B26 | 0A47 | B940 | 0004 |
| 0000131720 | F799 | 0BF9 | 75D2 | 810A | FC46 | 5180 | 5683 | 01FE |
| 0000131740 | 264E | 4FFF | EB0A | 90CE | 5EC4 | 26F8 | 4781 | B20A |
| 0000131760 | 2607 | 478B | B90A | 0004 | D88B | F799 | 0BF9 | 75D2 |
| 0000132000 | 8B25 | B9C3 | 0064 | F799 | 0BF9 | 75D2 | 8B11 | F85E |
| 0000132020 | 8B26 | 0A47 | 90B9 | 9901 | F9F7 | D20B | 0875 | 46C7 |
| 0000132040 | 94F0 | EB2C | 9006 | 46C7 | AEF0 | 8C2C | F25E | 5E8B |
| 0000132060 | 26F8 | 6F81 | 6C0A | 6A07 | 6801 | 5180 | 76FF | FFFE |
| 0000132100 | FC76 | C49A | 2B7E | C4B3 | F85E | 8926 | 0E47 | 016A |
| 0000132120 | 8068 | 8D51 | FC46 | 5016 | 5C9A | 87C0 | C4B3 | F85E |
| 0000132140 | C726 | 0847 | 0001 | 07EB | 5EC4 | 26F8 | 47FF | C408 |
| 0000132160 | F85E | 8B26 | 0E47 | 8B26 | 085F | E3D1 | 7EC4 | 26F0 |
| 0000132200 | 0139 | E47C | 5EC4 | 26F8 | 4FFF | 2608 | 5F8B | C408 |
| 0000132220 | F87E | 8B26 | 0E45 | E3D1 | 7EC4 | 8BF0 | 26C8 | 012B |
| 0000132240 | 5EC4 | 26F8 | 4789 | 6A06 | 6800 | 0E10 | 76FF | FFFE |

THU MAR 14 17:21:24 1991 CLIENT.EXE PAGE 50, LINE 2892

| | | | | | | | | |
|---|---|---|---|---|---|---|---|---|
| 0000132260 | FC76 | F98B | C49A | A17E | C4B3 | F85E | 8926 | 0447 |
| 0000132300 | 006A | 3C6A | 006A | 1068 | 8D0E | FC46 | 5016 | 5C9A |
| 0000132320 | AEC0 | 52B3 | 8950 | EC46 | 5689 | 9AEE | 7EC4 | B3C4 |
| 0000132340 | 5EC4 | 26F8 | 4789 | 6A02 | 6A00 | FF3C | EE76 | 76FF |
| 0000132360 | 9AEC | C07E | B12E | 5EC4 | 26F8 | 0789 | 6926 | 0A47 |
| 0000132400 | 016D | C703 | C603 | CA2D | B963 | 0007 | D22B | F1F7 |
| 0000132420 | 8926 | 0C57 | C726 | 1047 | 0000 | C38B | C28C | 5F5E |
| 0000132440 | CBC9 | 0B6A | FFE8 | 83E3 | 02C4 | 3E83 | 3062 | 7500 |
| 0000132460 | E807 | 0022 | C3FF | 3062 | 0B6A | 0FE8 | 83E4 | 02C4 |
| 0000132500 | 90CB | 0B6A | DFE8 | 83E3 | 02C4 | 09E8 | 6A00 | E80B |
| 0000132520 | E3FA | C483 | CB02 | 04C8 | 0000 | 1E56 | DA68 | 9A2B |
| 0000132540 | 9700 | B45F | C483 | 8904 | FC46 | 5689 | 0BFE | 75D0 |
| 0000132560 | E903 | 00A4 | 5EC4 | 26FC | 3F80 | 7500 | E903 | 0098 |
| 0000132600 | 036A | 5006 | 36FF | 2BEE | 36FF | 2BEC | D49A | 76BE |
| 0000132620 | 83B4 | 0AC4 | 006A | 1068 | 830E | FC46 | FF03 | FE76 |
| 0000132640 | 76FF | 9AFC | BEFE | B480 | C483 | 5204 | 9A50 | 7F5E |
| 0000132660 | B4CB | E6A3 | 892B | E816 | 2B2B | 8EF6 | FE46 | 5E8B |
| 0000132700 | 26FC | 3880 | 7400 | 261A | 008A | C88B | 8B98 | F6D8 |
| 0000132720 | C587 | 042A | 0575 | F980 | 752D | 4606 | FE83 | 7C03 |
| 0000132740 | 8BDD | FC5E | 8026 | 0038 | 1874 | 036A | DE03 | 5306 |
| 0000132760 | 36FF | 2BF2 | 36FF | 2BF0 | D49A | E8BE | 83B1 | 0AC4 |
| 0000133000 | 08EB | 1EC4 | 2BF0 | C626 | 0007 | 1EC4 | 2BF0 | 8026 |
| 0000133020 | 013F | C01B | A340 | 2BEA | C95E | 90C3 | 04C8 | 0000 |
| 0000133040 | C456 | 065E | 8326 | 087F | 7D03 | E903 | 00B6 | 8326 |
| 0000133060 | 087F | 7E09 | E903 | 00AC | 8326 | 087F | 7E03 | 260A |
| 0000133100 | 7F83 | 0908 | 037D | 81E9 | 2600 | 778B | 810A | 6CC6 |
| 0000133120 | 8107 | C2FE | 7E07 | 2617 | 7F83 | 0308 | 1075 | 8B26 |
| 0000133140 | 085F | E3D1 | 878B | 2CAE | 0705 | EB00 | 900B | 8B26 |
| 0000133160 | 085F | E3D1 | 878B | 2CB0 | 4689 | F7FC | 03C6 | 7500 |
| 0000133200 | FF03 | FC46 | 5E8B | 2606 | 778B | 830A | 46EE | 448D |
| 0000133220 | 9901 | C233 | C22B | F8C1 | 3302 | 2BC2 | 69C2 | 6DCE |
| 0000133240 | 0301 | 03C1 | FC46 | 0405 | B900 | 0007 | F799 | 2BF9 |
| 0000133260 | FC56 | DAF7 | 8326 | 087F | 7503 | 2615 | 573B | 7C0E |
| 0000133300 | 7509 | 2621 | 7F83 | 0204 | 1A7C | 01B8 | EB00 | 9017 |
| 0000133320 | 5EC4 | 8B06 | 26C2 | 4739 | 7C0E | 75EF | 2607 | 7F83 |
| 0000133340 | 0104 | E67C | C02B | C95E | 90CB | 8B55 | 57EC | 7EC4 |
| 0000133360 | 8B06 | 33DF | B9C0 | FFFF | AEF2 | F741 | 8AD9 | 0A46 |
| 0000133400 | FB8B | AEF2 | 264F | 0538 | 0474 | FF33 | C78E | C78B |
| 0000133420 | C28C | 8B5F | 5DE5 | 00CB | 8B55 | 8BEC | 1ED6 | 76C5 |
| 0000133440 | C40A | 065E | FFB0 | C00A | 2D74 | 26AC | 278A | 3A43 |
| 0000133460 | 74E0 | 2CF3 | 3C41 | 1A1A | 80C9 | 20E1 | C102 | 4104 |
| 0000133500 | E086 | 412C | 1A3C | C91A | E180 | 0220 | 04C1 | 3A41 |
| 0000133520 | 74C4 | 1AD3 | 1CC0 | 98FF | 8B1F | 5DF2 | 00CB | 8B55 |
| 0000133540 | 57EC | 7EC4 | 3306 | B9C0 | FFFF | AEF2 | F741 | 4FD9 |
| 0000133560 | 468A | FD0A | AEF2 | 2647 | 0538 | 0674 | C033 | D08B |
| 0000133600 | 04EB | C78B | C28C | 5FFC | E58B | CB5D | 8B55 | 8BEC |
| 0000133620 | 0E4E | 571E | 0B56 | 75C9 | E903 | 00AF | 76C5 | C40A |
| 0000133640 | 067E | 561E | 5706 | 029A | 32BF | 8BB4 | 0E4E | D20B |
| 0000133660 | 5778 | C12B | DA83 | 7300 | 4950 | F103 | 0773 | D88C |
| 0000133700 | C905 | 8E7D | 03D8 | 73F9 | 8C07 | 05C0 | B691 | C08E |
| 0000133720 | 8B41 | 48C1 | C72B | DB1B | C323 | C703 | C62B | DB1B |
| 0000133740 | C323 | C603 | 9140 | C12B | F3FD | FCA4 | E391 | 835C |
| 0000133760 | FFFE | 0775 | D88C | 9C2D | 8EB6 | 83D8 | FFFF | D175 |
| 0000134000 | C08C | C72D | 8EB6 | EBC0 | 8BC8 | 48C1 | D78B | D2F7 |
| 0000134020 | C22B | DB1B | C323 | C203 | D68B | D2F7 | C22B | DB1B |
| 0000134040 | C323 | C203 | 9140 | C12B | E9D1 | A5F3 | C913 | A4F3 |
| 0000134060 | E391 | 0B18 | 75F6 | 8C07 | 05D8 | B6D3 | D88E | FF0B |
| 0000134100 | C775 | C08C | 0A05 | 8EB7 | EBC0 | 8BBE | 0646 | 568B |
| 0000134120 | 5E08 | 1F5F | CB5D | 04C8 | 0000 | 468B | 8B04 | 0656 |

THU MAR 14 17:21:24 1991 CLIENT.EXE PAGE 51, LINE 2951

| | | | | | | | | |
|---|---|---|---|---|---|---|---|---|
| 0000134140 | 4689 | 89FC | FE56 | 4EFF | 740C | EB79 | 9044 | 8026 |
| 0000134160 | 3B3F | 6774 | 8026 | 223F | 2274 | 8A26 | C407 | 085E |
| 0000134200 | 8826 | FF07 | 0446 | 46FF | FF08 | 0C4E | 2375 | 468B |
| 0000134220 | 8B04 | 0656 | 4689 | 89FC | FE56 | 48EB | 46FF | C404 |
| 0000134240 | 045E | 8026 | 003F | 1475 | 8026 | 003F | 0374 | 46FF |
| 0000134260 | C404 | 045E | 8026 | 003F | B475 | 1FEB | 8026 | 223F |
| 0000134300 | E674 | 8A26 | C407 | 085E | 8826 | FF07 | 0446 | 46FF |
| 0000134320 | FF08 | 0C4E | C975 | B6EB | 46FF | 8B04 | 045E | 8026 |
| 0000134340 | 3B3F | F474 | 5EC4 | 2608 | 07C6 | 8B00 | 0446 | 568B |
| 0000134360 | 3906 | FC46 | 0875 | 5639 | 75FE | 2B03 | 99C0 | C3C9 |
| 0000134400 | 078A | E42A | 578D | 5301 | DC8B | 02B9 | 5100 | 521E |
| 0000134420 | 1650 | 9A53 | CC2B | 0000 | CB5B | 08C8 | 0000 | 6A56 |
| 0000134440 | FF00 | 0876 | 76FF | 9A06 | 9FDA | B80F | C483 | 0B06 |
| 0000134460 | 75C0 | 6841 | 0104 | 76FF | FF10 | 0E76 | 229A | 27BF |
| 0000134500 | 83B8 | 06C4 | 5EC4 | 260E | 7F80 | 0003 | 0E74 | 681E |
| 0000134520 | 2C30 | 5306 | 5C9A | 3B7B | 83B8 | 08C4 | 76FF | FF08 |
| 0000134540 | 0676 | 76FF | FF10 | 0E76 | 5C9A | 4D7B | 83B8 | 08C4 |
| 0000134560 | B0E9 | 9000 | 76FF | FF0C | 0A76 | 009A | 8B97 | 83B8 |
| 0000134600 | 04C4 | 4689 | 89FC | FE56 | D00B | 0375 | 8DE9 | 6A00 |
| 0000134620 | FF00 | 1076 | 76FF | FF0E | FE76 | 76FF | E8FC | FEB6 |
| 0000134640 | C483 | 890A | FC46 | 5689 | 0BFE | 74D0 | C46F | 0E5E |
| 0000134660 | 8026 | 003F | 6674 | 5306 | D89A | CD7B | 83B8 | 04C4 |
| 0000134700 | 5EC4 | 030E | 89D8 | F85E | 468C | 26FA | 478A | 98FF |
| 0000134720 | F08B | FE83 | 742F | 8317 | 5CFE | 1274 | FE83 | 743A |
| 0000134740 | 260D | 07C6 | 8D5C | 0147 | 4689 | 8CF8 | FA46 | 76FF |
| 0000134760 | FF08 | 0676 | 76FF | FFFA | F876 | A29A | DD7B | 83B8 |
| 0000135000 | 08C4 | 006A | 76FF | FF10 | 0E76 | DA9A | 799F | 83B6 |
| 0000135020 | 06C4 | C00B | 0374 | 76E9 | EBFF | 9008 | 5EC4 | 260E |
| 0000135040 | 07C6 | 5E00 | CBC9 | 14C8 | 0000 | 5657 | 468B | 0B0C |
| 0000135060 | 0A46 | 0D75 | A4A1 | 8B29 | A616 | 8929 | 0A46 | 5689 |
| 0000135100 | 8B0C | 0646 | 568B | 8908 | F446 | 5689 | BEF6 | 0002 |
| 0000135120 | 16EB | 4683 | 04F4 | FF26 | 0277 | FF26 | 9A37 | 7BD8 |
| 0000135140 | B95B | C483 | 4004 | F003 | 5EC4 | 26F4 | 478B | 2602 |
| 0000135160 | 070B | 0674 | FE81 | 7FFF | D876 | 468B | 0B1C | 1A46 |
| 0000135200 | 2274 | 76FF | FF1C | 1A76 | D89A | 6B7B | 83B9 | 04C4 |
| 0000135220 | 76FF | FF20 | 1E76 | F88B | D89A | 8C7B | 83B9 | 04C4 |
| 0000135240 | F803 | F703 | 7689 | 81FC | FFFE | 727F | C41D | 125E |
| 0000135260 | C02B | 8926 | 0247 | 8926 | 9A07 | 84EA | B99E | 4689 |
| 0000135300 | 89F0 | F256 | 5EC4 | E9F0 | 0110 | 9A56 | 7B48 | B9C0 |
| 0000135320 | C483 | C402 | 0E5E | 8926 | 2607 | 5789 | 0B02 | 75D0 |
| 0000135340 | C433 | 125E | C02B | 8926 | 0247 | 8926 | 9A07 | 84EA |
| 0000135360 | B9D3 | 4689 | 89EC | EE56 | 5EC4 | 26EC | 07C7 | 000C |
| 0000135400 | E29A | 0484 | 8EBA | 8BC2 | 26D8 | 07C7 | 0008 | FFB8 |
| 0000135420 | E9FF | 0347 | 468B | 8B0A | 0C56 | 4689 | 89F4 | F656 |
| 0000135440 | 02BE | EB00 | 9017 | 4683 | 04F4 | FF26 | 0277 | FF26 |
| 0000135460 | 9A37 | 7BD8 | BA62 | C483 | 4004 | F003 | 5EC4 | 26F4 |
| 0000135500 | 478B | 2602 | 070B | 0674 | FE81 | 7FFF | D876 | 3E83 |
| 0000135520 | 2CC8 | 7400 | A11F | 279C | 4689 | EBFE | 9004 | 4EFF |
| 0000135540 | 83FE | FE7E | 7400 | 8B12 | FE5E | BF80 | 279D | 7500 |
| 0000135560 | EB08 | 90EB | 46C7 | 00FE | 8300 | FE7E | 7400 | 8B0A |
| 0000135600 | FE46 | 0705 | D100 | 03E0 | FFF0 | 1876 | 76FF | 9A16 |
| 0000135620 | 7BD8 | BA8B | C483 | 2B04 | 03D2 | FC46 | D213 | C603 |
| 0000135640 | D283 | 0B00 | 7CD2 | 7F49 | 3D05 | 7FFE | 4276 | 5EC4 |
| 0000135660 | 260E | 77FF | 2602 | 37FF | 529A | 9F7B | 83BA | 04C4 |
| 0000135700 | 5EC4 | 2B0E | 26C0 | 4789 | 2602 | 0789 | EA9A | B284 |
| 0000135720 | 89BA | EC46 | 5689 | C4EE | EC5E | C726 | 0707 | 9A00 |
| 0000135740 | 84E2 | BAC4 | C28E | D88B | C726 | 0A07 | E900 | FF1E |
| 0000135760 | 9A56 | 7B48 | BAE4 | C483 | C402 | 125E | 8926 | 2607 |
| 0000136000 | 5789 | 0B02 | 75D0 | C419 | 0E5E | FF26 | 0277 | FF26 |

THU MAR 14 17:21:24 1991 CLIENT.EXE PAGE 52, LINE 3010

| | | | | | | | | |
|---|---|---|---|---|---|---|---|---|
| 0000136020 | 9A37 | 7B52 | BB1F | C483 | C404 | 0E5E | C5E9 | 90FE |
| 0000136040 | 5EC4 | 260E | 078B | 8B26 | 0257 | 4689 | 89F8 | FA56 |
| 0000136060 | 4E8B | 8B06 | 085E | 4E89 | 89F4 | F65E | 7E8B | 0B1C |
| 0000136100 | 1A7E | 7874 | 76FF | FF1C | 1A76 | 5052 | A29A | 317B |
| 0000136120 | 83BB | 08C4 | 681E | 2C32 | 76FF | FF1C | 1A76 | D89A |
| 0000136140 | 477B | 83BB | 04C4 | 4E8B | 8BF8 | FA56 | C803 | 8941 |
| 0000136160 | F84E | 5152 | A29A | 5B7B | 83BB | 08C4 | 76FF | FF20 |
| 0000136200 | 1E76 | 76FF | FFFA | F876 | 5C9A | 697B | 83BB | 08C4 |
| 0000136220 | 76FF | FF20 | 1E76 | D89A | AC7B | 83BB | 04C4 | D88B |
| 0000136240 | 5E03 | 8EF8 | FA46 | 5E89 | 26F8 | 47C6 | 20FF | 468B |
| 0000136260 | 8BF4 | F656 | 0405 | 8900 | F446 | 4BEB | 5EC4 | 26F4 |
| 0000136300 | 478B | 2602 | 070B | 0675 | 46FF | EBF8 | 903A | FF26 |
| 0000136320 | 0277 | FF26 | 5237 | 76FF | 9AF8 | 7BA2 | BBCE | C483 |
| 0000136340 | 8B08 | F446 | 568B | 89F6 | EC46 | 5689 | 83EE | F446 |
| 0000136360 | C404 | EC5E | FF26 | 0277 | FF26 | 9A37 | 7BD8 | BBF3 |
| 0000136400 | C483 | 4004 | 4601 | C4F8 | F45E | 8B26 | 0247 | 0B26 |
| 0000136420 | 7407 | 264D | 77FF | 2602 | 37FF | 76FF | FFFA | F876 |
| 0000136440 | A29A | 157B | 83BC | 08C4 | 468B | 8BF4 | F656 | 4689 |
| 0000136460 | 89EC | EE56 | 4683 | 04F4 | 5EC4 | 26EC | 77FF | 2602 |
| 0000136500 | 37FF | D89A | 8F7B | 83BC | 04C4 | 4601 | C4F8 | F85E |
| 0000136520 | C626 | 2007 | 478D | 8901 | F846 | 468C | EBFA | 90A8 |
| 0000136540 | C02A | 5EC4 | 26F8 | 4788 | 26FF | 0788 | 5EC4 | 2612 |
| 0000136560 | 078B | 8B26 | 0257 | 4689 | 89F8 | FA56 | 5EC4 | 890A |
| 0000136600 | F45E | 468C | 26F6 | 4F8B | 2602 | 0F0B | 1575 | 7E83 |
| 0000136620 | 00FE | 0F75 | C28E | D88B | C626 | 0007 | 8940 | F846 |
| 0000136640 | 5689 | C4FA | F45E | 8B26 | 0247 | 0B26 | 7407 | 263D |
| 0000136660 | 77FF | 2602 | 37FF | 76FF | FFFA | F876 | A29A | FA7B |
| 0000136700 | 83B7 | 08C4 | 468B | 8BF4 | F656 | 4689 | 89EC | EE56 |
| 0000136720 | 4683 | 04F4 | 5EC4 | 26EC | 77FF | 2602 | 37FF | D89A |
| 0000136740 | CF7B | 83BC | 04C4 | 0140 | F846 | B7EB | 7E83 | 00FE |
| 0000136760 | 6074 | 681E | 237A | 76FF | FFFA | F876 | A29A | DB7B |
| 0000137000 | 83BC | 08C4 | 681E | 237A | D89A | 307B | 83B9 | 04C4 |
| 0000137020 | 4601 | 2BF8 | EBF6 | 9027 | 848A | 279E | C88B | F8C0 |
| 0000137040 | 2404 | 040F | C441 | F85E | 46FF | 26F8 | 0788 | E180 |
| 0000137060 | 800F | 41C1 | 5EC4 | FFF8 | F846 | 8826 | 460F | 468B |
| 0000137100 | FFFE | FE4E | [illegible] | D075 | 5EC4 | FFF8 | F846 | C626 |
| 0000137120 | 0007 | 5EC4 | 26F8 | 07C6 | 2B00 | 5EC0 | C95F | 90CB |
| 0000137140 | 8B55 | 83EC | 04EC | 468B | 3306 | 3DD2 | 0000 | 2074 |
| 0000137160 | 3D42 | 0002 | 1A74 | 033D | 7400 | 4215 | 013D | 7400 |
| 0000137200 | 8B0F | 3DD0 | 0004 | 0874 | 16BA | 3300 | E9C0 | C722 |
| 0000137220 | C033 | 5050 | 5250 | 76FF | FF0E | 0C76 | 76FF | FF12 |
| 0000137240 | 1076 | 468D | 16FC | FF50 | 0A76 | 76FF | C708 | AC06 |
| 0000137260 | 0129 | 9A00 | FFFF | 0000 | 06C7 | 29AC | 0000 | C00B |
| 0000137300 | 0374 | 06E9 | 83C7 | 067E | 7502 | 5005 | E80E | C2D7 |
| 0000137320 | 468B | 83FC | 067E | 7500 | 8A05 | 8AE0 | FE46 | E58B |
| 0000137340 | CB5D | 8B55 | 1EEC | C553 | 065E | 76FF | FF0C | 0A76 |
| 0000137360 | 77FF | FF02 | 0E37 | 95E8 | 89C1 | 8907 | 0257 | 1F5B |
| 0000137400 | CA5D | 0008 | 8B55 | 1EEC | C553 | 065E | 078B | 578B |
| 0000137420 | 8B02 | 0A4E | E80E | 0336 | 0789 | 5789 | 5B02 | 5D1F |
| 0000137440 | 06CA | 0000 | 8B55 | 56EC | 8D57 | 0676 | 7E8B | 5510 |
| 0000137460 | 3FE8 | 5D04 | C88B | 768B | 3610 | 98AC | F003 | FE8B |
| 0000137500 | D08C | C08E | C033 | 8BAA | 0E7E | FF32 | 8936 | 361D |
| 0000137520 | 5589 | 3602 | 4D89 | 8B04 | 1046 | 3640 | 4589 | 3606 |
| 0000137540 | 558C | 8C08 | 8BD2 | 5FC7 | 8B5E | 5DE5 | 00CB | 8B55 |
| 0000137560 | 83EC | 0EEC | 468D | 16F6 | 8D50 | F24E | 5116 | 76FF |
| 0000137600 | FF08 | 0676 | 01B9 | 5100 | D49A | A4F7 | 9BF1 | 6EDB |
| 0000137620 | 8BF6 | 5DE5 | 90CB | C9E8 | CBF2 | 5706 | F88B | FB03 |
| 0000137640 | 7F89 | 4F04 | 2D4F | 0016 | 778D | C714 | FE05 | 89FF |
| 0000137660 | 0A7F | 8948 | 8C04 | 8B1F | 8CC6 | 8EDA | 8DC2 | 067F |

THU MAR 14 17:21:24 1991 CLIENT.EXE PAGE 53, LINE 3069

| | | | | | | | | |
|---|---|---|---|---|---|---|---|---|
| 0000137700 | ABFC | 47AB | 3347 | ABC0 | ABAB | 5FAB | C307 | 8B26 |
| 0000137720 | 0245 | C00B | 0975 | 8C26 | 025D | 8926 | EB1D | 0614 |
| 0000137740 | C426 | 0875 | 8C26 | 0E5C | 8926 | 0C5C | 478C | 8912 |
| 0000137760 | 1077 | 2607 | 5D8C | 260A | 5D89 | 2608 | 5D8C | 2606 |
| 0000140000 | 5D89 | C304 | 8B55 | 57EC | 1E56 | 7EC4 | C506 | 0A76 |
| 0000140020 | DF8B | 4E8B | E30E | AC0C | C00A | 0374 | E2AA | 32F8 |
| 0000140040 | F3C0 | 8BAA | 8CC3 | 1FC2 | 5F5E | E58B | CB5D | 63E9 |
| 0000140060 | 0005 | 8B55 | 53EC | 8B51 | 0646 | 568B | 8B08 | 0C5E |
| 0000140100 | 92B9 | D33F | D3EA | 2BEB | 0A46 | D31B | 5B59 | CA5D |
| 0000140120 | 0008 | 8B55 | FFEC | 0A76 | 76FF | FF08 | 0676 | 006A |
| 0000140140 | 389A | 4EBF | C9BF | 90CB | 12C8 | 0000 | 8B56 | 0C76 |
| 0000140160 | 46C7 | 01FA | 8300 | 067E | 7500 | 9A08 | C4BA | BF85 |
| 0000140200 | 4689 | FF06 | 0676 | 468D | 16FC | 8D50 | FA46 | 5016 |
| 0000140220 | 1B9A | 00C0 | 8B00 | 0846 | 568B | 890A | F646 | 5689 |
| 0000140240 | 0BF8 | 75D0 | 8B52 | FA46 | 0305 | 3B00 | 7EC6 | 8B02 |
| 0000140260 | 56F0 | 489A | 977B | 83BF | 02C4 | 4689 | 89F6 | F856 |
| 0000140300 | D00B | 2A75 | EA9A | AA84 | 89BF | F246 | 5689 | C4F4 |
| 0000140320 | F25E | C726 | 0C07 | 9A00 | 84E2 | BFF6 | C28E | D88B |
| 0000140340 | C726 | 0807 | 8B00 | F646 | 568B | E9F8 | 009B | 568B |
| 0000140360 | 89F8 | 0846 | 5689 | 8A0A | 0646 | 4004 | 5EC4 | FFF6 |
| 0000140400 | F646 | 8826 | C407 | F65E | 46FF | 26F6 | 07C6 | C43A |
| 0000140420 | F65E | 46FF | 26F6 | 07C6 | 8B5C | FA46 | 0305 | 3B00 |
| 0000140440 | 76C6 | 9A19 | 84EA | C029 | 4689 | 89EE | F056 | 5EC4 |
| 0000140460 | 26EE | 07C7 | 0022 | C02B | EB99 | 904E | 76FF | FF06 |
| 0000140500 | F876 | 76FF | 8DF6 | FA46 | 5016 | FF9A | 00FF | 8900 |
| 0000140520 | FE46 | C00B | 2A74 | EA9A | 3C84 | 89C0 | EE46 | 5689 |
| 0000140540 | C4F0 | EE5E | C726 | 0D07 | 9A00 | 84E2 | BE5B | 4689 |
| 0000140560 | 89F2 | F456 | 468B | C4FE | F25E | 8926 | EB07 | 90B7 |
| 0000140600 | 468B | 8BF6 | F856 | 032D | 5E00 | CBC9 | 8B55 | 1EEC |
| 0000140620 | C553 | 065E | 76FF | FF0C | 0A76 | 77FF | FF02 | 0E37 |
| 0000140640 | 0BE8 | 8900 | 0257 | 0789 | 1F5B | CA5D | 0008 | 8B55 |
| 0000140660 | 53EC | 3357 | 8BFF | 0846 | C00B | 117D | 8B47 | 0656 |
| 0000140700 | D8F7 | DAF7 | 001D | 8900 | 0846 | 5689 | 8B06 | 0C46 |
| 0000140720 | C00B | 107D | 568B | F70A | F7D8 | 1DDA | 0000 | 4689 |
| 0000140740 | 890C | 0A56 | C00B | 1875 | 4E8B | 8B0A | 0846 | D233 |
| 0000140760 | F1F7 | 468B | F706 | 8BF1 | 33C2 | 4FD2 | 4379 | 48EB |
| 0000141000 | D88B | 4E8B | 8B0A | 0856 | 468B | D106 | D1EB | D1D9 |
| 0000141020 | D1EA | 0BD8 | 75DB | F7F4 | 8BF1 | F7C8 | 0C66 | F791 |
| 0000141040 | 0A66 | D103 | 0C72 | 563B | 7708 | 7207 | 3B0B | 0646 |
| 0000141060 | 0676 | 462B | 1B0A | 0C56 | 462B | 1B06 | 0856 | 794F |
| 0000141100 | F707 | F7DA | 83D8 | 00DA | 5B5F | CA5D | 0008 | ED32 |
| 0000141120 | 06E3 | E0D1 | D2D1 | FAE2 | 00CB | 8B55 | 53EC | 8B56 |
| 0000141140 | 0C46 | C00B | 1575 | 4E8B | 8B0A | 0846 | D233 | F1F7 |
| 0000141160 | D88B | 468B | F706 | 8BF1 | EBD3 | 8B38 | 8BC8 | 0A5E |
| 0000141200 | 568B | 8B08 | 0646 | E9D1 | DBD1 | EAD1 | D8D1 | C90B |
| 0000141220 | F475 | F3F7 | F08B | 66F7 | 910C | 468B | F70A | 03E6 |
| 0000141240 | 72D1 | 3B0C | 0856 | 0777 | 0672 | 463B | 7606 | 4E01 |
| 0000141260 | D233 | 5E96 | 5D5B | 08CA | 0000 | 8B55 | 53EC | 468B |
| 0000141300 | 0B0C | 75C0 | 8315 | 0A4E | 468B | 3308 | F7D2 | 8BF1 |
| 0000141320 | 0646 | F1F7 | C28B | D233 | 45EB | C88B | 5E8B | 8B0A |
| 0000141340 | 0856 | 468B | D106 | D1E9 | D1DB | D1EA | 0BD8 | 75C9 |
| 0000141360 | F7F4 | 8BF3 | F7C8 | 0C66 | F791 | 0A66 | D103 | 0C72 |
| 0000141400 | 563B | 7708 | 7207 | 3B0B | 0646 | 0676 | 462B | 1B0A |
| 0000141420 | 0C56 | 462B | 1B06 | 0856 | DAF7 | D8F7 | DA83 | 5B00 |
| 0000141440 | CA5D | 0008 | FC66 | FFFF | FFFF | FFFF | 3FFE | CCCD |
| 0000141460 | CCCC | CCCC | CCCC | 3FFB | 768B | C7EC | 0104 | 3330 |
| 0000141500 | 8BC0 | 40D0 | 20B3 | 1F07 | E58B | C35D | D20B | 0A75 |
| 0000141520 | F983 | 74F8 | 8017 | 0FE1 | 0D74 | D1BE | F62C | 08C1 |
| 0000141540 | 0D75 | CABE | EB2C | BE08 | 2CD8 | 03EB | DEBE | E92C |

THU MAR 14 17:21:24 1991 CLIENT.EXE PAGE 54, LINE 3128

| | | | | | | | | |
|---|---|---|---|---|---|---|---|---|
| 0000141560 | 0162 | 8B55 | 83EC | 14EC | C71E | FE46 | 1332 | D38C |
| 0000141600 | DB8E | 7E89 | 06EC | D88C | C08E | 8DFC | EE7E | B957 |
| 0000141620 | 0004 | A5F3 | 8B5E | 064C | 6480 | 7F07 | 20B3 | 048B |
| 0000141640 | 440B | 0B02 | 0444 | D08B | 440B | 7406 | 0B8B | 79C9 |
| 0000141660 | B302 | F72D | F7D1 | F0C1 | F77F | 74D1 | 538F | D99B |
| 0000141700 | FC7E | 9B90 | 8A50 | FC46 | 4688 | 58FE | D99B | FE6E |
| 0000141720 | DD9B | 9B04 | C0D9 | DB9B | 903C | 339B | 8DFF | F576 |
| 0000141740 | 8AAC | ADF8 | C88B | 10BA | F74D | 91E2 | 4DB0 | E4F6 |
| 0000141760 | C803 | D713 | 9AB0 | E7F6 | C803 | FA13 | E981 | 12F4 |
| 0000142000 | DF81 | 1343 | F757 | 8DDF | EE76 | 95E8 | BB07 | C1F4 |
| 0000142020 | 9B5F | DB2E | 9B2F | D9D8 | DD9B | FA7E | 9B90 | 46F6 |
| 0000142040 | 41FB | 0B74 | BB47 | C1FE | 2E9B | 2FDB | DE9B | 57C9 |
| 0000142060 | 9B55 | 3CDB | D99B | FC6E | 9B90 | 97AD | 95AD | 92AD |
| 0000142100 | 93AD | 91AD | E981 | 3FFE | D9F7 | F78B | C033 | 0CE3 |
| 0000142120 | EBD1 | DAD1 | DDD1 | DED1 | DCD0 | F4E2 | D681 | 039A |
| 0000142140 | E913 | D113 | D913 | E987 | 555D | 7E8B | 47EC | E987 |
| 0000142160 | 10B9 | 3200 | 51C0 | 5253 | 5655 | D050 | D1E4 | D1D6 |
| 0000142200 | D1D5 | D1D2 | D0D3 | D0D0 | D1E4 | D1D6 | D1D5 | D1D2 |
| 0000142220 | D0D3 | 59D0 | E512 | 1359 | 59F1 | E913 | 1359 | 59D1 |
| 0000142240 | D913 | 0014 | E4D0 | D6D1 | D5D1 | D2D1 | D3D1 | D0D0 |
| 0000142260 | 0459 | 1630 | AA07 | BBE2 | 494F | 30B0 | F3FD | FCAE |
| 0000142300 | C183 | 5D12 | 768B | 88EC | B80C | 0001 | 5B5A | 1F07 |
| 0000142320 | E58B | C35D | 468B | 8EEA | 8AD8 | 320C | 41ED | 7E8B |
| 0000142340 | 8CEC | 8ED0 | F3C0 | 8BA5 | EC76 | 01BA | 0700 | C033 |
| 0000142360 | 8B1F | 5DE5 | 00C3 | 8B55 | 83EC | 64EC | 5756 | 331E |
| 0000142400 | 8BDB | 1056 | 01B8 | E800 | 002B | 763B | 730C | 8005 |
| 0000142420 | 40C9 | 0D89 | 5F1F | 8B5E | 5DE5 | 55CB | EC8B | EC83 |
| 0000142440 | 5664 | 1E57 | C033 | D233 | 5E8B | E810 | 0007 | 5F1F |
| 0000142460 | 8B5E | 5DE5 | FCCB | 5055 | 006A | 006A | D08C | C08E |
| 0000142500 | D88E | 4E8B | 830C | 64F9 | 0676 | 40B1 | F633 | 2CEB |
| 0000142520 | 76C5 | 8D08 | 9C7E | A4F3 | D88E | 4E8B | 8D0C | 9C76 |
| 0000142540 | 7689 | 8B08 | 0E46 | 4E01 | 8B08 | 067E | C783 | E808 |
| 0000142560 | 00A2 | C483 | 5D06 | 762B | 0308 | 0C76 | 7E8B | 3606 |
| 0000142600 | 0D89 | 8936 | 0275 | 8936 | 0445 | 8936 | 065D | C78B |
| 0000142620 | D28C | 00C3 | 8B55 | 57EC | 1E56 | 76C5 | 3306 | 99C0 |
| 0000142640 | DB33 | 3CAC | 7420 | 3CFB | 7409 | 50F7 | 2D3C | 0474 |
| 0000142660 | 2B3C | 0175 | 3CAC | 7739 | 2C1F | 7230 | D11B | D1E3 |
| 0000142700 | 8BD2 | 8BCB | D1FA | D1E3 | D1D2 | D1E3 | 03D2 | 13D9 |
| 0000142720 | 03D7 | 83D8 | 00D2 | DCEB | 3C58 | 932D | 0775 | D8F7 |
| 0000142740 | D283 | F700 | 1FDA | 5F5E | CB5D | EC83 | 8B06 | 16C4 |
| 0000142760 | 4050 | 1640 | 9A50 | FFFF | 0000 | 8358 | 04C4 | 55CB |
| 0000143000 | EC8B | 76FF | 9A06 | FFFF | 0000 | C00B | FFB8 | 75FF |
| 0000143020 | 4001 | CB5D | 8B55 | 83EC | 34EC | 46C7 | 32E8 | C713 |
| 0000143040 | CE46 | FC00 | 46C7 | FFD0 | C7FF | D246 | FFFF | 46C7 |
| 0000143060 | FFD4 | C7FF | D646 | 43FE | D99B | EA7E | 9B90 | 8A50 |
| 0000143100 | EA46 | 4688 | 58E8 | D99B | E86E | 89FC | E47E | 7689 |
| 0000143120 | 03E2 | 89CE | E04E | 4689 | 89D8 | CC56 | C933 | DB0B |
| 0000143140 | 4475 | 46C7 | 0ADA | E800 | 0087 | 4E88 | 8BE6 | E276 |
| 0000143160 | 46C6 | 00EF | BAE8 | 0A00 | E64E | 46F7 | FFD8 | 75FF |
| 0000143200 | F706 | 42C1 | 7418 | 8003 | 30C9 | 468B | 8BFA | FC5E |
| 0000143220 | 6E8A | 83EF | DE7E | 7500 | 8003 | 02CD | D99B | EA6E |
| 0000143240 | 9B90 | E58B | C35D | 5E89 | E8DA | 0262 | 4E89 | 8BE6 |
| 0000143260 | E47E | DF9B | FA46 | DD9B | 8B1D | E64E | BCEB | 8058 |
| 0000143300 | 30C9 | 26EB | C980 | 5830 | 759E | F717 | F7DB | 83DF |
| 0000143320 | 00DB | D38B | D70B | 1274 | C980 | F610 | 80C7 | 0A75 |
| 0000143340 | 05EB | C7F6 | 7480 | 8003 | 20C9 | 7E89 | 89FA | FC5E |
| 0000143360 | E8C3 | 0293 | 509F | C933 | D98B | 9EE8 | 7202 | 8BBF |
| 0000143400 | E8F8 | 0297 | C172 | D38B | 7E89 | D1FE | D1E7 | D0D3 |
| 0000143420 | D1D5 | D1E7 | D0D3 | 03D5 | FE7E | DA13 | D580 | D100 |

THU MAR 14 17:21:24 1991 CLIENT.EXE PAGE 55, LINE 3187

| | | | | | | | | |
|---|---|---|---|---|---|---|---|---|
| 0000143440 | D1E7 | D0D3 | 03D5 | 83F8 | 00D3 | D580 | 7400 | EBD2 |
| 0000143460 | 3393 | 89C9 | DE4E | 46C7 | EEDC | E8FF | 0249 | 0375 |
| 0000143500 | CD80 | E880 | 0106 | C932 | DB33 | AFE8 | 7402 | 4E6B |
| 0000143520 | 443C | 3E74 | 453C | 3174 | 7E80 | 00G8 | 5C74 | 2B3C |
| 0000143540 | 0474 | 2D3C | 5475 | EB4E | 8023 | 047E | 7400 | 4616 |
| 0000143560 | 89E8 | 4E02 | 3C4E | 742B | 3C0C | 742D | 3C08 | 7739 |
| 0000143600 | 3C05 | 7230 | C301 | EB58 | E831 | FFDD | C981 | 0402 |
| 0000143620 | 06EB | D4E8 | 80FF | 0EC9 | 46C7 | 00D8 | 4600 | E6E8 |
| 0000143640 | 9F01 | E850 | 01C4 | C5F6 | 7502 | 8009 | 047E | 7500 |
| 0000143660 | 8003 | 40C9 | 9E58 | 0275 | DBF7 | C5F6 | 7401 | 800B |
| 0000143700 | 7FE5 | DB33 | 5E89 | 89DC | D85E | FB8B | 7E03 | 03DC |
| 0000143720 | D87E | C5F6 | 7510 | 2B03 | CC7E | FF81 | 013A | 037E |
| 0000143740 | 3ABF | 8101 | A6FF | 7DFE | BF03 | FEA6 | E855 | 03B2 |
| 0000143760 | 8B5D | E47E | 7E83 | 07DE | 0376 | C980 | 9B08 | C0D9 |
| 0000144000 | D99B | 9BE1 | 6EDB | 9BCE | D9DE | DD9B | EC7E | 9B90 |
| 0000144020 | 46F6 | 41ED | 1F75 | DB9B | 9BE2 | 1DDD | DD9B | EC7E |
| 0000144040 | 9B90 | 46F6 | 10EC | 0474 | 4E80 | 01EF | 8051 | 80E5 |
| 0000144060 | 6D08 | 5907 | 8BC3 | E47E | DD9B | 57D8 | C033 | ABAB |
| 0000144100 | 8AAB | 0DE5 | 7FF0 | 5FAB | C98D | C301 | FF33 | 7E89 |
| 0000144120 | 8BFE | 8BDF | 8BD7 | E8C7 | 0178 | 3972 | C00A | 0875 |
| 0000144140 | 4EFF | EBDC | E8F2 | 016A | E850 | 0046 | 0358 | 83D0 |
| 0000144160 | 00D3 | 5683 | 00FE | D783 | FE00 | 80C1 | 12F9 | E572 |
| 0000144200 | 4FE8 | 7301 | 80FB | FEE5 | 3EB8 | 0B40 | 78FF | 480B |
| 0000144220 | 38E8 | EB00 | 80F6 | 01CD | C033 | 8B56 | 8DF7 | F07E |
| 0000144240 | AB92 | AB93 | 4687 | ABFE | AB96 | AB92 | 9B5E | 6EDB |
| 0000144260 | C3F0 | FF57 | FE76 | 8B53 | E8C2 | 000F | 0CE8 | 0300 |
| 0000144300 | 58D0 | D813 | 1158 | FE46 | 1358 | D1F8 | D1E2 | D1D3 |
| 0000144320 | FE56 | D7D1 | 58C3 | C980 | EB40 | 582C | C980 | 3230 |
| 0000144340 | 58ED | 759E | 801A | 80CD | DBF7 | DFF7 | DB83 | 8B00 |
| 0000144360 | 0BD3 | 74D7 | 8012 | 10C9 | C7F6 | 7580 | EB0A | F605 |
| 0000144400 | 80C7 | 0374 | C980 | 8920 | FA7E | 5E89 | C3FC | 76E8 |
| 0000144420 | 9F00 | 3350 | 8BC9 | E8D9 | 0081 | B972 | F88B | 7AE8 |
| 0000144440 | 7200 | 50BC | C78B | 66F7 | 8BDA | 89F8 | FE56 | C38B |
| 0000144460 | 66F7 | 0BDA | 75D2 | 8BA4 | 03D8 | FE5E | 9D72 | 0358 |
| 0000144500 | 83F8 | 00D3 | D873 | 94EB | DB9B | 9BE2 | 1DDD | DD9B |
| 0000144520 | EC7E | 9B90 | 46F6 | 10EC | 0474 | 4E80 | 01EF | 8051 |
| 0000144540 | 80E5 | 6D08 | 5907 | BBC3 | 3FFF | 2EE8 | 7200 | 8117 |
| 0000144560 | CCFB | 770C | 80F2 | 02CD | E3D1 | C303 | E3D1 | E3D1 |
| 0000144600 | D803 | E378 | E4EB | E8C3 | 0072 | 0974 | 2B3C | 0574 |
| 0000144620 | 2D3C | 0374 | 0C4E | C3FF | F94E | E8C3 | 005E | F974 |
| 0000144640 | 302C | F472 | 093C | 067E | 112C | EC72 | 0A04 | 463A |
| 0000144660 | 7DDA | 32E5 | C3E4 | 4E46 | C033 | CD80 | F901 | F6C3 |
| 0000144700 | 28C5 | F375 | 4E80 | 80E6 | F0EB | C5F6 | 7510 | 80F0 |
| 0000144720 | 10CD | C5F6 | 7501 | E8DF | 0022 | DE74 | 2E3C | EA74 |
| 0000144740 | 302C | D372 | 093C | CF77 | 08B4 | C5F6 | 7510 | FF05 |
| 0000144760 | DC46 | 20B4 | EC0A | 46FF | 32DE | C3E4 | 763B | 73E0 |
| 0000145000 | AC22 | 7E80 | 0006 | 1074 | 203C | F074 | 093C | EC74 |
| 0000145020 | 0A3C | E874 | 0D3C | E474 | 613C | 0672 | 7A3C | 0277 |
| 0000145040 | 5F24 | 32C3 | C3C0 | 0000 | 0000 | 0000 | A000 | 4002 |
| 0000145060 | 0000 | 0000 | 0000 | C800 | 4005 | 0000 | 0000 | 0000 |
| 0000145100 | FA00 | 4008 | 0000 | 0000 | 0000 | 9C40 | 400C | 0000 |
| 0000145120 | 0000 | 0000 | C350 | 400F | 0000 | 0000 | 0000 | F424 |
| 0000145140 | 4012 | 0000 | 0000 | 8000 | 9896 | 4016 | 0000 | 0000 |
| 0000145160 | 2000 | BEBC | 4019 | 0000 | 0400 | C9BF | 8E1B | 4034 |
| 0000145200 | A100 | CCED | 1BCE | D3C2 | 404E | B59E | 2B70 | ADA8 |
| 0000145220 | 9DC5 | 4069 | 25FD | 1AE5 | 4F8E | EB19 | 4083 | 95D7 |
| 0000145240 | 0E43 | 8D05 | AF29 | 409E | 44A0 | 81ED | 8F12 | 8281 |
| 0000145260 | 40B9 | A6D5 | FFCF | 1F49 | C278 | 40D3 | 8CE0 | 80E9 |
| 0000145300 | 47C9 | 93BA | 41A8 | 556B | 3927 | F78D | E070 | 427C |

THU MAR 14 17:21:24 1991 CLIENT.EXE PAGE 56, LINE 3246

| | | | | | | | | |
|---|---|---|---|---|---|---|---|---|
| 0000145320 | DE8E | 9DF9 | EBFB | AA7E | 4351 | E376 | F2CC | 2F29 |
| 0000145340 | 8184 | 4426 | CCCD | CCCC | CCCC | CCCC | 3FFB | D70A |
| 0000145360 | 70A3 | 0A3D | A3D7 | 3FF8 | DF3B | 8D4F | 6E97 | 8312 |
| 0000145400 | 3FF5 | 652C | E219 | 1758 | D1B7 | 3FF1 | 8423 | 1B47 |
| 0000145420 | AC47 | A7C5 | 3FEE | 69B6 | AF6C | BD05 | 8637 | 3FEB |
| 0000145440 | 42BC | E57A | 94D5 | D6BF | 3FE7 | CEFD | 8461 | 7711 |
| 0000145460 | ABCC | 3FE4 | E15B | C44D | 94BE | E695 | 3FC9 | 3B53 |
| 0000145500 | 4475 | 14CD | 9ABE | 3FAF | 94BA | 4539 | 1EAD | CFB1 |
| 0000145520 | 3F94 | E2C6 | BABC | 313B | 8B61 | 3F7A | C159 | B17E |
| 0000145540 | 7C53 | BB12 | 3F5F | 8D2F | BE06 | 8592 | FB15 | 3F44 |
| 0000145560 | E9A5 | A539 | EA27 | A87F | 3F2A | E4A1 | 64BC | 467C |
| 0000145600 | DDD0 | 3E55 | CC06 | 5423 | 8377 | 91FF | 3D81 | 193A |
| 0000145620 | 637A | 4325 | C031 | 3CAC | 38D1 | 4782 | B897 | FD00 |
| 0000145640 | 3BD7 | A6BB | 0BC8 | 79FF | BB05 | C964 | DFF7 | 5F57 |
| 0000145660 | C381 | 0046 | FF0B | 2774 | C78B | EFD1 | EFD1 | EFD1 |
| 0000145700 | 2557 | 0007 | E974 | D053 | 8AE0 | D0E0 | D0E0 | 02E0 |
| 0000145720 | 32C4 | 03E4 | 9BD8 | DB2E | 9B2F | C9DE | EB5B | C3D0 |
| 0000145740 | 534D | 4D45 | 3738 | 0006 | 6667 | 2E77 | 2E2E | 5747 |
| 0000145760 | CB2A | CCEB | CCAF | CD0C | D1FC | D215 | D237 | D27B |
| 0000146000 | D219 | CCFA | CD14 | CD53 | CD58 | FB83 | 770C | D13D |
| 0000146020 | 1EE3 | DB0B | 2F74 | 5750 | B806 | A679 | D88E | 3EC4 |
| 0000146040 | 2360 | 8B26 | 3D05 | 0020 | 0976 | E850 | 0199 | D158 |
| 0000146060 | EBED | D107 | BFE0 | 2C52 | F803 | 1D8E | 5F07 | D88C |
| 0000146100 | C00B | 7458 | 2E05 | 97FF | CAC0 | CB1F | FF0D | 8BFF |
| 0000146120 | EBD0 | 4EF8 | 384F | 3D37 | 0A0D | EAB8 | 8ECA | C4D8 |
| 0000146140 | 603E | 2623 | 058B | 203D | 7600 | 5009 | 58E8 | 5801 |
| 0000146160 | E0D1 | 07EB | E0D1 | 52BF | 032C | 3DF8 | 0002 | 1175 |
| 0000146200 | FFB8 | 89FF | 8E05 | 8ED8 | EBC0 | 901C | FDB8 | F9FF |
| 0000146220 | 68C3 | 029E | 571E | 006A | FF9A | 00FF | 0B00 | 75C0 |
| 0000146240 | 8BEB | 8E3D | 8EDF | BAC7 | 029E | C033 | FF33 | CA8B |
| 0000146260 | E9D1 | ABF3 | 41BA | BF01 | 0081 | 3E89 | 000E | 0CB9 |
| 0000146300 | 9200 | C72B | F799 | F7F1 | 03E1 | 2BC7 | A3C1 | 0012 |
| 0000146320 | 1E16 | 30B8 | 5000 | FF9A | 00FF | 8C00 | 3DD8 | CB51 |
| 0000146340 | 1074 | B81E | CBAE | D88E | 04A0 | 1F00 | 04A2 | E900 |
| 0000146360 | 00B9 | 0B1E | 74F6 | 8E72 | 0EC6 | 331F | FCFF | 8026 |
| 0000146400 | 003D | 6574 | 05B9 | BE00 | CB23 | A6F3 | 0B74 | FFB9 |
| 0000146420 | 327F | F2C0 | 74AE | EBE7 | B950 | 7FFF | 20B0 | AEF3 |
| 0000146440 | 264F | 158A | D20A | 3874 | C033 | FFB9 | 8B7F | F2DF |
| 0000146460 | 4FAE | FB2B | CF8B | FB8B | 8B50 | BBC4 | 0001 | 0653 |
| 0000146500 | 5157 | 5016 | 0F9A | 0096 | 8B00 | BBC4 | 0001 | 0E53 |
| 0000146520 | 28BF | 57CB | 02BB | 5300 | 5016 | 159A | 00CC | 5B00 |
| 0000146540 | C61F | 0406 | 0000 | 2DEB | 1F90 | 681E | 0004 | 036A |
| 0000146560 | 006A | FF9A | 00FF | 8000 | 043E | 0000 | 1774 | 06EB |
| 0000146600 | B890 | FFFE | C3F9 | 106A | 680E | CD76 | 681E | 0020 |
| 0000146620 | 1F9A | 0080 | 8000 | 043E | 0000 | 0F75 | 076A | 680E |
| 0000146640 | D6D9 | 681E | 001C | 619A | 00CC | E800 | 006D | 32B8 |
| 0000146660 | E813 | 0578 | C033 | 00A3 | A300 | 0002 | 06C7 | 007C |
| 0000146700 | 0001 | 04A0 | 9800 | 53C3 | 5251 | 2BBB | 8ECB | 9ADB |
| 0000146720 | BE66 | A719 | DA8E | F88B | C783 | 5A06 | 5B59 | FFC3 |
| 0000146740 | 3036 | 9A00 | FFFF | 0000 | D88C | B43D | 74CB | 1E06 |
| 0000146760 | B49A | 00CC | B800 | CC9B | D88E | 3EC4 | 2360 | 8B26 |
| 0000147000 | 3D05 | 0020 | 0976 | E850 | FFBD | D158 | EBE0 | D107 |
| 0000147020 | BFE0 | 2C52 | F803 | 05C7 | 0000 | 80C3 | 043E | 0000 |
| 0000147040 | 0274 | E3DB | 0EA1 | A300 | 0010 | C033 | 063A | 0004 |
| 0000147060 | 0374 | DB9B | A3E2 | 000C | 08A3 | C300 | 00A3 | 8900 |
| 0000147100 | 0216 | C300 | D233 | 3E80 | 0004 | 7400 | 8328 | 0EEC |
| 0000147120 | DC8B | 369B | 37D9 | 369B | 2FD9 | 8B36 | 0447 | C483 |
| 0000147140 | B90E | 0008 | D88B | E8D1 | E8D1 | E383 | 8303 | 03FB |
| 0000147160 | 0174 | E242 | A1EF | 0010 | 062B | 000E | 0CB3 | F3F6 |

THU MAR 14 17:21:24 1991 CLIENT.EXE PAGE 57, LINE 3305

| | | | | | | | | |
|---|---|---|---|---|---|---|---|---|
| 0000147200 | C203 | ADC3 | 0004 | C398 | 7CA3 | C300 | 0E80 | 0015 |
| 0000147220 | 8002 | 043E | 0000 | 0374 | CC80 | C302 | 0E80 | 0015 |
| 0000147240 | C304 | 43CF | 19EB | 5550 | EC83 | 8B1C | 9BEC | 76D9 |
| 0000147260 | B800 | CD72 | 4687 | 8920 | 0246 | 1E53 | 5EC5 | 8B06 |
| 0000147300 | 0407 | 7328 | 86DE | 89C4 | 0846 | 0657 | C6B8 | 8ECC |
| 0000147320 | C4D8 | 603E | 2623 | 058B | 203D | 7600 | 5009 | E6E8 |
| 0000147340 | 58FE | E0D1 | 07EB | E0D1 | 52BF | 032C | 8EF8 | 071D |
| 0000147360 | 8A5F | 0246 | FF32 | 3E83 | 007C | 7500 | 8003 | 01CF |
| 0000147400 | C7F6 | 7501 | A80A | 7401 | 8006 | 01CF | 84E9 | A800 |
| 0000147420 | 7402 | E903 | 01F9 | C7F6 | 7504 | A80C | 7404 | 8008 |
| 0000147440 | 04CF | F8E8 | EB02 | F6D9 | 08C7 | DA75 | 08A8 | 0674 |
| 0000147460 | CF80 | E908 | 02D1 | 1E8A | 0006 | CB80 | 80C0 | FDE3 |
| 0000147500 | D3F6 | C322 | 01A8 | 1F74 | 8B50 | 0846 | E480 | 3D07 |
| 0000147520 | 01FA | 0575 | 0C58 | EB80 | 8B0E | 0846 | 3825 | 3D03 |
| 0000147540 | 010D | 7558 | 3402 | 9B01 | E2DB | D99B | 006E | 0609 |
| 0000147560 | 0008 | 5B1F | C483 | 5D1C | FFA9 | 75BF | 5802 | 50C3 |
| 0000147600 | 8B53 | 36DC | 478B | 3604 | 4789 | 5B06 | 8358 | 02C4 |
| 0000147620 | E3E9 | 5602 | 5153 | 5752 | 5E8B | 8B04 | 024E | D3F7 |
| 0000147640 | CD8A | E180 | D038 | D0E9 | D3E9 | F6CB | C0C7 | 5174 |
| 0000147660 | 568B | 8108 | E0F2 | F601 | C0C2 | 2075 | C2F7 | 0120 |
| 0000147700 | 3F75 | C2F6 | 7510 | F608 | 08C2 | 1675 | 33EB | 8090 |
| 0000147720 | 12FA | 0E74 | FA80 | 7414 | EB09 | 9026 | C2F7 | 0110 |
| 0000147740 | 1F75 | E780 | 8B3F | 1036 | 3B00 | 1236 | 7500 | E803 |
| 0000147760 | FE9A | C683 | 890C | 1036 | 9B00 | F6D9 | 3CDB | 01E9 |
| 0000150000 | F601 | 03C3 | 0374 | 49EB | 8B90 | 0856 | F281 | 01E0 |
| 0000150020 | C2F6 | 74C0 | F709 | 10C2 | 7501 | EB03 | 9034 | DB0B |
| 0000150040 | 0674 | BCE8 | EB00 | 902A | 36BB | 0010 | 363B | 000E |
| 0000150060 | 0375 | BAE9 | 8000 | 03CB | D99B | DBF7 | 8B2C | 1036 |
| 0000150100 | 3B00 | 0E36 | 7500 | E803 | FE52 | EE83 | 890C | 1036 |
| 0000150120 | F600 | 0CC3 | 4D75 | F38B | E683 | 0BF0 | 74F6 | DB18 |
| 0000150140 | 243E | D100 | D1EB | E8EB | 0077 | 2EDB | 0024 | E3D1 |
| 0000150160 | E3D1 | CB80 | EB03 | 8B2C | 1036 | 3B00 | 0E36 | 7400 |
| 0000150200 | 8022 | 0CCB | D99B | 9BF7 | F7D9 | 2CDB | D99B | 8BF6 |
| 0000150220 | 1036 | 3B00 | 0E36 | 7500 | E803 | FE00 | EE83 | 890C |
| 0000150240 | 1036 | 8B00 | 0856 | F281 | 01E0 | C2F6 | 75C0 | F70B |
| 0000150260 | 20C2 | 7501 | F619 | 10C2 | 0375 | 46EB | 8A90 | 80CA |
| 0000150300 | 0FE1 | C4BA | D350 | 79E2 | F6F1 | 0CC3 | EC75 | E283 |
| 0000150320 | D007 | 8BE2 | 8BCA | D3D3 | F6CA | 03C2 | 2475 | 0FEB |
| 0000150340 | D190 | D1CB | 9BCB | F7D9 | C3F7 | 0003 | F374 | 80C3 |
| 0000150360 | 04CC | 46C6 | 0002 | D99B | 0066 | 5A5F | 5B59 | E95E |
| 0000150400 | FE6C | FE24 | 16E8 | 5F01 | 595A | 5E5B | F1E9 | 80FD |
| 0000150420 | 080E | 0200 | 8B51 | 084E | E180 | 80C0 | C0F9 | 6C74 |
| 0000150440 | 4E8B | 8108 | 38E1 | 8303 | 08F9 | 0D74 | F983 | 7410 |
| 0000150460 | 8008 | 30E1 | F983 | 7530 | F653 | C0C7 | 1C74 | E780 |
| 0000150500 | 8B3F | 1036 | 3B00 | 1236 | 7500 | E803 | FD3E | C683 |
| 0000150520 | 890C | 1036 | 9B00 | F6D9 | 3CDB | 4E8B | 5108 | E181 |
| 0000150540 | 0400 | C181 | 0104 | 4E89 | E808 | 00B9 | 5AE8 | 5900 |
| 0000150560 | E183 | 8038 | 08F9 | 0874 | F980 | 7410 | 802E | 08F1 |
| 0000150600 | C981 | 06C1 | 4E89 | E808 | 0093 | 37EB | 4E8B | 8108 |
| 0000150620 | 38E1 | 8107 | 28F9 | 7403 | 810D | 38E1 | 8101 | 00F9 |
| 0000150640 | 7401 | E803 | 0077 | 20E8 | EB00 | 8018 | 40CC | DB9B |
| 0000150660 | D9E2 | D8C9 | D9D1 | DDC9 | 9BD8 | 3EDD | 0014 | 0A9B |
| 0000150700 | 1406 | 5900 | FD24 | 37E9 | DBFD | 127E | 8B9B | 1A4E |
| 0000150720 | C1F7 | 7FFF | 1E74 | 46F6 | 8019 | 1475 | 6EDF | DB12 |
| 0000150740 | 127E | 839B | 1A7E | 7400 | 810B | 3EE9 | 0140 | 1A4E |
| 0000150760 | 6EDB | C312 | C933 | 4E89 | 8912 | 144E | 4E89 | 8916 |
| 0000151000 | 184E | 4E89 | EB1A | 50E9 | 468B | 2508 | 01C0 | F480 |
| 0000151020 | 3D01 | 00C0 | 7358 | E803 | 0003 | E3E9 | F6FC | 40C4 |
| 0000151040 | 5375 | CC80 | 1E40 | 5657 | 5351 | DB9B | 8BE2 | 303E |

THU MAR 14 17:21:24 1991 CLIENT.EXE PAGE 58, LINE 3364

| | | | | | | | | |
|---|---|---|---|---|---|---|---|---|
| 0000151060 | 8B00 | 084E | D98B | E580 | 8007 | D8CD | E380 | 80C0 |
| 0000151100 | C0F3 | 0974 | E180 | 8038 | 04C9 | 76C5 | 860A | 89E9 |
| 0000151120 | 147E | 7E8D | 8916 | 127E | 46C6 | 9B16 | 4E89 | C617 |
| 0000151140 | 1946 | FFCB | 125E | 595B | 5F5E | 9B1F | 3EDD | 0014 |
| 0000151160 | 0A9B | 1406 | C300 | 531E | 8BB3 | C4F6 | 7504 | B338 |
| 0000151200 | F68A | 02C4 | 3175 | 88B3 | 80A8 | 2B75 | 89B3 | C4F6 |
| 0000151220 | 7501 | B324 | A881 | 7501 | B31E | A883 | 7504 | B318 |
| 0000151240 | A884 | 7508 | B312 | A885 | 7510 | B30C | A886 | 7520 |
| 0000151260 | B306 | A887 | 7540 | 5700 | B806 | CD9D | D88E | 3EC4 |
| 0000151300 | 2360 | 8B26 | 3D05 | 0020 | 0976 | E850 | FAF9 | D158 |
| 0000151320 | EBE0 | D107 | BFE0 | 2C52 | F803 | 1D8E | 5F07 | 8AB8 |
| 0000151340 | 8ED1 | 6AD8 | 9A01 | 9838 | CCA2 | C483 | B802 | CCBB |
| 0000151360 | D88E | 00A1 | 0B00 | 0206 | 7500 | B80D | 0001 | 9350 |
| 0000151400 | E432 | 9A50 | 80E8 | 0000 | FF93 | 0236 | FF00 | 0036 |
| 0000151420 | BB00 | D1AF | D88E | 016A | 489A | B898 | 83D1 | 02C4 |
| 0000151440 | DC8B | FF36 | 831F | 04C4 | 1F5B | CF58 | 06A3 | 2500 |
| 0000151460 | FF3C | 3E80 | 0004 | 7400 | A308 | 0018 | D99B | 182E |
| 0000151500 | A300 | 000A | A1C3 | 0006 | 33C3 | 3AC0 | 0406 | 7400 |
| 0000151520 | 9B0B | 3EDD | 0014 | A09B | 0014 | 3F24 | 060B | 0008 |
| 0000151540 | FF25 | A31F | 0008 | 25C3 | 0C00 | 3E80 | 0004 | 7400 |
| 0000151560 | 9B1F | 3ED9 | 000A | 8B9B | 0A0E | 8000 | F3E5 | C10B |
| 0000151600 | 18A3 | 9B00 | 2ED9 | 0018 | FCD9 | D99B | 0A2E | C300 |
| 0000151620 | 0E8B | 000A | 8051 | F3E5 | E50A | 2688 | 000B | E855 |
| 0000151640 | 1505 | 8F5D | 0A06 | E800 | 0066 | 25C3 | 0C00 | 3E80 |
| 0000151660 | 0004 | 7400 | 9B28 | 3ED9 | 000A | 8B9B | 0A0E | 8000 |
| 0000151700 | F3E5 | C10B | 18A3 | 9B00 | 2ED9 | 0018 | 1EDB | 0018 |
| 0000151720 | D99B | 0A2E | A100 | 0018 | 168B | 001A | 8BC3 | 0A0E |
| 0000151740 | 5100 | E580 | 0AF3 | 88E5 | 0B26 | 5500 | 80E8 | 5D13 |
| 0000151760 | C28B | D38B | 19E8 | 8B00 | 1036 | 3B00 | 0E36 | 7500 |
| 0000152000 | E803 | FA98 | EE83 | 890C | 1036 | 8F00 | 0A06 | C300 |
| 0000152020 | 0E8B | 0014 | 0E09 | 0008 | 0E08 | 000C | D1F6 | 2E8A |
| 0000152040 | 0006 | CD80 | 80C2 | 3FE5 | CD0A | D1F6 | 2E8A | 0015 |
| 0000152060 | C1F7 | DFFF | D974 | E991 | FE3C | D77C | D732 | D760 |
| 0000152100 | D7F6 | D77A | D734 | D762 | D7F6 | D772 | D724 | D752 |
| 0000152120 | D7F6 | D770 | D722 | D750 | D7F6 | D784 | D73A | D768 |
| 0000152140 | D7F6 | D710 | D738 | D766 | D7F6 | D780 | D714 | D742 |
| 0000152160 | D7F6 | D70C | D736 | D764 | D7F6 | DA5E | DA44 | EA1B |
| 0000152200 | EA16 | DA3E | DA38 | DA4C | DA56 | D94E | DA31 | D958 |
| 0000152220 | D962 | DA31 | D983 | DA31 | D98D | D997 | DA0F | DA27 |
| 0000152240 | DA18 | D9A3 | D9EB | D9F7 | DA03 | E0D1 | E5DD | E2BA |
| 0000152260 | E528 | E18C | E633 | E3E8 | E590 | E9B8 | E872 | DA31 |
| 0000152300 | E695 | E9C1 | E972 | E9C8 | E6EF | EB1A | EB01 | EB06 |
| 0000152320 | EAFC | EB0B | EB10 | EB15 | DA31 | EF6B | EF93 | EEB1 |
| 0000152340 | EEDD | DA31 | DA31 | DA31 | DA31 | EBE0 | F039 | ECF6 |
| 0000152360 | DA31 | E777 | E9CF | DA31 | DA31 | EA40 | EA8A | EA7C |
| 0000152400 | EA90 | EA97 | EA67 | EA7C | EA90 | EA7C | EA7C | EA7C |
| 0000152420 | EA7C | EA83 | EA83 | EA7C | EA9E | EA8A | EA67 | EA7C |
| 0000152440 | EA83 | DB17 | DA81 | DA95 | DA85 | DA85 | DA81 | DA95 |
| 0000152460 | DA85 | DA93 | DA93 | DAFB | DA93 | DA81 | DA81 | DA95 |
| 0000152500 | DAEE | DC47 | DA9C | DA95 | DAB0 | DA9C | DA9C | DA95 |
| 0000152520 | DABA | DA93 | DA93 | DAFB | DA93 | DAB0 | DABA | DA95 |
| 0000152540 | DAB0 | DDC8 | DA9C | DA95 | DAB0 | DAAB | DAB5 | DA8C |
| 0000152560 | DAAB | DA93 | DA93 | DAFB | DA93 | DA9C | DA9C | DA95 |
| 0000152600 | DABA | 0604 | 4240 | 0301 | 0705 | 0000 | 0000 | 0000 |
| 0000152620 | 0000 | C001 | 0100 | 0000 | 0000 | 0000 | 0000 | 4000 |
| 0000152640 | 0300 | 0000 | 0000 | 0000 | C000 | 4000 | 0280 | FFFF |
| 0000152660 | FFFF | FFFF | FFFF | 3FFF | 0000 | 0000 | 7F80 | FFFF |
| 0000152700 | 7F7F | 0000 | 0000 | 0000 | 7FF0 | FFFF | FFFF | FFFF |
| 0000152720 | 7FEF | 0000 | 0000 | 0000 | 8000 | C001 | 0100 | 0000 |

THU MAR 14 17:21:24 1991 CLIENT.EXE PAGE 59, LINE 3423

| | | | | | | | | |
|---|---|---|---|---|---|---|---|---|
| 0000152740 | 0000 | 0000 | 8000 | 0000 | 0000 | B18A | F66A | A2F4 |
| 0000152760 | 8930 | FFFE | 0000 | 539E | C265 | D742 | DDB3 | 0000 |
| 0000153000 | 0000 | 2C23 | 6B9B | 91C1 | 860A | FFFF | 0000 | 6484 |
| 0000153020 | F9DE | F333 | B504 | 0000 | 0000 | 0000 | 0000 | 0000 |
| 0000153040 | 8000 | 0001 | 0000 | C235 | 2168 | DAA2 | C90F | 0001 |
| 0000153060 | 0000 | 8AFE | CD1B | 784B | D49A | 0001 | 0000 | F0BC |
| 0000153100 | 5C17 | 3B29 | B8AA | 0000 | 0000 | F799 | FBCF | 9A84 |
| 0000153120 | 9A20 | FFFE | 0000 | 79AC | D1CF | 17F7 | B172 | FFFF |
| 0000153140 | 0000 | 0003 | 7BD4 | D85A | 5C3E | 8F69 | 0005 | 0080 |
| 0000153160 | 4D37 | 2CD7 | D0F8 | D6D4 | 000C | 0000 | DCD3 | 6617 |
| 0000153200 | BBEE | 82BA | 0012 | 0080 | 91CB | 5E58 | 868B | F506 |
| 0000153220 | 0014 | 0000 | 0003 | 86E5 | 0120 | 0502 | 9C79 | 0009 |
| 0000153240 | 0080 | 6663 | 88CF | B270 | C939 | 000F | 0000 | FA96 |
| 0000153260 | C746 | 0CFE | E4B7 | 0013 | 0080 | 91CB | 5E58 | 868B |
| 0000153300 | F506 | 0014 | 0000 | 0004 | 5B32 | CF08 | A4C9 | A65u |
| 0000153320 | FFFD | 0000 | D1CE | D5CA | A84B | D0F0 | 0002 | 0000 |
| 0000153340 | 899F | E22B | 52A8 | 9C4A | 0005 | 0000 | 4265 | 5550 |
| 0000153360 | E9CF | 90EF | 0006 | 0000 | 4B90 | 24AD | E5E6 | A443 |
| 0000153400 | 0005 | 0000 | 0003 | 8310 | 5638 | 4F0A | F062 | 0003 |
| 0000153420 | 0000 | B4E7 | 6D1E | 5190 | EE50 | 0005 | 0000 | 243B |
| 0000153440 | 5B6D | 9020 | AC50 | 0006 | 0000 | 4B90 | 24AD | E5E6 |
| 0000153460 | A443 | 0005 | 0000 | 0002 | 1898 | F405 | 06FC | F274 |
| 0000153500 | 0005 | 0000 | AD08 | 14E1 | 3D54 | EC9B | 000E | 0000 |
| 0000153520 | 5FAF | C3A3 | D84A | FDF0 | 0014 | 0000 | 0002 | 776F |
| 0000153540 | 387B | 108B | DAA7 | 000A | 0000 | E85D | 9B7B | B182 |
| 0000153560 | A003 | 0012 | 0000 | 837E | E709 | F814 | B72D | 0016 |
| 0000153600 | 0000 | 0003 | 7704 | C299 | 57E2 | 9B71 | FFFE | 0000 |
| 0000153620 | 4F9C | F631 | [illegible] | DE91 | 0004 | 0080 | 4B8A | 7AEA |
| 0000153640 | C9ED | B2D3 | 0008 | 0000 | 28C9 | 1D09 | E42F | 8AC4 |
| 0000153660 | 000A | 0080 | 0002 | 76BB | 3E70 | 025B | 8EAC | 0005 |
| 0000153700 | 0080 | EF60 | A933 | 1FD0 | 9C04 | 0008 | 0000 | BB96 |
| 0000153720 | 6C83 | F4E0 | C05F | 0009 | 0080 | D6B2 | D6C1 | D6B7 |
| 0000153740 | D6BD | 468E | EB0E | 8C0A | 8EDB | EBC3 | 8C04 | 8ED3 |
| 0000153760 | 8CC3 | 0246 | 35EB | D38B | D98A | EBC0 | 8302 | 06E3 |
| 0000154000 | 8B47 | FE4D | FF2E | AAA7 | FCD6 | 0650 | 571E | 5256 |
| 0000154020 | 5351 | 5516 | EC8B | DA8C | C78B | 7EC5 | 8B14 | 830D |
| 0000154040 | 02C7 | C180 | 7328 | 8ECF | 8BC2 | D0D3 | D0C5 | 8AC5 |
| 0000154060 | 83DD | 1FE3 | E3D1 | FF2E | 0AA7 | 90D3 | F28B | 74EB |
| 0000154100 | F08B | 70EB | 768B | 8E00 | 0246 | 058A | 4798 | F003 |
| 0000154120 | 62EB | F08B | 7603 | 8E00 | 0246 | 058A | 4798 | F0u3 |
| 0000154140 | 52EB | C68B | D003 | C28B | F08B | 058A | 4798 | F003 |
| 0000154160 | 42EB | 768B | 8E00 | 0246 | 3503 | C783 | EB02 | 9035 |
| 0000154200 | F08B | 7603 | 8E00 | 0246 | 3503 | C783 | EB02 | 9025 |
| 0000154220 | C68B | D003 | C28B | F08B | 3503 | C783 | EB02 | 9015 |
| 0000154240 | F08B | 7603 | 8E00 | 0246 | 0AEB | F08B | F203 | 04EB |
| 0000154260 | 358B | 4747 | 7E89 | 8A14 | 571D | B806 | D1E2 | D88E |
| 0000154300 | 3EC4 | 2360 | 8B26 | 3D05 | 0020 | 0976 | E850 | F4F7 |
| 0000154320 | D158 | EBE0 | D107 | BFE0 | 2C52 | F803 | 1D8E | 5F07 |
| 0000154340 | 1E88 | 007E | 06C7 | 0014 | 2000 | EDD0 | EDD0 | EDD0 |
| 0000154360 | EDD0 | DD8A | E383 | F60E | 01C1 | 0A74 | D8B8 | 50D8 |
| 0000154400 | FF2E | 5AA7 | 90D3 | 8B53 | 83D9 | 06E3 | FF2E | 7A97 |
| 0000154420 | 5BD3 | D88C | C08E | 368B | 0010 | FE8B | EF83 | 890C |
| 0000154440 | 6E3E | EB00 | 9074 | 7E89 | 8A14 | 571D | B806 | D78C |
| 0000154460 | D88E | 3EC4 | 2360 | 8B26 | 3D05 | 0020 | 0976 | E850 |
| 0000154500 | F485 | D158 | EBE0 | D107 | BFE0 | 2C52 | F803 | 1D8E |
| 0000154520 | 5F07 | D88C | C08E | C033 | 1E88 | 007E | 14A3 | 8A00 |
| 0000154540 | D0DD | D0EB | D0EB | D0EB | 83EB | 0EE3 | C1F6 | 7401 |
| 0000154560 | 2E09 | 97FF | D36A | 8FE9 | 9000 | 4CE8 | 7200 | 8940 |
| 0000154600 | 6E36 | F600 | 04C1 | 0474 | 3E89 | 006E | C3F6 | 7408 |

THU MAR 14 17:21:24 1991 CLIENT.EXE PAGE 60, LINE 3482

| | | | | | | | | |
|---|---|---|---|---|---|---|---|---|
| 0000154620 | 8003 | 02F3 | C1F6 | 7402 | 2E1D | 97FF | D34A | 368B |
| 0000154640 | 0010 | 363B | 000E | 0974 | EE83 | 890C | 1036 | EB00 |
| 0000154660 | E857 | F4E8 | F2EB | D8B8 | 50D8 | FF2E | 4AA7 | E8D3 |
| 0000154700 | F4DA | 0E83 | 0014 | EB01 | 8B3F | 1036 | 8B00 | 8AFE |
| 0000154720 | 80D5 | 1CE2 | F28A | E6D0 | D602 | F632 | FA2B | 3E3B |
| 0000154740 | 000E | 7FF8 | F501 | E8C3 | 0177 | 1CEB | 5D90 | C483 |
| 0000154760 | 5B02 | 5A59 | 5F5E | 071F | 7BE9 | 5DF8 | C483 | 5B02 |
| 0000155000 | 5A59 | 5F5E | 071F | CF58 | 14A1 | 0900 | 0806 | 0800 |
| 0000155020 | 0C06 | F600 | 8AD0 | 063E | 8000 | C2CF | E780 | 0A3F |
| 0000155040 | F6C7 | A9D0 | DFFF | C575 | 0E8A | 007E | F980 | 749B |
| 0000155060 | 8014 | 90F9 | 0F74 | F180 | 8020 | F8F9 | BD72 | EC8B |
| 0000155100 | 7EC5 | EB14 | 8B10 | C5EC | 147E | 8A47 | 800D | 20F1 |
| 0000155120 | F980 | 72F8 | 8AE7 | 016D | C783 | 8002 | 08C1 | 468B |
| 0000155140 | 8B0C | 0456 | 768B | 8E0A | 0E46 | 568C | D002 | D0C5 |
| 0000155160 | 8AC5 | 83DD | 1FE3 | E3D1 | FF2E | 0AA7 | 90D3 | D98B |
| 0000155200 | E383 | 2E06 | A7FF | D37A | D98B | E383 | 2E06 | A7FF |
| 0000155220 | D382 | D98B | E383 | 2E06 | 97FF | D382 | 368B | 0010 |
| 0000155240 | 363B | 000E | 0876 | EE83 | 890C | 1036 | C300 | EBE8 |
| 0000155260 | EBF3 | 8BF3 | 83D9 | 06E3 | FF2E | 8AA7 | 8BD3 | 83D9 |
| 0000155300 | 06E3 | FF2E | 92A7 | F7D3 | 06C1 | 7500 | E903 | 11EA |
| 0000155320 | A1E9 | F711 | 06C1 | 7408 | 8124 | 03F1 | F702 | 03C1 |
| 0000155340 | 7506 | 8111 | 04F9 | 7481 | C707 | 0C06 | 0000 | C300 |
| 0000155360 | 5854 | C43B | 6B75 | 0CA1 | 8900 | 1246 | F7C3 | 00C1 |
| 0000155400 | 7410 | F70C | 00C1 | 7504 | E903 | 1109 | E8E9 | F710 |
| 0000155420 | 00C1 | 7504 | E903 | 0FC7 | BBE9 | 8A0F | D0DD | 83EB |
| 0000155440 | 0EE3 | FF2E | 9AA7 | 8AD3 | D0DD | 83EB | 0EE3 | FF2E |
| 0000155460 | AAA7 | 8AD3 | D0DD | 83EB | 0EE3 | FF2E | BAA7 | F7D3 |
| 0000155500 | 06C1 | 7500 | E91C | 1150 | F180 | F704 | 06C1 | 7500 |
| 0000155520 | B810 | 0001 | 8AE9 | F611 | 06C1 | 0574 | C033 | 80E9 |
| 0000155540 | 8311 | 140E | 4000 | 90C3 | 00BA | EB80 | 9023 | 80BA |
| 0000155560 | EB00 | 901D | D233 | 12BB | EBD4 | 9018 | D233 | F787 |
| 0000155600 | 32BB | EBD4 | 900E | D233 | 32BB | EBD4 | 9006 | D233 |
| 0000155620 | F2BB | 8AD3 | 0B45 | E0D0 | E0D0 | 440A | 980B | E0D1 |
| 0000155640 | D803 | 7532 | 320A | 0A54 | 4D8B | 8B08 | 0844 | FF2E |
| 0000155660 | 8B27 | 8AF7 | E8D6 | 0051 | 5588 | C30A | 0E83 | 0014 |
| 0000155700 | EB04 | 8B02 | 83F7 | 140E | 0100 | 3DEB | 5ABE | 32D4 |
| 0000155720 | 80F2 | 80E6 | 1BE8 | 0800 | 0A75 | 83C3 | 140E | 0400 |
| 0000155740 | 66BE | EBD4 | 83EA | 140E | 0400 | 72BE | 83D4 | 140E |
| 0000155760 | 0100 | 3E8B | 006E | A52E | A52E | A52E | A52E | A52E |
| 0000156000 | A52E | EF83 | 830C | 0CEE | 8BC3 | 6E3E | 3B00 | 74F7 |
| 0000156020 | A50C | A5A5 | A5A5 | 83A5 | 0CEF | EE83 | C30C | 06F6 |
| 0000156040 | 000B | 7410 | 32C5 | 78D6 | EBC1 | 8B86 | 8BC6 | 83DF |
| 0000156060 | 06C6 | C783 | B906 | 0004 | F3FD | FCA7 | 0472 | F08B |
| 0000156100 | 83EB | F38B | 7EE9 | 2BFF | 7CC1 | 8708 | 86F7 | 03F2 |
| 0000156120 | F7C8 | F7D8 | 3DD8 | 0043 | 2F7E | 5255 | 758B | BD08 |
| 0000156140 | 0001 | D632 | 0279 | DDF7 | 158B | 4D8B | 8B02 | 045D |
| 0000156160 | 7D8B | 0B06 | 78ED | E903 | 0460 | EA83 | 8301 | 00D9 |
| 0000156200 | DB83 | 8300 | 00DF | 8BE9 | 5503 | 5152 | D632 | 8B9C |
| 0000156220 | ADE8 | D08B | 8BAD | ADC8 | D88B | 33AD | 87F6 | 0BEE |
| 0000156240 | 74F6 | 8370 | 0EFE | 1A7C | ED0B | 0374 | CA83 | 8B01 |
| 0000156260 | 8BEA | 8BD1 | 8BCB | 33D8 | 83C0 | 10EE | E577 | 5374 |
| 0000156300 | 2972 | FE83 | 7C06 | 9533 | C00A | 0374 | CC80 | 8A01 |
| 0000156320 | 8AC4 | 95E2 | D68A | F18A | CD8A | EB8A | DF8A | F83A |
| 0000156340 | C48A | E432 | EE83 | 7708 | 7411 | D128 | D1E5 | D1D2 |
| 0000156360 | D1D1 | D1D3 | 46D0 | F375 | 19EB | CE87 | C5F7 | 003F |
| 0000156400 | 0374 | CD83 | D120 | D1E8 | D1DB | D1DE | D1DA | E2DD |
| 0000156420 | 8BF4 | 8BCE | 8BF7 | F7F8 | FFC5 | 743F | 8303 | 01CD |
| 0000156440 | 589D | 2278 | 1403 | 4C13 | 1302 | 045C | 7C13 | 7306 |
| 0000156460 | D110 | D1DF | D1DB | D1D9 | D1DA | 73DD | 8303 | 01CD |

THU MAR 14 17:21:24 1991 CLIENT.EXE PAGE 61, LINE 3541

| | | | | | | | | |
|---|---|---|---|---|---|---|---|---|
| 0000156500 | 8B40 | E9F0 | 0394 | 142B | 4C1B | 1B02 | 045C | 7C1B |
| 0000156520 | 7306 | 331A | F7F6 | F7D7 | F7D3 | F7D1 | F7D2 | F5DD |
| 0000156540 | D613 | CE13 | DE13 | FE13 | F08B | A7E9 | 8B02 | 58F0 |
| 0000156560 | F480 | 5080 | 9DE9 | 5502 | FE8A | F232 | 0352 | 40C1 |
| 0000156600 | 2250 | 33FA | 8BDB | 8BEB | 8BCB | 0B04 | 74C0 | 8B0C |
| 0000156620 | 0B15 | 74D2 | F706 | 8BE2 | 8BE8 | 55CA | ED33 | 048B |
| 0000156640 | C00B | 1074 | 558B | 0B02 | 74D2 | F709 | 03E2 | 13C8 |
| 0000156660 | 83DA | 00D5 | 448B | 0B02 | 74C0 | 8B0F | 0B15 | 74D2 |
| 0000156700 | F709 | 03E2 | 13C8 | 83DA | 00D5 | 0B58 | 50C1 | C933 |
| 0000156720 | 048B | C00B | 1074 | 558B | 0B04 | 74D2 | F709 | 03E2 |
| 0000156740 | 13D8 | 83EA | 00D1 | 448B | 0B02 | 74C0 | 8B10 | 0255 |
| 0000156760 | D20B | 0974 | E2F7 | D803 | EA13 | D183 | 8B00 | 0444 |
| 0000157000 | C0GB | 0F74 | 158B | D20B | 0974 | E2F7 | D803 | EA13 |
| 0000157020 | D183 | 5800 | C30B | 3350 | 8BDB | 0B04 | 74C0 | F70A |
| 0000157040 | 0665 | E803 | CA13 | D383 | 8B00 | 0244 | C00B | 1074 |
| 0000157060 | 558B | 0B04 | 74D2 | F709 | 03E2 | 13E8 | 83CA | 00D3 |
| 0000157100 | 448B | 0B04 | 74C0 | 8B10 | 0255 | D20B | 0974 | E2F7 |
| 0000157120 | E803 | CA13 | D383 | 8B00 | 0644 | 158B | D20B | 0974 |
| 0000157140 | E2F7 | E803 | CA13 | D383 | 8B00 | 81D5 | FFE5 | 583F |
| 0000157160 | C50B | 3350 | 52ED | 448B | 0B02 | 74C0 | F70A | 0665 |
| 0000157200 | C803 | DA13 | D583 | 8B00 | 0444 | C00B | 1074 | 558B |
| 0000157220 | 0B04 | 74D2 | F709 | 03E2 | 13C8 | 83DA | 00D5 | 448B |
| 0000157240 | 8B06 | 0255 | D20B | 0974 | E2F7 | C803 | DA13 | D583 |
| 0000157260 | 5100 | C933 | 448B | DBD4 | 74C0 | F70A | 0665 | D803 |
| 0000157300 | EA13 | D183 | 8B00 | 0644 | 558B | 0B04 | 74D2 | F709 |
| 0000157320 | 03E2 | 13D8 | 83EA | 00D1 | 448B | F706 | 0665 | C503 |
| 0000157340 | D113 | 5D59 | FA8B | D18B | CB8B | D88B | 0B58 | 74C0 |
| 0000157360 | 8303 | 01CD | E95E | 01D0 | 1BF9 | 32C1 | 55F2 | 5652 |
| 0000157400 | 8357 | 06C6 | C783 | B906 | 0004 | F3FD | FCA7 | 5E5F |
| 0000157420 | 8B9C | ADE8 | C88B | 8BAD | ADD8 | D08B | 92AD | F78B |
| 0000157440 | 70BF | A500 | A5A5 | 33A5 | 9DFF | 0B72 | EAD1 | D8D1 |
| 0000157460 | DBD1 | D9D1 | DFD1 | 5545 | 3E89 | 0018 | 4AE8 | 5700 |
| 0000157500 | 06C7 | 0018 | 0000 | 40E8 | 5700 | 3CE8 | 5700 | 38E8 |
| 0000157520 | BD00 | 8001 | E1D1 | D3D1 | D0D1 | D2D1 | 2272 | 70BE |
| 0000157540 | 3B00 | 0654 | 0C75 | 443B | 7504 | 3B07 | 025C | 0275 |
| 0000157560 | 0C3B | 0C73 | C20B | C10B | C30B | C40A | E432 | E88B |
| 0000157600 | D78B | 5B59 | 5E5F | 51E9 | 8B01 | 7636 | 3300 | 3BFF |
| 0000157620 | 73D6 | 0B62 | 75D2 | 3B04 | 77F0 | F741 | 52F6 | 9753 |
| 0000157640 | ED33 | F58B | 70A1 | 0B00 | 74C0 | F704 | 8BE7 | 50F2 |
| 0000157660 | 72A1 | 0B00 | 74C0 | F706 | 03E7 | 13F0 | A1EA | 0074 |
| 0000157700 | C00B | 0874 | E7F7 | E803 | D283 | 9200 | 168B | 0018 |
| 0000157720 | 2B5B | 1BD3 | 5BCE | DD1B | 1B5D | 95E8 | 9192 | 7393 |
| 0000157740 | 4F13 | 0E03 | 0070 | 1E13 | 0072 | 0613 | 0074 | 1613 |
| 0000157760 | 0076 | ED73 | 4FC3 | 0E2B | 0070 | 1E1B | 0072 | 061B |
| 0000160000 | 0074 | 0E03 | 0072 | 1E13 | 0074 | C213 | 168B | 0070 |
| 0000160020 | EBF5 | 90C9 | 04B0 | FF0B | 2075 | EE83 | FE10 | 74C8 |
| 0000160040 | 8B0C | 8BFB | 8BD9 | 8BCA | 33D5 | EBED | BEE9 | D45A |
| 0000160060 | 3E8B | 006E | 5D58 | BDE9 | 90FB | C7F7 | FF00 | 1C75 |
| 0000160100 | EE83 | 9708 | E08A | C78A | FB8A | DD8A | E98A | CE8A |
| 0000160120 | F28A | 9597 | D48A | E08A | C032 | 9095 | C7F7 | 8000 |
| 0000160140 | 7875 | D14E | D1E5 | D1D2 | D1D1 | D1D3 | F7D7 | 00C7 |
| 0000160160 | 7480 | EBEF | 0B65 | 0BD5 | 0ACA | 8ACD | 0BEB | 74C9 |
| 0000160200 | 8344 | 140E | 2000 | E8D0 | 1B72 | E8D0 | 0F72 | F981 |
| 0000160220 | 8000 | 1D77 | 2772 | C7F6 | 7401 | EB22 | 5814 | D050 |
| 0000160240 | 72E4 | EB1A | D00C | 72E8 | 5814 | D050 | 72E4 | EB02 |
| 0000160260 | 800C | 01C7 | D783 | 7300 | BF04 | 8000 | 3346 | 8BED |
| 0000160300 | 8BD5 | 8ACA | EBD9 | 904B | C7F7 | 8000 | 0C75 | D14E |
| 0000160320 | D1E5 | D1D2 | D1D1 | D1D3 | 90D7 | 0BA0 | D000 | 73E8 |
| 0000160340 | D076 | 0BE8 | 74ED | 832B | 140E | 2000 | E8D0 | 5872 |

THU MAR 14 17:21:24 1991 CLIENT.EXE PAGE 62, LINE 3600

| | | | | | | | | |
|---|---|---|---|---|---|---|---|---|
| 0000160360 | E8D0 | 4C72 | FD81 | 8000 | 0777 | 1672 | C2F6 | 7401 |
| 0000160400 | 3311 | 83ED | 01C2 | CD13 | DD13 | FD13 | 0473 | 00BF |
| 0000160420 | 4680 | 6EA1 | 9700 | 1589 | 4D89 | 8902 | 045D | 4589 |
| 0000160440 | 5806 | 805D | 80E4 | 6588 | 810A | 00FE | 7D40 | 810E |
| 0000160460 | 01FE | 7EC0 | 8954 | 0875 | 45C6 | 000B | E9C3 | 007F |
| 0000160500 | 5058 | E4D0 | CC72 | B9EB | E8D0 | C672 | 5058 | E4D0 |
| 0000160520 | AF72 | BEEB | 1EE9 | D0FF | 73E8 | 95F9 | C40A | C20A |
| 0000160540 | E68A | E480 | 8007 | F8E6 | 0B95 | 74ED | 83A5 | 140E |
| 0000160560 | 2000 | E8D0 | 2572 | E8D0 | 1972 | FD81 | 0400 | 2777 |
| 0000160600 | 3672 | C6F6 | 7408 | EB31 | BE1E | D45A | 67E8 | 88FA |
| 0000160620 | 0A65 | 58C3 | D050 | 72E4 | EB1F | D00C | 72E8 | 5819 |
| 0000160640 | D050 | 72E4 | EB02 | 3311 | 80ED | 08C6 | CD13 | DD13 |
| 0000160660 | FD13 | 0473 | 00BF | 4680 | ED33 | D232 | 53E9 | 83FF |
| 0000160700 | 140E | 0800 | 0BA0 | D000 | D0E8 | D0E8 | 72E8 | D00E |
| 0000160720 | 72E8 | BE22 | D466 | 1DE8 | 88FA | 0A65 | D0C3 | 72E8 |
| 0000160740 | 830A | 140E | 2000 | C4F6 | 7580 | BEE8 | D47E | 05E8 |
| 0000160760 | 88FA | 0A65 | 83C3 | 140E | 2000 | C4F6 | 7480 | EBD4 |
| 0000161000 | 26EA | 8BAD | 26F8 | 8AAD | D1D0 | 24C0 | D001 | 86C8 |
| 0000161020 | 8BC4 | 1036 | 3B00 | 1236 | 7500 | E803 | EC6E | C683 |
| 0000161040 | 890C | 1036 | 8000 | 80CA | F632 | FF3C | 2174 | 003C |
| 0000161060 | 3374 | 6488 | 2C0A | 987F | 4489 | 8808 | 0B74 | 5488 |
| 0000161100 | 8907 | 057C | C033 | 4488 | 8904 | 0244 | 0489 | 88C3 |
| 0000161120 | 0A64 | 00B8 | B640 | 8002 | 80FA | DC75 | FF0B | D875 |
| 0000161140 | CE80 | EB01 | 88D3 | 0A64 | FA80 | 7580 | 0B0C | 75FF |
| 0000161160 | B808 | C001 | CE80 | EB01 | 83BF | 140E | 0200 | 7F2C |
| 0000161200 | 4098 | D148 | D0E7 | 0AD2 | 79D2 | EBF7 | F6AB | 02C1 |
| 0000161220 | 0775 | C033 | D88B | 98E9 | F600 | 01C1 | 1275 | 5C8B |
| 0000161240 | 8A05 | 0744 | 648A | D10A | B4E0 | D1FF | E9D8 | 0081 |
| 0000161260 | 648A | E90A | 00A6 | 8EE9 | E900 | 00D8 | FE8B | 368B |
| 0000161300 | 0010 | 448B | 8A0A | 0B4C | C90A | C175 | 4C8A | 8B0A |
| 0000161320 | 0844 | 803D | 7D00 | 3DDF | FF81 | DD7E | 7F04 | 648A |
| 0000161340 | 8607 | D0E0 | D0E0 | D1E1 | 8BD8 | 0B14 | 0254 | D60A |
| 0000161360 | F632 | 5C8B | 0B05 | 0354 | 3774 | 0E83 | 0014 | 8A20 |
| 0000161400 | 0B0E | D000 | D0E9 | D0E9 | 72E9 | D02C | 72E9 | 8132 |
| 0000161420 | 00FA | 7280 | 771C | F605 | 01C3 | 1574 | D08A | C383 |
| 0000161440 | 1501 | 0000 | D032 | 0979 | D08B | E2D1 | FE80 | 74FF |
| 0000161460 | 9316 | 8BAB | ABC3 | D0C3 | 72E9 | 0AF6 | 78E4 | EBDD |
| 0000161500 | 0AF0 | 78E4 | EBEC | 83D5 | 140E | 2800 | 0E8A | 000B |
| 0000161520 | E9D0 | E9D0 | E9D0 | 1872 | E9D0 | 3172 | 8B2E | 8C1E |
| 0000161540 | 80D4 | 80E4 | FC0A | A12E | D48A | 8BAB | ABC3 | C6EB |
| 0000161560 | E9D0 | 0572 | C4F6 | 7580 | 2EE3 | 1E8B | D490 | E480 |
| 0000161600 | 0A80 | 8AE7 | ABC3 | A12E | D48E | EBAB | F6A9 | 80C4 |
| 0000161620 | CA74 | E5EB | 0E83 | 0014 | F730 | 05D8 | FF82 | 183D |
| 0000161640 | 7D00 | 9137 | 148B | 540B | 8A02 | 0AC2 | 8BC6 | 0454 |
| 0000161660 | 5C8B | 0A06 | 74C0 | 8003 | 01CA | EBD1 | DAD1 | 0373 |
| 0000161700 | CA80 | E201 | 86F5 | 8AE5 | 0A64 | E480 | 8A80 | 8AC7 |
| 0000161720 | BAFB | 8ADE | 32F2 | E9D2 | FF25 | C033 | D88B | 50E9 |
| 0000161740 | 87FF | E8FE | EAA6 | FE87 | 0AEB | 3E8B | 0010 | 3E3B |
| 0000161760 | 0012 | ED73 | C783 | 890C | 103E | 2600 | 8BAD | 26E8 |
| 0000162000 | 8BAD | 26D0 | 8BAD | 26C8 | 8BAD | 8BF7 | D1D8 | D1E5 |
| 0000162020 | D1D2 | D1D1 | D1D3 | D1E5 | D1D2 | D1D1 | D1D3 | D1E5 |
| 0000162040 | D1D2 | D1D1 | 80D3 | 80CB | 5C88 | 8907 | 054C | 5489 |
| 0000162060 | 8903 | 016C | CD0B | CA0B | F48A | E680 | 8880 | 0A74 |
| 0000162100 | F632 | 3488 | E480 | D17F | D1E8 | D1E8 | D1E8 | 3DE8 |
| 0000162120 | 07FF | 0F74 | 003D | 7400 | 2D1D | 03FF | 4489 | 8806 |
| 0000162140 | 0B74 | B8C3 | 4000 | 02B6 | FB80 | 7580 | 0BEF | 75C9 |
| 0000162160 | 80EB | 01CE | E6EB | FB80 | 7580 | 0B0B | 75C9 | B807 |
| 0000162200 | C001 | 01B6 | D6EB | 0E83 | 0014 | 2D02 | 03FF | 2C8B |
| 0000162220 | 548B | 8B02 | 044C | 5C8B | 4006 | D148 | D1E5 | D1D2 |

THU MAR 14 17:21:24 1991 CLIENT.EXE PAGE 63, LINE 3659

| | | | | | | | | |
|---|---|---|---|---|---|---|---|---|
| 0000162240 | D1D1 | 0BD3 | 79DB | 89F3 | 892C | 0254 | 4C89 | 8904 |
| 0000162260 | 065C | F632 | A6EB | C1F6 | 7502 | 3309 | ABC0 | ABAB |
| 0000162300 | E9AB | 011A | C1F6 | 7501 | 8B3D | 0154 | 5C8B | 8B03 |
| 0000162320 | 0544 | 4C8A | D007 | D1E9 | D1D8 | D1DB | D0DA | D1E9 |
| 0000162340 | D1D8 | D1DB | D0DA | D1E9 | D1D8 | D1DB | 92DA | 8BAB |
| 0000162360 | ABC3 | C28B | 8AAB | 0A7C | E780 | B880 | 7FF0 | E70A |
| 0000162400 | C10A | E9AB | 00D8 | 5C8A | 800A | 80E3 | EEE9 | E900 |
| 0000162420 | 00D0 | 0BE9 | EB01 | 909F | FE8B | 368B | 0010 | 4C8A |
| 0000162440 | 0A0B | 75C9 | 8AF0 | 0A4C | 6C8B | 8108 | 00FD | 7D04 |
| 0000162460 | 81DE | 01FD | 7EFC | 8ADB | 8B04 | 0154 | C00A | 0374 |
| 0000162500 | CA80 | F601 | 07C2 | 5274 | 0E83 | 0014 | A020 | 000B |
| 0000162520 | E8D0 | E8D0 | E8D0 | 3A72 | E8D0 | 3072 | C2F6 | 7404 |
| 0000162540 | F639 | 0BC2 | 3474 | 5C8B | 8B03 | 0544 | 4C8A | 8007 |
| 0000162560 | 7FE1 | C283 | 8308 | 00D3 | 0015 | 8000 | 00D1 | 2679 |
| 0000162600 | E180 | 457F | FD81 | 0400 | 1C7C | 53EB | E1D0 | D673 |
| 0000162620 | 08EB | E8D0 | 0472 | E1D0 | CC72 | 5C8B | 8B03 | 0544 |
| 0000162640 | 4C8A | 8007 | 7FE1 | E9D0 | D8D1 | DBD1 | DAD1 | E9D0 |
| 0000162660 | D8D1 | DBD1 | DAD1 | E9D0 | D8D1 | DBD1 | DAD1 | AB92 |
| 0000162700 | C38B | 8BAB | ABC2 | C58B | FF05 | D103 | D1E0 | D1E0 |
| 0000162720 | D1E0 | 0AE0 | 8AC1 | 0A4C | E180 | 0A80 | ABE1 | 83C3 |
| 0000162740 | 06EF | 0E83 | 0014 | 8A28 | 0A5C | E380 | 8A80 | 0B0E |
| 0000162760 | D000 | D0E9 | D0E9 | 72E9 | D014 | 72E9 | BE1D | D492 |
| 0000163000 | A52E | A52E | A52E | AD2E | E30A | EBAB | D0D1 | 72E9 |
| 0000163020 | 0A04 | 75DB | BEE8 | D49A | E6EB | DB0A | DF74 | F5EB |
| 0000163040 | 0E83 | 0014 | 8130 | FFC5 | F703 | 8BDD | 83CD | 04C1 |
| 0000163060 | 748A | 800A | 80E6 | 548A | 8B07 | 055C | 6C8B | 8B03 |
| 0000163100 | 0144 | EAD0 | DBD1 | DDD1 | D8D1 | F6E2 | 8BAB | ABC5 |
| 0000163120 | C38B | 8BAB | ABC2 | 86EB | AD26 | F88B | FF0B | 3174 |
| 0000163140 | ED33 | DD8B | D38B | 0FB8 | 8B00 | 1036 | 3B00 | 1236 |
| 0000163160 | 7500 | E803 | E816 | C683 | 890C | 1036 | 3200 | 88C9 |
| 0000163200 | 0B4C | CF8B | E580 | 7980 | F702 | 88DF | 0A6C | 59E9 |
| 0000163220 | 8B02 | 1036 | 3B00 | 1236 | 7500 | E803 | E7EE | C683 |
| 0000163240 | 890C | 1036 | 3300 | 89C0 | 8904 | 0244 | 4489 | 8904 |
| 0000163260 | 0644 | 44C7 | 0108 | 88C0 | 0A64 | 01B4 | 6488 | C30B |
| 0000163300 | 8B56 | 1036 | F600 | 0B44 | 7502 | F638 | 0B44 | 7501 |
| 0000163320 | 8B2E | 084C | F983 | 7F0F | 8B2A | 046C | 7C8B | 8B06 |
| 0000163340 | 8B14 | 025C | 2AE8 | 0B02 | 75DB | 8A18 | 0A64 | E40A |
| 0000163360 | 0479 | DAF7 | 0474 | C233 | 0978 | 8B5F | ABC2 | 33C3 |
| 0000163400 | EBD2 | 83F7 | 140E | 0100 | 00BA | EB80 | 26ED | 8BAD |
| 0000163420 | 26E8 | 8BAD | 0BF8 | 74C5 | 333D | 8BDB | B8D3 | 001F |
| 0000163440 | 368B | 0010 | 363B | 0012 | 0375 | 5FE8 | 83E7 | 0CC6 |
| 0000163460 | 3689 | 0010 | C932 | 4C88 | 8B0B | 80CF | 80E5 | 0C79 |
| 0000163500 | F783 | 83FF | FFF5 | C583 | 8301 | 00D7 | 6C88 | 0B0A |
| 0000163520 | 74FF | E906 | 0194 | 38E9 | 8BFF | 33FD | 2DED | 0010 |
| 0000163540 | 87E9 | 5601 | 08E8 | 5F00 | C28B | 8BAB | ABC3 | 8BC3 |
| 0000163560 | 1036 | F600 | 0B44 | 7502 | F641 | 0B44 | 7501 | 8B32 |
| 0000163600 | 084C | F983 | 7F1F | 8B33 | 046C | 7C8B | 8B06 | 8B14 |
| 0000163620 | 025C | 7CE8 | 0B01 | 75ED | 8A21 | 0A64 | E40A | 0C79 |
| 0000163640 | F383 | 83FF | FFF2 | C283 | 8301 | 00D3 | C333 | 0678 |
| 0000163660 | 33C3 | 8BD2 | C3DA | DA0B | F674 | 0E83 | 0014 | BB01 |
| 0000163700 | 8000 | D233 | 26C3 | 8BAD | 26D0 | 8BAD | 26D8 | 8BAD |
| 0000163720 | 26E8 | 8BAD | 0BF8 | 0BC5 | 0BC3 | 74C2 | B83F | 003F |
| 0000163740 | 368B | 0010 | 363B | 0012 | 0375 | 9FE8 | 83E6 | 0CC6 |
| 0000163760 | 3689 | 0010 | C932 | 4C88 | 8B0B | 80CF | 80E5 | 0379 |
| 0000164000 | 91E8 | 8800 | 0A6C | FF0B | 0F75 | ED0B | 0B75 | FB8B |
| 0000164020 | EA8B | DB33 | D233 | 202D | E900 | 00CE | 72E9 | 56FE |
| 0000164040 | 0EE8 | 9700 | 5F92 | 8BAB | ABC3 | C58B | 8BAB | ABC2 |
| 0000164060 | 8BC3 | 1036 | F600 | 0B44 | 7502 | F64F | 0B44 | 7501 |
| 0000164100 | 8B35 | 084C | F983 | 7F3F | 8B41 | 046C | 7C8B | 8B06 |

THU MAR 14 17:21:24 1991 CLIENT.EXE PAGE 64, LINE 3718

| | | | | | | | | |
|---|---|---|---|---|---|---|---|---|
| 0000164120 | 8B14 | 025C | BAE8 | 8A00 | 0A64 | E40A | 0379 | 33E8 |
| 0000164140 | 3300 | 78C7 | 3B1B | 0E36 | 7500 | E803 | E62E | EE83 |
| 0000164160 | 890C | 1036 | C300 | FF33 | ED33 | DD8B | D58B | E5EB |
| 0000164200 | FD0B | FB0B | FA0B | 0275 | DBEB | 0E83 | 0014 | BF01 |
| 0000164220 | 8000 | E4EB | D7F7 | D5F7 | D3F7 | DAF7 | 83F5 | 00D3 |
| 0000164240 | D583 | 8300 | 00D7 | 8BC3 | 1036 | 8B00 | 084C | F983 |
| 0000164260 | 7D3F | 8B20 | 046C | 7C8B | 8B06 | 8B14 | 025C | 50E8 |
| 0000164300 | 3300 | 0BC0 | 0BC7 | 0BC5 | 0BC3 | 74C2 | B807 | 003F |
| 0000164320 | 17E8 | C300 | 44C7 | 0108 | 89C0 | 8904 | 0244 | 4489 |
| 0000164340 | 8904 | 0644 | 44C6 | 010B | E9EB | C933 | E2D1 | D3D1 |
| 0000164360 | D5D1 | D7D1 | 0272 | F4E2 | DFD1 | DDD1 | DBD1 | DAD1 |
| 0000164400 | C103 | 4489 | 8908 | 8914 | 025C | 6C89 | 8904 | 067C |
| 0000164420 | 33C3 | 83C0 | 3FE9 | D9F7 | 7C49 | 7461 | 832B | 40F9 |
| 0000164440 | 5B7D | F983 | 7E30 | 0B13 | 0BD3 | 74D5 | 0C02 | 8B01 |
| 0000164460 | 33D7 | 8BFF | 8BEF | 83DF | 30E9 | EFD1 | DDD1 | DBD1 |
| 0000164500 | DAD1 | 0273 | D0D0 | F2E2 | EFD1 | DDD1 | DBD1 | DAD1 |
| 0000164520 | D4D0 | C00B | 2674 | 0E83 | 0014 | F620 | 0B06 | 0400 |
| 0000164540 | 2975 | 06F6 | 000B | 7508 | 0A31 | 22C2 | D0E0 | 73EC |
| 0000164560 | 330B | 83C0 | 01C2 | D813 | E813 | F813 | B0C3 | 3201 |
| 0000164600 | 33E4 | 8BFF | 8BEF | 8BDF | EBD7 | F6C7 | 0B06 | 0800 |
| 0000164620 | EA75 | 44F6 | 800A | D975 | E2EB | 44F6 | 800A | DC75 |
| 0000164640 | CFEB | FE8B | 368B | 0010 | 363B | 0012 | 0375 | DBE8 |
| 0000164660 | 83E4 | 0CC6 | 3689 | 0010 | FE87 | C08C | DA8C | C28E |
| 0000164700 | D88E | A5A5 | A5A5 | C08C | DA8C | C28E | D88E | AD26 |
| 0000164720 | EF83 | 8708 | 8AF7 | 80F4 | 80E6 | 7488 | 800A | 7FE4 |
| 0000164740 | F632 | FF3D | 747F | 3D0F | 0000 | 2574 | FF2D | 893F |
| 0000164760 | 0844 | 7488 | C30B | 00B8 | B640 | 8102 | 067C | 8000 |
| 0000165000 | ED75 | 6C8B | 0B04 | 026C | 2C0B | E375 | CE80 | EB01 |
| 0000165020 | 8BDE | 066C | 6C0B | 0B04 | 026C | 2C0B | 0775 | 01B8 |
| 0000165040 | B6C0 | EB01 | 83CA | 140E | 3000 | ED33 | 2C89 | 6C89 |
| 0000165060 | 8902 | 046C | 6C89 | EB06 | F6E5 | 01C7 | 1F75 | A5A5 |
| 0000165100 | A5A5 | FFB8 | 0A7F | ABE6 | 368B | 0010 | 363B | 000E |
| 0000165120 | 0375 | 47E8 | 83E4 | 0CEE | 3689 | 0010 | 33C3 | ABC0 |
| 0000165140 | ABAB | 00B8 | AB80 | FFB8 | 0A7F | ABE6 | 368B | 0010 |
| 0000165160 | 363B | 000E | 0375 | 23E8 | 83E4 | 0CEE | 3689 | 0010 |
| 0000165200 | F6C3 | 02C7 | B375 | C033 | ABAB | ABAB | 8BAB | 1036 |
| 0000165220 | 3B00 | 0E36 | 7500 | E803 | E402 | EE83 | 890C | 1036 |
| 0000165240 | C300 | FE8B | 368B | 0010 | 448B | 0508 | 3FFF | 748A |
| 0000165260 | 800A | 80E6 | E60A | 7C8A | 0A0B | 75FF | A5C4 | A5A5 |
| 0000165300 | ABA5 | EE83 | 3B08 | 0E36 | 7500 | E803 | E3CE | EE83 |
| 0000165320 | 890C | 1036 | C300 | 368B | 0010 | 6480 | 7F0A | 8BC3 |
| 0000165340 | 1036 | 8000 | 0A74 | C380 | AD26 | 0AA3 | A300 | 0006 |
| 0000165360 | A1C3 | 0006 | FE8B | C3AB | 0CA1 | 8B00 | ABFE | 8BC3 |
| 0000165400 | 1036 | 8B00 | 83FE | 0CEF | 0FB1 | 458A | 2408 | 2A0F |
| 0000165420 | 8BC8 | 0645 | E8D3 | 4D8A | 0A0A | 79C9 | F702 | 03D8 |
| 0000165440 | 0844 | 0E70 | 003D | 7D40 | 3D0B | C001 | 0F7E | 4489 |
| 0000165460 | C308 | 0979 | 00B8 | C640 | 0B44 | EB03 | B8F1 | C001 |
| 0000165500 | 44C6 | 010B | E8EB | 01BA | EB00 | 3302 | F7D2 | 1406 |
| 0000165520 | 0000 | 7420 | 8702 | 8AF7 | 0A44 | 658A | 330A | 8ADB |
| 0000165540 | 0B5C | E3D0 | E3D0 | 5D0A | D00B | 2EE3 | A7FF | D3CA |
| 0000165560 | E032 | 4678 | C00A | 0479 | F787 | DF86 | 448B | 3B08 |
| 0000165600 | 0845 | 1A7C | 1F7F | 04B9 | 8300 | 06C6 | C783 | FD06 |
| 0000165620 | A7F3 | 72FC | 7709 | C60E | 0D06 | 4000 | 40EB | 06C6 |
| 0000165640 | 000D | EB01 | C639 | 0D06 | 0000 | 32EB | 06C6 | 000D |
| 0000165660 | EB41 | F62B | 0B06 | 1000 | F274 | 8024 | E078 | E5EB |
| 0000165700 | 06F6 | 000B | 7410 | 80E5 | 80E4 | D978 | D0EB | 06F6 |
| 0000165720 | 000B | 7410 | 32D7 | 80E0 | 80E4 | BB74 | DCEB | D20B |
| 0000165740 | 1474 | 368B | 0010 | 363B | 000E | 0375 | ADE8 | 83E2 |
| 0000165760 | 0CEE | 3689 | 0010 | 8BC3 | 1036 | B000 | 3B41 | 0E36 |

THU MAR 14 17:21:24 1991 CLIENT.EXE PAGE 65, LINE 3777

| | | | | | | | | |
|---|---|---|---|---|---|---|---|---|
| 0000166000 | 7400 | 8B0E | 0A44 | C486 | C0D1 | 0724 | 52BB | 2ED4 |
| 0000166020 | A2D7 | 000D | 8BC3 | 1036 | 8A00 | 0A44 | 8024 | DB33 |
| 0000166040 | D38B | 5C8A | D10B | 2EE3 | A7FF | D3EA | F6BB | EBD4 |
| 0000166060 | BB1C | D502 | 17EB | 0EBB | EBD5 | BB12 | D51A | 0DEB |
| 0000166100 | 26BB | EBD5 | BB08 | D4A2 | 03EB | AEBB | 8BD4 | 1036 |
| 0000166120 | 3B00 | 1236 | 7500 | E803 | E232 | C683 | 890C | 1036 |
| 0000166140 | 8B00 | 8BF3 | 103E | 2E00 | 2EA5 | 2EA5 | 2EA5 | 2EA5 |
| 0000166160 | 2EA5 | C3A5 | 52E8 | 73ED | 5A04 | 42E9 | 8BED | 83F7 |
| 0000166200 | 0CC6 | 363B | 0010 | 087F | 86E8 | 83EF | 0CC7 | EFEB |
| 0000166220 | EF83 | 890C | 103E | C300 | C1F7 | 1C00 | 1B74 | D88C |
| 0000166240 | C08E | 24E8 | 73ED | 5A04 | 14E9 | B9ED | 0006 | 048B |
| 0000166260 | 1D8B | 89AB | 461C | E246 | C3F5 | 0CE8 | 73ED | 5A04 |
| 0000166300 | FCE9 | 8BEC | 1036 | 3B00 | 1236 | 7500 | E803 | E1BC |
| 0000166320 | C683 | 890C | 1036 | 8C00 | 8ED8 | 87C0 | E8F7 | EF31 |
| 0000166340 | F7C3 | C0C1 | 7401 | E810 | ECDF | 0473 | E95A | ECCF |
| 0000166360 | DA8C | C28E | 1AE8 | 0BEF | 74C0 | 8B14 | 1036 | 3B00 |
| 0000166400 | 0E36 | 7500 | E803 | E194 | EE83 | 890C | 1036 | C300 |
| 0000166420 | 8B55 | 103E | 8900 | 6E3E | 3300 | C7ED | 7A06 | 0000 |
| 0000166440 | 8B00 | 83F7 | 0CEE | 458B | 2B08 | 0844 | 78A3 | 8B00 |
| 0000166460 | 8B15 | 024D | 5D8B | 8B04 | 0645 | 067D | 758B | EB08 |
| 0000166500 | 9042 | 443B | 7206 | 7725 | 3B12 | 045C | 1E72 | 0B77 |
| 0000166520 | 4C3B | 7202 | 7717 | 3B04 | 7214 | E811 | 00BB | 3E83 |
| 0000166540 | 0078 | 7400 | E81B | 0087 | D875 | 14EB | 3E83 | 0078 |
| 0000166560 | 7400 | E80D | 008B | A0E8 | E800 | 0073 | C475 | 00EB |
| 0000166600 | 748B | 8B08 | 0A7D | 8A97 | 50E0 | C58B | E583 | 0BFC |
| 0000166620 | 7A2E | 8A00 | 0D26 | 8000 | FBE4 | 01A8 | 0575 | E480 |
| 0000166640 | EBFD | 8003 | 02CC | 02A8 | 0975 | ED0B | 2174 | E480 |
| 0000166660 | EBBF | 8003 | 40CC | 04A8 | 0975 | ED0B | 2074 | E480 |
| 0000166700 | EBFE | 8003 | 01CC | 2688 | 000D | ED33 | 45E9 | ADF2 |
| 0000166720 | 000D | 02A8 | 0575 | E480 | EBBF | 80D3 | 40CC | 0DA0 |
| 0000166740 | A800 | 7540 | 8005 | FEE4 | DCEB | CC80 | EB01 | F6D7 |
| 0000166760 | 80C4 | 0C75 | 3E83 | 0078 | 7400 | E805 | 0003 | EFEB |
| 0000167000 | D1C3 | D1E2 | D1D1 | D1D3 | FFD0 | 780E | D100 | 72E5 |
| 0000167020 | C301 | 06C7 | 007A | 0001 | 2BC3 | 1B14 | 024C | 5C1B |
| 0000167040 | 1B04 | 0644 | C345 | 368B | 0010 | 2CE8 | C300 | DCD0 |
| 0000167060 | 2073 | D0D0 | 1272 | 0BA0 | A800 | 7510 | EB1B | F609 |
| 0000167100 | 02C4 | EA75 | DCD0 | 1072 | FE8B | 72BE | E8D4 | EDA6 |
| 0000167120 | F78B | 0E81 | 0014 | 0081 | 8BC3 | 0A44 | 80A9 | 7503 |
| 0000167140 | 56DE | 24BF | C700 | 0A45 | 0000 | 448B | 4808 | 5C8B |
| 0000167160 | 8B06 | 044C | 548B | A802 | 7401 | 4007 | EBD1 | D9D1 |
| 0000167200 | DAD1 | F8D1 | 4589 | 8308 | FEFB | 0372 | EBF9 | 5239 |
| 0000167220 | 75B8 | F7B0 | BDE3 | 57D8 | EA03 | 0373 | FFBD | 8BFF |
| 0000167240 | 33D3 | F7C0 | 03F5 | D1E8 | 8BDD | 8BD3 | F7C1 | F9F5 |
| 0000167260 | E813 | DDD1 | D38B | C18B | F5F7 | F08B | F758 | 8BF5 |
| 0000167300 | 8BDD | 83C8 | 01C1 | DE13 | DBD1 | D9D1 | 5D89 | 8906 |
| 0000167320 | 044D | 45C7 | 0002 | C700 | 0005 | 8B00 | 5FF7 | 3E89 |
| 0000167340 | 006E | 97E8 | BEEC | 0024 | A3E8 | FFEC | 084D | F78B |
| 0000167360 | 57C3 | 62BF | 2E00 | 2EA5 | 2EA5 | 2EA5 | 2EA5 | 2EA5 |
| 0000167400 | BEA5 | 0062 | C35F | ED3A | 56EB | C98C | D98E | 4C8B |
| 0000167420 | 800A | 80E1 | 8B26 | 0A55 | E280 | 3A80 | 75D1 | 0645 |
| 0000167440 | 5756 | C90A | 0879 | 061E | 071F | F787 | CA87 | E580 |
| 0000167460 | 8001 | 01E6 | F53A | 2875 | ED0A | CA77 | 4C8B | 8108 |
| 0000167500 | FFC1 | 263F | 558B | 8108 | FFC2 | 3B3F | 75CA | 8311 |
| 0000167520 | 06C6 | C783 | FD06 | 75A7 | A707 | 0475 | 75A7 | A701 |
| 0000167540 | 5FFC | 075E | C18C | D98E | BFC3 | 0056 | A2E8 | 57EC |
| 0000167560 | 5356 | 4ABF | E800 | EC99 | 3E89 | 006E | F5E8 | 5EEB |
| 0000167600 | AD2E | 5F91 | 6FE8 | 89EC | 6E3E | 5100 | BE56 | 004A |
| 0000167620 | E1E8 | 5EEB | C683 | 560C | 56E8 | E8FF | EBF0 | 595E |
| 0000167640 | E9E2 | DE8B | 565E | E853 | EBCA | 835E | 0CC6 | AD2E |

THU MAR 14 17:21:24 1991 CLIENT.EXE PAGE 66, LINE 3836

| | | | | | | | | |
|---|---|---|---|---|---|---|---|---|
| 0000167660 | 5B91 | 8B57 | E8FB | EC3E | 5651 | 4ABE | 8900 | 6E3E |
| 0000167700 | E800 | EBCA | 595E | 8351 | 0CC6 | BE56 | 004A | A3E8 |
| 0000167720 | 5EEB | E856 | FF1B | B5E8 | 5EEB | E259 | 8BE9 | 5FF7 |
| 0000167740 | 8BC3 | 1036 | E800 | 001E | 8B56 | 1036 | 3B00 | 1236 |
| 0000167760 | 7500 | E803 | DE96 | C683 | 890C | 1036 | 8B00 | 103E |
| 0000170000 | 5E00 | 0CE8 | C3EC | 32BB | E8D5 | FF5D | 8BC3 | 103E |
| 0000170020 | 8B00 | 8BF7 | 0A44 | EF83 | E80C | 0019 | 368B | 0010 |
| 0000170040 | 368B | 0010 | 363B | 000E | 0375 | 6FE8 | 83DE | 0CEE |
| 0000170060 | 3689 | 0010 | 89C3 | 6E3E | E800 | EB40 | 00B0 | BABE |
| 0000170100 | E8D4 | FEC6 | 3673 | F78B | 24BF | E800 | EBC3 | BE56 |
| 0000170120 | D4C6 | 9CE8 | 89FE | 6E3E | E800 | EB18 | AEBE | E8D4 |
| 0000170140 | FE8F | 09E8 | 5EEB | 8B57 | BEFE | D4C6 | 82E8 | 89FE |
| 0000170160 | 6E3E | E800 | EB18 | E85E | EB0C | 01B0 | 8B50 | BBF7 |
| 0000170200 | D596 | E4E8 | 89FE | 6E3E | E800 | EAF0 | 0A58 | 74C0 |
| 0000170220 | BE09 | D4D2 | 5AE8 | E8FE | EAF4 | 8BC3 | 1036 | E800 |
| 0000170240 | 0001 | BBC3 | D606 | C0E8 | 57FE | F787 | 3E89 | 006E |
| 0000170260 | BBE8 | 8BEA | 5FF7 | 3E89 | 006E | BFE8 | FFEA | 0845 |
| 0000170300 | F78B | 8BC3 | 103E | 8B00 | 8BF7 | 0A44 | EF83 | E80C |
| 0000170320 | 0019 | 368B | 0010 | 368B | 0010 | 363B | 000E | 0375 |
| 0000170340 | B9E8 | 83DD | 0CEE | 3689 | 0010 | 56C3 | F78B | 32BF |
| 0000170360 | E800 | EB1D | FE8B | 575E | 3EBF | E800 | EB13 | 5D8B |
| 0000170400 | C708 | 0845 | 0000 | DEBE | E8D4 | FDFE | 0477 | 4DFF |
| 0000170420 | 4308 | BE53 | D4AE | D8E8 | 89FD | 6E3E | E800 | EA4E |
| 0000170440 | F78B | 5F5B | E853 | 0069 | 335B | 0BC0 | 74DB | 8B39 |
| 0000170460 | 79D0 | B204 | F780 | B9DB | 0010 | D149 | 73E3 | 57FB |
| 0000170500 | DBD1 | 3EBF | AB00 | ABAB | C38B | 8BAB | ABC1 | C28B |
| 0000170520 | BFAB | 0032 | 3EBE | 8900 | 6E3E | E800 | EA16 | F78B |
| 0000170540 | 895F | 6E3E | E800 | EA26 | 8BC3 | 103E | 8B00 | 8BF7 |
| 0000170560 | 0A44 | EF83 | E80C | 0019 | 368B | 0010 | 368B | 0010 |
| 0000170600 | 363B | 000E | 0375 | 13E8 | 83DD | 0CEE | 3689 | 0010 |
| 0000170620 | 57C3 | 24BF | E800 | EA79 | BE56 | D4EA | 52E8 | 89FD |
| 0000170640 | 6E3E | E800 | E9E8 | E85E | E9DC | 45FF | 8B08 | BBF7 |
| 0000170660 | D652 | B4E8 | 89FD | 6E3E | E800 | E9C0 | F78B | 895F |
| 0000170700 | 6E3E | E800 | E9AE | 00C3 | CCCD | CCCC | CCCC | CCCC |
| 0000170720 | 3FFB | CCCD | CCCC | CCCC | CCCC | CCCC | 3FFB | 8B55 |
| 0000170740 | 83EC | 0CEC | 5756 | 331E | 87C0 | 0A46 | 4689 | 8BFE |
| 0000170760 | 067E | 468B | 3614 | 45C6 | 2002 | C4F6 | 7480 | 800C |
| 0000171000 | 1566 | 367F | 45C6 | 2D02 | FF25 | 0B7F | 75C0 | 8B10 |
| 0000171020 | 0C46 | 460B | 0B0E | 1046 | 460B | 7412 | EB4D | 3D65 |
| 0000171040 | 7FFF | 6075 | 468B | 0B0C | 0E46 | 460B | 8B10 | 1246 |
| 0000171060 | 1775 | 46BE | 3D2C | 8000 | 1A74 | 003D | 75C0 | BE0A |
| 0000171100 | 2C4C | 8036 | 027D | 742D | BE0B | 2C38 | 00A9 | 7440 |
| 0000171120 | BE03 | 2C3F | C736 | 0105 | 1600 | 8D07 | 037D | C933 |
| 0000171140 | 0C8A | F341 | 33A4 | E9C0 | 017E | 7E8B | 3606 | 05C7 |
| 0000171160 | 0000 | C636 | 0245 | 3620 | 45C6 | 0003 | C636 | 0445 |
| 0000171200 | E900 | 0161 | FF33 | 7E8A | 8B13 | 1446 | C88B | 10BA |
| 0000171220 | F74D | 91E2 | 4DB0 | E4F6 | C803 | D713 | 9AB0 | E7F6 |
| 0000171240 | C803 | FA13 | E981 | 12F4 | DF81 | 1343 | F757 | 8DDF |
| 0000171260 | 0A46 | 5016 | B857 | 0001 | 9A50 | F57A | BCB1 | 815F |
| 0000171300 | 147E | 3FFF | 1272 | 8D47 | 0A46 | 5016 | A2B8 | 0EF0 |
| 0000171320 | 9A50 | F650 | F18C | E7EB | 5E8B | 3606 | 3F89 | 468B |
| 0000171340 | F7FE | 0846 | 0001 | 0774 | C703 | 0379 | 7BE9 | 3DFF |
| 0000171360 | 0015 | 0376 | 15B8 | 8900 | FE46 | 8940 | F446 | 468B |
| 0000171400 | 2D14 | 3FFE | D8F7 | E432 | 5E8B | 8B12 | 104E | 568B |
| 0000171420 | 8B0E | 0C76 | 7E8B | 0A0A | 74C0 | D110 | D1EB | D1D9 |
| 0000171440 | D1DA | D1DE | D0DF | FEDC | 75C8 | 16F0 | 8907 | F67E |
| 0000171460 | 7E8B | 8D06 | 047D | 7E87 | 32F6 | 89C0 | 145E | 4E89 |
| 0000171500 | 8912 | 1056 | 7689 | 890E | 0C7E | 6688 | D00B | D1E4 |
| 0000171520 | D1D7 | D1D6 | D1D2 | D1D1 | D0D3 | D0D0 | D1E4 | D1D7 |

THU MAR 14 17:21:24 1991 CLIENT.EXE PAGE 67, LINE 3895

| | | | | | | | | |
|---|---|---|---|---|---|---|---|---|
| 0000171540 | D1D6 | D1D2 | D1D1 | D0D3 | 02D0 | 0B66 | 7E13 | 130C |
| 0000171560 | 0E76 | 5613 | 1310 | 124E | 5E13 | 1414 | D000 | D1E4 |
| 0000171600 | D1D7 | D1D6 | D1D2 | D1D1 | D0D3 | 04D0 | 8730 | F67E |
| 0000171620 | 87AA | F67E | 4EFF | 75F4 | 8BA0 | F67E | 768B | 8306 |
| 0000171640 | 02EF | 353C | 2A72 | 4C8D | EB04 | 260B | 3D80 | 7539 |
| 0000171660 | 2611 | 05C6 | 4F30 | CF3B | F176 | 2647 | 05C6 | 3630 |
| 0000171700 | 04FF | FE26 | 2B05 | 8BF9 | 43DF | 8836 | 035C | 15EB |
| 0000171720 | 4E8B | E3FE | B008 | FD30 | AEF3 | 75FC | E903 | FE8A |
| 0000171740 | 3641 | 4C88 | B803 | 0001 | 5F1F | 8B5E | 5DE5 | 10CA |
| 0000171760 | 0000 | 0000 | 0000 | 0000 | 0000 | A000 | 4002 | 0000 |
| 0000172000 | 0000 | 0000 | 0000 | C800 | 4005 | 0000 | 0000 | 0000 |
| 0000172020 | 0000 | FA00 | 4008 | 0000 | 0000 | 0000 | D000 | 9C40 |
| 0000172040 | 400C | 0000 | 0000 | 0000 | 0000 | C350 | 400F | 0000 |
| 0000172060 | 0000 | 0000 | 0000 | F424 | 4012 | 0000 | 0000 | 0000 |
| 0000172100 | 8000 | 9896 | 4016 | 0000 | 0000 | 0000 | 2000 | BEBC |
| 0000172120 | 4019 | 0000 | 0000 | 0400 | C9BF | 8E1B | 4034 | 0000 |
| 0000172140 | A100 | CCED | 1BCE | D3C2 | 404E | F020 | B59E | 2B70 |
| 0000172160 | ADA8 | 9DC5 | 4069 | 5DD0 | 25FD | 1AE5 | 4F8E | EB19 |
| 0000172200 | 4083 | 9671 | 95D7 | 0E43 | 8D05 | AF29 | 409E | BFF9 |
| 0000172220 | 44A0 | 81ED | 8F12 | 82B1 | 40B9 | 3CBF | A6D5 | FFCF |
| 0000172240 | 1F49 | C278 | 40D3 | C66F | 8CE0 | 80E9 | 47C9 | 93BA |
| 0000172260 | 41A8 | 85BC | 556B | 3927 | F78D | E070 | 427C | DDBC |
| 0000172300 | DE8E | 9DF9 | EBFB | AA7E | 4351 | E6A1 | E376 | F2CC |
| 0000172320 | 2F29 | 8184 | 4426 | 1028 | AA17 | AEF8 | E310 | C4C5 |
| 0000172340 | 44FA | A7EB | F3D4 | EBF7 | 4AE1 | 957A | 45CF | CC65 |
| 0000172360 | 91C7 | A60E | A0AE | E319 | 46A3 | 650D | 0C17 | 8175 |
| 0000172400 | 7586 | C976 | 4D48 | 4258 | A7E4 | 3993 | 353B | B2B8 |
| 0000172420 | 53ED | A74D | 5DE5 | C53D | 3B5D | 9E8B | 5A92 | 5DFF |
| 0000172440 | F0A6 | 20A1 | 54C0 | 8CA5 | 6137 | FDD1 | 5A8B | D88B |
| 0000172460 | 5D25 | F989 | 67DB | 95AA | F3F8 | BF27 | C8A2 | DD5D |
| 0000172500 | 6E80 | C94C | 979B | 8A20 | 5202 | C460 | 7525 | CCCD |
| 0000172520 | CCCD | CCCC | CCCC | CCCC | 3FFB | 3D71 | D70A | 70A3 |
| 0000172540 | 0A3D | A3D7 | 3FF8 | 645A | DF3B | 8D4F | 6E97 | 8312 |
| 0000172560 | 3FF5 | D3C3 | 652C | E219 | 1758 | D1B7 | 3FF1 | 0FD0 |
| 0000172600 | 8423 | 1B47 | AC47 | A7C5 | 3FEE | A640 | 69B6 | AF6C |
| 0000172620 | BD05 | 8637 | 3FEB | 3D33 | 42BC | E57A | 94D5 | D6BF |
| 0000172640 | 3FE7 | FDC2 | CEFD | 8461 | 7711 | ABCC | 3FE4 | 4C2F |
| 0000172660 | E15B | C44D | 94BE | E695 | 3FC9 | C492 | 3B53 | 4475 |
| 0000172700 | 14CD | 9ABE | 3FAF | 67DE | 94BA | 4539 | 1EAD | CFB1 |
| 0000172720 | 3F94 | 2324 | E2C6 | BABC | 313B | 8B61 | 3F7A | 5561 |
| 0000172740 | C159 | B17E | 7C53 | BB12 | 3F5F | EED7 | 8D2F | BE06 |
| 0000172760 | 8592 | FB15 | 3F44 | 3F24 | E9A5 | A539 | EA27 | A87F |
| 0000173000 | 3F2A | AC7D | E4A1 | 64BC | 467C | DDD0 | 3E55 | 7B63 |
| 0000173020 | CC06 | 5423 | 8377 | 91FF | 3D81 | FA91 | 193A | 637A |
| 0000173040 | 4325 | C031 | 3CAC | 8921 | 38D1 | 4782 | B897 | FD00 |
| 0000173060 | 3BD7 | 88DC | 0858 | B11B | E3E8 | A686 | 3B03 | 84C6 |
| 0000173100 | 4245 | B607 | 7599 | DB37 | 3A2E | 7133 | D21C | DB23 |
| 0000173120 | EE32 | 9049 | 395A | 87A6 | C0BE | DA57 | 82A5 | A2A6 |
| 0000173140 | 32B5 | 68E2 | 11B2 | 52A7 | 449F | B759 | 2C10 | 4925 |
| 0000173160 | 2DE4 | 3436 | 534F | CEAE | 256B | 598F | A404 | DEC0 |
| 0000173200 | 7DC2 | E8FB | 1EC6 | E79E | 5A88 | 9157 | BF3C | 8350 |
| 0000173220 | 1822 | 4B4E | 6265 | 83FD | AF8F | 9406 | 117D | 2DE4 |
| 0000173240 | 9FDE | D2CE | 04C8 | A6DD | 0AD8 | 8B55 | 83EC | 06EC |
| 0000173260 | 5756 | 7E8B | BB08 | F262 | FF0B | 7A74 | 0579 | BEBB |
| 0000173300 | F7F3 | C7DF | FA46 | F618 | 7E83 | 0006 | 2075 | 46C7 |
| 0000173320 | 0EFA | 9BF6 | 7ED9 | 90FE | 8B9B | FE46 | 380D | 8900 |
| 0000173340 | FC46 | D99B | FC6E | 76C4 | 9B0A | DB26 | 026C | 5F57 |
| 0000173360 | C383 | 0B54 | 74FF | 8B23 | D1C7 | D1EF | D1EF | 57EF |
| 0000173400 | 0725 | 7400 | 53EA | E0D0 | E0D0 | E08A | E0D0 | C402 |

THU MAR 14 17:21:24 1991 CLIENT.EXE PAGE 68, LINE 3954

| | | | | | | | | |
|---|---|---|---|---|---|---|---|---|
| 0000173420 | E432 | D803 | 66FF | 5BFA | D5EB | 7E83 | 0006 | 1675 |
| 0000173440 | DB9B | 9BE2 | 6ED9 | C4FE | 0A76 | 269B | 7CDB | 2602 |
| 0000173460 | 04C7 | 0000 | 9B90 | 5E5F | E58B | CA5D | 0008 | 2E9B |
| 0000173500 | 6FDB | 9B02 | C9DE | CFEB | FF2E | 0A77 | FF2E | 0877 |
| 0000173520 | FF2E | 0677 | FF2E | 0477 | 8B2E | 024F | 8B2E | 3D07 |
| 0000173540 | 8000 | D183 | 51FF | 8B50 | FFC4 | 0C76 | 76FF | 160A |
| 0000173560 | 0E50 | 0BE8 | 8300 | 0CC4 | 9DEB | 6CE9 | E901 | 0154 |
| 0000173600 | 8B55 | 83EC | 12EC | 5756 | 09B9 | 8C00 | 8ED0 | 8DC0 |
| 0000173620 | EE7E | C033 | ABF3 | 76C5 | C40A | 067E | 448B | 260A |
| 0000173640 | 5D8B | 8B0A | 33C8 | 81CB | 00E1 | 8980 | FE4E | FFBA |
| 0000173660 | 237F | 3BC2 | 74C2 | 23C3 | 3BDA | 74DA | 8BBD | 03D0 |
| 0000173700 | 81D3 | FDFA | 77BF | 81B3 | BFFA | 763F | 0BB0 | 75C0 |
| 0000173720 | 42I1 | 048B | 440B | 0B02 | 0444 | 440B | 0B06 | 0844 |
| 0000173740 | 9B74 | DB0B | 1675 | 2642 | 058B | 0B26 | 0245 | 0B26 |
| 0000173760 | 0445 | 0B26 | 0645 | 0B26 | 0845 | 8174 | EA81 | 3FFE |
| 0000174000 | 5489 | 830A | 08C7 | 05B9 | 8D00 | EE5E | 5651 | 2657 |
| 0000174020 | 058B | 24F7 | 0136 | 3607 | 5711 | 3602 | 5783 | 0004 |
| 0000174040 | C683 | 8302 | 02EF | E7E2 | 5E5F | 8359 | 02C3 | C683 |
| 0000174060 | 8302 | FFC1 | D675 | 768B | 8B0A | F056 | 4E8B | 8BF2 |
| 0000174100 | F45E | 468B | 8BF6 | F87E | 7C83 | 000A | 147F | 5FEB |
| 0000174120 | 66D1 | D1EE | D1D2 | D1D1 | D1D3 | D1D0 | FFD7 | 0A4C |
| 0000174140 | 4D74 | FF0B | EA79 | 7E81 | 00EE | 7280 | 771F | F706 |
| 0000174160 | 01C2 | 7400 | 8317 | 01C2 | D183 | 8300 | 00D3 | 0015 |
| 0000174200 | 8300 | 00D7 | 0673 | 00BF | FF80 | 0A44 | 7C81 | FF0A |
| 0000174220 | 737F | 8956 | 087C | 4489 | 8906 | 045C | 4C89 | 8902 |
| 0000174240 | 8B14 | FE46 | 4409 | 5F0A | 8B5E | 5DE5 | 08CA | FF00 |
| 0000174260 | 0A4C | EFD1 | D8D1 | DBD1 | D9D1 | DAD1 | 5ED1 | 83EE |
| 0000174300 | FC56 | FF00 | 0A44 | EA75 | 7E83 | 00FC | 9874 | 4E83 |
| 0000174320 | 01EE | 92EB | C033 | 4489 | 890A | 0844 | 4489 | 8906 |
| 0000174340 | 0444 | 4489 | 8902 | EB04 | B8BE | 7FFF | 460B | 89FE |
| 0000174360 | 0A44 | C033 | 4489 | 8908 | 0644 | 4489 | 8904 | 0244 |
| 0000174400 | 0489 | A3EB | 8B55 | 83EC | 34EC | 5756 | C51E | 0876 |
| 0000174420 | C033 | 4689 | 8CF2 | F05E | 7689 | 89EE | EC46 | 4689 |
| 0000174440 | 89E8 | EA46 | 46C7 | 19E6 | 1600 | 8D07 | CC7E | 3CAC |
| 0000174460 | 7420 | 3CFB | 7409 | 3CF7 | 740A | 3CF3 | 740D | 0AEF |
| 0000174500 | 75C0 | E903 | 01F3 | 2B3C | 0974 | 2D3C | 0675 | 46C7 |
| 0000174520 | 00EC | AC80 | 303C | 0472 | 393C | 1076 | 2E3C | E375 |
| 0000174540 | 3CAC | 7230 | 3CDE | 7739 | EBDA | AC15 | 303C | FB74 |
| 0000174560 | C00A | 0775 | 894E | EE76 | C2E9 | 3C01 | 752E | AC12 |
| 0000174600 | 4EFF | 3CEA | 7430 | FFF8 | EA46 | C00A | E674 | 2BEB |
| 0000174620 | 3CAC | 7230 | 3C21 | 7739 | 2C1D | AA30 | 4EFF | 75E6 |
| 0000174640 | ACEF | 46FF | 3CEA | 7230 | 3C04 | 7639 | FFF4 | EA4E |
| 0000174660 | 2E3C | 1A74 | 21EB | 2E3C | 1D75 | 3CAC | 7230 | 3C18 |
| 0000174700 | 7739 | 2C14 | AA30 | 4EFF | FFEA | E64E | EC75 | 3CAC |
| 0000174720 | 7230 | 3C04 | 7639 | F7F7 | E65E | 4683 | 19E6 | 5C8D |
| 0000174740 | 89FF | EE5E | DB33 | 453C | 0E74 | 653C | 0A74 | 443C |
| 0000174760 | 0674 | 643C | C274 | 52EB | 3CAC | 742B | 3C09 | 752D |
| 0000175000 | C706 | E846 | FFFF | 3CAC | 7230 | 3C3F | 7739 | 2D3B |
| 0000175020 | 0030 | D88B | 3CAC | 7230 | 3C24 | 7739 | 2C20 | 8130 |
| 0000175040 | 66FB | 7706 | D10C | 03E3 | D1C3 | D1E3 | 03E3 | 79D8 |
| 0000175060 | BBE3 | 3FFF | 3CAC | 723D | 3C04 | 7639 | 33F7 | E85E |
| 0000175100 | 5E2B | 01E8 | EA5E | 894E | EE76 | 7E83 | 00E6 | 0375 |
| 0000175120 | EAE9 | 2600 | 05C6 | 4F00 | 7E83 | 18E6 | 1776 | 8A26 |
| 0000175140 | 2605 | 05C6 | FF00 | E64E | 46FF | 4FEA | 053C | 1472 |
| 0000175160 | FE26 | EB05 | 8315 | EA7E | 7400 | EB0F | 4F07 | 4EFF |
| 0000175200 | FFE6 | EA46 | 8026 | 003D | F374 | 8D16 | CC46 | FF50 |
| 0000175220 | E676 | 468D | 50F4 | 409A | 33FA | 8BBF | EA46 | C00B |
| 0000175240 | 2074 | 503D | 7C14 | E903 | 00A5 | B03D | 7FEB | E903 |
| 0000175260 | 0097 | 8D16 | F446 | FF50 | EA76 | 76FF | 9A06 | F57A |

THU MAR 14 17:21:24 1991 CLIENT.EXE PAGE 69, LINE 4013

| | | | | | | | | |
|---|---|---|---|---|---|---|---|---|
| 0000175300 | F969 | 468B | 8BFC | FA5E | 4E8B | 8BF8 | F656 | 7E81 |
| 0000175320 | 00F4 | 7280 | 771C | F706 | 01C2 | 7400 | 8314 | 01C2 |
| 0000175340 | D183 | 8300 | 00D3 | 0015 | 7300 | 8006 | 80CC | 46FF |
| 0000175360 | 8BFE | FE76 | FE81 | 7FFF | 5573 | F60B | 0A75 | F08B |
| 0000175400 | F30B | F10B | F20B | 4174 | 76C5 | 8910 | 0644 | 5C89 |
| 0000175420 | 8904 | 024C | 1489 | 46BB | 0BFE | EC46 | 4489 | C508 |
| 0000175440 | 0C76 | 468B | 89EE | 8B04 | F046 | 4489 | 8B02 | F246 |
| 0000175460 | 5F1F | 8B5E | 5DE5 | 0ECA | 8300 | F24E | C404 | 107E |
| 0000175500 | C033 | 05B9 | F300 | EBAB | 83D6 | F24E | EB01 | 83EE |
| 0000175520 | F24E | C5D2 | 1076 | FFB8 | 0B7F | EC46 | 4489 | C708 |
| 0000175540 | 0644 | 8000 | C033 | 4489 | 8904 | 0244 | 0489 | AFEB |
| 0000175560 | 8B55 | 83EC | 0CEC | 5756 | 468B | 8908 | F446 | 76C4 |
| 0000175600 | 330A | 8BC0 | 8BF8 | 8BD8 | 8BC8 | 26D0 | 148A | EB46 |
| 0000175620 | 893A | FE7E | 4689 | 89FC | FA5E | 4E89 | 89F8 | F656 |
| 0000175640 | 7BE8 | E800 | 0078 | 5603 | 13F6 | F84E | 5E13 | 13FA |
| 0000175660 | FC46 | 7E13 | E8FE | 0066 | 0226 | 4614 | D680 | 8300 |
| 0000175700 | 00D1 | D383 | 1500 | 0000 | D783 | FF00 | F44E | C175 |
| 0000175720 | 4EBE | EB40 | 8B0D | 8BF8 | 8BC3 | 8BD9 | 33CA | 83D2 |
| 0000175740 | 10EE | FF0B | EF74 | 0F78 | E2D1 | D1D1 | D3D1 | D0D1 |
| 0000175760 | D7D1 | 0B4E | 79FF | 56F1 | 768B | 3606 | 448F | 360A |
| 0000176000 | 7C89 | 3608 | 4489 | 3606 | 5C89 | 3604 | 4C89 | 3602 |
| 0000176020 | 1489 | C68B | D28C | 5E5F | E58B | CA5D | 0008 | E2D1 |
| 0000176040 | D1D1 | D3D1 | D0D1 | D7D1 | 9BC3 | 0301 | EF01 | 021A |
| 0000176060 | 7000 | 0500 | 9307 | 0425 | 0000 | 0500 | 7307 | 04A1 |
| 0000176100 | 0000 | 0500 | 5B07 | 04A1 | 0000 | 0500 | 0D07 | 04A1 |
| 0000176120 | 0000 | 0500 | B907 | 04F5 | 0000 | 0500 | FA07 | 04F5 |
| 0000176140 | 0000 | 0300 | 9301 | 0254 | 7100 | 0200 | 9000 | 01F9 |
| 0000176160 | 0000 | 0200 | 6700 | 02B1 | 0000 | 0200 | 2700 | 0398 |
| 0000176200 | 0000 | 0300 | D401 | 01D1 | 0500 | 0300 | 9501 | 0178 |
| 0000176220 | 0800 | 0200 | BE00 | 04D1 | 0000 | 0300 | 9601 | 024A |
| 0000176240 | 0100 | 0300 | F301 | 01AD | 8900 | 0300 | 3A01 | 021B |
| 0000176260 | 0200 | 0300 | E401 | 01B7 | 8A00 | 0300 | F701 | 0244 |
| 0000176300 | 0300 | 0300 | D001 | 0262 | 0400 | 0300 | 0901 | 0198 |
| 0000176320 | 8C00 | 0300 | 2B01 | 0198 | 8D00 | 0300 | 9201 | 0246 |
| 0000176340 | 0600 | 0300 | E901 | 0197 | 8E00 | 0300 | 4201 | 0211 |
| 0000176360 | 0700 | 0300 | D201 | 0276 | 0800 | 0200 | 0D00 | 06AF |
| 0000176400 | 0000 | 0300 | 8401 | 01BD | 9000 | 0300 | 0901 | 0246 |
| 0000176420 | 0A00 | 0300 | 8C01 | 0275 | 0B00 | 0300 | 1F01 | 0275 |
| 0000176440 | 0C00 | 0300 | F201 | 0248 | 0D00 | 0300 | CB01 | 0260 |
| 0000176460 | 0E00 | 0300 | 2401 | 025B | 0F00 | 0500 | 0407 | 0523 |
| 0000176500 | 0000 | 0500 | 1107 | 0544 | 0000 | 0500 | 0B07 | 0544 |
| 0000176520 | 0000 | 0500 | 0607 | 0544 | 0000 | 0500 | E707 | 0543 |
| 0000176540 | 0000 | 0500 | D207 | 0543 | 0000 | 0500 | CF07 | 0543 |
| 0000176560 | 0000 | 0500 | CA07 | 0543 | 0000 | 0500 | C507 | 0543 |
| 0000176600 | 0000 | 0500 | AF07 | 0543 | 0000 | 0500 | 6207 | 0542 |
| 0000176620 | 0000 | 0500 | 5C07 | 0542 | 0000 | 0500 | 5707 | 0542 |
| 0000176640 | 0000 | 0500 | 3807 | 0542 | 0000 | 0500 | 2307 | 0542 |
| 0000176660 | 0000 | 0500 | 2007 | 0542 | 0000 | 0500 | 1B07 | 0542 |
| 0000176700 | 0000 | 0500 | 1607 | 0542 | 0000 | 0500 | 0007 | 0542 |
| 0000176720 | 0000 | 0500 | 9F07 | 0545 | 0000 | 0500 | 9907 | 0545 |
| 0000176740 | 0000 | 0500 | 9407 | 0545 | 0000 | 0500 | 7507 | 0545 |
| 0000176760 | 0000 | 0500 | 6007 | 0545 | 0000 | 0500 | 5D07 | 0545 |
| 0000177000 | 0000 | 0500 | 5807 | 0545 | 0000 | 0500 | 5307 | 0545 |
| 0000177020 | 0000 | 0500 | 3D07 | 0545 | 0000 | 0500 | 3E07 | 054B |
| 0000177040 | 0000 | 0500 | 3807 | 054B | 0000 | 0500 | 3307 | 054B |
| 0000177060 | 0000 | 0500 | 1407 | 054B | 0000 | 0500 | FF07 | 054A |
| 0000177100 | 0000 | 0500 | FC07 | 054A | 0000 | 0500 | F707 | 054A |
| 0000177120 | 0000 | 0500 | F207 | 054A | 0000 | 0500 | DC07 | 054A |
| 0000177140 | 0000 | 0500 | EA07 | 0549 | 0000 | 05C0 | E407 | 0549 |

THU MAR 14 17:21:24 1991 CLIENT.EXE PAGE 70, LINE 4072

| | | | | | | | | |
|---|---|---|---|---|---|---|---|---|
| 0000177160 | 0000 | 0500 | DF07 | 0549 | 0000 | 0500 | C007 | 0549 |
| 0000177200 | 0000 | 0500 | AB07 | 0549 | 0000 | 0500 | A807 | 0549 |
| 0000177220 | 0000 | 0500 | A307 | 0549 | 0000 | 0500 | 9E07 | 0549 |
| 0000177240 | 0000 | 0500 | 8807 | 0549 | 0000 | 0500 | E107 | 054E |
| 0000177260 | 0000 | 0500 | DE07 | 054E | 0000 | 0500 | D907 | 054E |
| 0000177300 | 0000 | 0500 | D507 | 054E | 0000 | 0500 | C207 | 054E |
| 0000177320 | 0000 | 0500 | 9707 | 0552 | 0000 | 0500 | 9207 | 0552 |
| 0000177340 | 0000 | 0500 | 8A07 | 0552 | 0000 | 0500 | 8407 | 0552 |
| 0000177360 | 0000 | 0500 | 8107 | 0552 | 0000 | 0500 | 7C07 | 0552 |
| 0000177400 | 0000 | 0500 | 7807 | 0552 | 0000 | 0500 | 6507 | 0552 |
| 0000177420 | 0000 | 0500 | 0907 | 0551 | 0000 | 0500 | E607 | 0550 |
| 0000177440 | 0000 | 0500 | E107 | 0550 | 0000 | 0500 | D907 | 0550 |
| 0000177460 | 0000 | 0500 | D307 | 0550 | 0000 | 0500 | D007 | 0550 |
| 0000177500 | 0000 | 0500 | CB07 | 0550 | 0000 | 0500 | C707 | 0550 |
| 0000177520 | 0000 | 0500 | B407 | 0550 | 0000 | 0500 | 9907 | 054F |
| 0000177540 | 0000 | 0500 | 6907 | 0556 | 0000 | 0500 | 9A07 | 0555 |
| 0000177560 | 0000 | 0500 | 8A07 | 0555 | 0000 | 0500 | 6A07 | 0555 |
| 0000177600 | 0000 | 0500 | 6207 | 0555 | 0000 | 0500 | 4607 | 0555 |
| 0000177620 | 0000 | 0500 | 3C07 | 0555 | 0000 | 0500 | 3807 | 0555 |
| 0000177640 | 0000 | 0500 | 1D07 | 0555 | 0000 | 0500 | 0707 | 0555 |
| 0000177660 | 0000 | 0500 | 0207 | 0555 | 0000 | 0500 | FA07 | 0554 |
| 0000177700 | 0000 | 0500 | F407 | 0554 | 0000 | 0500 | F107 | 0554 |
| 0000177720 | 0000 | 0500 | EC07 | 0554 | 0000 | 0500 | E807 | 0554 |
| 0000177740 | 0000 | 0500 | D507 | 0554 | 0000 | 0500 | 9207 | 0553 |
| 0000177760 | 0000 | 0500 | 6F07 | 0553 | 0000 | 0500 | 6A07 | 0553 |
| 0000200000 | 0000 | 0500 | 6207 | 0553 | 0000 | 0500 | 5C07 | 0553 |
| 0000200020 | 0000 | 0500 | 5907 | 0553 | 0000 | 0500 | 5407 | 0553 |
| 0000200040 | 0000 | 0500 | 5007 | 0553 | 0000 | 0500 | 3D07 | 0553 |
| 0000200060 | 0000 | 0500 | BA07 | 0552 | 0000 | 0500 | 2807 | 0557 |
| 0000200100 | 0000 | 0500 | 1807 | 0557 | 0000 | 0500 | FE07 | 0556 |
| 0000200120 | 0000 | 0500 | F607 | 0556 | 0000 | 0500 | DA07 | 0556 |
| 0000200140 | 0000 | 0500 | D007 | 0556 | 0000 | 0500 | CC07 | 0556 |
| 0000200160 | 0000 | 0500 | B107 | 0556 | 0000 | 0500 | 9B07 | 0556 |
| 0000200200 | 0000 | 0500 | 9607 | 0556 | 0000 | 0500 | 8E07 | 0556 |
| 0000200220 | 0000 | 0500 | 8807 | 0556 | 0000 | 0500 | 8507 | 0556 |
| 0000200240 | 0000 | 0500 | 8007 | 0556 | 0000 | 0500 | 7C07 | 0556 |
| 0000200260 | 0000 | 0500 | 9707 | 055A | 0000 | 0500 | 7407 | 055A |
| 0000200300 | 0000 | 0500 | 6F07 | 055A | 0000 | 0500 | 6707 | 055A |
| 0000200320 | 0000 | 0500 | 6107 | 055A | 0000 | 0500 | 5E07 | 055A |
| 0000200340 | 0000 | 0500 | 5907 | 055A | 0000 | 0500 | 5507 | 055A |
| 0000200360 | 0000 | 0500 | 4207 | 055A | 0000 | 0500 | 6507 | 0559 |
| 0000200400 | 0000 | 0500 | 9107 | 0558 | 0000 | 0500 | 8E07 | 0558 |
| 0000200420 | 0000 | 0500 | 8907 | 0558 | 0000 | 0500 | 8507 | 0558 |
| 0000200440 | 0000 | 0500 | 7207 | 0558 | 0000 | 0500 | A907 | 055C |
| 0000200460 | 0000 | 0500 | 8607 | 055C | 0000 | 0500 | 8107 | 055C |
| 0000200500 | 0000 | 0500 | 7907 | 055C | 0000 | 0500 | 7307 | 055C |
| 0000200520 | 0000 | 0500 | 7007 | 055C | 0000 | 0500 | 6B07 | 055C |
| 0000200540 | 0000 | 0500 | 6707 | 055C | 0000 | 0500 | 5407 | 055C |
| 0000200560 | 0000 | 0500 | D207 | 055D | 0000 | 0500 | AF07 | 055D |
| 0000200600 | 0000 | 0500 | AA07 | 055D | 0000 | 0500 | A207 | 055D |
| 0000200620 | 0000 | 0500 | 9C07 | 055D | 0000 | 0500 | 9907 | 055D |
| 0000200640 | 0000 | 0500 | 9407 | 055D | 0000 | 0500 | 9007 | 055D |
| 0000200660 | 0000 | 0500 | 7D07 | 055D | 0000 | 0500 | 9A07 | 057F |
| 0000200700 | 0000 | 0500 | A907 | 057F | 0000 | 0500 | AD07 | 057F |
| 0000200720 | 0000 | 0500 | B107 | 057F | 0000 | 0500 | 1907 | 05A1 |
| 0000200740 | 0000 | 0500 | 1607 | 05A1 | 0000 | 0500 | 1107 | 05A1 |
| 0000200760 | 0000 | 0500 | 5D07 | 05BE | 0000 | 0500 | 8E07 | 05C2 |
| 0000201000 | 0000 | 0500 | 9C07 | 05C2 | 0000 | 0500 | A007 | 05C2 |
| 0000201020 | 0000 | 0500 | A307 | 05C2 | 0000 | 0500 | A607 | 05C2 |

THU MAR 14 17:21:24 1991 CLIENT.EXE PAGE 71, LINE 4131

| | | | | | | | | |
|---|---|---|---|---|---|---|---|---|
| 0000201040 | 0000 | 0500 | E507 | 05C2 | 0000 | 0500 | E807 | 05C2 |
| 0000201060 | 0000 | 0500 | FC07 | 05C2 | 0000 | 0500 | 0107 | 05C3 |
| 0000201100 | 0000 | 0500 | 0407 | 05C3 | 0000 | 0500 | A307 | 05F5 |
| 0000201120 | 0000 | 0500 | B207 | 05F5 | 0000 | 0500 | F007 | 05F5 |
| 0000201140 | 0000 | 0500 | F307 | 05F5 | 0000 | 0500 | 1307 | 05F6 |
| 0000201160 | 0000 | 0500 | 0807 | 05C5 | 0000 | 0500 | 1607 | 05C5 |
| 0000201200 | 0000 | 0500 | 6C07 | 05C5 | 0000 | 0500 | 8207 | 05C5 |
| 0000201220 | 0000 | 0500 | 8607 | 05C5 | 0000 | 0500 | CD07 | 05C6 |
| 0000201240 | 0000 | 0500 | D007 | 05C6 | 0000 | 0500 | D307 | 05C6 |
| 0000201260 | 0000 | 0500 | D707 | 05C6 | 0000 | 0500 | DA07 | 05C6 |
| 0000201300 | 0000 | 0500 | E607 | 05C6 | 0000 | 0500 | E907 | 05C6 |
| 0000201320 | 0000 | 0500 | EC07 | 05C6 | 0000 | 0500 | 0807 | 05C7 |
| 0000201340 | 0000 | 0500 | 7D07 | 05C7 | 0000 | 0500 | 1807 | 05C8 |
| 0000201360 | 0000 | 0500 | 1B07 | 05C8 | 0000 | 0500 | 1E07 | 05C8 |
| 0000201400 | 0000 | 0500 | A907 | 05CA | 0000 | 0300 | 3301 | 0249 |
| 0000201420 | 1200 | 0300 | 6E01 | 0203 | 1300 | 0300 | 2701 | 0256 |
| 0000201440 | 1400 | 0300 | 6901 | 026C | 1500 | 0300 | FB01 | 0252 |
| 0000201460 | 1600 | 0300 | A401 | 0202 | 1700 | 0500 | 1101 | 01BF |
| 0000201500 | 8700 | 0300 | 0001 | 025A | 1800 | 0500 | 1501 | 01B7 |
| 0000201520 | 8800 | 0300 | A701 | 020F | 1900 | 0300 | 1F01 | 015D |
| 0000201540 | 2100 | 0300 | D401 | 0221 | 1A00 | 0300 | D401 | 01AF |
| 0000201560 | 2200 | 0300 | 3001 | 0258 | 1B00 | 0300 | DF01 | 0270 |
| 0000201600 | 1C00 | 0300 | 7E01 | 025E | 1D00 | 0300 | EA01 | 0219 |
| 0000201620 | 1E00 | 0300 | 6C01 | 01B1 | 2600 | 0300 | 4901 | 0234 |
| 0000201640 | 1F00 | 0300 | C101 | 01CC | 2700 | 0300 | 1E01 | 0217 |
| 0000201660 | 2100 | 0300 | A701 | 0133 | 2900 | 0300 | 9D01 | 02DC |
| 0000201700 | 2200 | 0300 | EE01 | 0208 | 2300 | 0300 | A701 | 01CB |
| 0000201720 | 2B00 | 0300 | B201 | 0269 | 2400 | 0300 | D801 | 0277 |
| 0000201740 | 2500 | 0300 | 9E01 | 022B | 2600 | 0300 | E601 | 0228 |
| 0000201760 | 2700 | 0300 | 8F01 | 012A | 2F00 | 0300 | CE01 | 012A |
| 0000202000 | 3000 | 0300 | 6B01 | 0275 | 2800 | 0300 | 8001 | 024E |
| 0000202020 | 2A00 | 0300 | 8901 | 0204 | 2B00 | 0300 | 6401 | 0222 |
| 0000202040 | 2C00 | 0300 | 4301 | 01CC | 3400 | 0300 | 2B01 | 0268 |
| 0000202060 | 2D00 | 0300 | DA01 | 020B | 2E00 | 0300 | 1C01 | 0204 |
| 0000202100 | 2F00 | 0500 | 9C07 | 0225 | 0000 | 0500 | 1107 | 0623 |
| 0000202120 | 0000 | 0500 | 0D07 | 0223 | 0000 | 0500 | A007 | 0625 |
| 0000202140 | 0000 | 0500 | 1E07 | 0644 | 0000 | 0500 | 1A07 | 0244 |
| 0000202160 | 0000 | 0500 | 0F07 | 0644 | 0000 | 0500 | D607 | 0643 |
| 0000202200 | 0000 | 0500 | 6F07 | 0642 | 0000 | 0500 | 6B07 | 0242 |
| 0000202220 | 0000 | 0500 | 6007 | 0642 | 0000 | 0500 | 2707 | 0642 |
| 0000202240 | 0000 | 0500 | AC07 | 0645 | 0000 | 0500 | A807 | 0245 |
| 0000202260 | 0000 | 0500 | 9D07 | 0645 | 0000 | 0500 | 6407 | 0645 |
| 0000202300 | 0000 | 0500 | 4B07 | 064B | 0000 | 0500 | 4707 | 024B |
| 0000202320 | 0000 | 0500 | 3C07 | 064B | 0000 | 0500 | 0307 | 064B |
| 0000202340 | 0000 | 0500 | F707 | 0649 | 0000 | 0500 | F307 | 0249 |
| 0000202360 | 0000 | 0500 | E807 | 0649 | 0000 | 0500 | AF07 | 0649 |
| 0000202400 | 0000 | 0500 | E507 | 064E | 0000 | 0500 | 9C07 | 0652 |
| 0000202420 | 0000 | 0500 | 8807 | 0652 | 0000 | 0500 | 1607 | 0651 |
| 0000202440 | 0000 | 0500 | 1207 | 0251 | 0000 | 0500 | EB07 | 0650 |
| 0000202460 | 0000 | 0500 | D707 | 0650 | 0000 | 0500 | A607 | 064F |
| 0000202500 | 0000 | 0500 | A207 | 024F | 0000 | 0500 | A707 | 0655 |
| 0000202520 | 0000 | 0500 | A307 | 0255 | 0000 | 0500 | 9807 | 0655 |
| 0000202540 | 0000 | 0500 | 9407 | 0255 | 0000 | 0500 | 6F07 | 0655 |
| 0000202560 | 0000 | 0500 | 4007 | 0655 | 0000 | 0500 | 0C07 | 0655 |
| 0000202600 | 0000 | 0500 | F807 | 0654 | 0000 | 0500 | 9F07 | 0653 |
| 0000202620 | 0000 | 0500 | 9B07 | 0253 | 0000 | 0500 | 7407 | 0653 |
| 0000202640 | 0000 | 0500 | 6007 | 0653 | 0000 | 0500 | C707 | 0652 |
| 0000202660 | 0000 | 0500 | C307 | 0252 | 0000 | 0500 | 3507 | 0657 |
| 0000202700 | 0000 | 0500 | 3107 | 0257 | 0000 | 0500 | 2607 | 0657 |

THU MAR 14 17:21:24 1991 CLIENT.EXE PAGE 72, LINE 4190

```
0000202720  0000  0500  2207  0257  0000  0500  0307  0657
0000202740  0000  0500  D407  0656  0000  0500  A007  0656
0000202760  0000  0500  8C07  0656  0000  0500  A407  065A
0000203000  0000  0500  A007  025A  0000  0500  7907  065A
0000203020  0000  0500  6507  065A  0000  0500  7207  0659
0000203040  0000  0500  6E07  0259  0000  0500  9507  0658
0000203060  0000  0500  B607  065C  0000  0500  B207  025C
0000203100  0000  0500  8B07  065C  0000  0500  7707  065C
0000203120  0000  0500  DF07  065D  0000  0500  DB07  025D
0000203140  0000  0500  B407  065D  0000  0500  A007  065D
0000203160  0000  0300  5101  0260  3000  0500  9E07  067F
0000203200  0000  0500  7707  06A1  0000  0500  5407  02A1
0000203220  0000  0500  1D07  06A1  0000  0500  9207  06C2
0000203240  0000  0500  A907  06C2  0000  0500  EC07  06C2
0000203260  0000  0500  0807  06C3  0000  0500  A707  06F5
0000203300  0000  0500  0407  06F6  0000  0500  0C07  06C5
0000203320  0000  0500  7007  06C5  0000  0500  DE07  06C6
0000203340  0000  0500  F007  06C6  0000  0500  2207  06C8
0000203360  0000  0300  C701  0209  3200  0300  1F01  01AE
0000203400  3A00  0300  0101  0224  3300  0300  0901  0203
0000203420  3400  0300  9301  020D  3500  0300  EE01  026A
0000203440  3600  0300  B501  022B  3700  0300  9901  026D
0000203460  3800  0300  1301  0269  3900  0300  1C01  024B
0000203500  3A00  0300  0101  021F  3B00  0300  B501  0266
0000203520  3C00  0300  BF01  024B  3D00  0300  6301  026E
0000203540  3F00  0300  6101  01BF  4700  0300  A101  022F
0000203560  4000  0300  C601  01C4  4800  0300  7601  021B
0000203600  4100  0300  3701  024C  4200  0300  D001  0226
0000203620  4300  0300  F001  019F  4B00  0300  6001  0214
0000203640  4400  0300  F301  017F  4D00  0300  0301  0219
0000203660  4600  0300  7801  0212  4800  0300  1601  021E
0000203700  4900  0300  D601  01C4  5100  0300  3301  021E
0000203720  4A00  0300  1601  0233  4B00  0300  B401  026D
0000203740  4D00  0300  DB01  017F  5500  0300  7A01  0276
0000203760  4E00  0300  6C01  0277  4F00  0300  2201  0210
0000204000  5000  0500  E107  03C2  0000  0500  F807  03C2
0000204020  0000  0500  0E07  03F6  0000  0500  A507  03CA
0000204040  0000  0300  A901  0227  5100  0300  7701  01CC
0000204060  5900  0300  C901  0268  5200  0300  8E01  021F
0000204100  5300  0300  3F01  0202  5400  0300  2301  0252
0000204120  5500  0300  1701  0247  5600  0300  6501  0218
0000204140  5700  0300  AB01  021F  5800  0300  5701  021A
0000204160  5900  0300  D301  023F  5A00  0300  1201  025C
0000204200  5B00  0300  0E01  024C  5C00  0300  D701  026D
0000204220  5D00  0300  DD01  025F  5E00  0300  E901  0275
0000204240  5F00  0300  6501  022D  6000  0300  5101  0213
0000204260  6100  0300  B401  0270  6200  0300  BB01  020E
0000204300  6300  0300  A701  0267  6400  0300  BA01  0241
0000204320  6500  0300  C401  021A  6600  0300  BC01  026B
0000204340  6700  0300  FA01  0207  6900  0300  9F01  0261
0000204360  6B00  0300  7201  0250  6D00  0300  3B01  025D
0000204400  6F00  0000  0000  0000  0000  0000  0000  0000
0000204420  0000  0000  3270  0000  0000  0000  0000  0000
0000204440  0000  0000  0000  0000  0000  0000  0000  0000
*
0000204520  0000  0000  0200  0000  0000  0000  0000  0000
0000204540  0000  0000  0000  0000  0000  0000  0000  0000
*
0000204620  0000  0000  0200  0000  0000  0000  0000  0000
```

THU MAR 14 17:21:24 1991 CLIENT.EXE PAGE 73, LINE 4249

| | | | | | | | | |
|---|---|---|---|---|---|---|---|---|
| 0000204640 | 0000 | 0000 | 0000 | 0000 | 0000 | 0000 | 0000 | 0000 |
| * | | | | | | | | |
| 0000204720 | 0000 | 0000 | 0200 | 0000 | 0000 | 0000 | 0000 | 0000 |
| 0000204740 | 0000 | 0000 | 0000 | 0000 | 0000 | 0000 | 0000 | 00B1 |
| 0000204760 | 0000 | 0129 | 0000 | 0000 | 0000 | 0000 | 0000 | 0000 |
| 0000205000 | 0000 | 0000 | 0000 | 0000 | 0000 | 0000 | 0000 | 0000 |
| * | | | | | | | | |
| 0000205120 | 0000 | 0000 | 0000 | 0000 | 0000 | 0000 | 0001 | 0000 |
| 0000205140 | 0000 | 0000 | 0000 | 0000 | 534D | 5220 | 6E75 | 542D |
| 0000205160 | 6D69 | 2065 | 694C | 7262 | 7261 | 2079 | 202D | 6F43 |
| 0000205200 | 7970 | 6972 | 6867 | 2074 | 6328 | 2029 | 3931 | 3039 |
| 0000205220 | 202C | 694D | 7263 | 736F | 666F | 2074 | 6F43 | 7072 |
| 0000205240 | 0018 | 2520 | 786C | 0000 | 0000 | 4420 | 6972 | 6576 |
| 0000205260 | 6E20 | 6D61 | 2065 | 3E2D | 0020 | 7420 | 7079 | 2D20 |
| 0000205300 | 203E | 0000 | 4F20 | 6A62 | 4C20 | 6170 | 6874 | 202C |
| 0000205320 | 4449 | 2D20 | 203E | 0000 | 4F20 | 6A62 | 4C20 | 6170 |
| 0000205340 | 6874 | 202C | 4449 | 202C | 6353 | 706F | 2065 | 3E2D |
| 0000205360 | 0020 | 7325 | 0000 | 7525 | 0000 | 6325 | 0000 | 000A |
| 0000205400 | 7265 | 2072 | 6F63 | 6564 | 2520 | 2E75 | 000A | 7325 |
| 0000205420 | 2520 | 0073 | 7325 | 2520 | 2075 | 7325 | 0000 | 5320 |
| 0000205440 | 6372 | 4C20 | 6170 | 6874 | 202C | 7253 | 2063 | 4449 |
| 0000205460 | 202C | 7344 | 2074 | 704C | 7461 | 2C68 | 4420 | 7473 |
| 0000205500 | 4920 | 2C44 | 4F20 | 6576 | 2872 | 7C30 | 2931 | 2D20 |
| 0000205520 | 203E | 0000 | 2A20 | 6720 | 7465 | 6E5F | 6D75 | 2D20 |
| 0000205540 | 2520 | 0A64 | 0000 | 200A | 7257 | 7469 | 2065 | 6F4D |
| 0000205560 | 6564 | 6920 | 2073 | 6843 | 6F6F | 6573 | 206E | 2121 |
| 0000205600 | 0A21 | 2000 | 7264 | 7669 | 5F65 | 616E | 656D | 202C |
| 0000205620 | 6870 | 7379 | 6369 | 6C61 | 705F | 7461 | 2068 | 3028 |
| 0000205640 | 202C | 2931 | 2D20 | 203E | 0A00 | 2E00 | 0000 | 2A20 |
| 0000205660 | 4320 | 6572 | 7461 | 2065 | 7254 | 6565 | 2D20 | 2520 |
| 0000205700 | 0A64 | 0A00 | 2E00 | 2000 | 202A | 6552 | 6F6D | 6576 |
| 0000205720 | 5420 | 6572 | 2065 | 202D | 6425 | 000A | 000A | 002E |
| 0000205740 | 2A20 | 4C20 | 616F | 2064 | 7254 | 6565 | 2D20 | 2520 |
| 0000205760 | 0A64 | 0A00 | 2E00 | 2000 | 202A | 6E55 | 6F6C | 6461 |
| 0000206000 | 5420 | 6572 | 2065 | 202D | 6425 | 000A | 4C20 | 676F |
| 0000206020 | 6369 | 6C61 | 5020 | 7461 | 2068 | 3028 | 312C | 2C29 |
| 0000206040 | 4620 | 6C6F | 6564 | 2072 | 4449 | 2D20 | 203E | 0A00 |
| 0000206060 | 2E00 | 0000 | 2A20 | 5320 | 7465 | 4320 | 7275 | 6572 |
| 0000206100 | 746E | 4620 | 6C6F | 6564 | 2072 | 202D | 6425 | 000A |
| 0000206120 | 4420 | 6972 | 6576 | 7320 | 7465 | 2820 | 2D30 | 6E61 |
| 0000206140 | 2C79 | 3120 | 542D | 3231 | 2C33 | 3220 | 6E2D | 6E6F |
| 0000206160 | 5420 | 3231 | 2933 | 2D20 | 203E | 25C0 | 0064 | 000A |
| 0000206200 | 002E | 2A20 | 4C20 | 7369 | 2074 | 7264 | 7669 | 7365 |
| 0000206220 | 203A | 6425 | 000A | 2020 | 7325 | 002C | 2D2D | 2520 |
| 0000206240 | 2073 | 2820 | 2520 | 786C | 2920 | 000A | 4C20 | 7369 |
| 0000206260 | 2074 | 6843 | 6C69 | 7364 | 4620 | 6961 | 656C | 2064 |
| 0000206300 | 2D20 | 2020 | 6425 | 000A | 2020 | 7C20 | 2000 | 7250 |
| 0000206320 | 202E | 704C | 7461 | 2C68 | 5020 | 2E72 | 4920 | 2C44 |
| 0000206340 | 4E20 | 6D61 | 2C65 | 5420 | 7079 | 2C65 | 5020 | 7968 |
| 0000206360 | 5F73 | 6170 | 6874 | 2D20 | 203E | 0A00 | 2E00 | 0000 |
| 0000206400 | 2000 | 202A | 7243 | 6165 | 6574 | 4620 | 2057 | 624F |
| 0000206420 | 206A | 6843 | 6C69 | 2D64 | 2520 | 2064 | 202C | 4920 |
| 0000206440 | 2044 | 203D | 6C25 | 2075 | 202C | 6C25 | 2078 | 000A |
| 0000206460 | 4F20 | 6A62 | 4C20 | 6170 | 6874 | 202C | 7954 | 6570 |
| 0000206500 | 202C | 6850 | 7379 | 705F | 7461 | 2068 | 3E2D | 0020 |
| 0000206520 | 000A | 002E | 0000 | 2A20 | 4320 | 6572 | 7461 | 2065 |
| 0000206540 | 5746 | 4F20 | 6A62 | 2D20 | 2520 | 2064 | 202C | 4920 |
| 0000206560 | 2044 | 203D | 6C25 | 2075 | 202C | 6C25 | 2078 | 000A |
| 0000206600 | 000A | 002E | 2000 | 202A | 6544 | 656C | 6574 | 4620 |

THU MAR 14 17:21:24 1991 CLIENT.EXE PAGE 74, LINE 4308

| | | | | | | | | |
|---|---|---|---|---|---|---|---|---|
| 0000206620 | 2057 | 624F | 206A | 202D | 6425 | 000A | 2020 | 6146 |
| 0000206640 | 6C69 | 6465 | 4920 | 2044 | 203D | 2520 | 756C | 2C20 |
| 0000206660 | 2520 | 786C | 0A20 | 0A00 | 2E00 | 0000 | 2A20 | 4720 |
| 0000206700 | 7465 | 4620 | 2057 | 624F | 206A | 202D | 6425 | 000A |
| 0000206720 | 4920 | 2044 | 203D | 6C25 | 2075 | 202C | 6C25 | 2078 |
| 0000206740 | 202C | 2020 | 614E | 656D | 3D20 | 2520 | 2073 | 202C |
| 0000206760 | 2020 | 7954 | 6570 | 3D20 | 2520 | 2075 | 0A00 | 5020 |
| 0000207000 | 7968 | 6973 | 6163 | 206C | 6150 | 6874 | 3D20 | 2520 |
| 0000207020 | 0A73 | 2C00 | 2020 | 5420 | 6D69 | 2065 | 203D | 6C25 |
| 0000207040 | 0A64 | 5020 | 7968 | 6973 | 6163 | 206C | 6150 | 6874 |
| 0000207060 | 3D20 | 2520 | 0A73 | 2000 | 624F | 206A | 704C | 7461 |
| 0000207100 | 2068 | 3E2D | 0020 | 000A | 002E | 2000 | 202A | 5746 |
| 0000207120 | 4F20 | 6A62 | 4920 | 2044 | 7266 | 6D6F | 5020 | 7461 |
| 0000207140 | 2068 | 202D | 6425 | 2C20 | 2020 | 4449 | 3D20 | 2520 |
| 0000207160 | 756C | 2C20 | 2520 | 786C | 000A | 000A | 002E | 2000 |
| 0000207200 | 202A | 5746 | 4F20 | 6A62 | 5020 | 7461 | 2068 | 7266 |
| 0000207220 | 6D6F | 4920 | 2044 | 202D | 6425 | 2C20 | 0020 | 2020 |
| 0000207240 | 4C20 | 676F | 6150 | 6874 | 3D20 | 2520 | 2073 | 000A |
| 0000207260 | 000A | 002E | 2000 | 202A | 694C | 7473 | 4620 | 2057 |
| 0000207300 | 624F | 206A | 6843 | 6C69 | 7364 | 2D20 | 2520 | 0A64 |
| 0000207320 | 2000 | 7525 | 2029 | 2520 | 2073 | 2C20 | 2020 | 6C25 |
| 0000207340 | 2078 | 000A | 000A | 002E | 2000 | 202A | 6547 | 2074 |
| 0000207360 | 5746 | 5020 | 7261 | 6E65 | 2074 | 202D | 6425 | 000A |
| 0000207400 | 5020 | 7261 | 6E65 | 2074 | 4449 | 3D20 | 2520 | 786C |
| 0000207420 | 2C20 | 2020 | 6150 | 6572 | 746E | 4E20 | 6D61 | 2065 |
| 0000207440 | 203D | 7325 | 5A20 | 2000 | 624F | 206A | 704C | 7461 |
| 0000207460 | 2C68 | 4920 | 2C44 | 4C20 | 7665 | 6C65 | 2D20 | 203E |
| 0000207500 | 0A00 | 2E00 | 0000 | 2A20 | 4C20 | 7369 | 2074 | 6146 |
| 0000207520 | 6C69 | 6465 | 2820 | 6547 | 2074 | 5746 | 4F20 | 6A62 |
| 0000207540 | 2029 | 202D | 6425 | 000A | 5720 | 6168 | 2074 | 2061 |
| 0000207560 | 7254 | 6565 | 0A20 | 2000 | 7242 | 7272 | 7272 | 7272 |
| 0000207600 | 2072 | 000A | 000A | 002E | 0000 | 2A20 | 4320 | 706F |
| 0000207620 | 2079 | 5746 | 4F20 | 6A62 | 2D20 | 2520 | 2064 | 202C |
| 0000207640 | 2020 | 4920 | 2044 | 203D | 6C25 | 2075 | 202C | 6C25 |
| 0000207660 | 2078 | 000A | 000A | 002E | 0000 | 2A20 | 4D20 | 766F |
| 0000207700 | 2065 | 5746 | 4F20 | 6A62 | 2D20 | 2520 | 2064 | 202C |
| 0000207720 | 2020 | 4920 | 2044 | 203D | 6C25 | 2075 | 202C | 6C25 |
| 0000207740 | 2078 | 000A | 000A | 002E | 2000 | 202A | 624F | 656A |
| 0000207760 | 7463 | 7320 | 7A69 | 2065 | 203D | 6C25 | 2C75 | 7320 |
| 0000210000 | 2074 | 203D | 6425 | 000A | 4C20 | 7665 | 6C65 | 6F20 |
| 0000210020 | 2066 | 6863 | 6365 | 736B | 0A3A | 0900 | 3009 | 2D20 |
| 0000210040 | 4820 | 6569 | 6172 | 6372 | 7968 | 6F20 | 6C6E | 2C79 |
| 0000210060 | 2031 | 202D | 6948 | 7265 | 7261 | 6863 | 2079 | 2026 |
| 0000210100 | 4453 | 2742 | 0A73 | 0900 | 3209 | 2D20 | 4820 | 6569 |
| 0000210120 | 6172 | 6372 | 7968 | 532C | 4244 | 7327 | 2620 | 6920 |
| 0000210140 | 616D | 6567 | 6620 | 6C69 | 7365 | 000A | 4F20 | 6A62 |
| 0000210160 | 4C20 | 6170 | 6874 | 202C | 4449 | 2C20 | 656C | 6576 |
| 0000210200 | 2C6C | 6620 | 7869 | 2820 | 2D30 | 756A | 7473 | 7220 |
| 0000210220 | 7065 | 726F | 2C74 | 2D31 | 6966 | 2078 | 7265 | 6F72 |
| 0000210240 | 7372 | 2029 | 3E2D | 0020 | 000A | 002E | 2500 | 2075 |
| 0000210260 | 6E49 | 6574 | 7267 | 7469 | 2079 | 7245 | 6F72 | 2872 |
| 0000210300 | 2973 | 6620 | 756F | 646E | 000A | 6854 | 2065 | 6F66 |
| 0000210320 | 6C6C | 776F | 6E69 | 2067 | 626F | 656A | 7463 | 2073 |
| 0000210340 | 6163 | 7375 | 2065 | 7270 | 626F | 656C | 736D | 203A |
| 0000210360 | 000A | 624F | 656A | 7463 | 2020 | 2070 | 2020 | 2020 |
| 0000210400 | 2020 | 2020 | 2020 | 2020 | 2020 | 2020 | 2020 | 2020 |
| 0000210420 | 2020 | 2020 | 2020 | 2020 | 2020 | 6449 | 2020 | 2020 |
| 0000210440 | 2020 | 2020 | 5020 | 6F72 | 6C62 | 6D65 | 415C | 7463 |
| 0000210460 | 6F69 | 206E | 6154 | 656B | 206E | 2020 | 2020 | 2020 |

THU MAR 14 17:21:24 1991 CLIENT.EXE PAGE 75, LINE 4367

| | | | | | | | | |
|---|---|---|---|---|---|---|---|---|
| 0000210500 | 0A20 | 2D00 | 2D2D | 2D2D | 2D2D | 2D2D | 2D2D | 2D2D |
| 0000210520 | 2D2D | 2D2D | 2D2D | 2D2D | 2D2D | 2D2D | 2D2D | 2D2D |
| * | | | | | | | | |
| 0000210600 | 2D2D | 2D2D | 2D2D | 2D2D | 2D2D | 2D2D | 2D2D | 000A |
| 0000210620 | 2D20 | 0020 | 6F44 | 7365 | 276E | 2074 | 7865 | 7369 |
| 0000210640 | 2074 | 6E6F | 6420 | 7369 | 0A6B | 4400 | 6C65 | 7465 |
| 0000210660 | 6465 | 2D20 | 4120 | 6320 | 6968 | 646C | 5420 | 2050 |
| 0000210700 | 7369 | 6D20 | 7369 | 6973 | 676E | 000A | 6F43 | 6C75 |
| 0000210720 | 2764 | 2074 | 6564 | 656C | 6574 | 202E | 4843 | 4345 |
| 0000210740 | 214B | 000A | 624F | 656A | 7463 | 6420 | 6C65 | 7465 |
| 0000210760 | 6465 | 6620 | 6F72 | 206D | 7274 | 6565 | 000A | 2041 |
| 0000211000 | 4554 | 5453 | 4F20 | 6A62 | 7720 | 7469 | 6F68 | 7475 |
| 0000211020 | 5420 | 0A50 | 4200 | 6461 | 4220 | 7274 | 6569 | 6576 |
| 0000211040 | 6620 | 6C69 | 2065 | 000A | 6142 | 2064 | 626F | 656A |
| 0000211060 | 7463 | 2D20 | 7220 | 6365 | 766F | 7265 | 6465 | 000A |
| 0000211100 | 6E75 | 6E6B | 776F | 206E | 7265 | 6F72 | 2072 | 6425 |
| 0000211120 | 0A20 | 2500 | 342D | 7330 | 2D25 | 6C39 | 2578 | 2E2D |
| 0000211140 | 3233 | 0073 | 6946 | 2078 | 6C66 | 6761 | 6920 | 2073 |
| 0000211160 | 6166 | 736C | 2C65 | 6F6E | 6874 | 6E69 | 2067 | 6F64 |
| 0000211200 | 656E | 202E | 000A | 6568 | 2179 | 6820 | 7965 | 2021 |
| 0000211220 | 7254 | 6565 | 6920 | 2073 | 4B4F | 000A | 7274 | 756F |
| 0000211240 | 6C62 | 2165 | 5320 | 6174 | 7574 | 2073 | 7369 | 2520 |
| 0000211260 | 2075 | 000A | 7420 | 7365 | 2074 | 6170 | 6874 | 616E |
| 0000211300 | 656D | 202C | 6469 | 202C | 6361 | 6563 | 7373 | 6D20 |
| 0000211320 | 646F | 2065 | 5228 | 452C | 2C52 | 2C57 | 5745 | 412C |
| 0000211340 | 2029 | 3E2D | 0020 | 000A | 002E | 2A20 | 6F20 | 6570 |
| 0000211360 | 206E | 202D | 6425 | 2020 | 2820 | 6C25 | 2978 | 0A20 |
| 0000211400 | 2000 | 6554 | 7473 | 4920 | 2044 | 3028 | 2C29 | 4620 |
| 0000211420 | 726F | 6563 | 6620 | 616C | 2067 | 3028 | 312C | 2029 |
| 0000211440 | 3E2D | 0020 | 000A | 002E | 2A20 | 6320 | 6F6C | 6573 |
| 0000211460 | 2D20 | 2520 | 0A64 | 5400 | 7365 | 2074 | 4449 | 2D20 |
| 0000211500 | 203E | 0A00 | 2E00 | 2000 | 202A | 7543 | 7272 | 6E65 |
| 0000211520 | 2074 | 6554 | 7473 | 2D20 | 2520 | 786C | 000A | 7420 |
| 0000211540 | 7079 | 2C20 | 6120 | 6363 | 7365 | 2073 | 6F6D | 6564 |
| 0000211560 | 2820 | 2C52 | 5245 | 572C | 452C | 2C57 | 2941 | 2D20 |
| 0000211600 | 003E | 000A | 002E | 2A20 | 4C20 | 616F | 2064 | 4453 |
| 0000211620 | 2042 | 202D | 6425 | 000A | 000A | 002E | 2A20 | 5520 |
| 0000211640 | 6C6E | 616F | 2064 | 4453 | 2042 | 202D | 6425 | 000A |
| 0000211660 | 000A | 002E | 2A20 | 5220 | 6D65 | 766F | 2065 | 4453 |
| 0000211700 | 2042 | 202D | 6425 | 000A | 4521 | 706D | 7974 | 0021 |
| 0000211720 | 2A20 | 4120 | 6363 | 7365 | 2073 | 6353 | 6972 | 7470 |
| 0000211740 | 2D20 | 2520 | 2064 | 202C | 4620 | 6C69 | 2065 | 203A |
| 0000211760 | 7325 | 000A | 2A20 | 5220 | 6C65 | 6165 | 6573 | 5320 |
| 0000212000 | 7263 | 7069 | 2074 | 202D | 6425 | 000A | 2A20 | 4720 |
| 0000212020 | 7465 | 4820 | 6165 | 6564 | 2072 | 202D | 6425 | 000A |
| 0000212040 | 4C46 | 5400 | 0053 | 5054 | 5400 | 0043 | 5254 | 5500 |
| 0000212060 | 4B4E | 4F4E | 4E57 | 2000 | 614E | 656D | 203A | 7325 |
| 0000212100 | 2C20 | 2020 | 5420 | 7079 | 3A65 | 2520 | 2073 | 202C |
| 0000212120 | 2020 | 7541 | 6874 | 726F | 203A | 7325 | 000A | 4420 |
| 0000212140 | 7461 | 3A65 | 2520 | 2073 | 7546 | 636E | 203A | 7325 |
| 0000212160 | 2C20 | 2020 | 5320 | 6570 | 3A63 | 2520 | 0A73 | 2100 |
| 0000212200 | 6D45 | 7470 | 2179 | 2100 | 6D45 | 7470 | 2179 | 2000 |
| 0000212220 | 6544 | 6373 | 203A | 7325 | 200A | 4354 | 4320 | 6D6F |
| 0000212240 | 656D | 746E | 3A73 | 2520 | 0A73 | 2100 | 6D45 | 7470 |
| 0000212260 | 2179 | 2100 | 6D45 | 7470 | 2179 | 2000 | 6C46 | 7274 |
| 0000212300 | 5320 | 7265 | 6361 | 3A68 | 2520 | 0A73 | 5420 | 2043 |
| 0000212320 | 6553 | 7261 | 6863 | 203A | 7325 | 000A | 5024 | 5241 |
| 0000212340 | 4D41 | 5445 | 5245 | 3A53 | 4E00 | 4D55 | 530D | 5254 |
| 0000212360 | 5600 | 494F | 0044 | 2020 | 7325 | 2020 | 203A | 2520 |

THU MAR 14 17:21:24 1991 CLIENT.EXE PAGE 76, LINE 4426

| | | | | | | | | |
|---|---|---|---|---|---|---|---|---|
| 0000212400 | 2073 | 200A | 2020 | 2020 | 2020 | 2020 | 2020 | 0020 |
| 0000212420 | 0808 | 0808 | 0808 | 0808 | 0808 | 0808 | 2000 | 654E |
| 0000212440 | 2077 | 6164 | 6174 | 203A | 7546 | 636E | 202C | 7053 |
| 0000212460 | 6365 | 2820 | 2930 | 3E2D | 0020 | 2A20 | 5320 | 7465 |
| 0000212500 | 4820 | 6165 | 6564 | 2072 | 202D | 6425 | 000A | 6552 |
| 0000212520 | 6573 | 3A74 | 3020 | 2F20 | 4C20 | 616F | 3A64 | 3120 |
| 0000212540 | 2D20 | 003E | 000A | 002E | 3154 | 3332 | 535F | 4145 |
| 0000212560 | 4352 | 5F48 | 4150 | 4854 | 2000 | 202A | 6553 | 2074 |
| 0000212600 | 6553 | 7261 | 6863 | 5020 | 7461 | 2068 | 203D | 6425 |
| 0000212620 | 000A | 7420 | 7365 | 2074 | 616E | 656D | 2D20 | 003E |
| 0000212640 | 000A | 002E | 5320 | 6165 | 6372 | 2068 | 6554 | 7473 |
| 0000212660 | 3D20 | 2520 | 0A64 | 5400 | 7365 | 2074 | 4449 | 3D20 |
| 0000212700 | 2520 | 786C | 2C20 | 2020 | 6F4C | 7067 | 7461 | 2068 |
| 0000212720 | 203D | 7325 | 000A | 6920 | 2064 | 2E2E | 202E | 6874 |
| 0000212740 | 7369 | 7420 | 7365 | 2074 | 3D3D | 4C00 | 676F | 6150 |
| 0000212760 | 6874 | 202C | 6469 | 2820 | 6874 | 7369 | 7420 | 7365 |
| 0000213000 | 2074 | 203D | 6C25 | 2978 | 202C | 6572 | 7266 | 7365 |
| 0000213020 | 2068 | 3E2D | 0020 | 7325 | 2520 | 786C | 2520 | 0064 |
| 0000213040 | 000A | 002E | 2000 | 202A | 6264 | 6C5F | 616F | 5F64 |
| 0000213060 | 6663 | 2067 | 202D | 6425 | 6920 | 3A64 | 2520 | 786C |
| 0000213100 | 6609 | 6C69 | 3A65 | 2520 | 2073 | 696C | 656E | 203A |
| 0000213120 | 7525 | 000A | 6F66 | 6372 | 2C65 | 2520 | 2073 | 6C25 |
| 0000213140 | 2078 | 3E2D | 0020 | 6425 | 2520 | 786C | 0A00 | 2E00 |
| 0000213160 | 2000 | 202A | 6264 | 755F | 6C6E | 616F | 5F64 | 6663 |
| 0000213200 | 2067 | 202D | 6425 | 000A | 7325 | 2520 | 786C | 202C |
| 0000213220 | 7954 | 6570 | 2820 | 7C6C | 7C75 | 7C62 | 2966 | 202C |
| 0000213240 | 616E | 656D | 2D20 | 203E | 2500 | 786C | 2520 | 2073 |
| 0000213260 | 7325 | 0A00 | 2E00 | 2000 | 202A | 6567 | 5F74 | 756E |
| 0000213300 | 206D | 202D | 6425 | 202C | 6176 | 756C | 3A65 | 2520 |
| 0000213320 | 646C | 000A | 2A20 | 6720 | 7465 | 6E5F | 6D75 | 2D20 |
| 0000213340 | 2520 | 2C64 | 7620 | 6C61 | 6575 | 203A | 6C25 | 0A75 |
| 0000213360 | 2000 | 202A | 6567 | 5F74 | 756E | 206D | 202D | 6425 |
| 0000213400 | 202C | 6176 | 756C | 3A65 | 2520 | 0A64 | 2000 | 202A |
| 0000213420 | 6567 | 5F74 | 756E | 206D | 202D | 6425 | 202C | 6176 |
| 0000213440 | 756C | 3A65 | 2520 | 0A66 | 2000 | 202A | 6C69 | 656C |
| 0000213460 | 6167 | 206C | 7974 | 6570 | 2120 | 000A | 2520 | 2073 |
| 0000213500 | 6C25 | 2C78 | 5420 | 7079 | 2065 | 6C28 | 757C | 627C |
| 0000213520 | 667C | 2C29 | 6E20 | 6D61 | 2065 | 3E2D | 0020 | 6C25 |
| 0000213540 | 2078 | 7325 | 2520 | 0073 | 000A | 002E | 2020 | 7620 |
| 0000213560 | 6C61 | 6575 | 255B | 5D75 | 203A | 6C25 | 0A64 | 2000 |
| 0000213600 | 2020 | 6176 | 756C | 5B65 | 7525 | 3A5D | 2520 | 756C |
| 0000213620 | 000A | 2020 | 7620 | 6C61 | 6575 | 255B | 5D75 | 203A |
| 0000213640 | 6425 | 000A | 2020 | 7620 | 6C61 | 6575 | 255B | 5D75 |
| 0000213660 | 203A | 6625 | 000A | 2A20 | 6920 | 6C6C | 6765 | 6C61 |
| 0000213700 | 7420 | 7079 | 2065 | 0A21 | 2500 | 2073 | 6C25 | 2C78 |
| 0000213720 | 5420 | 7079 | 2065 | 7328 | 747C | 6C7C | 2C29 | 6E20 |
| 0000213740 | 6D61 | 2065 | 3E2D | 0020 | 6C25 | 2078 | 7325 | 2520 |
| 0000213760 | 0073 | 000A | 002E | 2A20 | 6920 | 6C6C | 6765 | 6C61 |
| 0000214000 | 7420 | 7079 | 2065 | 0A21 | 2000 | 202A | 6567 | 5F74 |
| 0000214020 | 7473 | 2072 | 202D | 6425 | 0020 | 2509 | 3A64 | 2809 |
| 0000214040 | 7325 | 0A29 | 7600 | 6C61 | 6575 | 203A | 2528 | 2973 |
| 0000214060 | 000A | 5220 | 6365 | 766F | 7265 | 2079 | 656D | 6874 |
| 0000214100 | 646F | 3A73 | 000A | 0909 | 2030 | 202D | 6E61 | 2079 |
| 0000214120 | 656D | 6874 | 646F | 202C | 3120 | 2D20 | 6520 | 7478 |
| 0000214140 | 6172 | 7463 | 202C | 3220 | 2D20 | 6520 | 7478 | 7265 |
| 0000214160 | 2C6E | 000A | 0909 | 2033 | 202D | 6572 | 6F63 | 736E |
| 0000214200 | 7274 | 6375 | 2C74 | 3420 | 2D20 | 6620 | 6F72 | 206D |
| 0000214220 | 6162 | 6B63 | 7075 | 000A | 5420 | 7079 | 2065 | 666F |
| 0000214240 | 5320 | 4244 | 7420 | 206F | 6572 | 6F63 | 6576 | 2C72 |

THU MAR 14 17:21:24 1991 CLIENT.EXE PAGE 77, LINE 4485

| | | | | | | | | |
|---|---|---|---|---|---|---|---|---|
| 0000214260 | 6D20 | 7465 | 6F68 | 2064 | 3E2D | 2500 | 2064 | 6425 |
| 0000214300 | 0A00 | 2E00 | 2000 | 202A | 6552 | 6F63 | 6576 | 2072 |
| 0000214320 | 4453 | 2042 | 202D | 6425 | 202C | 656D | 6874 | 646F |
| 0000214340 | 7520 | 6573 | 3A64 | 2520 | 2C75 | 6F20 | 6A62 | 6365 |
| 0000214360 | 7374 | 203A | 7525 | 202C | 6F6C | 7473 | 203A | 7525 |
| 0000214400 | 000A | 4520 | 6863 | 206F | 694C | 656E | 2D20 | 203E |
| 0000214420 | 2000 | 202A | 6345 | 6F68 | 4720 | 7465 | 2073 | 7245 |
| 0000214440 | 6F72 | 2072 | 2121 | 0A21 | 0A00 | 2E00 | 2300 | 6345 |
| 0000214460 | 6F68 | 3A20 | 2020 | 7325 | 000A | 5320 | 7379 | 6574 |
| 0000214500 | 206D | 6D63 | 2064 | 3E2D | 0020 | 2A20 | 5320 | 7379 |
| 0000214520 | 6574 | 206D | 6547 | 7374 | 4520 | 7272 | 726F | 2120 |
| 0000214540 | 2121 | 000A | 000A | 002E | 5323 | 7379 | 6574 | 206D |
| 0000214560 | 203A | 2520 | 0A73 | 6400 | 5F62 | 6970 | 4400 | 736F |
| 0000214600 | 6547 | 4D74 | 646F | 6148 | 646E | 656C | 6620 | 6961 |
| 0000214620 | 656C | 2064 | 2E2E | 202E | 4400 | 736F | 6547 | 4D74 |
| 0000214640 | 646F | 614E | 656D | 6620 | 6961 | 656C | 2064 | 2E2E |
| 0000214660 | 202E | 6400 | 5F62 | 6970 | 642E | 6C6C | 6920 | 2073 |
| 0000214700 | 6E69 | 2520 | 0A73 | 4300 | 494C | 4E45 | 5F54 | 4548 |
| 0000214720 | 504C | 505F | 5441 | 0048 | 2A20 | 4820 | 6C65 | 2070 |
| 0000214740 | 202D | 6163 | 6E6E | 746F | 6620 | 6E69 | 2064 | 7973 |
| 0000214760 | 2073 | 6F63 | 666E | 6769 | 6920 | 6574 | 3A6D | 4320 |
| 0000215000 | 494C | 4E45 | 5F54 | 4548 | 504C | 505F | 5441 | 2E48 |
| 0000215020 | 000A | 002E | 6163 | 2074 | 5C00 | 6C63 | 5F69 | 6600 |
| 0000215040 | 2E77 | 6C68 | 0070 | 626F | 2E6A | 6C68 | 0070 | 6663 |
| 0000215060 | 2E67 | 6C68 | 0070 | 6567 | 2E6E | 6C68 | 0070 | 0000 |
| 0000215100 | 0000 | 6C43 | 6569 | 746E | 4100 | 656C | 0078 | 2A20 |
| 0000215120 | 6920 | 696E | 2074 | 202D | 6425 | 000A | 6F20 | 2070 |
| 0000215140 | 3E2D | 0020 | 000A | 002E | 2A20 | 7420 | 7265 | 696D |
| 0000215160 | 616E | 6574 | 2D20 | 2520 | 0A64 | 0000 | 4E20 | 6D61 |
| 0000215200 | 2C65 | 4920 | 0044 | 6E20 | 6D61 | 2065 | 3E2D | 0000 |
| 0000215220 | 6920 | 2064 | 3E2D | 0020 | 4920 | 616D | 6567 | 6820 |
| 0000215240 | 6E61 | 6C64 | 2C65 | 4C20 | 7961 | 7265 | 6920 | 646E |
| 0000215260 | 7865 | 2D20 | 203E | 0000 | 2520 | 2075 | 7525 | 0000 |
| 0000215300 | 4920 | 616D | 6567 | 6820 | 6E61 | 6C64 | 2065 | 3E2D |
| 0000215320 | 0020 | 2520 | 0075 | 6E20 | 6D61 | 2C65 | 7320 | 6769 |
| 0000215340 | 735F | 7A69 | 2C65 | 6220 | 6D74 | 5F70 | 6973 | 657A |
| 0000215360 | 202C | 6F6D | 6564 | 2820 | 7C30 | 7C31 | 2932 | 202C |
| 0000215400 | 6162 | 6B63 | 7267 | 756F | 646E | 2D20 | 003E | 4620 |
| 0000215420 | 6C69 | 206C | 616C | 6579 | 2072 | 6977 | 6874 | 2D20 |
| 0000215440 | 203E | 0000 | 5520 | 6470 | 7461 | 2065 | 6D69 | 6761 |
| 0000215460 | 3F65 | 2820 | 2F30 | 2931 | 2D20 | 203E | 0000 | 4920 |
| 0000215500 | 616D | 6567 | 6420 | 7461 | 2061 | 6564 | 7470 | 2C68 |
| 0000215520 | 6C20 | 7961 | 7265 | 6420 | 7065 | 6874 | 2D20 | 203E |
| 0000215540 | 2000 | 202A | 666F | 7366 | 7465 | 7420 | 206F | 616C |
| 0000215560 | 6772 | 2065 | 202D | 6F6D | 6572 | 7420 | 6168 | 206E |
| 0000215600 | 6D69 | 6761 | 2065 | 6973 | 657A | 2820 | 6C25 | 2975 |
| 0000215620 | 2E2E | 0A2E | 2000 | 202A | 6156 | 756C | 2065 | 7461 |
| 0000215640 | 6F20 | 6666 | 6573 | 2074 | 6C25 | 2075 | 7369 | 2520 |
| 0000215660 | 2064 | 2020 | 2520 | 0A78 | 2000 | 202A | 6F44 | 4773 |
| 0000215700 | 7465 | 7548 | 6567 | 6853 | 6669 | 2874 | 2029 | 6166 |
| 0000215720 | 6C69 | 6465 | 2E2E | 0A2E | 2000 | 202A | 6854 | 2065 |
| 0000215740 | 6176 | 756C | 2065 | 6177 | 2073 | 6F6E | 2074 | 6F66 |
| 0000215760 | 6E75 | 2064 | 6E69 | 7420 | 6568 | 6920 | 616D | 656/ |
| 0000216000 | 2E2E | 0A2E | 2000 | 202A | 666F | 7366 | 7465 | 3D20 |
| 0000216020 | 2520 | 756C | 000A | 6854 | 2065 | 7473 | 7261 | 6974 |
| 0000216040 | 676E | 6F20 | 6666 | 6573 | 2074 | 554D | 5453 | 6220 |
| 0000216060 | 2065 | 4F50 | 4953 | 4954 | 4556 | 2120 | 2121 | 2121 |
| 0000216100 | 2121 | 2121 | 000A | 2A20 | 4420 | 736F | 6547 | 4874 |
| 0000216120 | 6775 | 5365 | 6968 | 7466 | 2928 | 6620 | 6961 | 656C |

THU MAR 14 17:21:24 1991 CLIENT.EXE PAGE 78, LINE 4544

| | | | | | | | | |
|---|---|---|---|---|---|---|---|---|
| 0000216140 | 2E64 | 2E2E | 000A | 7320 | 6174 | 7472 | 6E69 | 2067 |
| 0000216160 | 666F | 7366 | 7465 | 7420 | 206F | 616C | 6772 | 2065 |
| 0000216200 | 202D | 6F6D | 6572 | 7420 | 6168 | 206E | 6D69 | 6761 |
| 0000216220 | 2065 | 6973 | 657A | 2820 | 6C25 | 2975 | 000A | 2A20 |
| 0000216240 | 4120 | 6420 | 6669 | 6566 | 6572 | 746E | 7620 | 6C61 |
| 0000216260 | 6575 | 7720 | 7361 | 6E20 | 746F | 6620 | 756F | 646E |
| 0000216300 | 6920 | 206E | 6874 | 2065 | 6572 | 6967 | 6E6F | 2E2E |
| 0000216320 | 0A2E | 2000 | 202A | 666F | 7366 | 7465 | 3D20 | 2520 |
| 0000216340 | 756C | 6620 | 6F72 | 206D | 7473 | 7261 | 6974 | 676E |
| 0000216360 | 6F20 | 6666 | 6573 | 2C74 | 2520 | 756C | 6620 | 6F72 |
| 0000216400 | 206D | 6562 | 6967 | 6E6E | 6E69 | 2E67 | 000A | 6F20 |
| 0000216420 | 2070 | 5328 | 6165 | 6372 | 2068 | 7962 | 2820 | 2D6F |
| 0000216440 | 666F | 7366 | 7465 | 202C | 2D76 | 6176 | 756C | 2C65 |
| 0000216460 | 6E20 | 6E2D | 746F | 7620 | 6C61 | 6575 | 202C | 2D71 |
| 0000216500 | 7571 | 7469 | 2929 | 202C | 6176 | 756C | 2065 | 3E2D |
| 0000216520 | 0020 | 2520 | 6331 | 2520 | 756C | 0A00 | 2E00 | 2000 |
| 0000216540 | 666F | 7366 | 7465 | 7420 | 206F | 7473 | 7261 | 2074 |
| 0000216560 | 6573 | 7261 | 6863 | 6620 | 6F72 | 206D | 3E2D | 0020 |
| 0000216600 | 2520 | 756C | 0A00 | 2E00 | 2000 | 202A | 6E55 | 6469 |
| 0000216620 | 6E65 | 6974 | 6966 | 6465 | 6320 | 6F68 | 6369 | 2165 |
| 0000216640 | 000A | 5320 | 6769 | 3A20 | 0A20 | 2000 | 2520 | 2064 |
| 0000216660 | 2020 | 202F | 2020 | 2000 | 7025 | 2020 | 203D | 2520 |
| 0000216700 | 2064 | 2020 | 202F | 2020 | 2000 | 2520 | 2064 | 000A |
| 0000216720 | 2520 | 2070 | 3D20 | 2020 | 6425 | 0A20 | 2000 | 6942 |
| 0000216740 | 6D74 | 7061 | 3A20 | 0A20 | 2000 | 2520 | 2064 | 2020 |
| 0000216760 | 202F | 2020 | 2000 | 7025 | 2020 | 203D | 2520 | 2064 |
| 0000217000 | 2020 | 202F | 2020 | 2000 | 2520 | 2064 | 000A | 2520 |
| 0000217020 | 2070 | 3D20 | 2020 | 6425 | 0A20 | 2000 | 616E | 656D |
| 0000217040 | 203D | 7325 | 202C | 6620 | 6C69 | 6E65 | 6D61 | 3D65 |
| 0000217060 | 2520 | 2C73 | 2020 | 7974 | 6570 | 203D | 7525 | 202C |
| 0000217100 | 5320 | 6769 | 203D | 7525 | 202C | 4220 | 7469 | 616D |
| 0000217120 | 3D70 | 2520 | 756C | 000A | 7220 | 7065 | 3D20 | 2520 |
| 0000217140 | 2C75 | 2020 | 6977 | 7464 | 2068 | 203D | 7525 | 202C |
| 0000217160 | 6820 | 6569 | 6867 | 2074 | 203D | 7525 | 202C | 6420 |
| 0000217200 | 7065 | 6874 | 2020 | 203D | 7525 | 000A | 6520 | 7078 |
| 0000217220 | 745F | 5F63 | 6469 | 3D20 | 2520 | 786C | 202C | 6572 |
| 0000217240 | 5F66 | 6374 | 695F | 2064 | 203D | 6C25 | 2C78 | 7220 |
| 0000217260 | 6665 | 6C5F | 6E69 | 5F65 | 756E | 206D | 203D | 7525 |
| 0000217300 | 000A | 7325 | 202C | 7974 | 6570 | 2820 | 7273 | 3D63 |
| 0000217320 | 3231 | 2030 | 6964 | 6666 | 313D | 3132 | 7320 | 6E79 |
| 0000217340 | 3D63 | 3231 | 2932 | 2D20 | 003E | 2520 | 2073 | 6C25 |
| 0000217360 | 2078 | 7525 | 0A00 | 2E00 | 2000 | 202A | 6567 | 2074 |
| 0000217400 | 6D69 | 2067 | 6468 | 2072 | 202D | 6425 | 202C | 2000 |
| 0000217420 | 2020 | 4449 | 3D20 | 2520 | 786C | 202C | 614E | 656D |
| 0000217440 | 3D20 | 2520 | 2C73 | 4620 | 6C69 | 2065 | 616E | 656D |
| 0000217460 | 3D20 | 2520 | 0A73 | 2000 | 2020 | 7865 | 5F70 | 6374 |
| 0000217500 | 695F | 2064 | 203D | 6C25 | 2C78 | 2020 | 7954 | 6570 |
| 0000217520 | 3D20 | 2520 | 2C75 | 2020 | 6552 | 6566 | 6572 | 636E |
| 0000217540 | 2065 | 696C | 656E | 3D20 | 2520 | 0A75 | 2000 | 2020 |
| 0000217560 | 6572 | 5F66 | 6374 | 695F | 2064 | 203D | 6C25 | 2C78 |
| 0000217600 | 2020 | 6954 | 656D | 7320 | 6174 | 706D | 3D20 | 2520 |
| 0000217620 | 0A73 | 2000 | 2020 | 4F41 | 2049 | 4449 | 3D20 | 2520 |
| 0000217640 | 786C | 202C | 4C20 | 636F | 7461 | 6F69 | 3A6E | 5820 |
| 0000217660 | 3D20 | 2520 | 2C64 | 5920 | 203D | 6425 | 202C | 5220 |
| 0000217700 | 7065 | 6572 | 6573 | 746E | 7461 | 6F69 | 3A6E | 2520 |
| 0000217720 | 0A64 | 2000 | 2020 | 6957 | 7464 | 2068 | 203D | 7525 |
| 0000217740 | 202C | 4820 | 6965 | 6867 | 2074 | 203D | 7525 | 202C |
| 0000217760 | 4420 | 7065 | 6874 | 3D20 | 2520 | 0A75 | 2000 | 2020 |
| 0000220000 | 6144 | 6174 | 6C20 | 7961 | 7265 | 6420 | 7065 | 6874 |

THU MAR 14 17:21:24 1991 CLIENT.EXE PAGE 79, LINE 4603

| | | | | | | | | |
|---|---|---|---|---|---|---|---|---|
| 0000220020 | 3D20 | 2520 | 0075 | 2020 | 6953 | 6E67 | 7461 | 7275 |
| 0000220040 | 2065 | 6973 | 657A | 3D20 | 2520 | 0075 | 2020 | 6942 |
| 0000220060 | 2074 | 616D | 2070 | 6973 | 657A | 3D20 | 2520 | 756C |
| 0000220100 | 000A | 6820 | 6E61 | 6C64 | 2065 | 203D | 7525 | 000A |
| 0000220120 | 6620 | 6961 | 656C | 2064 | 202D | 6264 | 695F | 676D |
| 0000220140 | 655F | 646E | 775F | 6972 | 6574 | 203A | 7525 | 000A |
| 0000220160 | 6620 | 6961 | 656C | 2064 | 202D | 6264 | 695F | 676D |
| 0000220200 | 655F | 646E | 775F | 6972 | 6574 | 203A | 7525 | 000A |
| 0000220220 | 2A20 | 6520 | 646E | 6120 | 6363 | 7365 | 2073 | 202D |
| 0000220240 | 6425 | 202C | 7200 | 6C65 | 6165 | 6573 | 6920 | 676D |
| 0000220260 | 2D20 | 2520 | 0A64 | 2500 | 0073 | 7325 | 2520 | 2075 |
| 0000220300 | 6C25 | 2075 | 7525 | 2520 | 0075 | 000A | 002E | 2A20 |
| 0000220320 | 6120 | 6C6C | 636F | 6920 | 676D | 2D20 | 2520 | 0A64 |
| 0000220340 | 2000 | 202A | 6966 | 6C6C | 6420 | 7461 | 2061 | 000A |
| 0000220360 | 2A20 | 6120 | 6464 | 6920 | 676D | 2D20 | 2520 | 2C64 |
| 0000220400 | 2020 | 6469 | 3D20 | 2520 | 756C | 2C20 | 2520 | 786C |
| 0000220420 | 092C | 3125 | 322E | 2066 | 6573 | 0A63 | 2500 | 2C73 |
| 0000220440 | 7420 | 7079 | 2065 | 7328 | 6372 | 313D | 3032 | 6420 |
| 0000220460 | 6669 | 3D66 | 3231 | 2031 | 7973 | 636E | 313D | 3232 |
| 0000220500 | 2029 | 3E2D | 2500 | 2073 | 6C25 | 2078 | 7525 | 0A00 |
| 0000220520 | 2E00 | 2000 | 202A | 6361 | 6563 | 73[illegible]3 | 6920 | 676D |
| 0000220540 | 2D20 | 2520 | 2C64 | 2509 | 2E31 | 6632 | 7320 | 6365 |
| 0000220560 | 0A20 | 2000 | 202A | 6572 | 656C | 7361 | 2065 | 6D69 |
| 0000220600 | 2067 | 202D | 6425 | 000A | 7325 | 202C | 7974 | 6570 |
| 0000220620 | 2820 | 7273 | 3D63 | 3231 | 2030 | 6964 | 6666 | 313D |
| 0000220640 | 3132 | 7320 | 6E79 | 3D63 | 3231 | 2932 | 2D20 | 003E |
| 0000220660 | 7325 | 2520 | 786C | 2520 | 0075 | 000A | 002E | 2A20 |
| 0000220700 | 6120 | 6363 | 7365 | 2073 | 6D69 | 2067 | 202D | 6425 |
| 0000220720 | 092C | 3125 | 322E | 2066 | 6573 | 2063 | 000A | 4920 |
| 0000220740 | 616D | 6567 | 4E20 | 746F | 6120 | 4220 | 7469 | 616D |
| 0000220760 | 2070 | 2121 | 0A21 | 2000 | 202A | 6572 | 656C | 7361 |
| 0000221000 | 2065 | 6D69 | 2067 | 202D | 6425 | 000A | 7325 | 202C |
| 0000221020 | 7974 | 6570 | 2820 | 7273 | 3D63 | 3231 | 2030 | 6964 |
| 0000221040 | 6666 | 313D | 3132 | 7320 | 6E79 | 3D63 | 3231 | 2932 |
| 0000221060 | 2D20 | 003E | 7325 | 2520 | 786C | 2520 | 0075 | 000A |
| 0000221100 | 002E | 2A20 | 6420 | 6C65 | 7465 | 2065 | 6D69 | 2067 |
| 0000221120 | 202D | 6425 | 000A | 6F20 | 6472 | 7265 | 2820 | 2D31 |
| 0000221140 | 6C61 | 6870 | 2C61 | 3220 | 492D | 2C44 | 3320 | 442D |
| 0000221160 | 7461 | 2965 | 202C | 7974 | 6570 | 2820 | 7273 | 3D63 |
| 0000221200 | 3231 | 2030 | 6964 | 6666 | 313D | 3132 | 7320 | 6E79 |
| 0000221220 | 3D63 | 3231 | 2932 | 2D20 | 003E | 7525 | 2520 | 0075 |
| 0000221240 | 000A | 002E | 2A20 | 6C20 | 7369 | 2074 | 6D69 | 2067 |
| 0000221260 | 202D | 6425 | 000A | 6E20 | 2E6F | 2020 | 616E | 656D |
| 0000221300 | 0920 | 0909 | 6D69 | 2067 | 6469 | 0A20 | 2000 | 7525 |
| 0000221320 | 2029 | 2520 | 2073 | 0909 | 6C25 | 2078 | 000A | 7020 |
| 0000221340 | 6572 | 6966 | 2078 | 3028 | 2029 | 3E2D | 2500 | 0073 |
| 0000221360 | 000A | 002E | 2A20 | 4720 | 6E65 | 7265 | 7461 | 2065 |
| 0000221400 | 6D69 | 2067 | 616E | 656D | 2D20 | 2520 | 2064 | 203A |
| 0000221420 | 2520 | 2073 | 000A | 7325 | 202C | 7974 | 6570 | 2820 |
| 0000221440 | 7273 | 3D63 | 3231 | 2030 | 6964 | 6666 | 313D | 3132 |
| 0000221460 | 7320 | 6E79 | 3D63 | 3231 | 2932 | 202C | 4354 | 6920 |
| 0000221500 | 2C64 | 6C20 | 6E69 | 2065 | 756E | 626D | 7265 | 2D20 |
| 0000221520 | 003E | 2520 | 2073 | 6C25 | 2078 | 7525 | 2520 | 786C |
| 0000221540 | 2520 | 0075 | 000A | 002E | 2A20 | 6720 | 7465 | 6920 |
| 0000221560 | 676D | 6820 | 7264 | 2D20 | 2520 | 2C64 | 0020 | 6573 |
| 0000221600 | 2074 | 6D69 | 2067 | 6468 | 2072 | 202D | 6425 | 202C |
| 0000221620 | 0900 | 3125 | 322E | 2066 | 6573 | 2063 | 000A | 7325 |
| 0000221640 | 202C | 7974 | 6570 | 2820 | 7273 | 3D63 | 3231 | 2030 |
| 0000221660 | 6964 | 6666 | 313D | 3132 | 7320 | 6E79 | 3D63 | 3231 |

THU MAR 14 17:21:24 1991 CLIENT.EXE PAGE 80, LINE 4662

| | | | | | | | | |
|---|---|---|---|---|---|---|---|---|
| 0000221700 | 2932 | 202C | 4354 | 6920 | 2C64 | 6C20 | 6E69 | 2065 |
| 0000221720 | 756E | 626D | 7265 | 2D20 | 003E | 2520 | 2073 | 6C25 |
| 0000221740 | 2078 | 7525 | 2520 | 786C | 2520 | 0075 | 000A | 002E |
| 0000221760 | 2A20 | 7520 | 6470 | 7461 | 2065 | 6D69 | 2067 | 6572 |
| 0000222000 | 2066 | 202D | 6425 | 092C | 3125 | 322E | 2066 | 6573 |
| 0000222020 | 2063 | 000A | 7320 | 7A69 | 2065 | 3E2D | 0020 | 7525 |
| 0000222040 | 0A00 | 2E00 | 2000 | 202A | 6C61 | 6F6C | 2063 | 6D69 |
| 0000222060 | 2067 | 202D | 6425 | 000A | 2000 | 202A | 6461 | 2064 |
| 0000222100 | 6D69 | 2067 | 202D | 6425 | 202C | 6920 | 2064 | 203D |
| 0000222120 | 6C25 | 0A78 | 2500 | 0073 | 7325 | 2520 | 2075 | 6C25 |
| 0000222140 | 2075 | 7525 | 2520 | 0075 | 000A | 002E | 4E20 | 746F |
| 0000222160 | 6520 | 6F6E | 6775 | 2068 | 656D | 6F6D | 7972 | 2120 |
| 0000222200 | 2121 | 000A | 7325 | 2500 | 2075 | 7525 | 0A00 | 2E00 |
| 0000222220 | 2000 | 202A | 6D69 | 2067 | 7473 | 7261 | 2074 | 7277 |
| 0000222240 | 7469 | 2065 | 202D | 6425 | 202C | 6820 | 6E61 | 6C64 |
| 0000222260 | 2065 | 203D | 7525 | 2C20 | 2520 | 2E31 | 6632 | 7320 |
| 0000222300 | 6365 | 000A | 7325 | 0A00 | 2E00 | 2500 | 0073 | 2520 |
| 0000222320 | 0064 | 7720 | 6972 | 6574 | 6C20 | 7961 | 7265 | 2D20 |
| 0000222340 | 2520 | 2064 | 2020 | 3125 | 322E | 2066 | 6573 | 0A63 |
| 0000222360 | 2500 | 0073 | 000A | 002E | 6620 | 6C69 | 206C | 6973 |
| 0000222400 | 6E67 | 7461 | 7275 | 2065 | 6977 | 6874 | 2D20 | 203E |
| 0000222420 | 2000 | 6425 | 0A00 | 2E00 | 2000 | 7277 | 7469 | 2065 |
| 0000222440 | 6973 | 2067 | 202D | 6425 | 2020 | 2520 | 2E31 | 6632 |
| 0000222460 | 7320 | 6365 | 000A | 6120 | 6363 | 7365 | 2073 | 6973 |
| 0000222500 | 6E67 | 7461 | 7275 | 2065 | 202D | 6425 | 2020 | 2520 |
| 0000222520 | 2E31 | 6632 | 7320 | 6365 | 000A | 7325 | 0A00 | 2E00 |
| 0000222540 | 2000 | 6E65 | 2064 | 7277 | 7469 | 2065 | 202D | 6425 |
| 0000222560 | 202C | 6D69 | 2067 | 4449 | 203A | 6C25 | 0078 | 2020 |
| 0000222600 | 3125 | 322E | 2066 | 6573 | 0A63 | 5420 | 746F | 6C61 |
| 0000222620 | 2520 | 2E31 | 6632 | 7320 | 6365 | 000A | 7325 | 2000 |
| 0000222640 | 6425 | 0A00 | 2E00 | 2000 | 6E65 | 2064 | 6361 | 6563 |
| 0000222660 | 7373 | 2D20 | 2520 | 0064 | 2020 | 3125 | 322E | 2066 |
| 0000222700 | 6573 | 0A63 | 5420 | 746F | 6C61 | 2520 | 2E31 | 6632 |
| 0000222720 | 7320 | 6365 | 000A | 7325 | 202C | 7974 | 6570 | 2C20 |
| 0000222740 | 6220 | 6361 | 206B | 3E2D | 2500 | 2073 | 6C25 | 2078 |
| 0000222760 | 7525 | 0A00 | 2E00 | 2000 | 6F4E | 2074 | 6E65 | 756F |
| 0000223000 | 6867 | 6D20 | 6D65 | 726F | 2079 | 2121 | 0A21 | 2000 |
| 0000223020 | 202A | 6D69 | 2067 | 7473 | 7261 | 2074 | 6361 | 6563 |
| 0000223040 | 7373 | 2D20 | 2520 | 2C64 | 6820 | 6E61 | 6C64 | 2065 |
| 0000223060 | 203D | 7525 | 2020 | 3125 | 322E | 2066 | 6573 | 0A63 |
| 0000223100 | 2500 | 0073 | 000A | 002E | 2A20 | 6120 | 6363 | 7365 |
| 0000223120 | 2073 | 6D69 | 2067 | 616C | 6579 | 2072 | 202D | 6425 |
| 0000223140 | 2020 | 2520 | 2E31 | 6632 | 000A | 7325 | 2000 | 6425 |
| 0000223160 | 2500 | 0073 | 000A | 002E | 7325 | 2000 | 6425 | 0A00 |
| 0000223200 | 2E00 | 2000 | 202A | 6572 | 656C | 7361 | 2065 | 616C |
| 0000223220 | 6579 | 2072 | 202D | 6425 | 2020 | 3125 | 322E | 0A66 |
| 0000223240 | 2500 | 0073 | 000A | 002E | 2A20 | 7220 | 6C65 | 6165 |
| 0000223260 | 6573 | 7320 | 6769 | 616E | 7574 | 6572 | 2D20 | 2520 |
| 0000223300 | 2064 | 2520 | 2E31 | 6632 | 000A | 7325 | 0A00 | 2E00 |
| 0000223320 | 2000 | 202A | 6163 | 636E | 6C65 | 6F20 | 2070 | 202D |
| 0000223340 | 6425 | 000A | 6E20 | 6D61 | 2C65 | 7820 | 2C31 | 7920 |
| 0000223360 | 2C31 | 7820 | 2C32 | 7920 | 2C32 | 4920 | 636E | 286C |
| 0000223400 | 2C31 | 2930 | 202C | 766F | 7265 | 7277 | 7469 | 2065 |
| 0000223420 | 3E2D | 2500 | 2073 | 7525 | 2520 | 2075 | 7525 | 2520 |
| 0000223440 | 2075 | 7525 | 2520 | 0075 | 000A | 002E | 2A20 | 6120 |
| 0000223460 | 6464 | 6620 | 6C69 | 6574 | 2072 | 202D | 6425 | 0A20 |
| 0000223500 | 2500 | 0073 | 000A | 002E | 2A20 | 6420 | 6C65 | 7465 |
| 0000223520 | 2065 | 6966 | 746C | 7265 | 2D20 | 2520 | 0A64 | 2500 |
| 0000223540 | 0073 | 000A | 002E | 2A20 | 6720 | 7465 | 6620 | 6C69 |

THU MAR 14 17:21:24 1991 CLIENT.EXE PAGE 81, LINE 4721

| | | | | | | | | |
|---|---|---|---|---|---|---|---|---|
| 0000223560 | 6574 | 2072 | 202D | 6425 | 0A20 | 2000 | 616E | 656D |
| 0000223600 | 203D | 7325 | 2C20 | 5220 | 6365 | 3D74 | 2820 | 7525 |
| 0000223620 | 252C | 2975 | 2820 | 7525 | 252C | 2975 | 2C20 | 6120 |
| 0000223640 | 7274 | 3D72 | 2520 | 2075 | 000A | 6F20 | 6472 | 7265 |
| 0000223660 | 2820 | 2D31 | 6C61 | 6870 | 2C61 | 322D | 492D | 2C44 |
| 0000223700 | 3320 | 442D | 7461 | 2965 | 2D20 | 003E | 7525 | 0A00 |
| 0000223720 | 2E00 | 2000 | 202A | 696C | 7473 | 6620 | 6C69 | 6574 |
| 0000223740 | 7372 | 2D20 | 2520 | 0A64 | 2000 | 7525 | 2029 | 2520 |
| 0000223760 | 0A73 | 2000 | 6E63 | 2C74 | 6E20 | 6D61 | 2765 | 2073 |
| 0000224000 | 3E2D | 2500 | 0075 | 000A | 002E | 7325 | 2000 | 202A |
| 0000224020 | 6573 | 7261 | 6863 | 6620 | 6C69 | 6574 | 2072 | 202D |
| 0000224040 | 6425 | 0A20 | 2000 | 6946 | 746C | 7265 | 4C20 | 7369 |
| 0000224060 | 2074 | 203A | 000A | 2020 | 7525 | 2029 | 616E | 656D |
| 0000224100 | 203D | 7325 | 2C20 | 522D | 6365 | 3D74 | 2820 | 7525 |
| 0000224120 | 252C | 2975 | 2820 | 7525 | 252C | 2975 | 2C20 | 6120 |
| 0000224140 | 7274 | 3D72 | 2520 | 2075 | 000A | 6920 | 2064 | 203D |
| 0000224160 | 6C25 | 2C75 | 2520 | 786C | 2020 | 7320 | 7A69 | 2065 |
| 0000224200 | 203D | 7525 | 0A20 | 2000 | 2520 | 2064 | 2020 | 202F |
| 0000224220 | 2020 | 2000 | 7025 | 2020 | 203D | 2520 | 2064 | 2020 |
| 0000224240 | 202F | 2020 | 2000 | 2520 | 2064 | 000A | 2520 | 2070 |
| 0000224260 | 3D20 | 2020 | 6425 | 0A20 | 6900 | 2C64 | 7420 | 7079 |
| 0000224300 | 2820 | 3431 | 2D30 | 2932 | 202C | 6973 | 657A | 2D20 |
| 0000224320 | 003E | 7525 | 2520 | 0075 | 000A | 002E | 4D20 | 4C41 |
| 0000224340 | 4F4C | 2043 | 4146 | 4C49 | 4445 | 2120 | 2121 | 0A20 |
| 0000224360 | 2000 | 202A | 6966 | 6C6C | 6420 | 7461 | 2061 | 000A |
| 0000224400 | 2A20 | 432D | 6572 | 7461 | 2065 | 6547 | 656E | 6972 |
| 0000224420 | 2063 | 202D | 6425 | 202C | 6920 | 2064 | 203D | 6C25 |
| 0000224440 | 2075 | 202C | 6C25 | 0A78 | 6900 | 2C64 | 7320 | 7A69 |
| 0000224460 | 2065 | 3E2D | 2500 | 0075 | 000A | 002E | 4D20 | 4C41 |
| 0000224500 | 4F4C | 2043 | 4146 | 4C49 | 4445 | 2120 | 2121 | 0A20 |
| 0000224520 | 2000 | 202A | 6966 | 6C6C | 6420 | 7461 | 2061 | 000A |
| 0000224540 | 2A20 | 4D20 | 646F | 6669 | 2079 | 6547 | 656E | 6972 |
| 0000224560 | 2063 | 202D | 6425 | 0A20 | 0A00 | 2E00 | 2000 | 202A |
| 0000224600 | 6547 | 2074 | 6547 | 656E | 6972 | 2063 | 202D | 6425 |
| 0000224620 | 0A20 | 0A00 | 2E00 | 2000 | 202A | 6564 | 656C | 6574 |
| 0000224640 | 2D20 | 2520 | 0A64 | 7400 | 7079 | 2820 | 3431 | 2D30 |
| 0000224660 | 2932 | 2D20 | 003E | 2520 | 0075 | 2A20 | 6C20 | 7369 |
| 0000224700 | 2074 | 6567 | 656E | 6972 | 2063 | 7974 | 6570 | 2520 |
| 0000224720 | 2064 | 202D | 6425 | 000A | 2520 | 2975 | 2520 | 786C |
| 0000224740 | 000A | 7974 | 6570 | 2820 | 3431 | 2D30 | 2932 | 2D20 |
| 0000224760 | 003E | 2520 | 0075 | 2A20 | 4E20 | 7865 | 2074 | 6547 |
| 0000225000 | 656E | 6972 | 2063 | 4449 | 2020 | 7473 | 3D20 | 2520 |
| 0000225020 | 2064 | 202C | 6469 | 3D20 | 2520 | 786C | 000A | 6920 |
| 0000225040 | 2C64 | 6F20 | 6576 | 7772 | 6972 | 6574 | 202C | 6C66 |
| 0000225060 | 7274 | 6E20 | 6D61 | 2765 | 2073 | 3028 | 2029 | 3E2D |
| 0000225100 | 2500 | 0075 | 000A | 002E | 4D20 | 4C41 | 4F4C | 2043 |
| 0000225120 | 4146 | 4C49 | 4445 | 2120 | 2121 | 0A20 | 2500 | 0073 |
| 0000225140 | 2A20 | 6120 | 6464 | 615F | 696F | 665F | 746C | 2072 |
| 0000225160 | 4146 | 4C49 | 4445 | 2021 | 7473 | 3D20 | 2520 | 0A64 |
| 0000225200 | 2500 | 0073 | 2A20 | 6620 | 6C69 | 206C | 6164 | 6174 |
| 0000225220 | 0A20 | 2000 | 202A | 6441 | 2064 | 4F41 | 2049 | 202D |
| 0000225240 | 6425 | 202C | 6920 | 2064 | 203D | 6C25 | 2075 | 202C |
| 0000225260 | 6C25 | 0A78 | 0A00 | 2E00 | 2000 | 202A | 6547 | 2074 |
| 0000225300 | 4F41 | 2049 | 202D | 6425 | 0A20 | 2000 | 6469 | 3D20 |
| 0000225320 | 252D | 756C | 202C | 6C25 | 2078 | 2020 | 616D | 5F78 |
| 0000225340 | 6E63 | 2074 | 203D | 7525 | 2020 | 6E63 | 2074 | 203D |
| 0000225360 | 7525 | 0A20 | 2000 | 6946 | 746C | 7265 | 3A20 | 2020 |
| 0000225400 | 7325 | 000A | 4F20 | 2070 | 6128 | 642C | 672C | 6C2C |
| 0000225420 | 712C | 2C29 | 6920 | 7864 | 202C | 614E | 656D | 2D20 |

THU MAR 14 17:21:24 1991 CLIENT.EXE PAGE 82, LINE 4780

```
0000225440  003E  000A  002E  7325  2520  2064  7325  2000
0000225460  202A  6567  2074  4F41  2049  6966  746C  7265
0000225500  2D20  2520  2064  000A  6E20  6D61  3D65  2520
0000225520  2073  202C  6552  7463  203D  2528  2C75  7525
0000225540  2029  2528  2C75  7525  2029  202C  7461  7272
0000225560  203D  7525  0A20  2000  202A  696C  7473  4120
0000225600  494F  6620  6C69  6574  2072  202D  6425  0A20
0000225620  2000  2520  2975  6E20  6D61  3D65  2520  2073
0000225640  202C  6552  7463  203D  2528  2C75  7525  2029
0000225660  2528  2C75  7525  2029  202C  7461  7272  203D
0000225700  7525  0A20  2000  704F  2820  2C61  2C64  2971
0000225720  202C  6469  2C78  4E20  6D61  2065  3E2D  0A00
0000225740  2E00  2500  2073  6425  2520  0073  6920  2064
0000225760  203D  6C25  2C75  2520  786C  2020  6D20  7861
0000226000  635F  746E  3D20  2520  2075  6320  746E  3D20
0000226020  2520  2075  000A  4620  6C69  6574  2072  203A
0000226040  2520  0A73  0A00  2E00  2000  202A  6564  656C
0000226060  6574  2D20  2520  0A64  2000  202A  696C  7473
0000226100  4120  494F  2073  202D  6425  000A  2520  2975
0000226120  2520  786C  000A  4E20  6D61  2065  203D  7325
0000226140  2C20  4320  616C  7373  3D20  2520  2075  202C
0000226160  7453  6C79  2065  203D  7525  2C20  4220  6D74
0000226200  2070  203D  7525  2C20  4420  7365  2063  203D
0000226220  7525  0A20  2000  3225  2064  207C  0A00  2000
0000226240  3225  2064  207C  0A00  2000  3225  2064  207C
0000226260  0A00  2000  616E  656D  202C  7462  706D  732D
0000226300  7A69  2C65  6420  6365  6972  7470  726F  732D
0000226320  7A69  2C65  6F20  6576  7772  6972  6574  2D20
0000226340  003E  7325  2520  2075  7525  2520  0075  000A
0000226360  002E  2A20  4120  6C6C  636F  4920  6F63  206E
0000226400  6166  6C69  6465  2D20  2520  2064  000A  2A20
0000226420  6120  6464  6920  6F63  206E  202D  6425  0A20
0000226440  2500  0073  000A  002E  2A20  6420  6C65  7465
0000226460  2065  6369  6E6F  2D20  2520  0A64  2500  0073
0000226500  000A  002E  2A20  6720  7465  6920  6F63  206E
0000226520  202D  6425  0A20  2000  202A  6567  2074  6369
0000226540  6E6F  6820  6165  6564  2072  202D  6425  0A20
0000226560  2000  726F  6564  2072  3128  612D  706C  6168
0000226600  202C  2D32  4449  202C  2D33  6144  6574  2029
0000226620  3E2D  2500  0075  000A  002E  2A20  6C20  7369
0000226640  2074  6369  6E6F  2073  202D  6425  000A  2520
0000226660  2975  2020  7325  000A  0000  0000  0000  0000
0000226700  0006  0000  0000  0000  0005  0000  0000  0000
0000226720  0000  0000  0000  0000  0000  435F  465F  4C49
0000226740  5F45  4E49  4F46  003D  0001  FFFF  0000  0000
0000226760  0000  2398  0000  0000  FFFF  0001  0000  0000
0000227000  0000  0000  0000  0102  0000  0000  0000  0000
0000227020  0000  0202  0000  0000  0000  0000  0000  0000
0000227040  0000  0000  0000  0000  0000  0000  0000  0000
*
0000227720  0001  0200  0000  0000  0000  0000  0000  0000
0000227740  0000  0000  0000  0000  0000  0000  0000  0000
*
0000230660  2564  2D0A  4F43  534D  4550  0043  632F  6300
0000230700  646D  652E  6578  6300  6D6F  616D  646E  632E
0000230720  6D6F  0000  A5E0  2D00  A086  2776  A132  277A
0000230740  A016  277E  A104  2782  AA94  2786  0000  0000
0000230760  0000  0000  0000  0000  0000  0001  0100  8181
0000231000  0081  0000  0000  0000  0000  0000  0000  0000
```

THU MAR 14 17:21:24 1991 CLIENT.EXE PAGE 83, LINE 4839

```
0000231020  0000  0000  0000  0000  0000  0000  0000  0000
*
0000231360  0000  0000  0000  0000  0000  0000  0000  0A0A
0000231400  0A0A  0A0A  0A0A  0A0A  0A0A  0A0A  0A0A  0A0A
*
0000231760  0A0A  0A0A  0A0A  0A0A  0A0A  0A0A  0A0A  0000
0000232000  0000  0000  0000  0000  0000  0000  0000  FFFF
0000232020  0000  0000  0000  0000  0000  0000  0000  0000
0000232040  0000  0920  0D2D  005D  005D  0006  0600  0100
0000232060  0000  0010  0603  0600  1002  4504  4545  0505
0000232100  0505  3505  0030  0050  0000  2000  3020  5850
0000232120  0807  3000  3030  5057  0007  2000  0020  0000
0000232140  0000  6008  606D  6060  0060  7000  7870  7878
0000232160  0878  0807  0000  0007  0808  0008  0800  0800
0000232200  0000  2808  756E  6C6C  0629  0000  AAFC  2D04
0000232220  AAFC  2A2E  AAFC  2A32  AAFC  2A36  AAFC  2A3A
0000232240  AAFC  2A3E  0000  0000  0101  4F43  534D  4550
0000232260  0043  6D63  2E64  7865  0065  6F63  6D6D  6E61
0000232300  2E64  6F63  006D  4150  4854  2E00  7865  0065
0000232320  632E  6D6F  2E00  6D63  0064  622E  7461  2E00
0000232340  005C  0000  2A6B  2A70  415D  4854  5C00  0000
0000232360  2B65  3030  0030  3130  3230  3330  3430  3530
0000232400  3630  3730  3830  3930  3031  3131  3231  FFFF
0000232420  FFFF  0000  0000  0000  0000  0000  0000  0000
0000232440  0003  2000  2000  2020  2020  2020  2020  2828
0000232460  2828  2028  2020  2020  2020  2020  2020  2020
0000232500  2020  2020  4820  1010  1010  1010  1010  1010
0000232520  1010  1010  8410  8484  8484  8484  8484  1084
0000232540  1010  1010  1010  8181  8181  8181  0101  0101
0000232560  0101  0101  0101  0101  0101  0101  0101  0101
0000232600  1010  1010  1010  8282  8282  8282  0202  0202
0000232620  0202  0202  0202  0202  0202  0202  0202  0202
0000232640  1010  1010  0020  0000  0000  0000  0000  0000
0000232660  0000  0000  0000  0000  0000  0000  0000  0000
*
0000233040  0000  0000  0000  0003  0000  0000  0000  0000
0000233060  0000  0000  0000  0000  0000  5A54  0000  5350
0000233100  0054  4450  0054  7080  0000  0001  2BDE  2BF2
0000233120  2BE2  2D14  7553  4D6E  6E6F  7554  5765  6465
0000233140  6854  4675  6972  6153  0074  614A  466E  6265
0000233160  614D  4172  7270  614D  4A79  6E75  754A  416C
0000233200  6775  6553  4F70  7463  6F4E  4476  6365  0000
0000233220  005C  632F  0020  0002  3106  5323  414E  064E
0000233240  2331  4E51  4E41  3105  4923  464E  3105  4923
0000233260  444E  0020  0000  0000  0000  0000  0000  0000
0000233300  0000  0000  0000  0000  0000  0000  0000  0000
*
0000233360  0000  0000  FFFF  001E  003B  005A  0078  0097
0000233400  00B5  00D4  00F3  0111  0130  014E  016D  FFFF
0000233420  001E  003A  0059  0077  0096  00B4  00D3  00F2
0000233440  0110  012F  014D  016C  0000  3106  5323  414E
0000233460  064E  2331  4E51  4E41  3105  4923  464E  3105
0000233500  4923  444E  8000  2466  8000  37E0  C379  4341
0000233520  0000  0000  0000  CADA  FFFF  029E  FFFF  A676
0000233540  2CF8  7FC4  278A  7ACC  2A42  FFFF  D70A  3C23
0000233560  0000  0000  2752  0000  0000  0000  0000  3C3C
0000233600  4D4E  4753  3E3E  0000  3652  3030  0D30  2D0A
0000233620  7320  6174  6B63  6F20  6576  6672  6F6C  0D77
0000233640  000A  0003  3652  3030  0D33  2D0A  6920  746E
```

THU MAR 14 17:21:24 1991 CLIENT.EXE PAGE 84, LINE 4898

| | | | | | | | | |
|---|---|---|---|---|---|---|---|---|
| 0000233660 | 6765 | 7265 | 6420 | 7669 | 6469 | 2065 | 7962 | 3020 |
| 0000233700 | 0A0D | 0800 | 5200 | 3036 | 3830 | 0A0D | 202D | 6F6E |
| 0000233720 | 2074 | 6E65 | 756F | 6867 | 7320 | 6170 | 6563 | 6620 |
| 0000233740 | 726F | 6120 | 6772 | 6D75 | 6E65 | 7374 | 0A0D | 0900 |
| 0000233760 | 5200 | 3036 | 3930 | 0A0D | 202D | 6F6E | 2074 | 6E65 |
| 0000234000 | 756F | 6867 | 7320 | 6170 | 6563 | 6620 | 726F | 6520 |
| 0000234020 | 766E | 7269 | 6E6F | 656D | 746E | 0A0D | FC00 | 0D00 |
| 0000234040 | 000A | 00FF | 7572 | 2D6E | 6974 | 656D | 6520 | 7272 |
| 0000234060 | 726F | 0020 | 0011 | 3652 | 3130 | 0D37 | 2D0A | 7520 |
| 0000234100 | 656E | 7078 | 6365 | 6574 | 2064 | 756D | 746C | 7469 |
| 0000234120 | 7268 | 6165 | 2064 | 6F6C | 6B63 | 6520 | 7272 | 726F |
| 0000234140 | 0A0D | FD00 | 3A00 | 4D20 | 5441 | 0D48 | 2D0A | 6620 |
| 0000234160 | 6F6C | 7461 | 6E69 | 2D67 | 6F70 | 6E69 | 2074 | 7265 |
| 0000234200 | 6F72 | 3A72 | 0020 | 0065 | 6E69 | 6176 | 696C | 0D64 |
| 0000234220 | 000A | 0066 | 6564 | 6F6E | 6D72 | 6C61 | 0A0D | 6700 |
| 0000234240 | 6400 | 7669 | 6469 | 2065 | 7962 | 3020 | 0A0D | 6800 |
| 0000234260 | 6F00 | 6576 | 6672 | 6F6C | 0D77 | 000A | 0069 | 6E75 |
| 0000234300 | 6564 | 6672 | 6F6C | 0D77 | 000A | 006A | 6E69 | 7865 |
| 0000234320 | 6361 | 0D74 | 000A | 006B | 6E75 | 6D65 | 6C75 | 7461 |
| 0000234340 | 6465 | 0A0D | 6C00 | 7300 | 7571 | 7261 | 2065 | 6F72 |
| 0000234360 | 746F | 0A0D | 6D00 | 0D00 | 000A | 006E | 7473 | 6361 |
| 0000234400 | 206B | 766F | 7265 | 6C66 | 776F | 0A0D | 6F00 | 7300 |
| 0000234420 | 6174 | 6B63 | 7520 | 646E | 7265 | 6C66 | 776F | 0A0D |
| 0000234440 | 7000 | 6500 | 7078 | 696C | 6963 | 6C74 | 2079 | 6567 |
| 0000234460 | 656E | 6172 | 6574 | 0D64 | 000A | 0002 | 3652 | 3030 |
| 0000234500 | 0D32 | 2D0A | 6620 | 6F6C | 7461 | 6E69 | 2D67 | 6F70 |
| 0000234520 | 6E69 | 2074 | 7573 | 7070 | 726F | 2074 | 6F6E | 2074 |
| 0000234540 | 6F6C | 6461 | 6465 | 0A0D | 0100 | 5200 | 3036 | 3130 |
| 0000234560 | 0A0D | 202D | 756E | 6C6C | 7020 | 696F | 746E | 7265 |
| 0000234600 | 6120 | 7373 | 6769 | 6D6E | 6E65 | 0D74 | 000A | 0010 |
| 0000234620 | 3652 | 3130 | 0D36 | 2D0A | 6E20 | 746F | 6520 | 6F6E |
| 0000234640 | 6775 | 2068 | 7073 | 6361 | 2065 | 6F66 | 2072 | 6874 |
| 0000234660 | 6572 | 6461 | 6420 | 7461 | 0D61 | 000A | FFFF | 04FF |
| 0000234700 | 0200 | 0800 | 012D | 0000 | 0200 | FC00 | 042C | 0000 |
| 0000234720 | 0200 | 9200 | 0523 | 0000 | 0200 | EE00 | 062B | 0000 |
| 0000234740 | 4E00 | 3042 | CC32 | 0070 | 0100 | 0000 | DC00 | 002F |
| 0000234760 | 0000 | 0100 | 1100 | 2E2E | 6F5C | 6A62 | 635C | 696C |
| 0000235000 | 6E65 | 2E74 | 626F | 016A | DC00 | 742F | 0048 | 0000 |
| 0000235020 | 0100 | 1300 | 2E2E | 6F5C | 6A62 | 635C | 696C | 6E65 |
| 0000235040 | 5F74 | 2E6F | 626F | 016A | 6000 | DA78 | 0000 | 0100 |
| 0000235060 | 0100 | 0C00 | 736F | 5C32 | 7263 | 3074 | 612E | 6D73 |
| 0000235100 | 0001 | 793A | 005A | 0000 | 0001 | 0001 | 6609 | 7270 |
| 0000235120 | 6E69 | 6674 | 632E | 0001 | 7994 | 004E | 0000 | 0001 |
| 0000235140 | 0001 | 7008 | 6972 | 746E | 2E66 | 0163 | E200 | 3879 |
| 0000235160 | 0000 | 0100 | 0100 | 0700 | 6373 | 6E61 | 2E66 | 006J |
| 0000235200 | 0000 | 0000 | 0000 | 0100 | 0000 | 0700 | 665F | 6C69 |
| 0000235220 | 2E65 | 0163 | 1A00 | 2E7A | 0001 | 0100 | 0100 | 0800 |
| 0000235240 | 6666 | 756C | 6873 | 632E | 0001 | 7B48 | 000A | 0000 |
| 0000235260 | 0001 | 0001 | 6D0A | 6C61 | 6F6C | 2E63 | 7361 | 016D |
| 0000235300 | 5200 | 0A7B | 0000 | 0100 | 0100 | 0800 | 7266 | 6565 |
| 0000235320 | 612E | 6D73 | 0001 | 7B5C | 0046 | 0000 | 0001 | 0001 |
| 0000235340 | 730A | 7274 | 6163 | 2E74 | 7361 | 016D | A200 | 367B |
| 0000235360 | 0000 | 0100 | 0100 | 0A00 | 7473 | 6372 | 7970 | 612E |
| 0000235400 | 6D73 | 0001 | 7BD8 | 0017 | 0000 | 0001 | 0001 | 730A |
| 0000235420 | 7274 | 656C | 2E6E | 7361 | 016D | F000 | 777B | 0000 |
| 0000235440 | 0100 | 0100 | 0800 | 6567 | 7374 | 612E | 6D73 | 0001 |
| 0000235460 | 7C68 | 0074 | 0000 | 0001 | 0001 | 7309 | 7270 | 6E69 |
| 0000235500 | 6674 | 632E | 0001 | 7CDC | 002E | 0000 | 0001 | 0001 |
| 0000235520 | 630A | 6C61 | 6F6C | 2E63 | 7361 | 016D | 0A00 | 2E7D |

THU MAR 14 17:21:24 1991 CLIENT.EXE PAGE 85, LINE 4957

| | | | | | | | | |
|---|---|---|---|---|---|---|---|---|
| 0000235540 | 0000 | 0100 | 0100 | 0700 | 7463 | 6D69 | 2E65 | 0163 |
| 0000235560 | 3800 | 5E7D | 0000 | 0100 | 0100 | 0B00 | 6D68 | 6D65 |
| 0000235600 | 7063 | 2E79 | 7361 | 016D | 9600 | 487D | 0000 | 0100 |
| 0000235620 | 0100 | 0B00 | 6D68 | 6D65 | 6573 | 2E74 | 7361 | 016D |
| 0000235640 | DE00 | E67D | 0000 | 0100 | 0100 | 0800 | 7973 | 7473 |
| 0000235660 | 6D65 | 632E | 0001 | 7EC4 | 009A | 0000 | 0001 | 0001 |
| 0000235700 | 6C08 | 6964 | 2E76 | 7361 | 016D | 5E00 | 327F | 0000 |
| 0000235720 | 0100 | 0100 | 0800 | 6D6C | 6C75 | 612E | 6D73 | 0000 |
| 0000235740 | 0000 | 0000 | 0000 | 0001 | 0000 | 5C16 | 726D | 5C74 |
| 0000235760 | 6F63 | 6D6D | 6E6F | 665C | 7869 | 7075 | 2E73 | 5341 |
| 0000236000 | 014D | 9000 | 337F | 0000 | 0100 | 0100 | 1100 | 6D5C |
| 0000236020 | 7472 | 635C | 385C | 6637 | 6F74 | 2E6C | 5341 | 014D |
| 0000236040 | C400 | 147F | 0000 | 0100 | 0100 | 1300 | 6D5C | 7472 |
| 0000236060 | 635C | 665C | 746C | 7375 | 6465 | 2E63 | 5341 | 014D |
| 0000236100 | D800 | A97F | 0001 | 0100 | 0100 | 0F00 | 736F | 5C32 |
| 0000236120 | 7263 | 3074 | 6164 | 2E74 | 7361 | 016D | 8200 | 2281 |
| 0000236140 | 0000 | 0100 | 0100 | 0F00 | 736F | 5C32 | 7263 | 3074 |
| 0000236160 | 736D | 2E67 | 7361 | 016D | A400 | 8781 | 0001 | 0100 |
| 0000236200 | 0100 | 0F00 | 736F | 5C32 | 7473 | 6164 | 6772 | 2E76 |
| 0000236220 | 7361 | 016D | 2C00 | A383 | 0000 | 0100 | 0100 | 0F00 |
| 0000236240 | 736F | 5C32 | 7473 | 6564 | 766E | 2E70 | 7361 | 016D |
| 0000236260 | D000 | 6583 | 0000 | 0100 | 0100 | 0F00 | 736F | 5C32 |
| 0000236300 | 6D6E | 6773 | 6468 | 2E72 | 7361 | 016D | 3600 | C084 |
| 0000236320 | 0000 | 0100 | 0100 | 0E00 | 736F | 5C32 | 6F64 | 7273 |
| 0000236340 | 7465 | 612E | 6D73 | 0001 | 84F6 | 009C | 0000 | 0001 |
| 0000236360 | 0001 | 5F0B | 6966 | 626C | 6675 | 612E | 6D73 | 0001 |
| 0000236400 | 8592 | 00E5 | 0000 | 0001 | 0001 | 5F0B | 6C66 | 6273 |
| 0000236420 | 6675 | 612E | 6D73 | 0001 | 8678 | 00C0 | 0000 | 0001 |
| 0000236440 | 0001 | 5F0B | 6673 | 6274 | 6675 | 612E | 6D73 | 0001 |
| 0000236460 | 8738 | 082A | 0000 | 0001 | 0001 | 6907 | 706E | 7475 |
| 0000236500 | 632E | 0001 | 8F62 | 04FA | 0000 | 0001 | 0001 | 6F0A |
| 0000236520 | 7475 | 7570 | 2E74 | 7361 | 016D | 5C00 | F494 | 0001 |
| 0000236540 | 0100 | 0100 | 0900 | 7277 | 7469 | 2E65 | 7361 | 016D |
| 0000236560 | 5000 | AF96 | 0000 | 0100 | 0100 | 0B00 | 6D66 | 6C61 |
| 0000236600 | 6F6C | 2E63 | 7361 | 006D | 0000 | 0000 | 0000 | 0100 |
| 0000236620 | 0000 | 0C00 | 6D63 | 7369 | 6463 | 7461 | 612E | 6D73 |
| 0000236640 | 0001 | 9700 | 00A6 | 0000 | 0001 | 0001 | 6708 | 7465 |
| 0000236660 | 6E65 | 2E76 | 0163 | A600 | B297 | 0000 | 0100 | 0100 |
| 0000236700 | 0D00 | 736F | 5C32 | 6C6D | 636F | 2E6B | 7361 | 016D |
| 0000236720 | 5800 | 9C98 | 0001 | 0100 | 0100 | 0900 | 7361 | 7463 |
| 0000236740 | 6D69 | 2E65 | 0163 | F400 | 8499 | 0000 | 0100 | 0100 |
| 0000236760 | 0A00 | 6F6C | 6163 | 746C | 6D69 | 632E | 0001 | 9A78 |
| 0000237000 | 0394 | 0000 | 0001 | 0001 | 6F0D | 3273 | 735C | 6170 |
| 0000237020 | 6E77 | 6576 | 632E | 0001 | 9E0C | 01CE | 0000 | 0001 |
| 0000237040 | 0001 | 730A | 6170 | 6E77 | 7076 | 2E65 | 0163 | DA00 |
| 0000237060 | 3B9F | 0000 | 0100 | 0100 | 0E00 | 736F | 5C32 | 6361 |
| 0000237100 | 6563 | 7373 | 612E | 6D73 | 0001 | A016 | 0660 | 0000 |
| 0000237120 | 0001 | 0001 | 5C0C | 726D | 5C74 | 5C63 | 7663 | 2E74 |
| 0000237140 | 0163 | 7600 | 6FA6 | 0000 | 0100 | 0100 | 1100 | 6D5C |
| 0000237160 | 7472 | 635C | 635C | 7066 | 6973 | 2E67 | 5341 | 014D |
| 0000237200 | E600 | 16A6 | 0004 | 0100 | 0100 | 0E00 | 6D5C | 7472 |
| 0000237220 | 635C | 635C | 7476 | 646C | 632E | 0001 | CAB0 | 25E7 |
| 0000237240 | 0000 | 0001 | 0001 | 5C1E | 726D | 5C74 | 6D65 | 6C75 |
| 0000237260 | 7461 | 726F | 335C | 3638 | 655C | 756D | 616C | 6F74 |
| 0000237300 | 2E72 | 7361 | 016D | FC00 | 06AA | 0000 | 0100 | 0100 |
| 0000237320 | 0A00 | 7263 | 3074 | 7066 | 612E | 6D73 | 0001 | AB02 |
| 0000237340 | 0032 | 0000 | 0001 | 0001 | 630A | 6B68 | 7473 | 2E6B |
| 0000237360 | 7361 | 016D | 3400 | 24AB | 0000 | 0100 | 0100 | 0A00 |
| 0000237400 | 6863 | 736B | 6D75 | 612E | 6D73 | 0001 | AB58 | 0021 |

THU MAR 14 17:21:24 1991 CLIENT.EXE PAGE 86, LINE 5016

| | | | | | | | | |
|---|---|---|---|---|---|---|---|---|
| 0000237420 | 0000 | 0001 | 0001 | 6F10 | 3273 | 735C | 6474 | 6C61 |
| 0000237440 | 6F6C | 2E63 | 7361 | 006D | 0000 | 0000 | 0000 | 0100 |
| 0000237460 | 0000 | 0B00 | 635F | 6C66 | 7375 | 2E68 | 7361 | 016D |
| 0000237500 | 7A00 | 4BAB | 0000 | 0100 | 0100 | 0800 | 675F | 7465 |
| 0000237520 | 7562 | 2E66 | 7361 | 016D | C600 | AAAB | 0000 | 0100 |
| 0000237540 | 0100 | 0800 | 6E75 | 6567 | 6374 | 632E | 0001 | AC70 |
| 0000237560 | 0077 | 0000 | 0001 | 0001 | 6F0D | 3273 | 6C5C | 6573 |
| 0000237600 | 6B65 | 612E | 6D73 | 0001 | ACE8 | 015D | 0000 | 0001 |
| 0000237620 | 0001 | 6F0C | 3273 | 725C | 6165 | 2E64 | 7361 | 016D |
| 0000237640 | 4600 | 1EAE | 0000 | 0100 | 0100 | 0C00 | 7473 | 6361 |
| 0000237660 | 616B | 6176 | 612E | 6D73 | 0000 | 0000 | 0000 | 0000 |
| 0000237700 | 0001 | 0000 | 6609 | 6164 | 6174 | 612E | 6D73 | 0001 |
| 0000237720 | AE64 | 007C | 0000 | 0001 | 0001 | 730C | 6165 | 6372 |
| 0000237740 | 7368 | 2E67 | 7361 | 016D | E000 | E2AE | 0000 | 0100 |
| 0000237760 | 0100 | 0B00 | 7267 | 776F | 6573 | 2E67 | 7361 | 016D |
| 0000240000 | C200 | 31AF | 0000 | 0100 | 0100 | 0A00 | 656E | 7377 |
| 0000240020 | 6765 | 612E | 6D73 | 0001 | AFF4 | 003B | 0000 | 0001 |
| 0000240040 | 0001 | 730B | 7274 | 636E | 706D | 612E | 6D73 | 0001 |
| 0000240060 | B030 | 0060 | 0000 | 0001 | 0001 | 6106 | 6F74 | 2E66 |
| 0000240100 | 0163 | 9000 | A2B0 | 0000 | 0100 | 0100 | 0A00 | 665F |
| 0000240120 | 7470 | 736F | 7274 | 632E | 0000 | 0000 | 0000 | 0000 |
| 0000240140 | 0001 | 0000 | 6309 | 7974 | 6570 | 612E | 6D73 | 0001 |
| 0000240160 | B132 | 007A | 0000 | 0001 | 0001 | 6410 | 6C6C | 745C |
| 0000240200 | 6469 | 6174 | 6C62 | 2E65 | 7361 | 016D | AC00 | 46B1 |
| 0000240220 | 0002 | 0100 | 0100 | 0800 | 6D67 | 6974 | 656D | 632E |
| 0000240240 | 0001 | B3F2 | 01C8 | 0000 | 0001 | 0001 | 7407 | 737A |
| 0000240260 | 7465 | 632E | 0000 | 0000 | 0000 | 0000 | 0001 | 0000 |
| 0000240300 | 7409 | 6D69 | 7365 | 7465 | 632E | 0001 | B5BA | 002D |
| 0000240320 | 0000 | 0001 | 0001 | 730A | 7274 | 6863 | 2E72 | 7361 |
| 0000240340 | 016D | E800 | 45B5 | 0000 | 0100 | 0100 | 0B00 | 7473 |
| 0000240360 | 6972 | 6D63 | 2E70 | 7361 | 016D | 2E00 | 2EB6 | 0000 |
| 0000240400 | 0100 | 0100 | 0B00 | 7473 | 7272 | 6863 | 2E72 | 7361 |
| 0000240420 | 016D | 5C00 | CAB6 | 0000 | 0100 | 0100 | 0B00 | 6D68 |
| 0000240440 | 6D65 | 7063 | 2E79 | 7361 | 016D | 2600 | AAB7 | 0000 |
| 0000240460 | 0100 | 0100 | 0900 | 6567 | 7074 | 7461 | 2E68 | 0163 |
| 0000240500 | D000 | 1AB7 | 0000 | 0100 | 0100 | 0F00 | 736F | 5C32 |
| 0000240520 | 7277 | 3274 | 7265 | 2E72 | 7361 | 016D | EA00 | 0CB7 |
| 0000240540 | 0001 | 0100 | 0100 | 0A00 | 6573 | 7261 | 6863 | 6E65 |
| 0000240560 | 632E | 0001 | B8F6 | 043A | 0000 | 0001 | 0001 | 6F0D |
| 0000240600 | 3273 | 635C | 6E65 | 6176 | 6772 | 632E | 0001 | BD30 |
| 0000240620 | 0082 | 0000 | 0001 | 0001 | 6F0F | 3273 | 645C | 736F |
| 0000240640 | 6170 | 6E77 | 612E | 6D73 | 0001 | BDB2 | 0022 | 0000 |
| 0000240660 | 0001 | 0001 | 6109 | 6D6C | 6C75 | 612E | 6D73 | 0001 |
| 0000240700 | BDD4 | 001F | 0000 | 0001 | 0001 | 6109 | 736C | 6C68 |
| 0000240720 | 612E | 6D73 | 0001 | F098 | 0229 | 0000 | 0001 | 0001 |
| 0000240740 | 5C17 | 726D | 5C74 | 6F63 | 6D6D | 6E6F | 785C | 3031 |
| 0000240760 | 6F66 | 7475 | 412E | 4D53 | 0001 | BDF4 | 0049 | 0000 |
| 0000241000 | 0001 | 0001 | 5C10 | 726D | 5C74 | 5C63 | 6663 | 756F |
| 0000241020 | 2E74 | 5341 | 014D | 3E00 | 28BE | 0000 | 0100 | 0100 |
| 0000241040 | 0E00 | 6D5C | 7472 | 635C | 615C | 6F74 | 646C | 632E |
| 0000241060 | 0001 | BE66 | 0004 | 0000 | 0001 | 0001 | 5C1A | 726D |
| 0000241100 | 5C74 | 6D65 | 6C75 | 7461 | 726F | 335C | 3638 | 655C |
| 0000241120 | 646D | 2E73 | 7361 | 016D | 6A00 | 34BE | 0000 | 0100 |
| 0000241140 | 0100 | 0B00 | 6E69 | 7469 | 6573 | 2E67 | 7361 | 016D |
| 0000241160 | 9E00 | 36BE | 0000 | 0100 | 0100 | 0B00 | 696C | 6B6E |
| 0000241200 | 6573 | 2E67 | 7361 | 016D | D400 | 2ABE | 0000 | 0100 |
| 0000241220 | 0100 | 0B00 | 7473 | 6E72 | 7063 | 2E79 | 7361 | 016D |
| 0000241240 | FE00 | 03BE | 0000 | 0100 | 0100 | 0800 | 7461 | 6C6F |
| 0000241260 | 612E | 6D73 | 0001 | BF02 | 0020 | 0000 | 0001 | 0001 |

THU MAR 14 17:21:24 1991 CLIENT.EXE PAGE 87, LINE 5075

| | | | | | | | | |
|---|---|---|---|---|---|---|---|---|
| 0000241300 | 6F0D | 3273 | 685C | 6964 | 6666 | 612E | 6D73 | 0000 |
| 0000241320 | 0000 | 0000 | 0000 | 0001 | 0000 | 6406 | 7961 | 2E73 |
| 0000241340 | 0063 | 0000 | 0000 | 0000 | 0100 | 0000 | 0A00 | 6663 |
| 0000241360 | 6E69 | 6F66 | 612E | 6D73 | 0001 | BF22 | 013A | 0000 |
| 0000241400 | 0001 | 0001 | 6F0C | 3273 | 675C | 7465 | 7763 | 2E64 |
| 0000241420 | 0163 | 5C00 | 22C0 | 0000 | 0100 | 0100 | 0900 | 6C61 |
| 0000241440 | 6572 | 2E6D | 7361 | 016D | 7E00 | A0C0 | 0000 | 0100 |
| 0000241460 | 0100 | 0800 | 726C | 6D65 | 612E | 6D73 | 0001 | C11E |
| 0000241500 | 000B | 0000 | 0001 | 0001 | 6C08 | 6873 | 2E6C | 7361 |
| 0000241520 | 016D | 2A00 | 5FC1 | 0000 | 0100 | 0100 | 0900 | 6C75 |
| 0000241540 | 6964 | 2E76 | 7361 | 016D | 8A00 | 6AC1 | 0000 | 0100 |
| 0000241560 | 0100 | 0900 | 6C75 | 6572 | 2E6D | 7361 | 016D | F400 |
| 0000241600 | D1C1 | 0001 | 0100 | 0100 | 1600 | 6D5C | 7472 | 635C |
| 0000241620 | 6D6F | 6F6D | 5C6E | 3878 | 6F66 | 7475 | 412E | 4D53 |
| 0000241640 | 0001 | F2C2 | 0512 | 0000 | 0001 | 0001 | 5C16 | 726D |
| 0000241660 | 5C74 | 6F63 | 6D6D | 6E6F | 745C | 6E65 | 6F70 | 2E77 |
| 0000241700 | 7361 | 016D | D400 | 6CF7 | 0002 | 0100 | 0100 | 1800 |
| 0000241720 | 6D5C | 7472 | 635C | 6D6F | 6F6D | 5C6E | 7473 | 6772 |
| 0000241740 | 6F74 | 646C | 612E | 6D73 | 0001 | C3C6 | 009D | 0000 |
| 0000241760 | 0001 | 0001 | 5C0F | 726D | 5C74 | 5C63 | 6663 | 6E69 |
| 0000242000 | 412E | 4D53 | 0001 | C464 | 0056 | 0000 | 0001 | 0001 |
| 0000242020 | 6108 | 6F74 | 2E78 | 7361 | 016D | BA00 | 2AC4 | 0000 |
| 0000242040 | 0100 | 0100 | 0D00 | 736F | 5C32 | 7264 | 7669 | 2E65 |
| 0000242060 | 7361 | 016D | E400 | 12C4 | 0004 | 0100 | 0100 | 1600 |
| 0000242100 | 6D5C | 7472 | 635C | 6D6F | 6F6D | 5C6E | 3878 | 6966 |
| 0000242120 | 326E | 412E | 4D53 | 0001 | C8F6 | 01BA | 0000 | 0001 |
| 0000242140 | 0001 | 5C16 | 726D | 5C74 | 6F63 | 6D6D | 6E6F | 785C |
| 0000242160 | 7438 | 756D | 2E6C | 5341 | 014D | 4000 | B9FA | 0000 |
| 0000242200 | 0100 | 0100 | 1700 | 6D5C | 7472 | 635C | 6D6F | 6F6D |
| 0000242220 | 5C6E | 616D | 746E | 6C6F | 2E64 | 7361 | 136D | 0129 |
| 0000242240 | 6A00 | 0D05 | 755F | 6974 | 5F6C | 6168 | 646E | 656C |
| 0000242260 | BC72 | 0117 | 5A00 | 0D05 | 745F | 7365 | 5F74 | 6168 |
| 0000242300 | 646E | 656C | 0072 | 0100 | 2600 | 0B05 | 675F | 7465 |
| 0000242320 | 685F | 7865 | 695F | 9B64 | 0101 | 2E00 | 0D05 | 745F |
| 0000242340 | 6572 | 5F65 | 6168 | 646E | 656C | CD72 | 0106 | 3C00 |
| 0000242360 | 0F05 | 665F | 5F77 | 626F | 5F6A | 6168 | 646E | 656C |
| 0000242400 | 8572 | 0120 | 6000 | 0F05 | 635F | 6E6F | 6966 | 5F67 |
| 0000242420 | 6168 | 646E | 656C | 6372 | 012B | 6C00 | 0B05 | 705F |
| 0000242440 | 6972 | 746E | 685F | 6C65 | 2470 | 012D | 6F00 | 0505 |
| 0000242460 | 6D5F | 6961 | 426E | 0128 | 6700 | 1005 | 725F | 6365 |
| 0000242500 | 766F | 7265 | 685F | 6E61 | 6C64 | 7265 | 0048 | 0006 |
| 0000242520 | 0085 | 5F06 | 6162 | 6374 | 3F68 | 0140 | 6100 | 0E05 |
| 0000242540 | 695F | 616D | 6567 | 685F | 6E61 | 6C64 | 7265 | 4CC5 |
| 0000242560 | 0001 | 056F | 5F14 | 616C | 6579 | 6572 | 5F64 | 6D69 |
| 0000242600 | 5F67 | 6168 | 646E | 656C | 2F72 | 015F | 7700 | 0F05 |
| 0000242620 | 665F | 6C69 | 6574 | 5F72 | 6168 | 646E | 656C | BD72 |
| 0000242640 | 0165 | 8200 | 1005 | 675F | 6E65 | 7265 | 6369 | 685F |
| 0000242660 | 6E61 | 6C64 | 7265 | 6A4C | 0001 | 0585 | 5F0C | 6F61 |
| 0000242700 | 5F69 | 6168 | 646E | 656C | 8472 | 0174 | 9100 | 0D05 |
| 0000242720 | 695F | 6F63 | 5F6E | 6168 | 646E | 656C | 6072 | 062F |
| 0000242740 | 0000 | 0600 | 655F | 6164 | 6174 | 3070 | 0006 | 0000 |
| 0000242760 | 5F04 | 6E65 | 6664 | 0623 | 0000 | 0C00 | 5F5F | 686E |
| 0000243000 | 6165 | 5F70 | 6564 | 6373 | 238C | 0006 | 0000 | 5F0C |
| 0000243020 | 5F5F | 4461 | 7342 | 7077 | 6C66 | 5867 | 0623 | 0000 |
| 0000243040 | 0800 | 5F5F | 6361 | 646D | 6E6C | 238A | 0006 | 0000 |
| 0000243060 | 5F08 | 615F | 6573 | 6867 | 8869 | 0623 | 0000 | 0800 |
| 0000243100 | 5F5F | 7361 | 6765 | 6F6C | 2364 | 0006 | 0000 | 5F08 |
| 0000243120 | 615F | 6973 | 647A | 6073 | 0178 | 0000 | 0800 | 5F5F |
| 0000243140 | 7361 | 6174 | 7472 | 235C | 0006 | 0000 | 5F08 | 615F |

THU MAR 14 17:21:24 1991 CLIENT.EXE PAGE 88, LINE 5134

| | | | | | | | | |
|---|---|---|---|---|---|---|---|---|
| 0000243160 | 6F74 | 7370 | 7A70 | 0623 | 0000 | 0900 | 5F5F | 6361 |
| 0000243200 | 6966 | 666E | D66F | 00D6 | 0100 | 0900 | 5F5F | 4461 |
| 0000243220 | 7542 | 6573 | 5A64 | 0623 | 0000 | 0900 | 5F5F | 6561 |
| 0000243240 | 766E | 6573 | D467 | 0178 | 0000 | 0900 | 5F5F | 6963 |
| 0000243260 | 746E | 4944 | 6056 | 0623 | 0000 | 0A00 | 5F5F | 6874 |
| 0000243300 | 6572 | 6461 | 6469 | 235E | 0006 | 0000 | 5F0A | 675F |
| 0000243320 | 6E69 | 6F66 | 6573 | D667 | 00D6 | 0100 | 0A00 | 5F5F |
| 0000243340 | 4461 | 6442 | 736F | 7077 | 2362 | 0006 | 0000 | 5F0A |
| 0000243360 | 6C5F | 6E69 | 6F66 | 6573 | 7667 | 0098 | 0100 | 0A00 |
| 0000243400 | 5F5F | 6361 | 7472 | 7375 | 6465 | 238E | 0006 | 0000 |
| 0000243420 | 5F0B | 5F5F | 4461 | 7242 | 6574 | 7272 | 78DC | 0001 |
| 0000243440 | 0000 | 5F0B | 615F | 736D | 5F67 | 7865 | 7469 | 793A |
| 0000243460 | 0001 | 0000 | 5F08 | 7066 | 6972 | 746E | 9466 | 0179 |
| 0000243500 | 0000 | 0700 | 705F | 6972 | 746E | E266 | 0179 | 0000 |
| 0000243520 | 0600 | 735F | 6163 | 666E | 0000 | 0005 | 0000 | 5F07 |
| 0000243540 | 625F | 6675 | 6E69 | 2390 | 0006 | 0000 | 5F05 | 695F |
| 0000243560 | 626F | 2570 | 0006 | 0000 | 5F06 | 695F | 626F | 5032 |
| 0000243600 | 0627 | 0000 | 0900 | 5F5F | 616C | 7473 | 6F69 | 6062 |
| 0000243620 | 017A | 0000 | 0B00 | 5F5F | 6666 | 756C | 6873 | 6C5F |
| 0000243640 | 1A6B | 017A | 0000 | 0700 | 665F | 6C66 | 7375 | CC68 |
| 0000243660 | 017A | 0000 | 0900 | 665F | 756C | 6873 | 6C61 | 486C |
| 0000243700 | 017B | 0000 | 0700 | 6D5F | 6C61 | 6F6C | 4D63 | 017B |
| 0000243720 | 0000 | 0A00 | 6D5F | 6C61 | 6F6C | 5F63 | 6B6C | 7B57 |
| 0000243740 | 0001 | 0000 | 5F08 | 7266 | 6565 | 6C5F | 526B | 017B |
| 0000243760 | 0000 | 0500 | 665F | 6572 | 5C65 | 017B | 0000 | 0700 |
| 0000244000 | 735F | 7274 | 6163 | A274 | 017B | 0000 | 0700 | 735F |
| 0000244020 | 7274 | 7063 | D879 | 017B | 0000 | 0700 | 735F | 7274 |
| 0000244040 | 656C | F06E | 017B | 0000 | 0500 | 675F | 7465 | 6873 |
| 0000244060 | 017C | 0000 | 0800 | 735F | 7270 | 6E69 | 6674 | 7CDC |
| 0000244100 | 0001 | 0000 | 5F07 | 6163 | 6C6C | 636F | 7D0A | 0001 |
| 0000244120 | 0000 | 5F06 | 7463 | 6D69 | 3865 | 017D | 0000 | 0700 |
| 0000244140 | 6D5F | 6D65 | 7063 | 9679 | 017D | 0000 | 0700 | 6D5F |
| 0000244160 | 6D65 | 6573 | DE74 | 017D | 0000 | 0700 | 735F | 7379 |
| 0000244200 | 6574 | C46D | 017E | 0000 | 0800 | 5F5F | 4661 | 646C |
| 0000244220 | 7669 | 7F5E | 0001 | 0000 | 5F08 | 615F | 6C46 | 756D |
| 0000244240 | 5E6C | 017F | 0000 | 0900 | 5F5F | 4661 | 6C75 | 756D |
| 0000244260 | 326C | 00FE | 0100 | 0600 | 4946 | 5241 | 5151 | 4000 |
| 0000244300 | 0000 | 0001 | 4606 | 414A | 5152 | 3251 | 000E | 0100 |
| 0000244320 | 0600 | 4946 | 5243 | 5151 | C000 | 0000 | 0001 | 4606 |
| 0000244340 | 434A | 5152 | 3251 | 005C | 0100 | 0600 | 4946 | 5244 |
| 0000244360 | 5151 | 1632 | 0000 | 0001 | 4606 | 4549 | 5152 | 3251 |
| 0000244400 | 0006 | 0100 | 0600 | 4946 | 5253 | 5151 | 8000 | 0000 |
| 0000244420 | 0001 | 4606 | 534A | 5152 | 3D51 | 00A2 | 0100 | 0600 |
| 0000244440 | 4946 | 5257 | 5151 | 7F90 | 0001 | 0000 | 5F06 | 665F |
| 0000244460 | 6F74 | 906C | 017F | 0000 | 0800 | 5F5F | 4661 | 7466 |
| 0000244500 | 6C6F | 9876 | 0000 | 0001 | 5F09 | 665F | 746C | 7375 |
| 0000244520 | 6465 | 2798 | 0006 | 0000 | 5F0B | 6F5F | 7673 | 7265 |
| 0000244540 | 6973 | 6E6F | 8077 | 0001 | 0000 | 5F06 | 655F | 6978 |
| 0000244560 | 3D74 | 0181 | 0000 | 0C00 | 5F5F | 6E75 | 6F6C | 6B63 |
| 0000244600 | 7865 | 7469 | 29AC | 0006 | 0000 | 5F07 | 635F | 6968 |
| 0000244620 | 646C | 279C | 0006 | 0000 | 5F07 | 6E5F | 6966 | 656C |
| 0000244640 | 7FD8 | 0001 | 0000 | 5F07 | 635F | 6E69 | 7469 | 299E |
| 0000244660 | 0006 | 0000 | 5F07 | 5F5F | 7261 | 6367 | 807F | 0001 |
| 0000244700 | 0000 | 5F07 | 635F | 7865 | 7469 | 2798 | 0006 | 0000 |
| 0000244720 | 5F0D | 645F | 736F | 6576 | 6D72 | 6A61 | 726F | 29A0 |
| 0000244740 | 0006 | 0000 | 5F07 | 5F5F | 7261 | 7667 | 2799 | 0006 |
| 0000244760 | 0000 | 5F0D | 645F | 736F | 6576 | 6D72 | 6E69 | 726F |
| 0000245000 | 289E | 0006 | 0000 | 5F08 | 705F | 7069 | 6365 | A468 |
| 0000245020 | 0629 | 0000 | 0800 | 655F | 766E | 7269 | 6E6F | 279E |

THU MAR 14 17:21:24 1991 CLIENT.EXE PAGE 89, LINE 5193

| | | | | | | | | |
|---|---|---|---|---|---|---|---|---|
| 0000245040 | 0006 | 0000 | 5F08 | 6F5F | 6673 | 6C69 | 9A65 | 0627 |
| 0000245060 | 0000 | 0800 | 5F5F | 736F | 6F6D | 6564 | 803B | 0001 |
| 0000245100 | 0000 | 5F08 | 695F | 696E | 6674 | F670 | 062C | 0000 |
| 0000245120 | 0800 | 5F5F | 7066 | 6E69 | 7469 | 8160 | 0001 | 0000 |
| 0000245140 | 5F08 | 745F | 7265 | 666D | A870 | 0629 | 0000 | 0800 |
| 0000245160 | 5F5F | 6770 | 706D | 7274 | 8089 | 0001 | 0000 | 5F08 |
| 0000245200 | 635F | 655F | 6978 | 9A74 | 0627 | 0000 | 0900 | 5F5F |
| 0000245220 | 6F64 | 6D73 | 646F | 9865 | 0627 | 0000 | 0900 | 5F5F |
| 0000245240 | 736F | 616D | 6F6A | 9972 | 0627 | 0000 | 0900 | 5F5F |
| 0000245260 | 736F | 696D | 6F6E | F372 | 0180 | 0000 | 0A00 | 5F5F |
| 0000245300 | 6F6C | 6B63 | 7865 | 7469 | 2796 | 0006 | 0000 | 5F0A |
| 0000245320 | 755F | 616D | 6B73 | 6176 | 606C | 0181 | 0000 | 0A00 |
| 0000245340 | 5F5F | 7463 | 7265 | 736D | 6275 | 29AE | 0006 | 0000 |
| 0000245360 | 5F0A | 655F | 6978 | 5F74 | 6974 | 8C64 | 0627 | 0000 |
| 0000245400 | 0500 | 5F5F | 6166 | 7063 | 0180 | 0000 | 0500 | 655F |
| 0000245420 | 6978 | 8274 | 0181 | 0000 | 0E00 | 5F5F | 4646 | 4D5F |
| 0000245440 | 4753 | 4142 | 4E4E | 5245 | 29B0 | 0006 | 0000 | 5F09 |
| 0000245460 | 615F | 6264 | 6D67 | 6773 | 9876 | 0000 | 0001 | 5F09 |
| 0000245500 | 615F | 7263 | 6D74 | 6773 | 81A4 | 0001 | 0000 | 5F09 |
| 0000245520 | 735F | 7465 | 7261 | 7667 | 832C | 0001 | 0000 | 5F09 |
| 0000245540 | 735F | 7465 | 6E65 | 7076 | 83D0 | 0001 | 0000 | 5F0B |
| 0000245560 | 4E5F | 534D | 5F47 | 4554 | 5458 | 8400 | 0001 | 0000 |
| 0000245600 | 5F0C | 4E5F | 534D | 5F47 | 5257 | 5449 | E245 | 0184 |
| 0000245620 | 0000 | 0B0C | 5F5F | 645F | 736F | 7265 | 6E72 | EA6F |
| 0000245640 | 0184 | 0000 | 0700 | 5F5F | 7265 | 6E72 | 986F | 0184 |
| 0000245660 | 0000 | 0800 | 5F5F | 6F64 | 7273 | 7465 | 8482 | 0001 |
| 0000245700 | 0000 | 5F09 | 645F | 736F | 6572 | 6674 | 84F6 | 0001 |
| 0000245720 | 0000 | 5F08 | 665F | 6C69 | 7562 | 9266 | 0185 | 0000 |
| 0000245740 | 0800 | 5F5F | 6C66 | 6273 | 6675 | 86F0 | 0001 | 0000 |
| 0000245760 | 5F07 | 665F | 6274 | 6675 | 8678 | 0001 | 0000 | 5F07 |
| 0000246000 | 735F | 6274 | 6675 | 8738 | 0001 | 0000 | 5F07 | 695F |
| 0000246020 | 706E | 7475 | 8F72 | 0001 | 0000 | 5F08 | 6F5F | 7475 |
| 0000246040 | 7570 | 6674 | 0194 | 0000 | 0600 | 775F | 6972 | 6574 |
| 0000246060 | 945C | 0001 | 0000 | 5F0A | 775F | 6972 | 6574 | 6C5F |
| 0000246100 | 826B | 0196 | 0000 | 0C00 | 5F5F | 6D66 | 6C61 | 6F6C |
| 0000246120 | 5F63 | 6B6C | 9650 | 0001 | 0000 | 5F07 | 665F | 7266 |
| 0000246140 | 6565 | 9663 | 0001 | 0000 | 5F09 | 665F | 616D | 6C6C |
| 0000246160 | 636F | 9650 | 0001 | 0000 | 5F0A | 665F | 7266 | 6565 |
| 0000246200 | 6C5F | 2C6B | 062A | 0000 | 0D00 | 5F5F | 6663 | 746C |
| 0000246220 | 7663 | 5F74 | 6174 | 4862 | 062A | 0000 | 0800 | 5F5F |
| 0000246240 | 7361 | 7A69 | 4365 | 2A49 | 0006 | 0000 | 5F08 | 615F |
| 0000246260 | 6973 | 657A | 4644 | 062A | 0000 | 0B00 | 5F5F | 6973 |
| 0000246300 | 6967 | 746E | 666F | 4466 | 062A | 0000 | 0B00 | 5F5F |
| 0000246320 | 6973 | 6967 | 746E | 6573 | 0067 | 0197 | 0000 | 0700 |
| 0000246340 | 675F | 7465 | 6E65 | F676 | 0197 | 0000 | 0600 | 5F5F |
| 0000246360 | 6F6C | 6B63 | 9838 | 0001 | 0000 | 5F07 | 6C5F | 636F |
| 0000246400 | 666B | 97CA | 0001 | 0000 | 5F0D | 755F | 6C6E | 636F |
| 0000246420 | 5F6B | 6966 | 656C | 97A6 | 0001 | 0000 | 5F0D | 6C5F |
| 0000246440 | 636F | 5F6B | 7473 | 6572 | 6D61 | 981C | 0001 | 0000 |
| 0000246460 | 5F08 | 755F | 6C6E | 636F | 486B | 0198 | 0000 | 0900 |
| 0000246500 | 5F5F | 6E75 | 6F6C | 6B63 | B266 | 0197 | 0000 | 0F00 |
| 0000246520 | 5F5F | 6E75 | 6F6C | 6B63 | 735F | 7274 | 6165 | D66D |
| 0000246540 | 0197 | 0000 | 0A00 | 5F5F | 6177 | 7469 | 6F6C | 6B63 |
| 0000246560 | 97BE | 0001 | 0000 | 5F0B | 6C5F | 636F | 5F6B | 6966 |
| 0000246600 | 656C | 988E | 0001 | 0000 | 5F08 | 7361 | 7463 | 6D69 |
| 0000246620 | F465 | 0199 | 0000 | 0AD0 | 6C5F | 636F | 6C61 | 6974 |
| 0000246640 | 656D | 9BDA | 0001 | 0000 | 5F08 | 7073 | 7761 | 766E |
| 0000246660 | 0C65 | 019E | 0000 | 0900 | 735F | 6170 | 6E77 | 7076 |
| 0000246700 | DA65 | 019F | 0000 | 0700 | 615F | 6363 | 7365 | 1673 |

THU MAR 14 17:21:24 1991 CLIENT.EXE PAGE 90, LINE 5252

| | | | | | | | | |
|---|---|---|---|---|---|---|---|---|
| 0000246720 | 01A0 | 0000 | 0B00 | 5F5F | 6F66 | 6372 | 6564 | 7063 |
| 0000246740 | 8674 | 01A0 | 0000 | 0B00 | 5F5F | 7263 | 706F | 657A |
| 0000246760 | 6F72 | 0473 | 01A1 | 0000 | 0A00 | 5F5F | 6F70 | 6973 |
| 0000247000 | 6974 | 6576 | A132 | 0001 | 0000 | 5F09 | 665F | 7361 |
| 0000247020 | 6973 | 6E67 | A2CA | 0001 | 0000 | 5F07 | 635F | 7466 |
| 0000247040 | 656F | A470 | 0001 | 0000 | 5F07 | 635F | 7466 | 666F |
| 0000247060 | A4F8 | 0001 | 0000 | 5F07 | 635F | 7466 | 676F | A5E0 |
| 0000247100 | 0001 | 0000 | 5F09 | 635F | 6C66 | 6374 | 7476 | A676 |
| 0000247120 | 0001 | 0000 | 5F0A | 665F | 7370 | 6769 | 616E | AA6C |
| 0000247140 | 01A8 | 0000 | 0800 | 5F5F | 6C63 | 7464 | 666F | AA18 |
| 0000247160 | 0001 | 0000 | 5F08 | 635F | 646C | 6F74 | 9467 | 01AA |
| 0000247200 | 0000 | 0800 | 5F5F | 6C63 | 6364 | 7476 | A6E6 | 0001 |
| 0000247220 | 0000 | 5F08 | 635F | 646C | 6F74 | 9E65 | 0402 | 0000 |
| 0000247240 | 0C00 | 5F5F | 7066 | 6174 | 6B73 | 6164 | 6174 | D30A |
| 0000247260 | 0001 | 0000 | 5F0C | 665F | 6570 | 756D | 616C | 6F74 |
| 0000247300 | DA72 | 01CA | 0000 | 0800 | 5F5F | 7066 | 616D | 6874 |
| 0000247320 | F097 | 0001 | 0000 | 5F0F | 665F | 6570 | 756D | 616C |
| 0000247340 | 6F74 | 6572 | 646E | CAB0 | 0001 | 0000 | 5F11 | 665F |
| 0000247360 | 6570 | 756D | 616C | 6F74 | 6272 | 6765 | 6E69 | AAFC |
| 0000247400 | 0001 | 0000 | 5F08 | 665F | 7470 | 6172 | AE70 | 062A |
| 0000247420 | 0000 | 0C00 | 5F5F | 6161 | 746C | 7473 | 6F6B | 7276 |
| 0000247440 | AB02 | 0001 | 0000 | 5F08 | 635F | 6B68 | 7473 | 026B |
| 0000247460 | 01AB | 0000 | 0A00 | 5F5F | 4661 | 6B63 | 736B | 6B74 |
| 0000247500 | AB34 | 0001 | 0000 | 5F0B | 6E5F | 6C75 | 636C | 6566 |
| 0000247520 | 6B63 | 0042 | 0006 | 0000 | 5F0B | 615F | 756E | 6C6C |
| 0000247540 | 6973 | 657A | AB58 | 0001 | 0000 | 5F0A | 735F | 6474 |
| 0000247560 | 6C61 | 6F6C | B263 | 062A | 0000 | 0800 | 5F5F | 6663 |
| 0000247600 | 756C | 6873 | AB7A | 0001 | 0000 | 5F08 | 675F | 7465 |
| 0000247620 | 7562 | C666 | 01AB | 0000 | 0700 | 755F | 676E | 7465 |
| 0000247640 | 0663 | 01AC | 0000 | 0B00 | 5F5F | 6E75 | 6567 | 6374 |
| 0000247660 | 6C5F | 7A6B | 01AC | 0000 | 0600 | 6C5F | 6573 | 6B65 |
| 0000247700 | AC70 | 0001 | 0000 | 5F0A | 6C5F | 6573 | 6B65 | 6C5F |
| 0000247720 | E86B | 01AC | 0000 | 0500 | 725F | 6165 | 4664 | 01AE |
| 0000247740 | 0000 | 0B00 | 735F | 6174 | 6B63 | 7661 | 6961 | B46C |
| 0000247760 | 062A | 0000 | 0700 | 5F5F | 6866 | 6165 | 6470 | 01AE |
| 0000250000 | 0000 | 0B00 | 5F5F | 6573 | 7261 | 6B63 | 6573 | 6F67 |
| 0000250020 | 01AF | 0000 | 0300 | 5F5F | 6E69 | 7363 | 6765 | AEE0 |
| 0000250040 | 0001 | 0000 | 5F09 | 675F | 6F72 | 7377 | 6765 | AFA2 |
| 0000250060 | 0001 | 0000 | 5F0A | 665F | 6E69 | 6C64 | 7361 | C274 |
| 0000250100 | 062A | 0000 | 0A00 | 5F5F | 6D61 | 6C62 | 736B | 7A69 |
| 0000250120 | AFC2 | 0001 | 0000 | 5F08 | 6E5F | 7765 | 6573 | F467 |
| 0000250140 | 01AF | 0000 | 0800 | 735F | 7274 | 636E | 706D | B030 |
| 0000250160 | 0001 | 0000 | 4104 | 4F54 | 9046 | 01B0 | 0000 | 0900 |
| 0000250200 | 5F5F | 7066 | 6F74 | 7473 | C472 | 062A | 0000 | 0700 |
| 0000250220 | 5F5F | 7463 | 7079 | C465 | 062A | 0000 | 0800 | 5F5F |
| 0000250240 | 7463 | 7079 | 5F65 | B132 | 0001 | 0000 | 5F0B | 675F |
| 0000250260 | 7465 | 6974 | 7464 | 6261 | 2BC6 | 0006 | 0000 | 5F0B |
| 0000250300 | 745F | 6469 | 6174 | 6D62 | 7861 | B1AC | 0001 | 0000 |
| 0000250320 | 5F07 | 6D67 | 6974 | 656D | B412 | 0001 | 0000 | 5F06 |
| 0000250340 | 7A74 | 6573 | EC74 | 01B4 | 0000 | 0900 | 5F5F | 7369 |
| 0000250360 | 6E69 | 7364 | F274 | 01B3 | 0000 | 0800 | 5F5F | 745F |
| 0000250400 | 737A | 7465 | 2BEA | 0006 | 0000 | 5F09 | 6164 | 6C79 |
| 0000250420 | 6769 | 7468 | 2BE6 | 0006 | 0000 | 5F09 | 6974 | 656D |
| 0000250440 | 6F7A | 656E | 2BEC | 0006 | 0000 | 5F07 | 7A74 | 616E |
| 0000250460 | 656D | 2BF4 | 0006 | 0000 | 5F09 | 5F5F | 6E64 | 6D61 |
| 0000250500 | 7365 | 2CDA | 0006 | 0000 | 5F09 | 5F5F | 6E6D | 6D61 |
| 0000250520 | 7365 | B5BA | 0001 | 0000 | 5F07 | 7473 | 6372 | 7268 |
| 0000250540 | B5E8 | 0001 | 0000 | 5F08 | 7473 | 6972 | 6D63 | E870 |
| 0000250560 | 01B5 | 0000 | 0800 | 735F | 7274 | 6D63 | 6970 | B62E |

THU MAR 14 17:21:24 1991  CLIENT.EXE  PAGE 91, LINE 5311

```
0000250600  0001  0000  5F08  7473  7272  6863  5C72  01B6
0000250620  0000  0800  6D5F  6D65  6F6D  6576  B726  0001
0000250640  0000  5F09  675F  7465  6170  6874  B7D0  0001
0000250660  0000  5F09  775F  7472  6532  7272  B7EA  0001
0000250700  0000  5F0B  735F  6165  6372  6568  766E  B8F6
0000250720  0001  0000  5F09  635F  6E65  6176  6772  2C36
0000250740  0006  0000  5F0B  705F  6F5F  6576  6C72  7961
0000250760  BD30  0001  0000  5F09  645F  736F  6170  6E77
0000251000  BDB2  0001  0000  5F0A  615F  4646  6C61  756D
0000251020  B26C  01BD  0000  0B00  5F5F  4661  6146  6C75
0000251040  756D  D46C  01BD  0000  0A00  5F5F  4661  6146
0000251060  736C  6C68  F0AE  0001  0000  240B  3149  5F30
0000251100  554F  5054  5455  BDF4  0001  0000  5F09  665F
0000251120  746C  756F  3274  BE3E  0001  0000  5F07  615F
0000251140  6F74  646C  BE66  0001  0000  5F0E  465F  7261
0000251160  6547  5474  6469  6154  5262  062C  0000  0B00
0000251200  5F5F  5046  5344  5241  4152  6A59  01BE  0000
0000251220  0900  5F5F  6E69  7469  6573  9E67  01BE  0000
0000251240  0900  5F5F  696C  6B6E  6573  D467  01BE  0000
0000251260  0800  735F  7274  636E  7970  BEFE  0001  0000
0000251300  5F05  7461  6C6F  BF02  0001  0000  5F0A  615F
0000251320  6146  6468  6669  AE66  062C  0000  0600  5F5F
0000251340  6164  7379  2C94  0006  0000  5F08  6C5F  6470
0000251360  7961  C873  062C  0000  0A00  5F5F  6966  656C
0000251400  6E69  6F66  BF38  0001  0000  5F09  675F  7465
0000251420  6364  6477  BF22  0001  0000  5F07  6567  6374
0000251440  6477  C05C  0001  0000  5F0A  615F  4646  6C61
0000251460  6572  7E6D  01C0  0000  0800  5F5F  4661  726C
0000251500  6D65  C11E  0001  0000  5F08  615F  6C46  6873
0000251520  2A6C  01C1  0000  0900  5F5F  4661  6C75  6964
0000251540  8A76  01C1  0000  0900  5F5F  4661  6C75  6572
0000251560  426D  01C2  0000  0A00  6924  5F38  756F  7074
0000251600  7475  F57A  0001  0000  5F12  4C5F  3144  4D32
0000251620  4C55  5454  4E45  4F50  4557  5052  01F6  0000
0000251640  0A00  5F5F  444C  3231  554D  544C  F7D4  0001
0000251660  0000  5F0C  535F  5254  4E49  5447  4C4F  EB44
0000251700  01C3  0000  0800  5F5F  6C66  6974  326E  C3C6
0000251720  0001  0000  5F09  665F  746C  6E69  3266  C464
0000251740  0001  0000  5F07  635F  7461  786F  C4CF  0001
0000251760  0000  5F09  635F  6468  6972  6576  C4BA  0001
0000252000  0000  5F0A  675F  7465  7264  7669  E465  01C4
0000252020  0000  0900  6924  5F38  6E69  7570  7274  01CA
0000252040  0000  0A00  6924  5F38  7074  7277  3031  FA40
0000252060  0001  0000  5F0B  4D5F  4E41  4F54  444C  3231
0000252100  0A01  7500  8380  0081  0064  0183  0102  0001
0000252120  0180  0001  0180  0001  0180  0001  0180  0001
*
0000252560  0180  0001  0180  0001  0180  0007  737A  C083
0000252600  8200  0100  0001  0180  0001  0180  0001  0180
0000252620  0001  0180  0001  0180  0001  0180  0001  0180
*
0000253600  0001  0180  0001  0180  0012  6079  8305  02CF
0000253620  D083  8202  5F06  6F69  7562  6966  1001  7F00
0000253640  C083  8300  0081  C083  8300  0080  8083  0100
0000253660  0027  827F  5F04  7470  0072  0482  635F  746E
0000253700  8204  5F05  6162  6573  8206  5F05  6C66  6761
0000253720  820A  5F05  6966  656C  010B  0005  0078  CE83
0000253740  0102  0001  0180  0001  0180  0001  0180  0001
0000253760  0180  0001  0180  0001  0180  0001  0180  0001
```

THU MAR 14 17:21:24 1991 CLIENT.EXE PAGE 92, LINE 5370

```
*
0000254640  0180  0001  0180  0001  0180  0001  0180  0007
0000254660  8578  0100  8083  0100  0001  0180  0001  0180
0000254700  0001  0180  0001  0180  0001  0180  0001  0180
*
0000256060  0001  0180  0018  8579  0120  8302  03E6  E783
0000256100  8203  280A  6E75  6174  6767  6465  6929  0701
0000256120  7F00  8683  8300  0345  1501  7F00  0682  626F
0000256140  5F6A  6469  8200  6F08  6A62  6E5F  6D61  0465
0000256160  0101  8000  0101  8000  0101  8000  0101  8000
*
0000256360  0101  8000  1801  7900  6085  0502  0A83  8304
0000256400  040B  0A82  7528  746E  6761  6567  2964  0169
0000256420  0010  837F  0086  4583  8303  0082  4583  8303
0000256440  00C0  2E01  7F00  0282  6469  8200  6E04  6D61
0000256460  0465  0A82  6974  656D  735F  6174  706D  8224
0000256500  6F05  6E77  7265  8228  7009  7968  5F73  6170
0000256520  6874  0148  0001  0180  0001  0180  0001  0180
0000256540  0001  0180  0001  0180  0001  0180  0001  0180
0000256560  0001  0180  0007  737A  4583  8203  0100  0001
0000256600  0180  0001  0180  0001  0180  0001  0180  0001
*
0000256640  0180  0007  737A  0983  8204  0100  0001  0180
0000256660  0001  0180  0001  0180  0001  0180  0001  0180
*
0000256720  0001  0180  0001  0180  0007  737A  E583  8203
0000256740  0100  0001  0180  0001  0180  0001  0180  0001
0000256760  0180  0001  0180  0001  0180  0001  0180  0001
*
0000257020  0180  0001  0180  0001  0180  0001  0180  0018
0000257040  8579  0110  8302  043B  3C83  8204  280A  6E75
0000257060  6174  6767  6465  6929  0701  7F00  4583  8303
0000257100  0081  0F01  7F00  0482  616E  656D  8200  7404
0000257120  7079  2065  1801  7900  3085  0D09  4083  8304
0000257140  0441  0A82  7528  746E  6761  6567  2964  0169
0000257160  0007  8578  0320  8083  0100  0007  737A  3A83
0000257200  8204  0100  0028  837F  0345  8183  8300  0345
0000257220  8283  8300  043E  3E83  8304  00C0  C083  8300
0000257240  00C0  C083  8300  0081  8583  8300  043F  A101
0000257260  7F00  0482  616E  656D  8200  7404  7079  2065
0000257300  0682  7561  6874  726F  8222  6404  7461  4265
0000257320  0882  7566  636E  6974  6E6F  8246  7308  6570
0000257340  5F63  6572  8566  00AA  0B82  6564  6373  6972
0000257360  7470  6F69  856E  010E  0782  6F63  6D6D  6E65
0000257400  8574  0112  1082  6C66  7274  735F  6165  6372
0000257420  5F68  6170  6874  1685  8201  740E  5F63  6573
0000257440  7261  6863  705F  7461  8568  011A  0582  7564
0000257460  6D6D  8579  011E  0982  6170  6172  5F6D  6E63
0000257500  8574  0120  0982  6170  6172  5F6D  736C  8574
0000257520  0122  0101  8000  0101  8000  0101  8000  0101
0000257540  8000  0101  8000  0101  8000  0701  7A00  8373
0000257560  043D  0082  0101  8000  0101  8000  0101  8000
0000257600  0101  8000  0101  8000  0101  8000  0101  8000
*
0000261060  0101  8000  1801  7900  8085  0601  FA83  8304
0000261100  04FB  0A82  7528  746E  6761  6567  2964  0169
0000261120  0013  837F  0086  4583  8303  0081  8683  8300
0000261140  0081  C083  0100  0030  827F  6902  0064  0482
0000261160  616E  656D  8204  7404  7079  2465  0782  6574
```

THU MAR 14 17:21:24 1991 CLIENT.EXE PAGE 93, LINE 5429

| | | | | | | | | |
|---|---|---|---|---|---|---|---|---|
| 0000261200 | 7473 | 695F | 2664 | 0482 | 7473 | 7461 | 822A | 7008 |
| 0000261220 | 7461 | 5F68 | 7470 | 2C72 | 0101 | 8000 | 0101 | 8000 |
| 0000261240 | 0101 | 8000 | 0101 | 8000 | 0101 | 8000 | 0701 | 7A00 |
| 0000261260 | 8373 | 04F9 | 0082 | 0101 | 8000 | 0101 | 8000 | 0101 |
| 0000261300 | 8000 | 0101 | 8000 | 0101 | 8000 | 0101 | 8000 | 0101 |
| * | | | | | | | | |
| 0000261340 | 8000 | 0101 | 8000 | 0101 | 8000 | 0701 | 7800 | 8085 |
| 0000261360 | 8300 | 0080 | 0701 | 7800 | 8085 | 8300 | 0080 | 0101 |
| 0000261400 | 8000 | 0501 | 7800 | 8348 | 0080 | 0701 | 7800 | 9885 |
| 0000261420 | 8300 | 0080 | 0701 | 7800 | 9885 | 8300 | 0080 | 0701 |
| 0000261440 | 7800 | D085 | 8300 | 0080 | 0701 | 7800 | D085 | 8300 |
| 0000261460 | 0080 | 0501 | 7800 | 8318 | 0080 | 0501 | 7800 | 8318 |
| 0000261500 | 0080 | 0501 | 7800 | 8310 | 0080 | 0501 | 7800 | 8310 |
| 0000261520 | 0080 | 0501 | 7800 | 8370 | 0080 | 0501 | 7800 | 8370 |
| 0000261540 | 0080 | 0501 | 7800 | 8330 | 0080 | 0501 | 7800 | 8330 |
| 0000261560 | 0080 | 0101 | 8000 | 0701 | 7800 | A885 | 8301 | 0080 |
| 0000261600 | 0701 | 7800 | 8885 | 8300 | 0080 | 0701 | 7800 | 8885 |
| 0000261620 | 8300 | 0080 | 0701 | 7800 | E885 | 8300 | 0080 | 0701 |
| 0000261640 | 7800 | E885 | 8300 | 0080 | 0401 | 7F00 | 8183 | 0100 |
| 0000261660 | 000A | 8075 | 8683 | 6400 | 8301 | 0525 | 0501 | 7800 |
| 0000261700 | 8328 | 0080 | 0101 | 8000 | 0101 | 8000 | 0401 | 7F00 |
| 0000261720 | C183 | 0100 | 000A | 8075 | 0083 | 6402 | 8301 | 052A |
| 0000261740 | 0501 | 7800 | 8350 | 0080 | 0401 | 7F00 | C083 | 0100 |
| 0000261760 | 000A | 8075 | 0083 | 6402 | 8301 | 052D | 0701 | 7800 |
| 0000262000 | 0085 | 8308 | 0080 | 0701 | 7800 | 3085 | 8301 | 0080 |
| 0000262020 | 0501 | 7800 | 8308 | 0080 | 0701 | 7800 | A885 | 8300 |
| 0000262040 | 0080 | 0701 | 7800 | 1885 | 8301 | 0080 | 0701 | 7800 |
| 0000262060 | E085 | 8300 | 0080 | 0701 | 7800 | 5885 | 8301 | 0080 |
| 0000262100 | 0701 | 7800 | A085 | 8300 | 0080 | 0101 | 8000 | 0101 |
| 0000262120 | 8000 | 0D01 | 7F00 | C083 | 8300 | 0086 | 8583 | 8300 |
| 0000262140 | 00C0 | 0A01 | 7500 | 8380 | 0081 | 0464 | 3983 | 0105 |
| 0000262160 | 0004 | 837F | 00C0 | 0A01 | 7500 | 8380 | 0200 | 0164 |
| 0000262200 | 3B83 | 0105 | 0007 | 8578 | 0170 | 8083 | 0100 | 0007 |
| 0000262220 | 8578 | 0178 | 8083 | 0100 | 0007 | 8578 | 0100 | 8083 |
| 0000262240 | 0100 | 0007 | 8578 | 0150 | 8083 | 0100 | 0007 | 8578 |
| 0000262260 | 00B8 | 8083 | 0100 | 0007 | 8578 | 00D8 | 8083 | 0100 |
| 0000262300 | 0007 | 8578 | 0168 | 8083 | 0100 | 0007 | 8578 | 00B0 |
| 0000262320 | 8083 | 0100 | 0007 | 8578 | 0120 | 8083 | 0100 | 0005 |
| 0000262340 | 7878 | 8083 | 0100 | 0007 | 8578 | 00F8 | 8083 | 0100 |
| 0000262360 | 0007 | 8578 | 0090 | 8083 | 0100 | 0007 | 8578 | 0138 |
| 0000262400 | 8083 | 0100 | 0007 | 8578 | 0110 | 8083 | 0100 | 0005 |
| 0000262420 | 6878 | 8083 | 0100 | 0007 | 8578 | 0160 | 8083 | 0100 |
| 0000262440 | 0007 | 8578 | 0128 | 8083 | 0100 | 0007 | 8578 | 01E0 |
| 0000262460 | 8083 | 0100 | 0007 | 8578 | 0140 | 8083 | 0100 | 0007 |
| 0000262500 | 8578 | 0288 | 8083 | 0100 | 0007 | 8578 | 0268 | 8083 |
| 0000262520 | 0100 | 0007 | 8578 | 0190 | 8083 | 0100 | 0007 | 8578 |
| 0000262540 | 0640 | 8083 | 0100 | 0005 | 2078 | 8083 | 0100 | 0007 |
| 0000262560 | 8578 | 0108 | 8083 | 0100 | 0007 | 8578 | 00C0 | 8083 |
| 0000262600 | 0100 | 0001 | 0180 | 0001 | 0180 | 0007 | 837F | 00C0 |
| 0000262620 | C683 | 0100 | 000A | 8075 | 0083 | 6402 | 8302 | 0559 |
| 0000262640 | 0701 | 7800 | 9085 | 8301 | 0080 | 0501 | 7800 | 8360 |
| 0000262660 | 0080 | 0501 | 7800 | 8340 | 0080 | 0701 | 7800 | C885 |
| 0000262700 | 8300 | 0080 | 0701 | 7F00 | C083 | 8300 | 0086 | 0A01 |
| 0000262720 | 7500 | 8380 | 0200 | 0264 | 5F83 | 0105 | 0005 | 2078 |
| 0000262740 | 8083 | 0100 | 0007 | 8578 | 00A8 | 8083 | 0100 | 0005 |
| 0000262760 | 5078 | 8083 | 0100 | 0005 | 3878 | 8083 | 0100 | 0005 |
| 0000263000 | 5878 | 8083 | 0100 | 0007 | 837F | 00C0 | 8683 | 0100 |
| 0000263020 | 000A | 8075 | 0083 | 6402 | 8302 | 0566 | 0701 | 7800 |
| 0000263040 | E885 | 8301 | 0080 | 0701 | 7F00 | C083 | 8300 | 0086 |

```
THU MAR 14 17:21:24 1991  CLIENT.EXE  PAGE 94, LINE 5488

0000263060  0A01  7500  8380  0200  0264  6983  0105  0004
0000263100  837F  00C0  0A01  7500  8380  0200  0164  6B83
0000263120  0105  0007  8578  01D0  8083  0100  0007  837F
0000263140  0081  4C83  0102  000A  8075  0083  6402  8302
0000263160  056E  0A01  7500  8380  0081  0064  0183  0102
0000263200  0001  0180  0001  0180  0001  0180  0001  0180
*
0000264660  0001  0180  0012  6079  8305  02CF  D083  8202
0000264700  5F06  6F69  7562  6966  1001  7F00  C083  8300
0000264720  0081  C083  8300  0080  8083  0100  0027  827F
0000264740  5F04  7470  0072  0482  635F  746E  8204  5F05
0000264760  6162  6573  8206  5F05  6C66  6761  820A  5F05
0000265000  6966  656C  010B  0005  0078  CE83  0102  0001
0000265020  0180  0001  0180  0001  0180  0001  0180  0001
*
0000265720  0180  0001  0180  0001  0180  0007  8578  0100
0000265740  8083  0100  0001  0180  0001  0180  0001  0180
0000265760  0001  0180  0001  0180  0001  0180  0001  0180
*
0000266660  0001  0180  0001  0180  0015  6079  8309  03BC
0000266700  BD83  8203  5F09  4144  4554  4954  454D  0169
0000266720  001C  837F  0084  8483  8300  0084  8483  8300
0000266740  0084  8483  8300  0085  8183  8300  0084  5401
0000266760  7F00  0582  6F68  7275  0073  0782  696D  756E
0000267000  6574  0173  0782  6573  6F63  646E  0273  0A82
0000267020  7568  646E  6572  7464  7368  8203  6403  7961
0000267040  8204  6D05  6E6F  6874  8205  7904  6165  0672
0000267060  0882  6974  656D  6F7A  656E  8208  7707  6565
0000267100  646B  7961  010A  0001  0180  0001  0180  0001
0000267120  0180  0001  0180  0001  0180  0001  0180  0016
0000267140  2079  8302  03C5  C683  8203  280A  6E75  6174
0000267160  6767  6465  6929  0701  7F00  8183  8300  0081
0000267200  0901  7F00  0182  0078  0182  0279  1601  7900
0000267220  0240  C883  8303  03C9  0A82  7528  746E  6761
0000267240  6567  2964  0169  0007  837F  03C4  C483  0103
0000267260  000D  827F  6D03  6E69  8200  6D03  7861  0104
0000267300  0001  0180  0001  0180  0001  0180  0001  0180
*
0000267400  0001  0180  0001  0180  0018  8579  0120  8302
0000267420  03DD  DE83  8203  280A  6E75  6174  6767  6465
0000267440  6929  0701  7F00  8683  8300  0345  1501  7F00
0000267460  0682  626F  5F6A  6469  8200  6F08  6A62  6E5F
0000267500  6D61  0465  0101  8000  0101  8000  0101  8000
0000267520  0101  8000  0101  8000  0101  8000  0101  8000
*
0000267760  0101  8000  0701  7A00  8373  0345  0082  0101
0000270000  8000  0101  8000  0101  8000  0101  8000  0101
*
0000270120  8000  0701  7A00  8373  03DC  0082  0101  8000
0000270140  0101  8000  0101  8000  0101  8000  0101  8000
*
0000270360  0101  8000  1601  7900  0330  4983  8304  044A
0000270400  0A82  7528  746E  6761  6567  2964  0169  000A
0000270420  837F  0085  8583  8300  0085  1A01  7F00  0582
0000270440  6977  7464  0068  0682  6568  6769  7468  8202
0000270460  6405  7065  6874  0104  0018  8579  0140  8308
0000270500  044D  4E83  8204  280A  6E75  6174  6767  6465
0000270520  6929  0701  7800  8085  8300  0084  1901  7F00
0000270540  8183  8300  0448  8583  8300  0085  C483  8300
```

```
THU MAR 14 17:21:24 1991  CLIENT.EXE  PAGE 95, LINE 5547

0000270560  0082  E483  8300  044C  5A01  7F00  0682  6572
0000270600  7270  7365  8200  6406  6D69  6E65  0273  1082
0000270620  6164  6174  6C5F  7961  7265  645F  7065  6874
0000270640  8208  7308  6769  735F  7A69  0A65  0782  6973
0000270660  5F67  7470  0C72  0982  7462  706D  735F  7A69
0000270700  1065  0882  7462  706D  705F  7274  8214  7305
0000270720  6170  6572  0118  0001  0180  0018  8579  05A0
0000270740  830C  0452  5383  8204  280A  6E75  6174  6767
0000270760  6465  6929  0701  7800  8085  8301  0084  2501
0000271000  7F00  8683  8300  0345  4583  8303  0086  8183
0000271020  8300  0085  8683  8300  0082  8683  8300  03C4
0000271040  4B83  8304  0451  7E01  7F00  0282  6469  8200
0000271060  6E04  6D61  0465  0982  6966  656C  6E5F  6D61
0000271100  2465  0982  7865  5F70  6374  695F  4464  0482
0000271120  7974  6570  8248  720C  6665  6C5F  6E69  5F65
0000271140  756E  4A6D  0982  6572  5F66  6374  695F  4C64
0000271160  0A82  6974  656D  735F  6174  706D  8250  6106
0000271200  696F  695F  5464  0882  6F6C  6163  6974  6E6F
0000271220  8258  6209  6D74  5F70  6E69  6F66  825C  7305
0000271240  6170  6572  8485  0100  0001  0180  0001  0180
0000271260  0001  0180  0001  0180  0001  0180  0001  0180
0000271300  0001  0180  0001  0180  0001  0180  0007  737A
0000271320  5E83  8204  0100  0007  737A  5083  8204  0100
0000271340  0001  0180  0001  0180  0001  0180  0001  0180
*
0000271600  0001  0180  0001  0180  0001  0180  0018  8579
0000271620  0560  830F  048C  8D83  8204  280A  6E75  6174
0000271640  6767  6465  6929  0701  7800  0085  8302  0084
0000271660  2E01  7F00  8683  8300  0345  8283  8300  0081
0000271700  8183  8300  03C4  8583  8300  0085  4B83  8304
0000271720  00C4  C483  8300  0081  8583  8300  00C4  8B83
0000271740  0104  00A8  827F  6902  0064  0482  616E  656D
0000271760  8204  740A  6D69  5F65  7473  6D61  2470  0582
0000272000  6C63  7361  2873  0582  7473  6C79  2A65  0982
0000272020  6F68  5F74  6F70  6E69  2C74  0B82  7068  785F
0000272040  645F  6665  6E69  3065  0B82  7068  795F  645F
0000272060  6665  6E69  3265  0982  7462  706D  695F  666E
0000272100  346F  0782  6D69  5F67  7470  5C72  0882  616D
0000272120  6B73  705F  7274  8260  7107  6175  696C  7974
0000272140  8264  640F  7365  7263  7069  6F74  5F72  6973
0000272160  657A  8266  640E  7365  7263  7069  6F74  5F72
0000272200  7470  6872  0582  7073  7261  6C65  0101  8000
0000272220  0101  8000  0701  7A00  8373  048A  0082  0101
0000272240  8000  0101  8000  0101  8000  0101  8000  0101
*
0000272320  8000  0101  8000  1801  7900  C085  0702  A183
0000272340  8304  04A2  0A82  7528  746E  6761  6567  2964
0000272360  0169  0007  8578  0120  8483  0100  0016  837F
0000272400  0086  4583  8303  03C7  8183  8300  0081  8283
0000272420  8300  04A0  3801  7F00  0282  6469  8200  6E04
0000272440  6D61  0465  0482  6572  7463  8224  6104  7474
0000272460  2C72  0582  7564  6D6D  2E79  0A82  6974  656D
0000272500  735F  6174  706D  8230  7305  6170  6572  0134
0000272520  0001  0180  0018  8579  0360  8306  04A6  A783
0000272540  8204  280A  6E75  6174  6767  6465  6929  0701
0000272560  7800  0085  8301  0345  1301  7F00  8683  8300
0000272600  0345  8583  8300  0085  A083  8304  04A5  4001
0000272620  7F00  0282  6469  8200  6E04  6D61  0465  0C82
0000272640  6C66  7274  6D5F  7861  635F  746E  8224  6608
```

THU MAR 14 17:21:24 1991 CLIENT.EXE PAGE 96, LINE 5606

```
0000272660  746C  5F72  6E63  2674  0582  7073  7261  2865
0000272700  0E82  6C66  7274  6E5F  6D61  5F65  696C  7473
0000272720  014C  0001  0180  0007  737A  9F83  8204  010U
0000272740  0001  0180  0001  0180  0001  0180  0001  0180
*
0000273000  0001  0180  0001  0180  0001  0180  0007  737A
0000273020  A483  8204  0100  0001  0180  0001  0180  0001
0000273040  0180  0001  0180  0001  0180  0001  0180  0001
*
0000273120  0180  0001  0180  0018  8579  0140  8303  04C8
0000273140  C983  8204  280A  6E75  6174  6767  6465  6929
0000273160  0701  7800  1085  8301  0084  0A01  7F00  8683
0000273200  8300  0085  C783  0104  0015  827F  6902  0064
0000273220  0482  6973  657A  8204  7305  6170  6572  0106
0000273240  0001  0180  0007  737A  C683  8204  0100  0001
0000273260  0180  0001  C180  0001  0180  0001  0180  0001
*
0000273620  0180  0018  8579  00B0  8306  0506  0783  8205
0000273640  280A  6E75  6174  6767  6465  6929  1301  7F00
0000273660  5E83  8304  00E4  8283  8300  00C4  8583  8300
0000273700  0088  4401  7F00  0782  6468  5F72  7470  0072
0000273720  0982  616C  6579  5F72  7562  0466  0A82  616C
0000273740  6579  5F72  6973  657A  8208  7307  6769  625F
0000273760  6675  820C  7308  6769  735F  7A69  1065  0882
0000274000  6974  656D  615F  6363  0112  0001  0180  0005
0000274020  5078  8083  0100  0005  5078  8083  0100  0005
0000274040  4878  8083  0100  0005  4878  8083  0100  0005
0000274060  4078  8083  0100  0005  4078  8083  0100  00U7
0000274100  8578  00F8  8083  0100  0007  8578  00F8  8083
0000274120  0100  0005  3878  8083  0100  0005  3878  8083
0000274140  0100  0007  8578  0090  8083  0100  0007  8578
0000274160  0090  8083  0100  0005  2078  8083  0100  0005
0000274200  2078  8083  0100  0007  8578  01C0  8083  0100
0000274220  0007  8578  01C0  8083  0100  0007  8578  00A8
0000274240  8083  0100  0007  8578  00A8  8083  0100  0007
0000274260  8578  00C8  8083  0100  0007  8578  00C8  8083
0000274300  0100  0007  8578  0118  8083  0100  0007  8578
0000274320  0118  8083  0100  0001  0180  0001  0180  0001
0000274340  0180  0001  0180  0001  0180  0001  0180  0001
0000274360  0180  0001  0180  0001  0180  0001  0180  0007
0000274400  837F  045E  C083  0100  000A  8075  0083  6402
0000274420  8302  0529  0701  7F00  5E83  8304  00C0  0A01
0000274440  7500  8380  0200  0264  2B83  0105  0001  0180
0000274460  0001  0180  0007  837F  045E  8283  0100  000A
0000274500  8075  0083  6402  8302  052F  0701  7800  A085
0000274520  8301  0080  0701  7800  2085  8301  0080  0101
0000274540  8000  0101  8000  0701  7F00  5E83  8304  0084
0000274560  0A01  7500  8380  0200  0264  3583  0105  0007
0000274600  8578  0100  8083  0100  0007  8578  0160  8083
0000274620  0100  0007  8578  0088  8083  0100  0001  0180
0000274640  0001  0180  000A  837F  045E  8283  8300  0084
0000274660  0A01  7500  8380  020D  0364  3C83  0105  0007
0000274700  8578  0180  8083  0100  0007  8578  01A8  8083
0000274720  0100  0007  8578  01D8  8083  0100  0001  0180
0000274740  0001  0180  0004  837F  045E  0A01  7500  8380
0000274760  0200  0164  4383  0105  0007  8578  0220  8083
0000275000  0100  0005  1078  8083  0100  0007  8578  0108
0000275020  8083  0100  0005  2878  8083  0100  0007  837F
0000275040  00C4  8583  0100  000A  8075  0083  6402  8302
```

THU MAR 14 17:21:24 1991 CLIENT.EXE PAGE 97, LINE 5665

| | | | | | | | | |
|---|---|---|---|---|---|---|---|---|
| 0000275060 | 0549 | 0501 | 7800 | 8360 | 0080 | 0501 | 7800 | 8368 |
| 0000275100 | 0080 | 0701 | 7F00 | E483 | 8300 | 0082 | 0A01 | 7500 |
| 0000275120 | 8380 | 0200 | 0264 | 4D83 | 0105 | 0004 | 837F | 045E |
| 0000275140 | 0A01 | 7500 | 8380 | 0200 | 0164 | 4F83 | 0105 | 0007 |
| 0000275160 | 8578 | 01E8 | 8083 | 0100 | 0007 | 8578 | 01B0 | 8083 |
| 0000275200 | 0100 | 0007 | 837F | 00C0 | 8683 | 0100 | 000A | 8075 |
| 0000275220 | 0083 | 6402 | 8302 | 0553 | 0701 | 7800 | 4085 | 8301 |
| 0000275240 | 0080 | 0501 | 7800 | 8358 | 0080 | 0701 | 7800 | B085 |
| 0000275260 | 8300 | 0080 | 0701 | 7800 | 3085 | 8301 | 0080 | 0701 |
| 0000275300 | 7800 | 0085 | 8302 | 0080 | 0701 | 7800 | 5085 | 8301 |
| 0000275320 | 0080 | 1301 | 7F00 | 8683 | 8300 | 045E | 8583 | 8300 |
| 0000275340 | 0085 | 8183 | 8300 | 00C6 | 0A01 | 7500 | 8380 | 0081 |
| 0000275360 | 0664 | 5B83 | 0105 | 0005 | 7078 | 8083 | 0100 | 0010 |
| 0000275400 | 837F | 0086 | C083 | 8300 | 0081 | 8683 | 8300 | 045D |
| 0000275420 | 0A01 | 7500 | 8380 | 0081 | 0564 | 5E83 | 0105 | 0007 |
| 0000275440 | 837F | 00C0 | 8683 | 0100 | 000A | 8075 | 0083 | 6402 |
| 0000275460 | 8302 | 0560 | 0501 | 7800 | 8318 | 0080 | 0701 | 7800 |
| 0000275500 | 8085 | 8300 | 0080 | 0701 | 7800 | 9885 | 8300 | 0080 |
| 0000275520 | 0501 | 7800 | 8378 | 0080 | 0701 | 7800 | 6885 | 8301 |
| 0000275540 | 0080 | 0701 | 7800 | A085 | 8300 | 0080 | 0501 | 7800 |
| 0000275560 | 8330 | 0080 | 0701 | 7800 | B885 | 8300 | 0080 | 0701 |
| 0000275600 | 7800 | 1085 | 8301 | 0080 | 0701 | 7800 | E085 | 8301 |
| 0000275620 | 0080 | 0501 | 7800 | 8308 | 0080 | 0701 | 7800 | E085 |
| 0000275640 | 8300 | 0080 | 0701 | 7F00 | C083 | 8300 | 0086 | 0A01 |
| 0000275660 | 7500 | 8380 | 0200 | 0264 | 6E83 | 0105 | 0007 | 8578 |
| 0000275700 | 06E0 | 0583 | 0105 | 0007 | 8578 | 00C0 | 8083 | 0100 |
| 0000275720 | 0007 | 8578 | 0198 | 8083 | 0100 | 0007 | 8578 | 00E8 |
| 0000275740 | 8083 | 0100 | 0007 | 8578 | 00F0 | 8083 | 0100 | 0007 |
| 0000275760 | 8578 | 0190 | 8083 | 0100 | 0007 | 837F | 00C0 | 8683 |
| 0000276000 | 0100 | 000A | 8075 | 0083 | 6402 | 8302 | 0576 | 0701 |
| 0000276020 | 7800 | 7885 | 8301 | 0080 | 0101 | 8000 | 0101 | 8000 |
| 0000276040 | 0A01 | 7F00 | CB83 | 8304 | 0086 | 8583 | 0100 | 000A |
| 0000276060 | 8075 | 0083 | 6402 | 8303 | 057B | 0101 | 8000 | 0101 |
| 0000276100 | 8000 | 0401 | 7F00 | CB83 | 0104 | 000A | 8075 | 0083 |
| 0000276120 | 6402 | 8301 | 057F | 0701 | 7F00 | C083 | 8300 | 0086 |
| 0000276140 | 0A01 | 7500 | 8380 | 0200 | 0264 | 8183 | 0105 | 0007 |
| 0000276160 | 8578 | 0148 | 8083 | 0100 | 0007 | 837F | 00C0 | 8683 |
| 0000276200 | 0100 | 000A | 8075 | 0083 | 6402 | 8302 | 0584 | 0701 |
| 0000276220 | 7800 | D085 | 8300 | 0080 | 0101 | 8000 | 0101 | 8000 |
| 0000276240 | 0A01 | 7F00 | C083 | 8300 | 0490 | 0083 | 0100 | 000A |
| 0000276260 | 8075 | 0083 | 6402 | 8303 | 0589 | 0101 | 8000 | 0101 |
| 0000276300 | 8000 | 0701 | 7F00 | 9083 | 8304 | 0085 | 0A01 | 7500 |
| 0000276320 | 8380 | 0200 | 0264 | 8D83 | 0105 | 0007 | 8578 | 01F8 |
| 0000276340 | 8083 | 0100 | 0007 | 837F | 00C0 | 8683 | 0100 | 000A |
| 0000276360 | 8075 | 0083 | 6402 | 8302 | 0590 | 1105 | 0001 | 0000 |
| 0000276400 | 0119 | 0000 | 0526 | 0091 | 0010 | 0086 | 0000 | 0A04 |
| 0000276420 | 6567 | 5F74 | 6568 | 5F78 | 6469 | 040D | 0006 | 0081 |
| 0000276440 | 6907 | 5F64 | 7974 | 6570 | 040C | FFF2 | 0086 | 7406 |
| 0000276460 | 6568 | 695F | 0E64 | F604 | 86FF | 0800 | 6874 | 5F65 |
| 0000276500 | 616D | 6B73 | 0414 | FFFA | 0086 | 740E | 6568 | 745F |
| 0000276520 | 7079 | 5F65 | 6966 | 6C65 | 0164 | 1B02 | 9101 | 2B00 |
| 0000276540 | 0A05 | 1001 | FF00 | 0000 | 0400 | 670C | 7465 | 615F |
| 0000276560 | 6363 | 6D5F | 646F | 1265 | 0604 | C100 | 0C00 | 6361 |
| 0000276600 | 5F63 | 6F6D | 6564 | 615F | 7264 | 040D | FFF4 | 052C |
| 0000276620 | 6107 | 6363 | 735F | 7274 | 0201 | 011B | 019B | 052E |
| 0000276640 | 03CF | 0010 | 03C4 | 0000 | 0C04 | 7274 | 6565 | 685F |
| 0000276660 | 6E61 | 6C64 | 7265 | 0408 | 0006 | 00C0 | 6F02 | 0E70 |
| 0000276700 | CA04 | 2FFE | 0805 | 6170 | 6874 | 616E | 656D | 0410 |
| 0000276720 | FFCE | 0345 | 640A | 6972 | 6576 | 6E5F | 6D61 | 0E65 |

THU MAR 14 17:21:24 1991  CLIENT.EXE  PAGE 98, LINE 5724

| | | | | | | | | |
|---|---|---|---|---|---|---|---|---|
| 0000276740 | FA04 | C0FF | 0800 | 6170 | 6874 | 705F | 7274 | 040C |
| 0000276760 | FFF0 | 0086 | 6F06 | 6A62 | 695F | 0E64 | CA04 | 81FF |
| 0000277000 | 0800 | 6573 | 5F74 | 7974 | 6570 | 0410 | FFF6 | 0414 |
| 0000277020 | 640A | 6972 | 6576 | 6C5F | 7369 | 1174 | CC04 | 85FF |
| 0000277040 | 0B00 | 696C | 7473 | 6C5F | 6E65 | 7467 | 0768 | EE04 |
| 0000277060 | 85FF | 0100 | 0869 | F404 | 81FF | 0200 | 7473 | 0201 |
| 0000277100 | 011C | 056A | 053A | 0163 | 0010 | 0158 | 0000 | 0D04 |
| 0000277120 | 7270 | 6E69 | 5F74 | 7766 | 745F | 6572 | 0E65 | 0604 |
| 0000277140 | C000 | 0800 | 626F | 5F6A | 616E | 656D | 040C | 000A |
| 0000277160 | 0086 | 6F06 | 6A62 | 695F | 0B64 | 0E04 | 8500 | 0500 |
| 0000277200 | 656C | 6576 | 0E6C | 1004 | C000 | 0800 | 6B73 | 6C65 |
| 0000277220 | 7465 | 6E6F | 0407 | FFF8 | 0085 | 6901 | 0409 | FFFC |
| 0000277240 | 0085 | 6303 | 746E | 040D | FFF4 | 042A | 6F07 | 6A62 |
| 0000277260 | 6C5F | 7473 | 0408 | FFFA | 0081 | 7302 | 0174 | 1D02 |
| 0000277300 | CD01 | 3C06 | EF05 | 1010 | E400 | 0010 | 0400 | 660E |
| 0000277320 | 5F77 | 626F | 5F6A | 6168 | 646E | 656C | 0872 | 0604 |
| 0000277340 | C000 | 0200 | 706F | 0407 | FFD2 | 0085 | 6901 | 0409 |
| 0000277360 | FFEE | 0085 | 6303 | 746E | 040E | FFF0 | 0086 | 6F08 |
| 0000277400 | 6A62 | 735F | 7A69 | 0D65 | A604 | 2AFE | 0704 | 626F |
| 0000277420 | 5F6A | 736C | 0F74 | E604 | 85FF | 0900 | 766F | 7265 |
| 0000277440 | 7277 | 7469 | 0865 | E804 | 81FF | 0200 | 7473 | 0414 |
| 0000277460 | FECE | 0501 | 650E | 7272 | 726F | 6C5F | 7369 | 5F74 |
| 0000277500 | 7470 | 0E72 | FC04 | 85FF | 0800 | 6966 | 5F78 | 6C66 |
| 0000277520 | 6761 | 040B | FFDC | 0081 | 6C05 | 7665 | 6C65 | 040E |
| 0000277540 | FDA2 | 052F | 7008 | 7461 | 6E68 | 6D61 | 0D65 | A204 |
| 0000277560 | 2FFC | 0705 | 6F6C | 7067 | 7461 | 1168 | D204 | 2FFE |
| 0000277600 | 0B05 | 7364 | 5F74 | 6F6C | 7067 | 7461 | 0E68 | F404 |
| 0000277620 | C0FF | 0800 | 6170 | 6874 | 705F | 7274 | 040F | FEA2 |
| 0000277640 | 00C0 | 6C09 | 6170 | 6874 | 705F | 7274 | 0413 | FFD4 |
| 0000277660 | 00C0 | 640D | 7473 | 6C5F | 6170 | 6874 | 705F | 7274 |
| 0000277700 | 040E | FEAC | 0345 | 6F08 | 6A62 | 6E5F | 6D61 | 0F65 |
| 0000277720 | EA04 | 86FF | 0900 | 6170 | 6572 | 746E | 695F | 0C64 |
| 0000277740 | DE04 | 86FF | 0600 | 626F | 5F6A | 6469 | 040C | FFE2 |
| 0000277760 | 0086 | 6406 | 7473 | 695F | 0D64 | D804 | 86FF | 0700 |
| 0000300000 | 6166 | 6C69 | 695F | 0E64 | AA04 | 81FE | 0800 | 626F |
| 0000300020 | 5F6A | 7974 | 6570 | 040B | FECC | 0081 | 7305 | 6F63 |
| 0000300040 | 6570 | 040D | FFF8 | 041E | 6F07 | 6A62 | 705F | 7274 |
| 0000300060 | 0005 | 14B9 | 0217 | 0411 | FBA4 | 00C0 | 740B | 706D |
| 0000300100 | 6C5F | 676F | 6170 | 6874 | 040E | FBA8 | 0552 | 7308 |
| 0000300120 | 6174 | 5F74 | 736D | 1267 | DA04 | 53FB | 0C05 | 6D74 |
| 0000300140 | 3170 | 6C5F | 676F | 6170 | 6874 | 0201 | 0201 | 011B |
| 0000300160 | 17BC | 055A | 08C9 | 0010 | 08BE | 0000 | 0C04 | 6574 |
| 0000300200 | 7473 | 685F | 0E61 | 6C64 | 7265 | 0408 | 0006 | 00C0 |
| 0000300220 | 6F02 | 1070 | 0A04 | C600 | 0A00 | 7374 | 5F74 | 6469 |
| 0000300240 | 615F | 7264 | 040E | FEE0 | 052F | 7008 | 7461 | 6E68 |
| 0000300260 | 6D61 | 0D65 | EA04 | 81FF | 0700 | 626F | 5F6A | 7974 |
| 0000300300 | 0D70 | F804 | 48FF | 0704 | 6468 | 5F72 | 7470 | 1172 |
| 0000300320 | F404 | C0FF | 0B0D | 6373 | 6972 | 7470 | 665F | 6C69 |
| 0000300340 | 0E65 | E404 | 81FF | 0800 | 6361 | 5F63 | 6F6D | 6564 |
| 0000300360 | 040C | FFEC | 0086 | 7406 | 7473 | 695F | 0C64 | E004 |
| 0000300400 | 86FF | 0600 | 6663 | 5F67 | 6469 | 0410 | FFE8 | 0085 |
| 0000300420 | 660A | 726F | 6563 | 665F | 616C | 0A67 | FC04 | 85FF |
| 0000300440 | 0400 | 6F6C | 6461 | 0407 | FFE6 | 0085 | 6901 | 0409 |
| 0000300460 | FFF2 | 0085 | 6303 | 746E | 040E | FED8 | 024C | 7008 |
| 0000300500 | 7461 | 5F68 | 736C | 0D74 | DC04 | C0FE | 0700 | 6F6C |
| 0000300520 | 7067 | 7461 | 0868 | F004 | 81FF | 0200 | 7473 | 0201 |
| 0000300540 | 011D | 2085 | 0560 | 07BD | 0010 | 07B2 | 0000 | 0E04 |
| 0000300560 | 6F63 | 666E | 6769 | 685F | 6E61 | 6C64 | 7265 | 0408 |
| 0000300600 | 0006 | 00C0 | 6F02 | 0C70 | 0A04 | 8600 | 0600 | 7374 |

THU MAR 14 17:21:24 1991 CLIENT.EXE PAGE 99, LINE 5783

| | | | | | | | | |
|---|---|---|---|---|---|---|---|---|
| 0000300620 | 5F74 | 6469 | 040E | FEB4 | 052F | 7008 | 7461 | 6E68 |
| 0000300640 | 6D61 | 0D65 | 8E04 | 2FFD | 0705 | 6F6C | 7067 | 7461 |
| 0000300660 | 0F68 | 8E04 | 45FE | 0903 | 7469 | 6D65 | 6E5F | 6D61 |
| 0000300700 | 0C65 | CA04 | 86FF | 0600 | 626F | 5F6A | 6469 | 0412 |
| 0000300720 | FFD8 | 00C0 | 720C | 7465 | 7275 | 656E | 5F64 | 7473 |
| 0000300740 | 0E72 | B604 | C2FF | 0800 | 6F6C | 676E | 625F | 6675 |
| 0000300760 | 040A | FFC2 | 0082 | 6C04 | 5F6E | 0F6F | DC04 | C6FF |
| 0000301000 | 0900 | 6C75 | 6E6F | 5F67 | 7562 | 0A66 | AE04 | 86FE |
| 0000301020 | 0400 | 6C75 | 6F5F | 040F | FFD4 | 00C8 | 6609 | 6F6C |
| 0000301040 | 7461 | 625F | 6675 | 040A | FFE0 | 0088 | 6604 | 5F6C |
| 0000301060 | 0E6F | C604 | C5FF | 0800 | 6F62 | 6C6F | 625F | 6675 |
| 0000301100 | 040A | FFBA | 0085 | 6204 | 5F6C | 0B6F | B204 | 85FE |
| 0000301120 | 0500 | 6F66 | 6372 | 0D65 | D004 | 85FF | 0700 | 696C |
| 0000301140 | 656E | 6E5F | 106F | D204 | 85FF | 0A00 | 5F6E | 666F |
| 0000301160 | 695F | 6574 | 736D | 0407 | FFC0 | 0085 | 6901 | 040E |
| 0000301200 | FFBC | 0561 | 6F08 | 6A62 | 745F | 7079 | 1765 | E404 |
| 0000301220 | 62FF | 1105 | 7374 | 5F74 | 6469 | 705F | 6F72 | 706D |
| 0000301240 | 5F74 | 7473 | 0A72 | B404 | 85FF | 0400 | 7261 | 6367 |
| 0000301260 | 040A | FFFA | 024C | 6104 | 6772 | 0876 | CE04 | 81FF |
| 0000301300 | 0200 | 7473 | 0201 | 011E | 2842 | 0567 | 00D1 | 0010 |
| 0000301320 | 00C6 | 0000 | 0F04 | 6572 | 6F63 | 6576 | 5F72 | 6168 |
| 0000301340 | 646E | 656C | 0872 | 0604 | C000 | 0200 | 706F | 040C |
| 0000301360 | 000A | 0086 | 7406 | 7473 | 695F | 0D64 | F604 | 81FF |
| 0000301400 | 0700 | 6473 | 5F62 | 7974 | 0C70 | FA04 | 81FF | 0600 |
| 0000301420 | 656D | 6874 | 646F | 0411 | FFFC | 0081 | 6D0B | 7465 |
| 0000301440 | 6F68 | 5F64 | 7375 | 6465 | 040D | FFF2 | 0085 | 6F07 |
| 0000301460 | 6A62 | 6365 | 7374 | 040A | FFF8 | 0085 | 6C04 | 736F |
| 0000301500 | 0874 | F404 | 81FF | 0200 | 7473 | 0201 | 011B | 2913 |
| 0000301520 | 056A | 0250 | 0010 | 0245 | 0000 | 0C04 | 7475 | 6C69 |
| 0000301540 | 685F | 6E61 | 6C64 | 7265 | 0408 | 0006 | 00C0 | 6F02 |
| 0000301560 | 0C70 | 0A04 | 8600 | 0600 | 7374 | 5F74 | 6469 | 0409 |
| 0000301600 | FEFE | 052F | 7303 | 7274 | 040D | FEFA | 00C0 | 7307 |
| 0000301620 | 7274 | 705F | 7274 | 0005 | 2A84 | 0093 | 0408 | FDF6 |
| 0000301640 | 0085 | 7302 | 1374 | F804 | 85FE | 0D00 | 6F6D | 7564 |
| 0000301660 | 656C | 685F | 6E61 | 6C64 | 1165 | F804 | 2FFD | 0B05 |
| 0000301700 | 6F6D | 7564 | 656C | 6E5F | 6D61 | 0165 | 0102 | 1902 |
| 0000301720 | 6301 | 6C2B | C105 | 1001 | B600 | 0001 | 0400 | 700A |
| 0000301740 | 6972 | 746E | 685F | 6C65 | 0870 | 0604 | C000 | 0200 |
| 0000301760 | 706F | 0408 | FEF8 | 0081 | 7302 | 1274 | FE04 | 2FFE |
| 0000302000 | 0C05 | 6F63 | 6D6D | 6E61 | 5F64 | 696C | 656E | 040C |
| 0000302020 | FEFA | 0086 | 6F06 | 6A62 | 695F | 1064 | DE05 | 060F |
| 0000302040 | C000 | 0800 | 6663 | 5F67 | 7469 | 6D65 | 0201 | 0113 |
| 0000302060 | 2D24 | 056F | 02B8 | 0010 | 02AD | 0000 | 0404 | 616D |
| 0000302100 | 6E69 | 040A | 0006 | 0081 | 6104 | 6772 | 0A63 | 0804 |
| 0000302120 | 4C00 | 0402 | 7261 | 7667 | 040C | FFF6 | 0086 | 7406 |
| 0000302140 | 7473 | 695F | 0864 | D604 | 45FF | 0203 | 706F | 040A |
| 0000302160 | FFFC | 0085 | 6304 | 6E6F | 0874 | FA04 | 81FF | 0200 |
| 0000302200 | 7473 | 0201 | 051D | 004A | 0006 | 0510 | 6415 | 6972 |
| 0000302220 | 6576 | 6E5F | 6D61 | 5F65 | 7270 | 6D6F | 7470 | 735F |
| 0000302240 | 7274 | 0517 | 005A | 0006 | 0512 | 740F | 7079 | 5F65 |
| 0000302260 | 7270 | 6D6F | 7470 | 735F | 7274 | 0517 | 0064 | 0006 |
| 0000302300 | 0514 | 6C0F | 6170 | 6874 | 695F | 5F64 | 7270 | 6D6F |
| 0000302320 | 7470 | 051B | 0078 | 0006 | 0516 | 6C13 | 6170 | 6874 |
| 0000302340 | 695F | 5F64 | 6373 | 5F70 | 7270 | 6D6F | 7470 | 0513 |
| 0000302360 | 0092 | 0006 | 0518 | 730B | 6163 | 666E | 735F | 615F |
| 0000302400 | 6772 | 0513 | 0096 | 0006 | 0518 | 730B | 6163 | 666E |
| 0000302420 | 755F | 615F | 6772 | 0513 | 009A | 0006 | 0518 | 730B |
| 0000302440 | 6163 | 666E | 635F | 615F | 6772 | 0D05 | 0000 | 001A |
| 0000302460 | 0513 | 009E | 0006 | 051A | 6E0B | 7765 | 696C | 656E |

THU MAR 14 17:21:24 1991 CLIENT.EXE PAGE 100, LINE 5842

| | | | | | | | | |
|---|---|---|---|---|---|---|---|---|
| 0000302500 | 735F | 7274 | 0513 | 00A0 | 0006 | 051C | 650B | 7272 |
| 0000302520 | 6F63 | 6564 | 735F | 7274 | 0517 | 00AE | 0006 | 051E |
| 0000302540 | 730F | 6163 | 666E | 645F | 6C62 | 735F | 615F | 6772 |
| 0000302560 | 0517 | 00B4 | 0006 | 0512 | 730F | 6163 | 666E | 735F |
| 0000302600 | 755F | 735F | 615F | 6772 | 0513 | 00BE | 0006 | 0520 |
| 0000302620 | 660B | 6F72 | 5F6D | 6F74 | 735F | 7274 | 0513 | 00F4 |
| 0000302640 | 0006 | 0522 | 670B | 7465 | 6E5F | 6D75 | 735F | 7274 |
| 0000302660 | 0516 | 0106 | 0006 | 0524 | 770E | 6972 | 6574 | 6D5F |
| 0000302700 | 646F | 5F65 | 7473 | 0C72 | 9005 | 0623 | D100 | 0402 |
| 0000302720 | 695F | 626F | 050D | 0048 | 0006 | 0085 | 6205 | 7461 |
| 0000302740 | 6863 | 1105 | 0001 | 0000 | 011B | 2FDC | 052A | 0079 |
| 0000302760 | 0010 | 006E | 0000 | 0C04 | 6966 | 6C6C | 695F | 676D |
| 0000303000 | 685F | 7264 | 040D | 0006 | 045E | 6907 | 676D | 705F |
| 0000303020 | 7274 | 040A | 000A | 00C0 | 6E04 | 6D61 | 0165 | 1C02 |
| 0000303040 | 5501 | 2C30 | A205 | 1001 | 9700 | 0001 | 0400 | 660D |
| 0000303060 | 6C69 | 5F6C | 6D69 | 5F67 | 6164 | 6174 | 040D | 0006 |
| 0000303100 | 045E | 6907 | 676D | 705F | 7274 | 040A | 000A | 00C0 |
| 0000303120 | 6E04 | 6D61 | 0C65 | F604 | C4FF | 0600 | 6973 | 5F67 |
| 0000303140 | 7064 | 040C | FFEC | 0085 | 7306 | 6769 | 735F | 087A |
| 0000303160 | FA04 | E4FF | 0200 | 7064 | 0408 | FFEE | 0082 | 7302 |
| 0000303200 | 077A | F204 | 82FF | 0100 | 0169 | 2002 | F701 | 3031 |
| 0000303220 | C505 | 1000 | BA00 | 0000 | 0400 | 7011 | 6972 | 746E |
| 0000303240 | 695F | 616D | 6567 | 765F | 6C61 | 6575 | 040D | 0006 |
| 0000303260 | 045E | 6907 | 676D | 705F | 7274 | 040C | 000A | 0082 |
| 0000303300 | 6F06 | 6666 | 6573 | 0874 | FA04 | E4FF | 0200 | 7064 |
| 0000303320 | 0201 | 0127 | 32BC | 0536 | 00BD | 0010 | 00B2 | 0000 |
| 0000303340 | 1804 | 7270 | 6E69 | 5F74 | 6966 | 7372 | 5F74 | 6D69 |
| 0000303360 | 6761 | 5F65 | 666F | 7366 | 7465 | 040D | 0006 | 045E |
| 0000303400 | 6907 | 676D | 705F | 7274 | 040B | 000A | 0084 | 7605 |
| 0000303420 | 6C61 | 6575 | 0409 | FFFA | 00E4 | 6403 | 3170 | 0409 |
| 0000303440 | FFF4 | 00E4 | 6403 | 3270 | 0411 | FFF8 | 0085 | 730B |
| 0000303460 | 6968 | 7466 | 635F | 756F | 746E | 040C | FFF0 | 0086 |
| 0000303500 | 6F06 | 6666 | 6573 | 0174 | 2602 | 7901 | 3D33 | 4105 |
| 0000303520 | 1001 | 3600 | 0001 | 0400 | 7017 | 6972 | 746E | 665F |
| 0000303540 | 7269 | 7473 | 645F | 6669 | 5F66 | 666F | 7366 | 7465 |
| 0000303560 | 040D | 0006 | 045E | 6907 | 676D | 705F | 7274 | 0412 |
| 0000303600 | 000A | 0082 | 730C | 6174 | 7472 | 6F5F | 6666 | 6573 |
| 0000303620 | 0B74 | 0E04 | 8400 | 0500 | 6176 | 756C | 0965 | FA04 |
| 0000303640 | E4FF | 0300 | 7064 | 0931 | F404 | E4FF | 0300 | 7064 |
| 0000303660 | 1132 | F804 | 85FF | 0B00 | 6873 | 6669 | 5F74 | 6F63 |
| 0000303700 | 6E75 | 0C74 | F004 | 86FF | 0600 | 666F | 7366 | 7465 |
| 0000303720 | 0201 | 0120 | 34BA | 0544 | 0174 | 0010 | 0169 | 0000 |
| 0000303740 | 1104 | 6D69 | 6761 | 5F65 | 6573 | 7261 | 6863 | 6C5F |
| 0000303760 | 6F6F | 0D70 | 0604 | 5E00 | 0704 | 6D69 | 5F67 | 7470 |
| 0000304000 | 0872 | F404 | 80FF | 0200 | 6863 | 040A | FFF6 | 0082 |
| 0000304020 | 7304 | 7A69 | 0C65 | FA04 | 82FF | 0600 | 666F | 7366 |
| 0000304040 | 7465 | 0201 | 011D | 362E | 054A | 0106 | 0010 | 00FB |
| 0000304060 | 0000 | 0E04 | 7270 | 6E69 | 5F74 | 6973 | 5F67 | 6164 |
| 0000304100 | 6174 | 040C | 0006 | 00C4 | 7306 | 6769 | 645F | 0C70 |
| 0000304120 | 0A04 | 8500 | 0600 | 6973 | 5F67 | 7A73 | 0407 | FFFA |
| 0000304140 | 0082 | 6901 | 0201 | 011E | 3734 | 054E | 013A | 0010 |
| 0000304160 | 012F | 0000 | 0F04 | 7270 | 6E69 | 5F74 | 7462 | 706D |
| 0000304200 | 645F | 7461 | 0861 | 0604 | E400 | 0200 | 7064 | 0408 |
| 0000304220 | 000A | 0082 | 7302 | 077A | FA04 | 82FF | 0100 | 0169 |
| 0000304240 | 1D02 | 6E01 | 5038 | 0905 | 1001 | FE00 | 0000 | 0400 |
| 0000304260 | 700E | 6972 | 746E | 695F | 676D | 645F | 7461 | 0D61 |
| 0000304300 | 0604 | 5E00 | 0704 | 6D69 | 5F67 | 7470 | 0C72 | F604 |
| 0000304320 | C4FF | 0600 | 6973 | 5F67 | 7064 | 040C | FFF0 | 0085 |
| 0000304340 | 7306 | 6769 | 735F | 087A | FA04 | E4FF | 0200 | 7064 |

THU MAR 14 17:21:24 1991 CLIENT.EXE PAGE 101, LINE 5901

| | | | | | | | | |
|---|---|---|---|---|---|---|---|---|
| 0000304360 | 0408 | FFF2 | 0082 | 7302 | 017A | 1E02 | 7701 | 5439 |
| 0000304400 | 6B05 | 1001 | 6000 | 0001 | 0400 | 690F | 676D | 685F |
| 0000304420 | 7264 | 685F | 6E61 | 6C64 | 7265 | 0408 | 0006 | 00C0 |
| 0000304440 | 6F02 | 0C70 | 0A04 | 8600 | 0600 | 7374 | 5F74 | 6469 |
| 0000304460 | 0408 | FFFC | 0081 | 7302 | 0E74 | 2404 | 45FF | 0803 |
| 0000304500 | 6D69 | 5F67 | 616E | 656D | 040E | FF22 | 0081 | 6908 |
| 0000304520 | 676D | 745F | 7079 | 0C65 | F804 | 86FF | 0600 | 6D69 |
| 0000304540 | 5F67 | 6469 | 040D | FF44 | 0450 | 6907 | 676D | 685F |
| 0000304560 | 7264 | 0201 | 0122 | 3AE2 | 055C | 0214 | 0010 | 0209 |
| 0000304600 | 0000 | 1304 | 6264 | 5F30 | 6461 | 5F64 | 616C | 6579 |
| 0000304620 | 6572 | 5F64 | 6D69 | 0C67 | 0604 | 86C0 | 0600 | 7374 |
| 0000304640 | 5F74 | 6469 | 0411 | 000A | 045E | 690B | 676D | 685F |
| 0000304660 | 7264 | 705F | 7274 | 040F | 000E | 0085 | 6F09 | 6576 |
| 0000304700 | 7772 | 6972 | 6574 | 040A | 0010 | 0085 | 6204 | 6361 |
| 0000304720 | 0E6B | 1204 | 8100 | 0800 | 6F63 | 706D | 6572 | 7373 |
| 0000304740 | 0410 | 0014 | 00C6 | 690A | 676D | 695F | 5F64 | 6461 |
| 0000304760 | 0772 | F804 | 85FF | 0100 | 0869 | FA04 | 81FF | 0200 |
| 0000305000 | 7473 | 0409 | FFF6 | 0081 | 7303 | 3274 | 040D | FFFC |
| 0000305020 | 0085 | 6907 | 676D | 685F | 6C64 | 0413 | FFEE | 00E4 |
| 0000305040 | 6C0D | 7961 | 7265 | 625F | 6675 | 705F | 7274 | 040D |
| 0000305060 | FFF2 | 00E4 | 7307 | 6372 | 705F | 7274 | 0201 | 0125 |
| 0000305100 | 3CF6 | 055F | 0349 | 0010 | 033E | 0000 | 1604 | 6264 |
| 0000305120 | 5F30 | 6361 | 6563 | 7373 | 6C5F | 7961 | 7265 | 6465 |
| 0000305140 | 695F | 676D | 040C | 0006 | 0086 | 7406 | 7473 | 695F |
| 0000305160 | 0A64 | 0A04 | C000 | 0400 | 616E | 656D | 040E | 000E |
| 0000305200 | 0081 | 6908 | 676D | 745F | 7079 | 0C65 | 1004 | 8600 |
| 0000305220 | 0600 | 6D69 | 5F67 | 6469 | 0411 | 0014 | 045D | 690B |
| 0000305240 | 676D | 705F | 7274 | 615F | 7264 | 0408 | FFF6 | 0081 |
| 0000305260 | 7302 | 1274 | F804 | E4FF | 0C00 | 616C | 6579 | 5F72 |
| 0000305300 | 7562 | 6666 | 7265 | 040D | FFFC | 0085 | 6907 | 676D |
| 0000305320 | 685F | 6C64 | 040D | FF40 | 0450 | 6907 | 676D | 685F |
| 0000305340 | 7264 | 0407 | FFF4 | 0085 | 6901 | 0201 | 011C | 403F |
| 0000305360 | 0561 | 0C86 | 0010 | 0C7B | 0000 | 0D04 | 6D69 | 6761 |
| 0000305400 | 5F65 | 6168 | 646E | 656C | 0872 | 0604 | C000 | 0200 |
| 0000305420 | 706F | 040C | 000A | 0086 | 7406 | 7473 | 695F | 0E64 |
| 0000305440 | F804 | 85FE | 0800 | 6973 | 5F67 | 6973 | 657A | 040F |
| 0000305460 | FEFA | 0082 | 6209 | 6D74 | 5F70 | 6973 | 657A | 040F |
| 0000305500 | FFBE | 0085 | 6F09 | 6576 | 7772 | 6972 | 6574 | 040A |
| 0000305520 | FFD0 | 0085 | 6204 | 6361 | 0A6B | D204 | 45FF | 0403 |
| 0000305540 | 616E | 656D | 040C | FED4 | 0345 | 7006 | 6572 | 6966 |
| 0000305560 | 0D78 | CC04 | 5EFF | 0704 | 6D69 | 5F67 | 7470 | 1172 |
| 0000305600 | 0204 | 50FF | 0B04 | 6D74 | 5F70 | 6D69 | 5F67 | 6468 |
| 0000305620 | 0F72 | F404 | 81FE | 0900 | 736C | 5F74 | 726F | 6564 |
| 0000305640 | 0D72 | C004 | 85FF | 0700 | 736C | 5F74 | 6E63 | 0774 |
| 0000305660 | B604 | 85FF | 0100 | 0D69 | FE04 | 21FE | 0704 | 626F |
| 0000305700 | 5F6A | 736C | 0874 | C204 | 81FF | 0200 | 7473 | 040B |
| 0000305720 | FEC8 | 03BB | 6405 | 7461 | 3165 | 040B | FFF2 | 03BB |
| 0000305740 | 6405 | 7461 | 3265 | 0407 | FFC4 | 0088 | 7401 | 040C |
| 0000305760 | FFB8 | 0086 | 6906 | 676D | 695F | 0B64 | C804 | 86FF |
| 0000306000 | 0500 | 6374 | 695F | 0E64 | F604 | 81FE | 0800 | 6D69 |
| 0000306020 | 5F67 | 7974 | 6570 | 040A | FFBC | 0085 | 6C04 | 6E69 |
| 0000306040 | 0165 | 2202 | C501 | 6F4C | 6A05 | 1012 | 5F00 | 0012 |
| 0000306060 | 0400 | 6C13 | 7961 | 7265 | 6465 | 695F | 676D | 685F |
| 0000306100 | 6E61 | 6C64 | 7265 | 0408 | 0006 | 00C0 | 6F02 | 0C70 |
| 0000306120 | 0A04 | 8600 | 0600 | 7374 | 5F74 | 6469 | 0408 | FFBE |
| 0000306140 | 0081 | 7302 | 0D74 | C204 | 85FF | 0700 | 6D69 | 5F67 |
| 0000306160 | 6468 | 0F6C | CC04 | 85FF | 0900 | 616C | 6579 | 5F72 |
| 0000306200 | 6469 | 1378 | AA04 | E4FF | 0D00 | 616C | 6579 | 5F72 |
| 0000306220 | 7562 | 5F66 | 7470 | 0A72 | CE04 | 45FF | 0403 | 616E |

THU MAR 14 17:21:24 1991 CLIENT.EXE PAGE 102, LINE 5960

| | | | | | | | | |
|---|---|---|---|---|---|---|---|---|
| 0000306240 | 656D | 040D | FFC8 | 045E | 6907 | 676D | 705F | 7274 |
| 0000306260 | 040E | FFB2 | 0085 | 7308 | 6769 | 735F | 7A69 | 0F65 |
| 0000306300 | B404 | 82FF | 0900 | 7462 | 706D | 735F | 7A69 | 0F65 |
| 0000306320 | C004 | 85FF | 0900 | 766F | 7265 | 7277 | 7469 | 0A65 |
| 0000306340 | EE04 | 85FF | 0400 | 6162 | 6B63 | 040B | FF9E | 03BB |
| 0000306360 | 6405 | 7461 | 3165 | 040B | FFF2 | 03BB | 6405 | 7461 |
| 0000306400 | 3265 | 0407 | FFC4 | 0088 | 7401 | 040C | FFB8 | 0086 |
| 0000306420 | 6906 | 676D | 695F | 0E64 | AE04 | 81FF | 0800 | 6D69 |
| 0000306440 | 5F67 | 7974 | 6570 | 0410 | FFB0 | 0085 | 640A | 7461 |
| 0000306460 | 5F61 | 6564 | 7470 | 1168 | F004 | 85FF | 0B00 | 616C |
| 0000306500 | 6579 | 5F72 | 6564 | 7470 | 0768 | BC04 | 81FF | 0100 |
| 0000306520 | 0B69 | 6005 | 062F | 7000 | 0305 | 6D69 | 0167 | 1D02 |
| 0000306540 | 2F01 | 775F | E105 | 1004 | D600 | 0004 | 0400 | 660E |
| 0000306560 | 6C69 | 6574 | 5F72 | 6168 | 646E | 656C | 0872 | 0604 |
| 0000306600 | C000 | 0200 | 706F | 040C | 000A | 0086 | 7406 | 7473 |
| 0000306620 | 695F | 0F64 | 7A04 | 85FF | 0900 | 766F | 7265 | 7277 |
| 0000306640 | 7469 | 0A65 | DE04 | 45FF | 0403 | 616E | 656D | 040F |
| 0000306660 | FF72 | 040B | 6E09 | 6D61 | 5F65 | 696C | 7473 | 0410 |
| 0000306700 | FF7C | 049F | 660A | 746C | 5F72 | 7473 | 6372 | 0E74 |
| 0000306720 | 6E04 | A9FF | 0804 | 6C66 | 7274 | 705F | 7274 | 040F |
| 0000306740 | FFDA | 04A9 | 6609 | 746C | 5F72 | 696C | 7473 | 0407 |
| 0000306760 | FF78 | 0085 | 6901 | 0409 | FFD8 | 0085 | 6303 | 746E |
| 0000307000 | 040E | FF76 | 0085 | 6608 | 746C | 5F72 | 6E63 | 0874 |
| 0000307020 | D404 | 81FF | 0200 | 7473 | 040F | FF6C | 0081 | 6C09 |
| 0000307040 | 7473 | 6F5F | 6472 | 7265 | 040D | FFD6 | 0085 | 6C07 |
| 0000307060 | 7473 | 635F | 746E | 0201 | 011C | 6410 | 057C | 009E |
| 0000307100 | 0010 | 0093 | 0000 | 0D04 | 6966 | 6C6C | 675F | 6E65 |
| 0000307120 | 645F | 7461 | 0D61 | 0604 | CB00 | 0704 | 6567 | 5F6E |
| 0000307140 | 7470 | 0872 | 0A04 | 8600 | 0200 | 6469 | 040A | 000E |
| 0000307160 | 0085 | 7304 | 7A69 | 0865 | FA04 | C0FF | 0200 | 7064 |
| 0000307200 | 0408 | FFF4 | 0085 | 7302 | 077A | F804 | 85FF | 0100 |
| 0000307220 | 0769 | F604 | 85FF | 0100 | 016A | 1D02 | AE01 | 8064 |
| 0000307240 | 0F05 | 1001 | 0400 | 0001 | 0400 | 700E | 6972 | 746E |
| 0000307260 | 675F | 6E65 | 645F | 7461 | 0D61 | 0604 | CB00 | 0704 |
| 0000307300 | 6567 | 5F6E | 7470 | 0872 | FA04 | C0FF | 0200 | 7064 |
| 0000307320 | 0408 | FFF6 | 0085 | 7302 | 077A | F804 | 85FF | 0100 |
| 0000307340 | 0169 | 1E02 | BD01 | 8265 | 8F05 | 1004 | 8400 | 0004 |
| 0000307360 | 0400 | 670F | 6E65 | 7265 | 6369 | 685F | 6E61 | 6C64 |
| 0000307400 | 7265 | 0408 | 0006 | 00C0 | 6F02 | 0C70 | 0A04 | 8600 |
| 0000307420 | 0600 | 7374 | 5F74 | 6469 | 040A | FFEE | 0085 | 7304 |
| 0000307440 | 7A69 | 0F65 | F204 | 85FF | 0900 | 766F | 7265 | 7277 |
| 0000307460 | 7469 | 0D65 | E604 | CBFF | 0704 | 6567 | 5F6E | 7470 |
| 0000307500 | 0C72 | F804 | 86FF | 0600 | 6567 | 5F6E | 6469 | 040D |
| 0000307520 | FFFC | 0081 | 6707 | 6E65 | 745F | 7079 | 040D | FFF4 |
| 0000307540 | 0085 | 6C07 | 7473 | 635F | 746E | 0407 | FFF0 | 0085 |
| 0000307560 | 6901 | 040C | FFEA | 00C6 | 6906 | 5F64 | 736C | 0874 |
| 0000307600 | F604 | 81FF | 0200 | 7473 | 0201 | 011A | 6A4C | 0585 |
| 0000307620 | 0773 | 0010 | 0768 | 0000 | 0B04 | 6F61 | 5F69 | 6168 |
| 0000307640 | 646E | 656C | 0872 | 0604 | C000 | 0200 | 706F | 040C |
| 0000307660 | 000A | 0086 | 7406 | 7473 | 695F | 0F64 | FA04 | A9FF |
| 0000307700 | 0904 | 6C66 | 7274 | 6C5F | 7369 | 0F74 | 5604 | 45FF |
| 0000307720 | 0903 | 6C66 | 7274 | 6E5F | 6D61 | 0E65 | 5204 | 85FF |
| 0000307740 | 0800 | 6C66 | 7274 | 635F | 746E | 0409 | FFDA | 0345 |
| 0000307760 | 6603 | 706F | 0407 | FF54 | 0085 | 6901 | 040B | FF76 |
| 0000310000 | 0081 | 6905 | 646E | 7865 | 040D | FFD2 | 0085 | 6C07 |
| 0000310020 | 7473 | 635F | 746E | 040C | FF46 | 00C6 | 6906 | 5F64 |
| 0000310040 | 736C | 0874 | D404 | 81FF | 0200 | 7473 | 040F | FF78 |
| 0000310060 | 0085 | 6F09 | 6576 | 7772 | 6972 | 6574 | 040D | FF4A |
| 0000310100 | 04B5 | 6107 | 696F | 705F | 7274 | 040C | FFD6 | 0086 |

THU MAR 14 17:21:24 1991 CLIENT.EXE PAGE 103, LINE 6019

| | | | | | | | | |
|---|---|---|---|---|---|---|---|---|
| 0000310120 | 6106 | 696F | 695F | 1064 | 7A04 | 9FFF | 0A04 | 6C66 |
| 0000310140 | 7274 | 735F | 7274 | 7463 | 040E | FF4E | 04A9 | 6608 |
| 0000310160 | 746C | 5F72 | 7470 | 0172 | 1D02 | BF01 | 8A71 | 5405 |
| 0000310200 | 1001 | 4900 | 0001 | 0400 | 660E | 6C69 | 5F6C | 6369 |
| 0000310220 | 6E6F | 645F | 7461 | 0A61 | 0604 | C000 | 0400 | 616E |
| 0000310240 | 656D | 040E | 000A | 0490 | 6908 | 6F63 | 5F6E | 7470 |
| 0000310260 | 0872 | FA04 | C0FF | 0200 | 7064 | 0407 | FFF8 | 0085 |
| 0000310300 | 6901 | 0407 | FFF6 | 0085 | 6A01 | 0201 | 011E | 7313 |
| 0000310320 | 058E | 0171 | 0010 | 0166 | 0000 | 0F04 | 7270 | 6E69 |
| 0000310340 | 5F74 | 6369 | 6E6F | 645F | 7461 | 0E61 | 0604 | 9000 |
| 0000310360 | 0804 | 6369 | 6E6F | 705F | 7274 | 0410 | 000A | 0085 |
| 0000310400 | 700A | 6972 | 746E | 645F | 7461 | 0861 | FA04 | C0FF |
| 0000310420 | 0200 | 7064 | 0407 | FFF8 | 0085 | 6901 | 0201 | 011B |
| 0000310440 | 7484 | 0591 | 03CC | 0010 | 03C1 | 0000 | 0C04 | 6369 |
| 0000310460 | 6E6F | 685F | 6E61 | 6C64 | 7265 | 0408 | 0006 | 00C0 |
| 0000310500 | 6F02 | 0C70 | 0A04 | 8600 | 0600 | 7374 | 5F74 | 6469 |
| 0000310520 | 040A | FFDE | 0345 | 6E04 | 6D61 | 0F65 | 2204 | 85FF |
| 0000310540 | 0900 | 7462 | 706D | 735F | 7A69 | 0F65 | 2804 | 85FF |
| 0000310560 | 0900 | 6564 | 6373 | 735F | 7A69 | 0F65 | 2C04 | 85FF |
| 0000310600 | 0900 | 766F | 7265 | 7277 | 7469 | 0F65 | 2404 | 0BFF |
| 0000310620 | 0904 | 616E | 656D | 6C5F | 7369 | 0E74 | 3204 | 8AFF |
| 0000310640 | 0804 | 6369 | 6E6F | 685F | 7264 | 040E | FF1C | 0490 |
| 0000310660 | 6908 | 6F63 | 5F6E | 7470 | 0F72 | 2004 | 81FF | 0900 |
| 0000310700 | 736C | 5F74 | 726F | 6564 | 0772 | 2A04 | 85FF | 0100 |
| 0000310720 | 0D69 | 2E04 | 85FF | 0700 | 736C | 5F74 | 6E63 | 0874 |
| 0000310740 | 3004 | 81FF | 0200 | 7473 | 0201 | 051C | 1038 | 0006 |
| 0000310760 | 0510 | 6814 | 6C64 | 6C5F | 7961 | 7265 | 705F | 6F72 |
| 0000311000 | 706D | 5F74 | 7473 | 1E72 | 5805 | 0610 | 1200 | 1605 |
| 0000311020 | 6468 | 5F6C | 616C | 6579 | 5F72 | 6373 | 6E61 | 5F66 |
| 0000311040 | 6F66 | 6D72 | 7461 | 0516 | 1060 | 0006 | 0514 | 680E |
| 0000311060 | 6C64 | 705F | 6F72 | 706D | 5F74 | 7473 | 1872 | 7205 |
| 0000311100 | 0610 | 1600 | 1005 | 6468 | 5F6C | 6373 | 6E61 | 5F66 |
| 0000311120 | 6F66 | 6D72 | 7461 | 0511 | 1076 | 0006 | 0518 | 6909 |
| 0000311140 | 5F61 | 7270 | 6D6F | 7470 | 0516 | 10AE | 0006 | 051A |
| 0000311160 | 660E | 6C69 | 5F6C | 616C | 6579 | 5F72 | 7473 | 1672 |
| 0000311200 | C405 | 0610 | 1C00 | 0E05 | 7075 | 6164 | 6574 | 695F |
| 0000311220 | 676D | 735F | 7274 | 0D05 | 0000 | 001A | 0511 | 10DE |
| 0000311240 | 0006 | 051E | 6409 | 7065 | 6874 | 735F | 7274 | 050C |
| 0000311260 | 2390 | 0006 | 02D1 | 5F04 | 6F69 | 0D62 | 4805 | 0600 |
| 0000311300 | 8500 | 0500 | 6162 | 6374 | 1368 | 1C05 | 0610 | 0A00 |
| 0000311320 | 0B05 | 616E | 656D | 695F | 5F64 | 7473 | 1772 | 2605 |
| 0000311340 | 0610 | 0C00 | 0F05 | 616E | 656D | 705F | 6F72 | 706D |
| 0000311360 | 5F74 | 7473 | 1572 | 3005 | 0610 | 0E00 | 0D05 | 6469 |
| 0000311400 | 705F | 6F72 | 706D | 5F74 | 7473 | 0872 | 6C63 | 6569 |
| 0000311420 | 746E | 632E | 0001 | 0272 | 0060 | 0000 | 0065 | 0010 |
| 0000311440 | 0067 | 0021 | 006A | 0035 | 006F | 003F | 0073 | 005B |
| 0000311460 | 0074 | 006E | 0077 | 007D | 0079 | 0086 | 0086 | 0091 |
| 0000311500 | 0089 | 00A1 | 008A | 00B2 | 008C | 00B9 | 008D | 00C1 |
| 0000311520 | 008F | 00C4 | 0090 | 00CC | 0092 | 00CF | 0093 | 00E1 |
| 0000311540 | 0094 | 00E9 | 0095 | 00EC | 0096 | 00FE | 0097 | 0106 |
| 0000311560 | 0098 | 0109 | 0099 | 0111 | 009B | 011D | 009D | 0120 |
| 0000311600 | 009E | 0128 | 00A0 | 012B | 00A1 | 0133 | 00A2 | 013F |
| 0000311620 | 00A3 | 0142 | 00A5 | 0190 | 00B9 | 019B | 00C5 | 01AB |
| 0000311640 | 00C7 | 01B6 | 00C8 | 01C2 | 00C9 | 01D9 | 00CA | 0202 |
| 0000311660 | 00CB | 0233 | 00CC | 0246 | 00CD | 0255 | 00D0 | 0258 |
| 0000311700 | 00D1 | 0264 | 00D2 | 0275 | 00D3 | 029E | 00D4 | 02AB |
| 0000311720 | 00D5 | 02BA | 00D8 | 02BD | 00D9 | 02C9 | 00DA | 02DA |
| 0000311740 | 00DB | 0303 | 00DC | 0310 | 00DD | 031F | 00E0 | 0322 |
| 0000311760 | 00E1 | 032E | 00E2 | 033F | 00E3 | 0368 | 00E4 | 0375 |

THU MAR 14 17:21:24 1991 CLIENT.EXE PAGE 104, LINE 6078

| | | | | | | | | |
|---|---|---|---|---|---|---|---|---|
| 0000312000 | 00E5 | 0384 | 00E8 | 0387 | 00E9 | 0393 | 00EA | 03A5 |
| 0000312020 | 00EB | 03B5 | 00EC | 03DE | 00ED | 040F | 00EE | 0423 |
| 0000312040 | 00EF | 0432 | 00F1 | 0435 | 00F2 | 0441 | 00F3 | 0452 |
| 0000312060 | 00F4 | 047B | 00F5 | 0490 | 00F6 | 049F | 00F7 | 04B5 |
| 0000312100 | 00F8 | 04D2 | 00F9 | 04DE | 00FA | 04EA | 00FB | 04ED |
| 0000312120 | 00FE | 055F | 010B | 056A | 0112 | 057A | 0114 | 0592 |
| 0000312140 | 0115 | 059B | 0117 | 05A1 | 0118 | 05BD | 0119 | 05C6 |
| 0000312160 | 011A | 05D0 | 011B | 05D6 | 011C | 05D9 | 011D | 05E8 |
| 0000312200 | 0121 | 05EE | 0123 | 0600 | 0124 | 0616 | 0125 | 0628 |
| 0000312220 | 0126 | 0634 | 0129 | 064C | 012A | 067F | 012B | 068E |
| 0000312240 | 012D | 0691 | 012F | 06A9 | 0131 | 06BC | 0133 | 06C2 |
| 0000312260 | 0147 | 06CD | 0157 | 06DD | 015F | 06E5 | 0162 | 06F0 |
| 0000312300 | 0163 | 06FD | 0164 | 0709 | 0165 | 071B | 0166 | 072B |
| 0000312320 | 0167 | 0749 | 0168 | 0772 | 0169 | 07A5 | 016C | 07D6 |
| 0000312340 | 016E | 0801 | 0170 | 081C | 0171 | 081F | 0172 | 082B |
| 0000312360 | 0173 | 0849 | 0174 | 0872 | 0175 | 08A5 | 0177 | 08D6 |
| 0000312400 | 0179 | 08F5 | 017B | 0910 | 017F | 0913 | 0180 | 091F |
| 0000312420 | 0181 | 0931 | 0182 | 0941 | 0183 | 0953 | 0184 | 097C |
| 0000312440 | 0186 | 09AF | 0187 | 09CE | 0188 | 09DD | 018A | 09E6 |
| 0000312460 | 018B | 09FE | 018F | 0A01 | 0190 | 0A0D | 0191 | 0A1F |
| 0000312500 | 0192 | 0A2F | 0193 | 0A58 | 0194 | 0A8B | 0195 | 0AA6 |
| 0000312520 | 0196 | 0AB5 | 0197 | 0ABE | 019C | 0AC1 | 019D | 0AF6 |
| 0000312540 | 019F | 0B00 | 01A0 | 0B17 | 01A3 | 0B1A | 01A5 | 0B3C |
| 0000312560 | 01A6 | 0B4F | 01AA | 0B52 | 01AB | 0B5E | 01AC | 0B70 |
| 0000312600 | 01AD | 0B99 | 01AE | 0BCC | 01B0 | 0BE1 | 01B1 | 0BFC |
| 0000312620 | 01B5 | 0BFF | 01B6 | 0C0B | 01B7 | 0C1D | 01B8 | 0C2D |
| 0000312640 | 01B9 | 0C56 | 01BA | 0C89 | 01BB | 0CA4 | 01BC | 0CB3 |
| 0000312660 | 01BD | 0CC7 | 01BE | 0CD9 | 01C0 | 0CEC | 01C4 | 0CEF |
| 0000312700 | 01C5 | 0CFB | 01C6 | 0D0D | 01C7 | 0D1D | 01C8 | 0D46 |
| 0000312720 | 01CA | 0D79 | 01CB | 0D9A | 01CC | 0DA9 | 01CE | 0DB5 |
| 0000312740 | 01D1 | 0DCB | 01D3 | 0DFD | 01D4 | 0E14 | 01D7 | 0E17 |
| 0000312760 | 01D8 | 0E23 | 01D9 | 0E35 | 01DA | 0E45 | 01DB | 0E6E |
| 0000313000 | 01DD | 0EA1 | 01DE | 0EC2 | 01DF | 0ED1 | 01E0 | 0EDA |
| 0000313020 | 01E3 | 0EDD | 01E4 | 0EF5 | 01E7 | 0EF8 | 01E8 | 0F04 |
| 0000313040 | 01E9 | 0F16 | 01EA | 0F26 | 01EB | 0F37 | 01EC | 0F60 |
| 0000313060 | 01EE | 0F93 | 01EF | 0FAE | 01F0 | 0FB7 | 01F1 | 0FC6 |
| 0000313100 | 01F4 | 0FC9 | 01F7 | 0FCE | 01F8 | 0FF7 | 01F9 | 1000 |
| 0000313120 | 01FA | 100C | 01FB | 100F | 01FD | 101B | 01FE | 102E |
| 0000313140 | 0201 | 1031 | 0202 | 103D | 0203 | 104F | 0204 | 105F |
| 0000313160 | 0205 | 1071 | 0206 | 1081 | 0207 | 10AA | 0208 | 10BB |
| 0000313200 | 0209 | 10EE | 020D | 111F | 020F | 1149 | 0210 | 1164 |
| 0000313220 | 0213 | 1167 | 0214 | 1173 | 0215 | 1185 | 0216 | 1195 |
| 0000313240 | 0217 | 11A7 | 0218 | 11B7 | 0219 | 11E0 | 021A | 11F1 |
| 0000313260 | 021B | 1224 | 021F | 1255 | 0221 | 127F | 0222 | 129A |
| 0000313300 | 0224 | 129D | 0225 | 12A9 | 0226 | 12BB | 0227 | 12CB |
| 0000313320 | 0228 | 12DD | 0229 | 1306 | 022A | 1339 | 022B | 1358 |
| 0000313340 | 022C | 136D | 022E | 1370 | 022F | 137C | 0230 | 1388 |
| 0000313360 | 0231 | 1394 | 0232 | 13A0 | 0233 | 13B2 | 0234 | 13C2 |
| 0000313400 | 0235 | 13D3 | 0236 | 13E4 | 0237 | 140D | 0239 | 1440 |
| 0000313420 | 023B | 1467 | 023C | 1470 | 023D | 147F | 023E | 148B |
| 0000313440 | 023F | 1497 | 0240 | 14A3 | 0245 | 14B9 | 0246 | 14F6 |
| 0000313460 | 0247 | 1513 | 0248 | 151C | 0249 | 1533 | 024A | 1536 |
| 0000313500 | 024B | 1554 | 024C | 156A | 024D | 157C | 024E | 159B |
| 0000313520 | 0252 | 15A7 | 0254 | 15B6 | 0255 | 15C8 | 0257 | 15CB |
| 0000313540 | 0258 | 15DD | 025A | 15E0 | 025B | 15F2 | 025D | 15F5 |
| 0000313560 | 025E | 1607 | 0260 | 160A | 0261 | 161C | 0263 | 161F |
| 0000313600 | 0264 | 1631 | 0266 | 1634 | 0267 | 1646 | 0269 | 1649 |
| 0000313620 | 026A | 1667 | 026B | 166A | 026C | 16A7 | 026E | 16D0 |
| 0000313640 | 026F | 16D3 | 0270 | 16DC | 0272 | 16E8 | 0273 | 16F4 |

THU MAR 14 17:21:24 1991 CLIENT.EXE PAGE 105, LINE 6137

| | | | | | | | | |
|---|---|---|---|---|---|---|---|---|
| 0000313660 | 0275 | 1700 | 0276 | 1703 | 0279 | 1712 | 027A | 172C |
| 0000313700 | 027D | 172F | 027F | 17B1 | 0294 | 17BC | 0298 | 17CC |
| 0000313720 | 029B | 17D4 | 02A5 | 17DC | 02A7 | 17E7 | 02A8 | 17F3 |
| 0000313740 | 02A9 | 1805 | 02AA | 1819 | 02AB | 1826 | 02AD | 184F |
| 0000313760 | 02AE | 186C | 02AF | 1885 | 02B2 | 1888 | 02B3 | 1894 |
| 0000314000 | 02B4 | 18A4 | 02B5 | 18AF | 02B6 | 18BF | 02B7 | 18D0 |
| 0000314020 | 02B8 | 18F9 | 02B9 | 190A | 02BA | 1919 | 02BD | 191C |
| 0000314040 | 02BE | 1928 | 02BF | 1938 | 02C0 | 1961 | 02C1 | 1971 |
| 0000314060 | 02C2 | 1983 | 02C5 | 1986 | 02C6 | 1992 | 02C7 | 19A3 |
| 0000314100 | 02C8 | 19B0 | 02C9 | 19D9 | 02CA | 19F1 | 02CB | 1A00 |
| 0000314120 | 02CE | 1A03 | 02CF | 1A0F | 02D0 | 1A20 | 02D1 | 1A49 |
| 0000314140 | 02D2 | 1A5E | 02D3 | 1A6D | 02D5 | 1A70 | 02D6 | 1A7C |
| 0000314160 | 02D7 | 1A8D | 02D8 | 1AB6 | 02D9 | 1ACB | 02DA | 1ADA |
| 0000314200 | 02DE | 1ADD | 02E0 | 1AF6 | 02E2 | 1B20 | 02E3 | 1B29 |
| 0000314220 | 02E4 | 1B41 | 02E6 | 1B50 | 02E7 | 1B63 | 02EA | 1B66 |
| 0000314240 | 02EB | 1B7D | 02EC | 1B8C | 02F0 | 1B98 | 02F4 | 1C20 |
| 0000314260 | 02F7 | 1C57 | 02FA | 1CC3 | 02FC | 1D2F | 02FD | 1D3B |
| 0000314300 | 0300 | 1D56 | 0303 | 1DBE | 0304 | 1DCA | 0306 | 1DD6 |
| 0000314320 | 0307 | 1DF8 | 0308 | 1E05 | 0309 | 1E1D | 030B | 1E2C |
| 0000314340 | 030C | 1E3F | 030F | 1E42 | 0310 | 1E4E | 0311 | 1E5F |
| 0000314360 | 0313 | 1E88 | 0314 | 1E91 | 0315 | 1EAD | 0317 | 1EB6 |
| 0000314400 | 0319 | 1ED3 | 031A | 1EDC | 031D | 1EEC | 031E | 1EF5 |
| 0000314420 | 0320 | 1F08 | 0323 | 1F18 | 0324 | 1F1B | 0326 | 1F29 |
| 0000314440 | 0327 | 1F38 | 032A | 1F3B | 032B | 1F47 | 032C | 1F59 |
| 0000314460 | 032D | 1F82 | 032E | 1F95 | 032F | 1F9E | 0331 | 1FB2 |
| 0000314500 | 0332 | 1FC1 | 0334 | 1FCA | 0336 | 1FE4 | 0338 | 1FFB |
| 0000314520 | 033A | 1FFE | 033C | 207A | 0353 | 2085 | 035E | 2095 |
| 0000314540 | 0364 | 20A5 | 0367 | 20B0 | 0368 | 20C2 | 0369 | 20DF |
| 0000314560 | 036B | 2108 | 036D | 2151 | 036E | 216F | 0371 | 2172 |
| 0000314600 | 0372 | 2189 | 0373 | 21A0 | 0374 | 21C9 | 0375 | 21DB |
| 0000314620 | 0376 | 21EA | 0379 | 21ED | 037A | 2204 | 037B | 2220 |
| 0000314640 | 037C | 2249 | 0381 | 2250 | 0383 | 226B | 0384 | 2280 |
| 0000314660 | 0389 | 2283 | 038B | 229F | 038C | 22B6 | 0391 | 22B9 |
| 0000314700 | 0393 | 22D4 | 0394 | 22E6 | 0399 | 22E9 | 039B | 2304 |
| 0000314720 | 039C | 2322 | 039D | 2325 | 039E | 2331 | 039F | 2334 |
| 0000314740 | 03A0 | 2382 | 03A3 | 2385 | 03A4 | 239C | 03A5 | 23B8 |
| 0000314760 | 03A6 | 23E1 | 03AC | 23E8 | 03AD | 2408 | 03AE | 2417 |
| 0000315000 | 03AF | 2420 | 03B1 | 2436 | 03B2 | 2458 | 03B8 | 245B |
| 0000315020 | 03B9 | 247B | 03BA | 248A | 03BB | 2493 | 03BD | 24A9 |
| 0000315040 | 03BE | 24CB | 03C4 | 24CE | 03C5 | 24EE | 03C6 | 24FD |
| 0000315060 | 03C7 | 2506 | 03C9 | 251C | 03CA | 2539 | 03D0 | 253C |
| 0000315100 | 03D1 | 255C | 03D2 | 256B | 03D3 | 2574 | 03D5 | 258A |
| 0000315120 | 03D6 | 25B4 | 03D7 | 25B7 | 03D8 | 25C3 | 03D9 | 25C6 |
| 0000315140 | 03DA | 2614 | 03DB | 2617 | 03DE | 261A | 03DF | 2631 |
| 0000315160 | 03E0 | 264D | 03E1 | 2676 | 03E6 | 267D | 03E7 | 2698 |
| 0000315200 | 03EC | 269B | 03ED | 26B6 | 03F2 | 26B9 | 03F3 | 26D7 |
| 0000315220 | 03F4 | 26DA | 03F5 | 26E6 | 03F6 | 26E9 | 03F7 | 2725 |
| 0000315240 | 03F8 | 2734 | 03FA | 273D | 03FB | 274F | 03FC | 275B |
| 0000315260 | 03FD | 2771 | 03FE | 2790 | 03FF | 2793 | 0400 | 279F |
| 0000315300 | 0402 | 27B5 | 0403 | 27B8 | 0404 | 27CA | 0406 | 27D9 |
| 0000315320 | 0407 | 27DC | 0409 | 2837 | 0421 | 2842 | 0424 | 2852 |
| 0000315340 | 0428 | 285B | 0429 | 2867 | 042A | 2873 | 042B | 287F |
| 0000315360 | 042C | 288B | 042D | 28A1 | 0430 | 28CA | 0432 | 28ED |
| 0000315400 | 0433 | 2905 | 0435 | 2908 | 044B | 2913 | 0450 | 2923 |
| 0000315420 | 0452 | 292F | 0455 | 293A | 0456 | 2946 | 0457 | 2958 |
| 0000315440 | 0458 | 2962 | 0459 | 296E | 045A | 2985 | 045B | 2991 |
| 0000315460 | 045C | 2994 | 045D | 29BD | 045F | 29CF | 0462 | 29D2 |
| 0000315500 | 0463 | 29DE | 0464 | 29F0 | 0465 | 29FA | 0466 | 2A06 |
| 0000315520 | 0467 | 2A1D | 0468 | 2A29 | 0469 | 2A2C | 046A | 2A55 |

THU MAR 14 17:21:24 1991 CLIENT.EXE PAGE 106, LINE 6196

| | | | | | | | | |
|---|---|---|---|---|---|---|---|---|
| 0000315540 | 046B | 2A67 | 046C | 2A73 | 046E | 2A81 | 0475 | 2A84 |
| 0000315560 | 0476 | 2A97 | 0477 | 2AA1 | 0478 | 2AAD | 0479 | 2ABD |
| 0000315600 | 047E | 2AC0 | 047F | 2AD6 | 0480 | 2AE0 | 0481 | 2AEC |
| 0000315620 | 0482 | 2AFC | 0484 | 2AFF | 0485 | 2B02 | 0486 | 2B14 |
| 0000315640 | 0489 | 2B17 | 048B | 2B1A | 048D | 2B58 | 04A4 | 2B63 |
| 0000315660 | 04A7 | 2B73 | 04AA | 2B7D | 04AC | 2B89 | 04AE | 2BA6 |
| 0000315700 | 04B0 | 2BBD | 04B1 | 2BD2 | 04B2 | 2BDE | 04B5 | 2BE1 |
| 0000315720 | 04B6 | 2BF7 | 04BB | 2C01 | 04BC | 2C13 | 04BD | 2C29 |
| 0000315740 | 04BF | 2C3B | 04C1 | 2C46 | 04C2 | 2C58 | 04C3 | 2C66 |
| 0000315760 | 04C4 | 2C69 | 04C6 | 2C6C | 04C7 | 2C7E | 04C8 | 2C8C |
| 0000316000 | 04C9 | 2C8F | 04CB | 2C92 | 04CC | 2CA4 | 04CD | 2CB2 |
| 0000316020 | 04CE | 2CB5 | 04CF | 2CB8 | 04D0 | 2CCA | 04D1 | 2CD8 |
| 0000316040 | 04D2 | 2CDB | 04D4 | 2D19 | 04EB | 2D24 | 04EE | 2D34 |
| 0000316060 | 04F3 | 2D39 | 04F4 | 2D52 | 04F6 | 2D58 | 04F7 | 2D6C |
| 0000316100 | 04F9 | 2D7B | 04FA | 2D84 | 04FB | 2D90 | 04FC | 2DA1 |
| 0000316120 | 04FE | 2DCA | 0501 | 2DD1 | 0502 | 2DE3 | 0505 | 2DE6 |
| 0000316140 | 0506 | 2DF9 | 0509 | 2DFC | 050A | 2E0F | 050D | 2E12 |
| 0000316160 | 050E | 2E25 | 0511 | 2E28 | 0512 | 2E3B | 0515 | 2E3E |
| 0000316200 | 0516 | 2E51 | 0519 | 2E54 | 051A | 2E67 | 051D | 2E6A |
| 0000316220 | 051E | 2E7D | 0521 | 2E80 | 0522 | 2E8D | 0525 | 2E90 |
| 0000316240 | 0526 | 2E9D | 0528 | 2EA0 | 0529 | 2EB3 | 052D | 2EB6 |
| 0000316260 | 052E | 2EC3 | 0531 | 2EC6 | 0532 | 2ED9 | 0535 | 2EDC |
| 0000316300 | 0536 | 2EE1 | 0538 | 2EE4 | 053A | 2F9B | 053C | 2F9E |
| 0000316320 | 053D | 2FA8 | 053E | 2FB7 | 053F | 2FC1 | 0541 | 2FD1 |
| 0000316340 | 630A | 696C | 6E65 | 5F74 | 2E6F | 0163 | 6500 | 7A03 |
| 0000316360 | DC00 | 7B2F | EC00 | 7C2F | 0500 | 7D30 | 1400 | 7E30 |
| 0000316400 | 1D00 | 7F30 | 2600 | 8030 | 2F00 | 8130 | 3800 | 8230 |
| 0000316420 | 4100 | 8430 | 4A00 | 8E30 | 5500 | 9630 | 6500 | 9730 |
| 0000316440 | 7E00 | 9830 | 8D00 | 9930 | 9600 | 9A30 | 9F00 | 9B30 |
| 0000316460 | A800 | 9C30 | B100 | 9D30 | BA00 | A130 | C300 | A230 |
| 0000316500 | D400 | A430 | DE00 | A530 | 0800 | A631 | 2800 | A731 |
| 0000316520 | 3500 | AB31 | 3800 | AC31 | 4900 | AD31 | 5A00 | AE31 |
| 0000316540 | 7C00 | AF31 | A600 | B031 | C900 | B131 | E900 | B231 |
| 0000316560 | EC00 | BB31 | F700 | BD31 | 0700 | BF32 | 2D00 | C032 |
| 0000316600 | 4C00 | C232 | 4F00 | C632 | 6000 | C732 | AE00 | C832 |
| 0000316620 | B100 | D232 | BC00 | D732 | CC00 | D932 | DE00 | DA32 |
| 0000316640 | EA00 | DD32 | ED00 | E032 | FE00 | E432 | 2B00 | E533 |
| 0000316660 | 3700 | EE33 | 3A00 | EF33 | 5900 | F033 | 6B00 | F133 |
| 0000316700 | 6E00 | FD33 | 7900 | 0333 | 8901 | 0433 | 9201 | 0533 |
| 0000316720 | 9E01 | 0733 | A101 | 0933 | B301 | 0A33 | BF01 | 0C33 |
| 0000316740 | C201 | 0E33 | E801 | 0F33 | 0701 | 1134 | 0A01 | 1534 |
| 0000316760 | 2901 | 1934 | 5E01 | 1A34 | 6A01 | 2334 | 6D01 | 2534 |
| 0000317000 | 8C01 | 2634 | AC01 | 2734 | AF01 | 3134 | BA01 | 3234 |
| 0000317020 | CA01 | 3534 | CE01 | 3734 | E001 | 3934 | EC01 | 3A34 |
| 0000317040 | 0201 | 3B35 | 3001 | 3E35 | 3701 | 3F35 | 4901 | 4235 |
| 0000317060 | 4C01 | 4335 | 6001 | 4635 | 6301 | 4735 | 6F01 | 4835 |
| 0000317100 | 8001 | 4935 | AE01 | 4A35 | C601 | 4D35 | C901 | 4F35 |
| 0000317120 | CC01 | 5035 | D801 | 5135 | 2001 | 5236 | 2301 | 5E36 |
| 0000317140 | 2E01 | 6136 | 5E01 | 6336 | 5201 | 6436 | 5E01 | 6536 |
| 0000317160 | 8801 | 6636 | 9701 | 6736 | AC01 | 6836 | AF01 | 6936 |
| 0000317200 | CA01 | 6A36 | D701 | 6B36 | E601 | 6C36 | FB01 | 6D36 |
| 0000317220 | FE01 | 6F36 | 1901 | 7037 | 2601 | 7237 | 2901 | 7E37 |
| 0000317240 | 3401 | 8137 | 4401 | 8237 | 6601 | 8337 | 7201 | 8437 |
| 0000317260 | 9C01 | 8537 | AB01 | 8637 | C001 | 8737 | C301 | 8837 |
| 0000317300 | DE01 | 8937 | FE01 | 8A37 | 0D01 | 8B38 | 2201 | 8C38 |
| 0000317320 | 2501 | 8E38 | 4001 | 8F38 | 6001 | 9138 | 6301 | 9A38 |
| 0000317340 | 6E01 | A438 | 7E01 | A838 | B901 | AC38 | E101 | B038 |
| 0000317360 | 0A01 | B139 | 1B01 | B239 | 2501 | B639 | 3601 | B739 |
| 0000317400 | 4701 | B839 | 5801 | BA39 | 6C01 | C439 | 7701 | CB39 |

THU MAR 14 17:21:24 1991 CLIENT.EXE PAGE 107, LINE 6255

| | | | | | | | | |
|---|---|---|---|---|---|---|---|---|
| 0000317420 | 8701 | CC39 | 9701 | CE39 | B401 | D039 | E201 | D139 |
| 0000317440 | 0601 | D23A | 1501 | D63A | 1E01 | DA3A | 3E01 | DD3A |
| 0000317460 | 5601 | E33A | 7701 | E73A | 9201 | E83A | A701 | E93A |
| 0000317500 | B601 | EA3A | C501 | ED3A | D701 | FD3A | E201 | FE3A |
| 0000317520 | F201 | 043A | F702 | 053A | 1E02 | 063B | 2702 | 073B |
| 0000317540 | 2D02 | 093B | 3C02 | 0A3B | 4902 | 0C3B | 6502 | 0D3B |
| 0000317560 | 6E02 | 0E3B | 8A02 | 0F3B | 9902 | 123B | 9F02 | 133B |
| 0000317600 | BB02 | 153B | E002 | 173B | 2A02 | 183C | 6202 | 193C |
| 0000317620 | 7B02 | 1B3C | 8402 | 1C3C | A002 | 1D3C | AF02 | 1F3C |
| 0000317640 | B502 | 213C | B802 | 233C | D402 | 253C | E502 | 273C |
| 0000317660 | EB02 | 363C | F602 | 3E3C | 0602 | 3F3D | 2B02 | 413D |
| 0000317700 | 3402 | 423D | 4F02 | 463D | 5502 | 4B3D | 7802 | 4C3D |
| 0000317720 | AB02 | 4D3D | BF02 | 4E3D | D302 | 503D | EE02 | 533D |
| 0000317740 | FE02 | 543D | 1D02 | 563E | 2602 | 573E | 4102 | 5A3E |
| 0000317760 | 4702 | 5B3E | 6802 | 5C3E | 7102 | 5E3E | 8602 | 5F3E |
| 0000320000 | A102 | 633E | A702 | 653E | C602 | 663E | F102 | 673E |
| 0000320020 | 0B02 | 693F | 1402 | 6B3F | 2902 | 6C3F | 4402 | 703F |
| 0000320040 | 4A02 | 723F | D702 | 753F | DA02 | 763F | F202 | 783F |
| 0000320060 | 0102 | 7940 | 1F02 | 7B40 | 2E02 | 7D40 | 3402 | 9340 |
| 0000320100 | 3F02 | 9440 | 4F02 | 9540 | 5502 | 9640 | 5F02 | 9740 |
| 0000320120 | 6402 | 9A40 | 6902 | A540 | 7102 | A740 | 7502 | A940 |
| 0000320140 | 8002 | AB40 | 9002 | AC40 | B702 | AD40 | E502 | AE40 |
| 0000320160 | 0402 | AF41 | 1302 | B141 | 1F02 | B241 | 3202 | B441 |
| 0000320200 | 3E02 | B541 | 4902 | B841 | 7902 | B941 | 9D02 | BC41 |
| 0000320220 | A002 | BD41 | C102 | C241 | CB02 | C341 | 2902 | C442 |
| 0000320240 | 3802 | C742 | 6202 | C842 | 8C02 | CB42 | 8F02 | CC42 |
| 0000320260 | 9F02 | CD42 | BB02 | CF42 | E902 | D042 | F402 | D242 |
| 0000320300 | 2402 | D343 | 4902 | D643 | 4C02 | D743 | 7002 | DC43 |
| 0000320320 | 7A02 | DD43 | D802 | DE43 | E702 | DF43 | 1102 | E044 |
| 0000320340 | 2F02 | E244 | 3B02 | E544 | 4902 | E644 | 6302 | E744 |
| 0000320360 | 7202 | EA44 | 7502 | EB44 | 8502 | EC44 | A102 | EE44 |
| 0000320400 | CF02 | F144 | DA02 | F244 | FE02 | F744 | 0802 | F845 |
| 0000320420 | 6602 | F945 | 7502 | FA45 | 9F02 | FB45 | BD02 | FD45 |
| 0000320440 | C902 | FE45 | D902 | FF45 | E702 | 0045 | EA03 | 0345 |
| 0000320460 | F603 | 0445 | 1003 | 0546 | 1F03 | 0846 | 2203 | 0946 |
| 0000320500 | 3203 | 0A46 | 4E03 | 0C46 | 7C03 | 0D46 | 9903 | 0E46 |
| 0000320520 | A803 | 1146 | AB03 | 1246 | B703 | 1346 | CF03 | 1546 |
| 0000320540 | FD03 | 1646 | 1E03 | 1747 | 2D03 | 1947 | 3903 | 1B47 |
| 0000320560 | 4503 | 1E47 | 5B03 | 1F47 | 8D03 | 2047 | A403 | 2347 |
| 0000320600 | A703 | 2447 | B303 | 2547 | C503 | 2847 | F303 | 2947 |
| 0000320620 | 2303 | 2A48 | 3703 | 2D48 | 3A03 | 2E48 | 5003 | 2F48 |
| 0000320640 | 6403 | 3148 | 6703 | 3348 | 7703 | 3448 | 9D03 | 3548 |
| 0000320660 | CB03 | 3748 | D603 | 3848 | F903 | 3948 | 0803 | 3A49 |
| 0000320700 | 1103 | 3B49 | 1803 | 3C49 | 2603 | 3D49 | 3A03 | 3F49 |
| 0000320720 | 4903 | 4449 | 5303 | 4549 | B103 | 4649 | C003 | 4749 |
| 0000320740 | EA03 | 4949 | 0503 | 4B4A | 0803 | 4D4A | 1803 | 4E4A |
| 0000320760 | 3E03 | 4F4A | 6C03 | 514A | 7703 | 524A | 9D03 | 574A |
| 0000321000 | A703 | 584A | 0503 | 594B | 1403 | 5A4B | 3E03 | 5B4B |
| 0000321020 | 5C03 | 5E4B | 5F03 | 5F4B | 6B03 | 604B | 7D03 | 614B |
| 0000321040 | AB03 | 624B | C603 | 634B | CF03 | 644B | DE03 | 674B |
| 0000321060 | E103 | 684B | F303 | 6A4B | FC03 | 6B4B | 1503 | 6D4C |
| 0000321100 | 2A03 | 6F4C | 3B03 | 714C | 3E03 | 734C | BA03 | 874C |
| 0000321120 | C503 | 8D4C | D503 | 8E4C | DD03 | 8F4C | E203 | 904C |
| 0000321140 | EA03 | 914C | EF03 | 9C4C | F403 | 9F4C | FF03 | A14C |
| 0000321160 | 0F03 | A24D | 3403 | AC4D | 6203 | AD4D | 7503 | AE4D |
| 0000321200 | 8003 | AF4D | 8C03 | B24D | 8F03 | B34D | A203 | B44D |
| 0000321220 | AC03 | B54D | B903 | B64D | CA03 | B84D | D703 | B94D |
| 0000321240 | E703 | BA4D | FD03 | BB4D | 2B03 | BC4E | 3503 | BD4E |
| 0000321260 | 3F03 | BF4E | 5703 | C24E | 6103 | C34E | 8703 | C44E |

THU MAR 14 17:21:24 1991 CLIENT.EXE PAGE 108, LINE 6314

| | | | | | | | | |
|---|---|---|---|---|---|---|---|---|
| 0000321300 | 9103 | C74E | E703 | C84E | F003 | C94E | 0203 | CA4F |
| 0000321320 | 3303 | CB4F | 4A03 | CC4F | 5903 | CD4F | 6B03 | D04F |
| 0000321340 | 7D03 | D14F | 8C03 | D44F | 9903 | D64F | BA03 | D94F |
| 0000321360 | BD03 | DA4F | CD03 | DB4F | E303 | DC4F | 1103 | DD50 |
| 0000321400 | 2103 | DF50 | 3203 | E050 | 5203 | E250 | 5C03 | E350 |
| 0000321420 | 7903 | E450 | 8303 | E550 | D903 | E750 | ED03 | E850 |
| 0000321440 | FC03 | EA50 | 0903 | EB51 | 2703 | EE51 | 2A03 | EF51 |
| 0000321460 | 4003 | F051 | 5003 | F151 | 6103 | F351 | 8F03 | F651 |
| 0000321500 | 9A03 | F751 | A403 | F851 | B003 | F951 | C103 | FB51 |
| 0000321520 | EF03 | FD51 | 0D03 | FE52 | 2A03 | FF52 | 3403 | 0052 |
| 0000321540 | 8A04 | 0152 | 9E04 | 0252 | AD04 | 0452 | BA04 | 0552 |
| 0000321560 | D804 | 0852 | DB04 | 0A52 | E504 | 0B52 | 0204 | 0C53 |
| 0000321600 | 0C04 | 0D53 | 6204 | 0E53 | 7604 | 0F53 | 8504 | 1053 |
| 0000321620 | 9204 | 1153 | B004 | 1353 | B904 | 1453 | D504 | 1553 |
| 0000321640 | D804 | 1753 | FE04 | 1A53 | 0104 | 1B54 | 1704 | 1C54 |
| 0000321660 | 2704 | 1D54 | 3804 | 1F54 | 6604 | 2254 | 7104 | 2554 |
| 0000321700 | 7B04 | 2654 | 9A04 | 2754 | A404 | 2854 | FA04 | 2954 |
| 0000321720 | 0E04 | 2A55 | 1D04 | 2C55 | 4204 | 2F55 | 7104 | 3155 |
| 0000321740 | 8604 | 3255 | B504 | 3555 | B804 | 3655 | C804 | 3755 |
| 0000321760 | D904 | 3955 | 0704 | 3C56 | 1104 | 3D56 | 2E04 | 3E56 |
| 0000322000 | 3804 | 3F56 | 8E04 | 4056 | A204 | 4156 | B104 | 4356 |
| 0000322020 | D604 | 4556 | 0504 | 4757 | 1404 | 4857 | 4304 | 4957 |
| 0000322040 | 4604 | 4B57 | 6C04 | 4E57 | 6F04 | 4F57 | 7F04 | 5057 |
| 0000322060 | 9F04 | 5357 | CD04 | 5457 | E004 | 5557 | EB04 | 5657 |
| 0000322100 | F704 | 5957 | FA04 | 5D57 | 0404 | 5E58 | 3704 | 5F58 |
| 0000322120 | 4104 | 6058 | 9704 | 6158 | A004 | 6258 | B204 | 6558 |
| 0000322140 | E304 | 6658 | 1604 | 6759 | 2504 | 6859 | 3704 | 6B59 |
| 0000322160 | 4904 | 6C59 | 5804 | 6F59 | 6504 | 7059 | 8604 | 7359 |
| 0000322200 | 8904 | 7459 | 9904 | 7559 | AF04 | 7759 | DD04 | 7959 |
| 0000322220 | E704 | 7A59 | 0704 | 7B5A | 1104 | 7C5A | 6704 | 7D5A |
| 0000322240 | 7B04 | 7E5A | 8A04 | 805A | 9704 | 825A | B504 | 845A |
| 0000322260 | BE04 | 855A | DE04 | 865A | EE04 | 875A | FF04 | 895A |
| 0000322300 | 0804 | 8D5B | 2804 | 905B | 2B04 | 935B | 4C04 | 955B |
| 0000322320 | 5C04 | 965B | 7204 | 985B | A004 | 995B | B004 | 9A5B |
| 0000322340 | C104 | 9C5B | EF04 | 9F5B | F904 | A05B | 1904 | A15C |
| 0000322360 | 2304 | A25C | 7904 | A35C | 8D04 | A45C | 9C04 | A75C |
| 0000322400 | A904 | A85C | C704 | AB5C | CA04 | AC5C | DA04 | AD5C |
| 0000322420 | EB04 | AF5C | 1904 | B15D | 2304 | B25D | 4204 | B35D |
| 0000322440 | 4C04 | B45D | A204 | B55D | B604 | B65D | C504 | B95D |
| 0000322460 | D204 | BA5D | F004 | BC5D | F304 | BD5D | 1904 | C05E |
| 0000322500 | 1C04 | C15E | 2C04 | C25E | 3D04 | C55E | 6B04 | C65E |
| 0000322520 | 8504 | C75E | 9404 | C85E | 9704 | CA5E | 2104 | CB5F |
| 0000322540 | 2404 | E35F | 2F04 | E45F | 3F04 | E85F | 4504 | F05F |
| 0000322560 | 4F04 | F25F | 5304 | F45F | 5E04 | F85F | 6A04 | F95F |
| 0000322600 | 9A04 | FB5F | C804 | FC5F | E404 | FD5F | F304 | 005F |
| 0000322620 | F605 | 015F | 0205 | 0260 | 1305 | 0360 | 4105 | 0460 |
| 0000322640 | 5805 | 0560 | 6705 | 0860 | 6A05 | 0960 | 7605 | 0A60 |
| 0000322660 | 8705 | 0C60 | B505 | 0D60 | D205 | 0E60 | E105 | 1060 |
| 0000322700 | ED05 | 1460 | F905 | 1560 | 3A05 | 1861 | 3D05 | 1961 |
| 0000322720 | 4905 | 1A61 | 5B05 | 1C61 | 8905 | 1D61 | A605 | 1E61 |
| 0000322740 | B505 | 1F61 | C105 | 2061 | DA05 | 2161 | FE05 | 2261 |
| 0000322760 | 1505 | 2562 | 1805 | 2662 | 2405 | 2762 | 3505 | 2962 |
| 0000323000 | 6305 | 2B62 | 7A05 | 2C62 | 9305 | 2F62 | B305 | 3062 |
| 0000323020 | D705 | 3162 | E605 | 3262 | F605 | 3462 | 0C05 | 3563 |
| 0000323040 | 1805 | 3C63 | 3205 | 3E63 | 9105 | 3F63 | A405 | 4163 |
| 0000323060 | A705 | 4363 | 0505 | 4D64 | 1005 | 5264 | 2005 | 5364 |
| 0000323100 | 3005 | 5564 | 3A05 | 5764 | 4605 | 5864 | 5505 | 5A64 |
| 0000323120 | 5E05 | 5B64 | 7205 | 5C64 | 8F05 | 5D64 | A005 | 5F64 |
| 0000323140 | A305 | 6964 | AE05 | 6F64 | BE05 | 7264 | E505 | 7364 |

THU MAR 14 17:21:24 1991 CLIENT.EXE PAGE 109, LINE 6373

| | | | | | | | | |
|---|---|---|---|---|---|---|---|---|
| 0000323160 | F405 | 7564 | 0105 | 7665 | 1505 | 7765 | 2405 | 7865 |
| 0000323200 | 3805 | 7965 | 3B05 | 7B65 | 5505 | 7C65 | 6205 | 7D65 |
| 0000323220 | 7105 | 7E65 | 8505 | 7F65 | 8805 | 8165 | A205 | 8265 |
| 0000323240 | AF05 | 8365 | B205 | 9965 | BD05 | 9A65 | CD05 | 9B65 |
| 0000323260 | D205 | 9C65 | D705 | 9D65 | DF05 | 9E65 | E705 | A565 |
| 0000323300 | EC05 | A765 | F705 | A865 | 0305 | A966 | 1305 | AA66 |
| 0000323320 | 2905 | AB66 | 5705 | AC66 | 6805 | AD66 | 7305 | AE66 |
| 0000323340 | 7F05 | B166 | 8205 | B266 | 9905 | B466 | A505 | B666 |
| 0000323360 | BC05 | B766 | DF05 | B866 | ED05 | BB66 | F005 | BC66 |
| 0000323400 | FC05 | BD66 | 0D05 | BE67 | 1E05 | BF67 | 4C05 | C067 |
| 0000323420 | 5D05 | C167 | 6805 | C267 | 7405 | C567 | 7705 | C667 |
| 0000323440 | 8E05 | C867 | 9A05 | C967 | AE05 | CA67 | BD05 | CB67 |
| 0000323460 | CB05 | CE67 | CE05 | CF67 | DA05 | D067 | EB05 | D267 |
| 0000323500 | 1905 | D368 | 3205 | D468 | 4105 | D668 | 4D05 | D868 |
| 0000323520 | 5B05 | D968 | 6E05 | DC68 | 7105 | DD68 | 7D05 | DE68 |
| 0000323540 | 8E05 | DF68 | BC05 | E068 | D005 | E168 | DF05 | E468 |
| 0000323560 | E205 | E568 | EE05 | E668 | FF05 | E768 | 1A05 | E869 |
| 0000323600 | 2C05 | E969 | 3805 | EA69 | 4E05 | EB69 | 7005 | EC69 |
| 0000323620 | 8305 | EF69 | 8605 | F069 | 9205 | F169 | A305 | F369 |
| 0000323640 | B905 | F469 | CED5 | F669 | DA05 | F869 | 4105 | 0E6A |
| 0000323660 | 4C06 | 0F6A | 5C06 | 106A | 6206 | 116A | 6C06 | 136A |
| 0000323700 | 7406 | 146A | 7E06 | 206A | 8606 | 226A | 9106 | 236A |
| 0000323720 | 9D06 | 246A | AD06 | 256A | BF06 | 266A | ED06 | 276A |
| 0000323740 | FA06 | 286A | 0706 | 296B | 1306 | 2B6B | 1606 | 2C6B |
| 0000323760 | 2706 | 2D6B | 3106 | 2F6B | 3B06 | 306B | 4D06 | 326B |
| 0000324000 | 5706 | 336B | 6D06 | 346B | 7606 | 356B | 8506 | 386B |
| 0000324020 | 8806 | 396B | 9A06 | 3B6B | 9D06 | 3D6B | A906 | 3F6B |
| 0000324040 | C306 | 406B | E806 | 416B | 0906 | 476C | 0C06 | 486C |
| 0000324060 | 1806 | 496C | 2806 | 4B6C | 5606 | 4C6C | 7006 | 4D6C |
| 0000324100 | 7F06 | 526C | 8B06 | 546C | BD06 | 556C | DB06 | 586C |
| 0000324120 | FE06 | 5A6C | 1806 | 5B6D | 2406 | 5C6D | 5206 | 5E6D |
| 0000324140 | 6F06 | 5F6D | 8106 | 636D | 8806 | 646D | A006 | 686D |
| 0000324160 | A306 | 696D | BB06 | 6E6D | BE06 | 6F6D | DE06 | 706D |
| 0000324200 | ED06 | 716D | F906 | 786D | 0506 | 796E | 4606 | 7E6E |
| 0000324220 | 4906 | 806E | 6A06 | 826E | 7906 | 836E | 8F06 | 8A6E |
| 0000324240 | A906 | 8C6E | 0806 | 8D6F | 1B06 | 8F6F | 1E06 | 916F |
| 0000324260 | 6C06 | 926F | 7806 | 936F | A606 | 946F | C306 | 986F |
| 0000324300 | C606 | 9A6F | F806 | 9C6F | 1606 | 9F70 | 3906 | A070 |
| 0000324320 | 5A06 | A370 | 5D06 | A470 | 6906 | A570 | 7906 | A670 |
| 0000324340 | A706 | A770 | BB06 | A870 | CA06 | AB70 | CD06 | AC70 |
| 0000324360 | E606 | AD70 | F506 | AE70 | 0106 | AF71 | 1A06 | B071 |
| 0000324400 | 3F06 | B171 | 5606 | B371 | 5906 | B571 | B406 | C171 |
| 0000324420 | BF06 | C571 | CF06 | C671 | E806 | C771 | F106 | CA71 |
| 0000324440 | FA06 | CB71 | 0B06 | CC72 | 1F06 | CD72 | 4006 | CE72 |
| 0000324460 | 5106 | D172 | 5406 | D272 | 6506 | D372 | 7906 | D472 |
| 0000324500 | 9A06 | D572 | AB06 | D872 | AE06 | D972 | BF06 | DA72 |
| 0000324520 | D306 | DB72 | F406 | DC72 | 0506 | DE73 | 0806 | EC73 |
| 0000324540 | 1306 | F373 | 2306 | F573 | 5606 | F673 | 5F06 | F973 |
| 0000324560 | 6206 | FA73 | 7306 | FB73 | 8706 | FC73 | 9806 | FD73 |
| 0000324600 | B206 | FE73 | B506 | 0173 | C107 | 0273 | D207 | 0373 |
| 0000324620 | E607 | 0473 | FA07 | 0573 | 1107 | 0674 | 1407 | 0974 |
| 0000324640 | 2007 | 0A74 | 3107 | 0B74 | 4507 | 0C74 | 5907 | 0D74 |
| 0000324660 | 6A07 | 0E74 | 6D07 | 1074 | 7907 | 2674 | 8407 | 2974 |
| 0000324700 | 9407 | 2C74 | 9A07 | 3274 | A407 | 3474 | A807 | 3674 |
| 0000324720 | B307 | 3874 | BF07 | 3974 | E207 | 3B74 | 1007 | 3C75 |
| 0000324740 | 2707 | 3D75 | 3107 | 3E75 | 4107 | 4175 | 4407 | 4475 |
| 0000324760 | 5907 | 4575 | 7307 | 4675 | 8307 | 4775 | 9007 | 4A75 |
| 0000325000 | 9307 | 4B75 | 9F07 | 4C75 | B007 | 4D75 | DE07 | 4E75 |
| 0000325020 | F107 | 4F75 | 0107 | 5476 | 0407 | 5576 | 1007 | 5676 |

THU MAR 14 17:21:24 1991 CLIENT.EXE PAGE 110, LINE 6432

| | | | | | | | | |
|---|---|---|---|---|---|---|---|---|
| 0000325040 | 2107 | 5876 | 4F07 | 5A76 | 6907 | 5B76 | 8207 | 5C76 |
| 0000325060 | 9207 | 5E76 | 9F07 | 5F76 | B107 | 6176 | BE07 | 6376 |
| 0000325100 | C107 | 6476 | DA07 | 6576 | EA07 | 6776 | F707 | 6976 |
| 0000325120 | 0707 | 6C77 | 0A07 | 6D77 | 1607 | 6E77 | 2807 | 7077 |
| 0000325140 | 5607 | 7277 | 7407 | 7377 | 8407 | 7577 | 9107 | 7677 |
| 0000325160 | AB07 | 7777 | CF07 | 7877 | E607 | 7A77 | E907 | 7C77 |
| 0000325200 | 4507 | 0078 | 6C0B | 696C | 6362 | 746D | 6C2E | 6269 |
| 0000325220 | 6F07 | 3273 | 6C2E | 6269 | 6409 | 5F62 | 6970 | 6C2E |
| 0000325240 | 6269 | 6C0A | 6962 | 6D70 | 2E74 | 696C | E162 | 0100 |
| 0000325260 | 0101 | 0800 | 0000 | 1E00 | 0200 | 0101 | BC00 | 000A |
| 0000325300 | BC00 | 0300 | 0101 | 5F00 | 001A | 3200 | 0412 | 0101 |
| 0000325320 | 1900 | 0043 | E800 | 0908 | 0101 | 2A00 | 0059 | D500 |
| 0000325340 | 0109 | 0201 | 2600 | 0000 | 2000 | 0200 | 0201 | 7800 |
| 0000325360 | 000B | 8400 | 0300 | 0201 | 9100 | 002C | 8800 | 0416 |
| 0000325400 | 0201 | 0100 | 004C | 2900 | 090D | 0201 | FF00 | 0062 |
| 0000325420 | A300 | 010D | 0301 | 4600 | 0000 | 1900 | 0200 | 0301 |
| 0000325440 | FC00 | 000B | 5100 | 0101 | 0401 | 5F00 | 0000 | 1600 |
| 0000325460 | 0200 | 0401 | 4D00 | 000D | 0F00 | 0100 | 0501 | 7500 |
| 0000325500 | 0000 | 1500 | 0200 | 0501 | 5C00 | 000D | 0E00 | 0100 |
| 0000325520 | 0601 | 8A00 | 0000 | 1400 | 0200 | 0601 | 6A00 | 000D |
| 0000325540 | 0D00 | 0100 | 0701 | 9E00 | 0000 | 1400 | 0200 | 0701 |
| 0000325560 | 7700 | 000D | 3700 | 0100 | 0801 | B200 | 0000 | 1500 |
| 0000325600 | 0200 | 0801 | AE00 | 000D | 3000 | 0100 | 0901 | C700 |
| 0000325620 | 0000 | 1700 | 0200 | 0901 | DE00 | 000D | 1F00 | 0100 |
| 0000325640 | 0A01 | DE00 | 0000 | 1500 | 0200 | 0A01 | FD00 | 000D |
| 0000325660 | 1B00 | 0100 | 0B01 | F300 | 0000 | 1700 | 0200 | 0B01 |
| 0000325700 | 1800 | 000E | 0E00 | 0100 | 0C01 | 0A00 | 0001 | 1700 |
| 0000325720 | 0200 | 0C01 | 2600 | 000E | 0E00 | 0100 | 0D01 | 2100 |
| 0000325740 | 0001 | 1700 | 0200 | 0D01 | 3400 | 000E | 0E00 | 0100 |
| 0000325760 | 0F01 | 3800 | 0001 | 1500 | 0200 | 0FC1 | 4200 | 000E |
| 0000326000 | 0C00 | 0100 | 1001 | 4D00 | 0001 | 1600 | 0200 | 1001 |
| 0000326020 | 4E00 | 000E | 0F00 | 0100 | 1101 | 6300 | 0001 | 1700 |
| 0000326040 | 0200 | 1101 | 5D00 | 000E | 0E00 | 0100 | 1201 | 7A00 |
| 0000326060 | 0001 | 1400 | 0200 | 1201 | 6B00 | 000E | 0D00 | 0100 |
| 0000326100 | 1301 | 8E00 | 0001 | 1800 | 0200 | 1301 | 7800 | 000E |
| 0000326120 | 0E00 | 0100 | 1401 | A600 | 0001 | 1800 | 0200 | 1401 |
| 0000326140 | 8600 | 000E | 0E00 | 0100 | 1501 | BE00 | 0001 | 1500 |
| 0000326160 | 0200 | 1501 | 9400 | 000E | 0E00 | 0100 | 1601 | D300 |
| 0000326200 | 0001 | 1500 | 0200 | 1601 | A200 | 000E | 0F00 | 0100 |
| 0000326220 | 1701 | E800 | 0001 | 1500 | 0200 | 1701 | B100 | 000E |
| 0000326240 | 1F00 | 0100 | 1801 | FD00 | 0001 | 2300 | 0200 | 1801 |
| 0000326260 | D000 | 000E | 7500 | 0100 | 1901 | 2000 | 0002 | 1E00 |
| 0000326300 | 0200 | 1901 | 4500 | 000F | 1C00 | 0100 | 1A01 | 3E00 |
| 0000326320 | 0002 | 2000 | 0200 | 1A01 | 6100 | 000F | 1000 | 0100 |
| 0000326340 | 1B01 | 5E00 | 0002 | 1C00 | 0200 | 1B01 | 7100 | 000F |
| 0000326360 | C100 | 0101 | 1C01 | 7A00 | 0002 | 1C00 | 0200 | 1C01 |
| 0000326400 | 3200 | 0011 | 3500 | 0100 | 1D01 | 9600 | 0002 | 1C00 |
| 0000326420 | 0200 | 1D01 | 6700 | 0011 | 1000 | 0100 | 1E01 | B200 |
| 0000326440 | 0002 | 1C00 | 0200 | 1E01 | 7700 | 0011 | 1000 | 0100 |
| 0000326460 | 1F01 | CE00 | 0002 | 1C00 | 0200 | 1F01 | 8700 | 0011 |
| 0000326500 | 2500 | 0100 | 2001 | EA00 | 0002 | 1B00 | 0200 | 2001 |
| 0000326520 | AC00 | 0011 | 3F00 | 0100 | 2101 | 0500 | 0003 | 1800 |
| 0000326540 | 0200 | 2101 | EB00 | 0011 | 0F00 | 0100 | 2201 | 1D00 |
| 0000326560 | 0003 | 1800 | 0200 | 2201 | FA00 | 0011 | 0F00 | 0100 |
| 0000326600 | 2301 | 3500 | 0003 | 1800 | 0200 | 2301 | 0900 | 0012 |
| 0000326620 | 1C00 | 0100 | 2401 | 4D00 | 0003 | 1400 | 0200 | 2401 |
| 0000326640 | 2500 | 0012 | 0E00 | 0100 | 2501 | 6100 | 0003 | 1700 |
| 0000326660 | 0200 | 2501 | 3300 | 0012 | 0F00 | 0100 | 2601 | 7800 |
| 0000326700 | 0003 | 1600 | 0200 | 2601 | 4200 | 0012 | 1E00 | 0100 |

THU MAR 14 17:21:24 1991 CLIENT.EXE PAGE 111, LINE 6491

| | | | | | | | | |
|---|---|---|---|---|---|---|---|---|
| 0000326720 | 2701 | 8E00 | 0003 | 1800 | 0200 | 2701 | 6000 | 0012 |
| 0000326740 | 4200 | 0100 | 2801 | A600 | 0003 | 1900 | 0200 | 2801 |
| 0000326760 | A200 | 0012 | 5600 | 0100 | 2901 | BF00 | 0003 | 1500 |
| 0000327000 | 0200 | 2901 | F800 | 0012 | 0E00 | 0100 | 2B01 | D400 |
| 0000327020 | 0003 | 1A00 | 0200 | 2B01 | 0600 | 0013 | 9B00 | 0100 |
| 0000327040 | 2C01 | EE00 | 0003 | 1600 | 0200 | 2C01 | A100 | 0013 |
| 0000327060 | 0F00 | 0100 | 2D01 | 0400 | 0004 | 1700 | 0200 | 2D01 |
| 0000327100 | B000 | 0013 | 1100 | 0100 | 2E01 | 1B00 | 0004 | 1A00 |
| 0000327120 | 0200 | 2E01 | C100 | 0013 | 0F00 | 0100 | 2F01 | 3500 |
| 0000327140 | 0004 | 1700 | 0200 | 2F01 | D000 | 0013 | 1000 | 0100 |
| 0000327160 | 3001 | 4C00 | 0004 | 1B00 | 0200 | 3001 | E000 | 0013 |
| 0000327200 | 0E00 | 0100 | 3101 | 6700 | 0004 | 1900 | 0200 | 3101 |
| 0000327220 | EE00 | 0013 | 7F00 | 0100 | 3201 | 8000 | 0004 | 1E00 |
| 0000327240 | 0200 | 3201 | [illegible]D00 | 0014 | 1100 | 0100 | 3301 | 9E00 |
| 0000327260 | 0004 | 1B00 | 0200 | 3301 | 7E00 | 0014 | 3C00 | 0100 |
| 0000327300 | 3401 | B900 | 0004 | 2B00 | 0200 | 3401 | BA00 | 0014 |
| 0000327320 | 6300 | 0100 | 3501 | E400 | 0004 | 1700 | 0200 | 3501 |
| 0000327340 | 1D00 | 0015 | 0F00 | 0100 | 3601 | FB00 | 0004 | 1700 |
| 0000327360 | 0200 | 3601 | 2C00 | 0015 | 3300 | 0100 | 3701 | 1200 |
| 0000327400 | 0005 | 1700 | 0200 | 3701 | 5F00 | 0015 | 2400 | 0100 |
| 0000327420 | 3801 | 2900 | 0005 | 1D00 | 0200 | 3801 | 8300 | 0015 |
| 0000327440 | 1100 | 0100 | 3901 | 4600 | 0005 | 1800 | 0200 | 3901 |
| 0000327460 | 9400 | 0015 | 0F00 | 0100 | 3A01 | 5E00 | 0005 | 1800 |
| 0000327500 | 0200 | 3A01 | A300 | 0015 | 0F00 | 0100 | 3B01 | 7600 |
| 0000327520 | 0005 | 1500 | 0200 | 3B01 | B200 | 0015 | 2000 | 0100 |
| 0000327540 | 3C01 | 8B00 | 0005 | 1A00 | 0200 | 3C01 | D200 | 0015 |
| 0000327560 | 1E00 | 0100 | 3D01 | A500 | 0005 | 1900 | 0200 | 3D01 |
| 0000327600 | F000 | 0015 | 0C00 | 0100 | 3E01 | BE00 | 0005 | 1900 |
| 0000327620 | 0200 | 3E01 | FC00 | 0015 | 1200 | 0100 | 3F01 | D700 |
| 0000327640 | 0005 | 1600 | 0200 | 3F01 | 0E00 | 0016 | 0E00 | 0100 |
| 0000327660 | 4001 | ED00 | 0005 | 1900 | 0200 | 4001 | 1C00 | 0016 |
| 0000327700 | 1200 | 0100 | 4101 | 0600 | 0006 | 1800 | 0200 | 4101 |
| 0000327720 | 2E00 | 0016 | 4100 | 0100 | 4201 | 1E00 | 0006 | 1700 |
| 0000327740 | 0200 | 4201 | 6F00 | 0016 | 0F00 | 0100 | 4301 | 3500 |
| 0000327760 | 0006 | 1800 | 0200 | 4301 | 7E00 | 0016 | 0F00 | 0100 |
| 0000330000 | 4401 | 4D00 | 0006 | 1300 | 0200 | 4401 | 8D00 | 0016 |
| 0000330020 | 0B00 | 0100 | 4501 | 6000 | 0006 | 1700 | 0200 | 4501 |
| 0000330040 | 9800 | 0016 | 1000 | 0100 | 4601 | 7700 | 0006 | 1600 |
| 0000330060 | 0200 | 4601 | A800 | 0016 | 1D00 | 0100 | 4701 | 8D00 |
| 0000330100 | 0006 | 1D00 | 0200 | 4701 | C500 | 0016 | 2400 | 0100 |
| 0000330120 | 4801 | AA00 | 0006 | 1500 | 0200 | 4801 | E900 | 0016 |
| 0000330140 | 0E00 | 0100 | 4901 | BF00 | 0006 | 1400 | 0200 | 4901 |
| 0000330160 | F700 | 0016 | 2C00 | 0100 | 4A01 | D300 | 0006 | 1600 |
| 0000330200 | 0200 | 4A01 | 2300 | 0017 | 4E00 | 0100 | 4B01 | E900 |
| 0000330220 | 0006 | 1700 | 0200 | 4B01 | 7100 | 0017 | 0E00 | 0100 |
| 0000330240 | 4C01 | 0000 | 0007 | 1800 | 0200 | 4C01 | 7F00 | 0017 |
| 0000330260 | 1E00 | 0100 | 4D01 | 1800 | 0007 | 1800 | 0200 | 4D01 |
| 0000330300 | 9D00 | 0017 | 0F00 | 0100 | 4E01 | 3000 | 0007 | 1800 |
| 0000330320 | 0200 | 4E01 | AC00 | 0017 | 0F00 | 0100 | 4F01 | 4800 |
| 0000330340 | 0007 | 1600 | 0200 | 4F01 | BB00 | 0017 | 1000 | 0100 |
| 0000330360 | 5001 | 5E00 | 0007 | 1C00 | 0200 | 5001 | CB00 | 0017 |
| 0000330400 | 1000 | 0100 | 5101 | 7A00 | 0007 | 1700 | 0200 | 5101 |
| 0000330420 | DB00 | 0017 | 1200 | 0100 | 5201 | 9100 | 0007 | 1A00 |
| 0000330440 | 0200 | 5201 | ED00 | 0017 | 1000 | 0100 | 5301 | AB00 |
| 0000330460 | 0007 | 1C00 | 0200 | 5301 | FD00 | 0017 | 2200 | 0100 |
| 0000330500 | 5401 | C700 | 0007 | 1600 | 0200 | 5401 | 1F00 | 0018 |
| 0000330520 | 2300 | 0100 | 5501 | DD00 | 0007 | 1600 | 0200 | 5501 |
| 0000330540 | 4200 | 0018 | 1100 | 0100 | 5601 | F300 | 0007 | 2400 |
| 0000330560 | 0200 | 5601 | 5300 | 0018 | 1200 | 0100 | 5701 | 1700 |

THU MAR 14 17:21:24 1991 CLIENT.EXE PAGE 112, LINE 6550

| | | | | | | | | |
|---|---|---|---|---|---|---|---|---|
| 0000330600 | 0008 | 1D00 | 0200 | 5701 | 6500 | 0018 | 1000 | 0100 |
| 0000330620 | 5801 | 3400 | 0008 | 1B00 | 0200 | 5801 | 7500 | 0018 |
| 0000330640 | 0E00 | 0100 | 5901 | 4F00 | 0008 | 2700 | 0200 | 5901 |
| 0000330660 | 8300 | 0018 | 2700 | 0100 | 5A01 | 7600 | 0008 | 1800 |
| 0000330700 | 0200 | 5A01 | AA00 | 0018 | 1000 | 0100 | 5B01 | 8E00 |
| 0000330720 | 0008 | 1800 | 0200 | 5B01 | BA00 | 0018 | 1000 | 0100 |
| 0000330740 | 5C01 | A600 | 0008 | 1800 | 0200 | 5C01 | CA00 | 0018 |
| 0000330760 | 0F00 | 0100 | 5D01 | BE00 | 0008 | 1500 | 0200 | 5D01 |
| 0000331000 | D900 | 0018 | 0C00 | 0100 | 5E01 | D300 | 0008 | 1A00 |
| 0000331020 | 0200 | 5E01 | E500 | 0018 | 1100 | 0100 | 5F01 | ED00 |
| 0000331040 | 0008 | 1300 | 0200 | 5F01 | F600 | 0018 | 1C00 | 0100 |
| 0000331060 | 6001 | 0000 | 0009 | 1700 | 0200 | 6001 | 1200 | 0019 |
| 0000331100 | 1100 | 0100 | 6101 | 1700 | 0009 | 1900 | 0200 | 6101 |
| 0000331120 | 2300 | 0019 | 1E00 | 0100 | 6201 | 3000 | 0009 | 1600 |
| 0000331140 | 0200 | 6201 | 4100 | 0019 | 1100 | 0100 | 6301 | 4600 |
| 0000331160 | 0009 | 1500 | 0200 | 6301 | 5200 | 0019 | 0F00 | 0100 |
| 0000331200 | 6401 | 5B00 | 0009 | 1500 | 0200 | 6401 | 6100 | 0019 |
| 0000331220 | 0F00 | 0100 | 6501 | 7000 | 0009 | 1600 | 0200 | 6501 |
| 0000331240 | 7000 | 0019 | 1000 | 0100 | 6601 | 8600 | 0009 | 1600 |
| 0000331260 | 0200 | 6601 | 8000 | 0019 | 1000 | 0100 | 6701 | 9C00 |
| 0000331300 | 0009 | 2300 | 0200 | 6701 | 9000 | 0019 | 1100 | 0100 |
| 0000331320 | 6801 | BF00 | 0009 | 2300 | 0200 | 6801 | A100 | 0019 |
| 0000331340 | 2A00 | 0100 | 6901 | E200 | 0009 | 2500 | 0200 | 6901 |
| 0000331360 | CB00 | 0019 | 1300 | 0100 | 6A01 | 0700 | 000A | 1C00 |
| 0000331400 | 0200 | 6A01 | DE00 | 0019 | 1F00 | 0100 | 6B01 | 2300 |
| 0000331420 | 000A | 1500 | 0200 | 6B01 | FD00 | 0019 | 0E00 | 0100 |
| 0000331440 | 6C01 | 3800 | 000A | 1A00 | 0200 | 6C01 | 0B00 | 001A |
| 0000331460 | 2100 | 0100 | 6D01 | 5200 | 000A | 2300 | 0200 | 6D01 |
| 0000331500 | 2C00 | 001A | 1000 | 0100 | 6E01 | 7500 | 000A | 2300 |
| 0000331520 | 0200 | 6E01 | 3C00 | 001A | 1100 | 0100 | 6F01 | 9800 |
| 0000331540 | 000A | 2400 | 0200 | 6F01 | 4D00 | 001A | 1200 | 0600 |
| 0000331560 | 0001 | A200 | 0070 | 2A00 | 4E00 | 3042 | A032 | 0079 |
| 0000331600 | 0000 | | | | | | | |
| 0000331601 | | | | | | | | |

THU MAR 14 17:22:14 1991 CRV.EXE PAGE 1, LINE 1

```
0000000000  5A4D  015C  0032  0000  0004  0000  FFFF  0000
0000000020  00B6  0000  0000  0000  0040  0000  0000  0000
0000000040  0000  0000  0000  0000  0000  0000  0000  0000
0000000060  0000  0000  0000  0000  0000  0000  0080  0000
0000000100  1F0E  0EBA  B400  CD09  B821  4C01  21CD  6854
0000000120  7369  7020  6F72  7267  6D61  6320  6E61  6F6E
0000000140  2074  7572  206E  6E69  4420  534F  6D20  646F
0000000160  2E65  0D0D  240A  0000  0000  0000  0000  0000
0000000200  454E  0A05  0128  0002  ACF0  9CBF  020A  0005
0000000220  4000  6000  0010  0001  0000  0005  0005  0006
0000000240  0028  0040  0068  0068  006F  007B  01AA  0000
0000000260  0000  0004  0000  0001  0000  0000  0000  0000
0000000300  001E  4E5B  0D00  4E5C  0550  00C6  0C01  0100
0000000320  0000  0000  0C01  0850  0000  0000  0C01  0222
0000000340  055D  0D62  0D01  1060  4303  5652  0000  0100
0000000360  0A00  1000  1800  2000  2800  0000  4408  534F
0000000400  4143  4C4C  0553  4244  505F  0749  7263  5F76
0000000420  7069  0773  7263  5F76  6E6F  0773  7263  5F76
0000000440  7473  0669  626C  7069  746D  5F0D  5842  445F
0000000460  4245  4755  4F4D  4544  5F0D  5842  545F  4D49
0000000500  5345  4F4D  4544  5F09  5842  425F  535F  4749
0000000520  5F0E  5842  445F  4245  4755  4E45  4554  0F52
0000000540  425F  5F58  4544  5542  5247  5445  5255  0E4E
0000000560  425F  5F58  4F56  4449  4552  5554  4E52  5F0E
0000000600  5842  445F  4245  4755  5250  4E49  0B54  425F
0000000620  5F58  5250  434F  5345  0E53  425F  5F58  4150
0000000640  4B43  4946  544C  5245  0000  5424  5345  3154
0000000660  3332  4320  5652  4D20  646F  6C75  2065  4328
0000000700  2029  654D  6372  7275  2C79  3120  3939  0030
0000000720  0000  0000  0000  0000  0000  0000  0000  0000
*
0000000760  A3FC  0044  1E89  0042  8949  4E0E  BB00  0050
0000001000  1F8C  E483  89FE  0467  FEB8  50FF  6789  F70A
0000001020  50D0  6789  8906  0867  2689  0046  681E  0048
0000001040  681E  004C  FF9A  D0FF  8E00  4806  2600  15A1
0000001060  A300  0086  46EB  9A00  02E0  FFFF  689A  5A04
0000001100  9A00  00EA  005F  36FF  0294  36FF  0292  36FF
0000001120  0290  36FF  028E  36FF  028C  E19A  6433  5000
0000001140  E80E  00FE  FFB8  8EFF  B8D8  0003  0E50  03E8
0000001160  0E02  A7E8  B804  00FF  0E50  ECE8  BB00  000D
0000001200  FF33  068E  C044  FFB9  267F  3D80  7500  4701
0000001220  8026  003D  3174  64BE  8B00  8BD1  F3CB  8BA6
0000001240  74CA  3308  F2C0  74AE  EBE7  061C  071E  F78B
0000001260  BF1F  008C  2CAC  7241  C00E  04E0  AC92  412C
0000001300  0572  C20A  EBAA  16ED  C31F  286A  FF9A  00FF
0000001320  BB00  0002  8B52  80D4  8CA7  B700  8B50  53C4
0000001340  5016  5216  FF9A  00FF  0B00  58C0  1075  40B1
0000001360  013C  0674  023C  0675  08B1  8F08  008C  794B
0000001400  5AD6  C033  5050  DC8B  BA50  0084  520E  5316
0000001420  FF9A  00FF  5800  E858  0013  E6BE  BF0B  0BE6
0000001440  3DE8  BE01  0BE6  EABF  E80B  0134  8BCB  DC0E
0000001460  E30B  8B2E  4436  C400  DE06  8C0B  33C2  FFDB
0000001500  DA1E  730B  E903  014E  068E  004C  8B26  061E
0000001520  4B00  0D75  06C4  0BE2  C28C  03BB  FF00  DA1E
0000001540  C30B  8B55  33EC  EBC9  551A  EC8B  01B9  EBD0
0000001560  5512  EC8B  5756  00B9  EB01  5508  EC8B  5756
0000001600  01B9  E801  005F  0A51  75C9  BE12  1052  52BF
0000001620  E810  00CC  EABE  BF0B  0BEE  C3E8  BE00  0BEE
0000001640  EEBF  E80B  00BA  EEBE  BF0B  0BEE  B1E8  9A00
```

THU MAR 14 17:22:14 1991 CRV.EXE PAGE 2, LINE 60

| | | | | | | | | |
|---|---|---|---|---|---|---|---|---|
| 0000001660 | 02BC | 007D | C00B | 1174 | 0A58 | 50E4 | 0B75 | 7E83 |
| 0000001700 | 0006 | 0575 | 46C7 | FF06 | E800 | 0086 | 0A58 | 75E4 |
| 0000001720 | B80D | 0001 | 8A50 | 0646 | 9A50 | FFFF | 0000 | 4EE8 |
| 0000001740 | 5F00 | 5D5E | 55CB | EC8B | 0D6A | 8BE8 | 8306 | 02C4 |
| 0000001760 | 068E | 004C | 8B26 | 061E | 4B00 | 168B | 029C | FA83 |
| 0000002000 | 75FF | 8904 | 9C1E | 3902 | 9C1E | 9F02 | 0D6A | 8DE8 |
| 0000002020 | 8306 | 02C4 | 749E | 6A0A | E80E | 063C | C483 | EB02 |
| 0000002040 | 3BC7 | 74D3 | 6A08 | E80E | 064E | C483 | 5D02 | 55C3 |
| 0000002060 | EC8B | 0D6A | 41E8 | 8306 | 02C4 | 06C7 | 029C | FFFF |
| 0000002100 | 0D6A | 59E8 | 8306 | 02C4 | 0E6A | 51E8 | 8306 | 02C4 |
| 0000002120 | C35D | 0E8B | 0BDC | 07E3 | 02BB | FF00 | DA1E | C30B |
| 0000002140 | F73B | 0E73 | EF83 | 8B04 | 0B05 | 0245 | F274 | 1DFF |
| 0000002160 | EEEB | 00C3 | 8B55 | B8EC | 00FC | 0E50 | 9DE8 | 8302 |
| 0000002200 | A03E | 0002 | 0474 | 1EFF | 029E | FFB8 | 5000 | E80E |
| 0000002220 | 028A | E58B | CB5D | 02B8 | E900 | FDD0 | 3356 | B9F6 |
| 0000002240 | 0042 | E432 | ACFC | E032 | FBE2 | F480 | 7455 | 0E0F |
| 0000002260 | C1E8 | B8FF | 0001 | 0E50 | 61E8 | B802 | 0001 | CB5E |
| 0000002300 | 068F | 02A4 | 068F | 02A6 | 42A1 | 8E00 | 441E | 8B00 |
| 0000002320 | 4EF0 | 0674 | 7C80 | 00FF | F775 | 8936 | 9636 | 3602 |
| 0000002340 | 1E8C | 0298 | F696 | FF04 | 0175 | 3696 | 3689 | 02A2 |
| 0000002360 | D233 | 01BF | AC00 | 0A42 | 75C0 | ACFA | 203C | FB74 |
| 0000002400 | 093C | F774 | C00A | 6374 | 4E47 | 3CAC | 7420 | 3CEC |
| 0000002420 | 7409 | 0AE8 | 74C0 | 3C54 | 7422 | 3C24 | 745C | 4203 |
| 0000002440 | E8EB | C933 | AC41 | 5C3C | FA74 | 223C | 0474 | D103 |
| 0000002460 | D7EB | C18B | E9D1 | D113 | 01A8 | CE75 | 01EB | AC4E |
| 0000002500 | C00A | 2774 | 223C | C274 | 5C3C | 0374 | EB42 | 33F0 |
| 0000002520 | 41C9 | 3CAC | 745C | 3CFA | 7422 | 0304 | EBD1 | 8BDF |
| 0000002540 | D1C1 | 13E9 | A8D1 | 7501 | EBD6 | 169F | 891F | 8C3E |
| 0000002560 | 0302 | 47D7 | E7D1 | E7D1 | C78B | C203 | 2440 | E8FE |
| 0000002600 | 01D0 | 0673 | 08B8 | E900 | FCE2 | 8EA3 | 8902 | 9016 |
| 0000002620 | 8B02 | 03D8 | 8EF8 | 26C2 | 3F89 | 8C26 | 0247 | C383 |
| 0000002640 | 8B04 | A236 | 8E02 | 441E | AC00 | 0AAA | 75C0 | EBFA |
| 0000002660 | 3303 | AAC0 | 3CAC | 7420 | 3CFB | 7409 | 0AF7 | 74C0 |
| 0000002700 | 2675 | 3F89 | 8C26 | 0247 | C383 | 4E04 | 3CAC | 7420 |
| 0000002720 | 3CE0 | 7409 | 0ADC | 74C0 | 3C5A | 7422 | 3C27 | 745C |
| 0000002740 | AA03 | E8EB | C933 | AC41 | 5C3C | FA74 | 223C | 0674 |
| 0000002760 | 5CB0 | AAF3 | D5EB | 5CB0 | E9D1 | AAF3 | 0673 | 22B0 |
| 0000003000 | EBAA | 4EC9 | 0AAC | 74C0 | 3C2A | 7422 | 3CBF | 745C |
| 0000003020 | AA03 | F0EB | C933 | AC41 | 5C3C | FA74 | 223C | 0674 |
| 0000003040 | 5CB0 | AAF3 | DDEB | 5CB0 | E9D1 | AAF3 | 9E73 | 22B0 |
| 0000003060 | EBAA | 33D1 | AAC0 | C726 | 0007 | 2600 | 47C7 | 0002 |
| 0000003100 | 1600 | FF1F | A42E | 0002 | 8B55 | 83EC | 08EC | 8E1E |
| 0000003120 | 4406 | 8C00 | FC46 | 5E8C | 33FE | 33C0 | 33F6 | B9FF |
| 0000003140 | FFFF | 3A26 | 7405 | F206 | 46AE | 75AE | 8BFA | 40C7 |
| 0000003160 | FE24 | 8B46 | D1FE | D1E6 | E8E6 | 00D6 | 1772 | 5689 |
| 0000003200 | 50F8 | C68B | CBE8 | 7200 | A30C | 0292 | 1689 | 0294 |
| 0000003220 | 5689 | EBFA | B806 | 0009 | D1E9 | 8BFB | 8BCF | 33D8 |
| 0000003240 | 5FF6 | 1E06 | 1F07 | E349 | 8B35 | 8E04 | FE46 | 3B26 |
| 0000003260 | 6406 | 7500 | 510E | 5756 | 64BF | B900 | 0006 | A7F3 |
| 0000003300 | 5E5F | 8E59 | F846 | 0B74 | 5E8E | 89FA | 8C3F | 0247 |
| 0000003320 | C383 | 8E04 | FC5E | AAAC | C00A | FA75 | CBE2 | 5E8E |
| 0000003340 | 89FA | 890F | 024F | 8B1F | 5DE5 | 00CB | 8B55 | 56EC |
| 0000003360 | B857 | 0085 | D88E | C08E | 568B | BEC6 | 0C00 | 3BAD |
| 0000003400 | 74C2 | 4010 | 7496 | 970C | C033 | FFB9 | F2FF | 8BAE |
| 0000003420 | EBF7 | 96EB | 5E5F | E58B | CA5D | 0002 | 8B55 | 57EC |
| 0000003440 | 76FF | 0E06 | C5E8 | 0BFF | 74C0 | 921F | FA8B | C033 |
| 0000003460 | FFB9 | F2FF | F7AE | 49D1 | 8B50 | BBC4 | 0002 | 1E53 |
| 0000003500 | 5152 | 5016 | FF9A | 00FF | 5B00 | 8B5F | 5DE5 | 02CA |
| 0000003520 | 0000 | 8B55 | 06EC | 00B9 | 8704 | B60E | 5102 | 9A50 |

THU MAR 14 17:22:14 1991 CRV.EXE PAGE 3, LINE 119

| | | | | | | | | |
|---|---|---|---|---|---|---|---|---|
| 0000003540 | 0594 | 01D2 | 8F5B | B606 | 8B02 | DBCA | 75C8 | F901 |
| 0000003560 | 5D07 | 00C3 | B1EA | 8205 | EA05 | 05D0 | 0597 | 8B55 |
| 0000003600 | 56EC | 76C4 | 8C06 | E3C1 | 2605 | 4C80 | 01FE | 5D5E |
| 0000003620 | 55CB | EC8B | 096A | DFE8 | 8302 | 02C4 | 76FF | 0E06 |
| 0000003640 | 0DE8 | 5B00 | 096A | F5E8 | 8302 | 02C4 | E58B | CB5D |
| 0000003660 | 8B55 | 56EC | 8B57 | 064E | F983 | 77E8 | 1E69 | AAA1 |
| 0000003700 | 0B02 | 74C0 | BF48 | 06B8 | 368B | 02B2 | 1EC5 | 02AC |
| 0000003720 | 561E | FF57 | 5FD7 | 735E | 8C2B | C5DA | 0C5F | D63B |
| 0000003740 | EF75 | 1F58 | C41E | AC36 | 2602 | 748B | C512 | A81E |
| 0000003760 | 8C02 | 3BDA | 75D0 | 1FD9 | 811E | 34FF | 7407 | BF0E |
| 0000004000 | 0734 | C4EB | 815E | B8FF | 7406 | EB0F | 070A | BF06 |
| 0000004020 | 02A8 | E1E8 | 7201 | E80E | 007E | 891F | AE16 | 8902 |
| 0000004040 | AC1E | EB02 | 1F04 | C033 | 5F99 | 5D5E | 00CB | 5706 |
| 0000004060 | F88B | FB03 | 7F89 | 4F04 | 2D4F | 0016 | 778D | C714 |
| 0000004100 | FE05 | 89FF | 0A7F | 8948 | 8C04 | 8B1F | 8CC6 | 8EDA |
| 0000004120 | 8DC2 | 067F | ABFC | 47AB | 3347 | ABC0 | ABAB | 5FAB |
| 0000004140 | C307 | 8B26 | 0245 | C00B | 0975 | 8C26 | 025D | 8926 |
| 0000004160 | EB1D | 0614 | C426 | 0875 | 8C26 | 0E5C | 8926 | 0C5C |
| 0000004200 | 478C | 8912 | 1077 | 2607 | 5D8C | 260A | 5D89 | 2608 |
| 0000004220 | 5D8C | 2606 | 5D89 | C304 | 8041 | FEE1 | FC53 | 778B |
| 0000004240 | 8B08 | 0A5F | FF33 | 23EB | C38B | A85B | 7501 | 5342 |
| 0000004260 | 778B | 8B06 | 085F | DE3B | 3674 | 334B | EBFF | 900C |
| 0000004300 | 548D | 3BFE | 73D3 | 03E1 | 72F0 | AD23 | 01A8 | F074 |
| 0000004320 | FE8B | 3B48 | 73C1 | 0323 | 72F0 | 8B13 | ADD0 | 01A8 |
| 0000004340 | DE74 | C203 | 0205 | 8B00 | 89F7 | FE44 | E4EB | C08B |
| 0000004360 | 8B5B | 0647 | 4789 | F908 | 19EB | 895B | FE4C | 0974 |
| 0000004400 | F903 | C12B | 8948 | 2B05 | 03F9 | 89F9 | 087F | C68B |
| 0000004420 | DA8C | C3F8 | 5751 | 47F6 | 0102 | 6674 | B7E8 | 8B00 |
| 0000004440 | 8BFE | A804 | 7401 | 2B03 | 49C8 | 4141 | 778B | 0B04 |
| 0000004460 | 74F6 | 034F | 73CE | 3309 | BAC0 | FFF0 | 33E3 | 42EB |
| 0000004500 | 12B8 | 8E05 | 26C0 | B6A1 | 3D02 | 2000 | 1674 | 00BA |
| 0000004520 | 3B80 | 72D0 | D106 | 75EA | EBF8 | 8322 | D8FA | 1D72 |
| 0000004540 | E2D1 | C28B | 8B48 | 03D0 | 73C1 | 3302 | F7C0 | 23D2 |
| 0000004560 | 52C2 | 2EE8 | 5A00 | 0D73 | FA83 | 74F0 | B805 | 0010 |
| 0000004600 | E2EB | EBF9 | 8B1B | 2BD0 | 0457 | 4789 | 8904 | 087F |
| 0000004620 | 778B | 4A0A | 1489 | 0342 | C7F2 | FE04 | 89FF | 0A77 |
| 0000004640 | 595F | 8BC3 | F6D0 | 0247 | 7404 | 4A0F | 778B | 4E04 |
| 0000004660 | D63B | 0572 | 5739 | 73FE | 4218 | 1E50 | FF9A | 00FF |
| 0000004700 | 0B00 | 75C0 | 8B0F | F6C2 | 0247 | 7404 | 4A04 | 5789 |
| 0000004720 | F8FE | 01EB | C3F9 | 8B57 | 0877 | 773B | 750A | 8B03 |
| 0000004740 | 0677 | 3DAD | FFFE | 0874 | FE8B | FE24 | F003 | F2EB |
| 0000004760 | 4F4F | F78B | C35F | D18B | C283 | 8027 | F0E2 | 8B50 |
| 0000005000 | 52C4 | 5016 | C033 | 9A50 | FFFF | 0000 | 0B1F | 75C0 |
| 0000005020 | 3314 | 26DB | 458B | 890C | 0247 | C28B | 0FE8 | E8FE |
| 0000005040 | FE40 | EBF8 | F901 | 00C3 | 8B55 | 50EC | 468B | 0504 |
| 0000005060 | 0014 | 4BEB | 8B55 | 50EC | 468B | 0504 | 0014 | 65EB |
| 0000005100 | 8B55 | 50EC | 468B | 0504 | 0114 | 33EB | 8B55 | 50EC |
| 0000005120 | 468B | 0504 | 0114 | 4DEB | 8B55 | 50EC | 468B | C104 |
| 0000005140 | 02E0 | FF68 | 50FF | FF6A | FF6A | FF9A | 00FF | 0B00 |
| 0000005160 | 75C0 | 5825 | E58B | C35D | 8B55 | 50EC | 468B | C104 |
| 0000005200 | 02E0 | 8368 | 5008 | FF6A | FF6A | FF9A | 00FF | 0B00 |
| 0000005220 | 75C0 | 5805 | E58B | C35D | 11B8 | E900 | F7CE | 8B55 |
| 0000005240 | 50EC | 468B | C104 | 02E0 | A368 | 5008 | FF9A | 00FF |
| 0000005260 | 0B00 | 75C0 | 58E3 | E58B | C35D | 8B55 | FFEC | 0676 |
| 0000005300 | B5E8 | 83FF | 02C4 | E58B | CB5D | 8B55 | FFEC | 0676 |
| 0000005320 | CBE8 | 83FF | 02C4 | E58B | CB5D | 04C8 | 0000 | 46C7 |
| 0000005340 | FFFC | C4FF | 065E | F626 | 0A47 | 7440 | 2607 | 47C6 |
| 0000005360 | 000A | 2CEB | C38B | F42D | B905 | 000C | F799 | 89F9 |
| 0000005400 | FE46 | E850 | FF22 | C483 | FF02 | 0876 | 76FF | 9A06 |

THU MAR 14 17:22:14 1991 CRV.EXE PAGE 4, LINE 178

| | | | | | | | | |
|---|---|---|---|---|---|---|---|---|
| 0000005420 | 0946 | 0960 | C483 | 8904 | FC46 | 76FF | E8FE | FF14 |
| 0000005440 | 468B | C9FC | 90CB | 10C8 | 0000 | 5657 | FFBF | 8BFF |
| 0000005460 | 0676 | 44F6 | 830A | 0375 | 97E9 | 1E00 | 9A56 | 1064 |
| 0000005500 | 0985 | C483 | 8B04 | 8BF8 | 81DE | F4EB | 8B05 | D887 |
| 0000005520 | 8907 | FA46 | 561E | BBE8 | 8304 | 04C4 | 448A | 2A0B |
| 0000005540 | 50E4 | BE9A | A016 | 8309 | 02C4 | C00B | 617C | 7E83 |
| 0000005560 | 00FA | 5E74 | 681E | 05E6 | 468D | 16F0 | 9A50 | 0AB4 |
| 0000005600 | 09C0 | C483 | 8D08 | F246 | 4689 | 8CFC | FE56 | 7E80 |
| 0000005620 | 5CF0 | 1474 | 681E | 05E8 | 468D | 16F0 | 9A50 | 16FE |
| 0000005640 | 09D9 | C483 | EB08 | 9004 | 4EFF | 6AFC | FF0A | FE76 |
| 0000005660 | 76FF | FFFC | FA76 | 989A | E617 | 8309 | 08C4 | 468D |
| 0000005700 | 16F0 | 9A50 | 1892 | 4C49 | C483 | 0B04 | 74C0 | BF03 |
| 0000005720 | FFFF | 44C6 | 000A | C78B | 5F5E | CBC9 | 08C8 | 0000 |
| 0000005740 | 469A | 2A16 | 890A | FC46 | 5689 | 0BFE | 75D0 | 2B05 |
| 0000005760 | 99C0 | 37EB | 76FF | 50FE | 76FF | FF0E | 0C76 | 76FF |
| 0000006000 | FF0A | 0876 | 76FF | 9A06 | 0E6C | 0A62 | C483 | 890E |
| 0000006020 | F846 | 5689 | 8BFA | FC46 | F42D | B905 | 000C | F799 |
| 0000006040 | 50F9 | 0FE8 | 8BFE | F846 | 568B | C9FA | 90CB | 8B55 |
| 0000006060 | 6AEC | FF40 | 0C76 | 76FF | FF0A | 0876 | 76FF | 9A06 |
| 0000006100 | 09FC | 0932 | CBC9 | 08C8 | 0000 | B857 | 0001 | E850 |
| 0000006120 | FDD6 | C483 | 1E02 | 0068 | E806 | 04E2 | C483 | 8B04 |
| 0000006140 | 8DF8 | 0A46 | 5016 | 76FF | FF08 | 0676 | 681E | 0600 |
| 0000006160 | 5C9A | 0311 | 830A | 0CC4 | 4689 | 1EF8 | 0068 | 5706 |
| 0000006200 | 33E8 | 8305 | 06C4 | 016A | A9E8 | 83FD | 02C4 | 468B |
| 0000006220 | 5FF8 | CBC9 | 8B55 | 8BEC | 8BD7 | 1EDE | 76C5 | 8B0A |
| 0000006240 | 8CFE | 8ED8 | 33C0 | B9C0 | FFFF | AEF2 | D1F7 | 7EC4 |
| 0000006260 | 8B06 | A8C7 | 7401 | A402 | D149 | F3E9 | 13A5 | F3C9 |
| 0000006300 | 8BA4 | 8BF3 | 1FFA | C28C | CB5D | 8B55 | 8BEC | 8BD7 |
| 0000006320 | 1EDE | 76C5 | C406 | 0A7E | C033 | FFB9 | F2FF | F7AE |
| 0000006340 | 2BD1 | F3F9 | 74A6 | 1B05 | 1DC0 | FFFF | 8B1F | 8BF3 |
| 0000006360 | 5DFA | 00CB | 04C8 | 0000 | A156 | 0292 | 168B | 0294 |
| 0000006400 | 4689 | 89FC | FE56 | 0C6A | 6DE8 | 83FD | 02C4 | 468B |
| 0000006420 | 0BFE | FC46 | 7674 | 468B | 0B08 | 0646 | 6E74 | 76FF |
| 0000006440 | FF08 | 0676 | 449A | 6417 | 830B | 04C4 | F08B | 5EC4 |
| 0000006460 | 26FC | 478B | 2602 | 070B | 5274 | FF26 | 0277 | FF26 |
| 0000006500 | 9A37 | 1744 | 0B85 | C483 | 3B04 | 7EC6 | C439 | FC5E |
| 0000006520 | C426 | 261F | 3880 | 753D | 562D | 76FF | FF08 | 0676 |
| 0000006540 | 5306 | 5C9A | 9317 | 830A | 0AC4 | C00B | 1875 | 0C6A |
| 0000006560 | 2BE8 | 83FD | 02C4 | 5EC4 | 26FC | 078B | 8B26 | 0257 |
| 0000006600 | C603 | EB40 | 9012 | 4683 | 04FC | A2EB | 0C6A | 0DE8 |
| 0000006620 | 83FD | 02C4 | C02B | 5E99 | CBC9 | 04C8 | 0000 | 5657 |
| 0000006640 | 126A | D3E8 | 83FC | 02C4 | 06C6 | 104E | 8B42 | 0646 |
| 0000006660 | 568B | A308 | 104A | 1689 | 104C | 44BE | 8910 | 8904 |
| 0000006700 | 0254 | 06C7 | 1048 | 7FFF | 468D | 160E | FF50 | 0C76 |
| 0000006720 | 76FF | 1E0A | 9A56 | 115C | 0C1B | C483 | 8B0C | FFF8 |
| 0000006740 | 480E | 7810 | C40F | 441E | FF10 | 4406 | 2610 | 07C6 |
| 0000006760 | EB00 | 900D | 561E | 006A | 4E9A | 470D | 830B | 06C4 |
| 0000007000 | 126A | 99E8 | 83FC | 02C4 | C78B | 5F5E | CBC9 | 0EC8 |
| 0000007020 | 0000 | 068E | 0BF6 | C726 | 2206 | 000A | 8D00 | F646 |
| 0000007040 | 5016 | B49A | 6217 | 830C | 04C4 | 006A | E868 | 8B03 |
| 0000007060 | F646 | 568B | 2BF8 | EA06 | 1B05 | EC16 | 5205 | 9A50 |
| 0000007100 | 18B0 | 0C83 | C88B | 468B | 2BFA | EE06 | 8B05 | 99DA |
| 0000007120 | C103 | D313 | 4689 | 89F2 | F456 | CBC9 | 681E | 05EA |
| 0000007140 | B49A | F817 | 830B | 04C4 | 90CB | 8B55 | 83EC | 0CEC |
| 0000007160 | 468D | 16F4 | 9A50 | FFFF | 0000 | C51E | 065E | 2FB8 |
| 0000007200 | 8800 | 0247 | 4788 | 8805 | 0867 | 468A | B5F9 | F60A |
| 0000007220 | 05F5 | 3030 | 0789 | 468A | 98F8 | F5F6 | 3005 | 8930 |
| 0000007240 | 0347 | 468B | 2DFA | 07D0 | 0373 | 6405 | F600 | 05F5 |
| 0000007260 | 3030 | 4789 | 9306 | DA8C | 8B1F | 5DE5 | 00CB | 8B55 |

THU MAR 14 17:22:14 1991 CRV.EXE PAGE 5, LINE 237

| | | | | | | | | |
|---|---|---|---|---|---|---|---|---|
| 0000007300 | 83EC | 0CEC | 468D | 16F4 | 9A50 | 0C96 | 0000 | C51E |
| 0000007320 | 065E | 3AB8 | 8800 | 0247 | 4788 | 8805 | 0867 | 468A |
| 0000007340 | B5F4 | F60A | 05F5 | 3030 | 0789 | 468A | 98F5 | F5F6 |
| 0000007360 | 3005 | 8930 | 0347 | 468A | 98F6 | F5F6 | 3005 | 8930 |
| 0000007400 | 0647 | 8C93 | 1FDA | E58B | CB5D | 8B55 | 8CEC | C5D9 |
| 0000007420 | 065E | D38B | 0BEB | 612C | 1A3C | 0473 | 4104 | 0788 |
| 0000007440 | 8A43 | 0A07 | 75C0 | 92EF | DA8C | D98E | CB5D | 8B55 |
| 0000007460 | 56EC | 8B57 | 0876 | 448A | A80A | 7482 | A864 | 754D |
| 0000007500 | C760 | 0444 | 0000 | 01A8 | 0B74 | 10A8 | 5374 | 4C8B |
| 0000007520 | 8906 | 240C | 0CFE | 2402 | 88EF | 0A44 | FE8B | EF81 |
| 0000007540 | 05F4 | C781 | 07D4 | DB33 | 5C8A | A80B | 750B | A84B |
| 0000007560 | 7504 | F618 | 0105 | 4275 | FE81 | 0600 | 0674 | FE81 |
| 0000007600 | 060C | 2675 | 87F6 | 008C | 7440 | B91F | 0001 | 1651 |
| 0000007620 | 7E8D | 5706 | 0E53 | C7E8 | 830E | 08C4 | 01B9 | EB00 |
| 0000007640 | B846 | FFFF | 4C80 | 200A | 65EB | 1E53 | E856 | 0C04 |
| 0000007660 | C483 | 5B04 | 44F6 | 080A | D174 | 0C8B | 548B | 2B06 |
| 0000007700 | 42CA | 1489 | 558B | 4A02 | 5489 | E304 | 5125 | FF51 |
| 0000007720 | 0874 | 74FF | 5306 | E80E | 0E86 | C483 | 5908 | 7CC4 |
| 0000007740 | 8B06 | 0656 | 8826 | 3B15 | 75C1 | 33B6 | 8AC0 | 0646 |
| 0000007760 | 1DEB | C033 | 87F6 | 008C | 7420 | B9E3 | 0002 | 5D51 |
| 0000010000 | 5350 | E80E | 0C04 | C483 | 3308 | 8BC0 | EBC8 | 5FCF |
| 0000010020 | 5D5E | 00CB | 8B55 | 56EC | 768B | 8A04 | 0A44 | 83A8 |
| 0000010040 | 2674 | 08A8 | 2274 | 74FF | FF08 | 0674 | 6A9A | 451E |
| 0000010060 | 830C | 04C4 | 6480 | F70A | C033 | 4489 | 8906 | 0844 |
| 0000010100 | 0489 | 4489 | 8902 | 0444 | 5D5E | 00C3 | 08C8 | 0000 |
| 0000010120 | 5657 | 5EC4 | 260A | 078A | 3D98 | 0077 | 4874 | 0877 |
| 0000010140 | 612C | 4C74 | 112C | 0674 | C02B | E999 | 00CC | F62B |
| 0000010160 | 46C6 | 01FC | 46C7 | 01FE | FF00 | 0A46 | 5EC4 | 260A |
| 0000010200 | 3F80 | 7400 | 835B | FE7E | 7400 | 2655 | 078A | 3D98 |
| 0000010220 | 0074 | 3474 | 0877 | 2B2C | 1C74 | 372C | 3674 | 46C7 |
| 0000010240 | 00FE | EB00 | 90D4 | 01BE | C603 | FC46 | EB02 | 90C5 |
| 0000010260 | 09BE | EB01 | 90F4 | C6F7 | 0002 | E275 | CE83 | 8302 |
| 0000010300 | FEE6 | 46C6 | 80FC | B1EB | C6F7 | C000 | D075 | CE81 |
| 0000010320 | 4000 | A5EB | C6F7 | C000 | C475 | CE81 | 8000 | 99EB |
| 0000010340 | A468 | FF01 | 0E76 | FF56 | 0876 | 76FF | 9A06 | 1A9B |
| 0000010360 | 0E4F | C483 | 890A | FA46 | C00B | 037D | 69E9 | FFFF |
| 0000010400 | 2806 | 8B0A | 107E | C78B | F42D | 0505 | 07D4 | 4689 |
| 0000010420 | 8AF8 | FC46 | 4588 | 8B0A | F85E | 07C6 | 2B00 | 89C0 |
| 0000010440 | 0445 | 4789 | 8904 | 0245 | 0589 | 4589 | 8908 | 0645 |
| 0000010460 | 468A | 88FA | 0B45 | C78B | DA8C | 5F5E | CBC9 | 8B55 |
| 0000010500 | 56EC | 8B57 | 0476 | B8BB | 8109 | 00FE | 7406 | BB09 |
| 0000010520 | 09BC | FE81 | 060C | 5875 | FE8B | EF81 | 05F4 | C781 |
| 0000010540 | 07D4 | 44F6 | 0C0A | 4875 | 05F6 | 7501 | 8B43 | 8B07 |
| 0000010560 | 0257 | C88B | CA0B | 2174 | 4489 | 8906 | 0854 | 0489 |
| 0000010600 | 5489 | C702 | 0444 | 0200 | 45C7 | 0002 | 8002 | 0A4C |
| 0000010620 | C602 | 1105 | 01B8 | EB00 | 5319 | 00B8 | 5002 | 949A |
| 0000010640 | 1005 | 5B0F | 0B5B | 74D2 | 8907 | 8907 | 0257 | C8EB |
| 0000010660 | C033 | 5E5F | C35D | 8B55 | 56EC | 8B57 | 0676 | FE8B |
| 0000010700 | EF81 | 05F4 | C781 | 07D4 | 05F6 | 7410 | 332D | 8ADB |
| 0000010720 | 0B5C | 87F6 | 008C | 7440 | 1E21 | 0E56 | 65E8 | 8300 |
| 0000010740 | 04C4 | 7E83 | 0004 | 1274 | C033 | 0588 | 4589 | 8902 |
| 0000010760 | 8904 | 0244 | 4489 | 8906 | 0844 | 5E5F | C35D | 04C8 |
| 0000011000 | 0000 | 468B | 0B08 | 0646 | 0875 | 006A | A7E8 | EB00 |
| 0000011020 | 9031 | 468B | 2D06 | 05F4 | 0CB9 | 9900 | F9F7 | 4689 |
| 0000011040 | 50FC | 03E8 | 83F8 | 02C4 | 76FF | FF08 | 0676 | 649A |
| 0000011060 | A810 | 8310 | 04C4 | 4689 | FFFE | FC76 | F5E8 | 8BF7 |
| 0000011100 | FE46 | CBC9 | 02C8 | 0000 | 5657 | FF2B | 768B | 8A06 |
| 0000011120 | 0A44 | C88B | 0324 | 023C | 3F75 | C1F6 | 7508 | 8B0D |
| 0000011140 | 81DE | F4EB | F605 | D487 | 0107 | 2D74 | 048B | 442B |

THU MAR 14 17:22:14 1991 CRV.EXE PAGE 6, LINE 296

| | | | | | | | | |
|---|---|---|---|---|---|---|---|---|
| 0000011160 | 8906 | FE46 | C00B | 217E | FF50 | 0874 | 74FF | 8A06 |
| 0000011200 | 0B4C | ED2A | 9A51 | 1C80 | 1125 | C483 | 3908 | FE46 |
| 0000011220 | 0774 | 4C80 | 200A | FFBF | 8BFF | 0644 | 548B | 8908 |
| 0000011240 | 8904 | 0254 | 44C7 | 0004 | 8B00 | 5EC7 | C95F | 90CB |
| 0000011260 | 016A | 01E8 | CB00 | 04C8 | 0000 | 5657 | F4BE | 2B05 |
| 0000011300 | 89FF | FE7E | 026A | AFE8 | 83F7 | 02C4 | 11EB | 46C7 |
| 0000011320 | FFFE | FFFF | FC76 | 5BE8 | 83F7 | 02C4 | C683 | 390C |
| 0000011340 | B436 | 7209 | 8B2B | 2DC6 | 05F4 | 0CB9 | 9900 | F9F7 |
| 0000011360 | 4689 | 50FC | 31E8 | 83F7 | 02C4 | 44F6 | 830A | D374 |
| 0000011400 | 561E | 649A | C110 | 830F | 04C4 | 7440 | 47C1 | C3EB |
| 0000011420 | 026A | 89E8 | 83F7 | 02C4 | 7E83 | 0104 | 0475 | C78B |
| 0000011440 | 03EB | 468B | 5EFE | C95F | 02C2 | 9000 | 11B4 | 11BF |
| 0000011460 | 11D5 | 1209 | 1235 | 123D | 1266 | 1298 | 8B55 | B8EC |
| 0000011500 | 0171 | E80E | 077C | 5756 | C033 | 4689 | 88F8 | FB46 |
| 0000011520 | 76C4 | 260A | 89AC | 0A76 | 4688 | 0AFE | 74C0 | 8306 |
| 0000011540 | F87E | 7D00 | 8B06 | F846 | B5E9 | BB04 | 09C0 | 202C |
| 0000011560 | 583C | 0577 | 24D7 | EB0F | B002 | B100 | D203 | 02E0 |
| 0000011600 | FB46 | FED7 | D2C1 | 88E8 | FB46 | 8B98 | D1D8 | 2EE3 |
| 0000011620 | A7FF | 114C | 568A | B9FE | 0001 | 36E8 | EB04 | 33B1 |
| 0000011640 | 89C0 | F046 | 4689 | 89F6 | EE46 | 46C7 | 20FC | 4800 |
| 0000011660 | 4689 | EBF4 | 8A9B | FE46 | 2D3C | 0675 | 4E80 | 04FC |
| 0000011700 | 8EEB | 2B3C | 0675 | 4E80 | 01FC | 84EB | 203C | 0775 |
| 0000011720 | 4E80 | 02FC | 79E9 | 3CFF | 7523 | 8007 | FC4E | E980 |
| 0000011740 | FF6E | 4E80 | 08FC | 67E9 | 8AFF | FE4E | F980 | 752A |
| 0000011760 | E80F | 035C | C00B | 1779 | D8F7 | 4E80 | 04FC | 0FEB |
| 0000012000 | E980 | 3230 | 8BED | F646 | 0ABB | F700 | 03E3 | 89C1 |
| 0000012020 | F646 | 3BE9 | C7FF | F446 | 0000 | 33E9 | 8AFF | FE4E |
| 0000012040 | F980 | 752A | E80C | 0328 | C00B | 1479 | FFB8 | EBFF |
| 0000012060 | 800F | 30E9 | ED32 | 468B | BBF4 | 000A | E3F7 | C103 |
| 0000012100 | 4689 | E9F4 | FF0A | 468A | 3CFE | 756C | 8006 | FC4E |
| 0000012120 | EB10 | 3C22 | 7546 | 8006 | FC4E | EB20 | 3C18 | 754E |
| 0000012140 | 8006 | FD4E | EB10 | 3C0E | 754C | 8006 | FD4E | EB04 |
| 0000012160 | 8004 | FD4E | E908 | FED8 | 468A | 3CFE | 7564 | E903 |
| 0000012200 | 0194 | 693C | 0375 | 8DE9 | 3C01 | 7575 | E903 | 018A |
| 0000012220 | 583C | 0375 | 89E9 | 3C01 | 7578 | E903 | 0188 | 6F3C |
| 0000012240 | 0375 | A2E9 | 3C01 | 7463 | 3C1A | 74[illegible]3 | 3C27 | 746E |
| 0000012260 | 3C51 | 7470 | 3C60 | 7445 | 3C07 | 7447 | E903 | 00BB |
| 0000012300 | B5E9 | E800 | 028A | BE8D | FE8F | 0716 | 4FAA | 01B9 |
| 0000012320 | E900 | 01F1 | 90E8 | 0B02 | 75FF | 8C12 | 0BC0 | 75C0 |
| 0000012340 | 1E0C | BF07 | 0A19 | 0E8B | 0A1F | D8E9 | 5701 | 4E8B |
| 0000012360 | E3F4 | 3207 | F2C0 | 75AE | 4F01 | 2B59 | 87F9 | E9CF |
| 0000012400 | 01C3 | 62E8 | 8B02 | F846 | F6AB | FC46 | 7410 | 3303 |
| 0000012420 | ABC0 | 3BE9 | F6FE | FC46 | 7530 | E805 | 0232 | 39EB |
| 0000012440 | 36E8 | F602 | FD46 | 7518 | C63D | FF46 | B907 | 0010 |
| 0000012460 | 0716 | 3352 | 8DD2 | 97BE | BEFE | 0004 | B0E8 | B902 |
| 0000012500 | 0010 | BE8D | FE92 | 3358 | BED2 | 0004 | A0E8 | C602 |
| 0000012520 | 9386 | 3AFE | 09B9 | EB00 | C618 | FF46 | B907 | 0010 |
| 0000012540 | 0716 | D233 | BE8D | FE92 | 04BE | E800 | 0281 | 04B9 |
| 0000012560 | 8D00 | 8FBE | E9FE | 014D | 46FF | 80EE | FC4E | 8A40 |
| 0000012600 | FE46 | 200C | 8B98 | 83F0 | F47E | 7F00 | 7413 | C707 |
| 0000012620 | F446 | 0006 | 0AEB | 673D | 7500 | C705 | F446 | 0001 |
| 0000012640 | BE8D | FE8F | 76FF | FFEE | F476 | 1656 | FF57 | 1076 |
| 0000012660 | 76FF | F60E | FD46 | 7404 | FF0A | 3E1E | 830A | 0E46 |
| 0000012700 | EB0A | FF08 | 2A1E | 830A | 0E46 | 8308 | 0EC4 | 46F6 |
| 0000012720 | 80FC | 0F74 | 7E83 | 00F4 | 0975 | 5716 | 1EFF | 0A36 |
| 0000012740 | C483 | 8304 | 67FE | 1075 | 46F7 | 80FC | 7500 | 1609 |
| 0000012760 | FF57 | 2E1E | 830A | 04C4 | 0716 | 8026 | 2D3D | 0575 |
| 0000013000 | 8047 | FD4E | B901 | FFFF | B057 | F200 | 4FAE | 2B59 |
| 0000013020 | 87F9 | E9CF | 00AF | 4E80 | 40FC | 46C6 | 0AFA | 35EB |

THU MAR 14 17:22:14 1991 CRV.EXE PAGE 7, LINE 355

| | | | | | | | | |
|---|---|---|---|---|---|---|---|---|
| 0000013040 | 46C6 | 07FF | 04EB | 46C6 | 27FF | 46F6 | 80FC | 1174 |
| 0000013060 | 46C7 | 02F0 | C600 | F246 | B230 | 0251 | FF56 | 5688 |
| 0000013100 | C6F3 | FA46 | EB10 | F60E | FC46 | 7480 | 8004 | FD4E |
| 0000013120 | C602 | FA46 | F608 | FC46 | 7410 | E805 | 00FB | 0EEB |
| 0000013140 | EDE8 | F600 | FC46 | 7440 | 9903 | 02EB | D233 | 46F6 |
| 0000013160 | 40FC | 0F74 | D20B | 0B7D | 4E80 | 01FD | D8F7 | D283 |
| 0000013200 | F700 | 83DA | F47E | 7D00 | C707 | F446 | 0001 | 04EB |
| 0000013220 | 6680 | F7FC | D88B | DA0B | 0575 | 46C7 | 00F0 | 8D00 |
| 0000013240 | EB7E | 0716 | 4E8A | 32FA | 8BED | F476 | 40E8 | F601 |
| 0000013260 | FD46 | 7402 | E30E | 2606 | 3D80 | 7430 | 4F06 | C626 |
| 0000013300 | 3005 | EB41 | F600 | FC46 | 7440 | F631 | FD46 | 7401 |
| 0000013320 | C60B | F246 | C72D | F046 | 0001 | 20EB | 46F6 | 01FC |
| 0000013340 | 0B74 | 46C6 | 2BF2 | 46C7 | 01F0 | EB00 | F60F | FC46 |
| 0000013360 | 7402 | C609 | F246 | C720 | F046 | 0001 | 468B | 2BF6 |
| 0000013400 | 2BC1 | F046 | 027D | C033 | 5706 | F651 | FC46 | 750C |
| 0000013420 | 8B07 | B2C8 | E820 | 00BB | 1650 | 8D07 | F27E | 4E8B |
| 0000013440 | E8F0 | 0091 | F658 | FC46 | 7408 | F60D | FC46 | 7504 |
| 0000013460 | 8B07 | B2C8 | E830 | 009B | 5F59 | 5007 | 76E8 | 5800 |
| 0000013500 | 46F6 | 04FC | 0774 | C88B | 20B2 | 86E8 | E900 | FC00 |
| 0000013520 | 76C4 | 260E | 59AD | 0E76 | C4C3 | 0E76 | AD26 | D08B |
| 0000013540 | AD26 | 8992 | 0E76 | F6C3 | FC46 | 7420 | E808 | FFE9 |
| 0000013560 | C28E | F88B | E8C3 | FFD8 | F88B | C00B | 0375 | C08E |
| 0000013600 | 1EC3 | C307 | 0698 | C457 | 065E | FF26 | 044F | 1078 |
| 0000013620 | 8B26 | 263F | 07FF | 8E26 | 0247 | 33AA | 5FC0 | C307 |
| 0000013640 | 5251 | 5306 | 0E50 | 85E8 | 83F7 | 06C4 | 595A | FF3D |
| 0000013660 | 75FF | EBE8 | E3E8 | 8B1B | 01F7 | F84E | 3357 | 26FF |
| 0000013700 | E8AC | FFC0 | F80B | F7E2 | FF0B | 745F | C705 | F846 |
| 0000013720 | FFFF | E3C3 | 0119 | F84E | 3357 | 8AFF | E8C2 | FFA4 |
| 0000013740 | F80B | F7E2 | FF0B | 745F | C705 | F846 | FFFF | FDC3 |
| 0000013760 | 9357 | F60B | 0A7F | DB0B | 0675 | D20B | 0275 | 1AEB |
| 0000014000 | 3392 | F7D2 | 93F1 | F1F7 | 8792 | D4D3 | 3C30 | 7639 |
| 0000014020 | 0203 | FF46 | 8BAA | 4EC2 | D8E8 | 2B59 | 47CF | C3FC |
| 0000014040 | 5E5F | E58B | CB5D | 06C8 | 0000 | BE56 | 05F4 | C02B |
| 0000014060 | 4689 | 89FC | FA46 | 026A | 3DE8 | 83F2 | 02C4 | 0CEB |
| 0000014100 | 76FF | E8FE | F1EE | C483 | 8302 | 0CC6 | 3639 | 09B4 |
| 0000014120 | 3B72 | C68B | F42D | B905 | 000C | F799 | 89F9 | FE46 |
| 0000014140 | E850 | F1C4 | C483 | F602 | 0A44 | 7583 | C7D3 | 0444 |
| 0000014160 | 0000 | 44C6 | 000A | C02B | 4489 | 8908 | 0644 | 4489 |
| 0000014200 | 8902 | C604 | 0B44 | 89FF | FA76 | 5E8C | 6AFC | E802 |
| 0000014220 | F20C | C483 | 8B02 | FA46 | 568B | 5EFC | CBC9 | 8B55 |
| 0000014240 | 8BEC | 065E | 1E3B | 008A | 1272 | 09BA | 3300 | E9C0 |
| 0000014260 | 028E | E853 | F196 | C483 | E902 | 029D | E853 | F180 |
| 0000014300 | C483 | 5302 | FF9A | 00FF | 8500 | 75C0 | C6E5 | 8C87 |
| 0000014320 | 0000 | E853 | F176 | C483 | 8B02 | 5DE5 | 00CB | 8B55 |
| 0000014340 | 8BEC | 8BD7 | 1EDE | 7EC4 | 3306 | B9C0 | FFFF | AEF2 |
| 0000014360 | 758D | C4FF | 0A7E | FFB9 | F2FF | F7AE | 2BD1 | 8CF9 |
| 0000014400 | 8EC0 | 8ED8 | 0846 | FE87 | 468B | F706 | 01C6 | 7400 |
| 0000014420 | A402 | D149 | F3E9 | 13A5 | F3C9 | 8BA4 | 8BF3 | 1FFA |
| 0000014440 | C28C | CB5D | 8B55 | 8BEC | C4D7 | 067E | C033 | FFB9 |
| 0000014460 | F2FF | F7AE | 49D1 | 8B91 | 5DFA | 00CB | 8B55 | 57EC |
| 0000014500 | 1E56 | 4E8B | E30E | 8B27 | C4D9 | 067E | F78B | C033 |
| 0000014520 | AEF2 | D9F7 | CB03 | FE8B | 76C5 | F30A | 8AA6 | FF44 |
| 0000014540 | C933 | 3A26 | FF45 | 0477 | 0474 | 4949 | D1F7 | C18B |
| 0000014560 | 5E1F | 8B5F | 5DE5 | 00CB | 8B55 | 56EC | B357 | 8B01 |
| 0000014600 | 0C4E | 468B | 3306 | 83D2 | 0AF9 | 0175 | 1E99 | 7EC5 |
| 0000014620 | E908 | 098B | 1EC8 | 0000 | 749A | CC1E | 6A17 | 6A00 |
| 0000014640 | FF3C | 8A36 | FF0A | 8836 | 9A0A | 2196 | 181B | 5EC4 |
| 0000014660 | 2606 | 4789 | A106 | 0A8C | 8926 | 0847 | 468D | 16E2 |
| 0000014700 | 9A50 | 0CEA | 0000 | 468A | 2AE5 | 8BE4 | C1C8 | 02E0 |

THU MAR 14 17:22:14 1991 CRV.EXE PAGE 8, LINE 414

| | | | | | | | | |
|---|---|---|---|---|---|---|---|---|
| 0000014720 | C103 | E0D1 | 5EC4 | 2606 | 4789 | 8A04 | E446 | E42A |
| 0000014740 | 8A50 | E346 | 8A50 | E246 | 8A50 | E646 | 8A50 | E746 |
| 0000014760 | 8B50 | E846 | BC2D | 5007 | 3C9A | 7220 | 8318 | 0CC4 |
| 0000015000 | 5EC4 | 2606 | 0789 | 8926 | 0257 | 468B | 2DE8 | 076C |
| 0000015020 | 4689 | 8AF8 | E246 | E42A | 4689 | 8AF2 | E75E | FF2A |
| 0000015040 | 894B | F65E | E3D1 | 468A | 89E6 | F446 | 8703 | 0A62 |
| 0000015060 | 4689 | F6FC | E846 | 7503 | 800A | E77E | 7602 | 4004 |
| 0000015100 | 4689 | 83FC | 8C3E | 000A | 1C74 | 468D | 16EE | 9A50 |
| 0000015120 | 1F6E | 1051 | C483 | 0B04 | 74C0 | C40B | 065E | C726 |
| 0000015140 | 0847 | 0001 | 09EB | 5EC4 | 2606 | 47C7 | 0008 | C900 |
| 0000015160 | 90CB | 8B55 | FFEC | 0876 | 76FF | 3306 | 50C0 | 9A50 |
| 0000015200 | FFFF | 0000 | C085 | 0374 | CEE9 | 8B00 | 5DE5 | 00CB |
| 0000015220 | 8B55 | 8BEC | 0846 | 4E8B | 0B0C | 8BC8 | 0A4E | 0975 |
| 0000015240 | 468B | F706 | 5DE1 | 08CA | 5300 | E1F7 | D88B | 468B |
| 0000015260 | F706 | 0C66 | D803 | 468B | F706 | 03E1 | 5BD3 | CA5D |
| 0000015300 | 0008 | 5A59 | DC8B | D82B | 1972 | FB81 | 0200 | 1372 |
| 0000015320 | E852 | 0988 | 8E93 | 5AC2 | 3B26 | 0447 | 0572 | E08B |
| 0000015340 | 5152 | 52CB | A151 | 0A24 | 7540 | 3305 | E9C0 | E77C |
| 0000015360 | 2EFF | 0A24 | 1601 | 0202 | 0203 | 1804 | 0D05 | 0906 |
| 0000015400 | 0C07 | 0C08 | 0C09 | 070A | 080B | 160C | 160D | 020F |
| 0000015420 | 0D10 | 1211 | 0212 | 0235 | 0D41 | 0243 | 0D52 | 0D53 |
| 0000015440 | 0D57 | 0B59 | 0D6C | 206D | 1C70 | 0972 | 1606 | 0A80 |
| 0000015460 | 0A81 | 0982 | 0D84 | 0BA4 | 02CE | 0BD7 | 0D00 | 1608 |
| 0000015500 | 8B52 | E8D8 | 0916 | 8E93 | 5AC2 | 8926 | 0247 | 8926 |
| 0000015520 | B817 | FFFF | 8B99 | 5DE5 | E8CB | 0008 | FFB8 | 99FF |
| 0000015540 | E58B | CB5D | D88B | F3E8 | 9308 | C28E | 8926 | 0247 |
| 0000015560 | BB53 | 1914 | 24B9 | 0A00 | 75E4 | 2E1B | 073A | 1674 |
| 0000015600 | 4343 | F7E2 | 133C | 0472 | 243C | 0A76 | 3C43 | 72BC |
| 0000015620 | 3C04 | 76CA | 4301 | 8A2E | 0147 | 5B98 | 8926 | C307 |
| 0000015640 | 8B55 | BBEC | 0002 | 05EB | 8B55 | 33EC | E8DB | 08AC |
| 0000015660 | C303 | CB5D | 8B55 | 56EC | 768B | B804 | 0200 | 9A50 |
| 0000015700 | 0594 | 17BB | 8B59 | 81DE | F4EB | 8105 | D4C3 | 0B07 |
| 0000015720 | 74D2 | 800B | 044C | C708 | 0247 | 0200 | 0EEB | 4C80 |
| 0000015740 | 040A | 47C7 | 0102 | 8C00 | 8DDA | 0147 | 5489 | 8902 |
| 0000015760 | 8904 | 0854 | 4489 | C706 | 0444 | 0000 | 5D5E | 00C3 |
| 0000016000 | 8B55 | 83EC | 02EC | C033 | 09EB | 8B55 | 83EC | 02EC |
| 0000016020 | FFB8 | 89FF | FE46 | 5E8B | 3B06 | 8A1E | 7200 | BA19 |
| 0000016040 | 0009 | C033 | 19E9 | 8BFF | FE4E | C90B | 0774 | E853 |
| 0000016060 | EE1A | C483 | E902 | FF21 | C00B | 0774 | E853 | EE00 |
| 0000016100 | C483 | 8302 | 04EC | CC8B | FF53 | 0A76 | 76FF | FF08 |
| 0000016120 | 0C76 | 5116 | FF9A | 00FF | 5900 | 855A | 75C0 | 80C8 |
| 0000016140 | 8CA7 | FD00 | 468B | 0BFE | 74C0 | 5307 | DDE8 | 83ED |
| 0000016160 | 02C4 | 8B91 | 5DE5 | 00CB | 8B55 | 83EC | 0EEC | 7E8A |
| 0000016200 | 8B0C | 0E46 | 4689 | EB0C | 5508 | EC8B | EC83 | B70E |
| 0000016220 | FF40 | 0876 | 76FF | 1606 | 568D | 52FE | 8D16 | F856 |
| 0000016240 | 3352 | 52D2 | 8B52 | 0C4E | 99E8 | 8B01 | 0A46 | 00A9 |
| 0000016260 | 7401 | 8008 | 10CA | 00A9 | 7504 | A92A | 0200 | 2274 |
| 0000016300 | CA80 | 5002 | 468D | FFFE | 0876 | 76FF | 1606 | 3350 |
| 0000016320 | 50C0 | 9A50 | FFFF | 0000 | C085 | 7558 | 8B08 | FE4E |
| 0000016340 | 03EB | CA80 | 5101 | 2552 | 0003 | C70A | 3350 | 50C0 |
| 0000016360 | 9A50 | FFFF | 0000 | C00B | 1674 | 6E3D | 7500 | F60E |
| 0000016400 | F0C2 | 02BA | 7400 | BA03 | 0011 | 33E9 | E9FE | 009D |
| 0000016420 | 468B | 3BFE | 8A06 | 7200 | 500D | E59A | 0016 | BA00 |
| 0000016440 | 0018 | C033 | E4EB | E850 | ED16 | C483 | 8B02 | 50D0 |
| 0000016460 | 8D16 | F45E | 1653 | 468D | 50F8 | 059A | 0001 | 0B00 |
| 0000016500 | 75C0 | 8B61 | 0A46 | C933 | 00A9 | 7580 | A90E | 4000 |
| 0000016520 | 0775 | 06F6 | 0AD3 | 7580 | B102 | 8880 | F24E | 468A |
| 0000016540 | 3CF4 | 7501 | C607 | F446 | E940 | 008F | 023C | 0775 |
| 0000016560 | 46C6 | 08F4 | 84E9 | 3200 | 88C0 | F446 | C90A | F474 |

THU MAR 14 17:22:14 1991 CRV.EXE PAGE 9, LINE 473

| | | | | | | | | |
|---|---|---|---|---|---|---|---|---|
| 0000016600 | 46F7 | 020A | 7400 | 5274 | FFB9 | 51FF | B951 | 0002 |
| 0000016620 | 1651 | 468D | 50FA | 759A | 001A | 0B00 | 74C0 | 3D15 |
| 0000016640 | 0083 | 0C74 | 76FF | E8FE | ECA2 | C483 | E902 | FDA9 |
| 0000016660 | C033 | 47EB | 1652 | 468D | 50F6 | 01B8 | 5000 | 8D16 |
| 0000016700 | F846 | 9A50 | FFFF | 0000 | C00B | 1B75 | 4639 | 74F8 |
| 0000016720 | 802A | F67E | 751A | 5210 | 76FF | FFFC | FA76 | FF9A |
| 0000016740 | 00FF | 0B00 | 75C0 | 52BD | C033 | 5050 | 1650 | 468D |
| 0000016760 | 50FA | B79A | 001B | 0B00 | 75C0 | 8AA9 | F44E | C1F6 |
| 0000017000 | 7548 | FF28 | 0876 | 76FF | 1606 | 468D | 50F8 | C033 |
| 0000017020 | 5050 | F49A | 001A | F700 | F846 | 0001 | 0374 | C980 |
| 0000017040 | F710 | 0A46 | 0008 | 0374 | C980 | 0A20 | F24E | C980 |
| 0000017060 | 8B01 | 8BC2 | 88D8 | 8C8F | 5300 | 0FE8 | 83EC | 02C4 |
| 0000017100 | E58B | CB5D | 84A1 | F700 | 23D0 | 33C1 | A8C9 | 7580 |
| 0000017120 | 8003 | 01C9 | 00C3 | 8B55 | 83EC | 0EEC | C033 | 09EB |
| 0000017140 | 8B55 | 83EC | 0EEC | FFB8 | 89FF | F246 | 5E8B | 3B06 |
| 0000017160 | 8A1E | 7200 | BA08 | 0009 | C033 | C3E9 | 0BFC | 74C0 |
| 0000017200 | 5307 | BBE8 | 83EB | 02C4 | 87F6 | 008C | 7420 | 5312 |
| 0000017220 | C933 | 5151 | 4141 | 8D51 | F446 | 5016 | 139A | 001C |
| 0000017240 | F600 | 8C87 | 8000 | 7D74 | 5E8C | 8EFA | 0A46 | 56C5 |
| 0000017260 | 3308 | 89C0 | FE46 | 4689 | FCFC | 5657 | FA8B | F28B |
| 0000017300 | 6689 | 8BF8 | 0C4E | 3FE3 | 0AB0 | AEF2 | 5275 | 8E1E |
| 0000017320 | FA5E | 309A | E222 | 3D19 | 00A8 | 4C76 | 831F | 02EC |
| 0000017340 | DC8B | 00BA | 3D02 | 0228 | 0373 | 80BA | 2B00 | 8BE2 |
| 0000017360 | 8BD4 | 16FA | 8B07 | 0C4E | 3CAC | 740A | 3B0D | 74FB |
| 0000017400 | AA1A | F4E2 | 38E8 | E900 | 00AF | 0DB0 | FB3B | 0375 |
| 0000017420 | 2CE8 | AA00 | 0AB0 | 46FF | EBFC | E8E2 | 0021 | E1EB |
| 0000017440 | 5F5E | 5E8E | E9FA | 00C8 | 468B | 0BF2 | 74C0 | FF09 |
| 0000017460 | 0676 | 17E8 | 83EB | 02C4 | FCB8 | 0EFF | 83E8 | 50FB |
| 0000017500 | 5153 | 061E | 8B1F | 2BCF | E3CA | 5121 | 5E8B | 5306 |
| 0000017520 | 521E | 8D51 | F446 | 5016 | 659A | 0005 | 5900 | C00B |
| 0000017540 | 1175 | 5E8B | 01F4 | FE5E | D93B | 0772 | 591F | 585B |
| 0000017560 | FA8B | 1FC3 | C483 | 8308 | FE7E | 7500 | 0B3C | 74C0 |
| 0000017600 | 3D18 | 006D | 0D74 | 013D | BA00 | 0009 | 0875 | 1CBA |
| 0000017620 | EB00 | BA03 | 0020 | EBF9 | 8E26 | FA5E | 87F6 | 008C |
| 0000017640 | 7440 | 8E0E | 0A5E | 5E8B | 8008 | 1A3F | 0375 | EBF8 |
| 0000017660 | BA0E | 001C | C033 | EBF9 | 8B06 | FE46 | 462B | 8BFC |
| 0000017700 | F866 | 5F5E | 5E8E | 72FA | 8B14 | F25E | DB0B | 0974 |
| 0000017720 | 76FF | E806 | EA76 | C483 | 8B02 | 5DE5 | 8BCB | F25E |
| 0000017740 | DB0B | 0974 | 76FF | E806 | EA62 | C483 | E902 | FB50 |
| 0000017760 | 4E8B | 0B0C | 75C9 | 8B04 | EBC1 | 1ECE | 56C5 | 5308 |
| 0000020000 | 521E | 8D51 | F446 | 5016 | 799A | 001D | 1E00 | 1F07 |
| 0000020020 | C00B | 1774 | 6D3D | 7400 | 3D0D | 0001 | 09BA | 7500 |
| 0000020040 | BABC | 001C | B7EB | 20BA | EB00 | 8BB2 | F446 | C00B |
| 0000020060 | 9775 | 87F6 | 008C | 7440 | 8B0A | 26DA | 3F80 | 751A |
| 0000020100 | EB02 | BA86 | 001C | C033 | 93EB | 9EEA | F505 | EA1C |
| 0000020120 | 059E | 1E6D | 0B6A | 1FE8 | 83EA | 02C4 | 3E83 | 1050 |
| 0000020140 | 7500 | E807 | 0022 | 06FF | 1050 | 0B6A | 2FE8 | 83EA |
| 0000020160 | 02C4 | 90CB | 0B6A | FFE8 | 83E9 | 02C4 | 09E8 | 6A00 |
| 0000020200 | E80B | EA1A | C483 | CB02 | 04C8 | 0000 | 1E56 | 7C68 |
| 0000020220 | 9A0A | 0B14 | 1EE1 | C483 | 8904 | FC46 | 5689 | 0BFE |
| 0000020240 | 75D0 | E903 | 00A4 | 5EC4 | 26FC | 3F80 | 7500 | E903 |
| 0000020260 | 0098 | 036A | 5006 | 36FF | 0A90 | 36FF | 0A8E | 4E9A |
| 0000020300 | F822 | 831E | 0AC4 | 006A | 1068 | 830E | FC46 | FF03 |
| 0000020320 | FE76 | 76FF | 9AFC | 2278 | 1F02 | C483 | 5204 | 9A50 |
| 0000020340 | 18B0 | 1F4D | 88A3 | 890A | 8A16 | 2B0A | 8EF6 | FE46 |
| 0000020360 | 5E8B | 26FC | 3880 | 7400 | 261A | 008A | C88B | 8B98 |
| 0000020400 | F6D8 | D587 | 040A | 0575 | F980 | 752D | 4606 | FE83 |
| 0000020420 | 7C03 | 8BDD | FC5E | 8026 | 0038 | 1874 | 036A | DE03 |
| 0000020440 | 5306 | 36FF | 0A94 | 36FF | 0A92 | 4E9A | 7222 | 831E |

THU MAR 14 17:22:14 1991 CRV.EXE PAGE 10, LINE 532

| | | | | | | | | |
|---|---|---|---|---|---|---|---|---|
| 0000020460 | 0AC4 | 08EB | 1EC4 | 0A92 | C626 | 0007 | 1EC4 | 0A92 |
| 0000020500 | 8026 | 013F | C01B | A340 | 0A8C | C95E | 90C3 | 04C8 |
| 0000020520 | 0000 | C456 | 065E | 8326 | 087F | 7D03 | E903 | 00B6 |
| 0000020540 | 8326 | 087F | 7E09 | E903 | 00AC | 8326 | 087F | 7E03 |
| 0000020560 | 260A | 7F83 | 0908 | 037D | 81E9 | 2600 | 778B | 810A |
| 0000020600 | 6CC6 | 8107 | C2FE | 7E07 | 2617 | 7F83 | 0308 | 1075 |
| 0000020620 | 8B26 | 085F | E3D1 | 878B | 0A62 | 0705 | EB00 | 900B |
| 0000020640 | 8B26 | 085F | E3D1 | 878B | 0A64 | 4689 | F7FC | 03C6 |
| 0000020660 | 7500 | FF03 | FC46 | 5E8B | 2606 | 778B | 830A | 46EE |
| 0000020700 | 448D | 9901 | C233 | C22B | F8C1 | 3302 | 2BC2 | 69C2 |
| 0000020720 | 6DCE | 0301 | 03C1 | FC46 | 0405 | B900 | 0007 | F799 |
| 0000020740 | 2BF9 | FC56 | DAF7 | 8326 | 087F | 7503 | 2615 | 573B |
| 0000020760 | 7C0E | 7509 | 2621 | 7F83 | 0204 | 1A7C | 01B8 | EB00 |
| 0000021000 | 9017 | 5EC4 | 8B06 | 26C2 | 4739 | 7C0E | 75EF | 2607 |
| 0000021020 | 7F83 | 0104 | E67C | C02B | C95E | 90CB | 16C8 | 0000 |
| 0000021040 | 5657 | 768B | 6A06 | 6801 | 5180 | 448D | 9903 | C233 |
| 0000021060 | C22B | F8C1 | 3302 | 2BC2 | 99C2 | 5052 | B09A | 8E18 |
| 0000021100 | 8920 | EA46 | 5689 | 8BEC | 085E | E3D1 | BF8B | 0A60 |
| 0000021120 | C68B | 04B9 | 9900 | F9F7 | D20B | 0775 | 7E83 | 0208 |
| 0000021140 | 017E | 8B47 | 0A46 | C703 | 4689 | 9AFC | 1E74 | 20B1 |
| 0000021160 | 006A | 3C6A | 006A | 3C6A | 006A | 186A | C669 | 016D |
| 0000021200 | 4603 | 030A | 99C7 | 4405 | 830E | 00D2 | 5052 | B09A |
| 0000021220 | C418 | 8B20 | 8BC8 | 0C46 | DA8B | 0399 | 13C1 | 52D3 |
| 0000021240 | 9A50 | 18B0 | 20D7 | C88B | 468B | 8B0E | 99DA | C103 |
| 0000021260 | D313 | 5052 | B09A | 1518 | 8B21 | 8BC8 | 1046 | DA8B |
| 0000021300 | 0399 | 13C1 | 03D3 | 8806 | 130A | 8A16 | 010A | EA46 |
| 0000021320 | 5611 | 8DEC | 5044 | 4689 | 8BF8 | 0846 | 8948 | F646 |
| 0000021340 | 468B | 890C | F246 | 3E83 | 0A8C | 7400 | 8D1A | EE46 |
| 0000021360 | 5016 | 6E9A | B41F | 831E | 04C4 | C00B | 0974 | 6E81 |
| 0000021400 | 10EA | 830E | EC5E | 8B00 | EA46 | 568B | 5EEC | C95F |
| 0000021420 | 90CB | 4E8B | 8B0E | 0646 | 568B | 1E08 | 7EC5 | 570A |
| 0000021440 | 071E | 93FC | C00A | 1374 | F983 | 750A | 0B0E | 79D2 |
| 0000021460 | B00A | AA2D | DBF7 | D283 | F700 | 8BDA | 92F7 | D233 |
| 0000021500 | C00B | 0274 | F1F7 | F793 | 92F1 | D387 | 3004 | 393C |
| 0000021520 | 0276 | 2704 | 8BAA | 0BC2 | 75C3 | 88E2 | 4F05 | 86AC |
| 0000021540 | 8805 | FF44 | 448D | 3B01 | 72C7 | 8CF2 | 58DA | 5F1F |
| 0000021560 | 8B5E | 5DE5 | 00CB | 8B55 | 57EC | 5356 | FF33 | 468B |
| 0000021600 | 0B08 | 7DC0 | 4711 | 568B | F706 | F7D8 | 1DDA | 0000 |
| 0000021620 | 4689 | 8908 | 0656 | 468B | 0B0C | 7DC0 | 4711 | 568B |
| 0000021640 | F70A | F7D8 | 1DDA | 0000 | 4689 | 890C | 0A56 | C00B |
| 0000021660 | 1575 | 4E8B | 8B0A | 0846 | D233 | F1F7 | D88B | 468B |
| 0000021700 | F706 | 8BF1 | EBD3 | 8B38 | 8BD8 | 0A4E | 568B | 8B08 |
| 0000021720 | 0646 | EBD1 | D9D1 | EAD1 | D8D1 | DB0B | F475 | F1F7 |
| 0000021740 | F08B | 66F7 | 910C | 468B | F70A | 03E6 | 72D1 | 3B0C |
| 0000021760 | 0856 | 0777 | 0672 | 463B | 7606 | 4E01 | D233 | 4F96 |
| 0000022000 | 0775 | DAF7 | D8F7 | DA83 | 5B00 | 5F5E | CA5D | 0008 |
| 0000022020 | 5A59 | E852 | 0046 | D88B | C28E | 265A | 478B | 3B04 |
| 0000022040 | 73C4 | 2B07 | F7C4 | 52D8 | CB51 | C033 | F9EB | 8B55 |
| 0000022060 | 57EC | 1E56 | 7EC4 | C506 | 0A76 | DF8B | 4E8B | E30E |
| 0000022100 | AC0C | C00A | 0374 | E2AA | 32F8 | F3C0 | 8BAA | 8CC3 |
| 0000022120 | 1FC2 | 5F5E | E58B | CB5D | 7BE9 | 0000 | 068E | 004C |
| 0000022140 | A126 | 0006 | 3B48 | D606 | 770B | C107 | 06ED | FFBA |
| 0000022160 | C3FF | 5357 | 6A51 | E80F | E5FE | C483 | 3B02 | D606 |
| 0000022200 | 760B | 8B40 | 05D8 | 0004 | FC25 | 8BFF | C1C8 | 06E0 |
| 0000022220 | 8FBA | 5022 | 9A52 | 07DD | 0000 | C00B | 3275 | 8B49 |
| 0000022240 | 87F9 | D63E | 2B0B | 51CF | C147 | 06E7 | E1C1 | 5705 |
| 0000022260 | C28E | ABF3 | 595F | C726 | 0445 | 0200 | C783 | E240 |
| 0000022300 | 8BF5 | 6AC3 | E80F | E5D6 | C483 | 5902 | 5F5B | 9BEB |
| 0000022320 | 10B8 | E900 | DD96 | 8B55 | 57EC | 1E56 | 76C5 | 3306 |

THU MAR 14 17:22:14 1991 CRV.EXE PAGE 11, LINE 591

| | | | | | | | | |
|---|---|---|---|---|---|---|---|---|
| 0000022340 | 99C0 | DB33 | 3CAC | 7420 | 3CFB | 7409 | 50F7 | 2D3C |
| 0000022360 | 0474 | 2B3C | 0175 | 3CAC | 7739 | 2C1F | 7230 | D11B |
| 0000022400 | D1E3 | 8BD2 | 8BCB | D1FA | D1E3 | D1D2 | D1E3 | 03D2 |
| 0000022420 | 13D9 | 03D7 | 83D8 | 00D2 | DCEB | 3C58 | 932D | 0775 |
| 0000022440 | D8F7 | D283 | F700 | 1FDA | 5F5E | CB5D | 581E | 4590 |
| 0000022460 | 8B55 | 1EEC | D88E | EC81 | 000A | 5657 | 068E | 0BEE |
| 0000022500 | C726 | 1606 | 0002 | FF00 | 1A36 | FF0F | 1836 | 6A0F |
| 0000022520 | 1E03 | C968 | 8D02 | F646 | 5016 | B09A | 0023 | 8900 |
| 0000022540 | F846 | 013D | 1B00 | F7C0 | 3DD8 | 0000 | 0375 | 0BE9 |
| 0000022560 | 8B00 | F646 | 068E | 0BEE | A326 | 0216 | 36FF | 0F1A |
| 0000022600 | 36FF | 0F18 | 036A | 681E | 02DA | 468D | 16F6 | 9A50 |
| 0000022620 | 23F2 | 0000 | 4689 | 3DF8 | 0001 | C01B | D8F7 | 003D |
| 0000022640 | 7500 | E903 | 0006 | 468B | A3F6 | 0326 | 068E | 0BEE |
| 0000022660 | C726 | 0006 | 0102 | 2600 | 06C7 | 0212 | 0020 | 36FF |
| 0000022700 | 0F1A | 36FF | 0F18 | 016A | 681E | 02EE | 468D | 16FA |
| 0000022720 | 9A50 | FFFF | 0000 | 4689 | 3DF8 | 0001 | C01B | D8F7 |
| 0000022740 | 003D | 7500 | E903 | 000B | 468B | 8EFA | EE06 | 260B |
| 0000022760 | 12A3 | 5E02 | 835F | 02ED | E58B | 5D1F | CB4D | 581E |
| 0000023000 | 4590 | 8B55 | 1EEC | D88E | EC81 | 061A | 5657 | 86C7 |
| 0000023020 | FAF2 | 0000 | 86C6 | FAF4 | C600 | F286 | 00F9 | 681E |
| 0000023040 | 032C | 681E | 0328 | 026A | 016A | FF9A | 00FF | 8900 |
| 0000023060 | F286 | 2BFA | A3C0 | 0F1A | 18A3 | 6A0F | 6A00 | 1E00 |
| 0000023100 | 1868 | 6A0F | 8D00 | FA86 | 16FD | 8D50 | FC46 | 5016 |
| 0000023120 | FF9A | 00FF | 8900 | FA86 | 3DFE | 0001 | C01B | 3D40 |
| 0000023140 | 0000 | 0375 | 34E9 | 8B00 | FA86 | 89FE | F486 | 8DFB |
| 0000023160 | FA86 | 16FD | 8D50 | F486 | 16FA | 9A50 | 0AB4 | 24B3 |
| 0000023200 | C483 | FF08 | FC76 | 681E | 0330 | 868D | F9F2 | 5016 |
| 0000023220 | BA9A | E10B | 8324 | 0AC4 | 4BE9 | C705 | 6206 | 180D |
| 0000023240 | 8C03 | 641E | 1E0D | 3568 | 1E03 | 6268 | 9A0D | FFFF |
| 0000023260 | 0000 | 681E | 033A | 36FF | 0D64 | 36FF | 0D62 | EA9A |
| 0000023300 | 440A | 8325 | 08C4 | 003D | 7400 | E903 | 0009 | 06C7 |
| 0000023320 | 0324 | 0001 | 06E9 | C700 | 2406 | 0003 | 1E00 | 1268 |
| 0000023340 | 9A0F | FFFF | 0000 | 3E83 | 0324 | 7500 | E903 | 000F |
| 0000023360 | 006A | 036A | 1F6A | 36FF | 0F12 | FF9A | 00FF | 9A00 |
| 0000023400 | FFFF | 0000 | 8689 | FAF2 | BE83 | FAF2 | 7500 | E903 |
| 0000023420 | 000A | 86C6 | FAF4 | C600 | F286 | 00F9 | FF9A | 00FF |
| 0000023440 | 9A00 | 234C | 059C | FF9A | 00FF | 9A00 | FFFF | 0000 |
| 0000023460 | 5D9A | 0025 | A300 | 0EB4 | 1689 | 0EB6 | FF9A | 00FF |
| 0000023500 | 5200 | 9A50 | 2595 | 0000 | 8689 | FAF2 | BE83 | FAF2 |
| 0000023520 | 7500 | E903 | 000A | 86C6 | FAF4 | C6D0 | F286 | 00F9 |
| 0000023540 | FF9A | 00FF | A300 | 0308 | 1689 | 030A | 36FF | 030A |
| 0000023560 | 36FF | 0308 | FF9A | 00FF | 9A00 | FFFF | 0000 | 8689 |
| 0000023600 | FAF2 | BE83 | FAF2 | 7500 | E903 | 000A | 86C6 | FAF4 |
| 0000023620 | C600 | F286 | 00F9 | 36FF | 030A | 36FF | 0308 | FF6A |
| 0000023640 | FF6A | 8B9A | 0008 | 8300 | F2BE | 00FA | 0375 | 4DE9 |
| 0000023660 | 8000 | F4BE | 00FA | 0374 | 09E9 | B800 | 0000 | 00BA |
| 0000023700 | E900 | 0006 | 868D | FAF4 | D28C | 8689 | F9EA | 9689 |
| 0000023720 | F9EC | B6FF | FAF2 | B6FF | F9EC | B6FF | F9EA | BE80 |
| 0000023740 | F9F2 | 7400 | E903 | 0009 | 00B8 | BA00 | 0000 | 06E9 |
| 0000023760 | 8D00 | F286 | 8CF9 | 52D2 | 9A50 | 263E | 0000 | FF9A |
| 0000024000 | 00FF | 8900 | F286 | 83FA | F2BE | 00FA | 0375 | 11E9 |
| 0000024020 | FF00 | F2B6 | 6AFA | 6A00 | 6A00 | 6A00 | 9A00 | 267B |
| 0000024040 | 0000 | FF9A | 00FF | A300 | 0308 | 1689 | 030A | 36FF |
| 0000024060 | 030A | 36FF | 0308 | 3C9A | 0027 | 9A00 | FFFF | 0000 |
| 0000024100 | 8689 | FAF2 | BE83 | FAF2 | 7500 | E903 | 0011 | B6FF |
| 0000024120 | FAF2 | 006A | 006A | 006A | 006A | 619A | 0027 | FF00 |
| 0000024140 | 0A36 | FF03 | 0836 | 6A03 | 6AFF | 9AFF | 25C3 | 0000 |
| 0000024160 | 3E83 | 0324 | 7500 | E903 | 000D | 026A | 026A | 006A |
| 0000024200 | 006A | 249A | 0027 | 8300 | 263E | 0003 | 0375 | 0BE9 |

THU MAR 14 17:22:14 1991 CRV.EXE PAGE 12, LINE 650

| | | | | | | | | |
|---|---|---|---|---|---|---|---|---|
| 0000024220 | 6800 | 0258 | AF68 | 9A00 | FFFF | 0000 | FF9A | 00FF |
| 0000024240 | 8900 | F286 | 83FA | F2BE | 00FA | 0375 | 0EE9 | 8B00 |
| 0000024260 | F286 | 89FA | F486 | E9FB | 02F8 | 32E9 | 8E00 | EE06 |
| 0000024300 | 260B | 00A0 | 5002 | FF9A | 00FF | 8900 | F286 | 8EFA |
| 0000024320 | EE06 | 260B | 12A0 | 5002 | FF9A | 00FF | 8900 | F286 |
| 0000024340 | 8EFA | EE06 | 260B | 36FF | 0216 | FF9A | 00FF | 8300 |
| 0000024360 | 243E | 0003 | 0375 | 0FE9 | 6A00 | 6A00 | 6A03 | FF1F |
| 0000024400 | 1236 | 9A0F | 2851 | 0000 | 359A | 0027 | A300 | 0EBA |
| 0000024420 | 1689 | 0EBC | FF9A | 00FF | 5200 | 9A50 | 2564 | 0000 |
| 0000024440 | 8689 | FAF2 | 06C7 | 0EB0 | 0002 | BE83 | FAF2 | 7500 |
| 0000024460 | E903 | 0011 | B6FF | FAF2 | 006A | 006A | 006A | 006A |
| 0000024500 | 859A | 0027 | 9A00 | FFFF | 0000 | 8689 | FAF2 | BE83 |
| 0000024520 | FAF2 | 7500 | E903 | 0011 | B6FF | FAF2 | 006A | 006A |
| 0000024540 | 006A | 006A | FF9A | 00FF | 1E00 | 3B68 | 8D03 | FA86 |
| 0000024560 | 16FB | 9A50 | 0AB4 | 27D1 | C483 | 8D08 | FA86 | 89FB |
| 0000024600 | F686 | 8CFB | F896 | FFFB | 1A36 | FF0F | 1836 | 6A0F |
| 0000024620 | 1E04 | 4268 | 8D03 | F686 | 16FB | 9A50 | FFFF | 0000 |
| 0000024640 | B6FF | FBF8 | B6FF | FBF6 | 868D | FEFC | 5016 | B49A |
| 0000024660 | E30A | 8327 | 08C4 | 681E | 0354 | 868D | FEFC | 5016 |
| 0000024700 | 4E9A | 0B0A | 8328 | 08C4 | 8689 | F9EE | 9689 | F9F0 |
| 0000024720 | D00B | 0374 | 09E9 | C700 | F486 | 08FB | E900 | 01D2 |
| 0000024740 | B6FF | F9F0 | B6FF | F9EE | FA9A | 3608 | 8328 | 04C4 |
| 0000024760 | 868D | FEFC | 5016 | FF9A | 00FF | 8900 | F286 | 83FA |
| 0000025000 | F2BE | 00FA | 0375 | 15E9 | C700 | F486 | FFFB | 1EFF |
| 0000025020 | 5668 | 9A03 | 0A66 | 2875 | C483 | E904 | 0194 | 3E83 |
| 0000025040 | 0324 | 7500 | E903 | 000D | 026A | 026A | 0F6A | 006A |
| 0000025060 | 1B9A | 0025 | 9A00 | FFFF | 0000 | 8689 | FAF2 | BE83 |
| 0000025100 | FAF2 | 7500 | E903 | 0015 | 86C7 | FBF4 | FFFF | 681E |
| 0000025120 | 0365 | 669A | 9E0A | 8324 | 04C4 | 55E9 | 9A01 | FFFF |
| 0000025140 | 0000 | 8689 | FAF2 | BE83 | FAF2 | 7500 | E903 | 0012 |
| 0000025160 | 86C7 | FBF4 | FFFF | 681E | 0378 | 669A | 030A | 8329 |
| 0000025200 | 04C4 | FF9A | 00FF | 9A00 | FFFF | 0000 | 86C6 | FBFA |
| 0000025220 | 8D00 | FA86 | 89FB | F686 | 8CFB | F896 | FFFB | 1A36 |
| 0000025240 | FF0F | 1836 | 6A0F | 1E04 | 9768 | 8D03 | F68E | 16FB |
| 0000025260 | 9A51 | 293B | 0000 | FF9A | 00FF | 8900 | F286 | 83FA |
| 0000025300 | F2BE | 00FA | 0374 | 06E9 | B800 | 03AB | 03E9 | B800 |
| 0000025320 | 03AC | 501E | B6FF | FBF8 | B6FF | FBF6 | 681E | 03B0 |
| 0000025340 | 669A | 150A | 8329 | 0CC4 | 681E | 03CD | 868D | FBFA |
| 0000025360 | 5016 | B49A | 5D0A | 8329 | 08C4 | 868D | FBFA | 8689 |
| 0000025400 | FBF6 | 968C | FBF8 | 36FF | 0F1A | 36FF | 0F18 | 046A |
| 0000025420 | 681E | 03D1 | 868D | FBF6 | 5016 | BC9A | 0027 | 8900 |
| 0000025440 | FA86 | 3DFE | 0001 | C01B | D8F7 | 003D | 7500 | E903 |
| 0000025460 | 0018 | B6FF | FBF8 | B6FF | FBF6 | 2A9A | 790D | 8329 |
| 0000025500 | 04C4 | 8689 | FBF6 | 9689 | FBF8 | 681E | 03E5 | B6FF |
| 0000025520 | FBF8 | B6FF | FBF6 | EA9A | B30A | 8329 | 08C4 | 003D |
| 0000025540 | 7400 | E903 | 000A | 016A | 939A | 0029 | E900 | 0007 |
| 0000025560 | 006A | FF9A | 00FF | 8300 | 243E | 0003 | 0375 | 0FE9 |
| 0000025600 | 6A00 | 6A00 | 6A03 | FFE1 | 1236 | 9A0F | 26A3 | 0000 |
| 0000025620 | 016A | 9668 | 6827 | FFFF | FF9A | 00FF | FF00 | 1A36 |
| 0000025640 | FF0F | 1836 | 6A0F | 9A01 | FFFF | 0000 | 00B8 | E900 |
| 0000025660 | 0057 | B6FF | FBF4 | 006A | 006A | 006A | 006A | 1A9A |
| 0000025700 | 0026 | FF00 | 1A36 | FF0F | 1836 | 6A0F | 9A01 | 29C8 |
| 0000025720 | 0000 | 016A | 9D68 | 6828 | 29B6 | B99A | 0029 | 8B00 |
| 0000025740 | F486 | E9FB | 0023 | 36FF | 0F1A | 36FF | 0F18 | 016A |
| 0000025760 | EE9A | 0029 | 6A00 | 6801 | 29F5 | F868 | 9A29 | 29FB |
| 0000026000 | 0000 | 868B | FBF4 | 00E9 | 5E00 | 835F | 02ED | E58B |
| 0000026020 | 5D1F | CB4D | 581E | 4590 | 8B55 | 1EEC | D88E | EC81 |
| 0000026040 | 0014 | 5657 | 46C7 | 00EC | 8D00 | EE46 | 5016 | 681E |
| 0000026060 | 0EB0 | 006A | 006A | FF9A | 00FF | 8900 | F446 | 003D |

THU MAR 14 17:22:14 1991 CRV.EXE PAGE 13, LINE 709

| | | | | | | | | |
|---|---|---|---|---|---|---|---|---|
| 0000026100 | 7400 | E903 | 00F9 | 76FF | FF08 | 0676 | 76FF | 1EEE |
| 0000026120 | E868 | 9A03 | 2DEB | 2A90 | C483 | 890A | EC46 | 5EC4 |
| 0000026140 | 2606 | 1FC4 | 8326 | 013F | 0374 | C9E9 | 9A00 | 0C2E |
| 0000026160 | 2A18 | 4689 | 89F0 | F256 | 3E83 | 0312 | 7500 | E903 |
| 0000026200 | 0011 | C02B | 4689 | 89FC | FA46 | 06C7 | 0312 | 0000 |
| 0000026220 | 14E9 | 8B00 | F046 | 568B | 2BF2 | 6606 | 1B0D | 6816 |
| 0000026240 | 890D | FA46 | 5689 | 8BFC | F046 | 568B | A3F2 | 0D66 |
| 0000026260 | 1689 | 0D68 | 468B | 8BFA | FC56 | 5EC4 | 2606 | 1FC4 |
| 0000026300 | 8926 | 1C47 | 8926 | 1E57 | 468D | 16F6 | 9A50 | FFFF |
| 0000026320 | 0000 | 4689 | 83F4 | F47E | 7400 | E903 | 0044 | 7E83 |
| 0000026340 | FFF6 | 0374 | 09E9 | 8300 | F87E | 75FF | E903 | 0032 |
| 0000026360 | 468B | 8BF6 | F856 | 5639 | 7DFC | E903 | 001C | 037E |
| 0000026400 | 08E9 | 3900 | FA46 | 0377 | 0FE9 | 8B00 | F646 | 568B |
| 0000026420 | 29F8 | FA46 | 5619 | E9FC | 0008 | C02B | 4689 | 89FC |
| 0000026440 | FA46 | 468B | 8BFA | FC56 | 5EC4 | 2606 | 1FC4 | 8926 |
| 0000026460 | 2047 | 8926 | 2257 | 468B | E9EC | 0284 | 24E9 | 8300 |
| 0000026500 | F47E | 7479 | E903 | 001B | 3E83 | 03E8 | 7500 | E903 |
| 0000026520 | 0011 | AD9A | 002C | C700 | E806 | 0003 | C700 | EA06 |
| 0000026540 | 0103 | 8D00 | EE46 | 5016 | 681E | 0EB0 | 006A | 646A |
| 0000026560 | C69A | 002C | 8900 | F446 | 003D | 7400 | E903 | 00F9 |
| 0000026600 | 76FF | FF08 | 0676 | 76FF | 1EEE | E868 | 9A03 | 2DEB |
| 0000026620 | 2BCA | C483 | 890A | EC46 | 5EC4 | 2606 | 1FC4 | 8326 |
| 0000026640 | 013F | 0374 | C9E9 | 9A00 | 0C2E | 2CF1 | 4689 | 89F0 |
| 0000026660 | F256 | 3E83 | 0312 | 7500 | E903 | 0011 | C02B | 4689 |
| 0000026700 | 89FC | FA46 | 06C7 | 0312 | 0000 | 14E9 | 8B00 | F046 |
| 0000026720 | 568B | 2BF2 | 6606 | 1B0D | 6816 | 890D | FA46 | 5689 |
| 0000026740 | 8BFC | F046 | 568B | A3F2 | 0D66 | 1689 | 0D68 | 468B |
| 0000026760 | 8BFA | FC56 | 5EC4 | 2606 | 1FC4 | 8926 | 1C47 | 8926 |
| 0000027000 | 1E57 | 468D | 16F6 | 9A50 | 2D69 | 0000 | 4689 | 83F4 |
| 0000027020 | F47E | 7400 | E903 | 0044 | 7E83 | FFF6 | 0374 | 09E9 |
| 0000027040 | 8300 | F87E | 75FF | E903 | 0032 | 468B | 8BF6 | F856 |
| 0000027060 | 5639 | 7DFC | E903 | 001C | 037E | 08E9 | 3900 | FA46 |
| 0000027100 | 0377 | 0FE9 | 8B00 | F646 | 568B | 29F8 | FA46 | 5619 |
| 0000027120 | E9FC | 0008 | C02B | 4689 | 89FC | FA46 | 468B | 8BFA |
| 0000027140 | FC56 | 5EC4 | 2606 | 1FC4 | 8926 | 2047 | 8926 | 2257 |
| 0000027160 | 468B | E9EC | 014A | 1EE9 | 8300 | F47E | 7479 | E903 |
| 0000027200 | 0015 | 3E83 | 03EA | 7500 | E903 | 000B | FF9A | 00FF |
| 0000027220 | C700 | EA06 | 0003 | 8D00 | EE46 | 5016 | 681E | 0EB0 |
| 0000027240 | 006A | 8868 | 9A13 | 2A57 | 0000 | 4689 | 3DF4 | 0079 |
| 0000027260 | 0374 | 03E9 | E900 | FFDF | 7E83 | 00F4 | 0374 | F9E9 |
| 0000027300 | FF00 | 0876 | 76FF | FF06 | EE76 | 681E | 03E8 | EB9A |
| 0000027320 | 0B2D | 832D | 0AC4 | 4689 | C4EC | 065E | C426 | 261F |
| 0000027340 | 3F83 | 7401 | E903 | 00C9 | 2E9A | 760C | 892A | F046 |
| 0000027360 | 5689 | 83F2 | 123E | 0003 | 0375 | 11E9 | 2B00 | 89C0 |
| 0000027400 | FC46 | 4689 | C7FA | 1206 | 0003 | E900 | 0014 | 468B |
| 0000027420 | 8BF0 | F256 | 062B | 0D66 | 161B | 0D68 | 4689 | 89FA |
| 0000027440 | FC56 | 468B | 8BF0 | F256 | 66A3 | 890D | 6816 | 8B0D |
| 0000027460 | FA46 | 568B | C4FC | 065E | C426 | 261F | 4789 | 261C |
| 0000027500 | 5789 | 8D1E | F646 | 5016 | EE9A | 002A | 8900 | F446 |
| 0000027520 | 7E83 | 00F4 | 0374 | 44E9 | 8300 | F67E | 74FF | E903 |
| 0000027540 | 0009 | 7E83 | FFF8 | 0375 | 32E9 | 8B00 | F646 | 568B |
| 0000027560 | 39F8 | FC56 | 037D | 1CE9 | 7E00 | E903 | 0008 | 4639 |
| 0000027600 | 77FA | E903 | 000F | 468B | 8BF6 | F856 | 4629 | 19FA |
| 0000027620 | FC56 | 08E9 | 2B00 | 89C0 | FC46 | 4689 | 8BFA | FA46 |
| 0000027640 | 568B | C4FC | 065E | C426 | 261F | 4789 | 2620 | 5789 |
| 0000027660 | 8B22 | EC46 | 09E9 | E900 | 0006 | FFB8 | E9FF | 0000 |
| 0000027700 | 5F5E | ED83 | 8B02 | 1FE5 | 4D5D | 1ECB | 9058 | 5545 |
| 0000027720 | EC8B | 8E1E | 81D8 | 06EC | 5700 | C756 | FA46 | 0000 |
| 0000027740 | 468B | E90A | 0066 | FF9A | 00FF | C400 | 0C5E | 8926 |

```
THU MAR 14 17:22:14 1991  CRV.EXE  PAGE 14, LINE 768

0000027760  2607  5789  9A02  2551  0000  5052  2F9A  002E
0000030000  8900  FA46  55E9  9A00  2729  0000  5052  579A
0000030020  0026  8900  FA46  681E  0F1C  76FF  FF08  0676
0000030040  FF9A  00FF  8900  FC46  7E83  00FC  0375  06E9
0000030060  8B00  FC46  2BE9  C400  0C5E  C726  1C07  260F
0000030100  5F8C  E902  0016  13E9  E900  0010  C00B  0375
0000030120  93E9  48FF  0375  AEE9  E9FF  FFEA  00B8  E900
0000030140  0000  5F5E  ED83  8B02  1FE5  4D5D  1ECB  9058
0000030160  5545  EC8B  8E1E  81D8  24EC  5700  C756  FA46
0000030200  03EC  5E8C  C7FC  F446  0000  C02B  4689  89E6
0000030220  E446  068E  0BF0  8326  FF3E  00FF  0375  1DE9
0000030240  FF00  0636  FF03  0436  8D03  DC46  5016  FF9A
0000030260  00FF  8300  08C4  003D  7400  E903  000F  068E
0000030300  0BF2  8326  BA3E  002F  0375  3BE9  1E00  F068
0000030320  8D03  E846  5016  468D  16DC  8D50  F646  5016
0000030340  5A68  1E02  0868  FF04  0236  FF03  0036  FF03
0000030360  0636  FF03  0436  9A03  FFFF  0000  C483  891E
0000030400  F646  5689  E9F8  0008  C02B  4689  89F8  F646
0000030420  068E  0BF0  8326  A23E  002F  0375  48E9  8300
0000030440  E07E  75FE  E903  003F  76FF  1E06  F468  8D03
0000030460  E846  5016  468D  16F6  8D50  DC46  5016  681E
0000030500  0408  5B68  FF02  0236  FF03  0036  FF03  0636
0000030520  FF03  0436  1E03  0068  6804  FFFF  FF68  9AFF
0000030540  FFFF  0000  C483  9A28  FFFF  0000  FF9A  00FF
0000030560  6A00  FF01  0676  FA9A  0001  8E00  F006  260B
0000030600  3E83  2EB9  7500  E903  0009  7E83  FEE0  0374
0000030620  0FE9  8E00  F206  260B  3E83  FFFF  7500  E903
0000030640  0039  468D  16E8  8D50  F646  5016  468D  16DC
0000030660  1E50  0868  6804  025F  36FF  0302  36FF  0300
0000030700  36FF  0306  36FF  0304  FF9A  00FF  8300  1AC4
0000030720  46C7  00E2  E900  0006  03E9  E900  0000  5F5E
0000030740  ED83  8B02  1FE5  4D5D  1ECB  9058  5545  EC8B
0000030760  8E1E  81D8  04EC  5700  9A56  FFFF  0000  FF9A
0000031000  00FF  6A00  9A01  FFFF  0000  4689  3DFC  0000
0000031020  0375  0FE9  FF00  FC76  681E  0415  669A  5E0A
0000031040  8330  06C4  FF9A  00FF  8900  FC46  003D  7500
0000031060  E903  000F  76FF  1EFC  2E68  9A04  0A66  3087
0000031100  C483  9A06  2F88  0000  8D9A  002F  9A00  FFFF
0000031120  0000  4689  3DFC  0000  0375  0FE9  FF00  FC76
0000031140  681E  0448  669A  B00A  832B  06C4  FF9A  00FF
0000031160  6A00  6A03  6A00  9A00  2A1E  0000  5F5E  ED83
0000031200  8B02  1FE5  4D5D  02CA  1E00  9058  5545  EC8B
0000031220  8E1E  81D8  04EC  5700  C456  065E  8326  013F
0000031240  0375  0EE9  FF00  0876  76FF  9A06  FFFF  0000
0000031260  4689  FFFC  0876  76FF  9A06  FFFF  0000  00E9
0000031300  5E00  835F  02ED  E58B  5D1F  CB4D  581E  4590
0000031320  8B55  1EEC  D88E  EC81  0000  5657  76FF  FF08
0000031340  0676  CC9A  0030  E900  0000  5F5E  ED83  8B02
0000031360  1FE5  4D5D  1ECB  9058  5545  EC8B  8E1E  81D8
0000031400  36EC  5701  C756  F086  18FE  C400  065E  8B26
0000031420  1C47  8B26  1E57  8689  FEF2  9689  FEF4  5EC4
0000031440  2606  478B  2620  578B  8922  D086  89FE  D296
0000031460  C4FE  065E  C02B  8926  1E47  8926  1C47  5EC4
0000031500  2B06  26C0  4789  2622  4789  C420  065E  8326
0000031520  013F  0375  83E9  FF00  0876  76FF  9A06  3103
0000031540  0000  8689  FECA  186A  FF9A  00FF  8900  CA86
0000031560  8DFE  CC86  16FE  9A50  2C28  0000  8689  FECA
0000031600  BE83  FECA  7400  E903  0050  BE83  FECC  74FF
0000031620  E903  000A  BE83  FECE  75FF  E903  003C  868B
```

THU MAR 14 17:22:14 1991 CRV.EXE PAGE 15, LINE 827

| | | | | | | | | |
|---|---|---|---|---|---|---|---|---|
| 0000031640 | FECC | 968B | FECE | 9639 | FED2 | 037D | 21E9 | 7E00 |
| 0000031660 | E903 | 0009 | 8639 | FED0 | 0377 | 13E9 | 8B00 | CC86 |
| 0000031700 | 8BFE | CE96 | 29FE | D086 | 19FE | D296 | E9FE | 000A |
| 0000031720 | C02B | 8689 | FED2 | 8689 | FED0 | 868B | FED0 | 968B |
| 0000031740 | FED2 | 8689 | FEF6 | 9689 | FEF8 | 5EC4 | 2606 | 7F83 |
| 0000031760 | 0B1A | 0374 | 1DE9 | 8D00 | D686 | 16FE | 9A50 | FFFF |
| 0000032000 | 0000 | 868D | FED6 | 5016 | FF9A | 00FF | 8900 | CA86 |
| 0000032020 | E9FE | 000F | 868D | FED6 | 5016 | FF9A | 00FF | 8900 |
| 0000032040 | CA86 | 83FE | CABE | 00FE | 0375 | 10E9 | FF00 | CAB6 |
| 0000032060 | 1EFE | 5E68 | 9A04 | 0A66 | 32DF | C483 | C406 | 065E |
| 0000032100 | 8326 | 1A7F | 741A | E903 | 0009 | 86C7 | FED4 | 0000 |
| 0000032120 | 1CE9 | C400 | 065E | 8326 | 1A7F | 740B | E903 | 0009 |
| 0000032140 | 86C7 | FED4 | 0002 | 06E9 | C700 | D486 | 01FE | 8300 |
| 0000032160 | CABE | 00FE | 0374 | 4BE9 | C400 | 065E | 8326 | 013F |
| 0000032200 | 0374 | 16E9 | 8D00 | D686 | 16FE | FF5D | D4B6 | 9AFE |
| 0000032220 | FFFF | 0000 | 8689 | FECA | 0FE9 | 8D00 | D686 | 16FE |
| 0000032240 | 9A50 | FFFF | 0000 | 8689 | FECA | BE83 | FECA | 7500 |
| 0000032260 | E903 | 0010 | B6FF | FECA | 681E | 0476 | 669A | 3F0A |
| 0000032300 | 8330 | 06C4 | BE83 | FECA | 7500 | E903 | 0026 | 868B |
| 0000032320 | FEF2 | 968B | FEF4 | 5EC4 | 2606 | 4789 | 261C | 5789 |
| 0000032340 | 8B1E | F686 | 8BFE | F896 | C4FE | 065E | 8926 | 2047 |
| 0000032360 | 8926 | 2257 | 868B | FECA | 00E9 | 5E00 | 835F | 02ED |
| 0000032400 | E58B | 5D1F | CB4D | 581E | 4590 | 8B55 | 1EEC | D88E |
| 0000032420 | EC81 | 012C | 5657 | 681E | 0D88 | FF9A | 00FF | A300 |
| 0000032440 | 0EAC | ACA1 | 890E | D486 | 83FE | 883E | 010D | 0374 |
| 0000032460 | 7CE9 | 1E0C | 6868 | 9A0D | FFFF | 0000 | BE83 | FED4 |
| 0000032500 | 7400 | E903 | 0058 | 5EC4 | 2606 | 7F83 | 091A | 0375 |
| 0000032520 | 0DE9 | C400 | 065E | 8326 | 1A7F | 740A | E903 | 0011 |
| 0000032540 | 868D | FED6 | 5016 | 3B9A | 0032 | 8900 | FA46 | 19E9 |
| 0000032560 | 8D00 | D686 | 16FE | 9A50 | 321E | 0000 | 868D | FED6 |
| 0000032600 | 5016 | 299A | 0032 | 8900 | FA46 | 7E83 | 00FA | 0374 |
| 0000032620 | 0BE9 | 8D00 | D686 | 16FE | 9A50 | FFFF | 0000 | FF9A |
| 0000032640 | 00FF | 9A00 | 0C2E | 3258 | 66A3 | 890D | 6816 | 8B0D |
| 0000032660 | D486 | E9FE | 0000 | 5F5E | ED83 | 8B02 | 1FE5 | 4D5D |
| 0000032700 | 1ECB | 9058 | 5545 | EC8B | 8E1E | 81D8 | CCEC | 5700 |
| 0000032720 | 1E56 | 8E68 | 9A04 | FFFF | 0000 | C483 | 8904 | F446 |
| 0000032740 | 5689 | C7F6 | FA46 | 0492 | 5E8C | C7FC | E046 | 0101 |
| 0000032760 | C02B | 4689 | 89CC | CA46 | 068E | 0BF0 | 8326 | C83E |
| 0000033000 | 0034 | 0375 | 1EE9 | FF00 | 0636 | FF03 | 0436 | 8D03 |
| 0000033020 | 3886 | 16FF | 9A50 | 2ECF | 0000 | C483 | 3D08 | 0000 |
| 0000033040 | 0374 | 0FE9 | 8E00 | F206 | 260B | 3E83 | 2EE5 | 7500 |
| 0000033060 | E903 | 003C | 681E | 0496 | 468D | 16CE | 8D50 | 3886 |
| 0000033100 | 16FF | 8D50 | EE46 | 5016 | 0A68 | 1E03 | E068 | FF05 |
| 0000033120 | 0236 | FF03 | 0036 | FF03 | 0636 | FF03 | 0436 | 9A03 |
| 0000033140 | 2F18 | 0000 | C483 | 891E | EE46 | 5689 | E9F0 | 0008 |
| 0000033160 | C02B | 4689 | 89F0 | EE46 | 86C7 | FF36 | 0000 | 86C7 |
| 0000033200 | FF44 | 0000 | 00B8 | 8900 | 4086 | 89FF | 4286 | 89FF |
| 0000033220 | 4686 | 8DFF | 4886 | 16FF | 9A50 | 0C8A | 3526 | C483 |
| 0000033240 | 8E04 | F006 | 260B | 3E83 | 3532 | 7500 | E903 | 004D |
| 0000033260 | BE83 | FF3C | 75FE | E903 | 0043 | 868D | FF48 | 5016 |
| 0000033300 | 681E | 049A | 468D | 16CE | 8D50 | EE46 | 5016 | 868D |
| 0000033320 | FF38 | 5016 | 681E | 05E0 | 1A68 | FF03 | 0236 | FF03 |
| 0000033340 | 0036 | FF03 | 0636 | FF03 | 0436 | 1E03 | A268 | 6804 |
| 0000033360 | 357A | 7D68 | 9A35 | 3580 | 0000 | C483 | 8D2A | 4886 |
| 0000033400 | 16FF | 9A50 | 0CDE | 358A | C483 | 8E04 | F006 | 260B |
| 0000033420 | 3E83 | 2F37 | 7500 | E903 | 004D | BE83 | FF3C | 75FE |
| 0000033440 | E903 | 0043 | 868D | FF48 | 5016 | 681E | 04AA | 468D |
| 0000033460 | 16CE | 8D50 | EE46 | 5016 | 868D | FF38 | 5016 | 681E |
| 0000033500 | 05E0 | 1C68 | FF03 | 0236 | FF03 | 0036 | FF03 | 0636 |

THU MAR 14 17:22:14 1991 CRV.EXE PAGE 16, LINE 836

| | | | | | | | | |
|---|---|---|---|---|---|---|---|---|
| 0000033520 | FF03 | 0436 | IE03 | B268 | 6804 | 2F7A | 7D68 | 9A2F |
| 0000033540 | 2F80 | 0000 | C483 | 9A2A | 241E | 359D | 4689 | 3DE2 |
| 0000033560 | 0000 | 0375 | 0BE9 | FF00 | E276 | 8D9A | C62E | 8333 |
| 0000033600 | 02C4 | 3E83 | 0326 | 7500 | E903 | 0016 | 5868 | 6802 |
| 0000033620 | 00AF | BE9A | 0035 | 6800 | 04B0 | AF68 | 9A00 | 26B8 |
| 0000033640 | 0000 | 46C7 | 00EC | 8300 | EC7E | 7501 | E903 | 1535 |
| 0000033660 | 468D | 16E4 | 9A50 | 2A34 | 34BC | C483 | 8904 | DA46 |
| 0000033700 | 7E83 | 00DA | 0375 | 00E9 | 8300 | 103E | 0003 | 0374 |
| 0000033720 | 2DE9 | 8E00 | EE06 | 260B | 3E83 | 0216 | 7401 | E903 |
| 0000033740 | 001E | 5EC4 | 26E4 | 478B | 261C | 578B | C41E | E45E |
| 0000033760 | 2B26 | 2047 | 1B26 | 2257 | 0601 | 0314 | 1611 | 0316 |
| 0000034000 | 5EC4 | 26E4 | 478B | E91A | 140F | 3E83 | 030C | 7400 |
| 0000034020 | E903 | 000B | 709A | 0036 | C700 | 0C06 | 0103 | 8B00 |
| 0000034040 | E446 | 568B | 05E6 | 0024 | 5052 | FF9A | 00FF | C400 |
| 0000034060 | E45E | 8926 | 2487 | FF01 | E676 | 76FF | 9AE4 | FFFF |
| 0000034100 | 0000 | 79E9 | 8314 | 0C3E | 0003 | 0374 | 0BE9 | 9A00 |
| 0000034120 | FFFF | 0000 | 06C7 | 030C | 0001 | FF9A | 00FF | C400 |
| 0000034140 | E45E | 8A26 | 2447 | 9A50 | FFFF | 0000 | 5EC4 | 26E4 |
| 0000034160 | 8789 | 0124 | 3E83 | 030E | 7500 | E903 | 0005 | FF9A |
| 0000034200 | 00FF | FF00 | E676 | 76FF | 9AE4 | 3708 | 0000 | 2DE9 |
| 0000034220 | 9A14 | 376E | 0000 | C02B | 4689 | 89EA | E846 | 468B |
| 0000034240 | 8BE4 | E656 | 2405 | 5200 | 8D50 | E846 | 5016 | 4E8D |
| 0000034260 | 16DC | 6A5I | FF02 | F876 | 379A | 0037 | 8900 | E246 |
| 0000034300 | 76FF | FFEA | E876 | FF9A | 00FF | FF00 | EA76 | 76FF |
| 0000034320 | 9AE8 | FFFF | 0000 | 468B | C4E2 | E45E | 8926 | 2487 |
| 0000034340 | FF01 | E676 | 76FF | 9AE4 | 3766 | 0000 | CFE9 | 9A13 |
| 0000034360 | 3790 | 0000 | C02B | 4689 | 89EA | E846 | 468B | 8BE4 |
| 0000034400 | E656 | 2405 | 5200 | 8D50 | E846 | 5016 | 4E8D | 16DC |
| 0000034420 | 6A51 | FF02 | F876 | FF9A | 00FF | 8900 | E246 | 76FF |
| 0000034440 | FFEA | E876 | FF9A | 00FF | FF00 | EA76 | 76FF | 9AE8 |
| 0000034460 | FFFF | 0000 | 468B | C4E2 | E45E | 8926 | 2487 | FF01 |
| 0000034500 | E676 | 76FF | 9AE4 | 3788 | 0000 | 71E9 | 9A13 | 301A |
| 0000034520 | 0000 | FF9A | 00FF | C400 | E45E | C726 | 2487 | 0001 |
| 0000034540 | FF00 | E676 | 76FF | 9AE4 | 37AA | 0000 | 4FE9 | 9A13 |
| 0000034560 | 301F | 0000 | FF9A | 00FF | C400 | E45E | C726 | 2487 |
| 0000034600 | 0001 | FF00 | E676 | 76FF | 9AE4 | FFFF | 0000 | 2DE9 |
| 0000034620 | C713 | 3486 | 00FF | 8300 | EC7E | 7402 | E903 | 0027 |
| 0000034640 | 46C7 | 00EC | FF00 | E676 | 76FF | 9AE4 | 3326 | 383F |
| 0000034660 | C483 | 8904 | 3486 | 83FF | 34BE | 00FF | 0374 | 06E9 |
| 0000034700 | C700 | 3686 | 00FF | 8300 | EC7E | 7400 | E903 | 0148 |
| 0000034720 | 3E83 | 030C | 7400 | E903 | 000B | 689A | 0039 | C700 |
| 0000034740 | 0C06 | 0103 | FF00 | E676 | 76FF | 9AE4 | FFFF | 0000 |
| 0000034760 | 4689 | 83F2 | 36BE | 00FF | 0375 | 2DE9 | C400 | E45E |
| 0000035000 | 8326 | 013F | 0374 | 1BE9 | C400 | E45E | 8326 | 1A7F |
| 0000035020 | 750B | E903 | 000E | 76FF | FFE6 | E476 | 159A | 6231 |
| 0000035040 | 8338 | 04C4 | 86C7 | FF36 | 0000 | 7E83 | 01F2 | 0374 |
| 0000035060 | 06E9 | C700 | 3686 | 01FF | FF00 | E676 | 76FF | 9AE4 |
| 0000035100 | 30A9 | 3992 | C483 | C404 | E45E | 8926 | 2487 | 8E01 |
| 0000035120 | F006 | 260B | 3E83 | 341F | 7500 | E903 | 005E | BE83 |
| 0000035140 | FF3C | 75FE | E903 | 0054 | 5EC4 | 26E4 | 37FF | 5EC4 |
| 0000035160 | 26E4 | 478A | 2A24 | 50E4 | 5EC4 | 26E4 | 77FF | 1E1A |
| 0000035200 | BA68 | 8D04 | CE46 | 5016 | 468D | 16EE | 8D50 | 3886 |
| 0000035220 | 16FF | 1E50 | E068 | 6805 | 039C | 36FF | 0302 | 36FF |
| 0000035240 | 0300 | 36FF | 0306 | 36FF | 0304 | 681E | 04DB | 1068 |
| 0000035260 | 6835 | 3513 | 169A | 0035 | 8300 | 2CC4 | 5EC4 | 26E4 |
| 0000035300 | 3F83 | 7401 | E903 | 0042 | 3E83 | 030E | 7400 | E903 |
| 0000035320 | 000B | 76FF | FFE6 | E476 | FF9A | 00FF | 8100 | 34BE |
| 0000035340 | F3FF | 7406 | E903 | 001F | 0C6A | 899A | 0031 | 8900 |
| 0000035360 | DA46 | 3E83 | 0326 | 7500 | E903 | 000B | 5868 | 6802 |

THU MAR 14 17:22:14 1991 CRV.EXE PAGE 17, LINE 945

| | | | | | | | | |
|---|---|---|---|---|---|---|---|---|
| 0000035400 | 00AF | B39A | 0035 | E900 | 000B | 76FF | FFE6 | E476 |
| 0000035420 | FF9A | 00FF | E900 | 0067 | 7E83 | 03EC | 0374 | 13E9 |
| 0000035440 | FF00 | E676 | 76FF | 9AE4 | FFFF | 0000 | 5EC4 | 26E4 |
| 0000035460 | 8789 | 0124 | 7E83 | 04EC | 0374 | 42E9 | 8300 | 0C3E |
| 0000035500 | 0003 | 0374 | 0BE9 | 9A00 | 3635 | 0000 | 06C7 | 030C |
| 0000035520 | 0001 | 76FF | FFE6 | E476 | FF9A | 00FF | 8900 | C846 |
| 0000035540 | 7E83 | 01C8 | 0374 | 16E9 | FF00 | E676 | 76FF | 9AE4 |
| 0000035560 | 30A9 | 35D8 | C483 | C404 | E45E | 8926 | 2487 | E901 |
| 0000035600 | 113C | 76FF | FFE6 | E476 | FF9A | 00FF | C400 | E45E |
| 0000035620 | 8926 | 2487 | FF01 | E676 | 76FF | 9AE4 | 39D7 | 0000 |
| 0000035640 | 1BE9 | 9A11 | FFFF | 0000 | 5EC4 | 26E4 | 8789 | 0124 |
| 0000035660 | 76FF | FFE6 | E476 | AA9A | 0036 | E900 | 1100 | 5EC4 |
| 0000035700 | 26E4 | 7F83 | 017C | 0374 | 4AE9 | 8D00 | 4086 | 16FF |
| 0000035720 | FF50 | EC76 | 36FF | 030E | 36FF | 030C | 929A | CE4B |
| 0000035740 | 8337 | 0AC4 | 46C7 | 03EC | C700 | 0C06 | 0103 | 9A00 |
| 0000035760 | 37FB | 0000 | 06C7 | 030E | 0000 | 7B9A | 0036 | FF00 |
| 0000036000 | E676 | 76FF | 9AE4 | FFFF | 0000 | 5EC4 | 26E4 | 8789 |
| 0000036020 | 0124 | 38E9 | FF00 | E676 | 76FF | 9AE4 | 3A26 | 0000 |
| 0000036040 | 5EC4 | 26E4 | 8789 | 0124 | E69A | 003A | 9A00 | 3AEB |
| 0000036060 | 0000 | 868D | FF40 | 5016 | 468D | 16EC | 1E50 | 0E68 |
| 0000036100 | 1E03 | 0C68 | 9A03 | 4BE0 | 3A9C | C483 | FF10 | E676 |
| 0000036120 | 76FF | 9AE4 | 3B11 | 0000 | 63E9 | C410 | E45E | 8326 |
| 0000036140 | 7C7F | 7401 | E903 | 004A | 868D | FF40 | 5016 | 76FF |
| 0000036160 | FFEC | 0E36 | FF03 | 0C36 | 9A03 | 4B92 | 3B05 | C483 |
| 0000036200 | C70A | EC46 | 0003 | 06C7 | 030C | 0001 | 109A | 003A |
| 0000036220 | C700 | 0E06 | 0003 | 9A00 | 3A1B | 0000 | 76FF | FFE6 |
| 0000036240 | E476 | D99A | 003A | C400 | E45E | 8926 | 2487 | E901 |
| 0000036260 | 0038 | 76FF | FFE6 | E476 | FF9A | 00FF | C400 | E45E |
| 0000036300 | 8926 | 2487 | 9A01 | 3064 | 0000 | FF9A | 00FF | 8D00 |
| 0000036320 | 4086 | 16FF | 8D50 | EC46 | 5016 | 681E | 030E | 681E |
| 0000036340 | 030C | E09A | 7E4B | 833B | 10C4 | 76FF | FFE6 | E476 |
| 0000036360 | 329A | 003B | E900 | 0FC6 | 76FF | FFE6 | E476 | FF9A |
| 0000036400 | 00FF | C400 | E45E | 8926 | 2487 | FF01 | E676 | 76FF |
| 0000036420 | 9AE4 | 3B4F | 0000 | A5E9 | 6A0F | 9A00 | FFFF | 0000 |
| 0000036440 | 5EC4 | 26E4 | 8789 | 0124 | 76FF | FFE6 | E476 | 709A |
| 0000036460 | 003B | E900 | 0F88 | 76FF | FFE6 | E476 | FF9A | 00FF |
| 0000036500 | C400 | E45E | 8926 | 2487 | FF01 | E676 | 76FF | 9AE4 |
| 0000036520 | 3B9E | 0000 | 67E9 | 1E0F | E168 | 9A04 | 0B14 | 3BAC |
| 0000036540 | C483 | 0B04 | 75D0 | E903 | 001B | FF9A | 00FF | C40C |
| 0000036560 | E45E | 8926 | 2487 | FF01 | E676 | 76FF | 9AE4 | 3BCC |
| 0000036600 | 0000 | 39E9 | 1E0F | F168 | 9A04 | 0B14 | 39FF | C483 |
| 0000036620 | 0B04 | 75D0 | E903 | 001B | FF9A | 00FF | C400 | E45E |
| 0000036640 | 8926 | 2487 | FF01 | E676 | 76FF | 9AE4 | 39BC | 0000 |
| 0000036660 | 0BE9 | C70F | 0E06 | 0103 | 9A00 | 369F | 0000 | 06C7 |
| 0000036700 | 030C | 0001 | AD9A | 003A | FF00 | E676 | 76FF | 9AE4 |
| 0000036720 | FFFF | 0000 | 5EC4 | 26E4 | 8789 | 0124 | 76FF | FFE6 |
| 0000036740 | E476 | 749A | 003A | 8E00 | F006 | 260B | 3E83 | 3876 |
| 0000036760 | 7500 | E903 | 004F | BE83 | FF3C | 75FE | E903 | 0045 |
| 0000037000 | 5EC4 | 26E4 | B7FF | 0124 | 681E | 04FC | 468D | 16CE |
| 0000037020 | 8D50 | EE46 | 5016 | 868D | FF38 | 5016 | 681E | 05E0 |
| 0000037040 | 3E68 | FF04 | 0236 | FF03 | 0036 | FFC3 | 0636 | FF03 |
| 0000037060 | 0436 | 1E03 | 0F68 | 6805 | 38CF | D268 | 9A38 | 38D5 |
| 0000037100 | 0000 | C483 | E928 | 0E76 | 7E83 | 02EC | 0374 | 13E9 |
| 0000037120 | C700 | EC46 | 0000 | 76FF | FFE6 | E476 | 269A | 6833 |
| 0000037140 | 833A | 04C4 | E59A | 003B | C700 | 0C06 | 0103 | 8D00 |
| 0000037160 | 4086 | 16FF | FF50 | EC76 | 36FF | 030E | 36FF | 030C |
| 0000037200 | 929A | DC4B | 833C | 0AC4 | 06C7 | 030E | 0001 | DA9A |
| 0000037220 | 003B | FF00 | E676 | 76FF | 9AE4 | 3398 | 0000 | 5EC4 |
| 0000037240 | 26E4 | 8789 | 0124 | 868D | FF40 | 5016 | 468D | 16EC |

THU MAR 14 17:22:14 1991 CRV.EXE PAGE 18, LINE 1004

| | | | | | | | | |
|---|---|---|---|---|---|---|---|---|
| 0000037260 | 1E50 | 0E68 | 1E03 | 0C68 | 9A03 | 4BE0 | 3DD3 | C483 |
| 0000037300 | FF10 | E676 | 76FF | 9AE4 | FFFF | 0000 | 068E | 0BF0 |
| 0000037320 | 8326 | 573E | 003D | 0375 | 55E9 | 8300 | 3CBE | FEFF |
| 0000037340 | 0375 | 4BE9 | C400 | E45E | FF26 | 2A77 | 5EC4 | 26E4 |
| 0000037360 | 77FF | 1E28 | 1768 | 8D05 | CE46 | 5016 | 468D | 16EE |
| 0000037400 | 8D50 | 3886 | 16FF | 1E50 | E068 | 6805 | 045A | 36FF |
| 0000037420 | 0302 | 36FF | 0300 | 36FF | 0306 | 36FF | 0304 | 681E |
| 0000037440 | 0532 | A168 | 683D | 3DA4 | A79A | 003D | 8300 | 2AC4 |
| 0000037460 | 068E | 0BF0 | 8326 | 0E3E | 003C | 0375 | 4FE9 | 8300 |
| 0000037500 | 3CBE | FEFF | 0375 | 45E9 | C400 | E45E | FF26 | 24B7 |
| 0000037520 | 1E01 | 3A68 | 8D05 | CE46 | 5016 | 468D | 16EE | 8D50 |
| 0000037540 | 3886 | 16FF | 1E50 | E068 | 6805 | 045D | 36FF | 0302 |
| 0000037560 | 36FF | 0300 | 36FF | 0306 | 36FF | 0304 | 681E | 0548 |
| 0000037600 | 5868 | 683C | 3C5B | 5E9A | 003C | 8300 | 28C4 | 2DE9 |
| 0000037620 | C70D | E246 | 0000 | 7E83 | 04EC | 0375 | 40E9 | 8D00 |
| 0000037640 | 4086 | 16FF | FF50 | EC76 | 36FF | 030E | 36FF | 030C |
| 0000037660 | 929A | 7F4B | 833E | 0AC4 | 9C9A | 003E | 8900 | E246 |
| 0000037700 | 7E83 | 00E2 | 0375 | 16E9 | 8B00 | E246 | 5EC4 | 26E4 |
| 0000037720 | 8789 | 0124 | 76FF | FFE6 | E476 | 8B9A | 003E | 8300 |
| 0000037740 | E27E | 7400 | E903 | 0087 | 46C7 | 04EC | 8300 | 0C3E |
| 0000037760 | 0003 | 0374 | 0BE9 | 9A00 | 3F10 | 0000 | 06C7 | 030C |
| 0000040000 | 0001 | 3E83 | 030E | 7500 | E903 | 000B | B89A | 003A |
| 0000040020 | C700 | 0E06 | 0003 | FF00 | E676 | 76FF | 9AE4 | 3ED1 |
| 0000040040 | 0000 | 4689 | 83C8 | C87E | 7403 | E903 | 0036 | E29A |
| 0000040060 | 003E | 8900 | E246 | 7E83 | 00E2 | 0374 | 25E9 | 9A00 |
| 0000040100 | 3A49 | 0000 | 4E9A | 003A | 8D00 | 4086 | 16FF | 8D50 |
| 0000040120 | EC46 | 5016 | 681E | 030E | 681E | 030C | E09A | 7F4B |
| 0000040140 | 833C | 10C4 | 76FF | FFE6 | E476 | BE9A | 003E | E900 |
| 0000040160 | 0C4C | 7E83 | 04EC | 0375 | 2FE9 | 9A00 | FFFF | 0000 |
| 0000040200 | 4689 | 83E2 | E27E | 7500 | E903 | 0019 | 468B | C4E2 |
| 0000040220 | E45E | 8926 | 24B7 | FF01 | E676 | 76FF | 9AE4 | 3EFE |
| 0000040240 | 0000 | 05E9 | C700 | EC46 | 0004 | 76FF | FFE6 | E476 |
| 0000040260 | 799A | 0039 | 8900 | C846 | 7E83 | 03C8 | 0374 | 16E9 |
| 0000040300 | 9A00 | FFFF | 0000 | 4689 | 83E2 | E27E | 7400 | E903 |
| 0000040320 | 0005 | 46C7 | 00EC | FF00 | E676 | 76FF | 9AE4 | 3C03 |
| 0000040340 | 0000 | D9E9 | 830B | 0C3E | 0003 | 0374 | 0BE9 | 9A00 |
| 0000040360 | 3C85 | 0000 | 06C7 | 030C | 0001 | 7E83 | 00EC | 0374 |
| 0000040400 | A1E9 | C700 | EC46 | 0002 | 468B | 8BE4 | E656 | BF1E |
| 0000040420 | 0D88 | F08B | 071E | DA8E | 94B9 | F300 | 1FA5 | 681E |
| 0000040440 | 0D88 | 919A | 0041 | A300 | 0EAC | 5EC4 | 26E4 | 3F83 |
| 0000040460 | 7401 | E903 | 006E | 681E | 0D88 | FF9A | 00FF | 8900 |
| 0000040500 | DA46 | 7E83 | 00DA | 0375 | 59E9 | 8E00 | F006 | 260B |
| 0000040520 | 3E83 | 4040 | 7500 | E903 | 004A | BE83 | FF3C | 75FE |
| 0000040540 | E903 | 0040 | 76FF | 1EDA | 5068 | 8D05 | CE46 | 5016 |
| 0000040560 | 468D | 16EE | 8D50 | 3886 | 16FF | 1E50 | E068 | 6805 |
| 0000040600 | 04B5 | 36FF | 0302 | 36FF | 0300 | 36FF | 0306 | 36FF |
| 0000040620 | 0304 | 681E | 0566 | 8568 | 6840 | 4088 | 8B9A | 0040 |
| 0000040640 | 8300 | 28C4 | 7E83 | 02EC | 0374 | 4EE9 | FF01 | E676 |
| 0000040660 | 76FF | 9AE4 | FFFF | 0000 | 5EC4 | 26E4 | 8789 | 0124 |
| 0000040700 | 5EC4 | 26E4 | BF81 | 0124 | 06F2 | 0374 | 0FE9 | C700 |
| 0000040720 | EC46 | 0000 | 5EC4 | 26E4 | 87C7 | 0124 | 0000 | 5EC4 |
| 0000040740 | 26E4 | 3F83 | 7401 | E903 | 008B | 3E83 | 030E | 7400 |
| 0000040760 | E903 | 007E | 5EC4 | 26E4 | BF83 | 0124 | 7400 | E903 |
| 0000041000 | 0070 | 76FF | FFE6 | E476 | FF9A | 00FF | 8900 | DA46 |
| 0000041020 | 7E83 | 00DA | 0375 | 59E9 | 8E00 | F006 | 260B | 3E83 |
| 0000041040 | 40C1 | 7500 | E903 | 004A | BE83 | FF3C | 75FE | E903 |
| 0000041060 | 0040 | 76FF | 1EDA | 6E68 | 8D05 | CE46 | 5016 | 468D |
| 0000041100 | 16EE | 8D50 | 3886 | 16FF | 1E50 | E068 | 6805 | 04D0 |
| 0000041120 | 36FF | 0302 | 36FF | 0300 | 36FF | 0306 | 36FF | 0304 |

THU MAR 14 17:22:14 1991 CRV.EXE PAGE 19, LINE 1063

| | | | | | | | | |
|---|---|---|---|---|---|---|---|---|
| 0000041140 | 681E | 0584 | 0B68 | 6841 | 410E | 119A | 0041 | 8300 |
| 0000041160 | 28C4 | 83E9 | C400 | E45E | 8326 | 003F | 0374 | 0BE9 |
| 0000041200 | FF00 | E676 | 76FF | 9AE4 | 41B0 | 0000 | 5EC4 | 26E4 |
| 0000041220 | BF83 | 0124 | 7500 | E903 | 005E | 068E | 0BF0 | 8326 |
| 0000041240 | F33E | 003C | 0375 | 4FE9 | 8300 | 3CBE | FEFF | 0375 |
| 0000041260 | 45E9 | C400 | E45E | FF26 | 24B7 | 1E01 | 8C68 | 8D05 |
| 0000041300 | CE46 | 5016 | 468D | 16EE | 8D50 | 3886 | 16FF | 1E50 |
| 0000041320 | E068 | 6805 | 04E5 | 36FF | 0302 | 36FF | 0300 | 36FF |
| 0000041340 | 0306 | 36FF | 0304 | 681E | 05A3 | 4368 | 683D | 3D46 |
| 0000041360 | 499A | 003D | 8300 | 28C4 | 67E9 | 8300 | EC7E | 7403 |
| 0000041400 | E903 | 0016 | 76FF | FFE6 | E476 | 489A | 0039 | C400 |
| 0000041420 | E45E | 8926 | 2487 | E901 | 0048 | 7E83 | 04EC | 0374 |
| 0000041440 | 3FE9 | 8300 | 0C3E | 0003 | 0374 | 0BE9 | 9A00 | 3E18 |
| 0000041460 | 0000 | 06C7 | 030C | 0001 | 76FF | FFE6 | E476 | 3E9A |
| 0000041500 | 003E | 8900 | C846 | 7E83 | 01C8 | 0374 | 13E9 | FF00 |
| 0000041520 | E676 | 76FF | 9AE4 | 30DA | 0000 | 5EC4 | 26E4 | 8789 |
| 0000041540 | 0124 | 59E9 | C709 | EC46 | 0002 | 76FF | FFE6 | E476 |
| 0000041560 | FF9A | 00FF | C400 | E45E | 8926 | 2487 | C401 | E45E |
| 0000041600 | 8326 | 003F | 0374 | 0BE9 | FF00 | E676 | 76FF | 9AE4 |
| 0000041620 | 41F8 | 0000 | 27E9 | 8309 | EC7E | 7402 | E903 | 001B |
| 0000041640 | 46C7 | 00EC | FF00 | E676 | 76FF | 9AE4 | 333B | 0000 |
| 0000041660 | 5EC4 | 26E4 | 8789 | 0124 | 0AE9 | C400 | E45E | C726 |
| 0000041700 | 2487 | C801 | C400 | E45E | 8326 | 013F | 0375 | 0BE9 |
| 0000041720 | FF00 | E676 | 76FF | 9AE4 | 3DFB | 0000 | DFE9 | 2B08 |
| 0000041740 | A3C0 | 0316 | 14A3 | C403 | E45E | 8326 | 247F | 7401 |
| 0000041760 | E903 | 006B | 06C7 | 0310 | 0001 | 681E | 05AB | 669A |
| 0000042000 | A30A | 833C | 04C4 | 7E83 | 02EC | 0374 | 13E9 | C700 |
| 0000042020 | EC46 | 0000 | 76FF | FFE6 | E476 | 269A | 5E33 | 8342 |
| 0000042040 | 04C4 | 86C7 | FF36 | 0001 | 369A | 0043 | 8900 | DA46 |
| 0000042060 | 2D9A | 003E | C700 | 0E06 | 0003 | 9A00 | 0C2E | 4286 |
| 0000042100 | 66A3 | 890D | 6816 | 830D | 0C3E | 0003 | 0374 | 0BE9 |
| 0000042120 | 9A00 | 414E | 0000 | 06C7 | 030C | 0001 | 3FE9 | 1E00 |
| 0000042140 | BB68 | 9A05 | 0A66 | 42B9 | C483 | C704 | 1006 | 0003 |
| 0000042160 | 9A00 | 42D7 | 0000 | 06C7 | 030E | 0001 | 86C7 | FF36 |
| 0000042200 | 0000 | 7E83 | 02EC | 0374 | 13E9 | C700 | EC46 | 0000 |
| 0000042220 | 76FF | FFE6 | E476 | 269A | 1833 | 8343 | 04C4 | 5EC4 |
| 0000042240 | 26E4 | 87C7 | 0124 | 0000 | 76FF | FFE6 | E476 | 2E9A |
| 0000042260 | 0043 | E900 | 080B | AF9A | 003C | C700 | 0E06 | 0103 |
| 0000042300 | 9A00 | 4344 | 0000 | 06C7 | 030C | 0000 | 4F9A | 0043 |
| 0000042320 | 9A00 | 437D | 0000 | 759A | 0043 | C700 | 3686 | 00FF |
| 0000042340 | 8300 | EC7E | 7402 | E903 | 0013 | 46C7 | 00EC | FF00 |
| 0000042360 | E676 | 76FF | 9AE4 | 3326 | 436A | C483 | C404 | E45E |
| 0000042400 | C726 | 2487 | 0001 | FF00 | E676 | 76FF | 9AE4 | 4390 |
| 0000042420 | 0000 | A9E9 | 9A07 | 3E60 | 0000 | 4689 | C7DA | 0E06 |
| 0000042440 | 0103 | 9A00 | 3069 | 0000 | 06C7 | 030C | 0000 | FF9A |
| 0000042460 | 00FF | 8300 | EC7E | 7402 | E903 | 0013 | 46C7 | 00EC |
| 0000042500 | FF00 | E676 | 76FF | 9AE4 | 3326 | 4221 | C483 | 9A04 |
| 0000042520 | FFFF | 0000 | FF9A | 00FF | C700 | 3686 | 00FF | C400 |
| 0000042540 | E45E | C726 | 2487 | 0001 | FF00 | E676 | 76FF | 9AE4 |
| 0000042560 | 40A8 | 0000 | 47E9 | 9A07 | 4519 | 0000 | 1E9A | 0045 |
| 0000042600 | C700 | 3686 | 00FF | 8300 | EC7E | 7402 | E903 | 0013 |
| 0000042620 | 46C7 | 00EC | FF00 | E676 | 76FF | 9AE4 | 3326 | 43F5 |
| 0000042640 | C483 | C404 | E45E | C726 | 2487 | 0001 | FF00 | E676 |
| 0000042660 | 76FF | 9AE4 | 43EC | 0000 | 03E9 | C407 | E45E | C726 |
| 0000042700 | 2487 | 0001 | FF00 | E676 | 76FF | 9AE4 | 4449 | 0000 |
| 0000042720 | 006A | 8D9A | 352E | 8344 | 02C4 | 46C7 | 01EC | E900 |
| 0000042740 | 06DC | 7E83 | 03EC | 0375 | 42E9 | 8300 | 0C3E | 0003 |
| 0000042760 | 0374 | 0BE9 | 9A00 | 450E | 0000 | 06C7 | 030C | 0001 |
| 0000043000 | 5EC4 | 26E4 | 3F83 | 7400 | E903 | 0021 | 76FF | FFE6 |

THU MAR 14 17:22:14 1991 CRV.EXE PAGE 20, LINE 1122

| | | | | | | | | |
|---|---|---|---|---|---|---|---|---|
| 0000043020 | E476 | EC9A | D130 | 8344 | 04C4 | 5EC4 | 26E4 | 8789 |
| 0000043040 | 0124 | 76FF | FFE6 | E476 | CF9A | 0042 | E900 | 068E |
| 0000043060 | 7E83 | 04EC | 0374 | 43E9 | 6A00 | 6A00 | 9A00 | 415F |
| 0000043100 | 0000 | 4689 | 83C8 | C87E | 7402 | E903 | 0000 | A69A |
| 0000043120 | 0044 | 3D00 | 0000 | 0375 | 1EE9 | 8300 | C87E | 7402 |
| 0000043140 | E903 | 0005 | 499A | 0042 | 9A00 | 4251 | 0000 | 06C7 |
| 0000043160 | 030E | 0000 | B39A | 0044 | E900 | 0064 | 7E83 | 03EC |
| 0000043200 | 0374 | 15E9 | 9A00 | FFFF | 0000 | 003D | 7500 | E903 |
| 0000043220 | 0005 | 659A | 003E | E900 | 0046 | 7E83 | 02EC | 0374 |
| 0000043240 | 13E9 | C700 | EC46 | 0000 | 76FF | FFE6 | E476 | 269A |
| 0000043260 | 3F33 | 8345 | 04C4 | 5EC4 | 26E4 | 87C7 | 0124 | 0000 |
| 0000043300 | 76FF | FFE6 | E476 | FF9A | 00FF | 8300 | 263E | 0003 |
| 0000043320 | 0375 | 0BE9 | 6800 | 0258 | AF68 | 9A00 | 3923 | 0000 |
| 0000043340 | DBE9 | 8305 | 0C3E | 0003 | 0374 | 0BE9 | 9A00 | 4272 |
| 0000043360 | 0000 | 06C7 | 030C | 0001 | F29A | 0042 | 9A00 | 42F7 |
| 0000043400 | 0000 | 86C7 | FF36 | 0000 | 7E83 | 02EC | 0374 | 13E9 |
| 0000043420 | C700 | EC46 | 0000 | 76FF | FFE6 | E476 | 269A | 3D33 |
| 0000043440 | 8342 | 04C4 | 3E83 | 0310 | 7500 | E903 | 000D | C19A |
| 0000043460 | 0045 | 3D00 | 0000 | 0374 | 0EE9 | FF00 | E676 | 76FF |
| 0000043500 | 9AE4 | 464F | 0000 | 4689 | 6ADA | 9A28 | 4659 | 0000 |
| 0000043520 | 4689 | 83DA | 263E | 0003 | 0375 | 0BE9 | 6800 | 0258 |
| 0000043540 | AF68 | 9A00 | 45AC | 0000 | 76FF | FFE6 | E476 | FF9A |
| 0000043560 | 00FF | C400 | E45E | 8926 | 2487 | 8301 | 263E | 0003 |
| 0000043600 | 0375 | 0BE9 | 6800 | 04B0 | AF68 | 9A00 | 4671 | 0000 |
| 0000043620 | 06C7 | 0312 | 0001 | 3E83 | 0310 | 7500 | E903 | 0022 |
| 0000043640 | 3C9A | 0046 | 3D00 | 0000 | 0375 | 15E9 | 9A00 | 46BB |
| 0000043660 | 0000 | C09A | 0046 | C700 | 0E06 | 0003 | 9A00 | 46CB |
| 0000043700 | 0000 | 76FF | FFE6 | E476 | D69A | 0046 | E900 | 04EE |
| 0000043720 | 3E83 | 030C | 7400 | E903 | 000B | E89A | 0046 | C700 |
| 0000043740 | 0C06 | 0103 | 9A00 | 46F3 | 0000 | F89A | 0046 | C700 |
| 0000043760 | 3686 | 00FF | 8300 | EC7E | 7402 | E903 | 0013 | 46C7 |
| 0000044000 | 00EC | FF00 | E676 | 76FF | 9AE4 | 3326 | 4719 | C483 |
| 0000044020 | 8304 | 103E | 0003 | 0375 | 0DE9 | 9A00 | 46AE | 0000 |
| 0000044040 | 003D | 7400 | E903 | 000E | 76FF | FFE6 | E476 | 7E9A |
| 0000044060 | 0031 | 8900 | DA46 | 2A6A | 219A | 0047 | 8900 | DA46 |
| 0000044100 | 3E83 | 0326 | 7500 | E903 | 000B | 5868 | 6802 | 00AF |
| 0000044120 | 999A | 0046 | FF00 | E676 | 76FF | 9AE4 | FFFF | 0000 |
| 0000044140 | 5EC4 | 26E4 | 8789 | 0124 | 3E83 | 0326 | 7500 | E903 |
| 0000044160 | 000B | B068 | 6804 | 00AF | FC9A | 0044 | C700 | 1206 |
| 0000044200 | 0103 | 8300 | 103E | 0003 | 0375 | 22E9 | 9A00 | 446F |
| 0000044220 | 0000 | 003D | 7500 | E903 | 0015 | 859A | 0044 | 9A00 |
| 0000044240 | 448A | 0000 | 06C7 | 030E | 0000 | 959A | 0044 | FF00 |
| 0000044260 | E676 | 76FF | 9AE4 | FFFF | 0000 | 01E9 | 8304 | 0C3E |
| 0000044300 | 0003 | 0374 | 0BE9 | 9A00 | 4416 | 0000 | 06C7 | 030C |
| 0000044320 | 0001 | 989A | 0043 | 9A00 | 439D | 0000 | 86C7 | FF36 |
| 0000044340 | 0000 | 7E83 | 02EC | 0374 | 13E9 | C700 | EC46 | 0000 |
| 0000044360 | 76FF | FFE6 | E476 | 269A | BE33 | 8343 | 04C4 | 2B6A |
| 0000044400 | 0B9A | 0039 | 8900 | DA46 | 3E83 | 0326 | 7500 | E903 |
| 0000044420 | 000B | 5868 | 6802 | 00AF | A09A | 0047 | 8E00 | EE06 |
| 0000044440 | 260B | 3E83 | 0216 | 7400 | E903 | 0015 | 5EC4 | 26E4 |
| 0000044460 | 478B | 261C | 578B | A31E | 0314 | 1689 | 0316 | 13E9 |
| 0000044500 | C400 | E45E | 8B26 | 2047 | 8B26 | 2257 | 0601 | 0314 |
| 0000044520 | 1611 | 0316 | 76FF | FFE6 | E476 | 36FF | 0316 | 36FF |
| 0000044540 | 0314 | FF9A | 00FF | C400 | E45E | 8926 | 2487 | 8301 |
| 0000044560 | 263E | 0003 | 0375 | 0BE9 | 6800 | 04B0 | AF68 | 9A00 |
| 0000044600 | 4584 | 0000 | C02B | 16A3 | A303 | 0314 | 5EC4 | 26E4 |
| 0000044620 | BF83 | 0124 | 7500 | E903 | 0056 | 068E | 0BF0 | 8326 |
| 0000044640 | 723E | 003F | 0375 | 47E9 | 8300 | 3CBE | FEFF | 0375 |
| 0000044660 | 3DE9 | 1E00 | CC68 | 8D05 | CE46 | 5016 | 468D | 16EE |

THU MAR 14 17:22:14 1991 CRV.EXE PAGE 21, LINE 1181

| | | | | | | | | |
|---|---|---|---|---|---|---|---|---|
| 0000044700 | 8D50 | 3886 | 16FF | 1E50 | E068 | 6805 | 0617 | 36FF |
| 0000044720 | 0302 | 36FF | 0300 | 36FF | 0306 | 36FF | 0304 | 681E |
| 0000044740 | 05D8 | B768 | 683F | 3FBA | BD9A | 003F | 8300 | 26C4 |
| 0000044760 | 76FF | FFE6 | E476 | 9B9A | 0048 | E900 | 02C0 | 186A |
| 0000045000 | EC9A | 0046 | 6900 | DA46 | 068E | 0BEE | 8326 | 163E |
| 0000045020 | 0002 | 0374 | 15E9 | C400 | E45E | 8B26 | 1C47 | 8B26 |
| 0000045040 | 1E57 | 14A3 | 8903 | 1616 | E903 | 0013 | 5EC4 | 26E4 |
| 0000045060 | 478B | 2620 | 578B | 0122 | 1406 | 1103 | 1616 | FF03 |
| 0000045100 | E676 | 76FF | FFE4 | 1636 | FF03 | 1436 | 9A03 | FFFF |
| 0000045120 | 0000 | 5EC4 | 26E4 | 8789 | 0124 | C02B | 16A3 | A303 |
| 0000045140 | 0314 | 86C7 | FF36 | 0000 | 5EC4 | 26E4 | 3F83 | 7400 |
| 0000045160 | E903 | 000B | 76FF | FFE6 | E476 | FF9A | 00FF | E900 |
| 0000045200 | 023C | 7E83 | 02EC | 0374 | 13E9 | C700 | EC46 | 0000 |
| 0000045220 | 76FF | FFE6 | E476 | 269A | D333 | 8348 | 04C4 | 5EC4 |
| 0000045240 | 26E4 | 3F83 | 7401 | E903 | 0011 | 76FF | FFE6 | E476 |
| 0000045260 | 159A | A931 | 8349 | 04C4 | 52E9 | FF00 | E676 | 76FF |
| 0000045300 | 9AE4 | 4562 | 0000 | 4689 | 6ADA | 9A1A | 456C | 0000 |
| 0000045320 | 4689 | FFDA | E676 | 76FF | 9AE4 | 3387 | 0000 | 5EC4 |
| 0000045340 | 26E4 | 8789 | 0124 | 5EC4 | 26E4 | BF83 | 0124 | 7400 |
| 0000045360 | E903 | 000E | 76FF | FFE6 | E476 | FF9A | 00FF | E900 |
| 0000045400 | 000B | 76FF | FFE6 | E476 | E99A | 0045 | E900 | 01AE |
| 0000045420 | 76FF | FFE6 | E476 | FF9A | 00FF | C400 | E45E | 8926 |
| 0000045440 | 2487 | FF01 | E676 | 76FF | 9AE4 | 496B | 0000 | 8DE9 |
| 0000045460 | FF01 | E676 | 76FF | 9AE4 | FFFF | 0000 | 5EC4 | 26E4 |
| 0000045500 | 8789 | 0124 | 76FF | FFE6 | E476 | 8C9A | 0049 | E900 |
| 0000045520 | 016C | 76FF | FFE6 | E476 | FF9A | 00FF | C400 | E45E |
| 0000045540 | 8926 | 2487 | FF01 | E676 | 76FF | 9AE4 | 49C2 | 0000 |
| 0000045560 | 4BE9 | 8D01 | 4086 | 16FF | 8D50 | EC46 | 5016 | 6B1E |
| 0000045600 | 030E | 681E | 030C | E09A | 2C4B | 8346 | 10C4 | FF9A |
| 0000045620 | 00FF | C400 | E45E | 8926 | 2487 | FF01 | E676 | 76FF |
| 0000045640 | 9AE4 | 43D4 | 0000 | 15E9 | FF01 | E676 | 76FF | 9AE4 |
| 0000045660 | FFFF | 0000 | 5EC4 | 26E4 | 8789 | 0124 | 76FF | FFE6 |
| 0000045700 | E476 | 079A | 004A | E900 | 00F4 | 76FF | FFE6 | E476 |
| 0000045720 | 049A | B94D | 8348 | 04C4 | 5EC4 | 26E4 | 8789 | 0124 |
| 0000045740 | 76FF | FFE6 | E476 | 2F9A | 004A | E900 | 00D0 | FF9A |
| 0000045760 | 00FF | C400 | E45E | 8926 | 2487 | E901 | 00C0 | 5EC4 |
| 0000046000 | 26E4 | 87C7 | 0124 | 0000 | 76FF | FFE6 | E476 | 4A9A |
| 0000046020 | 0049 | E900 | 00A8 | A5E9 | 4800 | 493D | 7600 | E903 |
| 0000046040 | FFDC | E0D1 | 2E93 | A7FF | 4A4A | 362A | 3665 | 3C68 |
| 0000046060 | 4A1E | 36B1 | 370F | 376D | 378F | 37B1 | 37B1 | 37B1 |
| 0000046100 | 3F05 | 4A1E | 4185 | 41B7 | 4A1E | 4A1E | 4A1E | 3B77 |
| 0000046120 | 4A1E | 4402 | 4A1E | 4A1E | 481E | 4A1E | 48A2 | 4A1E |
| 0000046140 | 4A1E | 4A1E | 4A1E | 4A1E | 4A1E | 4A1E | 41FF | 42D6 |
| 0000046160 | 4335 | 4397 | 4A0E | 43DB | 4503 | 4A1E | 45F0 | 46DD |
| 0000046200 | 4A1E | 4A1E | 39A2 | 39C3 | 4A1E | 39DE | 3A7B | 4A1E |
| 0000046220 | 3B18 | 3B39 | 3B56 | 4A1E | 4930 | 4951 | 4972 | 4A1E |
| 0000046240 | 4A1E | 4A1E | 4A1E | 4993 | 49C9 | 3DB1 | 3E92 | 3E92 |
| 0000046260 | 3E92 | 3E92 | 4A1E | 4A1E | 49EA | 4A1E | 4450 | 5EC4 |
| 0000046300 | 26E4 | 3F83 | 7500 | E903 | 000C | 5EC4 | 26E4 | 3F83 |
| 0000046320 | 7403 | E903 | 000C | FF9A | 00FF | 5200 | 9A50 | 08CD |
| 0000046340 | 0000 | C2E9 | 8EEA | F006 | 260B | 3E83 | 47C1 | 7500 |
| 0000046360 | E903 | 000A | BE83 | FF3C | 74FE | E903 | 000F | 068E |
| 0000046400 | 0BF2 | 8326 | 4C3E | 0034 | 0375 | 54E9 | C700 | 3E86 |
| 0000046420 | 00FF | FF00 | CC76 | 76FF | 8DCA | 3E86 | 16FF | FF50 |
| 0000046440 | E076 | 76FF | FFFC | FA76 | 4E8D | 16CE | 8D51 | EE4E |
| 0000046460 | 5116 | 8E8D | FF38 | 5116 | 681E | 05E0 | 7A68 | FF06 |
| 0000046500 | 0236 | FF03 | 0036 | FF03 | 0636 | FF03 | 0436 | 9A03 |
| 0000046520 | FFFF | 0000 | C4B3 | 8B28 | 3E86 | E9FF | 0009 | 06E9 |
| 0000046540 | B800 | 0000 | 00E9 | 5E00 | 835F | 02ED | E58B | 5D1F |

THU MAR 14 17:22:14 1991 CRV.EXE PAGE 22, LINE 1240

| | | | | | | | | |
|---|---|---|---|---|---|---|---|---|
| 0000046560 | CB4D | 581E | 4590 | 8B55 | 1EEC | D88E | EC81 | 0000 |
| 0000046600 | 5657 | 5EC4 | 260C | 7F83 | 0006 | 0374 | 26E9 | 8B00 |
| 0000046620 | 0646 | 5EC4 | 260C | 0789 | 468B | C408 | 0C5E | 8926 |
| 0000046640 | 0247 | 5EC4 | 260C | 47C7 | 0106 | 8B00 | 0A46 | 5EC4 |
| 0000046660 | 260C | 4789 | 5E04 | 835F | 02ED | E58B | 5D1F | CB4U |
| 0000046700 | 581E | 4590 | 8B55 | 1EEC | D88E | EC81 | 0000 | 5657 |
| 0000046720 | 5EC4 | 2612 | 7F83 | 0006 | 0375 | 73E9 | C400 | 125E |
| 0000046740 | 8B26 | 0247 | 5EC4 | 260A | 0789 | 5EC4 | 2612 | 078B |
| 0000046760 | 5EC4 | 2606 | 0789 | 5EC4 | 2612 | 478B | C404 | 0E5E |
| 0000047000 | 8926 | C407 | 125E | C726 | 0647 | 0000 | 5EC4 | 2612 |
| 0000047020 | 7F83 | 0102 | 0374 | 08E9 | 9A00 | 4292 | 0000 | 11E9 |
| 0000047040 | 9A00 | 45D3 | 0000 | 2E9A | F30C | A349 | 0D66 | 1689 |
| 0000047060 | 0D68 | 5EC4 | 2612 | 3F83 | 7401 | E903 | 0008 | FB9A |
| 0000047100 | 0045 | E900 | 000A | E29A | 0042 | 9A00 | 42ED | 0000 |
| 0000047120 | 5F5E | ED83 | 8B02 | 1FE5 | 4D5D | 1ECB | 9058 | 5545 |
| 0000047140 | EC8B | 8E1E | 81D8 | 00EC | 5700 | 8356 | 0C3E | 0003 |
| 0000047160 | 0374 | 0BE9 | 9A00 | 4C5F | 0000 | 06C7 | 030C | 0001 |
| 0000047200 | 76FF | FF08 | C376 | 4B9A | 0036 | 5E00 | 835F | 02ED |
| 0000047220 | E58B | 5D1F | CB4D | 581E | 4590 | 8B55 | 1EEC | D88E |
| 0000047240 | EC81 | 0000 | 5657 | 3E83 | 030C | 7400 | E903 | 00DB |
| 0000047260 | 969A | 004C | C700 | 0C06 | 0103 | 9A00 | 4C42 | 0000 |
| 0000047300 | 468A | 5006 | 889A | 0036 | 8300 | 0E3E | 0003 | 0375 |
| 0000047320 | 05E9 | 9A00 | 4C3A | 0000 | 5F5E | ED83 | 8B02 | 1FE5 |
| 0000047340 | 4D5D | 00CB | 581E | 4590 | 8B55 | 1EEC | D88E | EC81 |
| 0000047360 | 0004 | 5657 | 068E | 0BF4 | A126 | 0204 | 5EC4 | 2606 |
| 0000047400 | 4739 | 7528 | E903 | 0035 | 5EC4 | 2606 | 478B | 8E28 |
| 0000047420 | F406 | 260B | 04A3 | 6A02 | C465 | 065E | 006A | FF26 |
| 0000047440 | 2877 | 569A | 004D | 8900 | FC46 | 666A | 5EC4 | 6A06 |
| 0000047460 | 2600 | 77FF | 9A28 | 4D8C | 0000 | 4689 | 8EFC | F406 |
| 0000047500 | 260B | 06A1 | C402 | 065E | 3926 | 2A47 | 0375 | 22E9 |
| 0000047520 | C400 | 065E | 8B26 | 2A47 | 068E | 0BF4 | A326 | 0206 |
| 0000047540 | 6B6A | 5EC4 | 6A06 | 2600 | 77FF | 9A2A | 4E0D | 0000 |
| 0000047560 | 4689 | 8EFC | F406 | 260B | 12A1 | C402 | 065E | 3926 |
| 0000047600 | 3647 | 0375 | 1CE9 | C400 | 065E | 8B26 | 3647 | 068E |
| 0000047620 | 0BF4 | A326 | 0212 | A026 | 0212 | 9A50 | 26F9 | 0000 |
| 0000047640 | 4689 | C4FC | 065E | 8B26 | 3A47 | 068E | 0BF4 | A326 |
| 0000047660 | 0216 | 5EC4 | 2606 | 77FF | 9A3A | 270B | 0000 | 068E |
| 0000047700 | 0BF4 | A126 | 021C | 5EC4 | 2606 | 4739 | 7540 | E903 |
| 0000047720 | 0022 | 5EC4 | 2606 | 478B | 8E40 | F406 | 260B | 1CA3 |
| 0000047740 | 6A02 | C46C | 065E | 006A | FF26 | 4077 | 439A | 004E |
| 0000047760 | 8900 | FC46 | 068E | 0BF4 | A126 | 021E | 5EC4 | 2606 |
| 0000050000 | 4739 | 7542 | E903 | 0022 | 5EC4 | 2606 | 478B | 8E42 |
| 0000050020 | F406 | 260B | 1EA3 | 6A02 | C467 | 065E | 006A | FF26 |
| 0000050040 | 4277 | FF9A | 00FF | 8900 | FC46 | 00B8 | E900 | 0000 |
| 0000050060 | 5F5E | ED83 | 8B02 | 1FE5 | 4D5D | 97CB | 0200 | 5F00 |
| 0000050100 | 0120 | 0000 | 0300 | 8002 | 0634 | 5500 | 0200 | B100 |
| 0000050120 | 0222 | 0000 | 0500 | 0602 | 0648 | 4B00 | 0200 | C900 |
| 0000050140 | 0308 | 0000 | 0300 | 9701 | 012F | 0500 | 0300 | 9801 |
| 0000050160 | 0130 | 0700 | 0300 | 4501 | 0100 | 0800 | 0300 | E401 |
| 0000050200 | 011B | 8900 | 0300 | 2901 | 011E | 8A00 | 0300 | AC01 |
| 0000050220 | 0129 | 0B00 | 0200 | 6100 | 0507 | 0000 | 0300 | AB01 |
| 0000050240 | 0108 | 8C00 | 0300 | 7002 | 064B | 6400 | 0300 | FE01 |
| 0000050260 | 014A | 8D00 | 0300 | 8C01 | 0126 | 8E00 | 0300 | 1D01 |
| 0000050300 | 012E | 8F00 | 0300 | FA01 | 0348 | 0100 | 0300 | 7E01 |
| 0000050320 | 0328 | 0200 | 0300 | B901 | 033B | 0300 | 0300 | D901 |
| 0000050340 | 033D | 0400 | 0300 | 8B01 | 033B | 0500 | 0300 | 9101 |
| 0000050360 | 012B | 1600 | 0300 | 6E01 | 0348 | 0600 | 0300 | BA01 |
| 0000050400 | 033C | 0700 | 0300 | CE01 | 0124 | 9800 | 0300 | 7C01 |
| 0000050420 | 0346 | 0800 | 0300 | A701 | 044C | 0100 | 0300 | 4F01 |

THU MAR 14 17:22:14 1991 CRV.EXE PAGE 23, LINE 1299

| | | | | | | | | |
|---|---|---|---|---|---|---|---|---|
| 0000050440 | 033E | 0900 | 0300 | 8901 | 0329 | 0A00 | 0300 | E501 |
| 0000050460 | 044C | 0300 | 0300 | C301 | 033A | 0B00 | 0300 | E902 |
| 0000050500 | 062F | 7400 | 0300 | 6701 | 044C | 0400 | 0300 | A901 |
| 0000050520 | 0339 | 0C00 | 0300 | 4101 | 042E | 0500 | 0300 | F201 |
| 0000050540 | 0336 | 0D00 | 0300 | 5D01 | 033B | 0E00 | 0300 | 0B01 |
| 0000050560 | 0446 | 0600 | 0300 | 4301 | 033F | 0F00 | 0300 | 6E01 |
| 0000050600 | 0430 | 0800 | 0300 | 8F01 | 0345 | 1000 | 0500 | 1B00 |
| 0000050620 | 012A | 0900 | 0330 | D101 | 044C | 0900 | 0300 | 8301 |
| 0000050640 | 0347 | 1100 | 0300 | E201 | 0117 | 2100 | 0300 | 2801 |
| 0000050660 | 0108 | 2200 | 0300 | 1101 | 022A | 1A00 | 0300 | 0701 |
| 0000050700 | 052E | 0200 | 0300 | CE01 | 0445 | 0A00 | 0300 | 3701 |
| 0000050720 | 0349 | 1200 | 0300 | 5C01 | 0426 | 0B00 | 0300 | 9801 |
| 0000050740 | 0331 | 1300 | 0300 | C201 | 0532 | 0300 | 0300 | 8D01 |
| 0000050760 | 0530 | 0400 | 0300 | 2101 | 0448 | 0C00 | 0300 | C401 |
| 0000051000 | 0339 | 1400 | 0300 | A301 | 0428 | 0D00 | 0300 | F701 |
| 0000051020 | 054A | 0500 | 0300 | 4301 | 034D | 1500 | 0300 | B601 |
| 0000051040 | 0122 | 2600 | 0300 | 5601 | 0328 | 1600 | 0300 | DA01 |
| 0000051060 | 044D | 0E00 | 0300 | 2901 | 0540 | 0600 | 0300 | 4301 |
| 0000051100 | 0426 | 0F00 | 0300 | 1001 | 0537 | 0700 | 0300 | 9501 |
| 0000051120 | 0337 | 1700 | 0300 | BC01 | 044D | 1000 | 0300 | B001 |
| 0000051140 | 0532 | 0800 | 0300 | 1F01 | 033B | 1800 | 0300 | D701 |
| 0000051160 | 0328 | 1900 | 0300 | 7301 | 042B | 1100 | 0300 | 1601 |
| 0000051200 | 052E | 0A00 | 0300 | D401 | 033F | 1A00 | 0300 | 4F01 |
| 0000051220 | 0445 | 1200 | 0300 | E701 | 0426 | 1300 | 0300 | 0902 |
| 0000051240 | 0648 | 8300 | 0300 | F001 | 033B | 1B00 | 0300 | E701 |
| 0000051260 | 0544 | 0B00 | 0300 | 7301 | 0337 | 1C00 | 0300 | DC01 |
| 0000051300 | 044C | 1400 | 0300 | 1B01 | 0549 | 0C00 | 0300 | 5B01 |
| 0000051320 | 053F | 0D00 | 0300 | 0601 | 0446 | 1500 | 0300 | 6C01 |
| 0000051340 | 034C | 1D00 | 0300 | 7101 | 0224 | 2600 | 0300 | 1701 |
| 0000051360 | 0328 | 1E00 | 0300 | E201 | 0448 | 1600 | 0300 | 2901 |
| 0000051400 | 0549 | 0E00 | 0300 | 1F01 | 0426 | 1700 | 0300 | CC01 |
| 0000051420 | 0341 | 1F00 | 0300 | 4501 | 0537 | 0F00 | 0300 | DF01 |
| 0000051440 | 0529 | 1000 | 0300 | 7601 | 0441 | 1800 | 0300 | 3C01 |
| 0000051460 | 033B | 2000 | 0300 | 8101 | 0525 | 1100 | 0300 | BD01 |
| 0000051500 | 0426 | 1900 | 0300 | 5001 | 0337 | 2100 | 0300 | 3D01 |
| 0000051520 | 0525 | 1200 | 0300 | 3901 | 0147 | 3200 | 0300 | A801 |
| 0000051540 | 0428 | 1A00 | 0300 | 2B01 | 0341 | 2200 | 0300 | 9A01 |
| 0000051560 | 0525 | 1300 | 0300 | 0C01 | 0438 | 1B00 | 0300 | AF01 |
| 0000051600 | 0349 | 2300 | 0300 | 7B01 | 0223 | 2C00 | 0300 | 6601 |
| 0000051620 | 0427 | 1C00 | 0300 | A301 | 0333 | 2400 | 0300 | BA01 |
| 0000051640 | 0533 | 1500 | 0300 | DE01 | 0445 | 1D00 | 0300 | D001 |
| 0000051660 | 0349 | 2500 | 0300 | 2801 | 042E | 1E00 | 0300 | 5801 |
| 0000051700 | 0533 | 1600 | 0300 | 0F01 | 034A | 2600 | 0300 | 4701 |
| 0000051720 | 0325 | 2700 | 0300 | E701 | 0536 | 1700 | 0300 | F401 |
| 0000051740 | 044C | 1F00 | 0300 | 5E01 | 0536 | 1800 | 0300 | 7901 |
| 0000051760 | 0349 | 2800 | 0300 | 4501 | 0330 | 2900 | 0300 | 1701 |
| 0000052000 | 0548 | 1900 | 0300 | BF01 | 0533 | 1A00 | 0300 | F602 |
| 0000052020 | 0633 | 9200 | 0300 | 5E01 | 0344 | 2A00 | 0300 | BD01 |
| 0000052040 | 011C | 3A00 | 0300 | 2001 | 0525 | 1B00 | 0300 | 3C01 |
| 0000052060 | 033A | 2B00 | 0300 | 3B01 | 011B | 3B00 | 0300 | 4C01 |
| 0000052100 | 0525 | 1C00 | 0300 | 5801 | 0349 | 2C00 | 0300 | A001 |
| 0000052120 | 0118 | 3C00 | 0300 | F901 | 0538 | 1D00 | 0300 | D201 |
| 0000052140 | 0228 | 3700 | 0300 | B201 | 0536 | 1F00 | 0300 | E301 |
| 0000052160 | 0549 | 2000 | 0300 | 3101 | 0539 | 2100 | 0300 | E801 |
| 0000052200 | 053C | 2200 | 0300 | FF01 | 011B | 4400 | 0300 | 3602 |
| 0000052220 | 0634 | 9E00 | 0300 | 1201 | 011B | 4600 | 0300 | 2601 |
| 0000052240 | 0230 | 4000 | 0300 | 3301 | 011C | 4B00 | 0300 | 5B01 |
| 0000052260 | 011B | 4D00 | 0300 | ED01 | 0100 | 5500 | 0300 | 3101 |
| 0000052300 | 0101 | 5900 | 0200 | 0302 | 0648 | 4B00 | 0300 | 0201 |

```
THU MAR 14 17:22:14 1991  CRV.EXE  PAGE 24, LINE 1358

0000052320  0125  5E00  0300  D901  0236  5700  0500  0C02
0000052340  064B  2F00  0300  4B01  0224  6000  0500  2502
0000052360  064B  3D00  0000  0000  0000  0000  0000  0000
0000052400  0000  0000  1260  0000  0000  0000  0000  0000
0000052420  0000  0000  0000  0000  0000  0000  0000  0000
*
0000052500  0000  0000  0200  0000  0000  0000  0000  0000
0000052520  0000  0000  0000  0000  0000  0000  0000  0000
*
0000052600  0000  0000  0200  0000  0000  0000  0000  0000
0000052620  0000  0000  0000  0000  0000  0000  0000  0000
*
0000052700  0000  0000  0200  0000  0000  0000  0000  0000
0000052720  0000  0000  0000  0000  534D  5220  6E75  542D
0000052740  6D69  2065  694C  7262  7261  2079  202D  6F43
0000052760  7970  6972  6867  2074  6328  2029  3931  3039
0000053000  202C  694D  7263  736F  666F  2074  6F43  7072
0000053020  0018  0000  0000  0000  0000  0006  0000  0000
0000053040  0000  0005  0000  0000  0000  0000  0000  0000
0000053060  0000  0000  435F  465F  4C49  5F45  4E49  4F46
0000053100  003D  0001  FFFF  0000  0000  0000  0000  0000
0000053120  0000  0000  0000  0000  0001  0100  8181  0081
0000053140  0000  0000  0000  0000  0000  0000  0000  0000
*
0000053520  0000  0000  0000  0000  0000  0000  0A0A  0A0A
0000053540  0A0A  0A0A  0A0A  0A0A  0A0A  0A0A  0A0A  0A0A
*
0000054120  0A0A  0A0A  0A0A  0A0A  0A0A  0A0A  0000  0000
0000054140  0000  0000  0000  0000  0000  0000  FFFF  0000
0000054160  0000  0000  0000  0000  0000  0000  0000  0000
0000054200  0000  0000  0003  2000  7263  5F76  7270  636F
0000054220  632E  6300  7672  702E  5400  3231  5F33  4146
0000054240  5453  525F  5045  414C  0059  3154  3332  4D5F
0000054260  4753  415F  414C  4D52  425F  4C45  004C  3154
0000054300  3332  445F  4645  5541  544C  545F  4D49  0045
0000054320  02B8  0306  02C3  FFFF  0000  0000  0000  0001
0000054340  0000  0001  0000  0000  0000  0000  0000  0000
0000054360  0000  0000  0000  0001  5243  0056  5243  0056
0000054400  2528  2964  5000  4952  004F  6700  7073  6F6D
0000054420  006E  3154  3332  475F  5053  535F  464F  5754
0000054440  5241  0045  0072  7367  2070  6F6C  6461  6620
0000054460  6961  0A6C  6700  7073  6120  7463  7669  7461
0000054500  2065  6166  6C69  000A  6146  6C69  6465  7420
0000054520  206F  6F6C  6461  6D20  756F  6573  7020  696F
0000054540  746E  7265  0A73  5400  3231  5F33  4E49  5F50
0000054560  4353  4C41  5F45  5546  434E  0000  6F6E  0074
0000054600  7325  7320  6163  696C  676E  6620  6C69  2065
0000054620  6177  2073  7325  7220  6165  0A64  4F00  4646
0000054640  5400  3231  5F33  4F4D  5355  5F45  5254  4341
0000054660  494B  474E  4F00  004E  0000  0000  6E69  0074
0000054700  6E69  0074  6873  7475  6F64  6E77  2520  0064
0000054720  5F62  7265  6F72  0072  7263  5F76  6873  7475
0000054740  6F64  6E77  6400  5F62  6574  6D72  6E69  7461
0000054760  2065  7473  7461  7375  3D20  2520  0064  7367
0000055000  5F70  6574  6D72  6E69  7461  2065  7473  7461
0000055020  7375  3D20  2520  0064  7573  2074  6C63  736F
0000055040  2065  7473  7461  7375  3D20  2520  0064  4309
0000055060  7061  7574  6572  7320  6E79  2063  7265  6F72
0000055100  2072  6425  000A  7953  636E  6320  6572  7461
```

THU MAR 14 17:22:14 1991 CRV.EXE PAGE 25, LINE 1417

| | | | | | | | | |
|---|---|---|---|---|---|---|---|---|
| 0000055120 | 6465 | 202C | 7265 | 6F72 | 2072 | 6425 | 000A | 5243 |
| 0000055140 | 0056 | 6E69 | 0074 | 6E69 | 0074 | 6164 | 6574 | 2520 |
| 0000055160 | 0073 | 5F62 | 6564 | 7562 | 0067 | 6974 | 656D | 2520 |
| 0000055200 | 0073 | 5F62 | 6564 | 7562 | 0067 | 6B20 | 7965 | 7420 |
| 0000055220 | 7079 | 2065 | 6425 | 7620 | 6C61 | 6575 | 2520 | 2C78 |
| 0000055240 | 7320 | 756F | 6372 | 2065 | 6425 | 6200 | 6B5F | 6462 |
| 0000055260 | 5300 | 4154 | 4942 | 494C | 5954 | 435F | 4548 | 4B43 |
| 0000055300 | 4900 | 4F43 | 5F4E | 4843 | 4345 | 004B | 656C | 7261 |
| 0000055320 | 206E | 7473 | 7461 | 7375 | 3D20 | 2520 | 0A64 | 6200 |
| 0000055340 | 645F | 6265 | 6775 | 6700 | 7465 | 6C5F | 636F | 7461 |
| 0000055360 | 726F | 203A | 2078 | 203D | 6425 | 7920 | 3D20 | 2520 |
| 0000055400 | 0064 | 5F62 | 6564 | 7562 | 0067 | 7320 | 6174 | 7574 |
| 0000055420 | 2073 | 203D | 6425 | 000A | 5F62 | 6564 | 7562 | 0067 |
| 0000055440 | 7263 | 6165 | 6574 | 6920 | 696E | 2074 | 7274 | 6520 |
| 0000055460 | 7272 | 2520 | 0064 | 5F62 | 7265 | 6F72 | 0072 | 7263 |
| 0000055500 | 6165 | 6574 | 6D20 | 766F | 2065 | 7274 | 6520 | 7272 |
| 0000055520 | 2520 | 0064 | 5F62 | 7265 | 6F72 | 0072 | 6D20 | 766F |
| 0000055540 | 2065 | 7274 | 6361 | 206B | 7265 | 6F72 | 2072 | 203D |
| 0000055560 | 6425 | 6200 | 645F | 6265 | 6775 | 0900 | 6553 | 2074 |
| 0000055600 | 6572 | 6F63 | 6472 | 6F20 | 0A6E | 0900 | 6553 | 2074 |
| 0000055620 | 6572 | 6F63 | 6472 | 6F20 | 6666 | 000A | 6556 | 6972 |
| 0000055640 | 7966 | 6620 | 6961 | 006C | 5F62 | 6564 | 7562 | 0067 |
| 0000055660 | 616D | 6E69 | 0000 | 005C | 005C | 0000 | 0000 | 0000 |
| 0000055700 | 0000 | 0000 | 0000 | 05FC | 0000 | 0000 | 0BF4 | 0001 |
| 0000055720 | 0000 | 0000 | 0000 | 0000 | 0000 | 0102 | 0000 | 0000 |
| 0000055740 | 0000 | 0000 | 0000 | 0202 | 0000 | 0000 | 0000 | 0000 |
| 0000055760 | 0000 | 0000 | 0000 | 0000 | 0000 | 0000 | 0000 | 0000 |
| * | | | | | | | | |
| 0000056640 | 0000 | 0000 | 0001 | 0200 | 0000 | 0000 | 0000 | 0000 |
| 0000056660 | 0000 | 0000 | 0000 | 0000 | 0000 | 0000 | 0000 | 0000 |
| * | | | | | | | | |
| 0000057600 | 0000 | 0000 | 07C8 | 0BF6 | 0000 | 0000 | 0000 | 0000 |
| 0000057620 | 0006 | 0600 | 0100 | 0000 | 0010 | 0603 | 0600 | 1002 |
| 0000057640 | 4504 | 4545 | 0505 | 0505 | 3505 | 0030 | 0050 | 0000 |
| 0000057660 | 2000 | 3020 | 5850 | 0807 | 3000 | 3030 | 5057 | 0007 |
| 0000057700 | 2000 | 0020 | 0000 | 0000 | 6008 | 6060 | 6060 | 0060 |
| 0000057720 | 7000 | 7870 | 7878 | 0878 | 0807 | 0000 | 0007 | 0808 |
| 0000057740 | 0008 | 0800 | 0800 | 0000 | 2808 | 756E | 6C6C | 0629 |
| 0000057760 | 0000 | 0000 | FFFF | FFFF | 0000 | 02B6 | 0BEC | 02B6 |
| 0000060000 | 0A2C | 02B6 | 0A30 | 02B6 | 0A34 | 02B6 | 0A38 | 02B6 |
| 0000060020 | 0A3C | 0000 | 0000 | 0101 | FFFF | 001E | 003B | 005A |
| 0000060040 | 0078 | 0097 | 00B5 | 00D4 | 00F3 | 0111 | 0130 | 014E |
| 0000060060 | 016D | FFFF | 001E | 003A | 0059 | 0077 | 0096 | 00B4 |
| 0000060100 | 00D3 | 00F2 | 0110 | 012F | 014D | 016C | 5A54 | 0000 |
| 0000060120 | 5350 | 0054 | 4450 | 0054 | 7080 | 0000 | 0001 | 0A80 |
| 0000060140 | 0A94 | 0A84 | 09B6 | 7553 | 4D6E | 6E6F | 7554 | 5765 |
| 0000060160 | 6465 | 6854 | 4675 | 6972 | 6153 | 0074 | 614A | 466E |
| 0000060200 | 6265 | 614D | 4172 | 7270 | 614D | 4A79 | 6E75 | 754A |
| 0000060220 | 416C | 6775 | 6553 | 4F70 | 7463 | 6F4E | 4476 | 6365 |
| 0000060240 | 0000 | 0000 | 2000 | 2020 | 2020 | 2020 | 2020 | 2828 |
| 0000060260 | 2828 | 2028 | 2020 | 2020 | 2020 | 2020 | 2020 | 2020 |
| 0000060300 | 2020 | 2020 | 4820 | 1010 | 1010 | 1010 | 1010 | 1010 |
| 0000060320 | 1010 | 1010 | 8410 | 8484 | 8484 | 8484 | 8484 | 1084 |
| 0000060340 | 1010 | 1010 | 1010 | 8181 | 8181 | 8181 | 0101 | 0101 |
| 0000060360 | 0101 | 0101 | 0101 | 0101 | 0101 | 0101 | 0101 | 0101 |
| 0000060400 | 1010 | 1010 | 1010 | 8282 | 8282 | 8282 | 0202 | 0202 |
| 0000060420 | 0202 | 0202 | 0202 | 0202 | 0202 | 0202 | 0202 | 0202 |
| 0000060440 | 1010 | 1010 | 0020 | 0000 | 0000 | 0000 | 0000 | 0000 |
| 0000060460 | 0000 | 0000 | 0000 | 0000 | 0000 | 0000 | 0000 | 0000 |

THU MAR 14 17:22:14 1991 CRV.EXE PAGE 26, LINE 1476

```
*
0000060640   0000   0000   0000   0003   0000   0000   0000   0000
0000060660   0000   0000   0000   0C7C   FFFF   10D0   0BE8   FFFF
0000060700   FFFF   FFFF   0BEE   0302   3C3C   4D4E   4753   3E3E
0000060720   0000   3652   3030   0D30   2D0A   7320   6174   6B63
0000060740   6F20   6576   6672   6F6C   0D77   000A   0003   3652
0000060760   3030   0D33   2D0A   6920   746E   6765   7265   6420
0000061000   7669   6469   2065   7962   3020   0A0D   0800   5200
0000061020   3036   3830   0A0D   202D   6F6E   2074   6E65   756F
0000061040   6867   7320   6170   6563   6620   726F   6120   6772
0000061060   6D75   6E65   7374   0A0D   0900   5200   3036   3930
0000061100   0A0D   202D   6F6E   2074   6E65   756F   6867   7320
0000061120   6170   6563   6620   726F   6520   766E   7269   6E6F
0000061140   656D   746E   0A0D   FC00   0D00   000A   00FF   7572
0000061160   2D6E   6974   656D   6520   7272   726F   0020   0002
0000061200   3652   3030   0D32   2D0A   6620   6F6C   7461   6E69
0000061220   2D67   6F70   6E69   2074   7573   7070   726F   2074
0000061240   6F6E   2074   6F6C   6461   6465   0A0D   0100   5200
0000061260   3036   3130   0A0D   202D   756E   6C6C   7020   696F
0000061300   746E   7265   6120   7373   6769   6D6E   6E65   0D74
0000061320   000A   0011   3652   3130   0D37   2D0A   7520   656E
0000061340   7078   6365   6574   2064   756D   746C   7469   7268
0000061360   6165   2064   6F6C   6B63   6520   7272   726F   0A0D
0000061400   1000   5200   3036   3631   0A0D   202D   6F6E   2074
0000061420   6E65   756F   6867   7320   6170   6563   6620   726F
0000061440   7420   7268   6165   2064   6164   6174   0A0D   FF00
0000061460   FFFF   0005   0002   0A40   0001   0000   0002   05F6
0000061500   0004   0000   0002   0A90   0005   0000   0202   0BF0
0000061520   0006   002F   0202   0BF2   0006   003D   424E   3230
0000061540   6C4B   0000   0001   0010   00DA   0000   0001   0001
0000061560   6F0C   3273   635C   7472   2E30   7361   016D   EA00
0000061600   A900   0001   0100   0100   0F00   736F   5C32   7263
0000061620   3074   6164   2E74   7361   016D   9400   2202   0000
0000061640   0100   0100   0F00   736F   5C32   7263   3074   736D
0000061660   2E67   7361   016D   B600   0602   0000   0100   0100
0000061700   0A00   7263   3074   7066   612E   6D73   0001   02BC
0000061720   0024   0000   0001   0001   630A   6B68   7573   2E6D
0000061740   7361   016D   E000   8702   0001   0100   0100   0F00
0000061760   736F   5C32   7473   6164   6772   2E76   7361   016D
0000062000   6800   A304   0000   0100   0100   0F00   736F   5C32
0000062020   7473   6564   766E   2E70   7361   016D   0C00   6505
0000062040   0000   0100   0100   0F00   736F   5C32   6D6E   6773
0000062060   6468   2E72   7361   016D   7200   2105   0000   0100
0000062100   0100   1000   736F   5C32   7473   6164   6C6C   636F
0000062120   612E   6D73   0001   0594   000A   0000   0001   0001
0000062140   6D0A   6C61   6F6C   2E63   7361   016D   9E00   AF05
0000062160   0000   0100   0100   0B00   6D66   6C61   6F6C   2E63
0000062200   7361   006D   0000   0000   0000   0100   0000   0900
0000062220   6466   7461   2E61   7361   016D   4E00   3406   0000
0000062240   0100   0100   0B00   6E69   7469   6573   2E67   7361
0000062260   016D   8200   3606   0000   0100   0100   0B00   696C
0000062300   6B6E   6573   2E67   7361   016D   B800   7C06   0000
0000062320   0100   0100   0C00   6573   7261   6863   6773   612E
0000062340   6D73   0001   0734   00E2   0000   0001   0001   670B
0000062360   6F72   7377   6765   612E   6D73   0001   0816   0031
0000062400   0000   0001   0001   6E0A   7765   6573   2E67   7361
0000062420   016D   4800   B208   0000   0100   0100   0D00   736F
0000062440   5C32   6C6D   636F   2E6B   7361   016D   4C00   B723
0000062460   0029   0200   0100   0A00   7263   5F76   7270   636F
```

THU MAR 14 17:22:14 1991 CRV.EXE PAGE 27, LINE 1535

| | | | | | | | | |
|---|---|---|---|---|---|---|---|---|
| 0000062500 | 632E | 0001 | 4D04 | 0157 | 0000 | 0002 | 0001 | 630A |
| 0000062520 | 7672 | 705F | 7261 | 2E6D | 0163 | FA00 | 0208 | 0001 |
| 0000062540 | 0100 | 0100 | 0800 | 6366 | 6F6C | 6573 | 632E | 0001 |
| 0000062560 | 09FC | 006A | 0000 | 0001 | 0001 | 6607 | 706F | 6E65 |
| 0000062600 | 632E | 0001 | 0A66 | 004E | 0000 | 0001 | 0001 | 7008 |
| 0000062620 | 6972 | 746E | 2E66 | 0163 | B400 | 360A | 0000 | 0100 |
| 0000062640 | 0100 | 0A00 | 7473 | 6372 | 7970 | 612E | 6D73 | 0001 |
| 0000062660 | 0AEA | 0029 | 0000 | 0001 | 0001 | 730A | 7274 | 6D63 |
| 0000062700 | 2E70 | 7361 | 016D | 1400 | A60B | 0000 | 0100 | 0100 |
| 0000062720 | 0800 | 6567 | 6574 | 766E | 632E | 0001 | 0BBA | 0074 |
| 0000062740 | 0000 | 0001 | 0001 | 7309 | 7270 | 6E69 | 6674 | 632E |
| 0000062760 | 0001 | 0C2E | 005C | 0000 | 0001 | 0001 | 6307 | 6F6C |
| 0000063000 | 6B63 | 632E | 0001 | 0C8A | 0053 | 00C0 | 0001 | 0001 |
| 0000063020 | 6F0F | 3273 | 735C | 7274 | 6164 | 6574 | 612E | 6D73 |
| 0000063040 | 0001 | 0CDE | 004C | 0000 | 0001 | 0001 | 6F0F | 3273 |
| 0000063060 | 735C | 7274 | 6974 | 656D | 612E | 6D73 | 0001 | 0D2A |
| 0000063100 | 0024 | 0000 | 0001 | 0001 | 730A | 7274 | 7075 | 2E72 |
| 0000063120 | 7361 | 006D | 0000 | 0000 | 0000 | 0100 | 0000 | 0700 |
| 0000063140 | 665F | 6C69 | 2E65 | 0163 | 4E00 | E50D | 0000 | 0100 |
| 0000063160 | 0100 | 0B00 | 665F | 736C | 7562 | 2E66 | 7361 | 016D |
| 0000063200 | 3400 | 370E | 0000 | 0100 | 0100 | 0C00 | 665F | 6572 |
| 0000063220 | 6265 | 6675 | 612E | 6D73 | 0001 | 0E6C | 00F2 | 0000 |
| 0000063240 | 0001 | 0001 | 5F07 | 706F | 6E65 | 632E | 0001 | 0F5E |
| 0000063260 | 00C0 | 0000 | 0001 | 0001 | 5F0B | 6673 | 6274 | 6675 |
| 0000063300 | 612E | 6D73 | 0001 | 101E | 012E | 0000 | 0001 | 0001 |
| 0000063320 | 6608 | 6C66 | 7375 | 2E68 | 0163 | 4C00 | FA11 | 0004 |
| 0000063340 | 0100 | 0100 | 0A00 | 756F | 7074 | 7475 | 612E | 6D73 |
| 0000063360 | 0001 | 1646 | 0078 | 0000 | 0001 | 0001 | 7308 | 7274 |
| 0000063400 | 6165 | 2E6D | 0163 | BE00 | 3F16 | 0000 | 0100 | 0100 |
| 0000063420 | 0D00 | 736F | 5C32 | 6C63 | 736F | 2E65 | 7361 | 016D |
| 0000063440 | FE00 | 4616 | 0000 | 0100 | 0100 | 0A00 | 7473 | 6372 |
| 0000063460 | 7461 | 612E | 6D73 | 0001 | 1744 | 0017 | 0000 | 0001 |
| 0000063500 | 0001 | 730A | 7274 | 656C | 2E6E | 7361 | 016D | 5C00 |
| 0000063520 | 3B17 | 0000 | 0100 | 0100 | 0B00 | 7473 | 6E72 | 6D63 |
| 0000063540 | 2E70 | 7361 | 016D | 9800 | 1C17 | 0000 | 0100 | 0100 |
| 0000063560 | 0800 | 7469 | 616F | 612E | 6D73 | 0001 | 17B4 | 00DE |
| 0000063600 | 0000 | 0001 | 0001 | 6F0B | 3273 | 665C | 6974 | 656D |
| 0000063620 | 632E | 0000 | 0000 | 0000 | 0000 | 0001 | 0000 | 5F0C |
| 0000063640 | 6963 | 696E | 7474 | 2E6D | 7361 | 016D | 9200 | 1D18 |
| 0000063660 | 0000 | 0100 | 0100 | 0E00 | 736F | 5C32 | 6E75 | 696C |
| 0000063700 | 6B6E | 612E | 6D73 | 0001 | 18B0 | 0032 | 0000 | 0001 |
| 0000063720 | 0001 | 6C08 | 756D | 2E6C | 7361 | 016D | E200 | 3218 |
| 0000063740 | 0000 | 0100 | 0100 | 0A00 | 6863 | 736B | 6B74 | 612E |
| 0000063760 | 6D73 | 0001 | 1914 | 00C0 | 0000 | 0001 | 0001 | 6F0E |
| 0000064000 | 3273 | 645C | 736F | 6572 | 2E74 | 7361 | 006D | 0000 |
| 0000064020 | 0000 | 0000 | 0100 | 0000 | 0B00 | 635F | 6C66 | 7375 |
| 0000064040 | 2E68 | 7361 | 016D | D400 | 4B19 | 0000 | 0100 | 0100 |
| 0000064060 | 0B00 | 675F | 7465 | 7562 | 2E66 | 7361 | 016D | 2000 |
| 0000064100 | 771A | 0000 | 0100 | 0100 | 0D00 | 736F | 5C32 | 736C |
| 0000064120 | 6565 | 2E6B | 7361 | 016D | 9800 | DD1A | 0001 | 0100 |
| 0000064140 | 0100 | 0C00 | 736F | 5C32 | 706F | 6E65 | 612E | 6D73 |
| 0000064160 | 0001 | 1C76 | 01F4 | 0000 | 0001 | 0001 | 7709 | 6972 |
| 0000064200 | 6574 | 612E | 6D73 | 0001 | 1E6A | 000A | 0000 | 0001 |
| 0000064220 | 0001 | 6608 | 6572 | 2E65 | 7361 | 006D | 0000 | 0000 |
| 0000064240 | 0000 | 0100 | 0000 | 0C00 | 6D63 | 7369 | 6463 | 7461 |
| 0000064260 | 612E | 6D73 | 0000 | 0000 | 0000 | 0000 | 0001 | 0000 |
| 0000064300 | 6406 | 7961 | 2E73 | 0163 | 7400 | C81E | 0001 | 0100 |
| 0000064320 | 0100 | 0700 | 7A74 | 6573 | 2E74 | 0063 | 0000 | 0000 |
| 0000064340 | 0000 | 0100 | 0000 | 0900 | 6974 | 656D | 6573 | 2E74 |

THU MAR 14 17:22:14 1991 CRV.EXE PAGE 28, LINE 1594

| | | | | | | | | |
|---|---|---|---|---|---|---|---|---|
| 0000064360 | 0163 | 3C00 | F620 | 0000 | 0100 | 0100 | 0A00 | 7464 |
| 0000064400 | 786F | 6974 | 656D | 632E | 0001 | 2132 | 0063 | 0000 |
| 0000064420 | 0001 | 0001 | 7808 | 6F74 | 2E61 | 7361 | 016D | 9600 |
| 0000064440 | 9A21 | 0000 | 0100 | 0100 | 0800 | 646C | 7669 | 612E |
| 0000064460 | 6D73 | 0001 | 2230 | 001E | 0000 | 0001 | 0001 | 730C |
| 0000064500 | 6174 | 6B63 | 7661 | 2E61 | 7361 | 006D | 0000 | 0000 |
| 0000064520 | 0000 | 0100 | 0000 | 0B00 | 7874 | 6D74 | 646F | 2E65 |
| 0000064540 | 7361 | 016D | 4E00 | 2A22 | 0000 | 0100 | 0100 | 0B00 |
| 0000064560 | 7473 | 6E72 | 7063 | 2E79 | 7361 | 016D | 7800 | 0322 |
| 0000064600 | 0000 | 0100 | 0100 | 0800 | 7461 | 6C6F | 612E | 6D73 |
| 0000064620 | 0000 | 0000 | 0000 | 0000 | 0001 | 0000 | 6309 | 7974 |
| 0000064640 | 6570 | 612E | 6D73 | 0001 | 227C | 007A | 0000 | 0001 |
| 0000064660 | 0001 | 6410 | 6C6C | 745C | 6469 | 6174 | 6C62 | 2E65 |
| 0000064700 | 7361 | 016D | F600 | 5622 | 0000 | 0100 | 0100 | 0800 |
| 0000064720 | 7461 | 786F | 612E | 6D73 | 0D62 | 0005 | 0000 | 5F06 |
| 0000064740 | 6465 | 7461 | 6061 | 0510 | 0000 | 0400 | 655F | 646E |
| 0000064760 | 0050 | 0005 | 0000 | 5F0C | 6E5F | 6568 | 7061 | 645F |
| 0000065000 | 7365 | 7663 | 0500 | 0000 | 0C00 | 5F5F | 615F | 4244 |
| 0000065020 | 7773 | 6670 | 676C | 0042 | 0005 | 0000 | 5F08 | 615F |
| 0000065040 | 6D63 | 6C64 | 746E | 0500 | 0000 | 0800 | 5F5F | 7361 |
| 0000065060 | 6765 | 6968 | 0072 | 0005 | 0000 | 5F08 | 615F | 6573 |
| 0000065100 | 6C67 | 4E6F | 0500 | 0000 | 0800 | 5F5F | 7361 | 7A69 |
| 0000065120 | 7364 | 0010 | 0001 | 0000 | 5F08 | 615F | 7473 | 7261 |
| 0000065140 | 4674 | 0500 | 0000 | 0800 | 5F5F | 7461 | 706F | 7073 |
| 0000065160 | 0064 | 0005 | 0000 | 5F09 | 615F | 6663 | 6E69 | 6F66 |
| 0000065200 | D6D6 | 0000 | 0001 | 5F09 | 615F | 4244 | 7375 | 6465 |
| 0000065220 | 0044 | 0005 | 0000 | 5F09 | 615F | 6E65 | 7376 | 6765 |
| 0000065240 | 0084 | 0001 | 0000 | 5F09 | 635F | 6E69 | 4474 | 5649 |
| 0000065260 | 004A | 0005 | 0000 | 5F0A | 745F | 7268 | 6165 | 6964 |
| 0000065300 | 4864 | 0500 | 0000 | 0A00 | 5F5F | 6967 | 666E | 736F |
| 0000065320 | 6765 | D6D6 | 0000 | 0001 | 5F0A | 615F | 4244 | 6F64 |
| 0000065340 | 7773 | 4C70 | 0500 | 0000 | 0A00 | 5F5F | 696C | 666E |
| 0000065360 | 736F | 6765 | 9876 | 0000 | 0001 | 5F0A | 615F | 7263 |
| 0000065400 | 7574 | 6573 | 7864 | 0500 | 0000 | 0B00 | 5F5F | 615F |
| 0000065420 | 4244 | 7472 | 7265 | 8C72 | 0100 | 0000 | 0B00 | 5F5F |
| 0000065440 | 6D61 | 6773 | 655F | 6978 | 8674 | 0500 | 0000 | 0B00 |
| 0000065460 | 5F5F | 736F | 6576 | 7372 | 6F69 | 896E | 0101 | 0000 |
| 0000065500 | 0600 | 5F5F | 7865 | 7469 | 024F | 0001 | 0000 | 5F0C |
| 0000065520 | 755F | 6C6E | 636F | 656B | 6978 | 9A74 | 0502 | 0000 |
| 0000065540 | 0700 | 5F5F | 6863 | 6C69 | 8A64 | 0500 | 0000 | 0700 |
| 0000065560 | 5F5F | 666E | 6C69 | EA65 | 0100 | 0000 | 0700 | 5F5F |
| 0000065600 | 6963 | 696E | 8C74 | 0502 | 0000 | 0700 | 5F5F | 615F |
| 0000065620 | 6772 | 9163 | 0101 | 0000 | 0700 | 5F5F | 6563 | 6978 |
| 0000065640 | 8674 | 0500 | 0000 | 0D00 | 5F5F | 6F64 | 7673 | 7265 |
| 0000065660 | 616D | 6F6A | 8E72 | 0502 | 0000 | 0700 | 5F5F | 615F |
| 0000065700 | 6772 | 8776 | 0500 | 0000 | 0D00 | 5F5F | 6F64 | 7673 |
| 0000065720 | 7265 | 696D | 6F6E | 8C72 | 0501 | 0000 | 0800 | 5F5F |
| 0000065740 | 6970 | 6570 | 6863 | 0292 | 0005 | 0000 | 5F08 | 6E65 |
| 0000065760 | 6976 | 6F72 | 8C6E | 0500 | 0000 | 0800 | 5F5F | 736F |
| 0000066000 | 6966 | 656C | 0088 | 0005 | 0000 | 5F08 | 6F5F | 6D73 |
| 0000066020 | 646F | 4D65 | 0101 | 0000 | 0800 | 5F5F | 6E69 | 7469 |
| 0000066040 | 7066 | 0BDA | 0005 | 0000 | 5F08 | 665F | 6970 | 696E |
| 0000066060 | 7274 | 0102 | 0000 | 0800 | 5F5F | 6574 | 6D72 | 7066 |
| 0000066100 | 0296 | 0005 | 0000 | 5F08 | 705F | 6D67 | 7470 | 9B72 |
| 0000066120 | 0101 | 0000 | 0800 | 5F5F | 5F63 | 7865 | 7469 | 0088 |
| 0000066140 | 0005 | 0000 | 5F09 | 645F | 736F | 6F6D | 6564 | 0086 |
| 0000066160 | 0005 | 0000 | 5F09 | 6F5F | 6D73 | 6A61 | 726F | 0087 |
| 0000066200 | 0005 | 0000 | 5F09 | 6F5F | 6D73 | 6E69 | 726F | 0205 |
| 0000066220 | 0001 | 0000 | 5F0A | 6C5F | 636F | 656B | 6978 | 8474 |

THU MAR 14 17:22:14 1991 CRV.EXE PAGE 29, LINE 1653

| | | | | | | | | |
|---|---|---|---|---|---|---|---|---|
| 0000066240 | 0500 | 0000 | 0A00 | 5F5F | 6D75 | 7361 | 766B | 6C61 |
| 0000066260 | 0272 | 0001 | 0000 | 5F0A | 635F | 6574 | 6D72 | 7573 |
| 0000066300 | 9C62 | 0502 | 0000 | 0A00 | 5F5F | 7865 | 7469 | 745F |
| 0000066320 | 6469 | 007A | 0005 | 0000 | 5F05 | 665F | 6361 | 0182 |
| 0000066340 | 0001 | 0000 | 5F05 | 7865 | 7469 | 0294 | 0001 | 0000 |
| 0000066360 | 5F0E | 465F | 5F46 | 534D | 4247 | 4E41 | 454E | 9E52 |
| 0000066400 | 0502 | 0000 | 0900 | 5F5F | 6461 | 6762 | 736D | 7667 |
| 0000066420 | 0098 | 0100 | 0900 | 5F5F | 6361 | 7472 | 736D | B667 |
| 0000066440 | 0102 | 0000 | 0800 | 5F5F | 7066 | 7274 | 7061 | 02BC |
| 0000066460 | 0001 | 0000 | 5F0B | 6E5F | 6C75 | 636C | 6568 | 6B63 |
| 0000066500 | 0042 | 0005 | 0000 | 5F0B | 615F | 756E | 6C6C | 6973 |
| 0000066520 | 657A | 02E0 | 0001 | 0000 | 5F09 | 735F | 7465 | 7261 |
| 0000066540 | 7667 | 0468 | 0001 | 0000 | 5F09 | 735F | 7465 | 6E65 |
| 0000066560 | 7076 | 050C | 0001 | 0000 | 5F0B | 4E5F | 534D | 5F47 |
| 0000066600 | 4554 | 5458 | 053C | 0001 | 0000 | 5F0C | 4E5F | 534D |
| 0000066620 | 5F47 | 5257 | 5449 | 7245 | 0105 | 0000 | 0A00 | 5F5F |
| 0000066640 | 7473 | 6164 | 6C6C | 636F | 0594 | 0001 | 0000 | 5F07 |
| 0000066660 | 616D | 6C6C | 636F | 0599 | 0001 | 0000 | 5F0A | 616D |
| 0000066700 | 6C6C | 636F | 6C5F | D06B | 0105 | 0000 | 0C00 | 5F5F |
| 0000066720 | 6D66 | 6C61 | 6F6C | 5F63 | 6B6C | 059E | 0001 | 0000 |
| 0000066740 | 5F07 | 665F | 7266 | 6565 | 05B1 | 0001 | 0000 | 5F09 |
| 0000066760 | 665F | 616D | 6C6C | 636F | 059E | 0001 | 0000 | 5F0A |
| 0000067000 | 665F | 7266 | 6565 | 6C5F | A86B | 0502 | 0000 | 0700 |
| 0000067020 | 5F5F | 6866 | 6165 | 4E70 | 0106 | 0000 | 0900 | 5F5F |
| 0000067040 | 6E69 | 7469 | 6573 | 8267 | 0106 | 0000 | 0900 | 5F5F |
| 0000067060 | 696C | 6B6E | 6573 | B867 | 0106 | 0000 | 0B00 | 5F5F |
| 0000067100 | 6573 | 7261 | 6863 | 6573 | C367 | 0107 | 0000 | 0800 |
| 0000067120 | 5F5F | 6E69 | 7363 | 6765 | 0734 | 0001 | 0000 | 5F09 |
| 0000067140 | 675F | 6F72 | 7377 | 6765 | 07F6 | 0001 | 0000 | 5F0A |
| 0000067160 | 665F | 6E69 | 6C64 | 7361 | B674 | 0502 | 0000 | 0A00 |
| 0000067200 | 5F5F | 6D61 | 6C62 | 736B | 7A69 | 0816 | 0001 | 0000 |
| 0000067220 | 5F08 | 6E5F | 7765 | 6573 | 9867 | 0108 | 0000 | 0600 |
| 0000067240 | 5F5F | 6F6C | 6B63 | 08DA | 0001 | 0000 | 5F07 | 6C5F |
| 0000067260 | 636F | 666B | 086C | 0001 | 0000 | 5F0D | 755F | 6C6E |
| 0000067300 | 636F | 5F6B | 6966 | 656C | 0848 | 0001 | 0000 | 5F0D |
| 0000067320 | 6C5F | 636F | 5F6B | 7473 | 6572 | 6D61 | 08BE | 0001 |
| 0000067340 | 0000 | 5F08 | 755F | 6C6E | 636F | EA6B | 0108 | 0000 |
| 0000067360 | 0900 | 5F5F | 6E75 | 6F6C | 6B63 | 5466 | 0108 | 0000 |
| 0000067400 | 0F00 | 5F5F | 6E75 | 6F6C | 6B63 | 735F | 7274 | 6165 |
| 0000067420 | 786D | 0108 | 0000 | 0A00 | 5F5F | 6177 | 7469 | 6F6C |
| 0000067440 | 6B63 | 0860 | 0001 | 0000 | 5F0B | 6C5F | 636F | 5F6B |
| 0000067460 | 6966 | 656C | 0200 | 0004 | 060A | 5F0E | 6C67 | 626F |
| 0000067500 | 6C61 | 705F | 7261 | 6D61 | E173 | 0133 | 8C00 | 0507 |
| 0000067520 | 6D5F | 6961 | 046E | 014D | D600 | 0F05 | 635F | 7672 |
| 0000067540 | 735F | 7465 | 705F | 7261 | 6D61 | 4673 | 0109 | 0000 |
| 0000067560 | 0B00 | 5F5F | 6366 | 6F6C | 6573 | 6C5F | FA6B | 0108 |
| 0000067600 | 0000 | 0700 | 665F | 6C63 | 736F | FC65 | 0109 | 0000 |
| 0000067620 | 0800 | 5F5F | 7366 | 706F | 6E65 | 0A4E | 0001 | 0000 |
| 0000067640 | 5F06 | 6F66 | 6570 | 666E | 010A | 0000 | 0700 | 705F |
| 0000067660 | 6972 | 746E | B466 | 010A | 0000 | 0700 | 735F | 7274 |
| 0000067700 | 7063 | EA79 | 010A | 0000 | 0700 | 735F | 7274 | 6D63 |
| 0000067720 | 1470 | 010B | 0000 | 0700 | 675F | 7465 | 6E65 | BA76 |
| 0000067740 | 010B | 0000 | 0800 | 735F | 7270 | 6E69 | 6674 | 0C7C |
| 0000067760 | 0001 | 0000 | 5F0A | 695F | 696E | 7474 | 6D69 | 2E65 |
| 0000070000 | 010C | 0000 | 0600 | 635F | 6F6C | 6B63 | 0C8A | 0001 |
| 0000070020 | 0000 | 5F09 | 735F | 7274 | 6164 | 6574 | 0CDE | 0001 |
| 0000070040 | 0000 | 5F09 | 735F | 7274 | 6974 | 656D | 0D2A | 0001 |
| 0000070060 | 0000 | 5F07 | 7473 | 7572 | 7270 | 0000 | 0004 | 0000 |
| 0000070100 | 5F07 | 625F | 6675 | 6E69 | 05F4 | 0005 | 0000 | 5F05 |

THU MAR 14 17:22:14 1991 CRV.EXE PAGE 30, LINE 1712

| | | | | | | | | |
|---|---|---|---|---|---|---|---|---|
| 0000070120 | 695F | 626F | 07D4 | 0005 | 0000 | 5F06 | 695F | 626F |
| 0000070140 | B432 | 0509 | 0000 | 0900 | 5F5F | 616C | 7473 | 6F69 |
| 0000070160 | 4E62 | 010D | 0000 | 0800 | 5F5F | 6C66 | 6273 | 6675 |
| 0000070200 | 0E34 | 0001 | 0000 | 5F09 | 665F | 6572 | 6265 | 6675 |
| 0000070220 | 0E6C | 0001 | 0000 | 5F0A | 6F5F | 6570 | 666E | 6C69 |
| 0000070240 | D665 | 010F | 0000 | 0700 | 5F5F | 7466 | 7562 | 5E66 |
| 0000070260 | 010F | 0000 | 0700 | 5F5F | 7473 | 7562 | 6466 | 0110 |
| 0000070300 | 0000 | 0B00 | 5F5F | 6666 | 756C | 6873 | 6C5F | 1E6B |
| 0000070320 | 0110 | 0000 | 0700 | 665F | 6C66 | 7375 | D068 | 0110 |
| 0000070340 | 0000 | 0900 | 665F | 756C | 6873 | 6C61 | 5C6C | 0111 |
| 0000070360 | 0000 | 0800 | 5F5F | 756F | 7074 | 7475 | 1646 | 0001 |
| 0000070400 | 0000 | 5F0B | 675F | 7465 | 7473 | 6572 | 6D61 | 16BE |
| 0000070420 | 0001 | 0000 | 5F06 | 6C63 | 736F | FE65 | 0116 | 0000 |
| 0000070440 | 0700 | 735F | 7274 | 6163 | 4474 | 0117 | 0000 | 0700 |
| 0000070460 | 735F | 7274 | 656C | 5C6E | 0117 | 0000 | 0800 | 735F |
| 0000070500 | 7274 | 636E | 706D | 1798 | 0001 | 0000 | 5F05 | 7469 |
| 0000070520 | 616F | 17B4 | 0001 | 0000 | 5F06 | 7466 | 6D69 | 2265 |
| 0000070540 | 050A | 0000 | 0800 | 5F5F | 6963 | 6974 | 656D | 1892 |
| 0000070560 | 0001 | 0000 | 5F07 | 6572 | 6F6D | 6576 | 1892 | 0001 |
| 0000070600 | 0000 | 5F07 | 6E75 | 696C | 6B6E | 1880 | 0001 | 0000 |
| 0000070620 | 5F08 | 615F | 6C46 | 756D | B06C | 0118 | 0000 | 0900 |
| 0000070640 | 5F5F | 4661 | 6C75 | 756D | 246C | 050A | 0000 | 0C00 |
| 0000070660 | 5F5F | 6161 | 746C | 7473 | 6F6B | 7276 | 18E2 | 0001 |
| 0000070700 | 0000 | 5F08 | 635F | 6B68 | 7473 | E26B | 0118 | 0000 |
| 0000070720 | 0A00 | 5F5F | 4661 | 6863 | 736B | 6B74 | 19C0 | 0001 |
| 0000070740 | 0000 | 5F0B | 5F5F | 6F64 | 6573 | 7272 | 6F6E | 19C8 |
| 0000070760 | 0001 | 0000 | 5F07 | 655F | 7272 | 6F6E | 1979 | 0001 |
| 0000071000 | 0000 | 5F08 | 645F | 736F | 6572 | 6074 | 0119 | 0000 |
| 0000071020 | 0900 | 5F5F | 6F64 | 7273 | 7465 | 2866 | 050A | 0000 |
| 0000071040 | 0800 | 5F5F | 6663 | 756C | 6873 | 19D4 | 0001 | 0000 |
| 0000071060 | 5F08 | 675F | 7465 | 7562 | 2A66 | 011A | 0000 | 0600 |
| 0000071100 | 6C5F | 6573 | 6B65 | 1A20 | 0001 | 0000 | 5F0A | 6C5F |
| 0000071120 | 6573 | 6B65 | 6C5F | 986B | 011A | 0000 | 0600 | 735F |
| 0000071140 | 706F | 6E65 | 1AA9 | 0001 | 0000 | 5F05 | 706F | 6E65 |
| 0000071160 | 1C64 | 0001 | 0000 | 5F11 | 635F | 4558 | 494E | 7458 |
| 0000071200 | 446F | 534F | 6F6D | 6564 | 1C80 | 0001 | 0000 | 5F06 |
| 0000071220 | 7277 | 7469 | 7665 | 011C | 0000 | 0A00 | 5F5F | 7277 |
| 0000071240 | 7469 | 5F65 | 6B6C | 1E6F | 0001 | 0000 | 5F08 | 7266 |
| 0000071260 | 6565 | 6C5F | 6A6B | 011E | 0000 | 0500 | 665F | 6572 |
| 0000071300 | 2A65 | 050A | 0000 | 0D00 | 5F5F | 6663 | 746C | 7663 |
| 0000071320 | 5F74 | 6174 | 4662 | 050A | 0000 | 0800 | 5F5F | 7361 |
| 0000071340 | 7A69 | 4365 | 0A47 | 0005 | 0000 | 5F08 | 615F | 6973 |
| 0000071360 | 657A | 4444 | 050A | 0000 | 0B00 | 5F5F | 6973 | 6967 |
| 0000071400 | 746E | 666F | 4266 | 050A | 0000 | 0B00 | 5F5F | 6973 |
| 0000071420 | 6967 | 746E | 6573 | 6267 | 050A | 0000 | 0600 | 5F5F |
| 0000071440 | 6164 | 7379 | 0A48 | 0005 | 0000 | 5F08 | 6C5F | 6470 |
| 0000071460 | 7961 | 9473 | 011E | 0000 | 0600 | 745F | 737A | 7465 |
| 0000071500 | 1F6E | 0001 | 0000 | 5F09 | 695F | 6973 | 646E | 7473 |
| 0000071520 | 1E74 | 0001 | 0000 | 5F08 | 5F5F | 7A74 | 6573 | 8C74 |
| 0000071540 | 050A | 0000 | 0900 | 645F | 7961 | 696C | 6867 | 8874 |
| 0000071560 | 050A | 0000 | 0900 | 745F | 6D69 | 7A65 | 6E6F | 8E65 |
| 0000071600 | 050A | 0000 | 0700 | 745F | 6E7A | 6D61 | 9665 | 050A |
| 0000071620 | 0000 | 0900 | 5F5F | 645F | 616E | 656D | AC73 | 050A |
| 0000071640 | 0000 | 0900 | 5F5F | 6D5F | 616E | 656D | 3C73 | 0120 |
| 0000071660 | 0000 | 0A00 | 5F5F | 7464 | 786F | 6974 | 656D | 213F |
| 0000071700 | 0001 | 0000 | 5F07 | 635F | 7478 | 616F | 2132 | 0001 |
| 0000071720 | 0000 | 5F0A | 635F | 746C | 616F | 7573 | 9662 | 0121 |
| 0000071740 | 0000 | 0800 | 5F5F | 4661 | 646C | 7669 | 2230 | 0001 |
| 0000071760 | 0000 | 5F0B | 7473 | 6361 | 616B | 6176 | 6C69 | 0AD2 |

```
THU MAR 14 17:22:14 1991  CRV.EXE  PAGE 31, LINE 1771

0000072000  0005  0000  5F07  665F  6F6D  6564  0AD2  0005
0000072020  0000  5F08  695F  6D6F  646F  4E65  0122  0000
0000072040  0800  735F  7274  636E  7970  2278  0001  0000
0000072060  5F05  7461  6C6F  0AD4  0005  0000  5F07  635F
0000072100  7974  6570  0AD4  0005  0000  5F08  635F  7974
0000072120  6570  7C5F  0122  0000  0B00  5F5F  6567  7474
0000072140  6469  6174  D662  050B  0000  0B00  5F5F  6974
0000072160  7464  6261  616D  F678  0122  0000  0700  5F5F
0000072200  6163  6F74  0178  000A  8075  8183  6400  8300
0000072220  0201  0101  8000  1601  7900  0330  0383  8302
0000072240  0204  0A82  7528  746E  6761  6567  2964  0169
0000072260  000A  837F  0081  8183  8300  0081  1C01  7F00
0000072300  0682  6170  6B63  685F  8200  6606  6C69  5F65
0000072320  0268  0682  7566  636E  685F  0104  0007  737A
0000072340  C083  8200  0100  0001  0180  0001  0180  0001
0000072360  0180  0001  0180  0001  0180  0001  0180  0001
*
0000072540  0180  0001  0180  0001  0180  0001  0180  0005
0000072560  5878  8083  0100  0005  3078  8083  0100  0001
0000072600  0180  0001  0180  0001  0180  0001  0180  0001
*
0000073020  0180  0005  6878  8083  0100  0001  0180  0001
0000073040  0180  0001  0180  0001  0180  0007  8578  0100
0000073060  8083  0100  0001  0180  0001  0180  0001  0180
0000073100  0001  0180  0001  0180  0001  0180  0001  0180
*
0000073260  0014  3079  8303  0275  7683  8202  5F08  4950
0000073300  4944  464E  694F  0A01  7F00  8583  8300  0085
0000073320  8583  0100  0019  827F  7003  6469  8200  7403
0000073340  6469  8202  7009  6469  6150  6572  746E  0104
0000073360  0001  0180  0001  0180  0001  0180  0001  0180
*
0000073740  0001  0180  0001  0180  0005  6078  8083  0100
0000073760  0001  0180  0001  0180  0001  0180  0001  0180
*
0000074400  0001  0180  0001  0180  0001  0180  0013  3079
0000074420  8302  02FE  F583  8202  5F07  554D  5358  4D45
0000074440  0169  0007  837F  0085  C083  0100  000F  827F
0000074460  7A04  7265  006F  0482  7368  6D65  0102  0001
0000074500  0180  0019  8579  0310  8302  0303  0483  8203
0000074520  5F0B  554D  5358  4D45  494C  5453  0169  0007
0000074540  8578  0300  FD83  0102  0007  837F  0085  0283
0000074560  0103  000F  827F  6304  786D  0073  0482  6D61
0000074600  7378  0102  0001  0180  0001  0180  0001  0180
0000074620  0001  0180  0001  0180  0001  0180  0001  0180
*
0000075020  0001  0180  0001  0180  0005  2878  8083  0100
0000075040  0001  0180  0001  0180  0001  0180  0001  0180
*
0000077620  0001  0180  0001  0180  0012  6079  8305  048A
0000077640  8B83  8204  5F06  6F69  7562  6966  1001  7F00
0000077660  C083  8300  0081  C083  8300  0080  8083  0100
0000077700  0027  827F  5F04  7470  0072  0482  635F  746E
0000077720  8204  5F05  6162  6573  8206  5F05  6C66  6761
0000077740  820A  5F05  6966  656C  010B  0001  0180  0007
0000077760  737A  8983  8204  0100  0001  0180  0001  0180
0000100000  0001  0180  0001  0180  0001  0180  0001  0180
*
0000100340  0001  0180  0007  737A  CA83  8204  0100  000A
```

```
THU MAR 14 17:22:14 1991  CRV.EXE  PAGE 32, LINE 1830

0000100360  8075  8183  6400  8300  0201  0101  8000  0101
0000100400  8000  0101  8000  0101  8000  0101  8000  0101
*
0000101200  8000  1601  7900  0220  2E83  8305  052F  0A82
0000101220  7528  746E  6761  6567  2964  0169  0007  837F
0000101240  0081  8183  0100  0009  827F  7801  8200  7901
0000101260  0102  0016  4079  8302  0531  3283  8205  280A
0000101300  6E75  6174  6767  6465  6929  0701  7F00  2D83
0000101320  8305  052D  0D01  7F00  0382  696D  006E  0382
0000101340  616D  0478  0101  8000  1601  7900  0220  3583
0000101360  8305  0536  0A82  7528  746E  6761  6567  2964
0000101400  0169  0007  837F  0085  8583  0100  0012  827F
0000101420  7705  6469  6874  8200  6806  6965  6867  0274
0000101440  0101  8000  1601  7900  0240  3983  8305  053A
0000101460  0A82  7528  746E  6761  6567  2964  0169  0007
0000101500  837F  052D  3483  0105  0011  827F  6F06  6972
0000101520  6967  006E  0482  7261  6165  0104  0001  0180
0000101540  0001  0180  0001  0180  0001  0180  0001  0180
*
0000101620  0001  0180  0016  2079  8301  054A  4B83  8205
0000101640  280A  6E75  6174  6767  6465  6929  0401  7F00
0000101660  8683  0100  0009  827F  6405  6D75  796D  0100
0000101700  0001  0180  0001  0180  0001  0180  0001  0180
*
0000102060  0016  3079  8303  0569  6A83  8205  280A  6E75
0000102100  6174  6767  6465  6929  0A01  7F00  8583  8300
0000102120  0085  8583  0100  001A  827F  7705  6469  6874
0000102140  8200  6806  6965  6867  0274  0582  6564  7470
0000102160  0468  1801  7900  4085  0801  6D83  8305  056E
0000102200  0A82  7528  746E  6761  6567  2964  0169  0007
0000102220  8578  0080  8483  0100  0019  837F  0081  6883
0000102240  8305  0085  8583  8300  00C4  8283  8300  00E4
0000102260  6C83  0105  005A  827F  7206  7065  6572  0073
0000102300  0682  6964  656D  736E  8202  6410  7461  5F61
0000102320  616C  6579  5F72  6564  7470  0868  0882  6973
0000102340  5F67  6973  657A  820A  7307  6769  705F  7274
0000102360  820C  6209  6D74  5F70  6973  657A  8210  6208
0000102400  6D74  5F70  7470  1472  0582  7073  7261  1865
0000102420  0101  8000  1801  7900  A085  0C05  7283  8305
0000102440  0573  0A82  7528  746E  6761  6567  2964  0169
0000102460  0007  8578  0180  8483  0100  0025  837F  0086
0000102500  5483  8302  0254  8683  8300  0081  8583  8300
0000102520  0086  8283  8300  0086  2D83  8305  056B  7183
0000102540  0105  007E  827F  6902  0064  0482  616E  656D
0000102560  8204  6609  6C69  5F65  616E  656D  8224  6509
0000102600  7078  745F  5F63  6469  8244  7404  7079  4865
0000102620  0C82  6572  5F66  696C  656E  6E5F  6D75  824A
0000102640  7209  6665  745F  5F63  6469  824C  740A  6D69
0000102660  5F65  7473  6D61  5070  0682  6F61  5F69  6469
0000102700  8254  6C08  636F  7461  6F69  586E  0982  7462
0000102720  706D  695F  666E  5C6F  0582  7073  7261  8565
0000102740  0084  0101  8000  0101  8000  0101  8000  0101
0000102760  8000  0101  8000  0101  8000  0101  8000  0101
0000103000  8000  0101  8000  0101  8000  0701  7A00  8373
0000103020  0570  0082  0101  8000  0101  8000  0101  8000
0000103040  0101  8000  0101  8000  0101  8000  0101  8000
*
0000103440  0101  8000  0101  8000  0101  8000  1801  7900
0000103460  C085  0702  C783  8305  05C8  0A82  7528  746E
```

```
THU MAR 14 17:22:14 1991  CRV.EXE  PAGE 33, LINE 1889

0000103500  6761  6567  2964  0169  0007  8578  0120  8483
0000103520  0100  0016  837F  0086  5483  8302  0530  8183
0000103540  8300  0081  8283  8300  05C6  3801  7F00  0282
0000103560  6469  8200  6E04  6D61  0465  0482  6572  7463
0000103600  8224  6104  7474  2C72  0582  7564  6D6D  2E79
0000103620  0A82  6974  656D  735F  6174  706D  8230  7305
0000103640  6170  6572  0134  0001  0180  0001  0180  0001
0000103660  0180  0001  0180  0001  0180  0001  0180  0001
*
0000104240  0180  0001  0180  0001  0180  0018  8579  0110
0000104260  8311  060B  0C83  8206  280A  6E75  6174  6767
0000104300  6465  6929  3401  7F00  8583  8300  0085  8583
0000104320  8300  0085  8583  8300  0085  8183  8300  0085
0000104340  8583  8300  0085  8483  8300  0085  8583  8300
0000104360  0085  8583  8300  0085  8583  0100  0106  827F
0000104400  7409  6D69  5F65  6E75  7469  8200  6D0F  6E69
0000104420  725F  6365  726F  5F64  6974  656D  8202  7309
0000104440  6174  6962  696C  7974  8204  630F  7061  7574
0000104460  6572  745F  6D69  6F65  7475  8206  6B0A  7965
0000104500  665F  726F  616D  0874  1382  6F63  746E  6E69
0000104520  6F75  7375  745F  6172  6B63  6E69  0A67  0E82
0000104540  6F6D  7375  5F65  7274  6361  696B  676E  820C
0000104560  6311  7061  7574  6572  735F  6769  616E  7574
0000104600  6572  820E  680B  746F  656B  5F79  7973  636E
0000104620  8210  640C  6665  7561  746C  745F  6D69  1265
0000104640  0982  616D  5F78  6564  616C  1479  0B82  6166
0000104660  7473  725F  7065  616C  1679  0E82  6576  6972
0000104700  7966  745F  6D69  6F65  7475  8218  770C  6961
0000104720  5F74  6974  656D  756F  1A74  0C82  7973  636E
0000104740  745F  6D69  6F65  7475  821C  7409  7268  7365
0000104760  6F68  646C  821E  630C  6568  6B63  6C5F  6F6F
0000105000  756B  2070  0101  8000  0701  7800  0085  8308
0000105020  0080  0101  8000  0101  8000  0101  8000  0101
0000105040  8000  0101  8000  0101  8000  0101  8000  0101
*
0000105220  8000  0101  8000  1601  7900  0240  3183  8306
0000105240  0632  0A82  7528  746E  6761  6567  2964  0169
0000105260  0007  837F  0082  8283  0100  0017  827F  6408
0000105300  6665  745F  6D69  0065  0882  696D  5F6E  6974
0000105320  656D  0104  0001  0180  0001  0180  0001  0180
0000105340  0001  0180  0001  0180  0001  0180  0016  4079
0000105360  8304  063A  3B83  8206  280A  6E75  6174  6767
0000105400  6465  6929  0D01  7F00  8483  8300  0084  8483
0000105420  8300  052D  2901  7F00  0782  6261  5F73  6572
0000105440  006C  0582  6E75  7469  0173  0C82  7073  6365
0000105460  6169  5F6C  7566  636E  8202  6404  7369  0470
0000105500  0101  8000  0101  8000  0101  8000  1601  7900
0000105520  0220  4083  8306  0641  0A82  7528  746E  6761
0000105540  6567  2964  0169  0007  837F  0081  8183  0100
0000105560  001E  827F  7309  6E79  5F63  6F6D  6564  8200
0000105600  730E  6E79  5F63  7865  6365  6D5F  646F  0265
0000105620  1601  7900  0230  4383  8306  0644  0A82  7528
0000105640  746E  6761  6567  2964  0169  0007  837F  0082
0000105660  8183  0100  0019  827F  7407  6365  5F68  6469
0000105700  8200  740B  6365  5F68  6572  7361  6E6F  0104
0000105720  0001  0180  0001  0180  0001  0180  0018  8579
0000105740  0220  8303  0649  4A83  8206  280A  6E75  6174
0000105760  6767  6465  6929  0A01  7F00  5483  8302  0254
0000106000  8683  0100  001A  827F  6905  616D  6567  8200
```

THU MAR 14 17:22:14 1991 CRV.EXE PAGE 34, LINE 1948

| | | | | | | | | |
|---|---|---|---|---|---|---|---|---|
| 0000106020 | 6404 | 6669 | 2066 | 0782 | 6964 | 6666 | 695F | 4064 |
| 0000106040 | 1801 | 7900 | 1085 | 0203 | 4D83 | 8306 | 064E | 0A82 |
| 0000106060 | 7528 | 746E | 6761 | 6567 | 2964 | 0169 | 0007 | 8578 |
| 0000106100 | 0300 | 5483 | 0102 | 0007 | 837F | 0085 | 4C83 | 0106 |
| 0000106120 | 0024 | 827F | 6E0E | 6D75 | 6F5F | 5F66 | 6373 | 6572 |
| 0000106140 | 6E65 | 0073 | 0F82 | 6D69 | 6761 | 5F65 | 616E | 656D |
| 0000106160 | 6C5F | 7369 | 0274 | 1601 | 7900 | 0120 | 5083 | 8306 |
| 0000106200 | 0651 | 0A82 | 7528 | 746E | 6761 | 6567 | 2964 | 0169 |
| 0000106220 | 0004 | 837F | 00C0 | 0A01 | 7F00 | 0682 | 7473 | 6972 |
| 0000106240 | 676E | 0100 | 0001 | 0180 | 0001 | 0180 | 0001 | 0180 |
| 0000106260 | 0016 | 3079 | 8302 | 0656 | 5783 | 8206 | 280A | 6E75 |
| 0000106300 | 6174 | 6767 | 6465 | 6929 | 0701 | 7F00 | 8283 | 8300 |
| 0000106320 | 0081 | 1E01 | 7F00 | 0C82 | 7865 | 6563 | 7470 | 6F69 |
| 0000106340 | 5F6E | 6469 | 8200 | 650B | 6378 | 5F70 | 7473 | 7461 |
| 0000106360 | 7375 | 0104 | 0016 | 2079 | 8302 | 065C | 5D83 | 8206 |
| 0000106400 | 280A | 6E75 | 6174 | 6767 | 6465 | 6929 | 1601 | 7900 |
| 0000106420 | 0208 | 5A83 | 8306 | 065B | 0A82 | 7528 | 746E | 6761 |
| 0000106440 | 6567 | 2964 | 0169 | 0007 | 837F | 0084 | 8483 | 0100 |
| 0000106460 | 001B | 827F | 6B08 | 7965 | 635F | 646F | 0065 | 0C82 |
| 0000106500 | 7773 | 7469 | 6863 | 735F | 6174 | 6574 | 0100 | 0007 |
| 0000106520 | 837F | 0081 | 5983 | 0106 | 0018 | 827F | 6B08 | 7965 |
| 0000106540 | 745F | 7079 | 0065 | 0982 | 656B | 5F79 | 6176 | 756C |
| 0000106560 | 0265 | 1801 | 7900 | 3085 | 0402 | 6083 | 8306 | 0661 |
| 0000106600 | 0A82 | 7528 | 746E | 6761 | 6567 | 2964 | 0169 | 0007 |
| 0000106620 | 8578 | 0200 | 5883 | 0106 | 000D | 837F | 0085 | 5F83 |
| 0000106640 | 8306 | 0081 | 8183 | 0100 | 002E | 827F | 7308 | 7165 |
| 0000106660 | 735F | 7A69 | 0065 | 0382 | 6573 | 0271 | 0882 | 656B |
| 0000106700 | 5F79 | 7461 | 7274 | 8242 | 610E | 7463 | 7669 | 7461 |
| 0000106720 | 6465 | 665F | 6E75 | 4463 | 0101 | 8000 | 0101 | 8000 |
| 0000106740 | 0101 | 8000 | 0101 | 8000 | 0101 | 8000 | 0101 | 8000 |
| 0000106760 | 0101 | 8000 | 0101 | 8000 | 1601 | 7900 | 0220 | 6B83 |
| 0000107000 | 8306 | 066C | 0A82 | 7528 | 746E | 6761 | 6567 | 2964 |
| 0000107020 | 0169 | 0007 | 837F | 0081 | 8183 | 0100 | 0017 | 827F |
| 0000107040 | 6B08 | 7965 | 615F | 7474 | 0072 | 0882 | 7566 | 636E |
| 0000107060 | 6B5F | 7965 | 0102 | 0018 | 8579 | 0210 | 8302 | 066E |
| 0000107100 | 6F83 | 8206 | 280A | 6E75 | 6174 | 6767 | 6465 | 6929 |
| 0000107120 | 0701 | 7F00 | 8583 | 8300 | 065F | 1201 | 7F00 | 0882 |
| 0000107140 | 6573 | 5F71 | 6973 | 657A | 8200 | 7303 | 7165 | 0102 |
| 0000107160 | 0001 | 0180 | 0001 | 0180 | 0001 | 0180 | 0001 | 0180 |
| 0000107200 | 0001 | 0180 | 0018 | 8579 | 02D0 | 8302 | 0676 | 7783 |
| 0000107220 | 8206 | 280A | 6E75 | 6174 | 6767 | 6465 | 6929 | 0701 |
| 0000107240 | 7F00 | C583 | 8305 | 0081 | 1101 | 7F00 | 0682 | 6966 |
| 0000107260 | 746C | 7265 | 8200 | 6D04 | 646F | 5865 | 1801 | 7900 |
| 0000107300 | 5085 | 0501 | 7983 | 8306 | 067A | 0A82 | 7528 | 746E |
| 0000107320 | 6761 | 6567 | 2964 | 0169 | 0010 | 837F | 0254 | 8683 |
| 0000107340 | 8300 | 0081 | 8183 | 8300 | 0081 | 2B01 | 7F00 | 0482 |
| 0000107360 | 616E | 656D | 8200 | 6C06 | 6269 | 695F | 2064 | 0582 |
| 0000107400 | 6C63 | 7361 | 2473 | 0582 | 7473 | 6C79 | 2665 | 0782 |
| 0000107420 | 706F | 635F | 646F | 2865 | 0101 | 8000 | 0101 | 8000 |
| 0000107440 | 0101 | 8000 | 1B01 | 7900 | 0920 | 7F83 | 8306 | 0680 |
| 0000107460 | 0F82 | 5F69 | 5F75 | 736D | 5F67 | 6170 | 6172 | 5F6D |
| 0000107500 | 6974 | 1C01 | 7F00 | 8183 | 8300 | 0085 | 8283 | 8300 |
| 0000107520 | 0086 | 8883 | 8300 | 0080 | 8483 | 8300 | 00C0 | C083 |
| 0000107540 | 0100 | 006A | 827F | 6909 | 755F | 735F | 6F68 | 7472 |
| 0000107560 | 8200 | 690A | 755F | 755F | 6873 | 726F | 0074 | 0882 |
| 0000107600 | 5F69 | 5F75 | 6F6C | 676E | 8200 | 6909 | 755F | 755F |
| 0000107620 | 6F6C | 676E | 8200 | 6909 | 755F | 665F | 6F6C | 7461 |
| 0000107640 | 8200 | 6908 | 755F | 635F | 6168 | 0072 | 0982 | 5F69 |
| 0000107660 | 5F75 | 6375 | 6168 | 0072 | 0782 | 5F69 | 5F75 | 7473 |

```
THU MAR 14 17:22:14 1991  CRV.EXE  PAGE 35, LINE 2007

0000107700  0072  0982  5F69  5F75  6C62  636F  006B  1901
0000107720  7900  0230  8283  8306  0683  0D82  5F69  736D
0000107740  5F67  6170  6172  5F6D  6974  0701  7F00  8583
0000107760  8300  067E  1001  7F00  0482  7974  6570  8200
0000110000  7605  6C61  6575  0102  0001  0180  001C  8579
0000110020  0090  8309  0686  8783  8206  690E  6D5F  6773
0000110040  685F  6165  6564  5F72  6974  1C01  7F00  8183
0000110060  8300  0081  8583  8300  0085  8483  8300  0085
0000110100  8583  8300  0081  8583  0100  0047  827F  7104
0000110120  695F  0064  0682  6F73  7275  6563  8202  7003
0000110140  6469  8204  7403  6469  8206  7204  7365  0870
0000110160  0882  6572  7073  745F  6469  820A  6F07  5F70
0000110200  6F63  6564  820C  7404  7079  0E65  0482  6973
0000110220  657A  0110  0015  8579  00C0  8302  068A  8B83
0000110240  8206  6907  6D5F  6773  745F  0169  0005  3078
0000110260  8183  0106  0007  837F  0685  8983  0106  0017
0000110300  827F  6806  6165  6564  0072  0A82  6170  6172
0000110320  5F6D  696C  7473  0112  0001  0180  0001  0180
0000110340  0001  0180  0001  0180  0001  0160  0001  0180
*
0000110600  0001  0180  0001  0180  0016  4079  8303  06BA
0000110620  BB83  8206  280A  6E75  6174  6767  6465  6929
0000110640  0701  7A00  8373  065E  0082  0A01  7F00  8183
0000110660  8300  0081  B983  0106  002B  827F  6106  7463
0000110700  6F69  006E  0F82  756E  5F6D  666F  735F  666F
0000110720  6B74  7965  0273  0C82  6F73  7466  656B  7379
0000110740  705F  7274  0104  0016  4079  8303  06BE  BF83
0000110760  8206  280A  6E75  6174  6767  6465  6929  0701
0000111000  7A00  8373  066D  0082  0A01  7F00  8183  8300
0000111020  0081  BD83  0106  0029  827F  6106  7463  6F69
0000111040  006E  0E82  756E  5F6D  666F  685F  746F  656B
0000111060  7379  8202  680B  746F  656B  7379  705F  7274
0000111100  0104  0018  8579  0170  8305  06C1  C283  8206
0000111120  280A  6E75  6174  6767  6465  6929  1001  7F00
0000111140  5483  8302  0086  7E83  8305  00E4  8583  0100
0000111160  003D  827F  690A  616D  6567  6E5F  6D61  0065
0000111200  0882  6D69  6761  5F65  6469  8220  6909  616D
0000111220  6567  705F  7274  8224  6C09  7961  7265  705F
0000111240  7274  8228  6909  616D  6567  685F  6C64  012C
0000111260  0001  0180  0001  0180  0001  0180  0001  0180
0000111300  0018  8579  0190  8302  06C8  C983  8206  280A
0000111320  6E75  6174  6767  6465  6929  0701  7F00  8283
0000111340  8300  06C0  1801  7F00  0C82  7865  6563  7470
0000111360  6F69  5F6E  6469  8200  6905  616D  6567  0104
0000111400  0001  0180  0016  4079  8303  06CD  CE83  8206
0000111420  280A  6E75  6174  6767  6465  6929  0701  7A00
0000111440  8373  06C7  0082  0A01  7F00  8183  8300  0081
0000111460  CC83  0106  002F  827F  6106  7463  6F69  006E
0000111500  1182  756E  5F6D  666F  655F  6378  7065  6974
0000111520  6E6F  0273  0E82  7865  6563  7470  6F69  5F6E
0000111540  696C  7473  0104  0018  8579  0450  8303  06D0
0000111560  D183  8206  280A  6E75  6174  6767  6465  6929
0000111600  0A01  7F00  C083  8306  06C0  C083  0106  001A
0000111620  827F  6906  616D  6567  0031  0682  6D69  6761
0000111640  3265  822E  6404  6669  5C66  1801  7900  A085
0000111660  0301  D483  8306  06D5  0A82  7528  746E  6761
0000111700  6567  2964  0169  0007  737A  C083  8206  0100
0000111720  000A  837F  0081  D383  8306  06C0  2601  7F00
0000111740  0E82  756E  5F6D  666F  735F  7263  6565  736E
```

THU MAR 14 17:22:14 1991 CRV.EXE PAGE 36, LINE 2066

```
0000111760  8200  690A  616D  6567  6C5F  7369  0274  0482
0000112000  6964  6666  0106  0018  8579  0210  8303  06D7
0000112020  D883  8206  280A  6E75  6174  6767  6465  6929
0000112040  0A01  7F00  5483  8302  0254  8183  0100  0019
0000112060  827F  6906  616D  6567  0031  0682  6D69  6761
0000112100  3265  8220  6303  7475  0140  0018  8579  0940
0000112120  8307  06DD  DE83  8206  280A  6E75  6174  6767
0000112140  6465  6929  1801  7900  0085  1D08  DB83  8306
0000112160  06DC  0A82  7528  746E  6761  6567  2964  0169
0000112200  0058  837F  0084  0E83  8306  0084  8483  8300
0000112220  0639  8183  8300  0538  3F83  8306  0675  C583
0000112240  8305  0081  BC83  8306  0642  CB83  8306  0655
0000112260  8183  8300  06B8  C083  8306  06CF  D283  8306
0000112300  064B  8583  8300  0648  D683  8306  064F  0A83
0000112320  8306  066A  7883  8306  0084  6F01  7F01  0A82
0000112340  626B  5F64  7473  7461  7375  8200  7409  7365
0000112360  5F74  616E  656D  8200  6B08  7965  635F  646F
0000112400  0065  0C82  7773  7469  6863  735F  6174  6574
0000112420  8200  6C0C  636F  7461  726F  645F  7369  0070
0000112440  0E82  7274  6361  696B  676E  6C5F  7665  6C65
0000112460  8200  730C  6163  656C  775F  6E69  6F64  0077
0000112500  0982  7973  636E  6D5F  646F  0065  0A82  6966
0000112520  746C  7265  6D5F  6773  8200  6606  6C69  6574
0000112540  0072  0B82  7563  7272  6E65  5F74  6F61  0069
0000112560  0C82  6F68  6B74  7965  5F73  696C  7473  8200
0000112600  730A  6E79  5F63  7665  6E65  0074  0E82  7865
0000112620  6563  7470  6F69  5F6E  696C  7473  8200  6510
0000112640  6378  5F70  7473  7461  7375  6C5F  7369  0074
0000112660  0482  6F6D  6564  8200  730D  666F  6B74  7965
0000112700  5F73  696C  7473  8200  6905  616D  6567  8200
0000112720  6307  6D6F  6170  6572  8200  770B  6961  5F74
0000112740  6373  6572  6E65  8200  690A  616D  6567  6C5F
0000112760  7369  0074  0982  6D69  6761  5F65  756E  006D
0000113000  0A82  6D69  6761  5F65  6964  6666  8200  680B
0000113020  6C61  5F66  6D69  6761  7365  8200  6D07  7361
0000113040  6173  6567  8200  7006  7261  6D61  0073  0882
0000113060  7566  636E  6B5F  7965  8200  6908  6F63  5F6E
0000113100  736D  0067  0582  7564  6D6D  0079  1601  7F00
0000113120  8183  8300  0688  8183  8300  0630  DA83  8306
0000113140  0081  8583  0100  005A  827F  7306  756F  6372
0000113160  0065  0A82  736D  5F67  6568  6461  7265  8202
0000113200  650A  6576  746E  745F  7079  1A65  0682  6974
0000113220  696D  676E  821C  650B  6576  746E  765F  6C61
0000113240  6575  8224  720C  7465  7275  5F6E  6176  756C
0000113260  8565  0124  0982  6572  7073  665F  616C  8567
0000113300  0126  0101  8000  0101  8000  0101  8000  0101
0000113320  8000  0701  7A00  8373  06D9  0082  0101  8000
0000113340  0101  8000  0101  8000  0101  8000  0101  8000
*
0000114160  0101  8000  0101  8000  1601  7900  0440  4C83
0000114200  8307  074D  0A82  7528  746E  6761  6567  2964
0000114220  0169  000D  837F  0085  8583  8300  0081  8583
0000114240  0100  0036  827F  7310  7475  635F  6E6F  656E
0000114260  7463  665F  616C  0067  0D82  7573  5F74  6F6C
0000114300  6B63  665F  616C  0267  0482  6F6D  6564  8204
0000114320  7308  7465  665F  616C  0667  0101  8000  0701
0000114340  7800  F085  8300  0080  0501  7800  8308  0080
0000114360  0701  7A00  8373  06E3  0082  0101  8000  0101
0000114400  8000  0A01  7500  8380  0081  0364  5583  0107
```

```
THU MAR 14 17:22:14 1991  CRV.EXE  PAGE 37, LINE 2125

0000114420   000A  837F  00C5  8583  8300  0751  0A01  7500
0000114440   8380  0200  0173  5783  0107  0004  837F  0085
0000114460   0701  7A00  8373  074B  0082  0A01  7500  8380
0000114500   0200  0464  5A83  0107  000D  837F  0085  8583
0000114520   8300  0081  5883  0107  000A  8075  0083  6402
0000114540   8304  075C  0D01  7F00  C583  8300  00C5  C183
0000114560   8300  0758  0101  8000  0101  8000  0101  8000
0000114600   0101  8000  0A01  7500  8380  0200  0064  0183
0000114620   0102  0007  8578  0088  8083  0100  0007  8578
0000114640   00A0  8083  0100  0007  8578  0090  8083  0100
0000114660   000A  8075  8183  6400  8300  0201  0701  7800
0000114700   0085  8310  0080  0501  7800  8320  0080  0501
0000114720   7800  8328  0080  0501  7800  8338  0080  0501
0000114740   7800  8310  0080  0501  7800  8378  0080  0701
0000114760   7800  9885  8300  0080  0701  7800  F885  8300
0000115000   0080  0701  7300  E885  8300  0080  0501  7800
0000115020   8318  0080  0401  7F00  5183  0107  000A  8075
0000115040   8183  6400  8301  0770  0A01  7F00  C583  8300
0000115060   0085  5183  0107  000A  8075  8183  6400  8303
0000115100   0772  0401  7F00  8183  0100  000A  8075  0083
0000115120   6402  8301  0774  0101  8000  0101  8000  0501
0000115140   7800  8360  0082  0501  7800  8340  0080  0501
0000115160   7800  8360  0080  0401  7F00  8583  0100  000A
0000115200   8075  0083  7302  8301  077B  0701  7800  C885
0000115220   8300  0080  0701  7800  D085  8300  0080  0701
0000115240   7800  B085  8300  0080  0401  7F00  E383  0106
0000115260   000A  8075  8183  6400  8301  0780  0401  7F00
0000115300   E383  0106  000A  8075  8183  6400  8301  0782
0000115320   0401  7F00  E383  0106  000A  8075  8183  6400
0000115340   8301  0784  0701  7800  C085  8300  0080  0401
0000115360   7F00  E383  0106  000A  8075  8183  6400  8301
0000115400   0787  0101  8000  0101  8000  0701  7F00  8183
0000115420   8300  0205  0A01  7500  8380  0081  0264  8B83
0000115440   0107  0007  8578  0400  8083  0100  0007  8578
0000115460   0108  8083  0100  0007  8578  0080  8083  0100
0000115500   0007  8578  00D8  8083  0100  0005  7078  8083
0000115520   0100  0007  8578  00B8  8083  0100  000D  837F
0000115540   0085  8583  8300  0081  5883  0107  000A  8075
0000115560   0083  6402  8304  0793  0D01  7F00  C583  8300
0000115600   00C5  C183  8300  0758  0A01  7500  8380  0200
0000115620   0464  9583  0107  0004  837F  00C4  0A01  7500
0000115640   8380  0200  0164  9783  0107  0004  837F  0084
0000115660   0A01  7500  8380  0200  0164  9983  0107  0001
0000115700   0180  0001  0180  0001  0180  0001  0180  0001
*
0000116140   0180  0001  0180  0001  0180  0001  0180  0007
0000116160   8578  0100  8083  0100  0001  0180  0001  0180
0000116200   0001  0180  0001  0180  0001  0180  0001  0180
*
0000122120   0016  2079  8302  0424  2583  8204  280A  6E75
0000122140   6174  6767  6465  6929  0701  7F00  8183  8300
0000122160   0081  0901  7F00  0182  0078  0182  0279  1601
0000122200   7900  0240  2783  8304  0428  0A82  7528  746E
0000122220   6761  6567  2964  0169  0007  837F  0423  2383
0000122240   0104  000D  827F  6D03  6E69  8200  6D03  7861
0000122260   0104  0001  0180  0016  2079  8302  042B  2C83
0000122300   8204  280A  6E75  6174  6767  6465  6929  0701
0000122320   7F00  8583  8300  0085  1201  7F00  0582  6977
0000122340   7464  0068  0682  6568  6769  7468  0102  0001
```

THU MAR 14 17:22:14 1991 CRV.EXE PAGE 38, LINE 2184

```
0000122360  0180  0016  4079  8302  042F  3083  8204  280A
0000122400  6E75  6174  6767  6465  6929  0701  7F00  2383
0000122420  8304  042A  1101  7F00  0682  726F  6769  6E69
0000122440  8200  6104  6572  0461  0101  8000  0101  8000
0000122460  0101  8000  0101  8000  0101  8000  0101  8000
*
0000122720  0101  8000  0101  8000  0101  8000  1601  7900
0000122740  0330  5F83  8304  0460  0A82  7528  746E  6761
0000122760  6567  2964  0169  000A  837F  0085  8583  8300
0000123000  0085  1A01  7F00  0582  6977  7464  0068  0682
0000123020  6568  6769  7468  8202  6405  7065  6874  0104
0000123040  0018  8579  0140  8308  0463  6483  8204  280A
0000123060  6E75  6174  6767  6465  6929  0701  7800  8085
0000123100  8300  0084  1901  7F00  8183  8300  045E  8583
0000123120  8300  0085  C483  8300  0082  E483  8300  0462
0000123140  5A01  7F00  0682  6572  7270  7365  8200  6404
0000123160  6D69  6E65  0273  1082  6164  6174  6C5F  7961
0000123200  7265  645F  7065  6874  8208  7308  6769  735F
0000123220  7A69  0A65  0782  6973  5F67  7470  0C72  0982
0000123240  7462  706D  735F  7A69  1065  0882  7462  706D
0000123260  705F  7274  8214  7305  6170  6572  0118  0001
0000123300  0180  0018  8579  05A0  830C  0468  6983  8204
0000123320  280A  6E75  6174  6767  6465  6929  0701  7800
0000123340  8085  8301  0084  2501  7F00  8683  8300  022C
0000123360  2C83  8302  0086  8183  8300  0085  8683  8300
0000123400  0082  8683  8300  0423  6183  8304  0467  7E01
0000123420  7F00  0282  6469  8200  6E04  6D61  0465  0982
0000123440  6966  656C  6E5F  6D61  2465  0982  7865  5F70
0000123460  6374  695F  4464  0482  7974  6570  8248  720C
0000123500  6665  6C5F  6E69  5F65  756E  4A6D  0982  6572
0000123520  5F66  6374  695F  4C64  0A82  6974  656D  735F
0000123540  6174  706D  8250  6106  696F  695F  5464  0882
0000123560  6F6C  6163  6974  6E6F  8258  6209  6D74  5F70
0000123600  6E69  6F66  825C  7305  6170  6572  8485  0100
0000123620  0001  0180  0001  0180  0001  0180  0001  0180
*
0000123660  0001  0180  0001  0180  0007  737A  6683  8204
0000123700  0100  0001  0180  0001  0180  0001  0180  0001
0000123720  0180  0001  0180  0001  0180  0001  0180  0001
*
0000124320  0180  0001  0180  0001  0180  0018  8579  02C0
0000124340  8307  04BD  BE83  8204  280A  6E75  6174  6767
0000124360  6465  6929  0701  7800  2085  8301  0084  1601
0000124400  7F00  8683  8300  022C  2683  8304  0081  8183
0000124420  8300  0082  BC83  0104  0038  827F  6902  0064
0000124440  0482  616E  656D  8204  7204  6365  2474  0482
0000124460  7461  7274  822C  6405  6D75  796D  822E  740A
0000124500  6D69  5F65  7473  6D61  3070  0582  7073  7261
0000124520  3465  0101  8000  0101  8000  0101  8000  0101
0000124540  8000  0101  8000  0101  8000  0101  8000  0101
*
0000124720  8000  0101  8000  0101  8000  0101  8000  1801
0000124740  7900  1085  1101  E383  8304  04E4  0A82  7528
0000124760  746E  6761  6567  2964  0169  0034  837F  0085
0000125000  8583  8300  0085  8583  8300  0085  8583  8300
0000125020  0081  8583  8300  0085  8583  8300  0084  8583
0000125040  8300  0085  8583  8300  0085  8583  8300  0085
0000125060  0601  7F01  0982  6974  656D  755F  696E  0074
0000125100  0F82  696D  5F6E  6572  6F63  6472  745F  6D69
```

THU MAR 14 17:22:14 1991 CRV.EXE PAGE 39, LINE 2243

```
0000125120  0265  0982  7473  6261  6C69  7469  0479  0F82
0000125140  6163  7470  7275  5F65  6974  656D  756F  0674
0000125160  0A82  656B  5F79  6F66  6D72  7461  8208  6313
0000125200  6E6F  6974  756E  756F  5F73  7274  6361  696B
0000125220  676E  820A  6D0E  756F  6573  745F  6172  6B63
0000125240  6E69  0C67  1182  6163  7470  7275  5F65  6973
0000125260  6E67  7461  7275  0E65  0B82  6F68  6B74  7965
0000125300  735F  6E79  1063  0C82  6564  6166  6C75  5F74
0000125320  6974  656D  8212  6D09  7861  645F  6C65  7961
0000125340  8214  660B  7361  5F74  6572  6C70  7961  8216
0000125360  760E  7265  6669  5F79  6974  656D  756F  1874
0000125400  0C82  6177  7469  745F  6D69  6F65  7475  821A
0000125420  730C  6E79  5F63  6974  656D  756F  1C74  0982
0000125440  6874  6572  6873  6C6F  1E64  0C82  6863  6365
0000125460  5F6B  6F6C  6B6F  7075  0120  0001  0180  0007
0000125500  8578  0800  8083  0100  0001  0180  0001  0180
0000125520  0001  0180  0001  0180  0001  0180  0001  0180
*
0000125700  0001  0180  0001  0180  0001  0180  0016  4079
0000125720  8302  0509  0A83  8205  280A  6E75  6174  6767
0000125740  6465  6929  0701  7F00  8283  8300  0082  1701
0000125760  7F00  0882  6564  5F66  6974  656D  8200  6D08
0000126000  6E69  745F  6D69  0465  0101  8000  0101  8000
0000126020  0101  8000  0101  8000  0101  8000  0101  8000
0000126040  1601  7900  0440  1283  8305  0513  0A82  7528
0000126060  746E  6761  6567  2964  0169  000D  837F  0084
0000126100  8483  8300  0084  2383  0104  0029  827F  6107
0000126120  7362  725F  6C65  8200  7505  696E  7374  8201
0000126140  730C  6570  6963  6C61  665F  6E75  0263  0482
0000126160  6964  7073  0104  0001  0180  0001  0180  0001
0000126200  0180  0016  2079  8302  0518  1983  8205  280A
0000126220  6E75  6174  6767  6465  6929  0701  7F00  8183
0000126240  8300  0081  1E01  7F00  0982  7973  636E  6D5F
0000126260  646F  0065  0E82  7973  636E  655F  6578  5F63
0000126300  6F6D  6564  0102  0016  3079  8302  051B  1C83
0000126320  8205  280A  6E75  6174  6767  6465  6929  0701
0000126340  7F00  8283  8300  0081  1901  7F00  0782  6574
0000126360  6863  695F  0064  0B82  6574  6863  725F  6165
0000126400  6F73  046E  0101  8000  0101  8000  0101  8000
0000126420  1801  7900  2085  0302  2183  8305  0522  0A82
0000126440  7528  746E  6761  6567  2964  0169  000A  837F
0000126460  022C  2C83  8302  0086  1A01  7F00  0582  6D69
0000126500  6761  0065  C482  6964  6666  8220  6407  6669
0000126520  5F66  6469  0140  0018  8579  0310  8302  0525
0000126540  2683  8205  280A  6E75  6174  6767  6465  6929
0000126560  0701  7800  0085  8303  022C  0701  7F00  8583
0000126600  8300  0524  2401  7F00  0E82  756E  5F6D  666F
0000126620  735F  7263  6565  736E  8200  690F  616D  6567
0000126640  6E5F  6D61  5F65  696C  7473  0102  0016  2079
0000126660  8301  0528  2983  8205  280A  6E75  6174  6767
0000126700  6465  6929  0401  7F00  C083  0100  000A  827F
0000126720  7306  7274  6E69  0067  0101  8000  0101  8000
0000126740  0101  8000  1601  7900  0230  2E83  8305  052F
0000126760  0A82  7528  746E  6761  6567  2964  0169  0007
0000127000  837F  0082  8183  0100  001E  827F  650C  6378
0000127020  7065  6974  6E6F  695F  0064  0B82  7865  7063
0000127040  735F  6174  7574  0473  1601  7900  0220  3483
0000127060  8305  0535  0A82  7528  746E  6761  6567  2964
0000127100  0169  0016  0879  8302  0532  3383  8205  280A
```

THU MAR 14 17:22:14 1991 CRV.EXE PAGE 40, LINE 2302

| | | | | | | | | |
|---|---|---|---|---|---|---|---|---|
| 0000127120 | 6E75 | 6174 | 6767 | 6465 | 6929 | 0701 | 7F00 | 8483 |
| 0000127140 | 8300 | 0084 | 1B01 | 7F00 | 0882 | 656B | 5F79 | 6F63 |
| 0000127160 | 6564 | 8200 | 730C | 6977 | 6374 | 5F68 | 7473 | 7461 |
| 0000127200 | 0065 | 0701 | 7F00 | 8183 | 8300 | 0531 | 1801 | 7F00 |
| 0000127220 | 0882 | 656B | 5F79 | 7974 | 6570 | 8200 | 6B09 | 7965 |
| 0000127240 | 765F | 6C61 | 6575 | 0102 | 0018 | 8579 | 0230 | 8304 |
| 0000127260 | 0538 | 3983 | 8205 | 280A | 6E75 | 6174 | 6767 | 6465 |
| 0000127300 | 6929 | 0701 | 7800 | 0085 | 8302 | 0530 | 0D01 | 7F00 |
| 0000127320 | 8583 | 8300 | 0537 | 8183 | 8300 | 0081 | 2E01 | 7F00 |
| 0000127340 | 0882 | 6573 | 5F71 | 6973 | 657A | 8200 | 7303 | 7165 |
| 0000127360 | 8202 | 6B08 | 7965 | 615F | 7474 | 4272 | 0E82 | 6361 |
| 0000127400 | 6974 | 6176 | 6574 | 5F64 | 7566 | 636E | 0144 | 0001 |
| 0000127420 | 0180 | 0001 | 0180 | 0001 | 0180 | 0001 | 0180 | 0001 |
| 0000127440 | 0180 | 0001 | 0180 | 0001 | 0180 | 0001 | 0180 | 0016 |
| 0000127460 | 2079 | 8302 | 0543 | 4483 | 8205 | 280A | 6E75 | 6174 |
| 0000127500 | 6767 | 6465 | 6929 | 0701 | 7F00 | 8183 | 8300 | 0081 |
| 0000127520 | 1701 | 7F00 | 0882 | 656B | 5F79 | 7461 | 7274 | 8200 |
| 0000127540 | 6608 | 6E75 | 5F63 | 656B | 0279 | 1801 | 7900 | 1085 |
| 0000127560 | 0202 | 4683 | 8305 | 0547 | 0A82 | 7528 | 746E | 6761 |
| 0000127600 | 6567 | 2964 | 0169 | 0007 | 837F | 0085 | 3783 | 0105 |
| 0000127620 | 0012 | 827F | 7308 | 7165 | 735F | 7A69 | 0065 | 0382 |
| 0000127640 | 6573 | 0271 | 0101 | 8000 | 0101 | 8000 | 0101 | 8000 |
| 0000127660 | 0101 | 8000 | 0101 | 8000 | 1801 | 7900 | D085 | 0202 |
| 0000127700 | 4E83 | 8305 | 054F | 0A82 | 7528 | 746E | 6761 | 6567 |
| 0000127720 | 2964 | 0169 | 0007 | 837F | 04BB | 8183 | 0100 | 0011 |
| 0000127740 | 827F | 6606 | 6C69 | 6574 | 0072 | 0482 | 6F6D | 6564 |
| 0000127760 | 0158 | 0018 | 8579 | 0150 | 8305 | 0551 | 5283 | 8205 |
| 0000130000 | 280A | 6E75 | 6174 | 6767 | 6465 | 6929 | 1001 | 7F00 |
| 0000130020 | 2C83 | 8302 | 0086 | 8183 | 8300 | 0081 | 8183 | 0100 |
| 0000130040 | 002B | 827F | 6E04 | 6D61 | 0065 | 0682 | 696C | 5F62 |
| 0000130060 | 6469 | 8220 | 6305 | 616C | 7373 | 8224 | 7305 | 7974 |
| 0000130100 | 656C | 8226 | 6F07 | 5F70 | 6F63 | 6564 | 0128 | 0001 |
| 0000130120 | 0180 | 0001 | 0180 | 0001 | 0180 | 001B | 2079 | 8309 |
| 0000130140 | 0557 | 5883 | 8205 | 690F | 755F | 6D5F | 6773 | 705F |
| 0000130160 | 7261 | 6D61 | 745F | 0169 | 001C | 837F | 0081 | 8583 |
| 0000130200 | 8300 | 0082 | 8683 | 8300 | 0088 | 8083 | 8300 | 0084 |
| 0000130220 | C083 | 8300 | 00C0 | 6A01 | 7F00 | 0982 | 5F69 | 5F75 |
| 0000130240 | 6873 | 726F | 0074 | 0A82 | 5F69 | 5F75 | 7375 | 6F68 |
| 0000130260 | 7472 | 8200 | 6908 | 755F | 6C5F | 6E6F | 0067 | 0982 |
| 0000130300 | 5F69 | 5F75 | 6C75 | 6E6F | 0067 | 0982 | 5F69 | 5F75 |
| 0000130320 | 6C66 | 616F | 0074 | 0882 | 5F69 | 5F75 | 6863 | 7261 |
| 0000130340 | 8200 | 6909 | 755F | 755F | 6863 | 7261 | 8200 | 6907 |
| 0000130360 | 755F | 735F | 7274 | 8200 | 6909 | 755F | 625F | 6F6C |
| 0000130400 | 6B63 | 0100 | 0019 | 3079 | 8302 | 055A | 5B83 | 8205 |
| 0000130420 | 690D | 6D5F | 6773 | 705F | 7261 | 6D61 | 745F | 0169 |
| 0000130440 | 0007 | 837F | 0085 | 5683 | 0105 | 0010 | 827F | 7404 |
| 0000130460 | 7079 | 0065 | 0582 | 6176 | 756C | 0265 | 0101 | 8000 |
| 0000130500 | 1C01 | 7900 | 9085 | 0900 | 5E83 | 8305 | 055F | 0E82 |
| 0000130520 | 5F69 | 736D | 5F67 | 6568 | 6461 | 7265 | 745F | 0169 |
| 0000130540 | 001C | 837F | 0081 | 8183 | 8300 | 0085 | 8583 | 8300 |
| 0000130560 | 0084 | 8583 | 8300 | 0085 | 8183 | 8300 | 0085 | 4701 |
| 0000130600 | 7F00 | 0482 | 5F71 | 6469 | 8200 | 7306 | 756F | 6372 |
| 0000130620 | 0265 | 0382 | 6970 | 0464 | 0382 | 6974 | 0664 | 0482 |
| 0000130640 | 6572 | 7073 | 8208 | 7208 | 7365 | 5F70 | 6974 | 0A64 |
| 0000130660 | 0782 | 706F | 635F | 646F | 0C65 | 0482 | 7974 | 6570 |
| 0000130700 | 820E | 7304 | 7469 | 1065 | 1501 | 7900 | C085 | 0200 |
| 0000130720 | 6283 | 8305 | 0563 | 0782 | 5F69 | 736D | 5F67 | 6974 |
| 0000130740 | 0501 | 7800 | 8330 | 0559 | 0701 | 7F00 | 5D83 | 8305 |
| 0000130760 | 0561 | 1701 | 7F00 | 0682 | 6568 | 6461 | 7265 | 8200 |

THU MAR 14 17:22:14 1991 CRV.EXE PAGE 41, LINE 2361

```
0000131000  700A  7261  6D61  6C5F  7369  1274  0101  8000
0000131020  0101  8000  0101  8000  0101  8000  0101  8000
*
0000131260  0101  8000  0101  8000  0101  8000  1601  7900
0000131300  0340  9283  8305  0593  0A82  7528  746E  6761
0000131320  6567  2964  0169  0007  737A  3683  8205  0100
0000131340  000A  837F  0081  8183  8300  0591  2B01  7F00
0000131360  0682  6361  6974  6E6F  8200  6E0F  6D75  6F5F
0000131400  5F66  6F73  7466  656B  7379  8202  730C  666F
0000131420  6B74  7965  5F73  7470  0472  1601  7900  0340
0000131440  9683  8305  0597  0A82  7528  746E  6761  6567
0000131460  2964  0169  0007  737A  4583  8205  0100  000A
0000131500  837F  0081  8183  8300  0595  2901  7F00  0682
0000131520  6361  6974  6E6F  8200  6E0E  6D75  6F5F  5F66
0000131540  6F68  6B74  7965  0273  0B82  6F68  6B74  7965
0000131560  5F73  7470  0472  1801  7900  7085  0501  9983
0000131600  8305  059A  0A82  7528  746E  6761  6567  2964
0000131620  0169  0010  837F  022C  8683  8300  0474  E483
0000131640  8300  0085  3D01  7F00  0A82  6D69  6761  5F65
0000131660  616E  656D  8200  6908  616D  6567  695F  2064
0000131700  0982  6D69  6761  5F65  7470  2472  0982  616C
0000131720  6579  5F72  7470  2872  0982  6D69  6761  5F65
0000131740  6468  2C6C  0101  8000  0101  8000  0101  8000
0000131760  0101  8000  1801  7900  9085  0201  A083  8305
0000132000  05A1  0A82  7528  746E  6761  6567  2964  0169
0000132020  0007  837F  0082  9883  0105  0018  827F  650C
0000132040  6378  7065  6974  6E6F  695F  0064  0582  6D69
0000132060  6761  0465  0101  8000  1601  7900  0340  A583
0000132100  8305  05A6  0A82  7528  746E  6761  6567  2964
0000132120  0169  0007  737A  9F83  8205  0100  000A  837F
0000132140  0081  8183  8300  05A4  2F01  7F00  0682  6361
0000132160  6974  6E6F  8200  6E11  6D75  6F5F  5F66  7865
0000132200  6563  7470  6F69  736E  8202  650E  6378  7065
0000132220  6974  6E6F  6C5F  7369  0474  1801  7900  5085
0000132240  0304  A883  8305  05A9  0A82  7528  746E  6761
0000132260  6567  2964  0169  000A  837F  0598  9883  8305
0000132300  0598  1A01  7F00  0682  6D69  6761  3165  8200
0000132320  6906  616D  6567  2E32  0482  6964  6666  015C
0000132340  0018  8579  01A0  8303  05AC  AD83  8205  280A
0000132360  6E75  6174  6767  6465  6929  0701  7A00  8373
0000132400  0598  0082  0A01  7F00  8183  8300  05AB  9883
0000132420  0105  0026  827F  6E0E  6D75  6F5F  5F66  6373
0000132440  6572  6E65  0073  0A82  6D69  6761  5F65  696C
0000132460  7473  8202  6404  6669  0666  1801  7900  1085
0000132500  0302  AF83  8305  05B0  0A82  7528  746E  6761
0000132520  6567  2964  0169  000A  837F  022C  2C83  8302
0000132540  0081  1901  7F00  0682  6D69  6761  3165  8200
0000132560  6906  616D  6567  2032  0382  7563  4074  1801
0000132600  7900  4085  0709  B583  8305  05B6  0A82  7528
0000132620  746E  6761  6567  2964  0169  0018  8579  0800
0000132640  831D  05B3  B483  8205  280A  6E75  6174  6767
0000132660  6465  6929  5801  7F00  8483  8300  04E6  8483
0000132700  8300  0084  1183  8305  0081  2E83  8304  0517
0000132720  4D83  8305  04BB  8183  8300  0594  1A83  8305
0000132740  05A3  2D83  8305  0081  9083  8305  0598  A783
0000132760  8305  05AA  2383  8305  0085  2083  8305  05AF
0000133000  2783  8305  04E2  4283  8305  0550  8483  0100
0000133020  016F  827F  6B0A  6462  735F  6174  7574  0073
0000133040  0982  6574  7473  6E5F  6D61  0065  0882  656B
```

```
THU MAR 14 17:22:14 1991  CRV.EXE  PAGE 42, LINE 2420

0000133060  5F79  6F63  6564  8200  730C  6977  6374  5F68
0000133100  7473  7461  0065  0C82  6F6C  6163  6F74  5F72
0000133120  6964  7073  8200  740E  6172  6B63  6E69  5F67
0000133140  656C  6576  006C  0C82  6373  6C61  5F65  6977
0000133160  646E  776F  8200  7309  6E79  5F63  6F6D  6564
0000133200  8200  660A  6C69  6574  5F72  736D  0067  0682
0000133220  6966  746C  7265  8200  630B  7275  6572  746E
0000133240  615F  696F  8200  680C  746F  656B  7379  6C5F
0000133260  7369  0074  0A82  7973  636E  655F  6576  746E
0000133300  8200  650E  6378  7065  6974  6E6F  6C5F  7369
0000133320  0074  1082  7865  7063  735F  6174  7574  5F73
0000133340  696C  7473  8200  6D04  646F  0065  0D82  6F73
0000133360  7466  656B  7379  6C5F  7369  0074  0582  6D69
0000133400  6761  0065  0782  6F63  706D  7261  0065  0B82
0000133420  6177  7469  735F  7263  6565  006E  0A82  6D69
0000133440  6761  5F65  696C  7473  8200  6909  616D  6567
0000133460  6E5F  6D75  8200  690A  616D  6567  645F  6669
0000133500  0066  0B82  6168  666C  695F  616D  6567  0073
0000133520  0782  616D  7373  6761  0065  0682  6170  6172
0000133540  736D  8200  6608  6E75  5F63  656B  0079  0882
0000133560  6369  6E6F  6D5F  6773  8200  6405  6D75  796D
0000133600  0100  0016  837F  0081  6083  8305  0081  0883
0000133620  8305  05B2  8183  8300  0085  5A01  7F00  0682
0000133640  6F73  7275  6563  8200  6D0A  6773  685F  6165
0000133660  6564  0272  0A82  7665  6E65  5F74  7974  6570
0000133700  821A  7406  6D69  6E69  1C67  0B82  7665  6E65
0000133720  5F74  6176  756C  2465  0C82  6572  7574  6E72
0000133740  765F  6C61  6575  2485  8201  7209  7365  5F70
0000133760  6C66  6761  2685  0101  0001  0180  0001  0180
0000134000  0001  0180  0001  0180  0001  0180  0001  0180
*
0000134040  0001  0180  0007  737A  B183  8205  0100  0001
0000134060  0180  0001  0180  0001  0180  0001  0180  0001
*
0000134160  0180  0001  0180  0004  837F  05C2  0A01  7500
0000134200  8380  0081  0164  D583  0505  0111  0000  1F00
0000134220  4C01  6123  D207  1000  C700  0000  0400  6910
0000134240  696E  5F74  6C67  626F  6C61  645F  7461  0961
0000134260  F804  81FF  0300  7265  0F72  FA04  86FF  0900
0000134300  6C75  6E6F  5F67  6170  0E72  F604  85FF  0800
0000134320  6F62  6C6F  705F  7261  0201  0117  241E  0765
0000134340  0616  0010  060B  0000  0804  7263  5F76  6E69
0000134360  7469  0409  FAF2  0081  6503  7272  0411  FAF4
0000134400  060E  650B  7272  705F  7261  6D61  315F  0411
0000134420  F9F2  060E  650B  7272  705F  7261  6D61  325F
0000134440  040F  FEFC  060E  6609  6C69  5F65  616E  656D
0000134460  040B  FBFA  0766  6605  616E  656D  040D  FBF6
0000134500  00C0  7007  7261  705F  7274  040C  F9EE  048D
0000134520  6606  6C69  5F65  0E70  FA04  0EFD  0806  7265
0000134540  5F72  6170  6874  040E  FFFC  0085  6508  7272
0000134560  6C5F  6E69  0C65  FA04  81FE  0600  7473  7461
0000134600  7375  0410  FBF4  0081  670A  6F6C  6162  5F6C
0000134620  7265  0F72  D20B  0029  650A  7272  725F  7465
0000134640  7275  146E  060B  002A  650F  7272  705F  7069
0000134660  5F65  6572  7574  6E72  0201  011D  2A34  0771
0000134700  03B7  0010  03AC  0000  0E04  6567  5F74  656E
0000134720  7478  655F  6576  746E  0414  0006  0751  650E
0000134740  6576  746E  705F  7274  615F  6464  0B72  F404
0000134760  81FF  0500  7265  6F72  0F72  EE04  85FF  0900
```

THU MAR 14 17:22:14 1991 CRV.EXE PAGE 43, LINE 2479

| | | | | | | | | |
|---|---|---|---|---|---|---|---|---|
| 0000135000 | 6573 | 5F6D | 6E69 | 6564 | 0C78 | EC04 | 85FF | 0600 |
| 0000135020 | 6572 | 7573 | 746C | 0410 | FFFA | 0082 | 640A | 6C65 |
| 0000135040 | 6174 | 745F | 6D69 | 1065 | F004 | 82FF | 0A00 | 7563 |
| 0000135060 | 7272 | 745F | 6D69 | 7265 | 0411 | FFF6 | 0082 | 730B |
| 0000135100 | 6174 | 6C62 | 5F65 | 6974 | 656D | 0512 | 03E8 | 0005 |
| 0000135120 | 0085 | 6D0A | 756F | 6573 | 665F | 616C | 1267 | EA05 |
| 0000135140 | 0503 | 8500 | 0A00 | 616C | 7473 | 6D5F | 756F | 6573 |
| 0000135160 | 0201 | 0121 | 2DEB | 0773 | 00A2 | 0010 | 0097 | 0000 |
| 0000135200 | 1204 | 6E69 | 7570 | 5F74 | 7665 | 6E65 | 5F74 | 7773 |
| 0000135220 | 7469 | 6863 | 0414 | 0006 | 00C5 | 6D0E | 756F | 6573 |
| 0000135240 | 665F | 616C | 5F67 | 7470 | 0F72 | 0A04 | 8500 | 0900 |
| 0000135260 | 6573 | 5F6D | 6E69 | 6564 | 1778 | 0C04 | 5100 | 1107 |
| 0000135300 | 7665 | 6E65 | 5F74 | 7470 | 5F72 | 6461 | 7264 | 7365 |
| 0000135320 | 0973 | FA04 | 85FF | 0300 | 6572 | 0B73 | FC04 | 81FF |
| 0000135340 | 0500 | 7265 | 6F72 | 0D72 | 1C05 | 050F | D900 | 0506 |
| 0000135360 | 7665 | 6E65 | 0174 | 1B02 | 8D01 | 752E | 7C07 | 1001 |
| 0000135400 | 7100 | 0001 | 0400 | 630C | 7672 | 735F | 7568 | 6474 |
| 0000135420 | 776F | 0A6E | 0604 | 8100 | 0400 | 6F63 | 6564 | 040C |
| 0000135440 | FFFA | 00C0 | 5F06 | 745F | 7079 | 0F65 | F404 | 85FF |
| 0000135460 | 0900 | 5F5F | 7862 | 745F | 7079 | 0D65 | E404 | C9FF |
| 0000135500 | 0704 | 5F5F | 7270 | 6E69 | 0B74 | DC04 | 02FF | 0502 |
| 0000135520 | 5F5F | 766C | 0D6C | E804 | 78FF | 0707 | 5F5F | 6C63 |
| 0000135540 | 636F | 0D6B | F604 | C0FF | 0700 | 5F5F | 7473 | 6361 |
| 0000135560 | 0E6B | E204 | 81FF | 0800 | 5F5F | 6572 | 7674 | 6C61 |
| 0000135600 | 050E | 0408 | 0005 | 024F | 5F06 | 665F | 6E75 | 0163 |
| 0000135620 | 1B02 | 0901 | 7C30 | A007 | 1000 | 9300 | 0000 | 0400 |
| 0000135640 | 630C | 7672 | 635F | 656C | 6E61 | 755F | 0A70 | 0604 |
| 0000135660 | 8500 | 0400 | 6F63 | 6564 | 0409 | FFFC | 0081 | 6503 |
| 0000135700 | 7272 | 0201 | 0126 | 3DA9 | 0781 | 0043 | 0010 | 0038 |
| 0000135720 | 0000 | 1704 | 7263 | 5F76 | 6F6D | 7375 | 5F65 | 656B |
| 0000135740 | 6279 | 756F | 6472 | 6B5F | 7965 | 0F73 | 0604 | E300 |
| 0000135760 | 0906 | 7665 | 6E65 | 5F74 | 7470 | 0972 | FC04 | 81FF |
| 0000136000 | 0300 | 7265 | 0172 | 1902 | EC01 | 8330 | 2907 | 1000 |
| 0000136020 | 1E00 | 0000 | 0400 | 630A | 7672 | 745F | 6D69 | 6E69 |
| 0000136040 | 0F67 | 0604 | E300 | 0906 | 7665 | 6E65 | 5F74 | 7470 |
| 0000136060 | 0172 | 2202 | 1501 | 8531 | 1107 | 1002 | 0600 | 0002 |
| 0000136100 | 0400 | 6313 | 7672 | 635F | 6572 | 7461 | 5F65 | 7561 |
| 0000136120 | 6F74 | 7973 | 636E | 040F | 0006 | 06E3 | 6509 | 6576 |
| 0000136140 | 746E | 705F | 7274 | 0413 | FED6 | 06D9 | 630D | 7061 |
| 0000136160 | 7973 | 636E | 655F | 6576 | 746E | 0411 | FECC | 0082 |
| 0000136200 | 730B | 6174 | 6C62 | 5F65 | 6974 | 656D | 0410 | FED0 |
| 0000136220 | 0082 | 640A | 6C65 | 6174 | 745F | 6D69 | 0B65 | CA04 |
| 0000136240 | 81FE | 0500 | 7265 | 6F72 | 0E72 | D404 | 81FE | 0800 |
| 0000136260 | 7973 | 636E | 6B5F | 7965 | 0201 | 011A | 3326 | 0788 |
| 0000136300 | 00BB | 0010 | 00B0 | 0000 | 0B04 | 6C63 | 736F | 5F65 |
| 0000136320 | 7274 | 6361 | 0F6B | 0604 | E300 | 0906 | 7665 | 6E65 |
| 0000136340 | 5F74 | 7470 | 0C72 | D404 | 81FE | 0600 | 6572 | 7573 |
| 0000136360 | 746C | 0413 | FED6 | 06D9 | 630D | 7061 | 7973 | 636E |
| 0000136400 | 655F | 6576 | 746E | 0201 | 0113 | 33E1 | 078C | 17B1 |
| 0000136420 | 0010 | 17A6 | 0000 | 0404 | 616D | 6E69 | 040A | 0006 |
| 0000136440 | 0081 | 6104 | 6772 | 0A63 | 0804 | 0500 | 0402 | 7261 |
| 0000136460 | 7667 | 040C | FFF4 | 00C0 | 5F06 | 705F | 6F72 | 0C63 |
| 0000136500 | FA04 | C0FF | 0600 | 5F5F | 7974 | 6570 | 040F | FFE0 |
| 0000136520 | 0085 | 5F09 | 625F | 5F78 | 7974 | 6570 | 040D | FFCA |
| 0000136540 | 04C9 | 5F07 | 705F | 6972 | 746E | 040B | FF38 | 0202 |
| 0000136560 | 5F05 | 6C5F | 6C76 | 040D | FFCE | 0778 | 5F07 | 635F |
| 0000136600 | 6F6C | 6B63 | 040D | FFEE | 00C0 | 5F07 | 735F | 6174 |
| 0000136620 | 6B63 | 040E | FF3E | 0081 | 5F08 | 725F | 7465 | 6176 |
| 0000136640 | 0B6C | DA04 | 81FF | 0500 | 7265 | 6F72 | 0F72 | E404 |

```
THU MAR 14 17:22:14 1991  CRV.EXE  PAGE 44, LINE 2538

0000136660  E3FF  0906  7665  6E65  5F74  7470  0C72  F204
0000136700  81FF  0600  6F68  6B74  7965  0411  FF36  0085
0000136720  680B  746F  656B  5F79  6C66  6761  040A  FFEC
0000136740  0081  6D04  646F  1465  4004  4BFF  0E07  7263
0000136760  5F76  6C6F  5F64  7473  7461  7375  0409  FFE2
0000137000  0081  6503  7272  040C  FFE8  0086  7406  7473
0000137020  695F  0F64  DC04  49FF  0905  6873  7261  5F65
0000137040  6468  106C  F804  81FF  0A00  6F6C  6B63  735F
0000137060  6F63  6570  040D  FF48  078D  7407  6D69  6265
0000137100  6675  0419  FFC8  0081  6913  6F63  5F6E  6F63
0000137120  746E  6F72  5F6C  7473  7461  7375  050E  05E0
0000137140  0005  032A  5F06  665F  6E75  0563  B100  F137
0000137160  0C01  3404  81FF  0600  6572  7573  746C  0201
0000137200  0005  3BD3  0092  040B  FF34  0084  7305  6174
0000137220  6574  0201  0201  011B  4B92  0794  004E  0010
0000137240  0043  0000  0C04  7473  726F  5F65  7473  7461
0000137260  7375  0416  0006  0085  7310  7475  635F  6E6F
0000137300  656E  7463  665F  616C  1367  0804  8500  0D00
0000137320  7573  5F74  6F6C  6B63  665F  616C  0A67  0A04
0000137340  8100  0400  6F6D  6564  0418  000C  0758  6F12
0000137360  646C  635F  7672  735F  6174  7574  5F73  7470
0000137400  0172  1D02  E001  964B  9B07  1000  9000  0000
0000137420  0400  720E  7365  6F74  6572  735F  6174  7574
0000137440  1673  0604  C500  1000  7573  5F74  6F63  6E6E
0000137460  6365  5F74  6C66  6761  0413  000A  00C5  730D
0000137500  7475  6C5F  636F  5F6B  6C66  6761  040A  000E
0000137520  00C1  6D04  646F  1865  1204  5800  1207  6C6F
0000137540  5F64  7263  5F76  7473  7461  7375  705F  7274
0000137560  0201  011E  4C7B  0798  003B  0010  0030  0000
0000137600  0F04  6567  5F74  6E69  7570  5F74  7473  7461
0000137620  0B65  0604  C400  0500  7473  7461  0165  1E02
0000137640  B601  9A4C  4D07  1000  4200  0000  0400  730F
0000137660  7465  695F  706E  7475  735F  6174  6574  040B
0000137700  0006  0084  7305  6174  6574  0201  0D05  0000
0000137720  001A  050B  0F12  0005  0274  7003  6469  050F
0000137740  0300  0005  00C0  4207  785F  6946  656C  0516
0000137760  0308  0005  00C6  740E  7268  6165  5F64  6573
0000140000  5F6D  7470  1872  0C05  0503  85C0  1000  7573
0000140020  5F74  6F63  6E6E  6365  5F74  6C66  6761  050F
0000140040  0304  0005  00C0  4207  785F  6150  6B63  0515
0000140060  030E  0005  0085  730D  7475  6C5F  636F  5F6B
0000140100  6C66  6761  0513  0310  0005  0085  720B  6365
0000140120  726F  5F64  6F6D  6564  0516  0312  0005  0085
0000140140  720E  7365  7465  745F  6D69  5F65  6C66  1467
0000140160  1405  0503  8600  0C00  6F74  5F74  6964  5F66
0000140200  6974  656D  0515  0200  0004  060A  670D  6F6C
0000140220  6162  5F6C  6170  6172  736D  0512  0D66  0005
0000140240  0082  6C0A  7361  5F74  6974  656D  1472  B005
0000140260  050E  0100  0C03  756D  5F78  6573  5F6D  696C
0000140300  7473  0512  0F18  0005  0086  630A  6766  6F5F
0000140320  6A62  695F  1364  6A05  050D  4F00  0B07  6373
0000140340  6572  6E65  6E5F  6D61  1165  1805  0503  B500
0000140360  0902  7270  6F69  665F  616C  1567  6205  050D
0000140400  C000  0D00  7270  6F69  665F  616C  5F67  7470
0000140420  1072  2405  0503  8500  0800  7270  6F69  755F
0000140440  6573  0511  0326  0005  0085  6109  616C  6D72
0000140460  665F  676C  0510  0D88  0005  06D9  7408  5F72
0000140500  7665  6E65  1474  0005  0000  8100  0C00  7842
0000140520  445F  6265  6775  6F4D  6564  0514  0000  0000
```

THU MAR 14 17:22:14 1991 CRV.EXE PAGE 45, LINE 2597

| | | | | | | | | |
|---|---|---|---|---|---|---|---|---|
| 0000140540 | 0081 | 420C | 5F78 | 6954 | 656D | 4D73 | 646F | 1065 |
| 0000140560 | 0005 | 0000 | 8100 | 0800 | 7842 | 425F | 735F | 6769 |
| 0000140600 | 1105 | 0001 | 0000 | 011D | 4D04 | 05D6 | 0157 | 0010 |
| 0000140620 | 014C | 0000 | 0E04 | 7263 | 5F76 | 6573 | 5F74 | 6170 |
| 0000140640 | 6172 | 736D | 040F | 0006 | 05C2 | 6509 | 6576 | 746E |
| 0000140660 | 705F | 7274 | 0409 | FFFC | 0081 | 6503 | 7272 | 0201 |
| 0000140700 | .0515 | 0200 | 0004 | 04E2 | 670D | 6F6C | 6162 | 5F6C |
| 0000140720 | 6170 | 6172 | 736D | 0D05 | 0000 | 001A | 630A | 7672 |
| 0000140740 | 705F | 6F72 | 2E63 | 0163 | 3F00 | BA03 | 4C00 | BF23 |
| 0000140760 | 5C00 | CD23 | 6700 | C223 | 9100 | C423 | 9C00 | C623 |
| 0000141000 | C600 | C823 | CC00 | CA23 | D700 | CB23 | DE00 | CD23 |
| 0000141020 | 0800 | CF24 | 1300 | D924 | 1E00 | DA24 | 2E00 | E524 |
| 0000141040 | 3400 | E624 | 3900 | E824 | 3E00 | E924 | 5300 | EA24 |
| 0000141060 | 5B00 | ED24 | 8700 | EE24 | 8F00 | EF24 | A300 | F024 |
| 0000141100 | B800 | F724 | BB00 | F824 | C500 | F924 | D200 | FA24 |
| 0000141120 | EE00 | FB24 | F400 | FC24 | F700 | FE24 | FD00 | FF24 |
| 0000141140 | 0600 | 0025 | 1001 | 0325 | 1F01 | 0425 | 2801 | 0525 |
| 0000141160 | 3201 | 0625 | 3701 | 0825 | 3C01 | 0A25 | 4101 | 0B25 |
| 0000141200 | 4601 | 0C25 | 4B01 | 0F25 | 5001 | 1025 | 5C01 | 1125 |
| 0000141220 | 6C01 | 1225 | 7601 | 1325 | 7B01 | 1725 | 8001 | 1825 |
| 0000141240 | 8C01 | 1925 | 9901 | 1A25 | A201 | 1B25 | AC01 | 1C25 |
| 0000141260 | B101 | 1E25 | [illegible] | 2225 | C701 | 2425 | D101 | 2725 |
| 0000141300 | 1E01 | 2826 | 2701 | 2926 | 3101 | 2C26 | 4201 | 2D26 |
| 0000141320 | 4E01 | 2E26 | 5B01 | 2F26 | 6401 | 3026 | 6E01 | 3226 |
| 0000141340 | 7F01 | 3426 | 9001 | 3526 | 9A01 | 3926 | A701 | 3A26 |
| 0000141360 | B101 | 3C26 | BC01 | 3D26 | C501 | 3F26 | CF01 | 4026 |
| 0000141400 | D701 | 4326 | DA01 | 4526 | DD01 | 4626 | EF01 | 4726 |
| 0000141420 | 0101 | 4927 | 0F01 | 4A27 | 1901 | 4D27 | 2801 | 4E27 |
| 0000141440 | 3401 | 4F27 | 4401 | 5127 | 4A01 | 5227 | 5401 | 5527 |
| 0000141460 | 6501 | 5627 | 6E01 | 5727 | 7801 | 5C27 | 8901 | 5D27 |
| 0000141500 | 9B01 | 5F27 | A701 | 6027 | C001 | 6127 | D601 | 6327 |
| 0000141520 | F701 | 6427 | FD01 | 6627 | 0001 | 6728 | 1001 | 6828 |
| 0000141540 | 1F01 | 6A28 | 2901 | 6C28 | 2F01 | 6D28 | 3B01 | 6F28 |
| 0000141560 | 3E01 | 7028 | 4801 | 7228 | 5501 | 7328 | 5E01 | 7528 |
| 0000141600 | 6801 | 7728 | 6E01 | 7828 | 7A01 | 7D28 | 7D01 | 7E28 |
| 0000141620 | 8601 | 8028 | 9001 | 8128 | 9601 | 8528 | A201 | 8628 |
| 0000141640 | A701 | 8928 | AC01 | 8A28 | B101 | 8C28 | BD01 | 8E28 |
| 0000141660 | D601 | 9028 | DF01 | 9328 | 0801 | 9429 | 1A01 | 9529 |
| 0000141700 | 2601 | 9729 | 5201 | 9829 | 6A01 | 9929 | 8601 | 9A29 |
| 0000141720 | 8D01 | 9B29 | 9001 | 9D29 | 9701 | 9F29 | A101 | A129 |
| 0000141740 | B001 | A229 | BD01 | A329 | CC01 | A629 | D201 | A829 |
| 0000141760 | E301 | A929 | F201 | AB29 | FF01 | AE29 | 0601 | B02A |
| 0000142000 | 1501 | B32A | 2201 | B42A | 2901 | C62A | 3401 | CB2A |
| 0000142020 | 4401 | D02A | 4901 | D22A | 6601 | D32A | 7E01 | D52A |
| 0000142040 | 8D01 | D62A | 9801 | D82A | A201 | D92A | AA01 | DB2A |
| 0000142060 | B001 | DC2A | B301 | DD2A | C701 | DE2A | D401 | DF2A |
| 0000142100 | E801 | E02A | F501 | E22A | 1001 | E32B | 4201 | E52B |
| 0000142120 | 5601 | E72B | 5C01 | E82B | 6801 | EA2B | 7201 | EB2B |
| 0000142140 | 7701 | EC2B | 7D01 | EF2B | 8301 | F12B | A001 | F22B |
| 0000142160 | B801 | F42B | C701 | F52B | D201 | F72B | DC01 | F82B |
| 0000142200 | E401 | FA2B | EA01 | FB2B | ED01 | FC2B | 0101 | FD2C |
| 0000142220 | 0E01 | FE2C | 2201 | FF2C | 2F01 | 012C | 4A02 | 022C |
| 0000142240 | 7C02 | 042C | 9002 | 062C | 9602 | 072C | A202 | 092C |
| 0000142260 | AC02 | 0A2C | B102 | 0D2C | B702 | 102C | D802 | 122C |
| 0000142300 | E102 | 132C | F902 | 152C | 0802 | 162D | 1302 | 182D |
| 0000142320 | 1D02 | 192D | 2502 | 1B2D | 2B02 | 1C2D | 2E02 | 1D2D |
| 0000142340 | 4202 | 1E2D | 4F02 | 1F2D | 6302 | 202D | 7002 | 222D |
| 0000142360 | 8B02 | 232D | BD02 | 252D | D102 | 282D | D702 | 2A2D |
| 0000142400 | DA02 | 2B2D | E002 | 372D | EB02 | 392D | FB02 | 3C2D |

THU MAR 14 17:22:14 1991 CRV.EXE PAGE 46, LINE 2656

| | | | | | | | | |
|---|---|---|---|---|---|---|---|---|
| 0000142420 | 0002 | 3F2E | 0602 | 402E | 1502 | 412E | 2402 | 442E |
| 0000142440 | 2702 | 452E | 3602 | 462E | 4802 | 472E | 5102 | 482E |
| 0000142460 | 5702 | 492E | 6302 | 4C2E | 6602 | 4D2E | 6902 | 4E2E |
| 0000142500 | 7C02 | 4F2E | 8202 | 592E | 8D02 | 5A2E | 9D02 | 5B2E |
| 0000142520 | 3002 | 5C2F | 8702 | 5D2F | 8C02 | 5E2F | 9102 | 5F2F |
| 0000142540 | 9B02 | 602F | FE02 | 682F | 0902 | 6B30 | 1902 | 6C30 |
| 0000142560 | 1E02 | 6D30 | 2302 | 6E30 | 3502 | 7030 | 4402 | 7130 |
| 0000142600 | 5402 | 7330 | 6302 | 7430 | 6802 | 7530 | 6D02 | 7630 |
| 0000142620 | 7D02 | 7830 | 8C02 | 7A30 | 9102 | 7C30 | 9C02 | 8430 |
| 0000142640 | A902 | 8730 | B902 | 8830 | C502 | 8930 | D302 | 8A30 |
| 0000142660 | E102 | 9030 | EC02 | 9130 | FC02 | 9230 | 0A02 | 9831 |
| 0000142700 | 1502 | 9F31 | 2502 | A031 | 2B02 | A131 | 3E02 | A231 |
| 0000142720 | 5102 | A331 | 5E02 | A431 | 6B02 | A631 | 7702 | A731 |
| 0000142740 | 8602 | A831 | 9102 | A931 | A002 | AB31 | BE02 | AD31 |
| 0000142760 | FA02 | AF31 | 0A02 | B132 | 1702 | B232 | 2202 | B432 |
| 0000143000 | 3102 | B532 | 3402 | B632 | 4302 | B832 | 4D02 | BA32 |
| 0000143020 | 5D02 | BB32 | 6A02 | BC32 | 7002 | BD32 | 8002 | BE32 |
| 0000143040 | 8602 | BF32 | 8902 | C032 | 8F02 | C232 | 9902 | C332 |
| 0000143060 | A502 | C432 | B802 | C532 | BB02 | C632 | CA02 | C832 |
| 0000143100 | D402 | CB32 | E402 | CD32 | EE02 | CE32 | 0102 | D033 |
| 0000143120 | 1402 | D133 | 1B02 | DB33 | 2602 | DE33 | 3602 | DF33 |
| 0000143140 | 4902 | E133 | 5302 | E233 | 5C02 | E433 | 6602 | E733 |
| 0000143160 | 8002 | E933 | 8E02 | EB33 | 9102 | ED33 | 9C02 | F033 |
| 0000143200 | AA02 | F133 | B302 | F333 | BE02 | F633 | C302 | F833 |
| 0000143220 | CF02 | F933 | D602 | 0833 | E103 | 0933 | F103 | 0A33 |
| 0000143240 | 0303 | 0F34 | 9803 | 1134 | 9E03 | 1934 | B303 | 1A34 |
| 0000143260 | C103 | 1B34 | 1D03 | 1C35 | 2B03 | 1D35 | 8703 | 1E35 |
| 0000143300 | 9703 | 2135 | A203 | 2335 | AC03 | 2435 | B703 | 2735 |
| 0000143320 | C203 | 2935 | C703 | 2B35 | D003 | 2C35 | E003 | 2E35 |
| 0000143340 | E903 | 3035 | 0203 | 3236 | 2003 | 3536 | 2A03 | 3736 |
| 0000143360 | 3403 | 3836 | 3903 | 3B36 | 3F03 | 3C36 | 5703 | 3D36 |
| 0000143400 | 6203 | 4036 | 6503 | 4236 | 6F03 | 4336 | 7403 | 4536 |
| 0000143420 | 7A03 | 4736 | 7F03 | 4836 | 9403 | 4936 | 9E03 | 4A36 |
| 0000143440 | A303 | 4B36 | AE03 | 4E36 | B103 | 4F36 | B603 | 5136 |
| 0000143460 | BE03 | 5236 | ED03 | 5336 | EB03 | 5436 | F603 | 5536 |
| 0000143500 | 0103 | 5637 | 0C03 | 5937 | 0F03 | 5A37 | 1403 | 5C37 |
| 0000143520 | 1C03 | 5D37 | 3E03 | 5E37 | 4903 | 5F37 | 5403 | 6037 |
| 0000143540 | 5F03 | 6137 | 6A03 | 6437 | 6D03 | 6537 | 7203 | 6637 |
| 0000143560 | 7703 | 6737 | 8103 | 6837 | 8C03 | 6B37 | 8F03 | 6C37 |
| 0000143600 | 9403 | 6D37 | 9903 | 6E37 | A303 | 6F37 | AE03 | 7537 |
| 0000143620 | B103 | 7637 | B703 | 7837 | C003 | 7937 | C503 | 7B37 |
| 0000143640 | D703 | 7C37 | E103 | 7E37 | E703 | 8037 | F003 | 8237 |
| 0000143660 | FA03 | 8337 | FF03 | 8537 | 0503 | 8638 | 1303 | 8F38 |
| 0000143700 | 1D03 | 9038 | 3603 | 9138 | 4403 | 9338 | 4A03 | 9538 |
| 0000143720 | 5303 | 9838 | 5903 | 9938 | 6F03 | 9E38 | DC03 | A038 |
| 0000143740 | E803 | A138 | F203 | A238 | FD03 | A538 | 0803 | A739 |
| 0000143760 | 1203 | A839 | 1C03 | B239 | 2703 | B339 | 2A03 | B539 |
| 0000144000 | 3503 | B639 | 3803 | B839 | 4103 | BA39 | 5403 | BB39 |
| 0000144020 | 5D03 | BC39 | 6703 | BD39 | 6C03 | C039 | 7203 | C239 |
| 0000144040 | 8003 | C439 | 8903 | C839 | 9F03 | CC39 | A203 | CD39 |
| 0000144060 | B503 | CE39 | C003 | D139 | C303 | D239 | D003 | D339 |
| 0000144100 | DB03 | D639 | DE03 | D939 | EB03 | DA39 | 0403 | DB3A |
| 0000144120 | 0903 | DC3A | 0F03 | DD3A | 1403 | DE3A | 1A03 | E03A |
| 0000144140 | 1F03 | E23A | 3203 | E53A | 3503 | E73A | 4803 | E93A |
| 0000144160 | 4D03 | EB3A | 5203 | ED3A | 6D03 | EE3A | 7803 | F13A |
| 0000144200 | 7B03 | F43A | 8803 | F53A | A103 | F63A | A603 | F73A |
| 0000144220 | AC03 | F83A | B103 | F93A | B703 | FB3A | BC03 | FD3A |
| 0000144240 | CF03 | 003A | D204 | 013A | E504 | 033A | EA04 | 053A |
| 0000144260 | EF04 | 073A | 0A04 | 083B | 1504 | 0C3B | 1804 | 0D3B |

THU MAR 14 17:22:14 1991 CRV.EXE PAGE 47, LINE 2715

| | | | | | | | | |
|---|---|---|---|---|---|---|---|---|
| 0000144300 | 2B04 | 0E3B | 3604 | 123B | 3904 | 133B | 4804 | 143B |
| 0000144320 | 5304 | 183B | 5604 | 193B | 6904 | 1A3B | 7404 | 1D3B |
| 0000144340 | 7704 | 203B | 8A04 | 213B | 9704 | 223B | A204 | 243B |
| 0000144360 | A504 | 273B | B804 | 293B | C504 | 2A3B | D004 | 323B |
| 0000144400 | D304 | 333B | D904 | 343B | DE04 | 353B | E404 | 373B |
| 0000144420 | E904 | 3B3B | FC04 | 3D3B | 0704 | 403C | 6504 | 443C |
| 0000144440 | 6804 | 463C | 7104 | 473C | 7604 | 4A3C | 8404 | 4B3C |
| 0000144460 | 8904 | 4F3C | 8F04 | 503C | A804 | 513C | AE04 | 533C |
| 0000144500 | B304 | 553C | C604 | 563C | E104 | 583C | EC04 | 5C3C |
| 0000144520 | 5004 | 5F3D | AE04 | 623D | B104 | 633D | B604 | 653D |
| 0000144540 | BF04 | 663D | D804 | 673D | E004 | 683D | E904 | 693D |
| 0000144560 | F4C4 | 6C3D | FF04 | 6D3D | 0804 | 6F3E | 0D04 | 703E |
| 0000144600 | 1704 | 713E | 1C04 | 733E | 2204 | 743E | 2C04 | 753E |
| 0000144620 | 3104 | 773E | 3704 | 783E | 4504 | 793E | 4E04 | 7A3E |
| 0000144640 | 5604 | 7B3E | 5F04 | 7D3E | 6404 | 803E | 6904 | 883E |
| 0000144660 | 8404 | 8A3E | 8F04 | 903E | 9204 | 913E | 9B04 | 923E |
| 0000144700 | A304 | 933E | AC04 | 943E | B704 | 963E | C204 | 973E |
| 0000144720 | C504 | 9A3E | CA04 | 9B3E | D804 | 9C3E | E104 | 9D3E |
| 0000144740 | E904 | 9E3E | F204 | A03E | F704 | A13E | 0204 | A53F |
| 0000144760 | 0504 | A73F | 0F04 | A83F | 1404 | AA3F | 1A04 | AC3F |
| 0000145000 | 2304 | AD3F | 2804 | AF3F | 3E04 | B03F | 4A04 | B23F |
| 0000145020 | 5604 | B33F | 6204 | B53F | 6B04 | BA3F | C404 | BD3F |
| 0000145040 | CD04 | C03F | E004 | C23F | EF04 | C33F | F404 | C73F |
| 0000145060 | FE04 | C93F | 0A04 | CA40 | 1404 | CC40 | 2204 | CD40 |
| 0000145100 | 3004 | CF40 | 3904 | D540 | 9204 | D740 | 9504 | D840 |
| 0000145120 | A104 | E340 | AC04 | E440 | BA04 | E840 | 1804 | E941 |
| 0000145140 | 1B04 | EB41 | 2404 | ED41 | 3704 | EE41 | 3A04 | EF41 |
| 0000145160 | 4304 | F041 | 4D04 | F141 | 5204 | F441 | 5804 | F641 |
| 0000145200 | 6604 | FA41 | 6F04 | FD41 | 8204 | 0041 | 8505 | 0241 |
| 0000145220 | 8A05 | 0341 | 9D05 | 0441 | A905 | 0541 | B405 | 0841 |
| 0000145240 | B705 | 0A41 | C005 | 0C41 | C505 | 0E41 | D805 | 1041 |
| 0000145260 | DB05 | 1241 | E505 | 1341 | F105 | 1441 | FC05 | 1741 |
| 0000145300 | FF05 | 1841 | 0705 | 1A42 | 1405 | 1B42 | 1A05 | 1C42 |
| 0000145320 | 2605 | 1E42 | 2F05 | 1F42 | 3405 | 2142 | 4205 | 2342 |
| 0000145340 | 4805 | 2542 | 5005 | 2642 | 5505 | 2742 | 5B05 | 2842 |
| 0000145360 | 6705 | 2A42 | 7105 | 2B42 | 7605 | 2E42 | 7C05 | 3042 |
| 0000145400 | 7F05 | 3142 | 8B05 | 3242 | 9105 | 3342 | 9605 | 3442 |
| 0000145420 | 9C05 | 3542 | A205 | 3742 | AB05 | 3842 | B005 | 3B42 |
| 0000145440 | BE05 | 3C42 | C805 | 3D42 | D305 | 4042 | D605 | 4142 |
| 0000145460 | DB05 | 4242 | E105 | 4342 | E605 | 4442 | EC05 | 4542 |
| 0000145500 | F105 | 4642 | F605 | 4742 | FB05 | 4842 | 0105 | 4A43 |
| 0000145520 | 0A05 | 4B43 | 0F05 | 4D43 | 1D05 | 4E43 | 2705 | 4F43 |
| 0000145540 | 3205 | 5243 | 3505 | 5343 | 3D05 | 5443 | 4305 | 5543 |
| 0000145560 | 4805 | 5643 | 4E05 | 5743 | 5305 | 5943 | 5C05 | 5A43 |
| 0000145600 | 6105 | 5C43 | 6F05 | 5D43 | 7405 | 5E43 | 7905 | 5F43 |
| 0000145620 | 7F05 | 6043 | 8905 | 6143 | 9405 | 6443 | 9705 | 6543 |
| 0000145640 | 9C05 | 6643 | A105 | 6743 | A705 | 6943 | B005 | 6A43 |
| 0000145660 | B505 | 6C43 | C305 | 6D43 | CD05 | 6E43 | D805 | 7143 |
| 0000145700 | DB05 | 7243 | E505 | 7343 | F005 | 7443 | FA05 | 7543 |
| 0000145720 | FF05 | 7843 | 0205 | 7A44 | 0B05 | 7C44 | 1505 | 7D44 |
| 0000145740 | 1A05 | 7F44 | 2005 | 8244 | 2C05 | 8344 | 4205 | 8644 |
| 0000145760 | 4D05 | 8944 | 5005 | 8B44 | 5905 | 8C44 | 6505 | 9144 |
| 0000146000 | 6E05 | 9244 | 7B05 | 9344 | 8405 | 9544 | 8905 | 9644 |
| 0000146020 | 8E05 | 9744 | 9405 | 9A44 | 9905 | 9B44 | A505 | 9C44 |
| 0000146040 | B205 | 9E44 | B705 | 9F44 | BA05 | A044 | C305 | A144 |
| 0000146060 | C805 | A444 | D605 | A544 | E005 | A644 | EB05 | A744 |
| 0000146100 | F505 | AA44 | 0005 | AD45 | 0305 | AF45 | 0D05 | B045 |
| 0000146120 | 1205 | B245 | 1805 | B345 | 1D05 | B445 | 2205 | B545 |
| 0000146140 | 2805 | B745 | 3105 | B845 | 3605 | BA45 | 4405 | BB45 |

THU MAR 14 17:22:14 1991 CRV.EXE PAGE 48, LINE 2774

| | | | | | | | | |
|---|---|---|---|---|---|---|---|---|
| 0000146160 | 5B05 | BC45 | 6905 | BD45 | 7305 | BE45 | 7D05 | C045 |
| 0000146200 | 8805 | C145 | 9B05 | C245 | A505 | C545 | B005 | C645 |
| 0000146220 | B605 | C845 | CD05 | CA45 | D205 | CB45 | D705 | CC45 |
| 0000146240 | DD05 | CE45 | E205 | CF45 | ED05 | D245 | F005 | D445 |
| 0000146260 | FA05 | D545 | FF05 | D745 | 0505 | D846 | 0A05 | D946 |
| 0000146300 | 0F05 | DA46 | 1505 | DC46 | 1E05 | DD46 | 2305 | DF46 |
| 0000146320 | 3105 | E046 | 4805 | E146 | 5605 | E246 | 6005 | E346 |
| 0000146340 | 6A05 | E546 | 7505 | E646 | 8805 | E746 | 9205 | EA46 |
| 0000146360 | 9D05 | EB46 | A305 | ED46 | BA05 | EF46 | BF05 | F046 |
| 0000146400 | C405 | F146 | CA05 | F346 | CF05 | F446 | DA05 | F746 |
| 0000146420 | DD05 | F946 | E705 | FA46 | EC05 | FC46 | F205 | FD46 |
| 0000146440 | F705 | FE46 | FC05 | FF46 | 0205 | 0147 | 0B06 | 0247 |
| 0000146460 | 1006 | 0647 | 1E06 | 0747 | 2806 | 0847 | 3206 | 0947 |
| 0000146500 | 3D06 | 0A47 | 4C06 | 0B47 | 5E06 | 0C47 | 6106 | 1147 |
| 0000146520 | 7406 | 1247 | 8F06 | 1347 | 9906 | 1447 | A406 | 1547 |
| 0000146540 | AC06 | 1747 | BA06 | 1A47 | 1006 | 1B48 | 1B06 | 1F48 |
| 0000146560 | 1E06 | 2048 | 2806 | 2148 | 3706 | 2248 | 4906 | 2348 |
| 0000146600 | 4C06 | 2548 | 5F06 | 2648 | 7A06 | 2748 | 8206 | 2848 |
| 0000146620 | 8806 | 2948 | 9406 | 2A48 | 9F06 | 2D48 | A206 | 2F48 |
| 0000146640 | AB06 | 3048 | B006 | 3248 | BE06 | 3348 | CA06 | 3448 |
| 0000146660 | D806 | 3648 | DB06 | 3848 | E906 | 3A48 | F306 | 3B48 |
| 0000146700 | 0606 | 3C49 | 1406 | 3D49 | 1F06 | 3E49 | 2206 | 4049 |
| 0000146720 | 2D06 | 4B49 | 3006 | 4C49 | 4306 | 4D49 | 4E06 | 5149 |
| 0000146740 | 5106 | 5249 | 6406 | 5349 | 6F06 | 5749 | 7206 | 5849 |
| 0000146760 | 8506 | 5949 | 9006 | 5D49 | 9306 | 5E49 | AE06 | 5F49 |
| 0000147000 | BB06 | 6049 | C606 | 6449 | C906 | 6549 | DC06 | 6649 |
| 0000147020 | E706 | 6949 | EA06 | 6A49 | 0006 | 6B4A | 0B06 | 6E4A |
| 0000147040 | 0E06 | 6F4A | 1B06 | 724A | 1E06 | 734A | 2806 | 744A |
| 0000147060 | 3306 | 754A | 3606 | 774A | DE06 | 784A | F606 | 794A |
| 0000147100 | 0206 | 7A4B | 0506 | 7B4B | 8706 | 894B | 9206 | 8A4B |
| 0000147120 | A206 | 8B4B | AF06 | 8C4B | B806 | 8D4B | C206 | 8E4B |
| 0000147140 | CB06 | 904B | D506 | 9D4B | E006 | 9E4B | F006 | A04B |
| 0000147160 | FD06 | A14B | 0A06 | A24C | 1606 | A34C | 2306 | A44C |
| 0000147200 | 2C06 | A54C | 3906 | A64C | 3E06 | A84C | 4106 | A94C |
| 0000147220 | 4606 | AB4C | 5206 | AC4C | 5E06 | AD4C | 6306 | AF4C |
| 0000147240 | 6606 | B04C | 6B06 | B34C | 7006 | BD4C | 7B06 | BE4C |
| 0000147260 | 8B06 | C04C | 9506 | C14C | 9A06 | C34C | A006 | C44C |
| 0000147300 | AB06 | CF4C | B606 | D04C | C606 | D24C | D006 | D34C |
| 0000147320 | D506 | D54C | DB06 | D64C | E006 | D74C | E906 | D84C |
| 0000147340 | F306 | D94C | F806 | 0A4C | 7263 | 5F76 | 6170 | 6D72 |
| 0000147360 | 632E | 0001 | 0015 | 003A | 4D04 | 004F | 4D14 | 0051 |
| 0000147400 | 4D28 | 0053 | 4D37 | 0055 | 4D4A | 0059 | 4D5D | 005C |
| 0000147420 | 4D71 | 005E | 4D80 | 0074 | 4D93 | 0077 | 4DA7 | 0078 |
| 0000147440 | 4DB6 | 007B | 4DC3 | 007C | 4DD2 | 0090 | 4DDE | 0093 |
| 0000147460 | 4DF2 | 0095 | 4E01 | 0099 | 4E14 | 009B | 4E28 | 009D |
| 0000147500 | 4E37 | 00A8 | 4E4A | 00A9 | 4E50 | 0B00 | 6C6C | 6269 |
| 0000147520 | 6D63 | 2E74 | 696C | 0762 | 7263 | 2E76 | 696C | 0762 |
| 0000147540 | 736F | 2E32 | 696C | 0662 | 6869 | 6C2E | 6269 | 6409 |
| 0000147560 | 5F62 | 6970 | 6C2E | 6269 | 630B | 7672 | 695F | 737u |
| 0000147600 | 6C2E | 6269 | 630B | 7672 | 6F5F | 736E | 6C2E | 6269 |
| 0000147620 | 630B | 7672 | 735F | 6974 | 6C2E | 6269 | 6C0A | 6962 |
| 0000147640 | 6D70 | 2E74 | 696C | 9362 | 0100 | 0201 | 0800 | 0000 |
| 0000147660 | 1900 | 0200 | 0201 | 7C00 | 0006 | 5100 | 0101 | 0301 |
| 0000147700 | 2100 | 0000 | 1C00 | 0200 | 0301 | CD00 | 0007 | C100 |
| 0000147720 | 0101 | 0401 | 3D00 | 0000 | 1C00 | 0200 | 0401 | 8E00 |
| 0000147740 | 0009 | 3500 | 0100 | 0501 | 5900 | 0000 | 1700 | 0200 |
| 0000147760 | 0501 | C300 | 0009 | 0F00 | 0100 | 0601 | 7000 | 0000 |
| 0000150000 | 1700 | 0200 | 0601 | D200 | 0009 | 2400 | 0100 | 0701 |
| 0000150020 | 8700 | 0000 | 1C00 | 0200 | 0701 | F600 | 0009 | 1000 |

THU MAR 14 17:22:14 1991 CRV.EXE PAGE 49, LINE 2833

| | | | | | | | | |
|---|---|---|---|---|---|---|---|---|
| 0000150040 | 0100 | 0801 | A300 | 0000 | 1C00 | 0200 | 0801 | 0600 |
| 0000150060 | 000A | 1000 | 0100 | 09D1 | BF00 | 0000 | 1C00 | 0200 |
| 0000150100 | 0901 | 1600 | 000A | 2500 | 0100 | 0A01 | DB00 | 0000 |
| 0000150120 | 1D00 | 0200 | 0A01 | 3B00 | 000A | 1100 | 0100 | 0B01 |
| 0000150140 | F800 | 0000 | 1700 | 0200 | 0B01 | 4C00 | 000A | 1F00 |
| 0000150160 | 0100 | 0C01 | 0F00 | 0001 | 1800 | 0200 | 0C01 | 6B00 |
| 0000150200 | 000A | 4200 | 0100 | 0D01 | 2700 | 0001 | 1600 | 0200 |
| 0000150220 | 0D01 | AD00 | 000A | 0E00 | 0100 | 0E01 | 3D00 | 0001 |
| 0000150240 | 1800 | 0200 | 0E01 | BB00 | 000A | 1000 | 0100 | 0F01 |
| 0000150260 | 5500 | 0001 | 1800 | 0200 | 0F01 | CB00 | 000A | 1000 |
| 0000150300 | 0100 | 1001 | 6D00 | 0001 | 1900 | 0200 | 1001 | DB00 |
| 0000150320 | 000A | 1200 | 0100 | 1101 | 8600 | 0001 | 1800 | 0200 |
| 0000150340 | 1101 | ED00 | 000A | 4100 | 0100 | 1201 | 9E00 | 0001 |
| 0000150360 | 1700 | 0200 | 1201 | 2E00 | 000B | 0F00 | 0100 | 1301 |
| 0000150400 | B500 | 0001 | 1A00 | 0200 | 1301 | 3D00 | 000B | 9B00 |
| 0000150420 | 0100 | 1401 | CF00 | 0001 | 1700 | 0200 | 1401 | D800 |
| 0000150440 | 000B | 2100 | 0300 | 1401 | 2900 | 0011 | 3800 | 0427 |
| 0000150460 | 1401 | 2D00 | 0055 | F700 | 0908 | 1401 | 8000 | 005E |
| 0000150500 | 0B00 | 010D | 1501 | E600 | 0001 | 1700 | 0200 | 1501 |
| 0000150520 | F900 | 000B | 1600 | 0300 | 1501 | 6100 | 0038 | CC00 |
| 0000150540 | 041C | 1501 | 2400 | 005E | 5C00 | 0900 | 1501 | 8B00 |
| 0000150560 | 006B | 6300 | 0100 | A201 | FD00 | 0001 | 1500 | 0200 |
| 0000150600 | A201 | 0F00 | 000C | 2000 | 0100 | A301 | 1200 | 0002 |
| 0000150620 | 1400 | 0200 | A301 | 2F00 | 000C | 1C00 | 0100 | A401 |
| 0000150640 | 2600 | 0002 | 1500 | 0200 | A401 | 4B00 | 000C | 0E00 |
| 0000150660 | 0100 | A501 | 3B00 | 0002 | 1700 | 0200 | A501 | 5900 |
| 0000150700 | 000C | 0E00 | 0100 | A601 | 5200 | 0002 | 1700 | 0200 |
| 0000150720 | A601 | 6700 | 000C | 0E00 | 0100 | A701 | 6900 | 0002 |
| 0000150740 | 1500 | 0200 | A701 | 7500 | 000C | 0E00 | 0100 | A801 |
| 0000150760 | 7E00 | 0002 | 1600 | 0200 | A801 | 8300 | 000C | 0F00 |
| 0000151000 | 0100 | A901 | 9400 | 0002 | 1400 | 0200 | A901 | 9200 |
| 0000151020 | 000C | 1E00 | 0100 | AA01 | A800 | 0002 | 1C00 | 0200 |
| 0000151040 | AA01 | B000 | 000C | 1000 | 0100 | AB01 | C400 | 0002 |
| 0000151060 | 1C00 | 0200 | AB01 | C000 | 000C | 1000 | 0100 | AC01 |
| 0000151100 | E000 | 0002 | 1700 | 0200 | AC01 | D000 | 000C | 0E00 |
| 0000151120 | 0100 | AD01 | F700 | 0002 | 1400 | 0200 | AD01 | DE00 |
| 0000151140 | 000C | 3700 | 0100 | AE01 | 0B00 | 0003 | 1800 | 0200 |
| 0000151160 | AE01 | 1500 | 000D | 0F00 | 0100 | AF01 | 2300 | 0003 |
| 0000151200 | 1900 | 0200 | AF01 | 2400 | 000D | 1000 | 0100 | B001 |
| 0000151220 | 3C00 | 0003 | 1400 | 0200 | B001 | 3400 | 000D | 1100 |
| 0000151240 | 0100 | B101 | 5000 | 0003 | 1800 | 0200 | B101 | 4500 |
| 0000151260 | 000D | 1C00 | 0100 | B201 | 6800 | 0003 | 1500 | 0200 |
| 0000151300 | B201 | 6100 | 000D | 3000 | 0100 | B301 | 7D00 | 0003 |
| 0000151320 | 1700 | 0200 | B301 | 9100 | 000D | 0F00 | 0100 | B401 |
| 0000151340 | 9400 | 0003 | 1500 | 0200 | B401 | A000 | 000D | 1200 |
| 0000151360 | 0100 | B501 | A900 | 0003 | 1A00 | 0200 | B501 | B200 |
| 0000151400 | 000D | 0D00 | 0100 | B601 | C300 | 0003 | 1700 | 0200 |
| 0000151420 | B601 | BF00 | 000D | 0E00 | 0100 | B701 | DA00 | 0003 |
| 0000151440 | 1700 | 0200 | B701 | CD00 | 000D | 0E00 | 0100 | B801 |
| 0000151460 | F100 | 0003 | 1800 | 0200 | B801 | DB00 | 000D | 0F00 |
| 0000151500 | 0100 | B901 | 0900 | 0004 | 1500 | 0200 | B901 | EA00 |
| 0000151520 | 000D | 0C00 | 0100 | BA01 | 1E00 | 0004 | 1800 | 0200 |
| 0000151540 | BA01 | F600 | 000D | 0D00 | 0100 | BB01 | 3600 | 0004 |
| 0000151560 | 1900 | 0200 | BB01 | 0300 | 000E | 0F00 | 0100 | BC01 |
| 0000151600 | 4F00 | 0004 | 1B00 | 0200 | BC01 | 1200 | 000E | 1C00 |
| 0000151620 | 0100 | BD01 | 6A00 | 0004 | 1500 | 0200 | BD01 | 2E00 |
| 0000151640 | 000E | 1F00 | 0100 | BE01 | 7F00 | 0004 | 1700 | 0200 |
| 0000151660 | BE01 | 4D00 | 000E | 3300 | 0100 | BF01 | 9600 | 0004 |
| 0000151700 | 1B00 | 0200 | BF01 | 8000 | 000E | 3F00 | 0100 | C001 |

THU MAR 14 17:22:14 1991 CRV.EXE PAGE 50, LINE 2892

| | | | | | | | | |
|---|---|---|---|---|---|---|---|---|
| 0000151720 | B100 | 0004 | 1800 | 0200 | C001 | BF00 | 000E | 0F00 |
| 0000151740 | 0100 | C101 | C900 | 0004 | 1800 | 0200 | C101 | CE00 |
| 0000151760 | 000E | 0F00 | 0100 | C201 | E100 | 0004 | 1A00 | 0200 |
| 0000152000 | C201 | DD00 | 000E | 1E00 | 0100 | C301 | FB00 | 0004 |
| 0000152020 | 1900 | 0200 | C301 | FB00 | 000E | 3100 | 0100 | C401 |
| 0000152040 | 1400 | 0005 | 1600 | 0200 | C401 | 2C00 | 000F | 1E00 |
| 0000152060 | 0100 | C501 | 2A00 | 0005 | 1500 | 0200 | C501 | 4A00 |
| 0000152100 | 000F | 1B00 | 0100 | C601 | 3F00 | 0005 | 1900 | 0200 |
| 0000152120 | C601 | 6500 | 000F | 5600 | 0100 | C701 | 5800 | 0005 |
| 0000152140 | 1300 | 0200 | C701 | BB00 | 000F | 1C00 | 0100 | C801 |
| 0000152160 | 6B00 | 0005 | 1400 | 0200 | C801 | D700 | 000F | 2C00 |
| 0000152200 | 0100 | C901 | 7F00 | 0005 | 1600 | 0200 | C901 | 0300 |
| 0000152220 | 0010 | 4E00 | 0100 | CA01 | 9500 | 0005 | 1700 | 0200 |
| 0000152240 | CA01 | 5100 | 0010 | 1100 | 0100 | CB01 | AC00 | 0005 |
| 0000152260 | 1500 | 0200 | CB01 | 6200 | 0010 | 1F00 | 0100 | CC01 |
| 0000152300 | C100 | 0005 | 1500 | 0200 | CC01 | 8100 | 0010 | 0F00 |
| 0000152320 | 0100 | CD01 | D600 | 0005 | 1900 | 0200 | CD01 | 9000 |
| 0000152340 | 0010 | 1200 | 0100 | CE01 | EF00 | 0005 | 1800 | 0200 |
| 0000152360 | CE01 | A200 | 0010 | 1D00 | 0100 | CF01 | 0700 | 0006 |
| 0000152400 | 1800 | 0200 | CF01 | BF00 | 0010 | 0F00 | 0100 | D001 |
| 0000152420 | 1F00 | 0006 | 1500 | 0200 | D001 | CE00 | 0010 | 0C00 |
| 0000152440 | 0100 | D101 | 3400 | 0006 | 1600 | 0200 | D101 | DA00 |
| 0000152460 | 0010 | 1D00 | 0100 | D201 | 4A00 | 0006 | 1D00 | 0200 |
| 0000152500 | D201 | F700 | 0010 | 2400 | 0100 | D301 | 6700 | 0006 |
| 0000152520 | 1500 | 0200 | D301 | 1B00 | 0011 | 0E00 | 0600 | 0001 |
| 0000152540 | EE00 | 006B | 5D00 | 4E00 | 3042 | 1332 | 0072 | 0000 |
| 0000152557 | | | | | | | | |

THU MAR 14 17:22:42 1991 CRV_IF.DLL PAGE 1, LINE 1

| | | | | | | | | |
|---|---|---|---|---|---|---|---|---|
| 0000000000 | 5A4D | 00C9 | 002C | 0000 | 0004 | 0000 | FFFF | 0000 |
| 0000000020 | 00B6 | 0000 | 0000 | 0000 | 0040 | 0000 | 0000 | 0000 |
| 0000000040 | 0000 | 0000 | 0000 | 0000 | 0000 | 0000 | 0000 | 0000 |
| 0000000060 | 0000 | 0000 | 0000 | 0000 | 0000 | 0000 | 0080 | 0000 |
| 0000000100 | 1F0E | 0EBA | B400 | CD09 | B821 | 4C01 | 21CD | 6854 |
| 0000000120 | 7369 | 7020 | 6F72 | 7267 | 6D61 | 6320 | 6E61 | 6F6E |
| 0000000140 | 2074 | 7572 | 206E | 6E69 | 4420 | 534F | 6D20 | 646F |
| 0000000160 | 2E65 | 0D0D | 240A | 0000 | 0000 | 0000 | 0000 | 0000 |
| 0000000200 | 454E | 0A05 | 019A | 0019 | BC31 | 6CBD | 8006 | 0005 |
| 0000000220 | 0000 | 0000 | 16F8 | 0001 | 0000 | 0000 | 0005 | 0004 |
| 0000000240 | 0015 | 0040 | 0068 | 0068 | 00EA | 00F2 | 0233 | 0000 |
| 0000000260 | 0000 | 0004 | 0000 | 0001 | 0000 | 0000 | 0000 | 0000 |
| 0000000300 | 0025 | 3E67 | 0D00 | 3E68 | 0420 | 00C6 | 0C01 | 0100 |
| 0000000320 | 0000 | 0000 | 0C01 | 0850 | 0000 | 0000 | 0C01 | 0200 |
| 0000000340 | 042D | 13CF | 0D01 | 13E0 | 6306 | 7672 | 695F | 0066 |
| 0000000360 | 0C00 | 5243 | 5F56 | 4649 | 415F | 4F42 | 5452 | 0001 |
| 0000000400 | 430F | 5652 | 535F | 4E45 | 5F44 | 4F54 | 435F | 5652 |
| 0000000420 | 0002 | 530C | 4143 | 5F4E | 5243 | 5F56 | 534D | 0347 |
| 0000000440 | 1500 | 5243 | 5F56 | 554D | 544C | 5F49 | 4553 | 444E |
| 0000000460 | 545F | 5F4F | 5243 | 0456 | 0D00 | 5250 | 4E49 | 5F54 |
| 0000000500 | 5243 | 5F56 | 534D | 0547 | 0F00 | 5243 | 5F56 | 4553 |
| 0000000520 | 5F54 | 5845 | 4345 | 5455 | 0645 | 0B00 | 5243 | 5F56 |
| 0000000540 | 4649 | 495F | 494E | 0754 | 0000 | 0001 | 000A | 0010 |
| 0000000560 | 0013 | 0800 | 4F44 | 4353 | 4C41 | 534C | 7305 | 7465 |
| 0000000600 | 7075 | 4902 | 0648 | 626C | 7069 | 746D | 5F0D | 5842 |
| 0000000620 | 445F | 4245 | 4755 | 4F4D | 4544 | 5F0D | 5842 | 545F |
| 0000000640 | 4D49 | 5345 | 4F4D | 4544 | 5F09 | 5842 | 425F | 535F |
| 0000000660 | 4749 | 5F0E | 5842 | 445F | 4245 | 4755 | 4E45 | 4554 |
| 0000000700 | 0F52 | 425F | 5F58 | 4544 | 5542 | 5247 | 5445 | 5255 |
| 0000000720 | 0E4E | 425F | 5F58 | 4F56 | 4449 | 4552 | 5554 | 4E52 |
| 0000000740 | 5F0E | 5842 | 445F | 4245 | 4755 | 5250 | 4E49 | 0D54 |
| 0000000760 | 425F | 5F58 | 4544 | 5542 | 5047 | 4952 | 0D46 | 425F |
| 0000001000 | 5F58 | 4544 | 5542 | 4347 | 444F | 0E45 | 425F | 5F58 |
| 0000001020 | 4150 | 4B43 | 4946 | 544C | 5245 | 0107 | E401 | 0105 |
| 0000001040 | 058D | C301 | 0111 | 00CE | E601 | 0109 | 00A4 | 0001 |
| 0000001060 | 0000 | 1100 | 5243 | 2056 | 6E69 | 6574 | 6672 | 6361 |
| 0000001100 | 2065 | 4C44 | 004C | 0000 | 0000 | 0000 | 0000 | 0000 |
| 0000001120 | 581E | 4590 | 8B55 | 1EEC | D88E | EC81 | 0004 | 5657 |
| 0000001140 | B81E | FFFF | D88E | 681E | 0054 | B89A | 463A | 8300 |
| 0000001160 | 04C4 | D00B | 0375 | 09E9 | B800 | 0000 | 00BA | E900 |
| 0000001200 | 0006 | FFB8 | BAFF | FFFF | D2A3 | 8913 | D416 | 1E13 |
| 0000001220 | 5B68 | 9A00 | 3AB8 | FFFF | C483 | 0B04 | 74D0 | E903 |
| 0000001240 | 0006 | 01B8 | E900 | 0003 | 00B8 | A300 | 13D0 | 3E83 |
| 0000001260 | 13D0 | 740D | E903 | 0006 | 00B8 | E900 | 002A | 026A |
| 0000001300 | 016A | 681E | 13D6 | FF9A | 00FF | 8900 | FC46 | 013D |
| 0000001320 | 1B00 | 40C0 | 003D | 7500 | E903 | 0006 | 468B | E9FC |
| 0000001340 | 0006 | 00B8 | E900 | 0000 | 5E1F | 835F | 02ED | E58B |
| 0000001360 | 5D1F | CB4D | 581E | 4590 | 8B55 | 1EEC | D88E | EC81 |
| 0000001400 | 0000 | 5657 | B81E | 0012 | D88E | 468B | A306 | 13D0 |
| 0000001420 | 5E1F | 835F | 02ED | E58B | 5D1F | CA4D | 0002 | 581E |
| 0000001440 | 4590 | 8B55 | 1EEC | D88E | EC81 | 0032 | 5657 | B81E |
| 0000001460 | 00B6 | D88E | 46C7 | 6AFA | 8C00 | FC5E | 46C7 | 01EC |
| 0000001500 | 2B01 | 89C0 | DE46 | 4689 | 8EDC | 8006 | 2612 | 3E83 |
| 0000001520 | FFFF | 7500 | E903 | 001D | 36FF | 0068 | 36FF | 0066 |
| 0000001540 | 468D | 16D2 | 9A50 | FFFF | 0000 | C483 | 3D08 | 0000 |
| 0000001560 | 0374 | 0FE9 | 8E00 | 8206 | 2612 | 3E83 | 01F8 | 7500 |
| 0000001600 | E903 | 003B | 681E | 0071 | 468D | 16E0 | 8D50 | D246 |
| 0000001620 | 5016 | 468D | 16F2 | 6850 | 008E | 681E | 009A | 36FF |
| 0000001640 | 0064 | 36FF | 0062 | 36FF | 0068 | 36FF | 0066 | FF9A |

THU MAR 14 17:22:42 1991 CRV_IF.DLL PAGE 3, LINE 119

| | | | | | | | | |
|---|---|---|---|---|---|---|---|---|
| 0000003540 | 8300 | D67E | 74FE | E903 | 000F | 068E | 1282 | 8326 |
| 0000003560 | 2C3E | 0001 | 0375 | 50E9 | C700 | D846 | 0000 | 76FF |
| 0000003600 | FFDE | DC76 | 468D | 16D8 | FF50 | EC76 | 76FF | FFFC |
| 0000003620 | FA76 | 4E8D | 16E0 | 8D51 | F24E | 5116 | 4E8D | 16D2 |
| 0000003640 | 1E51 | 9A68 | 6800 | 00D8 | 36FF | 0064 | 36FF | 0062 |
| 0000003660 | 36FF | 0068 | 36FF | 0066 | 409A | 0002 | 8300 | 28C4 |
| 0000003700 | 468B | E9D8 | 0009 | 06E9 | B800 | 0000 | 00E9 | 1F00 |
| 0000003720 | 5F5E | ED83 | 8B02 | 1FE5 | 4D5D | 08CA | 1E00 | 9058 |
| 0000003740 | 5545 | EC8B | 8E1E | 81D8 | 0EEC | 5700 | 1E56 | E0B8 |
| 0000003760 | 8E00 | 8BD8 | 1046 | 4689 | 8BF2 | 0A46 | 4689 | 8BF4 |
| 0000004000 | 0C46 | 568B | 890E | F646 | 5689 | 2BF8 | 89C0 | FC46 |
| 0000004020 | 4689 | 8DFA | F246 | 5016 | 76FF | FF08 | 0676 | CE9A |
| 0000004040 | B400 | E901 | 0000 | 5E1F | 835F | 02ED | E58B | 5D1F |
| 0000004060 | CA4D | 000C | 581E | 4590 | 8B55 | 1EEC | D88E | EC81 |
| 0000004100 | 0044 | 5657 | B81E | 059F | D88E | 46C7 | B0FA | 8C00 |
| 0000004120 | FC5E | 46C7 | 01F0 | 2B01 | 89C0 | E246 | 4689 | 8EE0 |
| 0000004140 | 8006 | 2612 | 3E83 | 06A3 | 7500 | E903 | 001D | 36FF |
| 0000004160 | 0068 | 36FF | 0066 | 468D | 16D6 | 9A50 | 0116 | 0000 |
| 0000004200 | C483 | 3D08 | 0000 | 0374 | 0FE9 | 8E00 | 8206 | 2612 |
| 0000004220 | 3E83 | 0727 | 7500 | E903 | 003B | 681E | 00B7 | 468D |
| 0000004240 | 16E4 | 8D50 | D646 | 5016 | 468D | 16F2 | 6850 | 010A |
| 0000004260 | 681E | 00E0 | 36FF | 0064 | 36FF | 0062 | 36FF | 0068 |
| 0000004300 | 36FF | 0066 | 5F9A | 0001 | 8300 | 1EC4 | 4689 | 89F2 |
| 0000004320 | F456 | 08E9 | 2B00 | 89C0 | F446 | 4689 | C7F2 | CA46 |
| 0000004340 | 0024 | 46C7 | 01CC | C700 | CE46 | 0000 | 068E | 1280 |
| 0000004360 | 8326 | 0F3E | 0007 | 0375 | 53E9 | 8300 | DA7E | 75FE |
| 0000004400 | E903 | 004A | 468D | 16E4 | 8D50 | F246 | 5016 | 468D |
| 0000004420 | 16D6 | 1E5C | E068 | 6800 | 0113 | 36FF | 0064 | 36FF |
| 0000004440 | 0062 | 36FF | 0068 | 36FF | 0066 | 681E | 00BE | B868 |
| 0000004460 | 6808 | 08BB | 189A | 0003 | 8300 | 22C4 | 003D | 7500 |
| 0000004500 | E903 | 000A | 468D | 16BE | 9A50 | 09E6 | 05D1 | 3E83 |
| 0000004520 | 13D0 | 7400 | E903 | 007D | 068E | 1280 | 8326 | C43E |
| 0000004540 | 0007 | 0375 | 09E9 | 8300 | DA7E | 74FE | E903 | 000F |
| 0000004560 | 068E | 1282 | 8326 | DC3E | 0007 | 0375 | 50E9 | C700 |
| 0000004600 | DC46 | 0000 | 76FF | FFE2 | E076 | 468D | 16DC | FF50 |
| 0000004620 | F076 | 76FF | FFFC | FA76 | 4E8D | 16E4 | 8D51 | F24E |
| 0000004640 | 5116 | 4E8D | 16D6 | 1E51 | E068 | 6800 | 0116 | 36FF |
| 0000004660 | 0064 | 36FF | 0062 | 36FF | 0068 | 36FF | 0066 | 259A |
| 0000004700 | 0008 | 8300 | 28C4 | 468B | E9DC | 025E | 06E9 | B800 |
| 0000004720 | 0000 | 55E9 | FF02 | D636 | 8D13 | BE46 | 5016 | FF6A |
| 0000004740 | FF6A | 006A | 1068 | 8D27 | F646 | 5016 | FF9A | 00FF |
| 0000004760 | 8900 | DE46 | 7E83 | 01DE | C01B | 3D40 | 0000 | 0375 |
| 0000005000 | 88E9 | 8100 | DE7E | 03F6 | 0375 | 7EE9 | 8E00 | 8006 |
| 0000005020 | 2612 | 3E83 | 0842 | 7500 | E903 | 0009 | 7E83 | FEDA |
| 0000005040 | 0374 | 0FE9 | 8E00 | 8206 | 2612 | 3E83 | 08FE | 7500 |
| 0000005060 | E903 | 0051 | 468B | 89DE | DC46 | 76FF | FFE2 | E076 |
| 0000005100 | 468D | 16DC | FF50 | F076 | 76FF | FFFC | FA76 | 4E8D |
| 0000005120 | 16E4 | 8D51 | F24E | 5116 | 4E8D | 16D6 | 1E51 | E068 |
| 0000005140 | 6800 | 011E | 36FF | 0064 | 36FF | 0062 | 36FF | 0068 |
| 0000005160 | 36FF | 0066 | 479A | 0009 | 8300 | 28C4 | 468B | E9DC |
| 0000005200 | 01A8 | 06E9 | 8B00 | DE46 | 9FE9 | 8E01 | 8006 | 2612 |
| 0000005220 | 3E83 | 08E6 | 7500 | E903 | 007B | 7E83 | FEDA | 0375 |
| 0000005240 | 72E9 | 8B00 | F846 | 460B | 75F6 | E903 | 0020 | 5EC4 |
| 0000005260 | 26F6 | 478B | 8914 | DE46 | 013D | 1B00 | 40C0 | 003D |
| 0000005300 | 7500 | E903 | 0008 | 46C7 | 01BC | E900 | 0005 | 46C7 |
| 0000005320 | 00BC | FF00 | DE76 | 681E | 00C6 | 76FF | 8DBC | E446 |
| 0000005340 | 5016 | 468D | 16F2 | 8D50 | D646 | 5016 | 681E | 00E0 |
| 0000005360 | 2168 | FF01 | 6436 | FF00 | 6236 | FF00 | 6836 | FF00 |
| 0000005400 | 6636 | 1E00 | D768 | 6800 | 0312 | 1568 | 9A03 | 04B5 |

THU MAR 14 17:22:42 1991 CRV_IF.DLL PAGE 4, LINE 178

| | | | | | | | | |
|---|---|---|---|---|---|---|---|---|
| 0000005420 | 0000 | C483 | FF2A | D636 | 9A13 | FFFF | 0000 | 4689 |
| 0000005440 | 3DDE | 0001 | C01B | 3D40 | 0000 | 0375 | 7EE9 | 8E00 |
| 0000005460 | 8006 | 2612 | 3E83 | 0964 | 7500 | E903 | 0009 | 7E83 |
| 0000005500 | FEDA | 0374 | 0FE9 | 8E00 | 8206 | 2612 | 3E83 | 097C |
| 0000005520 | 7500 | E903 | 0051 | 468B | 89DE | DC46 | 76FF | FFE2 |
| 0000005540 | E076 | 468D | 16DC | FF50 | F076 | 76FF | FFFC | FA76 |
| 0000005560 | 4E8D | 16E4 | 8D51 | F24E | 5116 | 4E8D | 16D6 | 1E51 |
| 0000005600 | E068 | 6800 | 0127 | 36FF | 0064 | 36FF | 0062 | 36FF |
| 0000005620 | 0068 | 36FF | 0066 | 699A | 0005 | 8300 | 28C4 | 468B |
| 0000005640 | E9DC | 0086 | 06E9 | 8B00 | DE46 | 7DE9 | 8E00 | 8006 |
| 0000005660 | 2612 | 3E83 | 0509 | 7500 | E903 | 0009 | 7E83 | FEDA |
| 0000005700 | 0374 | 0FE9 | 8E00 | 8206 | 2612 | 3E83 | 0521 | 7500 |
| 0000005720 | E903 | 0050 | 46C7 | 00DC | FF00 | E276 | 76FF | 8DE0 |
| 0000005740 | DC46 | 5016 | 76FF | FFF0 | FC76 | 76FF | 8DFA | E44E |
| 0000005760 | 5116 | 4E8D | 16F2 | 8D51 | D64E | 5116 | 681E | 00E0 |
| 0000006000 | 2968 | FF01 | 6436 | FF00 | 6236 | FF00 | 6836 | FF00 |
| 0000006020 | 6636 | 9A00 | 076F | 0000 | C483 | 8B28 | DC46 | 09E9 |
| 0000006040 | E900 | 0006 | 00B8 | E900 | 0000 | 5E1F | 835F | 02ED |
| 0000006060 | E58B | 5D1F | CB4D | 581E | 4590 | 8B55 | 1EEC | D88E |
| 0000006100 | EC81 | 0036 | 5657 | B81E | 05F6 | D88E | 46C7 | 63F6 |
| 0000006120 | 8C06 | F85E | 46C7 | 00E4 | 2B00 | 89C0 | D446 | 4689 |
| 0000006140 | 8ED2 | 8406 | 2612 | 3E83 | 0616 | 7500 | E903 | 001D |
| 0000006160 | 36FF | 0832 | 36FF | 0830 | 468D | 16CA | 9A50 | 062C |
| 0000006200 | 0000 | C483 | 3D08 | 0000 | 0374 | 0FE9 | 8E00 | 8606 |
| 0000006220 | 2612 | 3E83 | 0642 | 7500 | E903 | 003A | 681E | 0667 |
| 0000006240 | 468D | 16D8 | 8D50 | CA46 | 5016 | 468D | 16F2 | 6A50 |
| 0000006260 | 1E31 | 6468 | FF09 | 2E36 | FF08 | 2C36 | FF08 | 3236 |
| 0000006300 | FF08 | 3036 | 9A08 | 0675 | 0000 | C483 | 891E | F246 |
| 0000006320 | 5689 | E9F4 | 0008 | C02B | 4689 | 89F4 | F246 | 5EC4 |
| 0000006340 | 2606 | 478B | 890C | EC46 | 7E83 | 4BEC | 0374 | 1CE9 |
| 0000006360 | C400 | 065E | 8B26 | 1247 | 4689 | 8BEC | 0646 | 568B |
| 0000006400 | 0508 | 0014 | 4689 | 89FA | FC56 | 0FE9 | 8B00 | 0646 |
| 0000006420 | 568B | 0508 | 0012 | 4689 | 89FA | FC56 | 468B | E9EC |
| 0000006440 | 0615 | 068E | 1284 | 8326 | 963E | 000B | 0375 | 5EE9 |
| 0000006460 | 8300 | CE7E | 75FE | E903 | 0055 | 76FF | FFFC | FA76 |
| 0000006500 | 7E83 | 05EC | 0374 | 06E9 | B800 | D66B | 03E9 | B800 |
| 0000006520 | 0675 | 501E | 681E | 067F | 468D | 16D8 | 8D50 | F246 |
| 0000006540 | 5016 | 468D | 16CA | 1E50 | 6468 | 6A09 | FF48 | 2E36 |
| 0000006560 | FF08 | 2C36 | FF08 | 3236 | FF08 | 3036 | 1E08 | 8568 |
| 0000006600 | 6806 | 0C09 | 0C68 | 9A0C | 0C0F | 0000 | C483 | E92E |
| 0000006620 | 0610 | 5EC4 | 23FA | 078A | 4688 | 8AD6 | D646 | 8D50 |
| 0000006640 | EE46 | 5016 | FF9A | 00FF | 3D00 | 0001 | C01B | D8F7 |
| 0000006660 | 003D | 7500 | E903 | 0016 | 76FF | FFF0 | EE76 | 468D |
| 0000006700 | 16E6 | 9A50 | 39E8 | 0B8A | C483 | E908 | 0011 | 681E |
| 0000006720 | 068D | 468D | 16E6 | 9A50 | 39E8 | 06FC | C483 | 8E08 |
| 0000006740 | 8406 | 2612 | 3E83 | 0C20 | 7500 | E903 | 0078 | 7E83 |
| 0000006760 | FECE | 0375 | 6FE9 | C400 | FA5E | FF26 | 0877 | FF26 |
| 0000007000 | 0677 | 5EC4 | 26FA | 77FF | 2604 | 77FF | 8D02 | E646 |
| 0000007020 | 5016 | 468A | 98D6 | 8350 | EC7E | 7409 | E903 | 0006 |
| 0000007040 | 90B8 | E906 | 0003 | 9AB8 | 1E06 | 1E50 | A66B | 8D06 |
| 0000007060 | D846 | 5016 | 468D | 16F2 | 8D50 | CA46 | 5016 | 681E |
| 0000007100 | 0964 | 566A | 36FF | 082E | 36FF | 082C | 36FF | 0832 |
| 0000007120 | 36FF | 0830 | 681E | 06C4 | 7E68 | 680C | 0C81 | 849A |
| 0000007140 | 000C | 8300 | 38C4 | 39E9 | 8E05 | 8406 | 2612 | 3E83 |
| 0000007160 | 0C95 | 7500 | E903 | 0063 | 7E83 | FECE | 0375 | 5AE9 |
| 0000007200 | C400 | FA5E | FF26 | 0877 | FF26 | 0677 | 5EC4 | 26FA |
| 0000007220 | 77FF | 2604 | 77FF | C402 | FA5E | 8A26 | 2A07 | 50E4 |
| 0000007240 | 681E | 06CC | 468D | 16D8 | 8D50 | F246 | 5016 | 468D |
| 0000007260 | 16CA | 1E50 | 6468 | 6A09 | FF5C | 2E36 | FF08 | 2C36 |

THU MAR 14 17:22:42 1991 CRV_IF.DLL PAGE 5, LINE 237

| | | | | | | | | |
|---|---|---|---|---|---|---|---|---|
| 0000007300 | FF08 | 3236 | FF08 | 3036 | 1E08 | EF68 | 6806 | 0CF8 |
| 0000007320 | FB68 | 9A0C | 0CFE | 0000 | C483 | E930 | 04C4 | 068E |
| 0000007340 | 1284 | 8326 | 0F3E | 000D | 0375 | 68E9 | 8300 | CE7E |
| 0000007360 | 75FE | E903 | 005F | 5EC4 | 26FA | 77FF | 2608 | 77FF |
| 0000007400 | C406 | FA5E | FF26 | 0477 | FF26 | 0277 | 5EC4 | 26FA |
| 0000007420 | 77FF | C406 | FA5E | FF26 | 0477 | 681E | 06F7 | 468D |
| 0000007440 | 16D8 | 8D50 | F246 | 5016 | 468D | 16CA | 1E50 | 6468 |
| 0000007460 | 6A09 | FF63 | 2E36 | FF08 | 2C36 | FF08 | 3236 | FF08 |
| 0000007500 | 3036 | 1E08 | 2068 | 6807 | 0D58 | 5B68 | 9A0D | 0D5E |
| 0000007520 | 0000 | C483 | E932 | 044A | 068E | 1284 | 8326 | 6F3E |
| 0000007540 | 000D | 0375 | 4EE9 | 8300 | CE7E | 75FE | E903 | 0045 |
| 0000007560 | 5EC4 | 26FA | 77FF | 2602 | 37FF | 681E | 0728 | 468D |
| 0000007600 | 16D8 | 8D50 | F246 | 5016 | 468D | 16CA | 1E50 | 6468 |
| 0000007620 | 6A09 | FF67 | 2E36 | FF08 | 2C36 | FF08 | 3236 | FF08 |
| 0000007640 | 3036 | 1E08 | 4168 | 6807 | 0DB8 | BB68 | 9A0D | 0DBE |
| 0000007660 | 0000 | C483 | E92A | 03EA | 068E | 1284 | 8326 | CF3E |
| 0000007700 | 000D | 0375 | 4EE9 | 8300 | CE7E | 75FE | E903 | 0045 |
| 0000007720 | 5EC4 | 26FA | 77FF | 2602 | 37FF | 681E | 0749 | 468D |
| 0000007740 | 16D8 | 8D50 | F246 | 5016 | 468D | 16CA | 1E50 | 6468 |
| 0000007760 | 6A09 | FF6B | 2E36 | FF08 | 2C36 | FF08 | 3236 | FF08 |
| 0000010000 | 3036 | 1E08 | 5A68 | 6807 | 06DF | E268 | 9A06 | FFFF |
| 0000010020 | 0000 | C483 | E92A | 038A | 068E | 1284 | 8326 | 183E |
| 0000010040 | 000A | 0375 | 59E9 | 8300 | CE7E | 75FE | E903 | 0050 |
| 0000010060 | 5EC4 | 26FA | 77FF | 2606 | 77FF | C404 | FA5E | FF26 |
| 0000010100 | 0277 | FF26 | 1E37 | 6268 | 8D07 | D846 | 5016 | 468D |
| 0000010120 | 16F2 | 8D50 | CA46 | 5016 | 681E | 0964 | 706A | 36FF |
| 0000010140 | 082E | 36FF | 082C | 36FF | 0832 | 36FF | 0830 | 681E |
| 0000010160 | 077A | 7F68 | 680E | 0E82 | 859A | 000E | 8300 | 2EC4 |
| 0000010200 | 1FE9 | 8E03 | 8406 | 2612 | 3E83 | 0E96 | 7500 | E903 |
| 0000010220 | 004A | 7E83 | FECE | 0375 | 41E9 | FF00 | FC76 | 76FF |
| 0000010240 | 1EFA | 8268 | 8D07 | D846 | 5016 | 468D | 16F2 | 8D50 |
| 0000010260 | CA46 | 5016 | 681E | 0964 | 746A | 36FF | 082E | 36FF |
| 0000010300 | 082C | 36FF | 0832 | 36FF | 0830 | 681E | 0792 | DB68 |
| 0000010320 | 680E | 0EDE | E19A | 000E | 8300 | 2AC4 | C3E9 | 8E02 |
| 0000010340 | 8406 | 2612 | 3E83 | 0EF2 | 7500 | E903 | 004A | 7E83 |
| 0000010360 | FECE | 0375 | 41E9 | C400 | FA5E | FF26 | 1E37 | 9A68 |
| 0000010400 | 8D07 | D846 | 5016 | 468D | 16F2 | 8D50 | CA46 | 5016 |
| 0000010420 | 681E | 0964 | 786A | 36FF | 082E | 36FF | 082C | 36FF |
| 0000010440 | 0832 | 36FF | 0830 | 681E | 07B0 | 4868 | 680F | 0F4B |
| 0000010460 | 4E9A | 000F | 8300 | 28C4 | 67E9 | 8E02 | 8406 | 2612 |
| 0000010500 | 3E83 | 0F5F | 7500 | E903 | 005B | 7E83 | FECE | 0375 |
| 0000010520 | 52E9 | C400 | FA5E | 8326 | 003F | 0375 | 06E9 | B800 |
| 0000010540 | 07B8 | 03E9 | B800 | 07BB | 501E | 681E | 07BF | 468D |
| 0000010560 | 16D8 | 8D50 | F246 | 5016 | 468D | 16CA | 1E50 | 6468 |
| 0000010600 | 6A09 | FF7C | 2E36 | FF08 | 2C36 | FF08 | 3236 | FF08 |
| 0000010620 | 3036 | 1E08 | CD68 | 6807 | 0FAA | AD68 | 9A0F | 0FB0 |
| 0000010640 | 0000 | C483 | E92A | 01FA | 068E | 1284 | 8326 | C13E |
| 0000010660 | 000F | 0375 | 50E9 | 8300 | CE7E | 75FE | E903 | 0047 |
| 0000010700 | 468B | 8BFA | FC56 | 0805 | 5200 | 1E50 | D568 | 8D07 |
| 0000010720 | D846 | 5016 | 468D | 16F2 | 8D50 | CA46 | 5016 | 681E |
| 0000010740 | 0964 | 8068 | FF00 | 2E36 | FF08 | 2C36 | FF08 | 3236 |
| 0000010760 | FF08 | 3036 | 1E08 | E768 | 6807 | 100C | 0F68 | 9A10 |
| 0000011000 | 1012 | 0000 | C483 | E92A | 0198 | 068E | 1284 | 8326 |
| 0000011020 | 2C3E | 0010 | 0375 | 50E9 | 8300 | CE7E | 75FE | E903 |
| 0000011040 | 0047 | 468B | 8BFA | FC56 | 0805 | 5200 | 1E50 | EF68 |
| 0000011060 | 8D07 | D846 | 5016 | 468D | 16F2 | 8D50 | CA46 | 5016 |
| 0000011100 | 681E | 0964 | 8468 | FF00 | 2E36 | FF08 | 2C36 | FF08 |
| 0000011120 | 3236 | FF08 | 3036 | 1E08 | 0068 | 6808 | 107A | 7D68 |
| 0000011140 | 9A10 | 1080 | 0000 | C483 | E92A | 0136 | 7E83 | 4CEC |

THU MAR 14 17:22:42 1991 CRV_IF.DLL PAGE 6, LINE 296

| | | | | | | | | |
|---|---|---|---|---|---|---|---|---|
| 0000011160 | 037C | 65E9 | 8E00 | 8406 | 2612 | 3E83 | 1091 | 7500 |
| 0000011200 | E903 | 0053 | 7E83 | FECE | 0375 | 4AE9 | 8B00 | EC5E |
| 0000011220 | E3C1 | FF02 | 36B7 | FF08 | 34B7 | 1E08 | 0868 | 8D08 |
| 0000011240 | D846 | 5016 | 468D | 16F2 | 8D50 | CA46 | 5016 | 681E |
| 0000011260 | 0964 | 8868 | FF00 | 2E36 | FF08 | 2C36 | FF08 | 3236 |
| 0000011300 | FF08 | 3036 | 1E08 | 0B68 | 6808 | 10D4 | D768 | 9A10 |
| 0000011320 | 10DA | 0000 | C483 | E92A | 0057 | 068E | 1284 | 8326 |
| 0000011340 | 593E | 0011 | 0375 | 48E9 | 8300 | CE7E | 75FE | E903 |
| 0000011360 | 003F | 76FF | 1EEC | 1368 | 8D08 | D846 | 5016 | 468D |
| 0000011400 | 16F2 | 8D50 | CA46 | 5016 | 681E | 0964 | 8A68 | FF00 |
| 0000011420 | 2E36 | FF08 | 2C36 | FF08 | 3236 | FF08 | 3036 | 1E08 |
| 0000011440 | 2368 | 6808 | 0B32 | 3568 | 9A0B | 0B38 | 0000 | C483 |
| 0000011460 | E928 | 006E | 6BE9 | 3D00 | 0015 | 0375 | D9E9 | 7EFC |
| 0000011500 | E903 | 0025 | 052D | 3D00 | 0008 | 0376 | 1DE9 | D1FF |
| 0000011520 | 93E0 | FF2E | 07A7 | D211 | D20A | 1C0A | 1C10 | 4210 |
| 0000011540 | 420B | 190B | 8E0C | 080C | 3D0D | 0028 | 0375 | 37E9 |
| 0000011560 | 7EFE | E903 | 0013 | 192D | 7500 | E903 | FC3A | 092D |
| 0000011600 | 7500 | E903 | FDB5 | E3E9 | 2DFE | 002B | 0375 | 79E9 |
| 0000011620 | 2DFE | 000E | 0375 | 46E9 | 48FD | 0375 | E4E9 | E9FC |
| 0000011640 | FECA | 068E | 1284 | 8326 | D93E | 000A | 0375 | 09E9 |
| 0000011660 | 8300 | CE7E | 74FE | E903 | 000F | 068E | 1286 | 8326 |
| 0000011700 | 443E | 000A | 0375 | 39E9 | 8D00 | D846 | 5016 | 468D |
| 0000011720 | 16F2 | 8D50 | CA46 | 5016 | 681E | 0964 | 8E68 | FF00 |
| 0000011740 | 2E36 | FF08 | 2C36 | FF08 | 3236 | FF08 | 3036 | 9A08 |
| 0000011760 | FFFF | 0000 | C483 | C71A | D046 | 0000 | 06E9 | E900 |
| 0000012000 | 0003 | 00E9 | 1F00 | 5F5E | ED83 | 8B02 | 1FE5 | 4D5D |
| 0000012020 | 04CA | 1E00 | 9058 | 5545 | EC8B | 8E1E | 81D8 | 8CEC |
| 0000012040 | 5700 | 1E56 | F8B8 | 8E09 | A1D8 | 0A94 | 060B | 0A92 |
| 0000012060 | 0374 | 4EE9 | 1E00 | 7268 | 1E09 | 7468 | 9A09 | 1D3E |
| 0000012100 | 1201 | C483 | A308 | 0A92 | 1689 | 0A94 | 766A | E49A |
| 0000012120 | 7636 | 830B | 02C4 | D8A3 | 8913 | DA16 | A113 | 13DA |
| 0000012140 | 060B | 13D8 | 0374 | 06E9 | B800 | 0007 | BBE9 | C404 |
| 0000012160 | D81E | 2613 | 47C7 | 020E | C400 | D81E | 2613 | 47C7 |
| 0000012200 | 6410 | 8D00 | 9A46 | 5016 | 681E | 0977 | 36FF | 0A94 |
| 0000012220 | 36FF | 0A92 | 569A | 5D1D | 8312 | 0CC4 | 7440 | E903 |
| 0000012240 | 002A | 36FF | 0A94 | 36FF | 0A92 | EA9A | 6D1B | 8312 |
| 0000012260 | 04C4 | 681E | 097A | 681E | 097C | 3E9A | 881D | 8312 |
| 0000012300 | 08C4 | 92A3 | 890A | 9416 | E90A | FFB7 | 681E | 097F |
| 0000012320 | 468D | 169A | 9A50 | 3A1E | 12C0 | C483 | 3D08 | 0000 |
| 0000012340 | 0374 | 7EE9 | C400 | D81E | 2613 | 47C7 | 090C | 8D00 |
| 0000012360 | 7A86 | 16FF | 8D50 | 7686 | 16FF | 8D50 | 7486 | 16FF |
| 0000012400 | 1E50 | 8C68 | FF09 | 9436 | FF0A | 9236 | 9A0A | 1D56 |
| 0000012420 | 12EF | C483 | 8914 | 8846 | 1EC4 | 13D8 | C726 | 1047 |
| 0000012440 | 000A | 1EC4 | 13D8 | FF26 | 1077 | 868D | FF74 | 5016 |
| 0000012460 | D8A1 | 8B13 | DA16 | 0513 | 0012 | 5052 | C09A | 1F3C |
| 0000012500 | 8313 | 0AC4 | 0E8B | 13D8 | 1E8B | 13DA | C183 | 3B12 |
| 0000012520 | 74C1 | E903 | 000A | D33B | 0374 | 03E9 | E900 | 0000 |
| 0000012540 | B0E9 | 1E03 | A768 | 8D09 | 9A46 | 5016 | 1E9A | 573A |
| 0000012560 | 8313 | 08C4 | 003D | 7400 | E903 | 007E | 1EC4 | 13D8 |
| 0000012600 | C726 | 0C47 | 000A | 868D | FF7A | 5016 | 868D | FF76 |
| 0000012620 | 5016 | 868D | FF74 | 5016 | 681E | 09B6 | 36FF | 0A94 |
| 0000012640 | 36FF | 0A92 | 569A | 861D | 8313 | 14C4 | 4689 | C488 |
| 0000012660 | D81E | 2613 | 47C7 | 0A1D | C400 | D81E | 2613 | 77FF |
| 0000012700 | 8D10 | 7486 | 16FF | A15D | 13D8 | 168B | 13DA | 1205 |
| 0000012720 | 5200 | 9A50 | 3CC0 | 13B6 | C483 | 8B0A | D80E | 8B13 |
| 0000012740 | DA1E | 8313 | 12C1 | C13B | 0374 | 0AE9 | 3B00 | 74D3 |
| 0000012760 | E903 | 0003 | 00E9 | E900 | 0319 | 681E | 09D1 | 468D |
| 0000013000 | 169A | 9A50 | 3A1E | 13EC | C483 | 3D08 | 0000 | 0374 |
| 0000013020 | 7CE9 | C400 | D81E | 2613 | 47C7 | 0B0C | 8D00 | 8446 |

THU MAR 14 17:22:42 1991 CRV_IF.DLL PAGE 7, LINE 355

| | | | | | | | | |
|---|---|---|---|---|---|---|---|---|
| 0000013040 | 5016 | 468D | 1680 | 8D50 | 7E86 | 16FF | 1E50 | E268 |
| 0000013060 | FF09 | 9436 | FF0A | 9236 | 9A0A | 1D56 | 141B | C483 |
| 0000013100 | 8914 | 8846 | 1EC4 | 13D8 | C726 | 1047 | 000A | 1EC4 |
| 0000013120 | 13D8 | FF26 | 1077 | 868D | FF7E | 5016 | D8A1 | 8B13 |
| 0000013140 | DA16 | 0513 | 0012 | 5052 | C09A | 4B3C | 8314 | 0AC4 |
| 0000013160 | 0E8B | 13D8 | 1E8B | 13DA | C183 | 3B12 | 74C1 | E903 |
| 0000013200 | 000A | D33B | 0374 | 03E9 | E900 | 0000 | 84E9 | 1E02 |
| 0000013220 | FD68 | 8D09 | 9A46 | 5016 | 1E9A | 7B3A | 8314 | 08C4 |
| 0000013240 | 003D | 7400 | E903 | 0072 | 1EC4 | 13D8 | C726 | 0C47 |
| 0000013260 | 000C | 468D | 16F0 | 8D50 | EE46 | 5016 | 681E | 0A0D |
| 0000013300 | 36FF | 0A94 | 36FF | 0A92 | 569A | A61D | 8314 | 10C4 |
| 0000013320 | 1EC4 | 13D8 | C726 | 1047 | 0010 | 1EC4 | 13D8 | FF26 |
| 0000013340 | 1077 | 468D | 16EA | A150 | 13D8 | 168B | 13DA | 1205 |
| 0000013360 | 5200 | 9A50 | 3CC0 | 14D6 | C483 | 8B0A | D80E | 8B13 |
| 0000013400 | DA1E | 8313 | 12C1 | C13B | 0374 | 0AE9 | 3B00 | 74D3 |
| 0000013420 | E903 | 0003 | 00E9 | E900 | 01F9 | 681E | 0A13 | 468D |
| 0000013440 | 169A | 9A50 | 3A1E | 1501 | C483 | 3D08 | 0000 | 0374 |
| 0000013460 | 6DE9 | C400 | D81E | 2613 | 47C7 | 0D0C | 8D00 | FA46 |
| 0000013500 | 5016 | 681E | 0A29 | 36FF | 0A94 | 36FF | 0A92 | 569A |
| 0000013520 | 2C1D | 8315 | 0CC4 | 1EC4 | 13D8 | C726 | 1047 | 0004 |
| 0000013540 | 1EC4 | 13D8 | FF26 | 1077 | 468D | 16FA | A150 | 13D8 |
| 0000013560 | 168B | 13DA | 1205 | 5200 | 9A50 | 3CC0 | 155C | C483 |
| 0000013600 | 8B0A | D80E | 8B13 | DA1E | 8313 | 12C1 | C13B | 0374 |
| 0000013620 | 0AE9 | 3B00 | 74D3 | E903 | 0003 | 00E9 | E900 | 0173 |
| 0000013640 | 681E | 0A2D | 468D | 169A | 9A50 | 3A1E | 158C | C483 |
| 0000013660 | 3D08 | 0000 | 0374 | 72E9 | C400 | D81E | 2613 | 47C7 |
| 0000013700 | 190C | 8D00 | 9846 | 5016 | 468D | 1694 | 1E50 | 3B68 |
| 0000013720 | FF0A | 9436 | FF0A | 9236 | 9A0A | 1D56 | 15B7 | C483 |
| 0000013740 | C410 | D81E | 2613 | 47C7 | 0610 | C400 | D81E | 2613 |
| 0000013760 | 77FF | 8D10 | 9446 | 5016 | D8A1 | 8B13 | DA16 | 0513 |
| 0000014000 | 0012 | 5052 | C09A | F03C | 8311 | 0AC4 | 0E8B | 13D8 |
| 0000014020 | 1E8B | 13DA | C183 | 3B12 | 74C1 | E903 | 000A | D33B |
| 0000014040 | 0374 | 03E9 | E900 | 0000 | E8E9 | 1E00 | 4268 | 8D0A |
| 0000014060 | 9A46 | 5016 | 1E9A | 123A | 8316 | 08C4 | 003D | 7400 |
| 0000014100 | E903 | 007A | 468D | 1690 | 8D50 | 8C46 | 5016 | 468D |
| 0000014120 | 168A | 1E50 | 5268 | FF0A | 9436 | FF0A | 9236 | 9A0A |
| 0000014140 | 1D56 | 164A | C483 | 8914 | 8846 | 1EC4 | 13D8 | C726 |
| 0000014160 | 0C47 | 0021 | 1EC4 | 13D8 | C726 | 1047 | 000A | 1EC4 |
| 0000014200 | 13D8 | FF26 | 1077 | 468D | 168A | A150 | 13D8 | 168B |
| 0000014220 | 13DA | 1205 | 5200 | 9A50 | 3CC0 | 167A | C483 | 8B0A |
| 0000014240 | D80E | 8B13 | DA1E | 8313 | 12C1 | C13B | 0374 | 0AE9 |
| 0000014260 | 3B00 | 74D3 | E903 | 0003 | 00E9 | E900 | 0055 | 681E |
| 0000014300 | 0A6D | 468D | 169A | 9A50 | 3A1E | 16AC | C483 | 3D08 |
| 0000014320 | 0000 | 0374 | 0DE9 | C400 | D81E | 2613 | 47C7 | 270C |
| 0000014340 | E900 | 002F | 7E80 | 219A | 0374 | 1AE9 | 1E00 | 7968 |
| 0000014360 | FF0A | 9436 | FF0A | 9236 | 9A0A | 1D56 | 16BE | C483 |
| 0000014400 | E908 | FB7F | 0CE9 | 1E00 | 8068 | 9A0A | 1D98 | 1247 |
| 0000014420 | C483 | A104 | 13D8 | 168B | 13DA | 5EC4 | 2606 | 0789 |
| 0000014440 | 8926 | 0257 | 00B8 | E900 | 0000 | 5E1F | 835F | 02ED |
| 0000014460 | E58B | 5D1F | CA4D | 0004 | 0000 | 0000 | 0000 | 0000 |
| 0000014500 | 0000 | 0000 | 0000 | 0000 | 8B55 | 1EEC | 9A68 | 1E0A |
| 0000014520 | 9E68 | 9A0A | FFFF | 0000 | 068E | 0A9A | A126 | 0015 |
| 0000014540 | DAA3 | BB0A | 0AA4 | 1F8C | E5BE | 8313 | FEE6 | 1E56 |
| 0000014560 | FF9A | 00FF | 0B00 | 74C0 | 3304 | EBC0 | 893A | 0477 |
| 0000014600 | 894E | A236 | 830A | 03EE | 04C7 | 0001 | 7789 | 8906 |
| 0000014620 | 0877 | C683 | C702 | FE04 | 89FF | 0A77 | 681E | 0A98 |
| 0000014640 | 681E | 0A96 | FF9A | 00FF | E800 | 0020 | BC9A | E719 |
| 0000014660 | E815 | 0066 | 01B8 | 5D00 | 50CB | 7A9A | 5F19 | 9A17 |
| 0000014700 | 1AF4 | 176D | FF68 | 9A00 | 1883 | 1772 | BB1E | 000D |

THU MAR 14 17:22:42 1991 CRV_IF.DLL PAGE 8, LINE 414

| | | | | | | | | |
|---|---|---|---|---|---|---|---|---|
| 0000014720 | FF33 | 068E | 0A98 | FFB9 | 267F | 3D80 | 7500 | 4701 |
| 0000014740 | 8026 | 003D | 3174 | B8BE | 8B0A | 8BD1 | F3CB | 8BA6 |
| 0000014760 | 74CA | 3308 | F2C0 | 74AE | EBE7 | 061C | 071E | F78B |
| 0000015000 | BF1F | 0ADF | 2CAC | 7241 | C00E | 04E0 | AC92 | 412C |
| 0000015020 | 0572 | C20A | EBAA | 1FED | 00C3 | 02BB | 5200 | D48B |
| 0000015040 | A780 | 0ADF | 50B7 | C48B | 1653 | 1650 | 9A52 | FFFF |
| 0000015060 | 0000 | C00B | 7558 | B110 | 3C40 | 7401 | 3C06 | 7502 |
| 0000015100 | B106 | 0808 | DF8F | 4B0A | D679 | E85A | 0026 | 7CBE |
| 0000015120 | BF12 | 127C | 5FE8 | BE01 | 127C | 7CBF | E812 | 0156 |
| 0000015140 | 7CB8 | 3D12 | 1280 | 0B74 | 016A | 680E | 1855 | FF9A |
| 0000015160 | 00FF | C300 | 0E8B | 1272 | 2AE3 | 06C4 | 1274 | C28C |
| 0000015200 | DB33 | 1EFF | 1270 | 0373 | 61E9 | 8E01 | 9E06 | 260A |
| 0000015220 | 1E8B | 0006 | 754B | C40D | 7806 | 8C12 | BBC2 | 0003 |
| 0000015240 | 1EFF | 1270 | B8C3 | 11D5 | D88E | EFA1 | 0B0C | 75C0 |
| 0000015260 | 0E10 | 6AA1 | 0B12 | 75C0 | E805 | 001F | 03EB | 24E8 |
| 0000015300 | 6A00 | 6A03 | 6A00 | 9A00 | 181F | 0000 | 8B55 | 33EC |
| 0000015320 | EBC9 | 551A | EC8B | 01B9 | EB00 | 5512 | EC8B | 5756 |
| 0000015340 | 00B9 | EB01 | 5508 | EC8B | 5756 | 01B9 | E801 | 004B |
| 0000015360 | 0A51 | 75C9 | BE12 | 13DC | DCBF | E813 | 00B8 | 7CBE |
| 0000015400 | BF12 | 1280 | AFE8 | BE00 | 1280 | 80BF | E812 | 00A6 |
| 0000015420 | 80BE | BF12 | 1280 | 9DE8 | E800 | 008C | 0A58 | 75E4 |
| 0000015440 | C713 | EF06 | 010C | B800 | 0001 | 8A50 | 0646 | 9A50 |
| 0000015460 | FFFF | 0000 | 4EE8 | 5F00 | 5D5E | 55CB | EC8B | 0D6A |
| 0000015500 | BBE8 | 8322 | 02C4 | 068E | 0A9E | 8B26 | 061E | 4B00 |
| 0000015520 | 168B | 0CF1 | FA83 | 75FF | 8904 | F11E | 390C | F11E |
| 0000015540 | 9F0C | 0D6A | C1E8 | 8322 | 02C4 | 749E | 6A0A | E80E |
| 0000015560 | 226C | C483 | EB02 | 3BC7 | 74D3 | 6A08 | E80E | 227E |
| 0000015600 | C483 | 5D02 | 55C3 | EC8B | 0D6A | 71E8 | 8322 | 02C4 |
| 0000015620 | 06C7 | 0CF1 | FFFF | 0D6A | 8DE8 | 8322 | 02C4 | 0E6A |
| 0000015640 | 85E8 | 8322 | 02C4 | C35D | 0E8B | 1272 | 07E3 | 02BB |
| 0000015660 | FF00 | 701E | C312 | F73B | 0E73 | EF83 | 8B04 | 0B05 |
| 0000015700 | 0245 | F274 | 1DFF | EEEB | 00C3 | 8B55 | B8EC | 00FC |
| 0000015720 | 0E50 | 6FE8 | 8301 | F63E | 000C | 0474 | 1EFF | 0CF4 |
| 0000015740 | FFB8 | 500D | E80E | 015C | E58B | CB5D | 02B8 | E900 |
| 0000015760 | FDC7 | 5A59 | DC8B | D82B | 0B72 | FB81 | 0200 | 0572 |
| 0000016000 | E38B | 5152 | 52CB | 3351 | E9C0 | FDAD | 14C8 | 0000 |
| 0000016020 | 5657 | FF2B | F78B | 3639 | 0A98 | 0375 | F0E9 | A100 |
| 0000016040 | 0A98 | C92B | 4E89 | 89F4 | F646 | 4E89 | 89F8 | FA46 |
| 0000016060 | 0C6A | 76FF | FFFA | F876 | 681E | 0AB8 | 609A | 303A |
| 0000016100 | 831A | 0AC4 | C00B | 1A74 | 8146 | FFFE | 767F | E903 |
| 0000016120 | 00BD | 5EC4 | FFF8 | F846 | 8026 | 003F | EA75 | EB47 |
| 0000016140 | 900D | 5EC4 | FFF8 | F846 | 8026 | 003F | F475 | 5E8B |
| 0000016160 | 26F8 | 3F80 | 7500 | 8DB9 | 0145 | 6A50 | 9A04 | 3C92 |
| 0000016200 | 1A3F | C483 | 8904 | F046 | 5689 | 56F2 | E49A | 7536 |
| 0000016220 | 831A | 02C4 | 4689 | 89FC | FE56 | 468B | 0BF2 | F046 |
| 0000016240 | 6D74 | C28B | 460B | 74FC | 8B66 | F046 | 568B | A3F2 |
| 0000016260 | 0CE5 | 1689 | 0CE7 | 0C6A | 76FF | FFF6 | F476 | 681E |
| 0000016300 | 0AB8 | 609A | 7A3A | 8317 | 0AC4 | C00B | 2C74 | 468B |
| 0000016320 | 8BFC | FE56 | 5EC4 | 83F0 | F046 | 2604 | 0789 | 8926 |
| 0000016340 | 0257 | 5EC4 | FFF4 | F446 | 8A26 | C407 | FC5E | 46FF |
| 0000016360 | 26FC | 0788 | C00A | 0E74 | E8EB | 5EC4 | FFF4 | F446 |
| 0000016400 | 8026 | 003F | F475 | 5EC4 | 26F4 | 3F80 | 7500 | 5EA7 |
| 0000016420 | C95F | 90CB | 8B55 | 56EC | B857 | 1856 | D88E | C08E |
| 0000016440 | 568B | BE06 | 1292 | 3BAD | 74C2 | 4010 | 7496 | 970C |
| 0000016460 | C033 | FFB9 | F2FF | 8BAE | EBF7 | 96EB | 5E5F | E58B |
| 0000016500 | CA5D | 0002 | 8B55 | 57EC | 76FF | 0E06 | C5E8 | 0BFF |
| 0000016520 | 74C0 | 921F | FA8B | C033 | FFB9 | F2FF | F7AE | 49D1 |
| 0000016540 | 8B50 | BBC4 | 0002 | 1E53 | 5152 | 5016 | FF9A | 00FF |
| 0000016560 | 5B00 | 8B5F | 5DE5 | 02CA | 0000 | 1601 | 0202 | 0203 |

THU MAR 14 17:22:42 1991 CRV_IF.DLL PAGE 9, LINE 473

| | | | | | | | | |
|---|---|---|---|---|---|---|---|---|
| 0000016600 | 1804 | 0D05 | 0906 | 0C07 | 0C08 | 0C09 | 070A | 080B |
| 0000016620 | 160C | 160D | 020F | 0D10 | 1211 | 0212 | 0235 | 0D41 |
| 0000016640 | 0243 | 0D52 | 0D53 | 0D57 | 0B59 | 0D6C | 206D | 1C70 |
| 0000016660 | 0972 | 1606 | 0A8D | 0A81 | 0982 | 0D84 | 0BA4 | 02CE |
| 0000016700 | 0BD7 | 0D00 | 1608 | 8B52 | E8D8 | 209C | 8E93 | 5AC2 |
| 0000016720 | 8926 | 0247 | 8926 | B817 | FFFF | 8B99 | 5DE5 | E8CB |
| 0000016740 | 0008 | FFBE | 99FF | E58B | CB5D | D88B | 79E8 | 9320 |
| 0000016760 | C28E | 8926 | 0247 | BB53 | 1B2A | 24B9 | 0A00 | 75E4 |
| 0000017000 | 2E1B | 073A | 1674 | 4343 | F7E2 | 133C | 0472 | 243C |
| 0000017020 | 0A76 | 3C43 | 72BC | 3C04 | 76CA | 4301 | 8A2E | 0147 |
| 0000017040 | 5B98 | 8926 | C307 | 8B55 | BBEC | 0002 | 05EB | 8B55 |
| 0000017060 | 33EC | E8DB | 2032 | C303 | CB5D | 04C8 | 0000 | 46C7 |
| 0000017100 | FFFC | C4FF | 065E | F626 | 0A47 | 7440 | 2607 | 47C6 |
| 0000017120 | 000A | 2CEB | C38B | 022D | B90D | 000C | F799 | 89F9 |
| 0000017140 | FE46 | E850 | 1F48 | C483 | FF02 | 0876 | 76FF | 9A06 |
| 0000017160 | 1C36 | 1C50 | C483 | 8904 | FC46 | 76FF | E8FE | 1F3A |
| 0000017200 | 468B | C9FC | 90CB | 10C8 | 0000 | 5657 | FFBF | 8BFF |
| 0000017220 | 0676 | 44F6 | 830A | 0375 | 97E9 | 1E00 | 9A56 | 21E4 |
| 0000017240 | 1C75 | C483 | 8B04 | 8BF8 | 81DE | 02EB | 8B0D | E687 |
| 0000017260 | 890E | FA46 | 561E | FFE8 | 8302 | 04C4 | 448A | 2A0B |
| 0000017300 | 50E4 | 129A | 9031 | 831C | 02C4 | C00B | 617C | 7E83 |
| 0000017320 | 00FA | 5E74 | 681E | 0CFC | 468D | 16F0 | 9A50 | 39E8 |
| 0000017340 | 1CB0 | C483 | 8D08 | F246 | 4689 | 8CFC | FE56 | 7E8D |
| 0000017360 | 5CF0 | 1474 | 681E | 0CFE | 468D | 16F0 | 9A50 | 39A2 |
| 0000017400 | 1CC9 | C483 | EB08 | 9004 | 4EFF | 6AFC | FF0A | FE76 |
| 0000017420 | 76FF | FFFC | FA76 | 9C9A | D63A | 831C | 08C4 | 468D |
| 0000017440 | 16F0 | 9A50 | 3DCA | 19EF | C483 | 0B04 | 74C0 | BF03 |
| 0000017460 | FFFF | 44C6 | 000A | C78B | 5F5E | CBC9 | 08C8 | 0000 |
| 0000017500 | F09A | 1A2F | 891D | FC46 | 5689 | 0BFE | 75D0 | 2B05 |
| 0000017520 | 99C0 | 37EB | 76FF | 50FE | 76FF | FF0E | 0C76 | 76FF |
| 0000017540 | FF0A | 0876 | 76FF | 9A06 | 1FEC | 1D52 | C483 | 890E |
| 0000017560 | F846 | 5689 | 8BFA | FC46 | 022D | B90D | 000C | F799 |
| 0000017600 | 50F9 | 35E8 | 8B1E | F846 | 568B | C9FA | 90CB | 8B55 |
| 0000017620 | 6AEC | FF40 | 0C76 | 76FF | FF0A | 0876 | 76FF | 9A06 |
| 0000017640 | 1CEC | 1C22 | CBC9 | 08C8 | 0000 | 468B | 2D06 | 0D02 |
| 0000017660 | 0CB9 | 9900 | F9F7 | 4689 | 50FA | F1E8 | 831D | 02C4 |
| 0000017700 | 468D | 160E | FF50 | 0C76 | 76FF | FF0A | 0876 | 76FF |
| 0000017720 | 9A06 | 22CC | 1CF3 | C483 | 890C | F846 | 76FF | E8FA |
| 0000017740 | 1DD8 | 468B | C9F8 | 90CB | 08C8 | 0000 | B857 | 0001 |
| 0000017760 | E850 | 1DBA | C483 | 1E02 | 0E68 | E80D | 0330 | C483 |
| 0000020000 | 8B04 | 8DF8 | 0A46 | 5016 | 76FF | FF08 | 0676 | 681E |
| 0000020020 | 0D0E | 069A | 842B | 831D | 0CC4 | 4689 | 1EF8 | 0E68 |
| 0000020040 | 570D | 81E8 | 8303 | 06C4 | 016A | 8DE8 | 831D | 02C4 |
| 0000020060 | 468B | 5FF8 | CBC9 | 8B55 | 56EC | 8B57 | 0676 | 448A |
| 0000020100 | A80A | 7483 | A85F | 7540 | A85B | 7502 | 0C48 | 8801 |
| 0000020120 | 0A44 | FE8B | EF81 | 0D02 | C781 | 0EE2 | 0CA8 | 0D75 |
| 0000020140 | 05F6 | 7501 | 1E08 | E856 | 0186 | C483 | 8B04 | 0644 |
| 0000020160 | 0489 | 75FF | FF02 | 0874 | 3350 | 8ADB | 0B5C | 0E53 |
| 0000020200 | 75E8 | 8315 | 08C4 | C00B | 1174 | FF3D | 75FF | 801A |
| 0000020220 | 0A4C | EB20 | 800A | 0A4C | EB20 | 8009 | 0A4C | C710 |
| 0000020240 | 0444 | 0000 | FFB8 | EBFF | 8A25 | DFBF | 800A | 82E7 |
| 0000020260 | FF80 | 7582 | 8A0B | 0A7C | C7F6 | 7582 | 8003 | 200D |
| 0000020300 | 8948 | 0444 | 1CC4 | C033 | 8A26 | 4307 | 1C89 | 5E5F |
| 0000020320 | CB5D | 8B55 | 56EC | 8B57 | 0876 | 448A | A80A | 7482 |
| 0000020340 | A864 | 7540 | C760 | 0444 | 0000 | 01A8 | 0B74 | 10A8 |
| 0000020360 | 5374 | 4C8B | 8906 | 240C | 0CFE | 2402 | 88EF | 0A44 |
| 0000020400 | FE8B | EF81 | 0D02 | C781 | 0EE2 | DB33 | 5C8A | A80B |
| 0000020420 | 7508 | A84B | 7504 | F618 | 0105 | 4275 | FE81 | 0D0E |
| 0000020440 | 0674 | FE81 | 0D1A | 2675 | 87F6 | 0ADF | 7440 | B91F |

THU MAR 14 17:22:42 1991 CRV_IF.DLL PAGE 10, LINE 532

| | | | | | | | | |
|---|---|---|---|---|---|---|---|---|
| 0000020460 | 0001 | 1651 | 7E8D | 5706 | 0E53 | 23E8 | 8316 | 08C4 |
| 0000020500 | 01B9 | EB00 | B846 | FFFF | 4C80 | 200A | 65EB | 1E53 |
| 0000020520 | E856 | 009C | C483 | 5B04 | 44F6 | 080A | D174 | 0C8B |
| 0000020540 | 548B | 2B06 | 42CA | 1489 | 558B | 4A02 | 5489 | E304 |
| 0000020560 | 5125 | FF51 | 0874 | 74FF | 5306 | E80E | 15E2 | C483 |
| 0000020600 | 5908 | 7CC4 | 8B06 | 0656 | 8826 | 3B15 | 75C1 | 33B6 |
| 0000020620 | 8AC0 | 0646 | 1DEB | C033 | 87F6 | 0ADF | 7420 | B9E3 |
| 0000020640 | 0002 | 5051 | 5350 | E80E | 1202 | C483 | 3308 | 8BC0 |
| 0000020660 | EBC8 | 5FCF | 5D5E | 00CB | 8B55 | 56EC | 768B | 8A04 |
| 0000020700 | 0A44 | 83A8 | 2674 | 08A8 | 2274 | 74FF | FF08 | 0674 |
| 0000020720 | EE9A | C536 | 831D | 04C4 | 6480 | F70A | C033 | 4489 |
| 0000020740 | 8906 | 0844 | 0489 | 4489 | 8902 | 0444 | 5D5E | 00C3 |
| 0000020760 | 8B55 | 56EC | 768B | B804 | 0200 | 9A50 | 36E4 | 1F83 |
| 0000021000 | 8B59 | 81DE | 02EB | 810D | E2C3 | 0B0E | 74D2 | 800B |
| 0000021020 | 0A4C | C708 | 0247 | 0200 | 0EEB | 4C80 | 040A | 47C7 |
| 0000021040 | 0102 | 8C00 | 8DDA | 0147 | 5489 | 8902 | 8904 | 0854 |
| 0000021060 | 4489 | C706 | 0444 | 0000 | 5D5E | 00C3 | 08C8 | 0000 |
| 0000021100 | 5657 | 5EC4 | 260A | 078A | 3D98 | 0077 | 4874 | 0877 |
| 0000021120 | 612C | 4C74 | 112C | 0674 | C02B | E999 | 00CC | F62B |
| 0000021140 | 46C6 | 01FC | [illegible]C7 | 01FE | FF00 | 0A46 | 5EC4 | 260A |
| 0000021160 | 3F80 | 7400 | 835B | FE7E | 7400 | 2655 | 078A | 3D98 |
| 0000021200 | 0074 | 3474 | 0877 | 2B2C | 1C74 | 372C | 3674 | 46C7 |
| 0000021220 | 00FE | EB00 | 90D4 | 01BE | C603 | FC46 | EB02 | 90C5 |
| 0000021240 | 09BE | EB01 | 90F4 | C6F7 | 0002 | E275 | CE83 | 8302 |
| 0000021260 | FEE6 | 46C6 | 80FC | B1EB | C6F7 | C000 | D075 | CE81 |
| 0000021300 | 4000 | A5EB | C6F7 | C000 | C475 | CE81 | 8000 | 99EB |
| 0000021320 | A468 | FF01 | 0E76 | FF56 | 0876 | 76FF | 9A06 | 31CA |
| 0000021340 | 1FAE | C483 | 890A | FA46 | C00B | 037D | 69E9 | FFFF |
| 0000021360 | 0006 | 8B0D | 107E | C78B | 022D | 050D | 0EE2 | 4689 |
| 0000021400 | 8AF8 | FC46 | 4588 | 8B0A | F85E | 07C6 | 2B00 | 89C0 |
| 0000021420 | 0445 | 4789 | 8904 | 0245 | 0589 | 4589 | 8908 | 0645 |
| 0000021440 | 468A | 88FA | 0B45 | C78B | DA8C | 5F5E | CBC9 | 8B55 |
| 0000021460 | 56EC | 8B57 | 0476 | C6BB | 8110 | 0EFE | 740D | BB09 |
| 0000021500 | 10CA | FE81 | 0D1A | 5875 | FE8B | EF81 | 0D02 | C781 |
| 0000021520 | 0EE2 | 44F6 | 0C0A | 4875 | 05F6 | 7501 | 8B43 | 8B07 |
| 0000021540 | 0257 | C88B | CA0B | 2174 | 4489 | 8906 | 0854 | 0489 |
| 0000021560 | 5489 | C702 | 0444 | 0200 | 45C7 | 0002 | 8002 | 0A4C |
| 0000021600 | C602 | 1105 | 01B8 | EB00 | 5319 | 00B8 | 5002 | E49A |
| 0000021620 | 9036 | 5B20 | 0B5B | 74D2 | 8907 | 8907 | 0257 | C8EB |
| 0000021640 | C033 | 5E5F | C35D | 8B55 | 56EC | 8B57 | 0676 | FE8B |
| 0000021660 | EF81 | 0D02 | C781 | 0EE2 | 05F6 | 7410 | 332D | 8ADB |
| 0000021700 | 0B5C | 87F6 | 0ADF | 7440 | 1E21 | 0E56 | 65E8 | 8300 |
| 0000021720 | 04C4 | 7E83 | 0004 | 1274 | C033 | 0588 | 4589 | 8902 |
| 0000021740 | 8904 | 0244 | 4489 | 8906 | 0844 | 5E5F | C35D | 04C8 |
| 0000021760 | 0000 | 468B | 0B08 | 0646 | 0875 | 006A | A7E8 | EB00 |
| 0000022000 | 9031 | 468B | 2D06 | 0D02 | 0CB9 | 9900 | F9F7 | 4689 |
| 0000022020 | 50FC | 99E8 | 8319 | 02C4 | 76FF | FF08 | 0676 | E49A |
| 0000022040 | 2821 | 8322 | 04C4 | 4689 | FFFE | FC76 | 8BE8 | 8B19 |
| 0000022060 | FE46 | CBC9 | 02C8 | 0000 | 5657 | FF2B | 768B | 8A06 |
| 0000022100 | 0A44 | C88B | 0324 | 023C | 3F75 | C1F6 | 7508 | 8B0D |
| 0000022120 | 81DE | 02EB | F60D | E287 | 010E | 2D74 | 048B | 442B |
| 0000022140 | 8906 | FE46 | C00B | 217E | FF50 | 0874 | 74FF | 8A06 |
| 0000022160 | 0B4C | ED2A | 9A51 | 3510 | 22A5 | C483 | 3908 | FE46 |
| 0000022200 | 0774 | 4C80 | 200A | FFBF | 8BFF | 0644 | 548B | 8908 |
| 0000022220 | 8904 | 0254 | 44C7 | 0004 | 8B00 | 5EC7 | C95F | 90CB |
| 0000022240 | 016A | 01E8 | CB00 | 04C8 | 0000 | 5657 | 02BE | 2B0D |
| 0000022260 | 89FF | FE7E | 026A | 45E8 | 8319 | 02C4 | 11EB | 46C7 |
| 0000022300 | FFFE | FFFF | FC76 | F1E8 | 8318 | 02C4 | C683 | 390C |
| 0000022320 | C236 | 7210 | 8B2B | 2DC6 | 0D02 | 0CB9 | 9900 | F9F7 |

THU MAR 14 17:22:42 1991 CRV_IF.DLL PAGE 11, LINE 591

| | | | | | | | | |
|---|---|---|---|---|---|---|---|---|
| 0000022340 | 4689 | 50FC | C7E8 | 8318 | 02C4 | 44F6 | 830A | D374 |
| 0000022360 | 561E | E49A | 4121 | 8321 | 04C4 | 7440 | 47C1 | C3EB |
| 0000022400 | 026A | 23E8 | 8319 | 02C4 | 7E83 | 0104 | 0475 | C78B |
| 0000022420 | 03EB | 468B | 5EFE | C95F | 02C2 | 9000 | 8B55 | B8EC |
| 0000022440 | 01B4 | A29A | 8619 | 5724 | C656 | B846 | 2B00 | 89C0 |
| 0000022460 | E846 | 4689 | C4C6 | 0A5E | 8026 | 003F | 0375 | 5FE9 |
| 0000022500 | 2607 | 1F8A | FF2A | 87F6 | 1169 | 7408 | FF2D | E84E |
| 0000022520 | 468D | 16E8 | FF50 | 0876 | 76FF | E806 | 07C6 | FF50 |
| 0000022540 | 0876 | 76FF | E806 | 07A0 | 46FF | C40A | 0A5E | 8A26 |
| 0000022560 | 2A1F | F6FF | 6987 | 0811 | EE75 | 5E8B | 260A | 3F80 |
| 0000022600 | 7425 | E903 | 06F2 | 46C6 | 00C0 | C02A | 4688 | 88FC |
| 0000022620 | B646 | 4688 | 88F2 | F646 | 4688 | 88EE | 5286 | 2BFE |
| 0000022640 | 89C0 | EA46 | 4689 | 89BA | FE46 | 4689 | 89C4 | C246 |
| 0000022660 | 68EB | 9090 | 46FF | C40A | 0A5E | 8A26 | 2A07 | 8BE4 |
| 0000022700 | F6F8 | 6985 | 0411 | 1A74 | 46FF | 8BBA | FE46 | C88B |
| 0000022720 | E0C1 | 0302 | D1C1 | 03E0 | 2DC7 | 0030 | 4689 | EBFE |
| 0000022740 | 9039 | 6C3D | 7400 | 771C | 3C2D | 744C | 7F13 | 2C1F |
| 0000022760 | 742A | 2C15 | 741C | EB23 | 901D | 46FE | EBFC | 901B |
| 0000023000 | 46FE | FEF6 | F646 | 12EB | 46FE | EBEE | 900D | 4E2C |
| 0000023020 | 0874 | 1A2C | E474 | 86FE | FE52 | BE80 | FE52 | 7403 |
| 0000023040 | 8093 | EE7E | 7500 | C414 | 0E5E | 4683 | 040E | 8B26 |
| 0000023060 | 2607 | 578B | 8902 | F846 | 5689 | C6FA | 5286 | 00FE |
| 0000023100 | 5EC4 | 260A | 078A | 200C | E42A | F88B | FF83 | 746E |
| 0000023120 | 8329 | 63FF | 1674 | FF83 | 747B | 8D11 | E846 | 5016 |
| 0000023140 | 76FF | FF08 | 0676 | BBE8 | EB06 | 900D | 46FF | FFE8 |
| 0000023160 | 0876 | 76FF | E806 | 0662 | F08B | 7E83 | 00BA | 0974 |
| 0000023200 | 7E83 | 00FE | 0375 | 83E9 | 8B05 | E9C7 | 05A0 | 7E83 |
| 0000023220 | 00BA | 0675 | 46FF | FFBA | FE46 | 46C7 | D4BC | 8C10 |
| 0000023240 | BE5E | 23EB | 46C7 | CEBC | EB10 | 90F4 | 46FF | C40A |
| 0000023260 | 0A5E | 5E89 | 8CBC | BE46 | 8026 | 5E3F | 0C75 | 478D |
| 0000023300 | 8901 | BC46 | 468C | FEBE | B64E | 206A | 006A | 468D |
| 0000023320 | 16C8 | 9A50 | 3D1E | 21D1 | C483 | 83C8 | 7BFF | 0374 |
| 0000023340 | A9E9 | C400 | BC5E | 8026 | 5D3F | 0374 | 9DE9 | C600 |
| 0000023360 | C046 | FF5D | BC46 | 46C6 | 20D3 | 8FE9 | 9000 | 8A26 |
| 0000023400 | 8807 | F446 | 46FF | 3CBC | 752D | 800F | C07E | 7400 |
| 0000023420 | 8B09 | BC5E | 8026 | 5D3F | 1E75 | 5E8A | 88F4 | C05E |
| 0000023440 | 01B0 | CB8A | E180 | C007 | 03EB | FF2A | 568D | 03C8 |
| 0000023460 | D2DA | 36E0 | 0708 | 54EB | 46FF | 26BC | 078A | 4688 |
| 0000023500 | 3AF4 | C046 | 0676 | 4688 | EBF0 | 900D | 468A | 88C0 |
| 0000023520 | F046 | 468A | 88F4 | C046 | 468A | 88C0 | F446 | 1CEB |
| 0000023540 | 5E8A | B0F4 | 8A01 | 80CB | 07E1 | EBC0 | 2A03 | 8DFF |
| 0000023560 | C856 | DA03 | E0D2 | 0836 | FE07 | F446 | 468A | 98F0 |
| 0000023600 | 4E8A | 2AF4 | 3BED | 7DC1 | 88D7 | C06E | 5EC4 | 26BC |
| 0000023620 | 3F80 | 745D | E903 | FF66 | 8026 | 003F | 0375 | FFE9 |
| 0000023640 | 8304 | 7BFF | 0A75 | C38B | C28C | 4689 | 890A | 0C56 |
| 0000023660 | 468B | 8BF8 | FA56 | 8689 | FE54 | 9689 | FE56 | 7E83 |
| 0000023700 | 00BA | 0A74 | 468B | FFFE | FE4E | C00B | 4E74 | FE83 |
| 0000023720 | 74FF | 8B49 | C1DE | 03FB | 468D | 03C8 | 36D8 | 078A |
| 0000023740 | 4632 | 98B6 | 01BA | 8B00 | 8BCE | 80D9 | 07E1 | E2D3 |
| 0000023760 | C285 | 2874 | 7E80 | 00EE | 0E75 | C68B | 5EC4 | FFF8 |
| 0000024000 | F846 | 8826 | EB07 | 9005 | 86FF | FE54 | 46FF | FFE8 |
| 0000024020 | 0876 | 76FF | E806 | 04C2 | F08B | A2EB | 4EFF | 56E8 |
| 0000024040 | 76FF | FF08 | 0676 | DFE8 | 8B04 | F846 | 568B | 39FA |
| 0000024060 | 5486 | 75FE | 3909 | 5696 | 75FE | E903 | 0462 | 7E80 |
| 0000024100 | 00EE | 0374 | 29E9 | FF04 | C646 | FF83 | 7563 | E903 |
| 0000024120 | 041E | C28E | D88B | C626 | 0007 | 13E9 | 9004 | 64BF |
| 0000024140 | 8300 | 2DFE | 0675 | 46FE | EBF2 | 9006 | FE83 | 752B |
| 0000024160 | FF1F | FE4E | 0C75 | 7E83 | 00BA | 0674 | 86FE | FE52 |
| 0000024200 | 0EEB | 46FF | FFE8 | 0876 | 76FF | E806 | 044C | F08B |

THU MAR 14 17:22:42 1991 CRV_IF.DLL PAGE 12, LINE 650

| | | | | | | | | |
|---|---|---|---|---|---|---|---|---|
| 0000024220 | FE83 | 7430 | E903 | 0155 | 46FF | FFE8 | 0876 | 76FF |
| 0000024240 | E806 | 0436 | F08B | 783C | 0474 | 583C | 1475 | 46FF |
| 0000024260 | FFE8 | 0876 | 76FF | E806 | 0420 | F08B | 78BF | E900 |
| 0000024300 | 012B | 46FF | 83EA | 78FF | 0674 | 6FBF | E900 | 011D |
| 0000024320 | 4EFF | 56E8 | 76FF | FF08 | 0676 | 2BE8 | BE04 | 0030 |
| 0000024340 | 0AE9 | 9001 | 7E80 | 00FC | 0675 | 46FE | BFF6 | 0046 |
| 0000024360 | FE83 | 752D | FE05 | F246 | 08EB | FE83 | 742B | E903 |
| 0000024400 | 00EB | 4EFF | 74FE | E903 | 0095 | 7E83 | 00BA | 0375 |
| 0000024420 | 8CE9 | FE00 | 5286 | E9FE | 00D3 | FF83 | 7478 | 830D |
| 0000024440 | 70FF | 0874 | FF83 | 7446 | E903 | 0084 | 84F6 | 1169 |
| 0000024460 | 7480 | 6A15 | 8D04 | C246 | 5016 | 0A9A | 7B3E | 5627 |
| 0000024500 | 79E8 | 8B03 | EBF0 | 9036 | FF83 | 7546 | 832C | EA7E |
| 0000024520 | 7400 | 8326 | 3AFE | 1C75 | 468B | 89C2 | EC46 | C02B |
| 0000024540 | 4689 | 89C4 | C246 | 46C7 | FFEA | BFFF | 0070 | 30BE |
| 0000024560 | EB00 | 900A | 46C7 | 00EA | FE00 | 5286 | 80FE | 52BE |
| 0000024600 | 00FE | 5C75 | 46FF | 8DEA | D044 | 0199 | C246 | 5611 |
| 0000024620 | 83C4 | BA7E | 7400 | FF08 | FE4E | 0375 | 74E9 | FFFF |
| 0000024640 | E846 | 76FF | FF08 | 0676 | 2FE8 | 8B03 | EBF0 | 903E |
| 0000024660 | 84F6 | 1169 | 7404 | 83C2 | 6FFF | 1475 | FE83 | 7D38 |
| 0000024700 | 6AB8 | 8D03 | C246 | 5016 | 0A9A | 8C3E | EB27 | 90AE |
| 0000024720 | 006A | 0A6A | 468D | 16C2 | 9A50 | 3DE8 | 22D5 | 9DEB |
| 0000024740 | 4EFF | 56E8 | 76FF | FF08 | 0676 | 1BE8 | 8003 | 52BE |
| 0000024760 | 00FE | 0375 | 23E9 | 83FF | 70FF | 0F75 | 7E80 | 00F6 |
| 0000025000 | 0974 | 468B | 8BEC | C24E | 4689 | 80C4 | F27E | 7400 |
| 0000025020 | F70A | C25E | 5683 | 00C4 | 5EF7 | 83C4 | 46FF | 0575 |
| 0000025040 | 46C7 | 00EA | 8300 | EA7E | 7500 | E903 | 0272 | 7E80 |
| 0000025060 | 00EE | 0374 | 39E9 | FF02 | C646 | 7E80 | 00F6 | 1474 |
| 0000025100 | 468B | 8BC2 | C456 | 5EC4 | 26F8 | 0789 | 8926 | 0257 |
| 0000025120 | 1DE9 | 9002 | 468B | C4C2 | F85E | 8926 | E907 | 0210 |
| 0000025140 | 468B | 99E8 | 4689 | 89C2 | C456 | CEEB | 868D | FE58 |
| 0000025160 | 4689 | 8CBC | BE56 | FE83 | 752D | 8B13 | 36D8 | 07C6 |
| 0000025200 | 8D2D | 5986 | 89FE | BC46 | 568C | EBBE | 9006 | FE83 |
| 0000025220 | 752B | FF11 | FE4E | 46FF | FFE8 | 0876 | 76FF | E806 |
| 0000025240 | 0238 | F08B | 7E83 | 00BA | 0774 | 7E81 | 5DFE | 7E01 |
| 0000025260 | C72D | FE46 | 015D | 26EB | 468B | FFFE | FE4E | C00B |
| 0000025300 | 2374 | 46FF | 8BEA | C4C6 | BC5E | 46FF | 26BC | 0788 |
| 0000025320 | 46FF | FFE8 | 0876 | 76FF | E806 | 01FE | F08B | 84F6 |
| 0000025340 | 1169 | 7504 | 83D3 | 2EFE | 4375 | 468B | FFFE | FE4E |
| 0000025360 | C00B | 3974 | 5EC4 | FFBC | BC46 | C626 | 2E07 | 18EB |
| 0000025400 | 468B | FFFE | FE4E | C00B | 2374 | 46FF | 8BEA | C4C6 |
| 0000025420 | BC5E | 46FF | 26BC | 0788 | 46FF | FFE8 | 0876 | 76FF |
| 0000025440 | E806 | 01B6 | F08B | 84F6 | 1169 | 7504 | 83D3 | EA7E |
| 0000025460 | 7500 | E903 | 0081 | C68B | 653C | 0474 | 453C | 7775 |
| 0000025500 | 468B | FFFE | FE4E | C00B | 6D74 | 5EC4 | FFBC | BC46 |
| 0000025520 | C626 | 6507 | 46FF | FFE8 | 0876 | 76FF | E806 | 017A |
| 0000025540 | F08B | FE83 | 752D | C40F | BC5E | 46FF | 26BC | 07C6 |
| 0000025560 | EB2D | 9002 | 5390 | FE83 | 752B | 8B35 | FE46 | 4EFF |
| 0000025600 | 0BFE | 75C0 | FF1D | FE46 | 26EB | 468B | FFFE | FE4E |
| 0000025620 | C00B | 2374 | 46FF | 8BEA | C4C6 | BC5E | 46FF | 26BC |
| 0000025640 | 0788 | 46FF | FFE8 | 0876 | 76FF | E806 | 012C | F08B |
| 0000025660 | 84F6 | 1169 | 7504 | FFD3 | E84E | FF56 | 0876 | 76FF |
| 0000025700 | E806 | 0144 | 7E83 | 00EA | 0375 | D3E9 | 8000 | EE7E |
| 0000025720 | 7400 | E903 | 009A | 46FF | C4C6 | BC5E | C626 | 0007 |
| 0000025740 | 868D | FE58 | 5016 | 76FF | FFFA | F876 | 468A | 98F6 |
| 0000025760 | 8E50 | 8806 | 2612 | 1EFF | 1152 | C483 | EB0A | 9071 |
| 0000026000 | 5EC4 | 260A | 078A | E42A | C63B | 1274 | 4EFF | 56E8 |
| 0000026020 | 76FF | FF08 | 0676 | EFE8 | E900 | 0084 | 9090 | 4EFE |
| 0000026040 | 80B8 | EE7E | 7500 | 8349 | 0E6E | EB04 | 9043 | 632D |
| 0000026060 | 3D00 | 0018 | CA77 | E0D1 | 2E93 | A7FF | 29EE | 243E |

THU MAR 14 17:22:42 1991 CRV_IF.DLL PAGE 13, LINE 709

| | | | | | | | | |
|---|---|---|---|---|---|---|---|---|
| 0000026100 | 26A0 | 281C | 281C | 281C | 29B0 | 260E | 29B0 | 29B0 |
| 0000026120 | 29B0 | 29B0 | 2810 | 26A0 | 2694 | 29B0 | 29B0 | 2454 |
| 0000026140 | 29B0 | 26A0 | 29B0 | 29B0 | 2611 | 29B0 | 29B0 | 245C |
| 0000026160 | 46FE | FFB8 | 0A46 | 20EB | 46FF | FFE8 | 0876 | 76FF |
| 0000026200 | E806 | 0056 | F08B | 5EC4 | FF0A | 0A46 | 8A26 | 2A07 |
| 0000026220 | 3BE4 | 74F0 | E903 | FF74 | FE83 | 74FF | E903 | F895 |
| 0000026240 | FE83 | 75FF | 830C | C67E | 7500 | 8006 | B87E | 7400 |
| 0000026260 | 8B05 | C646 | 02EB | C68B | 5F5E | CBC9 | 8B55 | 8BEC |
| 0000026300 | 045E | 87F6 | 1169 | 7404 | 8B05 | EBC3 | 9008 | C38B |
| 0000026320 | DF24 | 072D | C900 | 02C2 | 9000 | 04C8 | 0000 | 5EC4 |
| 0000026340 | 2604 | 4FFF | 7804 | 2615 | 078B | 8B26 | 0257 | FF26 |
| 0000026360 | 8B07 | 8ED8 | 26C2 | 078A | E42A | 07EB | 5306 | E69A |
| 0000026400 | CD1D | C92A | 04C2 | 9000 | 8B55 | 83EC | 087E | 74FF |
| 0000026420 | FF0E | 0676 | 76FF | FF04 | 0876 | A89A | ED30 | C926 |
| 0000026440 | 06C2 | 9000 | 8B55 | 56EC | 5EC4 | 2608 | 07FF | 76FF |
| 0000026460 | FF06 | 0476 | A3E8 | 8BFF | F6F0 | 6984 | 0611 | E875 |
| 0000026500 | C95E | 08C2 | 9000 | 2B5E | 2B69 | 2B7F | 2BB3 | 2BDF |
| 0000026520 | 2BE7 | 2C10 | 2C42 | 8B55 | B8EC | 0171 | E80E | EE92 |
| 0000026540 | 5756 | C033 | 4689 | 88F8 | FB46 | 76C4 | 260A | 89AC |
| 0000026560 | 0A76 | 4688 | 0AFE | 74C0 | 8306 | F87E | 7D00 | 8B06 |
| 0000026600 | F846 | B5E9 | BB04 | 10D6 | 202C | 583C | 0577 | 24D7 |
| 0000026620 | EB0F | B002 | B100 | D203 | 02E0 | FB46 | FED7 | D2C1 |
| 0000026640 | 88E8 | FB46 | 8B98 | D1D8 | 2EE3 | A7FF | 2AF6 | 568A |
| 0000026660 | B9FE | 0001 | 36E8 | EB04 | 33B1 | 89C0 | F046 | 4689 |
| 0000026700 | 89F6 | EE46 | 46C7 | 20FC | 4800 | 4689 | EBF4 | 8A9B |
| 0000026720 | FE46 | 2D3C | 0675 | 4E80 | 04FC | 8EEB | 2B3C | 0675 |
| 0000026740 | 4E80 | 01FC | 84EB | 203C | 0775 | 4E80 | 02FC | 79E9 |
| 0000026760 | 3CFF | 7523 | 8007 | FC4E | E980 | FF6E | 4E80 | 08FC |
| 0000027000 | 67E9 | 8AFF | FE4E | F980 | 752A | E80F | 035C | C00B |
| 0000027020 | 1779 | D8F7 | 4E80 | 04FC | 0FEB | E980 | 3230 | 8BED |
| 0000027040 | F646 | 0ABB | F700 | 03E3 | 89C1 | F646 | 3BE9 | C7FF |
| 0000027060 | F446 | 0000 | 33E9 | 8AFF | FE4E | F980 | 752A | E80C |
| 0000027100 | 0328 | C00B | 1479 | FFB8 | EBFF | 800F | 30E9 | ED32 |
| 0000027120 | 468B | BBF4 | 000A | E3F7 | C103 | 4689 | E9F4 | FF0A |
| 0000027140 | 468A | 3CFE | 756C | 8006 | FC4E | EB10 | 3C22 | 7546 |
| 0000027160 | 8006 | FC4E | EB20 | 3C18 | 754E | 8006 | FD4E | EB10 |
| 0000027200 | 3C0E | 754C | 8006 | FD4E | EB04 | 8004 | FD4E | E908 |
| 0000027220 | FED8 | 468A | 3CFE | 7564 | E903 | 0194 | 693C | 0375 |
| 0000027240 | 8DE9 | 3C01 | 7575 | E903 | 018A | 583C | 0375 | 89E9 |
| 0000027260 | 3C01 | 7578 | E903 | 0188 | 6F3C | 0375 | A2E9 | 3C01 |
| 0000027300 | 7463 | 3C1A | 7473 | 3C27 | 746E | 3C51 | 7470 | 3C60 |
| 0000027320 | 7445 | 3C07 | 7447 | E903 | 00BB | B5E9 | E800 | 028A |
| 0000027340 | BE8D | FE8F | 0716 | 4FAA | 01B9 | E900 | 01F1 | 90E8 |
| 0000027360 | 0B02 | 75FF | 8C12 | 0BC0 | 75C0 | 1E0C | BF07 | 112F |
| 0000027400 | 0E8B | 1135 | D8E9 | 5701 | 4E8B | E3F4 | 3207 | F2C0 |
| 0000027420 | 75AE | 4F01 | 2B59 | 87F9 | E9CF | 01C3 | 62E8 | 8B02 |
| 0000027440 | F846 | F6AB | FC46 | 7410 | 3303 | ABC0 | 3BE9 | F6FE |
| 0000027460 | FC46 | 7530 | E805 | 0232 | 39EB | 36E8 | F602 | FD46 |
| 0000027500 | 7518 | C630 | FF46 | B907 | 0010 | 0716 | 3352 | 8DD2 |
| 0000027520 | 97BE | BEFE | 0004 | B0E8 | B902 | 0010 | BE8D | FE92 |
| 0000027540 | 3358 | BED2 | 0004 | A0E8 | C602 | 9386 | 3AFE | 09B9 |
| 0000027560 | EB00 | C618 | FF46 | B907 | 0010 | 0716 | D233 | BE8D |
| 0000027600 | FE92 | 04BE | E800 | 0281 | 04B9 | 8D00 | 8FBE | E9FE |
| 0000027620 | 014D | 46FF | 80EE | FC4E | 8A40 | FE46 | 200C | 8B98 |
| 0000027640 | 83F0 | F47E | 7F00 | 7413 | C707 | F446 | 0006 | 0AEB |
| 0000027660 | 673D | 7500 | C705 | F446 | 0001 | BE8D | FE8F | 76FF |
| 0000027700 | FFEE | F476 | 1656 | FF57 | 1076 | 76FF | F60E | FD46 |
| 0000027720 | 7404 | FF0A | 5E1E | 8311 | 0E46 | EB0A | FF08 | 4A1E |
| 0000027740 | 8311 | 0E46 | 8308 | 0EC4 | 46F6 | 80FC | 0F74 | 7E83 |

THU MAR 14 17:22:42 1991 CRV_IF.DLL PAGE 14, LINE 768

| | | | | | | | | |
|---|---|---|---|---|---|---|---|---|
| 0000027760 | 00F4 | 0975 | 5716 | 1EFF | 1156 | C483 | 8304 | 67FE |
| 0000030000 | 1075 | 46F7 | 80FC | 7500 | 1609 | FF57 | 4E1E | 8311 |
| 0000030020 | 04C4 | 0716 | 8026 | 2D3D | 0575 | 8047 | FD4E | B901 |
| 0000030040 | FFFF | 8057 | F200 | 4FAE | 2B59 | 87F9 | E9CF | 00AF |
| 0000030060 | 4E80 | 40FC | 46C6 | 0AFA | 35EB | 46C6 | 07FF | 04EB |
| 0000030100 | 46C6 | 27FF | 46F6 | 80FC | 1174 | 46C7 | 02F0 | C600 |
| 0000030120 | F246 | B230 | 0251 | FF56 | 5688 | C6F3 | FA46 | EB10 |
| 0000030140 | F60E | FC46 | 7480 | 8004 | FD4E | C602 | FA46 | F608 |
| 0000030160 | FC46 | 7410 | E805 | 00FB | 0EEB | EDE8 | F600 | FC46 |
| 0000030200 | 7440 | 9903 | 02EB | D233 | 46F6 | 40FC | 0F74 | D20B |
| 0000030220 | 0B7D | 4E80 | 01FD | D8F7 | D283 | F700 | 83DA | F47E |
| 0000030240 | 7D00 | C707 | F446 | 0001 | 04EB | 6680 | F7FC | D88B |
| 0000030260 | DA0B | 0575 | 46C7 | 00F0 | 8D00 | EB7E | 0716 | 4E8A |
| 0000030300 | 32FA | 8BED | F476 | 40E8 | F601 | FD46 | 7402 | E30E |
| 0000030320 | 2606 | 3D80 | 7430 | 4F06 | C626 | 3005 | EB41 | F600 |
| 0000030340 | FC46 | 7440 | F631 | FD46 | 7401 | C60B | F246 | C72D |
| 0000030360 | F046 | 0001 | 20EB | 46F6 | 01FC | 0B74 | 46C6 | 2BF2 |
| 0000030400 | 46C7 | 01F0 | EB00 | F60F | FC46 | 7402 | C609 | F246 |
| 0000030420 | C720 | F046 | 0001 | 468B | 2BF6 | 2BC1 | F046 | 027D |
| 0000030440 | C033 | 5706 | F651 | FC46 | 750C | 8B07 | B2C8 | E820 |
| 0000030460 | 00BB | 1650 | 8D07 | F27E | 4E8B | E8F0 | 0091 | F658 |
| 0000030500 | FC46 | 7408 | F60D | FC46 | 7504 | 8B07 | B2C8 | E830 |
| 0000030520 | 009B | 5F59 | 5007 | 76E8 | 5800 | 46F6 | 04FC | 0774 |
| 0000030540 | C88B | 20B2 | 86E8 | E900 | FC00 | 76C4 | 260E | 89AD |
| 0000030560 | 0E76 | C4C3 | 0E76 | AD26 | D08B | AD26 | 8992 | DE76 |
| 0000030600 | F6C3 | FC46 | 7420 | E808 | FFE9 | C28E | F88B | E8C3 |
| 0000030620 | FFD8 | F88B | C00B | 0375 | C08E | 1EC3 | C307 | 0698 |
| 0000030640 | C457 | 065E | FF26 | 044F | 1078 | 8B26 | 263F | 07FF |
| 0000030660 | 8E26 | 0247 | 33AA | 5FC0 | C307 | 5251 | 5306 | 0E50 |
| 0000030700 | 0FE8 | 83EF | 06C4 | 595A | FF3D | 75FF | EBE8 | E3E8 |
| 0000030720 | 8B1B | 01F7 | F84E | 3357 | 26FF | E8AC | FFC0 | F80B |
| 0000030740 | F7E2 | FF0B | 745F | C705 | F846 | FFFF | E3C3 | 0119 |
| 0000030760 | F84E | 3357 | 8AFF | E8C2 | FFA4 | F80B | F7E2 | FF0B |
| 0000031000 | 745F | C705 | F846 | FFFF | FDC3 | 9357 | F60B | 0A7F |
| 0000031020 | DB0B | 0675 | D20B | 0275 | 1AEB | 3392 | F7D2 | 93F1 |
| 0000031040 | F1F7 | 8792 | 04D3 | 3C30 | 7639 | 0203 | FF46 | 8BAA |
| 0000031060 | 4EC2 | D8EB | 2B59 | 47CF | C3FC | 5E5F | E58B | CB5D |
| 0000031100 | 06C8 | 0000 | BE56 | 0D02 | C02B | 4689 | 89FC | FA46 |
| 0000031120 | 026A | A9E8 | 830B | 02C4 | 0CEB | 76FF | E8FE | 0B5A |
| 0000031140 | C483 | 8302 | 0CC6 | 3639 | 10C2 | 3B72 | C68B | 022D |
| 0000031160 | B90D | 000C | F799 | 89F9 | FE46 | E850 | 0B30 | C483 |
| 0000031200 | F602 | 0A44 | 7583 | C7D3 | 0444 | 0000 | 44C6 | 000A |
| 0000031220 | C02B | 4489 | 8908 | 0644 | 4489 | 8902 | C604 | 0B44 |
| 0000031240 | 89FF | FA76 | 5E8C | 6AFC | E802 | 0B7C | C483 | 8B02 |
| 0000031260 | FA46 | 568B | 5EFC | CBC9 | 04C8 | 0000 | 8B56 | 0676 |
| 0000031300 | 468B | 2D08 | 0D02 | 0CB9 | 9900 | F9F7 | 4689 | 50FE |
| 0000031320 | DBE8 | 830A | 02C4 | 76FF | FF0A | 0876 | 9A56 | 30A8 |
| 0000031340 | 2AB1 | C483 | 8906 | FC46 | 76FF | E8FE | 0ACC | C483 |
| 0000031360 | 8B02 | FC46 | C95E | 90CB | 8B55 | 57EC | 8B56 | 0676 |
| 0000031400 | 7E8B | 8308 | FFFE | 1274 | 45F6 | 010A | 1275 | 45F6 |
| 0000031420 | 800A | 0674 | 45F6 | 020A | 0674 | FFB8 | EBFF | 903E |
| 0000031440 | 458B | 0B08 | 0645 | 0875 | 571E | C3E8 | 83EE | 04C4 |
| 0000031460 | 058B | 558B | 3902 | 0645 | 0D75 | 5539 | 750B | 8308 |
| 0000031500 | 047D | 7500 | FFD5 | FF05 | 0445 | C68B | 0DFF | 1DC4 |
| 0000031520 | 8826 | 8007 | 0A65 | 80EF | 0A4D | 2A01 | 5EE4 | C95F |
| 0000031540 | 90CB | 8B55 | 8BEC | 065E | 1E3B | 0ADD | 1272 | 09BA |
| 0000031560 | 3300 | E9C0 | EA50 | E853 | 0A58 | C483 | E902 | EA5F |
| 0000031600 | E853 | 0A42 | C483 | 5302 | FF9A | 00FF | 8500 | 75C0 |
| 0000031620 | C6E5 | DF87 | 000A | E853 | 0A38 | C483 | 8B02 | 5DE5 |

THU MAR 14 17:22:42 1991 CRV_IF.DLL PAGE 15, LINE 827

| | | | | | | | | |
|---|---|---|---|---|---|---|---|---|
| 0000031640 | 00CB | 8B55 | 83EC | 02EC | C033 | 09EB | 8B55 | 83EC |
| 0000031660 | 02EC | FFB8 | 89FF | FE46 | 5E8B | 3B06 | DD1E | 720A |
| 0000031700 | BA19 | 0009 | C033 | FDE9 | 8BE9 | FE4E | C90B | 0774 |
| 0000031720 | E853 | 09FE | C483 | E902 | EA05 | C00B | 0774 | E853 |
| 0000031740 | 09E4 | C483 | 8302 | 04EC | CC8B | FF53 | 0A76 | 76FF |
| 0000031760 | FF08 | 0C76 | 5116 | FF9A | 00FF | 5900 | 855A | 75C0 |
| 0000032000 | 80C8 | DFA7 | FD0A | 468B | 0BFE | 74C0 | 5307 | C1E8 |
| 0000032020 | 8309 | 02C4 | 8B91 | 5DE5 | 00CB | 8B55 | 83EC | 0EEC |
| 0000032040 | 7E8A | 8B0C | 0E46 | 4689 | EB0C | 5508 | EC8B | EC83 |
| 0000032060 | B70E | FF40 | 0876 | 76FF | 1606 | 568D | 52FE | 8D16 |
| 0000032100 | F856 | 3352 | 52D2 | 8B52 | 0C4E | 99E8 | 8B01 | 0A46 |
| 0000032120 | 00A9 | 7401 | 8008 | 10CA | 00A9 | 7504 | A92A | 0200 |
| 0000032140 | 2274 | CA80 | 5002 | 468D | FFFE | 0876 | 76FF | 1606 |
| 0000032160 | 3350 | 50C0 | 9A50 | FFFF | 0000 | C085 | 7558 | 8B08 |
| 0000032200 | FE4E | 03EB | CA80 | 5101 | 2552 | 00C3 | C70A | 3350 |
| 0000032220 | 50C0 | 9A50 | FFFF | 0000 | C00B | 1674 | 6E3D | 7500 |
| 0000032240 | F60E | F0C2 | 02BA | 7400 | BA03 | 0011 | 17E9 | E9E9 |
| 0000032260 | 009D | 468B | 3BFE | DD06 | 720A | 500D | 399A | 0031 |
| 0000032300 | BA00 | 0018 | C033 | E4EB | E850 | 08FA | C483 | 8B02 |
| 0000032320 | 50D0 | 8D16 | F45E | 1653 | 468D | 50F8 | DE9A | 0017 |
| 0000032340 | 0B00 | 75C0 | 8B61 | 0A46 | C933 | 00A9 | 7580 | A90E |
| 0000032360 | 4000 | 0775 | 06F6 | 1139 | 7580 | B102 | 8880 | F24E |
| 0000032400 | 468A | 3CF4 | 7501 | C607 | F446 | E940 | 008F | 023C |
| 0000032420 | 0775 | 46C6 | 08F4 | 84E9 | 3200 | 88C0 | F446 | C90A |
| 0000032440 | F474 | 46F7 | 020A | 7400 | 5274 | FFB9 | 51FF | B951 |
| 0000032460 | 0002 | 1651 | 468D | 50FA | A79A | 0031 | 0B00 | 74C0 |
| 0000032500 | 3D15 | 0083 | 0C74 | 76FF | E8FE | 0886 | C483 | E902 |
| 0000032520 | E88D | C033 | 47EB | 1652 | 468D | 50F6 | 01B8 | 5000 |
| 0000032540 | 8D16 | F846 | 9A50 | FFFF | 0000 | C00B | 1B75 | 4639 |
| 0000032560 | 74F8 | 802A | F67E | 751A | 5210 | 76FF | FFFC | FA76 |
| 0000032600 | FF9A | 00FF | 0B00 | 75C0 | 52BD | C033 | 5050 | 1650 |
| 0000032620 | 468D | 50FA | E99A | 0032 | 0B00 | 75C0 | 8AA9 | F44E |
| 0000032640 | C1F6 | 7548 | FF28 | 0876 | 76FF | 1606 | 468D | 50F8 |
| 0000032660 | C033 | 5050 | 269A | 0032 | F700 | F846 | 0001 | 0374 |
| 0000032700 | C980 | F710 | 0A46 | 0008 | 0374 | C980 | 0A20 | F24E |
| 0000032720 | C980 | 8B01 | 8BC2 | 88D8 | DF8F | 530A | F3E8 | 8307 |
| 0000032740 | 02C4 | E58B | CB5D | D8A1 | F70A | 23D0 | 33C1 | A8C9 |
| 0000032760 | 7580 | 8003 | 01C9 | 00C3 | 8B55 | 83EC | 08EC | C033 |
| 0000033000 | 5E8B | 3B06 | DD1E | 730A | 534D | B9E8 | 8307 | 02C4 |
| 0000033020 | 4E8B | E30C | F647 | DF87 | 020A | 4075 | 3357 | 8BD2 |
| 0000033040 | 0C4E | 7EC4 | F608 | DF87 | 080A | 1074 | 878A | 0BDF |
| 0000033060 | 0A3C | 0874 | 42AA | C649 | DF87 | 0A0B | 0653 | 5157 |
| 0000033100 | 468D | 16FA | 9A50 | 3316 | 0000 | 0B5F | 74C0 | 530F |
| 0000033120 | 7FE8 | 8307 | 02C4 | 09BA | E900 | E76A | 4AEB | 468B |
| 0000033140 | 03FA | F6C2 | DF87 | 800A | 3E74 | A780 | 0ADF | 56FB |
| 0000033160 | 1E57 | C507 | 0876 | FE8B | C88B | 28E3 | 0D84 | 3C80 |
| 0000033200 | 750A | 2606 | 8F80 | 0ADF | AC04 | C43A | 2574 | 1A3C |
| 0000033220 | 0875 | 8026 | DF8F | 020A | 05EB | 0588 | E247 | 8BEA |
| 0000033240 | 2BC7 | 0846 | 1F06 | 5E5F | E853 | 0726 | C483 | 8B02 |
| 0000033260 | 5DE5 | 83CB | 01F9 | 0774 | 3C80 | 740A | EBE0 | 26DB |
| 0000033300 | 87F6 | 0ADF | 7440 | 0B2B | 75DB | 5323 | 468D | 16F9 |
| 0000033320 | 5150 | 468D | 16FA | 9A50 | 33F6 | 0000 | C085 | 0E74 |
| 0000033340 | 1F06 | 5E5F | E853 | 06EA | C483 | E902 | E6F1 | 0AB0 |
| 0000033360 | A8EB | 46C6 | 00F9 | 8D53 | F946 | 5016 | 8D51 | FA46 |
| 0000033400 | 5016 | 889A | 0034 | 0B00 | 75C0 | F7D5 | FA46 | FFFF |
| 0000033420 | 3674 | 7E83 | 010C | 3574 | F626 | DF87 | 080A | 1C75 |
| 0000033440 | B853 | FFFF | 5050 | D8F7 | 8D50 | FC46 | 5016 | 459A |
| 0000033460 | 0033 | 8000 | F97E | 750A | E90F | FF61 | 468A | 26F9 |
| 0000033500 | 8788 | 0BDF | 0A3C | 0274 | 0DB0 | 4DE9 | 80FF | F97E |

THU MAR 14 17:22:42 1991 CRV_IF.DLL PAGE 16, LINE 886

| | | | | | | | | |
|---|---|---|---|---|---|---|---|---|
| 0000033520 | 750A | EBC5 | 0099 | 8B55 | 83EC | 0EEC | C033 | 09EB |
| 0000033540 | 8B55 | 83EC | 0EEC | FFB8 | 89FF | F246 | 5E8B | 3B06 |
| 0000033560 | DD1E | 720A | BA08 | 0009 | C033 | 49E9 | 0BE6 | 74C0 |
| 0000033600 | 5307 | 41E8 | 8306 | 02C4 | 87F6 | 0ADF | 7420 | 5312 |
| 0000033620 | C933 | 5151 | 4141 | 8D51 | F446 | 5016 | DF9A | 0034 |
| 0000033640 | F600 | DF87 | 800A | 6674 | 5E8C | 8EFA | 0A46 | 56C5 |
| 0000033660 | 3308 | 89C0 | FE46 | 4689 | FCFC | 5657 | FA8B | F28B |
| 0000033700 | 6689 | 8BF8 | 0C4E | 28E3 | 0AB0 | AEF2 | 3B75 | EC83 |
| 0000033720 | 8B02 | BADC | 0080 | E22B | D48B | FA8B | 0716 | 4E8B |
| 0000033740 | AC0C | 0A3C | 0D74 | FB3B | 1A74 | E2AA | E8F4 | 0038 |
| 0000033760 | AFE9 | B000 | 3B0D | 75FB | E803 | 002C | B0AA | FFUA |
| 0000034000 | FC46 | E2EB | 21E8 | EB00 | 5EE1 | 8E5F | FA5E | C8E9 |
| 0000034020 | 8B00 | F246 | C00B | 0974 | 76FF | E806 | 05B4 | C483 |
| 0000034040 | B802 | FFFC | E80E | E3CA | 5350 | 1E51 | 1F06 | CF8B |
| 0000034060 | CA2B | 21E3 | 8B51 | 065E | 1E53 | 5152 | 468D | 16F4 |
| 0000034100 | 9A50 | 1B1D | 0000 | 0B59 | 75C0 | 8B11 | F45E | 5E01 |
| 0000034120 | 3BFE | 72D9 | 1F07 | 5B59 | 8B58 | C3FA | 831F | 08C4 |
| 0000034140 | 7E83 | 00FE | 3C75 | C00B | 1874 | 6D3D | 7400 | 3D0D |
| 0000034160 | 0001 | 09BA | 7500 | BA08 | 001C | 03EB | 20BA | F900 |
| 0000034200 | 26EB | 5E8E | F6FA | DF87 | 400A | 0E74 | 5E8E | 8B0A |
| 0000034220 | 085E | 3F80 | 751A | F803 | 0EEB | 1CBA | 3300 | F9C0 |
| 0000034240 | 06EB | 468B | 2BFE | FC46 | 668B | 5EF8 | 8E5F | FA5E |
| 0000034260 | 1472 | 5E8B | 0BF2 | 74DB | FF09 | 0676 | 13E8 | 8305 |
| 0000034300 | 02C4 | E58B | CB5D | 5E8B | 0BF2 | 74DB | FF09 | 0676 |
| 0000034320 | FFE8 | 8304 | 02C4 | EDE9 | 8BE4 | 0C4E | C90B | 0475 |
| 0000034340 | C18B | CEEB | C51E | 0856 | 1E53 | 5152 | 468D | 16F4 |
| 0000034360 | 9A50 | 35F2 | 0000 | 071E | 0B1F | 74C0 | 3D17 | 006D |
| 0000034400 | 0D74 | 013D | BA00 | 0009 | BC75 | 1CBA | EB00 | BAB7 |
| 0000034420 | 0020 | B2EB | 468B | 0BF4 | 75C0 | F697 | DF87 | 400A |
| 0000034440 | 0A74 | DA8B | 8026 | 1A3F | 0275 | 86EB | 1CBA | 3300 |
| 0000034460 | EBC0 | 0093 | 0BEA | 9037 | EA30 | 372A | 36E7 | F8EA |
| 0000034500 | EC36 | EA36 | 36F8 | 36F1 | 8B55 | 56EC | 76C4 | 8C06 |
| 0000034520 | E3C1 | 2605 | 4C80 | 01FE | 5D5E | 55CB | EC8B | 096A |
| 0000034540 | 9BE8 | 8304 | 02C4 | 76FF | 0E06 | 0DE8 | 5B00 | 096A |
| 0000034560 | B5E8 | 8304 | 02C4 | E58B | CB5D | 8B55 | 56EC | 8B57 |
| 0000034600 | 064E | F983 | 77E8 | 1E69 | 3CA1 | 0B11 | 74C0 | BF48 |
| 0000034620 | 3812 | 368B | 1144 | 1EC5 | 113E | 561E | FF57 | 5FD7 |
| 0000034640 | 735E | 8C2B | C5DA | 0C5F | D63B | EF75 | 1F58 | C41E |
| 0000034660 | 3E36 | 2611 | 748B | C512 | 3A1E | 8C11 | 3BDA | 75D0 |
| 0000034700 | 1FD9 | 811E | 8EFF | 7438 | BF0E | 388E | C4EB | 815E |
| 0000034720 | 12FF | 7438 | EB0F | 070A | BF06 | 113A | E1E8 | 7201 |
| 0000034740 | E80E | 007E | 891F | 4016 | 8911 | 3E1E | EB11 | 1F04 |
| 0000034760 | C033 | 5F99 | 5D5E | 00CB | 5706 | F88B | FB03 | 7F89 |
| 0000035000 | 4F04 | 2D4F | 0016 | 778D | C714 | FE05 | 89FF | 0A7F |
| 0000035020 | 8948 | 8C04 | 8B1F | 8CC6 | 8EDA | 8DC2 | 067F | ABFC |
| 0000035040 | 47AB | 3347 | ABC0 | ABAB | 5FAB | C307 | 8B26 | 0245 |
| 0000035060 | C00B | 0975 | 8C26 | 025D | 8926 | EB1D | 0614 | C426 |
| 0000035100 | 0875 | 8C26 | 0E5C | 8926 | 0C5C | 478C | 8912 | 1077 |
| 0000035120 | 2607 | 5D8C | 260A | 5D89 | 2608 | 5D8C | 2606 | 5D89 |
| 0000035140 | C304 | 8041 | FEE1 | FC53 | 778B | 8B08 | 0A5F | FF33 |
| 0000035160 | 23EB | C38B | A85B | 7501 | 5342 | 778B | 8B06 | 085F |
| 0000035200 | DE3B | 3674 | 334B | EBFF | 900C | 548D | 3BFE | 73D3 |
| 0000035220 | 03E1 | 72F0 | AD23 | 01A8 | F074 | FE8B | 3B48 | 73C1 |
| 0000035240 | 0323 | 72F0 | 8B13 | ADD0 | 01A8 | DE74 | C203 | 0205 |
| 0000035260 | 8B00 | 89F7 | FE44 | E4EB | C08B | 8B5B | 0647 | 4789 |
| 0000035300 | F908 | 19EB | 895B | FE4C | 0974 | F903 | C12B | 8948 |
| 0000035320 | 2B05 | 03F9 | 89F9 | 087F | C68B | DA8C | C3F8 | 5751 |
| 0000035340 | 47F6 | 0102 | 6674 | B7E8 | 8B00 | 8BFE | A804 | 7401 |
| 0000035360 | 2B03 | 49C8 | 4141 | 778B | 0B04 | 74F6 | 034F | 73CE |

THU MAR 14 17:22:42 1991 CRV_IF.DLL PAGE 17, LINE 945

| | | | | | | | | |
|---|---|---|---|---|---|---|---|---|
| 0000035400 | 3309 | BAC0 | FFF0 | 33E3 | 42EB | CAB8 | 8E1A | 26C0 |
| 0000035420 | 48A1 | 3D11 | 2000 | 1674 | 00BA | 3B80 | 72D0 | D106 |
| 0000035440 | 75EA | EBF8 | 8322 | 08FA | 1D72 | E2D1 | C28B | 8B48 |
| 0000035460 | 03D0 | 73C1 | 3302 | F7C0 | 23D2 | 52C2 | 2EE8 | 5A00 |
| 0000035500 | 0D73 | FA83 | 74F0 | B805 | 0010 | E2EB | EBF9 | 8B1B |
| 0000035520 | 2BD0 | 0457 | 4789 | 8904 | 087F | 778B | 4A0A | 1489 |
| 0000035540 | 0342 | C7F2 | FE04 | 89FF | 0A77 | 595F | 8BC3 | F6D0 |
| 0000035560 | 0247 | 7404 | 4A0F | 778B | 4E04 | D63B | 0572 | 5739 |
| 0000035600 | 73FE | 4218 | 1E50 | 219A | 0017 | 0B00 | 75C0 | 8B0F |
| 0000035620 | F6C2 | 0247 | 7404 | 4A04 | 5789 | F8FE | 01EB | C3F9 |
| 0000035640 | 8B57 | 0877 | 773B | 750A | 8B03 | 0677 | 3DAD | FFFE |
| 0000035660 | 0874 | FE8B | FE24 | F003 | F2EB | 4F4F | F78B | C35F |
| 0000035700 | D18B | C283 | 8027 | F0E2 | 8B50 | 52C4 | 5016 | C033 |
| 0000035720 | 9A50 | FFFF | 0000 | 0B1F | 75C0 | 3314 | 26DB | 458B |
| 0000035740 | 890C | 0247 | C28B | 0FE8 | E8FE | FE40 | EBF8 | F901 |
| 0000035760 | 00C3 | 8B55 | 8BEC | 8BD7 | 1EDE | 7EC4 | 3306 | B9C0 |
| 0000036000 | FFFF | AEF2 | 758D | C4FF | 0A7E | FFB9 | F2FF | F7AE |
| 0000036020 | 2BD1 | 8CF9 | 8EC0 | 8ED8 | 0846 | FE87 | 468B | F706 |
| 0000036040 | 01C6 | 7400 | A402 | D149 | F3E9 | 13A5 | F3C9 | 8BA4 |
| 0000036060 | 8BF3 | 1FFA | C28C | CB5D | 8B55 | 8BEC | 8BD7 | 1EDE |
| 0000036100 | 76C5 | 8B0A | 8CFE | 8ED8 | 33C0 | B9C0 | FFFF | AEF2 |
| 0000036120 | D1F7 | 7EC4 | 8B06 | A8C7 | 7401 | A402 | D149 | F3E9 |
| 0000036140 | 13A5 | F3C9 | 8BA4 | 8BF3 | 1FFA | C28C | CB5D | 8B55 |
| 0000036160 | 8BEC | 8BD7 | 1EDE | 76C5 | C406 | 0A7E | C033 | FFD9 |
| 0000036200 | F2FF | F7AE | 2BD1 | F3F9 | 74A6 | 1B05 | 1DC0 | FFFF |
| 0000036220 | 8B1F | 8BF3 | 5DFA | 00CB | 8B55 | 8BEC | C4D7 | 067E |
| 0000036240 | C033 | FFB9 | F2FF | F7AE | 49D1 | 8B91 | 5DFA | 00CB |
| 0000036260 | 8B55 | 57EC | 1E56 | 4E8B | E30E | 8B27 | C4D9 | 067E |
| 0000036300 | F78B | C033 | AEF2 | D9F7 | CB03 | FE8B | 76C5 | F30A |
| 0000036320 | 8AA6 | FF44 | C933 | 3A26 | FF45 | 0477 | 0474 | 4949 |
| 0000036340 | D1F7 | C18B | 5E1F | 8B5F | 5DE5 | 00CB | 8B55 | 56EC |
| 0000036360 | B357 | 8B01 | 0C4E | 468B | 3306 | 83D2 | 0AF9 | 0175 |
| 0000036400 | 1E99 | 7EC5 | E908 | 02BB | 04C8 | 0000 | A156 | 0CE5 |
| 0000036420 | 168B | 0CE7 | 4689 | 89FC | FE56 | 0C6A | DFE8 | 8300 |
| 0000036440 | 02C4 | 468B | 0BFE | FC46 | 7674 | 468B | 0B08 | 0646 |
| 0000036460 | 6E74 | 76FF | FF08 | 0676 | 489A | 083A | 833B | 04C4 |
| 0000036500 | F08B | 5EC4 | 26FC | 478B | 2602 | 070B | 5274 | FF26 |
| 0000036520 | 0277 | FF26 | 9A37 | 3A48 | 3B29 | C483 | 3B04 | 7EC6 |
| 0000036540 | C439 | FC5E | C426 | 261F | 3880 | 753D | 562D | 76FF |
| 0000036560 | FF08 | 0676 | 5306 | 609A | F63A | 8336 | 0AC4 | C00B |
| 0000036600 | 1875 | 0C6A | A1E8 | 8300 | 02C4 | 5EC4 | 26FC | 078B |
| 0000036620 | 8B26 | 0257 | C603 | EB40 | 9012 | 4663 | 04FC | A2EB |
| 0000036640 | 0C6A | 83E8 | 8300 | 02C4 | C02B | 5E99 | CBC9 | 8B55 |
| 0000036660 | 50EC | 468B | 0504 | 0014 | 4BEB | 8B55 | 50EC | 468B |
| 0000036700 | 0504 | 0014 | 69EB | 8B55 | 50EC | 468B | 0504 | 0114 |
| 0000036720 | 33EB | 8B55 | 50EC | 468B | 0504 | 0114 | 51EB | 8B55 |
| 0000036740 | 50EC | 468B | C104 | 02E0 | FF68 | 50FF | FF6A | FF6A |
| 0000036760 | FF9A | 00FF | 0B00 | 75C0 | 5829 | E58B | C35D | 8B55 |
| 0000037000 | 50EC | 468B | FF04 | 6A06 | C112 | 02E0 | 9968 | 503B |
| 0000037020 | FF6A | FF6A | FF9A | 00FF | 0B00 | 75C0 | 5805 | E58B |
| 0000037040 | C35D | 11B8 | E900 | DB91 | 8B55 | 50EC | 468B | C104 |
| 0000037060 | 02E0 | BD68 | 503B | FF9A | 00FF | 0B00 | 75C0 | FFE3 |
| 0000037100 | 6A0E | 5812 | E58B | C35D | 8B55 | FFEC | 0676 | ADE8 |
| 0000037120 | 83FF | 02C4 | E58B | CB5D | 8B55 | FFEC | 0676 | C7E8 |
| 0000037140 | 83FF | 02C4 | E58B | CB5D | 068E | 0A9E | A126 | 0006 |
| 0000037160 | 3B48 | 6C06 | 7712 | C107 | 06E0 | FFBA | C3FF | 5357 |
| 0000037200 | 6A51 | E80F | FF78 | C483 | 3B02 | 6C06 | 7612 | 8B40 |
| 0000037220 | 05D8 | 0004 | FC25 | 8BFF | C1C8 | 06E0 | 2BBA | 503C |
| 0000037240 | 9A52 | 3937 | 0000 | C00B | 3275 | 8B49 | 87F9 | 6C3E |

```
THU MAR 14 17:22:42 1991  CRV_IF.DLL  PAGE 18, LINE 1004

0000037260  2B12  51CF  C147  06E7  E1C1  5705  C28E  ABF3
0000037300  595F  C726  0445  0200  C783  E240  8BF5  6AC3
0000037320  E80F  FF54  C483  5902  5F5B  9BEB  10B8  E900
0000037340  DAD7  8B55  57EC  468B  F706  0866  0573  C033
0000037360  EB99  501A  E49A  EB36  593A  D88B  DA0B  0D74
0000037400  8B50  8EF8  33C2  41C0  E9D1  ABF3  5F58  CB5D
0000037420  8B55  8BEC  0E4E  571E  E356  C548  0A76  7EC4
0000037440  8B06  48C1  D78B  D2F7  C22B  DB1B  C323  C203
0000037460  D68B  D2F7  C22B  DB1B  C323  C203  9140  C12B
0000037500  E9D1  A5F3  C913  A4F3  E391  0B18  75F6  8C07
0000037520  05D8  FFFF  D88E  FF0B  C775  C08C  0205  8E3D
0000037540  EBG0  8BBE  0646  568B  5E08  1F5F  CB5D  8B55
0000037560  8BEC  0C4E  38E3  C457  067E  D78B  DAF7  0C74
0000037600  D12B  DB1B  D323  D103  D187  D12B  468B  8A0A
0000037620  D1E0  F3E9  13AB  F3C9  87AA  E3D1  8C10  81C3
0000037640  0DC3  8E3D  D1C3  F3E9  13AB  F3C9  5FAA  468B
0000037660  8B06  0856  CB5D  4E8B  8B0E  0646  568B  1E08
0000037700  7EC5  570A  071E  93FC  C00A  1374  F983  750A
0000037720  0B0E  79D2  B00A  AA2D  DBF7  D283  F700  8BDA
0000037740  92F7  D233  C00B  0274  F1F7  F793  92F1  D387
0000037760  3004  393C  0276  2704  8BAA  0BC2  75C3  88E2
0000040000  4F05  86AC  8805  FF44  448D  3B01  72C7  8CF2
0000040020  58DA  5F1F  8B5E  5DE5  00CB  8B55  FFEC  0876
0000040040  76FF  3306  50C0  9A50  FFFF  0000  C085  0374
0000040060  ACE9  8BDD  5DE5  00CB  8B55  1EEC  C553  065E
0000040100  76FF  FF0C  0A76  77FF  FF02  0E37  2BE8  8900
0000040120  8907  0257  1F5B  CA5D  0008  8B55  1EEC  C553
0000040140  065E  078B  578B  8B02  0A4E  E80E  003E  0789
0000040160  5789  5B02  5D1F  06CA  0000  8B55  8BEC  0846
0000040200  4E8B  0B0C  8BC8  0A4E  0975  468B  F706  5DE1
0000040220  08CA  5300  E1F7  D88B  468B  F706  0C66  D803
0000040240  468B  F706  03E1  5BD3  CA5D  0008  ED32  06E3
0000040260  E0D1  D2D1  FAE2  27CB  0200  A700  013C  0000
0000040300  0200  4D00  023C  0000  0200  E300  033B  0000
0000040320  0300  E001  0118  0500  0300  2902  040E  6E00
0000040340  0300  7801  0118  0700  0300  0401  0117  0800
0000040360  0300  5501  020B  0100  0300  B301  0134  8900
0000040400  0300  A201  0136  8A00  0200  BB00  0538  0000
0000040420  0300  C501  013B  8C00  0300  E701  013B  8D00
0000040440  0300  A101  013B  8E00  0500  3A02  040E  1A00
0000040460  0300  5B01  0303  0300  0300  BE02  0408  7D00
0000040500  0300  9D01  0307  0700  0300  CA01  0308  0A00
0000040520  0300  7701  0300  0E00  0500  7102  0411  2800
0000040540  0500  5101  013D  8800  0300  8201  0139  2200
0000040560  0300  E502  0406  8B00  0300  5201  013C  2600
0000040600  0500  2602  040E  3600  0300  2E02  040A  9900
0000040620  0300  4D01  0135  3A00  0300  6D01  0132  3B00
0000040640  0300  D801  013D  3C00  0200  2302  040E  3600
0000040660  0300  3101  0133  4400  0300  4401  0132  4600
0000040700  0300  6501  0133  4B00  0300  8D01  0132  4D00
0000040720  0300  7602  040A  4000  0300  5501  0117  5B00
0000040740  0300  C402  0409  4F00  0300  A002  0411  5F00
0000040760  0000  0000  0000  0000  0000  0000  0000  0000
0000041000  0000  0000  0200  0000  0000  0000  0000  0000
0000041020  0000  0000  0000  0000  0000  0000  0000  0000
*
0000041100  0000  0000  0200  0000  0000  0000  0000  0000
0000041120  0000  0000  0000  0000  0000  0000  0000  0000
*
```

THU MAR 14 17:22:42 1991 CRV_IF.DLL PAGE 19, LINE 1063

| | | | | | | | | |
|---|---|---|---|---|---|---|---|---|
| 0000041200 | 0000 | 0000 | 0200 | 0000 | 0000 | 0000 | 0000 | 0000 |
| 0000041220 | 0000 | 0000 | 0000 | 0000 | 0000 | 0000 | 0000 | 0000 |
| * | | | | | | | | |
| 0000041300 | 0000 | 0000 | 0200 | 0000 | 0000 | 0000 | 0000 | 0000 |
| 0000041320 | 0000 | 0000 | 0000 | 0000 | 534D | 5220 | 6E75 | 542D |
| 0000041340 | 6D69 | 2065 | 694C | 7262 | 7261 | 2079 | 202D | 6F43 |
| 0000041360 | 7970 | 6972 | 6867 | 2074 | 6328 | 2029 | 3931 | 3039 |
| 0000041400 | 202C | 694D | 7263 | 736F | 666F | 2074 | 6F43 | 7072 |
| 0000041420 | 0018 | 7263 | 5F76 | 6669 | 632E | 6300 | 7672 | 695F |
| 0000041440 | 2E66 | 0070 | 4F4E | 4552 | 5053 | 4E00 | 434F | 5652 |
| 0000041460 | 0000 | 0042 | 0068 | 004B | FFFF | 5F47 | 5745 | 545F |
| 0000041500 | 4700 | 455F | 5F57 | 0054 | 5F62 | 6564 | 7562 | 0067 |
| 0000041520 | 6142 | 2064 | 6572 | 7073 | 6E6F | 6573 | 203A | 6425 |
| 0000041540 | 6200 | 645F | 6265 | 6775 | 0000 | 7263 | 5F76 | 756D |
| 0000041560 | 746C | 5F69 | 6573 | 646E | 745F | 5F6F | 7263 | 0076 |
| 0000041600 | 5F47 | 5745 | 545F | 4700 | 455F | 5F57 | 0054 | 5F62 |
| 0000041620 | 6564 | 7562 | 0067 | 6142 | 2064 | 6572 | 7073 | 6E6F |
| 0000041640 | 6573 | 203A | 6425 | 6200 | 645F | 6265 | 6775 | 0000 |
| 0000041660 | 7263 | 5F76 | 6669 | 615F | 6F62 | 7472 | 0000 | 7270 |
| 0000041700 | 6E69 | 2E74 | 0063 | 7263 | 5F76 | 6669 | 702E | 4300 |
| 0000041720 | 5F4D | 5544 | 4D4D | 5F59 | 5645 | 4E45 | 0054 | 4D43 |
| 0000041740 | 475F | 5445 | 495F | 504E | 5455 | 445F | 5645 | 4349 |
| 0000041760 | 5345 | 535F | 4154 | 5554 | 0053 | 4D43 | 535F | 5445 |
| 0000042000 | 495F | 504E | 5455 | 445F | 5645 | 4349 | 5345 | 535F |
| 0000042020 | 4154 | 5554 | 0053 | 4D43 | 475F | 5445 | 4C5F | 434F |
| 0000042040 | 5441 | 524F | 505F | 534F | 5449 | 4F49 | 004E | 4D43 |
| 0000042060 | 495F | 494E | 4954 | 4C41 | 5A49 | 5F45 | 4F4C | 4143 |
| 0000042100 | 4F54 | 0052 | 4D43 | 4F5F | 4550 | 5F4E | 4554 | 5453 |
| 0000042120 | 4300 | 5F4D | 504F | 4E45 | 445F | 4649 | 0046 | 4D43 |
| 0000042140 | 435F | 4F4C | 4553 | 545F | 5345 | 0054 | 4D43 | 435F |
| 0000042160 | 4F4C | 4553 | 445F | 4649 | 0046 | 4D43 | 4B5F | 5945 |
| 0000042200 | 505F | 4552 | 5353 | 4300 | 5F4D | 454B | 5F59 | 4552 |
| 0000042220 | 454C | 5341 | 0045 | 4D43 | 4D5F | 554F | 4553 | 425F |
| 0000042240 | 5455 | 4F54 | 534E | 4300 | 5F4D | 4F4D | 4556 | 4C5F |
| 0000042260 | 434F | 5441 | 524F | 4300 | 5F4D | 4F4D | 4556 | 4C5F |
| 0000042300 | 434F | 5441 | 524F | 545F | 4152 | 4B43 | 4300 | 5F4D |
| 0000042320 | 4E49 | 5449 | 4C5F | 434F | 5441 | 524F | 545F | 4152 |
| 0000042340 | 4B43 | 4300 | 5F4D | 4E45 | 5F44 | 4F4C | 4143 | 4F54 |
| 0000042360 | 5F52 | 5254 | 4341 | 004B | 4D43 | 555F | 4450 | 5441 |
| 0000042400 | 5F45 | 4349 | 4E4F | 545F | 4241 | 454C | 4300 | 5F4D |
| 0000042420 | 5055 | 4144 | 4554 | 535F | 4143 | 454C | 465F | 4E55 |
| 0000042440 | 5443 | 4F49 | 004E | 4D43 | 4C5F | 4145 | 4E52 | 495F |
| 0000042460 | 4F43 | 004E | 4D43 | 4C5F | 4145 | 4E52 | 535F | 4143 |
| 0000042500 | 454C | 465F | 4E55 | 5443 | 4F49 | 004E | 4D43 | 535F |
| 0000042520 | 5445 | 4C5F | 434F | 5441 | 524F | 545F | 4152 | 4B43 |
| 0000042540 | 4E49 | 5F47 | 4F4D | 4544 | 4300 | 5F4D | 4954 | 494D |
| 0000042560 | 474E | 4300 | 5F4D | 4553 | 5F54 | 5953 | 434E | 4D5F |
| 0000042600 | 444F | 0045 | 4D43 | 555F | 4450 | 5441 | 5F45 | 5541 |
| 0000042620 | 4F54 | 5953 | 434E | 485F | 544F | 4B5F | 5945 | 0053 |
| 0000042640 | 4D43 | 535F | 4E59 | 5F43 | 5645 | 4E45 | 0054 | 4D43 |
| 0000042660 | 545F | 4345 | 5F48 | 5645 | 4E45 | 0054 | 4D43 | 545F |
| 0000042700 | 4952 | 4747 | 5245 | 4D5F | 4E41 | 4155 | 5F4C | 5953 |
| 0000042720 | 434E | 4300 | 5F4D | 4552 | 4F50 | 5452 | 535F | 4E59 |
| 0000042740 | 5F43 | 5645 | 4E45 | 0054 | 4D43 | 555F | 4450 | 5441 |
| 0000042760 | 5F45 | 5845 | 4543 | 5450 | 4F49 | 5F4E | 4C45 | 4D45 |
| 0000043000 | 4E45 | 0054 | 4D43 | 435F | 4E4F | 5254 | 4C4F | 455F |
| 0000043020 | 4358 | 5045 | 4954 | 4E4F | 455F | 454C | 454D | 544E |
| 0000043040 | 4300 | 5F4D | 4F43 | 544E | 4F52 | 5F4C | 5845 | 4543 |
| 0000043060 | 5450 | 4F49 | 004E | 4D43 | 475F | 5445 | 455F | 4358 |

THU MAR 14 17:22:42 1991 CRV_IF.DLL PAGE 20, LINE 1122

| | | | | | | | | |
|---|---|---|---|---|---|---|---|---|
| 0000043100 | 5045 | 4954 | 4E4F | 565F | 4345 | 4F54 | 0052 | 4D43 |
| 0000043120 | 555F | 4450 | 5441 | 5F45 | 4F53 | 5446 | 454B | 5F59 |
| 0000043140 | 4154 | 4C42 | 0045 | 4D43 | 535F | 4E45 | 5F44 | 4F53 |
| 0000043160 | 5446 | 454B | 0059 | 4D43 | 535F | 5445 | 525F | 4345 |
| 0000043200 | 524F | 0044 | 4D43 | 535F | 5455 | 425F | 5059 | 5341 |
| 0000043220 | 0053 | 4D43 | 415F | 4F42 | 5452 | 4300 | 5F4D | 4C46 |
| 0000043240 | 574F | 435F | 4148 | 474E | 0045 | 4D43 | 525F | 4345 |
| 0000043260 | 4E4F | 454E | 5443 | 4300 | 5F4D | 4853 | 5455 | 4F44 |
| 0000043300 | 4E57 | 4300 | 5F4D | 4143 | 5450 | 5255 | 5F45 | 4353 |
| 0000043320 | 4552 | 4E45 | 4300 | 5F4D | 4143 | 5450 | 5255 | 5F45 |
| 0000043340 | 5453 | 4952 | 0050 | 4D43 | 435F | 5041 | 5554 | 4552 |
| 0000043360 | 535F | 4749 | 4300 | 5F4D | 4556 | 4952 | 5946 | 535F |
| 0000043400 | 5243 | 4545 | 004E | 4D43 | 435F | 4D4F | 4150 | 4552 |
| 0000043420 | 535F | 5243 | 4545 | 534E | 4300 | 5F4D | 4157 | 5449 |
| 0000043440 | 465F | 524F | 535F | 5243 | 4545 | 534E | 4300 | 5F4D |
| 0000043460 | 4553 | 5F54 | 4946 | 544C | 5245 | 4300 | 5F4D | 4552 |
| 0000043500 | 4553 | 5F54 | 4F41 | 0049 | 4D43 | 535F | 5445 | 535F |
| 0000043520 | 4E59 | 5F43 | 4946 | 544C | 5245 | 4300 | 5F4D | 4544 |
| 0000043540 | 4946 | 454E | 465F | 4C49 | 4554 | 0052 | 4D43 | 455F |
| 0000043560 | 4944 | 5F54 | 4946 | 544C | 5245 | 4300 | 5F4D | 4946 |
| 0000043600 | 544C | 5245 | 445F | 4645 | 4E49 | 5449 | 4F49 | 004E |
| 0000043620 | 4D43 | 505F | 5455 | 465F | 4C49 | 4554 | 0052 | 4D43 |
| 0000043640 | 445F | 5349 | 4C50 | 5941 | 435F | 5255 | 4552 | 544E |
| 0000043660 | 415F | 494F | 4300 | 5F4D | 4944 | 5053 | 414C | 5F59 |
| 0000043700 | 414D | 4B53 | 4300 | 5F4D | 4944 | 5053 | 414C | 5F59 |
| 0000043720 | 4D49 | 4741 | 0045 | 4D43 | 445F | 5349 | 4C50 | 5941 |
| 0000043740 | 4D5F | 4C55 | 4954 | 4C50 | 5F45 | 4D49 | 4741 | 5345 |
| 0000043760 | 4300 | 5F4D | 4944 | 5053 | 414C | 5F59 | 454E | 5458 |
| 0000044000 | 495F | 414D | 4547 | 4300 | 5F4D | 4944 | 5053 | 414C |
| 0000044020 | 5F59 | 4944 | 4646 | 4300 | 5F4D | 4944 | 5053 | 414C |
| 0000044040 | 5F59 | 4148 | 464C | 495F | 414D | 4547 | 0053 | 4D43 |
| 0000044060 | 545F | 474F | 4C47 | 5F45 | 4148 | 464C | 495F | 414D |
| 0000044100 | 4547 | 0053 | 4D43 | 445F | 5349 | 4C50 | 5941 | 535F |
| 0000044120 | 5248 | 4E49 | 454B | 5F44 | 4D49 | 4741 | 5345 | 4300 |
| 0000044140 | 5F4D | 4944 | 5053 | 414C | 5F59 | 454D | 5353 | 4741 |
| 0000044160 | 0045 | 4D43 | 535F | 4F54 | 5F50 | 4944 | 5053 | 414C |
| 0000044200 | 0059 | 4D43 | 555F | 4450 | 5441 | 5F45 | 4353 | 4552 |
| 0000044220 | 4E45 | 4300 | 5F4D | 4349 | 4E4F | 4C5F | 4145 | 4E52 |
| 0000044240 | 4300 | 5F4D | 4349 | 4E4F | 445F | 5349 | 4C50 | 5941 |
| 0000044260 | 4300 | 5F4D | 4349 | 4E4F | 535F | 5641 | 0045 | 4D43 |
| 0000044300 | 495F | 4F43 | 5F4E | 4544 | 454C | 4554 | 4300 | 5F4D |
| 0000044320 | 4349 | 4E4F | 415F | 4F42 | 5452 | 4300 | 5F4D | 4349 |
| 0000044340 | 4E4F | 4C5F | 4145 | 4E52 | 455F | 444E | 4445 | 4300 |
| 0000044360 | 5F4D | 4349 | 4E4F | 4D5F | 4753 | 4300 | 5F4D | 4553 |
| 0000044400 | 5F54 | 4150 | 4152 | 534D | 4300 | 5F4D | 5245 | 4F52 |
| 0000044420 | 5F52 | 534D | 0047 | 4D43 | 465F | 4E55 | 5F43 | 454B |
| 0000044440 | 0059 | 4D43 | 4D5F | 4C55 | 5954 | 435F | 4D4F | 414D |
| 0000044460 | 444E | 6900 | 746E | 6900 | 746E | 4F00 | 4550 | 5F4E |
| 0000044500 | 4554 | 5453 | 4F00 | 4550 | 5F4E | 4944 | 4646 | 2500 |
| 0000044520 | 0973 | 7325 | 6200 | 645F | 6265 | 6775 | 3F00 | 003F |
| 0000044540 | 454B | 5F59 | 5250 | 5345 | 0053 | 454B | 5F59 | 4552 |
| 0000044560 | 454C | 5341 | 0045 | 7325 | 2509 | 3230 | 2058 | 2520 |
| 0000044600 | 2073 | 202C | 6974 | 656D | 283D | 6C25 | 2C75 | 2520 |
| 0000044620 | 756C | 0029 | 5F62 | 6564 | 7562 | 0067 | 4F4D | 5355 |
| 0000044640 | 5F45 | 5542 | 5454 | 4E4F | 0953 | 6425 | 2C20 | 7420 |
| 0000044660 | 6D69 | 3D65 | 2528 | 756C | 202C | 6C25 | 2975 | 6200 |
| 0000044700 | 645F | 6265 | 6775 | 4C00 | 434F | 5441 | 524F | 4D5F |
| 0000044720 | 564F | 0945 | 2528 | 2064 | 202C | 6425 | 2029 | 202C |
| 0000044740 | 6974 | 656D | 283D | 6C25 | 2C75 | 2520 | 756C | 0029 |

THU MAR 14 17:22:42 1991 CRV_IF.DLL PAGE 21, LINE 1181

| | | | | | | | | |
|---|---|---|---|---|---|---|---|---|
| 0000044760 | 5F62 | 6564 | 7562 | 0067 | 4F4D | 4556 | 4C5F | 434F |
| 0000045000 | 5441 | 524F | 545F | 4152 | 4B43 | 2809 | 6C25 | 2978 |
| 0000045020 | 6200 | 645F | 6265 | 6775 | 5400 | 4345 | 5F48 | 5645 |
| 0000045040 | 4E45 | 0954 | 2528 | 786C | 0029 | 5F62 | 6564 | 7562 |
| 0000045060 | 0067 | 4954 | 494D | 474E | 6409 | 6665 | 253D | 756C |
| 0000045100 | 202C | 696D | 3D6E | 6C25 | 0075 | 5F62 | 6564 | 7562 |
| 0000045120 | 0067 | 4944 | 5053 | 414C | 5F59 | 4944 | 4646 | 2509 |
| 0000045140 | 0073 | 5F62 | 6564 | 7562 | 0067 | 4944 | 5053 | 414C |
| 0000045160 | 5F59 | 454E | 5458 | 495F | 414D | 4547 | 2509 | 0064 |
| 0000045200 | 5F62 | 6564 | 7562 | 0067 | 4E4F | 4F00 | 4646 | 5300 |
| 0000045220 | 5445 | 525F | 4345 | 524F | 0944 | 7325 | 6200 | 645F |
| 0000045240 | 6265 | 6775 | 4300 | 5041 | 5554 | 4552 | 535F | 5243 |
| 0000045260 | 4545 | 094E | 7325 | 6200 | 645F | 6265 | 6775 | 5600 |
| 0000045300 | 5245 | 4649 | 5F59 | 4353 | 4552 | 4E45 | 2509 | 0073 |
| 0000045320 | 5F62 | 6564 | 7562 | 0067 | 7325 | 6200 | 645F | 6265 |
| 0000045340 | 6775 | 5500 | 6B6E | 6F6E | 6E77 | 6320 | 646F | 2065 |
| 0000045360 | 6425 | 6200 | 645F | 6265 | 6775 | 0000 | 00EE | 0832 |
| 0000045400 | 00F6 | 0836 | 00FF | 083A | 010E | 083E | 012A | 0842 |
| 0000045420 | 0146 | 0846 | 015E | 084A | 0174 | 084E | 0181 | 0852 |
| 0000045440 | 018E | 0856 | 019C | 085A | 01AA | 085E | 01B7 | 0862 |
| 0000045460 | 01C6 | 0866 | 01D7 | 086A | 01E7 | 086E | 01FD | 0872 |
| 0000045500 | 0213 | 0876 | 0228 | 087A | 023D | 087E | 0256 | 0882 |
| 0000045520 | 0264 | 0886 | 027C | 088A | 0299 | 088E | 02A3 | 0892 |
| 0000045540 | 02B4 | 0896 | 02D0 | 089A | 02DE | 089E | 02EC | 08A2 |
| 0000045560 | 0303 | 08A6 | 0318 | 08AA | 0334 | 08AE | 0351 | 08B2 |
| 0000045600 | 0366 | 08B6 | 037E | 08BA | 0396 | 08BE | 03A6 | 08C2 |
| 0000045620 | 03B4 | 08C6 | 03C2 | 08CA | 03CB | 08CE | 03DA | 08D2 |
| 0000045640 | 03E7 | 08D6 | 03F3 | 08DA | 0405 | 08DE | 0416 | 08E2 |
| 0000045660 | 0425 | 08E6 | 0436 | 08EA | 0449 | 08EE | 045D | 08F2 |
| 0000045700 | 046B | 08F6 | 0478 | 08FA | 048B | 08FE | 049C | 0902 |
| 0000045720 | 04AB | 0906 | 04C0 | 090A | 04CE | 090E | 04E5 | 0912 |
| 0000045740 | 04F5 | 0916 | 0506 | 091A | 0521 | 091E | 0537 | 0922 |
| 0000045760 | 0547 | 0926 | 055E | 092A | 0574 | 092E | 058F | 0932 |
| 0000046000 | 05A2 | 0936 | 05B2 | 093A | 05C3 | 093E | 05D1 | 0942 |
| 0000046020 | 05E1 | 0946 | 05EE | 094A | 05FD | 094E | 060B | 0952 |
| 0000046040 | 061F | 0956 | 062B | 095A | 0639 | 095E | 0646 | 0962 |
| 0000046060 | 0652 | 0064 | 7270 | 6E69 | 5F74 | 7263 | 5F76 | 736D |
| 0000046100 | 0067 | 0072 | 6E69 | 2500 | 0073 | 0072 | 6E69 | 4300 |
| 0000046120 | 5F4D | 454B | 5F59 | 5250 | 5345 | 0053 | 2A25 | 205B |
| 0000046140 | 5D09 | 6925 | 2A25 | 205B | 5D09 | 6C25 | 2569 | 5B2A |
| 0000046160 | 0920 | 255D | 696C | 4300 | 5F4D | 454B | 5F59 | 4552 |
| 0000046200 | 454C | 5341 | 0045 | 2A25 | 205B | 5D09 | 6925 | 2A25 |
| 0000046220 | 205B | 5D09 | 6C25 | 2569 | 5B2A | 0920 | 255D | 696C |
| 0000046240 | 4300 | 5F4D | 4F4D | 5355 | 5F45 | 5542 | 5454 | 4E4F |
| 0000046260 | 0053 | 2A25 | 205B | 5D09 | 6925 | 2A25 | 205B | 5D09 |
| 0000046300 | 6C25 | 2569 | 5B2A | 0920 | 255D | 696C | 4300 | 5F4D |
| 0000046320 | 4F4D | 4556 | 4C5F | 434F | 5441 | 524F | 2500 | 2064 |
| 0000046340 | 6425 | 4300 | 5F4D | 4F4D | 4556 | 4C5F | 434F | 5441 |
| 0000046360 | 524F | 545F | 4152 | 4B43 | 2500 | 696C | 4300 | 5F4D |
| 0000046400 | 4554 | 4843 | 455F | 4556 | 544E | 2500 | 696C | 2520 |
| 0000046420 | 0064 | 4D43 | 535F | 4E45 | 5F44 | 4F53 | 5446 | 454B |
| 0000046440 | 0059 | 2A25 | 205B | 5D09 | 6925 | 2A25 | 205B | 5D09 |
| 0000046460 | 6C25 | 2569 | 5B2A | 0920 | 255D | 696C | 4300 | 5F4D |
| 0000046500 | 4853 | 5455 | 4F44 | 4E57 | 2500 | 5B2A | 0A5E | 005D |
| 0000046520 | 7245 | 6F72 | 2072 | 6E69 | 7020 | 7261 | 6973 | 676E |
| 0000046540 | 000A | 0000 | 0000 | 0000 | 0000 | 0000 | 0006 | 0000 |
| 0000046560 | 13E0 | 13DF | 0000 | 0005 | 0000 | 0000 | 0000 | 0000 |
| 0000046600 | 0000 | 0000 | 0000 | 0000 | 435F | 465F | 4C49 | 5F45 |
| 0000046620 | 4E49 | 4F46 | 003D | 0001 | FFFF | 0000 | 0000 | 0000 |

THU MAR 14 17:22:42 1991 CRV_IF.DLL PAGE 22, LINE 1240

```
0000046640  0000  0000  0000  0000  0000  0000  0001  8101
0000046660  8181  0000  0000  0000  0000  0000  0000  0000
0000046700  0000  0000  0000  0000  0000  0000  0000  0000
*
0000047240  0000  0000  0000  0000  0000  0000  0000  0A00
0000047260  0A0A  0A0A  0A0A  0A0A  0A0A  0A0A  0A0A  0A0A
*
0000047640  0A0A  0A0A  0A0A  0A0A  0A0A  0A0A  0A0A  000A
0000047660  0000  0000  0000  0000  0000  0000  0000  0000
0000047700  FF00  00FF  0000  0000  FFFF  FFFF  005C  005C
0000047720  0000  0000  0D0A  0000  0000  FFFF  0001  0000
0000047740  0000  0000  0000  0000  0102  0000  0000  0000
0000047760  0000  0000  0202  0000  0000  0000  0000  0000
0000050000  0000  0000  0000  0000  0000  0000  0000  0000
*
0000050660  0000  0001  0200  0000  0000  0000  0000  0000
0000050700  0000  0000  0000  0000  0000  0000  0000  0000
*
0000051620  0000  0ED6  082E  0000  0000  0000  0000  0920
0000051640  0D2D  005D  005D  0006  0600  0100  0000  0010
0000051660  0603  0600  1002  4504  4545  0505  0505  3505
0000051700  0030  0050  0000  2000  3020  5850  0807  3000
0000051720  3030  5057  0007  2000  0020  0000  0000  6008
0000051740  6060  6060  0060  7000  7870  7878  0878  0807
0000051760  0000  0007  0808  0008  0800  0800  0000  2808
0000052000  756E  6C6C  0629  0000  0000  0000  0000  0000
0000052020  0000  0000  0000  0003  2000  199C  127E  199C
0000052040  114C  199C  1150  199C  1154  199C  1158  199C
0000052060  115C  0000  0000  0101  2000  2020  2020  2020
0000052100  2020  2828  2828  2028  2020  2020  2020  2020
0000052120  2020  2020  2020  2020  4820  1010  1010  1010
0000052140  1010  1010  1010  1010  8410  8484  8484  8484
0000052160  8484  1084  1010  1010  1010  8181  8181  8181
0000052200  0101  0101  0101  0101  0101  0101  0101  0101
0000052220  0101  0101  1010  1010  1010  8282  8282  8282
0000052240  0202  0202  0202  0202  0202  0202  0202  0202
0000052260  0202  0202  1010  1010  0020  0000  0000  0000
0000052300  0000  0000  0000  0000  0000  0000  0000  0000
*
0000052460  0000  0000  0000  0000  0000  0000  0003  0000
0000052500  0000  0000  0000  0000  0000  0000  2250  FFFF
0000052520  FFFF  FFFF  1280  1282  10C4  3C3C  4D4E  4753
0000052540  3E3E  0000  3652  3030  0D30  2D0A  7320  6174
0000052560  6B63  6F20  6576  6672  6F6C  0D77  000A  0003
0000052600  3652  3030  0D33  2D0A  6920  746E  6765  7265
0000052620  6420  7669  6469  2065  7962  3020  0A0D  0800
0000052640  5200  3036  3830  0A0D  202D  6F6E  2074  6E65
0000052660  756F  6867  7320  6170  6563  6620  726F  6120
0000052700  6772  6D75  6E65  7374  0A0D  0900  5200  3036
0000052720  3930  0A0D  202D  6F6E  2074  6E65  756F  6867
0000052740  7320  6170  6563  6620  726F  6520  766E  7269
0000052760  6E6F  656D  746E  0A0D  FC00  0D00  000A  00FF
0000053000  7572  2D6E  6974  656D  6520  7272  726F  0020
0000053020  0002  3652  3030  0D32  2D0A  6620  6F6C  7461
0000053040  6E69  2D67  6F70  6E69  2074  7573  7070  726F
0000053060  2074  6F6E  2074  6F6C  6461  6465  0A0D  1100
0000053100  5200  3036  3731  0A0D  202D  6E75  7865  6570
0000053120  7463  6465  6D20  6C75  6974  6874  6572  6461
0000053140  6C20  636F  206B  7265  6F72  0D72  000A  0010
```

THU MAR 14 17:22:42 1991 CRV_IF.DLL PAGE 23, LINE 1299

| | | | | | | | | |
|---|---|---|---|---|---|---|---|---|
| 0000053160 | 3652 | 3130 | 0D36 | 2D0A | 6E20 | 746F | 6520 | 6F6E |
| 0000053200 | 6775 | 2068 | 7073 | 6361 | 2065 | 6F66 | 2072 | 6874 |
| 0000053220 | 6572 | 6461 | 6420 | 7461 | 0D61 | 000A | FFFF | 05FF |
| 0000053240 | 0200 | 6000 | 0111 | 0000 | 0200 | 0400 | 040D | 0000 |
| 0000053260 | 0200 | 8800 | 0512 | 0000 | 0200 | 8402 | 0412 | 1A00 |
| 0000053300 | 0200 | 8602 | 0412 | 2800 | 4E00 | 3042 | 6132 | 003C |
| 0000053320 | 0100 | 0000 | E600 | 0009 | 0000 | 0100 | 1F00 | 745C |
| 0000053340 | 3231 | 5C33 | 7061 | 5C70 | 7263 | 5F76 | 6669 | 6F5C |
| 0000053360 | 6A62 | 635C | 7672 | 695F | 2E66 | 626F | 016A | E600 |
| 0000053400 | 0209 | 000D | 0000 | 0100 | 1E00 | 745C | 3231 | 5C33 |
| 0000053420 | 7061 | 5C70 | 7263 | 5F76 | 6669 | 6F5C | 6A62 | 705C |
| 0000053440 | 6972 | 746E | 6F2E | 6A62 | 0001 | 16F8 | 00D1 | 0000 |
| 0000053460 | 0001 | 0001 | 640B | 6C6C | 635C | 7573 | 612E | 6D73 |
| 0000053500 | 0001 | 17CA | 01AF | 0000 | 0001 | 0001 | 640E | 6C6C |
| 0000053520 | 635C | 7573 | 6164 | 2E74 | 7361 | 016D | 7A00 | 2219 |
| 0000053540 | 0000 | 0100 | 0100 | 0F00 | 736F | 5C32 | 7263 | 3074 |
| 0000053560 | 736D | 2E67 | 7361 | 016D | 9C00 | 0619 | 0000 | 0100 |
| 0000053600 | 0100 | 0A00 | 7263 | 3074 | 7066 | 612E | 6D73 | 0001 |
| 0000053620 | 19A2 | 001A | 0000 | 0001 | 0001 | 630A | 6B68 | 7473 |
| 0000053640 | 2E6B | 7361 | 016D | BC00 | 0819 | 0001 | 0100 | 0100 |
| 0000053660 | 0D00 | 6C64 | 5C6C | 6573 | 6574 | 766E | 2E70 | 0163 |
| 0000053700 | C400 | 651A | 0000 | 0100 | 0100 | 0F00 | 736F | 5C32 |
| 0000053720 | 6D6E | 6773 | 6468 | 2E72 | 7361 | 016D | 2A00 | C01B |
| 0000053740 | 0000 | 0100 | 0100 | 0E00 | 736F | 5C32 | 6F64 | 7273 |
| 0000053760 | 7465 | 612E | 6D73 | 0001 | 1BEA | 0102 | 0000 | 0001 |
| 0000054000 | 0001 | 6608 | 6C63 | 736F | 2E65 | 0163 | EC00 | 6A1C |
| 0000054020 | 0000 | 0100 | 0100 | 0700 | 6F66 | 6570 | 2E6E | 0163 |
| 0000054040 | 5600 | 421D | 0000 | 0100 | 0100 | 0800 | 7366 | 6163 |
| 0000054060 | 666E | 632E | 0001 | 1D98 | 004E | 0000 | 0001 | 0001 |
| 0000054100 | 7008 | 6972 | 746E | 2E66 | 0063 | 0000 | 0000 | 0000 |
| 0000054120 | 0100 | 0000 | 0B00 | 635F | 6C66 | 7375 | 2E68 | 7361 |
| 0000054140 | 006D | 0000 | 0000 | 0000 | 0100 | 0000 | 0700 | 665F |
| 0000054160 | 6C69 | 2E65 | 0163 | E600 | 9C1D | 0000 | 0100 | 0100 |
| 0000054200 | 0B00 | 665F | 6C69 | 7562 | 2E66 | 7361 | 016D | 8200 |
| 0000054220 | E51E | 0000 | 0100 | 0100 | 0B00 | 665F | 736C | 7562 |
| 0000054240 | 2E66 | 7361 | 016D | 6800 | 371F | 0000 | 0100 | 0100 |
| 0000054260 | 0C00 | 665F | 6572 | 6265 | 6675 | 612E | 6D73 | 0001 |
| 0000054300 | 1FA0 | 004B | 0000 | 0001 | 0001 | 5F0B | 6567 | 6274 |
| 0000054320 | 6675 | 612E | 6D73 | 0001 | 1FEC | 00F2 | 0000 | 0001 |
| 0000054340 | 0001 | 5F07 | 706F | 6E65 | 632E | 0001 | 20DE | 00C0 |
| 0000054360 | 0000 | 0001 | 0001 | 5F0B | 6673 | 6274 | 6675 | 612E |
| 0000054400 | 6D73 | 0001 | 219E | 012E | 0000 | 0001 | 0001 | 6608 |
| 0000054420 | 6C66 | 7375 | 2E68 | 0163 | CC00 | 2A22 | 0008 | 0100 |
| 0000054440 | 0100 | 0700 | 6E69 | 7570 | 2E74 | 0163 | F600 | FA2A |
| 0000054460 | 0004 | 0100 | 0100 | 0A00 | 756F | 7074 | 7475 | 612E |
| 0000054500 | 6D73 | 0001 | 2FF0 | 0078 | 0000 | 0001 | 0001 | 7308 |
| 0000054520 | 7274 | 6165 | 2E6D | 0163 | 6800 | AA30 | 0000 | 0100 |
| 0000054540 | 0100 | 0800 | 6E75 | 6567 | 6374 | 632E | 0001 | 3112 |
| 0000054560 | 003F | 0000 | 0001 | 0001 | 6F0D | 3273 | 635C | 6F6C |
| 0000054600 | 6573 | 612E | 6D73 | 0001 | 3152 | 0077 | 0000 | 0001 |
| 0000054620 | 0001 | 6F0D | 3273 | 6C5C | 6573 | 6B65 | 612E | 6D73 |
| 0000054640 | 0001 | 31CA | 01DD | 0000 | 0001 | 0001 | 6F0C | 3273 |
| 0000054660 | 6F5C | 6570 | 2E6E | 7361 | 016D | A800 | 5D33 | 0001 |
| 0000054700 | 0100 | 0100 | 0C00 | 736F | 5C32 | 6572 | 6461 | 612E |
| 0000054720 | 6D73 | 0001 | 3506 | 01DD | 0000 | 0001 | 0001 | 7709 |
| 0000054740 | 6972 | 6574 | 612E | 6D73 | 0000 | 0000 | 0000 | 0000 |
| 0000054760 | 0001 | 0000 | 740B | 7478 | 6F6D | 6564 | 612E | 6D73 |
| 0000055000 | 0001 | 36E4 | 000A | 0000 | 0001 | 0001 | 6D0A | 6C61 |
| 0000055020 | 6F6C | 2E63 | 7361 | 016D | EE00 | 0A36 | 0000 | 0100 |

THU MAR 14 17:22:42 1991 CRV_IF.DLL PAGE 24, LINE 1358

| | | | | | | | | |
|---|---|---|---|---|---|---|---|---|
| 0000055040 | 0100 | 0800 | 7266 | 6565 | 612E | 6D73 | 0001 | 36F8 |
| 0000055060 | 00AF | 0000 | 0001 | 0001 | 660B | 616D | 6C6C | 636F |
| 0000055100 | 612E | 6D73 | 0000 | 0000 | 0000 | 0000 | 0001 | 0000 |
| 0000055120 | 6609 | 6164 | 6174 | 612E | 6D73 | 0001 | 37A8 | 0034 |
| 0000055140 | 0000 | 0001 | 0001 | 690B | 696E | 7374 | 6765 | 612E |
| 0000055160 | 6D73 | 0001 | 37DC | 0036 | 0000 | 0001 | 0001 | 6C0B |
| 0000055200 | 6E69 | 736B | 6765 | 612E | 6D73 | 0001 | 3812 | 007C |
| 0000055220 | 0000 | 0001 | 0001 | 730C | 6165 | 6372 | 7368 | 2E67 |
| 0000055240 | 7361 | 016D | 8E00 | E238 | 0000 | 0100 | 0100 | 0B00 |
| 0000055260 | 7267 | 776F | 6573 | 2E67 | 7361 | 016D | 7000 | 3139 |
| 0000055300 | 0000 | 0100 | 0100 | 0A00 | 656E | 7377 | 6765 | 612E |
| 0000055320 | 6D73 | 0001 | 39A2 | 0046 | 0000 | 0001 | 0001 | 730A |
| 0000055340 | 7274 | 6163 | 2E74 | 7361 | 016D | E800 | 3639 | 0000 |
| 0000055360 | 0100 | 0100 | 0A00 | 7473 | 6372 | 7970 | 612E | 6D73 |
| 0000055400 | 0001 | 3A1E | 0029 | 0000 | 0001 | 0001 | 730A | 7274 |
| 0000055420 | 6D63 | 2E70 | 7361 | 016D | 4800 | 173A | 0000 | 0100 |
| 0000055440 | 0100 | 0A00 | 7473 | 6C72 | 6E65 | 612E | 6D73 | 0001 |
| 0000055460 | 3A60 | 003B | 0000 | 0001 | 0001 | 730B | 7274 | 636E |
| 0000055500 | 706D | 612E | 6D73 | 0001 | 3A9C | 001C | 0000 | 0001 |
| 0000055520 | 0001 | 6908 | 6F74 | 2E61 | 7361 | 006D | 0000 | 0000 |
| 0000055540 | 0000 | 0100 | 0000 | 0C00 | 6D63 | 7369 | 6463 | 7461 |
| 0000055560 | 612E | 6D73 | 0000 | 0000 | 0000 | 0000 | 0001 | 0000 |
| 0000055600 | 6309 | 7974 | 6570 | 612E | 6D73 | 0001 | 3AB8 | 00A6 |
| 0000055620 | 0000 | 0001 | 0001 | 6708 | 7465 | 6E65 | 2E76 | 0163 |
| 0000055640 | 5E00 | 8A3B | 0000 | 0100 | 0100 | 0D00 | 736F | 5C32 |
| 0000055660 | 6C6D | 636F | 2E6B | 7361 | 016D | 1800 | 7A3C | 0000 |
| 0000055700 | 0100 | 0100 | 1000 | 6C64 | 5C6C | 6974 | 7464 | 6261 |
| 0000055720 | 656C | 612E | 6D73 | 0001 | 3C92 | 002E | 0000 | 0001 |
| 0000055740 | 0001 | 630A | 6C61 | 6F6C | 2E63 | 7361 | 016D | C000 |
| 0000055760 | 5E3C | 0000 | 0100 | 0100 | 0B00 | 6D68 | 6D65 | 7063 |
| 0000056000 | 2E79 | 7361 | 016D | 1E00 | 483D | 0000 | 0100 | 0100 |
| 0000056020 | 0B00 | 6D68 | 6D65 | 6573 | 2E74 | 7361 | 016D | 6600 |
| 0000056040 | 633D | 0000 | 0100 | 0100 | 0800 | 7478 | 616F | 612E |
| 0000056060 | 6D73 | 0001 | 3DCA | 001D | 0000 | 00P1 | 0001 | 6F0E |
| 0000056100 | 3273 | 755C | 6C6E | 6E69 | 2E6B | 7361 | 016D | E800 |
| 0000056120 | 223D | 0000 | 0100 | 0100 | 0900 | 6C61 | 756D | 2E6C |
| 0000056140 | 7361 | 016D | 0A00 | 1F3E | 0000 | 0100 | 0100 | 0900 |
| 0000056160 | 6C61 | 6873 | 2E6C | 7361 | 016D | 2A00 | 323E | 0000 |
| 0000056200 | 0100 | 0100 | 0800 | 6D6C | 6C75 | 612E | 6D73 | 0001 |
| 0000056220 | 3E5C | 000B | 0000 | 0001 | 0001 | 6C08 | 6873 | 2E6C |
| 0000056240 | 7361 | 006D | 0100 | D700 | 0B05 | 5243 | 5F56 | 4649 |
| 0000056260 | 495F | 494E | A454 | 0100 | DB00 | 0F05 | 5243 | 5F56 |
| 0000056300 | 4553 | 5F54 | 5845 | 4345 | 5455 | CE45 | 0100 | DD00 |
| 0000056320 | 1505 | 5243 | 5F56 | 554D | 544C | 5F49 | 4553 | 444E |
| 0000056340 | 545F | 5F4F | 5243 | 8D56 | 0105 | E500 | 0F05 | 5243 |
| 0000056360 | 5F56 | 4553 | 444E | 545F | 5F4F | 5243 | E456 | 0105 |
| 0000056400 | E600 | 0C05 | 5243 | 5F56 | 4649 | 415F | 4F42 | 5452 |
| 0000056420 | 0834 | 0005 | 0504 | 5F0D | 7263 | 5F76 | 6F63 | 6564 |
| 0000056440 | 735F | 7274 | D9E6 | 0001 | 0506 | 500D | 4952 | 544E |
| 0000056460 | 435F | 5652 | 4D5F | 4753 | 11C3 | 0001 | 0550 | 530C |
| 0000056500 | 4143 | 5F4E | 5243 | 5F56 | 534D | D047 | 0513 | 0000 |
| 0000056520 | 0600 | 655F | 6164 | 6174 | 13E0 | 0005 | 0000 | 5F04 |
| 0000056540 | 6E65 | F864 | 0116 | 0000 | 0600 | 5F43 | 4E49 | 5449 |
| 0000056560 | 0AA4 | 0005 | 0000 | 5F0C | 6E5F | 6568 | 7061 | 645F |
| 0000056600 | 7365 | E063 | 0513 | 0000 | 0C00 | 735F | 6174 | 6B63 |
| 0000056620 | 6F62 | 7474 | 6D6F | 0ACA | 0005 | 0000 | 5F0C | 5F5F |
| 0000056640 | 4461 | 7342 | 7077 | 6C66 | 9667 | 050A | 0000 | 0800 |
| 0000056660 | 5F5F | 6361 | 646D | 6E6C | 0AC8 | 0005 | 0000 | 5F08 |
| 0000056700 | 615F | 6573 | 6867 | C669 | 050A | 0000 | 0800 | 5F5F |

THU MAR 14 17:22:42 1991 CRV_IF.DLL PAGE 25, LINE 1417

| | | | | | | | | |
|---|---|---|---|---|---|---|---|---|
| 0000056720 | 7361 | 6765 | 6F6C | 0AA2 | 0005 | 0000 | 5F08 | 615F |
| 0000056740 | 6973 | 647A | A073 | 050A | 0000 | 0800 | 5F5F | 7461 |
| 0000056760 | 706F | 7073 | 0AB8 | 0005 | 0000 | 5F09 | 615F | 6663 |
| 0000057000 | 6E69 | 6F66 | D6D6 | 0000 | 0001 | 5F09 | 615F | 4244 |
| 0000057020 | 7375 | 6465 | 0A98 | 0005 | 0000 | 5F09 | 615F | 6E65 |
| 0000057040 | 7376 | 6765 | 0A9C | 0005 | 0000 | 5F0A | 745F | 7268 |
| 0000057060 | 6165 | 6964 | 9A64 | 050A | 0000 | 0A00 | 5F5F | 6967 |
| 0000057100 | 666E | 736F | 6765 | D6D6 | 0000 | 0001 | 5F0A | 615F |
| 0000057120 | 4244 | 6F64 | 7773 | 9E70 | 050A | 0000 | 0A00 | 5F5F |
| 0000057140 | 696C | 666E | 736F | 6765 | 9876 | 0000 | 0001 | 5F0A |
| 0000057160 | 615F | 7263 | 7574 | 6573 | CC64 | 050A | 0000 | 0B00 |
| 0000057200 | 5F5F | 615F | 4244 | 7472 | 7265 | 6972 | 0117 | 0000 |
| 0000057220 | 0B00 | 5F5F | 6D61 | 6773 | 655F | 6978 | DA74 | 050A |
| 0000057240 | 0000 | 0B00 | 5F5F | 736F | 6576 | 7372 | 6F69 | 836E |
| 0000057260 | 0118 | 0000 | 0600 | 5F5F | 7865 | 7469 | 1935 | 0001 |
| 0000057300 | 0000 | 5F0C | 755F | 6C6E | 636F | 656B | 6978 | ED74 |
| 0000057320 | 050C | 0000 | 0700 | 5F5F | 6863 | 6C69 | DD64 | 050A |
| 0000057340 | 0000 | 0700 | 5F5F | 666E | 6C69 | CA65 | 0117 | 0000 |
| 0000057360 | 0700 | 5F5F | 6963 | 696E | DF74 | 050C | 0000 | 0700 |
| 0000057400 | 5F5F | 615F | 6772 | 8B63 | 0118 | 0000 | 0700 | 5F5F |
| 0000057420 | 6563 | 6978 | DA74 | 050A | 0000 | 0D00 | 5F5F | 6F64 |
| 0000057440 | 7673 | 7265 | 616D | 6F6A | E172 | 050C | 0000 | 0700 |
| 0000057460 | 5F5F | 615F | 6772 | DB76 | 050A | 0000 | 0D00 | 5F5F |
| 0000057500 | 6F64 | 7673 | 7265 | 696D | 6F6E | DF72 | 050B | 0000 |
| 0000057520 | 0800 | 5F5F | 6970 | 6570 | 6863 | 0CE5 | 0005 | 0000 |
| 0000057540 | 5F08 | 6E65 | 6976 | 6F72 | DF6E | 050A | 0000 | 0800 |
| 0000057560 | 5F5F | 736F | 6966 | 656C | 0ADC | 0005 | 0000 | 5F08 |
| 0000057600 | 6F5F | 6D73 | 646F | 2465 | 0118 | 0000 | 0800 | 5F5F |
| 0000057620 | 6E69 | 7469 | 7066 | 1270 | 0005 | 0000 | 5F08 | 665F |
| 0000057640 | 6970 | 696E | 5874 | 0119 | 0000 | 0800 | 5F5F | 6574 |
| 0000057660 | 6D72 | 7066 | 0CE9 | 0005 | 0000 | 5F08 | 705F | 6D67 |
| 0000057700 | 7470 | 9572 | 0118 | 0000 | 0800 | 5F5F | 5F63 | 7865 |
| 0000057720 | 7469 | 0ADC | 0005 | 0000 | 5F09 | 645F | 736F | 6F6D |
| 0000057740 | 6564 | 0ADA | 0005 | 0000 | 5F09 | 6F5F | 6D73 | 6A61 |
| 0000057760 | 726F | 0ADB | 0005 | 0000 | 5F09 | 6F5F | 6D73 | 6E69 |
| 0000060000 | 726F | 0CEF | 0005 | 0000 | 5F0A | 655F | 6978 | 6474 |
| 0000060020 | 6E6F | EB65 | 0118 | 0000 | 0A00 | 5F5F | 6F6C | 6B63 |
| 0000060040 | 7865 | 7469 | 0AD8 | 0005 | 0000 | 5F0A | 755F | 616D |
| 0000060060 | 6B73 | 6176 | 586C | 0119 | 0000 | 0A00 | 5F5F | 7463 |
| 0000060100 | 7265 | 736D | 6275 | 0CF1 | 0005 | 0000 | 5F0A | 655F |
| 0000060120 | 6978 | 5F74 | 6974 | CE64 | 050A | 0000 | 0500 | 5F5F |
| 0000060140 | 6166 | 7C63 | 0118 | 0000 | 0500 | 655F | 6978 | 7A74 |
| 0000060160 | 0119 | 0000 | 0E00 | 5F5F | 4646 | 4D5F | 4753 | 4142 |
| 0000060200 | 4E4E | 5245 | 0CF4 | 0005 | 0000 | 5F09 | 615F | 6264 |
| 0000060220 | 6D67 | 6773 | 9876 | 0000 | 0001 | 5F09 | 615F | 7263 |
| 0000060240 | 6D74 | 6773 | 199C | 0001 | 0000 | 5F08 | 665F | 7470 |
| 0000060260 | 6172 | F870 | 050C | 0000 | 0C00 | 5F5F | 6161 | 746C |
| 0000060300 | 7473 | 6F6B | 7276 | 19A2 | 0001 | 0000 | 5F08 | 635F |
| 0000060320 | 6B68 | 7473 | A26B | 0119 | 0000 | 0A00 | 5F5F | 4661 |
| 0000060340 | 6863 | 736B | 6B74 | 19BC | 0001 | 0000 | 5F09 | 735F |
| 0000060360 | 7465 | 6E65 | 7076 | 1AC4 | 0001 | 0000 | 5F0B | 4E5F |
| 0000060400 | 534D | 5F47 | 4554 | 5458 | 1AF4 | 0001 | 0000 | 5F0C |
| 0000060420 | 4E5F | 534D | 5F47 | 5257 | 5449 | D645 | 011B | 0000 |
| 0000060440 | 0B00 | 5F5F | 645F | 736F | 7265 | 6E72 | DE6F | 011B |
| 0000060460 | 0000 | 0700 | 5F5F | 7265 | 6E72 | 8F6F | 011B | 0000 |
| 0000060500 | 0800 | 5F5F | 6F64 | 7273 | 7465 | 1B76 | 0001 | 0000 |
| 0000060520 | 5F09 | 645F | 736F | 6572 | 6674 | 1C36 | 0001 | 0000 |
| 0000060540 | 5F0B | 665F | 6C63 | 736F | 5F65 | 6B6C | 1BEA | 0001 |
| 0000060560 | 0000 | 5F07 | 6366 | 6F6C | 6573 | 1CEC | 0001 | 0000 |

THU MAR 14 17:22:42 1991 CRV_IF.DLL PAGE 26, LINE 1476

| | | | | | | | | |
|---|---|---|---|---|---|---|---|---|
| 0000060600 | 5F08 | 665F | 6F73 | 6570 | 3E6E | 011D | 0000 | 0600 |
| 0000060620 | 665F | 706F | 6E65 | 1D56 | 0001 | 0000 | 5F07 | 7366 |
| 0000060640 | 6163 | 666E | 1D98 | 0001 | 0000 | 5F07 | 7270 | 6E69 |
| 0000060660 | 6674 | 0D00 | 0005 | 0000 | 5F08 | 635F | 6C66 | 7375 |
| 0000060700 | 0068 | 0400 | 0000 | 0700 | 5F5F | 7562 | 6966 | 026E |
| 0000060720 | 050D | 0000 | 0500 | 5F5F | 6F69 | E262 | 050E | 0000 |
| 0000060740 | 0600 | 5F5F | 6F69 | 3262 | 10C2 | 0005 | 0000 | 5F09 |
| 0000060760 | 6C5F | 7361 | 6974 | 626F | 1DE6 | 0001 | 0000 | 5F08 |
| 0000061000 | 665F | 6C69 | 7562 | 8266 | 011E | 0000 | 0800 | 5F5F |
| 0000061020 | 6C66 | 6273 | 6675 | 1F68 | 0001 | 0000 | 5F09 | 665F |
| 0000061040 | 6572 | 6265 | 6675 | 1FA0 | 0001 | 0000 | 5F08 | 675F |
| 0000061060 | 7465 | 7562 | EC66 | 011F | 0000 | 0A00 | 5F5F | 706F |
| 0000061100 | 6E65 | 6966 | 656C | 2156 | 0001 | 0000 | 5F07 | 665F |
| 0000061120 | 6274 | 6675 | 20DE | 0001 | 0000 | 5F07 | 735F | 6274 |
| 0000061140 | 6675 | 21E4 | 0001 | 0000 | 5F0B | 665F | 6C66 | 7375 |
| 0000061160 | 5F68 | 6B6C | 219E | 0001 | 0000 | 5F07 | 6666 | 756C |
| 0000061200 | 6873 | 2250 | 0001 | 0000 | 5F09 | 6C66 | 7375 | 6168 |
| 0000061220 | 6C6C | 22CC | 0001 | 0000 | 5F07 | 695F | 706E | 7475 |
| 0000061240 | 2B06 | 0001 | 0000 | 5F08 | 6F5F | 7475 | 7570 | F074 |
| 0000061260 | 012F | 0000 | 0B00 | 5F5F | 6567 | 7374 | 7274 | 6165 |
| 0000061300 | 686D | 0130 | 0000 | 0700 | 755F | 676E | 7465 | A863 |
| 0000061320 | 0130 | 0000 | 0B00 | 5F5F | 6E75 | 6567 | 6374 | 6C5F |
| 0000061340 | 126B | 0131 | 0000 | 0600 | 635F | 6F6C | 6573 | 315C |
| 0000061360 | 0001 | 0000 | 5F06 | 736C | 6565 | 526B | 0131 | 0000 |
| 0000061400 | 0A00 | 5F5F | 736C | 6565 | 5F6B | 6B6C | 31CA | 0001 |
| 0000061420 | 0000 | 5F06 | 6F73 | 6570 | DB6E | 0131 | 0000 | 0500 |
| 0000061440 | 6F5F | 6570 | 966E | 0133 | 0000 | 1100 | 5F5F | 5863 |
| 0000061460 | 4E45 | 5849 | 6F74 | 4F44 | 6D53 | 646F | A865 | 0133 |
| 0000061500 | 0000 | 0500 | 725F | 6165 | 1064 | 0135 | 0000 | 0600 |
| 0000061520 | 775F | 6972 | 6574 | 3506 | 0001 | 0000 | 5F0A | 775F |
| 0000061540 | 6972 | 6574 | 6C5F | 386B | 0511 | 0000 | 0700 | 5F5F |
| 0000061560 | 6D66 | 646F | 3865 | 0511 | 0000 | 0800 | 5F5F | 6F69 |
| 0000061600 | 6F6D | 6564 | 36E4 | 0001 | 0000 | 5F07 | 616D | 6C6C |
| 0000061620 | 636F | 36E9 | 0001 | 0000 | 5F0A | 616D | 6C6C | 636F |
| 0000061640 | 6C5F | F36B | 0136 | 0000 | 0800 | 665F | 6572 | 5F65 |
| 0000061660 | 6B6C | 36EE | 0001 | 0000 | 5F05 | 7266 | 6565 | 372A |
| 0000061700 | 0001 | 0000 | 5FDC | 665F | 616D | 6C6C | 636F | 6C5F |
| 0000061720 | F86B | 0136 | 0000 | 0700 | 5F5F | 6666 | 6572 | 0B65 |
| 0000061740 | 0137 | 0000 | 0900 | 5F5F | 6D66 | 6C61 | 6F6C | F863 |
| 0000061760 | 0136 | 0000 | 0A00 | 5F5F | 6666 | 6572 | 5F65 | 6B6C |
| 0000062000 | 113A | 0005 | 0000 | 5F07 | 665F | 6568 | 7061 | 37A8 |
| 0000062020 | 0001 | 0000 | 5F09 | 695F | 696E | 7374 | 6765 | 37DC |
| 0000062040 | 0001 | 0000 | 5F09 | 6C5F | 6E69 | 736B | 6765 | 3812 |
| 0000062060 | 0001 | 0000 | 5F0B | 735F | 6165 | 6372 | 7368 | 6765 |
| 0000062100 | 391D | 0001 | 0000 | 5F08 | 695F | 636E | 6573 | 8E67 |
| 0000062120 | 0138 | 0000 | 0900 | 5F5F | 7267 | 776F | 6573 | 5067 |
| 0000062140 | 0139 | 0000 | 0A00 | 5F5F | 6966 | 646E | 616C | 7473 |
| 0000062160 | 1148 | 0005 | 0000 | 5F0A | 615F | 626D | 6B6C | 6973 |
| 0000062200 | 707A | 0139 | 0000 | 0800 | 5F5F | 656E | 7377 | 6765 |
| 0000062220 | 39A2 | 0001 | 0000 | 5F07 | 7473 | 6372 | 7461 | 39E8 |
| 0000062240 | 0001 | 0000 | 5F07 | 7473 | 6372 | 7970 | 3A1E | 0001 |
| 0000062260 | 0000 | 5F07 | 7473 | 6372 | 706D | 3A48 | 0001 | 0000 |
| 0000062300 | 5F07 | 7473 | 6C72 | 6E65 | 3A60 | 0001 | 0000 | 5F08 |
| 0000062320 | 7473 | 6E72 | 6D63 | 9C70 | 013A | 0000 | 0500 | 695F |
| 0000062340 | 6F74 | 4A61 | 0511 | 0000 | 0D00 | 5F5F | 6663 | 746C |
| 0000062360 | 7663 | 5F74 | 6174 | 6662 | 0511 | 0000 | 0800 | 5F5F |
| 0000062400 | 7361 | 7A69 | 4365 | 1167 | 0005 | 0000 | 5F08 | 615F |
| 0000062420 | 6973 | 657A | 6444 | 0511 | 0000 | 0B00 | 5F5F | 6973 |
| 0000062440 | 6967 | 746E | 666F | 6266 | 0511 | 0000 | 0B00 | 5F5F |

```
THU MAR 14 17:22:42 1991  CRV_IF.DLL  PAGE 27, LINE 1535

0000062460  6973  6967  746E  6573  6867  0511  0000  0700
0000062500  5F5F  7463  7079  6865  0511  0000  0800  5F5F
0000062520  7463  7079  5F65  3AB8  0001  0000  5F07  6567
0000062540  6574  766E  3BAE  0001  0000  5F06  6C5F  636F
0000062560  F86B  013B  0000  0700  5F5F  6F6C  6B63  8266
0000062600  013B  0000  0D00  5F5F  6E75  6F6C  6B63  665F
0000062620  6C69  5E65  013B  0000  0D00  5F5F  6F6C  6B63
0000062640  735F  7274  6165  D86D  013B  0000  0800  5F5F
0000062660  6E75  6F6C  6B63  126A  0005  0000  5F09  6C5F
0000062700  636F  636B  746E  3C08  0001  0000  5F09  755F
0000062720  6C6E  636F  666B  3B6A  0001  0000  5F0F  755F
0000062740  6C6E  636F  5F6B  7473  6572  6D61  3B8E  0001
0000062760  0000  5F0A  775F  6961  6C74  636F  766B  013B
0000063000  0000  0B00  5F5F  6F6C  6B63  665F  6C69  1865
0000063020  013C  0000  0B00  5F5F  6567  7474  6469  6174
0000063040  6C62  0512  0000  0B00  5F5F  6974  7464  6261
0000063060  616D  9278  013C  0000  0700  635F  6C61  6F6C
0000063100  C063  013C  0000  0700  6D5F  6D65  7063  1E79
0000063120  013D  0000  0700  6D5F  6D65  6573  7374  013D
0000063140  0000  0700  5F5F  7863  6F74  6661  013D  0000
0000063160  0A00  5F5F  6C63  6F74  7361  6275  3DCA  0001
0000063200  0000  5F07  6572  6F6D  6576  3DCA  0001  0000
0000063220  5F07  6E75  696C  6B6E  3DE8  0001  0000  5F0A
0000063240  615F  4646  6C61  756D  E86C  013D  0000  0B00
0000063260  5F5F  4661  6146  6C75  756D  0A6C  013E  0000
0000063300  0A00  5F5F  4661  6146  736C  6C68  3E2A  0001
0000063320  0000  5F08  615F  6C46  756D  2A6C  013E  0000
0000063340  0900  5F5F  4661  6C75  756D  5C6C  013E  0000
0000063360  0800  5F5F  4661  736C  6C68  0A01  7500  8380
0000063400  0081  0064  0183  0102  0001  0180  0016  3079
0000063420  8303  0203  0483  8202  280A  6E75  6174  6767
0000063440  6465  6929  0A01  7F00  8183  8300  0081  8183
0000063460  0100  001C  827F  7006  6361  5F6B  0068  0682
0000063500  6966  656C  685F  8202  6606  6E75  5F63  0468
0000063520  0101  8000  0101  8000  0101  8000  0101  8000
*
0000063720  0101  8000  0101  8000  0101  8000  0501  7800
0000063740  8348  0080  0701  7A00  8373  022A  0082  0A01
0000063760  7500  8380  0081  0064  0183  0102  0001  0180
0000064000  0001  0180  0001  0180  0001  0180  0001  0180
*
0000065560  0001  0180  0005  6878  8083  0100  0001  0180
0000065600  0001  0180  0001  0180  0001  0180  0001  0180
*
0000072700  001B  2079  0309  059C  9D83  8205  690F  755F
0000072720  6D5F  6773  705F  7261  6D61  745F  0169  001C
0000072740  837F  0081  8583  8300  0082  8683  8300  0088
0000072760  8083  8300  0084  C083  8300  00C0  6A01  7F00
0000073000  0982  5F69  5F75  6873  726F  0074  0A82  5F69
0000073020  5F75  7375  6F68  7472  8200  6908  755F  6C5F
0000073040  6E6F  0067  0982  5F69  5F75  6C75  6E6F  0067
0000073060  0982  5F69  5F75  6C66  616F  0074  0882  5F69
0000073100  5F75  6863  7261  8200  6909  755F  755F  6863
0000073120  7261  8200  6907  755F  735F  7274  8200  6909
0000073140  755F  625F  6F6C  6B63  0100  0019  3079  8302
0000073160  059F  A083  8205  690D  6D5F  6773  705F  7261
0000073200  6D61  745F  0169  0007  837F  0085  9B83  0105
0000073220  0010  827F  7404  7079  0065  0582  6176  756C
0000073240  0265  0101  8000  1C01  7900  9085  0900  A383
```

THU MAR 14 17:22:42 1991 CRV_IF.DLL PAGE 28, LINE 1594

```
0000073260  8305  05A4  0E82  5F69  736D  5F67  6568  6461
0000073300  7265  745F  0169  001C  837F  0081  8183  8300
0000073320  0085  8583  8300  0084  8583  8300  0085  8183
0000073340  8300  0085  4701  7F00  0482  5F71  6469  8200
0000073360  7306  756F  6372  0265  0382  6970  0464  0382
0000073400  6974  0664  0482  6572  7073  8208  7208  7365
0000073420  5F70  6974  0A64  0782  706F  635F  646F  0C65
0000073440  0482  7974  6570  820E  7304  7A69  1065  1501
0000073460  7900  C085  0200  A783  8305  05A8  0782  5F69
0000073500  736D  5F67  6974  0501  7800  8330  059E  0701
0000073520  7F00  A283  8305  05A6  1701  7F00  0682  6568
0000073540  6461  7265  8200  700A  7261  6D61  6C5F  7369
0000073560  1274  0101  8000  0101  8000  0701  7A00  8373
0000073600  05AC  0082  0701  7A00  8373  05A5  0082  0101
0000073620  8000  0101  8000  0101  8000  0101  8000  0101
*
0000073760  8000  0101  8000  0101  8000  0101  8000  1901
0000074000  7900  0460  CB83  8305  05CC  0D82  5243  5F56
0000074020  4F43  4D4D  4E41  5F44  6954  0701  7A00  8373
0000074040  05C9  0082  0D01  7F00  8183  8300  0081  C083
0000074060  8300  05CA  2401  7F00  0C82  6F63  6D6D  6E61
0000074100  5F64  7974  6570  8200  7304  7A69  0265  0382
0000074120  7562  0466  0482  656E  7478  0108  0001  0180
0000074140  0001  0180  0001  0180  0001  0180  0001  0180
*
0000074200  0001  0180  000A  8075  8183  7300  8300  0201
0000074220  0501  7800  8338  0080  0501  7800  8330  0080
0000074240  0401  7F00  8583  0100  000A  8075  0083  7302
0000074260  8301  05DA  0701  7F00  CA83  8305  05AB  0A01
0000074300  7500  8380  0081  0273  DC83  0105  0001  0180
0000074320  0001  0180  0007  8578  00B0  8083  0100  0005
0000074340  6078  8283  0100  0005  4078  8083  0100  0007
0000074360  8578  0088  8083  0100  000D  837F  0081  C083
0000074400  8300  0081  AB83  0105  000A  8075  8183  7300
0000074420  8304  05E4  0A01  7500  8380  0081  0073  0183
0000074440  0102  000A  8075  8183  6400  8300  0201  0101
0000074460  8000  0701  7A00  8373  0203  0082  0A01  7500
0000074500  8380  0081  0064  0183  0102  0001  0180  0001
0000074520  0180  0001  0180  0001  0180  0001  0180  0001
*
0000100140  0180  0001  0180  0001  0180  0016  3079  8303
0000100160  03CD  CE83  8203  280A  6E75  6174  6767  6465
0000100200  6929  0A01  7F00  8183  8300  0081  8183  0100
0000100220  001C  827F  7006  6361  5F6B  0068  0682  6966
0000100240  656C  685F  8202  6606  6E75  5F63  0468  0101
0000100260  8000  0101  8000  0101  8000  0101  8000  0101
*
0000100460  8000  0101  8000  0501  7800  8340  0080  0501
0000100500  7800  8348  0080  0101  8000  0101  8000  1601
0000100520  7900  0220  F683  8303  03F7  0A82  7528  746E
0000100540  6761  6567  2964  0169  0007  837F  0081  8183
0000100560  0100  0009  827F  7801  8200  7901  0102  0001
0000100600  0180  0001  0180  0001  0180  0001  0180  0001
*
0000101360  0180  0001  0180  0016  4079  8302  0457  5883
0000101400  8204  280A  6E75  6174  6767  6465  6929  0701
0000101420  7F00  8283  8300  0082  1701  7FC0  0882  6564
0000101440  5F66  6974  656D  8200  6D08  6E69  745F  6D69
0000101460  0465  1601  7900  0250  5A83  8304  045B  0A82
```

THU MAR 14 17:22:42 1991 CRV_IF.DLL PAGE 29, LINE 1653

```
0000101500  7528  746E  6761  6567  2964  0169  0007  837F
0000101520  0084  5683  0104  0010  827F  6B03  7965  8200
0000101540  7406  6D69  6E69  0267  1601  7900  0250  5D83
0000101560  8304  045E  0A82  7528  746E  6761  6567  2964
0000101600  0169  0007  837F  0084  5683  0104  0011  827F
0000101620  6D04  656B  0079  0682  6974  696D  676E  0102
0000101640  0016  4079  8304  0460  6183  8204  280A  6E75
0000101660  6174  6767  6465  6929  0D01  7F00  8483  8300
0000101700  0084  8483  8300  03F5  2901  7F00  0782  6261
0000101720  5F73  6572  006C  0582  6E75  7469  0173  0C82
0000101740  7073  6365  6169  5F6C  7566  636E  8202  6404
0000101760  7369  0470  1801  7900  8085  0200  6383  8304
0000102000  0464  0A82  7528  746E  6761  6567  2964  0169
0000102020  0007  837F  045F  5683  0104  0011  827F  6404
0000102040  7369  0070  0682  6974  696D  676E  0108  0001
0000102060  0180  0001  0180  0001  0180  0016  3079  8302
0000102100  0469  6A83  8204  280A  6E75  6174  6767  6465
0000102120  6929  0701  7F00  8283  8300  0081  1901  7F00
0000102140  0782  6574  6863  695F  0064  0B82  6574  6863
0000102160  725F  6165  6F73  046E  0101  8000  0101  8000
0000102200  0101  8000  0101  8000  0101  8000  0101  8000
*
0000102340  0101  8000  0101  8000  1601  7900  0250  8883
0000102360  8304  0489  0A82  7528  746E  6761  6567  2964
0000102400  0169  0007  837F  0081  5683  0104  001B  827F
0000102420  610E  7463  7669  7461  6465  665F  6E75  0063
0000102440  0682  6974  696D  676E  0102  0001  0180  0001
0000102460  0180  0001  0180  0001  0180  0001  0180  0001
*
0000102520  0180  0001  0180  0001  0180  0001  0180  001B
0000102540  2079  8309  0498  9983  8204  690F  755F  6D5F
0000102560  6773  705F  7261  6D61  745F  0169  001C  837F
0000102600  0081  8583  8300  0082  8683  8300  0088  8083
0000102620  8300  0084  C083  8300  00C0  6A01  7F00  0982
0000102640  5F69  5F75  6873  726F  0074  0A82  5F69  5F75
0000102660  7375  6F68  7472  8200  6908  755F  6C5F  6E6F
0000102700  0067  0982  5F69  5F75  6C75  6E6F  0067  0982
0000102720  5F69  5F75  6C66  616F  0074  0882  5F69  5F75
0000102740  6863  7261  8200  6909  755F  755F  6863  7261
0000102760  8200  6907  755F  735F  7274  8200  6909  755F
0000103000  625F  6F6C  6B63  0100  0019  3079  8302  049B
0000103020  9C83  8204  690D  6D5F  6773  705F  7261  6D61
0000103040  745F  0169  0007  837F  0085  9783  0104  0010
0000103060  827F  7404  7079  0065  0582  6176  756C  0265
0000103100  0101  8000  1C01  7900  9085  0900  9F83  8304
0000103120  04A0  0E82  5F69  736D  5F67  6568  6461  7265
0000103140  745F  0169  001C  837F  0081  8183  8300  0085
0000103160  8583  8300  0084  8583  8300  0085  8183  8300
0000103200  0085  4701  7F00  0482  5F71  6469  8200  7306
0000103220  756F  6372  0265  0382  6970  0464  0382  6974
0000103240  0664  0482  6572  7073  8208  7208  7365  5F70
0000103260  6974  0A64  0782  706F  635F  646F  0C65  0482
0000103300  7974  6570  820E  7304  7A69  1065  1501  7900
0000103320  C085  0200  A383  8304  04A4  0782  5F69  736D
0000103340  5F67  6974  0501  7800  8330  049A  0701  7F00
0000103360  9E83  8304  04A2  1701  7F00  0682  6568  6461
0000103400  7265  8200  700A  7261  6D61  6C5F  7369  1274
0000103420  0101  8000  0101  8000  0701  7A00  8373  04AR
0000103440  0082  0701  7A00  8373  04A1  0082  0101  8000
```

THU MAR 14 17:22:42 1991 CRV_IF.DLL PAGE 30, LINE 1712

```
0000103460  0101  8000  0101  8000  0101  8000  0101  8000
*
0000103700  0101  8000  0101  8000  0101  8000  1801  7900
0000103720  9085  0501  D383  8304  04D4  0A82  7528  746E
0000103740  6761  6567  2964  0169  0007  8578  00A8  8083
0000103760  0100  0010  837F  04D2  8183  8300  0085  D283
0000104000  8304  0085  2A01  7F00  0482  616E  656D  8200
0000104020  7404  7079  1665  0982  6573  6170  6172  6F74
0000104040  1872  0582  6873  6669  1A74  0482  6163  7370
0000104060  0130  0001  0180  0001  0180  0001  0180  0001
0000104100  0180  0001  0180  0001  0180  0001  0180  0001
*
0000104160  0180  0001  0180  0001  0180  00C1  0180  0007
0000104200  737A  D183  8204  0100  0001  0180  0001  0180
0000104220  0001  0180  0001  0180  0001  0180  0001  0180
0000104240  0001  0180  0001  0180  0001  0180  0005  7878
0000104260  8083  0100  0007  8578  00E0  8083  0100  0007
0000104300  8578  00C0  8083  0100  0007  8578  00B0  8083
0000104320  0100  0005  6878  8083  0100  0005  7078  8083
0000104340  0100  0007  8578  0088  8083  0100  0007  8578
0000104360  0080  8083  0100  0007  8578  00A8  8083  0100
0000104400  0007  8578  00C8  8083  0100  0007  8578  00E8
0000104420  8083  0100  0005  5078  8083  0100  0007  8578
0000104440  00B8  8083  0100  0005  6078  8083  0100  0007
0000104460  8578  0090  8083  0100  0007  8578  0098  8083
0000104500  0100  0007  8578  00A0  8083  0100  0007  8578
0000104520  00D8  8083  0100  0007  8578  0980  C083  0100
0000104540  0004  837F  04A8  0A01  7500  8380  0200  0173
0000104560  0583  0105  0001  0180  0005  7078  8083  0100
0000104600  0005  2078  8083  0100  0005  6078  8283  0100
0000104620  0005  2878  8083  0100  0005  3078  8083  0100
0000104640  0001  0180  0005  1878  8083  0100  0007  8578
0000104660  00F0  8083  0100  0007  8578  0118  8083  0100
0000104700  0001  0180  0007  8578  0148  8083  0100  0001
0000104720  0180  0001  0180  0001  0180  0012  6079  8305
0000104740  0517  1883  8205  5F06  6F69  7562  6966  1001
0000104760  7F00  C083  8300  0081  C083  8300  0080  8083
0000105000  0100  0027  827F  5F04  7470  0072  0482  635F
0000105020  746E  8204  5F05  6162  6573  8206  5F05  6C66
0000105040  6761  820A  5F05  6966  656C  010B  0001  0180
0000105060  0007  737A  1683  8205  0100  0001  0180  0001
0000105100  0180  0001  0180  0001  0180  0001  0180  0001
*
0000105400  0180  0001  0180  0001  0180  0004  837F  04A7
0000105420  0A01  7500  8380  0081  0173  4F83  0105  0007
0000105440  8578  0280  8083  0100  0005  1078  8083  0100
0000105460  0005  3878  8083  0500  0111  0000  1A00  0001
0000105500  D700  A405  1600  9800  0000  0400  630B  7672
0000105520  695F  5F66  6E69  7469  040A  FFFC  0081  7304
0000105540  6174  0174  1E02  A401  DB00  2A05  1600  1C00
0000105560  0000  0400  630F  7672  735F  7465  655F  6578
0000105600  7563  6574  040A  0006  0085  6604  616C  0167
0000105620  2402  CE01  DD00  BF05  1604  B100  00D4  0400
0000105640  6315  7672  6D5F  6C75  6974  735F  6E65  5F64
0000105660  6F74  635F  7672  040A  000A  05CA  6C04  7369
0000105700  0E74  0604  AB00  0805  6572  7073  6E6F  6573
0000105720  040C  FFFA  00C0  5F06  745F  7079  0F65  EC04
0000105740  85FF  0900  5F5F  7862  745F  7079  0D65  DC04
0000105760  29FF  0702  5F5F  7270  6E69  0B74  D204  02FF
```

THU MAR 14 17:22:42 1991 CRV_IF.DLL PAGE 31, LINE 1771

| | | | | | | | | |
|---|---|---|---|---|---|---|---|---|
| 0000106000 | 0502 | 5F5F | 766C | 0D6C | E004 | E1FF | 0705 | 5F5F |
| 0000106020 | 6C63 | 636F | 0D6B | F204 | C0FF | 0700 | 5F5F | 7473 |
| 0000106040 | 6361 | 0E6B | D804 | 81FF | 0800 | 5F5F | 6572 | 7674 |
| 0000106060 | 6C61 | 040A | FFDA | 0081 | 7304 | 6174 | 1274 | EE04 |
| 0000106100 | 82FF | 0C00 | 7562 | 7973 | 745F | 6D69 | 6F65 | 7475 |
| 0000106120 | 040B | FFCE | 05AC | 6905 | 6D5F | 6773 | 0412 | FFF6 |
| 0000106140 | 05AC | 640C | 6D75 | 725F | 7365 | 6F70 | 736E | 0E65 |
| 0000106160 | 9A05 | 0500 | E000 | 0605 | 5F5F | 7566 | 636E | 0201 |
| 0000106200 | 011E | 058D | 05E5 | 0057 | 0016 | 0049 | 0000 | 0FU4 |
| 0000106220 | 7263 | 5F76 | 6573 | 646E | 745F | 5F6F | 7263 | 1276 |
| 0000106240 | 1004 | 8100 | 0C00 | 6F63 | 6D6D | 6E61 | 5F64 | 7974 |
| 0000106260 | 6570 | 0409 | 000C | 00C0 | 6203 | 6675 | 040A | 000A |
| 0000106300 | 0081 | 7304 | 7A69 | 0E65 | 0604 | AB00 | 0805 | 6572 |
| 0000106320 | 7073 | 6E6F | 6573 | 0411 | FFF2 | 05C9 | 630B | 7672 |
| 0000106340 | 635F | 6D6F | 616D | 646E | 0201 | 011B | 05E4 | 05E6 |
| 0000106360 | 0402 | 0016 | 03F6 | 0000 | 0C04 | 7263 | 5F76 | 6669 |
| 0000106400 | 615F | 6F62 | 7472 | 040C | FFFA | 00C0 | 5F06 | 745F |
| 0000106420 | 7079 | 0F65 | F004 | 85FF | 0900 | 5F5F | 7862 | 745F |
| 0000106440 | 7079 | 0D65 | E004 | 29FF | 0702 | 5F5F | 7270 | 6E69 |
| 0000106460 | 0B74 | D604 | 02FF | 0502 | 5F5F | 766C | 0D6C | E404 |
| 0000106500 | E1FF | 0705 | 5F5F | 6C63 | 636F | 0D6B | F204 | C0FF |
| 0000106520 | 0700 | 5F5F | 7473 | 6361 | 0E6B | DC04 | 81FF | 0800 |
| 0000106540 | 5F5F | 6572 | 7674 | 6C61 | 040A | FFDE | 0081 | 7304 |
| 0000106560 | 6174 | 0B74 | BE04 | A5FF | 0505 | 5F69 | 736D | 1267 |
| 0000106600 | F604 | ACFF | 0C05 | 7564 | 5F6D | 6572 | 7073 | 6E6F |
| 0000106620 | 6573 | 050E | 00E0 | 0005 | 0309 | 5F06 | 665F | 6E75 |
| 0000106640 | 0163 | 0502 | 000D | 1A00 | 0E00 | D605 | 0513 | 8500 |
| 0000106660 | 0600 | 7069 | 5F63 | 6469 | 0516 | 13D0 | 0005 | 0085 |
| 0000106700 | 650E | 6578 | 7563 | 6574 | 6F5F | 5F6E | 7573 | 1474 |
| 0000106720 | D205 | 0513 | 8200 | 0C00 | 6572 | 7073 | 745F | 6D69 |
| 0000106740 | 6F65 | 7475 | 050F | 0062 | 0005 | 00C0 | 4207 | 785F |
| 0000106760 | 6946 | 656C | 050F | 0066 | 0005 | 00C0 | 4207 | 785F |
| 0000107000 | 6150 | 6B63 | 0514 | 0000 | 0000 | 0081 | 420C | 5F78 |
| 0000107020 | 6544 | 7562 | 4D67 | 646F | 1465 | 0005 | 0000 | 8100 |
| 0000107040 | 0C00 | 7842 | 545F | 6D69 | 7365 | 6F4D | 6564 | 0510 |
| 0000107060 | 0000 | 0000 | 0081 | 4208 | 5F78 | 5F42 | 6973 | 0567 |
| 0000107100 | 0111 | 0000 | 1C00 | E601 | 0609 | DD05 | 1607 | CF00 |
| 0000107120 | 0007 | 0400 | 700D | 6972 | 746E | 635F | 7672 | 6D5F |
| 0000107140 | 6773 | 0409 | 0006 | 04AB | 6D03 | 6773 | 040C | FFF6 |
| 0000107160 | 00C0 | 5F06 | 745F | 7079 | 0F65 | E404 | 85FF | 0900 |
| 0000107200 | 5F5F | 7862 | 745F | 7079 | 0D65 | D204 | 02FF | 0702 |
| 0000107220 | 5F5F | 7270 | 6E69 | 0B74 | CA04 | CCFF | 0503 | 5F5F |
| 0000107240 | 766C | 0D6C | D804 | 0AFF | 0705 | 5F5F | 6C63 | 636F |
| 0000107260 | 0D6B | F204 | C0FF | 0700 | 5F5F | 7473 | 6361 | 0E6B |
| 0000107300 | D004 | 81FF | 0800 | 5F5F | 6572 | 7674 | 6C61 | 0408 |
| 0000107320 | FFD6 | 0080 | 6302 | 0E68 | E604 | 0BFF | 0805 | 656B |
| 0000107340 | 5F79 | 616E | 656D | 040D | FFEC | 0081 | 6F07 | 5F70 |
| 0000107360 | 6F63 | 6564 | 0407 | FFFA | 00C0 | 7001 | 0409 | FFEE |
| 0000107400 | 04E8 | 6B03 | 7965 | 050E | 0964 | 0005 | 0508 | 5F06 |
| 0000107420 | 665F | 6E75 | 0163 | 1B02 | C301 | 5011 | 2505 | 1605 |
| 0000107440 | 1700 | 0005 | 0400 | 730C | 6163 | 5F6E | 7263 | 5F76 |
| 0000107460 | 736D | 0B67 | 0604 | A700 | 0504 | 736D | 5F67 | 0870 |
| 0000107500 | 9A04 | 51FF | 0205 | 7473 | 040D | FF74 | 0459 | 6B07 |
| 0000107520 | 7965 | 6D5F | 6773 | 040E | FF7E | 045C | 6D08 | 656B |
| 0000107540 | 5F79 | 736D | 0D67 | EA04 | 62FF | 0704 | 6F6C | 5F63 |
| 0000107560 | 736D | 0E67 | FA04 | 82FF | 0800 | 7274 | 6361 | 5F6B |
| 0000107600 | 6469 | 040E | FF94 | 0468 | 7408 | 6365 | 5F68 | 736D |
| 0000107620 | 1167 | 8A04 | 87FF | 0B04 | 6F73 | 7466 | 656B | 5F79 |
| 0000107640 | 736D | 0A67 | 8804 | 81FF | 0400 | 7473 | 7461 | 050B |

THU MAR 14 17:22:42 1991 CRV_IF.DLL PAGE 32, LINE 1830

| | | | | | | | | |
|---|---|---|---|---|---|---|---|---|
| 0000107660 | 0A92 | 0005 | 051A | 6903 | 666E | 050B | 13D8 | 0005 |
| 0000107700 | 04A8 | 6D03 | 6773 | 0B08 | 1233 | 0300 | 6F74 | 0170 |
| 0000107720 | 0502 | 000D | 1A00 | 1400 | 0005 | 0000 | 8100 | 0C00 |
| 0000107740 | 7842 | 445F | 6265 | 6775 | 6F4D | 6564 | 0514 | 0000 |
| 0000107760 | 0000 | 0081 | 420C | 5F78 | 6954 | 656D | 4D73 | 646F |
| 0000110000 | 1065 | 0005 | 0000 | 8100 | 0800 | 7842 | 425F | 735F |
| 0000110020 | 6769 | 0514 | 0834 | 0005 | 0504 | 630C | 7672 | 635F |
| 0000110040 | 646F | 5F65 | 7473 | 0F72 | 2C05 | 0508 | C000 | 0700 |
| 0000110060 | 5F42 | 4678 | 6C69 | 0F65 | 3005 | 05C8 | C000 | 0700 |
| 0000110100 | 5F42 | 5078 | 6361 | 086B | 7263 | 5F76 | 6669 | 632E |
| 0000110120 | 0001 | 0047 | 004A | 0000 | 0054 | 0016 | 0056 | 003F |
| 0000110140 | 0057 | 005E | 0058 | 0068 | 005A | 006E | 005B | 008C |
| 0000110160 | 0064 | 0092 | 0065 | 0098 | 0077 | 00A4 | 0078 | 00BA |
| 0000110200 | 0079 | 00C0 | 008D | 00CE | 008E | 00E4 | 008F | 0177 |
| 0000110220 | 0092 | 017C | 0095 | 0184 | 0097 | 018C | 0098 | 0197 |
| 0000110240 | 009A | 01A0 | 009B | 01AB | 009C | 01B9 | 009E | 01D9 |
| 0000110260 | 009F | 0256 | 00A0 | 025F | 00A1 | 026C | 00A2 | 0275 |
| 0000110300 | 00A3 | 0286 | 00AC | 02C5 | 00AE | 02CF | 00B0 | 0332 |
| 0000110320 | 00B2 | 033C | 00B3 | 0362 | 00B6 | 0368 | 00BC | 036B |
| 0000110340 | 00C0 | 036E | 00C4 | 0383 | 00C7 | 03A3 | 00C8 | 03C6 |
| 0000110360 | 00C9 | 0443 | 00CB | 044F | 00CE | 04BC | 00D0 | 04CD |
| 0000110400 | 00D2 | 04D9 | 00D5 | 04EE | 00D6 | 04FF | 00D8 | 0502 |
| 0000110420 | 00D9 | 057F | 00ED | 058D | 00F0 | 05A3 | 00F1 | 05A9 |
| 0000110440 | 00F2 | 05AF | 00F3 | 05BB | 00F5 | 05C3 | 00F6 | 05D6 |
| 0000110460 | 0109 | 05E4 | 010A | 05FA | 010F | 068D | 0110 | 0692 |
| 0000110500 | 0111 | 0697 | 0113 | 069C | 0115 | 06FE | 0116 | 0708 |
| 0000110520 | 011C | 0785 | 011D | 07A4 | 011E | 07BD | 011F | 083B |
| 0000110540 | 0126 | 08C5 | 0127 | 08DF | 0129 | 095D | 012A | 09DA |
| 0000110560 | 7007 | 6972 | 746E | 632E | 0001 | 005F | 0030 | 09E6 |
| 0000110600 | 0031 | 09FC | 003C | 0A8E | 003D | 0A9B | 003E | 0AA1 |
| 0000110620 | 003F | 0AAB | 0040 | 0ABA | 0041 | 0ABD | 0043 | 0ACC |
| 0000110640 | 0046 | 0AD2 | 0049 | 0B3F | 004C | 0B42 | 004D | 0B4B |
| 0000110660 | 004E | 0B68 | 004F | 0B7B | 0050 | 0B7E | 0051 | 0B8F |
| 0000110700 | 0057 | 0C16 | 0059 | 0C19 | 005D | 0C8B | 005F | 0C8E |
| 0000110720 | 0064 | 0D05 | 0066 | 0D08 | 0068 | 0D65 | 006A | 0D68 |
| 0000110740 | 006C | 0DC5 | 006E | 0DC8 | 0071 | 0E30 | 0073 | 0E33 |
| 0000110760 | 0075 | 0E8C | 0077 | 0E8F | 0079 | 0EE8 | 007B | 0EEB |
| 0000111000 | 007D | 0F55 | 007F | 0F58 | 0081 | 0FB7 | 0083 | 0FBA |
| 0000111020 | 0085 | 1019 | 0087 | 101C | 0088 | 1025 | 0089 | 1087 |
| 0000111040 | 008A | 108A | 008C | 10E1 | 008D | 10E4 | 008E | 1152 |
| 0000111060 | 008F | 11B5 | 0096 | 11C3 | 00A2 | 11D9 | 00A3 | 11E5 |
| 0000111100 | 00A5 | 11FC | 00A6 | 1219 | 00A7 | 121F | 00A8 | 1229 |
| 0000111120 | 00AC | 1233 | 00AD | 1252 | 00AE | 1262 | 00AF | 1279 |
| 0000111140 | 00B2 | 127C | 00B3 | 1295 | 00B5 | 129F | 00B6 | 12C8 |
| 0000111160 | 00B9 | 1310 | 00BA | 132C | 00BC | 1336 | 00BD | 135F |
| 0000111200 | 00C0 | 13A7 | 00C1 | 13C3 | 00C3 | 13CD | 00C4 | 13F4 |
| 0000111220 | 00C7 | 143C | 00C8 | 1458 | 00CB | 1462 | 00CC | 1480 |
| 0000111240 | 00CF | 14C7 | 00D0 | 14E3 | 00D1 | 14ED | 00D2 | 1506 |
| 0000111260 | 00D5 | 154D | 00D6 | 1569 | 00D7 | 1573 | 00D8 | 1591 |
| 0000111300 | 00E2 | 15D8 | 00E6 | 15F4 | 00E7 | 161A | 00E8 | 1624 |
| 0000111320 | 00EB | 166B | 00EC | 1687 | 00F0 | 1691 | 00F1 | 169D |
| 0000111340 | 00F2 | 16B1 | 00F4 | 16B4 | 00F5 | 16B7 | 00F7 | 16C3 |
| 0000111360 | 00F8 | 16D4 | 00F9 | 16DA | 0C00 | 6C6C | 6269 | 6463 |
| 0000111400 | 6C6C | 6C2E | 6269 | 7309 | 7465 | 7075 | 6C2E | 6269 |
| 0000111420 | 6F07 | 3273 | 6C2E | 6269 | 6906 | 2E68 | 696C | 0A62 |
| 0000111440 | 626C | 7069 | 746D | 6C2E | 6269 | 0083 | 0101 | 0001 |
| 0000111460 | 0008 | 0000 | 002C | 0102 | 0001 | 05DA | 0000 | 006D |
| 0000111500 | 0103 | 0001 | 1031 | 0000 | 1227 | 0104 | 0001 | 346E |
| 0000111520 | 0000 | 0308 | 0109 | 0001 | 397E | 0000 | 0129 | 0101 |

THU MAR 14 17:22:42 1991 CRV_IF.DLL PAGE 33, LINE 1889

| | | | | | | | | |
|---|---|---|---|---|---|---|---|---|
| 0000111540 | 0002 | 0034 | 0000 | 002B | 0102 | 0002 | 0647 | 0000 |
| 0000111560 | 003B | 0103 | 0002 | 2258 | 0000 | 1216 | 0104 | 0002 |
| 0000111600 | 3776 | 0000 | 0208 | 0109 | 0002 | 3AA7 | 0000 | 0188 |
| 0000111620 | 0101 | 0003 | 005F | 0000 | 0018 | 0102 | 0003 | 0682 |
| 0000111640 | 0000 | 0152 | 0101 | 0004 | 0077 | 0000 | 001B | 0102 |
| 0000111660 | 0004 | 07D4 | 0000 | 01D2 | 0101 | 0005 | 0092 | 0000 |
| 0000111700 | 001C | 0102 | 0005 | 09A6 | 0000 | 0035 | 0101 | 0006 |
| 0000111720 | 00AE | 0000 | 0017 | 0102 | 0006 | 09DB | 0000 | 000F |
| 0000111740 | 0101 | 0007 | 00C5 | 0000 | 0017 | 0102 | 0007 | 09EA |
| 0000111760 | 0000 | 0033 | 0101 | 0008 | 00DC | 0000 | 001A | 0102 |
| 0000112000 | 0008 | 0A1D | 0000 | 0010 | 0101 | 0009 | 00F6 | 0000 |
| 0000112020 | 001C | 0102 | 0009 | 0A2D | 0000 | 0025 | 0101 | 000A |
| 0000112040 | 0112 | 0000 | 001B | 0102 | 000A | 0A52 | 0000 | 003F |
| 0000112060 | 0101 | 000B | 012D | 0000 | 0015 | 0102 | 000B | 0A91 |
| 0000112100 | 0000 | 0020 | 0101 | 000C | 0142 | 0000 | 0014 | 0102 |
| 0000112120 | 000C | 0AB1 | 0000 | 001C | 0101 | 000D | 0156 | 0000 |
| 0000112140 | 0015 | 0102 | 000D | 0ACD | 0000 | 000E | 0101 | 000E |
| 0000112160 | 016B | 0000 | 0015 | 0102 | 000E | 0ADB | 0000 | 000E |
| 0000112200 | 0101 | 000F | 0180 | 0000 | 0018 | 0102 | 000F | 0AE9 |
| 0000112220 | 0000 | 000F | 0101 | 0010 | 0198 | 0000 | 0014 | 0102 |
| 0000112240 | 0010 | 0AF8 | 0000 | 0037 | 0101 | 0011 | 01AC | 0000 |
| 0000112260 | 0018 | 0102 | 0011 | 0B2F | 0000 | 000F | 01C1 | 0012 |
| 0000112300 | 01C4 | 0000 | 0018 | 0102 | 0012 | 0B3E | 0000 | 000F |
| 0000112320 | 0101 | 0013 | 01DC | 0000 | 0019 | 0102 | 0013 | 0B4D |
| 0000112340 | 0000 | 0010 | 0101 | 0014 | 01F5 | 0000 | 0018 | 0102 |
| 0000112360 | 0014 | 0B5D | 0000 | 000F | 0101 | 0015 | 020D | 0000 |
| 0000112400 | 0014 | 0102 | 0015 | 0B6C | 0000 | 0011 | 0101 | 0016 |
| 0000112420 | 0221 | 0000 | 0018 | 0102 | 0016 | 0B7D | 0000 | 001C |
| 0000112440 | 0101 | 0017 | 0239 | 0000 | 0015 | 0102 | 0017 | 0B99 |
| 0000112460 | 0000 | 0030 | 0101 | 0018 | 024E | 0000 | 0014 | 0102 |
| 0000112500 | 0018 | 0BC9 | 0000 | 000E | 0101 | 0019 | 0262 | 0000 |
| 0000112520 | 0017 | 0102 | 0019 | 0BD7 | 0000 | 000F | 0101 | 001A |
| 0000112540 | 0279 | 0000 | 0015 | 0102 | 001A | 0BE6 | 0000 | 0012 |
| 0000112560 | 0101 | 001B | 028E | 0000 | 0015 | 0102 | 001B | 0BF8 |
| 0000112600 | 0000 | 0020 | 0101 | 001C | 02A3 | 0000 | 001A | 0102 |
| 0000112620 | 001C | 0C18 | 0000 | 000D | 0101 | 001D | 02BD | 0000 |
| 0000112640 | 001A | 0102 | 001D | 0C25 | 0000 | 001E | 0101 | 001E |
| 0000112660 | 02D7 | 0000 | 0019 | 0102 | 001E | 0C43 | 0000 | 0031 |
| 0000112700 | 0101 | 001F | 02F0 | 0000 | 0019 | 0102 | 001F | 0C74 |
| 0000112720 | 0000 | 000C | 0101 | 0020 | 0309 | 0000 | 0016 | 0102 |
| 0000112740 | 0020 | 0C80 | 0000 | 001E | 0101 | 0021 | 031F | 0000 |
| 0000112760 | 0018 | 0102 | 0021 | 0C9E | 0000 | 001D | 0101 | 0022 |
| 0000113000 | 0337 | 0000 | 0017 | 0102 | 0022 | 0CBB | 0000 | 001F |
| 0000113020 | 0101 | 0023 | 034E | 0000 | 0015 | 0102 | 0023 | 0CDA |
| 0000113040 | 0000 | 001B | 0101 | 0024 | 0363 | 0000 | 0018 | 0102 |
| 0000113060 | 0024 | 0CF5 | 0000 | 0042 | 0101 | 0025 | 037B | 0000 |
| 0000113100 | 0016 | 0102 | 0025 | 0D37 | 0000 | 000E | 0101 | 0026 |
| 0000113120 | 0391 | 0000 | 0018 | 0102 | 0026 | 0D45 | 0000 | 0010 |
| 0000113140 | 0101 | 0027 | 03A9 | 0000 | 0018 | 0102 | 0027 | 0D55 |
| 0000113160 | 0000 | 0010 | 0101 | 0028 | 03C1 | 0000 | 0019 | 0102 |
| 0000113200 | 0028 | 0D65 | 0000 | 0012 | 0101 | 0029 | 03DA | 0000 |
| 0000113220 | 0018 | 0102 | 0029 | 0D77 | 0000 | 0041 | 0101 | 002A |
| 0000113240 | 03F2 | 0000 | 0017 | 0102 | 002A | 0DB8 | 0000 | 000F |
| 0000113260 | 0101 | 002B | 0409 | 0000 | 0017 | 0102 | 002B | 0DC7 |
| 0000113300 | 0000 | 000E | 0101 | 002C | 0420 | 0000 | 0017 | 0102 |
| 0000113320 | 002C | 0DD5 | 0000 | 000E | 0101 | 002D | 0437 | 0000 |
| 0000113340 | 0017 | 0102 | 002D | 0DE3 | 0000 | 000E | 0101 | 002E |
| 0000113360 | 044E | 0000 | 0017 | 0102 | 002E | 0DF1 | 0000 | 000E |
| 0000113400 | 0101 | 002F | 0465 | 0000 | 0018 | 0102 | 002F | 0DFF |

THU MAR 14 17:22:42 1991 CRV_IF.DLL PAGE 34, LINE 1948

| | | | | | | | | |
|---|---|---|---|---|---|---|---|---|
| 0000113420 | 0000 | 000F | 0101 | 0030 | 047D | 0000 | 0015 | 0102 |
| 0000113440 | 0030 | 0E0E | 0000 | 000C | 0101 | 0031 | 0492 | 0000 |
| 0000113460 | 0019 | 0102 | 0031 | 0E1A | 0000 | 0056 | 0101 | 0032 |
| 0000113500 | 04AB | 0000 | 0016 | 0102 | 0032 | 0E70 | 0000 | 001D |
| 0000113520 | 0101 | 0033 | 04C1 | 0000 | 0015 | 0102 | 0033 | 0E8D |
| 0000113540 | 0000 | 000E | 0101 | 0035 | 04D6 | 0000 | 001A | 0102 |
| 0000113560 | 0035 | 0E9B | 0000 | 00AB | 0101 | 0036 | 04F0 | 0000 |
| 0000113600 | 001D | 0102 | 0036 | 0F46 | 0000 | 0024 | 0101 | 0037 |
| 0000113620 | 050D | 0000 | 0017 | 0102 | 0037 | 0F6A | 0000 | 000E |
| 0000113640 | 0101 | 0038 | 0524 | 0000 | 0018 | 0102 | 0038 | 0F78 |
| 0000113660 | 0000 | 000E | 0101 | 0039 | 053C | 0000 | 0018 | 0102 |
| 0000113700 | 0039 | 0F86 | 0000 | 000E | 0101 | 003A | 0554 | 0000 |
| 0000113720 | 0015 | 0102 | 003A | 0F94 | 0000 | 001F | 0101 | 003B |
| 0000113740 | 0569 | 0000 | 001B | 0102 | 003B | 0FB3 | 0000 | 001C |
| 0000113760 | 0101 | 003C | 0584 | 0000 | 0016 | 0102 | 003C | 0FCF |
| 0000114000 | 0000 | 0023 | 0101 | 003D | 059A | 0000 | 0016 | 0102 |
| 0000114020 | 003D | 0FF2 | 0000 | 0011 | 0101 | 003E | 05B0 | 0000 |
| 0000114040 | 0015 | 0102 | 003E | 1003 | 0000 | 001F | 0101 | 003F |
| 0000114060 | 05C5 | 0000 | 0015 | 0102 | 003F | 1022 | 0000 | 000F |
| 0000114100 | 0106 | 0000 | 3C2F | 0000 | 0032 | 424E | 3230 | 4189 |
| 0000114120 | 0000 | | | | | | | |
| 0000114122 | | | | | | | | |

THU MAR 14 17:25:16 1991 CRV_IPS.DLL PAGE 1, LINE 1

| | | | | | | | | |
|---|---|---|---|---|---|---|---|---|
| 0000000000 | 5A4D | 01A7 | 0171 | 0000 | 0004 | 0000 | FFFF | 0000 |
| 0000000020 | 00B6 | 0000 | 0000 | 0000 | 0040 | 0000 | 0000 | 0000 |
| 0000000040 | 0000 | 0000 | 0000 | 0000 | 0000 | 0000 | 0000 | 0000 |
| 0000000060 | 0000 | 0000 | 0000 | 0000 | 0000 | 0000 | 0080 | 0000 |
| 0000000100 | 1F0E | 0EBA | B400 | CD09 | B821 | 4C01 | 21CD | 6854 |
| 0000000120 | 7369 | 7020 | 6F72 | 7267 | 6D61 | 6320 | 6E61 | 6F6E |
| 0000000140 | 2074 | 7572 | 206E | 6E69 | 4420 | 534F | 6D20 | 646F |
| 0000000160 | 2E65 | 0D0D | 240A | 0000 | 0000 | 0000 | 0000 | 0000 |
| 0000000200 | 454E | 0A05 | 04EA | 00AE | AD75 | 2F7F | 8006 | 0008 |
| 0000000220 | 1000 | 0000 | 6E88 | 0003 | 0000 | 0000 | 0008 | 0007 |
| 0000000240 | 000F | 0040 | 0080 | 0080 | 0423 | 0431 | 0618 | 0000 |
| 0000000260 | 0000 | 0004 | 0000 | 0001 | 0000 | 0000 | 0000 | 0000 |
| 0000000300 | 0063 | B92C | 0D00 | B92D | 0C07 | FAB2 | 0D00 | FAB2 |
| 0000000320 | 1BC6 | EC89 | 0D00 | EC8A | 2AAC | 0DC6 | 0C01 | 0100 |
| 0000000340 | 0000 | 0000 | 0C01 | 0850 | 2AB9 | 022C | 0C01 | 023A |
| 0000000360 | 0000 | 0000 | 0C01 | 1C98 | 2ADC | 33BD | 0D01 | 5650 |
| 0000000400 | 6307 | 7672 | 695F | 7370 | 0000 | 4310 | 5652 | 435F |
| 0000000420 | 5041 | 5554 | 4552 | 535F | 4E59 | 0143 | 1400 | 5243 |
| 0000000440 | 5F56 | 5544 | 504D | 495F | 4F43 | 534E | 545F | 5F4F |
| 0000000460 | 5047 | 0002 | 4314 | 5652 | 435F | 554F | 544E | 495F |
| 0000000500 | 4F43 | 5F4E | 4154 | 4C42 | 0345 | 0D00 | 5243 | 5F56 |
| 0000000520 | 4E49 | 5449 | 495F | 4F43 | 044E | 1600 | 5243 | 5F56 |
| 0000000540 | 4843 | 4345 | 5F4B | 5748 | 535F | 4154 | 4942 | 494C |
| 0000000560 | 5954 | 0005 | 430F | 5652 | 565F | 5245 | 4649 | 5F59 |
| 0000000600 | 5953 | 434E | 0006 | 4318 | 5652 | 475F | 5445 | 4C5F |
| 0000000620 | 434F | 5441 | 524F | 505F | 534F | 5449 | 4F49 | 074E |
| 0000000640 | 0F00 | 5243 | 5F56 | 4143 | 5450 | 5255 | 5F45 | 4953 |
| 0000000660 | 0847 | 0C00 | 5243 | 5F56 | 4E45 | 5F44 | 4349 | 4E4F |
| 0000000700 | 0009 | 4318 | 5652 | 535F | 5445 | 4D5F | 554F | 4553 |
| 0000000720 | 545F | 4152 | 4B43 | 4D5F | 444F | 0A45 | 0F00 | 5243 |
| 0000000740 | 5F56 | 4445 | 5449 | 465F | 4C49 | 4554 | 0B52 | 0E00 |
| 0000000760 | 5243 | 5F56 | 4553 | 5F54 | 4946 | 544C | 5245 | 000C |
| 0000001000 | 490D | 5350 | 4F5F | 4550 | 5F4E | 4554 | 5453 | 000D |
| 0000001020 | 4310 | 5652 | 445F | 5349 | 4C50 | 5941 | 4D5F | 5341 |
| 0000001040 | 0E4B | 1600 | 5243 | 5F56 | 4E49 | 5449 | 4C5F | 434F |
| 0000001060 | 5441 | 524F | 545F | 4152 | 4B43 | 000F | 4312 | 5652 |
| 0000001100 | 435F | 5041 | 5554 | 4552 | 535F | 5243 | 4545 | 104E |
| 0000001120 | 1000 | 5243 | 5F56 | 4556 | 4952 | 5946 | 495F | 414D |
| 0000001140 | 4547 | 0011 | 431C | 5652 | 445F | 5349 | 4C50 | 5941 |
| 0000001160 | 4D5F | 4C55 | 4954 | 4C50 | 5F45 | 4353 | 4552 | 4E45 |
| 0000001200 | 1253 | 1900 | 5243 | 5F56 | 4954 | 454D | 465F | 4F52 |
| 0000001220 | 5F4D | 414C | 5453 | 435F | 4148 | 474E | 1345 | 0D00 |
| 0000001240 | 5243 | 5F56 | 4552 | 4553 | 5F54 | 4F41 | 1449 | 0D00 |
| 0000001260 | 5347 | 5F50 | 4553 | 5F54 | 4150 | 4152 | 154D | 0C00 |
| 0000001300 | 5347 | 5F50 | 4341 | 4954 | 4156 | 4554 | 0016 | 4913 |
| 0000001320 | 5350 | 435F | 4F4C | 4553 | 445F | 4649 | 5F46 | 4554 |
| 0000001340 | 5453 | 0017 | 430E | 5652 | 505F | 5455 | 465F | 4C49 |
| 0000001360 | 4554 | 1852 | 1300 | 5243 | 5F56 | 4552 | 4441 | 535F |
| 0000001400 | 4143 | 454C | 465F | 4E55 | 1943 | 1000 | 5243 | 5F56 |
| 0000001420 | 4F4D | 4556 | 4C5F | 434F | 5441 | 524F | 001A | 4318 |
| 0000001440 | 5652 | 4C5F | 4145 | 4E52 | 535F | 4143 | 454C | 465F |
| 0000001460 | 4E55 | 5443 | 4F49 | 1B4E | 0E00 | 5049 | 5F53 | 4C43 |
| 0000001500 | 534F | 5F45 | 4554 | 5453 | 001C | 4316 | 5652 | 4C5F |
| 0000001520 | 434F | 5441 | 4F49 | 5F4E | 4F4E | 5F54 | 4156 | 494C |
| 0000001540 | 1D44 | 0E00 | 5347 | 5F50 | 4E49 | 5449 | 4C49 | 4149 |
| 0000001560 | 455A | 001E | 4315 | 5652 | 455F | 444E | 4C5F | 434F |
| 0000001600 | 5441 | 524F | 545F | 4152 | 4B43 | 001F | 4314 | 5652 |
| 0000001620 | 445F | 5349 | 5F50 | 5543 | 5252 | 4E45 | 5F54 | 4F41 |
| 0000001640 | 2049 | 1200 | 5049 | 5F53 | 504F | 4E45 | 445F | 4649 |

THU MAR 14 17:25:16 1991 CRV_IPS.DLL PAGE 2, LINE 60

| | | | | | | | | |
|---|---|---|---|---|---|---|---|---|
| 0000001660 | 5F46 | 4554 | 5453 | 0021 | 4317 | 5652 | 535F | 4C45 |
| 0000001700 | 4345 | 5F54 | 5247 | 5041 | 4948 | 5F43 | 4F4D | 4544 |
| 0000001720 | 0022 | 4310 | 5652 | 535F | 4F54 | 5F50 | 4944 | 5053 |
| 0000001740 | 414C | 2359 | 1800 | 5243 | 5F56 | 4143 | 5450 | 5255 |
| 0000001760 | 5F45 | 4F4C | 4143 | 4F54 | 5F52 | 5953 | 434E | 0024 |
| 0000002000 | 4311 | 5652 | 555F | 4450 | 5441 | 5F45 | 4353 | 4552 |
| 0000002020 | 4E45 | 0025 | 470E | 5053 | 435F | 454C | 4E41 | 4D5F |
| 0000002040 | 5341 | 264B | 1400 | 4E49 | 5449 | 475F | 4F4C | 4142 |
| 0000002060 | 5F4C | 5049 | 5F53 | 4144 | 4154 | 0027 | 4310 | 5652 |
| 0000002100 | 445F | 5349 | 4C50 | 5941 | 445F | 4649 | 2846 | 0D00 |
| 0000002120 | 5347 | 5F50 | 4554 | 4D52 | 4E49 | 5441 | 2945 | 1000 |
| 0000002140 | 5243 | 5F56 | 4F43 | 544E | 4F52 | 5F4C | 4349 | 4E4F |
| 0000002160 | 002A | 4311 | 5652 | 445F | 4645 | 4E49 | 5F45 | 4946 |
| 0000002200 | 544C | 5245 | 002B | 4319 | 5652 | 445F | 5349 | 4C50 |
| 0000002220 | 5941 | 545F | 474F | 4C47 | 5F45 | 4353 | 4552 | 4E45 |
| 0000002240 | 002C | 0100 | 0A00 | 1300 | 1C00 | A300 | AB00 | B300 |
| 0000002260 | 0000 | 4408 | 534F | 4143 | 4C4C | 0853 | 424B | 4344 |
| 0000002300 | 4C41 | 534C | 5608 | 4F49 | 4143 | 4C4C | 0653 | 626C |
| 0000002320 | 7069 | 746D | 5F0D | 5842 | 445F | 4245 | 4755 | 4F4D |
| 0000002340 | 4544 | 5FDD | 5842 | 545F | 4D49 | 5345 | 4F4D | 4544 |
| 0000002360 | 5F09 | 5842 | 425F | 535F | 4749 | 5F0E | 5842 | 445F |
| 0000002400 | 4245 | 4755 | 4E45 | 4554 | 0F52 | 425F | 5F58 | 4544 |
| 0000002420 | 5542 | 5247 | 5445 | 5255 | 0E4E | 425F | 5F58 | 4F56 |
| 0000002440 | 4449 | 4552 | 5554 | 4E52 | 5F0E | 5842 | 445F | 4245 |
| 0000002460 | 4755 | 5250 | 4E49 | 0D54 | 425F | 5F58 | 4544 | 5542 |
| 0000002500 | 5047 | 4952 | 0E46 | 425F | 5F58 | 4150 | 4B43 | 4946 |
| 0000002520 | 544C | 5245 | 6307 | 7672 | 6F5F | 736E | 6307 | 7672 |
| 0000002540 | 735F | 6974 | 4405 | 5F42 | 4950 | 0201 | 6201 | 0315 |
| 0000002560 | 0103 | 599E | 7701 | 015B | 2ACE | 0204 | D901 | 018A |
| 0000002600 | 6A78 | 5501 | 0199 | 1FD2 | 0301 | 2801 | 012B | 0102 |
| 0000002620 | 9AEB | 0104 | 1101 | 0101 | 025A | 0301 | 01B8 | 0D78 |
| 0000002640 | 0203 | DA01 | 0199 | 0000 | 6F01 | 0129 | 0101 | 3084 |
| 0000002660 | 0201 | 1B01 | 0529 | 0101 | 01EB | A201 | 01B6 | AB72 |
| 0000002700 | D301 | 01B7 | 03C8 | 0203 | EC01 | 018E | 98E5 | 1C01 |
| 0000002720 | 018C | 0101 | B7A3 | 0201 | BA01 | 019A | 0101 | AA5A |
| 0000002740 | 0201 | 4A01 | 049A | 0101 | 0B24 | 3A01 | 01B8 | 06D0 |
| 0000002760 | AC01 | 0169 | 0102 | 1821 | 0105 | D201 | 0178 | B64C |
| 0000003000 | C801 | 01A4 | 41A2 | 4201 | 01AB | 0103 | 2B8F | 0102 |
| 0000003020 | 0001 | 0100 | 5F07 | 0000 | 630B | 7672 | 695F | 7370 |
| 0000003040 | 4420 | 4C4C | 0000 | 0000 | 0000 | 0000 | 0000 | 0000 |
| 0000003060 | 581E | 4590 | 8B55 | 1EEC | D88E | EC81 | 0008 | 5657 |
| 0000003100 | B81E | FFFF | D88E | 5EC4 | 2606 | 478B | A37C | 3416 |
| 0000003120 | 5EC4 | 2606 | 7F83 | 007C | 0374 | 66E9 | 8300 | 483E |
| 0000003140 | 0200 | 0375 | 59E9 | C700 | 4806 | 0200 | FF00 | 0876 |
| 0000003160 | 76FF | 9A06 | 112C | 0056 | C483 | FF04 | 7036 | FF00 |
| 0000003200 | 6E36 | 9A00 | 2A4E | 0062 | C483 | 6A04 | 6A01 | 9A01 |
| 0000003220 | 1F28 | 007C | C483 | 8904 | FC46 | 7E83 | 00FC | 0375 |
| 0000003240 | 06E9 | B800 | FFFF | 8AE9 | 9A00 | 2CE1 | FFFF | 4689 |
| 0000003260 | 83FC | FC7E | 7500 | E903 | 0006 | FFB8 | E9FF | 0073 |
| 0000003300 | 6AE9 | C700 | 4806 | 0000 | 9A00 | 2CAD | 00BD | 4689 |
| 0000003320 | 83FC | FC7E | 7500 | E903 | 0006 | FFB8 | E9FF | 0053 |
| 0000003340 | 3E83 | 0072 | 7400 | E903 | 0013 | F09A | 461F | 3D00 |
| 0000003360 | 0000 | 0375 | 06E9 | B800 | FFFF | 36E9 | 8B00 | 0646 |
| 0000003400 | 568B | 0508 | 0028 | 5D52 | 681E | 33C2 | D29A | FF91 |
| 0000003420 | B3FF | 08C4 | 468B | 8B06 | 0856 | 2405 | 8900 | F846 |
| 0000003440 | 5689 | C4FA | F85E | 8B26 | 2C47 | EAA3 | B833 | 0000 |
| 0000003460 | 00E9 | 1F00 | 5F5E | ED83 | 8B02 | 1FE5 | 4D5D | 04CA |
| 0000003500 | 1E00 | 9058 | 5545 | EC8B | 8E1E | 81D8 | 04EC | 5700 |
| 0000003520 | 1E56 | 12B8 | 8E00 | C4D8 | 065E | 8B26 | 7C47 | 16A3 |

THU MAR 14 17:25:16 1991 CRV_IPS.DLL PAGE 3, LINE 119

| | | | | | | | | |
|---|---|---|---|---|---|---|---|---|
| 0000003540 | C434 | 065E | 8326 | 7C7F | 7400 | E903 | 0042 | 06C7 |
| 0000003560 | 0048 | 0002 | 36FF | 3418 | 76FF | FFD8 | 0676 | 4A9A |
| 0000003600 | 610E | 8301 | 06C4 | 36FF | 0070 | 36FF | 006E | 4E9A |
| 0000003620 | 692A | 8301 | 04C4 | E19A | 892C | 89D1 | FC46 | 7E83 |
| 0000003640 | 00FC | 0375 | 06E9 | B800 | FFFF | 60E9 | E900 | 0057 |
| 0000003660 | 06C7 | 0048 | 0001 | AD9A | 9C2C | 8900 | FC46 | 7E83 |
| 0000003700 | 00FC | 0375 | 06E9 | B800 | FFFF | 40E9 | 8B00 | 0646 |
| 0000003720 | 568B | 0508 | 0028 | 5052 | 681E | 33C2 | D29A | BB91 |
| 0000003740 | 8301 | 08C4 | 681E | 33C2 | 329A | DF92 | 8300 | 04C4 |
| 0000003760 | 003D | 7400 | E903 | 0009 | 06C7 | 3418 | 0000 | 06E9 |
| 0000004000 | C700 | 1806 | 0134 | B800 | 0000 | 00E9 | 1F00 | 5F5E |
| 0000004020 | ED83 | 8B02 | 1FE5 | 4D5D | 04CA | 1E00 | 9058 | 5545 |
| 0000004040 | EC8B | 8E1E | 81D8 | 04EC | 5700 | 1E56 | 23B8 | 8E01 |
| 0000004060 | C7D8 | 4E06 | 0000 | 1E00 | 5A68 | 9A00 | 1770 | 0151 |
| 0000004100 | C483 | 8904 | FC46 | 7E83 | 00FC | 0375 | 06E9 | B800 |
| 0000004120 | FFFF | 29E9 | 9A00 | 20C4 | 020E | 4689 | 83FC | FC7E |
| 0000004140 | 7500 | E903 | 0006 | FFB8 | E9FF | 0012 | 681E | 0074 |
| 0000004160 | 829A | AF75 | 8301 | 04C4 | 00B8 | E900 | 0000 | 5E1F |
| 0000004200 | B35F | 02ED | E58B | 5D1F | CB4D | 581E | 4590 | 8B55 |
| 0000004220 | 1EEC | D88E | EC81 | 0004 | 5657 | B81E | 01FD | D88E |
| 0000004240 | 5EC4 | 2606 | 7F83 | 017C | 0374 | 61E9 | 8300 | 5E3E |
| 0000004260 | 0000 | 0374 | 2EE9 | C400 | 065E | 8326 | 507F | 7400 |
| 0000004300 | E903 | 0021 | 681E | 005A | 0D9A | C715 | 8302 | 04C4 |
| 0000004320 | 4689 | C7FC | 4E06 | 0100 | 1E00 | 8368 | 9A00 | 7582 |
| 0000004340 | 02D6 | C483 | 1E04 | 5A68 | 8B00 | 0646 | 568B | 0508 |
| 0000004360 | 0024 | 5052 | 0A9A | F014 | 8302 | 08C4 | 4689 | 1EFC |
| 0000004400 | 9468 | 9A00 | 7582 | 030E | C483 | E904 | 00BF | 681E |
| 0000004420 | 005A | 468B | 8B06 | 0856 | 2405 | 5200 | 9A50 | 15FD |
| 0000004440 | 0347 | C483 | 8908 | FC46 | 7E83 | 00FC | 0375 | 06E9 |
| 0000004460 | 8B00 | FC46 | B3E9 | 1E00 | A568 | 9A00 | 7582 | 035C |
| 0000004500 | C483 | 8304 | 4E3E | 0000 | 0375 | 47E9 | 8300 | 5E3E |
| 0000004520 | 0100 | 0375 | 19E9 | 8300 | 5E3E | 0100 | 0377 | 30E9 |
| 0000004540 | C400 | 601E | 2600 | BF83 | 0084 | 7401 | E903 | 0021 |
| 0000004560 | 681E | 005A | B79A | 8314 | 8303 | 04C4 | 4689 | C7FC |
| 0000004600 | 4E06 | 0000 | 1E00 | B868 | 9A00 | 7582 | 0398 | C483 |
| 0000004620 | E904 | 0039 | 3E83 | 005E | 7700 | E903 | 002F | 1EC4 |
| 0000004640 | 0060 | 8326 | 2C7F | 7400 | E903 | 0021 | 681E | 005A |
| 0000004660 | 0D9A | A015 | 8303 | 04C4 | 4689 | C7FC | 4E06 | 0100 |
| 0000004700 | 1E00 | CB68 | 9A00 | 7582 | 0243 | C483 | 9A04 | 20C4 |
| 0000004720 | 0228 | 4689 | 83FC | FC7E | 7500 | E903 | 0006 | FFB8 |
| 0000004740 | E9FF | 0006 | 00B8 | E900 | 0000 | 5E1F | 835F | 02ED |
| 0000004760 | E58B | 5D1F | CA4D | 0004 | 581E | 4590 | 8B55 | 1EEC |
| 0000005000 | D88E | EC81 | 0004 | 5657 | B81E | 026C | D88E | 5EC4 |
| 0000005020 | 2606 | 7F83 | 017C | 0374 | 5EE9 | 8301 | 483E | 0200 |
| 0000005040 | 0374 | C1E9 | 9A00 | 2CAD | 0413 | 4689 | 83FC | FC7E |
| 0000005060 | 7500 | E903 | 0006 | FFB8 | E9FF | 02B6 | 016A | 006A |
| 0000005100 | 289A | 3C1F | 8304 | 04C4 | 4689 | 83FC | FC7E | 7500 |
| 0000005120 | E903 | 0006 | FFB8 | E9FF | 0298 | 681E | 0050 | 468B |
| 0000005140 | 8B06 | 0856 | 2405 | 5200 | 9A50 | 140A | 0461 | C483 |
| 0000005160 | 8908 | FC46 | 7E83 | 00FC | 0375 | 06E9 | B800 | FFFF |
| 0000005200 | 6FE9 | 8B02 | 0646 | 568B | 0508 | 0024 | 5052 | 129A |
| 0000005220 | 8523 | 8304 | 04C4 | 4689 | 83FC | FC7E | 7500 | E903 |
| 0000005240 | 0006 | FFB8 | E9FF | 024A | 06C7 | 004C | 0001 | 016A |
| 0000005260 | 016A | 289A | 9B1F | 8302 | 04C4 | 4689 | 83FC | FC7E |
| 0000005300 | 7500 | E903 | 0006 | FFB8 | E9FF | 0226 | E19A | BD2C |
| 0000005320 | 8904 | FC46 | 7E83 | 00FC | 0375 | 06E9 | B800 | FFFF |
| 0000005340 | 0FE9 | E902 | 0090 | 016A | 006A | 289A | E61F | 8304 |
| 0000005360 | 04C4 | 4689 | 83FC | FC7E | 7500 | E903 | 0006 | FFB8 |
| 0000005400 | E9FF | 01EE | 681E | 0050 | 468B | 8B06 | 0856 | 2405 |

THU MAR 14 17:25:16 1991 CRV_IPS.DLL PAGE 4, LINE 178

| | | | | | | | | |
|---|---|---|---|---|---|---|---|---|
| 0000005420 | 5200 | 9A50 | 140A | 050B | C483 | 8908 | FC46 | 7E83 |
| 0000005440 | 00FC | 0375 | 06E9 | B800 | FFFF | C5E9 | 8B01 | 0646 |
| 0000005460 | 568B | 0508 | 0024 | 5052 | 129A | 2F23 | 8305 | 04C4 |
| 0000005500 | 4689 | 83FC | FC7E | 7500 | E903 | 0006 | FFB8 | E9FF |
| 0000005520 | 01A0 | 06C7 | 004C | 0001 | 016A | 016A | 289A | 731F |
| 0000005540 | 8305 | 04C4 | 4689 | 83FC | FC7E | 7500 | E903 | 0006 |
| 0000005560 | FFB8 | E9FF | 017C | 73E9 | 8B01 | 0646 | 568B | 0508 |
| 0000005600 | 0028 | 5052 | 681E | 33C2 | D29A | B091 | 8302 | 08C4 |
| 0000005620 | 681E | 33BE | 016A | 006A | 006A | 681E | 0050 | 006A |
| 0000005640 | BD9A | 8D18 | 8305 | 10C4 | 003D | 7400 | E903 | 0136 |
| 0000005660 | 3E83 | 0048 | 7402 | E903 | 00AD | AD9A | A82C | 8905 |
| 0000005700 | FC46 | 7E83 | 00FC | 0375 | 06E9 | B800 | FFFF | 21E9 |
| 0000005720 | 6A01 | 6A01 | 9A00 | 1F28 | 05C6 | C483 | 8904 | FC46 |
| 0000005740 | 7E83 | 00FC | 0375 | 06E9 | B800 | FFFF | 03E9 | 1E01 |
| 0000005760 | BE68 | 9A33 | 2312 | 05E8 | C483 | 8904 | FC46 | 7E83 |
| 0000006000 | 00FC | 0375 | 06E9 | B800 | FFFF | E5E9 | 1E00 | 5068 |
| 0000006020 | 1E00 | BE68 | 9A33 | 15FD | 0606 | C483 | 8908 | FC46 |
| 0000006040 | 7E83 | 00FC | 0375 | 06E9 | B800 | FFFF | C3E9 | 6A00 |
| 0000006060 | 6A01 | 9A01 | 1F28 | 0620 | C483 | 8904 | FC46 | 7E83 |
| 0000006100 | 00FC | 0375 | 06E9 | B800 | FFFF | A5E9 | 9A00 | 2CE1 |
| 0000006120 | 063E | 4689 | 83FC | FC7E | 7500 | E903 | 0006 | FFB8 |
| 0000006140 | E9FF | 008E | 7CE9 | 6A00 | 6A01 | 9A00 | 1F28 | 065C |
| 0000006160 | C483 | 8904 | FC46 | 7E83 | 00FC | 0375 | 06E9 | B800 |
| 0000006200 | FFFF | 6DE9 | 1E00 | BE68 | 9A33 | 2312 | 067E | C483 |
| 0000006220 | 8904 | FC46 | 7E83 | 00FC | 0375 | 06E9 | B800 | FFFF |
| 0000006240 | 4FE9 | 1E00 | 5068 | 1E00 | BE68 | 9A33 | 15FD | 069C |
| 0000006260 | C483 | 8908 | FC46 | 7E83 | 00FC | 0375 | 06E9 | B800 |
| 0000006300 | FFFF | 2DE9 | 6A00 | 6A01 | 9A01 | 1F28 | 03F8 | C483 |
| 0000006320 | 8904 | FC46 | 7E83 | 00FC | 0375 | 06E9 | B800 | FFFF |
| 0000006340 | 0FE9 | E900 | 0006 | CFB8 | E900 | 0006 | 00B8 | E900 |
| 0000006360 | 0000 | 5E1F | 835F | 02ED | E58B | 5D1F | CA4D | 0004 |
| 0000006400 | 581E | 4590 | 8B55 | 1EEC | D88E | EC81 | 0000 | 5657 |
| 0000006420 | B81E | 03DA | D88E | 5EC4 | 2606 | 478B | E91A | 037F |
| 0000006440 | 06C7 | 00DE | 0001 | 76FF | FF08 | 0676 | 9B9A | 550A |
| 0000006460 | 8307 | 04C4 | 86E9 | E903 | 037D | 5EC4 | 2606 | 478A |
| 0000006500 | 2A24 | E9E4 | 02C8 | 5EC4 | 2606 | 47C7 | 0B1A | 8300 |
| 0000006520 | DC3E | 0000 | 0375 | 13E9 | C700 | DC06 | 0000 | A000 |
| 0000006540 | 0044 | 5EC4 | 2606 | 4788 | E924 | 0010 | 06C7 | 00DC |
| 0000006560 | 0001 | 42A0 | C400 | 065E | 8826 | 2447 | 76FF | FF08 |
| 0000006600 | 0676 | 9B9A | 9F0A | 8307 | 04C4 | 30E9 | E903 | 02FD |
| 0000006620 | 5EC4 | 2606 | 47C7 | 0C1A | C400 | 065E | C726 | 2847 |
| 0000006640 | 0000 | 0E8A | 00DE | FCB8 | D3FF | C4E0 | 065E | 8926 |
| 0000006660 | 2A47 | 06FF | 00DE | 3E83 | 00DE | 7703 | E903 | 0006 |
| 0000006700 | 06C7 | 00DE | 0003 | 76FF | FF08 | 0676 | 9B9A | E90A |
| 0000006720 | 8307 | 04C4 | E6E9 | E902 | 02B3 | 5EC4 | 2606 | 47C7 |
| 0000006740 | 0C1A | 8A00 | DE0E | B800 | FFFC | E0D3 | 5EC4 | 2606 |
| 0000006760 | 4789 | C428 | 065E | C726 | 2A47 | 0000 | 06FF | 00DE |
| 0000007000 | 3E83 | 00DE | 7703 | E903 | 0006 | 06C7 | 00DE | 0003 |
| 0000007020 | 76FF | FF08 | 0676 | 9B9A | 330A | 8308 | 04C4 | 9CE9 |
| 0000007040 | E902 | 0269 | 5EC4 | 2606 | 47C7 | 0C1A | C400 | 065E |
| 0000007060 | C726 | 2847 | 0000 | 0E8A | 00DE | 04B8 | D300 | C4E0 |
| 0000007100 | 065E | 8926 | 2A47 | 06FF | 00DE | 3E83 | 00DE | 7703 |
| 0000007120 | E903 | 0006 | 06C7 | 00DE | 0003 | 76FF | FF08 | 0676 |
| 0000007140 | 9B9A | 7D0A | 8308 | 04C4 | 52E9 | E902 | 021F | 5EC4 |
| 0000007160 | 2606 | 47C7 | 0C1A | 8A00 | DE0E | B800 | 0004 | E0D3 |
| 0000007200 | 5EC4 | 2606 | 4789 | C428 | 065E | C726 | 2A47 | 0000 |
| 0000007220 | 06FF | 00DE | 3E83 | 00DE | 7703 | E903 | 0006 | 06C7 |
| 0000007240 | 00DE | 0003 | 76FF | FF08 | 0676 | 9B9A | 9F0A | 8304 |
| 0000007260 | 04C4 | 08E9 | E902 | 01D5 | 5EC4 | 2606 | 47C7 | 0C1A |

THU MAR 14 17:25:16 1991  CRV_IPS.DLL  PAGE 5, LINE 237

| | | | | | | | | |
|---|---|---|---|---|---|---|---|---|
| 0000007300 | 8A00 | DE0E | B800 | 0004 | E0D3 | 5EC4 | 2606 | 4789 |
| 0000007320 | 8A28 | DE0E | B800 | FFFC | E0D3 | 5EC4 | 2606 | 4789 |
| 0000007340 | FF2A | DE06 | 8300 | DE3E | 0300 | 0377 | 06E9 | C700 |
| 0000007360 | DE06 | 0300 | FF00 | 0876 | 76FF | 9A06 | 0A9B | 091F |
| 0000007400 | C483 | E904 | 01B7 | 84E9 | C401 | 065E | C726 | 1A47 |
| 0000007420 | 000C | 0E8A | 00DE | 04B8 | D300 | C4E0 | 065E | 8926 |
| 0000007440 | 2847 | 0E8A | 00DE | 04B8 | D300 | C4E0 | 065E | 8926 |
| 0000007460 | 2A47 | 06FF | 00DE | 3E83 | 00DE | 7703 | E903 | 0006 |
| 0000007500 | 06C7 | 00DE | 0003 | 76FF | FF08 | 0676 | 9B9A | 700A |
| 0000007520 | 8309 | 04C4 | 66E9 | E901 | 0133 | 5EC4 | 2606 | 47C7 |
| 0000007540 | 0C1A | 8A00 | DE0E | B800 | FFFC | E0D3 | 5EC4 | 2606 |
| 0000007560 | 4789 | 8A28 | DE0E | B800 | FFFC | E0D3 | 5EC4 | 2606 |
| 0000007600 | 4789 | FF2A | DE06 | 8300 | DE3E | 0300 | 0377 | 06E9 |
| 0000007620 | C700 | DE06 | 0300 | FF00 | 0876 | 76FF | 9A06 | 0A9B |
| 0000007640 | 09C1 | C483 | E904 | 0115 | E2E9 | C400 | 065E | C726 |
| 0000007660 | 1A47 | 000C | 0E8A | 00DE | FCB8 | D3FF | C4E0 | 065E |
| 0000007700 | 8926 | 2847 | 0E8A | 00DE | 04B8 | D300 | C4E0 | 065E |
| 0000007720 | 8926 | 2A47 | 06FF | 00DE | 3E83 | 00DE | 7703 | E903 |
| 0000007740 | 0006 | 06C7 | 00DE | 0003 | 76FF | FF08 | 0676 | 9B9A |
| 0000007760 | FF0A | 8306 | 04C4 | C4E9 | E900 | 0091 | 06C7 | 00DE |
| 0000010000 | 0001 | 00B8 | E900 | 00B5 | 82E9 | E900 | 007F | 753D |
| 0000010020 | 7500 | E903 | FD7A | 037E | 3AE9 | 3D00 | 006B | 0375 |
| 0000010040 | B7E9 | 7EFD | E903 | 0013 | 5A2D | 7500 | E903 | FD16 |
| 0000010060 | 0F2D | 7500 | E903 | FF73 | C1E9 | 2DFF | 006C | 0375 |
| 0000010100 | 17E9 | 2DFF | 0006 | 0375 | D9E9 | 48FD | 7548 | E903 |
| 0000010120 | FE1C | A7E9 | 3DFF | 00EB | 0375 | 7DE9 | 7EFD | E903 |
| 0000010140 | 0013 | 7A2D | 7500 | E903 | FE9F | 032D | 7500 | E903 |
| 0000010160 | FE46 | 87E9 | 2DFF | 00F2 | 0375 | A7E9 | 48FD | 7548 |
| 0000010200 | E903 | FDEA | 7548 | E903 | FD06 | 6FE9 | C7FF | DE06 |
| 0000010220 | 0100 | B800 | 0000 | 24E9 | E900 | 001B | 18E9 | 2D00 |
| 0000010240 | 0009 | 0375 | 93E9 | 48FC | 7D48 | E903 | FFDF | 7F48 |
| 0000010260 | E903 | FC6C | D6E9 | B8FF | 0000 | 00E9 | 1F00 | 5F5E |
| 0000010300 | ED83 | 8B02 | 1FE5 | 4D5D | 04CA | 1E00 | 9058 | 5545 |
| 0000010320 | EC8B | 8E1E | 81D8 | 2AEC | 5701 | A156 | 0048 | 58E9 |
| 0000010340 | FF00 | 0876 | 76FF | 9A06 | 112C | 0ADA | C483 | 4804 |
| 0000010360 | 0374 | 20E9 | C700 | 5286 | 00FF | C700 | F086 | 31FE |
| 0000010400 | 8D00 | D686 | 16FE | 9A50 | 0000 | 0AFB | 00B8 | E900 |
| 0000010420 | 0037 | 06E9 | B800 | 0000 | 2EE9 | E900 | 002B | 36FF |
| 0000010440 | 3418 | 76FF | FF08 | 0676 | 4A9A | CE0E | 8308 | 06C4 |
| 0000010460 | 16E9 | E900 | 0013 | 10E9 | 0B00 | 75C0 | E903 | FFA1 |
| 0000010500 | 7548 | E903 | FFD8 | 00E9 | 5E0D | 835F | 02ED | E58B |
| 0000010520 | 5D1F | CB4D | 581E | 4590 | 8B55 | 1EEC | D88E | EC81 |
| 0000010540 | 0008 | 5657 | B81E | 06E2 | D88E | 46C7 | 00FC | 8B00 |
| 0000010560 | 0646 | 29E9 | 8300 | 5E3E | 0000 | 0374 | 06E9 | B800 |
| 0000010600 | 0000 | 5AE9 | E901 | 0026 | 3E83 | 005E | 7400 | E903 |
| 0000010620 | 0006 | 00B8 | E900 | 0147 | 13E9 | E900 | 0010 | C00B |
| 0000010640 | 0375 | D0E9 | 48FF | 0375 | DDE9 | E9FF | 0000 | 3E83 |
| 0000010660 | 0048 | 7402 | E903 | 001C | AD9A | AB2C | 890B | FA46 |
| 0000010700 | 7E83 | 00FA | 0375 | 06E9 | B800 | FFFF | 10E9 | C701 |
| 0000010720 | FC46 | 0001 | 006A | 006A | 289A | F31F | 830B | 04C4 |
| 0000010740 | 4689 | 83FA | FA7E | 7500 | E903 | 0006 | FFB8 | E9FF |
| 0000010760 | 00ED | 468B | E906 | 0093 | 46C7 | 00F8 | E900 | 0003 |
| 0000011000 | 46FF | A1F8 | 005E | 4639 | 72F8 | E903 | 002F | 681E |
| 0000011020 | 0050 | 466B | 58F8 | 0603 | 0060 | 168B | 0062 | 5052 |
| 0000011040 | 0A9A | 3B14 | 830C | 08C4 | 4689 | 83FA | FA7E | 7500 |
| 0000011060 | E903 | 0006 | FFB8 | E9FF | 00A5 | C3E9 | E9FF | 005B |
| 0000011100 | 46C7 | 00F8 | E900 | 0003 | 46FF | A1F8 | 005E | 4639 |
| 0000011120 | 72F8 | E903 | 002F | 681E | 0050 | 466B | 58F8 | 0603 |
| 0000011140 | 006A | 168B | 006C | 5052 | 0A9A | 7214 | 830C | 08C4 |

THU MAR 14 17:25:16 1991 CRV_IPS.DLL PAGE 6, LINE 296

| | | | | | | | | |
|---|---|---|---|---|---|---|---|---|
| 0000011160 | 4689 | 83FA | FA7E | 7500 | E903 | 0006 | FFB8 | E9FF |
| 0000011200 | 005D | C3E9 | E9FF | 0013 | 10E9 | 0800 | 75C0 | E903 |
| 0000011220 | FF66 | 7548 | E903 | FFA8 | 00E9 | 6A00 | 6A01 | 9A01 |
| 0000011240 | 1F28 | 0C95 | C483 | 8904 | FA46 | 7E83 | 00FA | 0375 |
| 0000011260 | 06E9 | B800 | FFFF | 26E9 | 8300 | FC7E | 7500 | E903 |
| 0000011300 | 0017 | E19A | BA2C | 890A | FA46 | 7E83 | 00FA | 0375 |
| 0000011320 | 06E9 | B800 | FFFF | 06E9 | B800 | 0000 | 00E9 | 1F00 |
| 0000011340 | 5F5E | ED83 | 8B02 | 1FE5 | 4D5D | 02CA | 1E00 | 9058 |
| 0000011360 | 5545 | EC8B | 8E1E | 81D8 | 2CEC | 5701 | 1E56 | 5068 |
| 0000011400 | 9A00 | 1770 | 0D12 | C483 | 8904 | D486 | 83FE | D4BE |
| 0000011420 | 00FE | 0375 | 06E9 | B800 | FFFF | 80E9 | 8300 | 483E |
| 0000011440 | 0200 | 0375 | 5FE9 | C700 | 5286 | 00FF | A100 | 0048 |
| 0000011460 | 33E9 | C700 | F086 | 31FE | 8D00 | D686 | 16FE | 9A50 |
| 0000011500 | 0000 | 0D2A | 8689 | FED4 | 2BE9 | C700 | F086 | 32FE |
| 0000011520 | 8D00 | D686 | 16FE | 9A50 | 0111 | 0B6B | 8689 | FED4 |
| 0000011540 | 13E9 | E900 | C010 | C00B | 0375 | C6E9 | 48FF | 0375 |
| 0000011560 | D8E9 | E9FF | 0000 | BE83 | FED4 | 7500 | E903 | 0006 |
| 0000011600 | FFB8 | E9FF | 0017 | 699A | D42F | C70C | 4C06 | 0000 |
| 0000011620 | C700 | 4A06 | 0000 | B800 | 0000 | 00E9 | 5E00 | 835F |
| 0000011640 | 02ED | E58B | 5D1F | CB4D | 581E | 4590 | 8B55 | 1EEC |
| 0000011660 | D88E | EC81 | 0004 | 5657 | B81E | 0B36 | D88E | 3E83 |
| 0000011700 | 0054 | 7400 | E903 | 0006 | 00B8 | E900 | 009E | 3E83 |
| 0000011720 | 0048 | 7402 | E903 | 0017 | AD9A | D32C | 890D | FC46 |
| 0000011740 | 7E83 | 00FC | 0375 | 06E9 | B800 | FFFF | 7DE9 | C400 |
| 0000011760 | 065E | 8326 | 247F | 7400 | E903 | 0026 | 016A | 006A |
| 0000012000 | 289A | ED1F | 830D | 04C4 | 4689 | 83FC | FC7E | 7500 |
| 0000012020 | E903 | 0006 | FFB8 | E9FF | 0052 | 699A | F52F | E90D |
| 0000012040 | 0023 | 489A | FE2F | 6A0D | 6A01 | 9A01 | 1F28 | 0E22 |
| 0000012060 | C483 | 8904 | FC46 | 7E83 | 00FC | 0375 | 06E9 | B800 |
| 0000012100 | FFFF | 27E9 | 8300 | 483E | 0200 | 0374 | 17E9 | 9A00 |
| 0000012120 | 2CE1 | 0D59 | 4689 | 83FC | FC7E | 7500 | E903 | 0006 |
| 0000012140 | FFB8 | E9FF | 0006 | 00B8 | E900 | 0000 | 5E1F | 835F |
| 0000012160 | 02ED | E58B | 5D1F | CA4D | 0004 | 581E | 4590 | 8B55 |
| 0000012200 | 1EEC | D88E | EC81 | 0186 | 5657 | 5EC4 | 2606 | 7F83 |
| 0000012220 | 321A | 0375 | 80E9 | A102 | 00E0 | 67E9 | 8302 | E43E |
| 0000012240 | 0000 | 0375 | 19E9 | 9A0D | 1FF0 | 0ECD | 003D | 7500 |
| 0000012260 | E903 | 0006 | FFB8 | E9FF | 0297 | 06C7 | 00E4 | 0000 |
| 0000012300 | 5EC4 | 2606 | 7F83 | 0B1A | 0374 | B7E9 | C400 | 065E |
| 0000012320 | 8A26 | 2447 | 0622 | 0046 | E42A | 063B | 0042 | 0374 |
| 0000012340 | 9EE9 | 1E00 | BE68 | FF33 | 0A76 | 36FF | 0070 | 36FF |
| 0000012360 | 006E | 681E | 0050 | 36FF | 00E2 | BD9A | E118 | 830E |
| 0000012400 | 10C4 | 003D | 7400 | E903 | 0071 | 016A | 006A | 289A |
| 0000012420 | 041F | 830F | 04C4 | 72A3 | 8334 | 723E | 0034 | 0375 |
| 0000012440 | 06E9 | B800 | FFFF | 28E9 | FF02 | 7036 | FF00 | 6E36 |
| 0000012460 | 9A00 | 29E8 | 0F18 | C483 | FF04 | 7036 | FF00 | 6E36 |
| 0000012500 | 1E00 | BE68 | 9A33 | 1C5F | 0F3D | C483 | A308 | 3474 |
| 0000012520 | 06FF | 00E2 | 586A | 681E | 33BE | 681E | 341A | 649A |
| 0000012540 | 5B9F | 8305 | 0AC4 | 681E | 33BE | F79A | AB23 | 830D |
| 0000012560 | 04C4 | 06C7 | 00E0 | 0001 | 06E9 | C700 | E206 | 0000 |
| 0000012600 | E900 | 004F | 5EC4 | 2606 | 7F83 | 0C1A | 0374 | 42E9 |
| 0000012620 | A100 | 006E | 8689 | FE7C | 70A1 | 8900 | 7A86 | FFFE |
| 0000012640 | 0876 | 76FF | 1ED6 | 7068 | 1E00 | 6E68 | 9A00 | 2853 |
| 0000012660 | 0F98 | C483 | FF0C | 7AB6 | FFFE | 7CB6 | FFFE | 7036 |
| 0000012700 | FF00 | 6E36 | 9A00 | 2AB1 | 0FD0 | C483 | C708 | E206 |
| 0000012720 | 0000 | E900 | 013E | 5EC4 | 2606 | 7F83 | 0B1A | 0374 |
| 0000012740 | 7EE9 | C400 | 065E | 8A26 | 2447 | 0622 | 0046 | E42A |
| 0000012760 | 063B | 0044 | 0374 | 65E9 | 1E00 | BE68 | 9A33 | 23F7 |
| 0000013000 | 0FE0 | C483 | FF04 | 7036 | FF00 | 6E36 | 9A00 | 29E8 |
| 0000013020 | 1002 | C483 | C704 | 9886 | 33FE | 8D00 | A2BE | BEFE |

THU MAR 14 17:25:16 1991 CRV_IPS.DLL PAGE 7, LINE 355

| | | | | | | | | |
|---|---|---|---|---|---|---|---|---|
| 0000013040 | 33BE | D08C | C08E | 2CB9 | F300 | 6AA5 | 6A01 | 9A01 |
| 0000013060 | 1F28 | 1D50 | C483 | A304 | 3472 | 3E83 | 3472 | 7500 |
| 0000013100 | E903 | 0006 | FFB8 | E9FF | 0107 | 868D | FE7E | 5016 |
| 0000013120 | FF9A | 00FF | A300 | 3472 | 06C7 | 00E0 | 0000 | A0E9 |
| 0000013140 | A100 | 006E | 8689 | FE7C | 70A1 | 8900 | 7A86 | FFFE |
| 0000013160 | 0876 | 76FF | 1E06 | 7068 | 1E00 | 6E68 | 9A00 | 2853 |
| 0000013200 | 1081 | C483 | 8D0C | A67E | BEBE | 8C33 | 8ED0 | B9C0 |
| 0000013220 | 002C | A5F3 | 74A1 | E934 | 003D | B6FF | FE7A | B6FF |
| 0000013240 | FE7C | 36FF | 0070 | 36FF | 006E | 681E | 33BE | 659A |
| 0000013260 | 9C26 | 8310 | 0CC4 | 2DE9 | FF00 | 7436 | FF34 | 7036 |
| 0000013300 | FF00 | 6E36 | 1E00 | BE68 | 9A33 | 2752 | 10CC | C483 |
| 0000013320 | E90A | 0012 | 0FE9 | 4000 | 037D | DCE9 | 48FF | 037F |
| 0000013340 | B7E9 | E9FF | FFD3 | 06C7 | 00E2 | 0000 | 681E | 0050 |
| 0000013360 | 468D | 16A6 | 1E50 | BE68 | 9A33 | 17BA | 1104 | C483 |
| 0000013400 | E90C | 0010 | C00B | 0375 | 92E9 | 48FD | 0375 | C5E9 |
| 0000013420 | E9FE | 0000 | 34E9 | 6A00 | 1E58 | BE68 | 1E33 | 1A68 |
| 0000013440 | 9A34 | 9F64 | 0F31 | C483 | FF0A | 7036 | FF00 | 6E36 |
| 0000013460 | 9A00 | 29E8 | 0E7A | C483 | C704 | E406 | 0100 | C700 |
| 0000013500 | E206 | 0000 | C700 | E006 | 0000 | B800 | 0000 | 00E9 |
| 0000013520 | 5E00 | 835F | 02ED | E58B | 5D1F | CB4D | 581E | 4590 |
| 0000013540 | 8B55 | 1EEC | D88E | EC81 | 018A | 5657 | 5EC4 | 2606 |
| 0000013560 | 7F83 | 311A | 0375 | 8DE9 | A102 | 00E6 | 6EE9 | 8302 |
| 0000013600 | E83E | 0000 | 0375 | 2EE9 | C700 | E806 | 0000 | 8300 |
| 0000013620 | 723E | 0000 | 0375 | 1EE9 | FF00 | 7036 | FF00 | 6E36 |
| 0000013640 | 9A00 | 29E8 | 11B1 | C483 | 3D04 | 0000 | 0375 | 06E9 |
| 0000013660 | B800 | FFFF | 78E9 | C402 | 065E | 8326 | 1A7F | 740B |
| 0000013700 | E903 | 004D | 5EC4 | 2606 | 478A | 2224 | 4606 | 2A00 |
| 0000013720 | 3BE4 | 4206 | 7400 | E903 | 0034 | 016A | 006A | 289A |
| 0000013740 | 801F | 830F | 04C4 | 4689 | 83FC | FC7E | 7500 | E903 |
| 0000013760 | 0006 | FFB8 | E9FF | 0237 | 36FF | 0070 | 36FF | 006E |
| 0000014000 | E89A | 0D29 | 8312 | 04C4 | 06C7 | 00E6 | 0001 | 49E9 |
| 0000014020 | C400 | 065E | 8326 | 1A7F | 740C | E903 | 003C | 6EA1 |
| 0000014040 | 8900 | 7A86 | A1FE | 0070 | 8689 | FE76 | 76FF | FF08 |
| 0000014060 | 0676 | 681E | 0070 | 681E | 006E | 539A | 2528 | 8312 |
| 0000014100 | 0CC4 | B6FF | FE76 | B6FF | FE7A | 36FF | 0070 | 36FF |
| 0000014120 | 006E | B19A | 5D2A | 8312 | 08C4 | 86C7 | FE78 | 0000 |
| 0000014140 | A0E9 | C401 | 065E | 8326 | 1A7F | 740B | E903 | 004D |
| 0000014160 | 5EC4 | 2606 | 478A | 2224 | 4606 | 2A00 | 3BE4 | 4406 |
| 0000014200 | 7400 | E903 | 0034 | 016A | 016A | 289A | 7F1F | 8312 |
| 0000014220 | 04C4 | 4689 | 83FC | FC7E | 7500 | E903 | 0006 | FFB8 |
| 0000014240 | E9FF | 018B | 36FF | 0070 | 36FF | 006E | E89A | AB29 |
| 0000014260 | 8312 | 04C4 | 06C7 | 00E6 | 0000 | 4BE9 | C400 | 065E |
| 0000014300 | 8326 | 1A7F | 740C | E903 | 003E | 76FF | FF08 | 0676 |
| 0000014320 | 681E | 0070 | 681E | 006E | 539A | CD28 | 8312 | 0CC4 |
| 0000014340 | 6EA1 | A300 | 33E6 | E2A3 | A133 | 0070 | E8A3 | A333 |
| 0000014360 | 33E4 | 681E | 0050 | 681E | 33BE | 0A9A | 1314 | 8313 |
| 0000014400 | 08C4 | 06C7 | 00E6 | 0002 | 86C7 | FE78 | 0000 | F2E9 |
| 0000014420 | C400 | 065E | 8326 | 1A7F | 740B | E903 | 006F | 5EC4 |
| 0000014440 | 2606 | 478A | 2224 | 4606 | 2A00 | 3BE4 | 4406 | 7400 |
| 0000014460 | E903 | 0056 | 006A | 006A | 006A | 006A | 006A | 006A |
| 0000014500 | 539A | 1F28 | 8313 | 0CC4 | 681E | 33BE | F79A | 7D23 |
| 0000014520 | 8313 | 04C4 | 86C7 | FE96 | 0033 | BE8D | FEA0 | BEBE |
| 0000014540 | 8C33 | 8ED0 | B9C0 | 002C | A5F3 | 868D | FE7C | 5016 |
| 0000014560 | 219A | 0010 | 8900 | FC46 | 06C7 | 00E8 | 0001 | 06C7 |
| 0000014600 | 00E6 | 0000 | 86C7 | FE78 | 0001 | 5DE9 | 8D00 | A47E |
| 0000014620 | BEBE | 8C33 | 8ED0 | B9C0 | 002C | A5F3 | 76FF | FF08 |
| 0000014640 | 0676 | 681E | 0070 | 681E | 006E | 539A | 9A28 | 8313 |
| 0000014660 | 0CC4 | 6EA1 | A300 | 33E6 | 70A1 | A300 | 33E8 | 681E |
| 0000014700 | 33BE | 468D | 16A4 | 9A50 | 24DC | 13AF | C483 | 1E08 |

THU MAR 14 17:25:16 1991 CRV_IPS.DLL PAGE 8, LINE 414

| | | | | | | | | |
|---|---|---|---|---|---|---|---|---|
| 0000014720 | 5068 | 8D00 | A446 | 5016 | 681E | 33BE | BA9A | E117 |
| 0000014740 | 8313 | 0CC4 | 86C7 | FE78 | 0000 | 16E9 | 0B00 | 75C0 |
| 0000014760 | E903 | FD8B | 7548 | E903 | FE69 | 7548 | E903 | FF11 |
| 0000015000 | 00E9 | E900 | 0022 | 36FF | 0070 | 36FF | D06E | E89A |
| 0000015020 | 7429 | 8311 | 04C4 | 06C7 | 00E8 | 0001 | 06C7 | 00E6 |
| 0000015040 | 0000 | 86C7 | FE78 | 0001 | 868B | FE78 | 00E9 | 5E00 |
| 0000015060 | 835F | 02ED | E58B | 5D1F | CB4D | 581E | 4590 | 8B55 |
| 0000015100 | 1EEC | D88E | EC81 | 000D | 5657 | 5EC4 | 260A | 47FF |
| 0000015120 | C404 | 0A5E | 6B26 | 0447 | 5058 | 5EC4 | 260A | 77FF |
| 0000015140 | 2608 | 77FF | 9A06 | 98EA | 1481 | C483 | C406 | 0A5E |
| 0000015160 | 8926 | 0647 | 8926 | 0857 | 5EC4 | 260A | 478B | 2608 |
| 0000015200 | 470B | 7406 | E903 | 0006 | F1B8 | E9FF | 004E | 586A |
| 0000015220 | 76FF | FF08 | 0676 | 5EC4 | 260A | 476B | 5804 | 5EC4 |
| 0000015240 | 260A | 4703 | 2606 | 578B | 2D08 | 0058 | 5052 | 649A |
| 0000015260 | F49F | 8310 | 0AC4 | 5EC4 | 260A | 476B | 5804 | 5EC4 |
| 0000015300 | 260A | 4703 | 2606 | 578B | 2D08 | 0058 | 5052 | 0A9A |
| 0000015320 | D32B | 8311 | 04C4 | 00B8 | E900 | 0000 | 5F5E | ED83 |
| 0000015340 | 8B02 | 1FE5 | 4D5D | 1ECB | 9058 | 5545 | EC8B | 8E1E |
| 0000015360 | 81D8 | 5CEC | 5700 | C756 | C846 | 0000 | 46C7 | 00CA |
| 0000015400 | 8E00 | 9C06 | 2631 | 28A1 | 890F | CC46 | A126 | 0F2A |
| 0000015420 | 4689 | C7CE | D046 | 0001 | 681E | 005A | 468D | 16A4 |
| 0000015440 | 9A50 | 15FD | 14A1 | C483 | 8908 | FC46 | 00B8 | E900 |
| 0000015460 | 0000 | 5F5E | ED83 | 8B02 | 1FE5 | 4D5D | 1ECB | 9058 |
| 0000015500 | 5545 | EC8B | 8E1E | 81D8 | 5CEC | 5700 | C756 | C846 |
| 0000015520 | 0000 | 46C7 | 00CA | 8E00 | 9C06 | 2631 | 28A1 | 890F |
| 0000015540 | CC46 | A126 | 0F2A | 4689 | C7CE | D046 | 0001 | 5EC4 |
| 0000015560 | 2606 | 47FF | C404 | 065E | 6B26 | 0447 | 5058 | 5EC4 |
| 0000015600 | 2606 | 77FF | 2608 | 77FF | 9A06 | 98EA | 15CA | C483 |
| 0000015620 | C406 | 065E | 8926 | 0647 | 8926 | 0857 | 5EC4 | 2606 |
| 0000015640 | 478B | 2608 | 470B | 7406 | E903 | 0006 | F1B8 | E9FF |
| 0000015660 | 0070 | 5EC4 | 2606 | 478B | 4804 | 4689 | E9FC | 0003 |
| 0000015700 | 4EFF | 83FC | FC7E | 7700 | E903 | 0036 | 586A | 5EC4 |
| 0000015720 | 2606 | 478B | 2606 | 578B | 6B08 | FC4E | 0358 | 2DC1 |
| 0000015740 | 0058 | 5052 | 5EC4 | 2606 | 478B | 2606 | 578B | 6B08 |
| 0000015760 | FC4E | 0358 | 52C1 | 9A50 | 9F64 | 15E7 | C483 | E90A |
| 0000016000 | FFBE | 586A | 468D | 16A4 | C450 | 065E | FF26 | 0877 |
| 0000016020 | FF26 | 0677 | 649A | 389F | 8314 | 0AC4 | 00B8 | E900 |
| 0000016040 | 0000 | 5F5E | ED83 | 8B02 | 1FE5 | 4D5D | 1ECB | 9058 |
| 0000016060 | 5545 | EC8B | 8E1E | 81D8 | 60EC | 5700 | 6A56 | FF58 |
| 0000016100 | 0876 | 76FF | 8D06 | A446 | 5016 | 649A | 069F | 8317 |
| 0000016120 | 0AC4 | 468D | 16A4 | 9A50 | 2B0A | 14F4 | C483 | C404 |
| 0000016140 | 0A5E | 8B26 | 0447 | 4689 | 8BFC | FC46 | 4689 | E9A2 |
| 0000016160 | 0003 | 4EFF | 33A2 | A27E | 7700 | E903 | 0062 | 5E6B |
| 0000016200 | 58A2 | 76C4 | 260A | 74C4 | 8B06 | CC46 | 3926 | D040 |
| 0000016220 | 0374 | 48E9 | 6B00 | A25E | C458 | 0A76 | C426 | 0674 |
| 0000016240 | 468B | 26CE | 4D39 | 74D2 | E903 | 0031 | 5E6B | 58A2 |
| 0000016260 | 76C4 | 260A | 74C4 | 8B06 | C846 | 3926 | CC40 | 0374 |
| 0000016300 | 1AE9 | 6B0D | A25E | C458 | 0A76 | C426 | 0674 | 468B |
| 0000016320 | 26CA | 4039 | 74CE | E903 | 0003 | 03E9 | E900 | FF92 |
| 0000016340 | 7E83 | 00A2 | 0374 | 06E9 | B800 | 00CF | A6E9 | 8B00 |
| 0000016360 | A246 | 8948 | A046 | 03E9 | FF00 | A046 | 468B | 48FC |
| 0000016400 | 463B | 77A0 | E903 | 0036 | 586A | 5EC4 | 260A | 478B |
| 0000016420 | 2606 | 578B | 6B08 | A04E | 0358 | 05C1 | 0058 | 5052 |
| 0000016440 | 5EC4 | 260A | 478B | 2606 | 578B | 6B08 | A04E | 0358 |
| 0000016460 | 52C1 | 9A50 | 9F64 | 1739 | C483 | E90A | FFBB | 5EC4 |
| 0000016500 | 260A | 4FFF | C404 | 0A5E | 8326 | 047F | 7700 | E903 |
| 0000016520 | 003D | 5EC4 | 260A | 476B | 5804 | C450 | 0A5E | FF26 |
| 0000016540 | 0877 | FF26 | 0677 | EA9A | 5C98 | 8315 | 06C4 | 5EC4 |
| 0000016560 | 260A | 4789 | 2606 | 5789 | C408 | 0A5E | 8B26 | 0847 |

THU MAR 14 17:25:16 1991 CRV_IPS.DLL PAGE 9, LINE 473

| | | | | | | | | |
|---|---|---|---|---|---|---|---|---|
| 0000016600 | 0B26 | 0647 | 0374 | 06E9 | B800 | FFF1 | 06E9 | B800 |
| 0000016620 | 0000 | 00E9 | 5E00 | 835F | 02ED | E58B | 5D1F | CB4D |
| 0000016640 | 581E | 4590 | 8B55 | 1EEC | D88E | EC81 | 0000 | 5657 |
| 0000016660 | 5EC4 | 2606 | 47C7 | 0004 | C400 | 065E | FF26 | 0877 |
| 0000016700 | FF26 | 0677 | D89A | 1D8E | 8316 | 04C4 | 5EC4 | 2B06 |
| 0000016720 | 26C0 | 4789 | 2608 | 4789 | B806 | 0000 | 00E9 | 5E00 |
| 0000016740 | 835F | 02ED | E58B | 5D1F | CB4D | 581E | 4590 | 8B55 |
| 0000016760 | 1EEC | D88E | EC81 | 005E | 5657 | 586A | 76FF | FFDC |
| 0000017000 | 0A76 | 468D | 16A4 | 9A50 | 9F64 | 188C | C483 | 8D0A |
| 0000017020 | A446 | 5016 | 0A9A | A72B | 8318 | 04C4 | 5EC4 | 260E |
| 0000017040 | 478B | 8904 | FC46 | 46C7 | 00A2 | E900 | 0003 | 46FF |
| 0000017060 | 8BA2 | A246 | 4639 | 77FC | E903 | 0062 | 5E6B | 58A2 |
| 0000017100 | 76C4 | 260E | 74C4 | 8B06 | CC46 | 3926 | 2840 | 0374 |
| 0000017120 | 48E9 | 6B00 | A25E | C458 | 0E76 | C426 | 0674 | 468B |
| 0000017140 | 26CE | 4039 | 742A | E903 | 0031 | 5E6B | 58A2 | 76C4 |
| 0000017160 | 260E | 74C4 | 8B06 | C846 | 3926 | 2440 | 0374 | 1AE9 |
| 0000017200 | 6B00 | A25E | C458 | 0E76 | C426 | 0674 | 468B | 26CA |
| 0000017220 | 4039 | 7426 | E903 | 0003 | 03E9 | E900 | FF90 | 586A |
| 0000017240 | 76FF | FF08 | 0676 | 5EC4 | 260E | 478B | 2606 | 578B |
| 0000017260 | 6B08 | A24E | 0358 | 52C1 | 9A50 | 9F64 | 1797 | C483 |
| 0000017300 | C40A | 0E5E | 8B26 | 0647 | 8B26 | 0857 | 4E6B | 58A2 |
| 0000017320 | C103 | 5052 | 0A9A | 2A2B | 8316 | 04C4 | 00B8 | E900 |
| 0000017340 | 0000 | 5F5E | ED83 | 8B02 | 1FE5 | 4D5D | 1ECB | 9058 |
| 0000017360 | 5545 | EC8B | 8E1E | 81D8 | 10EC | 5700 | 8356 | 107E |
| 0000017400 | 7400 | E903 | 0145 | 5EC4 | 2608 | 478B | 8904 | F446 |
| 0000017420 | 7E83 | 00F4 | 0374 | 06E9 | B800 | FFFF | A1E9 | C701 |
| 0000017440 | F046 | FFFF | 46C7 | FFF2 | 837F | F47E | 7400 | E903 |
| 0000017460 | 0006 | FFB8 | E9FF | 0188 | 468B | 2B06 | F7D2 | F476 |
| 0000017500 | 5689 | 8306 | 067E | 7400 | E903 | 0012 | 06C7 | 3476 |
| 0000017520 | FFFF | 06C7 | 3478 | FFFF | 06C7 | 347A | FFFF | 46C7 |
| 0000017540 | 00FA | E900 | 0003 | 46FF | 8BFA | FA46 | 4639 | 77F4 |
| 0000017560 | E903 | 007F | 5EC4 | 2608 | 478B | 2606 | 578B | 6B08 |
| 0000017600 | FA4E | 0358 | 52C1 | FF50 | 0E76 | 76FF | 9A0C | 1A9B |
| 0000017620 | 17E7 | C483 | 8908 | F646 | 5689 | A1F8 | 3478 | 168B |
| 0000017640 | 347A | 5639 | 7DF8 | E903 | 0046 | 037E | 08E9 | 3900 |
| 0000017660 | F646 | 0373 | 39E9 | 8B00 | FA46 | 0639 | 3476 | 0375 |
| 0000017700 | 2DE9 | 8B00 | F046 | 568B | 39F2 | F856 | 037E | 1FE9 |
| 0000017720 | 7D00 | E903 | 0008 | 4639 | 72F6 | E903 | 0012 | 468B |
| 0000017740 | 8BF6 | F856 | 4689 | 89F0 | F256 | 468B | 89FA | FC46 |
| 0000017760 | 73E9 | 83FF | F07E | 74FF | E903 | 0010 | 7E81 | FFF2 |
| 0000020000 | 747F | E903 | 0006 | FFB8 | E9FF | 00B4 | 586A | 5EC4 |
| 0000020020 | 2608 | 478B | 2606 | 578B | 6B08 | FC4E | 0358 | 52C1 |
| 0000020040 | FF50 | 1476 | 76FF | 9A12 | 9F64 | 1A51 | C483 | 8B0A |
| 0000020060 | FC46 | 76A3 | 8B34 | F046 | 568B | A3F2 | 3478 | 1689 |
| 0000020100 | 347A | 00B8 | E900 | 0078 | 75E9 | C700 | FA46 | 0000 |
| 0000020120 | 03E9 | FF00 | FA46 | 468B | 39FA | 5406 | 7700 | E903 |
| 0000020140 | 0058 | 468B | 8B12 | 1456 | 0405 | 5200 | 6B50 | FA46 |
| 0000020160 | 0358 | 5606 | 8B00 | 5816 | 0500 | 0004 | 5052 | 089A |
| 0000020200 | 7C92 | 831A | 08C4 | 003D | 7400 | E903 | 0029 | 586A |
| 0000020220 | 5EC4 | 2608 | 478B | 2606 | 578B | 6B08 | FA4E | 0358 |
| 0000020240 | 52C1 | FF50 | 1476 | 76FF | 9A12 | 9F64 | 17DA | C483 |
| 0000020260 | B80A | 0000 | 09E9 | E900 | FF99 | FFB8 | E9FF | 0000 |
| 0000020300 | 5F5E | ED83 | 8B02 | 1FE5 | 4D5D | 1ECB | 9058 | 5545 |
| 0000020320 | EC8B | 8E1E | 81D8 | 12EC | 5700 | B856 | FFFF | FFBA |
| 0000020340 | 897F | F246 | 5689 | 89F4 | F646 | 5689 | C4F8 | 0A5E |
| 0000020360 | 468B | 2606 | 4739 | 7F28 | E903 | 0076 | 5EC4 | 8B0A |
| 0000020400 | 0646 | 3926 | 2447 | 037C | 67E9 | 8B00 | 0846 | 5EC4 |
| 0000020420 | 260A | 472B | 3D2A | 0000 | 037F | 0DE9 | 8B00 | 0846 |
| 0000020440 | 5EC4 | 260A | 472B | E92A | 000A | 5EC4 | 260A | 478B |

THU MAR 14 17:25:16 1991 CRV_IPS.DLL PAGE 10, LINE 532

| | | | | | | | | |
|---|---|---|---|---|---|---|---|---|
| 0000020460 | 2B2A | 0846 | 4689 | 8BF0 | 0846 | 5EC4 | 260A | 472B |
| 0000020500 | 3D26 | 0000 | 037F | 0DE9 | 8B00 | 0846 | 5EC4 | 260A |
| 0000020520 | 472B | E926 | 000A | 5EC4 | 260A | 478B | 2B26 | 0846 |
| 0000020540 | 463B | 7FF0 | E903 | 0003 | 468B | 99F0 | 4689 | 89F6 |
| 0000020560 | F856 | 5EC4 | 8B0A | 0846 | 3926 | 2A47 | 037F | 76E9 |
| 0000020600 | C400 | 0A5E | 468B | 2608 | 4739 | 7C26 | E903 | 0067 |
| 0000020620 | 468B | C406 | 0A5E | 2B26 | 2847 | 003D | 7F00 | E903 |
| 0000020640 | 000D | 468B | C406 | 0A5E | 2B26 | 2847 | 0AE9 | C400 |
| 0000020660 | 0A5E | 8B26 | 2847 | 462B | 8906 | EE46 | 468B | C406 |
| 0000020700 | 0A5E | 2B26 | 2447 | 003D | 7F00 | E903 | 000D | 468B |
| 0000020720 | C406 | 0A5E | 2B26 | 2447 | 0AE9 | C400 | 0A5E | 8B26 |
| 0000020740 | 2447 | 462B | 3B06 | EE46 | 037F | 03E9 | 8B00 | EE46 |
| 0000020760 | 8999 | F246 | 5689 | 8BF4 | F646 | 568B | 3BF8 | F456 |
| 0000021000 | 037D | 13E9 | 7E00 | E903 | 0008 | 463B | 77F2 | E903 |
| 0000021020 | 0006 | 568B | 8BF4 | F246 | 4689 | 89FA | FC56 | 7E83 |
| 0000021040 | 00FC | 037D | 54E9 | 7E00 | E903 | 0009 | 7E83 | 14FA |
| 0000021060 | 0377 | 46E9 | C400 | 0A5E | 468B | 2606 | 4739 | 7E24 |
| 0000021100 | E903 | 002D | 5EC4 | 8B0A | 0646 | 3926 | 2847 | 037D |
| 0000021120 | 1EE9 | C400 | 0A5E | 468B | 2608 | 4739 | 7E26 | E903 |
| 0000021140 | 000F | 5EC4 | 8B0A | 0846 | 3926 | 2A47 | 037C | 0AE9 |
| 0000021160 | C700 | FA46 | FFFF | 46C7 | FFFC | 8B7F | FA46 | 568B |
| 0000021200 | E9FC | 0000 | 5F5E | ED83 | 8B02 | 1FE5 | 4D5D | 1ECB |
| 0000021220 | 9058 | 5545 | EC8B | 8E1E | 81D8 | 06EC | 5700 | C456 |
| 0000021240 | 065E | 8B26 | 2447 | 062D | 3B00 | 0A46 | 037E | 36E9 |
| 0000021260 | C400 | 065E | 8B26 | 2847 | 0605 | 3B00 | 0A46 | 037D |
| 0000021300 | 24E9 | C400 | 065E | 8B26 | 2647 | 062D | 3B00 | 0C46 |
| 0000021320 | 037E | 12E9 | C400 | 065E | 8B26 | 2A47 | 0605 | 3B00 |
| 0000021340 | 0C46 | 037C | 06E9 | B800 | FFFF | EAE9 | C401 | 065E |
| 0000021360 | 8B26 | 2447 | 0605 | 3B00 | 0A46 | 037C | 3CE9 | C400 |
| 0000021400 | 065E | 8B26 | 2847 | 062D | 3B00 | 0A46 | 037F | 2AE9 |
| 0000021420 | C400 | 065E | 8B26 | 2647 | 0605 | 3B00 | 0C46 | 037C |
| 0000021440 | 18E9 | C400 | 065E | 8B26 | 2A47 | 062D | 3B00 | 0C46 |
| 0000021460 | 037F | 06E9 | B800 | 0000 | 9CE9 | C401 | 065E | 8B26 |
| 0000021500 | 2447 | 462B | 3D0A | 0000 | 037F | 0DE9 | C400 | 065E |
| 0000021520 | 8B26 | 2447 | 462B | E90A | 000A | 468B | C40A | 065E |
| 0000021540 | 2B26 | 2447 | 063D | 7C00 | E903 | 007D | 5EC4 | 2606 |
| 0000021560 | 478B | 2B26 | 0C46 | 003D | 7F00 | E903 | 000D | 5EC4 |
| 0000021600 | 2606 | 478B | 2B26 | 0C46 | 0AE9 | 8B00 | 0C46 | 5EC4 |
| 0000021620 | 2606 | 472B | 3D26 | 0006 | 037C | 09E9 | B800 | 0007 |
| 0000021640 | 34E9 | E901 | 0040 | 5EC4 | 2606 | 478B | 2B2A | 0C46 |
| 0000021660 | 003D | 7F00 | E903 | 000D | 5EC4 | 2606 | 478B | 2B2A |
| 0000021700 | 0C46 | 0AE9 | 8B00 | 0C46 | 5EC4 | 2606 | 472B | 3D2A |
| 0000021720 | 0006 | 037C | 09E9 | B800 | 0006 | FAE9 | E900 | 0006 |
| 0000021740 | 03B8 | E900 | 00F1 | EEE9 | C400 | 065E | 8B26 | 2847 |
| 0000021760 | 462B | 3D0A | 0000 | 037F | 0DE9 | C400 | 065E | 8B26 |
| 0000022000 | 2847 | 462B | E90A | 000A | 468B | C40A | 065E | 2B26 |
| 0000022020 | 2847 | 063D | 7C00 | E903 | 007D | 5EC4 | 2606 | 478B |
| 0000022040 | 2B26 | 0C46 | 003D | 7F00 | E903 | 000D | 5EC4 | 2606 |
| 0000022060 | 478B | 2B26 | 0C46 | 0AE9 | 8B00 | 0C46 | 5EC4 | 2606 |
| 0000022100 | 472B | 3D26 | 0006 | 037C | 09E9 | B800 | 0008 | 86E9 |
| 0000022120 | E900 | 0040 | 5EC4 | 2606 | 478B | 2B2A | 0C46 | 003D |
| 0000022140 | 7F00 | E903 | 000D | 5EC4 | 2606 | 478B | 2B2A | 0C46 |
| 0000022160 | 0AE9 | 8B00 | 0C46 | 5EC4 | 2606 | 472B | 3D2A | 0006 |
| 0000022200 | 037C | 09E9 | B800 | 0005 | 4CE9 | E900 | 0006 | 04B8 |
| 0000022220 | E900 | 0043 | 40E9 | C400 | 065E | 8B26 | 2647 | 462B |
| 0000022240 | 3D0C | 0000 | 037F | 0DE9 | C400 | 065E | 8B26 | 2647 |
| 0000022260 | 462B | E90C | 000A | 468B | C40C | 065E | 2B26 | 2647 |
| 0000022300 | 063D | 7C00 | E903 | 0009 | 02B8 | E900 | 0009 | 06E9 |
| 0000022320 | B800 | 0001 | 00E9 | 5E00 | 835F | 02ED | E58B | 5D1F |

THU MAR 14 17:25:16 1991 CRV_IPS.DLL PAGE 11, LINE 591

| | | | | | | | | |
|---|---|---|---|---|---|---|---|---|
| 0000022340 | CB4D | 581E | 4590 | 8B55 | 1EEC | D88E | EC81 | 0006 |
| 0000022360 | 5657 | 46C7 | 00FA | E900 | 0003 | 46FF | 8BFA | 0A46 |
| 0000022400 | 4639 | 72FA | E903 | 0029 | 466B | 58FA | 4603 | 8B0C |
| 0000022420 | 0E56 | 5052 | 129A | 6023 | 8319 | 04C4 | 4689 | 83FC |
| 0000022440 | FC7E | 7500 | E903 | 0006 | FFB8 | E9FF | 001F | C9E9 |
| 0000022460 | 83FF | 4C3E | 0100 | 0374 | 06E9 | B800 | 0000 | 03E9 |
| 0000022500 | B800 | 0001 | 4CA3 | B800 | 0000 | 00E9 | 5E00 | 835F |
| 0000022520 | 02ED | E58B | 5D1F | CB4D | 581E | 4590 | 8B55 | 1EEC |
| 0000022540 | D88E | EC81 | 0004 | 5657 | 468B | 3906 | 4A06 | 7500 |
| 0000022560 | E903 | 002E | 36FF | 0058 | 36FF | 0056 | 36FF | 0054 |
| 0000022600 | 36FF | 0052 | 36FF | 0050 | 2A9A | 9520 | 831F | 0AC4 |
| 0000022620 | 4689 | 83FC | FC7E | 7500 | E903 | 0006 | FFB8 | E9FF |
| 0000022640 | 0040 | 468B | 3908 | 4C06 | 7500 | E903 | 002E | 36FF |
| 0000022660 | 0058 | 36FF | 0056 | 36FF | 0054 | 36FF | 0052 | 36FF |
| 0000022700 | 0050 | B29A | E71E | 831E | 0AC4 | 4689 | 83FC | FC7E |
| 0000022720 | 7500 | E903 | 0006 | FFB8 | E9FF | 0006 | 00B8 | E900 |
| 0000022740 | 0000 | 5F5E | ED83 | 8B02 | 1FE5 | 4D5D | 1ECB | 9058 |
| 0000022760 | 5545 | EC8B | 8E1E | 81D8 | 00EC | 5700 | C756 | 7206 |
| 0000023000 | 0100 | C700 | 4206 | 0000 | C700 | 4406 | 0100 | C700 |
| 0000023020 | 4606 | 0100 | 5E00 | 835F | 02ED | E58B | 5D1F | CB4D |
| 0000023040 | 581E | 4590 | 8B55 | 1EEC | D88E | EC81 | 0000 | 5657 |
| 0000023060 | 06C7 | 006E | 0140 | 06C7 | 0070 | 00F0 | 36FF | 0070 |
| 0000023100 | 36FF | 006E | E89A | 5B29 | 831F | 04C4 | 00E9 | 5E00 |
| 0000023120 | 835F | 02ED | E58B | 5D1F | CB4D | 581E | 4590 | 8B55 |
| 0000023140 | 1EEC | D88E | EC81 | 0006 | 5657 | 46C7 | 00FC | 9A00 |
| 0000023160 | 3063 | 2073 | 003D | 7500 | E903 | 0067 | 46C7 | 00FA |
| 0000023200 | E900 | 0003 | 46FF | 8BFA | 0A46 | 4639 | 72FA | E903 |
| 0000023220 | 002A | 466B | 58FA | 0603 | 0056 | 168B | 0058 | 5052 |
| 0000023240 | 8A9A | 982F | 8320 | 04C4 | 4689 | 3DFC | 0000 | 0375 |
| 0000023260 | 06E9 | 8B00 | FC46 | 30E9 | E900 | FFC8 | 7E83 | 000A |
| 0000023300 | 0377 | 08E9 | 9A00 | 3022 | 2017 | 4689 | 83FC | 4A3E |
| 0000023320 | 0100 | 0374 | 06E9 | B800 | 0000 | 03E9 | B800 | 0001 |
| 0000023340 | 4AA3 | 8B00 | FC46 | 00E9 | 5E00 | 835F | 02ED | E58B |
| 0000023360 | 5D1F | CB4D | 581E | 4590 | 8B55 | 1EEC | D88E | EC81 |
| 0000023400 | 001C | 5657 | 46C7 | 02E8 | C700 | EA46 | 0000 | C02B |
| 0000023420 | 4689 | 89EE | EC46 | 006A | 006A | 006A | 086A | 468D |
| 0000023440 | 16E8 | 6A50 | 9A04 | DFDD | 2120 | C483 | 890E | F046 |
| 0000023460 | 7E83 | 00F0 | 0375 | 06E9 | B800 | FFFF | F8E9 | A101 |
| 0000023500 | 005E | 8B40 | C1C8 | 02E0 | C103 | E0D1 | 9A50 | 8ECE |
| 0000023520 | 2205 | C483 | 8902 | F646 | 5689 | 8BF8 | F846 | 460B |
| 0000023540 | 74F6 | E903 | 0006 | FFB8 | E9FF | 01CB | 46C7 | 00E6 |
| 0000023560 | E900 | 0003 | 46FF | 8BE6 | E646 | 0639 | 005E | 0377 |
| 0000023600 | F9E9 | 6B00 | E676 | C458 | 601E | 2600 | 408B | 8B24 |
| 0000023620 | E65E | CB8B | E3C1 | 0302 | D1D9 | C4E3 | F676 | 8926 |
| 0000023640 | 6B00 | E676 | C458 | 601E | 2600 | 408B | 8B26 | E676 |
| 0000023660 | CE8B | E6C1 | 0302 | D1F1 | C4E6 | F65E | 8926 | 0240 |
| 0000023700 | 766B | 58E6 | 1EC4 | 0060 | 8B26 | 2840 | 768B | 8BE6 |
| 0000023720 | C1CE | 02E6 | F103 | E6D1 | 5EC4 | 26F6 | 4089 | 6B04 |
| 0000023740 | E676 | C458 | 601E | 2600 | 408B | 8B2A | E676 | CE8B |
| 0000023760 | E6C1 | 0302 | D1F1 | C4E6 | F65E | 8926 | 0640 | 766B |
| 0000024000 | 58E6 | 1EC4 | 0060 | FF26 | 2A70 | 766B | 58E6 | 1EC4 |
| 0000024020 | 0060 | FF26 | 2870 | 766B | 58E6 | 1EC4 | 0060 | FF26 |
| 0000024040 | 2670 | 766B | 58E6 | 1EC4 | 0060 | FF26 | 2470 | 681E |
| 0000024060 | 00EA | 829A | 7075 | 8322 | 0CC4 | 766B | 58E6 | 1EC4 |
| 0000024100 | 0060 | 8326 | 2C78 | 7400 | E903 | 0018 | 768B | 8BE6 |
| 0000024120 | C1C6 | 02E6 | F003 | E6D1 | 5EC4 | 26F6 | 40C7 | 0108 |
| 0000024140 | E900 | 0015 | 768B | 8BE6 | C1C6 | 02E6 | F003 | E6D1 |
| 0000024160 | 5EC4 | 26F6 | 40C7 | 0008 | E900 | FEF8 | 5EA1 | 8900 |
| 0000024200 | FA46 | 46C7 | 00FC | A100 | 005E | C88B | E0C1 | 0302 |

THU MAR 14 17:25:16 1991 CRV_IPS.DLL PAGE 12, LINE 650

| | | | | | | | | |
|---|---|---|---|---|---|---|---|---|
| 0000024220 | D1C1 | 89E0 | E446 | 468B | 05E4 | 0004 | 9A50 | 8ECE |
| 0000024240 | 229C | C483 | 8902 | F246 | 5689 | 8BF4 | F446 | 460B |
| 0000024260 | 74F2 | E903 | 0006 | FFB8 | E9FF | 007B | 046A | 468D |
| 0000024300 | 16FA | FF50 | F476 | 76FF | 9AF2 | 9F64 | 22B8 | C483 |
| 0000024320 | FF0A | E476 | 76FF | FFF8 | F676 | 468B | 8BF2 | F456 |
| 0000024340 | 0405 | 5200 | 9A50 | 9F64 | 19FA | C483 | 6A0A | 6A00 |
| 0000024360 | 6A00 | 8A00 | E446 | 0404 | FF50 | F476 | 76FF | 6AF2 |
| 0000024400 | 9A07 | DFDD | 22F4 | C483 | 890E | F046 | 7E83 | 00F0 |
| 0000024420 | 0375 | 06E9 | B800 | FFFF | 1CE9 | FF00 | F476 | 76FF |
| 0000024440 | 9AF2 | 8ED8 | 2302 | C483 | FF04 | F876 | 76FF | 9AF6 |
| 0000024460 | 8ED8 | 20F8 | C483 | 5E04 | 835F | 02ED | E58B | 5D1F |
| 0000024500 | CB4D | 581E | 4590 | 8B55 | 1EEC | D88E | EC81 | 0018 |
| 0000024520 | 5657 | 5EC4 | 2606 | 478B | C428 | 065E | 2B26 | 2447 |
| 0000024540 | 003D | 7F00 | E903 | 0011 | 5EC4 | 2606 | 478B | C428 |
| 0000024560 | 065E | 2B26 | 2447 | 0EE9 | C400 | 065E | 8B26 | 2447 |
| 0000024600 | 5EC4 | 2606 | 472B | 8928 | E846 | 5EC4 | 2606 | 478B |
| 0000024620 | C42A | 065E | 2B26 | 2647 | 003D | 7F00 | E903 | 0011 |
| 0000024640 | 5EC4 | 2606 | 478B | C42A | 065E | 2B26 | 2647 | 0EE9 |
| 0000024660 | C400 | 065E | 8B26 | 2647 | 5EC4 | 2606 | 472B | 892A |
| 0000024700 | EA46 | 5EC4 | 2606 | 478B | C424 | 065E | 3B26 | 2847 |
| 0000024720 | 037F | 04E9 | 2600 | 478B | 8928 | EC46 | 5EC4 | 2606 |
| 0000024740 | 478B | C426 | 065E | 3B26 | 2A47 | 037F | 04E9 | 2600 |
| 0000024760 | 478B | 892A | EE46 | 46C7 | 02F8 | 8300 | 16EC | 8D1E |
| 0000025000 | E876 | FC8B | C783 | 1602 | 1607 | B91F | 000B | A5F3 |
| 0000025020 | 9A1F | 2BBB | 2042 | C483 | E916 | 0000 | 5F5E | ED83 |
| 0000025040 | 8B02 | 1FE5 | 4D5D | 1ECB | 9058 | 5545 | EC8B | 8E1E |
| 0000025060 | 81D8 | 18EC | 5700 | C456 | 065E | 8B26 | 2847 | 5EC4 |
| 0000025100 | 2606 | 472B | 3D24 | 0000 | 037F | 11E9 | C400 | 065E |
| 0000025120 | 8B26 | 2847 | 5EC4 | 2606 | 472B | E924 | 000E | 5EC4 |
| 0000025140 | 2606 | 478B | C424 | 065E | 2B26 | 2847 | 4689 | C4E8 |
| 0000025160 | 065E | 8B26 | 2A47 | 5EC4 | 2606 | 472B | 3D26 | 0000 |
| 0000025200 | 037F | 11E9 | C400 | 065E | 8B26 | 2A47 | 5EC4 | 2606 |
| 0000025220 | 472B | E926 | 000E | 5EC4 | 2606 | 478B | C426 | 065E |
| 0000025240 | 2B26 | 2A47 | 4689 | C4EA | 065E | 8B26 | 2447 | 5EC4 |
| 0000025260 | 2606 | 473B | 7F28 | E903 | 0004 | 8B26 | 2847 | 4689 |
| 0000025300 | C4EC | 065E | 8B26 | 2647 | 5EC4 | 2606 | 473B | 7F2A |
| 0000025320 | E903 | 0004 | 8B26 | 2A47 | 4689 | C7EE | F846 | 0004 |
| 0000025340 | EC83 | 1E16 | 768D | 8BE8 | 83FC | 02C7 | 0716 | 1F16 |
| 0000025360 | 0BB9 | F300 | 1FA5 | BB9A | E42B | 8323 | 16C4 | 00E9 |
| 0000025400 | 5E00 | 835F | 02ED | E58B | 5D1F | CB4D | 581E | 4590 |
| 0000025420 | 8B55 | 1EEC | D88E | EC81 | 0018 | 5657 | 5EC4 | 2606 |
| 0000025440 | 478B | C428 | 065E | 2B26 | 2447 | 003D | 7F00 | E903 |
| 0000025460 | 0011 | 5EC4 | 2606 | 478B | C428 | 065E | 2B26 | 2447 |
| 0000025500 | 0EE9 | C400 | 065E | 8B26 | 2447 | 5EC4 | 2606 | 472B |
| 0000025520 | 8928 | E846 | 5EC4 | 2606 | 478B | C42A | 065E | 2B26 |
| 0000025540 | 2647 | 003D | 7F00 | E903 | 0011 | 5EC4 | 2606 | 478B |
| 0000025560 | C42A | 065E | 2B26 | 2647 | 0EE9 | C400 | 065E | 8B26 |
| 0000025600 | 2647 | 5EC4 | 2606 | 472B | 892A | EA46 | 5EC4 | 2606 |
| 0000025620 | 478B | C424 | 065E | 3B26 | 2847 | 037F | 04E9 | 2600 |
| 0000025640 | 478B | 8928 | EC46 | 5EC4 | 2606 | 478B | C426 | 065E |
| 0000025660 | 3B26 | 2A47 | 037F | 04E9 | 2600 | 478B | 892A | EE46 |
| 0000025700 | 5EC4 | 260A | 478B | C428 | 0A5E | 2B26 | 2447 | 003D |
| 0000025720 | 7F00 | E903 | 0011 | 5EC4 | 260A | 478B | C428 | 0A5E |
| 0000025740 | 2B26 | 2447 | 0EE9 | C400 | 0A5E | 8B26 | 2447 | 5EC4 |
| 0000025760 | 260A | 472B | 8928 | F046 | 5EC4 | 260A | 478B | C42A |
| 0000026000 | 0A5E | 2B26 | 2647 | 003D | 7F00 | E903 | 0011 | 5EC4 |
| 0000026020 | 260A | 478B | C42A | 0A5E | 2B26 | 2647 | 0EE9 | C400 |
| 0000026040 | 0A5E | 8B26 | 2647 | 5EC4 | 260A | 472B | 892A | F246 |
| 0000026060 | 5EC4 | 260A | 478B | C428 | 0A5E | 3B26 | 2447 | 037F |

THU MAR 14 17:25:16 1991 CRV_IPS.DLL PAGE 13, LINE 709

| | | | | | | | | |
|---|---|---|---|---|---|---|---|---|
| 0000026100 | 04E9 | 2600 | 478B | 8924 | F446 | 5EC4 | 260A | 478B |
| 0000026120 | C426 | 0A5E | 3B26 | 2A47 | 037F | 04E9 | 2600 | 478B |
| 0000026140 | 892A | F646 | 46C7 | 03F8 | 8300 | 16EC | 8D1E | E876 |
| 0000026160 | FC8B | C783 | 1602 | 1607 | B91F | 000B | A5F3 | 9A1F |
| 0000026200 | 2BBB | 24C9 | C483 | E916 | 0000 | 5F5E | ED83 | 8B02 |
| 0000026220 | 1FE5 | 4D5D | 1ECB | 9058 | 5545 | EC8B | 8E1E | 81D8 |
| 0000026240 | 5EEC | 5700 | 8B56 | 0646 | 568B | 1EC8 | 7E8D | 8BA6 |
| 0000026260 | 16F0 | 8E07 | R9DA | 002C | A5F3 | 8B1F | 0A46 | 462B |
| 0000026300 | 890E | A446 | 468B | 2B0C | 1046 | 4689 | 8BA2 | A446 |
| 0000026320 | 5EC4 | 2606 | 4701 | 8B28 | A246 | 5EC4 | 2606 | 4701 |
| 0000026340 | 8B2A | A446 | 5EC4 | 2606 | 4701 | 8B24 | A246 | 5EC4 |
| 0000026360 | 2606 | 4701 | 8E26 | 9E06 | 2631 | 28A1 | 480F | 5EC4 |
| 0000026400 | 2606 | 473B | 7D28 | E903 | 002F | 068E | 319E | A126 |
| 0000026420 | 0F2A | C448 | 065E | 3B26 | 2A47 | 037D | 1AE9 | C400 |
| 0000026440 | 065E | 8326 | 247F | 7D00 | E903 | 000D | 5EC4 | 2606 |
| 0000026460 | 7F83 | 0026 | 037C | 28E9 | 8B00 | A446 | 5EC4 | 2606 |
| 0000026500 | 4729 | 8B28 | A246 | 5EC4 | 2606 | 4729 | 8B2A | A446 |
| 0000026520 | 5EC4 | 2606 | 4729 | 8B24 | A246 | 5EC4 | 2606 | 4729 |
| 0000026540 | FF26 | 0876 | 76FF | 8D06 | A646 | 5016 | DC9A | 5224 |
| 0000026560 | 8326 | 08C4 | 00E9 | 5E00 | 835F | 02ED | E58B | 5D1F |
| 0000026600 | CB4D | 581E | 4590 | 8B55 | 1EEC | D88E | EC81 | 005A |
| 0000026620 | 5657 | 468B | 8B06 | 0856 | 8D1E | A67E | F08B | 0716 |
| 0000026640 | DA8E | 2CB9 | F300 | 1FA5 | 468B | E90E | 0093 | 468B |
| 0000026660 | C40C | 065E | 8926 | 2A47 | A7E9 | 8B00 | 0C46 | 5EC4 |
| 0000026700 | 2606 | 4789 | E926 | 009A | 468B | C40A | 065E | 8926 |
| 0000026720 | 2447 | 8DE9 | 8B00 | 0A46 | 5EC4 | 2606 | 4789 | E928 |
| 0000026740 | 0080 | 468B | C40A | 065E | 8926 | 2847 | 468B | C40C |
| 0000026760 | 065E | 8926 | 2A47 | 69E9 | 8B00 | 0A46 | 5EC4 | 2606 |
| 0000027000 | 4789 | 8B24 | 0C46 | 5EC4 | 2606 | 4789 | E92A | 0052 |
| 0000027020 | 468B | C40A | 065E | 8926 | 2447 | 468B | C40C | 065E |
| 0000027040 | 8926 | 2647 | 3BE9 | 8B00 | 0A46 | 5EC4 | 2606 | 4789 |
| 0000027060 | 8B28 | 0C46 | 5EC4 | 2606 | 4789 | E926 | 0024 | 21E9 |
| 0000027100 | 4800 | 073D | 7600 | E903 | 0018 | E0D1 | 2E93 | A7FF |
| 0000027120 | 2822 | 277E | 278B | 2798 | 27A5 | 27B2 | 27C9 | 27E0 |
| 0000027140 | 27F7 | 76FF | FF08 | 0676 | 468D | 16A6 | 9A50 | 24DC |
| 0000027160 | 273F | C483 | E908 | 0000 | 5F5E | ED83 | 8B02 | 1FE5 |
| 0000027200 | 4D5D | 1ECB | 9058 | 5545 | EC8B | 8E1E | 81D8 | 0CEC |
| 0000027220 | 5700 | 8B56 | 1046 | 460B | 750E | E903 | 0161 | 3E83 |
| 0000027240 | 00FE | 7400 | E903 | 00D3 | 5EC4 | 260E | 478A | 8828 |
| 0000027260 | FA46 | 5EC4 | 260E | 478A | 882A | F846 | 02A0 | 9801 |
| 0000027300 | C88B | 468A | 98FA | C803 | F9D1 | C183 | 8302 | FCE1 |
| 0000027320 | 4E89 | 8BFC | FC46 | 5EC4 | 2606 | 0701 | 03A0 | 9801 |
| 0000027340 | C88B | 468A | 98F8 | C803 | F9D1 | 5EC4 | 260A | 0F01 |
| 0000027360 | 468A | D0FC | 2AE0 | FA46 | D8F6 | 0600 | 0102 | 468A |
| 0000027400 | 02F8 | 0306 | 2401 | A201 | 0103 | 068E | 319E | A126 |
| 0000027420 | 0F28 | C448 | 065E | 3B26 | 7C07 | E903 | 000F | 068E |
| 0000027440 | 319E | A126 | 0F28 | C448 | 065E | 8926 | C407 | 065E |
| 0000027460 | 8326 | 003F | 037C | 08E9 | C400 | 065E | C726 | 0007 |
| 0000027500 | 8E00 | 9E06 | 2631 | 2AA1 | 480F | 5EC4 | 260A | 073B |
| 0000027520 | 037C | 0FE9 | 8E00 | 9E06 | 2631 | 2AA1 | 480F | 5EC4 |
| 0000027540 | 260A | 0789 | 5EC4 | 260A | 3F83 | 7C00 | E903 | 0008 |
| 0000027560 | 5EC4 | 260A | 07C7 | 0000 | 81E9 | C400 | 0E5E | 8B26 |
| 0000027600 | 2847 | 062B | 3492 | 4689 | C4F6 | 0E5E | 8B26 | 2A47 |
| 0000027620 | 062B | 3494 | 4689 | 83F4 | F67E | 7C00 | E903 | 0005 |
| 0000027640 | 46C7 | 00F6 | 8B00 | F646 | 0639 | 348E | 037E | 07E9 |
| 0000027660 | A100 | 348E | 8948 | F646 | 7E83 | 00F4 | 037C | 05E9 |
| 0000027700 | C700 | F446 | 0000 | 90A1 | 3934 | F446 | 037D | 07E9 |
| 0000027720 | A100 | 3490 | 8948 | F446 | 5E8B | D1F6 | C4E3 | 8636 |
| 0000027740 | 2634 | 008B | 5EC4 | 2606 | 0789 | 5E8B | D1F4 | C4E3 |

THU MAR 14 17:25:16 1991 CRV_IPS.DLL PAGE 14, LINE 768

| | | | | | | | | |
|---|---|---|---|---|---|---|---|---|
| 0000027760 | 8A36 | 2634 | 008B | 5EC4 | 260A | 0789 | 08E9 | B000 |
| 0000030000 | A200 | 0103 | 02A2 | B801 | 0000 | 00E9 | 5E00 | 835F |
| 0000030020 | 02ED | E58B | 5D1F | CB4D | 581E | 4590 | 8B55 | 1EEC |
| 0000030040 | D88E | EC81 | 0018 | 5657 | 468B | 8906 | E846 | 468B |
| 0000030060 | 8908 | EA46 | 46C7 | 00F8 | 8300 | FC3E | 0000 | 0374 |
| 0000030100 | 09E9 | C700 | FC06 | 0100 | E900 | 0006 | 06C7 | 00FC |
| 0000030120 | 0000 | EC83 | 1E16 | 768D | 8BE8 | 83FC | 02C7 | 0716 |
| 0000030140 | 1F16 | 0BB9 | F300 | 1FA5 | BB9A | 402B | 8328 | 16C4 |
| 0000030160 | 00E9 | 5E00 | 835F | 02ED | E58B | 5D1F | CB4D | 581E |
| 0000030200 | 4590 | 8B55 | 1EEC | D88E | EC81 | 0018 | 5657 | 3E83 |
| 0000030220 | 00FC | 7400 | E903 | 0006 | 00B8 | E900 | 0038 | 468B |
| 0000030240 | 8906 | E846 | 468B | 8908 | EA46 | 46C7 | 00F8 | C700 |
| 0000030260 | FC06 | 0000 | 8300 | 16EC | 8D1E | E876 | FC8B | C783 |
| 0000030300 | 1602 | 1607 | B91F | 000B | A5F3 | 9A1F | 2BBB | 2A3B |
| 0000030320 | C483 | E916 | 0000 | 5F5E | ED83 | 8B02 | 1FE5 | 4D5D |
| 0000030340 | 1ECB | 9058 | 5545 | EC8B | 8E1E | 81D8 | 18EC | 570D |
| 0000030360 | 8B56 | 0646 | 4689 | 8BE8 | 0846 | 4689 | 8BEA | 0A46 |
| 0000030400 | 4689 | 8BEC | 0C46 | 4689 | C7EE | F846 | 0001 | EC83 |
| 0000030420 | 1E16 | 768D | 8BE8 | 83FC | 02C7 | 0716 | 1F16 | 0BB9 |
| 0000030440 | F300 | 1FA5 | BB9A | 9E2B | 832A | 16C4 | 00E9 | 5E00 |
| 0000030460 | 835F | 02ED | E58B | 5D1F | CB4D | 581E | 4590 | 8B55 |
| 0000030500 | 1EEC | D88E | EC81 | 000A | 5657 | 5EC4 | 2606 | 478B |
| 0000030520 | C424 | 065E | 3B26 | 2847 | 037F | 04E9 | 2600 | 478B |
| 0000030540 | 8928 | FC46 | 5EC4 | 2606 | 478B | C424 | 065E | 3B26 |
| 0000030560 | 2847 | 037C | 04E9 | 2600 | 478B | 8928 | F846 | 5EC4 |
| 0000030600 | 2606 | 478B | C426 | 065E | 3B26 | 2A47 | 037F | 04E9 |
| 0000030620 | 2600 | 478B | 892A | FA46 | 5EC4 | 2606 | 478B | C426 |
| 0000030640 | 065E | 3B26 | 2A47 | 037C | 04E9 | 2600 | 478B | 892A |
| 0000030660 | F646 | 468B | C4FC | 065E | 8926 | 2447 | 468B | C4F8 |
| 0000030700 | 065E | 8926 | 2847 | 468B | C4FA | 065E | 8926 | 2647 |
| 0000030720 | 468B | C4F6 | 065E | 8926 | 2A47 | 00B8 | E900 | 0000 |
| 0000030740 | 5F5E | ED83 | 8B02 | 1FE5 | 4D5D | 1ECB | 9058 | 5545 |
| 0000030760 | EC8B | 8E1E | 81D8 | 22EC | 5700 | 2B56 | 89C0 | E446 |
| 0000031000 | 4689 | E9E2 | 0008 | 4683 | 01E2 | 5683 | 00E4 | 7E83 |
| 0000031020 | 7FE4 | 0376 | A9E9 | 7300 | E903 | 0009 | 7E83 | FFE2 |
| 0000031040 | 0372 | 9BE9 | 2B00 | 89C0 | E046 | 4689 | E9DE | 0008 |
| 0000031060 | 4683 | 01DE | 5683 | 00E0 | 7E83 | 7FE0 | 0376 | 7CE9 |
| 0000031100 | 7300 | E903 | 0009 | 7E83 | FFDE | 0372 | 6EE9 | FF00 |
| 0000031120 | 7E36 | FF34 | 7C36 | 6A34 | 8D16 | E646 | 5016 | 959A |
| 0000031140 | 6DCF | 832C | 0AC4 | 4689 | 83FC | FC7E | 7500 | E903 |
| 0000031160 | 0006 | FFB8 | E9FF | 005A | 7E83 | 01F8 | 0374 | 39E9 |
| 0000031200 | C700 | 1846 | 0000 | 46C7 | 011A | FF00 | 7E36 | FF34 |
| 0000031220 | 7C36 | 6A34 | 8D16 | 0646 | 5016 | 299A | D4CF | 8322 |
| 0000031240 | 0AC4 | 4689 | 83FC | FC7E | 7500 | E903 | 0006 | FFB8 |
| 0000031260 | E9FF | 001E | 00B8 | E900 | 0018 | 73E9 | E9FF | FF46 |
| 0000031300 | 681E | 0104 | 829A | 3175 | 832C | 04C4 | FFB8 | E9FF |
| 0000031320 | 0000 | 5F5E | ED83 | 8B02 | 1FE5 | 4D5D | 1ECB | 9058 |
| 0000031340 | 5545 | EC8B | 8E1E | 81D8 | 00EC | 5700 | 6A56 | 1E04 |
| 0000031360 | 7C68 | 6A34 | 6A00 | 6A00 | 6A00 | 9A3D | DFDD | 2C97 |
| 0000031400 | C483 | E90E | 0000 | 5F5E | ED83 | 8B02 | 1FE5 | 4D5D |
| 0000031420 | 1ECB | 9058 | 5545 | EC8B | 8E1E | 81D8 | 18EC | 5700 |
| 0000031440 | C756 | F846 | 0005 | EC83 | 1E16 | 768D | 8BE8 | 83FC |
| 0000031460 | 02C7 | 0716 | 1F16 | 0BB9 | F300 | 1FA5 | BB9A | F72B |
| 0000031500 | 832A | 16C4 | 00E9 | 5E00 | 835F | 02ED | E58B | 5D1F |
| 0000031520 | CB4D | 581E | 4590 | 8B55 | 1EEC | D88E | EC81 | 0004 |
| 0000031540 | 5657 | 06C7 | 00FE | 0001 | 468B | 8B06 | 0856 | 92A3 |
| 0000031560 | 8934 | 9416 | 9A34 | 1FBD | 2D53 | 76FF | FF0C | 0A76 |
| 0000031600 | 9B9A | 732D | 832D | 04C4 | 4689 | 83FC | FC7E | 7500 |
| 0000031620 | E903 | 0006 | 468B | E9FC | 0026 | 76FF | FF10 | 0E76 |

THU MAR 14 17:25:16 1991 CRV_IPS.DLL PAGE 15, LINE 827

| | | | | | | | | |
|---|---|---|---|---|---|---|---|---|
| 0000031640 | 729A | 0F2E | 832D | 04C4 | 4689 | 83FC | FC7E | 7500 |
| 0000031660 | E903 | 0006 | 468B | E9FC | 0006 | 00B8 | E900 | 0000 |
| 0000031700 | 5F5E | ED83 | 8B02 | 1FE5 | 4D5D | 1ECB | 9058 | 5545 |
| 0000031720 | EC8B | 8E1E | 81D8 | 0CEC | 5700 | 8E56 | 9E06 | 2631 |
| 0000031740 | 28A1 | 2B0F | C7D2 | FA46 | 0000 | 46C7 | 00F8 | 8900 |
| 0000031760 | F656 | 4689 | 8DF4 | F45E | 9E9A | D3BD | 8D2D | 065E |
| 0000032000 | B39A | D8BA | 9A2D | BD84 | 2DDD | 839A | EBB9 | A32D |
| 0000032020 | 348E | 8EA1 | D134 | 50E0 | CE9A | 3B8E | 832E | 02C4 |
| 0000032040 | 86A3 | 8934 | 8816 | A134 | 3488 | 060B | 3486 | 0374 |
| 0000032060 | 06E9 | B800 | FFFF | 5EE9 | C700 | FC46 | 0000 | 03E9 |
| 0000032100 | FF00 | FC46 | 468B | 39FC | 8E06 | 7734 | E903 | 0041 |
| 0000032120 | 468B | 2BFC | C7D2 | FA46 | 0000 | 46C7 | 00F8 | 8900 |
| 0000032140 | F656 | 4689 | 8DF4 | F45E | 9E9A | 43BD | 8D2E | 065E |
| 0000032160 | DB9A | 48BA | 9A2E | BD84 | 2E4D | 839A | CEB9 | 252C |
| 0000032200 | FFFE | 5E8B | D1FC | C4E3 | 8636 | 2634 | 0089 | B0E9 |
| 0000032220 | B8FF | 0000 | 00E9 | 5E00 | 835F | 02ED | E58B | 5D1F |
| 0000032240 | CB4D | 581E | 4590 | 8B55 | 1EEC | D88E | EC81 | 000C |
| 0000032260 | 5657 | 068E | 319E | A126 | 0F2A | D22B | 46C7 | 00FA |
| 0000032300 | C700 | F846 | 0000 | 5689 | 89F6 | F446 | 5E8D | 9AF4 |
| 0000032320 | BD9E | 2EAA | 5E8D | 9A06 | BAB3 | 2EAF | 849A | B4BD |
| 0000032340 | 9A2E | B983 | 2EC2 | 90A3 | A134 | 3490 | E0D1 | 9A50 |
| 0000032360 | 8ECE | 2F11 | C483 | A302 | 348A | 1689 | 348C | 8CA1 |
| 0000032400 | 0B34 | 8A06 | 7434 | E903 | 0006 | FFB8 | E9FF | 005D |
| 0000032420 | 46C7 | 00FC | E900 | 0003 | 46FF | A1FC | 3490 | 4639 |
| 0000032440 | 72FC | E903 | 0041 | 468B | 2BFC | C7D2 | FA46 | 0000 |
| 0000032460 | 46C7 | 00F8 | 8900 | F656 | 4689 | 8DF4 | F45E | 9E9A |
| 0000032500 | 19BD | 8D2F | 065E | DB9A | 1EBA | 9A2F | BD84 | 2F23 |
| 0000032520 | 839A | CBB9 | 252D | FFFE | 5E8B | D1FC | C4E3 | 8A36 |
| 0000032540 | 2634 | 0089 | B1E9 | B8FF | 0000 | 00E9 | 5E00 | 835F |
| 0000032560 | 02ED | E58B | 5D1F | CB4D | 581E | 4590 | 8B55 | 1EEC |
| 0000032600 | D88E | EC81 | 0000 | 5657 | 06C7 | 0100 | 0001 | 5F5E |
| 0000032620 | ED83 | 8B02 | 1FE5 | 4D5D | 1ECB | 9058 | 5545 | EC8B |
| 0000032640 | 8E1E | 81D8 | 00EC | 5700 | C756 | 0006 | 0001 | 5E00 |
| 0000032660 | 835F | 02ED | E58B | 5D1F | CB4D | 581E | 4590 | 8B55 |
| 0000032700 | 1EEC | D88E | EC81 | 001A | 5657 | 5EC4 | 2606 | 478B |
| 0000032720 | 8924 | E646 | 5EC4 | 2606 | 478B | 8926 | E846 | 5EC4 |
| 0000032740 | 2606 | 478B | 8928 | EA46 | 5EC4 | 2606 | 478B | 892A |
| 0000032760 | EC46 | 5EC4 | 2606 | 7F83 | 002C | 0374 | 08E9 | C700 |
| 0000033000 | EE46 | 0001 | 05E9 | C700 | EE46 | 0000 | 46C7 | 06F6 |
| 0000033020 | 8300 | 16EC | 8D1E | E676 | FC8B | C783 | 1602 | 1607 |
| 0000033040 | B91F | 000B | A5F3 | 9A1F | 2BBB | 2D48 | C483 | 8916 |
| 0000033060 | FC46 | 7E83 | 00FC | 0375 | 06E9 | B800 | FFFF | 06E9 |
| 0000033100 | B800 | 0000 | 00E9 | 5E00 | 835F | 02ED | E58B | 5D1F |
| 0000033120 | CB4D | 581E | 4590 | 8B55 | 1EEC | D88E | EC81 | 0018 |
| 0000033140 | 5657 | 46C7 | 07F8 | 8300 | 16EC | 8D1E | E876 | FC8B |
| 0000033160 | C783 | 1602 | 1607 | B91F | 000B | A5F3 | 9A1F | 2BBB |
| 0000033200 | 2FFA | C483 | E916 | 0000 | 5F5E | ED83 | 8B02 | 1FE5 |
| 0000033220 | 4D5D | 1ECB | 9058 | 5545 | EC8B | 8E1E | 81D8 | 00EC |
| 0000033240 | 5700 | A156 | 0100 | 00E9 | 5E00 | 835F | 02ED | E58B |
| 0000033260 | 5D1F | CB4D | 581E | 4590 | 8B55 | 1EEC | D88E | EC81 |
| 0000033300 | 003A | 5657 | B81E | 0D8A | D88E | 46C7 | 84F8 | 8C01 |
| 0000033320 | FA5E | 46C7 | 01E6 | 2B01 | 89C0 | D446 | 4689 | 8ED2 |
| 0000033340 | A006 | 2631 | 3E83 | FFFF | 7500 | E903 | 001D | 36FF |
| 0000033360 | 0208 | 36FF | 0206 | 468D | 16C8 | 9A50 | FFFF | 0000 |
| 0000033400 | C483 | 3D08 | 0000 | 0374 | 0FE9 | 8E00 | A206 | 2631 |
| 0000033420 | 3E83 | 318C | 7500 | E903 | 003B | 681E | 0188 | 468D |
| 0000033440 | 16DA | 8D50 | C846 | 5016 | 468D | 16F2 | 6850 | 00AC |
| 0000033460 | 681E | 02D8 | 36FF | 0204 | 36FF | 0202 | 36FF | 0208 |
| 0000033500 | 36FF | 0206 | FF9A | 00FF | 8300 | 1EC4 | 4689 | 89F2 |

THU MAR 14 17:25:16 1991 CRV_IPS.DLL PAGE 16, LINE 886

| | | | | | | | | |
|---|---|---|---|---|---|---|---|---|
| 0000033520 | F456 | 08E9 | 2B00 | 89C0 | F446 | 4689 | C7F2 | 0C06 |
| 0000033540 | 0002 | C700 | 0E06 | 0002 | C700 | 1006 | 0002 | C700 |
| 0000033560 | 0A06 | 0002 | C700 | 2006 | 0002 | C700 | 0A06 | 0036 |
| 0000033600 | C400 | 065E | 8B26 | 2447 | 4689 | 83C6 | C67E | 7603 |
| 0000033620 | E903 | 0009 | 7E83 | 01C6 | 0372 | 7DE9 | 8E00 | A006 |
| 0000033640 | 2631 | 3E83 | 30B6 | 7500 | E903 | 0009 | 7E83 | FECC |
| 0000033660 | 0374 | 0FE9 | 8E00 | A206 | 2631 | 3E83 | FFFF | 7500 |
| 0000033700 | E903 | 0050 | 46C7 | FFCE | FFFF | D476 | 76FF | 8DD2 |
| 0000033720 | CE46 | 5016 | 76FF | FFE6 | FA76 | 76FF | 8DF8 | DA4E |
| 0000033740 | 5116 | 4E8D | 16F2 | 8D51 | C84E | 5116 | 681E | 02D8 |
| 0000033760 | BD68 | FF00 | 0436 | FF02 | 0236 | FF02 | 0836 | FF02 |
| 0000034000 | 0636 | 9A02 | FFFF | 0000 | C483 | 8B28 | CE46 | B3E9 |
| 0000034020 | E90F | 0006 | FFB8 | E9FF | 0FAA | 068E | 31A4 | A126 |
| 0000034040 | 0F2C | 2B48 | 26D2 | 36F7 | 0F2E | 8940 | FC46 | 7E83 |
| 0000034060 | 01FC | 0377 | 5BE9 | 6A02 | 6A00 | 6A00 | 6A00 | 6A00 |
| 0000034100 | 6A00 | 6A00 | 9A4E | DFDD | 331C | C483 | 890E | F646 |
| 0000034120 | 7E83 | 00F6 | 0375 | D8E9 | 8E00 | A006 | 2631 | 3E83 |
| 0000034140 | 328B | 7500 | E903 | 004C | 7E83 | FECC | 0375 | 43E9 |
| 0000034160 | FF00 | F676 | 36FF | 02CA | 36FF | 02C8 | 468D | 16DA |
| 0000034200 | 8D50 | F246 | 5016 | 468D | 16C8 | 1E50 | D868 | 6802 |
| 0000034220 | 00C7 | 36FF | 0204 | 36FF | 0202 | 36FF | 0208 | 36FF |
| 0000034240 | 0206 | 681E | 018C | D768 | 6833 | 33DA | DD9A | 0033 |
| 0000034260 | 8300 | 28C4 | 068E | 31A0 | 8326 | 943E | 0033 | 0375 |
| 0000034300 | 09E9 | 8300 | CC7E | 74FE | E903 | 000F | 068E | 31A2 |
| 0000034320 | 8326 | 033E | 0034 | 0375 | 50E9 | C700 | CE46 | FFEF |
| 0000034340 | 76FF | FFD4 | D276 | 468D | 16CE | FF50 | E676 | 76FF |
| 0000034360 | FFFA | F876 | 4E8D | 16DA | 8D51 | F24E | 5116 | 4E8D |
| 0000034400 | 16C8 | 1E51 | D868 | 6802 | 00C8 | 36FF | 0204 | 36FF |
| 0000034420 | 0202 | 36FF | 0208 | 36FF | 0206 | 4C9A | 0034 | 8300 |
| 0000034440 | 28C4 | 468B | E9CE | 0E9C | 06E9 | B800 | FFEF | 93E9 |
| 0000034460 | 6A0E | 6A00 | 9A64 | FFFF | 0000 | 468B | 8B06 | 0856 |
| 0000034500 | 2605 | 5200 | 1E50 | 6668 | 9A02 | 91D2 | 333C | C483 |
| 0000034520 | 8308 | C67E | 7701 | E903 | 0037 | 468B | 8B06 | 0856 |
| 0000034540 | 4605 | 5200 | 1E50 | 8668 | 9A02 | 91D2 | 335C | C483 |
| 0000034560 | 8308 | C67E | 7702 | E903 | 0017 | 468B | 8B06 | 0856 |
| 0000034600 | 6605 | 5200 | 1E50 | A668 | 9A02 | 91D2 | 2EA2 | C483 |
| 0000034620 | C708 | 0806 | 0A36 | 8B00 | C646 | 0AA3 | C402 | 065E |
| 0000034640 | C726 | 2447 | 0001 | 76FF | FF08 | 0676 | 079A | 505F |
| 0000034660 | 8930 | E846 | 7E83 | 00E8 | 0375 | 57E9 | 8E00 | A006 |
| 0000034700 | 2631 | 3E83 | 33EB | 7500 | E903 | 0048 | 7E83 | FECC |
| 0000034720 | 0375 | 3FE9 | FF00 | E876 | 681E | 0194 | 468D | 16DA |
| 0000034740 | 8D50 | F246 | 5016 | 468D | 16C8 | 1E50 | D868 | 6802 |
| 0000034760 | 00DC | 36FF | 0204 | 36FF | 0202 | 36FF | 0208 | 36FF |
| 0000035000 | 0206 | 681E | 01AA | E768 | 6834 | 34EA | ED9A | 0034 |
| 0000035020 | 8300 | 28C4 | 068E | 31A0 | 8326 | A03E | 0034 | 0375 |
| 0000035040 | 09E9 | 8300 | CC7E | 74FE | E903 | 000F | 068E | 31A2 |
| 0000035060 | 8326 | 133E | 0035 | 0375 | 51E9 | 8B00 | E846 | 4689 |
| 0000035100 | FFCE | D476 | 76FF | 8DD2 | CE46 | 5016 | 76FF | FFE6 |
| 0000035120 | FA76 | 76FF | 8DF8 | DA4E | 5116 | 4E8D | 16F2 | 8D51 |
| 0000035140 | C84E | 5116 | 681E | 02D8 | DE68 | FF00 | 0436 | FF02 |
| 0000035160 | 0236 | FF02 | 0836 | FF02 | 0636 | 9A02 | 355C | 0000 |
| 0000035200 | C483 | 8B28 | CE46 | 3BE9 | E90D | 0006 | 468B | E9E8 |
| 0000035220 | 0D32 | 068E | 31A4 | FF26 | 1E36 | 260F | 36FF | 0F1C |
| 0000035240 | 468B | 8B06 | 0856 | 2605 | 5200 | 6A50 | 6A78 | 6A00 |
| 0000035260 | 6A00 | 8D00 | D646 | 5016 | FF9A | 00FF | 8900 | E846 |
| 0000035300 | 7E83 | 00E8 | 0375 | D9E9 | 8E00 | A006 | 2631 | 3E83 |
| 0000035320 | 34FB | 7500 | E903 | 004C | 7E83 | FECC | 0375 | 43E9 |
| 0000035340 | FF00 | E876 | 36FF | 02CE | 36FF | 02CC | 468D | 16DA |
| 0000035360 | 8D50 | F246 | 5016 | 468D | 16C8 | 1E50 | D868 | 6802 |

THU MAR 14 17:25:16 1991 CRV_IPS.DLL PAGE 17, LINE 945

| | | | | | | | | |
|---|---|---|---|---|---|---|---|---|
| 0000035400 | 00E9 | 36FF | 0204 | 36FF | 0202 | 36FF | 0208 | 36FF |
| 0000035420 | 0206 | 681E | 01B2 | FF68 | 68FF | FFFF | FF9A | 00FF |
| 0000035440 | 8300 | 28C4 | 068E | 31A0 | 8326 | 743E | 0031 | 0375 |
| 0000035460 | 09E9 | 8300 | CC7E | 74FE | E903 | 000F | 068E | 31A2 |
| 0000035500 | 8326 | E23E | 0030 | 0375 | 51E9 | 8B00 | E846 | 4689 |
| 0000035520 | FFCE | D476 | 76FF | 8DD2 | CE46 | 5016 | 76FF | FFE6 |
| 0000035540 | FA76 | 76FF | 8DF8 | DA4E | 5116 | 4E8D | 16F2 | 8D51 |
| 0000035560 | C84E | 5116 | 681E | 02D8 | EA68 | FF00 | 0436 | FF02 |
| 0000035600 | 0236 | FF02 | 0836 | FF02 | 0636 | 9A02 | 31D4 | 0000 |
| 0000035620 | C483 | 8B28 | CE46 | 2BE9 | E90C | 0006 | 468B | E9E8 |
| 0000035640 | 0C22 | 5EC4 | 26D6 | 478B | B95C | 000A | F799 | 83F9 |
| 0000035660 | 00FA | 0375 | 68E9 | C402 | D65E | 8B26 | 5C47 | F799 |
| 0000035700 | 99F9 | F9F7 | FA83 | 7400 | E903 | 0253 | 5EC4 | 26D6 |
| 0000035720 | 478B | BB5C | 0064 | F799 | 99FB | F9F7 | FA83 | 7400 |
| 0000035740 | E903 | 023B | 5EC4 | 26D6 | 478B | 8958 | EA46 | 5EC4 |
| 0000035760 | 26D6 | 478B | 895A | EC46 | 5EC4 | 26D6 | 478B | 035E |
| 0000036000 | EA46 | 8948 | EE46 | 5EC4 | 26D6 | 478B | 0360 | EC46 |
| 0000036020 | 8948 | F046 | 468D | 16EA | 6A50 | FF00 | D876 | 76FF |
| 0000036040 | 9AD6 | 6D3F | 337F | C483 | 890A | F646 | 7E83 | 00F6 |
| 0000036060 | 0375 | D9E9 | 8E00 | A006 | 2631 | 3E83 | 3667 | 7500 |
| 0000036100 | E903 | 004C | 7E83 | FECC | 0375 | 43E9 | FF00 | F676 |
| 0000036120 | 36FF | 02D2 | 36FF | 02D0 | 468D | 16DA | 8D50 | F246 |
| 0000036140 | 5016 | 468D | 16C8 | 1E50 | D868 | 6802 | 00F8 | 36FF |
| 0000036160 | 0204 | 36FF | 0202 | 36FF | 0208 | 36FF | 0206 | 681E |
| 0000036200 | 01BA | 6568 | 6837 | 3768 | 6B9A | 0037 | 8300 | 28C4 |
| 0000036220 | 068E | 31A0 | 8326 | 1E3E | 0037 | 0375 | 09E9 | 8300 |
| 0000036240 | CC7E | 74FE | E903 | 000F | 068E | 31A2 | 8326 | 913E |
| 0000036260 | 0037 | 0375 | 51E9 | 8B00 | F646 | 4689 | FFCE | D476 |
| 0000036300 | 76FF | 8DD2 | CE46 | 5016 | 76FF | FFE6 | FA76 | 76FF |
| 0000036320 | 8DF8 | DA4E | 5116 | 4E8D | 16F2 | 8D51 | C84E | 5116 |
| 0000036340 | 681E | 02D8 | F968 | FF00 | 0436 | FF02 | 0236 | FF02 |
| 0000036360 | 0836 | FF02 | 0636 | 9A02 | 37D9 | 0000 | C483 | 8B28 |
| 0000036400 | CE46 | BFE9 | E90A | 0006 | 468B | E9F6 | 0AB6 | 06C7 |
| 0000036420 | 020C | 0001 | 06C7 | 020A | 0001 | 06C7 | 3608 | 000A |
| 0000036440 | 46C7 | 00D0 | 6A00 | 6A00 | 6A00 | 6A00 | 8D02 | D046 |
| 0000036460 | 5016 | 476A | DD9A | 18DF | 8332 | 0EC4 | 4689 | 3DF6 |
| 0000036500 | 0000 | 0375 | D8E9 | 8E00 | A006 | 2631 | 3E83 | 3779 |
| 0000036520 | 7500 | E903 | 004C | 7E83 | FECC | 0375 | 43E9 | FF00 |
| 0000036540 | F676 | 36FF | 02CA | 36FF | 02C8 | 468D | 16DA | 8D50 |
| 0000036560 | F246 | 5016 | 468D | 16C8 | 1E50 | D868 | 6802 | 0103 |
| 0000036600 | 36FF | 0204 | 36FF | 0202 | 36FF | 0208 | 36FF | 0206 |
| 0000036620 | 681E | 01C2 | 7768 | 6832 | 327A | 7D9A | 0032 | 8300 |
| 0000036640 | 28C4 | 068E | 31A0 | 8326 | 303E | 0032 | 0375 | 09E9 |
| 0000036660 | 8300 | CC7E | 74FE | E903 | 000F | 068E | 31A2 | 8326 |
| 0000036700 | A33E | 0032 | 0375 | 50E9 | C700 | CE46 | FFEF | 76FF |
| 0000036720 | FFD4 | D276 | 468D | 16CE | FF50 | E676 | 76FF | FFFA |
| 0000036740 | F876 | 4E8D | 16DA | 8D51 | F24E | 5116 | 4E8D | 16C8 |
| 0000036760 | 1E51 | D868 | 6802 | 0104 | 36FF | 0204 | 36FF | 0202 |
| 0000037000 | 36FF | 0208 | 36FF | 0206 | EB9A | 0032 | 8300 | 28C4 |
| 0000037020 | 468B | E9CE | 09AE | 06E9 | B800 | FFEF | A5E9 | 8E09 |
| 0000037040 | A406 | 2631 | 36FF | 0F1E | FF26 | 1C36 | FF0F | D876 |
| 0000037060 | 76FF | 6AD6 | 6A00 | 6A00 | 9A01 | FFFF | 0000 | 4689 |
| 0000037100 | 83E8 | E87E | 7500 | E903 | 00D9 | 068E | 31A0 | 8326 |
| 0000037120 | 7C3E | 0038 | 0375 | 4CE9 | 8300 | CC7E | 75FE | E903 |
| 0000037140 | 0043 | 76FF | FFE8 | D636 | FF02 | D436 | 8D02 | DA46 |
| 0000037160 | 5016 | 468D | 16F2 | 8D50 | C846 | 5016 | 681E | 02D8 |
| 0000037200 | 0C68 | FF01 | 0436 | FF02 | 0236 | FF02 | 0836 | FF02 |
| 0000037220 | 0636 | 1E02 | CA68 | 6801 | 39FE | 0168 | 9A3A | 3A04 |
| 0000037240 | 0000 | C483 | 8E28 | A006 | 2631 | 3E83 | 3903 | 7500 |

THU MAR 14 17:25:16 1991 CRV_IPS.DLL PAGE 18, LINE 1004

| | | | | | | | | |
|---|---|---|---|---|---|---|---|---|
| 0000037260 | E903 | 0009 | 7E83 | FECC | 0374 | 0FE9 | 8E00 | A206 |
| 0000037300 | 2631 | 3E83 | 391B | 7500 | E903 | 0051 | 468B | 89E8 |
| 0000037320 | CE46 | 76FF | FFD4 | D276 | 468D | 16CE | FF50 | E676 |
| 0000037340 | 76FF | FFFA | F876 | 4E8D | 16DA | 8D51 | F24E | 5116 |
| 0000037360 | 4E8D | 16C8 | 1E51 | D868 | 6802 | 010D | 36FF | 0204 |
| 0000037400 | 36FF | 0202 | 36FF | 0208 | 36FF | 0206 | 639A | 0039 |
| 0000037420 | 8300 | 28C4 | 468B | E9CE | 08AA | 06E9 | 8B00 | E846 |
| 0000037440 | A1E9 | 8308 | C67E | 7601 | E903 | 007D | 068E | 31A0 |
| 0000037460 | 8326 | B73E | 0039 | 0375 | 09E9 | 8300 | CC7E | 74FE |
| 0000037500 | E903 | 000F | 068E | 31A2 | 8326 | 2A3E | 003A | 0375 |
| 0000037520 | 50E9 | C700 | CE46 | 0000 | 76FF | FFD4 | D276 | 468D |
| 0000037540 | 16CE | FF50 | E676 | 76FF | FFFA | F876 | 4E8D | 16DA |
| 0000037560 | 8D51 | F24E | 5116 | 4E8D | 16C8 | 1E51 | D868 | 6802 |
| 0000037600 | 0111 | 36FF | 0204 | 36FF | 0202 | 36FF | 0208 | 36FF |
| 0000037620 | 0206 | 739A | 003A | 8300 | 28C4 | 468B | E9CE | 0824 |
| 0000037640 | 06E9 | B800 | 0000 | 1BE9 | 8E08 | A406 | 2631 | 36FF |
| 0000037660 | 0F1E | FF26 | 1C36 | 8B0F | 0646 | 568B | 0508 | 0046 |
| 0000037700 | 5052 | 786A | 006A | 006A | 006A | 468D | 16D6 | 9A50 |
| 0000037720 | 3489 | 0000 | 4689 | 83E8 | E87E | 7500 | E903 | 00D9 |
| 0000037740 | 068E | 31A0 | 8326 | 123E | 003A | 0375 | 4CE9 | 8300 |
| 0000037760 | CC7E | 75FE | E903 | 0043 | 76FF | FFE8 | CE36 | FF02 |
| 0000040000 | CC36 | 8D02 | DA46 | 5016 | 468D | 16F2 | 8D50 | C846 |
| 0000040020 | 5016 | 681E | 02D8 | 1868 | FF01 | 0436 | FF02 | 0236 |
| 0000040040 | FF02 | 0836 | FF02 | 0636 | 1E02 | D268 | 6801 | 3B6A |
| 0000040060 | 6D68 | 9A3B | 3B70 | 0000 | C483 | 8E28 | A006 | 2631 |
| 0000040100 | 3E83 | 3B23 | 7500 | E903 | 0009 | 7E83 | FECC | 0374 |
| 0000040120 | 0FE9 | 8E00 | A206 | 2631 | 3E83 | 3B96 | 7500 | E903 |
| 0000040140 | 0051 | 468B | 89E8 | CE46 | 76FF | FFD4 | D276 | 468D |
| 0000040160 | 16CE | FF50 | E676 | 76FF | FFFA | F876 | 4E8D | 16DA |
| 0000040200 | 8D51 | F24E | 5116 | 4E8D | 16C8 | 1E51 | D868 | 6802 |
| 0000040220 | 0119 | 36FF | 0204 | 36FF | 0202 | 36FF | 0208 | 36FF |
| 0000040240 | 0206 | C89A | 0036 | 8300 | 28C4 | 468B | E9CE | 0714 |
| 0000040260 | 06E9 | 8B00 | E846 | 0BE9 | C407 | D65E | 8B26 | 5C47 |
| 0000040300 | 0AB9 | 9900 | F9F7 | FA83 | 7500 | E903 | 0163 | 5EC4 |
| 0000040320 | 26D6 | 478B | 995C | F9F7 | F799 | 83F9 | 00FA | 0374 |
| 0000040340 | 4EE9 | C401 | D65E | 8B26 | 5C47 | 64BB | 9900 | FBF7 |
| 0000040360 | F799 | 83F9 | 00FA | 0374 | 36E9 | C401 | D65E | 8B26 |
| 0000040400 | 5847 | 4689 | C4EA | D65E | 8B26 | 5A47 | 4689 | C4EC |
| 0000040420 | D65E | 8B26 | 5E47 | 4603 | 48EA | 4689 | C4EE | D65E |
| 0000040440 | 8B26 | 6047 | 4603 | 48EC | 4689 | 8DF0 | EA46 | 5016 |
| 0000040460 | 016A | 76FF | FFD8 | D676 | 3F9A | F46D | 8335 | 0AC4 |
| 0000040500 | 4689 | 83F6 | F67E | 7500 | E903 | 00D9 | 068E | 31A0 |
| 0000040520 | 8326 | 7E3E | 003B | 0375 | 4CE9 | 8300 | CC7E | 75FE |
| 0000040540 | E903 | 0043 | 76FF | FFF6 | D236 | FF02 | D036 | 8D02 |
| 0000040560 | DA46 | 5016 | 468D | 16F2 | 8D50 | C846 | 5016 | 681E |
| 0000040600 | 02D8 | 2768 | FF01 | 0436 | FF02 | 0236 | FF02 | 0836 |
| 0000040620 | FF02 | 0636 | 1E02 | DA68 | 6801 | 3653 | 5668 | 9A36 |
| 0000040640 | 3659 | 0000 | C483 | 8E28 | A006 | 2631 | 3E83 | 360C |
| 0000040660 | 7500 | E903 | 0009 | 7E83 | FECC | 0374 | 0FE9 | 8E00 |
| 0000040700 | A206 | 2631 | 3E83 | 367F | 7500 | E903 | 0051 | 468B |
| 0000040720 | 89F6 | CE46 | 76FF | FFD4 | D276 | 468D | 16CE | FF50 |
| 0000040740 | E676 | 76FF | FFFA | F876 | 4E8D | 16DA | 8D51 | F24E |
| 0000040760 | 5116 | 4E8D | 16C8 | 1E51 | D868 | 6802 | 0128 | 36FF |
| 0000041000 | 0204 | 36FF | 0202 | 36FF | 0208 | 36FF | 0206 | EF9A |
| 0000041020 | 003C | 8300 | 28C4 | 468B | E9CE | 05A8 | 06E9 | 8B00 |
| 0000041040 | F646 | 9FE9 | C705 | 0E06 | 0102 | C700 | 0A06 | 0202 |
| 0000041060 | 8E00 | A406 | 2631 | 36FF | 0F1E | FF26 | 1C36 | FF0F |
| 0000041100 | D876 | 76FF | 6AD6 | 6A00 | 6A00 | 9A01 | 380A | 0000 |
| 0000041120 | 4689 | 83E8 | E87E | 7500 | E903 | 00D9 | 068E | 31A0 |

THU MAR 14 17:25:16 1991 CRV_IPS.DLL PAGE 19, LINE 1063

| | | | | | | | | |
|---|---|---|---|---|---|---|---|---|
| 0000041140 | 8326 | 8E3E | 003C | 0375 | 4CE9 | 8300 | CC7E | 75FE |
| 0000041160 | E903 | 0043 | 76FF | FFE8 | D636 | FF02 | D436 | 8D02 |
| 0000041200 | DA46 | 5016 | 468D | 16F2 | 8D50 | C846 | 5016 | 681E |
| 0000041220 | 02D8 | 3368 | FF01 | 0436 | FF02 | 0236 | FF02 | 0836 |
| 0000041240 | FF02 | 0636 | 1E02 | E268 | 6801 | 3E10 | 1368 | 9A3E |
| 0000041260 | 3E16 | 0000 | C483 | 8E28 | A006 | 2631 | 3E83 | 3D15 |
| 0000041300 | 7500 | E903 | 0009 | 7E83 | FECC | 0374 | 0FE9 | 8E00 |
| 0000041320 | A206 | 2631 | 3E83 | 3D2D | 7500 | E903 | 0051 | 468B |
| 0000041340 | 89E8 | CE46 | 76FF | FFD4 | D276 | 468D | 16CE | FF50 |
| 0000041360 | E676 | 76FF | FFFA | F876 | 4E8D | 16DA | 8D51 | F24E |
| 0000041400 | 5116 | 4E8D | 16C8 | 1E51 | D868 | 6802 | 0134 | 36FF |
| 0000041420 | 0204 | 36FF | 0202 | 36FF | 0208 | 36FF | 0206 | 759A |
| 0000041440 | 003D | 8300 | 28C4 | 468B | E9CE | 0498 | 06E9 | 8B00 |
| 0000041460 | E846 | 8FE9 | 8304 | C67E | 7602 | E903 | 007D | 068E |
| 0000041500 | 31A0 | 8326 | C93E | 003D | 0375 | 09E9 | 8300 | CC7E |
| 0000041520 | 74FE | E903 | 000F | 068E | 31A2 | 8326 | 3C3E | 003E |
| 0000041540 | 0375 | 50E9 | C700 | CE46 | 0000 | 76FF | FFD4 | D276 |
| 0000041560 | 468D | 16CE | FF50 | E676 | 76FF | FFFA | F876 | 4E8D |
| 0000041600 | 16DA | 8D51 | F24E | 5116 | 4E8D | 16C8 | 1E51 | D868 |
| 0000041620 | 6802 | 0138 | 36FF | 0204 | 36FF | 0202 | 36FF | 0208 |
| 0000041640 | 36FF | 0206 | 859A | 003E | 8300 | 28C4 | 468B | E9CE |
| 0000041660 | 0412 | 06E9 | B800 | 0000 | 09E9 | 8E04 | A406 | 2631 |
| 0000041700 | 36FF | 0F1E | FF26 | 1C36 | 8B0F | 0646 | 568B | 0508 |
| 0000041720 | 0066 | 5052 | 786A | 006A | 006A | 006A | 468D | 16D6 |
| 0000041740 | 9A50 | 39A0 | 0000 | 4689 | 83E8 | E87E | 7500 | E903 |
| 0000041760 | 00D9 | 068E | 31A0 | 8326 | 243E | 003E | 0375 | 4CE9 |
| 0000042000 | 8300 | CC7E | 75FE | E903 | 0043 | 76FF | FFE8 | CE36 |
| 0000042020 | FF02 | CC36 | 8D02 | DA46 | 5016 | 468D | 16F2 | 8D50 |
| 0000042040 | C846 | 5016 | 681E | 02D8 | 3F68 | FF01 | 0436 | FF02 |
| 0000042060 | 0236 | FF02 | 0836 | FF02 | 0636 | 1E02 | EA68 | 6801 |
| 0000042100 | 3868 | 6B68 | 9A38 | 386E | 0000 | C483 | 8E28 | A006 |
| 0000042120 | 2631 | 3E83 | 3F35 | 7500 | E903 | 0009 | 7E83 | FECC |
| 0000042140 | 0374 | 0FE9 | 8E00 | A206 | 2631 | 3E83 | 3894 | 7500 |
| 0000042160 | E903 | 0051 | 468B | 89E8 | CE46 | 76FF | FFD4 | D276 |
| 0000042200 | 468D | 16CE | FF50 | E676 | 76FF | FFFA | F876 | 4E8D |
| 0000042220 | 16DA | 8D51 | F24E | 5116 | 4E8D | 16C8 | 1E51 | D868 |
| 0000042240 | 6802 | 0140 | 36FF | 0204 | 36FF | 0202 | 36FF | 0208 |
| 0000042260 | 36FF | 0206 | DD9A | 0038 | 8300 | 28C4 | 468B | E9CE |
| 0000042300 | 0302 | 06E9 | 8B00 | E846 | F9E9 | C402 | D65E | 8B26 |
| 0000042320 | 5C47 | 0AB9 | 9900 | F9F7 | FA83 | 7500 | E903 | 0163 |
| 0000042340 | 5EC4 | 26D6 | 478B | 995C | F9F7 | F799 | 83F9 | 00FA |
| 0000042360 | 0374 | 4EE9 | C401 | D65E | 8B26 | 5C47 | 64BB | 9900 |
| 0000042400 | FBF7 | F799 | 83F9 | 00FA | 0374 | 36E9 | C401 | D65E |
| 0000042420 | 8B26 | 5847 | 4689 | C4EA | D65E | 8B26 | 5A47 | 4689 |
| 0000042440 | C4EC | D65E | 8B26 | 5E47 | 4603 | 48EA | 4689 | C4EE |
| 0000042460 | D65E | 8B26 | 6047 | 4603 | 48EC | 4689 | 8DF0 | EA46 |
| 0000042500 | 5016 | 026A | 76FF | FFD8 | D676 | 3F9A | 0B6D | 833B |
| 0000042520 | 0AC4 | 4689 | 83F6 | F67E | 7500 | E903 | 00D9 | 068E |
| 0000042540 | 31A0 | 8326 | 213E | 0038 | 0375 | 4CE9 | 8300 | CC7E |
| 0000042560 | 75FE | E903 | 0043 | 76FF | FFF6 | D236 | FF02 | D036 |
| 0000042600 | 8D02 | DA46 | 5016 | 468D | 16F2 | 8D50 | C846 | 5016 |
| 0000042620 | 681E | 02D8 | 4E68 | FF01 | 0436 | FF02 | 0236 | FF02 |
| 0000042640 | 0836 | FF02 | 0636 | 1E02 | F268 | 6801 | 408C | 8F68 |
| 0000042660 | 9A40 | 4092 | 0000 | C483 | 8E28 | A006 | 2631 | 3E83 |
| 0000042700 | 4045 | 7500 | E903 | 0009 | 7E83 | FECC | 0374 | 0FE9 |
| 0000042720 | 8E00 | A206 | 2631 | 3E83 | 40B8 | 7500 | E903 | 0051 |
| 0000042740 | 468B | 89F6 | CE46 | 76FF | FFD4 | D276 | 468D | 16CE |
| 0000042760 | FF50 | E676 | 76FF | FFFA | F876 | 4E8D | 16DA | 8D51 |
| 0000043000 | F24E | 5116 | 4E8D | 16C8 | 1E51 | D868 | 6802 | 014F |

THU MAR 14 17:25:16 1991 CRV_IPS.DLL PAGE 20, LINE 1122

| | | | | | | | | |
|---|---|---|---|---|---|---|---|---|
| 0000043020 | 36FF | 0204 | 36FF | 0202 | 36FF | 0208 | 36FF | 0206 |
| 0000043040 | 019A | 0041 | 8300 | 28C4 | 468B | E9CE | 0196 | 06E9 |
| 0000043060 | 8B00 | F646 | 8DE9 | C701 | 1006 | 0102 | C700 | 0A06 |
| 0000043100 | 0302 | 8E00 | A406 | 2631 | 36FF | 0F1E | FF26 | 1C36 |
| 0000043120 | FF0F | D876 | 76FF | 6AD6 | 6A00 | 6A00 | 9A01 | 3C1C |
| 0000043140 | 0000 | 4689 | 83E8 | E87E | 7500 | E903 | 00D9 | 068E |
| 0000043160 | 31A0 | 8326 | A03E | 0040 | 0375 | 4CE9 | 8300 | CC7E |
| 0000043200 | 75FE | E903 | 0043 | 76FF | FFE8 | D636 | FF02 | D436 |
| 0000043220 | 8D02 | DA46 | 5016 | 468D | 16F2 | 8D50 | C846 | 5016 |
| 0000043240 | 681E | 02D8 | 5A68 | FF01 | 0436 | FF02 | 0236 | FF02 |
| 0000043260 | 0836 | FF02 | 0636 | 1E02 | FA68 | 6801 | 3C7A | 7D68 |
| 0000043300 | 9A3C | 3C80 | 0000 | C483 | 8E28 | A006 | 2631 | 3E83 |
| 0000043320 | 411E | 7500 | E903 | 0009 | 7E83 | FECC | 0374 | 0FE9 |
| 0000043340 | 8E00 | A206 | 2631 | 3E83 | 4136 | 7500 | E903 | 0051 |
| 0000043360 | 468B | 89E8 | CE46 | 76FF | FFD4 | D276 | 468D | 16CE |
| 0000043400 | FF50 | E676 | 76FF | FFFA | F876 | 4E8D | 16DA | 8D51 |
| 0000043420 | F24E | 5116 | 4E8D | 16C8 | 1E51 | D868 | 6802 | 015B |
| 0000043440 | 36FF | 0204 | 36FF | 0202 | 36FF | 0208 | 36FF | 0206 |
| 0000043460 | 7E9A | 0041 | 8300 | 28C4 | 468B | E9CE | 0086 | 06E9 |
| 0000043500 | 8B00 | E846 | 7DE9 | 8E00 | A006 | 2631 | 3E83 | 3C33 |
| 0000043520 | 7500 | E903 | 0009 | 7E83 | FECC | 0374 | 0FE9 | 8E00 |
| 0000043540 | A206 | 2631 | 3E83 | 3CA6 | 7500 | E903 | 0050 | 46C7 |
| 0000043560 | 00CE | FF00 | D476 | 76FF | 8DD2 | CE46 | 5016 | 76FF |
| 0000043600 | FFE6 | FA76 | 76FF | 8DF8 | DA4E | 5116 | 4E8D | 16F2 |
| 0000043620 | 8D51 | C84E | 5116 | 681E | 02D8 | 5E68 | FF01 | 0436 |
| 0000043640 | FF02 | 0236 | FF02 | 0836 | FF02 | 0636 | 9A02 | 3BDF |
| 0000043660 | 0000 | C483 | 8B28 | CE46 | 09E9 | E900 | 0006 | 00B8 |
| 0000043700 | E900 | 0000 | 5E1F | 835F | 02ED | E58B | 5D1F | CA4D |
| 0000043720 | 0004 | 581E | 4590 | 8B55 | 1EEC | D88E | EC81 | 003C |
| 0000043740 | 5657 | B81E | 3096 | D88E | 46C7 | F5F8 | 8C02 | FA5E |
| 0000043760 | 46C7 | 01DE | 2B01 | 89C0 | CE46 | 4689 | 8ECC | A006 |
| 0000044000 | 2631 | 3E83 | 3F90 | 7500 | E903 | 001D | 36FF | 0208 |
| 0000044020 | 36FF | 0206 | 468D | 16C4 | 9A50 | 30CC | 0000 | C483 |
| 0000044040 | 3D08 | 0000 | 0374 | 0FE9 | 8E00 | A206 | 2631 | 3E83 |
| 0000044060 | 3FA8 | 7500 | E903 | 003B | 681E | 02F9 | 468D | 16D0 |
| 0000044100 | 8D50 | C446 | 5016 | 468D | 16F2 | 6850 | 0172 | 681E |
| 0000044120 | 037E | 36FF | 0204 | 36FF | 0202 | 36FF | 0208 | 36FF |
| 0000044140 | 0206 | 159A | 0031 | 8300 | 1EC4 | 4689 | 89F2 | F456 |
| 0000044160 | 08E9 | 2B00 | 89C0 | F446 | 4689 | C7F2 | 2006 | 0002 |
| 0000044200 | C700 | 0A06 | 0036 | 8E00 | A406 | 2631 | 2CA1 | 480F |
| 0000044220 | D22B | F726 | 2E36 | 400F | 4689 | 83FC | FC7E | 7601 |
| 0000044240 | E903 | 000A | 3E83 | 02C6 | 7400 | E903 | 0103 | 006A |
| 0000044260 | 006A | 006A | 006A | 006A | 006A | 4E6A | DD9A | 9CDF |
| 0000044300 | 8343 | 0EC4 | 4689 | 83F6 | F67E | 7500 | E903 | 00D8 |
| 0000044320 | 068E | 31A0 | 8326 | 023E | 0043 | 0375 | 4CE9 | 8300 |
| 0000044340 | C87E | 75FE | E903 | 0043 | 76FF | FFF6 | CA36 | FF02 |
| 0000044360 | C836 | 8D02 | D046 | 5016 | 468D | 16F2 | 8D50 | C446 |
| 0000044400 | 5016 | 681E | 037E | 8468 | FF01 | 0436 | FF02 | 0236 |
| 0000044420 | FF02 | 0836 | FF02 | 0636 | 1E02 | FD68 | 6802 | 44EA |
| 0000044440 | ED68 | 9A44 | 44F0 | 0000 | C483 | 8E28 | A006 | 2631 |
| 0000044460 | 3E83 | 43D7 | 7500 | E903 | 0009 | 7E83 | FEC8 | 0374 |
| 0000044500 | 0FE9 | 8E00 | A206 | 2631 | 3E83 | 43EF | 7500 | E903 |
| 0000044520 | 0050 | 46C7 | EFCA | FFFF | CE76 | 76FF | 8DCC | CA46 |
| 0000044540 | 5016 | 76FF | FFDE | FA76 | 76FF | 8DF8 | D04E | 5116 |
| 0000044560 | 4E8D | 16F2 | 8D51 | C44E | 5116 | 681E | 037E | 8568 |
| 0000044600 | FF01 | 0436 | FF02 | 0236 | FF02 | 0836 | FF02 | 0636 |
| 0000044620 | 9A02 | 4437 | 0000 | C483 | 8B28 | CA46 | 74E9 | E912 |
| 0000044640 | 0006 | EFB8 | E9FF | 126B | 006A | 646A | 069A | 0033 |
| 0000044660 | 8300 | FC7E | 7701 | E903 | 00C3 | 468B | 8B06 | 0856 |

THU MAR 14 17:25:16 1991 CRV_IPS.DLL PAGE 21, LINE 1181

| | | | | | | | | |
|---|---|---|---|---|---|---|---|---|
| 0000044700 | 2405 | 5200 | 1E50 | 2268 | 9A02 | 91D2 | 43B3 | C483 |
| 0000044720 | 8B08 | 0646 | 568B | 0508 | 0044 | 5052 | 681E | 0242 |
| 0000044740 | D29A | 0791 | 8337 | 08C4 | 5EC4 | 2606 | 478B | 2664 |
| 0000044760 | 578B | A366 | 0262 | 1689 | 0264 | 06C7 | 3608 | 000B |
| 0000045000 | 068E | 31A0 | 8326 | A33E | 0044 | 0375 | 09E9 | 8300 |
| 0000045020 | C87E | 74FE | E903 | 000F | 068E | 31A2 | 8326 | 163E |
| 0000045040 | 0045 | 0375 | 50E9 | C700 | CA46 | 0000 | 76FF | FFCE |
| 0000045060 | CC76 | 468D | 16CA | FF50 | DE76 | 76FF | FFFA | F876 |
| 0000045100 | 4E8D | 16D0 | 8D51 | F24E | 5116 | 4E8D | 16C4 | 1E51 |
| 0000045120 | 7E68 | 6803 | 0192 | 36FF | 0204 | 36FF | 0202 | 36FF |
| 0000045140 | 0208 | 36FF | 0206 | 5F9A | 0045 | 8300 | 28C4 | 468B |
| 0000045160 | E9CA | 119F | 06E9 | B800 | 0000 | 96E9 | C711 | 0C06 |
| 0000045200 | 0002 | C700 | 0E06 | 0002 | C700 | 1006 | 0002 | C700 |
| 0000045220 | 0A06 | 0002 | 8500 | A406 | 2631 | 36FF | 0F1E | FF26 |
| 0000045240 | 1C36 | 8B0F | 0646 | 568B | 0508 | 0024 | 5052 | 786A |
| 0000045260 | 006A | 006A | 006A | 468D | 16EA | 9A50 | 3DB2 | 0000 |
| 0000045300 | 4689 | 83E0 | E07E | 7500 | E903 | 00D9 | 068E | 31A0 |
| 0000045320 | 8326 | FE3E | 0044 | 0375 | 4CE9 | 8300 | C87E | 75FE |
| 0000045340 | E903 | 0043 | 76FF | FFE0 | CE36 | FF02 | CC36 | 8D02 |
| 0000045360 | D046 | 5016 | 468D | 16F2 | 8D50 | C446 | 5016 | 681E |
| 0000045400 | 037E | 9E68 | FF01 | 0436 | FF02 | 0236 | FF02 | 0836 |
| 0000045420 | FF02 | 0636 | 1E02 | 0568 | 6803 | 3F7C | 7F68 | 9A3F |
| 0000045440 | 3F82 | 0000 | C483 | 8E28 | A006 | 2631 | 3E83 | 462E |
| 0000045460 | 7500 | E903 | 0009 | 7E83 | FEC8 | 0374 | 0FE9 | 8E00 |
| 0000045500 | A206 | 2631 | 3E83 | 4200 | 7500 | E903 | 0051 | 468B |
| 0000045520 | 89E0 | CA46 | 76FF | FFCE | CC76 | 468D | 16CA | FF50 |
| 0000045540 | DE76 | 76FF | FFFA | F876 | 4E8D | 16D0 | 8D51 | F24E |
| 0000045560 | 5116 | 4E8D | 16C4 | 1E51 | 7E68 | 6803 | 019F | 36FF |
| 0000045600 | 0204 | 36FF | 0202 | 36FF | 0208 | 36FF | 0206 | F19A |
| 0000045620 | 003F | 8300 | 28C4 | 468B | E9CA | 1077 | 06E9 | 8B00 |
| 0000045640 | E046 | 6EE9 | C410 | EA5E | 8B26 | 5C47 | 0AB9 | 9900 |
| 0000045660 | F9F7 | FA83 | 7500 | E903 | 0727 | 5EC4 | 26EA | 478B |
| 0000045700 | 995C | F9F7 | F799 | 83F9 | 00FA | 0374 | 12E9 | C407 |
| 0000045720 | EA5E | 8B26 | 5C47 | 64BB | 9900 | FBF7 | F799 | 83F9 |
| 0000045740 | 00FA | 0374 | FAE9 | C406 | EA5E | 8B26 | 5847 | 4689 |
| 0000045760 | C4E2 | EA5E | 8B26 | 5A47 | 4689 | C4E4 | EA5E | 8B26 |
| 0000046000 | 5E47 | 4603 | 48E2 | 4689 | C4E6 | EA5E | 8B26 | 6047 |
| 0000046020 | 4603 | 48E4 | 4689 | 8DE8 | E246 | 5016 | 006A | 76FF |
| 0000046040 | FFEC | EA76 | 3F9A | 1D6D | 833F | 0AC4 | 4689 | 8EF6 |
| 0000046060 | A406 | 2631 | 36FF | 0F1E | FF26 | 1C36 | FF0F | EC76 |
| 0000046100 | 76FF | 6AEA | 6A00 | 6A00 | 9A01 | 402E | 0000 | 7E83 |
| 0000046120 | 00F6 | 0375 | D9E9 | 8E00 | A006 | 2631 | 3E83 | 41D4 |
| 0000046140 | 7500 | E903 | 004C | 7E83 | FEC8 | 0375 | 43E9 | FF00 |
| 0000046160 | F676 | 36FF | 02D2 | 36FF | 02D0 | 468D | 16D0 | 8D50 |
| 0000046200 | F246 | 5016 | 468D | 16C4 | 1E50 | 7E68 | 6803 | 01AF |
| 0000046220 | 36FF | 0204 | 36FF | 0202 | 36FF | 0208 | 36FF | 0206 |
| 0000046240 | 681E | 030D | 3668 | 6848 | 4839 | 3C9A | 0048 | 8300 |
| 0000046260 | 28C4 | 068E | 31A0 | 8326 | 6F3E | 0047 | 0375 | 09E9 |
| 0000046300 | 8300 | C87E | 74FE | E903 | 000F | 068E | 31A2 | 8326 |
| 0000046320 | 873E | 0047 | 0375 | 51E9 | 8B00 | F646 | 4689 | FFCA |
| 0000046340 | CE76 | 76FF | 8DCC | CA46 | 5016 | 76FF | FFDE | FA76 |
| 0000046360 | 76FF | 8DF8 | D04E | 5116 | 4E8D | 16F2 | 8D51 | C44E |
| 0000046400 | 5116 | 681E | 037E | B068 | FF01 | 0436 | FF02 | 0236 |
| 0000046420 | FF02 | 0836 | FF02 | 0636 | 9A02 | 47CF | 0000 | C483 |
| 0000046440 | 8B28 | CA46 | ECE9 | E90E | 0006 | 468B | E9F6 | 0EE3 |
| 0000046460 | 06C7 | 020A | 0001 | 06C7 | 020C | 0001 | 068E | 31A4 |
| 0000046500 | FF26 | 2236 | 260F | 36FF | 0F20 | 468B | 8B06 | 0856 |
| 0000046520 | 4405 | 5200 | 6A50 | C478 | 065E | FF26 | 6677 | FF26 |
| 0000046540 | 6477 | 006A | 468D | 16EE | 9A50 | 448C | 0000 | 4689 |

THU MAR 14 17:25:16 1991 CRV_IPS.DLL PAGE 22, LINE 1240

| | | | | | | | | |
|---|---|---|---|---|---|---|---|---|
| 0000046560 | 83E0 | E07E | 7500 | E903 | 0177 | 7E81 | ABE0 | 7501 |
| 0000046600 | E903 | 0014 | 7E81 | 9AE0 | 7501 | E903 | 000A | 7E81 |
| 0000046620 | 9BE0 | 7401 | E903 | 0080 | 068E | 31A0 | 8326 | EF3E |
| 0000046640 | 0047 | 0375 | 09E9 | 8300 | C87E | 74FE | E903 | 000F |
| 0000046660 | 068E | 31A2 | 8326 | 623E | 0048 | 0375 | 50E9 | C700 |
| 0000046700 | CA46 | 0000 | 76FF | FFCE | CC76 | 468D | 16CA | FF50 |
| 0000046720 | DE76 | 76FF | FFFA | F876 | 4E8D | 16D0 | 8D51 | F24E |
| 0000046740 | 5116 | 4E8D | 16C4 | 1E51 | 7E68 | 6803 | 01BB | 36FF |
| 0000046760 | 0204 | 36FF | 0202 | 36FF | 0208 | 36FF | 0206 | AB9A |
| 0000047000 | 0048 | 8300 | 28C4 | 468B | E9CA | 0E07 | 06E9 | B800 |
| 0000047020 | 0000 | FEE9 | E90D | 00D9 | 068E | 31A0 | 8326 | 4A3E |
| 0000047040 | 0048 | 0375 | 4CE9 | 8300 | C87E | 75FE | E903 | 0043 |
| 0000047060 | 76FF | FFE0 | CE36 | FF02 | CC36 | 8D02 | D046 | 5016 |
| 0000047100 | 468D | 16F2 | 8D50 | C446 | 5016 | 681E | 037E | BE68 |
| 0000047120 | FF01 | 0436 | FF02 | 0236 | FF02 | 0836 | FF02 | 0636 |
| 0000047140 | 1E02 | 1568 | 6803 | 42EE | F168 | 9A42 | 42F4 | 0000 |
| 0000047160 | C483 | 8E28 | A006 | 2631 | 3E83 | 4929 | 7500 | E903 |
| 0000047200 | 0009 | 7E83 | FEC8 | 0374 | 0FE9 | 8E00 | A206 | 2631 |
| 0000047220 | 3E83 | 4941 | 7500 | E903 | 0051 | 468B | 89E0 | CA46 |
| 0000047240 | 76FF | FFCE | CC76 | 468D | 16CA | FF50 | DE76 | 76FF |
| 0000047260 | FFFA | F876 | 4E8D | 16D0 | 8D51 | F24E | 5116 | 4E8D |
| 0000047300 | 16C4 | 1E51 | 7E68 | 6803 | 01BF | 36FF | 0204 | 36FF |
| 0000047320 | 0202 | 36FF | 0208 | 36FF | 0206 | 899A | 0049 | 8300 |
| 0000047340 | 28C4 | 468B | E9CA | 0D2B | 06E9 | 8B00 | E046 | 22E9 |
| 0000047360 | C40D | EE5E | 8B26 | 5C47 | 0AB9 | 9900 | F9F7 | FA83 |
| 0000047400 | 7500 | E903 | 002D | 5EC4 | 26EE | 478B | 995C | F9F7 |
| 0000047420 | F799 | 83F9 | 00FA | 0374 | 18E9 | C400 | EE5E | 8B26 |
| 0000047440 | 5C47 | 64BB | 9900 | FBF7 | F799 | 83F9 | 00FA | 0375 |
| 0000047460 | 9CE9 | 8E00 | A406 | 2631 | 36FF | 0F22 | FF26 | 2036 |
| 0000047500 | FF0F | F076 | 76FF | 6AEE | 6A00 | 6A00 | 9A01 | 49D2 |
| 0000047520 | 0000 | 068E | 31A0 | 8326 | A73E | 0042 | 0375 | 09E9 |
| 0000047540 | 8300 | C87E | 74FE | E903 | 000F | 068E | 31A2 | 8326 |
| 0000047560 | 1A3E | 0043 | 0375 | 50E9 | C700 | CA46 | 01AB | 76FF |
| 0000047600 | FFCE | CC76 | 468D | 16CA | FF50 | DE76 | 76FF | FFFA |
| 0000047620 | F876 | 4E8D | 16D0 | 8D51 | F24E | 5116 | 4E8D | 16C4 |
| 0000047640 | 1E51 | 7E68 | 6803 | 01C6 | 36FF | 0204 | 36FF | 0202 |
| 0000047660 | 36FF | 0208 | 36FF | 0206 | 629A | 0043 | 8300 | 28C4 |
| 0000047700 | 468B | E9CA | 0C4D | 06E9 | B800 | 01AB | 44E9 | 8D0C |
| 0000047720 | E246 | 5016 | 026A | 76FF | FFF0 | EE76 | 3F9A | F76D |
| 0000047740 | 8345 | 0AC4 | 4689 | 8EF6 | A406 | 2631 | 36FF | 0F22 |
| 0000047760 | FF26 | 2036 | FF0F | F076 | 76FF | 6AEE | 6A00 | 6A00 |
| 0000050000 | 9A01 | 461A | 0000 | 4689 | 83E0 | F67E | 7500 | E903 |
| 0000050020 | 00D8 | 068E | 31A0 | 8326 | 443E | 004A | 0375 | 4CE9 |
| 0000050040 | 8300 | C87E | 75FE | E903 | 0043 | 76FF | FFF6 | D236 |
| 0000050060 | FF02 | D036 | 8D02 | D046 | 5016 | 468D | 16F2 | 8D50 |
| 0000050100 | C446 | 5016 | 681E | 037E | CE68 | FF01 | 0436 | FF02 |
| 0000050120 | 0236 | FF02 | 0836 | FF02 | 0636 | 1E02 | 1D68 | 6803 |
| 0000050140 | 4B30 | 3368 | 9A4B | 4B36 | 0000 | C483 | 8E28 | A006 |
| 0000050160 | 2631 | 3E83 | 4AE9 | 7500 | E903 | 0009 | 7E83 | FEC8 |
| 0000050200 | 0374 | 0FE9 | 8E00 | A206 | 2631 | 3E83 | 4B5C | 7500 |
| 0000050220 | E903 | 0050 | 46C7 | EFCA | FFFF | CE76 | 76FF | 8DCC |
| 0000050240 | CA46 | 5016 | 76FF | FFDE | FA76 | 76FF | 8DF8 | D04E |
| 0000050260 | 5116 | 4E8D | 16F2 | 8D51 | C44E | 5116 | 681E | 037E |
| 0000050300 | CF68 | FF01 | 0436 | FF02 | 0236 | FF02 | 0836 | FF02 |
| 0000050320 | 0636 | 9A02 | 4BA4 | 0000 | C483 | 8B28 | CA46 | 32E9 |
| 0000050340 | E90B | 0006 | EFB8 | E9FF | 0B29 | 06C7 | 0210 | 0001 |
| 0000050360 | 006A | 006A | 006A | 006A | 006A | 006A | 496A | DD9A |
| 0000050400 | 8FDF | 8342 | 0EC4 | 4689 | 83F6 | F67E | 7500 | E903 |
| 0000050420 | 00D8 | 068E | 31A0 | 8326 | 443E | 004B | 0375 | 4CE9 |

THU MAR 14 17:25:16 1991 CRV_IPS.DLL PAGE 23, LINE 1299

| | | | | | | | | |
|---|---|---|---|---|---|---|---|---|
| 0000050440 | 8300 | C87E | 75FE | E903 | 0043 | 76FF | FFF6 | CA36 |
| 0000050460 | FF02 | C836 | 8D02 | D046 | 5016 | 468D | 16F2 | 8D50 |
| 0000050500 | C446 | 5016 | 681E | 037E | D668 | FF01 | 0436 | FF02 |
| 0000050520 | 0236 | FF02 | 0836 | FF02 | 0636 | 1E02 | 2568 | 6803 |
| 0000050540 | 4675 | 7868 | 9A46 | 467B | 0000 | C483 | 8E28 | A006 |
| 0000050560 | 2631 | 3E83 | 4689 | 7500 | E903 | 0009 | 7E83 | FEC8 |
| 0000050600 | 0374 | 0FE9 | 8E00 | A206 | 2631 | 3E83 | 46A1 | 7500 |
| 0000050620 | E903 | 0050 | 46C7 | EFCA | FFFF | CE76 | 76FF | 8DCC |
| 0000050640 | CA46 | 5016 | 76FF | FFDE | FA76 | 76FF | 8DF8 | D04E |
| 0000050660 | 5116 | 4E8D | 16F2 | 8D51 | C44E | 5116 | 681E | 037E |
| 0000050700 | D768 | FF01 | 0436 | FF02 | 0236 | FF02 | 0836 | FF02 |
| 0000050720 | 0636 | 9A02 | 46EA | 0000 | C483 | 8B28 | CA46 | 32E9 |
| 0000050740 | E90A | 0006 | EFB8 | E9FF | 0A29 | 06C7 | 020A | 0003 |
| 0000050760 | 06C7 | 020E | 0001 | 06C7 | 3608 | 000B | 7E83 | 00E0 |
| 0000051000 | 0375 | D9E9 | 8E00 | A006 | 2631 | 3E83 | 4C37 | 7500 |
| 0000051020 | E903 | 004C | 7E83 | FEC8 | 0375 | 43E9 | FF00 | E076 |
| 0000051040 | 36FF | 02D6 | 36FF | 02D4 | 468D | 16D0 | 8D50 | F246 |
| 0000051060 | 5016 | 468D | 16C4 | 1E50 | 7E68 | 6803 | 01DF | 36FF |
| 0000051100 | 0204 | 36FF | 0202 | 36FF | 0208 | 36FF | 0206 | 681E |
| 0000051120 | 032D | 6268 | 684E | 4E65 | 689A | 004E | 8300 | 28C4 |
| 0000051140 | 068E | 31A0 | 8326 | 9B3E | 004D | 0375 | 09E9 | 8300 |
| 0000051160 | C87E | 74FE | E903 | 000F | 068E | 31A2 | 8326 | B33E |
| 0000051200 | 004D | 0375 | 51E9 | 8B00 | E046 | 4689 | FFCA | CE76 |
| 0000051220 | 76FF | 8DCC | CA46 | 5016 | 76FF | FFDE | FA76 | 76FF |
| 0000051240 | 8DF8 | D04E | 5116 | 4E8D | 16F2 | 8D51 | C44E | 5116 |
| 0000051260 | 681E | 037E | E068 | FF01 | 0436 | FF02 | 0236 | FF02 |
| 0000051300 | 0836 | FF02 | 0636 | 9A02 | 4DFB | 0000 | C483 | 8B28 |
| 0000051320 | CA46 | 3EE9 | E909 | 0006 | 468B | E9E0 | 0935 | B5E9 |
| 0000051340 | C408 | EA5E | 8B26 | 5C47 | 64B9 | 9900 | F9F7 | 0ABA |
| 0000051360 | 8B00 | 99DA | FBF7 | FA83 | 7500 | E903 | 0898 | 76C4 |
| 0000051400 | 26EA | 448B | 995C | FBF7 | FA83 | 7400 | E903 | 0886 |
| 0000051420 | 76C4 | 26EA | 448B | 995C | FBF7 | F799 | 83FB | 00FA |
| 0000051440 | 0374 | 71E9 | 8E08 | A406 | 2631 | 36FF | 0F22 | FF26 |
| 0000051460 | 2036 | 8B0F | 0646 | 568B | 0508 | 0044 | 5052 | 786A |
| 0000051500 | 76C4 | 2606 | 74FF | 2666 | 74FF | 6A64 | 8D00 | EE46 |
| 0000051520 | 5016 | 3A9A | 0047 | 8900 | E046 | 7E83 | 00E0 | 0374 |
| 0000051540 | 15E9 | C400 | EE5E | 8B26 | 5C47 | 0AB9 | 9900 | F9F7 |
| 0000051560 | FA83 | 7400 | E903 | 01A8 | 068E | 31A4 | FF26 | 1E36 |
| 0000051600 | 260F | 36FF | 0F1C | 76FF | FFEC | EA76 | 006A | 006A |
| 0000051620 | 5EC4 | 26EA | 77FF | 9A5C | 4D90 | 0000 | 7E83 | 00E0 |
| 0000051640 | 0374 | 9FE9 | 8E00 | A406 | 2631 | 36FF | 0F22 | FF26 |
| 0000051660 | 2036 | FF0F | F076 | 76FF | 6AEE | 6A00 | 6A00 | 9A01 |
| 0000051700 | 4F5C | 0000 | 068E | 31A0 | 8326 | 1B3E | 004E | 0375 |
| 0000051720 | 09E9 | 8300 | C87E | 74FE | E903 | 000F | 068E | 31A2 |
| 0000051740 | 8326 | 8E3E | 004E | 0375 | 50E9 | C700 | CA46 | 00DC |
| 0000051760 | 76FF | FFCE | CC76 | 468D | 16CA | FF50 | DE76 | 76FF |
| 0000052000 | FFFA | F876 | 4E8D | 16D0 | 8D51 | F24E | 5116 | 4E8D |
| 0000052020 | 16C4 | 1E51 | 7E68 | 6803 | 01F1 | 36FF | 0204 | 36FF |
| 0000052040 | 0202 | 36FF | 0208 | 36FF | 0206 | D79A | 004E | 8300 |
| 0000052060 | 28C4 | 468B | E9CA | 07DB | 06E9 | B800 | 00DC | D2E9 |
| 0000052100 | E907 | 00D9 | 068E | 31A0 | 8326 | 763E | 004E | 0375 |
| 0000052120 | 4CE9 | 8300 | C87E | 75FE | E903 | 0043 | 76FF | FFE0 |
| 0000052140 | CE36 | FF02 | CC36 | 8D02 | D046 | 5016 | 468D | 16F2 |
| 0000052160 | 8D50 | C446 | 5016 | 681E | 037E | F568 | FF01 | 0436 |
| 0000052200 | FF02 | 0236 | FF02 | 0836 | FF02 | 0636 | 1E02 | 3568 |
| 0000052220 | 6803 | 4A30 | 3368 | 9A4A | 4A36 | 0000 | C483 | 8E28 |
| 0000052240 | A006 | 2631 | 3E83 | 49E9 | 7500 | E903 | 0009 | 7E83 |
| 0000052260 | FEC8 | 0374 | 0FE9 | 8E00 | A206 | 2631 | 3E83 | 4A5C |
| 0000052300 | 7500 | E903 | 0051 | 468B | 89E0 | CA46 | 76FF | FFCE |

THU MAR 14 17:25:16 1991 CRV_IPS.DLL PAGE 24, LINE 1358

| | | | | | | | | |
|---|---|---|---|---|---|---|---|---|
| 0000052320 | CC76 | 468D | 16CA | FF50 | DE76 | 76FF | FFFA | F876 |
| 0000052340 | 4E8D | 16D0 | 8D51 | F24E | 5116 | 4E8D | 16C4 | 1E51 |
| 0000052360 | 7E68 | 6803 | 01F6 | 36FF | 0204 | 36FF | 0202 | 36FF |
| 0000052400 | 0208 | 36FF | 0206 | A49A | 004A | 8300 | 28C4 | 468B |
| 0000052420 | E9CA | 06FF | 06E9 | 8B00 | E046 | F6E9 | E906 | 0676 |
| 0000052440 | 5EC4 | 26EE | 478B | 8958 | E246 | 5EC4 | 26EE | 478B |
| 0000052460 | 895A | E446 | 5EC4 | 26EE | 478B | 035E | E246 | 8948 |
| 0000052500 | E646 | 5EC4 | 26EE | 478B | 0360 | E446 | 8948 | E846 |
| 0000052520 | 468D | 16E2 | 6A50 | FF00 | F076 | 76FF | 9AEE | 6D3F |
| 0000052540 | 49AF | C483 | 890A | F646 | 7E83 | 00F6 | 0375 | 1CE9 |
| 0000052560 | 8E01 | A406 | 2631 | 36FF | 0F22 | FF26 | 2036 | FF0F |
| 0000052600 | F076 | 76FF | 6AEE | 6A00 | 6A00 | 9A01 | 491E | 000D |
| 0000052620 | 068E | 31A4 | FF26 | 1E36 | 260F | 36FF | 0F1C | 76FF |
| 0000052640 | FFEC | EA76 | 006A | 006A | 5EC4 | 26EA | 77FF | 9A5C |
| 0000052660 | 50AB | 0000 | 068E | 31A0 | 8326 | E63E | 004F | 0375 |
| 0000052700 | 4CE9 | 8300 | C87E | 75FE | E903 | 0043 | 76FF | FFF6 |
| 0000052720 | D236 | FF02 | D036 | 8D02 | D046 | 5016 | 468D | 16F2 |
| 0000052740 | 8D50 | C446 | 5016 | 681E | 037E | 0868 | FF02 | 0436 |
| 0000052760 | FF02 | 0236 | FF02 | 0836 | FF02 | 0636 | 1E02 | 3D68 |
| 0000053000 | 6803 | 5121 | 2468 | 9A51 | 5127 | 0000 | C483 | 8E28 |
| 0000053020 | A006 | 2631 | 3E83 | 50DA | 7500 | E903 | 0009 | 7E83 |
| 0000053040 | FEC8 | 0374 | 0FE9 | 8E00 | A206 | 2631 | 3E83 | 514D |
| 0000053060 | 7500 | E903 | 0051 | 468B | 89F6 | CA46 | 76FF | FFCE |
| 0000053100 | CC76 | 468D | 16CA | FF50 | DE76 | 76FF | FFFA | F876 |
| 0000053120 | 4E8D | 16D0 | 8D51 | F24E | 5116 | 4E8D | 16C4 | 1E51 |
| 0000053140 | 7E68 | 6803 | 0209 | 36FF | 0204 | 36FF | 0202 | 36FF |
| 0000053160 | 0208 | 36FF | 0206 | 969A | 0051 | 8300 | 28C4 | 468B |
| 0000053200 | E9CA | 058F | 06E9 | 8B00 | F646 | 86E9 | C705 | 0A06 |
| 0000053220 | 0202 | C700 | 0E06 | 0102 | C700 | 0806 | 0C36 | 8D00 |
| 0000053240 | E246 | 5016 | 016A | 76FF | FFF0 | EE76 | 3F9A | EE6D |
| 0000053260 | 8351 | 0AC4 | 4689 | 83F6 | F67E | 7500 | E903 | 011C |
| 0000053300 | 068E | 31A4 | FF26 | 2236 | 260F | 36FF | 0F20 | 76FF |
| 0000053320 | FFF0 | EE76 | 006A | 006A | 016A | CF9A | 0050 | 8E00 |
| 0000053340 | A406 | 2631 | 36FF | 0F1E | FF26 | 1C36 | FF0F | EC76 |
| 0000053360 | 76FF | 6AEA | 6A00 | C400 | EA5E | FF26 | 5C77 | 509A |
| 0000053400 | 0052 | 8E00 | A006 | 2631 | 3E83 | 5135 | 7500 | E903 |
| 0000053420 | 004C | 7E83 | FEC8 | 0375 | 43E9 | FF00 | F676 | 36FF |
| 0000053440 | 02D2 | 36FF | 02D0 | 468D | 16D0 | 8D50 | F246 | 5016 |
| 0000053460 | 468D | 16C4 | 1E50 | 7E68 | 6803 | 0216 | 36FF | 0204 |
| 0000053500 | 36FF | 0202 | 36FF | 0208 | 36FF | 0206 | 681E | 0345 |
| 0000053520 | C268 | 6852 | 52C5 | C89A | 0052 | 8300 | 28C4 | 068E |
| 0000053540 | 31A0 | 8326 | 7F3E | 0052 | 0375 | 09E9 | 8300 | C87E |
| 0000053560 | 74FE | E903 | 000F | 068E | 31A2 | 8326 | EE3E | 0052 |
| 0000053600 | 0375 | 51E9 | 8B00 | F646 | 4689 | FFCA | CE76 | 76FF |
| 0000053620 | 8DCC | CA46 | 5016 | 76FF | FFDE | FA76 | 76FF | 8DF8 |
| 0000053640 | D04E | 5116 | 4E8D | 16F2 | 8D51 | C44E | 5116 | 681E |
| 0000053660 | 037E | 1768 | FF02 | 0436 | FF02 | 0236 | FF02 | 0836 |
| 0000053700 | FF02 | 0636 | 9A02 | 4C98 | 0000 | C483 | 8B28 | CA46 |
| 0000053720 | 40E9 | E904 | 0006 | 468B | E9F6 | 0437 | 5EC4 | 26EE |
| 0000053740 | 478B | B95C | 0064 | F799 | B9F9 | 000A | F799 | 83F9 |
| 0000053760 | 00FA | 0375 | 92E9 | C401 | EA5E | 8126 | 5C7F | 0190 |
| 0000054000 | 0374 | 24E9 | C400 | EE5E | FF26 | 6A77 | FF26 | 6877 |
| 0000054020 | 5EC4 | 26EA | 77FF | 266A | 77FF | 9A68 | 55F1 | 521F |
| 0000054040 | C483 | 8908 | F646 | 2EE9 | C400 | EA5E | 8326 | 5C7F |
| 0000054060 | 7464 | E903 | 0021 | 5EC4 | 26EE | 77FF | 266A | 77FF |
| 0000054100 | C468 | EA5E | FF26 | 6A77 | FF26 | 6877 | 639A | 305A |
| 0000054120 | 834F | 08C4 | 4689 | 83F6 | F67E | 7500 | E903 | 011D |
| 0000054140 | 068E | 31A4 | FF26 | 2236 | 260F | 36FF | 0F20 | 76FF |
| 0000054160 | FFF0 | EE76 | 006A | 006A | 5EC4 | 26EE | 77FF | 9A5C |

THU MAR 14 17:25:16 1991 CRV_IPS.DLL PAGE 25, LINE 1417

| | | | | | | | | |
|---|---|---|---|---|---|---|---|---|
| 0000054200 | 5274 | 0000 | 068E | 31A4 | FF26 | 1E36 | 260F | 36FF |
| 0000054220 | 0F1C | 76FF | FFEC | EA76 | 006A | 006A | 5EC4 | 26EA |
| 0000054240 | 77FF | 9A5C | 4D68 | 0000 | 068E | 31A0 | 8326 | D63E |
| 0000054260 | 0052 | 0375 | 48E9 | 8300 | C87E | 75FE | E903 | 003F |
| 0000054300 | 76FF | 1EF6 | 4D68 | 8D03 | D046 | 5016 | 468D | 16F2 |
| 0000054320 | 8D50 | C446 | 5016 | 681E | 037E | 2A68 | FF02 | 0436 |
| 0000054340 | FF02 | 0236 | FF02 | 0836 | FF02 | 0636 | 1E02 | 6568 |
| 0000054360 | 6803 | 4C23 | 2668 | 9A4C | 4C29 | 0000 | C483 | 8E28 |
| 0000054400 | A006 | 2631 | 3E83 | 4BDC | 7500 | E903 | 0009 | 7E83 |
| 0000054420 | FEC8 | 0374 | 0FE9 | 8E00 | A206 | 2631 | 3E83 | 4C4F |
| 0000054440 | 7500 | E903 | 0051 | 468B | 89F6 | CA46 | 76FF | FFCE |
| 0000054460 | CC76 | 468D | 16CA | FF50 | DE76 | 76FF | FFFA | F876 |
| 0000054500 | 4E8D | 16D0 | 8D51 | F24E | 5116 | 4E8D | 16C4 | 1E51 |
| 0000054520 | 7E68 | 6803 | 022B | 36FF | 0204 | 36FF | 0202 | 36FF |
| 0000054540 | 0208 | 36FF | 0206 | 479A | 0050 | 8300 | 28C4 | 468B |
| 0000054560 | E9CA | 029F | 06E9 | 8B00 | F646 | 96E9 | C702 | 0A06 |
| 0000054600 | 0302 | C700 | 1006 | 0102 | 8E00 | A406 | 2631 | 36FF |
| 0000054620 | 0F22 | FF26 | 2036 | FF0F | F076 | 76FF | 6AEE | 6A00 |
| 0000054640 | 6A00 | 9A01 | 539B | 0000 | 4689 | 8EE0 | A406 | 2631 |
| 0000054660 | 36FF | 0F1E | FF26 | 1C36 | FF0F | EC76 | 76FF | 6AEA |
| 0000054700 | 6A00 | C400 | EA5E | FF26 | 5C77 | 809A | 004F | 8900 |
| 0000054720 | DC46 | 7E83 | 00E0 | 0375 | D9E9 | 8E00 | A006 | 2631 |
| 0000054740 | 3E83 | 540D | 7500 | E903 | 004C | 7E83 | FEC8 | 0375 |
| 0000054760 | 43E9 | FF00 | E076 | 36FF | 02D6 | 36FF | 02D4 | 468D |
| 0000055000 | 16D0 | 8D50 | F246 | 5016 | 468D | 16C4 | 1E50 | 7E68 |
| 0000055020 | 6803 | 0236 | 36FF | 0204 | 36FF | 0202 | 36FF | 0208 |
| 0000055040 | 36FF | 0206 | 681E | 036D | DB68 | 6854 | 54DE | E19A |
| 0000055060 | 0054 | 8300 | 28C4 | 068E | 31A0 | 8326 | 943E | 0054 |
| 0000055100 | 0375 | 09E9 | 8300 | C87E | 74FE | E903 | 000F | 068E |
| 0000055120 | 31A2 | 8326 | 073E | 0055 | 0375 | 51E9 | 8B00 | E046 |
| 0000055140 | 4689 | FFCA | CE76 | 76FF | 8DCC | CA46 | 5016 | 76FF |
| 0000055160 | FFDE | FA76 | 76FF | 8DF8 | D04E | 5116 | 4E8D | 16F2 |
| 0000055200 | 8D51 | C44E | 5116 | 681E | 037E | 3768 | FF02 | 0436 |
| 0000055220 | FF02 | 0236 | FF02 | 0836 | FF02 | 0636 | 9A02 | 5550 |
| 0000055240 | 0000 | C483 | 8B28 | CA46 | 68E9 | E901 | 0006 | 468B |
| 0000055260 | E9E0 | 015F | 7E83 | 00DC | 0375 | D9E9 | 8E00 | A006 |
| 0000055300 | 2631 | 3E83 | 54EF | 7500 | E903 | 004C | 7E83 | FEC8 |
| 0000055320 | 0375 | 43E9 | FF00 | DC76 | 36FF | 02D6 | 36FF | 02D4 |
| 0000055340 | 468D | 16D0 | 8D50 | F246 | 5016 | 468D | 16C4 | 1E50 |
| 0000055360 | 7E68 | 6803 | 023B | 36FF | 0204 | 36FF | 0202 | 36FF |
| 0000055400 | 0208 | 36FF | 0206 | 681E | 0375 | D268 | 684F | 4FD5 |
| 0000055420 | D89A | 004F | 8300 | 28C4 | 068E | 31A0 | 8326 | 6D3E |
| 0000055440 | 0055 | 0375 | 09E9 | 8300 | C87E | 74FE | E903 | 000F |
| 0000055460 | 068E | 31A2 | 8326 | 853E | 0055 | 0375 | 51E9 | 8B00 |
| 0000055500 | DC46 | 4689 | FFCA | CE76 | 76FF | 8DCC | CA46 | 5016 |
| 0000055520 | 76FF | FFDE | FA76 | 76FF | 8DF8 | D04E | 5116 | 4E8D |
| 0000055540 | 16F2 | 8D51 | C44E | 5116 | 681E | 037E | 3C68 | FF02 |
| 0000055560 | 0436 | FF02 | 0236 | FF02 | 0836 | FF02 | 0636 | 9A02 |
| 0000055600 | 55CD | 0000 | C483 | 8B28 | CA46 | 86E9 | E900 | 0006 |
| 0000055620 | 468B | E9DC | 007D | 068E | 31A0 | 8326 | 8B3E | 004F |
| 0000055640 | 0375 | 09E9 | 8300 | C87E | 74FE | E903 | 000F | 068E |
| 0000055660 | 31A2 | 8326 | FE3E | 004F | 0375 | 50E9 | C700 | CA46 |
| 0000055700 | 0000 | 76FF | FFCE | CC76 | 468D | 16CA | FF50 | DE76 |
| 0000055720 | 76FF | FFFA | F876 | 4E8D | 16D0 | 8D51 | F24E | 5116 |
| 0000055740 | 4E8D | 16C4 | 1E51 | 7E6B | 6803 | 0240 | 36FF | 0204 |
| 0000055760 | 36FF | 0202 | 36FF | 0208 | 36FF | 0206 | 379A | 0053 |
| 0000056000 | 8300 | 28C4 | 468B | E9CA | 0009 | 06E9 | B800 | 0000 |
| 0000056020 | 00E9 | 1F00 | 5F5E | ED83 | 8B02 | 1FE5 | 4D5D | 04CA |
| 0000056040 | 1E00 | 9058 | 5545 | EC8B | 8E1E | 81D8 | 2CEC | 5700 |

THU MAR 14 17:25:16 1991 CRV_IPS.DLL PAGE 26, LINE 1476

| | | | | | | | | |
|---|---|---|---|---|---|---|---|---|
| 0000056060 | C756 | FA46 | 038F | 5E8C | C7FC | EC46 | 0101 | C02B |
| 0000056100 | 4689 | 89DE | DC46 | 068E | 31A0 | 8326 | 1A3E | 0057 |
| 0000056120 | 0375 | 1DE9 | FF00 | 0836 | FF02 | 0636 | 8D02 | D446 |
| 0000056140 | 5016 | EA9A | 0041 | 8300 | D8C4 | 003D | 7400 | E903 |
| 0000056160 | 000F | 068E | 31A2 | 8326 | 8D3E | 0057 | 0375 | 3BE9 |
| 0000056200 | 1E00 | 9368 | 8D03 | E046 | 5016 | 468D | 16D4 | 8D50 |
| 0000056220 | F046 | 5016 | 4E68 | 1E02 | C068 | FF03 | 0436 | FF02 |
| 0000056240 | 0236 | FF02 | 0836 | FF02 | 0636 | 9A02 | 4233 | 0000 |
| 0000056260 | C483 | 891E | F046 | 5689 | E9F2 | 00C8 | C02B | 4689 |
| 0000056300 | 89F2 | F046 | 46C7 | 00EE | E900 | 0003 | 46FF | C4EE |
| 0000056320 | 065E | 468B | 26EE | 0739 | 0377 | 43E9 | C400 | 0A5E |
| 0000056340 | C383 | 8B08 | EE76 | E6D1 | 8B26 | C400 | 065E | C383 |
| 0000056360 | 8B08 | EE76 | E6D1 | 3926 | 7400 | E903 | 0011 | 768B |
| 0000056400 | D1EE | C4E6 | 0A5E | C726 | 0840 | 0000 | 0EE9 | 8B00 |
| 0000056420 | EE76 | E6D1 | 5EC4 | 260A | 40C7 | 0108 | E900 | FFAC |
| 0000056440 | D46A | 468D | 16F6 | 6A50 | 6A00 | 6A00 | 6A00 | 9A1C |
| 0000056460 | DFDD | 57FC | C483 | 890E | F446 | 7E83 | 00F4 | 0375 |
| 0000056500 | D8E9 | 8E00 | A006 | 2631 | 3E83 | 5775 | 7500 | E903 |
| 0000056520 | 004C | 7E83 | FED8 | 0375 | 43E9 | FF00 | F476 | 36FF |
| 0000056540 | 02CA | 36FF | 02C8 | 468D | 16E0 | 8D50 | F046 | 5016 |
| 0000056560 | 468D | 16D4 | 1E50 | C068 | 6803 | 025F | 36FF | 0204 |
| 0000056600 | 36FF | 0202 | 36FF | 0208 | 36FF | 0206 | 681E | 0397 |
| 0000056620 | 5768 | 6858 | 585A | 5D9A | 0058 | 8300 | 28C4 | 068E |
| 0000056640 | 31A0 | 8326 | 143E | 0058 | 0375 | 09E9 | 8300 | D87E |
| 0000056660 | 74FE | E903 | 000F | 068E | 31A2 | 8326 | 833E | 0058 |
| 0000056700 | 0375 | 50E9 | C700 | DA46 | FFEF | 76FF | FFDE | DC76 |
| 0000056720 | 468D | 16DA | FF50 | EC76 | 76FF | FFFC | FA76 | 4E8D |
| 0000056740 | 16E0 | 8D51 | F04E | 5116 | 4E8D | 16D4 | 1E51 | C068 |
| 0000056760 | 6803 | 0260 | 36FF | 0204 | 36FF | 0202 | 36FF | 0208 |
| 0000057000 | 36FF | 0206 | CB9A | 0058 | 8300 | 28C4 | 468B | E9DA |
| 0000057020 | 0276 | 06E9 | B800 | FFEF | 6DE9 | FF02 | F876 | 76FF |
| 0000057040 | 6AF6 | FF48 | 0C76 | 76FF | 9A0A | CF29 | 58F2 | C483 |
| 0000057060 | 890A | F446 | 7E83 | 00F4 | 0375 | D4E9 | 8E00 | A006 |
| 0000057100 | 2631 | 3E83 | 586B | 7500 | E903 | 0048 | 7E83 | FED8 |
| 0000057120 | 0375 | 3FE9 | FF00 | F476 | 681E | 039F | 468D | 16E0 |
| 0000057140 | 8D50 | F046 | 5016 | 468D | 16D4 | 1E50 | C068 | 6803 |
| 0000057160 | 0267 | 36FF | 0204 | 36FF | 0202 | 36FF | 0208 | 36FF |
| 0000057200 | 0206 | 681E | 03B0 | 5168 | 6859 | 5954 | 579A | 0059 |
| 0000057220 | 8300 | 28C4 | 068E | 31A0 | 8326 | 0A3E | 0059 | 0375 |
| 0000057240 | 09E9 | 8300 | D87E | 74FE | E903 | 000F | 068E | 31A2 |
| 0000057260 | 8326 | 7D3E | 0059 | 0375 | 50E9 | C700 | DA46 | FFEF |
| 0000057300 | 76FF | FFDE | DC76 | 468D | 16DA | FF50 | EC76 | 76FF |
| 0000057320 | FFFC | FA76 | 4E8D | 16E0 | 8D51 | F04E | 5116 | 4E8D |
| 0000057340 | 16D4 | 1E51 | C068 | 6803 | 0268 | 36FF | 0204 | 36FF |
| 0000057360 | 0202 | 36FF | 0208 | 36FF | 0206 | 6E9A | 0054 | 8300 |
| 0000057400 | 28C4 | 468B | E9DA | 0180 | 06E9 | B800 | FFEF | 77E9 |
| 0000057420 | 6A01 | 6A00 | 6A00 | 6A00 | 6A00 | 6A00 | 6A00 | 9A4A |
| 0000057440 | DFDD | 4AD1 | C483 | 890E | F446 | 7E83 | 00F4 | 0375 |
| 0000057460 | D8E9 | 8E00 | A006 | 2631 | 3E83 | 5965 | 7500 | E903 |
| 0000057500 | 004C | 7E83 | FED8 | 0375 | 43E9 | FF00 | F476 | 36FF |
| 0000057520 | 02CA | 36FF | 02C8 | 468D | 16E0 | 8D50 | F046 | 5016 |
| 0000057540 | 468D | 16D4 | 1E50 | C068 | 6803 | 026E | 36FF | 0204 |
| 0000057560 | 36FF | 0202 | 36FF | 0208 | 36FF | 0206 | 681E | 03B8 |
| 0000057600 | F968 | 6853 | 53FC | FF9A | 0053 | 8300 | 28C4 | 068E |
| 0000057620 | 31A0 | 8326 | B23E | 0053 | 0375 | 09E9 | 8300 | D87E |
| 0000057640 | 74FE | E903 | 000F | 068E | 31A2 | 8326 | 253E | 0054 |
| 0000057660 | 0375 | 50E9 | C700 | DA46 | FFEF | 76FF | FFDE | DC76 |
| 0000057700 | 468D | 16DA | FF50 | EC76 | 76FF | FFFC | FA76 | 4E8D |
| 0000057720 | 16E0 | 8D51 | F04E | 5116 | 4E8D | 16D4 | 1E51 | C068 |

THU MAR 14 17:25:16 1991 CRV_IPS.DLL PAGE 27, LINE 1535

| | | | | | | | | |
|---|---|---|---|---|---|---|---|---|
| 0000057740 | 6803 | 026F | 36FF | 0204 | 36FF | 0202 | 36FF | 0208 |
| 0000057760 | 36FF | 0206 | 429A | 005A | 8300 | 28C4 | 468B | E9DA |
| 0000060000 | 0086 | 06E9 | B800 | FFEF | 7DE9 | 8E00 | A006 | 2631 |
| 0000060020 | 3E83 | 561D | 7500 | E903 | 0009 | 7E83 | FED8 | 0374 |
| 0000060040 | 0FE9 | 8E00 | A206 | 2631 | 3E83 | 5649 | 7500 | E9U3 |
| 0000060060 | 0050 | 46C7 | 00DA | FF00 | DE76 | 76FF | 8DDC | DA46 |
| 0000060100 | 5016 | 76FF | FFEC | FC76 | 76FF | 8DFA | E04E | 5116 |
| 0000060120 | 4E8D | 16F0 | 8D51 | D44E | 5116 | 681E | 03C0 | 7168 |
| 0000060140 | FF02 | 0436 | FF02 | 0236 | FF02 | 0836 | FF02 | 0636 |
| 0000060160 | 9A02 | 57D5 | 0000 | C483 | 8B28 | DA46 | 09E9 | E900 |
| 0000060200 | 0006 | 00B8 | E900 | 0000 | 5F5E | ED83 | 8B02 | 1FE5 |
| 0000060220 | 4D5D | 1ECB | 9058 | 5545 | EC8B | 8E1E | 81D8 | 2EEC |
| 0000060240 | 5700 | C756 | FA46 | 03D3 | 5E8C | C7FC | EC46 | 0101 |
| 0000060260 | C02B | 4689 | 89DC | DA46 | 068E | 31A0 | 8326 | BD3E |
| 0000060300 | 005B | 0375 | 1DE9 | FF00 | 0836 | FF02 | 0636 | 8D02 |
| 0000060320 | D246 | 5016 | 339A | 0056 | 8300 | 08C4 | 003D | 7400 |
| 0000060340 | E903 | 000F | 068E | 31A2 | 8326 | 303E | 005C | 0375 |
| 0000060360 | 3BE9 | 1E00 | D768 | 8D03 | DE46 | 5016 | 468D | 16D2 |
| 0000060400 | 8D50 | F046 | 5016 | 7E68 | 1E02 | 0468 | FF04 | 0436 |
| 0000060420 | FF02 | 0236 | FF02 | 0836 | FF02 | 0636 | 9A02 | 567C |
| 0000060440 | 0000 | C483 | 891E | F046 | 5689 | E9F2 | 0008 | C02B |
| 0000060460 | 4689 | 89F2 | F046 | 46C7 | 00EE | E900 | 0003 | 46FF |
| 0000060500 | C4EE | 065E | 468B | 26EE | 0739 | 0377 | 74E9 | C700 |
| 0000060520 | EA46 | 0000 | 03E9 | FF00 | EA46 | 5EC4 | 8B06 | EA46 |
| 0000060540 | 3926 | 0847 | 0377 | 57E9 | 8B00 | EE76 | E6C1 | 0305 |
| 0000060560 | EA76 | E6D1 | 5EC4 | 2606 | 408B | 8B10 | EE76 | E6C1 |
| 0000060600 | 0305 | EA76 | E6D1 | 5EC4 | 260A | 4039 | 7410 | E903 |
| 0000060620 | 0017 | 768B | C1EE | 05E6 | 7603 | D1EA | C4E6 | 0A5E |
| 0000060640 | C726 | 1040 | 0000 | 14E9 | 8B00 | EE76 | E6C1 | 0305 |
| 0000060660 | EA76 | E6D1 | 5EC4 | 260A | 40C7 | 0110 | E900 | FF97 |
| 0000060700 | 7BE9 | 6AFF | 8D04 | F446 | 5016 | 006A | 006A | 006A |
| 0000060720 | 1E6A | DD9A | A0DF | 835C | 0EC4 | 4689 | 83F8 | F87E |
| 0000060740 | 7500 | E903 | 00D8 | 068E | 31A0 | 8326 | 183E | 005C |
| 0000060760 | 0375 | 4CE9 | 8300 | D67E | 75FE | E903 | 0043 | 76FF |
| 0000061000 | FFF8 | CA36 | FF02 | C836 | 8D02 | DE46 | 5016 | 468D |
| 0000061020 | 16F0 | 8D50 | D246 | 5016 | 681E | 0404 | 9068 | FF02 |
| 0000061040 | 0436 | FF02 | 0236 | FF02 | 0836 | FF02 | 0636 | 1E02 |
| 0000061060 | DB68 | 6803 | 5CFB | FE68 | 9A5C | 5D01 | 0000 | C483 |
| 0000061100 | 8E28 | A006 | 2631 | 3E83 | 5CB8 | 7500 | E903 | 0009 |
| 0000061120 | 7E83 | FED6 | 0374 | 0FE9 | 8E00 | A206 | 2631 | 3E83 |
| 0000061140 | 5D27 | 7500 | E903 | 0050 | 46C7 | EFD8 | FFFF | DC76 |
| 0000061160 | 76FF | 8DDA | D846 | 5016 | 76FF | FFEC | FC76 | 76FF |
| 0000061200 | 8DFA | DE4E | 5116 | 4E8D | 16F0 | 8D51 | D24E | 5116 |
| 0000061220 | 681E | 0404 | 9168 | FF02 | 0436 | FF02 | 0236 | FF02 |
| 0000061240 | 0836 | FF02 | 0636 | 9A02 | 5D6F | 0000 | C483 | 8B28 |
| 0000061260 | D846 | 77E9 | E902 | 0006 | EFB8 | E9FF | 026E | 76FF |
| 0000061300 | FFF6 | F476 | 1068 | FF08 | 0C76 | 76FF | 9A0A | CF29 |
| 0000061320 | 5D96 | C483 | 890A | F846 | 7E83 | 00F8 | 0375 | D4E9 |
| 0000061340 | 8E00 | A006 | 2631 | 3E83 | 5D0F | 7500 | E903 | 0048 |
| 0000061360 | 7E83 | FED6 | 0375 | 3FE9 | FF00 | F876 | 681E | 03E3 |
| 0000061400 | 468D | 16DE | 8D50 | F046 | 5016 | 468D | 16D2 | 1E50 |
| 0000061420 | 0468 | 6804 | 0298 | 36FF | 0204 | 36FF | 0202 | 36FF |
| 0000061440 | 0208 | 36FF | 0206 | 681E | 03F4 | F568 | 685D | 5DF8 |
| 0000061460 | FB9A | 005D | 8300 | 28C4 | 068E | 31A0 | 8326 | AE3E |
| 0000061500 | 005D | 0375 | 09E9 | 8300 | D67E | 74FE | E903 | 000F |
| 0000061520 | 068E | 31A2 | 8326 | 213E | 005E | 0375 | 50E9 | C700 |
| 0000061540 | D846 | FFEF | 76FF | FFDC | DA76 | 468D | 16D8 | FF50 |
| 0000061560 | EC76 | 76FF | FFFC | FA76 | 4E8D | 16DE | 8D51 | F04E |
| 0000061600 | 5116 | 4E8D | 16D2 | 1E51 | 0468 | 6804 | 0299 | 36FF |

THU MAR 14 17:25:16 1991 CRV_IPS.DLL PAGE 28, LINE 1594

| | | | | | | | | |
|---|---|---|---|---|---|---|---|---|
| 0000061620 | 0204 | 36FF | 0202 | 36FF | 0208 | 36FF | 0206 | C59A |
| 0000061640 | 0059 | 8300 | 28C4 | 468B | E9D8 | 0180 | 06E9 | B800 |
| 0000061660 | FFEF | 77E9 | 6A01 | 6A00 | 6A00 | 6A00 | 6A00 | 6A00 |
| 0000061700 | 6A00 | 9A4B | DFDD | 5702 | C483 | 890E | F846 | 7E83 |
| 0000061720 | 00F8 | 0375 | D8E9 | 8E00 | A006 | 2631 | 3E83 | 5E09 |
| 0000061740 | 7500 | E903 | 004C | 7E83 | FED6 | 0375 | 43E9 | FF00 |
| 0000061760 | F876 | 36FF | 02CA | 36FF | 02C8 | 468D | 16DE | 8D50 |
| 0000062000 | F046 | 5016 | 468D | 16D2 | 1E50 | 0468 | 6804 | 029F |
| 0000062020 | 36FF | 0204 | 36FF | 0202 | 36FF | 0208 | 36FF | 0206 |
| 0000062040 | 681E | 03FC | 6168 | 6857 | 5764 | 679A | 0057 | 8300 |
| 0000062060 | 28C4 | 068E | 31A0 | 8326 | E23E | 0059 | 0375 | 09E9 |
| 0000062100 | 8300 | D67E | 74FE | E903 | 000F | 068E | 31A2 | 8326 |
| 0000062120 | FA3E | 0059 | 0375 | 50E9 | C700 | D846 | FFEF | 76FF |
| 0000062140 | FFDC | DA76 | 468D | 16D8 | FF50 | EC76 | 76FF | FFFC |
| 0000062160 | FA76 | 4E8D | 16DE | 8D51 | F04E | 5116 | 4E8D | 16D2 |
| 0000062200 | 1E51 | 0468 | 6804 | 02A0 | 36FF | 0204 | 36FF | 0202 |
| 0000062220 | 36FF | 0208 | 36FF | 0206 | E69A | 005E | 8300 | 28C4 |
| 0000062240 | 468B | E9D8 | 0086 | 06E9 | B800 | FFEF | 7DE9 | 8E00 |
| 0000062260 | A006 | 2631 | 3E83 | 5A8F | 7500 | E903 | 0009 | 7E83 |
| 0000062300 | FED6 | 0374 | 0FE9 | 8E00 | A206 | 2631 | 3E83 | 5ABB |
| 0000062320 | 7500 | E903 | 0050 | 46C7 | 00D8 | FF00 | DC76 | 76FF |
| 0000062340 | 8DDA | D846 | 5016 | 76FF | FFEC | FC76 | 76FF | 8DFA |
| 0000062360 | DE4E | 5116 | 4E8D | 16F0 | 8D51 | D24E | 5116 | 681E |
| 0000062400 | 0404 | A268 | FF02 | 0436 | FF02 | 0236 | FF02 | 0836 |
| 0000062420 | FF02 | 0636 | 9A02 | 5C78 | 0000 | C483 | 8828 | D846 |
| 0000062440 | 09E9 | E900 | 0006 | 00B8 | E900 | 0000 | 5F5E | ED83 |
| 0000062460 | 8B02 | 1FE5 | 4D5D | 1ECB | 9058 | 5545 | EC8B | 8E1E |
| 0000062500 | 81D8 | 28EC | 5700 | 1E56 | B4B8 | 8E41 | C7D8 | F846 |
| 0000062520 | 0415 | 5E8C | C7FA | F046 | 0101 | C02B | 4689 | 89E2 |
| 0000062540 | E046 | 068E | 31A0 | 8326 | 863E | 005E | 0375 | 1DE9 |
| 0000062560 | FF00 | 0836 | FF02 | 0636 | 8D02 | D846 | 5016 | A59A |
| 0000062600 | 005A | 8300 | 08C4 | 003D | 7400 | E903 | 000F | 068E |
| 0000062620 | 31A2 | 8326 | 9E3E | 005E | 0375 | 3BE9 | 1E00 | 1968 |
| 0000062640 | 8D04 | E446 | 5016 | 468D | 16D8 | 8D50 | F246 | 5016 |
| 0000062660 | B668 | 1E02 | CE68 | FF04 | 0436 | FF02 | 0236 | FF02 |
| 0000062700 | 0836 | FF02 | 0636 | 9A02 | 5AEE | 00C0 | C483 | 891E |
| 0000062720 | F246 | 5689 | E9F4 | 0008 | C02B | 4689 | 89F4 | F246 |
| 0000062740 | 068E | 31A4 | A126 | 0F2C | 2B48 | 26D2 | 36F7 | 0F2E |
| 0000062760 | 8940 | FC46 | 5EC4 | A106 | 0220 | 3926 | 2447 | 0374 |
| 0000063000 | 7DE9 | 8E00 | A006 | 2631 | 3E83 | 6105 | 7500 | E903 |
| 0000063020 | 0009 | 7E83 | FEDC | 0374 | 0FE9 | 8E00 | A206 | 2631 |
| 0000063040 | 3E83 | 6178 | 7500 | E903 | 0050 | 46C7 | 00DE | FF00 |
| 0000063060 | E276 | 76FF | 8DE0 | DE46 | 5016 | 76FF | FFF0 | FA76 |
| 0000063100 | 76FF | 8DF8 | E44E | 5116 | 4E8D | 16F2 | 8D51 | D84E |
| 0000063120 | 5116 | 681E | 04CE | BE68 | FF02 | 0436 | FF02 | 0236 |
| 0000063140 | FF02 | 0836 | FF02 | 0636 | 9A02 | 61C0 | 0000 | C483 |
| 0000063160 | 8B28 | DE46 | 57E9 | E909 | 0006 | 00B8 | E900 | 094E |
| 0000063200 | 7E83 | 01FC | 0374 | 8AE9 | C402 | 065E | 0AA1 | 2602 |
| 0000063220 | 4739 | 7624 | E903 | 01FE | 5EC4 | 2606 | 7F83 | 0024 |
| 0000063240 | 0377 | F1E9 | C401 | 065E | 8B26 | 245F | E3D1 | BF83 |
| 0000063260 | 020A | 7500 | E903 | 01DE | 3E83 | 3608 | 740C | E903 |
| 0000063300 | 0026 | 006A | 006A | 006A | 026A | 5EC4 | 2606 | 478B |
| 0000063320 | D124 | 05E0 | 020E | 501E | 476A | DD9A | E7DF | 8360 |
| 0000063340 | 0EC4 | 4689 | E9F6 | 0037 | 3E83 | 3608 | 750B | E903 |
| 0000063360 | 000A | 3E83 | 3608 | 740A | E903 | 0023 | 006A | 006A |
| 0000063400 | 006A | 026A | 5EC4 | 2606 | 478B | D124 | 05E0 | 0210 |
| 0000063420 | 501E | 476A | DD9A | FEDF | 8362 | 0EC4 | 4689 | 83F6 |
| 0000063440 | F67E | 7500 | E903 | 00DE | 06C7 | 0220 | 0000 | 068E |
| 0000063460 | 31A0 | 8326 | 603E | 0061 | 0375 | 4CE9 | 8300 | DC7E |

THU MAR 14 17:25:16 1991 CRV_IPS.DLL PAGE 29, LINE 1653

| | | | | | | | | |
|---|---|---|---|---|---|---|---|---|
| 0000063500 | 75FE | E903 | 0043 | 76FF | FFF6 | CA36 | FF02 | C836 |
| 0000063520 | 8D02 | E446 | 5016 | 468D | 16F2 | 8D50 | D846 | 5016 |
| 0000063540 | 681E | 04CE | D368 | FF02 | 0436 | FF02 | 0236 | FF02 |
| 0000063560 | 0836 | FF02 | 0636 | 1E02 | 1D68 | 6804 | 635C | 5F68 |
| 0000063600 | 9A63 | 5C0A | 0000 | C483 | 8E28 | A006 | 2631 | 3E83 |
| 0000063620 | 61ED | 7500 | E903 | 0009 | 7E83 | FEDC | 0374 | 0FE9 |
| 0000063640 | 8E00 | A206 | 2631 | 3E83 | 6205 | 7500 | E903 | 0050 |
| 0000063660 | 46C7 | EFDE | FFFF | E276 | 76FF | 8DE0 | DE46 | 5016 |
| 0000063700 | 76FF | FFF0 | FA76 | 76FF | 8DF8 | E44E | 5116 | 4E8D |
| 0000063720 | 16F2 | 8D51 | D84E | 5116 | 681E | 04CE | D468 | FF02 |
| 0000063740 | 0436 | FF02 | 0236 | FF02 | 0836 | FF02 | 0636 | 9A02 |
| 0000063760 | 624D | 0000 | C483 | 8B28 | DE46 | D1E9 | E907 | 0006 |
| 0000064000 | EFB8 | E9FF | 07C8 | 06C7 | 02C6 | 0001 | 5EC4 | 2606 |
| 0000064020 | 478B | A324 | 0220 | 068E | 31A0 | 8326 | 6D3E | 0062 |
| 0000064040 | 0375 | 09E9 | 8300 | DC7E | 74FE | E903 | 000F | 068E |
| 0000064060 | 31A2 | 8326 | 853E | 0062 | 0375 | 50E9 | C700 | DE46 |
| 0000064100 | 0000 | 76FF | FFE2 | E076 | 468D | 16DE | FF50 | F076 |
| 0000064120 | 76FF | FFFA | F876 | 4E8D | 16E4 | 8D51 | F24E | 5116 |
| 0000064140 | 4E8D | 16D8 | 1E51 | CE68 | 6804 | 02D8 | 36FF | 0204 |
| 0000064160 | 36FF | 0202 | 36FF | 0208 | 36FF | 0206 | CD9A | 0062 |
| 0000064200 | 8300 | 28C4 | 468B | E9DE | 0744 | 06E9 | B800 | 0000 |
| 0000064220 | 3BE9 | E907 | 007D | 068E | 31A0 | 8326 | 153E | 0063 |
| 0000064240 | 0375 | 09E9 | 8300 | DC7E | 74FE | E903 | 000F | 068E |
| 0000064260 | 31A2 | 8326 | 653E | 005F | 0375 | 50E9 | C700 | DE46 |
| 0000064300 | FFFF | 76FF | FFE2 | E076 | 468D | 16DE | FF50 | F076 |
| 0000064320 | 76FF | FFFA | F876 | 4E8D | 16E4 | 8D51 | F24E | 5116 |
| 0000064340 | 4E8D | 16D8 | 1E51 | CE68 | 6804 | 02DB | 36FF | 0204 |
| 0000064360 | 36FF | 0202 | 36FF | 0208 | 36FF | 0206 | 699A | 005E |
| 0000064400 | 8300 | 28C4 | 468B | E9DE | 06C4 | 06E9 | B800 | FFFF |
| 0000064420 | BBE9 | 8306 | C63E | 0002 | 0374 | FFE9 | 6A00 | 6A00 |
| 0000064440 | 6A00 | 6A00 | 6A00 | 6A00 | 6A00 | 9A48 | DFDD | 5BA5 |
| 0000064460 | C483 | 890E | F646 | 003D | 7500 | E903 | 00D8 | 068E |
| 0000064500 | 31A0 | 8326 | 393E | 005F | 0375 | 4CE9 | 8300 | DC7E |
| 0000064520 | 75FE | E903 | 0043 | 76FF | FFF6 | CA36 | FF02 | C836 |
| 0000064540 | 8D02 | E446 | 5016 | 468D | 16F2 | 8D50 | D846 | 5016 |
| 0000064560 | 681E | 04CE | E368 | FF02 | 0436 | FF02 | 0236 | FF02 |
| 0000064600 | 0836 | FF02 | 0636 | 1E02 | 2568 | 6804 | 5C04 | 0768 |
| 0000064620 | 9A5C | 6452 | 0000 | C483 | 8E28 | A006 | 2631 | 3E83 |
| 0000064640 | 63FD | 7500 | E903 | 0009 | 7E83 | FEDC | 0374 | 0FE9 |
| 0000064660 | 8E00 | A206 | 2631 | 3E83 | 64B3 | 7500 | E903 | 0050 |
| 0000064700 | 46C7 | EFDE | FFFF | E276 | 76FF | 8DE0 | DE46 | 5016 |
| 0000064720 | 76FF | FFF0 | FA76 | 76FF | 8DF8 | E44E | 5116 | 4E8D |
| 0000064740 | 16F2 | 8D51 | D84E | 5116 | 681E | 04CE | E468 | FF02 |
| 0000064760 | 0436 | FF02 | 0236 | FF02 | 0836 | FF02 | 0636 | 9A02 |
| 0000065000 | 64FB | 0000 | C483 | 8B28 | DE46 | C1E9 | E905 | 0006 |
| 0000065020 | EFB8 | E9FF | 05B8 | 06C7 | 02C6 | 0001 | 3E83 | 3608 |
| 0000065040 | 740A | E903 | 0094 | 068E | 31A0 | 8326 | 9B3E | 0064 |
| 0000065060 | 0375 | 54E9 | 8300 | DC7E | 75FE | E903 | 004B | 5EC4 |
| 0000065100 | 2606 | 478B | C124 | 05E0 | 4605 | 1E02 | 1E50 | 2D68 |
| 0000065120 | 8D04 | E446 | 5016 | 468D | 16F2 | 8D50 | D846 | 5016 |
| 0000065140 | 681E | 04CE | EB68 | FF02 | 0436 | FF02 | 0236 | FF02 |
| 0000065160 | 0836 | FF02 | 0636 | 1E02 | 3668 | 6804 | 6566 | 6968 |
| 0000065200 | 9A65 | 656C | 0000 | C483 | 6A2A | C400 | 065E | 8B26 |
| 0000065220 | 2447 | E0C1 | 0505 | 0246 | 501E | 006A | 006A | 068E |
| 0000065240 | 31A4 | FF26 | 1E36 | 260F | 36FF | 0F1C | 069A | 8E8D |
| 0000065260 | 8365 | 0EC4 | 4689 | E9F6 | 0399 | 3E83 | 3608 | 740C |
| 0000065300 | E903 | 007D | 068E | 31A0 | 8326 | 223E | 0065 | 0375 |
| 0000065320 | 09E9 | 8300 | DC7E | 74FE | E903 | 000F | 068E | 31A2 |
| 0000065340 | 8326 | 013E | 0067 | 0375 | 50E9 | C700 | DE46 | 0000 |

THU MAR 14 17:25:16 1991 CRV_IPS.DLL PAGE 30, LINE 1712

| | | | | | | | | |
|---|---|---|---|---|---|---|---|---|
| 0000065360 | 76FF | FFE2 | E076 | 468D | 16DE | FF50 | F076 | 76FF |
| 0000065400 | FFFA | F876 | 4E8D | 16E4 | 8D51 | F24E | 5116 | 4E8D |
| 0000065420 | 16D8 | 1E51 | CE68 | 6804 | 02F4 | 36FF | 0204 | 36FF |
| 0000065440 | 0202 | 36FF | 0208 | 36FF | 0206 | 3A9A | 0060 | 8300 |
| 0000065460 | 28C4 | 468B | E9DE | 0496 | 06E9 | B800 | 0000 | 8DE9 |
| 0000065500 | C404 | 065E | 8B26 | 2447 | F3E9 | 8E02 | A006 | 2631 |
| 0000065520 | 3E83 | 65A0 | 7500 | E903 | 0049 | 7E83 | FEDC | 0375 |
| 0000065540 | 40E9 | 1E00 | 2268 | 1E02 | 3E68 | 8D04 | E446 | 5016 |
| 0000065560 | 468D | 16F2 | 8D50 | D846 | 5016 | 681E | 04CE | F968 |
| 0000065600 | FF02 | 0436 | FF02 | 0236 | FF02 | 0836 | FF02 | 0636 |
| 0000065620 | 1E02 | 4B68 | 6804 | 65E4 | E768 | 9A65 | 65EA | 0000 |
| 0000065640 | C483 | 6A2A | 1E00 | 2268 | 6A02 | 6A00 | 8E00 | A406 |
| 0000065660 | 2631 | 36FF | 0F1E | FF26 | 1C36 | 9A0F | 8D06 | 661A |
| 0000065700 | C483 | 890E | F646 | 8AE9 | 8E02 | A006 | 2631 | 3E83 |
| 0000065720 | 6692 | 7500 | E903 | 0049 | 7E83 | FEDC | 0375 | 40E9 |
| 0000065740 | 1E00 | 4268 | 1E02 | 5368 | 8D04 | E446 | 5016 | 468D |
| 0000065760 | 16F2 | 8D50 | D846 | 5016 | 681E | 04CE | 0068 | FF03 |
| 0000066000 | 0436 | FF02 | 0236 | FF02 | 0836 | FF02 | 0636 | 1E02 |
| 0000066020 | 6368 | 6804 | 66D5 | D868 | 9A66 | 66DB | 0000 | C483 |
| 0000066040 | 832A | 203E | 0102 | 0374 | 2AE9 | 6A00 | 1E01 | 4263 |
| 0000066060 | FF02 | 6436 | FF02 | 6236 | 8E02 | A406 | 2631 | 36FF |
| 0000066100 | 0F22 | FF26 | 2036 | 9A0F | 8D06 | 664A | C483 | 890E |
| 0000066120 | F646 | 5EE9 | 8301 | 203E | 0302 | 0374 | 26E9 | 6A00 |
| 0000066140 | 1E01 | 2268 | 6A02 | 6A00 | 8E00 | A406 | 2631 | 36FF |
| 0000066160 | 0F1E | FF26 | 1C36 | 9A0F | 8D06 | 6674 | C483 | 890E |
| 0000066200 | F646 | 2EE9 | 6A01 | 1E00 | 4268 | FF02 | 6436 | FF02 |
| 0000066220 | 6236 | 8E02 | A406 | 2631 | 36FF | DF22 | FF26 | 2036 |
| 0000066240 | 9A0F | 8D06 | 507F | C483 | 890E | F646 | 7E83 | 00F6 |
| 0000066260 | 0375 | DBE9 | C700 | 2006 | 0002 | 8E00 | A006 | 2631 |
| 0000066300 | 3E83 | 66E9 | 7500 | E903 | 0048 | 7E83 | FEDC | 0375 |
| 0000066320 | 3FE9 | FF00 | F676 | 681E | 046B | 468D | 16E4 | 8D50 |
| 0000066340 | F246 | 5016 | 468D | 16D8 | 1E50 | CE68 | 6804 | 0312 |
| 0000066360 | 36FF | 0204 | 34FF | 0202 | 36FF | 0208 | 36FF | 0206 |
| 0000066400 | 681E | 0489 | 4C68 | 6861 | 614F | 529A | 0061 | 8300 |
| 0000066420 | 28C4 | 068E | 31A0 | 8326 | DA3E | 005F | 0375 | 09E9 |
| 0000066440 | 8300 | DC7E | 74FE | E903 | 000F | 068E | 31A2 | 8326 |
| 0000066460 | F23E | 005F | 0375 | 51E9 | 8B00 | F646 | 4689 | FFDE |
| 0000066500 | E276 | 76FF | 8DE0 | DE46 | 5016 | 76FF | FFF0 | FA76 |
| 0000066520 | 76FF | 8DF8 | E44E | 5116 | 4E8D | 16F2 | 8D51 | D84E |
| 0000066540 | 5116 | 681E | 04CE | 1368 | FF03 | 0436 | FF02 | 0236 |
| 0000066560 | FF02 | 0836 | FF02 | 0636 | 9A02 | 63D0 | 0000 | C483 |
| 00000666D0 | 8B28 | DE46 | 47E9 | E902 | 0006 | 468B | E9F6 | 023E |
| 0000066620 | 016A | 681E | 0222 | 006A | 006A | 068E | 31A4 | FF26 |
| 0000066640 | 1E36 | 260F | 36FF | 0F1C | 069A | FD8D | 8367 | 0EC4 |
| 0000066660 | 4689 | E9F6 | 009D | 068E | 31A0 | 8326 | 703E | 0063 |
| 0000066700 | 0375 | 49E9 | 8300 | DC7E | 75FE | E903 | 0040 | 681E |
| 0000066720 | 0242 | 681E | 0491 | 468D | 16E4 | 8D50 | F246 | 5016 |
| 0000066740 | 468D | 16D8 | 1E50 | CE68 | 6804 | 031D | 36FF | 0204 |
| 0000066760 | 36FF | 0202 | 36FF | 0208 | 36FF | 0206 | 681E | 049F |
| 0000067000 | 4C68 | 6864 | 644F | 629A | 0063 | 8300 | 2AC4 | 006A |
| 0000067020 | 681E | 0242 | 36FF | 0264 | 36FF | 0262 | 068E | 31A4 |
| 0000067040 | FF26 | 2236 | 260F | 36FF | 0F20 | 069A | 7F8D | 8364 |
| 0000067060 | 0EC4 | 4689 | E9F6 | 001B | 18E9 | E900 | 0015 | 7548 |
| 0000067100 | E903 | FD07 | 7548 | E903 | FD7F | 7548 | E903 | FF66 |
| 0000067120 | E5E9 | 83FF | F67E | 7500 | E903 | 00DB | 06C7 | 0220 |
| 0000067140 | 0000 | 068E | 31A0 | 8326 | 903E | 0068 | 0375 | 48E9 |
| 0000067160 | 8300 | DC7E | 75FE | E903 | 003F | 76FF | 1EF6 | A768 |
| 0000067200 | 8D04 | E446 | 5016 | 468D | 16F2 | 8D50 | D846 | 5016 |
| 0000067220 | 681E | 04CE | 2A68 | FF03 | 0436 | FF02 | 0236 | FF02 |

THU MAR 14 17:25:16 1991 CRV_IPS.DLL PAGE 31, LINE 1771

| | | | | | | | | |
|---|---|---|---|---|---|---|---|---|
| 0000067240 | 0836 | FF02 | 0636 | 1E02 | C568 | 6804 | 67D1 | D468 |
| 0000067260 | 9A67 | 67D7 | 0000 | C483 | 8E28 | A006 | 2631 | 3E83 |
| 0000067300 | 6928 | 7500 | E903 | 0009 | 7E83 | FEDC | 0374 | 0FE9 |
| 0000067320 | 8E00 | A206 | 2631 | 3E83 | 6940 | 7500 | E903 | 0051 |
| 0000067340 | 468B | 89F6 | DE46 | 76FF | FFE2 | E076 | 468D | 16DE |
| 0000067360 | FF50 | F076 | 76FF | FFFA | F876 | 4E8D | 16E4 | 8D51 |
| 0000067400 | F24E | 5116 | 4E8D | 16D8 | 1E51 | CE68 | 6804 | 032B |
| 0000067420 | 36FF | 0204 | 36FF | 0202 | 36FF | 0208 | 36FF | 0206 |
| 0000067440 | 889A | 0069 | 8300 | 28C4 | 468B | E9DE | 00A0 | 06E9 |
| 0000067460 | 8B00 | F646 | 97E9 | C400 | 065E | 8B26 | 2447 | 20A3 |
| 0000067500 | 8302 | 0A3E | 0036 | 0375 | 06E9 | C700 | 0806 | 0C36 |
| 0000067520 | 8E00 | A006 | 2631 | 3E83 | 678D | 7500 | E903 | 0009 |
| 0000067540 | 7E83 | FEDC | 0374 | 0FE9 | 8E00 | A206 | 2631 | 3E83 |
| 0000067560 | 6388 | 7500 | E903 | 0050 | 46C7 | 00DE | FF00 | E276 |
| 0000067600 | 76FF | 8DE0 | DE46 | 5016 | 76FF | FFF0 | FA76 | 76FF |
| 0000067620 | 8DF8 | E44E | 5116 | 4E8D | 16F2 | 8D51 | D84E | 5116 |
| 0000067640 | 681E | 04CE | 3168 | FF03 | 0436 | FF02 | 0236 | FF02 |
| 0000067660 | 0836 | FF02 | 0636 | 9A02 | 674A | 0000 | C483 | 8B28 |
| 0000067700 | DE46 | 09E9 | E900 | 0006 | 00B8 | E900 | 0000 | 5E1F |
| 0000067720 | 835F | 02ED | E58B | 5D1F | CA4D | 0004 | 581E | 4590 |
| 0000067740 | 8B55 | 1EEC | D88E | EC81 | 0026 | 5657 | B81E | 5F19 |
| 0000067760 | D88E | 46C7 | E8FA | 8C04 | FC5E | 46C7 | 01F2 | 2B01 |
| 0000070000 | 89C0 | E446 | 4689 | 8EE2 | A006 | 2631 | 3E83 | 6AE9 |
| 0000070020 | 7500 | E903 | 001D | 36FF | 0208 | 36FF | 0206 | 468D |
| 0000070040 | 16DA | 9A50 | 5F4F | 0000 | C483 | 3D08 | 0000 | 0374 |
| 0000070060 | 0FE9 | 8E00 | A206 | 2631 | 3E83 | 6B58 | 7500 | E903 |
| 0000070100 | 003B | 681E | 04EC | 468D | 16E6 | 8D50 | DA46 | 5016 |
| 0000070120 | 468D | 16F4 | 6850 | 0345 | 681E | 0520 | 36FF | 0204 |
| 0000070140 | 36FF | 0202 | 36FF | 0208 | 36FF | 0206 | 989A | 005F |
| 0000070160 | 8300 | 1EC4 | 4689 | 89F4 | F656 | 08E9 | 2B00 | 89C0 |
| 0000070200 | F646 | 4689 | C7F4 | 0C06 | 0002 | C700 | 0E06 | 0002 |
| 0000070220 | C700 | 1006 | 0002 | C700 | 0A06 | 0002 | C700 | 2006 |
| 0000070240 | 0002 | C700 | 0A06 | 0036 | 1E00 | F068 | 1E04 | 2268 |
| 0000070260 | 9A02 | 91D2 | 6A94 | C483 | 1E08 | F268 | 1E04 | 4268 |
| 0000070300 | 9A02 | 91D2 | 6AAC | C483 | 2B08 | A3C0 | 0264 | 62A3 |
| 0000070320 | 1E02 | F468 | 1E04 | 6668 | 9A02 | 91D2 | 6ABC | C483 |
| 0000070340 | 1E08 | F668 | 1E04 | 8668 | 9A02 | 91D2 | 6ACC | C483 |
| 0000070360 | 1E08 | F868 | 1E04 | A668 | 9A02 | 91D2 | 6BCD | C483 |
| 0000070400 | 9A08 | 0CBD | 677B | 4689 | 83F8 | F87E | 7500 | E903 |
| 0000070420 | 00D4 | 068E | 31A0 | 8326 | 403E | 006B | 0375 | 48E9 |
| 0000070440 | 8300 | DE7E | 75FE | E903 | 003F | 76FF | 1EF8 | FA68 |
| 0000070460 | 8D04 | E646 | 5016 | 468D | 16F4 | 8D50 | DA46 | 5016 |
| 0000070500 | 681E | 0520 | 5868 | FF03 | 0436 | FF02 | 0236 | FF02 |
| 0000070520 | 0836 | FF02 | 0636 | 1E02 | 0F68 | 6805 | 6C2C | 2F68 |
| 0000070540 | 9A6C | 6C32 | 0000 | C483 | 8E28 | A006 | 2631 | 3E83 |
| 0000070560 | 6BE5 | 7500 | E903 | 0009 | 7E83 | FEDE | 0374 | 0FE9 |
| 0000070600 | 8E00 | A206 | 2631 | 3E83 | 6C58 | 7500 | E903 | 0050 |
| 0000070620 | 46C7 | FFE0 | FFFF | E476 | 76FF | 8DE2 | E046 | 5016 |
| 0000070640 | 76FF | FFF2 | FC76 | 76FF | 8DFA | E64E | 5116 | 4E8D |
| 0000070660 | 16F4 | 8D51 | DA4E | 5116 | 681E | 0520 | 5968 | FF03 |
| 0000070700 | 0436 | FF02 | 0236 | FF02 | 0836 | FF02 | 0636 | 9A02 |
| 0000070720 | 6CA0 | 0000 | C483 | 8B28 | E046 | 86E9 | E901 | 0006 |
| 0000070740 | FFB8 | E9FF | 017D | 06C7 | 02C6 | 0000 | 006A | 006A |
| 0000070760 | 006A | 006A | 006A | 006A | 0A6A | DD9A | ADDF | 8360 |
| 0000071000 | 0EC4 | 4689 | 83F8 | F87E | 7500 | E903 | 00D8 | 068E |
| 0000071020 | 31A0 | 8326 | 403E | 006C | 0375 | 4CE9 | 8300 | DE7E |
| 0000071040 | 75FE | E903 | 0043 | 76FF | FFF8 | CA36 | FF02 | C836 |
| 0000071060 | 8D02 | E646 | 5016 | 468D | 16F4 | 8D50 | DA46 | 5016 |
| 0000071100 | 681E | 0520 | 5F68 | FF03 | 0436 | FF02 | 0236 | FF02 |

THU MAR 14 17:25:16 1991 CRV_IPS.DLL PAGE 32, LINE 1830

| | | | | | | | | |
|---|---|---|---|---|---|---|---|---|
| 0000071120 | 0836 | FF02 | 0636 | 1E02 | 1768 | 6805 | 687C | 7F68 |
| 0000071140 | 9A68 | 6882 | 0000 | C483 | 8E28 | A006 | 2631 | 3E83 |
| 0000071160 | 6CBD | 7500 | E903 | 0009 | 7E83 | FEDE | 0374 | 0FE9 |
| 0000071200 | 8E00 | A206 | 2631 | 3E83 | 6CD5 | 7500 | E903 | 0050 |
| 0000071220 | 46C7 | EFE0 | FFFF | E476 | 76FF | 8DE2 | E046 | 5016 |
| 0000071240 | 76FF | FFF2 | FC76 | 76FF | 8DFA | E64E | 5116 | 4E8D |
| 0000071260 | 16F4 | 8D51 | DA4E | 5116 | 681E | 0520 | 6068 | FF03 |
| 0000071300 | 0436 | FF02 | 0236 | FF02 | 0836 | FF02 | 0636 | 9A02 |
| 0000071320 | 6D1D | 0000 | C483 | 8B28 | E046 | 86E9 | E900 | 0006 |
| 0000071340 | EFB8 | E9FF | 007D | 068E | 31A0 | 8326 | 393E | 0068 |
| 0000071360 | 0375 | 09E9 | 8300 | DE7E | 74FE | E903 | 000F | 068E |
| 0000071400 | 31A2 | 8326 | A83E | 0068 | 0375 | 50E9 | C700 | E046 |
| 0000071420 | 0000 | 76FF | FFE4 | E276 | 468D | 16E0 | FF50 | F276 |
| 0000071440 | 76FF | FFFC | FA76 | 4E8D | 16E6 | 8D51 | F44E | 5116 |
| 0000071460 | 4E8D | 16DA | 1E51 | 2068 | 6805 | 0362 | 36FF | 0204 |
| 0000071500 | 36FF | 0202 | 36FF | 0208 | 36FF | 0206 | F19A | 0068 |
| 0000071520 | 8300 | 28C4 | 468B | E9E0 | 0009 | 06E9 | B800 | 0000 |
| 0000071540 | 00E9 | 1F00 | 5F5E | ED83 | 8B02 | 1FE5 | 4D5D | 1ECB |
| 0000071560 | 9058 | 5545 | EC8B | 8E1E | 81D8 | 32EC | 5700 | C756 |
| 0000071600 | FA46 | 0531 | 5E8C | C7FC | F246 | 0101 | C02B | 4689 |
| 0000071620 | 89E4 | E246 | 068E | 31A0 | 8326 | DE3E | 0069 | 0375 |
| 0000071640 | 1DE9 | FF00 | 0836 | FF02 | 0636 | 8D02 | D846 | 5016 |
| 0000071660 | F49A | 0069 | 8300 | 08C4 | 003D | 7400 | E903 | 000F |
| 0000071700 | 068E | 31A2 | 8326 | 0A3E | 006A | 0375 | 3BE9 | 1E00 |
| 0000071720 | 3568 | 8D05 | E646 | 5016 | 468D | 16D8 | 8D50 | F446 |
| 0000071740 | 5016 | 7068 | 1E03 | 6868 | FF05 | 0436 | FF02 | 0236 |
| 0000071760 | FF02 | 0836 | FF02 | 0636 | 9A02 | 6A3D | 0000 | C483 |
| 0000072000 | 891E | F446 | 5689 | E9F6 | 0008 | C02B | 4689 | 89F6 |
| 0000072020 | F446 | 468B | 990A | 5052 | 068E | 31A6 | FF26 | A636 |
| 0000072040 | 2630 | 36FF | 30A4 | 909A | 2DA1 | 896E | CE46 | 5689 |
| 0000072060 | C4D0 | 065E | 8B26 | 6C47 | 8B26 | 6E57 | 4689 | 89D2 |
| 0000072100 | D456 | 3E83 | 02C6 | 7400 | E903 | 00FA | 006A | 006A |
| 0000072120 | 006A | 006A | 006A | 006A | 036A | DD9A | 2DDF | 836F |
| 0000072140 | 0EC4 | 4689 | 83F8 | F87E | 7500 | E903 | 00D8 | 068E |
| 0000072160 | 31A0 | 8326 | A03E | 006E | 0375 | 4CE9 | 8300 | DC7E |
| 0000072200 | 75FE | E903 | 0043 | 76FF | FFF8 | CA36 | FF02 | C836 |
| 0000072220 | 8D02 | E646 | 5016 | 468D | 16F4 | 8D50 | D846 | 5016 |
| 0000072240 | 681E | 0568 | 7D68 | FF03 | 0436 | FF02 | 0236 | FF02 |
| 0000072260 | 0836 | FF02 | 0636 | 1E02 | 3968 | 6805 | 6F8B | 8E68 |
| 0000072300 | 9A6F | 6F91 | 0000 | C483 | 8E28 | A006 | 2631 | 3E83 |
| 0000072320 | 6F44 | 7500 | E903 | 0009 | 7E83 | FEDC | 0374 | 0FE9 |
| 0000072340 | 8E00 | A206 | 2631 | 3E83 | 6FB7 | 7500 | E903 | 0050 |
| 0000072360 | 46C7 | EFDE | FFFF | E476 | 76FF | 8DE2 | DE46 | 5016 |
| 0000072400 | 76FF | FFF2 | FC76 | 76FF | 8DFA | E64E | 5116 | 4E8D |
| 0000072420 | 16F4 | 8D51 | D84E | 5116 | 681E | 0568 | 7E68 | FF03 |
| 0000072440 | 0436 | FF02 | 0236 | FF02 | 0836 | FF02 | 0636 | 9A02 |
| 0000072460 | 6FFF | 0000 | C483 | 8B28 | DE46 | BBE9 | E902 | 0006 |
| 0000072500 | EFB8 | E9FF | 02B2 | 46C7 | 04E0 | 6A00 | 6A00 | 6A00 |
| 0000072520 | 6A00 | 8D02 | E046 | 5016 | 476A | DD9A | 41DF | 8370 |
| 0000072540 | 0EC4 | 4689 | 3DF8 | 0000 | 0375 | D8E9 | 8E00 | A006 |
| 0000072560 | 2631 | 3E83 | 6F9F | 7500 | E903 | 004C | 7E83 | FEDC |
| 0000072600 | 0375 | 43E9 | FF00 | F876 | 36FF | 02CA | 36FF | 02C8 |
| 0000072620 | 468D | 16E6 | 8D50 | F446 | 5016 | 468D | 16D8 | 1E50 |
| 0000072640 | 6868 | 6805 | 0386 | 36FF | 0204 | 36FF | 0202 | 36FF |
| 0000072660 | 0208 | 36FF | 0206 | 681E | 0541 | 2C68 | 686B | 6B2F |
| 0000072700 | 329A | 006B | 8300 | 28C4 | 068E | 31A0 | 8326 | 6B3E |
| 0000072720 | 006D | 0375 | 09E9 | 8300 | DC7E | 74FE | E903 | 000F |
| 0000072740 | 068E | 31A2 | 8326 | 973E | 006D | 0375 | 50E9 | C700 |
| 0000072760 | DE46 | FFEF | 76FF | FFE4 | E276 | 468D | 16DE | FF50 |

THU MAR 14 17:25:16 1991 CRV_IPS.DLL PAGE 33, LINE 1889

| | | | | | | | | |
|---|---|---|---|---|---|---|---|---|
| 0000073000 | F276 | 76FF | FFFC | FA76 | 4E8D | 16E6 | 8D51 | F44E |
| 0000073020 | 5116 | 4E8D | 16D8 | 1E51 | 6868 | 6805 | 0387 | 36FF |
| 0000073040 | 0204 | 36FF | 0202 | 36FF | 0208 | 36FF | 0206 | A09A |
| 0000073060 | 006B | 8300 | 28C4 | 468B | E9DE | 01BC | 06E9 | B800 |
| 0000073100 | FFEF | B3E9 | 8301 | D47E | 7600 | E903 | 0009 | 7E83 |
| 0000073120 | FFD2 | 0377 | 25E9 | FF00 | 0E76 | 76FF | FF0C | D076 |
| 0000073140 | 76FF | C4CE | 065E | FF26 | 7277 | FF26 | 7077 | 959A |
| 0000073160 | 66D5 | 8370 | 0CC4 | 4689 | E9F8 | 0022 | 76FF | FF0E |
| 0000073200 | 0C76 | 76FF | FFD0 | CE76 | 5EC4 | 2606 | 77FF | 2672 |
| 0000073220 | 77FF | 9A70 | D001 | 6A84 | C483 | 890C | F846 | 7E83 |
| 0000073240 | 00F8 | 0375 | D4E9 | 8E00 | A006 | 2631 | 3E83 | 70D5 |
| 0000073260 | 7500 | E903 | 0048 | 7E83 | FEDC | 0375 | 3FE9 | FF00 |
| 0000073300 | F876 | 681E | 0549 | 468D | 16E6 | 8D50 | F446 | 5016 |
| 0000073320 | 468D | 16D8 | 1E50 | 6868 | 6805 | 039B | 36FF | 0204 |
| 0000073340 | 36FF | 0202 | 36FF | 0208 | 36FF | 0206 | 681E | 0560 |
| 0000073360 | 8C68 | 686E | 6E8F | 929A | 006E | 8300 | 28C4 | 068E |
| 0000073400 | 31A0 | 8326 | 523E | 0071 | 0375 | 09E9 | 8300 | DC7E |
| 0000073420 | 74FE | E903 | 000F | 068E | 31A2 | 8326 | 6A3E | 0071 |
| 0000073440 | 0375 | 50E9 | C700 | DE46 | FFEF | 76FF | FFE4 | E276 |
| 0000073460 | 468D | 16DE | FF50 | F276 | 76FF | FFFC | FA76 | 4E8D |
| 0000073500 | 16E6 | 8D51 | F44E | 5116 | 4E8D | 16D8 | 1E51 | 6868 |
| 0000073520 | 6805 | 039C | 36FF | 0204 | 36FF | 0202 | 36FF | 0208 |
| 0000073540 | 36FF | 0206 | B29A | 0071 | 8300 | 28C4 | 468B | E9DE |
| 0000073560 | 0086 | 06E9 | B800 | FFEF | 7DE9 | 8E00 | A006 | 2631 |
| 0000073600 | 3E83 | 6E45 | 7500 | E903 | 0009 | 7E83 | FEDC | 0374 |
| 0000073620 | 0FE9 | 8E00 | A206 | 2631 | 3E83 | 6EB8 | 7500 | E903 |
| 0000073640 | 0050 | 46C7 | 00DE | FF00 | E476 | 76FF | 8DE2 | DE46 |
| 0000073660 | 5016 | 76FF | FFF2 | FC76 | 76FF | 8DFA | E64E | 5116 |
| 0000073700 | 4E8D | 16F4 | 8D51 | D84E | 5116 | 681E | 0568 | 9E68 |
| 0000073720 | FF03 | 0436 | FF02 | 0236 | FF02 | 0836 | FF02 | 0636 |
| 0000073740 | 9A02 | 6F00 | 0000 | C483 | 8B28 | DE46 | 09E9 | E900 |
| 0000073760 | 0006 | 00B8 | E900 | 0000 | 5F5E | ED83 | 8B02 | 1FE5 |
| 0000074000 | 4D5D | 1ECB | 9058 | 5545 | EC8B | 8E1E | 81D8 | 26EC |
| 0000074020 | 5700 | C756 | FA46 | 0579 | 5E8C | C7FC | F246 | 0101 |
| 0000074040 | C02B | 4689 | 89E4 | E246 | 068E | 31A0 | 8326 | 043E |
| 0000074060 | 0073 | 0375 | 1DE9 | FF00 | 0836 | FF02 | 0636 | 8D02 |
| 0000074100 | DA46 | 5016 | 819A | 006D | 8300 | 08C4 | 003D | 7400 |
| 0000074120 | E903 | 000F | 068E | 31A2 | 8326 | 733E | 0073 | 0375 |
| 0000074140 | 3BE9 | 1E00 | 7D68 | 8D05 | E646 | 5016 | 468D | 16DA |
| 0000074160 | 8D50 | F446 | 5016 | AE68 | 1E03 | A068 | FF05 | 0436 |
| 0000074200 | FF02 | 0236 | FF02 | 0836 | FF02 | 0636 | 9A02 | 6DCA |
| 0000074220 | 0000 | C483 | 891E | F446 | 5689 | E9F6 | 0008 | C02B |
| 0000074240 | 4689 | 89F6 | F446 | 7E83 | 000C | 037D | 43E9 | 7E00 |
| 0000074260 | E903 | 0009 | 7E83 | FF0A | 0377 | 35E9 | FF00 | 1276 |
| 0000074300 | 76FF | 8B10 | 0E46 | 5299 | 8E50 | A606 | 2631 | 36FF |
| 0000074320 | 30A6 | FF26 | A436 | 9A30 | A190 | 72B7 | 5052 | 76FF |
| 0000074340 | FF08 | 0676 | 959A | DFD5 | 8372 | 0CC4 | 4689 | E9F8 |
| 0000074360 | 0032 | 76FF | FF12 | 1076 | 468B | 990E | 5052 | 068E |
| 0000074400 | 31A6 | FF26 | A636 | 2630 | 36FF | 30A4 | 909A | ECA1 |
| 0000074420 | 5272 | FF50 | 0876 | 76FF | 9A06 | D001 | 6DF9 | C483 |
| 0000074440 | 890C | F846 | 7E83 | 00F8 | 0375 | D4E9 | 8E00 | A006 |
| 0000074460 | 2631 | 3E83 | 735B | 7500 | E903 | 0048 | 7E83 | FEDE |
| 0000074500 | 0375 | 3FE9 | FF00 | F876 | 681E | 0581 | 468D | 16E6 |
| 0000074520 | 8D50 | F446 | 5016 | 468D | 16DA | 1E50 | A068 | 6805 |
| 0000074540 | 03BA | 36FF | 0204 | 36FF | 0202 | 36FF | 0208 | 36FF |
| 0000074560 | 0206 | 681E | 0598 | C168 | 6870 | 70C4 | C79A | 0070 |
| 0000074600 | 8300 | 28C4 | 068E | 31A0 | 8326 | D83E | 0073 | 0375 |
| 0000074620 | 09E9 | 8300 | DE7E | 74FE | E903 | 000F | 068E | 31A2 |
| 0000074640 | 8326 | F03E | 0073 | 0375 | 50E9 | C700 | E046 | FFEF |

THU MAR 14 17:25:16 1991 CRV_IPS.DLL PAGE 34, LINE 1948

| | | | | | | | | |
|---|---|---|---|---|---|---|---|---|
| 0000074660 | 76FF | FFE4 | E276 | 468D | 16E0 | FF50 | F276 | 76FF |
| 0000074700 | FFFC | FA76 | 4E8D | 16E6 | 8D51 | F44E | 5116 | 4E8D |
| 0000074720 | 16DA | 1E51 | A068 | 6805 | 03BB | 36FF | 0204 | 36FF |
| 0000074740 | 0202 | 36FF | 0208 | 36FF | 0206 | 389A | 0074 | 8300 |
| 0000074760 | 28C4 | 468B | E9E0 | 0086 | 06E9 | B800 | FFEF | 7DE9 |
| 0000075000 | 8E00 | A006 | 2631 | 3E83 | 707E | 7500 | E903 | 0009 |
| 0000075020 | 7E83 | FEDE | 0374 | 0FE9 | 8E00 | A206 | 2631 | 3E83 |
| 0000075040 | 70ED | 7500 | E903 | 0050 | 46C7 | 00E0 | FF00 | E476 |
| 0000075060 | 76FF | 8DE2 | E046 | 5016 | 76FF | FFF2 | FC76 | 76FF |
| 0000075100 | 8DFA | E64E | 5116 | 4E8D | 16F4 | 8D51 | DA4E | 5116 |
| 0000075120 | 681E | 05A0 | BD68 | FF03 | 0436 | FF02 | 0236 | FF02 |
| 0000075140 | 0836 | FF02 | 0636 | 9A02 | 7135 | 0000 | C483 | 8B28 |
| 0000075160 | E046 | 09E9 | E900 | 0006 | 00B8 | E900 | 0000 | 5F5E |
| 0000075200 | ED83 | 8B02 | 1FE5 | 4D5D | 1ECB | 9058 | 5545 | EC8B |
| 0000075220 | 8E1E | 81D8 | 28EC | 5700 | C756 | F846 | 05B0 | 5E8C |
| 0000075240 | C7FA | F046 | 0101 | C02B | 4689 | 89E2 | E046 | 068E |
| 0000075260 | 31A0 | 8326 | 2B3E | 0075 | 0375 | 1DE9 | FF00 | 0836 |
| 0000075300 | FF02 | 0636 | 8D02 | D846 | 5016 | 159A | 0072 | 8300 |
| 0000075320 | 08C4 | 003D | 7400 | E903 | 000F | 068E | 31A2 | 8326 |
| 0000075340 | 9E3E | 0075 | 0375 | 3BE9 | 1E00 | B468 | 8D05 | E446 |
| 0000075360 | 5016 | 468D | 16D8 | 8D50 | F246 | 5016 | CE68 | 1E03 |
| 0000075400 | E868 | FF05 | 0436 | FF02 | 0236 | FF02 | 0836 | FF02 |
| 0000075420 | 0636 | 9A02 | 725E | 0000 | C483 | 891E | F246 | 5689 |
| 0000075440 | E9F4 | 0008 | C02B | 4689 | 89F4 | F246 | 46C7 | 04FC |
| 0000075460 | 6A00 | 6A00 | 6A00 | 6A00 | 8D02 | FC46 | 5016 | 4C6A |
| 0000075500 | DD9A | 39DF | 8376 | 0EC4 | 4689 | 83F6 | F67E | 7500 |
| 0000075520 | E903 | 00D8 | 068E | 31A0 | 8326 | 863E | 0075 | 0375 |
| 0000075540 | 4CE9 | 8300 | DC7E | 75FE | E903 | 0043 | 76FF | FFF6 |
| 0000075560 | CA36 | FF02 | C836 | 8D02 | E446 | 5016 | 468D | 16F2 |
| 0000075600 | 8D50 | D846 | 5016 | 681E | 05E8 | DD68 | FF03 | 0436 |
| 0000075620 | FF02 | 0236 | FF02 | 0836 | FF02 | 0636 | 1E02 | B868 |
| 0000075640 | 6805 | 76C5 | C868 | 9A76 | 76CB | 0000 | C483 | 8E28 |
| 0000075660 | A006 | 2631 | 3E83 | 7682 | 7500 | E903 | 0009 | 7E83 |
| 0000075700 | FEDC | 0374 | 0FE9 | 8E00 | A206 | 2631 | 3E83 | 76F1 |
| 0000075720 | 7500 | E903 | 0050 | 46C7 | EFDE | FFFF | E276 | 76FF |
| 0000075740 | 8DE0 | DE46 | 5016 | 76FF | FFF0 | FA76 | 76FF | 8DF8 |
| 0000075760 | E44E | 5116 | 4E8D | 16F2 | 8D51 | D84E | 5116 | 681E |
| 0000076000 | 05E8 | DE68 | FF03 | 0436 | FF02 | 0236 | FF02 | 0836 |
| 0000076020 | FF02 | 0636 | 9A02 | 7739 | 0000 | C483 | 8B28 | DE46 |
| 0000076040 | D4E9 | E902 | 0006 | EFB8 | E9FF | 02CB | 7E83 | 000C |
| 0000076060 | 037D | 3FE9 | 7E00 | E903 | 0009 | 7E83 | FF0A | 0377 |
| 0000076100 | 31E9 | FF00 | 1276 | 76FF | 8E10 | A606 | 2631 | A4A1 |
| 0000076120 | 2630 | 168B | 30A6 | E0D1 | D2D1 | E0D1 | D2D1 | 5052 |
| 0000076140 | 76FF | FF08 | 0676 | 959A | 6AD5 | 8376 | 0CC4 | 4689 |
| 0000076160 | E9F6 | 002E | 76FF | FF12 | 1076 | 068E | 31A6 | A126 |
| 0000076200 | 30A4 | 8B26 | A616 | D130 | D1E0 | D1D2 | D1E0 | 52D2 |
| 0000076220 | FF50 | 0876 | 76FF | 9A06 | D001 | 7761 | C483 | 890C |
| 0000076240 | F646 | 7E83 | 00F6 | 0375 | D4E9 | 8E00 | A006 | 2631 |
| 0000076260 | 3E83 | 76D9 | 7500 | E903 | 0048 | 7E83 | FEDC | 0375 |
| 0000076300 | 3FE9 | FF00 | F676 | 681E | 05C0 | 468D | 16E4 | 8D50 |
| 0000076320 | F246 | 5016 | 468D | 16D8 | 1E50 | E868 | 6805 | 03E9 |
| 0000076340 | 36FF | 0204 | 36FF | 0202 | 36FF | 0208 | 36FF | 0206 |
| 0000076360 | 681E | 05D7 | C068 | 6877 | 77C3 | C69A | 0077 | 8300 |
| 0000076400 | 28C4 | 068E | 31A0 | 8326 | 793E | 0077 | 0375 | 09E9 |
| 0000076420 | 8300 | DC7E | 74FE | E903 | 000F | 068E | 31A2 | 8326 |
| 0000076440 | EC3E | 0077 | 0375 | 50E9 | C700 | DE46 | FFEF | 76FF |
| 0000076460 | FFE2 | E076 | 468D | 16DE | FF50 | F076 | 76FF | FFFA |
| 0000076500 | F876 | 4E8D | 16E4 | 8D51 | F24E | 5116 | 4E8D | 16D8 |
| 0000076520 | 1E51 | E868 | 6805 | 03EA | 36FF | 0204 | 36FF | 0202 |

THU MAR 14 17:25:16 1991 CRV_IPS.DLL PAGE 35, LINE 2007

| | | | | | | | | |
|---|---|---|---|---|---|---|---|---|
| 0000076540 | 36FF | 0208 | 36FF | 0206 | BB9A | 0073 | 8300 | 28C4 |
| 0000076560 | 468B | E9DE | 0181 | 06E9 | B800 | FFEF | 78E9 | 6A01 |
| 0000076600 | 6A00 | 6A00 | 6A00 | 8D02 | 0E46 | 5016 | 4D6A | DD9A |
| 0000076620 | AADF | 8372 | 0EC4 | 4689 | 83F6 | F67E | 7500 | E903 |
| 0000076640 | 00D8 | 068E | 31A0 | 8326 | D43E | 0077 | 0375 | 4CE9 |
| 0000076660 | 8300 | DC7E | 75FE | E903 | 0043 | 76FF | FFF6 | CA36 |
| 0000076700 | FF02 | C836 | 8D02 | E446 | 5016 | 468D | 16F2 | 8D50 |
| 0000076720 | D846 | 5016 | 681E | 05E8 | F168 | FF03 | 0436 | FF02 |
| 0000076740 | 0236 | FF02 | 0836 | FF02 | 0636 | 1E02 | DF68 | 6805 |
| 0000076760 | 7347 | 4A68 | 9A73 | 734D | 0000 | C483 | 8E28 | A006 |
| 0000077000 | 2631 | 3E83 | 71FF | 7500 | E903 | 0009 | 7E83 | FEDC |
| 0000077020 | 0374 | 0FE9 | 8E00 | A206 | 2631 | 3E83 | 722B | 7500 |
| 0000077040 | E903 | 0050 | 46C7 | EFDE | FFFF | E276 | 76FF | 8DE0 |
| 0000077060 | DE46 | 5016 | 76FF | FFF0 | FA76 | 76FF | 8DF8 | E44E |
| 0000077100 | 5116 | 4E8D | 16F2 | 8D51 | D84E | 5116 | 681E | 05E8 |
| 0000077120 | F268 | FF03 | 0436 | FF02 | 0236 | FF02 | 0836 | FF02 |
| 0000077140 | 0636 | 9A02 | 78B1 | 0000 | C483 | 8B28 | DE46 | 86E9 |
| 0000077160 | E900 | 0006 | EFB8 | E9FF | 007D | 068E | 31A0 | 8326 |
| 0000077200 | 853E | 0074 | 0375 | 09E9 | 8300 | DC7E | 74FE | E903 |
| 0000077220 | 000F | 068E | 31A2 | 8326 | B13E | 0074 | 0375 | 50E9 |
| 0000077240 | C700 | DE46 | 0000 | 76FF | FFE2 | E076 | 468D | 16DE |
| 0000077260 | FF50 | F076 | 76FF | FFFA | F876 | 4E8D | 16E4 | 8D51 |
| 0000077300 | F24E | 5116 | 4E8D | 16D8 | 1E51 | E868 | 6805 | 03F5 |
| 0000077320 | 36FF | 0204 | 36FF | 0202 | 36FF | 0208 | 36FF | 0206 |
| 0000077340 | E69A | 0075 | 8300 | 28C4 | 468B | E9DE | 0009 | 06E9 |
| 0000077360 | B800 | 0000 | 00E9 | 5E00 | 835F | 02ED | E58B | 5D1F |
| 0000077400 | CB4D | 581E | 4590 | 8B55 | 1EEC | D88E | EC81 | 0028 |
| 0000077420 | 5657 | B81E | 69BE | D88E | 46C7 | F7FA | 8C05 | FC5E |
| 0000077440 | 46C7 | 01F2 | 2B01 | 89C0 | E246 | 4689 | 8EE0 | A006 |
| 0000077460 | 2631 | 3E83 | 79C8 | 7500 | E903 | 001D | 36FF | 0208 |
| 0000077500 | 36FF | 0206 | 468D | 16D8 | 9A50 | 749B | 0000 | C483 |
| 0000077520 | 3D08 | 0000 | 0374 | 0FE9 | 8E00 | A206 | 2631 | 3E83 |
| 0000077540 | 7A37 | 7500 | E903 | 003B | 681E | 05FB | 468D | 16E4 |
| 0000077560 | 8D50 | D846 | 5016 | 468D | 16F6 | 6850 | 040A | 681E |
| 0000077600 | 0678 | 36FF | 0204 | 36FF | 0202 | 36FF | 0208 | 36FF |
| 0000077620 | 0206 | E49A | 0074 | 8300 | 1EC4 | 4689 | 89F6 | F856 |
| 0000077640 | 08E9 | 2B00 | 89C0 | F846 | 4689 | 8EF6 | A406 | 2631 |
| 0000077660 | 36FF | 0F1E | FF26 | 1C36 | 8B0F | 0646 | 568B | 0508 |
| 0000077700 | 0024 | 5052 | 786A | 006A | 006A | 026A | 006A | 006A |
| 0000077720 | 681E | 360C | 36FF | 021A | 36FF | 0218 | 681E | 3498 |
| 0000077740 | CC9A | 007A | 8900 | F446 | 7E83 | 00F4 | 0375 | D5E9 |
| 0000077760 | 8E00 | A006 | 2631 | 3E83 | 7A1F | 7500 | E903 | 0048 |
| 0000100000 | 7E83 | FEDC | 0375 | 3FE9 | FF00 | F476 | 681E | 05FF |
| 0000100020 | 468D | 16E4 | 8D50 | F646 | 5016 | 468D | 16D8 | 1E50 |
| 0000100040 | 7868 | 6806 | 0415 | 36FF | 0204 | 36FF | 0202 | 36FF |
| 0000100060 | 0208 | 36FF | 0206 | 681E | 0616 | 4168 | 687B | 7B44 |
| 0000100100 | 479A | 007B | 8300 | 28C4 | 068E | 31A0 | 8326 | FE3E |
| 0000100120 | 007A | 0375 | 09E9 | 8300 | DC7E | 74FE | E903 | 000F |
| 0000100140 | 068E | 31A2 | 8326 | 6D3E | 007B | 0375 | 51E9 | 8B00 |
| 0000100160 | F446 | 4689 | FFDE | E276 | 76FF | 8DE0 | DE46 | 5016 |
| 0000100200 | 76FF | FFF2 | FC76 | 76FF | 8DFA | E44E | 5116 | 4E8D |
| 0000100220 | 16F6 | 8D51 | D84E | 5116 | 681E | 0678 | 1668 | FF04 |
| 0000100240 | 0436 | FF02 | 0236 | FF02 | 0836 | FF02 | 0636 | 9A02 |
| 0000100260 | 7BB6 | 0000 | C483 | 8B28 | DE46 | 7AE9 | E905 | 0006 |
| 0000100300 | 468B | E9F4 | 0571 | 068E | 31A4 | FF26 | 2236 | 260F |
| 0000100320 | 36FF | 0F20 | 468B | 8B06 | 0856 | 4405 | 5200 | 6A50 |
| 0000100340 | 6A78 | 6A00 | 6A00 | 6A00 | 6A00 | 1E00 | 9668 | FF34 |
| 0000100360 | 1E36 | FF02 | 1C36 | 1E02 | 5068 | 9A35 | FFFF | 0000 |
| 0000100400 | 4689 | 83F4 | F47E | 7500 | E903 | 00F0 | 068E | 31A4 |

THU MAR 14 17:25:16 1991 CRV_IPS.DLL PAGE 36, LINE 2066

| | | | | | | | | |
|---|---|---|---|---|---|---|---|---|
| 0000100420 | FF26 | 1E36 | 260F | 36FF | 0F1C | 36FF | 360C | 681E |
| 0000100440 | 3498 | 3B9A | 007C | 8E00 | A006 | 2631 | 3E83 | 7B55 |
| 0000100460 | 7500 | E903 | 0048 | 7E83 | FEDC | 0375 | 3FE9 | FF00 |
| 0000100500 | F476 | 681E | 061E | 468D | 16E4 | 8D50 | F646 | 5016 |
| 0000100520 | 468D | 16D8 | 1E50 | 7868 | 6806 | 0423 | 36FF | 0204 |
| 0000100540 | 36FF | 0202 | 36FF | 0208 | 36FF | 0206 | 681E | 0635 |
| 0000100560 | 7268 | 6875 | 7575 | 789A | 0075 | 8300 | 28C4 | 068E |
| 0000100600 | 31A0 | 8326 | 613E | 007C | 0375 | 09E9 | 8300 | DC7E |
| 0000100620 | 74FE | E903 | 000F | 068E | 31A2 | 8326 | 793E | 007C |
| 0000100640 | 0375 | 51E9 | 8B00 | F446 | 4689 | FFDE | E276 | 76FF |
| 0000100660 | 8DE0 | DE46 | 5016 | 76FF | FFF2 | FC76 | 76FF | 8DFA |
| 0000100700 | E44E | 5116 | 468D | 16F6 | 8D51 | D84E | 5116 | 681E |
| 0000100720 | 0678 | 2468 | FF04 | 0436 | FF02 | 0236 | FF02 | 0836 |
| 0000100740 | FF02 | 0636 | 9A02 | 7834 | 0000 | C483 | 8B28 | DE46 |
| 0000100760 | 44E9 | E904 | 0006 | 468B | E9F4 | 043B | 1EC4 | 0218 |
| 0000101000 | 8B26 | 5C47 | 0AB9 | 9900 | F9F7 | FA83 | 7500 | E903 |
| 0000101020 | 0100 | 1EC4 | 0218 | 8B26 | 5C47 | F799 | 99F9 | F9F7 |
| 0000101040 | FA83 | 7400 | E903 | 00EA | 1EC4 | 0218 | 8B26 | 5C47 |
| 0000101060 | 64BB | 9900 | FBF7 | F799 | 83F9 | 00FA | 0374 | D1E9 |
| 0000101100 | C400 | 1C1E | 2602 | 478B | 995C | F9F7 | FA83 | 7400 |
| 0000101120 | E903 | 00B3 | 068E | 31A4 | FF26 | 1E36 | 260F | 36FF |
| 0000101140 | 0F1C | 36FF | 360C | 681E | 3498 | 569A | 007C | 8E00 |
| 0000101160 | A406 | 2631 | 36FF | 0F22 | FF26 | 2036 | FF0F | 9636 |
| 0000101200 | 1E34 | 5068 | 9A35 | FFFF | 0000 | 068E | 31A0 | 8326 |
| 0000101220 | 513E | 0078 | 0375 | 09E9 | 8300 | DC7E | 74FE | E903 |
| 0000101240 | 000F | 068E | 31A2 | 8326 | 693E | 0078 | 0375 | 50E9 |
| 0000101260 | C700 | DE46 | FFFF | 76FF | FFE2 | E076 | 468D | 16DE |
| 0000101300 | FF50 | F276 | 76FF | FFFC | FA76 | 4E8D | 16E4 | 8D51 |
| 0000101320 | F64E | 5116 | 4E8D | 16D8 | 1E51 | 7868 | 6806 | 0431 |
| 0000101340 | 36FF | 0204 | 36FF | 0202 | 36FF | 0208 | 36FF | 0206 |
| 0000101360 | 809A | 007A | 8300 | 28C4 | 468B | E9DE | 0339 | 06E9 |
| 0000101400 | B800 | FFFF | 30E9 | 9A03 | 8015 | 7E06 | 4689 | E9F4 |
| 0000101420 | 0129 | 1EC4 | 0218 | 8B26 | 5C47 | 64B9 | 9900 | F9F7 |
| 0000101440 | 0ABA | 8B00 | 99DA | FBF7 | FA83 | 7500 | E903 | 010B |
| 0000101460 | 36C4 | 0218 | 8B26 | 5C44 | F799 | 83FB | 00FA | 0374 |
| 0000101500 | F8E9 | C400 | 1836 | 2602 | 448B | 995C | FBF7 | F799 |
| 0000101520 | 83FB | 00FA | 0374 | E2E9 | C400 | 1C1E | 2602 | 478B |
| 0000101540 | 995C | F9F7 | 1EC4 | 0218 | D08B | 8B26 | 5C47 | DA8B |
| 0000101560 | F799 | 2BF9 | 6BC3 | 64C0 | 003D | 7500 | E903 | 00B3 |
| 0000101600 | 068E | 31A4 | FF26 | 1E36 | 260F | 36FF | 0F1C | 36FF |
| 0000101620 | 360C | 681E | 3498 | 829A | 007D | 8E00 | A406 | 2631 |
| 0000101640 | 36FF | 0F22 | FF26 | 2036 | FF0F | 9636 | 1E34 | 5068 |
| 0000101660 | 9A35 | 7AF3 | 0000 | 068E | 31A0 | 8326 | 1B3E | 007E |
| 0000101700 | 0375 | 09E9 | 8300 | DC7E | 74FE | E903 | 000F | 068E |
| 0000101720 | 31A2 | 8326 | 8A3E | 007E | 0375 | 50E9 | C700 | DE46 |
| 0000101740 | FFFF | 76FF | FFE2 | E076 | 468D | 16DE | FF50 | F276 |
| 0000101760 | 76FF | FFFC | FA76 | 4E8D | 16E4 | 8D51 | F64E | 5116 |
| 0000102000 | 4E8D | 16D8 | 1E51 | 7868 | 6806 | 0440 | 36FF | 0204 |
| 0000102020 | 36FF | 0202 | 36FF | 0208 | 36FF | 0206 | D39A | 007E |
| 0000102040 | 8300 | 28C4 | 468B | E9DE | 020D | 06E9 | B800 | FFFF |
| 0000102060 | 04E9 | 9A02 | 877F | 6AD4 | 4689 | 83F4 | F47E | 7500 |
| 0000102100 | E903 | 00D5 | 068E | 31A0 | 8326 | 723E | 007E | 0375 |
| 0000102120 | 48E9 | 8300 | DC7E | 75FE | E903 | 003F | 76FF | 1EF4 |
| 0000102140 | 3D68 | 8D06 | E446 | 5016 | 468D | 16F6 | 8D50 | D846 |
| 0000102160 | 5016 | 681E | 0678 | 4768 | FF04 | 0436 | FF02 | 0236 |
| 0000102200 | FF02 | 0836 | FF02 | 0636 | 1E02 | 5268 | 6806 | 7F7C |
| 0000102220 | 7F68 | 9A7F | 7F82 | 0000 | C483 | 8E28 | A006 | 2631 |
| 0000102240 | 3E83 | 7F39 | 7500 | E903 | 0009 | 7E83 | FEDC | 0374 |
| 0000102260 | 0FE9 | 8E00 | A206 | 2631 | 3E83 | 7FA8 | 7500 | E903 |

THU MAR 14 17:25:16 1991 CRV_IPS.DLL PAGE 37, LINE 2125

| | | | | | | | | |
|---|---|---|---|---|---|---|---|---|
| 0000102300 | 0051 | 468B | 89F4 | DE46 | 76FF | FFE2 | E076 | 468D |
| 0000102320 | 16DE | FF50 | F276 | 76FF | FFFC | FA76 | 4E8D | 16E4 |
| 0000102340 | 8D51 | F64E | 5116 | 4E8D | 16D8 | 1E51 | 7868 | 6806 |
| 0000102360 | 0448 | 36FF | 0204 | 36FF | 0202 | 36FF | 0208 | 36FF |
| 0000102400 | 0206 | F19A | 007F | 8300 | 28C4 | 468B | E9DE | 0127 |
| 0000102420 | 06E9 | 8B00 | F446 | 1EE9 | 8E01 | A406 | 2631 | 36FF |
| 0000102440 | 0F1E | FF26 | 1C36 | FF0F | 0C36 | 6A36 | 1E01 | 9868 |
| 0000102460 | 9A34 | 7F22 | 0000 | 4689 | 8EF4 | A406 | 2631 | 36FF |
| 0000102500 | 0F22 | FF26 | 2036 | FF0F | 9636 | 6A34 | 1E00 | 5068 |
| 0000102520 | 9A35 | FFFF | 0000 | 4689 | 83F0 | F47E | 7500 | E903 |
| 0000102540 | 0057 | 068E | 31A0 | 8326 | 903E | 007F | 0375 | 48E9 |
| 0000102560 | 8300 | DC7E | 75FE | E903 | 003F | 76FF | 1EF4 | 5A62 |
| 0000102600 | 8D06 | E446 | 5016 | 468D | 16F6 | 8D50 | D846 | 5016 |
| 0000102620 | 681E | 0678 | 5268 | FF04 | 0436 | FF02 | 0236 | FF02 |
| 0000102640 | 0836 | FF02 | 0636 | 1E02 | 6F68 | 6806 | 7A0B | 0E68 |
| 0000102660 | 9A7A | 7A11 | 0000 | C483 | 8E28 | A006 | 2631 | 3E83 |
| 0000102700 | 7904 | 7500 | E903 | 0009 | 7E83 | FEDC | 0374 | 0FE9 |
| 0000102720 | 8E00 | A206 | 2631 | 3E83 | 7930 | 7500 | E903 | 0051 |
| 0000102740 | 468B | 89F4 | DE46 | 76FF | FFE2 | E076 | 468D | 16DE |
| 0000102760 | FF50 | F276 | 76FF | FFFC | FA76 | 4E8D | 16E4 | 8D51 |
| 0000103000 | F64E | 5116 | 4E8D | 16D8 | 1E51 | 7868 | 6806 | 0454 |
| 0000103020 | 36FF | 0204 | 36FF | 0202 | 36FF | 0208 | 36FF | 0206 |
| 0000103040 | C19A | 007C | 8300 | 28C4 | 468B | E9DE | 0009 | 06E9 |
| 0000103060 | 8B00 | F446 | 00E9 | 1F00 | 5F5E | ED83 | 8B02 | 1FE5 |
| 0000103100 | 4D5D | 04CA | 1E00 | 9058 | 5545 | EC8B | 8E1E | 81D8 |
| 0000103120 | 40EC | 5700 | 0756 | F846 | 068A | 5E8C | C7FA | E446 |
| 0000103140 | 0101 | C02B | 4689 | 89D0 | CE46 | 068E | 31A0 | 8326 |
| 0000103160 | 843E | 0081 | 0375 | 1DE9 | FF00 | 0836 | FF02 | 0636 |
| 0000103200 | 8D02 | C446 | 5016 | 1A9A | 0079 | 8300 | 08C4 | 003D |
| 0000103220 | 7400 | E903 | 000F | 068E | 31A2 | 8326 | F33E | 0081 |
| 0000103240 | 0375 | 3BE9 | 1E00 | 8E68 | 8D06 | D246 | 5016 | 468D |
| 0000103260 | 16C4 | 8D50 | F046 | 5016 | 6068 | 1E04 | 4C68 | FF07 |
| 0000103300 | 0436 | FF02 | 0236 | FF02 | 0836 | FF02 | 0636 | 9A02 |
| 0000103320 | 7963 | 0000 | C483 | 891E | F046 | 5689 | E9F2 | 0008 |
| 0000103340 | C02B | 4689 | 89F2 | F046 | 068E | 31A4 | A126 | 0F2C |
| 0000103360 | 2B48 | 26D2 | 36F7 | 0F2E | 8940 | FC46 | 46C7 | 00CC |
| 0000103400 | E900 | 0003 | 46FF | 8BCC | CC46 | 4639 | 77FC | E903 |
| 0000103420 | 05C1 | 068E | 31A4 | FF26 | 1E36 | 260F | 36FF | 0F1C |
| 0000103440 | 36FF | 360C | 76FF | FFCC | 9A36 | FF34 | 9836 | 9A34 |
| 0000103460 | 8125 | 0000 | 4689 | 8EE6 | A406 | 2631 | 36FF | 0F22 |
| 0000103500 | FF26 | 2036 | FF0F | 9636 | FF34 | CC76 | 36FF | 3552 |
| 0000103520 | 36FF | 3550 | FF9A | 00FF | 8900 | DE46 | 7E83 | 00E6 |
| 0000103540 | 0374 | 09E9 | 8300 | DE7E | 7500 | E903 | 01F2 | 068E |
| 0000103560 | 31A4 | FF26 | 1E36 | 260F | 36FF | 0F1C | 36FF | 360C |
| 0000103600 | 681E | 3498 | 709A | 0081 | 8E00 | A406 | 2631 | 36FF |
| 0000103620 | 0F22 | FF26 | 2036 | FF0F | 9636 | 1E34 | 5068 | 9A35 |
| 0000103640 | 7D67 | 0000 | 7E83 | 00E6 | 0375 | D5E9 | 8E00 | A006 |
| 0000103660 | 2631 | 3E83 | 81DB | 7500 | E903 | 0048 | 7E83 | FEC8 |
| 0000103700 | 0375 | 3FE9 | FF00 | E676 | 681E | 0692 | 468D | 16D2 |
| 0000103720 | 8D50 | F046 | 5016 | 468D | 16C4 | 1E50 | 4C68 | 6807 |
| 0000103740 | 047C | 36FF | 0204 | 36FF | 0202 | 36FF | 0208 | 36FF |
| 0000103760 | 0206 | 681E | 06A9 | A568 | 6882 | 82A8 | AB9A | 0082 |
| 0000104000 | 8300 | 28C4 | 068E | 31A0 | 8326 | 623E | 0082 | 0375 |
| 0000104020 | 09E9 | 8300 | C87E | 74FE | E903 | 000F | 068E | 31A2 |
| 0000104040 | 8326 | D13E | 0082 | 0375 | 51E9 | 8BC0 | E646 | 4689 |
| 0000104060 | FFCA | D076 | 76FF | 8DCE | CA46 | 5016 | 76FF | FFE4 |
| 0000104100 | FA76 | 76FF | 8DF8 | D24E | 5116 | 4E8D | 16F0 | 8D51 |
| 0000104120 | C44E | 5116 | 681E | 074C | 7D68 | FF04 | 0436 | FF02 |
| 0000104140 | 0236 | FF02 | 0836 | FF02 | 0636 | 9A02 | 831A | 0000 |

THU MAR 14 17:25:16 1991 CRV_IPS.DLL PAGE 38, LINE 2184

| | | | | | | | | |
|---|---|---|---|---|---|---|---|---|
| 0000104160 | C483 | 8B28 | CA46 | 2BE9 | E905 | 0006 | 468B | E9E6 |
| 0000104200 | 0522 | 7E83 | 00DE | 0375 | D5E9 | 8E00 | A006 | 2631 |
| 0000104220 | 3E83 | 82B9 | 7500 | E903 | 0048 | 7E83 | FEC8 | 0375 |
| 0000104240 | 3FE9 | FF00 | DE76 | 681E | 06B1 | 468D | 16D2 | 8D50 |
| 0000104260 | F046 | 5016 | 468D | 16C4 | 1E50 | 4C68 | 6807 | 0481 |
| 0000104300 | 36FF | 0204 | 36FF | 0202 | 36FF | 0208 | 36FF | 0206 |
| 0000104320 | 681E | 06C8 | 5E68 | 687E | 7E61 | 649A | 007E | 8300 |
| 0000104340 | 28C4 | 068E | 31A0 | 8326 | 8D3E | 007D | 0375 | 09E9 |
| 0000104360 | 8300 | C87E | 74FE | E903 | 000F | 068E | 31A2 | 8326 |
| 0000104400 | A53E | 007D | 0375 | 51E9 | 8B00 | DE46 | 4689 | FFCA |
| 0000104420 | D076 | 76FF | 8DCE | CA46 | 5016 | 76FF | FFE4 | FA76 |
| 0000104440 | 76FF | 8DF8 | D24E | 5116 | 4E8D | 16F0 | 8D51 | C44E |
| 0000104460 | 5116 | 681E | 074C | 8268 | FF04 | 0436 | FF02 | 0236 |
| 0000104500 | FF02 | 0836 | FF02 | 0636 | 9A02 | 7DED | 0000 | C483 |
| 0000104520 | 8B28 | CA46 | 4DE9 | E904 | 0006 | 468B | E9DE | 0444 |
| 0000104540 | 98A1 | 8B34 | 9A16 | 8934 | E046 | 5689 | A1E2 | 3550 |
| 0000104560 | 168B | 3552 | 4689 | 89E8 | EA56 | EC9A | 7F9D | 8983 |
| 0000104600 | C046 | 5689 | 6AC2 | 6A00 | C404 | 181E | 2602 | 478B |
| 0000104620 | 4862 | 1EC4 | 0218 | D22B | F726 | 6477 | 6A40 | 5000 |
| 0000104640 | 1EC4 | 0218 | FF26 | 6E77 | FF26 | 6C77 | F69A | 86A0 |
| 0000104660 | 5283 | 9A50 | A0F6 | 7513 | 4689 | 89F4 | F656 | C02B |
| 0000104700 | 4689 | 89EE | EC46 | 08E9 | 8300 | EC46 | 8301 | EE56 |
| 0000104720 | 8B00 | EC46 | 568B | 39EE | F656 | 037D | 3CE9 | 7E00 |
| 0000104740 | E903 | 0008 | 4639 | 77F4 | E903 | 002F | 5EC4 | 26E8 |
| 0000104760 | 078B | 8B26 | 0257 | 5EC4 | 26E0 | 0731 | 3126 | 0257 |
| 0000105000 | 4683 | 04E0 | C01B | E325 | 0183 | E246 | 4683 | 04E8 |
| 0000105020 | C01B | FF25 | 01FF | EA46 | AEE9 | 9AFF | 9DEC | 834D |
| 0000105040 | 462B | 1BC0 | C256 | 4689 | 89C0 | C256 | 068E | 31A0 |
| 0000105060 | 8326 | F43E | 0084 | 0375 | 4BE9 | 8300 | C87E | 75FE |
| 0000105100 | E903 | 0042 | 76FF | FFC2 | C076 | 681E | 06D0 | 468D |
| 0000105120 | 16D2 | 8D50 | F046 | 5016 | 468D | 16C4 | 1E50 | 4C68 |
| 0000105140 | 6807 | 0492 | 36FF | 0204 | 36FF | 0202 | 36FF | 0208 |
| 0000105160 | 36FF | 0206 | 681E | 06E8 | 3768 | 6885 | 853A | 3D9A |
| 0000105200 | 0085 | 8300 | 2AC4 | 068E | 31A4 | FF26 | 1E36 | 260F |
| 0000105220 | 36FF | 0F1C | 36FF | 360C | 016A | 76FF | 1ECC | 9868 |
| 0000105240 | 9A34 | 8495 | 0000 | 4689 | 8EE6 | A406 | 2631 | 36FF |
| 0000105260 | 0F22 | FF26 | 2036 | FF0F | 9636 | 6A34 | FF00 | CC76 |
| 0000105300 | 681E | 3550 | FF9A | 00FF | 8900 | DE46 | 7E83 | 00E6 |
| 0000105320 | 0374 | 09E9 | 8300 | DE7E | 7500 | E903 | 01F2 | 068E |
| 0000105340 | 31A4 | FF26 | 1E36 | 260F | 36FF | 0F1C | 36FF | 360C |
| 0000105360 | 681E | 3498 | E09A | 0084 | 8E00 | A406 | 2631 | 36FF |
| 0000105400 | 0F22 | FF26 | 2036 | FF0F | 9636 | 1E34 | 5068 | 9A35 |
| 0000105420 | 8155 | 0000 | 7E83 | 00E6 | 0375 | D5E9 | 8E00 | A006 |
| 0000105440 | 2631 | 3E83 | 854B | 7500 | E903 | 0048 | 7E83 | FEC8 |
| 0000105460 | 0375 | 3FE9 | FF00 | E676 | 681E | 06F0 | 468D | 16D2 |
| 0000105500 | 8D50 | F046 | 5016 | 468D | 16C4 | 1E50 | 4C68 | 6807 |
| 0000105520 | 04A2 | 36FF | 0204 | 36FF | 0202 | 36FF | 0208 | 36FF |
| 0000105540 | 0206 | 681E | 0708 | C768 | 6881 | 81CA | CD9A | 0081 |
| 0000105560 | 8300 | 28C4 | 068E | 31A0 | 8326 | 413E | 0080 | 0375 |
| 0000105600 | 09E9 | 8300 | C87E | 74FE | E903 | 000F | 068E | 31A2 |
| 0000105620 | 8326 | 6D3E | 0080 | 0375 | 51E9 | 8B00 | E646 | 4689 |
| 0000105640 | FFCA | D076 | 76FF | 8DCE | CA46 | 5016 | 76FF | FFE4 |
| 0000105660 | FA76 | 76FF | 8DF8 | D24E | 5116 | 4E8D | 16F0 | 8D51 |
| 0000105700 | C44E | 5116 | 681E | 074C | A368 | FF04 | 0436 | FF02 |
| 0000105720 | 0236 | FF02 | 0836 | FF02 | 0636 | 9A02 | 823C | 0000 |
| 0000105740 | C483 | 8B28 | CA46 | BBE9 | E901 | 0006 | 468B | E9E6 |
| 0000105760 | 01B2 | 7E83 | 00DE | 0375 | D5E9 | 8E00 | A006 | 2631 |
| 0000106000 | 3E83 | 8629 | 7500 | E903 | 0048 | 7E83 | FEC8 | 0375 |
| 0000106020 | 3FE9 | FF00 | DE76 | 681E | 0710 | 468D | 16D2 | 8D50 |

THU MAR 14 17:25:16 1991 CRV_IPS.DLL PAGE 39, LINE 2243

| | | | | | | | | |
|---|---|---|---|---|---|---|---|---|
| 0000106040 | F046 | 5016 | 468D | 16C4 | 1E50 | 4C68 | 6807 | 04A7 |
| 0000106060 | 36FF | 0204 | 36FF | 0202 | 36FF | 0208 | 36FF | 0206 |
| 0000106100 | 681E | 0728 | EA68 | 6886 | 86ED | F09A | 0086 | 8300 |
| 0000106120 | 28C4 | 068E | 31A0 | 8326 | AA3E | 0086 | 0375 | 09E9 |
| 0000106140 | 8300 | C87E | 74FE | E903 | 000F | 068E | 31A2 | 8326 |
| 0000106160 | 163E | 0087 | 0375 | 51E9 | 8B00 | DE46 | 4689 | FFCA |
| 0000106200 | D076 | 76FF | 8DCE | CA46 | 5016 | 76FF | FFE4 | FA76 |
| 0000106220 | 76FF | 8DF8 | D24E | 5116 | 4E8D | 16F0 | 8D51 | C44E |
| 0000106240 | 5116 | 681E | 074C | A868 | FF04 | 0436 | FF02 | 0236 |
| 0000106260 | FF02 | 0836 | FF02 | 0636 | 9A02 | 875E | 0000 | C483 |
| 0000106300 | 8B28 | CA46 | DDE9 | E900 | 0006 | 468B | E9DE | 00D4 |
| 0000106320 | 31E9 | 8EFA | A006 | 2631 | 3E83 | 86FE | 7500 | E903 |
| 0000106340 | 0045 | 7E83 | FEC8 | 0375 | 3CE9 | 1E00 | 3068 | 8D07 |
| 0000106360 | D246 | 5016 | 468D | 16F0 | 8D50 | C446 | 5016 | 681E |
| 0000106400 | 074C | AC68 | FF04 | 0436 | FF02 | 0236 | FF02 | 0836 |
| 0000106420 | FF02 | 0636 | 1E02 | 4468 | 6807 | 8449 | 4C68 | 9A84 |
| 0000106440 | 844F | 0000 | C483 | 8E26 | A006 | 2631 | 3E83 | 8403 |
| 0000106460 | 7500 | E903 | 0009 | 7E83 | FEC8 | 0374 | 0FE9 | 8E00 |
| 0000106500 | A206 | 2631 | 3E83 | 8563 | 7500 | E903 | 0050 | 46C7 |
| 0000106520 | 00CA | FF00 | D076 | 76FF | 8DCE | CA46 | 5016 | 76FF |
| 0000106540 | FFE4 | FA76 | 76FF | 8DF8 | D24E | 5116 | 4E8D | 16F0 |
| 0000106560 | 8D51 | C44E | 5116 | 681E | 074C | AD68 | FF04 | 0436 |
| 0000106600 | FF02 | 0236 | FF02 | 0836 | FF02 | 0636 | 9A02 | 85AC |
| 0000106620 | 0000 | C483 | 8B28 | CA46 | 09E9 | E900 | 0006 | 00B8 |
| 0000106640 | E900 | 0000 | 5F5E | ED83 | 8B02 | 1FE5 | 4D5D | 1ECB |
| 0000106660 | 9058 | 5545 | EC8B | 8E1E | 81D8 | 48EC | 5710 | C756 |
| 0000106700 | FA46 | 0761 | 5E8C | C7FC | F246 | 0101 | C02B | 8689 |
| 0000106720 | F7D2 | 8689 | F7D0 | 068E | 31A0 | 8326 | BE3E | 0088 |
| 0000106740 | 0375 | 1EE9 | FF00 | 0836 | FF02 | 0636 | 8D02 | C886 |
| 0000106760 | 16F7 | 9A50 | 8057 | 0000 | C483 | 3D08 | 0000 | 0374 |
| 0000107000 | 0FE9 | 8E00 | A206 | 2631 | 3E83 | 8930 | 7500 | E903 |
| 0000107020 | 003C | 681E | 0765 | 468D | 16E4 | 8D50 | C886 | 16F7 |
| 0000107040 | 8D50 | F646 | 5016 | B968 | 1E04 | DC68 | FF07 | 0436 |
| 0000107060 | FF02 | 0236 | FF02 | 0836 | FF02 | 0636 | 9A02 | 80A0 |
| 0000107100 | 0000 | C483 | 891E | F646 | 5689 | E9F8 | 0008 | C02B |
| 0000107120 | 4689 | 89F8 | F646 | 068E | 31A4 | FF26 | 1E36 | 260F |
| 0000107140 | 36FF | 0F1C | 36FF | 360C | 868D | EFB8 | 5016 | 5F9A |
| 0000107160 | 0088 | 8900 | F446 | 068E | 31A4 | FF26 | 2236 | 260F |
| 0000107200 | 36FF | 0F20 | 36FF | 3496 | 868D | F7D4 | 5016 | FF9A |
| 0000107220 | 00FF | 8900 | F046 | 7E83 | 00F4 | 0374 | 09E9 | 8300 |
| 0000107240 | F07E | 7500 | E903 | 0204 | 068E | 31A4 | FF26 | 1E36 |
| 0000107260 | 260F | 36FF | 0F1C | 36FF | 360C | 681E | 3498 | AA9A |
| 0000107300 | 0088 | 8E00 | A406 | 2631 | 36FF | 0F22 | FF26 | 2036 |
| 0000107320 | FF0F | 9636 | 1E34 | 5068 | 9A35 | 8B24 | 0000 | 7E83 |
| 0000107340 | 00F4 | 0375 | DEE9 | 8E00 | A006 | 2631 | 3E83 | 8917 |
| 0000107360 | 7500 | E903 | 004A | BE83 | F7CC | 75FE | E903 | 0040 |
| 0000107400 | 76FF | 1EF4 | 6968 | 8D07 | E446 | 5016 | 468D | 16F6 |
| 0000107420 | 8D50 | C886 | 16F7 | 1E50 | DC68 | 6807 | 04CB | 36FF |
| 0000107440 | 0204 | 36FF | 0202 | 36FF | 0208 | 36FF | 0206 | 681E |
| 0000107460 | 077E | EA68 | 6889 | 89ED | F09A | 0089 | 8300 | 28C4 |
| 0000107500 | 068E | 31A0 | 8326 | A53E | 0089 | 0375 | 0AE9 | 8300 |
| 0000107520 | CCBE | FEF7 | 0374 | 0FE9 | 8E00 | A206 | 2631 | 3E83 |
| 0000107540 | 8A17 | 7500 | E903 | 0057 | 468B | 89F4 | CE86 | FFF7 |
| 0000107560 | D2B6 | FFF7 | D0B6 | 8DF7 | CE86 | 16F7 | FF50 | F276 |
| 0000107600 | 76FF | FFFC | FA76 | 4E8D | 16E4 | 8D51 | F64E | 5116 |
| 0000107620 | 8E8D | F7C8 | 5116 | 681E | 07DC | CC68 | FF04 | 0436 |
| 0000107640 | FF02 | 0236 | FF02 | 0836 | FF02 | 0636 | 9A02 | 8A65 |
| 0000107660 | 0000 | C483 | 8B28 | CE86 | E9F7 | 036F | 06E9 | 8B00 |
| 0000107700 | F446 | 66E9 | 8303 | F07E | 7500 | E903 | 0059 | 068E |

THU MAR 14 17:25:16 1991 CRV_IPS.DLL PAGE 40, LINE 2302

| | | | | | | | | |
|---|---|---|---|---|---|---|---|---|
| 0000107720 | 31A0 | 8326 | FE3E | 0089 | 0375 | 4AE9 | 8300 | CCBE |
| 0000107740 | FEF7 | 0375 | 40E9 | FF00 | F076 | 681E | 0786 | 468D |
| 0000107760 | 16E4 | 8D50 | F646 | 5016 | 868D | F7C8 | 5016 | 681E |
| 0000110000 | 07DC | CF68 | FF04 | 0436 | FF02 | 0236 | FF02 | 0836 |
| 0000110020 | FF02 | 0636 | 1E02 | 9B68 | 6807 | 8615 | 1868 | 9A86 |
| 0000110040 | 861B | 0000 | C483 | 8E28 | A006 | 2631 | 3E83 | 85D2 |
| 0000110060 | 7500 | E903 | 000A | BE83 | F7CC | 74FE | E903 | 000F |
| 0000110100 | 068E | 31A2 | 8326 | 413E | 0086 | 0375 | 57E9 | 8B00 |
| 0000110120 | F046 | 8689 | F7CE | B6FF | F7D2 | B6FF | F7D0 | 868D |
| 0000110140 | F7CE | 5016 | 76FF | FFF2 | FC76 | 76FF | 8DFA | E44E |
| 0000110160 | 5116 | 4E8D | 16F6 | 8D51 | C88E | 16F7 | 1E51 | DC68 |
| 0000110200 | 6807 | 04D0 | 36FF | 0204 | 36FF | 0202 | 36FF | 0208 |
| 0000110220 | 36FF | 0206 | 8A9A | 0086 | 8300 | 28C4 | 868B | F7CE |
| 0000110240 | 88E9 | E902 | 0006 | 468B | E9F0 | 027F | 1EC4 | 0218 |
| 0000110260 | 8B26 | 5C47 | 64B9 | 9900 | F9F7 | 042D | 6B00 | 64C0 |
| 0000110300 | 003D | 7400 | E903 | 0019 | 486A | 868D | F7D4 | 5016 |
| 0000110320 | 868D | EFB8 | 5016 | 649A | DD9F | 838A | 0AC4 | 31E9 |
| 0000110340 | C400 | 181E | 2602 | 478B | B95C | 0064 | F799 | 48F9 |
| 0000110360 | C06B | 3D64 | 0000 | 0374 | 17E9 | 6800 | 0810 | 868D |
| 0000110400 | F7D4 | 5016 | 868D | EFB8 | 5016 | 649A | EE9F | 8383 |
| 0000110420 | 0AC4 | 068E | 31A4 | FF26 | 1E36 | 260F | 36FF | 0F1C |
| 0000110440 | 36FF | 360C | 016A | 868D | EFB8 | 5016 | FF9A | 00FF |
| 0000110460 | 8900 | F446 | 7E83 | 00F4 | 0375 | 14E9 | 8E01 | A406 |
| 0000110500 | 2631 | 36FF | 0F1E | FF26 | 1C36 | FF0F | 0C36 | 1E36 |
| 0000110520 | 9868 | 9A34 | 8B3F | 0000 | 068E | 31A4 | FF26 | 2236 |
| 0000110540 | 260F | 36FF | 0F20 | 36FF | 3496 | 681E | 3550 | C59A |
| 0000110560 | 0084 | 8E00 | A006 | 2631 | 3E83 | 8BA3 | 7500 | E903 |
| 0000110600 | 004A | BE83 | F7CC | 75FE | E903 | 0040 | 76FF | 1EF4 |
| 0000110620 | A368 | 8D07 | E446 | 5016 | 468D | 16F6 | 8D50 | C886 |
| 0000110640 | 16F7 | 1E50 | DC68 | 6807 | 04E8 | 36FF | 0204 | 36FF |
| 0000110660 | 0202 | 36FF | 0208 | 36FF | 0206 | 681E | 07B9 | 6A68 |
| 0000110700 | 688C | 8C6D | 709A | 008C | 8300 | 28C4 | 068E | 31A0 |
| 0000110720 | 8326 | 283E | 008C | 0375 | 0AE9 | 8300 | CCBE | FEF7 |
| 0000110740 | 0374 | 0FE9 | 8E00 | A206 | 2631 | 3E83 | 8C97 | 7500 |
| 0000110760 | E903 | 0057 | 468B | 89F4 | CE86 | FFF7 | D2B6 | FFF7 |
| 0000111000 | D0B6 | 8DF7 | CE86 | 16F7 | FF50 | F276 | 76FF | FFFC |
| 0000111020 | FA76 | 4E8D | 16E4 | 8D51 | F64E | 5116 | 8E8D | F7C8 |
| 0000111040 | 5116 | 681E | 07DC | E968 | FF04 | 0436 | FF02 | 0236 |
| 0000111060 | FF02 | 0836 | FF02 | 0636 | 9A02 | 8CE4 | 0000 | C483 |
| 0000111100 | 8B28 | CE86 | E9F7 | 00E3 | 06E9 | 8B00 | F446 | DAE9 |
| 0000111120 | 8E00 | A006 | 2631 | 3E83 | 8C7E | 7500 | E903 | 0047 |
| 0000111140 | BE83 | F7CC | 75FE | E903 | 003D | 681E | 07C1 | 468D |
| 0000111160 | 16E4 | 8D50 | F646 | 5016 | 868D | F7C8 | 5016 | 681E |
| 0000111200 | 07DC | EC68 | FF04 | 0436 | FF02 | 0236 | FF02 | 0836 |
| 0000111220 | FF02 | 0636 | 1E02 | D468 | 6807 | 8903 | 0668 | 9A89 |
| 0000111240 | 8909 | 0000 | C483 | 8E26 | A006 | 2631 | 3E83 | 87AD |
| 0000111260 | 7500 | E903 | 000A | BE83 | F7CC | 74FE | E903 | 000F |
| 0000111300 | 068E | 31A2 | 8326 | DA3E | 0087 | 0375 | 56E9 | C700 |
| 0000111320 | CE86 | 00F7 | FF00 | D2B6 | FFF7 | D0B6 | 8DF7 | CE86 |
| 0000111340 | 16F7 | FF50 | F276 | 76FF | FFFC | FA76 | 4E8D | 16E4 |
| 0000111360 | 8D51 | F64E | 5116 | 8E8D | F7C8 | 5116 | 681E | 07DC |
| 0000111400 | ED68 | FF04 | 0436 | FF02 | 0236 | FF02 | 0836 | FF02 |
| 0000111420 | 0636 | 9A02 | 897E | 0000 | C483 | 8B28 | CE86 | E9F7 |
| 0000111440 | 0009 | 06E9 | B800 | 0000 | 00E9 | 5E00 | 835F | 02ED |
| 0000111460 | E58B | 5D1F | CB4D | 581E | 4590 | 8B55 | 1EEC | D88E |
| 0000111500 | EC81 | 11C6 | 5657 | 46C7 | F4FA | 8C07 | FC5E | 86C7 |
| 0000111520 | FE80 | 0101 | C02B | 8689 | F65C | 8689 | F65A | 068E |
| 0000111540 | 31A0 | 8326 | 0E3E | 008E | 0375 | 1EE9 | FF00 | 0836 |
| 0000111560 | FF02 | 0636 | 8D02 | 4E86 | 16F6 | 9A50 | 87C4 | 0000 |

THU MAR 14 17:25:16 1991 CRV_IPS.DLL PAGE 41, LINE 2361

| | | | | | | | | |
|---|---|---|---|---|---|---|---|---|
| 0000111600 | C483 | 3D08 | 0000 | 0374 | 0FE9 | 8E00 | A206 | 2631 |
| 0000111620 | 3E83 | 8E82 | 7500 | E903 | 003D | 681E | 07F8 | 868D |
| 0000111640 | F65E | 5016 | 868D | F64E | 5016 | 468D | 16F0 | 6850 |
| 0000111660 | 04FC | 681E | 0958 | 36FF | 0204 | 36FF | 0202 | 36FF |
| 0000111700 | 0208 | 36FF | 0206 | 0E9A | 0088 | 8300 | 1EC4 | 4689 |
| 0000111720 | 89F0 | F256 | 08E9 | 2B00 | 89C0 | F246 | 4689 | 8DF0 |
| 0000111740 | 3C86 | 89FF | 7C86 | 8CFE | 7E96 | 8DFE | 8886 | 89FE |
| 0000111760 | 4A86 | 8CF6 | 4C96 | FFF6 | 0876 | 76FF | FF06 | 1076 |
| 0000112000 | 76FF | 6A0E | FF78 | 0C76 | 76FF | 6A0A | 6A00 | 6A00 |
| 0000112020 | 8D00 | F846 | 5016 | B6FF | FE7E | B6FF | FE7C | 868D |
| 0000112040 | FE84 | 5016 | B19A | 0079 | 8900 | 8286 | 83FE | 82BE |
| 0000112060 | 00FE | 0375 | E4E9 | 8E00 | A006 | 2631 | 3E83 | 8E69 |
| 0000112100 | 7500 | E903 | 004C | BE83 | F652 | 75FE | E903 | 0042 |
| 0000112120 | B6FF | FE82 | 681E | 07FC | 868D | F65E | 5016 | 468D |
| 0000112140 | 16F0 | 8D50 | 4E86 | 16F6 | 1E50 | 5868 | 6809 | 0510 |
| 0000112160 | 36FF | 0204 | 36FF | 0202 | 36FF | 0208 | 36FF | 0206 |
| 0000112200 | 681E | 0813 | BF68 | 688F | 8FC2 | C59A | 008F | 8300 |
| 0000112220 | 28C4 | 068E | 31A0 | 8326 | 793E | 008F | 0375 | 0AE9 |
| 0000112240 | 8300 | 52BE | FEF6 | 0374 | 0FE9 | 8E00 | A206 | 2631 |
| 0000112260 | 3E83 | 8FEC | 7500 | E903 | 005A | 868B | FE82 | 8689 |
| 0000112300 | F654 | B6FF | F65C | B6FF | F65A | 868D | F654 | 5016 |
| 0000112320 | B6FF | FE80 | 76FF | FFFC | FA76 | 8E8D | F65E | 5116 |
| 0000112340 | 4E8D | 16F0 | 8D51 | 4E8E | 16F6 | 1E51 | 5868 | 6809 |
| 0000112360 | 0511 | 36FF | 0204 | 36FF | 0202 | 36FF | 0208 | 36FF |
| 0000112400 | 0206 | 3C9A | 0090 | 8300 | 28C4 | 868B | F654 | 90E9 |
| 0000112420 | E910 | 0007 | 868B | FE82 | 86E9 | C410 | 7C9E | 26FE |
| 0000112440 | 478B | B95C | 000A | F799 | 83F9 | 00FA | 0375 | 55E9 |
| 0000112460 | C401 | 7C9E | 26FE | 478B | 995C | F9F7 | F799 | 83F9 |
| 0000112500 | 00FA | 0374 | 3FE9 | C401 | 7C9E | 26FE | 478B | BB5C |
| 0000112520 | 0064 | F799 | 99FB | F9F7 | FA83 | 7400 | E903 | 0126 |
| 0000112540 | 76FF | FF12 | F876 | 868D | FE84 | 5016 | B6FF | FE7E |
| 0000112560 | B6FF | FE7C | 76FF | FF08 | 0676 | 7C9A | DA9F | 837C |
| 0000112600 | 10C4 | 4689 | FFF4 | 0876 | 76FF | FF06 | F876 | 868D |
| 0000112620 | FE84 | 5016 | 8F9A | 0088 | 8300 | F47E | 7500 | E903 |
| 0000112640 | 00E1 | 068E | 31A0 | 8326 | D33E | 008F | 0375 | 4BE9 |
| 0000112660 | 8300 | 52BE | FEF6 | 0375 | 41E9 | FF00 | F476 | 681E |
| 0000112700 | 081B | 868D | F65E | 5016 | 468D | 16F0 | 8D50 | 4E86 |
| 0000112720 | 16F6 | 1E50 | 5868 | 6809 | 051B | 36FF | 0204 | 36FF |
| 0000112740 | 0202 | 36FF | 0208 | 36FF | 0206 | 681E | 0839 | 8F68 |
| 0000112760 | 688B | 8B92 | 959A | 008B | 8300 | 28C4 | 068E | 31A0 |
| 0000113000 | 8326 | 4A3E | 008B | 0375 | 0AE9 | 8300 | 52BE | FEF6 |
| 0000113020 | 0374 | 0FE9 | 8E00 | A206 | 2631 | 3E83 | 8BBC | 7500 |
| 0000113040 | E903 | 0059 | 468B | 89F4 | 5486 | FFF6 | 5CB6 | FFF6 |
| 0000113060 | 5AB6 | 8DF6 | 5486 | 16F6 | FF50 | 80B6 | FFFE | FC76 |
| 0000113100 | 76FF | 8DFA | 5E8E | 16F6 | 8D51 | F04E | 5116 | 8E8D |
| 0000113120 | F64E | 5116 | 681E | 0958 | 1C68 | FF05 | 0436 | FF02 |
| 0000113140 | 0236 | FF02 | 0836 | FF02 | 0636 | 9A02 | 8C0A | 0000 |
| 0000113160 | C483 | 8B28 | 5486 | E9F6 | 0F27 | 06E9 | 8B00 | F446 |
| 0000113200 | 1EE9 | E90F | 0E95 | 9EC4 | FE7C | 8B26 | 5C47 | 64B9 |
| 0000113220 | 9900 | F9F7 | 0AB9 | 9900 | F9F7 | FA83 | 7500 | E903 |
| 0000113240 | 06D9 | 9EC4 | FE7C | 8B26 | 5C47 | F799 | 83F9 | 00FA |
| 0000113260 | 0375 | C6E9 | C406 | 7C9E | 26FE | 478B | 995C | F9F7 |
| 0000113300 | F799 | 83F9 | 00FA | 0374 | B0E9 | 8306 | 127E | 7400 |
| 0000113320 | E903 | 06A7 | 068E | 31A4 | FF26 | 1E36 | 260F | 36FF |
| 0000113340 | 0F1C | 76FF | FF10 | 0E76 | 786A | 006A | 006A | 006A |
| 0000113360 | 006A | 006A | 468D | 16F6 | FF50 | 4CB6 | FFF6 | 4AB6 |
| 0000113400 | 8DF6 | 5686 | 16F6 | 9A50 | 8DF5 | 0000 | 8689 | FE82 |
| 0000113420 | BE83 | FE82 | 7500 | E903 | 00F8 | 76FF | FF08 | 0676 |
| 0000113440 | 76FF | 8DF8 | 8486 | 16FE | 9A50 | 8F65 | 0000 | 068E |

THU MAR 14 17:25:16 1991 CRV_IPS.DLL PAGE 42, LINE 2420

| | | | | | | | | |
|---|---|---|---|---|---|---|---|---|
| 0000113460 | 31A0 | 8326 | 353E | 008D | 0375 | 4CE9 | 8300 | 52BE |
| 0000113500 | FEF6 | 0375 | 42E9 | FF00 | 82B6 | 1EFE | 4168 | 8D08 |
| 0000113520 | 5E86 | 16F6 | 8D50 | F046 | 5016 | 868D | F64E | 5016 |
| 0000113540 | 681E | 0958 | 2A68 | FF05 | 0436 | FF02 | 0236 | FF02 |
| 0000113560 | 0836 | FF02 | 0636 | 1E02 | 5C68 | 6808 | 8E55 | 5868 |
| 0000113600 | 9A8E | 8E5B | 0000 | C483 | 8E28 | A006 | 2631 | 3E83 |
| 0000113620 | 925E | 7500 | E903 | 000A | BE83 | F652 | 74FE | E903 |
| 0000113640 | 000F | 068E | 31A2 | 8326 | 773E | 0092 | 0375 | 5AE9 |
| 0000113660 | 8B00 | 8286 | 89FE | 5486 | FFF6 | 5CB6 | FFF6 | 5AB6 |
| 0000113700 | 8DF6 | 5486 | 16F6 | FF50 | 80B6 | FFFE | FC76 | 76FF |
| 0000113720 | 8DFA | 5E8E | 16F6 | 8D51 | F04E | 5116 | 8E8D | F64E |
| 0000113740 | 5116 | 681E | 0958 | 2B68 | FF05 | 0436 | FF02 | 0236 |
| 0000113760 | FF02 | 0836 | FF02 | 0636 | 9A02 | 92C6 | 0000 | C483 |
| 0000114000 | 8B28 | 5486 | E9F6 | 0D99 | 07E9 | 8B00 | 8286 | E9FE |
| 0000114020 | 0D8F | 9EC4 | F64A | 8B26 | 5C47 | 64B9 | 9900 | F9F7 |
| 0000114040 | 0AB9 | 9900 | F9F7 | FA83 | 7500 | E903 | 0029 | 9EC4 |
| 0000114060 | F64A | 8B26 | 5C47 | F799 | 83F9 | 00FA | 0374 | 16E9 |
| 0000114100 | C400 | 4A9E | 26F6 | 478B | 995C | F9F7 | F799 | 83F9 |
| 0000114120 | 00FA | 0375 | B6E9 | FF00 | 0876 | 76FF | FF06 | F876 |
| 0000114140 | 868D | FE84 | 5016 | 539A | 0092 | 8E00 | A406 | 2631 |
| 0000114160 | 36FF | 0F1E | FF26 | 1C36 | FF0F | F676 | 868D | F656 |
| 0000114200 | 5016 | 1B9A | 0093 | 8E00 | A006 | 2631 | 3E83 | 9342 |
| 0000114220 | 7500 | E903 | 000A | BE83 | F652 | 74FE | E903 | 000F |
| 0000114240 | 068E | 31A2 | 8326 | B53E | 0093 | 0375 | 58E9 | C700 |
| 0000114260 | 5486 | DCF6 | FF00 | 5CB6 | FFF6 | 5AB6 | 8DF6 | 5486 |
| 0000114300 | 16F6 | FF50 | 80B6 | FFFE | FC76 | 76FF | 8DFA | 5E8E |
| 0000114320 | 16F6 | 8D51 | F04E | 5116 | 8E8D | F64E | 5116 | 681E |
| 0000114340 | 0958 | 3268 | FF05 | 0436 | FF02 | 0236 | FF02 | 0836 |
| 0000114360 | FF02 | 0636 | 9A02 | 9405 | 0000 | C483 | 8B28 | 5486 |
| 0000114400 | E9F6 | 0C9D | 06E9 | B800 | 00DC | 94E9 | FF0C | 1276 |
| 0000114420 | 76FF | 8DF8 | 8486 | 16FE | FF50 | 7EB6 | FFFE | 7CB6 |
| 0000114440 | FFFE | 0876 | 76FF | 9A06 | 9F7C | 8F4D | C483 | 8910 |
| 0000114460 | F446 | 7E83 | 00F4 | 0375 | 11E9 | FF01 | 0876 | 76FF |
| 0000114500 | FF06 | F876 | 868D | FE84 | 5016 | 379A | 0093 | 8E00 |
| 0000114520 | A406 | 2631 | 36FF | 0F1E | FF26 | 1C36 | FF0F | F676 |
| 0000114540 | 868D | F656 | 5016 | 789A | 0094 | 8E00 | A006 | 2631 |
| 0000114560 | 3E83 | 939C | 7500 | E903 | 004B | BE83 | F652 | 75FE |
| 0000114600 | E903 | 0041 | 76FF | 1EF4 | 6468 | 8D08 | 5E86 | 16F6 |
| 0000114620 | 8D50 | F046 | 5016 | 868D | F64E | 5016 | 681E | 0958 |
| 0000114640 | 3C68 | FF05 | 0436 | FF02 | 0236 | FF02 | 0836 | FF02 |
| 0000114660 | 0636 | 1E02 | 8268 | 6808 | 94F0 | F368 | 9A94 | 94F6 |
| 0000114700 | 0000 | C483 | 8E28 | A006 | 2631 | 3E83 | 94A9 | 7500 |
| 0000114720 | E903 | 000A | BE83 | F652 | 74FE | E903 | 000F | 068E |
| 0000114740 | 31A2 | 8326 | 623E | 008D | 0375 | 59E9 | 8B00 | F446 |
| 0000114760 | 8689 | F654 | B6FF | F65C | B6FF | F65A | 868D | F654 |
| 0000115000 | 5016 | B6FF | FE80 | 76FF | FFFC | FA76 | 8E8D | F65E |
| 0000115020 | 5116 | 4E8D | 16F0 | 8D51 | 4E8E | 16F6 | 1E51 | 5868 |
| 0000115040 | 6809 | 053D | 36FF | 0204 | 36FF | 0202 | 36FF | 0208 |
| 0000115060 | 36FF | 0206 | D39A | 008E | 8300 | 28C4 | 868B | F654 |
| 0000115100 | 5EE9 | E90B | 0006 | 468B | E9F4 | 0B55 | 76FF | FF08 |
| 0000115120 | 0676 | 76FF | 8DF8 | 6C86 | 16F6 | 9A50 | 944C | 0000 |
| 0000115140 | 8689 | FE82 | 068E | 31A4 | FF26 | 1E36 | 260F | 36FF |
| 0000115160 | 0F1C | 76FF | 8DF6 | 3A86 | 16EE | 9A50 | 883F | 0000 |
| 0000115200 | 8689 | F66A | BE83 | FE82 | 7400 | E903 | 000A | BE83 |
| 0000115220 | F66A | 7500 | E903 | 020C | 76FF | FF08 | 0676 | 76FF |
| 0000115240 | 8DF8 | 8486 | 16FE | 9A50 | 9494 | 0000 | 068E | 31A4 |
| 0000115260 | FF26 | 1E36 | 260F | 36FF | 0F1C | 76FF | 8DF6 | 5686 |
| 0000115300 | 16F6 | 9A50 | 90FA | 0000 | BE83 | FE82 | 7500 | E903 |
| 0000115320 | 00E4 | 068E | 31A0 | 8326 | 043E | 0095 | 0375 | 4CE9 |

THU MAR 14 17:25:16 1991 CRV_IPS.DLL PAGE 43, LINE 2479

| | | | | | | | | |
|---|---|---|---|---|---|---|---|---|
| 0000115340 | 8300 | 52BE | FEF6 | 0375 | 42E9 | FF00 | 82B6 | 1EFE |
| 0000115360 | 8A68 | 8D08 | 5E86 | 16F6 | 8D50 | F046 | 5016 | 868D |
| 0000115400 | F64E | 5016 | 681E | 0958 | 4A68 | FF05 | 0436 | FF02 |
| 0000115420 | 0236 | FF02 | 0836 | FF02 | 0636 | 1E02 | A368 | 6808 |
| 0000115440 | 914C | 4F68 | 9A91 | 9152 | 0000 | C483 | 8E28 | A006 |
| 0000115460 | 2631 | 3E83 | 9105 | 7500 | E903 | 000A | BE83 | F652 |
| 0000115500 | 74FE | E903 | 000F | 068E | 31A2 | 8326 | 0B3E | 0096 |
| 0000115520 | 0375 | 5AE9 | 8B00 | 8286 | 89FE | 5486 | FFF6 | 5CB6 |
| 0000115540 | FFF6 | 5AB6 | 8DF6 | 5486 | 16F6 | FF50 | 80B6 | FFFE |
| 0000115560 | FC76 | 76FF | 8DFA | 5E8E | 16F6 | 8D51 | F04E | 5116 |
| 0000115600 | 8E8D | F64E | 5116 | 681E | 0958 | 4B68 | FF05 | 0436 |
| 0000115620 | FF02 | 0236 | FF02 | 0836 | FF02 | 0636 | 9A02 | 965C |
| 0000115640 | 0000 | C483 | 8B28 | 5486 | E9F6 | 09F5 | 07E9 | 8B00 |
| 0000115660 | 8286 | E9FE | 09EB | BE83 | F66A | 7500 | E903 | 00E4 |
| 0000115700 | 068E | 31A0 | 8326 | F23E | 0095 | 0375 | 4CE9 | 8300 |
| 0000115720 | 52BE | FEF6 | 0375 | 42E9 | FF00 | 6AB6 | 1EF6 | AB68 |
| 0000115740 | 8D08 | 5E86 | 16F6 | 8D50 | F046 | 5016 | 868D | F64E |
| 0000115760 | 5016 | 681E | 0958 | 4F68 | FF05 | 0436 | FF02 | 0236 |
| 0000116000 | FF02 | 0836 | FF02 | 0636 | 1E02 | C468 | 6808 | 9388 |
| 0000116020 | 8B68 | 9A93 | 938E | 0000 | C483 | 8E28 | A006 | 2631 |
| 0000116040 | 3E83 | 96CB | 7500 | E903 | 000A | BE83 | F652 | 74FE |
| 0000116060 | E903 | 000F | 068E | 31A2 | 8326 | E13E | 0096 | 0375 |
| 0000116100 | 5AE9 | 8B00 | 6A86 | 89F6 | 5486 | FFF6 | 5CB6 | FFF6 |
| 0000116120 | 5AB6 | 8DF6 | 5486 | 16F6 | FF50 | 80B6 | FFFE | FC76 |
| 0000116140 | 76FF | 8DFA | 5E8E | 16F6 | 8D51 | F04E | 5116 | 8E8D |
| 0000116160 | F64E | 5116 | 681E | 0958 | 5068 | FF05 | 0436 | FF02 |
| 0000116200 | 0236 | FF02 | 0836 | FF02 | 0636 | 9A02 | 9731 | 0000 |
| 0000116220 | C483 | 8B28 | 5486 | E9F6 | 0907 | 07E9 | 8B00 | 6A86 |
| 0000116240 | E9F6 | 08FD | 868D | EE3A | 5016 | 868D | F66C | 5016 |
| 0000116260 | 639A | FA5A | 8392 | 08C4 | 4689 | FFF4 | 0876 | 76FF |
| 0000116300 | FF06 | F876 | 868D | FE84 | 5016 | B79A | 0096 | 8E00 |
| 0000116320 | A406 | 2631 | 36FF | 0F1E | FF26 | 1C36 | FF0F | F676 |
| 0000116340 | 868D | F656 | 5016 | B39A | 0097 | C700 | 0A06 | 0136 |
| 0000116360 | 8E00 | A006 | 2631 | 3E83 | 97BE | 7500 | E903 | 000A |
| 0000116400 | BE83 | F652 | 74FE | E903 | 000F | 068E | 31A2 | 8326 |
| 0000116420 | D73E | 0097 | 0375 | 59E9 | 8B00 | F446 | 8689 | F654 |
| 0000116440 | B6FF | F65C | B6FF | F65A | 868D | F654 | 5016 | B6FF |
| 0000116460 | FE80 | 76FF | FFFC | FA76 | 8E8D | F65E | 5116 | 4E8D |
| 0000116500 | 16F0 | 8D51 | 4E8E | 16F6 | 1E51 | 5868 | 6809 | 0559 |
| 0000116520 | 36FF | 0204 | 36FF | 0202 | 36FF | 0208 | 36FF | 0206 |
| 0000116540 | 269A | 0098 | 8300 | 28C4 | 868B | F654 | 32E9 | E908 |
| 0000116560 | 0006 | 468B | E9F4 | 0829 | A0E9 | C407 | 7C9E | 26FE |
| 0000116600 | 478B | B95C | 0064 | F799 | B9F9 | 000A | F799 | 83F9 |
| 0000116620 | 00FA | 0375 | 84E9 | C407 | 7C9E | 26FE | 478B | 995C |
| 0000116640 | F9F7 | FA83 | 7400 | E903 | 0771 | 9EC4 | FE7C | 8B26 |
| 0000116660 | 5C47 | F799 | 99F9 | F9F7 | FA83 | 7400 | E903 | 075B |
| 0000116700 | 7E83 | 0012 | 0374 | 52E9 | 8307 | 083E | 0A36 | 0374 |
| 0000116720 | 9AE9 | FF00 | 0876 | 76FF | FF06 | F876 | 868D | FE84 |
| 0000116740 | 5016 | 959A | 0098 | 8E00 | A006 | 2631 | 3E83 | 98A0 |
| 0000116760 | 7500 | E903 | 000A | BE83 | F652 | 74FE | E903 | 000F |
| 0000117000 | 068E | 31A2 | 8326 | 793E | 0091 | 0375 | 58E9 | C700 |
| 0000117020 | 5486 | E5F6 | FFFF | 5CB6 | FFF6 | 5AB6 | 8DF6 | 5486 |
| 0000117040 | 16F6 | FF50 | 80B6 | FFFE | FC76 | 76FF | 8DFA | 5E8E |
| 0000117060 | 16F6 | 8D51 | F04E | 5116 | 8E8D | F64E | 5116 | 681E |
| 0000117100 | 0958 | 6168 | FF05 | 0436 | FF02 | 0236 | FF02 | 0836 |
| 0000117120 | FF02 | 0636 | 9A02 | 91CA | 0000 | C483 | 8B28 | 5486 |
| 0000117140 | E9F6 | 073D | 06E9 | B800 | FFE5 | 34E9 | 8E07 | A406 |
| 0000117160 | 2631 | 36FF | 0F22 | FF26 | 2036 | 1E0F | 4268 | 6A02 |
| 0000117200 | FF78 | 6436 | FF02 | 6236 | 6A02 | 6A00 | 6A00 | 8D00 |

THU MAR 14 17:25:16 1991 CRV_IPS.DLL PAGE 44, LINE 2538

| | | | | | | | | |
|---|---|---|---|---|---|---|---|---|
| 0000117220 | F646 | 5016 | B6FF | F64C | B6FF | F64A | 868D | F656 |
| 0000117240 | 5016 | D89A | 0090 | 8900 | 8286 | 83FE | 82BE | 00FE |
| 0000117260 | 0375 | F8E9 | FF00 | 0876 | 76FF | FF06 | F876 | 868D |
| 0000117300 | FE84 | 5016 | 379A | 0092 | 8E00 | A006 | 2631 | 3E83 |
| 0000117320 | 9160 | 7500 | E903 | 004C | BE83 | F652 | 75FE | E903 |
| 0000117340 | 0042 | B6FF | FE82 | 681E | 08CC | 868D | F65E | 5016 |
| 0000117360 | 468D | 16F0 | 8D50 | 4E86 | 16F6 | 1E50 | 5868 | 6809 |
| 0000117400 | 056B | 36FF | 0204 | 36FF | 0202 | 36FF | 0208 | 36FF |
| 0000117420 | 0206 | 681E | 08E7 | 2B68 | 689B | 9B2E | 319A | 009B |
| 0000117440 | 8300 | 28C4 | 068E | 31A0 | 8326 | F93E | 0099 | 0375 |
| 0000117460 | 0AE9 | 8300 | 52BE | FEF6 | 0374 | 0FE9 | 8E00 | A206 |
| 0000117500 | 2631 | 3E83 | 9A12 | 750D | E903 | 005A | 868B | FE82 |
| 0000117520 | 8689 | F654 | B6FF | F65C | B6FF | F65A | 868D | F654 |
| 0000117540 | 5016 | B6FF | FE80 | 76FF | FFFC | FA76 | 8E8D | F65E |
| 0000117560 | 5116 | 4E8D | 16F0 | 8D51 | 4E8E | 16F6 | 1E51 | 5868 |
| 0000117600 | 6809 | 056C | 36FF | 0204 | 36FF | 0202 | 36FF | 0208 |
| 0000117620 | 36FF | 0206 | 619A | 009A | 8300 | 28C4 | 868B | F654 |
| 0000117640 | FEE9 | E905 | 5J07 | 868B | FE82 | F4E9 | C405 | 4A9E |
| 0000117660 | 26F6 | 478B | B95C | 0064 | F799 | B9F9 | 000A | F799 |
| 0000117700 | 83F9 | 00FA | 0375 | 29E9 | C400 | 4A9E | 26F6 | 478B |
| 0000117720 | 995C | F9F7 | FA83 | 7500 | E903 | 0016 | 9EC4 | F64A |
| 0000117740 | 8B26 | 5C47 | F799 | 99F9 | F9F7 | FA83 | 7500 | E903 |
| 0000117760 | 00B6 | 76FF | FF08 | 0676 | 76FF | 8DF8 | 8486 | 16FE |
| 0000120000 | 9A50 | 99EE | 0000 | 068E | 31A4 | FF26 | 2236 | 260F |
| 0000120020 | 36FF | 0F20 | 76FF | 8DF6 | 5686 | 16F6 | 9A50 | 9ABE |
| 0000120040 | 0000 | 068E | 31A0 | 8326 | E53E | 009A | 0375 | 0AE9 |
| 0000120060 | 8300 | 52BE | FEF6 | 0374 | 0FE9 | 8E00 | A206 | 2631 |
| 0000120100 | 3E83 | 9B58 | 7500 | E903 | 0058 | 86C7 | F654 | 00DC |
| 0000120120 | B6FF | F65C | B6FF | F65A | 868D | F654 | 5016 | B6FF |
| 0000120140 | FE80 | 76FF | FFFC | FA76 | 8E8D | F65E | 5116 | 4E8D |
| 0000120160 | 16F0 | 8D51 | 4E8E | 16F6 | 1E51 | 5868 | 6809 | 0573 |
| 0000120200 | 36FF | 0204 | 36FF | 0202 | 36FF | 0208 | 36FF | 0206 |
| 0000120220 | A89A | 009B | 8300 | 28C4 | 868B | F654 | 02E9 | E905 |
| 0000120240 | 0006 | DCB8 | E900 | 04F9 | 76FF | FF12 | F676 | 868D |
| 0000120260 | F656 | 5016 | B6FF | F64C | B6FF | F64A | 068E | 31A4 |
| 0000120300 | FF26 | 2236 | 260F | 36FF | 0F20 | 7C9A | 839F | 8396 |
| 0000120320 | 10C4 | 4689 | 83F4 | F47E | 7500 | E903 | 0111 | 76FF |
| 0000120340 | FF08 | 0676 | 76FF | 8DF8 | 8486 | 16FE | 9A50 | 9ADA |
| 0000120360 | 0000 | 068E | 31A4 | FF26 | 2236 | 260F | 36FF | 0F20 |
| 0000120400 | 76FF | 8DF6 | 5686 | 16F6 | 9A50 | 9C1B | 0000 | 068E |
| 0000120420 | 31A0 | 8326 | 3F3E | 009B | 0375 | 4BE9 | 8300 | 52BE |
| 0000120440 | FEF6 | 0375 | 41E9 | FF00 | F476 | 681E | 08EF | 868D |
| 0000120460 | F65E | 5016 | 468D | 16F0 | 8D50 | 4E86 | 16F6 | 1E50 |
| 0000120500 | 5868 | 6809 | 057C | 36FF | 0204 | 36FF | 0202 | 36FF |
| 0000120520 | 0208 | 36FF | 0206 | 681E | 090D | DE68 | 6895 | 95E1 |
| 0000120540 | E49A | 0095 | 8300 | 28C4 | 068E | 31A0 | 8326 | 973E |
| 0000120560 | 0095 | 0375 | 0AE9 | 8300 | 52BE | FEF6 | 0374 | 0FE9 |
| 0000120600 | 8E00 | A206 | 2631 | 3E83 | 951D | 7500 | E903 | 0059 |
| 0000120620 | 468B | 89F4 | 5486 | FFF6 | 5CB6 | FFF6 | 5AB6 | 8DF6 |
| 0000120640 | 5486 | 16F6 | FF50 | 80B6 | FFFE | FC76 | 76FF | 8DFA |
| 0000120660 | 5E8E | 16F6 | 8D51 | F04E | 5116 | 8E8D | F64E | 5116 |
| 0000120700 | 681E | 0958 | 7D68 | FF05 | 0436 | FF02 | 0236 | FF02 |
| 0000120720 | 0836 | FF02 | 0636 | 9A02 | 956E | 0000 | C483 | 8B28 |
| 0000120740 | 5486 | E9F6 | 03BB | 06E9 | 8B00 | F446 | B2E9 | FF03 |
| 0000120760 | 0876 | 76FF | FF06 | F876 | 868D | F66C | 5016 | EF9A |
| 0000121000 | 009B | 8900 | 8286 | 8EFE | A406 | 2631 | 36FF | 0F22 |
| 0000121020 | FF26 | 2036 | FF0F | F676 | 868D | EE3A | 5016 | 2C9A |
| 0000121040 | 0094 | 8900 | 6A86 | 83F6 | 82BE | 00FE | 0374 | 0AE9 |
| 0000121060 | 8300 | 6ABE | 00F6 | 0375 | 0CE9 | FF02 | 0876 | 76FF |

THU MAR 14 17:25:16 1991 CRV_IPS.DLL PAGE 45, LINE 2597

| | | | | | | | | |
|---|---|---|---|---|---|---|---|---|
| 0000121100 | FF06 | F876 | 868D | FE84 | 5016 | 379A | 009C | 8E00 |
| 0000121120 | A406 | 2631 | 36FF | 0F22 | FF26 | 2036 | FF0F | F676 |
| 0000121140 | 868D | F656 | 5016 | 9B9A | 0096 | 8300 | 82BE | 00FE |
| 0000121160 | 0375 | E4E9 | 8E00 | A006 | 2631 | 3E83 | 9CA7 | 7500 |
| 0000121200 | E903 | 004C | BE83 | F652 | 75FE | E903 | 0042 | B6FF |
| 0000121220 | FE82 | 681E | 0915 | 868D | F65E | 5016 | 468D | 16F0 |
| 0000121240 | 8D50 | 4E86 | 16F6 | 1E50 | 5868 | 6809 | 058A | 36FF |
| 0000121260 | 0204 | 36FF | 0202 | 36FF | 0208 | 36FF | 0206 | 681E |
| 0000121300 | 092E | 8168 | 689D | 9D84 | 879A | 009D | 8300 | 28C4 |
| 0000121320 | 068E | 31A0 | 8326 | 3A3E | 009D | 0375 | 0AE9 | 8300 |
| 0000121340 | 52BE | FEF6 | 0374 | 0FE9 | 8E00 | A206 | 2631 | 3E83 |
| 0000121360 | 9DAE | 7500 | E903 | 005A | 868B | FE82 | 8689 | F654 |
| 0000121400 | B6FF | F65C | B6FF | F65A | 868D | F654 | 5016 | B6FF |
| 0000121420 | FE80 | 76FF | FFFC | FA76 | 8E8D | F65E | 5116 | 4E8D |
| 0000121440 | 16F0 | 8D51 | 4E8E | 16F6 | 1E51 | 5868 | 6809 | 058B |
| 0000121460 | 36FF | 0204 | 36FF | 0202 | 36FF | 0208 | 36FF | 0206 |
| 0000121500 | FF9A | 009D | 8300 | 28C4 | 868B | F654 | 52E9 | E902 |
| 0000121520 | 0007 | 868B | FE82 | 48E9 | 8302 | 6ABE | 00F6 | 0375 |
| 0000121540 | E4E9 | 8E00 | A006 | 2631 | 3E83 | 9D95 | 7500 | E903 |
| 0000121560 | 004C | BE83 | F652 | 75FE | E903 | 0042 | B6FF | F66A |
| 0000121600 | 681E | 0936 | 868D | F65E | 5016 | 468D | 16F0 | 8D50 |
| 0000121620 | 4E86 | 16F6 | 1E50 | 5868 | 6809 | 058F | 36FF | 0204 |
| 0000121640 | 36FF | 0202 | 36FF | 0208 | 36FF | 0206 | 681E | 094F |
| 0000121660 | E768 | 6898 | 98EA | ED9A | 0098 | 8300 | 28C4 | 068E |
| 0000121700 | 31A0 | 8326 | 6B3E | 009E | 0375 | 0AE9 | 8300 | 52BE |
| 0000121720 | FEF6 | 0374 | 0FE9 | 8E00 | A206 | 2631 | 3E83 | 9E84 |
| 0000121740 | 7500 | E903 | 005A | 868B | F66A | 8689 | F654 | B6FF |
| 0000121760 | F65C | B6FF | F65A | 868D | F654 | 5016 | B6FF | FE80 |
| 0000122000 | 76FF | FFFC | FA76 | 8E8D | F65E | 5116 | 4E8D | 16F0 |
| 0000122020 | 8D51 | 4E8E | 16F6 | 1E51 | 5868 | 6809 | 0590 | 36FF |
| 0000122040 | 0204 | 36FF | 0202 | 36FF | 0208 | 36FF | 0206 | D49A |
| 0000122060 | 009E | 8300 | 28C4 | 868B | F654 | 64E9 | E901 | 0007 |
| 0000122100 | 868B | F66A | 5AE9 | 8D01 | 3A86 | 16EE | 8D50 | 6C86 |
| 0000122120 | 16F6 | 9A50 | 5A63 | 9A9D | C483 | 8908 | F446 | 76FF |
| 0000122140 | FF08 | 0676 | 76FF | 8DF8 | 8486 | 16FE | 9A50 | 9E5A |
| 0000122160 | 0000 | 068E | 31A4 | FF26 | 2236 | 260F | 36FF | 0F20 |
| 0000122200 | 76FF | 8DF6 | 5686 | 16F6 | 9A50 | 99D2 | 0000 | 06C7 |
| 0000122220 | 360A | 0001 | 068E | 31A0 | 8326 | F23E | 009E | 0375 |
| 0000122240 | 0AE9 | 8300 | 52BE | FEF6 | 0374 | 0FE9 | 8E00 | A206 |
| 0000122260 | 2631 | 3E83 | 9F0B | 7500 | E903 | 0059 | 468B | 89F4 |
| 0000122300 | 5486 | FFF6 | 5CB6 | FFF6 | 5AB6 | 8DF6 | 5486 | 16F6 |
| 0000122320 | FF50 | 80B6 | FFFE | FC76 | 76FF | 8DFA | 5E8E | 16F6 |
| 0000122340 | 8D51 | F04E | 5116 | 8E8D | F64E | 5116 | 681E | 0958 |
| 0000122360 | 9968 | FF05 | 0436 | FF02 | 0236 | FF02 | 0836 | FF02 |
| 0000122400 | 0636 | 9A02 | 9F5A | 0000 | C483 | 8B28 | 5486 | E9F6 |
| 0000122420 | 008F | 06E9 | 8B00 | F446 | 86E9 | 8E00 | A006 | 2631 |
| 0000122440 | 3E83 | 98FB | 7500 | E903 | 000A | BE83 | F652 | 74FE |
| 0000122460 | E903 | 000F | 068E | 31A2 | 8326 | 143E | 0099 | 0375 |
| 0000122500 | 58E9 | C700 | 5486 | 00F6 | FF00 | 5CB6 | FFF6 | 5AB6 |
| 0000122520 | 8DF6 | 5486 | 16F6 | FF50 | 80B6 | FFFE | FC76 | 76FF |
| 0000122540 | 8DFA | 5E8E | 16F6 | 8D51 | F04E | 5116 | 8E8D | F64E |
| 0000122560 | 5116 | 681E | 0958 | 9D68 | FF05 | 0436 | FF02 | 0236 |
| 0000122600 | FF02 | 0836 | FF02 | 0636 | 9A02 | 9965 | 0000 | C483 |
| 0000122620 | 8B28 | 5486 | E9F6 | 0009 | 06E9 | B800 | 0000 | 00E9 |
| 0000122640 | 5E00 | 835F | 02ED | E58B | 5D1F | CB4D | 581E | 4590 |
| 0000122660 | 8B55 | 1EEC | D88E | EC81 | 003C | 5657 | 46C7 | 6FF8 |
| 0000122700 | 8C09 | FA5E | 46C7 | 01E2 | 2B01 | 89C0 | D446 | 4689 |
| 0000122720 | 8ED2 | A006 | 2631 | 3E83 | A102 | 7500 | E903 | 001D |
| 0000122740 | 36FF | 0208 | 36FF | 0206 | 468D | 16C8 | 9A50 | 8D4C |

THU MAR 14 17:25:16 1991 CRV_IPS.DLL PAGE 46, LINE 2656

| | | | | | | | | |
|---|---|---|---|---|---|---|---|---|
| 0000122760 | 0000 | C483 | 3D08 | 0000 | 0374 | 0FE9 | 8E00 | A206 |
| 0000123000 | 2631 | 3E83 | A171 | 7500 | E903 | 003B | 681E | 0973 |
| 0000123020 | 468D | 16D6 | 8D50 | C846 | 5016 | 468D | 16F2 | 6850 |
| 0000123040 | 05AD | 681E | 09E2 | 36FF | 0204 | 36FF | 0202 | 36FF |
| 0000123060 | 0208 | 36FF | 0206 | 979A | 008D | 8300 | 1EC4 | 4689 |
| 0000123100 | 89F2 | F456 | 08E9 | 2B00 | 89C0 | F446 | 4689 | C4F2 |
| 0000123120 | 0A5E | 8B26 | 5847 | 4689 | C4E6 | 0A5E | 8B26 | 5A47 |
| 0000123140 | 4689 | C4E8 | 0A5E | 8B26 | 5E47 | 4603 | 48E6 | 4689 |
| 0000123160 | C4EA | 0A5E | 8B26 | 6047 | 4603 | 48E8 | 4689 | 8EEC |
| 0000123200 | A406 | 2631 | 2CA1 | 480F | D22B | F726 | 2E36 | 400F |
| 0000123220 | 4689 | C4FC | 0A5E | 8B26 | 6247 | C448 | 0A5E | D22B |
| 0000123240 | F726 | 6477 | 6A40 | 5000 | 5EC4 | 260A | 77FF | 266E |
| 0000123260 | 77FF | 9A6C | A0F6 | A0A7 | 4689 | 89EE | F056 | 46C7 |
| 0000123300 | 00D0 | E900 | 0003 | 46FF | 8BD0 | FC46 | 4639 | 72D0 |
| 0000123320 | E903 | 039C | EC9A | D09D | 89A0 | C446 | 5689 | FFC6 |
| 0000123340 | 0876 | 76FF | FF06 | 1276 | 76FF | C4D0 | 0E5E | FF26 |
| 0000123360 | 0277 | FF26 | 9A37 | 8100 | 0000 | 4689 | 9AE4 | 9DEC |
| 0000123400 | A1D3 | 462B | 1BC4 | C656 | 4689 | 89C4 | C656 | 7E83 |
| 0000123420 | 00E4 | 0375 | E9E9 | FF00 | 0876 | 76FF | FF06 | 1276 |
| 0000123440 | 76FF | FF10 | 0E76 | 579A | 00A2 | 8E00 | A006 | 2631 |
| 0000123460 | 3E83 | A159 | 7500 | E903 | 0048 | 7E83 | FECC | 0375 |
| 0000123500 | 3FE9 | FF00 | E476 | 681E | 0977 | 468D | 16D6 | 8D50 |
| 0000123520 | F246 | 5016 | 468D | 16C8 | 1E50 | E268 | 6809 | 05CB |
| 0000123540 | 36FF | 0204 | 36FF | 0202 | 36FF | 0208 | 36FF | 0206 |
| 0000123560 | 681E | 0992 | A568 | 68A2 | A2A8 | AB9A | 00A2 | 8300 |
| 0000123600 | 28C4 | 068E | 31A0 | 8326 | 623E | 00A2 | 0375 | 09E9 |
| 0000123620 | 8300 | CC7E | 74FE | E903 | 000F | 068E | 31A2 | 8326 |
| 0000123640 | D13E | 00A2 | 0375 | 51E9 | 8B00 | E446 | 4689 | FFCE |
| 0000123660 | D476 | 76FF | 8DD2 | CE46 | 5016 | 76FF | FFE2 | FA76 |
| 0000123700 | 76FF | 8DF8 | D64E | 5116 | 4E8D | 16F2 | 8D51 | C84E |
| 0000123720 | 5116 | 681E | 09E2 | CC68 | FF05 | 0436 | FF02 | 0236 |
| 0000123740 | FF02 | 0836 | FF02 | 0636 | 9A02 | A319 | 0000 | C483 |
| 0000123760 | 8B28 | CE46 | F6E9 | E902 | 0006 | 468B | E9E4 | 02ED |
| 0000124000 | EC9A | 309D | 89A2 | C446 | 5689 | 83C6 | 147E | 7400 |
| 0000124020 | E903 | 0026 | 468D | 16E6 | FF50 | D076 | 76FF | FFF0 |
| 0000124040 | EE76 | 5EC4 | 260E | 77FF | 2602 | 37FF | D39A | 2571 |
| 0000124060 | 83A2 | 0EC4 | 4689 | E9F6 | 0023 | 468D | 16E6 | FF50 |
| 0000124100 | D076 | 76FF | FFF0 | EE76 | 5EC4 | 260E | 77FF | 2602 |
| 0000124120 | 37FF | 599A | 2674 | 839E | 0EC4 | 4689 | 9AF6 | 9DEC |
| 0000124140 | 8AA9 | 462B | 1BC4 | C656 | 4689 | 89C4 | C656 | 7E83 |
| 0000124160 | 00F6 | 0375 | E8E9 | FF00 | 0876 | 76FF | FF06 | 1276 |
| 0000124200 | 76FF | FF10 | 0E76 | 3E9A | 009E | 8E00 | A006 | 2631 |
| 0000124220 | 3E83 | A2B9 | 7500 | E903 | 0048 | 7E83 | FECC | 0375 |
| 0000124240 | 3FE9 | FF00 | F676 | 681E | 099A | 468D | 16D6 | 8D50 |
| 0000124260 | F246 | 5016 | 468D | 16C8 | 1E50 | E268 | 6809 | 05DD |
| 0000124300 | 36FF | 0204 | 36FF | 0202 | 36FF | 0208 | 36FF | 0206 |
| 0000124320 | 681E | 09B6 | 9368 | 689C | 9C96 | 999A | 009C | 8300 |
| 0000124340 | 28C4 | 068E | 31A0 | 8326 | 4C3E | 009C | 0375 | 09E9 |
| 0000124360 | 8300 | CC7E | 74FE | E903 | 000F | 068E | 31A2 | 8326 |
| 0000124400 | C03E | 009C | 0375 | 50E9 | C700 | CE46 | FFEF | 76FF |
| 0000124420 | FFD4 | D276 | 468D | 16CE | FF50 | E276 | 76FF | FFFA |
| 0000124440 | F876 | 4E8D | 16D6 | 8D51 | F24E | 5116 | 4E8D | 16C8 |
| 0000124460 | 1E51 | E268 | 6809 | 05DE | 36FF | 0204 | 36FF | 0202 |
| 0000124500 | 36FF | 0208 | 36FF | 0206 | 119A | 009D | 8300 | 28C4 |
| 0000124520 | 468B | E9CE | 0197 | 06E9 | B800 | FFEF | 8EE9 | FF01 |
| 0000124540 | 0876 | 76FF | FF06 | 1276 | 006A | 76FF | FFD0 | 1076 |
| 0000124560 | 76FF | 9A0E | 8472 | 0000 | 4689 | 83E4 | E47E | 7500 |
| 0000124600 | E903 | 00E9 | 76FF | FF08 | 0676 | 76FF | FF12 | 1076 |
| 0000124620 | 76FF | 9A0E | A0F7 | 0000 | 068E | 31A0 | 8326 | C63E |

THU MAR 14 17:25:16 1991 CRV_IPS.DLL PAGE 47, LINE 2715

| | | | | | | | | |
|---|---|---|---|---|---|---|---|---|
| 0000124640 | 00A3 | 0375 | 48E9 | 8300 | CC7E | 75FE | E903 | 003F |
| 0000124660 | 76FF | 1EE4 | BE68 | 8D09 | D646 | 5016 | 468D | 16F2 |
| 0000124700 | 8D50 | C846 | 5016 | 681E | 09E2 | E668 | FF05 | 0436 |
| 0000124720 | FF02 | 0236 | FF02 | 0836 | FF02 | 0636 | 1E02 | DA68 |
| 0000124740 | 6809 | A145 | 4868 | 9AA1 | A14B | 0000 | C483 | 8E28 |
| 0000124760 | A006 | 2631 | 3E83 | A447 | 7500 | E903 | 0009 | 7E83 |
| 0000125000 | FECC | 0374 | 0FE9 | 8E00 | A206 | 2631 | 3E83 | A45F |
| 0000125020 | 7500 | E903 | 0051 | 468B | 89E4 | CE46 | 76FF | FFD4 |
| 0000125040 | D276 | 468D | 16CE | FF50 | E276 | 76FF | FFFA | F876 |
| 0000125060 | 4E8D | 16D6 | 8D51 | F24E | 5116 | 4E8D | 16C8 | 1E51 |
| 0000125100 | E268 | 6809 | 05E7 | 36FF | 0204 | 36FF | 0202 | 36FF |
| 0000125120 | 0208 | 36FF | 0206 | A79A | 00A4 | 8300 | 28C4 | 468B |
| 0000125140 | E9CE | 0089 | 06E9 | 8B00 | E446 | 80E9 | E900 | FC56 |
| 0000125160 | 068E | 31A0 | 8326 | A83E | 009F | 0375 | 09E9 | 8300 |
| 0000125200 | CC7E | 74FE | E903 | 000F | 068E | 31A2 | 8326 | D43E |
| 0000125220 | 009F | 0375 | 50E9 | C700 | CE46 | 0000 | 76FF | FFD4 |
| 0000125240 | D276 | 468D | 16CE | FF50 | E276 | 76FF | FFFA | F876 |
| 0000125260 | 4E8D | 16D6 | 8D51 | F24E | 5116 | 4E8D | 16C8 | 1E51 |
| 0000125300 | E268 | 6809 | 05EA | 36FF | 0204 | 36FF | 0202 | 36FF |
| 0000125320 | 0208 | 36FF | 0206 | BA9A | 00A1 | 8300 | 28C4 | 468B |
| 0000125340 | E9CE | 0009 | 06E9 | B800 | 0000 | 00E9 | 5E00 | 835F |
| 0000125360 | 02ED | E58B | 5D1F | CB4D | 581E | 4590 | 8B55 | 1EEC |
| 0000125400 | D88E | EC81 | 031A | 5657 | B81E | 78E4 | D88E | C02B |
| 0000125420 | 8689 | FCFA | 8689 | FCFB | 006A | 006A | 868D | FCF8 |
| 0000125440 | 5016 | 006A | 868D | FCFC | 5016 | 468D | 16FC | 9A50 |
| 0000125460 | FFFF | 0000 | 681E | 09FA | 868D | FDFC | 5016 | D29A |
| 0000125500 | 5991 | 83A5 | 08C4 | 868D | FDFC | 8689 | FCEC | 968C |
| 0000125520 | FCEE | B6FF | FCFA | B6FF | FCF8 | 046A | 681E | 09FE |
| 0000125540 | 868D | FCEC | 5016 | FF9A | 00FF | 8900 | EA86 | 3DFC |
| 0000125560 | 0001 | C01B | D8F7 | 003D | 7500 | E903 | 0018 | B6FF |
| 0000125600 | FCEE | B6FF | FCEC | 769A | 759E | 83A5 | 04C4 | 8689 |
| 0000125620 | FCEC | 9689 | FCEE | 681E | 0A14 | B6FF | FCEE | B6FF |
| 0000125640 | FCEC | 089A | 8692 | 83A0 | 08C4 | 003D | 7400 | E903 |
| 0000125660 | 000E | 068E | 31A8 | C726 | 0606 | 000F | E900 | 0035 |
| 0000125700 | 681E | 0A18 | B6FF | FCEE | B6FF | FCEC | 089A | 1192 |
| 0000125720 | 83A5 | 08C4 | 003D | 7400 | E903 | 000E | 068E | 31A8 |
| 0000125740 | C726 | 0606 | 010F | E900 | 000B | 068E | 31A8 | C726 |
| 0000125760 | 0606 | 020F | 8E00 | A806 | 2631 | 06C7 | 0F0C | 0000 |
| 0000126000 | B6FF | FCFA | B6FF | FCF8 | 016A | 681E | 0A1C | 868D |
| 0000126020 | FCF0 | 5016 | 289A | 00A6 | 8900 | EA86 | 3DFC | 0001 |
| 0000126040 | C01B | D8F7 | 003D | 7500 | E903 | 000C | 868B | FCF0 |
| 0000126060 | 068E | 31A8 | A326 | 0F0C | 068E | 31A8 | C726 | 0806 |
| 0000126100 | 000F | FF00 | FAB6 | FFFC | F8B6 | 6AFC | 1E01 | 2F68 |
| 0000126120 | 8D0A | F086 | 16FC | 9A50 | A66B | 0000 | 8689 | FCEA |
| 0000126140 | 013D | 1B00 | F7C0 | 3DD8 | 0000 | 0375 | 0CE9 | 8B00 |
| 0000126160 | F086 | 8EFC | A806 | 2631 | 08A3 | 8E0F | A806 | 2631 |
| 0000126200 | 06C7 | 0F0A | 0000 | B6FF | FCFA | B6FF | FCF8 | 016A |
| 0000126220 | 681E | 0A3E | 868D | FCF0 | 5016 | B59A | 00A6 | 8900 |
| 0000126240 | EA86 | 3DFC | 0001 | C01B | D8F7 | 003D | 7500 | E903 |
| 0000126260 | 000C | 868B | FCF0 | 068E | 31A8 | A326 | 0F0A | 068E |
| 0000126300 | 31A8 | C726 | 1006 | 050F | 2600 | 06C7 | 0F12 | 0000 |
| 0000126320 | B6FF | FCFA | B6FF | FCF8 | 016A | 681E | 0A56 | 868D |
| 0000126340 | FCF0 | 5016 | 089A | 00A7 | 8900 | EA86 | 3DFC | 0001 |
| 0000126360 | C01B | D8F7 | 003D | 7500 | E903 | 0015 | 868B | FCF0 |
| 0000126400 | 968B | FCF2 | 068E | 31A8 | A326 | 0F10 | 8926 | 1216 |
| 0000126420 | 8E0F | A806 | 2631 | 06C7 | 0F14 | 09C4 | C726 | 1606 |
| 0000126440 | 000F | FF00 | FAB6 | FFFC | F8B6 | 6AFC | 1E01 | 6568 |
| 0000126460 | 8D0A | F086 | 16FC | 9A50 | A75B | 0000 | 8689 | FCEA |
| 0000126500 | 013D | 1B00 | F7C0 | 3DD8 | 0000 | 0375 | 15E9 | 8B00 |

THU MAR 14 17:25:16 1991 CRV_IPS.DLL PAGE 48, LINE 2774

| | | | | | | | | |
|---|---|---|---|---|---|---|---|---|
| 0000126520 | F086 | 8BFC | F296 | 8EFC | A806 | 2631 | 14A3 | 260F |
| 0000126540 | 1689 | 0F16 | 068E | 31A8 | C726 | 1806 | C40F | 2609 |
| 0000126560 | 06C7 | 0F1A | 0000 | B6FF | FCFA | B6FF | FCF8 | 016A |
| 0000126600 | 681E | DA7A | 868D | FCF0 | 5016 | BB9A | 00A7 | 8900 |
| 0000126620 | EA86 | 3DFC | 0001 | C01B | D8F7 | 003D | 7500 | E903 |
| 0000126640 | 0015 | 868B | FCF0 | 968B | FCF2 | 068E | 31A8 | A326 |
| 0000126660 | 0F18 | 8926 | 1A16 | 8E0F | A806 | 2B31 | 26C0 | 1EA3 |
| 0000126700 | 260F | 1CA3 | 2B0F | 26C0 | 22A3 | 260F | 20A3 | 260F |
| 0000126720 | 06C7 | 0F28 | 0280 | B6FF | FCFA | B6FF | FCF8 | 016A |
| 0000126740 | 681E | 0A8C | 868D | FCF0 | 5016 | FE9A | 00A7 | 8900 |
| 0000126760 | EA86 | 3DFC | 0001 | C01B | D8F7 | 003D | 7500 | E903 |
| 0000127000 | 000C | 868B | FCF0 | 068E | 31A8 | A326 | 0F28 | 068E |
| 0000127020 | 31A8 | C726 | 2A06 | E00F | FF01 | FAB6 | FFFC | F8B6 |
| 0000127040 | 6AFC | 1E01 | 9B68 | 8D0A | F086 | 16FC | 9A50 | A841 |
| 0000127060 | 0000 | 8689 | FCEA | 013D | 1B00 | F7C0 | 3DD8 | 0000 |
| 0000127100 | 0375 | 0CE9 | 8B00 | F086 | 8EFC | A806 | 2631 | 2AA3 |
| 0000127120 | 8E0F | A806 | 2631 | 06C7 | 0F2C | 0004 | B6FF | FCFA |
| 0000127140 | B6FF | FCF8 | 016A | 681E | 0AAB | 868D | FCF0 | 5016 |
| 0000127160 | 849A | 00A8 | 8900 | EA86 | 3DFC | 0001 | C01B | D8F7 |
| 0000127200 | 003D | 7500 | E903 | 000C | 868B | FCF0 | 068E | 31A8 |
| 0000127220 | A326 | 0F2C | 068E | 31A8 | C726 | 2E06 | 040F | FF00 |
| 0000127240 | FAB6 | FFFC | F8B6 | 6AFC | 1E01 | BA68 | 8D0A | F086 |
| 0000127260 | 16FC | 9A50 | FFFF | 0000 | 8689 | FCEA | 013D | 1B00 |
| 0000127300 | F7C0 | 3DD8 | 0000 | 0375 | 0CE9 | 8B00 | F086 | 8EFC |
| 0000127320 | A806 | 2631 | 2EA3 | 8E0F | A806 | 2631 | 28A1 | 8E0F |
| 0000127340 | AA06 | 2631 | 44A3 | 8E0F | A806 | 2631 | 2AA1 | 8E0F |
| 0000127360 | AA06 | 2631 | 46A3 | 260F | 06C7 | 0F3C | 0000 | C726 |
| 0000127400 | 3E06 | 000F | BE00 | A806 | 2631 | 28A1 | 480F | 068E |
| 0000127420 | 31AA | A326 | 0F40 | 068E | 31A8 | A126 | 0F2A | 8E48 |
| 0000127440 | AA06 | 2631 | 42A3 | C70F | E886 | 03FC | FF00 | FAB6 |
| 0000127460 | FFFC | F8B6 | 6AFC | 1E01 | CD68 | 8D0A | E886 | 16FC |
| 0000127500 | 8D50 | F48E | 16FC | 9A51 | FFFF | 0000 | 8689 | FCEA |
| 0000127520 | BE83 | FCEA | 7400 | E903 | 000A | BE83 | FCE8 | 7203 |
| 0000127540 | E903 | 001C | 068E | 31A8 | C726 | 3006 | 400F | 2600 |
| 0000127560 | 06C7 | 0F32 | 0080 | C726 | 3406 | C00F | E900 | 005E |
| 0000127600 | 9EC4 | FCF4 | FF26 | 9A37 | B5C8 | A972 | C483 | 8E02 |
| 0000127620 | A806 | 2631 | 30A3 | C40F | F49E | 26FC | 77FF | 9A04 |
| 0000127640 | B5C8 | A98A | C483 | 8E02 | A806 | 2631 | 32A3 | C40F |
| 0000127660 | F49E | 26FC | 77FF | 9A08 | B5C8 | A1FF | C483 | 8E02 |
| 0000127700 | A806 | 2631 | 34A3 | FF0F | F6B6 | FFFC | F4B6 | 9AFC |
| 0000127720 | FFFF | 0000 | C02B | 8689 | FCF6 | 8689 | FCF4 | 068E |
| 0000127740 | 31A8 | C726 | 3606 | 5A0F | 265A | 06C7 | 0F38 | 5A5A |
| 0000127760 | B6FF | FCFA | B6FF | FCF8 | 006A | 681E | DADF | 868D |
| 0000130000 | FCF0 | 5016 | 219A | 00AA | 8900 | EAB6 | 3DFC | 0001 |
| 0000130020 | C01B | D8F7 | 003D | 7500 | E903 | 0015 | 868B | FCF0 |
| 0000130040 | 968B | FCF2 | 068E | 31A8 | A326 | 0F36 | 8926 | 3816 |
| 0000130060 | 8E0F | A806 | 2631 | 06C7 | 0F3A | 0000 | B6FF | FCFA |
| 0000130100 | B6FF | FCF8 | 036A | 681E | 0AEF | 868D | FCE6 | 5016 |
| 0000130120 | E59A | 00A5 | 8900 | EA86 | 83FC | EABE | 00FC | 0374 |
| 0000130140 | 0CE9 | 8B00 | E686 | 8EFC | A806 | 2631 | 3AA3 | FF0F |
| 0000130160 | FAB6 | FFFC | F8B6 | 6AFC | 9A00 | FFFF | 0000 | 5E1F |
| 0000130200 | 835F | 02ED | E58B | 5D1F | CB4D | 581E | 4590 | 8B55 |
| 0000130220 | 1EEC | D88E | EC81 | 0004 | 5657 | B81E | A4DA | D88E |
| 0000130240 | 149A | 7BCC | 89AA | FC46 | A19A | A2E2 | 89AA | FC46 |
| 0000130260 | 068E | 31A8 | A126 | 0F2C | D22B | F726 | 2E36 | 3D0F |
| 0000130300 | 0003 | 0374 | 08E9 | 9A00 | B019 | A95A | 4689 | 9AFC |
| 0000130320 | E32E | AAB0 | 4689 | FFFC | 0876 | 76FF | 9A06 | DC79 |
| 0000130340 | A59F | C483 | 8904 | FC46 | 468B | E9FC | 0000 | 5E1F |
| 0000130360 | 835F | 02ED | E58B | 5D1F | CA4D | 0004 | 581E | 4590 |

THU MAR 14 17:25:16 1991  CRV_IPS.DLL  PAGE 49, LINE 2833

| | | | | | | | | |
|---|---|---|---|---|---|---|---|---|
| 0000130400 | 8B55 | 1EEC | D88E | EC81 | 0008 | 5657 | 46C7 | 1DFC |
| 0000130420 | 9A00 | E2A1 | AAF9 | 4689 | 68F8 | 0400 | 0068 | 6A01 |
| 0000130440 | 8D02 | FC46 | 5016 | 299A | 24CF | 83AB | 0AC4 | 7E83 |
| 0000130460 | 0006 | 0375 | 08E9 | C700 | FA46 | 0043 | 05E9 | C700 |
| 0000130500 | FA46 | 004F | 0068 | 6804 | 4000 | 026A | 468D | 16FA |
| 0000130520 | 9A50 | CF29 | AB2C | C483 | 9A0A | E32E | AA73 | 4689 |
| 0000130540 | 8BF8 | F846 | 00E9 | 5E00 | 835F | 02ED | E58B | 5D1F |
| 0000130560 | CB4D | 581E | 4590 | 8B55 | 1EEC | D88E | EC81 | 0004 |
| 0000130600 | 5657 | B81E | AA6C | D88E | 549A | E4CC | 89AA | FC46 |
| 0000130620 | 468B | E9FC | 0000 | 5E1F | 835F | 02ED | E58B | 5D1F |
| 0000130640 | CB4D | 581E | 4590 | 8B55 | 1EEC | D88E | EC81 | 034C |
| 0000130660 | 5657 | B81E | AB54 | D88E | BE68 | 68AB | 309C | FF9A |
| 0000130700 | 00FF | 6A00 | 6A00 | 6A00 | 6A00 | 9A5A | E12C | AB5B |
| 0000130720 | C483 | 8908 | EC86 | 83FC | ECBE | 00FC | 0375 | 06E9 |
| 0000130740 | B800 | FFEF | 56E9 | C704 | F686 | 88FE | 6813 | AB84 |
| 0000130760 | 9C68 | 8B30 | F686 | 99FE | 5052 | FF9A | 00FF | 8900 |
| 0000131000 | EC86 | 83FC | ECBE | 00FC | 0375 | 19E9 | 8300 | ECBE |
| 0000131020 | 79FC | 0374 | 09E9 | B800 | FFEF | 20E9 | E904 | 0006 |
| 0000131040 | FFB8 | E9FF | 0417 | 006A | 006A | 006A | E89A | 21E1 |
| 0000131060 | 83AE | 06C4 | 8689 | FCEC | BE83 | FCEC | 7504 | E903 |
| 0000131100 | 0006 | EFB8 | E9FF | 03F5 | C02B | 8689 | FEFA | 8689 |
| 0000131120 | FEF8 | 006A | 006A | 868D | FEF8 | 5016 | 006A | 868D |
| 0000131140 | FEFC | 5016 | 468D | 16FC | 9A50 | A500 | 0000 | 86C7 |
| 0000131160 | FCB4 | 0018 | B6FF | FEFA | B6FF | FEF8 | 016A | 681E |
| 0000131200 | 0B03 | 868D | FCF2 | 5016 | 939A | 00AC | 8900 | EC86 |
| 0000131220 | 3DFC | 0001 | C01B | D8F7 | 003D | 7500 | E903 | 0008 |
| 0000131240 | 868B | FCF2 | 8689 | FCB4 | 86C7 | FCB6 | 0000 | B6FF |
| 0000131260 | FEFA | B6FF | FEF8 | 016A | 681E | 0B13 | 868D | FCF2 |
| 0000131300 | 5016 | CD9A | 00AC | 8900 | EC86 | 3DFC | 0001 | C01B |
| 0000131320 | D8F7 | 003D | 7500 | E903 | 0008 | 868B | FCF2 | 8689 |
| 0000131340 | FCB6 | 86C7 | FCB8 | 0030 | B6FF | FEFA | B6FF | FEF8 |
| 0000131360 | 016A | 681E | 0B23 | 868D | FCF2 | 5016 | 079A | 00AD |
| 0000131400 | 8900 | EC86 | 3DFC | 0001 | C01B | D8F7 | 003D | 7500 |
| 0000131420 | E903 | 0008 | 868B | FCF2 | 8689 | FCB8 | 86C7 | FCBA |
| 0000131440 | 0108 | B6FF | FEFA | B6FF | FEF8 | 016A | 681E | 0B33 |
| 0000131460 | 868D | FCF2 | 5016 | 419A | 00AD | 8900 | EC86 | 3DFC |
| 0000131500 | 0001 | C01B | D8F7 | 003D | 7500 | E903 | 0008 | 868B |
| 0000131520 | FCF2 | 8689 | FCBA | 86C7 | FCBC | 0020 | B6FF | FEFA |
| 0000131540 | B6FF | FEF8 | 016A | 681E | 0B43 | 868D | FCF2 | 5016 |
| 0000131560 | 7B9A | 00AD | 8900 | EC86 | 3DFC | 0001 | C01B | D8F7 |
| 0000131600 | 003D | 7500 | E903 | 0008 | 868B | FCF2 | 8689 | FCBC |
| 0000131620 | 86C7 | FCBE | 0202 | B6FF | FEFA | B6FF | FEF8 | 016A |
| 0000131640 | 681E | 0B53 | 868D | FCF2 | 5016 | B59A | 00AD | 8900 |
| 0000131660 | EC86 | 3DFC | 0001 | C01B | D8F7 | 003D | 7500 | E903 |
| 0000131700 | 0008 | 868B | FCF2 | 8689 | FCBE | 86C7 | FCC0 | 0028 |
| 0000131720 | B6FF | FEFA | B6FF | FEF8 | 016A | 681E | 0B63 | 868D |
| 0000131740 | FCF2 | 5016 | EF9A | 00AD | 8900 | EC86 | 3DFC | 0001 |
| 0000131760 | C01B | D8F7 | 003D | 7500 | E903 | 0008 | 868B | FCF2 |
| 0000132000 | 8689 | FCC0 | 86C7 | FCC2 | 0005 | B6FF | FEFA | B6FF |
| 0000132020 | FEF8 | 016A | 681E | 0B72 | 868D | FCF2 | 5016 | D59A |
| 0000132040 | 00A9 | 8900 | EC86 | 3DFC | 0001 | C01B | D8F7 | 003D |
| 0000132060 | 7500 | E903 | 0008 | 868B | FCF2 | 8689 | FCC2 | 86C7 |
| 0000132100 | FCEA | 0000 | 681E | 0B87 | 868D | FCF6 | 5016 | D29A |
| 0000132120 | 6991 | 83AE | 08C4 | 868D | FCF6 | 8689 | FCEE | 968C |
| 0000132140 | FCF0 | B6FF | FEFA | B6FF | FEF8 | 046A | 681E | 0B8B |
| 0000132160 | 868D | FCEE | 5016 | 379A | 00A5 | 8900 | EC86 | 3DFC |
| 0000132200 | 0001 | C01B | D8F7 | 003D | 7500 | E903 | 0018 | B6FF |
| 0000132220 | FCF0 | B6FF | FCEE | 769A | 859E | 83AE | 04C4 | 8689 |
| 0000132240 | FCEE | 9689 | FCF0 | 681E | 0B9F | B6FF | FCF0 | B6FF |

THU MAR 14 17:25:16 1991 CRV_IPS.DLL PAGE 50, LINE 2892

| | | | | | | | | |
|---|---|---|---|---|---|---|---|---|
| 0000132260 | FCEE | 089A | 9E92 | 83AB | 08C4 | 003D | 7400 | E903 |
| 0000132300 | 0006 | 86C7 | FCEA | 0001 | B6FF | FEFA | B6FF | FEF8 |
| 0000132320 | 006A | 4A9A | 00AA | 8E00 | A806 | 2631 | 2EA1 | C10F |
| 0000132340 | 04E0 | C92B | 068E | 31AC | 8926 | A40E | 2630 | A6A3 |
| 0000132360 | 8930 | C48E | 89FC | C686 | 8EFC | A806 | 2631 | 2EA1 |
| 0000132400 | 890F | C886 | 26FC | 28A1 | 890F | CA86 | 26FC | 2AA1 |
| 0000132420 | 890F | CC86 | 26FC | 2CA1 | 890F | CE86 | 26FC | 14A1 |
| 0000132440 | 260F | 168B | 0F16 | 8689 | FCD0 | 9689 | FCD2 | A126 |
| 0000132460 | 0F18 | 8B26 | 1A16 | 890F | D486 | 89FC | D696 | 26FC |
| 0000132500 | 10A1 | 260F | 168B | 0F12 | 8689 | FCD8 | 9689 | FCDA |
| 0000132520 | A126 | 0F10 | 8B26 | 1216 | 890F | DC86 | 89FC | DE96 |
| 0000132540 | 26FC | 08A1 | 890F | E086 | 26FC | 0AA1 | 890F | E286 |
| 0000132560 | 26FC | 0CA1 | 890F | E486 | 26FC | 36A1 | 260F | 168B |
| 0000132600 | 0F38 | 8689 | FCE6 | 9689 | FCE8 | 006A | 006A | 006A |
| 0000132620 | 386A | 868D | FCB4 | 5016 | 006A | DD9A | 87DF | 83AF |
| 0000132640 | 0EC4 | 8689 | FCEC | BE83 | FCEC | 7500 | E903 | 0012 |
| 0000132660 | 681E | 0BA2 | 829A | B275 | 83AF | 04C4 | EFB8 | E9FF |
| 0000132700 | 007B | 4C9A | D8B6 | 89AF | EC86 | 83FC | ECBE | 00FC |
| 0000132720 | 0375 | 06E9 | B800 | FFEF | 62E9 | 1E00 | B268 | 9A0B |
| 0000132740 | 942C | AFF1 | C483 | 0B04 | 74D0 | E903 | 0030 | 068E |
| 0000132760 | 31A8 | A126 | 0F2C | D22B | F726 | 2E36 | 3D0F | 0003 |
| 0000133000 | 0375 | 19E9 | 9A00 | B019 | AA9A | 86B9 | FCEC | BE83 |
| 0000133020 | FCEC | 7500 | E903 | 0006 | EFB8 | E9FF | 001F | A79A |
| 0000133040 | FFCC | 89AB | EC86 | 83FC | ECBE | 00FC | 0375 | 06E9 |
| 0000133060 | B800 | FFEF | 06E9 | B800 | 0000 | 00E9 | 1F00 | 5F5E |
| 0000133100 | ED83 | 8B02 | 1FE5 | 4D5D | 1ECB | 9058 | 5545 | EC8B |
| 0000133120 | 8E1E | 81D8 | 20EC | 570D | 8E56 | A806 | 2631 | 2CA1 |
| 0000133140 | 2B0F | 26D2 | 36F7 | 0F2E | 033D | 7500 | E903 | 0241 |
| 0000133160 | 86C7 | F2E2 | 0300 | C02B | 8689 | F8F8 | 8689 | F8F6 |
| 0000133200 | 006A | 006A | 868D | F8F6 | 5016 | 006A | 868D | F8FA |
| 0000133220 | 5016 | 468D | 16FA | 9A50 | AC3A | 0000 | B6FF | F8F8 |
| 0000133240 | B6FF | F8F6 | 016A | 681E | 0BBD | 868D | F2E2 | 5016 |
| 0000133260 | 868D | F2E8 | 5016 | 189A | 00A9 | 8900 | EE86 | 3DF2 |
| 0000133300 | 0001 | C01B | D8F7 | 003D | 7500 | E903 | 004D | BE81 |
| 0000133320 | F2E2 | 0300 | 0374 | 3FE9 | C700 | F086 | 00F2 | E900 |
| 0000133340 | 0004 | 86FF | F2F0 | BE81 | F2F0 | 0300 | 0372 | 1BE9 |
| 0000133360 | 8B00 | F09E | C1F2 | 02E3 | B6C4 | F2E8 | 8B26 | 8B00 |
| 0000133400 | F0B6 | D1F2 | 89E6 | FA82 | E9F9 | FFD6 | 681E | 0BCA |
| 0000133420 | 829A | 4975 | 83B1 | 04C4 | 63E9 | C700 | F086 | 00F2 |
| 0000133440 | E900 | 0004 | 86FF | F2F0 | BE81 | F2F0 | 0100 | 0372 |
| 0000133460 | 3FE9 | 8B00 | F086 | 8BF2 | F0B6 | 8BF2 | D1CE | 03E6 |
| 0000133500 | D1F1 | 89E6 | FA82 | 8BF9 | F086 | 8BF2 | F0B6 | 8BF2 |
| 0000133520 | D1CE | 03E6 | D1F1 | 89E6 | FC82 | 8BF9 | F086 | 8BF2 |
| 0000133540 | F0B6 | 8BF2 | D1CE | 03E6 | D1F1 | 89E6 | FE82 | E9F9 |
| 0000133560 | FFB2 | 681E | 0BF7 | 829A | FC75 | 83B1 | 04C4 | B6FF |
| 0000133600 | F8F8 | B6FF | F8F6 | 006A | A39A | 00AE | FF00 | EAB6 |
| 0000133620 | FFF2 | E8B6 | 9AF2 | A9A0 | 0000 | C02B | 8689 | F2EA |
| 0000133640 | 8689 | F2E8 | 86C7 | F2F0 | 0000 | 04E9 | FF00 | F086 |
| 0000133660 | 81F2 | F0BE | 00F2 | 7201 | E903 | 004F | 86C7 | F2EC |
| 0000133700 | 0000 | 04E9 | FF00 | EC86 | 83F2 | ECBE | 03F2 | 0372 |
| 0000133720 | 35E9 | FF00 | F0B6 | 9AF2 | B5C8 | AF95 | C483 | 8B02 |
| 0000133740 | 8BF0 | D1C6 | 03E6 | 03F0 | ECB6 | D1F2 | 8BE6 | F0BE |
| 0000133760 | 8BF2 | D1C7 | 03E7 | 03F8 | ECBE | D1F2 | 8BE7 | FA83 |
| 0000134000 | 89F9 | F282 | E9F2 | FFBD | A2E9 | C7FF | E486 | 00F2 |
| 0000134020 | C706 | E686 | 00F2 | 6A00 | 8D04 | F286 | 16F8 | 6A50 |
| 0000134040 | 8D04 | E486 | 16F2 | 6A50 | 9A05 | DFDD | B22A | C483 |
| 0000134060 | 890E | EE86 | 83F2 | EEBE | 00F2 | 0375 | 06E9 | B800 |
| 0000134100 | FFEF | A8E9 | FF03 | F4B6 | FFF8 | F2B6 | FFF8 | E4B6 |
| 0000134120 | 8DF2 | F286 | 16F2 | 9A50 | CF29 | B242 | C483 | 6A0A |

THU MAR 14 17:25:16 1991 CRV_IPS.DLL PAGE 51, LINE 2951

| | | | | | | | | |
|---|---|---|---|---|---|---|---|---|
| 0000134140 | 6A00 | 6A00 | 6A00 | 8D04 | F286 | 16F8 | 6A50 | 9A0B |
| 0000134160 | DFDD | AF6D | C483 | 890E | EE86 | 83F2 | EEBE | 00F2 |
| 0000134200 | 0375 | 06E9 | B800 | FFEF | 62E9 | 6A03 | 6A00 | 6A00 |
| 0000134220 | 6A00 | 8D04 | F286 | 16F8 | 6A50 | 9A06 | DFDD | B0E3 |
| 0000134240 | C483 | 890E | EE86 | 8BF2 | EE86 | E9F2 | 033F | 3CE9 |
| 0000134260 | C703 | E086 | 1CF2 | C700 | E286 | 1DF2 | C700 | E486 |
| 0000134300 | 1EF2 | C700 | E886 | 1FF2 | 6800 | 0400 | 0068 | 6A01 |
| 0000134320 | 8D02 | E086 | 16F2 | 9A50 | CF29 | B2C5 | C483 | C70A |
| 0000134340 | EC86 | 04F2 | 6800 | 0500 | 006A | 026A | 868D | F2EC |
| 0000134360 | 5016 | 299A | 23CF | 83B2 | 0AC4 | 0068 | 6804 | 0100 |
| 0000134400 | 026A | 868D | F2E2 | 5016 | 299A | F6CF | 83B2 | 0AC4 |
| 0000134420 | 86C7 | F2EC | 00FF | 0068 | 6A05 | 6A00 | 8D02 | EC86 |
| 0000134440 | 16F2 | 9A50 | CF29 | B30C | C483 | 680A | 0400 | 0068 |
| 0000134460 | 6A01 | 8D02 | E086 | 16F2 | 9A50 | CF29 | B327 | C483 |
| 0000134500 | C70A | EC86 | 05F2 | 6800 | 0500 | 006A | 026A | 868D |
| 0000134520 | F2EC | 5016 | 299A | 3DCF | 83B3 | 0AC4 | 0068 | 6804 |
| 0000134540 | 0100 | 026A | 868D | F2E2 | 5016 | 299A | 58CF | 83B3 |
| 0000134560 | 0AC4 | 86C7 | F2EC | 0000 | 0068 | 6A05 | 6A00 | 8D02 |
| 0000134600 | EC86 | 16F2 | 9A50 | CF29 | B36E | C483 | 680A | 0400 |
| 0000134620 | 0068 | 6A01 | 8D02 | E086 | 16F2 | 9A50 | CF29 | B389 |
| 0000134640 | C483 | C70A | EC86 | 06F2 | 6800 | 0500 | 006A | 026A |
| 0000134660 | 868D | F2EC | 5016 | 299A | 9FCF | 83B3 | 0AC4 | 0068 |
| 0000134700 | 6804 | 0100 | 026A | 868D | F2E2 | 5016 | 299A | BACF |
| 0000134720 | 83B3 | 0AC4 | 86C7 | F2EC | 004F | 0068 | 6A05 | 6A00 |
| 0000134740 | 8D02 | EC86 | 16F2 | 9A50 | CF29 | B3D0 | C483 | 680A |
| 0000134760 | 0400 | 0068 | 6A01 | 8D02 | E086 | 16F2 | 9A50 | CF29 |
| 0000135000 | B3EB | C483 | C70A | EC86 | 07F2 | 6800 | 0500 | 006A |
| 0000135020 | 026A | 868D | F2EC | 5016 | 299A | 01CF | 83B4 | 0AC4 |
| 0000135040 | 0068 | 6804 | 0100 | 026A | 868D | F2E2 | 5016 | 299A |
| 0000135060 | 1CCF | 83B4 | 0AC4 | 86C7 | F2EC | 0000 | 0068 | 6A05 |
| 0000135100 | 6A00 | 8D02 | EC86 | 16F2 | 9A50 | CF29 | B432 | C483 |
| 0000135120 | 680A | 0400 | 0068 | 6A01 | 8D02 | E086 | 16F2 | 9A50 |
| 0000135140 | CF29 | B44D | C483 | C70A | EC86 | FFF2 | 6800 | 0500 |
| 0000135160 | 006A | 026A | 868D | F2EC | 5016 | 299A | 00CF | 83B5 |
| 0000135200 | 0AC4 | 86C7 | F2EE | 0000 | 04E9 | FF00 | EE86 | 81F2 |
| 0000135220 | EEBE | 00F2 | 7201 | E903 | 0085 | 86C7 | F2EC | 0000 |
| 0000135240 | 868A | F2EE | 8025 | C000 | 07E8 | 8609 | F2EC | 868A |
| 0000135260 | F2EE | 4025 | C000 | 05E8 | 8609 | F2EC | 868A | F2EE |
| 0000135300 | 2025 | C000 | 03E8 | 8609 | F2EC | 868A | F2EE | 1025 |
| 0000135320 | D000 | 09E8 | EC86 | 8AF2 | EE86 | 25F2 | 0008 | E0D1 |
| 0000135340 | 8609 | F2EC | 868A | F2EE | 0425 | C100 | 03E0 | 8609 |
| 0000135360 | F2EC | 868A | F2EE | 0225 | C100 | 05E0 | 8609 | F2EC |
| 0000135400 | 868A | F2EE | 0125 | C100 | 07E0 | 8609 | F2EC | 868B |
| 0000135420 | F2EC | B68B | F2EE | E6D1 | 8289 | F2F2 | 6CE9 | 68FF |
| 0000135440 | 0400 | 0068 | 6A01 | 8D02 | E486 | 16F2 | 9A50 | CF29 |
| 0000135460 | B516 | C483 | 680A | 0500 | 006A | 0068 | 8D02 | F286 |
| 0000135500 | 16F2 | 9A50 | CF29 | B52C | C483 | 680A | 0400 | 0068 |
| 0000135520 | 6A01 | 8D02 | E086 | 16F2 | 9A50 | CF29 | B547 | C483 |
| 0000135540 | C70A | EC86 | 00F2 | 6800 | 0500 | 006A | 026A | 868D |
| 0000135560 | F2EC | 5016 | 299A | 6ECF | 83B2 | 0AC4 | 86C7 | F2F2 |
| 0000135600 | 0000 | 86C7 | F2F4 | 0000 | 86C7 | F2F6 | 8888 | 86C7 |
| 0000135620 | F2F8 | FFFF | 0068 | 6804 | 0100 | 026A | 868D | F2E8 |
| 0000135640 | 5016 | 299A | 8ACF | 83B5 | 0AC4 | 0068 | 6A05 | 6A00 |
| 0000135660 | 8D08 | F286 | 16F2 | 9A50 | CF29 | B5A6 | C483 | C70A |
| 0000135700 | EC86 | 00F2 | 6800 | 0400 | 0068 | 6A01 | 8D02 | EC86 |
| 0000135720 | 16F2 | 9A50 | CF29 | B5B2 | C483 | 1E0A | 1D68 | 9A0C |
| 0000135740 | 7582 | B2AA | C483 | B804 | 0000 | 00E9 | 5E00 | 835F |
| 0000135760 | 02ED | E58B | 5D1F | CB4D | 581E | 4590 | 8B55 | 1EEC |
| 0000136000 | D88E | EC81 | 0004 | 5657 | 46C7 | 00FC | 8A00 | 0646 |

THU MAR 14 17:25:16 1991 CRV_IPS.DLL PAGE 52, LINE 3010

| | | | | | | | | |
|---|---|---|---|---|---|---|---|---|
| 0000136020 | 8025 | C000 | 07E8 | 4609 | 8AFC | 0646 | 4025 | C000 |
| 0000136040 | 05E8 | 4609 | 8AFC | 0646 | 2025 | C000 | 03E8 | 4609 |
| 0000136060 | 8AFC | 0646 | 1025 | D000 | 09E8 | FC46 | 468A | 2506 |
| 0000136100 | 0008 | E0D1 | 4609 | 8AFC | 0646 | 0425 | C100 | 03E0 |
| 0000136120 | 4609 | 8AFC | 0646 | 0225 | C100 | 05E0 | 4609 | 8AFC |
| 0000136140 | 0646 | 0125 | C100 | 07E0 | 4609 | 8BFC | FC46 | 00E9 |
| 0000136160 | 5E00 | 835F | 02ED | E58B | 5D1F | CB4D | 581E | 4590 |
| 0000136200 | 8B55 | 1EEC | D88E | EC81 | 0006 | 5657 | B81E | AB89 |
| 0000136220 | D88E | 46C7 | 03FA | 6A00 | 6A00 | 6A00 | 6A00 | 8D02 |
| 0000136240 | FA46 | 5016 | 4C6A | DD9A | 75DF | 83B5 | 0EC4 | 4689 |
| 0000136260 | 83FC | FC7E | 7500 | E903 | 0006 | EFB8 | E9FF | 0006 |
| 0000136300 | 00B8 | E900 | 0000 | 5E1F | 835F | 02ED | E58B | 5D1F |
| 0000136320 | CB4D | 581E | 4590 | 8B55 | 1EEC | D88E | EC81 | 000C |
| 0000136340 | 5657 | B81E | B65E | D88E | 468B | E90A | 0085 | 46C7 |
| 0000136360 | 65F6 | C700 | F846 | 0000 | 468B | 8B06 | 0856 | 4689 |
| 0000136400 | 89FA | FC56 | 8FE9 | C700 | F646 | 0066 | 46C7 | 00F8 |
| 0000136420 | 8B00 | 0646 | 568B | 8908 | FA46 | 5689 | E9FC | 0076 |
| 0000136440 | 46C7 | 67F6 | C700 | F846 | 0000 | 468B | 8906 | FA46 |
| 0000136460 | 46C7 | 00FC | E900 | 005E | 5BE9 | C700 | F646 | 006B |
| 0000136500 | 46C7 | 00F8 | 8B00 | 0646 | 568B | 8908 | FA46 | 5689 |
| 0000136520 | E9FC | 0042 | 46C7 | 6CF6 | C700 | F846 | 0000 | 468B |
| 0000136540 | 8B06 | 0856 | 4689 | 89FA | FC56 | 29E9 | E900 | 0026 |
| 0000136560 | 23E9 | 2D00 | 0065 | 073D | 7600 | E903 | FFEF | E0D1 |
| 0000136600 | 2E93 | A7FF | B756 | B6BE | B6D7 | B6F0 | B73D | B73D |
| 0000136620 | B708 | B70B | B724 | 006A | 006A | 006A | 086A | 468D |
| 0000136640 | 16F6 | 6A50 | 9A02 | DFDD | B679 | C483 | 890E | F446 |
| 0000136660 | 7E83 | 00F4 | 0375 | 06E9 | B800 | FFEF | 06E9 | B800 |
| 0000136700 | 0000 | 00E9 | 1F00 | 5F5E | ED83 | 8B02 | 1FE5 | 4D5D |
| 0000136720 | 06CA | 1E00 | 9058 | 5545 | EC8B | 8E1E | 81D8 | 00EC |
| 0000136740 | 5700 | 1E56 | B4B8 | 8EB6 | 8ED8 | A806 | 2B31 | 26C0 |
| 0000136760 | 1EA3 | 260F | 1CA3 | 1F0F | 5F5E | ED83 | 8B02 | 1FE5 |
| 0000137000 | 4D5D | 1ECB | 9058 | 5545 | EC8B | 8E1E | 81D8 | 00EC |
| 0000137020 | 5700 | 1E56 | B5B8 | 8EB7 | 8ED8 | A806 | 2B31 | 26C0 |
| 0000137040 | 22A3 | 260F | 20A3 | 1F0F | 5F5E | ED83 | 8B02 | 1FE5 |
| 0000137060 | 4D5D | 1ECB | 9058 | 5545 | EC8B | 8E1E | 81D8 | 00EC |
| 0000137100 | 5700 | 1E56 | E5B8 | 8EB7 | 8BD8 | 0646 | 568B | 8E08 |
| 0000137120 | A806 | 2631 | 1CA3 | 260F | 1689 | 0F1E | 5E1F | 835F |
| 0000137140 | 02ED | E58B | 5D1F | CA4D | 0004 | 581E | 4590 | 8B55 |
| 0000137160 | 1EEC | D88E | EC81 | 0130 | 5657 | B81E | B815 | D88E |
| 0000137200 | 468B | 8B06 | 0856 | 068E | 31A8 | A326 | 0F20 | 8926 |
| 0000137220 | 2216 | 2B0F | 26C0 | 26A3 | 260F | 24A3 | 1E0F | 5468 |
| 0000137240 | FF0C | 0876 | 76FF | 8D06 | D646 | 5016 | 4E8D | 16DA |
| 0000137260 | 9A51 | FFFF | 0000 | 8689 | FED0 | BE83 | FED0 | 7400 |
| 0000137300 | E903 | 008B | C02B | 8689 | FED4 | 8689 | FED2 | 76FF |
| 0000137320 | FFD8 | D676 | 868D | FED2 | 5016 | FF9A | 00FF | 8900 |
| 0000137340 | D086 | 83FE | D0BE | 00FE | 0374 | 62E9 | FF00 | D4B6 |
| 0000137360 | FFFE | D2B6 | 1EFE | 5568 | 8D0C | D686 | 16FE | 9A50 |
| 0000137400 | 97C8 | B778 | C483 | 8D0C | D686 | 16FE | 8D50 | FA46 |
| 0000137420 | 5016 | FF9A | 00FF | 8900 | D086 | 83FE | D0BE | 00FE |
| 0000137440 | 0374 | 13E9 | 8B00 | FA46 | 568B | 8EFC | A806 | 2631 |
| 0000137460 | 24A3 | 260F | 1689 | 0F26 | B6FF | FED4 | B6FF | FED2 |
| 0000137500 | 669A | 00B1 | 2B00 | 89C0 | D486 | 89FE | D286 | 1FFE |
| 0000137520 | 5F5E | ED83 | 8B02 | 1FE5 | 4D5D | 04CA | 0022 | 0002 |
| 0000137540 | B1AA | 0001 | 0000 | 0002 | B8D2 | 0003 | 0000 | 0103 |
| 0000137560 | B8AB | 0007 | 0058 | 0103 | A344 | 0007 | 005B | 0103 |
| 0000137600 | ABCB | 0001 | 008E | 0203 | A3B8 | 0004 | 0077 | 0103 |
| 0000137620 | AB8F | 0001 | 008F | 0103 | B882 | 0007 | 0063 | 0002 |
| 0000137640 | B84C | 0008 | 0000 | 0205 | A36F | 0004 | 0023 | 0103 |
| 0000137660 | 8AFD | 0007 | 006F | 0103 | 437D | 0001 | 0020 | 0105 |

THU MAR 14 17:25:16 1991 CRV_IPS.DLL PAGE 53, LINE 3069

| | | | | | | | | |
|---|---|---|---|---|---|---|---|---|
| 0000137700 | 83D7 | 0001 | 0088 | 0205 | A3DE | 0004 | 0031 | 0203 |
| 0000137720 | 9FBE | 0004 | 0094 | 0103 | 4D23 | 0007 | 0003 | 0205 |
| 0000137740 | A3B5 | 0004 | 003F | 0103 | 5374 | 0007 | 000A | 0103 |
| 0000137760 | 1341 | 0006 | 0014 | 0103 | 7F02 | 0007 | 0014 | 0103 |
| 0000140000 | 9BCF | 0007 | 0016 | 0202 | A3B2 | 0004 | 003F | 0103 |
| 0000140020 | A0C6 | 0007 | 0018 | 0103 | B159 | 0007 | 001A | 0103 |
| 0000140040 | 9873 | 0007 | 001B | 0103 | A364 | 0007 | 001D | 0103 |
| 0000140060 | B911 | 0007 | 0025 | 0103 | B068 | 0007 | 0026 | 0103 |
| 0000140100 | AC59 | 0007 | 002C | 0103 | B8E3 | 0007 | 002E | 0203 |
| 0000140120 | A007 | 0004 | 0049 | 0103 | B087 | 0007 | 0033 | 0103 |
| 0000140140 | AE47 | 0007 | 0037 | 0203 | A427 | 0004 | 0058 | 0000 |
| 0000140160 | 581E | 4590 | 8B55 | 1EEC | D88E | EC81 | 0048 | 5657 |
| 0000140200 | B81E | FFFF | D88E | 46C7 | A0F8 | 8C0C | FA5E | 46C7 |
| 0000140220 | 01E0 | 2B01 | 89C0 | D046 | 4689 | 8ECE | AE06 | 2631 |
| 0000140240 | 3E83 | FFFF | 7500 | E903 | 001D | 36FF | 0EA6 | 36FF |
| 0000140260 | 0EA4 | 468D | 16C4 | 9A50 | FFFF | 0000 | C483 | 3D08 |
| 0000140300 | 0000 | 0374 | 0FE9 | 8E00 | B006 | 2631 | 3E83 | 0156 |
| 0000140320 | 7500 | E903 | 003B | 681E | 0CA4 | 468D | 16D2 | 8D50 |
| 0000140340 | C446 | 5016 | 468D | 16F0 | 6850 | 008D | 681E | 0EC4 |
| 0000140360 | 36FF | DEA2 | 36FF | 0EA0 | 36FF | 0EA6 | 36FF | 0EA4 |
| 0000140400 | FF9A | 00FF | 8300 | 1EC4 | 4689 | 89F0 | F256 | 08E9 |
| 0000140420 | 2B00 | 89C0 | F246 | 4689 | C7F0 | CC46 | 0000 | 1268 |
| 0000140440 | 6800 | 309C | FF9A | 00FF | 6A00 | 8D04 | F446 | 5016 |
| 0000140460 | 006A | 006A | 006A | 146A | DD9A | FFDF | 83FF | 0EC4 |
| 0000140500 | 4689 | 83E2 | E27E | 7500 | E903 | 00D8 | 068E | 31AE |
| 0000140520 | 8326 | 3E3E | 0001 | 0375 | 4CE9 | 8300 | C87E | 75FE |
| 0000140540 | E903 | 0043 | 76FF | FFE2 | BA36 | FF0E | B836 | 8D0E |
| 0000140560 | D246 | 5016 | 468D | 16F0 | 8D50 | C446 | 5016 | 681E |
| 0000140600 | 0EC4 | 9E68 | FF00 | A236 | FF0E | A036 | FF0E | A636 |
| 0000140620 | FF0E | A436 | 1E0E | A868 | 680C | FFFF | FF68 | 9AFF |
| 0000140640 | FFFF | 0000 | C483 | 8E28 | AE06 | 2631 | 3E83 | 0032 |
| 0000140660 | 7500 | E903 | 0009 | 7E83 | FEC8 | 0374 | 0FE9 | 8E00 |
| 0000140700 | B006 | 2631 | 3E83 | FFFF | 7500 | E903 | 0050 | 46C7 |
| 0000140720 | EFCA | FFFF | D076 | 76FF | 8DCE | CA46 | 5016 | 76FF |
| 0000140740 | FFE0 | FA76 | 76FF | 8DF8 | D24E | 5116 | 4E8D | 16F0 |
| 0000140760 | 8D51 | C44E | 5116 | 681E | 0EC4 | 9F68 | FF00 | A236 |
| 0000141000 | FF0E | A036 | FF0E | A636 | FF0E | A436 | 9A0E | FFFF |
| 0000141020 | 0000 | C483 | 8B28 | CA46 | A9E9 | E913 | 0006 | EFB8 |
| 0000141040 | E9FF | 13A0 | D68E | 31B2 | A126 | 0F2C | 2B48 | 26D2 |
| 0000141060 | 36F7 | 0F2E | 8940 | FC46 | A126 | 0F14 | 8B26 | 1616 |
| 0000141100 | D10F | D1E0 | D1D2 | D1E0 | D1D2 | D1E0 | 89D2 | EC46 |
| 0000141120 | 5689 | 68EE | 0307 | 9C68 | FF30 | EE76 | 76FF | 9AEC |
| 0000141140 | FFFF | 0000 | 4689 | 83E2 | E27E | 7500 | E903 | 0106 |
| 0000141160 | 7E83 | 79E2 | 0374 | 80E9 | 8E00 | AE06 | 2631 | 3E83 |
| 0000141200 | 0290 | 7500 | E903 | 0009 | 7E83 | FEC8 | 0374 | 0FE9 |
| 0000141220 | 8E00 | B006 | 2631 | 3E83 | 02A8 | 7500 | E903 | 0050 |
| 0000141240 | 46C7 | EFCA | FFFF | D076 | 76FF | 8DCE | CA46 | 5016 |
| 0000141260 | 76FF | FFE0 | FA76 | 76FF | 8DF8 | D24E | 5116 | 4E8D |
| 0000141300 | 16F0 | 8D51 | C44E | 5116 | 681E | 0EC4 | A968 | FF00 |
| 0000141320 | A236 | FF0E | A036 | FF0E | A636 | FF0E | A436 | 9A0E |
| 0000141340 | 02F0 | 0000 | C483 | 8B28 | CA46 | D7E9 | E912 | 0006 |
| 0000141360 | EFB8 | E9FF | 12CE | 7DE9 | 8E00 | AE06 | 2631 | 3E83 |
| 0000141400 | 0333 | 7500 | E903 | 0009 | 7E83 | FEC8 | 0374 | 0FE9 |
| 0000141420 | 8E00 | B006 | 2631 | 3E83 | 039F | 7500 | E903 | 0050 |
| 0000141440 | 46C7 | FFCA | FFFF | D076 | 76FF | 8DCE | CA46 | 5016 |
| 0000141460 | 76FF | FFE0 | FA76 | 76FF | 8DF8 | D24E | 5116 | 4E8D |
| 0000141500 | 16F0 | 8D51 | C44E | 5116 | 681E | 0EC4 | AB68 | FF00 |
| 0000141520 | A236 | FF0E | A036 | FF0E | A636 | FF0E | A436 | 9A0E |
| 0000141540 | 03E7 | 0000 | C483 | 8B28 | CA46 | 57E9 | E912 | 0006 |

THU MAR 14 17:25:16 1991 CRV_IPS.DLL PAGE 54, LINE 3128

| | | | | | | | | |
|---|---|---|---|---|---|---|---|---|
| 0000141560 | FFB8 | E9FF | 124E | AF68 | 6800 | 309C | B59A | 0000 |
| 0000141600 | 6A00 | 8D0A | BA46 | 5016 | E89A | CBE1 | 8300 | 06C4 |
| 0000141620 | 4689 | 83E2 | E27E | 7403 | E903 | 00D1 | 068E | 31AE |
| 0000141640 | 8326 | 873E | 0003 | 0375 | 45E9 | 8300 | C87E | 75FE |
| 0000141660 | E903 | 003C | 681E | 0CB0 | 468D | 16D2 | 8D50 | F046 |
| 0000141700 | 5016 | 468D | 16C4 | 1E50 | C468 | 680E | 00B1 | 36FF |
| 0000141720 | 0EA2 | 36FF | 0EA0 | 36FF | 0EA6 | 36FF | 0EA4 | 681E |
| 0000141740 | 0CCC | 2A68 | 6801 | 012D | 309A | 0001 | 8300 | 26C4 |
| 0000141760 | 068E | 31AE | 8326 | E33E | 0000 | 0375 | 09E9 | 8300 |
| 0000142000 | C87E | 74FE | E903 | 000F | 068E | 31B0 | 8326 | 5E3E |
| 0000142020 | 0000 | 0375 | 50E9 | C700 | CA46 | FFEE | 76FF | FFD0 |
| 0000142040 | CE76 | 468D | 16CA | FF50 | E076 | 76FF | FFFA | F876 |
| 0000142060 | 4E8D | 16D2 | 8D51 | F04E | 5116 | 4E8D | 16C4 | 1E51 |
| 0000142100 | C468 | 680E | 00B2 | 36FF | 0EA2 | 36FF | 0EA0 | 36FF |
| 0000142120 | 0EA6 | 36FF | 0EA4 | 9E9A | 0001 | 8300 | 28C4 | 468B |
| 0000142140 | E9CA | 1160 | 06E9 | B800 | FFEE | 57E9 | 8B11 | C246 |
| 0000142160 | 4689 | 8ECC | B206 | 2631 | 1CA1 | 260F | 168B | 0F1E |
| 0000142200 | 4689 | 89E4 | E656 | 006A | 086A | 006A | FF26 | 2E36 |
| 0000142220 | 8E0F | B406 | 2631 | 46A1 | 260F | 26F7 | 0F44 | 5052 |
| 0000142240 | 909A | 3AA1 | 5204 | 9A50 | A0F6 | 04DD | 4689 | 89E8 |
| 0000142260 | EA56 | 1EC4 | 0EA8 | C02B | 8926 | 4647 | 8926 | 4447 |
| 0000142300 | 1EC4 | 0EA8 | C02B | 8926 | 5647 | 8926 | 5447 | 1EC4 |
| 0000142320 | 0EA8 | C02B | 8926 | 0247 | 8926 | C407 | A81E | 260E |
| 0000142340 | 47C7 | 7848 | 8E00 | B406 | 2631 | 3CA1 | C40F | A81E |
| 0000142360 | 260E | 4789 | 8E58 | B406 | 2631 | 3EA1 | C40F | A81E |
| 0000142400 | 260E | 4789 | C45A | A81E | 260E | 47C7 | 015C | 8E00 |
| 0000142420 | B406 | 2631 | 44A1 | C40F | A81E | 260E | 4789 | 8E5E |
| 0000142440 | B406 | 2631 | 46A1 | C40F | A81E | 260E | 4789 | 8E60 |
| 0000142460 | B206 | 2631 | 2CA1 | C40F | A81E | 260E | 4789 | FF62 |
| 0000142500 | EA76 | 76FF | 6AE8 | FF00 | FC76 | 909A | 1FA1 | C405 |
| 0000142520 | A81E | 260E | 4789 | 266C | 5789 | C46E | A81E | 260E |
| 0000142540 | 47C7 | 0066 | 8E00 | B206 | 2631 | 2EA1 | C40F | A81E |
| 0000142560 | 260E | 4789 | 8B64 | 0646 | 568B | 0508 | 0024 | 5052 |
| 0000142600 | A8A1 | 8B0E | AA16 | 050E | 0004 | 5052 | D29A | 7B91 |
| 0000142620 | 8305 | 08C4 | 068E | 31AE | 8326 | C33E | 0005 | 0375 |
| 0000142640 | 45E9 | 8300 | C87E | 75FE | E903 | 003C | 681E | 0CD4 |
| 0000142660 | 468D | 16D2 | 8D50 | F046 | 5016 | 468D | 16C4 | 1E50 |
| 0000142700 | C468 | 680E | 00CC | 36FF | 0EA2 | 36FF | 0EA0 | 36FF |
| 0000142720 | 0EA6 | 36FF | 0EA4 | 681E | 0CE4 | 0B68 | 6806 | 060E |
| 0000142740 | 119A | 0006 | 8300 | 26C4 | EC9A | AB9D | A305 | 3EDC |
| 0000142760 | 1689 | 3EDE | 76FF | FFE6 | E476 | 36FF | 0EAA | 36FF |
| 0000143000 | 0EA8 | 016A | 006A | 006A | 681E | 3EE0 | 681E | 3EE2 |
| 0000143020 | FF9A | 00FF | 8900 | DE46 | EC9A | F99D | 2B06 | DC06 |
| 0000143040 | 1B3E | DE16 | A33E | 3EDC | 1689 | 3EDE | 068E | 31AE |
| 0000143060 | 8326 | 283E | 0006 | 0375 | 4DE9 | 8300 | C87E | 75FE |
| 0000143100 | E903 | 0044 | 36FF | 3EDE | 36FF | 3EDC | 681E | 0CEC |
| 0000143120 | 468D | 16D2 | 8D50 | F046 | 5016 | 468D | 16C4 | 1E50 |
| 0000143140 | C468 | 680E | 00D1 | 36FF | 0EA2 | 36FF | 0EA0 | 36FF |
| 0000143160 | 0EA6 | 36FF | 0EA4 | 681E | 0CF7 | 6D68 | 6806 | 066E |
| 0000143200 | 719A | 0006 | 8300 | 2AC4 | 7E83 | 00DE | 0375 | D5E9 |
| 0000143220 | 8E00 | AE06 | 2631 | 3E83 | 067F | 7500 | E903 | 0048 |
| 0000143240 | 7E83 | FEC8 | 0375 | 3FE9 | FF00 | DE76 | 681E | 0CFF |
| 0000143260 | 468D | 16D2 | 8D50 | F046 | 5016 | 468D | 16C4 | 1E50 |
| 0000143300 | C468 | 680E | 00D4 | 36FF | 0EA2 | 36FF | 0EA0 | 36FF |
| 0000143320 | 0EA6 | 36FF | 0EA4 | 681E | 0D15 | 4C68 | 6807 | 074F |
| 0000143340 | 529A | 0007 | 8300 | 28C4 | 068E | 31AE | 8326 | 093E |
| 0000143360 | 0007 | 0375 | 09E9 | 8300 | C87E | 74FE | E903 | 000F |
| 0000143400 | 068E | 31B0 | 8326 | 283E | 0002 | 0375 | 51E9 | 8B00 |
| 0000143420 | DE46 | 4689 | FFCA | D076 | 76FF | 8DCE | CA46 | 5016 |

THU MAR 14 17:25:16 1991 CRV_IPS.DLL PAGE 55, LINE 3187

| | | | | | | | | |
|---|---|---|---|---|---|---|---|---|
| 0000143440 | 76FF | FFE0 | FA76 | 76FF | 8DF8 | D24E | 5116 | 4E8D |
| 0000143460 | 16F0 | 8D51 | C44E | 5116 | 681E | 0EC4 | D568 | FF00 |
| 0000143500 | A236 | FF0E | A036 | FF0E | A636 | FF0E | A436 | 9A0E |
| 0000143520 | 0270 | 0000 | C483 | 8B28 | CA46 | 67E9 | E90E | 0006 |
| 0000143540 | 468B | E9DE | 0E5E | EC9A | 879D | A307 | 3EDC | 1689 |
| 0000143560 | 3EDE | 068E | 31AE | 8326 | 103E | 0002 | 0375 | 48E9 |
| 0000143600 | 8300 | C87E | 75FE | E903 | 003F | 76FF | 1ECC | 1D68 |
| 0000143620 | 8D0D | D246 | 5016 | 468D | 16F0 | 8D50 | C446 | 5016 |
| 0000143640 | 681E | 0EC4 | D968 | FF00 | A236 | FF0E | A036 | FF0E |
| 0000143660 | A636 | FF0E | A436 | 1E0E | 3668 | 680D | 0373 | 7668 |
| 0000143700 | 9A03 | 0379 | 0000 | C483 | 8328 | EA7E | 7D00 | E903 |
| 0000143720 | 0030 | 037E | 09E9 | 8300 | E87E | 77FF | E903 | 0022 |
| 0000143740 | 9368 | 6807 | 0F3C | 76FF | FFBC | BA76 | 36FF | 3EE4 |
| 0000143760 | 36FF | 3EE2 | 079A | A9D9 | 8307 | 0CC4 | 4689 | E9E2 |
| 0000144000 | 001F | FF68 | 68FF | 0F3C | 76FF | FFBC | BA76 | 36FF |
| 0000144020 | 3EE4 | 36FF | 3EE2 | BF9A | 1BD1 | 8303 | 0CC4 | 4689 |
| 0000144040 | 9AE2 | 9DEC | 0972 | 062B | 3EDC | 161B | 3EDE | DCA3 |
| 0000144060 | 893E | DE16 | 8E3E | AE06 | 2631 | 3E83 | 0847 | 7500 |
| 0000144100 | E903 | 004D | 7E83 | FEC8 | 0375 | 44E9 | FF00 | DE36 |
| 0000144120 | FF3E | DC36 | 1E3E | 3E68 | 8D0D | D246 | 5016 | 468D |
| 0000144140 | 16F0 | 8D50 | C446 | 5016 | 681E | 0EC4 | E168 | FF00 |
| 0000144160 | A236 | FF0E | A036 | FF0E | A636 | FF0E | A436 | 1E0E |
| 0000144200 | 4968 | 680D | 088E | 9168 | 9A08 | 0894 | 0000 | C483 |
| 0000144220 | 832A | E27E | 7500 | E903 | 00EE | 76FF | FFE6 | E476 |
| 0000144240 | 36FF | 3EE0 | 681E | 3EE2 | 1C9A | 000A | 8900 | DE46 |
| 0000144260 | 068E | 31AE | 8326 | A23E | 0008 | 0375 | 4CE9 | 8300 |
| 0000144300 | C87E | 75FE | E903 | 0043 | 76FF | FFE2 | BE36 | FF0E |
| 0000144320 | BC36 | 8D0E | D246 | 5016 | 468D | 16F0 | 8D50 | C446 |
| 0000144340 | 5016 | 681E | 0EC4 | E568 | FF00 | A236 | FF0E | A036 |
| 0000144360 | FF0E | A636 | FF0E | A436 | 1E0E | 5168 | 680D | 0962 |
| 0000144400 | 6568 | 9A09 | 0968 | 0000 | C483 | 8E28 | AE06 | 2631 |
| 0000144420 | 3E83 | 091F | 7500 | E903 | 0009 | 7E83 | FEC8 | 0374 |
| 0000144440 | 0FE9 | 8E00 | B006 | 2631 | 3E83 | 0A96 | 7500 | E903 |
| 0000144460 | 0050 | 46C7 | EFCA | FFFF | D076 | 76FF | 8DCE | CA46 |
| 0000144500 | 5016 | 76FF | FFE0 | FA76 | 76FF | 8DF8 | D24E | 5116 |
| 0000144520 | 4E8D | 16F0 | 8D51 | C44E | 5116 | 681E | 0EC4 | E668 |
| 0000144540 | FF00 | A236 | FF0E | A036 | FF0E | A636 | FF0E | A436 |
| 0000144560 | 9A0E | 0ADF | 0000 | C483 | 8B28 | CA46 | 45E9 | E90C |
| 0000144600 | 0006 | EFB8 | E9FF | 0C3C | 068E | 31AE | 8326 | AF3E |
| 0000144620 | 0009 | 0375 | 48E9 | 8300 | C87E | 75FE | E903 | 003F |
| 0000144640 | 76FF | 1ECC | 5968 | 8D0D | D246 | 5016 | 468D | 16F0 |
| 0000144660 | 8D50 | C446 | 5016 | 681E | 0EC4 | E968 | FF00 | A236 |
| 0000144700 | FF0E | A036 | FF0E | A636 | FF0E | A436 | 1E0E | 7268 |
| 0000144720 | 680D | 09F7 | FA68 | 9A09 | 09FD | 0000 | C483 | 9A28 |
| 0000144740 | 9DEC | 0997 | DCA3 | 893E | DE16 | FF3E | E676 | 76FF |
| 0000144760 | FFE4 | E036 | FF3E | CC76 | 681E | 3EE2 | FF9A | 00FF |
| 0000145000 | 8900 | DE46 | EC9A | 0A9D | 2B0B | DC06 | 1B3E | DE16 |
| 0000145020 | A33E | 3EDC | 1689 | 3EDE | 068E | 31AE | 8326 | 273E |
| 0000145040 | 000A | 0375 | 4DE9 | 8300 | C87E | 75FE | E903 | 0044 |
| 0000145060 | 36FF | 3EDE | 36FF | 3EDC | 681E | 0D7A | 468D | 16D2 |
| 0000145100 | 8D50 | F046 | 5016 | 468D | 16C4 | 1E50 | C468 | 680E |
| 0000145120 | 00ED | 36FF | 0EA2 | 36FF | 0EA0 | 36FF | 0EA6 | 36FF |
| 0000145140 | 0EA4 | 681E | 0D85 | 6A68 | 680A | 0A6D | 709A | 000A |
| 0000145160 | 8300 | 2AC4 | 7E83 | 00DE | 0375 | E8E9 | FF00 | E676 |
| 0000145200 | 76FF | FFE4 | E036 | 1E3E | E268 | 9A3E | 0B2A | 0000 |
| 0000145220 | 068E | 31AE | 8326 | 7E3E | 000A | 0375 | 48E9 | 8300 |
| 0000145240 | C87E | 75FE | E903 | 003F | 76FF | 1EDE | 8D68 | 8D0D |
| 0000145260 | D246 | 5016 | 468D | 16F0 | 8D50 | C446 | 5016 | 681E |
| 0000145300 | 0EC4 | F168 | FF00 | A236 | FF0E | A036 | FF0E | A636 |

THU MAR 14 17:25:16 1991 CRV_IPS.DLL PAGE 56, LINE 3246

| | | | | | | | | |
|---|---|---|---|---|---|---|---|---|
| 0000145320 | FF0E | A436 | 1E0E | 9D68 | 680D | 056B | 6E68 | 9A05 |
| 0000145340 | 0571 | 0000 | C483 | 8E28 | AE06 | 2631 | 3E83 | 0B38 |
| 0000145360 | 7500 | E903 | 0009 | 7E83 | FEC8 | 0374 | 0FE9 | 8E00 |
| 0000145400 | B006 | 2631 | 3E83 | 0697 | 7500 | E903 | 0051 | 468B |
| 0000145420 | 89DE | CA46 | 76FF | FFD0 | CE76 | 468D | 16CA | FF50 |
| 0000145440 | E076 | 76FF | FFFA | F876 | 4E8D | 16D2 | 8D51 | F04E |
| 0000145460 | 5116 | 4E8D | 16C4 | 1E51 | C468 | 680E | 00F2 | 36FF |
| 0000145500 | 0EA2 | 36FF | 0EA0 | 36FF | 0EA6 | 36FF | 0EA4 | E09A |
| 0000145520 | 0006 | 8300 | 28C4 | 468B | E9CA | 0A68 | 06E9 | 8B00 |
| 0000145540 | DE46 | 5FE9 | C70A | B846 | 0000 | 76FF | FFF6 | F476 |
| 0000145560 | 026A | 468D | 16B8 | 9A50 | CF29 | 0433 | C483 | 890A |
| 0000145600 | E246 | 7E83 | 00E2 | 0375 | EEE9 | FF00 | E676 | 76FF |
| 0000145620 | FFE4 | E036 | 1E3E | E268 | 9A3E | FFFF | 0000 | 4689 |
| 0000145640 | 8EDE | AE06 | 2631 | 3E83 | 052B | 7500 | E903 | 004C |
| 0000145660 | 7E83 | FEC8 | 0375 | 43E9 | FF00 | E276 | 36FF | 0EC2 |
| 0000145700 | 36FF | 0EC0 | 468D | 16D2 | 8D50 | F046 | 5016 | 468D |
| 0000145720 | 16C4 | 1E50 | C468 | 680E | 00FB | 36FF | 0EA2 | 36FF |
| 0000145740 | 0EA0 | 36FF | 0EA6 | 36FF | 0EA4 | 681E | 0DA5 | BB68 |
| 0000145760 | 680D | 0DBE | C19A | 000D | 8300 | 28C4 | 068E | 31AE |
| 0000146000 | 8326 | 583E | 000C | 0375 | 09E9 | 8300 | C87E | 74FE |
| 0000146020 | E903 | 000F | 068E | 31B0 | 8326 | 703E | 000C | 0375 |
| 0000146040 | 50E9 | C700 | CA46 | FFEF | 76FF | FFD0 | CE76 | 468D |
| 0000146060 | 16CA | FF50 | E076 | 76FF | FFFA | F876 | 4E8D | 16D2 |
| 0000146100 | 8D51 | F04E | 5116 | 4E8D | 16C4 | 1E51 | C468 | 680E |
| 0000146120 | 00FC | 36FF | 0EA2 | 36FF | 0EA0 | 36FF | 0EA6 | 36FF |
| 0000146140 | 0EA4 | B89A | 000C | 8300 | 28C4 | 468B | E9CA | 0954 |
| 0000146160 | 06E9 | B800 | FFEF | 4BE9 | 8B09 | FC46 | 462B | 48CC |
| 0000146200 | 0375 | 62E9 | 6807 | 0D4F | 9C68 | FF30 | EE76 | 76FF |
| 0000146220 | 9AEC | 01F0 | 0000 | 4689 | 83E2 | E27E | 7500 | E903 |
| 0000146240 | 011C | 76FF | FFE6 | E476 | 36FF | 3EE0 | 681E | 3EE2 |
| 0000146260 | D79A | 000D | 8900 | DE46 | 7E83 | 79E2 | 0374 | 80E9 |
| 0000146300 | 8E00 | AE06 | 2631 | 3E83 | 0CD8 | 7500 | E903 | 0009 |
| 0000146320 | 7E83 | FEC8 | 0374 | 0FE9 | 8E00 | B006 | 2631 | 3E83 |
| 0000146340 | 0CF0 | 7500 | E903 | 0050 | 46C7 | EFCA | FFFF | D076 |
| 0000146360 | 76FF | 8DCE | CA46 | 5016 | 76FF | FFE0 | FA76 | 76FF |
| 0000146400 | 8DF8 | D24E | 5116 | 4E8D | 16F0 | 8D51 | C44E | 5116 |
| 0000146420 | 681E | 0EC4 | 0668 | FF01 | A236 | FF0E | A036 | FF0E |
| 0000146440 | A636 | FF0E | A436 | 9A0E | 0D38 | 0000 | C483 | 8B28 |
| 0000146460 | CA46 | 8FE9 | E908 | 0006 | EFB8 | E9FF | 0886 | 7DE9 |
| 0000146500 | 8E00 | AE06 | 2631 | 3E83 | 0D7B | 7500 | E903 | 0009 |
| 0000146520 | 7E83 | FEC8 | 0374 | 0FE9 | 8E00 | B006 | 2631 | 3E83 |
| 0000146540 | 0DFD | 7500 | E903 | 0050 | 46C7 | FFCA | FFFF | D076 |
| 0000146560 | 76FF | 8DCE | CA46 | 5016 | 76FF | FFE0 | FA76 | 76FF |
| 0000146600 | 8DF8 | D24E | 5116 | 4E8D | 16F0 | 8D51 | C44E | 5116 |
| 0000146620 | 681E | 0EC4 | 0868 | FF01 | A236 | FF0E | A036 | FF0E |
| 0000146640 | A636 | FF0E | A436 | 9A0E | 0E45 | 0000 | C483 | 8B28 |
| 0000146660 | CA46 | 0FE9 | E908 | 0006 | FFB8 | E9FF | 0806 | E468 |
| 0000146700 | 6801 | 309C | 0D9A | 0003 | 6A00 | 8D0A | BA46 | 5016 |
| 0000146720 | E89A | BBE1 | 830E | 06C4 | 4689 | 83E2 | E27E | 7403 |
| 0000146740 | E903 | 00E7 | 068E | 31AE | 8326 | E53E | 000D | 0375 |
| 0000146760 | 45E9 | 8300 | C87E | 75FE | E903 | 003C | 681E | 0DAD |
| 0000147000 | 468D | 16D2 | 8D50 | F046 | 5016 | 468D | 16C4 | 1E50 |
| 0000147020 | C468 | 680E | 010F | 36FF | 0EA2 | 36FF | 0EA0 | 36FF |
| 0000147040 | 0EA6 | 36FF | 0EA4 | 681E | 0DC9 | AB68 | 680E | 0EAE |
| 0000147060 | B19A | 000E | 8300 | 26C4 | 76FF | FFE6 | E476 | 36FF |
| 0000147100 | 3EE0 | 681E | 3EE2 | 399A | 0008 | 8900 | DE46 | 068E |
| 0000147120 | 31AE | 8326 | 683E | 000E | 0375 | 09E9 | 8300 | C87E |
| 0000147140 | 74FE | E903 | 000F | 068E | 31B0 | 8326 | BA3E | 0008 |
| 0000147160 | 0375 | 50E9 | C700 | CA46 | FFEE | 76FF | FFD0 | CE76 |

THU MAR 14 17:25:16 1991 CRV_IPS.DLL PAGE 57, LINE 3305

| | | | | | | | | |
|---|---|---|---|---|---|---|---|---|
| 0000147200 | 468D | 16CA | FF50 | E076 | 76FF | FFFA | F876 | 4E8D |
| 0000147220 | 16D2 | 8D51 | F04E | 5116 | 4E8D | 16C4 | 1E51 | C468 |
| 0000147240 | 680E | 0111 | 36FF | 0EA2 | 36FF | 0EA0 | 36FF | 0EA6 |
| 0000147260 | 36FF | 0EA4 | 029A | 0009 | 8300 | 28C4 | 468B | E9CA |
| 0000147300 | 0702 | 06E9 | B800 | FFEE | F9E9 | 8B06 | C246 | 4689 |
| 0000147320 | 8ECC | AE06 | 2631 | 3E83 | 07CC | 7500 | E903 | 0048 |
| 0000147340 | 7E83 | FEC8 | 0375 | 3FE9 | FF00 | CC76 | 681E | 0DD1 |
| 0000147360 | 468D | 16D2 | 8D50 | F046 | 5016 | 468D | 16C4 | 1E50 |
| 0000147400 | C468 | 680E | 0116 | 36FF | 0EA2 | 36FF | 0EA0 | 36FF |
| 0000147420 | 0EA6 | 36FF | 0EA4 | 681E | 0DEA | 1468 | 6808 | 0817 |
| 0000147440 | 1A9A | 0008 | 8300 | 28C4 | EC9A | F29D | A30E | 3EDC |
| 0000147460 | 1689 | 3EDE | 7E83 | 00EA | 037D | 30E9 | 7E00 | E903 |
| 0000147500 | 0009 | 7E83 | FFE8 | 0377 | 22E9 | 6800 | 0EFE | 3C68 |
| 0000147520 | FF0F | BC76 | 76FF | FFBA | E436 | FF3E | E236 | 9A3E |
| 0000147540 | D907 | 07B4 | C483 | 890C | E246 | 1FE9 | 6800 | 0771 |
| 0000147560 | 3C68 | FF0F | BC76 | 76FF | FFBA | E436 | FF3E | E236 |
| 0000147600 | 9A3E | D1BF | 0F1F | C483 | 890C | E246 | EC9A | DD9D |
| 0000147620 | 2B10 | DC06 | 1B3E | DE16 | A33E | 3EDC | 1689 | 3EDE |
| 0000147640 | 068E | 31AE | 8326 | B23E | 000F | 0375 | 4DE9 | 8300 |
| 0000147660 | C87E | 75FE | E903 | 0044 | 36FF | 3EDE | 36FF | 3EDC |
| 0000147700 | 681E | 0DF2 | 468D | 16D2 | 8D50 | F046 | 5016 | 468D |
| 0000147720 | 16C4 | 1E50 | C468 | 680E | 011F | 36FF | 0EA2 | 36FF |
| 0000147740 | 0EA0 | 36FF | 0EA6 | 36FF | 0EA4 | 681E | 0DFD | F968 |
| 0000147760 | 680F | 0FFC | FF9A | 000F | 8300 | 2AC4 | 7E83 | 00E2 |
| 0000150000 | 0375 | EEE9 | FF00 | E676 | 76FF | FFE4 | E036 | 1E3E |
| 0000150020 | E268 | 9A3E | 0C41 | 0000 | 4689 | 8EDE | AE06 | 2631 |
| 0000150040 | 3E83 | 100D | 7500 | E903 | 004C | 7E83 | FEC8 | 0375 |
| 0000150060 | 43E9 | FF00 | E276 | 36FF | 0EBE | 36FF | 0EBC | 468D |
| 0000150100 | 16D2 | 8D50 | F046 | 5016 | 468D | 16C4 | 1E50 | C468 |
| 0000150120 | 680E | 0123 | 36FF | 0EA2 | 36FF | 0EA0 | 36FF | 0EA6 |
| 0000150140 | 36FF | 0EA4 | 681E | 0E05 | CD68 | 6810 | 10D0 | D39A |
| 0000150160 | 0010 | 8300 | 28C4 | 068E | 31AE | 8326 | 8A3E | 0010 |
| 0000150200 | 0375 | 09E9 | 8300 | C87E | 74FE | E903 | 000F | 068E |
| 0000150220 | 31B0 | 8326 | AB3E | 000B | 0375 | 50E9 | C700 | CA46 |
| 0000150240 | FFEF | 76FF | FFD0 | CE76 | 468D | 16CA | FF50 | E076 |
| 0000150260 | 76FF | FFFA | F876 | 4E8D | 16D2 | 8D51 | F04E | 5116 |
| 0000150300 | 4E8D | 16C4 | 1E51 | C468 | 680E | 0124 | 36FF | 0EA2 |
| 0000150320 | 36FF | 0EA0 | 36FF | 0EA6 | 36FF | 0EA4 | F39A | 000B |
| 0000150340 | 8300 | 28C4 | 468B | E9CA | 04DA | 06E9 | B800 | FFEF |
| 0000150360 | D1E9 | 8E04 | AE06 | 2631 | 3E83 | 0B93 | 7500 | E903 |
| 0000150400 | 0048 | 7E83 | FEC8 | 0375 | 3FE9 | FF00 | CC76 | 681E |
| 0000150420 | 0E0D | 468D | 16D2 | 8D50 | F046 | 5016 | 468D | 16C4 |
| 0000150440 | 1E50 | C468 | 680E | 0127 | 36FF | 0EA2 | 36FF | 0EA0 |
| 0000150460 | 36FF | 0EA6 | 36FF | 0EA4 | 681E | 0E26 | 7F68 | 680B |
| 0000150500 | 0B82 | 859A | 000B | 8300 | 28C4 | EC9A | 029D | A311 |
| 0000150520 | 3EDC | 1689 | 3EDE | 76FF | FFE6 | E476 | 36FF | 3EE0 |
| 0000150540 | 76FF | 1ECC | E268 | 9A3E | 098D | 0000 | 4689 | 9ADE |
| 0000150560 | 9DEC | 0D63 | 062B | 3EDC | 161B | 3EDE | DCA3 | 893E |
| 0000150600 | DE16 | 8E3E | AE06 | 2631 | 3E83 | 1192 | 7500 | E903 |
| 0000150620 | 004D | 7E83 | FEC8 | 0375 | 44E9 | FF00 | DE36 | FF3E |
| 0000150640 | DC36 | 1E3E | 2E68 | 8D0E | D246 | 5016 | 468D | 16F0 |
| 0000150660 | 8D50 | C446 | 5016 | 681E | 0EC4 | 2B68 | FF01 | A236 |
| 0000150700 | FF0E | A036 | FF0E | A636 | FF0E | A436 | 1E0E | 3968 |
| 0000150720 | 680E | 11D5 | D868 | 9A11 | 11DB | 0000 | C483 | 832A |
| 0000150740 | DE7E | 7500 | E903 | 00E8 | 76FF | FFE6 | E476 | 36FF |
| 0000150760 | 3EE0 | 681E | 3EE2 | 959A | 0012 | 8E00 | AE06 | 2631 |
| 0000151000 | 3E83 | 11E9 | 7500 | E903 | 0048 | 7E83 | FEC8 | 0375 |
| 0000151020 | 3FE9 | FF00 | DE76 | 681E | 0E41 | 468D | 16D2 | 8D50 |
| 0000151040 | F046 | 5016 | 468D | 16C4 | 1E50 | C468 | 680E | 012F |

THU MAR 14 17:25:16 1991 CRV_IPS.DLL PAGE 58, LINE 3364

| | | | | | | | | |
|---|---|---|---|---|---|---|---|---|
| 0000151060 | 36FF | 0EA2 | 36FF | 0EA0 | 36FF | 0EA6 | 36FF | 0EA4 |
| 0000151100 | 681E | 0E57 | FA68 | 6812 | 12ED | F09A | 0012 | 8300 |
| 0000151120 | 28C4 | 068E | 31AE | 8326 | A33E | 0012 | 0375 | 09E9 |
| 0000151140 | 8300 | C87E | 74FE | E903 | 000F | 068E | 31B0 | 8326 |
| 0000151160 | 163E | 0013 | 0375 | 51E9 | 8B00 | DE46 | 4689 | FFCA |
| 0000151200 | D076 | 76FF | 8DCE | CA46 | 5016 | 76FF | FFE0 | FA76 |
| 0000151220 | 76FF | 8DF8 | D24E | 5116 | 4E8D | 16F0 | 8D51 | C44E |
| 0000151240 | 5116 | 681E | 0EC4 | 3068 | FF01 | A236 | FF0E | A036 |
| 0000151260 | FF0E | A636 | FF0E | A436 | 9A0E | 135E | 0000 | C483 |
| 0000151300 | 8B28 | CA46 | FDE9 | E902 | 0006 | 468B | E9DE | 02F4 |
| 0000151320 | 46C7 | 00B8 | FF00 | F676 | 76FF | 6AF4 | 8D02 | B846 |
| 0000151340 | 5016 | 299A | 14CF | 830F | DAC4 | 4689 | 83E2 | E27E |
| 0000151360 | 7500 | E903 | 00EE | 76FF | FFE6 | E476 | 36FF | 3EE0 |
| 0000151400 | 681E | 3EE2 | A49A | 000F | 8900 | DE46 | 068E | 31AE |
| 0000151420 | 8326 | FE3E | 0012 | 0375 | 4CE9 | 8300 | C87E | 75FE |
| 0000151440 | E903 | 0043 | 76FF | FFE2 | C236 | FF0E | C036 | 8D0E |
| 0000151460 | D246 | 5016 | 468D | 16F0 | 8D50 | C446 | 5016 | 681E |
| 0000151500 | 0EC4 | 3868 | FF01 | A236 | FF0E | A036 | FF0E | A636 |
| 0000151520 | FF0E | A436 | 1E0E | 5F68 | 680E | 13F8 | FB68 | 9A13 |
| 0000151540 | 13FE | 0000 | C483 | 8E28 | AE06 | 2631 | 3E83 | 13B5 |
| 0000151560 | 7500 | E903 | 0009 | 7E83 | FEC8 | 0374 | 0FE9 | 8E00 |
| 0000151600 | B006 | 2631 | 3E83 | 1424 | 7500 | E903 | 0050 | 46C7 |
| 0000151620 | EFCA | FFFF | D076 | 76FF | 8DCE | CA46 | 5016 | 76FF |
| 0000151640 | FFE0 | FA76 | 76FF | 8DF8 | D24E | 5116 | 4E8D | 16F0 |
| 0000151660 | 8D51 | C44E | 5116 | 681E | 0EC4 | 3968 | FF01 | A236 |
| 0000151700 | FF0E | A036 | FF0E | A636 | FF0E | A436 | 9A0E | 146D |
| 0000151720 | 0000 | C483 | 8B28 | CA46 | E9E9 | 0006 | EFB8 | |
| 0000151740 | E9FF | 01E0 | 92E9 | C4F8 | 065E | C02B | 8926 | 4647 |
| 0000151760 | 8926 | 4447 | 76FF | FFE6 | E476 | 36FF | 3EE0 | 681E |
| 0000152000 | 3EE2 | 468B | 8B06 | 0856 | 4405 | 5200 | 9A50 | FFFF |
| 0000152020 | 0000 | 4689 | 83DE | DE7E | 7500 | E903 | 00D5 | 068E |
| 0000152040 | 31AE | 8326 | 0C3E | 0014 | 0375 | 48E9 | 8300 | C87E |
| 0000152060 | 75FE | E903 | 003F | 76FF | 1EDE | 6768 | 8D0E | D246 |
| 0000152100 | 5016 | 468D | 16F0 | 8D50 | C446 | 5016 | 681E | 0EC4 |
| 0000152120 | 4368 | FF01 | A236 | FF0E | A036 | FF0E | A636 | FF0E |
| 0000152140 | A436 | 1E0E | 7B68 | 680E | 0F7F | 8268 | 9A0F | 0F85 |
| 0000152160 | 0000 | C483 | 8E28 | AE06 | 2631 | 3E83 | 148A | 7500 |
| 0000152200 | E903 | 0009 | 7E83 | FEC8 | 0374 | 0FE9 | 8E00 | B006 |
| 0000152220 | 2631 | 3E83 | 1025 | 7500 | E903 | 0051 | 468B | 89DE |
| 0000152240 | CA46 | 76FF | FFD0 | CE76 | 468D | 16CA | FF50 | E076 |
| 0000152260 | 76FF | FFFA | F876 | 4E8D | 16D2 | 8D51 | F04E | 5116 |
| 0000152300 | 4E8D | 16C4 | 1E51 | C468 | 680E | 0144 | 36FF | 0EA2 |
| 0000152320 | 36FF | 0EA0 | 36FF | 0EA6 | 36FF | 0EA4 | 6D9A | 0010 |
| 0000152340 | 8300 | 28C4 | 468B | E9CA | 00DA | 06E9 | 8B00 | DE46 |
| 0000152360 | D1E9 | 8E00 | AE06 | 2631 | 3E83 | 0F37 | 7500 | E903 |
| 0000152400 | 0045 | 7E83 | FEC8 | 0375 | 3CE9 | 1E00 | 8368 | 8D0E |
| 0000152420 | D246 | 5016 | 468D | 16F0 | 8D50 | C446 | 5016 | 681E |
| 0000152440 | 0EC4 | 4768 | FF01 | A236 | FF0E | A036 | FF0E | A636 |
| 0000152460 | FF0E | A436 | 1E0E | 9868 | 680E | 1162 | 6568 | 9A11 |
| 0000152500 | 1168 | 0000 | C483 | 8E26 | AE06 | 2631 | 3E83 | 111A |
| 0000152520 | 7500 | E903 | 0009 | 7E83 | FEC8 | 0374 | 0FE9 | 8E00 |
| 0000152540 | B006 | 2631 | 3E83 | 1201 | 7500 | E903 | 0050 | 46C7 |
| 0000152560 | 00CA | FF00 | D076 | 76FF | 8DCE | CA46 | 5016 | 76FF |
| 0000152600 | FFE0 | FA76 | 76FF | 8DF8 | D24E | 5116 | 4E8D | 16F0 |
| 0000152620 | 8D51 | C44E | 5116 | 681E | 0EC4 | 4868 | FF01 | A236 |
| 0000152640 | FF0E | A036 | FF0E | A636 | FF0E | A436 | 9A0E | 124A |
| 0000152660 | 0000 | C483 | 8B28 | CA46 | 09E9 | E900 | 0006 | 00B8 |
| 0000152700 | E900 | 0000 | 5E1F | 835F | 02ED | E58B | 5D1F | CA4D |
| 0000152720 | 0004 | 581E | 4590 | 8B55 | 1EEC | D88E | EC81 | 0020 |

THU MAR 14 17:25:16 1991 CRV_IPS.DLL PAGE 59, LINE 3423

| | | | | | | | | |
|---|---|---|---|---|---|---|---|---|
| 0000152740 | 5657 | B81E | 0C16 | D88E | 1768 | 6816 | 309C | 559A |
| 0000152760 | 000D | 8E00 | B406 | 2631 | 3E83 | 0F46 | 7320 | E903 |
| 0000153000 | 0008 | 46C7 | 20F2 | E900 | 000B | 068E | 31B4 | A126 |
| 0000153020 | 0F46 | 4689 | 8EF2 | B406 | 2631 | 46A1 | 2B0F | F7D2 |
| 0000153040 | F276 | 4689 | 26F4 | 3EA1 | 890F | F646 | A126 | 0F42 |
| 0000153060 | 4689 | 6AF8 | 6A00 | 6A00 | 6A00 | 8D08 | F246 | 5016 |
| 0000153100 | 156A | DD9A | F4DF | 8315 | 0EC4 | 4689 | 83F0 | F07E |
| 0000153120 | 7500 | E903 | 0019 | 76FF | FFF0 | BA36 | FF0E | B836 |
| 0000153140 | 9A0E | 7582 | 1655 | C483 | B806 | FFEF | 14E9 | 8E02 |
| 0000153160 | B206 | 2631 | 14A1 | 260F | 168B | 0F16 | E0D1 | D2D1 |
| 0000153200 | 4689 | 89FA | FC56 | 7468 | 6815 | 309C | 76FF | FFFC |
| 0000153220 | FA76 | 229A | 000C | 8900 | F046 | 7E83 | 00F0 | 0375 |
| 0000153240 | 18E9 | 8300 | F07E | 7479 | E903 | 0009 | EFB8 | E9FF |
| 0000153260 | 01D1 | 06E9 | B800 | FFFF | C8E9 | 6A01 | 8D0A | E446 |
| 0000153300 | 5016 | E89A | 6DE1 | 8316 | 06C4 | 4689 | 83F0 | F07E |
| 0000153320 | 7403 | E903 | 0012 | 681E | 0ED7 | 829A | 7575 | 8312 |
| 0000153340 | 04C4 | EEB8 | E9FF | 019B | B2A1 | 0B0E | B006 | 740E |
| 0000153360 | E903 | 002F | 068E | 31B2 | FF26 | 1E36 | 260F | 36FF |
| 0000153400 | 0F1C | 486A | 006A | 006A | 681E | 0EB0 | FF9A | 00FF |
| 0000153420 | 8900 | EE46 | 7E83 | 00EE | 0375 | 06E9 | 8B00 | EE46 |
| 0000153440 | 60E9 | C401 | B01E | 260E | 47C6 | 0004 | 1EC4 | 0EB0 |
| 0000153460 | C02B | 8926 | 0247 | 8926 | C407 | B01E | 2B0E | 26C0 |
| 0000153500 | 4789 | 2656 | 4789 | C454 | B01E | 260E | 47C7 | 7A48 |
| 0000153520 | 8E00 | B406 | 2631 | 3CA1 | C40F | B01E | 260E | 4789 |
| 0000153540 | 8E58 | B406 | 2631 | 3EA1 | C40F | B01E | 260E | 4789 |
| 0000153560 | C45A | B01E | 260E | 47C7 | 905C | C401 | B01E | 260E |
| 0000153600 | 47C7 | 4866 | 8E00 | B406 | 2631 | 44A1 | C40F | B01E |
| 0000153620 | 260E | 4789 | 8E5E | B406 | 2631 | 46A1 | C40F | B01E |
| 0000153640 | 260E | 4789 | 8E60 | B206 | 2631 | 2CA1 | C40F | B01E |
| 0000153660 | 260E | 4789 | 8E62 | B206 | 2631 | 2EA1 | C40F | B01E |
| 0000153700 | 260E | 4789 | FF64 | E676 | 76FF | FFE4 | E876 | 1EC4 |
| 0000153720 | 0EB0 | FF26 | 6A77 | FF26 | 6877 | 959A | 8CCF | 8317 |
| 0000153740 | 0AC4 | 4689 | 83F0 | F07E | 7500 | E903 | 0019 | 76FF |
| 0000153760 | FFFD | BE36 | FF0E | BC36 | 9A0E | 7582 | 17CD | C483 |
| 0000154000 | B806 | FFEF | 7CE9 | 8E00 | B206 | 2631 | 36FF | 0F1E |
| 0000154020 | FF26 | 1C36 | FF0F | B236 | FF0E | B036 | 8D0E | E046 |
| 0000154040 | 5016 | FF9A | 00FF | 8900 | EE46 | 7E83 | 00EE | 0375 |
| 0000154060 | 15E9 | FF00 | EE76 | 681E | 0EF3 | 829A | 0875 | 8318 |
| 0000154100 | 06C4 | 468B | E9EE | 003B | 1EC4 | 0EB0 | 8B26 | 2607 |
| 0000154120 | 578B | C402 | 065E | 8926 | 4447 | 8926 | 4657 | B0A1 |
| 0000154140 | 8B0E | B216 | 050E | C004 | 5052 | 468B | 8B06 | 0856 |
| 0000154160 | 2405 | 5200 | 9A50 | 91D2 | 15D5 | C483 | B808 | 0000 |
| 0000154200 | 00E9 | 1F00 | 5F5E | ED83 | 8B02 | 1FE5 | 4D5D | 04CA |
| 0000154220 | 1E00 | 9058 | 5545 | EC8B | 8E1E | 81D8 | 62EC | 5700 |
| 0000154240 | 1E56 | 79B8 | 8E15 | C7D8 | FA46 | 0F09 | 5E8C | C7FC |
| 0000154260 | C846 | 0101 | C02B | 4689 | 89B8 | B646 | 068E | 31AE |
| 0000154300 | 8326 | 953E | 0019 | 0375 | 1DE9 | FF00 | A636 | FF0E |
| 0000154320 | A436 | 8D0E | AE46 | 5016 | 489A | 0000 | 8300 | 08C4 |
| 0000154340 | 003D | 7400 | E903 | 000F | 068E | 31B0 | 8326 | AD3E |
| 0000154360 | 0019 | 0375 | 3BE9 | 1E00 | 0D68 | 8D0F | BA46 | 5016 |
| 0000154400 | 468D | 16AE | 8D50 | F646 | 5016 | CD68 | 1E01 | 6068 |
| 0000154420 | FF0F | A236 | FF0E | A036 | FF0E | A636 | FF0E | A436 |
| 0000154440 | 9A0E | 0091 | 0000 | C483 | 891E | F646 | 5689 | E9F8 |
| 0000154460 | 0008 | C02B | 4689 | 89F8 | F646 | 2368 | 681A | 309C |
| 0000154500 | 7F9A | 0015 | C700 | D446 | 0020 | 068E | 31B2 | A126 |
| 0000154520 | 0F2A | E8C1 | 8905 | D646 | 46C7 | 00D8 | 2600 | 2AA1 |
| 0000154540 | 480F | 4689 | C7DA | CC46 | 0020 | 8126 | 283E | 000F |
| 0000154560 | 7704 | E903 | 0008 | 46C7 | 06AC | E900 | 0005 | 46C7 |
| 0000154600 | 04AC | 8E00 | B206 | 2631 | 28A1 | 8B0F | AC4E | E1D1 |

THU MAR 14 17:25:16 1991 CRV_IPS.DLL PAGE 60, LINE 3482

| | | | | | | | | |
|---|---|---|---|---|---|---|---|---|
| 0000154620 | D22B | F1F7 | EF25 | C1FF | 04E8 | 66F7 | 89AC | CE46 |
| 0000154640 | 46C7 | 00D0 | 8B00 | AC46 | E0D1 | 2B26 | 2806 | F70F |
| 0000154660 | 89D8 | D246 | 5EC4 | 2606 | 478B | 8928 | DC46 | 5EC4 |
| 0000154700 | 2606 | 478B | 892A | DE46 | 006A | 006A | 006A | 266A |
| 0000154720 | 468D | 16CC | 6A50 | 9A16 | DFDD | 1989 | C483 | 890E |
| 0000154740 | CA46 | 7E83 | 00CA | 0375 | 90E9 | FF00 | CA76 | 36FF |
| 0000154760 | 0EBA | 36FF | 0EB8 | 829A | 4F75 | 831B | 06C4 | 068E |
| 0000155000 | 31AE | 8326 | 4F3E | 001A | 0375 | 09E9 | 8300 | B27E |
| 0000155020 | 74FE | E903 | 000F | 068E | 31B0 | 8326 | 673E | 001A |
| 0000155040 | 0375 | 50E9 | C700 | B446 | FFEF | 76FF | FFB8 | B676 |
| 0000155060 | 468D | 16B4 | FF50 | C876 | 76FF | FFFC | FA76 | 4E8D |
| 0000155100 | 16BA | 8D51 | F64E | 5116 | 4E8D | 16AE | 1E51 | 6068 |
| 0000155120 | 680F | 01EE | 36FF | 0EA2 | 36FF | 0EA0 | 36FF | 0EA6 |
| 0000155140 | 36FF | 0EA4 | AF9A | 001A | 8300 | 28C4 | 468B | E9B4 |
| 0000155160 | 05C2 | 06E9 | B800 | FFEF | B9E9 | 8E05 | B206 | 2631 |
| 0000155200 | 14A1 | 260F | 168B | 0F16 | E0D1 | D2D1 | 4689 | 89F2 |
| 0000155220 | F456 | 3368 | 6818 | 309C | 76FF | FFF4 | F276 | 239A |
| 0000155240 | 0016 | 8900 | CA46 | 7E83 | 00CA | 0375 | 06E9 | 8301 |
| 0000155260 | CA7E | 7479 | E903 | 0080 | 068E | 31AE | 8326 | CF3E |
| 0000155300 | 001A | 0375 | 09E9 | 8300 | B27E | 74FE | E903 | 000F |
| 0000155320 | 068E | 31B0 | 8326 | E73E | 001A | 0375 | 50E9 | C700 |
| 0000155340 | B446 | FFEF | 76FF | FFB8 | B676 | 468D | 16B4 | FF50 |
| 0000155360 | C876 | 76FF | FFFC | FA76 | 4E8D | 16BA | 8D51 | F64E |
| 0000155400 | 5116 | 4E8D | 16AE | 1E51 | 6068 | 680F | 01F5 | 36FF |
| 0000155420 | 0EA2 | 36FF | 0EA0 | 36FF | 0EA6 | 36FF | 0EA4 | 2F9A |
| 0000155440 | 001B | 8300 | 28C4 | 468B | E9B4 | 0508 | 06E9 | B800 |
| 0000155460 | FFEF | FFE9 | E904 | 007D | 068E | 31AE | 8326 | 733E |
| 0000155500 | 001B | 0375 | 09E9 | 8300 | B27E | 74FE | E903 | 000F |
| 0000155520 | 068E | 31B0 | 8326 | 8B3E | 001B | 0375 | 50E9 | C700 |
| 0000155540 | B446 | FFFF | 76FF | FFB8 | B676 | 468D | 16B4 | FF50 |
| 0000155560 | C876 | 76FF | FFFC | FA76 | 4E8D | 16BA | 8D51 | F64E |
| 0000155600 | 5116 | 4E8D | 16AE | 1E51 | 6068 | 680F | 01F7 | 36FF |
| 0000155620 | 0EA2 | 36FF | 0EA0 | 36FF | 0EA6 | 36FF | 0EA4 | D39A |
| 0000155640 | 001B | 8300 | 28C4 | 468B | E9B4 | 0488 | 06E9 | B800 |
| 0000155660 | FFFF | 7FE9 | 6A04 | 8D0A | A246 | 5016 | E89A | 67E1 |
| 0000155700 | 831B | 06C4 | 4689 | 83CA | CA7E | 7403 | E903 | 0089 |
| 0000155720 | 681E | 0F11 | 829A | 6D75 | 8317 | 04C4 | 068E | 31AE |
| 0000155740 | 8326 | DE3E | 0014 | 0375 | 09E9 | 8300 | B27E | 74FE |
| 0000155760 | E903 | 000F | 068E | 31B0 | 8326 | F63E | 0014 | 0375 |
| 0000156000 | 50E9 | C700 | B446 | FFEE | 76FF | FFB8 | B676 | 468D |
| 0000156020 | 16B4 | FF50 | C876 | 76FF | FFFC | FA76 | 4E8D | 16BA |
| 0000156040 | 8D51 | F64E | 5116 | 4E8D | 16AE | 1E51 | 6068 | 680F |
| 0000156060 | 01FD | 36FF | 0EA2 | 36FF | 0EA0 | 36FF | 0EA6 | 36FF |
| 0000156100 | 0EA4 | 3E9A | 0015 | 8300 | 28C4 | 468B | E9B4 | 03E4 |
| 0000156120 | 06E9 | B800 | FFEE | DBE9 | A103 | 0EB6 | 060B | 0EB4 |
| 0000156140 | 0374 | A7E9 | 8E00 | B206 | 2631 | 36FF | 0F1E | FF26 |
| 0000156160 | 1C36 | 6A0F | 6A26 | 6A00 | 1E00 | B468 | 9A0E | 169D |
| 0000156200 | 0000 | 4689 | 83C6 | C67E | 7500 | E903 | 007E | 068E |
| 0000156220 | 31AE | 8326 | 813E | 001D | 0375 | 09E9 | 8300 | B27E |
| 0000156240 | 74FE | E903 | 000F | 068E | 31B0 | 8326 | 993E | 001D |
| 0000156260 | 0375 | 51E9 | 8B00 | C646 | 4689 | FFB4 | B876 | 76FF |
| 0000156300 | 8DB6 | B446 | 5016 | 76FF | FFC8 | FC76 | 76FF | 8DFA |
| 0000156320 | BA4E | 5116 | 4E8D | 16F6 | 8D51 | AE4E | 5116 | 681E |
| 0000156340 | 0F60 | 0668 | FF02 | A236 | FF0E | A036 | FF0E | A636 |
| 0000156360 | FF0E | A436 | 9A0E | 1DE1 | 0000 | C483 | 8B28 | B446 |
| 0000156400 | 31E9 | E903 | 0006 | 468B | E9C6 | 0328 | 1EC4 | 0EB4 |
| 0000156420 | C626 | 0447 | C400 | B41E | 2B0E | 26C0 | 4789 | 2602 |
| 0000156440 | 0789 | 1EC4 | 0EB4 | C02B | 8926 | 5647 | 8926 | 5447 |
| 0000156460 | 1EC4 | 0EB4 | C726 | 4847 | 007A | 068E | 31B4 | A126 |

THU MAR 14 17:25:16 1991 CRV_IPS.DLL PAGE 61, LINE 3541

| | | | | | | | | |
|---|---|---|---|---|---|---|---|---|
| 0000156500 | 0F3C | 1EC4 | 0EB4 | 8926 | 5847 | 068E | 31B4 | A126 |
| 0000156520 | 0F3E | 1EC4 | 0EB4 | 8926 | 5A47 | 1EC4 | 0EB4 | C726 |
| 0000156540 | 5C47 | 01F4 | 1EC4 | 0EB4 | C726 | 6647 | 0026 | 068E |
| 0000156560 | 31B4 | A126 | 0F44 | 1EC4 | 0EB4 | 8926 | 5E47 | 068E |
| 0000156600 | 31B4 | A126 | 0F46 | 1EC4 | 0EB4 | 8926 | 6047 | 068E |
| 0000156620 | 31B2 | A126 | 0F2C | 1EC4 | 0EB4 | 8926 | 6247 | 068E |
| 0000156640 | 31B2 | A126 | 0F2E | 1EC4 | 0EB4 | 8926 | 6447 | 76FF |
| 0000156660 | FFA4 | A276 | 76FF | C4A6 | B41E | 260E | 77FF | 266A |
| 0000156700 | 77FF | 9A68 | CF95 | 1D75 | C483 | 890A | CA46 | 7E83 |
| 0000156720 | 00CA | 0375 | 90E9 | FF00 | CA76 | 36FF | 0EBE | 36FF |
| 0000156740 | 0EBC | 829A | 3575 | 831E | 06C4 | 068E | 31AE | 8326 |
| 0000156760 | 413E | 001E | 0375 | 09E9 | 8300 | B27E | 74FE | E903 |
| 0000157000 | 000F | 068E | 31B0 | 8326 | 593E | 001E | 0375 | 50E9 |
| 0000157020 | C700 | B446 | FFEF | 76FF | FFB8 | B676 | 468D | 16B4 |
| 0000157040 | FF50 | CB76 | 76FF | FFFC | FA76 | 4E8D | 16BA | 8D51 |
| 0000157060 | F64E | 5116 | 4E8D | 16AE | 1E51 | 6068 | 680F | 021C |
| 0000157100 | 36FF | 0EA2 | 36FF | 0EA0 | 36FF | 0EA6 | 36FF | 0EA4 |
| 0000157120 | A29A | 001E | 8300 | 28C4 | 468B | E9B4 | 01D6 | 06E9 |
| 0000157140 | B800 | FFEF | CDE9 | 2B01 | 89C0 | A046 | 4689 | 8E9E |
| 0000157160 | B206 | 2631 | 36FF | 0F1E | FF26 | 1C36 | FF0F | B636 |
| 0000157200 | FF0E | B436 | 8D0E | 9E46 | 5016 | B39A | 0017 | 8900 |
| 0000157220 | C646 | 7E83 | 00C6 | 0375 | 8DE9 | FF00 | C676 | 681E |
| 0000157240 | 0F2D | 829A | E875 | 831E | 06C4 | 068E | 31AE | 8326 |
| 0000157260 | F43E | 001E | 0375 | 09E9 | 8300 | B27E | 74FE | E903 |
| 0000157300 | 000F | 068E | 31B0 | 8326 | 663E | 001F | 0375 | 51E9 |
| 0000157320 | 8B00 | C646 | 4689 | FFB4 | B876 | 76FF | 8DB6 | B446 |
| 0000157340 | 5016 | 76FF | FFC8 | FC76 | 76FF | 8DFA | BA4E | 5116 |
| 0000157360 | 4E8D | 16F6 | 8D51 | AE4E | 5116 | 681E | 0F60 | 2468 |
| 0000157400 | FF02 | A236 | FF0E | A036 | FF0E | A636 | FF0E | A436 |
| 0000157420 | 9A0E | 19F5 | 0000 | C483 | 8B28 | B446 | 15E9 | E901 |
| 0000157440 | 0006 | 468B | E9C6 | 010C | 1EC4 | 0EB4 | 8B26 | 2607 |
| 0000157460 | 578B | C402 | 065E | 8926 | 4447 | 8926 | 4657 | B4A1 |
| 0000157500 | 8B0E | B616 | 050E | 0004 | 5052 | 468B | 8B06 | 0856 |
| 0000157520 | 2405 | 5200 | 9A50 | 91D2 | 196A | C483 | 8E08 | AED6 |
| 0000157540 | 2631 | 3E83 | 1F4E | 7500 | E903 | 004B | 7E83 | FEB2 |
| 0000157560 | 0375 | 42E9 | FF00 | DE76 | 76FF | 1EDC | 4368 | 8D0F |
| 0000157600 | BA46 | 5016 | 468D | 16F6 | 8D50 | AE46 | 5016 | 681E |
| 0000157620 | 0F60 | 2B68 | FF02 | A236 | FF0E | A036 | FF0E | A636 |
| 0000157640 | FF0E | A436 | 1E0E | 5868 | 680F | 14CA | CD68 | 9A14 |
| 0000157660 | 14D0 | 0000 | C483 | 8E2A | AE06 | 2631 | 3E83 | 1853 |
| 0000157700 | 7500 | E903 | 0009 | 7E83 | FEB2 | 0374 | 0FE9 | 8E00 |
| 0000157720 | B006 | 2631 | 3E83 | 187F | 7500 | E903 | 0050 | 46C7 |
| 0000157740 | 00B4 | FF00 | B876 | 76FF | 8DB6 | B446 | 5016 | 76FF |
| 0000157760 | FFC8 | FC76 | 76FF | 8DFA | BA4E | 5116 | 4E8D | 16F6 |
| 0000160000 | 8D51 | AE4E | 5116 | 681E | 0F60 | 2C68 | FF02 | A236 |
| 0000160020 | FF0E | A036 | FF0E | A636 | FF0E | A436 | 9A0E | 1C86 |
| 0000160040 | 0000 | C483 | 8B28 | B446 | 09E9 | E900 | 0006 | 00B8 |
| 0000160060 | E900 | 0000 | 5E1F | 835F | 02ED | E58B | 5D1F | CA4D |
| 0000160100 | 0004 | 581E | 4590 | 8B55 | 1EEC | D88E | EC81 | 0054 |
| 0000160120 | 5657 | B81E | 18CB | D88E | 46C7 | 79EA | 8C0F | EC5E |
| 0000160140 | 46C7 | 01D6 | 2B01 | 89C0 | C646 | 4689 | 8EC4 | AE06 |
| 0000160160 | 2631 | 3E83 | 1C25 | 7500 | E903 | 001D | 36FF | 0EA6 |
| 0000160200 | 36FF | 0EA4 | 468D | 16BC | 9A50 | 1869 | 0000 | C483 |
| 0000160220 | 3D08 | 0000 | 0374 | 0FE9 | 8E00 | B006 | 2631 | 3E83 |
| 0000160240 | 1C3D | 7500 | E903 | 003B | 681E | 0F7D | 468D | 16C8 |
| 0000160260 | 8D50 | BC46 | 5016 | 468D | 16E6 | 6850 | 024A | 681E |
| 0000160300 | 1008 | 36FF | 0EA2 | 36FF | 0EA0 | 36FF | 0EA6 | 36FF |
| 0000160320 | 0EA4 | B29A | 0018 | 8300 | 1EC4 | 4689 | 89E6 | E856 |
| 0000160340 | 08E9 | 2B00 | 89C0 | E846 | 4689 | 68E6 | 1FE4 | 9C68 |

THU MAR 14 17:25:16 1991 CRV_IPS.DLL PAGE 62, LINE 3600

| | | | | | | | | |
|---|---|---|---|---|---|---|---|---|
| 0000160360 | 9A30 | 18D1 | 0000 | 068E | 31B4 | 8326 | 463E | 200F |
| 0000160400 | 0373 | 08E9 | C700 | EE46 | 0020 | 0BE9 | 8E00 | B406 |
| 0000160420 | 2631 | 46A1 | 890F | EE46 | 068E | 31B4 | A126 | 0F46 |
| 0000160440 | D22B | 76F7 | 89EE | F046 | A126 | 0F3E | 4689 | 26F2 |
| 0000160460 | 42A1 | 890F | F446 | 8326 | 443E | 200F | 0373 | 08E9 |
| 0000160500 | C700 | F646 | 0020 | 0BE9 | 8E00 | B406 | 2631 | 44A1 |
| 0000160520 | 890F | F646 | 068E | 31B2 | 8126 | 283E | 000F | 7704 |
| 0000160540 | E903 | 0008 | 46C7 | 06BA | E900 | 0005 | 46C7 | 04BA |
| 0000160560 | 8E00 | B406 | 2631 | 44A1 | 2B0F | F7D2 | F676 | 4E8B |
| 0000160600 | D1BA | 2BE1 | F7D2 | F7F1 | BA66 | E0D1 | 4689 | 26F8 |
| 0000160620 | 3CA1 | 890F | FA46 | 468B | D1BA | 26E0 | 062B | 0F40 |
| 0000160640 | D8F7 | 8940 | FC46 | 006A | 006A | 006A | 106A | 468D |
| 0000160660 | 16EE | 6A50 | 9A17 | DFDD | 1D56 | C483 | 890E | D846 |
| 0000160700 | 7E83 | 00D8 | 0375 | D8E9 | 8E00 | AE06 | 2631 | 3E83 |
| 0000160720 | 21BB | 7500 | E903 | 004C | 7E83 | FEC0 | 0375 | 43E9 |
| 0000160740 | FF00 | D876 | 36FF | 0EBA | 36FF | 0EB8 | 468D | 16C8 |
| 0000160760 | 8D50 | E646 | 5016 | 468D | 16BC | 1E50 | 0868 | 6810 |
| 0000161000 | 0270 | 36FF | 0EA2 | 36FF | 0EA0 | 36FF | 0EA6 | 36FF |
| 0000161020 | 0EA4 | 681E | 0F81 | CD68 | 6823 | 23D0 | D39A | 0023 |
| 0000161040 | 8300 | 28C4 | 068E | 31AE | 8326 | 753E | 0022 | 0375 |
| 0000161060 | 09E9 | 8300 | C07E | 74FE | E903 | 000F | 068E | 31B0 |
| 0000161100 | 8326 | 8D3E | 0022 | 0375 | 50E9 | C700 | C246 | FFEF |
| 0000161120 | 76FF | FFC6 | C476 | 468D | 16C2 | FF50 | D676 | 76FF |
| 0000161140 | FFEC | EA76 | 4E8D | 16C8 | 8D51 | E64E | 5116 | 4E8D |
| 0000161160 | 16BC | 1E51 | 0868 | 6810 | 0271 | 36FF | 0EA2 | 36FF |
| 0000161200 | 0EA0 | 36FF | 0EA6 | 36FF | 0EA4 | D59A | 0022 | 8300 |
| 0000161220 | 28C4 | 468B | E9C2 | 06E5 | 06E9 | B800 | FFEF | DCE9 |
| 0000161240 | 8E06 | B206 | 2631 | 14A1 | 260F | 168B | 0F16 | E0D1 |
| 0000161260 | D2D1 | 4689 | 89E2 | E456 | 7C68 | 6820 | 309C | 76FF |
| 0000161300 | FFE4 | E276 | 2F9A | 001A | 8900 | D846 | 7E83 | 00D8 |
| 0000161320 | 0375 | 06E9 | 8301 | D87E | 7479 | E903 | 0080 | 068E |
| 0000161340 | 31AE | 8326 | F53E | 0022 | 0375 | 09E9 | 8300 | C07E |
| 0000161360 | 74FE | E903 | 000F | 068E | 31B0 | 8326 | 0D3E | 0023 |
| 0000161400 | 0375 | 50E9 | C700 | C246 | FFEF | 76FF | FFC6 | C476 |
| 0000161420 | 468D | 16C2 | FF50 | D676 | 76FF | FFEC | EA76 | 4E8D |
| 0000161440 | 16C8 | 8D51 | E64E | 5116 | 4E8D | 16BC | 1E51 | 0868 |
| 0000161460 | 6810 | 0278 | 36FF | 0EA2 | 36FF | 0EA0 | 36FF | 0EA6 |
| 0000161500 | 36FF | 0EA4 | 559A | 0023 | 8300 | 28C4 | 468B | E9C2 |
| 0000161520 | 062B | 06E9 | B800 | FFEF | 22E9 | E906 | 007D | 068E |
| 0000161540 | 31AE | 8326 | 8D3E | 0023 | 0375 | 09E9 | 8300 | C07E |
| 0000161560 | 74FE | E903 | 000F | 068E | 31B0 | 8326 | F93E | 0023 |
| 0000161600 | 0375 | 50E9 | C700 | C246 | FFFF | 76FF | FFC6 | C476 |
| 0000161620 | 468D | 16C2 | FF50 | D676 | 76FF | FFEC | EA76 | 4E8D |
| 0000161640 | 16C8 | 8D51 | E64E | 5116 | 4E8D | 16BC | 1E51 | 0868 |
| 0000161660 | 6810 | 027A | 36FF | 0EA2 | 36FF | 0EA0 | 36FF | 0EA6 |
| 0000161700 | 36FF | 0EA4 | 419A | 0024 | 8300 | 28C4 | 468B | E9C2 |
| 0000161720 | 05AB | 06E9 | B800 | FFFF | A2E9 | 6A05 | 8D0A | B046 |
| 0000161740 | 5016 | E89A | 48E1 | 8321 | 06C4 | 4689 | 83D8 | D87E |
| 0000161760 | 7403 | E903 | 00D1 | 068E | 31AE | 8326 | E13E | 0023 |
| 0000162000 | 0375 | 45E9 | 8300 | C07E | 75FE | E903 | 003C | 681E |
| 0000162020 | 0F89 | 468D | 16C8 | 8D50 | E646 | 5016 | 468D | 16BC |
| 0000162040 | 1E50 | 0868 | 6810 | 027F | 36FF | 0EA2 | 36FF | 0EA0 |
| 0000162060 | 36FF | 0EA6 | 36FF | 0EA4 | 681E | 0FA5 | D768 | 6824 |
| 0000162100 | 24DA | DD9A | 0024 | 8300 | 26C4 | 068E | 31AE | 8326 |
| 0000162120 | 943E | 0024 | 0375 | 09E9 | 8300 | C07E | 74FE | E903 |
| 0000162140 | 000F | 068E | 31B0 | 8326 | 303E | 0020 | 0375 | 50E9 |
| 0000162160 | C700 | C246 | FFEE | 76FF | FFC6 | C476 | 468D | 16C2 |
| 0000162200 | FF50 | D676 | 76FF | FFEC | EA76 | 4E8D | 16C8 | 8D51 |
| 0000162220 | E64E | 5116 | 4E8D | 16BC | 1E51 | 0868 | 6810 | 0280 |

THU MAR 14 17:25:16 1991 CRV_IPS.DLL PAGE 63, LINE 3659

| | | | | | | | | |
|---|---|---|---|---|---|---|---|---|
| 0000162240 | 36FF | 0EA2 | 36FF | 0EA0 | 36FF | 0EA6 | 36FF | 0EA4 |
| 0000162260 | AE9A | 001F | 8300 | 28C4 | 468B | E9C2 | 04BF | 06E9 |
| 0000162300 | B800 | FFEE | B6E9 | 8E04 | B206 | 2631 | 1CA1 | 260F |
| 0000162320 | 168B | 0F1E | 4689 | 89DE | E056 | 76FF | FFE0 | DE76 |
| 0000162340 | 76FF | 6AB4 | 6A00 | 8D00 | DA46 | 5016 | 0E9A | 001C |
| 0000162360 | 8900 | D446 | 7E83 | 00D4 | 0375 | D5E9 | 8E00 | AE06 |
| 0000162400 | 2631 | 3E83 | 24EB | 7500 | E903 | 0048 | 7E83 | FEC0 |
| 0000162420 | 0375 | 3FE9 | FF00 | D476 | 681E | 0FAD | 468D | 16C8 |
| 0000162440 | 8D50 | E646 | 5016 | 468D | 16BC | 1E50 | 0868 | 6810 |
| 0000162460 | 0288 | 36FF | 0EA2 | 36FF | 0EA0 | 36FF | 0EA6 | 36FF |
| 0000162500 | 0EA4 | 681E | 0FC1 | 3A68 | 681F | 1F3D | 409A | 001F |
| 0000162520 | 8300 | 28C4 | 068E | 31AE | 8326 | 043E | 0020 | 0375 |
| 0000162540 | 09E9 | 8300 | C07E | 74FE | E903 | 000F | 068E | 31B0 |
| 0000162560 | 8326 | C83E | 0026 | 0375 | 51E9 | 8B00 | D446 | 4689 |
| 0000162600 | FFC2 | C676 | 76FF | 8DC4 | C246 | 5016 | 76FF | FFD6 |
| 0000162620 | EC76 | 76FF | 8DEA | C84E | 5116 | 4E8D | 16E6 | 8D51 |
| 0000162640 | BC4E | 5116 | 681E | 1008 | 8968 | FF02 | A236 | FF0E |
| 0000162660 | A036 | FF0E | A636 | FF0E | A436 | 9A0E | 2710 | 0000 |
| 0000162700 | C483 | 8B28 | C246 | B4E9 | E903 | 0006 | 468B | E9D4 |
| 0000162720 | 03AB | 5EC4 | 2BDA | 26C0 | 4789 | 2646 | 4789 | C444 |
| 0000162740 | DA5E | C02B | 8926 | 5647 | 8926 | 5447 | 5EC4 | 2BDA |
| 0000162760 | 26C0 | 4789 | 2602 | 0789 | 5EC4 | 26DA | 47C7 | 7848 |
| 0000163000 | 8E00 | B406 | 2631 | 3CA1 | C40F | DA5E | 8926 | 5847 |
| 0000163020 | 068E | 31B4 | A126 | 0F3E | 5EC4 | 26DA | 4789 | C45A |
| 0000163040 | DA5E | C726 | 5C47 | 0064 | 068E | 31B4 | A126 | 0F44 |
| 0000163060 | 5EC4 | 26DA | 4789 | 8E5E | B406 | 2631 | 46A1 | C40F |
| 0000163100 | DA5E | 8926 | 6047 | 068E | 31B2 | A126 | 0F2C | 5EC4 |
| 0000163120 | 26DA | 4789 | 8E62 | B206 | 2631 | 2EA1 | C40F | DA5E |
| 0000163140 | 8926 | 6447 | 468B | 8B06 | 0856 | 2405 | 5200 | 8B50 |
| 0000163160 | DA46 | 568B | 05DC | 0004 | 5052 | D29A | 2991 | 8326 |
| 0000163200 | 08C4 | 76FF | FFB2 | B076 | 76FF | C4B4 | DA5E | FF26 |
| 0000163220 | 6A77 | FF26 | 6877 | 959A | 75CF | 8323 | 0AC4 | 4689 |
| 0000163240 | 83D8 | D87E | 7500 | E903 | 00EC | 76FF | FFE0 | DE76 |
| 0000163260 | 76FF | FFDC | DA76 | FF9A | 00FF | 8900 | D446 | 068E |
| 0000163300 | 31AE | 8326 | B03E | 0026 | 0375 | 4CE9 | 8300 | C07E |
| 0000163320 | 75FE | E903 | 0043 | 76FF | FFD8 | BE36 | FF0E | BC36 |
| 0000163340 | 8D0E | C846 | 5016 | 468D | 16E6 | 8D50 | BC46 | 5016 |
| 0000163360 | 681E | 1008 | 9F68 | FF02 | A236 | FF0E | A036 | FF0E |
| 0000163400 | A636 | FF0E | A436 | 1E0E | C968 | 680F | 27A0 | A368 |
| 0000163420 | 9A27 | 27A6 | 0000 | C483 | 8E28 | AE06 | 2631 | 3E83 |
| 0000163440 | 275D | 7500 | E903 | 0009 | 7E83 | FEC0 | 0374 | 0FE9 |
| 0000163460 | 8E00 | B006 | 2631 | 3E83 | 27CC | 7500 | E903 | 0050 |
| 0000163500 | 46C7 | EFC2 | FFFF | C676 | 76FF | 8DC4 | C246 | 5016 |
| 0000163520 | 76FF | FFD6 | EC76 | 76FF | 8DEA | C84E | 5116 | 4E8D |
| 0000163540 | 16E6 | 8D51 | BC4E | 5116 | 681E | 1008 | A068 | FF02 |
| 0000163560 | A236 | FF0E | A036 | FF0E | A636 | FF0E | A436 | 9A0E |
| 0000163600 | 2815 | 0000 | C483 | 8B28 | C246 | F0E9 | E901 | 0006 |
| 0000163620 | EFB8 | E9FF | 01E7 | C02B | 4689 | 89AE | AC46 | 76FF |
| 0000163640 | FFE0 | DE76 | 76FF | FFDC | DA76 | 016A | 016A | 006A |
| 0000163660 | 468D | 16AC | 9A50 | FFFF | 0000 | 4689 | 83D4 | D47E |
| 0000163700 | 7500 | E903 | 00D5 | 068E | 31AE | 8326 | B43E | 0027 |
| 0000163720 | 0375 | 48E9 | 8300 | C07E | 75FE | E903 | 003F | 76FF |
| 0000163740 | 1ED4 | D168 | 8D0F | C846 | 5016 | 468D | 16E6 | 8D50 |
| 0000163760 | BC46 | 5016 | 681E | 1008 | A768 | FF02 | A236 | FF0E |
| 0000164000 | A036 | FF0E | A636 | FF0E | A436 | 1E0E | E368 | 680F |
| 0000164020 | 2883 | 8668 | 9A28 | 2889 | 0000 | C483 | 8E28 | AE06 |
| 0000164040 | 2631 | 3E83 | 2843 | 7500 | E903 | 0009 | 7E83 | FEC0 |
| 0000164060 | 0374 | 0FE9 | 8E00 | B006 | 2631 | 3E83 | 28AF | 7500 |
| 0000164100 | E903 | 0051 | 468B | 89D4 | C246 | 76FF | FFC6 | C476 |

THU MAR 14 17:25:16 1991 CRV_IPS.DLL PAGE 64, LINE 3718

| | | | | | | | | |
|---|---|---|---|---|---|---|---|---|
| 0000164120 | 468D | 16C2 | FF50 | D676 | 76FF | FFEC | EA76 | 4E8D |
| 0000164140 | 16C8 | 8D51 | E64E | 5116 | 4E8D | 16BC | 1E51 | 0868 |
| 0000164160 | 6810 | 02A8 | 36FF | 0EA2 | 36FF | 0EA0 | 36FF | 0EA6 |
| 0000164200 | 36FF | 0EA4 | 1B9A | 0022 | 8300 | 28C4 | 468B | E9C2 |
| 0000164220 | 00EB | 06E9 | 8B00 | D446 | E2E9 | 8B00 | AC46 | 568B |
| 0000164240 | C4AE | 065E | 8926 | 4447 | 8926 | 4657 | 068E | 31AE |
| 0000164260 | 8326 | 973E | 0028 | 0375 | 45E9 | 8300 | C07E | 75FE |
| 0000164300 | E903 | 003C | 681E | 0FEB | 468D | 16C8 | 8D50 | E646 |
| 0000164320 | 5016 | 468D | 16BC | 1E50 | 0868 | 6810 | 02AD | 36FF |
| 0000164340 | 0EA2 | 36FF | 0EA0 | 36FF | 0EA6 | 36FF | 0EA4 | 681E |
| 0000164360 | 0FFF | A768 | 6821 | 21AA | AD9A | 0021 | 8300 | 26C4 |
| 0000164400 | 068E | 31AE | 8326 | 603E | 0021 | 0375 | 09E9 | 8300 |
| 0000164420 | C07E | 74FE | E903 | 000F | 068E | 31B0 | 8326 | D33E |
| 0000164440 | 0021 | 0375 | 50E9 | C700 | C246 | 0000 | 76FF | FFC6 |
| 0000164460 | C476 | 468D | 16C2 | FF50 | D676 | 76FF | FFEC | EA76 |
| 0000164500 | 4E8D | 16C8 | 8D51 | E64E | 5116 | 4E8D | 16BC | 1E51 |
| 0000164520 | 0868 | 6810 | 02AE | 36FF | 0EA2 | 36FF | 0EA0 | 36FF |
| 0000164540 | 0EA6 | 36FF | 0EA4 | 4C9A | 0025 | 8300 | 28C4 | 468B |
| 0000164560 | E9C2 | 0009 | 06E9 | B800 | 0000 | 00E9 | 1F00 | 5F5E |
| 0000164600 | ED83 | 8B02 | 1FE5 | 4D5D | 04CA | 1E00 | 9058 | 5545 |
| 0000164620 | EC8B | 8E1E | 81D8 | 04EC | 5700 | 1E56 | 49B8 | 8E22 |
| 0000164640 | 6AD8 | FF04 | 0876 | 76FF | 6A06 | 6A00 | 6A00 | 6A00 |
| 0000164660 | 9A01 | DFDD | 260D | C483 | 890E | FC46 | 7E83 | 00FC |
| 0000164700 | 0375 | 06E9 | B800 | FFEF | 06E9 | B800 | 0000 | 00E9 |
| 0000164720 | 1F00 | 5F5E | ED83 | 8B02 | 1FE5 | 4D5D | 04CA | 1E00 |
| 0000164740 | 9058 | 5545 | EC8B | 8E1E | 81D8 | 04EC | 5700 | 1E56 |
| 0000164760 | 2DB8 | 8E29 | C4D8 | 0A5E | C426 | 485F | 8B26 | 5C47 |
| 0000165000 | 40E9 | FF00 | 0876 | 76FF | FF06 | 0C76 | 76FF | 9A0A |
| 0000165020 | 3C02 | 29BC | C483 | 8908 | FC46 | 37E9 | FF00 | 0876 |
| 0000165040 | 76FF | FF06 | 0C76 | 76FF | 9A0A | 55E1 | FFFF | C483 |
| 0000165060 | 8908 | FC46 | 1DE9 | B800 | FFE3 | 1DE9 | E900 | 0014 |
| 0000165100 | 11E9 | 4800 | 0375 | BAE9 | 2DFF | 0063 | 0375 | CCE9 |
| 0000165120 | E9FF | FFE3 | 468B | E9FC | 0000 | 5E1F | 835F | 02ED |
| 0000165140 | E58B | 5D1F | CA4D | 0008 | 581E | 4590 | 8B55 | 1EEC |
| 0000165160 | D88E | EC81 | 002C | 5657 | 46C7 | 18F8 | 8C10 | FA5E |
| 0000165200 | 46C7 | 01EE | 2B01 | 89C0 | DE46 | 4689 | 8EDC | AE06 |
| 0000165220 | 2631 | 3E83 | 2C32 | 7500 | E903 | 001D | 36FF | 0EA6 |
| 0000165240 | 36FF | 0EA4 | 468D | 16D4 | 9A50 | 201A | 0000 | C483 |
| 0000165260 | 3D08 | 0000 | 0374 | 0FE9 | 8E00 | B006 | 2631 | 3E83 |
| 0000165300 | 2DA6 | 7500 | E903 | 003B | 681E | 101C | 468D | 16E0 |
| 0000165320 | 8D50 | D446 | 5016 | 468D | 16F4 | 6850 | 030C | 681E |
| 0000165340 | 106A | 36FF | 0EA2 | 36FF | 0EA0 | 36FF | 0EA6 | 36FF |
| 0000165360 | 0EA4 | 639A | 0020 | 8300 | 1EC4 | 4689 | 89F4 | F656 |
| 0000165400 | 08E9 | 2800 | 89C0 | F646 | 4689 | 8EF4 | B206 | 2631 |
| 0000165420 | 2CA1 | 480F | D22B | F726 | 2E36 | 400F | 4689 | 6AFC |
| 0000165440 | 6A00 | 6A08 | 2600 | 36FF | 0F2E | 068E | 31B4 | A126 |
| 0000165460 | 0F46 | F726 | 4426 | 520F | 9A50 | A190 | 2AD3 | 5052 |
| 0000165500 | F69A | B4A0 | 892B | F046 | 5689 | 8EF2 | B206 | 2631 |
| 0000165520 | 24A1 | 260F | 168B | 0F26 | 3926 | 1C06 | 740F | E903 |
| 0000165540 | 001B | 3926 | 1E16 | 740F | E903 | 0011 | 1EC4 | 0EAC |
| 0000165560 | C02B | 8926 | 4647 | 8926 | 4447 | 19E9 | 8E00 | B206 |
| 0000165600 | 2631 | 1CA1 | 260F | 168B | 0F1E | 1EC4 | 0EAC | 8926 |
| 0000165620 | 4447 | 8926 | 4657 | 1EC4 | 0EAC | C02B | 8926 | 5647 |
| 0000165640 | 8926 | 5447 | 1EC4 | 0EAC | C02B | 8926 | 0247 | 8926 |
| 0000165660 | C407 | AC1E | 260E | 47C7 | 7848 | 8E00 | B406 | 2631 |
| 0000165700 | 3CA1 | C40F | AC1E | 260E | 4789 | 8E58 | B406 | 2631 |
| 0000165720 | 3EA1 | C40F | AC1E | 260E | 4789 | 8B5A | 0646 | 1EC4 |
| 0000165740 | 0EAC | 8926 | 5C47 | 068E | 31B4 | A126 | 0F44 | 1EC4 |
| 0000165760 | 0EAC | 8926 | 5E47 | 068E | 31B4 | A126 | 0F46 | 1EC4 |

THU MAR 14 17:25:16 1991 CRV_IPS.DLL PAGE 65, LINE 3777

| | | | | | | | | |
|---|---|---|---|---|---|---|---|---|
| 0000166000 | 0EAC | 8926 | 6047 | 068E | 31B2 | A126 | 0F2C | 1EC4 |
| 0000166020 | 0EAC | 8926 | 6247 | 76FF | FFF2 | F076 | 006A | 76FF |
| 0000166040 | 9AFC | A190 | 2C82 | 1EC4 | 0EAC | 8926 | 6C47 | 8926 |
| 0000166060 | 6E57 | 1EC4 | 0EAC | 8B26 | 5C47 | 64B9 | 9900 | F9F7 |
| 0000166100 | 0ABA | 8B00 | 99DA | FBF7 | FA83 | 7500 | E903 | 0031 |
| 0000166120 | 1EC4 | 0EAC | 8B26 | 5C47 | F799 | 48F9 | C06B | 3D64 |
| 0000166140 | 0000 | 0374 | 0DE9 | C400 | AC1E | 260E | 47C7 | 1066 |
| 0000166160 | E908 | 000A | 1EC4 | 0EAC | C726 | 6647 | 0048 | 0AE9 |
| 0000166200 | C400 | AC1E | 260E | 47C7 | 0066 | 8E00 | B206 | 2631 |
| 0000166220 | 2EA1 | C40F | AC1E | 260E | 4789 | 8E64 | AE06 | 2631 |
| 0000166240 | 3E83 | 2CD2 | 7500 | E903 | 0045 | 7E83 | FED8 | 0375 |
| 0000166260 | 3CE9 | 1E00 | 2068 | 8D10 | E046 | 5016 | 468D | 16F4 |
| 0000166300 | 8D50 | D446 | 5016 | 681E | 106A | 3368 | FF03 | A236 |
| 0000166320 | FF0E | A036 | FF0E | A636 | FF0E | A436 | 1E0E | 3068 |
| 0000166340 | 6810 | 2D1A | 1D68 | 9A2D | 2D20 | 0000 | C483 | 9A26 |
| 0000166360 | 9DEC | 2CBA | DCA3 | 893E | DE16 | 8E3E | B206 | 2631 |
| 0000166400 | 36FF | 0F22 | FF26 | 2036 | FF0F | AE36 | FF0E | AC36 |
| 0000166420 | 6A0E | 6A02 | 6A00 | 1E00 | 0E68 | 1E36 | 1468 | 9A36 |
| 0000166440 | 05A1 | 0000 | 4689 | 9AEC | 9DEC | 2944 | 062B | 3EDC |
| 0000166460 | 161B | 3EDE | DCA3 | 893E | DE16 | 8E3E | AE06 | 2631 |
| 0000166500 | 3E83 | 2D37 | 7500 | E903 | 004D | 7E83 | FED8 | 0375 |
| 0000166520 | 44E9 | FF00 | DE36 | FF3E | DC36 | 1E3E | 3868 | 8D10 |
| 0000166540 | E046 | 5016 | 468D | 16F4 | 8D50 | D446 | 5016 | 681E |
| 0000166560 | 106A | 3968 | FF03 | A236 | FF0E | A036 | FF0E | A636 |
| 0000166600 | FF0E | A436 | 1E0E | 4368 | 6810 | 2D7A | 7D68 | 9A2D |
| 0000166620 | 2D80 | 0000 | C483 | 832A | EC7E | 7500 | E903 | 00D5 |
| 0000166640 | 068E | 31AE | 8326 | 8E3E | 002D | 0375 | 48E9 | 8300 |
| 0000166660 | D87E | 75FE | E903 | 003F | 76FF | 1EEC | 4B68 | 8D10 |
| 0000166700 | E046 | 5016 | 468D | 16F4 | 8D50 | D446 | 5016 | 681E |
| 0000166720 | 106A | 3C68 | FF03 | A236 | FF0E | A036 | FF0E | A636 |
| 0000166740 | FF0E | A436 | 1E0E | 6168 | 6810 | 269C | 9F68 | 9A26 |
| 0000166760 | 26A2 | 0000 | C483 | 8E28 | AE06 | 2631 | 3E83 | 2655 |
| 0000167000 | 7500 | E903 | 0009 | 7E83 | FED8 | 0374 | 0FE9 | 8E00 |
| 0000167020 | B006 | 2631 | 3E83 | 2503 | 7500 | E903 | 0051 | 468B |
| 0000167040 | 89EC | DA46 | 76FF | FFDE | DC76 | 468D | 16DA | FF50 |
| 0000167060 | EE76 | 76FF | FFFA | F876 | 4E8D | 16E0 | 8D51 | F44E |
| 0000167100 | 5116 | 4E8D | 16D4 | 1E51 | 6A68 | 6810 | 033D | 36FF |
| 0000167120 | 0EA2 | 36FF | 0EA0 | 36FF | 0EA6 | 36FF | 0EA4 | 6C9A |
| 0000167140 | 002E | 8300 | 28C4 | 468B | E9DA | 0086 | 06E9 | 8B00 |
| 0000167160 | EC46 | 7DE9 | 8E00 | AE06 | 2631 | 3E83 | 2A24 | 7500 |
| 0000167200 | E903 | 0009 | 7E83 | FED8 | 0374 | 0FE9 | 8E00 | B006 |
| 0000167220 | 2631 | 3E83 | 2A50 | 7500 | E903 | 0050 | 46C7 | 00DA |
| 0000167240 | FF00 | DE76 | 76FF | 8DDC | DA46 | 5016 | 76FF | FFEE |
| 0000167260 | FA76 | 76FF | 8DF8 | E04E | 5116 | 4E8D | 16F4 | 8D51 |
| 0000167300 | D44E | 5116 | 681E | 106A | 4068 | FF03 | A236 | FF0E |
| 0000167320 | A036 | FFDE | A636 | FF0E | A436 | 9A0E | 28F7 | 0000 |
| 0000167340 | C483 | 8B28 | DA46 | 09E9 | E900 | 0006 | 00B8 | E900 |
| 0000167360 | 0000 | 5F5E | ED83 | 8B02 | 1FE5 | 4D5D | 1ECB | 9058 |
| 0000167400 | 5545 | EC8B | 8E1E | 81D8 | 28EC | 5700 | C756 | FA46 |
| 0000167420 | 1078 | 5E8C | C7FC | F246 | 0101 | C02B | 4689 | 89E2 |
| 0000167440 | E046 | 068E | 31AE | 8326 | 0C3E | 002E | 0375 | 1DE9 |
| 0000167460 | FF00 | A636 | FF0E | A436 | 8D0E | D846 | 5016 | 3A9A |
| 0000167500 | 002A | 8300 | 08C4 | 003D | 7400 | E903 | 000F | 068E |
| 0000167520 | 31B0 | 8326 | 243E | 002E | 0375 | 3BE9 | 1E00 | 7C68 |
| 0000167540 | 8D10 | E446 | 5016 | 468D | 16D8 | 8D50 | F646 | 5016 |
| 0000167560 | 4E68 | 1E03 | C268 | FF1D | A236 | FF0E | A036 | FF0E |
| 0000167600 | A636 | FF0E | A436 | 9A0E | 2A83 | 0000 | C483 | 891E |
| 0000167620 | F646 | 5689 | E9F8 | 0008 | C02B | 4689 | 89F8 | F646 |
| 0000167640 | EC9A | 649D | A32F | 3EDC | 1689 | 3EDE | 068E | 31B2 |

THU MAR 14 17:25:16 1991 CRV_IPS.DLL PAGE 66, LINE 3836

| | | | | | | | | |
|---|---|---|---|---|---|---|---|---|
| 0000167660 | FF26 | 1E36 | 260F | 36FF | 0F1C | 36FF | 3EE0 | 76FF |
| 0000167700 | FF0A | E436 | FF3E | E236 | 9A3E | FFFF | 0000 | 4689 |
| 0000167720 | 9AF0 | 9DEC | 2ACC | 062B | 3EDC | 161B | 3EDE | DCA3 |
| 0000167740 | 893E | DE16 | 833E | F07E | 7500 | E903 | 00D5 | 068E |
| 0000167760 | 31AE | 8326 | DC3E | 002F | 0375 | 48E9 | 8300 | DC7E |
| 0000170000 | 75FE | E903 | 003F | 76FF | 1EF0 | 8068 | 8D10 | E446 |
| 0000170020 | 5016 | 468D | 16F6 | 8D50 | D846 | 5016 | 681E | 10C2 |
| 0000170040 | 5A68 | FF03 | A236 | FF0E | A036 | FF0E | A636 | FF0E |
| 0000170060 | A436 | 1E0E | 9768 | 6810 | 3145 | 4868 | 9A31 | 314B |
| 0000170100 | 0000 | C483 | 8E28 | AE06 | 2631 | 3E83 | 30FE | 7500 |
| 0000170120 | E903 | 0009 | 7E83 | FEDC | 0374 | 0FE9 | 8E00 | B006 |
| 0000170140 | 2631 | 3E83 | 3171 | 7500 | E903 | 0051 | 468B | 89F0 |
| 0000170160 | DE46 | 76FF | FFE2 | E076 | 468D | 16DE | FF50 | F276 |
| 0000170200 | 76FF | FFFC | FA76 | 4E8D | 16E4 | 8D51 | F64E | 5116 |
| 0000170220 | 4E8D | 16D8 | 1E51 | C268 | 6810 | 035B | 36FF | 0EA2 |
| 0000170240 | 36FF | 0EA0 | 36FF | 0EA6 | 36FF | 0EA4 | B99A | 0031 |
| 0000170260 | 8300 | 28C4 | 468B | E9DE | 02E0 | 06E9 | 8B00 | F046 |
| 0000170300 | D7E9 | 9A02 | 9DEC | 308D | DCA3 | 893E | DE16 | 833E |
| 0000170320 | 087E | 7D00 | E903 | 0030 | 037E | 09E9 | 8300 | 067E |
| 0000170340 | 77FF | E903 | 0022 | 9968 | 6830 | 0F3C | 76FF | FF0E |
| 0000170360 | 0C76 | 36FF | 3EE4 | 36FF | 3EE2 | 959A | AFD5 | 8330 |
| 0000170400 | 0CC4 | 4689 | E9F4 | 001F | DC68 | 680E | 0F3C | 76FF |
| 0000170420 | FF0E | 0C76 | 36FF | 3EE4 | 36FF | 3EE2 | 019A | BAD0 |
| 0000170440 | 8330 | 0CC4 | 4689 | 9AF4 | 9DEC | 2F33 | 062B | 3EDC |
| 0000170460 | 161B | 3EDE | DCA3 | 893E | DE16 | 8E3E | B206 | 2631 |
| 0000170500 | 36FF | 0F1E | FF26 | 1C36 | FF0F | E036 | 6A3E | FF00 |
| 0000170520 | 0A76 | 681E | 3EE2 | FF9A | 00FF | 8900 | F046 | 7E83 |
| 0000170540 | 00F4 | 0375 | D8E9 | 8E00 | AE06 | 2631 | 3E83 | 3159 |
| 0000170560 | 7500 | E903 | 004C | 7E83 | FEDC | 0375 | 43E9 | FF00 |
| 0000170600 | F476 | 36FF | 0EC2 | 36FF | 0EC0 | 468D | 16E4 | 8D50 |
| 0000170620 | F646 | 5016 | 468D | 16D8 | 1E50 | C268 | 6810 | 036D |
| 0000170640 | 36FF | 0EA2 | 36FF | 0EA0 | 36FF | 0EA6 | 36FF | 0EA4 |
| 0000170660 | 681E | 109F | 2268 | 6832 | 3225 | 289A | 0032 | 8300 |
| 0000170700 | 28C4 | 068E | 31AE | 8326 | DF3E | 0031 | 0375 | 09E9 |
| 0000170720 | 8300 | DC7E | 74FE | E903 | 000F | 068E | 31B0 | 8326 |
| 0000170740 | 4E3E | 0032 | 0375 | 5029 | C700 | DE46 | FFEF | 76FF |
| 0000170760 | FFE2 | E076 | 468D | 16DE | FF50 | F276 | 76FF | FFFC |
| 0000171000 | FA76 | 4E8D | 16E4 | 8D51 | F64E | 5116 | 4E8D | 16D8 |
| 0000171020 | 1E51 | C268 | 6810 | 036E | 36FF | 0EA2 | 36FF | 0EA0 |
| 0000171040 | 36FF | 0EA6 | 36FF | 0EA4 | 979A | 0032 | 8300 | 28C4 |
| 0000171060 | 468B | E9DE | 0164 | 06E9 | B800 | FFEF | 5BE9 | 8301 |
| 0000171100 | F07E | 7500 | E903 | 00D5 | 068E | 31AE | 8326 | 363E |
| 0000171120 | 0032 | 0375 | 48E9 | 8300 | DC7E | 75FE | E903 | 003F |
| 0000171140 | 76FF | 1EF0 | A768 | 8D10 | E446 | 5016 | 468D | 16F6 |
| 0000171160 | 8D50 | D846 | 5016 | 681E | 10C2 | 7368 | FF03 | A236 |
| 0000171200 | FF0E | A036 | FF0E | A636 | FF0E | A436 | 1E0E | B968 |
| 0000171220 | 6810 | 2C72 | 7568 | 9A2C | 2C7B | 0000 | C483 | 8E28 |
| 0000171240 | AE06 | 2631 | 3E83 | 32B4 | 7500 | E903 | 0009 | 7E83 |
| 0000171260 | FEDC | 0374 | 0FE9 | 8E00 | B006 | 2631 | 3E83 | 32CC |
| 0000171300 | 7500 | E903 | 0051 | 468B | 89F0 | DE46 | 76FF | FFE2 |
| 0000171320 | E076 | 468D | 16DE | FF50 | F276 | 76FF | FFFC | FA76 |
| 0000171340 | 4E8D | 16E4 | 8D51 | F64E | 5116 | 4E8D | 16D8 | 1E51 |
| 0000171360 | C268 | 6810 | 0374 | 36FF | 0EA2 | 36FF | 0EA0 | 36FF |
| 0000171400 | 0EA6 | 36FF | 0EA4 | 149A | 0033 | 8300 | 28C4 | 468B |
| 0000171420 | E9DE | 0086 | 06E9 | 8B00 | F046 | 7DE9 | 8E00 | AE06 |
| 0000171440 | 2631 | 3E83 | 2EB9 | 7500 | E903 | 0009 | 7E83 | FEDC |
| 0000171460 | 0374 | 0FE9 | 8E00 | B006 | 2631 | 3E83 | 2EE5 | 7500 |
| 0000171500 | E903 | 0050 | 46C7 | 00DE | FF00 | E276 | 76FF | 8DE0 |
| 0000171520 | DE46 | 5016 | 76FF | FFF2 | FC76 | 76FF | 8DFA | E44E |

THU MAR 14 17:25:16 1991 CRV_IPS.DLL PAGE 67, LINE 3895

| | | | | | | | | |
|---|---|---|---|---|---|---|---|---|
| 0000171540 | 5116 | 4E8D | 16F6 | 8D51 | D84E | 5116 | 681E | 10C2 |
| 0000171560 | 7668 | FF03 | A236 | FF0E | A036 | FF0E | A636 | FF0E |
| 0000171600 | A436 | 9A0E | 2DEF | 0000 | C483 | 8B28 | DE46 | 09E9 |
| 0000171620 | E900 | 0006 | 00B8 | E900 | 0000 | 5F5E | ED83 | 8B02 |
| 0000171640 | 1FE5 | 4D5D | 1ECB | 9058 | 5545 | EC8B | 8E1E | 81D8 |
| 0000171660 | 28EC | 5700 | C756 | FA46 | 10D9 | 5E8C | C7FC | F246 |
| 0000171700 | 0101 | C02B | 4689 | 89E2 | E046 | D68E | 31AE | 8326 |
| 0000171720 | EB3E | 0033 | 0375 | 1DE9 | FF00 | A636 | FF0E | A436 |
| 0000171740 | 8D0E | D846 | 5016 | CF9A | 002E | 8300 | 08C4 | 003D |
| 0000171760 | 7400 | E903 | 000F | 068E | 31B0 | 8326 | 863E | 0035 |
| 0000172000 | 0375 | 3BE9 | 1E00 | DD68 | 8D10 | E446 | 5016 | 468D |
| 0000172020 | 16D8 | 8D50 | F646 | 5016 | 8468 | 1E03 | 7068 | FF11 |
| 0000172040 | A236 | FF0E | A036 | FF0E | A636 | FF0E | A436 | 9A0E |
| 0000172060 | 2F18 | 0000 | C483 | 891E | F646 | 5689 | E9F8 | 0008 |
| 0000172100 | C02B | 4689 | 89F8 | F646 | EC9A | 699D | A334 | 3EDC |
| 0000172120 | 1689 | 3EDE | D68E | 31AE | 8326 | AE3E | 0034 | 0375 |
| 0000172140 | 48E9 | 8300 | DC7E | 75FE | E903 | 003F | 76FF | 1E0A |
| 0000172160 | E168 | 8D10 | E446 | 5016 | 468D | 16F6 | 8D50 | D846 |
| 0000172200 | 5016 | 681E | 1170 | 8968 | FF03 | A236 | FF0E | A036 |
| 0000172220 | FF0E | A636 | FF0E | A436 | 1E0E | FA68 | 6810 | 34F6 |
| 0000172240 | F968 | 9A34 | 34FC | 0000 | C483 | 8328 | 087E | 7D00 |
| 0000172260 | E903 | 0030 | 037E | 09E9 | 8300 | 067E | 77FF | E903 |
| 0000172300 | 0022 | 7568 | 6834 | 0F3C | 76FF | FF0E | 0C76 | 36FF |
| 0000172320 | 3616 | 36FF | 3614 | 079A | 8BD9 | 8334 | 0CC4 | 4689 |
| 0000172340 | E9F4 | 001F | 7768 | 6830 | 0F3C | 76FF | FF0E | 0C76 |
| 0000172360 | 36FF | 3616 | 36FF | 3614 | BF9A | 96D1 | 8334 | 0CC4 |
| 0000172400 | 4689 | 9AF4 | 9DEC | 363E | 062B | 3EDC | 161B | 3EDE |
| 0000172420 | DCA3 | 893E | DE16 | 8E3E | AE06 | 2631 | 3E83 | 3513 |
| 0000172440 | 7500 | E903 | 004D | 7E83 | FEDC | 0375 | 44E9 | FF00 |
| 0000172460 | DE36 | FF3E | DC36 | 1E3E | 0268 | 8D11 | E446 | 5016 |
| 0000172500 | 468D | 16F6 | 8D50 | D846 | 5016 | 681E | 1170 | 9168 |
| 0000172520 | FF03 | A236 | FF0E | A036 | FF0E | A636 | FF0E | A436 |
| 0000172540 | 1E0E | 0D68 | 6811 | 355A | 5D68 | 9A35 | 3560 | 0000 |
| 0000172560 | C483 | 832A | F47E | 7500 | E903 | 00D8 | 068E | 31AE |
| 0000172600 | 8326 | 6E3E | 0035 | 0375 | 4CE9 | 8300 | DC7E | 75FE |
| 0000172620 | E903 | 0043 | 76FF | FFF4 | BE36 | FF0E | BC36 | 8D0E |
| 0000172640 | E446 | 5016 | 468D | 16F6 | 8D50 | D846 | 5016 | 681E |
| 0000172660 | 1170 | 9468 | FF03 | A236 | FF0E | A036 | FF0E | A636 |
| 0000172700 | FF0E | A436 | 1E0E | 1568 | 6811 | 362E | 3168 | 9A36 |
| 0000172720 | 3634 | 0000 | C483 | 8E28 | AE06 | 2631 | 3E83 | 35EB |
| 0000172740 | 7500 | E903 | 0009 | 7E83 | FEDC | 0374 | 0FE9 | 8E00 |
| 0000172760 | B006 | 2631 | 3E83 | 2FF4 | 7500 | E903 | 0050 | 46C7 |
| 0000173000 | EFDE | FFFF | E276 | 76FF | 8DE0 | DE46 | 5016 | 76FF |
| 0000173020 | FFF2 | FC76 | 76FF | 8DFA | E44E | 5116 | 4E8D | 16F6 |
| 0000173040 | 8D51 | D84E | 5116 | 681E | 1170 | 9568 | FF03 | A236 |
| 0000173060 | FF0E | A036 | FF0E | A636 | FF0E | A436 | 9A0E | 303D |
| 0000173100 | 0000 | C483 | 8B28 | DE46 | 58E9 | E902 | 0006 | EFB8 |
| 0000173120 | E9FF | 024F | 068E | 31AE | 8326 | 833E | 0036 | 0375 |
| 0000173140 | 48E9 | 8300 | DC7E | 75FE | E903 | 003F | 76FF | 1E0A |
| 0000173160 | 1D68 | 8D11 | E446 | 5016 | 468D | 16F6 | 8D50 | D846 |
| 0000173200 | 5016 | 681E | 1170 | 9868 | FF03 | A236 | FF0E | A036 |
| 0000173220 | FF0E | A636 | FF0E | A436 | 1E0E | 3668 | 6811 | 36CB |
| 0000173240 | CE68 | 9A36 | 36D1 | 0000 | C483 | 9A28 | 9DEC | 366B |
| 0000173260 | DCA3 | 893E | DE16 | 8E3E | B206 | 2631 | 36FF | 0F22 |
| 0000173300 | FF26 | 2036 | FF0F | 0E36 | FF36 | 0A76 | 681E | 3614 |
| 0000173320 | F89A | 0010 | 8900 | F046 | EC9A | 569D | 2B30 | DC06 |
| 0000173340 | 1B3E | DE16 | A33E | 3EDC | 1689 | 3EDE | 068E | 31AE |
| 0000173360 | 8326 | E83E | 0036 | 0375 | 4DE9 | 8300 | DC7E | 75FE |
| 0000173400 | E903 | 0044 | 36FF | 3EDE | 36FF | 3EDC | 681E | 113E |

THU MAR 14 17:25:16 1991 CRV_IPS.DLL PAGE 68, LINE 3954

| | | | | | | | | |
|---|---|---|---|---|---|---|---|---|
| 0000173420 | 468D | 16E4 | 8D50 | F646 | 5016 | 468D | 16D8 | 1E50 |
| 0000173440 | 7068 | 6811 | 039D | 36FF | 0EA2 | 36FF | 0EA0 | 36FF |
| 0000173460 | 0EA6 | 36FF | 0EA4 | 681E | 1149 | C868 | 682F | 2FCB |
| 0000173500 | CE9A | 002F | 8300 | 2AC4 | 7E83 | 00F0 | 0375 | D5E9 |
| 0000173520 | 8E00 | AE06 | 2631 | 3E83 | 2F85 | 7500 | E903 | 0048 |
| 0000173540 | 7E83 | FEDC | 0375 | 3FE9 | FF00 | F076 | 681E | 1151 |
| 0000173560 | 468D | 16E4 | 8D50 | F646 | 5016 | 468D | 16D8 | 1E50 |
| 0000173600 | 7068 | 6811 | 03A0 | 36FF | 0EA2 | 36FF | 0EA0 | 36FF |
| 0000173620 | 0EA6 | 36FF | 0EA4 | 681E | 1167 | 2E68 | 6834 | 3431 |
| 0000173640 | 349A | 0034 | 8300 | 28C4 | 068E | 31AE | 8326 | BD3E |
| 0000173660 | 0037 | 0375 | 09E9 | 8300 | DC7E | 74FE | E903 | 000F |
| 0000173700 | 068E | 31B0 | 8326 | D53E | 0037 | 0375 | 51E9 | 8B00 |
| 0000173720 | F046 | 4689 | FFDE | E276 | 76FF | 8DE0 | DE46 | 5016 |
| 0000173740 | 76FF | FFF2 | FC76 | 76FF | 8DFA | E44E | 5116 | 4E8D |
| 0000173760 | 16F6 | 8D51 | D84E | 5116 | 681E | 1170 | A168 | FF03 |
| 0000174000 | A236 | FF0E | A036 | FF0E | A636 | FF0E | A436 | 9A0E |
| 0000174020 | 381D | 0000 | C483 | 8B28 | DE46 | 86E9 | E900 | 0006 |
| 0000174040 | 468B | E9F0 | 007D | 068E | 31AE | 8326 | 613E | 0033 |
| 0000174060 | 0375 | 09E9 | 8300 | DC7E | 74FE | E903 | 000F | 068E |
| 0000174100 | 31B0 | 8326 | 8D3E | 0033 | 0375 | 50E9 | C700 | DE46 |
| 0000174120 | 0000 | 76FF | FFE2 | E076 | 468D | 16DE | FF50 | F276 |
| 0000174140 | 76FF | FFFC | FA76 | 4E8D | 16E4 | 8D51 | F64E | 5116 |
| 0000174160 | 4E8D | 16D8 | 1E51 | 7068 | 6811 | 03A3 | 36FF | 0EA2 |
| 0000174200 | 36FF | 0EA0 | 36FF | 0EA6 | 36FF | 0EA4 | CE9A | 0035 |
| 0000174220 | 8300 | 28C4 | 468B | E9DE | 0009 | 06E9 | B800 | 0000 |
| 0000174240 | 00E9 | 5E00 | 835F | 02ED | E58B | 5D1F | CB4D | 581E |
| 0000174260 | 4590 | 8B55 | 1EEC | D88E | EC81 | 002C | 5657 | 46C7 |
| 0000174300 | 7FF6 | 8C11 | F85E | 46C7 | 01EE | 2B01 | 89C0 | DE46 |
| 0000174320 | 4689 | 8EDC | AE06 | 2631 | 3E83 | 3931 | 7500 | E903 |
| 0000174340 | 001D | 36FF | 0EA6 | 36FF | 0EA4 | 468D | 16D4 | 9A50 |
| 0000174360 | 3377 | 0000 | C483 | 3D08 | 0000 | 0374 | 0FE9 | 8E00 |
| 0000174400 | B006 | 2631 | 3E83 | 3A03 | 7500 | E903 | 003B | 681E |
| 0000174420 | 1183 | 468D | 16E0 | 8D50 | D446 | 5016 | 468D | 16F2 |
| 0000174440 | 6850 | 03B0 | 681E | 11CA | 36FF | 0EA2 | 36FF | 0EA0 |
| 0000174460 | 36FF | 0EA6 | 36FF | 0EA4 | C09A | 0033 | 8300 | 1EC4 |
| 0000174500 | 4689 | 89F2 | F456 | 08E9 | 2B00 | 89C0 | F446 | 4689 |
| 0000174520 | C7F2 | FA46 | 3EE6 | 5E8C | FFFC | 0876 | 76FF | 6806 |
| 0000174540 | 0810 | 76FF | FFFC | FA76 | 959A | DBCF | 8333 | 0AC4 |
| 0000174560 | 4689 | 83F0 | F07E | 7500 | E903 | 0155 | 068E | 31B2 |
| 0000174600 | FF26 | 2236 | 260F | 36FF | 0F20 | 36FF | 360E | 681E |
| 0000174620 | 3614 | 879A | 0011 | 8900 | EC46 | 068E | 31AE | 8326 |
| 0000174640 | 8C3E | 0039 | 0375 | 4CE9 | 8300 | D87E | 75FE | E903 |
| 0000174660 | 0043 | 76FF | FFF0 | BE36 | FF0E | BC36 | 8D0E | E046 |
| 0000174700 | 5016 | 468D | 16F2 | 8D50 | D446 | 5016 | 681E | 11CA |
| 0000174720 | BD68 | FF03 | A236 | FF0E | A036 | FF0E | A636 | FF0E |
| 0000174740 | A436 | 1E0E | 8768 | 6811 | 39D7 | DA68 | 9A39 | 3731 |
| 0000174760 | 0000 | C483 | 8E28 | AE06 | 2631 | 3E83 | 39EB | 7500 |
| 0000175000 | E903 | 0050 | 7E83 | FED8 | 0375 | 47E9 | FF00 | EC76 |
| 0000175020 | 681E | 118F | 7E83 | 01EC | C01B | 5040 | 468D | 16E0 |
| 0000175040 | 8D50 | F246 | 5016 | 468D | 16D4 | 1E50 | CA68 | 6811 |
| 0000175060 | 03BE | 36FF | 0EA2 | 36FF | 0EA0 | 36FF | 0EA6 | 36FF |
| 0000175100 | 0EA4 | 681E | 11A5 | 2B68 | 6837 | 372E | FF9A | 00FF |
| 0000175120 | 8300 | 2AC4 | 068E | 31AE | 8326 | 3F3E | 0037 | 0375 |
| 0000175140 | 09E9 | 8300 | D87E | 74FE | E903 | 000F | 068E | 31B0 |
| 0000175160 | 8326 | 573E | 0037 | 0375 | 50E9 | C700 | DA46 | FFEF |
| 0000175200 | 76FF | FFDE | DC76 | 468D | 16DA | FF50 | EE76 | 76FF |
| 0000175220 | FFF8 | F676 | 4E8D | 16E0 | 8D51 | F24E | 5116 | 4E8D |
| 0000175240 | 16D4 | 1E51 | CA68 | 6811 | 03BF | 36FF | 0EA2 | 36FF |
| 0000175260 | 0EA0 | 36FF | 0EA6 | 36FF | 0EA4 | A09A | 0037 | 8300 |

THU MAR 14 17:25:16 1991 CRV_IPS.DLL PAGE 69, LINE 4013

| | | | | | | | | |
|---|---|---|---|---|---|---|---|---|
| 0000175300 | 28C4 | 468B | E9DA | 019F | 06E9 | B800 | FFEF | 96E9 |
| 0000175320 | 8E01 | B206 | 2631 | 36FF | 0F22 | FF26 | 2036 | FF0F |
| 0000175340 | 0E36 | FF36 | FC76 | 76FF | 9AFA | FFFF | 0000 | 4689 |
| 0000175360 | 83EC | EC7E | 7500 | E903 | 00F0 | 068E | 31B2 | FF26 |
| 0000175400 | 2236 | 260F | 36FF | 0F20 | 36FF | 360E | 681E | 3614 |
| 0000175420 | 239A | 0039 | 8E00 | AE06 | 2631 | 3E83 | 3803 | 7500 |
| 0000175440 | E903 | 0048 | 7E83 | FED8 | 0375 | 3FE9 | FF00 | EC76 |
| 0000175460 | 681E | 11AD | 468D | 16E0 | 8D50 | F246 | 5016 | 468D |
| 0000175500 | 16D4 | 1E50 | CA68 | 6811 | 03C8 | 36FF | 0EA2 | 36FF |
| 0000175520 | 0EA0 | 36FF | 0EA6 | 36FF | 0EA4 | 681E | 11C1 | 7868 |
| 0000175540 | 6839 | 397B | 7E9A | 0039 | 8300 | 28C4 | 068E | 31AE |
| 0000175560 | 8326 | 813E | 003B | 0375 | 09E9 | 8300 | D87E | 74FE |
| 0000175600 | E903 | 000F | 068E | 31B0 | 8326 | 993E | 003B | 0375 |
| 0000175620 | 51E9 | 8B00 | EC46 | 4689 | FFDA | DE76 | 76FF | 8DDC |
| 0000175640 | DA46 | 5016 | 76FF | FFEE | F876 | 76FF | 8DF6 | E04E |
| 0000175660 | 5116 | 4E8D | 16F2 | 8D51 | D44E | 5116 | 681E | 11CA |
| 0000175700 | C968 | FF03 | A236 | FF0E | A036 | FF0E | A636 | FF0E |
| 0000175720 | A436 | 9A0E | 3BE1 | 0000 | C483 | 8B28 | DA46 | 86E9 |
| 0000175740 | E900 | 0006 | 468B | E9EC | 007D | 068E | 31AE | 8326 |
| 0000175760 | 6A3E | 0038 | 0375 | 09E9 | 8300 | D87E | 74FE | E903 |
| 0000176000 | 000F | 068E | 31B0 | 8326 | 963E | 0038 | 0375 | 50E9 |
| 0000176020 | C700 | DA46 | 0000 | 76FF | FFDE | DC76 | 468D | 16DA |
| 0000176040 | FF50 | EE76 | 76FF | FFF8 | F676 | 4E8D | 16E0 | 8D51 |
| 0000176060 | F24E | 5116 | 4E8D | 16D4 | 1E51 | CA68 | 6811 | 03CB |
| 0000176100 | 36FF | 0EA2 | 36FF | 0EA0 | 36FF | 0EA6 | 36FF | 0EA4 |
| 0000176120 | 4B9A | 003A | 8300 | 28C4 | 468B | E9DA | 0009 | 06E9 |
| 0000176140 | B800 | 0000 | 00E9 | 5E00 | 835F | 02ED | E58B | 5D1F |
| 0000176160 | CB4D | 581E | 4590 | 8B55 | 1EEC | D88E | EC81 | 004E |
| 0000176200 | 5657 | 46C7 | D9F8 | 8C11 | FA5E | 46C7 | 01DE | 2B01 |
| 0000176220 | 89C0 | C446 | 4689 | 8EC2 | AE06 | 2631 | 3E83 | 3D58 |
| 0000176240 | 7500 | E903 | 001D | 36FF | 0EA6 | 36FF | 0EA4 | 468D |
| 0000176260 | 16B8 | 9A50 | 3880 | 0000 | C483 | 3D08 | 0000 | 0374 |
| 0000176300 | 0FE9 | 8E00 | B006 | 2631 | 3E83 | 3D70 | 7500 | E903 |
| 0000176320 | 003B | 681E | 11DD | 468D | 16D0 | 8D50 | B846 | 5016 |
| 0000176340 | 468D | 16F0 | 6850 | 03E6 | 681E | 13F8 | 36FF | 0EA2 |
| 0000176360 | 36FF | 0EA0 | 36FF | 0EA6 | 36FF | 0EA4 | C99A | 0038 |
| 0000176400 | 8300 | 1EC4 | 4689 | 89F0 | F256 | 08E9 | 2B00 | 89C0 |
| 0000176420 | F246 | 4689 | C7F0 | C046 | 0000 | 46C7 | 00EE | 8E00 |
| 0000176440 | B206 | 2631 | 1CA1 | 260F | 168B | 0F1E | 4689 | 89E2 |
| 0000176460 | E456 | A126 | 0F20 | 8B26 | 2216 | 890F | B246 | 5689 |
| 0000176500 | C4B4 | 065E | 8B26 | 4847 | 8B26 | 4A57 | A8A3 | 890E |
| 0000176520 | AA16 | C40E | 065E | 8B26 | 5047 | E0A3 | C43E | 065E |
| 0000176540 | 8B26 | 4C47 | 8B26 | 4E57 | E2A3 | 893E | E416 | C43E |
| 0000176560 | A81E | 260E | 478B | 8E5E | B406 | 2631 | 0639 | 0F44 |
| 0000176600 | 0374 | 26E9 | 2600 | 46A1 | C40F | A81E | 260E | 4739 |
| 0000176620 | 7460 | E903 | 0015 | 068E | 31B2 | A126 | 0F2C | 1EC4 |
| 0000176640 | 0EA8 | 3926 | 6247 | 0375 | 93E9 | FF00 | E476 | 76FF |
| 0000176660 | FFE2 | E036 | 153E | E268 | 9A3E | 3E64 | 0000 | 4689 |
| 0000176700 | 8EDC | AE06 | 2631 | 3E83 | 3E6F | 7500 | E903 | 0009 |
| 0000176720 | 7E83 | FEBC | 0374 | 0FE9 | 8E00 | B006 | 2631 | 3E83 |
| 0000176740 | 3EDE | 7500 | E903 | 0050 | 46C7 | E6BE | FFFF | C476 |
| 0000176760 | 76FF | 8DC2 | BE46 | 5016 | 76FF | FFDE | FA76 | 76FF |
| 0000177000 | 8DF8 | D04E | 5116 | 4E8D | 16F0 | 8D51 | B84E | 5116 |
| 0000177020 | 681E | 13F8 | FF68 | FF03 | A236 | FF0E | A036 | FF0E |
| 0000177040 | A636 | FF0E | A436 | 9A0E | 3F27 | 0000 | C483 | 8B28 |
| 0000177060 | BE46 | 11E9 | E918 | 0006 | E6B8 | E9FF | 1808 | 068E |
| 0000177100 | 31B2 | A126 | 0F2C | 2B48 | 26D2 | 36F7 | 0F2E | 8940 |
| 0000177120 | FC46 | 1EC4 | 0EA8 | 8B26 | 6247 | C448 | A81E | 2B0E |
| 0000177140 | 26D2 | 77F7 | 4064 | 006A | C450 | A81E | 260E | 77FF |

THU MAR 14 17:25:16 1991 CRV_IPS.DLL PAGE 70, LINE 4072

| | | | | | | | | |
|---|---|---|---|---|---|---|---|---|
| 0000177160 | 266E | 77FF | 9A6C | A0F6 | 3E13 | 4689 | 89E6 | E856 |
| 0000177200 | EC9A | 3B9D | A33E | 3EDC | 1689 | 3EDE | 76FF | FFE4 |
| 0000177220 | E276 | 36FF | 3EE0 | 006A | 36FF | 3EE4 | 36FF | 3EE2 |
| 0000177240 | 5A9A | 002F | 8900 | DC46 | EC9A | 4E9D | 2B3F | DC06 |
| 0000177260 | 1B3E | DE16 | A33E | 3EDC | 1689 | 3EDE | 7E83 | 00DC |
| 0000177300 | 0375 | E8E9 | FF00 | E476 | 76FF | FFE2 | E036 | 1E3E |
| 0000177320 | E268 | 9A3E | 3AA1 | 0000 | 068E | 31AE | 8326 | C63E |
| 0000177340 | 003E | 0375 | 48E9 | 8300 | BC7E | 75FE | E903 | 003F |
| 0000177360 | 76FF | 1EDC | E168 | 8D11 | D046 | 5016 | 468D | 16F0 |
| 0000177400 | 8D50 | B846 | 5016 | 681E | 13F8 | 0D68 | FF04 | A236 |
| 0000177420 | FF0E | A036 | FF0E | A636 | FF0E | A436 | 1E0E | F868 |
| 0000177440 | 6811 | 3FAD | B068 | 9A3F | 3FB3 | 0000 | C483 | 8E28 |
| 0000177460 | AE06 | 2631 | 3E83 | 3F66 | 7500 | E903 | 0009 | 7E83 |
| 0000177500 | FEBC | 0374 | 0FE9 | 8E00 | B006 | 2631 | 3E83 | 3B1B |
| 0000177520 | 7500 | E903 | 0051 | 468B | 89DC | BE46 | 76FF | FFC4 |
| 0000177540 | C276 | 468D | 16BE | FF50 | DE76 | 76FF | FFFA | F876 |
| 0000177560 | 4E8D | 16D0 | 8D51 | F04E | 5116 | 4E8D | 16B8 | 1E51 |
| 0000177600 | F868 | 6813 | 040E | 36FF | 0EA2 | 36FF | 0EA0 | 36FF |
| 0000177620 | 0EA6 | 36FF | 0EA4 | 649A | 003B | 8300 | 28C4 | 468B |
| 0000177640 | E9BE | 16A2 | 06E9 | 8B00 | DC46 | 99E9 | 6A16 | 6A00 |
| 0000177660 | 6A00 | 6A00 | 6A00 | 6A00 | 6A00 | 9A03 | DFDD | 38FB |
| 0000177700 | C483 | 890E | E046 | 7E83 | 00E0 | 0375 | D8E9 | 8E00 |
| 0000177720 | AE06 | 2631 | 3E83 | 3FC1 | 7500 | E903 | 004C | 7E83 |
| 0000177740 | FEBC | 0375 | 43E9 | FF00 | E076 | 36FF | 0EBA | 36FF |
| 0000177760 | 0EB8 | 468D | 16D0 | 8D50 | F046 | 5016 | 468D | 16B8 |
| 0000200000 | 1E50 | F868 | 6813 | 0414 | 36FF | 0EA2 | 36FF | 0EA0 |
| 0000200020 | 36FF | 0EA6 | 36FF | 0EA4 | 681E | 1200 | EF68 | 683A |
| 0000200040 | 3AF2 | F59A | 003A | 8300 | 28C4 | 068E | 31AE | 8326 |
| 0000200060 | AC3E | 003A | 0375 | 09E9 | 8300 | BC7E | 74FE | E903 |
| 0000200100 | 000F | 068E | 31B0 | 8326 | 5A3E | 0041 | 0375 | 50E9 |
| 0000200120 | C700 | BE46 | FFEF | 76FF | FFC4 | C276 | 468D | 16BE |
| 0000200140 | FF50 | DE76 | 76FF | FFFA | F876 | 4E8D | 16D0 | 8D51 |
| 0000200160 | F04E | 5116 | 4E8D | 16B8 | 1E51 | F868 | 6813 | 0415 |
| 0000200200 | 36FF | 0EA2 | 36FF | 0EA0 | 36FF | 0EA6 | 36FF | 0EA4 |
| 0000200220 | A29A | 0041 | 8300 | 28C4 | 468B | E9BE | 15A8 | 06E9 |
| 0000200240 | B800 | FFEF | 9FE9 | 9A15 | 9DEC | 406F | DCA3 | 893E |
| 0000200260 | DE16 | 833E | E87E | 7D00 | E903 | 002E | 037E | 09E9 |
| 0000200300 | 8300 | E67E | 77FF | E903 | 0020 | 7B68 | 6840 | 0F3C |
| 0000200320 | 006A | 006A | 36FF | 3EE4 | 36FF | 3EE2 | 959A | 8FD5 |
| 0000200340 | 8340 | 0CC4 | 4689 | E9E0 | 001D | 5368 | 6834 | 0F3C |
| 0000200360 | 006A | 006A | 36FF | 3EE4 | 36FF | 3EE2 | 019A | 9AD0 |
| 0000200400 | 8340 | 0CC4 | 4689 | 9AE0 | 9DEC | 42E0 | 062B | 3EDC |
| 0000200420 | 161B | 3EDE | DCA3 | 893E | DE16 | FF3E | E476 | 76FF |
| 0000200440 | FFE2 | E036 | 6A3E | 6A00 | 1E00 | E268 | 9A3E | 30E7 |
| 0000200460 | 0000 | 4689 | 83DC | E07E | 7500 | E903 | 00EA | 76FF |
| 0000200500 | FFE4 | E276 | 36FF | 3EE0 | 681E | 3EE2 | D09A | 0041 |
| 0000200520 | 8900 | DC46 | 068E | 31AE | 8326 | 423E | 0041 | 0375 |
| 0000200540 | 48E9 | 8300 | BC7E | 75FE | E903 | 003F | 76FF | 1EE0 |
| 0000200560 | 0868 | 8D12 | D046 | 5016 | 468D | 16F0 | 8D50 | B846 |
| 0000200600 | 5016 | 681E | 13F8 | 2768 | FF04 | A236 | FF0E | A036 |
| 0000200620 | FF0E | A636 | FF0E | A436 | 1E0E | 1D68 | 6812 | 421E |
| 0000200640 | 2168 | 9A42 | 4224 | 0000 | C483 | 8E28 | AE06 | 2631 |
| 0000200660 | 3E83 | 41DB | 7500 | E903 | 0009 | 7E83 | FEBC | 0374 |
| 0000200700 | 0FE9 | 8E00 | B006 | 2631 | 3E83 | 424A | 7500 | E903 |
| 0000200720 | 0050 | 46C7 | EFBE | FFFF | C476 | 76FF | 8DC2 | BE46 |
| 0000200740 | 5016 | 76FF | FFDE | FA76 | 76FF | 8DF8 | D04E | 5116 |
| 0000200760 | 4E8D | 16F0 | 8D51 | B84E | 5116 | 681E | 13F8 | 2868 |
| 0000201000 | FF04 | A236 | FF0E | A036 | FF0E | A636 | FF0E | A436 |
| 0000201020 | 9A0E | 4293 | 0000 | C483 | 8B28 | BE46 | 27E9 | E914 |

THU MAR 14 17:25:16 1991 CRV_IPS.DLL PAGE 71, LINE 4131

| | | | | | | | | |
|---|---|---|---|---|---|---|---|---|
| 0000201040 | 0006 | EFB8 | E9FF | 141E | 7E83 | 00DC | 0375 | E8E9 |
| 0000201060 | FF00 | E476 | 76FF | FFE2 | E036 | 1E3E | E268 | 9A3E |
| 0000201100 | 4300 | 0000 | 068E | 31AE | 8326 | 32?E | 0042 | 0375 |
| 0000201120 | 48E9 | 8300 | BC7E | 75FE | E903 | 003F | 76FF | 1EDC |
| 0000201140 | 2568 | 8D12 | D046 | 5016 | 468D | 16F0 | 8D50 | B846 |
| 0000201160 | 5016 | 681E | 13F8 | 2D68 | FF04 | A236 | FF0E | A036 |
| 0000201200 | FF0E | A636 | FF0E | A436 | 1E0E | 3B68 | 6812 | 4355 |
| 0000201220 | 5868 | 9A43 | 435B | 0000 | C483 | 8E28 | AE06 | 2631 |
| 0000201240 | 3E83 | 430E | 7500 | E903 | 0009 | 7E83 | FEBC | 0374 |
| 0000201260 | 0FE9 | 8E00 | B006 | 2631 | 3E83 | 3C5A | 7500 | E903 |
| 0000201300 | 0051 | 468B | 89DC | BE46 | 76FF | FFC4 | C276 | 468D |
| 0000201320 | 16BE | FF50 | DE76 | 76FF | FFFA | F876 | 4E8D | 16D0 |
| 0000201340 | 8D51 | F04E | 5116 | 4E8D | 16B8 | 1E51 | F868 | 6813 |
| 0000201360 | 042E | 36FF | 0EA2 | 36FF | 0EA0 | 36FF | 0EA6 | 36FF |
| 0000201400 | 0EA4 | B89A | 003D | 8300 | 28C4 | 468B | E9BE | 1336 |
| 0000201420 | 06E9 | 8B00 | DC46 | 2DE9 | 8E13 | B206 | 2631 | 14A1 |
| 0000201440 | 260F | 168B | 0F16 | 4603 | 130A | 0C56 | 10A3 | 8936 |
| 0000201460 | 1216 | 6836 | 2981 | 9C68 | 9A30 | 2082 | 0000 | 046A |
| 0000201500 | 468D | 16F4 | 6A50 | 1E04 | 1068 | 6A36 | 9A18 | DFDD |
| 0000201520 | 3E08 | C483 | 890E | E046 | 7E83 | 00E0 | 0375 | EEE9 |
| 0000201540 | FF00 | E476 | 76FF | FFE2 | E036 | 1E3E | E268 | 9A3E |
| 0000201560 | 3D4A | 0000 | 4689 | 8EDC | AE06 | 2631 | 3E83 | 4369 |
| 0000201600 | 7500 | E903 | 004C | 7E83 | FEBC | 0375 | 43E9 | FF00 |
| 0000201620 | E076 | 36FF | 0EBA | 36FF | 0EB8 | 468D | 16D0 | 8D50 |
| 0000201640 | F046 | 5016 | 468D | 16B8 | 1E50 | F868 | 6813 | 0438 |
| 0000201660 | 36FF | 0EA2 | 36FF | 0EA0 | 36FF | 0EA6 | 36FF | 0EA4 |
| 0000201700 | 681E | 1243 | B268 | 683E | 3EB5 | B89A | 003E | 8300 |
| 0000201720 | 28C4 | 068E | 31AE | 8326 | 2E3E | 003C | 0375 | 09E9 |
| 0000201740 | 8300 | BC7E | 74FE | E903 | 000F | 068E | 31B0 | 8326 |
| 0000201760 | D93E | 003F | 0375 | 50E9 | C700 | BE46 | FFEF | 76FF |
| 0000202000 | FFC4 | C276 | 468D | 16BE | FF50 | DE76 | 76FF | FFFA |
| 0000202020 | F876 | 4E8D | 16D0 | 8D51 | F04E | 5116 | 4E8D | 16B8 |
| 0000202040 | 1E51 | F868 | 6813 | 0439 | 36FF | 0EA2 | 36FF | 0EA0 |
| 0000202060 | 36FF | 0EA6 | 36FF | 0EA4 | 219A | 0040 | 8300 | 28C4 |
| 0000202100 | 468B | E9BE | 1200 | 06E9 | B800 | FFEF | F7E9 | A111 |
| 0000202120 | 3610 | 168B | 3612 | E0D1 | D2D1 | 4689 | 89EA | EC56 |
| 0000202140 | 4968 | 6845 | 309C | 76FF | FFEC | EA76 | 559A | 0022 |
| 0000202160 | 8900 | E046 | 7E83 | 00E0 | 0375 | 3BE9 | FF01 | E476 |
| 0000202200 | 76FF | FFE2 | E036 | 1E3E | E268 | 9A3E | 443B | 0000 |
| 0000202220 | 4689 | 83DC | EE7E | 7500 | E903 | 0016 | 76FF | FFB4 |
| 0000202240 | B276 | 36FF | 360E | 681E | 3614 | 7D9A | 0045 | 8900 |
| 0000202260 | DC46 | 7E83 | 79E0 | 0374 | 80E9 | 8E00 | AE06 | 2631 |
| 0000202300 | 3E83 | 44D2 | 7500 | E903 | 0009 | 7E83 | FEBC | 0374 |
| 0000202320 | 0FE9 | 8E00 | B006 | 2631 | 3E83 | 44EA | 7500 | E903 |
| 0000202340 | 0050 | 46C7 | EFBE | FFFF | C476 | 76FF | 8DC2 | BE46 |
| 0000202360 | 5016 | 76FF | FFDE | FA76 | 76FF | 8DF8 | D04E | 5116 |
| 0000202400 | 4E8D | 16F0 | 8D51 | B84E | 5116 | 681E | 13F8 | 4868 |
| 0000202420 | FF04 | A236 | FF0E | A036 | FF0E | A636 | FF0E | A436 |
| 0000202440 | 9A0E | 4532 | 0000 | C483 | 8B28 | BE46 | 17E9 | E911 |
| 0000202460 | 0006 | EFB8 | E9FF | 110E | 7DE9 | 8E00 | AE06 | 2631 |
| 0000202500 | 3E83 | 45AA | 7500 | E903 | 0009 | 7E83 | FEBC | 0374 |
| 0000202520 | 0FE9 | 8E00 | B006 | 2631 | 3E83 | 4616 | 7500 | E903 |
| 0000202540 | 0050 | 46C7 | FFBE | FFFF | C476 | 76FF | 8DC2 | BE46 |
| 0000202560 | 5016 | 76FF | FFDE | FA76 | 76FF | 8DF8 | D04E | 5116 |
| 0000202600 | 4E8D | 16F0 | 8D51 | B84E | 5116 | 681E | 13F8 | 4A68 |
| 0000202620 | FF04 | A236 | FF0E | A036 | FF0E | A636 | FF0E | A436 |
| 0000202640 | 9A0E | 465E | 0000 | C483 | 8B28 | BE46 | 97E9 | E910 |
| 0000202660 | 0006 | FFB8 | E9FF | 108E | C468 | 6842 | 309C | CA9A |
| 0000202700 | 0042 | 6A00 | 8D0A | C646 | 5016 | E89A | 3AE1 | 8340 |

THU MAR 14 17:25:16 1991 CRV_IPS.DLL PAGE 72, LINE 4190

| | | | | | | | | |
|---|---|---|---|---|---|---|---|---|
| 0000202720 | 06C4 | 4689 | 83E0 | E07E | 7401 | E903 | 0109 | 76FF |
| 0000202740 | FFE4 | E276 | 36FF | 3EE0 | 681E | 3EE2 | 9C9A | 0045 |
| 0000202760 | 8900 | DC46 | 7E83 | 00EE | 0375 | 16E9 | FF00 | B476 |
| 0000203000 | 76FF | FFB2 | 0E36 | 1E36 | 1468 | 9A36 | 40DD | 0000 |
| 0000203020 | 4689 | 8EDC | AE06 | 2631 | 3E83 | 45FE | 7500 | E903 |
| 0000203040 | 0045 | 7E83 | FEBC | 0375 | 3CE9 | 1E00 | 4B68 | 8D12 |
| 0000203060 | D046 | 5016 | 468D | 16F0 | 8D50 | B846 | 5016 | 681E |
| 0000203100 | 13F8 | 5768 | FF04 | A236 | FF0E | A036 | FF0E | A636 |
| 0000203120 | FF0E | A436 | 1E0E | 5B68 | 6812 | 46C7 | CA68 | 9A46 |
| 0000203140 | 46CD | 0000 | C483 | 8E26 | AE06 | 2631 | 3E83 | 4687 |
| 0000203160 | 7500 | E903 | 0009 | 7E83 | FEBC | 0374 | 0FE9 | 8E00 |
| 0000203200 | B006 | 2631 | 3E83 | 4381 | 7500 | E903 | 0050 | 46C7 |
| 0000203220 | 00BE | FF00 | C476 | 76FF | 8DC2 | BE46 | 5016 | 76FF |
| 0000203240 | FFDE | FA76 | 76FF | 8DF8 | D04E | 5116 | 4E8D | 16F0 |
| 0000203260 | 8D51 | B84E | 5116 | 681E | 13F8 | 5868 | FF04 | A236 |
| 0000203300 | FF0E | A036 | FF0E | A636 | FF0E | A436 | 9A0E | 43C9 |
| 0000203320 | 0000 | C483 | 8B28 | BE46 | 6BE9 | E90F | 0006 | 00B8 |
| 0000203340 | E900 | 0F62 | CAE9 | 8305 | E07E | 7403 | E903 | 05C1 |
| 0000203360 | 068E | 31AE | 8326 | F33E | 0046 | 0375 | 45E9 | 8300 |
| 0000203400 | BC7E | 75FE | E903 | 003C | 681E | 1263 | 468D | 16D0 |
| 0000203420 | 8D50 | F046 | 5016 | 468D | 16B8 | 1E50 | F868 | 6813 |
| 0000203440 | 045D | 36FF | 0EA2 | 36FF | 0EA0 | 36FF | 0EA6 | 36FF |
| 0000203460 | 0EA4 | 681E | 1272 | 3368 | 6847 | 4736 | 399A | 0047 |
| 0000203500 | 8300 | 26C4 | 7E83 | 33C6 | 0374 | 03E9 | E900 | 0060 |
| 0000203520 | 7E83 | 34C6 | 0374 | 03E9 | E900 | 0054 | 068E | 31AE |
| 0000203540 | 8326 | 503E | 0047 | 0375 | 45E9 | 8300 | BC7E | 75FE |
| 0000203560 | E903 | 003C | 681E | 127A | 468D | 16D0 | 8D50 | F046 |
| 0000203600 | 5016 | 468D | 16B8 | 1E50 | F868 | 6813 | 0468 | 36FF |
| 0000203620 | 0EA2 | 36FF | 0EA0 | 36FF | DEA6 | 36FF | 0EA4 | 681E |
| 0000203640 | 129C | 2E68 | 6841 | 4131 | 349A | 0041 | 8300 | 26C4 |
| 0000203660 | 7E83 | 35C8 | 0374 | 7CE9 | 8E03 | AE06 | 2631 | 3E83 |
| 0000203700 | 40EB | 7500 | E903 | 0045 | 7E83 | FEBC | 0375 | 3CE9 |
| 0000203720 | 1E00 | A468 | 8D12 | D046 | 5016 | 468D | 16F0 | 8D50 |
| 0000203740 | B846 | 5016 | 681E | 13F8 | 6B68 | FF04 | A236 | FF0E |
| 0000203760 | A036 | FF0E | A636 | FF0E | A436 | 1E0E | B268 | 6812 |
| 0000204000 | 482E | 3168 | 9A48 | 4834 | 0000 | C483 | 8326 | FC7E |
| 0000204020 | 7401 | E903 | 0210 | 7E83 | 00EE | 0374 | 0FE9 | 8B01 |
| 0000204040 | 0646 | 568B | 0508 | 0024 | 5052 | ACA1 | 8B0E | AE16 |
| 0000204060 | 050E | 0004 | 5052 | D29A | 5D91 | 8345 | 08C4 | 016A |
| 0000204100 | F89A | D029 | 8348 | 02C4 | 4689 | 83E0 | E07E | 7500 |
| 0000204120 | E903 | 00D5 | 068E | 31AE | 8326 | 423E | 0048 | 0375 |
| 0000204140 | 48E9 | 830D | BC7E | 75FE | E903 | 003F | 76FF | 1EE0 |
| 0000204160 | BA68 | 8D12 | D046 | 5016 | 468D | 16F0 | 8D50 | B846 |
| 0000204200 | 5016 | 681E | 13F8 | 7568 | FF04 | A236 | FF0E | A036 |
| 0000204220 | FF0E | A636 | FF0E | A436 | 1E0E | CB68 | 6812 | 492B |
| 0000204240 | 2E68 | 9A49 | 4931 | 0000 | C483 | 8E28 | AE06 | 2631 |
| 0000204260 | 3E83 | 48E8 | 7500 | E903 | 0009 | 7E83 | FEBC | 0374 |
| 0000204300 | 0FE9 | 8E00 | B006 | 2631 | 3E83 | 4957 | 7500 | E903 |
| 0000204320 | 0051 | 468B | 89E0 | BE46 | 76FF | FFC4 | C276 | 468D |
| 0000204340 | 16BE | FF50 | DE76 | 76FF | FFFA | F876 | 4E8D | 16D0 |
| 0000204360 | 8D51 | F04E | 5116 | 4E8D | 16B8 | 1E51 | F868 | 6813 |
| 0000204400 | 0476 | 36FF | 0EA2 | 36FF | 0EA0 | 36FF | 0EA6 | 36FF |
| 0000204420 | 0EA4 | A09A | 0049 | 8300 | 28C4 | 468B | E9BE | 0D26 |
| 0000204440 | 06E9 | 8B00 | E046 | 1DE9 | C70D | EE46 | 0001 | 76FF |
| 0000204460 | FFCE | CC76 | 76FF | FFCA | E876 | 76FF | 9AE6 | 3335 |
| 0000204500 | 29A2 | C483 | 890A | E046 | 7E83 | 00E0 | 0375 | D5E9 |
| 0000204520 | 8E00 | AE06 | 2631 | 3E83 | 493F | 7500 | E903 | 0048 |
| 0000204540 | 7E83 | FEBC | 0375 | 3FE9 | FF00 | E076 | 681E | 12D3 |
| 0000204560 | 468D | 16D0 | 8D50 | F046 | 5016 | 468D | 16B8 | 1E50 |

THU MAR 14 17:25:16 1991 CRV_IPS.DLL PAGE 73, LINE 4249

| | | | | | | | | |
|---|---|---|---|---|---|---|---|---|
| 0000204600 | F868 | 6813 | 047E | 36FF | 0EA2 | 36FF | 0EA0 | 36FF |
| 0000204620 | 0EA6 | 36FF | 0EA4 | 681E | 12E5 | 3768 | 684A | 4A3A |
| 0000204640 | 3D9A | 004A | 8300 | 28C4 | 068E | 31AE | 8326 | F43E |
| 0000204660 | 0049 | 0375 | 09E9 | 8300 | BC7E | 74FE | E903 | 000F |
| 0000204700 | 068E | 31B0 | 8326 | 633E | 004A | 0375 | 51E9 | 8B00 |
| 0000204720 | E046 | 4689 | FFBE | C476 | 76FF | 8DC2 | BE46 | 5016 |
| 0000204740 | 76FF | FFDE | FA76 | 76FF | 8DF8 | D04E | 5116 | 4E8D |
| 0000204760 | 16F0 | 8D51 | B84E | 5116 | 681E | 13F8 | 7F68 | FF04 |
| 0000205000 | A236 | FF0E | A036 | FF0E | A636 | FF0E | A436 | 9A0E |
| 0000205020 | 4AAC | 0000 | C483 | 8B28 | BE46 | 29E9 | E90C | 0006 |
| 0000205040 | 468B | E9E0 | 0C20 | 5EC4 | 2B06 | 26C0 | 4789 | 2646 |
| 0000205060 | 4789 | FF44 | B476 | 76FF | FFB2 | 0E36 | 1E36 | 1468 |
| 0000205100 | 8B36 | 0646 | 568B | 0508 | 0044 | 5052 | 9E9A | 0013 |
| 0000205120 | 8900 | DC46 | 7E83 | 00DC | 0375 | D5E9 | 8E00 | AE06 |
| 0000205140 | 2631 | 3E83 | 4A4B | 7500 | E903 | 0048 | 7E83 | FEBC |
| 0000205160 | 0375 | 3FE9 | FF00 | DC76 | 681E | 12ED | 468D | 16D0 |
| 0000205200 | 8D50 | F046 | 5016 | 468D | 16B8 | 1E50 | F868 | 6813 |
| 0000205220 | 0487 | 36FF | 0EA2 | 36FF | 0EA0 | 36FF | 0EA6 | 36FF |
| 0000205240 | 0EA4 | 681E | 1301 | 1568 | 684B | 4B18 | 1B9A | 004B |
| 0000205260 | 8300 | 28C4 | 068E | 31AE | 8326 | D53E | 004A | 0375 |
| 0000205300 | 09E9 | 8300 | BC7E | 74FE | E903 | 000F | 068E | 31B0 |
| 0000205320 | 8326 | 6A3E | 0044 | 0375 | 51E9 | 8B00 | DC46 | 4689 |
| 0000205340 | FFBE | C476 | 76FF | 8DC2 | BE46 | 5016 | 76FF | FFDE |
| 0000205360 | FA76 | 76FF | 8DF8 | D04E | 5116 | 4E8D | 16F0 | 8D51 |
| 0000205400 | B84E | 5116 | 681E | 13F8 | 8868 | FF04 | A236 | FF0E |
| 0000205420 | A036 | FF0E | A636 | FF0E | A436 | 9A0E | 44B2 | 0000 |
| 0000205440 | C483 | 8B28 | BE46 | 1DE9 | E90B | 0006 | 468B | E9DC |
| 0000205460 | 0B14 | E9E9 | 8300 | C87E | 7436 | E903 | 008C | 068E |
| 0000205500 | 31AE | 8326 | 523E | 0044 | 0375 | 45E9 | 8300 | BC7E |
| 0000205520 | 75FE | E903 | 003C | 681E | 1309 | 468D | 16D0 | 8D50 |
| 0000205540 | F046 | 5016 | 468D | 16B8 | 1E50 | F868 | 6813 | 048D |
| 0000205560 | 36FF | 0EA2 | 36FF | 0EA0 | 36FF | 0EA6 | 36FF | 0EA4 |
| 0000205600 | 681E | 1319 | EA68 | 6845 | 45ED | F09A | 0045 | 8300 |
| 0000205620 | 26C4 | 76FF | FFE4 | E276 | 36FF | 3EE0 | 681E | 3EE2 |
| 0000205640 | 1C9A | 0044 | 8900 | DC46 | 7E83 | 00EE | 0375 | 16E9 |
| 0000205660 | FF00 | B476 | 76FF | FFB2 | 0E36 | 1E36 | 1468 | 9A36 |
| 0000205700 | 4BBD | 0000 | 4689 | E9DC | 0054 | 068E | 31AE | 8326 |
| 0000205720 | EB3E | 0047 | 0375 | 45E9 | 8300 | BC7E | 75FE | E903 |
| 0000205740 | 003C | 681E | 1321 | 468D | 16D0 | 8D50 | F046 | 5016 |
| 0000205760 | 468D | 16B8 | 1E50 | F868 | 6813 | 0494 | 36FF | 0EA2 |
| 0000206000 | 36FF | 0EA0 | 36FF | 0EA6 | 36FF | 0EA4 | 681E | 1340 |
| 0000206020 | 9068 | 6847 | 4793 | 969A | 0047 | 8300 | 26C4 | 76FF |
| 0000206040 | FFE4 | E276 | 36FF | 3EE0 | 681E | 3EE2 | 319A | 004B |
| 0000206060 | 8900 | DC46 | 068E | 31AE | 8326 | A93E | 004C | 0375 |
| 0000206100 | 09E9 | 8300 | BC7E | 74FE | E903 | 000F | 068E | 31B0 |
| 0000206120 | 8326 | 183E | 004D | 0375 | 50E9 | C700 | BE46 | FFF0 |
| 0000206140 | 76FF | FFC4 | C276 | 468D | 16BE | FF50 | DE76 | 76FF |
| 0000206160 | FFFA | F876 | 4E8D | 16D0 | 8D51 | F04E | 5116 | 4E8D |
| 0000206200 | 16B8 | 1E51 | F868 | 6813 | 0497 | 36FF | 0EA2 | 36FF |
| 0000206220 | 0EA0 | 36FF | 0EA6 | 36FF | 0EA4 | 619A | 004D | 8300 |
| 0000206240 | 28C4 | 468B | E9BE | 099E | 06E9 | B800 | FFF0 | 95E9 |
| 0000206260 | 8309 | E07E | 7405 | E903 | 0263 | 76FF | FFCE | CC76 |
| 0000206300 | 76FF | FFCA | E876 | 76FF | 9AE6 | 2E8D | 4EE3 | C483 |
| 0000206320 | 890A | E046 | 7E83 | 00E0 | 0375 | 0AE9 | FF01 | E476 |
| 0000206340 | 76FF | FFE2 | E036 | 1E3E | E26B | 9A3E | 4C9B | 0000 |
| 0000206360 | 4689 | 83DC | EE7E | 7500 | E903 | 0016 | 76FF | FFB4 |
| 0000206400 | B276 | 36FF | 360E | 681E | 3614 | AC9A | 004D | 8900 |
| 0000206420 | DC46 | 068E | 31AE | 8326 | 003E | 004D | 0375 | 48E9 |
| 0000206440 | 8300 | BC7E | 75FE | E903 | 003F | 76FF | 1EE0 | 4868 |

THU MAR 14 17:25:16 1991 CRV_IPS.DLL PAGE 74, LINE 4308

| | | | | | | | | |
|---|---|---|---|---|---|---|---|---|
| 0000206460 | 8D13 | D046 | 5016 | 468D | 16F0 | 8D50 | B846 | 5016 |
| 0000206500 | 681E | 13F8 | A668 | FF04 | A236 | FF0E | A036 | FF0E |
| 0000206520 | A636 | FF0E | A436 | 1E0E | 6068 | 6813 | 4E20 | 2368 |
| 0000206540 | 9A4E | 4E26 | 0000 | C483 | 8E28 | AE06 | 2631 | 3E83 |
| 0000206560 | 4DD9 | 7500 | E903 | 0009 | 7E83 | FEBC | 0374 | 0FE9 |
| 0000206600 | 8E00 | B006 | 2631 | 3E83 | 4E4C | 7500 | E903 | 0051 |
| 0000206620 | 468B | 89E0 | BE46 | 76FF | FFC4 | C276 | 468D | 16BE |
| 0000206640 | FF50 | DE76 | 76FF | FFFA | F876 | 4E8D | 16D0 | 8D51 |
| 0000206660 | F04E | 5116 | 4E8D | 16B8 | 1E51 | F868 | 6813 | 04A7 |
| 0000206700 | 36FF | 0EA2 | 36FF | 0EA0 | 36FF | 0EA6 | 36FF | 0EA4 |
| 0000206720 | 949A | 004E | 8300 | 28C4 | 468B | E9BE | 0868 | 06E9 |
| 0000206740 | 8B00 | E046 | 5FE9 | C708 | B646 | 0000 | 76FF | FFF6 |
| 0000206760 | F476 | 026A | 468D | 16B6 | 9A50 | CF29 | 4ED9 | C483 |
| 0000207000 | 890A | E046 | ,E83 | 00E0 | 0375 | 0DE9 | FF01 | E476 |
| 0000207020 | 76FF | FFE2 | E036 | 1E3E | E268 | 9A3E | 4DCB | 0000 |
| 0000207040 | 4689 | 83DC | EE7E | 7500 | E903 | 0016 | 76FF | FFB4 |
| 0000207060 | B276 | 36FF | 360E | 681E | 3614 | 509A | 004B | 8900 |
| 0000207100 | DC46 | 068E | 31AE | 8326 | 343E | 004E | 0375 | 4CE9 |
| 0000207120 | 8300 | BC7E | 75FE | E903 | 0043 | 76FF | FFE0 | C236 |
| 0000207140 | FF0E | C036 | 8D0E | D046 | 5016 | 468D | 16F0 | 8D50 |
| 0000207160 | B846 | 5016 | 681E | 13F8 | B368 | FF04 | A236 | FF0E |
| 0000207200 | A036 | FF0E | A636 | FF0E | A436 | 1E0E | 6868 | 6813 |
| 0000207220 | 4F3E | 4168 | 9A4F | 4F44 | 0000 | C483 | 8E28 | AE06 |
| 0000207240 | 2631 | 3E83 | 4EFB | 7500 | E903 | 0009 | 7E83 | FEBC |
| 0000207260 | 0374 | 0FE9 | 8E00 | B006 | 2631 | 3E83 | 4F6A | 7500 |
| 0000207300 | E903 | 0050 | 46C7 | EFBE | FFFF | C476 | 76FF | 8DC2 |
| 0000207320 | BE46 | 5016 | 76FF | FFDE | FA76 | 76FF | 8DF8 | D04E |
| 0000207340 | 5116 | 4E8D | 16F0 | 8D51 | B84E | 5116 | 681E | 13F8 |
| 0000207360 | B468 | FF04 | A236 | FF0E | A036 | FF0E | A636 | FF0E |
| 0000207400 | A436 | 9A0E | 48A3 | 0000 | C483 | 8B28 | BE46 | 35E9 |
| 0000207420 | E907 | 0006 | EFB8 | E9FF | 072C | 26E9 | 8307 | E07E |
| 0000207440 | 7406 | E903 | 04B4 | 7E83 | 00EE | 0374 | 0FE9 | 8B01 |
| 0000207460 | 0646 | 568B | 0508 | 0024 | 5052 | ACA1 | 8B0E | AE16 |
| 0000207500 | 050E | 0004 | 5052 | D29A | C991 | 8347 | 08C4 | 016A |
| 0000207520 | F89A | D329 | 8347 | 02C4 | 4689 | 83E0 | E07E | 7500 |
| 0000207540 | E903 | 00D5 | 068E | 31AE | 8326 | 523E | 004F | 0375 |
| 0000207560 | 48E9 | 8300 | BC7E | 75FE | E903 | 003F | 76FF | 1EE0 |
| 0000207600 | 7068 | 8D13 | D046 | 5016 | 468D | 16F0 | 8D50 | B846 |
| 0000207620 | 5016 | 681E | 13F8 | C268 | FF04 | A236 | FF0E | A036 |
| 0000207640 | FF0E | A636 | FF0E | A436 | 1E0E | 8568 | 6813 | 4BA1 |
| 0000207660 | A468 | 9A4B | 4BA7 | 0000 | C483 | 8E28 | AE06 | 2631 |
| 0000207700 | 3E83 | 4B61 | 7500 | E903 | 0009 | 7E83 | FEBC | 0374 |
| 0000207720 | 0FE9 | 8E00 | B006 | 2631 | 3E83 | 485A | 7500 | E903 |
| 0000207740 | 0051 | 468B | 89E0 | BE46 | 76FF | FFC4 | C276 | 468D |
| 0000207760 | 16BE | FF50 | DE76 | 76FF | FFFA | F876 | 4E8D | 16D0 |
| 0000210000 | 8D51 | F04E | 5116 | 4E8D | 16B8 | 1E51 | F868 | 6813 |
| 0000210020 | 04C3 | 36FF | 0EA2 | 36FF | 0EA0 | 36FF | 0EA6 | 36FF |
| 0000210040 | 0EA4 | E59A | 0050 | 8300 | 28C4 | 468B | E9BE | 0616 |
| 0000210060 | 06E9 | 8B00 | E046 | 0DE9 | C706 | EE46 | 0001 | 76FF |
| 0000210100 | FFCE | CC76 | 76FF | FFCA | E876 | 76FF | 9AE6 | 3335 |
| 0000210120 | 5119 | C483 | 890A | E046 | 7E83 | 00E0 | 0375 | 0AE9 |
| 0000210140 | FF01 | E476 | 76FF | FFE2 | E036 | 1E3E | E268 | 9A3E |
| 0000210160 | 501F | 0000 | 4689 | 83DC | EE7E | 7500 | E903 | 0016 |
| 0000210200 | 76FF | FFB4 | B276 | 36FF | 360E | 681E | 3614 | 399A |
| 0000210220 | 0051 | 8900 | DC46 | 068E | 31AE | 8326 | 843E | 0050 |
| 0000210240 | 0375 | 48E9 | 8300 | BC7E | 75FE | E903 | 003F | 76FF |
| 0000210260 | 1EE0 | 8D68 | 8D13 | D046 | 5016 | 468D | 16F0 | 8D50 |
| 0000210300 | B846 | 5016 | 681E | 13F8 | CF68 | FF04 | A236 | FF0E |
| 0000210320 | A036 | FF0E | A636 | FF0E | A436 | 1E0E | A368 | 6813 |

THU MAR 14 17:25:16 1991 CRV_IPS.DLL PAGE 75, LINE 4367

| | | | | | | | | |
|---|---|---|---|---|---|---|---|---|
| 0000210340 | 51A9 | AC68 | 9A51 | 51AF | 0000 | C483 | 8E28 | AE06 |
| 0000210360 | 2631 | 3E83 | 5166 | 7500 | E903 | 0009 | 7E83 | FEBC |
| 0000210400 | 0374 | 0FE9 | 8E00 | B006 | 2631 | 3E83 | 51D5 | 7500 |
| 0000210420 | E903 | 0051 | 468B | 89E0 | BE46 | 76FF | FFC4 | C276 |
| 0000210440 | 468D | 16BE | FF50 | DE76 | 76FF | FFFA | F876 | 4E8D |
| 0000210460 | 16D0 | 8D51 | F04E | 5116 | 4E8D | 16B8 | 1E51 | F868 |
| 0000210500 | 6813 | 04D0 | 36FF | 0EA2 | 36FF | 0EA0 | 36FF | 0EA6 |
| 0000210520 | 36FF | 0EA4 | 1E9A | 0052 | 8300 | 28C4 | 468B | E9BE |
| 0000210540 | 04E4 | 06E9 | 8B00 | E046 | DBE9 | 8B04 | CA46 | 2B40 |
| 0000210560 | F7D2 | FC76 | 5689 | FFC0 | CE76 | 76FF | FFCC | C076 |
| 0000210600 | 76FF | FFE8 | E676 | 8D9A | 5C2E | 834C | 0AC4 | 4689 |
| 0000210620 | 83E0 | E07E | 7500 | E903 | 010A | 76FF | FFE4 | E276 |
| 0000210640 | 36FF | 3EE0 | 681E | 3EE2 | 589A | 0051 | 8900 | DC46 |
| 0000210660 | 7E83 | 00EE | 0375 | 16E9 | FF00 | B476 | 76FF | FFB2 |
| 0000210700 | 0E36 | 1E36 | 1468 | 9A36 | 5269 | 0000 | 4689 | 8EDC |
| 0000210720 | AE06 | 2631 | 3E83 | 51BD | 7500 | E903 | 0048 | 7E83 |
| 0000210740 | FEBC | 0375 | 3FE9 | FF00 | E076 | 681E | 13AB | 468D |
| 0000210760 | 16D0 | 8D50 | F046 | 5016 | 468D | 16B8 | 1E50 | F868 |
| 0000211000 | 6813 | 04DC | 36FF | 0EA2 | 36FF | 0EA0 | 36FF | 0EA6 |
| 0000211020 | 36FF | 0EA4 | 681E | 13C2 | DD68 | 6852 | 52E0 | E39A |
| 0000211040 | 0052 | 8300 | 28C4 | 068E | 31AE | 8326 | 963E | 0052 |
| 0000211060 | 0375 | 09E9 | 8300 | BC7E | 74FE | E903 | 000F | 068E |
| 0000211100 | 31B0 | 8326 | 093E | 0053 | 0375 | 51E9 | 8B00 | E046 |
| 0000211120 | 4689 | FFBE | C476 | 76FF | 8DC2 | BE46 | 5016 | 76FF |
| 0000211140 | FFDE | FA76 | 76FF | 8DF8 | D04E | 5116 | 4E8D | 16F0 |
| 0000211160 | 8D51 | B84E | 5116 | 681E | 13F8 | DD68 | FF04 | A236 |
| 0000211200 | FF0E | A036 | [illegible]0E | A636 | FF0E | A436 | 9A0E | 4C2B |
| 0000211220 | 0000 | C483 | 8B28 | BE46 | ABE9 | E903 | 0006 | 468B |
| 0000211240 | E9E0 | 03A2 | 46C7 | 00B6 | FF00 | F676 | 76FF | 6AF4 |
| 0000211260 | 8D02 | B646 | 5016 | 299A | 8CCF | 834D | 0AC4 | 4689 |
| 0000211300 | 83E0 | E07E | 7500 | E903 | 010D | 76FF | FFE4 | E276 |
| 0000211320 | 36FF | 3EE0 | 681E | 3EE2 | 889A | 0052 | 8900 | DC46 |
| 0000211340 | 7E83 | 00EE | 0375 | 16E9 | FF00 | B476 | 76FF | FFB2 |
| 0000211360 | 0E36 | 1E36 | 1468 | 9A36 | 4C7C | 0000 | 4689 | 8EDC |
| 0000211400 | AE06 | 2631 | 3E83 | 52F1 | 7500 | E903 | 004C | 7E83 |
| 0000211420 | FEBC | 0375 | 43E9 | FF00 | E076 | 36FF | 0EC2 | 36FF |
| 0000211440 | 0EC0 | 468D | 16D0 | 8D50 | F046 | 5016 | 468D | 16B8 |
| 0000211460 | 1E50 | F868 | 6813 | 04E9 | 36FF | 0EA2 | 36FF | 0EA0 |
| 0000211500 | 36FF | 0EA6 | 36FF | 0EA4 | 681E | 13CA | EC68 | 684C |
| 0000211520 | 4CEF | F29A | 004C | 8300 | 28C4 | 068E | 31AE | 8326 |
| 0000211540 | CB3E | 004B | 0375 | 09E9 | 8300 | BC7E | 74FE | E903 |
| 0000211560 | 000F | 068E | 31B0 | 8326 | E33E | 004B | 0375 | 50E9 |
| 0000211600 | C700 | BE46 | FFEF | 76FF | FFC4 | C276 | 468D | 16BE |
| 0000211620 | FF50 | DE76 | 76FF | FFFA | F876 | 4E8D | 16D0 | 8D51 |
| 0000211640 | F04E | 5116 | 4E8D | 16B8 | 1E51 | F868 | 6813 | 04EA |
| 0000211660 | 36FF | 0EA2 | 36FF | 0EA0 | 36FF | 0EA6 | 36FF | 0EA4 |
| 0000211700 | B39A | 004F | 8300 | 28C4 | 468B | E9BE | 0278 | 06E9 |
| 0000211720 | B800 | FFEF | 6FE9 | E902 | 0269 | 7E83 | 07E0 | 0374 |
| 0000211740 | 60E9 | FF02 | CE76 | 76FF | FFCC | CA76 | 76FF | FFE8 |
| 0000211760 | E676 | 359A | E033 | 834F | 0AC4 | 4689 | 83E0 | E07E |
| 0000212000 | 7500 | E903 | 010A | 76FF | FFE4 | E276 | 36FF | 3EE0 |
| 0000212020 | 681E | 3EE2 | C49A | 0053 | 8900 | DC46 | 7E83 | 00EE |
| 0000212040 | 0375 | 16E9 | FF00 | B476 | 76FF | FFB2 | 0E36 | 1E36 |
| 0000212060 | 1468 | 9A36 | 54D5 | 0000 | 4689 | 8EDC | AE06 | 2631 |
| 0000212100 | 3E83 | 5429 | 7500 | E903 | 0048 | 7E83 | FEBC | 0375 |
| 0000212120 | 3FE9 | FF00 | E076 | 681E | 13D2 | 468D | 16D0 | 8D50 |
| 0000212140 | F046 | 5016 | 468D | 16B8 | 1E50 | F868 | 6813 | 04F9 |
| 0000212160 | 36FF | 0EA2 | 36FF | 0EA0 | 36FF | 0EA6 | 36FF | 0EA4 |
| 0000212200 | 681E | 13E8 | 4968 | 6855 | 554C | 4F9A | 0055 | 8300 |

THU MAR 14 17:25:16 1991 CRV_IPS.DLL PAGE 76, LINE 4426

| | | | | | | | | |
|---|---|---|---|---|---|---|---|---|
| 0000212220 | 28C4 | 068E | 31AE | 8326 | 023E | 0055 | 0375 | 09E9 |
| 0000212240 | 8300 | BC7E | 74FE | E903 | 000F | 068E | 31B0 | 8326 |
| 0000212260 | 753E | 0055 | 0375 | 51E9 | 8B00 | E046 | 4689 | FFBE |
| 0000212300 | C476 | 76FF | 8DC2 | BE46 | 5016 | 76FF | FFDE | FA76 |
| 0000212320 | 76FF | 8DF8 | D04E | 5116 | 4E8D | 16F0 | 8D51 | B84E |
| 0000212340 | 5116 | 681E | 13F8 | FA68 | FF04 | A236 | FF0E | A036 |
| 0000212360 | FF0E | A636 | FF0E | A436 | 9A0E | 55BD | 0000 | C483 |
| 0000212400 | 8B28 | BE46 | 3FE9 | E901 | 0006 | 468B | E9E0 | 0136 |
| 0000212420 | 46C7 | 00B6 | FF00 | F676 | 76FF | 6AF4 | 8D02 | B646 |
| 0000212440 | 5016 | 299A | 49CF | 8352 | 0AC4 | 4689 | 83E0 | E07E |
| 0000212460 | 7500 | E903 | 010D | 76FF | FFE4 | E276 | 36FF | 3EE0 |
| 0000212500 | 681E | 3EE2 | F49A | 0054 | 8900 | DC46 | 7E83 | 00EE |
| 0000212520 | 0375 | 16E9 | FF00 | B476 | 76FF | FFB2 | 0E36 | 1E36 |
| 0000212540 | 1468 | 9A36 | 5000 | 0000 | 4689 | 8EDC | AE06 | 2631 |
| 0000212560 | 3E83 | 555D | 7500 | E903 | 004C | 7E83 | FEBC | 0375 |
| 0000212600 | 43E9 | FF00 | E076 | 36FF | 0EC2 | 36FF | 0EC0 | 468D |
| 0000212620 | 16D0 | 8D50 | F046 | 5016 | 468D | 16B8 | 1E50 | F868 |
| 0000212640 | 6813 | 0506 | 36FF | 0EA2 | 36FF | 0EA0 | 36FF | 0EA6 |
| 0000212660 | 36FF | 0EA4 | 681E | 13F0 | 7068 | 6850 | 5073 | 769A |
| 0000212700 | 0050 | 8300 | 28C4 | 068E | 31AE | 8326 | 2D3E | 0050 |
| 0000212720 | 0375 | 09E9 | 8300 | BC7E | 74FE | E903 | 000F | 068E |
| 0000212740 | 31B0 | 8326 | 9C3E | 0050 | 0375 | 50E9 | C700 | BE46 |
| 0000212760 | FFEF | 76FF | FFC4 | C276 | 468D | 16BE | FF50 | DE76 |
| 0000213000 | 76FF | FFFA | F876 | 4E8D | 16D0 | 8D51 | F04E | 5116 |
| 0000213020 | 4E8D | 16B8 | 1E51 | F868 | 6813 | 0507 | 36FF | 0EA2 |
| 0000213040 | 36FF | 0EA0 | 36FF | 0EA6 | 36FF | 0EA4 | 519A | 0053 |
| 0000213060 | 8300 | 28C4 | 468B | E9BE | 000C | 06E9 | B800 | FFEF |
| 0000213100 | 03E9 | E900 | EE1A | 5F5E | ED83 | 8B02 | 1FE5 | 4D5D |
| 0000213120 | 1ECB | 9058 | 5545 | EC8B | 8E1E | 81D8 | 52EC | 5700 |
| 0000213140 | C756 | F846 | 140A | 5E8C | C7FA | DA46 | 0101 | C02B |
| 0000213160 | 4689 | 89C0 | BE46 | 068E | 31AE | 8326 | 3A3E | 0057 |
| 0000213200 | 0375 | 1DE9 | FF00 | A636 | FF0E | A436 | 8D0E | B646 |
| 0000213220 | 5016 | 449A | 003C | 8300 | 08C4 | 003D | 7400 | E903 |
| 0000213240 | 000F | 068E | 31B0 | 8326 | 523E | 0057 | 0375 | 3BE9 |
| 0000213260 | 1E00 | 0E68 | 8D14 | CC46 | 5016 | 468D | 16B6 | 8D50 |
| 0000213300 | F046 | 5016 | 2668 | 1E05 | B268 | FF15 | A236 | FF0E |
| 0000213320 | A036 | FF0E | A636 | FF0E | A436 | 9A0E | 3C8D | 0000 |
| 0000213340 | C483 | 891E | F046 | 5689 | E9F2 | 0008 | C02B | 4689 |
| 0000213360 | 89F2 | F046 | 46C7 | 00EE | 8E00 | B206 | 2631 | 1CA1 |
| 0000213400 | 260F | 168B | 0F1E | 4689 | 89E2 | E456 | A126 | 0F20 |
| 0000213420 | 8B26 | 2216 | 890F | AE46 | 5689 | C4B0 | 065E | 8B26 |
| 0000213440 | 4847 | 8B26 | 4A57 | A8A3 | 890E | AA16 | C40E | 065E |
| 0000213460 | 8B26 | 5047 | E0A3 | C43E | 065E | 8B26 | 4C47 | 8B26 |
| 0000213500 | 4E57 | E2A3 | 893E | E416 | C73E | DE46 | 36CC | 5E8C |
| 0000213520 | C4E0 | A81E | 260E | 478B | 8E5E | B406 | 2631 | 0639 |
| 0000213540 | 0F44 | 0374 | 26E9 | 2600 | 46A1 | C40F | A81E | 260E |
| 0000213560 | 4739 | 7460 | E903 | 0015 | 068E | 31B2 | A126 | 0F2C |
| 0000213600 | 1EC4 | 0EA8 | 3926 | 6247 | 0375 | 93E9 | FF00 | E476 |
| 0000213620 | 76FF | FFE2 | E036 | 1E3E | E268 | 9A3E | 5824 | 0000 |
| 0000213640 | 4689 | 8ED8 | AE06 | 2631 | 3E83 | 582F | 7500 | E903 |
| 0000213660 | 0009 | 7E83 | FEBA | 0374 | 0FE9 | 8E00 | B006 | 2631 |
| 0000213700 | 3E83 | 589E | 7500 | E903 | 0050 | 46C7 | E6BC | FFFF |
| 0000213720 | C076 | 76FF | 8DBE | BC46 | 5016 | 76FF | FFDA | FA76 |
| 0000213740 | 76FF | 8DF8 | CC4E | 5116 | 4E8D | 16F0 | 8D51 | B64E |
| 0000213760 | 5116 | 681E | 15B2 | 4468 | FF05 | A236 | FF0E | A036 |
| 0000214000 | FF0E | A636 | FF0E | A436 | 9A0E | 58E7 | 0000 | C483 |
| 0000214020 | 8B28 | BC46 | C6E9 | E912 | 0006 | E6B8 | E9FF | 12BD |
| 0000214040 | 068E | 31B2 | A126 | 0F2C | 2B48 | 26D2 | 36F7 | 0F2E |
| 0000214060 | 8940 | FC46 | 006A | FF26 | 2E36 | C40F | A81E | 260E |

THU MAR 14 17:25:16 1991 CRV_IPS.DLL PAGE 77, LINE 4485

```
0000214100  478B  C45E  A81E  260E  67F7  5260  9A50  A190
0000214120  591A  EAD1  D8D1  EAD1  D8D1  EAD1  D8D1  4689
0000214140  89E6  E856  76FF  FFE4  E276  36FF  3EE0  76FF
0000214160  FFE0  DE76  FF9A  00FF  8900  D846  7E83  00D8
0000214200  0375  E8E9  FF00  E476  76FF  FFE2  E036  1E3E
0000214220  E268  9A3E  593A  0000  068E  31AE  8326  863E
0000214240  0058  0375  48E9  8300  BA7E  75FE  E903  003F
0000214260  76FF  1ED8  1268  8D14  CC46  5016  468D  16F0
0000214300  8D50  B646  5016  681E  15B2  5068  FF05  A236
0000214320  FF0E  A036  FF0E  A636  FF0E  A436  1E0E  2768
0000214340  6814  598F  9268  9A59  5995  0000  C483  8E28
0000214360  AE06  2631  3E83  5948  7500  E903  0009  7E83
0000214400  FEBA  0374  0FE9  8E00  B006  2631  3E33  5441
0000214420  7500  E903  0051  468B  89D8  BC46  76FF  FFC0
0000214440  BE76  468D  16BC  FF50  DA76  76FF  FFFA  F876
0000214460  4E8D  16CC  8D51  F04E  5116  4E8D  16B6  1E51
0000214500  B268  6815  0551  36FF  0EA2  36FF  0EA0  36FF
0000214520  0EA6  36FF  0EA4  8A9A  0054  8300  28C4  468B
0000214540  E9BC  1179  06E9  8B00  D846  70E9  A111  15CA
0000214560  060B  15C8  0374  10E9  6A01  1E04  C868  6A15
0000214600  6A00  6A00  6A00  9A1E  DFDD  54B5  C483  890E
0000214620  DC46  7E83  00DC  0375  EEE9  FF00  E476  76FF
0000214640  FFE2  E036  1E3E  E268  9A3E  53A5  0000  4689
0000214660  8ED8  AE06  2631  3E83  59A3  7500  E903  004C
0000214700  7E83  FEBA  0375  43E9  FF00  DC76  36FF  0EBA
0000214720  36FF  0EB8  468D  16CC  8D50  F046  5016  468D
0000214740  16B6  1E50  B268  6815  055B  36FF  0EA2  36FF
0000214760  0EA0  36FF  0EA6  36FF  0EA4  681E  142F  1568
0000215000  6854  5418  1B9A  0054  8300  28C4  068E  31AE
0000215020  8326  D23E  0053  0375  09E9  8300  BA7E  74FE
0000215040  E903  000F  068E  31B0  8326  393E  0056  0375
0000215060  50E9  C700  BC46  FFEF  76FF  FFC0  BE76  468D
0000215100  16BC  FF50  DA76  76FF  FFFA  F876  4E8D  16CC
0000215120  8D51  F04E  5116  4E8D  16B6  1E51  B268  6815
0000215140  055C  36FF  0EA2  36FF  0EA0  36FF  0EA6  36FF
0000215160  0EA4  9A9A  0057  8300  28C4  468B  E9BC  105D
0000215200  06E9  B800  FFEF  54E9  8E10  B406  2631  3EA1
0000215220  C40F  DE5E  8926  0447  068E  31B4  A126  0F42
0000215240  5EC4  26DE  4789  8E06  B406  2631  3CA1  C40F
0000215260  DE5E  8926  0C47  068E  31B2  8126  283E  000F
0000215300  7704  E903  0008  46C7  06B4  E900  0005  46C7
0000215320  04B4  8B00  B446  E0D1  068E  31B4  2B26  4006
0000215340  F70F  40D8  5EC4  26DE  4789  FF0E  CA36  FF15
0000215360  C836  C415  A81E  260E  77FF  FF66  E076  76FF
0000215400  9ADE  CF29  57E0  C483  890A  DC46  76FF  FFE4
0000215420  E276  36FF  3EE0  006A  681E  3EE2  FF9A  00FF
0000215440  8900  D846  7E83  00DC  0375  D8E9  8E00  AE06
0000215460  2631  3E83  5B1F  7500  E903  004C  7E83  FEBA
0000215500  0375  43E9  FF00  DC76  36FF  0EC2  36FF  0EC0
0000215520  468D  16CC  8D50  F046  5016  468D  16B6  1E50
0000215540  B268  6815  0570  36FF  0EA2  36FF  0EA0  36FF
0000215560  0EA6  36FF  0EA4  681E  1437  E868  685B  5BEB
0000215600  EE9A  005B  8300  28C4  068E  31AE  8326  A53E
0000215620  005B  0375  C9E9  8300  BA7E  74FE  E903  000F
0000215640  068E  31B0  8326  143E  005C  0375  50E9  C700
0000215660  BC46  FFEF  76FF  FFC0  BE76  468D  16BC  FF50
0000215700  DA76  76FF  FFFA  F876  4E8D  16CC  8D51  F04E
0000215720  5116  4E8D  16B6  1E51  B268  6815  0571  36FF
0000215740  0EA2  36FF  0EA0  36FF  0EA6  36FF  0EA4  5D9A
```

THU MAR 14 17:25:16 1991 CRV_IPS.DLL PAGE 78, LINE 4544

| | | | | | | | | |
|---|---|---|---|---|---|---|---|---|
| 0000215760 | 005C | 8300 | 28C4 | 468B | E9BC | 0EE1 | 06E9 | B800 |
| 0000216000 | FFEF | D8E9 | 830E | D87E | 7500 | E903 | 00D5 | 068E |
| 0000216020 | 31AE | 8326 | FC3E | 005B | 0375 | 48E9 | 8300 | BA7E |
| 0000216040 | 75FE | E903 | 003F | 76FF | 1ED8 | 3F68 | 8D14 | CC46 |
| 0000216060 | 5016 | 468D | 16F0 | 8D50 | B646 | 5016 | 681E | 15B2 |
| 0000216100 | 7668 | FF05 | A236 | FF0E | A036 | FF0E | A636 | FF0E |
| 0000216120 | A436 | 1E0E | 5468 | 6814 | 5D09 | 0C68 | 9A5D | 5D0F |
| 0000216140 | 000D | C483 | 8E28 | AE06 | 2631 | 3E83 | 5CC2 | 7500 |
| 0000216160 | E903 | 0009 | 7E83 | FEBA | 0374 | 0FE9 | 8E00 | B006 |
| 0000216200 | 2631 | 3E83 | 5D35 | 7500 | E903 | 0051 | 468B | 89D8 |
| 0000216220 | BC46 | 76FF | FFC0 | BE76 | 468D | 16BC | FF50 | DA76 |
| 0000216240 | 76FF | FFFA | F876 | 4E8D | 16CC | 8D51 | F04E | 5116 |
| 0000216260 | 4E8D | 16B6 | 1E51 | B268 | 6815 | 0577 | 36FF | 0EA2 |
| 0000216300 | 36FF | 0EA0 | 36FF | 0EA6 | 36FF | 0EA4 | 7D9A | 005D |
| 0000216320 | 8300 | 28C4 | 468B | E9BC | 0E03 | 06E9 | 8B00 | D846 |
| 0000216340 | FAE9 | 8E0D | B206 | 2631 | 14A1 | 260F | 168B | 0F16 |
| 0000216360 | 4603 | 130A | 0C56 | 10A3 | 8936 | 1216 | 6836 | 5DA5 |
| 0000216400 | 9C68 | 9A30 | 454F | 0000 | 046A | 468D | 16F4 | 6A50 |
| 0000216420 | 1E04 | 1068 | 6A36 | 9A19 | DFDD | 5A94 | C483 | 890E |
| 0000216440 | DC46 | 7E83 | 00DC | 0375 | D8E9 | 8E00 | AE06 | 2631 |
| 0000216460 | 3E83 | 5D1D | 7500 | E903 | 004C | 7E83 | FEBA | 0375 |
| 0000216500 | 43E9 | FF00 | DC76 | 36FF | 0EBA | 36FF | 0EB8 | 468D |
| 0000216520 | 16CC | 8D50 | F046 | 5016 | 468D | 16B6 | 1E50 | B268 |
| 0000216540 | 6815 | 0580 | 36FF | 0EA2 | 36FF | 0EA0 | 36FF | 0EA6 |
| 0000216560 | 36FF | 0EA4 | 681E | 145C | 7268 | 6858 | 5875 | 789A |
| 0000216600 | 0058 | 8300 | 28C4 | 068E | 31AE | 8326 | D13E | 005D |
| 0000216620 | 0375 | 09E9 | 8300 | BA7E | 74FE | E903 | 000F | 068E |
| 0000216640 | 31B0 | 8326 | E93E | 005D | 0375 | 50E9 | C700 | BC46 |
| 0000216660 | FFEF | 76FF | FFC0 | BE76 | 468D | 16BC | FF50 | DA76 |
| 0000216700 | 76FF | FFFA | F876 | 4E8D | 16CC | 8D51 | F04E | 5116 |
| 0000216720 | 4E8D | 16B6 | 1E51 | B268 | 6815 | 0581 | 36FF | 0EA2 |
| 0000216740 | 36FF | 0EA0 | 36FF | 0EA6 | 36FF | 0EA4 | 319A | 005E |
| 0000216760 | 8300 | 28C4 | 468B | E9BC | 0CE3 | 06E9 | B800 | FFEF |
| 0000217000 | DAE9 | A10C | 3610 | 168B | 3612 | E0D1 | D2D1 | 4689 |
| 0000217020 | 89EA | EC56 | F168 | 6843 | 309C | 76FF | FFEC | EA76 |
| 0000217040 | FD9A | 0043 | 8900 | DC46 | 7E83 | 00DC | 0375 | 06E9 |
| 0000217060 | 8301 | DC7E | 7479 | E903 | 0080 | 068E | 31AE | 8326 |
| 0000217100 | 513E | 005E | 0375 | 09E9 | 8300 | BA7E | 74FE | E903 |
| 0000217120 | 000F | 068E | 31B0 | 8326 | 693E | 005E | 0375 | 50E9 |
| 0000217140 | C700 | BC46 | FFEF | 76FF | FFC0 | BE76 | 468D | 16BC |
| 0000217160 | FF50 | DA76 | 76FF | FFFA | F876 | 4E8D | 16CC | 8D51 |
| 0000217200 | F04E | 5116 | 4E8D | 16B6 | 1E51 | B268 | 6815 | 058B |
| 0000217220 | 36FF | 0EA2 | 36FF | 0EA0 | 36FF | 0EA6 | 36FF | 0EA4 |
| 0000217240 | 039A | 005A | 8300 | 28C4 | 468B | E9BC | 0C2F | 06E9 |
| 0000217260 | B800 | FFEF | 26E9 | E90C | 007D | 068E | 31AE | 8326 |
| 0000217300 | 0D3E | 0056 | 0375 | 09E9 | 8300 | BA7E | 74FE | E903 |
| 0000217320 | 000F | 068E | 31B0 | 8326 | BB3E | 0059 | 0375 | 50E9 |
| 0000217340 | C700 | BC46 | FFFF | 76FF | FFC0 | BE76 | 468D | 16BC |
| 0000217360 | FF50 | DA76 | 76FF | FFFA | F876 | 4E8D | 16CC | 8D51 |
| 0000217400 | F04E | 5116 | 4E8D | 16B6 | 1E51 | B268 | 6815 | 058D |
| 0000217420 | 36FF | 0EA2 | 36FF | 0EA0 | 36FF | 0EA6 | 36FF | 0EA4 |
| 0000217440 | C49A | 005F | 8300 | 28C4 | 468B | E9BC | 0BAF | 06E9 |
| 0000217460 | B800 | FFFF | A6E9 | 680B | 5C8E | 9C68 | 9A30 | 5C94 |
| 0000217500 | 0000 | 0A6A | 468D | 16C2 | 9A50 | E1E8 | 5CAA | C483 |
| 0000217520 | 8906 | DC46 | 7E83 | 01DC | 0374 | F0E9 | 8E00 | AE06 |
| 0000217540 | 2631 | 3E83 | 5F64 | 7500 | E903 | 0045 | 7E83 | FEBA |
| 0000217560 | 0375 | 3CE9 | 1E00 | 6468 | 8D14 | CC46 | 5016 | 468D |
| 0000217600 | 16F0 | 8D50 | B646 | 5016 | 681E | 15B2 | 9468 | FF05 |
| 0000217620 | A236 | FF0E | A036 | FF0E | A636 | FF0E | A436 | 1E0E |

THU MAR 14 17:25:16 1991 CRV_IPS.DLL PAGE 79, LINE 4603

| | | | | | | | | |
|---|---|---|---|---|---|---|---|---|
| 0000217640 | 7468 | 6814 | 602D | 3068 | 9A60 | 6033 | 0000 | C483 |
| 0000217660 | 8326 | EE7E | 7500 | E903 | 0013 | 76FF | FFB0 | AE76 |
| 0000217700 | 36FF | 360E | 681E | 3614 | 2C9A | 0057 | 8E00 | AE06 |
| 0000217720 | 2631 | 3E83 | 5FED | 7500 | E903 | 0009 | 7E83 | FEBA |
| 0000217740 | 0374 | 0FE9 | 8E00 | B006 | 2631 | 3E83 | 61A5 | 7500 |
| 0000217760 | E903 | 0050 | 46C7 | 00BC | FF00 | C076 | 76FF | 8DBE |
| 0000220000 | BC46 | 5016 | 76FF | FFDA | FA76 | 76FF | 8DF8 | CC4E |
| 0000220020 | 5116 | 4E8D | 16F0 | 8D51 | B64E | 5116 | 681E | 15B2 |
| 0000220040 | 9868 | FF05 | A236 | FF0E | A036 | FF0E | A636 | FF0E |
| 0000220060 | A436 | 9A0E | 61EE | 0000 | C483 | 8B28 | BC46 | 9CE9 |
| 0000220100 | E90A | 0006 | 00B8 | E900 | 0A93 | 10E9 | 830A | DC7E |
| 0000220120 | 7403 | E903 | 049F | 068E | 31AE | 8326 | 593E | 0060 |
| 0000220140 | 0375 | 45E9 | 8300 | BA7E | 75FE | E903 | 003C | 681E |
| 0000220160 | 147C | 468D | 16CC | 8D50 | F046 | 5016 | 468D | 16B6 |
| 0000220200 | 1E50 | B268 | 6815 | 059C | 36FF | 0EA2 | 36FF | 0EA0 |
| 0000220220 | 36FF | 0EA6 | 36FF | 0EA4 | 681E | 148B | 9968 | 6860 |
| 0000220240 | 609C | 9F9A | 0060 | 8300 | 26C4 | 7E83 | 33C2 | 0374 |
| 0000220260 | 03E9 | E900 | 0060 | 7E83 | 34C2 | 0374 | 03E9 | E900 |
| 0000220300 | 0054 | 068E | 31AE | 8326 | B63E | 0060 | 0375 | 45E9 |
| 0000220320 | 8300 | BA7E | 75FE | E903 | 003C | 681E | 1493 | 468D |
| 0000220340 | 16CC | 8D50 | F046 | 5016 | 468D | 16B6 | 1E50 | B268 |
| 0000220360 | 6815 | 05A7 | 36FF | 0EA2 | 36FF | 0EA0 | 36FF | 0EA6 |
| 0000220400 | 36FF | 0EA4 | 681E | 14B5 | F668 | 6860 | 60F9 | FC9A |
| 0000220420 | 0060 | 8300 | 26C4 | 7E83 | 35C4 | 0374 | 64E9 | 8E02 |
| 0000220440 | AE06 | 2631 | 3E83 | 6136 | 7500 | E903 | 0045 | 7E83 |
| 0000220460 | FEBA | 0375 | 3CE9 | 1E00 | BD68 | 8D14 | CC46 | 5016 |
| 0000220500 | 468D | 16F0 | 8D50 | B646 | 5016 | 681E | 15B2 | AA68 |
| 0000220520 | FF05 | A236 | FF0E | A036 | FF0E | A636 | FF0E | A436 |
| 0000220540 | 1E0E | C968 | 6814 | 6179 | 7C68 | 9A61 | 617F | 0000 |
| 0000220560 | C483 | 8326 | FC7E | 7401 | E903 | 00F8 | 76FF | FFCA |
| 0000220600 | C876 | 76FF | FFC6 | E876 | 76FF | 9AE6 | 3335 | 5385 |
| 0000220620 | C483 | 890A | DC46 | 7E83 | 00DC | 0375 | D5E9 | 8E00 |
| 0000220640 | AE06 | 2631 | 3E83 | 618D | 7500 | E903 | 0048 | 7E83 |
| 0000220660 | FEBA | 0375 | 3FE9 | FF00 | DC76 | 681E | 14D1 | 468D |
| 0000220700 | 16CC | 8D50 | F046 | 5016 | 468D | 16B6 | 1E50 | B268 |
| 0000220720 | 6815 | 05B1 | 36FF | 0EA2 | 36FF | 0EA0 | 36FF | 0EA6 |
| 0000220740 | 36FF | 0EA4 | 681E | 14E7 | 0B68 | 685B | 5B0E | 119A |
| 0000220760 | 005B | 8300 | 28C4 | 068E | 31AE | 8326 | C43E | 005A |
| 0000221000 | 0375 | 09E9 | 8300 | BA7E | 74FE | E903 | 000F | 068E |
| 0000221020 | 31B0 | 8326 | 373E | 005B | 0375 | 51E9 | 8B00 | DC46 |
| 0000221040 | 4689 | FFBC | C076 | 76FF | 8DBE | BC46 | 5016 | 76FF |
| 0000221060 | FFDA | FA76 | 76FF | 8DF8 | CC4E | 5116 | 4E8D | 16F0 |
| 0000221100 | 8D51 | B64E | 5116 | 681E | 15B2 | B268 | FF05 | A236 |
| 0000221120 | FF0E | A036 | FF0E | A636 | FF0E | A436 | 9A0E | 5B7F |
| 0000221140 | 0000 | C483 | 8B28 | BC46 | 72E9 | E908 | 0006 | 468B |
| 0000221160 | E9DC | 0869 | 5EC4 | 2B06 | 26C0 | 4789 | 2646 | 4789 |
| 0000221200 | FF44 | B076 | 76FF | FFAE | 0E36 | 1E36 | 1468 | 8B36 |
| 0000221220 | 0646 | 568B | 0508 | 0044 | 5052 | DD9A | 0049 | 8900 |
| 0000221240 | D846 | 7E83 | 00D8 | 0375 | D5E9 | 8E00 | AE06 | 2631 |
| 0000221260 | 3E83 | 6299 | 7500 | E903 | 0048 | 7E83 | FEBA | 0375 |
| 0000221300 | 3FE9 | FF00 | D876 | 681E | 14EF | 468D | 16CC | 8D50 |
| 0000221320 | F046 | 5016 | 468D | 16B6 | 1E50 | B268 | 6815 | 05BA |
| 0000221340 | 36FF | 0EA2 | 36FF | 0EA0 | 36FF | 0EA6 | 36FF | 0EA4 |
| 0000221360 | 681E | 1503 | 6368 | 6863 | 6366 | 699A | 0063 | 8300 |
| 0000221400 | 28C4 | 068E | 31AE | 8326 | 233E | 0063 | 0375 | 09E9 |
| 0000221420 | 8300 | BA7E | 74FE | E903 | 000F | 068E | 31B0 | 8326 |
| 0000221440 | 7C3E | 005F | 0375 | 51E9 | 8B00 | D846 | 4689 | FFBC |
| 0000221460 | C076 | 76FF | 8DBE | BC46 | 5016 | 76FF | FFDA | FA76 |
| 0000221500 | 76FF | 8DF8 | CC4E | 5116 | 4E8D | 16F0 | 8D51 | B64E |

THU MAR 14 17:25:16 1991 CRV_IPS.DLL PAGE 80, LINE 4662

| | | | | | | | | |
|---|---|---|---|---|---|---|---|---|
| 0000221520 | 5116 | 681E | 15B2 | BB68 | FF05 | A236 | FF0E | A036 |
| 0000221540 | FF0E | A636 | FF0E | A436 | 9A0E | 5EB1 | 0000 | C483 |
| 0000221560 | 8B28 | BC46 | 66E9 | E907 | 0006 | 468B | E9D8 | 075D |
| 0000221600 | F2E9 | 8300 | C47E | 7436 | E903 | 0076 | 068E | 31AE |
| 0000221620 | 8326 | 993E | 0063 | 0375 | 45E9 | 8300 | BA7E | 75FE |
| 0000221640 | E903 | 003C | 681E | 150B | 468D | 16CC | 8D50 | F046 |
| 0000221660 | 5016 | 468D | 16B6 | 1E50 | B268 | 6815 | 05C0 | 36FF |
| 0000221700 | 0EA2 | 36FF | 0EA0 | 36FF | 0EA6 | 36FF | 0EA4 | 681E |
| 0000221720 | 1519 | D968 | 6863 | 63DC | DF9A | 0063 | 8300 | 26C4 |
| 0000221740 | 7E83 | 00EE | 0375 | 16E9 | FF00 | B076 | 76FF | FFAE |
| 0000221760 | 0E36 | 1E36 | 1468 | 9A36 | 63FE | 0000 | 4689 | E9D8 |
| 0000222000 | 0073 | 068E | 31AE | 8326 | F43E | 005E | 0375 | 45E9 |
| 0000222020 | 8300 | BA7E | 75FE | E903 | 003C | 681E | 1521 | 468D |
| 0000222040 | 16CC | 8D50 | F046 | 5016 | 468D | 16B6 | 1E50 | B268 |
| 0000222060 | 6815 | 05C7 | 36FF | 0EA2 | 36FF | 0EA0 | 36FF | 0EA6 |
| 0000222100 | 36FF | 0EA4 | 681E | 1540 | 3468 | 685F | 5F37 | 3A9A |
| 0000222120 | 005F | 8300 | 26C4 | 7E83 | 00EE | 0375 | 16E9 | FF00 |
| 0000222140 | B076 | 76FF | FFAE | 0E36 | 1E36 | 1468 | 9A36 | 5F59 |
| 0000222160 | 0000 | 4689 | 8ED8 | AE06 | 2631 | 3E83 | 64D3 | 7500 |
| 0000222200 | E903 | 0009 | 7E83 | FEBA | 0374 | 0FE9 | 8E00 | B006 |
| 0000222220 | 2631 | 3E83 | 6542 | 7500 | E903 | 0050 | 46C7 | F0BC |
| 0000222240 | FFFF | C076 | 76FF | 8DBE | BC46 | 5016 | 76FF | FFDA |
| 0000222260 | FA76 | 76FF | 8DF8 | CC4E | 5116 | 4E8D | 16F0 | 8D51 |
| 0000222300 | B64E | 5116 | 681E | 15B2 | CD68 | FF05 | A236 | FF0E |
| 0000222320 | A036 | FF0E | A636 | FF0E | A436 | 9A0E | 658B | 0000 |
| 0000222340 | C483 | 8B28 | BC46 | F4E9 | E905 | 0006 | F0B8 | E9FF |
| 0000222360 | 05EB | 68E9 | 8305 | DC7E | 7408 | E903 | 0334 | 7E83 |
| 0000222400 | 00EE | 0374 | 0FE9 | 8B01 | 0646 | 568B | 0508 | 0024 |
| 0000222420 | 5052 | ACA1 | 8B0E | AE16 | 050E | 0004 | 5052 | D29A |
| 0000222440 | C091 | 8366 | 08C4 | 656A | F89A | AF29 | 8365 | 02C4 |
| 0000222460 | 4689 | 83DC | DC7E | 7500 | E903 | 00D5 | 068E | 31AE |
| 0000222500 | 8326 | 2A3E | 0065 | 0375 | 48E9 | 8300 | BA7E | 75FE |
| 0000222520 | E903 | 003F | 76FF | 1EDC | 4868 | 8D15 | CC46 | 5016 |
| 0000222540 | 468D | 16F0 | 8D50 | B646 | 5016 | 681E | 15B2 | D868 |
| 0000222560 | FF05 | A236 | FF0E | A036 | FF0E | A636 | FF0E | A436 |
| 0000222600 | 1E0E | 5D68 | 6815 | 6620 | 2368 | 9A66 | 6626 | 0000 |
| 0000222620 | C483 | 8E28 | AE06 | 2631 | 3E83 | 65DD | 7500 | E903 |
| 0000222640 | 0009 | 7E83 | FEBA | 0374 | 0FE9 | 8E00 | B006 | 2631 |
| 0000222660 | 3E83 | 664C | 7500 | E903 | 0051 | 468B | 89DC | BC46 |
| 0000222700 | 76FF | FFC0 | BE76 | 468D | 16BC | FF50 | DA76 | 76FF |
| 0000222720 | FFFA | F876 | 4E8D | 16CC | 8D51 | F04E | 5116 | 4E8D |
| 0000222740 | 16B6 | 1E51 | B268 | 6815 | 05D9 | 36FF | 0EA2 | 36FF |
| 0000222760 | 0EA0 | 36FF | 0EA6 | 36FF | 0EA4 | 959A | 0066 | 8300 |
| 0000223000 | 28C4 | 468B | E9BC | 04D5 | 06E9 | 8B00 | DC46 | CCE9 |
| 0000223020 | C704 | EE46 | 0001 | 76FF | FFCA | C876 | 3E9A | 1E38 |
| 0000223040 | 8361 | 04C4 | 4689 | 83DC | DC7E | 7500 | E903 | 00EB |
| 0000223060 | 76FF | FFB0 | AE76 | 36FF | 360E | 681E | 3614 | E09A |
| 0000223100 | 0066 | 8900 | D846 | 068E | 31AE | 8326 | 343E | 0066 |
| 0000223120 | 0375 | 48E9 | 8300 | BA7E | 75FE | E903 | 003F | 76FF |
| 0000223140 | 1EDC | 6568 | 8D15 | CC46 | 5016 | 468D | 16F0 | 8D50 |
| 0000223160 | B646 | 5016 | 681E | 15B2 | E268 | FF05 | A236 | FF0E |
| 0000223200 | A036 | FF0E | A636 | FF0E | A436 | 1E0E | 7B68 | 6815 |
| 0000223220 | 6735 | 3868 | 9A67 | 673B | 0000 | C483 | 8E28 | AE06 |
| 0000223240 | 2631 | 3E83 | 66EE | 7500 | E903 | 0009 | 7E83 | FEBA |
| 0000223260 | 0374 | 0FE9 | 8E00 | B006 | 2631 | 3E83 | 6761 | 7500 |
| 0000223300 | E903 | 0051 | 468B | 89DC | BC46 | 76FF | FFC0 | BE76 |
| 0000223320 | 468D | 16BC | FF50 | DA76 | 76FF | FFFA | F876 | 4E8D |
| 0000223340 | 16CC | 8D51 | F04E | 5116 | 4E8D | 16B6 | 1E51 | B268 |
| 0000223360 | 6815 | 05E3 | 36FF | 0EA2 | 36FF | 0EA0 | 36FF | 0EA6 |

THU MAR 14 17:25:16 1991 CRV_IPS.DLL PAGE 81, LINE 4721

| | | | | | | | | |
|---|---|---|---|---|---|---|---|---|
| 0000223400 | 36FF | 0EA4 | A99A | 0067 | 8300 | 28C4 | 468B | E9BC |
| 0000223420 | 03CB | 06E9 | 8B00 | DC46 | C2E9 | C703 | B246 | 0000 |
| 0000223440 | 76FF | FFF6 | F476 | 026A | 468D | 16B2 | 9A50 | CF29 |
| 0000223460 | 5EDC | C483 | 890A | DC46 | 7E83 | 00DC | 0375 | EEE9 |
| 0000223500 | FF00 | B076 | 76FF | FFAE | 0E36 | 1E36 | 1468 | 9A36 |
| 0000223520 | 6388 | 0000 | 4689 | 8ED8 | AE06 | 2631 | 3E83 | 6749 |
| 0000223540 | 7500 | E903 | 004C | 7E83 | FEBA | 0375 | 43E9 | FF00 |
| 0000223560 | DC76 | 36FF | 0EC2 | 36FF | 0EC0 | 468D | 16CC | 8D50 |
| 0000223600 | F046 | 5016 | 468D | 16B6 | 1E50 | B268 | 6815 | 05EC |
| 0000223620 | 36FF | 0EA2 | 36FF | 0EA0 | 36FF | 0EA6 | 36FF | 0EA4 |
| 0000223640 | 681E | 1583 | 8568 | 6862 | 6288 | 8B9A | 0062 | 8300 |
| 0000223660 | 28C4 | 068E | 31AE | 8326 | 423E | 0062 | 0375 | 09E9 |
| 0000223700 | 8300 | BA7E | 74FE | E903 | 000F | 068E | 31B0 | 8326 |
| 0000223720 | B13E | 0062 | 0375 | 50E9 | C700 | BC46 | FFEF | 76FF |
| 0000223740 | FFC0 | BE76 | 468D | 16BC | FF50 | DA76 | 76FF | FFFA |
| 0000223760 | F876 | 4E8D | 16CC | 8D51 | F04E | 5116 | 4E8D | 16B6 |
| 0000224000 | 1E51 | B268 | 6815 | 05ED | 36FF | 0EA2 | 36FF | 0EA0 |
| 0000224020 | 36FF | 0EA6 | 36FF | 0EA4 | FA9A | 0062 | 8300 | 28C4 |
| 0000224040 | 468B | E9BC | 02B7 | 06E9 | B800 | FFEF | AEE9 | E902 |
| 0000224060 | 022B | 7E83 | 06DC | 0374 | 22E9 | FF02 | CA76 | 76FF |
| 0000224100 | FFC8 | C676 | 76FF | FFE8 | E676 | 359A | BB33 | 8364 |
| 0000224120 | 0AC4 | 4689 | 83DC | DC7E | 7500 | E903 | 00EB | 76FF |
| 0000224140 | FFB0 | AE76 | 36FF | 360E | 681E | 3614 | 0E9A | 0069 |
| 0000224160 | 8900 | D846 | 068E | 31AE | 8326 | 623E | 0068 | 0375 |
| 0000224200 | 48E9 | 8300 | BA7E | 75FE | E903 | 003F | 76FF | 1EDC |
| 0000224220 | 8B68 | 8D15 | CC46 | 5016 | 468D | 16F0 | 8D50 | B646 |
| 0000224240 | 5016 | 681E | 15B2 | F868 | FF05 | A236 | FF0E | A036 |
| 0000224260 | FF0E | A636 | FF0E | A436 | 1E0E | A168 | 6815 | 6963 |
| 0000224300 | 6668 | 9A69 | 6969 | 0000 | C483 | 8E28 | AE06 | 2631 |
| 0000224320 | 3E83 | 691C | 7500 | E903 | 0009 | 7E83 | FEBA | 0374 |
| 0000224340 | 0FE9 | 8E00 | B006 | 2631 | 3E83 | 698F | 7500 | E903 |
| 0000224360 | 0051 | 468B | 89DC | BC46 | 76FF | FFC0 | BE76 | 468D |
| 0000224400 | 16BC | FF50 | DA76 | 76FF | FFFA | F876 | 4E8D | 16CC |
| 0000224420 | 8D51 | F04E | 5116 | 4E8D | 16B6 | 1E51 | B268 | 6815 |
| 0000224440 | 05F9 | 36FF | 0EA2 | 36FF | 0EA0 | 36FF | 0EA6 | 36FF |
| 0000224460 | 0EA4 | D79A | 0069 | 8300 | 28C4 | 468B | E9BC | 019D |
| 0000224500 | 06E9 | 8B00 | DC46 | 94E9 | C701 | B246 | 0000 | 76FF |
| 0000224520 | FFF6 | F476 | 026A | 468D | 16B2 | 9A50 | CF29 | 64B1 |
| 0000224540 | C483 | 890A | DC46 | 7E83 | 00DC | 0375 | EEE9 | FF00 |
| 0000224560 | B076 | 76FF | FFAE | 0E36 | 1E36 | 1468 | 9A36 | 65CF |
| 0000224600 | 0000 | 4689 | 8ED8 | AE06 | 2631 | 3E83 | 6977 | 7500 |
| 0000224620 | E903 | 004C | 7E83 | FEBA | 0375 | 43E9 | FF00 | DC76 |
| 0000224640 | 36FF | 0EC2 | 36FF | 0EC0 | 468D | 16CC | 8D50 | F046 |
| 0000224660 | 5016 | 468D | 16B6 | 1E50 | B268 | 6815 | 0603 | 36FF |
| 0000224700 | 0EA2 | 36FF | 0EA0 | 36FF | 0EA6 | 36FF | 0EA4 | 681E |
| 0000224720 | 15A9 | 1668 | 6865 | 6519 | 1C9A | 0065 | 8300 | 28C4 |
| 0000224740 | 068E | 31AE | 8326 | F73E | 0069 | 0375 | 09E9 | 8300 |
| 0000224760 | BA7E | 74FE | E903 | 000F | 068E | 31B0 | 8326 | 0F3E |
| 0000225000 | 006A | 0375 | 50E9 | C700 | BC46 | FFEF | 76FF | FFC0 |
| 0000225020 | BE76 | 468D | 16BC | FF50 | DA76 | 76FF | FFFA | F876 |
| 0000225040 | 4E8D | 16CC | 8D51 | F04E | 5116 | 4E8D | 16B6 | 1E51 |
| 0000225060 | B268 | 6815 | 0604 | 36FF | 0EA2 | 36FF | 0EA0 | 36FF |
| 0000225100 | 0EA6 | 36FF | 0EA4 | 579A | 006A | 8300 | 28C4 | 468B |
| 0000225120 | E9BC | 0089 | 06E9 | B800 | FFEF | 80E9 | E900 | F3B4 |
| 0000225140 | 068E | 31AE | 8326 | 0C3E | 0064 | 0375 | 09E9 | 8300 |
| 0000225160 | BA7E | 74FE | E903 | 000F | 068E | 31B0 | 8326 | 243E |
| 0000225200 | 0064 | 0375 | 50E9 | C700 | BC46 | 0000 | 76FF | FFC0 |
| 0000225220 | BE76 | 468D | 16BC | FF50 | DA76 | 76FF | FFFA | F876 |
| 0000225240 | 4E8D | 16CC | 8D51 | F04E | 5116 | 4E8D | 16B6 | 1E51 |

THU MAR 14 17:25:16 1991 CRV_IPS.DLL PAGE 82, LINE 4780

| | | | | | | | | |
|---|---|---|---|---|---|---|---|---|
| 0000225260 | B268 | 6815 | 0608 | 36FF | 0EA2 | 36FF | 0EA0 | 36FF |
| 0000225300 | 0EA6 | 36FF | 0EA4 | 6C9A | 0064 | 8300 | 28C4 | 468B |
| 0000225320 | E9BC | 0009 | 06E9 | B800 | 0000 | 00E9 | 5E00 | 835F |
| 0000225340 | 02ED | E58B | 5D1F | CB4D | 581E | 4590 | 8B55 | 1EEC |
| 0000225360 | D88E | EC81 | 0004 | 5657 | B81E | 5EC8 | D88E | 5EC4 |
| 0000225400 | 260A | 5FC4 | 2648 | 478B | E95C | 0040 | 76FF | FF08 |
| 0000225420 | 0676 | 76FF | FF0C | 0A76 | 039A | C56B | 836A | 08C4 |
| 0000225440 | 4689 | E9FC | 0039 | 76FF | FF08 | 0676 | 76FF | FF0C |
| 0000225460 | 0A76 | C39A | DD7A | 8367 | 08C4 | 4689 | E9FC | 001F |
| 0000225500 | E3B8 | E9FF | 001F | 16E9 | E900 | 0013 | 902D | 7501 |
| 0000225520 | E903 | FFB8 | 642D | 7500 | E903 | FFCA | E1E9 | 8BFF |
| 0000225540 | FC46 | 00E9 | 1F00 | 5F5E | ED83 | 8B02 | 1FE5 | 4D5D |
| 0000225560 | 08GA | 1E00 | 9058 | 5545 | EC8B | 8E1E | 81D8 | 46EC |
| 0000225600 | 5700 | C756 | FA46 | 15CC | 5E8C | C7FC | E246 | 0101 |
| 0000225620 | C02B | 4689 | 89C8 | C646 | 068E | 31AE | 8326 | FA3E |
| 0000225640 | 006B | 0375 | 1DE9 | FF00 | A636 | FF0E | A436 | 8D0E |
| 0000225660 | BE46 | 5016 | 239A | 0056 | 8300 | 08C4 | 003D | 7400 |
| 0000225700 | E903 | 000F | 068E | 31B0 | 8326 | 123E | 006C | 0375 |
| 0000225720 | 3BE9 | 1E00 | D068 | 8D15 | D446 | 5016 | 468D | 16BE |
| 0000225740 | 8D50 | F246 | 5016 | 3F68 | 1E06 | 0A68 | FF17 | A236 |
| 0000225760 | FF0E | A036 | FF0E | A636 | FF0E | A436 | 9A0E | 566C |
| 0000226000 | 0000 | C483 | 891E | F246 | 5689 | E9F4 | 0008 | C02B |
| 0000226020 | 4689 | 89F4 | F246 | 068E | 31B2 | A126 | 0F1C | 8B26 |
| 0000226040 | 1E16 | 890F | EA46 | 5689 | C4EC | 065E | 8B26 | 4847 |
| 0000226060 | 8B26 | 4A57 | 4689 | 89E6 | E856 | 068E | 31B4 | A126 |
| 0000226100 | 0F44 | 5EC4 | 26E6 | 4739 | 745E | E903 | 0015 | 5EC4 |
| 0000226120 | 26E6 | 478B | 8E60 | B406 | 2631 | 0639 | 0F46 | 0375 |
| 0000226140 | 7DE9 | 8E00 | AE06 | 2631 | 3E83 | 680B | 7500 | E903 |
| 0000226160 | 0009 | 7E83 | FEC2 | 0374 | 0FE9 | 8E00 | B006 | 2631 |
| 0000226200 | 3E83 | 687A | 7500 | E903 | 0050 | 46C7 | E6C4 | FFFF |
| 0000226220 | C876 | 76FF | 8DC6 | C446 | 5016 | 76FF | FFE2 | FC76 |
| 0000226240 | 76FF | 8DFA | D44E | 5116 | 4E8D | 16F2 | 8D51 | BE4E |
| 0000226260 | 5116 | 681E | 170A | 5068 | FF06 | A236 | FF0E | A036 |
| 0000226300 | FF0E | A636 | FF0E | A436 | 9A0E | 68C3 | 0000 | C483 |
| 0000226320 | 8B28 | C446 | 51E9 | E90E | 0006 | E6B8 | E9FF | 0E48 |
| 0000226340 | 18A1 | 0B17 | 1606 | 7417 | E903 | 00FA | 046A | 681E |
| 0000226360 | 1716 | 006A | 006A | 006A | 1C6A | DD9A | B9DF | 836D |
| 0000226400 | 0EC4 | 4689 | 83E4 | E47E | 7500 | E903 | 00D8 | 068E |
| 0000226420 | 31AE | 8326 | 003E | 006D | 0375 | 4CE9 | 8300 | C27E |
| 0000226440 | 75FE | E903 | 0043 | 76FF | FFE4 | BA36 | FF0E | B836 |
| 0000226460 | 8D0E | D446 | 5016 | 468D | 16F2 | 8D50 | BE46 | 5016 |
| 0000226500 | 681E | 170A | 5868 | FF06 | A236 | FF0E | A036 | FF0E |
| 0000226520 | A636 | FF0E | A436 | 1E0E | D468 | 6815 | 6E33 | 3668 |
| 0000226540 | 9A6E | 6E39 | 0000 | C483 | 8E28 | AE06 | 2631 | 3E83 |
| 0000226560 | 6DEC | 7500 | E903 | 0009 | 7E83 | FEC2 | 0374 | 0FE9 |
| 0000226600 | 8E00 | B006 | 2631 | 3E83 | 6E5F | 7500 | E903 | 0050 |
| 0000226620 | 46C7 | EFC4 | FFFF | C876 | 76FF | 8DC6 | C446 | 5016 |
| 0000226640 | 76FF | FFE2 | FC76 | 76FF | 8DFA | D44E | 5116 | 4E8D |
| 0000226660 | 16F2 | 8D51 | BE4E | 5116 | 681E | 17GA | 5968 | FF06 |
| 0000226700 | A236 | FF0E | A036 | FF0E | A636 | FF0E | A436 | 9A0E |
| 0000226720 | 6EA7 | 0000 | C483 | 8B28 | C446 | 4BE9 | E90D | 0006 |
| 0000226740 | EFB8 | E9FF | 0D42 | 068E | 31B4 | A126 | 0F3E | 5EC4 |
| 0000226760 | 26E6 | 5FC4 | 2668 | 4789 | 8E04 | B406 | 2631 | 42A1 |
| 0000227000 | C40F | E65E | C426 | 685F | 8926 | 0647 | 36FF | 1718 |
| 0000227020 | 36FF | 1716 | 5EC4 | 26E6 | 77FF | C466 | E65E | FF26 |
| 0000227040 | 6A77 | FF26 | 6877 | 299A | D1CF | 836F | 0AC4 | 4689 |
| 0000227060 | FFE4 | EC76 | 76FF | FFEA | E876 | 76FF | 6AE6 | 6A00 |
| 0000227100 | 6800 | 0190 | FF9A | 00FF | 8900 | E046 | 7E83 | 00E4 |
| 0000227120 | 0375 | D8E9 | 8E00 | AE06 | 2631 | 3E83 | 6E47 | 7500 |

THU MAR 14 17:25:16 1991 CRV_IPS.DLL PAGE 83, LINE 4839

| | | | | | | | | |
|---|---|---|---|---|---|---|---|---|
| 0000227140 | E903 | 004C | 7E83 | FEC2 | 0375 | 43E9 | FF00 | E476 |
| 0000227160 | 36FF | 0EC2 | 36FF | 0EC0 | 468D | 16D4 | 8D50 | F246 |
| 0000227200 | 5016 | 468D | 16BE | 1E50 | 0A68 | 6817 | 0669 | 36FF |
| 0000227220 | 0EA2 | 36FF | 0EA0 | 36FF | 0EA6 | 36FF | 0EA4 | 681E |
| 0000227240 | 15DC | 1068 | 686F | 6F13 | 169A | 006F | 8300 | 28C4 |
| 0000227260 | 068E | 31AE | 8326 | CD3E | 006E | 0375 | 09E9 | 8300 |
| 0000227300 | C27E | 74FE | E903 | 000F | 068E | 31B0 | 8326 | 3C3E |
| 0000227320 | 006F | 0375 | 50E9 | C700 | C446 | FFEF | 76FF | FFC8 |
| 0000227340 | C676 | 468D | 16C4 | FF50 | E276 | 76FF | FFFC | FA76 |
| 0000227360 | 4E8D | 16D4 | 8D51 | F24E | 5116 | 4E8D | 16BE | 1E51 |
| 0000227400 | 0A68 | 6817 | 066A | 36FF | 0EA2 | 36FF | 0EA0 | 36FF |
| 0000227420 | 0EA6 | 36FF | 0EA4 | 859A | 006F | 8300 | 28C4 | 468B |
| 0000227440 | E9C4 | 0C04 | 06E9 | B800 | FFEF | FBE9 | 830B | E07E |
| 0000227460 | 7500 | E903 | 00D5 | 068E | 31AE | 8326 | 243E | 006F |
| 0000227500 | 0375 | 48E9 | 8300 | C27E | 75FE | E903 | 003F | 76FF |
| 0000227520 | 1EE4 | E468 | 8D15 | D446 | 5016 | 468D | 16F2 | 8D50 |
| 0000227540 | BE46 | 5016 | 681E | 170A | 6F68 | FF06 | A236 | FF0E |
| 0000227560 | A036 | FF0E | A636 | FF0E | A436 | 1E0E | FA68 | 6815 |
| 0000227600 | 684E | 5168 | 9A68 | 6854 | 0000 | C483 | 8E28 | AE06 |
| 0000227620 | 2631 | 3E83 | 6FE9 | 7500 | E903 | 0009 | 7E83 | FEC2 |
| 0000227640 | 0374 | 0FE9 | 8E00 | B006 | 2631 | 3E83 | 6B5B | 7500 |
| 0000227660 | E903 | 0051 | 468B | 89E0 | C446 | 76FF | FFC8 | C676 |
| 0000227700 | 468D | 16C4 | FF50 | E276 | 76FF | FFFC | FA76 | 4E8D |
| 0000227720 | 16D4 | 8D51 | F24E | 5116 | 4E8D | 16BE | 1E51 | 0A68 |
| 0000227740 | 6817 | 0670 | 36FF | 0EA2 | 36FF | 0EA0 | 36FF | 0EA6 |
| 0000227760 | 36FF | 0EA4 | 5A9A | 006C | 8300 | 28C4 | 468B | E9C4 |
| 0000230000 | 0B26 | 06E9 | 8B00 | E046 | 1DE9 | 8E0B | B206 | 2631 |
| 0000230020 | 18A1 | 260F | 168B | 0F1A | 4603 | 130A | 0C56 | 10A3 |
| 0000230040 | 8936 | 1216 | 6836 | 6A8A | 9C68 | 9A30 | 5ECE | 0000 |
| 0000230060 | 006A | 006A | 006A | 046A | 681E | 3610 | 1A6A | DD9A |
| 0000230100 | EEDF | 8368 | 0EC4 | 4689 | 83E4 | E47E | 7500 | E903 |
| 0000230120 | 00D8 | 068E | 31AE | 8326 | 2F3E | 006B | 0375 | 4CE9 |
| 0000230140 | 8300 | C27E | 75FE | E903 | 0043 | 76FF | FFE4 | BA36 |
| 0000230160 | FF0E | B836 | 8D0E | D446 | 5016 | 468D | 16F2 | 8D50 |
| 0000230200 | BE46 | 5016 | 681E | 170A | 7A68 | FF06 | A236 | FF0E |
| 0000230220 | A036 | FF0E | A636 | FF0E | A436 | 1E0E | 0268 | 6816 |
| 0000230240 | 7250 | 5368 | 9A72 | 7256 | 0000 | C483 | 8E28 | AE06 |
| 0000230260 | 2631 | 3E83 | 70F8 | 7500 | E903 | 0009 | 7E83 | FEC2 |
| 0000230300 | 0374 | 0FE9 | 8E00 | B006 | 2631 | 3E83 | 7110 | 7500 |
| 0000230320 | E903 | 0050 | 46C7 | EFC4 | FFFF | C876 | 76FF | 8DC6 |
| 0000230340 | C446 | 5016 | 76FF | FFE2 | FC76 | 76FF | 8DFA | D44E |
| 0000230360 | 5116 | 4E8D | 16F2 | 8D51 | BE4E | 5116 | 681E | 170A |
| 0000230400 | 7B68 | FF06 | A236 | FF0E | A036 | FF0E | A636 | FF0E |
| 0000230420 | A436 | 9A0E | 7158 | 0000 | C483 | 8B28 | C446 | 07E9 |
| 0000230440 | E90A | 0006 | EFB8 | E9FF | 09FE | 10A1 | 8B36 | 1216 |
| 0000230460 | D136 | D1E0 | 89D2 | EE46 | 56B9 | 68F0 | 6FB6 | 9C68 |
| 0000230500 | FF30 | F076 | 76FF | 9AEE | 5DB1 | 0000 | 4689 | 83E4 |
| 0000230520 | E47E | 7500 | E903 | 0106 | 7E83 | 79E4 | 0374 | 80E9 |
| 0000230540 | 8E00 | AE06 | 2631 | 3E83 | 7178 | 7500 | E903 | 0009 |
| 0000230560 | 7E83 | FEC2 | 0374 | 0FE9 | 8E00 | B006 | 2631 | 3E83 |
| 0000230600 | 7190 | 7500 | E903 | 0050 | 46C7 | EFC4 | FFFF | C876 |
| 0000230620 | 76FF | 8DC6 | C446 | 5016 | 76FF | FFE2 | FC76 | 76FF |
| 0000230640 | 8DFA | D44E | 5116 | 4E8D | 16F2 | 8D51 | BE4E | 5116 |
| 0000230660 | 681E | 170A | 8268 | FF06 | A236 | FF0E | A036 | FF0E |
| 0000230700 | A636 | FF0E | A436 | 9A0E | 71D8 | 0000 | C483 | 8B28 |
| 0000230720 | C446 | 53E9 | E909 | 0006 | EFB8 | E9FF | 094A | 7DE9 |
| 0000230740 | 8E00 | AE06 | 2631 | 3E83 | 7210 | 7500 | E903 | 0009 |
| 0000230760 | 7E83 | FEC2 | 0374 | 0FE9 | 8E00 | B006 | 2631 | 3E83 |
| 0000231000 | 727C | 7500 | E903 | 0050 | 46C7 | FFC4 | FFFF | C876 |

THU MAR 14 17:25:16 1991 CRV_IPS.DLL PAGE 84, LINE 4898

| | | | | | | | | |
|---|---|---|---|---|---|---|---|---|
| 0000231020 | 76FF | 8DC6 | C446 | 5016 | 76FF | FFE2 | FC76 | 76FF |
| 0000231040 | 8DFA | D44E | 5116 | 4E8D | 16F2 | 8D51 | BE4E | 5116 |
| 0000231060 | 681E | 170A | 8468 | FF06 | A236 | FF0E | A036 | FF0E |
| 0000231100 | A636 | FF0E | A436 | 9A0E | 72C4 | 0000 | C483 | 8B28 |
| 0000231120 | C446 | D3E9 | E908 | 0006 | FFB8 | E9FF | 08CA | 0A6A |
| 0000231140 | 468D | 16CA | 9A50 | E1E8 | 6C8D | C483 | 8906 | E446 |
| 0000231160 | 7E83 | 01E4 | 0374 | D4E9 | 8E00 | AE06 | 2631 | 3E83 |
| 0000231200 | 7264 | 7500 | E903 | 0045 | 7E83 | FEC2 | 0375 | 3CE9 |
| 0000231220 | 1E00 | 0A68 | 8D16 | D446 | 5016 | 468D | 16F2 | 8D50 |
| 0000231240 | BE46 | 5016 | 681E | 170A | 8968 | FF06 | A236 | FF0E |
| 0000231260 | A036 | FF0E | A636 | FF0E | A436 | 1E0E | 1E68 | 6816 |
| 0000231300 | 732D | 3068 | 9A73 | 7333 | 0000 | C483 | 8E26 | AE06 |
| 0000231320 | 2631 | 3E83 | 72ED | 7500 | E903 | 0009 | 7E83 | FEC2 |
| 0000231340 | 0374 | 0FE9 | 8E00 | B006 | 2631 | 3E83 | 6D18 | 7500 |
| 0000231360 | E903 | 0050 | 46C7 | 00C4 | FF00 | C876 | 76FF | 8DC6 |
| 0000231400 | C446 | 5016 | 76FF | FFE2 | FC76 | 76FF | 8DFA | D44E |
| 0000231420 | 5116 | 4E8D | 16F2 | 8D51 | BE4E | 5116 | 681E | 170A |
| 0000231440 | 8A68 | FF06 | A236 | FF0E | A036 | FF0E | A636 | FF0E |
| 0000231460 | A436 | 9A0E | 6D60 | 0000 | C483 | 8B28 | C446 | E7E9 |
| 0000231500 | E907 | 0006 | 00B8 | E900 | 07DE | 5EE9 | 8307 | E47E |
| 0000231520 | 7403 | E903 | 0684 | 068E | 31AE | 8326 | 593E | 0073 |
| 0000231540 | 0375 | 45E9 | 8300 | C27E | 75FE | E903 | 003C | 681E |
| 0000231560 | 1626 | 468D | 16D4 | 8D50 | F246 | 5016 | 468D | 16BE |
| 0000231600 | 1E50 | 0A68 | 6817 | 068E | 36FF | 0EA2 | 36FF | 0EA0 |
| 0000231620 | 36FF | 0EA6 | 36FF | 0EA4 | 681E | 1635 | 9968 | 6873 |
| 0000231640 | 739C | 9F9A | 0073 | 8300 | 26C4 | 7E83 | 33CA | 0374 |
| 0000231660 | 03E9 | E900 | 0060 | 7E83 | 34CA | 0374 | 03E9 | E900 |
| 0000231700 | 0054 | 068E | 31AE | 8326 | B63E | 0073 | 0375 | 45E9 |
| 0000231720 | 8300 | C27E | 75FE | E903 | 003C | 681E | 163D | 468D |
| 0000231740 | 16D4 | 8D50 | F246 | 5016 | 468D | 16BE | 1E50 | 0A68 |
| 0000231760 | 6817 | 0698 | 36FF | 0EA2 | 36FF | 0EA0 | 36FF | 0EA6 |
| 0000232000 | 36FF | 0EA4 | 681E | 1660 | EC68 | 686C | 6CEF | F29A |
| 0000232020 | 006C | 8300 | 26C4 | 7E83 | 35CC | 0374 | 87E9 | 8E04 |
| 0000232040 | AE06 | 2631 | 3E83 | 6CA5 | 7500 | E903 | 0045 | 7E83 |
| 0000232060 | FEC2 | 0375 | 3CE9 | 1E00 | 6868 | 8D16 | D446 | 5016 |
| 0000232100 | 468D | 16F2 | 8D50 | BE46 | 5016 | 681E | 170A | 9B68 |
| 0000232120 | FF06 | A236 | FF0E | A036 | FF0E | A636 | FF0E | A436 |
| 0000232140 | 1E0E | 7468 | 6816 | 74A3 | A668 | 9A74 | 74A9 | 0000 |
| 0000232160 | C483 | 8E26 | B206 | 2631 | 22A1 | 260F | 060B | 0F20 |
| 0000232200 | 0374 | 0FE9 | 8B00 | EA46 | 568B | 89EC | F646 | 5689 |
| 0000232220 | E9F8 | 0013 | 068E | 31B2 | A126 | 0F20 | 8B26 | 2216 |
| 0000232240 | 890F | F646 | 5689 | FFF8 | F876 | 76FF | 6AF6 | 6A48 |
| 0000232260 | 6A00 | 8D00 | E646 | 5016 | 7D9A | 0024 | 8900 | E046 |
| 0000232300 | 7E83 | 00E0 | 0375 | D5E9 | 8E00 | AE06 | 2631 | 3E83 |
| 0000232320 | 74B7 | 7500 | E903 | 0048 | 7E83 | FEC2 | 0375 | 3FE9 |
| 0000232340 | FF00 | E076 | 681E | 167C | 468D | 16D4 | 8D50 | F246 |
| 0000232360 | 5016 | 468D | 16BE | 1E50 | 0A68 | 6817 | 06A7 | 36FF |
| 0000232400 | 0EA2 | 36FF | 0EA0 | 36FF | 0EA6 | 36FF | 0EA4 | 681E |
| 0000232420 | 1690 | 3068 | 6870 | 7033 | 369A | 0070 | 8300 | 28C4 |
| 0000232440 | 068E | 31AE | 8326 | 443E | 0070 | 0375 | 09E9 | 8300 |
| 0000232460 | C27E | 74FE | E903 | 000F | 068E | 31B0 | 8326 | 5C3E |
| 0000232500 | 0070 | 0375 | 51E9 | 8B00 | E046 | 4689 | FFC4 | C876 |
| 0000232520 | 76FF | 8DC6 | C446 | 5016 | 76FF | FFE2 | FC76 | 76FF |
| 0000232540 | 8DFA | D44E | 5116 | 4E8D | 16F2 | 8D51 | BE4E | 5116 |
| 0000232560 | 681E | 170A | A868 | FF06 | A236 | FF0E | A036 | FF0E |
| 0000232600 | A636 | FF0E | A436 | 9A0E | 70A4 | 0000 | C483 | 8B28 |
| 0000232620 | C446 | 93E9 | E905 | 0006 | 468B | E9E0 | 058A | 068E |
| 0000232640 | 31B2 | A126 | 0F24 | 8B26 | 2616 | 260F | 0639 | 0F1C |
| 0000232660 | 0374 | 1BE9 | 2600 | 1639 | 0F1E | 0374 | 11E9 | C400 |

THU MAR 14 17:25:16 1991 CRV_IPS.DLL PAGE 85, LINE 4957

| | | | | | | | | |
|---|---|---|---|---|---|---|---|---|
| 0000232700 | ACIE | 2B0E | 26C0 | 4789 | 2646 | 4789 | E944 | 0018 |
| 0000232720 | 068E | 31B2 | A126 | 0F1C | 8B26 | 1E16 | C40F | E65E |
| 0000232740 | 8926 | 4447 | 8926 | 4657 | 5EC4 | 2BE6 | 26C0 | 4789 |
| 0000232760 | 2656 | 4789 | C454 | E65E | C02B | 8926 | 0247 | 8926 |
| 0000233000 | C407 | E65E | C726 | 4847 | 007A | 068E | 31B4 | A126 |
| 0000233020 | 0F3C | 5EC4 | 26E6 | 4789 | 8E58 | B406 | 2631 | 3EA1 |
| 0000233040 | C40F | E65E | 8926 | 5A47 | 5EC4 | 26E6 | 47C7 | 905C |
| 0000233060 | 8E01 | B406 | 2631 | 44A1 | C40F | E65E | 8926 | 5E47 |
| 0000233100 | 068E | 31B4 | A126 | 0F46 | 5EC4 | 26E6 | 4789 | 8E60 |
| 0000233120 | B206 | 2631 | 2CA1 | C40F | E65E | 8926 | 6247 | 068E |
| 0000233140 | 31B2 | A126 | 0F2E | 5EC4 | 26E6 | 4789 | 8B64 | 0646 |
| 0000233160 | 568B | 0508 | 0024 | 5052 | 468B | 8BE6 | E856 | 0405 |
| 0000233200 | 5200 | 9A50 | 91D2 | 7631 | C483 | FF08 | D276 | 76FF |
| 0000233220 | 6AD0 | C448 | E65E | FF26 | 6A77 | FF26 | 6877 | 959A |
| 0000233240 | F8CF | 8371 | 0AC4 | 4689 | 83E4 | E47E | 7500 | E903 |
| 0000233260 | 00EC | 76FF | FFF8 | F676 | 76FF | FFE8 | E676 | 479A |
| 0000233300 | 0026 | 8900 | E046 | 068E | 31AE | 8326 | B83E | 0076 |
| 0000233320 | 0375 | 4CE9 | 8300 | C27E | 75FE | E903 | 0043 | 76FF |
| 0000233340 | FFE4 | BE36 | FF0E | BC36 | 8D0E | D446 | 5016 | 468D |
| 0000233360 | 16F2 | 8D50 | BE46 | 5016 | 681E | 170A | C268 | FF06 |
| 0000233400 | A236 | FF0E | A036 | FF0E | A636 | FF0E | A436 | 1E0E |
| 0000233420 | 9868 | 6816 | 77A8 | AB68 | 9A77 | 77AE | 0000 | C483 |
| 0000233440 | 8E28 | AE06 | 2631 | 3E83 | 7765 | 7500 | E903 | 0009 |
| 0000233460 | 7E83 | FEC2 | 0374 | 0FE9 | 8E00 | B006 | 2631 | 3E83 |
| 0000233500 | 77D4 | 7500 | E903 | 0050 | 46C7 | EFC4 | FFFF | C876 |
| 0000233520 | 76FF | 8DC6 | C446 | 5016 | 76FF | FFE2 | FC76 | 76FF |
| 0000233540 | 8DFA | D44E | 5116 | 4E8D | 16F2 | 8D51 | BE4E | 5116 |
| 0000233560 | 681E | 170A | C368 | FF06 | A236 | FF0E | A036 | FF0E |
| 0000233600 | A636 | FF0E | A436 | 9A0E | 781D | 0000 | C483 | 8B28 |
| 0000233620 | C446 | 93E9 | E903 | 0006 | EFB8 | E9FF | 038A | C02B |
| 0000233640 | 4689 | 89BC | BA46 | 76FF | FFF8 | F676 | 76FF | FFE8 |
| 0000233660 | E676 | 016A | 016A | 006A | 468D | 16BA | 9A50 | 2746 |
| 0000233700 | 0000 | 4689 | 83E0 | E07E | 7500 | E903 | 00D5 | 068E |
| 0000233720 | 31AE | 8326 | BC3E | 0077 | 0375 | 48E9 | 8300 | C27E |
| 0000233740 | 75FE | E903 | 003F | 76FF | 1EE0 | A068 | 8D16 | D446 |
| 0000233760 | 5016 | 468D | 16F2 | 8D50 | BE46 | 5016 | 681E | 170A |
| 0000234000 | CA68 | FF06 | A236 | FF0E | A036 | FF0E | A636 | FF0E |
| 0000234020 | A436 | 1E0E | B268 | 6816 | 7886 | 8968 | 9A78 | 788C |
| 0000234040 | 0000 | C483 | 8E28 | AE06 | 2631 | 3E83 | 7846 | 7500 |
| 0000234060 | E903 | 0009 | 7E83 | FEC2 | 0374 | 0FE9 | 8E00 | B006 |
| 0000234100 | 2631 | 3E83 | 7909 | 7500 | E903 | 0051 | 468B | 89E0 |
| 0000234120 | C446 | 76FF | FFC8 | C676 | 468D | 16C4 | FF50 | E276 |
| 0000234140 | 76FF | FFFC | FA76 | 4E8D | 16D4 | 8D51 | F24E | 5116 |
| 0000234160 | 4E8D | 16BE | 1E51 | 0A68 | 6817 | 06CB | 36FF | 0EA2 |
| 0000234200 | 36FF | 0EA0 | 36FF | 0EA6 | 36FF | 0EA4 | 189A | 0075 |
| 0000234220 | 8300 | 28C4 | 468B | E9C4 | 028E | 06E9 | 8B00 | E046 |
| 0000234240 | 85E9 | E902 | 00B4 | 7E83 | 36CC | 0374 | 57E9 | 8E00 |
| 0000234260 | AE06 | 2631 | 3E83 | 789D | 7500 | E903 | 0045 | 7E83 |
| 0000234300 | FEC2 | 0375 | 3CE9 | 1E00 | BA68 | 8D16 | D446 | 5016 |
| 0000234320 | 468D | 16F2 | 8D50 | BE46 | 5016 | 681E | 170A | D068 |
| 0000234340 | FF06 | A236 | FF0E | A036 | FF0E | A636 | FF0E | A436 |
| 0000234360 | 1E0E | C868 | 6816 | 78DD | E068 | 9A78 | 78E3 | 0000 |
| 0000234400 | C483 | E926 | 0054 | 068E | 31AE | 8326 | F13E | 0078 |
| 0000234420 | 0375 | 45E9 | 8300 | C27E | 75FE | E903 | 003C | 681E |
| 0000234440 | 16D0 | 468D | 16D4 | 8D50 | F246 | 5016 | 468D | 16BE |
| 0000234460 | 1E50 | 0A68 | 6817 | 06D3 | 36FF | 0EA2 | 36FF | 0EA0 |
| 0000234500 | 36FF | 0EA6 | 36FF | 0EA4 | 681E | 16EC | F668 | 6873 |
| 0000234520 | 73F9 | FC9A | 0073 | 8300 | 26C4 | 068E | 31AE | 8326 |
| 0000234540 | 603E | 0074 | 0375 | 09E9 | 8300 | C27E | 74FE | E903 |

THU MAR 14 17:25:16 1991 CRV_IPS.DLL PAGE 86, LINE 5016

| | | | | | | | | |
|---|---|---|---|---|---|---|---|---|
| 0000234560 | 000F | 068E | 31B0 | 8326 | CF3E | 0074 | 0375 | 50E9 |
| 0000234600 | C700 | C446 | FFF0 | 76FF | FFC8 | C676 | 468D | 16C4 |
| 0000234620 | FF50 | E276 | 76FF | FFFC | FA76 | 4E8D | 16D4 | 8D51 |
| 0000234640 | F24E | 5116 | 4E8D | 16BE | 1E51 | 0A68 | 6817 | 06D5 |
| 0000234660 | 36FF | 0EA2 | 36FF | 0EA0 | 36FF | 0EA6 | 36FF | 0EA4 |
| 0000234700 | 259A | 007A | 8300 | 28C4 | 468B | E9C4 | 015A | 06E9 |
| 0000234720 | B800 | FFF0 | 51E9 | E901 | 00D1 | 068E | 31AE | 8326 |
| 0000234740 | C53E | 0079 | 0375 | 45E9 | 8300 | C27E | 75FE | E903 |
| 0000234760 | 003C | 681E | 16F4 | 468D | 16D4 | 8D50 | F246 | 5016 |
| 0000235000 | 468D | 16BE | 1E50 | 0A6B | 6817 | 06D9 | 36FF | 0EA2 |
| 0000235020 | 36FF | 0EA0 | 36FF | 0EA6 | 36FF | 0EA4 | 681E | 1701 |
| 0000235040 | A468 | 6876 | 76A7 | AA9A | 0076 | 8300 | 26C4 | 068E |
| 0000235060 | 31AE | 8326 | 423E | 007A | 0375 | 09E9 | 8300 | C27E |
| 0000235100 | 74FE | E903 | 000F | 068E | 31B0 | 8326 | 5A3E | 007A |
| 0000235120 | 0375 | 50E9 | C700 | C446 | FFEF | 76FF | FFC8 | C676 |
| 0000235140 | 468D | 16C4 | FF50 | E276 | 76FF | FFFC | FA76 | 4E8D |
| 0000235160 | 16D4 | 8D51 | F24E | 5116 | 4E8D | 16BE | 1E51 | 0A68 |
| 0000235200 | 6817 | 06DA | 36FF | 0EA2 | 36FF | 0EA0 | 36FF | 0EA6 |
| 0000235220 | 36FF | 0EA4 | A29A | 007A | 8300 | 28C4 | 468B | E9C4 |
| 0000235240 | 0086 | 06E9 | B800 | FFEF | 7DE9 | 8E00 | AE06 | 2631 |
| 0000235260 | 3E83 | 765D | 7500 | E903 | 0009 | 7E83 | FEC2 | 0374 |
| 0000235300 | 0FE9 | 8E00 | B006 | 2631 | 3E83 | 76D0 | 7500 | E903 |
| 0000235320 | 0050 | 46C7 | 00C4 | FF00 | C876 | 76FF | 8DC6 | C446 |
| 0000235340 | 5016 | 76FF | FFE2 | FC76 | 76FF | 8DFA | D44E | 5116 |
| 0000235360 | 4E8D | 16F2 | 8D51 | BE4E | 5116 | 681E | 170A | DC68 |
| 0000235400 | FF06 | A236 | FF0E | A036 | FF0E | A636 | FF0E | A436 |
| 0000235420 | 9A0E | 7718 | 0000 | C483 | 8B28 | C446 | 09E9 | E900 |
| 0000235440 | 0006 | 00B8 | E900 | 0000 | 5F5E | ED83 | 8B02 | 1FE5 |
| 0000235460 | 4D5D | 1ECB | 9058 | 5545 | EC8B | 8E1E | 81D8 | 46EC |
| 0000235500 | 5700 | C756 | FA46 | 171A | 5E8C | C7FC | E246 | 0101 |
| 0000235520 | C02B | 4689 | 89C8 | C646 | 068E | 31AE | 8326 | B93E |
| 0000235540 | 007B | 0375 | 1DE9 | FF00 | A636 | FF0E | A436 | 8D0E |
| 0000235560 | BE46 | 5016 | 459A | 006B | 8300 | 0BC4 | 003D | 7400 |
| 0000235600 | E903 | 000F | 068E | 31B0 | 8326 | D13E | 007B | 0375 |
| 0000235620 | 3BE9 | 1E00 | 1E68 | 8D17 | D446 | 5016 | 468D | 16BE |
| 0000235640 | 8D50 | F246 | 5016 | E968 | 1E06 | 5468 | FF18 | A236 |
| 0000235660 | FF0E | A036 | FF0E | A636 | FF0E | A436 | 9A0E | 6B8E |
| 0000235700 | 0000 | C483 | 891E | F246 | 5689 | E9F4 | 0008 | C02B |
| 0000235720 | 4689 | 89F4 | F246 | 068E | 31B2 | A126 | 0F1C | 8B26 |
| 0000235740 | 1E16 | 890F | EA46 | 5689 | C4EC | 065E | 8B26 | 4847 |
| 0000235760 | 8B26 | 4A57 | 4689 | 89E6 | E856 | 068E | 31B4 | A126 |
| 0000236000 | 0F44 | 5EC4 | 26E6 | 4739 | 745E | E903 | 0014 | 068E |
| 0000236020 | 31B4 | A126 | 0F46 | 5EC4 | 26E6 | 4739 | 7560 | E903 |
| 0000236040 | 007D | 068E | 31AE | 8326 | 643E | 007C | 0375 | 09E9 |
| 0000236060 | 8300 | C27E | 74FE | E903 | 000F | 068E | 31B0 | 8326 |
| 0000236100 | D73E | 007C | 0375 | 50E9 | C700 | C446 | FFE6 | 76FF |
| 0000236120 | FFC8 | C676 | 468D | 16C4 | FF50 | E276 | 76FF | FFFC |
| 0000236140 | FA76 | 4E8D | 16D4 | 8D51 | F24E | 5116 | 4E8D | 16BE |
| 0000236160 | 1E51 | 5468 | 6818 | 06FA | 36FF | 0EA2 | 36FF | 0EA0 |
| 0000236200 | 36FF | 0EA6 | 36FF | 0EA4 | 1F9A | 007D | 8300 | 28C4 |
| 0000236220 | 468B | E9C4 | 0EA8 | 06E9 | B800 | FFE6 | 9FE9 | A10E |
| 0000236240 | 186A | 060B | 1868 | 0374 | FAE9 | 6A00 | 1E04 | 6868 |
| 0000236260 | 6A18 | 6A00 | 6A00 | 6A00 | 9A1D | DFDD | 7D52 | C483 |
| 0000236300 | 890E | E446 | 7E83 | 00E4 | 0375 | D8E9 | 8E00 | AE06 |
| 0000236320 | 2631 | 3E83 | 7CBF | 7500 | E903 | 004C | 7E83 | FEC2 |
| 0000236340 | 0375 | 43E9 | FF00 | E476 | 36FF | 0EBA | 36FF | 0EB8 |
| 0000236360 | 468D | 16D4 | 8D50 | F246 | 5016 | 468D | 16BE | 1E50 |
| 0000236400 | 5468 | 6818 | 0702 | 36FF | 0EA2 | 36FF | 0EA0 | 36FF |
| 0000236420 | 0EA6 | 36FF | 0EA4 | 681E | 1722 | CC68 | 687D | 7DCF |

THU MAR 14 17:25:16 1991 CRV_IPS.DLL PAGE 87, LINE 5075

| | | | | | | | | |
|---|---|---|---|---|---|---|---|---|
| 0000236440 | D29A | 007D | 8300 | 28C4 | 068E | 31AE | 8326 | 853E |
| 0000236460 | 007D | 0375 | 09E9 | 8300 | C27E | 74FE | E903 | 000F |
| 0000236500 | 068E | 31B0 | 8326 | F83E | 007D | 0375 | 50E9 | C700 |
| 0000236520 | C446 | FFEF | 76FF | FFC8 | C676 | 468D | 16C4 | FF50 |
| 0000236540 | E276 | 76FF | FFFC | FA76 | 4E8D | 16D4 | 8D51 | F24E |
| 0000236560 | 5116 | 4E8D | 16BE | 1E51 | 5468 | 6818 | 0703 | 36FF |
| 0000236600 | 0EA2 | 36FF | 0EA0 | 36FF | 0EA6 | 36FF | 0EA4 | 409A |
| 0000236620 | 007E | 8300 | 28C4 | 468B | E9C4 | 0DA2 | 06E9 | B800 |
| 0000236640 | FFEF | 99E9 | FF0D | 6A36 | FF18 | 6836 | C418 | E65E |
| 0000236660 | FF26 | 6677 | 5EC4 | 26E6 | 77FF | 266A | 77FF | 9A68 |
| 0000236700 | CF29 | 7616 | C483 | 890A | E446 | 76FF | FFEC | EA76 |
| 0000236720 | 76FF | FFE8 | E676 | 006A | 0D6A | F468 | 9A01 | 6DD5 |
| 0000236740 | 0000 | 4689 | 83E0 | E47E | 7500 | E903 | 00D8 | 068E |
| 0000236760 | 31AE | 8326 | E03E | 007D | 0375 | 4CE9 | 8300 | C27E |
| 0000237000 | 75FE | E903 | 0043 | 76FF | FFE4 | C236 | FF0E | C036 |
| 0000237020 | 8D0E | D446 | 5016 | 468D | 16F2 | 8D50 | BE46 | 5016 |
| 0000237040 | 681E | 1854 | 0E68 | FF07 | A236 | FF0E | A036 | FF0E |
| 0000237060 | A636 | FF0E | A436 | 1E0E | 2A68 | 6817 | 79B1 | B468 |
| 0000237100 | 9A79 | 79B7 | 0000 | C483 | 8E28 | AE06 | 2631 | 3E83 |
| 0000237120 | 7E66 | 7500 | E903 | 0009 | 7E83 | FEC2 | 0374 | 0FE9 |
| 0000237140 | 8E00 | B006 | 2631 | 3E83 | 79DD | 7500 | E903 | 0050 |
| 0000237160 | 46C7 | EFC4 | FFFF | C876 | 76FF | 8DC6 | C446 | 5016 |
| 0000237200 | 76FF | FFE2 | FC76 | 76FF | 8DFA | D44E | 5116 | 4E8D |
| 0000237220 | 16F2 | 8D51 | BE4E | 5116 | 681E | 1854 | 0F68 | FF07 |
| 0000237240 | A236 | FF0E | A036 | FF0E | A636 | FF0E | A436 | 9A0E |
| 0000237260 | 7951 | 0000 | C483 | 8B28 | C446 | 81E9 | E90C | 0006 |
| 0000237300 | EFB8 | E9FF | 0C78 | 7E83 | 00E0 | 0375 | D5E9 | 8E00 |
| 0000237320 | AE06 | 2631 | 3E83 | 7971 | 7500 | E903 | 0048 | 7E83 |
| 0000237340 | FEC2 | 0375 | 3FE9 | FF00 | E476 | 681E | 1732 | 468D |
| 0000237360 | 16D4 | 8D50 | F246 | 5016 | 468D | 16BE | 1E50 | 5468 |
| 0000237400 | 6818 | 0714 | 36FF | 0EA2 | 36FF | 0EA0 | 36FF | 0EA6 |
| 0000237420 | 36FF | 0EA4 | 681E | 1748 | AB68 | 687C | 7CAE | B19A |
| 0000237440 | 007C | 8300 | 28C4 | 068E | 31AE | 8326 | EF3E | 007A |
| 0000237460 | 0375 | 09E9 | 8300 | C27E | 74FE | E903 | 000F | 068E |
| 0000237500 | 31B0 | 8326 | 1B3E | 007B | 0375 | 51E9 | 8B00 | E046 |
| 0000237520 | 4689 | FFC4 | C876 | 76FF | 8DC6 | C446 | 5016 | 76FF |
| 0000237540 | FFE2 | FC76 | 76FF | 8DFA | D44E | 5116 | 4E8D | 16F2 |
| 0000237560 | 8D51 | BE4E | 5116 | 681E | 1854 | 1568 | FF07 | A236 |
| 0000237600 | FF0E | A036 | FF0E | A636 | FF0E | A436 | 9A0E | 7C19 |
| 0000237620 | 0000 | C483 | 8B28 | C446 | A3E9 | E90B | 0006 | 468B |
| 0000237640 | E9E0 | 0B9A | 068E | 31B2 | A126 | 0F18 | 8B26 | 1A16 |
| 0000237660 | 030F | 0A46 | 5613 | A30C | 3610 | 1689 | 3612 | CC68 |
| 0000237700 | 6870 | 309C | BC9A | 006F | 6A00 | 6A00 | 6A00 | 6A00 |
| 0000237720 | 1E04 | 1068 | 6A36 | 9A1B | DFDD | 8191 | C483 | 890E |
| 0000237740 | E446 | 7E83 | 00E4 | 0375 | D8E9 | 8E00 | AE06 | 2631 |
| 0000237760 | 3E83 | 7FDD | 7500 | E903 | 004C | 7E83 | FEC2 | 0375 |
| 0000240000 | 43E9 | FF00 | E476 | 36FF | 0EBA | 36FF | 0EB8 | 468D |
| 0000240020 | 16D4 | 8D50 | F246 | 5016 | 468D | 16BE | 1E50 | 5468 |
| 0000240040 | 6818 | 071F | 36FF | 0EA2 | 36FF | 0EA0 | 36FF | 0EA6 |
| 0000240060 | 36FF | 0EA4 | 681E | 1750 | E968 | 6881 | 81EC | EF9A |
| 0000240100 | 0081 | 8300 | 28C4 | 068E | 31AE | 8326 | 913E | 0080 |
| 0000240120 | 0375 | 09E9 | 8300 | C27E | 74FE | E903 | 000F | 068E |
| 0000240140 | 31B0 | 8326 | A93E | 0080 | 0375 | 50E9 | C700 | C446 |
| 0000240160 | FFEF | 76FF | FFC8 | C676 | 468D | 16C4 | FF50 | E276 |
| 0000240200 | 76FF | FFFC | FA76 | 4E8D | 16D4 | 8D51 | F24E | 5116 |
| 0000240220 | 4E8D | 16BE | 1E51 | 5468 | 6818 | 0720 | 36FF | 0EA2 |
| 0000240240 | 36FF | 0EA0 | 36FF | 0EA6 | 36FF | 0EA4 | F19A | 0080 |
| 0000240260 | 8300 | 28C4 | 468B | E9C4 | 0A84 | 06E9 | B800 | FFEF |
| 0000240300 | 7BE9 | A10A | 3610 | 168B | 3612 | E0D1 | D2D1 | 4689 |

THU MAR 14 17:25:16 1991 CRV_IPS.DLL PAGE 88, LINE 5134

| | | | | | | | | |
|---|---|---|---|---|---|---|---|---|
| 0000240320 | 89EE | F056 | 4F68 | 687F | 309C | 76FF | FFF0 | EE76 |
| 0000240340 | D89A | 0070 | 8900 | E446 | 7E83 | 00E4 | 0375 | 06E9 |
| 0000240360 | 8301 | E47E | 7479 | E903 | 0080 | 068E | 31AE | 8326 |
| 0000240400 | 113E | 0081 | 0375 | 09E9 | 8300 | C27E | 74FE | E903 |
| 0000240420 | 000F | 068E | 31B0 | 8326 | 293E | 0081 | 0375 | 50E9 |
| 0000240440 | C700 | C446 | FFEF | 76FF | FFC8 | C676 | 468D | 16C4 |
| 0000240460 | FF50 | E276 | 76FF | FFFC | FA76 | 4E8D | 16D4 | 8D51 |
| 0000240500 | F24E | 5116 | 4E8D | 16BE | 1E51 | 5468 | 6818 | 0727 |
| 0000240520 | 36FF | 0EA2 | 36FF | 0EA0 | 36FF | 0EA6 | 36FF | 0EA4 |
| 0000240540 | 719A | 0081 | 8300 | 28C4 | 468B | E9C4 | 09D0 | 06E9 |
| 0000240560 | B800 | FFEF | C7E9 | E909 | 007D | 068E | 31AE | 8326 |
| 0000240600 | A93E | 0081 | 0375 | 09E9 | 8300 | C27E | 74FE | E903 |
| 0000240620 | 000F | 068E | 31B0 | 8326 | 153E | 0082 | 0375 | 50E9 |
| 0000240640 | C700 | C446 | FFFF | 76FF | FFC8 | C676 | 468D | 16C4 |
| 0000240660 | FF50 | E276 | 76FF | FFFC | FA76 | 4E8D | 16D4 | 8D51 |
| 0000240700 | F24E | 5116 | 4E8D | 16BE | 1E51 | 5468 | 6818 | 0729 |
| 0000240720 | 36FF | 0EA2 | 36FF | 0EA0 | 36FF | 0EA6 | 36FF | 0EA4 |
| 0000240740 | 5D9A | 0082 | 8300 | 28C4 | 468B | E9C4 | 0950 | 06E9 |
| 0000240760 | B800 | FFFF | 47E9 | 6A09 | 8D0A | CA46 | 5016 | E89A |
| 0000241000 | 4CE1 | 837C | 06C4 | 4689 | 83E4 | E47E | 7401 | E903 |
| 0000241020 | 00D4 | 068E | 31AE | 8326 | FD3E | 0081 | 0375 | 45E9 |
| 0000241040 | 8300 | C27E | 75FE | E903 | 003C | 681E | 1758 | 468D |
| 0000241060 | 16D4 | 8D50 | F246 | 5016 | 468D | 16BE | 1E50 | 5468 |
| 0000241100 | 6818 | 072E | 36FF | 0EA2 | 36FF | 0EA0 | 36FF | 0EA6 |
| 0000241120 | 36FF | 0EA4 | 681E | 1769 | C668 | 6882 | 82C9 | CC9A |
| 0000241140 | 0082 | 8300 | 26C4 | 068E | 31AE | 8326 | 863E | 0082 |
| 0000241160 | 0375 | 09E9 | 8300 | C27E | 74FE | E903 | 000F | 068E |
| 0000241200 | 31B0 | 8326 | D53E | 007E | 0375 | 50E9 | C700 | C446 |
| 0000241220 | 0000 | 76FF | FFC8 | C676 | 468D | 16C4 | FF50 | E276 |
| 0000241240 | 76FF | FFFC | FA76 | 4E8D | 16D4 | 8D51 | F24E | 5116 |
| 0000241260 | 4E8D | 16BE | 1E51 | 5468 | 6818 | 072F | 36FF | 0EA2 |
| 0000241300 | 36FF | 0EA0 | 36FF | 0EA6 | 36FF | 0EA4 | 1E9A | 007F |
| 0000241320 | 8300 | 28C4 | 468B | E9C4 | 0864 | 06E9 | B800 | 0000 |
| 0000241340 | 5BE9 | E908 | 07DB | 7E83 | 03E4 | 0374 | 01E9 | 8E07 |
| 0000241360 | AE06 | 2631 | 3E83 | 82F2 | 7500 | E903 | 0045 | 7E83 |
| 0000241400 | FEC2 | 0375 | 3CE9 | 1E00 | 7168 | 8D17 | D446 | 5016 |
| 0000241420 | 468D | 16F2 | 8D50 | BE46 | 5016 | 681E | 1854 | 3368 |
| 0000241440 | FF07 | A236 | FF0E | A036 | FF0E | A636 | FF0E | A436 |
| 0000241460 | 1E0E | 8068 | 6817 | 7EA9 | AC68 | 9A7E | 7EAF | 0000 |
| 0000241500 | C483 | 8326 | CA7E | 7433 | E903 | 0003 | 60E9 | 8300 |
| 0000241520 | CA7E | 7434 | E903 | 0003 | 54E9 | 8E00 | AE06 | 2631 |
| 0000241540 | 3E83 | 7EBD | 7500 | E903 | 0045 | 7E83 | FEC2 | 0375 |
| 0000241560 | 3CE9 | 1E00 | 8868 | 8D17 | D446 | 5016 | 468D | 16F2 |
| 0000241600 | 8D50 | BE46 | 5016 | 681E | 1854 | 3D68 | FF07 | A236 |
| 0000241620 | FF0E | A036 | FF0E | A636 | FF0E | A436 | 1E0E | AB68 |
| 0000241640 | 6817 | 838F | 9268 | 9A83 | 8395 | 0000 | C483 | 8326 |
| 0000241660 | CC7E | 7435 | E903 | 0487 | 068E | 31AE | 8326 | F93E |
| 0000241700 | 0083 | 0375 | 45E9 | 8300 | C27E | 75FE | E903 | 003C |
| 0000241720 | 681E | 17B3 | 468D | 16D4 | 8D50 | F246 | 5016 | 468D |
| 0000241740 | 16BE | 1E50 | 5468 | 6818 | 0740 | 36FF | 0EA2 | 36FF |
| 0000241760 | 0EA0 | 36FF | 0EA6 | 36FF | 0EA4 | 681E | 17BF | 3C68 |
| 0000242000 | 6884 | 843F | 429A | 0084 | 8300 | 26C4 | 068E | 31B2 |
| 0000242020 | A126 | 0F22 | 0B26 | 2006 | 740F | E903 | 000F | 468B |
| 0000242040 | 8BEA | EC56 | 4689 | 89F6 | F856 | 13E9 | 8E00 | B206 |
| 0000242060 | 2631 | 20A1 | 260F | 168B | 0F22 | 4689 | 89F6 | FB56 |
| 0000242100 | 76FF | FFF8 | F676 | 266A | 006A | 006A | 468D | 16E6 |
| 0000242120 | 9A50 | 7449 | 0000 | 4689 | 83E0 | E07E | 7500 | E903 |
| 0000242140 | 00D5 | 068E | 31AE | 8326 | 503E | 0084 | 0375 | 48E9 |
| 0000242160 | 8300 | C27E | 75FE | E903 | 003F | 76FF | 1EE0 | C768 |

THU MAR 14 17:25:16 1991 CRV_IPS.DLL PAGE 89, LINE 5193

| | | | | | | | | |
|---|---|---|---|---|---|---|---|---|
| 0000242200 | 8D17 | D446 | 5016 | 468D | 16F2 | 8D50 | BE46 | 5016 |
| 0000242220 | 681E | 1854 | 4C68 | FF07 | A236 | FF0E | A036 | FF0E |
| 0000242240 | A636 | FF0E | A436 | 1E0E | DB68 | 6817 | 863D | 4068 |
| 0000242260 | 9A86 | 8643 | 0000 | C483 | 8E28 | AE06 | 2631 | 3E83 |
| 0000242300 | 85F6 | 7500 | E903 | 0009 | 7E83 | FEC2 | 0374 | 0FE9 |
| 0000242320 | 8E00 | B006 | 2631 | 3E83 | 8669 | 7500 | E903 | 0051 |
| 0000242340 | 468B | 89E0 | C446 | 76FF | FFC8 | C676 | 468D | 16C4 |
| 0000242360 | FF50 | E276 | 76FF | FFFC | FA76 | 4E8D | 16D4 | 8D51 |
| 0000242400 | F24E | 5116 | 4E8D | 16BE | 1E51 | 5468 | 6818 | 074D |
| 0000242420 | 36FF | 0EA2 | 36FF | 0EA0 | 36FF | 0EA6 | 36FF | 0EA4 |
| 0000242440 | B19A | 0086 | 8300 | 28C4 | 468B | E9C4 | 0610 | 06E9 |
| 0000242460 | 8B00 | E046 | 67E9 | 8E06 | B206 | 2631 | 24A1 | 260F |
| 0000242500 | 168B | 0F26 | 3926 | 1C06 | 740F | E903 | 001B | 3926 |
| 0000242520 | 1E16 | 740F | E903 | 0011 | 1EC4 | 0EAC | C02B | 8926 |
| 0000242540 | 4647 | 8926 | 4447 | 18E9 | 8E00 | B206 | 2631 | 1CA1 |
| 0000242560 | 260F | 168B | 0F1E | 5EC4 | 26E6 | 4789 | 2644 | 5789 |
| 0000242600 | C446 | E65E | C02B | 8926 | 5647 | 8926 | 5447 | 5EC4 |
| 0000242620 | 2BE6 | 26C0 | 4789 | 2602 | 0789 | 5EC4 | 26E6 | 47C7 |
| 0000242640 | 7A48 | 8E00 | B406 | 2631 | 3CA1 | C40F | E65E | 8926 |
| 0000242660 | 5847 | 068E | 31B4 | A126 | 0F3E | 5EC4 | 26E6 | 4789 |
| 0000242700 | C45A | E65E | C726 | 5C47 | 01F4 | 068E | 31B4 | A126 |
| 0000242720 | 0F44 | 5EC4 | 26E6 | 4789 | 8E5E | B406 | 2631 | 46A1 |
| 0000242740 | C40F | E65E | 8926 | 6047 | 068E | 31B2 | A126 | 0F2C |
| 0000242760 | 5EC4 | 26E6 | 4789 | 8E62 | B206 | 2631 | 2EA1 | C40F |
| 0000243000 | E65E | 8926 | 6447 | 468B | 8B06 | 0856 | 2405 | 5200 |
| 0000243020 | 8B50 | E646 | 568B | 05E8 | 0004 | 5052 | D29A | CA91 |
| 0000243040 | 8385 | 08C4 | 76FF | FFD2 | D076 | 266A | 5EC4 | 26E6 |
| 0000243060 | 77FF | 266A | 77FF | 9A68 | CF95 | 7F6A | C483 | 890A |
| 0000243100 | E446 | 7E83 | 00E4 | 0375 | ECE9 | FF00 | F876 | 76FF |
| 0000243120 | FFF6 | E876 | 76FF | 9AE6 | 764F | 0000 | 4689 | 8EE0 |
| 0000243140 | AE06 | 2631 | 3E83 | 8651 | 7500 | E903 | 004C | 7E83 |
| 0000243160 | FEC2 | 0375 | 43E9 | FF00 | E476 | 36FF | 0EBE | 36FF |
| 0000243200 | 0EBC | 468D | 16D4 | 8D50 | F246 | 5016 | 468D | 16BE |
| 0000243220 | 1E50 | 5468 | 6818 | 0767 | 36FF | 0EA2 | 36FF | 0EA0 |
| 0000243240 | 36FF | 0EA6 | 36FF | 0EA4 | 681E | 17E3 | C968 | 687F |
| 0000243260 | 7FCC | CF9A | 007F | 8300 | 28C4 | 068E | 31AE | 8326 |
| 0000243300 | 823E | 007F | 0375 | 09E9 | 8300 | C27E | 74FE | E903 |
| 0000243320 | 000F | 068E | 31B0 | 8326 | F53E | 007F | 0375 | 50E9 |
| 0000243340 | C700 | C446 | FFEF | 76FF | FFC8 | C676 | 468D | 16C4 |
| 0000243360 | FF50 | E276 | 76FF | FFFC | FA76 | 4E8D | 16D4 | 8D51 |
| 0000243400 | F24E | 5116 | 4E8D | 16BE | 1E51 | 5468 | 6818 | 0768 |
| 0000243420 | 36FF | 0EA2 | 36FF | 0EA0 | 36FF | 0EA6 | 36FF | 0EA4 |
| 0000243440 | 3D9A | 0080 | 8300 | 28C4 | 468B | E9C4 | 0410 | 06E9 |
| 0000243460 | B800 | FFEF | 07E9 | 2B04 | 89C0 | BC46 | 4689 | FFBA |
| 0000243500 | F876 | 76FF | FFF6 | E876 | 76FF | 6AE6 | 6A01 | 6A01 |
| 0000243520 | 8D00 | BA46 | 5016 | 4E9A | 0077 | 8900 | E046 | 7E83 |
| 0000243540 | 00E0 | 0375 | D5E9 | 8E00 | AE06 | 2631 | 3E83 | 8755 |
| 0000243560 | 7500 | E903 | 0048 | 7E83 | FEC2 | 0375 | 3FE9 | FF00 |
| 0000243600 | E076 | 681E | 17EB | 468D | 16D4 | 8D50 | F246 | 5016 |
| 0000243620 | 468D | 16BE | 1E50 | 5468 | 6818 | 076F | 36FF | 0EA2 |
| 0000243640 | 36FF | 0EA0 | 36FF | 0EA6 | 36FF | 0EA4 | 681E | 17FD |
| 0000243660 | 1F68 | 6888 | 8822 | 259A | 0088 | 8300 | 28C4 | 068E |
| 0000243700 | 31AE | 8326 | DF3E | 0087 | 0375 | 09E9 | 8300 | C27E |
| 0000243720 | 74FE | E903 | 000F | 068E | 31B0 | 8326 | 4B3E | 0088 |
| 0000243740 | 0375 | 51E9 | 8B00 | E046 | 4689 | FFC4 | C876 | 76FF |
| 0000243760 | 8DC6 | C446 | 5016 | 76FF | FFE2 | FC76 | 76FF | 8DFA |
| 0000244000 | D44E | 5116 | 4E8D | 16F2 | 8D51 | BE4E | 5116 | 681E |
| 0000244020 | 1854 | 7068 | FF07 | A236 | FF0E | A036 | FF0E | A636 |
| 0000244040 | FF0E | A436 | 9A0E | 8893 | 0000 | C483 | 8B28 | C446 |

THU MAR 14 17:25:16 1991 CRV_IPS.DLL PAGE 90, LINE 5252

| | | | | | | | | |
|---|---|---|---|---|---|---|---|---|
| 0000244060 | 0BE9 | E903 | 0006 | 468B | E9E0 | 0302 | AEE9 | 8301 |
| 0000244100 | CC7E | 7436 | E903 | 00D4 | 068E | 31AE | 8326 | 333E |
| 0000244120 | 0088 | 0375 | 45E9 | 8300 | C27E | 75FE | E903 | 003C |
| 0000244140 | 681E | 1805 | 468D | 16D4 | 8D50 | F246 | 5016 | 468D |
| 0000244160 | 16BE | 1E50 | 5468 | 6818 | 0775 | 36FF | 0EA2 | 36FF |
| 0000244200 | 0EA0 | 36FF | 0EA6 | 36FF | 0EA4 | 681E | 1813 | F368 |
| 0000244220 | 6888 | 88F6 | F99A | 0088 | 8300 | 26C4 | 068E | 31AE |
| 0000244240 | 8326 | B33E | 0088 | 0375 | 09E9 | 8300 | C27E | 74FE |
| 0000244260 | E903 | 000F | 068E | 31B0 | 8326 | 1F3E | 0089 | 0375 |
| 0000244300 | 50E9 | C700 | C446 | FFF0 | 76FF | FFC8 | C676 | 468D |
| 0000244320 | 16C4 | FF50 | E276 | 76FF | FFFC | FA76 | 4E8D | 16D4 |
| 0000244340 | 8D51 | F24E | 5116 | 4E8D | 16BE | 1E51 | 5468 | 6818 |
| 0000244360 | 0776 | 36FF | 0EA2 | 36FF | 0EA0 | 36FF | 0EA6 | 36FF |
| 0000244400 | 0EA4 | 679A | 0089 | 8300 | 28C4 | 468B | E9C4 | 022E |
| 0000244420 | 06E9 | B800 | FFF0 | 25E9 | E902 | 00D1 | 068E | 31AE |
| 0000244440 | 8326 | 073E | 0089 | 0375 | 45E9 | 8300 | C27E | 75FE |
| 0000244460 | E903 | 003C | 681E | 181B | 468D | 16D4 | 8D50 | F246 |
| 0000244500 | 5016 | 468D | 16BE | 1E50 | 5468 | 6818 | 077A | 36FF |
| 0000244520 | 0EA2 | 36FF | 0EA0 | 36FF | 0EA6 | 36FF | 0EA4 | 681E |
| 0000244540 | 1837 | C768 | 6889 | 89CA | CD9A | 0089 | 8300 | 26C4 |
| 0000244560 | 068E | 31AE | 8326 | 873E | 0089 | 0375 | 09E9 | 8300 |
| 0000244600 | C27E | 74FE | E903 | 000F | 068E | 31B0 | 8326 | F33E |
| 0000244620 | 0089 | 0375 | 50E9 | C700 | C446 | FFFF | 76FF | FFC8 |
| 0000244640 | C676 | 468D | 16C4 | FF50 | E276 | 76FF | FFFC | FA76 |
| 0000244660 | 4E8D | 16D4 | 8D51 | F24E | 5116 | 4E8D | 16BE | 1E51 |
| 0000244700 | 5468 | 6818 | 077B | 36FF | 0EA2 | 36FF | 0EA0 | 36FF |
| 0000244720 | 0EA6 | 36FF | 0EA4 | 3B9A | 008A | 8300 | 28C4 | 468B |
| 0000244740 | E9C4 | 015A | 06E9 | B800 | FFFF | 51E9 | E901 | 00D1 |
| 0000244760 | 068E | 31AE | 8326 | DB3E | 0089 | 0375 | 45E9 | 8300 |
| 0000245000 | C27E | 75FE | E903 | 003C | 681E | 183F | 468D | 16D4 |
| 0000245020 | 8D50 | F246 | 5016 | 468D | 16BE | 1E50 | 5468 | 6818 |
| 0000245040 | 0780 | 36FF | 0EA2 | 36FF | 0EA0 | 36FF | 0EA6 | 36FF |
| 0000245060 | 0EA4 | 681E | 184C | 3268 | 6883 | 8335 | 389A | 0083 |
| 0000245100 | 8300 | 26C4 | 068E | 31AE | 8326 | 583E | 008A | 0375 |
| 0000245120 | 09E9 | 8300 | C27E | 74FE | E903 | 000F | 068E | 31B0 |
| 0000245140 | 8326 | 703E | 008A | 0375 | 50E9 | C700 | C446 | FFEF |
| 0000245160 | 76FF | FFC8 | C676 | 468D | 16C4 | FF50 | E276 | 76FF |
| 0000245200 | FFFC | FA76 | 4E8D | 16D4 | 8D51 | F24E | 5116 | 4E8D |
| 0000245220 | 16BE | 1E51 | 5468 | 6818 | 0781 | 36FF | 0EA2 | 36FF |
| 0000245240 | 0EA0 | 36FF | 0EA6 | 36FF | 0EA4 | B19A | 0084 | 8300 |
| 0000245260 | 28C4 | 468B | E9C4 | 0086 | 06E9 | B800 | FFEF | 7DE9 |
| 0000245300 | 8E00 | AE06 | 2631 | 3E83 | 834F | 7500 | E903 | 0009 |
| 0000245320 | 7E83 | FEC2 | 0374 | 0FE9 | 8E00 | B006 | 2631 | 3E83 |
| 0000245340 | 8468 | 7500 | E903 | 0050 | 46C7 | 00C4 | FF00 | C876 |
| 0000245360 | 76FF | 8DC6 | C446 | 5016 | 76FF | FFE2 | FC76 | 76FF |
| 0000245400 | BDFA | D44E | 5116 | 4E8D | 16F2 | 8D51 | BE4E | 5116 |
| 0000245420 | 681E | 1854 | 8368 | FF07 | A236 | FF0E | A036 | FF0E |
| 0000245440 | A636 | FF0E | A436 | 9A0E | 87B6 | 0000 | C483 | 8B28 |
| 0000245460 | C446 | 09E9 | E900 | 0006 | 00B8 | E900 | 0000 | 5F5E |
| 0000245500 | ED83 | 8B02 | 1FE5 | 4D5D | 1ECB | 9058 | 5545 | EC8B |
| 0000245520 | 8E1E | 81D8 | 16EC | 570D | 1E56 | 65B8 | 8E8D | C7D8 |
| 0000245540 | F646 | 0005 | 46C7 | 00F8 | 1E00 | 6C68 | 9A18 | 942C |
| 0000245560 | 8B13 | C483 | 0B04 | 75D0 | E903 | 0019 | 681E | 1876 |
| 0000245600 | 2C9A | 1D94 | 838B | 04C4 | 5052 | BD9A | 2C92 | 838B |
| 0000245620 | D4C4 | 4689 | 1EF6 | 8068 | 9A18 | 942C | 8B5B | C483 |
| 0000245640 | 0B04 | 75D0 | E903 | 0005 | 46C7 | 01F8 | 6800 | 8B73 |
| 0000245660 | 9C68 | 9A30 | 8B8C | 0000 | 046A | 468D | 16FA | 6A50 |
| 0000245700 | 8D04 | F646 | 5016 | 1F6A | DD9A | A3DF | 838B | 0EC4 |
| 0000245720 | 4689 | 83EC | EC7E | 7500 | E903 | 0006 | 468B | E9EC |

THU MAR 14 17:25:16 1991 CRV_IPS.DLL PAGE 91, LINE 5311

| | | | | | | | | |
|---|---|---|---|---|---|---|---|---|
| 0000245740 | 009E | 8668 | 688B | 309C | 006A | 8868 | 9A13 | 8071 |
| 0000245760 | 0000 | 4689 | 68EC | 8AEB | 9C68 | 9A30 | 7F55 | 0000 |
| 0000246000 | 7E83 | 79EC | 0375 | 6EE9 | 6A0D | 8D08 | EE46 | 5016 |
| 0000246020 | E89A | BBE1 | 838B | 06C4 | 76FF | FFF4 | F276 | 76FF |
| 0000246040 | FFF0 | EE76 | 681E | 188F | 829A | D075 | 838B | 0CC4 |
| 0000246060 | 7E83 | 00F8 | 0375 | 3EE9 | 1E00 | B068 | 9A18 | 7582 |
| 0000246100 | 8BD8 | C483 | 9A04 | 94D2 | 8BE8 | 003D | 7400 | E903 |
| 0000246120 | 0003 | F0E9 | 9AFF | 951F | 8BFF | 46C7 | 00EA | FF00 |
| 0000246140 | FC76 | 76FF | 6AFA | 8D02 | EA46 | 5016 | 299A | AFCF |
| 0000246160 | 8385 | 0AC4 | 4689 | E9EC | FF68 | 00B8 | E900 | 0000 |
| 0000246200 | 5E1F | 835F | 02ED | E58B | 5D1F | CB4D | 581E | 4590 |
| 0000246220 | 8B55 | 1EEC | D88E | EC81 | 002C | 5657 | B81E | 8B3E |
| 0000246240 | D88E | 46C7 | DAFA | 8C18 | FC5E | 46C7 | 01F4 | 2B01 |
| 0000246260 | 89C0 | E646 | 4689 | 8EE4 | B606 | 2631 | 3E83 | 86FE |
| 0000246300 | 7500 | E903 | 001D | 36FF | 18EE | 36FF | 18EC | 468D |
| 0000246320 | 16DC | 9A50 | 7B05 | 0000 | C483 | 3D08 | 0000 | 0374 |
| 0000246340 | 0FE9 | 8E00 | B806 | 2631 | 3E83 | 876D | 7500 | E903 |
| 0000246360 | 003B | 681E | 18E1 | 468D | 16E8 | 8D50 | DC46 | 5016 |
| 0000246400 | 468D | 16F6 | 6850 | 008B | 681E | 18F0 | 36FF | 18EA |
| 0000246420 | 36FF | 18E8 | 36FF | 18EE | 36FF | 18EC | 4E9A | 007B |
| 0000246440 | 8300 | 1EC4 | 4689 | 89F6 | F856 | 08E9 | 2B00 | 89C0 |
| 0000246460 | F846 | 4689 | 8EF6 | BA06 | 2631 | 3CA1 | C40F | 065E |
| 0000246500 | 8926 | 2447 | 068E | 31BA | A126 | 0F3E | 5EC4 | 2606 |
| 0000246520 | 4789 | 8E26 | BA06 | 2631 | 44A1 | C40F | 065E | 8926 |
| 0000246540 | 2847 | 068E | 31BA | A126 | 0F46 | 5EC4 | 2606 | 4789 |
| 0000246560 | 8B2A | 0646 | 568B | 0508 | 0024 | 8D1E | D47E | F08B |
| 0000246600 | 0716 | DA8E | A5A5 | A5A5 | 8E1F | BC06 | 2631 | 3E83 |
| 0000246620 | 0F06 | 7400 | E903 | 0095 | 068E | 31B6 | 8326 | D33E |
| 0000246640 | 008D | 0375 | 09E9 | 8300 | E07E | 74FE | E903 | 000F |
| 0000246660 | 068E | 31B8 | 8326 | EB3E | 008D | 0375 | 5BE9 | 8D00 |
| 0000246700 | D446 | 5016 | 039A | B2DA | 838D | 04C4 | 4689 | FFE2 |
| 0000246720 | E676 | 76FF | 8DE4 | E246 | 5016 | 76FF | FFF4 | FC76 |
| 0000246740 | 76FF | 8DFA | E84E | 5116 | 4E8D | 16F6 | 8D51 | DC4E |
| 0000246760 | 5116 | 681E | 18F0 | 9768 | FF00 | EA36 | FF18 | E836 |
| 0000247000 | FF18 | EE36 | FF18 | EC36 | 9A18 | 8E3E | 0000 | C483 |
| 0000247020 | 8B28 | E246 | 37E9 | E901 | 0010 | 468D | 16D4 | 9A50 |
| 0000247040 | DA03 | 6AAB | C483 | E904 | 0124 | 21E9 | 8E01 | BC06 |
| 0000247060 | 2631 | 3E83 | 0F06 | 7401 | E903 | 0095 | 068E | 31B6 |
| 0000247100 | 8326 | 683E | 008E | 0375 | 09E9 | 8300 | E07E | 74FE |
| 0000247120 | E903 | 000F | 068E | 31B8 | 8326 | 803E | 008E | 0375 |
| 0000247140 | 5BE9 | 8D00 | D446 | 5016 | 4F9A | 5666 | 838E | 04C4 |
| 0000247160 | 4689 | FFE2 | E676 | 76FF | 8DE4 | E246 | 5016 | 76FF |
| 0000247200 | FFF4 | FC76 | 76FF | 8DFA | E84E | 5116 | 4E8D | 16F6 |
| 0000247220 | 8D51 | DC4E | 5116 | 681E | 18F0 | 9A68 | FF00 | EA36 |
| 0000247240 | FF18 | E836 | FF18 | EE36 | FF18 | EC36 | 9A18 | 8EC8 |
| 0000247260 | 0000 | C483 | 8B28 | E246 | 93E9 | E900 | 0010 | 468D |
| 0000247300 | 16D4 | 9A50 | 664F | 8B00 | C483 | E904 | 0080 | 7DE9 |
| 0000247320 | 8E00 | B606 | 2631 | 3E83 | 8C4E | 7500 | E903 | 0009 |
| 0000247340 | 7E83 | FEE0 | 0374 | 0FE9 | 8E00 | B806 | 2631 | 3E83 |
| 0000247360 | 8C7A | 7500 | E903 | 0050 | 46C7 | 00E2 | FF00 | E676 |
| 0000247400 | 76FF | 8DE4 | E246 | 5016 | 76FF | FFF4 | FC76 | 76FF |
| 0000247420 | 8DFA | E84E | 5116 | 4E8D | 16F6 | 8D51 | DC4E | 5116 |
| 0000247440 | 681E | 18F0 | 9C68 | FF00 | EA36 | FF18 | E836 | FF18 |
| 0000247460 | EE36 | FF18 | EC36 | 9A18 | 8AB8 | 0000 | C483 | 8B28 |
| 0000247500 | E246 | 09E9 | E900 | 0006 | 00B8 | E900 | 0000 | 5E1F |
| 0000247520 | 835F | 02ED | E58B | 5D1F | CA4D | 0004 | 581E | 4590 |
| 0000247540 | 8B55 | 1EEC | D88E | EC81 | 0330 | 5657 | B81E | 8C2E |
| 0000247560 | D88E | 86C7 | FEF8 | 1909 | 9E8C | FEFA | 86C7 | FCE8 |
| 0000247600 | 0101 | C02B | 8689 | FCDA | 8689 | FCD8 | 068E | 31B6 |

THU MAR 14 17:25:16 1991 CRV_IPS.DLL PAGE 92, LINE 5370

| | | | | | | | | |
|---|---|---|---|---|---|---|---|---|
| 0000247620 | 8326 | E23E | 008F | 0375 | 1EE9 | FF00 | EE36 | FF18 |
| 0000247640 | EC36 | 8D18 | D086 | 16FC | 9A50 | 8C64 | 0000 | C483 |
| 0000247660 | 3D08 | 0000 | 0374 | 0FE9 | 8E00 | B806 | 2631 | 3E83 |
| 0000247700 | 905D | 7500 | E903 | 0040 | 681E | 1910 | 868D | FCDC |
| 0000247720 | 5016 | 868D | FCD0 | 5016 | 868D | FEF2 | 5016 | B068 |
| 0000247740 | 1E00 | 6668 | FF19 | EA36 | FF18 | E836 | FF18 | EE36 |
| 0000247760 | FF18 | EC36 | 9A18 | 8CAD | 0000 | C483 | 891E | F286 |
| 0000250000 | 89FE | F496 | E9FE | 000A | C02B | 8689 | FEF4 | 8689 |
| 0000250020 | FEF2 | C02B | 8689 | FDF0 | 8689 | FDEE | 006A | 006A |
| 0000250040 | 868D | FDEE | 5016 | 006A | 868D | FDF2 | 5016 | 868D |
| 0000250060 | FEFC | 5016 | FF9A | 00FF | 8900 | F686 | 3DFE | 0001 |
| 0000250100 | C01B | 3D40 | 0000 | 0375 | EBE9 | 8E00 | B606 | 2631 |
| 0000250120 | 3E83 | 9044 | 7500 | E903 | 0053 | BE83 | FCD4 | 75FE |
| 0000250140 | E903 | 0049 | B6FF | FEFC | 868D | FDF2 | 5016 | 681E |
| 0000250160 | 1917 | 868D | FCDC | 5016 | 868D | FEF2 | 5016 | 868D |
| 0000250200 | FCD0 | 5016 | 681E | 1966 | BD68 | FF00 | EA36 | FF18 |
| 0000250220 | E836 | FF18 | EE36 | FF18 | EC36 | 1E18 | 3168 | 6819 |
| 0000250240 | 8741 | 4468 | 9A87 | 8747 | 0000 | C483 | 8E2C | B606 |
| 0000250260 | 2631 | 3E83 | 9108 | 7500 | E903 | 000A | BE83 | FCD4 |
| 0000250300 | 74FE | E903 | 000F | 068E | 31B8 | 8326 | 213E | 0091 |
| 0000250320 | 0375 | 5BE9 | C700 | D686 | FFFC | FFFF | DAB6 | FFFC |
| 0000250340 | D8B6 | 8DFC | D686 | 16FC | FF50 | E8B6 | FFFC | FAB6 |
| 0000250360 | FFFE | F8B6 | 8DFE | DC8E | 16FC | 8D51 | F28E | 16FE |
| 0000250400 | 8D51 | D08E | 16FC | 1E51 | 6668 | 6819 | 00BE | 36FF |
| 0000250420 | 18EA | 36FF | 18E8 | 36FF | 18EE | 36FF | 18EC | 739A |
| 0000250440 | 0091 | 8300 | 28C4 | 868B | FCD6 | F9E9 | E902 | 0006 |
| 0000250460 | FFB8 | E9FF | 02F0 | 86C6 | FCEE | FF00 | F0B6 | FFFD |
| 0000250500 | EEB6 | 6AFD | 1E04 | 3968 | 8D19 | EA86 | 16FC | 9A50 |
| 0000250520 | FFFF | 0000 | 8689 | FEF6 | B6FF | FDF0 | B6FF | FDEE |
| 0000250540 | 006A | FF9A | 00FF | 8300 | F6BE | 00FE | 0375 | 89E9 |
| 0000250560 | 8E00 | B606 | 2631 | 3E83 | 91DF | 7500 | E903 | 000A |
| 0000250600 | BE83 | FCD4 | 74FE | E903 | 000F | 068E | 31B8 | 8326 |
| 0000250620 | F83E | 0091 | 0375 | 5BE9 | C700 | D686 | FFFC | FFFF |
| 0000250640 | DAB6 | FFFC | D8B6 | 8DFC | D686 | 16FC | FF50 | E8B6 |
| 0000250660 | FFFC | FAB6 | FFFE | F8B6 | 8DFE | DC8E | 16FC | 8D51 |
| 0000250700 | F28E | 16FE | 8D51 | D08E | 16FC | 1E51 | 6668 | 6819 |
| 0000250720 | 00C8 | 36FF | 18EA | 36FF | 18E8 | 36FF | 18EE | 36FF |
| 0000250740 | 18EC | 569A | 0092 | 8300 | 28C4 | 868B | FCD6 | 35E9 |
| 0000250760 | E902 | 0006 | FFB8 | E9FF | 022C | B6FF | FCEC | B6FF |
| 0000251000 | FCEA | 868D | FEFE | 5016 | D29A | C491 | 8391 | 08C4 |
| 0000251020 | B6FF | FCEC | B6FF | FCEA | FF9A | 00FF | 2B00 | 89C0 |
| 0000251040 | EC86 | 89FC | EA86 | 8DFC | FE86 | 16FE | 1E50 | 4D68 |
| 0000251060 | 9A19 | 7582 | 8DFB | C483 | 8E08 | BC06 | 2631 | 3E83 |
| 0000251100 | 0F06 | 7400 | E903 | 00A3 | 068E | 31B6 | 8326 | 913E |
| 0000251120 | 0092 | 0375 | 0AE9 | 8300 | D4BE | FEFC | 0374 | 0FE9 |
| 0000251140 | 8E00 | B806 | 2631 | 3E83 | 92AA | 7500 | E903 | 0067 |
| 0000251160 | 868D | FEFE | 5016 | 8B9A | 70DF | 8392 | 04C4 | 8689 |
| 0000251200 | FCD6 | B6FF | FCDA | B6FF | FCD8 | 868D | FCD6 | 5016 |
| 0000251220 | B6FF | FCE8 | B6FF | FEFA | B6FF | FEF8 | 8E8D | FCDC |
| 0000251240 | 5116 | 8E8D | FEF2 | 5116 | 8E8D | FCD0 | 5116 | 681E |
| 0000251260 | 1966 | D468 | FF00 | EA36 | FF18 | E836 | FF18 | EE36 |
| 0000251300 | FF18 | EC36 | 9A18 | 8D9A | 0000 | C483 | 8B28 | D686 |
| 0000251320 | E9FC | 0152 | 11E9 | 8D00 | FE86 | 16FE | 9A50 | DF8B |
| 0000251340 | 8D57 | C483 | E904 | 013E | 3BE9 | 8E01 | BC06 | 2631 |
| 0000251360 | 3E83 | 0F06 | 7401 | E903 | 00A3 | 068E | 31B6 | 8326 |
| 0000251400 | 2F3E | 008D | 0375 | 0AE9 | 8300 | D4BE | FEFC | 0374 |
| 0000251420 | 0FE9 | 8E00 | B806 | 2631 | 3E83 | 8D47 | 7500 | E903 |
| 0000251440 | 0067 | 868D | FEFE | 5016 | 189A | 226B | 8393 | 04C4 |
| 0000251460 | 8689 | FCD6 | B6FF | FCDA | B6FF | FCD8 | 868D | FCD6 |

THU MAR 14 17:25:16 1991 CRV_IPS.DLL PAGE 93, LINE 5429

| | | | | | | | | |
|---|---|---|---|---|---|---|---|---|
| 0000251500 | 5016 | B6FF | FCE8 | B6FF | FEFA | B6FF | FEF8 | 8E8D |
| 0000251520 | FCDC | 5116 | 8E8D | FEF2 | 5116 | 8E8D | FCD0 | 5116 |
| 0000251540 | 681E | 1966 | D768 | FF00 | EA36 | FF18 | E836 | FF18 |
| 0000251560 | EE36 | FF18 | EC36 | 9A18 | 939F | 0000 | C483 | 8B28 |
| 0000251600 | D686 | E9FC | 00A0 | 11E9 | 8D00 | FE86 | 16FE | 9A50 |
| 0000251620 | 6B18 | 919B | C483 | E904 | 008C | 89E9 | 8E00 | B606 |
| 0000251640 | 2631 | 3E83 | 8F23 | 7500 | E903 | 000A | BE83 | FCD4 |
| 0000251660 | 74FE | E903 | 000F | 068E | 31B8 | 8326 | 503E | 008F |
| 0000251700 | 0375 | 5BE9 | C700 | D686 | 00FC | FF00 | DAB6 | FFFC |
| 0000251720 | D8B6 | 8DFC | D686 | 16FC | FF50 | E8B6 | FFFC | FAB6 |
| 0000251740 | FFFE | F8B6 | 8DFE | DC8E | 16FC | 8D51 | F28E | 16FE |
| 0000251760 | 8D51 | D08E | 16FC | 1E51 | 6668 | 6819 | 00D9 | 36FF |
| 0000252000 | 18EA | 36FF | 18E8 | 36FF | 18EE | 36FF | 18EC | AF9A |
| 0000252020 | 0090 | 8300 | 28C4 | 868B | FCD6 | 09E9 | E900 | 0006 |
| 0000252040 | 00B8 | E900 | 0000 | 5E1F | 835F | 02ED | E58B | 5D1F |
| 0000252060 | CB4D | 581E | 4590 | 8B55 | 1EEC | D88E | EC81 | 03B2 |
| 0000252100 | 5657 | 86C7 | FEF8 | 197A | 9E8C | FEFA | 86C7 | FCE8 |
| 0000252120 | 0101 | C02B | 8689 | FCDA | 8689 | FCD8 | 068E | 31B6 |
| 0000252140 | 8326 | B13E | 0094 | 0375 | 1EE9 | FF00 | EE36 | FF18 |
| 0000252160 | EC36 | 8D18 | D086 | 16FC | 9A50 | 8F3A | 0000 | C483 |
| 0000252200 | 3D08 | 0000 | 0374 | 0FE9 | 8E00 | B806 | 2631 | 3E83 |
| 0000252220 | 952B | 7500 | E903 | 0040 | 681E | 1981 | 868D | FCDC |
| 0000252240 | 5016 | 868D | FCD0 | 5016 | 868D | FEF2 | 5016 | ED68 |
| 0000252260 | 1E00 | C868 | FF19 | EA36 | FF18 | E836 | FF18 | EE36 |
| 0000252300 | FF18 | EC36 | 9A18 | 8F86 | 0000 | C483 | 891E | F286 |
| 0000252320 | 89FE | F496 | E9FE | 000A | C02B | 8689 | FEF4 | 8689 |
| 0000252340 | FEF2 | C02B | 8689 | FDF0 | 8689 | FDEE | 006A | 006A |
| 0000252360 | 868D | FDEE | 5016 | 006A | 868D | FDF2 | 5016 | 468D |
| 0000252400 | 16FC | 9A50 | 8FC5 | 0000 | 8689 | FEF6 | 013D | 1B00 |
| 0000252420 | 40C0 | 003D | 7500 | E903 | 00EA | 068E | 31B6 | 8326 |
| 0000252440 | 123E | 0095 | 0375 | 52E9 | 8300 | D4BE | FEFC | 0375 |
| 0000252460 | 48E9 | FF00 | FC76 | 868D | FDF2 | 5016 | 681E | 1988 |
| 0000252500 | 868D | FCDC | 5016 | 868D | FEF2 | 5016 | 868D | FCD0 |
| 0000252520 | 5016 | 681E | 19C8 | FB68 | FF00 | EA36 | FF18 | E836 |
| 0000252540 | FF18 | EE36 | FF18 | EC36 | 1E18 | A268 | 6819 | 9030 |
| 0000252560 | 3368 | 9A90 | 9036 | 0000 | C483 | 8E2C | B606 | 2631 |
| 0000252600 | 3E83 | 95D6 | 7500 | E903 | 000A | BE83 | FCD4 | 74FE |
| 0000252620 | E903 | 000F | 068E | 31B8 | 8326 | EF3E | 0095 | 0375 |
| 0000252640 | 5BE9 | C700 | D686 | FFFC | FFFF | DAB6 | FFFC | D8B6 |
| 0000252660 | 8DFC | D686 | 16FC | FF50 | E8B6 | FFFC | FAB6 | FFFE |
| 0000252700 | F8B6 | 8DFE | DC8E | 16FC | 8D51 | F28E | 16FE | 8D51 |
| 0000252720 | D08E | 16FC | 1E51 | C868 | 6819 | 00FC | 36FF | 18EA |
| 0000252740 | 36FF | 18E8 | 36FF | 18EE | 36FF | 18EC | 419A | 0096 |
| 0000252760 | 8300 | 28C4 | 868B | FCD6 | 4FE9 | E903 | 0006 | FFB8 |
| 0000253000 | E9FF | 0346 | 86C6 | FCEE | FF00 | F0B6 | FFFD | EEB6 |
| 0000253020 | 6AFD | 1E04 | AA68 | 8D19 | EA86 | 16FC | 9A50 | 90E0 |
| 0000253040 | 0000 | 8689 | FEF6 | B6FF | FDF0 | B6FF | FDEE | 006A |
| 0000253060 | F39A | 0090 | 8300 | F6BE | 00FE | 0375 | 89E9 | 8E00 |
| 0000253100 | B606 | 2631 | 3E83 | 9334 | 7500 | E903 | 000A | BE83 |
| 0000253120 | FCD4 | 74FE | E903 | 000F | 068E | 31B8 | 8326 | 4D3E |
| 0000253140 | 0093 | 0375 | 5BE9 | C700 | D686 | FFFC | FFFF | DAB6 |
| 0000253160 | FFFC | D8B6 | 8DFC | D686 | 16FC | FF50 | E8B6 | FFFC |
| 0000253200 | FAB6 | FFFE | F8B6 | 8DFE | DC8E | 16FC | 8D51 | F28E |
| 0000253220 | 16FE | 8D51 | D08E | 16FC | 1E51 | C868 | 6819 | 0106 |
| 0000253240 | 36FF | 18EA | 36FF | 18E8 | 36FF | 18EE | 36FF | 18EC |
| 0000253260 | 089A | 0093 | 8300 | 28C4 | 868B | FCD6 | 8BE9 | E902 |
| 0000253300 | 0006 | FFB8 | E9FF | 0282 | B6FF | FCEC | B6FF | FCEA |
| 0000253320 | 868D | FCEE | 5016 | D29A | 7F91 | 8396 | 08C4 | B6FF |
| 0000253340 | FCEC | B6FF | FCEA | 868D | FEFC | 5016 | D29A | A691 |

THU MAR 14 17:25:16 1991 CRV_IPS.DLL PAGE 94, LINE 5488

| | | | | | | | | |
|---|---|---|---|---|---|---|---|---|
| 0000253360 | 8396 | 08C4 | B6FF | FCEC | B6FF | FCEA | A99A | 0091 |
| 0000253400 | 2B00 | 89C0 | EC86 | 89FC | EA86 | 6AFC | 8D2E | EE86 |
| 0000253420 | 16FC | 9A50 | 9E48 | 92BB | C483 | 8906 | EA86 | 89FC |
| 0000253440 | EC96 | 8BFC | EC86 | 0BFC | EA86 | 74FC | E903 | 0015 |
| 0000253460 | 681E | 19BE | 868D | FCEE | 5016 | 8C9A | E891 | 8396 |
| 0000253500 | 08C4 | 18E9 | FF00 | EA86 | 1EFC | C368 | FF19 | ECB6 |
| 0000253520 | FFFC | EAB6 | 9AFC | 91D2 | 97DF | C463 | 8E08 | BC06 |
| 0000253540 | 2631 | 3E83 | 0F06 | 7400 | E903 | 00A3 | 068E | 31B6 |
| 0000253560 | 8326 | B53E | 0097 | 0375 | 0AE9 | 8300 | D4BE | FEFC |
| 0000253600 | 0374 | 0FE9 | 8E00 | B806 | 2631 | 3E83 | 97CE | 7500 |
| 0000253620 | E903 | 0067 | 868D | FEFC | 5016 | 5F9A | 94E2 | 8397 |
| 0000253640 | 04C4 | 8689 | FCD6 | B6FF | FCDA | B6FF | FCD8 | 868D |
| 0000253660 | FCD6 | 5016 | B6FF | FCE8 | B6FF | FEFA | B6FF | FEF8 |
| 0000253700 | 8E8D | FCDC | 5116 | 8E8D | FEF2 | 5116 | 8E8D | FCD0 |
| 0000253720 | 5116 | 681E | 19C8 | 2868 | FF01 | EA36 | FF18 | E836 |
| 0000253740 | FF18 | EE36 | FF18 | EC36 | 9A18 | 982C | 0000 | C483 |
| 0000253760 | 8B28 | D686 | E9FC | 0152 | 11E9 | 8D00 | FC86 | 16FE |
| 0000254000 | 9A50 | E25F | 9209 | C483 | E904 | 013E | 3BE9 | 8E01 |
| 0000254020 | BC06 | 2631 | 3E83 | 0F06 | 7401 | E903 | 00A3 | 068E |
| 0000254040 | 31B6 | 8326 | 583E | 0098 | 0375 | 0AE9 | 8300 | D4BE |
| 0000254060 | FEFC | 0374 | 0FE9 | 8E00 | B806 | 2631 | 3E83 | 9871 |
| 0000254100 | 7500 | E903 | 0067 | 868D | FEFC | 5016 | 459A | 466C |
| 0000254120 | 8398 | 04C4 | 8689 | FCD6 | B6FF | FCDA | B6FF | FCD8 |
| 0000254140 | 868D | FCD6 | 5016 | B6FF | FCE8 | B6FF | FEFA | B6FF |
| 0000254160 | FEF8 | 8E8D | FCDC | 5116 | 8E8D | FEF2 | 5116 | 8E8D |
| 0000254200 | FCD0 | 5116 | 681E | 19C8 | 2B68 | FF01 | EA36 | FF18 |
| 0000254220 | E836 | FF18 | EE36 | FF18 | EC36 | 9A18 | 98C3 | 0000 |
| 0000254240 | C483 | 8B28 | D686 | E9FC | 00A0 | 11E9 | 8D00 | FC86 |
| 0000254260 | 16FE | 9A50 | 6C45 | 9669 | C483 | E904 | 008C | 89E9 |
| 0000254300 | 8E00 | B606 | 2631 | 3E83 | 93F3 | 7500 | E903 | 000A |
| 0000254320 | BE83 | FCD4 | 74FE | E903 | 000F | 068E | 31B8 | 8326 |
| 0000254340 | 203E | 0094 | 0375 | 5BE9 | C700 | D686 | 00FC | FF00 |
| 0000254360 | DAB6 | FFFC | D8B6 | 8DFC | D686 | 16FC | FF50 | E8B6 |
| 0000254400 | FFFC | FAB6 | FFFE | F8B6 | 8DFE | DC8E | 16FC | 8D51 |
| 0000254420 | F28E | 16FE | 8D51 | D08E | 16FC | 1E51 | C868 | 6819 |
| 0000254440 | 012D | 36FF | 18EA | 36FF | 18E8 | 36FF | 18EE | 36FF |
| 0000254460 | 18EC | 7D9A | 0095 | 8300 | 28C4 | 868B | FCD6 | 09E9 |
| 0000254500 | E900 | 0006 | 00B8 | E900 | 0000 | 5F5E | ED83 | 8B02 |
| 0000254520 | 1FE5 | 4D5D | 1ECB | 9058 | 5545 | EC8B | 8E1E | 81D8 |
| 0000254540 | 00EC | 5700 | 1E56 | FEB8 | 8E8E | 8ED8 | BC06 | 2631 |
| 0000254560 | 3E83 | 0F06 | 7400 | E903 | 0014 | 76FF | FF08 | 0676 |
| 0000254600 | A89A | 2DC6 | 8397 | 04C4 | 2CE9 | E900 | 0029 | 068E |
| 0000254620 | 31BC | 8326 | 063E | 010F | 0374 | 14E9 | FF00 | 0876 |
| 0000254640 | 76FF | 9A06 | 691A | 96CD | C483 | E904 | 0009 | 06E9 |
| 0000254660 | B800 | 0000 | 00E9 | 1F00 | 5F5E | ED83 | 8B02 | 1FE5 |
| 0000254700 | 4D5D | 04CA | 1E00 | 9058 | 5545 | EC8B | 8E1E | 81D8 |
| 0000254720 | 00EC | 5700 | 1E56 | F7B8 | 8E98 | 8ED8 | BE06 | 2631 |
| 0000254740 | 3E83 | 277E | 7500 | E903 | 0006 | EAB8 | E9FF | 004C |
| 0000254760 | 068E | 31BC | 8326 | 063E | 000F | 0374 | 14E9 | FF00 |
| 0000255000 | 0876 | 76FF | 9A06 | 9B38 | 9913 | C483 | E904 | 002C |
| 0000255020 | 29E9 | 8E00 | BC06 | 2631 | 3E83 | 0F06 | 7401 | E903 |
| 0000255040 | 0014 | 76FF | FF08 | 0676 | 219A | 366D | 8399 | 04C4 |
| 0000255060 | 09E9 | E900 | 0006 | 00B8 | E900 | 0000 | 5E1F | 835F |
| 0000255100 | 02ED | E58B | 5D1F | CA4D | 0004 | 581E | 4590 | 8B55 |
| 0000255120 | 1EEC | D88E | EC81 | 0000 | 5657 | B81E | 9967 | D88E |
| 0000255140 | 068E | 31BC | 8326 | 063E | 000F | 0374 | 14E9 | FF00 |
| 0000255160 | 0876 | 76FF | 9A06 | 9F97 | 9998 | C483 | E904 | 002C |
| 0000255200 | 29E9 | 8E00 | BC06 | 2631 | 3E83 | 0F06 | 7401 | E903 |
| 0000255220 | 0014 | 76FF | FF08 | 0676 | 239A | BB6E | 8399 | 04C4 |

THU MAR 14 17:25:16 1991 CRV_IPS.DLL PAGE 95, LINE 5547

| | | | | | | | | |
|---|---|---|---|---|---|---|---|---|
| 0000255240 | 09E9 | E900 | 0006 | 00B8 | E900 | 0000 | 5E1F | 835F |
| 0000255260 | 02ED | E58B | 5D1F | CA4D | 0004 | 581E | 4590 | 8B55 |
| 0000255300 | 1EEC | D88E | EC81 | 0000 | 5657 | B81E | 99EC | D88E |
| 0000255320 | 068E | 31BC | 8326 | 063E | 000F | 0374 | 14E9 | FF00 |
| 0000255340 | 0876 | 76FF | 9A06 | A319 | 9A08 | C483 | E904 | 002C |
| 0000255360 | 29E9 | 8E00 | BC06 | 2631 | 3E83 | 0F06 | 7401 | E903 |
| 0000255400 | 0014 | 76FF | FF08 | 0676 | 4D9A | 2B6E | 839A | 04C4 |
| 0000255420 | 09E9 | E900 | 0006 | 00B8 | E900 | 0000 | 5E1F | 835F |
| 0000255440 | 02ED | E58B | 5D1F | CA4D | 0004 | 581E | 4590 | 8B55 |
| 0000255460 | 1EEC | D88E | EC81 | 0000 | 5657 | B81E | 9A5C | D88E |
| 0000255500 | 006A | 449A | 9B64 | 839A | 02C4 | AF9A | 78D9 | 1F9A |
| 0000255520 | 5F5E | ED83 | 8B02 | 1FE5 | 4D5D | 1ECB | 9058 | 5545 |
| 0000255540 | EC8B | 8E1E | 81D8 | 00EC | 5700 | 1E56 | CCB8 | 8E9A |
| 0000255560 | 1FD8 | 5F5E | ED83 | 8B02 | 1FE5 | 4D5D | 02CA | 1E00 |
| 0000255600 | 9058 | 5545 | EC8B | 8E1E | 81D8 | 00EC | 5700 | FF56 |
| 0000255620 | 0676 | 3B9A | DDCD | 839A | 02C4 | 00E9 | 5E00 | 835F |
| 0000255640 | 02ED | E58B | 5D1F | CB4D | 581E | 4590 | 8B55 | 1EEC |
| 0000255660 | D88E | EC81 | 0026 | 5657 | 46C7 | B7FA | 8C1A | FC5E |
| 0000255700 | 46C7 | 01F2 | 2B01 | 89C0 | E446 | 4689 | 8EE2 | C006 |
| 0000255720 | 2631 | 3E83 | 9703 | 7500 | E903 | 001D | 36FF | 1AE0 |
| 0000255740 | 36FF | 1ADE | 468D | 16DA | 9A50 | 940A | 0000 | C483 |
| 0000255760 | 3D08 | 0000 | 0374 | 0FE9 | 8E00 | C206 | 2631 | 3E83 |
| 0000256000 | 9C1F | 7500 | E903 | 003B | 681E | 1ABE | 468D | 16E6 |
| 0000256020 | 8D50 | DA46 | 5016 | 468D | 16F6 | 6850 | 0168 | 681E |
| 0000256040 | 1B9E | 36FF | 1ADC | 36FF | 1ADA | 36FF | 1AE0 | 36FF |
| 0000256060 | 1ADE | 569A | 0094 | 8300 | 1EC4 | 4689 | 89F6 | F856 |
| 0000256100 | 08E9 | 2B00 | 89C0 | F846 | 4689 | 9AF6 | 6423 | 9BEB |
| 0000256120 | 003D | 7500 | E903 | 0095 | C19A | F762 | C49B | 065E |
| 0000256140 | 8926 | 2847 | E29A | 8E62 | C49C | 065E | 8926 | 2A47 |
| 0000256160 | 068E | 31C0 | 8326 | A53E | 009C | 0375 | 09E9 | 8300 |
| 0000256200 | DE7E | 74FE | E903 | 000F | 068E | 31C2 | 8326 | BD3E |
| 0000256220 | 009C | 0375 | 50E9 | C700 | E046 | 0000 | 76FF | FFE4 |
| 0000256240 | E276 | 468D | 16E0 | FF50 | F276 | 76FF | FFFC | FA76 |
| 0000256260 | 4E8D | 16E6 | 8D51 | F64E | 5116 | 4E8D | 16DA | 1E51 |
| 0000256300 | 9E68 | 681B | 016F | 36FF | 1ADC | 36FF | 1ADA | 36FF |
| 0000256320 | 1AE0 | 36FF | 1ADE | 059A | 009D | 8300 | 28C4 | 468B |
| 0000256340 | E9E0 | 0318 | 06E9 | B800 | 0000 | 0FE9 | 6A03 | 1E0C |
| 0000256360 | 8668 | 6A50 | 6A00 | 6A00 | 6A00 | 9A33 | DFDD | 9AD5 |
| 0000256400 | C483 | 890E | F446 | 003D | 7500 | E903 | 007D | 068E |
| 0000256420 | 31C0 | 8326 | 643E | 009B | 0375 | 09E9 | 8300 | DE7E |
| 0000256440 | 74FE | E903 | 000F | 068E | 31C2 | 8326 | 1C3E | 0097 |
| 0000256460 | 0375 | 50E9 | C700 | E046 | FF9C | 76FF | FFE4 | E276 |
| 0000256500 | 468D | 16E0 | FF50 | F276 | 76FF | FFFC | FA76 | 4E8D |
| 0000256520 | 16E6 | 8D51 | F64E | 5116 | 4E8D | 16DA | 1E51 | 9E68 |
| 0000256540 | 681B | 0174 | 36FF | 1ADC | 36FF | 1ADA | 36FF | 1AE0 |
| 0000256560 | 36FF | 1ADE | 7A9A | 0097 | 8300 | 28C4 | 468B | E9E0 |
| 0000256600 | 027A | 06E9 | B800 | FF9C | 71E9 | 6A02 | 6A00 | 9A32 |
| 0000256620 | FFFF | 0000 | 119A | 25CD | 8E9B | C406 | 2631 | 28A1 |
| 0000256640 | D10F | A3E8 | 1AE4 | A126 | 0F2A | E8D1 | E6A3 | FF1A |
| 0000256660 | 9036 | FF50 | 8E36 | 6A50 | 1E0E | E468 | 9A1A | CF29 |
| 0000256700 | 9ED5 | C483 | 3D0A | 0000 | 0375 | 7DE9 | 8E00 | C006 |
| 0000256720 | 2631 | 3E83 | 9E03 | 7500 | E903 | 0009 | 7E83 | FEDE |
| 0000256740 | 0374 | 0FE9 | 8E00 | C206 | 2631 | 3E83 | 9E6F | 7500 |
| 0000256760 | E903 | 0050 | 46C7 | 9CE0 | FFFF | E476 | 76FF | 8DE2 |
| 0000257000 | E046 | 5016 | 76FF | FFF2 | FC76 | 76FF | 8DFA | E64E |
| 0000257020 | 5116 | 4E8D | 16F6 | 8D51 | DA4E | 5116 | 681E | 1B9E |
| 0000257040 | 7D68 | FF01 | DC36 | FF1A | DA36 | FF1A | E036 | FF1A |
| 0000257060 | DE36 | 9A1A | 9EB7 | 0000 | C483 | 8B28 | E046 | BBE9 |
| 0000257100 | E901 | 0006 | 9CB8 | E9FF | 01B2 | 819A | EEAF | 899D |

THU MAR 14 17:25:16 1991 CRV_IPS.DLL PAGE 96, LINE 5606

| | | | | | | | | |
|---|---|---|---|---|---|---|---|---|
| 0000257120 | F446 | 7E83 | 00F4 | 0375 | 08E9 | 9A00 | CD5C | 9D27 |
| 0000257140 | 4689 | 83F4 | F47E | 7500 | E903 | 00D4 | 068E | 31C0 |
| 0000257160 | 8326 | 573E | 009E | 0375 | 45E9 | 8300 | DE7E | 75FE |
| 0000257200 | E903 | 003C | 631E | 1AC5 | 468D | 16E6 | 8D50 | F646 |
| 0000257220 | 5016 | 468D | 16DA | 1E50 | 9E68 | 681B | 0185 | 36FF |
| 0000257240 | 1ADC | 36FF | 1ADA | 36FF | 1AE0 | 36FF | 1ADE | 681E |
| 0000257260 | 1AD2 | FE68 | 6894 | 9501 | 049A | 0095 | 8300 | 26C4 |
| 0000257300 | 068E | 31C0 | 8326 | 163E | 009F | 0375 | 09E9 | 8300 |
| 0000257320 | DE7E | 74FE | E903 | 000F | 068E | 31C2 | 8326 | 2E3E |
| 0000257340 | 009F | 0375 | 50E9 | C700 | E046 | FFFF | 76FF | FFE4 |
| 0000257360 | E276 | 468D | 16E0 | FF50 | F276 | 76FF | FFFC | FA76 |
| 0000257400 | 4E8D | 16E6 | 8D51 | F64E | 5116 | 4E8D | 16DA | 1E51 |
| 0000257420 | 9E68 | 681B | 0186 | 36FF | 1ADC | 36FF | 1ADA | 36FF |
| 0000257440 | 1AE0 | 36FF | 1ADE | 769A | 009F | 8300 | 28C4 | 468B |
| 0000257460 | E9E0 | 00C8 | 06E9 | B800 | FFFF | BFE9 | E900 | 00BC |
| 0000257500 | 016A | 449A | DD64 | 839E | 02C4 | C19A | F362 | C49E |
| 0000257520 | 065E | 8926 | 2847 | 5EC4 | 2606 | 478B | A328 | 47B2 |
| 0000257540 | E29A | DE62 | C49B | 065E | 8926 | 2A47 | 5EC4 | 2606 |
| 0000257560 | 478B | A32A | 47B4 | 00B8 | A300 | 1AF6 | F4A3 | 8E1A |
| 0000257600 | C006 | 2631 | 3E83 | 9C07 | 7500 | E903 | 0009 | 7E83 |
| 0000257620 | FEDE | 0374 | 0FE9 | 8E00 | C206 | 2631 | 3E83 | 9B90 |
| 0000257640 | 7500 | E903 | 0050 | 46C7 | 00E0 | FF00 | E476 | 76FF |
| 0000257660 | 8DE2 | E046 | 5016 | 76FF | FFF2 | FC76 | 76FF | 8DFA |
| 0000257700 | E64E | 5116 | 4E8D | 16F6 | 8D51 | DA4E | 5116 | 681E |
| 0000257720 | 1B9E | 8D68 | FF01 | DC36 | FF1A | DA36 | FF1A | E036 |
| 0000257740 | FF1A | DE36 | 9A1A | 9C67 | 0000 | C483 | 8B28 | E046 |
| 0000257760 | 09E9 | E900 | 0006 | 00B8 | E900 | 0000 | 5F5E | ED83 |
| 0000260000 | 8B02 | 1FE5 | 4D5D | 1ECB | 9058 | 5545 | EC8B | 8E1E |
| 0000260020 | 81D8 | 4EEC | 5701 | C756 | FA46 | 1BB5 | 5E8C | C7FC |
| 0000260040 | CA86 | 01FE | 2B01 | 89C0 | BC86 | 89FE | BA86 | 8EFE |
| 0000260060 | C006 | 2631 | 3E83 | A07B | 7500 | E903 | 001E | 36FF |
| 0000260100 | 1AE0 | 36FF | 1ADE | 868D | FEB2 | 5016 | 7A9A | 009B |
| 0000260120 | 8300 | 08C4 | 003D | 7400 | E903 | 000F | 068E | 31C2 |
| 0000260140 | 8326 | 943E | 00A0 | 0375 | 40E9 | 1E00 | BC68 | 8D1B |
| 0000260160 | BE86 | 16FE | 8D50 | B286 | 16FE | 8D50 | CE86 | 16FE |
| 0000260200 | 6850 | 01A1 | 681E | 1BC4 | 36FF | 1ADC | 36FF | 1ADA |
| 0000260220 | 36FF | 1AE0 | 36FF | 1ADE | C39A | 009B | 8300 | 1EC4 |
| 0000260240 | 8689 | FECE | 9689 | FED0 | 0AE9 | 2B00 | 89C0 | D086 |
| 0000260260 | 89FE | CE86 | 9AFE | 9DEC | A054 | AAA3 | 8947 | AC16 |
| 0000260300 | 9A47 | 6423 | A135 | 003D | 7400 | E903 | 009D | 868D |
| 0000260320 | FED2 | 5016 | 389A | 0A9B | 83A1 | 04C4 | 003D | 7500 |
| 0000260340 | E903 | 0087 | 068E | 31C0 | 8326 | 4D3E | 00A1 | 0375 |
| 0000260360 | 0AE9 | 8300 | B6BE | FEFE | 0374 | 0FE9 | 8E00 | C206 |
| 0000260400 | 2631 | 3E83 | A166 | 7500 | E903 | 0059 | 86C7 | FEB8 |
| 0000260420 | FFFF | B6FF | FEBC | B6FF | FEBA | 868D | FEB8 | 5016 |
| 0000260440 | B6FF | FECA | 76FF | FFFC | FA76 | 8E8D | FEBE | 5116 |
| 0000260460 | 8E8D | FECE | 5116 | 8E8D | FEB2 | 5116 | 681E | 1BC4 |
| 0000260500 | AB68 | FF01 | DC36 | FF1A | DA36 | FF1A | E036 | FF1A |
| 0000260520 | DE36 | 9A1A | A1B6 | 0000 | C483 | 8B28 | B886 | E9FE |
| 0000260540 | 021C | 06E9 | B800 | FFFF | 13E9 | A102 | 47B2 | 7EA3 |
| 0000260560 | A150 | 47B4 | 80A3 | 9A50 | CD11 | 9DDD | 3E83 | 1AF2 |
| 0000260600 | 7400 | E903 | 000E | F4A1 | 011A | 7E06 | A150 | 1AF6 |
| 0000260620 | 0601 | 5080 | 0C6A | 681E | 5D86 | 006A | 006A | 006A |
| 0000260640 | 336A | DD9A | E4DF | 83A1 | 0EC4 | 8689 | FECC | 003D |
| 0000260660 | 7500 | E903 | 0087 | 068E | 31C0 | 8326 | F83E | 00A1 |
| 0000260700 | 0375 | 0AE9 | 8300 | B6BE | FEFE | 0374 | 0FE9 | 8E00 |
| 0000260720 | C206 | 2631 | 3E83 | A211 | 7500 | E903 | 0059 | 86C7 |
| 0000260740 | FEB8 | FF9C | B6FF | FEBC | B6FF | FEBA | 868D | FEB8 |
| 0000260760 | 5016 | B6FF | FECA | 76FF | FFFC | FA76 | 8E8D | FEBE |

THU MAR 14 17:25:16 1991 CRV_IPS.DLL PAGE 97, LINE 5665

| | | | | | | | | |
|---|---|---|---|---|---|---|---|---|
| 0000261000 | 5116 | 8E8D | FECE | 5116 | 8E8D | FEB2 | 5116 | 681E |
| 0000261020 | 1BC4 | BD68 | FF01 | DC36 | FF1A | DA36 | FF1A | E036 |
| 0000261040 | FF1A | DE36 | 9A1A | A261 | 0000 | C483 | 8B28 | B886 |
| 0000261060 | E9FE | 014A | 06E9 | B800 | FF9C | 41E9 | C701 | E206 |
| 0000261100 | 001A | FF00 | 8C36 | FF50 | 8A36 | 6A50 | 1E02 | E268 |
| 0000261120 | 9A1A | CF29 | 9D50 | C483 | 3D0A | 0000 | 0375 | 87E9 |
| 0000261140 | 8E00 | C006 | 2631 | 3E83 | A28E | 7500 | E903 | 000A |
| 0000261160 | BE83 | FEB6 | 74FE | E903 | 000F | 068E | 31C2 | 8326 |
| 0000261200 | A73E | 00A2 | 0375 | 59E9 | C700 | B886 | 9CFE | FFFF |
| 0000261220 | BCB6 | FFFE | BAB6 | 8DFE | B886 | 16FE | FF50 | CAB6 |
| 0000261240 | FFFE | FC76 | 76FF | 8DFA | BE8E | 16FE | 8D51 | CE8E |
| 0000261260 | 16FE | 8D51 | B28E | 16FE | 1E51 | C468 | 681B | 01C2 |
| 0000261300 | 36FF | 1ADC | 36FF | 1ADA | 36FF | 1AE0 | 36FF | 1ADE |
| 0000261320 | F79A | 00A2 | 8300 | 28C4 | 868B | FEB8 | 9FE9 | E900 |
| 0000261340 | 0006 | 9CB8 | E9FF | 0096 | 06C7 | 1B84 | 0000 | 5EC4 |
| 0000261360 | 2606 | 47C7 | 0E1A | 8E00 | C006 | 2631 | 3E83 | 9D64 |
| 0000261400 | 7500 | E903 | 000A | BE83 | FEB6 | 74FE | E903 | 000F |
| 0000261420 | 068E | 31C2 | 8326 | 7C3E | 009D | 0375 | 59E9 | C700 |
| 0000261440 | B886 | 00FE | FF00 | BCB6 | FFFE | BAB6 | 8DFE | B886 |
| 0000261460 | 16FE | FF50 | CAB6 | FFFE | FC76 | 76FF | 8DFA | BE8E |
| 0000261500 | 16FE | 8D51 | CE8E | 16FE | 8D51 | B28E | 16FE | 1E51 |
| 0000261520 | C468 | 681B | 01C7 | 36FF | 1ADC | 36FF | 1ADA | 36FF |
| 0000261540 | 1AE0 | 36FF | 1ADE | C49A | 009D | 8300 | 28C4 | 868B |
| 0000261560 | FEB8 | 09E9 | E900 | 0006 | 00B8 | E900 | 0000 | 5F5E |
| 0000261600 | ED83 | 8B02 | 1FE5 | 4D5D | 1ECB | 9058 | 5545 | EC8B |
| 0000261620 | 8E1E | 81D8 | 54EC | 5701 | C756 | FA46 | 1BD9 | 5E8C |
| 0000261640 | C7FC | C886 | 01FE | 2B01 | 89C0 | BA86 | 89FE | B886 |
| 0000261660 | 8EFE | C006 | 2631 | 3E83 | 9FC6 | 7500 | E903 | 001E |
| 0000261700 | 36FF | 1AE0 | 36FF | 1ADE | 868D | FEAE | 5016 | DD9A |
| 0000261720 | 009F | 8300 | 08C4 | 003D | 7400 | E903 | 000F | 068E |
| 0000261740 | 31C2 | 8326 | F33E | 009F | 0375 | 3DE9 | 1E00 | E068 |
| 0000261760 | 8D1B | BC86 | 16FE | 8D50 | AE86 | 16FE | 8D50 | F646 |
| 0000262000 | 5016 | DA68 | 1E01 | 4A68 | FF1C | DC36 | FF1A | DA36 |
| 0000262020 | FF1A | E036 | FF1A | DE36 | 9A1A | A029 | 0000 | C483 |
| 0000262040 | 891E | F646 | 5689 | E9F8 | 0008 | C02B | 4689 | 89F8 |
| 0000262060 | F646 | EC9A | 489D | A3A0 | 507A | 1689 | 507C | D09A |
| 0000262100 | 67B6 | 89A0 | CC86 | 3DFE | 0000 | 0375 | 89E9 | 8E00 |
| 0000262120 | C006 | 2631 | 3E83 | A509 | 7500 | E903 | 000A | BE83 |
| 0000262140 | FEB2 | 74FE | E903 | 000F | 068E | 31C2 | 8326 | 793E |
| 0000262160 | 00A5 | 0375 | 5AE9 | 8B00 | CC86 | 89FE | B486 | FFFE |
| 0000262200 | BAB6 | FFFE | B8B6 | 8DFE | B486 | 16FE | FF50 | C8B6 |
| 0000262220 | FFFE | FC76 | 76FF | 8DFA | BC8E | 16FE | 8D51 | F64E |
| 0000262240 | 5116 | 8E8D | FEAE | 5116 | 681E | 1C4A | E668 | FF01 |
| 0000262260 | DC36 | FF1A | DA36 | FF1A | E036 | FF1A | DE36 | 9A1A |
| 0000262300 | A5C8 | 0000 | C483 | 8B28 | B486 | E9FE | 03E0 | 07E9 |
| 0000262320 | 8B00 | CC86 | E9FE | 03D6 | C19A | 7362 | A3A4 | 1AE4 |
| 0000262340 | E29A | B462 | A3A4 | 1AE6 | 479A | 8EAA | 89A4 | CA86 |
| 0000262360 | 83FE | CABE | 00FE | 0375 | 09E9 | 9A00 | AF81 | A4A1 |
| 0000262400 | 8689 | FECA | BE83 | FECA | 7500 | E903 | 0009 | 5C9A |
| 0000262420 | C2CD | 89A6 | CA86 | 83FE | CABE | 00FE | 0374 | 13E9 |
| 0000262440 | 9A00 | 62C1 | A4BC | B2A3 | 9A47 | 62E2 | A3C5 | B4A3 |
| 0000262460 | E947 | 000C | 7EA1 | A350 | 47B2 | 80A1 | A350 | 47B4 |
| 0000262500 | 5EC4 | 2606 | 3F83 | 7401 | E903 | 0106 | B2A1 | 2B47 |
| 0000262520 | 7E06 | C450 | 065E | 8926 | 2847 | B4A1 | 2B47 | 8006 |
| 0000262540 | C450 | 065E | 8926 | 2A47 | BE83 | FECA | 7500 | E903 |
| 0000262560 | 00DD | 068E | 31C0 | 8326 | 603E | 00A5 | 0375 | 48E9 |
| 0000262600 | 8300 | B2BE | FEFE | 0375 | 3EE9 | 1E00 | E768 | 8D1B |
| 0000262620 | BC86 | 16FE | 8D50 | F646 | 5016 | 868D | FEAE | 5016 |
| 0000262640 | 681E | 1C4A | 1168 | FF02 | DC36 | FF1A | DA36 | FF1A |

THU MAR 14 17:25:16 1991 CRV_IPS.DLL PAGE 98, LINE 5724

| | | | | | | | | |
|---|---|---|---|---|---|---|---|---|
| 0000262660 | E036 | FF1A | DE36 | 1E1A | FF68 | 681B | A66E | 7168 |
| 0000262700 | 9AA6 | A674 | 0000 | C483 | 8E26 | C006 | 2631 | 3E83 |
| 0000262720 | A623 | 7500 | E903 | 000A | BE83 | FEB2 | 74FE | E903 |
| 0000262740 | 000F | 068E | 31C2 | 8326 | 463E | 00A7 | 0375 | 58E9 |
| 0000262760 | C700 | B486 | F3FE | FF06 | BAB6 | FFFE | B8B6 | 8DFE |
| 0000263000 | B486 | 16FE | FF50 | C8B6 | FFFE | FC76 | 76FF | 8DFA |
| 0000263020 | BC8E | 16FE | 8D51 | F64E | 5116 | 8E8D | FEAE | 5116 |
| 0000263040 | 681E | 1C4A | 1268 | FF02 | DC36 | FF1A | DA36 | FF1A |
| 0000263060 | E036 | FF1A | DE36 | 9A1A | A0E4 | 0000 | C483 | 8B28 |
| 0000263100 | B486 | E9FE | 0268 | 06E9 | B800 | 06F3 | 5FE9 | E902 |
| 0000263120 | 01D6 | 5EC4 | 2606 | 478B | 2B28 | B206 | 0347 | 7E06 |
| 0000263140 | 8950 | B686 | C4FE | 065E | 8B26 | 2A47 | 062B | 47B4 |
| 0000263160 | 0603 | 5080 | 8689 | FEAC | BE83 | FEB6 | 7400 | E903 |
| 0000263200 | 000A | BE83 | FEAC | 7500 | E903 | 019C | 068E | 31C0 |
| 0000263220 | 8326 | D63E | 00A6 | 0375 | 50E9 | 8300 | B2BE | FEFE |
| 0000263240 | 0375 | 46E9 | FF00 | ACB6 | FFFE | B6B6 | 1EFE | 0768 |
| 0000263260 | 8D1C | BC86 | 16FE | 8D50 | F646 | 5016 | 868D | FEAE |
| 0000263300 | 5016 | 681E | 1C4A | 1D68 | FF02 | DC36 | FF1A | DA36 |
| 0000263320 | FF1A | E036 | FF1A | DE36 | 1E1A | 1868 | 681C | A719 |
| 0000263340 | 1C68 | 9AA7 | A71F | 0000 | C483 | 8B2A | B686 | 89FE |
| 0000263360 | F686 | 8BFE | AC86 | 89FE | F886 | C7FE | CE86 | 00FE |
| 0000263400 | C600 | F286 | 0FFE | C02B | 8689 | FEEC | 8689 | FEEA |
| 0000263420 | C02B | 8689 | FEF0 | 8689 | FEEE | 46C7 | 00F2 | C600 |
| 0000263440 | F486 | 00FE | 86C6 | FEF3 | 8D19 | CE86 | 16FE | 9A50 |
| 0000263460 | A849 | A3D1 | C483 | 3D04 | 0000 | 0375 | E0E9 | 8E0D |
| 0000263500 | C006 | 2631 | 3E83 | A72D | 7500 | E903 | 0048 | BE83 |
| 0000263520 | FEB2 | 75FE | E903 | 003E | 681E | 1C20 | 868D | FEBC |
| 0000263540 | 5016 | 468D | 16F6 | 8D50 | AE86 | 16FE | 1E50 | 4A68 |
| 0000263560 | 681C | 0229 | 36FF | 1ADC | 36FF | 1ADA | 36FF | 1AE0 |
| 0000263600 | 36FF | 1ADE | 681E | 1C42 | 4368 | 689E | 9E46 | 499A |
| 0000263620 | 009E | 8300 | [illegible]3C4 | 068E | 31C0 | 8326 | 4B3E | 00A3 |
| 0000263640 | 0375 | 0AE9 | 8300 | B2BE | FEFE | 0374 | 0FE9 | 8E00 |
| 0000263660 | C206 | 2631 | 3E83 | A375 | 7500 | E903 | 0058 | 86C7 |
| 0000263700 | FEB4 | 06F3 | B6FF | FEBA | B6FF | FEB8 | 868D | FEB4 |
| 0000263720 | 5016 | B6FF | FEC8 | 76FF | FFFC | FA76 | 8E8D | FEBC |
| 0000263740 | 5116 | 4E8D | 16F6 | 8D51 | AE8E | 16FE | 1E51 | 4A68 |
| 0000263760 | 681C | 022A | 36FF | 1ADC | 36FF | 1ADA | 36FF | 1AE0 |
| 0000264000 | 36FF | 1ADE | 279A | 00AB | 8300 | 28C4 | 868B | FEB4 |
| 0000264020 | 9BE9 | E900 | 0006 | F3B8 | E906 | 0092 | 09E9 | B800 |
| 0000264040 | 0000 | F6A3 | A31A | 1AF4 | 068E | 31C0 | 8326 | E63E |
| 0000264060 | 00A3 | 0375 | 0AE9 | 8300 | B2BE | FEFE | 0374 | 0FE9 |
| 0000264100 | 8E00 | C206 | 2631 | 3E83 | A3FF | 7500 | E903 | 0058 |
| 0000264120 | 86C7 | FEB4 | 0000 | B6FF | FEBA | B6FF | FEB8 | 868D |
| 0000264140 | FEB4 | 5016 | B6FF | FEC8 | 76FF | FFFC | FA76 | 8E8D |
| 0000264160 | FEBC | 5116 | 4E8D | 16F6 | 8D51 | AE8E | 16FE | 1E51 |
| 0000264200 | 4A68 | 681C | 0231 | 36FF | 1ADC | 36FF | 1ADA | 36FF |
| 0000264220 | 1AE0 | 36FF | 1ADE | 509A | 00A4 | 8300 | 28C4 | 868B |
| 0000264240 | FEB4 | 09E9 | E900 | 0006 | 00B8 | E900 | 0000 | 5F5E |
| 0000264260 | ED83 | 8B02 | 1FE5 | 4D5D | 1ECB | 9058 | 5545 | EC8B |
| 0000264300 | 8E1E | 81D8 | 24EC | 5700 | C756 | FA46 | 1C5E | 5E8C |
| 0000264320 | C7FC | F446 | 0101 | C02B | 4689 | 89E6 | E446 | 068E |
| 0000264340 | 31C0 | 8326 | BF3E | 00A7 | 0375 | 1DE9 | FF00 | E036 |
| 0000264360 | FF1A | DE36 | 8D1A | DC46 | 5016 | 5F9A | 00A3 | 8300 |
| 0000264400 | 08C4 | 003D | 7400 | E903 | 000F | 068E | 31C2 | 8326 |
| 0000264420 | D83E | 00A7 | 0375 | 3BE9 | 1E00 | 6568 | 8D1C | E846 |
| 0000264440 | 5016 | 468D | 16DC | 8D50 | F646 | 5016 | 3F68 | 1E02 |
| 0000264460 | 6C68 | FF1C | DC36 | FF1A | DA36 | FF1A | E036 | FF1A |
| 0000264500 | DE36 | 9A1A | A3AA | 0000 | C483 | 891E | F646 | 5689 |
| 0000264520 | E9F8 | 0008 | C02B | 4689 | 89F8 | F646 | 3E83 | 1AF2 |

THU MAR 14 17:25:16 1991 CRV_IPS.DLL PAGE 99, LINE 5783

| | | | | | | | | |
|---|---|---|---|---|---|---|---|---|
| 0000264540 | 7F02 | E903 | 001A | 5EC4 | 2606 | 478B | A328 | 1AF4 |
| 0000264560 | 5EC4 | 2606 | 478B | A32A | 1AF6 | ACE9 | E900 | 0004 |
| 0000264600 | 06FF | 1AF2 | 5EC4 | 2606 | 47C7 | 0C1A | FF00 | 0876 |
| 0000264620 | 76FF | 9A06 | BB05 | A47B | C483 | 3D04 | 0000 | 0375 |
| 0000264640 | 03E9 | E900 | 0083 | 06C7 | 1AF2 | 0000 | 068E | 31C0 |
| 0000264660 | 8326 | 753E | 00A8 | 0375 | 09E9 | 8300 | E07E | 74FE |
| 0000264700 | E903 | 000F | 068E | 31C2 | 8326 | A13E | 00A8 | 0375 |
| 0000264720 | 50E9 | C700 | E246 | 0000 | 76FF | FFE6 | E476 | 468D |
| 0000264740 | 16E2 | FF50 | F476 | 76FF | FFFC | FA76 | 4E8D | 16E8 |
| 0000264760 | 8D51 | F64E | 5116 | 4E8D | 16DC | 1E51 | 6C68 | 681C |
| 0000265000 | 0250 | 36FF | 1ADC | 36FF | 1ADA | 36FF | 1AE0 | 36FF |
| 0000265020 | 1ADE | 959A | 00A7 | 8300 | 28C4 | 468B | E9E2 | 008C |
| 0000265040 | 06E9 | B800 | 0000 | 83E9 | C700 | F206 | 001A | 8E00 |
| 0000265060 | C006 | 2631 | 3E83 | A943 | 7500 | E903 | 0009 | 7E83 |
| 0000265100 | FEE0 | 0374 | 0FE9 | 8E00 | C206 | 2631 | 3E83 | A95B |
| 0000265120 | 7500 | E903 | 0050 | 46C7 | FFE2 | FFFF | E676 | 76FF |
| 0000265140 | 8DE4 | E246 | 5016 | 76FF | FFF4 | FC76 | 76FF | 8DFA |
| 0000265160 | E84E | 5116 | 4E8D | 16F6 | 8D51 | DC4E | 5116 | 681E |
| 0000265200 | 1C6C | 5468 | FF02 | DC36 | FF1A | DA36 | FF1A | E036 |
| 0000265220 | FF1A | DE36 | 9A1A | A9A3 | 0000 | C483 | 8B28 | E246 |
| 0000265240 | 09E9 | E900 | 0006 | FFB8 | E9FF | 0000 | 5F5E | ED83 |
| 0000265260 | 8B02 | 1FE5 | 4D5D | 1ECB | 9058 | 5545 | EC8B | 8E1E |
| 0000265300 | 81D8 | 36EC | 5700 | C756 | F646 | 1C79 | 5E8C | C7F8 |
| 0000265320 | E246 | 0101 | C02B | 4689 | 89D4 | D246 | 068E | 31C0 |
| 0000265340 | 8326 | 263E | 00AB | 0375 | 1DE9 | FF00 | E036 | FF1A |
| 0000265360 | DE36 | 8D1A | CA46 | 5016 | 8B9A | 00A8 | 8300 | 08C4 |
| 0000265400 | 003D | 7400 | E903 | 000F | 068E | 31C2 | 8326 | 3E3E |
| 0000265420 | 00AB | 0375 | 3BE9 | 1E00 | 8068 | 8D1C | D646 | 5016 |
| 0000265440 | 468D | 16CA | 8D50 | E846 | 5016 | 6068 | 1E02 | D068 |
| 0000265460 | FF1C | DC36 | FF1A | DA36 | FF1A | E036 | FF1A | DE36 |
| 0000265500 | 9A1A | A8D4 | 0000 | C483 | 891E | E846 | 5689 | E9EA |
| 0000265520 | 0008 | C02B | 4689 | 89EA | E846 | EC9A | 129D | 89AB |
| 0000265540 | EE46 | 5689 | A1F0 | 1AE4 | 4689 | A1EC | 1AE6 | 4689 |
| 0000265560 | FFE6 | 9036 | FF50 | 8E36 | 6A50 | 1E0E | E468 | 9A1A |
| 0000265600 | CF29 | ABB3 | C483 | 3D0A | 0000 | 0375 | 7DE9 | 8E00 |
| 0000265620 | C006 | 2631 | 3E83 | ABC7 | 7500 | E903 | 0009 | 7E83 |
| 0000265640 | FECE | 0374 | 0FE9 | 8E00 | C206 | 2631 | 3E83 | ABDF |
| 0000265660 | 7500 | E903 | 0050 | 46C7 | 9CD0 | FFFF | D476 | 76FF |
| 0000265700 | 8DD2 | D046 | 5016 | 76FF | FFE2 | F876 | 76FF | 8DF6 |
| 0000265720 | D64E | 5116 | 4E8D | 16E8 | 8D51 | CA4E | 5116 | 681E |
| 0000265740 | 1CD0 | 6D68 | FF02 | DC36 | FF1A | DA36 | FF1A | E036 |
| 0000265760 | FF1A | DE36 | 9A1A | AC27 | 0000 | C483 | 8B28 | D046 |
| 0000266000 | E3E9 | E903 | 0006 | 9CB8 | E9FF | 03DA | 06C7 | 47AE |
| 0000266020 | 0001 | 36FF | 5988 | 36FF | 5086 | D46A | 681E | 47AE |
| 0000266040 | 299A | E6CF | 83AC | 0AC4 | 003D | 7500 | E903 | 007D |
| 0000266060 | 068E | 31C0 | 8326 | 543E | 00AC | 0375 | 09E9 | 8300 |
| 0000266100 | CE7E | 74FE | E903 | 000F | 068E | 31C2 | 8326 | 6C3E |
| 0000266120 | 00AC | 0375 | 50E9 | C700 | D046 | FF9C | 76FF | FFD4 |
| 0000266140 | D276 | 468D | 16D0 | FF50 | E276 | 76FF | FFF8 | F676 |
| 0000266160 | 4E8D | 16D6 | 8D51 | E84E | 5116 | 4E8D | 16CA | 1E51 |
| 0000266200 | D068 | 681C | 0271 | 36FF | 1ADC | 36FF | 1ADA | 36FF |
| 0000266220 | 1AE0 | 36FF | 1ADE | B59A | 00AC | 8300 | 28C4 | 468B |
| 0000266240 | E9D0 | 0342 | 06E9 | B800 | FF9C | 39E9 | 9A03 | B6D0 |
| 0000266260 | AD8B | 4689 | 3DE4 | 0000 | 0375 | 7EE9 | 8E00 | C006 |
| 0000266300 | 2631 | 3E83 | ACFA | 7500 | E903 | 0009 | 7E83 | FECE |
| 0000266320 | 0374 | 0FE9 | 8E00 | C206 | 2631 | 3E83 | AD12 | 7500 |
| 0000266340 | E903 | 0051 | 468B | 89E4 | D046 | 76FF | FFD4 | D276 |
| 0000266360 | 468D | 16D0 | FF50 | E276 | 76FF | FFF8 | F676 | 4E8D |
| 0000266400 | 16D6 | 8D51 | E84E | 5116 | 4E8D | 16CA | 1E51 | D068 |

THU MAR 14 17:25:16 1991 CRV_IPS.DLL PAGE 100, LINE 5842

| | | | | | | | | |
|---|---|---|---|---|---|---|---|---|
| 000026642D | 681C | 0274 | 36FF | 1ADC | 36FF | 1ADA | 36FF | 1AE0 |
| 0000266440 | 36FF | 1ADE | 5A9A | 00AD | 8300 | 28C4 | 468B | E9D0 |
| 0000266460 | 02B4 | 06E9 | 8B00 | E446 | ABE9 | 8302 | B03E | 0047 |
| 0000266500 | 0374 | B5E9 | FF01 | 9036 | FF50 | 8E36 | 6A50 | 1E0E |
| 0000266520 | E468 | 9A1A | CF95 | AD77 | C483 | 3D0A | 0000 | 0375 |
| 0000266540 | 7DE9 | 8E00 | C006 | 2631 | 3E83 | ADA5 | 7500 | E903 |
| 0000266560 | 0009 | 7E83 | FECE | 0374 | 0FE9 | 8E00 | C206 | 2631 |
| 0000266600 | 3E83 | A9DE | 7500 | E903 | 0050 | 46C7 | 9CD0 | FFFF |
| 0000266620 | D476 | 76FF | 8DD2 | D046 | 5016 | 76FF | FFE2 | F876 |
| 0000266640 | 76FF | 8DF6 | D64E | 5116 | 4E8D | 16E8 | 8D51 | CA4E |
| 0000266660 | 5116 | 681E | 1CD0 | 7A68 | FF02 | DC36 | FF1A | DA36 |
| 0000266700 | FF1A | E036 | FF1A | DE36 | 9A1A | AA26 | 0000 | C483 |
| 0000266720 | 8B28 | D046 | 0FE9 | E902 | 0006 | 9CB8 | E9FF | 0206 |
| 0000266740 | 36FF | 1AE4 | 039A | 8363 | 83AD | 02C4 | 36FF | 1AE6 |
| 0000266760 | 479A | 9063 | 83AD | 02C4 | 119A | 26CD | 9AA9 | 9DEC |
| 0000267000 | ADB9 | 462B | 1BEE | F056 | 4689 | 89FA | FC56 | 068E |
| 0000267020 | 31C0 | 8326 | C63E | 00A9 | 0375 | 5DE9 | 8300 | CE7E |
| 0000267040 | 75FE | E903 | 0054 | E29A | BF62 | 5DAD | C19A | 6B62 |
| 0000267060 | 50A4 | 76FF | FFE6 | EC76 | 76FF | FFFC | FA76 | 681E |
| 0000267100 | 1C87 | 468D | 16D6 | 8D50 | E846 | 5016 | 468D | 16CA |
| 0000267120 | 1E50 | D068 | 681C | 0280 | 36FF | 1ADC | 36FF | 1ADA |
| 0000267140 | 36FF | 1AE0 | 36FF | 1ADE | 681E | 1CAB | 4C68 | 68A5 |
| 0000267160 | A54F | 529A | 00A5 | 8300 | 32C4 | 068E | 31C0 | 8326 |
| 0000267200 | A23E | 00AE | 0375 | 09E9 | 8300 | CE7E | 74FE | E903 |
| 0000267220 | 000F | 068E | 31C2 | 8326 | 183E | 00AF | 0375 | 50E9 |
| 0000267240 | C700 | D046 | 0000 | 76FF | FFD4 | D276 | 468D | 16D0 |
| 0000267260 | FF50 | E276 | 76FF | FFF8 | F676 | 4E8D | 16D6 | 8D51 |
| 0000267300 | E84E | 5116 | 4E8D | 16CA | 1E51 | D068 | 681C | 0281 |
| 0000267320 | 36FF | 1ADC | 36FF | 1ADA | 36FF | 1AE0 | 36FF | 1ADE |
| 0000267340 | 609A | 00AF | 8300 | 28C4 | 468B | E9D0 | 00F8 | 06E9 |
| 0000267360 | B800 | 0000 | EFE9 | E900 | 00EC | EC9A | ED9D | 2BAA |
| 0000267400 | EE46 | 561B | 89F0 | F246 | 5689 | 8EF4 | C006 | 2631 |
| 0000267420 | 3E83 | AF00 | 7500 | E903 | 004F | 7E83 | FECE | 0375 |
| 0000267440 | 46E9 | FF00 | B036 | FF47 | F476 | 76FF | 1EF2 | B368 |
| 0000267460 | 8D1C | D646 | 5016 | 468D | 16E8 | 8D50 | CA46 | 5016 |
| 0000267500 | 681E | 1CD0 | 8668 | FF02 | DC36 | FF1A | DA36 | FF1A |
| 0000267520 | E036 | FF1A | DE36 | 1E1A | C768 | 681C | ADFD | 0068 |
| 0000267540 | 9AAE | AE03 | 0000 | C483 | 8E2C | C006 | 2631 | 3E83 |
| 0000267560 | AA73 | 7500 | E903 | 0009 | 7E83 | FECE | 0374 | 0FE9 |
| 0000267600 | 8E00 | C206 | 2631 | 3E83 | AA9F | 7500 | E903 | 0050 |
| 0000267620 | 46C7 | FFD0 | FFFF | D476 | 76FF | 8DD2 | D046 | 5016 |
| 0000267640 | 76FF | FFE2 | F876 | 76FF | 8DF6 | D64E | 5116 | 4E8D |
| 0000267660 | 16E8 | 8D51 | CA4E | 5116 | 681E | 1CD0 | 8768 | FF02 |
| 0000267700 | DC36 | FF1A | DA36 | FF1A | E036 | FF1A | DE36 | 9A1A |
| 0000267720 | AB86 | 0000 | C483 | 8B28 | D046 | 09E9 | E900 | 0006 |
| 0000267740 | FFB8 | E9FF | 0000 | 5F5E | ED83 | 8B02 | 1FE5 | 4D5D |
| 0000267760 | 1ECB | 9058 | 5545 | EC8B | 8E1E | 81D8 | 30EC | 57D0 |
| 0000270000 | C756 | FA46 | 1CEC | 5E8C | C7FC | EC46 | 0101 | C02B |
| 0000270020 | 4689 | 89DE | DC46 | 068E | 31C0 | 8326 | 113E | 00AE |
| 0000270040 | 0375 | 1DE9 | FF00 | E036 | FF1A | DE36 | 8D1A | D246 |
| 0000270060 | 5016 | 899A | 00AA | 8300 | 08C4 | 003D | 7400 | E903 |
| 0000270100 | 000F | 068E | 31C2 | 8326 | 293E | 00AE | 0375 | 3BE9 |
| 0000270120 | 1E00 | F368 | 8D1C | E046 | 5016 | 468D | 16D2 | 8D50 |
| 0000270140 | F246 | 5016 | 9468 | 1E02 | 5268 | FF1D | DC36 | FF1A |
| 0000270160 | DA36 | FF1A | E036 | FF1A | DE36 | 9A1A | AAD2 | 0000 |
| 0000270200 | C483 | 891E | F246 | 5689 | E9F4 | 0008 | C02B | 4689 |
| 0000270220 | 89F4 | F246 | 3E83 | 1D6E | 7400 | E903 | 002E | 068E |
| 0000270240 | 31C6 | 8326 | 7E3E | 0027 | 0374 | 1FE9 | C700 | 6E06 |
| 0000270260 | 011D | 8E00 | C806 | 2631 | 02A1 | A300 | 1D72 | 068E |

THU MAR 14 17:25:16 1991 CRV_IPS.DLL PAGE 101, LINE 5901

| | | | | | | | | |
|---|---|---|---|---|---|---|---|---|
| 0000270300 | 31CA | A126 | 0000 | 70A3 | E91D | 000C | 06C7 | 1D72 |
| 0000270320 | 0005 | 06C7 | 1D70 | 0005 | EC9A | 8D9D | 89AE | F646 |
| 0000270340 | 5689 | C7F8 | EE46 | 0001 | 03E9 | FF00 | EE46 | 7E83 |
| 0000270360 | 04EE | 037E | 4FE9 | 8B05 | EE46 | 3FE9 | C700 | DA46 |
| 0000270400 | 0000 | 72A1 | 891D | D046 | 4CE9 | A100 | 1D70 | 4689 |
| 0000270420 | C7DA | D046 | 0000 | 3EE9 | C700 | DA46 | 0000 | 72A1 |
| 0000270440 | F71D | 89D8 | D046 | 2EE9 | A100 | 1D70 | D8F7 | 4689 |
| 0000270460 | C7DA | D046 | 0000 | 1EE9 | E900 | 001B | 7548 | E903 |
| 0000270500 | FFBB | 7548 | E903 | FFC3 | 7548 | E903 | FFCB | 7548 |
| 0000270520 | E903 | FFD5 | 00E9 | C700 | AE06 | 0047 | FF00 | 8836 |
| 0000270540 | FF50 | 8636 | 6A50 | 1E04 | AE68 | 9A47 | CF29 | B19A |
| 0000270560 | C483 | 3D0A | 0000 | 0375 | 7DE9 | 8E00 | C006 | 2631 |
| 0000270600 | 3E83 | B1CA | 7500 | E903 | 0009 | 7E83 | FED6 | 0374 |
| 0000270620 | 0FE9 | 8E00 | C206 | 2631 | 3E83 | B1E2 | 7500 | E903 |
| 0000270640 | 0050 | 46C7 | 9CD8 | FFFF | DE76 | 76FF | 8DDC | D846 |
| 0000270660 | 5016 | 76FF | FFEC | FC76 | 76FF | 8DFA | E04E | 5116 |
| 0000270700 | 4E8D | 16F2 | 8D51 | D24E | 5116 | 681E | 1D52 | BF68 |
| 0000270720 | FF02 | DC36 | FF1A | DA36 | FF1A | E036 | FF1A | DE36 |
| 0000270740 | 9A1A | B22A | 0000 | C483 | 8B28 | D846 | 46E9 | E905 |
| 0000270760 | 0006 | 9CB8 | E9FF | 053D | 006A | 206A | D39A | 00B2 |
| 0000271000 | FF00 | D076 | 76FF | 9ADA | 6206 | B1B6 | C483 | C704 |
| 0000271020 | E206 | 011A | FF00 | 8C36 | FF50 | 8A36 | 6A50 | 1E02 |
| 0000271040 | E268 | 9A1A | CF29 | B2E6 | C483 | 3D0A | 0000 | 0375 |
| 0000271060 | 7DE9 | 8E00 | C006 | 2631 | 3E83 | B257 | 7500 | E903 |
| 0000271100 | 0009 | 7E83 | FED6 | 0374 | 0FE9 | 8E00 | C206 | 2631 |
| 0000271120 | 3E83 | B26F | 7500 | E903 | 0050 | 46C7 | 9CD8 | FFFF |
| 0000271140 | DE76 | 76FF | 8DDC | D846 | 5016 | 76FF | FFEC | FC76 |
| 0000271160 | 76FF | 8DFA | E04E | 5116 | 4E8D | 16F2 | 8D51 | D24E |
| 0000271200 | 5116 | 681E | 1D52 | C868 | FF02 | DC36. | FF1A | DA36 |
| 0000271220 | FF1A | E036 | FF1A | DE36 | 9A1A | B2B8 | 0000 | C483 |
| 0000271240 | 8B28 | D846 | 8EE9 | E904 | 0006 | 9CB8 | E9FF | 0485 |
| 0000271260 | D09A | 8FB6 | 89B3 | F046 | 003D | 7500 | E903 | 007E |
| 0000271300 | 068E | 31C0 | 8326 | 163E | 00B3 | 0375 | 09E9 | 8300 |
| 0000271320 | D67E | 74FE | E903 | 000F | 068E | 31C2 | 8326 | 2E3E |
| 0000271340 | 00B3 | 0375 | 51E9 | 8B00 | F046 | 4689 | FFD8 | DE76 |
| 0000271360 | 76FF | 8DDC | D846 | 5016 | 76FF | FFEC | FC76 | 76FF |
| 0000271400 | 8DFA | E04E | 5116 | 4E8D | 16F2 | 8D51 | D24E | 5116 |
| 0000271420 | 681E | 1D52 | CC68 | FF02 | DC36 | FF1A | DA36 | FF1A |
| 0000271440 | E036 | FF1A | DE36 | 9A1A | B376 | 0000 | C483 | 8B28 |
| 0000271460 | D846 | 00E9 | E904 | 0006 | 468B | E9F0 | 03F7 | 006A |
| 0000271500 | 646A | 209A | 009D | 8B00 | D046 | D8F7 | 8B50 | DA46 |
| 0000271520 | D8F7 | 9A50 | 6206 | B302 | C483 | C704 | AE06 | 0247 |
| 0000271540 | FF00 | 8836 | FF50 | 8636 | 6A50 | 1E04 | AE68 | 9A47 |
| 0000271560 | CF29 | B435 | C483 | 3D0A | 0000 | 0375 | 7DE9 | 8E00 |
| 0000271600 | C006 | 2631 | 3E83 | B3A3 | 7500 | E903 | 0009 | 7E83 |
| 0000271620 | FED6 | 0374 | 0FE9 | 8E00 | C206 | 2631 | 3E83 | B3BB |
| 0000271640 | 7500 | E903 | 0050 | 46C7 | 9CD8 | FFFF | DE76 | 76FF |
| 0000271660 | 8DDC | D846 | 5016 | 76FF | FFEC | FC76 | 76FF | 8DFA |
| 0000271700 | E04E | 5116 | 4E8D | 16F2 | 8D51 | D24E | 5116 | 681E |
| 0000271720 | 1D52 | D668 | FF02 | DC36 | FF1A | DA36 | FF1A | E036 |
| 0000271740 | FF1A | DE36 | 9A1A | B404 | 0[illegible]00 | C483 | 8B28 | D846 |
| 0000271760 | 42E9 | E903 | 0006 | 9CB8 | E9FF | 0339 | D09A | 40B6 |
| 0000272000 | 89AC | F046 | 003D | 7500 | E903 | 007E | 068E | 31C0 |
| 0000272020 | 8326 | 493E | 00B4 | 0375 | 09E9 | 8300 | D67E | 74FE |
| 0000272040 | E903 | 000F | 068E | 31C2 | 8326 | 613E | 00B4 | 0375 |
| 0000272060 | 51E9 | 8B00 | F046 | 4689 | FFD8 | DE76 | 76FF | 8DDC |
| 0000272100 | D846 | 5016 | 76FF | FFEC | FC76 | 76FF | 8DFA | E04E |
| 0000272120 | 5116 | 4E8D | 16F2 | 8D51 | D24E | 5116 | 681E | 1D52 |
| 0000272140 | DA68 | FF02 | DC36 | FF1A | DA36 | FF1A | E036 | FF1A |

THU MAR 14 17:25:16 1991 CRV_IPS.DLL PAGE 102, LINE 5960

| | | | | | | | | |
|---|---|---|---|---|---|---|---|---|
| 0000272160 | DE36 | 9A1A | AE71 | 0000 | C483 | 8B28 | D846 | B4E9 |
| 0000272200 | E902 | 0006 | 468B | E9F0 | 02AB | 3E83 | 47B0 | 7400 |
| 0000272220 | E903 | 01AF | 36FF | 5090 | 36FF | 508E | 0E6A | 681E |
| 0000272240 | 1AE4 | 959A | 6BCF | 83B0 | 0AC4 | 003D | 7500 | E903 |
| 0000272260 | 007D | 068E | 31C0 | 8326 | AD3E | 00AF | 0375 | 09E9 |
| 0000272300 | 8300 | D67E | 74FE | E903 | 000F | 068E | 31C2 | 8326 |
| 0000272320 | D93E | 00AF | 0375 | 50E9 | C700 | D846 | FF9C | 76FF |
| 0000272340 | FFDE | DC76 | 468D | 16D8 | FF50 | EC76 | 76FF | FFFC |
| 0000272360 | FA76 | 4E8D | 16E0 | 8D51 | F24E | 5116 | 4E8D | 16D2 |
| 0000272400 | 1E51 | 5268 | 681D | 02E0 | 36FF | 1ADC | 36FF | 1ADA |
| 0000272420 | 36FF | 1AE0 | 36FF | 1ADE | BD9A | 00B5 | 8300 | 28C4 |
| 0000272440 | 468B | E9D8 | 020F | 06E9 | B800 | FF9C | 06E9 | FF02 |
| 0000272460 | E436 | 9A1A | 6303 | B4D2 | C483 | FF02 | E636 | 9A1A |
| 0000272500 | 6347 | B4DF | C483 | 9A02 | CD11 | B243 | EC9A | 0B9D |
| 0000272520 | 2BB5 | F646 | 561B | 89F8 | F646 | 5689 | 8EF8 | C006 |
| 0000272540 | 2631 | 3E83 | B55D | 7500 | E9D3 | 005A | 7E83 | FED6 |
| 0000272560 | 0375 | 51E9 | FF00 | EE76 | E29A | 1162 | 50B5 | C19A |
| 0000272600 | D962 | 50B5 | 76FF | FFF8 | F676 | 681E | 1CFA | 468D |
| 0000272620 | 16E0 | 8D50 | F246 | 5016 | 468D | 16D2 | 1E50 | 5268 |
| 0000272640 | 681D | 02E6 | 36FF | 1ADC | 36FF | 1ADA | 36FF | 1AE0 |
| 0000272660 | 36FF | 1ADE | 681E | 1D22 | 3B68 | 68B6 | B63E | 419A |
| 0000272700 | 00B6 | 8300 | 30C4 | 068E | 31C0 | 8326 | EE3E | 00B5 |
| 0000272720 | 0375 | 09E9 | 8300 | D67E | 74FE | E903 | 000F | 068E |
| 0000272740 | 31C2 | 8326 | 673E | 00B6 | 0375 | 50E9 | C700 | D846 |
| 0000272760 | 0000 | 76FF | FFDE | DC76 | 468D | 16D8 | FF50 | EC76 |
| 0000273000 | 76FF | FFFC | FA76 | 4E8D | 16E0 | 8D51 | F24E | 5116 |
| 0000273020 | 4E8D | 16D2 | 1E51 | 5268 | 681D | 02E7 | 36FF | 1ADC |
| 0000273040 | 36FF | 1ADA | 36FF | 1AE0 | 36FF | 1ADE | AF9A | 00B6 |
| 0000273060 | 8300 | 28C4 | 468B | E9D8 | 00FB | 06E9 | B800 | 0000 |
| 0000273100 | F2E9 | E900 | FAA5 | EC9A | FE9D | 2BB0 | F646 | 561B |
| 0000273120 | 89F8 | F646 | 5689 | 8EF8 | C006 | 2631 | 3E83 | B64F |
| 0000273140 | 7500 | E903 | 0052 | 7E83 | FED6 | 0375 | 49E9 | FF00 |
| 0000273160 | B036 | FF47 | EE76 | 76FF | FFF8 | F676 | 681E | 1D2A |
| 0000273200 | 468D | 16E0 | 8D50 | F246 | 5016 | 468D | 16D2 | 1E50 |
| 0000273220 | 5268 | 681D | 02EC | 36FF | 1ADC | 36FF | 1ADA | 36FF |
| 0000273240 | 1AE0 | 36FF | 1ADE | 681E | 1D4A | EC68 | 68AE | AEEF |
| 0000273260 | F29A | 00AE | 8300 | 2EC4 | 068E | 31C0 | 8326 | 123E |
| 0000273300 | 00B1 | 0375 | 09E9 | 8300 | D67E | 74FE | E903 | 000F |
| 0000273320 | 068E | 31C2 | 8326 | 2A3E | 00B1 | 0375 | 50E9 | C700 |
| 0000273340 | D846 | FFFF | 76FF | FFDE | DC76 | 468D | 16D8 | FF50 |
| 0000273360 | EC76 | 76FF | FFFC | FA76 | 4E8D | 16E0 | 8D51 | F24E |
| 0000273400 | 5116 | 4E8D | 16D2 | 1E51 | 5268 | 681D | 02ED | 36FF |
| 0000273420 | 1ADC | 36FF | 1ADA | 36FF | 1AE0 | 36FF | 1ADE | 729A |
| 0000273440 | 00B1 | 8300 | 28C4 | 468B | E9D8 | 0009 | 06E9 | B800 |
| 0000273460 | FFFF | 00E9 | 5E00 | 835F | 02ED | E58B | 5D1F | CB4D |
| 0000273500 | 581E | 4590 | 8B55 | 1EEC | D88E | EC81 | 0006 | 5657 |
| 0000273520 | C02B | 4689 | 89FC | FA46 | 4683 | 01FA | 5683 | 00FC |
| 0000273540 | 7E83 | 00FC | 0376 | 0AE9 | 8100 | FA7E | C350 | 0377 |
| 0000273560 | 06E9 | B800 | FF9C | 34E9 | FF00 | 8836 | FF50 | 8636 |
| 0000273600 | 6A50 | 1E04 | AE68 | 9A47 | CF95 | B4C6 | C483 | 3D0A |
| 0000273620 | 0000 | 0375 | 06E9 | B800 | FF9C | 10E9 | 8300 | AE3E |
| 0000273640 | 0547 | 0374 | B1E9 | B8FF | 0000 | 00E9 | 5E00 | 835F |
| 0000273660 | 02ED | E58B | 5D1F | CB4D | 581E | 4590 | 8B55 | 1EEC |
| 0000273700 | D88E | EC81 | 0024 | 5657 | 46C7 | 74FA | 8C1D | FC5E |
| 0000273720 | 46C7 | 01F4 | 2B01 | 89C0 | E646 | 4689 | 8EE4 | C006 |
| 0000273740 | 2631 | 3E83 | B820 | 7500 | E903 | 001D | 36FF | 1AE0 |
| 0000273760 | 36FF | 1ADE | 468D | 16DC | 9A50 | AFC3 | 0000 | C483 |
| 0000274000 | 3D08 | 0000 | 0374 | 0FE9 | 8E00 | C2D6 | 2631 | 3E83 |
| 0000274020 | B838 | 7500 | E903 | 003B | 681E | 1D7B | 468D | 16E8 |

THU MAR 14 17:25:16 1991 CRV_IPS.DLL PAGE 103, LINE 6019

| | | | | | | | | |
|---|---|---|---|---|---|---|---|---|
| 0000274040 | 8D50 | DC46 | 5016 | 468D | 16F6 | 6850 | 030D | 681E |
| 0000274060 | 1D82 | 36FF | 1ADC | 36FF | 1ADA | 36FF | 1AE0 | 36FF |
| 0000274100 | 1ADE | 0C9A | 00B0 | 8300 | 1EC4 | 4689 | 89F6 | F856 |
| 0000274120 | 08E9 | 2B00 | 89C0 | F846 | 4689 | 9AF6 | 62C1 | B7F6 |
| 0000274140 | E4A3 | 9A1A | 62E2 | B80C | E6A3 | FF1A | 8836 | FF50 |
| 0000274160 | 8636 | 6A50 | 1E04 | AE68 | 9A47 | CF95 | B71A | C483 |
| 0000274200 | 3D0A | 0000 | 0375 | 7DE9 | 8E00 | C006 | 2631 | 3E83 |
| 0000274220 | B4F4 | 7500 | E903 | 0009 | 7E83 | FEE0 | 0374 | 0FE9 |
| 0000274240 | 8E00 | C206 | 2631 | 3E83 | B575 | 7500 | E903 | 0050 |
| 0000274260 | 46C7 | 9CE2 | FFFF | E676 | 76FF | 8DE4 | E246 | 5016 |
| 0000274300 | 76FF | FFF4 | FC76 | 76FF | 8DFA | E84E | 5116 | 4E8D |
| 0000274320 | 16F6 | 8D51 | DC4E | 5116 | 681E | 1D82 | 1468 | FF03 |
| 0000274340 | DC36 | FF1A | DA36 | FF1A | E036 | FF1A | DE36 | 9A1A |
| 0000274360 | B4A9 | 0000 | C483 | 8B28 | E246 | 6DE9 | E902 | 0006 |
| 0000274400 | 9CB8 | E9FF | 0264 | 3E83 | 47AE | 7405 | E903 | 01DD |
| 0000274420 | 36FF | 5090 | 36FF | 508E | 0E6A | 681E | 1AE4 | 299A |
| 0000274440 | 52CF | 83B9 | 0AC4 | 003D | 7500 | E903 | 007D | 068E |
| 0000274460 | 31C0 | 8326 | 663E | 00B9 | 0375 | 09E9 | 8300 | E07E |
| 0000274500 | 74FE | E903 | 000F | 068E | 31C2 | 8326 | 7E3E | 00B9 |
| 0000274520 | 0375 | 50E9 | C700 | E246 | FF9C | 76FF | FFE6 | E476 |
| 0000274540 | 468D | 16E2 | FF50 | F476 | 76FF | FFFC | FA76 | 4E8D |
| 0000274560 | 16E8 | 8D51 | F64E | 5116 | 4E8D | 16DC | 1E51 | 8268 |
| 0000274600 | 681D | 031C | 36FF | 1ADC | 36FF | 1ADA | 36FF | 1AE0 |
| 0000274620 | 36FF | 1ADE | C69A | 00B9 | 8300 | 28C4 | 468B | E9E2 |
| 0000274640 | 01C8 | 06E9 | B800 | FF9C | BFE9 | C701 | E206 | 011A |
| 0000274660 | FF00 | 8C36 | FF50 | 8A36 | 6A50 | 1E02 | E268 | 9A1A |
| 0000274700 | CF29 | B9F3 | C483 | 3D0A | 0000 | 0375 | 7DE9 | 8E00 |
| 0000274720 | C006 | 2631 | 3E83 | BA07 | 7500 | E903 | 0009 | 7E83 |
| 0000274740 | FEE0 | 0374 | 0FE9 | 8E00 | C206 | 2631 | 3E83 | BA1F |
| 0000274760 | 7500 | E903 | 0050 | 46C7 | 9CE2 | FFFF | E676 | 76FF |
| 0000275000 | 8DE4 | E246 | 5016 | 76FF | FFF4 | FC76 | 76FF | 8DFA |
| 0000275020 | E84E | 5116 | 4E8D | 16F6 | 8D51 | DC4E | 5116 | 681E |
| 0000275040 | 1D82 | 2068 | FF03 | DC36 | FF1A | DA36 | FF1A | E036 |
| 0000275060 | FF1A | DE36 | 9A1A | BA67 | 0000 | C483 | 8B28 | E246 |
| 0000275100 | 27E9 | E901 | 0006 | 9CB8 | E9FF | 011E | 06C7 | 47AE |
| 0000275120 | 0000 | 36FF | 5088 | 36FF | 5086 | 046A | 681E | 47AE |
| 0000275140 | 299A | EECF | 83B7 | 0AC4 | 003D | 7500 | E903 | 007D |
| 0000275160 | 068E | 31C0 | 8326 | 843E | 00BA | 0375 | 09E9 | 8300 |
| 0000275200 | E07E | 74FE | E903 | 000F | 068E | 31C2 | 8326 | 9C3E |
| 0000275220 | 00BA | 0375 | 50E9 | C700 | E246 | FF9C | 76FF | FFE6 |
| 0000275240 | E476 | 468D | 16E2 | FF50 | F476 | 76FF | FFFC | FA76 |
| 0000275260 | 4E8D | 16E8 | 8D51 | F64E | 5116 | 4E8D | 16DC | 1E51 |
| 0000275300 | 8268 | 681D | 0324 | 36FF | 1ADC | 36FF | 1ADA | 36FF |
| 0000275320 | 1AE0 | 36FF | 1ADE | E49A | 00BA | 8300 | 28C4 | 468B |
| 0000275340 | E9E2 | 0086 | 06E9 | B800 | FF9C | 7DE9 | 8E00 | C006 |
| 0000275360 | 2631 | 3E83 | B774 | 7500 | E903 | 0009 | 7E83 | FEE0 |
| 0000275400 | 0374 | 0FE9 | 8E00 | C206 | 2631 | 3E83 | B7A0 | 7500 |
| 0000275420 | E903 | 0050 | 46C7 | 00E2 | FF00 | E676 | 76FF | 8DE4 |
| 0000275440 | E246 | 5016 | 76FF | FFF4 | FC76 | 76FF | 8DFA | E84E |
| 0000275460 | 5116 | 4E8D | 16F6 | 8D51 | DC4E | 5116 | 681E | 1D82 |
| 0000275500 | 2B68 | FF03 | DC36 | FF1A | DA36 | FF1A | E036 | FF1A |
| 0000275520 | DE36 | 9A1A | B880 | 0000 | C483 | 8B28 | E246 | 09E9 |
| 0000275540 | E900 | 0006 | 00B8 | E900 | 0000 | 5F5E | ED83 | 8B02 |
| 0000275560 | 1FE5 | 4D5D | 1ECB | 9058 | 5545 | EC8B | 8E1E | 81D8 |
| 0000275600 | 48EC | 5700 | C756 | F846 | 1D9C | 5E8C | C7FA | DC46 |
| 0000275620 | 0101 | C02B | 4689 | 89C6 | C446 | 068E | 31C0 | 8326 |
| 0000275640 | E93E | 00BB | 0375 | 1DE9 | FF00 | E036 | FF1A | DE36 |
| 0000275660 | 8D1A | BA46 | 5016 | 8A9A | 00B7 | 8300 | 08C4 | 003D |
| 0000275700 | 7400 | E903 | 000F | 068E | 31C2 | 8326 | 013E | 00BC |

THU MAR 14 17:25:16 1991 CRV_IPS.DLL PAGE 104, LINE 6078

| | | | | | | | | |
|---|---|---|---|---|---|---|---|---|
| 0000275720 | 0375 | 3BE9 | 1E00 | A368 | 8D1D | CA46 | 5016 | 468D |
| 0000275740 | 16BA | 8D50 | E846 | 5016 | 3868 | 1E03 | BE68 | FF1D |
| 0000275760 | DC36 | FF1A | DA36 | FF1A | E036 | FF1A | DE36 | 9A1A |
| 0000276000 | B7D3 | 0000 | C483 | 891E | E846 | 5689 | E9EA | 0008 |
| 0000276020 | C02B | 4689 | 89EA | E846 | 5EC4 | 2606 | 478B | 8928 |
| 0000276040 | E646 | 4689 | C4FC | 065E | 8B26 | 2A47 | 4689 | 89E2 |
| 0000276060 | F646 | 5EC4 | 2606 | 478A | 8824 | DA46 | 76FF | FF08 |
| 0000276100 | 0676 | 979A | 709F | 83BC | 04C4 | 003D | 7500 | E903 |
| 0000276120 | 007D | 068E | 31C0 | 8326 | 873E | 00BC | 0375 | 09E9 |
| 0000276140 | 8300 | BE7E | ,4FE | E903 | 000F | 068E | 31C2 | 8326 |
| 0000276160 | 9F3E | 00BC | 0375 | 50E9 | C700 | C046 | FFFF | 76FF |
| 0000276200 | FFC6 | C476 | 468D | 16C0 | FF50 | DC76 | 76FF | FFFA |
| 0000276220 | F876 | 4E8D | 16CA | 8D51 | E84E | 5116. | 4E8D | 16BA |
| 0000276240 | 1E51 | BE68 | 681D | 034E | 36FF | 1ADC | 36FF | 1ADA |
| 0000276260 | 36FF | 1AE0 | 36FF | 1ADE | E89A | 00BC | 8300 | 28C4 |
| 0000276300 | 468B | E9C0 | 0A47 | 06E9 | B800 | FFFF | 3EE9 | 8D0A |
| 0000276320 | E246 | 5016 | 468D | 16E6 | 8A50 | DA46 | 9A50 | F8DC |
| 0000276340 | BD14 | C483 | 890A | DE46 | 003D | 7500 | E903 | 007E |
| 0000276360 | 068E | 31C0 | 8326 | 2B3E | 00BD | 0375 | 09E9 | 8300 |
| 0000276400 | BE7E | 74FE | E903 | 000F | 068E | 31C2 | 8326 | 433E |
| 0000276420 | 00BD | 0375 | 51E9 | 8B00 | DE46 | 4689 | FFC0 | C676 |
| 0000276440 | 76FF | 8DC4 | C046 | 5016 | 76FF | FFDC | FA76 | 76FF |
| 0000276460 | 8DF8 | CA4E | 5116 | 4E8D | 16E8 | 8D51 | BA4E | 5116 |
| 0000276500 | 681E | 1DBE | 5268 | FF03 | DC36 | FF1A | DA36 | FF1A |
| 0000276520 | E036 | FF1A | DE36 | 9A1A | BD8C | 0000 | C483 | 8B28 |
| 0000276540 | C046 | A8E9 | E909 | 0006 | 468B | E9DE | 099F | 468D |
| 0000276560 | 16EC | 8D50 | E246 | 5016 | 468D | 16E6 | 8A50 | DA46 |
| 0000276600 | 9A50 | EE4D | BE70 | C483 | 890E | DE46 | 003D | 7500 |
| 0000276620 | E903 | 007E | 068E | 31C0 | 8326 | A93E | 00BD | 0375 |
| 0000276640 | 09E9 | 8300 | BE7E | 74FE | E903 | 000F | 068E | 31C2 |
| 0000276660 | 8326 | DD3E | 00B8 | 0375 | 51E9 | 8B00 | DE46 | 4689 |
| 0000276700 | FFC0 | C676 | 76FF | 8DC4 | C046 | 5016 | 76FF | FFDC |
| 0000276720 | FA76 | 76FF | 8DF8 | CA4E | 5116 | 4E8D | 16E8 | 8D51 |
| 0000276740 | BA4E | 5116 | 681E | 1DBE | 5868 | FF03 | DC36 | FF1A |
| 0000276760 | DA36 | FF1A | E036 | FF1A | DE36 | 9A1A | B925 | 0000 |
| 0000277000 | C483 | 8B28 | C046 | 04E9 | E909 | 0006 | 468B | E9DE |
| 0000277020 | 08FB | 068E | 31C0 | 8326 | B13E | 00BE | 0375 | 4BE9 |
| 0000277040 | 8300 | BE7E | 75FE | E903 | 0042 | 76FF | FFE2 | E676 |
| 0000277060 | 681E | 1DAA | 468D | 16CA | 8D50 | E846 | 5016 | 468D |
| 0000277100 | 16BA | 1E50 | BE68 | 681D | 035A | 36FF | 1ADC | 36FF |
| 0000277120 | 1ADA | 36FF | 1AE0 | 36FF | 1ADE | 681E | 1DB6 | 4968 |
| 0000277140 | 68B5 | B54C | 4F9A | 00B5 | 8300 | 2AC4 | 5EC4 | 2606 |
| 0000277160 | 47C6 | 1825 | 5EC4 | 2606 | 47C6 | 0F24 | 5EC4 | 2606 |
| 0000277200 | 47C7 | 0C1A | 8300 | E67E | 7D00 | E9D3 | 0006 | 01B8 |
| 0000277220 | E900 | 0003 | FFB8 | F7FF | EE6E | 5EC4 | 2606 | 4789 |
| 0000277240 | 8928 | D846 | 7E83 | 00E2 | 037D | 06E9 | B800 | 0001 |
| 0000277260 | 03E9 | B800 | FFFF | 6EF7 | C4F0 | 065E | 8926 | 2A47 |
| 0000277300 | 4689 | 8DC8 | B846 | 5016 | 468D | 16C2 | 8D50 | D646 |
| 0000277320 | 5016 | 468D | 16E4 | FF50 | C876 | 76FF | 9AD8 | F059 |
| 0000277340 | B4DA | C483 | C714 | E046 | 0001 | 03E9 | FF00 | E046 |
| 0000277360 | 468B | 39EC | E046 | 037C | E1E9 | C401 | 065E | 8326 |
| 0000277400 | 013F | 0375 | 90E9 | FF00 | 0876 | 76FF | 9A06 | FFFF |
| 0000277420 | 0000 | 003D | 7500 | E903 | 007D | 068E | 31C0 | 8326 |
| 0000277440 | C53E | 00B8 | 0375 | 09E9 | 8300 | BE7E | 74FE | E903 |
| 0000277460 | 000F | 068E | 31C2 | 8326 | 593E | 00BF | 0375 | 50E9 |
| 0000277500 | C700 | C046 | FFE8 | 76FF | FFC6 | C476 | 468D | 16C0 |
| 0000277520 | FF50 | DC76 | 76FF | FFFA | F876 | 4E8D | 16CA | 8D51 |
| 0000277540 | E84E | 5116 | 4E8D | 16BA | 1E51 | BE68 | 681D | 0367 |
| 0000277560 | 36FF | 1ADC | 36FF | 1ADA | 36FF | 1AE0 | 36FF | 1ADE |

THU MAR 14 17:25:16 1991 CRV_IPS.DLL PAGE 105, LINE 6137

| | | | | | | | | |
|---|---|---|---|---|---|---|---|---|
| 0000277600 | A19A | 00BF | 8300 | 28C4 | 468B | E9C0 | 077F | 06E9 |
| 0000277620 | B800 | FFE8 | 76E9 | FF07 | 0876 | 76FF | 9A06 | FFFF |
| 0000277640 | 0000 | 003D | 7500 | E903 | 007D | 068E | 31C0 | 8326 |
| 0000277660 | F23E | 00BF | 0375 | 09E9 | 8300 | BE7E | 74FE | E903 |
| 0000277700 | 000F | 068E | 31C2 | 8326 | 0A3E | 00C0 | 0375 | 50E9 |
| 0000277720 | C700 | C046 | FFE8 | 76FF | FFC6 | C476 | 468D | 16C0 |
| 0000277740 | FF50 | DC76 | 76FF | FFFA | F876 | 4E8D | 16CA | 8D51 |
| 0000277760 | E84E | 5116 | 4E8D | 16BA | 1E51 | BE68 | 681D | 0369 |
| 0000300000 | 36FF | 1ADC | 36FF | 1ADA | 36FF | 1AE0 | 36FF | 1ADE |
| 0000300020 | 539A | 00C0 | 8300 | 28C4 | 468B | E9C0 | 06EF | 06E9 |
| 0000300040 | B800 | FFE8 | E6E9 | FF06 | E476 | 8B9A | C863 | 83BF |
| 0000300060 | 02C4 | 76FF | 9AD6 | 63D7 | B8B1 | C483 | FF02 | D676 |
| 0000300100 | 76FF | 9AE4 | CCC2 | BFDE | C483 | 9A04 | B748 | BBD5 |
| 0000300120 | 4689 | 3DDE | 0000 | 0375 | 7EE9 | 8E00 | C006 | 2631 |
| 0000300140 | 3E83 | BB31 | 7500 | E903 | 0009 | 7E83 | FEBE | 0374 |
| 0000300160 | 0FE9 | 8E00 | C206 | 2631 | 3E83 | BB5D | 7500 | E903 |
| 0000300200 | 0051 | 468B | 89DE | C046 | 76FF | FFC6 | C476 | 468D |
| 0000300220 | 16C0 | FF50 | DC76 | 76FF | FFFA | F876 | 4E8D | 16CA |
| 0000300240 | 8D51 | E84E | 5116 | 4E8D | 16BA | 1E51 | BE68 | 681D |
| 0000300260 | 036E | 36FF | 1ADC | 36FF | 1ADA | 36FF | 1AE0 | 36FF |
| 0000300300 | 1ADE | 499A | 00BC | 8300 | 28C4 | 468B | E9C0 | 063D |
| 0000300320 | 06E9 | 8B00 | DE46 | 34E9 | E906 | FE11 | 7E83 | 00F2 |
| 0000300340 | 037D | 06E9 | B300 | 0001 | 03E9 | B800 | FFFF | 068E |
| 0000300360 | 31CA | F726 | 002E | C400 | 065E | 8926 | 2847 | 5EC4 |
| 0000300400 | 2606 | 47C7 | 002A | 8300 | F27E | 7D00 | E903 | 0006 |
| 0000300420 | 01B8 | E900 | 0003 | FFB8 | 8EFF | CC06 | 2631 | 2EF7 |
| 0000300440 | 1C66 | 4689 | C7E4 | E046 | 0001 | 03E9 | FF00 | E046 |
| 0000300460 | 76FF | 9AF2 | A06E | C205 | C483 | 3B02 | E046 | 037D |
| 0000300500 | D5E9 | C401 | 065E | 8326 | 013F | 0375 | 90E9 | FF00 |
| 0000300520 | 0876 | 76FF | 9A06 | BE9E | 0000 | 003D | 7500 | E903 |
| 0000300540 | 007D | 068E | 31C0 | 8326 | 893E | 00C1 | 0375 | 09E9 |
| 0000300560 | 8300 | BE7E | 74FE | E903 | 000F | 068E | 31C2 | 8326 |
| 0000300600 | A13E | 00C1 | 0375 | 50E9 | C700 | C046 | FFE8 | 76FF |
| 0000300620 | FFC6 | C476 | 468D | 16C0 | FF50 | DC76 | 76FF | FFFA |
| 0000300640 | F876 | 4E8D | 16CA | 8D51 | E84E | 5116 | 4E8D | 16BA |
| 0000300660 | 1E51 | BE68 | 681D | 0378 | 36FF | 1ADC | 36FF | 1ADA |
| 0000300700 | 36FF | 1AE0 | 36FF | 1ADE | E99A | 00C1 | 8300 | 28C4 |
| 0000300720 | 468B | E9C0 | 0537 | 06E9 | B800 | FFE8 | 2EE9 | FF05 |
| 0000300740 | 0876 | 76FF | 9A06 | BF2E | 0000 | 003D | 7500 | E903 |
| 0000300760 | 007D | 068E | 31C0 | 8326 | 413E | 00BF | 0375 | 09E9 |
| 0000301000 | 8300 | BE7E | 74FE | E903 | 000F | 068E | 31C2 | 8326 |
| 0000301020 | C93E | 00BE | 0375 | 50E9 | C700 | C046 | FFE8 | 76FF |
| 0000301040 | FFC6 | C476 | 468D | 16C0 | FF50 | DC76 | 76FF | FFFA |
| 0000301060 | F876 | 4E8D | 16CA | 8D51 | E84E | 5116 | 4E8D | 16BA |
| 0000301100 | 1E51 | BE68 | 681D | 037A | 36FF | 1ADC | 36FF | 1ADA |
| 0000301120 | 36FF | 1AE0 | 36FF | 1ADE | 119A | 00BF | 8300 | 28C4 |
| 0000301140 | 468B | E9C0 | 04A7 | 06E9 | B800 | FFE8 | 9EE9 | FF04 |
| 0000301160 | E476 | 8B9A | BD63 | 83BF | 02C4 | 006A | 76FF | 9AE4 |
| 0000301200 | CCC2 | C21A | C483 | 9A04 | B748 | BFD6 | 4689 | 3DDE |
| 0000301220 | 0000 | 0375 | 7EE9 | 8E00 | C006 | 2631 | 3E83 | C0F9 |
| 0000301240 | 7500 | E903 | 0009 | 7E83 | FEBE | 0374 | 0FE9 | 8E00 |
| 0000301260 | C206 | 2631 | 3E83 | C111 | 7500 | E903 | 0051 | 468B |
| 0000301300 | 89DE | C046 | 76FF | FFC6 | C476 | 468D | 16C0 | FF50 |
| 0000301320 | DC76 | 76FF | FFFA | F876 | 4E8D | 16CA | 8D51 | E84E |
| 0000301340 | 5116 | 4E8D | 16BA | 1E51 | BE68 | 681D | 037E | 36FF |
| 0000301360 | 1ADC | 36FF | 1ADA | 36FF | 1AE0 | 36FF | 1ADE | 599A |
| 0000301400 | 00C1 | 8300 | 28C4 | 468B | E9C0 | 0401 | 06E9 | 8B00 |
| 0000301420 | DE46 | F8E9 | E903 | FE15 | 5EC4 | 2606 | 47C7 | 0028 |
| 0000301440 | 8300 | F47E | 7D00 | E903 | 0006 | 01B8 | E900 | 0003 |

THU MAR 14 17:25:16 1991 CRV_IPS.DLL PAGE 106, LINE 6196

| | | | | | | | | |
|---|---|---|---|---|---|---|---|---|
| 0000301460 | FFB8 | 8EFF | C806 | 2631 | 2EF7 | 0002 | 5EC4 | 2606 |
| 0000301500 | 4789 | 832A | F47E | 7D00 | E903 | 0006 | 01B8 | E900 |
| 0000301520 | 0003 | FFB8 | 8EFF | CE06 | 2631 | 2EF7 | 1C68 | 4689 |
| 0000301540 | C7D6 | E046 | 0001 | 03E9 | FF00 | E046 | 76FF | 9AF4 |
| 0000301560 | A06E | C441 | C483 | 3B02 | E046 | 037D | D5E9 | C401 |
| 0000301600 | 065E | 8326 | 013F | 0375 | 90E9 | FF00 | 0876 | 76FF |
| 0000301620 | 9A06 | C0E6 | 0000 | 003D | 7500 | E903 | 007D | 068E |
| 0000301640 | 31C0 | 8326 | C53E | 00C3 | 0375 | 09E9 | 8300 | BE7E |
| 0000301660 | 74FE | E903 | 000F | 068E | 31C2 | 8326 | DD3E | 00C3 |
| 0000301700 | 0375 | 50E9 | C700 | C046 | FFE8 | 76FF | FFC6 | C476 |
| 0000301720 | 468D | 16C0 | FF50 | DC76 | 76FF | FFFA | F876 | 4E8D |
| 0000301740 | 16CA | 8D51 | E84E | 5116 | 4E8D | 16BA | 1E51 | BE68 |
| 0000301760 | 681D | 0388 | 36FF | 1ADC | 36FF | 1ADA | 36FF | 1AE0 |
| 0000302000 | 36FF | 1ADE | 259A | 00C4 | 8300 | 28C4 | 468B | E9C0 |
| 0000302020 | 02FB | D6E9 | B800 | FFE8 | F2E9 | FF02 | 0876 | 76FF |
| 0000302040 | 9A06 | C176 | 0000 | 003D | 7500 | E903 | 007D | 068E |
| 0000302060 | 31C0 | 8326 | 6A3E | 00C4 | 0375 | 09E9 | 8300 | BE7E |
| 0000302100 | 74FE | E903 | 000F | 068E | 31C2 | 8326 | 823E | 00C4 |
| 0000302120 | 0375 | 50E9 | C700 | C046 | FFE8 | 76FF | FFC6 | C476 |
| 0000302140 | 468D | 16C0 | FF50 | DC76 | 76FF | FFFA | F876 | 4E8D |
| 0000302160 | 16CA | 8D51 | E84E | 5116 | 4E8D | 16BA | 1E51 | BE68 |
| 0000302200 | 681D | 038A | 36FF | 1ADC | 36FF | 1ADA | 36FF | 1AE0 |
| 0000302220 | 36FF | 1ADE | CB9A | 00C4 | 8300 | 28C4 | 468B | E9C0 |
| 0000302240 | 026B | D6E9 | B800 | FFE8 | 62E9 | FF02 | D676 | D79A |
| 0000302260 | C663 | 83C0 | 02C4 | 76FF | 6AD6 | 9A00 | CCC2 | C456 |
| 0000302300 | C483 | 9A04 | B748 | C596 | 4689 | 3DDE | 0000 | 0375 |
| 0000302320 | 7EE9 | 8E00 | C006 | 2631 | 3E83 | C4FA | 7500 | E903 |
| 0000302340 | 0009 | 7E83 | FEBE | 0374 | 0FE9 | 8E00 | C206 | 2631 |
| 0000302360 | 3E83 | C512 | 7500 | E903 | 0051 | 468B | 89DE | C046 |
| 0000302400 | 76FF | FFC6 | C476 | 468D | 16C0 | FF50 | DC76 | 76FF |
| 0000302420 | FFFA | F876 | 4E8D | 16CA | 8D51 | E84E | 5116 | 4E8D |
| 0000302440 | 16BA | 1E51 | BE68 | 681D | 038E | 36FF | 1ADC | 36FF |
| 0000302460 | 1ADA | 36FF | 1AE0 | 36FF | 1ADE | 5A9A | 00C5 | 8300 |
| 0000302500 | 28C4 | 468B | E9C0 | 01C5 | 06E9 | 8B00 | DE46 | BCE9 |
| 0000302520 | E901 | FE15 | 0C6A | FF9A | 00FF | 3D00 | 0000 | 0375 |
| 0000302540 | 7DE9 | 8E00 | C006 | 2631 | 3E83 | C5AA | 7500 | E903 |
| 0000302560 | 0009 | 7E83 | FEBE | 0374 | 0FE9 | 8E00 | C206 | 2631 |
| 0000302600 | 3E83 | C5C2 | 7500 | E903 | 0050 | 46C7 | E8C0 | FFFF |
| 0000302620 | C676 | 76FF | 8DC4 | C046 | 5016 | 76FF | FFDC | FA76 |
| 0000302640 | 76FF | 8DF8 | CA4E | 5116 | 4E8D | 16E8 | 8D51 | BA4E |
| 0000302660 | 5116 | 681E | 1DBE | 9268 | FF03 | DC36 | FF1A | DA36 |
| 0000302700 | FF1A | E036 | FF1A | DE36 | 9A1A | C60A | 0000 | C483 |
| 0000302720 | 8B28 | C046 | 36E9 | E901 | 0006 | E8B8 | E9FF | 012D |
| 0000302740 | 006A | 206A | 8D9A | 00B1 | 8B00 | E646 | 5EC4 | 2606 |
| 0000302760 | 4789 | 8B28 | E246 | 5EC4 | 2606 | 4789 | FF2A | 0876 |
| 0000303000 | 76FF | 9A06 | A319 | C212 | C483 | 3D04 | 0000 | 0375 |
| 0000303020 | 7DE9 | 8E00 | C006 | 2631 | 3E83 | C627 | 7500 | E903 |
| 0000303040 | 0009 | 7E83 | FEBE | 0374 | 0FE9 | 8E00 | C206 | 2631 |
| 0000303060 | 3E83 | C63F | 7500 | E903 | 0050 | 46C7 | FFC0 | FFFF |
| 0000303100 | C676 | 76FF | 8DC4 | C046 | 5016 | 76FF | FFDC | FA76 |
| 0000303120 | 76FF | 8DF8 | CA4E | 5116 | 4E8D | 16E8 | 8D51 | BA4E |
| 0000303140 | 5116 | 681E | 1DBE | 9A68 | FF03 | DC36 | FF1A | DA36 |
| 0000303160 | FF1A | E036 | FF1A | DE36 | 9A1A | C687 | 0000 | C483 |
| 0000303200 | 8B28 | C046 | 86E9 | E900 | 0006 | FFB8 | E9FF | 007D |
| 0000303220 | 068E | 31C0 | 8326 | 2E3E | 00C2 | 0375 | 09E9 | 8300 |
| 0000303240 | BE7E | 74FE | E903 | 000F | 068E | 31C2 | 8326 | 463E |
| 0000303260 | 00C2 | 0375 | 50E9 | C700 | C046 | 0000 | 76FF | FFC6 |
| 0000303300 | C476 | 468D | 16C0 | FF50 | DC76 | 76FF | FFFA | F876 |
| 0000303320 | 4E8D | 16CA | 8D51 | E84E | 5116 | 4E8D | 16BA | 1E51 |

THU MAR 14 17:25:16 1991 CRV_IPS.DLL PAGE 107, LINE 6255

| | | | | | | | | |
|---|---|---|---|---|---|---|---|---|
| 0000303340 | BE68 | 681D | 039B | 36FF | 1ADC | 36FF | 1ADA | 36FF |
| 0000303360 | 1AE0 | 36FF | 1ADE | 8F9A | 00C2 | 8300 | 28C4 | 468B |
| 0000303400 | E9C0 | 0009 | 06E9 | B800 | 0000 | 00E9 | 5E00 | 835F |
| 0000303420 | 02ED | E58B | 5D1F | CB4D | 581E | 4590 | 8B55 | 1EEC |
| 0000303440 | D88E | EC81 | 0032 | 5657 | 46C7 | D2FA | 8C1D | FC5E |
| 0000303460 | 46C7 | 01EC | 2B01 | 89C0 | DC46 | 4689 | 8EDA | C006 |
| 0000303500 | 2631 | 3E83 | C761 | 7500 | E903 | 001D | 36FF | 1AE0 |
| 0000303520 | 36FF | 1ADE | 468D | 16D0 | 9A50 | BB47 | 0000 | C483 |
| 0000303540 | 3D08 | 0000 | 0374 | 0FE9 | 8E00 | C206 | 2631 | 3E83 |
| 0000303560 | C779 | 7500 | E903 | 003B | 681E | 1DD9 | 468D | 16DE |
| 0000303600 | 8D50 | D046 | 5016 | 468D | 16F6 | 6850 | 03BC | 681E |
| 0000303620 | 1DE0 | 36FF | 1ADC | 36FF | 1ADA | 36FF | 1AE0 | 36FF |
| 0000303640 | 1ADE | 909A | 00BB | 8300 | 1EC4 | 4689 | 89F6 | F856 |
| 0000303660 | 08E9 | 2B00 | 89C0 | F846 | 4689 | 8EF6 | C606 | 2631 |
| 0000303700 | 3E83 | 277E | 7500 | E903 | 007D | 068E | 31C0 | 8326 |
| 0000303720 | 353E | 00C8 | 0375 | 09E9 | 8300 | D47E | 74FE | E903 |
| 0000303740 | 000F | 068E | 31C2 | 8326 | 4D3E | 00C8 | 0375 | 50E9 |
| 0000303760 | C700 | D646 | FFEA | 76FF | FFDC | DA76 | 468D | 16D6 |
| 0000304000 | FF50 | EC76 | 76FF | FFFC | FA76 | 4E8D | 16DE | 8D51 |
| 0000304020 | F64E | 5116 | 4E8D | 16D0 | 1E51 | E068 | 681D | 03C3 |
| 0000304040 | 36FF | 1ADC | 36FF | 1ADA | 36FF | 1AE0 | 36FF | 1ADE |
| 0000304060 | 959A | 00C8 | 8300 | 28C4 | 468B | E9D6 | 04E9 | 06E9 |
| 0000304100 | B800 | FFEA | E0E9 | C404 | 065E | 8026 | 247F | 740E |
| 0000304120 | E903 | 00D9 | 00B8 | A300 | 1AF6 | F4A3 | C41A | 065E |
| 0000304140 | 8B26 | 2847 | 4689 | C4F4 | 065E | 8B26 | 2A47 | 4689 |
| 0000304160 | C4EE | 065E | 8026 | 257F | 7419 | E903 | 0120 | 76FF |
| 0000304200 | FF08 | 0676 | 059A | 4EBB | 83C4 | 04C4 | 003D | 7400 |
| 0000304220 | E903 | 008A | 006A | F468 | 9A01 | C575 | 0000 | 068E |
| 0000304240 | 31C0 | 8326 | B53E | 00C8 | 0375 | 09E9 | 8300 | D47E |
| 0000304260 | 74FE | E903 | 000F | 068E | 31C2 | 8326 | CD3E | 00C8 |
| 0000304300 | 0375 | 50E9 | C700 | D646 | 06F2 | 76FF | FFDC | DA76 |
| 0000304320 | 468D | 16D6 | FF50 | EC76 | 76FF | FFFC | FA76 | 4E8D |
| 0000304340 | 16DE | 8D51 | F64E | 5116 | 4E8D | 16D0 | 1E51 | E068 |
| 0000304360 | 681D | 03D3 | 36FF | 1ADC | 36FF | 1ADA | 36FF | 1AE0 |
| 0000304400 | 36FF | 1ADE | 159A | 00C9 | 8300 | 28C4 | 468B | E9D6 |
| 0000304420 | 0415 | 06E9 | B800 | 06F2 | 0CE9 | E904 | 007D | 068E |
| 0000304440 | 31C0 | 8326 | 583E | 00C9 | 0375 | 09E9 | 8300 | D47E |
| 0000304460 | 74FE | E903 | 000F | 068E | 31C2 | 8326 | 703E | 00C9 |
| 0000304500 | 0375 | 50E9 | C700 | D646 | FFFF | 76FF | FFDC | DA76 |
| 0000304520 | 468D | 16D6 | FF50 | EC76 | 76FF | FFFC | FA76 | 4E8D |
| 0000304540 | 16DE | 8D51 | F64E | 5116 | 4E8D | 16D0 | 1E51 | E068 |
| 0000304560 | 681D | 03D6 | 36FF | 1ADC | 36FF | 1ADA | 36FF | 1AE0 |
| 0000304600 | 36FF | 1ADE | B89A | 00C9 | 8300 | 28C4 | 468B | E9D6 |
| 0000304620 | 0395 | 06E9 | B800 | FFFF | 8CE9 | E903 | 030C | 06FF |
| 0000304640 | 1B84 | 5EC4 | 2606 | 3F83 | 7501 | E903 | 011C | 76FF |
| 0000304660 | FF08 | 0676 | 229A | 00C3 | 3D00 | 0000 | 0375 | 7DE9 |
| 0000304700 | 8E00 | C006 | 2631 | 3E83 | C9E4 | 7500 | E903 | 0009 |
| 0000304720 | 7E83 | FED4 | 0374 | 0FE9 | 8E00 | C206 | 2631 | 3E83 |
| 0000304740 | C9FC | 7500 | E903 | 0050 | 46C7 | E8D6 | FFFF | DC76 |
| 0000304760 | 76FF | 8DDA | [illegible]646 | 5016 | 76FF | FFEC | FC76 | 76FF |
| 0000305000 | 8DFA | DE4E | 5116 | 4E8D | 16F6 | 8D51 | D04E | 5116 |
| 0000305020 | 681E | 1DE0 | ED68 | FF03 | DC36 | FF1A | DA36 | FF1A |
| 0000305040 | E036 | FF1A | DE36 | 9A1A | CA44 | 0000 | C483 | 8B28 |
| 0000305060 | D646 | F2E9 | E902 | 0006 | E8B8 | E9FF | 02E9 | 0C6A |
| 0000305100 | E79A | 00C4 | 3D00 | 0000 | 0375 | 7DE9 | 8E00 | C006 |
| 0000305120 | 2631 | 3E83 | C335 | 7500 | E903 | 0009 | 7E83 | FED4 |
| 0000305140 | 0374 | 0FE9 | 8E00 | C206 | 2631 | 3E83 | C34D | 7500 |
| 0000305160 | E903 | 0050 | 46C7 | E8D6 | FFFF | DC76 | 76FF | 8DDA |
| 0000305200 | D646 | 5016 | 76FF | FFEC | FC76 | 76FF | 8DFA | DE4E |

THU MAR 14 17:25:16 1991 CRV_IPS.DLL PAGE 108, LINE 6314

| | | | | | | | | |
|---|---|---|---|---|---|---|---|---|
| 0000305220 | 5116 | 4E8D | 16F6 | 8D51 | D04E | 5116 | 681E | 1DE0 |
| 0000305240 | E268 | FF03 | DC36 | FF1A | DA36 | FF1A | E036 | FF1A |
| 0000305260 | DE36 | 9A1A | C395 | 0000 | C483 | 8B28 | D646 | 66E9 |
| 0000305300 | E902 | 0006 | E8B8 | E9FF | 025D | 76FF | FF08 | 0676 |
| 0000305320 | B29A | 00C3 | 3D00 | 0000 | 0375 | 7DE9 | 8E00 | C006 |
| 0000305340 | 2631 | 3E83 | C6D4 | 7500 | E903 | 0009 | 7E83 | FED4 |
| 0000305360 | 0374 | 0FE9 | 8E00 | C206 | 2631 | 3E83 | C700 | 7500 |
| 0000305400 | E903 | 0050 | 46C7 | E8D6 | FFFF | DC76 | 76FF | 8DDA |
| 0000305420 | D646 | 5016 | 76FF | FFEC | FC76 | 76FF | 8DFA | DE4E |
| 0000305440 | 5116 | 4E8D | 16F6 | 8D51 | D04E | 5116 | 681E | 1DE0 |
| 0000305460 | E668 | FF03 | DC36 | FF1A | DA36 | FF1A | E036 | FF1A |
| 0000305500 | DE36 | 9A1A | C7C1 | 0000 | C483 | 8B28 | D646 | D6E9 |
| 0000305520 | E901 | 0006 | E8B8 | E9FF | 01CD | 468D | 16CE | 8D50 |
| 0000305540 | D846 | 5016 | 468D | 16EA | 8D50 | F046 | 5016 | 76FF |
| 0000305560 | FFEE | F476 | 599A | 17F0 | 83C8 | 14C4 | 76FF | 9AFD |
| 0000305600 | 638B | CB1A | C483 | 9A02 | 62C1 | CB29 | 003D | 7C00 |
| 0000305620 | E903 | 000D | 006A | 039A | 0263 | 83C3 | 02C4 | 24E9 |
| 0000305640 | 9A00 | 62C1 | CB50 | 068E | 31C4 | 8B26 | 280E | 490F |
| 0000305660 | C83B | 037C | 0EE9 | 2600 | 28A1 | 480F | 9A50 | 6303 |
| 0000305700 | CB5B | C483 | FF02 | EA76 | D79A | 6363 | 83CB | 02C4 |
| 0000305720 | E29A | 7262 | 3DCB | 0000 | 037C | 0DE9 | 6A00 | 9A00 |
| 0000305740 | 6347 | CB7D | C483 | E902 | 0024 | E29A | 9962 | 8ECB |
| 0000305760 | C406 | 2631 | 0E8B | 0F2A | 3B49 | 7CC8 | E903 | 000E |
| 0000306000 | A126 | 0F2A | 5048 | 479A | 1263 | 83CB | 02C4 | 76FF |
| 0000306020 | FFEA | F076 | C29A | AFCC | 83CB | 04C4 | 489A | 07B7 |
| 0000306040 | 89CB | F246 | 003D | 7500 | E903 | 007E | 068E | 31C0 |
| 0000306060 | 8326 | 413E | 00CC | 0375 | 09E9 | 8300 | D47E | 74FE |
| 0000306100 | E903 | 000F | 068E | 31C2 | 8326 | 593E | 00CC | 0375 |
| 0000306120 | 51E9 | 8B00 | F246 | 4689 | FFD6 | DC76 | 76FF | 8DDA |
| 0000306140 | D646 | 5016 | 76FF | FFEC | FC76 | 76FF | 8DFA | DE4E |
| 0000306160 | 5116 | 4E8D | 16F6 | 8D51 | D04E | 5116 | 681E | 1DE0 |
| 0000306200 | F968 | FF03 | DC36 | FF1A | DA36 | FF1A | E036 | FF1A |
| 0000306220 | DE36 | 9A1A | CCA1 | 0000 | C483 | 8B28 | D646 | 86E9 |
| 0000306240 | E900 | 0006 | 468B | E9F2 | 007D | 068E | 31C0 | 8326 |
| 0000306260 | 743E | 00CA | 0375 | 09E9 | 8300 | D47E | 74FE | E903 |
| 0000306300 | 000F | 068E | 31C2 | 8326 | 8C3E | 00CA | 0375 | 50E9 |
| 0000306320 | C700 | D646 | 0000 | 76FF | FFDC | DA76 | 468D | 16D6 |
| 0000306340 | FF50 | EC76 | 76FF | FFFC | FA76 | 4E8D | 16DE | 8D51 |
| 0000306360 | F64E | 5116 | 4E8D | 16D0 | 1E51 | E068 | 681D | 03FB |
| 0000306400 | 36FF | 1ADC | 36FF | 1ADA | 36FF | 1AE0 | 36FF | 1ADE |
| 0000306420 | D49A | 00CA | 8300 | 28C4 | 468B | E9D6 | 0009 | 06E9 |
| 0000306440 | B800 | 0000 | 00E9 | 5E00 | 835F | 02ED | E58B | 5D1F |
| 0000306460 | CB4D | 581E | 4590 | 8B55 | 1EEC | D88E | EC81 | 0000 |
| 0000306500 | 5657 | 7E83 | 0006 | 037D | 0AE9 | 8B00 | 0646 | 0601 |
| 0000306520 | 1AEA | 07E9 | 8B00 | 0646 | 0629 | 1AEC | 7E83 | 0008 |
| 0000306540 | 037D | 0AE9 | 8B00 | 0846 | 0601 | 1AEE | 07E9 | 8B00 |
| 0000306560 | 0846 | 0629 | 1AF0 | 5F5E | ED83 | 8B02 | 1FE5 | 4D5D |
| 0000306600 | 1ECB | 9058 | 5545 | EC8B | 8E1E | 81D8 | 00EC | 5700 |
| 0000306620 | B856 | 0000 | F0A3 | A31A | 1AEE | ECA3 | A31A | 1AEA |
| 0000306640 | 5F5E | ED83 | 8B02 | 1FE5 | 4D5D | 1ECB | 9058 | 5545 |
| 0000306660 | EC8B | 8E1E | 81D8 | 00EC | 5700 | B856 | 0000 | 00E9 |
| 0000306700 | 5E00 | 835F | 02ED | E58B | 5D1F | CB4D | 581E | 4590 |
| 0000306720 | 8B55 | 1EEC | D88E | EC81 | 0034 | 5657 | 46C7 | EBFA |
| 0000306740 | 8C1D | FC5E | 46C7 | 01EC | 2B01 | 89C0 | DC46 | 4689 |
| 0000306760 | 8EDA | C006 | 2631 | 3E83 | CE49 | 7500 | E903 | 001D |
| 0000307000 | 36FF | 1AE0 | 36FF | 1ADE | 468D | 16CE | 9A50 | C6EA |
| 0000307020 | 0000 | C483 | 3D08 | 0000 | 0374 | 0FE9 | 8E00 | C206 |
| 0000307040 | 2631 | 3E83 | CFF5 | 7500 | E903 | 003B | 681E | 1DF2 |
| 0000307060 | 468D | 16DE | 8D50 | CE46 | 5016 | 468D | 16F6 | 6850 |

THU MAR 14 17:25:16 1991 CRV_IPS.DLL PAGE 109, LINE 6373

| | | | | | | | | |
|---|---|---|---|---|---|---|---|---|
| 0000307100 | 0483 | 681E | 1EBA | 36FF | 1ADC | 36FF | 1ADA | 36FF |
| 0000307120 | 1AE0 | 36FF | 1ADE | 339A | 00C7 | 8300 | 1EC4 | 4689 |
| 0000307140 | 89F6 | F856 | 08E9 | 2B00 | 89C0 | F846 | 4689 | C7F6 |
| 0000307160 | EA46 | 0000 | 46C7 | 00D6 | 9A00 | 62C1 | CE1A | 063B |
| 0000307200 | 5076 | 0374 | 14E9 | 9A00 | 62E2 | CE2E | 063B | 5078 |
| 0000307220 | 0374 | 06E9 | C700 | 4E06 | 001B | 9A00 | 62E2 | CE34 |
| 0000307240 | 9A50 | 62C1 | CF91 | 9A50 | D2F0 | CF49 | C483 | 8904 |
| 0000307260 | F446 | 068E | 31C0 | 8326 | C83E | 00CE | 0375 | 53E9 |
| 0000307300 | 8300 | D27E | 75FE | E903 | 004A | 5E8B | C1F4 | 02E3 |
| 0000307320 | B7FF | 1B52 | B7FF | 1B50 | 681E | 1DF9 | 468D | 16DE |
| 0000307340 | 8D50 | F646 | 5016 | 468D | 16CE | 1E50 | BA68 | 681E |
| 0000307360 | 049D | 36FF | 1ADC | 36FF | 1ADA | 36FF | 1AE0 | 36FF |
| 0000307400 | 1ADE | 681E | 1E10 | 1C68 | 68CF | CF1F | 229A | 00CF |
| 0000307420 | 8300 | 2AC4 | 7E83 | 00F4 | 0374 | ACE9 | C701 | EE46 |
| 0000307440 | 0000 | 03E9 | FF00 | EE46 | 7E83 | 04EE | 0372 | 95E9 |
| 0000307460 | 8E01 | C006 | 2631 | 3E83 | CF7A | 7500 | E903 | 0059 |
| 0000307500 | 7E83 | FED2 | 0375 | 50E9 | 8B00 | EE5E | E3D1 | 9F8B |
| 0000307520 | 1B46 | E3C1 | FF02 | 52B7 | FF1B | 50B7 | 1E1B | 1868 |
| 0000307540 | 8D1E | DE46 | 5016 | 468D | 16F6 | 8D50 | CE46 | 5016 |
| 0000307560 | 681E | 1EBA | A468 | FF04 | DC36 | FF1A | DA36 | FF1A |
| 0000307600 | E036 | FF1A | DE36 | 1E1A | 2A68 | 681E | CFC9 | CC68 |
| 0000307620 | 9ACF | CFCF | 0000 | C483 | 8D2A | F046 | 5016 | 4E8D |
| 0000307640 | 16F2 | 8D51 | CC56 | 5216 | 5E8D | 16D8 | 8B53 | EE76 |
| 0000307660 | E6D1 | B4FF | 1B46 | 639A | 62D3 | 83CF | 12C4 | 468D |
| 0000307700 | 16D6 | FF50 | F076 | 76FF | FFF2 | CC76 | 76FF | 9AD8 |
| 0000307720 | D680 | D107 | C483 | 890C | EA46 | 7E83 | 00D6 | 0375 |
| 0000307740 | E0E9 | 8E00 | C006 | 2631 | 3E83 | CFDD | 7500 | E903 |
| 0000307760 | 0054 | 7E83 | FED2 | 0375 | 4BE9 | FF00 | EE76 | E29A |
| 0000310000 | 9762 | 50CF | C19A | 3462 | 50CB | 681E | 1E32 | 468D |
| 0000310020 | 16DE | 8D50 | F646 | 5016 | 468D | 16CE | 1E50 | BA68 |
| 0000310040 | 681E | 04AB | 36FF | 1ADC | 36FF | 1ADA | 36FF | 1AE0 |
| 0000310060 | 36FF | 1ADE | 681E | 1E55 | D168 | 68D0 | D0D4 | D79A |
| 0000310100 | 00D0 | 8300 | 2CC4 | 068E | 31C0 | 8326 | 743E | 00D0 |
| 0000310120 | 0375 | 09E9 | 8300 | D27E | 74FE | E903 | 000F | 068E |
| 0000310140 | 31C2 | 8326 | DB3E | 00CB | 0375 | 50E9 | C700 | D446 |
| 0000310160 | 0000 | 76FF | FFDC | DA76 | 468D | 16D4 | FF50 | EC76 |
| 0000310200 | 76FF | FFFC | FA76 | 4E8D | 16DE | 8D51 | F64E | 5116 |
| 0000310220 | 4E8D | 16CE | 1E51 | BA68 | 681E | 04AC | 36FF | 1ADC |
| 0000310240 | 36FF | 1ADA | 36FF | 1AE0 | 36FF | 1ADE | 249A | 00CC |
| 0000310260 | 8300 | 28C4 | 468B | E9D4 | 029B | 06E9 | B800 | 0000 |
| 0000310300 | 92E9 | E902 | FE5F | BBE9 | C701 | EE46 | 0000 | 03E9 |
| 0000310320 | FF00 | EE46 | 7E83 | 03EE | 0372 | A7E9 | 8E01 | C006 |
| 0000310340 | 2631 | 3E83 | CBC3 | 7500 | E903 | 0062 | 7E83 | FED2 |
| 0000310360 | 0375 | 59E9 | 8B00 | F45E | C38B | E3D1 | D803 | 5E03 |
| 0000310400 | D1EE | 8BE3 | F89F | C11A | 02E3 | B7FF | 1B52 | B7FF |
| 0000310420 | 1B50 | 681E | 1E5D | 468D | 16DE | 8D50 | F646 | 5016 |
| 0000310440 | 468D | 16CE | 1E50 | BA68 | 681E | 04B8 | 36FF | 1ADC |
| 0000310460 | 36FF | 1ADA | 36FF | 1AE0 | 36FF | 1ADE | 681E | 1E6F |
| 0000310500 | EF68 | 68BD | BDF2 | F59A | 00BD | 8300 | 2AC4 | 468D |
| 0000310520 | 16F0 | 8D50 | F24E | 5116 | 568D | 16CC | 8D52 | D85E |
| 0000310540 | 5316 | 768B | 8BF4 | D1FE | 03E6 | 03F7 | EE76 | E6D1 |
| 0000310560 | B4FF | 1AF8 | 639A | A7D3 | 83CB | 12C4 | 468D | 16D6 |
| 0000310600 | FF50 | F076 | 76FF | FFF2 | CC76 | 76FF | 9AD8 | D680 |
| 0000310620 | CE3A | C483 | 890C | EA46 | 7E83 | 00D6 | 0375 | E0E9 |
| 0000310640 | 8E00 | C006 | 2631 | 3E83 | D19B | 7500 | E903 | 0054 |
| 0000310660 | 7E83 | FED2 | 0375 | 4BE9 | FF00 | EE76 | E29A | 5562 |
| 0000310700 | 50D1 | C19A | 0C62 | 50CE | 681E | 1E77 | 468D | 16DE |
| 0000310720 | 8D50 | F646 | 5016 | 468D | 16CE | 1E50 | BA68 | 681E |
| 0000310740 | 04BF | 36FF | 1ADC | 36FF | 1ADA | 36FF | 1AE0 | 36FF |

THU MAR 14 17:25:16 1991 CRV_IPS.DLL PAGE 110, LINE 6432

| | | | | | | | | |
|---|---|---|---|---|---|---|---|---|
| 0000310760 | 1ADE | 681E | 1E9A | 5B68 | 68D2 | D25E | 619A | 00D2 |
| 0000311000 | 8300 | 2CC4 | 068E | 31C0 | 8326 | 1B3E | 00D2 | 0375 |
| 0000311020 | 09E9 | 8300 | D27E | 74FE | E903 | 000F | 068E | 31C2 |
| 0000311040 | 8326 | 873E | 00D2 | 0375 | 5DE9 | C700 | D446 | 0000 |
| 0000311060 | 76FF | FFDC | DA76 | 468D | 16D4 | FF50 | EC76 | 76FF |
| 0000311100 | FFFC | FA76 | 4E8D | 16DE | 8D51 | F64E | 5116 | 4E8D |
| 0000311120 | 16CE | 1E51 | BA68 | 681E | 04C0 | 36FF | 1ADC | 36FF |
| 0000311140 | 1ADA | 36FF | 1AE0 | 36FF | 1ADE | CF9A | 00D2 | 8300 |
| 0000311160 | 28C4 | 468B | E9D4 | 00DD | 06E9 | B800 | 0000 | D4E9 |
| 0000311200 | E900 | FE4D | 068E | 31C0 | 8326 | 6F3E | 00D2 | 0375 |
| 0000311220 | 45E9 | 8300 | D27E | 75FE | E903 | 003C | 681E | 1EA2 |
| 0000311240 | 468D | 16DE | 8D50 | F646 | 5016 | 468D | 16CE | 1E50 |
| 0000311260 | BA68 | 681E | 04C5 | 36FF | 1ADC | 36FF | 1ADA | 36FF |
| 0000311300 | 1AE0 | 36FF | 1ADE | 681E | 1EB2 | 9768 | 68CE | CE9A |
| 0000311320 | 9D9A | 00CE | 8300 | 26C4 | 068E | 31C0 | 8326 | 883E |
| 0000311340 | 00CD | 0375 | 09E9 | 8300 | D27E | 74FE | E903 | 000F |
| 0000311360 | 068E | 31C2 | 8326 | B43E | 00CD | 0375 | 5DE9 | C700 |
| 0000311400 | D446 | FFFF | 76FF | FFDC | DA76 | 468D | 16D4 | FF50 |
| 0000311420 | EC76 | 76FF | FFFC | FA76 | 4E8D | 16DE | 8D51 | F64E |
| 0000311440 | 5116 | 4E8D | 16CE | 1E51 | BA68 | 681E | 04C7 | 36FF |
| 0000311460 | 1ADC | 36FF | 1ADA | 36FF | 1AE0 | 36FF | 1ADE | 3D9A |
| 0000311500 | 00D0 | 8300 | 28C4 | 468B | E9D4 | 0009 | 06E9 | B800 |
| 0000311520 | FFFF | 00E9 | 5E00 | 835F | 02ED | E58B | 5D1F | CB4D |
| 0000311540 | 581E | 4590 | 8B55 | 1EEC | D88E | EC81 | 0004 | 5657 |
| 0000311560 | 46C7 | 00FC | 8300 | 067E | 7C60 | E903 | 0007 | 4683 |
| 0000311600 | 08FC | 17E9 | 8E00 | C406 | 2631 | 28A1 | 2D0F | 0060 |
| 0000311620 | 463B | 7C06 | E903 | 0004 | 4683 | 02FC | 7E83 | 6008 |
| 0000311640 | 037C | 07E9 | 8300 | FC46 | E904 | 0016 | 068E | 31C4 |
| 0000311660 | A126 | 0F2A | 602D | 3B00 | 0846 | 037C | 03E9 | FF00 |
| 0000311700 | FC46 | 468B | E9FC | 000D | 5F5E | ED83 | 8B02 | 1FE5 |
| 0000311720 | 4D5D | 1ECB | 9058 | 5545 | EC8B | 8E1E | 81D8 | 26EC |
| 0000311740 | 5700 | C756 | FA46 | 1ED6 | 5E8C | C7FC | F446 | 0000 |
| 0000311760 | C02B | 4689 | 89E4 | E246 | 068E | 31C0 | 8326 | 443E |
| 0000312000 | 00D4 | 0375 | 1DE9 | FF00 | E036 | FF1A | DE36 | 8D1A |
| 0000312020 | DA46 | 5016 | 9E9A | 00CD | 8300 | 08C4 | 003D | 7400 |
| 0000312040 | E903 | 000F | 068E | 31C2 | 8326 | 593E | 00D5 | 0375 |
| 0000312060 | 3BE9 | 1E00 | DA68 | 8D1E | E646 | 5016 | 468D | 16DA |
| 0000312100 | 8D50 | F646 | 5016 | FA68 | 1E04 | 0A68 | FF1F | DC36 |
| 0000312120 | FF1A | DA36 | FF1A | E036 | FF1A | DE36 | 9A1A | CDE7 |
| 0000312140 | 0000 | C483 | 891E | F646 | 5689 | E9F8 | 0008 | C02B |
| 0000312160 | 4689 | 89F8 | F646 | 3E83 | 1F22 | 7400 | E903 | 0091 |
| 0000312200 | 06C7 | 1F22 | 0001 | 06C7 | 5496 | 0040 | 06C7 | 549A |
| 0000312220 | 0040 | 681E | 549C | 681E | 5498 | 681E | 549A | 681E |
| 0000312240 | 5496 | 519A | 20F1 | 83D1 | 10C4 | 4689 | 8EF2 | C006 |
| 0000312260 | 2631 | 3E83 | D541 | 7500 | E903 | 0055 | 7E83 | FEDE |
| 0000312300 | 0375 | 4CE9 | FF00 | 9A36 | FF54 | 9C36 | FF54 | 9636 |
| 0000312320 | FF54 | 9836 | 1E54 | DE68 | 8D1E | E646 | 5016 | 468D |
| 0000312340 | 16F6 | 8D50 | DA46 | 5016 | 681E | 1F0A | 0C68 | FF05 |
| 0000312360 | DC36 | FF1A | DA36 | FF1A | E036 | FF1A | DE36 | 1E1A |
| 0000312400 | 0268 | 681F | D187 | 8A68 | 9AD1 | D18D | 0000 | C483 |
| 0000312420 | C42E | 105E | C726 | 0007 | C400 | 145E | C726 | 0007 |
| 0000312440 | B800 | 0000 | 5EC4 | 260C | 0789 | 5EC4 | 2608 | 0789 |
| 0000312460 | 46F6 | 0806 | 0375 | 19E9 | A100 | 5496 | D8F7 | 5EC4 |
| 0000312500 | 2610 | 0789 | 98A1 | F754 | C4D8 | 085E | 8926 | E907 |
| 0000312520 | 001B | 46F6 | 0206 | 0375 | 12E9 | A100 | 5496 | 5EC4 |
| 0000312540 | 2610 | 0789 | 98A1 | C454 | 085E | 8926 | F607 | 0646 |
| 0000312560 | 7504 | E903 | 0019 | 9AA1 | F754 | C4D8 | 145E | 8926 |
| 0000312600 | A107 | 549C | D8F7 | 5EC4 | 260C | 0789 | 1BE9 | F600 |
| 0000312620 | 0646 | 7501 | E903 | 0012 | 9AA1 | C454 | 145E | 8926 |

THU MAR 14 17:25:16 1991 CRV_IPS.DLL PAGE 111, LINE 6491

| | | | | | | | | |
|---|---|---|---|---|---|---|---|---|
| 0000312640 | A107 | 549C | 5EC4 | 260C | 0789 | 066E | 31C0 | 8326 |
| 0000312660 | 383E | 00D1 | 0375 | 09E9 | 8300 | DE7E | 74FE | E903 |
| 0000312700 | 000F | 068E | 31C2 | 8326 | B33E | 00D1 | 0375 | 39E9 |
| 0000312720 | 8D00 | E646 | 5016 | 468D | 16F6 | 8D50 | DA46 | 5016 |
| 0000312740 | 681E | 1F0A | 2C68 | FF05 | DC36 | FF1A | DA36 | FF1A |
| 0000312760 | E036 | FF1A | DE36 | 9A1A | FFFF | 0000 | C483 | C71A |
| 0000313000 | E046 | 0000 | 06E9 | E900 | 0003 | 00E9 | 5E00 | 835F |
| 0000313020 | 02ED | E58B | 5D1F | CB4D | 581E | 4590 | 8B55 | 1EEC |
| 0000313040 | D88E | EC81 | 0008 | 5657 | 46C7 | 00FC | 9A00 | 62C1 |
| 0000313060 | D5CC | 062B | 5076 | 4689 | 9AFA | 62E2 | D14F | 062B |
| 0000313100 | 5078 | 4689 | 83F8 | FA7E | 7500 | E903 | 0036 | 76FF |
| 0000313120 | 9AFA | A06E | D5F4 | C483 | 8B02 | F84E | F9D1 | 8B51 |
| 0000313140 | 9AF0 | A06E | D623 | C483 | 3B02 | 7CC6 | E903 | 0014 |
| 0000313160 | 7E83 | 00FA | 037F | 07E9 | 8300 | FC46 | E908 | 0004 |
| 0000313200 | 4683 | 02FC | 7E83 | 00F8 | 0375 | 35E9 | FF00 | F876 |
| 0000313220 | 6E9A | 33A0 | 83D6 | 02C4 | 4E8B | D1FA | 51F9 | F08B |
| 0000313240 | 6E9A | C0A0 | 83D5 | 02C4 | C63B | 037C | 13E9 | 8300 |
| 0000313260 | F87E | 7F00 | E903 | 0007 | 4683 | 04FC | 03E9 | FF00 |
| 0000313300 | FC46 | 76FF | FF14 | 1276 | 76FF | FF10 | 0E76 | 76FF |
| 0000313320 | FF0C | 0A76 | 76FF | FF08 | 0676 | 76FF | 9AFC | D363 |
| 0000313340 | D435 | C483 | 5E12 | 835F | 02ED | E58B | 5D1F | CB4D |
| 0000313360 | 581E | 4590 | 8B55 | 1EEC | D88E | EC81 | 0026 | 5657 |
| 0000313400 | 46C7 | 24FA | 8C1F | FC5E | 46C7 | 01F4 | 2B01 | 89C0 |
| 0000313420 | E446 | 4689 | 8EE2 | C006 | 2631 | 3E83 | D72A | 7500 |
| 0000313440 | E903 | 001D | 36FF | 1AE0 | 36FF | 1ADE | 468D | 16DA |
| 0000313460 | 9A50 | D3A5 | 0000 | C483 | 3D08 | 0000 | 0374 | 0FE9 |
| 0000313500 | 8E00 | C206 | 2631 | 3E83 | D945 | 7500 | E903 | 003B |
| 0000313520 | 681E | 1F2B | 468D | 16E6 | 8D50 | DA46 | 5016 | 468D |
| 0000313540 | 16F6 | 6850 | 056F | 681E | 1F72 | 36FF | 1ADC | 36FF |
| 0000313560 | 1ADA | 36FF | 1AE0 | 36FF | 1ADE | EE9A | 00D3 | 8300 |
| 0000313600 | 1EC4 | 4689 | 89F6 | F856 | 08E9 | 2B00 | 89C0 | F846 |
| 0000313620 | 4689 | 8EF6 | C006 | 2631 | 3E83 | D8D1 | 7500 | E903 |
| 0000313640 | 0051 | 7E83 | FEDE | 0375 | 48E9 | FF00 | 0C76 | 76FF |
| 0000313660 | FF08 | 0A76 | 76FF | 1E06 | 3268 | 8D1F | E646 | 5016 |
| 0000313700 | 468D | 16F6 | 8D50 | DA46 | 5016 | 681E | 1F72 | 7468 |
| 0000313720 | FF05 | DC36 | FF1A | DA36 | FF1A | E036 | FF1A | DE36 |
| 0000313740 | 1E1A | 4968 | 681F | D919 | 1C68 | 9AD9 | D49A | 0000 |
| 0000313760 | C483 | C42E | 0E5E | C726 | 0007 | 9A00 | 62C1 | D799 |
| 0000314000 | 4603 | A30A | 1AE4 | E29A | C362 | 03D7 | 0C46 | E6A3 |
| 0000314020 | 9A1A | B6D0 | D85F | 4689 | 83F2 | F27E | 7400 | E903 |
| 0000314040 | 0027 | 36FF | 509D | 36FF | 508E | 0E6A | 681E | 1AE4 |
| 0000314060 | 299A | F9CF | 83D7 | 0AC4 | 4689 | 83F2 | F27E | 7500 |
| 0000314100 | E903 | 0005 | 46C7 | 9CF2 | 83FF | F27E | 7400 | E903 |
| 0000314120 | 0044 | 06C7 | 47AE | 0000 | 36FF | 5088 | 36FF | 5086 |
| 0000314140 | 046A | 681E | 47AE | 299A | 21CF | 83D8 | 0AC4 | 4689 |
| 0000314160 | 83F2 | F27E | 7500 | E903 | 0005 | 46C7 | 9CF2 | 6AFF |
| 0000314200 | 6A00 | 9A20 | D87A | 0000 | 76FF | FF08 | 0676 | 069A |
| 0000314220 | 3D62 | 83D8 | 04C4 | 06C7 | 1AE2 | 0001 | 36FF | 508C |
| 0000314240 | 36FF | 508A | 026A | 681E | 1AE2 | 299A | 8DCF | 83D8 |
| 0000314260 | 0AC4 | 4689 | 83F2 | F27E | 7500 | E903 | 0005 | 46C7 |
| 0000314300 | 9CF2 | 83FF | F27E | 7400 | E903 | 0019 | D09A | 70B6 |
| 0000314320 | 89D8 | F246 | 7E83 | 00F2 | 0374 | 08E9 | 9A00 | AA47 |
| 0000314340 | D670 | 4689 | 6AF2 | 6A00 | 9A64 | C82A | 0000 | 468B |
| 0000314360 | F708 | 50D8 | 468B | F706 | 50D8 | 069A | A462 | 83D8 |
| 0000314400 | 04C4 | 7E83 | 00F2 | 0374 | 27E9 | 8B00 | 0A46 | D8F7 |
| 0000314420 | 9A50 | 638B | D8B2 | C483 | 8B02 | 0C46 | D8F7 | 9A50 |
| 0000314440 | 63D7 | D5E4 | C483 | C402 | 0E5E | C726 | 0107 | E900 |
| 0000314460 | 0008 | 5EC4 | 260E | 07C7 | 0000 | 068E | 31C0 | 8326 |
| 0000314500 | 2D3E | 00D9 | 0375 | 4DE9 | 8300 | DE7E | 75FE | E903 |

THU MAR 14 17:25:16 1991 CRV_IPS.DLL PAGE 112, LINE 6550

| | | | | | | | | |
|---|---|---|---|---|---|---|---|---|
| 0000314520 | 0044 | 681E | 1F51 | 7E83 | 01F2 | C01B | 5040 | 468D |
| 0000314540 | 16E6 | 8D50 | F646 | 5016 | 468D | 16DA | 1E50 | 7268 |
| 0000314560 | 681F | 05B4 | 36FF | 1ADC | 36FF | 1ADA | 36FF | 1AE0 |
| 0000314600 | 36FF | 1ADE | 681E | 1F6A | 9468 | 68D4 | D497 | DD9A |
| 0000314620 | 0039 | 8300 | 28C4 | 068E | 31C0 | 8326 | 8F3E | 00D3 |
| 0000314640 | 0375 | 09E9 | 8300 | DE7E | 74FE | E903 | 000F | 068E |
| 0000314660 | 31C2 | 8326 | BB3E | 00D3 | 0375 | 51E9 | 8B00 | F246 |
| 0000314700 | 4689 | FFE0 | E476 | 76FF | 8DE2 | E046 | 5016 | 76FF |
| 0000314720 | FFF4 | FC76 | 76FF | 8DFA | E64E | 5116 | 4E8D | 16F6 |
| 0000314740 | 8D51 | DA4E | 5116 | 681E | 1F72 | B568 | FF05 | DC36 |
| 0000314760 | FF1A | DA36 | FF1A | E036 | FF1A | DE36 | 9A1A | D1FB |
| 0000315000 | 0000 | C483 | 8B28 | E046 | 09E9 | E900 | 0006 | 468B |
| 0000315020 | E9F2 | 0000 | 5F5E | ED83 | 8B02 | 1FE5 | 4D5D | 1ECB |
| 0000315040 | 9058 | 5545 | EC8B | 8E1E | 81D8 | 00EC | 5700 | C756 |
| 0000315060 | 4E06 | 001B | E900 | 0000 | 5F5E | ED83 | 8B02 | 1FE5 |
| 0000315100 | 4D5D | 1ECB | 9058 | 5545 | EC8B | 8E1E | 81D8 | 00EC |
| 0000315120 | 5700 | 8B56 | 0646 | 76A3 | 8B50 | 0846 | 78A3 | C750 |
| 0000315140 | 4E06 | 011B | E900 | 0000 | 5F5E | ED83 | 8B02 | 1FE5 |
| 0000315160 | 4D5D | 1ECB | 9058 | 5545 | EC8B | 8E1E | 81D8 | 64EC |
| 0000315200 | 5701 | C756 | FA46 | 1F8B | 5E8C | C7FC | C886 | 01FE |
| 0000315220 | 2B01 | 89C0 | B686 | 89FE | B486 | 8EFE | C006 | 2631 |
| 0000315240 | 3E83 | D6AC | 7500 | E903 | 001E | 36FF | 1AE0 | 36FF |
| 0000315260 | 1ADE | 868D | FEAA | 5016 | C29A | 00D6 | 8300 | 08C4 |
| 0000315300 | 003D | 7400 | E903 | 000F | 068E | 31C2 | 8326 | D83E |
| 0000315320 | 00D6 | 0375 | 40E9 | 1E00 | 9268 | 8D1F | BC86 | 16FE |
| 0000315340 | 8D50 | AA86 | 16FE | 8D50 | CC86 | 16FE | 6850 | 0602 |
| 0000315360 | 681E | 2010 | 36FF | 1ADC | 36FF | 1ADA | 36FF | 1AE0 |
| 0000315400 | 36FF | 1ADE | 0B9A | 00D7 | 8300 | 1EC4 | 8689 | FECC |
| 0000315420 | 9689 | FECE | 0AE9 | 2B00 | 89C0 | CE86 | 89FE | CC86 |
| 0000315440 | C7FE | A286 | 00FE | C700 | B886 | 00FE | C700 | BA86 |
| 0000315460 | 00FE | 8E00 | D006 | 8B31 | 0646 | 568B | 5608 | BF1E |
| 0000315500 | 2780 | F08B | DA8E | A5A5 | A5A5 | 5E1F | 0C6A | 681E |
| 0000315520 | 5086 | 006A | 006A | 006A | 336A | DD9A | C1DF | 83DB |
| 0000315540 | 0EC4 | 8689 | FECA | 003D | 7500 | E903 | 0087 | 068E |
| 0000315560 | 31C0 | 8326 | DF3E | 00DB | 0375 | 0AE9 | 8300 | AEBE |
| 0000315600 | FEFE | 0374 | 0FE9 | 8E00 | C206 | 2631 | 3E83 | DBF8 |
| 0000315620 | 7500 | E903 | 0059 | 86C7 | FEB0 | FF9C | B6FF | FEB6 |
| 0000315640 | B6FF | FEB4 | 868D | FEB0 | 5016 | B6FF | FEC8 | 76FF |
| 0000315660 | FFFC | FA76 | 8E8D | FEBC | 5116 | 8E8D | FECC | 5116 |
| 0000315700 | 8E8D | FEAA | 5116 | 681E | 2010 | 1568 | FF06 | DC36 |
| 0000315720 | FF1A | DA36 | FF1A | E036 | FF1A | DE36 | 9A1A | DC48 |
| 0000315740 | 0000 | C483 | 8B28 | B086 | E9FE | 03E3 | 06E9 | B800 |
| 0000315760 | FF9C | DAE9 | 8D03 | D086 | 16FE | 9A50 | 9B38 | DBAE |
| 0000316000 | C483 | 3D04 | 0000 | 0375 | 06E9 | B800 | FFFF | BEE9 |
| 0000316020 | 6A03 | 6800 | 00C8 | 149A | 00D8 | 9AC0 | CD11 | DD78 |
| 0000316040 | 36FF | 5090 | 36FF | 508E | 0E6A | 681E | 1AE4 | 299A |
| 0000316060 | 67CF | 83DC | 0AC4 | 013D | 1B00 | 40C0 | 8689 | FECA |
| 0000316100 | 003D | 7500 | E903 | 0087 | 068E | 31C0 | 8326 | 323E |
| 0000316120 | 00DA | 0375 | 0AE9 | 8300 | AEBE | FEFE | 0374 | 0FE9 |
| 0000316140 | 8E00 | C206 | 2631 | 3E83 | DA5F | 7500 | E903 | 0059 |
| 0000316160 | 86C7 | FEB0 | FF9C | B6FF | FEB6 | B6FF | FEB4 | 868D |
| 0000316200 | FEB0 | 5016 | B6FF | FEC8 | 76FF | FFFC | FA76 | 8E8D |
| 0000316220 | FEBC | 5116 | 8E8D | FECC | 5116 | 8E8D | FEAA | 5116 |
| 0000316240 | 681E | 2010 | 1F68 | FF06 | DC36 | FF1A | DA36 | FF1A |
| 0000316260 | E036 | FF1A | DE36 | 9A1A | D98E | 0000 | C483 | 8B28 |
| 0000316300 | B086 | E9FE | 0309 | 06E9 | B800 | FF9C | 00E9 | C703 |
| 0000316320 | F846 | 0000 | E29A | 8862 | 8EDC | D006 | 2631 | 0E8B |
| 0000316340 | 2786 | E9D1 | 0326 | 820E | 3B27 | 72C8 | E903 | 0005 |
| 0000316360 | 46C7 | 01F8 | 9A00 | 62C1 | D78E | 068E | 31D0 | 8B26 |

THU MAR 14 17:25:16 1991 CRV_IPS.DLL PAGE 113, LINE 6609

| | | | | | | | | |
|---|---|---|---|---|---|---|---|---|
| 0000316400 | 840E | D127 | 26E9 | 0E03 | 2780 | C83B | 0372 | 19E9 |
| 0000316420 | 8300 | F87E | 7401 | E903 | 0008 | 46C7 | 03F8 | E900 |
| 0000316440 | 0005 | 46C7 | 00F8 | E900 | 0016 | 7E83 | 01F8 | 0374 |
| 0000316460 | 08E9 | C700 | F846 | 0002 | 05E9 | C700 | F846 | 0001 |
| 0000316500 | 468B | E9F8 | 0027 | 86C7 | FE9C | 0005 | 3AE9 | C700 |
| 0000316520 | 9C86 | 07FE | E900 | 0031 | 86C7 | FE9C | 0006 | 28E9 |
| 0000316540 | C700 | 9C86 | 04FE | E900 | 001F | 1CE9 | 0B00 | 75C0 |
| 0000316560 | E903 | FFD2 | 7548 | E903 | FFD5 | 7548 | E903 | FFD8 |
| 0000316600 | 7548 | E903 | FFDB | 00E9 | C700 | 9606 | 0050 | C700 |
| 0000316620 | 9606 | 0052 | C700 | A486 | 96FE | 8C50 | A69E | C7FE |
| 0000316640 | 9E86 | 96FE | 8C52 | A09E | BEFE | 007F | B689 | FEA8 |
| 0000316660 | B689 | FEB2 | 09E9 | 4E00 | 8EFF | FEB2 | 8EFF | FEA8 |
| 0000316700 | FE83 | 7F00 | E903 | 0037 | B6FF | FEA0 | B6FF | FE9E |
| 0000316720 | B6FF | FEA6 | B6FF | FEA4 | FF56 | A8B6 | FFFE | B2B6 |
| 0000316740 | FFFE | 9CB6 | 9AFE | E350 | D7A4 | C483 | 8910 | CA86 |
| 0000316760 | 3DFE | 0000 | 0375 | 03E9 | E900 | 0003 | B8E9 | 9AFF |
| 0000317000 | E31A | DED6 | 068E | 31C0 | 8326 | FB3E | 00DD | 0375 |
| 0000317020 | 51E9 | 8300 | AEBE | FEFE | 0375 | 47E9 | FF00 | 9436 |
| 0000317040 | FF50 | 9236 | 1E50 | 9968 | 8D1F | BC86 | 16FE | 8D50 |
| 0000317060 | CC86 | 16FE | 8D50 | AA86 | 16FE | 1E50 | 1068 | 6820 |
| 0000317100 | 0666 | 36FF | 1ADC | 36FF | 1ADA | 36FF | 1AE0 | 36FF |
| 0000317120 | 1ADE | 681E | 1FC1 | 5168 | 68DE | DE54 | 579A | 00DE |
| 0000317140 | 8300 | 2AC4 | 068E | 31C0 | 8326 | 653E | 00DE | 0375 |
| 0000317160 | 5BE9 | 8300 | AEBE | FEFE | 0375 | 51E9 | 8E00 | CE06 |
| 0000317200 | 2631 | 36FF | 1C68 | 068E | 31CC | FF26 | 6636 | 1E1C |
| 0000317220 | C968 | 8D1F | BC86 | 16FE | 8D50 | CC86 | 16FE | 8D50 |
| 0000317240 | AA86 | 16FE | 1E50 | 1068 | 6820 | 0668 | 36FF | 1ADC |
| 0000317260 | 36FF | 1ADA | 36FF | 1AE0 | 36FF | 1ADE | 681E | 1FDE |
| 0000317300 | BB68 | 68DE | 03BE | C19A | 00DE | 8300 | 2AC4 | 068E |
| 0000317320 | 31C0 | 8326 | DF3E | 00DE | 0375 | 5BE9 | 8300 | AEBE |
| 0000317340 | FEFE | 0375 | 51E9 | 8E00 | C806 | 2631 | 36FF | 0002 |
| 0000317360 | 068E | 31CA | FF26 | 0036 | 1E00 | E668 | 8D1F | BC86 |
| 0000317400 | 16FE | 8D50 | CC86 | 16FE | 8D50 | AA86 | 16FE | 1E50 |
| 0000317420 | 1068 | 6820 | 066A | 36FF | 1ADC | 36FF | 1ADA | 36FF |
| 0000317440 | 1AE0 | 36FF | 1ADE | 681E | 2007 | 7668 | 68D7 | D779 |
| 0000317460 | 7C9A | 00D7 | 8300 | 2AC4 | 068E | 31C6 | C726 | 7E06 |
| 0000317500 | 0027 | 9A00 | 93C2 | DB8E | 068E | 31C0 | 8326 | 053E |
| 0000317520 | 00DB | 0375 | 0AE9 | 8300 | AEBE | FEFE | 0374 | 0FE9 |
| 0000317540 | 8E00 | C206 | 2631 | 3E83 | DB1E | 7500 | E903 | 0059 |
| 0000317560 | 86C7 | FEB0 | 0000 | B6FF | FEB6 | B6FF | FEB4 | 868D |
| 0000317600 | FEB0 | 5016 | B6FF | FEC8 | 76FF | FFFC | FA76 | 8E8D |
| 0000317620 | FEBC | 5116 | 8E8D | FECC | 5116 | 8E8D | FEAA | 5116 |
| 0000317640 | 681E | 2010 | 6D68 | FF06 | DC36 | FF1A | DA36 | FF1A |
| 0000317660 | E036 | FF1A | DE36 | 9A1A | DB6E | 0000 | C483 | 8B28 |
| 0000317700 | B086 | E9FE | 0009 | 06E9 | B800 | 0000 | 00E9 | 5E00 |
| 0000317720 | 835F | 02ED | E58B | 5D1F | CB4D | 581E | 4590 | 8B55 |
| 0000317740 | 1EEC | D88E | EC81 | 0000 | 5657 | 00B8 | E900 | 0000 |
| 0000317760 | 5F5E | ED83 | 8B02 | 1FE5 | 4D5D | 1ECB | 9058 | 5545 |
| 0000320000 | EC8B | 8E1E | 81D8 | 7CEC | 5700 | C756 | FA46 | 2024 |
| 0000320020 | 5E8C | C7FC | 9C46 | 0101 | C02B | 4689 | 898E | 8C46 |
| 0000320040 | 068E | 31C0 | 8326 | 543E | 00E0 | 0375 | 1DE9 | FF00 |
| 0000320060 | E036 | FF1A | DE36 | 8D1A | 8446 | 5016 | 499A | 00DA |
| 0000320100 | 8300 | 08C4 | 003D | 7400 | E903 | 000F | 068E | 31C2 |
| 0000320120 | 8326 | 6C3E | 00E0 | 0375 | 3BE9 | 1E00 | 2B68 | 8D20 |
| 0000320140 | 9046 | 5016 | 468D | 1684 | 8D50 | F446 | 5016 | 9068 |
| 0000320160 | 1E06 | 4068 | FF20 | DC36 | FF1A | DA36 | FF1A | E036 |
| 0000320200 | FF1A | DE36 | 9A1A | DA95 | 0000 | C483 | 891E | F446 |
| 0000320220 | 5689 | E9F6 | 0008 | C02B | 4689 | 89F6 | F446 | 681E |
| 0000320240 | 2032 | 76FF | FF08 | 0676 | CE9A | DA74 | 83E0 | 08C4 |

THU MAR 14 17:25:16 1991 CRV_IPS.DLL PAGE 114, LINE 6668

| | | | | | | | | |
|---|---|---|---|---|---|---|---|---|
| 0000320260 | 4689 | 89A0 | A256 | D00B | 0374 | 7DE9 | 8E00 | C006 |
| 0000320300 | 2631 | 3E83 | E106 | 7500 | E903 | 0009 | 7E83 | FE88 |
| 0000320320 | 0374 | 0FE9 | 8E00 | C206 | 2631 | 3E83 | E11E | 7500 |
| 0000320340 | E903 | 0050 | 46C7 | FF8A | FFFF | 8E76 | 76FF | 8D8C |
| 0000320360 | 8A46 | 5016 | 76FF | FF9C | FC76 | 76FF | 8DFA | 904E |
| 0000320400 | 5116 | 4E8D | 16F4 | 8D51 | 844E | 5116 | 681E | 2040 |
| 0000320420 | 9768 | FF06 | DC36 | FF1A | DA36 | FF1A | E036 | FF1A |
| 0000320440 | DE36 | 9A1A | E166 | 0000 | C483 | 8B28 | 8A46 | 93E9 |
| 0000320460 | E901 | 0006 | FFB8 | E9FF | 018A | 76FF | FFA2 | A076 |
| 0000320500 | 506A | 468D | 16A4 | 9A50 | 9732 | E0F1 | C483 | 8D0A |
| 0000320520 | F846 | 5016 | 681E | 2034 | 76FF | FFA2 | A076 | 409A |
| 0000320540 | B175 | 83E1 | 0CC4 | 7E83 | 00F8 | 0375 | 7DE9 | 8E00 |
| 0000320560 | C006 | 2631 | 3E83 | E1DE | 7500 | E903 | 0009 | 7E83 |
| 0000320600 | FE88 | 0374 | 0FE9 | 8E00 | C206 | 2631 | 3E83 | E1F6 |
| 0000320620 | 7500 | E903 | 005D | 46C7 | 918A | FFFF | 8E76 | 76FF |
| 0000320640 | 8D8C | 8A46 | 5016 | 76FF | FF9C | FC76 | 76FF | 8DFA |
| 0000320660 | 904E | 5116 | 4E8D | 16F4 | 8D51 | 844E | 5116 | 681E |
| 0000320700 | 2040 | 9C68 | FF06 | DC36 | FF1A | DA36 | FF1A | E036 |
| 0000320720 | FF1A | DE36 | 9A1A | E23E | 0000 | C483 | 8B28 | 8A46 |
| 6000320740 | E1E9 | E900 | 0006 | 91B8 | E9FF | 00D8 | 46C7 | 009E |
| 0000320760 | E900 | 0003 | 46FF | 839E | 9E7E | 7E7F | E903 | 0029 |
| 0000321000 | 468B | D19E | 05E0 | 5296 | 501E | 468B | D19E | 05E0 |
| 0000321020 | 5096 | 501E | 681E | 2038 | 76FF | FFA2 | A076 | 409A |
| 0000321040 | C275 | 83E1 | 10C4 | CBE9 | FFFF | A276 | 76FF | 9AA0 |
| 0000321060 | 737A | DAED | C483 | 9A04 | E31A | DD92 | 068E | 31C6 |
| 0000321100 | C726 | 7E06 | 0027 | 8E00 | C006 | 2631 | 3E83 | DD9B |
| 0000321120 | 7500 | E903 | 0009 | 7E83 | FE88 | 0374 | 0FE9 | 8E00 |
| 0000321140 | C206 | 2631 | 3E83 | DEF8 | 7500 | E903 | 0050 | 46C7 |
| 0000321160 | 008A | FF00 | 8E76 | 76FF | 8D8C | 8A46 | 5016 | 76FF |
| 0000321200 | FF9C | FC76 | 76FF | 8DFA | 904E | 5116 | 4E8D | 16F4 |
| 0000321220 | 8D51 | 844E | 5116 | 681E | 2040 | A368 | FF06 | DC36 |
| 0000321240 | FF1A | DA36 | FF1A | E036 | FF1A | DE36 | 9A1A | DF48 |
| 0000321260 | 0000 | C483 | 8B28 | 8A46 | 09E9 | E900 | 0006 | 00B8 |
| 0000321300 | E900 | 0000 | 5F5E | ED83 | 8B02 | 1FE5 | 4D5D | 1ECB |
| 0000321320 | 9058 | 5545 | EC8B | 8E1E | 81D8 | 08EC | 5700 | 1E56 |
| 0000321340 | 5868 | FF20 | 0876 | 76FF | 9A06 | 74CE | E2A7 | C483 |
| 0000321360 | 8908 | FA46 | 5689 | 0BFC | 74D0 | E903 | 0006 | FFB8 |
| 0000321400 | E9FF | 007B | 76FF | FF08 | 0676 | 681E | 205A | 76FF |
| 0000321420 | FFFC | FA76 | E69A | BB74 | 83E2 | 0CC4 | 006A | 681E |
| 0000321440 | 206F | 76FF | FFFC | FA76 | E69A | F374 | 83E2 | 0AC4 |
| 0000321460 | 46C7 | 00F8 | E900 | 0003 | 46FF | 83F8 | F87E | 7E7F |
| 0000321500 | E903 | 0027 | 5E8B | D1F8 | FFE3 | 96B7 | 8B52 | F85E |
| 0000321520 | E3D1 | B7FF | 5096 | 681E | 2074 | 76FF | FFFC | FA76 |
| 0000321540 | E69A | 0474 | 83E3 | 0CC4 | CDE9 | FFFF | FC76 | 76FF |
| 0000321560 | 9AFA | 737A | E03B | C483 | B804 | 0000 | 00E9 | 5E00 |
| 0000321600 | 835F | 02ED | E58B | 5D1F | CB4D | 581E | 4590 | 8B55 |
| 0000321620 | 1EEC | D88E | EC81 | 0004 | 5657 | 7F9A | 32F3 | 9AE3 |
| 0000321640 | F254 | E1CA | 4689 | 3DFC | 0000 | 0375 | 06E9 | 8B00 |
| 0000321660 | FC46 | 00E9 | 5E00 | 835F | 02ED | E58B | 5D1F | CB4D |
| 0000321700 | 581E | 4590 | 8B55 | 1EEC | D88E | EC81 | 002A | 5657 |
| 0000321720 | 46C7 | 7BF8 | 8C20 | FA5E | 46C7 | 01F0 | 2B01 | 89C0 |
| 0000321740 | E246 | 4689 | 8EE0 | C006 | 2631 | 3E83 | E3FA | 7500 |
| 0000321760 | E903 | 001D | 36FF | 1AE0 | 36FF | 1ADE | 468D | 16D8 |
| 0000322000 | 9A50 | DFCD | 0000 | C483 | 3D08 | 0000 | 0374 | 0FE9 |
| 0000322020 | 8E00 | C206 | 2631 | 3E83 | DFE3 | 7500 | E903 | 003B |
| 0000322040 | 681E | 2082 | 468D | 16E4 | 8D50 | D846 | 5016 | 468D |
| 0000322060 | 16F4 | 6850 | 06E9 | 681E | 211A | 36FF | 1ADC | 36FF |
| 0000322100 | 1ADA | 36FF | 1AE0 | 36FF | 1ADE | 169A | 00E0 | 8300 |
| 0000322120 | 1EC4 | 4689 | 89F4 | F656 | 08E9 | 2B00 | 89C0 | F646 |

THU MAR 14 17:25:16 1991 CRV_IPS.DLL PAGE 115, LINE 6727

| | | | | | | | | |
|---|---|---|---|---|---|---|---|---|
| 0000322140 | 4689 | 8EF4 | C006 | 2631 | 3E83 | DFB7 | 7500 | E903 |
| 0000322160 | 0051 | 7E83 | FEDC | 0375 | 48E9 | 9A00 | 62E2 | E414 |
| 0000322200 | 9A50 | 62C1 | E27C | 1E50 | 8968 | 8D20 | E446 | 5016 |
| 0000322220 | 468D | 16F4 | 8D50 | D846 | 5016 | 681E | 211A | ED68 |
| 0000322240 | FF06 | DC36 | FF1A | DA36 | FF1A | E036 | FF1A | DE36 |
| 0000322260 | 1E1A | A468 | 6820 | DDE7 | EA68 | 9ADD | DDED | 0000 |
| 0000322300 | C483 | 8B2A | 0646 | 1BE9 | F700 | 0A5E | 35E9 | E900 |
| 0000322320 | 0032 | 5EF7 | F70A | 085E | 29E9 | F700 | 085E | 23E9 |
| 0000322340 | E900 | 0020 | 073D | 7600 | E903 | 0018 | E0D1 | 2E93 |
| 0000322360 | A7FF | E484 | E459 | E45F | E45F | E46B | E462 | E46B |
| 0000322400 | E459 | E45F | C19A | 9F62 | 89E4 | D646 | E29A | 1B62 |
| 0000322420 | 89E5 | FC46 | 068E | 31C0 | 8326 | 2F3E | 00E5 | 0375 |
| 0000322440 | 51E9 | 8300 | DC7E | 75FE | E903 | 0048 | 76FF | FF0A |
| 0000322460 | 0876 | 76FF | FFFC | D676 | 681E | 20AA | 468D | 16E4 |
| 0000322500 | 8D50 | F446 | 5016 | 468D | 16D8 | 1E50 | 1A68 | 6821 |
| 0000322520 | 0706 | 36FF | 1ADC | 36FF | 1ADA | 36FF | 1AE0 | 36FF |
| 0000322540 | 1ADE | 681E | 20C9 | 4668 | 68E4 | E449 | 4C9A | 00E4 |
| 0000322560 | 8300 | 2EC4 | 06C7 | 47AE | 0000 | 36FF | 5088 | 36FF |
| 0000322600 | 5086 | 046A | 681E | 47AE | 299A | B7CF | 83E5 | 0AC4 |
| 0000322620 | 003D | 7500 | E903 | 007D | 068E | 31C0 | 8326 | E73E |
| 0000322640 | 00E5 | 0375 | 09E9 | 8300 | DC7E | 74FE | E903 | 000F |
| 0000322660 | 068E | 31C2 | 8326 | FF3E | 00E5 | 0375 | 50E9 | C700 |
| 0000322700 | DE46 | FF9C | 76FF | FFE2 | E076 | 468D | 16DE | FF50 |
| 0000322720 | F076 | 76FF | FFFA | F876 | 4E8D | 16E4 | 8D51 | F44E |
| 0000322740 | 5116 | 4E8D | 16D8 | 1E51 | 1A68 | 6821 | 070B | 36FF |
| 0000322760 | 1ADC | 36FF | 1ADA | 36FF | 1AE0 | 36FF | 1ADE | 479A |
| 0000323000 | 00E6 | 8300 | 28C4 | 468B | E9DE | 08A6 | 06E9 | B800 |
| 0000323020 | FF9C | 9DE9 | 6A08 | 6A00 | 9A20 | DBA7 | 0000 | 76FF |
| 0000323040 | FF0A | 0876 | 069A | D362 | 83E5 | 04C4 | 06C7 | 1AE2 |
| 0000323060 | 0001 | 36FF | 508C | 36FF | 508A | 026A | 681E | 1AE2 |
| 0000323100 | 299A | 02CF | 83E7 | 0AC4 | 003D | 7500 | E903 | 007D |
| 0000323120 | 068E | 31C0 | 8326 | 743E | 00E6 | 0375 | 09E9 | 8300 |
| 0000323140 | DC7E | 74FE | E903 | 000F | 068E | 31C2 | 8326 | 8C3E |
| 0000323160 | 00E6 | 0375 | 50E9 | C700 | DE46 | FF9C | 76FF | FFE2 |
| 0000323200 | E076 | 468D | 16DE | FF50 | F076 | 76FF | FFFA | F876 |
| 0000323220 | 4E8D | 16E4 | 8D51 | F44E | 5116 | 4E8D | 16D8 | 1E51 |
| 0000323240 | 1A68 | 6821 | 0715 | 36FF | 1ADC | 36FF | 1ADA | 36FF |
| 0000323260 | 1AE0 | 36FF | 1ADE | D59A | 00E6 | 8300 | 28C4 | 468B |
| 0000323300 | E9DE | 07EE | 06E9 | B800 | FF9C | E5E9 | 9A07 | B6D0 |
| 0000323320 | E78F | 4689 | 3DF2 | 0000 | 0375 | 7EE9 | 8E00 | C006 |
| 0000323340 | 2631 | 3E83 | E716 | 7500 | E903 | 0009 | 7E83 | FEDC |
| 0000323360 | 0374 | 0FE9 | 8E00 | C206 | 2631 | 3E83 | E72E | 7500 |
| 0000323400 | E903 | 0051 | 468B | 89F2 | DE46 | 76FF | FFE2 | E076 |
| 0000323420 | 468D | 16DE | FF50 | F076 | 76FF | FFFA | F876 | 4E8D |
| 0000323440 | 16E4 | 8D51 | F44E | 5116 | 4E8D | 16D8 | 1E51 | 1A68 |
| 0000323460 | 6821 | 0719 | 36FF | 1ADC | 36FF | 1ADA | 36FF | 1AE0 |
| 0000323500 | 36FF | 1ADE | 769A | 00E7 | 8300 | 28C4 | 468B | E9DE |
| 0000323520 | 0760 | 06E9 | 8B00 | F246 | 57E9 | C707 | AE06 | 0247 |
| 0000323540 | FF00 | 8836 | FF50 | 8636 | 6A50 | 1E04 | AE68 | 9A47 |
| 0000323560 | CF29 | E40E | C483 | 3D0A | 0000 | 0375 | 7DE9 | 8E00 |
| 0000323600 | C006 | 2631 | 3E83 | E7A3 | 7500 | E903 | 0009 | 7E83 |
| 0000323620 | FEDC | 0374 | 0FE9 | 8E00 | C206 | 2631 | 3E83 | E7BB |
| 0000323640 | 7500 | E903 | 0050 | 46C7 | 9CDE | FFFF | E276 | 76FF |
| 0000323660 | 8DE0 | DE46 | 5016 | 76FF | FFF0 | FA76 | 76FF | 8DF8 |
| 0000323700 | E44E | 5116 | 4E8D | 16F4 | 8D51 | D84E | 5116 | 681E |
| 0000323720 | 211A | 1E68 | FF07 | DC36 | FF1A | DA36 | FF1A | E036 |
| 0000323740 | FF1A | DE36 | 9A1A | E804 | 0000 | C483 | 8B28 | DE46 |
| 0000323760 | BFE9 | E906 | 0006 | 9CB8 | E9FF | 06B6 | D09A | 2DB6 |
| 0000324000 | 89E3 | F246 | 003D | 7500 | E903 | 007E | 068E | 31C0 |

THU MAR 14 17:25:16 1991 CRV_IPS.DLL PAGE 116, LINE 6786

| | | | | | | | | |
|---|---|---|---|---|---|---|---|---|
| 0000324020 | 8326 | 7C3E | 00E3 | 0375 | 09E9 | 8300 | DC7E | 74FE |
| 0000324040 | E903 | 000F | 068E | 31C2 | 8326 | A83E | 00E3 | 0375 |
| 0000324060 | 51E9 | 8B00 | F246 | 4689 | FFDE | E276 | 76FF | 8DE0 |
| 0000324100 | DE46 | 5016 | 76FF | FFF0 | FA76 | 76FF | 8DF8 | E44E |
| 0000324120 | 5116 | 4E8D | 16F4 | 8D51 | D84E | 5116 | 681E | 211A |
| 0000324140 | 2268 | FF07 | DC36 | FF1A | DA36 | FF1A | E036 | FF1A |
| 0000324160 | DE36 | 9A1A | E0B4 | 0000 | C483 | 8B28 | DE46 | 31E9 |
| 0000324200 | E906 | 0006 | 468B | E9F2 | 0628 | 3E83 | 47B0 | 7400 |
| 0000324220 | E903 | 0126 | 36FF | 5090 | 36FF | 508E | 0E6A | 681E |
| 0000324240 | 1AE4 | 959A | C6CF | 83E8 | 0AC4 | 003D | 7500 | E903 |
| 0000324260 | 007D | 068E | 31C0 | 8326 | E33E | 00E8 | 0375 | 09E9 |
| 0000324300 | 8300 | DC7E | 74FE | E903 | 000F | 068E | 31C2 | 8326 |
| 0000324320 | CA3E | 00E9 | 0375 | 50E9 | C700 | DE46 | FF9C | 76FF |
| 0000324340 | FFE2 | E076 | 468D | 16DE | FF50 | F076 | 76FF | FFFA |
| 0000324360 | F876 | 4E8D | 16E4 | 8D51 | F44E | 5116 | 4E8D | 16D8 |
| 0000324400 | 1E51 | 1A68 | 6821 | 0728 | 36FF | 1ADC | 36FF | 1ADA |
| 0000324420 | 36FF | 1AE0 | 36FF | 1ADE | 129A | 00EA | 8300 | 28C4 |
| 0000324440 | 468B | E9DE | 058C | 06E9 | B800 | FF9C | 83E9 | FF05 |
| 0000324460 | E436 | 9A1A | 6303 | E8D2 | C483 | FF02 | E636 | 9A1A |
| 0000324500 | 6347 | E905 | C483 | 9A02 | CD11 | EAE9 | 068E | 31C0 |
| 0000324520 | 8326 | B23E | 00E9 | 0375 | 5FE9 | 8300 | DC7E | 75FE |
| 0000324540 | E903 | 0056 | E6A1 | 2B1A | FC46 | A150 | 1AE4 | 462B |
| 0000324560 | 50D6 | E29A | 0B62 | 50E9 | C19A | 5462 | 50E9 | 681E |
| 0000324600 | 20CF | 468D | 16E4 | 8D50 | F446 | 5016 | 468D | 16D8 |
| 0000324620 | 1E50 | 1A68 | 6821 | 072E | 36FF | 1ADC | 36FF | 1ADA |
| 0000324640 | 36FF | 1AE0 | 36FF | 1ADE | 681E | 20F9 | F768 | 68E4 |
| 0000324660 | E4FA | FD9A | 00E4 | 8300 | 2EC4 | E4A1 | 2B1A | D646 |
| 0000324700 | 9A50 | A06E | E96E | C483 | 8B02 | 0C5E | E3D1 | 76C4 |
| 0000324720 | 260E | 0089 | E6A1 | 2B1A | FC46 | 9A50 | A06E | E99E |
| 0000324740 | C483 | 8B02 | 0C5E | E3D1 | 76C4 | 2612 | 0089 | 006A |
| 0000324760 | 646A | 2D9A | 00EA | C700 | AE06 | 0047 | FF00 | 8836 |
| 0000325000 | FF50 | 8636 | 6A50 | 1E04 | AE68 | 9A47 | CF29 | EA40 |
| 0000325020 | C483 | 3D0A | 0000 | 0375 | 7DE9 | 8E00 | C006 | 2631 |
| 0000325040 | 3E83 | EA70 | 7500 | E903 | 0009 | 7E83 | FEDC | 0374 |
| 0000325060 | 0FE9 | 8E00 | C206 | 2631 | 3E83 | EA88 | 7500 | E903 |
| 0000325100 | 0050 | 46C7 | 9CDE | FFFF | E276 | 76FF | 8DE0 | DE46 |
| 0000325120 | 5016 | 76FF | FFF0 | FA76 | 76FF | 8DF8 | E44E | 5116 |
| 0000325140 | 4E8D | 16F4 | 8D51 | D84E | 5116 | 681E | 211A | 3B68 |
| 0000325160 | FF07 | DC36 | FF1A | DA36 | FF1A | E036 | FF1A | DE36 |
| 0000325200 | 9A1A | EAD0 | 0000 | C483 | 8B28 | DE46 | 23E9 | E904 |
| 0000325220 | 0006 | 9CB8 | E9FF | 041A | 006A | 206A | AA9A | 00E5 |
| 0000325240 | 8B00 | 0A46 | D8F7 | 8B50 | 0846 | D8F7 | 9A50 | 6206 |
| 0000325260 | EA5C | C483 | C704 | E206 | 011A | FF00 | 8C36 | FF50 |
| 0000325300 | 8A36 | 6A50 | 1E02 | E268 | 9A1A | CF29 | EB8B | C483 |
| 0000325320 | 3D0A | 0000 | 0375 | 7DE9 | 8E00 | C006 | 2631 | 3E83 |
| 0000325340 | EAFD | 7500 | E903 | 0009 | 7E83 | FEDC | 0374 | 0FE9 |
| 0000325360 | 8E00 | C206 | 2631 | 3E83 | EB15 | 7500 | E903 | 0050 |
| 0000325400 | 46C7 | 9CDE | FFFF | E276 | 76FF | 8DE0 | DE46 | 5016 |
| 0000325420 | 76FF | FFF0 | FA76 | 76FF | 8DF8 | E44E | 5116 | 4E8D |
| 0000325440 | 16F4 | 8D51 | D84E | 5116 | 681E | 211A | 4468 | FF07 |
| 0000325460 | DC36 | FF1A | DA36 | FF1A | E036 | FF1A | DE36 | 9A1A |
| 0000325500 | EB5E | 0000 | C483 | 8B28 | DE46 | 65E9 | E903 | 0006 |
| 0000325520 | 9CB8 | E9FF | 035C | D09A | 60B6 | 89E6 | F246 | 003D |
| 0000325540 | 7500 | E903 | 007E | 068E | 31C0 | 8326 | 9F3E | 00EB |
| 0000325560 | 0375 | 09E9 | 8300 | DC7E | 74FE | E903 | 000F | 068E |
| 0000325600 | 31C2 | 8326 | B73E | 00EB | 0375 | 51E9 | 8B00 | F246 |
| 0000325620 | 4689 | FFDE | E276 | 76FF | 8DE0 | DE46 | 5016 | 76FF |
| 0000325640 | FFF0 | FA76 | 76FF | 8DF8 | E44E | 5116 | 4E8D | 16F4 |
| 0000325660 | 8D51 | D84E | 5116 | 681E | 211A | 4868 | FF07 | DC36 |

THU MAR 14 17:25:16 1991 CRV_IPS.DLL PAGE 117, LINE 6845

| | | | | | | | | |
|---|---|---|---|---|---|---|---|---|
| 0000325700 | FF1A | DA36 | FF1A | E036 | FF1A | DE36 | 9A1A | E58F |
| 0000325720 | 0000 | C483 | 8B28 | DE46 | D7E9 | E902 | 0006 | 468B |
| 0000325740 | E9F2 | 02CE | 06C7 | 47AE | 0002 | 36FF | 5088 | 36FF |
| 0000325760 | 5086 | 046A | 681E | 47AE | 299A | 97CF | 83E4 | 0AC4 |
| 0000326000 | 003D | 7500 | E903 | 007D | 068E | 31C0 | 8326 | AB3E |
| 0000326020 | 00E4 | 0375 | 09E9 | 8300 | DC7E | 74FE | E903 | 000F |
| 0000326040 | 068E | 31C2 | 8326 | 473E | 00E5 | 0375 | 50E9 | C700 |
| 0000326060 | DE46 | FF9C | 76FF | FFE2 | E076 | 468D | 16DE | FF50 |
| 0000326100 | F076 | 76FF | FFFA | F876 | 4E8D | 16E4 | 8D51 | F44E |
| 0000326120 | 5116 | 4E8D | 16D8 | 1E51 | 1A68 | 6821 | 074D | 36FF |
| 0000326140 | 1ADC | 36FF | 1ADA | 36FF | 1AE0 | 36FF | 1ADE | 8D9A |
| 0000326160 | 00EC | 8300 | 28C4 | 468B | E9DE | 0236 | 06E9 | B800 |
| 0000326200 | FF9C | 2DE9 | 9A02 | B6D0 | ED63 | 4689 | 3DF2 | 0000 |
| 0000326220 | 0375 | 7EE9 | 8E00 | C006 | 2631 | 3E83 | ECD2 | 7500 |
| 0000326240 | E903 | 0009 | 7E83 | FEDC | 0374 | 0FE9 | 8E00 | C206 |
| 0000326260 | 2631 | 3E83 | ECEA | 7500 | E903 | 0051 | 468B | 89F2 |
| 0000326300 | DE46 | 76FF | FFE2 | E076 | 468D | 16DE | FF50 | F076 |
| 0000326320 | 76FF | FFFA | F876 | 4E8D | 16E4 | 8D51 | F44E | 5116 |
| 0000326340 | 4E8D | 16D8 | 1E51 | 1A68 | 6821 | 0751 | 36FF | 1ADC |
| 0000326360 | 36FF | 1ADA | 36FF | 1AE0 | 36FF | 1ADE | 329A | 00ED |
| 0000326400 | 8300 | 28C4 | 468B | E9DE | 01A8 | 06E9 | 8B00 | F246 |
| 0000326420 | 9FE9 | 8301 | B03E | 0047 | 0374 | 18E9 | FF01 | 9036 |
| 0000326440 | FF50 | 8E36 | 6A50 | 1E0E | E468 | 9A1A | CF95 | ED4F |
| 0000326460 | C483 | 3D0A | 0000 | 0375 | 7DE9 | 8E00 | C006 | 2631 |
| 0000326500 | 3E83 | E849 | 7500 | E903 | 0009 | 7E83 | FEDC | 0374 |
| 0000326520 | 0FE9 | 8E00 | C206 | 2631 | 3E83 | E861 | 7500 | E903 |
| 0000326540 | 0050 | 46C7 | 9CDE | FFFF | E276 | 76FF | 8DE0 | DE46 |
| 0000326560 | 5016 | 76FF | FFF0 | FA76 | 76FF | 8DF8 | E44E | 5116 |
| 0000326600 | 4E8D | 16F4 | 8D51 | D84E | 5116 | 681E | 211A | 5768 |
| 0000326620 | FF07 | DC36 | FF1A | DA36 | FF1A | E036 | FF1A | DE36 |
| 0000326640 | 9A1A | E8A9 | 0000 | C483 | 8B28 | DE46 | 03E9 | E901 |
| 0000326660 | 0006 | 9CB8 | E9FF | 00FA | 36FF | 1AE4 | 039A | 5B63 |
| 0000326700 | 83ED | 02C4 | 36FF | 1AE6 | 479A | 3563 | 83E8 | 02C4 |
| 0000326720 | 119A | DACD | 8EE8 | C006 | 2631 | 3E83 | EDCC | 7500 |
| 0000326740 | E903 | 0051 | 7E83 | FEDC | 0375 | 48E9 | 9A00 | 62E2 |
| 0000326760 | ED86 | 9A50 | 62C1 | ECBE | 1E50 | FF68 | 8D20 | E446 |
| 0000327000 | 5016 | 468D | 16F4 | 8D50 | D846 | 5016 | 681E | 211A |
| 0000327020 | 5C68 | FF07 | DC36 | FF1A | DA36 | FF1A | E036 | FF1A |
| 0000327040 | DE36 | 1E1A | 1368 | 6821 | E93D | 4068 | 9AE9 | E943 |
| 0000327060 | 0000 | C483 | 8E2A | C006 | 2631 | 3E83 | EC2C | 7500 |
| 0000327100 | E903 | 0009 | 7E83 | FEDC | 0374 | 0FE9 | 8E00 | C206 |
| 0000327120 | 2631 | 3E83 | EC44 | 7500 | E903 | 0050 | 46C7 | 00DE |
| 0000327140 | FF00 | E276 | 76FF | 8DE0 | DE46 | 5016 | 76FF | FFF0 |
| 0000327160 | FA76 | 76FF | 8DF8 | E44E | 5116 | 4E8D | 16F4 | 8D51 |
| 0000327200 | D84E | 5116 | 681E | 211A | 5E68 | FF07 | DC36 | FF1A |
| 0000327220 | DA36 | FF1A | E036 | FF1A | DE36 | 9A1A | EBFF | 0000 |
| 0000327240 | C483 | 8B28 | DE46 | 09E9 | E900 | 0006 | 00B8 | E900 |
| 0000327260 | 0000 | 5F5E | ED83 | 8B02 | 1FE5 | 4D5D | 1ECB | 9058 |
| 0000327300 | 5545 | EC8B | 8E1E | 81D8 | 16EC | 5700 | 8E56 | C406 |
| 0000327320 | 2631 | 3E83 | 0F06 | 7500 | E903 | 0006 | 00B8 | E900 |
| 0000327340 | 01DC | 5EC4 | 2608 | 078B | 4689 | C4FC | 0C5E | 8B26 |
| 0000327360 | 8907 | FA46 | 76FF | 9AFC | A06E | EE9E | C483 | 9902 |
| 0000327400 | 3EF7 | 5092 | 8940 | F846 | 76FF | 9AFA | A06E | ED80 |
| 0000327420 | C483 | 9902 | 3EF7 | 5094 | 8940 | F646 | 468B | 3BF6 |
| 0000327440 | F846 | 037C | 03E9 | 8B00 | F846 | 4689 | 83EA | EA7E |
| 0000327460 | 7401 | E903 | 00A7 | 468B | 89FC | EE46 | 468B | 89FA |
| 0000327500 | EC46 | 468B | 8B10 | 1256 | 0405 | 5200 | 8B50 | 1046 |
| 0000327520 | 568B | 0512 | 0002 | 5052 | 468D | 16FA | 8D50 | FC46 |
| 0000327540 | 5016 | 519A | A4F1 | 83EF | 10C4 | 4689 | 83F2 | F27E |

THU MAR 14 17:25:16 1991 CRV_IPS.DLL PAGE 118, LINE 6904

| | | | | | | | | |
|---|---|---|---|---|---|---|---|---|
| 0000327560 | 7500 | E903 | 0006 | 468B | E9F2 | 0142 | 468B | 2BEE |
| 0000327600 | FC46 | 068E | 31CC | 2699 | 3EF7 | 1C66 | 5EC4 | 2610 |
| 0000327620 | 4789 | 8B06 | EC46 | 462B | 8EFA | CE06 | 9931 | F726 |
| 0000327640 | 683E | C41C | 105E | 8926 | 0847 | 468B | 2BEE | FC46 |
| 0000327660 | 068E | 31CC | 2699 | 3EF7 | 1C66 | F726 | 662E | 011C |
| 0000327700 | FC46 | 468B | 2BEC | FA46 | 068E | 31CE | 2699 | 3EF7 |
| 0000327720 | 1C68 | F726 | 682E | 011C | FA46 | BFE9 | 8B00 | FC46 |
| 0000327740 | F799 | EA7E | 4689 | 8BF4 | FA46 | F799 | EA7E | 4689 |
| 0000327760 | 8BF0 | 1046 | 568B | 0512 | 0004 | 5052 | 468B | 8B10 |
| 0000330000 | 1256 | 0205 | 5200 | 8D50 | F046 | 5016 | 468D | 16F4 |
| 0000330020 | 9A50 | F151 | EC18 | C483 | 8910 | F246 | 7E83 | 00F2 |
| 0000330040 | 0375 | 06E9 | 8B00 | F246 | 93E9 | 8B00 | EA46 | 6EF7 |
| 0000330060 | 2BF4 | FC46 | D8F7 | 068E | 31CC | 2699 | 3EF7 | 1C66 |
| 0000330100 | 5EC4 | 2610 | 4789 | 8B06 | F046 | 6EF7 | 2BEA | FA46 |
| 0000330120 | D8F7 | 068E | 31CE | 2699 | 3EF7 | 1C68 | 5EC4 | 2610 |
| 0000330140 | 4789 | 8B08 | F446 | 6EF7 | C4EA | 105E | C88B | 8B26 |
| 0000330160 | 0647 | 068E | 31CC | F726 | 662E | 031C | 89C8 | FC4E |
| 0000330200 | 468B | F7F0 | EA6E | 068E | 31CE | C88B | A126 | 1C68 |
| 0000330220 | 5EC4 | 2610 | 6FF7 | 0308 | 89C8 | FA4E | 468B | 40EA |
| 0000330240 | 5EC4 | 2610 | 0789 | 468B | C4FC | 085E | 8926 | 8B07 |
| 0000330260 | FA46 | 5EC4 | 260C | 0789 | 00B8 | E900 | 0000 | 5F5E |
| 0000330300 | ED83 | 8B02 | 1FE5 | 4D5D | 1ECB | 9058 | 5545 | EC8B |
| 0000330320 | 8E1E | 81D8 | 06EC | 5700 | FF56 | 0676 | 6E9A | 7DA0 |
| 0000330340 | 83F0 | 02C4 | 4689 | FFFC | 0876 | 6E9A | 8AA0 | 83EE |
| 0000330360 | 02C4 | 4689 | 8EFA | C606 | 2631 | 3E83 | 277E | 7500 |
| 0000330400 | E903 | 0006 | EAB8 | E9FF | 00AC | 7E81 | 80FC | 7E00 |
| 0000330420 | E903 | 000A | 7E81 | 80FA | 7F00 | E903 | 0006 | E9B8 |
| 0000330440 | E9FF | 0092 | 7E83 | 0006 | 037D | 06E9 | B900 | 0001 |
| 0000330460 | 03E9 | B900 | FFFF | 5E8B | D1FC | 8BE3 | 9687 | F750 |
| 0000330500 | C4E9 | 0A5E | 8926 | 8307 | 067E | 7D00 | E903 | 0006 |
| 0000330520 | 01B9 | E900 | 0003 | FFB9 | 8BFF | FC5E | E3D1 | 878B |
| 0000330540 | 5196 | E9F7 | 5EC4 | 2612 | 0789 | 7E83 | 0008 | 037D |
| 0000330560 | 06E9 | B900 | 0001 | 03E9 | B900 | FFFF | 5E8B | D1FA |
| 0000330600 | 8BE3 | 9687 | F752 | C4E9 | 0E5E | 8926 | 8307 | 087E |
| 0000330620 | 7D00 | E903 | 0006 | 01B9 | E900 | 0003 | FFB9 | 8BFF |
| 0000330640 | FA5E | E3D1 | 878B | 5396 | E9F7 | 5EC4 | 2616 | 0789 |
| 0000330660 | 00B8 | E900 | 0000 | 5F5E | ED83 | 8B02 | 1FE5 | 4D5D |
| 0000330700 | 1ECB | 9058 | 5545 | EC8B | 8E1E | 81D8 | 06EC | 5700 |
| 0000330720 | C456 | 065E | FF26 | 9A37 | A06E | F17B | C483 | 8902 |
| 0000330740 | FC46 | 5EC4 | 260A | 37FF | 6E9A | 6FA0 | 83F0 | 02C4 |
| 0000330760 | 4689 | A1FA | 5092 | 4639 | 7EFC | E903 | 000B | 94A1 |
| 0000331000 | 3950 | FA46 | 037F | 06E9 | B800 | FFE9 | AAE9 | 8B00 |
| 0000331020 | FC5E | E3D1 | 878B | 47B6 | 5EC4 | 260E | 0789 | 003D |
| 0000331040 | 7C00 | E903 | 003B | 5EC4 | 2606 | 3F83 | 7D00 | E903 |
| 0000331060 | 0006 | 01B8 | E900 | 0003 | FFB8 | C4FF | 0E5E | 8B26 |
| 0000331100 | 030F | FC4E | E9F7 | 5EC4 | 2606 | 0789 | 5EC4 | 260E |
| 0000331120 | 1F8B | 5E03 | D1FC | 8BE3 | B687 | C447 | 0E5E | 8926 |
| 0000331140 | 8B07 | FA5E | E3D1 | 878B | 4CB6 | 5EC4 | 2612 | 0789 |
| 0000331160 | 003D | 7C00 | E903 | 003B | 5EC4 | 260A | 3F83 | 7D00 |
| 0000331200 | E903 | 0006 | 01B8 | E900 | 0003 | FFB8 | C4FF | 125E |
| 0000331220 | 8B26 | 030F | FA4E | E9F7 | 5EC4 | 260A | 0789 | 5EC4 |
| 0000331240 | 2612 | 1F8B | 5E03 | D1FA | 8BE3 | B687 | C44C | 125E |
| 0000331260 | 8926 | B807 | 0000 | 00E9 | 5E00 | 835F | 02ED | E58B |
| 0000331300 | 5D1F | CB4D | 581E | 4590 | 8B55 | 1EEC | D88E | EC81 |
| 0000331320 | 000C | 5657 | 94A1 | A351 | 5092 | 94A1 | A353 | 5094 |
| 0000331340 | 46C7 | 00FC | C700 | F446 | 0000 | 06C7 | 47B6 | 0000 |
| 0000331360 | 46C7 | 01FA | E900 | 0003 | 46FF | 83FA | FA7E | 7E7F |
| 0000331400 | E903 | 005B | 5E8B | D1FA | 8BE3 | 9687 | 8950 | FC46 |
| 0000331420 | 468B | 39F4 | FC46 | 0375 | 41E9 | 8B00 | F446 | 8940 |

THU MAR 14 17:25:16 1991 CRV_IPS.DLL PAGE 119, LINE 6963

| | | | | | | | | |
|---|---|---|---|---|---|---|---|---|
| 0000331440 | F846 | 46C7 | 00F6 | E900 | 0003 | 46FF | 8BF8 | FC46 |
| 0000331460 | 4639 | 7CF8 | E903 | 0012 | 4EFF | 8BF6 | F646 | 5E8B |
| 0000331500 | D1F8 | 89E3 | B687 | E947 | FFE0 | 468B | 8BFA | FC5E |
| 0000331520 | E3D1 | 8789 | 47B6 | 468B | 89FC | F446 | 99E9 | C7FF |
| 0000331540 | FC46 | 0000 | 46C7 | 00F4 | C700 | B606 | 004C | C700 |
| 0000331560 | FA46 | 0001 | 03E9 | FF00 | FA46 | 7E83 | 7FFA | 037E |
| 0000331600 | 5BE9 | 8B00 | FA5E | E3D1 | 878B | 5296 | 4689 | 8BFC |
| 0000331620 | F446 | 4639 | 73FC | E903 | 0041 | 468B | 40F4 | 4689 |
| 0000331640 | C7F8 | F646 | 0000 | 03E9 | FF00 | F846 | 468B | 39FC |
| 0000331660 | F846 | 037C | 12E9 | FF00 | F64E | 468B | 8BF6 | F85E |
| 0000331700 | E3D1 | 8789 | 4CB6 | E0E9 | 8BFF | FA46 | 5E8B | D1FC |
| 0000331720 | 89E3 | B687 | 8B4C | FC46 | 4689 | E9F4 | FF99 | 00B8 |
| 0000331740 | E900 | 0000 | 5F5E | ED83 | 8B02 | 1FE5 | 4D5D | 1ECB |
| 0000331760 | 9058 | 5545 | EC8B | 8E1E | 81D8 | 04EC | 5700 | C756 |
| 0000332000 | FC46 | 0000 | 06C7 | 5196 | 0000 | 01BE | E900 | 0001 |
| 0000332020 | 8146 | 80FE | 7C00 | E903 | 0051 | DE8B | 808B | 5096 |
| 0000332040 | DE8B | 8039 | 5094 | 0374 | 10E9 | 8B00 | 8BDE | 9480 |
| 0000332060 | 4051 | DE8B | 8089 | 5196 | 2DE9 | 8B00 | C7DE | 9680 |
| 0000332100 | 0051 | 8300 | FC7E | 7400 | E903 | 001C | 46C7 | 01FC |
| 0000332120 | 8B00 | 8BDE | 9680 | 8E50 | CC06 | 2631 | 66A3 | 8E1C |
| 0000332140 | CA06 | 2631 | 3689 | 0000 | A5E9 | C7FF | FC46 | 0000 |
| 0000332160 | 06C7 | 5396 | 0000 | 01BE | E900 | 0001 | 8146 | 80FE |
| 0000332200 | 7C00 | E903 | 0051 | DE8B | 808B | 5296 | DE8B | 8039 |
| 0000332220 | 5294 | 0374 | 1DE9 | 8B00 | 8BDE | 9480 | 4053 | DE8B |
| 0000332240 | 8089 | 5396 | 2DE9 | 8B00 | C7DE | 9680 | 0053 | 8300 |
| 0000332260 | FC7E | 7400 | E903 | 001C | 46C7 | 01FC | 8B00 | 8BDE |
| 0000332300 | 9680 | 8E52 | CE06 | 2631 | 68A3 | 8E1C | C806 | 2631 |
| 0000332320 | 3689 | 0002 | A5E9 | 5EFF | 835F | 02ED | E58B | 5D1F |
| 0000332340 | CB4D | 581E | 4590 | 8B55 | 1EEC | D88E | EC81 | 002A |
| 0000332360 | 5657 | 46C7 | 01FA | C700 | DA46 | 0000 | 46C7 | 00D6 |
| 0000332400 | C700 | F846 | 0000 | 068E | 31C4 | 8326 | 063E | 000F |
| 0000332420 | 0375 | 06E9 | B800 | 0000 | F7E9 | C701 | E046 | 007F |
| 0000332440 | 46C7 | 01F6 | 6A00 | 6A00 | 6A00 | 6A00 | 6A00 | 6A00 |
| 0000332460 | 6A00 | 9A2D | DFDD | F4DF | C483 | 890E | DE46 | 003D |
| 0000332500 | 7500 | E903 | 0006 | 9CB8 | E9FF | 01C6 | 249A | F95F |
| 0000332520 | 3DF4 | 0000 | 0374 | 06E9 | B800 | FF9B | B3E9 | 8D01 |
| 0000332540 | FC46 | 5016 | 016A | A09A | 6A5F | 83F1 | 06C4 | 4689 |
| 0000332560 | 3DDE | 0000 | 0375 | 06E9 | B800 | FF9C | 93E9 | 8B01 |
| 0000332600 | 0646 | 068E | 31D2 | A326 | 1C8A | C726 | 9406 | 0A1C |
| 0000332620 | 2600 | 06C7 | 1C96 | 0000 | 7E83 | 0006 | 0374 | 03E9 |
| 0000332640 | F700 | F65E | 76FF | 9AF6 | A06E | F576 | C483 | 8B02 |
| 0000332660 | 8BC8 | E046 | F799 | 89F9 | E046 | 46C7 | 00DC | C700 |
| 0000332700 | D846 | 0000 | 03E9 | FF00 | DC46 | 7E83 | 00D8 | 0374 |
| 0000332720 | A4E9 | 8B00 | DC46 | 4639 | 7FE0 | E903 | 0099 | 76FF |
| 0000332740 | 6AF6 | 9A00 | 6206 | F58F | C483 | 6A04 | 8D14 | E246 |
| 0000332760 | 5016 | 166A | 5B68 | 6840 | 1C82 | 2B6A | 249A | 215E |
| 0000333000 | 83F6 | 0EC4 | 4689 | 3DDE | 0000 | 0375 | 06E9 | B800 |
| 0000333020 | FF9C | FDE9 | 8B00 | E246 | 2FE9 | E900 | 0056 | 46C7 |
| 0000333040 | 01D8 | C700 | FA46 | 0000 | 49E9 | E900 | 0046 | 01B8 |
| 0000333060 | 8900 | D646 | 4689 | C7D8 | FA46 | 0000 | 35E9 | C700 |
| 0000333100 | D846 | 0001 | 2DE9 | E900 | 002A | 013D | 7E00 | E903 |
| 0000333120 | 0012 | C00B | 037C | C2E9 | 2DFF | FFF3 | 0375 | CDE9 |
| 0000333140 | E9FF | FFDB | 4848 | 0375 | B3E9 | 48FF | 0375 | BAE9 |
| 0000333160 | E9FF | FFCB | 50E9 | E9FF | 0003 | 4EFF | 83DC | DC7E |
| 0000333200 | 7F00 | E903 | 001C | 468B | F7F6 | 50D8 | 006A | 069A |
| 0000333220 | C662 | 83F4 | 04C4 | 006A | 326A | 839A | 00E9 | E900 |
| 0000333240 | FFD8 | 1D9A | 3A60 | 3DF5 | 0000 | 0374 | 06E9 | B800 |
| 0000333260 | FF9A | 5DE9 | 8300 | D67E | 7500 | E903 | 0006 | F3B8 |
| 0000333300 | E9FF | 004E | 7E83 | 00FA | 0375 | 06E9 | B800 | FF96 |

THU MAR 14 17:25:16 1991 CRV_IPS.DLL PAGE 120, LINE 7022

| | | | | | | | | |
|---|---|---|---|---|---|---|---|---|
| 0000333320 | 3FE9 | 8B00 | E446 | 5EC4 | 2608 | 0789 | 468B | C4E6 |
| 0000333340 | 085E | 8926 | 0247 | 468B | C4E8 | 085E | 8926 | 0447 |
| 0000333360 | 468B | C4EA | 085E | 8926 | 0647 | 468B | C4F0 | DC5E |
| 0000333400 | 8926 | 8B07 | F246 | 5EC4 | 2610 | 0789 | 00B8 | E900 |
| 0000333420 | 0000 | 5F5E | ED83 | 8B02 | 1FE5 | 4D5D | 1ECB | 9058 |
| 0000333440 | 5545 | EC8B | 8E1E | 81D8 | 10EC | 5700 | C756 | FA46 |
| 0000333460 | 0001 | 46C7 | 01F6 | C700 | F446 | 0028 | 8568 | 68F5 |
| 0000333500 | 1C50 | D59A | EE5E | 83F6 | 04C4 | 4689 | 3DF2 | 0000 |
| 0000333520 | 0375 | 06E9 | B800 | FF9C | E6E9 | 9A01 | 5F24 | F714 |
| 0000333540 | 003D | 7400 | E903 | 0006 | 9BB8 | E9FF | 01D3 | 00B8 |
| 0000333560 | 8900 | FC46 | 4689 | C7F8 | F046 | 0000 | 006A | 76FF |
| 0000333600 | 9AFA | 6206 | F723 | C483 | 8D04 | FC46 | 5016 | 006A |
| 0000333620 | A09A | 975F | 83F7 | 06C4 | 4689 | 3DF2 | 0000 | 0375 |
| 0000333640 | 06E9 | B800 | FF9C | 98E9 | 8301 | FC7E | 7500 | E903 |
| 0000333660 | 0003 | 32E9 | FF00 | F046 | 7E83 | 00F8 | 0374 | 1BE9 |
| 0000333700 | 8B00 | F046 | 4639 | 7EF4 | E903 | 0010 | 46C7 | 01F8 |
| 0000333720 | F700 | FA5E | 468B | F7F4 | 89D8 | F046 | 468B | 39F0 |
| 0000333740 | F446 | 037C | 95E9 | 83FF | FC7E | 7400 | E903 | 0006 |
| 0000333760 | 97B8 | E9FF | 014B | 006A | 006A | 006A | 006A | 006A |
| 0000334000 | 006A | 2D6A | DD9A | B0DF | 83F7 | 0EC4 | 4689 | 3DF2 |
| 0000334020 | 0000 | 0375 | 06E9 | B800 | FF9C | 24E9 | 9A01 | 5F24 |
| 0000334040 | F7D6 | 003D | 7400 | E903 | 0006 | 9BB8 | E9FF | 0111 |
| 0000334060 | 00B8 | 8900 | FC46 | 4689 | C7F8 | F046 | 0000 | 76FF |
| 0000334100 | 6AF6 | 9A00 | 6206 | F7E5 | C483 | 8D04 | FC46 | 5016 |
| 0000334120 | 006A | A09A | 355F | 83F6 | 06C4 | 4689 | 3DF2 | 0000 |
| 0000334140 | 0375 | 06E9 | B800 | FF9C | D6E9 | 8300 | FC7E | 7500 |
| 0000334160 | E903 | 0003 | 32E9 | FF00 | F046 | 7E83 | 00F8 | 0374 |
| 0000334200 | 1BE9 | 8B00 | F046 | 4639 | 7EF4 | E903 | 0010 | 46C7 |
| 0000334220 | 01F8 | F700 | F65E | 468B | F7F4 | 89D8 | F046 | 468B |
| 0000334240 | 39F0 | F446 | 037C | 95E9 | 83FF | FC7E | 7400 | E903 |
| 0000334260 | 0006 | 97B8 | E9FF | 0089 | 006A | 326A | 8A9A | 00F8 |
| 0000334300 | 8300 | FA7E | 7F00 | E903 | 0018 | 006A | 068E | 31CA |
| 0000334320 | A126 | 0000 | D8F7 | 9A50 | 6206 | F880 | C483 | E904 |
| 0000334340 | 0013 | 006A | 068E | 31CA | FF26 | 0036 | 9A00 | 6206 |
| 0000334360 | F8A7 | C483 | 6A04 | 6A00 | 9A32 | F8C7 | 0000 | 7E83 |
| 0000334400 | 00F6 | 037F | 18E9 | 8E00 | C806 | 2631 | 02A1 | F700 |
| 0000334420 | 50D8 | 006A | 069A | BD62 | 83F8 | 04C4 | 13E9 | 8E00 |
| 0000334440 | C806 | 2631 | 36FF | 0002 | 006A | 069A | D562 | 83F6 |
| 0000334460 | 04C4 | 006A | 646A | 2B9A | 00F6 | B800 | 0000 | 00E9 |
| 0000334500 | 5E00 | 835F | 02ED | E58B | 5D1F | CB4D | 581E | 4590 |
| 0000334520 | 8B55 | 1EEC | D88E | EC81 | 0008 | 5657 | 5EC4 | 2608 |
| 0000334540 | 078B | 4689 | C4FA | 0C5E | 8B26 | 8907 | F846 | 46C7 |
| 0000334560 | 00FC | 8000 | 067E | 740E | E903 | 0079 | 239A | 1C64 |
| 0000334600 | 3DF9 | 0000 | 0375 | 63E9 | 9A00 | 62C1 | F94C | 068E |
| 0000334620 | 31C4 | 8B26 | 280E | 490F | 5EC4 | 2608 | 0F3B | 037F |
| 0000334640 | 03E9 | 2600 | 0F8B | F983 | 7C00 | E903 | 0003 | 00B9 |
| 0000334660 | 2B00 | C4C8 | 085E | 8926 | 9A0F | 62E2 | F988 | 068E |
| 0000334700 | 31C4 | 8B26 | 2A0E | 490F | 5EC4 | 260C | 0F3B | 037F |
| 0000334720 | 03E9 | 2600 | 0F8B | F983 | 7C00 | E903 | 0003 | 00B9 |
| 0000334740 | 2B00 | C4C8 | 0C5E | 8926 | E90F | 0006 | EBB8 | E9FF |
| 0000334760 | 0125 | E4E9 | 9A00 | 6423 | F9A1 | 005D | 7500 | E903 |
| 0000335000 | 00D1 | 5EC4 | 2608 | 3F83 | 7F00 | E903 | 0039 | C19A |
| 0000335020 | BD62 | 8EF9 | C406 | 2631 | 062B | 0F28 | D8F7 | C448 |
| 0000335040 | 085E | 3B26 | 7E07 | E903 | 001A | C19A | DA62 | 8EF9 |
| 0000335060 | C406 | 2631 | 062B | 0F28 | D8F7 | C448 | 085E | 8926 |
| 0000335100 | E907 | 0000 | 22E9 | 9A00 | 62C1 | F9EF | D8F7 | 5EC4 |
| 0000335120 | 2608 | 073B | 037C | 03E9 | E900 | 000D | C19A | 0862 |
| 0000335140 | F7FA | C4D8 | 085E | 8926 | C407 | 0C5E | 8326 | 003F |
| 0000335160 | 037F | 39E9 | 9A00 | 62E2 | FA24 | 068E | 31C4 | 2B26 |

THU MAR 14 17:25:16 1991 CRV_IPS.DLL PAGE 121, LINE 7081

| | | | | | | | | |
|---|---|---|---|---|---|---|---|---|
| 0000335200 | 2A06 | F70F | 48D8 | 5EC4 | 260C | 073B | 037E | 1AE9 |
| 0000335220 | 9A00 | 62E2 | FA41 | 068E | 31C4 | 2B26 | 2A06 | F70F |
| 0000335240 | 48D8 | 5EC4 | 260C | 0789 | 00E9 | E900 | 0022 | E29A |
| 0000335260 | 5662 | F7FA | C4D8 | 0C5E | 3B26 | 7C07 | E903 | 0003 |
| 0000335300 | 0DE9 | 9A00 | 62E2 | F86A | D8F7 | 5EC4 | 260C | 0789 |
| 0000335320 | 06E9 | B800 | FFEB | 3EE9 | C400 | 085E | 468B | 26FA |
| 0000335340 | 0739 | 0375 | 05E9 | C700 | FC46 | 0001 | 5EC4 | 8B0C |
| 0000335360 | F846 | 3926 | 7507 | E903 | 0005 | 46C7 | 01FC | 8300 |
| 0000335400 | FC7E | 7500 | E903 | 0009 | 00B8 | E900 | 0009 | 06E9 |
| 0000335420 | B800 | 0000 | 00E9 | 5E00 | 835F | 02ED | E58B | 5D1F |
| 0000335440 | CB4D | 0026 | 0002 | EEF5 | 0002 | 0000 | 0203 | D588 |
| 0000335460 | 0004 | 0068 | 0002 | F90F | 0003 | 0000 | 0103 | 3A7A |
| 0000335500 | 0007 | 0055 | 0103 | 40BE | 0007 | 005B | 0103 | 1E1B |
| 0000335520 | 0007 | 005C | 0103 | 8B7E | 0001 | 008E | 0203 | EDBE |
| 0000335540 | 0004 | 0077 | 0103 | 8B44 | 0001 | 008F | 0002 | F6CD |
| 0000335560 | 0007 | 0000 | 0103 | 86E7 | 0007 | 0065 | 0002 | 9AFD |
| 0000335600 | 0008 | 0000 | 0205 | ED6C | 0004 | 0023 | 0103 | 3661 |
| 0000335620 | 0007 | 006D | 0203 | D91F | 0004 | 0086 | 0103 | F84D |
| 0000335640 | 0001 | 0020 | 0103 | 622B | 0007 | 0071 | 0205 | EDE4 |
| 0000335660 | 0004 | 0031 | 0203 | E392 | 0004 | 0094 | 0103 | C9D1 |
| 0000335700 | 0005 | 000C | 0103 | C945 | 0005 | 0016 | 0205 | EDBB |
| 0000335720 | 0004 | 003F | 0103 | CA61 | 0005 | 0018 | 0103 | 7D6E |
| 0000335740 | 0007 | 000A | 0103 | 5AAD | 0007 | 0014 | 0103 | 5805 |
| 0000335760 | 0007 | 0016 | 0202 | EDB8 | 0004 | 003F | 0103 | 3E31 |
| 0000336000 | 0007 | 0018 | 0103 | 95C1 | 0007 | 001A | 0103 | 67FD |
| 0000336020 | 0007 | 001D | 0103 | 968D | 0007 | 0025 | 0103 | 9494 |
| 0000336040 | 0007 | 0026 | 0103 | 2CB0 | 0007 | 002A | 0203 | E3DB |
| 0000336060 | 0004 | 0049 | 0103 | 95AE | 0007 | 0037 | 0103 | 83E2 |
| 0000336100 | 0007 | 003D | 0203 | EE2C | 0004 | 0058 | 0103 | 85E8 |
| 0000336120 | 0007 | 0042 | 0000 | 0000 | 0000 | 0000 | 0000 | 0000 |
| 0000336140 | 581E | 4590 | 8B55 | 1EEC | D88E | EC81 | 0000 | 5657 |
| 0000336160 | 7E83 | 000A | 0375 | 09E9 | C700 | 2606 | 0121 | E900 |
| 0000336200 | 0006 | 06C7 | 2126 | 0000 | 468B | 8B06 | 0856 | 9EA3 |
| 0000336220 | 8954 | A016 | B854 | 0000 | 00E9 | 5E00 | 835F | 02ED |
| 0000336240 | E58B | 5D1F | CB4D | 581E | 4590 | 8B55 | 1EEC | D88E |
| 0000336260 | EC81 | 0010 | 5657 | 7E83 | 000C | 0374 | 63E9 | 8300 |
| 0000336300 | 263E | 0021 | 0375 | 31E9 | FF00 | A036 | FF54 | 9E36 |
| 0000336320 | FF54 | 0876 | 76FF | 9A06 | 23E7 | 00AB | C483 | 8908 |
| 0000336340 | F046 | 7E83 | 00F0 | 0375 | 06E9 | 8B00 | F046 | 56E9 |
| 0000336360 | C701 | 2606 | 0021 | E900 | 0028 | 36FF | 54A0 | 36FF |
| 0000336400 | 549E | 76FF | FF08 | 0676 | 519A | CA28 | 8300 | 08C4 |
| 0000336420 | 4689 | 83F0 | F07E | 7500 | E903 | 0006 | 468B | E9F0 |
| 0000336440 | 0125 | 4A68 | 6A20 | 9A01 | 99BC | 00F7 | C483 | 8904 |
| 0000336460 | FA46 | 5689 | 8BFC | FC46 | 460B | 74FA | E903 | 0006 |
| 0000336500 | FFB8 | E9FF | 0101 | 76FF | FFFC | FA76 | 36FF | 54A0 |
| 0000336520 | 36FF | 549E | 829A | 3B24 | 8301 | 08C4 | 4689 | 83F0 |
| 0000336540 | F07E | 7500 | E903 | 0006 | 468B | E9F0 | 00D9 | 7E83 |
| 0000336560 | 000C | 0375 | 3BE9 | 8300 | 263E | 0021 | 0375 | 06E9 |
| 0000336600 | B800 | FFFF | C0E9 | FF00 | 0C76 | 36FF | 54A0 | 36FF |
| 0000336620 | 549E | 76FF | FF08 | 0676 | 3C9A | 6225 | 8301 | 0AC4 |
| 0000336640 | 4689 | 83F0 | F07E | 7500 | E903 | 0006 | 468B | E9F0 |
| 0000336660 | 0095 | 468D | 16F2 | FF50 | A036 | FF54 | 9E36 | 9A54 |
| 0000336700 | 29CB | 0178 | C483 | FF08 | A036 | FF54 | 9E36 | FF54 |
| 0000336720 | FC76 | 76FF | 9AFA | 09D8 | 01A0 | C483 | 8908 | F046 |
| 0000336740 | 7E83 | 00F0 | 0375 | 06E9 | 8B00 | F046 | 58E9 | FF00 |
| 0000336760 | A036 | FF54 | 9E36 | FF54 | FC76 | 76FF | 9AFA | 1274 |
| 0000337000 | 01CE | C483 | 8908 | F046 | 7E83 | 00F0 | 0375 | 06E9 |
| 0000337020 | 8B00 | F046 | 30E9 | FF00 | F876 | 76FF | FFF6 | F476 |
| 0000337040 | 76FF | FFF2 | A036 | FF54 | 9E36 | 9A54 | 2A07 | 01DC |

THU MAR 14 17:25:16 1991 CRV_IPS.DLL PAGE 122, LINE 7140

| | | | | | | | | |
|---|---|---|---|---|---|---|---|---|
| 0000337060 | C483 | FF0C | FC76 | 76FF | 9AFA | 8ED8 | FFFF | C483 |
| 0000337100 | B804 | 0000 | 00E9 | 5E00 | 835F | 02ED | E58B | 5D1F |
| 0000337120 | CB4D | 581E | 4590 | 8B55 | 1EEC | D88E | EC81 | 002A |
| 0000337140 | 5657 | 00B8 | C400 | 065E | 8926 | 1047 | 5EC4 | 2606 |
| 0000337160 | 4789 | 8D0E | F246 | 5016 | 76FF | FF08 | 0676 | D79A |
| 0000337200 | 3411 | 8302 | 08C4 | 468D | 16D6 | FF50 | 0C76 | 76FF |
| 0000337220 | 9A0A | 11D7 | 02AD | C483 | 8B08 | F246 | 462B | 89D6 |
| 0000337240 | EC46 | 468B | 2BF4 | D846 | 4689 | B8E8 | 0000 | 4689 |
| 0000337260 | 89FC | FA46 | 468B | 2DE8 | 0008 | 4689 | E9EE | 0003 |
| 0000337300 | 46FF | 8BEE | E846 | 0805 | 3B00 | EE46 | 037F | 81E9 |
| 0000337320 | 8B00 | EC46 | 082D | 8900 | F046 | 03E9 | FF00 | F046 |
| 0000337340 | 468B | 05EC | 0008 | 463B | 7FF0 | E903 | 0061 | 468D |
| 0000337360 | 16EA | 8D50 | E446 | 5016 | 76FF | FFEE | F076 | 76FF |
| 0000337400 | FF0C | 0A76 | 76FF | FF08 | 0676 | 449A | 7A05 | 8300 |
| 0000337420 | 14C4 | 468B | 39E4 | FA46 | 0372 | 12E9 | 8B00 | E446 |
| 000033744D | 4689 | 8BFA | F046 | 4689 | 8BE0 | EE46 | 4689 | 8BDE |
| 0000337460 | FC46 | 4639 | 77EA | E903 | 0012 | 468B | 89EA | FC46 |
| 0000337500 | 468B | 89F0 | E646 | 468B | 89EE | E246 | 8EE9 | E9FF |
| 0000337520 | FF6E | 5EC4 | 2606 | 7F83 | 020C | 0374 | 17E9 | 8B00 |
| 0000337540 | E646 | 5EC4 | 260A | 4789 | 8B0E | E246 | 5EC4 | 260A |
| 0000337560 | 4789 | E910 | 0014 | 468B | C4E0 | 0A5E | 8926 | 0E47 |
| 0000337600 | 468B | C4DE | 0A5E | 8926 | 1047 | 5EC4 | 2606 | 7F83 |
| 0000337620 | 020C | 0375 | 14E9 | FF00 | 0C76 | 76FF | FF0A | 0876 |
| 0000337640 | 76FF | 9A06 | 035C | 0221 | C483 | B808 | 0000 | 00E9 |
| 0000337660 | 5E00 | 835F | 02ED | E58B | 5D1F | CB4D | 581E | 4590 |
| 0000337700 | 8B55 | 1EEC | D88E | EC81 | 0010 | 5657 | 46C7 | 00F6 |
| 0000337720 | E900 | 0003 | 46FF | 83F6 | F67E | 7C20 | E903 | 01B3 |
| 0000337740 | 468B | C4F6 | 0A5E | 2B26 | 0E47 | 4689 | C7F8 | F246 |
| 0000337760 | 0000 | 03E9 | FF00 | F246 | 7E83 | 20F2 | 037C | 8FE9 |
| 0000340000 | 8B01 | F246 | 5EC4 | 260A | 472B | 8910 | F446 | 7E83 |
| 0000340020 | 00F8 | 037D | 76E9 | 8301 | F47E | 7D00 | E903 | 016D |
| 0000340040 | 7E83 | 20F8 | 037C | 64E9 | 8301 | F47E | 7C20 | E903 |
| 0000340060 | 015B | 76FF | FFF4 | F876 | 5EC4 | 260A | 77FF | 260A |
| 0000340100 | 77FF | 9A08 | 1019 | 040A | C483 | 8808 | FA46 | 7E80 |
| 0000340120 | 00FA | 0375 | C0E9 | FF00 | F476 | 76FF | C4F8 | 0A5E |
| 0000340140 | FF26 | 0277 | FF26 | 9A37 | 1019 | 0426 | C483 | 8808 |
| 0000340160 | FC46 | 76FF | FFF2 | F676 | 5EC4 | 2606 | 77FF | 260A |
| 0000340200 | 77FF | 9A08 | 1019 | 0445 | C483 | 3C08 | 7500 | E903 |
| 0000340220 | 0029 | 76FF | FFF2 | F676 | 5EC4 | 2606 | 77FF | 2602 |
| 0000340240 | 37FF | 199A | 6E10 | 8304 | 08C4 | 463A | 75FC | E903 |
| 0000340260 | 0006 | FFB8 | E9FF | 00E1 | 59E9 | FF00 | F276 | 76FF |
| 0000340300 | C4F6 | 065E | FF26 | 0277 | FF26 | 9A37 | 1019 | 0493 |
| 0000340320 | C483 | 3A08 | FC46 | 0374 | 39E9 | FF00 | F276 | 76FF |
| 0000340340 | 8AF6 | FA46 | C450 | 065E | FF26 | 0A77 | FF26 | 0877 |
| 0000340360 | 8B9A | AF0F | 8304 | 0AC4 | 76FF | FFF2 | F676 | 468A |
| 0000340400 | 50FC | 5EC4 | 2606 | 77FF | 2602 | 37FF | 8B9A | CB0F |
| 0000340420 | 8304 | 0AC4 | 76E9 | FF00 | F276 | 76FF | C4F6 | 065E |
| 0000340440 | FF26 | 0A77 | FF26 | 0877 | 199A | EA10 | 8304 | 08C4 |
| 0000340460 | 003C | 0375 | 56E9 | FF00 | F276 | 76FF | C4F6 | 065E |
| 0000340500 | FF26 | 0277 | FF26 | 9A37 | 1019 | 0505 | C483 | FF08 |
| 0000340520 | F476 | 76FF | C4F8 | 0A5E | FF26 | 0277 | FF26 | 8937 |
| 0000340540 | F046 | 199A | 2810 | 8305 | 08C4 | 463A | 75F0 | E903 |
| 0000340560 | 001B | 76FF | FFF2 | F676 | 006A | 5EC4 | 2606 | 77FF |
| 0000340600 | 260A | 77FF | 9A08 | 0F8B | 0346 | C483 | E90A | FE65 |
| 0000340620 | 41E9 | 8BFE | 0000 | 00E9 | 5E00 | 835F | 02ED | E58B |
| 0000340640 | 5D1F | CB4D | 581E | 4590 | 8B55 | 1EEC | D88E | EC81 |
| 0000340660 | 000C | 5657 | 5EC4 | 2612 | 07C7 | 0000 | 5EC4 | 2616 |
| 0000340700 | 07C7 | 0000 | 46C7 | 00FA | E900 | 0003 | 46FF | 83FA |
| 0000340720 | FA7E | 7C20 | E903 | 00D7 | 468B | 2BFA | 0E46 | 4689 |

THU MAR 14 17:25:16 1991 CRV_IPS.DLL PAGE 123, LINE 7199

| | | | | | | | | |
|---|---|---|---|---|---|---|---|---|
| 0000340740 | C7FC | F646 | 0000 | 03E9 | FF00 | F646 | 7E83 | 20F6 |
| 0000340760 | 037C | B7E9 | 8B00 | F646 | 462B | 8910 | F846 | 7E83 |
| 0000341000 | 00FC | 037D | A2E9 | 8300 | F87E | 7D00 | E903 | 0099 |
| 0000341020 | 7E83 | 20FC | 037C | 90E9 | 8300 | F87E | 7C20 | E903 |
| 0000341040 | 0087 | 76FF | FFF6 | FA76 | 5EC4 | 2606 | 77FF | 260A |
| 0000341060 | 77FF | 9A08 | 1019 | 05F6 | C483 | 3C08 | 7500 | E903 |
| 0000341100 | 0067 | 76FF | FFF8 | FC76 | 5EC4 | 26DA | 77FF | 260A |
| 0000341120 | 77FF | 9A08 | 1019 | 061B | C483 | 3C08 | 7500 | E903 |
| 0000341140 | 0047 | 5EC4 | 2616 | 07FF | 76FF | FFF6 | FA76 | 5EC4 |
| 0000341160 | 2606 | 77FF | 2602 | 37FF | 199A | 3610 | 8306 | 08C4 |
| 0000341200 | 76FF | FFF8 | FC76 | 5EC4 | 260A | 77FF | 2602 | 37FF |
| 0000341220 | 4689 | 9AF4 | 1019 | 03E6 | C483 | 3A08 | F446 | 0374 |
| 0000341240 | 06E9 | C400 | 125E | FF26 | E907 | FF3D | 1DE9 | 5EFF |
| 0000341260 | 835F | 02ED | E58B | 5D1F | CB4D | 581E | 4590 | 8B55 |
| 0000341300 | 1EEC | D88E | EC81 | 0004 | 5657 | 46C7 | 00FC | E900 |
| 0000341320 | 0003 | 46FF | 83FC | FC7E | 7C20 | E903 | 001A | 76FF |
| 0000341340 | FFFC | 0C76 | 76FF | FF0A | 0876 | 76FF | 9A06 | 06A9 |
| 0000341360 | 05D6 | C483 | E90A | FFDA | 00B8 | E900 | 0000 | 5F5E |
| 0000341400 | ED83 | 8B02 | 1FE5 | 4D5D | 1ECB | 9058 | 5545 | EC8B |
| 0000341420 | 8E1E | 81D8 | 0AEC | 5700 | 6A56 | 6A02 | 9A20 | 99BC |
| 0000341440 | 06F3 | C483 | 8904 | FA46 | 5689 | 8BFC | FC46 | 460B |
| 0000341460 | 74FA | E903 | 0006 | FFB8 | E9FF | 0069 | 468D | 16F6 |
| 0000341500 | FF50 | FC76 | 76FF | FFFA | 0E76 | 76FF | FF0C | 0A76 |
| 0000341520 | 509A | 2907 | 8307 | 0EC4 | 46C7 | 00F8 | E900 | 0003 |
| 0000341540 | 46FF | 8BF8 | F646 | 4639 | 72F8 | E903 | 0023 | 76FF |
| 0000341560 | FF08 | 0676 | 76FF | FFF8 | FC76 | 76FF | FFFA | 0E76 |
| 0000341600 | 76FF | FF0C | 0A76 | 029A | 3A08 | 8307 | 10C4 | CFE9 |
| 0000341620 | FFFF | FC76 | 76FF | 9AFA | 8ED8 | 0690 | C483 | B804 |
| 0000341640 | 0000 | 00E9 | 5E00 | 835F | 02ED | E58B | 5D1F | CB4D |
| 0000341660 | 581E | 4590 | 8B55 | 1EEC | D88E | EC81 | 000A | 5657 |
| 0000341700 | 46C6 | 00F6 | 46C7 | 00FA | C400 | 105E | C726 | 0007 |
| 0000341720 | C700 | FC46 | 0000 | 03E9 | FF00 | FC46 | 7E83 | 20FC |
| 0000341740 | 037C | 72E9 | FF00 | 0A76 | 76FF | C4FC | 065E | FF26 |
| 0000341760 | 0A77 | FF26 | 0877 | 199A | C010 | 8306 | 08C4 | 4688 |
| 0000342000 | 80F8 | F87E | 7500 | E903 | 0023 | 7E83 | 00FA | 0374 |
| 0000342020 | 17E9 | C400 | 105E | 8B26 | C11F | 02E3 | 76C4 | 8B0C |
| 0000342040 | FC46 | 8926 | C700 | FA46 | 0001 | 27E9 | 8300 | FA7E |
| 0000342060 | 7500 | E903 | 001E | 468B | C4FC | 105E | 8B26 | C137 |
| 0000342100 | 02E6 | 5EC4 | 260C | 4089 | C402 | 105E | FF26 | C707 |
| 0000342120 | FA46 | 0000 | 82E9 | 5EFF | 835F | 02ED | E58B | 5D1F |
| 0000342140 | CB4D | 581E | 4590 | 8B55 | 1EEC | D88E | EC81 | 0022 |
| 0000342160 | 5657 | 4669 | 020A | 0301 | 1246 | 568B | 0514 | 000A |
| 0000342200 | 4689 | 89E2 | E456 | 5E8B | C110 | 02E3 | 76C4 | 260C |
| 0000342220 | 008B | 4689 | 8BE6 | 1076 | E6C1 | C402 | 0C5E | 8B26 |
| 0000342240 | 0240 | 4689 | 8BE0 | E646 | 4689 | C7F6 | FC46 | 0001 |
| 0000342260 | 76FF | FF0A | E676 | 5EC4 | 2606 | 77FF | 2602 | 37FF |
| 0000342300 | 199A | 9810 | 8308 | 08C4 | E42A | 4689 | 8AFA | FA66 |
| 0000342320 | C02A | 4609 | C7FA | F846 | FF00 | 086A | 468D | 16F6 |
| 0000342340 | C450 | E25E | 8B26 | C107 | 03E0 | 4603 | 8BE2 | E456 |
| 0000342360 | 0205 | 5200 | 9A50 | 9F64 | 0799 | C483 | C40A | E25E |
| 0000342400 | 8B26 | 8907 | DE46 | 5EC4 | 26E2 | 07FF | 5EC4 | 2612 |
| 0000342420 | 47FF | 8B06 | E046 | 4689 | C7EE | F446 | 0001 | 4EFF |
| 0000342440 | FFE0 | 0A76 | 76FF | C4E0 | 065E | FF26 | 0277 | FF26 |
| 0000342460 | 9A37 | 1019 | 0909 | C483 | 2A08 | 89E4 | F246 | 668A |
| 0000342500 | 2AF2 | 09C0 | F246 | 46C7 | FFF0 | 6A00 | 8D08 | EE46 |
| 0000342520 | 5016 | 5EC4 | 26E2 | 078B | E0C1 | 0303 | E246 | 568B |
| 0000342540 | 05E4 | 0002 | 5052 | 649A | 529F | 8309 | 0AC4 | 5EC4 |
| 0000342560 | 26E2 | 07FF | 5EC4 | 2612 | 47FF | C406 | 125E | 8326 |
| 0000342600 | 047F | 7401 | E903 | 00A5 | 468B | 89E6 | EA46 | 03E9 |

THU MAR 14 17:25:16 1991 CRV_IPS.DLL PAGE 124, LINE 7258

| | | | | | | | | |
|---|---|---|---|---|---|---|---|---|
| 0000342620 | FF00 | EA46 | 468B | 39EA | E046 | 037F | 8EE9 | FF00 |
| 0000342640 | 0A76 | 76FF | C4EA | 065E | FF26 | 0277 | FF26 | 9A37 |
| 0000342660 | 1019 | 096F | C483 | 8808 | EC46 | 76FF | 8B0A | EA46 |
| 0000342700 | 5040 | 5EC4 | 2606 | 77FF | 2602 | 37FF | 199A | B810 |
| 0000342720 | 8309 | 08C4 | 4688 | 8AE8 | EC46 | 4638 | 75E8 | E903 |
| 0000342740 | 0048 | 468B | 40EA | 4689 | 8AF6 | EC46 | 4688 | 8AF8 |
| 0000342760 | E846 | 4688 | C7F9 | FC46 | 0000 | 086A | 468D | 16F6 |
| 0000343000 | C450 | E25E | 8B26 | C107 | 03E0 | 4603 | 8BE2 | E456 |
| 0000343020 | 0205 | 5200 | 9A50 | 9F64 | 0863 | C483 | C40A | E25E |
| 0000343040 | FF26 | C407 | 125E | FF26 | 0847 | 64E9 | 5EFF | 835F |
| 0000343060 | 02ED | E58B | 5D1F | CB4D | 581E | 4590 | 8B55 | 1EEC |
| 0000343100 | D88E | EC81 | 0004 | 5657 | 5EC4 | 260A | 77FF | 266A |
| 0000343120 | 77FF | FF68 | 0876 | 76FF | 9A06 | 0A94 | 0A1C | C483 |
| 0000343140 | 8908 | FC46 | 7E83 | 00FC | 0375 | 06E9 | B800 | FFFF |
| 0000343160 | 76E9 | FF00 | 0C76 | 76FF | 9A0A | 0B94 | 0A47 | C483 |
| 0000343200 | 8904 | FC46 | 7E83 | 00FC | 0375 | 06E9 | B800 | FFFF |
| 0000343220 | 56E9 | C400 | 0A5E | FF26 | 6A77 | FF26 | 6877 | 76FF |
| 0000343240 | FF08 | 0676 | 689A | 6C0C | 830A | 08C4 | 4689 | 83FC |
| 0000343260 | FC7E | 7500 | E903 | 0006 | FFB8 | E9FF | 002B | 5EC4 |
| 0000343300 | 260A | 77FF | 266A | 77FF | 9A68 | 0E73 | 08D4 | C483 |
| 0000343320 | 8904 | FC46 | 7E83 | 00FC | 0375 | 06E9 | B800 | FFFF |
| 0000343340 | 06E9 | B800 | 0000 | 00E9 | 5E00 | 835F | 02ED | E58B |
| 0000343360 | 5D1F | CB4D | 581E | 4590 | 8B55 | 1EEC | D88E | EC81 |
| 0000343400 | 000C | 5657 | 5EC4 | 260A | 47C7 | FF06 | C47F | 0A5E |
| 0000343420 | C726 | 0847 | 8001 | 5EC4 | 260A | 47C7 | 010C | C480 |
| 0000343440 | 0A5E | C726 | 0A47 | 7FFF | 468B | 8B06 | 0856 | 0AD5 |
| 0000343460 | 8900 | F446 | 5689 | C7F6 | FC46 | 0000 | 08E9 | FF00 |
| 0000343500 | FC46 | 4681 | 02F4 | 8301 | FC7E | 7C20 | E903 | 0093 |
| 0000343520 | 46C7 | 00FA | E900 | 0003 | 46FF | C4FA | F45E | 468B |
| 0000343540 | 26FA | 0739 | 037F | 77E9 | 8B00 | FA76 | E6C1 | C403 |
| 0000343560 | F45E | 8B26 | 0240 | 4689 | C4F8 | 0A5E | 468B | 26F8 |
| 0000343600 | 4739 | 7F06 | E903 | 000A | 468B | C4F8 | 0A5E | 8926 |
| 0000343620 | 0647 | 5EC4 | 8B0A | F846 | 3926 | 0847 | 037C | 0AE9 |
| 0000343640 | 8B00 | F846 | 5EC4 | 260A | 4789 | C408 | 0A5E | 468B |
| 0000343660 | 26FC | 4739 | 7F0A | E903 | 000A | 468B | C4FC | 0A5E |
| 0000343700 | 8926 | 0A47 | 5EC4 | 8B0A | FC46 | 3926 | 0C47 | 037C |
| 0000343720 | 0AE9 | 8B00 | FC46 | 5EC4 | 260A | 4789 | E90C | FF78 |
| 0000343740 | 5CE9 | B8FF | 0000 | 00E9 | 5E00 | 835F | 02ED | E58B |
| 0000343760 | 5D1F | CB4D | 581E | 4590 | 8B55 | 1EEC | D88E | EC81 |
| 0000344000 | 0006 | 5657 | 5EC4 | 2606 | 478B | 2668 | 578B | 896A |
| 0000344020 | FA46 | 5689 | C4FC | FA5E | 8B26 | 0847 | 5EC4 | 2606 |
| 0000344040 | 473B | 7C2C | E903 | 0004 | 8B26 | 2C47 | 5EC4 | 26FA |
| 0000344060 | 4789 | C408 | 065E | 8B26 | 2C47 | 5EC4 | 26FA | 473B |
| 0000344100 | 7F06 | E903 | 0004 | 8B26 | 0647 | 5EC4 | 26FA | 4789 |
| 0000344120 | C406 | FA5E | 8B26 | 0C47 | 5EC4 | 2606 | 473B | 7C2E |
| 0000344140 | E903 | 0004 | 8B26 | 2E47 | 5EC4 | 26FA | 4789 | C40C |
| 0000344160 | FA5E | 8B26 | 0A47 | 5EC4 | 2606 | 473B | 7F2E | E903 |
| 0000344200 | 0004 | 8B26 | 2E47 | 5EC4 | 26FA | 4789 | C40A | FA5E |
| 0000344220 | 8B26 | 0647 | 5EC4 | 2606 | 4729 | C42C | FA5E | 8B26 |
| 0000344240 | 0A47 | 5EC4 | 2606 | 4729 | C42E | 065E | FF26 | 2C47 |
| 0000344260 | 5EC4 | 2606 | 47FF | B82E | 0000 | 00E9 | 5E00 | 835F |
| 0000344300 | 02ED | E58B | 5D1F | CB4D | 581E | 4590 | 8B55 | 1EEC |
| 0000344320 | D88E | EC81 | 0012 | 5657 | 5EC4 | 260A | 478B | C40C |
| 0000344340 | 0A5E | 2B26 | 0A47 | 8940 | FC46 | 20B8 | 2B00 | FC46 |
| 0000344360 | 023D | 7C00 | E903 | 0006 | FFB8 | E9FF | 01CA | 5EC4 |
| 0000344400 | 260A | 7F83 | 000A | 037F | 85E9 | C700 | F846 | 0001 |
| 0000344420 | 03E9 | FF00 | F846 | 468B | 40FC | 463B | 7FF8 | E903 |
| 0000344440 | 0044 | 7669 | 02F8 | C401 | 065E | C08C | 7EC4 | 8C0A |
| 0000344460 | 8EC1 | C4C0 | 065E | 408D | 890A | EE46 | 468C | 8EF0 |

THU MAR 14 17:25:16 1991 CRV_IPS.DLL PAGE 125, LINE 7317

| | | | | | | | | |
|---|---|---|---|---|---|---|---|---|
| 0000344500 | 26C1 | 458B | 030A | F846 | C069 | 0102 | 4603 | 8B06 |
| 0000344520 | 0856 | F82D | 1E00 | F08B | DA8E | 7EC4 | B9EE | 0081 |
| 0000344540 | A5F3 | E91F | FFAD | 468B | 40FC | 4689 | E9F8 | 0003 |
| 0000344560 | 46FF | 83F8 | F87E | 7C20 | E903 | 0011 | 7669 | 02F8 |
| 0000344600 | C401 | 065E | C726 | 0A40 | 0000 | E3E9 | E9FF | 0046 |
| 0000344620 | 468B | 40FC | 4689 | E9F8 | 0003 | 4EFF | 83F8 | F87E |
| 0000344640 | 7F01 | E903 | 0027 | 7669 | 02F8 | C401 | 065E | 4669 |
| 0000344660 | 02F8 | 0301 | 0646 | 568B | 2D08 | 00F8 | 8D1E | 0A78 |
| 0000344700 | F08B | DA8E | 81B9 | F300 | 1FA5 | CDE9 | C4FF | 065E |
| 0000344720 | C726 | 0A47 | 0000 | 5EC4 | 260A | 478B | C408 | 0A5E |
| 0000344740 | 2B26 | 0647 | 8940 | FA46 | 20B8 | 2B00 | FA46 | 023D |
| 0000344760 | 7C00 | E903 | 0006 | FFB8 | E9FF | 00CC | 468B | 8B06 |
| 0000345000 | 0856 | 0A05 | 8900 | F246 | 5689 | C4F4 | 0A5E | 8326 |
| 0000345020 | 067F | 7F00 | E903 | 005C | 46C7 | 01F8 | E900 | 0003 |
| 0000345040 | 46FF | 8BF8 | FC46 | 3B40 | F846 | 037F | 42E9 | C700 |
| 0000345060 | F646 | 0000 | 03E9 | FF00 | F646 | 5E69 | 02F8 | C401 |
| 0000345100 | F276 | 468B | 26F6 | 0039 | 037F | 21E9 | B800 | 0001 |
| 0000345120 | 5EC4 | 260A | 472B | 8B06 | F676 | E6C1 | 6903 | F84E |
| 0000345140 | 0102 | F103 | 5EC4 | 26F2 | 4001 | E902 | FFC9 | AFE9 |
| 0000345160 | E9FF | 004E | 46C7 | 00F8 | E900 | 0003 | 46FF | 8BF8 |
| 0000345200 | F846 | 4639 | 7FFC | E903 | 0038 | 46C7 | 00F6 | E900 |
| 0000345220 | 0003 | 46FF | 69F6 | F85E | 0102 | 76C4 | 8BF2 | F646 |
| 0000345240 | 3926 | 7F00 | E903 | 0017 | 768B | C1F6 | 03E6 | 4669 |
| 0000345260 | 02F8 | 0301 | C4F0 | F25E | FF26 | 0240 | D3E9 | E9FF |
| 0000345300 | FFBA | 00B8 | E900 | 0000 | 5F5E | ED83 | 8B02 | 1FE5 |
| 0000345320 | 4D5D | 1ECB | 9058 | 5545 | EC8B | 8E1E | 81D8 | 00EC |
| 0000345340 | 5700 | B856 | 0002 | 5EC4 | 2606 | 472B | C406 | 065E |
| 0000345360 | 0126 | 0847 | 5EC4 | 2606 | 47C7 | 0006 | B800 | 0002 |
| 0000345400 | 5EC4 | 2606 | 472B | C40A | 065E | 0126 | 0C47 | 5EC4 |
| 0000345420 | 2606 | 47C7 | 000A | B800 | 0000 | 00E9 | 5E00 | 835F |
| 0000345440 | 02ED | E58B | 5D1F | CB4D | 581E | 4590 | 8B55 | 1EEC |
| 0000345460 | D88E | EC81 | 0004 | 5657 | 146A | 016A | BC9A | FC99 |
| 0000345500 | 8309 | 04C4 | 5EC4 | 2606 | 0789 | 8926 | 0257 | 5EC4 |
| 0000345520 | 2606 | 478B | 2602 | 070B | 0374 | 06E9 | B800 | FFFF |
| 0000345540 | 7DE9 | 8E00 | D406 | 2631 | 268A | 0F2E | E4C0 | 2A02 |
| 0000345560 | C1C0 | 03E8 | 4689 | FFFC | FC76 | CE9A | 4F8E | 830F |
| 0000345600 | 02C4 | 5EC4 | 2606 | 1FC4 | 8926 | 0847 | 8926 | 0A57 |
| 0000345620 | 5EC4 | 2606 | 1FC4 | 8B26 | 0A47 | 0B26 | 0847 | 0374 |
| 0000345640 | 06E9 | B800 | FFFF | 37E9 | FF00 | FC76 | CE9A | DF8E |
| 0000345660 | 830E | 02C4 | 5EC4 | 2606 | 1FC4 | 8926 | 2607 | 5789 |
| 0000345700 | C402 | 065E | C426 | 261F | 478B | 260A | 470B | 7408 |
| 0000345720 | E903 | 0006 | FFB8 | E9FF | 0006 | 00B8 | E900 | 0000 |
| 0000345740 | 5F5E | ED83 | 8B02 | 1FE5 | 4D5D | 1ECB | 9058 | 5545 |
| 0000345760 | EC8B | 8E1E | 81D8 | 00EC | 5700 | 8E56 | D406 | 2631 |
| 0000346000 | 3E83 | 0F2E | 7408 | E903 | 0018 | 468A | 8B0A | 0E5E |
| 0000346020 | E3C1 | 0305 | 065E | 468E | 8B08 | 0C76 | 8826 | E900 |
| 0000346040 | 004C | 46F6 | 010C | 0374 | 19E9 | 8000 | 0A66 | 8B0F |
| 0000346060 | 0E5E | E3C1 | 0305 | 0C5E | EBD1 | 76C4 | 2606 | 2080 |
| 0000346100 | E9F0 | 0016 | 66C0 | 040A | 5E8B | C10E | 05E3 | 5E03 |
| 0000346120 | D10C | C4EB | 0676 | 8026 | 0F20 | 5E8B | C10E | 05E3 |
| 0000346140 | 5E03 | D10C | C4EB | 0676 | 468A | 260A | 0008 | 5F5E |
| 0000346160 | ED83 | 8B02 | 1FE5 | 4D5D | 1ECB | 9058 | 5545 | EC8B |
| 0000346200 | 8E1E | 81D8 | 04EC | 5700 | 8E56 | D406 | 2631 | 3E83 |
| 0000346220 | 0F2E | 7408 | E903 | 0018 | 5E8B | C10C | 05E3 | 5E03 |
| 0000346240 | 8E06 | 0846 | 768B | 260A | 008A | 4688 | E9FC | 0025 |
| 0000346260 | 5E8B | C10C | 05E3 | 5E03 | D10A | C4EB | 0676 | 8A26 |
| 0000346300 | 8800 | FC46 | 46F6 | 010A | 0375 | 04E9 | C000 | FC6E |
| 0000346320 | 8004 | FC66 | 8A0F | FC46 | 00E9 | 5E00 | 835F | 02ED |
| 0000346340 | E58B | 5D1F | CB4D | 581E | 4590 | 8B55 | 1EEC | D88E |

THU MAR 14 17:25:16 1991 CRV_IPS.DLL PAGE 126, LINE 7376

| | | | | | | | | |
|---|---|---|---|---|---|---|---|---|
| 0000346360 | EC81 | 0000 | 5657 | 5EC4 | 2606 | 1FC4 | FF26 | 0277 |
| 0000346400 | FF26 | 9A37 | 8ED8 | 10BC | C483 | C404 | 065E | C426 |
| 0000346420 | 261F | 77FF | 2606 | 77FF | 9A04 | 8ED8 | 10D2 | C483 |
| 0000346440 | C404 | 065E | C426 | 261F | 77FF | 260A | 77FF | 9A08 |
| 0000346460 | 8ED8 | 10E4 | C483 | C404 | 065E | FF26 | 0277 | FF26 |
| 0000346500 | 9A37 | 8ED8 | 0F1D | C483 | C404 | 065E | C02B | 8926 |
| 0000346520 | 0247 | 8926 | 5E07 | 835F | 02ED | E58B | 5D1F | CB4D |
| 0000346540 | 581E | 4590 | 8B55 | 1EEC | D88E | EC81 | 0000 | 5657 |
| 0000346560 | 5EC4 | 260A | 07C7 | 0000 | 086A | 5EC4 | 2606 | 77FF |
| 0000346600 | 9A08 | 99BC | 115F | C483 | C404 | 0A5E | 8926 | 0247 |
| 0000346620 | 8926 | 0457 | 5EC4 | 260A | 478B | 2604 | 470B | 7402 |
| 0000346640 | E903 | 0006 | FFB8 | E9FF | 0041 | 5EC4 | 260A | 47C7 |
| 0000346660 | 0006 | 6A00 | C408 | 065E | FF26 | 0677 | BC9A | A699 |
| 0000346700 | 8310 | 04C4 | 5EC4 | 260A | 4789 | 2608 | 5789 | C40A |
| 0000346720 | 0A5E | 8B26 | 0A47 | 0B26 | 0847 | 0374 | 06E9 | B800 |
| 0000346740 | FFFF | 06E9 | B800 | 0000 | 00E9 | 5E00 | 835F | 02ED |
| 0000346760 | E58B | 5D1F | CB4D | 581E | 4590 | 8B55 | 1EEC | D88E |
| 0000347000 | EC81 | 0000 | 5657 | 5EC4 | 2606 | 77FF | 2604 | 77FF |
| 0000347020 | 9A02 | 8ED8 | 11C7 | C483 | C404 | 065E | FF26 | 0A77 |
| 0000347040 | FF26 | 0877 | D89A | 248E | 8311 | 04C4 | 5F5E | ED83 |
| 0000347060 | 8B02 | 1FE5 | 4D5D | 1ECB | 9058 | 5545 | EC8B | 8E1E |
| 0000347100 | 81D8 | 08EC | 5700 | C756 | F846 | 0000 | 46C7 | 00FA |
| 0000347120 | E900 | 0003 | 46FF | 83FA | FA7E | 7C20 | E903 | 004E |
| 0000347140 | 46C7 | 00FC | E900 | 0003 | 46FF | 83FC | FC7E | 7C20 |
| 0000347160 | E903 | 002B | 76FF | FFFA | FC76 | 5EC4 | 2606 | 77FF |
| 0000347200 | 260A | 77FF | 9A08 | 1019 | 11B4 | C483 | 3C08 | 7500 |
| 0000347220 | E903 | 0008 | 46C7 | 01F8 | E900 | 0003 | C9E9 | 83FF |
| 0000347240 | F87E | 7500 | E903 | 0003 | 03E9 | E900 | FFA6 | 468A |
| 0000347260 | 98FC | 5EC4 | 260A | 0789 | 468A | 98FA | 5EC4 | 260A |
| 0000347300 | 4789 | B802 | 0000 | 00E9 | 5E00 | 835F | 02ED | E58B |
| 0000347320 | 5D1F | CB4D | 581E | 4590 | 8B55 | 1EEC | D88E | EC81 |
| 0000347340 | 0010 | 5657 | 468D | 16F0 | FF50 | 0876 | 76FF | 9A06 |
| 0000347360 | 1100 | 12B7 | C483 | 8908 | FC46 | 7E83 | 00FC | 0375 |
| 0000347400 | 06E9 | 8B00 | FC46 | C3E9 | 8D00 | F046 | 5016 | 76FF |
| 0000347420 | FF08 | 0676 | 779A | D713 | 8312 | 08C4 | 4689 | 83FC |
| 0000347440 | FC7E | 7500 | E903 | 0006 | 468B | E9FC | 009E | 76FF |
| 0000347460 | FF0C | 0A76 | 1E9A | F714 | 8312 | 04C4 | 4689 | 83FC |
| 0000347500 | FC7E | 7500 | E903 | 0006 | 468B | E9FC | 007E | 76FF |
| 0000347520 | FF0C | 0A76 | 369A | 1C1B | 8313 | 04C4 | 4689 | 83FC |
| 0000347540 | FC7E | 7500 | E903 | 0006 | 468B | E9FC | 005E | 76FF |
| 0000347560 | FF0C | 0A76 | 468D | 16F0 | 9A50 | 153D | 1342 | C483 |
| 0000347600 | 8908 | FC46 | 7E83 | 00FC | 0375 | 06E9 | 8B00 | FC46 |
| 0000347620 | 39E9 | FF00 | 0C76 | 76FF | FF0A | 0876 | 76FF | 9A06 |
| 0000347640 | 215C | 1361 | C483 | 8908 | FC46 | 7E83 | 00FC | 0375 |
| 0000347660 | 06E9 | 8B00 | FC46 | 13E9 | 8D00 | F046 | 5016 | 969A |
| 0000347700 | 2811 | 8312 | 04C4 | 00B8 | E900 | 0000 | 5F5E | ED83 |
| 0000347720 | 8B02 | 1FE5 | 4D5D | 1ECB | 9058 | 5545 | EC8B | 8E1E |
| 0000347740 | 81D8 | 0EEC | 5700 | C456 | 065E | 8326 | 067F | 7600 |
| 0000347760 | E903 | 000D | 5EC4 | 2606 | 7F83 | 0008 | 0377 | 6CE9 |
| 0000350000 | C700 | F446 | 0000 | 46C7 | 01F6 | E900 | 0007 | 46FF |
| 0000350020 | C1F4 | F666 | 8302 | F47E | 7204 | E903 | 004C | 46C7 |
| 0000350040 | 00F2 | E900 | 0003 | 46FF | 8BF2 | F246 | 4639 | 77F6 |
| 0000350060 | E903 | 0033 | 76FF | FFF2 | F476 | 468D | 16F8 | 9A50 |
| 0000350100 | 1DFF | 13FF | C483 | FF08 | 0C76 | 76FF | FF0A | FC76 |
| 0000350120 | 76FF | FFFA | F876 | 76FF | FF08 | 0676 | 589A | 921E |
| 0000350140 | 8312 | 0EC4 | BFE9 | E9FF | FFA4 | 7AE9 | B8FF | 0000 |
| 0000350160 | 00E9 | 5E00 | 835F | 02ED | E58B | 5D1F | CB4D | 581E |
| 0000350200 | 4590 | 8B55 | 1EEC | D88E | EC81 | 001C | 5657 | 5EC4 |
| 0000350220 | 2606 | 478B | 2668 | 578B | 896A | EE46 | 5689 | 8BF0 |

```
THU MAR 14 17:25:16 1991  CRV_IPS.DLL  PAGE 127, LINE 7435

0000350240  EE46  568B  05F0  000E  4689  89F6  F856  5EC4
0000350260  26F6  07C7  0000  5EC4  26F6  47C7  0004  C400
0000350300  F65E  C726  0247  0000  468B  8BEE  F056  CA05
0000350320  8904  EA46  5689  8BEC  EE46  568B  05F0  0234
0000350340  4689  89FA  FC56  46C7  00E8  E900  0003  46FF
0000350360  83E8  E87E  7209  E903  004F  5E6B  46E8  76C4
0000350400  26EA  00C7  0000  766B  46E8  5EC4  26EA  40C7
0000350420  0002  6B00  E876  C446  EA5E  C726  0440  0000
0000350440  5E6B  46E8  76C4  26FA  00C7  0000  766B  46E8
0000350460  5EC4  26FA  40C7  0002  6B00  E876  C446  FA5E
0000350500  C726  0440  0000  A5E9  8BFF  EE46  568B  05F0
0000350520  04AA  4689  89F2  F456  468B  8BFE  F056  1405
0000350540  8902  E446  5689  C7E6  E846  0000  03E9  FF00
0000350560  E846  7E83  20E8  0372  11E9  C400  F25E  C626
0000350600  0007  5EC4  26E4  07C6  E900  FFE3  00B8  E900
0000350620  0000  5F5E  ED83  8B02  1FE5  4D5D  1ECB  9058
0000350640  5545  EC8B  8E1E  81D8  00EC  5700  FF56  0C76
0000350660  76FF  FF0A  0876  76FF  9A06  158E  156A  C483
0000350700  FF08  0C76  76FF  9A0A  16C1  1578  C483  FF04
0000350720  0C76  76FF  9A0A  1832  13E2  C483  B804  0000
0000350740  00E9  5E00  835F  02ED  E58B  5D1F  CB4D  581E
0000350760  4590  8B55  1EEC  D88E  EC81  0010  5657  5EC4
0000351000  260A  478B  2668  578B  896A  F646  5689  8BF8
0000351020  F646  568B  05F8  000E  4689  89FA  FC56  46C7
0000351040  00F4  E900  0003  46FF  C4F4  065E  468B  26F4
0000351060  0739  D377  5CE9  C400  FA5E  8326  403F  0373
0000351100  03E9  E900  004D  5EC4  26FA  07FF  5EC4  26FA
0000351120  47FF  8B02  F476  E6C1  C403  FA5E  C08C  7EC4
0000351140  8C06  8EC1  C4C0  FA5E  408D  8906  F046  468C
0000351160  8EF2  26C1  458B  2602  558B  8B04  F44E  E1C1
0000351200  0303  1EC1  F08B  DA8E  7EC4  A5F0  A5A5  1FA5
0000351220  93E9  C7FF  F446  0000  03E9  FF00  F446  5EC4
0000351240  8B06  F446  3926  D647  0377  63E9  C400  FA5E
0000351260  8326  403F  0373  03E9  E900  0054  5EC4  26FA
0000351300  07FF  5EC4  26FA  47FF  C404  FA5E  8B26  0277
0000351320  7603  C1F4  03E6  5EC4  8CFA  C4C0  067E  C18C
0000351340  C08E  5EC4  8DFA  0640  4689  8CF0  F246  C18E
0000351360  8B26  0845  8B26  0A55  4E8B  C1F4  03E1  C103
0000351400  8B1E  8EF0  C4DA  F07E  A5A5  A5A5  E91F  FF8B
0000351420  00B8  E900  0000  5F5E  ED83  8B02  1FE5  4D5D
0000351440  1ECB  9058  5545  EC8B  8E1E  81D8  1CEC  5700
0000351460  C456  065E  8B26  6847  8B26  6A57  4689  89FA
0000351500  FC56  468B  8BFA  FC56  0405  89C0  F646  5689
0000351520  8BF8  FA46  568B  05FC  0214  4689  89E4  E656
0000351540  468B  8BE4  E656  2005  8900  E846  5689  8BEA
0000351560  FA46  568B  05FC  0214  4689  89F0  F256  5EC4
0000351600  26FA  478B  C408  FA5E  2B26  0647  8940  F446
0000351620  00B0  4688  88EE  EC46  03E9  FE00  EC46  5EC4
0000351640  8A06  EC46  3826  2C47  037D  4CE9  8A00  EC46
0000351660  8B98  C4D8  F076  468A  26EE  0038  0375  35E9
0000351700  FF00  EA76  76FF  C4E8  065E  FF26  2C77  76FF
0000351720  8AF4  EC46  FF50  F876  76FF  9AF6  1A44  1806
0000351740  C483  830E  E846  8A46  EC46  8B98  C4D8  F076
0000351760  8A26  8800  EE46  A2E9  8BFF  F45E  76C4  B0F0
0000352000  2646  68F6  03FF  E446  568B  05E6  0020  4689
0000352020  89E8  EA56  468A  FEF4  88C8  EC46  46C6  00EE
0000352040  03E9  FE00  EC4E  5EC4  8A06  EC46  3826  2C47
0000352060  037C  4CE9  8A00  EC46  8B98  C4D8  F076  468A
0000352100  26EE  0038  0375  35E9  FF00  EA76  76FF  C4E8
```

THU MAR 14 17:25:16 1991 CRV_IPS.DLL PAGE 128, LINE 7494

| | | | | | | | | |
|---|---|---|---|---|---|---|---|---|
| 0000352120 | 065E | FF26 | 2C77 | 76FF | 8AF4 | EC46 | FF50 | F876 |
| 0000352140 | 76FF | 9AF6 | 1A44 | 155C | C483 | 830E | E86E | 8A46 |
| 0000352160 | EC46 | 8B98 | C4D8 | F076 | 8A26 | 8800 | EE46 | A2E9 |
| 0000352200 | B8FF | 0000 | 00E9 | 5E00 | 835F | 02ED | E58B | 5D1F |
| 0000352220 | CB4D | 581E | 4590 | 8B55 | 1EEC | D88E | EC81 | 001C |
| 0000352240 | 5657 | 5EC4 | 2606 | 478B | 2668 | 578B | 896A | F846 |
| 0000352260 | 5689 | 8BFA | F846 | 568B | 05FA | 0004 | 4689 | 89F4 |
| 0000352300 | F656 | 468B | 8BF8 | FA56 | AA05 | 8904 | E446 | 5689 |
| 0000352320 | 8BE6 | E446 | 568B | 05E6 | 0020 | 4689 | 89E8 | EA56 |
| 0000352340 | 5EC4 | 26F8 | 478B | C40C | F85E | 2B26 | 0A47 | 8940 |
| 0000352360 | FC46 | 468B | 8BF8 | FA56 | AA05 | 8904 | F046 | 5689 |
| 0000352400 | B0F2 | 8800 | EE46 | 4688 | E9EC | 0003 | 46FE | C4EC |
| 0000352420 | 065E | 468A | 26EC | 4738 | 7D2E | E903 | 004C | 468A |
| 0000352440 | 98EC | D88B | 76C4 | 8AF0 | EE46 | 3826 | 7500 | E903 |
| 0000352460 | 0035 | 76FF | FFEA | E876 | 5EC4 | 2606 | 77FF | FF2E |
| 0000352500 | FC76 | 468A | 50EC | 76FF | FFF6 | F476 | A39A | 7719 |
| 0000352520 | 8319 | 0EC4 | 4683 | 46E8 | 468A | 98EC | D88B | 76C4 |
| 0000352540 | 26F0 | 008A | 4688 | E9EE | FFA2 | 5E8B | C4FC | F076 |
| 0000352560 | 46B0 | F626 | FF68 | 4603 | 8BE4 | E656 | 2005 | 8900 |
| 0000352600 | E846 | 5689 | 8AEA | FC46 | C8FE | 4688 | C6EC | EE46 |
| 0000352620 | E900 | 0003 | 4EFE | C4EC | 065E | 468A | 26EC | 4738 |
| 0000352640 | 7C2E | E903 | 004C | 468A | 98EC | D88B | 76C4 | 8AF0 |
| 0000352660 | EE46 | 3826 | 7500 | E903 | 0035 | 76FF | FFEA | E876 |
| 0000352700 | 5EC4 | 2606 | 77FF | FF2E | FC76 | 468A | 50EC | 76FF |
| 0000352720 | FFF6 | F476 | A39A | 7E19 | 8317 | 0EC4 | 6E83 | 46E8 |
| 0000352740 | 468A | 98EC | D88B | 76C4 | 26F0 | 006A | 4688 | E9EE |
| 0000352760 | FFA2 | 00B8 | C900 | 0000 | 5F5E | ED83 | 8B02 | 1FE5 |
| 0000353000 | 4D5D | 1ECB | 9058 | 5545 | EC8B | 8E1E | 81D8 | 04EC |
| 0000353020 | 5700 | C756 | FC46 | 0000 | 03E9 | FF00 | FC46 | 5EC4 |
| 0000353040 | 8B06 | FC46 | 3926 | 0A47 | 0377 | 6CE9 | 8A00 | 0A46 |
| 0000353060 | 4638 | 7D0E | E903 | 0016 | 468A | 980A | 768B | C1FC |
| 0000353100 | 03E6 | 5EC4 | 2606 | 4039 | 7C12 | E903 | 0031 | 468A |
| 0000353120 | 380A | 0E46 | 037C | 3DE9 | 8A00 | 0A46 | 8B98 | 8AC8 |
| 0000353140 | 0E46 | 2B98 | 8BC1 | 8AC8 | 0C46 | 0398 | 8BC8 | FC76 |
| 0000353160 | E6C1 | C403 | 065E | 3B26 | 1248 | 037F | 17E9 | FF00 |
| 0000353200 | 1276 | 76FF | FF10 | FC76 | 76FF | FF08 | 0676 | E59A |
| 0000353220 | EF1A | 8318 | 0AC4 | 82E9 | 5EFF | 835F | 02ED | E58B |
| 0000353240 | 5D1F | CB4D | 581E | 4590 | 8B55 | 1EEC | D88E | EC81 |
| 0000353260 | 0004 | 5657 | 46C7 | 00FC | E900 | 0003 | 46FF | C4FC |
| 0000353300 | 065E | 468B | 26FC | 4739 | 770A | E903 | 006C | 468A |
| 0000353320 | 380A | 0E46 | 037D | 16E9 | 8A00 | 0A46 | 8B98 | FC76 |
| 0000353340 | E6C1 | C403 | 065E | 3926 | 1040 | 037E | 31E9 | 8A00 |
| 0000353360 | 0A46 | 4638 | 7C0E | E903 | 003D | 468A | 980A | C88B |
| 0000353400 | 468A | 980E | C12B | C88B | 468A | 980C | C803 | 768B |
| 0000353420 | C1FC | 03E6 | 5EC4 | 2606 | 483B | 7F10 | E903 | 0017 |
| 0000353440 | 76FF | FF12 | 1076 | 76FF | FFFC | 0876 | 76FF | 9A06 |
| 0000353460 | 1AE5 | 1A31 | C483 | E90A | FF82 | 5F5E | ED83 | 8B02 |
| 0000353500 | 1FE5 | 4D5D | 1ECB | 9058 | 5545 | EC8B | 8E1E | 81D8 |
| 0000353520 | 00EC | 5700 | 8A56 | 0A46 | 5EC4 | 260C | 378B | 5EC4 |
| 0000353540 | 260C | 4D88 | C406 | 0C5E | FF26 | C407 | 065E | 468B |
| 0000353560 | 260A | 4739 | 770C | E903 | 000A | 5EC4 | 260C | 47FF |
| 0000353600 | E902 | 0007 | 5EC4 | 260C | 47FF | 5E04 | 835F | 02ED |
| 0000353620 | E58B | 5D1F | CB4D | 581E | 4590 | 8B55 | 1EEC | D88E |
| 0000353640 | EC81 | 0000 | 5657 | 76FF | FF08 | 0676 | 739A | 5D1B |
| 0000353660 | 831B | 04C4 | 76FF | FF08 | 0676 | B99A | D21C | 831A |
| 0000353700 | 04C4 | 00B8 | E900 | 0000 | 5F5E | ED83 | 8B02 | 1FE5 |
| 0000353720 | 4D5D | 1ECB | 9058 | 5545 | EC8B | 8E1E | 81D8 | 10EC |
| 0000353740 | 5700 | C456 | 065E | 8B26 | 6847 | 8B26 | 6A57 | 4689 |
| 0000353760 | 89F8 | FA56 | 468B | 8BF8 | FA56 | 1405 | 8902 | F246 |

THU MAR 14 17:25:16 1991 CRV_IPS.DLL PAGE 129, LINE 7553

| | | | | | | | | |
|---|---|---|---|---|---|---|---|---|
| 0000354000 | 5689 | C4F4 | F85E | 8B26 | 0847 | 5EC4 | 26F8 | 472B |
| 0000354020 | 4006 | 4689 | 8BF6 | F646 | 3399 | 2BC2 | C1C2 | 03F8 |
| 0000354040 | C233 | C22B | 4689 | 83FC | FC7E | 7400 | E903 | 0005 |
| 0000354060 | 46C7 | 01FC | C700 | F046 | 0000 | 03E9 | FF00 | F046 |
| 0000354100 | 468B | 39F6 | F046 | 037C | 1EE9 | 8B00 | F046 | D22B |
| 0000354120 | 76F7 | 2DFC | 0007 | C91B | C123 | D705 | C400 | F25E |
| 0000354140 | 768B | 26F0 | 0088 | D4E9 | C4FF | 065E | 8B26 | 2C5F |
| 0000354160 | 76C4 | 26F2 | 00C6 | C4FF | 065E | 8B26 | 2C47 | D22B |
| 0000354200 | 76F7 | 83FC | 00FA | 0375 | 3DE9 | C400 | 065E | 8B26 |
| 0000354220 | 2C47 | 2B40 | F7D2 | FC76 | FA83 | 7500 | E903 | 0028 |
| 0000354240 | 5EC4 | 2606 | 478B | 402C | 4689 | E9F0 | 0003 | 46FF |
| 0000354260 | 8BF0 | F646 | 4639 | 7CF0 | E903 | 000C | 5EC4 | 8BF2 |
| 0000354300 | F076 | FE26 | E900 | FFE6 | 7E83 | 01FC | 0374 | 37E9 |
| 0000354320 | C400 | 065E | 8B26 | 2C47 | 8940 | F046 | 03E9 | FF00 |
| 0000354340 | F046 | 468B | 39F6 | F046 | 037C | 1BE9 | 8B00 | F046 |
| 0000354360 | 3D48 | 0008 | 037F | 03E9 | B800 | 0008 | 5EC4 | 8BF2 |
| 0000354400 | F076 | 8826 | E900 | FFD7 | 00B8 | E900 | 0000 | 5F5E |
| 0000354420 | ED83 | 8B02 | 1FE5 | 4D5D | 1ECB | 9058 | 5545 | EC8B |
| 0000354440 | 8E1E | 81D8 | 10EC | 5700 | C456 | 065E | 8B26 | 6847 |
| 0000354460 | 8B26 | 6A57 | 4689 | 89F8 | FA56 | 468B | 8BF8 | FA56 |
| 0000354500 | AA05 | 8904 | F446 | 5689 | C4F6 | F85E | 8B26 | 0C47 |
| 0000354520 | 5EC4 | 26F8 | 472B | 400A | 4689 | 8BFC | FC46 | 3399 |
| 0000354540 | 2BC2 | C1C2 | 03F8 | C233 | C22B | 4689 | 83F0 | F07E |
| 0000354560 | 7400 | E903 | 0005 | 46C7 | 01F0 | C700 | F246 | 0000 |
| 0000354600 | 03E9 | FF00 | F246 | 468B | 39FC | F246 | 037C | 1EE9 |
| 0000354620 | 8B00 | F246 | D22B | 76F7 | 2DF0 | 0007 | C91B | C123 |
| 0000354640 | 0705 | C400 | F45E | 768B | 26F2 | 0088 | D4E9 | C4FF |
| 0000354660 | 065E | 8B26 | 2E5F | 76C4 | 26F4 | 00C6 | C4FF | 065E |
| 0000354700 | 8B26 | 2E47 | D22B | 76F7 | 83F0 | 00FA | 0375 | 3DE9 |
| 0000354720 | C400 | 065E | 8B26 | 2E47 | 2B40 | F7D2 | F076 | FA83 |
| 0000354740 | 7500 | E903 | 0028 | 5EC4 | 2606 | 478B | 402E | 4689 |
| 0000354760 | E9F2 | 0003 | 46FF | 8BF2 | FC46 | 4639 | 7CF2 | E903 |
| 0000355000 | 000C | 5EC4 | 8BF4 | F276 | FE26 | E900 | FFE6 | 7E83 |
| 0000355020 | 01F0 | 0374 | 37E9 | C400 | 065E | 8B26 | 2E47 | 8940 |
| 0000355040 | F246 | 03E9 | FF00 | F246 | 468B | 39FC | F246 | 037C |
| 0000355060 | 1BE9 | 8B00 | F246 | 3D48 | 0008 | 037F | 03E9 | B800 |
| 0000355100 | 0008 | 5EC4 | 8BF4 | F276 | 8826 | E900 | FFD7 | 00B8 |
| 0000355120 | E900 | 0000 | 5F5E | ED83 | 8B02 | 1FE5 | 4D5D | 1ECB |
| 0000355140 | 9058 | 5545 | EC8B | 8E1E | 81D8 | 06EC | 5700 | C756 |
| 0000355160 | FA46 | 0001 | 4E8A | B80A | 0020 | F8D3 | 4689 | C4FC |
| 0000355200 | 065E | 8926 | 0447 | 468B | 8A0C | 0A4E | E8D3 | 66F7 |
| 0000355220 | C4FC | 065E | 8926 | 0247 | 468B | 8AFA | 0A4E | E0D3 |
| 0000355240 | 2348 | 0C46 | 6EF7 | C4FC | 065E | 8926 | 5E07 | 835F |
| 0000355260 | 02ED | E58B | 5D1F | CB4D | 581E | 4590 | 8B55 | 1EEC |
| 0000355300 | D88E | EC81 | 0022 | 5657 | 468B | 890A | F446 | 468B |
| 0000355320 | 890C | F246 | 468B | 890E | FC46 | 468B | D1FC | 03F8 |
| 0000355340 | F446 | 4689 | 8BFA | FC46 | F8D1 | 4603 | 89F2 | F646 |
| 0000355360 | FFB8 | 897F | F846 | 4689 | 8BE2 | F246 | 4689 | 69F0 |
| 0000355400 | 02C0 | 0301 | 0646 | 568B | 0508 | 000A | 4689 | 89E4 |
| 0000355420 | E656 | 08E9 | FF00 | F046 | 4681 | 02E4 | 8B01 | FC46 |
| 0000355440 | 4603 | 3BF2 | F046 | 037F | C3E9 | C700 | EE46 | 0000 |
| 0000355460 | 03E9 | FF00 | EE46 | 5EC4 | 8BE4 | EE46 | 3926 | 7F07 |
| 0000355500 | E903 | 00A7 | 768B | C1EE | 03E6 | 5EC4 | 8BE4 | F446 |
| 0000355520 | 4603 | 26FC | 4039 | 7E02 | E903 | 008C | 768B | C1EE |
| 0000355540 | 03E6 | 5EC4 | 8BE4 | F446 | 3926 | 0240 | 037D | 77E9 |
| 0000355560 | 8B00 | F046 | 462B | 8BF6 | F7C8 | 8BE9 | EE76 | E6C1 |
| 0000355600 | C403 | E45E | C88B | 8B26 | 0240 | D88B | 5E2B | 8BFA |
| 0000355620 | F7C3 | 03EB | 89C8 | EA4E | 768B | C1EE | 03E6 | 5EC4 |
| 0000355640 | 26E4 | 7883 | 0008 | 0374 | 20E9 | 8B00 | E246 | 4639 |

THU MAR 14 17:25:16 1991 CRV_IPS.DLL PAGE 130, LINE 7612

| | | | | | | | | |
|---|---|---|---|---|---|---|---|---|
| 0000355660 | 7CEA | E903 | 0012 | 468B | 89EA | E246 | 468B | 89F0 |
| 0000355700 | E846 | 468B | 89EE | EC46 | 1DE9 | 8B00 | F846 | 4639 |
| 0000355720 | 7CEA | E903 | 0012 | 468B | 89EA | F846 | 468B | 89F0 |
| 0000355740 | DE46 | 468B | 89EE | E046 | 48E9 | E9FF | FF27 | 7E81 |
| 0000355760 | FFE2 | 7C7F | E903 | 001A | 76FF | FF12 | 1076 | 76FF |
| 0000356000 | FFE8 | EC76 | 76FF | FF08 | 0676 | E19A | D11F | 831F |
| 0000356020 | 0CC4 | 7E81 | FFF8 | 7C7F | E903 | 001A | 76FF | FF12 |
| 0000356040 | 1076 | 76FF | FFDE | E076 | 76FF | FF08 | 0676 | E19A |
| 0000356060 | 4F1F | 831B | 0CC4 | 5F5E | ED83 | 8B02 | 1FE5 | 4D5D |
| 0000356100 | 1ECB | 9058 | 5545 | EC8B | 8E1E | 81D8 | 0EEC | 5700 |
| 0000356120 | 6956 | 0C46 | 0102 | 4603 | 8B06 | 0856 | 0AD5 | 8900 |
| 0000356140 | F846 | 5689 | 8BFA | 0A76 | E6C1 | C403 | F85E | 8326 |
| 0000356160 | 0878 | 7400 | E903 | 0079 | 5EC4 | 260E | 078B | 4689 |
| 0000356200 | C4FC | 0E5E | 8B26 | 0247 | 8B26 | 0457 | 4E8B | C1FC |
| 0000356220 | 03E1 | C103 | 4689 | 89F4 | F656 | 5EC4 | 260E | 07FF |
| 0000356240 | 5EC4 | 2606 | 4FFF | 8B08 | 0A76 | E6C1 | C403 | F85E |
| 0000356260 | 8A26 | 0240 | C498 | F45E | 8926 | 8A07 | 0C46 | C498 |
| 0000356300 | F45E | 8926 | 0247 | 768B | C10A | 03E6 | 5EC4 | 26F8 |
| 0000356320 | 408A | C404 | F45E | 8826 | 0447 | 768B | C10A | 03E6 |
| 0000356340 | 5EC4 | 26F8 | 408A | C405 | F45E | 8826 | 0547 | 78E9 |
| 0000356360 | C400 | 0E5E | 8B26 | 0647 | 4689 | C4FC | 0E5E | 8B26 |
| 0000356400 | 0847 | 8B26 | 0A57 | 4E8B | C1FC | 03E1 | C103 | 4689 |
| 0000356420 | 89F4 | F656 | 5EC4 | 260E | 47FF | C406 | 065E | FF26 |
| 0000356440 | 064F | 768B | C10A | 03E6 | 5EC4 | 26F8 | 408A | 9802 |
| 0000356460 | 5EC4 | 26F4 | 0789 | 468A | 980C | 5EC4 | 26F4 | 4789 |
| 0000356500 | 8B02 | 0A76 | E6C1 | C403 | F85E | 8B26 | 0640 | 5EC4 |
| 0000356520 | 26F4 | 4789 | 8B06 | 0A76 | E6C1 | C403 | F85E | 8B26 |
| 0000356540 | 0440 | 5EC4 | 26F4 | 4789 | C404 | F85E | FF26 | 8B0F |
| 0000356560 | 0A46 | 4689 | E9F2 | 0003 | 46FF | C4F2 | F85E | 468B |
| 0000356600 | 26F2 | 0739 | 037F | 28E9 | 8B00 | F276 | E6C1 | C403 |
| 0000356620 | F85E | 468B | C1F2 | 03E0 | 4603 | 8BF8 | FA56 | 0A05 |
| 0000356640 | 1E00 | 788D | 8B02 | 8EF0 | A5DA | A5A5 | 1FA5 | C7E9 |
| 0000356660 | 5EFF | 835F | 02ED | E58B | 5D1F | CB4D | 581E | 4590 |
| 0000356700 | 8B55 | 1EEC | D88E | EC81 | 0004 | 5657 | 5EC4 | 260A |
| 0000356720 | 77FF | 266A | 77FF | FF68 | 0876 | 76FF | 9A06 | 2208 |
| 0000356740 | 21A0 | C483 | 8908 | FC46 | 7E83 | 00FC | 0375 | 06E9 |
| 0000356760 | 8B00 | FC46 | 66E9 | FF00 | 0C76 | 76FF | 9A0A | 224B |
| 0000357000 | 21C0 | C483 | 8904 | FC46 | 7E83 | 00FC | 0375 | 06E9 |
| 0000357020 | 8B00 | FC46 | 46E9 | FF00 | 0C76 | 76FF | 9A0A | 22B5 |
| 0000357040 | 21E0 | C483 | 8904 | FC46 | 7E83 | 00FC | 0375 | 06E9 |
| 0000357060 | 8B00 | FC46 | 26E9 | FF00 | 0C76 | 76FF | 9A0A | 2A3C |
| 0000357100 | 1FAD | C483 | 8904 | FC46 | 7E83 | 00FC | 0375 | 06E9 |
| 0000357120 | 8B00 | FC46 | 06E9 | B800 | 0000 | 00E9 | 5E00 | 835F |
| 0000357140 | 02ED | E58B | 5D1F | CB4D | 581E | 4590 | 8B55 | 1EEC |
| 0000357160 | D88E | EC81 | 0000 | 5657 | 5EC4 | 2606 | 7F83 | 0204 |
| 0000357200 | 0374 | 0CE9 | C400 | 0A5E | C726 | 0447 | 0002 | 09E9 |
| 0000357220 | C400 | 0A5E | C726 | 0447 | 0003 | 00B8 | E900 | 0000 |
| 0000357240 | 5F5E | ED83 | 8B02 | 1FE5 | 4D5D | 1ECB | 9058 | 5545 |
| 0000357260 | EC8B | 8E1E | 81D8 | 06EC | 5700 | C456 | 065E | 8B26 |
| 0000357300 | 6847 | 8B26 | 6A57 | 4689 | 89FA | FC56 | 5EC4 | 2606 |
| 0000357320 | 478B | C42C | FA5E | 8926 | 0647 | 5EC4 | 2606 | 478B |
| 0000357340 | C42E | FA5E | 8926 | 0A47 | 5EC4 | 2606 | 478B | C42C |
| 0000357360 | FA5E | 2926 | 0847 | 5EC4 | 2606 | 478B | C42E | FA5E |
| 0000357400 | 2926 | 0C47 | 00B8 | E900 | 0000 | 5F5E | ED83 | 8B02 |
| 0000357420 | 1FE5 | 4D5D | 1ECB | 9058 | 5545 | EC8B | 8E1E | 81D8 |
| 0000357440 | 14EC | 5700 | C456 | 065E | 8B26 | 6847 | 8B26 | 6A57 |
| 0000357460 | 4689 | 89FA | FC56 | 468B | 8BFA | FC56 | 0E05 | 8900 |
| 0000357500 | F446 | 5689 | C7F6 | F846 | 0000 | 03E9 | FF00 | F846 |
| 0000357520 | 5EC4 | 8BF4 | F846 | 3926 | 7707 | E903 | 00D8 | 5EC4 |

THU MAR 14 17:25:16 1991 CRV_IPS.DLL PAGE 131, LINE 7671

| | | | | | | | | |
|---|---|---|---|---|---|---|---|---|
| 0000357540 | 2606 | 478B | 992C | 768B | C1F8 | 03E6 | 5EC4 | 8BF4 |
| 0000357560 | 26C8 | 408B | 8B06 | 99DA | C12B | D31B | 012D | 8300 |
| 0000357600 | 00DA | 4689 | 89F0 | F256 | 5EC4 | 2606 | 478B | 992E |
| 0000357620 | 768B | C1F8 | 03E6 | 5EC4 | 8BF4 | 26C8 | 408B | 8B08 |
| 0000357640 | 99DA | C12B | D31B | 4689 | 89EC | EE56 | 068E | 31D4 |
| 0000357660 | 8126 | 283E | 000F | 7704 | E903 | 0038 | 006A | FF26 |
| 0000357700 | 2E36 | 6A0F | 6800 | 0600 | 76FF | FFEE | EC76 | 909A |
| 0000357720 | 7EA1 | 0323 | F046 | 5613 | 52F2 | 9A50 | A190 | 23C0 |
| 0000357740 | 768B | C1F8 | 03E6 | 5EC4 | 26F4 | 4089 | 2606 | 5089 |
| 0000357760 | E908 | 003F | 068E | 31D4 | 006A | FF26 | 2E36 | 8B0F |
| 0000360000 | EC46 | 568B | 8AEE | 8AF2 | 8AD4 | 2AE0 | D1C0 | D1E0 |
| 0000360020 | D1D2 | D1E0 | 03D2 | F046 | 5613 | 52F2 | 9A50 | A190 |
| 0000360040 | 2180 | 768B | C1F8 | 03E6 | 5EC4 | 26F4 | 4089 | 2606 |
| 0000360060 | 5089 | E908 | FF17 | 00B8 | E900 | 0000 | 5F5E | ED83 |
| 0000360100 | 8B02 | 1FE5 | 4D5D | 1ECB | 9058 | 5545 | EC8D | 8E1E |
| 0000360120 | 81D8 | 04EC | 5700 | 8E56 | D406 | 2631 | 268A | 0F2E |
| 0000360140 | E4C0 | 2A02 | C1C0 | 03E8 | 4689 | FFFC | FC76 | 5EC4 |
| 0000360160 | 2606 | 77FF | 2662 | 77FF | C460 | 0A5E | FF26 | 6277 |
| 0000360200 | FF26 | 6077 | 649A | 489F | 8324 | 0AC4 | 76FF | C4FC |
| 0000360220 | 065E | FF26 | 5E77 | FF26 | 5C77 | 5EC4 | 260A | 77FF |
| 0000360240 | 265E | 77FF | 9A5C | 9F64 | 2371 | C483 | C40A | 0A5E |
| 0000360260 | C726 | 2C47 | 0010 | 5EC4 | 260A | 47C7 | 102E | C400 |
| 0000360300 | 0A5E | C726 | 3047 | 0000 | 5EC4 | 260A | 47C7 | 0032 |
| 0000360320 | B800 | 0000 | 00E9 | 5E00 | 835F | 02ED | E58B | 5D1F |
| 0000360340 | CB4D | 581E | 4590 | 8B55 | 1EEC | D88E | EC81 | 0008 |
| 0000360360 | 5657 | 468D | 16F8 | 9A50 | 0EC8 | 2507 | C483 | 8904 |
| 0000360400 | FC46 | 7E83 | 00FC | 0375 | 06E9 | 8B00 | FC46 | 80E9 |
| 0000360420 | C400 | 065E | 8B26 | 6047 | 8B26 | 6257 | 5EC4 | 26F8 |
| 0000360440 | 4789 | 2608 | 5789 | C40A | 065E | 8B26 | 5C47 | 8B26 |
| 0000360460 | 5E57 | 5EC4 | 26F8 | 0789 | 8926 | 0257 | 5EC4 | 2606 |
| 0000360500 | 478B | C42A | F85E | 8926 | 0C47 | 5EC4 | 26F8 | 478B |
| 0000360520 | C40C | 0A5E | 8926 | 0447 | 76FF | FFFA | F876 | 76FF |
| 0000360540 | FF0C | 0A76 | 5A9A | 2606 | 8325 | 08C4 | 4689 | 83FC |
| 0000360560 | FC7E | 7500 | E903 | 0006 | 468B | E9FC | 0013 | 468D |
| 0000360600 | 16F8 | 9A50 | 1086 | 2427 | C483 | B804 | 0000 | 00E9 |
| 0000360620 | 5E00 | 835F | 02ED | E58B | 5D1F | CB4D | 581E | 4590 |
| 0000360640 | 8B55 | 1EEC | D88E | EC81 | 0032 | 5657 | 146A | 016A |
| 0000360660 | BC9A | 7699 | 8325 | 04C4 | 4689 | 89E4 | E656 | 468B |
| 0000360700 | 0BE6 | E446 | 0374 | 06E9 | B800 | FFFF | D7E9 | 6A02 |
| 0000360720 | 6A14 | 9A01 | 99BC | 25F6 | C483 | 8904 | EA46 | 5689 |
| 0000360740 | 8BEC | EC46 | 460B | 74EA | E903 | 0006 | FFB8 | E9FF |
| 0000360760 | 02B4 | 5EC4 | 260A | 478B | 2660 | 578B | C462 | EA5E |
| 0000361000 | 8926 | 0847 | 8926 | 0A57 | 5EC4 | 260A | 478B | 265C |
| 0000361020 | 578B | C45E | EA5E | 8926 | 2607 | 5789 | C402 | 065E |
| 0000361040 | 8B26 | 6047 | 8B26 | 6257 | 5EC4 | 26E4 | 4789 | 2608 |
| 0000361060 | 5789 | C40A | 065E | 8B26 | 5C47 | 8B26 | 5E57 | 5EC4 |
| 0000361100 | 26E4 | 0789 | 8926 | 0257 | 468D | 16F2 | FF50 | EC76 |
| 0000361120 | 76FF | 9AEA | 11D7 | 2609 | C483 | 8D08 | CE46 | 5016 |
| 0000361140 | 76FF | FFE6 | E476 | D79A | 8211 | 8326 | 08C4 | 468B |
| 0000361160 | 2BF2 | CE46 | 4689 | 8BE8 | F446 | 462B | 89D0 | E046 |
| 0000361200 | 00B8 | 8900 | FC46 | 4689 | 8BFA | E046 | 082D | 8900 |
| 0000361220 | EE46 | 03E9 | FF00 | EE46 | 468B | 05E0 | 0008 | 463B |
| 0000361240 | 7FEE | E903 | 0081 | 468B | 2DE8 | 0008 | 4689 | E9F0 |
| 0000361260 | 0003 | 46FF | 8BF0 | E846 | 0805 | 3B00 | F046 | 037F |
| 0000361300 | 61E9 | 8D00 | E246 | 5016 | 468D | 16DC | FF50 | EE76 |
| 0000361320 | 76FF | FFF0 | E676 | 76FF | FFE4 | EC76 | 76FF | 9AEA |
| 0000361340 | 0544 | 249A | C483 | 8B14 | FA46 | 4639 | 77DC | E903 |
| 0000361360 | 0012 | 468B | 89DC | FA46 | 468B | 89F0 | D846 | 468B |
| 0000361400 | 89EE | D646 | 468B | 39FC | E246 | 0377 | 12E9 | 8B00 |

THU MAR 14 17:25:16 1991 CRV_IPS.DLL PAGE 132, LINE 7730

| | | | | | | | | |
|---|---|---|---|---|---|---|---|---|
| 0000361420 | E246 | 4689 | 8BFC | F046 | 4689 | 8BDE | EE46 | 4689 |
| 0000361440 | E9DA | FF8E | 6EE9 | 8EFF | D406 | 2631 | 3E83 | 0F3A |
| 0000361460 | 7500 | E903 | 0006 | 46FF | FFDA | D646 | 7E83 | 00D8 |
| 0000361500 | 037C | 04E9 | 8300 | D846 | 831F | DE7E | 7C00 | E903 |
| 0000361520 | 0004 | 4683 | 1FDE | 7E83 | 00D6 | 037C | 04E9 | 8300 |
| 0000361540 | D646 | 831F | DA7E | 7C00 | E903 | 0004 | 4683 | 1FDA |
| 0000361560 | 7E83 | 0C0E | 0375 | 2DE9 | 8300 | 0E7E | 7506 | E903 |
| 0000361600 | 0024 | 7E83 | 030E | 0375 | 1BE9 | 8300 | 0E7E | 7509 |
| 0000361620 | E903 | 0012 | 7E83 | 080E | 0375 | 09E9 | 8300 | 0E7E |
| 0000361640 | 7402 | E903 | 002D | 5EC4 | 260A | 7F83 | 022A | 0374 |
| 0000361660 | 0DE9 | 8B00 | DE46 | 5EC4 | 260A | 4789 | E92C | 000A |
| 0000361700 | 468B | C4D8 | 0A5E | 8926 | 2C47 | 5EC4 | 260A | 47C7 |
| 0000361720 | 0130 | 8300 | 0E7E | 750C | E903 | 002D | 7E83 | 060E |
| 0000361740 | 0375 | 24E9 | 8300 | 0E7E | 7503 | E903 | 001B | 7E83 |
| 0000361760 | 090E | 0375 | 12E9 | 8300 | 0E7E | 7504 | E903 | 0009 |
| 0000362000 | 7E83 | 010E | 0374 | 2DE9 | C400 | 0A5E | 8326 | 2A7F |
| 0000362020 | 7402 | E903 | 000D | 468B | C4DA | 0A5E | 8926 | 2E47 |
| 0000362040 | 0AE9 | 8B00 | D646 | 5EC4 | 260A | 4789 | C42E | 0A5E |
| 0000362060 | C726 | 3247 | 0001 | 7E83 | 0C0E | 0375 | 45E9 | 8300 |
| 0000362100 | 0E7E | 7506 | E903 | 003C | 7E83 | 030E | 0375 | 33E9 |
| 0000362120 | 8300 | 0E7E | 7509 | E903 | 002A | 7E83 | 040E | 0375 |
| 0000362140 | 21E9 | 8300 | 0E7E | 7501 | E903 | 0018 | 7E83 | 080E |
| 0000362160 | 0375 | 0FE9 | 8300 | 0E7E | 7502 | E903 | 0006 | FFB8 |
| 0000362200 | E9FF | 0022 | 76FF | FFE6 | E476 | D89A | 3B8E | 8328 |
| 0000362220 | 04C4 | 76FF | FFEC | EA76 | D89A | 538E | 8325 | 04C4 |
| 0000362240 | 00B8 | E900 | 0000 | 5F5E | ED83 | 8B02 | 1FE5 | 4D5D |
| 0000362260 | 1ECB | 9058 | 5545 | EC8B | 8E1E | 81D8 | 0CEC | 5700 |
| 0000362300 | 8D56 | F446 | 5016 | C89A | 880E | 8328 | 04C4 | 4689 |
| 0000362320 | 83FC | FC7E | 7500 | E903 | 0006 | 468B | E9FC | 0140 |
| 0000362340 | 468D | 16F8 | 9A50 | 0EC8 | 28BF | C483 | 8904 | FC46 |
| 0000362360 | 7E83 | 00FC | 0375 | 06E9 | 8B00 | FC46 | 21E9 | C401 |
| 0000362400 | 0A5E | FF26 | 4477 | 5EC4 | 2606 | 77FF | 2662 | 77FF |
| 0000362420 | C460 | F45E | FF26 | 0A77 | FF26 | 0877 | 649A | E39F |
| 0000362440 | 8328 | 0AC4 | 5EC4 | 260A | 77FF | C444 | 065E | FF26 |
| 0000362460 | 5E77 | FF26 | 5C77 | 5EC4 | 26F4 | 77FF | 2602 | 37FF |
| 0000362500 | 649A | 089F | 8329 | 0AC4 | 5EC4 | 260A | 77FF | C444 |
| 0000362520 | 0A5E | FF26 | 6277 | FF26 | 6077 | 5EC4 | 26F8 | 77FF |
| 0000362540 | 260A | 77FF | 9A08 | 9F64 | 292C | C483 | C40A | 0A5E |
| 0000362560 | FF26 | 4477 | 5EC4 | 260A | 77FF | 265E | 77FF | C45C |
| 0000362600 | F85E | FF26 | 0277 | FF26 | 9A37 | 9F64 | 2940 | C483 |
| 0000362620 | FF0A | F676 | 76FF | FFF4 | FA76 | 76FF | 9AF8 | 01F2 |
| 0000362640 | 2977 | C483 | 8908 | FC46 | 7E83 | 00FC | 0375 | 06E9 |
| 0000362660 | 8B00 | FC46 | 69E9 | C400 | 0A5E | FF26 | 4477 | 5EC4 |
| 0000362700 | 26F8 | 77FF | 260A | 77FF | C408 | 0A5E | FF26 | 6277 |
| 0000362720 | FF26 | 6077 | 649A | 9B9F | 8329 | 0AC4 | 5EC4 | 260A |
| 0000362740 | 77FF | C444 | F85E | FF26 | 0277 | FF26 | C437 | 0A5E |
| 0000362760 | FF26 | 5E77 | FF26 | 5C77 | 649A | A89F | 8329 | 0AC4 |
| 0000363000 | 468D | 16F4 | 9A50 | 1086 | 29B5 | C483 | 8D04 | F846 |
| 0000363020 | 5016 | 869A | 2D10 | 8328 | 04C4 | 00B8 | E900 | 0000 |
| 0000363040 | 5F5E | ED83 | 8B02 | 1FE5 | 4D5D | 1ECB | 9058 | 5545 |
| 0000363060 | EC8B | 8E1E | 81D8 | 00EC | 5700 | C456 | 065E | 8B26 |
| 0000363100 | 2C47 | 5EC4 | 260A | 0789 | 5EC4 | 2606 | 478B | C42E |
| 0000363120 | 0A5E | 8926 | 0247 | 00B8 | E900 | 0000 | 5F5E | ED83 |
| 0000363140 | 8B02 | 1FE5 | 4D5D | 1ECB | 9058 | 5545 | EC8B | 8E1E |
| 0000363160 | 81D8 | 00EC | 5700 | 8B56 | 0A46 | 5EC4 | 2606 | 4789 |
| 0000363200 | 8B2C | 0C46 | 5EC4 | 2606 | 4789 | B82E | 0000 | 00E9 |
| 0000363220 | 5E00 | 835F | 02ED | E58B | 5D1F | CB4D | 581E | 4590 |
| 0000363240 | 8B55 | 1EEC | D88E | EC81 | 0006 | 5657 | 46C7 | 00FC |
| 0000363260 | E900 | 0003 | 46FF | 83FC | FC7E | 7220 | E903 | 005C |

THU MAR 14 17:25:16 1991 CRV_IPS.DLL PAGE 133, LINE 7789

| | | | | | | | | |
|---|---|---|---|---|---|---|---|---|
| 0000363300 | 46C7 | 00FA | E900 | 0003 | 46FF | 83FA | FA7E | 7220 |
| 0000363320 | E903 | 0045 | 76FF | FFFA | FC76 | 5EC4 | 2606 | 77FF |
| 0000363340 | 2662 | 77FF | 9A60 | 1019 | 2AB1 | C483 | 3C08 | 7400 |
| 0000363360 | E903 | 0022 | 76FF | FFFA | FC76 | 068E | 31D4 | A026 |
| 0000363400 | 0F32 | C450 | 065E | FF26 | 5E77 | FF26 | 5C77 | 8B9A |
| 0000363420 | 690F | 8328 | 0AC4 | AFE9 | E9FF | FF98 | 00B8 | E900 |
| 0000363440 | 0000 | 5F5E | ED83 | 8B02 | 1FE5 | 4D5D | 00CB | 581E |
| 0000363460 | 4590 | 8B55 | 1EEC | D88E | EC81 | 001A | 5657 | B81E |
| 0000363500 | FFFF | D88E | 46C7 | 20E6 | C700 | E846 | 0020 | 046A |
| 0000363520 | 681E | 2142 | 186A | 468D | 16E6 | 6A50 | 9A34 | DFDD |
| 0000363540 | 2A88 | C483 | 3D0E | 0000 | 0375 | 09E9 | B800 | FFFF |
| 0000363560 | 09E9 | E900 | 0006 | 00B8 | E900 | 0000 | 5E1F | 835F |
| 0000363600 | 02ED | E58B | 5D1F | CB4D | 581E | 4590 | 8B55 | 1EEC |
| 0000363620 | D88E | EC81 | 0004 | 5657 | B81E | 2AE0 | D88E | 3E83 |
| 0000363640 | 2148 | 7500 | E903 | 0008 | 9E9A | 6759 | 892B | FC46 |
| 0000363660 | 06C7 | 2148 | 0000 | 006A | 006A | 006A | 006A | 006A |
| 0000363700 | 006A | 0A6A | DD9A | 00DF | 832B | 0EC4 | 003D | 7500 |
| 0000363720 | E903 | 0009 | FFB8 | E9FF | 0009 | 06E9 | 8B00 | FC46 |
| 0000363740 | 00E9 | 1F00 | 5F5E | ED83 | 8B02 | 1FE5 | 4D5D | 1ECB |
| 0000363760 | 9058 | 5545 | EC8B | 8E1E | 81D8 | 30EC | 5700 | 1E56 |
| 0000364000 | 3AB8 | 8E2B | C7D8 | FA46 | 214C | 5E8C | C7FC | EC46 |
| 0000364020 | 0101 | C02B | 4689 | 89DC | DA46 | 068E | 31D6 | 8326 |
| 0000364040 | FF3E | 00FF | 0375 | 1DE9 | FF00 | 4036 | FF21 | 3E36 |
| 0000364060 | 8D21 | D246 | 5016 | FF9A | 00FF | 8300 | 08C4 | 003D |
| 0000364100 | 7400 | E903 | 000F | 068E | 31D8 | 8326 | 9D3E | 002D |
| 0000364120 | 0375 | 3BE9 | 1E00 | 6268 | 8D21 | DE46 | 5016 | 468D |
| 0000364140 | 16D2 | 8D50 | EE46 | 5016 | D368 | 1E00 | 7868 | FF25 |
| 0000364160 | 3C36 | FF21 | 3A36 | FF21 | 4036 | FF21 | 3E36 | 9A21 |
| 0000364200 | FFFF | 0000 | C483 | 891E | EE46 | 5689 | E9F0 | 0008 |
| 0000364220 | C02B | 4689 | 89F0 | EE46 | 46C7 | 00F6 | C700 | D046 |
| 0000364240 | 0001 | 468B | 0B08 | 0646 | 0374 | 64E9 | C700 | F646 |
| 0000364260 | 0001 | C02B | 4689 | 89F4 | F246 | 068E | 31D6 | 8326 |
| 0000364300 | FA3E | 002C | 0375 | 45E9 | 8300 | D67E | 75FE | E903 |
| 0000364320 | 003C | 681E | 2178 | 468D | 16DE | 8D50 | EE46 | 5016 |
| 0000364340 | 468D | 16D2 | 1E50 | 7868 | 6825 | 00EB | 36FF | 213C |
| 0000364360 | 36FF | 213A | 36FF | 2140 | 36FF | 213E | 681E | 2187 |
| 0000364400 | 3A68 | 682D | 2D3D | 409A | 002D | 8300 | 26C4 | 47E9 |
| 0000364420 | C405 | 065E | C726 | 2487 | 0001 | 8B00 | 0646 | 568B |
| 0000364440 | 0508 | 0024 | 4689 | 89F2 | F456 | 5EC4 | 2606 | 478B |
| 0000364460 | E91A | 0501 | 06C7 | 258C | 0000 | 46C7 | 00D0 | C400 |
| 0000364500 | F25E | 8B26 | 2847 | A2A3 | 8354 | A23E | 0454 | 0374 |
| 0000364520 | 0BE9 | 8E01 | D606 | 2631 | 3E83 | 2D85 | 7500 | E903 |
| 0000364540 | 0045 | 7E83 | FED6 | 0375 | 3CE9 | 1E00 | 8F68 | 8D21 |
| 0000364560 | DE46 | 5016 | 468D | 16EE | 8D50 | D246 | 5016 | 681E |
| 0000364600 | 2578 | FC68 | FF00 | 3C36 | FF21 | 3A36 | FF21 | 4036 |
| 0000364620 | FF21 | 3E36 | 1E21 | 9C68 | 6821 | FFFF | FF68 | 9AFF |
| 0000364640 | FFFF | 0000 | C483 | C726 | 8E06 | 0025 | C700 | 9A06 |
| 0000364660 | 0025 | 8300 | 463E | 0021 | 0375 | 21E9 | 9A00 | 2CE1 |
| 0000364700 | FFFF | 5EC4 | 2606 | 8789 | 0124 | 5EC4 | 2606 | BF83 |
| 0000364720 | 0124 | 7400 | E903 | 0006 | 06C7 | 2146 | 0000 | 068E |
| 0000364740 | 31D6 | 8326 | C13E | 002B | 0375 | 09E9 | 8300 | D67E |
| 0000364760 | 74FE | E903 | 000F | 068E | 31D8 | 8326 | FF3E | 00FF |
| 0000365000 | 0375 | 50E9 | C700 | D846 | 0003 | 76FF | FFDC | DA76 |
| 0000365020 | 468D | 16D8 | FF50 | EC76 | 76FF | FFFC | FA76 | 4E8D |
| 0000365040 | 16DE | 8D51 | EE4E | 5116 | 4E8D | 16D2 | 1E51 | 7868 |
| 0000365060 | 6825 | 0104 | 36FF | 213C | 36FF | 213A | 36FF | 2140 |
| 0000365100 | 36FF | 213E | FF9A | 00FF | 8300 | 28C4 | 468B | E9D8 |
| 0000365120 | 185D | 06E9 | B800 | 0003 | 54E9 | E918 | 001B | 92A1 |
| 0000365140 | 0B25 | 9006 | 7425 | E903 | 0009 | 06C7 | 258E | 0000 |

THU MAR 14 17:25:16 1991 CRV_IPS.DLL PAGE 134, LINE 7848

| | | | | | | | | |
|---|---|---|---|---|---|---|---|---|
| 0000365160 | 06E9 | C700 | 8E06 | 0125 | E900 | 03DC | 46C7 | 00D0 |
| 0000365200 | C700 | 8C06 | 0025 | C700 | 8E06 | 0125 | E900 | 03C8 |
| 0000365220 | 46C7 | 00D0 | 8300 | 9A3E | 0025 | 0374 | E4E9 | 8E00 |
| 0000365240 | D606 | 2631 | 3E83 | 2EAD | 7500 | E903 | 0045 | 7E83 |
| 0000365260 | FED6 | 0375 | 3CE9 | 1E00 | A468 | 8D21 | DE46 | 5016 |
| 0000365300 | 468D | 16EE | 8D50 | D246 | 5016 | 681E | 2578 | 1868 |
| 0000365320 | FF01 | 3C36 | FF21 | 3A36 | FF21 | 4036 | FF21 | 3E36 |
| 0000365340 | 1E21 | C368 | 6821 | 2F73 | 7668 | 9A2F | 2F79 | 0000 |
| 0000365360 | C483 | 1E26 | CB68 | 9A21 | 2F28 | 0000 | 5EC4 | 2606 |
| 0000365400 | 87C7 | 0124 | 0017 | 068E | 31D6 | 8326 | 333E | 002F |
| 0000365420 | 0375 | 09E9 | 8300 | D67E | 74FE | E903 | 000F | 068E |
| 0000365440 | 31D8 | 8326 | D83E | 002F | 0375 | 50E9 | C700 | D846 |
| 0000365460 | 0000 | 76FF | FFDC | DA76 | 468D | 16D8 | FF50 | EC76 |
| 0000365500 | 76FF | FFFC | FA76 | 4E8D | 16DE | 8D51 | EE4E | 5116 |
| 0000365520 | 4E8D | 16D2 | 1E51 | 7868 | 6825 | 011C | 36FF | 213C |
| 0000365540 | 36FF | 213A | 36FF | 2140 | 36FF | 213E | 209A | 0030 |
| 0000365560 | 8300 | 28C4 | 468B | E9D8 | 1735 | 06E9 | B800 | 0000 |
| 0000365600 | 2CE9 | 1E17 | EB68 | 9A21 | 2FA1 | 0000 | 068E | 31D6 |
| 0000365620 | 8326 | C03E | 002F | 0375 | 45E9 | 8300 | D67E | 75FE |
| 0000365640 | E903 | 003C | 681E | 21F6 | 468D | 16DE | 8D50 | EE46 |
| 0000365660 | 5016 | 468D | 16D2 | 1E50 | 7868 | 6825 | 011F | 36FF |
| 0000365700 | 213C | 36FF | 213A | 36FF | 2140 | 36FF | 213E | 681E |
| 0000365720 | 220C | 0868 | 6831 | 310B | 0E9A | 0031 | 8300 | 26C4 |
| 0000365740 | 006A | D268 | FF00 | 9636 | FF25 | 9436 | 6A25 | 9A01 |
| 0000365760 | FFFF | 0000 | 5EC4 | 2606 | 8789 | 0124 | 681E | 2214 |
| 0000366000 | FF9A | 00FF | C400 | 065E | 8326 | 24BF | 0001 | 0374 |
| 0000366020 | 06E9 | C700 | 4806 | 0121 | 8E00 | D606 | 2631 | 3E83 |
| 0000366040 | 3046 | 7500 | E903 | 0009 | 7E83 | FED6 | 0374 | 0FE9 |
| 0000366060 | 8E00 | D806 | 2631 | 3E83 | 305E | 7500 | E903 | 0050 |
| 0000366100 | 46C7 | 00D8 | FF00 | DC76 | 76FF | 8DDA | D846 | 5016 |
| 0000366120 | 76FF | FFEC | FC76 | 76FF | 8DFA | DE4E | 5116 | 4E8D |
| 0000366140 | 16EE | 8D51 | D24E | 5116 | 681E | 2578 | 2868 | FF01 |
| 0000366160 | 3C36 | FF21 | 3A36 | FF21 | 4036 | FF21 | 3E36 | 9A21 |
| 0000366200 | 30A6 | 0000 | C483 | 8B28 | D846 | 22E9 | E916 | 0006 |
| 0000366220 | 00B8 | E900 | 1619 | BFE9 | C701 | 4806 | 0121 | 8E00 |
| 0000366240 | D606 | 2631 | 3E83 | 30C8 | 7500 | E903 | 0009 | 7E83 |
| 0000366260 | FED6 | 0374 | 0FE9 | 8E00 | D806 | 2631 | 3E83 | 3171 |
| 0000366300 | 7500 | E903 | 0050 | 46C7 | 00D8 | FF00 | DC76 | 76FF |
| 0000366320 | 8DDA | D846 | 5016 | 76FF | FFEC | FC76 | 76FF | 8DFA |
| 0000366340 | DE4E | 5116 | 4E8D | 16EE | 8D51 | D24E | 5116 | 681E |
| 0000366360 | 2578 | 2F68 | FF01 | 3C36 | FF21 | 3A36 | FF21 | 4036 |
| 0000366400 | FF21 | 3E36 | 9A21 | 31B9 | 0000 | C483 | 8B28 | D846 |
| 0000366420 | 9CE9 | E915 | 0006 | 00B8 | E900 | 1593 | 46C7 | 00D0 |
| 0000366440 | 8E00 | D606 | 2631 | 3E83 | 3159 | 7500 | E903 | 0045 |
| 0000366460 | 7E83 | FED6 | 0375 | 3CE9 | 1E00 | 1568 | 8D22 | DE46 |
| 0000366500 | 5016 | 468D | 16EE | 8D50 | D246 | 5016 | 681E | 2578 |
| 0000366520 | 3368 | FF01 | 3C36 | FF21 | 3A36 | FF21 | 4036 | FF21 |
| 0000366540 | 3E36 | 1E21 | 2268 | 6822 | 2CA1 | A468 | 9A2C | 2CA7 |
| 0000366560 | 0000 | C483 | 8326 | 463E | 0021 | 0375 | B0E9 | 9A00 |
| 0000366600 | 2CE1 | 2D60 | 5EC4 | 2606 | 8789 | 0124 | 5EC4 | 2606 |
| 0000366620 | BF83 | 0124 | 7500 | E903 | 0095 | 06C7 | 258C | 0000 |
| 0000366640 | 06C7 | 258E | 0000 | 06C7 | 259C | 0000 | 06C7 | 2146 |
| 0000366660 | 0000 | 068E | 31D6 | 8326 | 613E | 002C | 0375 | 09E9 |
| 0000366700 | 8300 | D67E | 74FE | E903 | 000F | 068E | 31D8 | 8326 |
| 0000366720 | ED3E | 002B | 0375 | 50E9 | C700 | D846 | 0003 | 76FF |
| 0000366740 | FFDC | DA76 | 468D | 16D8 | FF50 | EC76 | 76FF | FFFC |
| 0000366760 | FA76 | 4E8D | 16DE | 8D51 | EE4E | 5116 | 4E8D | 16D2 |
| 0000367000 | 1E51 | 7868 | 6825 | 013B | 36FF | 213C | 36FF | 213A |
| 0000367020 | 36FF | 2140 | 36FF | 213E | E59A | 002D | 8300 | 28C4 |

THU MAR 14 17:25:16 1991 CRV_IPS.DLL PAGE 135, LINE 7907

| | | | | | | | | |
|---|---|---|---|---|---|---|---|---|
| 0000367040 | 468B | E9D8 | 1489 | 06E9 | B800 | 0003 | 80E9 | E914 |
| 0000367060 | 0026 | 23E9 | 2D00 | 0041 | 0375 | F7E9 | 48FA | 0375 |
| 0000367100 | D9E9 | 48FE | 0375 | 47E9 | 48FC | 0375 | 4AE9 | 48FE |
| 0000367120 | 0375 | 27E9 | E9FC | 0000 | 7E83 | 00D0 | 0374 | 97E9 |
| 0000367140 | A100 | 2592 | 060B | 2590 | 0375 | 8BE9 | 8300 | F67E |
| 0000367160 | 7400 | E903 | 0082 | 76FF | FFF4 | F276 | 90A1 | 8B25 |
| 0000367200 | 9216 | 0525 | 0004 | 5052 | 089A | 0792 | 8334 | 08C4 |
| 0000367220 | 003D | 7500 | E903 | 0060 | 068E | 31D6 | 8326 | BC3E |
| 0000367240 | 0032 | 0375 | 45E9 | 8300 | D67E | 75FE | E903 | 003C |
| 0000367260 | 681E | 222A | 468D | 16DE | 8D50 | EE46 | 5016 | 468D |
| 0000367300 | 16D2 | 1E50 | 7868 | 6825 | 0150 | 36FF | 213C | 36FF |
| 0000367320 | 213A | 36FF | 2140 | 36FF | 213E | 681E | 2236 | FC68 |
| 0000367340 | 6832 | 32FF | 029A | 0033 | 8300 | 26C4 | 06C7 | 258C |
| 0000367360 | 0000 | 06C7 | 258E | 0000 | 7E83 | 00D0 | 0375 | 0AE9 |
| 0000367400 | 8300 | 9C3E | 0025 | 0374 | D4E9 | 8300 | 8C3E | 0025 |
| 0000367420 | 0374 | CAE9 | 8E00 | D606 | 2631 | 3E83 | 332C | 7500 |
| 0000367440 | E903 | 0045 | 7E83 | FED6 | 0375 | 3CE9 | 1E00 | 3E68 |
| 0000367460 | 8D22 | DE46 | 5016 | 468D | 16EE | 8D50 | D246 | 5016 |
| 0000367500 | 681E | 2578 | 5C68 | FF01 | 3C36 | FF21 | 3A36 | FF21 |
| 0000367520 | 4036 | FF21 | 3E36 | 1E21 | 5168 | 6822 | 336C | 6F68 |
| 0000367540 | 9A33 | 3372 | 0000 | C483 | C726 | 8C06 | 0125 | C700 |
| 0000367560 | 9C06 | 0025 | C700 | 8A06 | 0025 | 8300 | 983E | 0025 |
| 0000367600 | 0375 | 5AE9 | 8E00 | D606 | 2631 | 3E83 | 33A3 | 7500 |
| 0000367620 | E903 | 0045 | 7E83 | FED6 | 0375 | 3CE9 | 1E00 | 5968 |
| 0000367640 | 8D22 | DE46 | 5016 | 468D | 16EE | 8D50 | D246 | 5016 |
| 0000367660 | 681E | 2578 | 6468 | FF01 | 3C36 | FF21 | 3A36 | FF21 |
| 0000367700 | 4036 | FF21 | 3E36 | 1E21 | 6868 | 6822 | 33E9 | EC68 |
| 0000367720 | 9A33 | 33EF | 0000 | C483 | C726 | 9806 | 0025 | 8300 |
| 0000367740 | D07E | 7500 | E903 | 000A | 3E83 | 259C | 7400 | E903 |
| 0000367760 | 03C0 | 3E83 | 258E | 7400 | E903 | 03B6 | 068E | 31D6 |
| 0000370000 | 8326 | 303E | 0034 | 0375 | 4BE9 | 8300 | D67E | 75FE |
| 0000370020 | E903 | 0042 | 76FF | FFF4 | F276 | 681E | 2270 | 468D |
| 0000370040 | 16DE | 8D50 | EE46 | 5016 | 468D | 16D2 | 1E50 | 7868 |
| 0000370060 | 6825 | 0172 | 36FF | 213C | 36FF | 213A | 36FF | 2140 |
| 0000370100 | 36FF | 213E | 681E | 228B | 7068 | 6834 | 3473 | 769A |
| 0000370120 | 0034 | 8300 | 2AC4 | 681E | 259E | 681E | 2590 | 76FF |
| 0000370140 | FFF4 | F276 | 5D9A | 0B46 | 8335 | 0CC4 | 4689 | 8BEA |
| 0000370160 | EA46 | 5EC4 | 2606 | 8789 | 0124 | 7E83 | 00EA | 0375 |
| 0000370200 | D7E9 | C700 | 8C06 | 0025 | 8E00 | D606 | 2631 | 3E83 |
| 0000370220 | 3484 | 7500 | E903 | 0045 | 7E83 | FED6 | 0375 | 3CE9 |
| 0000370240 | 1E00 | 9368 | 8D22 | DE46 | 5016 | 468D | 16EE | 8D50 |
| 0000370260 | D246 | 5016 | 681E | 2578 | 7868 | FF01 | 3C36 | FF21 |
| 0000370300 | 3A36 | FF21 | 4036 | FF21 | 3E36 | 1E21 | A268 | 6822 |
| 0000370320 | 3574 | 7768 | 9A35 | 357A | 0000 | C483 | 8E26 | D606 |
| 0000370340 | 2631 | 3E83 | 3534 | 7500 | E903 | 0009 | 7E83 | FED6 |
| 0000370360 | 0374 | 0FE9 | 8E00 | D806 | 2631 | 3E83 | 2EC5 | 7500 |
| 0000370400 | E903 | 0050 | 46C7 | 03D8 | FF00 | DC76 | 76FF | 8DDA |
| 0000370420 | D846 | 5016 | 76FF | FFEC | FC76 | 76FF | 8DFA | DE4E |
| 0000370440 | 5116 | 4E8D | 16EE | 8D51 | D24E | 5116 | 681E | 2578 |
| 0000370460 | 7968 | FF01 | 3C36 | FF21 | 3A36 | FF21 | 4036 | FF21 |
| 0000370500 | 3E36 | 9A21 | 2F0D | 0000 | C483 | 8B28 | D846 | 5EE9 |
| 0000370520 | E911 | 0006 | 03B8 | E900 | 1155 | 681E | 259E | 681E |
| 0000370540 | 2594 | 76FF | FFF4 | F276 | 5D9A | 4B46 | 832B | 0CC4 |
| 0000370560 | 4689 | 8BEA | EA46 | 5EC4 | 2606 | 8789 | 0124 | 7E83 |
| 0000370600 | 00EA | 0375 | D7E9 | C700 | 8C06 | 0025 | 8E00 | D606 |
| 0000370620 | 2631 | 3E83 | 2E46 | 7500 | E903 | 0045 | 7E83 | FED6 |
| 0000370640 | 0375 | 3CE9 | 1E00 | AA68 | 8D22 | DE46 | 5016 | 468D |
| 0000370660 | 16EE | 8D50 | D246 | 5016 | 681E | 2578 | 8368 | FF01 |
| 0000370700 | 3C36 | FF21 | 3A36 | FF21 | 4036 | FF21 | 3E36 | 1E21 |

THU MAR 14 17:25:16 1991 CRV_IPS.DLL PAGE 136, LINE 7966

| | | | | | | | | |
|---|---|---|---|---|---|---|---|---|
| 0000370720 | C068 | 6822 | 2E86 | 8968 | 9A2E | 2E8C | 0000 | C483 |
| 0000370740 | 8E26 | D606 | 2631 | 3E83 | 3605 | 7500 | E903 | 0009 |
| 0000370760 | 7E83 | FED6 | 0374 | 0FE9 | 8E00 | D806 | 2631 | 3E83 |
| 0000371000 | 36EE | 7500 | E903 | 0050 | 46C7 | 03D8 | FF00 | DC76 |
| 0000371020 | 76FF | 8DDA | D846 | 5016 | 76FF | FFEC | FC76 | 76FF |
| 0000371040 | 8DFA | DE4E | 5116 | 4E8D | 16EE | 8D51 | D24E | 5116 |
| 0000371060 | 681E | 2578 | 8468 | FF01 | 3C36 | FF21 | 3A36 | FF21 |
| 0000371100 | 4036 | FF21 | 3E36 | 9A21 | 3736 | 0000 | C483 | 8B28 |
| 0000371120 | D846 | 5AE9 | E910 | 0006 | 03B8 | E900 | 1051 | 068E |
| 0000371140 | 31D6 | 8326 | 823E | 0036 | 0375 | 45E9 | 8300 | D67E |
| 0000371160 | 75FE | E903 | 003C | 681E | 22C8 | 468D | 16DE | 8D50 |
| 0000371200 | EE46 | 5016 | 468D | 16D2 | 1E50 | 7868 | 6825 | 0187 |
| 0000371220 | 36FF | 213C | 36FF | 213A | 36FF | 2140 | 36FF | 213E |
| 0000371240 | 681E | 22D7 | C268 | 6836 | 36C5 | C89A | 0036 | 8300 |
| 0000371260 | 26C4 | 681E | 54A4 | B89A | 8449 | 8338 | 04C4 | 4689 |
| 0000371300 | 8BEA | EA46 | 5EC4 | 2606 | 8789 | 0124 | 7E83 | 00EA |
| 0000371320 | 0375 | D7E9 | C700 | 8C06 | 0025 | 8E00 | D606 | 2631 |
| 0000371340 | 3E83 | 36D6 | 7500 | E903 | 0045 | 7E83 | FED6 | 0375 |
| 0000371360 | 3CE9 | 1E00 | DF68 | 8D22 | DE46 | 5016 | 468D | 16EE |
| 0000371400 | 8D50 | D246 | 5016 | 681E | 2578 | 8D68 | FF01 | 3C36 |
| 0000371420 | FF21 | 3A36 | FF21 | 4036 | FF21 | 3E36 | 1E21 | EE68 |
| 0000371440 | 6822 | 37AC | AF68 | 9A37 | 37B2 | 0000 | C483 | 8E26 |
| 0000371460 | D606 | 2631 | 3E83 | 376C | 7500 | E903 | 0009 | 7E83 |
| 0000371500 | FED6 | 0374 | 0FE9 | 8E00 | D806 | 2631 | 3E83 | 380F |
| 0000371520 | 7500 | E903 | 0050 | 46C7 | 03D8 | FF00 | DC76 | 76FF |
| 0000371540 | 8DDA | D846 | 5016 | 76FF | FFEC | FC76 | 76FF | 8DFA |
| 0000371560 | DE4E | 5116 | 4E8D | 16EE | 8D51 | D24E | 5116 | 681E |
| 0000371600 | 2578 | 8E68 | FF01 | 3C36 | FF21 | 3A36 | FF21 | 4036 |
| 0000371620 | FF21 | 3E36 | 9A21 | 3857 | 0000 | C483 | 8B28 | D846 |
| 0000371640 | 0CE9 | E90F | 0006 | 03B8 | E900 | 0F03 | 06C7 | 258E |
| 0000371660 | 0001 | 7E83 | 00F6 | 0374 | 59E9 | C403 | 065E | 8B26 |
| 0000371700 | 1A47 | 3CE9 | 8E03 | D606 | 2631 | 3E83 | 37F7 | 7500 |
| 0000371720 | E903 | 0045 | 7E83 | FED6 | 0375 | 3CE9 | 1E00 | F668 |
| 0000371740 | 8D22 | DE46 | 5016 | 468D | 16EE | 8D50 | D246 | 5016 |
| 0000371760 | 681E | 2578 | A068 | FF01 | 3C36 | FF21 | 3A36 | FF21 |
| 0000372000 | 4036 | FF21 | 3E36 | 1E21 | FC68 | 6822 | 327F | 8268 |
| 0000372020 | 9A32 | 3285 | 0000 | C483 | 8326 | 463E | 0021 | 0375 |
| 0000372040 | AAE9 | 9A00 | 2CE1 | 3122 | 5EC4 | 2606 | 8789 | 0124 |
| 0000372060 | 5EC4 | 2606 | BF83 | 0124 | 7500 | E903 | 008F | 06C7 |
| 0000372100 | 258C | 0000 | 06C7 | 258E | 0000 | 06C7 | 259C | 0000 |
| 0000372120 | 068E | 31D6 | 8326 | 993E | 0038 | 0375 | 09E9 | 8300 |
| 0000372140 | D67E | 74FE | E903 | 000F | 068E | 31D8 | 8326 | B13E |
| 0000372160 | 0038 | 0375 | 50E9 | C700 | D846 | 0003 | 76FF | FFDC |
| 0000372200 | DA76 | 468D | 16D8 | FF50 | EC76 | 76FF | FFFC | FA76 |
| 0000372220 | 4E8D | 16DE | 8D51 | EE4E | 5116 | 4E8D | 16D2 | 1E51 |
| 0000372240 | 7868 | 6825 | 01A7 | 36FF | 213C | 36FF | 213A | 36FF |
| 0000372260 | 2140 | 36FF | 213E | F99A | 0038 | 8300 | 28C4 | 468B |
| 0000372300 | E9D8 | 0DEB | 06E9 | B800 | 0003 | E2E9 | C70D | 4606 |
| 0000372320 | 0021 | 6A00 | 6A00 | 6A00 | 6A00 | 1E02 | 4A68 | 6A21 |
| 0000372340 | 9A08 | DFDD | 322B | C483 | 1E0E | 0468 | 9A23 | 2E98 |
| 0000372360 | 0000 | 068E | 31D6 | 8326 | 3F3E | 0032 | 0375 | 09E9 |
| 0000372400 | 8300 | D67E | 74FE | E903 | 000F | 068E | 31D8 | 8326 |
| 0000372420 | 9C3E | 0034 | 0375 | 50E9 | C700 | D846 | 0000 | 76FF |
| 0000372440 | FFDC | DA76 | 468D | 16D8 | FF50 | EC76 | 76FF | FFFC |
| 0000372460 | FA76 | 4E8D | 16DE | 8D51 | EE4E | 5116 | 4E8D | 16D2 |
| 0000372500 | 1E51 | 7868 | 6825 | 01AE | 36FF | 213C | 36FF | 213A |
| 0000372520 | 36FF | 2140 | 36FF | 213E | E49A | 0034 | 8300 | 28C4 |
| 0000372540 | 468B | E9D8 | 0D49 | 06E9 | B800 | 0000 | 40E9 | E90D |
| 0000372560 | 01A2 | 06C7 | 2598 | 0001 | 92A1 | 0B25 | 9006 | 7525 |

THU MAR 14 17:25:16 1991 CRV_IPS.DLL PAGE 137, LINE 8025

| | | | | | | | | |
|---|---|---|---|---|---|---|---|---|
| 0000372600 | E903 | 000A | 3E83 | 259E | 7500 | E903 | 00DB | 5EC4 |
| 0000372620 | 2606 | 87C7 | 0124 | 000F | 068E | 31D6 | 8326 | 933E |
| 0000372640 | 0039 | 0375 | 45E9 | 8300 | D67E | 75FE | E903 | 003C |
| 0000372660 | 681E | 232B | 468D | 16DE | 8D50 | EE46 | 5016 | 468D |
| 0000372700 | 16D2 | 1E50 | 7868 | 6825 | 01B6 | 36FF | 213C | 36FF |
| 0000372720 | 213A | 36FF | 2140 | 36FF | 213E | 681E | 2338 | 5768 |
| 0000372740 | 683C | 3C5A | 5D9A | 003C | 8300 | 26C4 | 068E | 31D6 |
| 0000372760 | 8326 | 283E | 003A | 0375 | 09E9 | 8300 | D67E | 74FE |
| 0000373000 | E903 | 000F | 068E | 31D8 | 8326 | 403E | 003A | 0375 |
| 0000373020 | 50E9 | C700 | D846 | 0000 | 76FF | FFDC | DA76 | 468D |
| 0000373040 | 16D8 | FF50 | EC76 | 76FF | FFFC | FA76 | 4E8D | 16DE |
| 0000373060 | 8D51 | EE4E | 5116 | 4E8D | 16D2 | 1E51 | 7868 | 6825 |
| 0000373100 | 01B7 | 36FF | 213C | 36FF | 213A | 36FF | 2140 | 36FF |
| 0000373120 | 213E | 889A | 003A | 8300 | 28C4 | 468B | E9D8 | 0C4F |
| 0000373140 | 06E9 | B800 | 0000 | 46E9 | FF0C | 9636 | FF25 | 9436 |
| 0000373160 | 9A25 | 4B2D | 3B85 | C483 | C404 | 065E | 8926 | 2487 |
| 0000373200 | 8E01 | D606 | 2631 | 3E83 | 3ACE | 7500 | E903 | 0009 |
| 0000373220 | 7E83 | FED6 | 0374 | 0FE9 | 8E00 | D806 | 2631 | 3E83 |
| 0000373240 | 3AE6 | 7500 | E903 | 0050 | 46C7 | 00D8 | FF00 | DC76 |
| 0000373260 | 76FF | 8DDA | D846 | 5016 | 76FF | FFEC | FC76 | 76FF |
| 0000373300 | 8DFA | DE4E | 5116 | 4E8D | 16EE | 8D51 | D24E | 5116 |
| 0000373320 | 681E | 2578 | BC68 | FF01 | 3C36 | FF21 | 3A36 | FF21 |
| 0000373340 | 4036 | FF21 | 3E36 | 9A21 | 3B2E | 0000 | C483 | 8B28 |
| 0000373360 | D846 | BAE9 | E90B | 0006 | 00B8 | E900 | 0BB1 | 13E9 |
| 0000373400 | 2D00 | 0042 | 0375 | 69E9 | 2DFE | 0003 | 0375 | B4E9 |
| 0000373420 | E9FC | 0000 | 7E83 | 00D0 | 0375 | 87E9 | 8300 | 9C3E |
| 0000373440 | 0025 | 0374 | 7DE9 | 8E00 | D606 | 2631 | 3E83 | 3B9A |
| 0000373460 | 7500 | E903 | 0009 | 7E83 | FED6 | 0374 | 0FE9 | 8E00 |
| 0000373500 | D806 | 2631 | 3E83 | 3BB2 | 7500 | E903 | 0050 | 46C7 |
| 0000373520 | 01D8 | FF00 | DC76 | 76FF | 8DDA | D846 | 5016 | 76FF |
| 0000373540 | FFEC | FC76 | 76FF | 8DFA | DE4E | 5116 | 4E8D | 16EE |
| 0000373560 | 8D51 | D24E | 5116 | 681E | 2578 | C668 | FF01 | 3C36 |
| 0000373600 | FF21 | 3A36 | FF21 | 4036 | FF21 | 3E36 | 9A21 | 3BFA |
| 0000373620 | 0000 | C483 | 8B28 | D846 | 14E9 | E90B | 0006 | 01B8 |
| 0000373640 | E900 | 0B0B | 8AA1 | E925 | 0A1E | 3E83 | 259C | 7400 |
| 0000373660 | E903 | 0036 | 3E83 | 54A2 | 7401 | E903 | 0006 | 40B8 |
| 0000373700 | E923 | 0003 | 6DB8 | 1E23 | 9A50 | 388E | 0000 | 06C7 |
| 0000373720 | 259C | 0001 | 006A | 006A | 006A | 026A | 681E | 214A |
| 0000373740 | 086A | DD9A | 79DF | 833C | 0EC4 | 7E83 | 00F6 | 0374 |
| 0000373760 | 7DE9 | 8E00 | D606 | 2631 | 3E83 | 3C17 | 7500 | E903 |
| 0000374000 | 0009 | 7E83 | FED6 | 0374 | 0FE9 | 8E00 | D806 | 2631 |
| 0000374020 | 3E83 | 3CBB | 7500 | E903 | 0050 | 46C7 | 01D8 | FF00 |
| 0000374040 | DC76 | 76FF | 8DDA | D846 | 5016 | 76FF | FFEC | FC76 |
| 0000374060 | 76FF | 8DFA | DE4E | 5116 | 4E8D | 16EE | 8D51 | D24E |
| 0000374100 | 5116 | 681E | 2578 | D768 | FF01 | 3C36 | FF21 | 3A36 |
| 0000374120 | FF21 | 4036 | FF21 | 3E36 | 9A21 | 35E8 | 0000 | C483 |
| 0000374140 | 8B28 | D846 | 48E9 | E90A | 0006 | 01B8 | E900 | 0A3F |
| 0000374160 | 068E | 31D6 | 8326 | A33E | 003C | 0375 | 45E9 | 8300 |
| 0000374200 | D67E | 75FE | E903 | 003C | 681E | 239F | 468D | 16DE |
| 0000374220 | 8D50 | EE46 | 5016 | 468D | 16D2 | 1E50 | 7868 | 6825 |
| 0000374240 | 01DB | 36FF | 213C | 36FF | 213A | 36FF | 2140 | 36FF |
| 0000374260 | 213E | 681E | 23AF | 4568 | 6836 | 3648 | 4B9A | 0036 |
| 0000374300 | 8300 | 26C4 | 06C7 | 258A | 0001 | 36FF | 259E | 36FF |
| 0000374320 | 2596 | 36FF | 2594 | 009A | 5900 | 8336 | 06C4 | 4689 |
| 0000374340 | 83EA | EA7E | 7500 | E903 | 0092 | 06C7 | 258C | 0000 |
| 0000374360 | 06C7 | 258E | 0000 | 06C7 | 259C | 0000 | 068E | 31D6 |
| 0000374400 | 8326 | 883E | 0035 | 0375 | 09E9 | 8300 | D67E | 74FE |
| 0000374420 | E903 | 000F | 068E | 31D8 | 8326 | A03E | 0035 | 0375 |
| 0000374440 | 50E9 | C700 | D846 | 0003 | 76FF | FFDC | DA76 | 468D |

THU MAR 14 17:25:16 1991 CRV_IPS.DLL PAGE 138, LINE 8084

| | | | | | | | | |
|---|---|---|---|---|---|---|---|---|
| 0000374460 | 16D8 | FF50 | EC76 | 76FF | FFFC | FA76 | 4E8D | 16DE |
| 0000374500 | 8D51 | EE4E | 5116 | 4E8D | 16D2 | 1E51 | 7868 | 6825 |
| 0000374520 | 01E4 | 36FF | 213C | 36FF | 213A | 36FF | 2140 | 36FF |
| 0000374540 | 213E | F39A | 0039 | 8300 | 28C4 | 468B | E9D8 | 093F |
| 0000374560 | 06E9 | B800 | 0003 | 36E9 | E909 | 0006 | 06C7 | 259E |
| 0000374600 | 0000 | 3E83 | 2146 | 7400 | E903 | 0020 | AD9A | C62C |
| 0000374620 | 8937 | EA46 | 7E83 | 00EA | 0374 | 09E9 | C700 | 4606 |
| 0000374640 | 0121 | E900 | 0006 | 06C7 | 2146 | 0000 | 7E83 | 00EA |
| 0000374660 | 0374 | 14E9 | 1E00 | A468 | 9A54 | 2312 | 3FF0 | C483 |
| 0000374700 | 3D04 | 0000 | 0375 | 8FE9 | C700 | 8C06 | 0025 | C700 |
| 0000374720 | 8E06 | 0025 | C700 | 9C06 | 0025 | 8E00 | D606 | 2631 |
| 0000374740 | 3E83 | 3E08 | 7500 | E903 | 0009 | 7E83 | FED6 | 0374 |
| 0000374760 | 0FE9 | 8E00 | D806 | 2631 | 3E83 | 3E20 | 7500 | E903 |
| 0000375000 | 0050 | 46C7 | 03D8 | FF00 | DC76 | 76FF | 8DDA | D846 |
| 0000375020 | 5016 | 76FF | FFEC | FC76 | 76FF | 8DFA | DE4E | 5116 |
| 0000375040 | 4E8D | 16EE | 8D51 | D24E | 5116 | 681E | 2578 | F868 |
| 0000375060 | FF01 | 3C36 | FF21 | 3A36 | FF21 | 4036 | FF21 | 3E36 |
| 0000375100 | 9A21 | 3E68 | 0000 | C483 | 8B28 | D846 | 60E9 | E908 |
| 0000375120 | 0006 | 03B8 | E900 | 0857 | 681E | 23B7 | 039A | 003F |
| 0000375140 | 8E00 | D606 | 2631 | 3E83 | 3EB1 | 7500 | E903 | 0009 |
| 0000375160 | 7E83 | FED6 | 0374 | 0FE9 | 8E00 | D806 | 2631 | 3E83 |
| 0000375200 | 3F26 | 7500 | E903 | 0050 | 46C7 | 00D8 | FF00 | DC76 |
| 0000375220 | 76FF | 8DDA | D846 | 5016 | 76FF | FFEC | FC76 | 76FF |
| 0000375240 | 8DFA | DE4E | 5116 | 4E8D | 16EE | 8D51 | D24E | 5116 |
| 0000375260 | 681E | 2578 | FC68 | FF01 | 3C36 | FF21 | 3A36 | FF21 |
| 0000375300 | 4036 | FF21 | 3E36 | 9A21 | 3F6E | 0000 | C483 | 8B28 |
| 0000375320 | D846 | DAE9 | E907 | 0006 | 00B8 | E900 | 07D1 | 7E83 |
| 0000375340 | 00F6 | 0375 | 91E9 | 8302 | A23E | 0254 | 0374 | F3E9 |
| 0000375360 | 1E00 | A468 | 9A54 | 55FE | 3FE5 | C483 | A304 | 25A0 |
| 0000375400 | 3E83 | 25A0 | 7400 | E903 | 00DA | 068E | 31D6 | 8326 |
| 0000375420 | 0E3E | 003F | 0375 | 45E9 | 8300 | D67E | 75FE | E903 |
| 0000375440 | 003C | 681E | 23E5 | 468D | 16DE | 8D50 | EE46 | 5016 |
| 0000375460 | 468D | 16D2 | 1E50 | 7868 | 6825 | 0205 | 36FF | 213C |
| 0000375500 | 36FF | 213A | 36FF | 2140 | 36FF | 213E | 681E | 2416 |
| 0000375520 | CB68 | 683F | 3FCE | D19A | 003F | 8300 | 26C4 | 681E |
| 0000375540 | 241E | 6A9A | 003B | 8E00 | D606 | 2631 | 3E83 | 3F8B |
| 0000375560 | 7500 | E903 | 0009 | 7E83 | FED6 | 0374 | 0FE9 | 8E00 |
| 0000375600 | D806 | 2631 | 3E83 | 40AE | 7500 | E903 | 0050 | 46C7 |
| 0000375620 | 00D8 | FF00 | DC76 | 76FF | 8DDA | D846 | 5016 | 76FF |
| 0000375640 | FFEC | FC76 | 76FF | 8DFA | DE4E | 5116 | 4E8D | 16EE |
| 0000375660 | 8D51 | D24E | 5116 | 681E | 2578 | 0768 | FF02 | 3C36 |
| 0000375700 | FF21 | 3A36 | FF21 | 4036 | FF21 | 3E36 | 9A21 | 3D03 |
| 0000375720 | 0000 | C483 | 8B28 | D846 | D4E9 | E906 | 0006 | 00B8 |
| 0000375740 | E900 | 06CB | 068E | 31D6 | 8326 | 0E3E | 0040 | 0375 |
| 0000375760 | 45E9 | 8300 | D67E | 75FE | E903 | 003C | 681E | 244F |
| 0000376000 | 468D | 16DE | 8D50 | EE46 | 5016 | 468D | 16D2 | 1E50 |
| 0000376020 | 7868 | 6825 | 020C | 36FF | 213C | 36FF | 213A | 36FF |
| 0000376040 | 2140 | 36FF | 213E | 681E | 245F | 4E6B | 6840 | 4051 |
| 0000376060 | 549A | 0040 | 8300 | 26C4 | 06C7 | 258A | 0002 | 681E |
| 0000376100 | 54A4 | DF9A | 6C57 | 8340 | 04C4 | 4689 | 9AEA | 2CE1 |
| 0000376120 | 3D2F | 4689 | 83EA | EA7E | 7400 | E903 | 0009 | 06C7 |
| 0000376140 | 2146 | 0000 | 54E9 | 8E00 | D606 | 2631 | 3E83 | 4096 |
| 0000376160 | 7500 | E903 | 0045 | 7E83 | FED6 | 0375 | 3CE9 | 1E00 |
| 0000376200 | 6768 | 8D24 | DE46 | 5016 | 468D | 16EE | 8D50 | D246 |
| 0000376220 | 5016 | 681E | 2578 | 1668 | FF02 | 3C36 | FF21 | 3A36 |
| 0000376240 | FF21 | 4036 | FF21 | 3E36 | 1E21 | 8868 | 6824 | 397F |
| 0000376260 | 8268 | 9A39 | 3985 | 0000 | C483 | FF26 | 9236 | FF25 |
| 0000376300 | 9036 | 6A25 | 1E00 | A468 | 9A54 | 503E | 3A14 | C483 |
| 0000376320 | 890A | EA46 | 7E83 | 00EA | 0375 | 8FE9 | C700 | 8C06 |

THU MAR 14 17:25:16 1991 CRV_IPS.DLL PAGE 139, LINE 8143

| | | | | | | | | |
|---|---|---|---|---|---|---|---|---|
| 0000376340 | 0025 | C700 | 8E06 | 0025 | C700 | 9C06 | 0025 | 8E00 |
| 0000376360 | D606 | 2631 | 3E83 | 393F | 7500 | E903 | 0009 | 7E83 |
| 0000376400 | FED6 | 0374 | 0FE9 | 8E00 | D806 | 2631 | 3E83 | 39AB |
| 0000376420 | 7500 | E903 | 0050 | 46C7 | 03D8 | FF00 | DC76 | 76FF |
| 0000376440 | 8DDA | D846 | 5016 | 76FF | FFEC | FC76 | 76FF | 8DFA |
| 0000376460 | DE4E | 5116 | 4E8D | 16EE | 8D51 | D24E | 5116 | 681E |
| 0000376500 | 2578 | 1D68 | FF02 | 3C36 | FF21 | 3A36 | FF21 | 4036 |
| 0000376520 | FF21 | 3E36 | 9A21 | 41BC | 0000 | C483 | 8B28 | D846 |
| 0000376540 | 4CE9 | E905 | 0006 | 03B8 | E900 | 0543 | 681E | 2490 |
| 0000376560 | 7F9A | 0042 | E900 | 00BA | 5EC4 | 2606 | 7F83 | 0C1A |
| 0000376600 | 0374 | ADE9 | FF00 | 0876 | 76FF | 1E06 | A468 | 9A54 |
| 0000376620 | 571B | 4269 | C483 | 8908 | EA46 | 7E83 | 00EA | 0375 |
| 0000376640 | 8FE9 | C700 | 8C06 | 0025 | C700 | 8E06 | 0025 | C700 |
| 0000376660 | 9C06 | 0025 | 8E00 | D606 | 2631 | 3E83 | 41D9 | 7500 |
| 0000376700 | E903 | 0009 | 7E83 | FED6 | 0374 | 0FE9 | 8E00 | D806 |
| 0000376720 | 2631 | 3E83 | 41F1 | 7500 | E903 | 0050 | 46C7 | 03D8 |
| 0000376740 | FF00 | DC76 | 76FF | 8DDA | D846 | 5016 | 76FF | FFEC |
| 0000376760 | FC76 | 76FF | 8DFA | DE4E | 5116 | 4E8D | 16EE | 8D51 |
| 0000377000 | D24E | 5116 | 681E | 2578 | 2A68 | FF02 | 3C36 | FF21 |
| 0000377020 | 3A36 | FF21 | 4036 | FF21 | 3E36 | 9A21 | 4239 | 0000 |
| 0000377040 | C483 | 8B28 | D846 | 86E9 | E904 | 0006 | 03B8 | E900 |
| 0000377060 | 047D | 068E | 31D6 | 8326 | 823E | 003D | 0375 | 09E9 |
| 0000377100 | 8300 | D67E | 74FE | E903 | 000F | 068E | 31D8 | 8326 |
| 0000377120 | 9A3E | 003D | 0375 | 50E9 | C700 | D846 | 0000 | 76FF |
| 0000377140 | FFDC | DA76 | 468D | 16D8 | FF50 | EC76 | 76FF | FFFC |
| 0000377160 | FA76 | 4E8D | 16DE | 8D51 | EE4E | 5116 | 4E8D | 16D2 |
| 0000377200 | 1E51 | 7868 | 6825 | 0230 | 36FF | 213C | 36FF | 213A |
| 0000377220 | 36FF | 2140 | 36FF | 213E | E29A | 003D | 8300 | 28C4 |
| 0000377240 | 468B | E9D8 | 0409 | 06E9 | B800 | 0000 | 00E9 | 8304 |
| 0000377260 | F67E | 7500 | E903 | 0290 | 36FF | 2592 | 36FF | 2590 |
| 0000377300 | 016A | 681E | 54A4 | 3E9A | A650 | 8342 | 0AC4 | 4689 |
| 0000377320 | 83EA | EA7E | 7400 | E903 | 00D6 | 681E | 24BF | FD9A |
| 0000377340 | 003D | 6A00 | 6A00 | 9A40 | FFFF | 0000 | A2A1 | E954 |
| 0000377360 | 00AF | 468D | 16F8 | 6A50 | 6A00 | FF01 | 9236 | FF25 |
| 0000377400 | 9036 | 9A25 | 0046 | 3E98 | C483 | 890C | EA46 | 7E83 |
| 0000377420 | 00EA | 0374 | 06E9 | C700 | 9A06 | 0125 | E900 | 0090 |
| 0000377440 | 468D | 16F8 | FF50 | A036 | 6A25 | FF01 | 9236 | FF25 |
| 0000377460 | 9036 | 9A25 | 0046 | 4132 | C483 | 890C | EA46 | 6FE9 |
| 0000377500 | 8E00 | D606 | 2631 | 3E83 | 4372 | 7500 | E903 | 0049 |
| 0000377520 | 7E83 | FED6 | 0375 | 40E9 | FF00 | A236 | 1E54 | DF68 |
| 0000377540 | 8D24 | DE46 | 5016 | 468D | 16EE | 8D50 | D246 | 5016 |
| 0000377560 | 681E | 2578 | 5468 | FF02 | 3C36 | FF21 | 3A36 | FF21 |
| 0000377600 | 4036 | FF21 | 3E36 | 1E21 | FA68 | 6824 | 442F | 3268 |
| 0000377620 | 9A44 | 4435 | 0000 | C483 | C728 | EA46 | 0013 | 0FE9 |
| 0000377640 | 4800 | 0375 | 4BE9 | 48FF | 0375 | 73E9 | E9FF | FF91 |
| 0000377660 | 7E83 | 00EA | 0375 | 8FE9 | C700 | 8C06 | 0025 | C700 |
| 0000377700 | 8E06 | 0025 | C700 | 9C06 | 0025 | 8E00 | D606 | 2631 |
| 0000377720 | 3E83 | 43EF | 7500 | E903 | 0009 | 7E83 | FED6 | 0374 |
| 0000377740 | 0FE9 | 8E00 | D806 | 2631 | 3E83 | 4487 | 7500 | E903 |
| 0000377760 | 0050 | 46C7 | 03D8 | FF00 | DC76 | 76FF | 8DDA | D846 |
| 0000400000 | 5016 | 76FF | FFEC | FC76 | 76FF | 8DFA | DE4E | 5116 |
| 0000400020 | 4E8D | 16EE | 8D51 | D24E | 5116 | 681E | 2578 | 5E68 |
| 0000400040 | FF02 | 3C36 | FF21 | 3A36 | FF21 | 4036 | FF21 | 3E36 |
| 0000400060 | 9A21 | 44CF | 0000 | C483 | 8B28 | D846 | 70E9 | E902 |
| 0000400100 | 0006 | 03B8 | E900 | 0267 | 068E | 31D6 | 8326 | 6F3E |
| 0000400120 | 0044 | 0375 | 45E9 | 8300 | D67E | 75FE | E903 | 003C |
| 0000400140 | 681E | 2502 | 468D | 16DE | 8D50 | EE46 | 5016 | 468D |
| 0000400160 | 16D2 | 1E50 | 7868 | 6825 | 0262 | 36FF | 213C | 36FF |
| 0000400200 | 213A | 36FF | 2140 | 36FF | 213E | 681E | 2512 | C568 |

THU MAR 14 17:25:16 1991 CRV_IPS.DLL PAGE 140, LINE 8202

| | | | | | | | | |
|---|---|---|---|---|---|---|---|---|
| 0000400220 | 6845 | 45C8 | CB9A | 0045 | 8300 | 26C4 | 06C7 | 258C |
| 0000400240 | 0000 | 06C7 | 258E | 0001 | 06C7 | 259E | D000 | 06C7 |
| 0000400260 | 259C | 0000 | 681E | 251A | 119A | 0041 | FF00 | F876 |
| 0000400300 | FF9A | 00FF | 8900 | EA46 | 068E | 31D6 | 8326 | EF3E |
| 0000400320 | 0044 | 0375 | 09E9 | 8300 | D67E | 74FE | E903 | 000F |
| 0000400340 | 068E | 31D8 | 8326 | 073E | 0045 | 0375 | 50E9 | C700 |
| 0000400360 | D846 | 0002 | 76FF | FFDC | DA76 | 468D | 16D8 | FF50 |
| 0000400400 | EC76 | 76FF | FFFC | FA76 | 4E8D | 16DE | 8D51 | EE4E |
| 0000400420 | 5116 | 4E8D | 16D2 | 1E51 | 7868 | 6825 | 0269 | 36FF |
| 0000400440 | 213C | 36FF | 213A | 36FF | 2140 | 36FF | 213E | 4F9A |
| 0000400460 | 0045 | 8300 | 28C4 | 468B | E9D8 | 0173 | 06E9 | B800 |
| 0000400500 | 0002 | 6AE9 | E901 | 007D | 068E | 31D6 | 8326 | 853E |
| 0000400520 | 0045 | 0375 | 09E9 | 8300 | D67E | 74FE | E903 | 000F |
| 0000400540 | 068E | 31D8 | 8326 | F13E | 0045 | 0375 | 50E9 | C700 |
| 0000400560 | D846 | 0001 | 76FF | FFDC | DA76 | 468D | 16D8 | FF50 |
| 0000400600 | EC76 | 76FF | FFFC | FA76 | 4E8D | 16DE | 8D51 | EE4E |
| 0000400620 | 5116 | 4E8D | 16D2 | 1E51 | 7868 | 6825 | 0274 | 36FF |
| 0000400640 | 213C | 36FF | 213A | 36FF | 2140 | 36FF | 213E | 399A |
| 0000400660 | 0046 | 8300 | 28C4 | 468B | E9D8 | 00F3 | 06E9 | B800 |
| 0000400700 | 0001 | EAE9 | E900 | 0016 | C00B | 0375 | DBE9 | 48F5 |
| 0000400720 | 0375 | 09E9 | 48F9 | 0375 | D4E9 | E9FC | 0000 | 068E |
| 0000400740 | 31D6 | 8326 | D93E | 0045 | 0375 | 45E9 | 8300 | D67E |
| 0000400760 | 75FE | E903 | 003C | 681E | 253F | 468D | 16DE | 8D50 |
| 0000401000 | EE46 | 5016 | 468D | 16D2 | 1E50 | 7868 | 6825 | 027A |
| 0000401020 | 36FF | 213C | 36FF | 213A | 36FF | 2140 | 36FF | 213E |
| 0000401040 | 681E | 256F | F168 | 683E | 3EF4 | F79A | 003E | 8300 |
| 0000401060 | 26C4 | 068E | 31D6 | 8326 | 5C3E | 0041 | 0375 | 09E9 |
| 0000401100 | 8300 | D67E | 74FE | E903 | 000F | 068E | 31D8 | 8326 |
| 0000401120 | 743E | 0041 | 0375 | 50E9 | C700 | D846 | 0003 | 76FF |
| 0000401140 | FFDC | DA76 | 468D | 16D8 | FF50 | EC76 | 76FF | FFFC |
| 0000401160 | FA76 | 4E8D | 16DE | 8D51 | EE4E | 5116 | 4E8D | 16D2 |
| 0000401200 | 1E51 | 7868 | 6825 | 027B | 36FF | 213C | 36FF | 213A |
| 0000401220 | 36FF | 2140 | 36FF | 213E | F69A | 0040 | 8300 | 28C4 |
| 0000401240 | 468B | E9D8 | 0009 | 06E9 | B800 | 0003 | 00E9 | 1F00 |
| 0000401260 | 5F5E | ED83 | 8B02 | 1FE5 | 4D5D | 04CA | 1E00 | 9058 |
| 0000401300 | 5545 | EC8B | 8E1E | 81D8 | 28EC | 5700 | C756 | FA46 |
| 0000401320 | 25A2 | 5E8C | C7FC | F446 | 0101 | C02B | 4689 | 89E4 |
| 0000401340 | E246 | 068E | 31D6 | 8326 | 253E | 0047 | 0375 | 1DE9 |
| 0000401360 | FF00 | 4036 | FF21 | 3E36 | 8D21 | DA46 | 5016 | D79A |
| 0000401400 | 002B | 8300 | 08C4 | 003D | 7400 | E903 | 000F | 068E |
| 0000401420 | 31D8 | 8326 | 3D3E | 0047 | 0375 | 3BE9 | 1E00 | A968 |
| 0000401440 | 8D25 | E646 | 5016 | 468D | 16DA | 8D50 | F646 | 5016 |
| 0000401460 | 9068 | 1E02 | B068 | FF25 | 3C36 | FF21 | 3A36 | FF21 |
| 0000401500 | 4036 | FF21 | 3E36 | 9A21 | 2C20 | 0000 | C483 | 891E |
| 0000401520 | F646 | 5689 | E9F8 | 0008 | C02B | 4689 | 89F8 | F646 |
| 0000401540 | 5EC4 | 260E | 07C7 | 0000 | 468B | 0B08 | 0646 | 0375 |
| 0000401560 | 0BE9 | 8B00 | 0C46 | 460B | 740A | E903 | 007D | 068E |
| 0000401600 | 31D6 | 8326 | E83E | 0042 | 0375 | 09E9 | 8300 | DE7E |
| 0000401620 | 74FE | E903 | 000F | 068E | 31D8 | 8326 | 8A3E | 0043 |
| 0000401640 | 0375 | 50E9 | C700 | E046 | 0017 | 76FF | FFE4 | E276 |
| 0000401660 | 468D | 16E0 | FF50 | F476 | 76FF | FFFC | FA76 | 4E8D |
| 0000401700 | 16E6 | 8D51 | F64E | 5116 | 4E8D | 16DA | 1E51 | B068 |
| 0000401720 | 6825 | 0298 | 36FF | 213C | 36FF | 213A | 36FF | 2140 |
| 0000401740 | 36FF | 213E | D29A | 0043 | 8300 | 28C4 | 468B | E9E0 |
| 0000401760 | 021B | 06E9 | B800 | 0017 | 12E9 | C402 | 0A5E | 8B26 |
| 0000402000 | 0247 | 0B26 | 7507 | E903 | 001E | 5EC4 | 260A | 77FF |
| 0000402020 | 2602 | 37FF | FF9A | 00FF | 8900 | F246 | 5EC4 | 2B0A |
| 0000402040 | 26C0 | 4789 | 2602 | 0789 | 5EC4 | 2606 | 77FF | 2622 |
| 0000402060 | 77FF | FF20 | 0876 | 76FF | FF06 | 0C76 | 76FF | 9A0A |

THU MAR 14 17:25:16 1991 CRV_IPS.DLL PAGE 141, LINE 8261

| | | | | | | | | |
|---|---|---|---|---|---|---|---|---|
| 0000402100 | FFFF | 0000 | 4689 | 81F2 | F27E | 01AB | 0374 | 3EE9 |
| 0000402120 | C401 | 0E5E | C726 | 0107 | 8E00 | DA06 | 2631 | 268A |
| 0000402140 | 0F2E | E4C0 | 2A02 | C1C0 | 03E8 | 4689 | FFD8 | D876 |
| 0000402160 | 4868 | FF07 | 0C76 | 76FF | 9A0A | FFFF | 0000 | 4689 |
| 0000402200 | 83F2 | F27E | 7500 | E903 | 007E | 068E | 31D6 | 8326 |
| 0000402220 | 363E | 0049 | 0375 | 09E9 | 8300 | DE7E | 74FE | E903 |
| 0000402240 | 000F | 068E | 31D8 | 8326 | 4E3E | 0049 | 0375 | 51E9 |
| 0000402260 | 8B00 | F246 | 4689 | FFE0 | E476 | 76FF | 8DE2 | E046 |
| 0000402300 | 5016 | 76FF | FFF4 | FC76 | 76FF | 8DFA | E64E | 5116 |
| 0000402320 | 4E8D | 16F6 | 8D51 | DA4E | 5116 | 681E | 25B0 | AD68 |
| 0000402340 | FF02 | 3C36 | FF21 | 3A36 | FF21 | 4036 | FF21 | 3E36 |
| 0000402360 | 9A21 | 4997 | 0000 | C483 | 8B28 | E046 | 0EE9 | E901 |
| 0000402400 | 0006 | 468B | E9F2 | 0105 | 76FF | FF08 | 0676 | 5EC4 |
| 0000402420 | 260A | 078B | 8B26 | 0257 | 0405 | 5200 | 9A50 | 91D2 |
| 0000402440 | 42D6 | C483 | C408 | 065E | 8B26 | 2647 | 5EC4 | 260A |
| 0000402460 | 1FC4 | 8926 | 2A47 | 5EC4 | 2606 | 478B | C424 | 0A5E |
| 0000402500 | C426 | 261F | 4789 | C428 | 0A5E | C426 | 261F | 47C7 |
| 0000402520 | 0134 | C400 | 0A5E | C426 | 261F | 47C7 | 2036 | C400 |
| 0000402540 | 0A5E | C426 | 261F | 47C7 | 2038 | 8E00 | DA06 | 2631 |
| 0000402560 | 2EA1 | C40F | 0A5E | C426 | 261F | 4789 | 8E3A | DA06 |
| 0000402600 | 2631 | 2EA1 | C40F | 0A5E | C426 | 261F | 4789 | 8E3C |
| 0000402620 | D606 | 2631 | 3E83 | 4689 | 7500 | E903 | 0009 | 7E83 |
| 0000402640 | FEDE | 0374 | 0FE9 | 8E00 | D806 | 2631 | 3E83 | 46B5 |
| 0000402660 | 7500 | E903 | 0051 | 468B | 89F2 | E046 | 76FF | FFE4 |
| 0000402700 | E276 | 468D | 16E0 | FF50 | F476 | 76FF | FFFC | FA76 |
| 0000402720 | 4E8D | 16E6 | 8D51 | F64E | 5116 | 4E8D | 16DA | 1E51 |
| 0000402740 | B068 | 6825 | 02BD | 36FF | 213C | 36FF | 213A | 36FF |
| 0000402760 | 2140 | 36FF | 213E | 859A | 0047 | 8300 | 28C4 | 468B |
| 0000403000 | E9E0 | 0009 | 06E9 | 8B00 | F246 | 00E9 | 5E00 | 835F |
| 0000403020 | 02ED | E58B | 5D1F | CB4D | 581E | 4590 | 8B55 | 1EEC |
| 0000403040 | D88E | EC81 | 0024 | 5657 | 46C7 | BAFA | 8C25 | FC5E |
| 0000403060 | 46C7 | 01F4 | 2B01 | 89C0 | E646 | 4689 | 8EE4 | D606 |
| 0000403100 | 2631 | 3E83 | 4831 | 7500 | E903 | 001D | 36FF | 2140 |
| 0000403120 | 36FF | 213E | 468D | 16DC | 9A50 | 469F | 0000 | C483 |
| 0000403140 | 3D08 | 0000 | 0374 | 0FE9 | 8E00 | D806 | 2631 | 3E83 |
| 0000403160 | 4849 | 7500 | E903 | 003B | 681E | 25C1 | 468D | 16E8 |
| 0000403200 | 8D50 | DC46 | 5016 | 468D | 16F6 | 6850 | 02CD | 681E |
| 0000403220 | 25C8 | 36FF | 213C | 36FF | 213A | 36FF | 2140 | 36FF |
| 0000403240 | 213E | E89A | 0046 | 8300 | 1EC4 | 4689 | 89F6 | F856 |
| 0000403260 | 08E9 | 2B00 | 89C0 | F846 | 4689 | 8EF6 | DA06 | 2631 |
| 0000403300 | 28A1 | 2D0F | 0020 | E8D1 | 5EC4 | 2606 | 4789 | C424 |
| 0000403320 | 065E | 8B26 | 2447 | 1F05 | C400 | 065E | 8926 | 2847 |
| 0000403340 | 068E | 31DA | A126 | 0F2A | 202D | D100 | C4E8 | 065E |
| 0000403360 | 8926 | 2647 | 5EC4 | 2606 | 478B | 0526 | 001F | 5EC4 |
| 0000403400 | 2606 | 4789 | 8E2A | D606 | 2631 | 3E83 | 49E4 | 7500 |
| 0000403420 | E903 | 0009 | 7E83 | FEE0 | 0374 | 0FE9 | 8E00 | D806 |
| 0000403440 | 2631 | 3E83 | 4A10 | 7500 | E903 | 0050 | 46C7 | 00E2 |
| 0000403460 | FF00 | E676 | 76FF | 8DE4 | E246 | 5016 | 76FF | FFF4 |
| 0000403500 | FC76 | 76FF | 8DFA | E84E | 5116 | 4E8D | 16F6 | 8D51 |
| 0000403520 | DC4E | 5116 | 681E | 25C8 | D768 | FF02 | 3C36 | FF21 |
| 0000403540 | 3A36 | FF21 | 4036 | FF21 | 3E36 | 9A21 | 4892 | 0000 |
| 0000403560 | C483 | 8B28 | E246 | 09E9 | E900 | 0006 | 00B8 | E900 |
| 0000403600 | 0000 | 5F5E | ED83 | 8B02 | 1FE5 | 4D5D | 1ECB | 9058 |
| 0000403620 | 5545 | EC8B | 8E1E | 81D8 | 3EEC | 5700 | C756 | FA46 |
| 0000403640 | 25D4 | 5E8C | C7FC | F446 | 0101 | C02B | 4689 | 89E6 |
| 0000403660 | E446 | 068E | 31D6 | 8326 | FA3E | 004B | 0375 | 1DE9 |
| 0000403700 | FF00 | 4036 | FF21 | 3E36 | 8D21 | DA46 | 5016 | FA9A |
| 0000403720 | 0049 | 8300 | 08C4 | 003D | 7400 | E903 | 000F | 068E |
| 0000403740 | 31D8 | 8326 | 123E | 004C | 0375 | 3BE9 | 1E00 | DB68 |

THU MAR 14 17:25:16 1991 CRV_IPS.DLL PAGE 142, LINE 8320

| | | | | | | | | |
|---|---|---|---|---|---|---|---|---|
| 0000403760 | 8D25 | E846 | 5016 | 468D | 16DA | 8D50 | F646 | 5016 |
| 0000404000 | E668 | 1E02 | 0668 | FF26 | 3C36 | FF21 | 3A36 | FF21 |
| 0000404020 | 4036 | FF21 | 3E36 | 9A21 | 4A43 | 0000 | C483 | 891E |
| 0000404040 | F646 | 5689 | E9F8 | 0008 | C02B | 4689 | 89F8 | F646 |
| 0000404060 | 46C7 | 01E2 | 6A00 | 6A00 | 6A00 | 6A00 | 6A00 | 6A00 |
| 0000404100 | 6A00 | 9A03 | DFDD | 4C82 | C483 | 3D0E | 0000 | 0375 |
| 0000404120 | 7DE9 | 8E00 | D606 | 2631 | 3E83 | 4C96 | 7500 | E903 |
| 0000404140 | 0009 | 7E83 | FEDE | 0374 | 0FE9 | 8E00 | D806 | 2631 |
| 0000404160 | 3E83 | 4CAE | 7500 | E903 | 0050 | 46C7 | EFE0 | FFFF |
| 0000404200 | E676 | 76FF | 8DE4 | E046 | 5016 | 76FF | FFF4 | FC76 |
| 0000404220 | 76FF | 8DFA | E84E | 5116 | 4E8D | 16F6 | 8D51 | DA4E |
| 0000404240 | 5116 | 681E | 2606 | EE68 | FF02 | 3C36 | FF21 | 3A36 |
| 0000404260 | FF21 | 4036 | FF21 | 3E36 | 9A21 | 4CF6 | 0000 | C483 |
| 0000404300 | 8B28 | E046 | CCE9 | E903 | 0006 | EFB8 | E9FF | 03C3 |
| 0000404320 | 006A | 006A | 006A | 026A | 468D | 16E2 | 6A50 | 9A4C |
| 0000404340 | DFDD | 4DF4 | C483 | 3D0E | 0000 | 0375 | 7DE9 | 8E00 |
| 0000404360 | D606 | 2631 | 3E83 | 4D84 | 7500 | E903 | 0009 | 7E83 |
| 0000404400 | FEDE | 0374 | 0FE9 | 8E00 | D806 | 2631 | 3E83 | 4E20 |
| 0000404420 | 7500 | E903 | 0050 | 46C7 | EFE0 | FFFF | E676 | 76FF |
| 0000404440 | 8DE4 | E046 | 5016 | 76FF | FFF4 | FC76 | 76FF | 8DFA |
| 0000404460 | E84E | 5116 | 4E8D | 16F6 | 8D51 | DA4E | 5116 | 681E |
| 0000404500 | 2606 | F068 | FF02 | 3C36 | FF21 | 3A36 | FF21 | 4036 |
| 0000404520 | FF21 | 3E36 | 9A21 | 4E68 | 0000 | C483 | 8B28 | E046 |
| 0000404540 | 30E9 | E903 | 0006 | EFB8 | E9FF | 0327 | 068E | 31DA |
| 0000404560 | A126 | 0F28 | E8D1 | 602D | 8900 | C646 | A126 | 0F2A |
| 0000404600 | E8D1 | 602D | 8900 | C846 | A126 | 0F28 | E8D1 | 202D |
| 0000404620 | 8900 | CA46 | A126 | 0F2A | E8D1 | 202D | 8900 | CC46 |
| 0000404640 | 46C7 | 20C2 | C700 | C446 | 0020 | 5EC4 | 2606 | 478B |
| 0000404660 | 892C | CE46 | 5EC4 | 2606 | 478B | 892E | D046 | 42A1 |
| 0000404700 | 8B21 | 4416 | 8921 | D246 | 5689 | 8ED4 | DA06 | 2631 |
| 0000404720 | 30A1 | 890F | D646 | A126 | 0F34 | 4689 | 8ED8 | D606 |
| 0000404740 | 2631 | 3E83 | 4E08 | 7500 | E903 | 004B | 7E83 | FEDE |
| 0000404760 | 0375 | 42E9 | FF00 | D876 | 76FF | 1ED6 | E268 | 8D25 |
| 0000405000 | E846 | 5016 | 468D | 16F6 | 8D50 | DA46 | 5016 | 681E |
| 0000405020 | 2606 | 0A68 | FF03 | 3C36 | FF21 | 3A36 | FF21 | 4036 |
| 0000405040 | FF21 | 3E36 | 1E21 | FD68 | 6825 | 432C | 2F68 | 9A43 |
| 0000405060 | 4332 | 0000 | C483 | FF2A | 4436 | FF21 | 4236 | C421 |
| 0000405100 | 065E | FF26 | 4477 | 5EC4 | 2606 | 77FF | 265E | 77FF |
| 0000405120 | 9A5C | CF29 | 4E90 | C483 | 3D0A | 0000 | 0375 | 7DE9 |
| 0000405140 | 8E00 | D606 | 2631 | 3E83 | 4EA4 | 7500 | E903 | 0009 |
| 0000405160 | 7E83 | FEDE | 0374 | 0FE9 | 8E00 | D806 | 2631 | 3E83 |
| 0000405200 | 4EBC | 7500 | E903 | 0050 | 46C7 | EFE0 | FFFF | E676 |
| 0000405220 | 76FF | 8DE4 | E046 | 5016 | 76FF | FFF4 | FC76 | 76FF |
| 0000405240 | 8DFA | E84E | 5116 | 4E8D | 16F6 | 8D51 | DA4E | 5116 |
| 0000405260 | 681E | 2606 | 1068 | FF03 | 3C36 | FF21 | 3A36 | FF21 |
| 0000405300 | 4036 | FF21 | 3E36 | 9A21 | 4B0C | 0000 | C483 | 8B28 |
| 0000405320 | E046 | BEE9 | E901 | 0006 | EFB8 | E9FF | 01B5 | 006A |
| 0000405340 | 006A | 006A | 186A | 468D | 16C2 | 6A50 | 9A36 | DFDD |
| 0000405360 | 48C0 | C483 | 3D0E | 0000 | 0375 | 7DE9 | 8E00 | D606 |
| 0000405400 | 2631 | 3E83 | 4AAC | 7500 | E903 | 0009 | 7E83 | FEDE |
| 0000405420 | 0374 | 0FE9 | 8E00 | D806 | 2631 | 3E83 | 4AC4 | 7500 |
| 0000405440 | E903 | 0050 | 46C7 | EFE0 | FFFF | E676 | 76FF | 8DE4 |
| 0000405460 | E046 | 5016 | 76FF | FFF4 | FC76 | 76FF | 8DFA | E84E |
| 0000405500 | 5116 | 4E8D | 16F6 | 8D51 | DA4E | 5116 | 681E | 2606 |
| 0000405520 | 1468 | FF03 | 3C36 | FF21 | 3A36 | FF21 | 4036 | FF21 |
| 0000405540 | 3E36 | 9A21 | 4FA0 | 0000 | C483 | 8B28 | E046 | 22E9 |
| 0000405560 | E901 | 0006 | EFB8 | E9FF | 0119 | 006A | 006A | 006A |
| 0000405600 | 026A | 468D | 16E2 | 6A50 | 9A46 | DFDD | 4BE6 | C483 |
| 0000405620 | 3D0E | 0000 | 0375 | 7DE9 | 8E00 | D606 | 2631 | 3E83 |

THU MAR 14 17:25:16 1991 CRV_IPS.DLL PAGE 143, LINE 8379

| | | | | | | | | |
|---|---|---|---|---|---|---|---|---|
| 0000405640 | 4FBD | 7500 | E903 | 0009 | 7E83 | FEDE | 0374 | 0FE9 |
| 0000405660 | 8E00 | D806 | 2631 | 3E83 | 4FD5 | 7500 | E903 | 0050 |
| 0000405700 | 46C7 | EFE0 | FFFF | E676 | 76FF | 8DE4 | E046 | 5016 |
| 0000405720 | 76FF | FFF4 | FC76 | 76FF | 8DFA | E84E | 5116 | 4E8D |
| 0000405740 | 16F6 | 8D51 | DA4E | 5116 | 681E | 2606 | 1868 | FF03 |
| 0000405760 | 3C36 | FF21 | 3A36 | FF21 | 4036 | FF21 | 3E36 | 9A21 |
| 0000406000 | 501D | 0000 | C483 | 8B28 | E046 | 86E9 | E900 | 0006 |
| 0000406020 | EFB8 | E9FF | 007D | 068E | 31D6 | 8326 | 593E | 004B |
| 0000406040 | 0375 | 09E9 | 8300 | DE7E | 74FE | E903 | 000F | 068E |
| 0000406060 | 31D8 | 8326 | 853E | 004B | 0375 | 50E9 | C700 | E046 |
| 0000406100 | 0000 | 76FF | FFE6 | E476 | 468D | 16E0 | FF50 | F476 |
| 0000406120 | 76FF | FFFC | FA76 | 4E8D | 16E8 | 8D51 | F64E | 5116 |
| 0000406140 | 4E8D | 16DA | 1E51 | 0668 | 6826 | 031A | 36FF | 213C |
| 0000406160 | 36FF | 213A | 36FF | 2140 | 36FF | 213E | 5A9A | 004C |
| 0000406200 | 8300 | 28C4 | 468B | E9E0 | 0009 | 06E9 | B800 | 0000 |
| 0000406220 | 00E9 | 5E00 | 835F | 02ED | E58B | 5D1F | CB4D | 581E |
| 0000406240 | 4590 | 8B55 | 1EEC | D88E | EC81 | 0044 | 5657 | 46C7 |
| 0000406260 | 13F8 | 8C26 | FA5E | 46C7 | 01D6 | 2B01 | 89C0 | C646 |
| 0000406300 | 4689 | 8EC4 | D606 | 2631 | 3E83 | 5113 | 7500 | E903 |
| 0000406320 | 001D | 36FF | 2140 | 36FF | 213E | 468D | 16BC | 9A50 |
| 0000406340 | 4B6F | 0000 | C483 | 3D08 | 0000 | 0374 | 0FE9 | 8E00 |
| 0000406360 | D806 | 2631 | 3E83 | 512B | 7500 | E903 | 003B | 681E |
| 0000406400 | 261A | 468D | 16C8 | 8D50 | BC46 | 5016 | 468D | 16F0 |
| 0000406420 | 6850 | 032A | 681E | 26C6 | 36FF | 213C | 36FF | 213A |
| 0000406440 | 36FF | 2140 | 36FF | 213E | B89A | 004B | 8300 | 1EC4 |
| 0000406460 | 4689 | 89F0 | F256 | 08E9 | 2B00 | 89C0 | F246 | 4689 |
| 0000406500 | C7F0 | D446 | 0000 | C02B | 4689 | 89F6 | F446 | 006A |
| 0000406520 | 006A | 006A | 006A | 006A | 006A | 036A | DD9A | F4DF |
| 0000406540 | 8351 | 0EC4 | 003D | 7500 | E903 | 007D | 068E | 31D6 |
| 0000406560 | 8326 | 0C3E | 0052 | 0375 | 09E9 | 8300 | C07E | 74FE |
| 0000406600 | E903 | 000F | 068E | 31D8 | 8326 | E83E | 0052 | 0375 |
| 0000406620 | 50E9 | C700 | C246 | FFEF | 76FF | FFC6 | C476 | 468D |
| 0000406640 | 16C2 | FF50 | D676 | 76FF | FFFA | F876 | 4E8D | 16C8 |
| 0000406660 | 8D51 | F04E | 5116 | 4E8D | 16BC | 1E51 | C668 | 6826 |
| 0000406700 | 0333 | 36FF | 213C | 36FF | 213A | 36FF | 2140 | 36FF |
| 0000406720 | 213E | 319A | 0053 | 8300 | 28C4 | 468B | E9C2 | 0473 |
| 0000406740 | 06E9 | B800 | FFEF | 6AE9 | 8304 | 0A7E | 7500 | E903 |
| 0000406760 | 0014 | 5EC4 | 260C | 478B | 2660 | 578B | 8962 | F446 |
| 0000407000 | 5689 | E9F6 | 0011 | 5EC4 | 260C | 478B | 265C | 578B |
| 0000407020 | 895E | F446 | 5689 | C4F6 | 065E | 8B26 | 2447 | 4689 |
| 0000407040 | C4DC | 065E | 8B26 | 2647 | 4689 | C7DE | D846 | 0020 |
| 0000407060 | 46C7 | 20DA | A100 | 2142 | 168B | 2144 | 4689 | 89E8 |
| 0000407100 | EA56 | 006A | 006A | 006A | 186A | 468D | 16D8 | 6A50 |
| 0000407120 | 9A35 | DFDD | 4F2C | C483 | 890E | D446 | 7E83 | 00D4 |
| 0000407140 | 0375 | 42E9 | 8E01 | D606 | 2631 | 3E83 | 5260 | 7500 |
| 0000407160 | E903 | 0045 | 7E83 | FEC0 | 0375 | 3CE9 | 1E00 | 2168 |
| 0000407200 | 8D26 | C846 | 5016 | 468D | 16F0 | 8D50 | BC46 | 5016 |
| 0000407220 | 681E | 26C6 | 4668 | FF03 | 3C36 | FF21 | 3A36 | FF21 |
| 0000407240 | 4036 | FF21 | 3E36 | 1E21 | 3D68 | 6826 | 52BC | BF68 |
| 0000407260 | 9A52 | 52C2 | 0000 | C483 | 8E26 | D606 | 2631 | 3E83 |
| 0000407300 | 52D0 | 7500 | E903 | 0061 | 7E83 | FEC0 | 0375 | 58E9 |
| 0000407320 | C400 | 065E | FF26 | 2A77 | 5EC4 | 2606 | 77FF | C428 |
| 0000407340 | 065E | FF26 | 2677 | 5EC4 | 2606 | 77FF | 1E24 | 4568 |
| 0000407360 | 8D26 | C846 | 5016 | 468D | 16F0 | 8D50 | BC46 | 5016 |
| 0000407400 | 681E | 26C6 | 4B68 | FF03 | 3C36 | FF21 | 3A36 | FF21 |
| 0000407420 | 4036 | FF21 | 3E36 | 1E21 | 6468 | 6826 | 4DCA | CD68 |
| 0000407440 | 9A4D | 4DD0 | 0000 | C483 | 8E2E | D606 | 2631 | 3E83 |
| 0000407460 | 4F40 | 7500 | E903 | 0009 | 7E83 | FEC0 | 0374 | 0FE9 |
| 0000407500 | 8E00 | D806 | 2631 | 3E83 | 4F58 | 7500 | E903 | 0051 |

THU MAR 14 17:25:16 1991 CRV_IPS.DLL PAGE 144, LINE 8438

| | | | | | | | | |
|---|---|---|---|---|---|---|---|---|
| 0000407520 | 468B | 89D4 | C246 | 76FF | FFC6 | C476 | 468D | 16C2 |
| 0000407540 | FF50 | D676 | 76FF | FFFA | F876 | 4E8D | 16C8 | 8D51 |
| 0000407560 | F04E | 5116 | 4E8D | 16BC | 1E51 | C668 | 6826 | 034D |
| 0000407600 | 36FF | 213C | 36FF | 213A | 36FF | 2140 | 36FF | 213E |
| 0000407620 | 049A | 004F | 8300 | 28C4 | 468B | E9C2 | 02B5 | 06E9 |
| 0000407640 | 8B00 | D446 | ACE9 | FF02 | 4436 | FF21 | 4236 | C421 |
| 0000407660 | 0C5E | FF26 | 4477 | 76FF | FFF6 | F476 | 959A | 53CF |
| 0000407700 | 8354 | 0AC4 | 4689 | 83D4 | D47E | 7500 | E903 | 00D2 |
| 0000407720 | 068E | 31D6 | 8326 | CB3E | 0053 | 0375 | 45E9 | 8300 |
| 0000407740 | C07E | 75FE | E903 | 003C | 681E | 266C | 468D | 16C8 |
| 0000407760 | 8D50 | F046 | 5016 | 468D | 16BC | 1E50 | C668 | 6826 |
| 0000410000 | 0354 | 36FF | 213C | 36FF | 213A | 36FF | 2140 | 36FF |
| 0000410020 | 213E | 681E | 268F | AB68 | 6854 | 54AE | B19A | 0054 |
| 0000410040 | 8300 | 26C4 | 068E | 31D6 | 8326 | 6B3E | 0054 | 0375 |
| 0000410060 | 09E9 | 8300 | C07E | 74FE | E903 | 000F | 068E | 31D8 |
| 0000410100 | 8326 | D73E | 0054 | 0375 | 51E9 | 8B00 | D446 | 4689 |
| 0000410120 | FFC2 | C676 | 76FF | 8DC4 | C246 | 5016 | 76FF | FFD6 |
| 0000410140 | FA76 | 76FF | 8DF8 | C84E | 5116 | 4E8D | 16F0 | 8D51 |
| 0000410160 | BC4E | 5116 | 681E | 26C6 | 5568 | FF03 | 3C36 | FF21 |
| 0000410200 | 3A36 | FF21 | 4036 | FF21 | 3E36 | 9A21 | 5520 | 0000 |
| 0000410220 | C483 | 8B28 | C246 | BAE9 | E901 | 0006 | 468B | E9D4 |
| 0000410240 | 01B1 | 006A | 006A | 006A | 026A | 681E | 214A | 086A |
| 0000410260 | DD9A | FFDF | 8350 | 0EC4 | 4689 | 83D4 | D47E | 7500 |
| 0000410300 | E903 | 00D2 | 068E | 31D6 | 8326 | BF3E | 0054 | 0375 |
| 0000410320 | 45E9 | 8300 | C07E | 75FE | E903 | 003C | 681E | 2697 |
| 0000410340 | 468D | 16C8 | 8D50 | F046 | 5016 | 468D | 16BC | 1E50 |
| 0000410360 | C668 | 6826 | 035C | 36FF | 213C | 36FF | 213A | 36FF |
| 0000410400 | 2140 | 36FF | 213E | 681E | 26BD | 4C68 | 6852 | 524F |
| 0000410420 | 529A | 0052 | 8300 | 26C4 | 068E | 31D6 | 8326 | 7D3E |
| 0000410440 | 0055 | 0375 | 09E9 | 8300 | C07E | 74FE | E903 | 000F |
| 0000410460 | 068E | 31D8 | 8326 | 953E | 0055 | 0375 | 51E9 | 8B00 |
| 0000410500 | D446 | 4689 | FFC2 | C676 | 76FF | 8DC4 | C246 | 5016 |
| 0000410520 | 76FF | FFD6 | FA76 | 76FF | 8DF8 | C84E | 5116 | 4E8D |
| 0000410540 | 16F0 | 8D51 | BC4E | 5116 | 681E | 26C6 | 5D68 | FF03 |
| 0000410560 | 3C36 | FF21 | 3A36 | FF21 | 4036 | FF21 | 3E36 | 9A21 |
| 0000410600 | 55DD | 0000 | C483 | 8B28 | C246 | C6E9 | E900 | 0006 |
| 0000410620 | 468B | E9D4 | 00BD | 7E83 | 000A | 0375 | 37E9 | C700 |
| 0000410640 | FC46 | 0000 | 03E9 | FF00 | FC46 | 5EC4 | 8B0C | FC46 |
| 0000410660 | 3926 | 4447 | 037F | 1DE9 | C400 | 0C5E | C426 | 5C5F |
| 0000410700 | 768B | 26FC | 008A | 5EC4 | 260C | 5FC4 | 8B60 | FC76 |
| 0000410720 | 3026 | E900 | FFD1 | 068E | 31D6 | 8326 | 6A3E | 0050 |
| 0000410740 | 0375 | 09E9 | 8300 | C07E | 74FE | E903 | 000F | 068E |
| 0000410760 | 31D8 | 8326 | 963E | 0050 | 0375 | 50E9 | C700 | C246 |
| 0000411000 | 0000 | 76FF | FFC6 | C476 | 468D | 16C2 | FF50 | D676 |
| 0000411020 | 76FF | FFFA | F876 | 4E8D | 16C8 | 8D51 | F04E | 5116 |
| 0000411040 | 4E8D | 16BC | 1E51 | C668 | 6826 | 036A | 36FF | 213C |
| 0000411060 | 36FF | 213A | 36FF | 2140 | 36FF | 213E | 739A | 0051 |
| 0000411100 | 8300 | 28C4 | 468B | E9C2 | 0009 | 06E9 | B800 | 0000 |
| 0000411120 | 00E9 | 5E00 | 835F | 02ED | E58B | 5D1F | CB4D | 581E |
| 0000411140 | 4590 | 8B55 | 1EEC | D88E | EC81 | 000A | 5657 | 5EC4 |
| 0000411160 | 2606 | 7F83 | 0124 | C01B | D8F7 | 4689 | C4F6 | 065E |
| 0000411200 | 8B26 | 2847 | 9940 | 068E | 31DA | 8B26 | 280E | 2B0F |
| 0000411220 | 3BDB | 73D3 | E903 | 0012 | 0376 | 07E9 | 3B00 | 73C1 |
| 0000411240 | E903 | 0006 | 01B8 | E900 | 0003 | 00B8 | 8900 | FC46 |
| 0000411260 | 5EC4 | 2606 | 7F83 | 0126 | C01B | D8F7 | 4689 | C4FA |
| 0000411300 | 065E | 8B26 | 2A47 | 9940 | 068E | 31DA | 8B26 | 2A0E |
| 0000411320 | 2B0F | 3BDB | 73D3 | E903 | 0012 | 0376 | 07E9 | 3B00 |
| 0000411340 | 73C1 | E903 | 0006 | 01B8 | E900 | 0003 | 00B8 | 8900 |
| 0000411360 | F846 | 7E83 | 00F6 | 0375 | 24E9 | 8300 | FA7E | 7500 |

THU MAR 14 17:25:16 1991 CRV_IPS.DLL PAGE 145, LINE 8497

| | | | | | | | | |
|---|---|---|---|---|---|---|---|---|
| 0000411400 | E903 | 0006 | 0CB8 | E900 | 0066 | 7E83 | 00F8 | 0375 |
| 0000411420 | 06E9 | B800 | 0009 | 57E9 | B800 | 0008 | 51E9 | 8300 |
| 0000411440 | FC7E | 7500 | E903 | 0024 | 7E83 | 00FA | 0375 | 06E9 |
| 0000411460 | B800 | 0006 | 39E9 | 8300 | F87E | 7500 | E903 | 0006 |
| 0000411500 | 03B8 | E900 | 002A | 02B8 | E900 | 0024 | 7E83 | 00FA |
| 0000411520 | 0375 | 06E9 | B800 | 0004 | 15E9 | 8300 | F87E | 7500 |
| 0000411540 | E903 | 0006 | 01B8 | E900 | 0006 | 00B8 | E900 | 0000 |
| 0000411560 | 5F5E | ED83 | 8B02 | 1FE5 | 4D5D | 1ECB | 9058 | 5545 |
| 0000411600 | EC8B | 8E1E | 81D8 | 08EC | 5700 | C456 | 065E | 8B26 |
| 0000411620 | 2447 | 4689 | C4FC | 065E | 8B26 | 2647 | 4689 | FFFA |
| 0000411640 | 0C76 | 76FF | 8D0A | FA46 | 5016 | 468D | 16FC | 9A50 |
| 0000411660 | 2853 | 5772 | C483 | 890C | F846 | 7E83 | 00F8 | 0375 |
| 0000411700 | 06E9 | 8B00 | F846 | 6BE9 | FF00 | 0876 | 76FF | 9A06 |
| 0000411720 | 23F7 | 57A6 | C483 | 8904 | F846 | 7E83 | 00F8 | 0375 |
| 0000411740 | 06E9 | 8B00 | F846 | 4BE9 | C400 | 065E | FF26 | 2677 |
| 0000411760 | 5EC4 | 2606 | 77FF | FF24 | FA76 | 76FF | FFFC | 0876 |
| 0000412000 | 76FF | 9A06 | 2665 | 57C6 | C483 | 890C | F846 | 7E83 |
| 0000412020 | 00F8 | 0375 | 06E9 | 8B00 | F846 | 17E9 | FF00 | 0876 |
| 0000412040 | 76FF | 9A06 | 23F7 | 3D5C | C483 | 8904 | F846 | 468B |
| 0000412060 | E9F8 | 0000 | 5F5E | ED83 | 8B02 | 1FE5 | 4D5D | 1ECB |
| 0000412100 | 9058 | 5545 | EC8B | 8E1E | 81D8 | 24EC | 5700 | C756 |
| 0000412120 | FA46 | 26D3 | 5E8C | C7FC | F446 | 0101 | C02B | 4689 |
| 0000412140 | 89E6 | E446 | 068E | 31D6 | 8326 | 893E | 0058 | 0375 |
| 0000412160 | 1DE9 | FF00 | 4036 | FF21 | 3E36 | 8D21 | DC46 | 5016 |
| 0000412200 | 809A | 0050 | 8300 | 08C4 | 003D | 7400 | E903 | 000F |
| 0000412220 | 068E | 31D8 | 8326 | A13E | 0058 | 0375 | 3BE9 | 1E00 |
| 0000412240 | DA68 | 8D26 | E846 | 5016 | 468D | 16DC | 8D50 | F646 |
| 0000412260 | 5016 | CC68 | 1E03 | E268 | FF26 | 3C36 | FF21 | 3A36 |
| 0000412300 | FF21 | 4036 | FF21 | 3E36 | 9A21 | 50C9 | 0000 | C483 |
| 0000412320 | 891E | F646 | 5689 | E9F8 | 0008 | C02B | 4689 | 89F8 |
| 0000412340 | F646 | 068E | 31D6 | 8326 | 1D3E | 0059 | 0375 | 09E9 |
| 0000412360 | 8300 | E07E | 74FE | E903 | 000F | 068E | 31D8 | 8326 |
| 0000412400 | 353E | 0059 | 0375 | 5CE9 | FF00 | 0876 | 76FF | 9A06 |
| 0000412420 | 2312 | 590E | C483 | 8904 | E246 | 76FF | FFE6 | E476 |
| 0000412440 | 468D | 16E2 | FF50 | F476 | 76FF | FFFC | FA76 | 4E8D |
| 0000412460 | 16E8 | 8D51 | F64E | 5116 | 4E8D | 16DC | 1E51 | E268 |
| 0000412500 | 6826 | 03CE | 36FF | 213C | 36FF | 213A | 36FF | 2140 |
| 0000412520 | 36FF | 213E | 7D9A | 0059 | 8300 | 28C4 | 468B | E9E2 |
| 0000412540 | 0091 | 11E9 | FF00 | 0876 | 76FF | 9A06 | 2312 | 5752 |
| 0000412560 | C483 | E904 | 007D | 068E | 31D6 | 8326 | 773E | 0053 |
| 0000412600 | 0375 | 09E9 | 8300 | E07E | 74FE | E903 | 000F | 068E |
| 0000412620 | 31D8 | 8326 | E33E | 0053 | 0375 | 50E9 | C700 | E246 |
| 0000412640 | 0000 | 76FF | FFE6 | E476 | 468D | 16E2 | FF50 | F476 |
| 0000412660 | 76FF | FFFC | FA76 | 4E8D | 16E8 | 8D51 | F64E | 5116 |
| 0000412700 | 4E8D | 16DC | 1E51 | E268 | 6826 | 03D0 | 36FF | 213C |
| 0000412720 | 36FF | 213A | 36FF | 2140 | 36FF | 213E | 2C9A | 0054 |
| 0000412740 | 8300 | 28C4 | 468B | E9E2 | 0009 | 06E9 | B800 | 0000 |
| 0000412760 | 00E9 | 5E00 | 835F | 02ED | E58B | 5D1F | CB4D | 581E |
| 0000413000 | 4590 | 8B55 | 1EEC | D88E | EC81 | 001C | 5657 | B81E |
| 0000413020 | 2BA1 | D88E | 46C7 | 00E4 | 2B00 | 89C0 | EC46 | 4689 |
| 0000413040 | 2BEA | 89C0 | F046 | 4689 | 6AEE | 6300 | 00D2 | 016A |
| 0000413060 | 468D | 16E4 | 5D50 | EA46 | 5016 | FF9A | 00FF | 8900 |
| 0000413100 | F246 | 7E81 | BCF2 | 7401 | E903 | 0005 | 46C7 | 00F2 |
| 0000413120 | 8300 | F27E | 7500 | E903 | 0006 | 468B | E9F2 | 016B |
| 0000413140 | 46C7 | 48F4 | C707 | F646 | 0000 | 006A | 006A | 006A |
| 0000413160 | 006A | 006A | 006A | 4F6A | DD9A | 96DF | 835A | 0EC4 |
| 0000413200 | 003D | 7500 | E903 | 0008 | 46C7 | FFF2 | E9FF | 0122 |
| 0000413220 | 46C7 | 00F8 | E900 | 0003 | 46FF | 8BF8 | E446 | 4639 |
| 0000413240 | 72F8 | E903 | 010C | 006A | D268 | 8B00 | F846 | EDC1 |

THU MAR 14 17:25:16 1991 CRV_IPS.DLL PAGE 146, LINE 8556

| | | | | | | | | |
|---|---|---|---|---|---|---|---|---|
| 0000413260 | 0305 | EA46 | 568B | 52EC | 8D50 | EE46 | 5016 | E09A |
| 0000413300 | 0047 | 8900 | F246 | 7E83 | 00F2 | 0375 | 03E9 | E900 |
| 0000413320 | 00E0 | 5EC4 | 26EE | 478B | 2668 | 578B | 896A | E646 |
| 0000413340 | 5689 | 6AE8 | 8D04 | FA46 | 5016 | 046A | 468D | 16F4 |
| 0000413360 | 6A50 | 9A05 | DFDD | 5AD3 | C483 | 890E | F246 | 7E83 |
| 0000413400 | 00F2 | 0375 | 13E9 | C700 | F246 | FFEF | 76FF | FFF0 |
| 0000413420 | EE76 | 079A | 005B | E900 | 0098 | 468B | C4F8 | E65E |
| 0000413440 | 8926 | FF07 | FC76 | 76FF | FFFA | F876 | 681E | 26EF |
| 0000413460 | 829A | EA75 | 835A | 0AC4 | 76FF | FFFC | FA76 | 4868 |
| 0000413500 | FF07 | E876 | 76FF | 9AE6 | CF29 | 5B20 | C483 | 890A |
| 0000413520 | F246 | 7E83 | 00F2 | 0375 | 13E9 | C700 | F246 | FFEF |
| 0000413540 | 76FF | FFF0 | EE76 | 3D9A | 005B | E900 | 0044 | 006A |
| 0000413560 | 006A | 006A | 046A | 468D | 16FA | 6A50 | 9A51 | DFDD |
| 0000413600 | 535F | C483 | 890E | F246 | 7E83 | 00F2 | 0375 | 13E9 |
| 0000413620 | C700 | F246 | FFEF | 76FF | FFF0 | EE76 | 4B9A | 005B |
| 0000413640 | E900 | 000E | 76FF | FFF0 | EE76 | B59A | 0047 | E900 |
| 0000413660 | FEE6 | 76FF | FFEC | EA76 | FF9A | 00FF | 2B00 | 89C0 |
| 0000413700 | EC46 | 4689 | 8BEA | F246 | 00E9 | 1F00 | 5F5E | ED83 |
| 0000413720 | 8B02 | 1FE5 | 4D5D | 1ECB | 9058 | 5545 | EC8B | 8E1E |
| 0000413740 | 81D8 | A8EC | 5700 | 1E56 | B0B8 | 8E59 | C7D8 | FA46 |
| 0000413760 | 26F8 | 5E8C | C7FC | F246 | 0101 | C02B | 4689 | 89E2 |
| 0000414000 | E046 | 068E | 31D6 | 8326 | 513E | 005C | 0375 | 1DE9 |
| 0000414020 | FF00 | 4036 | FF21 | 3E36 | 8D21 | D846 | 5016 | 219A |
| 0000414040 | 0058 | 8300 | 08C4 | 003D | 7400 | E903 | 000F | 068E |
| 0000414060 | 31D8 | 8326 | 693E | 005C | 0375 | 3BE9 | 1E00 | FF68 |
| 0000414100 | 8D26 | E446 | 5016 | 468D | 16D8 | 8D50 | F646 | 5016 |
| 0000414120 | 4468 | 1E04 | 4E68 | FF27 | 3C36 | FF21 | 3A36 | FF21 |
| 0000414140 | 4036 | FF21 | 3E36 | 9A21 | 586A | 0000 | C483 | 891E |
| 0000414160 | F646 | 5689 | E9F8 | 0008 | C02B | 4689 | 89F8 | F646 |
| 0000414200 | 8068 | 8D00 | 5886 | 16FF | 6A50 | 6A00 | 6A00 | 6A00 |
| 0000414220 | 9A52 | DFDD | 5A1B | C483 | 890E | F046 | 7E83 | 00F0 |
| 0000414240 | 0375 | 83E9 | C700 | F046 | FFEF | 068E | 31D6 | 8326 |
| 0000414260 | 0B3E | 0058 | 0375 | 09E9 | 8300 | DC7E | 74FE | E903 |
| 0000414300 | 000F | 068E | 31D8 | 8326 | 373E | 0058 | 0375 | 51E9 |
| 0000414320 | 8B00 | F046 | 4689 | FFDE | E276 | 76FF | 8DE0 | DE46 |
| 0000414340 | 5016 | 76FF | FFF2 | FC76 | 76FF | 8DFA | E44E | 5116 |
| 0000414360 | 4E8D | 16F6 | 8D51 | D84E | 5116 | 681E | 274E | 5268 |
| 0000414400 | FF04 | 3C36 | FF21 | 3A36 | FF21 | 4036 | FF21 | 3E36 |
| 0000414420 | 9A21 | 58F5 | 0000 | C483 | 8B28 | DE46 | 59E9 | E901 |
| 0000414440 | 0006 | 468B | E9F0 | 0150 | 068E | 31D6 | 8326 | 3E3E |
| 0000414460 | 005D | 0375 | 49E9 | 8300 | DC7E | 75FE | E903 | 0040 |
| 0000414500 | B6FF | FF58 | 681E | 2706 | 468D | 16E4 | 8D50 | F646 |
| 0000414520 | 5016 | 468D | 16D8 | 1E50 | 4E68 | 6827 | 0455 | 36FF |
| 0000414540 | 213C | 36FF | 213A | 36FF | 2140 | 36FF | 213E | 681E |
| 0000414560 | 272E | 8A68 | 685D | 5D8D | 909A | 005D | 8300 | 28C4 |
| 0000414600 | 46C7 | 00F4 | E900 | 0003 | 46FF | 8BF4 | 5886 | 39FF |
| 0000414620 | F446 | 0372 | 63E9 | 8E00 | D606 | 2631 | 3E83 | 5DA1 |
| 0000414640 | 7500 | E903 | 0051 | 7E83 | FEDC | 0375 | 48E9 | 8B00 |
| 0000414660 | F476 | E6D1 | B2FF | FF5A | 76FF | 1EF4 | 3668 | 8D27 |
| 0000414700 | E446 | 5016 | 468D | 16F6 | 8D50 | D846 | 5016 | 681E |
| 0000414720 | 274E | 5868 | FF04 | 3C36 | FF21 | 3A36 | FF21 | 4036 |
| 0000414740 | FF21 | 3E36 | 1E21 | 4568 | 6827 | 53B7 | BA68 | 9A53 |
| 0000414760 | 53BD | 0000 | C483 | E92A | FF8E | 068E | 31D6 | 8326 |
| 0000415000 | A93E | 005B | 0375 | 09E9 | 8300 | DC7E | 74FE | E903 |
| 0000415020 | 000F | 068E | 31D8 | 8326 | D53E | 005B | 0375 | 51E9 |
| 0000415040 | 8B00 | F046 | 4689 | FFDE | E276 | 76FF | 8DE0 | DE46 |
| 0000415060 | 5016 | 76FF | FFF2 | FC76 | 76FF | 8DFA | E44E | 5116 |
| 0000415100 | 4E8D | 16F6 | 8D51 | D84E | 5116 | 681E | 274E | 5A68 |
| 0000415120 | FF04 | 3C36 | FF21 | 3A36 | FF21 | 4036 | FF21 | 3E36 |

THU MAR 14 17:25:16 1991 CRV_IPS.DLL PAGE 147, LINE 8615

| | | | | | | | | |
|---|---|---|---|---|---|---|---|---|
| 0000415140 | 9A21 | 5CB2 | 0000 | C483 | 8B28 | DE46 | 09E9 | E900 |
| 0000415160 | 0006 | 468B | E9F0 | 0000 | 5E1F | 835F | 02ED | E58B |
| 0000415200 | 5D1F | CB4D | 581E | 4590 | 8B55 | 1EEC | D88E | EC81 |
| 0000415220 | 0004 | 5657 | 6D68 | 685E | 309C | FF9A | 00FF | 6A00 |
| 0000415240 | 6A00 | 6A00 | 8A00 | 0C46 | FF50 | 0A76 | 76FF | FF08 |
| 0000415260 | 0676 | DD9A | ADDF | 835E | 0EC4 | 4689 | 83FC | FC7E |
| 0000415300 | 7500 | E903 | 0006 | EFB8 | E9FF | 005E | 8968 | 685B |
| 0000415320 | 309C | 006A | 8868 | 9A13 | FFFF | 0000 | 4689 | 83FC |
| 0000415340 | FC7E | 7500 | E903 | 0018 | 7E83 | 79FC | 0374 | 09E9 |
| 0000415360 | B800 | FFEF | 33E9 | E900 | 0006 | FFB8 | E9FF | 002A |
| 0000415400 | 468A | 5012 | 76FF | FF10 | 0E76 | E89A | 34E1 | 835C |
| 0000415420 | 06C4 | 4689 | 83FC | FC7E | 7403 | E903 | 0006 | EEB8 |
| 0000415440 | E9FF | 0006 | 00B8 | E900 | 0000 | 5F5E | ED83 | 8B02 |
| 0000415460 | 1FE5 | 4D5D | 1ECB | 9058 | 5545 | EC8B | 8E1E | 81D8 |
| 0000415500 | 04EC | 5700 | 6A56 | 6804 | FFFF | 6A68 | 6A1C | FF16 |
| 0000415520 | 0876 | 76FF | 6A06 | 9A2C | DFDD | 5E55 | C483 | 890E |
| 0000415540 | FC46 | 003D | 7500 | E903 | 0009 | 9CB8 | E9FF | 0009 |
| 0000415560 | 06E9 | B800 | 0000 | 00E9 | 5E00 | 835F | 02ED | E58B |
| 0000415600 | 5D1F | CB4D | 581E | 4590 | 8B55 | 1EEC | D88E | EC81 |
| 0000415620 | 0004 | 5657 | 01BE | E900 | 0001 | 8146 | E8FE | 7C03 |
| 0000415640 | E903 | 004B | 068E | 31DC | FF26 | 6C36 | 261C | 36FF |
| 0000415660 | 1C6A | 086A | E868 | 685E | 0F48 | 959A | FACF | 835E |
| 0000415700 | 0AC4 | 4689 | 83FC | FC7E | 7500 | E903 | 0009 | 00B8 |
| 0000415720 | E900 | 0021 | 15E9 | 8E00 | DE06 | 2631 | 3E83 | 0F48 |
| 0000415740 | 7401 | E903 | 0006 | 01B8 | E900 | 0009 | ABE9 | B8FF |
| 0000415760 | 0000 | 00E9 | 5E00 | 835F | 02ED | E58B | 5D1F | CB4D |
| 0000416000 | 581E | 4590 | 8B55 | 1EEC | D88E | EC81 | 000A | 5657 |
| 0000416020 | 068E | 31E0 | C726 | 6E06 | 001C | A100 | 2788 | 168B |
| 0000416040 | 278A | 4689 | 89F8 | FA56 | 468B | 8906 | F646 | 146A |
| 0000416060 | 6806 | 1C6E | 066A | 468D | 16F6 | 6A50 | 9A2A | 5E24 |
| 0000416100 | 5F5D | C483 | 890E | FC46 | 003D | 7500 | E903 | 0009 |
| 0000416120 | 9CB8 | E9FF | 001C | 19E9 | 8E00 | E006 | 2631 | 3E83 |
| 0000416140 | 1C6E | 1B01 | 40C0 | 5EC4 | 2608 | 0789 | 00B8 | E900 |
| 0000416160 | 0000 | 5F5E | ED83 | 8B02 | 1FE5 | 4D5D | 1ECB | 9058 |
| 0000416200 | 5545 | EC8B | 8E1E | 81D8 | 06EC | 5700 | BE56 | 0000 |
| 0000416220 | 01E9 | 4600 | FE83 | 7C14 | E903 | 003B | 468D | 16FC |
| 0000416240 | 6A50 | 9A00 | 5FA0 | 5FE0 | C483 | 8906 | FA46 | 003D |
| 0000416260 | 7500 | E903 | 0003 | 1EE9 | 8300 | FC7E | 7500 | E903 |
| 0000416300 | 000C | 006A | 146A | 889A | 0042 | E900 | 0006 | 01B8 |
| 0000416320 | E900 | 0009 | BCE9 | B8FF | 0000 | 00E9 | 5E00 | 835F |
| 0000416340 | 02ED | E58B | 5D1F | CB4D | 581E | 4590 | 8B55 | 1EEC |
| 0000416360 | D88E | EC81 | 0000 | 5657 | 068E | 31DC | FF26 | 6C36 |
| 0000416400 | 261C | 36FF | 1C6A | 086A | 5568 | 685F | 0F48 | 959A |
| 0000416420 | 46CF | 8360 | 0AC4 | 003D | 7500 | E903 | 0006 | 9CB8 |
| 0000416440 | E9FF | 0044 | 068E | 31DE | 8326 | 4A3E | 000F | 0377 |
| 0000416460 | 06E9 | B800 | 0001 | 03E9 | B800 | 0000 | 5EC4 | 2606 |
| 0000416500 | 0789 | 068E | 31DE | 8CA1 | 2627 | 0639 | 0F4C | 0377 |
| 0000416520 | 06E9 | B800 | 0001 | 03E9 | B800 | 0000 | 5EC4 | 260A |
| 0000416540 | 0789 | 00B8 | E900 | 0000 | 5F5E | ED83 | 8B02 | 1FE5 |
| 0000416560 | 4D5D | 1ECB | 9058 | 5545 | EC8B | 8E1E | 81D8 | 00EC |
| 0000416600 | 5700 | 8E56 | DC06 | 2631 | 36FF | 1C6C | FF26 | 6A36 |
| 0000416620 | 6A1C | 6808 | 60A9 | 4868 | 9A0F | CF95 | 60B1 | C483 |
| 0000416640 | 3D0A | 0000 | 0375 | 06E9 | B800 | FF9C | 46E9 | 8E00 |
| 0000416660 | DE06 | A131 | 278E | 3926 | 4E06 | 730F | E903 | 0006 |
| 0000416700 | 01B8 | E900 | 0003 | 00B8 | C400 | 065E | 8926 | 8E07 |
| 0000416720 | DE06 | A131 | 278C | 3926 | 4C06 | 770F | E903 | 0006 |
| 0000416740 | 01B8 | E900 | 0003 | 00B8 | C400 | 0A5E | 8926 | B807 |
| 0000416760 | 0000 | 00E9 | 5E00 | 835F | 02ED | E58B | 5D1F | CB4D |
| 0000417000 | 581E | 4590 | 8B55 | 1EEC | D88E | EC81 | 0000 | 5657 |

THU MAR 14 17:25:16 1991 CRV_IPS.DLL PAGE 148, LINE 8674

| | | | | | | | | |
|---|---|---|---|---|---|---|---|---|
| 0000417020 | 068E | 31DE | C726 | 4C06 | 000F | 2600 | 06C7 | 0F4E |
| 0000417040 | 0000 | C726 | 4A06 | 000F | 8E00 | DC06 | 2631 | 36FF |
| 0000417060 | 1C6C | FF26 | 6A36 | 6A1C | 6808 | 6134 | 4868 | 9A0F |
| 0000417100 | CF29 | 613C | C483 | 3D0A | 0000 | 0375 | 06E9 | B800 |
| 0000417120 | FF9C | 06E9 | B800 | 0000 | 00E9 | 5E00 | 835F | 02ED |
| 0000417140 | E58B | 5D1F | CB4D | 581E | 4590 | 8B55 | 1EEC | D88E |
| 0000417160 | EC81 | 0000 | 5657 | 3E83 | 2792 | 7400 | E903 | 0032 |
| 0000417200 | 06C7 | 551A | 000C | 06C7 | 5500 | 0000 | C02B | 1EA3 |
| 0000417220 | A355 | 551C | C02B | 22A3 | A355 | 5520 | 06C7 | 5624 |
| 0000417240 | 0000 | 06C6 | 5526 | C600 | 2506 | 1855 | 06C7 | 2792 |
| 0000417260 | 0001 | 068E | 31E2 | 8326 | 063E | 000F | 0374 | 20E9 |
| 0000417300 | 8300 | 067E | 7400 | E903 | 000F | 7E83 | 0008 | 0374 |
| 0000417320 | 06E9 | B800 | 0000 | 3DE9 | C600 | 2406 | 0F55 | 1DE9 |
| 0000417340 | 8E00 | E206 | 2631 | 3E83 | 0F06 | 7401 | E903 | 0008 |
| 0000417360 | 06C6 | 5524 | E90E | 0006 | 00B8 | E900 | 0018 | 468B |
| 0000417400 | A306 | 5528 | 468B | A308 | 552A | 681E | 5500 | FF9A |
| 0000417420 | 00FF | E900 | 0000 | 5F5E | ED83 | 8B02 | 1FE5 | 4D5D |
| 0000417440 | 1ECB | 9058 | 5545 | EC8B | 8E1E | 81D8 | 00EC | 5700 |
| 0000417460 | A156 | 54FC | 00E9 | 5E00 | 835F | 02ED | E58B | 5D1F |
| 0000417500 | CB4D | 581E | 4590 | 8B55 | 1EEC | D88E | EC81 | 0000 |
| 0000417520 | 5657 | FEA1 | E954 | 0000 | 5F5E | ED83 | 8B02 | 1FE5 |
| 0000417540 | 4D5D | 1ECB | 9058 | 5545 | EC8B | 8E1E | 81D8 | 00EC |
| 0000417560 | 5700 | 8E56 | E206 | 2631 | 28A1 | 480F | 4E8B | 8306 |
| 0000417600 | 00F9 | 037C | 03E9 | B900 | 0000 | C13B | 037F | 02E9 |
| 0000417620 | 8B00 | A3C1 | 54FC | 468B | E906 | 0000 | 5F5E | ED83 |
| 0000417640 | 8B02 | 1FE5 | 4D5D | 1ECB | 9058 | 5545 | EC8B | 8E1E |
| 0000417660 | 81D8 | 00EC | 5700 | 8E56 | E206 | 2631 | 2AA1 | 480F |
| 0000417700 | 4E8B | 8306 | 00F9 | 037C | 03E9 | B900 | 0000 | C13B |
| 0000417720 | 037F | 02E9 | 8B00 | A3C1 | 54FE | 468B | E906 | 0000 |
| 0000417740 | 5F5E | ED83 | 8B02 | 1FE5 | 4D5D | 1ECB | 9058 | 5545 |
| 0000417760 | EC8B | 8E1E | 81D8 | 00EC | 5700 | 8B56 | 0646 | 0601 |
| 0000420000 | 54FC | 068E | 31E2 | A126 | 0F28 | 8B48 | FC0E | 8354 |
| 0000420020 | 00F9 | 037C | 03E9 | B900 | 0000 | C13B | 037F | 02E9 |
| 0000420040 | 8B00 | A3C1 | 54FC | FCA1 | E954 | 0000 | 5F5E | ED83 |
| 0000420060 | 8B02 | 1FE5 | 4D5D | 1ECB | 9058 | 5545 | EC8B | 8E1E |
| 0000420100 | 81D8 | 00EC | 5700 | 8B56 | 0646 | 0601 | 54FE | 068E |
| 0000420120 | 31E2 | A126 | 0F2A | 8B48 | FE0E | 8354 | 00F9 | 037C |
| 0000420140 | 03E9 | B900 | 0000 | C13B | 037F | 02E9 | 8B00 | A3C1 |
| 0000420160 | 54FE | FEA1 | E954 | 0000 | 5F5E | ED83 | 8B02 | 1FE5 |
| 0000420200 | 4D5D | 1ECB | 9058 | 5545 | EC8B | 8E1E | 81D8 | 00EC |
| 0000420220 | 5700 | A156 | 2790 | 00E9 | 5E00 | 835F | 02ED | E58B |
| 0000420240 | 5D1F | CB4D | 581E | 4590 | 8B55 | 1EEC | D88E | EC81 |
| 0000420260 | 0000 | 5657 | 468B | A306 | 2790 | 3E83 | 2790 | 7500 |
| 0000420300 | E903 | 0014 | E29A | 6D62 | 5064 | C19A | E262 | 5061 |
| 0000420320 | D39A | FFD9 | 83FF | 04C4 | 468B | E906 | 0000 | 5F5E |
| 0000420340 | ED83 | 8B02 | 1FE5 | 4D5D | 00CB | 581E | 4590 | 8B55 |
| 0000420360 | 1EEC | D88E | EC81 | 001E | 5657 | 46C7 | 01FA | C700 |
| 0000420400 | E246 | 0000 | 006A | 006A | 006A | 006A | 006A | 006A |
| 0000420420 | 2D6A | DD9A | CEDF | 8364 | 0EC4 | 4689 | 3DE4 | 0000 |
| 0000420440 | 0375 | 06E9 | B800 | FF9C | 79E9 | 9A01 | 5F24 | 64E8 |
| 0000420460 | 003D | 7400 | E903 | 0006 | 9BB8 | E9FF | 0166 | 468D |
| 0000420500 | 16FC | 6A50 | 9A01 | 5FA0 | 6467 | C483 | 8906 | E446 |
| 0000420520 | 003D | 7500 | E903 | 0006 | 9CB8 | E9FF | 0146 | 468B |
| 0000420540 | 8E06 | E406 | 2631 | 8AA3 | 261C | 06C7 | 1C94 | 000A |
| 0000420560 | C726 | 9606 | 001C | 8300 | 067E | 7401 | E903 | 0016 |
| 0000420600 | 2AA1 | 0556 | 0064 | FF50 | 2836 | 9A56 | 6206 | 6544 |
| 0000420620 | C483 | E904 | 0013 | 2AA1 | 2D56 | 0064 | FF50 | 2836 |
| 0000420640 | 9A56 | 6206 | 655D | C483 | 6A04 | 8D14 | E646 | 5016 |
| 0000420660 | 166A | DA68 | 6861 | 1C82 | 2B6A | 249A | CF5E | 8365 |

THU MAR 14 17:25:16 1991 CRV_IPS.DLL PAGE 149, LINE 8733

| | | | | | | | | |
|---|---|---|---|---|---|---|---|---|
| 0000420700 | 0EC4 | 4689 | 3DE4 | 0000 | 0375 | 06E9 | B800 | FF9C |
| 0000420720 | D1E9 | 8B00 | E646 | 21E9 | E900 | 0048 | 46C7 | 00FA |
| 0000420740 | E900 | 0040 | 3DE9 | C700 | E246 | 0001 | 46C7 | 00FA |
| 0000420760 | E900 | 0030 | 2DE9 | E900 | 002A | 013D | 7E00 | E903 |
| 0000421000 | 0012 | C00B | 037C | D0E9 | 2DFF | FFF3 | 0375 | D6E9 |
| 0000421020 | E9FF | FFE0 | 4848 | 0375 | C1E9 | 48FF | 0375 | C3E9 |
| 0000421040 | E9FF | FFD0 | 36FF | 562A | 36FF | 5628 | 069A | D762 |
| 0000421060 | 8365 | 04C4 | 1D9A | B560 | 3D64 | 0000 | 0374 | 06E9 |
| 0000421100 | B800 | FF9A | 5DE9 | 8300 | E27E | 7500 | E903 | 0006 |
| 0000421120 | F3B8 | E9FF | 004E | 7E83 | 00FA | 0375 | 06E9 | B800 |
| 0000421140 | FF96 | 3FE9 | 8B00 | E846 | 5EC4 | 2608 | 0789 | 468B |
| 0000421160 | C4EA | 085E | 8926 | 0247 | 468B | C4EC | 085E | 8926 |
| 0000421200 | 0447 | 468B | C4EE | 085E | 8926 | 0647 | 468B | C4F4 |
| 0000421220 | 0C5E | 8926 | 8B07 | F646 | 5EC4 | 2610 | 0789 | 00B8 |
| 0000421240 | E900 | 0000 | 5F5E | ED83 | 8B02 | 1FE5 | 4D5D | 1ECB |
| 0000421260 | 9058 | 5545 | EC8B | 8E1E | 81D8 | 32EC | 5700 | 8E56 |
| 0000421300 | E606 | 2631 | 06C7 | 2780 | 0000 | C726 | 8206 | 0027 |
| 0000421320 | 8E00 | E806 | 2631 | 28A1 | 8E0F | E606 | 2631 | 84A3 |
| 0000421340 | 8E27 | E806 | 2631 | 2AA1 | 8E0F | E606 | 2631 | 86A3 |
| 0000421360 | 8E27 | EA06 | 2631 | 06C7 | 1C50 | 0000 | C726 | 5206 |
| 0000421400 | 001C | 8E00 | E806 | 2631 | 28A1 | 480F | 068E | 31EA |
| 0000421420 | A326 | 1C54 | 068E | 31E8 | A126 | 0F2A | 8E48 | EA06 |
| 0000421440 | 2631 | 56A3 | 061C | 5068 | 9A1C | 5ED5 | 652E | C483 |
| 0000421460 | 8904 | EA46 | 003D | 7500 | E903 | 0006 | 9CB8 | E9FF |
| 0000421500 | 022D | 249A | 0F5F | 3D67 | 0000 | 0374 | 06E9 | B800 |
| 0000421520 | FF9B | 1AE9 | B802 | 04B0 | 4689 | 89F8 | FC46 | 2AA3 |
| 0000421540 | A356 | 5628 | 36FF | 562A | 36FF | 5628 | 069A | 2862 |
| 0000421560 | 8367 | 04C4 | 468D | 16E4 | 8D50 | E04E | 5116 | 568D |
| 0000421600 | 16F0 | 6A52 | 9A01 | 648A | 674C | C483 | 890E | EA46 |
| 0000421620 | 003D | 7500 | E903 | 002A | 468D | 16E4 | 8D50 | E046 |
| 0000421640 | 5016 | 468D | 16F0 | 6A50 | 9A00 | 648A | 678B | C483 |
| 0000421660 | 890E | EA46 | 003D | 7500 | E903 | 0006 | 468B | E9EA |
| 0000421700 | 01AD | 468B | 89F0 | EC46 | 468B | 89F2 | E846 | D0B8 |
| 0000421720 | 8907 | FA46 | 28A3 | B856 | 07D0 | 4689 | A3EE | 562A |
| 0000421740 | 36FF | 562A | 36FF | 5628 | 069A | A462 | 8367 | 04C4 |
| 0000421760 | 468D | 16E4 | 8D50 | E04E | 5116 | 568D | 16F0 | 6A52 |
| 0000422000 | 9A01 | 648A | 67C8 | C483 | 890E | EA46 | 003D | 7500 |
| 0000422020 | E903 | 002A | 468D | 16E4 | 8D50 | E046 | 5016 | 468D |
| 0000422040 | 16F0 | 6A50 | 9A00 | 648A | 67E4 | C483 | 890E | EA46 |
| 0000422060 | 003D | 7500 | E903 | 0006 | 468B | E9EA | 0131 | 76FF |
| 0000422100 | 9AF0 | 6303 | 67F2 | C483 | 8902 | E646 | 76FF | 9AF2 |
| 0000422120 | 6347 | 6809 | C483 | 8902 | E246 | 468B | 2BFA | FC46 |
| 0000422140 | 4689 | 8DDE | DE5E | 599A | 29B7 | 8B68 | E646 | 462B |
| 0000422160 | 2BEC | C7D2 | DC46 | 0000 | 46C7 | 00DA | 8900 | D856 |
| 0000422200 | 4689 | 8DD6 | D65E | 9E9A | 2EBD | 9A68 | BC9A | 6837 |
| 0000422220 | 1E8D | 27AC | 5A9A | 48B8 | 8B68 | EE46 | 462B | 89F8 |
| 0000422240 | D646 | 5E8D | 9AD6 | B759 | 6868 | 468B | 2BE2 | E846 |
| 0000422260 | D22B | 46C7 | 00D4 | C700 | D246 | 0000 | 5689 | 89D0 |
| 0000422300 | CE46 | 5E8D | 9ACE | BD9E | 686D | 9A9A | 76BC | 8D68 |
| 0000422320 | B01E | 9A27 | B85A | 6893 | 468B | 2BE6 | C7D2 | D446 |
| 0000422340 | 0000 | 46C7 | 00D2 | 8900 | D056 | 4689 | 8DCE | CE5E |
| 0000422360 | 9E9A | 9CBD | 8D68 | AC1E | 9A27 | BAD2 | 68A1 | 849A |
| 0000422400 | A6BD | 9A68 | B983 | 68CB | 462B | F7FA | A3D8 | 562C |
| 0000422420 | 468B | 2BE2 | C7D2 | D446 | 0000 | 46C7 | 00D2 | 8900 |
| 0000422440 | D056 | 4689 | 8DCE | CE5E | 9E9A | D4BD | 8D68 | B01E |
| 0000422460 | 9A27 | BAD2 | 68D9 | 849A | DEBD | 9A68 | B983 | 68ED |
| 0000422500 | 462B | F7EE | A3D8 | 562E | 016A | 449A | CC64 | 8366 |
| 0000422520 | 02C4 | 068E | 31EC | C726 | 7E06 | 0027 | 1E00 | B468 |
| 0000422540 | 9A27 | 6C45 | 66E5 | C483 | B804 | 0000 | 00E9 | 5E00 |

THU MAR 14 17:25:16 1991 CRV_IPS.DLL PAGE 150, LINE 8792

| | | | | | | | | |
|---|---|---|---|---|---|---|---|---|
| 0000422560 | 835F | 02ED | E58B | 5D1F | CB4D | 581E | 4590 | 8B55 |
| 0000422600 | 1EEC | D88E | EC81 | 000C | 5657 | 5EC4 | 2606 | 7F80 |
| 0000422620 | 1925 | 0374 | FBE9 | 8E00 | EC06 | 2631 | 3E83 | 277E |
| 0000422640 | 7500 | E903 | 0006 | EAB8 | E9FF | 01C1 | 5EC4 | 2606 |
| 0000422660 | 47C6 | 1825 | 5EC4 | 2606 | 478B | 8928 | F846 | 5EC4 |
| 0000422700 | 2606 | 478B | 892A | F646 | 5EC4 | 2606 | 7F80 | 0F24 |
| 0000422720 | 0374 | 26E9 | 9A00 | 6423 | 698E | 003D | 7400 | E903 |
| 0000422740 | 0009 | 00B8 | E900 | 0185 | 10E9 | 9A00 | 62C1 | 6996 |
| 0000422760 | 4601 | 9AF8 | 62E2 | 69A8 | 4601 | 8DF6 | F646 | 5016 |
| 0000423000 | 4E8D | 16F8 | 9A51 | 6D70 | 69B3 | C483 | 8D08 | F85E |
| 0000423020 | 599A | BCB7 | 8D69 | AC1E | 9A27 | BAD2 | 69C5 | 1E8D |
| 0000423040 | 562C | 6A9A | CAB7 | 9A69 | BCA4 | 69CF | 849A | D4BD |
| 0000423060 | 9A69 | B983 | 69DF | 4689 | 8DFC | F65E | 599A | E8B7 |
| 0000423100 | 8D69 | B01E | 9A27 | BAD2 | 69F1 | 1E8D | 562E | 6A9A |
| 0000423120 | F6B7 | 9A69 | BCA4 | 69FB | 849A | 00BD | 9A6A | B983 |
| 0000423140 | 6A0B | 4689 | FFFA | F876 | 039A | 1663 | 836A | 02C4 |
| 0000423160 | 76FF | 9AF6 | 6347 | 6A56 | C483 | 8B02 | FC46 | 5EC4 |
| 0000423200 | 2606 | 4789 | 8B28 | FA46 | 5EC4 | 2606 | 4789 | E92A |
| 0000423220 | 00AA | 5EC4 | 2606 | 478B | 8928 | F846 | 5EC4 | 2606 |
| 0000423240 | 478B | 892A | F646 | 468B | 2BF8 | 2C06 | 8956 | F446 |
| 0000423260 | 5E8D | 9AF4 | B759 | 6A5F | 1E8D | 27AC | FA9A | 64BA |
| 0000423300 | 9A6A | BD84 | 6A69 | 839A | 6FB9 | 506A | 039A | 8463 |
| 0000423320 | 836A | 02C4 | 468B | 2BF6 | 2E06 | 8956 | F446 | 5E8D |
| 0000423340 | 9AF4 | B759 | 6A8D | 1E8D | 27B0 | FA9A | 92BA | 9A6A |
| 0000423360 | BD84 | 6A97 | 839A | 9DB9 | 506A | 479A | 0463 | 8369 |
| 0000423400 | 02C4 | 5EC4 | 2606 | 3F83 | 7501 | E903 | 002E | 76FF |
| 0000423420 | FF08 | 0676 | FF9A | 00FF | 3D00 | 0000 | 0375 | 06E9 |
| 0000423440 | B800 | FFE8 | 46E9 | 6A0D | 9A0C | FFFF | 0000 | 003D |
| 0000423460 | 7500 | E903 | 0006 | E8B8 | E9FF | 0031 | 016A | 449A |
| 0000423500 | 7864 | 8369 | 02C4 | 5EC4 | 2606 | 47C6 | 0E24 | 76FF |
| 0000423520 | FF08 | 0676 | AF9A | 0062 | 3D00 | 0000 | 0375 | 06E9 |
| 0000423540 | B800 | FFE8 | 06E9 | B800 | 0000 | 00E9 | 5E00 | 835F |
| 0000423560 | 02ED | E58B | 5D1F | CB4D | 581E | 4590 | 8B55 | 1EEC |
| 0000423600 | D88E | EC81 | 005C | 5657 | EEA1 | 8B31 | F016 | 8931 |
| 0000423620 | A846 | 5689 | 1EAA | BD68 | FF27 | 0876 | 76FF | 9A06 |
| 0000423640 | 74CE | 6B6A | C483 | 8908 | A446 | 5689 | 0BA6 | 74D0 |
| 0000423660 | E903 | 0006 | FFB8 | E9FF | 00E0 | 76FF | FFA6 | A476 |
| 0000423700 | 506A | 468D | 16AC | 9A50 | 9732 | 6B81 | C483 | 8D0A |
| 0000423720 | FC46 | 5016 | 681E | 27BF | 76FF | FFA6 | A476 | 409A |
| 0000423740 | AA75 | 836B | 0CC4 | 7E83 | 01FC | 0375 | 06E9 | B800 |
| 0000423760 | FF91 | A5E9 | 1E00 | B068 | 1E27 | AC68 | 1E27 | C368 |
| 0000424000 | FF27 | A676 | 76FF | 9AA4 | 7540 | 6BC4 | C483 | 1E10 |
| 0000424020 | 2E68 | 1E56 | 2C68 | 1E56 | CA68 | FF27 | A676 | 76FF |
| 0000424040 | 9AA4 | 7540 | 6BD2 | C483 | FF10 | A676 | 76FF | 9AA4 |
| 0000424060 | 737A | 6AE1 | C483 | 8E04 | E606 | 2631 | 06C7 | 2780 |
| 0000424100 | 0000 | C726 | 8206 | 0027 | 8E00 | E806 | 2631 | 28A1 |
| 0000424120 | 8E0F | E606 | 2631 | 84A3 | 8E27 | E8C6 | 2631 | 2AA1 |
| 0000424140 | 8E0F | E606 | 2631 | 86A3 | 8E27 | EC06 | 2631 | 06C7 |
| 0000424160 | 277E | 0000 | 36FF | 27B2 | 36FF | 27B0 | 36FF | 27AE |
| 0000424200 | 36FF | 27AC | 36FF | 562E | 36FF | 562C | 229A | B22D |
| 0000424220 | 8358 | 0CC4 | 00B8 | E900 | 0000 | 5F5E | ED83 | 8B02 |
| 0000424240 | 1FE5 | 4D5D | 1ECB | 9058 | 5545 | EC8B | 8E1E | 81D8 |
| 0000424260 | 06EC | 5700 | 1E56 | D168 | FF27 | 0876 | 76FF | 9A06 |
| 0000424300 | 74CE | 6C8D | C483 | 8908 | FA46 | 5689 | 0BFC | 74D0 |
| 0000424320 | E903 | 0006 | FFB8 | E9FF | 009C | 76FF | FF08 | 0676 |
| 0000424340 | 681E | 27D3 | 76FF | FFFC | FA76 | E69A | A174 | 836C |
| 0000424360 | 0CC4 | 016A | 681E | 27E9 | 76FF | FFFC | FA76 | E69A |
| 0000424400 | AD74 | 836C | 0AC4 | 1E8D | 27B0 | 7A9A | B2B6 | 9A6C |
| 0000424420 | BD84 | 6CBC | EC83 | 8B08 | 9ADC | B8B5 | 6CC5 | 1E8D |

THU MAR 14 17:25:16 1991 CRV_IPS.DLL PAGE 151, LINE 8851

| | | | | | | | | |
|---|---|---|---|---|---|---|---|---|
| 0000424440 | 27AC | 7A9A | CAB6 | 9A6C | BD84 | 6CD4 | EC83 | 8B08 |
| 0000424460 | 9ADC | B8B5 | 6CE3 | 681E | 27ED | 76FF | FFFC | FA76 |
| 0000424500 | E69A | FD74 | 836C | 18C4 | 36FF | 562E | 36FF | 562C |
| 0000424520 | 681E | 27F4 | 76FF | FFFC | FA76 | E69A | 0B74 | 836D |
| 0000424540 | 0CC4 | 76FF | FFFC | FA76 | 7A9A | 4273 | 836B | 04C4 |
| 0000424560 | 00B8 | E900 | 0000 | 5F5E | ED83 | 8B02 | 1FE5 | 4D5D |
| 0000424600 | 1ECB | 9058 | 5545 | EC8B | 8E1E | 81D8 | 00EC | 5700 |
| 0000424620 | 9A56 | 6423 | 6D41 | 003D | 7500 | E903 | 0021 | E29A |
| 0000424640 | 4D62 | C46D | 065E | 8926 | 2A47 | C19A | 6262 | C46C |
| 0000424660 | 065E | 8926 | 2847 | 00B8 | E900 | 0009 | 06E9 | B800 |
| 0000424700 | 0000 | 00E9 | 5E00 | 835F | 02ED | E58B | 5D1F | CB4D |
| 0000424720 | 581E | 4590 | 8B55 | 1EEC | D88E | EC81 | 0000 | 5657 |
| 0000424740 | 5EC4 | 2606 | 078B | 068E | 31E6 | 3926 | 8006 | 7F27 |
| 0000424760 | E903 | 000D | A126 | 2780 | 5EC4 | 2606 | 0789 | 2BE9 |
| 0000425000 | 8E00 | E606 | 2631 | 84A1 | 2627 | 0603 | 2780 | 5EC4 |
| 0000425020 | 2606 | 073B | 0372 | 13E9 | 8E00 | E606 | 2631 | 84A1 |
| 0000425040 | 2627 | 0603 | 2780 | 5EC4 | 2606 | 0789 | 5EC4 | 260A |
| 0000425060 | 078B | 068E | 31E6 | 3926 | 8206 | 7F27 | E903 | 000D |
| 0000425100 | A126 | 2782 | 5EC4 | 260A | 0789 | 2BE9 | 8E00 | E606 |
| 0000425120 | 2631 | 84A1 | 2627 | 0603 | 2782 | 5EC4 | 260A | 073B |
| 0000425140 | 0372 | 13E9 | 8E00 | E606 | 2631 | 82A1 | 2627 | 0603 |
| 0000425160 | 2786 | 5EC4 | 260A | 0789 | 5F5E | ED83 | 8B02 | 1FE5 |
| 0000425200 | 4D5D | 1ECB | 9058 | 5545 | EC8B | 8E1E | 81D8 | 00EC |
| 0000425220 | 5700 | C456 | 065E | C726 | 1A47 | 000E | 00B8 | E900 |
| 0000425240 | 0000 | 5F5E | ED83 | 8B02 | 1FE5 | 4D5D | 1ECB | 9058 |
| 0000425260 | 5545 | EC8B | 8E1E | 81D8 | 00EC | 5700 | C456 | 065E |
| 0000425300 | C726 | 1A47 | 000F | 00B8 | E900 | 0000 | 5F5E | ED83 |
| 0000425320 | 8B02 | 1FE5 | 4D5D | 00CB | 0000 | 0000 | 0000 | 0000 |
| 0000425340 | 0000 | 0000 | 0000 | 0000 | 8B55 | 1EEC | 0068 | 1E28 |
| 0000425360 | 0468 | 9A28 | FFFF | 0000 | 068E | 2800 | A126 | 0015 |
| 0000425400 | 40A3 | BB28 | E30A | 1F8C | 55BE | 8356 | FEE6 | 1E56 |
| 0000425420 | FF9A | 00FF | 0B00 | 74C0 | 3304 | EBC0 | 893A | 0477 |
| 0000425440 | 894E | 0836 | 8328 | 03EE | 04C7 | 0001 | 7789 | 8906 |
| 0000425460 | 0877 | C683 | C702 | FE04 | 89FF | 0A77 | 681E | 27FE |
| 0000425500 | 681E | 27FC | FF9A | 00FF | E800 | 0020 | 4C9A | 3471 |
| 0000425520 | E86D | 0066 | 01B8 | 5D00 | 50CB | 0A9A | EF71 | 9A6E |
| 0000425540 | 7284 | 6EFD | FF68 | 9A00 | 7013 | 6F02 | BB1E | 000D |
| 0000425560 | FF33 | 068E | 27FE | FFB9 | 267F | 3D80 | 7500 | 4701 |
| 0000425600 | 8026 | 003D | 3174 | 1EBE | 8B28 | 8BD1 | F3CB | 8BA6 |
| 0000425620 | 74CA | 3308 | F2C0 | 74AE | EBE7 | 061C | 071E | F78B |
| 0000425640 | BF1F | 2845 | 2CAC | 7241 | C00E | 04E0 | AC92 | 412C |
| 0000425660 | 0572 | C20A | EBAA | 1FED | 00C3 | 02BB | 5200 | D48B |
| 0000425700 | A780 | 2845 | 50B7 | C48B | 1653 | 1650 | 9A52 | FFFF |
| 0000425720 | 0000 | C00B | 7558 | B110 | 3C40 | 7401 | 3C06 | 7502 |
| 0000425740 | B106 | 0808 | 458F | 4B28 | D679 | E85A | 0026 | 90BE |
| 0000425760 | BF31 | 3190 | 5FE8 | BE01 | 3190 | 98BF | E831 | 0156 |
| 0000426000 | 98B8 | 3D31 | 319C | 0B74 | 016A | 680E | 6FE5 | FF9A |
| 0000426020 | 00FF | C300 | 0E8B | 3186 | 2AE3 | 06C4 | 3188 | C28C |
| 0000426040 | DB33 | 1EFF | 3184 | 0373 | 61E9 | 8E01 | 0406 | 2628 |
| 0000426060 | 1E8B | 0006 | 754B | C40D | 8C06 | 8C31 | BBC2 | 0003 |
| 0000426100 | 1EFF | 3184 | B8C3 | 5E35 | D88E | 55A1 | 0B2A | 75C0 |
| 0000426120 | 0E10 | D4A1 | 0B2F | 75C0 | E805 | 001F | 03EB | 24E8 |
| 0000426140 | 6A00 | 6A03 | 6A00 | 9A00 | 6FAF | 0000 | 8B55 | 33EC |
| 0000426160 | EBC9 | 551A | EC8B | 01B9 | EB00 | 5512 | EC8B | 5756 |
| 0000426200 | 00B9 | EB01 | 5508 | EC8B | 5756 | 01B9 | E801 | 004B |
| 0000426220 | 0A51 | 75C9 | BE12 | 5642 | 42BF | E856 | 00B8 | 98BE |
| 0000426240 | BF31 | 319C | AFE8 | BE00 | 319C | 9CBF | E831 | 00A6 |
| 0000426260 | 9CBE | BF31 | 319C | 9DE8 | E800 | 008C | 0A58 | 75E4 |
| 0000426300 | C713 | 5506 | 012A | B800 | 0001 | 8A50 | 0646 | 9A50 |

THU MAR 14 17:25:16 1991 CRV_IPS.DLL PAGE 152, LINE 8910

| | | | | | | | | |
|---|---|---|---|---|---|---|---|---|
| 0000426320 | FFFF | 0000 | 4EE8 | 5F00 | 5D5E | 55CB | EC8B | 0D6A |
| 0000426340 | CBE8 | 8325 | 02C4 | 068E | 2804 | 8B26 | 061E | 4B00 |
| 0000426360 | 168B | 2A57 | FA83 | 75FF | 8904 | 571E | 392A | 571E |
| 0000426400 | 9F2A | 0D6A | D1E8 | 8325 | 02C4 | 749E | 6A0A | E80E |
| 0000426420 | 257C | C483 | EB02 | 3BC7 | 74D3 | 6A08 | E80E | 258E |
| 0000426440 | C483 | 5D02 | 55C3 | EC8B | 0D6A | 81E8 | 8325 | 02C4 |
| 0000426460 | 06C7 | 2A57 | FFFF | 0D6A | 9DE8 | 8325 | 02C4 | 0E6A |
| 0000426500 | 95E8 | 8325 | 02C4 | C35D | 0E8B | 3186 | 07E3 | 02BB |
| 0000426520 | FF00 | 841E | C331 | F73B | 0E73 | EF83 | 8B04 | 0B05 |
| 0000426540 | 0245 | F274 | 1DFF | EEEB | 00C3 | 8B55 | B8EC | 00FC |
| 0000426560 | 0E50 | 6FE8 | 8301 | 5C3E | 002A | 0474 | 1EFF | 2A5A |
| 0000426600 | FFB8 | 5000 | E80E | 015C | E58B | CB5D | 02B8 | E900 |
| 0000426620 | FDC7 | 5A59 | DC8B | D82B | 0B72 | FB81 | 0200 | 0572 |
| 0000426640 | E38B | 5152 | 52CB | 3351 | E9C0 | FDAD | 14C8 | 0000 |
| 0000426660 | 5657 | FF2B | F78B | 3639 | 27FE | 0375 | F0E9 | A100 |
| 0000426700 | 27FE | C92B | 4E89 | 89F4 | F646 | 4E89 | 89F8 | FA46 |
| 0000426720 | 0C6A | 76FF | FFFA | F876 | 681E | 281E | 749A | C092 |
| 0000426740 | 8371 | 0AC4 | C00B | 1A74 | 8146 | FFFE | 767F | E903 |
| 0000426760 | 00BD | 5EC4 | FFF8 | F846 | 8026 | 003F | EA75 | EB47 |
| 0000427000 | 900D | 5EC4 | FFF8 | F846 | 8026 | 003F | F475 | 5E8B |
| 0000427020 | 26F8 | 3F80 | 7500 | 8DB9 | 0145 | 6A50 | 9A04 | 99BC |
| 0000427040 | 71CF | C483 | 8904 | F046 | 5689 | 56F2 | CE9A | 058E |
| 0000427060 | 8372 | 02C4 | 4689 | 89FC | FE56 | 468B | 0BF2 | F046 |
| 0000427100 | 6D74 | C28B | 460B | 74FC | 8B66 | F046 | 568B | A3F2 |
| 0000427120 | 2A4B | 1689 | 2A4D | 0C6A | 76FF | FFF6 | F476 | 681E |
| 0000427140 | 281E | 749A | 0A92 | 836F | 0AC4 | C00B | 2C74 | 468B |
| 0000427160 | 8BFC | FE56 | 5EC4 | 83F0 | F046 | 2604 | 0789 | 8926 |
| 0000427200 | 0257 | 5EC4 | FFF4 | F446 | 8A26 | C407 | FC5E | 46FF |
| 0000427220 | 26FC | 0788 | C00A | 0E74 | E8EB | 5EC4 | FFF4 | F446 |
| 0000427240 | 8026 | 003F | F475 | 5EC4 | 26F4 | 3F80 | 7500 | 5EA7 |
| 0000427260 | C95F | 90CB | 8B55 | 56EC | B857 | 6FE6 | D88E | C08E |
| 0000427300 | 568B | BE06 | 3208 | 3BAD | 74C2 | 4010 | 7496 | 970C |
| 0000427320 | C033 | FFB9 | F2FF | 8BAE | EBF7 | 96EB | 5E5F | E58B |
| 0000427340 | CA5D | 0002 | 8B55 | 57EC | 76FF | 0E06 | C5E8 | 0BFF |
| 0000427360 | 74C0 | 921F | FA8B | C033 | FFB9 | F2FF | F7AE | 49D1 |
| 0000427400 | 8B50 | BBC4 | 0002 | 1E53 | 5152 | 5016 | FF9A | 00FF |
| 0000427420 | 5B00 | 8B5F | 5DE5 | 02CA | 0000 | 1601 | 0202 | 0203 |
| 0000427440 | 1804 | 0D05 | 0906 | 0C07 | 0C08 | 0C09 | 070A | 080B |
| 0000427460 | 160C | 160D | 020F | 0D10 | 1211 | 0212 | 0235 | 0D41 |
| 0000427500 | 0243 | 0D52 | 0D53 | 0D57 | 0B59 | 0D6C | 206D | 1C70 |
| 0000427520 | 0972 | 1606 | 0A80 | 0A81 | 0982 | 0D84 | 0BA4 | 02CE |
| 0000427540 | 0BD7 | 0D00 | 1608 | 8B52 | E8D8 | 23AC | 8E93 | 5AC2 |
| 0000427560 | 8926 | 0247 | 8926 | B817 | FFFF | 8B99 | 5DE5 | E8CB |
| 0000427600 | 0008 | FFB8 | 99FF | E58B | CB5D | D88B | 89E8 | 9323 |
| 0000427620 | C28E | 8926 | 0247 | BB53 | 72BA | 24B9 | 0A00 | 75E4 |
| 0000427640 | 2E1B | 073A | 1674 | 4343 | F7E2 | 133C | 0472 | 243C |
| 0000427660 | 0A76 | 3C43 | 72BC | 3C04 | 76CA | 4301 | 8A2E | 0147 |
| 0000427700 | 5B98 | 8926 | C307 | 8B55 | BBEC | 0002 | 05EB | 8B55 |
| 0000427720 | 33EC | E8DB | 2342 | C303 | CB5D | 04C8 | 0000 | 46C7 |
| 0000427740 | FFFC | C4FF | 065E | F626 | 0A47 | 7440 | 2607 | 47C6 |
| 0000427760 | 000A | 2CEB | C38B | 682D | B92A | 000C | F799 | 89F9 |
| 0000430000 | FE46 | E850 | 2258 | C483 | FF02 | 0876 | 76FF | 9A06 |
| 0000430020 | 73C6 | 73E0 | C483 | 8904 | FC46 | 76FF | E8FE | 224A |
| 0000430040 | 468B | C9FC | 90CB | 10C8 | 0000 | 5657 | FFBF | 8BFF |
| 0000430060 | 0676 | 44F6 | 830A | 0375 | 97E9 | 1E00 | 9A56 | 79CE |
| 0000430100 | 7405 | C483 | 8B04 | 8BF8 | 81DE | 68EB | 8B2A | 4C87 |
| 0000430120 | 892C | FA46 | 561E | 59E8 | 8303 | 04C4 | 448A | 2A0B |
| 0000430140 | 50E4 | FC9A | 2088 | 8374 | 02C4 | C00B | 617C | 7E83 |
| 0000430160 | 00FA | 5E74 | 681E | 2A62 | 468D | 16F0 | 9A50 | 91D2 |

THU MAR 14 17:25:16 1991 CRV_IPS.DLL PAGE 153, LINE 8969

| | | | | | | | | |
|---|---|---|---|---|---|---|---|---|
| 0000430200 | 7440 | C483 | 8D08 | F246 | 4689 | 8CFC | FE56 | 7E80 |
| 0000430220 | 5CF0 | 1474 | 681E | 2A64 | 468D | 16F0 | 9A50 | 918C |
| 0000430240 | 7459 | C483 | EB08 | 9004 | 4EFF | 6AFC | FF0A | FE76 |
| 0000430260 | 76FF | FFFC | FA76 | 6E9A | 6693 | 8374 | 08C4 | 468D |
| 0000430300 | 16F0 | 9A50 | A096 | 717F | C483 | 0B04 | 74C0 | BF03 |
| 0000430320 | FFFF | 44C6 | 000A | C78B | 5F5E | CBC9 | 08C8 | 0000 |
| 0000430340 | DA9A | AA87 | 8974 | FC46 | 5689 | 0BFE | 75D0 | 2B05 |
| 0000430360 | 99C0 | 37EB | 76FF | 50FE | 76FF | FF0E | 0C76 | 76FF |
| 0000430400 | FF0A | 0876 | 76FF | 9A06 | 77D6 | 74E2 | C483 | 890E |
| 0000430420 | F846 | 5689 | 8BFA | FC46 | 682D | B92A | 000C | F799 |
| 0000430440 | 50F9 | 45E8 | 8B21 | F846 | 568B | C9FA | 90CB | 8B55 |
| 0000430460 | 6AEC | FF40 | 0C76 | 76FF | FF0A | 0876 | 76FF | 9A06 |
| 0000430500 | 747C | 73B2 | CBC9 | 08C8 | 0000 | 5657 | 768B | 8B06 |
| 0000430520 | 2DC6 | 2A68 | 0CB9 | 9900 | F9F7 | 4689 | 50FA | FDE8 |
| 0000430540 | 8320 | 02C4 | 561E | BFE8 | 8303 | 04C4 | F88B | 468D |
| 0000430560 | 160E | FF50 | 0C76 | 76FF | 1E0A | 9A56 | 82F0 | 7483 |
| 0000430600 | C483 | 890C | F846 | 561E | E857 | 0414 | C483 | FF06 |
| 0000430620 | FA76 | D5E8 | 8320 | 02C4 | 468B | 5EF8 | C95F | 90CB |
| 0000430640 | 08C8 | 0000 | 468B | 2D06 | 2A68 | 0CB9 | 9900 | F9F7 |
| 0000430660 | 4689 | 50FA | A7E8 | 8320 | 02C4 | 468D | 160E | FF50 |
| 0000430700 | 0C76 | 76FF | FF0A | 0876 | 76FF | 9A06 | 7AB6 | 751E |
| 0000430720 | C483 | 890C | F846 | 76FF | E8FA | 208E | 468B | C9F8 |
| 0000430740 | 90CB | 08C8 | 0000 | B857 | 0001 | E850 | 2070 | C483 |
| 0000430760 | 1E02 | 7468 | E82A | 0330 | C483 | 8B04 | 8DF8 | 0A46 |
| 0000431000 | 5016 | 76FF | FF08 | 0676 | 681E | 2A74 | F09A | 6E82 |
| 0000431020 | 8375 | 0CC4 | 4689 | 1EF8 | 7468 | 572A | 81E8 | 8303 |
| 0000431040 | 06C4 | 016A | 43E8 | 8320 | 02C4 | 468B | 5FF8 | CBC9 |
| 0000431060 | 8B55 | 56EC | 8B57 | 0676 | 448A | A80A | 7483 | A85F |
| 0000431100 | 7540 | A85B | 7502 | 0C48 | 8801 | 0A44 | FE8B | EF81 |
| 0000431120 | 2A68 | C781 | 2C48 | 0CA8 | 0D75 | 05F6 | 7501 | 1E08 |
| 0000431140 | E856 | 0186 | C483 | 8B04 | 0644 | 0489 | 75FF | FF02 |
| 0000431160 | 0874 | 3350 | 8ADB | 0B5C | 0E53 | 75E8 | 8315 | 08C4 |
| 0000431200 | C00B | 1174 | FF3D | 75FF | 801A | 0A4C | EB20 | 800A |
| 0000431220 | 0A4C | EB20 | 8009 | 0A4C | C710 | 0444 | 0000 | FFB8 |
| 0000431240 | EBFF | 8A25 | 45BF | 8028 | 82E7 | FF80 | 7582 | 8A0B |
| 0000431260 | 0A7C | C7F6 | 7582 | 8003 | 200D | 8948 | 0444 | 1CC4 |
| 0000431300 | C033 | 8A26 | 4307 | 1C89 | 5E5F | CB5D | 8B55 | 56EC |
| 0000431320 | 8B57 | 0876 | 448A | A80A | 7482 | A864 | 7540 | C760 |
| 0000431340 | 0444 | 0000 | 01A8 | 0B74 | 10A8 | 5374 | 4C8B | 8906 |
| 0000431360 | 240C | 0CFE | 2402 | 88EF | 0A44 | FE8B | EF81 | 2A68 |
| 0000431400 | C781 | 2C48 | DB33 | 5C8A | A80B | 7508 | A84B | 7504 |
| 0000431420 | F618 | 0105 | 4275 | FE81 | 2A74 | 0674 | FE81 | 2A80 |
| 0000431440 | 2675 | 87F6 | 2845 | 7440 | B91F | 0001 | 1651 | 7E8D |
| 0000431460 | 5706 | 0E53 | 23E8 | 8316 | 08C4 | 01B9 | EB00 | B846 |
| 0000431500 | FFFF | 4C80 | 200A | 65EB | 1E53 | E856 | 009C | C483 |
| 0000431520 | 5B04 | 44F6 | 080A | D174 | 0C8B | 548B | 2B06 | 42CA |
| 0000431540 | 1489 | 558B | 4A02 | 5489 | E304 | 5125 | FF51 | 0874 |
| 0000431560 | 74FF | 5306 | E80E | 15E2 | C483 | 5908 | 7CC4 | 8B06 |
| 0000431600 | 0656 | 8826 | 3B15 | 75C1 | 33B6 | 8AC0 | 0646 | 1DEB |
| 0000431620 | C033 | 87F6 | 2845 | 7420 | B9E3 | 0002 | 5051 | 5350 |
| 0000431640 | E80E | 1202 | C483 | 3308 | 8BC0 | EBC8 | 5FCF | 5D5E |
| 0000431660 | 00CB | 8B55 | 56EC | 768B | 8A04 | 0A44 | 83A8 | 2674 |
| 0000431700 | 08A8 | 2274 | 74FF | FF08 | 0674 | D89A | AF8E | 8375 |
| 0000431720 | 04C4 | 6480 | F70A | C033 | 4489 | 8906 | 0844 | 0489 |
| 0000431740 | 4489 | 8902 | 0444 | 5D5E | 00C3 | 8B55 | 56EC | 768B |
| 0000431760 | B804 | 0200 | 9A50 | 8ECE | 776D | 8B59 | 81DE | 68EB |
| 0000432000 | 812A | 48C3 | 0B2C | 74D2 | 800B | 0A4C | C708 | 0247 |
| 0000432020 | 0200 | 0EEB | 4C80 | 040A | 47C7 | 0102 | 8C00 | 8DDA |
| 0000432040 | 0147 | 5489 | 8902 | 8904 | 0854 | 4489 | C706 | 0444 |

THU MAR 14 17:25:16 1991 CRV_IPS.DLL PAGE 154, LINE 9028

| | | | | | | | | |
|---|---|---|---|---|---|---|---|---|
| 0000432060 | 0000 | 5D5E | 00C3 | 08C8 | 0000 | 5657 | 5EC4 | 260A |
| 0000432100 | 078A | 3D98 | 0077 | 4874 | 0877 | 612C | 4C74 | 112C |
| 0000432120 | 0674 | C02B | E999 | 00CC | F62B | 46C6 | 01FC | 46C7 |
| 0000432140 | 01FE | FF00 | 0A46 | 5EC4 | 260A | 3F80 | 7400 | 835B |
| 0000432160 | FE7E | 7400 | 2655 | 078A | 3D98 | 0074 | 3474 | 0877 |
| 0000432200 | 2B2C | 1C74 | 372C | 3674 | 46C7 | 00FE | EB00 | 90D4 |
| 0000432220 | 01BE | C603 | FC46 | EB02 | 90C5 | 09BE | EB01 | 90F4 |
| 0000432240 | C6F7 | 0002 | E275 | CE83 | 8302 | FEE6 | 46C6 | 80FC |
| 0000432260 | B1EB | C6F7 | C000 | D075 | CE81 | 4000 | A5EB | C6F7 |
| 0000432300 | C000 | C475 | CE81 | 8000 | 99EB | A468 | FF01 | 0E76 |
| 0000432320 | FF56 | 0876 | 76FF | 9A06 | 89B4 | 7798 | C483 | 890A |
| 0000432340 | FA46 | C00B | 037D | 69E9 | FFFF | 6606 | 8B2A | 107E |
| 0000432360 | C78B | 682D | 052A | 2C48 | 4689 | 8AF8 | FC46 | 4588 |
| 0000432400 | 8B0A | F85E | 07C6 | 2B00 | 89C0 | 0445 | 4789 | 8904 |
| 0000432420 | 0245 | 0589 | 4589 | 8908 | 0645 | 468A | 88FA | 0B45 |
| 0000432440 | C78B | DA8C | 5F5E | CBC9 | 8B55 | 56EC | 8B57 | 0476 |
| 0000432460 | 2CBB | 812E | 74FE | 742A | BB09 | 2E30 | FE81 | 2A80 |
| 0000432500 | 5875 | FE8B | EF81 | 2A68 | C781 | 2C48 | 44F6 | 0C0A |
| 0000432520 | 4875 | 05F6 | 7501 | 8B43 | 8B07 | 0257 | C88B | CA0B |
| 0000432540 | 2174 | 4489 | 8906 | 0854 | 0489 | 5489 | C702 | 0444 |
| 0000432560 | 0200 | 45C7 | 0002 | 8002 | 0A4C | C602 | 1105 | 01B8 |
| 0000432600 | EB00 | 5319 | 00B8 | 5002 | CE9A | 7A8E | 5B78 | 0B5B |
| 0000432620 | 74D2 | 8907 | 8907 | 0257 | C8EB | C033 | 5E5F | C35D |
| 0000432640 | 8B55 | 56EC | 8B57 | 0676 | FE8B | EF81 | 2A68 | C781 |
| 0000432660 | 2C48 | 05F6 | 7410 | 332D | 8ADB | 0B5C | 87F6 | 2845 |
| 0000432700 | 7440 | 1E21 | 0E56 | 65E8 | 8300 | 04C4 | 7E83 | 0004 |
| 0000432720 | 1274 | C033 | 0588 | 4589 | 8902 | 8904 | 0244 | 4489 |
| 0000432740 | 8906 | 0844 | 5E5F | C35D | 04C8 | 0000 | 468B | 0B08 |
| 0000432760 | 0646 | 0875 | 006A | A7E8 | EB00 | 9031 | 468B | 2D06 |
| 0000433000 | 2A68 | 0CB9 | 9900 | F9F7 | 4689 | 50FC | 4FE8 | 831C |
| 0000433020 | 02C4 | 76FF | FF08 | 0676 | CE9A | 1279 | 837A | 04C4 |
| 0000433040 | 4689 | FFFE | FC76 | 41E8 | 8B1C | FE46 | CBC9 | 02C8 |
| 0000433060 | 0000 | 5657 | FF2B | 768B | 8A06 | 0A44 | C88B | 0324 |
| 0000433100 | 023C | 3F75 | C1F6 | 7508 | 8B0D | 81DE | 68EB | F62A |
| 0000433120 | 4887 | 012C | 2D74 | 048B | 442B | 8906 | FE46 | C00B |
| 0000433140 | 217E | FF50 | 0874 | 74FF | 8A06 | 0B4C | ED2A | 9A51 |
| 0000433160 | 8CFA | 7A8F | C483 | 3908 | FE46 | 0774 | 4C8D | 200A |
| 0000433200 | FFBF | 8BFF | 0644 | 548B | 8908 | 8904 | 0254 | 44C7 |
| 0000433220 | 0004 | 8B00 | 5EC7 | C95F | 90CB | 016A | 01E8 | CB00 |
| 0000433240 | 04C8 | 0000 | 5657 | 68BE | 2B2A | 89FF | FE7E | 026A |
| 0000433260 | FBE8 | 831B | 02C4 | 11EB | 46C7 | FFFE | FFFF | FC76 |
| 0000433300 | A7E8 | 831B | 02C4 | C683 | 390C | 2836 | 722E | 8B2B |
| 0000433320 | 2DC6 | 2A68 | 0CB9 | 9900 | F9F7 | 4689 | 50FC | 7DE8 |
| 0000433340 | 831B | 02C4 | 44F6 | 830A | D374 | 561E | CE9A | 2B79 |
| 0000433360 | 8379 | 04C4 | 7440 | 47C1 | C3EB | 026A | D9E8 | 831B |
| 0000433400 | 02C4 | 7E83 | 0104 | 0475 | C78B | 03EB | 468B | 5EFE |
| 0000433420 | C95F | 02C2 | 9000 | 8B55 | B8EC | 01B4 | 329A | 7071 |
| 0000433440 | 577C | C656 | B846 | 2B00 | 89C0 | E846 | 4689 | C4C6 |
| 0000433460 | 0A5E | 8026 | 003F | 0375 | 5FE9 | 2607 | 1F8A | FF2A |
| 0000433500 | 87F6 | 2ECF | 7408 | FF2D | E84E | 468D | 16E8 | FF50 |
| 0000433520 | 0876 | 76FF | E806 | 07C6 | FF50 | 0876 | 76FF | E806 |
| 0000433540 | 07A0 | 46FF | C40A | 0A5E | 8A26 | 2A1F | F6FF | CF87 |
| 0000433560 | 082E | EE75 | 5E8B | 260A | 3F80 | 7425 | E903 | 06F2 |
| 0000433600 | 46C6 | 00C0 | C02A | 4688 | 88FC | B646 | 4688 | 88F2 |
| 0000433620 | F646 | 4688 | 88EE | 5286 | 2BFE | 89C0 | EA46 | 4689 |
| 0000433640 | 89BA | FE46 | 4689 | 89C4 | C246 | 68EB | 9090 | 46FF |
| 0000433660 | C40A | 0A5E | 8A26 | 2A07 | 8BE4 | F6F8 | CF85 | 042E |
| 0000433700 | 1A74 | 46FF | 8BBA | FE46 | C88B | E0C1 | 0302 | D1C1 |
| 0000433720 | 03E0 | 2DC7 | 0030 | 4689 | EBFE | 9039 | 6C3D | 7400 |

THU MAR 14 17:25:16 1991 CRV_IPS.DLL PAGE 155, LINE 9087

| | | | | | | | | |
|---|---|---|---|---|---|---|---|---|
| 0000433740 | 771C | 3C2D | 744C | 7F13 | 2C1F | 742A | 2C15 | 741C |
| 0000433760 | EB23 | 901D | 46FE | EBFC | 901B | 46FE | FEF6 | F646 |
| 0000434000 | 12EB | 46FE | EBEE | 900D | 4E2C | 0874 | 1A2C | E474 |
| 0000434020 | 86FE | FE52 | BE80 | FE52 | 7400 | 8093 | EE7E | 7500 |
| 0000434040 | C414 | 0E5E | 4683 | 040E | 8B26 | 2607 | 578B | 8902 |
| 0000434060 | F846 | 5689 | C6FA | 5286 | 00FE | 5EC4 | 260A | 078A |
| 0000434100 | 200C | E42A | F88B | FF83 | 746E | 8329 | 63FF | 1674 |
| 0000434120 | FF83 | 747B | 8D11 | E846 | 5016 | 76FF | FF08 | 0676 |
| 0000434140 | BBE8 | EB06 | 900D | 46FF | FFE8 | 0876 | 76FF | E806 |
| 0000434160 | 0662 | F08B | 7E83 | 00BA | 0974 | 7E83 | 00FE | 0375 |
| 0000434200 | 83E9 | 8B05 | E9C7 | 05A0 | 7E83 | 00BA | 0675 | 46FF |
| 0000434220 | FFBA | FE46 | 46C7 | 3ABC | 8C2E | BE5E | 23EB | 46C7 |
| 0000434240 | 34BC | EB2E | 90F4 | 46FF | C40A | 0A5E | 5E89 | 8CBC |
| 0000434260 | BE46 | 8026 | 5E3F | 0C75 | 478D | 8901 | BC46 | 468C |
| 0000434300 | FEBE | B64E | 206A | 006A | 468D | 16C8 | 9A50 | 9FC2 |
| 0000434320 | 79BB | C483 | 8308 | 7BFF | 0374 | A9E9 | C400 | BC5E |
| 0000434340 | 8026 | 5D3F | 0374 | 9DE9 | C600 | C046 | FF5D | BC46 |
| 0000434360 | 46C6 | 20D3 | 8FE9 | 9000 | 8A26 | 8807 | F446 | 46FF |
| 0000434400 | 3CBC | 752D | 800F | C07E | 7400 | 8B09 | BC5E | 8026 |
| 0000434420 | 5D3F | 1E75 | 5E8A | 88F4 | C05E | 01B0 | CB8A | E180 |
| 0000434440 | C007 | 03EB | FF2A | 568D | 03C8 | D2DA | 36E0 | 0708 |
| 0000434460 | 54EB | 46FF | 26BC | 078A | 4688 | 3AF4 | C046 | 0676 |
| 0000434500 | 4688 | EBF0 | 900D | 468A | 88C0 | F046 | 468A | 88F4 |
| 0000434520 | C046 | 468A | 88C0 | F446 | 1CEB | 5E8A | B0F4 | 8A01 |
| 0000434540 | 80CB | 07E1 | EBC0 | 2A03 | 8DFF | C856 | DA03 | E0D2 |
| 0000434560 | 0836 | FE07 | F446 | 468A | 98F0 | 4E8A | 2AF4 | 3BED |
| 0000434600 | 7DC1 | 88D7 | C06E | 5EC4 | 26BC | 3F80 | 745D | E903 |
| 0000434620 | FF66 | 8026 | 003F | 0375 | FFE9 | 8304 | 7BFF | 0A75 |
| 0000434640 | C38B | C28C | 4689 | 890A | 0C56 | 468B | 8BF8 | FA56 |
| 0000434660 | 8689 | FE54 | 9689 | FE56 | 7E83 | 00BA | 0A74 | 468B |
| 0000434700 | FFFE | FE4E | C00B | 4E74 | FE83 | 74FF | 8B49 | C1DE |
| 0000434720 | 03FB | 468D | 03C8 | 36D8 | 078A | 4632 | 98B6 | 01BA |
| 0000434740 | 8B00 | 8BCE | 80D9 | 07E1 | E2D3 | C285 | 2874 | 7E80 |
| 0000434760 | 00EE | 0E75 | C68B | 5EC4 | FFF8 | F846 | 8826 | EB07 |
| 0000435000 | 9005 | 86FF | FE54 | 46FF | FFE8 | 0876 | 76FF | E806 |
| 0000435020 | 04C2 | F08B | A2EB | 4EFF | 56E8 | 76FF | FF08 | 0676 |
| 0000435040 | DFE8 | 8B04 | F846 | 568B | 39FA | 5486 | 75FE | 3909 |
| 0000435060 | 5696 | 75FE | E903 | 0462 | 7E80 | 00EE | 0374 | 29E9 |
| 0000435100 | FF04 | C646 | FF83 | 7563 | E903 | 041E | C28E | D88B |
| 0000435120 | C626 | 0007 | 13E9 | 9004 | 64BF | 8300 | 2DFE | 0675 |
| 0000435140 | 46FE | EBF2 | 9006 | FE83 | 752B | FF1F | FE4E | 0C75 |
| 0000435160 | 7E83 | 00BA | 0674 | 86FE | FE52 | 0EEB | 46FF | FFE8 |
| 0000435200 | 0876 | 76FF | E806 | 044C | F08B | FE83 | 7430 | E903 |
| 0000435220 | 0155 | 46FF | FFE8 | 0876 | 76FF | E806 | 0436 | F08B |
| 0000435240 | 783C | 0474 | 583C | 1475 | 46FF | FFE8 | 0876 | 76FF |
| 0000435260 | E806 | 0420 | F08B | 78BF | E900 | 012B | 46FF | 83EA |
| 0000435300 | 78FF | 0674 | 6FBF | E900 | 011D | 4EFF | 56E8 | 76FF |
| 0000435320 | FF08 | 0676 | 2BE8 | BE04 | 0030 | 0AE9 | 9001 | 7E80 |
| 0000435340 | 00FC | 0675 | 46FE | BFF6 | 0046 | FE83 | 752D | FE05 |
| 0000435360 | F246 | 08EB | FE83 | 742B | E903 | 00EB | 4EFF | 74FE |
| 0000435400 | E903 | 0095 | 7E83 | 00BA | 0375 | 8CE9 | FE00 | 5286 |
| 0000435420 | E9FE | 00D3 | FF83 | 7478 | 830D | 70FF | 0874 | FF83 |
| 0000435440 | 7446 | E903 | 0084 | 84F6 | 2ECF | 7480 | 6A15 | 8D04 |
| 0000435460 | C246 | 5016 | D69A | 65A0 | 567F | 79E8 | 8B03 | EBF0 |
| 0000435500 | 9036 | FF83 | 7546 | 832C | EA7E | 7400 | 8326 | 3AFE |
| 0000435520 | 1C75 | 468B | 89C2 | EC46 | C02B | 4689 | 89C4 | C246 |
| 0000435540 | 46C7 | FFEA | BFFF | 0070 | 30BE | EB00 | 900A | 46C7 |
| 0000435560 | 00EA | FE00 | 5286 | 80FE | 52BE | 00FE | 5C75 | 46FF |
| 0000435600 | 8DEA | D044 | 0199 | C246 | 5611 | 83C4 | BA7E | 7400 |

THU MAR 14 17:25:16 1991 CRV_IPS.DLL PAGE 156, LINE 9146

| | | | | | | | | |
|---|---|---|---|---|---|---|---|---|
| 0000435620 | FF08 | FE4E | 0375 | 74E9 | FFFF | E846 | 76FF | FF08 |
| 0000435640 | 0676 | 2FE8 | 8B03 | EBF0 | 903E | 84F6 | 2ECF | 7404 |
| 0000435660 | 83C2 | 6FFF | 1475 | FE83 | 7D38 | 6AB8 | 8D03 | C246 |
| 0000435700 | 5016 | D69A | 76A0 | EB7F | 90AE | 006A | 0A6A | 468D |
| 0000435720 | 16C2 | 9A50 | A0B4 | 7ABF | 9DEB | 4EFF | 56E8 | 76FF |
| 0000435740 | FF08 | 0676 | 1BE8 | 8003 | 52BE | 00FE | 0375 | 23E9 |
| 0000435760 | 83FF | 70FF | 0F75 | 7E80 | 00F6 | 0974 | 468B | 8BEC |
| 0000436000 | C24E | 4689 | 80C4 | F27E | 7400 | F70A | C25E | 5683 |
| 0000436020 | 00C4 | 5EF7 | 83C4 | 46FF | 0575 | 46C7 | 00EA | 8300 |
| 0000436040 | EA7E | 7500 | E903 | 0272 | 7E80 | 00EE | 0374 | 39E9 |
| 0000436060 | FF02 | C646 | 7E80 | 00F6 | 1474 | 468B | 8BC2 | C456 |
| 0000436100 | 5EC4 | 26F8 | 0789 | 8926 | 0257 | 1DE9 | 9002 | 468B |
| 0000436120 | C4C2 | F85E | 8926 | E907 | 0210 | 468B | 99E8 | 4689 |
| 0000436140 | 89C2 | C456 | CEEB | 868D | FE58 | 4689 | 8CBC | BE56 |
| 0000436160 | FE83 | 752D | 8B13 | 36D8 | 07C6 | 8D2D | 5986 | 89FE |
| 0000436200 | BC46 | 568C | EBBE | 9006 | FE83 | 752B | FF11 | FE4E |
| 0000436220 | 46FF | FFE8 | 0876 | 76FF | E806 | 0238 | F08B | 7E83 |
| 0000436240 | 00BA | 0774 | 7E81 | 5DFE | 7E01 | C72D | FE46 | 015D |
| 0000436260 | 26EB | 468B | FFFE | FE4E | C00B | 2374 | 46FF | 8BEA |
| 0000436300 | C4C6 | BC5E | 46FF | 26BC | 0788 | 46FF | FFE8 | 0876 |
| 0000436320 | 76FF | E806 | 01FE | F08B | 84F6 | 2ECF | 7504 | 83D3 |
| 0000436340 | 2EFE | 4375 | 468B | FFFE | FE4E | C00B | 3974 | 5EC4 |
| 0000436360 | FFBC | BC46 | C626 | 2E07 | 18EB | 468B | FFFE | FE4E |
| 0000436400 | C00B | 2374 | 46FF | 8BEA | C4C6 | BC5E | 46FF | 26BC |
| 0000436420 | 0788 | 46FF | FFE8 | 0876 | 76FF | E806 | 01B6 | F08B |
| 0000436440 | 84F6 | 2ECF | 7504 | 83D3 | EA7E | 75C0 | E903 | 0081 |
| 0000436460 | C68B | 653C | 0474 | 453C | 7775 | 468B | FFFE | FE4E |
| 0000436500 | C00B | 6D74 | 5EC4 | FFBC | BC46 | C626 | 6507 | 46FF |
| 0000436520 | FFE8 | 0876 | 76FF | E806 | 017A | F08B | FE83 | 752D |
| 0000436540 | C40F | BC5E | 46FF | 26BC | 07C6 | EB2D | 9008 | 9090 |
| 0000436560 | FE83 | 752B | 8B35 | FE46 | 4EFF | 0BFE | 75C0 | FF1D |
| 0000436600 | FE46 | 26EB | 468B | FFFE | FE4E | C00B | 2374 | 46FF |
| 0000436620 | 8BEA | C4C6 | BC5E | 46FF | 26BC | 0788 | 46FF | FFE8 |
| 0000436640 | 0876 | 76FF | E806 | 012C | F08B | 84F6 | 2ECF | 7504 |
| 0000436660 | FFD3 | E84E | FF56 | 0876 | 76FF | E806 | 0144 | 7E83 |
| 0000436700 | 00EA | 0375 | D3E9 | 8000 | EE7E | 7400 | E903 | 009A |
| 0000436720 | 46FF | C4C6 | BC5E | C626 | 0007 | 868D | FE58 | 5016 |
| 0000436740 | 76FF | FFFA | F876 | 468A | 98F6 | 8E50 | F206 | 2631 |
| 0000436760 | 1EFF | 2EB8 | C483 | EB0A | 9071 | 5EC4 | 260A | 078A |
| 0000437000 | E42A | C63B | 1274 | 4EFF | 56E8 | 76FF | FF08 | 0676 |
| 0000437020 | EFE8 | E900 | 0084 | 9090 | 4EFE | 80B8 | EE7E | 7500 |
| 0000437040 | 8349 | 0E6E | EB04 | 9043 | 632D | 3D00 | 0018 | CA77 |
| 0000437060 | E0D1 | 2E93 | A7FF | 81D8 | 7C28 | 7E8A | 8006 | 8006 |
| 0000437100 | 8006 | 819A | 7DF8 | 819A | 819A | 819A | 819A | 7FFA |
| 0000437120 | 7E8A | 7E7E | 819A | 819A | 7C3E | 819A | 7E8A | 819A |
| 0000437140 | 819A | 7DFB | 819A | 819A | 7C46 | 46FE | FFB8 | 0A46 |
| 0000437160 | 20EB | 46FF | FFE8 | 0876 | 76FF | E806 | 0056 | F08B |
| 0000437200 | 5EC4 | FF0A | 0A46 | 8A26 | 2A07 | 3BE4 | 74F0 | E903 |
| 0000437220 | FF74 | FE83 | 74FF | E903 | F895 | FE83 | 75FF | 830C |
| 0000437240 | C67E | 7500 | 8006 | B87E | 7400 | 8B05 | C646 | 02EB |
| 0000437260 | C68B | 5F5E | CBC9 | 8B55 | 8BEC | 045E | 87F6 | 2ECF |
| 0000437300 | 7404 | 8B05 | EBC3 | 9008 | C38B | DF24 | 072D | C900 |
| 0000437320 | 02C2 | 9000 | 04C8 | 0000 | 5EC4 | 2604 | 4FFF | 7804 |
| 0000437340 | 2615 | 078B | 8B26 | 0257 | FF26 | 8B07 | 8ED8 | 26C2 |
| 0000437360 | 078A | E42A | 07EB | 5306 | D09A | B775 | C982 | 04C2 |
| 0000437400 | 9000 | 8B55 | 83EC | 087E | 74FF | FF0E | 0676 | 76FF |
| 0000437420 | FF04 | 0876 | 929A | D788 | C97E | 06C2 | 9000 | 8B55 |
| 0000437440 | 56EC | 5EC4 | 2608 | 07FF | 76FF | FF06 | 0476 | A3E8 |
| 0000437460 | 8BFF | F6F0 | CF84 | 082E | E875 | C95E | 08C2 | 9000 |

THU MAR 14 17:25:16 1991 CRV_IPS.DLL PAGE 157, LINE 9205

| | | | | | | | | |
|---|---|---|---|---|---|---|---|---|
| 0000437500 | 8348 | 8353 | 8369 | 839D | 83C9 | 83D1 | 83FA | 842C |
| 0000437520 | 8B55 | B8EC | 0171 | E80E | EE38 | 5756 | C033 | 4689 |
| 0000437540 | 88F8 | FB46 | 76C4 | 260A | 89AC | 0A76 | 4688 | 0AFE |
| 0000437560 | 74C0 | 8306 | F87E | 7D00 | 8B06 | F846 | B5E9 | BB04 |
| 0000437600 | 2E3C | 202C | 583C | 0577 | 24D7 | EB0F | B002 | B100 |
| 0000437620 | D203 | 02E0 | FB46 | FED7 | D2C1 | 88E8 | FB46 | 8B98 |
| 0000437640 | D1D8 | 2EE3 | A7FF | 82E0 | 568A | B9FE | 0001 | 36E8 |
| 0000437660 | EB04 | 33B1 | 89C0 | F046 | 4689 | 89F6 | EE46 | 46C7 |
| 0000437700 | 20FC | 4800 | 4689 | EBF4 | 8A9B | FE46 | 2D3C | 0675 |
| 0000437720 | 4E80 | 04FC | [illegible] | 2B3C | 0675 | 4E80 | 01FC | 84EB |
| 0000437740 | 203C | 0775 | 4E80 | 02FC | 79E9 | 3CFF | 7523 | 8007 |
| 0000437760 | FC4E | E980 | FF6E | 4E80 | 08FC | 67E9 | 8AFF | FE4E |
| 0000440000 | F980 | 752A | E80F | 035C | C00B | 1779 | D8F7 | 4E80 |
| 0000440020 | 04FC | 0FEB | E980 | 3230 | 8BED | F646 | 0ABB | F700 |
| 0000440040 | 03E3 | 89C1 | F646 | 3BE9 | C7FF | F446 | 0000 | 33E9 |
| 0000440060 | 8AFF | FE4E | F980 | 752A | E80C | 0328 | C00B | 1479 |
| 0000440100 | FFB8 | EBFF | 800F | 30E9 | ED32 | 468B | BBF4 | 000A |
| 0000440120 | E3F7 | C103 | 4689 | E9F4 | FF0A | 468A | 3CFE | 756C |
| 0000440140 | 8006 | FC4E | EB10 | 3C22 | 7546 | 8006 | FC4E | EB20 |
| 0000440160 | 3C18 | 754E | 8006 | FD4E | EB10 | 3C0E | 754C | 8006 |
| 0000440200 | FD4E | EB04 | 8004 | FD4E | E908 | FED8 | 468A | 3CFE |
| 0000440220 | 7564 | E903 | 0194 | 693C | 0375 | 8DE9 | 3C01 | 7575 |
| 0000440240 | E903 | 018A | 583C | 0375 | 89E9 | 3C01 | 7578 | E903 |
| 0000440260 | 0188 | 6F3C | 0375 | A2E9 | 3C01 | 7463 | 3C1A | 7473 |
| 0000440300 | 3C27 | 746E | 3C51 | 7470 | 3C60 | 7445 | 3C07 | 7447 |
| 0000440320 | E903 | 00BB | B5E9 | E800 | 028A | BE8D | FE8F | 0716 |
| 0000440340 | 4FAA | 01B9 | E900 | 01F1 | 90E8 | 0B02 | 75FF | 8C12 |
| 0000440360 | 0BC0 | 75C0 | 1E0C | BF07 | 2E95 | 0E8B | 2E9B | D8E9 |
| 0000440400 | 5701 | 4E8B | E3F4 | 3207 | F2C0 | 75AE | 4F01 | 2B59 |
| 0000440420 | 87F9 | E9CF | 01C3 | 62E8 | 8B02 | F846 | F6AB | FC46 |
| 0000440440 | 7410 | 3303 | ABC0 | 3BE9 | F6FE | FC46 | 7530 | E805 |
| 0000440460 | 0232 | 39EB | 36E8 | F602 | FD46 | 7518 | C630 | FF46 |
| 0000440500 | B907 | 0010 | 0716 | 3352 | 8DD2 | 97BE | BEFE | 0004 |
| 0000440520 | B0E8 | B902 | 0010 | BE8D | FE92 | 3358 | BED2 | 0004 |
| 0000440540 | A0E8 | C602 | 9386 | 3AFE | 09B9 | EB00 | C618 | FF46 |
| 0000440560 | B907 | 0010 | 0716 | D233 | BE8D | FE92 | 04BE | E800 |
| 0000440600 | 0281 | 04B9 | 8D00 | 8FBE | E9FE | 014D | 46FF | 80EE |
| 0000440620 | FC4E | 8A40 | FE46 | 200C | 8B98 | 83F0 | F47E | 7F00 |
| 0000440640 | 7413 | C707 | F446 | 0006 | 0AEB | 673D | 7500 | C705 |
| 0000440660 | F446 | 0001 | BE8D | FE8F | 76FF | FFEE | F476 | 1656 |
| 0000440700 | FF57 | 1076 | 76FF | F60E | FD46 | 7404 | FF0A | C41E |
| 0000440720 | 832E | 0E46 | EB0A | FF08 | B01E | 832E | 0E46 | 8308 |
| 0000440740 | 0EC4 | 46F6 | 80FC | 0F74 | 7E83 | 00F4 | 0975 | 5716 |
| 0000440760 | 1EFF | 2EBC | C483 | 8304 | 67FE | 1075 | 46F7 | 80FC |
| 0000441000 | 7500 | 1609 | FF57 | B41E | 832E | 04C4 | 0716 | 8026 |
| 0000441020 | 2D3D | 0575 | 8047 | FD4E | B901 | FFFF | B057 | F200 |
| 0000441040 | 4FAE | 2B59 | 87F9 | E9CF | 00AF | 4E80 | 40FC | 46C6 |
| 0000441060 | 0AFA | 35EB | 46C6 | 07FF | 04EB | 46C6 | 27FF | 46F6 |
| 0000441100 | 80FC | 1174 | 46C7 | 02F0 | C600 | F246 | B230 | 0251 |
| 0000441120 | FF56 | 5688 | C6F3 | FA46 | EB10 | F60E | FC46 | 7480 |
| 0000441140 | 8004 | FD4E | C602 | FA46 | F608 | FC46 | 7410 | E805 |
| 0000441160 | 00FB | 0EEB | EDE8 | F600 | FC46 | 7440 | 9903 | 02EB |
| 0000441200 | D233 | 46F6 | 40FC | 0F74 | D20B | 0B7D | 4E80 | 01FD |
| 0000441220 | D8F7 | D283 | F700 | 83DA | F47E | 7D00 | C707 | F446 |
| 0000441240 | 0001 | 04EB | 6680 | F7FC | D88B | DA0B | 0575 | 46C7 |
| 0000441260 | 00F0 | 8D00 | EB7E | 0716 | 4E8A | 32FA | 8BED | F476 |
| 0000441300 | 40E8 | F601 | FD46 | 7402 | E30E | 2606 | 3D80 | 7430 |
| 0000441320 | 4F06 | C626 | 3005 | EB41 | F600 | FC46 | 7440 | F631 |
| 0000441340 | FD46 | 7401 | C60B | F246 | C72D | F046 | 0001 | 20EB |

THU MAR 14 17:25:16 1991 CRV_IPS.DLL PAGE 158, LINE 9264

| | | | | | | | | |
|---|---|---|---|---|---|---|---|---|
| 0000441360 | 46F6 | 01FC | 0B74 | 46C6 | 2BF2 | 46C7 | 01F0 | EB00 |
| 0000441400 | F60F | FC46 | 7402 | C609 | F246 | C720 | F046 | 0001 |
| 0000441420 | 468B | 2BF6 | 2BC1 | F046 | 027D | C033 | 5706 | F651 |
| 0000441440 | FC46 | 750C | 8B07 | B2C8 | E820 | 00BB | 1650 | 8D07 |
| 0000441460 | F27E | 4E8B | E8F0 | 0091 | F658 | FC46 | 7408 | F60D |
| 0000441500 | FC46 | 7504 | 8B07 | B2C8 | E830 | 009B | 5F59 | 5007 |
| 0000441520 | 76E8 | 5800 | 46F6 | 04FC | 0774 | C88B | 20B2 | 86E8 |
| 0000441540 | E900 | FC00 | 76C4 | 260E | 89AD | 0E76 | C4C3 | 0E76 |
| 0000441560 | AD26 | D08B | AD26 | 8992 | 0E76 | F6C3 | FC46 | 7420 |
| 0000441600 | E808 | FFE9 | C28E | F88B | E8C3 | FFD8 | F88B | C006 |
| 0000441620 | 0375 | C08E | 1EC3 | C307 | 0698 | C457 | 065E | FF26 |
| 0000441640 | 044F | 1078 | 8B26 | 263F | 07FF | 8E26 | 0247 | 33AA |
| 0000441660 | 5FC0 | C307 | 5251 | 5306 | 0E50 | 0FE8 | 83EF | 06C4 |
| 0000441700 | 595A | FF3D | 75FF | EBE8 | E3E8 | 8B1B | 01F7 | F84E |
| 0000441720 | 3357 | 26FF | E8AC | FFC0 | F80B | F7E2 | FF0B | 745F |
| 0000441740 | C705 | F846 | FFFF | E3C3 | 0119 | F84E | 3357 | 8AFF |
| 0000441760 | E8C2 | FFA4 | F80B | F7E2 | FF0B | 745F | C705 | F846 |
| 0000442000 | FFFF | FDC3 | 9357 | F60B | 0A7F | DB0B | 0675 | D20B |
| 0000442020 | 0275 | 1AEB | 3392 | F7D2 | 93F1 | F1F7 | 8792 | 04D3 |
| 0000442040 | 3C30 | 7639 | 0203 | FF46 | 8BAA | 4EC2 | D8EB | 2B59 |
| 0000442060 | 47CF | C3FC | 5E5F | E58B | CB5D | 06C8 | 0000 | BE56 |
| 0000442100 | 2A68 | C02B | 4689 | 89FC | FA46 | 026A | 5FE8 | 830E |
| 0000442120 | 02C4 | 0CEB | 75FF | E8FE | 0E10 | C483 | 8302 | 0CC6 |
| 0000442140 | 3639 | 2E28 | 3B72 | C68B | 682D | B92A | 000C | F799 |
| 0000442160 | 89F9 | FE46 | EB50 | 0DE6 | C483 | F602 | 0A44 | 7583 |
| 0000442200 | C7D3 | 0444 | 0000 | 44C6 | 000A | C02B | 4489 | 8908 |
| 0000442220 | 0644 | 4489 | 8902 | C604 | 0B44 | 89FF | FA76 | 5E8C |
| 0000442240 | 6AFC | E802 | 0E32 | C483 | 8B02 | FA46 | 568B | 5EFC |
| 0000442260 | CBC9 | 04C8 | 0000 | 8B56 | 0676 | 468B | 2D08 | 2A68 |
| 0000442300 | 0CB9 | 9900 | F9F7 | 4689 | 50FE | 91E8 | 830D | 02C4 |
| 0000442320 | 76FF | FF0A | 0876 | 9A56 | 8892 | 829B | C483 | 8906 |
| 0000442340 | FC46 | 76FF | E8FE | 0D82 | C483 | 8B02 | FC46 | C95E |
| 0000442360 | 90CB | 8B55 | 57EC | 8B56 | 0676 | 7E8B | 8308 | FFFE |
| 0000442400 | 1274 | 45F6 | 010A | 1275 | 45F6 | 800A | 0674 | 45F6 |
| 0000442420 | 020A | 0674 | FFB8 | EBFF | 903E | 458B | 0B08 | 0645 |
| 0000442440 | 0875 | 571E | C3E8 | 83EE | 04C4 | 058B | 558B | 3902 |
| 0000442460 | 0645 | 0D75 | 5539 | 7508 | 8308 | 047D | 7500 | FFD5 |
| 0000442500 | FF05 | 0445 | C68B | 0DFF | 1DC4 | 8826 | 8007 | 0A65 |
| 0000442520 | 80EF | 0A4D | 2A01 | 5EE4 | C95F | 90CB | 8B55 | 8BEC |
| 0000442540 | 065E | 1E3B | 2843 | 1272 | 09BA | 3300 | E9C0 | E9F6 |
| 0000442560 | E853 | 0D0E | C483 | E902 | EA05 | E853 | 0CF8 | C483 |
| 0000442600 | 5302 | FF9A | 00FF | 8500 | 75C0 | C6E5 | 4587 | 0028 |
| 0000442620 | E853 | 0CEE | C483 | 8B02 | 5DE5 | 00CB | 8B55 | 83EC |
| 0000442640 | 02EC | C033 | 09EB | 8B55 | 83EC | 02EC | FFB8 | 89FF |
| 0000442660 | FE46 | 5E8B | 3B06 | 431E | 7228 | BA19 | 0009 | C033 |
| 0000442700 | A3E9 | 8BE9 | FE4E | C90B | 0774 | E853 | 0CB4 | C483 |
| 0000442720 | E902 | E9AB | C00B | 0774 | E853 | 0C9A | C483 | 8302 |
| 0000442740 | 04EC | CC8B | FF53 | 0A76 | 76FF | FF08 | 0C76 | 5116 |
| 0000442760 | FF9A | 00FF | 5900 | 855A | 75C0 | 80C8 | 45A7 | FD28 |
| 0000443000 | 468B | 0BFE | 74C0 | 5307 | 77E8 | 830C | 02C4 | 8B91 |
| 0000443020 | 5DE5 | 00CB | 8B55 | 83EC | 0EEC | 7E8A | 8B0C | 0E46 |
| 0000443040 | 4689 | EB0C | 5508 | EC8B | EC83 | B70E | FF40 | 0876 |
| 0000443060 | 76FF | 1606 | 568D | 52FE | 8D16 | F856 | 3352 | 52D2 |
| 0000443100 | 8B52 | 0C4E | 99E8 | 8B01 | 0A46 | 00A9 | 7401 | 8008 |
| 0000443120 | 10CA | 00A9 | 7504 | A92A | 0200 | 2274 | CA80 | 5002 |
| 0000443140 | 468D | FFFE | 0876 | 76FF | 1606 | 3350 | 50C0 | 9A50 |
| 0000443160 | FFFF | 0000 | C085 | 7558 | 8B08 | FE4E | 03EB | CA80 |
| 0000443200 | 5101 | 2552 | 0003 | C70A | 3350 | 50C0 | 9A50 | FFFF |
| 0000443220 | 0000 | C00B | 1674 | 6E3D | 7500 | F60E | F0C2 | 02BA |

THU MAR 14 17:25:16 1991 CRV_IPS.DLL PAGE 159, LINE 9323

| | | | | | | | | |
|---|---|---|---|---|---|---|---|---|
| 0000443240 | 7400 | BA03 | 0011 | BDE9 | E9E8 | 009D | 468B | 3BFE |
| 0000443260 | 4306 | 7228 | 500D | 239A | 0089 | BA00 | 0018 | C033 |
| 0000443300 | E4EB | E850 | 0BB0 | C483 | 8B02 | 50D0 | 8D16 | F45E |
| 0000443320 | 1653 | 468D | 50F8 | 6E9A | 006F | 0B00 | 75C0 | 8B61 |
| 0000443340 | 0A46 | C933 | 00A9 | 7580 | A90E | 4000 | 0775 | 06F6 |
| 0000443360 | 2E9F | 7580 | B102 | 8880 | F24E | 468A | 3CF4 | 7501 |
| 0000443400 | C607 | F446 | E940 | 008F | 023C | 0775 | 46C6 | 08F4 |
| 0000443420 | 84E9 | 3200 | 88C0 | F446 | C90A | F474 | 46F7 | 020A |
| 0000443440 | 7400 | 5274 | FFB9 | 51FF | B951 | 0002 | 1651 | 468D |
| 0000443460 | 50FA | 919A | 0089 | 0B00 | 74C0 | 3D15 | 0083 | 0C74 |
| 0000443500 | 76FF | E8FE | 0B3C | C483 | E902 | E833 | C033 | 47EB |
| 0000443520 | 1652 | 468D | 50F6 | 01B8 | 5000 | 8D16 | F846 | 9A50 |
| 0000443540 | FFFF | 0000 | C00B | 1B75 | 4639 | 74F8 | 802A | F67E |
| 0000443560 | 751A | 5210 | 76FF | FFFC | FA76 | FF9A | 00FF | 0B00 |
| 0000443600 | 75C0 | 52BD | C033 | 5050 | 1650 | 468D | 50FA | D39A |
| 0000443620 | 008A | 0B00 | 75C0 | 8AA9 | F44E | C1F6 | 7548 | FF28 |
| 0000443640 | 0876 | 76FF | 1606 | 468D | 50F8 | C033 | 5050 | 109A |
| 0000443660 | 008A | F700 | F846 | 0001 | 0374 | C980 | F710 | 0A46 |
| 0000443700 | 0008 | 0374 | C980 | 0A20 | F24E | C980 | 8B01 | 8BC2 |
| 0000443720 | 88D8 | 458F | 5328 | A9E8 | 830A | 02C4 | E58B | CB5D |
| 0000443740 | 3EA1 | F728 | 23D0 | 33C1 | A8C9 | 7580 | 8003 | 01C9 |
| 0000443760 | 00C3 | 8B55 | 83EC | 08EC | C033 | 5E8B | 3B06 | 431E |
| 0000444000 | 7328 | 534D | 6FE8 | 830A | 02C4 | 4E8B | E30C | F647 |
| 0000444020 | 4587 | 0228 | 4075 | 3357 | 8BD2 | 0C4E | 7EC4 | F608 |
| 0000444040 | 4587 | 0828 | 1074 | 878A | 2945 | 0A3C | 0874 | 42AA |
| 0000444060 | C649 | 4587 | 0A29 | 0653 | 5157 | 468D | 16FA | 9A50 |
| 0000444100 | 8B00 | 0000 | 0B5F | 74C0 | 530F | 35E8 | 830A | 02C4 |
| 0000444120 | 09BA | E900 | E710 | 4AEB | 468B | 03FA | F6C2 | 4587 |
| 0000444140 | 8028 | 3E74 | A780 | 2845 | 56FB | 1E57 | C507 | 0876 |
| 0000444160 | FE8B | C88B | 28E3 | 0DB4 | 3C80 | 750A | 2606 | 8F80 |
| 0000444200 | 2845 | AC04 | C43A | 2574 | 1A3C | 0875 | 8026 | 458F |
| 0000444220 | 0228 | 05EB | 0588 | E247 | 8BEA | 2BC7 | 0846 | 1F06 |
| 0000444240 | 5E5F | E853 | 09DC | C483 | 8B02 | 5DE5 | 83CB | 01F9 |
| 0000444260 | 0774 | 3C80 | 740A | EBE0 | 26DB | 87F6 | 2845 | 7440 |
| 0000444300 | 0B2B | 75DB | 5323 | 468D | 16F9 | 5150 | 468D | 16FA |
| 0000444320 | 9A50 | 8BE0 | 0000 | C085 | 0E74 | 1F06 | 5E5F | E853 |
| 0000444340 | 09A0 | C483 | E902 | E697 | 0AB0 | A8EB | 46C6 | 00F9 |
| 0000444360 | 8D53 | F946 | 5016 | 8D51 | FA46 | 5016 | 729A | 008C |
| 0000444400 | 0B00 | 75C0 | F7D5 | FA46 | FFFF | 3674 | 7E83 | 010C |
| 0000444420 | 3574 | F626 | 4587 | 0828 | 1C75 | B853 | FFFF | 5050 |
| 0000444440 | D8F7 | 8D50 | FC46 | 5016 | 2F9A | 008B | 8000 | F97E |
| 0000444460 | 750A | E90F | FF61 | 468A | 26F9 | 8788 | 2945 | 0A3C |
| 0000444500 | 0274 | 0DB0 | 4DE9 | 80FF | F97E | 750A | EBC5 | 0099 |
| 0000444520 | 8B55 | 83EC | 0EEC | C033 | 09EB | 8B55 | 83EC | 0EEC |
| 0000444540 | FFB8 | 89FF | F246 | 5E8B | 3B06 | 431E | 7228 | BA08 |
| 0000444560 | 0009 | C033 | EFE9 | 0BE5 | 74C0 | 5307 | F7E8 | 8308 |
| 0000444600 | 02C4 | 87F6 | 2845 | 7420 | 5312 | C933 | 5151 | 4141 |
| 0000444620 | 8D51 | F446 | 5016 | C99A | 008C | F600 | 4587 | 8028 |
| 0000444640 | 6674 | 5E8C | 8EFA | 0A46 | 56C5 | 3308 | 89C0 | FE46 |
| 0000444660 | 4689 | FCFC | 5657 | FA8B | F28B | 6689 | 8BF8 | 0C4E |
| 0000444700 | 28E3 | 0AB0 | AEF2 | 3B75 | EC83 | 8B02 | BADC | 0080 |
| 0000444720 | E22B | D48B | FA8B | 0716 | 4E8B | AC0C | 0A3C | 0D74 |
| 0000444740 | FB3B | 1A74 | E2AA | E8F4 | 0038 | AFE9 | B000 | 3B0D |
| 0000444760 | 75FB | E803 | 002C | B0AA | FF0A | FC46 | E2EB | 21E8 |
| 0000445000 | EB00 | 5EE1 | 8E5F | FA5E | C8E9 | 8B00 | F246 | C00B |
| 0000445020 | 0974 | 76FF | E806 | 086A | C483 | B802 | FFFC | E80E |
| 0000445040 | E370 | 5350 | 1E51 | 1F06 | CF8B | CA2B | 21E3 | 8B51 |
| 0000445060 | 065E | 1E53 | 5152 | 468D | 16F4 | 9A50 | 72AD | 0000 |
| 0000445100 | 0B59 | 75C0 | 8B11 | F45E | 5E01 | 3BFE | 72D9 | 1F07 |

THU MAR 14 17:25:16 1991 CRV_IPS.DLL PAGE 160, LINE 9382

| | | | | | | | | |
|---|---|---|---|---|---|---|---|---|
| 0000445120 | 5B59 | 8B58 | C3FA | 831F | DBC4 | 7E83 | 00FE | 3C75 |
| 0000445140 | C00B | 1874 | 6D3D | 7400 | 3D0D | 0001 | 09BA | 7500 |
| 0000445160 | BA08 | 001C | 03EB | 20BA | F900 | 26EB | 5E8E | F6FA |
| 0000445200 | 4587 | 4028 | 0E74 | 5E8E | 8B0A | 085E | 3F80 | 751A |
| 0000445220 | F803 | 0EEB | 1CBA | 3300 | F9C0 | 06EB | 468B | 2BFE |
| 0000445240 | FC46 | 668B | 5EF8 | 8E5F | FA5E | 1472 | 5E8B | 0BF2 |
| 0000445260 | 74DB | FF09 | 0676 | C9E8 | 8307 | 02C4 | E58B | CB5D |
| 0000445300 | 5E8B | 0BF2 | 74DB | FF09 | 0676 | B5E8 | 8307 | 02C4 |
| 0000445320 | 93E9 | 8BE4 | 0C4E | C90B | 0475 | C18B | CEEB | C51E |
| 0000445340 | 0856 | 1E53 | 5152 | 468D | 16F4 | 9A50 | 8DDC | 0000 |
| 0000445360 | 071E | 0B1F | 74C0 | 3D17 | 006D | 0D74 | 013D | BA00 |
| 0000445400 | 0009 | BC75 | 1CBA | EB00 | BAB7 | 0020 | B2EB | 468B |
| 0000445420 | 0BF4 | 75C0 | F697 | 4587 | 4028 | 0A74 | DA8B | 8026 |
| 0000445440 | 1A3F | 0275 | 86EB | 1CBA | 3300 | EBC0 | 0093 | F5EA |
| 0000445460 | 7A8E | EA88 | 8F14 | 8ED1 | E2EA | D68E | EA8E | 8EE2 |
| 0000445500 | 8EDB | 8B55 | 56EC | 76C4 | 8C06 | E3C1 | 2605 | 4C80 |
| 0000445520 | 01FE | 5D5E | 55CB | EC8B | 096A | 51E8 | 8307 | 02C4 |
| 0000445540 | 76FF | 0E06 | 0DE8 | 5B00 | 096A | 6BE8 | 8307 | 02C4 |
| 0000445560 | E58B | CB5D | 8B55 | 56EC | 8B57 | 064E | F983 | 77E8 |
| 0000445600 | 1E69 | A2A1 | 0B2E | 74C0 | BF48 | 8FFC | 368B | 2EAA |
| 0000445620 | 1EC5 | 2EA4 | 561E | FF57 | 5FD7 | 735E | 8C2B | C5DA |
| 0000445640 | 0C5F | D63B | EF75 | 1F58 | C41E | A436 | 262E | 748B |
| 0000445660 | C512 | A01E | 8C2E | 3BDA | 75D0 | 1FD9 | 811E | 78FF |
| 0000445700 | 7490 | BF0E | 9078 | C4EB | 815E | FCFF | 748F | EB0F |
| 0000445720 | 070A | BF06 | 2EA0 | E1E8 | 7201 | E80E | 007E | 891F |
| 0000445740 | A616 | 892E | A41E | EB2E | 1F04 | C033 | 5F99 | 5D5E |
| 0000445760 | 00CB | 5706 | F88B | FB03 | 7F89 | 4F04 | 2D4F | 0016 |
| 0000446000 | 778D | C714 | FE05 | 89FF | 0A7F | 8948 | 8C04 | 8B1F |
| 0000446020 | 8CC6 | 8EDA | 8DC2 | 067F | ABFC | 47AB | 3347 | ABC0 |
| 0000446040 | ABAB | 5FAB | C307 | 8B26 | 0245 | C00B | 0975 | 8C26 |
| 0000446060 | 025D | 8926 | EB1D | 0614 | C426 | 0875 | 8C26 | 0E5C |
| 0000446100 | 8926 | 0C5C | 478C | 8912 | 1077 | 2607 | 5D8C | 260A |
| 0000446120 | 5D89 | 2608 | 5D8C | 2606 | 5D89 | C304 | 8041 | FEE1 |
| 0000446140 | FC53 | 778B | 8B08 | 0A5F | FF33 | 23EB | C38B | A85B |
| 0000446160 | 7501 | 5342 | 778B | 8B06 | 085F | DE3B | 3674 | 334B |
| 0000446200 | EBFF | 900C | 548D | 3BFE | 73D3 | 03E1 | 72F0 | AD23 |
| 0000446220 | 01A8 | F074 | FE8B | 3B48 | 73C1 | 0323 | 72F0 | 8B13 |
| 0000446240 | ADD0 | 01A8 | DE74 | C203 | 0205 | 8B00 | 89F7 | FE44 |
| 0000446260 | E4EB | C08B | 8B5B | 0647 | 4789 | F908 | 19EB | 895B |
| 0000446300 | FE4C | 0974 | F903 | C12B | 8948 | 2B05 | 03F9 | 89F9 |
| 0000446320 | 087F | C68B | DA8C | C3F8 | 5751 | 47F6 | 0102 | 6674 |
| 0000446340 | B7E8 | 8B00 | 8BFE | A804 | 7401 | 2B03 | 49C8 | 4141 |
| 0000446360 | 778B | 0B04 | 74F6 | 034F | 73CE | 3309 | BAC0 | FFF0 |
| 0000446400 | 33E3 | 42EB | 5AB8 | 8E72 | 26C0 | AEA1 | 3D2E | 2000 |
| 0000446420 | 1674 | 00BA | 3B80 | 72D0 | D106 | 75EA | EBF8 | 8322 |
| 0000446440 | 08FA | 1D72 | E2D1 | C28B | 8B48 | 03D0 | 73C1 | 3302 |
| 0000446460 | F7C0 | 23D2 | 52C2 | 2EE8 | 5A00 | 0D73 | FA83 | 74F0 |
| 0000446500 | B805 | 0010 | E2EB | EBF9 | 8B1B | 2BD0 | 0457 | 4789 |
| 0000446520 | 8904 | 087F | 778B | 4A0A | 1489 | 0342 | C7F2 | FE04 |
| 0000446540 | 89FF | 0A77 | 575F | 8BC3 | F6D0 | 0247 | 7404 | 4A0F |
| 0000446560 | 778B | 4E04 | D63B | 0572 | 5739 | 73FE | 4218 | 1E50 |
| 0000446600 | B19A | 006E | 0B00 | 75C0 | 8B0F | F6C2 | 0247 | 7404 |
| 0000446620 | 4A04 | 5789 | F8FE | 01EB | C3F9 | 8B57 | 0877 | 773B |
| 0000446640 | 750A | 8B03 | 0677 | 3DAD | FFFE | 0874 | FE8B | FE24 |
| 0000446660 | F003 | F2EB | 4F4F | F78B | C35F | D18B | C283 | 8027 |
| 0000446700 | F0E2 | 8B50 | 52C4 | 5016 | C033 | 9A50 | FFFF | 0000 |
| 0000446720 | 0B1F | 75C0 | 3314 | 26DB | 458B | 890C | 0247 | C28B |
| 0000446740 | 0FE8 | E8FE | FE40 | EBF8 | F901 | 00C3 | 8B55 | 8BEC |
| 0000446760 | 8BD7 | 1EDE | 7EC4 | 3306 | B9C0 | FFFF | AEF2 | 758D |

THU MAR 14 17:25:16 1991 CRV_IPS.DLL PAGE 161, LINE 9441

| | | | | | | | | |
|---|---|---|---|---|---|---|---|---|
| 0000447000 | C4FF | 0A7E | FFB9 | F2FF | F7AE | 2BD1 | 8CF9 | 8EC0 |
| 0000447020 | 8ED8 | 0846 | FE87 | 468B | F706 | 01C6 | 7400 | A402 |
| 0000447040 | D149 | F3E9 | 13A5 | F3C9 | 8BA4 | 8BF3 | 1FFA | C28C |
| 0000447060 | CB5D | 8B55 | 8BEC | 8BD7 | 1EDE | 76C5 | 8B0A | 8CFE |
| 0000447100 | 8ED8 | 33C0 | B9C0 | FFFF | AEF2 | D1F7 | 7EC4 | 8B06 |
| 0000447120 | A8C7 | 7401 | A402 | D149 | F3E9 | 13A5 | F3C9 | 8BA4 |
| 0000447140 | 8BF3 | 1FFA | C28C | CB5D | 8B55 | 8BEC | 8BD7 | 1EDE |
| 0000447160 | 76C5 | C406 | 0A7E | C033 | FFB9 | F2FF | F7AE | 2BD1 |
| 0000447200 | F3F9 | 74A6 | 1B05 | 1DC0 | FFFF | 8B1F | 8BF3 | 5DFA |
| 0000447220 | 00CB | 8B55 | 8BEC | C4D7 | 067E | C033 | FFB9 | F2FF |
| 0000447240 | F7AE | 49D1 | 8B91 | 5DFA | 00CB | 8B55 | 57EC | 1E56 |
| 0000447260 | 7EC4 | C506 | 0A76 | DF8B | 4E8B | E30E | AC0C | C00A |
| 0000447300 | 0374 | E2AA | 32F8 | F3C0 | 8BAA | 8CC3 | 1FC2 | 5F5E |
| 0000447320 | E58B | CB5D | 8B55 | 57EC | 1E56 | 4E8B | E30E | 8B27 |
| 0000447340 | C4D9 | 067E | F78B | C033 | AEF2 | D9F7 | CB03 | FE8B |
| 0000447360 | 76C5 | F30A | 8AA6 | FF44 | C933 | 3A26 | FF45 | 0477 |
| 0000447400 | 0474 | 4949 | D1F7 | C18B | 5E1F | 8B5F | 5DE5 | 00CB |
| 0000447420 | 65E9 | 0000 | 61E9 | 0000 | 12C8 | 0000 | 5657 | 03EB |
| 0000447440 | 46FF | C408 | 085E | 8A26 | 9807 | D88B | 87F6 | 2ECF |
| 0000447460 | 7508 | 6AED | 6A00 | 0600 | 76FF | 9A08 | 9232 | 92F1 |
| 0000447500 | C483 | 5004 | 76FF | FF0A | 0876 | 468D | 50F0 | DD9A |
| 0000447520 | E0BE | 838E | 0CC4 | 0805 | 8B00 | 065E | FB8B | F08B |
| 0000447540 | 0716 | 8E1E | A5DA | A5A5 | 1FA5 | 5E89 | 8BEE | 8CC3 |
| 0000447560 | 5ED2 | C95F | 06CA | 9000 | 8B55 | 57EC | 1E56 | 76C5 |
| 0000447600 | 3306 | 99C0 | DB33 | 3CAC | 7420 | 3CFB | 7409 | 50F7 |
| 0000447620 | 2D3C | 0474 | 2B3C | 0175 | 3CAC | 7739 | 2C1F | 7230 |
| 0000447640 | D11B | D1E3 | 8BD2 | 8BCB | D1FA | D1E3 | D1D2 | D1E3 |
| 0000447660 | 03D2 | 13D9 | 03D7 | 83D8 | 00D2 | DCEB | 3C58 | 932D |
| 0000447700 | 0775 | D8F7 | D283 | F700 | 1FDA | 5F5E | CB5D | 8B55 |
| 0000447720 | 56EC | B357 | 8B01 | 0C4E | 468B | 3306 | 83D2 | 0AF9 |
| 0000447740 | 0175 | 1E99 | 7EC5 | E908 | 0C8D | 08C8 | 0000 | 5EC4 |
| 0000447760 | 260C | 478B | 2606 | 578B | 8908 | F846 | 5689 | C4FA |
| 0000450000 | 065E | C626 | 3007 | 478D | 8901 | FC46 | 468C | EBFE |
| 0000450020 | 9026 | 5EC4 | 26F8 | 3F80 | 7400 | 260F | 078A | 5EC4 |
| 0000450040 | 26FC | 0788 | 46FF | EBF8 | 9008 | 5EC4 | 26FC | 07C6 |
| 0000450060 | FF30 | FC46 | 4EFF | 830A | 0A7E | 7F00 | C4D5 | FC5E |
| 0000450100 | C626 | 0007 | 7E83 | 000A | 1F7C | 5EC4 | 26F8 | 3F80 |
| 0000450120 | 7C35 | EB16 | 9005 | C626 | 3007 | 4EFF | C4FC | FC5E |
| 0000450140 | 8026 | 393F | F074 | FE26 | C407 | 065E | 8026 | 313F |
| 0000450160 | 0A75 | 5EC4 | 260C | 47FF | EB02 | 900F | C38B | C28C |
| 0000450200 | 5240 | 5250 | 9A53 | 91D2 | 92DE | CBC9 | 04C8 | 0000 |
| 0000450220 | A156 | 2A4B | 168B | 2A4D | 4689 | 89FC | FE56 | 0C6A |
| 0000450240 | 0BE8 | 8302 | 02C4 | 468B | 0BFE | FC46 | 7674 | 468B |
| 0000450260 | 0B08 | 0646 | 6E74 | 76FF | FF08 | 0676 | 329A | 7C92 |
| 0000450300 | 8394 | 04C4 | F08B | 5EC4 | 26FC | 478B | 2602 | 070B |
| 0000450320 | 5274 | FF26 | 0277 | FF26 | 9A37 | 9232 | 949D | C483 |
| 0000450340 | 3B04 | 7EC6 | C439 | FC5E | C426 | 261F | 3880 | 753D |
| 0000450360 | 562D | 76FF | FF08 | 0676 | 5306 | 749A | 2892 | 8394 |
| 0000450400 | 0AC4 | C00B | 1875 | 0C6A | CDE8 | 8301 | 02C4 | 5EC4 |
| 0000450420 | 26FC | 078B | 8B26 | 0257 | C603 | EB40 | 9012 | 4683 |
| 0000450440 | 04FC | A2EB | 0C6A | AFE8 | 8301 | 02C4 | C02B | 5E99 |
| 0000450460 | CBC9 | 8B55 | 83EC | 0AEC | 086A | 71E8 | 8301 | 02C4 |
| 0000450500 | D0A1 | 0A2F | B8E4 | 00FF | 1D74 | 0684 | 2FD2 | 1775 |
| 0000450520 | 5E8D | 16F6 | 3353 | 50C0 | FF9A | 00FF | 8A00 | F846 |
| 0000450540 | 4025 | 7400 | B002 | 6AFF | E808 | 016C | C483 | 8B02 |
| 0000450560 | 5DE5 | 00CB | C033 | 03EB | FFB8 | B2FF | EB01 | B805 |
| 0000450600 | FFFF | 00B2 | 8B55 | 83EC | 16EC | 4689 | 0BEA | 74C0 |
| 0000450620 | 6AD8 | E808 | 0118 | C483 | A102 | 2FD0 | E40A | 0B75 |
| 0000450640 | 00B4 | 06C7 | 2FD0 | FFFF | 80E9 | A000 | 2FD2 | FF25 |

THU MAR 14 17:25:16 1991 CRV_IPS.DLL PAGE 162, LINE 9500

| | | | | | | | | |
|---|---|---|---|---|---|---|---|---|
| 0000450660 | 7400 | 8806 | D226 | EB2F | C766 | F646 | 000A | 5E8D |
| 0000450700 | 16F6 | 5053 | FF9A | 00FF | 0B00 | 75C0 | 8B3C | F84E |
| 0000450720 | E183 | E304 | C711 | F846 | 0008 | 5316 | 9A50 | FFFF |
| 0000450740 | 0000 | C00B | 2375 | 468D | 16EC | 3350 | 50C0 | 9A50 |
| 0000450760 | FFFF | 0000 | C00B | 1175 | 14E3 | 4E69 | 16F8 | 5053 |
| 0000451000 | 7E9A | 0095 | 0B00 | 74C0 | B805 | FFFF | 1DEB | 468B |
| 0000451020 | 3CEC | 74E0 | 0A04 | 75C0 | 8804 | D226 | B42F | 0A00 |
| 0000451040 | 74D2 | 5008 | E80E | 0448 | C483 | 8B02 | EA5E | DB0B |
| 0000451060 | 0874 | 086A | A1E8 | 8300 | 02C4 | E58B | CB5D | 8B55 |
| 0000451100 | 53EC | 8B51 | 0646 | 568B | 8B08 | 0C5E | FFB9 | D3FF |
| 0000451120 | D3EA | 2BEB | 0A46 | D31B | 5B59 | CA5D | 0008 | 8B55 |
| 0000451140 | 50EC | 468B | 0504 | 0014 | 4BEB | 8B55 | 50EC | 468B |
| 0000451160 | 0504 | 0014 | 69EB | 8B55 | 50EC | 468B | 0504 | 0114 |
| 0000451200 | 33EB | 8B55 | 50EC | 468B | 0504 | 0114 | 51EB | 8B55 |
| 0000451220 | 50EC | 468B | C104 | 02E0 | FF68 | 50FF | FF6A | FF6A |
| 0000451240 | 789A | 005E | 0B00 | 75C0 | 5829 | E58B | C35D | 8B55 |
| 0000451260 | 50EC | 468B | FF04 | D406 | C12F | 02E0 | 3968 | 5096 |
| 0000451300 | FF6A | FF6A | FF9A | 00FF | 0B00 | 75C0 | 5805 | E58B |
| 0000451320 | C35D | 11B8 | E900 | D881 | 8B55 | 50EC | 468B | C104 |
| 0000451340 | 02E0 | 5D68 | 5096 | FF9A | 00FF | 0B00 | 75C0 | FFE3 |
| 0000451360 | D40E | 582F | E58B | C35D | 8B55 | FFEC | 0676 | ADE8 |
| 0000451400 | 83FF | 02C4 | E58B | CB5D | 8B55 | FFEC | 0676 | C7E8 |
| 0000451420 | 83FF | 02C4 | E58B | CB5D | 068E | 2804 | A126 | 0006 |
| 0000451440 | 3B48 | D606 | 772F | C107 | 06E0 | FFBA | C3FF | 5357 |
| 0000451460 | 6A51 | E80F | FF78 | C483 | 3B02 | D606 | 762F | 8B40 |
| 0000451500 | 05D8 | 0004 | FC25 | 8BFF | C1C8 | D6E0 | CBBA | 5096 |
| 0000451520 | 9A52 | 9121 | 0000 | C00B | 3275 | 8B49 | 87F9 | D63E |
| 0000451540 | 2B2F | 51CF | C147 | 06E7 | E1C1 | 5705 | C28E | ABF3 |
| 0000451560 | 595F | C726 | 0445 | 0200 | C783 | E240 | 8BF5 | 6AC3 |
| 0000451600 | E80F | FF54 | C483 | 5902 | 5F5B | 9BEB | 10B8 | E900 |
| 0000451620 | D7C7 | 8B55 | 56EC | 8B57 | 0C5E | C38B | 682D | 992A |
| 0000451640 | 0CB9 | F700 | 50F1 | E850 | FEB4 | C483 | 8B02 | 0A56 |
| 0000451660 | D20B | 547E | C44A | 067E | D20B | 5674 | 4F8B | E304 |
| 0000451700 | 3B20 | 76CA | 8B02 | 1ECA | 37C5 | 0AB4 | 9051 | AAAC |
| 0000451720 | C43A | FAE0 | 1F58 | 3789 | 3374 | 4729 | 2B04 | EBD0 |
| 0000451740 | 06D7 | 5253 | 531E | E80E | DE46 | C483 | 5A04 | 075B |
| 0000451760 | FF3D | 74FF | AA08 | 0A3C | 1874 | EB4A | 3BBB | 067E |
| 0000452000 | 0674 | 47F6 | 200A | 0A74 | C033 | EB99 | 2B0E | 29C1 |
| 0000452020 | 0447 | C033 | 8BAA | 0646 | 568B | 5B08 | E853 | FE4A |
| 0000452040 | C483 | 5F02 | 5D5E | 00CB | 04C8 | 0000 | 5657 | 126A |
| 0000452060 | 7BE8 | 83FE | 02C4 | 06C6 | 563A | 8B42 | 0646 | 568B |
| 0000452100 | A308 | 5636 | 1689 | 5638 | 30BE | 8956 | 8904 | 0254 |
| 0000452120 | 06C7 | 5634 | 7FFF | 468D | 160E | FF50 | 0C76 | 76FF |
| 0000452140 | 1E0A | 9A56 | 82F0 | 9829 | C483 | 8B0C | FFF8 | 340E |
| 0000452160 | 7856 | C40F | 301E | FF56 | 3006 | 2656 | 07C6 | EB00 |
| 0000452200 | 900D | 561E | 006A | 6C9A | 5F76 | 8394 | 06C4 | 126A |
| 0000452220 | 45E8 | 83FE | 02C4 | C78B | 5F5E | CBC9 | 8B55 | 6AEC |
| 0000452240 | E809 | FE0A | C483 | FF02 | 0A76 | 76FF | FF08 | 0676 |
| 0000452260 | E80E | 000F | C483 | 6A06 | E809 | FE1C | C483 | 8B02 |
| 0000452300 | 5DE5 | 55CB | EC8B | 5756 | 8B1E | 0656 | F28B | 468B |
| 0000452320 | 8B08 | 0A4E | D00B | 5374 | 59E3 | DF8C | A0BB | 512E |
| 0000452340 | 67E8 | 5901 | 5B72 | 74FF | 51FE | 67E8 | 5900 | 0B72 |
| 0000452360 | C68B | DA8C | 6480 | FEFE | EB59 | 1E49 | 8E53 | 51DF |
| 0000452400 | E80E | F670 | 5B59 | 591F | E180 | 57FE | F88B | C20B |
| 0000452420 | 7458 | 8E2B | FCC2 | 5706 | 561E | E9D1 | A5F3 | D88E |
| 0000452440 | E80E | F61E | C483 | 5804 | EB5A | 5119 | E80E | F644 |
| 0000452460 | EB59 | 5011 | 0E56 | 09E8 | 83F6 | 04C4 | 03EB | 13E8 |
| 0000452500 | 3300 | 99C0 | 5F1F | 5D5E | 00CB | 3CEA | 0698 | EA98 |
| 0000452520 | 9863 | 98ED | 8B55 | 83EC | 02EC | 5756 | C7FC | FE46 |

THU MAR 14 17:25:16 1991 CRV_IPS.DLL PAGE 163, LINE 9559

| | | | | | | | | |
|---|---|---|---|---|---|---|---|---|
| 0000452540 | 0000 | 7441 | 8005 | FEE1 | 01EB | 4E49 | 8B4E | ADFE |
| 0000452560 | 2450 | 89FE | 8B05 | 3BD0 | 73D1 | 0368 | 72F0 | AD5A |
| 0000452600 | 01A8 | 0874 | D003 | 8942 | 4815 | EBEB | FE3D | 75FF |
| 0000452620 | F641 | 0247 | 7401 | 8D3B | 0445 | C103 | 0773 | 46C7 |
| 0000452640 | 01FE | 2B00 | FFC8 | 3B05 | 087F | 0373 | 7F89 | 5208 |
| 0000452660 | E856 | F724 | 5A5E | 1173 | 46C7 | 01FE | 8300 | 10F9 |
| 0000452700 | 1072 | E9D1 | D183 | EB00 | FFE6 | 8D0D | 0275 | C28B |
| 0000452720 | A5EB | 01B8 | 4E00 | EB4E | 5A23 | EBF9 | 4639 | 0346 |
| 0000452740 | EBF1 | 8B19 | FE46 | F78B | F374 | C00B | 0E75 | 0D89 |
| 0000452760 | 4646 | F103 | E372 | D12B | 894A | 4A14 | 9159 | 0125 |
| 0000453000 | 8300 | FE25 | 0509 | 578B | 3B08 | 73FA | 3B07 | 76F2 |
| 0000453020 | 8903 | 087F | D9F7 | 5E5F | E58B | C35D | 8B55 | 57EC |
| 0000453040 | 468B | F706 | 0866 | 0573 | C033 | EB99 | 501A | CE9A |
| 0000453060 | F28E | 5998 | D88B | DA0B | 0D74 | 8B50 | 8EF8 | 33C2 |
| 0000453100 | 41C0 | E9D1 | ABF3 | 5F58 | CB5D | 473B | 7506 | C505 |
| 0000453120 | 045F | 19EB | 531E | 1FC5 | 08EB | 1F5B | EBF9 | C50F |
| 0000453140 | 0C5F | D98C | F4E3 | C13B | F575 | C483 | F804 | 00C3 |
| 0000453160 | 8B55 | 33EC | EBDB | 550E | EC8B | 086A | 2FE8 | 83FC |
| 0000453200 | 02C4 | FFBB | 8DFF | 0646 | 5016 | 01B8 | 5000 | 5048 |
| 0000453220 | FF9A | 00FF | 0B00 | B8C0 | FFFF | 0575 | 468A | B406 |
| 0000453240 | 0B00 | 74DB | 6A08 | E808 | FC2E | C483 | 5D02 | 00CB |
| 0000453260 | 1EC8 | 0000 | 2E9A | 689B | 6A9A | 6A00 | FF3C | 1A36 |
| 0000453300 | FF30 | 1836 | 9A30 | A0F6 | 9AB7 | 5EC4 | 2606 | 4789 |
| 0000453320 | A106 | 301C | 8926 | 0847 | 468D | 16E2 | 9A50 | FFFF |
| 0000453340 | 0000 | 468A | 2AE5 | 8BE4 | C1C8 | 02E0 | C103 | E0D1 |
| 0000453360 | 5EC4 | 2606 | 4789 | 8A04 | E446 | E42A | 8A50 | E346 |
| 0000453400 | 8A50 | E246 | 8A50 | E646 | 8A50 | E746 | 8B50 | E846 |
| 0000453420 | BC2D | 5007 | F69A | 0E9C | 839B | 0CC4 | 5EC4 | 2606 |
| 0000453440 | 0789 | 8926 | 0257 | 468B | 2DE8 | 076C | 4689 | 8AF8 |
| 0000453460 | E246 | E42A | 4689 | 8AF2 | E75E | FF2A | 894B | F65E |
| 0000453500 | E3D1 | 468A | 89E6 | F446 | 8703 | 2FF2 | 4689 | F6FC |
| 0000453520 | E846 | 7503 | 800A | E77E | 7602 | 4004 | 4689 | 83FC |
| 0000453540 | 1C3E | 0030 | 1C74 | 468D | 16EE | 9A50 | 9C28 | 99D1 |
| 0000453560 | C483 | 0B04 | 74C0 | C40B | 065E | C726 | 0847 | 0001 |
| 0000453600 | 09EB | 5EC4 | 2606 | 47C7 | 0008 | C900 | 90CB | 0B6A |
| 0000453620 | 1BE8 | 83FB | 02C4 | 3E83 | 563C | 7500 | E807 | 0022 |
| 0000453640 | 06FF | 563C | 0B6A | 2FE8 | 83FB | 02C4 | 90CB | 0B6A |
| 0000453660 | FBE8 | 83FA | 02C4 | 09E8 | 6A00 | E80B | FB1A | C483 |
| 0000453700 | CB02 | 04C8 | 0000 | 1E56 | 0C68 | 9A30 | 942C | 9B9B |
| 0000453720 | C483 | 8904 | FC46 | 5689 | 0BFE | 75D0 | E903 | 00A4 |
| 0000453740 | 5EC4 | 26FC | 3F80 | 7500 | E903 | 0098 | 036A | 5006 |
| 0000453760 | 36FF | 3020 | 36FF | 301E | 4A9A | B292 | 839B | 0AC4 |
| 0000454000 | 006A | 1068 | 830E | FC46 | FF03 | FE76 | 76FF | 9AFC |
| 0000454020 | 92B4 | 9BBC | C483 | 5204 | 9A50 | A190 | 9C07 | 18A3 |
| 0000454040 | 8930 | 1A16 | 2B30 | 8EF6 | FE46 | 5E8B | 26FC | 3880 |
| 0000454060 | 7400 | 261A | 008A | C88B | 8B98 | F6D8 | CF87 | 042E |
| 0000454100 | 0575 | F980 | 752D | 4606 | FE83 | 7C03 | 8BDD | FC5E |
| 0000454120 | 8026 | 0038 | 1874 | 036A | DE03 | 5306 | 36FF | 3024 |
| 0000454140 | 36FF | 3022 | 4A9A | 5792 | 839A | 0AC4 | 08EB | 1EC4 |
| 0000454160 | 3022 | C626 | 0007 | 1EC4 | 3022 | 8026 | 013F | C01B |
| 0000454200 | A340 | 301C | C95E | 90C3 | 04C8 | 0000 | C456 | 065E |
| 0000454220 | 8326 | 087F | 7D03 | E903 | 00B6 | 8326 | 087F | 7E09 |
| 0000454240 | E903 | 00AC | 8326 | 087F | 7E03 | 260A | 7F83 | 0908 |
| 0000454260 | 037D | 81E9 | 2600 | 778B | 810A | 6CC6 | 8107 | C2FE |
| 0000454300 | 7E07 | 2617 | 7F83 | 0308 | 1075 | 8B26 | 085F | E3D1 |
| 0000454320 | 878B | 2FF2 | 0705 | EB00 | 900B | 8B26 | 085F | E3D1 |
| 0000454340 | 878B | 2FF4 | 4689 | F7FC | 03C6 | 7500 | FF03 | FC46 |
| 0000454360 | 5E8B | 2606 | 778B | 830A | 46EE | 448D | 9901 | C233 |
| 0000454400 | C22B | F8C1 | 3302 | 2BC2 | 69C2 | 6DCE | 0301 | 03C1 |

THU MAR 14 17:25:16 1991 CRV_IPS.DLL PAGE 164, LINE 9618

| | | | | | | | | |
|---|---|---|---|---|---|---|---|---|
| 0000454420 | FC46 | 0405 | B900 | 0007 | F799 | 2BF9 | FC56 | DAF7 |
| 0000454440 | 8326 | 087F | 7503 | 2615 | 573B | 7C0E | 7509 | 2621 |
| 0000454460 | 7F83 | 0204 | 1A7C | 01B8 | EB00 | 9017 | 5EC4 | 8B06 |
| 0000454500 | 26C2 | 4739 | 7C0E | 75EF | 2607 | 7F83 | 0104 | E67C |
| 0000454520 | C02B | C95E | 90CB | 16C8 | 0000 | 5657 | 768B | 6A06 |
| 0000454540 | 6801 | 5180 | 448D | 9903 | C233 | C22B | F8C1 | 3302 |
| 0000454560 | 2BC2 | 99C2 | 5052 | 909A | 48A1 | 899D | EA46 | 5689 |
| 0000454600 | 8BEC | 085E | E3D1 | BF8B | 2FF0 | C68B | 04B9 | 9900 |
| 0000454620 | F9F7 | D20B | 0775 | 7E83 | 0208 | 017E | 8B47 | 0A46 |
| 0000454640 | C703 | 4689 | 9AFC | 9B2E | 9D6B | 006A | 3C6A | 006A |
| 0000454660 | 3C6A | 006A | 186A | C669 | 016D | 4603 | 030A | 99C7 |
| 0000454700 | 4405 | 830E | 00D2 | 5052 | 909A | 7EA1 | 8B9D | 8BC8 |
| 0000454720 | 0C46 | DA8B | 0399 | 13C1 | 52D3 | 9A50 | A190 | 9D91 |
| 0000454740 | C88B | 468B | 8B0E | 99DA | C103 | D313 | 5052 | 909A |
| 0000454760 | CFA1 | 8B9D | 8BC8 | 1046 | DA8B | 0399 | 13C1 | D3D3 |
| 0000455000 | 1806 | 1330 | 1A16 | 0130 | EA46 | 5611 | 8DEC | 5044 |
| 0000455020 | 4689 | 8BF8 | 0846 | 8948 | F646 | 468B | 890C | F246 |
| 0000455040 | 3E83 | 301C | 7400 | 8D1A | EE46 | 5016 | 289A | 6E9C |
| 0000455060 | 839B | 04C4 | C00B | 0974 | 6E81 | 10EA | 830E | EC5E |
| 0000455100 | 8B00 | EA46 | 568B | 5EEC | C95F | 90CB | 0EC8 | 0000 |
| 0000455120 | 068E | 31F4 | C726 | 6206 | 0030 | 8D00 | F646 | 5016 |
| 0000455140 | 509A | 209A | 839E | 04C4 | 006A | E868 | 8B03 | F646 |
| 0000455160 | 568B | 2BF8 | 6406 | 1B30 | 6616 | 5230 | 9A50 | A190 |
| 0000455200 | 9E41 | C88B | 468B | 2BFA | 6806 | 8B30 | 99DA | C103 |
| 0000455220 | D313 | 4689 | 89F2 | F456 | CBC9 | 681E | 3064 | 509A |
| 0000455240 | 199A | 839D | 04C4 | 90CB | 8B55 | 57EC | 7EC4 | 3306 |
| 0000455260 | B9C0 | FFFF | AEF2 | F741 | 4FD9 | 468A | FD0A | AEF2 |
| 0000455300 | 2647 | 0538 | 0674 | C033 | D08B | 04EB | C78B | C28C |
| 0000455320 | 5FFC | E58B | CB5D | 8B55 | 8CEC | C5D9 | 065E | D38B |
| 0000455340 | 0BEB | 612C | 1A3C | 0473 | 4104 | 0788 | 8A43 | 0A07 |
| 0000455360 | 75C0 | 92EF | DA8C | D98E | CB5D | 8B55 | 8BEC | 0E4E |
| 0000455400 | 571E | 0B56 | 75C9 | E903 | 00AF | 76C5 | C40A | 067E |
| 0000455420 | 561E | 5706 | DE9A | 0395 | 8B9E | 0E4E | D20B | 5778 |
| 0000455440 | C12B | DA83 | 7300 | 4950 | F103 | 0773 | D88C | FF05 |
| 0000455460 | 8EFF | 03D8 | 73F9 | 8C07 | 05C0 | 9ECF | C08E | 8B41 |
| 0000455500 | 48C1 | C72B | DB1B | C323 | C703 | C62B | DB1B | C323 |
| 0000455520 | C603 | 9140 | C12B | F3FD | FCA4 | E391 | 835C | FFFE |
| 0000455540 | 0775 | D88C | DA2D | 8E9E | 83D8 | FFFF | D175 | C08C |
| 0000455560 | 052D | 8E9F | EBC0 | 8BC8 | 48C1 | D78B | D2F7 | C22B |
| 0000455600 | DB1B | C323 | C203 | D68B | D2F7 | C22B | DB1B | C323 |
| 0000455620 | C203 | 9140 | C12B | E9D1 | A5F3 | C913 | A4F3 | E391 |
| 0000455640 | 0B18 | 75F6 | 8C07 | 05D8 | 9F11 | D88E | FF0B | C775 |
| 0000455660 | C08C | 4805 | 8E9F | EBC0 | 8BBE | 0646 | 568B | 5E08 |
| 0000455700 | 1F5F | CB5D | 8B55 | 8BEC | 0E4E | 571E | E356 | C548 |
| 0000455720 | 0A76 | 7EC4 | 8B06 | 48C1 | D78B | D2F7 | C22B | DB1B |
| 0000455740 | C323 | C203 | D68B | D2F7 | C22B | DB1B | C323 | C203 |
| 0000455760 | 9140 | C12B | E9D1 | A5F3 | C913 | A4F3 | E391 | 0B18 |
| 0000456000 | 75F6 | 8C07 | 05D8 | 9F53 | D88E | FF0B | C775 | C08C |
| 0000456020 | A605 | 8E9F | EBC0 | 8BBE | 0646 | 568B | 5E08 | 1F5F |
| 0000456040 | CB5D | 8B55 | 8BEC | 0C4E | 38E3 | C457 | 067E | D78B |
| 0000456060 | DAF7 | 0C74 | D12B | DB1B | D323 | D103 | D187 | D12B |
| 0000456100 | 468B | 8A0A | D1E0 | F3E9 | 13AB | F3C9 | 87AA | E3D1 |
| 0000456120 | 8C10 | 81C3 | B1C3 | 8E9F | D1C3 | F3E9 | 13AB | F3C9 |
| 0000456140 | 5FAA | 468B | 8B06 | 0856 | CB5D | 4E8B | 8B0E | 0646 |
| 0000456160 | 568B | 1E08 | 7EC5 | 570A | 071E | 93FC | C00A | 1374 |
| 0000456200 | F983 | 750A | 0B0E | 79D2 | B00A | AA2D | DBF7 | D283 |
| 0000456220 | F700 | 8BDA | 92F7 | D233 | C00B | 0274 | F1F7 | F793 |
| 0000456240 | 92F1 | D387 | 3004 | 393C | 0276 | 2704 | 8BAA | 0BC2 |
| 0000456260 | 75C3 | 88E2 | 4F05 | 86AC | 8805 | FF44 | 448D | 3B01 |

THU MAR 14 17:25:16 1991 CRV_IPS.DLL PAGE 165, LINE 9677

| | | | | | | | | |
|---|---|---|---|---|---|---|---|---|
| 0000456300 | 72C7 | 8CF2 | 58DA | 5F1F | 8B5E | 5DE5 | 00CB | 8B55 |
| 0000456320 | 8BEC | 0646 | 3399 | 2BC2 | C9C2 | 90CB | 078A | E42A |
| 0000456340 | 578D | 5301 | DC8B | 02B9 | 5100 | 521E | 1650 | 9A53 |
| 0000456360 | 8E8C | 0000 | CB5B | 8B55 | FFEC | 0876 | 76FF | 3306 |
| 0000456400 | 50C0 | 9A50 | FFFF | 0000 | C085 | 0374 | 70E9 | 8BD2 |
| 0000456420 | 5DE5 | 00CB | 8B55 | 1EEC | C553 | 065E | 76FF | FF0C |
| 0000456440 | 0A76 | 77FF | FF02 | 0E37 | C5E8 | 8900 | 8907 | 0257 |
| 0000456460 | 1F5B | CA5D | 0008 | 8B55 | 1EEC | C553 | 065E | 078B |
| 0000456500 | 578B | 8B02 | 0A4E | E80E | 00D8 | 0789 | 5789 | 5B02 |
| 0000456520 | 5D1F | 06CA | 0000 | 8B55 | 57EC | 5356 | FF33 | 468B |
| 0000456540 | 0B08 | 7DC0 | 4711 | 568B | F706 | F7D8 | 1DDA | 0000 |
| 0000456560 | 4689 | 8908 | 0656 | 468B | 0B0C | 7DC0 | 4711 | 568B |
| 0000456600 | F70A | F7D8 | 1DDA | 0000 | 4689 | 890C | 0A56 | C00B |
| 0000456620 | 1575 | 4E8B | 8B0A | 0846 | D233 | F1F7 | D88B | 468B |
| 0000456640 | F706 | 8BF1 | EBD3 | 8B38 | 8BD8 | 0A4E | 568B | 8B08 |
| 0000456660 | 0646 | EBD1 | D9D1 | EAD1 | D8D1 | DB0B | F475 | F1F7 |
| 0000456700 | F08B | 66F7 | 910C | 468B | F70A | 03E6 | 72D1 | 3B0C |
| 0000456720 | 0856 | 0777 | 0672 | 463B | 7606 | 4E01 | D233 | 4F96 |
| 0000456740 | 0775 | DAF7 | D8F7 | DA83 | 5B00 | 5F5E | CA5D | 0008 |
| 0000456760 | 8B55 | 8BEC | 0846 | 4E8B | 0B0C | 8BC8 | 0A4E | 0975 |
| 0000457000 | 468B | F706 | 5DE1 | 08CA | 5300 | E1F7 | D88B | 468B |
| 0000457020 | F706 | 0C66 | D803 | 468B | F706 | 03E1 | 5BD3 | CA5D |
| 0000457040 | 0008 | ED32 | 06E3 | E0D1 | D2D1 | FAE2 | 00CB | 831E |
| 0000457060 | 03FB | 1677 | 0D74 | 2FE8 | 8E14 | C7D8 | 8606 | 1601 |
| 0000457100 | EB00 | A307 | 306E | 1689 | 3070 | 1FF8 | A1CB | 0186 |
| 0000457120 | 162D | B300 | F60C | CBF3 | F38B | 08BF | 8C00 | 8CC0 |
| 0000457140 | 8ED9 | 8EC1 | FCD8 | A5A5 | D98E | 08BE | C300 | F38B |
| 0000457160 | 08BF | 8C00 | 8CC0 | 8ED9 | 8EC1 | FCD8 | A5A5 | A5A5 |
| 0000457200 | D98E | 08BE | C300 | 758B | 89FC | FC7D | 45C6 | 07FE |
| 0000457220 | 03EB | 758B | FCFC | C033 | 0C8B | 548B | F702 | 80C2 |
| 0000457240 | 747F | 8925 | D105 | D1FA | D1D9 | D1D8 | D1FA | D1D9 |
| 0000457260 | D1D8 | D1FA | D1D9 | 89D8 | 0245 | 4D89 | 8004 | 8FE6 |
| 0000457300 | C281 | 3800 | 5589 | C306 | 0589 | 4589 | 8902 | 0445 |
| 0000457320 | 4589 | C306 | 3E8B | 0186 | 8BFC | 8B0C | 0254 | C033 |
| 0000457340 | C2F7 | 7F80 | 2974 | FAD1 | D9D1 | D8D1 | FAD1 | D9D1 |
| 0000457360 | D8D1 | FAD1 | D9D1 | D8D1 | E680 | 818F | 00C2 | C738 |
| 0000457400 | 0005 | 8900 | 0245 | 4D89 | 8904 | 0655 | F78B | 8BC3 |
| 0000457420 | 8AC8 | EBD0 | 8BEA | 863E | FC01 | 8BAD | ADC8 | C80A |
| 0000457440 | D48A | 8AAD | 8AF0 | ADDC | F88A | E2D1 | D3D1 | E2D1 |
| 0000457460 | D3D1 | E2D1 | D3D1 | CD0A | 0374 | CA80 | B101 | 0A80 |
| 0000457500 | 8AF9 | 22EC | 25E9 | 7FF0 | E03D | 7747 | 2D3D | 3800 |
| 0000457520 | 3B72 | E0D1 | E0D1 | E0D1 | D13A | 0777 | 1572 | C6F6 |
| 0000457540 | 7401 | 8010 | 01C6 | D383 | 7300 | 0508 | 0080 | 803D |
| 0000457560 | 747F | 0B17 | 74C0 | 8016 | 7FE7 | C70A | E50A | 4589 |
| 0000457600 | 8A02 | 8AE3 | 89C6 | 8B05 | C3F7 | 07E9 | 331B | 89C0 |
| 0000457620 | 8905 | 0245 | F78B | 33C3 | 8BD2 | 8BDA | 8BD0 | EBC3 |
| 0000457640 | 8B1D | 33D0 | 0BDB | 79D2 | F715 | EBDA | 8B11 | 8BDA |
| 0000457660 | 8BD0 | 0BC3 | 79C0 | F707 | F7DB | 83DA | 00DB | C48A |
| 0000457700 | 8024 | 9EB4 | 75E9 | 3304 | 8BD2 | 8BDA | 8BC8 | EBC3 |
| 0000457720 | 8B1D | 33C8 | 0BDB | 79C9 | F715 | EBD9 | 8B11 | 8BDA |
| 0000457740 | 8BC8 | 0BC3 | 79C0 | F707 | F7DB | 83D9 | 00DB | C48A |
| 0000457760 | 8024 | FF33 | D233 | 60BD | E985 | 07B6 | 3AE8 | EB00 |
| 0000460000 | E80D | 002B | 08EB | 35E8 | EB00 | E803 | 0026 | C0D1 |
| 0000460020 | D283 | 7500 | D167 | C3C8 | 9CE8 | EB00 | E80D | 003E |
| 0000460040 | 08EB | 5DE8 | EB00 | E803 | 0039 | D20B | 4E75 | E8C3 |
| 0000460060 | 002C | 0DEB | 2CE8 | EB00 | E808 | 007B | 03EB | 41E8 |
| 0000460100 | 3300 | 0BC9 | 79FF | F70D | F7D1 | F7D2 | F5D8 | D283 |
| 0000460120 | 8300 | 00D1 | C2D1 | D183 | 7500 | D121 | C3CA | 56E8 |
| 0000460140 | EB00 | E803 | 001C | DB33 | 01B5 | E822 | CD0A | F980 |

THU MAR 14 17:25:16 1991 CRV_IPS.DLL PAGE 166, LINE 9736

| | | | | | | | | |
|---|---|---|---|---|---|---|---|---|
| 0000460160 | F581 | DB13 | C313 | D283 | 7200 | C301 | 15E9 | E91A |
| 0000460200 | 00A4 | 92AD | D60A | 93AD | 91AD | 91AD | EE83 | 8B08 |
| 0000460220 | B6F9 | 220F | 80F1 | 10CE | E580 | D17F | D1E9 | D1E9 |
| 0000460240 | D1E9 | 0BE9 | 74C9 | 81D8 | FEE9 | 7203 | 8378 | 20F9 |
| 0000460260 | CA7F | E983 | EB25 | 332F | 8AD2 | ACDA | F88A | 8AAD |
| 0000460300 | ACC8 | C186 | EE83 | 8A04 | 8BE9 | 83F9 | 7FE1 | E4D0 |
| 0000460320 | D1D0 | D0F9 | 0BDC | 74C9 | 804D | 7EE9 | 4772 | F983 |
| 0000460340 | 7F20 | 8399 | 20E9 | D9F7 | F980 | 7C08 | 801A | 01FA |
| 0000460360 | D0F5 | 80D2 | 01E2 | D30A | DF8A | F88A | C48A | E68A |
| 0000460400 | F632 | E980 | EB08 | E3E1 | 8015 | 01FA | 01B2 | DA80 |
| 0000460420 | D000 | D1EE | D1D8 | D0DB | 80DA | 00D2 | F3E2 | CA8A |
| 0000460440 | D08B | C38B | F9C3 | 00B1 | D180 | 3300 | 8BC0 | C3D0 |
| 0000460460 | 61E9 | E819 | 0068 | 07B0 | 31E8 | 8B01 | 8636 | 0301 |
| 0000460500 | 067C | EF83 | 8B10 | 80D7 | 7FE6 | FA81 | 7FF0 | ED73 |
| 0000460520 | 7C89 | 8B06 | C3FE | 3BE9 | E819 | 0087 | 03B0 | 0BE8 |
| 0000460540 | 8B01 | 8636 | 0301 | 027C | EF81 | 0080 | D78B | E680 |
| 0000460560 | 817F | 80FA | 737F | 89DF | 027C | FE8B | E8C3 | 001E |
| 0000460600 | 368B | 0186 | EF83 | 0110 | 067C | FE8B | E8C3 | 0053 |
| 0000460620 | 368B | 0186 | EF81 | 0080 | 7C01 | 8B02 | C3FE | 8BFC |
| 0000460640 | 863E | 8C01 | 8CC0 | 8ED9 | A5C1 | A5A5 | 8EA5 | 8BC0 |
| 0000460660 | 8636 | BA01 | 0010 | 4C8B | 8B06 | 83F9 | 0FE1 | CA0A |
| 0000460700 | 4C89 | 8306 | F0E7 | CF8B | E580 | B87F | 0035 | E9D1 |
| 0000460720 | E9D1 | E9D1 | E9D1 | E981 | 0433 | 047D | D9F7 | 3FEB |
| 0000460740 | 82E9 | FC00 | 3E8B | 0186 | C08C | D98C | C18E | A5A5 |
| 0000460760 | C08E | 368B | 0186 | 80BA | 8B00 | 024C | F98B | E183 |
| 0000461000 | 0A7F | 89CA | 024C | E783 | 8B80 | 80CF | 7FE5 | 18B8 |
| 0000461020 | D100 | 8AE1 | 32CD | 81ED | 96E9 | 7D00 | F748 | 3BD9 |
| 0000461040 | 8BC8 | 7CEF | 8114 | 00E7 | 0B80 | 3BFA | 74C8 | 8B0A |
| 0000461060 | 8BC8 | 81EF | 0JE5 | 2B80 | 33EA | 80D2 | 08F9 | 147C |
| 0000461100 | FA80 | F501 | 00B2 | D280 | 0A00 | C614 | 0004 | E980 |
| 0000461120 | 4608 | E7EB | 348A | 0CE3 | 88BB | 8A01 | D7C1 | EE8A |
| 0000461140 | E822 | 2C88 | 33C3 | 8BC9 | 8AD1 | C334 | 01BB | 8A00 |
| 0000461160 | 8AEF | E3E1 | D106 | D0EA | E2D7 | 0AFA | 22D7 | 0ADE |
| 0000461200 | 80D3 | 81FA | 01B2 | DA80 | 7400 | 8B02 | 8AFD | D3CC |
| 0000461220 | 8BE2 | 860E | 9801 | C803 | CE2B | F202 | 3488 | 06E3 |
| 0000461240 | 8046 | 0014 | FAE2 | 00C3 | C3F7 | 7F80 | 4C74 | D3D1 |
| 0000461260 | C3F5 | EDE9 | 8017 | 7FCC | E4D0 | 8BC3 | 0244 | 8B26 |
| 0000461300 | 025D | 80A9 | 747F | F7E1 | A9D0 | 7F80 | D0F7 | E274 |
| 0000461320 | D3F7 | C3F7 | 7F80 | D3F7 | D874 | EC8A | EF32 | D578 |
| 0000461340 | E3D1 | E0D1 | 0B73 | 8793 | 8CF7 | 8CC2 | 8ED9 | 8EC1 |
| 0000461360 | 3BDA | 75C3 | 8B05 | 2604 | 053B | F7C3 | F0C3 | 747F |
| 0000461400 | D15E | F5D3 | E9C3 | 179A | CC80 | D07F | C3E4 | 448B |
| 0000461420 | 2606 | 5D8B | A906 | 7FF0 | E174 | D0F7 | F0A9 | F77F |
| 0000461440 | 74D0 | F7E2 | F7D3 | F0C3 | F77F | 74D3 | 8AD8 | 32EC |
| 0000461460 | 78EF | D1D5 | D1E3 | 73E0 | 930B | F787 | C28C | D98C |
| 0000461500 | C18E | DA8E | C33B | 1775 | 448B | 2604 | 453B | 7504 |
| 0000461520 | 8B0E | 0244 | 3B26 | 0245 | 0575 | 048B | 3B26 | C305 |
| 0000461540 | F787 | 458B | 8002 | 80F4 | 03EB | 458B | 8B02 | 015D |
| 0000461560 | 358A | 00B2 | CF80 | 8B80 | 024C | 7C8B | 8BFF | 0174 |
| 0000461600 | E781 | FF00 | CE81 | 8000 | C1D1 | C0D1 | ED0A | 6574 |
| 0000461620 | E40A | 5B74 | EC3A | 0573 | F387 | FA87 | 2A91 | F6E5 |
| 0000461640 | 80DC | 18FC | 4977 | C9D0 | E8D0 | D9D0 | 8A91 | B5CD |
| 0000461660 | E300 | 8055 | 0EF9 | 127C | D20B | 0374 | CB80 | 8B01 |
| 0000461700 | 33D3 | 80DB | 10E9 | 1D72 | 3E74 | F980 | 7E05 | 0A2B |
| 0000461720 | 74D2 | 8003 | 01CE | D68A | F38A | DF8A | FD8A | E980 |
| 0000461740 | 7708 | 7417 | D123 | D1E2 | FED3 | 75C1 | EBF8 | 8B19 |
| 0000461760 | 8BDE | 8BD7 | D0C1 | E9E8 | 0097 | C2F6 | 743F | 8003 |
| 0000462000 | 20CA | EBD1 | DAD1 | FAE2 | C2F6 | 743F | 8003 | 20CA |
| 0000462020 | E0D0 | 1470 | D703 | DE13 | 5073 | DBD1 | DAD1 | C4FE |

THU MAR 14 17:25:16 1991 CRV_IPS.DLL PAGE 167, LINE 9795

| | | | | | | | | |
|---|---|---|---|---|---|---|---|---|
| 0000462040 | FC80 | 75FF | E945 | 166C | FA2B | F31B | D78B | DE8B |
| 0000462060 | 0A73 | D3F7 | DAF7 | 83F5 | 00D3 | D0F6 | DB0B | 0B75 |
| 0000462100 | EC80 | 7610 | 876A | 0BDA | 74DB | 0A64 | 75FF | 800F |
| 0000462120 | 08EC | 5B76 | FB8A | DE8A | F28A | D232 | FF0A | 0A78 |
| 0000462140 | CCFE | 4B74 | E2D1 | D3D1 | F671 | 3E80 | 0190 | 7400 |
| 0000462160 | E903 | 017C | FA80 | 7780 | 7207 | F614 | 01C6 | 0F74 |
| 0000462200 | C680 | 8301 | 00D3 | 0773 | C4FE | FC80 | 74FF | D03A |
| 0000462220 | D1E0 | A9D8 | 7F80 | 1774 | 8024 | E780 | 0A7F | 8BC7 |
| 0000462240 | 863E | 8901 | 0245 | E38A | C68A | 0589 | F78B | 80C3 |
| 0000462260 | 903E | 0001 | 0374 | 7EE9 | 3301 | 8BC0 | 863E | 8901 |
| 0000462300 | 0245 | 0589 | F78B | 79C3 | E9E6 | 15C8 | ADFC | 348B |
| 0000462320 | D196 | D0E0 | 0AD8 | 74E4 | 8BD6 | 024D | E1D1 | D9D0 |
| 0000462340 | ED0A | CB74 | 3D8B | D88B | C132 | EC80 | 8080 | 7FED |
| 0000462360 | E502 | D370 | C480 | 8080 | FFFC | CD74 | 3250 | 8AFF |
| 0000462400 | 80EF | 80CB | C980 | 8B80 | 8BEB | F7C6 | 8BE7 | 0BDA |
| 0000462420 | 9FC0 | 8B50 | F7C5 | 03E7 | 83D8 | 00D2 | FA8B | C18B |
| 0000462440 | E6F7 | D803 | FA13 | 9E58 | 0374 | CB80 | 8B01 | F6C5 |
| 0000462460 | 03E1 | 8BC7 | 93D3 | 0A58 | 78FF | D10B | D1E2 | 0AD3 |
| 0000462500 | 75E4 | E90A | FF69 | C4FE | FC80 | 74FF | E9AD | FF1A |
| 0000462520 | F787 | 4D8B | D102 | D0E1 | 8BD9 | 0244 | E0D1 | D8D0 |
| 0000462540 | ED0A | 5C74 | E40A | DB74 | C132 | EC80 | 8081 | 7FED |
| 0000462560 | E52A | 0371 | 7BE9 | 80FF | 80C4 | FC80 | 75FF | E903 |
| 0000462600 | FF78 | 5D8B | 8A01 | 322D | 80C9 | 80CF | 3E80 | 0190 |
| 0000462620 | 7400 | D108 | D1EB | 02D9 | 903E | 5001 | 548B | 8A01 |
| 0000462640 | 3224 | 80C0 | 80CE | EAD1 | D8D1 | 1AE8 | 8B00 | E8EE |
| 0000462660 | 0011 | C20B | D68B | 0374 | CA80 | 8B01 | E9DD | FF76 |
| 0000462700 | D8E9 | 3B14 | 73D3 | F71D | 96F3 | C033 | 15E3 | FA8B |
| 0000462720 | C68B | E1F7 | D8F7 | FA1B | D78B | 0773 | 034E | 13C1 |
| 0000462740 | 73D3 | C3F9 | FFBE | 2BFF | 03C1 | 8BD0 | 73C1 | C3ED |
| 0000462760 | 06C6 | 0190 | 8A00 | 922E | 0A01 | 74ED | 8007 | 0EED |
| 0000463000 | EC3A | 3C77 | E40A | 3874 | 36FF | 0186 | 06C7 | 0186 |
| 0000463020 | 0193 | 5350 | 3352 | 32D2 | E8DB | FE4E | 5B5A | C758 |
| 0000463040 | 8606 | 9701 | 5001 | 5253 | FF32 | 0FE8 | 5AFE | 585B |
| 0000463060 | 068F | 0186 | 33E9 | 33FE | 33C0 | 33DB | A2D2 | 0190 |
| 0000463100 | 36FF | 0186 | 06C7 | 0186 | 0197 | 5350 | E852 | FE1A |
| 0000463120 | C033 | 93A3 | A301 | 0195 | D3EB | F787 | 6D8B | 8106 |
| 0000463140 | 00F5 | EB80 | 8B1D | 8BF7 | 863E | A501 | A5A5 | 80AD |
| 0000463160 | 7FE4 | E680 | 0A80 | ABE6 | 368B | 0186 | FE8B | 8BC3 |
| 0000463200 | 066D | 8BFC | 0644 | E5D1 | DED0 | E0D1 | DAD0 | E025 |
| 0000463220 | 74FF | 83D2 | E0E5 | E83B | 0977 | F787 | 8695 | 0BD6 |
| 0000463240 | 74C0 | 2BC2 | F7C5 | 3DD8 | 06A0 | B977 | E6D0 | DDD1 |
| 0000463260 | E2D0 | DDD1 | D157 | D1C0 | D1C0 | 86C0 | 8BE0 | ACF8 |
| 0000463300 | E08A | C032 | AD92 | AD91 | AD93 | E480 | 800F | 10CC |
| 0000463320 | FF0B | 6374 | FF83 | 7C0E | 0B18 | 74D2 | 8003 | 01C9 |
| 0000463340 | D18B | CB8B | D88B | C033 | EF83 | 7710 | 74E7 | 7248 |
| 0000463360 | 8323 | 06FF | 2B7C | D20A | 0374 | CE80 | 8A01 | 8AD6 |
| 0000463400 | 8AF1 | 8ACD | 8AEB | 8ADF | 8AF8 | 32C4 | 83E4 | 08EF |
| 0000463420 | 0F77 | 2374 | E2D1 | D1D1 | D3D1 | D0D1 | 7547 | EBF5 |
| 0000463440 | 8716 | F6CF | 3FC2 | 0374 | CA80 | D120 | D1E8 | D1DB |
| 0000463460 | D1DF | E2DA | 87F6 | 5ECF | F697 | 3FC2 | 0374 | CA80 |
| 0000463500 | D120 | 70E5 | D13B | D0E5 | 02D8 | 1334 | 014C | 5C13 |
| 0000463520 | 5003 | 509F | 748B | 8105 | FFE6 | 810F | 00CE | 5810 |
| 0000463540 | 589E | FE13 | C7F7 | 2000 | 1374 | DFD1 | DBD1 | D9D1 |
| 0000463560 | DAD1 | C583 | 8320 | E0FD | 0375 | 17E9 | E913 | 0087 |
| 0000463600 | E5D1 | D8D0 | D0F6 | 342A | 4C1B | 1B01 | 035C | 748B |
| 0000463620 | 9F05 | E681 | 0FFF | CE81 | 1000 | 1B9E | 73FE | 3313 |
| 0000463640 | F6F6 | F7D0 | F7D7 | F7D3 | F7D1 | F5DA | CE13 | DE13 |
| 0000463660 | FE13 | BEFC | 0004 | FF0B | 1875 | C7F6 | 75E0 | 8113 |
| 0000463700 | 00ED | 7602 | 4E40 | 3D74 | FB8B | D98B | CA8B | D233 |

THU MAR 14 17:25:16 1991 CRV_IPS.DLL PAGE 168, LINE 9854

| | | | | | | | | |
|---|---|---|---|---|---|---|---|---|
| 0000463720 | E4EB | C7F7 | 1FE0 | 1875 | ED81 | 0100 | 2776 | 8A97 |
| 0000463740 | 8AE0 | 8AC7 | 8AFB | 8ADD | 8AE9 | 8ACE | B2F2 | 9700 |
| 0000463760 | C7F7 | 1000 | 1175 | ED83 | 7420 | D170 | D1E2 | D1D1 |
| 0000464000 | D1D3 | EBD7 | EBEB | FC64 | 3E80 | 01A8 | 7400 | E903 |
| 0000464020 | 0385 | FA80 | 7780 | 7207 | F61F | 01C6 | 1A74 | C680 |
| 0000464040 | 8301 | 00D1 | D383 | 8300 | 00D7 | C7F7 | 2000 | 0874 |
| 0000464060 | C583 | 8320 | E0FD | 3074 | F78B | 3E8B | 0186 | DE87 |
| 0000464100 | 8024 | E780 | D10F | 74ED | 8622 | 32E0 | 0BC0 | 0AC5 |
| 0000464120 | 89C7 | 0645 | 5D88 | 8A05 | AAC6 | C18B | 8BAB | ABC6 |
| 0000464140 | EF83 | 8B05 | C3F7 | 0379 | 29E9 | FC12 | 3E80 | 01A8 |
| 0000464160 | 7400 | E903 | 0377 | C033 | 3E8B | 0186 | F78B | ABAB |
| 0000464200 | ABAB | FE8B | FCC3 | 448B | 8B06 | 25D0 | 7FF0 | DB74 |
| 0000464220 | 4D8B | 3306 | 81D1 | F0E1 | 747F | D1D0 | D1E0 | 2DE1 |
| 0000464240 | 8000 | E981 | 7FE0 | C103 | BC70 | 0005 | 3D80 | FFE0 |
| 0000464260 | B674 | E6D0 | D8D1 | E850 | 0181 | 0374 | CA80 | 5D01 |
| 0000464300 | E5D1 | D8D0 | C7F7 | 1000 | 0E75 | E2D1 | D1D1 | D3D1 |
| 0000464320 | D7D1 | ED0B | 0A75 | 93EB | C583 | 8320 | E0FD | 8874 |
| 0000464340 | 24E9 | E9FF | 11B5 | F787 | 8BFC | 064D | D18B | E181 |
| 0000464360 | 7FF0 | EF74 | 448B | 3306 | 25D0 | 7FFD | 9B74 | E0D1 |
| 0000464400 | E1D1 | 202D | 8180 | E0E9 | 2B7F | 70C1 | 059B | 8000 |
| 0000464420 | E03D | 74FF | D09B | D1E6 | 50D8 | 8AAC | 32E8 | ADC9 |
| 0000464440 | AD93 | AD92 | E480 | 800F | 10CC | 5092 | F78B | C683 |
| 0000464460 | BF05 | 01A6 | ADFD | E480 | 800F | 10CC | A5AB | 46A5 |
| 0000464500 | A447 | C6FC | 0005 | 3E80 | 01A8 | 7400 | FD1F | A6BF |
| 0000464520 | 8B01 | ADF7 | E88B | E8D1 | 2602 | 01A8 | D1AB | ADED |
| 0000464540 | D8D1 | ADAB | D8D1 | ADAB | D8D1 | FCAB | D158 | D1EA |
| 0000464560 | D1D8 | D1DB | E8D9 | 003F | E857 | 003B | E857 | 0037 |
| 0000464600 | E857 | 0033 | C30B | C10B | C20B | D78B | 5B59 | 745F |
| 0000464620 | 8003 | 01CA | C2F6 | 7407 | 8003 | 08CA | EFD1 | DBD1 |
| 0000464640 | D9D1 | DAD1 | EFD1 | DBD1 | D9D1 | DAD1 | EFD1 | DBD1 |
| 0000464660 | D9D1 | DAD1 | 08E9 | 8BFF | A636 | 3301 | 3BFF | 73D6 |
| 0000464700 | 0B5C | 75D2 | 3B04 | 77F0 | F73B | 52F6 | 3397 | 8BED |
| 0000464720 | A1F5 | 01A0 | C00B | 0474 | E7F7 | F28B | A150 | 01A2 |
| 0000464740 | C00B | 0674 | E7F7 | F003 | EA13 | A4A1 | 0B01 | 74C0 |
| 0000464760 | F708 | 03E7 | 83E8 | 00D2 | 5A92 | DAF7 | CE1B | DD1B |
| 0000465000 | 1B5D | 95E8 | 9192 | 7393 | 4F13 | 0E03 | 01A0 | 1E13 |
| 0000465020 | 01A2 | 0613 | 01A4 | 1613 | 01A6 | ED73 | 4FC3 | 0E2B |
| 0000465040 | 01A0 | 1E1B | 01A2 | 061B | 01A4 | 0E03 | 01A2 | 1E13 |
| 0000465060 | 01A4 | C213 | 168B | 01A0 | EBF5 | 8AC9 | D644 | E432 |
| 0000465100 | 0F24 | 100C | 9CA3 | 8A01 | 0645 | 0F24 | 100C | 9EA3 |
| 0000465120 | 3301 | 8BDB | 8BEB | E30C | 911A | 0D8B | D8E3 | E1F7 |
| 0000465140 | E88B | CA8B | 048B | 558B | 0B02 | 74D2 | F706 | 03E2 |
| 0000465160 | 13C8 | 55DA | ED33 | 448B | 0B02 | 74C0 | 8B0E | 0B15 |
| 0000465200 | 74D2 | F708 | 03E2 | 13C8 | D1DA | 58D5 | C10B | 8B50 |
| 0000465220 | 0244 | C00B | 0D74 | 558B | 0B02 | 74D2 | F706 | 03E2 |
| 0000465240 | 13D8 | 33EA | 8BC9 | 0B04 | 74C0 | 8B0F | 0455 | D20B |
| 0000465260 | 0874 | E2F7 | D803 | EA13 | D1D1 | 448B | 0B04 | 74C0 |
| 0000465300 | 8B0F | 0B15 | 74D2 | F709 | 03E2 | 13D8 | 83EA | 00D1 |
| 0000465320 | 0B58 | 50C3 | 048B | C00B | 0874 | 26F7 | 019E | E803 |
| 0000465340 | CA13 | 058B | C00B | 0874 | 26F7 | 019C | E803 | CA13 |
| 0000465360 | DB33 | 448B | 0B02 | 74C0 | 8B0F | 0455 | D20B | 0874 |
| 0000465400 | E2F7 | E803 | CA13 | D3D1 | 448B | 0B04 | 74C0 | 8B10 |
| 0000465420 | 0255 | D20B | 0974 | E2F7 | E803 | CA13 | D383 | 5500 |
| 0000465440 | ED33 | 458B | 0B02 | 74C0 | F708 | 9C26 | 0301 | 13C8 |
| 0000465460 | 8BDA | 0244 | C00B | 0874 | 26F7 | 019E | C803 | DA13 |
| 0000465500 | 448B | 0B04 | 74C0 | 8B1A | 0455 | D20B | 0B74 | E2F7 |
| 0000465520 | C803 | DA13 | D5D1 | 448B | F704 | 9E26 | 0301 | 13D8 |
| 0000465540 | 8BEA | 0445 | C00B | 0874 | 26F7 | 019C | D803 | EA13 |
| 0000465560 | 9CA0 | F601 | 9E26 | 0301 | 97C5 | D15A | D1E2 | D1D1 |

THU MAR 14 17:25:16 1991 CRV_IPS.DLL PAGE 169, LINE 9913

| | | | | | | | | |
|---|---|---|---|---|---|---|---|---|
| 0000465600 | D1D3 | D1D7 | D1E2 | D1D1 | D1D3 | D1D7 | D1E2 | D1D1 |
| 0000465620 | D1D3 | 5ED7 | F60B | C6C3 | A806 | 0001 | 368B | 01A9 |
| 0000465640 | F60B | 0874 | EE81 | 04C0 | F53B | 5077 | ED0B | 4C74 |
| 0000465660 | 36FF | 0186 | 06C7 | 0186 | 01AB | 5150 | 5352 | 5755 |
| 0000465700 | DB33 | C933 | D233 | 3EE8 | 5FFC | 5B5D | 595A | C758 |
| 0000465720 | 8606 | B301 | 5001 | 5251 | 5553 | 3357 | E8FF | FBD2 |
| 0000465740 | 5D5F | 5A5B | 5859 | 068F | 0186 | 1AE9 | 33FC | 33C0 |
| 0000465760 | 33C9 | 33D2 | 33DB | 33ED | A2FF | 01A8 | 36FF | 0186 |
| 0000466000 | 06C7 | 0186 | 01B3 | 5150 | 5352 | 5755 | F8E8 | BFFB |
| 0000466020 | 01AB | C033 | ABAB | ABAB | C6EB | 5653 | 648A | 2E09 |
| 0000466040 | 478A | 2509 | 8080 | C43A | 1675 | C683 | 830A | 0AC3 |
| 0000466060 | 05B9 | 8300 | 02EE | EB83 | 8B02 | 2E04 | 073B | F3E1 |
| 0000466100 | 5B5E | 56C3 | 95AD | 92AD | 93AD | 33AD | B9FF | 0005 |
| 0000466120 | E8D1 | DBD1 | DAD1 | DDD1 | DFD1 | F4E2 | E3D1 | D0D1 |
| 0000466140 | 013D | F500 | DBD1 | FE2D | 5E03 | 3C89 | 6C89 | 8902 |
| 0000466160 | 0454 | 5C89 | 8906 | 0844 | 66C3 | FFFC | FFFF | FFFF |
| 0000466200 | 00FF | CD00 | CCCC | CCCC | CCCC | FDCC | BEFF | 01C8 |
| 0000466220 | 04C6 | C601 | 0144 | 3330 | 8BC0 | 40D0 | 075B | C31F |
| 0000466240 | E81E | 05C4 | C08E | FC50 | BCBF | 5701 | 04B9 | F300 |
| 0000466260 | 5EA5 | D88E | 4C8B | 8006 | 0764 | B37F | F720 | F0C1 |
| 0000466300 | 747F | 0B06 | 79C9 | B302 | 532D | 76E8 | 33FF | BEFF |
| 0000466320 | 01C3 | A8AC | 7480 | 8AB6 | ADF8 | FE05 | 8B3F | BAC8 |
| 0000466340 | 4D10 | E2F7 | B091 | F64D | 03E4 | 13C8 | B0D7 | F69A |
| 0000466360 | 03E7 | 13C8 | 81FA | F4E9 | 8112 | 43DF | 5713 | DFF7 |
| 0000466400 | BCBE | E801 | 053D | 19BB | E8B0 | FF0E | 725F | 4709 |
| 0000466420 | BB57 | B023 | C6E8 | 5F03 | AD57 | AD97 | AD95 | AD92 |
| 0000466440 | AD93 | F791 | 8BD9 | 33F7 | E3C0 | D10C | D1EB | D1DA |
| 0000466460 | D1DD | D0DE | E2DC | 80F4 | 56C4 | D681 | 039A | E913 |
| 0000466500 | D113 | D913 | C9BF | B901 | 0010 | C032 | 5351 | 5552 |
| 0000466520 | 5056 | E4D0 | D6D1 | D5D1 | D2D1 | D3D1 | D0D0 | E4D0 |
| 0000466540 | D6D1 | D5D1 | D2D1 | D3D1 | D0D0 | 0259 | 59E5 | F113 |
| 0000466560 | 1359 | 59E9 | D113 | 1359 | 14D9 | D000 | D1E4 | D1D6 |
| 0000466600 | D1D5 | D1D2 | D0D3 | 04D0 | AA30 | E259 | 4FBD | B049 |
| 0000466620 | FD30 | AEF3 | 83FC | 12C1 | C8BE | 8801 | B80C | 0001 |
| 0000466640 | 5B5A | 1F07 | 58C3 | C980 | 8030 | 40C9 | D78B | FF33 |
| 0000466660 | EF8B | 9FE8 | 3301 | E9DB | 00C6 | 1E89 | 01E8 | DB33 |
| 0000466700 | 26E8 | 7202 | 8BE1 | E8F8 | 021F | E072 | 8B50 | F7C7 |
| 0000466720 | E826 | 8B01 | 8BF8 | 8BEA | F7C3 | E82E | 0B01 | 75D2 |
| 0000466740 | 03C4 | 8BC5 | 72D8 | 58BE | F803 | D383 | 7300 | EBD8 |
| 0000466760 | 50B5 | 5153 | E852 | 0470 | D88E | C08E | 595A | 585B |
| 0000467000 | 89FC | DE3E | 0301 | 89CE | E00E | A301 | 01EA | 1689 |
| 0000467020 | 01EC | C033 | E4A3 | A301 | 01E2 | E6A3 | 9101 | 585A |
| 0000467040 | A258 | 01DA | A258 | 01DB | E852 | 01AD | 0375 | CD80 |
| 0000467060 | 0B80 | 75DB | E885 | 00E7 | DB33 | FDE8 | 7401 | 4E41 |
| 0000467100 | 443C | 1C74 | 453C | 1274 | 3E80 | 01DB | 7400 | 3C31 |
| 0000467120 | 742B | 3C06 | 742D | 7502 | 4E27 | C981 | 0402 | 03EB |
| 0000467140 | C980 | C70E | EA06 | 0001 | 4600 | 6CE8 | 9F01 | E850 |
| 0000467160 | 008B | C5F6 | 7502 | 8003 | 40C9 | 9E58 | 0275 | DBF7 |
| 0000467200 | 3E8B | 01EA | FF0B | 0675 | C1F7 | 1872 | 0374 | C980 |
| 0000467220 | 0330 | 03FB | E63E | F601 | 10C5 | 0475 | 3E2B | 01EC |
| 0000467240 | FF81 | 0190 | 507F | 5156 | F2BE | E801 | 0395 | 3E8B |
| 0000467260 | 01DE | 06C6 | 01FC | E800 | 01AD | 5E59 | 3875 | EEA1 |
| 0000467300 | 8B01 | F01E | F601 | 80C5 | 1374 | D3F7 | D8F7 | 83F5 |
| 0000467320 | 00D3 | 45F7 | F006 | 747F | 8004 | 074D | 8380 | E43E |
| 0000467340 | 0701 | 0376 | C980 | 8A08 | FC2E | 8301 | E43E | 0001 |
| 0000467360 | 0375 | CD80 | C302 | C980 | C301 | FFBB | C63F | E806 |
| 0000467400 | 0A01 | E4E8 | 7200 | 8117 | CCFB | 770C | 80ED | 02CD |
| 0000467420 | E3D1 | C303 | E3D1 | E3D1 | D803 | DE78 | DFEB | 33C3 |
| 0000467440 | 8BFF | 8BEF | 8BDF | E8D7 | 00D6 | 2872 | E850 | 008A |

THU MAR 14 17:25:16 1991 CRV_IPS.DLL PAGE 170, LINE 9972

| | | | | | | | | |
|---|---|---|---|---|---|---|---|---|
| 0000467460 | 0358 | 83D0 | 00D3 | D583 | 8300 | 00D7 | FF81 | 1999 |
| 0000467500 | E572 | BBE8 | 7200 | 0A0D | 74C0 | 8003 | 01CA | 06FF |
| 0000467520 | 01E6 | EEEB | C78B | C50B | 060B | 01E6 | 1675 | C7F6 |
| 0000467540 | 7480 | F617 | 80C5 | 0F74 | FB81 | 8000 | 0975 | D20B |
| 0000467560 | 0575 | 06EB | C980 | 8010 | 20C9 | 1689 | 01EE | 1E89 |
| 0000467600 | 01F0 | C78B | C50B | C30B | C20B | 1C74 | FF81 | 1999 |
| 0000467620 | 0973 | 25E8 | FF00 | E60E | EB01 | B8F1 | 0040 | FF0B |
| 0000467640 | 0678 | E848 | 002A | F6EB | 8B56 | BFF7 | 01F2 | AB92 |
| 0000467660 | AB93 | AB95 | AB96 | AB92 | C35E | 5557 | 8B53 | E8C2 |
| 0000467700 | 000E | 0BE8 | 0300 | 58D0 | D813 | 1358 | 58E8 | F813 |
| 0000467720 | E2D1 | D3D1 | D5D1 | D7D1 | E8C3 | 005E | 0874 | 2D3C |
| 0000467740 | 0674 | 2B3C | 0175 | 4E46 | E8C3 | 004E | 4A74 | 302C |
| 0000467760 | 4572 | 093C | 027E | 072C | 063A | 01E8 | 397D | 1DEB |
| 0000470000 | 37E8 | 7400 | 3C33 | 742E | 2C20 | 7230 | 3C2A | 7709 |
| 0000470020 | F626 | 10C5 | 0E74 | 0EFF | 01E6 | CD80 | FF08 | E406 |
| 0000470040 | 3201 | C3E4 | CD80 | EB20 | F6F4 | 10C5 | 0975 | 06FF |
| 0000470060 | 01E2 | CD80 | EB10 | 4EC9 | C3F9 | 363B | 01E0 | 2473 |
| 0000470100 | AC36 | 3E80 | 01DA | 7400 | 3C10 | 7420 | 3CED | 7409 |
| 0000470120 | 3CE9 | 740A | 3CE5 | 740D | 3CE1 | 7261 | 3C06 | 777A |
| 0000470140 | 2402 | C35F | C032 | 57C3 | 92AD | 91AD | 95AD | 8BAD |
| 0000470160 | 0BF8 | 0BC5 | 0BC1 | 74C2 | AD49 | FE05 | 7803 | D13E |
| 0000470200 | D1E7 | D1E8 | BBDF | 0005 | E2D1 | D1D1 | D5D1 | D7D1 |
| 0000470220 | D0D1 | D7D0 | CBFE | F075 | 2243 | 0AD9 | 33D3 | 81F6 |
| 0000470240 | 01FA | F580 | CE13 | EE13 | FE13 | C613 | D780 | A900 |
| 0000470260 | FFF0 | 0E74 | F03D | F57F | D780 | EB00 | 800F | FC0E |
| 0000470300 | 0101 | C033 | D88B | C88B | E88B | F88B | F78B | 895F |
| 0000470320 | 890D | 026D | 7589 | 8904 | 0645 | FF0A | BDC3 | 01FE |
| 0000470340 | 08B9 | 8B00 | 33FD | F3C0 | 2EAB | 478B | 0108 | 0844 |
| 0000470360 | 07BF | B800 | 0004 | C72B | E022 | C42A | C42A | D8F6 |
| 0000470400 | 0404 | 8B98 | 53C8 | 2B56 | 2BD9 | 83DF | 08C3 | F103 |
| 0000470420 | F72B | C683 | 8B06 | 2E04 | 27F7 | 013E | 0046 | 113E |
| 0000470440 | 0256 | 833E | 0456 | 8300 | 02EE | C383 | E202 | 5EE6 |
| 0000470460 | 835B | 02C5 | 754F | 83BC | 0EED | F587 | 91AD | 0BAD |
| 0000470500 | ADC8 | C80B | CD0A | 92AD | D10A | 97AD | 91AD | 93AD |
| 0000470520 | 8BAD | 0BF5 | 78C0 | FF0D | 084C | E2D1 | D7D1 | D1D1 |
| 0000470540 | D3D1 | D0D1 | 01BD | 2300 | 0BEF | 33D5 | 81ED | 01FA |
| 0000470560 | F580 | FD13 | CD13 | DD13 | C513 | D5D1 | 6C01 | D108 |
| 0000470600 | DBCD | 89C5 | 893C | 024C | 5C89 | 8904 | 0644 | D0C3 |
| 0000470620 | 0000 | 0000 | 0000 | 04A0 | 0000 | 0000 | 0000 | 0000 |
| 0000470640 | 07C8 | 0000 | 0000 | 0000 | 4000 | 0E9C | 0000 | 0000 |
| 0000470660 | 0000 | BC20 | 1BBE | 0000 | 0000 | BF04 | 1BC9 | 368E |
| 0000470700 | 9E00 | 70B5 | A82B | C5AD | 6B9D | D500 | CFA6 | 49FF |
| 0000470720 | 781F | D5C2 | E000 | E98C | C980 | BA47 | AA93 | 8E01 |
| 0000470740 | F9DE | FB9D | 7EEB | 53AA | CD03 | CCCC | CCCC | CCCC |
| 0000470760 | FDCC | 0AFF | A3D7 | 3D70 | D70A | FAA3 | 2CFF | 1965 |
| 0000471000 | 58E2 | B717 | F3D1 | FDFF | 61CE | 1184 | CC77 | E6AB |
| 0000471020 | 5BFF | 4DE1 | BEC4 | 9594 | CBE6 | BAFF | 3994 | AD45 |
| 0000471040 | B11E | 96CF | A5FF | 39E9 | 27A5 | 7FEA | 2CA8 | A1FF |
| 0000471060 | BCE4 | 7C64 | D046 | 57DD | 3AFE | 7A19 | 2563 | 3143 |
| 0000471100 | AEC0 | BBFC | B52F | FF0B | 0579 | 89BB | F7B5 | 83DF |
| 0000471120 | 0AEB | C383 | 0B0A | 74FF | D10D | 73EF | 53F5 | E857 |
| 0000471140 | FE7B | 5B5F | ECEB | 00C3 | 02C8 | 0000 | 061E | A5B8 |
| 0000471160 | 8E90 | E8D8 | E0A2 | C28E | D88B | 8B26 | 0647 | C00B |
| 0000471200 | 3275 | 3A68 | 1602 | 468D | 50FE | 006A | 6C9A | 0091 |
| 0000471220 | 0B00 | 75C0 | 8B23 | FE46 | 8926 | 0647 | 561E | 8E57 |
| 0000471240 | 33C0 | B8FF | FFFF | D88E | F633 | 3AB9 | F302 | 8CA4 |
| 0000471260 | 5FC0 | 1F5E | 1F07 | C3C9 | 46C7 | 00FE | EB00 | 00F5 |
| 0000471300 | 5756 | D88C | C08E | 72BE | BF30 | 2EB0 | 0AB9 | F300 |
| 0000471320 | 5FA5 | CB5E | D08C | C08E | 04EB | D88C | C08E | 531E |

THU MAR 14 17:25:16 1991 CRV_IPS.DLL PAGE 171, LINE 10031

| | | | | | | | | |
|---|---|---|---|---|---|---|---|---|
| 0000471340 | 85E8 | 5BFF | D88E | 5756 | F38B | 1E8B | 0186 | C383 |
| 0000471360 | 8B0C | 8CFB | 8CC0 | 8ED9 | 8EC1 | FCD8 | A5A5 | D98E |
| 0000471400 | F38B | FB81 | 0172 | 4374 | 1E89 | 0186 | 7789 | C6FC |
| 0000471420 | FE47 | 5F03 | 1F5E | 8CCB | 8ED0 | EBC0 | 8C04 | 8ED8 |
| 0000471440 | 1EC0 | E853 | FF42 | 8E5B | 56D8 | 8B57 | 8BF3 | 861E |
| 0000471460 | 8301 | 0CC3 | FB8B | C08C | D98C | C18E | D88E | A5FC |
| 0000471500 | A5A5 | 8EA5 | 8BD9 | 81F3 | 72FB | 7401 | 890F | 861E |
| 0000471520 | C601 | FE47 | 8907 | FC77 | 5E5F | CB1F | 4AE9 | 1E07 |
| 0000471540 | E853 | FF04 | 8E5B | 56D8 | 8C57 | EBD0 | 1E0E | 1E07 |
| 0000471560 | E853 | FEF4 | 8E5B | 56D8 | 8C57 | 8CC0 | 8ED9 | 8EC1 |
| 0000471600 | FCD8 | F38B | 1E8B | 0186 | C383 | 8B0C | ADFB | 4588 |
| 0000471620 | A5FE | 3CA5 | 7403 | A502 | 81A5 | 72FB | 7401 | 89BD |
| 0000471640 | 861E | 8901 | FC5F | D98E | 5E5F | CB1F | D08C | C08E |
| 0000471660 | 8B26 | 2607 | 578B | EB02 | 8C14 | 8ED0 | 26C0 | 078B |
| 0000471700 | EB99 | 8B0A | 8B07 | 0257 | 03EB | 078B | 1E99 | 5250 |
| 0000471720 | E853 | FE94 | 8E5B | 5AD8 | 5658 | 8B57 | 8BDA | 8AD0 |
| 0000471740 | 24C7 | 7980 | F707 | F7DB | 83DA | 00DB | 3E8B | 0186 |
| 0000471760 | C783 | 810C | 72FF | 7401 | 891D | 863E | 8901 | FC7D |
| 0000472000 | D98C | C18E | FF80 | 7500 | C610 | FE45 | B403 | E89E |
| 0000472020 | F02A | 5E5F | CB1F | 43E9 | C6FF | FE45 | 5507 | 60BD |
| 0000472040 | 8B87 | 33CB | 8BDB | E8FB | F388 | 5F5D | 1F5E | 1ECB |
| 0000472060 | E853 | FE34 | 8E5B | 56D8 | 8C57 | 8ED8 | 8BC0 | 863E |
| 0000472100 | 8B01 | FC75 | 458A | 83FE | 0CC7 | FF81 | 0172 | A774 |
| 0000472120 | 3E89 | 0186 | 7D89 | 88FC | FE45 | A5FC | 3CA5 | 7403 |
| 0000472140 | A502 | 5FA5 | 1F5E | 1ECB | E853 | FDFC | 8E5B | 56D8 |
| 0000472160 | 8B57 | 863E | 8301 | 0CC7 | FF81 | 0172 | 9874 | 3E89 |
| 0000472200 | 0186 | 7D89 | C6FC | FE45 | 8C03 | 8ED8 | 33C0 | FCC0 |
| 0000472220 | ABAB | 5E5F | CB1F | D08C | 02EB | D88C | C08E | 531E |
| 0000472240 | C5E8 | 5BFD | D88E | 5756 | FB8B | 8BFC | 861E | 8301 |
| 0000472260 | 8606 | 0C01 | 19EB | D08C | 02EB | D88C | C08E | 531E |
| 0000472300 | A5E8 | 5BFD | D88E | 5756 | FB8B | 8BFC | 861E | 8001 |
| 0000472320 | FE7F | 7503 | 8B0E | FC77 | A5A5 | 2E83 | 0186 | 5F0C |
| 0000472340 | 1F5E | 55CB | 2689 | 022E | 778B | 57FC | 26E8 | 5FEA |
| 0000472360 | DE8B | EB5D | 8CE3 | EBD0 | 8C02 | 8ED8 | 1EC0 | E853 |
| 0000472400 | FD66 | 8E5B | 56D8 | 8B57 | FCFB | 1E8B | 0186 | 0683 |
| 0000472420 | 0186 | EB0C | 8C19 | EBD0 | 8C02 | 8ED8 | 1EC0 | E853 |
| 0000472440 | FD46 | 8E5B | 56D8 | 8B57 | FCFB | 1E8B | 0186 | 7F80 |
| 0000472460 | 07FE | 1075 | 778B | A5FC | A5A5 | 83A5 | 862E | 0C01 |
| 0000472500 | 5E5F | CB1F | DF87 | 3DE8 | 8BE9 | 87F7 | EBDF | 8CE8 |
| 0000472520 | EBD0 | 8C02 | 8ED8 | 1EC0 | E853 | FD0C | 8E5B | 56D8 |
| 0000472540 | 8B57 | 8BFB | 861E | 8301 | 8606 | 0C01 | 18EB | D08C |
| 0000472560 | 02EB | D88C | C08E | 531E | EDE8 | 5BFC | D88E | 5756 |
| 0000472600 | FB8B | 1E8B | 0186 | F38B | 478A | 83FE | 862E | 0C01 |
| 0000472620 | ABFC | A5A5 | 033C | 0274 | A5A5 | 5E5F | CB1F | A1B8 |
| 0000472640 | BAA3 | A3AB | 4BEB | CFB8 | BAA3 | A3D4 | 43EB | CF9A |
| 0000472660 | B7B9 | 9F9E | 2688 | 022C | 60B8 | BAB9 | B965 | 31EB |
| 0000472700 | 9BE8 | EBEA | E8DD | EA9B | 08EB | EAE8 | EBEA | E803 |
| 0000472720 | EAB0 | 8A50 | 2C26 | 9E02 | 7358 | F707 | 83D8 | 00D2 |
| 0000472740 | DAF7 | 9AC3 | B9CF | B951 | 8A9F | B8FC | B96A | 6FBA |
| 0000472760 | 1EB9 | 5350 | 5251 | E853 | FC6E | 8E5B | 5AD8 | 5B59 |
| 0000473000 | 5658 | 8857 | 2C3E | 5502 | 2689 | 022E | 5153 | 368B |
| 0000473020 | 0186 | EE83 | 890C | 8636 | 8001 | 0A7C | 8B03 | 0874 |
| 0000473040 | 0475 | D0FF | 02EB | D2FF | 5B59 | 5F5D | 1F5E | 1ECB |
| 0000473060 | E853 | FC34 | 8E5B | 57D8 | 3E8B | 0186 | 5D8A | 32FE |
| 0000473100 | F6FF | 7F01 | 1475 | FB80 | 7403 | F609 | FF41 | 75F0 |
| 0000473120 | 5F09 | CB1F | 41F6 | 80FF | F774 | 01F6 | 5F80 | 751F |
| 0000473140 | 0B03 | CBE4 | CBF9 | 531E | FDE8 | 5BFB | D88E | 8B57 |
| 0000473160 | 863E | 8A01 | FE5D | FF32 | 2180 | 5F7F | CB1F | 531E |
| 0000473200 | E5E8 | 5BFB | D88E | 5756 | 3E8B | 0186 | 5D8A | 8BFE |

THU MAR 14 17:25:16 1991 CRV_IPS.DLL PAGE 172, LINE 10090

| | | | | | | | | |
|---|---|---|---|---|---|---|---|---|
| 0000473220 | FC75 | F73B | 0975 | FF32 | 3180 | 5F80 | 1F5E | 89CB |
| 0000473240 | FC7D | D98C | C18E | A5FC | FB80 | 7503 | AD09 | F480 |
| 0000473260 | AB80 | 5E5F | CB1F | A5A5 | 80AD | 80F4 | 5FAB | 1F5E |
| 0000473300 | 1ECB | E853 | FBA2 | 8E5B | 56D8 | 8C57 | 8ED0 | EBC0 |
| 0000473320 | 1E0A | E853 | FB92 | 8E5B | 56D8 | E857 | E77A | 04EB |
| 0000473340 | 071E | EDEB | 08B8 | E900 | 00C7 | 531E | 79E8 | 5BFB |
| 0000473360 | D88E | 5756 | D08C | C08E | 0AEB | 531E | 69E8 | 5BFB |
| 0000473400 | D88E | 5756 | 51E8 | EBE7 | 1E04 | EB07 | B8ED | 0004 |
| 0000473420 | 9EE9 | 1E00 | E853 | FB50 | 8E5B | 56D8 | 8C57 | 8ED0 |
| 0000473440 | EBC0 | 1E0A | E853 | FB40 | 8E5B | 56D8 | E857 | E728 |
| 0000473460 | 04EB | 071E | EDEB | 0CB8 | EB00 | 1E76 | E853 | FB28 |
| 0000473500 | 8E5B | 56D8 | 8C57 | 8ED0 | EBC0 | 1E0A | E853 | FB18 |
| 0000473520 | 8E5B | 56D8 | E857 | E700 | 04EB | 071E | EDEB | 14B8 |
| 0000473540 | EB00 | 1E4E | E853 | FB00 | 8E5B | 56D8 | 8C57 | 8ED0 |
| 0000473560 | EBC0 | 1E0A | E853 | FAF0 | 8E5B | 56D8 | E857 | E6D8 |
| 0000473600 | 04EB | 071E | EDEB | 10B8 | EB00 | 1E26 | E853 | FAD8 |
| 0000473620 | 8E5B | 56D8 | 8C57 | 8ED0 | EBC0 | 1E0A | E853 | FAC8 |
| 0000473640 | 8E5B | 56D8 | E857 | E6B0 | 04EB | 071E | EDEB | 00B8 |
| 0000473660 | 8B00 | 8BD8 | 863E | 8C01 | 8ED9 | 80C1 | FE7D | 7407 |
| 0000473700 | 8711 | FC7D | 8955 | 2E26 | FF02 | 1097 | 5D02 | 5E5F |
| 0000473720 | CB1F | C383 | BF02 | 0008 | BAE8 | 8BE6 | 8BF7 | 863E |
| 0000473740 | EB01 | 1EDE | E853 | FA80 | 8E5B | 56D8 | 8C57 | 8ED0 |
| 0000473760 | EBC0 | 1E0A | E853 | FA70 | 8E5B | 56D8 | E857 | E66E |
| 0000474000 | 04EB | 071E | EDEB | 0AB8 | E900 | 00C7 | 531E | 57E8 |
| 0000474020 | 5BFA | D88E | 5756 | D08C | C08E | 0AEB | 531E | 47E8 |
| 0000474040 | 5BFA | D88E | 5756 | 45E8 | EBE6 | 1E04 | EB07 | B8ED |
| 0000474060 | 0006 | 9EE9 | 1E00 | E853 | FA2E | 8E5B | 56D8 | 8C57 |
| 0000474100 | 8ED0 | EBC0 | 1E0A | E853 | FA1E | 8E5B | 56D8 | E857 |
| 0000474120 | E61C | 04EB | 071E | EDEB | 0EB8 | EB00 | 1E76 | E853 |
| 0000474140 | FA06 | 8E5B | 56D8 | 8C57 | 8ED0 | EBC0 | 1E0A | E853 |
| 0000474160 | F9F6 | 8E5B | 56D8 | E857 | E5F4 | 04EB | 071E | EDEB |
| 0000474200 | 16B8 | EB00 | 1E4E | E853 | F9DE | 8E5B | 56D8 | 8C57 |
| 0000474220 | 8ED0 | EBC0 | 1E0A | E853 | F9CE | 8E5B | 56D8 | E857 |
| 0000474240 | E5CC | 04EB | 071E | EDEB | 12B8 | EB00 | 1E26 | E853 |
| 0000474260 | F9B6 | 8E5B | 56D8 | 8C57 | 8ED0 | EBC0 | 1E0A | E853 |
| 0000474300 | F9A6 | 8E5B | 56D8 | E857 | E5A4 | 04EB | 071E | EDEB |
| 0000474320 | 02B8 | 8800 | 8BD8 | 863E | 8C01 | 8ED9 | 80C1 | FE7D |
| 0000474340 | 7407 | 5605 | 9FE8 | 5EE5 | D6E9 | BBFE | 0004 | 21EB |
| 0000474360 | 08BB | EB00 | BB1C | 000C | 17EB | 10BB | EB00 | BB12 |
| 0000474400 | 0014 | 0DEB | 00BB | EB00 | BB08 | 001C | 03EB | 18BB |
| 0000474420 | 1E00 | E853 | F952 | 8E5B | 56D8 | 8B57 | 863E | 8001 |
| 0000474440 | FE7D | 7407 | 803A | F27D | 7407 | 832C | 0CEF | 3E89 |
| 0000474460 | 0186 | D88C | C08E | 758B | B9FC | FC7D | 7D8B | 8308 |
| 0000474500 | 1CFB | 3073 | FB83 | 7318 | 5540 | 2689 | 022E | 97FF |
| 0000474520 | 0210 | 5F5D | 1F5E | 83CB | 02C3 | 29E8 | EBE5 | 83CC |
| 0000474540 | 02C3 | 7D80 | 07F2 | C374 | EF83 | 890C | 863E | E801 |
| 0000474560 | E514 | BEEB | F787 | 2E83 | 0186 | 550C | 2689 | 022E |
| 0000474600 | 97FF | 020C | 5F5D | 1F5E | 83CB | 862E | 0C01 | 8955 |
| 0000474620 | 2E26 | FF02 | 1097 | 5D02 | 259F | 4100 | E8D1 | E4D0 |
| 0000474640 | E00A | 5E5F | 9E1F | D0CB | D0E3 | 8AE3 | D0FB | 02E7 |
| 0000474660 | 32DF | EBFF | BB03 | 000C | 531E | ABE8 | 5BF8 | D88E |
| 0000474700 | 5756 | D88C | C08E | 8BFC | 8636 | 4E01 | 8B4E | 2BFE |
| 0000474720 | B9FB | 0005 | 87AD | 8905 | FE44 | 1D8B | 4747 | F4E2 |
| 0000474740 | 5E5F | CB1F | 5756 | E81E | F87E | D88E | 3E8B | 0186 |
| 0000474760 | 7D80 | 07FE | 0374 | 8DE8 | 1FE4 | 5E5F | 00CB | D08C |
| 0000475000 | C08E | 8B26 | 2617 | 4F8B | 2602 | 478B | 2606 | 5F8B |
| 0000475020 | EB04 | 8B0B | 8B17 | 024F | 478B | 8B06 | 045F | 501E |
| 0000475040 | 5153 | 5352 | 41E8 | 5BF8 | D88E | 595A | 585B | 5756 |
| 0000475060 | F88B | C48A | 8024 | 1279 | D7F7 | D3F7 | D1F7 | DAF7 |

THU MAR 14 17:25:16 1991 CRV_IPS.DLL PAGE 173, LINE 10149

| | | | | | | | | |
|---|---|---|---|---|---|---|---|---|
| 0000475100 | 83F5 | 00D1 | D383 | 8300 | 00D7 | 368B | 0186 | C683 |
| 0000475120 | 810C | 72FE | 7401 | 8928 | 8636 | 8901 | FC74 | 071E |
| 0000475140 | 8B56 | 0BF7 | 75F3 | 0B1B | 81F1 | 00E6 | 75FF | 5E13 |
| 0000475160 | 44C6 | 03FE | 9EB4 | D98B | C1E8 | 5FE9 | 1F5E | E9CB |
| 0000475200 | 0027 | C65E | FE44 | 5507 | 60BD | E887 | ED24 | 5F5D |
| 0000475220 | 1F5E | 00CB | 3068 | B034 | EB84 | 6813 | 3330 | 83B0 |
| 0000475240 | 0CEB | 3068 | B031 | EB81 | 6805 | 3031 | 8AB0 | 681E |
| 0000475260 | B60F | 831F | 703E | 0030 | 0674 | 1EFF | 306E | C31F |
| 0000475300 | 679A | 86BE | 1FB9 | 55C3 | EC8B | EC83 | 1E02 | 50BB |
| 0000475320 | 8EBE | 8BDB | 085E | 1E89 | 308A | 8C3C | 0675 | 06C7 |
| 0000475340 | 308A | 3231 | E42A | 4689 | 9AFE | 710A | BE63 | 86BB |
| 0000475360 | 9A30 | A07C | BE8C | FDB8 | 5000 | 849A | 9472 | 8BBE |
| 0000475400 | FE46 | E405 | 50FF | 849A | 9D72 | FFBE | FE76 | 0C9A |
| 0000475420 | A970 | 1FBE | E58B | CB5D | 8B55 | 83EC | 64EC | 5756 |
| 0000475440 | 331E | 8BDB | 1056 | 01B8 | E800 | 002B | 763B | 730C |
| 0000475460 | 8005 | 40C9 | 0D89 | 5F1F | 8B5E | 5DE5 | 55CB | EC8B |
| 0000475500 | EC83 | 5664 | 1E57 | C033 | D233 | 5E8B | E810 | 0007 |
| 0000475520 | 5F1F | 8B5E | 5DE5 | FCCB | 5055 | 006A | 006A | D08C |
| 0000475540 | C08E | D88E | 4E8B | 830C | 64F9 | 0676 | 40B1 | F633 |
| 0000475560 | 26EB | 76C5 | 8D08 | 9C7E | A4F3 | D88E | 4E8B | 8D0C |
| 0000475600 | 9C76 | 7689 | 8308 | 0E46 | 4E01 | BF08 | 0230 | 60E8 |
| 0000475620 | 5DF2 | 762B | 0308 | 0C76 | 7E8B | 3606 | 0D89 | 8936 |
| 0000475640 | 0275 | 8936 | 0445 | 8936 | 065D | 30BE | 8B02 | 3604 |
| 0000475660 | 4589 | 8B08 | 0244 | 8936 | 0A45 | 448B | 3604 | 4589 |
| 0000475700 | 8B0C | 0644 | 8936 | 0E45 | C78B | D28C | 00C3 | 8B55 |
| 0000475720 | 56EC | 1E57 | 1F16 | 768D | 5506 | C3E8 | 5DF0 | 8B1F |
| 0000475740 | 26C8 | 98AC | FE8B | F803 | C626 | 0005 | 7E8B | 320E |
| 0000475760 | 36FF | 1D89 | 8936 | 0255 | 8936 | 044D | 8936 | 0675 |
| 0000476000 | 8C36 | 0845 | D28C | C78B | 5E5F | E58B | CB5D | 8B55 |
| 0000476020 | 83EC | 0AEC | 5EC4 | 2606 | 078A | 8B98 | F6D8 | CF87 |
| 0000476040 | 012E | 0674 | 478D | EB20 | 9008 | 5E8B | 2606 | 078A |
| 0000476060 | 3D98 | 0065 | 1374 | 46FF | C406 | 065E | 8A26 | 9807 |
| 0000476100 | D88B | 87F6 | 2ECF | 7504 | C4ED | 065E | 8A26 | 8807 |
| 0000476120 | FE46 | C626 | 2E07 | 46FF | C406 | 065E | 8A26 | 8807 |
| 0000476140 | FC46 | 468A | 26FE | 0788 | 468A | 88FC | FE46 | 5EC4 |
| 0000476160 | FF06 | 0646 | 8026 | 003F | DF75 | E58B | CB5D | 8B55 |
| 0000476200 | 83EC | 08EC | 09EB | 8026 | 2E3F | 0C74 | 46FF | C406 |
| 0000476220 | 065E | 8026 | 003F | EE75 | 46FF | 2606 | 3F80 | 7400 |
| 0000476240 | EB56 | 9010 | 8026 | 653F | 1274 | 8026 | 453F | 0C74 |
| 0000476260 | 46FF | 8B06 | 065E | 8026 | 003F | E875 | C38B | C28C |
| 0000476300 | 4EFF | 8906 | FC46 | 5689 | EBFE | 9004 | 4EFF | 8B06 |
| 0000476320 | 065E | 8026 | 303F | F474 | 8026 | 2E3F | 0375 | 4EFF |
| 0000476340 | C406 | FC5E | 46FF | 26FC | 078A | 46FF | C406 | 065E |
| 0000476360 | 8826 | 0A07 | 75C0 | 8BEA | 5DE5 | 90CB | 8B55 | 8DEC |
| 0000476400 | F61E | 9A31 | B6BD | C0AE | 5EC4 | 9A06 | B6C1 | C0B3 |
| 0000476420 | A99A | DFBC | 72C0 | B807 | 0001 | E58B | CB5D | C02B |
| 0000476440 | E58B | CB5D | 8B55 | 83EC | 10EC | 5657 | 7E83 | 0006 |
| 0000476460 | 2274 | 76FF | FF0E | 0C76 | 468D | 50F8 | B89A | 0192 |
| 0000476500 | 8BC1 | 1EF0 | 1F16 | 7EC4 | A508 | A5A5 | 1FA5 | 5F5E |
| 0000476520 | E58B | CB5D | 76FF | FF0E | 0C76 | 468D | 50F0 | B89A |
| 0000476540 | 0B92 | 8BC1 | 9AD8 | B6B7 | C110 | 5EC4 | 9A08 | B85E |
| 0000476560 | C1B0 | 5F5E | E58B | CB5D | 8B55 | 83EC | 06EC | 5657 |
| 0000476600 | 5EC4 | 2612 | 478B | 4802 | 7E80 | 0016 | 2E74 | 8326 |
| 0000476620 | 2D3F | 0675 | 01B8 | EB00 | 9003 | C02B | 4603 | 8B0A |
| 0000476640 | 0C56 | 4689 | 89FA | FC56 | 5052 | 7E83 | 000E | 067E |
| 0000476660 | 01B8 | EB00 | 9003 | C02B | E850 | 045C | 468B | 8B0A |
| 0000476700 | 0C56 | 4689 | 89FA | FC56 | 5EC4 | 2612 | 3F83 | 752D |
| 0000476720 | 8E0C | 8BC2 | 26D8 | 07C6 | 402D | 4689 | 83FA | 0E7E |
| 0000476740 | 7E00 | C412 | FA5E | 8A26 | 0147 | 8826 | 4307 | 5E89 |

THU MAR 14 17:25:16 1991 CRV_IPS.DLL PAGE 174, LINE 10208

| | | | | | | | | |
|---|---|---|---|---|---|---|---|---|
| 0000476760 | 26FA | 07C6 | B82E | 308C | 501E | 7E80 | 0116 | C01B |
| 0000477000 | D8F7 | 4603 | 8BFA | FC56 | 4603 | 520E | 9A50 | 91D2 |
| 0000477020 | C263 | C483 | 8908 | FA46 | 5689 | 83FC | 107E | 7400 |
| 0000477040 | C407 | FA5E | C626 | 4507 | 46FF | C4FA | 125E | C426 |
| 0000477060 | 067F | 8026 | 303D | 5C74 | 468E | 2614 | 778B | 4E02 |
| 0000477100 | 0D79 | C68B | D8F7 | F08B | 5EC4 | 26FA | 07C6 | FF2D |
| 0000477120 | FA46 | FE83 | 7C64 | 8B15 | B9C6 | 0064 | F799 | C4F9 |
| 0000477140 | FA5E | 0026 | 8B07 | 99C6 | F9F7 | F28B | 46FF | 83FA |
| 0000477160 | 0AFE | 157C | C68B | 0AB9 | 9900 | F9F7 | 5EC4 | 26FA |
| 0000477200 | 0700 | C68B | F799 | 8BF9 | 8BF2 | FFC6 | FA46 | 5EC4 |
| 0000477220 | 26FA | 0700 | 468B | 8B0A | 0C56 | 5F5E | E58B | CB5D |
| 0000477240 | 8B55 | 83EC | 28EC | 468D | 50EA | 468D | 50DC | 5EC4 |
| 0000477260 | 2606 | 77FF | 2606 | 77FF | 2604 | 77FF | 2602 | 37FF |
| 0000477300 | 6E9A | B0BF | 83C2 | 0CC4 | 468D | 89DC | E646 | 568C |
| 0000477320 | 16E8 | 8B50 | 0E4E | 5141 | 7E83 | 000E | 067E | 01B8 |
| 0000477340 | EB00 | 9003 | C02B | 5EC4 | 89E6 | DA46 | 2650 | 078B |
| 0000477360 | 4689 | 58D8 | 8326 | 2D3F | 0675 | 01B8 | EB00 | 9003 |
| 0000477400 | C02B | 4603 | 03DA | 0A46 | 568B | 520C | 9A50 | 938A |
| 0000477420 | C3D5 | C483 | 2A0A | 50C0 | 76FF | FFE8 | E676 | 76FF |
| 0000477440 | FF10 | 0E76 | 76FF | FF0C | 0A76 | 76FF | FF08 | 0676 |
| 0000477460 | E80E | FE44 | 468B | 8B0A | 0C56 | E58B | CB5D | 8B55 |
| 0000477500 | 83EC | 0CEC | C456 | 105E | 8B26 | 0247 | 8948 | FE46 |
| 0000477520 | 7E80 | 0014 | 3474 | 8326 | 2D3F | 0675 | 01B8 | EB00 |
| 0000477540 | 9003 | C02B | 4603 | 8B0A | 0C56 | 4689 | 89F4 | F656 |
| 0000477560 | 4E8B | 390E | FE4E | 1275 | C28E | D88B | 768B | 26FE |
| 0000477600 | 00C6 | 0330 | 43DE | C626 | 0007 | 468B | 8B0A | 0C56 |
| 0000477620 | 4689 | 89F4 | F656 | 5EC4 | 2610 | 3F83 | 752D | 8E0C |
| 0000477640 | 8BC2 | 26D8 | 07C6 | 402D | 4689 | C4F4 | 105E | 8326 |
| 0000477660 | 027F | 7F00 | FF19 | F676 | 76FF | B8F4 | 0001 | E850 |
| 0000477700 | 0256 | 5EC4 | 26F4 | 07C6 | FF30 | F446 | 07EB | 8B26 |
| 0000477720 | 0247 | 4601 | 83F4 | 0E7E | 7E00 | FF5F | F676 | 76FF |
| 0000477740 | B8F4 | 0001 | E850 | 0230 | 5EC4 | 26F4 | 07C6 | FF2E |
| 0000477760 | F446 | 5EC4 | 2610 | 7F83 | 0002 | 3E7D | 7E80 | 0014 |
| 0000500000 | 0874 | 8B26 | 0247 | D8F7 | 0EEB | 8826 | 0247 | D8F7 |
| 0000500020 | 463B | 7E0E | 6803 | 0E46 | 4689 | FF0E | F676 | 76FF |
| 0000500040 | 50F4 | F3E8 | FF01 | 0E76 | 30B8 | 5000 | 76FF | FFF6 |
| 0000500060 | F476 | C29A | 099F | 83C4 | 08C4 | 468B | 8B0A | 0C56 |
| 0000500100 | 8B5E | 5DE5 | 90CB | 8B55 | 83EC | 26EC | 468D | 50EA |
| 0000500120 | 468D | 50DC | 5EC4 | 2606 | 77FF | 2606 | 77FF | 2604 |
| 0000500140 | 77FF | 2602 | 37FF | 6E9A | 43BF | 83C4 | 0CC4 | 468D |
| 0000500160 | 89DC | E646 | 568C | 16E8 | 8B50 | DE4E | 4E03 | 510E |
| 0000500200 | D88B | 3650 | 078B | 4689 | 58DA | 8336 | 2D3F | 0675 |
| 0000500220 | 01B8 | EB00 | 9003 | C02B | 4603 | 8B0A | 0C56 | 5052 |
| 0000500240 | 8A9A | B193 | 83BE | 0AC4 | C02A | FF50 | E876 | 76FF |
| 0000500260 | FFE6 | 0E76 | 76FF | FF0C | 0A76 | 76FF | FF08 | 0676 |
| 0000500300 | E80E | FE7A | 468B | 8B0A | 0C56 | E58B | CB5D | 8B55 |
| 0000500320 | 83EC | 32EC | 468D | 50E4 | 468D | 50D8 | 5EC4 | 2606 |
| 0000500340 | 77FF | 2606 | 77FF | 2604 | 77FF | 2602 | 37FF | 6E9A |
| 0000500360 | CBBF | 83C4 | 0CC4 | 468B | 48DA | 4689 | 8DE2 | D846 |
| 0000500400 | 4689 | 8CD4 | D656 | 5016 | 76FF | 8B0E | 36D8 | 3F83 |
| 0000500420 | 752D | B805 | 0001 | 02EB | C02B | 4603 | 8B0A | 0C56 |
| 0000500440 | 4689 | 89FC | FE56 | 5052 | 8A9A | CA93 | 83C5 | 0AC4 |
| 0000500460 | 468B | 48DA | 4689 | 3BD2 | E246 | 047E | 01B0 | 02EB |
| 0000500500 | C02A | 4688 | 8BFA | D246 | 4689 | 3DE2 | FFFC | 057C |
| 0000500520 | 463B | 7C0E | B027 | 5001 | 76FF | FFD6 | D476 | 76FF |
| 0000500540 | FF10 | 0E76 | 76FF | FF0C | 0A76 | 76FF | FF08 | 0676 |
| 0000500560 | E80E | FC04 | C483 | 8B12 | 5DE5 | 90CB | 7E80 | 00FA |
| 0000500600 | 1474 | 5EC4 | FFFC | FC46 | 8026 | 003F | F475 | 5E8B |
| 0000500620 | 26FC | 47C6 | 00FE | 01B0 | FF50 | D676 | 76FF | FFD4 |

THU MAR 14 17:25:16 1991 CRV_IPS.DLL PAGE 175, LINE 10267

| | | | | | | | | |
|---|---|---|---|---|---|---|---|---|
| 0000500640 | 0E76 | 76FF | FF0C | 0A76 | 76FF | FF08 | 0676 | E80E |
| 0000500660 | FD8C | E58B | CB5D | 8B55 | 83EC | 0E7E | 7465 | 8306 |
| 0000500700 | 0E7E | 7545 | FF1D | 1276 | 76FF | FF10 | 0C76 | 76FF |
| 0000500720 | FF0A | 0876 | 76FF | 0E06 | C5E8 | 8BFC | 8BE5 | 5DE5 |
| 0000500740 | 90CB | 7E83 | 660E | 1675 | 76FF | FF10 | 0C76 | 76FF |
| 0000500760 | FF0A | 0876 | 76FF | 0E06 | 4BE8 | EBFE | 90DE | 76FF |
| 0000501000 | FF12 | 1076 | 76FF | FF0C | 0A76 | 76FF | FF08 | 0676 |
| 0000501020 | E80E | FEBA | E58B | CB5D | 8B55 | 83EC | 047E | 7400 |
| 0000501040 | FF25 | 0876 | 76FF | 9A06 | 9232 | C5E4 | E58B | 5040 |
| 0000501060 | 76FF | FF08 | 0676 | 468B | 8B06 | 0856 | 4603 | 5204 |
| 0000501100 | 9A50 | 9E9A | C0A6 | E58B | C25D | 0006 | 8B55 | 8BEC |
| 0000501120 | 0E46 | 682D | 992A | 0CB9 | F700 | 50F1 | FFE8 | 83CF |
| 0000501140 | 02C4 | FF50 | 1076 | 76FF | FF0E | 0C76 | 76FF | FF0A |
| 0000501160 | 0876 | 76FF | 0E06 | 0DE8 | 8300 | 0CC4 | 535B | E9E8 |
| 0000501200 | 83CF | 02C4 | CB5D | 8B55 | 83EC | 04EC | 5756 | 468B |
| 0000501220 | F70A | 0C66 | C88B | CA0B | 6174 | 4689 | 89FC | FE56 |
| 0000501240 | 5EC4 | 8B06 | 0E76 | D20B | 1F75 | FF3D | 74FF | 8B1A |
| 0000501260 | 03CB | 72C8 | 5014 | 5253 | C88B | 6AE8 | 8B00 | 5AC8 |
| 0000501300 | 585B | C12B | DAB3 | EB00 | 833C | 01FB | 0577 | 00B9 |
| 0000501320 | EB80 | 8B04 | F7CB | 51D9 | 5350 | E852 | 0049 | C88B |
| 0000501340 | 5B5A | 5F58 | C12B | DA83 | 3B00 | 72CF | 0318 | 73D9 |
| 0000501360 | 8C0C | 81C1 | F5C1 | 8E9F | EBC1 | EB02 | 8B24 | 0BC8 |
| 0000501400 | 75CA | EBA3 | 8B00 | 0BC8 | 74CA | 8B13 | FC4E | C82B |
| 0000501420 | C18B | 4E8B | 1BFE | 8BCA | F7D1 | 0A76 | 03EB | 468B |
| 0000501440 | 5F0C | 8B5E | 5DE5 | 55CB | EC8B | EC83 | 8904 | FE4E |
| 0000501460 | 48BF | 8B2C | 2DC6 | 2A68 | F803 | 44F6 | 0C0A | 0575 |
| 0000501500 | 05F6 | 7401 | 8B05 | 0245 | 03EB | 00B8 | 8902 | FC46 |
| 0000501520 | 44F6 | 0C0A | 0575 | 05F6 | 7401 | 8B33 | 0444 | C00B |
| 0000501540 | 2C74 | C13B | 0276 | C18B | 5350 | 0651 | FF50 | 0274 |
| 0000501560 | 34FF | 5306 | E80E | D84C | C483 | 070A | 5B59 | 2B58 |
| 0000501600 | 29C8 | 0444 | D803 | 0401 | 00EB | 62E3 | C2EB | 4E3B |
| 0000501620 | 72FC | 3330 | 8BD2 | F7C1 | FC76 | C18B | C22B | 5153 |
| 0000501640 | 5006 | 5306 | C033 | 448A | 500B | E80E | C444 | C483 |
| 0000501660 | 0708 | 5B59 | C00B | 2C74 | FF3D | 74FF | 2B2D | 03C8 |
| 0000501700 | EBD8 | 53C7 | 0651 | 561E | E80E | AE64 | C483 | 0704 |
| 0000501720 | 5B59 | FF3D | 74FF | 2617 | 0788 | 4943 | 458B | 8902 |
| 0000501740 | FC46 | A6EB | 4C80 | 100A | 04EB | 4C80 | 200A | 468B |
| 0000501760 | 2BFE | 8BC1 | 5DE5 | 00C3 | 8B55 | 1EEC | 8B07 | 0E4E |
| 0000502000 | C90B | 3174 | C1F6 | 7501 | 8B2C | 0C56 | 468B | 8B0A |
| 0000502020 | 0BD8 | 75DA | 5112 | CE9A | 5E8E | 59EC | D88B | DA0B |
| 0000502040 | 1374 | D88B | EB43 | 0B0A | 74D2 | A80A | 7501 | 8B06 |
| 0000502060 | 03D8 | 73C1 | BA08 | 0016 | C033 | 29E9 | 6AAB | 8BFF |
| 0000502100 | 52CC | 5653 | 0E57 | 1D68 | 16C8 | 5251 | 8B50 | 084E |
| 0000502120 | 568B | 8B06 | 1276 | 7E8B | 9A10 | FFFF | 0000 | 5E5F |
| 0000502140 | C00B | 1374 | F65B | 01C3 | 0A74 | 534B | D89A | B98E |
| 0000502160 | 83C7 | 04C4 | 08E9 | 83AB | 04C4 | 5D58 | 56CB | 0E57 |
| 0000502200 | 7968 | 51C8 | E852 | CE90 | 8E93 | 26C2 | 578B | 0B22 |
| 0000502220 | 74D2 | 5015 | C353 | 2652 | 77FF | 9A20 | 8ED8 | C80F |
| 0000502240 | C483 | 0704 | 585B | D233 | 8926 | 2617 | 5789 | 2602 |
| 0000502260 | 5789 | 2608 | 5789 | 260A | 5789 | 2620 | 5789 | A822 |
| 0000502300 | 7401 | 4809 | 8C26 | 2257 | 8926 | 2047 | 0005 | 2602 |
| 0000502320 | 4789 | 3304 | E8ED | A73C | 55CB | EC8B | 69E8 | E8A8 |
| 0000502340 | CE36 | D88B | C28E | C033 | 8926 | 2607 | 4789 | 2602 |
| 0000502360 | 4789 | 2608 | 4789 | 260A | 47C7 | 0004 | 6A02 | 6A00 |
| 0000502400 | 9A00 | CC95 | 0000 | 04C8 | 0000 | 468B | 2D06 | 2A68 |
| 0000502420 | 0CB9 | 9900 | F9F7 | 4689 | 50FE | 41E8 | 83CD | 02C4 |
| 0000502440 | 76FF | FF0E | 0C76 | 76FF | FF0A | 0876 | 76FF | 9A06 |
| 0000502460 | C8E6 | C903 | C483 | 890A | FC46 | 76FF | E8FE | CD2A |
| 0000502500 | 468B | C9FC | 90CB | 04C8 | 0000 | 8B56 | 0676 | 44F6 |

THU MAR 14 17:25:16 1991 CRV_IPS.DLL PAGE 176, LINE 10326

| | | | | | | | | |
|---|---|---|---|---|---|---|---|---|
| 0000502520 | 830A | 0C74 | 7E83 | 020E | 067F | 7E83 | 000E | 167D |
| 0000502540 | 6E9A | 2573 | 89C9 | FC46 | 5689 | C4FE | FC5E | C726 |
| 0000502560 | 1607 | EB00 | 9054 | 6480 | EF0A | 7E83 | 010E | 1575 |
| 0000502600 | 561E | 709A | 3ACA | 83C9 | 04C4 | 4601 | 110A | 0C56 |
| 0000502620 | 46C7 | 000E | 1E00 | 9A56 | 79CE | C95B | C483 | F604 |
| 0000502640 | 0A44 | 7480 | 8004 | 0A64 | FFFC | 0E76 | 76FF | FF0C |
| 0000502660 | 0A76 | 448A | 2A0B | 50E4 | 469A | 3E89 | 83C8 | 08C4 |
| 0000502700 | FF3D | 75FF | 3B09 | 75D0 | B805 | FFFF | 02EB | C02B |
| 0000502720 | C95E | 90CB | 8B55 | 1EEC | C553 | 065E | 078B | 578B |
| 0000502740 | 8B02 | 0A4E | E80E | 0280 | 0789 | 5789 | 5B02 | 5D1F |
| 0000502760 | D6CA | 0000 | 8B55 | 53EC | 3357 | 8BFF | 0846 | C00B |
| 0000503000 | 117D | 8B47 | 0656 | D8F7 | DAF7 | 001D | 8900 | 0846 |
| 0000503020 | 5689 | 8B06 | 0C46 | C00B | 107D | 568B | F70A | F7D8 |
| 0000503040 | 1DDA | 0000 | 4689 | 890C | 0A56 | C00B | 1875 | 4E8B |
| 0000503060 | 8B0A | 0846 | D233 | F1F7 | 468B | F706 | 8BF1 | 33C2 |
| 0000503100 | 4FD2 | 4379 | 48EB | D88B | 4E8B | 8B0A | 0856 | 468B |
| 0000503120 | D106 | D1EB | D1D9 | D1EA | 0BD8 | 75DB | F7F4 | 8BF1 |
| 0000503140 | F7C8 | 0C66 | F791 | 0A66 | D103 | 0C72 | 563B | 7708 |
| 0000503160 | 7207 | 3B0B | 0646 | 0676 | 462B | 1B0A | 0C56 | 462B |
| 0000503200 | 1B06 | 0856 | 794F | F707 | F7DA | 83D8 | 00DA | 5B5F |
| 0000503220 | CA5D | 0008 | 06C8 | 0000 | 468B | 2D06 | 2A68 | 0CB9 |
| 0000503240 | 9900 | F9F7 | 4689 | 50FE | B3E8 | 83CB | 02C4 | 76FF |
| 0000503260 | FF08 | 0676 | 709A | A0CA | 83CA | 04C4 | 4689 | 89FA |
| 0000503300 | FC56 | 76FF | E8FE | CBA2 | 468B | 8BFA | FC56 | CBC9 |
| 0000503320 | 18C8 | 0000 | 8B56 | 0676 | C68B | 682D | 052A | 2C48 |
| 0000503340 | 4689 | 8AF0 | 0B44 | E42A | 4689 | 83F4 | 047C | 7D00 |
| 0000503360 | C705 | 0444 | 0000 | 016A | 006A | 006A | 9A50 | 8946 |
| 0000503400 | CB2F | C483 | 8908 | FC46 | 5689 | 0BFE | 7DD2 | B807 |
| 0000503420 | FFFF | E999 | 014F | 44F6 | 080A | 1E75 | 5E8B | F6F0 |
| 0000503440 | 0107 | 1675 | 448B | 9904 | C88B | DA8B | 468B | 8BFC |
| 0000503460 | FE56 | C12B | D31B | 2CE9 | 9001 | 048B | 442B | 8906 |
| 0000503500 | F646 | 44F6 | 030A | 3E74 | 5E8B | F6F4 | 4587 | 8028 |
| 0000503520 | 2474 | 448B | 8B06 | 0854 | 4689 | 89EC | EE56 | 0FEB |
| 0000503540 | 5EC4 | 26EC | 3F80 | 750A | FF03 | F646 | 46FF | 8BEC |
| 0000503560 | 3904 | EC46 | EA72 | 468B | 0BFE | FC46 | 2475 | 468B |
| 0000503600 | 2BF6 | E9D2 | 00DF | 44F6 | 800A | EA75 | 6E9A | 7973 |
| 0000503620 | 89CB | E846 | 5689 | C4EA | E85E | C726 | 1607 | E900 |
| 0000503640 | FF6D | 44F6 | 010A | 0375 | AEE9 | 8300 | 047C | 7500 |
| 0000503660 | C709 | F646 | 0000 | A0E9 | 9000 | 048B | 442B | 0306 |
| 0000503700 | 0444 | 4689 | 8BF2 | F45E | 87F6 | 2845 | 7480 | 6A7F |
| 0000503720 | 6A02 | 6A00 | 5300 | 469A | D289 | 83CB | 08C4 | 463B |
| 0000503740 | 75FC | 3B41 | FE56 | 3C75 | 468B | 03F2 | 0644 | 4689 |
| 0000503760 | 8BF8 | 0644 | 548B | 8908 | EC46 | 5689 | EBEE | 9010 |
| 0000504000 | 5EC4 | 26EC | 3F80 | 750A | FF03 | F246 | 46FF | 8BEC |
| 0000504020 | F846 | 4639 | 72EC | 8BE9 | F05E | 07F6 | 7420 | FF2F |
| 0000504040 | F246 | 2AEB | 006A | 76FF | FFFE | FC76 | 76FF | 9AF4 |
| 0000504060 | 8946 | C8D2 | C483 | 8B08 | F05E | 478B | 8902 | F246 |
| 0000504100 | 5E8B | F6F4 | 4587 | 0428 | 0474 | 8940 | F246 | 468B |
| 0000504120 | 2BF2 | 29D2 | FC46 | 5619 | 8BFE | FC46 | 568B | 03FE |
| 0000504140 | F646 | D283 | 5E00 | CBC9 | ED32 | 06E3 | FAD1 | D8D1 |
| 0000504160 | FAE2 | 00CB | 581E | 4590 | 8B55 | 1EEC | D88E | EC81 |
| 0000504200 | 0004 | 5657 | 681E | 3092 | 5368 | 6865 | 0D04 | 468D |
| 0000504220 | 16FC | 6A50 | 6A00 | 6A00 | 6A00 | 6A01 | 6A42 | 6A00 |
| 0000504240 | 9A00 | 8A2E | 0000 | 00E9 | 5E00 | 835F | 02ED | E58B |
| 0000504260 | 5D1F | CB4D | 581E | 4590 | 8B55 | 1EEC | D88E | EC81 |
| 0000504300 | 0000 | 5657 | 068E | 31FE | FF26 | 0436 | 9A0D | 8A57 |
| 0000504320 | 0000 | 00E9 | 5E00 | 835F | 02ED | E58B | 5D1F | CB4D |
| 0000504340 | 581E | 4590 | 8B55 | 1EEC | D88E | EC81 | 0000 | 5657 |
| 0000504360 | 016A | 006A | 709A | 0070 | E900 | 0000 | 5F5E | ED83 |

THU MAR 14 17:25:16 1991 CRV_IPS.DLL PAGE 177, LINE 10385

| | | | | | | | | |
|---|---|---|---|---|---|---|---|---|
| 0000504400 | 8B02 | 1FE5 | 4D5D | 1ECB | 9058 | 5545 | EC8B | 8E1E |
| 0000504420 | 81D8 | 06EC | 5700 | 6856 | C000 | 5068 | 9A01 | CDCE |
| 0000504440 | CCE0 | C483 | 8904 | FA46 | 7E83 | 00FA | 0375 | 06E9 |
| 0000504460 | 8B00 | FA46 | 67E9 | 6A00 | 1E02 | B068 | 9A30 | CEEB |
| 0000504500 | CD00 | C483 | 8906 | FA46 | 7E83 | 00FA | 0375 | 06E9 |
| 0000504520 | 8B00 | FA46 | 47E9 | 6800 | C000 | 8068 | 9A00 | CDCE |
| 0000504540 | CD21 | C483 | 8904 | FA46 | 7E83 | 00FA | 0375 | 06E9 |
| 0000504560 | 8B00 | FA46 | 27E9 | 6A00 | 8D02 | FC46 | 5016 | EB9A |
| 0000504600 | 91CE | 83C4 | 06C4 | 4689 | 8AFA | FC66 | 0025 | A3FC |
| 0000504620 | 30B2 | 06C7 | 30B4 | 0000 | 468B | E9FA | 0000 | 5F5E |
| 0000504640 | ED83 | 8B02 | 1FE5 | 4D5D | 1ECB | 9058 | 5545 | EC8B |
| 0000504660 | 8E1E | 81D8 | 06EC | 5700 | 6A56 | 68C0 | 1D00 | 026A |
| 0000504700 | 468D | 1606 | 9A50 | CF29 | CCC0 | C483 | 890A | FC46 |
| 0000504720 | 468D | 16FA | 6A50 | 6A00 | 6A00 | 6803 | 0081 | 068E |
| 0000504740 | 31FE | FF26 | 0436 | 9A0D | CDB6 | 0000 | 4689 | 8AFC |
| 0000504760 | FA46 | 4632 | 2506 | 0077 | 4633 | 8906 | FA46 | 006A |
| 0000505000 | 006A | 468D | 16FA | 6A50 | 6801 | 0081 | 068E | 31FE |
| 0000505020 | FF26 | 0436 | 9A0D | FFFF | 0000 | 4689 | 8BFC | FC46 |
| 0000505040 | 00E9 | 5E00 | 835F | 02ED | E58B | 5D1F | CB4D | 581E |
| 0000505060 | 4590 | 8B55 | 1EEC | D88E | EC81 | 0000 | 5657 | 006A |
| 0000505100 | 006A | 468D | 1606 | 6A50 | 6802 | 0081 | 068E | 31FE |
| 0000505120 | FF26 | 0436 | 9A0D | CD88 | 0000 | 00E9 | 5E00 | 835F |
| 000D505140 | 02ED | E58B | 5D1F | CB4D | 581E | 4590 | 8B55 | 1EEC |
| 0000505160 | D88E | EC81 | 0006 | 5657 | 76FF | FF08 | 0676 | 006A |
| 0000505200 | 006A | 036A | 8168 | 8E00 | FE06 | 2631 | 36FF | 0D04 |
| 0000505220 | F69A | 00CD | 8900 | FC46 | C06A | 0068 | 6A1D | 8D02 |
| 0000505240 | FA46 | 5016 | 959A | 68CF | 83CD | 0AC4 | 4689 | C4FC |
| 0000505260 | 065E | 8A26 | 3207 | FA46 | 7725 | C400 | 065E | 3126 |
| 0000505300 | 8B07 | FC46 | 00E9 | 5E00 | 835F | 02ED | E58B | 5D1F |
| 0000505320 | CB4D | 581E | 4590 | 8B55 | 1EEC | D88E | EC81 | 0000 |
| 0000505340 | 5657 | 76FF | FF08 | 0676 | 006A | 006A | 046A | 8168 |
| 0000505360 | 8E00 | FE06 | 2631 | 36FF | 0D04 | 319A | 00CE | E900 |
| 0000505400 | 0000 | 5F5E | ED83 | 8B02 | 1FE5 | 4D5D | 1ECB | 9058 |
| 0000505420 | 5545 | EC8B | 8E1E | 81D8 | 04EC | 5700 | 8E56 | FE06 |
| 0000505440 | 2631 | 36FF | 0D04 | 76FF | FF08 | 0676 | 468B | 400A |
| 0000505460 | E8D1 | 8D50 | FC46 | 5016 | 909A | 00A0 | E900 | 0000 |
| 0000505500 | 5F5E | ED83 | 8B02 | 1FE5 | 4D5D | 1ECB | 9058 | 5545 |
| 0000505520 | EC8B | 8E1E | 81D8 | 04EC | 5700 | 8E56 | FE06 | 2631 |
| 0000505540 | 36FF | 0D04 | 76FF | FF08 | 0676 | 468B | 400A | E8D1 |
| 0000505560 | 8D50 | FC46 | 5016 | 9D9A | 008C | E900 | 0000 | 5F5E |
| 0000505600 | ED83 | 8B02 | 1FE5 | 4D5D | 1ECB | 9058 | 5545 | EC8B |
| 0000505620 | 8E1E | 81D8 | 06EC | 5700 | 6A56 | 6A00 | 8D00 | 0C46 |
| 0000505640 | 5016 | 026A | 8168 | 8E00 | FE06 | 2631 | 36FF | 0D04 |
| 0000505660 | 9B9A | 00CE | 8900 | FA46 | 7E83 | 00FA | 0375 | 06E9 |
| 0000505700 | 8B00 | FA46 | 23E9 | 8E00 | FE06 | 2631 | 36FF | 0D04 |
| 0000505720 | 76FF | FF08 | 0676 | 468B | 400A | E8D1 | 8D50 | FC46 |
| 0000505740 | 5016 | D99A | 00CE | E900 | 0000 | 5F5E | ED83 | 8B02 |
| 0000505760 | 1FE5 | 4D5D | 1ECB | 9058 | 5545 | EC8B | 8E1E | 81D8 |
| 0000506000 | 06EC | 5700 | 6A56 | 6A00 | 8D00 | 0C46 | 5016 | 026A |
| 0000506020 | 8168 | 8E00 | FE06 | 2631 | 36FF | 0D04 | 519A | 00CF |
| 0000506040 | 8900 | FA46 | 7E83 | 00FA | 0375 | 06E9 | 8B00 | FA46 |
| 0000506060 | 23E9 | 8E00 | FE06 | 2631 | 36FF | 0D04 | 76FF | FF08 |
| 0000506100 | 0676 | 468B | 400A | E8D1 | 8D50 | FC46 | 5016 | 179A |
| 0000506120 | 00CF | E900 | 0000 | 5F5E | ED83 | 8B02 | 1FE5 | 4D5D |
| 0000506140 | 1ECB | 9058 | 5545 | EC8B | 8E1E | 81D8 | 10EC | 5700 |
| 0000506160 | C456 | 0E5E | 8B26 | 0447 | 5EC4 | 260E | 072B | F740 |
| 0000506200 | B026 | C130 | 03E8 | 4689 | 8BF8 | F846 | 9940 | C22B |
| 0000506220 | F8D1 | 4689 | C4FC | 0E5E | 8B26 | 0647 | 5EC4 | 260E |
| 0000506240 | 472B | 4002 | 4689 | A1FA | 30B2 | 168B | 30B4 | EAD1 |

THU MAR 14 17:25:16 1991 CRV_IPS.DLL PAGE 178, LINE 10444

| | | | | | | | | |
|---|---|---|---|---|---|---|---|---|
| 0000506260 | D8D1 | EAD1 | D8D1 | EAD1 | D8D1 | 463B | 74F8 | E903 |
| 0000506300 | 0029 | 468B | F7FA | F86E | 4689 | FFF0 | 0C76 | 76FF |
| 0000506320 | FF0A | F076 | 76FF | FF08 | 0676 | 299A | 47CF | 83CE |
| 0000506340 | 0AC4 | 4689 | 8BF2 | F246 | 29E9 | 6A01 | FF00 | B036 |
| 0000506360 | C430 | 0E5E | 8B26 | 9907 | 5052 | 909A | BCA1 | FFD0 |
| 0000506400 | B436 | FF30 | B236 | C430 | 0E5E | C88B | 8B26 | 0247 |
| 0000506420 | DA8B | 5299 | 8B50 | 8BF1 | 9AFB | A190 | D07D | F003 |
| 0000506440 | FA13 | 7601 | 110A | 0C7E | 7E83 | 00FA | 0375 | 09E9 |
| 0000506460 | 8300 | F87E | 7400 | E903 | 0006 | 00B8 | E900 | 00D4 |
| 0000506500 | 7E83 | 00FA | 037D | 09E9 | 8300 | F87E | 7C00 | E903 |
| 0000506520 | 0006 | 01B8 | E900 | 00BC | 006A | 006A | 468D | 160A |
| 0000506540 | 6A50 | 6802 | 0081 | 068E | 31FE | FF26 | 0436 | 9A0D |
| 0000506560 | D195 | 0000 | 4689 | 83F2 | F27E | 7500 | E903 | 0006 |
| 0000506600 | 468B | E9F2 | 008E | 46C7 | 00F6 | E900 | 0003 | 46FF |
| 0000506620 | 8BF6 | FA46 | 4639 | 7CF6 | E903 | 0072 | 068E | 31FE |
| 0000506640 | FF26 | 0436 | FF0D | 0876 | 76FF | FF06 | FC76 | 468D |
| 0000506660 | 16F4 | 9A50 | CF83 | 0000 | 4689 | 83F2 | F27E | 7500 |
| 0000506700 | E903 | 0006 | 468B | E9F2 | 004A | 468B | 01F8 | 0646 |
| 0000506720 | B2A1 | 8B30 | B416 | 0130 | 0A46 | 5611 | 6A0C | 6A00 |
| 0000506740 | 8D00 | 0A46 | 5016 | 026A | 8168 | 8E00 | FE06 | 2631 |
| 0000506760 | 36FF | 0D04 | BD9A | 00CF | 8900 | F246 | 7E83 | 00F2 |
| 0000507000 | 0375 | 06E9 | 8B00 | F246 | 09E9 | E900 | FF80 | 00B8 |
| 0000507020 | E900 | 0000 | 5F5E | ED83 | 8B02 | 1FE5 | 4D5D | 1ECB |
| 0000507040 | 9058 | 5545 | EC8B | 8E1E | 81D8 | 10EC | 5700 | C456 |
| 0000507060 | 0E5E | 8B26 | 0447 | 5EC4 | 260E | 072B | F740 | B026 |
| 0000507100 | C130 | 03E8 | 4689 | 8BF8 | F846 | 9940 | C22B | F8D1 |
| 0000507120 | 4689 | C4FC | 0E5E | 8B26 | 0647 | 5EC4 | 260E | 472B |
| 0000507140 | 4002 | 4689 | A1FA | 30B2 | 168B | 30B4 | EAD1 | D8D1 |
| 0000507160 | EAD1 | D8D1 | EAD1 | D8D1 | 463B | 74F8 | E903 | 0029 |
| 0000507200 | 468B | F7F8 | FA6E | 4689 | FFF0 | 0C76 | 76FF | FF0A |
| 0000507220 | F076 | 76FF | FF08 | 0676 | 959A | 9DCF | 83D0 | 0AC4 |
| 0000507240 | 4689 | 8BF2 | F246 | 29E9 | 6A01 | FF00 | B036 | C430 |
| 0000507260 | 0E5E | 8B26 | 9907 | 5052 | 909A | 7AA1 | FFD2 | B436 |
| 0000507300 | FF30 | B236 | C430 | 0E5E | C88B | 8B26 | 0247 | DA8B |
| 0000507320 | 5299 | 8B50 | 8BF1 | 9AFB | A190 | D23B | F003 | FA13 |
| 0000507340 | 7601 | 110A | 0C7E | 7E83 | 00FA | 0375 | 09E9 | 8300 |
| 0000507360 | F87E | 7400 | E903 | 0006 | 00B8 | E900 | 00D4 | 7E83 |
| 0000507400 | 00FA | 037D | 09E9 | 8300 | F87E | 7C00 | E903 | 0006 |
| 0000507420 | 01B8 | E900 | 00BC | 006A | 006A | 468D | 160A | 6A50 |
| 0000507440 | 6802 | 0081 | 068E | 31FE | FF26 | 0436 | 9A0D | D110 |
| 0000507460 | 0000 | 4689 | 83F2 | F27E | 7500 | E903 | 0006 | 468B |
| 0000507500 | E9F2 | 008E | 46C7 | 00F6 | E900 | 0003 | 46FF | 8BF6 |
| 0000507520 | F646 | 4639 | 7FFA | E903 | 0072 | 068E | 31FE | FF26 |
| 0000507540 | 0436 | FF0D | 0876 | 76FF | FF06 | FC76 | 468D | 16F4 |
| 0000507560 | 9A50 | CFEF | 0000 | 4689 | 83F2 | F27E | 7500 | E903 |
| 0000507600 | 0006 | 468B | E9F2 | 004A | 468B | 01F8 | 0646 | B2A1 |
| 0000507620 | 8B30 | B416 | 0130 | 0A46 | 5611 | 6A0C | 6A00 | 8D00 |
| 0000507640 | 0A46 | 5016 | 026A | 8168 | 8E00 | FE06 | 2631 | 36FF |
| 0000507660 | 0D04 | CE9A | 00D2 | 8900 | F246 | 7E83 | 00F2 | 0375 |
| 0000507700 | 06E9 | 8B00 | F246 | 09E9 | E900 | FF80 | 00B8 | E900 |
| 0000507720 | 0000 | 5F5E | ED83 | 8B02 | 1FE5 | 4D5D | 1ECB | 9058 |
| 0000507740 | 5545 | EC8B | 8E1E | 81D8 | 0CEC | 5700 | 6A56 | 6A00 |
| 0000507760 | 8D00 | 0E46 | 5016 | 026A | 8168 | 8E00 | FE06 | 2631 |
| 0000510000 | 36FF | 0D04 | 539A | 00D3 | 8900 | F646 | 7E83 | 00F6 |
| 0000510020 | 0375 | 06E9 | 8B00 | F646 | C3E9 | 8300 | 0C7E | 7600 |
| 0000510040 | E903 | 0009 | 7E83 | FF0A | 0377 | 0FE9 | 8300 | 067E |
| 0000510060 | 7500 | E903 | 0006 | 03B8 | E900 | 00A2 | 468B | 8B0A |
| 0000510100 | 0C56 | 4689 | 89FA | FC56 | 09E9 | 8100 | FA6E | 8000 |
| 0000510120 | 5E83 | 00FC | 7E83 | 00FC | 037D | 7BE9 | 7E00 | E903 |

THU MAR 14 17:25:16 1991 CRV_IPS.DLL PAGE 179, LINE 10503

| | | | | | | | | |
|---|---|---|---|---|---|---|---|---|
| 0000510140 | 0009 | 7E83 | 00FA | 0377 | 6DE9 | 8300 | FC7E | 7D00 |
| 0000510160 | E903 | 0017 | 037E | 0AE9 | 8100 | FA7E | 8000 | 0373 |
| 0000510200 | 08E9 | C700 | F446 | 4000 | 09E9 | 8B00 | FA46 | D140 |
| 0000510220 | 89E8 | F446 | 068E | 31FE | FF26 | 0436 | FF0D | 0876 |
| 0000510240 | 76FF | FF06 | F476 | 468D | 16F8 | 9A50 | D154 | 0000 |
| 0000510260 | 4689 | 83F6 | F67E | 7500 | E903 | 0006 | 468B | E9F6 |
| 0000510300 | 001C | C02B | 00B9 | 0180 | 064E | 0015 | B900 | 95ED |
| 0000510320 | E0D3 | 4601 | E908 | FF73 | 00B8 | E900 | 0000 | 5F5E |
| 0000510340 | ED83 | 8B02 | 1FE5 | 4D5D | 1ECB | 9058 | 5545 | EC8B |
| 0000510360 | 8E1E | 81D8 | 0CEC | 5700 | 6A56 | 6A00 | 8D00 | 0E46 |
| 0000510400 | 5016 | 026A | 8168 | 8E00 | FE06 | 2631 | 36FF | 0D04 |
| 0000510420 | A59A | 00D3 | 8900 | F646 | 7E83 | 00F6 | 0375 | 06E9 |
| 0000510440 | 8B00 | F646 | C3E9 | 8300 | 0C7E | 7600 | E903 | 0009 |
| 0000510460 | 7E83 | FF0A | 0377 | 0FE9 | 8300 | 067E | 7500 | E903 |
| 0000510500 | 0006 | 03B8 | E900 | 00A2 | 468B | 8B0A | 0C56 | 4689 |
| 0000510520 | 89FA | FC56 | 09E9 | 8100 | FA6E | 8000 | 5E83 | 00FC |
| 0000510540 | 7E83 | 00FC | 037D | 7BE9 | 7E00 | E903 | 0009 | 7E83 |
| 0000510560 | 00FA | 0377 | 6DE9 | 8300 | FC7E | 7D00 | E903 | 0017 |
| 0000510600 | 037E | 0AE9 | 8100 | FA7E | 8000 | 0373 | 08E9 | C700 |
| 0000510620 | F446 | 4000 | 09E9 | 8B00 | FA46 | D140 | 89E8 | F446 |
| 0000510640 | 068E | 31FE | FF26 | 0436 | FF0D | 0876 | 76FF | FF06 |
| 0000510660 | F476 | 468D | 16F8 | 9A50 | D312 | 0000 | 4689 | 83F6 |
| 0000510700 | F67E | 7500 | E903 | 0006 | 468B | E9F6 | 001C | C02B |
| 0000510720 | 00B9 | 0180 | 064E | 0015 | B900 | D46E | E0D3 | 4601 |
| 0000510740 | E908 | FF73 | 00B8 | E900 | 0000 | 5F5E | ED83 | 8B02 |
| 0000510760 | 1FE5 | 4D5D | 1ECB | 9058 | 5545 | EC8B | 8E1E | 81D8 |
| 0000511000 | 24EC | 5700 | C456 | 0E5E | 8B26 | 0447 | 5EC4 | 260E |
| 0000511020 | 072B | F740 | B026 | C130 | 03E8 | 4689 | C4F0 | 0E5E |
| 0000511040 | 8B26 | 0647 | 5EC4 | 260E | 472B | 4002 | 4689 | A1F2 |
| 0000511060 | 30B2 | 168B | 30B4 | EAD1 | D8D1 | EAD1 | D8D1 | EAD1 |
| 0000511100 | D8D1 | 463B | 74F0 | E903 | 002F | 468B | F7F2 | F06E |
| 0000511120 | 4689 | 89DC | DE56 | 76FF | FF0C | 0A76 | 76FF | FFDE |
| 0000511140 | DC76 | 76FF | FF08 | 0676 | 7D9A | 5BD3 | 83D2 | 0CC4 |
| 0000511160 | 4689 | 8BE4 | E446 | E3E9 | 8B02 | F046 | 9940 | C22B |
| 0000511200 | F8D1 | 4689 | 6AF8 | FFD0 | B036 | C430 | 0E5E | 8B26 |
| 0000511220 | 9907 | 5052 | 909A | 56A1 | FFD6 | B436 | FF30 | B236 |
| 0000511240 | C430 | 0E5E | C88B | 8B26 | 0247 | DA8B | 5299 | 8B50 |
| 0000511260 | 8BF1 | 9AFB | A190 | D6F0 | F003 | FA13 | 7601 | 110A |
| 0000511300 | 0C7E | 7E83 | 0006 | 0375 | 06E9 | B800 | 0003 | 8BE9 |
| 0000511320 | 8302 | F27E | 7500 | E903 | 0009 | 7E83 | 00F0 | 0374 |
| 0000511340 | 06E9 | B800 | 0000 | 73E9 | 8302 | F27E | 7D00 | E903 |
| 0000511360 | 0009 | 7E83 | 00F0 | 037C | 06E9 | B800 | 0001 | 5BE9 |
| 0000511400 | 6A02 | 6A00 | 8D00 | 0A46 | 5016 | 026A | 8168 | 8E00 |
| 0000511420 | FE06 | 2631 | 36FF | 0D04 | 009A | 00D8 | 8900 | E446 |
| 0000511440 | 7E83 | 00E4 | 0375 | 06E9 | 8B00 | E446 | 2DE9 | 8B02 |
| 0000511460 | F246 | 6EF7 | 89F0 | F446 | 5689 | 6AF6 | 6A01 | 8B00 |
| 0000511500 | F446 | 568B | 2DF6 | 0001 | DA83 | 5200 | 9A50 | A0F6 |
| 0000511520 | D758 | 8940 | E046 | 46C7 | 00E6 | C700 | E246 | 0000 |
| 0000511540 | 03E9 | FF00 | E246 | 468B | 39E0 | E246 | 0372 | E5E9 |
| 0000511560 | 8301 | F67E | 7D00 | E903 | 001B | 037E | 09E9 | 8300 |
| 0000511600 | F47E | 77FF | E903 | 000D | 46C7 | 00EC | C700 | EE46 |
| 0000511620 | 0001 | 0CE9 | 8B00 | F446 | 568B | 89F6 | EC46 | 5689 |
| 0000511640 | 8BEE | F046 | 5299 | 8B50 | EC46 | 568B | 2BEE | E646 |
| 0000511660 | DA83 | 5200 | 9A50 | A0F6 | D774 | 4689 | 8BFA | F046 |
| 0000511700 | 5299 | 8B50 | EC46 | 568B | 2BEE | E646 | DA83 | 5200 |
| 0000511720 | 9A50 | C994 | D60B | 4689 | 8BFC | F046 | 462B | 89FC |
| 0000511740 | E646 | 46C7 | 00EA | E900 | 0003 | 46FF | 8BEA | FA46 |
| 0000511760 | 4639 | 72EA | E903 | 0081 | 068E | 31FE | FF26 | 0436 |
| 0000512000 | FF0D | 0876 | 76FF | FF06 | F876 | 468D | 16E8 | 9A50 |

THU MAR 14 17:25:16 1991 CRV_IPS.DLL PAGE 180, LINE 10562

| | | | | | | | | |
|---|---|---|---|---|---|---|---|---|
| 0000512020 | D83D | 0000 | 4689 | 83E4 | E47E | 7500 | E903 | 0006 |
| 0000512040 | 468B | E9E4 | 0136 | 468B | 99F0 | DB2B | C88B | 4E01 |
| 0000512060 | 1306 | B9DA | D862 | E3D3 | 5E01 | A108 | 30B2 | 168B |
| 0000512100 | 30B4 | 4601 | 110A | 0C56 | 006A | 006A | 468D | 160A |
| 0000512120 | 6A50 | 6802 | 0081 | 068E | 31FE | FF26 | 0436 | 9A0D |
| 0000512140 | D8D5 | 0000 | 4689 | 83E4 | E47E | 7500 | E903 | 0006 |
| 0000512160 | 468B | E9E4 | 00E6 | 71E9 | 83FF | FC7E | 7700 | E903 |
| 0000512200 | 00C9 | 068E | 31FE | FF26 | 0436 | FF0D | 0876 | 76FF |
| 0000512220 | 8B06 | FC46 | E8D1 | 8D50 | E846 | 5016 | 849A | 00D8 |
| 0000512240 | 8900 | E446 | 7E83 | 00E4 | 0375 | 06E9 | 8B00 | E446 |
| 0000512260 | A9E9 | 8B00 | FC46 | D22B | DB2B | C88B | 4E01 | 1306 |
| 0000512300 | B9DA | D8A9 | E3D3 | 5E01 | 8E08 | FE06 | 2631 | 36FF |
| 0000512320 | 0D04 | 76FF | FF08 | 0676 | 468B | D1E6 | 50E8 | 468D |
| 0000512340 | 16E8 | 9A5C | D44C | 0000 | 4689 | 83E4 | E47E | 7500 |
| 0000512360 | E903 | 0006 | 468B | E9E4 | 0062 | 468B | 2BE6 | 2BD2 |
| 0000512400 | 8BDB | 01C8 | 064E | DA13 | 7AB9 | D3D5 | 01E3 | 085E |
| 0000512420 | B2A1 | 8B30 | B416 | 0130 | 0A46 | 5611 | 8E00 | 6A00 |
| 0000512440 | 8D00 | 0A46 | 5016 | 026A | 8168 | 8E00 | FE06 | 2631 |
| 0000512460 | 36FF | 0D04 | B19A | 00D4 | 8900 | E446 | 7E83 | 00E4 |
| 0000512500 | 0375 | 06E9 | 8B00 | E446 | 11E9 | 8300 | F46E | 8300 |
| 0000512520 | F65E | E901 | FE0D | 00B8 | E900 | 0000 | 5F5E | ED83 |
| 0000512540 | 8B02 | 1FE5 | 4D5D | 1ECB | 9058 | 5545 | EC8B | 8E1E |
| 0000512560 | 81D8 | 24EC | 5700 | C456 | 0E5E | 8B26 | 0447 | 5EC4 |
| 0000512600 | 260E | 072B | F740 | B026 | C130 | 03E8 | 4689 | 8BF0 |
| 0000512620 | F046 | 9940 | C22B | F8D1 | 4689 | C4F8 | 0E5E | 8B26 |
| 0000512640 | 0647 | 5EC4 | 260E | 472B | 4002 | 4689 | A1F2 | 30B2 |
| 0000512660 | 168B | 30B4 | EAD1 | D8D1 | EAD1 | D8D1 | EAD1 | D8D1 |
| 0000512700 | 463B | 74F0 | E903 | 002F | 468B | F7F2 | F06E | 4689 |
| 0000512720 | 89DC | DE56 | 76FF | FF0C | 0A76 | 76FF | FFDE | DC76 |
| 0000512740 | 76FF | FF08 | 0676 | 899A | 37D4 | 83D6 | 0CC4 | 4689 |
| 0000512760 | 8BE4 | E446 | D7E9 | 6A02 | FF00 | B036 | C430 | 0E5E |
| 0000513000 | 8B26 | 9907 | 5052 | 909A | C8A1 | FFD9 | B436 | FF30 |
| 0000513020 | B236 | C430 | 0E5E | C88B | 8B26 | 0247 | DA8B | 5299 |
| 0000513040 | 8B50 | 8BF1 | 9AFB | A190 | DA62 | F003 | FA13 | 7601 |
| 0000513060 | 110A | 0C7E | 7E83 | 0006 | 0375 | 06E9 | B800 | 0003 |
| 0000513100 | 8BE9 | 8302 | F27E | 7500 | E903 | 0009 | 7E83 | 00F0 |
| 0000513120 | 0374 | 06E9 | B800 | 0000 | 73E9 | 8302 | F27E | 7D00 |
| 0000513140 | E903 | 0009 | 7E83 | 00F0 | 037C | 06E9 | B800 | 0001 |
| 0000513160 | 5BE9 | 6A02 | 6A00 | 8D00 | 0A46 | 5016 | 026A | 8168 |
| 0000513200 | 8E00 | FE06 | 2631 | 36FF | 0D04 | 729A | 00DB | 8900 |
| 0000513220 | E446 | 7E83 | 00E4 | 0375 | 06E9 | 8B00 | E446 | 2DE9 |
| 0000513240 | 8B02 | F246 | 6EF7 | 89F0 | F446 | 5689 | 6AF6 | 6A01 |
| 0000513260 | 8B00 | F446 | 568B | 2DF6 | 0001 | DA83 | 5200 | 9A50 |
| 0000513300 | A0F6 | DACA | 8940 | E046 | 46C7 | 00E6 | C700 | E246 |
| 0000513320 | 0000 | 03E9 | FF00 | E246 | 468B | 39E0 | E246 | 0372 |
| 0000513340 | E5E9 | 8301 | F67E | 7D00 | E903 | 001B | 037E | 09E9 |
| 0000513360 | 8300 | F47E | 77FF | E903 | 000D | 46C7 | 00EC | C700 |
| 0000513400 | EE46 | 0001 | 0CE9 | 8B00 | F446 | 568B | 89F6 | EC46 |
| 0000513420 | 5689 | 8BEE | F046 | 5299 | 8B50 | EC46 | 568B | 2BEE |
| 0000513440 | E646 | DA83 | 5200 | 9A50 | A0F6 | DAE6 | 4689 | 8BFA |
| 0000513460 | F046 | 5299 | 8B50 | EC46 | 568B | 2BEE | E646 | DA83 |
| 0000513500 | 5200 | 9A50 | C994 | D989 | 4689 | 8BFC | F046 | 462B |
| 0000513520 | 89FC | E646 | 46C7 | 00EA | E900 | 0003 | 46FF | 8BEA |
| 0000513540 | FA46 | 4639 | 72EA | E903 | 0081 | 068E | 31FE | FF26 |
| 0000513560 | 0436 | FF0D | 0876 | 76FF | FF06 | F876 | 468D | 16E8 |
| 0000513600 | 9A50 | DBAF | 0000 | 4689 | 83E4 | E47E | 7500 | E903 |
| 0000513620 | 0006 | 468B | E9E4 | 0136 | 468B | 99F0 | DB2B | C88B |
| 0000513640 | 4E01 | 1306 | B9DA | DBD4 | E3D3 | 5E01 | A108 | 30B2 |
| 0000513660 | 168B | 30B4 | 4601 | 110A | 0C56 | 006A | 006A | 468D |

THU MAR 14 17:25:16 1991 CRV_IPS.DLL PAGE 181, LINE 10621

| | | | | | | | | |
|---|---|---|---|---|---|---|---|---|
| 0000513700 | 160A | 6A50 | 6802 | 0081 | 068E | 31FE | FF26 | 0436 |
| 0000513720 | 9A0D | DC47 | 0000 | 4689 | 83E4 | E47E | 7500 | E903 |
| 0000513740 | 0006 | 468B | E9E4 | 00E6 | 71E9 | 83FF | FC7E | 7700 |
| 0000513760 | E903 | 00C9 | 068E | 31FE | FF26 | 0436 | FF0D | 0876 |
| 0000514000 | 76FF | 8B06 | FC46 | E8D1 | 8D50 | E846 | 5016 | F69A |
| 0000514020 | 00DB | 8900 | E446 | 7E83 | 00E4 | 0375 | 06E9 | 8B00 |
| 0000514040 | E446 | A9E9 | 8B00 | FC46 | D22B | DB2B | C88B | 4E01 |
| 0000514060 | 1306 | B9DA | DC1B | E3D3 | 5E01 | 8E08 | FE06 | 2631 |
| 0000514100 | 36FF | 0D04 | 76FF | FF08 | 0676 | 468B | D1E6 | 50E8 |
| 0000514120 | 468D | 16E8 | 9A50 | D558 | 0000 | 4689 | 83E4 | E47E |
| 0000514140 | 7500 | E903 | 0006 | 468B | E9E4 | 0062 | 468B | 2BE6 |
| 0000514160 | 2BD2 | 8BDB | 01C8 | 064E | DA13 | D4B9 | D3D7 | 01E3 |
| 0000514200 | 085E | B2A1 | 8B30 | B416 | 0130 | 0A46 | 5611 | 6A0C |
| 0000514220 | 6A00 | 8D00 | 0A46 | 5016 | 026A | 8168 | 8E00 | FE06 |
| 0000514240 | 2631 | 36FF | 0D04 | B99A | 00D6 | 8900 | E446 | 7E83 |
| 0000514260 | 00E4 | 0375 | 06E9 | 8B00 | E446 | 11E9 | 8300 | F46E |
| 0000514300 | 8300 | F65E | E901 | FE0D | 00B8 | E900 | 0000 | 5F5E |
| 0000514320 | ED83 | 8B02 | 1FE5 | 4D5D | 1ECB | 9058 | 5545 | EC8B |
| 0000514340 | 8E1E | 81D8 | 06EC | 5700 | 1E56 | B668 | 9A30 | 942C |
| 0000514360 | DCA5 | C483 | 0B04 | 74D0 | E903 | 0020 | 76FF | FF08 |
| 0000514400 | 0676 | EA9A | C2E5 | 83DC | 04C4 | 4689 | 83FC | FC7E |
| 0000514420 | 7500 | E903 | 0006 | 468B | E9FC | 008F | 0068 | 9A08 |
| 0000514440 | 8ECE | DCF9 | C483 | A302 | 563E | 1689 | 5640 | 40A1 |
| 0000514460 | 0B56 | 3E06 | 7456 | E903 | 0006 | 02B8 | E900 | 006B |
| 0000514500 | 681E | 30A8 | 3B9A | 005E | 6A00 | 6A00 | 6800 | 0800 |
| 0000514520 | 36FF | 5640 | 36FF | 563E | 0168 | 68DD | FFFF | 989A |
| 0000514540 | 17C7 | 83DD | [illegible]C4 | 7440 | E903 | 0016 | 36FF | 5640 |
| 0000514560 | 36FF | 563E | D89A | A98E | 83D9 | 04C4 | 02B8 | E900 |
| 0000514600 | 0029 | 681E | 30A8 | 006A | 6068 | 9AEA | 9641 | 0000 |
| 0000514620 | 4689 | 83FA | FA7E | 7400 | E903 | 0009 | 00B8 | E900 |
| 0000514640 | 0009 | 06E9 | B800 | 0002 | 00E9 | 5E00 | 835F | 02ED |
| 0000514660 | E58B | 5D1F | CB4D | 581E | 4590 | 8B55 | 1EEC | D88E |
| 0000514700 | EC81 | 010E | 5657 | 681E | 30A8 | 479A | 00DE | C700 |
| 0000514720 | 7686 | 01FF | 8300 | 76BE | 00FF | 0375 | 3EE9 | 8D02 |
| 0000514740 | F486 | 16FE | 6A50 | 6A00 | 6A00 | 6800 | 0081 | 068E |
| 0000514760 | 31FE | FF26 | 0436 | 9A0D | DA2B | 0000 | 003D | 7500 |
| 0000515000 | E903 | 0005 | CF9A | B1E5 | 8DDD | FC46 | 5016 | 089A |
| 0000515020 | C7CE | 83DD | 04C4 | 8689 | FF78 | BE83 | FF78 | 7500 |
| 0000515040 | E903 | 0005 | CF9A | E6E5 | 8BDD | FC46 | E8C1 | 2404 |
| 0000515060 | 8807 | F486 | 8AFE | F486 | 2AFE | E9E4 | 01A9 | 468D |
| 0000515100 | 16FC | 9A50 | CE08 | DDFC | C483 | 8904 | 7886 | 83FF |
| 0000515120 | 78BE | 00FF | 0375 | 05E9 | 9A00 | E5CF | DE20 | BE80 |
| 0000515140 | FEF4 | 7505 | E903 | 000D | 868A | FEF4 | 4632 | 25FC |
| 0000515160 | 0007 | 4631 | 81FC | FC66 | FF7F | 76FF | 9AFC | CD49 |
| 0000515200 | DE36 | C483 | 8902 | 7886 | 83FF | 78BE | 00FF | 0375 |
| 0000515220 | 05E9 | 9A00 | E5CF | DE64 | BE80 | FEF4 | 7407 | E903 |
| 0000515240 | 000C | 681E | 30AC | 539A | 00DE | E900 | 0009 | 681E |
| 0000515260 | 309C | 879A | 0096 | 8000 | F4BE | 00FE | 0374 | 05E9 |
| 0000515300 | 9A00 | E5CF | DE78 | 51E9 | 6A01 | 68C0 | 0820 | 026A |
| 0000515320 | 468D | 16FA | 9A50 | CF95 | DE92 | C483 | 890A | 7886 |
| 0000515340 | 6AFF | 68C0 | 0840 | 8068 | 8D00 | 7A86 | 16FF | 9A50 |
| 0000515360 | CF95 | DEAC | C483 | 890A | 7886 | 6AFF | 68C0 | 0C40 |
| 0000515400 | 8068 | 8D00 | F686 | 16FE | 9A50 | CF29 | DEC5 | C483 |
| 0000515420 | 890A | 7886 | 6AFF | 68C0 | 0830 | 026A | 868D | FEF2 |
| 0000515440 | 5016 | 299A | 90CF | 83DC | 0AC4 | 8689 | FF78 | 468D |
| 0000515460 | 16FC | 9A50 | CE08 | DEEC | C483 | 8904 | 7886 | 83FF |
| 0000515500 | 78BE | 00FF | 0375 | 05E9 | 9A00 | E5CF | DF05 | 6681 |
| 0000515520 | 7FFC | 8BFF | FC46 | F925 | 0DFF | 0001 | 4689 | FFFC |
| 0000515540 | FC76 | 499A | 1BCD | 83DF | 02C4 | 8689 | FF78 | BE83 |

THU MAR 14 17:25:16 1991 CRV_IPS.DLL PAGE 182, LINE 10680

| | | | | | | | | |
|---|---|---|---|---|---|---|---|---|
| 0000515560 | FF78 | 7500 | E903 | 0005 | CF9A | 3AE5 | E9DF | 009A |
| 0000515600 | 86C7 | FF76 | 0000 | 681E | 309C | 7D9A | 00DF | E900 |
| 0000515620 | 0088 | 468D | 16FC | 9A50 | CE08 | DF50 | C483 | 8904 |
| 0000515640 | 7886 | 83FF | 78BE | 00FF | 0375 | 05E9 | 9A00 | E5CF |
| 0000515660 | DF60 | 6683 | F8FC | 4E83 | 08FC | 76FF | 9AFC | CD49 |
| 0000515700 | DF76 | C483 | 8902 | 7886 | 83FF | 78BE | 00FF | 0375 |
| 0000515720 | 05E9 | 9A00 | E5CF | DFC8 | 681E | 309C | 6B9A | 00DD |
| 0000515740 | E900 | 0036 | 33E9 | 3D00 | 0005 | 037E | 18E9 | 3D00 |
| 0000515760 | 0004 | 037C | 47E9 | 0BFE | 75C0 | E903 | FE40 | 7548 |
| 0000516000 | E903 | FEC5 | 8BE9 | 2DFF | 0007 | 0375 | 2FE9 | 2DFE |
| 0000516020 | 00F8 | 0375 | 69E9 | E9FF | FF78 | B8E9 | FFFD | 4036 |
| 0000516040 | FF56 | 3E36 | 9A56 | 8ED8 | DFD0 | C483 | 9A04 | C879 |
| 0000516060 | DDA7 | 5F5E | ED83 | 8B02 | 1FE5 | 4D5D | 1ECB | 9058 |
| 0000516100 | 5545 | EC8B | 8E1E | 81D8 | 0AEC | 5700 | 8056 | 0C7E |
| 0000516120 | 7680 | E903 | 0009 | 7E80 | 8012 | 0377 | 06E9 | B800 |
| 0000516140 | 0001 | 1CE9 | 6A01 | 68C0 | 1450 | 468A | 2A0C | 50E4 |
| 0000516160 | 76FF | FF0A | 0876 | 299A | 47CF | 83E0 | 0AC4 | 4689 |
| 0000516200 | 83FA | FA7E | 7500 | E903 | 0006 | 468B | E9FA | 00F1 |
| 0000516220 | 681E | 30AC | E59A | 00DC | 6A00 | 6AC0 | 6A00 | 8D02 |
| 0000516240 | 0646 | 5016 | 299A | 66CF | 83E0 | 0AC4 | 4689 | 83FA |
| 0000516260 | FA7E | 7500 | E903 | 0006 | 468B | E9FA | 00C3 | 468D |
| 0000516300 | 16FC | 9A50 | CE08 | E093 | C483 | 8904 | FA46 | 7E83 |
| 0000516320 | 00FA | 0375 | 06E9 | 8B00 | FA46 | A4E9 | 8B00 | FC46 |
| 0000516340 | FE25 | 0DFF | 0006 | 4689 | 83FC | FC4E | FF08 | FC76 |
| 0000516360 | 499A | DECD | 83E0 | 02C4 | 4689 | 83FA | FA7E | 7500 |
| 0000516400 | E903 | 0006 | 468B | E9FA | 0077 | 681E | 30AC | 006A |
| 0000516420 | 1068 | 9A27 | DD2C | 0000 | 4689 | 83F8 | F87E | 7500 |
| 0000516440 | E903 | 0006 | 02B8 | E900 | 0057 | C06A | 5068 | 8A18 |
| 0000516460 | 1246 | E42A | FF50 | 1076 | 76FF | 9A0E | CF95 | DED6 |
| 0000516500 | C483 | 890A | FA46 | 7E83 | 00FA | 0375 | 06E9 | 8B00 |
| 0000516520 | FA46 | 2CE9 | 6A00 | 68C0 | 1440 | 026A | 468D | 16F6 |
| 0000516540 | 9A50 | CF95 | E019 | C483 | 890A | FA46 | 7E83 | 00FA |
| 0000516560 | 0375 | 06E9 | 8B00 | FA46 | 06E9 | 8B00 | F646 | 00E9 |
| 0000516600 | 5E00 | 835F | 02ED | E58B | 5D1F | CB4D | 581E | 4590 |
| 0000516620 | 8B55 | 1EEC | D88E | EC81 | 0006 | 5657 | 7E80 | 800C |
| 0000516640 | 0377 | 06E9 | B800 | 0001 | 92E9 | 6A00 | 6AC0 | 8A20 |
| 0000516660 | 0C46 | E42A | FF50 | 0A76 | 76FF | 9A08 | CF29 | E183 |
| 0000516700 | C483 | 890A | FA46 | 7E83 | 00FA | 0375 | 06E9 | 8B00 |
| 0000516720 | FA46 | 68E9 | 6A00 | 6AC0 | 6A00 | 8D02 | 0646 | 5016 |
| 0000516740 | 299A | A2CF | 83E1 | 0AC4 | 4689 | 83FA | FA7E | 7500 |
| 0000516760 | E903 | 0006 | 468B | E9FA | 0043 | 468D | 16FC | 9A50 |
| 0000517000 | CE08 | E1CF | C483 | 8904 | FA46 | 7E83 | 00FA | 0375 |
| 0000517020 | 06E9 | 8B00 | FA46 | 24E9 | 8B00 | FC46 | FB25 | 0DFF |
| 0000517040 | 0003 | 4689 | 83FC | FC4E | FF08 | FC76 | 499A | 04CD |
| 0000517060 | 83E1 | 02C4 | 4689 | 8BFA | FA46 | 00E9 | 5E00 | 835F |
| 0000517100 | 02ED | E58B | 5D1F | CB4D | 581E | 4590 | 8B55 | 1EEC |
| 0000517120 | D88E | EC81 | 0008 | 5657 | C06A | 2068 | 8A04 | 0A46 |
| 0000517140 | E42A | FF50 | 0876 | 76FF | 9A06 | CF95 | E231 | C483 |
| 0000517160 | 890A | FA46 | 7E83 | 00FA | 0375 | 06E9 | 8B00 | FA46 |
| 0000517200 | 73E9 | 6A00 | 6AC0 | 6A10 | 8D02 | F846 | 5016 | 959A |
| 0000517220 | 50CF | 83E2 | 0AC4 | 4689 | 83FA | FA7E | 7500 | E903 |
| 0000517240 | 0006 | 468B | E9FA | 004E | 468D | 16FC | 9A50 | CE08 |
| 0000517260 | E279 | C483 | 8904 | FA46 | 7E83 | 00FA | 0375 | 06E9 |
| 0000517300 | 8B00 | FA46 | 2FE9 | 8B00 | FC46 | FD25 | 0DFF | 0005 |
| 0000517320 | 4689 | FFFC | FC76 | 499A | 5ECD | 83E1 | 02C4 | 4689 |
| 0000517340 | 83FA | FA7E | 7500 | E903 | 0006 | 468B | E9FA | 0006 |
| 0000517360 | 468B | E9F8 | 0000 | 5F5E | ED83 | 8B02 | 1FE5 | 4D5D |
| 0000517400 | 1ECB | 9058 | 5545 | EC8B | 8E1E | 81D8 | 06EC | 5700 |
| 0000517420 | 8D56 | FC46 | 5016 | 089A | E0CE | 83E2 | 04C4 | 4689 |

THU MAR 14 17:25:16 1991 CRV_IPS.DLL PAGE 183, LINE 10739

| | | | | | | | | |
|---|---|---|---|---|---|---|---|---|
| 0000517440 | 83FA | FA7E | 7500 | E903 | 0006 | 468B | E9FA | 0053 |
| 0000517460 | 4E81 | 00FC | 8180 | FC4E | 4000 | 76FF | 9AFC | CD49 |
| 0000517500 | E2F8 | C483 | 8902 | FA46 | 0068 | 68C0 | 0080 | 026A |
| 0000517520 | 468D | 16FC | 9A50 | CF95 | E315 | C483 | 890A | FA46 |
| 0000517540 | 6681 | FFFC | 68EF | C000 | 8068 | 6A00 | 8D02 | FC46 |
| 0000517560 | 5016 | 299A | 0CCF | 83E2 | 0AC4 | 4689 | 8BFA | FA46 |
| 0000517600 | 00E9 | 5E00 | 835F | 02ED | E58B | 5D1F | CB4D | 581E |
| 0000517620 | 4590 | 8B55 | 1EEC | D88E | EC81 | 0006 | 5657 | 0068 |
| 0000517640 | 68C0 | 0080 | 026A | 468D | 16FC | 9A50 | CF95 | E2B9 |
| 0000517660 | C483 | 890A | FA46 | 4E81 | 00FC | 6810 | C000 | 8068 |
| 0000517700 | 6A00 | 8D02 | FC46 | 5016 | 299A | 7BCF | 83E3 | 0AC4 |
| 0000517720 | 4689 | 8DFA | FC46 | 5016 | 089A | A2CE | 83E3 | 04C4 |
| 0000517740 | 4689 | 83FA | FA7E | 7500 | E903 | 0006 | 468B | E9FA |
| 0000517760 | 001E | 6681 | FFFC | 817F | FC66 | BFFF | 76FF | 9AFC |
| 0000520000 | CD49 | E34E | C483 | 8902 | FA46 | 468B | E9FA | 0000 |
| 0000520020 | 5F5E | ED83 | 8B02 | 1FE5 | 4D5D | 1ECB | 9058 | 5545 |
| 0000520040 | EC8B | 8E1E | 81D8 | 04EC | 5700 | 6856 | C000 | 006A |
| 0000520060 | 026A | 468D | 1606 | 9A50 | CF29 | E400 | C483 | 890A |
| 0000520100 | FC46 | 7E83 | 00FC | 0375 | 06E9 | 8B00 | FC46 | D3E9 |
| 0000520120 | 6801 | C000 | 106A | 026A | 468D | 1608 | 9A50 | CF29 |
| 0000520140 | E426 | C483 | 890A | FC46 | 7E83 | 00FC | 0375 | 06E9 |
| 0000520160 | 8B00 | FC46 | ADE9 | 6801 | C000 | 206A | 026A | 468D |
| 0000520200 | 160A | 9A50 | CF29 | E44C | C483 | 890A | FC46 | 7E83 |
| 0000520220 | 00FC | 0375 | 06E9 | 8B00 | FC46 | 87E9 | 6801 | C000 |
| 0000520240 | 306A | 026A | 468D | 160C | 9A50 | CF29 | E472 | C483 |
| 0000520260 | 890A | FC46 | 7E83 | 00FC | 0375 | 06E9 | 8B00 | FC46 |
| 0000520300 | 61E9 | 6801 | C000 | 406A | 026A | 468D | 160E | 9A50 |
| 0000520320 | CF29 | E498 | C483 | 890A | FC46 | 7E83 | 00FC | 0375 |
| 0000520340 | 06E9 | 8B00 | FC46 | 3BE9 | 6801 | C000 | 506A | 026A |
| 0000520360 | 468D | 1610 | 9A50 | CF29 | E4BE | C483 | 890A | FC46 |
| 0000520400 | 7E83 | 00FC | 0375 | 06E9 | 8B00 | FC46 | 15E9 | 6801 |
| 0000520420 | C000 | 606A | 026A | 468D | 1612 | 9A50 | CF29 | E4E4 |
| 0000520440 | C483 | 890A | FC46 | 7E83 | 00FC | 0375 | 06E9 | 8B00 |
| 0000520460 | FC46 | EFE9 | 6800 | C000 | 706A | 026A | 468D | 1614 |
| 0000520500 | 9A50 | CF29 | E50B | C483 | 890A | FC46 | 7E83 | 00FC |
| 0000520520 | 0375 | 06E9 | 8B00 | FC46 | C9E9 | 6800 | C000 | 8068 |
| 0000520540 | 6A00 | 8D02 | 1646 | 5016 | 299A | 32CF | 83E5 | 0AC4 |
| 0000520560 | 4689 | 83FC | FC7E | 7500 | E903 | 0006 | 468B | E9FC |
| 0000520600 | 00A2 | 0068 | 68C0 | 0090 | 026A | 468D | 1618 | 9A50 |
| 0000520620 | CF29 | E559 | C483 | 890A | FC46 | 7E83 | 00FC | 0375 |
| 0000520640 | 06E9 | 8B00 | FC46 | 7BE9 | 6800 | C000 | B068 | 6A01 |
| 0000520660 | 8D02 | 1A46 | 5016 | 299A | 80CF | 83E5 | 0AC4 | 4689 |
| 0000520700 | 83FC | FC7E | 7500 | E903 | 0006 | 468B | E9FC | 0054 |
| 0000520720 | 0068 | 68C0 | 01E0 | 026A | 468D | 161C | 9A50 | CF29 |
| 0000520740 | E5A7 | C483 | 890A | FC46 | 7E83 | 00FC | 0375 | 06E9 |
| 0000520760 | 8B00 | FC46 | 2DE9 | 6800 | C000 | 5068 | 6A01 | 8D02 |
| 0000521000 | 1E46 | 5016 | 299A | 6BCF | 83E3 | 0AC4 | 4689 | 83FC |
| 0000521020 | FC7E | 7500 | E903 | 0006 | 468B | E9FC | 0006 | 00B8 |
| 0000521040 | E900 | 0000 | 5F5E | ED83 | 8B02 | 1FE5 | 4D5D | 1ECB |
| 0000521060 | 9058 | 5545 | EC8B | 8E1E | 81D8 | 00EC | 5700 | 5E56 |
| 0000521100 | 835F | 02ED | E58B | 5D1F | CB4D | 581E | 4590 | 8B55 |
| 0000521120 | 1EEC | D88E | EC81 | 000C | 5657 | 0068 | 9ADA | CD49 |
| 0000521140 | E61A | C483 | C702 | F446 | 000C | 0068 | 68C0 | 00B0 |
| 0000521160 | 026A | 468D | 13F4 | 9A50 | CF29 | E634 | C483 | C70A |
| 0000521200 | F446 | 0000 | 0068 | 68C0 | 00F0 | 026A | 468D | 16F4 |
| 0000521220 | 9A50 | CF29 | E63C | C483 | 9A0A | E6F3 | E641 | 709A |
| 0000521240 | 63E7 | C6E6 | FA46 | E900 | 0003 | 46FE | 80FA | FA7E |
| 0000521260 | 7212 | E903 | 008C | C06A | 006A | 246A | 681E | 30C8 |
| 0000521300 | 299A | 81CF | 83E6 | 0AC4 | 4689 | 83FC | FC7E | 7500 |

THU MAR 14 17:25:16 1991 CRV_IPS.DLL PAGE 184, LINE 10798

| | | | | | | | | |
|---|---|---|---|---|---|---|---|---|
| 0000521320 | E903 | 0006 | FFB8 | E9FF | 006E | CD6A | 006A | A49A |
| 0000521340 | 8EE7 | 83E6 | 04C4 | 468D | 16F6 | 9A50 | CE72 | E6A8 |
| 0000521360 | C483 | 8904 | FC46 | 7E83 | 00FC | 0375 | 06E9 | B800 |
| 0000521400 | FFFE | 43E9 | 9A00 | E6F3 | E6C4 | 7E81 | 5AF6 | 755A |
| 0000521420 | E903 | 0003 | 28E9 | 8A00 | FA46 | E42A | 1E50 | BA68 |
| 0000521440 | 9A30 | 7582 | E6CC | C483 | 9A06 | E730 | E6D7 | 76FF |
| 0000521460 | FF08 | 0676 | 2F9A | DAE8 | 83E3 | 04C4 | 09E9 | E900 |
| 0000521500 | FF68 | FDB8 | E9FF | 0000 | 5F5E | ED83 | 8B02 | 1FE5 |
| 0000521520 | 4D5D | 1ECB | 9058 | 5545 | EC8B | 8E1E | 81D8 | 04EC |
| 0000521540 | 5700 | 8D56 | FC46 | 5016 | 089A | 20CE | 83E7 | 04C4 |
| 0000521560 | 4E81 | 00FC | 8180 | FC4E | 4000 | 76FF | 9AFC | CD49 |
| 0000521600 | E600 | C483 | 5E02 | 835F | 02ED | E58B | 5D1F | CB4D |
| 0000521620 | 581E | 4590 | 8B55 | 1EEC | D88E | EC81 | 0006 | 5657 |
| 0000521640 | 468D | 16FC | 9A50 | CE08 | E760 | C483 | C704 | FA46 |
| 0000521660 | 4000 | 468B | F7FA | 21D0 | FC46 | 76FF | 9AFC | CD49 |
| 0000521700 | E70B | C483 | 5E02 | 835F | 02ED | E58B | 5D1F | CB4D |
| 0000521720 | 581E | 4590 | 8B55 | 1EEC | D88E | EC81 | 0004 | 5657 |
| 0000521740 | 46C7 | 01FC | 6800 | 0400 | 006A | 026A | 468D | 16FC |
| 0000521760 | 9A50 | CF29 | E748 | C483 | 5E0A | 835F | 02ED | E58B |
| 0000522000 | 5D1F | CB4D | 581E | 4590 | 8B55 | 1EEC | D88E | EC81 |
| 0000522020 | 0006 | 5657 | FF6A | E068 | 6AFE | 8D04 | 0646 | 5016 |
| 0000522040 | 299A | D0CF | 83E7 | 0AC4 | 468D | 16FC | 9A50 | CE08 |
| 0000522060 | E7F2 | C483 | C704 | FA46 | 8000 | 468B | F7FA | 21D0 |
| 0000522100 | FC46 | 4E81 | 00FC | 8101 | FC4E | 0200 | 76FF | 9AFC |
| 0000522120 | CD49 | E794 | C483 | 5E02 | 835F | 02ED | E58B | 5D1F |
| 0000522140 | CB4D | 581E | 4590 | 8B55 | 1EEC | D88E | EC81 | 0000 |
| 0000522160 | 5657 | 76FF | FF08 | 0676 | 681E | 30EC | 829A | C375 |
| 0000522200 | 83E7 | 08C4 | 5F5E | ED83 | 8B02 | 1FE5 | 4D5D | 1ECB |
| 0000522220 | 9058 | 5545 | EC8B | 8E1E | 81D8 | 58EC | 5700 | 1E56 |
| 0000522240 | FB68 | FF30 | 0876 | 76FF | 9A06 | 74CE | E8E4 | C483 |
| 0000522260 | 8908 | EE46 | 5689 | 8BF0 | F046 | 460B | 74EE | E903 |
| 0000522300 | 00D1 | 46C7 | 01FA | C700 | EC46 | 0000 | 03E9 | FF00 |
| 0000522320 | EC46 | 5EC4 | 8B06 | EC76 | 8026 | 0038 | 0375 | 17E9 |
| 0000522340 | C400 | 065E | 768B | 26EC | 3880 | 742E | E903 | 0005 |
| 0000522360 | 46C7 | 00FA | E900 | FFD7 | 7E83 | 00FA | 0375 | 92E9 |
| 0000522400 | C400 | 065E | 768B | 26EC | 00C6 | 8B2E | EC5E | 76C4 |
| 0000522420 | 2606 | 40C6 | 6F01 | 5E8B | C4EC | 0676 | C626 | 0240 |
| 0000522440 | 8B75 | EC5E | 76C4 | 2606 | 40C6 | 7403 | 5E8B | C4EC |
| 0000522460 | 0676 | C626 | 0440 | 1E00 | FE6B | FF30 | 0876 | 76FF |
| 0000522500 | 9A06 | 74CE | E928 | C483 | 8908 | EE46 | 5689 | 8BF0 |
| 0000522520 | F046 | 460B | 74EE | E903 | 0039 | 5E8B | C4EC | 0676 |
| 0000522540 | C626 | 0140 | 8B6F | EC5E | 76C4 | 2606 | 40C6 | 6202 |
| 0000522560 | 5E8B | C4EC | 0676 | C626 | 0340 | 1E6A | 0168 | FF31 |
| 0000522600 | 0876 | 76FF | 9A06 | 74CE | E945 | C483 | 8908 | EE46 |
| 0000522620 | 5689 | 8BF0 | F046 | 460B | 74EE | E903 | 0015 | 681E |
| 0000522640 | 3104 | 029A | 63E8 | 83E9 | 04C4 | FCB8 | E9FF | 032E |
| 0000522660 | 02E9 | 6803 | C000 | 0068 | 6A01 | 8D02 | C446 | 5016 |
| 0000522700 | 959A | 81CF | 83E9 | 0AC4 | 468B | 0DC4 | C800 | 4689 |
| 0000522720 | 68F8 | C000 | 0068 | 6A01 | 8D02 | F846 | 5016 | 299A |
| 0000522740 | B1CF | 83E9 | 0AC4 | 468D | 89B0 | A846 | 568C | 8DAA |
| 0000522760 | CA46 | 4689 | 8CAC | AE56 | 46C7 | 14F6 | FF00 | F076 |
| 0000523000 | 76FF | 6AEE | FF01 | F676 | 76FF | FFAA | A876 | EC9A |
| 0000523020 | C5C5 | 83E9 | 0CC4 | 003D | 7400 | E903 | 000F | 681E |
| 0000523040 | 3113 | 029A | DEE8 | 83E9 | 04C4 | 88E9 | 8102 | B07C |
| 0000523060 | 0090 | 0375 | 0FE9 | 1E00 | 2768 | 9A31 | E802 | EA0B |
| 0000523100 | C483 | E904 | 026F | 468B | 89C0 | F246 | 46C7 | 00F4 |
| 0000523120 | 8B00 | F446 | 460B | 74F2 | E903 | 0017 | C02B | 4689 |
| 0000523140 | 89EA | E846 | 681E | 3135 | 829A | 3375 | 83EA | 04C4 |
| 0000523160 | 3CE9 | 8300 | C07E | 751C | E903 | 0003 | 36E9 | FF02 |

THU MAR 14 17:25:16 1991 CRV_IPS.DLL PAGE 185, LINE 10857

| | | | | | | | | |
|---|---|---|---|---|---|---|---|---|
| 0000523200 | F076 | 76FF | 6AEE | FF01 | C076 | 76FF | FFAE | AC76 |
| 0000523220 | EC9A | 64C5 | 83EA | 0CC4 | 003D | 7400 | E903 | 0003 |
| 0000523240 | 12E9 | 8B02 | DA46 | 568B | 89DC | E846 | 5689 | 83EA |
| 0000523260 | F246 | 8314 | F456 | C700 | F646 | 0028 | 76FF | 6AB2 |
| 0000523300 | 9A28 | 99BC | EA81 | C483 | 8904 | C646 | 5689 | C7C8 |
| 0000523320 | E646 | 0000 | 76FF | FF08 | 0676 | 681E | 3155 | 829A |
| 0000523340 | 1F75 | 83E8 | 08C4 | 7E83 | 00B2 | 0375 | BFE9 | FF01 |
| 0000523360 | B24E | 006A | 76FF | FFF4 | F276 | 76FF | FFF0 | EE76 |
| 0000523400 | A69A | CBC8 | 83EA | 0AC4 | 7440 | E903 | 0003 | A4E9 |
| 0000523420 | FF01 | F076 | 76FF | 6AEE | FF01 | F676 | 466B | 28E6 |
| 0000523440 | 4603 | 8BC6 | C856 | 5052 | EC9A | F5C5 | 83EA | 0CC4 |
| 0000523460 | 003D | 7400 | E903 | 0003 | 7AE9 | 6A01 | 6B00 | E676 |
| 0000523500 | C428 | C65E | FF26 | 1670 | FF26 | 1470 | 76FF | FFF0 |
| 0000523520 | EE76 | A69A | 1BC8 | 83EB | 0AC4 | 7440 | E903 | 0003 |
| 0000523540 | 52E9 | 6B01 | E676 | C428 | C65E | F626 | 0C40 | 750F |
| 0000523560 | E903 | 000F | 681E | 3166 | 029A | 35E8 | 83EB | 04C4 |
| 0000523600 | EDE9 | 6B00 | E676 | C428 | C65E | FF26 | 0E70 | FF26 |
| 0000523620 | 0C70 | CE9A | 4ECD | 83EB | 04C4 | 046A | 466B | 28E6 |
| 0000523640 | 4603 | 8BC6 | C856 | 1005 | 5200 | 9A50 | C974 | EBE9 |
| 0000523660 | 766B | 28E6 | 5EC4 | 26C6 | 408B | 2616 | 400B | 7414 |
| 0000523700 | E903 | 0011 | 766B | 28E6 | 5EC4 | 2BC6 | 26C0 | 4089 |
| 0000523720 | 2612 | 4089 | 6B10 | E676 | C428 | C65E | 8B26 | 1240 |
| 0000523740 | 0B26 | 1040 | 0375 | 87E9 | 6B00 | E676 | C428 | C65E |
| 0000523760 | 8326 | 1278 | 7D00 | E903 | 0016 | 037E | 0BE9 | 2600 |
| 0000524000 | 7881 | 8010 | 7306 | E903 | 0006 | 00B8 | E90D | 000D |
| 0000524020 | 766B | 28E6 | 5EC4 | 26C6 | 408B | D110 | 89E0 | FC46 |
| 0000524040 | 468B | D1FC | 99F8 | 766B | 28E6 | 5EC4 | 26C6 | 4029 |
| 0000524060 | 2610 | 5019 | FF12 | F076 | 76FF | 6AEE | FF01 | FC76 |
| 0000524100 | 0068 | 68EC | 0F50 | EC9A | 08C5 | 83EC | 0CC4 | 003D |
| 0000524120 | 7400 | E903 | 0006 | 5CE9 | E900 | 0011 | 76FF | 68FC |
| 0000524140 | CC29 | 5068 | 9A0F | CEAD | EC27 | C483 | E906 | FF65 |
| 0000524160 | 4683 | 28F2 | 5683 | 00F4 | 46FF | E9E6 | FE68 | 76FF |
| 0000524200 | FFF0 | EE76 | 7A9A | 3C73 | 83EC | 04C4 | 0068 | 68C0 |
| 0000524220 | 0100 | 026A | 468D | 16C4 | 9A50 | CF29 | EC4A | C483 |
| 0000524240 | FF0A | EA76 | 76FF | 9AE8 | E7A4 | E84C | C483 | B804 |
| 0000524260 | 0000 | 29E9 | FF00 | F076 | 76FF | 9AEE | 737A | EC73 |
| 0000524300 | C483 | 6804 | C000 | 0068 | 6A01 | 8D02 | C446 | 5016 |
| 0000524320 | 299A | A3CF | 83EA | 0AC4 | FBB8 | E9FF | 0000 | 5F5E |
| 0000524340 | ED83 | 8B02 | 1FE5 | 4D5D | 3ACB | 0200 | 2F00 | 016C |
| 0000524360 | 0000 | 0300 | 5F01 | 075A | 4E00 | 0300 | DB01 | 0759 |
| 0000524400 | 4F00 | 0200 | 7300 | 0264 | 0000 | 0200 | 5700 | 03CA |
| 0000524420 | 0000 | 0300 | A201 | 01C8 | 0500 | 0300 | 0801 | 0170 |
| 0000524440 | 0700 | 0300 | 9401 | 016E | 0800 | 0200 | ED00 | 0496 |
| 0000524460 | 0000 | 0300 | 2201 | 01DB | 8900 | 0300 | B001 | 01D7 |
| 0000524500 | 8A00 | 0300 | 9001 | 0295 | 0400 | 0200 | 8300 | 0596 |
| 0000524520 | 0000 | 0300 | 6501 | 0196 | 8C00 | 0300 | 2B01 | 01DF |
| 0000524540 | 8D00 | 0300 | B401 | 01E0 | 8E00 | 0300 | 1902 | 045D |
| 0000524560 | 7700 | 0300 | 3501 | 01E0 | 8F00 | 0200 | 4400 | 06B6 |
| 0000524600 | 0000 | 0300 | FA01 | 01C7 | 9100 | 0300 | 6501 | 0295 |
| 0000524620 | 0A00 | 0300 | A101 | 0295 | 0B00 | 0200 | E100 | 07EB |
| 0000524640 | 0000 | 0200 | 6F00 | 08BE | 0000 | 0500 | CF02 | 045C |
| 0000524660 | 2300 | 0300 | F901 | 0294 | 1600 | 0500 | 4601 | 01DB |
| 0000524700 | 8700 | 0300 | 6701 | 0160 | 2000 | 0500 | 9501 | 01C6 |
| 0000524720 | 8800 | 0300 | 7E01 | 019A | 2100 | 0300 | 2D01 | 01B6 |
| 0000524740 | 2200 | 0300 | 3101 | 039A | 1300 | 0300 | F201 | 0196 |
| 0000524760 | 2600 | 0500 | B902 | 045D | 3100 | 0300 | BF02 | 045B |
| 0000525000 | 9400 | 0300 | CA01 | 056A | 0C00 | 0500 | FC00 | 03DC |
| 0000525020 | 5600 | 03DD | 6101 | 0644 | 0900 | 0300 | 9801 | 01DD |
| 0000525040 | 3500 | 0300 | B501 | 056A | 1600 | 0500 | 1602 | 045D |

THU MAR 14 17:25:16 1991 CRV_IPS.DLL PAGE 186, LINE 10916

```
0000525060  3F00  0300  F501  056A  1800  0300  3701  018D
0000525100  3A00  0300  B301  075A  0B00  0300  6E01  01CC
0000525120  3B00  0300  1A01  0748  0C00  0300  A401  01A0
0000525140  3C00  0300  1B01  018B  4400  0300  5901  0644
0000525160  1E00  0300  4201  01CC  4600  0200  1302  045D
0000525200  3F00  0300  4F01  018B  4B00  0300  7701  018A
0000525220  4D00  0300  5901  075B  2500  0300  9001  072F
0000525240  2800  0300  E501  016E  5B00  0300  0802  045C
0000525260  4900  0300  0202  045E  5800  0000  0000  0000
0000525300  0000  0000  0200  0000  0000  0000  0000  0000
0000525320  0000  0000  0000  0000  0000  0000  0000  0000
*
0000525400  0000  0000  0200  0000  0000  0000  0000  0000
0000525420  0000  0000  0000  0000  0000  0000  0000  0000
*
0000525500  0000  0000  0200  0000  0000  0000  0000  0000
0000525520  0000  0000  0000  0000  0000  0000  0000  0000
*
0000525600  0000  0000  0200  0000  0000  0000  0000  0000
0000525620  0000  0000  0000  0000  0000  0000  0000  0000
*
0000526420  0000  0000  0000  0016  FEFF  F8FC  E0F0  80C0
0000526440  0000  0000  0000  0000  0000  0000  0000  0000
*
0000526640  A70A  AA1F  A702  A9FC  A700  A9FA  A86C  AC25
0000526660  A8F2  AC88  A8F0  AC86  A65B  A6AE  0000  0000
0000526700  0000  0000  0000  0000  534D  5220  6E75  542D
0000526720  6D69  2065  694C  7262  7261  2079  202D  6F43
0000526740  7970  6972  6867  2074  6328  2029  3931  3039
0000526760  202C  694D  7263  736F  666F  2074  6F43  7072
0000527000  0018  0004  0000  0007  0002  0000  0000  0000
0000527020  0000  0000  0000  0000  0000  0000  0000  0000
0000527040  0000  0000  0000  0000  0000  0000  0000  0140
0000527060  00F0  0000  6F61  2069  6177  2073  6572  6573
0000527100  0A74  0900  6966  746C  7265  7720  7361  7320
0000527120  7465  000A  6609  6C69  6574  2072  6177  2073
0000527140  6573  0A74  0900  6966  746C  7265  7720  7361
0000527160  7220  7365  7465  000A  6609  6C69  6574  2072
0000527200  6177  2073  6572  6573  0A74  0900  6966  746C
0000527220  7265  7720  7361  7320  7465  000A  0000  0001
0000527240  0000  0000  0001  0000  0001  2509  2C64  2520
0000527260  2C64  2520  2C64  2520  0A64  0000  0000  0000
0000527300  0000  0000  200A  616C  797A  6720  2070  6177
0000527320  2073  6F6E  2074  6572  6461  0A79  0000  7263
0000527340  5F76  6964  7073  632E  6900  7370  702E  4700
0000527360  5053  6320  6D6F  616D  646E  6520  7272  2520
0000527400  0064  4244  6120  6363  7365  2073  6D69  2067
0000527420  7265  2072  6425  6400  6D75  2070  6373  6E72
0000527440  7420  206F  7067  6520  7272  2520  0064  4244
0000527460  7220  6C65  6165  6573  6920  676D  6520  7272
0000527500  2520  0064  6E69  0074  6E69  0074  5F62  7265
0000527520  6F72  0072  6964  7073  616C  2079  6F74  6767
0000527540  656C  6520  7272  2520  0064  5F62  7265  6F72
0000527560  0072  5F62  7265  6F72  0072  5F62  7265  6F72
*
0000527700  0072  011E  020B  0129  021A  0000  0000  0000
0000527720  0000  0000  0001  0002  349C  021E  3554  31A6
0000527740  0000  0000  0000  0000  0000  0000  0000  0000
*
```

```
THU MAR 14 17:25:16 1991  CRV_IPS.DLL  PAGE 187, LINE 10975

0000530200  0000  0000  0000  0000  012F  02CE  0142  02D2
0000530220  0157  02D6  016E  0204  7263  5F76  6964  7073
0000530240  616C  5F79  756D  746C  7069  656C  735F  7263
0000530260  6565  736E  6900  746E  6900  746E  6200  655F
0000530300  7272  726F  6200  655F  7272  726F  6200  655F
*
0000530400  7272  726F  6200  655F  7272  726F  6400  7369
0000530420  6170  796C  7320  6769  6420  6669  2066  7265
0000530440  2072  6425  6200  655F  7272  726F  6200  655F
0000530460  7272  726F  6200  655F  7272  726F  0000  7263
0000530500  5F76  6964  7073  616C  5F79  6964  6666  6900
0000530520  746E  6900  746E  6200  655F  7272  726F  4700
0000530540  5053  7720  6972  6574  6520  7272  2520  0064
0000530560  5F62  7265  6F72  0072  5F62  7265  6F72  0072
0000530600  6964  7073  616C  5F79  7473  6972  5F70  6964
0000530620  6666  6900  746E  6900  746E  6200  655F  7272
0000530640  726F  4700  5053  7720  6972  6574  6520  7272
0000530660  2520  0064  5F62  7265  6F72  0072  5F62  7265
0000530700  6F72  0072  6964  7073  616C  5F79  6973  5F67
0000530720  6964  6666  6900  746E  6900  746E  6200  655F
0000530740  7272  726F  6200  655F  7272  726F  6900  616D
0000530760  6567  2520  0073  5F62  6564  7562  0067  7865
0000531000  2070  6D69  6761  2065  7325  6200  645F  6265
0000531020  6775  6100  7463  6175  206C  6D69  6761  2065
0000531040  7325  6200  645F  6265  6775  6400  6D75  2070
0000531060  6D69  6761  2065  6F66  2072  6964  7073  616C
0000531100  2079  7265  2072  6425  6200  655F  7272  726F
0000531120  6400  6669  2066  6D69  6761  2065  7325  6200
0000531140  645F  6265  6775  6400  6D75  2070  6D69  6761
0000531160  2065  6F66  2072  6964  7073  616C  2079  7265
0000531200  2072  6425  6200  655F  7272  726F  0000  7263
0000531220  5F76  6964  7073  616C  5F79  6F74  6767  656C
0000531240  735F  7263  6565  006E  6E69  0074  6E69  0074
0000531260  0000  0000  0000  0000  0000  7473  706F  6420
0000531300  7369  2070  6F61  2069  7265  2072  6425  6200
0000531320  655F  7272  726F  6200  655F  7272  726F  0000
0000531340  7263  5F76  7473  706F  645F  7369  6C70  7961
0000531360  6900  746E  6900  746E  6200  655F  7272  726F
0000531400  6200  655F  7272  726F  4700  5053  7720  6972
0000531420  6574  6920  616D  6567  6520  7272  2520  0064
0000531440  5F62  7265  6F72  0072  7564  706D  735F  7263
0000531460  6565  5F6E  5F32  7067  6900  746E  6900  746E
0000531500  4700  5053  7720  6972  6574  6920  616D  6567
0000531520  6520  7272  2520  0064  5F62  7265  6F72  0072
0000531540  7564  706D  6C5F  7961  7265  325F  675F  0070
0000531560  6E69  0074  6E69  0074  5F62  7265  6F72  0072
0000531600  5347  2050  7277  7469  2065  6D69  6761  2065
0000531620  7265  2072  6425  6200  655F  7272  726F  6200
0000531640  655F  7272  726F  0000  6F78  5F72  616C  6579
0000531660  5F72  5F32  7067  6900  746E  6900  746E  4400
0000531700  2042  7473  7261  2074  6361  6563  7373  6520
0000531720  7272  2520  0064  5F62  7265  6F72  0072  4244
0000531740  7320  6174  7472  6120  6363  7365  2073  7265
0000531760  2072  6425  6200  655F  7272  726F  7500  6470
0000532000  7461  2065  6373  6572  6E65  6520  7272  2520
0000532020  0064  5F62  7265  6F72  0072  4244  6520  646E
0000532040  6120  6363  7365  2073  7265  2072  6425  6200
0000532060  655F  7272  726F  0000  7263  5F76  7075  6164
0000532100  6574  735F  7263  6565  006E  6E69  0074  6E69
```

THU MAR 14 17:25:16 1991 CRV_IPS.DLL PAGE 188, LINE 11034

| | | | | | | | | |
|---|---|---|---|---|---|---|---|---|
| 0000532120 | 0074 | 4244 | 6120 | 6363 | 7365 | 2073 | 616C | 6579 |
| 0000532140 | 2072 | 7265 | 2072 | 6425 | 6200 | 655F | 7272 | 726F |
| 0000532160 | 4400 | 2042 | 6361 | 6563 | 7373 | 6C20 | 7961 | 7265 |
| 0000532200 | 6520 | 7272 | 2520 | 0064 | 5F62 | 7265 | 6F72 | 0072 |
| 0000532220 | 7075 | 6164 | 6574 | 6C20 | 7961 | 7265 | 7420 | 6D69 |
| 0000532240 | 2065 | 203D | 6C25 | 0075 | 5F62 | 6564 | 7562 | 0067 |
| 0000532260 | 4244 | 7220 | 6C65 | 6165 | 6573 | 6C20 | 7961 | 7265 |
| 0000532300 | 6520 | 7272 | 2520 | 0064 | 5F62 | 7265 | 6F72 | 0072 |
| 0000532320 | 4244 | 7220 | 6C65 | 6165 | 6573 | 6C20 | 7961 | 7265 |
| 0000532340 | 6520 | 7272 | 2520 | 0064 | 5F62 | 7265 | 6F72 | 0072 |
| 0000532360 | 7075 | 6164 | 6574 | 6220 | 6D74 | 2070 | 7573 | 6363 |
| 0000532400 | 7365 | 0073 | 5F62 | 6564 | 7562 | 0067 | 7075 | 6164 |
| 0000532420 | 6574 | 625F | 7469 | 616D | 5F70 | 6373 | 6572 | 6E65 |
| 0000532440 | 6900 | 746E | 6900 | 746E | 4400 | 2042 | 6361 | 6563 |
| 0000532460 | 7373 | 7320 | 6769 | 6520 | 7272 | 2520 | 0064 | 5F62 |
| 0000532500 | 7265 | 6F72 | 0072 | 4244 | 6120 | 6363 | 7365 | 2073 |
| 0000532520 | 6973 | 2067 | 7265 | 2072 | 6425 | 6200 | 655F | 7272 |
| 0000532540 | 726F | 4400 | 2042 | 6572 | 656C | 7361 | 2065 | 6973 |
| 0000532560 | 2067 | 7265 | 2072 | 6425 | 6200 | 655F | 7272 | 726F |
| 0000532600 | 7500 | 6470 | 7461 | 2065 | 6973 | 2067 | 7573 | 6363 |
| 0000532620 | 7365 | 0073 | 5F62 | 6564 | 7562 | 0067 | 7075 | 6164 |
| 0000532640 | 6574 | 735F | 6769 | 616E | 7574 | 6572 | 735F | 7263 |
| 0000532660 | 6565 | 006E | 6E69 | 0074 | 6E69 | 0074 | 4244 | 7320 |
| 0000532700 | 6174 | 7472 | 6120 | 6363 | 7365 | 2073 | 7265 | 2072 |
| 0000532720 | 6425 | 6200 | 655F | 7272 | 726F | 6400 | 6D75 | 2070 |
| 0000532740 | 756D | 746C | 2069 | 616C | 6579 | 2072 | 6D69 | 6761 |
| 0000532760 | 2065 | 7265 | 2072 | 6425 | 6200 | 655F | 7272 | 726F |
| 0000533000 | 4400 | 2042 | 6D69 | 2067 | 7473 | 7261 | 2074 | 6361 |
| 0000533020 | 6563 | 7373 | 6520 | 7272 | 2520 | 0064 | 5F62 | 7265 |
| 0000533040 | 6F72 | 0072 | 7564 | 706D | 6D20 | 6C75 | 6974 | 6C20 |
| 0000533060 | 7961 | 7265 | 6920 | 616D | 6567 | 6520 | 7272 | 2520 |
| 0000533100 | 0064 | 5F62 | 7265 | 6F72 | 0072 | 4244 | 6920 | 676D |
| 0000533120 | 6120 | 6363 | 7365 | 2073 | 6973 | 2067 | 7265 | 2072 |
| 0000533140 | 6425 | 6200 | 655F | 7272 | 726F | 4400 | 2042 | 6D69 |
| 0000533160 | 2067 | 6361 | 6563 | 7373 | 7320 | 6769 | 6520 | 7272 |
| 0000533200 | 2520 | 0064 | 5F62 | 7265 | 6F72 | 0072 | 4244 | 6920 |
| 0000533220 | 676D | 7320 | 6174 | 7472 | 6120 | 6363 | 7365 | 2073 |
| 0000533240 | 7265 | 2072 | 6425 | 6200 | 655F | 7272 | 726F | 6400 |
| 0000533260 | 6D75 | 2070 | 756D | 746C | 2069 | 616C | 6579 | 2072 |
| 0000533300 | 6D69 | 6761 | 2065 | 7265 | 2072 | 6425 | 6200 | 655F |
| 0000533320 | 7272 | 726F | 4400 | 2042 | 6D69 | 2067 | 6361 | 6563 |
| 0000533340 | 7373 | 7320 | 6769 | 6520 | 7272 | 2520 | 0064 | 5F62 |
| 0000533360 | 7265 | 6F72 | 0072 | 4244 | 6920 | 676D | 6120 | 6363 |
| 0000533400 | 7365 | 2073 | 6973 | 2067 | 7265 | 2072 | 6425 | 6200 |
| 0000533420 | 655F | 7272 | 726F | 0000 | 7564 | 706D | 695F | 616D |
| 0000533440 | 6567 | 665F | 726F | 645F | 7369 | 6C70 | 7961 | 6900 |
| 0000533460 | 746E | 6900 | 746E | 4400 | 2042 | 6D69 | 2067 | 6361 |
| 0000533500 | 6563 | 7373 | 6C20 | 7961 | 7265 | 6520 | 7272 | 2520 |
| 0000533520 | 0064 | 5F62 | 7265 | 6F72 | 0072 | 7564 | 706D | 782F |
| 0000533540 | 726F | 6C20 | 7961 | 7265 | 7420 | 206F | 7067 | 6520 |
| 0000533560 | 7272 | 2520 | 0064 | 5F62 | 7265 | 6F72 | 0072 | 4244 |
| 0000533600 | 6920 | 676D | 7220 | 6C65 | 6165 | 6573 | 6C20 | 7961 |
| 0000533620 | 7265 | 6520 | 7272 | 2520 | 0064 | 5F62 | 7265 | 6F72 |
| 0000533640 | 0072 | 7564 | 706D | 6D5F | 6C75 | 6974 | 6C5F | 7961 |
| 0000533660 | 7265 | 695F | 616D | 6567 | 0000 | 4552 | 004C | 3154 |
| 0000533700 | 3332 | 495F | 504E | 505F | 494F | 544E | 5245 | 545F |
| 0000533720 | 5059 | 0045 | 4552 | 004C | 4241 | 0053 | 3154 | 3332 |
| 0000533740 | 535F | 4749 | 545F | 5248 | 5345 | 4F48 | 444C | 5400 |
| 0000533760 | 3231 | 5F33 | 4854 | 4552 | 4853 | 4C4F | 0044 | 3154 |

THU MAR 14 17:25:16 1991 CRV_IPS.DLL PAGE 189, LINE 11093

| | | | | | | | | |
|---|---|---|---|---|---|---|---|---|
| 0000534000 | 3332 | 425F | 494C | 4B4E | 4E49 | 5F47 | 4854 | 4552 |
| 0000534020 | 4853 | 4C4F | 0044 | 3154 | 3332 | 535F | 4154 | 4942 |
| 0000534040 | 494C | 5954 | 5400 | 3231 | 5F33 | 4143 | 5450 | 5255 |
| 0000534060 | 5F45 | 4954 | 454D | 554F | 0054 | 3154 | 3332 | 535F |
| 0000534100 | 4E59 | 5F43 | 4954 | 454D | 554F | 0054 | 3154 | 3332 |
| 0000534120 | 535F | 5243 | 575F | 4449 | 4854 | 5400 | 3231 | 5F33 |
| 0000534140 | 4353 | 5F52 | 4548 | 4749 | 5448 | 5400 | 3231 | 5F33 |
| 0000534160 | 4353 | 5F52 | 4544 | 5450 | 0048 | 3154 | 3332 | 535F |
| 0000534200 | 5243 | 4C5F | 5941 | 445F | 5045 | 4854 | 5400 | 3231 |
| 0000534220 | 5F33 | 4349 | 4E4F | 435F | 4C4F | 554F | 5352 | 5400 |
| 0000534240 | 3231 | 5F33 | 4F41 | 5F49 | 4F43 | 4F4C | 5352 | 5400 |
| 0000534260 | 3231 | 5F33 | 4353 | 5F52 | 4E49 | 4554 | 4C52 | 4341 |
| 0000534300 | 4445 | 5400 | 3231 | 5F33 | 5347 | 5F50 | 4548 | 5953 |
| 0000534320 | 434E | 5400 | 3231 | 5F33 | 5347 | 5F50 | 4548 | 4C42 |
| 0000534340 | 4B4E | 5400 | 3231 | 5F33 | 5347 | 5F50 | 5348 | 4C42 |
| 0000534360 | 4B4E | 5400 | 3231 | 5F33 | 5347 | 5F50 | 4556 | 5953 |
| 0000534400 | 434E | 5400 | 3231 | 5F33 | 5347 | 5F50 | 4556 | 4C42 |
| 0000534420 | 4B4E | 5400 | 3231 | 5F33 | 5347 | 5F50 | 5356 | 4C42 |
| 0000534440 | 4B4E | 5400 | 3231 | 5F33 | 5347 | 5F50 | 4954 | 454D |
| 0000534460 | 0052 | 3154 | 3332 | 465F | 4E49 | 5F45 | 4F48 | 4952 |
| 0000534500 | 5F5A | 4944 | 5053 | 4F00 | 4646 | 5400 | 3231 | 5F33 |
| 0000534520 | 4353 | 5F52 | 4E49 | 4554 | 4C52 | 4341 | 4445 | 4F00 |
| 0000534540 | 004E | 4709 | 2050 | 6E69 | 7469 | 6520 | 7272 | 726F |
| 0000534560 | 000A | 4F4E | 4C5F | 5455 | 4F4C | 4441 | 5400 | 3231 |
| 0000534600 | 5F33 | 5347 | 5F50 | 554C | 0054 | 490A | 696E | 6974 |
| 0000534620 | 6C61 | 7A69 | 6E69 | 2067 | 554C | 2754 | 2073 | 7266 |
| 0000534640 | 6D6F | 6320 | 6E6F | 6966 | 7567 | 6172 | 6974 | 6E6F |
| 0000534660 | 6620 | 6C69 | 0A65 | 0A00 | 6E49 | 7469 | 6169 | 696C |
| 0000534700 | 697A | 676E | 4C20 | 5455 | 7327 | 7720 | 7469 | 2068 |
| 0000534720 | 6972 | 6973 | 676E | 7220 | 6D61 | 0A70 | 0A00 | 554C |
| 0000534740 | 7354 | 6920 | 696E | 6974 | 6C61 | 7A69 | 6465 | 7720 |
| 0000534760 | 7469 | 2068 | 6972 | 6973 | 676E | 7220 | 6D61 | 2070 |
| 0000535000 | 7328 | 6963 | 6374 | 2078 | 6E6F | 796C | 6320 | 646F |
| 0000535020 | 2965 | 000A | 2500 | 5C73 | 5054 | 0000 | 7263 | 5F76 |
| 0000535040 | 6576 | 2E72 | 0063 | 7069 | 2E73 | 0070 | 5347 | 2050 |
| 0000535060 | 6F63 | 6D6D | 6E61 | 2064 | 7265 | 2072 | 6425 | 4700 |
| 0000535100 | 5053 | 7220 | 6165 | 2064 | 7265 | 2072 | 6425 | 4700 |
| 0000535120 | 5053 | 7720 | 6972 | 6574 | 6520 | 7272 | 2520 | 0064 |
| 0000535140 | 6E69 | 0074 | 6E69 | 0074 | 5F62 | 7265 | 6F72 | 0072 |
| 0000535160 | 6143 | 7470 | 7275 | 2065 | 6974 | 656D | 756F | 2C74 |
| 0000535200 | 6E20 | 746F | 7320 | 6174 | 6C62 | 0065 | 5F62 | 7265 |
| 0000535220 | 6F72 | 0072 | 7453 | 7261 | 2074 | 7277 | 7469 | 2065 |
| 0000535240 | 2020 | 0020 | 5F62 | 6564 | 7562 | 0067 | 6974 | 656D |
| 0000535260 | 3D72 | 2520 | 756C | 6200 | 645F | 6265 | 6775 | 4400 |
| 0000535300 | 2042 | 7473 | 7261 | 2074 | 7277 | 7469 | 2065 | 7265 |
| 0000535320 | 2072 | 6425 | 6200 | 655F | 7272 | 726F | 5200 | 6165 |
| 0000535340 | 6964 | 676E | 6C20 | 7961 | 7265 | 2520 | 2064 | 7266 |
| 0000535360 | 6D6F | 6720 | 0070 | 5F62 | 6564 | 7562 | 0067 | 6974 |
| 0000535400 | 656D | 3D72 | 2520 | 756C | 6200 | 645F | 6265 | 6775 |
| 0000535420 | 6200 | 655F | 7272 | 726F | 5700 | 6972 | 6974 | 676E |
| 0000535440 | 6C20 | 7961 | 7265 | 2520 | 2064 | 6F74 | 6420 | 7369 |
| 0000535460 | 006B | 5F62 | 6564 | 7562 | 0067 | 6974 | 656D | 3D72 |
| 0000535500 | 2520 | 756C | 6200 | 645F | 6265 | 6775 | 4400 | 2042 |
| 0000535520 | 7277 | 7469 | 2065 | 7265 | 2072 | 6425 | 6200 | 655F |
| 0000535540 | 7272 | 726F | 6200 | 655F | 7272 | 726F | 4300 | 7061 |
| 0000535560 | 7574 | 6572 | 7420 | 6D69 | 6F65 | 7475 | 202C | 6F6E |
| 0000535600 | 2074 | 7473 | 6261 | 656C | 6200 | 655F | 7272 | 726F |
| 0000535620 | 5200 | 6165 | 6964 | 676E | 6C20 | 7961 | 7265 | 2520 |
| 0000535640 | 2064 | 7266 | 6D6F | 6720 | 0070 | 5F62 | 6564 | 7562 |

THU MAR 14 17:25:16 1991 CRV_IPS.DLL PAGE 190, LINE 11152

| | | | | | | | | |
|---|---|---|---|---|---|---|---|---|
| 0000535660 | 0067 | 6974 | 656D | 3D72 | 2520 | 756C | 6200 | 645F |
| 0000535700 | 6265 | 6775 | 6200 | 655F | 7272 | 726F | 5700 | 6972 |
| 0000535720 | 6974 | 676E | 6C20 | 7961 | 7265 | 2520 | 2064 | 6F74 |
| 0000535740 | 6420 | 7369 | 006B | 5F62 | 6564 | 7562 | 0067 | 6974 |
| 0000535760 | 656D | 3D72 | 2520 | 756C | 6200 | 645F | 6265 | 6775 |
| 0000536000 | 4400 | 2042 | 7277 | 7469 | 2065 | 616C | 6579 | 2072 |
| 0000536020 | 7265 | 2072 | 6425 | 6200 | 655F | 7272 | 726F | 6200 |
| 0000536040 | 655F | 7272 | 726F | 4400 | 2042 | 6E65 | 2064 | 7277 |
| 0000536060 | 7469 | 2065 | 7265 | 2072 | 6425 | 6200 | 655F | 7272 |
| 0000536100 | 726F | 4300 | 7061 | 7574 | 6572 | 7320 | 7263 | 206E |
| 0000536120 | 7573 | 6363 | 7365 | 0073 | 5F62 | 6564 | 7562 | 0067 |
| 0000536140 | 0C5C | 0EA6 | 0C66 | 0EAA | 46F6 | 0EAE | 3618 | 0EBA |
| 0000536160 | 0000 | 0000 | 0000 | 0000 | 0C6C | 0EBE | 0C7F | 0EC2 |
| 0000536200 | 0C8F | 31AC | 7263 | 5F76 | 6163 | 7470 | 7275 | 5F65 |
| 0000536220 | 6373 | 6572 | 6E65 | 4300 | 7061 | 7574 | 6572 | 7420 |
| 0000536240 | 6D69 | 6F65 | 7475 | 202C | 6F6E | 2074 | 7473 | 6261 |
| 0000536260 | 656C | 4400 | 2042 | 7263 | 6165 | 6574 | 735F | 6E79 |
| 0000536300 | 2063 | 7265 | 2072 | 6425 | 6900 | 746E | 6900 | 746E |
| 0000536320 | 4300 | 7061 | 7574 | 6572 | 7420 | 6D69 | 6F65 | 7475 |
| 0000536340 | 202C | 6F6E | 2074 | 7473 | 6261 | 656C | 4400 | 2042 |
| 0000536360 | 7263 | 6165 | 6574 | 7320 | 6E79 | 2063 | 7265 | 2072 |
| 0000536400 | 6425 | 4C00 | 636F | 5320 | 6E79 | 2063 | 3D78 | 2520 |
| 0000536420 | 2064 | 3D79 | 2520 | 0064 | 5F62 | 6564 | 7562 | 0067 |
| 0000536440 | 7263 | 5F76 | 6163 | 7470 | 7275 | 5F65 | 6F6C | 6163 |
| 0000536460 | 6F74 | 5F72 | 7973 | 636E | 6900 | 746E | 6900 | 746E |
| 0000536500 | 6200 | 655F | 7272 | 726F | 4300 | 7061 | 7574 | 6572 |
| 0000536520 | 7420 | 6D69 | 6F65 | 7475 | 202C | 6F6E | 2074 | 7473 |
| 0000536540 | 6261 | 656C | 6200 | 655F | 7272 | 726F | 4400 | 2042 |
| 0000536560 | 6C61 | 6F6C | 2063 | 6D69 | 2067 | 7265 | 2072 | 6425 |
| 0000536600 | 6200 | 655F | 7272 | 726F | 6200 | 655F | 7272 | 726F |
| 0000536620 | 4400 | 2042 | 6461 | 2064 | 6D69 | 2067 | 7265 | 2072 |
| 0000536640 | 6425 | 6200 | 655F | 7272 | 726F | 4300 | 7061 | 7574 |
| 0000536660 | 6572 | 7320 | 6769 | 7320 | 6375 | 6563 | 7373 | 6200 |
| 0000536700 | 645F | 6265 | 6775 | 0000 | 7263 | 5F76 | 6163 | 7470 |
| 0000536720 | 7275 | 5F65 | 6973 | 0067 | 6E69 | 0074 | 6E69 | 0074 |
| 0000536740 | 7453 | 7261 | 2074 | 7277 | 7469 | 2065 | 2020 | 0020 |
| 0000536760 | 5F62 | 6564 | 7562 | 0067 | 6974 | 656D | 3D72 | 2520 |
| 0000537000 | 756C | 6200 | 645F | 6265 | 6775 | 4400 | 2042 | 7473 |
| 0000537020 | 7261 | 2074 | 7277 | 7469 | 2065 | 7265 | 2072 | 6425 |
| 0000537040 | 6200 | 655F | 7272 | 726F | 0000 | 706F | 6E65 | 645F |
| 0000537060 | 6669 | 5F66 | 6D69 | 0067 | 6E69 | 0074 | 6E69 | 0074 |
| 0000537100 | 4244 | 6120 | 6363 | 7365 | 2073 | 616C | 6579 | 2072 |
| 0000537120 | 7265 | 2072 | 6425 | 6200 | 655F | 7272 | 726F | 6200 |
| 0000537140 | 655F | 7272 | 726F | 4400 | 2042 | 6572 | 656C | 7361 |
| 0000537160 | 2065 | 7265 | 2072 | 6425 | 6200 | 655F | 7272 | 726F |
| 0000537200 | 0000 | 7277 | 7469 | 5F65 | 656E | 7478 | 6C5F | 7961 |
| 0000537220 | 7265 | 745F | 5F6F | 7067 | 6900 | 746E | 6900 | 746E |
| 0000537240 | 5200 | 6165 | 6964 | 676E | 6C20 | 7961 | 7265 | 2520 |
| 0000537260 | 2064 | 7266 | 6D6F | 6720 | 0070 | 5F62 | 6564 | 7562 |
| 0000537300 | 0067 | 6974 | 656D | 3D72 | 2520 | 756C | 6200 | 645F |
| 0000537320 | 6265 | 6775 | 6200 | 655F | 7272 | 726F | 5700 | 6972 |
| 0000537340 | 6974 | 676E | 6C20 | 7961 | 7265 | 2520 | 2064 | 6F74 |
| 0000537360 | 6420 | 7369 | 006B | 5F62 | 6564 | 7562 | 0067 | 6974 |
| 0000537400 | 656D | 3D72 | 2520 | 756C | 6200 | 645F | 6265 | 6775 |
| 0000537420 | 4400 | 2042 | 7277 | 7469 | 2065 | 616C | 6579 | 2072 |
| 0000537440 | 7265 | 2072 | 6425 | 6200 | 655F | 7272 | 726F | 0000 |
| 0000537460 | 7473 | 726F | 5F65 | 6964 | 6666 | 695F | 676D | 6900 |
| 0000537500 | 746E | 6900 | 746E | 6200 | 655F | 7272 | 726F | 4400 |
| 0000537520 | 2042 | 7473 | 7261 | 2074 | 7277 | 7469 | 2065 | 7265 |

THU MAR 14 17:25:16 1991 CRV_IPS.DLL PAGE 191, LINE 11211

| | | | | | | | | |
|---|---|---|---|---|---|---|---|---|
| 0000537540 | 2072 | 6425 | 6200 | 655F | 7272 | 726F | 4400 | 2042 |
| 0000537560 | 7277 | 7469 | 2065 | 6973 | 2067 | 7265 | 2072 | 6425 |
| 0000537600 | 6200 | 655F | 7272 | 726F | 0000 | 7473 | 726F | 5F65 |
| 0000537620 | 6964 | 6666 | 735F | 6769 | 6900 | 746E | 6900 | 746E |
| 0000537640 | 4400 | 2042 | 6361 | 6563 | 7373 | 6C20 | 7961 | 7265 |
| 0000537660 | 6520 | 7272 | 2520 | 0064 | 5F62 | 7265 | 6F72 | 0072 |
| 0000537700 | 5F62 | 7265 | 6F72 | 0072 | 5347 | 2050 | 7277 | 7469 |
| 0000537720 | 2065 | 6D69 | 2067 | 7265 | 2072 | 6425 | 6200 | 655F |
| 0000537740 | 7272 | 726F | 4400 | 2042 | 6572 | 656C | 7361 | 2065 |
| 0000537760 | 6D69 | 2067 | 7265 | 2072 | 6425 | 6200 | 655F | 7272 |
| 0000540000 | 726F | 6200 | 655F | 7272 | 726F | 5600 | 7265 | 6669 |
| 0000540020 | 2079 | 7320 | 6375 | 6563 | 7373 | 6200 | 645F | 6265 |
| 0000540040 | 6775 | 5600 | 7265 | 6669 | 2079 | 6974 | 656D | 756F |
| 0000540060 | 0074 | 5F62 | 6564 | 7562 | 0067 | 6556 | 5F72 | 6373 |
| 0000540100 | 6E72 | 705F | 6572 | 6573 | 636E | 2065 | 203D | 6C69 |
| 0000540120 | 656C | 6167 | 206C | 6170 | 6172 | 006D | 5F62 | 7265 |
| 0000540140 | 6F72 | 0072 | 6353 | 6572 | 6E65 | 7320 | 6174 | 6C62 |
| 0000540160 | 0065 | 5F62 | 6564 | 7562 | 0067 | 706F | 6E65 | 6420 |
| 0000540200 | 6669 | 2066 | 7265 | 2072 | 6425 | 6200 | 655F | 7272 |
| 0000540220 | 726F | 7300 | 6F74 | 6572 | 6420 | 6669 | 2066 | 7265 |
| 0000540240 | 2072 | 6425 | 6200 | 655F | 7272 | 726F | 4400 | 2042 |
| 0000540260 | 6E65 | 2064 | 7277 | 7469 | 2065 | 7265 | 2072 | 6425 |
| 0000540300 | 6200 | 655F | 7272 | 726F | 5300 | 7263 | 6565 | 206E |
| 0000540320 | 6E75 | 7473 | 6261 | 656C | 6200 | 645F | 6265 | 6775 |
| 0000540340 | 5300 | 7263 | 5F6E | 7473 | 6261 | 6C69 | 7469 | 2079 |
| 0000540360 | 203D | 6C69 | 656C | 6167 | 206C | 6170 | 6172 | 006D |
| 0000540400 | 5F62 | 7265 | 6F72 | 0072 | 7277 | 7469 | 2065 | 656E |
| 0000540420 | 7478 | 6C20 | 7961 | 7265 | 6520 | 7272 | 2520 | 0064 |
| 0000540440 | 5F62 | 7265 | 6F72 | 0072 | 5F62 | 7265 | 6F72 | 0072 |
| 0000540460 | 706F | 6E65 | 6420 | 6669 | 2066 | 6D69 | 2067 | 7265 |
| 0000540500 | 2072 | 6425 | 6200 | 655F | 7272 | 726F | 7300 | 6F74 |
| 0000540520 | 6572 | 6420 | 6669 | 2066 | 6D69 | 2067 | 7265 | 2072 |
| 0000540540 | 6425 | 6200 | 655F | 7272 | 726F | 4700 | 5053 | 7720 |
| 0000540560 | 6972 | 6574 | 6C20 | 7961 | 7265 | 6520 | 7272 | 2520 |
| 0000540600 | 0064 | 5F62 | 7265 | 6F72 | 0072 | 5F62 | 7265 | 6F72 |
| 0000540620 | 0072 | 7473 | 726F | 2065 | 6964 | 6666 | 6920 | 676D |
| 0000540640 | 6520 | 7272 | 2520 | 0064 | 5F62 | 7265 | 6F72 | 0072 |
| 0000540660 | 5F62 | 7265 | 6F72 | 0072 | 7263 | 5F76 | 6576 | 6972 |
| 0000540700 | 7966 | 735F | 7263 | 6565 | 006E | 6E69 | 0074 | 6E69 |
| 0000540720 | 0074 | 4244 | 6120 | 6363 | 7365 | 2073 | 6973 | 2067 |
| 0000540740 | 7265 | 2072 | 6425 | 6200 | 655F | 7272 | 726F | 6200 |
| 0000540760 | 655F | 7272 | 726F | 6200 | 655F | 7272 | 726F | 4400 |
| 0000541000 | 2042 | 6E65 | 2064 | 6361 | 6563 | 7373 | 6520 | 7272 |
| 0000541020 | 2520 | 0064 | 5F62 | 7265 | 6F72 | 0072 | 5F62 | 7265 |
| 0000541040 | 6F72 | 0072 | 6556 | 7372 | 6769 | 2020 | 7573 | 6363 |
| 0000541060 | 7365 | 0073 | 5F62 | 6564 | 7562 | 0067 | 6556 | 6977 |
| 0000541100 | 7966 | 7420 | 6D69 | 6F65 | 7475 | 6200 | 645F | 6265 |
| 0000541120 | 6775 | 5600 | 7265 | 735F | 7263 | 5F6E | 7270 | 7365 |
| 0000541140 | 6E65 | 6563 | 3D20 | 6920 | 6C6C | 6765 | 6C61 | 7020 |
| 0000541160 | 7261 | 6D61 | 6200 | 655F | 7272 | 726F | 5300 | 7263 |
| 0000541200 | 206E | 7473 | 6261 | 656C | 6200 | 645F | 6265 | 6775 |
| 0000541220 | 7300 | 6F74 | 6572 | 6420 | 6669 | 2066 | 6D69 | 2067 |
| 0000541240 | 7265 | 2072 | 6425 | 6200 | 655F | 7272 | 726F | 4400 |
| 0000541260 | 2042 | 6E65 | 2064 | 7277 | 7469 | 2065 | 7265 | 2072 |
| 0000541300 | 6425 | 6200 | 655F | 7272 | 726F | 5300 | 7263 | 206E |
| 0000541320 | 6E75 | 7473 | 6261 | 656C | 6200 | 645F | 6265 | 6775 |
| 0000541340 | 5300 | 7263 | 5F6E | 7473 | 6261 | 6C69 | 7469 | 2079 |
| 0000541360 | 203D | 6C69 | 656C | 6167 | 206C | 6170 | 6172 | 006D |
| 0000541400 | 5F62 | 7265 | 6F72 | 0072 | 706F | 6E65 | 6420 | 6669 |

THU MAR 14 17:25:16 1991 CRV_IPS.DLL PAGE 192, LINE 11270

| | | | | | | | | |
|---|---|---|---|---|---|---|---|---|
| 0000541420 | 2066 | 6D69 | 2067 | 7265 | 2072 | 6425 | 6200 | 655F |
| 0000541440 | 7272 | 726F | 7300 | 6F74 | 6572 | 6420 | 6669 | 2066 |
| 0000541460 | 6973 | 2067 | 7265 | 2072 | 6425 | 6200 | 655F | 7272 |
| 0000541500 | 726F | 6200 | 655F | 7272 | 726F | 7300 | 6F74 | 6572 |
| 0000541520 | 6420 | 6669 | 2066 | 6D69 | 2067 | 7265 | 2072 | 6425 |
| 0000541540 | 6200 | 655F | 7272 | 726F | 6200 | 655F | 7272 | 726F |
| 0000541560 | 0000 | 7263 | 5F76 | 6576 | 6972 | 7966 | 735F | 6769 |
| 0000541600 | 616E | 7574 | 6572 | 0000 | 0000 | 0000 | 6E69 | 0074 |
| 0000541620 | 6E69 | 0074 | 5F62 | 7265 | 6F72 | 0072 | 5F62 | 7265 |
| 0000541640 | 6F72 | 0072 | 4244 | 7220 | 6C65 | 6165 | 6573 | 6920 |
| 0000541660 | 676D | 6520 | 7272 | 2520 | 0064 | 5F62 | 7265 | 6F72 |
| 0000541700 | 0072 | 5F62 | 7265 | 6F72 | 0072 | 6556 | 6972 | 7966 |
| 0000541720 | 7320 | 6E79 | 2063 | 7573 | 6363 | 7365 | 0073 | 5F62 |
| 0000541740 | 6564 | 7562 | 0067 | 6556 | 6972 | 7966 | 7420 | 6D69 |
| 0000541760 | 6F65 | 7475 | 6200 | 645F | 6265 | 6775 | 5600 | 7265 |
| 0000542000 | 735F | 7263 | 5F6E | 7270 | 7365 | 6E65 | 6563 | 3D20 |
| 0000542020 | 203D | 6C69 | 656C | 6167 | 206C | 6170 | 6172 | 006D |
| 0000542040 | 5F62 | 7265 | 6F72 | 0072 | 6353 | 6E72 | 7320 | 6174 |
| 0000542060 | 6C62 | 0065 | 5F62 | 6564 | 7562 | 0067 | 4244 | 6120 |
| 0000542100 | 6C6C | 636F | 6920 | 676D | 6520 | 7272 | 2520 | 0064 |
| 0000542120 | 5F62 | 7265 | 6F72 | 0072 | 5F62 | 7265 | 6F72 | 0072 |
| 0000542140 | 4244 | 6120 | 6464 | 6920 | 676D | 6520 | 7272 | 2520 |
| 0000542160 | 0064 | 5F62 | 7265 | 6F72 | 0072 | 6353 | 6E72 | 7520 |
| 0000542200 | 736E | 6174 | 6C62 | 0065 | 5F62 | 6564 | 7562 | 0067 |
| 0000542220 | 6353 | 6E72 | 735F | 6174 | 6C62 | 2065 | 203D | 6C69 |
| 0000542240 | 656C | 6167 | 206C | 6170 | 6172 | 006D | 5F62 | 7265 |
| 0000542260 | 6F72 | 0072 | 6556 | 6972 | 7966 | 4520 | 7272 | 726F |
| 0000542300 | 6200 | 645F | 6265 | 6775 | 0000 | 6576 | 6972 | 7966 |
| 0000542320 | 735F | 6E79 | 0063 | 0000 | 0000 | 6E69 | 0074 | 6E69 |
| 0000542340 | 0074 | 5F62 | 7265 | 6F72 | 0072 | 5F62 | 7265 | 6F72 |
| 0000542360 | 0072 | 4244 | 7220 | 6C65 | 6165 | 6573 | 6920 | 676D |
| 0000542400 | 6520 | 7272 | 2520 | 0064 | 5F62 | 7265 | 6F72 | 0072 |
| 0000542420 | 5F62 | 7265 | 6F72 | 0072 | 6F4C | 2063 | 7973 | 636E |
| 0000542440 | 7320 | 6375 | 6563 | 7373 | 6200 | 645F | 6265 | 6775 |
| 0000542460 | 5600 | 7265 | 6669 | 2079 | 6974 | 656D | 756F | 0074 |
| 0000542500 | 5F62 | 6564 | 7562 | 0067 | 6556 | 5F72 | 6373 | 6E72 |
| 0000542520 | 705F | 6572 | 6573 | 636E | 2065 | 3D3D | 6920 | 6C6C |
| 0000542540 | 6765 | 6C61 | 7020 | 7261 | 6D61 | 6200 | 655F | 7272 |
| 0000542560 | 726F | 5300 | 7263 | 206E | 7473 | 6261 | 656C | 6200 |
| 0000542600 | 645F | 6265 | 6775 | 4400 | 2042 | 6C61 | 6F6C | 2063 |
| 0000542620 | 6D69 | 2067 | 7265 | 2072 | 6425 | 6200 | 655F | 7272 |
| 0000542640 | 726F | 6200 | 655F | 7272 | 726F | 4400 | 2042 | 6461 |
| 0000542660 | 2064 | 6D69 | 2067 | 7265 | 2072 | 6425 | 6200 | 655F |
| 0000542700 | 7272 | 726F | 5300 | 7263 | 206E | 6E75 | 7473 | 6261 |
| 0000542720 | 656C | 6200 | 645F | 6265 | 6775 | 5300 | 7263 | 5F6E |
| 0000542740 | 7473 | 6261 | 656C | 3D20 | 6920 | 6C6C | 6765 | 6C61 |
| 0000542760 | 7020 | 7261 | 6D61 | 6200 | 655F | 7272 | 726F | 5600 |
| 0000543000 | 7265 | 6669 | 2079 | 7245 | 6F72 | 0072 | 5F62 | 6564 |
| 0000543020 | 7562 | 0067 | 6576 | 6972 | 7966 | 6C5F | 636F | 7461 |
| 0000543040 | 726F | 735F | 6E79 | 0063 | 0000 | 0000 | 4843 | 4C4E |
| 0000543060 | 4D5F | 444F | 0045 | 4843 | 4C4E | 4D5F | 444F | 0045 |
| 0000543100 | 5453 | 4241 | 4C49 | 5449 | 5F59 | 4F4D | 4544 | 0900 |
| 0000543120 | 7265 | 6F72 | 7372 | 2520 | 756C | 2020 | 7320 | 6174 |
| 0000543140 | 6C62 | 2065 | 7266 | 6D61 | 7365 | 2520 | 756C | 000A |
| 0000543160 | 6968 | 2074 | 6E61 | 2079 | 656B | 2079 | 6F74 | 6320 |
| 0000543200 | 6E6F | 6974 | 756E | 0A65 | 0000 | 7263 | 5F76 | 6F6C |
| 0000543220 | 2E63 | 0063 | 7069 | 2E73 | 0070 | 5F47 | 5745 | 545F |
| 0000543240 | 4700 | 455F | 5F57 | 0054 | 18CA | 18EE | 18D4 | 31BE |
| 0000543260 | 7263 | 5F76 | 656C | 7261 | 5F6E | 6373 | 6C61 | 5F65 |

THU MAR 14 17:25:16 1991 CRV_IPS.DLL PAGE 193, LINE 11329

| | | | | | | | | |
|---|---|---|---|---|---|---|---|---|
| 0000543300 | 7566 | 636E | 6974 | 6E6F | 4700 | 455F | 5F57 | 0054 |
| 0000543320 | 5F47 | 5745 | 545F | 2000 | 7265 | 6F72 | 2072 | 6E69 |
| 0000543340 | 6C20 | 616F | 2064 | 6473 | 2062 | 7325 | 202C | 6425 |
| 0000543360 | 6200 | 655F | 7272 | 726F | 5400 | 3231 | 5F33 | 4E49 |
| 0000543400 | 5F50 | 4353 | 4C41 | 5F45 | 5546 | 434E | 2500 | 2073 |
| 0000543420 | 6572 | 6461 | 6E69 | 2067 | 6373 | 6C61 | 2065 | 6966 |
| 0000543440 | 656C | 0A20 | 0000 | 7263 | 5F76 | 6572 | 6461 | 735F |
| 0000543460 | 6163 | 656C | 665F | 6E75 | 0063 | 5F47 | 5745 | 545F |
| 0000543500 | 4700 | 455F | 5F57 | 0054 | 6520 | 7272 | 726F | 6920 |
| 0000543520 | 206E | 6F6C | 6461 | 6320 | 6766 | 2520 | 2C73 | 2520 |
| 0000543540 | 0064 | 5F62 | 7265 | 6F72 | 0072 | 3154 | 3332 | 495F |
| 0000543560 | 504E | 535F | 4143 | 454C | 465F | 4E55 | 0043 | 6F2E |
| 0000543600 | 646C | 6F00 | 646C | 0000 | 7263 | 5F76 | 7277 | 7469 |
| 0000543620 | 5F65 | 6373 | 6C61 | 5F65 | 7566 | 636E | 0000 | 7263 |
| 0000543640 | 5F76 | 6F6D | 2E75 | 0063 | 7069 | 2E73 | 0070 | 4353 |
| 0000543660 | 4552 | 4E45 | 4320 | 4E45 | 4554 | 0052 | 4F42 | 5454 |
| 0000543700 | 4D4F | 4220 | 524F | 4544 | 0052 | 4952 | 4847 | 2054 |
| 0000543720 | 4F42 | 4452 | 5245 | 4200 | 544F | 4F54 | 2D4D | 4952 |
| 0000543740 | 4847 | 2054 | 4F43 | 4E52 | 5245 | 5400 | 504F | 4220 |
| 0000543760 | 524F | 4544 | 0052 | 4E49 | 4156 | 494C | 2044 | 2121 |
| 0000544000 | 2021 | 3528 | 0029 | 4F54 | 2D50 | 4952 | 4847 | 2054 |
| 0000544020 | 4F43 | 4E52 | 5245 | 4900 | 564E | 4C41 | 4449 | 2120 |
| 0000544040 | 2121 | 2820 | 2937 | 4C00 | 4645 | 2054 | 4F42 | 4452 |
| 0000544060 | 5245 | 4200 | 544F | 4F54 | 2D4D | 454C | 5446 | 4320 |
| 0000544100 | 524F | 454E | 0052 | 4E49 | 4156 | 494C | 2044 | 2121 |
| 0000544120 | 2021 | 3928 | 0029 | 4E49 | 4156 | 494C | 2044 | 2121 |
| 0000544140 | 2021 | 3128 | 2930 | 5400 | 504F | 4C2D | 4645 | 2054 |
| 0000544160 | 4F43 | 4E52 | 5245 | 4700 | 455F | 5F57 | 0054 | 5F47 |
| 0000544200 | 5745 | 545F | 2000 | 6946 | 646E | 4620 | 6961 | 656C |
| 0000544220 | 0064 | 5F62 | 6564 | 7562 | 0067 | 19DE | 1AE0 | 19E8 |
| 0000544240 | 1B52 | 0000 | 0000 | 0000 | 0000 | 0000 | 0000 | 0000 |
| 0000544260 | 0000 | 0000 | 0000 | 0000 | 0000 | 0000 | 0000 | 0004 |
| 0000544300 | 0006 | 000C | 0008 | 000C | 0009 | 000C | 0004 | 0008 |
| 0000544320 | 0001 | 0003 | 0009 | 0000 | 0000 | 0000 | 0009 | 0001 |
| 0000544340 | 0008 | 0000 | 0000 | 0000 | 0002 | 0006 | 0003 | 0006 |
| 0000544360 | 0004 | 0002 | 0000 | 0000 | 0000 | 0000 | 0000 | 0000 |
| 0000544400 | 0003 | 0002 | 0001 | 0004 | 0002 | 0008 | 0001 | 0000 |
| 0000544420 | 19EE | 1B56 | 19FC | 1B5A | 1A0A | 1B5E | 1A17 | 1B62 |
| 0000544440 | 1A2B | 1B66 | 1A36 | 1B6A | 1A46 | 1B6E | 1A57 | 1B72 |
| 0000544460 | 1A67 | 1B76 | 1A73 | 1B7A | 1A86 | 1B7E | 1A96 | 1B82 |
| 0000544500 | 1AA7 | 31D0 | 0000 | 0010 | 000A | 0010 | 000A | 0010 |
| 0000544520 | 000A | 0005 | 0008 | 0005 | 0008 | 00C8 | 0000 | 7263 |
| 0000544540 | 5F76 | 6567 | 5F74 | 6F6D | 7375 | 5F65 | 6F70 | 6973 |
| 0000544560 | 6974 | 6E6F | 4700 | 455F | 5F57 | 0054 | 5F47 | 5745 |
| 0000544600 | 545F | 0000 | 7263 | 5F76 | 6E69 | 7469 | 6D5F | 756F |
| 0000544620 | 6573 | 745F | 6172 | 6B63 | 4700 | 455F | 5F57 | 0054 |
| 0000544640 | 5F47 | 5745 | 545F | 2000 | 6946 | 646E | 4620 | 6961 |
| 0000544660 | 656C | 2064 | 6E69 | 7220 | 6365 | 726F | 2064 | 6200 |
| 0000544700 | 645F | 6265 | 6775 | 2000 | 7864 | 3D20 | 2520 | 2064 |
| 0000544720 | 7964 | 3D20 | 2520 | 0064 | 5F62 | 6564 | 7562 | 0067 |
| 0000544740 | 6620 | 7869 | 6C20 | 636F | 7461 | 6F69 | 206E | 6146 |
| 0000544760 | 6C69 | 6465 | 6920 | 206E | 4E45 | 2064 | 7254 | 6361 |
| 0000545000 | 006B | 5F62 | 6564 | 7562 | 0067 | 7263 | 5F76 | 6E65 |
| 0000545020 | 5F64 | 6F6D | 7375 | 5F65 | 7274 | 6361 | 006B | 5F47 |
| 0000545040 | 5745 | 545F | 4700 | 455F | 5F57 | 0054 | 6966 | 5F78 |
| 0000545060 | 6F6C | 6163 | 6974 | 6E6F | 4700 | 455F | 5F57 | 0054 |
| 0000545100 | 5F47 | 5745 | 545F | 7400 | 3D31 | 2520 | 756C | 6C20 |
| 0000545120 | 2078 | 203D | 6425 | 6C20 | 2079 | 203D | 6425 | 7820 |
| 0000545140 | 203D | 6425 | 7920 | 3D20 | 6425 | 6200 | 645F | 6265 |

THU MAR 14 17:25:16 1991 CRV_IPS.DLL PAGE 194, LINE 11388

| | | | | | | | | |
|---|---|---|---|---|---|---|---|---|
| 0000545160 | 6775 | 6600 | 6961 | 206C | 203D | 6C25 | 2075 | 6572 |
| 0000545200 | 2073 | 203D | 6425 | 6200 | 645F | 6265 | 6775 | 0000 |
| 0000545220 | 6170 | 7373 | 7669 | 5F65 | 6966 | 646E | 6D5F | 756F |
| 0000545240 | 6573 | 705F | 736F | 7469 | 6F69 | 006E | 5F47 | 5745 |
| 0000545260 | 545F | 4700 | 455F | 5F57 | 0054 | 7573 | 6363 | 7365 |
| 0000545300 | 2073 | 3D74 | 6C25 | 6C20 | 636F | 785F | 3D20 | 2520 |
| 0000545320 | 2064 | 6F6C | 5F63 | 2079 | 203D | 6425 | 6920 | 253D |
| 0000545340 | 0064 | 5F62 | 6564 | 7562 | 0067 | 6341 | 6974 | 6576 |
| 0000545360 | 4620 | 6961 | 206C | 3D74 | 2520 | 206C | 3D69 | 6425 |
| 0000545400 | 7220 | 7365 | 3D20 | 2520 | 0064 | 5F62 | 6564 | 7562 |
| 0000545420 | 0067 | 6361 | 6974 | 6576 | 665F | 6E69 | 5F64 | 6F6D |
| 0000545440 | 7375 | 5F65 | 6F70 | 6973 | 6974 | 6E6F | 0000 | 0000 |
| 0000545460 | 0001 | 0001 | 5F47 | 5745 | 545F | 4700 | 455F | 5F57 |
| 0000545500 | 0054 | 7367 | 5F70 | 7277 | 7469 | 5F65 | 7274 | 6361 |
| 0000545520 | 5F6B | 6F6D | 6576 | 0000 | 0000 | 0000 | 5F47 | 5745 |
| 0000545540 | 545F | 4700 | 455F | 5F57 | 0054 | 7864 | 253D | 2064 |
| 0000545560 | 7964 | 253D | 0064 | 5F62 | 6564 | 7562 | 0067 | 6F6D |
| 0000545600 | 6576 | 745F | 6C73 | 6D5F | 756F | 6573 | 0000 | 0000 |
| 0000545620 | 0000 | 5F47 | 5745 | 545F | 4700 | 455F | 5F57 | 0054 |
| 0000545640 | 6F6D | 6576 | 6D5F | 756F | 6573 | 4700 | 455F | 5F57 |
| 0000545660 | 0054 | 5F47 | 5745 | 545F | 4900 | 6F63 | 206E | 7865 |
| 0000545700 | 6570 | 7463 | 6465 | 6E20 | 6165 | 2072 | 7325 | 002E |
| 0000545720 | 5F62 | 6564 | 7562 | 0067 | 6F4D | 6976 | 676E | 7420 |
| 0000545740 | 776F | 7261 | 2064 | 7325 | 002E | 5F62 | 6564 | 7562 |
| 0000545760 | 0067 | 7573 | 6363 | 7365 | 2073 | 6F6C | 5F63 | 2078 |
| 0000546000 | 203D | 6425 | 6C20 | 636F | 795F | 3D20 | 2520 | 2064 |
| 0000546020 | 3D69 | 6425 | 6200 | 645F | 6265 | 6775 | 4D00 | 766F |
| 0000546040 | 6E69 | 2067 | 6F74 | 6177 | 6472 | 2520 | 2E73 | 6200 |
| 0000546060 | 645F | 6265 | 6775 | 7300 | 6375 | 6563 | 7373 | 6C20 |
| 0000546100 | 636F | 785F | 3D20 | 2520 | 2064 | 6F6C | 5F63 | 2079 |
| 0000546120 | 203D | 6425 | 6920 | 253D | 0064 | 5F62 | 6564 | 7562 |
| 0000546140 | 0067 | 6341 | 6974 | 6576 | 2032 | 4146 | 4C49 | 2E2E |
| 0000546160 | 002E | 5F62 | 6564 | 7562 | 0067 | 6361 | 6974 | 6576 |
| 0000546200 | 5F32 | 6966 | 646E | 6D5F | 756F | 6573 | 705F | 736F |
| 0000546220 | 7469 | 6F69 | 006E | 6E69 | 0074 | 6E69 | 0074 | 7645 |
| 0000546240 | 6E65 | 2074 | 6973 | 657A | 3D20 | 7820 | 203A | 6425 |
| 0000546260 | 2820 | 6425 | 2C29 | 7920 | 203A | 6425 | 2820 | 6425 |
| 0000546300 | 0029 | 5F62 | 6564 | 7562 | 0067 | 7562 | 6C69 | 5F64 |
| 0000546320 | 6964 | 6572 | 7463 | 6F69 | 616E | 5F6C | 7665 | 6E65 |
| 0000546340 | 0074 | 0000 | 5F47 | 5745 | 545F | 4700 | 455F | 5F57 |
| 0000546360 | 0054 | 3A78 | 2520 | 2064 | 2528 | 2964 | 202C | 3A79 |
| 0000546400 | 2520 | 2064 | 2528 | 2964 | 6200 | 645F | 6265 | 6775 |
| 0000546420 | 4100 | 7463 | 7669 | 3265 | 6620 | 6961 | 656C | 2064 |
| 0000546440 | 6F66 | 2072 | 7665 | 6E65 | 0074 | 5F62 | 7265 | 6F72 |
| 0000546460 | 0072 | 6361 | 6974 | 6576 | 5F32 | 6966 | 646E | 755F |
| 0000546500 | 6973 | 676E | 655F | 6576 | 746E | 4700 | 455F | 5F57 |
| 0000546520 | 0054 | 5F47 | 5745 | 545F | 6C00 | 6165 | 6E72 | 7220 |
| 0000546540 | 6C65 | 6D20 | 7861 | 785F | 705F | 7869 | 3D20 | 2520 |
| 0000546560 | 2064 | 616D | 5F78 | 5F79 | 6970 | 2078 | 203D | 6425 |
| 0000546600 | 6200 | 645F | 6265 | 6775 | 2000 | 7278 | 7365 | 3D20 |
| 0000546620 | 2520 | 2064 | 7279 | 7365 | 3D20 | 2520 | 0064 | 5F62 |
| 0000546640 | 6564 | 7562 | 0067 | 7820 | 6572 | 5F73 | 6E75 | 7469 |
| 0000546660 | 2073 | 203D | 6425 | 7920 | 6572 | 5F73 | 6E75 | 7469 |
| 0000546700 | 2073 | 203D | 6425 | 6200 | 645F | 6265 | 6775 | 0000 |
| 0000546720 | 7263 | 5F76 | 656C | 7261 | 5F6E | 6572 | 5F6C | 6373 |
| 0000546740 | 6C61 | 0065 | 5F47 | 5745 | 545F | 4700 | 455F | 5F57 |
| 0000546760 | 0054 | 0072 | 6425 | 000A | 6425 | 2520 | 0A64 | 0000 |
| 0000547000 | 7263 | 5F76 | 6572 | 6461 | 725F | 6C65 | 735F | 6163 |
| 0000547020 | 656C | 665F | 6E75 | 0063 | 0077 | 7325 | 4D20 | 756F |

THU MAR 14 17:25:16 1991 CRV_IPS.DLL PAGE 195, LINE 11447

| | | | | | | | | |
|---|---|---|---|---|---|---|---|---|
| 0000547040 | 6573 | 7320 | 6163 | 656C | 6620 | 6E75 | 0A63 | 2500 |
| 0000547060 | 2064 | 000A | 6425 | 2520 | 0A64 | 4700 | 455F | 5F57 |
| 0000547100 | 0054 | 5F47 | 5745 | 545F | 6900 | 696E | 2074 | 6F6C |
| 0000547120 | 5F63 | 2078 | 203D | 6425 | 6C20 | 636F | 795F | 3D20 |
| 0000547140 | 2520 | 0064 | 5F62 | 6373 | 006C | 6E69 | 7469 | 7820 |
| 0000547160 | 3D20 | 2520 | 2064 | 2079 | 203D | 6425 | 6420 | 3D78 |
| 0000547200 | 6425 | 6420 | 3D79 | 6425 | 6200 | 735F | 6C63 | 7300 |
| 0000547220 | 6375 | 6563 | 7373 | 6C20 | 636F | 785F | 3D20 | 2520 |
| 0000547240 | 2064 | 6F6C | 5F63 | 2079 | 203D | 6425 | 6420 | 3D78 |
| 0000547260 | 6425 | 6420 | 3D79 | 6425 | 6200 | 735F | 6C63 | 7200 |
| 0000547300 | 7465 | 7275 | 206E | 3D78 | 2520 | 2064 | 3D79 | 2520 |
| 0000547320 | 2064 | 620C | ,35F | 6C63 | 0000 | 6573 | 7261 | 6863 |
| 0000547340 | 695F | 6F63 | 006E | 0001 | 7263 | 5F76 | 6369 | 6E6F |
| 0000547360 | 632E | 6900 | 7370 | 702E | 0000 | 2128 | 2140 | 2133 |
| 0000547400 | 1ADC | 0000 | 0000 | 0000 | 0000 | 0000 | 4349 | 4E4F |
| 0000547420 | 435F | 4E4F | 5254 | 4C4F | 535F | 4154 | 5554 | 5F53 |
| 0000547440 | 0054 | 4349 | 4E4F | 435F | 4E4F | 5254 | 4C4F | 535F |
| 0000547460 | 4154 | 5554 | 5F53 | 0054 | 724C | 206E | 6369 | 6E6F |
| 0000547500 | 2D20 | 7320 | 6B66 | 6200 | 645F | 6265 | 6775 | 4C00 |
| 0000547520 | 6E72 | 6920 | 6F63 | 206E | 464F | 0046 | 5F62 | 6564 |
| 0000547540 | 7562 | 0067 | 4153 | 4556 | 6E20 | 746F | 6120 | 6C6C |
| 0000547560 | 776F | 6465 | 6220 | 6665 | 726F | 2065 | 6173 | 706D |
| 0000547600 | 656C | 6200 | 645F | 6265 | 6775 | 5300 | 7661 | 2065 |
| 0000547620 | 6F6E | 2074 | 6C61 | 6F6C | 6577 | 2064 | 6562 | 6F66 |
| 0000547640 | 6572 | 7320 | 6D61 | 6C70 | 2E65 | 5300 | 7661 | 6E69 |
| 0000547660 | 2067 | 2E2E | 002E | 724C | 206E | 6369 | 6E6F | 6320 |
| 0000547700 | 6C61 | 696C | 676E | 7320 | 7661 | 0065 | 5F62 | 6564 |
| 0000547720 | 7562 | 0067 | 4900 | 6F63 | 206E | 6964 | 7073 | 616C |
| 0000547740 | 0079 | 5F62 | 6564 | 7562 | 0067 | 614E | 656D | 6320 |
| 0000547760 | 6168 | 676E | 0065 | 5F62 | 6564 | 7562 | 0067 | 6E49 |
| 0000550000 | 7469 | 6320 | 7672 | 635F | 746E | 5F6C | 6369 | 6E6F |
| 0000550020 | 6200 | 645F | 6265 | 6775 | 5300 | 6F74 | 2070 | 6369 |
| 0000550040 | 6E6F | 6420 | 7369 | 0070 | 5F62 | 6564 | 7562 | 0067 |
| 0000550060 | 6E49 | 7469 | 6920 | 6F63 | 206E | 6164 | 6174 | 202E |
| 0000550100 | 616E | 656D | 3D20 | 2520 | 2E73 | 6200 | 645F | 6265 |
| 0000550120 | 6775 | 4900 | 696E | 2074 | 6369 | 6E6F | 6620 | 6961 |
| 0000550140 | 006C | 5F62 | 6564 | 7562 | 0067 | 6E49 | 7469 | 6D20 |
| 0000550160 | 7265 | 6567 | 2064 | 6369 | 6E6F | 6620 | 6961 | 006C |
| 0000550200 | 5F62 | 6564 | 7562 | 0067 | 6E49 | 7469 | 6620 | 746C |
| 0000550220 | 2072 | 6164 | 6174 | 6200 | 645F | 6265 | 6775 | 4900 |
| 0000550240 | 696E | 2074 | 6C66 | 7274 | 6620 | 6961 | 006C | 5F62 |
| 0000550260 | 6564 | 7562 | 0067 | 6241 | 726F | 0074 | 5F62 | 6564 |
| 0000550300 | 7562 | 0067 | 6153 | 706D | 656C | 7320 | 7365 | 6973 |
| 0000550320 | 6E6F | 6120 | 6F62 | 7472 | 6465 | 202E | 6553 | 656C |
| 0000550340 | 7463 | 6120 | 7463 | 6F69 | 2E6E | 4E00 | 206F | 6369 |
| 0000550360 | 6E6F | 6420 | 7461 | 0061 | 5F62 | 6564 | 7562 | 0067 |
| 0000550400 | 7242 | 6E69 | 2067 | 6F70 | 6E69 | 6574 | 2072 | 6F74 |
| 0000550420 | 7320 | 7263 | 6565 | 2C6E | 7420 | 6568 | 206E | 7270 |
| 0000550440 | 7365 | 2073 | 6F73 | 7466 | 656B | 2E79 | 4200 | 6972 |
| 0000550460 | 676E | 7020 | 696F | 746E | 7265 | 7420 | 206F | 6373 |
| 0000550500 | 6572 | 6E65 | 6520 | 6764 | 2C65 | 7420 | 6568 | 206E |
| 0000550520 | 7270 | 7365 | 2073 | 6F73 | 7466 | 656B | 2E79 | 5300 |
| 0000550540 | 6977 | 6374 | 2068 | 6F74 | 5320 | 4554 | 3250 | 6200 |
| 0000550560 | 645F | 6265 | 6775 | 5000 | 616C | 6563 | 6620 | 6172 |
| 0000550600 | 656D | 6F20 | 6576 | 2072 | 6F70 | 6E69 | 6574 | 2C72 |
| 0000550620 | 7420 | 6568 | 206E | 7270 | 7365 | 2073 | 6F73 | 7466 |
| 0000550640 | 656B | 2E79 | 4500 | 5252 | 524F | 203A | 7246 | 6D61 |
| 0000550660 | 2065 | 756D | 7473 | 6220 | 2065 | 6E6F | 7320 | 7263 |
| 0000550700 | 6565 | 206E | 6465 | 6567 | 202E | 6552 | 6F70 | 6973 |

THU MAR 14 17:25:16 1991 CRV_IPS.DLL PAGE 196, LINE 11506

| | | | | | | | | |
|---|---|---|---|---|---|---|---|---|
| 0000550720 | 6974 | 6E6F | 002E | 5F62 | 6564 | 7562 | 0067 | 5245 |
| 0000550740 | 4F52 | 3A52 | 4620 | 6172 | 656D | 6D20 | 7375 | 2074 |
| 0000550760 | 6562 | 6F20 | 206E | 6373 | 6572 | 6E65 | 6520 | 6764 |
| 0000551000 | 2E65 | 5220 | 7065 | 736F | 7469 | 6F69 | 2E6E | 5300 |
| 0000551020 | 6977 | 6374 | 2068 | 6F74 | 5320 | 4554 | 3350 | 6200 |
| 0000551040 | 645F | 6265 | 6775 | 4300 | 6E61 | 6F6E | 2074 | 6574 |
| 0000551060 | 6D72 | 6E69 | 7461 | 2065 | 7264 | 7761 | 6D20 | 646F |
| 0000551100 | 2065 | 6E69 | 4720 | 0050 | 5F62 | 7265 | 6F72 | 0072 |
| 0000551120 | 6552 | 6F6D | 6576 | 7020 | 696F | 746E | 7265 | 6620 |
| 0000551140 | 6F72 | 206D | 7266 | 6D61 | 2C65 | 7420 | 6568 | 206E |
| 0000551160 | 7270 | 7365 | 2073 | 6F73 | 7466 | 656B | 2E79 | 5000 |
| 0000551200 | 6F72 | 6563 | 7373 | 6E69 | 2067 | 6164 | 6174 | 202E |
| 0000551220 | 6C50 | 6165 | 6573 | 7720 | 6961 | 2E74 | 2E2E | 5500 |
| 0000551240 | 736E | 7075 | 6F70 | 7472 | 6465 | 6C20 | 6165 | 6E72 |
| 0000551260 | 6D20 | 646F | 3A65 | 2520 | 0064 | 5F62 | 7265 | 6F72 |
| 0000551300 | 0072 | 7753 | 7469 | 6863 | 7420 | 206F | 5453 | 5045 |
| 0000551320 | 0031 | 5F62 | 6564 | 7562 | 0067 | 6153 | 706D | 656C |
| 0000551340 | 7320 | 7365 | 6973 | 6E6F | 6520 | 646E | 6465 | 202E |
| 0000551360 | 6553 | 656C | 7463 | 6120 | 7463 | 6F69 | 2E6E | 5700 |
| 0000551400 | 6168 | 2074 | 6D61 | 4920 | 6420 | 696F | 676E | 6820 |
| 0000551420 | 7265 | 3F65 | 3F3F | 5420 | 7265 | 696D | 616E | 6974 |
| 0000551440 | 676E | 4920 | 4F43 | 5F4E | 4F4D | 4544 | 2120 | 6200 |
| 0000551460 | 655F | 7272 | 726F | 0000 | 7263 | 5F76 | 6F63 | 746E |
| 0000551500 | 6F72 | 5F6C | 6369 | 6E6F | 0000 | 0000 | 0000 | 0000 |
| 0000551520 | 0000 | 0000 | 0000 | 0000 | 0000 | 0000 | 0000 | 0000 |
| 0000551540 | 0000 | 5F47 | 5745 | 545F | 4700 | 455F | 5F57 | 0054 |
| 0000551560 | 6E69 | 7469 | 695F | 6F63 | 006E | 5F47 | 5745 | 545F |
| 0000551600 | 4700 | 455F | 5F57 | 0054 | 6E69 | 7469 | 665F | 6C69 |
| 0000551620 | 6574 | 0072 | 5F47 | 5745 | 545F | 4700 | 455F | 5F57 |
| 0000551640 | 0054 | 6F63 | 6F6C | 7275 | 3A73 | 4220 | 2047 | 203D |
| 0000551660 | 6425 | 202C | 5048 | 3D20 | 2520 | 0A64 | 6200 | 645F |
| 0000551700 | 6265 | 6775 | 0000 | 6964 | 7073 | 616C | 5F79 | 6369 |
| 0000551720 | 6E6F | 4700 | 455F | 5F57 | 0054 | 5F47 | 5745 | 545F |
| 0000551740 | 4600 | 6961 | 656C | 2064 | 6F74 | 6720 | 7465 | 6920 |
| 0000551760 | 6F63 | 206E | 7266 | 6D6F | 4720 | 2E50 | 6200 | 655F |
| 0000552000 | 7272 | 726F | 4900 | 6F63 | 206E | 7261 | 6165 | 3D20 |
| 0000552020 | 2820 | 6425 | 202C | 6425 | 2C29 | 2820 | 6425 | 202C |
| 0000552040 | 6425 | 0029 | 5F62 | 7265 | 6F72 | 0072 | 6F43 | 6C75 |
| 0000552060 | 2064 | 6F6E | 2074 | 6572 | 6461 | 6920 | 6F63 | 206E |
| 0000552100 | 7562 | 6666 | 7265 | 6620 | 6F72 | 206D | 5047 | 6200 |
| 0000552120 | 655F | 7272 | 726F | 4300 | 756F | 646C | 276E | 2074 |
| 0000552140 | 7773 | 7469 | 6863 | 5320 | 5455 | 6420 | 7369 | 6C70 |
| 0000552160 | 7961 | 7420 | 206F | 7962 | 6170 | 7373 | 6200 | 655F |
| 0000552200 | 7272 | 726F | 0000 | 6163 | 7470 | 7275 | 5F65 | 6369 |
| 0000552220 | 6E6F | 4700 | 455F | 5F57 | 0054 | 5F47 | 5745 | 545F |
| 0000552240 | 0000 | 7265 | 7361 | 5F65 | 6966 | 746C | 7265 | 2500 |
| 0000552260 | 2C64 | 2520 | 786C | 000A | 5F47 | 5745 | 545F | 4700 |
| 0000552300 | 455F | 5F57 | 0054 | 756E | 206D | 666F | 6920 | 6F63 |
| 0000552320 | 736E | 6320 | 7275 | 6572 | 746E | 796C | 6920 | 206E |
| 0000552340 | 6874 | 2065 | 7067 | 6920 | 2073 | 6425 | 000A | 5F62 |
| 0000552360 | 6564 | 7562 | 0067 | 6425 | 6920 | 6F63 | 206E | 6469 |
| 0000552400 | 2520 | 0A64 | 6200 | 645F | 6265 | 6775 | 0000 | 7263 |
| 0000552420 | 5F76 | 6F63 | 6E75 | 5F74 | 6369 | 6E6F | 745F | 6261 |
| 0000552440 | 656C | 0000 | 6F6D | 7375 | 6C65 | 6269 | 632E | 6900 |
| 0000552460 | 7370 | 702E | 0000 | 2764 | 277C | 276F | 213C | 0001 |
| 0000552500 | 0000 | 0000 | 0280 | 01E0 | 0005 | 0000 | 0032 | 0002 |
| 0000552520 | 0000 | 0000 | 6174 | 6C62 | 7465 | 632E | 6900 | 7370 |
| 0000552540 | 702E | 0000 | 2794 | 27AA | 279D | 31EC | 0000 | 3F80 |
| 0000552560 | 0000 | 3F80 | 6574 | 706D | 732E | 6C63 | 7200 | 2500 |

THU MAR 14 17:25:16 1991 CRV_IPS.DLL PAGE 197, LINE 11565

```
0000552600  0A64  2500  2066  6625  000A  6425  2520  0A64
0000552620  7700  2500  2073  6154  6C62  7465  7320  6163
0000552640  656C  6620  6E75  0A63  2500  0A64  2500  2066
0000552660  6625  000A  6425  2520  0A64  0000  0000  0000
0000552700  0000  0006  0000  5650  564F  0000  0005  0000
0000552720  0000  0000  0000  0000  0000  0000  0000  435F
0000552740  465F  4C49  5F45  4E49  4F46  003D  0001  FFFF
0000552760  0000  0000  0000  0000  0000  0000  0000  0000
0000553000  0000  0001  8101  8181  0000  0000  0000  0000
0000553020  0000  0000  0000  0000  0000  0000  0000  0000
*
0000553400  0000  0000  0A00  0A0A  0A0A  0A0A  0A0A  0A0A
0000553420  0A0A  0A0A  0A0A  0A0A  0A0A  0A0A  0A0A  0A0A
*
0000554000  0A0A  0A0A  000A  0000  0000  0000  0000  0000
0000554020  0000  0000  0000  FF00  00FF  0000  0000  FFFF
0000554040  FFFF  005C  005C  0000  0D06  2A70  0000  0D06
0000554060  31EA  0001  0000  0000  0000  0000  0000  0102
0000554100  0000  0000  0000  0000  0000  0202  0000  0000
0000554120  0000  0000  0000  0000  0000  0000  0000  0000
*
0000555000  0000  0000  0000  0000  0001  0200  0000  0000
0000555020  0000  0000  0000  0000  0000  0000  0000  0000
*
0000555740  0000  0000  0000  0000  2C3C  27A6  0000  0000
0000555760  0000  0000  0920  0D2D  005D  005D  0006  0600
0000556000  0100  0000  0010  0603  0600  1002  4504  4545
0000556020  0505  0505  3505  0030  0050  0000  2000  3020
0000556040  5850  0807  3000  3030  5057  0007  2000  0020
0000556060  0000  0000  6008  6060  6060  0060  7000  7870
0000556100  7878  0878  0807  0000  0007  0808  0008  0800
0000556120  0800  0000  2808  756E  6C6C  0629  0000  0000
0000556140  0000  0000  0000  0000  0000  0000  0003  2000
0000556160  712C  319A  712C  2EB2  712C  2EB6  712C  2EBA
0000556200  712C  2EBE  712C  2EC2  0000  0000  0101  2000
0000556220  2020  2020  2020  2020  2828  2828  2028  2020
0000556240  2020  2020  2020  2020  2020  2020  2020  4820
0000556260  1010  1010  1010  1010  1010  1010  1010  8410
0000556300  8484  8484  8484  8484  1084  1010  1010  1010
0000556320  8181  8181  8181  0101  0101  0101  0101  0101
0000556340  0101  0101  0101  0101  0101  1010  1010  1010
0000556360  8282  8282  8282  0202  0202  0202  0202  0202
0000556400  0202  0202  0202  0202  0202  1010  1010  0020
0000556420  0000  0000  0000  0000  0000  0000  0000  0000
*
0000556620  FFFF  0000  0000  0003  FFFF  001E  003B  005A
0000556640  0078  0097  00B5  00D4  00F3  0111  0130  014E
0000556660  016D  FFFF  001E  003A  0059  0077  0096  00B4
0000556700  00D3  00F2  0110  012F  014D  016C  5A54  0000
0000556720  5350  0054  4450  0054  7080  0000  0001  3010
0000556740  3024  3014  31F2  7553  4D6E  6E6F  7554  5765
0000556760  6465  6854  4675  6972  6153  0074  614A  466E
0000557000  6265  614D  4172  7270  614D  4A79  6E75  754A
0000557020  416C  6775  6553  4F70  7463  6F4E  4476  6365
0000557040  0000  0000  0000  0000  0000  0000  0000  0000
0000557060  0000  C556  318E  C01E  3074  C0C4  3078  BFAE
0000557100  307C  C09C  3080  4D05  3136  7878  2B65  3030
0000557120  0030  5049  495F  544E  5245  0000  0000  0000
0000557140  0000  0000  0000  0010  0000  0000  0000  0000
```

THU MAR 14 17:25:16 1991 CRV_IPS.DLL PAGE 198, LINE 11624

| | | | | | | | | |
|---|---|---|---|---|---|---|---|---|
| 0000557160 | 0008 | 2000 | 0000 | 5450 | 0044 | 200A | 6F43 | 6E75 |
| 0000557200 | 2074 | 203D | 6425 | 000A | 0360 | 0550 | 09E8 | 0001 |
| 0000557220 | 0000 | 4D0E | 4D0F | 09E8 | 5A5A | 5A5A | 0588 | 00D0 |
| 0000557240 | C000 | 2E08 | 0588 | 00E0 | C000 | C0FF | 205B | 7245 |
| 0000557260 | 6F72 | 3A72 | 2520 | 2073 | 0A5D | 7200 | 0062 | 6272 |
| 0000557300 | 7200 | 0062 | 6946 | 656C | 6E20 | 746F | 6620 | 756F |
| 0000557320 | 646E | 4900 | 766E | 6C61 | 6469 | 4320 | 464F | 2046 |
| 0000557340 | 6568 | 6461 | 7265 | 4600 | 6C69 | 2065 | 6F6E | 2074 |
| 0000557360 | 4F43 | 4646 | 5B00 | 5520 | 6C6E | 6E69 | 656B | 2064 |
| 0000557400 | 6F43 | 6666 | 6620 | 6C69 | 3A65 | 5020 | 2043 | 203D |
| 0000557420 | 2030 | 0A5D | 5B00 | 4C20 | 616F | 6964 | 676E | 203A |
| 0000557440 | 7325 | 5D20 | 000A | 6552 | 6F6C | 6163 | 6974 | 6E6F |
| 0000557460 | 6F20 | 206E | 6962 | 2074 | 6F62 | 6E75 | 6164 | 7972 |
| 0000557500 | 0000 | 0000 | A1CE | 3192 | 0000 | 0000 | BE67 | 3186 |
| 0000557520 | 9E3A | 2EC6 | B660 | 3084 | 7A3A | FFFF | FFFF | 319C |
| 0000557540 | FFFF | FFFF | 319E | FFFF | 31A4 | 31A8 | 02CA | 31A0 |
| 0000557560 | 31A2 | 31AA | 31B2 | 31AE | 31B0 | 31B4 | 31BA | 0EA2 |
| 0000557600 | 31B6 | 31B8 | 31BC | 18EA | 31C4 | 31C8 | 31CA | 31CC |
| 0000557620 | 31C6 | 31CE | 31D2 | 31C0 | 31C2 | 31D4 | 31DA | 31DC |
| 0000557640 | 31DE | 31E0 | 31E2 | 2778 | 31E4 | 31E8 | 31E6 | 0000 |
| 0000557660 | 4100 | 2E2A | 3020 | 0000 | 0000 | 0000 | 0000 | 2A6A |
| 0000557700 | 3C3C | 4D4E | 4753 | 3E3E | 0000 | 3652 | 3030 | 0D30 |
| 0000557720 | 2D0A | 7320 | 6174 | 6B63 | 6F20 | 6576 | 6672 | 6F6C |
| 0000557740 | 0D77 | 000A | 0003 | 3652 | 3030 | 0D33 | 2D0A | 6920 |
| 0000557760 | 746E | 6765 | 7265 | 6420 | 7669 | 6469 | 2065 | 7962 |
| 0000560000 | 3020 | 0A0D | 0800 | 5200 | 3036 | 3830 | 0A0D | 202D |
| 0000560020 | 6F6E | 2074 | 6E65 | 756F | 6867 | 7320 | 6170 | 6563 |
| 0000560040 | 6620 | 726F | 6120 | 6772 | 6D75 | 6E65 | 7374 | 0A0D |
| 0000560060 | 0900 | 5200 | 3036 | 3930 | 0A0D | 202D | 6F6E | 2074 |
| 0000560100 | 6E65 | 756F | 6867 | 7320 | 6170 | 6563 | 6620 | 726F |
| 0000560120 | 6520 | 766E | 7269 | 6E6F | 656D | 746E | 0A0D | FC00 |
| 0000560140 | 0D00 | 000A | 00FF | 7572 | 2D6E | 6974 | 656D | 6520 |
| 0000560160 | 7272 | 726F | 0020 | 0002 | 3652 | 3030 | 0D32 | 2D0A |
| 0000560200 | 6620 | 6F6C | 7461 | 6E69 | 2D67 | 6F70 | 6E69 | 2074 |
| 0000560220 | 7573 | 7070 | 726F | 2074 | 6F6E | 2074 | 6F6C | 6461 |
| 0000560240 | 6465 | 0A0D | 1100 | 5200 | 3036 | 3731 | 0A0D | 202D |
| 0000560260 | 6E75 | 7865 | 6570 | 7463 | 6465 | 6D20 | 6C75 | 6974 |
| 0000560300 | 6874 | 6572 | 6461 | 6C20 | 636F | 206B | 7265 | 6F72 |
| 0000560320 | 0D72 | 000A | 0010 | 3652 | 3130 | 0D36 | 2D0A | 6E2U |
| 0000560340 | 746F | 6520 | 6F6E | 6775 | 2068 | 7073 | 6361 | 2065 |
| 0000560360 | 6F66 | 2072 | 6874 | 6572 | 6461 | 6420 | 7461 | 0D61 |
| 0000560400 | 000A | 00FD | 203A | 414D | 4854 | 0A0D | 202D | 6C66 |
| 0000560420 | 616F | 6974 | 676E | 702D | 696F | 746E | 6520 | 7272 |
| 0000560440 | 726F | 203A | 6500 | 6900 | 766E | 6C61 | 6469 | 0A0D |
| 0000560460 | 6700 | 6400 | 7669 | 6469 | 2065 | 7962 | 3020 | 0A0D |
| 0000560500 | 6800 | 6F00 | 6576 | 6672 | 6F6C | 0D77 | 000A | 006E |
| 0000560520 | 7473 | 6361 | 206B | 766F | 7265 | 6C66 | 776F | 0A0D |
| 0000560540 | 7000 | 6500 | 7078 | 696C | 6963 | 6C74 | 2079 | 6567 |
| 0000560560 | 656E | 6172 | 6574 | 0D64 | 000A | FFFF | 05FF | 0200 |
| 0000560600 | 9600 | 0331 | 0000 | 0200 | FE00 | 0731 | 0000 | 0200 |
| 0000560620 | F400 | 0831 | 0000 | 0200 | D602 | 0431 | 2300 | 0200 |
| 0000560640 | D802 | 0431 | 3100 | 4E00 | 3042 | 2B32 | 02E6 | 0100 |
| 0000560660 | 0000 | 1200 | 0023 | 0000 | 0100 | 1200 | 2E2E | 6F5C |
| 0000560700 | 6A62 | 635C | 7672 | 615F | 696F | 6F2E | 6A62 | 0001 |
| 0000560720 | 2312 | 0D72 | 0000 | 0000 | 0001 | 2E12 | 5C2E | 626F |
| 0000560740 | 5C6A | 7263 | 5F76 | 6F62 | 2E78 | 626F | 016A | 8400 |
| 0000560760 | 4430 | 0074 | 0000 | 0100 | 1300 | 2E2E | 6F5C | 6A62 |
| 0000561000 | 635C | 7672 | 645F | 7369 | 2E70 | 626F | 016A | C800 |
| 0000561020 | 65A4 | 0014 | 0000 | 0100 | 1200 | 2E2E | 6F5C | 6A62 |

THU MAR 14 17:25:16 1991 CRV_IPS.DLL PAGE 199, LINE 11683

| | | | | | | | | |
|---|---|---|---|---|---|---|---|---|
| 0000561040 | 635C | 7672 | 675F | 7073 | 6F2E | 6A62 | 0002 | 0000 |
| 0000561060 | 8C1C | 0000 | 0000 | 0001 | 2E12 | 5C2E | 626F | 5C6A |
| 0000561100 | 7263 | 5F76 | 6576 | 2E72 | 626F | 026A | 1C00 | 1C8C |
| 0000561120 | 000F | 0000 | 0100 | 1200 | 2E2E | 6F5C | 6A62 | 635C |
| 0000561140 | 7672 | 6C5F | 636F | 6F2E | 6A62 | 0002 | 9B38 | 5F7A |
| 0000561160 | 0000 | 0000 | 0001 | 2E12 | 5C2E | 626F | 5C6A | 7263 |
| 0000561200 | 5F76 | 6F6D | 2E75 | 626F | 036A | 0000 | CD00 | 002A |
| 0000561220 | 0000 | 0100 | 1200 | 2E2E | 6F5C | 6A62 | 635C | 7672 |
| 0000561240 | 6C5F | 6E72 | 6F2E | 6A62 | 0003 | 2ACE | 3356 | 0000 |
| 0000561260 | 0000 | 0001 | 2E13 | 5C2E | 626F | 5C6A | 7263 | 5F76 |
| 0000561300 | 6369 | 6E6F | 6F2E | 6A62 | 0003 | 5E24 | 0665 | 0000 |
| 0000561320 | 0000 | 0001 | 2E13 | 5C2E | 626F | 5C6A | 6F6D | 7375 |
| 0000561340 | 6C65 | 6269 | 6F2E | 6A62 | 0003 | 648A | 09ED | 0000 |
| 0000561360 | 0000 | 0001 | 2E11 | 5C2E | 626F | 5C6A | 6174 | 6C62 |
| 0000561400 | 7465 | 6F2E | 6A62 | 0003 | 6E88 | 00D1 | 0000 | 0001 |
| 0000561420 | 0001 | 640B | 6C6C | 635C | 7573 | 612E | 6D73 | 0003 |
| 0000561440 | 6F5A | 01AF | 0000 | 0001 | 0001 | 640E | 6C6C | 635C |
| 0000561460 | 7573 | 6164 | 2E74 | 7361 | 036D | 0A00 | 2271 | 0000 |
| 0000561500 | 0100 | 0100 | 0F00 | 736F | 5C32 | 7263 | 3074 | 736D |
| 0000561520 | 2E67 | 7361 | 036D | 2C00 | 0671 | 0000 | 0100 | 0100 |
| 0000561540 | 0A00 | 7263 | 3074 | 7066 | 612E | 6D73 | 0003 | 7132 |
| 0000561560 | 001A | 0000 | 0001 | 0001 | 630A | 6B68 | 7473 | 2E6B |
| 0000561600 | 7361 | 036D | 4C00 | 0871 | 0001 | 0100 | 0100 | 0D00 |
| 0000561620 | 6C64 | 5C6C | 6573 | 6574 | 766E | 2E70 | 0363 | 5400 |
| 0000561640 | 6572 | 0000 | 0100 | 0100 | 0F00 | 736F | 5C32 | 6D6E |
| 0000561660 | 6773 | 6468 | 2E72 | 7361 | 036D | BA00 | C072 | 0000 |
| 0000561700 | 0100 | 0100 | 0E00 | 736F | 5C32 | 6F64 | 7273 | 7465 |
| 0000561720 | 612E | 6D73 | 0003 | 737A | 0102 | 0000 | 0001 | 0001 |
| 0000561740 | 6608 | 6C63 | 736F | 2E65 | 0363 | 7C00 | 6A74 | 0000 |
| 0000561760 | 0100 | 0100 | 0700 | 6F66 | 6570 | 2E6E | 0363 | E600 |
| 0000562000 | 5A74 | 0000 | 0100 | 0100 | 0900 | 7066 | 6972 | 746E |
| 0000562020 | 2E66 | 0363 | 4000 | 4275 | 0000 | 0100 | 0100 | 0800 |
| 0000562040 | 7366 | 6163 | 666E | 632E | 0003 | 7582 | 004E | 0000 |
| 0000562060 | 0001 | 0001 | 7008 | 6972 | 746E | 2E66 | 0063 | 0000 |
| 0000562100 | 0000 | 0000 | 0100 | 0000 | 0B00 | 635F | 6C66 | 7375 |
| 0000562120 | 2E68 | 7361 | 006D | 0000 | 0000 | 0000 | 0100 | 0000 |
| 0000562140 | 0700 | 665F | 6C69 | 2E65 | 0363 | D000 | 9C75 | 0000 |
| 0000562160 | 0100 | 0100 | 0B00 | 665F | 6C69 | 7562 | 2E66 | 7361 |
| 0000562200 | 036D | 6C00 | E576 | 0000 | 0100 | 0100 | 0B00 | 665F |
| 0000562220 | 736C | 7562 | 2E66 | 7361 | 036D | 5200 | 3777 | 0000 |
| 0000562240 | 0100 | 0100 | 0C00 | 665F | 6572 | 6265 | 6675 | 612E |
| 0000562260 | 6D73 | 0003 | 778A | 004B | 0000 | 0001 | 0001 | 5F0B |
| 0000562300 | 6567 | 6274 | 6675 | 612E | 6D73 | 0003 | 77D6 | 00F2 |
| 0000562320 | 0000 | 0001 | 0001 | 5F07 | 706F | 6E65 | 632E | 0003 |
| 0000562340 | 78C8 | 00C0 | 0000 | 0001 | 0001 | 5F0B | 6673 | 6274 |
| 0000562360 | 6675 | 612E | 6D73 | 0003 | 7988 | 012E | 0000 | 0001 |
| 0000562400 | 0001 | 6608 | 6C66 | 7375 | 2E68 | 0363 | B600 | 2A7A |
| 0000562420 | 0008 | 0100 | 0100 | 0700 | 6E69 | 7570 | 2E74 | 0363 |
| 0000562440 | E000 | FA82 | 0004 | 0100 | 0100 | 0A00 | 756F | 7074 |
| 0000562460 | 7475 | 612E | 6D73 | 0003 | 87DA | 0078 | 0000 | 0001 |
| 0000562500 | 0001 | 7308 | 7274 | 6165 | 2E6D | 0363 | 5200 | AA88 |
| 0000562520 | 0000 | 0100 | 0100 | 0800 | 6E75 | 6567 | 6374 | 632E |
| 0000562540 | 0003 | 88FC | 003F | 0000 | 0001 | 0001 | 6F0D | 3273 |
| 0000562560 | 635C | 6F6C | 6573 | 612E | 6D73 | 0003 | 893C | 0077 |
| 0000562600 | 0000 | 0001 | 0001 | 6F0D | 3273 | 6C5C | 6573 | 6B65 |
| 0000562620 | 612E | 6D73 | 0003 | 89B4 | 01DD | 0000 | 0001 | 0001 |
| 0000562640 | 6F0C | 3273 | 6F5C | 6570 | 2E6E | 7361 | 036D | 9200 |
| 0000562660 | 5D8B | 0001 | 0100 | 0100 | 0C00 | 736F | 5C32 | 6572 |
| 0000562700 | 6461 | 612E | 6D73 | 0003 | 8CF0 | 01DD | 0000 | 0001 |

THU MAR 14 17:25:16 1991 CRV_IPS.DLL PAGE 200, LINE 11742

| | | | | | | | | |
|---|---|---|---|---|---|---|---|---|
| 0000562720 | 0001 | 7709 | 6972 | 6574 | 612E | 6D73 | 0000 | 0000 |
| 0000562740 | 0000 | 0000 | 0001 | 0000 | 740B | 7478 | 6F6D | 6564 |
| 0000562760 | 612E | 6D73 | 0003 | 8ECE | 000A | 0000 | 0001 | 0001 |
| 0000563000 | 6D0A | 6C61 | 6F6C | 2E63 | 7361 | 036D | D800 | 0A8E |
| 0000563020 | 0000 | 0100 | 0100 | 0800 | 7266 | 6565 | 612E | 6D73 |
| 0000563040 | 0003 | 8EE2 | 00AF | 0000 | 0001 | 0001 | 660B | 616D |
| 0000563060 | 6C6C | 636F | 612E | 6D73 | 0000 | 0060 | 0000 | 0000 |
| 0000563100 | 0001 | 0000 | 6609 | 6164 | 6174 | 612E | 6D73 | 0003 |
| 0000563120 | 8F92 | 0034 | 0000 | 0001 | 0001 | 690B | 696E | 7374 |
| 0000563140 | 6765 | 612E | 6D73 | 0003 | 8FC6 | 0036 | 0000 | 0001 |
| 0000563160 | 0001 | 6C0B | 6E69 | 736B | 6765 | 612E | 6D73 | 0003 |
| 0000563200 | 8FFC | 007C | 0000 | 0001 | 0001 | 730C | 6165 | 6372 |
| 0000563220 | 7368 | 2E67 | 7361 | 036D | 7800 | E290 | 0000 | 0100 |
| 0000563240 | 0100 | 0B00 | 7267 | 776F | 6573 | 2E67 | 7361 | 036D |
| 0000563260 | 5A00 | 3191 | 0000 | 0100 | 0100 | 0A00 | 656E | 7377 |
| 0000563300 | 6765 | 612E | 6D73 | 0003 | 918C | 0046 | 0000 | 0001 |
| 0000563320 | 0001 | 730A | 7274 | 6163 | 2E74 | 7361 | 036D | D200 |
| 0000563340 | 3691 | 0000 | 0100 | 0100 | 0A00 | 7473 | 6372 | 7970 |
| 0000563360 | 612E | 6D73 | 0003 | 9208 | 0029 | 0000 | 0001 | 0001 |
| 0000563400 | 730A | 7274 | 6D63 | 2E70 | 7361 | 036D | 3200 | 1792 |
| 0000563420 | 0000 | 0100 | 0100 | 0A00 | 7473 | 6C72 | 6E65 | 612E |
| 0000563440 | 6D73 | 0003 | 924A | 002A | 0000 | 0001 | 0001 | 730B |
| 0000563460 | 7274 | 636E | 7970 | 612E | 6D73 | 0003 | 9274 | 003B |
| 0000563500 | 0000 | 0001 | 0001 | 730B | 7274 | 636E | 706D | 612E |
| 0000563520 | 6D73 | 0003 | 92B0 | 0003 | 0000 | 0001 | 0001 | 6108 |
| 0000563540 | 6F74 | 2E69 | 7361 | 036D | B400 | 0392 | 0000 | 0100 |
| 0000563560 | 0100 | 0800 | 7461 | 6C6F | 612E | 6D73 | 0003 | 92B8 |
| 0000563600 | 0060 | 0000 | 0001 | 0001 | 6106 | 6F74 | 2E66 | 0363 |
| 0000563620 | 1800 | 5693 | 0000 | 0100 | 0100 | 0800 | 7461 | 786F |
| 0000563640 | 612E | 6D73 | 0003 | 936E | 001C | 0000 | 0001 | 0001 |
| 0000563660 | 6908 | 6F74 | 2E61 | 7361 | 036D | 8A00 | A293 | 0000 |
| 0000563700 | 0100 | 0100 | 0A00 | 665F | 7470 | 736F | 7274 | 632E |
| 0000563720 | 0000 | 0000 | 0000 | 0000 | 0001 | 0000 | 630C | 696D |
| 0000563740 | 6373 | 6164 | 2E74 | 7361 | 006D | 0000 | 0000 | 0000 |
| 0000563760 | 0100 | 0000 | 0900 | 7463 | 7079 | 2E65 | 7361 | 036D |
| 0000564000 | 2C00 | A694 | 0000 | 0100 | 0100 | 0800 | 6567 | 6574 |
| 0000564020 | 766E | 632E | 0003 | 94D2 | 0041 | 0000 | 0001 | 0001 |
| 0000564040 | 6F0D | 3273 | 6B5C | 6862 | 7469 | 612E | 6D73 | 0003 |
| 0000564060 | 9514 | 00CA | 0000 | 0001 | 0001 | 6F0D | 3273 | 675C |
| 0000564100 | 7465 | 6863 | 612E | 6D73 | 0003 | 95DE | 0020 | 0000 |
| 0000564120 | 0001 | 0001 | 6F0D | 3273 | 685C | 6964 | 6666 | 612E |
| 0000564140 | 6D73 | 0003 | 95FE | 00BA | 0000 | 0001 | 0001 | 6F0D |
| 0000564160 | 3273 | 6D5C | 6F6C | 6B63 | 612E | 6D73 | 0003 | 96B8 |
| 0000564200 | 007A | 0000 | 0001 | 0001 | 6410 | 6C6C | 745C | 6469 |
| 0000564220 | 6174 | 6C62 | 2E65 | 7361 | 036D | 3200 | 9597 | 0000 |
| 0000564240 | 0100 | 0100 | 0900 | 6766 | 7465 | 2E73 | 7361 | 036D |
| 0000564260 | C800 | 7497 | 0000 | 0100 | 0100 | 0900 | 7073 | 6972 |
| 0000564300 | 746E | 2E66 | 0363 | 3C00 | AD98 | 0000 | 0100 | 0100 |
| 0000564320 | 0C00 | 7266 | 6165 | 6C6C | 636F | 612E | 6D73 | 0003 |
| 0000564340 | 98EA | 000A | 0000 | 0001 | 0001 | 720B | 6165 | 6C6C |
| 0000564360 | 636F | 612E | 6D73 | 0003 | 98F4 | 00C8 | 0000 | 0001 |
| 0000564400 | 0001 | 720A | 7365 | 7A69 | 2E65 | 7361 | 036D | BC00 |
| 0000564420 | 2E99 | 0000 | 0100 | 0100 | 0A00 | 6163 | 6C6C | 636F |
| 0000564440 | 612E | 6D73 | 0003 | 99EA | 0025 | 0000 | 0001 | 0001 |
| 0000564460 | 660B | 6E69 | 7364 | 6765 | 612E | 6D73 | 0003 | 9A10 |
| 0000564500 | 003F | 0000 | 0001 | 0001 | 6F0D | 3273 | 705C | 7475 |
| 0000564520 | 6863 | 612E | 6D73 | 0000 | 0000 | 0000 | 0000 | 0001 |
| 0000564540 | 0000 | 6406 | 7961 | 2E73 | 0363 | 5000 | DE9A | 0000 |
| 0000564560 | 0100 | 0100 | 0B00 | 736F | 5C32 | 7466 | 6D69 | 2E65 |

THU MAR 14 17:25:16 1991 CRV_IPS.DLL PAGE 201, LINE 11801

| | | | | | | | | |
|---|---|---|---|---|---|---|---|---|
| 0000564600 | 0363 | 2E00 | C89B | 0001 | 0100 | 0100 | 0700 | 7A74 |
| 0000564620 | 6573 | 2E74 | 0063 | 0000 | 0000 | 0000 | 0100 | 0000 |
| 0000564640 | 0900 | 6974 | 656D | 6573 | 2E74 | 0363 | F600 | F69C |
| 0000564660 | 0000 | 0100 | 0100 | 0A00 | 7464 | 786F | 6974 | 656D |
| 0000564700 | 632E | 0000 | 0000 | 0000 | 0000 | 0001 | 0000 | 5F0C |
| 0000564720 | 6963 | 696E | 7474 | 2E6D | 7361 | 036D | EC00 | 5C9D |
| 0000564740 | 0000 | 0100 | 0100 | 0700 | 6C63 | 636F | 2E6B | 0363 |
| 0000564760 | 4800 | 2E9E | 0000 | 0100 | 0100 | 0B00 | 7473 | 7272 |
| 0000565000 | 6863 | 2E72 | 7361 | 036D | 7600 | 249E | 0000 | 0100 |
| 0000565020 | 0100 | 0A00 | 7473 | 7572 | 7270 | 612E | 6D73 | 0003 |
| 0000565040 | 9E9A | 00CA | 0000 | 0001 | 0001 | 680B | 656D | 636D |
| 0000565060 | 7970 | 612E | 6D73 | 0003 | 9F64 | 005E | 0000 | 0001 |
| 0000565100 | 0001 | 680B | 656D | 636D | 7970 | 612E | 6D73 | 0003 |
| 0000565120 | 9FC2 | 0048 | 0000 | 0001 | 0001 | 680B | 656D | 736D |
| 0000565140 | 7465 | 612E | 6D73 | 0003 | A00A | 0063 | 0000 | 0001 |
| 0000565160 | 0001 | 7808 | 6F74 | 2E61 | 7361 | 036D | 6E00 | 0EA0 |
| 0000565200 | 0000 | 0100 | 0100 | 0500 | 6261 | 2E73 | 0363 | 7C00 |
| 0000565220 | 1AA0 | 0000 | 0100 | 0100 | 0F00 | 736F | 5C32 | 7277 |
| 0000565240 | 3274 | 7265 | 2E72 | 7361 | 036D | 9600 | 1DA0 | 0000 |
| 0000565260 | 0100 | 0100 | 0E00 | 736F | 5C32 | 6E75 | 696C | 6B6E |
| 0000565300 | 612E | 6D73 | 0003 | A0B4 | 0022 | 0000 | 0001 | 0001 |
| 0000565320 | 6109 | 6D6C | 6C75 | 612E | 6D73 | 0003 | A0D6 | 001F |
| 0000565340 | 0000 | 0001 | 0001 | 6109 | 736C | 6C68 | 612E | 6D73 |
| 0000565360 | 0003 | A0F6 | 009A | 0000 | 0001 | 0001 | 6C08 | 6964 |
| 0000565400 | 2E76 | 7361 | 036D | 9000 | 32A1 | 0000 | 0100 | 0100 |
| 0000565420 | 0800 | 6D6C | 6C75 | 612E | 6D73 | 0003 | A1C2 | 000B |
| 0000565440 | 0000 | 0001 | 0001 | 6C08 | 6873 | 2E6C | 7361 | 036D |
| 0000565460 | CE00 | A6A1 | 0000 | 0100 | 0100 | 1600 | 6D5C | 7472 |
| 0000565500 | 635C | 6D6F | 6F6D | 5C6E | 666D | 6163 | 6C6C | 612E |
| 0000565520 | 6D73 | 0003 | A274 | 03D3 | 0000 | 0001 | 0001 | 5C16 |
| 0000565540 | 726D | 5C74 | 6F63 | 6D6D | 6E6F | 695C | 6378 | 6E6F |
| 0000565560 | 2E76 | 5341 | 034D | 4800 | B8A6 | 0000 | 0100 | 0100 |
| 0000565600 | 1600 | 6D5C | 7472 | 635C | 6D6F | 6F6D | 5C6E | 7869 |
| 0000565620 | 6F63 | 706D | 412E | 4D53 | 0003 | A700 | 02FA | 0000 |
| 0000565640 | 0001 | 0001 | 5C16 | 726D | 5C74 | 6F63 | 6D6D | 6E6F |
| 0000565660 | 625C | 6D34 | 7461 | 2E68 | 5341 | 034D | FA00 | C0A9 |
| 0000565700 | 0005 | 0100 | 0100 | 1600 | 6D5C | 7472 | 635C | 6D6F |
| 0000565720 | 6F6D | 5C6E | 3862 | 616D | 6874 | 412E | 4D53 | 0003 |
| 0000565740 | AFBA | 018B | 0000 | 0001 | 0001 | 5C17 | 726D | 5C74 |
| 0000565760 | 6F63 | 6D6D | 6E6F | 6D5C | 3869 | 6F66 | 7475 | 612E |
| 0000566000 | 6D73 | 0003 | B145 | 0338 | 0000 | 0001 | 0001 | 5C16 |
| 0000566020 | 726D | 5C74 | 6F63 | 6D6D | 6E6F | 6D5C | 3869 | 6966 |
| 0000566040 | 2E6E | 7361 | 036D | 7D00 | 8AB4 | 0001 | 0100 | 0100 |
| 0000566060 | 1700 | 6D5C | 7472 | 635C | 6D6F | 6F6D | 5C6E | 696D |
| 0000566100 | 7438 | 756D | 2E6C | 7361 | 036D | 0800 | 57B6 | 0000 |
| 0000566120 | 0100 | 0100 | 1100 | 6D5C | 7472 | 635C | 6D5C | 6D61 |
| 0000566140 | 7470 | 2E64 | 7361 | 036D | 6000 | 14B6 | 0000 | 0100 |
| 0000566160 | 0100 | 1200 | 6D5C | 7472 | 635C | 665C | 746C | 7375 |
| 0000566200 | 6465 | 412E | 4D53 | 0003 | B674 | 0729 | 0000 | 0001 |
| 0000566220 | 0001 | 5C11 | 726D | 5C74 | 5C63 | 636D | 6163 | 6C6C |
| 0000566240 | 612E | 6D73 | 0003 | BD9E | 0095 | 0000 | 0001 | 0001 |
| 0000566260 | 5C12 | 726D | 5C74 | 5C63 | 636D | 6163 | 6C6C | 2E71 |
| 0000566300 | 7361 | 036D | 3400 | 84BE | 0000 | 0100 | 0100 | 1200 |
| 0000566320 | 6D5C | 7472 | 635C | 6D5C | 6363 | 6C61 | 656C | 612E |
| 0000566340 | 6D73 | 0003 | BEB8 | 00B5 | 0000 | 0001 | 0001 | 5C10 |
| 0000566360 | 726D | 5C74 | 5C63 | 636D | 6966 | 2E6E | 7361 | 036D |
| 0000566400 | 6E00 | 40BF | 0000 | 0100 | 0100 | 1100 | 6D5C | 7472 |
| 0000566420 | 635C | 6D5C | 6663 | 756F | 2E74 | 7361 | 036D | AE00 |
| 0000566440 | 3EBF | 0006 | 0100 | 0100 | 0C00 | 6D5C | 7472 | 635C |

THU MAR 14 17:25:16 1991 CRV_IPS.DLL PAGE 202, LINE 11860

| | | | | | | | | |
|---|---|---|---|---|---|---|---|---|
| 0000566460 | 635C | 7476 | 632E | 0003 | CC14 | 19D6 | 0000 | 0004 |
| 0000566500 | 0001 | 6908 | 6470 | 6669 | 2E63 | 0363 | EA00 | 9FE5 |
| 0000566520 | 0006 | 0400 | 0100 | 0800 | 7069 | 6C64 | 7264 | 632E |
| 0000566540 | 0003 | C5EC | 01AB | 0000 | 0001 | 0001 | 6609 | 6572 |
| 0000566560 | 6461 | 612E | 6D73 | 0003 | C798 | 010E | 0000 | 0001 |
| 0000566600 | 0001 | 640E | 6C6C | 745C | 7268 | 6165 | 2E64 | 7361 |
| 0000566620 | 036D | A600 | CEC8 | 0000 | 0100 | 0100 | 0700 | 7366 |
| 0000566640 | 6565 | 2E6B | 0363 | 7400 | 1FC9 | 0000 | 0100 | 0100 |
| 0000566660 | 0900 | 6C61 | 6873 | 2E72 | 7361 | 036D | 9400 | ADC9 |
| 0000566700 | 0000 | 0100 | 0100 | 0800 | 726C | 6D65 | 612E | 6D73 |
| 0000566720 | 0003 | CA34 | 01D4 | 0000 | 0001 | 0001 | 6607 | 6574 |
| 0000566740 | 6C6C | 632E | 0003 | CC08 | 000B | 0000 | 0001 | 0001 |
| 0000566760 | 6C08 | 6873 | 2E72 | 7361 | 006D | 0100 | 0E00 | 1107 |
| 0000567000 | 5243 | 5F56 | 4544 | 4946 | 454E | 465F | 4C49 | 4554 |
| 0000567020 | 1152 | 0101 | 1000 | 0F07 | 5243 | 5F56 | 4445 | 5449 |
| 0000567040 | 465F | 4C49 | 4554 | EB52 | 0101 | 1100 | 0D07 | 5243 |
| 0000567060 | 5F56 | 4552 | 4553 | 5F54 | 4F41 | 5A49 | 0102 | 1400 |
| 0000567100 | 0E07 | 5243 | 5F56 | 4553 | 5F54 | 4946 | 544C | 5245 |
| 0000567120 | 03C8 | 0001 | 0718 | 430E | 5652 | 505F | 5455 | 465F |
| 0000567140 | 4C49 | 4554 | D052 | 0106 | 1A00 | 1707 | 5243 | 5F56 |
| 0000567160 | 4553 | 454C | 5443 | 475F | 4152 | 4850 | 4349 | 4D5F |
| 0000567200 | 444F | 2445 | 010B | 1E00 | 1407 | 5243 | 5F56 | 4944 |
| 0000567220 | 5053 | 435F | 5255 | 4552 | 544E | 415F | 494F | 0CBD |
| 0000567240 | 0001 | 071F | 5F12 | 7263 | 5F76 | 7473 | 706F | 645F |
| 0000567260 | 7369 | 5F70 | 6F61 | 7869 | 010D | 2100 | 1007 | 5243 |
| 0000567300 | 5F56 | 4944 | 5053 | 414C | 5F59 | 414D | 4B53 | 1FBD |
| 0000567320 | 0001 | 073C | 5F19 | 7263 | 5F76 | 6F63 | 766E | 325F |
| 0000567340 | 745F | 6261 | 656C | 5F74 | 6F66 | 6D72 | 7461 | 2665 |
| 0000567360 | 0001 | 0703 | 5F0C | 7264 | 6761 | 665F | 6C69 | 6574 |
| 0000567400 | 5272 | 0127 | 0500 | 0707 | 725F | 7365 | 7A69 | 5365 |
| 0000567420 | 0128 | 0700 | 0907 | 755F | 6470 | 5F74 | 7470 | E872 |
| 0000567440 | 0129 | 0900 | 0C07 | 645F | 6172 | 5F77 | 7563 | 7372 |
| 0000567460 | 726F | 2A4E | 0001 | 070B | 5F0D | 7265 | 7361 | 5F65 |
| 0000567500 | 7563 | 7372 | 726F | 2AB1 | 0001 | 070D | 5F0C | 6F6D |
| 0000567520 | 6576 | 635F | 7275 | 6F73 | 0A72 | 012B | 0F00 | 0A07 |
| 0000567540 | 6E5F | 6D72 | 5F6C | 6C66 | 7274 | 2CAD | 0001 | 0713 |
| 0000567560 | 5F0E | 7473 | 7261 | 5F74 | 7067 | 645F | 6172 | E177 |
| 0000567600 | 012C | 1400 | 1207 | 745F | 7265 | 696D | 616E | 6574 |
| 0000567620 | 675F | 5F70 | 7264 | 7761 | 2D22 | 0001 | 0716 | 5F17 |
| 0000567640 | 7263 | 5F76 | 7562 | 6C69 | 5F64 | 6174 | 6C62 | 7465 |
| 0000567660 | 745F | 6261 | 656C | 2F48 | 0001 | 071B | 5F16 | 6573 |
| 0000567700 | 5F74 | 6964 | 7073 | 616C | 5F79 | 616D | 6B73 | 665F |
| 0000567720 | 616C | 6967 | 012F | 1C00 | 1807 | 725F | 7365 | 7465 |
| 0000567740 | 645F | 7369 | 6C70 | 7961 | 6D5F | 7361 | 5F6B | 6C66 |
| 0000567760 | 6761 | 2F8A | 0001 | 071E | 5F0C | 616D | 6B73 | 665F |
| 0000570000 | 6C69 | 6574 | 2272 | 0130 | 1F00 | 0A07 | 645F | 6172 |
| 0000570020 | 5F77 | 616D | 6B73 | 3063 | 0001 | 0720 | 5F0D | 6964 |
| 0000570040 | 7073 | 616C | 5F79 | 616D | 6B73 | 2312 | 0001 | 06FD |
| 0000570060 | 5F0C | 7264 | 7761 | 665F | 6C69 | 6574 | F772 | 0123 |
| 0000570100 | FF00 | 0C06 | 6D5F | 7261 | 5F6B | 6966 | 746C | 7265 |
| 0000570120 | 24DC | 0001 | 0701 | 5F0C | 6F6D | 6576 | 665F | 6C69 |
| 0000570140 | 6574 | 8472 | 0130 | 4100 | 1C07 | 5243 | 5F56 | 4944 |
| 0000570160 | 5053 | 414C | 5F59 | 554D | 544C | 5049 | 454C | 535F |
| 0000570200 | 5243 | 4545 | 534E | 41A2 | 0001 | 0749 | 4310 | 5652 |
| 0000570220 | 445F | 5349 | 4C50 | 5941 | 445F | 4649 | 0746 | 015F |
| 0000570240 | 5300 | 1907 | 5243 | 5F56 | 4944 | 5053 | 414C | 5F59 |
| 0000570260 | 4F54 | 4747 | 454C | 535F | 5243 | 4545 | AC4E | 0169 |
| 0000570300 | 5B00 | 1007 | 5243 | 5F56 | 5453 | 504F | 445F | 5349 |
| 0000570320 | 4C50 | 5941 | 78D2 | 0001 | 0766 | 4311 | 5652 | 555F |

THU MAR 14 17:25:16 1991 CRV_IPS.DLL PAGE 203, LINE 11919

| | | | | | | | | |
|---|---|---|---|---|---|---|---|---|
| 0000570340 | 4450 | 5441 | 5F45 | 4353 | 4552 | 4E45 | 0F06 | 0007 |
| 0000570360 | 0683 | 5F09 | 7069 | 5F73 | 6164 | 6174 | 0F3C | 0007 |
| 0000570400 | 0686 | 5F0B | 7069 | 5F73 | 6977 | 646E | 776F | A4C8 |
| 0000570420 | 0001 | 0712 | 4914 | 494E | 5F54 | 4C47 | 424F | 4C41 |
| 0000570440 | 495F | 5350 | 445F | 5441 | 5A41 | 01AA | 1E00 | 0E07 |
| 0000570460 | 5347 | 5F50 | 4E49 | 5449 | 4C49 | 4149 | 455A | AACC |
| 0000570500 | 0001 | 0720 | 5F13 | 7367 | 5F70 | 6E65 | 6261 | 656C |
| 0000570520 | 6F5F | 6576 | 6C72 | 7961 | AB42 | 0001 | 0721 | 470D |
| 0000570540 | 5053 | 545F | 5245 | 494D | 414E | 4554 | AB72 | 0001 |
| 0000570560 | 0722 | 470C | 5053 | 415F | 5443 | 5649 | 5441 | 4C45 |
| 0000570600 | 01B6 | 2E00 | 0E07 | 5347 | 5F50 | 4C43 | 4145 | 5F4E |
| 0000570620 | 414D | 4B53 | B6A2 | 0001 | 0730 | 470D | 5053 | 535F |
| 0000570640 | 5445 | 505F | 5241 | 4D41 | B7A3 | 0001 | 0731 | 490E |
| 0000570660 | 5350 | 435F | 4F4C | 4553 | 545F | 5345 | D354 | 01B7 |
| 0000570700 | 3200 | 1307 | 5049 | 5F53 | 4C43 | 534F | 5F45 | 4944 |
| 0000570720 | 4646 | 545F | 5345 | 0354 | 01B8 | 3400 | 0D07 | 5049 |
| 0000570740 | 5F53 | 504F | 4E45 | 545F | 5345 | 3A54 | 01B8 | 3600 |
| 0000570760 | 1207 | 5049 | 5F53 | 504F | 4E45 | 445F | 4649 | 5F46 |
| 0000571000 | 4554 | 5453 | 296F | 0002 | 074B | 4310 | 5652 | 565F |
| 0000571020 | 5245 | 4649 | 5F59 | 4D49 | 4741 | 0245 | 023C | 5C00 |
| 0000571040 | 1207 | 635F | 7672 | 765F | 7265 | 6669 | 5F79 | 6373 |
| 0000571060 | 6572 | 6E65 | 55E1 | 0002 | 0762 | 5F15 | 7263 | 5F76 |
| 0000571100 | 6576 | 6972 | 7966 | 735F | 6769 | 616E | 7574 | 6572 |
| 0000571120 | 6A78 | 0002 | 0766 | 430F | 5652 | 565F | 5245 | 4649 |
| 0000571140 | 5F59 | 5953 | 434E | 8AD9 | 0002 | 076F | 4316 | 5652 |
| 0000571160 | 435F | 4548 | 4B43 | 485F | 5F57 | 5453 | 4241 | 4C49 |
| 0000571200 | 5449 | 0059 | 0200 | 3300 | 1207 | 5243 | 5F56 | 4143 |
| 0000571220 | 5450 | 5255 | 5F45 | 4353 | 4552 | 4E45 | 1562 | 0002 |
| 0000571240 | 0740 | 4310 | 5652 | 435F | 5041 | 5554 | 4552 | 535F |
| 0000571260 | 4E59 | 2143 | 0218 | 4200 | 1807 | 5243 | 5F56 | 4143 |
| 0000571300 | 5450 | 5255 | 5F45 | 4F4C | 4143 | 4F54 | 5F52 | 5953 |
| 0000571320 | 434E | 1FD2 | 0002 | 0745 | 430F | 5652 | 435F | 5041 |
| 0000571340 | 5554 | 4552 | 535F | 4749 | 291B | 0002 | 0749 | 4319 |
| 0000571360 | 5652 | 545F | 4D49 | 5F45 | 5246 | 4D4F | 4C5F | 5341 |
| 0000571400 | 5F54 | 4843 | 4E41 | 4547 | 9955 | 0002 | 0759 | 4318 |
| 0000571420 | 5652 | 475F | 5445 | 4C5F | 434F | 5441 | 524F | 505F |
| 0000571440 | 534F | 5449 | 4F49 | DA4E | 0299 | 5B00 | 1607 | 5243 |
| 0000571460 | 5F56 | 4E49 | 5449 | 4C5F | 434F | 5441 | 524F | 545F |
| 0000571500 | 4152 | 4B43 | 9A4A | 0002 | 075D | 4315 | 5652 | 455F |
| 0000571520 | 444E | 4C5F | 434F | 5441 | 524F | 545F | 4152 | 4B43 |
| 0000571540 | 9ABA | 0002 | 075E | 4316 | 5652 | 4C5F | 434F | 5441 |
| 0000571560 | 4F49 | 5F4E | 4F4E | 5F54 | 4156 | 494C | EB44 | 029A |
| 0000571600 | 6000 | 1807 | 5243 | 5F56 | 4553 | 5F54 | 4F4D | 5355 |
| 0000571620 | 5F45 | 5254 | 4341 | 5F4B | 4F4D | 4544 | 9B0F | 0002 |
| 0000571640 | 0762 | 5F12 | 7263 | 5F76 | 6170 | 7373 | 7669 | 5F65 |
| 0000571660 | 656C | 7261 | 1C6E | 028C | 4400 | 1807 | 5243 | 5F56 |
| 0000571700 | 454C | 5241 | 5F4E | 4353 | 4C41 | 5F45 | 5546 | 434E |
| 0000571720 | 4954 | 4E4F | 8EEC | 0002 | 074A | 4313 | 5652 | 525F |
| 0000571740 | 4145 | 5F44 | 4353 | 4C41 | 5F45 | 5546 | 434E | 93C2 |
| 0000571760 | 0002 | 0750 | 5F15 | 7263 | 5F76 | 7277 | 7469 | 5F65 |
| 0000572000 | 6373 | 6C61 | 5F65 | 7566 | 636E | 98E5 | 0002 | 0757 |
| 0000572020 | 4310 | 5652 | 4D5F | 564F | 5F45 | 4F4C | 4143 | 4F54 |
| 0000572040 | 0052 | 0700 | 8100 | 0B00 | 785F | 6572 | 5F73 | 6E75 |
| 0000572060 | 7469 | 6673 | 071C | 8100 | 0500 | 785F | 6572 | 0273 |
| 0000572100 | 0700 | 8100 | 0B00 | 795F | 6572 | 5F73 | 6E75 | 7469 |
| 0000572120 | 6873 | 071C | 8100 | 0500 | 795F | 6572 | A873 | 02C6 |
| 0000572140 | 0B00 | 0B08 | 6D5F | 766F | 5F65 | 6F6D | 7375 | 3B65 |
| 0000572160 | 02CD | 1100 | 1608 | 635F | 7672 | 6D5F | 756F | 705F |
| 0000572200 | 7361 | 6973 | 6576 | 6C5F | 6165 | 6E72 | D9AF | 0002 |

THU MAR 14 17:25:16 1991 CRV_IPS.DLL PAGE 204, LINE 11978

| | | | | | | | | |
|---|---|---|---|---|---|---|---|---|
| 0000572220 | 0821 | 5F1E | 7263 | 5F76 | 6E69 | 6176 | 696C | 6164 |
| 0000572240 | 6574 | 6C5F | 7361 | 5F74 | 6F6D | 7375 | 5F65 | 6F6C |
| 0000572260 | D363 | 02D9 | 2300 | 1708 | 635F | 7672 | 735F | 7465 |
| 0000572300 | 6C5F | 7361 | 5F74 | 6F6D | 7375 | 5F65 | 6F6C | 0363 |
| 0000572320 | 02DA | 2500 | 1408 | 635F | 7672 | 6C5F | 6165 | 6E72 |
| 0000572340 | 725F | 6C65 | 735F | 6163 | 656C | DF8B | 0002 | 0829 |
| 0000572360 | 5F18 | 7263 | 5F76 | 6572 | 6461 | 725F | 6C65 | 735F |
| 0000572400 | 6163 | 656C | 665F | 6E75 | 5F63 | 02E2 | 2D00 | 1908 |
| 0000572420 | 635F | 7672 | 775F | 6972 | 6574 | 725F | 6C65 | 735F |
| 0000572440 | 6163 | 656C | 665F | 6E75 | 4D63 | 02EE | 3500 | 1008 |
| 0000572460 | 705F | 7869 | 656C | 5F73 | 6F74 | 755F | 696E | 7374 |
| 0000572500 | F059 | 0002 | 0837 | 5F10 | 6E75 | 7469 | 5F73 | 6F74 |
| 0000572520 | 705F | 7869 | 656C | 5173 | 02F1 | 3900 | 0A08 | 675F |
| 0000572540 | 7465 | 755F | 696E | 7374 | F8DC | 0002 | 0840 | 5F0F |
| 0000572560 | 6C63 | 7069 | 745F | 5F6F | 6977 | 646E | 776F | 9B38 |
| 0000572600 | 0002 | 07E9 | 5F17 | 7263 | 5F76 | 6567 | 5F74 | 6F6D |
| 0000572620 | 7375 | 5F65 | 6F70 | 6973 | 6974 | 6E6F | 9F97 | 0002 |
| 0000572640 | 07F1 | 5F15 | 7263 | 5F76 | 6E69 | 7469 | 6D5F | 756F |
| 0000572660 | 6573 | 745F | 6172 | 6B63 | A319 | 0002 | 07F5 | 5F14 |
| 0000572700 | 7263 | 5F76 | 6E65 | 5F64 | 6F6D | 7375 | 5F65 | 7274 |
| 0000572720 | 6361 | 006B | 0300 | 9C00 | 1407 | 635F | 7672 | 735F |
| 0000572740 | 7465 | 695F | 6F63 | 5F6E | 656D | 6772 | 6465 | 0046 |
| 0000572760 | 0003 | 079E | 5F14 | 7263 | 5F76 | 6573 | 5F74 | 6369 |
| 0000573000 | 6E6F | 735F | 6D61 | 6C70 | CE65 | 032A | E200 | 0D05 |
| 0000573020 | 5243 | 5F56 | 4E49 | 5449 | 495F | 4F43 | 284E | 032B |
| 0000573040 | E300 | 0C05 | 5243 | 5F56 | 4E45 | 5F44 | 4349 | 4E4F |
| 0000573060 | 2B8F | 0003 | 05E5 | 4310 | 5652 | 435F | 4E4F | 5254 |
| 0000573100 | 4C4F | 495F | 4F43 | 9E4E | 0359 | 1400 | 1406 | 5243 |
| 0000573120 | 5F56 | 5544 | 504D | 495F | 4F43 | 534E | 545F | 5F4F |
| 0000573140 | 5047 | 5B77 | 0003 | 0616 | 4314 | 5652 | 435F | 554F |
| 0000573160 | 544E | 495F | 4F43 | 5F4E | 4154 | 4C42 | 5045 | 071C |
| 0000573200 | F700 | 0906 | 675F | 5F70 | 7473 | 7261 | 8274 | 071C |
| 0000573220 | F700 | 0A06 | 675F | 5F70 | 6573 | 7261 | 6863 | 1C6E |
| 0000573240 | 0007 | 06FA | 5F08 | 7067 | 645F | 7461 | 6A61 | 071C |
| 0000573260 | 8600 | 0D00 | 675F | 5F70 | 6C66 | 6761 | 5F73 | 6461 |
| 0000573300 | 4872 | 070F | C700 | 0906 | 675F | 5F70 | 6C66 | 6761 |
| 0000573320 | 1373 | 0361 | 4D00 | 1807 | 635F | 6568 | 6B63 | 6C5F |
| 0000573340 | 7361 | 5F74 | 7665 | 6E65 | 5F74 | 7473 | 6261 | 656C |
| 0000573360 | 61A0 | 0003 | 074E | 5F14 | 6E69 | 7469 | 655F | 6576 |
| 0000573400 | 746E | 725F | 6365 | 6965 | 6576 | 0664 | 0362 | 5000 |
| 0000573420 | 1107 | 735F | 7475 | 6D5F | 766F | 5F65 | 6F6C | 6163 |
| 0000573440 | 6F74 | C172 | 0362 | 5100 | 0E07 | 635F | 7672 | 6C5F |
| 0000573460 | 636F | 7461 | 726F | 785F | 62E2 | 0003 | 0752 | 5F0E |
| 0000573500 | 7263 | 5F76 | 6F6C | 6163 | 6F74 | 5F72 | 0379 | 0363 |
| 0000573520 | 5400 | 1207 | 635F | 7672 | 735F | 7465 | 6C5F | 636F |
| 0000573540 | 7461 | 726F | 785F | 6347 | 0003 | 0756 | 5F12 | 7263 |
| 0000573560 | 5F76 | 6573 | 5F74 | 6F6C | 6163 | 6F74 | 5F72 | 8B79 |
| 0000573600 | 0363 | 5800 | 1207 | 635F | 7672 | 695F | 636E | 6C5F |
| 0000573620 | 636F | 7461 | 726F | 785F | 63D7 | 0003 | 075A | 5F12 |
| 0000573640 | 7263 | 5F76 | 6E69 | 5F63 | 6F6C | 6163 | 6F74 | 5F72 |
| 0000573660 | 2379 | 0364 | 5B00 | 1B07 | 635F | 7672 | 6C5F | 636F |
| 0000573700 | 7461 | 726F | 705F | 736F | 7469 | 6F69 | 5F6E | 6E6B |
| 0000573720 | 776F | 446E | 0364 | 5D00 | 1F07 | 635F | 7672 | 735F |
| 0000573740 | 7465 | 6C5F | 636F | 7461 | 726F | 705F | 736F | 7469 |
| 0000573760 | 6F69 | 5F6E | 6E6B | 776F | 7E6E | 0827 | 8500 | 1600 |
| 0000574000 | 735F | 6163 | 656C | 6E5F | 746F | 695F | 696E | 6974 |
| 0000574020 | 6C61 | 7A69 | 6465 | 2780 | 0008 | 04E7 | 5F0D | 6373 |
| 0000574040 | 6C61 | 5F65 | 6977 | 646E | 776F | 2788 | 0008 | 0082 |
| 0000574060 | 5F08 | 6974 | 656D | 756F | 8C74 | 0827 | 8500 | 0F00 |

THU MAR 14 17:25:16 1991 CRV_IPS.DLL PAGE 205, LINE 12037

| | | | | | | | | |
|---|---|---|---|---|---|---|---|---|
| 0000574100 | 745F | 6D69 | 6F65 | 7475 | 665F | 6172 | 656D | 8E73 |
| 0000574120 | 0827 | 8500 | 1100 | 735F | 6174 | 6962 | 696C | 7974 |
| 0000574140 | 665F | 6361 | 6F74 | 2472 | 035E | 4300 | 1407 | 675F |
| 0000574160 | 7073 | 705F | 6572 | 6170 | 6572 | 635F | 6D6F | 616D |
| 0000574200 | 646E | 5ED5 | 0003 | 0745 | 5F15 | 7367 | 5F70 | 7061 |
| 0000574220 | 6C70 | 6369 | 695F | 6F63 | 5F6E | 6572 | 7463 | 5F24 |
| 0000574240 | 0003 | 0746 | 5F08 | 7067 | 735F | 6E79 | A063 | 035F |
| 0000574260 | 4800 | 1307 | 675F | 7073 | 735F | 7263 | 6565 | 5F6E |
| 0000574300 | 6863 | 6E61 | 6567 | 1D64 | 0360 | 4900 | 1007 | 675F |
| 0000574320 | 7073 | 735F | 7263 | 6565 | 5F6E | 6162 | 6B63 | 6088 |
| 0000574340 | 0003 | 074B | 5F1A | 6863 | 6365 | 5F6B | 616C | 7473 |
| 0000574360 | 655F | 6576 | 746E | 725F | 6365 | 6965 | 6576 | 8A64 |
| 0000574400 | 0364 | 5700 | 0C07 | 695F | 696E | 5F74 | 6174 | 6C62 |
| 0000574420 | 7465 | 664F | 0003 | 0759 | 5F10 | 656C | 7261 | 5F6E |
| 0000574440 | 6261 | 5F73 | 6373 | 6C61 | 1A65 | 0369 | 5B00 | 0C07 |
| 0000574460 | 6D5F | 766F | 5F65 | 6174 | 6C62 | 7465 | 6B18 | 0003 |
| 0000574500 | 075D | 5F18 | 7263 | 5F76 | 6572 | 6461 | 615F | 7362 |
| 0000574520 | 735F | 6163 | 656C | 665F | 6E75 | 4563 | 036C | 6300 |
| 0000574540 | 1907 | 635F | 7672 | 775F | 6972 | 6574 | 615F | 7362 |
| 0000574560 | 735F | 6163 | 656C | 665F | 6E75 | 2163 | 036D | 6600 |
| 0000574600 | 1807 | 635F | 7672 | 675F | 7465 | 745F | 6261 | 656C |
| 0000574620 | 5F74 | 6F70 | 6973 | 6974 | 6E6F | 6E23 | 0003 | 076A |
| 0000574640 | 5F16 | 7263 | 5F76 | 6E69 | 7469 | 745F | 6261 | 656C |
| 0000574660 | 5F74 | 7274 | 6361 | 4D6B | 036E | 6C00 | 1507 | 635F |
| 0000574700 | 7672 | 655F | 646E | 745F | 6261 | 656C | 5F74 | 7274 |
| 0000574720 | 6361 | BE6B | 0833 | 0000 | 0600 | 655F | 6164 | 6174 |
| 0000574740 | 5650 | 0008 | 0000 | 5F04 | 6E65 | 8864 | 036E | 0000 |
| 0000574760 | 0600 | 5F43 | 4E49 | 5449 | 280A | 0008 | 0000 | 5F0C |
| 0000575000 | 6E5F | 6568 | 7061 | 645F | 7365 | 5063 | 0856 | 0000 |
| 0000575020 | 0C00 | 735F | 6174 | 6B63 | 6F62 | 7474 | 6D6F | 2830 |
| 0000575040 | 0008 | 0000 | 5F0C | 5F5F | 4461 | 7342 | 7077 | 6C66 |
| 0000575060 | FC67 | 0827 | 0000 | 0800 | 5F5F | 6361 | 646D | 6E6C |
| 0000575100 | 282E | 0008 | 0000 | 5F08 | 615F | 6573 | 6867 | 2C69 |
| 0000575120 | 0828 | 0000 | 0800 | 5F5F | 7361 | 6765 | 6F6C | 2808 |
| 0000575140 | 0008 | 0000 | 5F08 | 615F | 6973 | 647A | 0673 | 0828 |
| 0000575160 | 0000 | 0800 | 5F5F | 7461 | 706F | 7073 | 281E | 0008 |
| 0000575200 | 0000 | 5F09 | 615F | 6663 | 6E69 | 6F66 | D6D6 | 0000 |
| 0000575220 | 0001 | 5F09 | 615F | 4244 | 7375 | 6465 | 27FE | 0008 |
| 0000575240 | 0000 | 5F09 | 615F | 6E65 | 7376 | 6765 | 2802 | 0008 |
| 0000575260 | 0000 | 5F0A | 745F | 7268 | 6165 | 6964 | 0064 | 0828 |
| 0000575300 | 0000 | 0A00 | 5F5F | 6967 | 666E | 736F | 6765 | D6D6 |
| 0000575320 | 0000 | 0001 | 5F0A | 615F | 4244 | 6F64 | 7773 | 0470 |
| 0000575340 | 0828 | 0000 | 0A00 | 5F5F | 696C | 666E | 736F | 6765 |
| 0000575360 | 9876 | 0000 | 0001 | 5F0A | 615F | 7263 | 7574 | 6573 |
| 0000575400 | 3264 | 0828 | 0000 | 0B00 | 5F5F | 615F | 4244 | 7472 |
| 0000575420 | 7265 | F972 | 036E | 0000 | 0B00 | 5F5F | 6D61 | 6773 |
| 0000575440 | 655F | 6978 | 4074 | 0828 | 0000 | 0B00 | 5F5F | 736F |
| 0000575460 | 6576 | 7372 | 6F69 | 136E | 0370 | 0000 | 0600 | 5F5F |
| 0000575500 | 7865 | 7469 | 70C5 | 0003 | 0000 | 5F0C | 755F | 6C6E |
| 0000575520 | 636F | 656B | 6978 | 5374 | 082A | 0000 | 0700 | 5F5F |
| 0000575540 | 6863 | 6C69 | 4364 | 0828 | 0000 | 0700 | 5F5F | 666E |
| 0000575560 | 6C69 | 5A65 | 036F | 0000 | 0700 | 5F5F | 6963 | 696E |
| 0000575600 | 4574 | 082A | 0000 | 0700 | 5F5F | 615F | 6772 | 1B63 |
| 0000575620 | 0370 | 0000 | 0700 | 5F5F | 6563 | 6978 | 4074 | 0828 |
| 0000575640 | 0000 | 0D00 | 5F5F | 6F64 | 7673 | 7265 | 616D | 6F6A |
| 0000575660 | 4772 | 082A | 0000 | 0700 | 5F5F | 615F | 6772 | 4176 |
| 0000575700 | 0828 | 0000 | 0D00 | 5F5F | 6F64 | 7673 | 7265 | 696D |
| 0000575720 | 6F6E | 4572 | 0829 | 0000 | 0800 | 5F5F | 6970 | 6570 |
| 0000575740 | 6863 | 2A4B | 0008 | 0000 | 5F08 | 6E65 | 6976 | 6F72 |

THU MAR 14 17:25:16 1991 CRV_IPS.DLL PAGE 206, LINE 12096

| | | | | | | | | |
|---|---|---|---|---|---|---|---|---|
| 0000575760 | 456E | 0828 | 0000 | 0800 | 5F5F | 736F | 6966 | 656C |
| 0000576000 | 2842 | 0008 | 0000 | 5F08 | 6F5F | 6D73 | 646F | B465 |
| 0000576020 | 036F | 0000 | 0800 | 5F5F | 6E69 | 7469 | 7066 | 3184 |
| 0000576040 | 0008 | 0000 | 5F08 | 665F | 6970 | 696E | E874 | 0370 |
| 0000576060 | 0000 | 0800 | 5F5F | 6574 | 6D72 | 7066 | 2A4F | 0008 |
| 0000576100 | 0000 | 5F08 | 705F | 6D67 | 7470 | 2572 | 0370 | 0000 |
| 0000576120 | 0800 | 5F5F | 5F63 | 7865 | 7469 | 2842 | 0008 | 0000 |
| 0000576140 | 5F09 | 645F | 736F | 6F6D | 6564 | 2840 | 0008 | 0000 |
| 0000576160 | 5F09 | 6F5F | 6D73 | 6A61 | 726F | 2841 | 0008 | 0000 |
| 0000576200 | 5F09 | 6F5F | 6D73 | 6E69 | 726F | 2A55 | 0008 | 0000 |
| 0000576220 | 5F0A | 655F | 6978 | 6474 | 6E6F | 7B65 | 0370 | 0000 |
| 0000576240 | 0A00 | 5F5F | 6F6C | 6B63 | 7865 | 7469 | 283E | 0008 |
| 0000576260 | 0000 | 5F0A | 755F | 616D | 6B73 | 6176 | E86C | 0370 |
| 0000576300 | 0000 | 0A00 | 5F5F | 7463 | 7265 | 736D | 6275 | 2A57 |
| 0000576320 | 0008 | 0000 | 5F0A | 655F | 6978 | 5F74 | 6974 | 3464 |
| 0000576340 | 0828 | 0000 | 0500 | 5F5F | 6166 | 0C63 | 0370 | 0000 |
| 0000576360 | 0500 | 655F | 6978 | 0A74 | 0371 | 0000 | 0E00 | 5F5F |
| 0000576400 | 4646 | 4D5F | 4753 | 4142 | 4E4E | 5245 | 2A5A | 0008 |
| 0000576420 | 0000 | 5F09 | 615F | 6264 | 6D67 | 6773 | 9876 | 0000 |
| 0000576440 | 0001 | 5F09 | 615F | 7263 | 6D74 | 6773 | 712C | 0003 |
| 0000576460 | 0000 | 5F08 | 665F | 7470 | 6172 | 5E70 | 082A | 0000 |
| 0000576500 | DC00 | 5F5F | 6161 | 746C | 7473 | 6F6B | 7276 | 7132 |
| 0000576520 | 0003 | 0000 | 5F08 | 635F | 6B68 | 7473 | 326B | 0371 |
| 0000576540 | 0000 | 0A00 | 5F5F | 4661 | 6863 | 736B | 6B74 | 714C |
| 0000576560 | 0003 | 0000 | 5F09 | 735F | 7465 | 6E65 | 7076 | 7254 |
| 0000576600 | 0003 | 0000 | 5F0B | 4E5F | 534D | 5F47 | 4554 | 5458 |
| 0000576620 | 7284 | 0003 | 0000 | 5F0C | 4E5F | 534D | 5F47 | 5257 |
| 0000576640 | 5449 | 6645 | 0373 | 0000 | 0B00 | 5F5F | 645F | 736F |
| 0000576660 | 7265 | 6E72 | 6E6F | 0373 | 0000 | 0700 | 5F5F | 7265 |
| 0000576700 | 6E72 | 1F6F | 0373 | 0000 | 0800 | 5F5F | 6F64 | 7273 |
| 0000576720 | 7465 | 7306 | 0003 | 0000 | 5F09 | 645F | 736F | 6572 |
| 0000576740 | 6674 | 73C6 | 0003 | 0000 | 5F0B | 665F | 6C63 | 736F |
| 0000576760 | 5F65 | 6B6C | 737A | 0003 | 0000 | 5F07 | 6366 | 6F6C |
| 0000577000 | 6573 | 747C | 0003 | 0000 | 5F08 | 665F | 6F73 | 6570 |
| 0000577020 | CE6E | 0374 | 0000 | 0600 | 665F | 706F | 6E65 | 74E6 |
| 0000577040 | 0003 | 0000 | 5F08 | 7066 | 6972 | 746E | 4066 | 0375 |
| 0000577060 | 0000 | 0700 | 665F | 6373 | 6E61 | 8266 | 0375 | 0000 |
| 0000577100 | 0700 | 705F | 6972 | 746E | 6666 | 082A | 0000 | 0800 |
| 0000577120 | 5F5F | 6663 | 756C | 6873 | 0D06 | 0007 | 0000 | 5F07 |
| 0000577140 | 625F | 6675 | 6E69 | 2A68 | 0008 | 0000 | 5F05 | 695F |
| 0000577160 | 626F | 2C48 | 0008 | 0000 | 5F06 | 695F | 626F | 2832 |
| 0000577200 | 082E | 0000 | 0900 | 5F5F | 616C | 7473 | 6F69 | D062 |
| 0000577220 | 0375 | 0000 | 0800 | 5F5F | 6966 | 626C | 6675 | 766C |
| 0000577240 | 0003 | 0000 | 5F08 | 665F | 736C | 7562 | 5266 | 0377 |
| 0000577260 | 0000 | 0900 | 5F5F | 7266 | 6565 | 7562 | 8A66 | 0377 |
| 0000577300 | 0000 | 0800 | 5F5F | 6567 | 6274 | 6675 | 77D6 | 0003 |
| 0000577320 | 0000 | 5F0A | 6F5F | 6570 | 666E | 6C69 | 4065 | 0379 |
| 0000577340 | 0000 | 0700 | 5F5F | 7466 | 7562 | C866 | 0378 | 0000 |
| 0000577360 | 0700 | 5F5F | 7473 | 7562 | CE66 | 0379 | 0000 | 0B00 |
| 0000577400 | 5F5F | 6666 | 756C | 6873 | 6C5F | 886B | 0379 | 0000 |
| 0000577420 | 0700 | 665F | 6C66 | 7375 | 3A68 | 037A | 0000 | 0900 |
| 0000577440 | 665F | 756C | 6873 | 6C61 | B66C | 037A | 0000 | 0700 |
| 0000577460 | 5F5F | 6E69 | 7570 | F074 | 0382 | 0000 | 0800 | 5F5F |
| 0000577500 | 756F | 7074 | 7475 | 87DA | 0003 | 0000 | 5F0B | 675F |
| 0000577520 | 7465 | 7473 | 6572 | 6D61 | 8852 | 0003 | 0000 | 5F07 |
| 0000577540 | 6E75 | 6567 | 6374 | 8892 | 0003 | 0000 | 5F0B | 755F |
| 0000577560 | 676E | 7465 | 5F63 | 6B6C | 88FC | 0003 | 0000 | 5F06 |
| 0000577600 | 6C63 | 736F | 4665 | 0389 | 0000 | 0600 | 6C5F | 6573 |
| 0000577620 | 6B65 | 893C | 0003 | 0000 | 5F0A | 6C5F | 6573 | 6B65 |

THU MAR 14 17:25:16 1991 CRV_IPS.DLL PAGE 207, LINE 12155

| | | | | | | | | |
|---|---|---|---|---|---|---|---|---|
| 0000577640 | 6C5F | B46B | 0389 | 0000 | 0600 | 735F | 706F | 6E65 |
| 0000577660 | 89C5 | 0003 | 0000 | 5F05 | 706F | 6E65 | 8B80 | 0003 |
| 0000577700 | 0000 | 5F11 | 635F | 4558 | 494E | 7458 | 446F | 534F |
| 0000577720 | 6F6D | 6564 | 8B92 | 0003 | 0000 | 5F05 | 6572 | 6461 |
| 0000577740 | 8CFA | 0003 | 0000 | 5F06 | 7277 | 7469 | F065 | 038C |
| 0000577760 | 0000 | 0A00 | 5F5F | 7277 | 7469 | 5F65 | 6B6C | 2E9E |
| 0000600000 | 0008 | 0000 | 5F07 | 665F | 6F6D | 6564 | 2E9E | 0008 |
| 0000600020 | 0000 | 5F08 | 695F | 6D6F | 646F | CE65 | 038E | 0000 |
| 0000600040 | 0700 | 6D5F | 6C61 | 6F6C | D363 | 038E | 0000 | 0A00 |
| 0000600060 | 6D5F | 6C61 | 6F6C | 5F63 | 6B6C | 8EDD | 0003 | 0000 |
| 0000600100 | 5F08 | 7266 | 6565 | 6C5F | D86B | 038E | 0000 | 0500 |
| 0000600120 | 665F | 6572 | 1465 | 038F | 0000 | 0C00 | 5F5F | 6D66 |
| 0000600140 | 6C61 | 6F6C | 5F63 | 6B6C | 8EE2 | 0003 | 0000 | 5F07 |
| 0000600160 | 665F | 7266 | 6565 | 8EF5 | 0003 | 0000 | 5F09 | 665F |
| 0000600200 | 616D | 6C6C | 636F | 8EE2 | 0003 | 0000 | 5F0A | 665F |
| 0000600220 | 7266 | 6565 | 6C5F | A06B | 082E | 0000 | 0700 | 5F5F |
| 0000600240 | 6866 | 6165 | 9270 | 038F | 0000 | 0900 | 5F5F | 6E69 |
| 0000600260 | 7469 | 6573 | C667 | 038F | 0000 | 0900 | 5F5F | 696C |
| 0000600300 | 6B6E | 6573 | FC67 | 038F | 0000 | 0B00 | 5F5F | 6573 |
| 0000600320 | 7261 | 6863 | 6573 | 0767 | 0391 | 0000 | 0800 | 5F5F |
| 0000600340 | 6E69 | 7363 | 6765 | 9078 | 0003 | 0000 | 5F09 | 675F |
| 0000600360 | 6F72 | 7377 | 6765 | 913A | 0003 | 0000 | 5F0A | 665F |
| 0000600400 | 6E69 | 6C64 | 7361 | AE74 | 082E | 0000 | 0A00 | 5F5F |
| 0000600420 | 6D61 | 6C62 | 736B | 7A69 | 915A | 0003 | 0000 | 5F08 |
| 0000600440 | 6E5F | 7765 | 6573 | 8C67 | 0391 | 0000 | 0700 | 735F |
| 0000600460 | 7274 | 6163 | D274 | 0391 | 0000 | 0700 | 735F | 7274 |
| 0000600500 | 7063 | 0879 | 0392 | 0000 | 0700 | 735F | 7274 | 6D63 |
| 0000600520 | 3270 | 0392 | 0000 | 0700 | 735F | 7274 | 656C | 4A6E |
| 0000600540 | 0392 | 0000 | 0800 | 735F | 7274 | 636E | 7970 | 9274 |
| 0000600560 | 0003 | 0000 | 5F08 | 7473 | 6E72 | 6D63 | B070 | 0392 |
| 0000600600 | 0000 | 0500 | 615F | 6F74 | B469 | 0392 | 0000 | 0500 |
| 0000600620 | 615F | 6F74 | B86C | 0392 | 0000 | 0400 | 5441 | 464F |
| 0000600640 | 9318 | 0003 | 0000 | 5F07 | 635F | 7461 | 786F | 936E |
| 0000600660 | 0003 | 0000 | 5F05 | 7469 | 616F | 938A | 0003 | 0000 |
| 0000600700 | 5F09 | 665F | 7470 | 736F | 7274 | 2EB0 | 0008 | 0000 |
| 0000600720 | 5F0D | 635F | 6C66 | 6374 | 7476 | 745F | 6261 | 2ECC |
| 0000600740 | 0008 | 0000 | 5F08 | 615F | 6973 | 657A | CD43 | 082E |
| 0000600760 | 0000 | 0800 | 5F5F | 7361 | 7A69 | 4465 | 2ECA | 0008 |
| 0000601000 | 0000 | 5F0B | 735F | 6769 | 6E69 | 6F74 | 6666 | 2EC8 |
| 0000601020 | 0008 | 0000 | 5F0B | 735F | 6769 | 6E69 | 7374 | 6765 |
| 0000601040 | 2ECE | 0008 | 0000 | 5F07 | 635F | 7974 | 6570 | 2ECE |
| 0000601060 | 0008 | 0000 | 5F08 | 635F | 7974 | 6570 | 2C5F | 0394 |
| 0000601100 | 0000 | 0700 | 675F | 7465 | 6E65 | D276 | 0394 | 0000 |
| 0000601120 | 0600 | 6B5F | 6862 | 7469 | 951F | 0003 | 0000 | 5F06 |
| 0000601140 | 6567 | 6374 | 1868 | 0395 | 0000 | 0700 | 675F | 7465 |
| 0000601160 | 6863 | D065 | 082F | 0000 | 0700 | 5F5F | 6863 | 7562 |
| 0000601200 | 1466 | 0395 | 0000 | 0B00 | 5F5F | 6567 | 6374 | 6568 |
| 0000601220 | 6C5F | DE6B | 0395 | 0000 | 0A00 | 5F5F | 4661 | 6861 |
| 0000601240 | 6964 | 6666 | 964E | 0003 | 0000 | 5F06 | 6C5F | 636F |
| 0000601260 | 986B | 0396 | 0000 | 0700 | 5F5F | 6F6C | 6B63 | 2266 |
| 0000601300 | 0396 | 0000 | 0D00 | 5F5F | 6E75 | 6F6C | 6B63 | 665F |
| 0000601320 | 6C69 | FE65 | 0395 | 0000 | 0D00 | 5F5F | 6F6C | 6B63 |
| 0000601340 | 735F | 7274 | 6165 | 786D | 0396 | 0000 | 0800 | 5F5F |
| 0000601360 | 6E75 | 6F6C | 6B63 | 2FD4 | 0008 | 0000 | 5F09 | 6C5F |
| 0000601400 | 636F | 636B | 746E | 96A8 | 0003 | 0000 | 5F09 | 755F |
| 0000601420 | 6C6E | 636F | 666B | 960A | 0003 | 0000 | 5F0F | 755F |
| 0000601440 | 6C6E | 636F | 5F6B | 7473 | 6572 | 6D61 | 962E | 0003 |
| 0000601460 | 0000 | 5F0A | 775F | 6961 | 6C74 | 636F | 166B | 0396 |
| 0000601500 | 0000 | 0B00 | 5F5F | 6F6C | 6B63 | 665F | 6C69 | B865 |

THU MAR 14 17:25:16 1991 CRV_IPS.DLL PAGE 208, LINE 12214

| | | | | | | | | |
|---|---|---|---|---|---|---|---|---|
| 0000601520 | 0396 | 0000 | 0B00 | 5F5F | 6567 | 7474 | 6469 | 6174 |
| 0000601540 | D662 | 082F | 0000 | 0B00 | 5F5F | 6974 | 7464 | 6261 |
| 0000601560 | 616D | 3278 | 0397 | 0000 | 0600 | 665F | 6567 | 7374 |
| 0000601600 | 97C8 | 0003 | 0000 | 5F08 | 7073 | 6972 | 746E | 6366 |
| 0000601620 | 0398 | 0000 | 0D00 | 5F5F | 7266 | 6165 | 6C6C | 636F |
| 0000601640 | 6C5F | 3C6B | 0398 | 0000 | 0A00 | 5F5F | 7266 | 6165 |
| 0000601660 | 6C6C | 636F | 98EA | 0003 | 0000 | 5F08 | 6572 | 6C61 |
| 0000601700 | 6F6C | EF63 | 0398 | 0000 | 0B00 | 725F | 6165 | 6C6C |
| 0000601720 | 636F | 6C5F | F46B | 0398 | 0000 | 0800 | 5F5F | 6572 |
| 0000601740 | 6973 | 657A | 99BC | 0003 | 0000 | 5F07 | 6163 | 6C6C |
| 0000601760 | 636F | 99EA | 0003 | 0000 | 5F09 | 665F | 6E69 | 7364 |
| 0000602000 | 6765 | 9A17 | 0003 | 0000 | 5F06 | 7570 | 6374 | 1068 |
| 0000602020 | 039A | 0000 | 0A00 | 5F5F | 7570 | 6374 | 5F68 | 6B6C |
| 0000602040 | 2FF2 | 0008 | 0000 | 5F06 | 645F | 7961 | D873 | 082F |
| 0000602060 | 0000 | 0800 | 5F5F | 706C | 6164 | 7379 | 9A50 | 0003 |
| 0000602100 | 0000 | 5F06 | 7466 | 6D69 | 4E65 | 039B | 0000 | 0600 |
| 0000602120 | 745F | 737A | 7465 | 9C28 | 0003 | 0000 | 5F09 | 695F |
| 0000602140 | 6973 | 646E | 7473 | 9B2E | 0003 | 0000 | 5F08 | 5F5F |
| 0000602160 | 7A74 | 6573 | 1C74 | 0830 | 0000 | 0900 | 645F | 7961 |
| 0000602200 | 696C | 6867 | 1874 | 0830 | 0000 | 0900 | 745F | 6D69 |
| 0000602220 | 7A65 | 6E6F | 1E65 | 0830 | 0000 | 0700 | 745F | 6E7A |
| 0000602240 | 6D61 | 2665 | 0830 | 0000 | 0900 | 5F5F | 645F | 616E |
| 0000602260 | 656D | 3C73 | 0830 | 0000 | 0900 | 5F5F | 6D5F | 616E |
| 0000602300 | 656D | F673 | 039C | 0000 | 0A00 | 5F5F | 7464 | 786F |
| 0000602320 | 6974 | 656D | 3062 | 0008 | 0000 | 5F08 | 635F | 7469 |
| 0000602340 | 6D69 | 3A65 | 039E | 0000 | 0A00 | 5F5F | 6E69 | 7469 |
| 0000602360 | 6974 | 656D | 9DEC | 0003 | 0000 | 5F06 | 6C63 | 636F |
| 0000602400 | 486B | 039E | 0000 | 0800 | 735F | 7274 | 6372 | 7268 |
| 0000602420 | 9E76 | 0003 | 0000 | 5F07 | 7473 | 7572 | 7270 | 9E9A |
| 0000602440 | 0003 | 0000 | 5F08 | 656D | 6D6D | 766F | 6465 | 039F |
| 0000602460 | 0000 | 0700 | 6D5F | 6D65 | 7063 | C279 | 039F | 0000 |
| 0000602500 | 0700 | 6D5F | 6D65 | 6573 | 1774 | 03A0 | 0000 | 0700 |
| 0000602520 | 5F5F | 7863 | 6F74 | 0A61 | 03A0 | 0000 | 0A00 | 5F5F |
| 0000602540 | 6C63 | 6F74 | 7361 | 6275 | A06E | 0003 | 0000 | 5F04 |
| 0000602560 | 6261 | 7C73 | 03A0 | 0000 | 0900 | 5F5F | 7277 | 3274 |
| 0000602600 | 7265 | 9672 | 03A0 | 0000 | 0700 | 725F | 6D65 | 766F |
| 0000602620 | 9665 | 03A0 | 0000 | 0700 | 755F | 6C6E | 6E69 | B46B |
| 0000602640 | 03A0 | 0000 | 0A00 | 5F5F | 4661 | 6146 | 6D6C | 6C75 |
| 0000602660 | A0B4 | 0003 | 0000 | 5F0B | 615F | 4646 | 7561 | 6D6C |
| 0000602700 | 6C75 | A0D6 | 0003 | 0000 | 5F0A | 615F | 4646 | 6C61 |
| 0000602720 | 6873 | F66C | 03A0 | 0000 | 0800 | 5F5F | 4661 | 646C |
| 0000602740 | 7669 | A190 | 0003 | 0000 | 5F08 | 615F | 6C46 | 756D |
| 0000602760 | 906C | D3A1 | 0000 | 0900 | 5F5F | 4661 | 6C75 | 756D |
| 0000603000 | C26C | D3A1 | 0000 | 0800 | 5F5F | 4661 | 736C | 6C6B |
| 0000603020 | A1ED | 0003 | 0000 | 5F0C | 465F | 4E50 | 6D75 | 7453 |
| 0000603040 | 6361 | 006B | 0600 | 0000 | 0700 | 5F5F | 5450 | 6166 |
| 0000603060 | 0863 | 0600 | 0000 | 0700 | 5F5F | 6366 | 6D74 | 0E70 |
| 0000603100 | 03A2 | 0000 | 0D00 | 5F5F | 6D64 | 766F | 6D74 | 6570 |
| 0000603120 | 6273 | 1078 | 03A2 | 0000 | 0D00 | 5F5F | 6D64 | 766F |
| 0000603140 | 6D74 | 6570 | 7373 | F869 | 03A1 | 0000 | 0D00 | 5F5F |
| 0000603160 | 6D73 | 766F | 6D74 | 6570 | 6273 | FA78 | 03A1 | 0000 |
| 0000603200 | 0D00 | 5F5F | 6D73 | 766F | 6D74 | 6570 | 7373 | CE69 |
| 0000603220 | 03A1 | 0000 | 0800 | 5F5F | 7066 | 616D | 6874 | A226 |
| 0000603240 | 0003 | 0000 | 5F09 | 645F | 7663 | 7374 | 3074 | 0186 |
| 0000603260 | 0006 | 0000 | 240A | 3469 | 725F | 7365 | 6C75 | 7274 |
| 0000603300 | 0601 | 0000 | 0900 | 5F5F | 6366 | 6F74 | 7370 | 8674 |
| 0000603320 | 0601 | 0000 | 0A00 | 6924 | 5F38 | 6572 | 7573 | 746C |
| 0000603340 | A232 | 0003 | 0000 | 5F0A | 645F | 7663 | 7374 | 3074 |
| 0000603360 | 6E61 | 0830 | 0000 | 0A00 | 5F5F | 7066 | 6973 | 6167 |

THU MAR 14 17:25:16 1991 CRV_IPS.DLL PAGE 209, LINE 12273

| | | | | | | | | |
|---|---|---|---|---|---|---|---|---|
| 0000603400 | 7264 | A235 | 0003 | 0000 | 5F0A | 645F | 7663 | 6474 |
| 0000603420 | 7369 | BD69 | 03A3 | 0000 | 0C00 | 6924 | 5F34 | 6F74 |
| 0000603440 | 775F | 7269 | 646E | A3AB | 0003 | 0000 | 240C | 3869 |
| 0000603460 | 745F | 5F6F | 6973 | 6E72 | C764 | 03A3 | 0000 | 0C00 |
| 0000603500 | 6924 | 5F38 | 6F74 | 775F | 7269 | 646E | A52D | 0003 |
| 0000603520 | 0000 | 2407 | 3469 | 665F | 7869 | A51D | 0003 | 0000 |
| 0000603540 | 2407 | 3869 | 665F | 7869 | A3D9 | 0003 | 0000 | 2408 |
| 0000603560 | 3469 | 745F | 5F6F | DE6C | 03A3 | 0000 | 0800 | 6924 |
| 0000603600 | 5F38 | 6F74 | 6C5F | A457 | 0003 | 0000 | 2408 | 3469 |
| 0000603620 | 745F | 5F6F | 9C71 | 03A3 | 0000 | 0800 | 6924 | 5F34 |
| 0000603640 | 6F74 | 735F | A422 | 0003 | 0000 | 2408 | 3869 | 745F |
| 0000603660 | 5F6F | B871 | 03A3 | 0000 | 0800 | 6924 | 5F34 | 6F74 |
| 0000603700 | 775F | A3A6 | 0003 | 0000 | 2408 | 3869 | 745F | 5F6F |
| 0000603720 | C273 | 03A3 | 0000 | 0800 | 6924 | 5F38 | 6F74 | 775F |
| 0000603740 | A4F9 | 0003 | 0000 | 240A | 3469 | 665F | 7869 | 6E72 |
| 0000603760 | D364 | 03A4 | 0000 | 0A00 | 6924 | 5F38 | 6966 | 7278 |
| 0000604000 | 646E | A2B5 | 0003 | 0000 | 2405 | 3469 | 385F | A274 |
| 0000604020 | 0003 | 0000 | 2405 | 3869 | 345F | A34D | 0003 | 0000 |
| 0000604040 | 2405 | 3469 | 6C5F | A37D | 0003 | 0000 | 2405 | 3869 |
| 0000604060 | 6C5F | A4F9 | 0003 | 0000 | 240B | 3469 | 665F | 7869 |
| 0000604100 | 7269 | 646E | A339 | 0003 | 0000 | 2405 | 3469 | 715F |
| 0000604120 | A341 | 0003 | 0000 | 2405 | 3469 | 735F | A4D3 | 0003 |
| 0000604140 | 0000 | 240B | 3869 | 665F | 7869 | 7269 | 646E | A369 |
| 0000604160 | 0003 | 0000 | 2405 | 3869 | 715F | A371 | 0003 | 0000 |
| 0000604200 | 2405 | 3869 | 735F | A337 | 0003 | 0000 | 2405 | 3469 |
| 0000604220 | 775F | A367 | 0003 | 0000 | 2405 | 3869 | 775F | A3CF |
| 0000604240 | 0003 | 0000 | 240B | 3469 | 745F | 5F6F | 726C | 646E |
| 0000604260 | A3D4 | 0003 | 0000 | 240B | 3869 | 745F | 5F6F | 726C |
| 0000604300 | 646E | A3FE | 0003 | 0000 | 240B | 3469 | 745F | 5F6F |
| 0000604320 | 7271 | 646E | A3A1 | 0003 | 0000 | 240B | 3469 | 745F |
| 0000604340 | 5F6F | 7273 | 646E | A403 | 0003 | 0000 | 240B | 3869 |
| 0000604360 | 745F | 5F6F | 7271 | 646E | A3BD | 0003 | 0000 | 240B |
| 0000604400 | 3469 | 745F | 5F6F | 7277 | 646E | A3AB | 0003 | 0000 |
| 0000604420 | 240B | 3869 | 745F | 5F6F | 7273 | 646E | A3C7 | 0003 |
| 0000604440 | 0000 | 240B | 3869 | 745F | 5F6F | 7277 | 646E | A3CF |
| 0000604460 | 0003 | 0000 | 240C | 3469 | 745F | 5F6F | 696C | 6E72 |
| 0000604500 | D464 | 03A3 | 0000 | 0C00 | 6924 | 5F38 | 6F74 | 6C5F |
| 0000604520 | 7269 | 646E | A3FE | 0003 | 0000 | 240C | 3469 | 745F |
| 0000604540 | 5F6F | 6971 | 6E72 | A164 | 03A3 | 0000 | 0C00 | 6924 |
| 0000604560 | 5F34 | 6F74 | 735F | 7269 | 646E | A403 | 0003 | 0000 |
| 0000604600 | 240C | 3869 | 745F | 5F6F | 6971 | 6E72 | 5B64 | 03A6 |
| 0000604620 | 0000 | 0700 | 6924 | 5F34 | 6D63 | AE70 | 03A6 | 0000 |
| 0000604640 | 0700 | 6924 | 5F38 | 6D63 | 0A70 | 03A7 | 0000 | 0700 |
| 0000604660 | 6924 | 5F34 | 6461 | F264 | 03A8 | 0000 | 0700 | 6924 |
| 0000604700 | 5F34 | 6964 | 0276 | 03A7 | 0000 | 0700 | 6924 | 5F34 |
| 0000604720 | 7573 | 6C62 | 03A8 | 0000 | 0700 | 6924 | 5F34 | 756D |
| 0000604740 | 916C | 0601 | 0000 | 0D00 | 6924 | 5F34 | 6F72 | 6E75 |
| 0000604760 | 5F64 | 7865 | DC70 | 03A7 | 0000 | 0800 | 6924 | 5F34 |
| 0000605000 | 6F6E | 6D72 | 0190 | 0006 | 0000 | 240E | 3469 | 725F |
| 0000605020 | 756F | 646E | 665F | 616C | 9367 | 0601 | 0000 | 0900 |
| 0000605040 | 6924 | 5F34 | 6361 | 685F | 9769 | 0601 | 0000 | 0900 |
| 0000605060 | 6924 | 5F34 | 6361 | 6C5F | 0A6F | 03A8 | 0000 | 0900 |
| 0000605100 | 6924 | 5F34 | 6F72 | 6E75 | F064 | 03A8 | 0000 | 0A00 |
| 0000605120 | 6924 | 5F34 | 6964 | 7276 | 7665 | A700 | 0003 | 0000 |
| 0000605140 | 240A | 3469 | 735F | 6275 | 6572 | 1F76 | 03AA | 0000 |
| 0000605160 | 0700 | 6924 | 5F38 | 6461 | 8864 | 03AC | 0000 | 0700 |
| 0000605200 | 6924 | 5F38 | 6964 | FC76 | 03A9 | 0000 | 0700 | 6924 |
| 0000605220 | 5F38 | 7573 | 2562 | 03AC | 0000 | 0700 | 6924 | 5F38 |
| 0000605240 | 756D | A96C | 0601 | 0000 | 0D00 | 6924 | 5F38 | 6F72 |

THU MAR 14 17:25:16 1991 CRV_IPS.DLL PAGE 210, LINE 12332

| | | | | | | | | |
|---|---|---|---|---|---|---|---|---|
| 0000605260 | 6E75 | 5F64 | 7865 | 5270 | 03AB | 0000 | 0800 | 6924 |
| 0000605300 | 5F38 | 6F6E | 6D72 | 01A8 | 0006 | 0000 | 240E | 3869 |
| 0000605320 | 725F | 756F | 646E | 665F | 616C | AB67 | 0601 | 0000 |
| 0000605340 | 0900 | 6924 | 5F38 | 6361 | 685F | B369 | 0601 | 0000 |
| 0000605360 | 0900 | 6924 | 5F38 | 6361 | 6C5F | A76F | 03AB | 0000 |
| 0000605400 | 0900 | 6924 | 5F38 | 6F72 | 6E75 | 8664 | 03AC | 0000 |
| 0000605420 | 0A00 | 6924 | 5F38 | 6964 | 7276 | 7665 | A9FA | 0003 |
| 0000605440 | 0000 | 240A | 3869 | 735F | 6275 | 6572 | 4076 | 03B0 |
| 0000605460 | 0000 | 0A00 | 6924 | 5F38 | 756F | 7074 | 7475 | 01DA |
| 0000605500 | 0006 | 000C | 240C | 3869 | 695F | 706E | 7475 | 775F |
| 0000605520 | 9173 | 03B1 | 0000 | 0900 | 6924 | 5F38 | 6E69 | 7570 |
| 0000605540 | DB74 | 0601 | 0000 | 1000 | 6924 | 5F38 | 6D69 | 6C70 |
| 0000605560 | 6369 | 7469 | 655F | 7078 | B47D | 0003 | 0000 | 2408 |
| 0000605600 | 3869 | 745F | 756D | E36C | 03B5 | 0000 | 0A00 | 6924 |
| 0000605620 | 5F38 | 7074 | 7277 | 3031 | B608 | 0003 | 0000 | 5F0F |
| 0000605640 | 475F | 7465 | 6C41 | 6D74 | 7461 | 5068 | 4454 | 9876 |
| 0000605660 | 0000 | 0001 | 5F09 | 665F | 746C | 7375 | 6465 | BCA4 |
| 0000605700 | 0003 | 0000 | 5F06 | 665F | 6461 | C164 | 03B6 | 0000 |
| 0000605720 | 0600 | 5F5F | 6C65 | 6464 | B6BD | 0003 | 0000 | 5F06 |
| 0000605740 | 665F | 646C | 0664 | 03BA | 0000 | 0600 | 5F5F | 6166 |
| 0000605760 | 7362 | B750 | 0003 | 0000 | 5F06 | 655F | 646C | 636C |
| 0000606000 | 03B7 | 0000 | 0600 | 5F5F | 6C66 | 6C64 | BA1E | 0003 |
| 0000606020 | 0000 | 5F06 | 665F | 6863 | AE73 | 03BC | 0000 | 0600 |
| 0000606040 | 5F5F | 6366 | 706D | B6B7 | 0003 | 0000 | 5F06 | 735F |
| 0000606060 | 646C | 7E64 | 03B6 | 0000 | 0600 | 5F5F | 6C65 | 7364 |
| 0000606100 | BD55 | 0003 | 0000 | 5F06 | 665F | 6378 | 9A68 | 03BC |
| 0000606120 | 0000 | 0600 | 5F5F | 6466 | 7669 | B67A | 0003 | 0000 |
| 0000606140 | 5F06 | 665F | 646C | 0D73 | 03B7 | 0000 | 0600 | 5F5F |
| 0000606160 | 6C66 | 7464 | B75D | 0003 | 0000 | 5F06 | 655F | 646C |
| 0000606200 | 6A77 | 03B7 | 0000 | 0600 | 5F5F | 6C66 | 7764 | B7CF |
| 0000606220 | 0003 | 0000 | 5F06 | 665F | 7564 | 4C70 | 03B7 | 0000 |
| 0000606240 | 0600 | 5F5F | 6C73 | 6C64 | BC8B | 0003 | 0000 | 5F06 |
| 0000606260 | 665F | 7573 | 9D62 | 03B8 | 0000 | 0600 | 5F5F | 7365 |
| 0000606300 | 6474 | B807 | 0003 | 0000 | 5F06 | 665F | 646C | 847A |
| 0000606320 | 03BD | 0000 | 0600 | 5F5F | 6364 | 7476 | B899 | 0003 |
| 0000606340 | 0000 | 5F06 | 665F | 7473 | 9564 | 03BC | 0000 | 0600 |
| 0000606360 | 5F5F | 6D66 | 6C75 | B983 | 0003 | 0000 | 5F06 | 665F |
| 0000606400 | 6F74 | 746C | 03B6 | 0000 | 0600 | 5F5F | 6C73 | 7364 |
| 0000606420 | B6FF | 0003 | 0000 | 5F06 | 735F | 646C | 5974 | 03B7 |
| 0000606440 | 0000 | 0600 | 5F5F | 6C73 | 7764 | B895 | 0003 | 0000 |
| 0000606460 | 5F06 | 735F | 7473 | 3E64 | 03B8 | 0000 | 0600 | 5F5F |
| 0000606500 | 7365 | 7374 | B83A | 0003 | 0000 | 5F06 | 665F | 7473 |
| 0000606520 | CF73 | 03B9 | 0000 | 0600 | 5F5F | 7466 | 7473 | B8F3 |
| 0000606540 | 0003 | 0000 | 5F06 | 665F | 7473 | 3674 | 03B8 | 0000 |
| 0000606560 | 0600 | 5F5F | 7373 | 7374 | B8EF | 0003 | 0000 | 5F06 |
| 0000606600 | 735F | 7473 | 5D74 | 03BC | 0000 | 0700 | 5F5F | 6165 |
| 0000606620 | 6464 | 6C64 | 03BC | 0000 | 0700 | 5F5F | 6166 | 6464 |
| 0000606640 | 4D64 | 03BC | 0000 | 0700 | 5F5F | 6173 | 6464 | 3B64 |
| 0000606660 | 03BB | 0000 | 0700 | 5F5F | 6165 | 6464 | 4A73 | 03BB |
| 0000606700 | 0000 | 0700 | 5F5F | 6166 | 6464 | 0D73 | 03BC | 0000 |
| 0000606720 | 0700 | 5F5F | 6465 | 7669 | 1C64 | 03BC | 0000 | 0700 |
| 0000606740 | 5F5F | 6466 | 7669 | 2B64 | 03BB | 0000 | 0700 | 5F5F |
| 0000606760 | 6173 | 6464 | 9373 | 03BB | 0000 | 0700 | 5F5F | 7365 |
| 0000607000 | 6275 | A264 | 03BB | 0000 | 0700 | 5F5F | 7366 | 6275 |
| 0000607020 | E564 | 03BB | 0000 | 0700 | 5F5F | 6D65 | 6C75 | F464 |
| 0000607040 | 03BB | 0000 | 0700 | 5F5F | 6D66 | 6C75 | 4764 | 03BD |
| 0000607060 | 0000 | 0700 | 5F5F | 7866 | 6863 | FD71 | 03BB | 0000 |
| 0000607100 | 0700 | 5F5F | 6473 | 7669 | 9F64 | 03BC | 0000 | 0700 |
| 0000607120 | 5F5F | 6466 | 7669 | EB72 | 03BA | 0000 | 0700 | 5F5F |

THU MAR 14 17:25:16 1991 CRV_IPS.DLL PAGE 211, LINE 12391

| | | | | | | | | |
|---|---|---|---|---|---|---|---|---|
| 0000607140 | 6465 | 7669 | FA73 | 03BA | 0000 | 0700 | 5F5F | 6466 |
| 0000607160 | 7669 | BD73 | 03B8 | 0000 | 0700 | 5F5F | 7365 | 6474 |
| 0000607200 | 8370 | 03BB | 0000 | 0700 | 5F5F | 7373 | 6275 | B964 |
| 0000607220 | 03B8 | 0000 | 0700 | 5F5F | 7366 | 6474 | 9070 | 03BC |
| 0000607240 | 0000 | 0700 | 5F5F | 7366 | 6275 | 7172 | 03BA | 0000 |
| 0000607260 | 0700 | 5F5F | 7365 | 6275 | 8073 | 03BA | 0000 | 0700 |
| 0000607300 | 5F5F | 7366 | 6275 | D573 | 03BB | 0000 | 0700 | 5F5F |
| 0000607320 | 6D73 | 6C75 | C364 | 03BA | 0000 | 0700 | 5F5F | 6D65 |
| 0000607340 | 6C75 | D273 | 03BA | 0000 | 0700 | 5F5F | 6D66 | 6C75 |
| 0000607360 | DB73 | 03BA | 0000 | 0700 | 5F5F | 6473 | 7669 | B573 |
| 0000607400 | 03B8 | 0000 | 0700 | 5F5F | 7373 | 6474 | 5E70 | 03B8 |
| 0000607420 | 0000 | 0700 | 5F5F | 7365 | 7374 | 6170 | 03BA | 0000 |
| 0000607440 | 0700 | 5F5F | 7373 | 6275 | 5A73 | 03B8 | 0000 | 0700 |
| 0000607460 | 5F5F | 7366 | 7374 | 1270 | 03B9 | 0000 | 0700 | 5F5F |
| 0000607500 | 7366 | 7474 | B370 | 03BA | 0000 | 0700 | 5F5F | 6D73 |
| 0000607520 | 6C75 | A473 | 03BC | 0000 | 0800 | 5F5F | 4661 | 6166 |
| 0000607540 | 6464 | B856 | 0003 | 0000 | 5F07 | 735F | 7473 | 7073 |
| 0000607560 | B90E | 0003 | 0000 | 5F07 | 735F | 7473 | 7074 | B6C1 |
| 0000607600 | 0003 | 0000 | 5F08 | 615F | 6546 | 646C | BD64 | 03B6 |
| 0000607620 | 0000 | 0800 | 5F5F | 4661 | 6C66 | 6464 | BA06 | 0003 |
| 0000607640 | 0000 | 5F08 | 615F | 6646 | 6261 | 5073 | 03B7 | 0000 |
| 0000607660 | 0800 | 5F5F | 4661 | 6C65 | 6C64 | B763 | 0003 | 0000 |
| 0000607700 | 5F08 | 615F | 6546 | 646C | 1E6C | 03BA | 0000 | 0800 |
| 0000607720 | 5F5F | 4661 | 6366 | 7368 | BCAE | 0003 | 0000 | 5F08 |
| 0000607740 | 615F | 6646 | 6D63 | B770 | 03B6 | 0000 | 0800 | 5F5F |
| 0000607760 | 4661 | 6C73 | 6464 | B67E | 0003 | 0000 | 5F08 | 615F |
| 0000610000 | 6546 | 646C | 5573 | 03BD | 0000 | 0800 | 5F5F | 4661 |
| 0000610020 | 7866 | 6863 | BC9A | 0003 | 0000 | 5F08 | 615F | 6646 |
| 0000610040 | 6964 | 7A76 | 03B6 | 0000 | 0800 | 5F5F | 4661 | 6C66 |
| 0000610060 | 7364 | B70D | 0003 | 0000 | 5F08 | 615F | 6646 | 646C |
| 0000610100 | 5D74 | 03B7 | 0000 | 0800 | 5F5F | 4661 | 6C65 | 7764 |
| 0000610120 | B76A | 0003 | 0000 | 5F08 | 615F | 6646 | 646C | CF77 |
| 0000610140 | 03B7 | 0000 | 0800 | 5F5F | 4661 | 6466 | 7075 | B74C |
| 0000610160 | 0003 | 0000 | 5F08 | 615F | 7346 | 646C | 8B6C | 03BC |
| 0000610200 | 0000 | 0800 | 5F5F | 4661 | 7366 | 6275 | B89D | 0003 |
| 0000610220 | 0000 | 5F08 | 615F | 6546 | 7473 | 0764 | 03B8 | 0000 |
| 0000610240 | 0800 | 5F5F | 4661 | 6C66 | 7A64 | BD84 | 0003 | 0000 |
| 0000610260 | 5F08 | 615F | 6446 | 7663 | 9974 | 03B8 | 0000 | 0800 |
| 0000610300 | 5F5F | 4661 | 7366 | 6474 | BC95 | 0003 | 0000 | 5F08 |
| 0000610320 | 615F | 6646 | 756D | 836C | 03B9 | 0000 | 0800 | 5F5F |
| 0000610340 | 4661 | 7466 | 6C6F | B674 | 0003 | 0000 | 5F08 | 615F |
| 0000610360 | 7346 | 646C | 3573 | 03BC | 0000 | 0800 | 5F5F | 6465 |
| 0000610400 | 7669 | 7264 | B6FF | 0003 | 0000 | 5F08 | 615F | 7346 |
| 0000610420 | 646C | 4474 | 03BC | 0000 | 0800 | 5F5F | 6466 | 7669 |
| 0000610440 | 7264 | B759 | 0003 | 0000 | 5F08 | 615F | 7346 | 646C |
| 0000610460 | A977 | 03BC | 0000 | 0800 | 5F5F | 6366 | 6D6F | 7070 |
| 0000610500 | BBBC | 0003 | 0000 | 5F08 | 655F | 7573 | 6462 | 9572 |
| 0000610520 | 03B8 | 0000 | 0800 | 5F5F | 4661 | 7373 | 6474 | BBCB |
| 0000610540 | 0003 | 0000 | 5F08 | 665F | 7573 | 6462 | 3E72 | 03B8 |
| 0000610560 | 0000 | 0800 | 5F5F | 4661 | 7365 | 7374 | B83A | 0003 |
| 0000610600 | 0000 | 5F08 | 615F | 6646 | 7473 | CF73 | 03B9 | 0000 |
| 0000610620 | 0800 | 5F5F | 4661 | 7466 | 7473 | B8F3 | 0003 | 0000 |
| 0000610640 | 5F08 | 615F | 6646 | 7473 | 2574 | 03BC | 0000 | 0800 |
| 0000610660 | 5F5F | 6473 | 7669 | 7264 | BB13 | 0003 | 0000 | 5F08 |
| 0000610700 | 655F | 6964 | 7376 | 2272 | 03BB | 0000 | 0800 | 5F5F |
| 0000610720 | 6466 | 7669 | 7273 | BBAC | 0003 | 0000 | 5F08 | 735F |
| 0000610740 | 7573 | 6462 | 9A72 | 03BA | 0000 | 0800 | 5F5F | 7365 |
| 0000610760 | 6275 | 7273 | B836 | 0003 | 0000 | 5F08 | 615F | 7346 |
| 0000611000 | 7473 | A973 | 03BA | 0000 | 0800 | 5F5F | 7366 | 6275 |

THU MAR 14 17:25:16 1991 CRV_IPS.DLL PAGE 212, LINE 12450

| | | | | | | | | |
|---|---|---|---|---|---|---|---|---|
| 0000611020 | 7273 | B8EF | 0003 | 000D | 5F08 | 615F | 7346 | 7473 |
| 0000611040 | 5D74 | 03BC | 0000 | 0900 | 5F5F | 4661 | 6165 | 6464 |
| 0000611060 | 6C64 | 03BC | 000D | 0900 | 5F5F | 4661 | 6166 | 6464 |
| 0000611100 | 0364 | 03BB | 0000 | 0800 | 5F5F | 6473 | 7669 | 7273 |
| 0000611120 | BA8A | 0003 | 0000 | 5F08 | 735F | 7573 | 7362 | 4D72 |
| 0000611140 | 03BC | 0000 | 0900 | 5F5F | 4661 | 6173 | 6464 | 3B64 |
| 0000611160 | 03BB | 0000 | 0900 | 5F5F | 4661 | 6165 | 6464 | 4A73 |
| 0000611200 | 03BB | 0000 | 0900 | 5F5F | 4661 | 6166 | 6464 | 0D73 |
| 0000611220 | 03BC | 0000 | 0900 | 5F5F | 4661 | 6465 | 7669 | 1C64 |
| 0000611240 | 03BC | 0000 | 0900 | 5F5F | 4661 | 6466 | 7669 | 2B64 |
| 0000611260 | 03BB | 0000 | 0900 | 5F5F | 4661 | 6173 | 6464 | 9373 |
| 0000611300 | 03BB | 0000 | 0900 | 5F5F | 4661 | 7365 | 6275 | A264 |
| 0000611320 | 03BB | 0000 | 0900 | 5F5F | 4661 | 7366 | 6275 | E564 |
| 0000611340 | 03BB | 0000 | 0900 | 5F5F | 4661 | 6D65 | 6C75 | F464 |
| 0000611360 | 03BB | 0000 | 0900 | 5F5F | 4661 | 6D66 | 6C75 | 4764 |
| 0000611400 | 03BD | 0000 | 0900 | 5F5F | 4661 | 7866 | 6863 | FD71 |
| 0000611420 | 03BB | 0000 | 0900 | 5F5F | 4661 | 6473 | 7669 | 9F64 |
| 0000611440 | 03BC | 0000 | 0900 | 5F5F | 4661 | 6466 | 7669 | EB72 |
| 0000611460 | 03BA | 0000 | 0900 | 5F5F | 4661 | 6465 | 7669 | FA73 |
| 0000611500 | 03BA | 0000 | 0900 | 5F5F | 4661 | 6466 | 7669 | BD73 |
| 0000611520 | 03B8 | 0000 | 0900 | 5F5F | 4661 | 7365 | 6474 | 8370 |
| 0000611540 | 03BB | 0000 | 0900 | 5F5F | 4661 | 7373 | 6275 | B964 |
| 0000611560 | 03B8 | 0000 | 0900 | 5F5F | 4661 | 7366 | 6474 | 9070 |
| 0000611600 | 03BC | 0000 | 0900 | 5F5F | 4661 | 7366 | 6275 | 7172 |
| 0000611620 | 03BA | 0000 | 0900 | 5F5F | 4661 | 7365 | 6275 | 8073 |
| 0000611640 | 03BA | 0000 | 0900 | 5F5F | 4661 | 7366 | 6275 | D573 |
| 0000611660 | 03BB | 0000 | 0900 | 5F5F | 4661 | 6D73 | 6C75 | C364 |
| 0000611700 | 03BA | 0000 | 0900 | 5F5F | 4661 | 6D65 | 6C75 | D273 |
| 0000611720 | 03BA | 0000 | 0900 | 5F5F | 4661 | 6D66 | 6C75 | DB73 |
| 0000611740 | 03BA | 0000 | 0900 | 5F5F | 4661 | 6473 | 7669 | B573 |
| 0000611760 | 03B8 | 0000 | 0900 | 5F5F | 4661 | 7373 | 6474 | 5E70 |
| 0000612000 | 03B8 | 0000 | 0900 | 5F5F | 4661 | 7365 | 7374 | 6170 |
| 0000612020 | 03BA | 0000 | 0900 | 5F5F | 4661 | 7373 | 6275 | 5A73 |
| 0000612040 | 03B8 | 0000 | 0900 | 5F5F | 4661 | 7366 | 7374 | 1270 |
| 0000612060 | 03B9 | 0000 | 0900 | 5F5F | 4661 | 7366 | 7474 | B370 |
| 0000612100 | 03BA | 0000 | 0900 | 5F5F | 4661 | 6D73 | 6C75 | 5673 |
| 0000612120 | 03B8 | 0000 | 0900 | 5F5F | 4661 | 7373 | 7374 | 0E70 |
| 0000612140 | 03B9 | 0000 | 0900 | 5F5F | 4661 | 7373 | 7474 | 3570 |
| 0000612160 | 03BC | 0000 | 0A00 | 5F5F | 4661 | 6465 | 7669 | 7264 |
| 0000612200 | BC44 | 0003 | 0000 | 5F0A | 615F | 6646 | 6964 | 6476 |
| 0000612220 | A972 | 03BC | 0000 | 0A00 | 5F5F | 4661 | 6366 | 6D6F |
| 0000612240 | 7070 | BBBC | 0003 | 0000 | 5F0A | 615F | 6546 | 7573 |
| 0000612260 | 6462 | CB72 | 03BB | 0000 | 0A00 | 5F5F | 4661 | 7366 |
| 0000612300 | 6275 | 7264 | BC25 | 0003 | 0000 | 5F0A | 615F | 7346 |
| 0000612320 | 6964 | 6476 | 1372 | 03BB | 0000 | 0A00 | 5F5F | 4661 |
| 0000612340 | 6465 | 7669 | 7273 | BB22 | 0003 | 0000 | 5F0A | 615F |
| 0000612360 | 6646 | 6964 | 7376 | AC72 | 03BB | 0000 | 0A00 | 5F5F |
| 0000612400 | 4661 | 7373 | 6275 | 7264 | BA9A | 0003 | 0000 | 5F0A |
| 0000612420 | 615F | 6546 | 7573 | 7362 | A972 | 03BA | 0000 | 0A00 |
| 0000612440 | 5F5F | 4661 | 7366 | 6275 | 7273 | BB03 | 0003 | 0000 |
| 0000612460 | 5F0A | 615F | 7346 | 6964 | 7376 | 8A72 | 03BA | 0000 |
| 0000612500 | 0A00 | 5F5F | 4661 | 7373 | 6275 | 7273 | B76C | 0003 |
| 0000612520 | 0000 | 4206 | 4624 | 4C49 | 1032 | 0602 | 0000 | 0500 |
| 0000612540 | 704F | 6154 | 3E62 | 03B9 | 0000 | 0600 | 2442 | 4946 |
| 0000612560 | 3253 | B76D | 0003 | 0000 | 4206 | 4624 | 4C49 | A944 |
| 0000612600 | 03BC | 0000 | 0600 | 2442 | 4346 | 504D | B946 | 0003 |
| 0000612620 | 0000 | 4206 | 4624 | 5349 | 4E54 | 03B9 | 0000 | 0600 |
| 0000612640 | 2442 | 5546 | 5453 | BDA2 | 0003 | 0000 | 5F06 | 655F |
| 0000612660 | 646C | B371 | 03BD | 0000 | 0600 | 5F5F | 6C66 | 7164 |

THU MAR 14 17:25:16 1991 CRV_IPS.DLL PAGE 213, LINE 12509

| | | | | | | | | |
|---|---|---|---|---|---|---|---|---|
| 0000612700 | BD9E | 0003 | 0000 | 5F06 | 735F | 646C | A271 | 03BD |
| 0000612720 | 0000 | 0800 | 5F5F | 4661 | 6C65 | 7164 | BDB3 | 0003 |
| 0000612740 | 0000 | 5F08 | 615F | 6646 | 646C | 9E71 | 03BD | 0000 |
| 0000612760 | 0800 | 5F5F | 4661 | 6C73 | 7164 | 022E | 0006 | 0000 |
| 0000613000 | 5F06 | 665F | 7363 | 3470 | 03BE | 0000 | 0A00 | 6924 |
| 0000613020 | 5F34 | 7265 | 6972 | 666E | BE34 | 0003 | 0000 | 240A |
| 0000613040 | 3869 | 655F | 7272 | 6E69 | 3B66 | 03BE | 0000 | 0B00 |
| 0000613060 | 6924 | 5F34 | 7265 | 6472 | 7669 | 3B30 | 03BE | 0000 |
| 0000613100 | 0B00 | 6924 | 5F38 | 7265 | 6472 | 7669 | 6730 | 03BE |
| 0000613120 | 0000 | 0A00 | 5F5F | 7066 | 6973 | 6E67 | 6C61 | BE34 |
| 0000613140 | 0003 | 0000 | 240B | 3469 | 655F | 7272 | 696D | 666E |
| 0000613160 | BE34 | 0003 | 0000 | 240B | 3469 | 655F | 7272 | 6970 |
| 0000613200 | 666E | BE34 | 0003 | 0000 | 240B | 3869 | 655F | 7272 |
| 0000613220 | 696D | 666E | BE34 | 0003 | 0000 | 240B | 3869 | 655F |
| 0000613240 | 7272 | 6970 | 666E | BE49 | 0003 | 0000 | 240C | 3869 |
| 0000613260 | 655F | 7272 | 7473 | 6361 | 426B | 03BE | 0000 | 0C00 |
| 0000613300 | 6924 | 5F34 | 7265 | 6972 | 766E | 646C | BE42 | 0003 |
| 0000613320 | 0000 | 240C | 3869 | 655F | 7272 | 6E69 | 6C76 | DD64 |
| 0000613340 | 03BE | 0000 | 0800 | 5F5F | 6C66 | 6974 | 326E | BEB8 |
| 0000613360 | 0003 | 0000 | 5F09 | 665F | 746C | 6E69 | 3266 | BF6E |
| 0000613400 | 0003 | 0000 | 5F09 | 665F | 746C | 756F | 3274 | BFAE |
| 0000613420 | 0003 | 0000 | 5F0B | 665F | 726F | 6463 | 6365 | 7470 |
| 0000613440 | C01E | 0003 | 0000 | 5F0B | 635F | 6F72 | 7A70 | 7265 |
| 0000613460 | 736F | C09C | 0003 | 0000 | 5F0A | 705F | 736F | 7469 |
| 0000613500 | 7669 | C465 | 03C0 | 0000 | 0900 | 5F5F | 6166 | 7373 |
| 0000613520 | 6769 | 406E | 03C2 | 0000 | 0700 | 5F5F | 6663 | 6F74 |
| 0000613540 | E665 | 03C3 | 0000 | 0700 | 5F5F | 6663 | 6F74 | 6E66 |
| 0000613560 | 03C4 | 0000 | 0700 | 5F5F | 6663 | 6F74 | 5667 | 03C5 |
| 0000613600 | 0000 | 0900 | 5F5F | 6663 | 746C | 7663 | 0474 | 070D |
| 0000613620 | 8500 | 0B00 | 645F | 7672 | 685F | 6E61 | 6C64 | A065 |
| 0000613640 | 0830 | 8600 | 0D00 | 635F | 7672 | 655F | 6378 | 5F70 |
| 0000613660 | 6573 | 2C6D | 03E1 | 8600 | 1005 | 675F | 7073 | 615F |
| 0000613700 | 7070 | 696C | 6163 | 6974 | 6E6F | 30A4 | 0008 | 0086 |
| 0000613720 | 5F08 | 626D | 735F | 7A69 | 1465 | 03CC | 5C00 | 0905 |
| 0000613740 | 675F | 7073 | 6F5F | 6570 | 546E | 03CC | 5E00 | 0A05 |
| 0000613760 | 675F | 7073 | 635F | 6F6C | 6573 | E1E8 | 0003 | 0588 |
| 0000614000 | 5F13 | 7367 | 5F70 | 6567 | 5F74 | 7061 | 6C70 | 636y |
| 0000614020 | 6D5F | 6773 | CC80 | 0003 | 055F | 5F09 | 7367 | 5F70 |
| 0000614040 | 7865 | 7469 | E2A1 | 0003 | 0589 | 5F09 | 7367 | 5F70 |
| 0000614060 | 6168 | 746C | CCA7 | 0003 | 0560 | 5F13 | 7367 | 5F70 |
| 0000614100 | 7264 | 7669 | 7265 | 695F | 5F66 | 6E69 | 7469 | E32E |
| 0000614120 | 0003 | 058A | 5F0D | 7367 | 5F70 | 6F63 | 746E | 6E69 |
| 0000614140 | 6575 | CD49 | 0003 | 0562 | 5F0D | 7367 | 5F70 | 7277 |
| 0000614160 | 685F | 7463 | 6C72 | E3BB | 0003 | 058C | 5F0F | 7367 |
| 0000614200 | 5F70 | 6E69 | 7469 | 765F | 6469 | 6F65 | CDCE | 0003 |
| 0000614220 | 0564 | 5F0D | 7367 | 5F70 | 7277 | 685F | 6461 | 7264 |
| 0000614240 | CE08 | 0003 | 0566 | 5F0D | 7367 | 5F70 | 6472 | 685F |
| 0000614260 | 7463 | 6C72 | CE72 | 0003 | 0568 | 5F0D | 7367 | 5F70 |
| 0000614300 | 6472 | 685F | 6461 | 7264 | CEAD | 0003 | 056A | 5F0C |
| 0000614320 | 7367 | 5F70 | 7277 | 645F | 7461 | EB61 | 03CE | 6C00 |
| 0000614340 | 0C05 | 675F | 7073 | 725F | 5F64 | 6164 | 6174 | CF29 |
| 0000614360 | 0003 | 056E | 5F0A | 7367 | 5F70 | 7277 | 7469 | 9565 |
| 0000614400 | 03CF | 7000 | 0905 | 675F | 7073 | 725F | 6165 | 0164 |
| 0000614420 | 03D0 | 7200 | 1005 | 675F | 7073 | 775F | 6972 | 6574 |
| 0000614440 | 695F | 616D | 6567 | D1BF | 0003 | 0574 | 5F0F | 7367 |
| 0000614460 | 5F70 | 6572 | 6461 | 695F | 616D | 6567 | D37D | 0003 |
| 0000614500 | 0576 | 5F0F | 7367 | 5F70 | 7277 | 7469 | 5F65 | 7568 |
| 0000614520 | 6567 | D489 | 0003 | 0578 | 5F0E | 7367 | 5F70 | 6572 |
| 0000614540 | 6461 | 685F | 6775 | 9565 | 03D5 | 7A00 | 1505 | 675F |

THU MAR 14 17:25:16 1991 CRV_IPS.DLL PAGE 214, LINE 12568

```
0000614560  7073  775F  6972  6574  685F  6775  5F65  6D69
0000614600  6761  0765  03D9  7C00  1405  675F  7073  725F
0000614620  6165  5F64  7568  6567  695F  616D  6567  DC79
0000614640  0003  057E  5F09  7367  5F70  6E69  7469  DD56
0000614660  0003  0581  5F10  7367  5F70  6E69  5F74  6168
0000614700  646E  656C  DD72  03DF  8400  0C05  675F  7073
0000614720  635F  6D6F  616D  646E  309C  0008  0086  5F0A
0000614740  7263  5F76  7069  6573  506D  070F  2500  D404
0000614760  625F  6675  0004  0007  0425  5F05  6274  6675
0000615000  E5EA  0003  042E  5F0D  7367  5F70  6F64  6E77
0000615020  6F6C  6461  C626  0003  0000  5F0A  665F  6572
0000615040  6461  6C5F  EC6B  03C5  0000  0600  665F  6572
0000615060  6461  C798  0003  0000  5F0D  625F  6765  6E69
0000615100  6874  6572  6461  C879  0003  0000  5F0B  655F
0000615120  646E  6874  6572  6461  C8A6  0003  0000  5F06
0000615140  7366  6565  E66B  03C8  0000  0A00  5F5F  7366
0000615160  6565  5F6B  6B6C  C974  0003  0000  5F0A  615F
0000615200  4646  6C61  6873  9472  03C9  0000  0800  5F5F
0000615220  4661  726C  6D65  CA34  0003  0000  5F06  7466
0000615240  6C65  706C  03CA  0000  0A00  5F5F  7466  6C65
0000615260  5F6C  6B6C  CC08  0003  0000  5F08  615F  6C46
0000615300  6873  0172  000A  8075  8183  6400  8300  0201
0000615320  0101  8000  0101  8000  0101  8000  0101  8000
*
0000615560  0101  8000  0101  8000  0101  8000  0701  7800
0000615600  0085  8301  0080  0101  8000  0101  8000  0101
0000615620  8000  0101  8000  0101  8000  0101  8000  0101
*
0000621620  8000  0101  8000  0101  8000  0A01  7500  8380
0000621640  0081  0064  0183  0102  0001  0180  0001  0180
0000621660  0001  0180  0001  0180  0001  0180  0001  0180
*
0000623120  0001  0180  0001  0180  0001  0180  0016  2079
0000623140  8302  04E1  E283  8204  280A  6E75  6174  6767
0000623160  6465  6929  0701  7F00  8183  8300  0081  0901
0000623200  7F00  0182  0078  0182  0279  1601  7900  0240
0000623220  E483  8304  04E5  0A82  7528  746E  6761  6567
0000623240  2964  0169  0007  837F  04E0  E083  0104  000D
0000623260  827F  6D03  6E69  8200  6D03  7861  0104  0001
0000623300  0180  0016  2079  8302  04E8  E983  8204  280A
0000623320  6E75  6174  6767  6465  6929  0701  7F00  8583
0000623340  8300  0085  1201  7F00  0582  6977  7464  0068
0000623360  0682  6568  6769  7468  0102  0001  0180  0016
0000623400  4079  8302  04EC  ED83  8204  280A  6E75  6174
0000623420  6767  6465  6929  0701  7F00  E083  8304  04E7
0000623440  1101  7F00  0682  726F  6769  6E69  8200  6104
0000623460  6572  0461  0101  8000  0101  8000  0101  8000
0000623500  0101  8000  0101  8000  0101  8000  0101  8000
*
0000623740  0101  8000  0101  8000  1601  7900  0330  1C83
0000623760  8305  051D  0A82  7528  746E  6761  6567  2964
0000624000  0169  000A  837F  0085  8583  8300  0085  1A01
0000624020  7F00  0582  6977  7464  0068  0682  6568  6769
0000624040  7468  8202  6405  7065  6874  0104  0018  8579
0000624060  0140  8308  0520  2183  8205  280A  6E75  6174
0000624100  6767  6465  6929  0701  7800  8085  8300  0084
0000624120  1901  7F00  8183  8300  051B  8583  8300  0085
0000624140  C483  8300  0082  E483  8300  051F  5A01  7F00
0000624160  0682  6572  7270  7365  8200  6406  6D69  6E65
```

```
THU MAR 14 17:25:16 1991  CRV_IPS.DLL  PAGE 215, LINE 12627

0000624200  0273  1082  6164  6174  6C5F  7961  7265  645F
0000624220  7065  6874  8208  7308  6769  735F  7A69  0A65
0000624240  0782  6973  5F67  7470  0C72  0982  7462  706D
0000624260  735F  7A69  1065  0882  7462  706D  705F  7274
0000624300  8214  7305  6170  6572  0118  0061  0180  0018
0000624320  8579  05A0  830C  0525  2683  8205  280A  6E75
0000624340  6174  6767  6465  6929  0701  7800  8085  8301
0000624360  0084  2501  7F00  8683  8300  022C  2C83  8302
0000624400  0086  8183  8300  0085  8683  8300  0082  8683
0000624420  8300  04E0  1E83  8305  0524  7E01  7F00  0282
0000624440  6469  8200  6E04  6D61  0465  0982  6966  656C
0000624460  6E5F  6D61  2465  0982  7865  5F70  6374  695F
0000624500  4464  0482  7974  6570  8248  720C  6665  6C5F
0000624520  6E69  5F65  756E  4A6D  0982  6572  5F66  6374
0000624540  695F  4C64  0A82  6974  656D  735F  6174  706D
0000624560  8250  6106  696F  695F  5464  0882  6F6C  6163
0000624600  6974  6E6F  8258  6209  6D74  5F70  6E69  6F66
0000624620  825C  7305  6170  6572  8485  0100  0001  0180
0000624640  0001  0180  0001  0180  0001  0180  0001  0180
*
0000624700  0001  0180  0007  737A  2383  8205  0100  0001
0000624720  0180  0001  0180  0001  0180  0001  0180  0001
*
0000625340  0180  0001  0180  0018  8579  02C0  8307  057A
0000625360  7B83  8205  280A  6E75  6174  6767  6465  6929
0000625400  0701  7800  2085  8301  0084  1601  7F00  8683
0000625420  8300  022C  E383  8304  0081  8183  8300  0082
0000625440  7983  0105  0038  827F  6902  0064  0482  616E
0000625460  656D  8204  7204  6365  2474  0482  7461  7274
0000625500  822C  6405  6D75  796D  822E  740A  6D69  5F65
0000625520  7473  6D61  3070  0582  7073  7261  3465  0101
0000625540  8000  0101  8000  0101  8000  0101  8000  0101
0000625560  8000  0101  8000  0701  7A00  8373  0578  0082
0000625600  0101  8000  0101  8000  0101  8000  0101  8000
*
0000625760  1801  7900  1085  1101  A083  8305  05A1  0A82
0000626000  7528  746E  6761  6567  2964  0169  0034  837F
0000626020  0085  8583  8300  0085  8583  8300  0085  8583
0000626040  8300  0081  8583  8300  0085  8583  8300  0084
0000626060  8583  8300  0085  8583  8300  0085  8583  8300
0000626100  0085  0601  7F01  0982  6974  656D  755F  696E
0000626120  0074  0F82  696D  5F6E  6572  6F63  6472  745F
0000626140  6D69  0265  0982  7473  6261  6C69  7469  0479
0000626160  0F82  6163  7470  7275  5F65  6974  656D  756F
0000626200  0674  0A82  656B  5F79  6F66  6D72  7461  8208
0000626220  6313  6E6F  6974  756E  756F  5F73  7274  6361
0000626240  696B  676E  820A  6D0E  756F  6573  745F  6172
0000626260  6B63  6E69  0C67  1182  6163  7470  7275  5F65
0000626300  6973  6E67  7461  7275  0E65  0B82  6F68  6B74
0000626320  7965  735F  6E79  1063  0C82  6564  6166  6C75
0000626340  5F74  6974  656D  8212  6D09  7861  645F  6C65
0000626360  7961  8214  660B  7361  5F74  6572  6C70  7961
0000626400  8216  760E  7265  6669  5F79  6974  656D  756F
0000626420  1874  0C82  6177  7469  745F  6D69  6F65  7475
0000626440  821A  730C  6E79  5F63  6974  656D  756F  1C74
0000626460  0982  6874  6572  6873  6C6F  1E64  0C82  6863
0000626500  6365  5F6B  6F6C  6B6F  7075  0120  0001  0180
0000626520  0007  8578  0800  8083  0100  0001  0180  0001
0000626540  0180  0001  0180  0001  0180  0001  0180  0001
```

THU MAR 14 17:25:16 1991 CRV_IPS.DLL PAGE 216, LINE 12686

```
*
0000626720  0180  0001  0180  0001  0180  0001  0180  0016
0000626740  4079  8302  05C6  C783  8205  280A  6E75  6174
0000626760  6767  6465  6929  0701  7F00  8283  8300  0082
0000627000  1701  7F00  0882  6564  5F66  6974  656D  8200
0000627020  6D08  6E69  745F  6D69  0465  0101  8000  0101
0000627040  8000  0101  8000  0101  8000  0101  8000  0101
0000627060  8000  1601  7900  0440  CF83  8305  05D0  0A82
0000627100  7528  746E  6761  6567  2964  0169  000D  837F
0000627120  0084  8483  8300  0084  E083  0104  0029  827F
0000627140  6107  7362  725F  6C65  8200  7505  696E  7374
0000627160  8201  730C  6570  6963  6C61  665F  6E75  0263
0000627200  0482  6964  7073  0104  0001  0180  0001  0180
0000627220  0001  0180  0016  2079  8302  05D5  D683  8205
0000627240  280A  6E75  6174  6767  6465  6929  0701  7F00
0000627260  8183  8300  0081  1E01  7F00  0982  7973  636E
0000627300  6D5F  646F  0065  0E82  7973  636E  655F  6578
0000627320  5F63  6F6D  6564  0102  0016  3079  8302  05D8
0000627340  D983  8205  280A  6E75  6174  6767  6465  6929
0000627360  0701  7F00  8283  8300  0081  1901  7F00  0782
0000627400  6574  6863  695F  0064  0B82  6574  6863  725F
0000627420  6165  6F73  046E  0101  8000  0101  8000  0101
0000627440  8000  1801  7900  2085  0302  DE83  8305  05DF
0000627460  0A82  7528  746E  6761  6567  2964  0169  000A
0000627500  837F  022C  2C83  8302  0086  1A01  7F00  0582
0000627520  6D69  6761  0065  0482  6964  6666  8220  6407
0000627540  6669  5F66  6469  0140  0018  8579  0310  8302
0000627560  05E2  E383  8205  280A  6E75  6174  6767  6465
0000627600  6929  0701  7800  0085  8303  022C  0701  7F00
0000627620  8583  8300  05E1  2401  7F00  0E82  756E  5F6D
0000627640  666F  735F  7263  6565  736E  8200  690F  616D
0000627660  6567  6E5F  6D61  5F65  696C  7473  0102  0016
0000627700  2079  8301  05E5  E683  8205  280A  6E75  6174
0000627720  6767  6465  6929  0401  7F00  C083  0100  000A
0000627740  827F  7306  7274  6E69  0067  0101  8000  0101
0000627760  8000  0101  8000  1601  7900  0230  EB83  8305
0000630000  05EC  0A82  7528  746E  6761  6567  2964  0169
0000630020  0007  837F  0082  8183  0100  001E  827F  650C
0000630040  6378  7065  6974  6E6F  695F  0064  0B82  7865
0000630060  7063  735F  6174  7574  0473  1601  7900  0220
0000630100  F183  8305  05F2  0A82  7528  746E  6761  6567
0000630120  2964  0169  0016  0879  8302  05EF  F083  8205
0000630140  280A  6E75  6174  6767  6465  6929  0701  7F00
0000630160  8483  8300  0084  1B01  7F00  0882  656B  5F79
0000630200  6F63  6564  8200  730C  6977  6374  5F68  7473
0000630220  7461  0065  0701  7F00  8183  8300  05EE  1801
0000630240  7F00  0882  656B  5F79  7974  6570  8200  6B09
0000630260  7965  765F  6C61  6575  0102  0018  8579  0230
0000630300  8304  05F5  F683  8205  280A  6E75  6174  6767
0000630320  6465  6929  0701  7800  0085  8302  05ED  0D01
0000630340  7F00  8583  8300  05F4  8183  8300  0081  2E01
0000630360  7F00  0882  6573  5F71  6973  657A  8200  7303
0000630400  7165  8202  6B08  7965  615F  7474  4272  0E82
0000630420  6361  6974  6176  6574  5F64  7566  636E  0144
0000630440  0001  0180  0001  0180  0001  0180  0001  0180
*
0000630500  0016  2079  8302  0600  0183  8206  280A  6E75
0000630520  6174  6767  6465  6929  0701  7F00  8183  8300
0000630540  0081  1701  7F00  0882  656B  5F79  7461  7274
```

THU MAR 14 17:25:16 1991 CRV_IPS.DLL PAGE 217, LINE 12745

```
0000630560  8200  6608  6E75  5F63  656B  0279  1801  7900
0000630600  1085  0202  0383  8306  0604  0A82  7528  746E
0000630620  6761  6567  2964  0169  0007  837F  0085  F483
0000630640  0105  0012  827F  7308  7165  735F  7A69  0065
0000630660  0382  6573  0271  0101  8000  0101  8000  0101
0000630700  8000  0101  8000  0101  8000  1801  7900  D085
0000630720  0202  0B83  8306  060C  0A82  7528  746E  6761
0000630740  6567  2964  0169  0007  837F  0578  8183  0100
0000630760  0011  827F  6606  6C69  6574  0072  0482  6F6D
0000631000  6564  0158  0018  8579  0150  8305  060E  0F83
0000631020  8206  280A  6E75  6174  6767  6465  6929  1001
0000631040  7F00  2C83  8302  0086  8183  8300  0081  8183
0000631060  0100  002B  827F  6E04  6D61  0065  0682  696C
0000631100  5F62  6469  8220  6305  616C  7373  8224  7305
0000631120  7974  656C  8226  6F07  5F70  6F63  6564  0128
0000631140  0001  0180  0001  0180  0001  0180  001B  2079
0000631160  8309  0614  1583  8206  690F  755F  6D5F  6773
0000631200  705F  7261  6D61  745F  0169  001C  837F  0081
0000631220  8583  8300  0082  8683  8300  0088  8083  8300
0000631240  0084  CD83  8300  00C0  6A01  7F00  0982  5F69
0000631260  5F75  6873  726F  0074  0A82  5F69  5F75  7375
0000631300  6F68  7472  8200  6908  755F  6C5F  6E6F  0067
0000631320  0982  5F69  5F75  6C75  6E6F  0067  0982  5F69
0000631340  5F75  6C66  616F  0074  0882  5F69  5F75  6863
0000631360  7261  8200  6909  755F  755F  6863  7261  8200
0000631400  6907  755F  735F  7274  8200  6909  755F  625F
0000631420  6F6C  6B63  0100  0019  3079  8302  0617  1883
0000631440  8206  690D  6D5F  6773  705F  7261  6D61  745F
0000631460  0169  0007  837F  0085  1383  0106  0010  827F
0000631500  7404  7079  0065  0582  6176  756C  0265  0101
0000631520  8000  1C01  7900  9085  0900  1B83  8306  061C
0000631540  0E82  5F69  736D  5F67  6568  6461  7265  745F
0000631560  0169  001C  837F  0081  8183  8300  0085  8583
0000631600  8300  0084  8583  8300  0085  8183  8300  0085
0000631620  4701  7F00  0482  5F71  6469  8200  7306  756F
0000631640  6372  0265  0382  6970  0464  0382  6974  0664
0000631660  0482  6572  7073  8208  7208  7365  5F70  6974
0000631700  0A64  0782  706F  635F  646F  0C65  0482  7974
0000631720  6570  820E  7304  7A69  1065  1501  7900  C085
0000631740  0200  1F83  8306  0620  0782  5F69  736D  5F67
0000631760  6974  0501  7800  8330  0616  0701  7F00  1A83
0000632000  8306  061E  1701  7F00  0682  6568  6461  7265
0000632020  8200  700A  7261  6D61  6C5F  7369  1274  0101
0000632040  8000  0101  8000  0101  8000  0101  8000  0101
*
0000632220  8000  0101  8000  0101  8000  0101  8000  1601
0000632240  7900  0330  4283  8306  0643  0A82  7528  746E
0000632260  6761  6567  2964  0169  000A  837F  0085  8583
0000632300  8300  0085  2201  7F00  0982  6373  6572  6E65
0000632320  625F  0067  0782  6369  6E6F  625F  0267  0882
0000632340  7068  635F  6F72  7373  0104  0018  8579  01B0
0000632360  8310  0645  4683  8206  280A  6E75  6174  6767
0000632400  6465  6929  3101  7F00  8183  8300  0085  8583
0000632420  8300  0085  8583  8300  0086  8683  8300  0086
0000632440  8683  8300  0086  8683  8300  051B  8583  8300
0000632460  0641  8683  8300  0085  E801  7F00  0382  6564
0000632500  0076  0982  6874  6572  6873  6C6F  0264  1282
0000632520  6C62  6E69  696B  676E  745F  7268  7365  6F68
0000632540  646C  8204  6512  7272  655F  656C  5F6D  6874
```

THU MAR 14 17:25:16 1991 CRV_IPS.DLL PAGE 218, LINE 12804

| | | | | | | | | |
|---|---|---|---|---|---|---|---|---|
| 0000632560 | 6572 | 6873 | 6C6F | 0664 | 1282 | 7865 | 7063 | 655F |
| 0000632600 | 7272 | 745F | 7268 | 7365 | 6F68 | 646C | 8208 | 7309 |
| 0000632620 | 6174 | 6962 | 696C | 7974 | 820A | 7408 | 6D69 | 5F65 |
| 0000632640 | 756F | 0E74 | 0D82 | 7973 | 636E | 745F | 6D69 | 5F65 |
| 0000632660 | 756F | 1274 | 0682 | 7374 | 5F74 | 6469 | 8216 | 640B |
| 0000632700 | 6669 | 5F66 | 7374 | 5F74 | 6469 | 821A | 700D | 7261 |
| 0000632720 | 6E65 | 5F74 | 7374 | 5F74 | 6469 | 821E | 6406 | 6D69 |
| 0000632740 | 6E65 | 2273 | 1082 | 6164 | 6174 | 6C5F | 7961 | 7265 |
| 0000632760 | 645F | 7065 | 6874 | 8228 | 690C | 6F63 | 5F6E | 6F63 |
| 0000633000 | 6F6C | 7275 | 2A73 | 0D82 | 6F61 | 5F69 | 6F78 | 5F72 |
| 0000633020 | 6F63 | 6F6C | 3072 | 0A82 | 6E69 | 6574 | 6C72 | 6361 |
| 0000633040 | 6465 | 0134 | 0001 | 0180 | 0001 | 0180 | 0001 | 0180 |
| 0000633060 | 0001 | 0180 | 0001 | 0180 | 0001 | 0180 | 0016 | 4079 |
| 0000633100 | 8303 | 064F | 5083 | 8206 | 280A | 6E75 | 6174 | 6767 |
| 0000633120 | 6465 | 6929 | 0701 | 7A00 | 8373 | 05F3 | 0082 | 0A01 |
| 0000633140 | 7F00 | 8183 | 8300 | 0081 | 4E83 | 0106 | 002B | 827F |
| 0000633160 | 6106 | 7463 | 6F69 | 006E | 0F82 | 756E | 5F6D | 666F |
| 0000633200 | 735F | 666F | 6B74 | 7965 | 0273 | 0C82 | 6F73 | 7466 |
| 0000633220 | 656B | 7379 | 705F | 7274 | 0104 | 0016 | 4079 | 8303 |
| 0000633240 | 0653 | 5483 | 8206 | 280A | 6E75 | 6174 | 6767 | 6465 |
| 0000633260 | 6929 | 0701 | 7A00 | 8373 | 0602 | 0082 | 0A01 | 7F00 |
| 0000633300 | 8183 | 8300 | 0081 | 5283 | 0106 | 0029 | 827F | 6106 |
| 0000633320 | 7463 | 6F69 | 006E | 0E82 | 756E | 5F6D | 666F | 685F |
| 0000633340 | 746F | 656B | 7379 | 8202 | 680B | 746F | 656B | 7379 |
| 0000633360 | 705F | 7274 | 0104 | 0018 | 8579 | 0170 | 8305 | 0656 |
| 0000633400 | 5783 | 8206 | 280A | 6E75 | 6174 | 6767 | 6465 | 6929 |
| 0000633420 | 1001 | 7F00 | 2C83 | 8302 | 0086 | 3183 | 8305 | 00E4 |
| 0000633440 | 8583 | 0100 | 003D | 827F | 690A | 616D | 6567 | 6E5F |
| 0000633460 | 6D61 | 0065 | 0882 | 6D69 | 6761 | 5F65 | 6469 | 8220 |
| 0000633500 | 6909 | 616D | 6567 | 705F | 7274 | 8224 | 6C09 | 7961 |
| 0000633520 | 7265 | 705F | 7274 | 8228 | 6909 | 616D | 6567 | 685F |
| 0000633540 | 6C64 | 012C | 0001 | 0180 | 0016 | 5079 | 8303 | 065A |
| 0000633560 | 5B83 | 8206 | 280A | 6E75 | 6174 | 6767 | 6465 | 6929 |
| 0000633600 | 0A01 | 7F00 | 8283 | 8300 | 0085 | 8283 | 0105 | 0029 |
| 0000633620 | 827F | 6106 | 696F | 695F | 0064 | 0E82 | 756E | 5F6D |
| 0000633640 | 666F | 665F | 6C69 | 6574 | 7372 | 8204 | 660B | 6C69 |
| 0000633660 | 6574 | 5F72 | 696C | 7473 | 0106 | 0018 | 8579 | 0190 |
| 0000633700 | 8302 | 065D | 5E83 | 8206 | 280A | 6E75 | 6174 | 6767 |
| 0000633720 | 6465 | 6929 | 0701 | 7F00 | 8283 | 8300 | 0655 | 1801 |
| 0000633740 | 7F00 | 0C82 | 7865 | 6563 | 7470 | 6F69 | 5F6E | 6469 |
| 0000633760 | 8200 | 6905 | 616D | 6567 | 0104 | 0001 | 0180 | 0016 |
| 0000634000 | 4079 | 8303 | 0662 | 6383 | 8206 | 280A | 6E75 | 6174 |
| 0000634020 | 6767 | 6465 | 6929 | 0701 | 7A00 | 8373 | 065C | 0082 |
| 0000634040 | 0A01 | 7F00 | 8183 | 8300 | 0081 | 6183 | 0106 | 002F |
| 0000634060 | 827F | 6106 | 7463 | 6F69 | 006E | 1182 | 756E | 5F6D |
| 0000634100 | 666F | 655F | 6378 | 7065 | 6974 | 6E6F | 0273 | 0E82 |
| 0000634120 | 7865 | 6563 | 7470 | 6F69 | 5F6E | 696C | 7473 | 0104 |
| 0000634140 | 0018 | 8579 | 0450 | 8303 | 0665 | 6683 | 8206 | 280A |
| 0000634160 | 6E75 | 6174 | 6767 | 6465 | 6929 | 0A01 | 7F00 | 5583 |
| 0000634200 | 8306 | 0655 | 5583 | 0106 | 001A | 827F | 6906 | 616D |
| 0000634220 | 6567 | 0031 | 0682 | 6D69 | 6761 | 3265 | 822E | 6404 |
| 0000634240 | 6669 | 5C66 | 1801 | 7900 | A085 | 0301 | 6983 | 8306 |
| 0000634260 | 066A | 0A82 | 7528 | 746E | 6761 | 6567 | 2964 | 0169 |
| 0000634300 | 0007 | 737A | 5583 | 8206 | 0100 | 000A | 837F | 0081 |
| 0000634320 | 6883 | 8306 | 0655 | 2601 | 7F00 | 0E82 | 756E | 5F6D |
| 0000634340 | 666F | 735F | 7263 | 6565 | 736E | 8200 | 690A | 616D |
| 0000634360 | 6567 | 6C5F | 7369 | 0274 | 0482 | 6964 | 6666 | 0106 |
| 0000634400 | 0018 | 8579 | 0210 | 8303 | 066C | 6D83 | 8206 | 280A |
| 0000634420 | 6E75 | 6174 | 6767 | 6465 | 6929 | 0A01 | 7F00 | 2C83 |

THU MAR 14 17:25:16 1991 CRV_IPS.DLL PAGE 219, LINE 12863

```
0000634440  8302  022C  8183  0100  0019  827F  6906  616D
0000634460  6567  0031  0682  6D69  6761  3265  8220  6303
0000634500  7475  0140  0018  8579  0940  8307  0672  7383
0000634520  8206  280A  6E75  6174  6767  6465  6929  1801
0000634540  7900  0085  1D08  7083  8306  0671  0A82  7528
0000634560  746E  6761  6567  2964  0169  0058  837F  0084
0000634600  A383  8305  0084  8483  8300  05CE  8183  8300
0000634620  04EB  D483  8305  060A  7883  8305  0081  5183
0000634640  8306  05D7  6083  8306  05EA  8183  8300  064D
0000634660  5583  8306  0664  6783  8306  05E0  8583  8300
0000634700  05DD  6B83  8306  05E4  9F83  8305  05FF  0D83
0000634720  8306  0084  6F01  7F01  0A82  626B  5F64  7473
0000634740  7461  7375  8200  7409  7365  5F74  616E  656D
0000634760  8200  6B08  7965  635F  646F  0065  0C82  7773
0000635000  7469  6863  735F  6174  6574  8200  6C0C  636F
0000635020  7461  726F  645F  7369  0070  0E82  7274  6361
0000635040  696B  676E  6C5F  7665  6C65  8200  730C  6163
0000635060  656C  775F  6E69  6F64  0077  0982  7973  636E
0000635100  6D5F  646F  0065  0A82  6966  746C  7265  6D5F
0000635120  6773  8200  6606  6C69  6574  0072  0B82  7563
0000635140  7272  6E65  5F74  6F61  0069  0C82  6F68  6B74
0000635160  7965  5F73  696C  7473  8200  730A  6E79  5F63
0000635200  7665  6E65  0074  0E82  7865  6563  7470  6F69
0000635220  5F6E  696C  7473  8200  6510  6378  5F70  7473
0000635240  7461  7375  6C5F  7369  0074  0482  6F6D  6564
0000635260  8200  730D  666F  6B74  7965  5F73  696C  7473
0000635300  8200  6905  616D  6567  8200  6307  6D6F  6170
0000635320  6572  8200  770B  6961  5F74  6373  6572  6E65
0000635340  8200  690A  616D  6567  6C5F  7369  0074  0982
0000635360  6D69  6761  5F65  756E  006D  0A82  6D69  6761
0000635400  5F65  6964  6666  8200  680B  6C61  5F66  6D69
0000635420  6761  7365  8200  6D07  7361  6173  6567  8200
0000635440  7006  7261  6D61  0073  0882  7566  636E  6B5F
0000635460  7965  8200  6908  6F63  5F6E  736D  0067  0582
0000635500  7564  6D6D  0079  1601  7F00  8183  8300  061D
0000635520  8183  8300  05C5  6F83  8306  0081  8583  0100
0000635540  005A  827F  7306  756F  6372  0065  0A82  736D
0000635560  5F67  6568  6461  7265  8202  650A  6576  746E
0000635600  745F  7079  1A65  0682  6974  696D  676E  821C
0000635620  650B  6576  746E  765F  6C61  6575  8224  720C
0000635640  7465  7275  5F6E  6176  756C  8565  0124  0982
0000635660  6572  7073  665F  616C  8567  0126  0101  8000
0000635700  0101  8000  0101  8000  0101  8000  0701  7A00
0000635720  8373  066E  0082  0101  8000  0101  8000  0101
0000635740  8000  0101  8000  0101  8000  0101  8000  0101
*
0000636560  8000  1601  7900  0240  E183  8306  06E2  0A82
0000636600  7528  746E  6761  6567  2964  0169  0007  837F
0000636620  0082  8283  0100  0022  827F  700E  7261  6D61
0000636640  7465  7265  635F  646F  0065  0D82  6170  6172
0000636660  656D  6574  5F72  6176  046C  1601  7900  0550
0000636700  E483  8306  06E5  0A82  7528  746E  6761  6567
0000636720  2964  0169  0010  837F  0081  8183  8300  0081
0000636740  8183  8300  0081  2C01  7F00  0582  6C78  6665
0000636760  0074  0482  7479  706F  8202  7806  6972  6867
0000637000  0474  0582  6479  776F  066E  0882  616D  6B73
0000637020  625F  7469  0108  0016  2079  8302  06E7  E883
0000637040  8206  280A  6E75  6174  6767  6465  6929  0701
0000637060  7F00  8183  8300  0081  1901  7FU0  0A82  6966
```

```
THU MAR 14 17:25:16 1991  CRV_IPS.DLL  PAGE 220, LINE 12922

0000637100  746C  7265  6E5F  6D75  8200  6808  5F77  6C70
0000637120  6E61  0265  0101  8000  0101  8000  0101  8000
0000637140  0101  8000  0101  8000  0101  8000  0101  8000
*
0000637220  0A01  7500  8380  0081  0164  F983  0106  0004
0000637240  837F  0678  0A01  7500  8380  0081  0264  FB83
0000637260  0106  0007  837F  0678  8183  0100  0007  737A
0000637300  5983  8206  0100  000A  8075  8183  6400  8302
0000637320  06FE  0701  7F00  8283  8305  06FC  0A01  7500
0000637340  8380  0081  0164  0083  0107  0004  837F  06FC
0000637360  0A01  7500  8380  0081  0364  0283  0107  000A
0000637400  837F  0582  8283  8305  06FC  0A01  7500  8380
0000637420  0081  0664  0483  0107  0013  837F  0085  FC83
0000637440  8306  0081  8183  8300  0081  8283  0105  000A
0000637460  8075  8283  6400  8303  0706  0A01  7F00  8183
0000637500  8300  0081  8283  0105  000A  8075  8183  6400
0000637520  8303  0708  0A01  7F00  8283  8305  0081  8183
0000637540  0100  0001  0180  0001  0180  000A  8075  8183
0000637560  6400  8302  070C  0701  7F00  8583  8300  0085
0000637600  0401  7F00  7883  0106  000A  8075  8183  7300
0000637620  8301  070D  0401  7F00  7883  0106  000A  8075
0000637640  8183  7300  8301  070F  0A01  7500  8380  0081
0000637660  0073  0183  0102  0005  7878  8083  0100  0004
0000637700  837F  0678  0A01  7500  8380  0081  0173  1383
0000637720  0107  0007  8578  0088  8083  0100  0007  8578
0000637740  0098  8083  0100  0004  837F  0678  0A01  7500
0000637760  8380  0081  0173  1783  0107  0004  837F  0678
0000640000  0A01  7500  8380  0081  0173  1983  0107  0004
0000640020  837F  0678  0A01  7500  8380  0081  0164  1B83
0000640040  0107  0004  837F  0081  0A01  7500  8380  0081
0000640060  0173  1D83  0107  000A  8075  8183  6400  8300
0000640100  0201  0401  7F00  7883  0106  000A  8075  8183
0000640120  7300  8301  0720  0701  7F00  7883  8306  0081
0000640140  0A01  7500  8380  0081  0264  2283  0107  0004
0000640160  837F  0678  0A01  7500  8380  0081  0164  2483
0000640200  0107  0007  837F  0582  FC83  0106  000A  8075
0000640220  8183  6400  8302  0726  0401  7F00  FC83  0106
0000640240  000A  8075  8183  6400  8301  0728  0401  7F00
0000640260  FC83  0106  000A  8075  8183  6400  8301  072A
0000640300  0701  7F00  8283  8305  06FC  0A01  7500  8380
0000640320  0081  0264  2C83  0107  0004  837F  06FC  0A01
0000640340  7500  8380  0081  0164  2E83  0107  000A  837F
0000640360  0582  8283  8305  06FC  0A01  7500  8380  0081
0000640400  0364  3083  0107  0013  837F  0085  FC83  8306
0000640420  0081  8183  8300  0081  8283  0105  000A  8075
0000640440  8183  6400  8306  0732  0A01  7F00  8183  8300
0000640460  0081  8283  0105  000A  8075  8283  6400  8303
0000640500  0734  0A01  7F00  8283  8305  0081  8183  0100
0000640520  000A  8075  8183  6400  8303  0736  0401  7F00
0000640540  5983  0106  000A  8075  8183  6400  8301  0738
0000640560  0701  7F00  8583  8300  0085  0A01  7500  8380
0000640600  0081  0264  3A83  0107  000A  8075  0083  6402
0000640620  8300  0201  0A01  7500  8380  0081  0064  0183
0000640640  0102  0004  837F  0659  0A01  7500  8380  0081
0000640660  0164  3E83  0107  000A  8075  8183  6400  8300
0000640700  0201  0701  7A00  8373  06E3  0082  0A01  7500
0000640720  8380  0081  0064  0183  0102  0001  0180  0001
0000640740  0180  0001  0180  0001  0180  0001  0180  0001
*
```

```
THU MAR 14 17:25:16 1991  CRV_IPS.DLL  PAGE 221, LINE 12981

0000641200  0180  0001  0180  0007  8578  0100  8083  0100
0000641220  0001  0180  0001  0180  0001  0180  0001  0180
*
0000646520  0001  0180  0001  0180  0001  0180  0016  2079
0000646540  8302  04E1  E283  8204  280A  6E75  6174  6767
0000646560  6465  6929  0701  7F00  8183  8300  0081  0901
0000646600  7F00  0182  0078  0182  0279  1601  7900  0240
0000646620  E483  8304  04E5  0A82  7528  746E  6761  6567
0000646640  2964  0169  0007  837F  04E0  E083  0104  000D
0000646660  827F  6D03  6E69  8200  6D03  7861  0104  0001
0000646700  0180  0016  2079  8302  04E8  E983  8204  280A
0000646720  6E75  6174  6767  6465  6929  0701  7F00  8583
0000646740  8300  0085  1201  7F00  0582  6977  7464  0068
0000646760  0682  6568  6769  7468  0102  0001  0180  0016
0000647000  4079  8302  04EC  ED83  8204  280A  6E75  6174
0000647020  6767  6465  6929  0701  7F00  E083  8304  04E7
0000647040  1101  7F00  0682  726F  6769  6E69  8200  6104
0000647060  6572  0461  0101  8000  0101  8000  0101  8000
0000647100  0101  8000  0101  8000  0101  8000  0101  8000
*
0000647340  0101  8000  0101  8000  1601  7900  0330  1C83
0000647360  8305  051D  0A82  7528  746E  6761  6567  2964
0000647400  0169  000A  837F  0085  8583  8300  0085  1A01
0000647420  7F00  0582  6977  7464  0068  0682  6568  6769
0000647440  7468  8202  6405  7065  6874  0104  0018  8579
0000647460  0140  8308  0520  2183  8205  280A  6E75  6174
0000647500  6767  6465  6929  0701  7800  8085  8300  0084
0000647520  1901  7F00  8183  8300  051B  8583  8300  0085
0000647540  C483  8300  0082  E483  8300  051F  5A01  7F00
0000647560  0682  6572  7270  7365  8200  6406  6D69  6E65
0000647600  0273  1082  6164  6174  6C5F  7961  7265  645F
0000647620  7065  6874  8208  7308  6769  735F  7A69  0A65
0000647640  0782  6973  5F67  7470  0C72  0982  7462  706D
0000647660  735F  7A69  1065  0882  7462  706D  705F  7274
0000647700  8214  7305  6170  6572  0118  0001  0180  0018
0000647720  8579  05A0  830C  0525  2683  8205  280A  6E75
0000647740  6174  6767  6465  6929  0701  7800  8085  8301
0000647760  0084  2501  7F00  8683  8300  022C  2C83  8302
0000650000  0086  8183  8300  0085  8683  8300  0082  8683
0000650020  8300  04E0  1E83  8305  0524  7E01  7F00  0282
0000650040  6469  8200  6E04  6D61  0465  0982  6966  656C
0000650060  6E5F  6D61  2465  0982  7865  5F70  6374  695F
0000650100  4464  0482  7974  6570  8248  720C  6665  6C5F
0000650120  6E69  5F65  756E  4A6D  0982  6572  5F66  6374
0000650140  695F  4C64  0A82  6974  656D  735F  6174  706D
0000650160  8250  6106  696F  695F  5464  0882  6F6C  6163
0000650200  6974  6E6F  8258  6209  6D74  5F70  6E69  6F66
0000650220  825C  7305  6170  6572  8485  0100  0001  0180
0000650240  0001  0180  0001  0180  0001  0180  0001  0180
*
0000650300  0001  0180  0007  737A  2383  8205  0100  0001
0000650320  0180  0001  0180  0001  0180  0001  0180  0001
*
0000650740  0180  0001  0180  0018  8579  02C0  8307  057A
0000650760  7B83  8205  280A  6E75  6174  6767  6465  6929
0000651000  0701  780C  2085  8301  0084  1601  7F00  8683
0000651020  8300  022C  E383  8304  0081  8183  8300  0082
0000651040  7983  0105  0038  827F  6902  0064  0482  616E
0000651060  656D  8204  7204  6365  2474  0482  7461  7274
```

THU MAR 14 17:25:16 1991 CRV_IPS.DLL PAGE 222, LINE 13040

```
0000651100  822C  6405  6D75  796D  822E  740A  6D69  5F65
0000651120  7473  6D61  3070  0582  7073  7261  3465  0101
0000651140  8000  0101  8000  0101  8000  0101  8000  0101
0000651160  8000  0101  8000  0701  7A00  8373  0578  0082
0000651200  0101  8000  0101  8000  0101  8000  0101  8000
*
0000651360  1801  7900  1085  1101  A083  8305  05A1  0A82
0000651400  7528  746E  6761  6567  2964  0169  0034  837F
0000651420  0085  8583  8300  0085  8583  8300  0085  8583
0000651440  8300  0081  8583  8300  0085  8583  8300  0084
0000651460  8583  8300  0085  8583  8300  0085  8583  8300
0000651500  0085  0601  7F01  0982  6974  656D  755F  696E
0000651520  0074  0F82  696D  5F6E  6572  6F63  6472  745F
0000651540  6D69  0265  0982  7473  6261  6C69  7469  0479
0000651560  0F82  6163  7470  7275  5F65  6974  656D  756F
0000651600  0674  0A82  656B  5F79  6F66  6D72  7461  8208
0000651620  6313  6E6F  6974  756E  756F  5F73  7274  6361
0000651640  696B  676E  820A  6D0E  756F  6573  745F  6172
0000651660  6B63  6E69  0C67  1182  6163  7470  7275  5F65
0000651700  6973  6E67  7461  7275  0E65  0B82  6F68  6B74
0000651720  7965  735F  6E79  1063  0C82  6564  6166  6C75
0000651740  5F74  6974  656D  8212  6D09  7861  645F  6C65
0000651760  7961  8214  660B  7361  5F74  6572  6C70  7961
0000652000  8216  760E  7265  6669  5F79  6974  656D  756F
0000652020  1874  0C82  6177  7469  745F  6D69  6F65  7475
0000652040  821A  730C  6E79  5F63  6974  656D  756F  1C74
0000652060  0982  6874  6572  6873  6C6F  1E64  0C82  6863
0000652100  6365  5F6B  6F6C  6B6F  7075  0120  0001  0180
0000652120  0007  8578  0800  8083  0100  0001  0180  0001
0000652140  0180  0001  0180  0001  0180  0001  0180  0001
*
0000652320  0180  0001  0180  0001  0180  0001  0180  0016
0000652340  4079  8302  05C6  C783  8205  280A  6E75  6174
0000652360  6767  6465  6929  0701  7F00  8283  8300  0082
0000652400  1701  7F00  0882  6564  5F66  6974  656D  8200
0000652420  6D08  6E69  745F  6D69  0465  0101  8000  0101
0000652440  8000  0101  8000  0101  8000  0101  8000  0101
0000652460  8000  1601  7900  0440  CF83  8305  05D0  0A82
0000652500  7528  746E  6761  6567  2964  0169  000D  837F
0000652520  0084  8483  8300  0084  E083  0104  0029  827F
0000652540  6107  7362  725F  6C65  8200  7505  696E  7374
0000652560  8201  730C  6570  6963  6C61  665F  6E75  0263
0000652600  0482  6964  7073  0104  0001  0180  0001  0180
0000652620  0001  0180  0016  2079  8302  05D5  D683  8205
0000652640  280A  6E75  6174  6767  6465  6929  0701  7F00
0000652660  8183  8300  0081  1E01  7F00  0982  7973  636E
0000652700  6D5F  646F  0065  0E82  7973  636E  655F  6578
0000652720  5F63  6F6D  6564  0102  0016  3079  8302  05D8
0000652740  D983  8205  280A  6E75  6174  6767  6465  6929
0000652760  0701  7F00  8283  8300  0081  1901  7F00  0782
0000653000  6574  6863  695F  0064  0B82  6574  6863  725F
0000653020  6165  6F73  046E  0101  8000  0101  8000  0101
0000653040  8000  1801  7900  2085  0302  DE83  8305  05DF
0000653060  0A82  7528  746E  6761  6567  2964  0169  000A
0000653100  837F  022C  2C83  8302  0086  1A01  7F00  0582
0000653120  6D69  6761  0065  0482  6964  6666  8220  6407
0000653140  6669  5F66  6469  0140  0018  8579  0310  8302
0000653160  05E2  E383  8205  280A  6E75  6174  6767  6465
0000653200  6929  0701  7800  0085  8303  022C  0701  7F00
```

```
THU MAR 14 17:25:16 1991  CRV_IPS.DLL  PAGE 223, LINE 13099

0000653220  8583  8300  05E1  2401  7F00  0E82  756E  5F6D
0000653240  666F  735F  7263  6565  736E  8200  690F  616D
0000653260  6567  6E5F  6D61  5F65  696C  7473  0102  0016
0000653300  2079  8301  05E5  E683  8205  280A  6E75  6174
0000653320  6767  6465  6929  0401  7F00  C083  0100  000A
0000653340  827F  7306  7274  6E69  0067  0101  8000  0101
0000653360  8000  0101  8000  1601  7900  0230  EB83  8305
0000653400  05EC  0A82  7528  746E  6761  6567  2964  0169
0000653420  0007  837F  0082  8183  0100  001E  827F  650C
0000653440  6378  7065  6974  6E6F  695F  0064  0B82  7865
0000653460  7063  735F  6174  7574  0473  1601  7900  0220
0000653500  F183  8305  05F2  0A82  7528  746E  6761  6567
0000653520  2964  0169  0016  0879  8302  05EF  F083  8205
0000653540  280A  6E75  6174  6767  6465  6929  0701  7F00
0000653560  8483  8300  0084  1B01  7F00  0882  656B  5F79
0000653600  6F63  6564  8200  730C  6977  6374  5F68  7473
0000653620  7461  0065  0701  7F00  8183  8300  05EE  1801
0000653640  7F00  0882  656B  5F79  7974  6570  8200  6B09
0000653660  7965  765F  6C61  6575  0102  0018  8579  0230
0000653700  8304  05F5  F683  8205  280A  6E75  6174  6767
0000653720  6465  6929  0701  7800  0085  8302  05ED  0D01
0000653740  7F00  8583  8300  05F4  8183  8300  0081  2E01
0000653760  7F00  0882  6573  5F71  6973  657A  8200  7303
0000654000  7165  8202  6B08  7965  615F  7474  4272  0E82
0000654020  6361  6974  6176  6574  5F64  7566  636E  0144
0000654040  0001  0180  0001  0180  0001  0180  0001  0180
*
0000654100  0016  2079  8302  0600  0183  8206  280A  6E75
0000654120  6174  6767  6465  6929  0701  7F00  8183  8300
0000654140  0081  1701  7F00  0882  656B  5F79  7461  7274
0000654160  8200  6608  6E75  5F63  656B  0279  1801  7900
0000654200  1085  0202  0383  8306  0604  0A82  7528  746E
0000654220  6761  6567  2964  0169  0007  837F  0085  F483
0000654240  0105  0012  827F  7308  7165  735F  7A69  0065
0000654260  0382  6573  0271  0101  8000  0101  8000  0101
0000654300  8000  0101  8000  0101  8000  1801  7900  D085
0000654320  0202  0B83  8306  060C  0A82  7528  746E  6761
0000654340  6567  2964  0169  0007  837F  0578  8183  0100
0000654360  0011  827F  6606  6C69  6574  0072  0482  6F6D
0000654400  6564  0158  0018  8579  0150  8305  060E  0F83
0000654420  8206  280A  6E75  6174  6767  6465  6929  1001
0000654440  7F00  2C83  8302  0086  8183  8300  0081  8183
0000654460  0100  002B  827F  6E04  6D61  0065  0682  696C
0000654500  5F62  6469  8220  6305  616C  7373  8224  7305
0000654520  7974  656C  8226  6F07  5F70  6F63  6564  0128
0000654540  0001  0180  0001  0180  0001  0180  001B  2079
0000654560  8309  0614  1583  8206  690F  755F  6D5F  6773
0000654600  705F  7261  6D61  745F  0169  001C  837F  0081
0000654620  8583  8300  0082  8683  8300  0088  8083  8300
0000654640  0084  C083  8300  00C0  6A01  7F00  0982  5F69
0000654660  5F75  6873  726F  0074  0A82  5F69  5F75  7375
0000654700  6F68  7472  8200  6908  755F  6C5F  6E6F  0067
0000654720  0982  5F69  5F75  6C75  6E6F  0067  0982  5F69
0000654740  5F75  6C66  616F  0074  0882  5F69  5F75  6863
0000654760  7261  8200  6909  755F  755F  6863  7261  8200
0000655000  6907  755F  735F  7274  8200  6909  755F  625F
0000655020  6F6C  6B63  0100  0019  3079  8302  0617  1883
0000655040  8206  690D  6D5F  6773  705F  7261  6D61  745F
0000655060  0169  0007  837F  0085  1383  0106  0010  827F
```

THU MAR 14 17:25:16 1991 CRV_IPS.DLL PAGE 224, LINE 13158

```
0000655100  7404  7079  0065  0582  6176  756C  0265  0101
0000655120  8000  1C01  7900  9085  0900  1B83  8306  061C
0000655140  0E82  5F69  736D  5F67  6568  6461  7265  745F
0000655160  0169  001C  837F  0081  8183  8300  0085  8583
0000655200  8300  0084  8583  8300  0085  8183  8300  0085
0000655220  4701  7F00  0482  5F71  6469  8200  7306  756F
0000655240  6372  0265  0382  6970  0464  0382  6974  0664
0000655260  0482  6572  7073  8208  7208  7365  5F70  6974
0000655300  0A64  0782  706F  635F  646F  0C65  0482  7974
0000655320  6570  820E  7304  7A69  1065  1501  7900  C085
0000655340  0200  1F83  8306  0620  0782  5F69  736D  5F67
0000655360  6974  0501  7800  8330  0616  0701  7F00  1A83
0000655400  8306  061E  1701  7F00  0682  6568  6461  7265
0000655420  8200  700A  7261  6D61  6C5F  7369  1274  0101
0000655440  8000  0101  8000  0101  8000  0101  8000  0101
*
0000655620  8000  0101  8000  0101  8000  0101  8000  1601
0000655640  7900  0330  4283  8306  0643  0A82  7528  746E
0000655660  6761  6567  2964  0169  000A  837F  0085  8583
0000655700  8300  0085  2201  7F00  0982  6373  6572  6E65
0000655720  625F  0067  0782  6369  6E6F  625F  0267  0882
0000655740  7068  635F  6F72  7373  0104  0018  8579  01B0
0000655760  8310  0645  4683  8206  280A  6E75  6174  6767
0000656000  6465  6929  3101  7F00  8183  83C0  0085  8583
0000656020  8300  0085  8583  8300  0086  8683  8300  0086
0000656040  8683  8300  0086  8683  8300  051B  8583  8300
0000656060  0641  8683  8300  0085  E801  7F00  0382  6564
0000656100  0076  0982  6874  6572  6873  6C6F  0264  1282
0000656120  6C62  6E69  696B  676E  745F  7268  7365  6F68
0000656140  646C  8204  6512  7272  655F  656C  5F6D  6874
0000656160  6572  6873  6C6F  0664  1282  7865  7063  655F
0000656200  7272  745F  7268  7365  6F68  646C  8208  7309
0000656220  6174  6962  696C  7974  820A  7408  6D69  5F65
0000656240  756F  0E74  0D82  7973  636E  745F  6D69  5F65
0000656260  756F  1274  0682  7374  5F74  6469  8216  640B
0000656300  6669  5F66  7374  5F74  6469  821A  700D  7261
0000656320  6E65  5F74  7374  5F74  6469  821E  6406  6D69
0000656340  6E65  2273  1082  6164  6174  6C5F  7961  7265
0000656360  645F  7065  6874  8228  690C  6F63  5F6E  6F63
0000656400  6F6C  7275  2A73  0D82  6F61  5F69  6F78  5F72
0000656420  6F63  6F6C  3072  0A82  6E69  6574  6C72  6361
0000656440  6465  0134  0001  0180  0001  0180  0001  0180
0000656460  0001  0180  0001  0180  0001  0180  0016  4079
0000656500  8303  064F  5083  8206  280A  6E75  6174  6767
0000656520  6465  6929  0701  7A00  8373  05F3  0082  0A01
0000656540  7F00  8183  8300  0081  4E83  0106  002B  827F
0000656560  6106  7463  6F69  006E  0F82  756E  5F6D  666F
0000656600  735F  666F  6B74  7965  0273  0C82  6F73  7466
0000656620  656B  7379  705F  7274  0104  0016  4079  8303
0000656640  0653  5483  8206  280A  6E75  6174  6767  6465
0000656660  6929  0701  7A00  8373  0602  0082  0A01  7F00
0000656700  8183  8300  0081  5283  0106  0029  827F  6106
0000656720  7463  6F69  006E  0E82  756E  5F6D  666F  685F
0000656740  746F  656B  7379  8202  680B  746F  656B  7379
0000656760  705F  7274  0104  0018  8579  0170  8305  0656
0000657000  5783  8206  280A  6E75  6174  6767  6465  6929
0000657020  1001  7F00  2C83  8302  0086  3183  8305  00E4
0000657040  8583  0100  003D  827F  690A  616D  6567  6E5F
0000657060  6D61  0065  0882  6D69  6761  5F65  6469  8220
```

THU MAR 14 17:25:16 1991 CRV_IPS.DLL PAGE 225, LINE 13217

| | | | | | | | | |
|---|---|---|---|---|---|---|---|---|
| 0000657100 | 6909 | 616D | 6567 | 705F | 7274 | 8224 | 6C09 | 7961 |
| 0000657120 | 7265 | 705F | 7274 | 8228 | 6909 | 616D | 6567 | 685F |
| 0000657140 | 6C64 | 012C | 0001 | 0180 | 0001 | 0180 | 0001 | 0180 |
| 0000657160 | 0001 | 0180 | 0018 | 8579 | 0190 | 8302 | 065D | 5E83 |
| 0000657200 | 8206 | 280A | 6E75 | 6174 | 6767 | 6465 | 6929 | 0701 |
| 0000657220 | 7F00 | 8283 | 8300 | 0655 | 1801 | 7F00 | 0C82 | 7865 |
| 0000657240 | 6563 | 7470 | 6F69 | 5F6E | 6469 | 8200 | 6905 | 616D |
| 0000657260 | 6567 | 0104 | 0001 | 0180 | 0016 | 4079 | 8303 | 0662 |
| 0000657300 | 6383 | 8206 | 280A | 6E75 | 6174 | 6767 | 6465 | 6929 |
| 0000657320 | 0701 | 7A00 | 8373 | 065C | 0082 | 0A01 | 7F00 | 8183 |
| 0000657340 | 8300 | 0081 | 6183 | 0106 | 002F | 827F | 6106 | 7463 |
| 0000657360 | 6F69 | 006E | 1182 | 756E | 5F6D | 666F | 655F | 6378 |
| 0000657400 | 7065 | 6974 | 6E6F | 0273 | 0E82 | 7865 | 6563 | 7470 |
| 0000657420 | 6F69 | 5F6E | 696C | 7473 | 0104 | 0018 | 8579 | 0450 |
| 0000657440 | 8303 | 0665 | 6683 | 8206 | 280A | 6E75 | 6174 | 6767 |
| 0000657460 | 6465 | 6929 | 0A01 | 7F0D | 5583 | 8306 | 0655 | 5583 |
| 0000657500 | 0106 | 001A | 827F | 6906 | 616D | 6567 | 0031 | 0682 |
| 0000657520 | 6D69 | 6761 | 3265 | 822E | 6404 | 6669 | 5C66 | 1801 |
| 0000657540 | 7900 | A085 | 0301 | 6983 | 8306 | 066A | 0A82 | 7528 |
| 0000657560 | 746E | 6761 | 6567 | 2964 | 0169 | 0007 | 737A | 5583 |
| 0000657600 | 8206 | 0100 | 000A | 837F | 0081 | 6883 | 8306 | 0655 |
| 0000657620 | 2601 | 7F00 | 0E82 | 756E | 5F6D | 666F | 735F | 7263 |
| 0000657640 | 6565 | 736E | 8200 | 690A | 616D | 6567 | 6C5F | 7369 |
| 0000657660 | 0274 | 0482 | 6964 | 6666 | 0106 | 0018 | 8579 | 0210 |
| 0000657700 | 8303 | 066C | 6D83 | 8206 | 280A | 6E75 | 6174 | 6767 |
| 0000657720 | 6465 | 6929 | 0A01 | 7F00 | 2C83 | 8302 | 022C | 8183 |
| 0000657740 | 0100 | 0019 | 827F | 6906 | 616D | 6567 | 0031 | 0682 |
| 0000657760 | 6D69 | 6761 | 3265 | 8220 | 6303 | 7475 | 0140 | 0018 |
| 0000660000 | 8579 | 0940 | 8307 | 0672 | 7383 | 8206 | 280A | 6E75 |
| 0000660020 | 6174 | 6767 | 6465 | 6929 | 1801 | 7900 | 0085 | 1D08 |
| 0000660040 | 7083 | 8306 | 0671 | 0A82 | 7528 | 746E | 6761 | 6567 |
| 0000660060 | 2964 | 0169 | 0058 | 837F | 0084 | A383 | 8305 | 0084 |
| 0000660100 | 8483 | 8300 | 05CE | 8183 | 8300 | 04EB | D483 | 8305 |
| 0000660120 | 060A | 7883 | 8305 | 0081 | 5183 | 8306 | 05D7 | 6083 |
| 0000660140 | 8306 | 05EA | 8183 | 8300 | 064D | 5583 | 8306 | 0664 |
| 0000660160 | 6783 | 8306 | 05E0 | 8583 | 8300 | 05DD | 6B83 | 8306 |
| 0000660200 | 05E4 | 9F83 | 8305 | 05FF | 0D83 | 8306 | 0084 | 6F01 |
| 0000660220 | 7F01 | 0A82 | 626B | 5F64 | 7473 | 7461 | 7375 | 8200 |
| 0000660240 | 7409 | 7365 | 5F74 | 616E | 656D | 8200 | 6B08 | 7965 |
| 0000660260 | 635F | 646F | 0065 | 0C82 | 7773 | 7469 | 6863 | 735F |
| 0000660300 | 6174 | 6574 | 8200 | 6C0C | 636F | 7461 | 726F | 645F |
| 0000660320 | 7369 | 0070 | 0E82 | 7274 | 6361 | 696B | 676E | 6C5F |
| 0000660340 | 7665 | 6C65 | 8200 | 730C | 6163 | 656C | 775F | 6E69 |
| 0000660360 | 6F64 | 0077 | 0982 | 7973 | 636E | 6D5F | 646F | 0065 |
| 0000660400 | 0A82 | 6966 | 746C | 7265 | 6D5F | 6773 | 8200 | 6606 |
| 0000660420 | 6C69 | 6574 | 0072 | 0B82 | 7563 | 7272 | 6E65 | 5F74 |
| 0000660440 | 6F61 | 0069 | 0C82 | 6F68 | 6B74 | 7965 | 5F73 | 696C |
| 0000660460 | 7473 | 8200 | 730A | 6E79 | 5F63 | 7665 | 6E65 | 0074 |
| 0000660500 | 0E82 | 7865 | 6563 | 7470 | 6F69 | 5F6E | 696C | 7473 |
| 0000660520 | 8200 | 6510 | 6378 | 5F70 | 7473 | 7461 | 7375 | 6C5F |
| 0000660540 | 7369 | 0074 | 0482 | 6F6D | 6564 | 8200 | 730D | 666F |
| 0000660560 | 6B74 | 7965 | 5F73 | 696C | 7473 | 8200 | 6905 | 616D |
| 0000660600 | 6567 | 8200 | 6307 | 6D6F | 6170 | 6572 | 8200 | 770B |
| 0000660620 | 6961 | 5F74 | 6373 | 6572 | 6E65 | 8200 | 690A | 616D |
| 0000660640 | 6567 | 6C5F | 7369 | 0074 | 0982 | 6D69 | 6761 | 5F65 |
| 0000660660 | 756E | 006D | 0A82 | 6D69 | 6761 | 5F65 | 6964 | 6666 |
| 0000660700 | 8200 | 680B | 6C61 | 5F66 | 6D69 | 6761 | 7365 | 8200 |
| 0000660720 | 6D07 | 7361 | 6173 | 6567 | 8200 | 7006 | 7261 | 6D61 |
| 0000660740 | 0073 | 0882 | 7566 | 636E | 6B5F | 7965 | 8200 | 6908 |

THU MAR 14 17:25:16 1991 CRV_IPS.DLL PAGE 226, LINE 13276

| | | | | | | | | |
|---|---|---|---|---|---|---|---|---|
| 0000660760 | 6F63 | 5F6E | 736D | 0067 | 0582 | 7564 | 6D6D | 0079 |
| 0000661000 | 1601 | 7F00 | 8183 | 8300 | 061D | 8183 | 8300 | 05C5 |
| 0000661020 | 6F83 | 8306 | 0081 | 8583 | 0100 | 005A | 827F | 7306 |
| 0000661040 | 756F | 6372 | 0065 | 0A82 | 736D | 5F67 | 6568 | 6461 |
| 0000661060 | 7265 | 8202 | 650A | 6576 | 746E | 745F | 7079 | 1A65 |
| 0000661100 | 0682 | 6974 | 696D | 676E | 821C | 650B | 6576 | 746E |
| 0000661120 | 765F | 6C61 | 6575 | 8224 | 720C | 7465 | 7275 | 5F6E |
| 0000661140 | 6176 | 756C | 8565 | 0124 | 0982 | 6572 | 7073 | 665F |
| 0000661160 | 616C | 8567 | 0126 | 0101 | 8000 | 1201 | 7900 | 0240 |
| 0000661200 | 7683 | 8306 | 0677 | 0682 | 6261 | 7373 | 6C63 | 0169 |
| 0000661220 | 0007 | 837F | 0088 | 8883 | 0100 | 0009 | 827F | 7801 |
| 0000661240 | 8200 | 7901 | 0104 | 0001 | 0180 | 0001 | 0180 | 0001 |
| 0000661260 | 0180 | 0001 | 0180 | 0001 | 0180 | 0001 | 0180 | 0007 |
| 0000661300 | 737A | 6E83 | 8206 | 0100 | 0001 | 0180 | 0001 | 0180 |
| 0000661320 | 0001 | 0180 | 0001 | 0180 | 0001 | 0180 | 0001 | 0180 |
| * | | | | | | | | |
| 0000661700 | 0016 | 5079 | 8303 | 06BE | BF83 | 8206 | 280A | 6E75 |
| 0000661720 | 6174 | 6767 | 6465 | 6929 | 0A01 | 7F00 | 8683 | 8300 |
| 0000661740 | 0086 | 8583 | 0100 | 0022 | 827F | 6D07 | 6773 | 705F |
| 0000661760 | 7274 | 8200 | 6D08 | 6773 | 735F | 7A69 | 0465 | 0982 |
| 0000662000 | 616C | 6579 | 5F72 | 756E | 086D | 0101 | 8000 | 0101 |
| 0000662020 | 8000 | 0101 | 8000 | 0101 | 8000 | 0101 | 8000 | 0101 |
| * | | | | | | | | |
| 0000662220 | 8000 | 0101 | 8000 | 1601 | 7900 | 0550 | E483 | 8306 |
| 0000662240 | 06E5 | 0A82 | 7528 | 746E | 6761 | 6567 | 2964 | 0169 |
| 0000662260 | 0010 | 837F | 0081 | 8183 | 8300 | 0081 | 8183 | 8300 |
| 0000662300 | 0081 | 2C01 | 7F00 | 0582 | 6C78 | 6665 | 0074 | 0482 |
| 0000662320 | 7479 | 706F | 8202 | 7806 | 6972 | 6867 | 0474 | 0582 |
| 0000662340 | 6479 | 776F | 066E | 0882 | 616D | 6B73 | 625F | 7469 |
| 0000662360 | 0108 | 0001 | 0180 | 0001 | 0180 | 0001 | 0180 | 0001 |
| 0000662400 | 0180 | 0001 | 0180 | 0001 | 0180 | 0016 | 4079 | 8304 |
| 0000662420 | 06ED | EE83 | 8206 | 280A | 6E75 | 6174 | 6767 | 6465 |
| 0000662440 | 6929 | 0D01 | 7F00 | 8183 | 8300 | 0081 | 8183 | 8300 |
| 0000662460 | 0081 | 1501 | 7F00 | 0282 | 3178 | 8200 | 7902 | 0231 |
| 0000662500 | 0282 | 3278 | 8204 | 7902 | 0632 | 1801 | 7900 | 8085 |
| 0000662520 | 0800 | F083 | 8306 | 06F1 | 0A82 | 7528 | 746E | 6761 |
| 0000662540 | 6567 | 2964 | 0169 | 0019 | 837F | 0081 | 8183 | 8300 |
| 0000662560 | 0081 | 8183 | 8300 | 0081 | 8183 | 8300 | 0081 | 8183 |
| 0000662600 | 0100 | 0043 | 827F | 7706 | 6469 | 6874 | 0031 | 0782 |
| 0000662620 | 6568 | 6769 | 7468 | 0231 | 0582 | 656C | 7466 | 0431 |
| 0000662640 | 0382 | 7075 | 0631 | 0682 | 6977 | 7464 | 3268 | 8208 |
| 0000662660 | 6807 | 6965 | 6867 | 3274 | 820A | 6C05 | 6665 | 3274 |
| 0000662700 | 820C | 7503 | 3270 | 010E | 0018 | 8579 | 00B0 | 8304 |
| 0000662720 | 06F6 | F783 | 8206 | 280A | 6E75 | 6174 | 6767 | 6465 |
| 0000662740 | 6929 | 1801 | 7900 | 8085 | 0300 | F483 | 8306 | 06F5 |
| 0000662760 | 0A82 | 7528 | 746E | 6761 | 6567 | 2964 | 0169 | 000A |
| 0000663000 | 837F | 06EC | EF83 | 8306 | 06E3 | 2401 | 7F00 | 0982 |
| 0000663020 | 7264 | 6761 | 635F | 7372 | 0072 | 0B82 | 7264 | 6761 |
| 0000663040 | 665F | 6C69 | 6574 | 0072 | 0682 | 6966 | 746C | 7265 |
| 0000663060 | 0100 | 000D | 837F | 06F3 | 8583 | 8300 | 0085 | 8583 |
| 0000663100 | 0100 | 002B | 827F | 640A | 6172 | 5F67 | 7665 | 6E65 |
| 0000663120 | 0074 | 0482 | 6F6D | 6564 | 8210 | 6707 | 5F70 | 6C66 |
| 0000663140 | 6761 | 8212 | 6809 | 736F | 5F74 | 6C66 | 6761 | 0114 |
| 0000663160 | 000A | 8075 | 8183 | 6400 | 8301 | 06F9 | 0401 | 7F00 |
| 0000663200 | F283 | 0106 | 000A | 8075 | 8183 | 6400 | 8301 | 06FB |
| 0000663220 | 0401 | 7F00 | 8883 | 0100 | 0004 | 837F | 0582 | 0A01 |
| 0000663240 | 7500 | 8380 | 0081 | 0164 | FC83 | 0106 | 0004 | 837F |
| 0000663260 | 0582 | 0A01 | 7500 | 8380 | 0081 | 0164 | FE83 | 0106 |
| 0000663300 | 0007 | 837F | 0582 | 8283 | 0105 | 000A | 8075 | 8183 |

THU MAR 14 17:25:16 1991 CRV_IPS.DLL PAGE 227, LINE 13335

```
0000663320  6400  8302  0700  1001  7F00  8283  8305  0081
0000663340  8183  8300  0081  8183  0100  000A  8075  8183
0000663360  6400  8305  0702  0D01  7F00  8283  8305  0081
0000663400  8183  8300  0081  0A01  7500  8380  0081  0464
0000663420  0483  0107  000A  837F  00C1  C183  8300  067E
0000663440  0A01  7500  8380  0081  0364  0683  0107  0007
0000663460  837F  0081  8183  0100  000A  8075  8183  6400
0000663500  8302  0708  0701  7F00  8183  8300  0081  0A01
0000663520  7500  8380  0081  0264  0A83  0107  000D  837F
0000663540  0081  8183  8300  0081  8183  0100  000A  8075
0000663560  8183  6400  8304  070C  0401  7F00  8283  0105
0000663600  000A  8075  8183  6400  8301  070E  0401  7F00
0000663620  F283  0106  000A  8075  8183  6400  8301  0710
0000663640  0701  7800  C885  8300  0080  0A01  7500  8380
0000663660  0081  0064  0183  0102  000A  8075  8183  6400
0000663700  8300  0201  0701  7F00  E083  8304  0675  0A01
0000663720  7500  8380  0081  0264  1583  0107  0004  837F
0000663740  0088  0A01  7500  8380  0081  0164  1783  0107
0000663760  0004  837F  0088  0A01  7500  8380  0081  0164
0000664000  1983  0107  000A  8075  0083  6402  8300  0201
0000664020  0A01  7500  8380  0200  0064  0183  0102  0007
0000664040  837F  0582  0083  0100  000A  8075  8183  6400
0000664060  8302  071D  0A01  7500  8380  0081  0064  0183
0000664100  0102  000A  8075  8583  6400  8300  0201  0101
0000664120  8000  0101  8000  0101  8000  0101  8000  0101
*
0000664360  8000  0101  8000  0101  8000  0101  8000  0701
0000664400  7800  0085  8301  0080  0101  8000  0101  8000
0000664420  0101  8000  0101  8000  0101  8000  0101  8000
*
0000670420  0101  8000  0101  8000  0101  8000  0A01  7500
0000670440  8380  0081  0064  0183  0102  0001  0180  0001
0000670460  0180  0001  0180  0001  0180  0001  0180  0001
*
0000670760  0180  0001  0180  0007  737A  6783  8204  0100
0000671000  000A  8075  8183  6400  8300  0201  0101  8000
0000671020  0101  8000  0101  8000  0101  8000  0101  8000
*
0000672060  0101  8000  0101  8000  1601  7900  0220  F483
0000672100  8304  04F5  0A82  7528  746E  6761  6567  2964
0000672120  0169  0007  837F  0081  8183  0100  0009  827F
0000672140  7801  8200  7901  0102  0016  4079  8302  04F7
0000672160  F883  8204  280A  6E75  6174  6767  6465  6929
0000672200  0701  7F00  F383  8304  04F3  0D01  7F00  0382
0000672220  696D  006E  0382  616D  0478  0101  8000  1601
0000672240  7900  0220  FB83  8304  04FC  0A82  7528  746E
0000672260  6761  6567  2964  0169  0007  837F  0085  8583
0000672300  0100  0012  827F  7705  6469  6874  8200  6806
0000672320  6965  6867  0274  0101  8000  1601  7900  0240
0000672340  FF83  8304  0500  0A82  7528  746E  6761  6567
0000672360  2964  0169  0007  837F  04F3  FA83  0104  0011
0000672400  827F  6F06  6972  6967  006E  0482  7261  6165
0000672420  0104  0001  0180  0001  0180  0001  0180  0001
0000672440  0180  0001  0180  0001  0180  0001  0180  0001
*
0000672700  0180  0001  0180  0016  3079  8303  052F  3083
0000672720  8205  280A  6E75  6174  6767  6465  6929  0A01
0000672740  7F00  8583  8300  0085  8583  0100  001A  827F
0000672760  7705  6469  6874  8200  6806  6965  6867  0274
```

THU MAR 14 17:25:16 1991 CRV_IPS.DLL PAGE 228, LINE 13394

```
0000673000  0582  6564  7470  0468  1801  7900  4085  0801
0000673020  3383  8305  0534  0A82  7528  746E  6761  6567
0000673040  2964  0169  0007  8578  0080  8483  0100  0019
0000673060  837F  0081  2E83  8305  0085  8583  8300  00C4
0000673100  8283  8300  00E4  3283  0105  005A  827F  7206
0000673120  7065  6572  0073  0682  6964  656D  736E  8202
0000673140  6410  7461  5F61  616C  6579  5F72  6564  7470
0000673160  0868  0882  6973  5F67  6973  657A  820A  7307
0000673200  6769  705F  7274  820C  6209  6D74  5F70  6973
0000673220  657A  8210  6208  6D74  5F70  7470  1472  0582
0000673240  7073  7261  1865  0101  8000  1801  7900  A085
0000673260  0C05  3883  8305  0539  0A82  7528  746E  6761
0000673300  6567  2964  0169  0007  8578  0180  8483  0100
0000673320  0025  837F  0086  2C83  8302  022C  8683  8300
0000673340  0081  8583  8300  0086  8283  8300  0086  F383
0000673360  8304  0531  3783  0105  007E  827F  6902  0064
0000673400  0482  616E  656D  8204  6609  6C69  5F65  616E
0000673420  656D  8224  6509  7078  745F  5F63  6469  8244
0000673440  7404  7079  4865  0C82  6572  5F66  696C  656E
0000673460  6E5F  6D75  824A  7209  6665  745F  5F63  6469
0000673500  824C  740A  6D69  5F65  7473  6D61  5070  0682
0000673520  6F61  5F69  6469  8254  6C08  636F  7461  6F69
0000673540  586E  0982  7462  706D  695F  666E  5C6F  0582
0000673560  7073  7261  8565  0084  0101  8000  0101  8000
0000673600  0101  8000  0101  8000  0101  8000  0101  8000
*
0000673640  0701  7A00  8373  0536  0082  0101  8000  0101
0000673660  8000  0101  8000  0101  8000  0101  8000  0101
*
0000674020  8000  0701  7A00  8373  00E4  0082  0101  8000
0000674040  0101  8000  0101  8000  0101  8000  0101  8000
*
0000674300  0101  8000  0101  8000  1801  7900  C085  0702
0000674320  8D83  8305  058E  0A82  7528  746E  6761  6567
0000674340  2964  0169  0007  8578  0120  8483  0100  0016
0000674360  837F  0086  2C83  8302  04F6  8183  8300  0081
0000674400  8283  8300  058C  3801  7F00  0282  6469  8200
0000674420  6E04  6D61  0465  0482  6572  7463  8224  6104
0000674440  7474  2C72  0582  7564  6D6D  2E79  0A82  6974
0000674460  656D  735F  6174  706D  8230  7305  6170  6572
0000674500  0134  0001  0180  0001  0180  0001  0180  0001
0000674520  0180  0001  0180  0001  0180  0001  0180  0001
*
0000674760  0180  0001  0180  0001  0180  0001  0180  0018
0000675000  8579  0110  8311  05BF  C083  8205  280A  6E75
0000675020  6174  6767  6465  6929  3401  7F00  8583  8300
0000675040  0085  8583  8300  0085  8583  8300  0085  8183
0000675060  8300  0085  8583  8300  0085  8483  8300  0085
0000675100  8583  8300  0085  8583  8300  0085  8583  0100
0000675120  0106  827F  7409  6D69  5F65  6E75  7469  8200
0000675140  6D0F  6E69  725F  6365  726F  5F64  6974  656D
0000675160  8202  7309  6174  6962  696C  7974  8204  630F
0000675200  7061  7574  6572  745F  6D69  6F65  7475  8206
0000675220  6B0A  7965  665F  726F  616D  0874  1382  6F63
0000675240  746E  6E69  6F75  7375  745F  6172  6B63  6E69
0000675260  0A67  0E82  6F6D  7375  5F65  7274  6361  696B
0000675300  676E  820C  6311  7061  7574  6572  735F  6769
0000675320  616E  7574  6572  820E  680B  746F  656B  5F79
0000675340  7973  636E  8210  640C  6665  7561  746C  745F
```

```
THU MAR 14 17:25:16 1991  CRV_IPS.DLL  PAGE 229, LINE 13453

0000675360  6D69  1265  0982  616D  5F78  6564  616C  1479
0000675400  0B82  6166  7473  725F  7065  616C  1679  0E82
0000675420  6576  6972  7966  745F  6D69  6F65  7475  8218
0000675440  770C  6961  5F74  6974  656D  756F  1A74  0C82
0000675460  7973  636E  745F  6D69  6F65  7475  821C  7409
0000675500  7268  7365  6F68  646C  821E  630C  6568  6B63
0000675520  6C5F  6F6F  756B  2070  0101  8000  0701  7800
0000675540  0085  8308  0080  0101  8000  0101  8000  0101
0000675560  8000  0101  8000  0101  8000  0101  8000  0101
*
0000675740  8000  0101  8000  0101  8000  1601  7900  0240
0000675760  E583  8305  05E6  0A82  7528  746E  6761  6567
0000676000  2964  0169  0007  837F  0082  8283  0100  0017
0000676020  827F  6408  6665  745F  6D69  0065  0882  696D
0000676040  5F6E  6974  656D  0104  0001  0180  0001  0180
0000676060  0001  0180  0001  0180  0001  0180  0001  0180
0000676100  0016  4079  8304  05EE  EF83  8205  280A  6E75
0000676120  6174  6767  6465  6929  0D01  7F00  8483  8300
0000676140  0084  8483  8300  04F3  2901  7F00  0782  6261
0000676160  5F73  6572  006C  0582  6E75  7469  0173  0C82
0000676200  7073  6365  6169  5F6C  7566  636E  8202  6404
0000676220  7369  0470  0101  8000  0101  8000  0101  8000
0000676240  1601  7900  0220  F483  8305  05F5  0A82  7528
0000676260  746E  6761  6567  2964  0169  0007  837F  0081
0000676300  8183  0100  001E  827F  7309  6E79  5F63  6F6D
0000676320  6564  8200  730E  6E79  5F63  7865  6365  6D5F
0000676340  646F  0265  1601  7900  0230  F783  8305  05F8
0000676360  0A82  7528  746E  6761  6567  2964  0169  0007
0000676400  837F  0082  8183  0100  0019  827F  7407  6365
0000676420  5F68  6469  8200  740B  6365  5F68  6572  7361
0000676440  6E6F  0104  0001  0180  0001  0180  0001  0180
0000676460  0018  8579  0220  8303  05FD  FE83  8205  280A
0000676500  6E75  6174  6767  6465  6929  0A01  7F00  2C83
0000676520  8302  022C  8683  0100  001A  827F  6905  616D
0000676540  6567  8200  6404  6669  2066  0782  6964  6666
0000676560  695F  4064  1801  7900  1085  0203  0183  8306
0000676600  0602  0A82  7528  746E  6761  6567  2964  0169
0000676620  0007  8578  0300  2C83  0102  0007  837F  0085
0000676640  0083  0106  0024  827F  6E0E  6D75  6F5F  5F66
0000676660  6373  6572  6E65  0073  0F82  6D69  6761  5F65
0000676700  616E  656D  6C5F  7369  0274  1601  7900  0120
0000676720  0483  8306  0605  0A82  7528  746E  6761  6567
0000676740  2964  0169  0004  837F  00C0  0A01  7F00  0682
0000676760  7473  6972  676E  0100  0001  0180  0001  0180
0000677000  0001  0180  0016  3079  8302  060A  0B83  8206
0000677020  280A  6E75  6174  6767  6465  6929  0701  7F00
0000677040  8283  8300  0081  1E01  7F00  0C82  7865  6563
0000677060  7470  6F69  5F6E  6469  8200  650B  6378  5F70
0000677100  7473  7461  7375  0104  0016  2079  8302  0610
0000677120  1183  8206  280A  6E75  6174  6767  6465  6929
0000677140  1601  7900  0208  0E83  8306  060F  0A82  7528
0000677160  746E  6761  6567  2964  0169  0007  837F  0084
0000677200  8483  0100  001B  827F  6B08  7965  635F  646F
0000677220  0065  0C82  7773  7469  6863  735F  6174  6574
0000677240  0100  0007  837F  0081  0D83  0106  0018  827F
0000677260  6B08  7965  745F  7079  0065  0982  656B  5F79
0000677300  6176  756C  0265  1801  7900  3085  0402  1483
0000677320  8306  0615  0A82  7528  746E  6761  6567  2964
0000677340  0169  0007  8578  0200  0C83  0106  000D  837F
```

THU MAR 14 17:25:16 1991 CRV_IPS.DLL PAGE 230, LINE 13512

| | | | | | | | | |
|---|---|---|---|---|---|---|---|---|
| 0000677360 | 0085 | 1383 | 8306 | 0081 | 8183 | 0100 | 002E | 827F |
| 0000677400 | 7308 | 7165 | 735F | 7A69 | 0065 | 0382 | 6573 | 0271 |
| 0000677420 | 0882 | 656B | 5F79 | 7461 | 7274 | 8242 | 610E | 7463 |
| 0000677440 | 7669 | 7461 | 6465 | 665F | 6E75 | 4463 | 0101 | 8000 |
| 0000677460 | 0101 | 8000 | 0101 | 8000 | 0101 | 8000 | 0101 | 8000 |
| 0000677500 | 0101 | 8000 | 0101 | 8000 | 0101 | 8000 | 1601 | 7900 |
| 0000677520 | 0220 | 1F83 | 8306 | 0620 | 0A82 | 7528 | 746E | 6761 |
| 0000677540 | 6567 | 2964 | 0169 | 0007 | 837F | 0081 | 8183 | 0100 |
| 0000677560 | 0017 | 827F | 6B08 | 7965 | 615F | 7474 | 0072 | 0882 |
| 0000677600 | 7566 | 636E | 6B5F | 7965 | 0102 | 0018 | 8579 | 0210 |
| 0000677620 | 8302 | 0622 | 2383 | 8206 | 280A | 6E75 | 6174 | 6767 |
| 0000677640 | 6465 | 6929 | 0701 | 7F00 | 8583 | 8300 | 0613 | 1201 |
| 0000677660 | 7F00 | 0882 | 6573 | 5F71 | 6973 | 657A | 8200 | 7303 |
| 0000677700 | 7165 | 0102 | 0001 | 0180 | 0001 | 0180 | 0001 | 0180 |
| 0000677720 | 0001 | 0180 | 0001 | 0180 | 0018 | 8579 | 02D0 | 8302 |
| 0000677740 | 062A | 2B83 | 8206 | 280A | 6E75 | 6174 | 6767 | 6465 |
| 0000677760 | 6929 | 0701 | 7F00 | 8B83 | 8305 | 0081 | 1101 | 7F00 |
| 0000700000 | 0682 | 6966 | 746C | 7265 | 8200 | 6D04 | 646F | 5865 |
| 0000700020 | 1801 | 7900 | 5085 | 0501 | 2D83 | 8306 | 062E | 0A82 |
| 0000700040 | 7528 | 746E | 6761 | 6567 | 2964 | 0169 | 0010 | 837F |
| 0000700060 | 022C | 8683 | 8300 | 0081 | 8183 | 8300 | 0081 | 2B01 |
| 0000700100 | 7F00 | 0482 | 616E | 656D | 8200 | 6C06 | 6269 | 695F |
| 0000700120 | 2064 | 0582 | 6C63 | 7361 | 2473 | 0582 | 7473 | 6C79 |
| 0000700140 | 2665 | 0782 | 706F | 635F | 646F | 2865 | 0101 | 8000 |
| 0000700160 | 0101 | 8000 | 0101 | 8000 | 1B01 | 7900 | 0920 | 3383 |
| 0000700200 | 8306 | 0634 | 0F82 | 5F69 | 5F75 | 736D | 5F67 | 6170 |
| 0000700220 | 6172 | 5F6D | 6974 | 1C01 | 7F00 | 8183 | 8300 | 0085 |
| 0000700240 | 8283 | 8300 | 0086 | 8883 | 8300 | 0080 | 8483 | 8300 |
| 0000700260 | 00C0 | C083 | 0100 | 006A | 827F | 6909 | 755F | 735F |
| 0000700300 | 6F68 | 7472 | 8200 | 690A | 755F | 755F | 6873 | 726F |
| 0000700320 | 0074 | 0882 | 5F69 | 5F75 | 6F6C | 676E | 8200 | 6909 |
| 0000700340 | 755F | 755F | 6F6C | 676E | 8200 | 6909 | 755F | 665F |
| 0000700360 | 6F6C | 7461 | 8200 | 6908 | 755F | 635F | 6168 | 0072 |
| 0000700400 | 0982 | 5F69 | 5F75 | 6375 | 6168 | 0072 | 0782 | 5F69 |
| 0000700420 | 5F75 | 7473 | 0072 | 0982 | 5F69 | 5F75 | 6C62 | 636F |
| 0000700440 | 006B | 1901 | 7900 | 0230 | 3683 | 8306 | 0637 | 0D82 |
| 0000700460 | 5F69 | 736D | 5F67 | 6170 | 6172 | 5F6D | 6974 | 0701 |
| 0000700500 | 7F00 | 8583 | 8300 | 0632 | 1001 | 7F00 | 0482 | 7974 |
| 0000700520 | 6570 | 8200 | 7605 | 6C61 | 6575 | 0102 | 0001 | 0180 |
| 0000700540 | 001C | 8579 | 0090 | 8309 | 063A | 3B83 | 8206 | 690E |
| 0000700560 | 6D5F | 6773 | 685F | 6165 | 6564 | 5F72 | 6974 | 1C01 |
| 0000700600 | 7F00 | 8183 | 8300 | 0081 | 8583 | 8300 | 0085 | 8483 |
| 0000700620 | 8300 | 0085 | 8583 | 8300 | 0081 | 8583 | 0100 | 0047 |
| 0000700640 | 827F | 7104 | 695F | 0064 | 0682 | 6F73 | 7275 | 6563 |
| 0000700660 | 8202 | 7003 | 6469 | 8204 | 7403 | 6469 | 8206 | 7204 |
| 0000700700 | 7365 | 0870 | 0882 | 6572 | 7073 | 745F | 6469 | 820A |
| 0000700720 | 6F07 | 5F70 | 6F63 | 6564 | 820C | 7404 | 7079 | 0E65 |
| 0000700740 | 0482 | 6973 | 657A | 0110 | 0015 | 8579 | 00C0 | 8302 |
| 0000700760 | 063E | 3F83 | 8206 | 6907 | 6D5F | 6773 | 745F | 0169 |
| 0000701000 | 0005 | 3078 | 3583 | 0106 | 0007 | 837F | 0639 | 3D83 |
| 0000701020 | 0106 | 0017 | 827F | 6806 | 6165 | 6564 | 0072 | 0A82 |
| 0000701040 | 6170 | 6172 | 5F6D | 696C | 7473 | 0112 | 0001 | 0180 |
| 0000701060 | 0001 | 0180 | 0001 | 0180 | 0001 | 0180 | 0001 | 0180 |
| * | | | | | | | | |
| 0000701240 | 0001 | 0180 | 0001 | 0180 | 0001 | 0180 | 0016 | 3079 |
| 0000701260 | 8303 | 0661 | 6283 | 8206 | 280A | 6E75 | 6174 | 6767 |
| 0000701300 | 6465 | 6929 | 0A01 | 7F00 | 8583 | 8300 | 0085 | 8583 |
| 0000701320 | 0100 | 0022 | 827F | 7309 | 7263 | 6565 | 5F6E | 6762 |
| 0000701340 | 8200 | 6907 | 6F63 | 5F6E | 6762 | 8202 | 6808 | 5F70 |

THU MAR 14 17:25:16 1991 CRV_IPS.DLL PAGE 231, LINE 13571

| | | | | | | | | |
|---|---|---|---|---|---|---|---|---|
| 0000701360 | 7263 | 736F | 0473 | 1801 | 7900 | B085 | 1001 | 6483 |
| 0000701400 | 8306 | 0665 | 0A82 | 7528 | 746E | 6761 | 6567 | 2964 |
| 0000701420 | 0169 | 0031 | 837F | 0081 | 8583 | 8300 | 0085 | 8583 |
| 0000701440 | 8300 | 0085 | 8683 | 8300 | 0086 | 8683 | 8300 | 0086 |
| 0000701460 | 8683 | 8300 | 0086 | 2E83 | 8305 | 0085 | 6083 | 8306 |
| 0000701500 | 0086 | 8583 | 0100 | 00E8 | 827F | 6403 | 7665 | 8200 |
| 0000701520 | 7409 | 7268 | 7365 | 6F68 | 646C | 8202 | 6212 | 696C |
| 0000701540 | 6B6E | 6E69 | 5F67 | 6874 | 6572 | 6873 | 6C6F | 0464 |
| 0000701560 | 1282 | 7265 | 5F72 | 6C65 | 6D65 | 745F | 7268 | 7365 |
| 0000701600 | 6F68 | 646C | 8206 | 6512 | 6378 | 5F70 | 7265 | 5F72 |
| 0000701620 | 6874 | 6572 | 6873 | 6C6F | 0864 | 0982 | 7473 | 6261 |
| 0000701640 | 6C69 | 7469 | 0A79 | 0882 | 6974 | 656D | 6F5F | 7475 |
| 0000701660 | 820E | 730D | 6E79 | 5F63 | 6974 | 656D | 6F5F | 7475 |
| 0000701700 | 8212 | 7406 | 7473 | 695F | 1664 | 0B82 | 6964 | 6666 |
| 0000701720 | 745F | 7473 | 695F | 1A64 | 0D82 | 6170 | 6572 | 746E |
| 0000701740 | 745F | 7473 | 695F | 1E64 | 0682 | 6964 | 656D | 736E |
| 0000701760 | 8222 | 6410 | 7461 | 5F61 | 616C | 6579 | 5F72 | 6564 |
| 0000702000 | 7470 | 2868 | 0C82 | 6369 | 6E6F | 635F | 6C6F | 756F |
| 0000702020 | 7372 | 822A | 610D | 696F | 785F | 726F | 635F | 6C6F |
| 0000702040 | 726F | 8230 | 690A | 746E | 7265 | 616C | 6563 | 3464 |
| 0000702060 | 0101 | 8000 | 0101 | 8000 | 0101 | 8000 | 0101 | 8000 |
| 0000702100 | 0101 | 8000 | 0101 | 8000 | 1601 | 7900 | 0340 | 6E83 |
| 0000702120 | 8306 | 066F | 0A82 | 7528 | 746E | 6761 | 6567 | 2964 |
| 0000702140 | 0169 | 0007 | 737A | 1283 | 8206 | 0100 | 000A | 837F |
| 0000702160 | 0081 | 8183 | 8300 | 066D | 2B01 | 7F00 | 0682 | 6361 |
| 0000702200 | 6974 | 6E6F | 8200 | 6E0F | 6D75 | 6F5F | 5F66 | 6F73 |
| 0000702220 | 7466 | 656B | 7379 | B202 | 730C | 666F | 6B74 | 7965 |
| 0000702240 | 5F73 | 7470 | 0472 | 1601 | 7900 | 0340 | 7283 | 8306 |
| 0000702260 | 0673 | 0A82 | 7528 | 746E | 6761 | 6567 | 2964 | 0169 |
| 0000702300 | 0007 | 737A | 2183 | 8206 | 0100 | 000A | 837F | 0081 |
| 0000702320 | 8183 | 8300 | 0671 | 2901 | 7F00 | 0682 | 6361 | 6974 |
| 0000702340 | 6E6F | 8200 | 6E0E | 6D75 | 6F5F | 5F66 | 6F68 | 6B74 |
| 0000702360 | 7965 | 0273 | 0B82 | 6F68 | 6B74 | 7965 | 5F73 | 7470 |
| 0000702400 | 0472 | 1801 | 7900 | 7085 | 0501 | 7583 | 8306 | 0676 |
| 0000702420 | 0A82 | 7528 | 746E | 6761 | 6567 | 2964 | 0169 | 0010 |
| 0000702440 | 837F | 022C | 8683 | 8300 | 0544 | E483 | 8300 | 0085 |
| 0000702460 | 3D01 | 7F00 | 0A82 | 6D69 | 6761 | 5F65 | 616E | 656D |
| 0000702500 | 8200 | 6908 | 616D | 6567 | 695F | 2064 | 0982 | 6D69 |
| 0000702520 | 6761 | 5F65 | 7470 | 2472 | 0982 | 616C | 6579 | 5F72 |
| 0000702540 | 7470 | 2872 | 0982 | 6D69 | 6761 | 5F65 | 6468 | 2C6C |
| 0000702560 | 0101 | 8000 | 0101 | 8000 | 0101 | 8000 | 0101 | 8000 |
| 0000702600 | 1801 | 7900 | 9085 | 0201 | 7C83 | 8306 | 067D | 0A82 |
| 0000702620 | 7528 | 746E | 6761 | 6567 | 2964 | 0169 | 0007 | 837F |
| 0000702640 | 0082 | 7483 | 0106 | 0018 | 827F | 650C | 6378 | 7065 |
| 0000702660 | 6974 | 6E6F | 695F | 0064 | 0582 | 6D69 | 6761 | 0465 |
| 0000702700 | 0101 | 8000 | 1601 | 7900 | 0340 | 8183 | 8306 | 0682 |
| 0000702720 | 0A82 | 7528 | 746E | 6761 | 6567 | 2964 | 0169 | 0007 |
| 0000702740 | 737A | 7B83 | 8206 | 0100 | 000A | 837F | 0081 | 8183 |
| 0000702760 | 8300 | 0680 | 2F01 | 7F00 | 0682 | 6361 | 6974 | 6E6F |
| 0000703000 | 8200 | 6E11 | 6D75 | 6F5F | 5F66 | 7865 | 6563 | 7470 |
| 0000703020 | 6F69 | 736E | 8202 | 650E | 6378 | 7065 | 6974 | 6E6F |
| 0000703040 | 6C5F | 7369 | 0474 | 1801 | 7900 | 5085 | 0304 | 8483 |
| 0000703060 | 8306 | 0685 | 0A82 | 7528 | 746E | 6761 | 6567 | 2964 |
| 0000703100 | 0169 | 000A | 837F | 0674 | 7483 | 8306 | 0674 | 1A01 |
| 0000703120 | 7F00 | 0682 | 6D69 | 6761 | 3165 | 8200 | 6906 | 616D |
| 0000703140 | 6567 | 2E32 | 0482 | 6964 | 6666 | 015C | 0018 | 8579 |
| 0000703160 | 01A0 | 8303 | 0688 | 8983 | 8206 | 280A | 6E75 | 6174 |
| 0000703200 | 6767 | 6465 | 6929 | 0701 | 7A00 | 8373 | 0674 | 0082 |
| 0000703220 | 0A01 | 7F00 | 8183 | 8300 | 0687 | 7483 | 0106 | 0026 |

```
THU MAR 14 17:25:16 1991  CRV_IPS.DLL  PAGE 232, LINE 13630

0000703240  827F  6E0E  6D75  6F5F  5F66  6373  6572  6E65
0000703260  0073  0A82  6D69  6761  5F65  696C  7473  8202
0000703300  6404  6669  0666  1801  7900  1085  0302  8B83
0000703320  8306  068C  0A82  7528  746E  6761  6567  2964
0000703340  0169  000A  837F  022C  2C83  8302  0081  1901
0000703360  7F00  0682  6D69  6761  3165  8200  6906  616D
0000703400  6567  2032  0382  7563  4074  1801  7900  4085
0000703420  0709  9183  8306  0692  0A82  7528  746E  6761
0000703440  6567  2964  0169  0018  8579  0800  831D  068F
0000703460  9083  8206  280A  6E75  6174  6767  6465  6929
0000703500  5801  7F00  8483  8300  05C2  8483  8300  0084
0000703520  ED83  8305  0081  FE83  8304  05F3  2983  8306
0000703540  058B  8183  8300  0670  F683  8305  067F  0983
0000703560  8306  0081  6C83  8306  0674  8383  8306  0686
0000703600  FF83  8305  0085  FC83  8305  068A  0383  8306
0000703620  05BE  1E83  8306  062C  8483  0100  016F  827F
0000703640  6B0A  6462  735F  6174  7574  0073  0982  6574
0000703660  7473  6E5F  6D61  0065  0882  656B  5F79  6F63
0000703700  6564  8200  730C  6977  6374  5F68  7473  7461
0000703720  0065  0C82  6F6C  6163  6F74  5F72  6964  7073
0000703740  8200  740E  6172  6B63  6E69  5F67  656C  6576
0000703760  006C  0C82  6373  6C61  5F65  6977  646E  776F
0000704000  8200  7309  6E79  5F63  6F6D  6564  8200  660A
0000704020  6C69  6574  5F72  736D  0067  0682  6966  746C
0000704040  7265  8200  630B  7275  6572  746E  615F  696F
0000704060  8200  680C  746F  656B  7379  6C5F  7369  0074
0000704100  0A82  7973  636E  655F  6576  746E  8200  650E
0000704120  6378  7065  6974  6E6F  6C5F  7369  0074  1082
0000704140  7865  7063  735F  6174  7574  5F73  696C  7473
0000704160  8200  6D04  646F  0065  0D82  6F73  7466  656B
0000704200  7379  6C5F  7369  0074  0582  6D69  6761  0065
0000704220  0782  6F63  706D  7261  0065  0B82  6177  7469
0000704240  735F  7263  6565  006E  0A82  6D69  6761  5F65
0000704260  696C  7473  8200  6909  616D  6567  6E5F  6D75
0000704300  8200  690A  616D  6567  645F  6669  0066  0B82
0000704320  6168  666C  695F  616D  6567  0073  0782  616D
0000704340  7373  6761  0065  0682  6170  6172  736D  8200
0000704360  6608  6E75  5F63  656B  0079  0882  6369  6E6F
0000704400  6D5F  6773  8200  6405  6D75  796D  0100  0016
0000704420  837F  0081  3C83  8306  0081  E483  8305  068E
0000704440  8183  8300  0085  5A01  7F00  0682  6F73  7275
0000704460  6563  8200  6D0A  6773  685F  6165  6564  0272
0000704500  0A82  7665  6E65  5F74  7974  6570  821A  7406
0000704520  6D69  6E69  1C67  0B82  7665  6E65  5F74  6176
0000704540  756C  2465  0C82  6572  7574  6E72  765F  6C61
0000704560  6575  2485  8201  7209  7365  5F70  6C66  6761
0000704600  2685  0101  0001  0180  0001  0180  0001  0180
0000704620  0001  0180  0007  737A  8D83  8206  0100  0001
0000704640  0180  0001  0180  0001  0180  0001  0180  0001
*
0000705020  0180  0001  0180  0016  5079  8303  06B7  B883
0000705040  8206  280A  6E75  6174  6767  6465  6929  0A01
0000705060  7F00  8683  8300  0086  8583  0100  0022  827F
0000705100  6D07  6773  705F  7274  8200  6D08  6773  735F
0000705120  7A69  0465  0982  616C  6579  5F72  756E  086D
0000705140  0101  8000  1601  7900  0440  BB83  8306  06BC
0000705160  0A82  7528  746E  6761  6567  2964  0169  000D
0000705200  837F  0085  8583  8300  0085  8583  0100  0023
0000705220  827F  650A  656C  5F6D  6F63  6E75  0074  0482
```

THU MAR 14 17:25:16 1991 CRV_IPS.DLL PAGE 233, LINE 13689

```
0000705240   756A  706D  8202  7305  6174  7472  8204  6503
0000705260   646E  0106  0001  0180  0001  0180  0001  0180
0000705300   0018  8579  0240  8302  06C5  C683  8206  280A
0000705320   6E75  6174  6767  6465  6929  1801  7900  0085
0000705340   0302  C383  8306  06C4  0A82  7528  746E  6761
0000705360   6567  2964  0169  0007  8578  0200  8583  0100
0000705400   000A  837F  06C2  C283  8306  06C2  1B01  7F00
0000705420   0682  6863  736B  6D75  8200  6506  7272  6E63
0000705440   0074  0582  7263  3363  0032  0701  7F00  BA83
0000705460   8306  06C1  1C01  7F00  0B82  6F68  6972  5F7A
0000705500   6170  6172  006D  0A82  7473  6972  5F70  6164
0000705520   6174  0108  0018  8579  4080  8303  06CC  CD83
0000705540   8206  280A  6E75  6174  6767  6465  6929  1801
0000705560   7900  0085  0340  CA83  8306  06CB  0A82  7528
0000705600   746E  6761  6567  2964  0169  0007  8578  4000
0000705620   C283  0106  000A  837F  06C9  C983  8306  06C9
0000705640   1B01  7F00  0682  6863  736B  6D75  8200  6506
0000705660   7272  6E63  0074  0582  7263  3363  0032  0A01
0000705700   7F00  BA83  8306  06BA  C883  0106  0027  827F
0000705720   680B  726F  7A69  705F  7261  6D61  8200  760A
0000705740   7265  5F74  6170  6172  086D  0882  6973  5F67
0000705760   6164  6174  0110  0001  0180  0001  0180  0001
0000706000   0180  0005  3078  8583  0100  0001  0180  0001
0000706020   0180  0001  0180  0001  0180  0001  0180  0001
*
0000706220   0180  0001  0180  0007  737A  F683  8204  0100
0000706240   0001  0180  0001  0180  0001  0180  0001  0180
*
0000706340   0016  3079  8303  0707  0883  8207  280A  6E75
0000706360   6174  6767  6465  6929  0A01  7F00  8183  8300
0000706400   0081  8183  0100  001C  827F  7006  6361  5F6B
0000706420   0068  0682  6966  656C  685F  8202  6606  6E75
0000706440   5F63  0468  0101  8000  0101  8000  0101  8000
0000706460   0101  8000  0101  8000  0101  8000  0101  8000
*
0000706640   0101  8000  0101  8000  0101  8000  0501  7800
0000706660   8358  0080  0501  7800  8330  0080  0501  7800
0000706700   8310  0080  0701  7800  9885  8300  0080  0701
0000706720   7800  A885  8300  0080  0701  7800  B885  8300
0000706740   0080  0701  7800  B085  8300  0080  0701  7A00
0000706760   8373  06C0  0082  0A01  7500  8380  0081  0264
0000707000   3483  0107  0007  837F  0732  3283  0107  0007
0000707020   737A  C783  8206  0100  000A  8075  8183  6400
0000707040   8302  0737  0701  7F00  3583  8307  0735  0A01
0000707060   7500  8380  0081  0364  3983  0107  000A  837F
0000707100   0544  8183  8300  06F5  0101  8000  0101  8000
0000707120   0A01  7500  8380  0081  0464  3D83  0107  000D
0000707140   837F  0086  8683  8300  00C0  8583  0100  000A
0000707160   8075  8183  6400  8305  073F  1001  7F00  8683
0000707200   8300  0544  5F83  8305  0085  8583  0100  0004
0000707220   837F  0697  0A01  7500  8380  0081  0173  4083
0000707240   0107  0001  0180  0001  0180  0007  8578  00E8
0000707260   8083  0100  0005  2078  8083  0100  0005  6078
0000707300   8283  0100  0005  4078  8083  0100  0004  837F
0000707320   0697  0A01  7500  8380  0081  0173  4883  0107
0000707340   0007  8578  0088  8083  0100  0007  8578  0088
0000707360   8083  0100  0007  8578  00C0  8083  0100  0007
0000707400   837F  0732  3283  0107  000A  8075  8183  6400
0000707420   8302  074D  0701  7800  9885  8300  0080  0701
```

THU MAR 14 17:25:16 1991 CRV_IPS.DLL PAGE 234, LINE 13748

```
0000707440  7F00  3583  8307  0735  0A01  7500  8380  0081
0000707460  0264  5083  0107  0004  837F  0697  0A01  7500
0000707500  8380  0081  0173  5283  0107  0001  0180  0007
0000707520  8578  00D0  8083  0100  0005  4878  8083  0100
0000707540  0005  6878  8083  0100  0007  8578  0080  8083
0000707560  0100  0007  8578  00F0  8083  0100  0005  7078
0000707600  8083  0100  000A  8075  8183  7300  8300  0201
0000707620  0A01  7F00  4483  8305  0081  F583  0106  000A
0000707640  8075  8183  6400  8303  075C  0D01  7F00  E483
0000707660  8300  0082  8183  8300  06F5  0A01  7500  8380
0000707700  0081  0464  5E83  0107  0007  8578  0080  8083
0000707720  0100  000D  837F  00E4  8283  8300  0081  F583
0000707740  0106  000A  8075  8183  6400  8304  0761  0101
0000707760  8000  0501  7800  8378  0080  0401  7F00  9783
0000710000  0106  000A  8075  8183  7300  8301  0765  0101
0000710020  8000  0701  7800  9085  8300  0080  0A01  7500
0000710040  8380  0081  0064  0183  0102  0007  8578  00A8
0000710060  8083  0100  0007  8578  00A0  8083  0100  000A
0000710100  8075  8183  6400  8300  0201  0701  7800  C085
0000710120  8300  0080  0D01  7F00  8683  8300  0086  C083
0000710140  8300  0085  0A01  7500  8380  0081  0464  6E83
0000710160  0107  0007  8578  00B8  8083  0100  0007  8578
0000710200  00D8  8083  0100  0007  8578  00C8  8083  0100
0000710220  0010  837F  0086  4483  8305  055F  8583  8300
0000710240  0085  0A01  7500  8380  0081  0564  7383  0107
0000710260  0007  8578  00E0  8083  0100  000A  8075  8183
0000710300  6400  8300  C201  0101  8000  0101  8000  0101
0000710320  8000  0101  8000  0101  8000  0101  8000  0101
*
0000710560  8000  0701  7800  0085  8301  0080  0101  8000
0000710600  0101  8000  0101  8000  0101  8000  0101  8000
*
0000715040  0101  8000  0101  8000  0101  8000  0A01  7500
0000715060  8380  0081  0064  0183  0102  0001  0180  0001
0000715100  0180  0001  0180  0001  0180  0001  0180  0001
*
0000717020  0180  0001  0180  0001  0180  0001  0180  0016
0000717040  3079  8303  0554  5583  8205  280A  6E75  6174
0000717060  6767  6465  6929  0A01  7F00  8583  8300  0085
0000717100  8583  0100  001A  827F  7705  6469  6874  8200
0000717120  6806  6965  6867  0274  0582  6564  7470  0468
0000717140  0101  8000  0101  8000  0101  8000  0101  8000
*
0000720220  0101  8000  0101  8000  0701  7800  0085  8308
0000720240  0080  0101  8000  0101  8000  0101  8000  0101
0000720260  8000  0101  8000  0101  8000  0101  8000  0101
*
0000721400  8000  0101  8000  0101  8000  0101  8000  1601
0000721420  7900  0330  8183  8306  0682  0A82  7528  746E
0000721440  6761  6567  2964  0169  000A  837F  0085  8583
0000721460  8300  0085  2201  7F00  0982  6373  6572  6E65
0000721500  625F  0067  0782  6369  6E6F  625F  0267  0882
0000721520  7068  635F  6F72  7373  0104  0018  8579  01BD
0000721540  8310  0684  8583  8206  280A  6E75  6174  6767
0000721560  6465  6929  3101  7F00  8183  8300  0085  8583
0000721600  8300  0085  8583  8300  0086  8683  8300  0086
0000721620  8683  8300  0086  8683  8300  0553  8583  8300
0000721640  0680  8683  8300  0085  E801  7F00  0382  6564
0000721660  0076  0982  6874  6572  6873  6C6F  0264  1282
```

```
THU MAR 14 17:25:16 1991  CRV_IPS.DLL  PAGE 235, LINE 13807

0000721700  6C62  6E69  696B  676E  745F  7268  7365  6F68
0000721720  646C  8204  6512  7272  655F  656C  5F6D  6874
0000721740  6572  6873  6C6F  0664  1282  7865  7063  655F
0000721760  7272  745F  7268  7365  6F68  646C  8208  7309
0000722000  6174  6962  696C  7974  820A  7408  6D69  5F65
0000722020  756F  0E74  0D82  7973  636E  745F  6D69  5F65
0000722040  756F  1274  0682  7374  5F74  6469  8216  640B
0000722060  6669  5F66  7374  5F74  6469  821A  700D  7261
0000722100  6E65  5F74  7374  5F74  6469  821E  6406  6D69
0000722120  6E65  2273  1082  6164  6174  6C5F  7961  7265
0000722140  645F  7065  6874  8228  690C  6F63  5F6E  6F63
0000722160  6F6C  7275  2A73  0D82  6F61  5F69  6F78  5F72
0000722200  6F63  6F6C  3072  0A82  6E69  6574  6C72  6361
0000722220  6465  0134  0016  6079  8306  0687  8883  8206
0000722240  280A  6E75  6174  6767  6465  6929  1301  7F00
0000722260  8583  8300  0085  8583  8300  0085  8583  8300
0000722300  0085  3001  7F00  0482  656C  7466  8200  7403
0000722320  706F  8202  7205  6769  7468  8204  6206  746F
0000722340  6F74  066D  0582  6977  7464  0868  0682  6568
0000722360  6769  7468  010A  0001  0180  0001  0180  0001
0000722400  0180  0001  0180  0001  0180  0001  0180  0001
*
0000722700  0180  0001  0180  0018  8579  01C0  8316  06BE
0000722720  BF83  8206  280A  6E75  6174  6767  6465  6929
0000722740  4301  7F00  8583  8300  0085  8583  8300  0085
0000722760  8583  8300  0085  8583  8300  0085  8683  8300
0000723000  0085  8583  8300  0085  8583  8300  0086  8683
0000723020  8300  0086  8683  8300  0085  8583  8300  0085
0000723040  8683  8300  0085  1E01  7F01  0682  6568  7973
0000723060  636E  8200  6806  6265  6E6C  026B  0682  7368
0000723100  6C62  6B6E  8204  7606  7365  6E79  0663  0682
0000723120  6576  6C62  6B6E  8208  7606  6273  6E6C  0A6B
0000723140  0982  7367  5F70  6974  656D  DC72  0682  6866
0000723160  6964  7073  820E  6D07  5F62  6973  657A  8210
0000723200  6808  5F77  6564  7470  1468  0882  6373  775F
0000723220  6469  6874  8216  7309  5F63  6568  6769  7468
0000723240  8218  7308  5F63  6564  7470  1A68  0B82  6974
0000723260  656D  756F  5F74  6176  1C6C  1082  7973  636E
0000723300  745F  6D69  6F65  7475  765F  6C61  8220  730D
0000723320  6174  6962  696C  7974  765F  6C61  8224  7614
0000723340  7265  6669  5F79  7473  6261  6C69  7469  5F79
0000723360  6176  286C  0982  6874  6572  6873  6C6F  2C64
0000723400  1282  6C62  6E69  696B  676E  745F  7268  7365
0000723420  6F68  646C  822E  6512  7272  655F  656C  5F6D
0000723440  6874  6572  6873  6C6F  3064  0D82  6F61  5F69
0000723460  6F78  5F72  6F63  6F6C  3272  0A82  6E69  6574
0000723500  6C72  6361  6465  0136  0001  0180  0001  0180
0000723520  0001  0180  0001  0180  0001  0180  0001  0180
*
0000723720  0001  0180  0016  4079  8302  06E4  E583  8206
0000723740  280A  6E75  6174  6767  6465  6929  0701  7F00
0000723760  8283  8300  0082  2201  7F00  0E82  6170  6172
0000724000  656D  6574  5F72  6F63  6564  8200  700D  7261
0000724020  6D61  7465  7265  765F  6C61  0104  0001  0180
0000724040  0001  0180  0001  0180  0001  0180  0001  0180
*
0000724300  0001  0180  000A  8075  8583  6400  8301  0711
0000724320  0401  7F00  8583  0100  000A  8075  0083  7302
0000724340  8300  0201  0701  7800  0085  8310  0080  0501
```

```
THU MAR 14 17:25:16 1991  CRV_IPS.DLL  PAGE 236, LINE 13866

0000724360   7800   8320   0080   0701   7800   B085   8300   0080
0000724400   0701   7800   9885   8300   0080   0501   7800   8378
0000724420   0080   0701   7800   C085   8300   0080   0701   7800
0000724440   A885   8300   0080   0701   7800   9085   8300   0080
0000724460   0701   7800   8085   8300   0080   0701   7800   A085
0000724500   8300   0080   0401   7F00   C083   0100   000A   8075
0000724520   8183   7300   8301   071D   0401   7F00   8583   0100
0000724540   000A   8075   8183   6400   8301   071F   0A01   7500
0000724560   8380   0081   0073   0183   0102   000A   8075   8183
0000724600   7300   8300   0201   0501   7800   8318   0080   0501
0000724620   7800   8358   0080   0A01   7500   8380   0081   0064
0000724640   0183   0102   0007   8578   3000   8583   0100   0005
0000724660   6878   8083   0100   0007   8578   0168   8083   0100
0000724700   0007   8578   0130   8083   0100   0007   8578   1000
0000724720   8583   0100   0007   8578   01B8   8083   0100   0004
0000724740   837F   0085   0A01   7500   8380   0085   0164   2C83
0000724760   0107   000A   8075   8183   7300   8300   0201   0701
0000725000   7F00   8583   8300   0086   0A01   7500   8380   0081
0000725020   0273   2F83   0107   000A   8075   0083   7302   8300
0000725040   0201   0A01   7500   8380   0200   0073   0183   0102
0000725060   0004   837F   0086   0A01   7500   8380   0200   0173
0000725100   3383   0107   0004   837F   0086   0A01   7500   8380
0000725120   0200   0173   3583   0107   0005   0878   8083   0100
0000725140   0005   3078   8083   0100   0001   0180   0001   0180
0000725160   0001   0180   0001   0180   0001   0180   0001   0180
*
0000725420   0001   0180   0001   0180   0007   8578   0100   8083
0000725440   0100   0001   0180   0001   0180   0001   0180   0001
0000725460   0180   0001   0180   0001   0180   0001   0180   0001
*
0000726240   0180   0005   6078   8083   0100   0001   0180   0001
0000726260   0180   0001   0180   0001   0180   0001   0180   0001
*
0000731360   0180   0001   0180   0001   0180   0001   0180   0016
0000731400   2079   8302   0424   2583   8204   280A   6E75   6174
0000731420   6767   6465   6929   0701   7F00   8183   8300   0081
0000731440   0901   7F00   0182   0078   0182   0279   1601   7900
0000731460   0240   2783   8304   0428   0A82   7528   746E   6761
0000731500   6567   2964   0169   0007   837F   0423   2383   0104
0000731520   000D   827F   6D03   6E69   8200   6D03   7861   0104
0000731540   0001   0180   0016   2079   8302   042B   2C83   8204
0000731560   280A   6E75   6174   6767   6465   6929   0701   7F00
0000731600   8583   8300   0085   1201   7F00   0582   6977   7464
0000731620   0068   0682   6568   6769   7468   0102   0001   0180
0000731640   0016   4079   8302   042F   3083   8204   280A   6E75
0000731660   6174   6767   6465   6929   0701   7F00   2383   8304
0000731700   042A   1101   7F00   0682   726F   6769   6E69   8200
0000731720   6104   6572   0461   0101   8000   0101   8000   0101
0000731740   8000   0101   8000   0101   8000   0101   8000   0101
*
0000732200   8000   0101   8000   0101   8000   1601   7900   0330
0000732220   5F83   8304   0460   0A82   7528   746E   6761   6567
0000732240   2964   0169   000A   837F   0085   8583   8300   0085
0000732260   1A01   7F0C   6582   6977   7464   0068   0682   6568
0000732300   6769   7468   8202   6405   7065   6874   0104   0018
0000732320   8579   0140   8308   0463   6483   8204   280A   6E75
0000732340   6174   6767   6465   6929   0701   7800   8085   8300
0000732360   0084   1901   7F00   8183   8300   045E   8583   8300
0000732400   0085   C483   8300   0082   E483   8300   0462   5A01
```

THU MAR 14 17:25:16 1991 CRV_IPS.DLL PAGE 237, LINE 13925

```
0000732420  7F00  0682  6572  7270  7365  8200  6406  6D69
0000732440  6E65  0273  1082  6164  6174  6C5F  7961  7265
0000732460  645F  7065  6874  8208  7308  6769  735F  7A69
0000732500  0A65  0782  6973  5F67  7470  0C72  0982  7462
0000732520  706D  735F  7A69  1065  0882  7462  706D  705F
0000732540  7274  8214  7305  6170  6572  0118  0001  0180
0000732560  0018  8579  05A0  830C  0468  6983  8204  280A
0000732600  6E75  6174  6767  6465  6929  0701  7800  8085
0000732620  8301  0084  2501  7F00  8683  8300  022C  2C83
0000732640  8302  0086  8183  8300  0085  8683  8300  0082
0000732660  8683  8300  0423  6183  8304  0467  7E01  7F00
0000732700  0282  6469  8200  6E04  6D61  0465  0982  6966
0000732720  656C  6E5F  6D61  2465  0982  7865  5F70  6374
0000732740  695F  4464  0482  7974  6570  8248  720C  6665
0000732760  6C5F  6E69  5F65  756E  4A6D  0982  6572  5F66
0000733000  6374  695F  4C64  0A82  6974  656D  735F  6174
0000733020  706D  8250  6106  696F  695F  5464  0882  6F6C
0000733040  6163  6974  6E6F  8258  6209  6D74  5F70  6E69
0000733060  6F66  825C  7305  6170  6572  8485  0100  0001
0000733100  0180  0001  0180  0001  0180  0001  0180  0001
*
0000733140  0180  0001  0180  0007  737A  6683  8204  0100
0000733160  0001  0180  0001  0180  0001  0180  0001  0180
*
0000733600  0001  0180  0001  0180  0018  8579  02C0  8307
0000733620  04BD  BE83  8204  280A  6E75  6174  6767  6465
0000733640  6929  0701  7800  2085  8301  0084  1601  7F00
0000733660  8683  8300  022C  2683  8304  0081  8183  8300
0000733700  0082  BC83  0104  0038  827F  6902  0064  0482
0000733720  616E  656D  8204  7204  6365  2474  0482  7461
0000733740  7274  822C  6405  6D75  796D  822E  740A  6D69
0000733760  5F65  7473  6D61  3070  0582  7073  7261  3465
0000734000  0101  8000  0101  8000  0101  8000  0101  8000
*
0000735060  0101  8000  0701  7A00  8373  054D  0082  0A01
0000735100  7500  8380  0081  0064  0183  0102  0001  0180
0000735120  0001  0180  0001  0180  0001  0180  0001  0180
*
0000736100  0001  0180  0001  0180  0018  8579  011D  8311
0000736120  05CE  CF83  8205  280A  6E75  6174  6767  6465
0000736140  6929  3401  7F00  8583  8300  0085  8583  8300
0000736160  0085  8583  8300  0085  8183  8300  0085  8583
0000736200  8300  0085  8483  8300  0085  8583  8300  0085
0000736220  8583  8300  0085  8583  0100  0106  827F  7409
0000736240  6D69  5F65  6E75  7469  8200  6D0F  6E69  725F
0000736260  6365  726F  5F64  6974  656D  8202  7309  6174
0000736300  6962  696C  7974  8204  630F  7061  7574  6572
0000736320  745F  6D69  6F65  7475  8206  6B0A  7965  665F
0000736340  726F  616D  0874  1382  6F63  746E  6E69  6F75
0000736360  7375  745F  6172  6B63  6E69  0A67  0E82  6F6D
0000736400  7375  5F65  7274  6361  696B  676E  820C  6311
0000736420  7061  7574  6572  735F  6769  616E  7574  6572
0000736440  820E  680B  746F  656B  5F79  7973  636E  8210
0000736460  640C  6665  7561  746C  745F  6D69  1265  0982
0000736500  616D  5F78  6564  616C  1479  0B82  6166  7473
0000736520  725F  7065  616C  1679  0E82  6576  6972  7966
0000736540  745F  6D69  6F65  7475  8218  770C  6961  5F74
0000736560  6974  656D  756F  1A74  0C82  7973  636E  745F
0000736600  6D69  6F65  7475  821C  7409  7268  7365  6F68
```

THU MAR 14 17:25:16 1991 CRV_IPS.DLL PAGE 238, LINE 13984

```
0000736620  646C  821E  630C  6568  6B63  6C5F  6F6F  756B
0000736640  2070  0101  8000  0701  7800  0085  8308  0080
0000736660  0101  8000  0101  8000  0101  8000  0101  8000
*
0000737060  0101  8000  1601  7900  0240  F483  8305  05F5
0000737100  0A82  7528  746E  6761  6567  2964  0169  0007
0000737120  837F  0082  8283  0100  0017  827F  6408  6665
0000737140  745F  6D69  0065  0882  696D  5F6E  6974  656D
0000737160  0104  0001  0180  0001  0180  0001  0180  0001
0000737200  0180  0001  0180  0001  0180  0016  4079  8304
0000737220  05FD  FE83  8205  280A  6E75  6174  6767  6465
0000737240  6929  0D01  7F00  8483  8300  0084  8483  8300
0000737260  0423  2901  7F00  0782  6261  5F73  6572  006C
0000737300  0582  6E75  7469  0173  0C82  7073  6365  6169
0000737320  5F6C  7566  636E  8202  6404  7369  0470  0101
0000737340  8000  0101  8000  0101  8000  1601  7900  0220
0000737360  0383  8306  0604  0A82  7528  746E  6761  6567
0000737400  2964  0169  0007  837F  0081  8183  0100  001E
0000737420  827F  7309  6E79  5F63  6F6D  6564  8200  730E
0000737440  6E79  5F63  7865  6365  6D5F  646F  0265  1601
0000737460  7900  0230  0683  8306  0607  0A82  7528  746E
0000737500  6761  6567  2964  0169  0007  837F  0082  8183
0000737520  0100  0019  827F  7407  6365  5F68  6469  8200
0000737540  740B  6365  5F68  6572  7361  6E6F  0104  0001
0000737560  0180  0001  0180  0001  0180  0018  8579  0220
0000737600  8303  060C  0D83  8206  280A  6E75  6174  6767
0000737620  6465  6929  0A01  7F00  2C83  8302  022C  8683
0000737640  0100  001A  827F  6905  616D  6567  8200  6404
0000737660  6669  2066  0782  6964  6666  695F  4064  1801
0000737700  7900  1085  0203  1083  8306  0611  0A82  7528
0000737720  746E  6761  6567  2964  0169  0007  8578  0300
0000737740  2C83  0102  0007  837F  0085  0F83  0106  0024
0000737760  827F  6E0E  6D75  6F5F  5F66  6373  6572  6E65
0000740000  0073  0F82  6D69  6761  5F65  616E  656D  6C5F
0000740020  7369  0274  1601  7900  0120  1383  8306  0614
0000740040  0A82  7528  746E  6761  6567  2964  0169  0004
0000740060  837F  00C0  0A01  7F00  0682  7473  6972  676E
0000740100  0100  0001  0180  0001  0180  0001  0180  0016
0000740120  3079  8302  0619  1A83  8206  280A  6E75  6174
0000740140  6767  6465  6929  0701  7F00  8283  8300  0081
0000740160  1E01  7F00  0C82  7865  6563  7470  6F69  5F6E
0000740200  6469  8200  650B  6378  5F70  7473  7461  7375
0000740220  0104  0016  2079  8302  061F  2083  8206  280A
0000740240  6E75  6174  6767  6465  6929  1601  7900  0208
0000740260  1D83  8306  061E  0A82  7528  746E  6761  6567
0000740300  2964  0169  0007  837F  0084  8483  0100  001B
0000740320  827F  6B08  7965  635F  646F  0065  0C82  7773
0000740340  7469  6863  735F  6174  6574  0100  0007  837F
0000740360  0081  1C83  0106  0018  827F  6B08  7965  745F
0000740400  7079  0065  0982  656B  5F79  6176  756C  0265
0000740420  1801  7900  3085  0402  2383  8306  0624  0A82
0000740440  7528  746E  6761  6567  2964  0169  0007  8578
0000740460  0200  1B83  0106  000D  837F  0085  2283  8306
0000740500  0081  8183  0100  002E  827F  7308  7165  735F
0000740520  7A69  0065  0382  6573  0271  0882  656B  5F79
0000740540  7461  7274  8242  610E  7463  7669  7461  6465
0000740560  665F  6E75  4463  0101  8000  0101  8000  0101
0000740600  8000  0101  8000  0101  8000  0101  8000  0101
0000740620  8000  0101  8000  1601  7900  0220  2E83  8306
```

THU MAR 14 17:25:16 1991 CRV_IPS.DLL PAGE 239, LINE 14043

| | | | | | | | | |
|---|---|---|---|---|---|---|---|---|
| 0000740640 | 062F | 0A82 | 7528 | 746E | 6761 | 6567 | 2964 | 0169 |
| 0000740660 | 0007 | 837F | 0081 | 8183 | 0100 | 0017 | 827F | 6B08 |
| 0000740700 | 7965 | 615F | 7474 | 0072 | 0882 | 7566 | 636E | 6B5F |
| 0000740720 | 7965 | 0102 | 0018 | 8579 | 0210 | 8302 | 0631 | 3283 |
| 0000740740 | 8206 | 280A | 6E75 | 6174 | 6767 | 6465 | 6929 | 0701 |
| 0000740760 | 7F00 | 8583 | 8300 | 0622 | 1201 | 7F00 | 0882 | 6573 |
| 0000741000 | 5F71 | 6973 | 657A | 8200 | 7303 | 7165 | 0102 | 0001 |
| 0000741020 | 0180 | 0001 | 0180 | 0001 | 0180 | 0001 | 0180 | 0001 |
| 0000741040 | 0180 | 0018 | 8579 | 02D0 | 8302 | 0639 | 3A83 | 8206 |
| 0000741060 | 280A | 6E75 | 6174 | 6767 | 6465 | 6929 | 0701 | 7F00 |
| 0000741100 | BB83 | 8304 | 0081 | 1101 | 7F00 | 0682 | 6966 | 746C |
| 0000741120 | 7265 | 8200 | 6D04 | 646F | 5865 | 1801 | 7900 | 5085 |
| 0000741140 | 0501 | 3C83 | 8306 | 063D | 0A82 | 7528 | 746E | 6761 |
| 0000741160 | 6567 | 2964 | 0169 | 0010 | 837F | 022C | 8683 | 8300 |
| 0000741200 | 0081 | 8183 | 8300 | 0081 | 2B01 | 7F00 | 0482 | 616E |
| 0000741220 | 656D | 8200 | 6C06 | 6269 | 695F | 2064 | 0582 | 6C63 |
| 0000741240 | 7361 | 2473 | 0582 | 7473 | 6C79 | 2665 | 0782 | 706F |
| 0000741260 | 635F | 646F | 2865 | 0101 | 8000 | 0101 | 8000 | 0101 |
| 0000741300 | 8000 | 1B01 | 7900 | 0920 | 4283 | 8306 | 0643 | 0F82 |
| 0000741320 | 5F69 | 5F75 | 736D | 5F67 | 6170 | 6172 | 5F6D | 6974 |
| 0000741340 | 1C01 | 7F00 | 8183 | 8300 | 0085 | 8283 | 8300 | 0086 |
| 0000741360 | 8883 | 8300 | 0080 | 8483 | 8300 | 00C0 | C083 | 0100 |
| 0000741400 | 006A | 827F | 6909 | 755F | 735F | 6F68 | 7472 | 8200 |
| 0000741420 | 690A | 755F | 755F | 6873 | 726F | 0074 | 0882 | 5F69 |
| 0000741440 | 5F75 | 6F6C | 676E | 8200 | 6909 | 755F | 755F | 6F6C |
| 0000741460 | 676E | 8200 | 6909 | 755F | 665F | 6F6C | 7461 | 8200 |
| 0000741500 | 6908 | 755F | 635F | 6168 | 0072 | 0982 | 5F69 | 5F75 |
| 0000741520 | 6375 | 6168 | 0072 | 0782 | 5F69 | 5F75 | 7473 | 0072 |
| 0000741540 | 0982 | 5F69 | 5F75 | 6C62 | 636F | 006B | 1901 | 7900 |
| 0000741560 | 0230 | 4583 | 8306 | 0646 | 0D82 | 5F69 | 736D | 5F67 |
| 0000741600 | 6170 | 6172 | 5F6D | 6974 | 0701 | 7F00 | 8583 | 8300 |
| 0000741620 | 0641 | 1001 | 7F00 | 0482 | 7974 | 6570 | 8200 | 7605 |
| 0000741640 | 6C61 | 6575 | 0102 | 0001 | 0180 | 001C | 8579 | 0090 |
| 0000741660 | 8309 | 0649 | 4A83 | 8206 | 690E | 6D5F | 6773 | 685F |
| 0000741700 | 6165 | 6564 | 5F72 | 6974 | 1C01 | 7F00 | 8183 | 8300 |
| 0000741720 | 0081 | 8583 | 8300 | 0085 | 8483 | 8300 | 0085 | 8583 |
| 0000741740 | 8300 | 0081 | 8583 | 0100 | 0047 | 827F | 7104 | 695F |
| 0000741760 | 0064 | 0682 | 6F73 | 7275 | 6563 | 8202 | 7003 | 6469 |
| 0000742000 | 8204 | 7403 | 6469 | 8206 | 7204 | 7365 | 0870 | 0882 |
| 0000742020 | 6572 | 7073 | 745F | 6469 | 820A | 6F07 | 5F70 | 6F63 |
| 0000742040 | 6564 | 820C | 7404 | 7079 | 0E65 | 0482 | 6973 | 657A |
| 0000742060 | 0110 | 0015 | 8579 | 00C0 | 8302 | 064D | 4E83 | 8206 |
| 0000742100 | 6907 | 6D5F | 6773 | 745F | 0169 | 0005 | 3078 | 4483 |
| 0000742120 | 0106 | 0007 | 837F | 0648 | 4C83 | 0106 | 0017 | 827F |
| 0000742140 | 6806 | 6165 | 6564 | 0072 | 0A82 | 6170 | 6172 | 5F6D |
| 0000742160 | 696C | 7473 | 0112 | 0001 | 0180 | 0001 | 0180 | 0001 |
| 0000742200 | 0180 | 0001 | 0180 | 0001 | 0180 | 0001 | 0180 | 0001 |
| * | | | | | | | | |
| 0000742360 | 0180 | 0001 | 0180 | 0016 | 3079 | 8303 | 0670 | 7183 |
| 0000742400 | 8206 | 280A | 6E75 | 6174 | 6767 | 6465 | 6929 | 0A01 |
| 0000742420 | 7F00 | 8583 | 8300 | 0085 | 8583 | 0100 | 0022 | 827F |
| 0000742440 | 7309 | 7263 | 6565 | 5F6E | 6762 | 8200 | 6907 | 6F63 |
| 0000742460 | 5F6E | 6762 | 8202 | 6808 | 5F70 | 7263 | 736F | 0473 |
| 0000742500 | 1801 | 7900 | B085 | 1001 | 7383 | 8306 | 0674 | 0A82 |
| 0000742520 | 7528 | 746E | 6761 | 6567 | 2964 | 0169 | 0031 | 837F |
| 0000742540 | 0081 | 8583 | 8300 | 0085 | 8583 | 8300 | 0085 | 8683 |
| 0000742560 | 8300 | 0086 | 8683 | 8300 | 0086 | 8683 | 8300 | 0086 |
| 0000742600 | 5E83 | 8304 | 0085 | 6F83 | 8306 | 0086 | 8583 | 0100 |
| 0000742620 | 00E8 | 827F | 6403 | 7665 | 8200 | 7409 | 7268 | 7365 |

THU MAR 14 17:25:16 1991 CRV_IPS.DLL PAGE 240, LINE 14102

| | | | | | | | | |
|---|---|---|---|---|---|---|---|---|
| 0000742640 | 6F68 | 646C | 8202 | 6212 | 696C | 6B6E | 6E69 | 5F67 |
| 0000742660 | 6874 | 6572 | 6873 | 6C6F | 0464 | 1282 | 7265 | 5F72 |
| 0000742700 | 6C65 | 6D65 | 745F | 7268 | 7365 | 6F68 | 646C | 8206 |
| 0000742720 | 6512 | 6378 | 5F70 | 7265 | 5F72 | 6874 | 6572 | 6873 |
| 0000742740 | 6C6F | 0864 | 0982 | 7473 | 6261 | 6C69 | 7469 | 0A79 |
| 0000742760 | 0882 | 6974 | 656D | 6F5F | 7475 | 820E | 730D | 6E79 |
| 0000743000 | 5F63 | 6974 | 656D | 6F5F | 7475 | 8212 | 7406 | 7473 |
| 0000743020 | 695F | 1664 | 0B82 | 6964 | 6666 | 745F | 7473 | 695F |
| 0000743040 | 1A64 | 0D82 | 6170 | 6572 | 746E | 745F | 7473 | 695F |
| 0000743060 | 1E64 | 0682 | 6964 | 656D | 736E | 8222 | 6410 | 7461 |
| 0000743100 | 5F61 | 616C | 6579 | 5F72 | 6564 | 7470 | 2868 | 0C82 |
| 0000743120 | 6369 | 6E6F | 635F | 6C6F | 756F | 7372 | 822A | 610D |
| 0000743140 | 696F | 785F | 726F | 635F | 6C6F | 726F | 8230 | 690A |
| 0000743160 | 746E | 7265 | 616C | 6563 | 3464 | 1601 | 7900 | 0660 |
| 0000743200 | 7683 | 8306 | 0677 | 0A82 | 7528 | 746E | 6761 | 6567 |
| 0000743220 | 2964 | 0169 | 0013 | 837F | 0085 | 8583 | 8300 | 0085 |
| 0000743240 | 8583 | 8300 | 0085 | 8583 | 0100 | 0030 | 827F | 6C04 |
| 0000743260 | 6665 | 0074 | 0382 | 6F74 | 0270 | 0582 | 6972 | 6867 |
| 0000743300 | 0474 | 0682 | 6F62 | 7474 | 6D6F | 8206 | 7705 | 6469 |
| 0000743320 | 6874 | 8208 | 6806 | 6965 | 6867 | 0A74 | 0101 | 8000 |
| 0000743340 | 0101 | 8000 | 0101 | 8000 | 1601 | 7900 | 0340 | 7D83 |
| 0000743360 | 8306 | 067E | 0A82 | 7528 | 746E | 6761 | 6567 | 2964 |
| 0000743400 | 0169 | 0007 | 737A | 2183 | 8206 | 0100 | 000A | 837F |
| 0000743420 | 0081 | 8183 | 8300 | 067C | 2B01 | 7F00 | 0682 | 6361 |
| 0000743440 | 6974 | 6E6F | 8200 | 6E0F | 6D75 | 6F5F | 5F66 | 6F73 |
| 0000743460 | 7466 | 656B | 7379 | 8202 | 730C | 666F | 6B74 | 7965 |
| 0000743500 | 5F73 | 7470 | 0472 | 1601 | 7900 | 0340 | 8183 | 8306 |
| 0000743520 | 0682 | 0A82 | 7528 | 746E | 6761 | 6567 | 2964 | 0169 |
| 0000743540 | 0007 | 737A | 3083 | 8206 | 0100 | 000A | 837F | 0081 |
| 0000743560 | 8183 | 8300 | 0680 | 2901 | 7F00 | 0682 | 6361 | 6974 |
| 0000743600 | 6E6F | 8200 | 6E0E | 6D75 | 6F5F | 5F66 | 6F68 | 6B74 |
| 0000743620 | 7965 | 0273 | 0B82 | 6F68 | 6B74 | 7965 | 5F73 | 7470 |
| 0000743640 | 0472 | 1801 | 7900 | 7085 | 0501 | 8483 | 8306 | 0685 |
| 0000743660 | 0A82 | 7528 | 746E | 6761 | 6567 | 2964 | 0169 | 0010 |
| 0000743700 | 837F | 022C | 8683 | 8300 | 0474 | E483 | 8300 | 0085 |
| 0000743720 | 3D01 | 7F00 | 0A82 | 6D69 | 6761 | 5F65 | 616E | 656D |
| 0000743740 | 8200 | 6908 | 616D | 6567 | 695F | 2064 | 0982 | 6D69 |
| 0000743760 | 6761 | 5F65 | 7470 | 2472 | 0982 | 616C | 6579 | 5F72 |
| 0000744000 | 7470 | 2872 | 0982 | 6D69 | 6761 | 5F65 | 6468 | 2C6C |
| 0000744020 | 0101 | 8000 | 0101 | 8000 | 0101 | 8000 | 0101 | 8000 |
| 0000744040 | 1801 | 7900 | 9085 | 0201 | 8B83 | 8306 | 068C | 0A82 |
| 0000744060 | 7528 | 746E | 6761 | 6567 | 2964 | 0169 | 0007 | 837F |
| 0000744100 | 0082 | 8383 | 0106 | 0018 | 827F | 650C | 6378 | 7065 |
| 0000744120 | 6974 | 6E6F | 695F | 0064 | 0582 | 6D69 | 6761 | 0465 |
| 0000744140 | 0101 | 8000 | 1601 | 7900 | 0340 | 9083 | 8306 | 0691 |
| 0000744160 | 0A82 | 7528 | 746E | 6761 | 6567 | 2964 | 0169 | 0007 |
| 0000744200 | 737A | 8A83 | 8206 | 0100 | 000A | 837F | 0081 | 8183 |
| 0000744220 | 8300 | 068F | 2F01 | 7F00 | 0682 | 6361 | 6974 | 6E6F |
| 0000744240 | 8200 | 6E11 | 6D75 | 6F5F | 5F66 | 7865 | 6563 | 7470 |
| 0000744260 | 6F69 | 736E | 8202 | 650E | 6378 | 7065 | 6974 | 6E6F |
| 0000744300 | 6C5F | 7369 | 0474 | 1801 | 7900 | 5085 | 0304 | 9383 |
| 0000744320 | 8306 | 0694 | 0A82 | 7528 | 746E | 6761 | 6567 | 2964 |
| 0000744340 | 0169 | 000A | 837F | 0683 | 8383 | 8306 | 0683 | 1A01 |
| 0000744360 | 7F00 | 0682 | 6D69 | 6761 | 3165 | 8200 | 6906 | 616D |
| 0000744400 | 6567 | 2E32 | 0482 | 6964 | 6666 | 015C | 0018 | 8579 |
| 0000744420 | 01A0 | 8303 | 0697 | 9883 | 8206 | 280A | 6E75 | 6174 |
| 0000744440 | 6767 | 6465 | 6929 | 0701 | 7A00 | 8373 | 0683 | 0082 |
| 0000744460 | 0A01 | 7F00 | 8183 | 8300 | 0696 | 8383 | 0106 | 0026 |
| 0000744500 | 827F | 6E0E | 6D75 | 6F5F | 5F66 | 6373 | 6572 | 6E65 |

THU MAR 14 17:25:16 1991 CRV_IPS.DLL PAGE 241, LINE 14161

```
0000744520  0073  0A82  6D69  6761  5F65  696C  7473  8202
0000744540  6404  6669  0666  1801  7900  1085  0302  9A83
0000744560  8306  069B  0A82  7528  746E  6761  6567  2964
0000744600  0169  000A  837F  022C  2C83  8302  0081  1901
0000744620  7F00  0682  6D69  6761  3165  8200  6906  616D
0000744640  6567  2032  0382  7563  4074  1801  7900  4085
0000744660  0709  A083  8306  06A1  0A82  7528  746E  6761
0000744700  6567  2964  0169  0018  8579  0800  831D  069E
0000744720  9F83  8206  280A  6E75  6174  6767  6465  6929
0000744740  5801  7F00  8483  8300  05D1  8483  8300  0084
0000744760  FC83  8305  0081  2E83  8304  0602  3883  8306
0000745000  04BB  8183  8300  067F  0583  8306  068E  1883
0000745020  8306  0081  7B83  8306  0683  9283  8306  0695
0000745040  0E83  8306  0085  0B83  8306  0699  1283  8306
0000745060  05CD  2D83  8306  063B  8483  0100  016F  827F
0000745100  6B0A  6462  735F  6174  7574  0073  0982  6574
0000745120  7473  6E5F  6D61  0065  0882  656B  5F79  6F63
0000745140  6564  8200  730C  6977  6374  5F68  7473  7461
0000745160  0065  0C82  6F6C  6163  6F74  5F72  6964  7073
0000745200  8200  740E  6172  6B63  6E69  5F67  656C  6576
0000745220  006C  0C82  6373  6C61  5F65  6977  646E  776F
0000745240  8200  7309  6E79  5F63  6F6D  6564  8200  660A
0000745260  6C69  6574  5F72  736D  0067  0682  6966  746C
0000745300  7265  8200  630B  7275  6572  746E  615F  696F
0000745320  8200  680C  746F  656B  7379  6C5F  7369  0074
0000745340  0A82  7973  636E  655F  6576  746E  8200  650E
0000745360  6378  7065  6974  6E6F  6C5F  7369  0074  1082
0000745400  7865  7063  735F  6174  7574  5F73  696C  7473
0000745420  8200  6D04  646F  0065  0D82  6F73  7466  656B
0000745440  7379  6C5F  7369  0074  0582  6D69  6761  0065
0000745460  0782  6F63  706D  7261  0065  0B82  6177  7469
0000745500  735F  7263  6565  006E  0A82  6D69  6761  5F65
0000745520  696C  7473  8200  6909  616D  6567  6E5F  6D75
0000745540  8200  690A  616D  6567  645F  6669  0066  0B82
0000745560  6168  666C  695F  616D  6567  0073  0782  616D
0000745600  7373  6761  0065  0682  6170  6172  736D  8200
0000745620  6608  6E75  5F63  656B  0079  0882  6369  6E6F
0000745640  6D5F  6773  8200  6405  6D75  796D  0100  0016
0000745660  837F  0081  4B83  8306  0081  F383  8305  069D
0000745700  8183  8300  0085  5A01  7F00  0682  6F73  7275
0000745720  6563  8200  6D0A  6773  685F  6165  6564  0272
0000745740  0A82  7665  6E65  5F74  7974  6570  821A  7406
0000745760  6D69  6E69  1C67  0B82  7665  6E65  5F74  6176
0000746000  756C  2465  0C82  6572  7574  6E72  765F  6C61
0000746020  6575  2485  8201  7209  7365  5F70  6C66  6761
0000746040  2685  0101  0001  0180  0001  0180  0001  0180
0000746060  0001  0180  0007  737A  9C83  8206  0100  0001
0000746100  0180  0001  0180  0001  0180  0001  0180  0001
*
0000746160  0180  0001  0180  0001  0180  0016  5079  8303
0000746200  06B7  B883  8206  280A  6E75  6174  6767  6465
0000746220  6929  0A01  7F00  8683  8300  0086  8583  0100
0000746240  0022  827F  6D07  6773  705F  7274  8200  6D08
0000746260  6773  735F  7A69  0465  0982  616C  6579  5F72
0000746300  756E  086D  0101  8000  1601  7900  0440  BB83
0000746320  8306  06BC  0A82  7528  746E  6761  6567  2964
0000746340  0169  000D  837F  0085  8583  8300  0085  8583
0000746360  0100  0023  827F  650A  656C  5F6D  6F63  6E75
0000746400  0074  0482  756A  706D  8202  7305  6174  7472
```

THU MAR 14 17:25:16 1991 CRV_IPS.DLL PAGE 242, LINE 14220

```
0000746420  8204  6503  646E  0106  0018  8579  0080  8302
0000746440  06BE  BF83  8206  280A  6E75  6174  6767  6465
0000746460  6929  0701  7F00  BA83  8306  06BA  0901  7F00
0000746500  0182  0068  0182  0876  0101  8000  0101  8000
0000746520  0701  7800  0085  8302  0085  0101  8000  0101
0000746540  8000  0101  8000  0101  8000  1801  7900  8085
0000746560  0340  CC83  8306  06CD  0A82  7528  746E  6761
0000746600  6567  2964  0169  0018  8579  4000  8303  06CA
0000746620  CB83  8206  280A  6E75  6174  6767  6465  6929
0000746640  0701  7800  0085  8340  06C2  0A01  7F00  C983
0000746660  8306  06C9  C983  0106  001B  827F  6306  6B68
0000746700  7573  006D  0682  7265  6372  746E  8200  6305
0000746720  6372  3233  0100  000A  837F  06BA  BA83  8306
0000746740  06C8  2701  7F00  0B82  6F68  6972  5F7A  6170
0000746760  6172  006D  0A82  6576  7472  705F  7261  6D61
0000747000  8208  7308  6769  645F  7461  1061  1801  7900
0000747020  3085  0501  D483  8306  06D5  0A82  7528  746E
0000747040  6761  6567  2964  0169  0018  8579  0090  8303
0000747060  06D2  D383  8206  280A  6E75  6174  6767  6465
0000747100  6929  0701  7800  9085  8300  06D1  0501  7800
0000747120  8330  0085  0A01  7F00  D083  8306  06D0  D083
0000747140  0106  001C  827F  6306  6B68  7573  006D  0682
0000747160  7265  6372  746E  8200  6206  7263  3363  0032
0000747200  1001  7F00  BA83  8306  06BA  8183  8300  0081
0000747220  CF83  0106  003B  827F  680B  726F  7A69  705F
0000747240  7261  6D61  8200  760A  7265  5F74  6170  6172
0000747260  086D  0782  5F78  6F63  726F  1064  0782  5F79
0000747300  6F63  726F  1264  0882  6973  5F67  6164  6174
0000747320  0114  0016  5079  8304  06D7  D883  8206  280A
0000747340  6E75  6174  6767  6465  6929  0D01  7F00  8583
0000747360  8300  0085  8583  8300  0086  4401  7F00  1682
0000747400  6576  6972  7966  735F  7263  6565  5F6E  7270
0000747420  7365  6E65  6563  8200  7310  7263  6565  5F6E
0000747440  7473  6261  6C69  7469  0279  0982  616C  6579
0000747460  5F72  756E  046D  0882  6964  6666  705F  7274
0000747500  0106  0001  0180  0001  0180  0001  0180  0001
0000747520  0180  0001  0180  0001  0180  0001  0180  0001
*
0000747760  0180  0001  0180  0016  3079  8303  0707  0883
0000750000  8207  280A  6E75  6174  6767  6465  6929  0A01
0000750020  7F00  8183  8300  0081  8183  0100  001C  827F
0000750040  7006  6361  5F6B  0068  0682  6966  656C  685F
0000750060  8202  6606  6E75  5F63  0468  0101  8000  0101
0000750100  8000  0101  8000  0101  8000  0101  8000  0101
*
0000750300  8000  0501  7800  8350  0080  0501  7800  8330
0000750320  0080  0701  7800  9885  8300  0080  0701  7800
0000750340  8085  8300  0080  0701  7800  8885  8300  0080
0000750360  0101  8000  0101  8000  0401  7F00  A683  0106
0000750400  000A  8075  8183  7300  8301  0732  0101  8000
0000750420  0701  7800  9885  8300  0080  0501  7800  8320
0000750440  0080  0501  7800  8360  0082  0501  7800  8340
0000750460  0080  0701  7800  E085  8300  0080  0501  7800
0000750500  8358  0080  0701  7800  B085  8300  0080  0701
0000750520  7800  C885  8300  0080  0701  7800  A085  8300
0000750540  0080  0701  7800  A885  8300  0080  0401  7F00
0000750560  A683  0106  000A  8075  8183  7300  8301  073F
0000750600  0401  7F00  A683  0106  000A  8075  8183  7300
0000750620  8301  0741  0701  7800  C885  8300  0080  0401
```

THU MAR 14 17:25:16 1991 CRV_IPS.DLL PAGE 243, LINE 14279

| | | | | | | | | |
|---|---|---|---|---|---|---|---|---|
| 0000750640 | 7F00 | A683 | 0106 | 000A | 8075 | 8183 | 7300 | 8301 |
| 0000750660 | 0744 | 0701 | 7800 | 8085 | 8300 | 0080 | 0701 | 7800 |
| 0000750700 | 9085 | 8300 | 0080 | 0401 | 7F00 | C283 | 0100 | 000A |
| 0000750720 | 8075 | 8183 | 7300 | 8301 | 0748 | 0701 | 7F00 | A683 |
| 0000750740 | 8306 | 0086 | 0A01 | 7500 | 8380 | 0081 | 0273 | 4A83 |
| 0000750760 | 0107 | 0004 | 837F | 0081 | 0A01 | 7500 | 8380 | 0081 |
| 0000751000 | 0164 | 4C83 | 0107 | 0005 | 7078 | 8083 | 0100 | 0005 |
| 0000751020 | 7078 | 8083 | 0100 | 000A | 837F | 0082 | 8583 | 8300 |
| 0000751040 | 0086 | 0A01 | 7500 | 8380 | 0081 | 0364 | 5083 | 0107 |
| 0000751060 | 0007 | 8578 | 00B8 | 8083 | 0100 | 0007 | 8578 | 00B8 |
| 0000751100 | 8083 | 0100 | 000A | 837F | 0082 | 8583 | 8300 | 0086 |
| 0000751120 | 0A01 | 7500 | 8380 | 0081 | 0364 | 5483 | 0107 | 0005 |
| 0000751140 | 7878 | 8083 | 0100 | 0005 | 7878 | 8083 | 0100 | 0004 |
| 0000751160 | 837F | 0086 | 0A01 | 7500 | 8380 | 0081 | 0164 | 5883 |
| 0000751200 | 0107 | 0007 | 737A | C783 | 8206 | 0100 | 0007 | 837F |
| 0000751220 | 06A6 | 8683 | 0100 | 000A | 8075 | 8183 | 6400 | 8302 |
| 0000751240 | 075B | 0701 | 7800 | 9085 | 8300 | 0080 | 0701 | 7800 |
| 0000751260 | 1085 | 8301 | 0080 | 0701 | 7800 | F885 | 8300 | 0080 |
| 0000751300 | 0701 | 7800 | C085 | 8300 | 0080 | 0701 | 7F00 | A683 |
| 0000751320 | 8306 | 0086 | 0A01 | 7500 | 8380 | 0081 | 0264 | 6183 |
| 0000751340 | 0107 | 0007 | 8578 | 00A8 | 8083 | 0100 | 0005 | 6078 |
| 0000751360 | 8083 | 0100 | 0007 | 837F | 06A6 | 8683 | 0100 | 000A |
| 0000751400 | 8075 | 8183 | 7300 | 8302 | 0765 | 0701 | 7F00 | A683 |
| 0000751420 | 8306 | 0086 | 0A01 | 7500 | 8380 | 0081 | 0264 | 6783 |
| 0000751440 | 0107 | 0001 | 0180 | 0007 | 8578 | 0118 | 8083 | 0100 |
| 0000751460 | 0005 | 6878 | 8083 | 0100 | 0007 | 837F | 06A6 | 8683 |
| 0000751500 | 0100 | 000A | 8075 | 8183 | 6400 | 8302 | 076C | 0701 |
| 0000751520 | 7800 | A085 | 8300 | 0080 | 0A01 | 7500 | 8380 | 0081 |
| 0000751540 | 0073 | 0183 | 0102 | 0016 | 4079 | 8302 | 0771 | 7283 |
| 0000751560 | 8207 | 280A | 6E75 | 6174 | 6767 | 6465 | 6929 | 0701 |
| 0000751600 | 7F00 | 8683 | 8300 | 0086 | 0D01 | 7F00 | 0382 | 7265 |
| 0000751620 | 0072 | 0382 | 7266 | 046D | 1601 | 7900 | 0220 | 7483 |
| 0000751640 | 8307 | 0775 | 0A82 | 7528 | 746E | 6761 | 6567 | 2964 |
| 0000751660 | 0169 | 0007 | 837F | 0085 | 8583 | 0100 | 0014 | 827F |
| 0000751700 | 6309 | 6E68 | 5F6C | 6F6D | 6564 | 8200 | 6D04 | 646F |
| 0000751720 | 0265 | 0701 | 7800 | 0885 | 8301 | 0080 | 0A01 | 7500 |
| 0000751740 | 8380 | 0081 | 0064 | 0183 | 0102 | 0001 | 0180 | 0001 |
| 0000751760 | 0180 | 0001 | 0180 | 0001 | 0180 | 0001 | 0180 | 0001 |
| * | | | | | | | | |
| 0000752220 | 0180 | 0001 | 0180 | 0007 | 8578 | 0100 | 8083 | 0100 |
| 0000752240 | 0001 | 0180 | 0001 | 0180 | 0001 | 0180 | 0001 | 0180 |
| * | | | | | | | | |
| 0000756600 | 0007 | 737A | 6683 | 8204 | 0100 | 000A | 8075 | 8183 |
| 0000756620 | 6400 | 8300 | 0201 | 0101 | 8000 | 0101 | 8000 | 0101 |
| 0000756640 | 8000 | 0101 | 8000 | 0101 | 8000 | 0101 | 8000 | 0101 |
| * | | | | | | | | |
| 0000757540 | 8000 | 0101 | 8000 | 0101 | 8000 | 1601 | 7900 | 0220 |
| 0000757560 | DD83 | 8304 | 04DE | 0A82 | 7528 | 746E | 6761 | 6567 |
| 0000757600 | 2964 | 0169 | 0007 | 837F | 0081 | 8183 | 0100 | 0009 |
| 0000757620 | 827F | 7801 | 8200 | 7901 | 0102 | 0016 | 4079 | 8302 |
| 0000757640 | 04E0 | E183 | 8204 | 280A | 6E75 | 6174 | 6767 | 6465 |
| 0000757660 | 6929 | 0701 | 7F00 | DC83 | 8304 | 04DC | 0D01 | 7F00 |
| 0000757700 | 0382 | 696D | 006E | 0382 | 616D | 0478 | 0101 | 8000 |
| 0000757720 | 1601 | 7900 | 0220 | E483 | 8304 | 04E5 | 0A82 | 7528 |
| 0000757740 | 746E | 6761 | 6567 | 2964 | 0169 | 0007 | 837F | 0085 |
| 0000757760 | 8583 | 0100 | 0012 | 827F | 7705 | 6469 | 6874 | 8200 |
| 0000760000 | 6806 | 6965 | 6867 | 0274 | 0101 | 8000 | 1601 | 7900 |
| 0000760020 | 0240 | E883 | 8304 | 04E9 | 0A82 | 7528 | 746E | 6761 |
| 0000760040 | 6567 | 2964 | 0169 | 0007 | 837F | 04DC | E383 | 0104 |

```
THU MAR 14 17:25:16 1991  CRV_IPS.DLL  PAGE 244, LINE 14338

0000760060   0011   827F   6F06   6972   6967   006E   0482   7261
0000760100   6165   0104   0001   0180   0001   0180   0001   0180
0000760120   0001   0180   0001   0180   0001   0180   0001   0180
*
0000760360   0001   0180   0001   0180   0016   3079   8303   0518
0000760400   1983   8205   280A   6E75   6174   6767   6465   6929
0000760420   0A01   7F00   8583   8300   0085   8583   0100   001A
0000760440   827F   7705   6469   6874   8200   6806   6965   6867
0000760460   0274   0582   6564   7470   0468   1801   7900   4085
0000760500   0801   1C83   8305   051D   0A82   7528   746E   6761
0000760520   6567   2964   0169   0007   8578   0080   8483   0100
0000760540   0019   837F   0081   1783   8305   0085   8583   8300
0000760560   00C4   8283   8300   00E4   1B83   0105   005A   827F
0000760600   7206   7065   6572   0073   0682   6964   656D   736E
0000760620   8202   6410   7461   5F61   616C   6579   5F72   6564
0000760640   7470   0868   0882   6973   5F67   6973   657A   820A
0000760660   7307   6769   705F   7274   820C   6209   6D74   5F70
0000760700   6973   657A   8210   6208   6D74   5F70   7470   1472
0000760720   0582   7073   7261   1865   0101   8000   1801   7900
0000760740   A085   0C05   2183   8305   0522   0A82   7528   746E
0000760760   6761   6567   2964   0169   0007   8578   0180   8483
0000761000   0100   0025   837F   0086   2C83   8302   022C   8683
0000761020   8300   0081   8583   8300   0086   8283   8300   0086
0000761040   DC83   8304   051A   2083   0105   007E   827F   6902
0000761060   0064   0482   616E   656D   8204   6609   6C69   5F65
0000761100   616E   656D   8224   6509   7078   745F   5F63   6469
0000761120   8244   7404   7079   4865   0C82   6572   5F66   696C
0000761140   656E   6E5F   6D75   824A   7209   6665   745F   5F63
0000761160   6469   824C   740A   6D69   5F65   7473   6D61   5070
0000761200   0682   6F61   5F69   6469   8254   6C08   636F   7461
0000761220   6F69   586E   0982   7462   706D   695F   666E   5C6F
0000761240   0582   7073   7261   8565   0084   0101   8000   0101
0000761260   8000   0101   8000   0101   8000   0101   8000   0101
*
0000761320   8000   0701   7A00   8373   051F   0082   0101   8000
0000761340   0101   8000   0101   8000   0101   8000   0101   8000
*
0000761760   0101   8000   1801   7900   C085   0702   7683   8305
0000762000   0577   0A82   7528   746E   6761   6567   2964   0169
0000762020   0007   8578   0120   8483   0100   0016   837F   0086
0000762040   2C83   8302   04DF   8183   8300   0081   8283   8300
0000762060   0575   3801   7F00   0282   6469   8200   6E04   6D61
0000762100   0465   0482   6572   7463   8224   6104   7474   2C72
0000762120   0582   7564   6D6D   2E79   0A82   6974   656D   735F
0000762140   6174   706D   8230   7305   6170   6572   0134   0001
0000762160   0180   0001   0180   0001   0180   0001   0180   0001
*
0000762440   0180   0001   0180   0001   0180   0001   0180   0018
0000762460   8579   0110   8311   05A9   AA83   8205   280A   6E75
0000762500   6174   6767   6465   6929   3401   7F00   8583   8300
0000762520   0085   8583   8300   0085   8583   8300   0085   8183
0000762540   8300   0085   8583   8300   0085   8483   8300   0085
0000762560   8583   8300   0085   8583   8300   0085   8583   0100
0000762600   0106   827F   7409   6D69   5F65   6E75   7469   8200
0000762620   6D0F   6E69   725F   6365   726F   5F64   6974   656D
0000762640   8202   7309   6174   6962   696C   7974   8204   630F
0000762660   7061   7574   6572   745F   6D69   6F65   7475   8206
0000762700   6B0A   7965   665F   726F   616D   0874   1382   6F63
0000762720   746E   6E69   6F75   7375   745F   6172   6B63   6E69
```

THU MAR 14 17:25:16 1991 CRV_IPS.DLL PAGE 245, LINE 14397

```
0000762740  0A67  0E82  6F6D  7375  5F65  7274  6361  696B
0000762760  676E  820C  6311  7061  7574  6572  735F  6769
0000763000  616E  7574  6572  820E  680B  746F  656B  5F79
0000763020  7973  636E  8210  640C  6665  7561  746C  745F
0000763040  6D69  1265  0982  616D  5F78  6564  616C  1479
0000763060  0B82  6166  7473  725F  7065  616C  1679  0E82
0000763100  6576  6972  7966  745F  6D69  6F65  7475  8218
0000763120  770C  6961  5F74  6974  656D  756F  1A74  0C82
0000763140  7973  636E  745F  6D69  6F65  7475  821C  7409
0000763160  7268  7365  6F68  646C  821E  630C  6568  6B63
0000763200  6C5F  6F6F  756B  2070  0101  8000  0701  7800
0000763220  0085  8308  0080  0101  8000  0101  8000  0101
0000763240  8000  0101  8000  0101  8000  0101  8000  0101
*
0000763420  8000  0101  8000  0101  8000  1601  7900  0240
0000763440  CF83  8305  05D0  0A82  7528  746E  6761  6567
0000763460  2964  0169  0007  837F  0082  8283  0100  0017
0000763500  827F  6408  6665  745F  6D69  0065  0882  696D
0000763520  5F6E  6974  656D  0104  0001  0180  0001  0180
0000763540  0001  0180  0001  0180  0001  0180  0001  0180
0000763560  0016  4079  8304  05D8  D983  8205  280A  6E75
0000763600  6174  6767  6465  6929  0D01  7F00  8483  8300
0000763620  0084  8483  8300  04DC  2901  7F00  0782  6261
0000763640  5F73  6572  006C  0582  6E75  7469  0173  0C82
0000763660  7073  6365  6169  5F6C  7566  636E  8202  6404
0000763700  7369  0470  0101  8000  0101  8000  0101  8000
0000763720  1601  7900  0220  DE83  8305  05DF  0A82  7528
0000763740  746E  6761  6567  2964  0169  0007  837F  0081
0000763760  8183  0100  001E  827F  7309  6E79  5F63  6F6D
0000764000  6564  8200  730E  6E79  5F63  7865  6365  6D5F
0000764020  646F  0265  1601  7900  0230  E183  8305  05E2
0000764040  0A82  7528  746E  6761  6567  2964  0169  0007
0000764060  837F  0082  8183  0100  0019  827F  7407  6365
0000764100  5F68  6469  8200  740B  6365  5F68  6572  7361
0000764120  6E6F  0104  0001  0180  0001  0180  0001  0180
0000764140  0018  8579  0220  8303  05E7  E883  8205  280A
0000764160  6E75  6174  6767  6465  6929  0A01  7F00  2C83
0000764200  8302  022C  8683  0100  001A  827F  6905  616D
0000764220  6567  8200  6404  6669  2066  0782  6964  6666
0000764240  695F  4064  1801  7900  1085  0203  EB83  8305
0000764260  05EC  0A82  7528  746E  6761  6567  2964  0169
0000764300  0007  8578  0300  2C83  0102  0007  837F  0085
0000764320  EA83  0105  0024  827F  6E0E  6D75  6F5F  5F66
0000764340  6373  6572  6E65  0073  0F82  6D69  6761  5F65
0000764360  616E  656D  6C5F  7369  0274  1601  7900  0120
0000764400  EE83  8305  05EF  0A82  7528  746E  6761  6567
0000764420  2964  0169  0004  837F  00C0  0A01  7F00  0682
0000764440  7473  6972  676E  0100  0001  0180  0001  0180
0000764460  0001  0180  0016  3079  8302  05F4  F583  8205
0000764500  280A  6E75  6174  6767  6465  6929  0701  7F00
0000764520  8283  8300  0081  1E01  7F00  0C82  7865  6563
0000764540  7470  6F69  5F6E  6469  8200  650B  6378  5F70
0000764560  7473  7461  7375  0104  0016  2079  8302  05FA
0000764600  FB83  8205  280A  6E75  6174  6767  6465  6929
0000764620  1601  7900  0208  F883  8305  05F9  0A82  7528
0000764640  746E  6761  6567  2964  0169  0007  837F  0084
0000764660  8483  0100  001B  827F  6B08  7965  635F  646F
0000764700  0065  0C82  7773  7469  6863  735F  6174  6574
0000764720  0100  0007  837F  0081  F783  0105  0018  827F
```

THU MAR 14 17:25:16 1991 CRV_IPS.DLL PAGE 246, LINE 14456

```
0000764740  6B08  7965  745F  7079  0065  0982  656B  5F79
0000764760  6176  756C  0265  1801  7900  3085  0402  FE83
0000765000  8305  05FF  0A82  7528  746E  6761  6567  2964
0000765020  0169  0007  8578  0200  F683  0105  000D  837F
0000765040  0085  FD83  8305  0081  8183  0100  002E  827F
0000765060  7308  7165  735F  7A69  0065  0382  6573  0271
0000765100  0882  656B  5F79  7461  7274  8242  610E  7463
0000765120  7669  7461  6465  665F  6E75  4463  0101  8000
0000765140  0101  8000  0101  8000  0101  8000  0101  8000
0000765160  0101  8000  0101  8000  0101  8000  1601  7900
0000765200  0220  0983  8306  060A  0A82  7528  746E  6761
0000765220  6567  2964  0169  0007  837F  0081  8183  0100
0000765240  0017  827F  6B08  7965  615F  7474  0072  0882
0000765260  7566  636E  6B5F  7965  0102  0018  8579  0210
0000765300  8302  060C  0D83  8206  280A  6E75  6174  6767
0000765320  6465  6929  0701  7F00  8583  8300  05FD  1201
0000765340  7F00  0882  6573  5F71  6973  657A  8200  7303
0000765360  7165  0102  0001  0180  0001  0180  0001  0180
0000765400  0001  0180  0001  0180  0018  8579  02D0  8302
0000765420  0614  1583  8206  280A  6E75  6174  6767  6465
0000765440  6929  0701  7F00  7483  8305  0081  1101  7F00
0000765460  0682  6966  746C  7265  8200  6D04  646F  5865
0000765500  1801  7900  5085  0501  1783  8306  0618  0A82
0000765520  7528  746E  6761  6567  2964  0169  0010  837F
0000765540  022C  8683  8300  0081  8183  8300  0081  2B01
0000765560  7F00  0482  616E  656D  8200  6C06  6269  695F
0000765600  2064  0582  6C63  7361  2473  0582  7473  6C79
0000765620  2665  0782  706F  635F  646F  2865  0101  8000
0000765640  0101  8000  0101  8000  1B01  7900  0920  1D83
0000765660  8306  061E  0F82  5F69  5F75  736D  5F67  6170
0000765700  6172  5F6D  6974  1C01  7F00  8183  8300  0085
0000765720  8283  8300  0086  8883  8300  0080  8483  8300
0000765740  00C0  C083  0100  006A  827F  6909  755F  735F
0000765760  6F68  7472  8200  690A  755F  755F  6873  726F
0000766000  0074  0882  5F69  5F75  6F6C  676E  8200  6909
0000766020  755F  755F  6F6C  676E  8200  6909  755F  665F
0000766040  6F6C  7461  8200  6908  755F  635F  6168  0072
0000766060  0982  5F69  5F75  6375  6168  0072  0782  5F69
0000766100  5F75  7473  0072  0982  5F69  5F75  6C62  636F
0000766120  006B  1901  7900  0230  2083  8306  0621  0D82
0000766140  5F69  736D  5F67  6170  6172  5F6D  6974  0701
0000766160  7F00  8583  8300  061C  1001  7F00  0482  7974
0000766200  6570  8200  7605  6C61  6575  0102  0001  0180
0000766220  001C  8579  0090  8309  0624  2583  8206  690E
0000766240  6D5F  6773  685F  6165  6564  5F72  6974  1C01
0000766260  7F00  8183  8300  0081  8583  8300  0085  8483
0000766300  8300  0085  8583  8300  0081  8583  0100  0047
0000766320  827F  7104  695F  0064  0682  6F73  7275  6563
0000766340  8202  7003  6469  8204  7403  6469  8206  7204
0000766360  7365  0870  0882  6572  7073  745F  6469  820A
0000766400  6F07  5F70  6F63  6564  820C  7404  7079  0E65
0000766420  0482  6973  657A  0110  0015  8579  00C0  8302
0000766440  0628  2983  8206  6907  6D5F  6773  745F  0169
0000766460  0005  3078  1F83  0106  0007  837F  0623  2783
0000766500  0106  0017  827F  6806  6165  6564  0072  0A82
0000766520  6170  6172  5F6D  696C  7473  0112  0001  0180
0000766540  0001  0180  0001  0180  0001  0180  0001  0180
*
0000766720  0001  0180  0001  0180  0001  0180  0016  3079
```

THU MAR 14 17:25:16 1991 CRV_IPS.DLL PAGE 247, LINE 14515

| | | | | | | | | |
|---|---|---|---|---|---|---|---|---|
| 0000766740 | 8303 | 064B | 4C83 | 8206 | 280A | 6E75 | 6174 | 6767 |
| 0000766760 | 6465 | 6929 | 0A01 | 7F00 | 8583 | 8300 | 0085 | 8583 |
| 0000767000 | 0100 | 0022 | 827F | 7309 | 7263 | 6565 | 5F6E | 6762 |
| 0000767020 | 8200 | 6907 | 6F63 | 5F6E | 6762 | 8202 | 6808 | 5F70 |
| 0000767040 | 7263 | 736F | 0473 | 1801 | 7900 | B085 | 1001 | 4E83 |
| 0000767060 | 8306 | 064F | 0A82 | 7528 | 746E | 6761 | 6567 | 2964 |
| 0000767100 | 0169 | 0031 | 837F | 0081 | 8583 | 8300 | 0085 | 8583 |
| 0000767120 | 8300 | 0085 | 8683 | 8300 | 0086 | 8683 | 8300 | 0086 |
| 0000767140 | 8683 | 8300 | 0086 | 1783 | 8305 | 0085 | 4A83 | 8306 |
| 0000767160 | 0086 | 8583 | 0100 | 00E8 | 827F | 6403 | 7665 | 8200 |
| 0000767200 | 7409 | 7268 | 7365 | 6F68 | 646C | 8202 | 6212 | 696C |
| 0000767220 | 6B6E | 6E69 | 5F67 | 6874 | 6572 | 6873 | 6C6F | 0464 |
| 0000767240 | 1282 | 7265 | 5F72 | 6C65 | 6D65 | 745F | 7268 | 7365 |
| 0000767260 | 6F68 | 646C | 8206 | 6512 | 6378 | 5F70 | 7265 | 5F72 |
| 0000767300 | 6874 | 6572 | 6873 | 6C6F | 0864 | 0982 | 7473 | 6261 |
| 0000767320 | 6C69 | 7469 | 0A79 | 0882 | 6974 | 656D | 6F5F | 7475 |
| 0000767340 | 820E | 730D | 6E79 | 5F63 | 6974 | 656D | 6F5F | 7475 |
| 0000767360 | 8212 | 7406 | 7473 | 695F | 1664 | 0B82 | 6964 | 6666 |
| 0000767400 | 745F | 7473 | 695F | 1A64 | 0D82 | 6170 | 6572 | 746E |
| 0000767420 | 745F | 7473 | 695F | 1E64 | 0682 | 6964 | 656D | 736E |
| 0000767440 | 8222 | 6410 | 7461 | 5F61 | 616C | 6579 | 5F72 | 6564 |
| 0000767460 | 7470 | 2868 | 0C82 | 6369 | 6E6F | 635F | 6C6F | 756F |
| 0000767500 | 7372 | 822A | 610D | 696F | 785F | 726F | 635F | 6C6F |
| 0000767520 | 726F | 8230 | 690A | 746E | 7265 | 616C | 6563 | 3464 |
| 0000767540 | 1601 | 7900 | 0660 | 5183 | 8306 | 0652 | 0A82 | 7528 |
| 0000767560 | 746E | 6761 | 6567 | 2964 | 0169 | 0013 | 837F | 0085 |
| 0000767600 | 8583 | 8300 | 0085 | 8583 | 8300 | 0085 | 8583 | 0100 |
| 0000767620 | 0030 | 827F | 6C04 | 6665 | 0074 | 0362 | 6F74 | 0270 |
| 0000767640 | 0582 | 6972 | 6867 | 0474 | 0682 | 6F62 | 7474 | 6D6F |
| 0000767660 | 8206 | 7705 | 6469 | 6874 | 8208 | 6806 | 6965 | 6867 |
| 0000767700 | 0A74 | 0101 | 8000 | 0101 | 8000 | 0101 | 8000 | 1601 |
| 0000767720 | 7900 | 0340 | 5883 | 8306 | 0659 | 0A82 | 7528 | 746E |
| 0000767740 | 6761 | 6567 | 2964 | 0169 | 0007 | 737A | FC83 | 8205 |
| 0000767760 | 0100 | 000A | 837F | 0081 | 8183 | 8300 | 0657 | 2B01 |
| 0000770000 | 7F00 | 0682 | 6361 | 6974 | 6E6F | 8200 | 6E0F | 6D75 |
| 0000770020 | 6F5F | 5F66 | 6F73 | 7466 | 656B | 7379 | 8202 | 730C |
| 0000770040 | 666F | 6B74 | 7965 | 5F73 | 7470 | 0472 | 1601 | 7900 |
| 0000770060 | 0340 | 5C83 | 8306 | 065D | 0A82 | 7528 | 746E | 6761 |
| 0000770100 | 6567 | 2964 | 0169 | 0007 | 737A | 0B83 | 8206 | 0100 |
| 0000770120 | 000A | 837F | 0081 | 8183 | 8300 | 065B | 2901 | 7F00 |
| 0000770140 | 0682 | 6361 | 6974 | 6E6F | 8200 | 6E0E | 6D75 | 6F5F |
| 0000770160 | 5F66 | 6F68 | 6B74 | 7965 | 0273 | 0B82 | 6F68 | 6B74 |
| 0000770200 | 7965 | 5F73 | 7470 | 0472 | 1801 | 7900 | 7085 | 0501 |
| 0000770220 | 5F83 | 8306 | 0660 | 0A82 | 7528 | 746E | 6761 | 6567 |
| 0000770240 | 2964 | 0169 | 0010 | 837F | 022C | 8683 | 8300 | 052D |
| 0000770260 | E483 | 8300 | 0085 | 3D01 | 7F00 | 0A82 | 6D69 | 6761 |
| 0000770300 | 5F65 | 616E | 656D | 8200 | 6908 | 616D | 6567 | 695F |
| 0000770320 | 2064 | 0982 | 6D69 | 6761 | 5F65 | 7470 | 2472 | 0982 |
| 0000770340 | 616C | 6579 | 5F72 | 7470 | 2872 | 0982 | 6D69 | 6761 |
| 0000770360 | 5F65 | 6468 | 2C6C | 0101 | 8000 | 0101 | 8000 | 0101 |
| 0000770400 | 8000 | 0101 | 8000 | 1801 | 7900 | 9085 | 0201 | 6683 |
| 0000770420 | 8306 | 0667 | 0A82 | 7528 | 746E | 6761 | 6567 | 2964 |
| 0000770440 | 0169 | 0007 | 837F | 0082 | 5E83 | 0106 | 0018 | 827F |
| 0000770460 | 650C | 6378 | 7065 | 6974 | 6E6F | 695F | 0064 | 0582 |
| 0000770500 | 6D69 | 6761 | 0465 | 0101 | 8000 | 1601 | 7900 | 0340 |
| 0000770520 | 6B83 | 8306 | 066C | 0A82 | 7528 | 746E | 6761 | 6567 |
| 0000770540 | 2964 | 0169 | 0007 | 737A | 6583 | 8206 | 0100 | 000A |
| 0000770560 | 837F | 0081 | 8183 | 8300 | 066A | 2F01 | 7F00 | 0682 |
| 0000770600 | 6361 | 6974 | 6E6F | 8200 | 6E11 | 6D75 | 6F5F | 5F66 |

THU MAR 14 17:25:16 1991 CRV_IPS.DLL PAGE 248, LINE 14574

| | | | | | | | | |
|---|---|---|---|---|---|---|---|---|
| 0000770620 | 7865 | 6563 | 7470 | 6F69 | 736E | 8202 | 650E | 6378 |
| 0000770640 | 7065 | 6974 | 6E6F | 6C5F | 7369 | 0474 | 1801 | 7900 |
| 0000770660 | 5085 | 0304 | 6E83 | 8306 | 066F | 0A82 | 7528 | 746E |
| 0000770700 | 6761 | 6567 | 2964 | 0169 | 000A | 837F | 065E | 5E83 |
| 0000770720 | 8306 | 065E | 1A01 | 7F00 | 0682 | 6D69 | 6761 | 3165 |
| 0000770740 | 8200 | 6906 | 616D | 6567 | 2E32 | 0482 | 6964 | 6666 |
| 0000770760 | 015C | 0018 | 8579 | 01A0 | 8303 | 0672 | 7383 | 8206 |
| 0000771000 | 280A | 6E75 | 6174 | 6767 | 6465 | 6929 | 0701 | 7A00 |
| 0000771020 | 8373 | 065E | 0082 | 0A01 | 7F00 | 8183 | 8300 | 0671 |
| 0000771040 | 5E83 | 0106 | 0026 | 827F | 6E0E | 6D75 | 6F5F | 5F66 |
| 0000771060 | 6373 | 6572 | 6E65 | 0073 | 0A82 | 6D69 | 6761 | 5F65 |
| 0000771100 | 696C | 7473 | 6202 | 6404 | 6669 | 0666 | 1801 | 7900 |
| 0000771120 | 1085 | 0302 | 7583 | 8306 | 0676 | 0A82 | 7528 | 746E |
| 0000771140 | 6761 | 6567 | 2964 | 0169 | 000A | 837F | 022C | 2C83 |
| 0000771160 | 8302 | 0081 | 1901 | 7F00 | 0682 | 6D69 | 6761 | 3165 |
| 0000771200 | 8200 | 6906 | 616D | 6567 | 2032 | 0382 | 7563 | 4074 |
| 0000771220 | 1801 | 7900 | 4085 | 0709 | 7B83 | 8306 | 067C | 0A82 |
| 0000771240 | 7528 | 746E | 6761 | 6567 | 2964 | 0169 | 0018 | 8579 |
| 0000771260 | 0800 | 831D | 0679 | 7A83 | 8206 | 280A | 6E75 | 6174 |
| 0000771300 | 6767 | 6465 | 6929 | 5801 | 7F00 | 8483 | 8300 | 05AC |
| 0000771320 | 8483 | 8300 | 0084 | D783 | 8305 | 0081 | E783 | 8304 |
| 0000771340 | 05DD | 1383 | 8306 | 0574 | 8183 | 8300 | 065A | E083 |
| 0000771360 | 8305 | 0669 | F383 | 8305 | 0081 | 5683 | 8306 | 065E |
| 0000771400 | 6D83 | 8306 | 0670 | E983 | 8305 | 0085 | E683 | 8305 |
| 0000771420 | 0674 | ED83 | 8305 | 05A8 | 0883 | 8306 | 0616 | 8483 |
| 0000771440 | 0100 | 016F | 827F | 6B0A | 6462 | 735F | 6174 | 7574 |
| 0000771460 | 0073 | 0982 | 6574 | 7473 | 6E5F | 6D61 | 0065 | 0882 |
| 0000771500 | 656B | 5F79 | 6F63 | 6564 | 8200 | 730C | 6977 | 6374 |
| 0000771520 | 5F68 | 7473 | 7461 | 0065 | 0C82 | 6F6C | 6163 | 6F74 |
| 0000771540 | 5F72 | 6964 | 7073 | 8200 | 740E | 6172 | 6B63 | 6E69 |
| 0000771560 | 5F67 | 656C | 6576 | 006C | 0C82 | 6373 | 6C61 | 5F65 |
| 0000771600 | 6977 | 646E | 776F | 8200 | 7309 | 6E79 | 5F63 | 6F6D |
| 0000771620 | 6564 | 8200 | 660A | 6C69 | 6574 | 5F72 | 736D | 0067 |
| 0000771640 | 0682 | 6966 | 746C | 7265 | 8200 | 630B | 7275 | 6572 |
| 0000771660 | 746E | 615F | 696F | 8200 | 680C | 746F | 656B | 7379 |
| 0000771700 | 6C5F | 7369 | 0074 | 0A82 | 7973 | 636E | 655F | 6576 |
| 0000771720 | 746E | 8200 | 650E | 6378 | 7065 | 6974 | 6E6F | 6C5F |
| 0000771740 | 7369 | 0074 | 1082 | 7865 | 7063 | 735F | 6174 | 7574 |
| 0000771760 | 5F73 | 696C | 7473 | 8200 | 6D04 | 646F | 0065 | 0D82 |
| 0000772000 | 6F73 | 7466 | 656B | 7379 | 6C5F | 7369 | 0074 | 0582 |
| 0000772020 | 6D69 | 6761 | 0065 | 0782 | 6F63 | 706D | 7261 | 0065 |
| 0000772040 | 0B82 | 6177 | 7469 | 735F | 7263 | 6565 | 006E | 0A82 |
| 0000772060 | 6D69 | 6761 | 5F65 | 696C | 7473 | 8200 | 6909 | 616D |
| 0000772100 | 6567 | 6E5F | 6D75 | 8200 | 690A | 616D | 6567 | 645F |
| 0000772120 | 6669 | 0066 | 0882 | 6168 | 666C | 695F | 616D | 6567 |
| 0000772140 | 0073 | 0782 | 616D | 7373 | 6761 | 0065 | 0682 | 6170 |
| 0000772160 | 6172 | 736D | 8200 | 6608 | 6E75 | 5F63 | 656B | 0079 |
| 0000772200 | 0882 | 6369 | 6E6F | 6D5F | 6773 | 8200 | 6405 | 6D75 |
| 0000772220 | 796D | 0100 | 0016 | 837F | 0081 | 2683 | 8306 | 0081 |
| 0000772240 | CE83 | 8305 | 0678 | 8183 | 8300 | 0085 | 5A01 | 7F00 |
| 0000772260 | 0682 | 6F73 | 7275 | 6563 | 8200 | 6D0A | 6773 | 685F |
| 0000772300 | 6165 | 6564 | 0272 | 0A82 | 7665 | 6E65 | 5F74 | 7974 |
| 0000772320 | 6570 | 821A | 7406 | 6D69 | 6E69 | 1C67 | 0B82 | 7665 |
| 0000772340 | 6E65 | 5F74 | 6176 | 756C | 2465 | 0C82 | 6572 | 7574 |
| 0000772360 | 6E72 | 765F | 6C61 | 6575 | 2485 | 8201 | 7209 | 7365 |
| 0000772400 | 5F70 | 6C66 | 6761 | 2685 | 0101 | 0001 | 0180 | 0001 |
| 0000772420 | 0180 | 0001 | 0180 | 0001 | 0180 | 0001 | 0180 | 0001 |
| * | | | | | | | | |
| 0000773360 | 0180 | 0001 | 0180 | 0001 | 0180 | 0001 | 0180 | 0007 |

```
THU MAR 14 17:25:16 1991  CRV_IPS.DLL  PAGE 249, LINE 14633

0000773400  737A  7783  8206  0100  0001  0180  0001  0180
0000773420  0001  0180  0001  0180  0001  0180  0001  0180
*
0000773600  0001  0180  0001  0180  0016  3079  8303  071C
0000773620  1D83  8207  280A  6E75  6174  6767  6465  6929
0000773640  0A01  7F00  8183  8300  0081  8183  0100  001C
0000773660  827F  7006  6361  5F6B  0068  0682  6966  656C
0000773700  685F  8202  6606  6E75  5F63  0468  0101  8000
0000773720  0101  8000  0101  8000  0101  8000  0101  8000
*
0000774120  0101  8000  0501  7800  8350  0080  0501  7800
0000774140  8330  0080  0101  8000  0401  7F00  FA83  0106
0000774160  000A  8075  8183  7300  8301  0743  0101  8000
0000774200  0101  8000  0701  7800  C885  8300  0080  0501
0000774220  7800  8338  0080  0501  7800  8360  0082  0A01
0000774240  7500  8380  0081  0073  0183  0102  0007  8578
0000774260  00A0  8083  0100  0007  8578  00A0  8083  0100
0000774300  0005  4078  8083  0100  0007  8578  00D0  8083
0000774320  0100  0007  8578  00C0  8083  0100  000A  8075
0000774340  8183  6400  8300  0201  0101  8000  0701  7800
0000774360  A885  8300  0080  0701  7800  0885  8304  0080
0000774400  0501  7800  8328  0080  0501  7800  8320  0080
0000774420  0401  7F00  FA83  0106  000A  8075  8183  7300
0000774440  8301  0756  0401  7F00  FA83  0106  000A  8075
0000774460  8183  7300  8301  0758  0401  7F00  FA83  0106
0000774500  000A  8075  8183  7300  8301  075A  0401  7F00
0000774520  FA83  0106  000A  8075  8183  7300  8301  075C
0000774540  0A01  7500  8380  0200  0073  0183  0102  0004
0000774560  837F  0085  0A01  7500  8380  0200  0173  5F83
0000774600  0107  0004  837F  0085  0A01  7500  8380  0081
0000774620  0164  6183  0107  000A  8075  8183  6400  8300
0000774640  0201  0101  8000  0101  8000  0101  8000  0101
0000774660  8000  0101  8000  0101  8000  0101  8000  0101
*
0000775060  8000  0101  8000  0101  8000  0501  7800  8368
0000775100  0080  0101  8000  0101  8000  0101  8000  0101
0000775120  8000  0701  7800  0085  8301  0080  0101  8000
0000775140  0101  8000  0101  8000  0101  8000  0101  8000
*
0000775720  0101  8000  0101  8000  0101  8000  0501  7800
0000775740  8360  0080  0101  8000  0101  8000  0101  8000
0000775760  0101  8000  0101  8000  0101  8000  0101  8000
*
0001001060  1201  7900  0560  2283  8304  0423  0682  695F
0001001100  626F  6675  0169  0010  837F  00C0  8183  8300
0001001120  00C0  8083  8300  0080  2701  7F00  0482  705F
0001001140  7274  8200  5F04  6E63  0474  0582  625F  7361
0001001160  0665  0582  665F  616C  0A67  0582  665F  6C69
0001001200  0B65  0101  8000  0701  7A00  8373  0421  0082
0001001220  0101  8000  0101  8000  0101  8000  0101  8000
*
0001001260  0101  8000  0A01  7500  8380  0081  0064  0183
0001001300  0102  0001  0180  0001  0180  0001  0180  0001
0001001320  0180  0001  0180  0001  0180  0001  0180  0001
*
0001001620  0180  0001  0180  0007  737A  6683  8204  0100
0001001640  000A  8075  8183  6400  8300  0201  0101  8000
0001001660  0101  8000  0101  8000  0101  8000  0101  8000
*
```

```
THU MAR 14 17:25:16 1991  CRV_IPS.DLL  PAGE 250, LINE 14692

0001001740  0101  8000  0101  8000  0101  8000  0A01  7500
0001001760  8380  0200  0064  0183  0102  0001  0180  0001
0001002000  0180  0001  0180  0001  0180  0001  0180  0001
*
0001002740  0180  0016  2079  8302  04F3  F483  8204  280A
0001002760  6E75  6174  6767  6465  6929  0701  7F00  8183
0001003000  8300  0081  0901  7F00  0182  0078  0182  0279
0001003020  1601  7900  0240  F683  8304  04F7  0A82  7528
0001003040  746E  6761  6567  2964  0169  0007  837F  04F2
0001003060  F283  0104  000D  827F  6D03  6E69  8200  6D03
0001003100  7861  0104  0001  0180  0016  2079  8302  04FA
0001003120  FB83  8204  280A  6E75  6174  6767  6465  6929
0001003140  0701  7F00  8583  8300  0085  1201  7F00  0582
0001003160  6977  7464  0068  0682  6568  6769  7468  0102
0001003200  0001  0180  0016  4079  8302  04FE  FF83  8204
0001003220  280A  6E75  6174  6767  6465  6929  0701  7F00
0001003240  F283  8304  04F9  1101  7F00  0682  726F  6769
0001003260  6E69  8200  6104  6572  0461  0101  8000  0101
0001003300  8000  0101  8000  0101  8000  0101  8000  0101
*
0001003540  8000  0101  8000  0101  8000  0101  8000  1601
0001003560  7900  0330  2E83  8305  052F  0A82  7528  746E
0001003600  6761  6567  2964  0169  000A  837F  0085  8583
0001003620  8300  0085  1A01  7F00  0582  6977  7464  0068
0001003640  0682  6568  6769  7468  8202  6405  7065  6874
0001003660  0104  0018  8579  0140  8308  0532  3383  8205
0001003700  280A  6E75  6174  6767  6465  6929  0701  7800
0001003720  8085  8300  0084  1901  7F00  8183  8300  052D
0001003740  8583  8300  0085  C483  8300  0082  E483  8300
0001003760  0531  5A01  7F00  0682  6572  7270  7365  8200
0001004000  6406  6D69  6E65  0273  1082  6164  6174  6C5F
0001004020  7961  7265  645F  7065  6874  8208  7308  6769
0001004040  735F  7A69  0A65  0782  6973  5F67  7470  0C72
0001004060  0982  7462  706D  735F  7A69  1065  0882  7462
0001004100  706D  705F  7274  8214  7305  6170  6572  0118
0001004120  0001  0180  0018  8579  05A0  830C  0537  3883
0001004140  8205  280A  6E75  6174  6767  6465  6929  0701
0001004160  7800  8085  8301  0084  2501  7F00  8683  8300
0001004200  022C  2C83  8302  0086  8183  8300  0085  8683
0001004220  8300  0082  8683  8300  04F2  3083  8305  0536
0001004240  7E01  7F00  0282  6469  8200  6E04  6D61  0465
0001004260  0982  6966  656C  6E5F  6D61  2465  0982  7865
0001004300  5F70  6374  695F  4464  0482  7974  6570  8248
0001004320  720C  6665  6C5F  6E69  5F65  756E  4A6D  0982
0001004340  6572  5F66  6374  695F  4C64  0A82  6974  656D
0001004360  735F  6174  706D  8250  6106  696F  695F  5464
0001004400  0882  6F6C  6163  6974  6E6F  8258  6209  6D74
0001004420  5F70  6E69  6F66  825C  7305  6170  6572  8485
0001004440  0100  0001  0180  0001  0180  0001  0180  0001
0001004460  0180  0001  0180  0001  0180  0001  0180  0001
0001004500  0180  0001  0180  0001  0180  0007  737A  3583
0001004520  8205  0100  0001  0180  0001  0180  0001  0180
0001004540  0001  0180  0001  0180  0001  0180  0001  0180
*
0001005140  0001  0180  0001  0180  0001  0180  0018  8579
0001005160  02C0  8307  058C  8D83  8205  280A  6E75  6174
0001005200  6767  6465  6929  0701  7800  2085  8301  0084
0001005220  1601  7F00  8683  8300  022C  F583  8304  0081
0001005240  8183  8300  0082  8B83  0105  0038  827F  6902
```

```
THU MAR 14 17:25:16 1991  CRV_IPS.DLL  PAGE 251, LINE 14751

0001005260  0064  0482  616E  656D  8204  7204  6365  2474
0001005300  0482  7461  7274  822C  6405  6D75  796D  822E
0001005320  740A  6D69  5F65  7473  6D61  3070  0582  7073
0001005340  7261  3465  0101  8000  0101  8000  0101  8000
0001005360  0101  8000  0101  8000  0101  8000  0101  8000
*
0001005560  1801  7900  1085  1101  B283  8305  05B3  0A82
0001005600  7528  746E  6761  6567  2964  0169  0034  837F
0001005620  0085  8583  8300  0085  8583  8300  0085  8583
0001005640  8300  0081  8583  8300  0085  8583  8300  0084
0001005660  8583  8300  0085  8583  8300  0085  8583  8300
0001005700  0085  0601  7F01  0982  6974  656D  755F  696E
0001005720  0074  0F82  696D  5F6E  6572  6F63  6472  745F
0001005740  6D69  0265  0982  7473  6261  6C69  7469  0479
0001005760  0F82  6163  7470  7275  5F65  6974  656D  756F
0001006000  0674  0A82  656B  5F79  6F66  6D72  7461  8208
0001006020  6313  6E6F  6974  756E  756F  5F73  7274  6361
0001006040  696B  676E  820A  6D0E  756F  6573  745F  6172
0001006060  6B63  6E69  0C67  1182  6163  7470  7275  5F65
0001006100  6973  6E67  7461  7275  0E65  0B82  6F68  6B74
0001006120  7965  735F  6E79  1063  0C82  6564  6166  6C75
0001006140  5F74  6974  656D  8212  6D09  7861  645F  6C65
0001006160  7961  8214  660B  7361  5F74  6572  6C70  7961
0001006200  8216  760E  7265  6669  5F79  6974  656D  756F
0001006220  1874  0C82  6177  7469  745F  6D69  6F65  7475
0001006240  821A  730C  6E79  5F63  6974  656D  756F  1C74
0001006260  0982  6874  6572  6873  6C6F  1E64  0C82  6863
0001006300  6365  5F6B  6F6C  6B6F  7075  0120  0001  0180
0001006320  0007  8578  0800  8083  0100  0001  0180  0001
0001006340  0180  0001  0180  0001  0180  0001  0180  0001
*
0001006520  0180  0001  0180  0001  0180  0001  0180  0016
0001006540  4079  8302  05D8  D983  8205  280A  6E75  6174
0001006560  6767  6465  6929  0701  7F00  8283  8300  0082
0001006600  1701  7F00  0882  6564  5F66  6974  656D  8200
0001006620  6D08  6E69  745F  6D69  0465  0101  8000  0101
0001006640  8000  0101  8000  0101  8000  0101  8000  0101
0001006660  8000  1601  7900  0440  E183  8305  05E2  0A82
0001006700  7528  746E  6761  6567  2964  0169  000D  837F
0001006720  0084  8483  8300  0084  F283  0104  0029  827F
0001006740  6107  7362  725F  6C65  8200  7505  696E  7374
0001006760  8201  730C  6570  6963  6C61  665F  6E75  0263
0001007000  0482  6964  7073  0104  0001  0180  0001  0180
0001007020  0001  0180  0016  2079  8302  05E7  E883  8205
0001007040  280A  6E75  6174  6767  6465  6929  0701  7F00
0001007060  8183  8300  0081  1E01  7F00  0982  7973  636E
0001007100  6D5F  646F  0065  0E82  7973  636E  655F  6578
0001007120  5F63  6F6D  6564  0102  0016  3079  8302  05EA
0001007140  EB83  8205  280A  6E75  6174  6767  6465  6929
0001007160  0701  7F00  8283  8300  0081  1901  7F00  0782
0001007200  6574  6863  695F  0064  0B82  6574  6863  725F
0001007220  6165  6F73  646E  0101  8000  0101  8000  0101
0001007240  8000  1801  7900  2085  0302  F083  8305  05F1
0001007260  0A82  7528  746E  6761  6567  2964  0169  000A
0001007300  837F  022C  2C83  8302  0086  1A01  7F00  0582
0001007320  6D69  6761  0065  0482  6964  6666  8220  6407
0001007340  6669  5F66  6469  0140  0018  8579  0310  8302
0001007360  05F4  F583  8205  280A  6E75  6174  6767  6465
0001007400  6929  0701  7800  0085  8303  022C  0701  7F00
```

```
THU MAR 14 17:25:16 1991  CRV_IPS.DLL  PAGE 252, LINE 14810

0001007420  8583  8300  05F3  2401  7F00  0E82  756E  5F6D
0001007440  666F  735F  7263  6565  736E  8200  690F  616D
0001007460  6567  6E5F  6D61  5F65  696C  7473  0102  0016
0001007500  2079  8301  05F7  F883  8205  280A  6E75  6174
0001007520  6767  6465  6929  0401  7F00  C083  0100  000A
0001007540  827F  7306  7274  6E69  0067  0101  8000  0101
0001007560  8000  0101  8000  1601  7900  0230  FD83  8305
0001007600  05FE  0A82  7528  746E  6761  6567  2964  0169
0001007620  0007  837F  0082  8183  0100  001E  827F  650C
0001007640  6378  7065  6974  6E6F  695F  0064  0B82  7865
0001007660  7063  735F  6174  7574  0473  1601  7900  0220
0001007700  0383  8306  0604  0A82  7528  746E  6761  6567
0001007720  2964  0169  0016  0879  8302  0601  0283  8206
0001007740  280A  6E75  6174  6767  6465  6929  0701  7F00
0001007760  8483  8300  0084  1B01  7F00  0882  656B  5F79
0001010000  6F63  6564  8200  730C  6977  6374  5F68  7473
0001010020  7461  0065  0701  7F00  8183  8300  0600  1801
0001010040  7F00  0882  656B  5F79  7974  6570  8200  6B09
0001010060  7965  765F  6C61  6575  0102  0018  8579  0230
0001010100  8304  0607  0883  8206  280A  6E75  6174  6767
0001010120  6465  6929  0701  7800  0085  8302  05FF  0D01
0001010140  7F00  8583  8300  0606  8183  8300  0081  2E01
0001010160  7F00  0882  6573  5F71  6973  657A  8200  7303
0001010200  7165  8202  6B08  7965  615F  7474  4272  0E82
0001010220  6361  6974  6176  6574  5F64  7566  636E  0144
0001010240  0001  0180  0001  0180  0001  0180  0001  0180
*
0001010300  0016  2079  8302  0612  1383  8206  280A  6E75
0001010320  6174  6767  6465  6929  0701  7F00  8183  8300
0001010340  0081  1701  7F00  0882  656B  5F79  7461  7274
0001010360  8200  6608  6E75  5F63  656B  0279  1801  7900
0001010400  1085  0202  1583  8306  0616  0A82  7528  746E
0001010420  6761  6567  2964  0169  0007  837F  0085  0683
0001010440  0106  0012  827F  7308  7165  735F  7A69  0065
0001010460  0382  6573  0271  0101  8000  0101  8000  0101
0001010500  8000  0101  8000  0101  8000  1801  7900  D085
0001010520  0202  1D83  8306  061E  0A82  7528  746E  6761
0001010540  6567  2964  0169  0007  837F  058A  8183  0100
0001010560  0011  827F  6606  6C69  6574  0072  0482  6F6D
0001010600  6564  0158  0018  8579  0150  8305  0620  2183
0001010620  8206  280A  6E75  6174  6767  6465  6929  1001
0001010640  7F00  2C83  8302  0086  8183  8300  0081  8183
0001010660  0100  002B  827F  6E04  6D61  0065  0682  696C
0001010700  5F62  6469  8220  6305  616C  7373  8224  7305
0001010720  7974  656C  8226  6F07  5F70  6F63  6564  0128
0001010740  0001  0180  0001  0180  0001  0180  001B  2079
0001010760  8309  0626  2783  8206  690F  755F  6D5F  6773
0001011000  705F  7261  6D61  745F  0169  001C  837F  0081
0001011020  8583  8300  0082  8683  8300  0088  8083  8300
0001011040  0084  C083  8300  00C0  6A01  7F00  0982  5F69
0001011060  5F75  6873  726F  0074  0A82  5F69  5F75  7375
0001011100  6F68  7472  8200  6908  755F  6C5F  6E6F  0067
0001011120  0982  5F69  5F75  6C75  6E6F  0067  0982  5F69
0001011140  5F75  6C66  616F  0074  0882  5F69  5F75  6863
0001011160  7261  8200  6909  755F  755F  6863  7261  8200
0001011200  6907  755F  735F  7274  8200  6909  755F  625F
0001011220  6F6C  6B63  0100  0019  3079  8302  0629  2A83
0001011240  8206  690D  6D5F  6773  705F  7261  6D61  745F
0001011260  0169  0007  837F  0085  2583  0106  0010  827F
```

THU MAR 14 17:25:16 1991 CRV_IPS.DLL PAGE 253, LINE 14869

| | | | | | | | | |
|---|---|---|---|---|---|---|---|---|
| 0001011300 | 7404 | 7079 | 0065 | 0582 | 6176 | 756C | 0265 | 0101 |
| 0001011320 | 8000 | 1C01 | 7900 | 9085 | 0900 | 2D83 | 8306 | 062E |
| 0001011340 | 0E82 | 5F69 | 736D | 5F67 | 6568 | 6461 | 7265 | 745F |
| 0001011360 | 0169 | 001C | 837F | 0081 | 8183 | 8300 | 0085 | 8583 |
| 0001011400 | 8300 | 0084 | 8583 | 8300 | 0085 | 8183 | 8300 | 0085 |
| 0001011420 | 4701 | 7F00 | 0482 | 5F71 | 6469 | 8200 | 7306 | 756F |
| 0001011440 | 6372 | 0265 | 0382 | 6970 | 0464 | 0382 | 6974 | 0664 |
| 0001011460 | 0482 | 6572 | 7073 | 8208 | 7208 | 7365 | 5F70 | 6974 |
| 0001011500 | 0A64 | 0782 | 706F | 635F | 646F | 0C65 | 0482 | 7974 |
| 0001011520 | 6570 | 820E | 7304 | 7A69 | 1065 | 1501 | 7900 | C085 |
| 0001011540 | 0200 | 3183 | 8306 | 0632 | 0782 | 5F69 | 736D | 5F67 |
| 0001011560 | 6974 | 0501 | 7800 | 8330 | 0628 | 0701 | 7F00 | 2C83 |
| 0001011600 | 8306 | 0630 | 1701 | 7F00 | 0682 | 6568 | 6461 | 7265 |
| 0001011620 | 8200 | 700A | 7261 | 6D61 | 6C5F | 7369 | 1274 | 0101 |
| 0001011640 | 8000 | 0101 | 8000 | 0101 | 8000 | 0101 | 8000 | 0101 |
| * | | | | | | | | |
| 0001012020 | 8000 | 0101 | 8000 | 0101 | 8000 | 0101 | 8000 | 1601 |
| 0001012040 | 7900 | 0330 | 5483 | 8306 | 0655 | 0A82 | 7528 | 746E |
| 0001012060 | 6761 | 6567 | 2964 | 0169 | 000A | 837F | 0085 | 8583 |
| 0001012100 | 8300 | 0085 | 2201 | 7F00 | 0982 | 6373 | 6572 | 6E65 |
| 0001012120 | 625F | 0067 | 0782 | 6369 | 6E6F | 625F | 0267 | 0882 |
| 0001012140 | 7068 | 635F | 6F72 | 7373 | 0104 | 0018 | 8579 | 01B0 |
| 0001012160 | 8310 | 0657 | 5883 | 8206 | 280A | 6E75 | 6174 | 6767 |
| 0001012200 | 6465 | 6929 | 3101 | 7F00 | 8183 | 8300 | 0085 | 8583 |
| 0001012220 | 8300 | 0085 | 8583 | 8300 | 0086 | 8683 | 8300 | 0086 |
| 0001012240 | 8683 | 8300 | 0086 | 8683 | 8300 | 052D | 8583 | 8300 |
| 0001012260 | 0653 | 8683 | 8300 | 0085 | E801 | 7F00 | 0382 | 6564 |
| 0001012300 | 0076 | 0982 | 6874 | 6572 | 6873 | 6C6F | 0264 | 1282 |
| 0001012320 | 6C62 | 6E69 | 696B | 676E | 745F | 7268 | 7365 | 6F68 |
| 0001012340 | 646C | 8204 | 6512 | 7272 | 655F | 656C | 5F6D | 6874 |
| 0001012360 | 6572 | 6873 | 6C6F | 0664 | 1282 | 7865 | 7063 | 655F |
| 0001012400 | 7272 | 745F | 7268 | 7365 | 6F68 | 646C | 8208 | 7309 |
| 0001012420 | 6174 | 6962 | 696C | 7974 | 820A | 7408 | 6D69 | 5F65 |
| 0001012440 | 756F | 0E74 | 0D82 | 7973 | 636E | 745F | 6D69 | 5F65 |
| 0001012460 | 756F | 1274 | 0682 | 7374 | 5F74 | 6469 | 8216 | 640B |
| 0001012500 | 6669 | 5F66 | 7374 | 5F74 | 6469 | 821A | 700D | 7261 |
| 0001012520 | 6E65 | 5F74 | 7374 | 5F74 | 6469 | 821E | 6406 | 6D69 |
| 0001012540 | 6E65 | 2273 | 1082 | 6164 | 6174 | 6C5F | 7961 | 7265 |
| 0001012560 | 645F | 7065 | 6874 | 8228 | 690C | 6F63 | 5F6E | 6F63 |
| 0001012600 | 6F6C | 7275 | 2A73 | 0D82 | 6F61 | 5F69 | 6F78 | 5F72 |
| 0001012620 | 6F63 | 6F6C | 3072 | 0A82 | 6E69 | 6574 | 6C72 | 6361 |
| 0001012640 | 6465 | 0134 | 0001 | 0180 | 0001 | 0180 | 0001 | 0180 |
| 0001012660 | 0001 | 0180 | 0001 | 0180 | 0001 | 0180 | 0016 | 4079 |
| 0001012700 | 8303 | 0661 | 6283 | 8206 | 280A | 6E75 | 6174 | 6767 |
| 0001012720 | 6465 | 6929 | 0701 | 7A00 | 8373 | 0605 | 0082 | 0A01 |
| 0001012740 | 7F00 | 8183 | 8300 | 0081 | 6083 | 0106 | 002B | 827F |
| 0001012760 | 6106 | 7463 | 6F69 | 006E | 0F82 | 756E | 5F6D | 666F |
| 0001013000 | 735F | 666F | 6B74 | 7965 | 0273 | 0C82 | 6F73 | 7466 |
| 0001013020 | 656B | 7379 | 705F | 7274 | 0104 | 0016 | 4079 | 8303 |
| 0001013040 | 0665 | 6683 | 8206 | 280A | 6E75 | 6174 | 6767 | 6465 |
| 0001013060 | 6929 | 0701 | 7A00 | 8373 | 0614 | 0082 | 0A01 | 7F00 |
| 0001013100 | 8183 | 8300 | 0081 | 6483 | 0106 | 0029 | 827F | 6106 |
| 0001013120 | 7463 | 6F69 | 006E | 0E82 | 756E | 5F6D | 666F | 685F |
| 0001013140 | 746F | 656B | 7379 | 8202 | 680B | 746F | 656B | 7379 |
| 0001013160 | 705F | 7274 | 0104 | 0018 | 8579 | 0170 | 8305 | 0668 |
| 0001013200 | 6983 | 8206 | 280A | 6E75 | 6174 | 6767 | 6465 | 6929 |
| 0001013220 | 1001 | 7F00 | 2C83 | 8302 | 0086 | 4383 | 8305 | 00E4 |
| 0001013240 | 8583 | 0100 | 003D | 827F | 690A | 616D | 6567 | 6E5F |
| 0001013260 | 6D61 | 0065 | 0882 | 6D69 | 6761 | 5F65 | 6469 | 8220 |

THU MAR 14 17:25:16 1991 CRV_IPS.DLL PAGE 254, LINE 14928

| | | | | | | | | |
|---|---|---|---|---|---|---|---|---|
| 0001013300 | 6909 | 616D | 6567 | 705F | 7274 | 8224 | 6C09 | 7961 |
| 0001013320 | 7265 | 705F | 7274 | 8228 | 6909 | 616D | 6567 | 685F |
| 0001013340 | 6C64 | 012C | 0001 | 0180 | 0001 | 0180 | 0001 | 0180 |
| 0001013360 | 0001 | 0180 | 0018 | 8579 | 0190 | 8302 | 066F | 7083 |
| 0001013400 | 8206 | 280A | 6E75 | 6174 | 6767 | 6465 | 6929 | 0701 |
| 0001013420 | 7F00 | 8283 | 8300 | 0667 | 1801 | 7F00 | 0C82 | 7865 |
| 0001013440 | 6563 | 7470 | 6F69 | 5F6E | 6469 | 8200 | 6905 | 616D |
| 0001013460 | 6567 | 0104 | 0001 | 0180 | 0016 | 4079 | 8303 | 0674 |
| 0001013500 | 7583 | 8206 | 280A | 6E75 | 6174 | 6767 | 6465 | 6929 |
| 0001013520 | 0701 | 7A00 | 8373 | 066E | 0082 | 0A01 | 7F00 | 8183 |
| 0001013540 | 8300 | 0081 | 7383 | 0106 | 002F | 827F | 6106 | 7463 |
| 0001013560 | 6F69 | 006E | 1182 | 756E | 5F6D | 666F | 655F | 6378 |
| 0001013600 | 7065 | 6974 | 6E6F | 0273 | 0E82 | 7865 | 6563 | 7470 |
| 0001013620 | 6F69 | 5F6E | 696C | 7473 | 0104 | 0018 | 8579 | 0450 |
| 0001013640 | 8303 | 0677 | 7883 | 8206 | 280A | 6E75 | 6174 | 6767 |
| 0001013660 | 6465 | 6929 | 0A01 | 7F00 | 6783 | 8306 | 0667 | 6783 |
| 0001013700 | 0106 | 001A | 827F | 6906 | 616D | 6567 | 0031 | 0682 |
| 0001013720 | 6D69 | 6761 | 3265 | 822E | 6404 | 6669 | 5C66 | 1801 |
| 0001013740 | 7900 | A085 | 0301 | 7B83 | 8306 | 067C | 0A82 | 7528 |
| 0001013760 | 746E | 6761 | 6567 | 2964 | 0169 | 00C7 | 737A | 6783 |
| 0001014000 | 8206 | 0100 | 000A | 837F | 0081 | 7A83 | 8306 | 0667 |
| 0001014020 | 2601 | 7F00 | 0E82 | 756E | 5F6D | 666F | 735F | 7263 |
| 0001014040 | 6565 | 736E | 8200 | 690A | 616D | 6567 | 6C5F | 7369 |
| 0001014060 | 0274 | 0482 | 6964 | 6666 | 0106 | 0018 | 8579 | 0210 |
| 0001014100 | 8303 | 067E | 7F83 | 8206 | 280A | 6E75 | 6174 | 6767 |
| 0001014120 | 6465 | 6929 | 0A01 | 7F00 | 2C83 | 8302 | 022C | 8183 |
| 0001014140 | 0100 | 0019 | 827F | 6906 | 616D | 6567 | 0031 | 0682 |
| 0001014160 | 6D69 | 6761 | 3265 | 8220 | 6303 | 7475 | 0140 | 0018 |
| 0001014200 | 8579 | 0940 | 8307 | 0684 | 8583 | 8206 | 280A | 6E75 |
| 0001014220 | 6174 | 6767 | 6465 | 6929 | 1801 | 7900 | 0085 | 1D08 |
| 0001014240 | 8283 | 8306 | 0683 | 0A82 | 7528 | 746E | 6761 | 6567 |
| 0001014260 | 2964 | 0169 | 0058 | 837F | 0084 | B583 | 8305 | 0084 |
| 0001014300 | 8483 | 8300 | 05E0 | 8183 | 8300 | 04FD | E683 | 8305 |
| 0001014320 | 061C | 8A83 | 8305 | 0081 | 6383 | 8306 | 05E9 | 7283 |
| 0001014340 | 8306 | 05FC | 8183 | 8300 | 065F | 6783 | 8306 | 0676 |
| 0001014360 | 7983 | 8306 | 05F2 | 8583 | 8300 | 05EF | 7D83 | 8306 |
| 0001014400 | 05F6 | B183 | 8305 | 0611 | 1F83 | 8306 | 0084 | 6F01 |
| 0001014420 | 7F01 | 0A82 | 626B | 5F64 | 7473 | 7461 | 7375 | 8200 |
| 0001014440 | 7409 | 7365 | 5F74 | 616E | 656D | 8200 | 6B08 | 7965 |
| 0001014460 | 635F | 646F | 0065 | 0C82 | 7773 | 7469 | 6863 | 735F |
| 0001014500 | 6174 | 6574 | 8200 | 6C0C | 636F | 7461 | 726F | 645F |
| 0001014520 | 7369 | 0070 | 0E82 | 7274 | 6361 | 696B | 676E | 6C5F |
| 0001014540 | 7665 | 6C65 | 8200 | 730C | 6163 | 656C | 775F | 6E69 |
| 0001014560 | 6F64 | 0077 | 0982 | 7973 | 636E | 6D5F | 646F | 0065 |
| 0001014600 | 0A82 | 6966 | 746C | 7265 | 6D5F | 6773 | 8200 | 6606 |
| 0001014620 | 6C69 | 6574 | 0072 | 0B82 | 7563 | 7272 | 6E65 | 5F74 |
| 0001014640 | 6F61 | 0069 | 0C82 | 6F68 | 6B74 | 7965 | 5F73 | 696C |
| 0001014660 | 7473 | 8200 | 730A | 6E79 | 5F63 | 7665 | 6E65 | 0074 |
| 0001014700 | 0E82 | 7865 | 6563 | 7470 | 6F69 | 5F6E | 696C | 7473 |
| 0001014720 | 8200 | 6510 | 6378 | 5F70 | 7473 | 7461 | 7375 | 6C5F |
| 0001014740 | 7369 | 0074 | 0482 | 6F6D | 6564 | 8200 | 730D | 666F |
| 0001014760 | 6B74 | 7965 | 5F73 | 696C | 7473 | 8200 | 6905 | 616D |
| 0001015000 | 6567 | 8200 | 6307 | 6D6F | 6170 | 6572 | 8200 | 770B |
| 0001015020 | 6961 | 5F74 | 6373 | 6572 | 6E65 | 8200 | 690A | 616D |
| 0001015040 | 6567 | 6C5F | 7369 | 0074 | 0982 | 6D69 | 6761 | 5F65 |
| 0001015060 | 756E | 006D | 0A82 | 6D69 | 6761 | 5F65 | 6964 | 6666 |
| 0001015100 | 8200 | 680B | 6C61 | 5F66 | 6D69 | 6761 | 7365 | 8200 |
| 0001015120 | 6D07 | 7361 | 6173 | 6567 | 8200 | 7006 | 7261 | 6D61 |
| 0001015140 | 0073 | 0882 | 7566 | 636E | 6B5F | 7965 | 8200 | 6908 |

```
THU MAR 14 17:25:16 1991  CRV_IPS.DLL  PAGE 255, LINE 14987

0001015160  6F63  5F6E  736D  0067  0582  7564  6D6D  0079
0001015200  1601  7F00  8183  8300  062F  8183  8300  05D7
0001015220  8183  8306  0081  8583  0100  005A  827F  7306
0001015240  756F  6372  0065  0A82  736D  5F67  6568  6461
0001015260  7265  8202  650A  6576  746E  745F  7079  1A65
0001015300  0682  6974  696D  676E  821C  650B  6576  746E
0001015320  765F  6C61  6575  8224  720C  7465  7275  5F6E
0001015340  6176  756C  8565  0124  0982  6572  7073  665F
0001015360  616C  8567  0126  0101  8000  0101  8000  0101
0001015400  8000  0101  8000  0101  8000  0101  8000  0101
*
0001015440  8000  0101  8000  0101  8000  0701  7A00  8373
0001015460  0680  0082  0101  8000  0101  8000  0101  8000
0001015500  0101  8000  0101  8000  0101  8000  0101  8000
*
0001017060  1601  7900  0220  5483  8307  0755  0A82  7528
0001017100  746E  6761  6567  2964  0169  0007  837F  0085
0001017120  8583  0100  0009  827F  7801  8200  7901  0102
0001017140  0016  2079  8302  0757  5883  8207  280A  6E75
0001017160  6174  6767  6465  6929  0701  7F00  8583  8300
0001017200  0085  0B01  7F00  0282  7863  8200  6302  0279
0001017220  1601  7900  0240  5A83  8307  075B  0A82  7528
0001017240  746E  6761  6567  2964  0169  0007  837F  0753
0001017260  5683  0107  000C  827F  7002  0031  0382  6973
0001017300  047A  0101  8000  0101  8000  0101  8000  1801
0001017320  7900  B085  0700  6083  8307  0761  0A82  7528
0001017340  746E  6761  6567  2964  0169  0016  837F  0759
0001017360  8583  8300  0081  8183  8300  0081  8183  8300
0001017400  0086  3A01  7F00  0882  6572  7463  705F  7261
0001017420  8200  6407  7269  705F  7261  8208  6D05  7861
0001017440  785F  820A  6D05  6E69  785F  820C  6402  0E78
0001017460  0282  7964  8210  7407  6D69  6F65  7475  0112
0001017500  0018  8579  00A0  8307  0763  6483  8207  280A
0001017520  6E75  6174  6767  6465  6929  1601  7F00  8183
0001017540  8300  0759  8183  8300  0081  8183  8300  0081
0001017560  8183  0100  0037  827F  7206  7365  6C75  0074
0001017600  0482  6572  7463  8202  6402  0A78  0282  7964
0001017620  820C  6D05  7861  785F  820E  6D05  6E69  785F
0001017640  8210  7209  6365  5F74  7974  6570  0112  0016
0001017660  6079  8303  0766  6783  8207  280A  6E75  6174
0001017700  6767  6465  6929  0A01  7F00  8683  8300  0086
0001017720  8683  0100  0038  827F  630B  6E6F  7274  6C6F
0001017740  705F  7274  8200  6D14  756F  6573  655F  6576
0001017760  746E  735F  6E65  5F74  7470  0472  0F82  6369
0001020000  6E6F  735F  6165  6372  5F68  7470  0872  0101
0001020020  8000  0101  8000  0101  8000  0101  8000  0101
0001020040  8000  0101  8000  1601  7900  0770  6F83  8307
0001020060  0770  0A82  7528  746E  6761  6567  2964  0169
0001020100  0016  837F  0085  8583  8300  0085  8583  8300
0001020120  0085  8583  8300  0085  2E01  7F00  0182  0078
0001020140  0182  0279  0782  6369  6E6F  695F  0464  0482
0001020160  656C  7466  8206  7205  6769  7468  8208  7502
0001020200  0A70  0482  6F64  6E77  010C  0016  2079  8302
0001020220  0772  7383  8207  280A  6E75  6174  6767  6465
0001020240  6929  0701  7F00  8583  8300  0085  1101  7F00
0001020260  0482  6F6D  6564  8200  7206  7365  6C75  0274
0001020300  0101  8000  0101  8000  0101  8000  0101  8000
*
0001020400  1101  7900  0085  0420  8783  8307  0788  0382
```

```
THU MAR 14 17:25:16 1991  CRV_IPS.DLL  PAGE 256, LINE 15046

0001020420  6373  696C  0701  7800  0085  8308  0081  0701
0001020440  7800  0085  8308  0085  0D01  7F00  8583  8307
0001020460  0786  8583  8307  0786  2301  7F00  0482  7078
0001020500  7869  8200  7804  6572  856D  0100  0482  707?
0001020520  7869  0085  8202  7904  6572  856D  0300  1301
0001020540  7900  0550  8A83  8307  078B  0782  6F6C  5F63
0001020560  6F6D  6976  1001  7F00  8583  8300  0081  8183
0001020600  8300  0081  8183  0100  0047  827F  6E0B  5F6F
0001020620  666F  735F  6574  7370  8200  780B  735F  6574
0001020640  5F70  6973  657A  8202  790B  735F  6574  5F70
0001020660  6973  657A  8204  780B  6C5F  7361  5F74  7473
0001020700  7065  8206  790B  6C5F  7361  5F74  7473  7065
0001020720  0108  0001  0180  0001  0180  000A  8075  0083
0001020740  6402  8302  078F  0701  7F00  8183  8300  0081
0001020760  0701  7A00  8373  04FD  0082  0101  8000  0101
0001021000  8000  0701  7A00  8373  0789  0082  0101  8000
0001021020  0101  8000  n101  8000  0101  8000  0101  8000
*
0001021120  0101  8000  0A01  7500  8380  0081  0264  A783
0001021140  0107  0007  837F  0081  8183  0100  0001  0180
0001021160  0001  0180  0016  3079  8303  07AB  AC83  8207
0001021200  280A  6E75  6174  6767  6465  6929  0A01  7F00
0001021220  8183  8300  0081  8183  0100  001C  827F  7006
0001021240  6361  5F6B  0068  0682  6966  656C  685F  8202
0001021260  6606  6E75  5F63  0468  0101  8000  0101  8000
0001021300  0101  8000  0101  8000  0101  8000  0101  8000
*
0001021500  0501  7800  8350  0080  0501  7800  8330  0080
0001021520  0701  7800  7085  8302  07D2  0501  7800  8330
0001021540  0081  0501  7800  8340  0081  0101  8000  0501
0001021560  7800  8370  0080  0501  7800  8368  0080  0701
0001021600  7800  A085  8300  0080  0501  7800  8358  0080
0001021620  0701  7800  8085  8300  0080  0701  7800  8885
0001021640  8300  0080  0501  7800  8360  0080  0701  7800
0001021660  9885  8300  0080  0701  7800  A085  8301  00C0
0001021700  0701  7800  0085  8328  0081  0701  7800  0085
0001021720  831E  0081  0A01  7500  8380  0200  0564  E183
0001021740  0107  0010  837F  0081  C183  8300  00C1  C183
0001021760  8300  00C1  0101  8000  0101  8000  0A01  7500
0001022000  8380  0081  0564  E583  0107  0010  837F  0081
0001022020  8183  8300  0081  8183  8300  00C5  0A01  7500
0001022040  8380  0081  0664  E783  0107  0013  837F  0085
0001022060  8183  8300  0081  8183  8300  00C1  C183  0100
0001022100  0004  837F  0693  0A01  7500  8380  0081  0164
0001022120  E883  0107  0001  0180  0007  8578  00B8  8083
0001022140  0100  0007  8578  00B8  8083  0100  0005  3878
0001022160  8083  0100  0005  6078  8283  0100  0005  4078
0001022200  8083  0100  0004  837F  0693  0A01  7500  8380
0001022220  0081  0164  F083  0107  0007  8578  00A8  8083
0001022240  0100  0007  8578  00A8  8083  0100  0004  837F
0001022260  0693  0A01  7500  8380  0081  0164  F483  0107
0001022300  0007  8578  00A0  8083  0100  0007  8578  00C0
0001022320  8083  0100  0007  8578  0110  8083  0100  0004
0001022340  837F  0693  0A01  7500  8380  0081  0164  F983
0001022360  0107  000A  8075  8183  6400  8300  0201  0101
0001022400  8000  0701  7800  E085  8300  0080  0701  7800
0001022420  2085  8301  0080  0A01  7500  8380  0081  0064
0001022440  0183  0102  0007  8578  00D8  8083  0100  0007
0001022460  8578  00D8  8083  0100  0007  8578  0140  8083
```

THU MAR 14 17:25:16 1991 CRV_IPS.DLL PAGE 257, LINE 15105

```
0001022500  0100  0007  8578  0100  8083  0100  000A  8075
0001022520  8183  6400  8300  0201  0A01  7500  8380  0081
0001022540  0064  0183  0102  0004  837F  0693  0A01  7500
0001022560  8380  0081  0164  0683  0108  0001  0180  0005
0001022600  7878  8083  0100  0004  837F  0693  0A01  7500
0001022620  8380  0081  0164  0A83  0108  0005  5878  8083
0001022640  0100  0007  837F  0081  8183  0100  000A  8075
0001022660  0083  6402  8302  080D  0A01  7500  8380  0200
0001022700  0064  0183  0102  0004  837F  0085  0A01  7500
0001022720  8380  0081  0164  1083  0108  000A  8075  8183
0001022740  6400  8300  0201  0701  7800  9085  8300  0080
0001022760  0701  7800  1885  8301  0080  0701  7F00  8183
0001023000  8300  0081  0A01  7500  8380  0081  0264  1583
0001023020  0108  0010  837F  0081  C183  8300  00C1  C183
0001023040  8300  00C1  0A01  7500  8380  0200  0564  1783
0001023060  0108  0007  8578  00C0  8083  0100  0005  2078
0001023100  8083  0100  000D  837F  00C1  C183  8300  00CJ
0001023120  C183  0100  000A  8075  0083  6402  8304  081B
0001023140  1001  7F00  8183  8300  0081  8183  8300  0081
0001023160  C583  0100  000A  8075  8183  6400  8305  081D
0001023200  0701  7800  C885  8300  0080  0701  7800  C885
0001023220  8300  0080  0A01  7500  8380  0200  0064  0183
0001023240  0102  0007  837F  0081  8183  0100  000A  8075
0001023260  0083  6402  8302  0822  0401  7F00  9083  0107
0001023300  000A  8075  8183  6400  8301  0824  0701  7800
0001023320  0885  8301  0080  0A01  7500  8380  0081  0064
0001023340  0183  0102  0004  837F  00C0  0A01  7500  8380
0001023360  0081  0164  2883  0108  0007  8578  0280  8083
0001023400  0100  0005  1078  8083  0100  0004  837F  00C0
0001023420  0A01  7500  8380  0081  0164  2C83  0108  0005
0001023440  2878  8083  L100  000A  8075  8183  6400  8300
0001023460  0201  1301  7F00  8583  8300  0081  8183  8300
0001023500  0081  C183  8300  00C1  0A01  7500  8380  0081
0001023520  0664  3083  0108  0007  8578  00F8  8083  0100
0001023540  0007  8578  0150  8083  0100  000D  837F  0084
0001023560  C183  8300  00C1  9383  0107  000A  8075  8183
0001023600  6400  8304  0834  1301  7F00  8183  8300  0081
0001023620  C183  8300  00C1  C183  8300  00C1  0A01  7500
0001023640  8380  0081  0664  3683  0108  000D  837F  00C1
0001023660  C183  8300  00C1  C183  0100  000A  8075  8183
0001023700  6400  8304  0838  0A01  7500  8380  0081  0064
0001023720  0183  0102  000A  8075  0083  6402  8300  0201
0001023740  0D01  7F00  8583  8300  0790  C183  8300  00C1
0001023760  0A01  7500  8380  0081  0464  3C83  0108  000A
0001024000  8075  8183  6400  8300  0201  0A01  7F00  8483
0001024020  8300  00C1  C183  0100  000A  8075  8183  6400
0001024040  8303  083F  0A01  7500  8380  0081  0064  0183
0001024060  0102  0001  0180  0001  0180  0001  0180  0001
0001024100  0180  0001  0180  0001  0180  0001  0180  0001
*
0001024320  0180  0001  0180  0001  0180  0001  0180  0007
0001024340  8578  0100  8083  0100  0001  0180  0001  0180
0001024360  0001  0180  0001  0180  0001  0180  0001  0180
*
0001032020  0001  0180  0001  0180  0001  0180  0016  2079
0001032040  8302  04FB  FC83  8204  280A  6E75  6174  6767
0001032060  6465  6929  0701  7F00  8183  8300  0081  0901
0001032100  7F00  0182  0078  0182  0279  0101  8000  0101
0001032120  8000  0101  8000  0101  8000  0101  8000  0101
```

```
THU MAR 14 17:25:16 1991  CRV_IPS.DLL  PAGE 258, LINE 15164

*
0001032440  8000  0101  8000  0101  8000  1601  7900  0330
0001032460  3683  8305  0537  0A82  7528  746E  6761  6567
0001032500  2964  0169  000A  837F  0085  8583  8300  0085
0001032520  1A01  7F00  0582  6977  7464  0068  0682  6568
0001032540  6769  7468  8202  6405  7065  6874  0104  0018
0001032560  8579  0140  8308  053A  3B83  8205  280A  6E75
0001032600  6174  6767  6465  6929  0701  7800  8085  8300
0001032620  0084  1901  7F00  8183  8300  0535  8583  8300
0001032640  0085  C483  8300  0082  E483  8300  0539  5A01
0001032660  7F00  0682  6572  7270  7365  8200  6406  6D69
0001032700  6E65  0273  1082  6164  6174  6C5F  7961  7265
0001032720  645F  7065  6874  8208  7308  6769  735F  7A69
0001032740  0A65  0782  6973  5F67  7470  0C72  0982  7462
0001032760  706D  735F  7A69  1065  0882  7462  706D  705F
0001033000  7274  8214  7305  6170  6572  0118  0001  0180
0001033020  0001  0180  0001  0180  0001  0180  0001  0180
*
0001033400  0018  8579  0560  830F  057B  7C83  8205  280A
0001033420  6E75  6174  6767  6465  6929  0701  7800  0085
0001033440  8302  0084  2E01  7F00  8683  8300  022C  8283
0001033460  8300  0081  8183  8300  04FA  8583  8300  0085
0001033500  3883  8305  00C4  C483  8300  0081  8583  8300
0001033520  00C4  7A83  0105  00A8  827F  6902  0064  0482
0001033540  616E  656D  8204  740A  6D69  5F65  7473  6D61
0001033560  2470  0582  6C63  7361  2873  0582  7473  6C79
0001033600  2A65  0982  6F68  5F74  6F70  6E69  2C74  0B82
0001033620  7068  785F  645F  6665  6E69  3065  0B82  7068
0001033640  795F  645F  6665  6E69  3265  0982  7462  706D
0001033660  695F  666E  346F  0782  6D69  5F67  7470  5C72
0001033700  0882  616D  6B73  705F  7274  8260  7107  6175
0001033720  696C  7974  8264  640F  7365  7263  7069  6F74
0001033740  5F72  6973  657A  8266  640E  7365  7263  7069
0001033760  6F74  5F72  7470  6872  0582  7073  7261  6C65
0001034000  0101  8000  0101  8000  0701  7A00  8373  0579
0001034020  0082  0101  8000  0101  8000  0101  8000  0101
0001034040  8000  0101  8000  0101  8000  0101  8000  0101
*
0001035760  8000  1601  7900  0330  7983  8306  067A  0A82
0001036000  7528  746E  6761  6567  2964  0169  000A  837F
0001036020  0085  8583  8300  0085  2201  7F00  0982  6373
0001036040  6572  6E65  625F  0067  0782  6369  6E6F  625F
0001036060  0267  0882  7068  635F  6F72  7373  0104  0018
0001036100  8579  01B0  8310  067C  7D83  8206  280A  6E75
0001036120  6174  6767  6465  6929  3101  7F00  8183  8300
0001036140  0085  8583  8300  0085  8583  8300  0086  8683
0001036160  8300  0086  8683  8300  0086  8683  8300  0535
0001036200  8583  8300  0678  8683  8300  0085  E801  7F00
0001036220  0382  6564  0076  0982  6874  6572  6873  6C6F
0001036240  0264  1282  6C62  6E69  696B  676E  745F  7268
0001036260  7365  6F6B  646C  8204  6512  7272  655F  656C
0001036300  5F6D  6874  6572  6873  6C6F  0664  1282  7865
0001036320  7063  655F  7272  745F  7268  7365  6F68  646C
0001036340  8208  7309  6174  6962  696C  7974  820A  7408
0001036360  6D69  5F65  756F  0E74  0D82  7973  636E  745F
0001036400  6D69  5F65  756F  1274  0682  7374  5F74  6469
0001036420  8216  640B  6669  5F66  7374  5F74  6469  821A
0001036440  700D  7261  6E65  5F74  7374  5F74  6469  821E
0001036460  6406  6D69  6E65  2273  1082  6164  6174  6C5F
```

THU MAR 14 17:25:16 1991 CRV_IPS.DLL PAGE 259, LINE 15223

```
0001036500  7961  7265  645F  7065  6874  8228  690C  6F63
0001036520  5F6E  6F63  6F6C  7275  2A73  0D82  6F61  5F69
0001036540  6F78  5F72  6F63  6F6C  3072  0A82  6E69  6574
0001036560  6C72  6361  6465  0134  0001  0180  0001  0180
0001036600  0001  0180  0001  0180  0001  0180  0001  0180
*
0001037620  0016  4079  8302  0714  1583  8207  280A  6E75
0001037640  6174  6767  6465  6929  1601  7900  0220  0983
0001037660  8307  070A  0A82  7528  746E  6761  6567  2964
0001037700  0169  0016  2079  8302  0707  0883  8207  280A
0001037720  6E75  6174  6767  6465  6929  0701  7F00  8183
0001037740  8300  0081  0901  7F00  0182  0078  0182  0279
0001037760  0701  7F00  0683  8307  0082  1601  7F00  0982
0001040000  7978  6F5F  6666  6573  0074  0682  666F  7366
0001040020  7465  0100  0016  2079  8303  0712  1383  8207
0001040040  280A  6E75  6174  6767  6465  6929  1601  7900
0001040060  0210  0D83  8307  070E  0A82  7528  746E  6761
0001040100  6567  2964  0169  0007  837F  0084  8483  0100
0001040120  0018  827F  6C08  6665  5F74  6176  006C  0982
0001040140  6972  6867  5F74  6176  016C  1601  7900  0220
0001040160  1083  8307  0711  0A82  7528  746E  6761  6567
0001040200  2964  0169  0007  837F  0085  8583  0100  0015
0001040220  827F  7007  7869  6F5F  6666  8200  7007  7869
0001040240  765F  6C61  0102  000A  837F  0085  0C83  8307
0001040260  070F  2001  7F00  0682  7074  7869  7365  8200
0001040300  6407  6175  5F6C  7470  8200  7309  6E69  6567
0001040320  5F6C  7470  0100  0007  837F  0705  0B83  0107
0001040340  000E  827F  7005  696F  746E  8200  7002  0474
0001040360  0101  8000  0101  8000  0101  8000  1801  7900
0001040400  3085  0410  1B83  8307  071C  0A82  7528  746E
0001040420  6761  6567  2964  0169  0007  8578  1000  0483
0001040440  0107  000D  837F  0085  8583  8300  0085  1A83
0001040460  0107  0044  827F  6E0D  6D75  6F5F  5F66  6F70
0001040500  6E69  7374  8200  6E10  6D75  6F5F  5F66  6E69
0001040520  6574  6E72  6C61  0273  1082  756E  5F6D  666F
0001040540  655F  7478  7265  616E  736C  8204  700A  696F
0001040560  746E  765F  6365  0674  1801  7900  3085  0402
0001040600  1E83  8307  071F  0A82  7528  746E  6761  6567
0001040620  2964  0169  000D  837F  0085  8583  8300  0085
0001040640  7A83  0105  004C  827F  6E0D  6D75  6F5F  5F66
0001040660  6F70  6E69  7374  8200  6E10  6D75  6F5F  5F66
0001040700  6E69  6574  6E72  6C61  0273  1082  756E  5F6D
0001040720  666F  655F  7478  7265  616E  736C  8204  7012
0001040740  696F  746E  765F  6365  5F74  666F  7366  7465
0001040760  0673  1801  7900  B085  0214  2283  8307  0723
0001041000  0A82  7528  746E  6761  6567  2964  0169  0007
0001041020  8578  13B0  1D83  0107  0007  837F  022C  2183
0001041040  0107  0020  827F  730C  7274  7069  6C5F  6F6F
0001041060  756B  0070  0D82  6361  6563  7373  745F  6261
0001041100  656C  2073  1801  7900  E085  0839  2583  8307
0001041120  0726  0A82  7528  746E  6761  6567  2964  0169
0001041140  0019  837F  0085  8183  8300  0081  8183  8300
0001041160  0081  1983  8307  0720  2083  0107  0088  827F
0001041200  6909  6F63  5F6E  6F6D  6564  8200  6C0B  6665
0001041220  5F74  6F62  6472  7265  8202  720C  6769  7468
0001041240  625F  726F  6564  0472  0982  7075  625F  726F
0001041260  6564  0672  0B82  6F64  6E77  625F  726F  6564
0001041300  0872  0A82  6F70  6E69  5F74  696C  7473  820A
0001041320  6C18  6665  5F74  6972  6867  5F74  6F62  6472
```

THU MAR 14 17:25:16 1991 CRV_IPS.DLL PAGE 260, LINE 15282

| | | | | | | | | |
|---|---|---|---|---|---|---|---|---|
| 0001041340 | 7265 | 615F | 6363 | 7365 | 8573 | 0210 | 1582 | 7075 |
| 0001041360 | 645F | 776F | 5F6E | 6F62 | 6472 | 7265 | 615F | 6363 |
| 0001041400 | 7365 | 8573 | 04A6 | 1901 | 7900 | 4085 | 053A | 2A83 |
| 0001041420 | 8307 | 072B | 0B82 | 6369 | 6E6F | 645F | 6373 | 7072 |
| 0001041440 | 6974 | 0101 | 8000 | 0701 | 7A00 | 8373 | 0727 | 0082 |
| 0001041460 | 1001 | 7F00 | 8583 | 8300 | 0085 | 2483 | 8307 | 0729 |
| 0001041500 | 2983 | 0107 | 0049 | 827F | 6907 | 6F63 | 5F6E | 6469 |
| 0001041520 | 8200 | 690E | 6F63 | 5F6E | 7461 | 7274 | 6269 | 7475 |
| 0001041540 | 0265 | 0A82 | 6369 | 6E6F | 735F | 6168 | 6570 | 8204 |
| 0001041560 | 700D | 6572 | 6976 | 756F | 5F73 | 6369 | 6E6F | 4085 |
| 0001041600 | 8207 | 6E09 | 7865 | 5F74 | 6369 | 6E6F | 4485 | 0107 |
| 0001041620 | 0016 | 4079 | 8303 | 0736 | 3783 | 8207 | 280A | 6E75 |
| 0001041640 | 6174 | 6767 | 6465 | 6929 | 1601 | 7900 | 0220 | 3483 |
| 0001041660 | 8307 | 0735 | 0A82 | 7528 | 746E | 6761 | 6567 | 2964 |
| 0001041700 | 0169 | 0016 | 1079 | 8302 | 072F | 3083 | 8207 | 280A |
| 0001041720 | 6E75 | 6174 | 6767 | 6465 | 6929 | 0701 | 7F00 | 8483 |
| 0001041740 | 8300 | 0084 | 1801 | 7F00 | 0882 | 656C | 7466 | 765F |
| 0001041760 | 6C61 | 8200 | 7209 | 6769 | 7468 | 765F | 6C61 | 0101 |
| 0001042000 | 0016 | 2079 | 8302 | 0732 | 3383 | 8207 | 280A | 6E75 |
| 0001042020 | 6174 | 6767 | 6465 | 6929 | 0701 | 7F00 | 8583 | 8300 |
| 0001042040 | 0085 | 1501 | 7F00 | 0782 | 6970 | 5F78 | 666F | 0066 |
| 0001042060 | 0782 | 6970 | 5F78 | 6176 | 026C | 0701 | 7F00 | 2E83 |
| 0001042100 | 8307 | 0731 | 1701 | 7F00 | 0782 | 7564 | 6C61 | 705F |
| 0001042120 | 0074 | 0982 | 6973 | 676E | 6C65 | 705F | 0074 | 0A01 |
| 0001042140 | 7F00 | 8183 | 8300 | 072D | 8583 | 0100 | 001C | 827F |
| 0001042160 | 6F06 | 6666 | 6573 | 0074 | 0282 | 7470 | 8202 | 650A |
| 0001042200 | 6764 | 5F65 | 6F70 | 6E69 | 0674 | 0101 | 8000 | 0101 |
| 0001042220 | 8000 | 0101 | 8000 | 0101 | 8000 | 0101 | 8000 | 1801 |
| 0001042240 | 7900 | 1085 | 0208 | 3F83 | 8307 | 0740 | 0A82 | 7528 |
| 0001042260 | 746E | 6761 | 6567 | 2964 | 0169 | 0007 | 8578 | 0800 |
| 0001042300 | 2C83 | 0107 | 0007 | 837F | 0081 | 3E83 | 0107 | 001C |
| 0001042320 | 827F | 6E0D | 6D75 | 6F5F | 5F66 | 6F70 | 6E69 | 7374 |
| 0001042340 | 8200 | 6508 | 6764 | 5F65 | 6174 | 0262 | 0101 | 8000 |
| 0001042360 | 1A01 | 7900 | 5086 | 0102 | 0500 | 4483 | 8307 | 0745 |
| 0001042400 | 0A82 | 7528 | 746E | 6761 | 6567 | 2964 | 0169 | 0009 |
| 0001042420 | 8678 | 0200 | 0001 | 3D83 | 0107 | 0010 | 837F | 0086 |
| 0001042440 | 8183 | 8300 | 0085 | 8583 | 8300 | 0743 | 4E01 | 7F00 |
| 0001042460 | 0782 | 6369 | 6E6F | 695F | 0064 | 0A82 | 6F78 | 6572 |
| 0001042500 | 5F64 | 6369 | 6E6F | 8204 | 6E12 | 6D75 | 6F5F | 5F66 |
| 0001042520 | 6465 | 6567 | 705F | 696F | 746E | 0673 | 1382 | 756E |
| 0001042540 | 5F6D | 666F | 695F | 6E6E | 7265 | 705F | 696F | 746E |
| 0001042560 | 0873 | 0882 | 696C | 656E | 745F | 6261 | 010A | 0001 |
| 0001042600 | 0180 | 0018 | 8579 | 00A0 | 8307 | 0748 | 4983 | 8207 |
| 0001042620 | 280A | 6E75 | 6174 | 6767 | 6465 | 6929 | 1601 | 7F00 |
| 0001042640 | C483 | 8300 | 00C4 | C483 | 8300 | 0081 | 8183 | 8300 |
| 0001042660 | 0081 | 8183 | 0100 | 0057 | 827F | 6909 | 6F63 | 5F6E |
| 0001042700 | 6373 | 6E72 | 8200 | 6E0E | 6C75 | 5F6C | 6369 | 6E6F |
| 0001042720 | 735F | 7263 | 046E | 0982 | 6964 | 6666 | 735F | 7263 |
| 0001042740 | 086E | 0A82 | 6F78 | 6572 | 5F64 | 6369 | 6E6F | 820C |
| 0001042760 | 7807 | 735F | 6968 | 7466 | 820E | 7907 | 735F | 6968 |
| 0001043000 | 7466 | 8210 | 6609 | 746C | 5F72 | 7461 | 7274 | 0112 |
| 0001043020 | 0001 | 0180 | 0016 | 3079 | 8303 | 074C | 4D83 | 8207 |
| 0001043040 | 280A | 6E75 | 6174 | 6767 | 6465 | 6929 | 0A01 | 7F00 |
| 0001043060 | 8183 | 8300 | 0085 | 8583 | 0100 | 001E | 827F | 6F06 |
| 0001043100 | 6666 | 6573 | 0074 | 0882 | 696C | 656E | 6E5F | 6D75 |
| 0001043120 | 8202 | 6406 | 6D69 | 6E65 | 0473 | 0101 | 8000 | 1601 |
| 0001043140 | 7900 | 0460 | 5183 | 8307 | 0752 | 0A82 | 7528 | 746E |
| 0001043160 | 6761 | 6567 | 2964 | 0169 | 0007 | 737A | 0483 | 820/ |
| 0001043200 | 0100 | 000D | 837F | 0085 | 5083 | 8307 | 0085 | 5083 |

THU MAR 14 17:25:16 1991 CRV_IPS.DLL PAGE 261, LINE 15341

| | | | | | | | | |
|---|---|---|---|---|---|---|---|---|
| 0001043220 | 0107 | 0051 | 827F | 6E13 | 6D75 | 6F5F | 5F66 | 6E69 |
| 0001043240 | 656E | 5F72 | 6F70 | 6E69 | 7374 | 8200 | 6910 | 6E6E |
| 0001043260 | 7265 | 705F | 696F | 746E | 5F73 | 6576 | 0263 | 1282 |
| 0001043300 | 756E | 5F6D | 666F | 655F | 6764 | 5F65 | 6F70 | 6E69 |
| 0001043320 | 7374 | 8206 | 650F | 6764 | 5F65 | 6F70 | 6E69 | 7374 |
| 0001043340 | 765F | 6365 | 0108 | 0016 | 4079 | 8304 | 0754 | 5583 |
| 0001043360 | 8207 | 280A | 6E75 | 6174 | 6767 | 6465 | 6929 | 0D01 |
| 0001043400 | 7F00 | 8183 | 8300 | 0081 | 8583 | 8300 | 0085 | 4901 |
| 0001043420 | 7F00 | 0B82 | 6F68 | 5F74 | 6F70 | 6E69 | 5F74 | 0078 |
| 0001043440 | 0B82 | 6F68 | 5F74 | 6F70 | 6E69 | 5F74 | 0279 | 1382 |
| 0001043460 | 6F68 | 5F74 | 6F70 | 6E69 | 5F74 | 5F78 | 6564 | 6966 |
| 0001043500 | 656E | 0464 | 1382 | 6F68 | 5F74 | 6F70 | 6E69 | 5F74 |
| 0001043520 | 5F79 | 6564 | 6966 | 656E | 0664 | 0101 | 8000 | 0101 |
| 0001043540 | 8000 | 0101 | 8000 | 0101 | 8000 | 0101 | 8000 | 0701 |
| 0001043560 | 7A00 | 8373 | 0747 | 0082 | 0101 | 8000 | 0101 | 8000 |
| 0001043600 | 0A01 | 7500 | 8380 | 0200 | 0664 | 5F83 | 0107 | 0013 |
| 0001043620 | 837F | 075B | 5B83 | 8307 | 0081 | 8183 | 8300 | 00C5 |
| 0001043640 | C583 | 0100 | 0007 | 737A | 4283 | 8207 | 0100 | 0001 |
| 0001043660 | 0180 | 0001 | 0180 | 000A | 8075 | 8183 | 6400 | 8303 |
| 0001043700 | 0764 | 0A01 | 7F00 | 6083 | 8307 | 075B | 8183 | 0100 |
| 0001043720 | 000A | 8075 | 0083 | 6402 | 8304 | 0766 | 0D01 | 7F00 |
| 0001043740 | 5B83 | 8307 | 0081 | C183 | 8300 | 00C5 | 0A01 | 7500 |
| 0001043760 | 8380 | 0200 | 0664 | 6883 | 0107 | 0013 | 837F | 075B |
| 0001044000 | 8183 | 8300 | 00C1 | 8583 | 8300 | 0760 | 0083 | 0100 |
| 0001044020 | 000A | 8075 | 8183 | 6400 | 8302 | 076A | 0701 | 7F00 |
| 0001044040 | 6083 | 8307 | 057F | 0A01 | 7500 | 8380 | 0081 | 0264 |
| 0001044060 | 6C83 | 0107 | 0007 | 837F | 0760 | 2983 | 0107 | 000A |
| 0001044100 | 8075 | 8183 | 6400 | 8301 | 076E | 0401 | 7F00 | 7F83 |
| 0001044120 | 0105 | 000A | 8075 | 8183 | 6400 | 8301 | 0770 | 0401 |
| 0001044140 | 7F00 | 2983 | 0107 | 0007 | 737A | 5B83 | 8207 | 0100 |
| 0001044160 | 0001 | 0180 | 0001 | 0180 | 000A | 8075 | 0083 | 6402 |
| 0001044200 | 8304 | 0775 | 0D01 | 7F00 | C483 | 8300 | 0084 | 8583 |
| 0001044220 | 8300 | 0085 | 0A01 | 7500 | 8380 | 0084 | 0364 | 7783 |
| 0001044240 | 0107 | 000A | 837F | 00C4 | 8583 | 8300 | 0085 | 0101 |
| 0001044260 | 8000 | 0101 | 8000 | 0701 | 7A00 | 8373 | 074F | 0082 |
| 0001044300 | 0101 | 8000 | 0101 | 8000 | 0101 | 8000 | 0101 | 8000 |
| 0001044320 | 0A01 | 7500 | 8380 | 0081 | 0264 | 8083 | 0107 | 0007 |
| 0001044340 | 837F | 075B | 5083 | 0107 | 000A | 8075 | 8183 | 6400 |
| 0001044360 | 8302 | 0782 | 0701 | 7F00 | 7A83 | 8307 | 057F | 0701 |
| 0001044400 | 7A00 | 8373 | 0724 | 0082 | 0701 | 7A00 | 8373 | 071D |
| 0001044420 | 0082 | 0A01 | 7500 | 8380 | 0200 | 0564 | 8683 | 0107 |
| 0001044440 | 0010 | 837F | 0783 | 8083 | 8300 | 0081 | 8183 | 8300 |
| 0001044460 | 0784 | 0A01 | 7500 | 8380 | 0200 | 0364 | 8883 | 0107 |
| 0001044500 | 000A | 837F | 0783 | 8583 | 8300 | 0784 | 0701 | 7A00 |
| 0001044520 | 8373 | 074B | 0082 | 0A01 | 7500 | 8380 | 0200 | 0364 |
| 0001044540 | 8B83 | 0107 | 000A | 837F | 0789 | 8583 | 8300 | 0085 |
| 0001044560 | 0A01 | 7500 | 8380 | 0200 | 0364 | 8D83 | 0107 | 000A |
| 0001044600 | 837F | 0760 | 4B83 | 8307 | 077A | 0A01 | 7500 | 8380 |
| 0001044620 | 0200 | 0464 | 8F83 | 0107 | 000D | 837F | 0760 | 8183 |
| 0001044640 | 8300 | 0081 | 7A83 | 0107 | 000A | 8075 | 8183 | 6400 |
| 0001044660 | 8302 | 0791 | 0701 | 7F00 | 7F83 | 8305 | 057F | 0A01 |
| 0001044700 | 7500 | 8380 | 0081 | 0264 | 9383 | 0107 | 0007 | 837F |
| 0001044720 | 057F | 6083 | 0107 | 000A | 8075 | 8183 | 6400 | 8303 |
| 0001044740 | 0795 | 0A01 | 7F00 | 7F83 | 8305 | 057F | 8183 | 0100 |
| 0001044760 | 0007 | 737A | 5383 | 8207 | 0100 | 000A | 8075 | 8183 |
| 0001045000 | 6400 | 8302 | 0798 | 0701 | 7F00 | 7F83 | 8305 | 0796 |
| 0001045020 | 0A01 | 7500 | 8380 | 0081 | 0264 | 9A83 | 0107 | 0007 |
| 0001045040 | 837F | 057F | 5383 | 0107 | 0007 | 837F | 057F | 8583 |
| 0001045060 | 0100 | 000A | 8075 | 8183 | 6400 | 8302 | 079B | 0D01 |

THU MAR 14 17:25:16 1991 CRV_IPS.DLL PAGE 262, LINE 15400

| | | | | | | | | |
|---|---|---|---|---|---|---|---|---|
| 0001045100 | 7F00 | 7F83 | 8305 | 0085 | 8183 | 8300 | 00C5 | 0A01 |
| 0001045120 | 7500 | 8380 | 0081 | 0464 | 9D83 | 0107 | 0007 | 837F |
| 0001045140 | 075B | 5B83 | 0107 | 000A | 8075 | 8183 | 6400 | 8302 |
| 0001045160 | 079F | 0701 | 7F00 | 5B83 | 8307 | 075B | 0A01 | 7500 |
| 0001045200 | 8380 | 0081 | 0264 | A183 | 0107 | 0013 | 837F | 075B |
| 0001045220 | 5B83 | 8307 | 0081 | 8183 | 8300 | 00C5 | C583 | 0100 |
| 0001045240 | 000A | 8075 | 0083 | 6402 | 8306 | 07A3 | 0701 | 7F00 |
| 0001045260 | 6083 | 8307 | 075B | 0A01 | 7500 | 8380 | 0081 | 0264 |
| 0001045300 | A583 | 0107 | 000A | 837F | 0760 | 5B83 | 8307 | 0081 |
| 0001045320 | 0A01 | 7500 | 8380 | 0081 | 0364 | A783 | 0107 | 000D |
| 0001045340 | 837F | 075B | 8183 | 8300 | 00C1 | C583 | 0100 | 000A |
| 0001045360 | 8075 | 0083 | 6402 | 8304 | 07A9 | 1301 | 7F00 | 5B83 |
| 0001045400 | 8307 | 0081 | C183 | 8300 | 0085 | 6083 | 8307 | 0000 |
| 0001045420 | 0A01 | 7500 | 8380 | 0200 | 0664 | AB83 | 0107 | 0007 |
| 0001045440 | 737A | 3D83 | 8207 | 0100 | 0007 | 837F | 0760 | 7F83 |
| 0001045460 | 0105 | 000A | 8075 | 8183 | 6400 | 8302 | 07AE | 0701 |
| 0001045500 | 7F00 | 6083 | 8307 | 0729 | 0A01 | 7500 | 8380 | 0081 |
| 0001045520 | 0264 | B083 | 0107 | 0004 | 837F | 057F | 0A01 | 7500 |
| 0001045540 | 8380 | 0081 | 0164 | B283 | 0107 | 0007 | 837F | 0760 |
| 0001045560 | 2983 | 0107 | 000A | 8075 | 8183 | 6400 | 8302 | 07B4 |
| 0001045600 | 0401 | 7F00 | 2983 | 0107 | 000A | 8075 | 8183 | 6400 |
| 0001045620 | 8301 | 07B6 | 0701 | 7F00 | 7183 | 8307 | 0000 | 0A01 |
| 0001045640 | 7500 | 8380 | 0081 | 0264 | B883 | 0107 | 000D | 837F |
| 0001045660 | 00C4 | 8483 | 8300 | 0085 | 8583 | 0100 | 000A | 8075 |
| 0001045700 | 0083 | 6402 | 8304 | 07BA | 0A01 | 7F00 | C483 | 8300 |
| 0001045720 | 0085 | 8583 | 0100 | 000A | 8075 | 8463 | 6400 | 8303 |
| 0001045740 | 07BC | 0401 | 7F00 | 7183 | 0107 | 000A | 8075 | 0083 |
| 0001045760 | 6402 | 8301 | 07BE | 0701 | 7F00 | 6083 | 8307 | 077A |
| 0001046000 | 0A01 | 7500 | 8380 | 0081 | 0264 | C083 | 0107 | 0004 |
| 0001046020 | 837F | 077A | 0A01 | 7500 | 8380 | 0200 | 0164 | C283 |
| 0001046040 | 0107 | 0007 | 837F | 075B | 5083 | 0107 | 000A | 8075 |
| 0001046060 | 8183 | 6400 | 8302 | 07C4 | 0701 | 7F00 | 6083 | 8307 |
| 0001046100 | 057F | 0A01 | 7500 | 8380 | 0081 | 0264 | C683 | 0107 |
| 0001046120 | 0007 | 837F | 0760 | 7A83 | 0107 | 000A | 8075 | 8183 |
| 0001046140 | 6400 | 8302 | 07C8 | 0401 | 7F00 | 7F83 | 0105 | 000A |
| 0001046160 | 8075 | 8183 | 6400 | 8301 | 07CA | 0701 | 7A00 | 8373 |
| 0001046200 | 0719 | 0082 | 0701 | 7F00 | 7A83 | 8307 | 057F | 0A01 |
| 0001046220 | 7500 | 8380 | 0081 | 0264 | CD83 | 0107 | 0007 | 837F |
| 0001046240 | 077A | 7F83 | 0105 | 000A | 8075 | 8183 | 6400 | 8302 |
| 0001046260 | 07CF | 0401 | 7F00 | 7F83 | 0105 | 000A | 8075 | 8183 |
| 0001046300 | 6400 | 8301 | 07D1 | 0701 | 7A00 | 8373 | 0720 | 0082 |
| 0001046320 | 0401 | 7F00 | 7F83 | 0105 | 000A | 8075 | 8183 | 6400 |
| 0001046340 | 8301 | 07D4 | 1001 | 7F00 | 8383 | 8307 | 0080 | 8183 |
| 0001046360 | 8300 | 0081 | 8483 | 0107 | 000A | 8075 | 0083 | 6402 |
| 0001046400 | 8305 | 07D6 | 1001 | 7F00 | 8383 | 8307 | 0080 | 8183 |
| 0001046420 | 8300 | 0081 | 8483 | 0107 | 000A | 8075 | 0083 | 6402 |
| 0001046440 | 8305 | 07D8 | 0A01 | 7F00 | 8383 | 8307 | 0085 | 8483 |
| 0001046460 | 0107 | 000A | 8075 | 0083 | 6402 | 8303 | 07DA | 0401 |
| 0001046500 | 7F00 | 7F83 | 0105 | 000A | 8075 | 8183 | 6400 | 8301 |
| 0001046520 | 07DC | 0401 | 7F00 | 7F83 | 0105 | 000A | 8075 | 8183 |
| 0001046540 | 6400 | 8301 | 07DE | 0401 | 7F00 | 7F83 | 0105 | 000A |
| 0001046560 | 8075 | 8183 | 6400 | 8301 | 07E0 | 0A01 | 7F00 | 8983 |
| 0001046600 | 8307 | 0085 | 8583 | 0100 | 000A | 8075 | 0083 | 6402 |
| 0001046620 | 8303 | 07E2 | 0A01 | 7F00 | 6083 | 8307 | 074B | 7A83 |
| 0001046640 | 0107 | 000A | 8075 | 0083 | 6402 | 8303 | 07E4 | 0D01 |
| 0001046660 | 7F00 | 6083 | 8307 | 0081 | 8183 | 8300 | 077A | 0A01 |
| 0001046700 | 7500 | 8380 | 0200 | 0464 | E683 | 0107 | 0007 | 837F |
| 0001046720 | 0760 | 7F83 | 0105 | 000A | 8075 | 8183 | 6400 | 8302 |
| 0001046740 | 07E8 | 0701 | 7F00 | 6083 | 8307 | 0729 | 0A01 | 7500 |

THU MAR 14 17:25:16 1991 CRV_IPS.DLL PAGE 263, LINE 15459

| | | | | | | | | |
|---|---|---|---|---|---|---|---|---|
| 0001046760 | 8380 | 0081 | 0264 | EA83 | 0107 | 0004 | 837F | 057F |
| 0001047000 | 0A01 | 7500 | 8380 | 0081 | 0164 | EC83 | 0107 | 0004 |
| 0001047020 | 837F | 057F | 0A01 | 7500 | 8380 | 0081 | 0164 | EE83 |
| 0001047040 | 0107 | 0007 | 837F | 057F | 7F83 | 0105 | 000A | 8075 |
| 0001047060 | 8183 | 6400 | 8302 | 07F0 | 0701 | 7F00 | 7F83 | 8305 |
| 0001047100 | 0760 | 0A01 | 7500 | 8380 | 0081 | 0264 | F283 | 0107 |
| 0001047120 | 000A | 837F | 057F | 7F83 | 8305 | 0081 | 0A01 | 7500 |
| 0001047140 | 8380 | 0081 | 0364 | F483 | 0107 | 0007 | 837F | 057F |
| 0001047160 | 7F83 | 0105 | 000A | 8075 | 8183 | 6400 | 8302 | 07F6 |
| 0001047200 | 0701 | 7F0C | 7F83 | 8305 | 0796 | 0A01 | 7500 | 8380 |
| 0001047220 | 0081 | 0264 | F883 | 0107 | 0007 | 837F | 057F | 5383 |
| 0001047240 | 0107 | 000A | 8075 | 8183 | 6400 | 8302 | 07FA | 0401 |
| 0001047260 | 7F00 | 7F83 | 0105 | 000A | 8075 | 8183 | 6400 | 8301 |
| 0001047300 | 07FC | 0101 | 8000 | 0101 | 8000 | 1601 | 7900 | 0330 |
| 0001047320 | 0383 | 8302 | 0204 | 0A82 | 7528 | 746E | 6761 | 6567 |
| 0001047340 | 2964 | 0169 | 000A | 837F | 0081 | 8183 | 8300 | 0081 |
| 0001047360 | 1C01 | 7F00 | 0682 | 6170 | 6B63 | 685F | 8200 | 6606 |
| 0001047400 | 6C69 | 5F65 | 0268 | 0682 | 7566 | 636E | 685F | 0104 |
| 0001047420 | 0001 | 0180 | 0001 | 0180 | 0001 | 0180 | 0001 | 0180 |
| * | | | | | | | | |
| 0001047620 | 0001 | 0180 | 0001 | 0180 | 0001 | 0180 | 0005 | 5878 |
| 0001047640 | 8083 | 0100 | 0005 | 3078 | 8083 | 0100 | 0001 | 0180 |
| 0001047660 | 0001 | 0180 | 0001 | 0180 | 0001 | 0180 | 0001 | 0180 |
| * | | | | | | | | |
| 0001050100 | 0005 | 6878 | 8083 | 0100 | 0001 | 0180 | 0001 | 0180 |
| 0001050120 | 0001 | 0180 | 0001 | 0180 | 0007 | 8578 | 0100 | 8083 |
| 0001050140 | 0100 | 0001 | 0180 | 0001 | 0180 | 0001 | 0180 | 0001 |
| 0001050160 | 0180 | 0001 | 0180 | 0001 | 0180 | 0001 | 0180 | 0001 |
| * | | | | | | | | |
| 0001050660 | 0180 | 0001 | 0180 | 0005 | 6078 | 8083 | 0100 | 0001 |
| 0001050700 | 0180 | 0001 | 0180 | 0001 | 0180 | 0001 | 0180 | 0001 |
| * | | | | | | | | |
| 0001052140 | 0180 | 0001 | 0180 | 0001 | 0180 | 0016 | 2079 | 8302 |
| 0001052160 | 0357 | 5883 | 8203 | 280A | 6E75 | 6174 | 6767 | 6465 |
| 0001052200 | 6929 | 0701 | 7F00 | 8183 | 8300 | 0081 | 0901 | 7F00 |
| 0001052220 | 0182 | 0078 | 0182 | 0279 | 1601 | 7900 | 0240 | 5A83 |
| 0001052240 | 8303 | 035B | 0A82 | 7528 | 746E | 6761 | 6567 | 2964 |
| 0001052260 | 0169 | 0007 | 837F | 0356 | 5683 | 0103 | 000D | 827F |
| 0001052300 | 6D03 | 6E69 | 8200 | 6D03 | 7861 | 0104 | 0001 | 0180 |
| 0001052320 | 0016 | 2079 | 8302 | 035E | 5F83 | 8203 | 280A | 6E75 |
| 0001052340 | 6174 | 6767 | 6465 | 6929 | 0701 | 7F00 | 8583 | 8300 |
| 0001052360 | 0085 | 1201 | 7F00 | 0582 | 6977 | 7464 | 0068 | 0682 |
| 0001052400 | 6568 | 6769 | 7468 | 0102 | 0001 | 0180 | 0016 | 4079 |
| 0001052420 | 8302 | 0362 | 6383 | 8203 | 280A | 6E75 | 6174 | 6767 |
| 0001052440 | 6465 | 6929 | 0701 | 7F00 | 5683 | 8303 | 035D | 1101 |
| 0001052460 | 7F00 | 0682 | 726F | 6769 | 6E69 | 8200 | 6104 | 6572 |
| 0001052500 | 0461 | 0101 | 8000 | 0101 | 8000 | 0101 | 8000 | 0101 |
| 0001052520 | 8000 | 0101 | 8000 | 0101 | 8000 | 0101 | 8000 | 0101 |
| * | | | | | | | | |
| 0001052760 | 8000 | 0101 | 8000 | 0101 | 8000 | 1601 | 7900 | 0330 |
| 0001053000 | 9383 | 8303 | 0394 | 0A82 | 7528 | 746E | 6761 | 6567 |
| 0001053020 | 2964 | 0169 | 000A | 837F | 0085 | 8583 | 8300 | 0085 |
| 0001053040 | 1A01 | 7F00 | 0582 | 6977 | 7464 | 0068 | 0682 | 6568 |
| 0001053060 | 6769 | 7468 | 8202 | 6405 | 7065 | 6874 | 0104 | 0018 |
| 0001053100 | 8579 | 0140 | 8308 | 0397 | 9883 | 8203 | 280A | 6E75 |
| 0001053120 | 6174 | 6767 | 6465 | 6929 | 0701 | 7800 | 8085 | 8300 |
| 0001053140 | 0084 | 1901 | 7F00 | 8183 | 8300 | 0392 | 8583 | 8300 |
| 0001053160 | 0085 | C483 | 8300 | 0082 | E483 | 8300 | 0396 | 5A01 |
| 0001053200 | 7F00 | 0682 | 6572 | 7270 | 7365 | 8200 | 6406 | 6D69 |

THU MAR 14 17:25:16 1991 CRV_IPS.DLL PAGE 264, LINE 15518

```
0001053220  6E65  0273  1082  6164  6174  6C5F  7961  7265
0001053240  645F  7065  6874  8208  7308  6769  735F  7A69
0001053260  0A65  0782  6973  5F67  7470  0C72  0982  7462
0001053300  706D  735F  7A69  1065  0882  7462  706D  705F
0001053320  7274  8214  7305  6170  6572  0118  0001  0180
0001053340  0018  8579  05A0  830C  039C  9D83  8203  280A
0001053360  6E75  6174  6767  6465  6929  0701  7800  8085
0001053400  8301  0084  2501  7F00  8683  8300  0254  5483
0001053420  8302  0086  8183  8300  0085  8683  8300  0082
0001053440  8683  8300  0356  9583  8303  039B  7E01  7F0ù
0001053460  0282  6469  8200  6E04  6D61  0465  0982  6966
0001053500  656C  6E5F  6D61  2465  0982  7865  5F70  6374
0001053520  695F  4464  0482  7974  6570  8248  720C  6665
0001053540  6C5F  6E69  5F65  756E  4A6D  0982  6572  5F66
0001053560  6374  695F  4C64  0A82  6974  656D  735F  6174
0001053600  706D  8250  6106  696F  695F  5464  0882  6F6C
0001053620  6163  6974  6E6F  8258  6209  6D74  5F70  6E69
0001053640  6F66  825C  7305  6170  6572  8485  0100  0001
0001053660  0180  0001  0180  0001  0180  0001  0180  0001
*
0001053720  0180  0001  0180  0007  737A  9A83  8203  0100
0001053740  0001  0180  0001  0180  0001  0160  0001  0180
*
0001054220  0001  0180  0018  8579  0560  830F  03D8  D983
0001054240  8203  280A  6E75  6174  6767  6465  6929  0701
0001054260  7800  0085  8302  0084  2E01  7F00  8683  8300
0001054300  0254  8283  8300  0081  8183  8300  0356  8583
0001054320  8300  0085  9583  8303  00C4  C483  8300  0081
0001054340  8583  8300  00C4  D783  0103  00A8  827F  6902
0001054360  0064  0482  616E  656D  8204  740A  6D69  5F65
0001054400  7473  6D61  2470  0582  6C63  7361  2873  0582
0001054420  7473  6C79  2A65  0982  6F68  5F74  6F70  6E69
0001054440  2C74  0B82  7068  785F  645F  6665  6E69  3065
0001054460  0B82  7068  795F  645F  6665  6E69  3265  0982
0001054500  7462  706D  695F  666E  346F  0782  6D69  5F67
0001054520  7470  5C72  0882  616D  6B73  705F  7274  8260
0001054540  7107  6175  696C  7974  8264  640F  7365  7263
0001054560  7069  6F74  5F72  6973  657A  8266  640E  7365
0001054600  7263  7069  6F74  5F72  7470  6872  0582  7073
0001054620  7261  6C65  0101  8000  0701  7A00  8373  03DC
0001054640  0082  0701  7A00  8373  03D6  0082  0101  8000
0001054660  0101  8000  0101  8000  0101  8000  0101  8000
*
0001054740  0101  8000  0101  8000  0701  7A00  8373  0254
0001054760  0082  0101  8000  0101  8000  1801  7900  C085
0001055000  0702  F183  8303  03F2  0A82  7528  746E  6761
0001055020  6567  2964  0169  0007  8578  0120  8483  0100
0001055040  0016  837F  0086  5483  8302  0359  8183  8300
0001055060  0081  8283  8300  03F0  3801  7F00  0282  6469
0001055100  8200  6E04  6D61  0465  0482  6572  7463  8224
0001055120  6104  7474  2C72  0582  7564  6D6D  2E79  0A82
0001055140  6974  656D  735F  6174  706D  8230  7305  6170
0001055160  6572  0134  0001  0180  0001  0180  0001  0180
0001055200  0001  0180  0001  0180  0001  0180  0007  737A
0001055220  EF83  8203  0100  0001  0180  0001  0180  0001
0001055240  0180  0001  0180  0001  0180  0001  0180  0001
*
0001055400  0180  0001  0180  0018  8579  0110  8311  0417
0001055420  1883  8204  280A  6E75  6174  6767  6465  6929
```

THU MAR 14 17:25:16 1991 CRV_IPS.DLL PAGE 265, LINE 15577

```
0001055440   3401   7F00   8583   8300   0085   8583   8300   0085
0001055460   8583   8300   0085   8183   8300   0085   8583   8300
0001055500   0085   8483   8300   0085   8583   8300   0085   8583
0001055520   8300   0085   8583   0100   0106   827F   7409   6D69
0001055540   5F65   6E75   7469   8200   6D0F   6E69   725F   6365
0001055560   726F   5F64   6974   656D   8202   7309   6174   6962
0001055600   696C   7974   8204   630F   7061   7574   6572   745F
0001055620   6D69   6F65   7475   8206   6B0A   7965   665F   726F
0001055640   616D   0874   1382   6F63   746E   6E69   6F75   7375
0001055660   745F   6172   6B63   6E69   0A67   0E82   6F6D   7375
0001055700   5F65   7274   6361   696B   676E   820C   6311   7061
0001055720   7574   6572   735F   6769   616E   7574   6572   820E
0001055740   680B   746F   656B   5F79   7973   636E   8210   640C
0001055760   6665   7561   746C   745F   6D69   1265   0982   616D
0001056000   5F78   6564   616C   1479   0B82   6166   7473   725F
0001056020   7065   616C   1679   0E82   6576   6972   7966   745F
0001056040   6D69   6F65   7475   8218   770C   6961   5F74   6974
0001056060   656D   756F   1A74   0C82   7973   636E   745F   6D69
0001056100   6F65   7475   821C   7409   7268   7365   6F68   646C
0001056120   821E   630C   6568   6B63   6C5F   6F6F   756B   2070
0001056140   0101   8000   0701   7800   0085   8308   0080   0101
0001056160   8000   0101   8000   0101   8000   0101   8000   0101
*
0001056360   8000   1601   7900   0240   3D83   8304   043E   0A82
0001056400   7528   746E   6761   6567   2964   0169   0007   837F
0001056420   0082   8283   0100   0017   827F   6408   6665   745F
0001056440   6D69   0065   0882   696D   5F6E   6974   656D   0104
0001056460   0001   0180   0001   0180   0001   0180   0001   0180
0001056500   0001   0180   0001   0180   0016   4079   8304   0446
0001056520   4783   8204   280A   6E75   6174   6767   6465   6929
0001056540   0D01   7F00   8483   8300   0084   8483   8300   0356
0001056560   2901   7F00   0782   6261   5F73   6572   006C   0582
0001056600   6E75   7469   0173   0C82   7073   6365   6169   5F6C
0001056620   7566   636E   8202   6404   7369   0470   0101   8000
0001056640   0101   8000   0101   8000   1601   7900   0220   4C83
0001056660   8304   044D   0A82   7528   746E   6761   6567   2964
0001056700   0169   0007   837F   0081   8183   0100   001E   827F
0001056720   7309   6E79   5F63   6F6D   6564   8200   730E   6E79
0001056740   5F63   7865   6365   6D5F   646F   0265   1601   7900
0001056760   0230   4F83   8304   0450   0A82   7528   746E   6761
0001057000   6567   2964   0169   0007   837F   0082   8183   0100
0001057020   0019   827F   7407   6365   5F68   6469   8200   740B
0001057040   6365   5F68   6572   7361   6E6F   0104   0001   0180
0001057060   0001   0180   0001   0180   0018   8579   0220   8303
0001057100   0455   5683   8204   280A   6E75   6174   6767   6465
0001057120   6929   0A01   7F00   5483   8302   0254   8683   0100
0001057140   001A   827F   6905   616D   6567   8200   6404   6669
0001057160   2066   0782   6964   6666   695F   4064   1801   7900
0001057200   1085   0203   5983   8304   045A   0A82   7528   746E
0001057220   6761   6567   2964   0169   0007   8578   0300   5483
0001057240   0102   0007   837F   0085   5883   0104   0024   827F
0001057260   6E0E   6D75   6F5F   5F66   6373   6572   6E65   0073
0001057300   0F82   6D69   6761   5F65   616E   656D   6C5F   7369
0001057320   0274   1601   7900   0120   5C83   8304   045D   0A82
0001057340   7528   746E   6761   6567   2964   0169   0004   837F
0001057360   00C0   0A01   7F00   0682   7473   6972   676E   0100
0001057400   0001   0180   0001   0180   0001   0180   0016   3079
0001057420   8302   0462   6383   8204   280A   6E75   6174   6767
0001057440   6465   6929   0701   7F00   8283   8300   0081   1E01
```

THU MAR 14 17:25:16 1991 CRV_IPS.DLL PAGE 266, LINE 15636

| | | | | | | | | |
|---|---|---|---|---|---|---|---|---|
| 0001057460 | 7F00 | 0C82 | 7865 | 6563 | 7470 | 6F69 | 5F6E | 6469 |
| 0001057500 | 8200 | 650B | 6378 | 5F70 | 7473 | 7461 | 7375 | 0104 |
| 0001057520 | 0016 | 2079 | 8302 | 0468 | 6983 | 8204 | 280A | 6E75 |
| 0001057540 | 6174 | 6767 | 6465 | 6929 | 1601 | 7900 | 0208 | 6683 |
| 0001057560 | 8304 | 0467 | 0A82 | 7528 | 746E | 6761 | 6567 | 2964 |
| 0001057600 | 0169 | 0007 | 837F | 0084 | 8483 | 0100 | 001B | 827F |
| 0001057620 | 6B08 | 7965 | 635F | 646F | 0065 | 0C82 | 7773 | 7469 |
| 0001057640 | 6863 | 735F | 6174 | 6574 | 0100 | 0007 | 837F | 0081 |
| 0001057660 | 6583 | 0104 | 0018 | 827F | 6B08 | 7965 | 745F | 7079 |
| 0001057700 | 0065 | 0982 | 656B | 5F79 | 6176 | 756C | 0265 | 1801 |
| 0001057720 | 7900 | 3085 | 0402 | 6C83 | 8304 | 046D | 0A82 | 7528 |
| 0001057740 | 746E | 6761 | 6567 | 2964 | 0169 | 0007 | 8578 | 0200 |
| 0001057760 | 6483 | 0104 | 000D | 837F | 0085 | 6B83 | 8304 | 0081 |
| 0001060000 | 8183 | 0100 | 002E | 827F | 7308 | 7165 | 735F | 7A69 |
| 0001060020 | 0065 | 0382 | 6573 | 0271 | 0882 | 656B | 5F79 | 7461 |
| 0001060040 | 7274 | 8242 | 610E | 7463 | 7669 | 7461 | 6465 | 665F |
| 0001060060 | 6E75 | 4463 | 0101 | 8000 | 0101 | 8000 | 0101 | 8000 |
| 0001060100 | 0101 | 8000 | 0101 | 8000 | 0101 | 8000 | 0101 | 8000 |
| 0001060120 | 0101 | 8000 | 1601 | 7900 | 0220 | 7783 | 8304 | 0478 |
| 0001060140 | 0A82 | 7528 | 746E | 6761 | 6567 | 2964 | 0169 | 0007 |
| 0001060160 | 837F | 0081 | 8183 | 0100 | 0017 | 827F | 6B08 | 7965 |
| 0001060200 | 615F | 7474 | 0072 | 0882 | 7566 | 636E | 6B5F | 7965 |
| 0001060220 | 0102 | 0018 | 8579 | 0210 | 8302 | 047A | 7B83 | 8204 |
| 0001060240 | 280A | 6E75 | 6174 | 6767 | 6465 | 6929 | 0701 | 7F00 |
| 0001060260 | 8583 | 8300 | 046B | 1201 | 7F00 | 0882 | 6573 | 5F71 |
| 0001060300 | 6973 | 657A | 8200 | 7303 | 7165 | 0102 | 0001 | 0180 |
| 0001060320 | 0001 | 0180 | 0001 | 0180 | 0001 | 0180 | 0001 | 0180 |
| 0001060340 | 0018 | 8579 | 02D0 | 8302 | 0482 | 8383 | 8204 | 280A |
| 0001060360 | 6E75 | 6174 | 6767 | 6465 | 6929 | 0701 | 7F00 | EF83 |
| 0001060400 | 8303 | 0081 | 1101 | 7F00 | 0682 | 6966 | 746C | 7265 |
| 0001060420 | 8200 | 6D04 | 646F | 5865 | 1801 | 7900 | 5085 | 0501 |
| 0001060440 | 8583 | 8304 | 0486 | 0A82 | 7528 | 746E | 6761 | 6567 |
| 0001060460 | 2964 | 0169 | 0010 | 837F | 0254 | 8683 | 8300 | 0081 |
| 0001060500 | 8183 | 8300 | 0081 | 2B01 | 7F00 | 0482 | 616E | 656D |
| 0001060520 | 8200 | 6C06 | 6269 | 695F | 2064 | 0582 | 6C63 | 7361 |
| 0001060540 | 2473 | 0582 | 7473 | 6C79 | 2665 | 0782 | 706F | 635F |
| 0001060560 | 646F | 2865 | 0101 | 8000 | 0101 | 8000 | 0101 | 8000 |
| 0001060600 | 1B01 | 7900 | 0920 | 8B83 | 8304 | 048C | 0F82 | 5F69 |
| 0001060620 | 5F75 | 736D | 5F67 | 6170 | 6172 | 5F6D | 6974 | 1C01 |
| 0001060640 | 7F00 | 8183 | 8300 | 0085 | 8283 | 8300 | 0086 | 8883 |
| 0001060660 | 8300 | 0080 | 8483 | 8300 | 00C0 | C083 | 0100 | 006A |
| 0001060700 | 827F | 6909 | 755F | 735F | 6F68 | 7472 | 8200 | 690A |
| 0001060720 | 755F | 755F | 6873 | 726F | 0074 | 0882 | 5F69 | 5F75 |
| 0001060740 | 6F6C | 676E | 8200 | 6909 | 755F | 755F | 6F6C | 676E |
| 0001060760 | 8200 | 6909 | 755F | 665F | 6F6C | 7461 | 8200 | 6908 |
| 0001061000 | 755F | 635F | 6168 | 0072 | 0982 | 5F69 | 5F75 | 6375 |
| 0001061020 | 6168 | 0072 | 0782 | 5F69 | 5F75 | 7473 | 0072 | 0982 |
| 0001061040 | 5F69 | 5F75 | 6C62 | 636F | 006B | 1901 | 7900 | 0230 |
| 0001061060 | 8E83 | 8304 | 048F | 0D82 | 5F69 | 736D | 5F67 | 6170 |
| 0001061100 | 6172 | 5F6D | 6974 | 0701 | 7F00 | 8583 | 8300 | 048A |
| 0001061120 | 1001 | 7F00 | 0482 | 7974 | 6570 | 8200 | 7605 | 6C61 |
| 0001061140 | 6575 | 0102 | 0001 | 0180 | 001C | 8579 | 0090 | 8309 |
| 0001061160 | 0492 | 9383 | 8204 | 690E | 6D5F | 6773 | 685F | 6165 |
| 0001061200 | 6564 | 5F72 | 6974 | 1C01 | 7F00 | 8183 | 8300 | 0081 |
| 0001061220 | 8583 | 8300 | 0085 | 8483 | 8300 | 0085 | 8583 | 8300 |
| 0001061240 | 0081 | 8583 | 0100 | 0047 | 827F | 7104 | 695F | 0064 |
| 0001061260 | 0682 | 6F73 | 7275 | 6563 | 8202 | 7003 | 6469 | 8204 |
| 0001061300 | 7403 | 6469 | 8206 | 7204 | 7365 | 0870 | 0882 | 6572 |
| 0001061320 | 7073 | 745F | 6469 | 820A | 6F07 | 5F70 | 6F63 | 6564 |

THU MAR 14 17:25:16 1991 CRV_IPS.DLL PAGE 267, LINE 15695

```
0001061340  820C  7404  7079  0E65  0482  6973  657A  0110
0001061360  0015  8579  00C0  8302  0496  9783  8204  6907
0001061400  6D5F  6773  745F  0169  0005  3078  8D83  0104
0001061420  0007  837F  0491  9583  0104  0017  827F  6806
0001061440  6165  6564  0072  0A82  6170  6172  5F6D  696C
0001061460  7473  0112  0001  0180  0001  0180  0001  0180
0001061500  0001  0180  0001  0180  0001  0180  0001  0180
*
0001061660  0001  0180  0001  0180  0001  0180  0016  3079
0001061700  8303  04BB  BC83  8204  280A  6E75  6174  6767
0001061720  6465  6929  0A01  7F00  8583  8300  0085  8583
0001061740  0100  0022  827F  7309  7263  6565  5F6E  6762
0001061760  8200  6907  6F63  5F6E  6762  8202  6808  5F70
0001062000  7263  736F  0473  1801  7900  B085  1001  BE83
0001062020  8304  04BF  0A82  7528  746E  6761  6567  2964
0001062040  0169  0031  837F  0081  8583  8300  0085  8583
0001062060  8300  0085  8683  8300  0086  8683  8300  0086
0001062100  8683  8300  0086  9283  8303  0085  BA83  8304
0001062120  0086  8583  0100  00E8  827F  6403  7665  8200
0001062140  7409  7268  7365  6F68  646C  8202  6212  696C
0001062160  6B6E  6E69  5F67  6874  6572  6873  6C6F  0464
0001062200  1282  7265  5F72  6C65  6D65  745F  726B  7365
0001062220  6F68  646C  8206  6512  6378  5F70  7265  5F72
0001062240  6874  6572  6873  6C6F  0864  0982  7473  6261
0001062260  6C69  7469  0A79  0882  6974  656D  6F5F  7475
0001062300  820E  730D  6E79  5F63  6974  656D  6F5F  7475
0001062320  8212  7406  7473  695F  1664  0B82  6964  6666
0001062340  745F  7473  695F  1A64  0D82  6170  6572  746E
0001062360  745F  7473  695F  1E64  0682  6964  656D  736E
0001062400  8222  6410  7461  5F61  616C  6579  5F72  6564
0001062420  7470  2868  0C82  6369  6E6F  635F  6C6F  756F
0001062440  7372  822A  610D  696F  785F  726F  635F  6C6F
0001062460  726F  8230  690A  746E  7265  616C  6563  3464
0001062500  0101  8000  0101  8000  0101  8000  0101  8000
0001062520  0101  8000  0101  8000  1601  7900  0340  C883
0001062540  8304  04C9  0A82  7528  746E  6761  6567  2964
0001062560  0169  0007  737A  6A83  8204  0100  000A  837F
0001062600  0081  8183  8300  04C7  2B01  7F00  0682  6361
0001062620  6974  6E6F  8200  6E0F  6D75  6F5F  5F66  6F73
0001062640  7466  656B  7379  8202  730C  666F  6B74  7965
0001062660  5F73  7470  0472  1601  7900  0340  CC83  8304
0001062700  04CD  0A82  7528  746E  6761  6567  2964  0169
0001062720  0007  737A  7983  8204  0100  000A  837F  0081
0001062740  8183  8300  04CB  2901  7F00  0682  6361  6974
0001062760  6E6F  8200  6E0E  6D75  6F5F  5F66  6F68  6B74
0001063000  7965  0273  0B82  6F68  6B74  7965  5F73  7470
0001063020  0472  1801  7900  7085  0501  CF83  8304  04D0
0001063040  0A82  7528  746E  6761  6567  2964  0169  0010
0001063060  837F  0254  8683  8300  03AB  E483  8300  0085
0001063100  3D01  7F00  0A82  6D69  6761  5F65  616E  656D
0001063120  8200  6908  616D  6567  695F  2064  0982  6D69
0001063140  6761  5F65  7470  2472  0982  616C  6579  5F72
0001063160  7470  2872  0982  6D69  6761  5F65  6468  2C6C
0001063200  0101  8000  0101  8000  0101  8000  0101  8000
0001063220  1801  7900  9085  0201  D683  8304  04D7  0A82
0001063240  7528  746E  6761  6567  2964  0169  0007  837F
0001063260  0082  CE83  0104  0018  827F  650C  6378  7065
0001063300  6974  6E6F  695F  0064  0582  6D69  6761  0465
0001063320  0101  8000  1601  7900  0340  DB83  8304  04DC
```

THU MAR 14 17:25:16 1991 CRV_IPS.DLL PAGE 268, LINE 15754

| | | | | | | | | |
|---|---|---|---|---|---|---|---|---|
| 0001063340 | 0A82 | 7528 | 746E | 6761 | 6567 | 2964 | 0169 | 0007 |
| 0001063360 | 737A | D583 | 8204 | 0100 | 000A | 837F | 0081 | 8183 |
| 0001063400 | 8300 | 04DA | 2F01 | 7F00 | 0682 | 6361 | 6974 | 6E6F |
| 0001063420 | 8200 | 6E11 | 6D75 | 6F5F | 5F66 | 7865 | 6563 | 7470 |
| 0001063440 | 6F69 | 736E | 8202 | 650E | 6378 | 7065 | 6974 | 6E6F |
| 0001063460 | 6C5F | 7369 | 0474 | 1801 | 7900 | 5085 | 0304 | DE83 |
| 0001063500 | 8304 | 04DF | 0A82 | 7528 | 746E | 6761 | 6567 | 2964 |
| 0001063520 | 0169 | 000A | 837F | 04CE | CE83 | 8304 | 04CE | 1A01 |
| 0001063540 | 7F00 | 0682 | 6D69 | 6761 | 3165 | 8200 | 6906 | 616D |
| 0001063560 | 6567 | 2E32 | 0482 | 6964 | 6666 | 015C | 0018 | 8579 |
| 0001063600 | 01A0 | 8303 | 04E2 | E383 | 8204 | 280A | 6E75 | 6174 |
| 0001063620 | 6767 | 6465 | 6929 | 0701 | 7A00 | 8373 | 04CE | 0082 |
| 0001063640 | 0A01 | 7F00 | 8183 | 8300 | 04E1 | CE83 | 0104 | 0026 |
| 0001063660 | 827F | 6E0E | 6D75 | 6F5F | 5F66 | 6373 | 6572 | 6E65 |
| 0001063700 | 0073 | 0A82 | 6D69 | 6761 | 5F65 | 696C | 7473 | 8202 |
| 0001063720 | 6404 | 6669 | 0666 | 1801 | 7900 | 1085 | 0302 | E583 |
| 0001063740 | 8304 | 04E6 | 0A82 | 7528 | 746E | 6761 | 6567 | 2964 |
| 0001063760 | 0169 | 000A | 837F | 0254 | 5483 | 8302 | 0081 | 1901 |
| 0001064000 | 7F00 | 0682 | 6D69 | 6761 | 3165 | 8200 | 6906 | 616D |
| 0001064020 | 6567 | 2032 | 0382 | 7563 | 4074 | 1801 | 7900 | 4085 |
| 0001064040 | 0709 | EB83 | 8304 | 04EC | 0A82 | 7528 | 746E | 6761 |
| 0001064060 | 6567 | 2964 | 0169 | 0018 | 8579 | 0800 | 831D | 04E9 |
| 0001064100 | EA83 | 8204 | 280A | 6E75 | 6174 | 6767 | 6465 | 6929 |
| 0001064120 | 5801 | 7F00 | 8483 | 8300 | 041A | 8483 | 8300 | 0084 |
| 0001064140 | 4583 | 8304 | 0081 | 6183 | 8303 | 044B | 8183 | 8304 |
| 0001064160 | 03EF | 8183 | 8300 | 04CA | 4E83 | 8304 | 04D9 | 6183 |
| 0001064200 | 8304 | 0081 | C683 | 8304 | 04CE | DD83 | 8304 | 04E0 |
| 0001064220 | 5783 | 8304 | 0085 | 5483 | 8304 | 04E4 | 5B83 | 8304 |
| 0001064240 | 0416 | 7683 | 8304 | 0484 | 8483 | 0100 | 016F | 827F |
| 0001064260 | 6B0A | 6462 | 735F | 6174 | 7574 | 0073 | 0982 | 6574 |
| 0001064300 | 7473 | 6E5F | 6D61 | 0065 | 0882 | 656B | 5F79 | 6F63 |
| 0001064320 | 6564 | 8200 | 730C | 6977 | 6374 | 5F68 | 7473 | 7461 |
| 0001064340 | 0065 | 0C82 | 6F6C | 6163 | 6F74 | 5F72 | 6964 | 7073 |
| 0001064360 | 8200 | 740E | 6172 | 6B63 | 6E69 | 5F67 | 656C | 6576 |
| 0001064400 | 006C | 0C82 | 6373 | 6C61 | 5F65 | 6977 | 646E | 776F |
| 0001064420 | 8200 | 7309 | 6E79 | 5F63 | 6F6D | 6564 | 8200 | 660A |
| 0001064440 | 6C69 | 6574 | 5F72 | 736D | 0067 | 0682 | 6966 | 746C |
| 0001064460 | 7265 | 8200 | 630B | 7275 | 6572 | 746E | 615F | 696F |
| 0001064500 | 8200 | 680C | 746F | 656B | 7379 | 6C5F | 7369 | 0074 |
| 0001064520 | 0A82 | 7973 | 636E | 655F | 6576 | 746E | 8200 | 650E |
| 0001064540 | 6378 | 7065 | 6974 | 6E6F | 6C5F | 7369 | 0074 | 1082 |
| 0001064560 | 7865 | 7063 | 735F | 6174 | 7574 | 5F73 | 696C | 7473 |
| 0001064600 | 8200 | 6D04 | 646F | 0065 | 0D82 | 6F73 | 7466 | 656B |
| 0001064620 | 7379 | 6C5F | 7369 | 0074 | 0582 | 6D69 | 6761 | 0065 |
| 0001064640 | 0782 | 6F63 | 706D | 7261 | 0065 | 0B82 | 6177 | 7469 |
| 0001064660 | 735F | 7263 | 6565 | 006E | 0A82 | 6D69 | 6761 | 5F65 |
| 0001064700 | 696C | 7473 | 8200 | 6909 | 616D | 6567 | 6E5F | 6D75 |
| 0001064720 | 8200 | 690A | 616D | 6567 | 645F | 6669 | 0066 | 0B82 |
| 0001064740 | 6168 | 666C | 695F | 616D | 6567 | 0073 | 0782 | 616D |
| 0001064760 | 7373 | 6761 | 0065 | 0682 | 6170 | 6172 | 736D | 8200 |
| 0001065000 | 6608 | 6E75 | 5F63 | 656B | 0079 | 0882 | 6369 | 6E6F |
| 0001065020 | 6D5F | 6773 | 8200 | 6405 | 6D75 | 796D | 0100 | 0016 |
| 0001065040 | 837F | 0081 | 9483 | 8304 | 0081 | 3C83 | 8304 | 04E8 |
| 0001065060 | 8183 | 8300 | 0085 | 5A01 | 7F00 | 0682 | 6F73 | 7275 |
| 0001065100 | 6563 | 8200 | 6D0A | 6773 | 685F | 6165 | 6564 | 0272 |
| 0001065120 | 0A82 | 7665 | 6E65 | 5F74 | 7974 | 6570 | 821A | 7406 |
| 0001065140 | 6D69 | 6E69 | 1C67 | 0B82 | 7665 | 6E65 | 5F74 | 6176 |
| 0001065160 | 756C | 2465 | 0C82 | 6572 | 7574 | 6E72 | 765F | 6C61 |
| 0001065200 | 6575 | 2485 | 8201 | 7209 | 7365 | 5F70 | 6C66 | 6761 |

THU MAR 14 17:25:16 1991 CRV_IPS.DLL PAGE 269, LINE 15813

```
0001065220  2685  0101  0001  0180  0001  0180  0001  0180
0001065240  0001  0180  0001  0180  0001  0180  0001  0180
0001065260  0001  0180  0001  0180  0001  0180  0001  0180
0001065300  E783  8204  0100  0001  0180  0001  0180  737A
0001065320  0180  0001  0180  0001  0180  0001  0180  0001
0001065340  0180  0001  0180  0001  0180  0001  0180  0001
0001065360  6400  8301  0502  0401  7F00  000A  8075  8183
0001065400  0180  0001  0180  0001  0180  F983  0103  0001
*                                       0001  0180  0001
0001066000  0180  0001  0180  0001  0180  0016  4079  8302
0001066020  0556  5783  8205  280A  6E75  6174  6767  6465
0001066040  6929  1601  7900  0220  4B83  8305  054C  0A82
0001066060  7528  746E  6761  6567  2964  0169  0016  2079
0001066100  8302  0549  4A83  8205  280A  6E75  6174  6767
0001066120  6465  6929  0701  7F00  8183  8300  0081  0901
0001066140  7F00  0182  0078  0182  0279  0701  7F00  4883
0001066160  8305  0082  1601  7F00  0982  7978  6F5F  6666
0001066200  6573  0074  0682  666F  7366  7465  0100  0016
0001066220  2079  8303  0554  5583  8205  280A  6E75  6174
0001066240  6767  6465  6929  1601  7900  0210  4F83  8305
0001066260  0550  0A82  7528  746E  6761  6567  2964  0169
0001066300  0007  837F  0084  8483  0100  0018  827F  6C08
0001066320  6665  5F74  6176  006C  0982  6972  6867  5F74
0001066340  6176  016C  1601  7900  0220  5283  8305  0553
0001066360  0A82  7528  746E  6761  6567  2964  0169  0007
0001066400  837F  0085  8583  0100  0015  827F  7007  7869
0001066420  6F5F  6666  8200  7007  7869  765F  6C61  0102
0001066440  000A  837F  0085  4E83  8305  0551  2001  7F00
0001066460  0682  7074  7869  7365  8200  6407  6175  5F6C
0001066500  7470  8200  7309  6E69  6567  5F6C  7470  0100
0001066520  0007  837F  0547  4D83  0105  000E  827F  7005
0001066540  696F  746E  8200  7002  0474  0101  8000  0101
0001066560  8000  0101  8000  1801  7900  3085  0410  5D83
0001066600  8305  055E  0A82  7528  746E  6761  6567  2964
0001066620  0169  0007  8578  1000  4683  0105  000D  837F
0001066640  0085  8583  8300  0085  5C83  0105  0044  827F
0001066660  6E0D  6D75  6F5F  5F66  6F70  6E69  7374  8200
0001066700  6E10  6D75  6F5F  5F66  6E69  6574  6E72  6C61
0001066720  0273  1082  756E  5F6D  666F  655F  7478  7265
0001066740  616E  736C  8204  700A  696F  746E  765F  6365
0001066760  0674  1801  7900  3085  0402  6083  8305  0561
0001067000  0A82  7528  746E  6761  6567  2964  0169  000D
0001067020  837F  0085  8583  8300  0085  D783  0103  004C
0001067040  827F  6E0D  6D75  6F5F  5F66  6F70  6E69  7374
0001067060  8200  6E10  6D75  6F5F  5F66  6E69  6574  6E72
0001067100  6C61  0273  1082  756E  5F6D  666F  655F  7478
0001067120  7265  616E  736C  8204  7012  696F  746E  765F
0001067140  6365  5F74  666F  7366  7465  0673  1801  7900
0001067160  B085  0214  6483  8305  0565  0A82  7528  746E
0001067200  6761  6567  2964  0169  0007  8578  13B0  5F83
0001067220  0105  0007  837F  0254  6383  0105  0020  827F
0001067240  730C  7274  7069  6C5F  6F6F  756B  0070  0D82
0001067260  6361  6563  7373  745F  6261  656C  2073  1801
0001067300  7900  E085  0839  6783  8305  0568  0A82  7528
0001067320  746E  6761  6567  2964  0169  0019  837F  0085
0001067340  8183  8300  0081  8183  8300  0081  5B83  8305
0001067360  0562  6283  0105  0088  827F  6909  6F63  5F6E
0001067400  6F6D  6564  8200  6C0B  6665  5F74  6F62  6472
0001067420  7265  8202  720C  6769  7468  625F  726F  6564
```

```
THU MAR 14 17:25:16 1991  CRV_IPS.DLL  PAGE 270, LINE 15872

0001067440  0472  0982  7075  625F  726F  6564  0672  0B82
0001067460  6F64  6E77  [illegible]25F  726F  6564  0872  0A82  6F70
0001067500  6E69  5F74  696C  7473  820A  6C18  6665  5F74
0001067520  6972  6867  5F74  6F62  6472  7265  615F  6363
0001067540  7365  8573  0210  1582  7075  645F  776F  5F6E
0001067560  6F62  6472  7265  615F  6363  7365  8573  04A6
0001067600  1901  7900  4085  053A  6C83  8305  056D  0B82
0001067620  6369  6E6F  645F  6373  7072  6974  0101  8000
0001067640  0701  7A00  8373  0569  0082  1001  7F00  8583
0001067660  8300  0085  6683  8305  056B  6B83  0105  0049
0001067700  827F  6907  6F63  5F6E  6469  8200  690E  6F63
0001067720  5F6E  7461  7274  6269  7475  0265  0A82  6369
0001067740  6E6F  735F  6168  6570  8204  700D  6572  6976
0001067760  756F  5F73  6369  6E6F  4085  8207  6E09  7865
0001070000  5F74  6369  6E6F  4485  0107  0001  0180  0001
0001070020  0180  0001  0180  0001  0180  0001  0180  0001
*
0001070320  0180  0018  8579  00C0  830B  05A1  A283  8205
0001070340  280A  6E75  6174  6767  6465  6929  2201  7F00
0001070360  8583  8300  0085  8183  8300  0081  8183  8300
0001070400  0081  8183  8300  0081  8683  8300  0085  8583
0001070420  0100  0060  827F  6302  0078  0282  7963  8202
0001070440  7802  0431  0282  3179  8206  7802  0832  0282
0001070460  3279  820A  6804  5F70  0C78  0482  7068  795F
0001070500  820E  690E  6F63  5F6E  7274  6E61  5F73  7470
0001070520  1072  0D82  6373  5F72  6762  635F  6C6F  756F
0001070540  1472  0F82  7068  635F  6F72  7373  635F  6C6F
0001070560  756F  1672  0101  8000  0101  8000  0101  8000
0001070600  0101  8000  0101  8000  0101  8000  0101  8000
*
0001071100  0101  8000  0101  8000  0101  8000  0701  7A00
0001071120  8373  0484  0082  0A01  7500  8380  0081  0364
0001071140  DB83  0105  000A  837F  05D9  DB83  8303  00C5
0001071160  0A01  7500  8380  0081  0164  DD83  0105  0004
0001071200  837F  03DC  0A01  7500  8380  0081  0364  DF83
0001071220  0105  000A  837F  03F9  8583  8300  03DC  0A01
0001071240  7500  8380  0081  0264  E183  0105  0007  837F
0001071260  03F9  F783  0104  000A  8075  8183  7300  8300
0001071300  0201  0A01  7500  8380  0081  0073  0183  0102
0001071320  0004  837F  04F7  0A01  7500  8380  0081  0173
0001071340  E483  0105  0001  0180  0001  0180  0007  8578
0001071360  0088  8083  0100  0007  8578  00B0  8083  0100
0001071400  0007  737A  EB83  8205  0100  000A  8075  8183
0001071420  6400  8300  0201  0501  7800  8360  0082  0501
0001071440  7800  8340  0080  0501  7800  8378  0080  0501
0001071460  7800  8368  0080  0701  7800  F885  8300  0080
0001071500  0701  7800  0085  8301  0080  0501  7800  8308
0001071520  0080  0501  7800  8360  0080  0701  7800  9885
0001071540  8300  0080  0701  7800  D885  8300  0080  0701
0001071560  7800  3885  8301  0080  0701  7800  6885  8301
0001071600  0080  0701  7800  9085  8301  0080  0701  7800
0001071620  8085  8300  0080  0701  7800  7085  8301  0080
0001071640  0701  7800  8885  8301  0080  0701  7800  0885
0001071660  8301  0080  0701  7800  7885  8301  0080  0701
0001071700  7800  2885  8301  0080  0701  7800  8085  8301
0001071720  0080  0A01  7F00  D983  8305  03DB  C583  0100
0001071740  000A  8075  8183  6400  8303  0600  0101  8000
0001071760  0501  7800  8350  0080  0501  7800  8338  0080
0001072000  0401  7F00  F983  0103  000A  8075  8183  6400
```

```
THU MAR 14 17:25:16 1991  CRV_IPS.DLL  PAGE 271, LINE 15931

0001072020  8301  0605  0401  7F00  DC83  0103  000A  8075
0001072040  8183  6400  8301  0607  0A01  7F00  F983  8303
0001072060  0085  DC83  0103  000A  8075  8183  6400  8303
0001072100  0609  0701  7800  E085  8300  0080  0701  7800
0001072120  1885  8301  0080  0701  7800  3085  8301  0080
0001072140  0401  7F00  F983  0103  000A  8075  8183  6400
0001072160  8301  060E  0701  7F00  F983  8303  04F7  0A01
0001072200  7500  8380  0081  0264  1083  0106  0004  837F
0001072220  03F9  0A01  7500  8380  0081  0164  1283  0106
0001072240  000A  8075  8183  7300  8300  0201  0501  7800
0001072260  8348  0080  0A01  7500  8380  0081  0073  0183
0001072300  0102  0001  0180  0007  8578  00A8  8083  0100
0001072320  0007  8578  0400  8583  0100  0007  8578  0140
0001072340  8083  0100  0001  0180  0001  0180  0001  0180
0001072360  0001  0180  0001  0180  0001  0180  0001  0180
*
0001072620  0001  0180  0007  8578  0100  8083  0100  0001
0001072640  0180  0001  0180  0001  0180  0001  0180  0001
*
0001100120  0180  0001  0180  0001  0180  0016  2079  8302
0001100140  04DD  DE83  8204  280A  6E75  6174  6767  6465
0001100160  6929  0701  7F00  8183  8300  0081  0901  7F00
0001100200  0182  0078  0182  0279  1601  7900  0240  E083
0001100220  8304  04E1  0A82  7528  746E  6761  6567  2964
0001100240  0169  0007  837F  04DC  DC83  0104  000D  827F
0001100260  6D03  6E69  8200  6D03  7861  0104  0001  0180
0001100300  0016  2079  8302  04E4  E583  8204  280A  6E75
0001100320  6174  6767  6465  6929  0701  7F00  8583  8300
0001100340  0085  1201  7F00  0582  6977  7464  0068  0682
0001100360  6568  6769  7468  0102  0001  0180  0016  4079
0001100400  8302  04E8  E983  8204  280A  6E75  6174  6767
0001100420  6465  6929  0701  7F00  DC83  8304  04E3  1101
0001100440  7F00  0682  726F  6769  6E69  8200  6104  6572
0001100460  0461  0101  8000  0101  8000  0101  8000  0101
0001100500  8000  0101  8000  0101  8000  0101  8000  0101
*
0001100740  8000  0101  8000  1601  7900  0330  1883  8305
0001100760  0519  0A82  7528  746E  6761  6567  2964  0169
0001101000  000A  837F  0085  8583  8300  0085  1A01  7F00
0001101020  0582  6977  7464  0068  0682  6568  6769  7468
0001101040  8202  6405  7065  6874  0104  0018  8579  0140
0001101060  8308  051C  1D83  8205  280A  6E75  6174  6767
0001101100  6465  6929  0701  7800  8085  8300  0084  1901
0001101120  7F00  8183  8300  0517  8583  8300  0085  C483
0001101140  8300  0082  E483  8300  051B  5AC1  7F00  0682
0001101160  6572  7270  7365  8200  6406  6D69  6E65  0273
0001101200  1082  6164  6174  6C5F  7961  7265  645F  7065
0001101220  6874  8208  7308  6769  735F  7A69  0A65  0782
0001101240  6973  5F67  7470  0C72  0982  7462  706D  735F
0001101260  7A69  1065  0882  7462  706D  705F  7274  8214
0001101300  7305  6170  6572  0118  0001  0180  0018  8579
0001101320  05A0  830C  0521  2283  8205  280A  6E75  6174
0001101340  6767  6465  6929  0701  7800  8085  8301  0084
0001101360  2501  7F00  8683  8300  022C  2C83  8302  0086
0001101400  8183  8300  0085  8683  8300  0082  8683  8300
0001101420  04DC  1A83  8305  0520  7E01  7F00  0282  6469
0001101440  8200  6E04  6D61  0465  0982  6966  656C  6E5F
0001101460  6D61  2465  0982  7865  5F70  6374  695F  4464
0001101500  0482  7974  6570  8248  720C  6665  6C5F  6E69
```

```
THU MAR 14 17:25:16 1991  CRV_IPS.DLL  PAGE 272, LINE 15990

0001101520  5F65  756E  4A6D  0982  6572  5F66  6374  695F
0001101540  4C64  0A82  6974  656D  735F  6174  706D  8250
0001101560  6106  696F  695F  5464  0882  6F6C  6163  6974
0001101600  6E6F  8258  6209  6D74  5F70  6E69  6F66  825C
0001101620  7305  6170  6572  8485  0100  0001  0180  0001
0001101640  0180  0001  0180  0001  0180  0001  0180  0001
*
0001101700  0180  0007  737A  1F83  8205  0100  0001  0180
0001101720  0001  0180  0001  0180  0001  0180  0001  0180
*
0001102340  0001  0180  0018  8579  02C0  8307  0576  7783
0001102360  8205  280A  6E75  6174  6767  6465  6929  0701
0001102400  7800  2085  8301  0084  1601  7F00  8683  8300
0001102420  022C  DF83  8304  0081  8183  8300  0082  7583
0001102440  0105  0038  827F  6902  0064  0482  616E  656D
0001102460  8204  7204  6365  2474  0482  7461  7274  822C
0001102500  6405  6D75  796D  822E  740A  6D69  5F65  7473
0001102520  6D61  3070  0582  7073  7261  3465  0101  8000
0001102540  0101  8000  0101  8000  0101  8000  0101  8000
*
0001102740  0101  8000  0101  8000  1801  7900  1085  1101
0001102760  9C83  8305  059D  0A82  7528  746E  6761  6567
0001103000  2964  0169  0034  837F  0085  8583  8300  0085
0001103020  8583  8300  0085  8583  8300  0081  8583  8300
0001103040  0085  8583  8300  0084  8583  8300  0085  8583
0001103060  8300  0085  8583  8300  0085  0601  7F01  0982
0001103100  6974  656D  755F  696E  0074  0F82  696D  5F6E
0001103120  6572  6F63  6472  745F  6D69  0265  0982  7473
0001103140  6261  6C69  7469  0479  0F82  6163  7470  7275
0001103160  5F65  6974  656D  756F  0674  0A82  656B  5F79
0001103200  6F66  6D72  7461  8208  6313  6E6F  6974  756E
0001103220  756F  5F73  7274  6361  696B  676E  820A  6D0E
0001103240  756F  6573  745F  6172  6B63  6E69  0C67  1182
0001103260  6163  7470  7275  5F65  6973  6E67  7461  7275
0001103300  0E65  0B82  6F68  6B74  7965  735F  6E79  1063
0001103320  0C82  6564  6166  6C75  5F74  6974  656D  8212
0001103340  6D09  7861  645F  6C65  7961  8214  660B  7361
0001103360  5F74  6572  6C70  7961  8216  760E  7265  6669
0001103400  5F79  6974  656D  756F  1874  0C82  6177  7469
0001103420  745F  6D69  6F65  7475  821A  730C  6E79  5F63
0001103440  6974  656D  756F  1C74  0982  6874  6572  6873
0001103460  6C6F  1E64  0C82  6863  6365  5F6B  6F6C  6B6F
0001103500  7075  0120  0001  0180  0007  8578  0800  8083
0001103520  0100  0001  0180  0001  0180  0001  0180  0001
0001103540  0180  0001  0180  0001  0180  0001  0180  0001
*
0001103720  0180  0001  0180  0016  4079  8302  05C2  C383
0001103740  8205  280A  6E75  6174  6767  6465  6929  0701
0001103760  7F00  8283  8300  0082  1701  7F00  0882  6564
0001104000  5F66  6974  656D  8200  6D08  6E69  745F  6D69
0001104020  0465  0101  8000  0101  8000  0101  8000  0101
0001104040  8000  0101  8000  0101  8000  1601  7900  0440
0001104060  CB83  8305  05CC  0A82  7528  746E  6761  6567
0001104100  2964  0169  000D  837F  0084  8483  8300  0084
0001104120  DC83  0104  0029  827F  6107  7362  725F  6C65
0001104140  8200  7505  696E  7374  8201  730C  6570  6963
0001104160  6C61  665F  6E75  0263  0482  6964  7073  0104
0001104200  0001  0180  0001  0180  0001  0180  0016  2079
0001104220  8302  05D1  D283  8205  280A  6E75  6174  6767
```

THU MAR 14 17:25:16 1991 CRV_IPS.DLL PAGE 273, LINE 16049

| | | | | | | | | |
|---|---|---|---|---|---|---|---|---|
| 0001104240 | 6465 | 6929 | 0701 | 7F00 | 8183 | 8300 | 0081 | 1E01 |
| 0001104260 | 7F00 | 0982 | 7973 | 636E | 6D5F | 646F | 0065 | 0E82 |
| 0001104300 | 7973 | 636E | 655F | 6578 | 5F63 | 6F6D | 6564 | 0102 |
| 0001104320 | 0016 | 3079 | 8302 | 05D4 | D583 | 8205 | 280A | 6E75 |
| 0001104340 | 6174 | 6767 | 6465 | 6929 | 0701 | 7F00 | 8283 | 8300 |
| 0001104360 | 0081 | 1901 | 7F00 | 0782 | 6574 | 6863 | 695F | 0064 |
| 0001104400 | 0B82 | 6574 | 6863 | 725F | 6165 | 6F73 | 046E | 0101 |
| 0001104420 | 8000 | 0101 | 8000 | 0101 | 8000 | 1801 | 7900 | 2085 |
| 0001104440 | 0302 | DA83 | 8305 | 05DB | 0A82 | 7528 | 746E | 6761 |
| 0001104460 | 6567 | 2964 | 0169 | 000A | 837F | 022C | 2C83 | 8302 |
| 0001104500 | 0086 | 1A01 | 7F00 | 0582 | 6D69 | 6761 | 0065 | 0482 |
| 0001104520 | 6964 | 6666 | 8220 | 6407 | 6669 | 5F66 | 6469 | 0140 |
| 0001104540 | 0018 | 8579 | 0310 | 8302 | 05DE | DF83 | 8205 | 280A |
| 0001104560 | 6E75 | 6174 | 6767 | 6465 | 6929 | 0701 | 7800 | 0085 |
| 0001104600 | 8303 | 022C | 0701 | 7F00 | 8583 | 8300 | 05DD | 2401 |
| 0001104620 | 7F00 | 0E82 | 756E | 5F6D | 666F | 735F | 7263 | 6565 |
| 0001104640 | 736E | 8200 | 690F | 616D | 6567 | 6E5F | 6D61 | 5F65 |
| 0001104660 | 696C | 7473 | 0102 | 0016 | 2079 | 8301 | 05E1 | E283 |
| 0001104700 | 8205 | 280A | 6E75 | 6174 | 6767 | 6465 | 6929 | 0401 |
| 0001104720 | 7F00 | C083 | 0100 | 000A | 827F | 7306 | 7274 | 6E69 |
| 0001104740 | 0067 | 0101 | 8000 | 0101 | 8000 | 0101 | 8000 | 1601 |
| 0001104760 | 7900 | 0230 | E783 | 8305 | 05E8 | 0A82 | 7528 | 746E |
| 0001105000 | 6761 | 6567 | 2964 | 0169 | 0007 | 837F | 0082 | 8183 |
| 0001105020 | 0100 | 001E | 827F | 650C | 6378 | 7065 | 6974 | 6E6F |
| 0001105040 | 695F | 0064 | 0B82 | 7865 | 7063 | 735F | 6174 | 7574 |
| 0001105060 | 0473 | 1601 | 7900 | 0220 | ED83 | 8305 | 05EE | 0A82 |
| 0001105100 | 7528 | 746E | 6761 | 6567 | 2964 | 0169 | 0016 | 0879 |
| 0001105120 | 8302 | 05EB | EC83 | 8205 | 280A | 6E75 | 6174 | 6767 |
| 0001105140 | 6465 | 6929 | 0701 | 7F00 | 8483 | 8300 | 0084 | 1B01 |
| 0001105160 | 7F00 | 0882 | 656B | 5F79 | 6F63 | 6564 | 8200 | 730C |
| 0001105200 | 6977 | 6374 | 5F68 | 7473 | 7461 | 0065 | 0701 | 7F00 |
| 0001105220 | 8183 | 8300 | 05EA | 1801 | 7F00 | 0882 | 656B | 5F79 |
| 0001105240 | 7974 | 6570 | 8200 | 6B09 | 7965 | 765F | 6C61 | 6575 |
| 0001105260 | 0102 | 0018 | 8579 | 0230 | 8304 | 05F1 | F283 | 8205 |
| 0001105300 | 280A | 6E75 | 6174 | 6767 | 6465 | 6929 | 0701 | 7800 |
| 0001105320 | 0085 | 8302 | 05E9 | 0D01 | 7F00 | 8583 | 8300 | 05F0 |
| 0001105340 | 8183 | 8300 | 0081 | 2E01 | 7F00 | 0882 | 6573 | 5F71 |
| 0001105360 | 6973 | 657A | 8200 | 7303 | 7165 | 8202 | 6B08 | 7965 |
| 0001105400 | 615F | 7474 | 4272 | 0E82 | 6361 | 6974 | 6176 | 6574 |
| 0001105420 | 5F64 | 7566 | 636E | 0144 | 0001 | 0180 | 0001 | 0180 |
| 0001105440 | 0001 | 0180 | 0001 | 0180 | 0001 | 0180 | 0001 | 0180 |
| 0001105460 | 0001 | 0180 | 0001 | 0180 | 0016 | 2079 | 8302 | 05FC |
| 0001105500 | FD83 | 8205 | 280A | 6E75 | 6174 | 6767 | 6465 | 6929 |
| 0001105520 | 0701 | 7F00 | 8183 | 8300 | 0081 | 1701 | 7F00 | 0882 |
| 0001105540 | 656B | 5F79 | 7461 | 7274 | 8200 | 6608 | 6E75 | 5F63 |
| 0001105560 | 656B | 0279 | 1801 | 7900 | 1085 | 0202 | FF83 | 8305 |
| 0001105600 | 0600 | 0A82 | 7528 | 746E | 6761 | 6567 | 2964 | 0169 |
| 0001105620 | 0007 | 837F | 0085 | F083 | 0105 | 0012 | 827F | 7308 |
| 0001105640 | 7165 | 735F | 7A69 | 0065 | 0382 | 6573 | 0271 | 0101 |
| 0001105660 | 8000 | 0101 | 8000 | 0101 | 8000 | 0101 | 8000 | 0101 |
| 0001105700 | 8000 | 1801 | 7900 | D085 | 0202 | 0783 | 8306 | 0608 |
| 0001105720 | 0A82 | 7528 | 746E | 6761 | 6567 | 2964 | 0169 | 0007 |
| 0001105740 | 837F | 0574 | 8183 | 0100 | 0011 | 827F | 6606 | 6C69 |
| 0001105760 | 6574 | 0072 | 0482 | 6F6D | 6564 | 0158 | 0018 | 8579 |
| 0001106000 | 0150 | 8305 | 060A | 0B83 | 8206 | 280A | 6E75 | 6174 |
| 0001106020 | 6767 | 6465 | 6929 | 1001 | 7F00 | 2C83 | 8302 | 0086 |
| 0001106040 | 8183 | 8300 | 0081 | 8183 | 0100 | 002B | 827F | 6E04 |
| 0001106060 | 6D61 | 0065 | 0682 | 696C | 5F62 | 6469 | 8220 | 6305 |
| 0001106100 | 616C | 7373 | 8224 | 7305 | 7974 | 656C | 8226 | 6F07 |

THU MAR 14 17:25:16 1991 CRV_IPS.DLL PAGE 274, LINE 16108

```
0001106120  5F70  6F63  6564  0128  0001  0180  0001  0180
0001106140  0001  0180  001B  2079  8309  0610  1183  8206
0001106160  690F  755F  6D5F  6773  705F  7261  6D61  745F
0001106200  0169  001C  837F  0081  8583  8300  0082  8683
0001106220  8300  0088  8083  8300  0084  C083  8300  00C0
0001106240  6A01  7F00  0982  5F69  5F75  6873  726F  0074
0001106260  0A82  5F69  5F75  7375  6F68  7472  8200  6908
0001106300  755F  6C5F  6E6F  0067  0982  5F69  5F75  6C75
0001106320  6E6F  0067  0982  5F69  5F75  6C66  616F  0074
0001106340  0882  5F69  5F75  6863  7261  8200  6909  755F
0001106360  755F  6863  7261  8200  6907  755F  735F  7274
0001106400  8200  6909  755F  625F  6F6C  6B63  0100  0019
0001106420  3079  8302  0613  1483  8206  690D  6D5F  6773
0001106440  705F  7261  6D61  745F  0169  0007  837F  0085
0001106460  0F83  0106  0010  827F  7404  7079  0065  0582
0001106500  6176  756C  0265  0101  8000  1C01  7900  9085
0001106520  0900  1783  8306  0618  0E82  5F69  736D  5F67
0001106540  6568  6461  7265  745F  0169  001C  837F  0081
0001106560  8183  8300  0085  8583  8300  0084  8583  8300
0001106600  0085  8183  8300  0085  4701  7F00  0482  5F71
0001106620  6469  8200  7306  756F  6372  0265  0382  6970
0001106640  0464  0382  6974  0664  0482  6572  7073  8208
0001106660  7208  7365  5F70  6974  0A64  0782  706F  635F
0001106700  646F  0C65  0482  7974  6570  820E  7304  7A69
0001106720  1065  1501  7900  C085  0200  1883  8306  061C
0001106740  0782  5F69  736D  5F67  6974  0501  7800  8330
0001106760  0612  0701  7F00  1683  8306  061A  1701  7F00
0001107000  0682  6568  6461  7265  8200  700A  7261  6D61
0001107020  6C5F  7369  1274  0101  8000  0101  8000  0101
0001107040  8000  0101  8000  0101  8000  0101  8000  0101
*
0001107220  8000  0101  8000  1601  7900  0330  3E83  8306
0001107240  063F  0A82  7528  746E  6761  6567  2964  0169
0001107260  000A  837F  0085  8583  8300  0085  2201  7F00
0001107300  0982  6373  6572  6E65  625F  0067  0782  6369
0001107320  6E6F  625F  0267  0882  7068  635F  6F72  7373
0001107340  0104  0018  8579  01B0  8310  0641  4283  8206
0001107360  280A  6E75  6174  6767  6465  6929  3101  7F00
0001107400  8183  8300  0085  8583  8300  0085  8583  8300
0001107420  0086  8683  8300  0086  8683  8300  0086  8683
0001107440  8300  0517  8583  8300  063D  8683  8300  0085
0001107460  E801  7F00  0382  6564  0076  0982  6874  6572
0001107500  6873  6C6F  0264  1282  6C62  6E69  696B  676E
0001107520  745F  7268  7365  6F68  646C  8204  6512  7272
0001107540  655F  656C  5F6D  6874  6572  6873  6C6F  0664
0001107560  1282  7865  7063  655F  7272  745F  7268  7365
0001107600  6F68  646C  8208  7309  6174  6962  696C  7974
0001107620  820A  7408  6D69  5F65  756F  0E74  0D82  7973
0001107640  636E  745F  6D69  5F65  756F  1274  0682  7374
0001107660  5F74  6469  8216  640B  6669  5F66  7374  5F74
0001107700  6469  821A  700D  7261  6E65  5F74  7374  5F74
0001107720  6469  821E  6406  6D69  6E65  2273  1082  6164
0001107740  6174  6C5F  7961  7265  645F  7065  6874  8228
0001107760  690C  6F63  5F6E  6F63  6F6C  7275  2A73  0D82
0001110000  6F61  5F69  6F78  5F72  6F63  6F6C  3072  0A82
0001110020  6E69  6574  6C72  6361  6465  0134  0001  0180
0001110040  0001  0180  0001  0180  0001  0180  0001  0180
0001110060  0001  0180  0016  4079  8303  064B  4C83  8206
0001110100  280A  6E75  6174  6767  6465  6929  0701  7A00
```

THU MAR 14 17:25:16 1991 CRV_IPS.DLL PAGE 275, LINE 16167

| | | | | | | | | |
|---|---|---|---|---|---|---|---|---|
| 0001110120 | 8373 | 05EF | 0082 | 0A01 | 7F00 | 8183 | 8300 | 0081 |
| 0001110140 | 4A83 | 0106 | 002B | 827F | 6106 | 7463 | 6F69 | 006E |
| 0001110160 | 0F82 | 756E | 5F6D | 666F | 735F | 666F | 6B74 | 7965 |
| 0001110200 | 0273 | 0C82 | 6F73 | 7466 | 656B | 7379 | 705F | 7274 |
| 0001110220 | 0104 | 0016 | 4079 | 8303 | 064F | 5083 | 8206 | 280A |
| 0001110240 | 6E75 | 6174 | 6767 | 6465 | 6929 | 0701 | 7A00 | 8373 |
| 0001110260 | 05FE | 0082 | 0A01 | 7F00 | 8183 | 8300 | 0081 | 4E83 |
| 0001110300 | 0106 | 0029 | 827F | 6106 | 7463 | 6F69 | 006E | 0E82 |
| 0001110320 | 756E | 5F6D | 666F | 685F | 746F | 656B | 7379 | 8202 |
| 0001110340 | 680B | 746F | 656B | 7379 | 705F | 7274 | 0104 | 0018 |
| 0001110360 | 8579 | 0170 | 8305 | 0652 | 5383 | 8206 | 280A | 6E75 |
| 0001110400 | 6174 | 6767 | 6465 | 6929 | 1001 | 7F00 | 2C83 | 8302 |
| 0001110420 | 0086 | 2D83 | 8305 | 00E4 | 8583 | 0100 | 003D | 827F |
| 0001110440 | 690A | 616D | 6567 | 6E5F | 6D61 | 0065 | 0882 | 6D69 |
| 0001110460 | 6761 | 5F65 | 6469 | 8220 | 6909 | 616D | 6567 | 705F |
| 0001110500 | 7274 | 8224 | 6C09 | 7961 | 7265 | 705F | 7274 | 8228 |
| 0001110520 | 6909 | 616D | 6567 | 685F | 6C64 | 012C | 0001 | 0180 |
| 0001110540 | 0001 | 0180 | 0001 | 0180 | 0001 | 0180 | 0018 | 8579 |
| 0001110560 | 0190 | 8302 | 0659 | 5A83 | 8206 | 280A | 6E75 | 6174 |
| 0001110600 | 6767 | 6465 | 6929 | 0701 | 7F00 | 8283 | 8300 | 0651 |
| 0001110620 | 1801 | 7F00 | 0C82 | 7865 | 6563 | 7470 | 6F69 | 5F6E |
| 0001110640 | 6469 | 8200 | 6905 | 616D | 6567 | 0104 | 0001 | 0180 |
| 0001110660 | 0016 | 4079 | 8303 | 065E | 5F83 | 8206 | 280A | 6E75 |
| 0001110700 | 6174 | 6767 | 6465 | 6929 | 0701 | 7A00 | 8373 | 0658 |
| 0001110720 | 0082 | 0A01 | 7F00 | 8183 | 8300 | 0081 | 5D83 | 0106 |
| 0001110740 | 002F | 827F | 6106 | 7463 | 6F69 | 006E | 1182 | 756E |
| 0001110760 | 5F6D | 666F | 655F | 6378 | 7065 | 6974 | 6E6F | 0273 |
| 0001111000 | 0E82 | 7865 | 6563 | 7470 | 6F69 | 5F6E | 696C | 7473 |
| 0001111020 | 0104 | 0018 | 8579 | 0450 | 8303 | 0661 | 6283 | 8206 |
| 0001111040 | 280A | 6E75 | 6174 | 6767 | 6465 | 6929 | 0A01 | 7F00 |
| 0001111060 | 5183 | 8306 | 0651 | 5183 | 0106 | 001A | 827F | 6906 |
| 0001111100 | 616D | 6567 | 0031 | 0682 | 6D69 | 6761 | 3265 | 822E |
| 0001111120 | 6404 | 6669 | 5C66 | 1801 | 7900 | A085 | 0301 | 6583 |
| 0001111140 | 8306 | 0666 | 0A82 | 7528 | 746E | 6761 | 6567 | 2964 |
| 0001111160 | 0169 | 0007 | 737A | 5183 | 8206 | 0100 | 000A | 837F |
| 0001111200 | 0081 | 6483 | 8306 | 0651 | 2601 | 7F00 | 0E82 | 756E |
| 0001111220 | 5F6D | 666F | 735F | 7263 | 6565 | 736E | 8200 | 690A |
| 0001111240 | 616D | 6567 | 6C5F | 7369 | 0274 | 0482 | 6964 | 6666 |
| 0001111260 | 0106 | 0018 | 8579 | 0210 | 8303 | 0668 | 6983 | 8206 |
| 0001111300 | 280A | 6E75 | 6174 | 6767 | 6465 | 6929 | 0A01 | 7F00 |
| 0001111320 | 2C83 | 8302 | 022C | 8183 | 0100 | 0019 | 827F | 6906 |
| 0001111340 | 616D | 6567 | 0031 | 0682 | 6D69 | 6761 | 3265 | 8220 |
| 0001111360 | 6303 | 7475 | 0140 | 0018 | 8579 | 0940 | 8307 | 066E |
| 0001111400 | 6F83 | 8206 | 280A | 6E75 | 6174 | 6767 | 6465 | 6929 |
| 0001111420 | 1801 | 7900 | 0085 | 1D08 | 6C83 | 8306 | 066D | 0A82 |
| 0001111440 | 7528 | 746E | 6761 | 6567 | 2964 | 0169 | 0058 | 837F |
| 0001111460 | 0084 | 9F83 | 8305 | 0084 | 8483 | 8300 | 05CA | 8183 |
| 0001111500 | 8300 | 04E7 | D083 | 8305 | 0606 | 7483 | 8305 | 0081 |
| 0001111520 | 4D83 | 8306 | 05D3 | 5C83 | 8306 | 05E6 | 8183 | 8300 |
| 0001111540 | 0649 | 5183 | 8306 | 0660 | 6383 | 8306 | 05DC | 8583 |
| 0001111560 | 8300 | 05D9 | 6783 | 8306 | 05E0 | 9B83 | 8305 | 05FB |
| 0001111600 | 0983 | 8306 | 0084 | 6F01 | 7F01 | 0A82 | 626B | 5F64 |
| 0001111620 | 7473 | 7461 | 7375 | 8200 | 7409 | 7365 | 5F74 | 616E |
| 0001111640 | 656D | 8200 | 6B08 | 7965 | 635F | 646F | 0065 | 0C82 |
| 0001111660 | 7773 | 7469 | 6863 | 735F | 6174 | 6574 | 8200 | 6C0C |
| 0001111700 | 636F | 7461 | 726F | 645F | 7369 | 0070 | 0E82 | 7274 |
| 0001111720 | 6361 | 696B | 676E | 6C5F | 7665 | 6C65 | 8200 | 730C |
| 0001111740 | 6163 | 656C | 775F | 6E69 | 6F64 | 0077 | 0982 | 7973 |
| 0001111760 | 636E | 6D5F | 646F | 0065 | 0A82 | 6966 | 746C | 7265 |

THU MAR 14 17:25:16 1991 CRV_IPS.DLL PAGE 276, LINE 16226

```
0001112000  6D5F  6773  8200  6606  6C69  6574  0072  0B82
0001112020  7563  7272  6E65  5F74  6F61  0069  0C82  6F68
0001112040  6B74  7965  5F73  696C  7473  8200  730A  6E79
0001112060  5F63  7665  6E65  0074  0E82  7865  6563  7470
0001112100  6F69  5F6E  696C  7473  8200  6510  6378  5F70
0001112120  7473  7461  7375  6C5F  7369  0074  0482  6F6D
0001112140  6564  8200  730D  666F  6B74  7965  5F73  696C
0001112160  7473  8200  6905  616D  6567  8200  6307  6D6F
0001112200  6170  6572  8200  770B  6961  5F74  6373  6572
0001112220  6E65  8200  690A  616D  6567  6C5F  7369  0074
0001112240  0982  6D69  6761  5F65  756E  006D  0A82  6D69
0001112260  6761  5F65  6964  6666  8200  680B  6C61  5F66
0001112300  6D69  6761  7365  8200  6D07  7361  6173  6567
0001112320  8200  7006  7261  6D61  0073  0882  7566  636E
0001112340  6B5F  7965  8200  6908  6F63  5F6E  736D  0067
0001112360  0582  7564  6D6D  0079  1601  7F00  8183  8300
0001112400  0619  8183  8300  05C1  6B83  8306  0081  8583
0001112420  0100  005A  827F  7306  756F  6372  0065  0A82
0001112440  736D  5F67  6568  6461  7265  8202  650A  6576
0001112460  746E  745F  7079  1A65  0682  6974  696D  676E
0001112500  821C  650B  6576  746E  765F  6C61  6575  8224
0001112520  720C  7465  7275  5F6E  6176  756C  8565  0124
0001112540  0982  6572  7073  665F  616C  8567  0126  0101
0001112560  8000  0101  8000  0101  8000  0101  8000  0101
*
0001113300  8000  0101  8000  0101  8000  1601  7900  0440
0001113320  C883  8306  06C9  0A82  7528  746E  6761  6567
0001113340  2964  0169  000D  837F  0085  8583  8300  0085
0001113360  8583  0100  0045  827F  6311  6D6F  6170  6572
0001113400  735F  6174  6574  665F  676C  8200  6310  6168
0001113420  676E  5F65  7473  7461  5F65  6C66  0267  0B82
0001113440  7266  6D61  5F65  6F63  6E75  0474  0C82  7473
0001113460  6261  656C  635F  756F  746E  0106  0001  0180
0001113500  0001  0180  0001  0180  0001  0180  0001  0180
*
0001113700  0016  2079  8302  06EC  ED83  8206  280A  6E75
0001113720  6174  6767  6465  6929  0701  7F00  8583  8300
0001113740  0085  0901  7F00  0182  0078  0182  0279  1601
0001113760  7900  0220  EF83  8306  06F0  0A82  7528  746E
0001114000  6761  6567  2964  0169  0007  837F  0085  8583
0001114020  0100  000B  827F  6302  0078  0282  7963  0102
0001114040  0016  4079  8302  06F2  F383  8206  280A  6E75
0001114060  6174  6767  6465  6929  0701  7F00  EB83  8306
0001114100  06EE  0C01  7F00  0282  3170  8200  7303  7A69
0001114120  0104  0016  3079  8302  06F5  F683  8206  280A
0001114140  6E75  6174  6767  6465  6929  0701  7F00  8583
0001114160  8300  0086  2001  7F00  1282  6373  6572  6E65
0001114200  635F  6168  676E  5F65  7974  6570  8200  7407
0001114220  6D69  6F65  7475  0102  0018  8579  00B0  8307
0001114240  06F8  F983  8206  280A  6E75  6174  6767  6465
0001114260  6929  1601  7F00  F183  8306  0085  8183  8300
0001114300  0081  8183  8300  0081  8683  0100  003A  827F
0001114320  7208  6365  5F74  6170  0072  0782  6964  5F72
0001114340  6170  0872  0582  616D  5F78  0A78  0582  696D
0001114360  5F6E  0C78  0282  7864  820E  6402  1079  0782
0001114400  6974  656D  756F  1274  1801  7900  A085  0700
0001114420  FB83  8306  06FC  0A82  7528  746E  6761  6567
0001114440  2964  0169  0016  837F  0081  F183  8306  0081
0001114460  8183  8300  0081  8183  8300  0081  3701  7F00
```

```
THU MAR 14 17:25:16 1991  CRV_IPS.DLL  PAGE 277, LINE 16285

0001114500  0682  6572  7573  746C  8200  7204  6365  0274
0001114520  0282  7864  820A  6402  0C79  0582  616D  5F78
0001114540  0E78  0582  696D  5F6E  1078  0982  6572  7463
0001114560  745F  7079  1265  0101  8000  0101  8000  0101
0001114600  8000  0101  8000  0101  8000  0101  8000  0101
*
0001114660  8000  0101  8000  0101  8000  0101  8000  0701
0001114700  7A00  8373  06F7  0082  0101  8000  0101  8000
0001114720  0101  8000  0101  8000  0101  8000  0101  8000
*
0001115200  0101  8000  0101  8000  0501  7800  8358  0080
0001115220  0501  7800  8330  0080  1001  7F00  8583  8300
0001115240  00C0  8483  8300  00C0  8483  0100  000A  8075
0001115260  8183  6400  8305  0742  0401  7F00  0F83  0107
0001115300  000A  8075  8183  6400  8301  0744  0A01  7500
0001115320  8380  0085  0064  0183  0102  0007  837F  0085
0001115340  C583  0100  000A  8075  8183  6400  8302  0747
0001115360  0A01  7500  8380  0085  0064  0183  0102  0007
0001115400  837F  00C5  C583  0100  000A  8075  8183  6400
0001115420  8302  074A  0701  7F00  C583  8300  00C5  0A01
0001115440  7500  8380  0081  0264  4C83  0107  000A  8075
0001115460  8183  6400  8300  0201  0701  7F00  8183  8300
0001115500  0081  0A01  7500  8380  0081  0264  4F83  0107
0001115520  000A  8075  8183  6400  8300  0201  0A01  7500
0001115540  8380  0081  0064  0183  0102  0004  837F  0081
0001115560  0A01  7500  8380  0081  0164  5383  0107  0004
0001115600  837F  0081  0A01  7500  8380  0081  0164  5583
0001115620  0107  0004  837F  0081  0A01  7500  8380  0081
0001115640  0164  5783  0107  0004  837F  0081  0A01  7500
0001115660  8380  0081  0164  5983  0107  000A  8075  8583
0001115700  6400  8300  0201  0401  7F00  8583  0100  000A
0001115720  8075  8583  6400  8301  075C  0A01  7500  8380
0001115740  0081  0064  0183  0102  0001  0180  0001  0180
0001115760  0001  0180  0001  0180  0001  0180  0001  0180
*
0001116220  0001  0180  0007  8578  0100  8083  0100  0001
0001116240  0180  0001  0180  0001  0180  0001  0180  0001
*
0001122140  0180  0001  0180  0001  0180  0001  0180  0012
0001122160  6079  8305  0422  2383  8204  5F06  6F69  7562
0001122200  6966  1001  7F00  C083  8300  0081  C083  8300
0001122220  0080  8083  0100  0027  827F  5F04  7470  0072
0001122240  0482  635F  746E  8204  5F05  6162  6573  8206
0001122260  5F05  6C66  6761  820A  5F05  6966  656C  010B
0001122300  0001  0180  0007  737A  2183  8204  0100  0001
0001122320  0180  0001  0180  0001  0180  0001  0180  0001
*
0001123660  0180  0016  2079  8302  04E0  E183  8204  280A
0001123700  6E75  6174  6767  6465  6929  0701  7F00  8183
0001123720  8300  0081  0901  7F00  0182  0078  0182  0279
0001123740  1601  7900  0240  E383  8304  04E4  0A82  7528
0001123760  746E  6761  6567  2964  0169  0007  837F  04DF
0001124000  DF83  0104  000D  827F  6D03  6E69  8200  6D03
0001124020  7861  0104  0001  0180  0016  2079  8302  04E7
0001124040  E883  8204  280A  6E75  6174  6767  6465  6929
0001124060  0701  7F00  8583  8300  0085  1201  7F00  0582
0001124100  6977  7464  0068  0682  6568  6769  7468  0102
0001124120  0001  0180  0016  4079  8302  04EB  EC83  8204
0001124140  280A  6E75  6174  6767  6465  6929  0701  7F00
```

THU MAR 14 17:25:16 1991 CRV_IPS.DLL PAGE 278, LINE 16344

| | | | | | | | | |
|---|---|---|---|---|---|---|---|---|
| 0001124160 | DF83 | 8304 | 04E6 | 1101 | 7F00 | 0682 | 726F | 6769 |
| 0001124200 | 6E69 | 8200 | 6104 | 6572 | 0461 | 0101 | 8000 | 0101 |
| 0001124220 | 8000 | 0101 | 8000 | 0101 | 8000 | 0101 | 8000 | 0101 |
| * | | | | | | | | |
| 0001124460 | 8000 | 0101 | 8000 | 0101 | 8000 | 0101 | 8000 | 1601 |
| 0001124500 | 7900 | 0330 | 1B83 | 8305 | 051C | 0A82 | 7528 | 746E |
| 0001124520 | 6761 | 6567 | 2964 | 0169 | 000A | 837F | 0085 | 8583 |
| 0001124540 | 8300 | 0085 | 1A01 | 7F00 | 0582 | 6977 | 7464 | 0068 |
| 0001124560 | 0682 | 6568 | 6769 | 7468 | 8202 | 6405 | 7065 | 6874 |
| 0001124600 | 0104 | 0018 | 8579 | 0140 | 8308 | 051F | 2083 | 8205 |
| 0001124620 | 280A | 6E75 | 6174 | 6767 | 6465 | 6929 | 0701 | 7800 |
| 0001124640 | 8085 | 8300 | 0084 | 1901 | 7F00 | 8183 | 8300 | 051A |
| 0001124660 | 8583 | 8300 | 0085 | C483 | 8300 | 0082 | E483 | 8300 |
| 0001124700 | 051E | 5A01 | 7F00 | 0682 | 6572 | 7270 | 7365 | 8200 |
| 0001124720 | 6406 | 6D69 | 6E65 | 0273 | 1082 | 6164 | 6174 | 6C5F |
| 0001124740 | 7961 | 7265 | 645F | 7065 | 6874 | 8208 | 7308 | 6769 |
| 0001124760 | 735F | 7A69 | 0A65 | 0782 | 6973 | 5F67 | 7470 | 0C72 |
| 0001125000 | 0982 | 7462 | 706D | 735F | 7A69 | 1065 | 0882 | 7462 |
| 0001125020 | 706D | 705F | 7274 | 8214 | 7305 | 6170 | 6572 | 0118 |
| 0001125040 | 0001 | 0180 | 0018 | 8579 | 05A0 | 830C | 0524 | 2583 |
| 0001125060 | 8205 | 280A | 6E75 | 6174 | 6767 | 6465 | 6929 | 0701 |
| 0001125100 | 7800 | 8085 | 8301 | 0084 | 2501 | 7F00 | 8683 | 8300 |
| 0001125120 | 022C | 2C83 | 8302 | 0086 | 8183 | 8300 | 0085 | 8683 |
| 0001125140 | 8300 | 0082 | 8683 | 8300 | 04DF | 1D83 | 8305 | 0523 |
| 0001125160 | 7E01 | 7F00 | 0282 | 6469 | 8200 | 6E04 | 6D61 | 0465 |
| 0001125200 | 0982 | 6966 | 656C | 6E5F | 6D61 | 2465 | 0982 | 7865 |
| 0001125220 | 5F70 | 6374 | 695F | 4464 | 0482 | 7974 | 6570 | 8248 |
| 0001125240 | 720C | 6665 | 6C5F | 6E69 | 5F65 | 756E | 4A6D | 0982 |
| 0001125260 | 6572 | 5F66 | 6374 | 695F | 4C64 | 0A82 | 6974 | 656D |
| 0001125300 | 735F | 6174 | 706D | 8250 | 6106 | 696F | 695F | 5464 |
| 0001125320 | 0882 | 6F6C | 6163 | 6974 | 6E6F | 8258 | 6209 | 6D74 |
| 0001125340 | 5F70 | 6E69 | 6F66 | 825C | 7305 | 6170 | 6572 | 8485 |
| 0001125360 | 0100 | 0001 | 0180 | 0001 | 0180 | 0001 | 0180 | 0001 |
| 0001125400 | 0180 | 0001 | 0180 | 0001 | 0180 | 0001 | 0180 | 0001 |
| 0001125420 | 0180 | 0001 | 0180 | 0001 | 0180 | 0007 | 737A | 2283 |
| 0001125440 | 8205 | 0100 | 0001 | 0180 | 0001 | 0180 | 0001 | 0180 |
| 0001125460 | 0001 | 0180 | 0001 | 0180 | 0001 | 0180 | 0001 | 0180 |
| * | | | | | | | | |
| 0001126060 | 0001 | 0180 | 0001 | 0180 | 0001 | 0180 | 0018 | 8579 |
| 0001126100 | 02C0 | 8307 | 0579 | 7A83 | 8205 | 280A | 6E75 | 6174 |
| 0001126120 | 6767 | 6465 | 6929 | 0701 | 7800 | 2085 | 8301 | 0084 |
| 0001126140 | 1601 | 7F00 | 8683 | 8300 | 022C | E283 | 8304 | 0081 |
| 0001126160 | 8183 | 8300 | 0082 | 7883 | 0105 | 0038 | 827F | 6902 |
| 0001126200 | 0064 | 0482 | 616E | 656D | 8204 | 7204 | 6365 | 2474 |
| 0001126220 | 0482 | 7461 | 7274 | 822C | 6405 | 6D75 | 796D | 822E |
| 0001126240 | 740A | 6D69 | 5F65 | 7473 | 6D61 | 3070 | 0582 | 7073 |
| 0001126260 | 7261 | 3465 | 0101 | 8000 | 0101 | 8000 | 0101 | 8000 |
| 0001126300 | 0101 | 8000 | 0101 | 8000 | 0101 | 8000 | 0101 | 8000 |
| * | | | | | | | | |
| 0001126500 | 1801 | 7900 | 1085 | 1101 | 9F83 | 8305 | 05A0 | 0A82 |
| 0001126520 | 7528 | 746E | 6761 | 6567 | 2964 | 0169 | 0034 | 837F |
| 0001126540 | 0085 | 8583 | 8300 | 0085 | 8583 | 8300 | 0085 | 8583 |
| 0001126560 | 8300 | 0081 | 8583 | 8300 | 0085 | 8583 | 8300 | 0084 |
| 0001126600 | 8583 | 8300 | 0085 | 8583 | 8300 | 0085 | 8583 | 8300 |
| 0001126620 | 0085 | 0601 | 7F01 | 0982 | 6974 | 656D | 755F | 696E |
| 0001126640 | 0074 | 0F82 | 696D | 5F6E | 6572 | 6F63 | 6472 | 745F |
| 0001126660 | 6D69 | 0265 | 0982 | 7473 | 6261 | 6C69 | 7469 | 0479 |
| 0001126700 | 0F82 | 6163 | 7470 | 7275 | 5F65 | 6974 | 656D | 756F |
| 0001126720 | 0674 | 0A82 | 656B | 5F79 | 6F66 | 6D72 | 7461 | 8208 |

THU MAR 14 17:25:16 1991  CRV_IPS.DLL  PAGE 279, LINE 16403

```
0001126740  6313  6E6F  6974  756E  756F  5F73  7274  6361
0001126760  696B  676E  820A  6D0E  756F  6573  745F  6172
0001127000  6B63  6E69  0C67  1182  6163  7470  7275  5F65
0001127020  6973  6E67  7461  7275  0E65  0B82  6F68  6B74
0001127040  7965  735F  6E79  1063  0C82  6564  6166  6C75
0001127060  5F74  6974  656D  8212  6D09  7861  645F  6C65
0001127100  7961  8214  660B  7361  5F74  6572  6C70  7961
0001127120  8216  760E  7265  6669  5F79  6974  656D  756F
0001127140  1874  0C82  6177  7469  745F  6D69  6F65  7475
0001127160  821A  730C  6E79  5F63  6974  656D  756F  1C74
0001127200  0982  6874  6572  6873  6C6F  1E64  0C82  6863
0001127220  6365  5F6B  6F6C  6B6F  7075  0120  0001  0180
0001127240  0007  8578  0800  8083  0100  0001  0180  0001
0001127260  0180  0001  0180  0001  0180  0001  0180  0001
*
0001127440  0180  0001  0180  0001  0180  0001  0180  0016
0001127460  4079  8302  05C5  C683  8205  280A  6E75  6174
0001127500  6767  6465  6929  0701  7F00  8283  8300  0082
0001127520  1701  7F00  0882  6564  5F66  6974  656D  8200
0001127540  6D08  6E69  745F  6D69  0465  0101  8000  0101
0001127560  8000  0101  8000  0101  8000  0101  8000  0101
0001127600  8000  1601  7900  0440  CE83  8305  05CF  0A82
0001127620  7528  746E  6761  6567  2964  0169  000D  837F
0001127640  0084  8483  8300  0084  DF83  0104  0029  827F
0001127660  6107  7362  725F  6C65  8200  7505  696E  7374
0001127700  8201  730C  6570  6963  6C61  665F  6E75  0263
0001127720  0482  6964  7073  0104  0001  0180  0001  0180
0001127740  0001  0180  0016  2079  8302  05D4  D583  8205
0001127760  280A  6E75  6174  6767  6465  6929  0701  7F00
0001130000  8183  8300  0081  1E01  7F00  0982  7973  636E
0001130020  6D5F  646F  0065  0E82  7973  636E  655F  6578
0001130040  5F63  6F6D  6564  0102  0016  3079  8302  05D7
0001130060  D883  8205  280A  6E75  6174  6767  6465  6929
0001130100  0701  7F00  8283  8300  0081  1901  7F00  0782
0001130120  6574  6863  695F  0064  0B82  6574  6863  725F
0001130140  6165  6F73  046E  0101  8000  0101  8000  0101
0001130160  8000  1801  7900  2085  0302  DD83  8305  05DE
0001130200  0A82  7528  746E  6761  6567  2964  0169  000A
0001130220  837F  022C  2C83  8302  0086  1A01  7F00  0582
0001130240  6D69  6761  0065  0482  6964  6666  8220  6407
0001130260  6669  5F66  6469  0140  0018  8579  0310  8302
0001130300  05E1  E283  8205  280A  6E75  6174  6767  6465
0001130320  6929  0701  7800  0085  8303  022C  0701  7F00
0001130340  8583  8300  05E0  2401  7F00  0E82  756E  5F6D
0001130360  666F  735F  7263  6565  736E  8200  690F  616D
0001130400  6567  6E5F  6D61  5F65  696C  7473  0102  0016
0001130420  2079  8301  05E4  E583  8205  280A  6E75  6174
0001130440  6767  6465  6929  0401  7F00  C083  0100  000A
0001130460  827F  7306  7274  6E69  0067  0101  8000  0101
0001130500  8000  0101  8000  1601  7900  0230  EA83  8305
0001130520  05EB  0A82  7528  746E  6761  6567  2964  0169
0001130540  0007  837F  0082  8183  0100  001E  827F  650C
0001130560  6378  7065  6974  6E6F  695F  0064  0B82  7865
0001130600  7063  735F  6174  7574  0473  1601  7900  0220
0001130620  F083  8305  05F1  0A82  7528  746E  6761  6567
0001130640  2964  0169  0016  0879  8302  05EE  EF83  8205
0001130660  280A  6E75  6174  6767  6465  6929  0701  7F00
0001130700  8483  8300  0084  1801  7F00  0882  656B  5F79
0001130720  6F63  6564  8200  730C  6977  6374  5F68  7473
```

THU MAR 14 17:25:16 1991 CRV_IPS.DLL PAGE 280, LINE 16462

```
0001130740  7461  0065  0701  7F00  8183  8300  05ED  1801
0001130760  7F00  0882  656B  5F79  7974  6570  8200  6B09
0001131000  7965  765F  6C61  6575  0102  0018  8579  0230
0001131020  8304  05F4  F583  8205  280A  6E75  6174  6767
0001131040  6465  6929  0701  7800  0085  8302  05EC  0D01
0001131060  7F00  8583  8300  05F3  8183  8300  0081  2E01
0001131100  7F00  0882  6573  5F71  6973  657A  8200  7303
0001131120  7165  8202  6B08  7965  615F  7474  4272  0E82
0001131140  6361  6974  6176  6574  5F64  7566  636E  0144
0001131160  0001  0180  0001  0180  0001  0180  0001  0180
*
0001131220  0016  2079  8302  05FF  0083  8206  280A  6E75
0001131240  6174  6767  6465  6929  0701  7F00  8183  8300
0001131260  0081  1701  7F00  0882  656B  5F79  7461  7274
0001131300  8200  6608  6E75  5F63  656B  0279  1801  7900
0001131320  1085  0202  0283  8306  0603  0A82  7528  746E
0001131340  6761  6567  2964  0169  0007  837F  0085  F383
0001131360  0105  0012  827F  7308  7165  735F  7A69  0065
0001131400  0382  6573  0271  0101  8000  0101  8000  0101
0001131420  8000  0101  8000  0101  8000  1801  7900  D085
0001131440  0202  0A83  8306  060B  0A82  7528  746E  6761
0001131460  6567  2964  0169  0007  837F  0577  8183  0100
0001131500  0011  827F  6606  6C69  6574  0072  0482  6F6D
0001131520  6564  0158  0018  8579  0150  8305  060D  0E83
0001131540  8206  280A  6E75  6174  6767  6465  6929  1001
0001131560  7F00  2C83  8302  0086  8183  8300  0081  8183
0001131600  0100  002B  827F  6E04  6D61  0065  0682  696C
0001131620  5F62  6469  8220  6305  616C  7373  8224  7305
0001131640  7974  656C  8226  6F07  5F70  6F63  6564  0128
0001131660  0001  0180  0001  0180  0001  0180  001B  2079
0001131700  8309  0613  1483  8206  690F  755F  6D5F  6773
0001131720  705F  7261  6D61  745F  0169  001C  837F  0081
0001131740  8583  8300  0082  8683  8300  0088  8063  8300
0001131760  0084  C083  8300  00C0  6A01  7F00  0982  5F69
0001132000  5F75  6873  726F  0074  0A82  5F69  5F75  7375
0001132020  6F68  7472  8200  6908  755F  6C5F  6E6F  0067
0001132040  0982  5F69  5F75  6C75  6E6F  0067  0982  5F69
0001132060  5F75  6C66  616F  0074  0882  5F69  5F75  6863
0001132100  7261  8200  6909  755F  755F  6863  7261  8200
0001132120  6907  755F  735F  7274  8200  6909  755F  625F
0001132140  6F6C  6B63  0100  0019  3079  8302  0616  1783
0001132160  8206  690D  6D5F  6773  705F  7261  6D61  745F
0001132200  0169  0007  837F  0085  1283  0106  0010  827F
0001132220  7404  7079  0065  0582  6176  756C  0265  0101
0001132240  8000  1C01  7900  9085  0900  1A83  8306  061B
0001132260  0E82  5F69  736D  5F67  6568  6461  7265  745F
0001132300  0169  001C  837F  0081  8183  8300  0085  8583
0001132320  8300  0084  8583  8300  0085  8183  8300  0085
0001132340  4701  7F00  0482  5F71  6469  8200  7306  756F
0001132360  6372  0265  0382  6970  0464  0382  6974  0664
0001132400  0482  6572  7073  8208  7208  7365  5F70  6974
0001132420  0A64  0782  706F  635F  646F  0C65  0482  7974
0001132440  6570  820E  7304  7A69  1065  1501  7900  C085
0001132460  0200  1E83  8306  061F  0782  5F69  736D  5F67
0001132500  6974  0501  7800  8330  0615  0701  7F00  1983
0001132520  8306  061D  1701  7F00  0682  6568  6461  7265
0001132540  8200  700A  7261  6D61  6C5F  7369  1274  0101
0001132560  8000  0101  8000  0101  8000  0101  8000  0101
*
```

THU MAR 14 17:25:16 1991 CRV_IPS.DLL PAGE 281, LINE 16521

| | | | | | | | | |
|---|---|---|---|---|---|---|---|---|
| 0001132740 | 8000 | 0101 | 8000 | 0101 | 8000 | 0101 | 8000 | 1601 |
| 0001132760 | 7900 | 0330 | 4183 | 8306 | 0642 | 0A82 | 7528 | 746E |
| 0001133000 | 6761 | 6567 | 2964 | 0169 | 000A | 837F | 0085 | 8583 |
| 0001133020 | 8300 | 0085 | 2201 | 7F00 | 0982 | 6373 | 6572 | 6E65 |
| 0001133040 | 625F | 0067 | 0782 | 6369 | 6E6F | 625F | 0267 | 0882 |
| 0001133060 | 7068 | 635F | 6F72 | 7373 | 0104 | 0018 | 8579 | 01B0 |
| 0001133100 | 8310 | 0644 | 4583 | 8206 | 280A | 6E75 | 6174 | 6767 |
| 0001133120 | 6465 | 6929 | 3101 | 7F00 | 8183 | 8300 | 0085 | 8583 |
| 0001133140 | 8300 | 0085 | 8583 | 8300 | 0086 | 8683 | 8300 | 0086 |
| 0001133160 | 8683 | 8300 | 0086 | 8683 | 8300 | 051A | 8583 | 8300 |
| 0001133200 | 0640 | 8683 | 8300 | 0085 | E801 | 7F00 | 0382 | 6564 |
| 0001133220 | 0076 | 0982 | 6874 | 6572 | 6873 | 6C6F | 0264 | 1282 |
| 0001133240 | 6C62 | 6E69 | 696B | 676E | 745F | 7268 | 7365 | 6F68 |
| 0001133260 | 646C | 8204 | 6512 | 7272 | 655F | 656C | 5F6D | 6874 |
| 0001133300 | 6572 | 6873 | 6C6F | 0664 | 1282 | 7865 | 7063 | 655F |
| 0001133320 | 7272 | 745F | 7268 | 7365 | 6F68 | 646C | 8208 | 7309 |
| 0001133340 | 6174 | 6962 | 696C | 7974 | 820A | 7408 | 6D69 | 5F65 |
| 0001133360 | 756F | 0E74 | 0D82 | 7973 | 636E | 745F | 6D69 | 5F65 |
| 0001133400 | 756F | 1274 | 0682 | 7374 | 5F74 | 6469 | 8216 | 640B |
| 0001133420 | 6669 | 5F66 | 7374 | 5F74 | 6469 | 821A | 700D | 7261 |
| 0001133440 | 6E65 | 5F74 | 7374 | 5F74 | 6469 | 821E | 6406 | 6D69 |
| 0001133460 | 6E65 | 2273 | 1082 | 6164 | 6174 | 6C5F | 7961 | 7265 |
| 0001133500 | 645F | 7065 | 6874 | 8228 | 690C | 6F63 | 5F6E | 6F63 |
| 0001133520 | 6F6C | 7275 | 2A73 | 0D82 | 6F61 | 5F69 | 6F78 | 5F72 |
| 0001133540 | 6F63 | 6F6C | 3072 | 0A82 | 6E69 | 6574 | 6C72 | 6361 |
| 0001133560 | 6465 | 0134 | 0001 | 0180 | 0001 | 0180 | 0001 | 0180 |
| 0001133600 | 0001 | 0180 | 0001 | 0180 | 0001 | 0180 | 0016 | 4079 |
| 0001133620 | 8303 | 064E | 4F83 | 8206 | 280A | 6E75 | 6174 | 6767 |
| 0001133640 | 6465 | 6929 | 0701 | 7A00 | 8373 | 05F2 | 0082 | 0A01 |
| 0001133660 | 7F00 | 8183 | 8300 | 0081 | 4D83 | 0106 | 002B | 827F |
| 0001133700 | 6106 | 7463 | 6F69 | 006E | 0F82 | 756E | 5F6D | 666F |
| 0001133720 | 735F | 666F | 6B74 | 7965 | 0273 | 0C82 | 6F73 | 7466 |
| 0001133740 | 656B | 7379 | 705F | 7274 | 0104 | 0016 | 4079 | 8303 |
| 0001133760 | 0652 | 5383 | 8206 | 280A | 6E75 | 6174 | 6767 | 6465 |
| 0001134000 | 6929 | 0701 | 7A00 | 8373 | 0601 | 0082 | 0A01 | 7F0U |
| 0001134020 | 8183 | 8300 | 0081 | 5183 | 0106 | 0029 | 827F | 6106 |
| 0001134040 | 7463 | 6F69 | 006E | 0E82 | 756E | 5F6D | 666F | 685F |
| 0001134060 | 746F | 656B | 7379 | 8202 | 680B | 746F | 656B | 7379 |
| 0001134100 | 705F | 7274 | 0104 | 0018 | 8579 | 0170 | 8305 | 0655 |
| 0001134120 | 5683 | 8206 | 280A | 6E75 | 6174 | 6767 | 6465 | 6929 |
| 0001134140 | 1001 | 7F00 | 2C83 | 8302 | 0086 | 3083 | 8305 | 00E4 |
| 0001134160 | 8583 | 0100 | 003D | 827F | 690A | 616D | 6567 | 6E5F |
| 0001134200 | 6D61 | 0065 | 0882 | 6D69 | 6761 | 5F65 | 6469 | 8220 |
| 0001134220 | 6909 | 616D | 6567 | 705F | 7274 | 8224 | 6C09 | 7961 |
| 0001134240 | 7265 | 705F | 7274 | 8228 | 6909 | 616D | 6567 | 685F |
| 0001134260 | 6C64 | 012C | 0001 | 0180 | 0001 | 0180 | 0001 | 0180 |
| 0001134300 | 0001 | 0180 | 0018 | 8579 | 0190 | 8302 | 065C | 5D83 |
| 0001134320 | 8206 | 280A | [illegible] | 6174 | 6767 | 6465 | 6929 | 0701 |
| 0001134340 | 7F00 | 8283 | 8300 | 0654 | 1801 | 7F00 | 0C82 | 7865 |
| 0001134360 | 6563 | 7470 | 6F69 | 5F6E | 6469 | 8200 | 6905 | 616D |
| 0001134400 | 6567 | 0104 | 0001 | 0180 | 0016 | 4079 | 8303 | 0661 |
| 0001134420 | 6283 | 8206 | 280A | 6E75 | 6174 | 6767 | 6465 | 6929 |
| 0001134440 | 0701 | 7A00 | 8373 | 065B | 0082 | 0A01 | 7F00 | 8183 |
| 0001134460 | 8300 | 0081 | 6083 | 0106 | 002F | 827F | 6106 | 7463 |
| 0001134500 | 6F69 | 006E | 1182 | 756E | 5F6D | 666F | 655F | 6378 |
| 0001134520 | 7065 | 6974 | 6E6F | 0273 | 0E82 | 7865 | 6563 | 7470 |
| 0001134540 | 6F69 | 5F6E | 696C | 7473 | 0104 | 0018 | 8579 | 0450 |
| 0001134560 | 8303 | 0664 | 6583 | 8206 | 280A | 6E75 | 6174 | 6767 |
| 0001134600 | 6465 | 6929 | 0A01 | 7F00 | 5483 | 8306 | 0654 | 5483 |

THU MAR 14 17:25:16 1991 CRV_IPS.DLL PAGE 282, LINE 16580

| | | | | | | | | |
|---|---|---|---|---|---|---|---|---|
| 0001134620 | 0106 | 001A | 827F | 6906 | 616D | 6567 | 0031 | 0682 |
| 0001134640 | 6D69 | 6761 | 3265 | 822E | 6404 | 6669 | 5C66 | 1801 |
| 0001134660 | 7900 | A085 | 0301 | 6883 | 8306 | 0669 | 0A82 | 7528 |
| 0001134700 | 746E | 6761 | 6567 | 2964 | 0169 | 0007 | 737A | 5483 |
| 0001134720 | 8206 | 0100 | 000A | 837F | 0081 | 6783 | 8306 | 0654 |
| 0001134740 | 2601 | 7F00 | 0E82 | 756E | 5F6D | 666F | 735F | 7263 |
| 0001134760 | 6565 | 736E | 8200 | 690A | 616D | 6567 | 6C5F | 7369 |
| 0001135000 | 0274 | 0482 | 6964 | 6666 | 0106 | 0018 | 8579 | 0210 |
| 0001135020 | 8303 | 066B | 6C83 | 8206 | 280A | 6E75 | 6174 | 6767 |
| 0001135040 | 6465 | 6929 | 0A01 | 7F00 | 2C83 | 8302 | 022C | 8183 |
| 0001135060 | 0100 | 0019 | 827F | 6906 | 616D | 6567 | 0031 | 0682 |
| 0001135100 | 6D69 | 6761 | 3265 | 8220 | 6303 | 7475 | 0140 | 0018 |
| 0001135120 | 8579 | 0940 | 8307 | 0671 | 7283 | 8206 | 280A | 6E75 |
| 0001135140 | 6174 | 6767 | 6465 | 6929 | 1801 | 7900 | 0085 | 1D08 |
| 0001135160 | 6F83 | 8306 | 0670 | 0A82 | 7528 | 746E | 6761 | 6567 |
| 0001135200 | 2964 | 0169 | 0058 | 837F | 0084 | A283 | 8305 | 0084 |
| 0001135220 | 8483 | 8300 | 05CD | 8183 | 8300 | 04EA | D383 | 8305 |
| 0001135240 | 0609 | 7783 | 8305 | 0081 | 5083 | 8306 | 05D6 | 5F83 |
| 0001135260 | 8306 | 05E9 | 8183 | 8300 | 064C | 5483 | 8306 | 0663 |
| 0001135300 | 6683 | 8306 | 05DF | 8583 | 8300 | 05DC | 6A83 | 8306 |
| 0001135320 | 05E3 | 9E83 | 8305 | 05FE | 0C83 | 8306 | 0084 | 6F01 |
| 0001135340 | 7F01 | 0A82 | 626B | 5F64 | 7473 | 7461 | 7375 | 8200 |
| 0001135360 | 7409 | 7365 | 5F74 | 616E | 656D | 8200 | 6B08 | 7965 |
| 0001135400 | 635F | 646F | 0065 | 0C82 | 7773 | 7469 | 6863 | 735F |
| 0001135420 | 6174 | 6574 | 8200 | 6C0C | 636F | 7461 | 726F | 645F |
| 0001135440 | 7369 | 0070 | 0E82 | 7274 | 6361 | 696B | 676E | 6C5F |
| 0001135460 | 7665 | 6C65 | 8200 | 730C | 6163 | 656C | 775F | 6E69 |
| 0001135500 | 6F64 | 0077 | 0982 | 7973 | 636E | 6D5F | 646F | 0065 |
| 0001135520 | 0A82 | 6966 | 746C | 7265 | 6D5F | 6773 | 8200 | 6606 |
| 0001135540 | 6C69 | 6574 | 0072 | 0B82 | 7563 | 7272 | 6E65 | 5F74 |
| 0001135560 | 6F61 | 0069 | 0C82 | 6F68 | 6B74 | 7965 | 5F73 | 696C |
| 0001135600 | 7473 | 8200 | 730A | 6E79 | 5F63 | 7665 | 6E65 | 0074 |
| 0001135620 | 0E82 | 7865 | 6563 | 7470 | 6F69 | 5F6E | 696C | 7473 |
| 0001135640 | 8200 | 6510 | 6378 | 5F70 | 7473 | 7461 | 7375 | 6C5F |
| 0001135660 | 7369 | 0074 | 0482 | 6F6D | 6564 | 8200 | 730D | 666F |
| 0001135700 | 6B74 | 7965 | 5F73 | 696C | 7473 | 8200 | 6905 | 616D |
| 0001135720 | 6567 | 8200 | 6307 | 6D6F | 6170 | 6572 | 8200 | 770B |
| 0001135740 | 6961 | 5F74 | 6373 | 6572 | 6E65 | 8200 | 690A | 616D |
| 0001135760 | 6567 | 6C5F | 7369 | 0074 | 0982 | 6D69 | 6761 | 5F65 |
| 0001136000 | 756E | 006D | 0A82 | 6D69 | 6761 | 5F65 | 6964 | 6666 |
| 0001136020 | 8200 | 680B | 6C61 | 5F66 | 6D69 | 6761 | 7365 | 8200 |
| 0001136040 | 6D07 | 7361 | 6173 | 6567 | 8200 | 7006 | 7261 | 6D61 |
| 0001136060 | 0073 | 0882 | 7566 | 636E | 6B5F | 7965 | 8200 | 6908 |
| 0001136100 | 6F63 | 5F6E | 736D | 0067 | 0582 | 7564 | 6D6D | 0079 |
| 0001136120 | 1601 | 7F00 | 8183 | 8300 | 061C | 8183 | 8300 | 05C4 |
| 0001136140 | 6E83 | 8306 | 0081 | 8583 | 0100 | 005A | 827F | 7306 |
| 0001136160 | 756F | 6372 | 0065 | 0A82 | 736D | 5F67 | 6568 | 6461 |
| 0001136200 | 7265 | 8202 | 650A | 6576 | 746E | 745F | 7079 | 1A65 |
| 0001136220 | 0682 | 6974 | 696D | 676E | 821C | 650B | 6576 | 746E |
| 0001136240 | 765F | 6C61 | 6575 | 8224 | 720C | 7465 | 7275 | 5F6E |
| 0001136260 | 6176 | 756C | 8565 | 0124 | 0982 | 6572 | 7073 | 665F |
| 0001136300 | 616C | 8567 | 0126 | 0101 | 8000 | 1201 | 7900 | 0240 |
| 0001136320 | 7583 | 8306 | 0676 | 0682 | 6261 | 7373 | 6C63 | 0169 |
| 0001136340 | 0007 | 837F | 0088 | 8883 | 0100 | 0009 | 827F | 7801 |
| 0001136360 | 8200 | 7901 | 0104 | 0001 | 0180 | 0001 | 0180 | 0001 |
| 0001136400 | 0180 | 0001 | 0180 | 0001 | 0180 | 0001 | 0180 | 0001 |
| 0001136420 | 0180 | 0001 | 0180 | 0001 | 0180 | 0007 | 737A | 6D83 |
| 0001136440 | 8206 | 0100 | 0001 | 0180 | 0001 | 0180 | 0001 | 0180 |
| 0001136460 | 0001 | 0180 | 0001 | 0180 | 0001 | 0180 | 0001 | 0180 |

```
THU MAR 14 17:25:16 1991  CRV_IPS.DLL  PAGE 283, LINE 16639

*
0001137440  0016  2079  8302  0701  0283  8207  280A  6E75
0001137460  6174  6767  6465  6929  0701  7F00  8583  8300
0001137500  0085  0901  7F00  0182  0078  0182  0279  1601
0001137520  7900  0220  0483  8307  0705  0A82  7528  746E
0001137540  6761  6567  2964  0169  0007  837F  0085  8583
0001137560  0100  000B  827F  6302  0078  0282  7963  0102
0001137600  0016  4079  8302  0707  0883  8207  280A  6E75
0001137620  6174  6767  6465  6929  0701  7F00  0083  8307
0001137640  0703  0C01  7F00  0282  3170  8200  7303  7A69
0001137660  0104  0001  0180  0001  0180  0001  0180  0018
0001137700  8579  00B0  8307  070D  0E83  8207  280A  6E75
0001137720  6174  6767  6465  6929  1601  7F00  0683  8307
0001137740  0085  8183  8300  0081  8183  8300  0081  8683
0001137760  0100  003A  827F  7208  6365  5F74  6170  0072
0001140000  0782  6964  5F72  6170  0872  0582  616D  5F78
0001140020  0A78  0582  696D  5F6E  0C78  0282  7864  820E
0001140040  6402  1079  0782  6974  656D  756F  1274  1801
0001140060  7900  A085  0700  1083  8307  0711  0A82  7528
0001140100  746E  6761  6567  2964  0169  0016  837F  0081
0001140120  0683  8307  0081  8183  8300  0081  8183  8300
0001140140  0081  3701  7F00  0682  6572  7573  746C  8200
0001140160  7204  6365  0274  0282  7864  820A  6402  0C79
0001140200  0582  616D  5F78  0E78  0582  696D  5F6E  1078
0001140220  0982  6572  7463  745F  7079  1265  0101  8000
0001140240  0101  8000  0101  8000  0101  8000  0701  7A00
0001140260  8373  04EA  0082  0101  8000  0101  8000  0101
0001140300  8000  0101  8000  0101  8000  0101  8000  0101
*
0001140640  8000  0501  7800  8348  0080  0501  7800  8330
0001140660  0080  0A01  7500  8380  0200  0364  5583  0107
0001140700  000A  837F  00C1  C183  8300  0000  0D01  7F00
0001140720  8583  8300  0716  C183  8300  00C1  0A01  7500
0001140740  8380  0081  0464  5683  0107  0004  837F  0716
0001140760  0A01  7500  8380  0081  0164  5883  0107  0004
0001141000  837F  0680  0A01  7500  8380  0081  0164  5A83
0001141020  0107  0004  837F  00C0  0A01  7500  8380  0081
0001141040  0164  5C83  0107  0007  8578  0280  8083  0100
0001141060  0005  1078  8083  0100  0005  2078  8083  0100
0001141100  0005  3878  8083  0100  0004  837F  00C0  0A01
0001141120  7500  8380  0081  C164  6283  0107  0007  8578
0001141140  00B0  8083  0100  0004  837F  0680  0A01  7500
0001141160  8380  0081  0164  6583  0107  000A  837F  00C1
0001141200  C183  8300  0000  0A01  7500  8380  0200  0364
0001141220  6783  0107  0004  837F  0680  0A01  7500  8380
0001141240  0081  0164  6983  0107  0004  837F  0680  0A01
0001141260  7500  8380  0081  0164  6B83  0107  000A  8075
0001141300  8183  6400  8300  0201  0101  8000  0101  8000
0001141320  0101  8000  0101  8000  0101  8000  0101  8000
*
0001146420  0101  8000  0101  8000  0101  8000  0A01  7500
0001146440  8380  0200  0064  0183  0102  0001  0180  0001
0001146460  0180  0001  0180  0001  0180  0001  0180  0001
*
0001147200  0180  0016  2079  8302  04EE  EF83  8204  280A
0001147220  6E75  6174  6767  6465  6929  0701  7F00  8183
0001147240  8300  0081  0901  7F00  0182  0078  0182  0279
0001147260  1601  7900  0240  F183  8304  04F2  0A82  7528
0001147300  746E  6761  6567  2964  0169  0007  837F  04ED
```

THU MAR 14 17:25:16 1991 CRV_IPS.DLL PAGE 284, LINE 16698

```
0001147320  ED83  0104  000D  827F  6D03  6E69  8200  6D03
0001147340  7861  0104  0001  0180  0001  0180  0001  0180
0001147360  0001  0180  0001  0180  0001  0180  0001  0180
*
0001147660  0001  0180  0001  0180  0018  8579  00D0  830D
0001147700  0529  2A83  8205  280A  6E75  6174  6767  6465
0001147720  6929  2801  7F00  8583  8300  0085  8583  8300
0001147740  0085  8583  8300  0085  8583  8300  0085  8583
0001147760  8300  0085  8583  8300  0085  8583  0100  0076
0001150000  827F  6806  7365  6E79  0063  0682  6568  6C62
0001150020  6B6E  8202  6806  6273  6E6C  046B  0682  7468
0001150040  746F  6C61  8206  7606  7365  6E79  0863  0682
0001150060  6576  6C62  6B6E  820A  7606  6273  6E6C  0C6B
0001150100  0682  7476  746F  6C61  820E  6406  7970  7463
0001150120  106C  0782  7064  7379  7274  1274  0682  7064
0001150140  7479  7061  8214  6406  7970  6461  1672  0582
0001150160  7370  7A69  1865  0101  8000  0101  8000  0101
0001150200  8000  0101  8000  0101  8000  0101  8000  0101
*
0001150260  8000  0701  7A00  8373  04F0  0082  0101  8000
0001150300  0101  8000  0101  8000  0101  8000  0101  8000
*
0001150420  0101  8000  1601  7900  0510  5783  8305  0558
0001150440  0A82  7528  746E  6761  6567  2964  0169  0004
0001150460  035C  007C  0401  5C00  7C01  0103  0004  035C
0001150500  047C  0401  5C00  7C01  0107  0004  085C  087C
0001150520  1001  7F00  5283  8305  0553  5483  8305  0555
0001150540  5683  0105  002D  827F  6D05  6773  6E69  8200
0001150560  6905  746E  6E69  8200  6D06  6773  756F  0074
0001150600  0682  6E69  6F74  7475  8200  6307  7274  5F6C
0001150620  6968  0100  0016  1079  8302  055A  5B83  8205
0001150640  280A  6E75  6174  6767  6465  6929  0701  7F00
0001150660  5183  8305  0085  1101  7F00  0682  6966  6C65
0001150700  7364  8200  6604  6C75  006C  0A01  7500  8380
0001150720  0081  0064  0183  0102  0005  4878  8083  0100
0001150740  000A  8075  8183  6400  8300  0201  0A01  7500
0001150760  8380  0081  0064  0183  0102  000A  8075  8183
0001151000  6400  8300  0201  0401  7F00  8583  0100  000A
0001151020  8075  8183  6400  8301  0561  0401  7F00  8683
0001151040  0100  000A  8075  8183  6400  8301  0563  0401
0001151060  7F00  C583  0100  000A  8075  8183  6400  8301
0001151100  0565  0401  7F00  C683  0100  000A  8075  8183
0001151120  6400  8301  0567  0701  7F00  C083  8300  0085
0001151140  0A01  7500  8380  0081  0264  6983  0105  0007
0001151160  837F  00C0  8583  0100  000A  8075  8183  6400
0001151200  8302  056B  0A01  7F00  C083  8300  0085  8683
0001151220  0100  000A  8075  8183  6400  8303  056D  0A01
0001151240  7F00  C083  8300  0085  8683  0100  000A  8075
0001151260  8183  6400  8303  056F  0A01  7F00  C483  8300
0001151300  0086  3A83  0105  000A  8075  8183  6400  8303
0001151320  0571  0A01  7F00  C483  8300  0086  3A83  0105
0001151340  000A  8075  8183  6400  8303  0573  0A01  7F00
0001151360  E483  8300  0086  8683  0100  000A  8075  8183
0001151400  6400  8303  0575  0A01  7F00  E483  8300  0086
0001151420  8683  0100  000A  8075  8183  6400  8303  0577
0001151440  0A01  7F00  E483  8300  0086  3A83  0105  000A
0001151460  8075  8183  6400  8303  0579  0A01  7F00  E483
0001151500  8300  0086  3A83  0105  000A  8075  8183  6400
0001151520  8303  057B  0401  7F00  C083  0100  000A  8075
```

THU MAR 14 17:25:16 1991 CRV_IPS.DLL PAGE 285, LINE 16757

```
0001151540  8183  6400  8301  057D  0501  7800  8320  0080
0001151560  0401  7F00  C083  0100  000A  8075  0083  6402
0001151600  8301  0580  0701  7800  0085  8304  0084  1001
0001151620  7F00  8583  8300  00C0  8483  8300  00C0  8483
0001151640  0100  000A  8075  8183  6400  8305  0583  0A01
0001151660  7F00  8583  8300  00C0  8483  0100  000A  8075
0001151700  8183  6400  8303  0585  0701  7F00  C083  8300
0001151720  0084  0A01  7500  8380  0081  0264  8783  0105
0001151740  000A  8075  8183  6400  8300  0201  0A01  7500
0001151760  8380  0081  0064  0183  0102  0004  837F  0528
0001152000  0AQ1  7500  8380  0081  0164  8B83  0105  0001
0001152020  0180  000A  8075  0083  6402  8300  0201  0A01
0001152040  7500  8380  0081  0064  0183  0102  0001  0180
0001152060  0012  6079  8305  0203  0483  8202  5F06  6F69
0001152100  7562  6966  1001  7F00  C083  8300  0081  C083
0001152120  8300  0080  8083  0100  0027  827F  5F04  7470
0001152140  0072  0482  635F  746E  8204  5F05  6162  6573
0001152160  8206  5F05  6C66  6761  820A  5F05  6966  656C
0001152200  010B  0001  0180  0007  737A  0283  8202  0100
0001152220  0001  0180  0001  0180  0001  0180  0001  0180
*
0001156400  0001  0180  0001  0180  0007  8578  6800  8583
0001156420  0100  0001  0180  0007  8578  0120  8583  0100
0001156440  000A  8075  0083  6402  8300  0201  0A01  7500
0001156460  8380  0200  0164  2A83  0104  0004  837F  0086
0001156500  0101  8000  0101  8000  0401  7F00  C083  0100
0001156520  000A  8075  8183  6400  8301  042D  0501  7800
0001156540  8370  0080  0A01  7500  8380  0200  0064  0183
0001156560  0102  000A  8075  0083  6402  8300  0201  0A01
0001156600  7500  8380  0200  0064  0183  0102  0004  837F
0001156620  0086  0A01  7500  8380  0200  0164  3383  0104
0001156640  0004  837F  00C0  0A01  7500  8380  0200  0164
0001156660  3583  0104  0005  7878  8083  0100  0004  837F
0001156700  00C0  0A01  7500  8380  0081  0164  3883  0104
0001156720  0001  0180  0018  8579  00A0  8307  043C  3D83
0001156740  8204  280A  6E75  6174  6767  6465  6929  1601
0001156760  7F00  8583  8300  0085  8283  8300  0082  8283
0001157000  8300  0085  8583  0100  004A  827F  6607  6D5F
0001157020  6761  6369  8200  6607  6E5F  6373  736E  8202
0001157040  6608  745F  6D69  6164  0472  0882  5F66  7973
0001157060  706D  7274  8208  6607  6E5F  7973  736D  820C
0001157100  6608  6F5F  7470  6468  1072  0782  5F66  6C66
0001157120  6761  1273  0701  7A00  8373  043B  0082  1801
0001157140  7900  E085  0800  4083  8304  0441  0A82  7528
0001157160  746E  6761  6567  2964  0169  0019  837F  0081
0001157200  8183  8300  0082  8283  8300  0082  8283  8300
0001157220  0082  8283  0100  004C  827F  6D05  6761  6369
0001157240  8200  7606  7473  6D61  0270  0582  7374  7A69
0001157260  0465  0582  7364  7A69  0865  0582  7362  7A69
0001157300  0C65  0582  6E65  7274  1079  0A82  6574  7478
0001157320  735F  6174  7472  8214  640A  7461  5F61  7473
0001157340  7261  1874  0701  7A00  8373  043F  0082  1701
0001157360  7900  4085  0A01  4583  8304  0446  0982  6573
0001157400  7463  685F  6165  6964  0501  7800  8340  0080
0001157420  1F01  7F00  4483  8304  0082  8283  8300  0082
0001157440  8283  8300  0082  8283  8300  0085  8583  8300
0001157460  0082  6801  7F00  0682  5F73  616E  656D  8200
0001157500  7307  705F  6461  7264  8208  7307  765F  6461
0001157520  7264  820C  7306  735F  7A69  1065  0882  5F73
```

THU MAR 14 17:25:16 1991 CRV_IPS.DLL PAGE 286, LINE 16816

| | | | | | | | | |
|---|---|---|---|---|---|---|---|---|
| 0001157540 | 6373 | 706E | 7274 | 8214 | 7308 | 725F | 6C65 | 7470 |
| 0001157560 | 1872 | 0982 | 5F73 | 6E6C | 6F6E | 7470 | 1C72 | 0882 |
| 0001157600 | 5F73 | 726E | 6C65 | 636F | 8220 | 7307 | 6E5F | 6E6C |
| 0001157620 | 6F6E | 8222 | 7307 | 665F | 616C | 7367 | 0124 | 0007 |
| 0001157640 | 737A | 4383 | 8204 | 0100 | 0005 | 1878 | 8083 | 0100 |
| 0001157660 | 0007 | 8578 | 00A0 | 8083 | 0100 | 0007 | 8578 | 0100 |
| 0001157700 | 8083 | 0100 | 0007 | 8578 | 0088 | 8083 | 0100 | 0007 |
| 0001157720 | 8578 | 00D8 | 8083 | 0500 | 0111 | 0000 | 2000 | 0001 |
| 0001157740 | 0E00 | 1107 | 1601 | 0300 | 0001 | 0400 | 6311 | 7672 |
| 0001157760 | 645F | 6665 | 6E69 | 5F65 | 6966 | 746C | 7265 | 040F |
| 0001160000 | 0006 | 0678 | 6509 | 6576 | 746E | 705F | 7274 | 040C |
| 0001160020 | FFFC | 0081 | 7306 | 6174 | 7574 | 0573 | 9300 | 6A00 |
| 0001160040 | 1400 | F804 | 82FF | 0E05 | 6D74 | 5F70 | 6966 | 746C |
| 0001160060 | 7265 | 705F | 7274 | 0201 | 0201 | 011E | 0111 | 0710 |
| 0001160100 | 00DA | 0016 | 00CC | 0000 | 0F04 | 7263 | 5F76 | 6465 |
| 0001160120 | 7469 | 665F | 6C69 | 6574 | 0F72 | 0604 | 7800 | 0906 |
| 0001160140 | 7665 | 6E65 | 5F74 | 7470 | 0C72 | FC04 | 81FF | 0600 |
| 0001160160 | 7473 | 7461 | 7375 | 0201 | 011C | 01EB | 0711 | 006F |
| 0001160200 | 0016 | 0063 | 0000 | 0D04 | 7263 | 5F76 | 6572 | 6573 |
| 0001160220 | 5F74 | 6F61 | 0C69 | FC04 | 81FF | 0600 | 7473 | 7461 |
| 0001160240 | 7375 | 0201 | 011D | 025A | 0714 | 016E | 0016 | 0160 |
| 0001160260 | 0000 | 0E04 | 7263 | 5F76 | 6573 | 5F74 | 6966 | 746C |
| 0001160300 | 7265 | 040F | 0006 | 0678 | 6509 | 6576 | 746E | 705F |
| 0001160320 | 7274 | 040C | FFFC | 0081 | 7306 | 6174 | 7574 | 0173 |
| 0001160340 | 1D02 | C801 | 1803 | 0807 | 1603 | FA00 | 0002 | 0400 |
| 0001160360 | 630E | 7672 | 705F | 7475 | 665F | 6C69 | 6574 | 0F72 |
| 0001160400 | 0604 | 7800 | 0906 | 7665 | 6E65 | 5F74 | 7470 | 0C72 |
| 0001160420 | FC04 | 81FF | 0600 | 7473 | 7461 | 7375 | 0201 | 0126 |
| 0001160440 | 06D0 | 071A | 03CB | 0016 | 03BD | 0000 | 1704 | 7263 |
| 0001160460 | 5F76 | 6573 | 656C | 7463 | 675F | 6172 | 6870 | 6369 |
| 0001160500 | 6D5F | 646F | 0F65 | 0604 | 7800 | 0906 | 7665 | 6E65 |
| 0001160520 | 5F74 | 7470 | 0E72 | DC05 | 0800 | 8500 | 0600 | 6573 |
| 0001160540 | 656C | 7463 | 050D | 00DE | 0008 | 0085 | 6105 | 6363 |
| 0001160560 | 726C | 0201 | 0122 | 0A9B | 071C | 0089 | 0010 | 007E |
| 0001160600 | 0000 | 1304 | 6573 | 656C | 7463 | 675F | 6172 | 6870 |
| 0001160620 | 6369 | 6D5F | 646F | 0F65 | 0604 | 7800 | 0906 | 7665 |
| 0001160640 | 6E65 | 5F74 | 7470 | 0B72 | D604 | 6EFE | 0506 | 7665 |
| 0001160660 | 6E65 | 0174 | 2302 | 2401 | 1E0B | 9907 | 1601 | 8B00 |
| 0001160700 | 0001 | 0400 | 6314 | 7672 | 645F | 7369 | 5F70 | 7563 |
| 0001160720 | 7272 | 6E65 | 5F74 | 6F61 | 0E69 | 0604 | 8100 | 0800 |
| 0001160740 | 6F61 | 5F69 | 7974 | 6570 | 0407 | FFF8 | 0085 | 6901 |
| 0001160760 | 040C | FFFA | 0081 | 7306 | 6174 | 7574 | 1473 | FC04 |
| 0001161000 | 85FF | 0E00 | 6574 | 6D72 | 6E69 | 7461 | 5F65 | 6C66 |
| 0001161020 | 6761 | 0201 | 0120 | 0CBD | 071F | 00BB | 0010 | 00B0 |
| 0001161040 | 0000 | 1104 | 7263 | 5F76 | 7473 | 706F | 645F | 7369 |
| 0001161060 | 5F70 | 6F61 | 0C69 | D404 | 81FE | 0600 | 7473 | 7461 |
| 0001161100 | 7375 | 040B | FED6 | 066E | 6505 | 6576 | 746E | 0201 |
| 0001161120 | 011F | 0D78 | 0721 | 00D2 | 0016 | 00C4 | 0000 | 1004 |
| 0001161140 | 7263 | 5F76 | 6964 | 7073 | 616C | 5F79 | 616D | 6B73 |
| 0001161160 | 040F | 0006 | 0678 | 6509 | 6576 | 746E | 705F | 7274 |
| 0001161200 | 040C | FFFC | 0081 | 7306 | 6174 | 7574 | 0173 | 1A02 |
| 0001161220 | 4A01 | 230E | E207 | 1002 | D700 | 0002 | 0400 | 650B |
| 0001161240 | 6964 | 5F74 | 6966 | 746C | 7265 | 040F | 0006 | 0678 |
| 0001161260 | 6509 | 6576 | 746E | 705F | 7274 | 0411 | 000A | 0081 |
| 0001161300 | 730B | 6165 | 6372 | 5F68 | 7974 | 6570 | 0410 | FFA6 |
| 0001161320 | 0578 | 6F0A | 646C | 665F | 6C69 | 6574 | 0F72 | 7C04 |
| 0001161340 | 81FE | 0900 | 6C6F | 5F64 | 5F78 | 7470 | 0F72 | 7A04 |
| 0001161360 | 81FE | 0900 | 6C6F | 5F64 | 5F79 | 7470 | 0F72 | 7E04 |
| 0001161400 | 6EFE | 0906 | 756F | 5F74 | 7665 | 6E65 | 0D74 | E005 |

THU MAR 14 17:25:16 1991 CRV_IPS.DLL PAGE 287, LINE 16875

| | | | | | | | | |
|---|---|---|---|---|---|---|---|---|
| 0001161420 | 0800 | 8500 | 0500 | 7473 | 7461 | 0D65 | E205 | 0800 |
| 0001161440 | 8500 | 0500 | 6F63 | 6E75 | 1474 | 1A05 | 0834 | 7800 |
| 0001161460 | 0C05 | 7473 | 7261 | 5F74 | 6966 | 746C | 7265 | 0514 |
| 0001161500 | 3474 | 0008 | 0081 | 630C | 696C | 6B63 | 735F | 6174 |
| 0001161520 | 7574 | 0E73 | 7205 | 0834 | 8100 | 0600 | 7473 | 7461 |
| 0001161540 | 7375 | 0512 | 00E4 | 0008 | 0085 | 660A | 7269 | 7473 |
| 0001161560 | 745F | 6D69 | 0165 | 1C02 | 2C01 | 2511 | DE07 | 1002 |
| 0001161600 | D300 | 0002 | 0400 | 640D | 6665 | 6E69 | 5F65 | 6966 |
| 0001161620 | 746C | 7265 | 040F | 0006 | 0678 | 6509 | 6576 | 746E |
| 0001161640 | 705F | 7274 | 0410 | FE78 | 0081 | 720A | 7465 | 7275 |
| 0001161660 | 636E | 646F | 1065 | A404 | 78FF | 0A05 | 6C6F | 5F64 |
| 0001161700 | 6966 | 746C | 7265 | 040F | FE7A | 0081 | 6F09 | 646C |
| 0001161720 | 785F | 705F | 7274 | 040F | FE76 | 0081 | 6F09 | 646C |
| 0001161740 | 795F | 705F | 7274 | 040C | FFFC | 0081 | 7306 | 6174 |
| 0001161760 | 7574 | 0F73 | 7C04 | 6EFE | 0906 | 756F | 5F74 | 7665 |
| 0001162000 | 6E65 | 0D74 | E605 | 0800 | 8100 | 0500 | 7473 | 7461 |
| 0001162020 | 1265 | E805 | 0800 | 8500 | 0A00 | 6966 | 7372 | 5F74 |
| 0001162040 | 6974 | 656D | 0201 | 0120 | 140A | 0727 | 00AD | 0010 |
| 0001162060 | 00A2 | 0000 | 1104 | 6461 | 5F64 | 6966 | 746C | 7265 |
| 0001162100 | 745F | 5F6F | 6F61 | 1069 | 0604 | 8200 | 0A05 | 6966 |
| 0001162120 | 746C | 7265 | 705F | 7274 | 040D | 000A | 06FC | 6107 |
| 0001162140 | 696F | 705F | 7274 | 0201 | 012D | 14B7 | 0729 | 0056 |
| 0001162160 | 0010 | 004B | 0000 | 1E04 | 6572 | 6F6D | 6576 | 645F |
| 0001162200 | 6665 | 7561 | 746C | 665F | 6C69 | 6574 | 5F72 | 7266 |
| 0001162220 | 6D6F | 615F | 696F | 040D | 0006 | 06FC | 6107 | 696F |
| 0001162240 | 705F | 7274 | 0414 | FFA4 | 0578 | 640E | 6665 | 7561 |
| 0001162260 | 746C | 665F | 6C69 | 6574 | 0C72 | FC04 | 81FF | 0600 |
| 0001162300 | 7473 | 7461 | 7375 | 0201 | 012A | 150D | 072B | 00F0 |
| 0001162320 | 0010 | 00E5 | 0000 | 1B04 | 6E65 | 6574 | 5F72 | 6564 |
| 0001162340 | 6166 | 6C75 | 5F74 | 6966 | 746C | 7265 | 745F | 5F6F |
| 0001162360 | 6F61 | 0D69 | 0604 | FC00 | 0706 | 6F61 | 5F69 | 7470 |
| 0001162400 | 1472 | A404 | 78FF | 0E05 | 6564 | 6166 | 6C75 | 5F74 |
| 0001162420 | 6966 | 746C | 7265 | 0407 | FFFC | 0085 | 6901 | 0201 |
| 0001162440 | 0125 | 15FD | 072D | 0173 | 0010 | 0168 | 0000 | 1604 |
| 0001162460 | 6572 | 6F6D | 6576 | 665F | 6C69 | 6574 | 5F72 | 7266 |
| 0001162500 | 6D6F | 615F | 696F | 0413 | 0006 | 0582 | 690D | 5F6E |
| 0001162520 | 6966 | 746C | 7265 | 705F | 7274 | 040D | 000A | 06FC |
| 0001162540 | 6107 | 696F | 705F | 7274 | 0407 | FFA2 | 0085 | 6901 |
| 0001162560 | 0407 | FFA0 | 0085 | 6A01 | 0410 | FFFC | 0085 | 660A |
| 0001162600 | 6C69 | 6574 | 5F72 | 756E | 0C6D | A404 | 78FF | 0605 |
| 0001162620 | 6966 | 746C | 7265 | 0201 | 0118 | 1770 | 072F | 004A |
| 0001162640 | 0010 | 003F | 0000 | 0904 | 6572 | 6573 | 5F74 | 6F61 |
| 0001162660 | 0D69 | 0604 | FC00 | 0706 | 6F61 | 5F69 | 7470 | 0172 |
| 0001162700 | 2102 | BA01 | 3117 | 0307 | 1001 | F800 | 0000 | 0400 |
| 0001162720 | 7512 | 6470 | 5F74 | 6966 | 746C | 7265 | 695F | 5F6E |
| 0001162740 | 6F61 | 1269 | 0604 | 8200 | 0C05 | 656E | 5F77 | 6C66 |
| 0001162760 | 7274 | 705F | 7274 | 0412 | 000A | 0582 | 6F0C | 646C |
| 0001163000 | 665F | 746C | 5F72 | 7470 | 0D72 | 0E04 | FC00 | 0706 |
| 0001163020 | 6F61 | 5F69 | 7470 | 0772 | A204 | 85FF | 0100 | 1069 |
| 0001163040 | FC04 | 85FF | 0A00 | 6966 | 746C | 7265 | 6E5F | 6D75 |
| 0001163060 | 040C | FFA4 | 0578 | 6606 | 6C69 | 6574 | 0172 | 1C02 |
| 0001163100 | BD01 | 3318 | DE07 | 1001 | D300 | 0001 | 0400 | 730D |
| 0001163120 | 6165 | 6372 | 5F68 | 6966 | 746C | 7265 | 040B | 0006 |
| 0001163140 | 0085 | 6305 | 756F | 746E | 0409 | 0008 | 06FC | 6103 |
| 0001163160 | 696F | 040B | 000C | 0081 | 7805 | 705F | 7274 | 040B |
| 0001163200 | 000E | 0081 | 7905 | 705F | 7274 | 040C | 0010 | 0081 |
| 0001163220 | 7306 | 6165 | 6372 | 0C68 | 1204 | 8200 | 0605 | 6966 |
| 0001163240 | 746C | 7265 | 0407 | FFFA | 0085 | 6901 | 040B | FFFC |
| 0001163260 | 0085 | 6905 | 646E | 7865 | 0414 | FFF4 | 0085 | 6E0E |

THU MAR 14 17:25:16 1991 CRV_IPS.DLL PAGE 288, LINE 16934

| | | | | | | | | |
|---|---|---|---|---|---|---|---|---|
| 0001163300 | 6D75 | 6F5F | 5F66 | 6966 | 746C | 7265 | 1273 | F004 |
| 0001163320 | 82FF | 0C00 | 696D | 5F6E | 6964 | 7473 | 6E61 | 6563 |
| 0001163340 | 0409 | FFF6 | 0082 | 6403 | 7473 | 0512 | 3476 | 0008 |
| 0001163360 | 0085 | 700A | 7672 | 5F73 | 6E69 | 6564 | 1578 | 7805 |
| 0001163400 | 0834 | 8200 | 0D00 | 7270 | 7376 | 645F | 7369 | 6174 |
| 0001163420 | 636E | 0165 | 1B02 | 9B01 | 351A | C407 | 1001 | B900 |
| 0001163440 | 0001 | 0400 | 640C | 7473 | 325F | 665F | 6C69 | 6574 |
| 0001163460 | 0B72 | 0604 | 8100 | 0500 | 5F78 | 7470 | 0B72 | 0804 |
| 0001163500 | 8100 | 0500 | 5F79 | 7470 | 0E72 | 0A04 | 8200 | 0805 |
| 0001163520 | 6C66 | 7274 | 705F | 7274 | 040B | FFF6 | 0082 | 6405 |
| 0001163540 | 7473 | 615F | 040B | FFF2 | 0082 | 6405 | 7473 | 625F |
| 0001163560 | 0409 | FFFA | 0082 | 6403 | 7473 | 0201 | 011D | 1C5F |
| 0001163600 | 0737 | 0253 | 0010 | 0248 | 0000 | 0E04 | 6C63 | 6369 |
| 0001163620 | 5F6B | 6F6C | 6163 | 6974 | 6E6F | 040C | 0006 | 0582 |
| 0001163640 | 6606 | 6C69 | 6574 | 0B72 | 0A04 | 8100 | 0500 | 5F78 |
| 0001163660 | 7470 | 0B72 | 0C04 | 8100 | 0500 | 5F79 | 7470 | 0172 |
| 0001163700 | 1702 | B201 | 391E | 7607 | 1000 | 6B00 | 0000 | 0400 |
| 0001163720 | 6408 | 6172 | 5F77 | 6F61 | 0969 | 0604 | 5900 | 0306 |
| 0001163740 | 6F61 | 0769 | FA04 | 85FF | 0100 | 0C69 | FC04 | 81FF |
| 0001163760 | 0600 | 7473 | 7461 | 7375 | 0201 | 0123 | 1F28 | 073B |
| 0001164000 | 0095 | 001D | 008A | 0000 | 1404 | 6964 | 7073 | 615F |
| 0001164020 | 696F | 6F5F | 5F6E | 7573 | 5F74 | 6373 | 6E72 | 040F |
| 0001164040 | 0006 | 0085 | 6D09 | 7361 | 5F6B | 6C66 | 6761 | 040F |
| 0001164060 | 0008 | 0085 | 6409 | 6172 | 5F77 | 6C66 | 6761 | 040C |
| 0001164100 | FFFC | 0081 | 7306 | 6174 | 7574 | 0173 | 2702 | BD01 |
| 0001164120 | 3C1F | 3307 | 1000 | 2800 | 0000 | 0400 | 6318 | 7672 |
| 0001164140 | 635F | 6E6F | 5F76 | 5F32 | 6174 | 6C62 | 7465 | 665F |
| 0001164160 | 726F | 616D | 0174 | 1B02 | F001 | 3D1F | 3A07 | 1000 |
| 0001164200 | 2F00 | 0000 | 0400 | 720C | 7365 | 7465 | 635F | 7275 |
| 0001164220 | 6F73 | 0172 | 1702 | 2A01 | 3F20 | 9A07 | 1000 | 8F00 |
| 0001164240 | 0000 | 0400 | 6D08 | 7361 | 5F6B | 6F61 | 0969 | 0604 |
| 0001164260 | 5900 | 0306 | 6F61 | 0769 | FA04 | 85FF | 0100 | 0C69 |
| 0001164300 | FC04 | 81FF | 0600 | 7473 | 7461 | 7375 | 0201 | 011D |
| 0001164320 | 20C4 | 0740 | 024E | 0010 | 0243 | 0000 | 0E04 | 6573 |
| 0001164340 | 5F74 | 616D | 6B73 | 6F5F | 5F6E | 7067 | 040E | FFE8 |
| 0001164360 | 06E0 | 6708 | 5F70 | 6170 | 6172 | 116D | FA04 | E6FF |
| 0001164400 | 0B06 | 6966 | 746C | 7265 | 6C5F | 7369 | 1074 | F604 |
| 0001164420 | 41FF | 0A07 | 6966 | 746C | 7265 | 625F | 6675 | 040C |
| 0001164440 | FFF2 | 00C4 | 6706 | 5F70 | 7562 | 0766 | E604 | 85FF |
| 0001164460 | 0100 | 1169 | F404 | 85FF | 0B00 | 696C | 7473 | 6C5F |
| 0001164500 | 6E65 | 7467 | 0C68 | F004 | 81FF | 0600 | 7473 | 7461 |
| 0001164520 | 7375 | 0201 | 0512 | 33BE | 0008 | 0578 | 680A | 746F |
| 0001164540 | 665F | 6C69 | 6574 | 1772 | 4A05 | 0800 | 8500 | 0F00 |
| 0001164560 | 6F61 | 5F69 | 616D | 6B73 | 6465 | 665F | 616C | 1667 |
| 0001164600 | 4C05 | 0800 | 8500 | 0E00 | 6F61 | 5F69 | 7264 | 7761 |
| 0001164620 | 5F6E | 6C66 | 6761 | 0518 | 004E | 0008 | 0085 | 6410 |
| 0001164640 | 6665 | 7561 | 746C | 655F | 6378 | 665F | 746C | 1372 |
| 0001164660 | 1805 | 0834 | 8100 | 0B00 | 6573 | 7261 | 6863 | 745F |
| 0001164700 | 7079 | 1565 | 5005 | 0800 | 5900 | 0D06 | 6964 | 7073 |
| 0001164720 | 616C | 6579 | 5F64 | 6F61 | 1369 | 5A05 | 0800 | 5900 |
| 0001164740 | 0B06 | 7563 | 7272 | 6E65 | 5F74 | 6F61 | 0569 | 000D |
| 0001164760 | 1A00 | 1000 | 6405 | 0800 | 5900 | 0806 | 7973 | 636E |
| 0001165000 | 615F | 696F | 050D | 006E | 0008 | 0081 | 7805 | 6C5F |
| 0001165020 | 636F | 050D | 0070 | 0008 | 0081 | 7905 | 6C5F | 636F |
| 0001165040 | 050E | 0072 | 0008 | 0085 | 7406 | 6261 | 656C | 1074 |
| 0001165060 | 0605 | 070F | 4400 | 0806 | 7069 | 5F73 | 6164 | 6174 |
| 0001165100 | 0512 | 0042 | 0008 | 0085 | 630A | 696C | 6B63 | 645F |
| 0001165120 | 776F | 106E | 4405 | 0800 | 8500 | 0800 | 6C63 | 6369 |
| 0001165140 | 5F6B | 7075 | 0515 | 0046 | 0008 | 0085 | 680D | 746F |

THU MAR 14 17:25:16 1991 CRV_IPS.DLL PAGE 289, LINE 16993

| | | | | | | | | |
|---|---|---|---|---|---|---|---|---|
| 0001165160 | 625F | 7474 | 5F6E | 616D | 6B73 | 0514 | 0048 | 0008 |
| 0001165200 | 0081 | 670C | 6172 | 6870 | 6369 | 6D5F | 646F | 1365 |
| 0001165220 | 1605 | 0834 | 8100 | 0B00 | 7773 | 7469 | 6863 | 6D5F |
| 0001165240 | 646F | 0565 | 0111 | 0000 | 1A00 | 1201 | FD23 | E506 |
| 0001165260 | 1000 | DA00 | 0000 | 0400 | 640B | 6172 | 5F77 | 6966 |
| 0001165300 | 746C | 7265 | 040E | 0006 | 0582 | 6608 | 746C | 5F72 |
| 0001165320 | 7470 | 0F72 | E804 | F2FF | 0906 | 6F61 | 5F69 | 7665 |
| 0001165340 | 6E65 | 0174 | 1A02 | F701 | FF23 | E506 | 1000 | DA00 |
| 0001165360 | 0000 | 0400 | 6D0B | 7261 | 5F6B | 6966 | 746C | 7265 |
| 0001165400 | 040E | 0006 | 0582 | 6608 | 746C | 5F72 | 7470 | 0F72 |
| 0001165420 | E804 | F2FF | 0906 | 6F61 | 5F69 | 7665 | 6E65 | 0174 |
| 0001165440 | 1A02 | DC01 | 0124 | 8907 | 1001 | 7E00 | 0001 | 0400 |
| 0001165460 | 6D0B | 766F | 5F65 | 6966 | 746C | 7265 | 0412 | 0006 |
| 0001165500 | 0582 | 6F0C | 646C | 665F | 746C | 5F72 | 7470 | 1272 |
| 0001165520 | 0A04 | 8200 | 0C05 | 6F68 | 5F74 | 6C66 | 7274 | 705F |
| 0001165540 | 7274 | 040F | FFE8 | 06F2 | 6109 | 696F | 655F | 6576 |
| 0001165560 | 746E | 0201 | 011A | 2665 | 0703 | 00ED | 0010 | 00E2 |
| 0001165600 | 0000 | 0B04 | 7264 | 6761 | 665F | 6C69 | 6574 | 1072 |
| 0001165620 | 0604 | 8200 | 0A05 | 6966 | 746C | 7265 | 705F | 7274 |
| 0001165640 | 040B | 000A | 0081 | 7805 | 705F | 7274 | 040B | 000C |
| 0001165660 | 0081 | 7905 | 705F | 7274 | 040F | 000E | 0081 | 6F09 |
| 0001165700 | 646C | 785F | 705F | 7274 | 040F | 0010 | 0081 | 6F09 |
| 0001165720 | 646C | 795F | 705F | 7274 | 0410 | FFA6 | 0578 | 6F0A |
| 0001165740 | 646C | 665F | 6C69 | 6574 | 0872 | A404 | 81FF | 0200 |
| 0001165760 | 7864 | 0408 | FFA2 | 0081 | 6402 | 0179 | 1502 | 5201 |
| 0001166000 | 0527 | 0107 | 1001 | F600 | 0000 | 0400 | 7206 | 7365 |
| 0001166020 | 7A69 | 1065 | 0604 | 8200 | 0A05 | 6966 | 746C | 7265 |
| 0001166040 | 705F | 7274 | 040B | 000A | 0081 | 7805 | 705F | 7274 |
| 0001166060 | 040B | 000C | 0081 | 7905 | 705F | 7274 | 0412 | 000E |
| 0001166100 | 0081 | 630C | 696C | 6B63 | 735F | 6174 | 7574 | 1073 |
| 0001166120 | A604 | 78FF | 0A05 | 6C6F | 5F64 | 6966 | 746C | 7265 |
| 0001166140 | 0201 | 0117 | 2853 | 0707 | 0195 | 0010 | 018A | 0000 |
| 0001166160 | 0804 | 7075 | 7464 | 705F | 7274 | 040B | 0006 | 00C1 |
| 0001166200 | 7805 | 705F | 7274 | 040B | 000A | 00C1 | 7905 | 705F |
| 0001166220 | 7274 | 040F | 000E | 067E | 6509 | 6576 | 746E | 705F |
| 0001166240 | 7274 | 0407 | FFFC | 0081 | 7801 | 040A | FFFA | 0080 |
| 0001166260 | 6904 | 5F6E | 0A78 | F804 | 80FF | 0400 | 6E69 | 795F |
| 0001166300 | 050F | 0102 | 0008 | 0080 | 7207 | 6E6D | 7264 | 785F |
| 0001166320 | 050F | 0103 | 0008 | 0080 | 7207 | 6E6D | 7264 | 795F |
| 0001166340 | 0005 | 294B | 0081 | 040B | FFF6 | 0081 | 7805 | 6B5F |
| 0001166360 | 7965 | 040B | FFF4 | 0081 | 7905 | 6B5F | 7965 | 0201 |
| 0001166400 | 0201 | 011A | 29E8 | 0709 | 0066 | 0010 | 005B | 0000 |
| 0001166420 | 0B04 | 7264 | 7761 | 635F | 7275 | 6F73 | 0B72 | 0604 |
| 0001166440 | 8100 | 0500 | 5F78 | 7470 | 0B72 | 0804 | 8100 | 0500 |
| 0001166460 | 5F79 | 7470 | 0F72 | E804 | F2FF | 0906 | 6F61 | 5F69 |
| 0001166500 | 7665 | 6E65 | 0174 | 1B02 | 4E01 | 0B2A | 6307 | 1000 |
| 0001166520 | 5800 | 0000 | 0400 | 650C | 6172 | 6573 | 635F | 7275 |
| 0001166540 | 6F73 | 0B72 | 0604 | 8100 | 0500 | 5F78 | 7470 | 0B72 |
| 0001166560 | 0804 | 8100 | 0500 | 5F79 | 7470 | 0F72 | E804 | F2FF |
| 0001166600 | 0906 | 6F61 | 5F69 | 7665 | 6E65 | 0174 | 1A02 | B101 |
| 0001166620 | 0D2A | 5907 | 1000 | 4E00 | 0000 | 0400 | 6D0B | 766F |
| 0001166640 | 5F65 | 7563 | 7372 | 726F | 040B | 0006 | 0081 | 7805 |
| 0001166660 | 705F | 7274 | 040B | 0008 | 0081 | 7905 | 705F | 7274 |
| 0001166700 | 040F | 000A | 0081 | 6F09 | 646C | 785F | 705F | 7274 |
| 0001166720 | 040F | 000C | 0081 | 6F09 | 646C | 795F | 705F | 7274 |
| 0001166740 | 040F | FFE8 | 06F2 | 6109 | 696F | 655F | 6576 | 746E |
| 0001166760 | 0201 | 0118 | 2B0A | 070F | 00B1 | 0010 | 00A6 | 0000 |
| 0001167000 | 0904 | 726E | 6C6D | 665F | 746C | 0E72 | 0604 | 8200 |
| 0001167020 | 0805 | 6C66 | 7274 | 705F | 7274 | 040B | FFFC | 0081 |

THU MAR 14 17:25:16 1991 CRV_IPS.DLL PAGE 290, LINE 17052

| | | | | | | | | |
|---|---|---|---|---|---|---|---|---|
| 0001167040 | 6D05 | 6E69 | 785F | 040B | FFF8 | 0081 | 6D05 | 7861 |
| 0001167060 | 785F | 040B | FFFA | 0081 | 6D05 | 6E69 | 795F | 040B |
| 0001167100 | FFF6 | 0081 | 6D05 | 7861 | 795F | 0201 | 011A | 2BBB |
| 0001167120 | 0711 | 00F2 | 0010 | 00E7 | 0000 | 0B04 | 7277 | 7469 |
| 0001167140 | 5F65 | 5F32 | 7367 | 0F70 | 0604 | F200 | 0906 | 6F61 |
| 0001167160 | 5F69 | 7665 | 6E65 | 0A74 | E604 | F2FF | 0406 | 6C66 |
| 0001167200 | 6761 | 040C | FFFC | 0081 | 7306 | 6174 | 7574 | 0873 |
| 0001167220 | E204 | 86FF | 0200 | 316C | 0408 | FFDE | 0086 | 6C02 |
| 0001167240 | 0132 | 1C02 | AD01 | 132C | 3407 | 1000 | 2900 | 0000 |
| 0001167260 | 0400 | 730D | 6174 | 7472 | 675F | 5F70 | 7264 | 7761 |
| 0001167300 | 0201 | 0120 | 2CE1 | 0714 | 0041 | 0010 | 0036 | 0000 |
| 0001167320 | 1104 | 6574 | 6D72 | 6E69 | 7461 | 5F65 | 7067 | 645F |
| 0001167340 | 6172 | 0F77 | E804 | F2FF | 0906 | 6F61 | 5F69 | 7665 |
| 0001167360 | 6E65 | 0174 | 2502 | 2201 | 162D | 7907 | 1000 | 6E00 |
| 0001167400 | 0000 | 0400 | 6316 | 7672 | 625F | 6975 | 646C | 745F |
| 0001167420 | 6261 | 656C | 5F74 | 6174 | 6C62 | 0F65 | 0604 | E000 |
| 0001167440 | 0904 | 6E69 | 6F5F | 6972 | 6967 | 0B6E | 0A04 | 7500 |
| 0001167460 | 0506 | 6373 | 6C61 | 0B65 | FC04 | 81FF | 0500 | 7265 |
| 0001167500 | 6F72 | 0172 | 1C02 | 9B01 | 182D | D707 | 1000 | CC00 |
| 0001167520 | 0000 | 0400 | 620D | 6975 | 646C | 785F | 745F | 6261 |
| 0001167540 | 656C | 040D | 0006 | 0088 | 7807 | 735F | 6163 | 656C |
| 0001167560 | 0407 | FFFC | 0085 | 6901 | 0201 | 011C | 2E72 | 071A |
| 0001167600 | 00D6 | 0010 | 00CB | 0000 | 0D04 | 7562 | 6C69 | 5F64 |
| 0001167620 | 5F79 | 6174 | 6C62 | 0D65 | 0604 | 8800 | 0700 | 5F79 |
| 0001167640 | 6373 | 6C61 | 0765 | FC04 | 85FF | 0100 | 0169 | 2402 |
| 0001167660 | 4801 | 1B2F | 2107 | 1000 | 1600 | 0000 | 0400 | 7315 |
| 0001167700 | 7465 | 645F | 7369 | 6C70 | 7961 | 6D5F | 7361 | 5F6B |
| 0001167720 | 6C66 | 6761 | 0201 | 0126 | 2F69 | 071C | 0021 | 0010 |
| 0001167740 | 0016 | 0000 | 1704 | 6572 | 6573 | 5F74 | 6964 | 7073 |
| 0001167760 | 616C | 5F79 | 616D | 6B73 | 665F | 616C | 0167 | 1A02 |
| 0001170000 | 8A01 | 1E2F | 9807 | 1000 | 8D00 | 0000 | 0400 | 6D0B |
| 0001170020 | 7361 | 5F6B | 6966 | 746C | 7265 | 0410 | 0006 | 0582 |
| 0001170040 | 660A | 6C69 | 6574 | 5F72 | 7470 | 0F72 | E604 | F2FF |
| 0001170060 | 0906 | 6F61 | 5F69 | 7665 | 6E65 | 0C74 | FC04 | 81FF |
| 0001170100 | 0600 | 7473 | 7461 | 7375 | 0201 | 0118 | 3022 | 071F |
| 0001170120 | 0041 | 0010 | 0036 | 0000 | 0904 | 7264 | 7761 | 6D5F |
| 0001170140 | 7361 | 0F6B | E804 | F2FF | 0906 | 6F61 | 5F69 | 7665 |
| 0001170160 | 6E65 | 0174 | 1B02 | 6301 | 2030 | 2107 | 1000 | 1600 |
| 0001170200 | 0000 | 0400 | 640C | 7369 | 6C70 | 7961 | 6D5F | 7361 |
| 0001170220 | 016B | 0502 | 000D | 1A00 | 1000 | 0605 | 070F | 4400 |
| 0001170240 | 0806 | 7069 | 5F73 | 6164 | 6174 | 0515 | 347C | 0008 |
| 0001170260 | 06BD | 670D | 5F70 | 6966 | 746C | 7265 | 6D5F | 6773 |
| 0001170300 | 050E | 3492 | 0008 | 04E0 | 6F06 | 6972 | 6967 | 146E |
| 0001170320 | 8605 | 0834 | C100 | 0C00 | 5F78 | 6F63 | 766E | 745F |
| 0001170340 | 6261 | 656C | 0514 | 348E | 0008 | 0085 | 780C | 745F |
| 0001170360 | 6261 | 656C | 735F | 7A69 | 1465 | 8A05 | 0834 | C100 |
| 0001170400 | 0C00 | 5F79 | 6F63 | 766E | 745F | 6261 | 656C | 0514 |
| 0001170420 | 3490 | 0008 | 0085 | 790C | 745F | 6261 | 656C | 735F |
| 0001170440 | 7A69 | 1165 | FC05 | 0800 | 8500 | 0900 | 7563 | 7372 |
| 0001170460 | 726F | 6F5F | 0E6E | FE05 | 0800 | 8500 | 0600 | 6174 |
| 0001170500 | 6C62 | 7465 | 0519 | 0100 | 0008 | 0085 | 6411 | 7369 |
| 0001170520 | 6C70 | 7961 | 6D5F | 7361 | 5F6B | 6C66 | 6761 | 1105 |
| 0001170540 | 0001 | 0000 | 012B | 3084 | 0741 | 111E | 0016 | 1110 |
| 0001170560 | 0000 | 1C04 | 7263 | 5F76 | 6964 | 7073 | 616C | 5F79 |
| 0001170600 | 756D | 746C | 7069 | 656C | 735F | 7263 | 6565 | 736E |
| 0001170620 | 040F | 0006 | 0697 | 6509 | 6576 | 746E | 705F | 7274 |
| 0001170640 | 040C | FFF8 | 00C0 | 5F06 | 745F | 7079 | 0F65 | E604 |
| 0001170660 | 85FF | 0900 | 5F5F | 7862 | 745F | 7079 | 0D65 | D204 |
| 0001170700 | 66FF | 0704 | 5F5F | 7270 | 6E69 | 0B74 | C804 | 06FF |

THU MAR 14 17:25:16 1991 CRV_IPS.DLL PAGE 291, LINE 17111

| | | | | | | | | |
|---|---|---|---|---|---|---|---|---|
| 0001170720 | 0507 | 5F5F | 766C | 0D6C | DA04 | 46FF | 0707 | 5F5F |
| 0001170740 | 6C63 | 636F | 0D6B | F204 | C0FF | 0700 | 5F5F | 7473 |
| 0001170760 | 6361 | 0E6B | CE04 | 81FF | 0800 | 5F5F | 6572 | 7674 |
| 0001171000 | 6C61 | 040E | FFD6 | 0544 | 7308 | 7263 | 5F6E | 7470 |
| 0001171020 | 0972 | E804 | 81FF | 0300 | 7265 | 0C72 | F604 | 81FF |
| 0001171040 | 0600 | 7473 | 7461 | 7375 | 040A | FFD0 | 0085 | 6204 |
| 0001171060 | 6E61 | 0E6B | C604 | 85FF | 0800 | 6D69 | 7367 | 6E5F |
| 0001171100 | 6D75 | 040C | FFEA | 04F6 | 7706 | 6E69 | 6F64 | 0C77 |
| 0001171120 | FC04 | 85FF | 0600 | 616C | 6579 | 7372 | 050E | 02D8 |
| 0001171140 | 0008 | 0744 | 5F06 | 665F | 6E75 | 0163 | 1F02 | A201 |
| 0001171160 | 4941 | 4F07 | 1614 | 4100 | 0014 | 0400 | 6310 | 7672 |
| 0001171200 | 645F | 7369 | 6C70 | 7961 | 645F | 6669 | 0F66 | 0604 |
| 0001171220 | 9700 | 0906 | 7665 | 6E65 | 5F74 | 7470 | 0C72 | F804 |
| 0001171240 | C0FF | 0600 | 5F5F | 7974 | 6570 | 040F | FFDE | 0085 |
| 0001171260 | 5F09 | 625F | 5F78 | 7974 | 6570 | 040D | FFCC | 0466 |
| 0001171300 | 5F07 | 705F | 6972 | 746E | 040B | FFC4 | 0706 | 5F05 |
| 0001171320 | 6C5F | 6C76 | 040D | FFD0 | 0746 | 5F07 | 635F | 6F6C |
| 0001171340 | 6B63 | 040D | FFF2 | 00C0 | 5F07 | 735F | 6174 | 6B63 |
| 0001171360 | 040E | FFCA | 0081 | 5F08 | 725F | 7465 | 6176 | 126C |
| 0001171400 | EA04 | 44FF | 0C05 | 7865 | 6570 | 7463 | 6465 | 705F |
| 0001171420 | 7274 | 0410 | FFEE | 0544 | 730A | 7263 | 6565 | 5F6E |
| 0001171440 | 7470 | 0972 | E004 | 81FF | 0300 | 7265 | 0A72 | DC04 |
| 0001171460 | 81FF | 0400 | 7265 | 3172 | 040C | FFF6 | 0081 | 7306 |
| 0001171500 | 6174 | 7574 | 0C73 | E204 | F6FF | 0604 | 6977 | 646E |
| 0001171520 | 776F | 040C | FFFC | 0085 | 6C06 | 7961 | 7265 | 0E73 |
| 0001171540 | 7E05 | 0803 | 4B00 | 0607 | 5F5F | 7566 | 636E | 0201 |
| 0001171560 | 0121 | 55F1 | 074E | 0472 | 0010 | 0467 | 0000 | 1204 |
| 0001171600 | 6964 | 7073 | 616C | 5F79 | 7473 | 6972 | 5F70 | 6964 |
| 0001171620 | 6666 | 0412 | 0006 | 0732 | 650C | 7078 | 6365 | 6574 |
| 0001171640 | 5F64 | 7470 | 1072 | 0A04 | 3200 | 0A07 | 6373 | 6572 |
| 0001171660 | 6E65 | 705F | 7274 | 040C | FFFA | 00C0 | 5F06 | 745F |
| 0001171700 | 7079 | 0F65 | EC04 | 85FF | 0900 | 5F5F | 7862 | 745F |
| 0001171720 | 7079 | 0D65 | DC04 | 66FF | 0704 | 5F5F | 7270 | 6E69 |
| 0001171740 | 0B74 | D404 | 06FF | 0507 | 5F5F | 766C | 0D6C | E004 |
| 0001171760 | 46FF | 0707 | 5F5F | 6C63 | 636F | 0D6B | F004 | C0FF |
| 0001172000 | 0700 | 5F5F | 7473 | 6361 | 0E6B | DA04 | 81FF | 0800 |
| 0001172020 | 5F5F | 6572 | 7674 | 6C61 | 0413 | FFF6 | 0086 | 730D |
| 0001172040 | 7274 | 7069 | 625F | 6675 | 705F | 7274 | 0407 | FFEE |
| 0001172060 | 0085 | 6901 | 040C | FFF4 | 0081 | 7306 | 6174 | 7574 |
| 0001172100 | 0E73 | C005 | 0803 | 4F00 | 0607 | 5F5F | 7566 | 636E |
| 0001172120 | 0201 | 011F | 5A63 | 0751 | 04A4 | 0010 | 0499 | 0000 |
| 0001172140 | 1004 | 6964 | 7073 | 616C | 5F79 | 6973 | 5F67 | 6964 |
| 0001172160 | 6666 | 0412 | 0006 | 0735 | 650C | 7078 | 6365 | 6574 |
| 0001172200 | 5F64 | 7470 | 1072 | 0A04 | 3500 | 0A07 | 6373 | 6572 |
| 0001172220 | 6E65 | 705F | 7274 | 040C | FFFA | 00C0 | 5F06 | 745F |
| 0001172240 | 7079 | 0F65 | EC04 | 85FF | 0900 | 5F5F | 7862 | 745F |
| 0001172260 | 7079 | 0D65 | DA04 | 66FF | 0704 | 5F5F | 7270 | 6E69 |
| 0001172300 | 0B74 | D204 | 06FF | 0507 | 5F5F | 766C | 0D6C | DE04 |
| 0001172320 | 46FF | 0707 | 5F5F | 6C63 | 636F | 0D6B | F004 | C0FF |
| 0001172340 | 0700 | 5F5F | 7473 | 6361 | 0E6B | D804 | 81FF | 0800 |
| 0001172360 | 5F5F | 6572 | 7674 | 6C61 | 0411 | FFF4 | 0086 | 730B |
| 0001172400 | 6769 | 625F | 6675 | 705F | 7274 | 0407 | FFEE | 0085 |
| 0001172420 | 6901 | 0407 | FFEA | 0085 | 6A01 | 040C | FFF8 | 0081 |
| 0001172440 | 7306 | 6174 | 7574 | 0E73 | 0405 | 0804 | 4B00 | 0607 |
| 0001172460 | 5F5F | 7566 | 636E | 0201 | 0128 | 5F07 | 0753 | 0AA5 |
| 0001172500 | 0016 | 0A97 | 0000 | 1904 | 7263 | 5F76 | 6964 | 7073 |
| 0001172520 | 616C | 5F79 | 6F74 | 6767 | 656C | 735F | 7263 | 6565 |
| 0001172540 | 0F6E | 0604 | 9700 | 0906 | 7665 | 6E65 | 5F74 | 7470 |
| 0001172560 | 0C72 | F804 | C0FF | 0600 | 5F5F | 7974 | 6570 | 040F |

THU MAR 14 17:25:16 1991 CRV_IPS.DLL PAGE 292, LINE 17170

| | | | | | | | | |
|---|---|---|---|---|---|---|---|---|
| 0001172600 | FFF0 | 0085 | 5F09 | 625F | 5F78 | 7974 | 6570 | 040D |
| 0001172620 | FFE0 | 0466 | 5F07 | 705F | 6972 | 746E | 040B | FFD8 |
| 0001172640 | 0706 | 5F05 | 6C5F | 6C76 | 040D | FFE4 | 0746 | 5F07 |
| 0001172660 | 635F | 6F6C | 6B63 | 040D | FFF2 | 00C0 | 5F07 | 735F |
| 0001172700 | 6174 | 6B63 | 040E | FFDE | 0081 | 5F08 | 725F | 7465 |
| 0001172720 | 6176 | 0C6C | F604 | 81FF | 0600 | 7473 | 7461 | 7375 |
| 0001172740 | 040C | FFFC | 0085 | 6C06 | 7961 | 7265 | 0E73 | CE05 |
| 0001172760 | 0804 | 5500 | 0607 | 5F5F | 7566 | 636E | 0201 | 011F |
| 0001173000 | 69AC | 075B | 0393 | 0016 | 0387 | 0000 | 1004 | 7263 |
| 0001173020 | 5F76 | 7473 | 706F | 645F | 7369 | 6C70 | 7961 | 040C |
| 0001173040 | FFFA | 00CD | 5F06 | 745F | 7079 | 0F65 | F204 | 85FF |
| 0001173060 | 0900 | 5F5F | 7862 | 745F | 7079 | 0D65 | E204 | 66FF |
| 0001173100 | 0704 | 5F5F | 7270 | 6E69 | 0B74 | DA04 | 06FF | 0507 |
| 0001173120 | 5F5F | 766C | 0D6C | E604 | 46FF | 0707 | 5F5F | 6C63 |
| 0001173140 | 636F | 0D6B | F404 | C0FF | 0700 | 5F5F | 7473 | 6361 |
| 0001173160 | 0E6B | E004 | 81FF | 0800 | 5F5F | 6572 | 7674 | 6C61 |
| 0001173200 | 040C | FFF8 | 0081 | 7306 | 6174 | 7574 | 0E73 | 2005 |
| 0001173220 | 0805 | 4B00 | 0607 | 5F5F | 7566 | 636E | 0201 | 011D |
| 0001173240 | 6D3F | 075D | 0494 | 0010 | 0489 | 0000 | 0E04 | 7564 |
| 0001173260 | 706D | 735F | 7263 | 5F6E | 5F32 | 7067 | 040E | 0006 |
| 0001173300 | 0544 | 7308 | 7263 | 5F6E | 7470 | 0E72 | 0A04 | 8100 |
| 0001173320 | 0800 | 6162 | 6B6E | 6E5F | 6D75 | 0410 | 000C | 06F5 |
| 0001173340 | 770A | 6E69 | 6F64 | 5F77 | 7470 | 0A72 | E004 | 85FF |
| 0001173360 | 0400 | 6162 | 6B6E | 040C | FFFA | 00C0 | 5F06 | 745F |
| 0001173400 | 7079 | 0F65 | F204 | 85FF | 0900 | 5F5F | 7862 | 745F |
| 0001173420 | 7079 | 0D65 | E204 | 66FF | 0704 | 5F5F | 7270 | 6E69 |
| 0001173440 | 0B74 | D804 | 06FF | 0507 | 5F5F | 766C | 0D6C | E604 |
| 0001173460 | 46FF | 0707 | 5F5F | 6C63 | 636F | 0D6B | F404 | C0FF |
| 0001173500 | 0700 | 5F5F | 7473 | 6361 | 0E6B | DE04 | 81FF | 0800 |
| 0001173520 | 5F5F | 6572 | 7674 | 6C61 | 040C | FFF8 | 0081 | 7306 |
| 0001173540 | 6174 | 7574 | 1073 | CE04 | B6FF | 0A06 | 6F68 | 7473 |
| 0001173560 | 705F | 7261 | 6D61 | 050E | 0568 | 00D8 | 074B | 5F06 |
| 0001173600 | 665F | 6E75 | 0163 | 1E02 | D301 | 5F71 | 8607 | 1002 |
| 0001173620 | 7B00 | 0002 | 0400 | 640F | 6D75 | 5F70 | 616C | 6579 |
| 0001173640 | 5F72 | 5F32 | 7067 | 040F | 0006 | 00E4 | 6C09 | 7961 |
| 0001173660 | 7265 | 705F | 7274 | 0410 | 000A | 0082 | 6C0A | 7961 |
| 0001173700 | 7265 | 735F | 7A69 | 0E65 | 0E04 | 8100 | 0800 | 6162 |
| 0001173720 | 6B6E | 6E5F | 6D75 | 0410 | 0010 | 06F5 | 770A | 6E69 |
| 0001173740 | 6F64 | 5F77 | 7470 | 0C72 | FAD4 | C0FF | 0600 | 5F5F |
| 0001173760 | 7974 | 6570 | 040F | FFF2 | 0085 | 5F09 | 625F | 5F78 |
| 0001174000 | 7974 | 6570 | 040D | FFE2 | 0466 | 5F07 | 705F | 6972 |
| 0001174020 | 746E | 040B | FFDA | 0706 | 5F05 | 6C5F | 6C76 | 040D |
| 0001174040 | FFE6 | 0746 | 5F07 | 635F | 6F6C | 6B63 | 040D | FFF4 |
| 0001174060 | 00C0 | 5F07 | 735F | 6174 | 6B63 | 040E | FFED | 0081 |
| 0001174100 | 5F08 | 725F | 7465 | 6176 | 0C6C | F804 | 81FF | 0600 |
| 0001174120 | 7473 | 7461 | 7375 | 050E | 05A0 | 0008 | 0760 | 5F06 |
| 0001174140 | 665F | 6E75 | 0163 | 1D02 | 5901 | 6274 | 7907 | 1004 |
| 0001174160 | 6E00 | 0004 | 0400 | 780E | 726F | 6C5F | 7961 | 7265 |
| 0001174200 | 325F | 675F | 0F70 | 0604 | E400 | 0900 | 616C | 6579 |
| 0001174220 | 5F72 | 7470 | 1072 | 0A04 | 8200 | 0A00 | 616C | 6579 |
| 0001174240 | 5F72 | 6973 | 657A | 040E | 000E | 0081 | 6208 | 6E61 |
| 0001174260 | 5F6B | 756E | 106D | 1004 | F500 | 0A06 | 6977 | 646E |
| 0001174300 | 776F | 705F | 7274 | 040C | FFF8 | 00C0 | 5F06 | 745F |
| 0001174320 | 7079 | 0F65 | F004 | 85FF | 0900 | 5F5F | 7862 | 745F |
| 0001174340 | 7079 | 0D65 | E004 | 66FF | 0704 | 5F5F | 7270 | 6E69 |
| 0001174360 | 0B74 | D804 | 06FF | 0507 | 5F5F | 766C | 0D6C | E404 |
| 0001174400 | 46FF | 0707 | 5F5F | 6C63 | 636F | 0D6B | F204 | C0FF |
| 0001174420 | 0700 | 5F5F | 7473 | 6361 | 0E6B | DE04 | 81FF | 0800 |
| 0001174440 | 5F5F | 6572 | 7674 | 6C61 | 040C | FFF6 | 0081 | 7306 |

THU MAR 14 17:25:16 1991 CRV_IPS.DLL PAGE 293, LINE 17229

| | | | | | | | | |
|---|---|---|---|---|---|---|---|---|
| 0001174460 | 6174 | 7574 | 0B73 | FC04 | 81FF | 0500 | 6162 | 6B6E |
| 0001174500 | 0E34 | E805 | 0805 | 6400 | 0607 | 5F5F | 7566 | 636E |
| 0001174520 | 0201 | 0120 | 78D2 | 0766 | 0743 | 0016 | 0735 | 0000 |
| 0001174540 | 1104 | 7263 | 5F76 | 7075 | 6164 | 6574 | 735F | 7263 |
| 0001174560 | 6565 | 0F6E | 0604 | 9700 | 0906 | 7665 | 6E65 | 5F74 |
| 0001174600 | 7470 | 0C72 | FA04 | C0FF | 0600 | 5F5F | 7974 | 6570 |
| 0001174620 | 040F | FFF2 | 0085 | 5F09 | 625F | 5F78 | 7974 | 6570 |
| 0001174640 | 040D | FFE0 | 0466 | 5F07 | 705F | 6972 | 746E | 040B |
| 0001174660 | FFD8 | 0706 | 5F05 | 6C5F | 6C76 | 040D | FFE4 | 0746 |
| 0001174700 | 5F07 | 635F | 6F6C | 6B63 | 040D | FFF6 | 00C0 | 5F07 |
| 0001174720 | 735F | 6174 | 6B63 | 040E | FFDE | 0081 | 5F08 | 725F |
| 0001174740 | 7465 | 6176 | 096C | F404 | 81FF | 0300 | 7265 | 0A72 |
| 0001174760 | F004 | 81FF | 0400 | 7265 | 3172 | 050E | 0678 | 0008 |
| 0001175000 | 0768 | 5F06 | 665F | 6E75 | 0163 | 2302 | 1501 | 6980 |
| 0001175020 | 6A07 | 1007 | 5F00 | 0007 | 0400 | 7514 | 6470 | 7461 |
| 0001175040 | 5F65 | 6962 | 6D74 | 7061 | 735F | 7263 | 6565 | 0C6E |
| 0001175060 | F804 | C0FF | 0600 | 5F5F | 7974 | 6570 | 040F | FFE4 |
| 0001175100 | 0085 | 5F09 | 625F | 5F78 | 7974 | 6570 | 040D | FFCE |
| 0001175120 | 0466 | 5F07 | 705F | 6972 | 746E | 040B | FFC4 | 0706 |
| 0001175140 | 5F05 | 6C5F | 6C76 | 040D | FFD2 | 0746 | 5F07 | 635F |
| 0001175160 | 6F6C | 6B63 | 040D | FFF0 | 00C0 | 5F07 | 735F | 6174 |
| 0001175200 | 6B63 | 040E | FFCA | 0081 | 5F08 | 725F | 7465 | 6176 |
| 0001175220 | 096C | E604 | 81FF | 0300 | 7265 | 0A72 | DE04 | 81FF |
| 0001175240 | 0400 | 7265 | 3172 | 040B | FFE0 | 00E6 | 6505 | 705F |
| 0001175260 | 7274 | 040B | FFE8 | 00E6 | 6405 | 705F | 7274 | 0407 |
| 0001175300 | FFEC | 0082 | 6901 | 040F | FFF4 | 0082 | 6C09 | 6F6F |
| 0001175320 | 5F70 | 6973 | 657A | 040C | FFFC | 0085 | 6C06 | 7961 |
| 0001175340 | 7265 | 0F73 | CC04 | 85FF | 0900 | 616C | 6579 | 5F72 |
| 0001175360 | 756E | 0A6D | C004 | 86FF | 0400 | 6974 | 656D | 050E |
| 0001175400 | 074C | 0008 | 076A | 5F06 | 665F | 6E75 | 0163 | 2602 |
| 0001175420 | 7F01 | 6C87 | 8707 | 1005 | 7C00 | 0005 | 0400 | 7517 |
| 0001175440 | 6470 | 7461 | 5F65 | 6973 | 6E67 | 7461 | 7275 | 5F65 |
| 0001175460 | 6373 | 6572 | 6E65 | 040C | FFFA | 00C0 | 5F06 | 745F |
| 0001175500 | 7079 | 0F65 | F204 | 85FF | 0900 | 5F5F | 7862 | 745F |
| 0001175520 | 7079 | 0D65 | D004 | 66F7 | 0704 | 5F5F | 7270 | 6E69 |
| 0001175540 | 0B74 | C804 | 06F7 | 0507 | 5F5F | 766C | 0D6C | E404 |
| 0001175560 | 46FF | 0707 | 5F5F | 6C63 | 636F | 0D6B | F604 | C0FF |
| 0001175600 | 0700 | 5F5F | 7473 | 6361 | 0E6B | CE04 | 81F7 | 0800 |
| 0001175620 | 5F5F | 6572 | 7674 | 6C61 | 0409 | FFF4 | 0081 | 6503 |
| 0001175640 | 7272 | 040A | FFF0 | 0081 | 6504 | 7272 | 0D31 | B804 |
| 0001175660 | C7EF | 0706 | 7865 | 5F70 | 6973 | 0E67 | D404 | C7F7 |
| 0001175700 | 0806 | 6964 | 6666 | 735F | 6769 | 050E | 07DC | 0008 |
| 0001175720 | 076D | 5F06 | 665F | 6E75 | 0163 | 2502 | 0601 | 6F8D |
| 0001175740 | 7607 | 1012 | 6B00 | 0012 | 0400 | 6416 | 6D75 | 5F70 |
| 0001175760 | 6D69 | 6761 | 5F65 | 6F66 | 5F72 | 6964 | 7073 | 616C |
| 0001176000 | 0C79 | 0604 | 8600 | 0600 | 7374 | 5F74 | 6469 | 040E |
| 0001176020 | 000A | 0086 | 6908 | 616D | 6567 | 695F | 1064 | 0E04 |
| 0001176040 | C000 | 0A00 | 6D69 | 6761 | 5F65 | 616E | 656D | 040A |
| 0001176060 | 0012 | 0085 | 6D04 | 646F | 1565 | 8404 | E4FE | 0F00 |
| 0001176100 | 6966 | 7372 | 5F74 | 616C | 6579 | 5F72 | 7470 | 1572 |
| 0001176120 | F804 | 85FF | 0F00 | 6966 | 7372 | 5F74 | 6D69 | 6761 |
| 0001176140 | 5F65 | 6468 | 0D6C | 8804 | 36FE | 0705 | 6573 | 5F63 |
| 0001176160 | 6468 | 1172 | 4A04 | 44F6 | 0B05 | 6573 | 5F63 | 6468 |
| 0001176200 | 5F72 | 7470 | 1372 | 5604 | E4F6 | 0D00 | 6573 | 5F63 |
| 0001176220 | 616C | 6579 | 5F72 | 7470 | 1372 | F604 | 85FF | 0D00 |
| 0001176240 | 6573 | 5F63 | 6D69 | 6761 | 5F65 | 6468 | 0C6C | FA04 |
| 0001176260 | C0FF | 0600 | 5F5F | 7974 | 6570 | 040F | FE80 | 0085 |
| 0001176300 | 5F09 | 625F | 5F78 | 7974 | 6570 | 040D | F65A | 0466 |
| 0001176320 | 5F07 | 705F | 6972 | 746E | 040B | F64E | 0706 | 5F05 |

THU MAR 14 17:25:16 1991 CRV_IPS.DLL PAGE 294, LINE 17288

| | | | | | | | | |
|---|---|---|---|---|---|---|---|---|
| 0001176340 | 6C5F | 6C76 | 040D | F65E | 0746 | 5F07 | 635F | 6F6C |
| 0001176360 | 6B63 | 040D | FFF0 | 00C0 | 5F07 | 735F | 6174 | 6B63 |
| 0001176400 | 040E | F654 | 0081 | 5F08 | 725F | 7465 | 6176 | 096C |
| 0001176420 | 8204 | 81FE | 0300 | 7265 | 0A72 | 6A04 | 81F6 | 0400 |
| 0001176440 | 7265 | 3172 | 040C | FFF4 | 0081 | 7306 | 6174 | 7574 |
| 0001176460 | 0F73 | 6C04 | C7F6 | 0906 | 6966 | 7372 | 5F74 | 6973 |
| 0001176500 | 0D67 | 3A04 | C7EE | 0706 | 6573 | 5F63 | 6973 | 0F67 |
| 0001176520 | 3C04 | 36FF | 0905 | 6966 | 7372 | 5F74 | 6468 | 1372 |
| 0001176540 | 7C04 | 44FE | 0D05 | 6966 | 7372 | 5F74 | 6468 | 5F72 |
| 0001176560 | 7470 | 0E72 | 5805 | 0809 | 7000 | 0607 | 5F5F | 7566 |
| 0001176600 | 636E | 0201 | 0125 | 9F7C | 0774 | 054C | 0010 | 0541 |
| 0001176620 | 0000 | 1604 | 7564 | 706D | 6D5F | 6C75 | 6974 | 6C5F |
| 0001176640 | 7961 | 7265 | 695F | 616D | 6567 | 040C | 0006 | 0086 |
| 0001176660 | 7406 | 7473 | 695F | 1164 | 0A04 | 4400 | 0B05 | 6D69 |
| 0001176700 | 5F67 | 6468 | 5F72 | 7470 | 1372 | 0E04 | 5F00 | 0D05 |
| 0001176720 | 6D69 | 5F67 | 616C | 6579 | 5F72 | 7470 | 1372 | 1204 |
| 0001176740 | 8500 | 0D00 | 6D69 | 5F67 | 6D69 | 6761 | 5F65 | 6468 |
| 0001176760 | 0A6C | 1404 | 8500 | 0400 | 6F6D | 6564 | 040F | FFD0 |
| 0001177000 | 0085 | 6C09 | 7961 | 7265 | 6E5F | 6D75 | 040C | FFE6 |
| 0001177020 | 04F6 | 7706 | 6E69 | 6F64 | 0A77 | C404 | 86FF | 0400 |
| 0001177040 | 6974 | 656D | 040C | FFF8 | 00C0 | 5F06 | 745F | 7079 |
| 0001177060 | 0F65 | E204 | 85FF | 0900 | 5F5F | 7862 | 745F | 7079 |
| 0001177100 | 0D65 | D204 | 66FF | 0704 | 5F5F | 7270 | 6E69 | 0B74 |
| 0001177120 | C804 | 06FF | 0507 | 5F5F | 766C | 0D6C | D604 | 46FF |
| 0001177140 | 0707 | 5F5F | 6C63 | 636F | 0D6B | F204 | C0FF | 0700 |
| 0001177160 | 5F5F | 7473 | 6361 | 0E6B | CE04 | 81FF | 0800 | 5F5F |
| 0001177200 | 6572 | 7674 | 6C61 | 0409 | FFE4 | 0081 | 6503 | 7272 |
| 0001177220 | 040C | FFF6 | 0081 | 7306 | 6174 | 7574 | 1073 | EE04 |
| 0001177240 | 82FF | 0A00 | 616C | 6579 | 5F72 | 6973 | 657A | 040C |
| 0001177260 | FFFC | 0085 | 6C06 | 7961 | 7265 | 0E73 | E205 | 0809 |
| 0001177300 | 7000 | 0607 | 5F5F | 7566 | 636E | 0201 | 0D05 | 0000 |
| 0001177320 | 001A | 050F | 30A4 | 0008 | 0086 | 6D07 | 5F62 | 6973 |
| 0001177340 | 657A | 050F | 0202 | 0008 | 00C0 | 4207 | 785F | 6946 |
| 0001177360 | 656C | 050F | 0206 | 0008 | 00C0 | 4207 | 785F | 6150 |
| 0001177400 | 6B63 | 0517 | 020A | 0008 | 0085 | 690F | 676D | 5F73 |
| 0001177420 | 6361 | 6974 | 6576 | 6E5F | 6D75 | 0512 | 020C | 0008 |
| 0001177440 | 06D1 | 610A | 7463 | 7669 | 5F65 | 6D69 | 1067 | 1205 |
| 0001177460 | 0802 | D100 | 0806 | 6162 | 6B6E | 615F | 7272 | 050F |
| 0001177500 | 349C | 0008 | 0536 | 6507 | 7078 | 685F | 7264 | 0513 |
| 0001177520 | 0218 | 0008 | 0544 | 650B | 7078 | 685F | 7264 | 705F |
| 0001177540 | 7274 | 0515 | 3498 | 0008 | 00E4 | 650D | 7078 | 6C5F |
| 0001177560 | 7961 | 7265 | 705F | 7274 | 0510 | 0F06 | 0007 | 0663 |
| 0001177600 | 6908 | 7370 | 645F | 7461 | 1561 | 0C05 | 0836 | 8500 |
| 0001177620 | 0D00 | 7865 | 5F70 | 6D69 | 6761 | 5F65 | 6468 | 106C |
| 0001177640 | 5405 | 0835 | 3600 | 0805 | 6964 | 6666 | 685F | 7264 |
| 0001177660 | 0514 | 021C | 0008 | 0544 | 640C | 6669 | 5F66 | 6468 |
| 0001177700 | 5F72 | 7470 | 1672 | 5005 | 0835 | E400 | 0E00 | 6964 |
| 0001177720 | 6666 | 6C5F | 7961 | 7265 | 705F | 7274 | 0516 | 3496 |
| 0001177740 | 0008 | 0085 | 640E | 6669 | 5F66 | 6D69 | 6761 | 5F65 |
| 0001177760 | 6468 | 146C | 2005 | 0802 | 8500 | 0C00 | 7563 | 7272 |
| 0001200000 | 6E65 | 5F74 | 6964 | 7073 | 0510 | 0222 | 0008 | 022C |
| 0001200020 | 6508 | 7078 | 6E5F | 6D61 | 1465 | 0005 | 0000 | 8100 |
| 0001200040 | 0C00 | 7842 | 445F | 6265 | 6775 | 6F4D | 6564 | 0511 |
| 0001200060 | 0242 | 0008 | 022C | 6409 | 6669 | 5F66 | 616E | 656D |
| 0001200100 | 0514 | 0000 | 0000 | 0081 | 420C | 5F78 | 6954 | 656D |
| 0001200120 | 4D73 | 646F | 0F65 | 6205 | 0802 | 8600 | 0700 | 6964 |
| 0001200140 | 6666 | 695F | 0C64 | 6605 | 0802 | 0000 | 0406 | 616E |
| 0001200160 | 656D | 0510 | 0000 | 0000 | 0081 | 4208 | 5F78 | 5F42 |
| 0001200200 | 6973 | 1367 | 0805 | 0836 | 8500 | 0B00 | 6964 | 7073 |

THU MAR 14 17:25:16 1991 CRV_IPS.DLL PAGE 295, LINE 17347

| | | | | | | | | |
|---|---|---|---|---|---|---|---|---|
| 0001200220 | 616C | 5F79 | 7273 | 1463 | C605 | 0802 | 8500 | 0C00 |
| 0001200240 | 6964 | 7073 | 616C | 5F79 | 6F6D | 6564 | 0515 | 360A |
| 0001200260 | 0008 | 0085 | 730D | 6769 | 645F | 7369 | 6C70 | 7961 |
| 0001200300 | 6465 | 0510 | 02C8 | 0008 | 00C0 | 6308 | 6D6F | 5F6D |
| 0001200320 | 7265 | 1072 | CC05 | 0802 | C000 | 0800 | 6361 | 7373 |
| 0001200340 | 655F | 7272 | 0510 | 02D0 | 0008 | 00C0 | 6408 | 706D |
| 0001200360 | 735F | 7263 | 0F6E | D405 | 0802 | C000 | 0700 | 6C72 |
| 0001200400 | 5F73 | 6D69 | 0567 | 0111 | 0000 | 2300 | C801 | 12A4 |
| 0001200420 | 9207 | 1605 | 8600 | 0005 | 0400 | 6914 | 696E | 5F74 |
| 0001200440 | 6C67 | 626F | 6C61 | 695F | 7370 | 645F | 7461 | 0961 |
| 0001200460 | EA04 | 81FC | 0300 | 7265 | 1072 | F804 | 86FC | 0A00 |
| 0001200500 | 6663 | 5F67 | 626F | 5F6A | 6469 | 040F | FCF0 | 0086 |
| 0001200520 | 7509 | 6F6C | 676E | 705F | 7261 | 040E | FDFC | 0713 |
| 0001200540 | 7008 | 7261 | 6E5F | 6D61 | 0D65 | EC04 | C0FC | 0700 |
| 0001200560 | 6170 | 5F72 | 7470 | 0E72 | FC04 | E4FC | 0805 | 7265 |
| 0001200600 | 5F72 | 6170 | 6874 | 040E | FFFC | 0085 | 6508 | 7272 |
| 0001200620 | 6C5F | 6E69 | 1165 | E804 | 85FC | 0B00 | 696C | 7473 |
| 0001200640 | 6C5F | 6E65 | 7467 | 0E68 | E604 | 85FC | 0800 | 6F62 |
| 0001200660 | 6C6F | 705F | 7261 | 040D | FCF4 | 00C6 | 6307 | 6C6F |
| 0001200700 | 756F | 7372 | 0201 | 011D | AA5A | 071E | 0072 | 0016 |
| 0001200720 | 0064 | 0000 | 0E04 | 7367 | 5F70 | 6E69 | 7469 | 6C69 |
| 0001200740 | 6169 | 657A | 040A | 0006 | 00C0 | 6E04 | 6D61 | 0965 |
| 0001200760 | FC04 | 81FF | 0300 | 7265 | 0172 | 2102 | CC01 | 20AA |
| 0001201000 | 7607 | 1000 | 6B00 | 0000 | 0400 | 6712 | 7073 | 655F |
| 0001201020 | 616E | 6C62 | 5F65 | 766F | 7265 | 616C | 0C79 | 0604 |
| 0001201040 | 8500 | 0600 | 6E65 | 6261 | 656C | 0409 | FFF8 | 0081 |
| 0001201060 | 6503 | 7272 | 0409 | FFFC | 0085 | 7403 | 706D | 0409 |
| 0001201100 | FFFA | 0085 | 6403 | 7461 | 0201 | 011C | AB42 | 0721 |
| 0001201120 | 0030 | 0016 | 0024 | 0000 | 0D04 | 7367 | 5F70 | 6574 |
| 0001201140 | 6D72 | 6E69 | 7461 | 0965 | FC04 | 81FF | 0300 | 7265 |
| 0001201160 | 0172 | 1B02 | 7201 | 22AB | A707 | 1604 | 9B00 | 0004 |
| 0001201200 | 0400 | 670C | 7073 | 615F | 7463 | 7669 | 7461 | 0E65 |
| 0001201220 | F604 | 81FE | 6300 | 6974 | 656D | 6F5F | 7475 | 0409 |
| 0001201240 | FCEC | 0081 | 6503 | 7272 | 040F | FCB4 | 06BD | 6709 |
| 0001201260 | 5F70 | 6170 | 6172 | 736D | 0410 | FEF8 | 0086 | 630A |
| 0001201300 | 6766 | 6F5F | 6A62 | 695F | 0F64 | F204 | 86FC | 0900 |
| 0001201320 | 6C75 | 6E6F | 5F67 | 6170 | 0B72 | F604 | 13FC | 0507 |
| 0001201340 | 6E66 | 6D61 | 0D65 | EE04 | C0FC | 0700 | 6170 | 5F72 |
| 0001201360 | 7470 | 0E72 | FC04 | E4FE | 0805 | 7265 | 5F72 | 6170 |
| 0001201400 | 6874 | 040E | FFFC | 0085 | 6508 | 7272 | 6C5F | 6E69 |
| 0001201420 | 0165 | 1B02 | 1901 | 25B0 | AF07 | 1005 | A400 | 0005 |
| 0001201440 | 0400 | 670C | 7073 | 695F | 696E | 5F74 | 756C | 1074 |
| 0001201460 | FC04 | 81FF | 0A00 | 4755 | 594C | 505F | 5441 | 4843 |
| 0001201500 | 0005 | B040 | 023E | 0411 | F2F2 | 0726 | 700B | 7265 |
| 0001201520 | 756D | 6174 | 6974 | 6E6F | 0410 | F8F6 | 0086 | 630A |
| 0001201540 | 6766 | 6F5F | 6A62 | 695F | 1364 | E804 | C6F2 | 0D00 |
| 0001201560 | 6C75 | 6E6F | 5F67 | 6170 | 5F72 | 7470 | 1472 | E204 |
| 0001201600 | 85F2 | 0E00 | 756E | 5F6D | 666F | 655F | 746E | 6972 |
| 0001201620 | 7365 | 040E | F8FA | 05E4 | 6508 | 7272 | 705F | 7461 |
| 0001201640 | 0E68 | FA04 | 85FF | 0800 | 7265 | 5F72 | 696C | 656E |
| 0001201660 | 0410 | F8F2 | 0086 | 670A | 5F70 | 7562 | 5F66 | 7470 |
| 0001201700 | 1172 | E404 | 82F2 | 0B00 | 7067 | 625F | 6675 | 735F |
| 0001201720 | 7A69 | 0965 | EE04 | 81F2 | 0300 | 7265 | 0772 | F004 |
| 0001201740 | 85F2 | 0100 | 0769 | EC04 | 85F2 | 0100 | 0D6A | FA04 |
| 0001201760 | 26F9 | 0707 | 756C | 5F74 | 7562 | 0166 | 0502 | 8100 |
| 0001202000 | 3CB2 | 0703 | EE04 | 85F2 | 0100 | 0A69 | E004 | 85F2 |
| 0001202020 | 0400 | 6D74 | 3170 | 040A | F2E2 | 0085 | 7404 | 706D |
| 0001202040 | 0A32 | E404 | 85F2 | 0400 | 6D74 | 3370 | 040A | F2E8 |
| 0001202060 | 0085 | 7404 | 706D | 0934 | EC04 | 85F2 | 0300 | 6164 |

THU MAR 14 17:25:16 1991 CRV_IPS.DLL PAGE 296, LINE 17406

| | | | | | | | | |
|---|---|---|---|---|---|---|---|---|
| 0001202100 | 0974 | F204 | 2AF2 | 0307 | 7562 | 0166 | 0102 | 1E02 |
| 0001202120 | C801 | 2DB5 | 8407 | 1000 | 7900 | 0000 | 0400 | 6D0F |
| 0001202140 | 7269 | 6F72 | 5F72 | 776C | 5F72 | 7962 | 6574 | 0407 |
| 0001202160 | 0006 | 0085 | 6901 | 0409 | FFFC | 0085 | 6403 | 7461 |
| 0001202200 | 0201 | 011D | B64C | 072E | 0056 | 0016 | 004A | 0000 |
| 0001202220 | 0E04 | 7367 | 5F70 | 6C63 | 6165 | 5F6E | 616D | 6B73 |
| 0001202240 | 040C | FFFC | 0081 | 7306 | 6174 | 7574 | 0E73 | FA04 |
| 0001202260 | 85FF | 0800 | 6162 | 6B6E | 6E5F | 6D75 | 0201 | 011C |
| 0001202300 | B6A2 | 0730 | 0101 | 0016 | 00F3 | 0000 | 0D04 | 7367 |
| 0001202320 | 5F70 | 6573 | 5F74 | 6170 | 6172 | 106D | 0A04 | 8500 |
| 0001202340 | 0A00 | 6170 | 6172 | 5F6D | 7974 | 6570 | 0409 | 0006 |
| 0001202360 | 0086 | 7603 | 6C61 | 040B | FFF6 | 06E3 | 7005 | 7261 |
| 0001202400 | 6D61 | 0409 | FFF4 | 0081 | 6503 | 7272 | 0201 | 011D |
| 0001202420 | B7A3 | 0731 | 0030 | 0016 | 0024 | 0000 | 0E04 | 7069 |
| 0001202440 | 5F73 | 6C63 | 736F | 5F65 | 6574 | 7473 | 0201 | 0122 |
| 0001202460 | B7D3 | 0732 | 0030 | 0016 | 0024 | 0000 | 1304 | 7069 |
| 0001202500 | 5F73 | 6C63 | 736F | 5F65 | 6964 | 6666 | 745F | 7365 |
| 0001202520 | 0174 | 1C02 | 0301 | 34B8 | 3707 | 1600 | 2900 | 0000 |
| 0001202540 | 0400 | 690D | 7370 | 6F5F | 6570 | 5F6E | 6574 | 7473 |
| 0001202560 | 040C | 0006 | 0086 | 7406 | 7473 | 695F | 0164 | 2102 |
| 0001202600 | 3A01 | 36B8 | F307 | 1600 | E500 | 0000 | 0400 | 6912 |
| 0001202620 | 7370 | 6F5F | 6570 | 5F6E | 6964 | 6666 | 745F | 7365 |
| 0001202640 | 0C74 | 0604 | 8600 | 0600 | 7374 | 5F74 | 6469 | 040F |
| 0001202660 | FFD6 | 0086 | 7009 | 7261 | 6E65 | 5F74 | 6469 | 040D |
| 0001202700 | FFDA | 022C | 6407 | 5F62 | 616E | 656D | 0413 | FED2 |
| 0001202720 | 00C0 | 700D | 7261 | 6E65 | 5F74 | 616E | 656D | 705F |
| 0001202740 | 0416 | FED6 | 05E4 | 7010 | 7261 | 6E65 | 5F74 | 6574 |
| 0001202760 | 7473 | 6E5F | 6D61 | 1465 | FA04 | 86FF | 0E00 | 6170 |
| 0001203000 | 6572 | 746E | 745F | 7365 | 5F74 | 6469 | 0409 | FED0 |
| 0001203020 | 0081 | 6903 | 6372 | 0201 | 0511 | 309C | 0008 | 0086 |
| 0001203040 | 6309 | 7672 | 695F | 7370 | 6D65 | 050F | 30A4 | 0008 |
| 0001203060 | 0086 | 6D07 | 5F62 | 6973 | 657A | 0D05 | 0000 | 001A |
| 0001203100 | 0510 | 0F06 | 0007 | 0683 | 6908 | 7370 | 645F | 7461 |
| 0001203120 | 1261 | 3C05 | 070F | 8600 | 0A06 | 7069 | 5F73 | 6977 |
| 0001203140 | 646E | 776F | 1105 | 0002 | 0000 | 0121 | 0000 | 0733 |
| 0001203160 | 1562 | 0016 | 1554 | 0000 | 1204 | 7263 | 5F76 | 6163 |
| 0001203200 | 7470 | 7275 | 5F65 | 6373 | 6572 | 6E65 | 040F | 0006 |
| 0001203220 | 06A6 | 6509 | 6576 | 746E | 705F | 7274 | 040F | FFCC |
| 0001203240 | 0085 | 6C09 | 7961 | 7265 | 6E5F | 6D75 | 0415 | FFF4 |
| 0001203260 | 00C5 | 770F | 6972 | 6974 | 676E | 665F | 676C | 705F |
| 0001203300 | 7274 | 0410 | FFB8 | 0085 | 690A | 5F73 | 7277 | 7469 |
| 0001203320 | 6E69 | 0C67 | F804 | C0FF | 0600 | 5F5F | 7974 | 6570 |
| 0001203340 | 040F | FFE0 | 0085 | 5F09 | 625F | 5F78 | 7974 | 6570 |
| 0001203360 | 040D | FFCE | 054C | 5F07 | 705F | 6972 | 746E | 040B |
| 0001203400 | FFC4 | 0706 | 5F05 | 6C5F | 6C76 | 040D | FFD2 | 0737 |
| 0001203420 | 5F07 | 635F | [illegible]6C | 6B63 | 040D | FFF0 | 00C0 | 5F07 |
| 0001203440 | 735F | 6174 | 6B63 | 040E | FFCA | 0081 | 5F08 | 725F |
| 0001203460 | 7465 | 6176 | 0C6C | E404 | 86FF | 0600 | 7374 | 5F74 |
| 0001203500 | 6469 | 040B | FFDE | 0081 | 6505 | 7272 | 726F | 0409 |
| 0001203520 | FFE2 | 0081 | 6503 | 7272 | 0410 | FFBA | 06B6 | 680A |
| 0001203540 | 736F | 5F74 | 6170 | 6172 | 0E6D | EC04 | 86FF | 0800 |
| 0001203560 | 6974 | 656D | 6F5F | 7475 | 040E | FFE8 | 0082 | 6908 |
| 0001203600 | 676D | 735F | 7A69 | 0C65 | FC04 | 85FF | 0600 | 616C |
| 0001203620 | 6579 | 7372 | 050E | 0EC4 | 0008 | 0735 | 5F06 | 665F |
| 0001203640 | 6E75 | 0163 | 1F02 | 6201 | 4015 | BF07 | 1602 | B100 |
| 0001203660 | 0002 | 0400 | 6310 | 7672 | 635F | 7061 | 7574 | 6572 |
| 0001203700 | 735F | 6E79 | 0F63 | 0604 | A600 | 0906 | 7665 | 6E65 |
| 0001203720 | 5F74 | 7470 | 0B72 | EE04 | 81FF | 0500 | 7265 | 6F72 |
| 0001203740 | 0E72 | E004 | 86FF | 0800 | 6D69 | 6761 | 5F65 | 6469 |

THU MAR 14 17:25:16 1991 CRV_IPS.DLL PAGE 297, LINE 17465

| | | | | | | | | |
|---|---|---|---|---|---|---|---|---|
| 0001203760 | 0409 | FFF0 | 0081 | 6503 | 7272 | 0410 | FFE4 | 06B6 |
| 0001204000 | 680A | 736F | 5F74 | 6170 | 6172 | 0D6D | F204 | BAFF |
| 0001204020 | 0706 | 5F68 | 6170 | 6172 | 0E6D | FA04 | 86FF | 0800 |
| 0001204040 | 6974 | 656D | 6F5F | 7475 | 0201 | 0127 | 1821 | 0742 |
| 0001204060 | 07B1 | 0016 | 07A3 | 0000 | 1804 | 7263 | 5F76 | 6163 |
| 0001204100 | 7470 | 7275 | 5F65 | 6F6C | 6163 | 6F74 | 5F72 | 7973 |
| 0001204120 | 636E | 040F | 0006 | 06A6 | 6509 | 6576 | 746E | 705F |
| 0001204140 | 7274 | 040C | FFFA | 00C0 | 5F06 | 745F | 7079 | 0F65 |
| 0001204160 | C804 | 85FF | 0900 | 5F5F | 7862 | 745F | 7079 | 0D65 |
| 0001204200 | B604 | 4CFF | 0705 | 5F5F | 7270 | 6E69 | 0B74 | AE04 |
| 0001204220 | 06FF | 0507 | 5F5F | 766C | 0D6C | BA04 | 37FF | 0707 |
| 0001204240 | 5F5F | 6C63 | 636F | 0D6B | F604 | C0FF | 0700 | 5F5F |
| 0001204260 | 7473 | 6361 | 0E6B | B404 | 81FF | 0800 | 5F5F | 6572 |
| 0001204300 | 7674 | 6C61 | 040B | FFC6 | 0081 | 6505 | 7272 | 726F |
| 0001204320 | 040E | FF9E | 0086 | 6908 | 616D | 6567 | 695F | 0964 |
| 0001204340 | CA04 | 81FF | 0300 | 7265 | 1072 | A204 | B6FF | 0A06 |
| 0001204360 | 6F68 | 7473 | 705F | 7261 | 6D61 | 0410 | FFCC | 06CE |
| 0001204400 | 6C0A | 636F | 6973 | 5F67 | 6164 | 0E74 | F204 | 86FF |
| 0001204420 | 0800 | 6974 | 656D | 6F5F | 7475 | 040E | FFAC | 0085 |
| 0001204440 | 6808 | 5F77 | 6977 | 7464 | 0E68 | 6005 | 080F | 4300 |
| 0001204460 | 0607 | 5F5F | 7566 | 636E | 0201 | 011E | 1FD2 | 0745 |
| 0001204500 | 0949 | 0016 | 093B | 0000 | 0F04 | 7263 | 5F76 | 6163 |
| 0001204520 | 7470 | 7275 | 5F65 | 6973 | 0F67 | 0604 | A600 | 0906 |
| 0001204540 | 7665 | 6E65 | 5F74 | 7470 | 0D72 | C804 | 37FF | 0707 |
| 0001204560 | 5F5F | 6C63 | 636F | 0D6B | E604 | C0FF | 0700 | 5F5F |
| 0001204600 | 7473 | 6361 | 0E6B | C204 | 81FF | 0800 | 5F5F | 6572 |
| 0001204620 | 7674 | 6C61 | 040F | FFDA | 0474 | 6909 | 616D | 6567 |
| 0001204640 | 705F | 7274 | 040B | FFD4 | 0081 | 6505 | 7272 | 726F |
| 0001204660 | 040C | FFDE | 0086 | 7406 | 7473 | 695F | 0E64 | AC04 |
| 0001204700 | 86FF | 0800 | 6D69 | 6761 | 5F65 | 6469 | 0409 | FFD8 |
| 0001204720 | 0081 | 6503 | 7272 | 0410 | FFB0 | 06B6 | 680A | 736F |
| 0001204740 | 5F74 | 6170 | 6172 | 126D | EE04 | BDFF | 0C06 | 6373 |
| 0001204760 | 6572 | 6E65 | 705F | 7261 | 6D61 | 040E | FFE2 | 0086 |
| 0001205000 | 7408 | 6D69 | 5F65 | 756F | 0E74 | BA04 | 85FF | 0800 |
| 0001205020 | 7768 | 775F | 6469 | 6874 | 040C | FFEA | 00C0 | 5F06 |
| 0001205040 | 745F | 7079 | 0F65 | D604 | 85FF | 0900 | 5F5F | 7862 |
| 0001205060 | 745F | 7079 | 0D65 | C404 | 4CFF | 0705 | 5F5F | 7270 |
| 0001205100 | 6E69 | 0B74 | BC04 | 06FF | 0507 | 5F5F | 766C | 0E6C |
| 0001205120 | 0805 | 0810 | 4600 | 0607 | 5F5F | 7566 | 636E | 0201 |
| 0001205140 | 0128 | 291B | 0749 | 0054 | 0016 | 0046 | 0000 | 1904 |
| 0001205160 | 7263 | 5F76 | 6974 | 656D | 665F | 6F72 | 5F6D | 616C |
| 0001205200 | 7473 | 635F | 6168 | 676E | 1165 | 0604 | C200 | 0B00 |
| 0001205220 | 7473 | 6261 | 656C | 745F | 6D69 | 0965 | FC04 | 81FF |
| 0001205240 | 0300 | 7265 | 0172 | 1F02 | 6F01 | 4B29 | 8907 | 1600 |
| 0001205260 | 7B00 | 0000 | 0400 | 6310 | 7672 | 765F | 7265 | 6669 |
| 0001205300 | 5F79 | 6D69 | 6761 | 0F65 | 0A04 | A600 | 0906 | 7665 |
| 0001205320 | 6E65 | 5F74 | 7470 | 1272 | 0604 | 8600 | 0C00 | 6F74 |
| 0001205340 | 5F74 | 6964 | 5F66 | 6974 | 656D | 0409 | FFFC | 0081 |
| 0001205360 | 6503 | 7272 | 0201 | 011C | 29F8 | 074D | 0495 | 0010 |
| 0001205400 | 048A | 0000 | 0D04 | 706F | 6E65 | 645F | 6669 | 5F66 |
| 0001205420 | 6D69 | 0E67 | 0604 | 8100 | 0800 | 6D69 | 5F67 | 7974 |
| 0001205440 | 6570 | 040C | FFFC | 0085 | 6C06 | 7961 | 7265 | 0C73 |
| 0001205460 | F804 | C0FF | 0600 | 5F5F | 7974 | 6570 | 040F | FFEE |
| 0001205500 | 0085 | 5F09 | 625F | 5F78 | 7974 | 6570 | 040D | FFDC |
| 0001205520 | 054C | 5F07 | 705F | 6972 | 746E | 040B | FFD4 | 0706 |
| 0001205540 | 5F05 | 6C5F | 6C76 | 040D | FFE0 | 0737 | 5F07 | 635F |
| 0001205560 | 6F6C | 6B63 | 040D | FFF4 | 00C0 | 5F07 | 735F | 6174 |
| 0001205600 | 6B63 | 040E | FFDA | 0081 | 5F08 | 725F | 7465 | 6176 |
| 0001205620 | 0B6C | EC04 | 81FF | 0500 | 7265 | 6F72 | 0E72 | F004 |

THU MAR 14 17:25:16 1991 CRV_IPS.DLL PAGE 298, LINE 17524

| | | | | | | | | |
|---|---|---|---|---|---|---|---|---|
| 0001205640 | 82FF | 0800 | 6D69 | 5F67 | 6973 | 65¯A | 050E | 106A |
| 0001205660 | 0008 | 074F | 5F06 | 665F | 6E75 | 0163 | 2502 | 8D01 |
| 0001205700 | 512E | A807 | 1004 | 9D00 | 0004 | 0400 | 7716 | 6972 |
| 0001205720 | 6574 | 6E5F | 7865 | 5F74 | 616C | 6579 | 5F72 | 6F74 |
| 0001205740 | 675F | 1070 | 0604 | 8200 | 0A00 | 616C | 6579 | 5F72 |
| 0001205760 | 6973 | 657A | 040F | 000A | 0085 | 6C09 | 7961 | 7265 |
| 0001206000 | 6E5F | 6D75 | 040E | 000C | 0086 | 6208 | 6E61 | 5F6B |
| 0001206020 | 7470 | 0C72 | FA04 | C0FF | 0600 | 5F5F | 7974 | 6570 |
| 0001206040 | 040F | FFF2 | 0085 | 5F09 | 625F | 5F78 | 7974 | 6570 |
| 0001206060 | 040D | FFE0 | 054C | 5F07 | 705F | 6972 | 746E | 040B |
| 0001206100 | FFD8 | 0706 | 5F05 | 6C5F | 6C76 | 040D | FFE4 | 0737 |
| 0001206120 | 5F07 | 635F | 6F6C | 6B63 | 040D | FFF6 | 00C0 | 5F07 |
| 0001206140 | 735F | 6174 | 6B63 | 040E | FFDE | 0081 | 5F08 | 725F |
| 0001206160 | 7465 | 6176 | 096C | F404 | 81FF | 0300 | 7265 | 0B72 |
| 0001206200 | F004 | 81FF | 0500 | 7265 | 6F72 | 0E72 | C205 | 0810 |
| 0001206220 | 5300 | 0607 | 5F5F | 7566 | 636E | 0201 | 011D | 3335 |
| 0001206240 | 0755 | 0509 | 0010 | 04FE | 0000 | 0E04 | 7473 | 726F |
| 0001206260 | 5F65 | 6964 | 6666 | 695F | 676D | 0410 | 0006 | 0082 |
| 0001206300 | 6C0A | 7961 | 7265 | 735F | 7A69 | 0F65 | 0A04 | 8500 |
| 0001206320 | 0900 | 616C | 6579 | 5F72 | 756E | 0E6D | 0C04 | 8600 |
| 0001206340 | 0800 | 6964 | 6666 | 705F | 7274 | 040C | FFFA | 00C0 |
| 0001206360 | 5F06 | 745F | 7079 | 0F65 | F204 | 85FF | 0900 | 5F5F |
| 0001206400 | 7862 | 745F | 7079 | 0D65 | E004 | 4CFF | 0705 | 5F5F |
| 0001206420 | 7270 | 6E69 | 0B74 | D804 | 06FF | 0507 | 5F5F | 766C |
| 0001206440 | 0D6C | E404 | 37FF | 0707 | 5F5F | 6C63 | 636F | 0D6B |
| 0001206460 | F604 | C0FF | 0700 | 5F5F | 7473 | 6361 | 0E6B | DE04 |
| 0001206500 | 81FF | 0800 | 5F5F | 6572 | 7674 | 6C61 | 040B | FFF0 |
| 0001206520 | 0081 | 6505 | 7272 | 726F | 0409 | FFF4 | 0081 | 6503 |
| 0001206540 | 7272 | 050E | 1170 | 0008 | 0757 | 5F06 | 665F | 6E75 |
| 0001206560 | 0163 | 1D02 | 3E01 | 5938 | C407 | 1003 | B900 | 0003 |
| 0001206600 | 0400 | 730E | 6F74 | 6572 | 645F | 6669 | 5F66 | 6973 |
| 0001206620 | 0E67 | 0604 | 8600 | 0800 | 6964 | 6666 | 705F | 7274 |
| 0001206640 | 040C | FFF6 | 00C0 | 5F06 | 745F | 7079 | 0F65 | EE04 |
| 0001206660 | 85FF | 0900 | 5F5F | 7862 | 745F | 7079 | 0D65 | DC04 |
| 0001206700 | 4CFF | 0705 | 5F5F | 7270 | 6E69 | 0B74 | D404 | 06FF |
| 0001206720 | 0507 | 5F5F | 766C | 0D6C | E004 | 37FF | 0707 | 5F5F |
| 0001206740 | 6C63 | 636F | 0D6B | F204 | C0FF | 0700 | 5F5F | 7473 |
| 0001206760 | 6361 | 0E6B | DA04 | 81FF | 0800 | 5F5F | 6572 | 7674 |
| 0001207000 | 6C61 | 040B | FFEC | 0081 | 6505 | 7272 | 726F | 0409 |
| 0001207020 | FFF0 | 0081 | 6503 | 7272 | 0412 | FFFA | 075A | 640C |
| 0001207040 | 6669 | 5F66 | 6973 | 5F67 | 7470 | 0E72 | CA05 | 0811 |
| 0001207060 | 5700 | 0607 | 5F5F | 7566 | 636E | 0201 | 0120 | 3C02 |
| 0001207100 | 075C | 19DF | 0010 | 19D4 | 0000 | 1104 | 7263 | 5F76 |
| 0001207120 | 6576 | 6972 | 7966 | 735F | 7263 | 6565 | 0F6E | 0604 |
| 0001207140 | A600 | 0906 | 7665 | 6E65 | 5F74 | 7470 | 1272 | 0A04 |
| 0001207160 | 8600 | 0C00 | 6F74 | 5F74 | 6964 | 5F66 | 6974 | 656D |
| 0001207200 | 040C | FFF8 | 00C0 | 5F06 | 745F | 7079 | 0F65 | DE04 |
| 0001207220 | 85FF | 0900 | 5F5F | 7862 | 745F | 7079 | 0D65 | C204 |
| 0001207240 | 4CFF | 0705 | 5F5F | 7270 | 6E69 | 0B74 | B804 | 06FF |
| 0001207260 | 0507 | 5F5F | 766C | 0D6C | D004 | 37FF | 0707 | 5F5F |
| 0001207300 | 6C63 | 636F | 0D6B | F004 | C0FF | 0700 | 5F5F | 7473 |
| 0001207320 | 6361 | 0E6B | BE04 | 81FF | 0800 | 5F5F | 6572 | 7674 |
| 0001207340 | 6C61 | 040C | FFE2 | 0086 | 7406 | 7473 | 695F | 1164 |
| 0001207360 | B204 | 86FF | 0B00 | 6964 | 6666 | 745F | 7473 | 695F |
| 0001207400 | 0B64 | DC04 | 81FF | 0500 | 7265 | 6F72 | 0972 | E004 |
| 0001207420 | 81FF | 0300 | 7265 | 1072 | C604 | D6FF | 0A06 | 6576 |
| 0001207440 | 6972 | 7966 | 6D5F | 6773 | 040E | FFEA | 0086 | 7408 |
| 0001207460 | 6D69 | 5F65 | 756F | 0C74 | FC04 | 85FF | 0600 | 616C |
| 0001207500 | 6579 | 7372 | 040F | FFC0 | 0085 | 6C09 | 7961 | 7265 |

THU MAR 14 17:25:16 1991 CRV_IPS.DLL PAGE 299, LINE 17583

| | | | | | | | | |
|---|---|---|---|---|---|---|---|---|
| 0001207520 | 6E5F | 6D75 | 0410 | FFE6 | 0082 | 6C0A | 7961 | 7265 |
| 0001207540 | 735F | 7A69 | 1565 | F404 | C5FF | 0F00 | 7277 | 7469 |
| 0001207560 | 6E69 | 5F67 | 6C66 | 5F67 | 7470 | 1072 | B604 | 85FF |
| 0001207600 | 0A00 | 7369 | 775F | 6972 | 6974 | 676E | 0412 | FFEE |
| 0001207620 | 0085 | 640C | 6669 | 5F66 | 7277 | 7469 | 6574 | 0E6E |
| 0001207640 | F805 | 0813 | 5D00 | 0607 | 5F5F | 7566 | 636E | 0201 |
| 0001207660 | 0123 | 55E1 | 0762 | 1497 | 0010 | 148C | 0000 | 1404 |
| 0001207700 | 7263 | 5F76 | 6576 | 6972 | 7966 | 735F | 6769 | 616E |
| 0001207720 | 7574 | 6572 | 040F | 0006 | 06A6 | 6509 | 6576 | 746E |
| 0001207740 | 705F | 7274 | 0412 | 000A | 0086 | 740C | 746F | 645F |
| 0001207760 | 6669 | 745F | 6D69 | 0C65 | F804 | C0FF | 0600 | 5F5F |
| 0001210000 | 7974 | 6570 | 040F | FFDA | 0085 | 5F09 | 625F | 5F78 |
| 0001210020 | 7974 | 6570 | 040D | FFBE | 054C | 5F07 | 705F | 6972 |
| 0001210040 | 746E | 040B | FFB6 | 0706 | 5F05 | 6C5F | 6C76 | 040D |
| 0001210060 | FFCC | 0737 | 5F07 | 635F | 6F6C | 6B63 | 040D | FFF0 |
| 0001210100 | 00C0 | 5F07 | 735F | 6174 | 6B63 | 040E | FFBC | 0081 |
| 0001210120 | 5F08 | 725F | 7465 | 6176 | 0B6C | D804 | 81FF | 0500 |
| 0001210140 | 7265 | 6F72 | 0C72 | E204 | 86FF | 0600 | 7374 | 5F74 |
| 0001210160 | 6469 | 0411 | FFAE | 0086 | 640B | 6669 | 5F66 | 7374 |
| 0001210200 | 5F74 | 6469 | 0409 | FFDC | 0081 | 6503 | 7272 | 040D |
| 0001210220 | FFDE | 075A | 7307 | 6769 | 705F | 7274 | 0410 | FFC2 |
| 0001210240 | 06D6 | 760A | 7265 | 6669 | 5F79 | 736D | 0E67 | EA04 |
| 0001210260 | 86FF | 0800 | 6974 | 656D | 6F5F | 7475 | 040C | FFFC |
| 0001210300 | 0085 | 6C06 | 7961 | 7265 | 1073 | E604 | 82FF | 0A00 |
| 0001210320 | 616C | 6579 | 5F72 | 6973 | 657A | 0415 | FFF4 | 00C5 |
| 0001210340 | 770F | 6972 | 6974 | 676E | 665F | 676C | 705F | 7274 |
| 0001210360 | 0410 | FFB2 | 0085 | 690A | 5F73 | 7277 | 7469 | 6E69 |
| 0001210400 | 1267 | EE04 | 85FF | 0C00 | 6964 | 6666 | 775F | 6972 |
| 0001210420 | 7474 | 6E65 | 040E | FFB4 | 0085 | 6808 | 5F77 | 6977 |
| 0001210440 | 7464 | 0E68 | B205 | 0815 | 6300 | 0607 | 5F5F | 7566 |
| 0001210460 | 636E | 0513 | 15C8 | 0008 | 0086 | 730B | 6769 | 625F |
| 0001210500 | 6675 | 705F | 7274 | 0201 | 011E | 6A78 | 0766 | 008B |
| 0001210520 | 0016 | 007D | 0000 | 0F04 | 7263 | 5F76 | 6576 | 6972 |
| 0001210540 | 7966 | 735F | 6E79 | 0F63 | 0A04 | A600 | 0906 | 7665 |
| 0001210560 | 6E65 | 5F74 | 7470 | 1272 | 0604 | 8600 | 0C00 | 6F74 |
| 0001210600 | 5F74 | 6964 | 5F66 | 6974 | 656D | 0409 | FFFC | 0081 |
| 0001210620 | 6503 | 7272 | 0201 | 011A | 6B03 | 0768 | 0FC0 | 0010 |
| 0001210640 | 0FB5 | 0000 | 0B04 | 6576 | 6972 | 7966 | 735F | 6E79 |
| 0001210660 | 0F63 | 0604 | A600 | 0906 | 7665 | 6E65 | 5F74 | 7470 |
| 0001210700 | 1272 | 0A04 | 8600 | 0C00 | 6F74 | 5F74 | 6964 | 5F66 |
| 0001210720 | 6974 | 656D | 040C | FFFA | 00C0 | 5F06 | 745F | 7079 |
| 0001210740 | 0F65 | E204 | 85FF | 0900 | 5F5F | 7862 | 745F | 7079 |
| 0001210760 | 0D65 | C604 | 4CFF | 0705 | 5F5F | 7270 | 6E69 | 0B74 |
| 0001211000 | BE04 | 06FF | 0507 | 5F5F | 766C | 0D6C | D404 | 37FF |
| 0001211020 | 0707 | 5F5F | 6C63 | 636F | 0D6B | F204 | C0FF | 0700 |
| 0001211040 | 5F5F | 7473 | 6361 | 0E6B | C404 | 81FF | 0800 | 5F5F |
| 0001211060 | 6572 | 7674 | 6C61 | 040F | FFE6 | 0474 | 6909 | 616D |
| 0001211100 | 6567 | 705F | 7274 | 040B | FFE0 | 0081 | 6505 | 7272 |
| 0001211120 | 726F | 040C | FFEA | 0086 | 7406 | 7473 | 695F | 1164 |
| 0001211140 | F604 | 86FF | 0B00 | 7973 | 636E | 745F | 7473 | 695F |
| 0001211160 | 0E64 | BA04 | 86FF | 0800 | 6D69 | 6761 | 5F65 | 6469 |
| 0001211200 | 0409 | FFE4 | 0081 | 6503 | 7272 | 0410 | FFCA | 06D6 |
| 0001211220 | 760A | 7265 | 6669 | 5F79 | 736D | 0E67 | EE04 | 86FF |
| 0001211240 | 0800 | 6974 | 656D | 6F5F | 7475 | 050E | 170A | 0008 |
| 0001211260 | 028D | 5F06 | 665F | 6E75 | 1563 | 1605 | 0817 | 8600 |
| 0001211300 | 0D00 | 7473 | 6972 | 5F70 | 7562 | 5F66 | 7470 | 0172 |
| 0001211320 | 2202 | C301 | 6D7A | 1607 | 1010 | 0B00 | 0010 | 0400 |
| 0001211340 | 7613 | 7265 | 6669 | 5F79 | 6F6C | 6163 | 6F74 | 5F72 |
| 0001211360 | 7973 | 636E | 040F | 0006 | 06A6 | 6509 | 6576 | 746E |

THU MAR 14 17:25:16 1991 CRV_IPS.DLL PAGE 300, LINE 17642

| | | | | | | | | |
|---|---|---|---|---|---|---|---|---|
| 0001211400 | 705F | 7274 | 0412 | 000A | 0086 | 740C | 746F | 645F |
| 0001211420 | 6669 | 745F | 6D69 | 0C65 | FA04 | C0FF | 0600 | 5F5F |
| 0001211440 | 7974 | 6570 | 040F | FFE2 | 0085 | 5F09 | 625F | 5F78 |
| 0001211460 | 7974 | 6570 | 040D | FFC6 | 054C | 5F07 | 705F | 6972 |
| 0001211500 | 746E | 040B | FFBE | 0706 | 5F05 | 6C5F | 6C76 | 040D |
| 0001211520 | FFD4 | 0737 | 5F07 | 635F | 6F6C | 6B63 | 040D | FFF2 |
| 0001211540 | 00C0 | 5F07 | 735F | 6174 | 6B63 | 040E | FFC4 | 0081 |
| 0001211560 | 5F08 | 725F | 7465 | 6176 | 0F6C | E604 | 74FF | 0904 |
| 0001211600 | 6D69 | 6761 | 5F65 | 7470 | 0B72 | E004 | 81FF | 0500 |
| 0001211620 | 7265 | 6F72 | 0C72 | EA04 | 86FF | 0600 | 7374 | 5F74 |
| 0001211640 | 6469 | 0411 | FFF6 | 0086 | 730B | 6E79 | 5F63 | 7374 |
| 0001211660 | 5F74 | 6469 | 040E | FFBA | 0086 | 6908 | 616D | 6567 |
| 0001211700 | 695F | 0964 | E404 | 81FF | 0300 | 7265 | 1072 | CA04 |
| 0001211720 | D6FF | 0A06 | 6576 | 6972 | 7966 | 6D5F | 6773 | 040E |
| 0001211740 | FFEE | 0086 | 7408 | 6D69 | 5F65 | 756F | 0E74 | 5405 |
| 0001211760 | 0818 | 6E00 | 0607 | 5F5F | 7566 | 636E | 0517 | 1868 |
| 0001212000 | 0008 | 0086 | 6C0F | 636F | 735F | 6769 | 625F | 6675 |
| 0001212020 | 705F | 7274 | 0201 | 0125 | 8AD9 | 076F | 0143 | 0016 |
| 0001212040 | 0137 | 0000 | 1604 | 7263 | 5F76 | 6863 | 6365 | 5F6B |
| 0001212060 | 7768 | 735F | 6174 | 6962 | 696C | 7974 | 0409 | FFEC |
| 0001212100 | 0081 | 6503 | 7272 | 0409 | FFEE | 0770 | 6D03 | 6773 |
| 0001212120 | 0415 | FFFA | 00C5 | 770F | 6972 | 6974 | 676E | 665F |
| 0001212140 | 676C | 705F | 7274 | 0410 | FFEA | 0085 | 690A | 5F73 |
| 0001212160 | 7277 | 7469 | 6E69 | 0C67 | F604 | 73FF | 0607 | 6170 |
| 0001212200 | 6172 | 736D | 0201 | 0511 | 309C | 0008 | 0086 | 6309 |
| 0001212220 | 7672 | 695F | 7370 | 6D65 | 050F | 30A4 | 0008 | 0086 |
| 0001212240 | 6D07 | 5F62 | 6973 | 657A | 050F | 0EA0 | 0008 | 00C0 |
| 0001212260 | 4207 | 785F | 6946 | 656C | 050F | 0EA4 | 0008 | 00C0 |
| 0001212300 | 4207 | 785F | 6150 | 6B63 | 0D05 | 0000 | 001A | 050B |
| 0001212320 | 46F6 | 0008 | 0466 | 6803 | 7264 | 050F | 0EA8 | 0008 |
| 0001212340 | 0474 | 6807 | 7264 | 705F | 7274 | 0511 | 3EE2 | 0008 |
| 0001212360 | 00E4 | 6C09 | 7961 | 7265 | 705F | 7274 | 0511 | 3EE0 |
| 0001212400 | 0008 | 0085 | 6909 | 616D | 6567 | 685F | 6C64 | 0510 |
| 0001212420 | 3618 | 0008 | 0466 | 6408 | 6669 | 5F66 | 6468 | 1072 |
| 0001212440 | 0605 | 070F | 7200 | 0806 | 7069 | 5F73 | 6164 | 6174 |
| 0001212460 | 0514 | 0EAC | 0008 | 0474 | 640C | 6669 | 5F66 | 6468 |
| 0001212500 | 5F72 | 7470 | 1272 | 3C05 | 070F | 7500 | 0A06 | 7069 |
| 0001212520 | 5F73 | 6977 | 646E | 776F | 0516 | 3614 | 0008 | 00E4 |
| 0001212540 | 640E | 6669 | 5F66 | 616C | 6579 | 5F72 | 7470 | 1672 |
| 0001212560 | 0E05 | 0836 | 8500 | 0E00 | 6964 | 6666 | 695F | 616D |
| 0001212600 | 6567 | 685F | 6C64 | 0510 | 36CC | 0008 | 06C7 | 7308 |
| 0001212620 | 6769 | 645F | 7461 | 1561 | E605 | 083E | C700 | 0D06 |
| 0001212640 | 6964 | 6666 | 735F | 6769 | 645F | 7461 | 1061 | B005 |
| 0001212660 | 080E | 7400 | 0804 | 7973 | 636E | 705F | 7274 | 0514 |
| 0001212700 | 0EB4 | 0008 | 0474 | 6C0C | 636F | 735F | 6E79 | 5F63 |
| 0001212720 | 7470 | 0D72 | DC05 | 083E | 8600 | 0500 | 6974 | 656D |
| 0001212740 | 1472 | 0005 | 0000 | 8100 | 0C00 | 7842 | 445F | 6265 |
| 0001212760 | 6775 | 6F4D | 6564 | 0510 | 0EB8 | 0008 | 00C0 | 6308 |
| 0001213000 | 6D6F | 5F6D | 7265 | 1472 | 0005 | 0000 | 8100 | 0C00 |
| 0001213020 | 7842 | 545F | 6D69 | 7365 | 6F4D | 6564 | 0510 | 0000 |
| 0001213040 | 0000 | 0081 | 4208 | 5F78 | 5F42 | 6973 | 0E67 | BC05 |
| 0001213060 | 080E | C000 | 0600 | 6472 | 655F | 7272 | 050E | 0EC0 |
| 0001213100 | 0008 | 00C0 | 7706 | 5F72 | 7265 | 1272 | 1005 | 0836 |
| 0001213120 | 8600 | 0A00 | 7067 | 745F | 6D69 | 6F65 | 7475 | 1105 |
| 0001213140 | 0002 | 0000 | 0127 | 8C1C | 0744 | 02D0 | 0016 | 02C2 |
| 0001213160 | 0000 | 1804 | 7263 | 5F76 | 656C | 7261 | 5F6E | 6373 |
| 0001213200 | 6C61 | 5F65 | 7566 | 636E | 6974 | 6E6F | 040F | 0006 |
| 0001213220 | 06FA | 6509 | 6576 | 746E | 705F | 7274 | 040C | FFFA |
| 0001213240 | 00C0 | 5F06 | 745F | 7079 | 0F65 | F404 | 85FF | 0900 |

THU MAR 14 17:25:16 1991 CRV_IPS.DLL PAGE 301, LINE 177n!

| | | | | | | | | |
|---|---|---|---|---|---|---|---|---|
| 0001213260 | 5F5F | 7862 | 745F | 7079 | 0D65 | E404 | 65FF | 0704 |
| 0001213300 | 5F5F | 7270 | 6E69 | 0B74 | DC04 | 1BFF | 0507 | 5F5F |
| 0001213320 | 766C | 0D6C | E804 | 49FF | 0707 | 5F5F | 6C63 | 636F |
| 0001213340 | 0D6B | F604 | C0FF | 0700 | 5F5F | 7473 | 6361 | 0E6B |
| 0001213360 | E204 | 81FF | 0800 | 5F5F | 6572 | 7674 | 6C61 | 0409 |
| 0001213400 | FFD4 | 04E7 | 7703 | 6E69 | 050E | 18F0 | 0008 | 0747 |
| 0001213420 | 5F06 | 665F | 6E75 | 0163 | 2202 | EC01 | 4A8E | D607 |
| 0001213440 | 1604 | CA00 | 0004 | 0400 | 6313 | 7672 | 725F | 6165 |
| 0001213460 | 5F64 | 6373 | 6C61 | 5F65 | 7566 | 636E | 040C | FEF8 |
| 0001213500 | 00C0 | 5F06 | 745F | 7079 | 0F65 | E804 | 85FC | 0900 |
| 0001213520 | 5F5F | 7862 | 745F | 7079 | 0D65 | D804 | 65FC | 0704 |
| 0001213540 | 5F5F | 727C | 6E69 | 0B74 | D004 | 1BFC | 0507 | 5F5F |
| 0001213560 | 766C | 0D6C | DC04 | 49FC | 0707 | 5F5F | 6C63 | 636F |
| 0001213600 | 0D6B | F204 | C0FE | 0700 | 5F5F | 7473 | 6361 | 0E6B |
| 0001213620 | D604 | 81FC | 0800 | 5F5F | 6572 | 7674 | 6C61 | 0410 |
| 0001213640 | FDEE | 0086 | 630A | 6766 | 6F5F | 6A62 | 695F | 0E64 |
| 0001213660 | F204 | ACFD | 0805 | 7265 | 5F72 | 6170 | 6874 | 040E |
| 0001213700 | FEFC | 0085 | 6508 | 7272 | 6C5F | 6E69 | 0C65 | F604 |
| 0001213720 | 81FE | 0600 | 7473 | 7461 | 7375 | 040F | FEFE | 05AC |
| 0001213740 | 6609 | 6C69 | 5F65 | 616E | 656D | 040B | FCEE | 05AC |
| 0001213760 | 6605 | 616E | 656D | 040D | FCEA | 00C0 | 7007 | 7261 |
| 0001214000 | 705F | 7274 | 050E | 1966 | 0008 | 074C | 5F06 | 665F |
| 0001214020 | 6E75 | 0163 | 2302 | C201 | 5093 | 2307 | 1005 | 1800 |
| 0001214040 | 0005 | 0400 | 6314 | 7672 | 775F | 6972 | 6574 | 735F |
| 0001214060 | 6163 | 656C | 665F | 6E75 | 0C63 | F804 | C0FE | 0600 |
| 0001214100 | 5F5F | 7974 | 6570 | 040F | FCE8 | 0085 | 5F09 | 625F |
| 0001214120 | 5F78 | 7974 | 6570 | 040D | FCD8 | 0465 | 5F07 | 705F |
| 0001214140 | 6972 | 746E | 040B | FCD0 | 071B | 5F05 | 6C5F | 6C76 |
| 0001214160 | 040D | FCDC | 0749 | 5F07 | 635F | 6F6C | 6B63 | 040D |
| 0001214200 | FEF2 | 00C0 | 5F07 | 735F | 6174 | 6B63 | 040E | FCD6 |
| 0001214220 | 0081 | 5F08 | 725F | 7465 | 6176 | 0C6C | F604 | 81FE |
| 0001214240 | 0600 | 7473 | 7461 | 7375 | 040F | FEFC | 05AC | 6609 |
| 0001214260 | 6C69 | 5F65 | 616E | 656D | 040B | FCEE | 05AC | 6605 |
| 0001214300 | 616E | 656D | 040D | FC4E | 0753 | 6307 | 6D6F | 616D |
| 0001214320 | 646E | 0410 | FDEE | 0086 | 630A | 6766 | 6F5F | 6A62 |
| 0001214340 | 695F | 0E64 | F204 | ACFD | 0805 | 7265 | 5F72 | 6170 |
| 0001214360 | 6874 | 040E | FFFC | 0085 | 6508 | 7272 | 6C5F | 6E69 |
| 0001214400 | 0D65 | EA04 | C0FC | 0700 | 6170 | 5F72 | 7470 | 0E72 |
| 0001214420 | C805 | 0819 | 5200 | 0607 | 5F5F | 7566 | 636E | 0201 |
| 0001214440 | 011F | 98E5 | 0757 | 0070 | 0016 | 0062 | 0000 | 1004 |
| 0001214460 | 7263 | 5F76 | 6F6D | 6576 | 6C5F | 63fF | 7461 | 726F |
| 0001214500 | 040F | 0006 | 06FA | 6509 | 6576 | 746E | 705F | 7274 |
| 0001214520 | 0201 | 0127 | 9955 | 0759 | 0085 | 0016 | 0077 | 0000 |
| 0001214540 | 1804 | 7263 | 5F76 | 6567 | 5F74 | 6F6C | 6163 | 6F74 |
| 0001214560 | 5F72 | 6F70 | 6973 | 6974 | 6E6F | 040F | 0006 | 06FA |
| 0001214600 | 6509 | 6576 | 746E | 705F | 7274 | 0201 | 0125 | 99DA |
| 0001214620 | 075B | 0070 | 0016 | 0062 | 0000 | 1604 | 7263 | 5F76 |
| 0001214640 | 6E69 | 7469 | 6C5F | 636F | 7461 | 726F | 745F | 6172 |
| 0001214660 | 6B63 | 040F | 0006 | 06FA | 6509 | 6576 | 746E | 705F |
| 0001214700 | 7274 | 0201 | 0124 | 9A4A | 075D | 0070 | 0016 | 0062 |
| 0001214720 | 0000 | 1504 | 7263 | 5F76 | 6E65 | 5F64 | 6F6C | 6163 |
| 0001214740 | 6F74 | 5F72 | 7274 | 6361 | 0F6B | 0604 | FA00 | 0906 |
| 0001214760 | 7665 | 6E65 | 5F74 | 7470 | 0172 | 2502 | BA01 | 5E9A |
| 0001215000 | 3107 | 1600 | 2500 | 0000 | 0400 | 6316 | 7672 | 6C5F |
| 0001215020 | 636F | 7461 | 6F69 | 5F6E | 6F6E | 5F74 | 6176 | 696C |
| 0001215040 | 0164 | 2702 | EB01 | 609A | 2407 | 1600 | 1600 | 0000 |
| 0001215060 | 0400 | 6318 | 7672 | 735F | 7465 | 6D5F | 756F | 6573 |
| 0001215100 | 745F | 6172 | 6B63 | 6D5F | 646F | 0965 | 0604 | 8500 |
| 0001215120 | 0300 | 6C66 | 0167 | 2002 | 0F01 | 629B | 2907 | 1000 |

THU MAR 14 17:25:16 1991 CRV_IPS.DLL PAGE 302, LINE 17760

| | | | | | | | | |
|---|---|---|---|---|---|---|---|---|
| 0001215140 | 1E00 | 0000 | 0400 | 6311 | 7672 | 705F | 7361 | 6973 |
| 0001215160 | 6576 | 6C5F | 6165 | 6E72 | 040A | 0006 | 0085 | 7404 |
| 0001215200 | 7079 | 0165 | 0F02 | E805 | 0818 | C000 | 0700 | 5F42 |
| 0001215220 | 4678 | 6C69 | 0F65 | EC05 | 0818 | C000 | 0700 | 5F42 |
| 0001215240 | 5078 | 6361 | 056B | 000D | 1A00 | 1400 | 0005 | 0000 |
| 0001215260 | 8100 | 0C00 | 7842 | 445F | 6265 | 6775 | 6F4D | 6564 |
| 0001215300 | 0514 | 0000 | 0000 | 0081 | 420C | 5F78 | 6954 | 656D |
| 0001215320 | 4D73 | 646F | 1065 | 0005 | 0000 | 8100 | 0800 | 7842 |
| 0001215340 | 425F | 735F | 6769 | 051D | 277E | 0008 | 0085 | 7315 |
| 0001215360 | 6163 | 656C | 6E5F | 746F | 695F | 696E | 6974 | 6C61 |
| 0001215400 | 7A69 | 6465 | 0510 | 0F06 | 0007 | 064D | 6908 | 7370 |
| 0001215420 | 645F | 7461 | 1261 | 3C05 | 070F | 5000 | 0A06 | 7069 |
| 0001215440 | 5F73 | 6977 | 646E | 776F | 1105 | 0002 | 0000 | 0125 |
| 0001215460 | 9B38 | 07E9 | 045F | 0010 | 0454 | 0000 | 1604 | 7263 |
| 0001215500 | 5F76 | 6567 | 5F74 | 6F6D | 7375 | 5F65 | 6F70 | 6973 |
| 0001215520 | 6974 | 6E6F | 040F | 0006 | 0693 | 6509 | 6576 | 746E |
| 0001215540 | 705F | 7274 | 040C | FFFA | 00C0 | 5F06 | 745F | 7079 |
| 0001215560 | 0F65 | F204 | 85FF | 0900 | 5F5F | 7862 | 745F | 7079 |
| 0001215600 | 0D65 | E204 | 65FF | 0704 | 5F5F | 7270 | 6E69 | 0B74 |
| 0001215620 | DA04 | AAFF | 0507 | 5F5F | 766C | 0D6C | E604 | EEFF |
| 0001215640 | 0707 | 5F5F | 6C63 | 636F | 0D6B | F604 | C0FF | 0700 |
| 0001215660 | 5F5F | 7473 | 6361 | 0E6B | E004 | 81FF | 0800 | 5F5F |
| 0001215700 | 6572 | 7674 | 6C61 | 0409 | FFF4 | 0081 | 6503 | 7272 |
| 0001215720 | 050E | 1B9E | 0008 | 07EC | 5F06 | 665F | 6E75 | 0163 |
| 0001215740 | 2302 | 9701 | F19F | 8207 | 1003 | 7700 | 0003 | 0400 |
| 0001215760 | 6314 | 7672 | 695F | 696E | 5F74 | 6F6D | 7375 | 5F65 |
| 0001216000 | 7274 | 6361 | 0F6B | 0604 | 9300 | 0906 | 7665 | 6E65 |
| 0001216020 | 5F74 | 7470 | 0C72 | FA04 | C0FF | 0600 | 5F5F | 7974 |
| 0001216040 | 6570 | 040F | FECA | 0085 | 5F09 | 625F | 5F78 | 7974 |
| 0001216060 | 6570 | 040D | FEBA | 0465 | 5F07 | 705F | 6972 | 746E |
| 0001216100 | 040B | FEB2 | 07AA | 5F05 | 6C5F | 6C76 | 040D | FEBE |
| 0001216120 | 07EE | 5F07 | 635F | 6F6C | 6B63 | 040D | FECE | 00C0 |
| 0001216140 | 5F07 | 735F | 6174 | 6B63 | 040E | FEB8 | 0081 | 5F08 |
| 0001216160 | 725F | 7465 | 6176 | 096C | CC04 | 81FE | 0300 | 7265 |
| 0001216200 | 0B72 | D204 | 80FE | 0506 | 7665 | 6E65 | 0E74 | C405 |
| 0001216220 | 081B | F300 | 0607 | 5F5F | 7566 | 636E | 0201 | 0122 |
| 0001216240 | A319 | 07F5 | 0530 | 0010 | 0525 | 0000 | 1304 | 7263 |
| 0001216260 | 5F76 | 6E65 | 5F64 | 6F6D | 7375 | 5F65 | 7274 | 6361 |
| 0001216300 | 0F6B | 0604 | 9300 | 0906 | 7665 | 6E65 | 5F74 | 7470 |
| 0001216320 | 0C72 | FA04 | C0FF | 0600 | 5F5F | 7974 | 6570 | 040F |
| 0001216340 | FEC8 | 0085 | 5F09 | 625F | 5F78 | 7974 | 6570 | 040D |
| 0001216360 | FEB8 | 0465 | 5F07 | 705F | 6972 | 746E | 040B | FEAE |
| 0001216400 | 07AA | 5F05 | 6C5F | 6C76 | 040D | FEBC | 07EE | 5F07 |
| 0001216420 | 635F | 6F6C | 6B63 | 040D | FFF6 | 00C0 | 5F07 | 735F |
| 0001216440 | 6174 | 6B63 | 040E | FEB4 | 0081 | 5F08 | 725F | 7465 |
| 0001216460 | 6176 | 0F6C | CE04 | 80FE | 0906 | 6966 | 5F78 | 7665 |
| 0001216500 | 6E65 | 1274 | CA04 | 85FE | 0C00 | 6F6C | 6163 | 5F6C |
| 0001216520 | 6572 | 7573 | 746C | 0408 | FEB6 | 0081 | 6402 | 0878 |
| 0001216540 | AC04 | 81FE | 0200 | 7964 | 0409 | FECC | 0081 | 6503 |
| 0001216560 | 7272 | 050E | 1C4A | 0008 | 07F6 | 5F06 | 665F | 6E75 |
| 0001216600 | 0163 | 1B02 | 4901 | FAA8 | FE07 | 1001 | F300 | 0001 |
| 0001216620 | 0400 | 660C | 7869 | 6C5F | 636F | 7461 | 6F69 | 0F6E |
| 0001216640 | 0604 | 9300 | 0906 | 7665 | 6E65 | 5F74 | 7470 | 0C72 |
| 0001216660 | FA04 | C0FF | 0600 | 5F5F | 7974 | 6570 | 040F | FFF4 |
| 0001216700 | 0085 | 5F09 | 625F | 5F78 | 7974 | 6570 | 040D | FFE4 |
| 0001216720 | 0465 | 5F07 | 705F | 6972 | 746E | 040B | FFDC | 07AA |
| 0001216740 | 5F05 | 6C5F | 6C76 | 040D | FFE8 | 07EE | 5F07 | 635F |
| 0001216760 | 6F6C | 6B63 | 040D | FFF6 | 00C0 | 5F07 | 735F | 6174 |
| 0001217000 | 6B63 | 040E | FFE2 | 0081 | 5F08 | 725F | 7465 | 6176 |

THU MAR 14 17:25:16 1991 CRV_IPS.DLL PAGE 303, LINE 17819

| | | | | | | | | |
|---|---|---|---|---|---|---|---|---|
| 0001217020 | 0E6C | 6C05 | 081C | 2700 | 0602 | 5F5F | 7566 | 636E |
| 0001217040 | 080D | A9B9 | 0800 | 7265 | 5F72 | 7865 | 7469 | 0201 |
| 0001217060 | 012A | AA47 | 07FB | 053A | 0010 | 052F | 0000 | 1B04 |
| 0001217100 | 6170 | 7373 | 7669 | 5F65 | 6966 | 646E | 6D5F | 756F |
| 0001217120 | 6573 | 705F | 736F | 7469 | 6F69 | 0C6E | F604 | C0FF |
| 0001217140 | 0600 | 5F5F | 7974 | 6570 | 040F | FFE2 | 0085 | 5F09 |
| 0001217160 | 625F | 5F78 | 7974 | 6570 | 040D | FFD2 | 0465 | 5F07 |
| 0001217200 | 705F | 6972 | 746E | 040B | FFCA | 07AA | 5F05 | 6C5F |
| 0001217220 | 6C76 | 040D | FFD6 | 07EE | 5F07 | 635F | 6F6C | 6B63 |
| 0001217240 | 040D | FFE8 | 00C0 | 5F07 | 735F | 6174 | 6B63 | 040E |
| 0001217260 | FFD0 | 0081 | 5F08 | 725F | 7465 | 6176 | 0B6C | EE04 |
| 0001217300 | 82FF | 0500 | 6974 | 656D | 0B72 | FA04 | 82FF | 0500 |
| 0001217320 | 6974 | 656D | 0B31 | F204 | 82FF | 0500 | 6974 | 656D |
| 0001217340 | 0832 | EC04 | 81FF | 0200 | 786C | 0408 | FFE6 | 0081 |
| 0001217360 | 6C02 | 0979 | E404 | 81FF | 0300 | 7265 | 0E72 | D005 |
| 0001217400 | 081C | FD00 | 0607 | 5F5F | 7566 | 636E | 0201 | 0129 |
| 0001217420 | AF81 | 07FF | 074F | 0010 | 0744 | 0000 | 1A04 | 6361 |
| 0001217440 | 6974 | 6576 | 665F | 6E69 | 5F64 | 6F6D | 7375 | 5F65 |
| 0001217460 | 6F70 | 6973 | 6974 | 6E6F | 040C | FFFA | 00C0 | 5F06 |
| 0001217500 | 745F | 7079 | 0F65 | EC04 | 85FF | 0900 | 5F5F | 7862 |
| 0001217520 | 745F | 7079 | 0D65 | DC04 | 65FF | 0704 | 5F5F | 7270 |
| 0001217540 | 6E69 | 0B74 | D204 | AAFF | 0507 | 5F5F | 766C | 0D6C |
| 0001217560 | E004 | EEFF | 0707 | 5F5F | 6C63 | 636F | 0D6B | F204 |
| 0001217600 | C0FF | 0700 | 5F5F | 7473 | 6361 | 0E6B | D804 | 81FF |
| 0001217620 | 0800 | 5F5F | 6572 | 7674 | 6C61 | 0408 | FFDA | 0081 |
| 0001217640 | 6402 | 0878 | D004 | 81FF | 0200 | 7964 | 0407 | FFEE |
| 0001217660 | 0081 | 6901 | 040B | FFF6 | 0082 | 7405 | 6D69 | 7265 |
| 0001217700 | 0409 | FFF0 | 0081 | 6503 | 7272 | 050E | 1D52 | 0008 |
| 0001217720 | 0801 | 5F06 | 665F | 6E75 | 1363 | 6E05 | 081D | 8500 |
| 0001217740 | 0B00 | 6E69 | 7469 | 6169 | 696C | 657A | 0F64 | 7005 |
| 0001217760 | 081D | 8100 | 0700 | 7864 | 695F | 696E | 0F74 | 7205 |
| 0001220000 | 081D | 8100 | 0700 | 7964 | 695F | 696E | 0174 | 1C02 |
| 0001220020 | D001 | 04B6 | 7808 | 1000 | 6D00 | 0000 | 0400 | 670D |
| 0001220040 | 7073 | 775F | 6961 | 5F74 | 6469 | 656C | 040D | FFFA |
| 0001220060 | 0086 | 7407 | 6D69 | 6F65 | 7475 | 0201 | 0123 | B748 |
| 0001220100 | 0805 | 03BD | 0010 | 03B2 | 0000 | 1404 | 7367 | 5F70 |
| 0001220120 | 7277 | 7469 | 5F65 | 7274 | 6361 | 5F6B | 6F6D | 6576 |
| 0001220140 | 040C | FFFA | 00C0 | 5F06 | 745F | 7079 | 0F65 | F404 |
| 0001220160 | 85FF | 0906 | 5F5F | 7862 | 745F | 7079 | 0D65 | E404 |
| 0001220200 | 65FF | 0704 | 5F5F | 7270 | 6E69 | 0B74 | DC04 | AAFF |
| 0001220220 | 0507 | 5F5F | 766C | 0D6C | E804 | EEFF | 0707 | 5F5F |
| 0001220240 | 6C63 | 636F | 0D6B | F604 | C0FF | 0700 | 5F5F | 7473 |
| 0001220260 | 6361 | 0E6B | E204 | 81FF | 0800 | 5F5F | 6572 | 7674 |
| 0001220300 | 6C61 | 050E | 1D82 | 0008 | 07F3 | 5F06 | 665F | 6E75 |
| 0001220320 | 0D63 | 9805 | 081D | 8600 | 0500 | 6974 | 656D | 0172 |
| 0001220340 | 1D02 | 0501 | 07BB | A308 | 100B | 9800 | 000B | 0400 |
| 0001220360 | 6D0E | 766F | 5F65 | 7374 | 5F6C | 6F6D | 7375 | 0F65 |
| 0001220400 | 0604 | 9300 | 0906 | 7665 | 6E65 | 5F74 | 7470 | 0C72 |
| 0001220420 | F804 | C0FF | 0600 | 5F5F | 7974 | 6570 | 040F | FFDC |
| 0001220440 | 0085 | 5F09 | 625F | 5F78 | 7974 | 6570 | 040D | FFC4 |
| 0001220460 | 0465 | 5F07 | 705F | 6972 | 746E | 040B | FFBA | 07AA |
| 0001220500 | 5F05 | 6C5F | 6C76 | 040D | FFCA | 07EE | 5F07 | 635F |
| 0001220520 | 6F6C | 6B63 | 040D | FFE8 | 00C0 | 5F07 | 735F | 6174 |
| 0001220540 | 6B63 | 040E | FFC0 | 0081 | 5F08 | 725F | 7465 | 6176 |
| 0001220560 | 096C | DE04 | 81FF | 0300 | 7265 | 0772 | E004 | 81FF |
| 0001220600 | 0100 | 0769 | E604 | 81FF | 0100 | 0778 | E204 | 81FF |
| 0001220620 | 0100 | 0879 | FC04 | 81FF | 0200 | 7878 | 0408 | FFF6 |
| 0001220640 | 0081 | 7902 | 0A79 | E404 | 81FF | 0400 | 7078 | 7869 |
| 0001220660 | 040A | FFD6 | 0081 | 7904 | 6970 | 0A78 | C204 | 81FF |

THU MAR 14 17:25:16 1991 CRV_IPS.DLL PAGE 304, LINE 17878

| | | | | | | | | |
|---|---|---|---|---|---|---|---|---|
| 0001220700 | 0400 | 7278 | 6D65 | 040A | FFB8 | 0081 | 7904 | 6572 |
| 0001220720 | 0D6D | D804 | 81FF | 0700 | 5F78 | 6E75 | 7469 | 0D73 |
| 0001220740 | C804 | 81FF | 0700 | 5F79 | 6E75 | 7469 | 0E73 | EC04 |
| 0001220760 | 89FF | 0807 | 6F6C | 5F63 | 6F6D | 6576 | 040E | FFDA |
| 0001221000 | 0084 | 6108 | 7362 | 6D5F | 646F | 0E65 | BE05 | 081D |
| 0001221020 | 0900 | 0608 | 5F5F | 7566 | 636E | 050D | 1DCE | 0008 |
| 0001221040 | 0086 | 7405 | 6D69 | 7265 | 0201 | 0119 | C6A8 | 080B |
| 0001221060 | 061A | 0010 | 060F | 0000 | 0A04 | 6F6D | 6576 | 6D5F |
| 0001221100 | 756F | 6573 | 040F | 0006 | 0693 | 6509 | 6576 | 746E |
| 0001221120 | 705F | 7274 | 040C | FFFA | 00C0 | 5F06 | 745F | 7079 |
| 0001221140 | 0F65 | EC04 | 85FF | 0900 | 5F5F | 7862 | 745F | 7079 |
| 0001221160 | 0D65 | DA04 | 65FF | 0704 | 5F5F | 7270 | 6E69 | 0B74 |
| 0001221200 | D004 | AAFF | 0507 | 5F5F | 766C | 0D6C | DE04 | EEFF |
| 0001221220 | 0707 | 5F5F | 6C63 | 636F | 0D6B | F604 | C0FF | 0700 |
| 0001221240 | 5F5F | 7473 | 6361 | 0E6B | D604 | 81FF | 0800 | 5F5F |
| 0001221260 | 6572 | 7674 | 6C61 | 0407 | FFF4 | 0081 | 7801 | 0407 |
| 0001221300 | FFEE | 0081 | 7901 | 040A | FFF0 | 0081 | 7804 | 6970 |
| 0001221320 | 0A78 | EA04 | 81FF | 0400 | 7079 | 7869 | 040A | FFD8 |
| 0001221340 | 0081 | 7804 | 6572 | 0A6D | CE04 | 81FF | 0400 | 7279 |
| 0001221360 | 6D65 | 0409 | FFF2 | 0081 | 6503 | 7272 | 050E | 1DE0 |
| 0001221400 | 0008 | 080C | 5F06 | 665F | 6E75 | 0163 | 2102 | C201 |
| 0001221420 | 0ECC | 4F08 | 1000 | 4400 | 0000 | 0400 | 7512 | 6470 |
| 0001221440 | 7461 | 5F65 | 6573 | 7261 | 6863 | 615F | 6572 | 0861 |
| 0001221460 | 0604 | 8100 | 0200 | 7864 | 0408 | 0008 | 0081 | 6402 |
| 0001221500 | 0179 | 2002 | 1101 | 0FCD | 2A08 | 1000 | 1F00 | 0000 |
| 0001221520 | 0400 | 7211 | 7365 | 7465 | 735F | 6165 | 6372 | 5F68 |
| 0001221540 | 7261 | 6165 | 0201 | 0124 | CD3B | 0811 | 0021 | 0010 |
| 0001221560 | 0016 | 0000 | 1504 | 7263 | 5F76 | 6F6D | 5F75 | 6170 |
| 0001221600 | 7373 | 7669 | 5F65 | 656C | 7261 | 0A6E | 0604 | 8500 |
| 0001221620 | 0400 | 7974 | 6570 | 0201 | 012A | CD5C | 0812 | 0594 |
| 0001221640 | 0010 | 0589 | 0000 | 1B04 | 6361 | 6974 | 6576 | 5F32 |
| 0001221660 | 6966 | 646E | 6D5F | 756F | 6573 | 705F | 736F | 7469 |
| 0001221700 | 6F69 | 0C6E | FA04 | C0FF | 0600 | 5F5F | 7974 | 6570 |
| 0001221720 | 040F | FFEC | 0085 | 5F09 | 625F | 5F78 | 7974 | 6570 |
| 0001221740 | 040D | FFDA | 0465 | 5F07 | 705F | 6972 | 746E | 040B |
| 0001221760 | FFCE | 07AA | 5F05 | 6C5F | 6C76 | 040D | FFDE | 07EE |
| 0001222000 | 5F07 | 635F | 6F6C | 6B63 | 040D | FFF6 | 00C0 | 5F07 |
| 0001222020 | 735F | 6174 | 6B63 | 040E | FFD4 | 0081 | 5F08 | 725F |
| 0001222040 | 7465 | 6176 | 0B6C | EA04 | 81FF | 0500 | 7265 | 6F72 |
| 0001222060 | 0B72 | D604 | 85FF | 0500 | 6F66 | 6E75 | 1264 | F404 |
| 0001222100 | 81FF | 0C00 | 6567 | 656E | 6172 | 5F6C | 7261 | 6165 |
| 0001222120 | 0407 | FFEE | 0085 | 6901 | 0408 | FFD8 | 0081 | 6402 |
| 0001222140 | 0878 | CC04 | 81FF | 0200 | 7964 | 040B | FFF2 | 0081 |
| 0001222160 | 7005 | 7869 | 785F | 040B | FFF0 | 0081 | 7005 | 7869 |
| 0001222200 | 795F | 050E | 1EBA | 0008 | 07FD | 5F06 | 665F | 6E75 |
| 0001222220 | 0163 | 1E02 | F001 | 16D2 | 7308 | 1000 | 6800 | 0000 |
| 0001222240 | 0400 | 670F | 6E65 | 7265 | 6C61 | 615F | 6572 | 5F61 |
| 0001222260 | 666F | 0407 | 0006 | 0081 | 7801 | 0407 | 0008 | 0081 |
| 0001222300 | 7901 | 0412 | FFFC | 0081 | 670C | 6E65 | 7265 | 6C61 |
| 0001222320 | 615F | 6572 | 0161 | 2602 | 6301 | 18D3 | 4508 | 1002 |
| 0001222340 | 3A00 | 0002 | 0400 | 6217 | 6975 | 646C | 645F | 7269 |
| 0001222360 | 6365 | 6974 | 6E6F | 6C61 | 655F | 6576 | 746E | 040F |
| 0001222400 | 0006 | 0081 | 6409 | 7269 | 6365 | 6974 | 6E6F | 0408 |
| 0001222420 | 0008 | 00C1 | 6402 | 0878 | 0C04 | C100 | 0200 | 7964 |
| 0001222440 | 0411 | 0010 | 00C1 | 650B | 6576 | 746E | 705F | 7869 |
| 0001222460 | 785F | 0411 | 0014 | 00C1 | 650B | 6576 | 746E | 705F |
| 0001222500 | 7869 | 795F | 040C | FFFA | 00C0 | 5F06 | 745F | 7079 |
| 0001222520 | 0F65 | F404 | 85FF | 0900 | 5F5F | 7862 | 745F | 7079 |
| 0001222540 | 0D65 | E204 | 65FF | 0704 | 5F5F | 7270 | 6E69 | 0B74 |

THU MAR 14 17:25:16 1991 CRV_IPS.DLL PAGE 305, LINE 17937

| | | | | | | | | |
|---|---|---|---|---|---|---|---|---|
| 0001222560 | DA04 | AAFF | 0507 | 5F5F | 766C | 0D6C | E604 | EEFF |
| 0001222600 | 0707 | 5F5F | 6C63 | 636F | 0D6B | F604 | C0FF | 0700 |
| 0001222620 | 5F5F | 7473 | 6361 | 0E6B | E004 | 81FF | 0800 | 5F5F |
| 0001222640 | 6572 | 7674 | 6C61 | 040B | FFF2 | 0081 | 6505 | 7272 |
| 0001222660 | 726F | 050E | 1F0A | 0008 | 0819 | 5F06 | 665F | 6E75 |
| 0001222700 | 1363 | 2205 | 081F | 8500 | 0B00 | 6E69 | 7469 | 6169 |
| 0001222720 | 696C | 657A | 1464 | 9805 | 0854 | 8100 | 0C00 | 7665 |
| 0001222740 | 6E65 | 5F74 | 5F78 | 6973 | 657A | 0514 | 549C | 0008 |
| 0001222760 | 0081 | 650C | 6576 | 746E | 795F | 735F | 7A69 | 1865 |
| 0001223000 | 9605 | 0854 | 8100 | 1000 | 7665 | 6E65 | 5F74 | 5F78 |
| 0001223020 | 6970 | 5F78 | 6973 | 657A | 0518 | 549A | 0008 | 0081 |
| 0001223040 | 6510 | 6576 | 746E | 795F | 705F | 7869 | 735F | 7A69 |
| 0001223060 | 0165 | 2802 | A801 | 1CD5 | D808 | 1000 | CD00 | 0000 |
| 0001223100 | 0400 | 6219 | 6975 | 646C | 6C5F | 7361 | 5F74 | 6F6C |
| 0001223120 | 6163 | 6974 | 6E6F | 655F | 6576 | 746E | 040D | 0006 |
| 0001223140 | 00C1 | 6507 | 6576 | 746E | 785F | 040D | 000A | 00C1 |
| 0001223160 | 6507 | 6576 | 746E | 795F | 0411 | 000E | 00C1 | 650B |
| 0001223200 | 6576 | 746E | 705F | 7869 | 785F | 0411 | 0012 | 00C1 |
| 0001223220 | 650B | 6576 | 746E | 705F | 7869 | 795F | 0408 | FFFA |
| 0001223240 | 0081 | 6402 | 0878 | F804 | 81FF | 0200 | 7964 | 040F |
| 0001223260 | FFFC | 0081 | 6409 | 7269 | 6365 | 6974 | 6E6F | 0201 |
| 0001223300 | 0127 | D680 | 081E | 032F | 0010 | 0324 | 0000 | 1804 |
| 0001223320 | 6361 | 6974 | 6576 | 5F32 | 6966 | 646E | 755F | 6973 |
| 0001223340 | 676E | 655F | 6576 | 746E | 040D | 0006 | 0081 | 7507 |
| 0001223360 | 696E | 7374 | 785F | 040D | 0008 | 0081 | 7507 | 696E |
| 0001223400 | 7374 | 795F | 040E | 000A | 0081 | 7008 | 7869 | 6C65 |
| 0001223420 | 5F73 | 0E78 | 0C04 | 8100 | 0800 | 6970 | 6578 | 736C |
| 0001223440 | 795F | 040B | 000E | 00C5 | 6605 | 756F | 646E | 040C |
| 0001223460 | FFFA | 00C0 | 5F06 | 745F | 7079 | 0F65 | F404 | 85FF |
| 0001223500 | 0900 | 5F5F | 7862 | 745F | 7079 | 0D65 | E204 | 65FF |
| 0001223520 | 0704 | 5F5F | 7270 | 6E69 | 0B74 | DA04 | AAFF | 0507 |
| 0001223540 | 5F5F | 766C | 0D6C | E604 | EEFF | 0707 | 5F5F | 6C63 |
| 0001223560 | 636F | 0D6B | F604 | C0FF | 0700 | 5F5F | 7473 | 6361 |
| 0001223600 | 0E6B | E004 | 81FF | 0800 | 5F5F | 6572 | 7674 | 6C61 |
| 0001223620 | 040B | FFF2 | 0081 | 6505 | 7272 | 726F | 050E | 1F72 |
| 0001223640 | 0008 | 0820 | 5F06 | 665F | 6E75 | 0163 | 2C02 | AF01 |
| 0001223660 | 21D9 | 2408 | 1000 | 1900 | 0000 | 0400 | 631D | 7672 |
| 0001223700 | 695F | 766E | 6C61 | 6469 | 7461 | 5F65 | 616C | 7473 |
| 0001223720 | 6D5F | 756F | 6573 | 6C5F | 636F | 0201 | 0125 | D9D3 |
| 0001223740 | 0823 | 0030 | 0010 | 0025 | 0000 | 1604 | 7263 | 5F76 |
| 0001223760 | 6573 | 5F74 | 616C | 7473 | 6D5F | 756F | 6573 | 6C5F |
| 0001224000 | 636F | 0414 | 0006 | 0081 | 6E0E | 7765 | 785F | 6C5F |
| 0001224020 | 636F | 7461 | 6F69 | 146E | 0804 | 8100 | 0E00 | 656E |
| 0001224040 | 5F77 | 5F79 | 6F6C | 6163 | 6974 | 6E6F | 0201 | 0122 |
| 0001224060 | DA03 | 0825 | 0567 | 0010 | 055C | 0000 | 1304 | 7263 |
| 0001224100 | 5F76 | 656C | 7261 | 5F6E | 6572 | 5F6C | 6373 | 6C61 |
| 0001224120 | 0965 | 0604 | 9000 | 0307 | 6977 | 0F6E | C804 | 85FE |
| 0001224140 | 0900 | 5F5F | 7862 | 745F | 7079 | 0D65 | B404 | 65FE |
| 0001224160 | 0704 | 5F5F | 7270 | 6E69 | 0B74 | AA04 | AAFE | 0507 |
| 0001224200 | 5F5F | 766C | 0D6C | BC04 | EEFE | 0707 | 5F5F | 6C63 |
| 0001224220 | 636F | 0D6B | CC04 | C0FE | 0700 | 5F5F | 7473 | 6361 |
| 0001224240 | 0E6B | B004 | 81FE | 0800 | 5F5F | 6572 | 7674 | 6C61 |
| 0001224260 | 0D06 | 0081 | 010E | 0969 | CA04 | 81FE | 0300 | 7265 |
| 0001224300 | 1272 | A204 | 85FE | 0C00 | 5F78 | 616D | 6772 | 6E69 |
| 0001224320 | 665F | 676C | 040B | FEA4 | 00C1 | 7805 | 705F | 7274 |
| 0001224340 | 040B | FE9E | 00C1 | 7905 | 705F | 7274 | 040C | FFFB |
| 0001224360 | 0081 | 7306 | 7571 | 7261 | 0B65 | B804 | 81FE | 0500 |
| 0001224400 | 6F6D | 6576 | 0864 | B204 | 81FE | 0200 | 7864 | 0408 |
| 0001224420 | FEA8 | 0081 | 6402 | 0E79 | BA04 | 85FE | 0800 | 7773 |

THU MAR 14 17:25:16 1991 CRV_IPS.DLL PAGE 306, LINE 17996

| | | | | | | | | |
|---|---|---|---|---|---|---|---|---|
| 0001224440 | 7469 | 6863 | 6465 | 0409 | FE9C | 0085 | 6403 | 7269 |
| 0001224460 | 040B | FED0 | 0680 | 6505 | 6576 | 746E | 040C | FFFA |
| 0001224500 | 00C0 | 5F06 | 745F | 7079 | 0E65 | 1005 | 0820 | F600 |
| 0001224520 | 0607 | 5F5F | 7566 | 636E | 0201 | 0124 | DF6A | 0827 |
| 0001224540 | 0021 | 0010 | 0016 | 0000 | 1504 | 6E69 | 7469 | 6C5F |
| 0001224560 | 6165 | 6E72 | 735F | 6163 | 656C | 665F | 6E75 | 0163 |
| 0001224600 | 2602 | 8B01 | 29DF | D408 | 1002 | C900 | 0002 | 0400 |
| 0001224620 | 6317 | 7672 | 725F | 6165 | 5F64 | 6572 | 5F6C | 6373 |
| 0001224640 | 6C61 | 5F65 | 7566 | 636E | 0408 | 0006 | 00C0 | 6602 |
| 0001224660 | 0C6E | FA04 | C0FF | 0600 | 5F5F | 7974 | 6570 | 040F |
| 0001224700 | FF9C | 0085 | 5F09 | 625F | 5F78 | 7974 | 6570 | 040D |
| 0001224720 | FF8C | 0465 | 5F07 | 705F | 6972 | 746E | 040B | FF84 |
| 0001224740 | 07AA | 5F05 | 6C5F | 6C76 | 040D | FF90 | 07EE | 5F07 |
| 0001224760 | 635F | 6F6C | 6B63 | 040D | FFF4 | 00C0 | 5F07 | 735F |
| 0001225000 | 6174 | 6B63 | 040E | FF8A | 0081 | 5F08 | 725F | 7465 |
| 0001225020 | 6176 | 076C | 9E04 | 81FF | 0100 | 0A69 | F804 | 81FF |
| 0001225040 | 0400 | 7974 | 6570 | 0408 | FFA0 | 0425 | 6602 | 0A70 |
| 0001225060 | A404 | 2AFF | 0408 | 6574 | 706D | 050E | 2040 | 0008 |
| 0001225100 | 0819 | 5F06 | 665F | 6E75 | 0163 | 2702 | 5F01 | 2DE2 |
| 0001225120 | BB08 | 1000 | B000 | 0000 | 0400 | 6318 | 7672 | 775F |
| 0001225140 | 6972 | 6574 | 725F | 6C65 | 735F | 6163 | 656C | 665F |
| 0001225160 | 6E75 | 0863 | 0604 | C000 | 0200 | 6E66 | 0407 | FFF8 |
| 0001225200 | 0081 | 6901 | 0408 | FFFA | 0425 | 6602 | 0170 | 2202 |
| 0001225220 | 1A01 | 2FE3 | 3608 | 1000 | 2B00 | 0000 | 0400 | 6513 |
| 0001225240 | 646E | 6C5F | 6165 | 6E72 | 725F | 6C65 | 735F | 6163 |
| 0001225260 | 656C | 0409 | FFFC | 0081 | 6503 | 7272 | 0201 | 011A |
| 0001225300 | E350 | 0831 | 0AFD | 0010 | 0AF2 | 0000 | 0B04 | 6573 |
| 0001225320 | 7261 | 6863 | 695F | 6F63 | 096E | 0604 | 8500 | 0300 |
| 0001225340 | 6964 | 0872 | 0804 | 8100 | 0200 | 7864 | 0408 | 000A |
| 0001225360 | 0081 | 6402 | 0B79 | 0C04 | 8100 | 0500 | 6E75 | 7469 |
| 0001225400 | 1173 | 0E04 | C100 | 0B00 | 7378 | 6163 | 656C | 665F |
| 0001225420 | 6E75 | 1163 | 1204 | C100 | 0B00 | 7379 | 6163 | 656C |
| 0001225440 | 665F | 6E75 | 0C63 | F804 | C0FF | 0600 | 5F5F | 7974 |
| 0001225460 | 6570 | 040F | FFF0 | 0085 | 5F09 | 625F | 5F78 | 7974 |
| 0001225500 | 6570 | 040D | FFE0 | 0465 | 5F07 | 705F | 6972 | 746E |
| 0001225520 | 040B | FFD8 | 07AA | 5F05 | 6C5F | 6C76 | 040D | FFE4 |
| 0001225540 | 07EE | 5F07 | 635F | 6F6C | 6B63 | 040D | FFF4 | 00C0 |
| 0001225560 | 5F07 | 735F | 6174 | 6B63 | 040E | FFDE | 0081 | 5F08 |
| 0001225600 | 725F | 7465 | 6176 | 0B6C | D604 | 81FF | 0500 | 726F |
| 0001225620 | 5F67 | 0B78 | FC04 | 81FF | 0500 | 726F | 5F67 | 0979 |
| 0001225640 | F204 | 81FF | 0300 | 7265 | 0E72 | 1A05 | 0821 | 8D00 |
| 0001225660 | 0602 | 5F5F | 7566 | 636E | 0201 | 011E | EE4D | 0835 |
| 0001225700 | 020C | 0010 | 0201 | 0000 | 0F04 | 6970 | 6C78 | 7365 |
| 0001225720 | 745F | 5F6F | 6E75 | 7469 | 0C73 | 0604 | 8400 | 0600 |
| 0001225740 | 6261 | 7273 | 6C65 | 0407 | 0008 | 00C1 | 7801 | 0407 |
| 0001225760 | 000C | 00C1 | 7901 | 040E | 0010 | 0793 | 6C08 | 636F |
| 0001226000 | 6D5F | 766F | 1365 | F804 | 81FF | 0D00 | 5F78 | 6F6E |
| 0001226020 | 6F5F | 5F66 | 7473 | 7065 | 1373 | F604 | 81FF | 0D00 |
| 0001226040 | 5F79 | 6F6E | 6F5F | 5F66 | 7473 | 7065 | 1173 | EA04 |
| 0001226060 | 81FF | 0B00 | 6F6E | 6F5F | 5F66 | 7473 | 7065 | 0B73 |
| 0001226100 | F404 | 81FF | 0500 | 5F78 | 6970 | 0B78 | F004 | 81FF |
| 0001226120 | 0500 | 5F79 | 6970 | 0C78 | EE04 | 81FF | 0600 | 6574 |
| 0001226140 | 706D | 785F | 040C | FFEC | 0081 | 7406 | 6D65 | 5F70 |
| 0001226160 | 0879 | FC04 | 81FF | 0200 | 7878 | 0408 | FFFA | 0081 |
| 0001226200 | 7902 | 0979 | F204 | 81FF | 0300 | 7265 | 0172 | 1E02 |
| 0001226220 | 5901 | 37F0 | F808 | 1000 | ED00 | 0000 | 0400 | 750F |
| 0001226240 | 696E | 7374 | 745F | 5F6F | 6970 | 6C78 | 7365 | 040C |
| 0001226260 | 0006 | 0081 | 7806 | 6E75 | 7469 | 0C73 | 0804 | 8100 |
| 0001226300 | 0600 | 7579 | 696E | 7374 | 040D | 000A | 00C1 | 7807 |

THU MAR 14 17:25:16 1991 CRV_IPS.DLL PAGE 307, LINE 18055

| | | | | | | | | |
|---|---|---|---|---|---|---|---|---|
| 0001226320 | 6970 | 6C78 | 7365 | 040D | 000E | 00C1 | 7907 | 6970 |
| 0001226340 | 6C78 | 7365 | 0410 | 0012 | 00C1 | 780A | 6572 | 616D |
| 0001226360 | 6E69 | 6564 | 1072 | 1604 | C100 | 0A00 | 7279 | 6D65 |
| 0001226400 | 6961 | 646E | 7265 | 040E | FFFC | 0081 | 7308 | 5F78 |
| 0001226420 | 6E75 | 7469 | 0E73 | FA04 | 81FF | 0800 | 7973 | 755F |
| 0001226440 | 696E | 7374 | 0201 | 0118 | F151 | 0839 | 0103 | 0010 |
| 0001226460 | 00F8 | 0000 | 0904 | 6567 | 5F74 | 6E75 | 7469 | 0A73 |
| 0001226500 | 0604 | C100 | 0400 | 7078 | 7869 | 040A | 000A | 00C1 |
| 0001226520 | 7904 | 6970 | 0C78 | 0E04 | C100 | 0600 | 7578 | 696E |
| 0001226540 | 7374 | 040C | 0012 | 00C1 | 7906 | 6E75 | 7469 | 0E73 |
| 0001226560 | FC04 | 81FF | 0800 | 6261 | 5F73 | 7078 | 7869 | 040E |
| 0001226600 | FFFA | 0081 | 6108 | 7362 | 795F | 6970 | 0178 | 2102 |
| 0001226620 | 5401 | 3AF2 | 2B08 | 1001 | 2000 | 0001 | 0400 | 6212 |
| 0001226640 | 6975 | 646C | 705F | 7869 | 745F | 5F6F | 6E75 | 7469 |
| 0001226660 | 0D73 | F404 | 81FF | 0700 | 6C6F | 5F64 | 6970 | 0978 |
| 0001226700 | FC04 | 81FF | 0300 | 6970 | 0778 | FA04 | 81FF | 0100 |
| 0001226720 | 0769 | F804 | 81FF | 0100 | 076A | F604 | 81FF | 0100 |
| 0001226740 | 016B | 2902 | 7F01 | 3BF3 | F308 | 1000 | E800 | 0000 |
| 0001226760 | 0400 | 661A | 6C69 | 5F6C | 6572 | 616D | 6E69 | 6564 |
| 0001227000 | 5F72 | 6E75 | 7469 | 745F | 5F6F | 6970 | 0678 | 810D |
| 0001227020 | 0E00 | 6901 | 040F | FFFC | 0085 | 7209 | 7365 | 665F |
| 0001227040 | 756F | 646E | 0201 | 0128 | F472 | 083D | 023B | 0010 |
| 0001227060 | 0230 | 0000 | 1904 | 6E69 | 7469 | 725F | 6C65 | 6C5F |
| 0001227100 | 636F | 7461 | 726F | 705F | 736F | 7469 | 6F69 | 096E |
| 0001227120 | 0604 | 8500 | 0300 | 6964 | 0E72 | 0804 | 9000 | 0807 |
| 0001227140 | 6572 | 7463 | 705F | 7274 | 040B | 000C | 00C1 | 6D05 |
| 0001227160 | 7861 | 785F | 040B | 0010 | 00C1 | 6D05 | 6E69 | 785F |
| 0001227200 | 0407 | FFDC | 0081 | 6901 | 0409 | FFDE | 0081 | 6503 |
| 0001227220 | 7272 | 040E | FFD8 | 0085 | 6608 | 6E69 | 7369 | 6568 |
| 0001227240 | 0F64 | FA04 | 85FF | 0900 | 7265 | 6F72 | 5F72 | 6C66 |
| 0001227260 | 1167 | FC04 | 85FF | 0B00 | 6863 | 6E61 | 6567 | 5F64 |
| 0001227300 | 6C66 | 0F67 | E004 | 81FF | 0900 | 616D | 5F78 | 6E75 |
| 0001227320 | 7469 | 0D73 | DA04 | 85FF | 0700 | 6863 | 6E61 | 6567 |
| 0001227340 | 0C64 | D604 | 85FF | 0600 | 616D | 6772 | 6E69 | 0411 |
| 0001227360 | FFF8 | 0085 | 6C0B | 776F | 725F | 7365 | 665F | 676C |
| 0001227400 | 0412 | FFE2 | 0762 | 670C | 5F70 | 6369 | 6E6F | 645F |
| 0001227420 | 7461 | 0C61 | F604 | 81FF | 0600 | 5F79 | 7473 | 7065 |
| 0001227440 | 0201 | 011E | F6AD | 083E | 022F | 0010 | 0224 | 0000 |
| 0001227460 | 0F04 | 6F6C | 6163 | 6F74 | 5F72 | 6F63 | 6E6E | 6365 |
| 0001227500 | 0774 | F004 | 81FF | 0100 | 1169 | FC04 | 85FF | 0B00 |
| 0001227520 | 6863 | 6E61 | 6567 | 5F64 | 6C66 | 1267 | F804 | 85FF |
| 0001227540 | 0C00 | 7773 | 7469 | 6863 | 6465 | 665F | 676C | 040C |
| 0001227560 | FFFA | 0081 | 7806 | 735F | 6574 | 0C70 | F604 | 81FF |
| 0001227600 | 0600 | 5F79 | 7473 | 7065 | 040F | FFF4 | 0081 | 6D09 |
| 0001227620 | 7861 | 755F | 696E | 7374 | 0409 | FFF2 | 0081 | 6503 |
| 0001227640 | 7272 | 0201 | 011D | F8DC | 0840 | 01D6 | 0010 | 01CB |
| 0001227660 | 0000 | 0E04 | 6C63 | 7069 | 745F | 5F6F | 6977 | 646E |
| 0001227700 | 776F | 040E | 0006 | 0084 | 6108 | 7362 | 6D5F | 646F |
| 0001227720 | 0865 | 0804 | C100 | 0200 | 7878 | 0408 | 000C | 00C1 |
| 0001227740 | 7902 | 0B79 | FA04 | 81FF | 0500 | 6574 | 706D | 0B78 |
| 0001227760 | F804 | 81FF | 0500 | 6574 | 706D | 0E79 | FC04 | 85FF |
| 0001230000 | 0800 | 6C63 | 7069 | 665F | 676C | 0201 | 0510 | 0000 |
| 0001230020 | 0000 | 0081 | 4208 | 5F78 | 5F42 | 6973 | 0567 | 000D |
| 0001230040 | 1A00 | 1D00 | 7E05 | 0827 | 8500 | 1500 | 6373 | 6C61 |
| 0001230060 | 5F65 | 6F6E | 5F74 | 6E69 | 7469 | 6169 | 696C | 657A |
| 0001230100 | 1464 | 8005 | 0827 | FD00 | 0C04 | 6373 | 6C61 | 5F65 |
| 0001230120 | 6977 | 646E | 776F | 0510 | 1C50 | 0007 | 075F | 6708 |
| 0001230140 | 5F70 | 7473 | 7261 | 1174 | 8205 | 071C | 5F00 | 0907 |
| 0001230160 | 7067 | 735F | 6165 | 6372 | 1468 | 7E05 | 0850 | 8500 |

THU MAR 14 17:25:16 1991 CRV_IPS.DLL PAGE 308, LINE 18114

| | | | | | | | | |
|---|---|---|---|---|---|---|---|---|
| 0001230200 | 0C00 | 6E69 | 7469 | 745F | 6172 | 6B63 | 785F | 0514 |
| 0001230220 | 5080 | 0008 | 0085 | 690C | 696E | 5F74 | 7274 | 6361 |
| 0001230240 | 5F6B | 1379 | B205 | 0847 | 8500 | 0B00 | 6E65 | 5F64 |
| 0001230260 | 7274 | 6361 | 5F6B | 1378 | B405 | 0847 | 8500 | 0B00 |
| 0001230300 | 6E65 | 5F64 | 7274 | 6361 | 5F6B | 0F79 | 8405 | 081B |
| 0001230320 | 8500 | 0700 | 6F6D | 6576 | 6E5F | 106F | 0605 | 070F |
| 0001230340 | 5600 | 0806 | 7069 | 5F73 | 6164 | 6174 | 0512 | 5096 |
| 0001230360 | 0008 | 0784 | 730A | 6163 | 656C | 665F | 6E75 | 1163 |
| 0001230400 | 9205 | 0850 | 8100 | 0900 | 616D | 5F78 | 5F78 | 6970 |
| 0001230420 | 1178 | 9405 | 0850 | 8100 | 0900 | 616D | 5F78 | 5F79 |
| 0001230440 | 6970 | 1678 | B605 | 0847 | DE00 | 0E07 | 5F78 | 6970 |
| 0001230460 | 5F78 | 6F74 | 755F | 696E | 7374 | 0516 | 4CB6 | 0008 |
| 0001230500 | 07DF | 790E | 705F | 7869 | 745F | 5F6F | 6E75 | 7469 |
| 0001230520 | 1E73 | 8605 | 081B | 8100 | 1600 | 7563 | 5F72 | 6369 |
| 0001230540 | 6E6F | 795F | 735F | 6574 | 5F70 | 6E69 | 705F | 7869 |
| 0001230560 | 051E | 1B88 | 0008 | 0081 | 6316 | 7275 | 695F | 6F63 |
| 0001230600 | 5F6E | 5F78 | 7473 | 7065 | 695F | 5F6E | 6970 | 1778 |
| 0001230620 | 8A05 | 081B | 8100 | 0F00 | 7563 | 5F72 | 6369 | 6E6F |
| 0001230640 | 795F | 735F | 6574 | 1770 | 8C05 | 081B | 8100 | 0F00 |
| 0001230660 | 7563 | 5F72 | 6369 | 6E6F | 785F | 735F | 6574 | 1770 |
| 0001230700 | 8E05 | 081B | 8100 | 0F00 | 7563 | 5F72 | 6369 | 6E6F |
| 0001230720 | 795F | 735F | 7A69 | 1765 | 9005 | 081B | 8100 | 0F00 |
| 0001230740 | 7563 | 5F72 | 6369 | 6E6F | 785F | 735F | 7A69 | 1965 |
| 0001230760 | 9205 | 081B | 8100 | 1100 | 6168 | 666C | 695F | 6F63 |
| 0001231000 | 5F6E | 5F78 | 6E75 | 7469 | 1973 | 9405 | 081B | 8100 |
| 0001231020 | 1100 | 6168 | 666C | 695F | 6F63 | 5F6E | 5F79 | 6E75 |
| 0001231040 | 7469 | 1373 | 9605 | 081B | 8100 | 0B00 | 6168 | 666C |
| 0001231060 | 695F | 6F63 | 5F6E | 1378 | 9805 | 081B | 8100 | 0B00 |
| 0001231100 | 6168 | 666C | 695F | 6F63 | 5F6E | 1879 | 9A05 | 081B |
| 0001231120 | 8200 | 1000 | 6C67 | 626F | 6C61 | 775F | 6961 | 5F74 |
| 0001231140 | 6974 | 656D | 0511 | 5082 | 0008 | 0082 | 7709 | 6961 |
| 0001231160 | 5F74 | 6974 | 656D | 050F | 1ADA | 0008 | 00C0 | 4207 |
| 0001231200 | 785F | 6946 | 656C | 050F | 1ADE | 0008 | 00C0 | 4207 |
| 0001231220 | 785F | 6150 | 6B63 | 0511 | 5086 | 0008 | 0765 | 6709 |
| 0001231240 | 5F70 | 7473 | 7572 | 7463 | 0512 | 47AE | 0008 | 0771 |
| 0001231260 | 670A | 5F70 | 6F63 | 746E | 6F72 | 186C | E205 | 081A |
| 0001231300 | 8500 | 1000 | 6F6D | 7375 | 5F65 | 7665 | 6E65 | 5F74 |
| 0001231320 | 6573 | 746E | 0516 | 1AE4 | 0008 | 076E | 670E | 5F70 |
| 0001231340 | 6573 | 7261 | 6863 | 615F | 6572 | 1261 | 0005 | 0700 |
| 0001231360 | 8100 | 0A00 | 7278 | 7365 | 755F | 696E | 7374 | 050D |
| 0001231400 | 1AF2 | 0008 | 0081 | 6405 | 7065 | 6874 | 050F | 1AF4 |
| 0001231420 | 0008 | 0081 | 6C07 | 7361 | 5F74 | 7864 | 050C | 1C66 |
| 0001231440 | 0007 | 0081 | 7804 | 6572 | 0F73 | F605 | 081A | 8100 |
| 0001231460 | 0700 | 616C | 7473 | 645F | 1279 | 0205 | 0700 | 8100 |
| 0001231500 | 0A00 | 7279 | 7365 | 755F | 696E | 7374 | 050C | 1C68 |
| 0001231520 | 0007 | 0081 | 7904 | 6572 | 1173 | 7A05 | 0850 | 8200 |
| 0001231540 | 0900 | 6E65 | 5F64 | 6974 | 656D | 1272 | AA05 | 0847 |
| 0001231560 | 8200 | 0A00 | 6E69 | 7469 | 745F | 6D69 | 7265 | 0519 |
| 0001231600 | 1AF8 | 0008 | 07D1 | 7311 | 6165 | 6372 | 5F68 | 6964 |
| 0001231620 | 6572 | 7463 | 6F69 | 736E | 0521 | 1B46 | 0008 | 07D3 |
| 0001231640 | 6419 | 6665 | 7561 | 746C | 735F | 6165 | 6372 | 5F68 |
| 0001231660 | 6964 | 6572 | 7463 | 6F69 | 736E | 0517 | 5076 | 0008 |
| 0001231700 | 0081 | 6C0F | 7361 | 5F74 | 6F6C | 6163 | 6974 | 6E6F |
| 0001231720 | 785F | 0514 | 0000 | 0000 | 0081 | 420C | 5F78 | 6544 |
| 0001231740 | 7562 | 4D67 | 646F | 1765 | 7805 | 0850 | 8100 | 0F00 |
| 0001231760 | 616C | 7473 | 6C5F | 636F | 7461 | 6F69 | 5F6E | 1479 |
| 0001232000 | 0005 | 0000 | 8100 | 0C00 | 7842 | 545F | 6D69 | 7365 |
| 0001232020 | 6F4D | 6564 | 051B | 1B4E | 0008 | 0085 | 6C13 | 7361 |
| 0001232040 | 5F74 | 6F6C | 6163 | 6974 | 6E6F | 6B5F | 6F6E | 6E77 |

THU MAR 14 17:25:16 1991 CRV_IPS.DLL PAGE 309, LINE 18173

| | | | | | | | | |
|---|---|---|---|---|---|---|---|---|
| 0001232060 | 0516 | 1B50 | 0008 | 07DD | 640E | 7269 | 6365 | 6974 |
| 0001232100 | 6E6F | 6E5F | 6D61 | 0565 | 0311 | 0000 | 2200 | 0001 |
| 0001232120 | 9C00 | 4607 | 1000 | 3B00 | 0000 | 0400 | 6313 | 7672 |
| 0001232140 | 735F | 7465 | 695F | 6F63 | 5F6E | 656D | 6772 | 6465 |
| 0001232160 | 0412 | 0006 | 057F | 690C | 6F63 | 5F6E | 6468 | 5F72 |
| 0001232200 | 7470 | 0E72 | 0A04 | 8500 | 0800 | 656E | 5F77 | 6369 |
| 0001232220 | 6E6F | 0201 | 0122 | 0046 | 079E | 01AC | 0010 | 01A1 |
| 0001232240 | 0000 | 1304 | 7263 | 5F76 | 6573 | 5F74 | 6369 | 6E6F |
| 0001232260 | 735F | 6D61 | 6C70 | 1565 | 0604 | 7F00 | 0F05 | 6369 |
| 0001232300 | 6E6F | 735F | 6D61 | 6C70 | 5F65 | 7470 | 1472 | 0A04 |
| 0001232320 | 8500 | 0E00 | 756E | 5F6D | 666F | 735F | 6D61 | 6C70 |
| 0001232340 | 7365 | 0411 | 000C | 0081 | 730B | 6D61 | 6C70 | 5F65 |
| 0001232360 | 6572 | 7463 | 040B | 000E | 00C5 | 6705 | 6172 | 6564 |
| 0001232400 | 040B | FFF0 | 0081 | 6505 | 7272 | 726F | 0408 | FFF2 |
| 0001232420 | 0753 | 6802 | 1570 | FA04 | 60FF | 0F07 | 656D | 6772 |
| 0001232440 | 6465 | 645F | 7461 | 5F61 | 7470 | 0172 | 1E02 | F201 |
| 0001232460 | A001 | 6A07 | 1001 | 5F00 | 0001 | 0400 | 670F | 6E65 |
| 0001232500 | 6D5F | 7265 | 6567 | 5F64 | 7462 | 706D | 0415 | 0006 |
| 0001232520 | 075B | 6D0F | 7265 | 6567 | 5F64 | 7462 | 706D | 705F |
| 0001232540 | 7274 | 0413 | 000A | 075B | 650D | 6764 | 5F65 | 7462 |
| 0001232560 | 706D | 705F | 7274 | 0412 | FFD6 | 0704 | 630C | 6168 |
| 0001232600 | 676E | 5F65 | 6F70 | 6E69 | 0774 | F004 | 81FF | 0100 |
| 0001232620 | 0778 | EE04 | 81FF | 0100 | 1279 | E004 | 81FF | 0C00 |
| 0001232640 | 766F | 796C | 785F | 735F | 6968 | 7466 | 0412 | FFDE |
| 0001232660 | 0081 | 6F0C | 6C76 | 5F79 | 5F79 | 6873 | 6669 | 1174 |
| 0001232700 | E604 | 81FF | 0B00 | 6F78 | 5F72 | 5F78 | 6873 | 6669 |
| 0001232720 | 1174 | E204 | 81FF | 0B00 | 6F78 | 5F72 | 5F79 | 6873 |
| 0001232740 | 6669 | 0874 | EC04 | 81FF | 0200 | 7864 | 0408 | FFE8 |
| 0001232760 | 0081 | 6402 | 1279 | FA04 | 85FF | 0C00 | 616D | 5F78 |
| 0001233000 | 766F | 796C | 635F | 746E | 0411 | FFFC | 0085 | 6D0B |
| 0001233020 | 7861 | 785F | 726F | 635F | 746E | 040E | FFE4 | 0085 |
| 0001233040 | 6F08 | 6C76 | 5F79 | 6E63 | 0D74 | EA04 | 85FF | 0700 |
| 0001233060 | 6F78 | 5F72 | 6E63 | 1574 | F204 | 04FF | 0F07 | 6572 |
| 0001233100 | 6566 | 6172 | 636E | 5F65 | 6F70 | 6E69 | 0174 | 1A02 |
| 0001233120 | 5C01 | A203 | E807 | 1001 | DD00 | 0001 | 0400 | 6D0B |
| 0001233140 | 7265 | 6567 | 625F | 6D74 | 7370 | 0415 | 0006 | 075B |
| 0001233160 | 6D0F | 7265 | 6567 | 5F64 | 7462 | 706D | 705F | 7274 |
| 0001233200 | 0413 | 000A | 075B | 650D | 6764 | 5F65 | 7462 | 706D |
| 0001233220 | 705F | 7274 | 040B | FFF6 | 0081 | 7805 | 635F | 746E |
| 0001233240 | 040B | FFF2 | 0081 | 7905 | 635F | 746E | 0408 | FFF8 |
| 0001233260 | 0081 | 6402 | 0878 | F404 | 81FF | 0200 | 7964 | 040D |
| 0001233300 | FFFA | 0084 | 6407 | 6669 | 5F66 | 6C70 | 040D | FFFC |
| 0001233320 | 0084 | 6907 | 6F63 | 5F6E | 6C70 | 0201 | 0118 | 0544 |
| 0001233340 | 07A4 | 0116 | 0010 | 010B | 0000 | 0904 | 6D63 | 5F70 |
| 0001233360 | 7462 | 706D | 1273 | 0604 | 5B00 | 0C07 | 6261 | 5F73 |
| 0001233400 | 7462 | 706D | 705F | 7274 | 0413 | 000A | 075B | 650D |
| 0001233420 | 6764 | 5F65 | 7462 | 706D | 705F | 7274 | 040D | 000E |
| 0001233440 | 0081 | 7807 | 735F | 6968 | 7466 | 040D | 0010 | 0081 |
| 0001233460 | 7907 | 735F | 6968 | 7466 | 0412 | 0012 | 00C5 | 6F0C |
| 0001233500 | 6C76 | 5F79 | 6E63 | 5F74 | 7470 | 1172 | 1604 | C500 |
| 0001233520 | 0B00 | 6F78 | 5F72 | 6E63 | 5F74 | 7470 | 0B72 | FA04 |
| 0001233540 | 81FF | 0500 | 5F78 | 6E63 | 0B74 | F604 | 81FF | 0500 |
| 0001233560 | 5F79 | 6E63 | 0874 | FC04 | 81FF | 0200 | 7864 | 0408 |
| 0001233600 | FFF8 | 0081 | 6402 | 0179 | 1E02 | 5A01 | A606 | 4F07 |
| 0001233620 | 1000 | 4400 | 0000 | 0400 | 670F | 6E65 | 6D5F | 7265 |
| 0001233640 | 6567 | 5F64 | 6164 | 6174 | 0415 | 0006 | 0760 | 6D0F |
| 0001233660 | 7265 | 6567 | 5F64 | 6164 | 6174 | 705F | 7274 | 0415 |
| 0001233700 | 000A | 075B | 6D0F | 7265 | 6567 | 5F64 | 7462 | 706D |
| 0001233720 | 705F | 7274 | 040B | FFFC | 0081 | 7905 | 635F | 746E |

THU MAR 14 17:25:16 1991 CRV_IPS.DLL PAGE 310, LINE 18232

| | | | | | | | | |
|---|---|---|---|---|---|---|---|---|
| 0001233740 | 0201 | 011C | 06A9 | 07A8 | 00A7 | 0010 | 009C | 0000 |
| 0001233760 | 0D04 | 6567 | 5F6E | 696C | 656E | 645F | 7461 | 1561 |
| 0001234000 | 0604 | 6000 | 0F07 | 656D | 6772 | 6465 | 645F | 7461 |
| 0001234020 | 5F61 | 7470 | 1572 | 0A04 | 5B00 | 0F07 | 656D | 6772 |
| 0001234040 | 6465 | 625F | 6D74 | 5F70 | 7470 | 0E72 | 0E04 | 8100 |
| 0001234060 | 0800 | 696C | 656E | 6E5F | 6D75 | 0415 | FFFA | 00C1 |
| 0001234100 | 650F | 6764 | 5F65 | 6F70 | 6E69 | 7374 | 615F | 7272 |
| 0001234120 | 0414 | FFF6 | 0085 | 6E0E | 6D75 | 6F5F | 5F66 | 6F63 |
| 0001234140 | 7075 | 656C | 0773 | F804 | 85FF | 0100 | 0169 | 1F02 |
| 0001234160 | 5001 | AA07 | B207 | 1000 | A700 | 0000 | 0400 | 6610 |
| 0001234200 | 6E69 | 5F64 | 6465 | 6567 | 705F | 696F | 746E | 1573 |
| 0001234220 | 0604 | 5B00 | 0F07 | 656D | 6772 | 6465 | 625F | 6D74 |
| 0001234240 | 5F70 | 7470 | 0E72 | 0A04 | 8100 | 0800 | 696C | 656E |
| 0001234260 | 6E5F | 6D75 | 0415 | 000C | 00C1 | 650F | 6764 | 5F65 |
| 0001234300 | 6F70 | 6E69 | 7374 | 615F | 7272 | 0418 | 0010 | 00C5 |
| 0001234320 | 6E12 | 6D75 | 6F5F | 5F66 | 6F63 | 7075 | 656C | 5F73 |
| 0001234340 | 7470 | 0772 | FC04 | 81FF | 0100 | 0C69 | F804 | 84FF |
| 0001234360 | 0600 | 6C70 | 765F | 6C61 | 040E | FFF6 | 0084 | 7008 |
| 0001234400 | 6572 | 5F76 | 6176 | 0F6C | FA04 | 85FF | 0900 | 706F |
| 0001234420 | 6E65 | 735F | 6168 | 0170 | 2502 | 0201 | AC08 | D607 |
| 0001234440 | 1001 | CB00 | 0001 | 0400 | 7316 | 6F74 | 6572 | 645F |
| 0001234460 | 7465 | 6365 | 6974 | 6E6F | 705F | 696F | 746E | 1573 |
| 0001234500 | 0604 | 5B00 | 0F07 | 656D | 6772 | 6465 | 625F | 6D74 |
| 0001234520 | 5F70 | 7470 | 0E72 | 0A04 | 8100 | 0800 | 696C | 656E |
| 0001234540 | 6E5F | 6D75 | 0415 | 000C | 00C1 | 650F | 6764 | 5F65 |
| 0001234560 | 6F70 | 6E69 | 7374 | 615F | 7272 | 0412 | 0010 | 0085 |
| 0001234600 | 630C | 756F | 6C70 | 5F65 | 6E69 | 6564 | 1578 | 1204 |
| 0001234620 | 6000 | 0F07 | 656D | 6772 | 6465 | 645F | 7461 | 5F61 |
| 0001234640 | 7470 | 0E72 | E204 | ADFF | 0807 | 696C | 656E | 705F |
| 0001234660 | 7274 | 040B | FFE6 | 0081 | 6F05 | 7366 | 3174 | 040B |
| 0001234700 | FFE0 | 0081 | 6F05 | 7366 | 3274 | 040B | FFEA | 0081 |
| 0001234720 | 7805 | 635F | 746E | 0409 | FFEC | 0084 | 7003 | 306C |
| 0001234740 | 0409 | FFE8 | 0084 | 7003 | 316C | 040C | FFF6 | 072C |
| 0001234760 | 7006 | 696F | 746E | 0C31 | EE04 | 2CFF | 0607 | 6F70 |
| 0001235000 | 6E69 | 3274 | 041E | FFDE | 0085 | 7318 | 6365 | 6E6F |
| 0001235020 | 5F64 | 6465 | 6567 | 705F | 696F | 746E | 6F5F | 6666 |
| 0001235040 | 6573 | 0174 | 2102 | D801 | AF09 | BC07 | 1000 | B100 |
| 0001235060 | 0000 | 0400 | 6D12 | 766F | 5F65 | 5F32 | 656E | 5F77 |
| 0001235100 | 6F62 | 6472 | 7265 | 1573 | 0604 | 6000 | 0F07 | 656D |
| 0001235120 | 6772 | 6465 | 645F | 7461 | 5F61 | 7470 | 0E72 | 0A04 |
| 0001235140 | 7F00 | 0805 | 6369 | 6E6F | 705F | 7274 | 040B | FFFC |
| 0001235160 | 0081 | 6505 | 7272 | 726F | 0201 | 011D | 0A94 | 07B1 |
| 0001235200 | 0100 | 0010 | 00F5 | 0000 | 0E04 | 6564 | 6574 | 7463 |
| 0001235220 | 625F | 726F | 6564 | 7372 | 0415 | 0006 | 0760 | 6D0F |
| 0001235240 | 7265 | 6567 | 5F64 | 6164 | 6174 | 705F | 7274 | 0410 |
| 0001235260 | 000A | 0729 | 640A | 6373 | 7072 | 5F74 | 7470 | 0E72 |
| 0001235300 | F404 | ADFF | 0807 | 696C | 656E | 705F | 7274 | 0407 |
| 0001235320 | FFFC | 0081 | 6901 | 0407 | FFFA | 0081 | 6A01 | 040A |
| 0001235340 | FFF8 | 0081 | 6F04 | 7366 | 0174 | 1E02 | 9401 | B30B |
| 0001235360 | D407 | 1000 | C900 | 0000 | 0400 | 730F | 6968 | 7466 |
| 0001235400 | 685F | 746F | 705F | 696F | 746E | 040E | 0006 | 057F |
| 0001235420 | 6908 | 6F63 | 5F6E | 7470 | 1072 | FA04 | 29FF | 0A07 |
| 0001235440 | 7364 | 7263 | 7470 | 705F | 7274 | 0201 | 011B | 0C68 |
| 0001235460 | 07B5 | 020B | 0010 | 0200 | 0000 | 0C04 | 6873 | 6669 |
| 0001235500 | 5F74 | 6F70 | 6E69 | 7374 | 0415 | 0006 | 0760 | 6D0F |
| 0001235520 | 7265 | 6567 | 5F64 | 6164 | 6174 | 705F | 7274 | 0410 |
| 0001235540 | 000A | 0729 | 640A | 6373 | 7072 | 5F74 | 7470 | 0E72 |
| 0001235560 | F204 | ADFF | 0807 | 696C | 656E | 705F | 7274 | 0407 |
| 0001235600 | FFF8 | 0081 | 6901 | 0411 | FFFC | 0081 | 690B | 6F63 |

THU MAR 14 17:25:16 1991 CRV_IPS.DLL PAGE 311, LINE 18291

| | | | | | | | | |
|---|---|---|---|---|---|---|---|---|
| 0001235620 | 5F6E | 6568 | 6769 | 7468 | 0410 | FFFA | 0081 | 690A |
| 0001235640 | 6F63 | 5F6E | 6977 | 7464 | 0768 | F604 | 81FF | 0100 |
| 0001235660 | 016A | 1C02 | 7301 | B70E | 5507 | 1000 | 4A00 | 0000 |
| 0001235700 | 0400 | 730D | 6968 | 7466 | 625F | 726F | 6564 | 7372 |
| 0001235720 | 0410 | 0006 | 0729 | 640A | 6373 | 7072 | 5F74 | 7470 |
| 0001235740 | 0172 | 1902 | C801 | B90E | C307 | 1000 | B800 | 0000 |
| 0001235760 | 0400 | 610A | 6C6C | 636F | 625F | 6D74 | 1370 | 0604 |
| 0001236000 | 7100 | 0D07 | 6465 | 6567 | 625F | 6D74 | 5F70 | 6461 |
| 0001236020 | 0F72 | FC04 | 85FF | 0900 | 7462 | 706D | 735F | 7A69 |
| 0001236040 | 0165 | 1802 | 8B01 | BB0F | 8E07 | 1000 | 8300 | 0000 |
| 0001236060 | 0400 | 7009 | 7475 | 705F | 7869 | 6C65 | 0409 | 0006 |
| 0001236100 | 00C4 | 7303 | 6372 | 040C | 000A | 0084 | 7006 | 5F6C |
| 0001236120 | 6176 | 0B6C | 0C04 | 8500 | 0500 | 5F78 | 6E63 | 0B74 |
| 0001236140 | 0E04 | 8500 | 0500 | 5F79 | 6E63 | 0174 | 1802 | 1901 |
| 0001236160 | BD10 | 6D07 | 1000 | 6200 | 0000 | 0400 | 6709 | 7465 |
| 0001236200 | 705F | 7869 | 6C65 | 0409 | 0006 | 00C4 | 7303 | 6372 |
| 0001236220 | 040B | 000A | 0085 | 7805 | 635F | 746E | 040B | 000C |
| 0001236240 | 0085 | 7905 | 635F | 746E | 040C | FFFC | 0084 | 6F06 |
| 0001236260 | 7475 | 705F | 016C | 1D02 | 8601 | BF10 | 7A07 | 1000 |
| 0001236300 | 6F00 | 0000 | 0400 | 660E | 6572 | 5F65 | 6465 | 6567 |
| 0001236320 | 625F | 6D74 | 1770 | 0604 | 7100 | 1107 | 6465 | 6567 |
| 0001236340 | 625F | 6D74 | 5F70 | 7470 | 5F72 | 6461 | 0172 | 1F02 |
| 0001236360 | 0001 | C111 | 9607 | 1000 | 8B00 | 0000 | 0400 | 6110 |
| 0001236400 | 6C6C | 636F | 6C5F | 6165 | 6E72 | 6C5F | 7369 | 1574 |
| 0001236420 | 0604 | 6000 | 0F07 | 656D | 6772 | 6465 | 645F | 7461 |
| 0001236440 | 5F61 | 7470 | 1472 | 0A04 | 7A00 | 0E07 | 656C | 7261 |
| 0001236460 | 5F6E | 696C | 7473 | 705F | 7274 | 0201 | 011E | 1196 |
| 0001236500 | 07C3 | 0041 | 0010 | 0036 | 0000 | 0F04 | 7266 | 6565 |
| 0001236520 | 6C5F | 6165 | 6E72 | 6C5F | 7369 | 1474 | 0604 | 7A00 |
| 0001236540 | 0E07 | 656C | 7261 | 5F6E | 696C | 7473 | 705F | 7274 |
| 0001236560 | 0201 | 0124 | 11D7 | 07C5 | 009D | 0010 | 0092 | 0000 |
| 0001236600 | 1504 | 6966 | 646E | 665F | 7269 | 7473 | 645F | 6669 |
| 0001236620 | 5F66 | 6F70 | 6E69 | 1374 | 0604 | 5B00 | 0D07 | 6465 |
| 0001236640 | 6567 | 625F | 6D74 | 5F70 | 7470 | 0F72 | 0A04 | 5000 |
| 0001236660 | 0907 | 6F70 | 6E69 | 5F74 | 7470 | 0B72 | FC04 | 81FF |
| 0001236700 | 0500 | 5F78 | 6E63 | 0B74 | FA04 | 81FF | 0500 | 5F79 |
| 0001236720 | 6E63 | 1074 | F804 | 85FF | 0A00 | 7262 | 6165 | 5F6B |
| 0001236740 | 6C66 | 6761 | 0201 | 011C | 1274 | 07C7 | 0103 | 0010 |
| 0001236760 | 00F8 | 0000 | 0D04 | 706F | 6974 | 696D | 657A | 645F |
| 0001237000 | 7461 | 1561 | 0604 | 6000 | 0F07 | 656D | 6772 | 6465 |
| 0001237020 | 645F | 7461 | 5F61 | 7470 | 0E72 | 0A04 | 7F00 | 0805 |
| 0001237040 | 6369 | 6E6F | 705F | 7274 | 040B | FFFC | 0081 | 6505 |
| 0001237060 | 7272 | 726F | 0410 | FFF0 | 074F | 6CCA | 6165 | 6E72 |
| 0001237100 | 6C5F | 7369 | ^174 | 1AD2 | 7701 | C913 | A707 | 1000 |
| 0001237120 | 9C00 | 0000 | 0400 | 670B | 6E65 | 735F | 7571 | 7261 |
| 0001237140 | 7365 | 0415 | 0006 | 0760 | 6D0F | 7265 | 6567 | 5F64 |
| 0001237160 | 6164 | 6174 | 705F | 7274 | 0414 | 000A | 077A | 6C0E |
| 0001237200 | 6165 | 6E72 | 6C5F | 7369 | 5F74 | 7470 | 1472 | F604 |
| 0001237220 | 85FF | 0E00 | 756E | 5F6D | 666F | 735F | 7571 | 7261 |
| 0001237240 | 7365 | 040C | FFF8 | 074B | 7306 | 7571 | 7261 | 0765 |
| 0001237260 | F404 | 85FF | 0100 | 0769 | F204 | 85FF | 0100 | 016A |
| 0001237300 | 2302 | 1E01 | CB14 | 1F07 | 1001 | 1400 | 0001 | 0400 |
| 0001237320 | 7214 | 7365 | 7465 | 645F | 7365 | 7263 | 7069 | 6F74 |
| 0001237340 | 5F72 | 6164 | 0E74 | 0604 | 7F00 | 0805 | 6369 | 6E6F |
| 0001237360 | 705F | 7274 | 0410 | FFEE | 0729 | 640A | 6373 | 7072 |
| 0001237400 | 5F74 | 7470 | 0E72 | F604 | CCFF | 0807 | 696C | 7473 |
| 0001237420 | 705F | 7274 | 0407 | FFE8 | 0085 | 6901 | 0418 | FFEA |
| 0001237440 | 0784 | 7612 | 7265 | 615F | 6363 | 7365 | 5F73 | 6174 |
| 0001237460 | 5F62 | 7470 | 1872 | FA04 | 84FF | 1207 | 7268 | 5F7A |

THU MAR 14 17:25:16 1991 CRV_IPS.DLL PAGE 312, LINE 18350

| | | | | | | | | |
|---|---|---|---|---|---|---|---|---|
| 0001237500 | 6361 | 6563 | 7373 | 745F | 6261 | 705F | 7274 | 040F |
| 0001237520 | FFF2 | 00C0 | 7609 | 7265 | 745F | 6261 | 656C | 040F |
| 0001237540 | FFE4 | 00C0 | 6809 | 7A72 | 745F | 6261 | 656C | 0201 |
| 0001237560 | 0122 | 153D | 07CE | 0051 | 0010 | 0046 | 0000 | 1304 |
| 0001237600 | 7562 | 6C69 | 5F64 | 6361 | 6563 | 7373 | 745F | 6261 |
| 0001237620 | 656C | 1473 | 0604 | 7A00 | 0E07 | 656C | 7261 | 5F6E |
| 0001237640 | 696C | 7473 | 705F | 7274 | 040E | 000A | 057F | 6908 |
| 0001237660 | 6F63 | 5F6E | 7470 | 0172 | 2002 | 8E01 | D015 | 3307 |
| 0001237700 | 1001 | 2800 | 0001 | 0400 | 6211 | 6975 | 646C | 705F |
| 0001237720 | 696F | 746E | 5F73 | 696C | 7473 | 0414 | 0006 | 077A |
| 0001237740 | 6C0E | 6165 | 6E72 | 6C5F | 7369 | 5F74 | 7470 | 0E72 |
| 0001237760 | 0A04 | 7F00 | 0805 | 6369 | 6E6F | 705F | 7274 | 0410 |
| 0001240000 | FFF6 | 0729 | 640A | 6373 | 7072 | 5F74 | 7470 | 0772 |
| 0001240020 | F404 | 85FF | 0100 | 0E69 | FA04 | CCFF | 0807 | 696C |
| 0001240040 | 7473 | 705F | 7274 | 0201 | 012D | 16C1 | 07D2 | 0171 |
| 0001240060 | 0010 | 0166 | 0000 | 1E04 | 7562 | 6C69 | 5F64 | 656C |
| 0001240100 | 7466 | 725F | 6769 | 7468 | 615F | 6363 | 7365 | 5F73 |
| 0001240120 | 6174 | 6C62 | 7365 | 040E | 0006 | 057F | 6908 | 6F63 |
| 0001240140 | 5F6E | 7470 | 1072 | FA04 | 29FF | 0A07 | 7364 | 7263 |
| 0001240160 | 7470 | 705F | 7274 | 040F | FFF6 | 0783 | 7309 | 6168 |
| 0001240200 | 6570 | 705F | 7274 | 0410 | FFE4 | 07D3 | 6C0A | 6F6F |
| 0001240220 | 756B | 5F70 | 7470 | 1472 | E804 | 84FF | 0E07 | 6361 |
| 0001240240 | 6563 | 7373 | 745F | 6261 | 705F | 7274 | 040B | FFF0 |
| 0001240260 | 00C0 | 7405 | 6261 | 656C | 0410 | FFF4 | 0081 | 690A |
| 0001240300 | 6F63 | 5F6E | 6977 | 7464 | 0768 | EC04 | 80FF | 0100 |
| 0001240320 | 0C69 | EE04 | 80FF | 0600 | 7270 | 5F76 | 6C76 | 0201 |
| 0001240340 | 012A | 1832 | 07D5 | 0171 | 0010 | 0166 | 0000 | 1B04 |
| 0001240360 | 7562 | 6C69 | 5F64 | 7075 | 645F | 776F | 5F6E | 6361 |
| 0001240400 | 6563 | 7373 | 745F | 6261 | 656C | 0E73 | 0604 | 7F00 |
| 0001240420 | 0805 | 6369 | 6E6F | 705F | 7274 | 0407 | FFEC | 0080 |
| 0001240440 | 6901 | 040C | FFEE | 0080 | 7006 | 7672 | 765F | 106C |
| 0001240460 | F804 | 29FF | 0A07 | 7364 | 7263 | 7470 | 705F | 7274 |
| 0001240500 | 040F | FFF4 | 0783 | 7309 | 6168 | 6570 | 705F | 7274 |
| 0001240520 | 0410 | FFE4 | 07D3 | 6C0A | 6F6F | 756B | 5F70 | 7470 |
| 0001240540 | 1472 | E804 | 84FF | 0E07 | 6361 | 6563 | 7373 | 745F |
| 0001240560 | 6261 | 705F | 7274 | 040B | FFFD | 00C0 | 7405 | 6261 |
| 0001240600 | 656C | 0411 | FFFC | 0081 | 690B | 6F63 | 5F6E | 6568 |
| 0001240620 | 6769 | 7468 | 0201 | 012A | 19A3 | 07D7 | 00A1 | 0010 |
| 0001240640 | 0096 | 0000 | 1B04 | 6E65 | 6574 | 5F72 | 666F | 7366 |
| 0001240660 | 7465 | 5F73 | 5F32 | 7075 | 645F | 776F | 5F6E | 6274 |
| 0001240700 | 0F6C | 0604 | 8300 | 0907 | 6873 | 7061 | 5F65 | 7470 |
| 0001240720 | 0A72 | 0A04 | 8000 | 0400 | 696C | 656E | 0411 | 000C |
| 0001240740 | 0081 | 690B | 6F63 | 5F6E | 6568 | 6769 | 7468 | 0411 |
| 0001240760 | 000E | 0081 | 680B | 746F | 705F | 696F | 746E | 795F |
| 0001241000 | 0414 | 0010 | 0784 | 610E | 6363 | 7365 | 5F73 | 6174 |
| 0001241020 | 5F62 | 7470 | 0772 | FC04 | 85FF | 0100 | 0169 | 2D02 |
| 0001241040 | 4401 | D91A | A107 | 1000 | 9600 | 0000 | 0400 | 651E |
| 0001241060 | 746E | 7265 | 6F5F | 6666 | 6573 | 7374 | 325F | 6C5F |
| 0001241100 | 6665 | 5F74 | 6972 | 6867 | 5F74 | 6274 | 0F6C | 0604 |
| 0001241120 | 8300 | 0907 | 6873 | 7061 | 5F65 | 7470 | 0C72 | 0A04 |
| 0001241140 | 8000 | 0600 | 6F63 | 756C | 6E6D | 0410 | 000C | 0081 |
| 0001241160 | 690A | 6F63 | 5F6E | 6977 | 7464 | 1168 | 0E04 | 8100 |
| 0001241200 | 0B00 | 6F68 | 5F74 | 6F70 | 6E69 | 5F74 | 1478 | 1004 |
| 0001241220 | 8400 | 0E07 | 6361 | 6563 | 7373 | 745F | 6261 | 705F |
| 0001241240 | 7274 | 0407 | FFFC | 0085 | 6901 | 0201 | 0129 | 1AE5 |
| 0001241260 | 07DB | 0051 | 0010 | 0046 | 0000 | 1A04 | 6E65 | 6574 |
| 0001241300 | 5F72 | 6F70 | 6E69 | 5F74 | 5F32 | 6361 | 6563 | 7373 |
| 0001241320 | 745F | 6261 | 656C | 040F | 0006 | 0783 | 7309 | 6168 |
| 0001241340 | 6570 | 705F | 7274 | 040C | 000A | 0085 | 6F06 | 6666 |

THU MAR 14 17:25:16 1991 CRV_IPS.DLL PAGE 313, LINE 18409

| | | | | | | | | |
|---|---|---|---|---|---|---|---|---|
| 0001241360 | 6573 | 1474 | 0C04 | 8400 | 0E07 | 6361 | 6563 | 7373 |
| 0001241400 | 745F | 6261 | 705F | 7274 | 0201 | 0122 | 1B36 | 07DD |
| 0001241420 | 003D | 0010 | 0032 | 0000 | 1304 | 7562 | 6C69 | 5F64 |
| 0001241440 | 7473 | 6972 | 7370 | 745F | 6261 | 656C | 0E73 | 0604 |
| 0001241460 | 7F00 | 0805 | 6369 | 6E6F | 705F | 7274 | 0201 | 012C |
| 0001241500 | 1B73 | 07DF | 0146 | 0010 | 013B | 0000 | 1D04 | 7562 |
| 0001241520 | 6C69 | 5F64 | 656C | 7466 | 725F | 6769 | 7468 | 625F |
| 0001241540 | 726F | 6564 | 5F72 | 6174 | 6C62 | 0E65 | 0604 | 7F00 |
| 0001241560 | 0805 | 6369 | 6E6F | 705F | 7274 | 0410 | FFF8 | 0729 |
| 0001241600 | 640A | 6373 | 7072 | 5F74 | 7470 | 0B72 | F204 | C0FF |
| 0001241620 | 0500 | 6174 | 6C62 | 1165 | FC04 | 85FF | 0B00 | 7473 |
| 0001241640 | 6972 | 5F70 | 6977 | 7464 | 1068 | F604 | 81FF | 0A00 |
| 0001241660 | 6369 | 6E6F | 775F | 6469 | 6874 | 0407 | FFF0 | 0081 |
| 0001241700 | 6901 | 0201 | 0129 | 1CB9 | 07E1 | 0146 | 0010 | 013B |
| 0001241720 | 0000 | 1A04 | 7562 | 6C69 | 5F64 | 7075 | 645F | 776F |
| 0001241740 | 5F6E | 6F62 | 6472 | 7265 | 745F | 6261 | 656C | 040E |
| 0001241760 | 0006 | 057F | 6908 | 6F63 | 5F6E | 7470 | 1072 | F804 |
| 0001242000 | 29FF | 0A07 | 7364 | 7263 | 7470 | 705F | 7274 | 040B |
| 0001242020 | FFF4 | 00C0 | 7405 | 6261 | 656C | 0412 | FFF0 | 0085 |
| 0001242040 | 730C | 7274 | 7069 | 685F | 6965 | 6867 | 1174 | FC04 |
| 0001242060 | 81FF | 0B00 | 6369 | 6E6F | 685F | 6965 | 6867 | 0774 |
| 0001242100 | F204 | 81FF | 0100 | 0169 | 1902 | FF01 | E31D | 5907 |
| 0001242120 | 1000 | 4E00 | 0000 | 0400 | 670A | 7465 | 735F | 7571 |
| 0001242140 | 7261 | 1065 | 0604 | 8900 | 0A07 | 7173 | 6175 | 6572 |
| 0001242160 | 705F | 7274 | 0415 | 000A | 0085 | 700F | 7261 | 6974 |
| 0001242200 | 6974 | 6E6F | 6C5F | 7665 | 6C65 | 0412 | 000C | 0085 |
| 0001242220 | 730C | 7571 | 7261 | 5F65 | 6E69 | 6564 | 0978 | FA04 |
| 0001242240 | 85FF | 0300 | 6E6F | 0C65 | FC04 | 85FF | 0600 | 6964 |
| 0001242260 | 656D | 736E | 0201 | 011D | 1E58 | 07E5 | 0189 | 0010 |
| 0001242300 | 017E | 0000 | 0E04 | 7270 | 636F | 7365 | 5F73 | 7173 |
| 0001242320 | 6175 | 6572 | 0415 | 0006 | 0760 | 6D0F | 7265 | 6567 |
| 0001242340 | 5F64 | 6164 | 6174 | 705F | 7274 | 040C | 000A | 074B |
| 0001242360 | 7306 | 7571 | 7261 | 1465 | 1004 | 7A00 | 0E07 | 656C |
| 0001242400 | 7261 | 5F6E | 696C | 7473 | 705F | 7274 | 040E | FFF2 |
| 0001242420 | 0081 | 6C08 | 6E69 | 5F65 | 756E | 0E6D | E804 | 81FF |
| 0001242440 | 0800 | 696D | 5F6E | 696C | 656E | 0413 | FFDE | 0081 |
| 0001242460 | 6D0D | 6E69 | 655F | 6764 | 5F65 | 696C | 656E | 0409 |
| 0001242500 | FFEA | 0081 | 6403 | 7473 | 040C | FFFC | 0081 | 6406 |
| 0001242520 | 6D69 | 6E65 | 0C73 | F404 | 81FF | 0600 | 666F | 7366 |
| 0001242540 | 7465 | 040B | FFFA | 0081 | 6D05 | 6469 | 785F | 040B |
| 0001242560 | FFF6 | 0081 | 6D05 | 6469 | 795F | 0407 | FFF0 | 0081 |
| 0001242600 | 6901 | 0407 | FFEE | 0081 | 6A01 | 040F | FFEC | 0081 |
| 0001242620 | 6D09 | 6E69 | 695F | 646E | 7865 | 0414 | FFE0 | 0081 |
| 0001242640 | 6D0E | 6E69 | 655F | 6764 | 5F65 | 6E69 | 6564 | 0081 |
| 0001242660 | E204 | 81FF | 0700 | 696D | 5F6E | 7364 | 6564 | 0D78 |
| 0001242700 | 81FF | 0C00 | 696D | 5F6E | 6465 | 6567 | 1274 | F804 |
| 0001242720 | 040E | FFE4 | 07AD | 6C08 | 6E69 | 5F65 | 645F | 7473 |
| 0001242740 | 2402 | E101 | E71F | 7B07 | 1001 | 7000 | 7470 | 0172 |
| 0001242760 | 6D15 | 5F76 | 6F70 | 6E69 | 5F74 | 5F32 | 0001 | 0400 |
| 0001243000 | 5F6E | 696C | 7473 | 0415 | 0006 | 0760 | 656C | 7261 |
| 0001243020 | 6567 | 5F64 | 6164 | 6174 | 705F | 7274 | 6D0F | 7265 |
| 0001243040 | 0081 | 6905 | 646E | 7865 | 040A | 000C | 040B | 000A |
| 0001243060 | 6E69 | 1465 | 0E04 | 7A00 | 0E07 | 656C | 0081 | 6C04 |
| 0001243100 | 696C | 7473 | 705F | 7274 | 040E | FFF8 | 7261 | 5F6E |
| 0001243120 | 6E69 | 5F65 | 7470 | 1172 | FC04 | 85FF | 07AD | 6C08 |
| 0001243140 | 7261 | 5F6E | 6E69 | 6564 | 0F78 | F404 | 0B00 | 656C |
| 0001243160 | 6F70 | 6E69 | 5F74 | 7470 | 0572 | 0900 | 50FF | 0907 |
| 0001243200 | F204 | 81FF | 0100 | 0169 | 0102 | 2E02 | 4821 | 0700 |
| 0001243220 | AC07 | 1000 | A100 | 0000 | 0400 | 631F | 5C01 | E921 |

THU MAR 14 17:25:16 1991 CRV_IPS.DLL PAGE 314, LINE 18468

| | | | | | | | | |
|---|---|---|---|---|---|---|---|---|
| 0001243240 | 7472 | 645F | 6373 | 7072 | 5F74 | 6164 | 6174 | 325F |
| 0001243260 | 675F | 5F70 | 6F66 | 6D72 | 7461 | 0415 | 0006 | 076D |
| 0001243300 | 6D0F | 7265 | 6567 | 5F64 | 6164 | 6174 | 705F | 7274 |
| 0001243320 | 040E | 000A | 057F | 6908 | 6F63 | 5F6E | 7470 | 0B72 |
| 0001243340 | FC04 | 81FF | 0500 | 7265 | 6F72 | 0172 | 1D02 | 0801 |
| 0001243360 | EB22 | 4307 | 1000 | 3800 | 0000 | 0400 | 750E | 6470 |
| 0001243400 | 5F74 | 6369 | 6E6F | 6D5F | 646F | 1565 | 0604 | 6000 |
| 0001243420 | 0F07 | 656D | 6772 | 6465 | 645F | 7461 | 5F61 | 7470 |
| 0001243440 | 1072 | 0A04 | 2900 | 0A07 | 7364 | 7263 | 7470 | 705F |
| 0001243460 | 7274 | 0201 | 012A | 224B | 07ED | 006A | 0010 | 005F |
| 0001243500 | 0000 | 1B04 | 6F63 | 766E | 7265 | 5F74 | 6F62 | 6472 |
| 0001243520 | 7265 | 5F73 | 5F32 | 7067 | 665F | 726F | 616D | 0E74 |
| 0001243540 | 0604 | 7F00 | 0805 | 6369 | 6E6F | 705F | 7274 | 0410 |
| 0001243560 | FFFA | 0729 | 640A | 6373 | 7072 | 5F74 | 7470 | 0172 |
| 0001243600 | 2902 | B501 | EF22 | 3207 | 1001 | 2700 | 0001 | 0400 |
| 0001243620 | 631A | 6E6F | 6576 | 7472 | 705F | 696F | 746E | 5F73 |
| 0001243640 | 5F32 | 7067 | 665F | 726F | 616D | 0E74 | 0604 | 7F00 |
| 0001243660 | 0805 | 6369 | 6E6F | 705F | 7274 | 0410 | FFFA | 0729 |
| 0001243700 | 640A | 6373 | 7072 | 5F74 | 7470 | 0772 | F804 | 85FF |
| 0001243720 | 0100 | 0869 | F004 | 82FF | 0200 | 7864 | 0408 | FFEC |
| 0001243740 | 0082 | 6402 | 1479 | F404 | CCFF | 0E07 | 6F70 | 6E69 |
| 0001243760 | 5F74 | 696C | 7473 | 705F | 7274 | 0201 | 0123 | 23E7 |
| 0001244000 | 07F1 | 009B | 0010 | 0090 | 0000 | 1404 | 6572 | 6573 |
| 0001244020 | 5F74 | 6564 | 6574 | 7463 | 6F69 | 5F6E | 6164 | 6174 |
| 0001244040 | 0415 | 0006 | 057F | 690F | 6F63 | 5F6E | 6173 | 706D |
| 0001244060 | 656C | 705F | 7274 | 040E | 000A | 057F | 6908 | 6F63 |
| 0001244100 | 5F6E | 7470 | 0F72 | FC04 | 85FF | 0900 | 7462 | 706D |
| 0001244120 | 735F | 7A69 | 0165 | 2602 | 8201 | F324 | BA07 | 1000 |
| 0001244140 | AF00 | 0000 | 0400 | 6717 | 6E65 | 7265 | 7461 | 5F65 |
| 0001244160 | 6564 | 6574 | 7463 | 6F69 | 5F6E | 6164 | 6174 | 040E |
| 0001244200 | 0006 | 057F | 6908 | 6F63 | 5F6E | 7470 | 1572 | 0A04 |
| 0001244220 | 6000 | 0F07 | 656D | 6772 | 6465 | 645F | 7461 | 5F61 |
| 0001244240 | 7470 | 1572 | F804 | 5BFF | 0F07 | 656D | 6772 | 6465 |
| 0001244260 | 625F | 6D74 | 5F70 | 7470 | 0B72 | FC04 | 81FF | 0500 |
| 0001244300 | 7265 | 6F72 | 0172 | 1F02 | 3C01 | F525 | 1507 | 1003 |
| 0001244320 | 0A00 | 0003 | 0400 | 6C10 | 636F | 7461 | 5F65 | 6F68 |
| 0001244340 | 5F74 | 6F70 | 6E69 | 1574 | 0604 | 7F00 | 0F05 | 6369 |
| 0001244360 | 6E6F | 735F | 6D61 | 6C70 | 5F65 | 7470 | 0E72 | 0A04 |
| 0001244400 | 7F00 | 0805 | 6369 | 6E6F | 705F | 7274 | 0411 | 000E |
| 0001244420 | 0081 | 730B | 6D61 | 6C70 | 5F65 | 6572 | 7463 | 040D |
| 0001244440 | FFE2 | 0085 | 7807 | 726F | 635F | 746E | 0413 | FFE4 |
| 0001244460 | 075B | 650D | 6764 | 5F65 | 7462 | 706D | 705F | 7274 |
| 0001244500 | 0415 | FFEA | 075B | 6D0F | 7265 | 6567 | 5F64 | 7462 |
| 0001244520 | 706D | 705F | 7274 | 0415 | FFF2 | 0704 | 720F | 6665 |
| 0001244540 | 7265 | 6E61 | 6563 | 705F | 696F | 746E | 0412 | FFCE |
| 0001244560 | 0704 | 630C | 6168 | 676E | 5F65 | 6F70 | 6E69 | 0774 |
| 0001244600 | F004 | 81FF | 0100 | 0778 | EE04 | 81FF | 0100 | 1279 |
| 0001244620 | D804 | 81FF | 0C00 | 766F | 796C | 785F | 735F | 6968 |
| 0001244640 | 7466 | 0412 | FFD6 | 0081 | 6F0C | 6C76 | 5F79 | 5F79 |
| 0001244660 | 6873 | 6669 | 1174 | DE04 | 81FF | 0B00 | 6F78 | 5F72 |
| 0001244700 | 5F78 | 6873 | 6669 | 1174 | DA04 | 81FF | 0B00 | 6F78 |
| 0001244720 | 5F72 | 5F79 | 6873 | 6669 | 0874 | E804 | 81FF | 0200 |
| 0001244740 | 7864 | 0408 | FFE0 | 0081 | 6402 | 1279 | FA04 | 85FF |
| 0001244760 | 0C00 | 616D | 5F78 | 766F | 796C | 635F | 746E | 0411 |
| 0001245000 | FFFC | 0085 | 6D0B | 7861 | 785F | 726F | 635F | 746E |
| 0001245020 | 040E | FFDC | 0085 | 6F08 | 6C76 | 5F79 | 6E63 | 0174 |
| 0001245040 | 2202 | 5101 | F728 | 7A07 | 1001 | 6F00 | 0001 | 0400 |
| 0001245060 | 6D13 | 7265 | 6567 | 6E5F | 7765 | 695F | 6F63 | 5F6E |
| 0001245100 | 6164 | 6174 | 0415 | 0006 | 057F | 690F | 6F63 | 5F6E |

THU MAR 14 17:25:16 1991 CRV_IPS.DLL PAGE 315, LINE 18527

| | | | | | | | | |
|---|---|---|---|---|---|---|---|---|
| 0001245120 | 6173 | 706D | 656C | 705F | 7274 | 040E | 000A | 057F |
| 0001245140 | 6908 | 6F63 | 5F6E | 7470 | 1372 | F404 | 5BFF | 0D07 |
| 0001245160 | 6465 | 6567 | 625F | 6D74 | 5F70 | 7470 | 1572 | F804 |
| 0001245200 | 5BFF | 0F07 | 656D | 6772 | 6465 | 625F | 6D74 | 5F70 |
| 0001245220 | 7470 | 0B72 | FC04 | 81FF | 0500 | 7265 | 6F72 | 0172 |
| 0001245240 | 1702 | CB01 | F929 | 3C07 | 1000 | 3100 | 0000 | 0400 |
| 0001245260 | 7308 | 6F74 | 6572 | 685F | 0E70 | 0604 | 7F00 | 0805 |
| 0001245300 | 6369 | 6E6F | 705F | 7274 | 040C | 000A | 0796 | 6806 |
| 0001245320 | 5F70 | 7470 | 0172 | 1902 | 0701 | FB2A | 3507 | 1000 |
| 0001245340 | 2A00 | 0000 | 0400 | 720A | 7365 | 6F74 | 6572 | 685F |
| 0001245360 | 0E70 | 0604 | 7F00 | 0805 | 6369 | 6E6F | 705F | 7274 |
| 0001245400 | 0408 | 000A | 0753 | 6802 | 0170 | 2702 | 3C01 | FD2A |
| 0001245420 | 9107 | 1000 | 8600 | 0000 | 0400 | 7018 | 6572 | 6170 |
| 0001245440 | 6572 | 695F | 6F63 | 5F6E | 6F66 | 5F72 | 6964 | 7073 |
| 0001245460 | 616C | 0E79 | 0604 | 7F00 | 0805 | 6369 | 6E6F | 705F |
| 0001245500 | 7274 | 0407 | FFFC | 0085 | 6901 | 0407 | FFFA | 0085 |
| 0001245520 | 6A01 | 0201 | 0D05 | 0000 | 001A | 0518 | 549E | 0008 |
| 0001245540 | 057F | 6310 | 7275 | 6572 | 746E | 695F | 6F63 | 5F6E |
| 0001245560 | 7470 | 1672 | 2605 | 0821 | 8500 | 0E00 | 656C | 7261 |
| 0001245600 | 5F6E | 656E | 5F77 | 6369 | 6E6F | 0510 | 0F06 | 0007 |
| 0001245620 | 067B | 6908 | 7370 | 645F | 7461 | 0561 | 0311 | 0000 |
| 0001245640 | 1C00 | CE01 | E22A | 5A05 | 1600 | 4E00 | 0000 | 0400 |
| 0001245660 | 630D | 7672 | 695F | 696E | 5F74 | 6369 | 6E6F | 040B |
| 0001245700 | FFE6 | 05A0 | 7405 | 6172 | 736E | 0201 | 011B | 2B28 |
| 0001245720 | 05E3 | 0067 | 0016 | 005B | 0000 | 0C04 | 7263 | 5F76 |
| 0001245740 | 6E65 | 5F64 | 6369 | 6E6F | 040B | FFFC | 0081 | 6505 |
| 0001245760 | 7272 | 726F | 0201 | 011F | 2B8F | 05E5 | 1ACE | 0016 |
| 0001246000 | 1AC0 | 0000 | 1004 | 7263 | 5F76 | 6F63 | 746E | 6F72 |
| 0001246020 | 5F6C | 6369 | 6E6F | 040F | 0006 | 04F7 | 6509 | 6576 |
| 0001246040 | 746E | 705F | 7274 | 040C | FFFA | 00C0 | 5F06 | 745F |
| 0001246060 | 7079 | 0F65 | EC04 | 85FF | 0900 | 5F5F | 7862 | 745F |
| 0001246100 | 7079 | 0D65 | DA04 | EAFF | 0705 | 5F5F | 7270 | 6E69 |
| 0001246120 | 0B74 | D204 | 02FF | 0502 | 5F5F | 766C | 0D6C | DE04 |
| 0001246140 | ECFF | 0705 | 5F5F | 6C63 | 636F | 0D6B | EE04 | C0FF |
| 0001246160 | 070D | 5F5F | 7473 | 6361 | 0E6B | D804 | 81FF | 0800 |
| 0001246200 | 5F5F | 6572 | 7674 | 6C61 | 0412 | FFF2 | 05D9 | 690C |
| 0001246220 | 6F63 | 5F6E | 736D | 5F67 | 7470 | 0D72 | F604 | 85FF |
| 0001246240 | 0700 | 6163 | 7470 | 7275 | 0F65 | D004 | 85FF | 0900 |
| 0001246260 | 7573 | 5F74 | 7665 | 6E65 | 0B74 | F804 | 85FF | 0500 |
| 0001246300 | 7267 | 6461 | 0B65 | EA04 | 81FF | 0500 | 7265 | 6F72 |
| 0001246320 | 0E72 | 7805 | 0825 | E800 | 0605 | 5F5F | 7566 | 636E |
| 0001246340 | 0514 | 258A | 0008 | 0081 | 630C | 7275 | 6572 | 746E |
| 0001246360 | 735F | 6574 | 1370 | 8C05 | 0825 | 8500 | 0B00 | 6E69 |
| 0001246400 | 7469 | 6169 | 696C | 657A | 1464 | 8E05 | 0825 | 8500 |
| 0001246420 | 0C00 | 656B | 7065 | 725F | 7365 | 6C75 | 7374 | 0514 |
| 0001246440 | 2590 | 0008 | 03DC | 690C | 6F63 | 5F6E | 6468 | 5F72 |
| 0001246460 | 7470 | 1772 | 9405 | 0825 | DC00 | 0F03 | 656D | 6772 |
| 0001246500 | 6465 | 695F | 6F63 | 5F6E | 7470 | 1272 | A205 | 0854 |
| 0001246520 | 8100 | 0A00 | 656C | 7261 | 5F6E | 6877 | 7461 | 050E |
| 0001246540 | 54A4 | 0008 | 03EF | 6606 | 6C69 | 6574 | 1772 | 9805 |
| 0001246560 | 0825 | 8500 | 0F00 | 6964 | 7073 | 616C | 6979 | 676E |
| 0001246600 | 695F | 6F63 | 156E | 9A05 | 0825 | 8500 | 0D00 | 616D |
| 0001246620 | 6564 | 615F | 735F | 6D61 | 6C70 | 1965 | 9C05 | 0825 |
| 0001246640 | 8500 | 1100 | 6E69 | 735F | 6D61 | 6C70 | 5F65 | 6573 |
| 0001246660 | 7373 | 6F69 | 106E | 9E05 | 0825 | 8500 | 0800 | 656E |
| 0001246700 | 5F77 | 6369 | 6E6F | 0517 | 25A0 | 0008 | 0081 | 660F |
| 0001246720 | 6C69 | 6574 | 5F72 | 6F70 | 6973 | 6974 | 6E6F | 0201 |
| 0001246740 | 0118 | 465D | 0601 | 035B | 0010 | 0350 | 0000 | 0904 |
| 0001246760 | 6E69 | 7469 | 695F | 6F63 | 126E | 0604 | D900 | 0C05 |

THU MAR 14 17:25:16 1991 CRV_IPS.DLL PAGE 316, LINE 18586

| | | | | | | | | |
|---|---|---|---|---|---|---|---|---|
| 0001247000 | 6369 | 6E6F | 6D5F | 6773 | 705F | 7274 | 0412 | 000A |
| 0001247020 | 03DB | 690C | 6F63 | 5F6E | 7470 | 5F72 | 6461 | 0E72 |
| 0001247040 | 0E04 | C500 | 0800 | 656E | 5F77 | 6369 | 6E6F | 040C |
| 0001247060 | FFFA | 00C0 | 5F06 | 745F | 7079 | 0F65 | F404 | 85FF |
| 0001247100 | 0900 | 5F5F | 7862 | 745F | 7079 | 0D65 | E204 | EAFF |
| 0001247120 | 0705 | 5F5F | 7270 | 6E69 | 0B74 | DA04 | 02FF | 0502 |
| 0001247140 | 5F5F | 766C | 0D6C | E604 | ECFF | 0705 | 5F5F | 6C63 |
| 0001247160 | 636F | 0D6B | F604 | C0FF | 0700 | 5F5F | 7473 | 6361 |
| 0001247200 | 0E6B | E004 | 81FF | 0800 | 5F5F | 6572 | 7674 | 6C61 |
| 0001247220 | 040B | FFF2 | 0081 | 6505 | 7272 | 726F | 040F | FFD8 |
| 0001247240 | 0085 | 6209 | 6D74 | 5F70 | 6973 | 657A | 050E | 25B0 |
| 0001247260 | 0008 | 0603 | 5F06 | 665F | 6E75 | 0163 | 1A02 | B801 |
| 0001247300 | 0649 | 7506 | 1001 | 6A00 | 0001 | 0400 | 690B | 696E |
| 0001247320 | 5F74 | 6966 | 746C | 7265 | 040C | 0006 | 03F9 | 6606 |
| 0001247340 | 6C69 | 6574 | 0C72 | FA04 | C0FF | 0600 | 5F5F | 7974 |
| 0001247360 | 6570 | 040F | FFF4 | 0085 | 5F09 | 625F | 5F78 | 7974 |
| 0001247400 | 6570 | 040D | FFE4 | 05EA | 5F07 | 705F | 6972 | 746E |
| 0001247420 | 040B | FFDC | 0202 | 5F05 | 6C5F | 6C76 | 040D | FFE8 |
| 0001247440 | 05EC | 5F07 | 635F | 6F6C | 6B63 | 040D | FFF6 | 00C0 |
| 0001247460 | 5F07 | 735F | 6174 | 6B63 | 040E | FFE2 | 0081 | 5F08 |
| 0001247500 | 725F | 7465 | 6176 | 0E6C | C805 | 0825 | AA00 | 0602 |
| 0001247520 | 5F5F | 7566 | 636E | 0201 | 011B | 4B2D | 0608 | 0511 |
| 0001247540 | 0010 | 0506 | 0000 | 0C04 | 6964 | 7073 | 616C | 5F79 |
| 0001247560 | 6369 | 6E6F | 0412 | 0006 | 03DC | 690C | 6F63 | 5F6E |
| 0001247600 | 6468 | 5F72 | 7470 | 0C72 | FA04 | C0FF | 0600 | 5F5F |
| 0001247620 | 7974 | 6570 | 040F | FFF4 | 0085 | 5F09 | 625F | 5F78 |
| 0001247640 | 7974 | 6570 | 040D | FFE4 | 05EA | 5F07 | 705F | 6972 |
| 0001247660 | 746E | 040B | FFDA | 0202 | 5F05 | 6C5F | 6C76 | 040D |
| 0001247700 | FFE8 | 05EC | 5F07 | 635F | 6F6C | 6B63 | 040D | FFF6 |
| 0001247720 | 00C0 | 5F07 | 735F | 6174 | 6B63 | 040E | FFE0 | 0081 |
| 0001247740 | 5F08 | 725F | 7465 | 6176 | 0A6C | E204 | 85FF | 0400 |
| 0001247760 | 6162 | 6B6E | 0413 | FFC2 | 05A0 | 740D | 6172 | 736E |
| 0001250000 | 6566 | 5F72 | 6164 | 6174 | 050E | 2606 | 0008 | 024F |
| 0001250020 | 5F06 | 665F | 6E75 | 0163 | 1B02 | 3E01 | 0A50 | C006 |
| 0001250040 | 1005 | B500 | 0005 | 0400 | 630C | 7061 | 7574 | 6572 |
| 0001250060 | 695F | 6F63 | 0C6E | 0604 | F900 | 0603 | 6966 | 746C |
| 0001250100 | 7265 | 040A | 000A | 0085 | 6404 | 6669 | 1266 | 0C04 |
| 0001250120 | DC00 | 0C03 | 6369 | 6E6F | 685F | 7264 | 705F | 7274 |
| 0001250140 | 040C | FFF8 | 00C0 | 5F06 | 745F | 7079 | 0F65 | D604 |
| 0001250160 | 85FF | 0900 | 5F5F | 7862 | 745F | 7079 | 0D65 | C404 |
| 0001250200 | EAFF | 0705 | 5F5F | 7270 | 6E69 | 0B74 | BC04 | 02FF |
| 0001250220 | 0502 | 5F5F | 766C | 0D6C | C804 | ECFF | 0705 | 5F5F |
| 0001250240 | 6C63 | 636F | 0D6B | F004 | C0FF | 0700 | 5F5F | 7473 |
| 0001250260 | 6361 | 0E6B | C204 | 81FF | 0800 | 5F5F | 6572 | 7674 |
| 0001250300 | 6C61 | 040B | FFD4 | 0081 | 6505 | 7272 | 726F | 040B |
| 0001250320 | FFD8 | 05A0 | 7405 | 6172 | 736E | 0411 | FFF4 | 00C4 |
| 0001250340 | 690B | 6F63 | 5F6E | 7562 | 6666 | 7265 | 040D | FFFC |
| 0001250360 | 0081 | 6307 | 756F | 746E | 7265 | 050E | 26C6 | 0008 |
| 0001250400 | 024F | 5F06 | 665F | 6E75 | 0163 | 2202 | FE01 | 0F55 |
| 0001250420 | 1D06 | 1001 | 1200 | 0001 | 0400 | 6713 | 7465 | 665F |
| 0001250440 | 6C69 | 6574 | 5F72 | 6F70 | 6973 | 6974 | 6E6F | 040C |
| 0001250460 | 0006 | 03F9 | 6606 | 6C69 | 6574 | 0F72 | F604 | 85FF |
| 0001250500 | 0900 | 656C | 7466 | 655F | 6764 | 0E65 | FA04 | 85FF |
| 0001250520 | 0800 | 6F74 | 5F70 | 6465 | 6567 | 0411 | FFF8 | 0085 |
| 0001250540 | 620B | 746F | 6F74 | 5F6D | 6465 | 6567 | 0410 | FFFC |
| 0001250560 | 0085 | 720A | 6769 | 7468 | 655F | 6764 | 0165 | 1D02 |
| 0001250600 | 1B01 | 1157 | C406 | 1000 | B900 | 0000 | 0400 | 640E |
| 0001250620 | 5F6F | 6F6D | 6576 | 665F | 6C69 | 6574 | 1072 | 0604 |
| 0001250640 | F900 | 0A03 | 6966 | 746C | 7265 | 705F | 7274 | 040F |

THU MAR 14 17:25:16 1991 CRV_IPS.DLL PAGE 317, LINE 18645

| | | | | | | | | |
|---|---|---|---|---|---|---|---|---|
| 0001250660 | 000A | 04F7 | 6509 | 6576 | 746E | 705F | 7274 | 040B |
| 0001250700 | FFF8 | 0081 | 6505 | 7272 | 726F | 0407 | FFFC | 0081 |
| 0001250720 | 7801 | 0407 | FFFA | 0081 | 7901 | 0201 | 011B | 57DF |
| 0001250740 | 0613 | 01BF | 0010 | 01B4 | 0000 | 0C04 | 7265 | 7361 |
| 0001250760 | 5F65 | 6966 | 746C | 7265 | 040C | 0006 | 03F9 | 6606 |
| 0001251000 | 6C69 | 6574 | 0C72 | FA04 | C0FF | 0600 | 5F5F | 7974 |
| 0001251020 | 6570 | 040F | FFF4 | 0085 | 5F09 | 625F | 5F78 | 7974 |
| 0001251040 | 6570 | 040D | FFE4 | 05EA | 5F07 | 705F | 6972 | 746E |
| 0001251060 | 040B | FFDC | 0202 | 5F05 | 6C5F | 6C76 | 040D | FFE8 |
| 0001251100 | 05EC | 5F07 | 635F | 6F6C | 6B63 | 040D | FFF6 | 00CG |
| 0001251120 | 5F07 | 735F | 6174 | 6B63 | 040E | FFE2 | 0081 | 5F08 |
| 0001251140 | 725F | 7465 | 6176 | 0E6C | E205 | 0826 | 4F00 | 0602 |
| 0001251160 | 5F5F | 7566 | 636E | 0201 | 0123 | 599E | 0614 | 01D9 |
| 0001251200 | 0016 | 01CD | 0000 | 1404 | 7263 | 5F76 | 7564 | 706D |
| 0001251220 | 695F | 6F63 | 736E | 745F | 5F6F | 7067 | 0419 | FFE6 |
| 0001251240 | 056B | 6913 | 6F63 | 5F6E | 6564 | 6373 | 6972 | 7470 |
| 0001251260 | 726F | 705F | 7274 | 0413 | FFFA | 0086 | 670D | 5F70 |
| 0001251300 | 7562 | 6666 | 7265 | 705F | 7274 | 0415 | FFF4 | 0082 |
| 0001251320 | 640F | 7365 | 7263 | 7069 | 6F74 | 5F72 | 6973 | 657A |
| 0001251340 | 0411 | FFE4 | 0085 | 6C0B | 7369 | 5F74 | 656C | 676E |
| 0001251360 | 6874 | 0407 | FFF8 | 0085 | 6901 | 040F | FFEA | 03EC |
| 0001251400 | 6E09 | 6D61 | 5F65 | 696C | 7473 | 0412 | FFEE | 03DC |
| 0001251420 | 690C | 6F63 | 5F6E | 6468 | 5F72 | 7470 | 0B72 | F204 |
| 0001251440 | 81FF | 0500 | 7265 | 6F72 | 0172 | 2302 | 7701 | 165B |
| 0001251460 | AD06 | 1602 | A100 | 0002 | 0400 | 6314 | 7672 | 635F |
| 0001251500 | 756F | 746E | 695F | 6F63 | 5F6E | 6174 | 6C62 | 0B65 |
| 0001251520 | D804 | 02FF | 0502 | 5F5F | 766C | 0D6C | E404 | ECFF |
| 0001251540 | 0705 | 5F5F | 6C63 | 636F | 0D6B | F604 | C0FF | 0700 |
| 0001251560 | 5F5F | 7473 | 6361 | 0E6B | DE04 | 81FF | 0800 | 5F5F |
| 0001251600 | 6572 | 7674 | 6C61 | 040E | FF58 | 0619 | 6908 | 6F63 |
| 0001251620 | 5F6E | 7261 | 0772 | F404 | 85FF | 0100 | 0B69 | F004 |
| 0001251640 | 81FF | 0500 | 7265 | 6F72 | 0C72 | FA04 | C0FF | 0600 |
| 0001251660 | 5F5F | 7974 | 6570 | 040F | FFF2 | 0085 | 5F09 | 625F |
| 0001251700 | 5F78 | 7974 | 6570 | 040D | FFE0 | 05EA | 5F07 | 705F |
| 0001251720 | 6972 | 746E | 050E | 274E | 0008 | 0618 | 5F06 | 665F |
| 0001251740 | 6E75 | 0163 | 0502 | 000D | 1A00 | 0F00 | 3A05 | 0821 |
| 0001251760 | C000 | 0700 | 5F42 | 4678 | 6C69 | 0F65 | 3E05 | 0821 |
| 0001252000 | C000 | 0700 | 5F42 | 5078 | 6361 | 146B | 4205 | 0821 |
| 0001252020 | 8600 | 0C00 | 7067 | 695F | 6F63 | 5F6E | 6461 | 7264 |
| 0001252040 | 0517 | 2146 | 0008 | 0085 | 670F | 5F70 | 6E69 | 645F |
| 0001252060 | 6172 | 5F77 | 6F6D | 6564 | 051D | 2148 | 0008 | 0085 |
| 0001252100 | 6915 | 6F63 | 5F6E | 696C | 7262 | 7261 | 5F79 | 6F6D |
| 0001252120 | 6964 | 6966 | 6465 | 0517 | 214A | 0008 | 0085 | 630F |
| 0001252140 | 6168 | 6E6E | 6C65 | 745F | 5F6F | 7267 | 6261 | 0514 |
| 0001252160 | 0000 | 0000 | 0081 | 420C | 5F78 | 6544 | 7562 | 4D67 |
| 0001252200 | 646F | 1465 | 0005 | 0000 | 8100 | 0C00 | 7842 | 545F |
| 0001252220 | 6D69 | 7365 | 6F4D | 6564 | 0510 | 0000 | 0000 | 0081 |
| 0001252240 | 4208 | 5F78 | 5F42 | 6973 | 1067 | 0605 | 070F | BD00 |
| 0001252260 | 0804 | 7069 | 5F73 | 6164 | 6174 | 1105 | 0003 | 0000 |
| 0001252300 | 0122 | 5E24 | 0743 | 00B1 | 0010 | 00A6 | 0000 | 1304 |
| 0001252320 | 7367 | 5F70 | 7270 | 7065 | 7261 | 5F65 | 6F63 | 6D6D |
| 0001252340 | 6E61 | 1064 | 0604 | 8500 | 0A00 | 7067 | 635F | 6D6F |
| 0001252360 | 616D | 646E | 040C | 0008 | 00C0 | 6906 | 5F6E | 7470 |
| 0001252400 | 1072 | 0C04 | 8400 | 0A00 | 6170 | 6172 | 5F6D | 6973 |
| 0001252420 | 657A | 040D | 000E | 00C0 | 6F07 | 7475 | 705F | 7274 |
| 0001252440 | 040F | 0012 | 0084 | 6409 | 7461 | 5F61 | 6973 | 657A |
| 0001252460 | 0409 | FFFC | 0081 | 6503 | 7272 | 0201 | 0123 | 5ED5 |
| 0001252500 | 0745 | 004F | 0010 | 0044 | 0000 | 1404 | 7367 | 5F70 |
| 0001252520 | 7061 | 6C70 | 6369 | 695F | 6F63 | 5F6E | 6572 | 7463 |

THU MAR 14 17:25:16 1991 CRV_IPS.DLL PAGE 318, LINE 18704

| | | | | | | | | |
|---|---|---|---|---|---|---|---|---|
| 0001252540 | 0412 | 0006 | 070F | 670C | 5F70 | 7473 | 7261 | 5F74 |
| 0001252560 | 7470 | 0972 | FC04 | 81FF | 0300 | 7265 | 0172 | 1602 |
| 0001252600 | 2401 | 465F | 7C07 | 1000 | 7100 | 0000 | 0400 | 6707 |
| 0001252620 | 5F70 | 7973 | 636E | 0D06 | 0081 | 010E | 0A69 | FC04 |
| 0001252640 | 81FF | 0400 | 7473 | 7461 | 0201 | 0121 | 5FA0 | 0748 |
| 0001252660 | 007D | 0010 | 0072 | 0000 | 1204 | 7367 | 5F70 | 6373 |
| 0001252700 | 6572 | 6E65 | 635F | 6168 | 676E | 6465 | 040A | 0006 |
| 0001252720 | 0085 | 7404 | 7079 | 0D65 | 0804 | C500 | 0700 | 6863 |
| 0001252740 | 6E61 | 6567 | 0964 | FC04 | 81FF | 0300 | 7265 | 0F72 |
| 0001252760 | F604 | F4FF | 0906 | 7067 | 635F | 6168 | 676E | 0165 |
| 0001253000 | 1E02 | 1D01 | 4960 | 6B07 | 1000 | 6000 | 0000 | 0400 |
| 0001253020 | 670F | 7073 | 735F | 7263 | 6565 | 5F6E | 6162 | 6B63 |
| 0001253040 | 0409 | FFFA | 0081 | 6503 | 7272 | 0411 | FFFC | 0085 |
| 0001253060 | 630B | 6168 | 676E | 6465 | 665F | 676C | 0D06 | 0081 |
| 0001253100 | 010E | 0169 | 2802 | 8801 | 4B60 | 8B07 | 1000 | 8000 |
| 0001253120 | 0000 | 0400 | 6319 | 6568 | 6B63 | 6C5F | 7361 | 5F74 |
| 0001253140 | 7665 | 6E65 | 5F74 | 6572 | 6563 | 7669 | 6465 | 040A |
| 0001253160 | 0006 | 00C5 | 6604 | 616C | 1267 | 0A04 | C500 | 0C00 |
| 0001253200 | 6974 | 656D | 756F | 5F74 | 6C66 | 6761 | 0201 | 0126 |
| 0001253220 | 6113 | 074D | 008D | 0010 | 0082 | 0000 | 1704 | 6863 |
| 0001253240 | 6365 | 5F6B | 616C | 7473 | 655F | 6576 | 746E | 735F |
| 0001253260 | 6174 | 6C62 | 0A65 | 0604 | C500 | 0400 | 6C66 | 6761 |
| 0001253300 | 0412 | 000A | 00C5 | 740C | 6D69 | 6F65 | 7475 | 665F |
| 0001253320 | 616C | 0167 | 2202 | A001 | 4E61 | 6607 | 1000 | 5B00 |
| 0001253340 | 0000 | 0400 | 6913 | 696E | 5F74 | 7665 | 6E65 | 5F74 |
| 0001253360 | 6572 | 6563 | 7669 | 6465 | 0201 | 011F | 6206 | 0750 |
| 0001253400 | 00BB | 0010 | 00B0 | 0000 | 1004 | 7573 | 5F74 | 6F6D |
| 0001253420 | 6576 | 6C5F | 636F | 7461 | 726F | 0407 | 0006 | 0081 |
| 0001253440 | 7801 | 0407 | 0008 | 0081 | 7901 | 050D | 5500 | 0008 |
| 0001253460 | 066A | 6505 | 6576 | 746E | 0513 | 2792 | 0008 | 0085 |
| 0001253500 | 690B | 696E | 6974 | 6C61 | 7A69 | 6465 | 0201 | 011C |
| 0001253520 | 62C1 | 0751 | 0021 | 0010 | 0016 | 0000 | 0D04 | 7263 |
| 0001253540 | 5F76 | 6F6C | 6163 | 6F74 | 5F72 | 0178 | 1C02 | E201 |
| 0001253560 | 5262 | 2107 | 1000 | 1600 | 0000 | 0400 | 630D | 7672 |
| 0001253600 | 6C5F | 636F | 7461 | 726F | 795F | 0201 | 0120 | 6303 |
| 0001253620 | 0754 | 0044 | 0010 | 0039 | 0000 | 1104 | 7263 | 5F76 |
| 0001253640 | 6573 | 5F74 | 6F6C | 6163 | 6F74 | 5F72 | 0F78 | 0604 |
| 0001253660 | 8100 | 0900 | 656E | 5F77 | 6176 | 756C | 0165 | 2002 |
| 0001253700 | 4701 | 5663 | 4407 | 1000 | 3900 | 0000 | 0400 | 6311 |
| 0001253720 | 7672 | 735F | 7465 | 6C5F | 636F | 7461 | 726F | 795F |
| 0001253740 | 040F | 0006 | 0081 | 6E09 | 7765 | 765F | 6C61 | 6575 |
| 0001253760 | 0201 | 0120 | 638B | 0758 | 004C | 0010 | 0041 | 0000 |
| 0001254000 | 1104 | 7263 | 5F76 | 6E69 | 5F63 | 6F6C | 6163 | 6F74 |
| 0001254020 | 5F72 | 0F78 | 0604 | 8100 | 0900 | 6E69 | 5F63 | 6176 |
| 0001254040 | 756C | 0165 | 2002 | D701 | 5A63 | 4C07 | 1000 | 4100 |
| 0001254060 | 0000 | 0400 | 6311 | 7672 | 695F | 636E | 6C5F | 636F |
| 0001254100 | 7461 | 726F | 795F | 040F | 0006 | 0081 | 6909 | 636E |
| 0001254120 | 765F | 6C61 | 6575 | 0201 | 0129 | 6423 | 075B | 0021 |
| 0001254140 | 0010 | 0016 | 0000 | 1A04 | 7263 | 5F76 | 6F6C | 6163 |
| 0001254160 | 6F74 | 5F72 | 6F70 | 6973 | 6974 | 6E6F | 6B5F | 6F6E |
| 0001254200 | 6E77 | 0201 | 012D | 6444 | 075D | 0045 | 0010 | 003A |
| 0001254220 | 0000 | 1E04 | 7263 | 5F76 | 6573 | 5F74 | 6F6C | 6163 |
| 0001254240 | 6F74 | 5F72 | 6F70 | 6973 | 6974 | 6E6F | 6B5F | 6F6E |
| 0001254260 | 6E77 | 040F | 0006 | 0085 | 6E09 | 7765 | 765F | 6C61 |
| 0001254300 | 6575 | 0201 | 0510 | 0F06 | 0007 | 0640 | 6908 | 7370 |
| 0001254320 | 645F | 7461 | 0561 | 000D | 1A00 | 0F00 | 7605 | 0827 |
| 0001254340 | C000 | 0700 | 5F42 | 4678 | 6C69 | 0F65 | 7A05 | 0827 |
| 0001254360 | C000 | 0700 | 5F42 | 5078 | 6361 | 1E6B | 9005 | 0827 |
| 0001254400 | 8500 | 1600 | 6F6C | 6163 | 6F74 | 5F72 | 6F70 | 6973 |

THU MAR 14 17:25:16 1991 CRV_IPS.DLL PAGE 319, LINE 18763

| | | | | | | | | |
|---|---|---|---|---|---|---|---|---|
| 0001254420 | 6974 | 6E6F | 6B5F | 6F6E | 6E77 | 0511 | 54FC | 0008 |
| 0001254440 | 0081 | 6C09 | 636F | 7461 | 726F | 785F | 0511 | 54FE |
| 0001254460 | 0008 | 0081 | 6C09 | 636F | 7461 | 726F | 795F | 051D |
| 0001254500 | 277E | 0008 | 0085 | 7315 | 6163 | 656C | 6E5F | 746F |
| 0001254520 | 695F | 696E | 6974 | 6C61 | 7A69 | 6465 | 0514 | 2780 |
| 0001254540 | 0008 | 04E7 | 730C | 6163 | 656C | 775F | 6E69 | 6F64 |
| 0001254560 | 1077 | 5005 | 071C | F700 | 0806 | 7067 | 735F | 6174 |
| 0001254600 | 7472 | 0511 | 1C82 | 0007 | 06F7 | 6709 | 5F70 | 6573 |
| 0001254620 | 7261 | 6863 | 050F | 1C6E | 0007 | 06FA | 6707 | 5F70 |
| 0001254640 | 6164 | 6174 | 0514 | 1C6A | 0007 | 0086 | 670C | 5F70 |
| 0001254660 | 6C66 | 6761 | 5F73 | 6461 | 1072 | 4805 | 070F | C700 |
| 0001254700 | 0806 | 7067 | 665F | 616C | 7367 | 050F | 2788 | 0008 |
| 0001254720 | 0082 | 7407 | 6D69 | 6F65 | 7475 | 0516 | 278C | 0008 |
| 0001254740 | 0085 | 740E | 6D69 | 6F65 | 7475 | 665F | 6172 | 656D |
| 0001254760 | 1873 | 8E05 | 0827 | 8500 | 1000 | 7473 | 6261 | 6C69 |
| 0001255000 | 7469 | 5F79 | 6166 | 7463 | 726F | 0511 | 309C | 0008 |
| 0001255020 | 0086 | 6309 | 7672 | 695F | 7370 | 6D65 | 1105 | 0003 |
| 0001255040 | 0000 | 011A | 648A | 0757 | 01C5 | 0010 | 01BA | 0000 |
| 0001255060 | 0B04 | 6E69 | 7469 | 745F | 6261 | 656C | 0974 | 0604 |
| 0001255100 | 8500 | 0300 | 6964 | 0E72 | 0804 | 1600 | 0807 | 6572 |
| 0001255120 | 7463 | 705F | 7274 | 040B | 000C | 00C1 | 6D05 | 7861 |
| 0001255140 | 785F | 040B | 0010 | 00C1 | 6D05 | 6E69 | 785F | 0409 |
| 0001255160 | FFE4 | 0081 | 6503 | 7272 | 040F | FFFA | 0085 | 6509 |
| 0001255200 | 7272 | 726F | 665F | 676C | 0411 | FFFC | 0085 | 630B |
| 0001255220 | 6168 | 676E | 6465 | 665F | 676C | 040C | FFE2 | 0085 |
| 0001255240 | 6D06 | 7261 | 6967 | 126E | E604 | 0FFF | 0C07 | 7067 |
| 0001255260 | 695F | 6F63 | 5F6E | 6164 | 6174 | 0201 | 011E | 664F |
| 0001255300 | 0759 | 02CB | 0010 | 02C0 | 0000 | 0F04 | 656C | 7261 |
| 0001255320 | 5F6E | 6261 | 5F73 | 6373 | 6C61 | 0965 | 0604 | 1600 |
| 0001255340 | 0307 | 6977 | 0F6E | FA04 | 81FF | 0900 | 3278 | 745F |
| 0001255360 | 6261 | 656C | 0F74 | EE04 | 81FF | 0900 | 3279 | 745F |
| 0001255400 | 6261 | 656C | 0974 | EA04 | 81FF | 0300 | 7265 | 0872 |
| 0001255420 | EC04 | 85FF | 0200 | 3178 | 0408 | FFE6 | 0085 | 7802 |
| 0001255440 | 0832 | E804 | 85FF | 0200 | 3179 | 040B | FFE2 | 0085 |
| 0001255460 | 7902 | 0E32 | F004 | EAFF | 0804 | 726F | 5F67 | 6572 |
| 0001255500 | 7463 | 040B | FFE0 | 0081 | 6D05 | 7861 | 785F | 040B |
| 0001255520 | FFE4 | 0081 | 6D05 | 6E69 | 785F | 040F | FFFC | 0081 |
| 0001255540 | 7809 | 5F31 | 6174 | 6C62 | 7465 | 040F | FFF8 | 0081 |
| 0001255560 | 7909 | 5F31 | 6174 | 6C62 | 7465 | 0201 | 011A | 691A |
| 0001255600 | 075B | 01FE | 0010 | 01F3 | 0000 | 0B04 | 6F6D | 6576 |
| 0001255620 | 745F | 6261 | 656C | 0F74 | 0604 | 8000 | 0906 | 7665 |
| 0001255640 | 6E65 | 5F74 | 7470 | 0772 | F804 | 81FF | 0100 | 0778 |
| 0001255660 | F604 | 81FF | 0100 | 0C79 | FC04 | 81FF | 0600 | 5F78 |
| 0001255700 | 6E75 | 7469 | 040C | FFFA | 0081 | 7906 | 755F | 696E |
| 0001255720 | 0174 | 2602 | 1801 | 5D6B | 2D07 | 1001 | 2200 | 0001 |
| 0001255740 | 0400 | 6317 | 7672 | 725F | 6165 | 5F64 | 6261 | 5F73 |
| 0001255760 | 6373 | 6C61 | 5F65 | 7566 | 636E | 0408 | 0006 | 00C0 |
| 0001256000 | 6602 | 0A6E | FC04 | 81FF | 0400 | 7974 | 6570 | 0408 |
| 0001256020 | FFA4 | 0425 | 6602 | 0770 | A804 | 83FF | 0100 | 0A66 |
| 0001256040 | AC04 | 5EFF | 0407 | 6574 | 706D | 0201 | 0127 | 6C45 |
| 0001256060 | 0763 | 00DC | 0010 | 00D1 | 0000 | 1804 | 7263 | 5F76 |
| 0001256100 | 7277 | 7469 | 5F65 | 6261 | 5F73 | 6373 | 6C61 | 5F65 |
| 0001256120 | 7566 | 636E | 0408 | 0006 | 00C0 | 6602 | 086E | FA04 |
| 0001256140 | 25FF | 0204 | 7066 | 0201 | 0126 | 6D21 | 0766 | 004F |
| 0001256160 | 0010 | 0044 | 0000 | 1704 | 7263 | 5F76 | 6567 | 5F74 |
| 0001256200 | 6174 | 6C62 | 7465 | 705F | 736F | 7469 | 6F69 | 0F6E |
| 0001256220 | 0604 | 8000 | 0906 | 7665 | 6E65 | 5F74 | 7470 | 0172 |
| 0001256240 | 2402 | 7001 | 686D | B307 | 1000 | A800 | 0000 | 0400 |
| 0001256260 | 6315 | 696C | 5F70 | 6174 | 6C62 | 7465 | 745F | 5F6F |

THU MAR 14 17:25:16 1991 CRV_IPS.DLL PAGE 320, LINE 18822

| | | | | | | | | |
|---|---|---|---|---|---|---|---|---|
| 0001256300 | 6977 | 646E | 776F | 0407 | 0006 | 00C1 | 7801 | 0407 |
| 0001256320 | 000A | 00C1 | 7901 | 0201 | 0124 | 6E23 | 076A | 002A |
| 0001256340 | 0010 | 001F | 0000 | 1504 | 7263 | 5F76 | 6E69 | 7469 |
| 0001256360 | 745F | 6261 | 656C | 5F74 | 7274 | 6361 | 0F6B | 0604 |
| 0001256400 | 8000 | 0906 | 7665 | 6E65 | 5F74 | 7470 | 0172 | 2302 |
| 0001256420 | 4D01 | 6C6E | 2A07 | 1000 | 1F00 | 0000 | 0400 | 6314 |
| 0001256440 | 7672 | 655F | 646E | 745F | 6261 | 656C | 5F74 | 7274 |
| 0001256460 | 6361 | 0F6B | 0604 | 8000 | 0906 | 7665 | 6E65 | 5F74 |
| 0001256500 | 7470 | 0172 | 1002 | 0605 | 070F | 4300 | 0806 | 7069 |
| 0001256520 | 5F73 | 6164 | 6174 | 0D05 | 0000 | 001A | 050F | 27A4 |
| 0001256540 | 0008 | 00C0 | 4207 | 785F | 6946 | 656C | 050F | 27A8 |
| 0001256560 | 0008 | 00C0 | 4207 | 785F | 6150 | 6B63 | 0511 | 27AC |
| 0001256600 | 0068 | 0674 | 6109 | 7362 | 735F | 6163 | 656C | 050E |
| 0001256620 | 562C | 0008 | 04DF | 6F06 | 6972 | 6967 | 106E | 2805 |
| 0001256640 | 0856 | 8100 | 0800 | 5F78 | 6174 | 6C62 | 7465 | 0510 |
| 0001256660 | 562A | 0008 | 0081 | 7908 | 745F | 6261 | 656C | 1D74 |
| 0001256700 | 7E05 | 0827 | 8500 | 1500 | 6373 | 6C61 | 5F65 | 6F6E |
| 0001256720 | 5F74 | 6E69 | 7469 | 6169 | 696C | 657A | 1464 | 8005 |
| 0001256740 | 0827 | EAD0 | 0CD4 | 6373 | 6C61 | 5F65 | 6977 | 646E |
| 0001256760 | 776F | 0510 | 1C50 | 0007 | 070C | 6708 | 5F70 | 7473 |
| 0001257000 | 7261 | 1174 | 8205 | 071C | 0C00 | 0907 | 7067 | 735F |
| 0001257020 | 6165 | 6372 | 0568 | 0311 | 0000 | 1700 | 1401 | 5CCC |
| 0001257040 | 4005 | 1000 | 3500 | 0000 | 0400 | 6708 | 7073 | 6F5F |
| 0001257060 | 6570 | 0C6E | FC04 | 85FF | 0600 | 6361 | 6974 | 6E6F |
| 0001257100 | 0201 | 0118 | CC54 | 055E | 002C | 0010 | 0021 | 0000 |
| 0001257120 | 0904 | 7367 | 5F70 | 6C63 | 736F | 0165 | 1702 | 8001 |
| 0001257140 | 5FCC | 2705 | 1000 | 1C00 | 0000 | 0400 | 6708 | 7073 |
| 0001257160 | 655F | 6978 | 0174 | 2102 | A701 | 60CC | A205 | 1000 |
| 0001257200 | 9700 | 0000 | 0400 | 6712 | 7073 | 645F | 6972 | 6576 |
| 0001257220 | 5F72 | 6669 | 695F | 696E | 0974 | FA04 | 81FF | 0300 |
| 0001257240 | 7265 | 0B72 | FC04 | 85FF | 0500 | 6970 | 6374 | 0168 |
| 0001257260 | 1B02 | 4901 | 62CD | 8505 | 1000 | 7A00 | 0000 | 0400 |
| 0001257300 | 670C | 7073 | 775F | 5F72 | 6368 | 7274 | 0B6C | 0604 |
| 0001257320 | 8500 | 0500 | 6176 | 756C | 0C65 | FC04 | 81FF | 0600 |
| 0001257340 | 7473 | 7461 | 7375 | 040E | FFFA | 0085 | 6408 | 6762 |
| 0001257360 | 645F | 7461 | 0161 | 1B02 | CE01 | 64CD | 3A05 | 1000 |
| 0001257400 | 2F00 | 0000 | 0400 | 670C | 7073 | 775F | 5F72 | 6168 |
| 0001257420 | 6464 | 0B72 | 0604 | 8600 | 0500 | 6176 | 756C | 0165 |
| 0001257440 | 1B02 | 0801 | 66CE | 6A05 | 1000 | 5F00 | 0000 | 0400 |
| 0001257460 | 670C | 7073 | 725F | 5F64 | 6368 | 7274 | 0F6C | 0604 |
| 0001257500 | C500 | 0900 | 6176 | 756C | 5F65 | 7470 | 0C72 | FC04 |
| 0001257520 | 81FF | 0600 | 7473 | 7461 | 7375 | 040E | FFFA | 0085 |
| 0001257540 | 6408 | 6762 | 645F | 7461 | 0161 | 1B02 | 7201 | 68CE |
| 0001257560 | 3B05 | 1000 | 3000 | 0000 | 0400 | 670C | 7073 | 725F |
| 0001257600 | 5F64 | 6168 | 6464 | 0F72 | 0604 | C600 | 0900 | 6176 |
| 0001257620 | 756C | 5F65 | 7470 | 0172 | 1A02 | AD01 | 6ACE | 3E05 |
| 0001257640 | 1000 | 3300 | 0000 | 0400 | 670B | 7073 | 775F | 5F72 |
| 0001257660 | 6164 | 6174 | 040E | 0006 | 00C0 | 6408 | 7461 | 5F61 |
| 0001257700 | 7470 | 0C72 | 0A04 | 8500 | 0600 | 5F77 | 6973 | 657A |
| 0001257720 | 040A | FFFC | 0085 | 6904 | 756E | 016D | 1A02 | EB01 |
| 0001257740 | 6CCE | 3E05 | 1000 | 3300 | 0000 | 0400 | 670B | 7073 |
| 0001257760 | 725F | 5F64 | 6164 | 6174 | 040E | 0006 | 00C0 | 6408 |
| 0001260000 | 7461 | 5F61 | 7470 | 0C72 | 0A04 | 8500 | 0600 | 5F77 |
| 0001260020 | 6973 | 657A | 040A | FFFC | 0085 | 6904 | 756E | 016D |
| 0001260040 | 1802 | 2901 | 6ECF | 6C05 | 1000 | 6100 | 0000 | 0400 |
| 0001260060 | 6709 | 7073 | 775F | 6972 | 6574 | 040E | 0006 | 00C0 |
| 0001260100 | 6408 | 7461 | 5F61 | 7470 | 0C72 | 0A04 | 8500 | 0600 |
| 0001260120 | 5F62 | 6973 | 657A | 040D | 000C | 0086 | 6107 | 6464 |
| 0001260140 | 6572 | 7373 | 040B | FFFA | 0081 | 6505 | 7272 | 726F |

THU MAR 14 17:25:16 1991 CRV_IPS.DLL PAGE 321, LINE 18881

| | | | | | | | | |
|---|---|---|---|---|---|---|---|---|
| 0001260160 | 040A | FFFC | 0085 | 6904 | 756E | 016D | 1702 | 9501 |
| 0001260200 | 70CF | 6C05 | 1000 | 6100 | 0000 | 0400 | 6708 | 7073 |
| 0001260220 | 725F | 6165 | 0E64 | 0604 | C000 | 0800 | 6164 | 6174 |
| 0001260240 | 705F | 7274 | 040C | 000A | 0085 | 6206 | 735F | 7A69 |
| 0001260260 | 0D65 | 0C04 | 8600 | 0700 | 6461 | 7264 | 7365 | 0B73 |
| 0001260300 | FA04 | 81FF | 0500 | 7265 | 6F72 | 0A72 | FC04 | 85FF |
| 0001260320 | 0400 | 6E69 | 6D75 | 0201 | 011E | D001 | 0572 | 01BE |
| 0001260340 | 0010 | 01B3 | 0000 | 0F04 | 7367 | 5F70 | 7277 | 7469 |
| 0001260360 | 5F65 | 6D69 | 6761 | 0E65 | 0604 | C400 | 0800 | 6164 |
| 0001260400 | 6174 | 705F | 7274 | 040D | 000A | 0086 | 6107 | 6464 |
| 0001260420 | 6572 | 7373 | 0410 | 000E | 053A | 770A | 6E69 | 6F64 |
| 0001260440 | 5F77 | 7470 | 0B72 | F204 | 81FF | 0500 | 7265 | 6F72 |
| 0001260460 | 0A72 | F404 | 85FF | 0400 | 6E69 | 6D75 | 040C | FFFC |
| 0001260500 | 0085 | 6C06 | 735F | 7A69 | 0765 | F604 | 81FF | 0100 |
| 0001260520 | 1069 | F804 | 81FF | 0A00 | 696C | 656E | 775F | 6469 |
| 0001260540 | 6874 | 040E | FFFA | 0081 | 6C08 | 6E69 | 5F65 | 756E |
| 0001260560 | 056D | 6200 | 29D0 | 0C00 | F004 | 85FF | 0600 | 5F62 |
| 0001260600 | 6973 | 657A | 0201 | 0201 | 011D | D1BF | 0574 | 01BE |
| 0001260620 | 0010 | 01B3 | 0000 | 0E04 | 7367 | 5F70 | 6572 | 6461 |
| 0001260640 | 695F | 616D | 6567 | 040E | 0006 | 00C4 | 6408 | 7461 |
| 0001260660 | 5F61 | 7470 | 0D72 | 0A04 | 8600 | 0700 | 6461 | 7264 |
| 0001260700 | 7365 | 1073 | 0E04 | 3A00 | 0A05 | 6977 | 646E | 776F |
| 0001260720 | 705F | 7274 | 040B | FFF2 | 0081 | 6505 | 7272 | 726F |
| 0001260740 | 040A | FFF4 | 0085 | 6904 | 756E | 0C6D | FC04 | 85FF |
| 0001260760 | 0600 | 5F6C | 6973 | 657A | 0407 | FFF6 | 0081 | 6901 |
| 0001261000 | 0410 | FFF8 | 0081 | 6C0A | 6E69 | 5F65 | 6977 | 7464 |
| 0001261020 | 0E68 | FA04 | 81FF | 0800 | 696C | 656E | 6E5F | 6D75 |
| 0001261040 | 0005 | D220 | 0029 | 040C | FFF0 | 0085 | 6206 | 735F |
| 0001261060 | 7A69 | 0165 | 0102 | 1D02 | 7D01 | 76D3 | 0C05 | 1001 |
| 0001261100 | 0100 | 0001 | 0400 | 670E | 7073 | 775F | 6972 | 6574 |
| 0001261120 | 685F | 6775 | 0E65 | 0604 | E400 | 0800 | 6164 | 6174 |
| 0001261140 | 705F | 7274 | 040C | 000A | 0086 | 6206 | 735F | 7A69 |
| 0001261160 | 0D65 | 0E04 | 8600 | 0700 | 6461 | 7264 | 7365 | 0B73 |
| 0001261200 | F604 | 81FF | 0500 | 7265 | 6F72 | 0A72 | F804 | 85FF |
| 0001261220 | 0400 | 6E69 | 6D75 | 040C | FFF4 | 0085 | 6306 | 735F |
| 0001261240 | 7A69 | 0B65 | FA04 | 82FF | 0500 | 6F63 | 6E75 | 0174 |
| 0001261260 | 1C02 | 8901 | 78D4 | 0C05 | 1001 | 0100 | 0001 | 0400 |
| 0001261300 | 670D | 7073 | 725F | 6165 | 5F64 | 7568 | 6567 | 040E |
| 0001261320 | 0006 | 00E4 | 6408 | 7461 | 5F61 | 7470 | 0C72 | 0A04 |
| 0001261340 | 8600 | 0600 | 5F62 | 6973 | 657A | 040D | 000E | 0086 |
| 0001261360 | 6107 | 6464 | 6572 | 7373 | 040B | FFF6 | 0081 | 6505 |
| 0001261400 | 7272 | 726F | 040A | FFF8 | 0085 | 6904 | 756E | 0C6D |
| 0001261420 | F404 | 85FF | 0600 | 5F63 | 6973 | 657A | 040B | FFFA |
| 0001261440 | 0082 | 6305 | 756F | 746E | 0201 | 0123 | D595 | 057A |
| 0001261460 | 0372 | 0010 | 0367 | 0000 | 1404 | 7367 | 5F70 | 7277 |
| 0001261500 | 7469 | 5F65 | 7568 | 6567 | 695F | 616D | 6567 | 040E |
| 0001261520 | 0006 | 00E4 | 6408 | 7461 | 5F61 | 7470 | 0D72 | 0A04 |
| 0001261540 | 8600 | 0700 | 6461 | 7264 | 7365 | 1073 | 0E04 | 3A00 |
| 0001261560 | 0A05 | 6977 | 646E | 776F | 705F | 7274 | 040B | FFE4 |
| 0001261600 | 0081 | 6505 | 7272 | 726F | 040A | FFE8 | 0085 | 6904 |
| 0001261620 | 756E | 126D | FA04 | 85FF | 0C00 | 6573 | 5F67 | 696C |
| 0001261640 | 656E | 6E5F | 6D75 | 0414 | FFFC | 0085 | 6C0E | 7361 |
| 0001261660 | 5F74 | 696C | 656E | 735F | 7A69 | 0C65 | F804 | 85FF |
| 0001261700 | 0600 | 5F6C | 6973 | 657A | 040D | FFE0 | 0085 | 7307 |
| 0001261720 | 6765 | 6E5F | 6D75 | 0409 | FFE6 | 0085 | 7203 | 7365 |
| 0001261740 | 0407 | FFE2 | 0085 | 6B01 | 0407 | FFEA | 0085 | 6901 |
| 0001261760 | 0410 | FFF0 | 0081 | 6C0A | 6E69 | 5F65 | 6977 | 7464 |
| 0001262000 | 0E68 | F204 | 81FF | 0800 | 696C | 656E | 6E5F | 6D75 |
| 0001262020 | 040E | FFF4 | 0082 | 6208 | 6675 | 735F | 7A69 | 0E65 |

THU MAR 14 17:25:16 1991 CRV_IPS.DLL PAGE 322, LINE 18940

| | | | | | | | | |
|---|---|---|---|---|---|---|---|---|
| 0001262040 | EC04 | 82FF | 0800 | 6573 | 5F67 | 6973 | 657A | 0005 |
| 0001262060 | D5EA | 002F | 040C | FFDC | 0086 | 6206 | 735F | 7A69 |
| 0001262100 | 0165 | 0102 | 2202 | 0701 | 7CD9 | 7205 | 1003 | 6700 |
| 0001262120 | 0003 | 0400 | 6713 | 7073 | 725F | 6165 | 5F64 | 7568 |
| 0001262140 | 6567 | 695F | 616D | 6567 | 040E | 0006 | 00E4 | 6408 |
| 0001262160 | 7461 | 5F61 | 7470 | 0D72 | 0A04 | 8600 | 0700 | 6461 |
| 0001262200 | 7264 | 7365 | 1073 | 0E04 | 3A00 | 0A05 | 6977 | 646E |
| 0001262220 | 776F | 705F | 7274 | 0414 | FFFC | 0085 | 6C0E | 7361 |
| 0001262240 | 5F74 | 696C | 656E | 735F | 7A69 | 0C65 | F804 | 85FF |
| 0001262260 | 0600 | 5F6C | 6973 | 657A | 040D | FFE0 | 0085 | 7307 |
| 0001262300 | 6765 | 6E5F | 6D75 | 0409 | FFE6 | 0085 | 7203 | 7365 |
| 0001262320 | 0407 | FFE2 | 0085 | 6B01 | 0407 | FFEA | 0085 | 6901 |
| 0001262340 | 0410 | FFF0 | 0081 | 6C0A | 6E69 | 5F65 | 6977 | 7464 |
| 0001262360 | 0E68 | F204 | 81FF | 0800 | 696C | 656E | 6E5F | 6D75 |
| 0001262400 | 040E | FFF4 | 0082 | 6208 | 6675 | 735F | 7A69 | 0E65 |
| 0001262420 | EC04 | 82FF | 0800 | 6573 | 5F67 | 6973 | 657A | 040B |
| 0001262440 | FFE4 | 0081 | 6505 | 7272 | 726F | 040A | FFE8 | 0085 |
| 0001262460 | 6904 | 756E | 126D | FA04 | 85FF | 0C00 | 6573 | 5F67 |
| 0001262500 | 696C | 656E | 6E5F | 6D75 | 0005 | D968 | 002F | 040C |
| 0001262520 | FFDC | 0086 | 6206 | 735F | 7A69 | 0165 | 0102 | 1702 |
| 0001262540 | 7901 | 7EDC | DD05 | 1000 | D200 | 0000 | 0400 | 6708 |
| 0001262560 | 7073 | 695F | 696E | 0A74 | 0604 | C000 | 0400 | 616E |
| 0001262600 | 656D | 040C | FFFC | 0081 | 7306 | 6174 | 7574 | D973 |
| 0001262620 | FA04 | 85FF | 0300 | 6572 | 0173 | 1E02 | 5601 | 81DD |
| 0001262640 | 8705 | 1002 | 7C00 | 0002 | 0400 | 670F | 7073 | 695F |
| 0001262660 | 746E | 685F | 6E61 | 6C64 | 7265 | 0409 | 0006 | 00C0 |
| 0001262700 | 7003 | 7274 | 040E | FEF4 | 0084 | 6908 | 746E | 745F |
| 0001262720 | 7079 | 0A65 | 7604 | 85FF | 0400 | 6F63 | 746E | 040C |
| 0001262740 | FF78 | 0081 | 7306 | 6174 | 7574 | 0A73 | FC04 | 59FF |
| 0001262760 | 0405 | 7263 | 6765 | 040C | FEF6 | 0582 | 6F06 | 7475 |
| 0001263000 | 7562 | 0B66 | 7A04 | 82FF | 0505 | 6E69 | 7562 | 0F66 |
| 0001263020 | FA04 | 81FF | 0900 | 7172 | 7473 | 635F | 646F | 1065 |
| 0001263040 | F204 | 81FE | 0A00 | 6572 | 5F74 | 7473 | 7461 | 7375 |
| 0001263060 | 0201 | 011A | DFDD | 0584 | 014F | 0010 | 0144 | 0000 |
| 0001263100 | 0B04 | 7367 | 5F70 | 6F63 | 6D6D | 6E61 | 1164 | 0604 |
| 0001263120 | 8500 | 0B00 | 6F63 | 6D6D | 6E61 | 5F64 | 756E | 126D |
| 0001263140 | 0804 | C000 | 0C00 | 6E69 | 757D | 5F74 | 6170 | 6172 |
| 0001263160 | 736D | 040D | 000C | 0084 | 6907 | 5F6E | 6973 | 657A |
| 0001263200 | 0413 | 000E | 00C0 | 6FDD | 7475 | 7570 | 5F74 | 6170 |
| 0001263220 | 6172 | 736D | 040E | 0012 | 0084 | 6F08 | 7475 | 735F |
| 0001263240 | 7A69 | 0C65 | FA04 | 81FF | 0600 | 7473 | 7461 | 7375 |
| 0001263260 | 0410 | FFF6 | 0081 | 670A | 7073 | 735F | 6174 | 7574 |
| 0001263300 | 0A73 | FC04 | 59FF | 0405 | 7263 | 6765 | D409 | FFF8 |
| 0001263320 | 0085 | 7203 | 7365 | 0201 | 011E | E12C | 0586 | 00BC |
| 0001263340 | 0010 | 00B1 | 0000 | 0F04 | 7367 | 5F70 | 7061 | 6C70 |
| 0001263360 | 6369 | 7461 | 6F69 | 106E | 0604 | 8500 | 0A00 | 7061 |
| 0001263400 | 6C70 | 6369 | 6E5F | 6D75 | 0412 | 0008 | 00C0 | 690C |
| 0001263420 | 706E | 7475 | 705F | 7261 | 6D61 | 0D73 | 0CD4 | 8400 |
| 0001263440 | 0700 | 6E69 | 735F | 7A69 | 0C65 | FA04 | 81FF | 0600 |
| 0001263460 | 7473 | 7461 | 7375 | 040A | FFFC | 0559 | 6304 | 6572 |
| 0001263500 | 0167 | 2102 | E801 | 88E1 | B905 | 1000 | AE00 | 0000 |
| 0001263520 | 0400 | 6712 | 7073 | 675F | 7465 | 615F | 7070 | 696C |
| 0001263540 | 5F63 | 736D | 1367 | 0604 | C000 | 0D00 | 756F | 7074 |
| 0001263560 | 7475 | 705F | 7261 | 6D61 | 0E73 | 0A04 | 8400 | 0800 |
| 0001263600 | 756F | 5F74 | 6973 | 657A | 040A | FFFC | 0559 | 6304 |
| 0001263620 | 6572 | 0C67 | FA04 | 81FF | 0600 | 7473 | 7461 | 7375 |
| 0001263640 | 0410 | FFF8 | 0081 | 670A | 7073 | 735F | 6174 | 7574 |
| 0001263660 | 0173 | 1702 | A101 | 89E2 | 8D05 | 1000 | 8200 | 0000 |
| 0001263700 | 0400 | 6708 | 7073 | 685F | 6C61 | 0A74 | FC04 | 85FF |

THU MAR 14 17:25:16 1991 CRV_IPS.DLL PAGE 323, LINE 18999

| | | | | | | | | |
|---|---|---|---|---|---|---|---|---|
| 0001263720 | 0400 | 7263 | 6765 | 040C | FFFA | 0081 | 7306 | 6174 |
| 0001263740 | 7574 | 0173 | 1902 | 2E01 | 8AE3 | 8D05 | 1000 | 8200 |
| 0001263760 | 0000 | 0400 | 670C | 7073 | 635F | 6E6F | 6974 | 756E |
| 0001264000 | 0A65 | FC04 | 85FF | 0400 | 7263 | 6765 | 040C | FFFA |
| 0001264020 | 0081 | 7306 | 6174 | 7574 | 0173 | 1D02 | BB01 | 8CE3 |
| 0001264040 | 1405 | 1002 | 0900 | 0002 | 0400 | 670E | 7073 | 695F |
| 0001264060 | 696E | 5F74 | 6976 | 6564 | 0A6F | 0604 | 2800 | 0405 |
| 0001264100 | 6F63 | 666E | 040C | FFFC | 0081 | 7306 | 6174 | 7574 |
| 0001264120 | 0173 | 1802 | CF01 | 8EE5 | 1B05 | 1000 | 1000 | 0000 |
| 0001264140 | 0400 | 6309 | 7672 | 655F | 7272 | 726F | 0201 | 0514 |
| 0001264160 | 30A0 | 0008 | 0086 | 630C | 7672 | 655F | 6378 | 5F70 |
| 0001264200 | 6573 | 0F6D | A405 | 0830 | 8600 | 0700 | 626D | 735F |
| 0001264220 | 7A69 | 0565 | 000D | 1A00 | 1200 | 0405 | 070D | 8500 |
| 0001264240 | 0A00 | 7264 | 5F76 | 6168 | 646E | 656C | 050F | 30A8 |
| 0001264260 | 0008 | 0086 | 6907 | 6470 | 735F | 6D65 | 0513 | 30AC |
| 0001264300 | 0008 | 0086 | 630B | 6D6F | 616D | 646E | 735F | 6D65 |
| 0001264320 | 051C | 563E | 0008 | 00C0 | 6914 | 746E | 745F | 7268 |
| 0001264340 | 6165 | 5F64 | 7473 | 6361 | 5F6B | 7470 | 1372 | B005 |
| 0001264360 | 0830 | 8500 | 0B00 | 6970 | 6578 | 5F6C | 6564 | 7470 |
| 0001264400 | 1468 | B205 | 0830 | 8600 | 0C00 | 6970 | 6374 | 5F68 |
| 0001264420 | 666F | 7366 | 7465 | 0511 | 309C | 0008 | 0086 | 6309 |
| 0001264440 | 7672 | 695F | 7370 | 6D65 | 1105 | 0003 | 0000 | 011B |
| 0001264460 | E5EA | 042E | 0109 | 0010 | 0DFE | 0000 | 0C04 | 7367 |
| 0001264500 | 5F70 | 6F64 | 6E77 | 6F6C | 6461 | 040E | 0006 | 00C0 |
| 0001264520 | 6608 | 6C69 | 6E65 | 6D61 | 0D65 | F604 | 86FF | 0700 |
| 0001264540 | 6461 | 7264 | 7365 | 0C73 | FC04 | 81FF | 0600 | 7473 |
| 0001264560 | 7461 | 7375 | 040A | FFF4 | 0085 | 6404 | 7461 | 0961 |
| 0001264600 | FA04 | 84FF | 0300 | 6E63 | 0174 | 1702 | F301 | 30E6 |
| 0001264620 | 3D04 | 1000 | 3200 | 0000 | 0400 | 6808 | 6C61 | 5F74 |
| 0001264640 | 7367 | DA70 | FC04 | 85FF | 0400 | 6164 | 6174 | 0201 |
| 0001264660 | 0117 | E730 | 0431 | 0040 | 0010 | 0035 | 0000 | 0804 |
| 0001264700 | 6163 | 6863 | 5F65 | 6E6F | 040A | FFFC | 0085 | 6404 |
| 0001264720 | 7461 | 0A61 | FA04 | 85FF | 0400 | 616D | 6B73 | 0201 |
| 0001264740 | 0116 | E770 | 0432 | 0034 | 0010 | 0029 | 0000 | 0704 |
| 0001264760 | 7273 | 6D61 | 6F5F | 0A6E | FC04 | 85FF | 0400 | 6164 |
| 0001265000 | 6174 | 0201 | 0116 | E7A4 | 0434 | 005E | 0010 | 0053 |
| 0001265020 | 0000 | 0704 | 7865 | 5F65 | 6D6E | 0869 | 0604 | 8600 |
| 0001265040 | 0200 | 6370 | 040A | FFFC | 0085 | 6404 | 7461 | 0A61 |
| 0001265060 | FA04 | 85FF | 0400 | 616D | 6B73 | 0201 | 011B | E802 |
| 0001265100 | 0436 | 002D | 0010 | 0022 | 0000 | 0C04 | 6572 | 6F70 |
| 0001265120 | 7472 | 655F | 7272 | 726F | 0409 | 0006 | 00C0 | 7303 |
| 0001265140 | 7274 | 0201 | 0117 | E82F | 0439 | 045A | 0010 | 044F |
| 0001265160 | 0000 | 0804 | 6F6C | 6461 | 735F | 6264 | 040E | 0006 |
| 0001265200 | 00C0 | 6F08 | 6A62 | 665F | 6C69 | 0965 | EE04 | 06FF |
| 0001265220 | 0302 | 6E69 | 0870 | E804 | 82FF | 0200 | 7069 | 040E |
| 0001265240 | FFB0 | 043B | 6608 | 6C69 | 685F | 6165 | 0864 | A804 |
| 0001265260 | 3EFF | 0204 | 6866 | 0411 | FFCA | 043F | 6F0B | 5F70 |
| 0001265300 | 6966 | 5F6C | 6568 | 6461 | 0409 | FFAC | 0442 | 6F03 |
| 0001265320 | 6866 | 040F | FFF6 | 0085 | 6909 | 746E | 635F | 756F |
| 0001265340 | 746E | 040C | FFF2 | 0082 | 6F06 | 6666 | 6573 | 0774 |
| 0001265360 | EC04 | 81FF | 0100 | 0969 | E604 | 81FF | 0300 | 646E |
| 0001265400 | 1B78 | C404 | 81FF | 1500 | 6C6F | 5F64 | 6F68 | 7473 |
| 0001265420 | 635F | 6E6F | 7274 | 6C6F | 685F | 6769 | 1168 | F804 |
| 0001265440 | 81FF | 0B00 | 6D74 | 5F70 | 6F63 | 746E | 6F72 | 086C |
| 0001265460 | C604 | 47FF | 0204 | 6873 | 040F | FFFA | 0081 | 6E09 |
| 0001265500 | 5F6F | 7573 | 6666 | 7869 | 040C | FFFC | 0081 | 7706 |
| 0001265520 | 735F | 7A69 | 0F65 | 550B | 00EC | 450A | 5252 | 524F |
| 0001265540 | 455F | 4958 | 0154 | 1302 | C805 | 0830 | 2700 | 0B04 |
| 0001265560 | 7367 | 5F70 | 7270 | 676F | 6172 | 056D | 000D | 1A00 |

THU MAR 14 17:25:16 1991 CRV_IPS.DLL PAGE 324, LINE 19058

| | | | | | | | | |
|---|---|---|---|---|---|---|---|---|
| 0001265600 | 0B00 | 5005 | 070F | 2500 | 0304 | 7562 | 0C66 | 0405 |
| 0001265620 | 0700 | 2500 | 0404 | 6274 | 6675 | 6309 | 7672 | 615F |
| 0001265640 | 696F | 632E | 0001 | 02A9 | 00E7 | 000D | 00EA | 0016 |
| 0001265660 | 00EB | 0020 | 00EC | 002D | 00EE | 0037 | 00EF | 003D |
| 0001265700 | 00F1 | 004B | 00F3 | 005B | 00F4 | 006A | 00F5 | 0073 |
| 0001265720 | 00F7 | 0079 | 00F8 | 0081 | 00F9 | 008A | 00FC | 0090 |
| 0001265740 | 0100 | 0093 | 0102 | 0099 | 0103 | 00A1 | 0104 | 00AA |
| 0001265760 | 010A | 00B0 | 010B | 00BA | 010C | 00C7 | 0110 | 00CD |
| 0001266000 | 0112 | 00E4 | 0113 | 00F3 | 0117 | 00FD | 0118 | 0103 |
| 0001266020 | 0136 | 0111 | 0139 | 0127 | 013B | 0131 | 013D | 013E |
| 0001266040 | 013F | 0144 | 0141 | 0156 | 0143 | 0166 | 0144 | 016E |
| 0001266060 | 0145 | 0177 | 0147 | 017D | 0149 | 0180 | 014B | 0186 |
| 0001266100 | 014C | 018E | 014D | 0197 | 014F | 019D | 0151 | 01B4 |
| 0001266120 | 0152 | 01C8 | 0153 | 01CE | 0154 | 01D1 | 0158 | 01D7 |
| 0001266140 | 0159 | 01DD | 016B | 01EB | 016E | 0201 | 0170 | 0207 |
| 0001266160 | 0171 | 0216 | 0172 | 021F | 0174 | 0225 | 0175 | 022D |
| 0001266200 | 0176 | 0236 | 0178 | 023C | 017A | 0248 | 017B | 024E |
| 0001266220 | 018F | 025A | 0192 | 0270 | 0195 | 027D | 0197 | 0294 |
| 0001266240 | 0198 | 02A3 | 0199 | 02A9 | 019D | 02B5 | 019E | 02CF |
| 0001266260 | 019F | 02DB | 01A1 | 02DE | 01A2 | 02F8 | 01A3 | 0301 |
| 0001266300 | 01A5 | 0307 | 01A7 | 0313 | 01AB | 031D | 01AD | 0340 |
| 0001266320 | 01AE | 034F | 01AF | 0355 | 01B1 | 0361 | 01B4 | 0364 |
| 0001266340 | 01B5 | 037C | 01B6 | 038B | 01B7 | 0391 | 01BE | 039D |
| 0001266360 | 01BF | 03A5 | 01C0 | 03AE | 01C2 | 03B4 | 01C3 | 03BA |
| 0001266400 | 01D5 | 03C8 | 01D9 | 03DE | 01DC | 03EB | 01DE | 03F5 |
| 0001266420 | 01DF | 03FD | 01E0 | 0406 | 01E3 | 040C | 01E4 | 041B |
| 0001266440 | 01E5 | 0424 | 01E8 | 042A | 01E9 | 0444 | 01EA | 044D |
| 0001266460 | 01EE | 0453 | 01EF | 0469 | 01F0 | 0472 | 01F1 | 0478 |
| 0001266500 | 01F4 | 047E | 01F5 | 048D | 01F6 | 0496 | 01F8 | 049C |
| 0001266520 | 01F9 | 04A4 | 01FA | 04AD | 01FC | 04B3 | 01FE | 04B6 |
| 0001266540 | 01FF | 04C5 | 0200 | 04CE | 0203 | 04D4 | 0204 | 04EE |
| 0001266560 | 0205 | 04F7 | 0209 | 04FD | 020A | 0513 | 020B | 051C |
| 0001266600 | 020C | 0522 | 020F | 0528 | 0210 | 0537 | 0211 | 0540 |
| 0001266620 | 0215 | 0546 | 0219 | 0549 | 021C | 0560 | 021E | 0580 |
| 0001266640 | 021F | 058A | 0220 | 0592 | 0221 | 059B | 0224 | 05A1 |
| 0001266660 | 0225 | 05B0 | 0226 | 05B9 | 0229 | 05BF | 022A | 05CE |
| 0001266700 | 022B | 05D7 | 022D | 05DD | 022E | 05F0 | 022F | 05F9 |
| 0001266720 | 0232 | 05FF | 0233 | 060E | 0234 | 0617 | 0236 | 061D |
| 0001266740 | 0237 | 0625 | 0238 | 062E | 0239 | 0634 | 023B | 0637 |
| 0001266760 | 023C | 0646 | 023D | 064F | 0240 | 0655 | 0241 | 0664 |
| 0001267000 | 0242 | 066D | 0244 | 0673 | 0245 | 0686 | 0246 | 068F |
| 0001267020 | 0249 | 0695 | 024A | 06A4 | 024B | 06AD | 024F | 06B3 |
| 0001267040 | 0251 | 06B6 | 0253 | 06BC | 0254 | 06C2 | 0269 | 06D0 |
| 0001267060 | 026D | 06E6 | 0272 | 06F0 | 0273 | 06F6 | 0274 | 0707 |
| 0001267100 | 027A | 070A | 027E | 0716 | 0280 | 071F | 0281 | 0729 |
| 0001267120 | 0282 | 072F | 0283 | 0739 | 0284 | 073C | 0285 | 0742 |
| 0001267140 | 0287 | 074C | 0288 | 075D | 028D | 0760 | 028E | 0769 |
| 0001267160 | 028F | 0772 | 0290 | 0782 | 0291 | 0790 | 0292 | 0796 |
| 0001267200 | 0293 | 07A7 | 0298 | 07AA | 0299 | 07B3 | 029A | 07C3 |
| 0001267220 | 029B | 07CC | 029C | 07DA | 029D | 07E0 | 029F | 07F1 |
| 0001267240 | 02A4 | 07F4 | 02A5 | 07FD | 02A6 | 0806 | 02A7 | 0816 |
| 0001267260 | 02A8 | 0824 | 02A9 | 082A | 02AA | 083B | 02AF | 083E |
| 0001267300 | 02B0 | 0847 | 02B1 | 0857 | 02B2 | 0860 | 02B3 | 086E |
| 0001267320 | 02B4 | 0874 | 02B5 | 0885 | 02B9 | 0888 | 02BA | 0891 |
| 0001267340 | 02BB | 08A1 | 02BC | 08B1 | 02BD | 08BF | 02BE | 08C5 |
| 0001267360 | 02BF | 08D6 | 02C3 | 08D9 | 02C4 | 08E2 | 02C5 | 08F2 |
| 0001267400 | 02C6 | 0902 | 02C7 | 0910 | 02C8 | 0916 | 02C9 | 0927 |
| 0001267420 | 02CD | 092A | 02CE | 0933 | 02CF | 0943 | 02D0 | 0953 |
| 0001267440 | 02D1 | 0961 | 02D2 | 0967 | 02D3 | 0978 | 02D7 | 097B |

THU MAR 14 17:25:16 1991 CRV_IPS.DLL PAGE 325, LINE 19117

| | | | | | | | | |
|---|---|---|---|---|---|---|---|---|
| 0001267460 | 02D8 | 0984 | 02D9 | 0994 | 02DA | 09A4 | 02DB | 09B2 |
| 0001267500 | 02DC | 09B8 | 02DE | 09C9 | 02E2 | 09CC | 02E3 | 09D2 |
| 0001267520 | 02E4 | 09D8 | 02E5 | 09DB | 02E9 | 0A5D | 02EA | 0A63 |
| 0001267540 | 02EB | 0A69 | 02EC | 0A6C | 02ED | 0A87 | 02EE | 0A8D |
| 0001267560 | 02F8 | 0A9B | 02FB | 0AAB | 02FE | 0AB1 | 02FF | 0AC5 |
| 0001267600 | 0300 | 0ACB | 0301 | 0AD1 | 0302 | 0ADC | 0303 | 0AE2 |
| 0001267620 | 0304 | 0AE5 | 0306 | 0AEB | 0308 | 0AEE | 0309 | 0B03 |
| 0001267640 | 030A | 0B06 | 030B | 0B19 | 0321 | 0B24 | 0324 | 0B3A |
| 0001267660 | 0328 | 0B3F | 032B | 0B45 | 032C | 0B4F | 032D | 0B55 |
| 0001267700 | 0330 | 0B58 | 0331 | 0B62 | 0332 | 0B68 | 0333 | 0B6B |
| 0001267720 | 0336 | 0B7E | 0337 | 0B88 | 0338 | 0B90 | 0339 | 0B99 |
| 0001267740 | 033A | 0B9F | 033D | 0BA4 | 033E | 0BB3 | 033F | 0BBC |
| 0001267760 | 0342 | 0BC2 | 0345 | 0BC8 | 0347 | 0BDE | 0348 | 0BFB |
| 0001270000 | 0349 | 0C04 | 034A | 0C0A | 034B | 0C0D | 034E | 0C10 |
| 0001270020 | 0350 | 0C26 | 0351 | 0C43 | 0352 | 0C4C | 0353 | 0C52 |
| 0001270040 | 0354 | 0C55 | 0355 | 0C58 | 0358 | 0C6B | 0359 | 0C7A |
| 0001270060 | 035A | 0C83 | 035C | 0C89 | 035D | 0C92 | 035E | 0C9A |
| 0001270100 | 035F | 0CA3 | 0362 | 0CA9 | 0363 | 0CAF | 0377 | 0CBD |
| 0001270120 | 037B | 0CCD | 037C | 0CDD | 037D | 0CE7 | 037F | 0CED |
| 0001270140 | 0381 | 0CF7 | 0383 | 0CFD | 0387 | 0D03 | 0388 | 0D09 |
| 0001270160 | 0389 | 0D18 | 038D | 0D1B | 038E | 0D21 | 038F | 0D30 |
| 0001270200 | 0390 | 0D33 | 0391 | 0D46 | 0392 | 0D50 | 0394 | 0D56 |
| 0001270220 | 0395 | 0D5B | 0396 | 0D61 | 0398 | 0D67 | 0399 | 0D6D |
| 0001270240 | 03AB | 0D78 | 03AF | 0D8E | 03B0 | 0D98 | 03B2 | 0D9E |
| 0001270260 | 03B3 | 0DA8 | 03B4 | 0DB0 | 03B5 | 0DB9 | 03B8 | 0DBF |
| 0001270300 | 03B9 | 0DCC | 03BA | 0DDB | 03BB | 0DE4 | 03BC | 0DEA |
| 0001270320 | 03BD | 0DEF | 03BE | 0DF2 | 03BF | 0DF7 | 03C0 | 0E06 |
| 0001270340 | 03C1 | 0E0F | 03C4 | 0E15 | 03C5 | 0E1F | 03C6 | 0E27 |
| 0001270360 | 03C7 | 0E30 | 03C9 | 0E36 | 03CA | 0E3C | 03DD | 0E4A |
| 0001270400 | 03E7 | 0E5A | 03E9 | 0E67 | 03EE | 0E6D | 03EF | 0E77 |
| 0001270420 | 03F0 | 0E84 | 03F1 | 0E8A | 03F4 | 0E90 | 03F6 | 0E9D |
| 0001270440 | 03F8 | 0EB3 | 03FA | 0EDA | 03FB | 0EE9 | 03FC | 0EF3 |
| 0001270460 | 03FE | 0EF9 | 0400 | 0F09 | 0401 | 0F20 | 0403 | 0F24 |
| 0001270500 | 0404 | 0F36 | 0405 | 0F42 | 0407 | 0F48 | 040A | 0F51 |
| 0001270520 | 040B | 0F54 | 040C | 0F61 | 040D | 0F68 | 040E | 0F6F |
| 0001270540 | 040F | 0F85 | 0410 | 0F9D | 0413 | 0FA3 | 0417 | 0FA6 |
| 0001270560 | 0419 | 0FB3 | 041A | 0FC9 | 041B | 0FD5 | 041C | 0FE5 |
| 0001270600 | 041D | 0FEB | 041F | 0FFB | 0420 | 100A | 0421 | 1014 |
| 0001270620 | 0423 | 101A | 0424 | 1028 | 0426 | 102E | 0427 | 1031 |
| 0001270640 | 0428 | 1038 | 0429 | 103F | 042A | 1055 | 042C | 1064 |
| 0001270660 | 0431 | 106A | 0432 | 1086 | 0434 | 1089 | 0435 | 10A1 |
| 0001270700 | 0436 | 10A4 | 0438 | 10B6 | 0439 | 10BC | 043B | 10D1 |
| 0001270720 | 043D | 10E4 | 043F | 10E7 | 0440 | 10F9 | 0442 | 1109 |
| 0001270740 | 0443 | 110F | 0444 | 1115 | 0446 | 111B | 0447 | 1121 |
| 0001270760 | 0458 | 112C | 0461 | 113C | 0463 | 1149 | 0468 | 114F |
| 0001271000 | 0469 | 1159 | 046A | 115F | 046B | 1169 | 046C | 1181 |
| 0001271020 | 0470 | 1187 | 0472 | 1194 | 0474 | 11AA | 0475 | 11B9 |
| 0001271040 | 0476 | 11C2 | 0478 | 11C8 | 047A | 11D8 | 047D | 11DE |
| 0001271060 | 047E | 11E1 | 047F | 11EE | 0480 | 11F5 | 0481 | 11FC |
| 0001271100 | 0482 | 1212 | 0485 | 122A | 0486 | 1230 | 048A | 1233 |
| 0001271120 | 048C | 1240 | 048E | 1256 | 048F | 1265 | 0490 | 126E |
| 0001271140 | 0492 | 1274 | 0493 | 1284 | 0495 | 128A | 0497 | 129A |
| 0001271160 | 0498 | 12B0 | 0499 | 12B9 | 049A | 12C2 | 049B | 12D2 |
| 0001271200 | 049D | 12D8 | 049E | 12DE | 04A2 | 12E1 | 04A4 | 12EE |
| 0001271220 | 04A5 | 1304 | 04A6 | 1318 | 04A7 | 1324 | 04A8 | 132A |
| 0001271240 | 04A9 | 133A | 04AA | 1348 | 04AB | 134E | 04AC | 1354 |
| 0001271260 | 04AE | 135A | 04AF | 135D | 04B0 | 136C | 04B1 | 1382 |
| 0001271300 | 04B2 | 1388 | 04B3 | 138E | 04B4 | 139F | 04B5 | 13B4 |
| 0001271320 | 04B7 | 13BA | 04B9 | 13D3 | 04BA | 13D6 | 04BB | 13E6 |

THU MAR 14 17:25:16 1991 CRV_IPS.DLL PAGE 326, LINE 19176

| | | | | | | | | |
|---|---|---|---|---|---|---|---|---|
| 0001271340 | 04BC | 13EC | 04BD | 13F2 | 04BF | 13F8 | 04C0 | 13FF |
| 0001271360 | 04D0 | 140A | 04D1 | 141A | 04D4 | 1421 | 04D5 | 1448 |
| 0001271400 | 04D6 | 1458 | 04D8 | 145E | 04D9 | 1486 | 04DA | 14A6 |
| 0001271420 | 04DB | 14AC | 04E5 | 14B7 | 04E9 | 14C7 | 04EA | 14CC |
| 0001271440 | 04EB | 14D1 | 04EC | 14DC | 04ED | 14E3 | 04EE | 14E8 |
| 0001271460 | 04EF | 14FC | 04F0 | 1502 | 04FB | 150D | 04FF | 151D |
| 0001271500 | 0500 | 1522 | 0501 | 1527 | 0502 | 1532 | 0503 | 1539 |
| 0001271520 | 0505 | 153E | 0508 | 1545 | 0509 | 156C | 050A | 157C |
| 0001271540 | 050C | 1582 | 050E | 159C | 050F | 15D2 | 0510 | 15EC |
| 0001271560 | 0512 | 15F2 | 051E | 15FD | 0524 | 160D | 0525 | 1622 |
| 0001271600 | 0526 | 162F | 0527 | 1639 | 0530 | 164E | 0531 | 16AA |
| 0001271620 | 0532 | 16AD | 0533 | 16B0 | 0534 | 16B9 | 0535 | 16BF |
| 0001271640 | 0537 | 16D8 | 0538 | 170B | 0539 | 170E | 053A | 1715 |
| 0001271660 | 053D | 1722 | 053E | 1749 | 053F | 1759 | 0541 | 175F |
| 0001271700 | 0542 | 1765 | 054C | 1770 | 054D | 1780 | 054E | 1789 |
| 0001271720 | 054F | 179C | 0550 | 17A9 | 0551 | 17AF | 055E | 17BA |
| 0001271740 | 0563 | 17CA | 0564 | 17DF | 0565 | 17EC | 0566 | 17F6 |
| 0001271760 | 056F | 180C | 0570 | 1868 | 0571 | 186B | 0573 | 186E |
| 0001272000 | 0574 | 1891 | 0575 | 18AC | 0576 | 18B2 | 058A | 18BD |
| 0001272020 | 0593 | 18CD | 0595 | 18D6 | 0596 | 18E0 | 0597 | 18E9 |
| 0001272040 | 0598 | 18EF | 059A | 18F9 | 059B | 1902 | 059C | 1908 |
| 0001272060 | 059D | 1913 | 059E | 191C | 059F | 1922 | 05A2 | 192E |
| 0001272100 | 05A3 | 1944 | 05A5 | 196B | 05A6 | 19AE | 05A7 | 19BA |
| 0001272120 | 05A9 | 19C0 | 05AA | 19C3 | 05AB | 19D6 | 05AC | 19DC |
| 0001272140 | 05AD | 19FF | 05AE | 1A05 | 05AF | 1A12 | 05B1 | 1A18 |
| 0001272160 | 05B2 | 1A1B | 05B5 | 1A32 | 05B8 | 1A5E | 05B9 | 1A81 |
| 0001272200 | 05BB | 1A87 | 05BC | 1A8A | 05BE | 1A90 | 05CC | 1A9B |
| 0001272220 | 05D1 | 1AAB | 05D3 | 1ABD | 05D4 | 1ADB | 05D8 | 1B42 |
| 0001272240 | 05D9 | 1B60 | 05DD | 1BC7 | 05DE | 1BEE | 05E2 | 1C05 |
| 0001272260 | 05E3 | 1C41 | 05E5 | 1C4B | 05E6 | 1C54 | 05F5 | 1C5F |
| 0001272300 | 05FA | 1C6F | 05FB | 1CB7 | 0600 | 1CBD | 0601 | 1D05 |
| 0001272320 | 0603 | 1D0B | 0604 | 1D3C | 0605 | 1D6D | 0606 | 1D73 |
| 0001272340 | 0607 | 1DA7 | 0608 | 1DAD | 0609 | 1DB0 | 060A | 1DB6 |
| 0001272360 | 060B | 1DEA | 060C | 1E1B | 060D | 1E21 | 060E | 1E55 |
| 0001272400 | 060F | 1E5B | 0610 | 1E5E | 0611 | 1E64 | 0612 | 1E98 |
| 0001272420 | 0613 | 1E9E | 0614 | 1EA1 | 0615 | 1EA7 | 061E | 1EB2 |
| 0001272440 | 0622 | 1EC2 | 0624 | 1ED8 | 0625 | 1EEF | 0626 | 1EF8 |
| 0001272460 | 0627 | 1EFE | 062A | 1F01 | 062C | 1F17 | 062D | 1F1D |
| 0001272500 | 063A | 1F28 | 063D | 1F38 | 063E | 1F44 | 063F | 1F63 |
| 0001272520 | 0640 | 1F6C | 0643 | 1F72 | 0644 | 1F7E | 0645 | 1F9D |
| 0001272540 | 0646 | 1FA6 | 0649 | 1FAC | 064A | 1FB2 | 0661 | 1FBD |
| 0001272560 | 0662 | 1FCD | 0663 | 1FD3 | 0664 | 1FD9 | 0665 | 1FDF |
| 0001272600 | 0666 | 1FE5 | 0670 | 1FF0 | 0671 | 2000 | 0672 | 2006 |
| 0001272620 | 0673 | 200C | 0674 | 201F | 067E | 202A | 0680 | 203A |
| 0001272640 | 0682 | 203F | 0684 | 204C | 0685 | 2062 | 0686 | 2083 |
| 0001272660 | 0687 | 2089 | 0688 | 2095 | 068A | 209D | 068C | 20B3 |
| 0001272700 | 068D | 20B9 | 0699 | 20C4 | 06A4 | 20D4 | 06A5 | 20DE |
| 0001272720 | 06A7 | 20E6 | 06A8 | 2100 | 06A9 | 2109 | 06AE | 210F |
| 0001272740 | 06B3 | 212B | 06B4 | 2136 | 06B6 | 213C | 06BA | 2153 |
| 0001272760 | 06BC | 2171 | 06BE | 2190 | 06C0 | 21AF | 06C6 | 21CE |
| 0001273000 | 06CA | 220A | 06CD | 221C | 06CE | 2231 | 06CF | 2234 |
| 0001273020 | 06D0 | 2249 | 06D2 | 224C | 06D4 | 2252 | 06D7 | 2257 |
| 0001273040 | 06D9 | 2266 | 06DB | 227B | 06DC | 2286 | 06DE | 228C |
| 0001273060 | 06DF | 22A1 | 06E2 | 22BD | 06E4 | 22DC | 06E5 | 22E5 |
| 0001273100 | 06E7 | 22EB | 06E9 | 22F9 | 06EA | 2307 | 6309 | 7672 |
| 0001273120 | 625F | 786F | 632E | 0001 | 00E1 | 005B | 2312 | 005E |
| 0001273140 | 2322 | 0060 | 235A | 0063 | 2392 | 0065 | 23AC | 0067 |
| 0001273160 | 23C6 | 0069 | 23CB | 006A | 23EC | 0074 | 23F7 | 0077 |
| 0001273200 | 2407 | 0079 | 243F | 007C | 2477 | 007E | 2491 | 0080 |

THU MAR 14 17:25:16 1991 CRV_IPS.DLL PAGE 327, LINE 19235

| | | | | | | | | |
|---|---|---|---|---|---|---|---|---|
| 0001273220 | 24AB | 0082 | 24B0 | 0083 | 24D1 | 008E | 24DC | 0092 |
| 0001273240 | 24EC | 0094 | 2524 | 0097 | 255C | 0099 | 2576 | 009B |
| 0001273260 | 2590 | 009D | 25C8 | 00A0 | 2600 | 00A2 | 261A | 00A4 |
| 0001273300 | 2634 | 00A6 | 2639 | 00A7 | 265A | 00B5 | 2665 | 00BA |
| 0001273320 | 2675 | 00BB | 268B | 00BC | 2694 | 00BE | 269D | 00BF |
| 0001273340 | 26A7 | 00C0 | 26B1 | 00C1 | 26BB | 00CA | 26C5 | 00CE |
| 0001273360 | 2709 | 00CF | 2713 | 00D0 | 271D | 00D1 | 2727 | 00D4 |
| 0001273400 | 2731 | 00D5 | 2747 | 00E2 | 2752 | 00E5 | 2762 | 00E6 |
| 0001273420 | 2778 | 00E8 | 277E | 00E9 | 2788 | 00EB | 278B | 00EC |
| 0001273440 | 2795 | 00EE | 2798 | 00EF | 27A2 | 00F1 | 27A5 | 00F2 |
| 0001273460 | 27AF | 00F4 | 27B2 | 00F5 | 27BC | 00F6 | 27C6 | 00F8 |
| 0001273500 | 27C9 | 00F9 | 27D3 | 00FA | 27DD | 00FC | 27E0 | 00FD |
| 0001273520 | 27EA | 00FE | 27F4 | 0100 | 27F7 | 0101 | 2801 | 0102 |
| 0001273540 | 280B | 0103 | 280E | 0105 | 2832 | 0106 | 2848 | 0113 |
| 0001273560 | 2853 | 011A | 2863 | 011B | 286E | 011C | 2878 | 011D |
| 0001273600 | 2882 | 011E | 288C | 011F | 28A3 | 0120 | 28AC | 0121 |
| 0001273620 | 28C0 | 0122 | 28CE | 0125 | 28DA | 0126 | 28EE | 0127 |
| 0001273640 | 28FD | 0128 | 2909 | 0129 | 2911 | 012A | 2925 | 012B |
| 0001273660 | 2934 | 012C | 2940 | 012E | 2948 | 0131 | 294B | 0132 |
| 0001273700 | 2959 | 0135 | 2967 | 0136 | 2970 | 0137 | 2975 | 0138 |
| 0001273720 | 2981 | 0139 | 2988 | 013A | 2991 | 013B | 2996 | 013C |
| 0001273740 | 29A1 | 013E | 29A8 | 013F | 29BA | 0142 | 29CC | 0143 |
| 0001273760 | 29CF | 0145 | 29D7 | 0146 | 29DD | 0151 | 29E8 | 0154 |
| 0001274000 | 29F8 | 0155 | 29FE | 0157 | 2A04 | 0159 | 2A09 | 015A |
| 0001274020 | 2A13 | 015B | 2A19 | 015C | 2A1C | 015E | 2A22 | 015F |
| 0001274040 | 2A43 | 016A | 2A4E | 016F | 2A5E | 0170 | 2A68 | 0172 |
| 0001274060 | 2A6E | 0173 | 2A74 | 0175 | 2A7A | 0177 | 2A7F | 0179 |
| 0001274100 | 2A85 | 017A | 2AA6 | 0187 | 2AB1 | 018A | 2AC1 | 018B |
| 0001274120 | 2AC7 | 018C | 2ACD | 018D | 2AD3 | 018F | 2AD9 | 0191 |
| 0001274140 | 2ADE | 0192 | 2AFF | 019E | 2B0A | 01A1 | 2B1A | 01A2 |
| 0001274160 | 2B34 | 01A3 | 2B4E | 01A4 | 2B68 | 01A6 | 2B82 | 01A7 |
| 0001274200 | 2B8C | 01A8 | 2B96 | 01A9 | 2BA0 | 01AB | 2BAA | 01AC |
| 0001274220 | 2BB0 | 01B8 | 2BBB | 01BD | 2BCB | 01BE | 2BF5 | 01C2 |
| 0001274240 | 2C1F | 01C3 | 2C39 | 01C4 | 2C42 | 01C6 | 2C48 | 01CB |
| 0001274260 | 2C51 | 01CC | 2C56 | 01CE | 2C5B | 01CF | 2C75 | 01D0 |
| 0001274300 | 2C7E | 01D1 | 2C84 | 01D3 | 2C8A | 01D4 | 2C8D | 01D5 |
| 0001274320 | 2C90 | 01D6 | 2C9C | 01D7 | 2CA2 | 01E4 | 2CAD | 01E6 |
| 0001274340 | 2CBD | 01E8 | 2CD6 | 01F2 | 2CE1 | 01F5 | 2CF1 | 01F6 |
| 0001274360 | 2CF6 | 01F7 | 2D17 | 020F | 2D22 | 0212 | 2D32 | 0213 |
| 0001274400 | 2D38 | 0214 | 2D45 | 0215 | 2D4A | 0216 | 2D5B | 0217 |
| 0001274420 | 2D64 | 021A | 2D6A | 021B | 2D7B | 021C | 2D84 | 021E |
| 0001274440 | 2D8A | 021F | 2D90 | 0229 | 2D9B | 022C | 2DAB | 022D |
| 0001274460 | 2DE2 | 022E | 2DF7 | 022F | 2E03 | 0231 | 2E09 | 0232 |
| 0001274500 | 2E20 | 0234 | 2E61 | 0235 | 2E67 | 023F | 2E72 | 0242 |
| 0001274520 | 2E82 | 0243 | 2EB9 | 0244 | 2ECE | 0245 | 2EDA | 0247 |
| 0001274540 | 2EED | 0248 | 2EF6 | 024A | 2F37 | 024B | 2F3D | 0256 |
| 0001274560 | 2F48 | 0257 | 2F58 | 0258 | 2F5E | 0262 | 2F69 | 0263 |
| 0001274600 | 2F79 | 0264 | 2F7F | 026F | 2F8A | 0274 | 2F9A | 0275 |
| 0001274620 | 2FA4 | 0276 | 2FAE | 0277 | 2FB8 | 0279 | 2FC2 | 027A |
| 0001274640 | 2FCF | 027B | 2FD4 | 027C | 2FD7 | 027E | 2FDC | 027F |
| 0001274660 | 2FE1 | 0280 | 3002 | 0281 | 300B | 0282 | 3011 | 0283 |
| 0001274700 | 3017 | 028C | 3022 | 028F | 3032 | 0290 | 3037 | 0291 |
| 0001274720 | 3058 | 029A | 3063 | 029B | 3073 | 029C | 3079 | 630A |
| 0001274740 | 7672 | 645F | 7369 | 2E70 | 0163 | 6600 | AB02 | 8400 |
| 0001274760 | AC30 | 9A00 | B430 | 2D00 | B531 | 3300 | B631 | 3900 |
| 0001275000 | B731 | 3F00 | B831 | 4500 | B931 | 4B00 | BA31 | 5100 |
| 0001275020 | BB31 | 5B00 | BD31 | 6D00 | C031 | EA00 | C231 | FE00 |
| 0001275040 | C431 | 0700 | C532 | 2000 | C732 | 2900 | C832 | 8400 |
| 0001275060 | CA32 | 0100 | CC33 | 0A00 | CD33 | 2100 | CF33 | 2A00 |

THU MAR 14 17:25:16 1991 CRV_IPS.DLL PAGE 328, LINE 19294

| | | | | | | | | |
|---|---|---|---|---|---|---|---|---|
| 0001275100 | D033 | 4100 | D133 | 4A00 | D333 | 6100 | D433 | 6700 |
| 0001275120 | D833 | 6D00 | D933 | 7600 | DA33 | 8400 | DC33 | 8D00 |
| 0001275140 | DE33 | E400 | E633 | 6200 | E734 | 9000 | E934 | 9900 |
| 0001275160 | EA34 | F400 | ED34 | 7200 | EF35 | B400 | F035 | BE00 |
| 0001275200 | F235 | C800 | F435 | D600 | F535 | E400 | F635 | FC00 |
| 0001275220 | F835 | 0500 | F936 | 6000 | FC36 | DE00 | FD36 | E400 |
| 0001275240 | FE36 | EA00 | FF36 | F000 | 0136 | F501 | 0336 | 1701 |
| 0001275260 | 0437 | 7201 | 0937 | EF01 | 0A37 | 1101 | 0C38 | 1A01 |
| 0001275300 | 0D38 | 7501 | 1038 | F301 | 1138 | FC01 | 1538 | 7901 |
| 0001275320 | 1639 | A701 | 1839 | B001 | 1939 | 0B01 | 1C3A | 8901 |
| 0001275340 | 1E3A | CB01 | 1F3A | D501 | 213A | DF01 | 233A | ED01 |
| 0001275360 | 243A | FB01 | 253A | 1301 | 273B | 1C01 | 283B | 7701 |
| 0001275400 | 2B3B | F501 | 2C3B | FB01 | 303B | 0101 | 313C | 2301 |
| 0001275420 | 333C | 2C01 | 343C | 8701 | 373C | 0501 | 383D | 0E01 |
| 0001275440 | 3C3D | 8B01 | 3D3D | B901 | 3F3D | C201 | 403D | 1D01 |
| 0001275460 | 433E | 9B01 | 453E | DD01 | 463E | E701 | 483E | F101 |
| 0001275500 | 4A3E | FF01 | 4B3E | 0D01 | 4C3F | 2501 | 4E3F | 2E01 |
| 0001275520 | 4F3F | 8901 | 523F | 0701 | 5340 | 0D01 | 5740 | 1301 |
| 0001275540 | 5840 | 3501 | 5A40 | 3E01 | 5B40 | 9901 | 5E40 | 1701 |
| 0001275560 | 5F41 | 9401 | 7141 | A201 | 7241 | B801 | 7A41 | 4B01 |
| 0001275600 | 7B42 | 5101 | 7D42 | 5701 | 7F42 | 6B01 | 8142 | 7E01 |
| 0001275620 | 8242 | 9701 | 8442 | A001 | 8542 | FB01 | 8742 | 7801 |
| 0001275640 | 8C43 | 8101 | 8E43 | 8A01 | 8F43 | A101 | 9043 | B801 |
| 0001275660 | 9143 | CA01 | 9243 | D001 | 9543 | 4D01 | 9644 | 5301 |
| 0001275700 | 9744 | 5901 | 9844 | 5F01 | 9B44 | 6501 | 9C44 | 9301 |
| 0001275720 | 9E44 | 9C01 | 9F44 | F701 | A244 | 7501 | A445 | B701 |
| 0001275740 | A545 | C101 | A745 | CB01 | A945 | D901 | AA45 | E701 |
| 0001275760 | AC45 | FF01 | AD45 | 1E01 | AF46 | 2701 | B046 | 8201 |
| 0001276000 | B246 | 0001 | B347 | 0601 | B747 | 0C01 | B847 | 4101 |
| 0001276020 | BA47 | 4A01 | BB47 | 6801 | BC47 | E501 | BE47 | E801 |
| 0001276040 | BF47 | 4301 | C248 | C101 | C548 | 0301 | C649 | 2201 |
| 0001276060 | C949 | 9F01 | CB49 | B701 | CC49 | D901 | CE49 | E201 |
| 0001276100 | CF49 | 3D01 | D24A | BA01 | D34A | C001 | D44A | D901 |
| 0001276120 | D64A | E201 | D74A | 3D01 | D94B | BA01 | DA4B | C001 |
| 0001276140 | DB4B | C601 | DD4B | CC01 | DF4B | D501 | E04B | 3001 |
| 0001276160 | E44C | AE01 | E84C | F501 | E94C | 2A01 | EC4D | 4801 |
| 0001276200 | ED4D | 6C01 | F04D | 7501 | F14D | 9401 | F34D | 1101 |
| 0001276220 | F54E | 1401 | F64E | 6F01 | F94E | ED01 | FB4E | F001 |
| 0001276240 | FC4E | FA01 | FE4E | 0401 | 004F | 1202 | 014F | 2002 |
| 0001276260 | 024F | 3802 | 054F | 4102 | 074F | 6002 | 084F | 8402 |
| 0001276300 | 094F | DF02 | 0B4F | 5D02 | 0C50 | 6302 | 0D50 | 6902 |
| 0001276320 | 0F50 | 6F02 | 1050 | 8702 | 1350 | 9002 | 1550 | AF02 |
| 0001276340 | 1650 | D302 | 1750 | 2E02 | 1A51 | AC02 | 1C51 | C702 |
| 0001276360 | 1F51 | D502 | 2051 | F602 | 2351 | 0602 | 2452 | 2702 |
| 0001276400 | 2752 | 3002 | 2952 | 5402 | 2A52 | 7802 | 2B52 | CF02 |
| 0001276420 | 2D52 | 4D02 | 2E53 | 5302 | 3153 | 5902 | 3353 | 7B02 |
| 0001276440 | 3453 | A202 | 3653 | AB02 | 3753 | 0602 | 3954 | 8402 |
| 0001276460 | 3B54 | 8D02 | 3C54 | E802 | 4054 | 6602 | 4155 | E302 |
| 0001276500 | 4D55 | F102 | 4E55 | 0102 | 5456 | 9402 | 5656 | AD02 |
| 0001276520 | 5756 | CE02 | 5856 | DC02 | 5956 | DF02 | 5C56 | F002 |
| 0001276540 | 5D56 | 0A02 | 5F57 | 1302 | 6057 | 6E02 | 6457 | EB02 |
| 0001276560 | 6557 | 0402 | 6758 | 0D02 | 6858 | 6402 | 6B58 | E102 |
| 0001276600 | 6C58 | FA02 | 6E58 | 0302 | 6F59 | 5E02 | 7159 | DB02 |
| 0001276620 | 7259 | 5802 | 7D5A | 6302 | 7E5A | 7302 | 845A | 0602 |
| 0001276640 | 855B | 1F02 | 875B | 3902 | 885B | 6202 | 895B | 7602 |
| 0001276660 | 8A5B | 7902 | 8D5B | 9302 | 8E5B | AD02 | 905B | B602 |
| 0001276700 | 915B | 1102 | 955C | 8E02 | 965C | A802 | 985C | B102 |
| 0001276720 | 995C | 0802 | 9C5D | 8502 | 9D5D | 9E02 | 9F5D | A702 |
| 0001276740 | A05D | 0202 | A25E | 7F02 | A35E | FC02 | B55E | 0702 |

THU MAR 14 17:25:16 1991 CRV_IPS.DLL PAGE 329, LINE 19353

| | | | | | | | | |
|---|---|---|---|---|---|---|---|---|
| 0001276760 | B65F | 1D02 | BB5F | B002 | BD5F | C402 | BE5F | D302 |
| 0001277000 | C05F | 5002 | C460 | 5902 | C660 | 8802 | C960 | 9202 |
| 0001277020 | CB60 | B502 | CC60 | B802 | CF60 | CC02 | D060 | EF02 |
| 0001277040 | D260 | F802 | D360 | FE02 | D460 | 5902 | D661 | D602 |
| 0001277060 | D761 | DC02 | D861 | E602 | DA61 | 6302 | DB62 | 6602 |
| 0001277100 | DE62 | E302 | E162 | ED02 | E362 | 0E02 | E463 | 6902 |
| 0001277120 | E663 | E602 | E963 | EC02 | EB63 | F602 | EE63 | 5902 |
| 0001277140 | F164 | 8702 | F364 | 8A02 | F464 | 9402 | F664 | 1102 |
| 0001277160 | F965 | 1B02 | FC65 | 7302 | FD65 | 9602 | 0065 | 9903 |
| 0001277200 | 0165 | F103 | 0465 | FB03 | 0565 | 2203 | 0866 | 2F03 |
| 0001277220 | 0966 | 5203 | 0D66 | 5503 | 0E66 | 7C03 | 1066 | 8503 |
| 0001277240 | 1166 | 8B03 | 1366 | E203 | 1866 | 6003 | 1A67 | 8303 |
| 0001277260 | 1D67 | 8603 | 2067 | DE03 | 2167 | 0503 | 2468 | 0803 |
| 0001277300 | 2568 | 0B03 | 2768 | 2303 | 2968 | 2C03 | 2A68 | 3203 |
| 0001277320 | 2B68 | 8903 | 2E68 | 0703 | 2F69 | 1103 | 3069 | 1B03 |
| 0001277340 | 3169 | 2103 | 3269 | 9E03 | 4469 | AC03 | 4569 | C203 |
| 0001277360 | 4969 | 5503 | 4A6A | 5B03 | 4B6A | 6103 | 4C6A | 6703 |
| 0001277400 | 4D6A | 6D03 | 4E6A | 7303 | 4F6A | 7903 | 506A | 8903 |
| 0001277420 | 516A | 9903 | 526A | A103 | 536A | B103 | 546A | C103 |
| 0001277440 | 556A | D103 | 566A | D903 | 586A | E203 | 596A | 3903 |
| 0001277460 | 5B6B | B603 | 5C6B | BC03 | 5D6B | D503 | 5F6B | DE03 |
| 0001277500 | 606B | 3903 | 626C | B603 | 636C | 3303 | 6F6D | 3F03 |
| 0001277520 | 706D | 4F03 | 756D | E203 | 766D | 0103 | 786E | 1203 |
| 0001277540 | 7A6E | 1C03 | 7B6E | 3503 | 7D6E | 3E03 | 7E6E | 9903 |
| 0001277560 | 826E | 1603 | 846F | 1B03 | 866F | 3D03 | 876F | 9803 |
| 0001277600 | 926F | 1503 | 9470 | 2703 | 9570 | 4903 | 9770 | 4C03 |
| 0001277620 | 9970 | 6E03 | 9B70 | 7703 | 9C70 | CE03 | 9E70 | 4B03 |
| 0001277640 | 9F71 | C803 | AD71 | D303 | AE71 | E303 | B171 | 7603 |
| 0001277660 | B372 | 8D03 | B472 | BF03 | B672 | C203 | B872 | F403 |
| 0001277700 | BA72 | FD03 | BB72 | 5403 | BD73 | D103 | BE73 | 4E03 |
| 0001277720 | CD74 | 5903 | CE74 | 6903 | D074 | FC03 | DA74 | 0103 |
| 0001277740 | DB75 | 1B03 | DD75 | 2403 | DE75 | 7F03 | E175 | FC03 |
| 0001277760 | E375 | 1303 | E476 | 4103 | E676 | 4403 | E776 | 7203 |
| 0001300000 | E976 | 7B03 | EA76 | D203 | EE76 | 4F03 | EF77 | 6903 |
| 0001300020 | F177 | 7203 | F277 | CD03 | F577 | 4A03 | F678 | C703 |
| 0001300040 | 0978 | D204 | 0A78 | E804 | 1178 | 7B04 | 1379 | B804 |
| 0001300060 | 1579 | C104 | 1679 | 1804 | 1D7A | 9604 | 1F7A | D304 |
| 0001300100 | 227A | DC04 | 237A | F704 | 247A | 4E04 | 287B | CC04 |
| 0001300120 | 2A7B | 1104 | 2D7C | 2404 | 2F7C | 3F04 | 317C | 5A04 |
| 0001300140 | 337C | D704 | 367C | DF04 | 397C | 2904 | 3C7D | 5004 |
| 0001300160 | 3E7D | 6B04 | 407D | 8604 | 427D | 0304 | 457E | 0B04 |
| 0001300200 | 477E | 1404 | 487E | 6B04 | 4D7E | E904 | 4F7E | 0904 |
| 0001300220 | 507F | 2904 | 527F | 3204 | 547F | 8904 | 557F | 0704 |
| 0001300240 | 5F80 | 1504 | 6080 | 2504 | 6980 | B804 | 6A80 | CC04 |
| 0001300260 | 6E80 | E204 | 7280 | 0704 | 7481 | 2C04 | 7781 | 3E04 |
| 0001300300 | 7981 | 5904 | 7A81 | 7404 | 7C81 | 7D04 | 7D81 | D404 |
| 0001300320 | 7F81 | 5204 | 8182 | 5B04 | 8282 | B204 | 8782 | 3004 |
| 0001300340 | 8883 | 3D04 | 8983 | 4A04 | 8A83 | 5504 | 8B83 | 8E04 |
| 0001300360 | 8D83 | BC04 | 8E83 | D004 | 8F83 | DC04 | 9083 | E804 |
| 0001300400 | 9183 | EB04 | 9283 | FC04 | 9683 | 5604 | 9984 | 7904 |
| 0001300420 | 9A84 | 9C04 | 9D84 | AE04 | 9F84 | C904 | A084 | E404 |
| 0001300440 | A284 | ED04 | A384 | 4404 | A585 | C204 | A785 | CB04 |
| 0001300460 | A885 | 2204 | AB86 | A004 | AC86 | A304 | AD86 | F704 |
| 0001300500 | AE86 | 7404 | B887 | 7F04 | B987 | 8F04 | BF87 | 2604 |
| 0001300520 | C288 | 4604 | C388 | 6604 | C688 | 7804 | C888 | 9304 |
| 0001300540 | C988 | AE04 | CB88 | B704 | CC88 | 1004 | CE89 | 9504 |
| 0001300560 | CF89 | 9E04 | D089 | F704 | D489 | 7C04 | D88A | 9804 |
| 0001300600 | DA8A | AE04 | DE8A | CB04 | E18A | E204 | E28A | 0404 |
| 0001300620 | E58B | 0D04 | E78B | 2804 | E88B | 4304 | E98B | 9C04 |

THU MAR 14 17:25:16 1991 CRV_IPS.DLL PAGE 330, LINE 19412

| | | | | | | | | |
|---|---|---|---|---|---|---|---|---|
| 0001300640 | EC8B | 2104 | ED8C | 7704 | EE8C | FB04 | FB8C | 0604 |
| 0001300660 | FC8D | 1604 | 018D | AF05 | 058D | BB05 | 0C8D | C705 |
| 0001300700 | 0E8D | FD05 | 108D | 0705 | 118E | 6205 | 148E | EB05 |
| 0001300720 | 178E | 3005 | 188F | 5505 | 198F | 6905 | 1B8F | 7205 |
| 0001300740 | 1C8F | CC05 | 208F | 5305 | 2190 | 5605 | 2690 | A405 |
| 0001300760 | 2790 | E005 | 2990 | EA05 | 2A90 | FE05 | 2B90 | 5905 |
| 0001301000 | 2D91 | E205 | 2F91 | 2705 | 3192 | 3B05 | 3292 | 5705 |
| 0001301020 | 3692 | DD05 | 3792 | 0205 | 3993 | 0B05 | 3B93 | 1F05 |
| 0001301040 | 3C93 | 3B05 | 3D93 | 9505 | 4093 | 1C05 | 4294 | 3405 |
| 0001301060 | 4394 | 5405 | 4594 | 6805 | 4794 | 7C05 | 4894 | 9805 |
| 0001301100 | 4A94 | A205 | 4B94 | FD05 | 4D94 | 8605 | 4F95 | 9005 |
| 0001301120 | 5095 | EB05 | 5495 | 7405 | 5596 | 8B05 | 5796 | 9F05 |
| 0001301140 | 5896 | BB05 | 5996 | C105 | 5C96 | 4805 | 5E97 | 9905 |
| 0001301160 | 6097 | A305 | 6197 | B705 | 6797 | 3D05 | 6898 | 7B05 |
| 0001301200 | 6A98 | 8505 | 6B98 | 9905 | 6C98 | F405 | 6E98 | 7D05 |
| 0001301220 | 7099 | C205 | 7299 | D605 | 7399 | F205 | 7699 | 7805 |
| 0001301240 | 779A | A505 | 799A | AE05 | 7B9A | C205 | 7C9A | DE05 |
| 0001301260 | 7D9A | 3805 | 809B | BF05 | 829B | D705 | 839B | F705 |
| 0001301300 | 859B | 0B05 | 879C | 1F05 | 889C | 3B05 | 8A9C | 4505 |
| 0001301320 | 8B9C | A005 | 8D9C | 2905 | 8F9D | 3305 | 909D | 8E05 |
| 0001301340 | 949D | 1705 | 959E | 2E05 | 979E | 4205 | 989E | 5E05 |
| 0001301360 | 999E | 6405 | 9D9E | EB05 | 9E9E | 7105 | AC9F | 7C05 |
| 0001301400 | AD9F | 8C05 | B59F | 1F05 | B6A0 | 2905 | B8A0 | 3305 |
| 0001301420 | BAA0 | 4105 | BDA0 | 4F05 | BEA0 | 6305 | C0A0 | 8E05 |
| 0001301440 | C2A0 | A405 | C5A0 | AF05 | C6A0 | CD05 | C8A0 | DE05 |
| 0001301460 | CAA0 | E705 | CBA0 | FB05 | CCA0 | 5205 | CFA1 | D005 |
| 0001301500 | D1A1 | DB05 | D3A1 | E405 | D4A1 | 0705 | D6A2 | 0A05 |
| 0001301520 | D8A2 | 2D05 | DAA2 | 3E05 | DCA2 | 4705 | DDA2 | 5B05 |
| 0001301540 | DEA2 | B205 | E2A2 | 2F05 | E3A3 | 4B05 | E5A3 | 5405 |
| 0001301560 | E6A3 | 6805 | E7A3 | BF05 | E9A3 | 3D05 | EAA4 | 4005 |
| 0001301600 | EBA4 | BD05 | 09A4 | 7263 | 5F76 | 7367 | 2E70 | 0163 |
| 0001301620 | 5100 | 5A01 | C800 | 65A4 | DE00 | 66A4 | E800 | 68A4 |
| 0001301640 | 0400 | 69A5 | 1600 | 6AA5 | 2200 | 6CA5 | 4E00 | 6EA5 |
| 0001301660 | 6600 | 6FA5 | 8200 | 70A5 | 8D00 | 71A5 | 9000 | 72A5 |
| 0001301700 | AC00 | 73A5 | B700 | 74A5 | BA00 | 77A5 | C500 | 78A5 |
| 0001301720 | D000 | 7AA5 | FC00 | 7DA5 | 0800 | 7EA6 | 1300 | 80A6 |
| 0001301740 | 3F00 | 82A6 | 4B00 | 83A6 | 5600 | 85A6 | 8200 | 87A6 |
| 0001301760 | 8E00 | 88A6 | A000 | 8AA6 | CC00 | 8CA6 | E100 | 8DA6 |
| 0001302000 | F300 | 8FA6 | 1F00 | 91A7 | 3400 | 92A7 | 4600 | 94A7 |
| 0001302020 | 7200 | 96A7 | 8700 | 97A7 | 9500 | 99A7 | 9F00 | 9AA7 |
| 0001302040 | A600 | 9CA7 | D200 | 9EA7 | DE00 | 9FA7 | E900 | A1A7 |
| 0001302060 | 1500 | A3A8 | 2100 | A4A8 | 2C00 | A6A8 | 5800 | A8A8 |
| 0001302100 | 6400 | A9A8 | 6F00 | ABA8 | 9B00 | ADA8 | A700 | AEA8 |
| 0001302120 | B700 | AFA8 | C700 | B0A8 | CE00 | B1A8 | D500 | B2A8 |
| 0001302140 | E600 | B7A8 | F700 | BAA8 | FD00 | BBA8 | 2000 | BDA9 |
| 0001302160 | 3400 | BEA9 | 3F00 | BFA9 | 4600 | C1A9 | 4D00 | CBA9 |
| 0001302200 | 5000 | CCA9 | 6700 | CDA9 | 7F00 | CFA9 | 9700 | D2A9 |
| 0001302220 | AE00 | D3A9 | C000 | D5A9 | EC00 | D7A9 | 0100 | D9AA |
| 0001302240 | 0C00 | DAAA | 2900 | DBAA | 3300 | DEAA | 3F00 | E0AA |
| 0001302260 | 4E00 | F4AA | 5A00 | F7AA | 7000 | F8AA | 7800 | FCAA |
| 0001302300 | 8000 | FDAA | 9700 | 00AA | 9F01 | 01AA | A701 | 02AA |
| 0001302320 | B801 | 03AA | BE01 | 15AA | CC01 | 17AA | DC01 | 1AAA |
| 0001302340 | E101 | 1BAA | E901 | 1CAA | FE01 | 1DAA | 0701 | 1EAB |
| 0001302360 | 0C01 | 1FAB | 0F01 | 20AB | 1401 | 21AB | 2901 | 22AB |
| 0001302400 | 3101 | 23AB | 3701 | 36AB | 4201 | 39AB | 5801 | 3AAB |
| 0001302420 | 6001 | 3BAB | 6601 | 4FAB | 7201 | 59AB | 8801 | 5AAB |
| 0001302440 | 9301 | 5BAB | A701 | 5CAB | B101 | 5DAB | B701 | 5EAB |
| 0001302460 | BD01 | 5FAB | D301 | 60AB | DD01 | 61AB | E701 | 62AB |
| 0001302500 | ED01 | 63AB | F001 | 65AB | F601 | 66AB | 0801 | 67AC |

THU MAR 14 17:25:16 1991 CRV_IPS.DLL PAGE 331, LINE 19471

| | | | | | | | | |
|---|---|---|---|---|---|---|---|---|
| 0001302520 | 1201 | 69AC | 1801 | 6AAC | 2201 | 6CAC | 3E01 | 6DAC |
| 0001302540 | 4401 | 6FAC | 7001 | 71AC | 7801 | 72AC | 7E01 | 74AC |
| 0001302560 | AA01 | 76AC | B201 | 77AC | B801 | 79AC | E401 | 7BAC |
| 0001302600 | EC01 | 7CAC | F201 | 7EAC | 1E01 | 80AD | 2601 | 81AD |
| 0001302620 | 2C01 | 83AD | 5801 | 85AD | 6001 | 86AD | 6601 | 88AD |
| 0001302640 | 9201 | 8AAD | 9A01 | 8BAD | A001 | 8DAD | CC01 | 8FAD |
| 0001302660 | D401 | 90AD | DA01 | 92AD | 0601 | 94AE | 0E01 | 95AE |
| 0001302700 | 1401 | 96AE | C301 | 97AE | 3201 | 99AE | 5E01 | 9AAE |
| 0001302720 | 7601 | 9BAE | 9201 | 9DAE | 9801 | A1AE | A701 | A2AE |
| 0001302740 | C901 | A3AE | D501 | A4AE | DD01 | A5AE | E501 | A6AE |
| 0001302760 | ED01 | A7AE | FE01 | A8AE | 0F01 | A9AF | 2001 | AAAF |
| 0001303000 | 3101 | ABAF | 3901 | ACAF | 4101 | ADAF | 4901 | B0AF |
| 0001303020 | 5A01 | B1AF | 7601 | B3AF | 8001 | B4AF | 8C01 | B7AF |
| 0001303040 | 9201 | B8AF | 9B01 | B9AF | A501 | BEAF | AB01 | C1AF |
| 0001303060 | BE01 | C2AF | D501 | C3AF | DE01 | C4AF | E801 | C8AF |
| 0001303100 | EE01 | C9AF | F701 | CAAF | 0101 | CCB0 | 0701 | CEB0 |
| 0001303120 | 0D01 | F1B0 | 1901 | F5B0 | 2901 | FFB0 | 4001 | 05B0 |
| 0001303140 | 4602 | 06B0 | 5002 | 08B0 | 6C02 | 0BB0 | 9E02 | 0DB0 |
| 0001303160 | A902 | 0EB0 | C102 | 0FB0 | DC02 | 12B0 | E802 | 14B0 |
| 0001303200 | EB02 | 16B0 | 0302 | 17B1 | 1702 | 18B1 | 2B02 | 19B1 |
| 0001303220 | 3F02 | 1AB1 | 4202 | 1DB1 | 4E02 | 1EB1 | 5D02 | 23B1 |
| 0001303240 | 7402 | 24B1 | 8C02 | 25B1 | A302 | 26B1 | D502 | 27B1 |
| 0001303260 | D802 | 2BB1 | DB02 | 2FB1 | E702 | 31B1 | 0502 | 32B2 |
| 0001303300 | 0F02 | 34B2 | 1502 | 36B2 | 2F02 | 37B2 | 4B02 | 38B2 |
| 0001303320 | 5502 | 3CB2 | 5B02 | 3DB2 | 7702 | 5CB2 | 7E02 | 61B2 |
| 0001303340 | 8102 | 62B2 | 8702 | 63B2 | 8D02 | 64B2 | 9302 | 66B2 |
| 0001303360 | 9902 | 67B2 | AF02 | 68B2 | B502 | 69B2 | CA02 | 6AB2 |
| 0001303400 | E002 | 6BB2 | E602 | 6CB2 | FB02 | 6DB2 | 1102 | 6EB3 |
| 0001303420 | 1702 | 6FB3 | 2C02 | 70B3 | 4202 | 71B3 | 4802 | 72B3 |
| 0001303440 | 5D02 | 73B3 | 7302 | 74B3 | 7902 | 75B3 | 8E02 | 76B3 |
| 0001303460 | A402 | 77B3 | AA02 | 78B3 | BF02 | 79B3 | D502 | 7AB3 |
| 0001303500 | DB02 | 7BB3 | F002 | 7CB3 | 0602 | 7DB4 | 0C02 | 7FB4 |
| 0001303520 | 2102 | 80B4 | 3702 | 81B4 | 3D02 | 83B4 | 5202 | 85B4 |
| 0001303540 | 6A02 | 86B4 | 7002 | 87B4 | 7E02 | 88B4 | 8C02 | 89B4 |
| 0001303560 | 9A02 | 8AB4 | A702 | 8BB4 | B402 | 8CB4 | C202 | 8DB4 |
| 0001303600 | D002 | 8EB4 | DE02 | 8FB4 | EC02 | 90B4 | EF02 | 91B4 |
| 0001303620 | 0502 | 93B5 | 1B02 | 94B5 | 3102 | 95B5 | 3702 | 97B5 |
| 0001303640 | 4C02 | 98B5 | 5202 | 99B5 | 5802 | 9AB5 | 5E02 | 9CB5 |
| 0001303660 | 6402 | 9DB5 | 7A02 | 9FB5 | 8F02 | A0B5 | 9502 | A2B5 |
| 0001303700 | AB02 | A3B5 | B702 | A5B5 | BD02 | BBB5 | C802 | BCB5 |
| 0001303720 | D802 | BDB5 | DD02 | BEB5 | E902 | BFB5 | F502 | C0B5 |
| 0001303740 | 0102 | C1B6 | 0C02 | C2B6 | 1702 | C3B6 | 2302 | C4B6 |
| 0001303760 | 2F02 | C5B6 | 3B02 | C6B6 | 4102 | DBB6 | 4C02 | E0B6 |
| 0001304000 | 6202 | E2B6 | 6702 | E3B6 | 8102 | E5B6 | 8A02 | E7B6 |
| 0001304020 | 9002 | E9B6 | 9602 | FCB6 | A202 | 00B6 | B803 | 03B6 |
| 0001304040 | BE03 | 04B6 | C803 | 05B6 | D403 | 08B6 | D703 | 09B6 |
| 0001304060 | E103 | 0AB6 | ED03 | 0DB6 | F003 | 0EB6 | FA03 | 0FB6 |
| 0001304100 | 0503 | 12B7 | 0803 | 15B7 | 0B03 | 16B7 | 1503 | 17B7 |
| 0001304120 | 2103 | 1AB7 | 2403 | 1BB7 | 2E03 | 1CB7 | 3A03 | 1FB7 |
| 0001304140 | 3D03 | 20B7 | 4003 | 22B7 | 6603 | 23B7 | 8003 | 24B7 |
| 0001304160 | 8903 | 25B7 | 8F03 | 26B7 | 9503 | 2DB7 | A303 | 2EB7 |
| 0001304200 | B903 | 2FB7 | C703 | 36B7 | D303 | 37B7 | E903 | 38B7 |
| 0001304220 | F703 | 3FB7 | 0303 | 40B8 | 1903 | 41B8 | 2C03 | 48B8 |
| 0001304240 | 3A03 | 52B8 | 5003 | 53B8 | 6303 | 56B8 | 6D03 | 58B8 |
| 0001304260 | 8A03 | 5AB8 | 9403 | 5BB8 | 9E03 | 5DB8 | B303 | 5FB8 |
| 0001304300 | BD03 | 60B8 | D703 | 62B8 | EB03 | 63B8 | F503 | 65B8 |
| 0001304320 | 0803 | 68B9 | 1F03 | 09B9 | 7263 | 5F76 | 6576 | 2E72 |
| 0001304340 | 0263 | 9900 | 8C03 | 0000 | 8D00 | 1600 | 9500 | A900 |
| 0001304360 | 9900 | AE00 | 9B00 | B900 | 9C00 | D300 | 9E00 | DC00 |

THU MAR 14 17:25:16 1991 CRV_IPS.DLL PAGE 332, LINE 19530

| | | | | | | | | |
|---|---|---|---|---|---|---|---|---|
| 0001304400 | 9F00 | 3700 | A301 | B400 | A501 | C800 | A601 | E300 |
| 0001304420 | A701 | F700 | A801 | 0000 | A902 | 0900 | AA02 | 8600 |
| 0001304440 | AB02 | 8900 | AD02 | 0600 | AE03 | 1100 | AF03 | 2300 |
| 0001304460 | B103 | 2C00 | B203 | 8000 | B503 | FD00 | B803 | 0300 |
| 0001304500 | BB04 | 1600 | BD04 | 4200 | BE04 | 5000 | BF04 | 5E00 |
| 0001304520 | C004 | 6B00 | C104 | 7500 | C204 | 8500 | C304 | 9500 |
| 0001304540 | C404 | 9F00 | C504 | AF00 | C604 | BF00 | C704 | CF00 |
| 0001304560 | C804 | EB00 | C904 | F500 | CA04 | 0500 | CC05 | 2400 |
| 0001304600 | CD05 | 7800 | CF05 | 8400 | D005 | A800 | D105 | BC00 |
| 0001304620 | D205 | 1800 | D406 | 2100 | D506 | 7800 | D806 | F600 |
| 0001304640 | D906 | 0200 | DA07 | 5900 | DC07 | 7000 | DD07 | 8F00 |
| 0001304660 | DF07 | 9200 | E007 | B100 | E107 | C500 | E207 | 2100 |
| 0001304700 | E408 | 2A00 | E508 | 4000 | E608 | 9B00 | E908 | 1800 |
| 0001304720 | EA09 | 6F00 | EB09 | 7B00 | EC09 | 9400 | ED09 | A800 |
| 0001304740 | EE09 | 0400 | F00A | 0D00 | F10A | 2000 | F20A | 7700 |
| 0001304760 | F50A | F500 | F70A | FA00 | F80A | 1200 | FA0B | 1B00 |
| 0001305000 | FB0B | 3100 | FC0B | 8C00 | FF0B | 0900 | 010C | 1501 |
| 0001305020 | 020C | 2901 | 040C | 3201 | 050C | 4801 | 060C | 5101 |
| 0001305040 | 070C | CE01 | 080C | D101 | 0B0C | 4E01 | 0C0D | 5901 |
| 0001305060 | 0D0D | 6B01 | 0F0D | 7401 | 100D | C8C1 | 110D | DE01 |
| 0001305100 | 140D | 5B01 | 160E | 6101 | 170E | B801 | 180E | C401 |
| 0001305120 | 1A0E | DB01 | 1B0E | FA01 | 1D0E | FD01 | 1E0E | 1C01 |
| 0001305140 | 1F0F | 3001 | 200F | 8C01 | 220F | 9501 | 230F | AB01 |
| 0001305160 | 240F | 0601 | 2710 | 8301 | 2810 | DA01 | 2910 | E601 |
| 0001305200 | 2A10 | FF01 | 2B10 | 1301 | 2C11 | 6F01 | 2E11 | 7801 |
| 0001305220 | 2F11 | 8B01 | 3011 | E201 | 3211 | 6001 | 3412 | 6501 |
| 0001305240 | 3512 | 7D01 | 3712 | 8601 | 3812 | 9C01 | 3912 | F701 |
| 0001305260 | 3C12 | 7401 | 3E13 | 7701 | 4013 | 8401 | 4113 | A501 |
| 0001305300 | 4313 | AE01 | 4413 | 0501 | 4714 | 8301 | 4814 | D701 |
| 0001305320 | 4914 | 5401 | 6015 | 6201 | 6915 | 7801 | 6B15 | 8301 |
| 0001305340 | 6C15 | 9201 | 6D15 | 9701 | 6E15 | 9A01 | 6F15 | A501 |
| 0001305360 | 7015 | B501 | 7115 | BC01 | 7415 | C301 | 7515 | DD01 |
| 0001305400 | 7715 | E601 | 7815 | F901 | 7B15 | FF01 | 7C15 | 1601 |
| 0001305420 | 7D16 | 2A01 | 7E16 | 3301 | 7F16 | 3C01 | 8016 | 4201 |
| 0001305440 | 8116 | 4501 | 8316 | 4B01 | 8416 | 5D01 | 8616 | 6601 |
| 0001305460 | 8716 | 7201 | 8A16 | 7801 | 8D16 | 8401 | 8E16 | A401 |
| 0001305500 | 9016 | AD01 | 9416 | B301 | 9516 | BC01 | 9616 | C901 |
| 0001305520 | 9716 | D701 | 9816 | E101 | 9916 | F101 | 9A16 | 0101 |
| 0001305540 | 9B17 | 0B01 | 9C17 | 1501 | 9D17 | 2501 | 9E17 | 3501 |
| 0001305560 | 9F17 | 4501 | A217 | 5501 | A317 | 7501 | A517 | 7E01 |
| 0001305600 | A617 | 9101 | AA17 | 9701 | AB17 | BA01 | AD17 | C301 |
| 0001305620 | AE17 | D201 | B117 | D801 | B217 | EE01 | B417 | 0D01 |
| 0001305640 | B518 | 1301 | CC18 | 2101 | CD18 | 3701 | D618 | CA01 |
| 0001305660 | D818 | D501 | D918 | DA01 | DA18 | E801 | DB18 | ED01 |
| 0001305700 | DC18 | F501 | DD18 | FA01 | DE18 | 0601 | DF19 | 0B01 |
| 0001305720 | E019 | 0E01 | E219 | 1301 | E319 | 3001 | E519 | 3501 |
| 0001305740 | E619 | 4401 | E719 | 4E01 | EA19 | 5801 | EB19 | 7201 |
| 0001305760 | ED19 | 7B01 | EE19 | 8E01 | F119 | 0B01 | F21A | 2201 |
| 0001306000 | F31A | 3601 | F41A | 3F01 | F51A | 4801 | F61A | C501 |
| 0001306020 | F71A | C801 | F91A | 4501 | FA1B | 5701 | FC1B | 6001 |
| 0001306040 | FD1B | 6C01 | 001B | E902 | 031B | F502 | 041B | 1502 |
| 0001306060 | 061C | 1E02 | 0A1C | 9C02 | 0B1C | A502 | 0C1C | B202 |
| 0001306100 | 0D1C | C002 | 0E1C | CA02 | 0F1C | DA02 | 101C | EA02 |
| 0001306120 | 111C | F402 | 121C | FE02 | 131C | 0E02 | 141D | 1E02 |
| 0001306140 | 151D | 2E02 | 181D | 3E02 | 191D | 5E02 | 1B1D | 6702 |
| 0001306160 | 1C1D | 7A02 | 1E1D | F702 | 201D | FF02 | 211D | 2202 |
| 0001306200 | 231E | 2B02 | 241E | 3A02 | 271E | B802 | 281E | CE02 |
| 0001306220 | 291E | ED02 | 2C1E | 4702 | 2D1F | C402 | 491F | D202 |
| 0001306240 | 4A1F | E802 | 541F | 7B02 | 5620 | 8602 | 5720 | 9502 |

THU MAR 14 17:25:16 1991 CRV_IPS.DLL PAGE 333, LINE 19589

| | | | | | | | | |
|---|---|---|---|---|---|---|---|---|
| 0001306260 | 5820 | 9A02 | 5920 | 9D02 | 5B20 | A802 | 5C20 | B802 |
| 0001306300 | 5D20 | BF02 | 5E20 | C602 | 5F20 | D102 | 6020 | D602 |
| 0001306320 | 6120 | D902 | 6220 | E402 | 6320 | F402 | 6420 | F902 |
| 0001306340 | 6520 | FC02 | 6720 | 0102 | 6821 | 1F02 | 6A21 | 2602 |
| 0001306360 | 6D21 | 3602 | 6E21 | 5002 | 7021 | 5902 | 7121 | B402 |
| 0001306400 | 7421 | 3102 | 7522 | 4802 | 7622 | 5C02 | 7722 | 6502 |
| 0001306420 | 7822 | 6E02 | 7922 | EB02 | 7A22 | EE02 | 7C22 | 6B02 |
| 0001306440 | 7D23 | 7D02 | 7F23 | 8602 | 8023 | DA02 | 8423 | 5702 |
| 0001306460 | 8524 | 6A02 | 8624 | 8402 | 8824 | 8D02 | 8924 | E402 |
| 0001306500 | 8D24 | 6202 | 8E25 | 6F02 | 8F25 | 7C02 | 9025 | 8802 |
| 0001306520 | 9125 | 9102 | 9225 | A002 | 9325 | AF02 | 9425 | B802 |
| 0001306540 | 9525 | C702 | 9625 | D602 | 9725 | E502 | 9825 | F402 |
| 0001306560 | 9B25 | 1202 | 9C26 | 3102 | 9E26 | 3A02 | 9F26 | 4E02 |
| 0001306600 | A026 | A902 | A226 | 2602 | A427 | 2E02 | A527 | 4D02 |
| 0001306620 | A727 | 5602 | A827 | AD02 | AB27 | 2B02 | AD28 | 3C02 |
| 0001306640 | AE28 | 9002 | AF28 | 0D02 | C929 | 1B02 | CC29 | 3102 |
| 0001306660 | CE29 | 4C02 | CF29 | 5502 | D029 | 5B02 | D129 | 6102 |
| 0001306700 | ED29 | 6F02 | F029 | 8502 | F329 | 9302 | F429 | AA02 |
| 0001306720 | F729 | AD02 | F829 | C402 | FB29 | C702 | FC29 | CD02 |
| 0001306740 | FD29 | D002 | FE29 | E402 | FF29 | EA02 | 0B29 | F803 |
| 0001306760 | 0C29 | 0803 | 122A | 9B03 | 162A | AF03 | 192A | DB03 |
| 0001307000 | 1A2A | FC03 | 1B2A | 0A03 | 1C2B | 0D03 | 1D2B | 2603 |
| 0001307020 | 1E2B | 3403 | 1F2B | 4103 | 202B | 4B03 | 212B | 5B03 |
| 0001307040 | 222B | 6B03 | 232B | 7603 | 242B | 8603 | 252B | 9603 |
| 0001307060 | 262B | A603 | 272B | C203 | 292B | E003 | 2A2B | F703 |
| 0001307100 | 2B2B | 0103 | 2C2C | 0403 | 2E2C | 0E03 | 2F2C | 1103 |
| 0001307120 | 312C | 1B03 | 332C | 2B03 | 342C | 7F03 | 372C | 8B03 |
| 0001307140 | 382C | B703 | 392C | CB03 | 3A2C | 2703 | 3C2D | 3003 |
| 0001307160 | 3D2D | 8703 | 402D | 0503 | 412E | 8203 | 4D2E | 8D03 |
| 0001307200 | 4E2E | 9D03 | 522E | 3003 | 552F | 3C03 | 562F | 6103 |
| 0001307220 | 582F | 7503 | 5A2F | 7E03 | 5B2F | D503 | 5E2F | 5303 |
| 0001307240 | 6030 | 5F03 | 6230 | 7603 | 6330 | 9503 | 6530 | 9803 |
| 0001307260 | 6730 | B703 | 6A30 | CB03 | 6B30 | EE03 | 6D30 | F703 |
| 0001307300 | 6E30 | 5203 | 7131 | CF03 | 7331 | D803 | 7431 | 2F03 |
| 0001307320 | 7632 | AD03 | ,732 | 2A03 | 8333 | 3503 | 8433 | 4503 |
| 0001307340 | 8833 | D803 | 8933 | E403 | 8A33 | 3B03 | 8C34 | 5203 |
| 0001307360 | 8D34 | 7103 | 8F34 | 7403 | 9034 | 9303 | 9134 | A703 |
| 0001307400 | 9234 | 0303 | 9435 | 0C03 | 9535 | 6703 | 9835 | E403 |
| 0001307420 | 9935 | 3B03 | 9B36 | 4703 | 9C36 | 6803 | 9D36 | 7C03 |
| 0001307440 | 9E36 | D803 | A036 | E103 | A136 | 3803 | A337 | B603 |
| 0001307460 | A437 | 3303 | AF38 | 3E03 | B038 | 4E03 | B538 | E103 |
| 0001307500 | B738 | E903 | B838 | 0303 | BB39 | 0C03 | BD39 | 2A03 |
| 0001307520 | BE39 | 8503 | BF39 | E403 | C339 | 6103 | C43A | 8103 |
| 0001307540 | C73A | 8A03 | C83A | A503 | C93A | FC03 | CB3A | 7A03 |
| 0001307560 | CC3B | F703 | E53B | 0203 | E63C | 1203 | ED3C | A503 |
| 0001307600 | F13C | AA03 | F33C | AF03 | F43C | C203 | F53C | D103 |
| 0001307620 | F63C | E303 | F73C | ED03 | FC3C | FF03 | FE3C | 3B03 |
| 0001307640 | FF3D | 5103 | 033D | CE04 | 043D | E204 | 053D | 1004 |
| 0001307660 | 073E | 1C04 | 083E | 3804 | 0A3E | 4C04 | 0C3E | 5504 |
| 0001307700 | 0D3E | 6804 | 0E3E | BF04 | 113E | 3D04 | 123F | 5604 |
| 0001307720 | 143F | 5F04 | 153F | BA04 | 183F | 3704 | 1A40 | 4304 |
| 0001307740 | 1C40 | 5A04 | 1D40 | 7704 | 1F40 | 7A04 | 2140 | 9704 |
| 0001307760 | 2340 | AB04 | 2440 | C504 | 2640 | CE04 | 2740 | E404 |
| 0001310000 | 2840 | 3B04 | 2A41 | B804 | 2C41 | C104 | 2D41 | D404 |
| 0001310020 | 2E41 | 2B04 | 3142 | A904 | 3242 | C304 | 3442 | CE04 |
| 0001310040 | 3542 | E804 | 3742 | F104 | 3842 | 0704 | 3943 | 6204 |
| 0001310060 | 3C43 | DF04 | 4043 | F004 | 4143 | 0404 | 4344 | 0D04 |
| 0001310100 | 4444 | 2304 | 4644 | 2C04 | 4744 | 4204 | 4844 | 4B04 |
| 0001310120 | 4944 | C804 | 4A44 | CB04 | 4D44 | 4804 | 4F45 | 5304 |

THU MAR 14 17:25:16 1991 CRV_IPS.DLL PAGE 334, LINE 19648

| | | | | | | | | |
|---|---|---|---|---|---|---|---|---|
| 0001310140 | 5145 | 6504 | 5345 | 6E04 | 5445 | 8404 | 5645 | 8D04 |
| 0001310160 | 5745 | A304 | 5845 | F704 | 5B45 | 7404 | 5D46 | 8004 |
| 0001310200 | 5E46 | D404 | 6246 | DD04 | 6346 | E004 | 6746 | E904 |
| 0001310220 | 6846 | EC04 | 6946 | 4004 | 6B47 | 4904 | 6C47 | 9D04 |
| 0001310240 | 6E47 | A604 | 7147 | AF04 | 7247 | CE04 | 7347 | DB04 |
| 0001310260 | 7547 | E404 | 7647 | 3B04 | 7848 | B904 | 7B48 | BE04 |
| 0001310300 | 7C48 | D804 | 7E48 | E104 | 7F48 | 3804 | 8249 | B604 |
| 0001310320 | 8449 | C304 | 8549 | E404 | 8749 | ED04 | 8849 | 4404 |
| 0001310340 | 8B4A | C204 | 8D4A | CE04 | 8E4A | 2204 | 8F4B | 3804 |
| 0001310360 | 914B | 4104 | 934B | 5704 | 944B | 5A04 | 964B | AE04 |
| 0001310400 | 974B | C404 | 9A4B | 4104 | 9F4C | 4A04 | A04C | 6404 |
| 0001310420 | A24C | 6D04 | A34C | 8304 | A54C | 8C04 | A64C | A204 |
| 0001310440 | A74C | F904 | AA4C | 7704 | AC4D | 7C04 | AD4D | 9404 |
| 0001310460 | AF4D | 9D04 | B04D | B304 | B24D | BC04 | B34D | D204 |
| 0001310500 | B44D | 2D04 | B84E | AA04 | BB4E | B604 | BE4E | BF04 |
| 0001310520 | BF4E | DE04 | C04E | EB04 | C24E | F404 | C34E | 4B04 |
| 0001310540 | C54F | C904 | C84F | CE04 | C94F | E804 | CB4F | F104 |
| 0001310560 | CC4F | 0704 | CE50 | 1004 | CF50 | 2604 | D050 | 7D04 |
| 0001310600 | D350 | FB04 | D550 | 0704 | D651 | 2104 | D851 | 2A04 |
| 0001310620 | D951 | 4004 | DB51 | 4904 | DC51 | 5F04 | DD51 | B604 |
| 0001310640 | E051 | 3404 | E252 | 3904 | E352 | 5104 | E552 | 5A04 |
| 0001310660 | E652 | 7004 | E852 | 7904 | E952 | 8F04 | EA52 | EA04 |
| 0001310700 | EE52 | 6704 | F253 | 7304 | F353 | 8D04 | F553 | 9604 |
| 0001310720 | F653 | AC04 | F853 | B504 | F953 | CB04 | FA53 | 2204 |
| 0001310740 | FD54 | A004 | FF54 | A504 | 0054 | BD05 | 0254 | C605 |
| 0001310760 | 0354 | DC05 | 0554 | E505 | 0654 | FB05 | 0754 | 5605 |
| 0001311000 | 0A55 | D305 | 0B55 | D605 | 2555 | E105 | 2655 | F105 |
| 0001311020 | 3455 | 8405 | 3756 | 8905 | 3856 | 9C05 | 3956 | AB05 |
| 0001311040 | 3A56 | BD05 | 3B56 | C705 | 3C56 | D905 | 4156 | E105 |
| 0001311060 | 4356 | 1D05 | 4457 | 3305 | 4857 | B005 | 4A57 | C405 |
| 0001311100 | 4C57 | F405 | 4D57 | 0C05 | 4F58 | 1505 | 5058 | 2805 |
| 0001311120 | 5158 | 7F05 | 5458 | FD05 | 5758 | 0905 | 5859 | 2205 |
| 0001311140 | 5A59 | 2B05 | 5B59 | 4105 | 5C59 | 9C05 | 6059 | 1905 |
| 0001311160 | 615A | 2805 | 625A | 3705 | 635A | 4605 | 645A | 5605 |
| 0001311200 | 655A | 5B05 | 665A | 5E05 | 685A | 6305 | 6B5A | 7B05 |
| 0001311220 | 6C5A | 9C05 | 6E5A | B405 | 705A | BD05 | 715A | 1805 |
| 0001311240 | 745B | 9505 | 765B | 9E05 | 775B | F505 | 7A5B | 7305 |
| 0001311260 | 7B5C | 8D05 | 7D5C | 9805 | 7E5C | B205 | 805C | BB05 |
| 0001311300 | 815C | 1605 | 845D | 9305 | 885D | A405 | 895D | B805 |
| 0001311320 | 8A5D | C105 | 8B5D | CA05 | 8C5D | 4705 | 8D5E | 4A05 |
| 0001311340 | 8F5E | C705 | 915E | D205 | 925E | E405 | 945E | ED05 |
| 0001311360 | 955E | 4105 | 975F | 4A05 | 985F | 5D05 | 9A5F | DA05 |
| 0001311400 | 9C5F | E605 | 9D5F | 3A05 | A160 | 4305 | A260 | 4605 |
| 0001311420 | A660 | 4F05 | A760 | 5205 | A860 | A605 | AA60 | AF05 |
| 0001311440 | AB60 | 0305 | AE61 | 0C05 | AF61 | 2605 | B161 | 2F05 |
| 0001311460 | B261 | 8605 | B561 | 0405 | B762 | 1105 | B862 | 3205 |
| 0001311500 | BA62 | 3B05 | BB62 | 9205 | BE62 | 1005 | C063 | 1C05 |
| 0001311520 | C163 | 7005 | C363 | 7905 | C563 | 8F05 | C763 | 9205 |
| 0001311540 | C863 | E605 | CA63 | EF05 | CD63 | 0505 | CF64 | 8205 |
| 0001311560 | D164 | 8E05 | D464 | 9705 | D564 | B605 | D664 | C305 |
| 0001311600 | D864 | CC05 | D964 | 2305 | DB65 | A105 | DD65 | A605 |
| 0001311620 | DE65 | B705 | E165 | C005 | E265 | D605 | E365 | 2D05 |
| 0001311640 | E566 | AB05 | E766 | B005 | E866 | C805 | EB66 | D105 |
| 0001311660 | EC66 | E705 | ED66 | 4205 | F067 | BF05 | F367 | CB05 |
| 0001311700 | F467 | E505 | F767 | EE05 | F867 | 0405 | F968 | 5B05 |
| 0001311720 | FC68 | D905 | FE68 | DE05 | FF68 | F605 | 0268 | FF06 |
| 0001311740 | 0368 | 1506 | 0469 | 7006 | 0769 | ED06 | 0869 | F006 |
| 0001311760 | 0969 | 6D06 | 206A | 7806 | 236A | 8E06 | 266A | 9C06 |
| 0001312000 | 276A | B306 | 2A6A | B606 | 2B6A | CD06 | 2E6A | D006 |

THU MAR 14 17:25:16 1991 CRV_IPS.DLL PAGE 335, LINE 19707

| | | | | | | | | |
|---|---|---|---|---|---|---|---|---|
| 0001312020 | 2F6A | D606 | 306A | D906 | 316A | EF06 | 326A | F506 |
| 0001312040 | 3E6A | 0306 | 3F6B | 1306 | 4A6B | A606 | 4B6B | B906 |
| 0001312060 | 4F6B | CA06 | 506B | F306 | 526B | 7006 | 556C | 7C06 |
| 0001312100 | 566C | 9506 | 586C | 9E06 | 596C | F906 | 5E6C | 7606 |
| 0001312120 | 606D | 8906 | 636D | 9C06 | 666D | C106 | 676D | DC06 |
| 0001312140 | 696D | E506 | 6A6D | 4006 | 6D6E | BD06 | 6F6E | C606 |
| 0001312160 | 706E | 1D06 | 736F | 9B06 | 746F | B506 | 766F | C006 |
| 0001312200 | 786F | D906 | 7A6F | E206 | 7B6F | 3D06 | 7E70 | BA06 |
| 0001312220 | 7F70 | CB06 | 8070 | DF06 | 8170 | E806 | 8270 | F106 |
| 0001312240 | 8370 | 6E06 | 8471 | 7106 | 8671 | EE06 | 8771 | 0006 |
| 0001312260 | 8972 | 0906 | 8A72 | 5D06 | 8C72 | DA06 | 8E72 | E606 |
| 0001312300 | 8F72 | 3A06 | 9373 | 4306 | 9773 | 4F06 | 9873 | 5206 |
| 0001312320 | 9973 | A606 | 9B73 | AF06 | 9E73 | 0306 | 9F74 | 1506 |
| 0001312340 | A074 | 2106 | A174 | 2406 | A474 | 3706 | A574 | 5006 |
| 0001312360 | A774 | 5906 | A874 | B006 | AC74 | 2E06 | AD75 | 4F06 |
| 0001312400 | AE75 | 5D06 | AF75 | 6006 | B075 | 7806 | B175 | 8506 |
| 0001312420 | B275 | 9106 | B375 | 9A06 | B475 | A906 | B575 | B806 |
| 0001312440 | B675 | C106 | B775 | D006 | B875 | DF06 | BA75 | EE06 |
| 0001312460 | BB75 | FD06 | BE75 | 1B06 | BF76 | 3906 | C176 | 4206 |
| 0001312500 | C276 | 5606 | C376 | B106 | C576 | 2E06 | C777 | 3606 |
| 0001312520 | C877 | 5506 | CA77 | 5E06 | CB77 | B506 | CE77 | 3306 |
| 0001312540 | D078 | 3F06 | D278 | 9306 | D378 | 9606 | D578 | EA06 |
| 0001312560 | D778 | 6706 | D979 | 6A06 | DA79 | BE06 | DC79 | 3B06 |
| 0001312600 | DD7A | B806 | E87A | C306 | E97A | D306 | F47A | 6606 |
| 0001312620 | F57B | 7906 | F97B | 8A06 | FA7B | B206 | FC7B | 2F06 |
| 0001312640 | FF7C | 3B06 | 007C | 5407 | 027C | 5D07 | 037C | B807 |
| 0001312660 | 087C | 3507 | 0B7D | 5A07 | 0C7D | 7507 | 0E7D | 7E07 |
| 0001312700 | 0F7D | D907 | 127D | 5607 | 147E | 5F07 | 157E | B607 |
| 0001312720 | 187E | 3407 | 197F | 4E07 | 1B7F | 5907 | 1D7F | 7207 |
| 0001312740 | 1F7F | 7B07 | 207F | D607 | 237F | 5307 | 2480 | 6407 |
| 0001312760 | 2580 | 7807 | 2680 | 8107 | 2780 | 8A07 | 2880 | 0707 |
| 0001313000 | 2981 | 0A07 | 2B81 | 8707 | 2C81 | 9907 | 2E81 | A207 |
| 0001313020 | 2F81 | F607 | 3181 | 7307 | 3382 | 7F07 | 3482 | D307 |
| 0001313040 | 3882 | DC07 | 3C82 | E807 | 3D82 | EB07 | 3E82 | 3F07 |
| 0001313060 | 4083 | 4807 | 4383 | 9C07 | 4483 | AE07 | 4583 | BA07 |
| 0001313100 | 4683 | BD07 | 4983 | D007 | 4A83 | E907 | 4C83 | F207 |
| 0001313120 | 4D83 | 4907 | 5184 | C707 | 5284 | E807 | 5384 | F607 |
| 0001313140 | 5484 | F907 | 5584 | 1107 | 5685 | 1E07 | 5785 | 2A07 |
| 0001313160 | 5885 | 3307 | 5985 | 4207 | 5A85 | 5107 | 5B85 | 5A07 |
| 0001313200 | 5C85 | 6907 | 5D85 | 7807 | 5F85 | 8707 | 6085 | 9607 |
| 0001313220 | 6385 | B407 | 6485 | D207 | 6685 | DB07 | 6785 | EF07 |
| 0001313240 | 6885 | 4A07 | 6A86 | C707 | 6C86 | CF07 | 6D86 | EE07 |
| 0001313260 | 6F86 | F707 | 7086 | 4E07 | 7387 | CC07 | 7587 | D807 |
| 0001313300 | 7687 | 2C07 | 7888 | A907 | 7A88 | AC07 | 7B88 | 0007 |
| 0001313320 | 7E89 | 7D07 | 8089 | 8007 | 8189 | D407 | 8389 | 5107 |
| 0001313340 | 848A | CE07 | 968A | D907 | A78A | EF07 | A88A | F407 |
| 0001313360 | AA8A | F907 | AB8A | 0C07 | AC8B | 2507 | AD8B | 3807 |
| 0001313400 | AF8B | 3D07 | B18B | 4807 | B28B | 6307 | B38B | 6C07 |
| 0001313420 | B78B | 7207 | B88B | 8507 | B98B | 9007 | BB8B | 9907 |
| 0001313440 | BC8B | A807 | BD8B | C007 | BF8B | C907 | C08B | D507 |
| 0001313460 | C18B | E507 | C28B | EA07 | C48B | EF07 | C78B | 0707 |
| 0001313500 | C88C | 0A07 | CA8C | 1007 | 098C | 7263 | 5F76 | 6F6C |
| 0001313520 | 2E63 | 0263 | 7000 | 8A00 | 1C00 | 8B8C | 3200 | 8F8C |
| 0001313540 | C500 | 908C | D400 | 918C | E300 | 928C | F200 | 948C |
| 0001313560 | 0100 | 968D | 1900 | 978D | 2800 | 988D | BA00 | 998D |
| 0001313600 | BD00 | 9A8D | CC00 | 9B8D | 5E00 | 9C8E | 6100 | 9D8E |
| 0001313620 | DE00 | AF8E | EC00 | B08E | 0200 | B28F | A200 | BA8F |
| 0001313640 | AC00 | BD8F | DB00 | BE8F | 3D00 | C190 | C600 | C390 |
| 0001313660 | CB00 | C590 | E800 | C790 | F700 | C890 | 0100 | CB91 |

THU MAR 14 17:25:16 1991 CRV_IPS.DLL PAGE 336, LINE 19766

| | | | | | | | | |
|---|---|---|---|---|---|---|---|---|
| 0001313700 | 8A00 | CC91 | A000 | CE91 | B700 | D391 | C900 | D491 |
| 0001313720 | D800 | D591 | 7800 | D692 | 7B00 | D792 | 8A00 | D892 |
| 0001313740 | 2A00 | D993 | 2D00 | DA93 | B600 | EC93 | C200 | ED93 |
| 0001313760 | D200 | F293 | 7200 | F894 | 7C00 | FB94 | AA00 | FC94 |
| 0001314000 | 0B00 | FF95 | 9400 | 0195 | 9901 | 0395 | B601 | 0595 |
| 0001314020 | C501 | 0695 | CF01 | 0895 | 5801 | 0996 | 6E01 | 0A96 |
| 0001314040 | 8401 | 0E96 | 9B01 | 0F96 | B301 | 1096 | C001 | 1296 |
| 0001314060 | D201 | 1396 | D501 | 1496 | D901 | 2796 | ED01 | 2896 |
| 0001314100 | FC01 | 2996 | 9C01 | 2A97 | 9F01 | 2B97 | AE01 | 2C97 |
| 0001314120 | 4E01 | 2D98 | 5101 | 2E98 | DA01 | 4198 | E501 | 4298 |
| 0001314140 | FB01 | 4398 | 0A01 | 4499 | 1B01 | 4599 | 1E01 | 4699 |
| 0001314160 | 2D01 | 4799 | 3E01 | 4899 | 4101 | 4999 | 4701 | 5B99 |
| 0001314200 | 5501 | 5D99 | 6B01 | 5E99 | 7A01 | 6099 | 8001 | 6199 |
| 0001314220 | 8F01 | 6299 | A001 | 6399 | A301 | 6499 | B201 | 6599 |
| 0001314240 | C301 | 6699 | C601 | 6799 | CC01 | 7899 | DA01 | 7999 |
| 0001314260 | F001 | 7A99 | FF01 | 7B99 | 1001 | 7C9A | 1301 | 7D9A |
| 0001314300 | 2201 | 7E9A | 3301 | 7F9A | 3601 | 809A | 3C01 | 919A |
| 0001314320 | 4A01 | 929A | 6001 | 939A | 6F01 | 949A | 8001 | 959A |
| 0001314340 | 8301 | 969A | 9201 | 979A | A301 | 989A | A601 | 999A |
| 0001314360 | AC01 | AA9A | BA01 | AB9A | D001 | AC9A | DA01 | AD9A |
| 0001314400 | DF01 | BF9A | EB01 | C09A | 0101 | D29B | 0F01 | D39B |
| 0001314420 | 1F01 | D49B | 2D01 | 099B | 7263 | 5F76 | 6F6D | 2E75 |
| 0001314440 | 0263 | 6E00 | 6703 | 3801 | 689B | 4801 | 6B9B | DB01 |
| 0001314460 | 6D9B | E801 | 6E9B | F401 | 6F9B | 0001 | 739C | 7D01 |
| 0001314500 | 749C | 9E01 | 769C | 1B01 | 789D | 2401 | 799D | 2901 |
| 0001314520 | 7A9D | 3601 | 7C9D | 3F01 | 7D9D | 5D01 | 7F9D | DA01 |
| 0001314540 | 809D | E201 | 819D | EB01 | 839D | F301 | 859D | FC01 |
| 0001314560 | 869D | 5001 | 879E | CD01 | 899E | D001 | 8A9E | DA01 |
| 0001314600 | 8B9E | F001 | 8C9E | 0601 | 8D9F | 0F01 | 8F9F | 8C01 |
| 0001314620 | A09F | 9701 | A19F | A701 | A59F | 4501 | A9A0 | 5101 |
| 0001314640 | AAA0 | 5E01 | ABA0 | 7401 | ADA0 | FB01 | AEA0 | 0101 |
| 0001314660 | AFA1 | D701 | B4A1 | 0C01 | B6A1 | 1601 | B7A1 | 1D01 |
| 0001314700 | BCA1 | 2401 | BDA1 | 4601 | BFA1 | CD01 | C1A1 | D301 |
| 0001314720 | C2A1 | F101 | C3A1 | 7801 | C5A2 | 7E01 | C7A2 | 8701 |
| 0001314740 | C8A2 | 0E01 | D9A3 | 1901 | DAA3 | 2901 | E0A3 | C201 |
| 0001314760 | E5A3 | CE01 | E6A3 | DF01 | E9A3 | 6801 | EAA4 | 7001 |
| 0001315000 | F6A4 | 7801 | F7A4 | 8101 | F8A4 | 8B01 | F9A4 | 9401 |
| 0001315020 | FAA4 | 9E01 | FCA4 | A701 | FEA4 | B101 | FFA4 | B901 |
| 0001315040 | 01A4 | C102 | 03A4 | C402 | 04A4 | CA02 | 0AA4 | D002 |
| 0001315060 | 0CA4 | DC02 | 0DA4 | EA02 | 0FA4 | F802 | 11A4 | 0202 |
| 0001315100 | 12A5 | 5902 | 15A5 | DF02 | 18A5 | E202 | 19A5 | F502 |
| 0001315120 | 1BA5 | 0B02 | 1DA6 | 1C02 | 1FA6 | 7B02 | 20A6 | 8302 |
| 0001315140 | 21A6 | 8B02 | 22A6 | 9102 | 23A6 | 9602 | 24A6 | A002 |
| 0001315160 | 25A6 | AA02 | 26A6 | AF02 | 27A6 | B402 | 28A6 | B902 |
| 0001315200 | 29A6 | CF02 | 2AA6 | 2602 | 2CA7 | AC02 | 2DA7 | AF02 |
| 0001315220 | 31A7 | B802 | 32A7 | 3E02 | 3EA8 | 4902 | 3FA8 | 5902 |
| 0001315240 | 43A8 | EC02 | 44A8 | F602 | 45A8 | 0002 | 46A9 | 0A02 |
| 0001315260 | 48A9 | 0D02 | 49A9 | 1002 | 4AA9 | 1402 | 4CA9 | 1D02 |
| 0001315300 | 4DA9 | 3302 | 4FA9 | 3602 | 50A9 | 3C02 | 53A9 | B902 |
| 0001315320 | 54A9 | BF02 | 55A9 | 3C02 | 5FAA | 4702 | 60AA | 5702 |
| 0001315340 | 65AA | EA02 | 68AA | F502 | 69AA | FB02 | 6CAA | 0102 |
| 0001315360 | 6DAB | 1F02 | 6EAB | 9C02 | 70AB | A202 | 71AB | C002 |
| 0001315400 | 73AB | 3D02 | 74AC | 4D02 | 76AC | CB02 | 79AC | D502 |
| 0001315420 | 7AAC | F302 | 7BAC | 7002 | 7CAD | 7C02 | 7DAD | 8802 |
| 0001315440 | 7EAD | 8D02 | 7FAD | 9E02 | 81AD | 0A02 | 83AE | 8702 |
| 0001315460 | 85AE | 8A02 | 86AE | 9B02 | 87AE | F902 | 89AE | 7602 |
| 0001315500 | 93AF | 8102 | 94AF | 9102 | 9CAF | 2402 | 9DB0 | 3D02 |
| 0001315520 | 9EB0 | 4302 | 9FB0 | 4E02 | A0B0 | 5902 | A2B0 | 5C02 |
| 0001315540 | A3B0 | 6202 | A7B0 | 6802 | A8B0 | 7302 | A9B0 | 8702 |

THU MAR 14 17:25:16 1991 CRV_IPS.DLL PAGE 337, LINE 19825

| | | | | | | | | |
|---|---|---|---|---|---|---|---|---|
| 0001315560 | ABB0 | 8D02 | ACB0 | 9202 | ADB0 | 9802 | AFB0 | 9B02 |
| 0001315600 | B0B0 | A102 | B1B0 | A602 | B3B0 | A902 | B4B0 | AE02 |
| 0001315620 | B5B0 | B602 | B7B0 | B902 | B8B0 | C102 | B9B0 | C602 |
| 0001315640 | BAB0 | C902 | BCB0 | E702 | BEB0 | ED02 | BFB0 | 0B02 |
| 0001315660 | C1B1 | 8802 | C3B1 | 9102 | C5B1 | 9F02 | C7B1 | A502 |
| 0001315700 | C8B1 | C302 | CBB1 | 4002 | CCB2 | 5002 | CFB2 | CE02 |
| 0001315720 | D1B2 | D702 | D3B2 | EB02 | D5B2 | F102 | D6B2 | 0F02 |
| 0001315740 | D9B3 | 8C02 | DAB3 | 9C02 | DCB3 | 1A02 | DFB4 | 2402 |
| 0001315760 | E0B4 | 4202 | E1B4 | BF02 | E2B4 | CB02 | E3B4 | D702 |
| 0001316000 | E4B4 | DC02 | E5B4 | ED02 | E7B4 | 5602 | E9B5 | D302 |
| 0001316020 | EAB5 | D602 | EBB5 | E702 | EDB5 | 4802 | EEB6 | C502 |
| 0001316040 | F8B6 | D002 | F9B6 | E002 | FBB6 | E802 | FCB6 | 0302 |
| 0001316060 | FEB7 | 0902 | FFB7 | 2702 | 00B7 | 2D03 | 01B7 | 3703 |
| 0001316100 | 02B7 | 3D03 | 0CB7 | 4803 | 0DB7 | 5803 | 10B7 | EB03 |
| 0001316120 | 11B7 | F303 | 13B7 | FB03 | 14B7 | 1903 | 15B8 | 9603 |
| 0001316140 | 1BB8 | A003 | 1CB8 | BE03 | 1DB8 | 3B03 | 1FB9 | 4103 |
| 0001316160 | 20B9 | 5F03 | 21B9 | DC03 | 23B9 | E203 | 24B9 | 0003 |
| 0001316200 | 2BBA | 7D03 | 2CBA | FA03 | 37BA | 0503 | 38BB | 1503 |
| 0001316220 | 48BB | A803 | 49BB | B503 | 4ABB | C203 | 4DBB | CC03 |
| 0001316240 | 4EBB | E203 | 51BB | 5F03 | 52BC | 8003 | 57BC | FE03 |
| 0001316260 | 58BC | 2403 | 5ABD | A203 | 5CBD | FC03 | 5DBD | 0403 |
| 0001316300 | 5EBE | 0C03 | 60BE | 1503 | 61BE | 3403 | 62BE | 5303 |
| 0001316320 | 63BE | 7503 | 65BE | 8B03 | 66BE | 9703 | 67BE | AA03 |
| 0001316340 | 68BE | 2703 | 69BF | 3A03 | 6ABF | B703 | 6BBF | C203 |
| 0001316360 | 6CBF | CD03 | 6DBF | DB03 | 6EBF | EB03 | 6FBF | 6903 |
| 0001316400 | 71C0 | 6C03 | 72C0 | 8E03 | 73C0 | 9703 | 74C0 | B503 |
| 0001316420 | 76C0 | D303 | 77C0 | DF03 | 78C0 | F203 | 79C0 | 6F03 |
| 0001316440 | 7AC1 | 8203 | 7BC1 | FF03 | 7CC1 | 0A03 | 7DC2 | 1703 |
| 0001316460 | 7EC2 | 2703 | 7FC2 | A503 | 81C2 | A803 | 82C2 | B103 |
| 0001316500 | 83C2 | D303 | 84C2 | F103 | 86C2 | 0F03 | 87C3 | 1B03 |
| 0001316520 | 88C3 | 2E03 | 89C3 | AB03 | 8AC3 | BE03 | 8BC3 | 3B03 |
| 0001316540 | 8CC4 | 4603 | 8DC4 | 5303 | 8EC4 | 6303 | 8FC4 | E103 |
| 0001316560 | 91C4 | E403 | 92C4 | F303 | 94C4 | 7003 | 96C5 | 7903 |
| 0001316600 | 97C5 | 8303 | 99C5 | 8D03 | 9AC5 | A303 | 9BC5 | 2003 |
| 0001316620 | 9CC6 | 9D03 | BBC6 | A803 | BCC6 | B803 | C2C6 | 4B03 |
| 0001316640 | C3C7 | 5A03 | C5C7 | D703 | C6C7 | E403 | C9C7 | ED03 |
| 0001316660 | CAC7 | F703 | CEC7 | 0103 | D0C8 | 0E03 | D2C8 | 2403 |
| 0001316700 | D3C8 | 2E03 | D5C8 | AB03 | D6C8 | AE03 | D8C8 | 2B03 |
| 0001316720 | DBC9 | 2E03 | DDC9 | 3203 | DFC9 | 3E03 | E0C9 | 5103 |
| 0001316740 | E1C9 | CE03 | E2C9 | DD03 | E5C9 | 5A03 | E6CA | 6D03 |
| 0001316760 | E7CA | EA03 | E9CA | 0C03 | EACB | 1703 | EBCB | 2403 |
| 0001317000 | ECCB | 2E03 | EDCB | 3103 | EECB | 4703 | F0CB | 5503 |
| 0001317020 | F1CB | 6003 | F2CB | 6D03 | F3CB | 7703 | F4CB | 7A03 |
| 0001317040 | F5CB | 9003 | F7CB | 9E03 | F8CB | AC03 | F9CB | BC03 |
| 0001317060 | FBCB | 3A03 | FCCC | B703 | 0ECC | C204 | 0FCC | D204 |
| 0001317100 | 10CC | DB04 | 11CC | E204 | 12CC | E504 | 14CC | EC04 |
| 0001317120 | 15CC | F504 | 16CC | FC04 | 17CC | FF04 | 18CC | 0604 |
| 0001317140 | 20CD | 1104 | 22CD | 2104 | 23CD | 3004 | 37CD | 3B04 |
| 0001317160 | 49CD | 4B04 | 4ACD | 5104 | 82CD | 5C04 | 83CD | 6C04 |
| 0001317200 | 85CD | FF04 | 86CD | 0404 | 8DCE | 0904 | 8ECE | 2504 |
| 0001317220 | 9BCE | 2B04 | 9DCE | 4204 | 9FCE | A404 | A2CE | AD04 |
| 0001317240 | A3CE | C104 | A7CE | 2904 | A8CF | 4E04 | A9CF | 6A04 |
| 0001317260 | AACF | 7304 | ACCF | D604 | AECF | 5304 | B3D0 | 5604 |
| 0001317300 | B6D0 | 5904 | B7D0 | 6D04 | BBD0 | DE04 | BCD0 | 0C04 |
| 0001317320 | BDD1 | 2804 | BED1 | 3104 | C0D1 | 9404 | C2D1 | 1104 |
| 0001317340 | C5D2 | 1404 | C7D2 | 6804 | C8D2 | E504 | D5D2 | F004 |
| 0001317360 | D6D2 | 0004 | D8D3 | 0504 | D9D3 | 0E04 | DAD3 | 1204 |
| 0001317400 | DBD3 | 1504 | DCD3 | 2804 | DED3 | 2C04 | DFD3 | 3504 |
| 0001317420 | E0D3 | 3904 | E1D3 | 3C04 | E2D3 | 4F04 | E5D3 | 5204 |

THU MAR 14 17:25:16 1991 CRV_IPS.DLL PAGE 338, LINE 19884

| | | | | | | | | |
|---|---|---|---|---|---|---|---|---|
| 0001317440 | E7D3 | 5804 | F9D3 | 6304 | FAD3 | 7304 | 02D3 | 0605 |
| 0001317460 | 03D4 | 1005 | 04D4 | 1605 | 05D4 | 1C05 | 07D4 | 2205 |
| 0001317500 | 08D4 | 3D05 | 10D4 | A105 | 11D4 | A905 | 12D4 | B105 |
| 0001317520 | 15D4 | C005 | 16D4 | C905 | 17D4 | D405 | 19D4 | DF05 |
| 0001317540 | 1AD4 | E205 | 1BD4 | EB05 | 1CD4 | F405 | 20D4 | FD05 |
| 0001317560 | 21D4 | 0605 | 22D5 | 1105 | 24D5 | 1C05 | 25D5 | 1F05 |
| 0001317600 | 26D5 | 2805 | 27D5 | 3105 | 2CD5 | 3A05 | 2ED5 | 9D05 |
| 0001317620 | 42D5 | A805 | 44D5 | B805 | 46D5 | BD05 | 47D5 | C905 |
| 0001317640 | 49D5 | D505 | 4AD5 | 0005 | 4BD6 | 0905 | 4DD6 | 0D05 |
| 0001317660 | 4ED6 | 1005 | 52D6 | 1405 | 53D6 | 3F05 | 54D6 | 4805 |
| 0001317700 | 56D6 | 4C05 | 57D6 | 4F05 | 5CD6 | 5205 | 5ED6 | 7505 |
| 0001317720 | 6ED6 | 8005 | 6FD6 | 9005 | 73D6 | 2305 | 76D7 | 8305 |
| 0001317740 | 7BD7 | 8B05 | 7CD7 | 9605 | 7ED7 | A105 | 80D7 | A905 |
| 0001317760 | 82D7 | B205 | 83D7 | CB05 | 84D7 | D405 | 87D7 | D905 |
| 0001320000 | 88D7 | E205 | 8AD7 | E805 | 8BD7 | 0105 | 8CD8 | DA05 |
| 0001320020 | 8ED8 | 0F05 | 8FD8 | 1805 | 92D8 | 2605 | 94D8 | 2C05 |
| 0001320040 | 95D8 | 4505 | 96D8 | 4E05 | 98D8 | 5305 | 9BD8 | 5C05 |
| 0001320060 | 9CD8 | 6405 | 9DD8 | 6D05 | A3D8 | 7505 | A4D8 | 7E05 |
| 0001320100 | ABD8 | 9205 | ACD8 | 9B05 | ADD8 | A905 | AED8 | B705 |
| 0001320120 | B0D8 | BF05 | B1D8 | C205 | B4D8 | CA05 | B5D8 | 2605 |
| 0001320140 | B6D9 | A405 | D2D9 | AF05 | D3D9 | BF05 | D4D9 | C505 |
| 0001320160 | D5D9 | C805 | EBD9 | D305 | ECD9 | E305 | EDD9 | E905 |
| 0001320200 | EED9 | EF05 | EFD9 | F505 | F0D9 | F805 | 01D9 | 0306 |
| 0001320220 | 02DA | 1306 | 05DA | B106 | 08DA | B706 | 0BDA | BD06 |
| 0001320240 | 10DA | C306 | 14DA | DC06 | 15DA | FE06 | 17DA | 8506 |
| 0001320260 | 18DB | 9B06 | 1ADB | A106 | 1CDB | AB06 | 1EDB | B006 |
| 0001320300 | 1FDB | D806 | 28DB | 5F06 | 2BDC | 6406 | 2CDC | 8006 |
| 0001320320 | 30DC | 8506 | 31DC | A106 | 32DC | AA06 | 33DC | AF06 |
| 0001320340 | 34DC | B206 | 35DC | B706 | 36DC | BA06 | 37DC | C306 |
| 0001320360 | 38DC | C806 | 39DC | CB06 | 3FDC | D006 | 41DC | D606 |
| 0001320400 | 42DC | DC06 | 44DC | DF06 | 45DC | E506 | 47DC | E806 |
| 0001320420 | 48DC | EE06 | 4ADC | F106 | 4BDC | F706 | 4CDC | FA06 |
| 0001320440 | 50DC | 1906 | 51DD | 1F06 | 54DD | 2506 | 55DD | 2F06 |
| 0001320460 | 59DD | 3906 | 5BDD | 5806 | 5CDD | 8906 | 5DDD | 8C06 |
| 0001320500 | 62DD | 8F06 | 65DD | 9406 | 67DD | F406 | 69DD | 5E06 |
| 0001320520 | 6BDE | C806 | 6CDE | D306 | 6DDE | D806 | 6EDE | 5F06 |
| 0001320540 | 79DF | 6A06 | 7BDF | 7A06 | 7CDF | 8006 | 8FDF | 8B06 |
| 0001320560 | 90DF | 9B06 | 96DF | 2E06 | 97E0 | 4D06 | 99E0 | CA06 |
| 0001320600 | 9AE0 | DF06 | 9BE0 | F606 | 9CE0 | FF06 | 9DE0 | 7C06 |
| 0001320620 | 9EE1 | 9006 | 9FE1 | B906 | A0E1 | C706 | A1E1 | CC06 |
| 0001320640 | A3E1 | D706 | A4E1 | 5406 | B7E2 | 5F06 | BBE2 | 6F06 |
| 0001320660 | BCE2 | 8E06 | BDE2 | 9406 | BEE2 | AC06 | BFE2 | C006 |
| 0001320700 | C0E2 | D406 | C1E2 | FB06 | C2E2 | 0906 | C3E3 | 0F06 |
| 0001320720 | CDE3 | 1A06 | D0E3 | 2A06 | D2E3 | 2F06 | D3E3 | 3F06 |
| 0001320740 | D7E3 | 4506 | E8E3 | 5006 | E9E3 | 6006 | ECE3 | F306 |
| 0001320760 | EFE3 | 5306 | F2E4 | 5906 | F3E4 | 5C06 | F7E4 | 5F06 |
| 0001321000 | F9E4 | 6206 | FAE4 | 6506 | FBE4 | 6806 | FEE4 | 6B06 |
| 0001321020 | FFE4 | 6E06 | 00E4 | 7107 | 02E4 | 9407 | 03E4 | 9C07 |
| 0001321040 | 05E4 | A407 | 08E4 | 0407 | 0AE5 | 0A07 | 0BE5 | 2807 |
| 0001321060 | 0DE5 | A507 | 0FE5 | AE07 | 12E5 | BC07 | 14E5 | C207 |
| 0001321100 | 15E5 | E007 | 18E5 | 5D07 | 19E6 | 6D07 | 1BE6 | EB07 |
| 0001321120 | 1DE6 | F107 | 1EE6 | 0F07 | 21E7 | 8C07 | 22E7 | 9C07 |
| 0001321140 | 24E7 | 1A07 | 27E8 | 2407 | 28E8 | 4207 | 29E8 | BF07 |
| 0001321160 | 2AE8 | CB07 | 2BE8 | D707 | 2CE8 | DC07 | 31E8 | 4A07 |
| 0001321200 | 32E9 | 6407 | 36E9 | 7E07 | 38E9 | 8707 | 3AE9 | 8D07 |
| 0001321220 | 3BE9 | AB07 | 3DE9 | 2807 | 3FEA | 3107 | 41EA | 4507 |
| 0001321240 | 43EA | 4B07 | 44EA | 6907 | 47EA | E607 | 48EA | F607 |
| 0001321260 | 4AEA | 7407 | 4CEB | 7A07 | 4DEB | 9807 | 50EB | 1507 |
| 0001321300 | 51EC | 2507 | 53EC | A307 | 56EC | AD07 | 57EC | CB07 |

THU MAR 14 17:25:16 1991 CRV_IPS.DLL PAGE 339, LINE 19943

| | | | | | | | | |
|---|---|---|---|---|---|---|---|---|
| 0001321320 | 58EC | 4807 | 59ED | 5407 | 5AED | 6007 | 5BED | 6507 |
| 0001321340 | 5EED | C507 | 60ED | 4207 | 7EEE | 4D07 | 85EE | 5D07 |
| 0001321360 | 86EE | 6C07 | 88EE | 7207 | 89EE | 7B07 | 8AEE | 8407 |
| 0001321400 | 8BEE | 9807 | 8DEE | AC07 | 8FEE | BD07 | 90EE | C607 |
| 0001321420 | 91EE | CC07 | 92EE | D207 | 93EE | FD07 | 94EE | 0607 |
| 0001321440 | 95EF | 0C07 | 96EF | 2307 | 98EF | 3A07 | 99EF | 5207 |
| 0001321460 | 9BEF | 6A07 | 9CEF | 6D07 | 9DEF | 7707 | 9EEF | 8107 |
| 0001321500 | 9FEF | AC07 | A0EF | B507 | A1EF | BB07 | A2EF | D707 |
| 0001321520 | A3EF | F307 | A4EF | 1007 | A6F0 | 2C07 | A7F0 | 3607 |
| 0001321540 | A8F0 | 3F07 | A9F0 | 4807 | AAF0 | 4E07 | BBF0 | 5907 |
| 0001321560 | BEF0 | 6907 | BFF0 | 7707 | C1F0 | 8507 | C2F0 | 9407 |
| 0001321600 | C4F0 | 9A07 | C5F0 | AE07 | C8F0 | B407 | C9F0 | D707 |
| 0001321620 | CBF0 | FA07 | CCF0 | 1D07 | CEF1 | 4007 | D0F1 | 4607 |
| 0001321640 | EDF1 | 5107 | F0F1 | 6107 | F1F1 | 7207 | F2F1 | 8307 |
| 0001321660 | F3F1 | 9907 | F7F1 | 9F07 | F8F1 | B607 | F9F1 | DC07 |
| 0001321700 | FBF1 | F107 | FCF1 | 0807 | FDF2 | 2E07 | FFF2 | 4307 |
| 0001321720 | 00F2 | 4908 | 0AF2 | 5408 | 17F2 | 6408 | 18F2 | 6A08 |
| 0001321740 | 33F2 | 7008 | 34F2 | 7508 | 35F2 | 7A08 | 36F2 | 8008 |
| 0001321760 | 37F2 | 9408 | 38F2 | A008 | 39F2 | AB08 | 3AF2 | C808 |
| 0001322000 | 3BF2 | DA08 | 3CF2 | E608 | 3EF2 | EC08 | 40F2 | EF08 |
| 0001322020 | 41F2 | F408 | 42F2 | F908 | 43F2 | FF08 | 44F2 | 1308 |
| 0001322040 | 45F3 | 1F08 | 46F3 | 2A08 | 47F3 | 4708 | 48F3 | 5908 |
| 0001322060 | 49F3 | 6508 | 4BF3 | 6B08 | 4CF3 | 6E08 | 4DF3 | 7408 |
| 0001322100 | 58F3 | 7F08 | 5CF3 | 8F08 | 5DF3 | 9408 | 5EF3 | 9A08 |
| 0001322120 | 5FF3 | AA08 | 60F3 | BB08 | 61F3 | C808 | 62F3 | CB08 |
| 0001322140 | 66F3 | D308 | 67F3 | DC08 | 68F3 | E108 | 69F3 | EF08 |
| 0001322160 | 6CF3 | F808 | 6DF3 | FB08 | 6EF3 | 0008 | 6FF4 | 0608 |
| 0001322200 | 70F4 | 1608 | 71F4 | 2708 | 72F4 | 3408 | 73F4 | 3708 |
| 0001322220 | 77F4 | 3F08 | 78F4 | 4808 | 79F4 | 4D08 | 7AF4 | 5B08 |
| 0001322240 | 7DF4 | 6408 | 7EF4 | 6708 | A9F4 | 7208 | ACF4 | 8208 |
| 0001322260 | AEF4 | 8708 | AFF4 | 8C08 | B0F4 | 9108 | B5F4 | 9608 |
| 0001322300 | B6F4 | A508 | B8F4 | AB08 | B9F4 | B008 | BBF4 | B508 |
| 0001322320 | BCF4 | D608 | BEF4 | DC08 | BFF4 | E908 | C2F4 | EF08 |
| 0001322340 | C3F4 | 0908 | C8F5 | 0F08 | C9F5 | 1A08 | CBF5 | 2808 |
| 0001322360 | CCF5 | 3108 | CEF5 | 3408 | D2F5 | 4A08 | D3F5 | 6E08 |
| 0001322400 | D6F5 | 7B08 | D7F5 | 9F08 | D9F5 | A508 | DCF5 | AB08 |
| 0001322420 | DEF5 | AE08 | DFF5 | B308 | E0F5 | B808 | E2F5 | BB08 |
| 0001322440 | E4F5 | BE08 | E5F5 | C708 | E6F5 | CC08 | E8F5 | CF08 |
| 0001322460 | E9F5 | D408 | EAF5 | D708 | EBF5 | D408 | EDF6 | 0708 |
| 0001322500 | EEF6 | 1608 | F0F6 | 2608 | F1F6 | 2F08 | F4F6 | 3208 |
| 0001322520 | F5F6 | 3F08 | F7F6 | 4508 | F8F6 | 4E08 | FAF6 | 5408 |
| 0001322540 | FBF6 | 5D08 | FEF6 | 6308 | FFF6 | 6C08 | 00F6 | 7609 |
| 0001322560 | 01F6 | 8009 | 02F6 | 8A09 | 03F6 | 9309 | 06F6 | 9C09 |
| 0001322600 | 08F6 | A209 | 13F6 | AD09 | 17F6 | BD09 | 18F6 | C209 |
| 0001322620 | 19F6 | C709 | 1FF6 | CC09 | 20F6 | E509 | 22F6 | EB09 |
| 0001322640 | 23F6 | F809 | 2CF6 | FE09 | 2DF6 | 0709 | 2FF7 | 0C09 |
| 0001322660 | 31F7 | 1909 | 32F7 | 3309 | 33F7 | 3909 | 34F7 | 4209 |
| 0001322700 | 35F7 | 4509 | 36F7 | 4809 | 37F7 | 5C09 | 38F7 | 6109 |
| 0001322720 | 39F7 | 6409 | 3CF7 | 6C09 | 3FF7 | 7709 | 40F7 | 8009 |
| 0001322740 | 45F7 | 8609 | 46F7 | A709 | 48F7 | AD09 | 49F7 | BA09 |
| 0001322760 | 4EF7 | C009 | 4FF7 | C909 | 51F7 | CE09 | 53F7 | DB09 |
| 0001323000 | 54F7 | F509 | 55F7 | FB09 | 56F7 | 0409 | 57F8 | 0709 |
| 0001323020 | 58F8 | 0A09 | 59F8 | 1E09 | 5AF8 | 2309 | 5BF8 | 2609 |
| 0001323040 | 5EF8 | 2E09 | 61F8 | 3909 | 62F8 | 4209 | 66F8 | 4809 |
| 0001323060 | 67F8 | 5109 | 68F8 | 5A09 | 69F8 | 6F09 | 6AF8 | 7209 |
| 0001323100 | 6BF8 | 8509 | 6CF8 | 8E09 | 6DF8 | 9709 | 6EF8 | AC09 |
| 0001323120 | 6FF8 | AF09 | 71F8 | C209 | 73F8 | CB09 | 75F8 | D109 |
| 0001323140 | 82F8 | DC09 | 83F8 | EC09 | 84F8 | F509 | 85F8 | FE09 |
| 0001323160 | 88F8 | 0309 | 89F9 | 0C09 | 8AF9 | 1909 | 8BF9 | 4909 |

THU MAR 14 17:25:16 1991 CRV_IPS.DLL PAGE 340, LINE 20002

| | | | | | | | | |
|---|---|---|---|---|---|---|---|---|
| 0001323200 | 8CF9 | 7909 | 8DF9 | 7C09 | 8EF9 | 8209 | 8FF9 | 8509 |
| 0001323220 | 90F9 | 9209 | 91F9 | 9E09 | 92F9 | D409 | 93F9 | D709 |
| 0001323240 | 95F9 | F909 | 96F9 | 0509 | 97FA | 3B09 | 98FA | 3E09 |
| 0001323260 | 99FA | 6009 | 9AFA | 6309 | 9CFA | 6909 | 9EFA | 7709 |
| 0001323300 | A0FA | 7C09 | A2FA | 8A09 | A4FA | 8F09 | A5FA | 9809 |
| 0001323320 | A6FA | 9E09 | A7FA | A109 | A8FA | A709 | 09FA | 7263 |
| 0001323340 | 5F76 | 726C | 2E6E | 0363 | E400 | 7102 | 0001 | 7200 |
| 0001323360 | 1001 | 7300 | 1901 | 7400 | 1F01 | 7500 | 2201 | 7700 |
| 0001323400 | 2801 | 7900 | 3501 | 7A00 | 3B01 | 9100 | 4601 | 9600 |
| 0001323420 | 5601 | 9800 | 5F01 | 9A00 | 6901 | 9B00 | 8201 | 9C00 |
| 0001323440 | 8B01 | 9E00 | 9101 | A000 | 9701 | A200 | 9A01 | A300 |
| 0001323460 | B301 | A400 | BC01 | A800 | C201 | A900 | D501 | AA00 |
| 0001323500 | E001 | AC00 | E601 | AD00 | FF01 | AE00 | 0801 | B001 |
| 0001323520 | 0E01 | B401 | 1701 | B501 | 2101 | B801 | 2701 | B901 |
| 0001323540 | 4301 | BA01 | 4C01 | BD01 | 5201 | BF01 | 6701 | C001 |
| 0001323560 | 8001 | C101 | 8901 | C301 | 8F01 | C401 | A801 | C501 |
| 0001323600 | B101 | C701 | B701 | C901 | D301 | CB01 | E101 | CD01 |
| 0001323620 | E701 | E401 | F201 | EC01 | 0201 | ED02 | 1301 | EF02 |
| 0001323640 | 2601 | F002 | 3901 | F102 | 4201 | F302 | 4B01 | F502 |
| 0001323660 | 5401 | F602 | 7101 | F902 | 8E01 | FA02 | B201 | FB02 |
| 0001323700 | BD01 | FC02 | C301 | FD02 | C901 | FF02 | CF01 | 0002 |
| 0001323720 | DA02 | 0102 | E002 | 0202 | E602 | 0402 | EC02 | 0502 |
| 0001323740 | EF02 | 0902 | F202 | 0A02 | FF02 | 0B02 | 0902 | 0C03 |
| 0001323760 | 1302 | 0D03 | 1602 | 0E03 | 2002 | 1103 | 2A02 | 1203 |
| 0001324000 | 3702 | 1603 | 4B02 | 1703 | 5102 | 2C03 | 5C02 | 3103 |
| 0001324020 | 6C02 | 3303 | 8002 | 3603 | 8D02 | 3A03 | A102 | 3D03 |
| 0001324040 | AE02 | 4103 | D202 | 4303 | EE02 | 4403 | F702 | 4703 |
| 0001324060 | 1202 | 4904 | 3202 | 4B04 | 5202 | 4D04 | 5802 | 4F04 |
| 0001324100 | 5B02 | 5204 | 7B02 | 5404 | 9802 | 5704 | B402 | 5904 |
| 0001324120 | B702 | 5D04 | D702 | 6004 | 1202 | 6405 | 2D02 | 6505 |
| 0001324140 | 3002 | 6705 | 3302 | 6805 | 3902 | 8005 | 4402 | 8305 |
| 0001324160 | 5402 | 8405 | 5C02 | 8605 | 6402 | 8705 | 7802 | 8805 |
| 0001324200 | 8102 | 8A05 | 9502 | 8E05 | 9E02 | 9005 | C202 | 9205 |
| 0001324220 | E202 | 9405 | 0202 | 9906 | 0802 | 9B06 | 4302 | 9F06 |
| 0001324240 | 4902 | A006 | 4C02 | A106 | 4F02 | AD06 | 5A02 | B106 |
| 0001324260 | 6A02 | B206 | 7E02 | B406 | 9802 | B506 | 9E02 | CA06 |
| 0001324300 | A902 | CF06 | B902 | D006 | CB02 | D106 | D602 | D406 |
| 0001324320 | DC02 | D606 | F802 | D806 | 0E02 | DA07 | 3102 | DB07 |
| 0001324340 | 3F02 | DC07 | 4502 | E907 | 5002 | ECD7 | 6002 | ED07 |
| 0001324360 | 6402 | EF07 | 6902 | F107 | 7102 | F207 | 8502 | F307 |
| 0001324400 | A102 | F407 | AA02 | F507 | B302 | F607 | C502 | F807 |
| 0001324420 | CA02 | F907 | CD02 | FE07 | D602 | FF07 | E902 | 0007 |
| 0001324440 | EF03 | 0307 | F403 | 0407 | F703 | 1407 | 0203 | 1C08 |
| 0001324460 | 1203 | 1E08 | 2603 | 1F08 | 3503 | 2308 | 4503 | 2408 |
| 0001324500 | 4B03 | 2508 | 5003 | 2608 | 6D03 | 2808 | 7503 | 2A08 |
| 0001324520 | 7A03 | 2C08 | 9D03 | 2D08 | A603 | 2E08 | AC03 | 2F08 |
| 0001324540 | B303 | 3008 | B903 | 3508 | BE03 | 3708 | C103 | 3808 |
| 0001324560 | DE03 | 3A08 | E603 | 3C08 | EB03 | 3D08 | 0E03 | 3E09 |
| 0001324600 | 1403 | 4209 | 1B03 | 4409 | 2803 | 4609 | 3F03 | 4809 |
| 0001324620 | 5A03 | 4A09 | 7703 | 4B09 | 8203 | 4C09 | 8903 | 4D09 |
| 0001324640 | 8F03 | 4E09 | 9503 | 5209 | 9A03 | 5409 | BD03 | 5509 |
| 0001324660 | C303 | 5709 | CA03 | 5909 | CD03 | 6609 | D803 | 6B09 |
| 0001324700 | E803 | 6C09 | 0403 | 6D0A | 0D03 | 6F0A | 1303 | 700A |
| 0001324720 | 2403 | 710A | 2D03 | 740A | 3303 | 750A | 4F03 | 760A |
| 0001324740 | 5803 | 780A | 5E03 | 790A | 7403 | 7A0A | 7D03 | 7C0A |
| 0001324760 | 8303 | 7D0A | 8903 | 880A | 9403 | 8E0A | A403 | 8F0A |
| 0001325000 | AD03 | 900A | B603 | 910A | BF03 | 940A | C803 | 970A |
| 0001325020 | D703 | 980A | F003 | 990A | 0903 | 9B0B | 1903 | 9C0B |
| 0001325040 | 2803 | 9D0B | 3203 | 9E0B | 4103 | 9F0B | 4B03 | A00B |

THU MAR 14 17:25:16 1991 CRV_IPS.DLL PAGE 341, LINE 20061

| | | | | | | | | |
|---|---|---|---|---|---|---|---|---|
| 0001325060 | 5A03 | A10B | 6403 | A20B | 7303 | A30B | 7D03 | A40B |
| 0001325100 | 8003 | A60B | 8303 | A70B | 8903 | B20B | 9403 | B50B |
| 0001325120 | A403 | B80B | B503 | BB0B | D303 | BF0B | F103 | C20B |
| 0001325140 | 0F03 | C60C | 2D03 | C80C | 3B03 | CC0C | 4903 | CD0C |
| 0001325160 | 5003 | CF0C | 5703 | D00C | 5D03 | DD0C | 6803 | E60C |
| 0001325200 | 7803 | E80C | 8A03 | E90C | 9803 | EB0C | 9E03 | EF0C |
| 0001325220 | AB03 | F20C | C203 | F60C | 0603 | F70D | 1C03 | F90D |
| 0001325240 | 2D03 | FB0D | 3003 | FD0D | 4603 | 000D | 6D04 | 070D |
| 0001325260 | 7604 | 0A0D | 8804 | 0B0D | 9604 | 0D0D | 9C04 | 0F0D |
| 0001325300 | AB04 | 130D | B804 | 140D | CF04 | 160D | ED04 | 180D |
| 0001325320 | 1104 | 1C0E | 1404 | 1D0E | 2A04 | 1E0E | 4804 | 210E |
| 0001325340 | 6204 | 220E | 6804 | 2C0E | 7304 | 2E0E | 8304 | 300E |
| 0001325360 | 9404 | 330E | 9D04 | 350E | AE04 | 370E | B704 | 380E |
| 0001325400 | BD04 | 430E | C804 | 470E | D804 | 480E | EE04 | 490E |
| 0001325420 | FD04 | 4C0E | 0304 | 4E0F | 1704 | 4F0F | 3004 | 500F |
| 0001325440 | 4304 | 520F | 4904 | 530F | 6104 | 540F | 7404 | 570F |
| 0001325460 | 7A04 | 580F | 8004 | 650F | 8B04 | 660F | 9B04 | 670F |
| 0001325500 | AA04 | 680F | BF04 | 6A0F | C204 | 6B0F | CB04 | 6C0F |
| 0001325520 | CF04 | 6D0F | E104 | 6E0F | E404 | 6F0F | E804 | 720F |
| 0001325540 | FA04 | 740F | 0E04 | 8210 | 1904 | 8510 | 2904 | 8610 |
| 0001325560 | 3804 | 8710 | 4D04 | 8810 | 5004 | 8910 | 6404 | 8A10 |
| 0001325600 | 6D04 | 8B10 | 7104 | 8D10 | 7504 | 8E10 | 7B04 | 9810 |
| 0001325620 | 8604 | 9910 | 9604 | 9A10 | AB04 | 9B10 | C104 | 9C10 |
| 0001325640 | D704 | 9D10 | E904 | 9E10 | F504 | A910 | 0004 | AD11 |
| 0001325660 | 1004 | B111 | 1804 | B211 | 3404 | B311 | 4404 | B811 |
| 0001325700 | 4A04 | BC11 | 5304 | BD11 | 6F04 | BE11 | 7F04 | BF11 |
| 0001325720 | 8504 | C011 | 8B04 | CA11 | 9604 | CB11 | A604 | CC11 |
| 0001325740 | B904 | CD11 | CC04 | DB11 | D704 | DD11 | E704 | DF11 |
| 0001325760 | EC04 | E011 | 0004 | E112 | 1404 | E212 | 3404 | E312 |
| 0001326000 | 3904 | E512 | 3C04 | E612 | 3F04 | E712 | 4804 | E812 |
| 0001326020 | 4B04 | EA12 | 4E04 | EB12 | 5804 | ED12 | 6304 | EE12 |
| 0001326040 | 6904 | 0812 | 7405 | 0C12 | 8405 | 0D12 | 9A05 | 0E12 |
| 0001326060 | A305 | 1012 | A905 | 1112 | BF05 | 1212 | C805 | 1412 |
| 0001326100 | CE05 | 1512 | DF05 | 1612 | E805 | 1812 | EE05 | 1912 |
| 0001326120 | FF05 | 1A12 | 0805 | 1C13 | 0E05 | 1D13 | 2405 | 1E13 |
| 0001326140 | 2D05 | 2013 | 3305 | 2113 | 4A05 | 2213 | 5305 | 2413 |
| 0001326160 | 5905 | 2513 | 6605 | 2613 | 6C05 | 3113 | 7705 | 3713 |
| 0001326200 | 8705 | 3A13 | A105 | 3B13 | BE05 | 3C13 | D405 | 3D13 |
| 0001326220 | E705 | 3E13 | 0405 | 3F14 | 0705 | 4014 | 0A05 | 4114 |
| 0001326240 | 0D05 | 4214 | 1305 | 4C14 | 1E05 | 5514 | 2E05 | 5714 |
| 0001326260 | 3F05 | 5814 | 4E05 | 5914 | 5605 | 5A14 | 5F05 | 5C14 |
| 0001326300 | 6805 | 5F14 | 7705 | 6214 | 8605 | 6314 | 9A05 | 6414 |
| 0001326320 | A605 | 6514 | B305 | 6614 | C005 | 6714 | CC05 | 6814 |
| 0001326340 | D905 | 6914 | E605 | 6A14 | E905 | 6C14 | F805 | 6F14 |
| 0001326360 | 0705 | 7015 | 1B05 | 7115 | 2205 | 7215 | 2905 | 7415 |
| 0001326400 | 2C05 | 7515 | 3205 | 8215 | 3D05 | 8315 | 4D05 | 8515 |
| 0001326420 | 6105 | 8615 | 6F05 | 8815 | 7D05 | 8915 | 8305 | 9715 |
| 0001326440 | 8E05 | 9C15 | 9E05 | 9E15 | AF05 | A015 | BE05 | A115 |
| 0001326460 | D705 | A215 | E305 | A315 | E605 | A415 | EC05 | A615 |
| 0001326500 | F305 | A715 | 3005 | A916 | 3305 | AA16 | 4D05 | AB16 |
| 0001326520 | 5905 | AC16 | 5C05 | AD16 | 6205 | B016 | 6905 | B116 |
| 0001326540 | AD05 | B216 | B005 | B316 | B605 | BD16 | C105 | C716 |
| 0001326560 | D105 | C916 | E205 | CB16 | F105 | CC16 | 0005 | CD17 |
| 0001326600 | 0F05 | D017 | 1E05 | D217 | 3005 | D417 | 4D05 | D717 |
| 0001326620 | 6105 | D917 | 8305 | DA17 | 8705 | DC17 | 9605 | DF17 |
| 0001326640 | 9905 | E217 | B405 | E417 | D505 | E717 | E905 | E917 |
| 0001326660 | 0B05 | EA18 | 0F05 | EC18 | 1E05 | ED18 | 2105 | EE18 |
| 0001326700 | 2705 | F818 | 3205 | 0218 | 4206 | 0318 | 5306 | 0418 |
| 0001326720 | 6206 | 0518 | 7106 | 0718 | 8006 | 0818 | 9206 | 0B18 |

THU MAR 14 17:25:16 1991 CRV_IPS.DLL PAGE 342, LINE 20120

| | | | | | | | | |
|---|---|---|---|---|---|---|---|---|
| 0001326740 | A106 | 0D18 | BE06 | 1018 | D206 | 1218 | F406 | 1318 |
| 0001326760 | F806 | 1518 | 0706 | 1819 | 0A06 | 1B19 | 2506 | 1D19 |
| 0001327000 | 4606 | 2019 | 5A06 | 2219 | 7C06 | 2319 | 8006 | 2519 |
| 0001327020 | 8F06 | 2619 | 9206 | 2719 | 9806 | 3519 | A306 | 3819 |
| 0001327040 | B306 | 3F19 | CD06 | 4019 | 1F06 | 411A | 3606 | 4F1A |
| 0001327060 | 4406 | 521A | 5406 | 591A | 6E06 | 5A1A | C006 | 5B1A |
| 0001327100 | D706 | 671A | E506 | 681A | F506 | 6B1A | 0506 | 6D1B |
| 0001327120 | 0B06 | 6E1B | 1A06 | 6F1B | 2106 | 701B | 2406 | 711B |
| 0001327140 | 2B06 | 7E1B | 3606 | 7F1B | 4606 | 801B | 5406 | 821B |
| 0001327160 | 6206 | 831B | 6806 | 901B | 7306 | 971B | 8306 | 991B |
| 0001327200 | 9406 | 9D1B | A306 | 9F1B | B506 | A01B | C706 | A11B |
| 0001327220 | D006 | A31B | D506 | A51B | EB06 | A81B | 0906 | AB1C |
| 0001327240 | 1706 | AD1C | 4006 | AE1C | 5C06 | B01C | 6806 | B11C |
| 0001327260 | 7106 | B21C | 8D06 | B41C | A806 | B51C | AE06 | BF1C |
| 0001327300 | B906 | C61C | C906 | C91C | DA06 | CD1C | E906 | CF1C |
| 0001327320 | FB06 | D01C | 0D06 | D11D | 1606 | D31D | 1B06 | D51D |
| 0001327340 | 3106 | D81D | 4F06 | DB1D | 5D06 | DD1D | 8606 | DE1D |
| 0001327360 | A206 | E01D | AE06 | E11D | B706 | E21D | D306 | E41D |
| 0001327400 | EE06 | E51D | F406 | F21D | FF06 | F31D | 0F06 | F61E |
| 0001327420 | 1406 | F91E | 2606 | FC1E | 3806 | FD1E | 4D06 | 0A1E |
| 0001327440 | 5807 | 121E | 6807 | 131E | 6E07 | 141E | 7407 | 151E |
| 0001327460 | 7A07 | 161E | 8507 | 171E | 9007 | 1C1E | 9907 | 1E1E |
| 0001327500 | CB07 | 221E | E407 | 241E | 1107 | 261F | 3807 | 271F |
| 0001327520 | 4B07 | 281F | 5607 | 291F | 5C07 | 2A1F | 6207 | 2C1F |
| 0001327540 | 6807 | 2D1F | 6B07 | 2E1F | 7607 | 2F1F | 7C07 | 301F |
| 0001327560 | 8207 | 341F | 8807 | 351F | 8B07 | 361F | 8E07 | 381F |
| 0001327600 | 9807 | 391F | B207 | 3B1F | BC07 | 3C1F | D607 | 4A1F |
| 0001327620 | E107 | 4F1F | F107 | 511F | 0507 | 5320 | 1807 | 5520 |
| 0001327640 | 2107 | 5720 | 3A07 | 5820 | 4007 | 5920 | 4707 | 5A20 |
| 0001327660 | 5B07 | 5B20 | 6607 | 5D20 | 7A07 | 5F20 | 8E07 | 6120 |
| 0001327700 | 9107 | 6420 | 9B07 | 6620 | B407 | 6720 | BB07 | 6820 |
| 0001327720 | C207 | 6920 | D607 | 6A20 | E107 | 6B20 | F507 | 7220 |
| 0001327740 | 0907 | 7421 | 0F07 | 7621 | 2907 | 7821 | 5107 | 8321 |
| 0001327760 | 5C07 | 8721 | 6C07 | 8821 | 8807 | 8921 | 9107 | 8B21 |
| 0001330000 | 9707 | 8C21 | A807 | 8D21 | B107 | 8F21 | B707 | 9021 |
| 0001330020 | C807 | 9121 | D107 | 9321 | D707 | 9421 | E807 | 9521 |
| 0001330040 | F107 | 9721 | F707 | 9821 | FD07 | A321 | 0807 | A422 |
| 0001330060 | 1807 | A522 | 2507 | A622 | 2E07 | A722 | 3107 | A822 |
| 0001330100 | 3A07 | A922 | 4007 | B422 | 4B07 | B722 | 5B07 | BA22 |
| 0001330120 | 6C07 | BD22 | 7A07 | C022 | 8807 | C322 | 9607 | C522 |
| 0001330140 | A407 | C622 | AA07 | D122 | B507 | D722 | C507 | D922 |
| 0001330160 | D607 | DB22 | E507 | DF22 | FE07 | E122 | 2807 | E223 |
| 0001330200 | 4C07 | E523 | 5C07 | E623 | 9107 | E923 | 9407 | EA23 |
| 0001330220 | D307 | EB23 | D607 | EC23 | DC07 | F723 | E707 | FD23 |
| 0001330240 | F707 | 0023 | 0B08 | 0224 | 2C08 | 0624 | 4D08 | 0724 |
| 0001330260 | 5608 | 0824 | 5F08 | 0924 | 6808 | 0B24 | 7108 | 0C24 |
| 0001330300 | 7708 | 1824 | 8208 | 1C24 | 9208 | 1D24 | A208 | 1E24 |
| 0001330320 | AB08 | 2024 | B108 | 2124 | C708 | 2524 | DC08 | 2724 |
| 0001330340 | F808 | 2824 | 0F08 | 2925 | 1808 | 2B25 | 1E08 | 2C25 |
| 0001330360 | 2B08 | 2D25 | 3108 | 3925 | 3C08 | 4225 | 4C08 | 4325 |
| 0001330400 | 5E08 | 4425 | 6908 | 4525 | 6F08 | 4625 | 8108 | 4725 |
| 0001330420 | 8C08 | 4925 | 9208 | 4A25 | A808 | 4B25 | BD08 | 4C25 |
| 0001330440 | D308 | 4E25 | E808 | 5025 | FB08 | 5225 | 0E08 | 5326 |
| 0001330460 | 1708 | 5526 | [illegible] | 5726 | 2908 | 5826 | 4608 | 5A26 |
| 0001330500 | 6308 | 5B26 | 8708 | 5C26 | 9208 | 5D26 | 9808 | 5E26 |
| 0001330520 | 9E08 | 6026 | A408 | 6126 | AF08 | 6226 | B508 | 6326 |
| 0001330540 | BB08 | 6526 | C108 | 6626 | C408 | 6D26 | C708 | 6E26 |
| 0001330560 | D608 | 6F26 | D908 | 7526 | DC08 | 7626 | E508 | 7726 |
| 0001330600 | E908 | 7826 | F208 | 7926 | F608 | 7A26 | FF08 | 7B26 |

THU MAR 14 17:25:16 1991 CRV_IPS.DLL PAGE 343, LINE 20179

| | | | | | | | | |
|---|---|---|---|---|---|---|---|---|
| 0001330620 | 0308 | 7C27 | 0C08 | 8327 | 1008 | 8527 | 4608 | 8627 |
| 0001330640 | 5308 | 8727 | 5D08 | 8827 | 6008 | 8A27 | 6A08 | 9227 |
| 0001330660 | 7308 | 9427 | A908 | 9527 | B608 | 9627 | C008 | 9727 |
| 0001330700 | C308 | 9927 | CD08 | A327 | D608 | A527 | 1E08 | A728 |
| 0001330720 | 2408 | A828 | 3208 | A928 | 4008 | AA28 | 4608 | B528 |
| 0001330740 | 5108 | BA28 | 6108 | BB28 | 7108 | BC28 | 7A08 | BD28 |
| 0001330760 | 8008 | BE28 | 9008 | BF28 | 9908 | C328 | 9F08 | C528 |
| 0001331000 | C408 | C728 | E808 | C928 | 0D08 | CB29 | 3108 | CC29 |
| 0001331020 | 4808 | CD29 | 5108 | D229 | 5708 | D429 | 7C08 | D729 |
| 0001331040 | A008 | D829 | AD08 | DA29 | BA08 | DB29 | C008 | E529 |
| 0001331060 | CB08 | E629 | DB08 | E729 | E808 | E929 | F608 | EA29 |
| 0001331100 | FC08 | F529 | 0708 | F62A | 1708 | F72A | 2108 | F92A |
| 0001331120 | 2B08 | FA2A | 3108 | 042A | 3C09 | 072A | 4C09 | 082A |
| 0001331140 | 6009 | 092A | 7409 | 0B2A | 9409 | 0C2A | B609 | 0D2A |
| 0001331160 | B909 | 0E2A | BC09 | 0F2A | C209 | 0A2A | 7263 | 5F76 |
| 0001331200 | 6369 | 6E6F | 632E | 0003 | 01A3 | 0084 | 2ACE | 0087 |
| 0001331220 | 2AE4 | 0088 | 2AE9 | 008B | 2AEE | 008C | 2B0D | 008D |
| 0001331240 | 2B13 | 008E | 2B16 | 008F | 2B1C | 00A5 | 2B28 | 00A8 |
| 0001331260 | 2B3E | 00A9 | 2B48 | 00AC | 2B50 | 00AE | 2B56 | 00AF |
| 0001331300 | 2B74 | 00B0 | 2B7A | 00B1 | 2B7D | 00B2 | 2B83 | 00D2 |
| 0001331320 | 2B8F | 00D3 | 2BA5 | 00E2 | 2C38 | 00E3 | 2C3D | 00E8 |
| 0001331340 | 2C42 | 00E9 | 2C4D | 00EA | 2C52 | 00EB | 2C5A | 00ED |
| 0001331360 | 2CAE | 00EE | 2CB1 | 00F0 | 2CBB | 00F6 | 2CCA | 00F8 |
| 0001331400 | 2CD4 | 00F9 | 2CDA | 00FA | 2CDF | 00FB | 2CE9 | 00FC |
| 0001331420 | 2CF3 | 00FD | 2D47 | 00FE | 2D4D | 00FF | 2D53 | 0100 |
| 0001331440 | 2D5D | 0101 | 2D6A | 0102 | 2D78 | 0104 | 2D7E | 0106 |
| 0001331460 | 2DFB | 0107 | 2DFE | 0108 | 2E0A | 0109 | 2E10 | 010A |
| 0001331500 | 2E13 | 010C | 2E19 | 010F | 2E1C | 0110 | 2E21 | 0111 |
| 0001331520 | 2E27 | 0112 | 2E2D | 0115 | 2E30 | 0116 | 2E35 | 0117 |
| 0001331540 | 2E3F | 0119 | 2E93 | 011A | 2E9C | 011C | 2EA6 | 011E |
| 0001331560 | 2F23 | 011F | 2F2C | 0122 | 2F80 | 0123 | 2F9C | 0125 |
| 0001331600 | 2FA5 | 0126 | 2FB3 | 0128 | 2FB9 | 0129 | 3036 | 012E |
| 0001331620 | 3039 | 012F | 303F | 0132 | 30BC | 0133 | 30C1 | 0134 |
| 0001331640 | 3115 | 0136 | 311F | 0137 | 313A | 0138 | 3140 | 0139 |
| 0001331660 | 3146 | 013A | 314C | 013B | 3152 | 013E | 31CF | 013F |
| 0001331700 | 31D2 | 014C | 31F8 | 0150 | 3238 | 0151 | 328C | 0152 |
| 0001331720 | 3292 | 0159 | 3298 | 015C | 32B5 | 015E | 3309 | 015F |
| 0001331740 | 330F | 0160 | 3315 | 0162 | 331B | 0164 | 3325 | 0165 |
| 0001331760 | 3379 | 016E | 337F | 0171 | 339C | 0174 | 33F6 | 0175 |
| 0001332000 | 340F | 0176 | 341A | 0177 | 3423 | 0178 | 3429 | 0179 |
| 0001332020 | 347D | 017F | 34FA | 0180 | 3513 | 0181 | 351E | 0182 |
| 0001332040 | 3527 | 0183 | 352D | 0184 | 3581 | 0187 | 35FE | 0189 |
| 0001332060 | 3652 | 018A | 3661 | 018B | 366C | 018C | 3675 | 018D |
| 0001332100 | 367B | 018E | 36CF | 0191 | 374C | 019B | 3752 | 019C |
| 0001332120 | 375B | 01A0 | 3765 | 01A1 | 37B9 | 01A3 | 37C3 | 01A4 |
| 0001332140 | 37DE | 01A5 | 37E4 | 01A6 | 37EA | 01A7 | 37F0 | 01AA |
| 0001332160 | 386D | 01AC | 3873 | 01AD | 3889 | 01AE | 3892 | 01AF |
| 0001332200 | 390F | 01B3 | 3912 | 01B4 | 3918 | 01B5 | 392E | 01B6 |
| 0001332220 | 3938 | 01B7 | 398C | 01BB | 3A09 | 01BC | 3A21 | 01BE |
| 0001332240 | 3A9E | 01C5 | 3AB4 | 01C6 | 3AC7 | 01C9 | 3B44 | 01CB |
| 0001332260 | 3B4A | 01CE | 3B54 | 01CF | 3B6E | 01D2 | 3B74 | 01D6 |
| 0001332300 | 3B8A | 01D7 | 3B93 | 01DB | 3C10 | 01DC | 3C64 | 01DF |
| 0001332320 | 3C6A | 01E0 | 3C81 | 01E1 | 3C8A | 01E2 | 3C90 | 01E3 |
| 0001332340 | 3C96 | 01E4 | 3C9C | 01E6 | 3D19 | 01E7 | 3D1C | 01E8 |
| 0001332360 | 3D22 | 01EC | 3D2C | 01ED | 3D34 | 01EE | 3D3D | 01EF |
| 0001332400 | 3D43 | 01F0 | 3D46 | 01F4 | 3D4C | 01F5 | 3D69 | 01F6 |
| 0001332420 | 3D6F | 01F7 | 3D75 | 01F8 | 3D7B | 01FB | 3DF8 | 01FC |
| 0001332440 | 3E01 | 0200 | 3E7E | 0202 | 3E87 | 0203 | 3E91 | 0204 |
| 0001332460 | 3EA0 | 0205 | 3EAA | 0206 | 3EFE | 0207 | 3F07 | 020C |

THU MAR 14 17:25:16 1991 CRV_IPS.DLL PAGE 344, LINE 20238

| | | | | | | | | |
|---|---|---|---|---|---|---|---|---|
| 0001332500 | 3F84 | 020D | 3FD8 | 020F | 3FDE | 0210 | 3FED | 0211 |
| 0001332520 | 3FF5 | 0212 | 3FFE | 0214 | 4004 | 0215 | 4007 | 0218 |
| 0001332540 | 405B | 0219 | 4074 | 021A | 407D | 021B | 4083 | 021C |
| 0001332560 | 4089 | 021D | 408F | 0220 | 410C | 0222 | 4115 | 0224 |
| 0001332600 | 4118 | 0225 | 4125 | 0226 | 413A | 0227 | 4143 | 0228 |
| 0001332620 | 4149 | 0229 | 414F | 022A | 4155 | 0230 | 41D2 | 0239 |
| 0001332640 | 424F | 023B | 4258 | 023C | 4271 | 023E | 427A | 0241 |
| 0001332660 | 4283 | 0243 | 428C | 0247 | 4292 | 0248 | 42AE | 0249 |
| 0001332700 | 42B7 | 024A | 42BD | 024F | 42C0 | 0250 | 42DE | 0252 |
| 0001332720 | 42E1 | 0255 | 4339 | 0256 | 433E | 025A | 4350 | 025B |
| 0001332740 | 4359 | 025C | 435F | 025D | 4365 | 025E | 436B | 0262 |
| 0001332760 | 43E8 | 0263 | 443C | 0264 | 4442 | 0265 | 4448 | 0266 |
| 0001333000 | 444E | 0267 | 4454 | 0268 | 445D | 0269 | 4468 | 026C |
| 0001333020 | 44E5 | 0274 | 44E8 | 0278 | 4565 | 027A | 457E | 027B |
| 0001333040 | 45D2 | 027D | 464F | 028F | 465D | 0290 | 466D | 0295 |
| 0001333060 | 4700 | 0297 | 4708 | 0298 | 471E | 029A | 479B | 029B |
| 0001333100 | 47AA | 029C | 47BC | 02A1 | 47C8 | 02A2 | 47E7 | 02A3 |
| 0001333120 | 47F1 | 02A6 | 47F9 | 02AA | 480D | 02AC | 4821 | 02AD |
| 0001333140 | 482A | 02B1 | 48A8 | 02B2 | 48C5 | 02B3 | 48D6 | 02B5 |
| 0001333160 | 48E7 | 02B6 | 48F3 | 02B7 | 48FF | 02B8 | 490B | 02BA |
| 0001333200 | 491D | 02BD | 492F | 02BE | 49AD | 02CC | 49B8 | 02CD |
| 0001333220 | 49C8 | 02D0 | 4A5B | 02D1 | 4A6F | 02D4 | 4A80 | 02D5 |
| 0001333240 | 4A94 | 02D7 | 4AA5 | 02D8 | 4B22 | 02E5 | 4B2D | 02E6 |
| 0001333260 | 4B3D | 02E8 | 4BD0 | 02ED | 4BD5 | 02EE | 4BF3 | 02EF |
| 0001333300 | 4C70 | 02F0 | 4C8F | 02F4 | 4D0C | 02F6 | 4D1C | 02F9 |
| 0001333320 | 4D28 | 02FB | 4D34 | 02FD | 4D40 | 02FE | 4D45 | 0300 |
| 0001333340 | 4D4A | 0301 | 4D54 | 0303 | 4D5E | 0305 | 4D6B | 0306 |
| 0001333360 | 4D76 | 0308 | 4D7D | 030F | 4DD7 | 0310 | 4E01 | 0313 |
| 0001333400 | 4E7E | 0314 | 4E9D | 0317 | 4F1A | 0318 | 4F39 | 031A |
| 0001333420 | 4FB6 | 031B | 5033 | 0329 | 503E | 032A | 504E | 032C |
| 0001333440 | 50E1 | 032E | 50E6 | 0332 | 50EE | 0333 | 510C | 0336 |
| 0001333460 | 5189 | 0337 | 5192 | 0338 | 51A3 | 0339 | 51A6 | 033C |
| 0001333500 | 51B7 | 033D | 51C1 | 033E | 51CB | 033F | 51D0 | 0340 |
| 0001333520 | 51D5 | 0344 | 51E2 | 0345 | 51FC | 0346 | 5205 | 0347 |
| 0001333540 | 5259 | 034D | 52C9 | 0352 | 5347 | 0353 | 5367 | 0354 |
| 0001333560 | 5370 | 0355 | 53C4 | 035A | 5442 | 035B | 545B | 035C |
| 0001333600 | 5464 | 035D | 54B8 | 0361 | 5536 | 0364 | 553F | 0366 |
| 0001333620 | 5559 | 0367 | 5573 | 036A | 5576 | 036B | 55F3 | 0377 |
| 0001333640 | 55FE | 037A | 560E | 037C | 561D | 037D | 5650 | 037F |
| 0001333660 | 565F | 0381 | 5692 | 0382 | 569B | 0383 | 56A4 | 0384 |
| 0001333700 | 56AA | 0385 | 56B3 | 0386 | 56B9 | 0389 | 56BF | 038A |
| 0001333720 | 56C8 | 038B | 56D1 | 038C | 56D7 | 038D | 56E0 | 038E |
| 0001333740 | 56E6 | 0391 | 56EC | 0392 | 56F5 | 0393 | 56FB | 0394 |
| 0001333760 | 5704 | 0396 | 570A | 0398 | 5710 | 03A7 | 571B | 03AB |
| 0001334000 | 572B | 03AC | 5735 | 03AE | 573F | 03AF | 575A | 03B0 |
| 0001334020 | 5763 | 03B2 | 5769 | 03B3 | 577A | 03B4 | 5783 | 03B7 |
| 0001334040 | 5789 | 03B8 | 57AE | 03B9 | 57B7 | 03BB | 57BD | 03BD |
| 0001334060 | 57CE | 03BE | 57D4 | 03CB | 57DF | 03CC | 57EF | 03CE |
| 0001334100 | 5882 | 03D0 | 5916 | 03D1 | 5993 | 03ED | 599E | 03F1 |
| 0001334120 | 59B4 | 03F2 | 59B9 | 03F3 | 59C1 | 03F7 | 59C9 | 03F8 |
| 0001334140 | 59E2 | 03F9 | 59EC | 03FA | 59F1 | 03FB | 59FA | 03FD |
| 0001334160 | 5A00 | 03FF | 5A0A | 0400 | 5A28 | 0401 | 5A2D | 0402 |
| 0001334200 | 5A30 | 0404 | 5A46 | 0405 | 5A66 | 0406 | 5A6F | 0409 |
| 0001334220 | 5A72 | 040D | 5A83 | 040E | 5A9E | 040F | 5AA7 | 0410 |
| 0001334240 | 5AAC | 0411 | 5AB7 | 0414 | 5ABA | 0415 | 5AC3 | 0419 |
| 0001334260 | 5AD8 | 041A | 5AF2 | 041B | 5AFB | 041C | 5B00 | 041D |
| 0001334300 | 5B0B | 0421 | 5B0E | 0422 | 5B28 | 0423 | 5B31 | 0424 |
| 0001334320 | 5B36 | 0425 | 5B41 | 0428 | 5B44 | 042A | 5B4F | 042D |
| 0001334340 | 5B52 | 042F | 5B65 | 0430 | 5B6B | 0443 | 5B77 | 0444 |

THU MAR 14 17:25:16 1991 CRV_IPS.DLL PAGE 345, LINE 20297

| | | | | | | | | |
|---|---|---|---|---|---|---|---|---|
| 0001334360 | 5B8D | 044E | 5C20 | 0450 | 5C3C | 0451 | 5C45 | 0452 |
| 0001334400 | 5C4A | 0455 | 5CC8 | 0457 | 5D20 | 0458 | 5D37 | 045A |
| 0001334420 | 5D9A | 045B | 5E18 | 6D0A | 756F | 6573 | 696C | 2E62 |
| 0001334440 | 0363 | 8400 | 6F00 | 2400 | 735E | 3400 | 745E | 3F00 |
| 0001334460 | 765E | 5D00 | 775E | 6600 | 795E | 6C00 | 7A5E | 7F00 |
| 0001334500 | 7B5E | 8800 | 7C5E | 9100 | 7D5E | 9700 | 7E5E | 9A00 |
| 0001334520 | 805E | A000 | 815E | B500 | 825E | BE00 | 845E | C400 |
| 0001334540 | 855E | CA00 | 9C5E | D500 | A45E | E500 | A55E | 0A00 |
| 0001334560 | A65F | 1000 | A75F | 1300 | A85F | 1900 | BF5F | 2400 |
| 0001334600 | C35F | 3400 | C65F | 4400 | C75F | 6500 | C85F | 6E00 |
| 0001334620 | C95F | 7400 | CA5F | 7700 | CB5F | 8600 | CC5F | 8C00 |
| 0001334640 | CD5F | 8F00 | CE5F | 9500 | E35F | A000 | E75F | B000 |
| 0001334660 | E85F | BB00 | E95F | C800 | EE5F | CE00 | EF5F | F000 |
| 0001334700 | F05F | F600 | F15F | F900 | F25F | 0C00 | F660 | 1200 |
| 0001334720 | 0E60 | 1D01 | 1360 | 2D01 | 1560 | 3C01 | 1660 | 5601 |
| 0001334740 | 1960 | 5901 | 1A60 | 6201 | 1B60 | 6B01 | 1C60 | 6E01 |
| 0001334760 | 1D60 | 7401 | 1E60 | 7701 | 2060 | 7D01 | 3860 | 8801 |
| 0001335000 | 3A60 | 9801 | 3B60 | BE01 | 3C60 | C401 | 3D60 | E201 |
| 0001335020 | 3E60 | 0201 | 3F61 | 0801 | 5661 | 1301 | 5861 | 2301 |
| 0001335040 | 5961 | 4901 | 5A61 | 4F01 | 5B61 | 6F01 | 5C61 | 8F01 |
| 0001335060 | 5D61 | 9501 | 7161 | A001 | 7261 | B001 | 7361 | BB01 |
| 0001335100 | 7461 | C201 | 7561 | C901 | 7661 | EF01 | 7861 | F501 |
| 0001335120 | 7961 | FB01 | 9161 | 0601 | 9562 | 1601 | 9762 | 2001 |
| 0001335140 | 9862 | 2601 | 9962 | 2C01 | 9A62 | 3401 | 9B62 | 3C01 |
| 0001335160 | 9C62 | 4201 | 9D62 | 4701 | 9E62 | 4C01 | A162 | 5201 |
| 0001335200 | A262 | 6101 | A362 | 7301 | A462 | 7901 | A562 | 7E01 |
| 0001335220 | A662 | 8101 | A762 | 9001 | A862 | 9501 | A962 | 9801 |
| 0001335240 | AB62 | 9E01 | AC62 | A401 | AE62 | AA01 | B062 | B601 |
| 0001335260 | C862 | C101 | C962 | D101 | CA62 | D701 | DC62 | E201 |
| 0001335300 | DD62 | F201 | DE62 | F801 | F162 | 0301 | F263 | 1301 |
| 0001335320 | F463 | 3601 | F563 | 3C01 | 0763 | 4702 | 0863 | 5702 |
| 0001335340 | 0A63 | 7A02 | 0B63 | 8002 | 1E63 | 8B02 | 1F63 | 9B02 |
| 0001335360 | 2063 | A202 | 2263 | C602 | 2363 | CC02 | 3563 | D702 |
| 0001335400 | 3663 | E702 | 3763 | EE02 | 3963 | 1202 | 3A64 | 1802 |
| 0001335420 | 4D64 | 2302 | 4E64 | 3302 | 4F64 | 3902 | 6164 | 4402 |
| 0001335440 | 6264 | 5402 | 6364 | 5A02 | 6564 | 6402 | 6764 | 7802 |
| 0001335460 | 6864 | 7E02 | 0864 | 6174 | 6C62 | 7465 | 632E | 0003 |
| 0001335500 | 00AC | 006C | 648A | 006E | 649A | 006F | 649F | 0073 |
| 0001335520 | 64A4 | 0074 | 64C5 | 0076 | 64CB | 0077 | 64D8 | 007A |
| 0001335540 | 64DE | 007B | 64F8 | 007F | 64FE | 0080 | 6509 | 0083 |
| 0001335560 | 6517 | 0084 | 6520 | 0085 | 6533 | 0086 | 6536 | 008A |
| 0001335600 | 6549 | 008B | 656D | 008D | 6573 | 0090 | 6579 | 0092 |
| 0001335620 | 657C | 0093 | 6581 | 0095 | 6584 | 0097 | 6587 | 0098 |
| 0001335640 | 658C | 0099 | 6591 | 009B | 6594 | 009C | 6597 | 009F |
| 0001335660 | 65C4 | 00A2 | 65D4 | 00A3 | 65E1 | 00A5 | 65E7 | 00A6 |
| 0001335700 | 65F0 | 00A8 | 65F6 | 00A9 | 65FF | 00AB | 6605 | 00AC |
| 0001335720 | 660E | 00AD | 6618 | 00AE | 6622 | 00AF | 662C | 00B0 |
| 0001335740 | 6635 | 00B3 | 663E | 00B4 | 6644 | 00D4 | 664F | 00E1 |
| 0001335760 | 665F | 00E2 | 666A | 00E3 | 6671 | 00E4 | 6681 | 00E6 |
| 0001336000 | 6691 | 00E7 | 669C | 00E8 | 66A3 | 00E9 | 66B4 | 00F0 |
| 0001336020 | 66C5 | 00F1 | 66DC | 00F3 | 66E2 | 00F4 | 66EF | 0111 |
| 0001336040 | 66F5 | 0112 | 6704 | 0116 | 6714 | 0118 | 6738 | 0119 |
| 0001336060 | 675C | 011A | 6762 | 011B | 6768 | 011D | 676E | 011E |
| 0001336100 | 6777 | 0120 | 6780 | 0123 | 6790 | 0125 | 67B4 | 0126 |
| 0001336120 | 67D8 | 0128 | 67DE | 0129 | 67EC | 0134 | 67FA | 0135 |
| 0001336140 | 6839 | 0136 | 6878 | 0137 | 68B0 | 013C | 68E8 | 013D |
| 0001336160 | 68F2 | 013E | 68FD | 013F | 6909 | 0140 | 690F | 015A |
| 0001336200 | 691A | 015D | 692A | 015F | 6937 | 0160 | 6946 | 0161 |
| 0001336220 | 694C | 0162 | 6954 | 0163 | 695E | 0165 | 6968 | 0166 |

THU MAR 14 17:25:16 1991 CRV_IPS.DLL PAGE 346, LINE 20356

| | | | | | | | | |
|---|---|---|---|---|---|---|---|---|
| 0001336240 | 6975 | 0168 | 6982 | 0169 | 6988 | 016A | 698B | 016B |
| 0001336260 | 6993 | 016D | 699B | 016F | 69AD | 0170 | 69D9 | 0171 |
| 0001336300 | 6A05 | 0172 | 6A10 | 0173 | 6A1B | 0174 | 6A25 | 0176 |
| 0001336320 | 6A2F | 0178 | 6A32 | 0179 | 6A3C | 017A | 6A46 | 017B |
| 0001336340 | 6A74 | 017C | 6AA2 | 017D | 6AAE | 017E | 6AC1 | 017F |
| 0001336360 | 6AC7 | 0180 | 6AD6 | 0183 | 6ADC | 0184 | 6AE6 | 0186 |
| 0001336400 | 6AEE | 0187 | 6B01 | 0188 | 6B07 | 0189 | 6B0D | 01A0 |
| 0001336420 | 6B18 | 01A3 | 6B28 | 01A6 | 6B35 | 01A7 | 6B54 | 01A9 |
| 0001336440 | 6B5A | 01AA | 6B6F | 01AB | 6B86 | 01AC | 6B8F | 01AD |
| 0001336460 | 6B95 | 01AE | 6BAF | 01AF | 6BC9 | 01B2 | 6BD7 | 01B3 |
| 0001336500 | 6BE2 | 01B4 | 6BE9 | 01B5 | 6BF9 | 01B7 | 6C09 | 01B8 |
| 0001336520 | 6C14 | 01B9 | 6C34 | 01BA | 6C3A | 01CF | 6C45 | 01D2 |
| 0001336540 | 6C55 | 01D3 | 6C74 | 01D4 | 6C7A | 01D5 | 6C92 | 01D6 |
| 0001336560 | 6CA6 | 01D7 | 6CE8 | 01D8 | 6D02 | 01D9 | 6D10 | 01DA |
| 0001336600 | 6D16 | 01EE | 6D21 | 01EF | 6D31 | 01F0 | 6D3E | 01F1 |
| 0001336620 | 6D4A | 01F2 | 6D56 | 01F4 | 6D5C | 01F5 | 6D5F | 01F6 |
| 0001336640 | 6D65 | 0202 | 6D70 | 0205 | 6D80 | 0206 | 6D94 | 0207 |
| 0001336660 | 6D9E | 0209 | 6DA1 | 020B | 6DB9 | 020F | 6DCC | 0210 |
| 0001336700 | 6DE0 | 0211 | 6DEA | 0213 | 6DED | 0215 | 6E05 | 0216 |
| 0001336720 | 6E18 | 0229 | 6E23 | 022A | 6E33 | 022B | 6E3C | 022C |
| 0001336740 | 6E42 | 023D | 6E4D | 023E | 6E5D | 023F | 6E66 | 0240 |
| 0001336760 | 6E6C | 6908 | 6470 | 6669 | 2E63 | 0363 | D500 | 5A01 |
| 0001337000 | 1400 | 65CC | 2400 | 66CC | 4900 | 78CC | 5400 | 79CC |
| 0001337020 | 6400 | 7ACC | 7500 | 8DCC | 8000 | 8ECC | 9000 | 8FCC |
| 0001337040 | 9C00 | A2CC | A700 | A6CC | B700 | A7CC | C800 | A8CC |
| 0001337060 | D100 | A9CC | D700 | AACC | E800 | ABCC | F100 | ACCC |
| 0001337100 | F700 | ADCC | 0800 | AECD | 1100 | AFCD | 1700 | B0CD |
| 0001337120 | 2900 | B2CD | 3800 | B3CD | 3E00 | C4CD | 4900 | CFCD |
| 0001337140 | 5900 | D4CD | 7000 | D5CD | 8F00 | DACD | 9E00 | DDCD |
| 0001337160 | BD00 | DECD | C300 | F1CD | CE00 | F7CD | DE00 | F8CD |
| 0001337200 | FD00 | 0BCD | 0801 | 13CE | 1801 | 15CE | 3801 | 16CE |
| 0001337220 | 4F01 | 18CE | 6101 | 19CE | 6701 | 2CCE | 7201 | 32CE |
| 0001337240 | 8201 | 33CE | A201 | 48CE | AD01 | 50CE | BD01 | 51CE |
| 0001337260 | E001 | 65CE | EB01 | 6DCE | FB01 | 6ECE | 1E01 | 86CF |
| 0001337300 | 2901 | 8FCF | 3901 | 90CF | 5801 | 91CF | 6101 | 99CF |
| 0001337320 | 6701 | 9ACF | 8A01 | B2CF | 9501 | BBCF | A501 | BCCF |
| 0001337340 | C401 | BDCF | CD01 | C5CF | D301 | C6CF | F601 | DFCF |
| 0001337360 | 0101 | E7D0 | 1101 | E8D0 | 2901 | E9D0 | 3501 | EBD0 |
| 0001337400 | 4701 | EFD0 | 6201 | F0D0 | 6B01 | F1D0 | 8501 | F6D0 |
| 0001337420 | 8B01 | F9D0 | C801 | FAD0 | DA01 | FBD0 | E001 | FCD0 |
| 0001337440 | F201 | 00D0 | F802 | 01D0 | 1702 | 02D1 | 2002 | 05D1 |
| 0001337460 | 2602 | 07D1 | 3C02 | 08D1 | 5B02 | 09D1 | 6402 | 0BD1 |
| 0001337500 | 6A02 | 0DD1 | 7002 | 0FD1 | 7D02 | 10D1 | 9C02 | 11D1 |
| 0001337520 | A502 | 12D1 | AB02 | 13D1 | AE02 | 14D1 | B402 | 2DD1 |
| 0001337540 | BF02 | 35D1 | CF02 | 36D1 | E702 | 37D1 | F302 | 39D1 |
| 0001337560 | 0502 | 3DD2 | 2002 | 3ED2 | 2902 | 3FD2 | 4302 | 44D2 |
| 0001337600 | 4902 | 47D2 | 8602 | 48D2 | 9802 | 49D2 | 9E02 | 4AD2 |
| 0001337620 | B002 | 4ED2 | B602 | 4FD2 | D502 | 50D2 | DE02 | 53D2 |
| 0001337640 | E402 | 55D2 | FA02 | 56D2 | 1902 | 57D3 | 2202 | 59D3 |
| 0001337660 | 2802 | 5BD3 | 2E02 | 5DD3 | 3B02 | 5ED3 | 5A02 | 5FD3 |
| 0001337700 | 6302 | 60D3 | 6902 | 61D3 | 6C02 | 62D3 | 7202 | 7AD3 |
| 0001337720 | 7D02 | 85D3 | 8D02 | 86D3 | AC02 | 87D3 | B502 | 8AD3 |
| 0001337740 | BB02 | 8BD3 | D602 | 8DD3 | DC02 | 8ED3 | 0B02 | 8FD4 |
| 0001337760 | 2302 | 90D4 | 2802 | 91D4 | 2B02 | 97D4 | 3402 | 98D4 |
| 0001340000 | 5302 | 99D4 | 5C02 | 9BD4 | 6202 | 9CD4 | 7502 | 9DD4 |
| 0001340020 | 7802 | 9ED4 | 7E02 | B6D4 | 8902 | C1D4 | 9902 | C2D4 |
| 0001340040 | B802 | C3D4 | C102 | C6D4 | C702 | C7D4 | E202 | C9D4 |
| 0001340060 | E802 | CAD4 | 1702 | CBD5 | 2F02 | CCD5 | 3402 | CDD5 |
| 0001340100 | 3702 | D3D5 | 4002 | D4D5 | 5F02 | D5D5 | 6802 | D7D5 |

THU MAR 14 17:25:16 1991 CRV_IPS.DLL PAGE 347, LINE 20415

| | | | | | | | | |
|---|---|---|---|---|---|---|---|---|
| 0001340120 | 6E02 | D8D5 | 8102 | D9D5 | 8402 | DAD5 | 8A02 | F5D5 |
| 0001340140 | 9502 | FED5 | A502 | FFD5 | BD02 | 01D5 | CF03 | 05D5 |
| 0001340160 | EA03 | 06D5 | F603 | 07D5 | 1303 | 0AD6 | 1903 | 0ED6 |
| 0001340200 | 2503 | 11D6 | 6203 | 12D6 | 6B03 | 13D6 | 7103 | 14D6 |
| 0001340220 | 8303 | 15D6 | 8903 | 16D6 | 9B03 | 1AD6 | A103 | 1BD6 |
| 0001340240 | C003 | 1CD6 | C903 | 1ED6 | CF03 | 1FD6 | DB03 | 20D6 |
| 0001340260 | F603 | 23D6 | FB03 | 25D6 | 1103 | 26D7 | 2803 | 27D7 |
| 0001340300 | 3203 | 28D7 | 3503 | 29D7 | 4103 | 2AD7 | 5D03 | 2BD7 |
| 0001340320 | 7903 | 2CD7 | 8203 | 2ED7 | 9803 | 2FD7 | B703 | 30D7 |
| 0001340340 | C003 | 31D7 | C603 | 33D7 | DB03 | 35D7 | E803 | 36D7 |
| 0001340360 | 0703 | 37D8 | 1003 | 38D8 | 1603 | 39D8 | 1903 | 3BD8 |
| 0001340400 | 2203 | 3CD8 | 4403 | 3DD8 | 4D03 | 3ED8 | 5303 | 3FD8 |
| 0001340420 | 6903 | 40D8 | 8B03 | 41D8 | 9403 | 42D8 | 9A03 | 44D8 |
| 0001340440 | B003 | 46D8 | BD03 | 47D8 | DC03 | 48D8 | E503 | 4AD8 |
| 0001340460 | EB03 | 4BD8 | F303 | 4CD8 | F603 | 4DD8 | FC03 | 68D8 |
| 0001340500 | 0703 | 71D9 | 1703 | 72D9 | 2F03 | 73D9 | 3B03 | 75D9 |
| 0001340520 | 4D03 | 79D9 | 6803 | 7AD9 | 7403 | 7BD9 | 9103 | 80D9 |
| 0001340540 | 9703 | 83D9 | D403 | 84D9 | DD03 | 85D9 | E303 | 86D9 |
| 0001340560 | F503 | 87D9 | FB03 | 88D9 | 0D03 | 8CDA | 1303 | 8DDA |
| 0001340600 | 3203 | 8EDA | 3B03 | 90DA | 4103 | 91DA | 4D03 | 92DA |
| 0001340620 | 6803 | 95DA | 6D03 | 97DA | 8303 | 98DA | 9A03 | 99DA |
| 0001340640 | A403 | 9ADA | A703 | 9BDA | B303 | 9CDA | CF03 | 9DDA |
| 0001340660 | EB03 | 9EDA | F403 | A0DA | 0A03 | A1DB | 2903 | A2DB |
| 0001340700 | 3203 | A3DB | 3803 | A5DB | 4D03 | A7DB | 5A03 | A8DB |
| 0001340720 | 7903 | A9DB | 8203 | AADB | 8803 | ABDB | 8B03 | ADDB |
| 0001340740 | 9403 | AEDB | B603 | AFDB | BF03 | B0DB | C503 | B1DB |
| 0001340760 | DB03 | B2DB | FD03 | B3DB | 0603 | B4DC | 0C03 | B6DC |
| 0001341000 | 2203 | B8DC | 2F03 | B9DC | 4E03 | BADC | 5703 | BCDC |
| 0001341020 | 5D03 | BDDC | 6503 | BEDC | 6803 | BFDC | 6E03 | D3DC |
| 0001341040 | 7903 | D6DC | 8903 | D8DC | 9C03 | D9DC | AD03 | DADC |
| 0001341060 | B603 | DDDC | BC03 | DEDC | DA03 | E0DC | E003 | E3DC |
| 0001341100 | E903 | E4DC | 0C03 | E5DD | 1C03 | E7DD | 2203 | E8DD |
| 0001341120 | 3303 | E9DD | 3C03 | EADD | 4203 | EBDD | 4503 | ECDD |
| 0001341140 | 4B03 | 00DD | 5604 | 09DD | 6604 | 0ADD | 6F04 | 0BDD |
| 0001341160 | 7504 | 10DD | 7F04 | 11DD | A404 | 13DD | A904 | 14DD |
| 0001341200 | BA04 | 15DD | C404 | 16DD | C904 | 19DD | D504 | 1EDD |
| 0001341220 | DE04 | 1FDD | EF04 | 20DD | F904 | 21DD | FE04 | 22DD |
| 0001341240 | 0804 | 23DE | 1504 | 24DE | 1A04 | 25DE | 2904 | 26DE |
| 0001341260 | 3304 | 27DE | 3804 | 28DE | 4204 | 29DE | 4B04 | 2ADE |
| 0001341300 | 4E04 | 2BDE | 5704 | 2CDE | 6104 | 2DDE | 6604 | 2FDE |
| 0001341320 | 6904 | 30DE | 8104 | 32DE | 9B04 | 33DE | B504 | 34DE |
| 0001341340 | CE04 | 35DE | DF04 | 36DE | E904 | 37DE | EE04 | 38DE |
| 0001341360 | F304 | 39DE | FF04 | 3ADE | 0E04 | 3BDF | 1804 | 3CDF |
| 0001341400 | 1D04 | 3EDF | 2004 | 3FDF | 2604 | 40DF | 2F04 | 42DF |
| 0001341420 | 3204 | 43DF | 4304 | 44DF | 4D04 | 45DF | 5204 | 46DF |
| 0001341440 | 5604 | 47DF | 5A04 | 48DF | 6904 | 49DF | 7304 | 4ADF |
| 0001341460 | 7804 | 4BDF | 8104 | 4CDF | 8404 | 4DDF | BA04 | 4EDF |
| 0001341500 | BD04 | 4FDF | CD04 | 50DF | D204 | 68DF | DD04 | 6FDF |
| 0001341520 | ED04 | 70DF | FF04 | 75DF | 0504 | 76E0 | 2104 | 77E0 |
| 0001341540 | 2A04 | 7AE0 | 3004 | 7DE0 | 3904 | 7EE0 | 4F04 | 7FE0 |
| 0001341560 | 5804 | 82E0 | 5E04 | 83E0 | 6E04 | 84E0 | 7704 | 85E0 |
| 0001341600 | 7D04 | 86E0 | 8904 | 87E0 | 8D04 | 88E0 | 9B04 | 89E0 |
| 0001341620 | A404 | 8CE0 | AA04 | 8DE0 | BB04 | 8EE0 | C404 | 93E0 |
| 0001341640 | CA04 | 94E0 | E604 | 95E0 | EF04 | 9AE0 | F504 | 9BE0 |
| 0001341660 | 0C04 | 9CE1 | 1504 | 9EE1 | 1B04 | 9FE1 | 2104 | B5E1 |
| 0001341700 | 2C04 | BAE1 | 3C04 | BBE1 | 4504 | C0E1 | 4B04 | C1E1 |
| 0001341720 | 6604 | C2E1 | 6F04 | C5E1 | 7504 | C6E1 | 8B04 | C7E1 |
| 0001341740 | 9404 | CAE1 | 9A04 | CBE1 | AA04 | CCE1 | B304 | CDE1 |
| 0001341760 | B904 | CEE1 | C504 | CFE1 | C904 | D0E1 | D704 | D1E1 |

THU MAR 14 17:25:16 1991 CRV_IPS.DLL PAGE 348, LINE 20474

| | | | | | | | | |
|---|---|---|---|---|---|---|---|---|
| 0001342000 | DD04 | E7E1 | E804 | EFE1 | F804 | F0E1 | 1404 | F1E2 |
| 0001342020 | 1D04 | F6E2 | 2304 | F7E2 | 3904 | F8E2 | 4204 | FBE2 |
| 0001342040 | 4804 | FCE2 | 5804 | FDE2 | 6104 | FEE2 | 6704 | FFE2 |
| 0001342060 | 7304 | 00E2 | 8105 | 01E2 | 8A05 | 03E2 | 9005 | 04E2 |
| 0001342100 | 9605 | 16E2 | A105 | 1AE2 | B105 | 1BE2 | C105 | 1CE2 |
| 0001342120 | CA05 | 1DE2 | D005 | 1EE2 | D505 | 1FE2 | DA05 | 23E2 |
| 0001342140 | E805 | 24E2 | 0005 | 25E3 | 0505 | 26E3 | 1D05 | 27E3 |
| 0001342160 | 2305 | 39E3 | 2E05 | 3FE3 | 3E05 | 40E3 | 5605 | 41E3 |
| 0001342200 | 5B05 | 43E3 | 7305 | 44E3 | 8305 | 45E3 | 8C05 | 46E3 |
| 0001342220 | 9205 | 47E3 | 9705 | 48E3 | 9C05 | 49E3 | AA05 | 4AE3 |
| 0001342240 | B005 | 5FE3 | BB05 | 62E3 | CB05 | 63E3 | E205 | 64E3 |
| 0001342260 | EB05 | 65E3 | F105 | 66E3 | 0805 | 67E4 | 1105 | 68E4 |
| 0001342300 | 1705 | 69E4 | 2E05 | 6AE4 | 3705 | 6BE4 | 3D05 | 6CE4 |
| 0001342320 | 5405 | 6DE4 | 5D05 | 6EE4 | 6305 | 6FE4 | 7A05 | 70E4 |
| 0001342340 | 8305 | 71E4 | 8905 | 72E4 | A005 | 73E4 | A905 | 74E4 |
| 0001342360 | AF05 | 75E4 | C605 | 76E4 | CF05 | 77E4 | D505 | 78E4 |
| 0001342400 | EC05 | 79E4 | F505 | 7AE4 | FB05 | 7BE4 | 1305 | 7CE5 |
| 0001342420 | 1C05 | 7DE5 | 2205 | 7EE5 | 3A05 | 7FE5 | 4305 | 80E5 |
| 0001342440 | 4905 | 81E5 | 6105 | 82E5 | 6A05 | 83E5 | 7005 | 84E5 |
| 0001342460 | 8805 | 85E5 | 9105 | 86E5 | 9705 | 87E5 | AF05 | 88E5 |
| 0001342500 | B805 | 89E5 | BE05 | 8BE5 | C405 | 8EE5 | CF05 | 8FE5 |
| 0001342520 | DF05 | 08E5 | 7069 | 6C64 | 7264 | 632E | 0003 | 0089 |
| 0001342540 | 0079 | E5EA | 0080 | E5FA | 0081 | E605 | 0082 | E60A |
| 0001342560 | 0083 | E61F | 0084 | E624 | 0085 | E639 | 0086 | E63E |
| 0001342600 | 0089 | E643 | 008C | E656 | 008D | E66B | 008E | E674 |
| 0001342620 | 0091 | E67A | 0092 | E686 | 0093 | E696 | 0094 | E69F |
| 0001342640 | 0095 | E6A5 | 0098 | E6AA | 009A | E6B4 | 009D | E6B7 |
| 0001342660 | 009F | E6C9 | 00A0 | E6CE | 00A2 | E6DF | 00A3 | E6E2 |
| 0001342700 | 00A4 | E6E8 | 00AE | E6F3 | 00B1 | E703 | 00B2 | E710 |
| 0001342720 | 00B3 | E715 | 00B4 | E71A | 00B5 | E725 | 00BE | E730 |
| 0001342740 | 00C2 | E740 | 00C3 | E74D | 00C4 | E752 | 00C5 | E75A |
| 0001342760 | 00C6 | E765 | 00CF | E770 | 00D2 | E780 | 00D3 | E785 |
| 0001343000 | 00D4 | E799 | 00DA | E7A4 | 00DD | E7B4 | 00DE | E7C8 |
| 0001343020 | 00DF | E7D5 | 00E0 | E7DA | 00E1 | E7E2 | 00E2 | E7E7 |
| 0001343040 | 00E3 | E7EC | 00E4 | E7F7 | 00EA | E802 | 00EB | E812 |
| 0001343060 | 00EC | E824 | 00F3 | E82F | 012F | E83F | 0130 | E857 |
| 0001343100 | 0133 | E862 | 0134 | E867 | 0135 | E881 | 0136 | E890 |
| 0001343120 | 0139 | E895 | 013B | E8A1 | 013C | E8AB | 013D | E8B6 |
| 0001343140 | 013E | E8C1 | 013F | E8CC | 0142 | E8D7 | 0143 | E8EF |
| 0001343160 | 0146 | E8FA | 0147 | E905 | 0148 | E910 | 0151 | E91B |
| 0001343200 | 0156 | E933 | 0158 | E93E | 0159 | E94A | 015B | E950 |
| 0001343220 | 015E | E953 | 015F | E968 | 0160 | E971 | 0161 | E986 |
| 0001343240 | 0162 | E98F | 0163 | E998 | 0165 | E99D | 0167 | E9BE |
| 0001343260 | 0168 | E9CA | 016B | E9CD | 016D | E9D7 | 016E | E9E3 |
| 0001343300 | 0171 | E9E6 | 0172 | E9F1 | 0174 | E9FC | 0175 | EA04 |
| 0001343320 | 0177 | EA10 | 0179 | EA13 | 017A | EA1C | 017C | EA1F |
| 0001343340 | 017D | EA40 | 017E | EA43 | 0181 | EA4F | 0182 | EA57 |
| 0001343360 | 0183 | EA5C | 0184 | EA6F | 0186 | EA74 | 0187 | EA86 |
| 0001343400 | 0189 | EA8F | 018B | EA92 | 018C | EAAE | 018E | EAB1 |
| 0001343420 | 018F | EAD8 | 0191 | EADB | 0192 | EB00 | 0194 | EB03 |
| 0001343440 | 0195 | EB14 | 0196 | EB20 | 019A | EB23 | 019E | EB3A |
| 0001343460 | 019F | EB50 | 01A0 | EB64 | 01A2 | EB75 | 01A8 | EB89 |
| 0001343500 | 01A9 | EBC0 | 01AC | EBD5 | 01AD | EBF6 | 01AE | EBF9 |
| 0001343520 | 01B3 | EBFC | 01BD | EC0D | 01BF | EC10 | 01C0 | EC18 |
| 0001343540 | 01C1 | EC1B | 01C3 | EC1E | 01C4 | EC2C | 01C5 | EC41 |
| 0001343560 | 01C6 | EC4F | 01CA | EC55 | 01CB | EC63 | 01CC | EC78 |
| 0001343600 | 01CD | EC7E | 0C00 | 6C6C | 6269 | 6463 | 6C6C | 6C2E |
| 0001343620 | 6269 | 6F07 | 3273 | 6C2E | 6269 | 6C0A | 6962 | 6D70 |
| 0001343640 | 2E74 | 696C | 0A62 | 7069 | 6964 | 6366 | 6C2E | 6269 |

THU MAR 14 17:25:16 1991 CRV_IPS.DLL PAGE 349, LINE 20533

| | | | | | | | | |
|---|---|---|---|---|---|---|---|---|
| 0001343660 | 630B | 7672 | 6F5F | 736E | 6C2E | 6269 | 630B | 7672 |
| 0001343700 | 735F | 6974 | 6C2E | 6269 | 6409 | 5F62 | 6970 | 6C2E |
| 0001343720 | 6269 | 0124 | 0101 | 0001 | 0008 | 0000 | 001F | 0102 |
| 0001343740 | 0001 | 0C52 | 0000 | 00F5 | 0103 | 0001 | 391C | 0000 |
| 0001343760 | 2709 | 0104 | 0001 | FE30 | 0001 | 0ACC | 0109 | 0001 |
| 0001344000 | 89F3 | 0002 | 0AB2 | 0101 | 0002 | 0027 | 0000 | 001F |
| 0001344020 | 0102 | 0002 | 0D47 | 0000 | 0175 | 0103 | 0002 | 6025 |
| 0001344040 | 0000 | 2682 | 0104 | 0002 | 08FC | 0002 | 06BB | 0109 |
| 0001344060 | 0002 | 94A5 | 0002 | 0392 | 0101 | 0003 | 0046 | 0000 |
| 0001344100 | 0020 | 0102 | 0003 | 0EBC | 0000 | 0089 | 0103 | 0003 |
| 0001344120 | 86A7 | 0000 | 286B | 0104 | 0003 | 0FB7 | 0002 | 0FA7 |
| 0001344140 | 0109 | 0003 | 9837 | 0002 | 09A7 | 0101 | 0004 | 0066 |
| 0001344160 | 0000 | 001F | 0102 | 0004 | 0F45 | 0000 | 0118 | 0103 |
| 0001344200 | 0004 | AF12 | 0000 | 19AE | 0104 | 0004 | 1F5E | 0002 |
| 0001344220 | 055F | 0109 | 0004 | A1DE | 0002 | 0552 | 0101 | 0005 |
| 0001344240 | 0085 | 0000 | 001F | 0102 | 0005 | 105D | 0000 | 0104 |
| 0001344260 | 0103 | 0005 | C8C0 | 0000 | 2975 | 0104 | 0005 | 24BD |
| 0001344300 | 0002 | 0FFA | 0109 | 0005 | A730 | 0002 | 0E72 | 0101 |
| 0001344320 | 0006 | 00A4 | 0000 | 001F | 0102 | 0006 | 1161 | 0000 |
| 0001344340 | 0119 | 0103 | 0006 | F235 | 0000 | 25B9 | 0104 | 0006 |
| 0001344360 | 34B7 | 0002 | 04CA | 0109 | 0006 | B5A2 | 0002 | 01CE |
| 0001344400 | 0101 | 0007 | 00C3 | 0000 | 001F | 0102 | 0007 | 127A |
| 0001344420 | 0000 | 01B2 | 0103 | 0007 | 17EE | 0001 | 2E8F | 0104 |
| 0001344440 | 0007 | 3981 | 0002 | 191F | 0109 | 0007 | B770 | 0002 |
| 0001344460 | 0DC6 | 0101 | 0008 | 00E2 | 0000 | 001F | 0102 | 0008 |
| 0001344500 | 142C | 0000 | 0036 | 0103 | 0008 | 467D | 0001 | 269E |
| 0001344520 | 0104 | 0008 | 52A0 | 0002 | 1754 | 0109 | 0008 | C536 |
| 0001344540 | 0002 | 0B9E | 0101 | 0009 | 0101 | 0000 | 0020 | 0102 |
| 0001344560 | 0009 | 1462 | 0000 | 0074 | 0103 | 0009 | 6D1B | 0001 |
| 0001344600 | 2621 | 0104 | 0009 | 69F4 | 0002 | 091F | 0109 | 0009 |
| 0001344620 | D0D4 | 0002 | 069B | 0101 | 000A | 0121 | 0000 | 0020 |
| 0001344640 | 0102 | 000A | 14D6 | 0000 | 0282 | 0103 | 000A | 933C |
| 0001344660 | 0001 | 26F7 | 0104 | 000A | 7313 | 0002 | 0562 | 0109 |
| 0001344700 | 000A | D76F | 0002 | 021F | 0101 | 000B | 0141 | 0000 |
| 0001344720 | 001E | 0102 | 000B | 1758 | 0000 | 00D4 | 0103 | 000B |
| 0001344740 | BA33 | 0001 | 26E1 | 0104 | 000B | 7875 | 0002 | 03F9 |
| 0001344760 | 0109 | 000B | D98E | 0002 | 02BD | 0101 | 000C | 015F |
| 0001345000 | 0000 | 0018 | 0102 | 000C | 182C | 0000 | 0152 | 0101 |
| 0001345020 | 000D | 0177 | 0000 | 001B | 0102 | 000D | 197E | 0000 |
| 0001345040 | 01D2 | 0101 | 000E | 0192 | 0000 | 001C | 0102 | 000E |
| 0001345060 | 1B50 | 0000 | 0035 | 0101 | 000F | 01AE | 0000 | 0017 |
| 0001345100 | 0102 | 000F | 1B85 | 0000 | 000F | 0101 | 0010 | 01C5 |
| 0001345120 | 0000 | 0017 | 0102 | 0010 | 1B94 | 0000 | 0033 | 0101 |
| 0001345140 | 0011 | 01DC | 0000 | 001A | 0102 | 0011 | 1BC7 | 0000 |
| 0001345160 | 0010 | 0101 | 0012 | 01F6 | 0000 | 001C | 0102 | 0012 |
| 0001345200 | 1BD7 | 0000 | 0025 | 0101 | 0013 | 0212 | 0000 | 001B |
| 0001345220 | 0102 | 0013 | 1BFC | 0000 | 003F | 0101 | 0014 | 022D |
| 0001345240 | 0000 | 0015 | 0102 | 0014 | 1C3B | 0000 | 0020 | 0101 |
| 0001345260 | 0015 | 0242 | 0000 | 0014 | 0102 | 0015 | 1C5B | 0000 |
| 0001345300 | 001C | 0101 | 0016 | 0256 | 0000 | 0016 | 0102 | 0016 |
| 0001345320 | 1C77 | 0000 | 000F | 0101 | 0017 | 026C | 0000 | 0015 |
| 0001345340 | 0102 | 0017 | 1C86 | 0000 | 000E | 0101 | 0018 | 0281 |
| 0001345360 | 0000 | 0015 | 0102 | 0018 | 1C94 | 0000 | 000E | 0101 |
| 0001345400 | 0019 | 0296 | 0000 | 0018 | 0102 | 0019 | 1CA2 | 0000 |
| 0001345420 | 000F | 0101 | 001A | 02AE | 0000 | 0014 | 0102 | 001A |
| 0001345440 | 1CB1 | 0000 | 0037 | 0101 | 001B | 02C2 | 0000 | 0018 |
| 0001345460 | 0102 | 001B | 1CE8 | 0000 | 000F | 0101 | 001C | 02DA |
| 0001345500 | 0000 | 0018 | 0102 | 001C | 1CF7 | 0000 | 000F | 0101 |
| 0001345520 | 001D | 02F2 | 0000 | 0019 | 0102 | 001D | 1D06 | 0000 |

THU MAR 14 17:25:16 1991 CRV_IPS.DLL PAGE 350, LINE 20592

| | | | | | | | | |
|---|---|---|---|---|---|---|---|---|
| 0001345540 | 0010 | 0101 | 001E | 030B | 0000 | 0018 | 0102 | 001E |
| 0001345560 | 1D16 | 0000 | 000F | 0101 | 001F | 0323 | 0000 | 0014 |
| 0001345600 | 0102 | 001F | 1D25 | 0000 | 0011 | 0101 | 0020 | 0337 |
| 0001345620 | 0000 | 0018 | 0102 | 0020 | 1D36 | 0000 | 001C | 0101 |
| 0001345640 | 0021 | 034F | 0000 | 0015 | 0102 | 0021 | 1D52 | 0000 |
| 0001345660 | 0030 | 0101 | 0022 | 0364 | 0000 | 0014 | 0102 | 0022 |
| 0001345700 | 1D82 | 0000 | 000E | 0101 | 0023 | 0378 | 0000 | 0017 |
| 0001345720 | 0102 | 0023 | 1D90 | 0000 | 000F | 0101 | 0024 | 038F |
| 0001345740 | 0000 | 0015 | 0102 | 0024 | 1D9F | 0000 | 0012 | 0101 |
| 0001345760 | 0025 | 03A4 | 0000 | 0015 | 0102 | 0025 | 1DB1 | 0000 |
| 0001346000 | 0020 | 0101 | 0026 | 03B9 | 0000 | 001A | 0102 | 0026 |
| 0001346020 | 1DD1 | 0000 | 000D | 0101 | 0027 | 03D3 | 0000 | 001A |
| 0001346040 | 0102 | 0027 | 1DDE | 0000 | 001E | 0101 | 0028 | 03ED |
| 0001346060 | 0000 | 0019 | 0102 | 0028 | 1DFC | 0000 | 0031 | 0101 |
| 0001346100 | 0029 | 0406 | 0000 | 0019 | 0102 | 0029 | 1E2D | 0000 |
| 0001346120 | 000C | 0101 | 002A | 041F | 0000 | 0016 | 0102 | 002A |
| 0001346140 | 1E39 | 0000 | 001E | 0101 | 002B | 0435 | 0000 | 0018 |
| 0001346160 | 0102 | 002B | 1E57 | 0000 | 001D | 0101 | 002C | 044D |
| 0001346200 | 0000 | 0017 | 0102 | 002C | 1E74 | 0000 | 001F | 0101 |
| 0001346220 | 002D | 0464 | 0000 | 0015 | 0102 | 002D | 1E93 | 0000 |
| 0001346240 | 001B | 0101 | 002E | 0479 | 0000 | 0018 | 0102 | 002E |
| 0001346260 | 1EAE | 0000 | 0042 | 0101 | 002F | 0491 | 0000 | 0016 |
| 0001346300 | 0102 | 002F | 1EF0 | 0000 | 000E | 0101 | 0030 | 04A7 |
| 0001346320 | 0000 | 0018 | 0102 | 0030 | 1EFE | 0000 | 0010 | 0101 |
| 0001346340 | 0031 | 04BF | 0000 | 0018 | 0102 | 0031 | 1F0E | 0000 |
| 0001346360 | 0010 | 0101 | 0032 | 04D7 | 0000 | 0019 | 0102 | 0032 |
| 0001346400 | 1F1E | 0000 | 0012 | 0101 | 0033 | 04F0 | 0000 | 0018 |
| 0001346420 | 0102 | 0033 | 1F30 | 0000 | 0041 | 0101 | 0034 | 0508 |
| 0001346440 | 0000 | 0017 | 0102 | 0034 | 1F71 | 0000 | 000F | 0101 |
| 0001346460 | 0035 | 051F | 0000 | 0017 | 0102 | 0035 | 1F80 | 0000 |
| 0001346500 | 000E | 0101 | 0036 | 0536 | 0000 | 0017 | 0102 | 0036 |
| 0001346520 | 1F8E | 0000 | 000E | 0101 | 0037 | 054D | 0000 | 0017 |
| 0001346540 | 0102 | 0037 | 1F9C | 0000 | 000E | 0101 | 0038 | 0564 |
| 0001346560 | 0000 | 0017 | 0102 | 0038 | 1FAA | 0000 | 000E | 0101 |
| 0001346600 | 0039 | 057B | 0000 | 0018 | 0102 | 0039 | 1FB8 | 0000 |
| 0001346620 | 000F | 0101 | 003A | 0593 | 0000 | 0018 | 0102 | 003A |
| 0001346640 | 1FC7 | 0000 | 000F | 0101 | 003B | 05AB | 0000 | 0015 |
| 0001346660 | 0102 | 003B | 1FD6 | 0000 | 000C | 0101 | 003C | 05C0 |
| 0001346700 | 0000 | 0015 | 0102 | 003C | 1FE2 | 0000 | 000C | 0101 |
| 0001346720 | 003D | 05D5 | 0000 | 0013 | 0102 | 003D | 1FEE | 0000 |
| 0001346740 | 000B | 0101 | 003E | 05E8 | 0000 | 0015 | 0102 | 003E |
| 0001346760 | 1FF9 | 0000 | 000E | 0101 | 003F | 05FD | 0000 | 0015 |
| 0001347000 | 0102 | 003F | 2007 | 0000 | 000C | 0101 | 0040 | 0612 |
| 0001347020 | 0000 | 0017 | 0102 | 0040 | 2013 | 0000 | 0010 | 0101 |
| 0001347040 | 0041 | 0629 | 0000 | 0019 | 0102 | 0041 | 2023 | 0000 |
| 0001347060 | 0056 | 0101 | 0042 | 0642 | 0000 | 0016 | 0102 | 0042 |
| 0001347100 | 2079 | 0000 | 001D | 0101 | 0043 | 0658 | 0000 | 0015 |
| 0001347120 | 0102 | 0043 | 2096 | 0000 | 000E | 0101 | 0044 | 066D |
| 0001347140 | 0000 | 001A | 0102 | 0044 | 20A4 | 0000 | 000D | 0101 |
| 0001347160 | 0045 | 0687 | 0000 | 001A | 0102 | 0045 | 20B1 | 0000 |
| 0001347200 | 003B | 0101 | 0046 | 06A1 | 0000 | 001A | 0102 | 0046 |
| 0001347220 | 20EC | 0000 | 0011 | 0101 | 0049 | 06BB | 0000 | 001A |
| 0001347240 | 0102 | 0049 | 20FD | 0000 | 00AB | 0101 | 004A | 06D5 |
| 0001347260 | 0000 | 001D | 0102 | 004A | 21A8 | 0000 | 0024 | 0101 |
| 0001347300 | 004B | 06F2 | 0000 | 0016 | 0102 | 004B | 21CC | 0000 |
| 0001347320 | 000D | 0101 | 004C | 0708 | 0000 | 0016 | 0102 | 004C |
| 0001347340 | 21D9 | 0000 | 000F | 0101 | 004D | 071E | 0000 | 0019 |
| 0001347360 | 0102 | 004D | 21E8 | 0000 | 0025 | 0101 | 004E | 0737 |
| 0001347400 | 0000 | 0018 | 0102 | 004E | 220D | 0000 | 0021 | 0101 |

THU MAR 14 17:25:16 1991 CRV_IPS.DLL PAGE 351, LINE 20651

| | | | | | | | | | |
|---|---|---|---|---|---|---|---|---|---|
| 0001347420 | 004F | 074F | 0000 | 0017 | 0102 | 004F | 222E | 0000 |
| 0001347440 | 000F | 0101 | 0050 | 0766 | 0000 | 0017 | 0102 | 0050 |
| 0001347460 | 223D | 0000 | 000E | 0101 | 0051 | 077D | 0000 | 0018 |
| 0001347500 | 0102 | 0051 | 224B | 0000 | 0010 | 0101 | 0052 | 0795 |
| 0001347520 | 0000 | 001A | 0102 | 0052 | 225B | 0000 | 001E | 0101 |
| 0001347540 | 0053 | 07AF | 0000 | 0013 | 0102 | 0053 | 2279 | 0000 |
| 0001347560 | 001C | 0101 | 0054 | 07C2 | 0000 | 0018 | 0102 | 0054 |
| 0001347600 | 2295 | 0000 | 000D | 0101 | 0055 | 07DA | 0000 | 0014 |
| 0001347620 | 0102 | 0055 | 22A2 | 0000 | 002C | 0101 | 0056 | 07EE |
| 0001347640 | 0000 | 0016 | 0102 | 0056 | 22CE | 0000 | 004E | 0101 |
| 0001347660 | 0057 | 0804 | 0000 | 0017 | 0102 | 0057 | 231C | 0000 |
| 0001347700 | 0011 | 0101 | 0058 | 081B | 0000 | 0019 | 0102 | 0058 |
| 0001347720 | 232D | 0000 | 000F | 0101 | 0059 | 0834 | 0000 | 0014 |
| 0001347740 | 0102 | 0059 | 233C | 0000 | 001E | 0101 | 005A | 0848 |
| 0001347760 | 0000 | 0018 | 0102 | 005A | 235A | 0000 | 000F | 0101 |
| 0001350000 | 005B | 0860 | 0000 | 0017 | 0102 | 005B | 2369 | 0000 |
| 0001350020 | 000E | 0101 | 005C | 0877 | 0000 | 0018 | 0102 | 005C |
| 0001350040 | 2377 | 0000 | 000F | 0101 | 005D | 088F | 0000 | 0018 |
| 0001350060 | 0102 | 005D | 2386 | 0000 | 000E | 0101 | 005E | 08A7 |
| 0001350100 | 0000 | 0018 | 0102 | 005E | 2394 | 0000 | 000E | 0101 |
| 0001350120 | 005F | 08BF | 0000 | 0015 | 0102 | 005F | 23A2 | 0000 |
| 0001350140 | 001F | 0101 | 0060 | 08D4 | 0000 | 0012 | 0102 | 0060 |
| 0001350160 | 23C1 | 0000 | 000B | 0101 | 0061 | 08E6 | 0000 | 001C |
| 0001350200 | 0102 | 0061 | 23CC | 0000 | 0010 | 0101 | 0062 | 0902 |
| 0001350220 | 0000 | 001B | 0102 | 0062 | 23DC | 0000 | 001C | 0101 |
| 0001350240 | 0063 | 091D | 0000 | 0016 | 0102 | 0063 | 23F8 | 0000 |
| 0001350260 | 0023 | 0101 | 0064 | 0933 | 0000 | 0016 | 0102 | 0064 |
| 0001350300 | 241B | 0000 | 0011 | 0101 | 0065 | 0949 | 0000 | 0015 |
| 0001350320 | 0102 | 0065 | 242C | 0000 | 000F | 0101 | 0066 | 095E |
| 0001350340 | 0000 | 0015 | 0102 | 0066 | 243B | 0000 | 001F | 0101 |
| 0001350360 | 0067 | 0973 | 0000 | 0015 | 0102 | 0067 | 245A | 0000 |
| 0001350400 | 000F | 0101 | 0068 | 0988 | 0000 | 0023 | 0102 | 0068 |
| 0001350420 | 2469 | 0000 | 0103 | 0101 | 0069 | 09AB | 0000 | 0023 |
| 0001350440 | 0102 | 0069 | 256C | 0000 | 027A | 0101 | 006A | 09CE |
| 0001350460 | 0000 | 0023 | 0102 | 006A | 27E6 | 0000 | 001C | 0101 |
| 0001350500 | 006B | 09F1 | 0000 | 0023 | 0102 | 006B | 2802 | 0000 |
| 0001350520 | 00C2 | 0101 | 006C | 0A14 | 0000 | 0023 | 0102 | 006C |
| 0001350540 | 28C4 | 0000 | 00C2 | 0101 | 006D | 0A37 | 0000 | 0024 |
| 0001350560 | 0102 | 006D | 2986 | 0000 | 0011 | 0101 | 006E | 0A5B |
| 0001350600 | 0000 | 0023 | 0102 | 006E | 2997 | 0000 | 003A | 0101 |
| 0001350620 | 006F | 0A7E | 0000 | 0024 | 0102 | 006F | 29D1 | 0000 |
| 0001350640 | 0020 | 0101 | 0070 | 0AA2 | 0000 | 001E | 0102 | 0070 |
| 0001350660 | 29F1 | 0000 | 0016 | 0101 | 0071 | 0AC0 | 0000 | 001F |
| 0001350700 | 0102 | 0071 | 2A07 | 0000 | 0010 | 0101 | 0072 | 0ADF |
| 0001350720 | 0000 | 001E | 0102 | 0072 | 2A17 | 0000 | 09E8 | 0101 |
| 0001350740 | 0073 | 0AFD | 0000 | 001F | 0102 | 0073 | 33FF | 0000 |
| 0001350760 | 0054 | 0101 | 0074 | 0B1C | 0000 | 001F | 0102 | 0074 |
| 0001351000 | 3453 | 0000 | 00E5 | 0101 | 0075 | 0B3B | 0000 | 001D |
| 0001351020 | 0102 | 0075 | 3538 | 0000 | 001F | 0101 | 0076 | 0B58 |
| 0001351040 | 0000 | 001E | 0102 | 0076 | 3557 | 0000 | 0010 | 0101 |
| 0001351060 | 0077 | 0B76 | 0000 | 0019 | 0102 | 0077 | 3567 | 0000 |
| 0001351100 | 007F | 0101 | 009E | 0B8F | 0000 | 0015 | 0102 | 009E |
| 0001351120 | 35E6 | 0000 | 025C | 0103 | 009E | E114 | 0001 | 1163 |
| 0001351140 | 0104 | 009E | 7C6E | 0002 | 0B13 | 0109 | 009E | DC4B |
| 0001351160 | 0002 | 0761 | 0101 | 009F | 0BA4 | 0000 | 0015 | 0102 |
| 0001351200 | 009F | 3842 | 0000 | 002B | 0103 | 009F | F277 | 0001 |
| 0001351220 | 0BB9 | 0104 | 009F | 8781 | 0002 | 0272 | 0109 | 009F |
| 0001351240 | E3AC | 0002 | 0231 | 0101 | 00C5 | 0BB9 | 0000 | 0016 |
| 0001351260 | 0102 | 00C5 | 386D | 0000 | 001E | 0101 | 00C6 | 0BCF |

THU MAR 14 17:25:16 1991 CRV_IPS.DLL PAGE 352, LINE 20710

```
0001351300  0000  001B  0102  00C6  388B  0000  0026  0101
0001351320  00C7  0BEA  0000  0014  0102  00C7  38B1  0000
0001351340  001E  0101  00C8  0BFE  0000  0016  0102  00C8
0001351360  38CF  0000  0011  0101  00C9  0C14  0000  0015
0001351400  0102  00C9  38E0  0000  000F  0101  00CA  0C29
0001351420  0000  0014  0102  00CA  38EF  0000  001E  0101
0001351440  00CB  0C3D  0000  0015  0102  00CB  390D  0000
0001351460  000F  0106  0000  E5DD  0002  004E  424E  3230
0001351500  F19D  0002
0001351504
```

THU MAR 14 17:27:10 1991 CRV_ONS.DLL PAGE 1, LINE 1

| | | | | | | | | |
|---|---|---|---|---|---|---|---|---|
| 0000000000 | 5A4D | 0007 | 003A | 0000 | 0004 | 0000 | FFFF | 0000 |
| 0000000020 | 00B6 | 0000 | 0000 | 0000 | 0040 | 0000 | 0000 | 0000 |
| 0000000040 | 0000 | 0000 | 0000 | 0000 | 0000 | 0000 | 0000 | 0000 |
| 0000000060 | 0000 | 0000 | 0000 | 0000 | 0000 | 0000 | 0080 | 0000 |
| 0000000100 | 1F0E | 0EBA | B400 | CD09 | B821 | 4C01 | 21CD | 6854 |
| 0000000120 | 7369 | 7020 | 6F72 | 7267 | 6D61 | 6320 | 6E61 | 6F6E |
| 0000000140 | 2074 | 7572 | 206E | 6E69 | 4420 | 534F | 6D20 | 646F |
| 0000000160 | 2E65 | 0D0D | 240A | 0000 | 0000 | 0000 | 0000 | 0000 |
| 0000000200 | 454E | 0A05 | 0373 | 0061 | 59E0 | 4B3B | 8006 | 0005 |
| 0000000220 | 0000 | 0000 | 315C | 0001 | 0000 | 0000 | 0005 | 0004 |
| 0000000240 | 000F | 0040 | 0068 | 0068 | 0302 | 030A | 0454 | 0000 |
| 0000000260 | 0000 | 0004 | 0000 | 0001 | 0000 | 0000 | 0000 | 0000 |
| 0000000300 | 0047 | 5BDF | 0D00 | 5BE0 | 061B | 00C6 | 0C01 | 0100 |
| 0000000320 | 0000 | 0000 | 0C01 | 0850 | 0000 | 0000 | 0C01 | 020A |
| 0000000340 | 0628 | 0F5D | 0D01 | 1260 | 6307 | 7672 | 6F5F | 736E |
| 0000000360 | 0000 | 531C | 5455 | 475F | 5445 | 495F | 504E | 5455 |
| 0000000400 | 445F | 5645 | 4349 | 534[illegible] | 535F | 4154 | 5554 | 0153 |
| 0000000420 | 1700 | 5243 | 5F56 | 455[illegible] | 5F54 | 4653 | 5F4B | 4143 |
| 0000000440 | 5450 | 5255 | 5F45 | 4C46 | 0247 | 1C00 | 5553 | 5F54 |
| 0000000460 | 4553 | 5F54 | 4E49 | 5550 | 5F54 | 4544 | 4956 | 4543 |
| 0000000500 | 5F53 | 5453 | 5441 | 5355 | 0003 | 530A | 5455 | 425F |
| 0000000520 | 5059 | 5341 | 0453 | 0E00 | 5553 | 5F54 | 4552 | 4441 |
| 0000000540 | 455F | 4556 | 544E | 0005 | 4318 | 5652 | 535F | 4F54 |
| 0000000560 | 5F50 | 4F48 | 4B54 | 5945 | 535F | 5145 | 4555 | 434E |
| 0000000600 | 0645 | 0E00 | 5553 | 5F54 | 4148 | 4452 | 525F | 5345 |
| 0000000620 | 5445 | 0007 | 530D | 5455 | 545F | 5245 | 494D | 414E |
| 0000000640 | 4554 | 0008 | 530B | 5455 | 435F | 4E4F | 454E | 5443 |
| 0000000660 | 0009 | 5309 | 5455 | 525F | 5345 | 5445 | 000A | 4317 |
| 0000000700 | 5652 | 4F5F | 4550 | 5F4E | 5553 | 5F54 | 4E49 | 5F54 |
| 0000000720 | 4854 | 4552 | 4441 | 000B | 531A | 5455 | 535F | 4E59 |
| 0000000740 | 5F43 | 4957 | 4854 | 495F | 504E | 5455 | 455F | 4556 |
| 0000000760 | 544E | 0C53 | 1700 | 5243 | 5F56 | 4E49 | 5449 | 535F |
| 0000001000 | 464F | 4B54 | 5945 | 5F53 | 4154 | 4C42 | 0D45 | 1500 |
| 0000001020 | 5553 | 5F54 | 4146 | 5453 | 525F | 5045 | 414C | 5F59 |
| 0000001040 | 4150 | 4152 | 0E4D | 1200 | 4E49 | 5F54 | 4854 | 4552 |
| 0000001060 | 4441 | 535F | 4D45 | 505F | 5254 | 000F | 5312 | 5455 |
| 0000001100 | 545F | 4D49 | 4E49 | 5F47 | 4544 | 4146 | 4C55 | 1054 |
| 0000001120 | 1200 | 5553 | 5F54 | 5453 | 504F | 4D5F | 554F | 4553 |
| 0000001140 | 535F | 4D55 | 0011 | 530F | 4B46 | 435F | 5041 | 5554 |
| 0000001160 | 4552 | 465F | 474C | 0012 | 5310 | 5455 | 545F | 4D49 |
| 0000001200 | 4E49 | 5F47 | 4E55 | 5449 | 1353 | 0A00 | 5553 | 5F54 |
| 0000001220 | 4E55 | 4F4C | 4B43 | 0014 | 4319 | 5652 | 535F | 4F54 |
| 0000001240 | 5F50 | 4F53 | 5446 | 454B | 5F59 | 4553 | 5551 | 4E45 |
| 0000001260 | 4543 | 0015 | 5316 | 5455 | 575F | 4952 | 4554 | 545F |
| 0000001300 | 4D49 | 4E49 | 5F47 | 5645 | 4E45 | 1654 | 0C00 | 5553 |
| 0000001320 | 5F54 | 5244 | 5F56 | 504F | 4E45 | 0017 | 530F | 5455 |
| 0000001340 | 575F | 4952 | 4554 | 455F | 4556 | 544E | 0018 | 430C |
| 0000001360 | 5652 | 535F | 5455 | 495F | 494E | 1954 | 1600 | 5243 |
| 0000001400 | 5F56 | 4E49 | 5449 | 485F | 544F | 454B | 5359 | 545F |
| 0000001420 | 4241 | 454C | 001A | 4315 | 5652 | 535F | 4145 | 4352 |
| 0000001440 | 5F48 | 4F46 | 5F52 | 4F48 | 4B54 | 5945 | 001B | 4318 |
| 0000001460 | 5652 | 4F5F | 4550 | 5F4E | 5553 | 5F54 | 4552 | 4441 |
| 0000001500 | 545F | 5248 | 4145 | 1C44 | 1000 | 5553 | 5F54 | 4552 |
| 0000001520 | 5553 | 454D | 495F | 504E | 5455 | 001D | 5317 | 5455 |
| 0000001540 | 525F | 4145 | 5F44 | 4F54 | 435F | 5652 | 535F | 4D45 |
| 0000001560 | 505F | 5254 | 001E | 5308 | 5455 | 4C5F | 434F | 1F4B |
| 0000001600 | 0000 | 0001 | 000A | 005B | 0063 | 0800 | 4F44 | 4353 |
| 0000001620 | 4C41 | 534C | 6C06 | 6962 | 6D70 | 0D74 | 425F | 5F58 |
| 0000001640 | 4544 | 5542 | 4D47 | 444F | 0D45 | 425F | 5F58 | 4954 |

THU MAR 14 17:27:10 1991 CRV_ONS.DLL PAGE 2, LINE 60

| | | | | | | | | |
|---|---|---|---|---|---|---|---|---|
| 0000001660 | 454D | 4D53 | 444F | 0E45 | 425F | 5F58 | 4544 | 5542 |
| 0000001700 | 4547 | 544E | 5245 | 5F0F | 5842 | 445F | 4245 | 4755 |
| 0000001720 | 4552 | 5554 | 4E52 | 5F0E | 5842 | 505F | 4341 | 464B |
| 0000001740 | 4C49 | 4554 | 0752 | 7263 | 5F76 | 7473 | 0569 | 4244 |
| 0000001760 | 505F | 1F49 | 0101 | 1541 | 2101 | 0118 | 16B3 | 7801 |
| 0000002000 | 0114 | 06A9 | 8701 | 0128 | 13A8 | 5C01 | 0100 | 1435 |
| 0000002020 | FC01 | 0112 | 18A6 | 3B01 | 010D | 23F1 | 5101 | 0118 |
| 0000002040 | 187C | 6001 | 0112 | 1409 | F901 | 0117 | 11C2 | FE01 |
| 0000002060 | 0114 | 23CA | 1B01 | 0109 | 0000 | 5201 | 010A | 05D8 |
| 0000002100 | D101 | 0128 | 2727 | BA01 | 011B | 17C6 | 7A01 | 011C |
| 0000002120 | 14BB | 0000 | 630B | 7672 | 6F5F | 736E | 4420 | 4C4C |
| 0000002140 | 0000 | 0000 | 0J00 | 0000 | 0000 | 0000 | 0000 | 0000 |
| 0000002160 | 581E | 4590 | 8B55 | 1EEC | D88E | EC81 | 0006 | 5657 |
| 0000002200 | B81E | FFFF | D88E | 681E | 0072 | FF68 | 68FF | 0208 |
| 0000002220 | 468D | 16FA | 6A50 | 6A00 | 6A00 | 6A00 | 6A01 | 6A42 |
| 0000002240 | 6A00 | 9A00 | FFFF | 0000 | 4689 | 83FC | FC7E | 7500 |
| 0000002260 | E903 | 0006 | FFB8 | E9FF | 0006 | 00B8 | E900 | 0000 |
| 0000002300 | 5E1F | 835F | 02ED | E58B | 5D1F | CB4D | 581E | 4590 |
| 0000002320 | 8B55 | 1EEC | D88E | EC81 | 0000 | 5657 | B81E | 0012 |
| 0000002340 | D88E | 068E | 0E04 | FF26 | 0836 | 9A02 | FFFF | 0000 |
| 0000002360 | 00E9 | 1F00 | 5F5E | ED83 | 8B02 | 1FE5 | 4D5D | 1ECB |
| 0000002400 | 9058 | 5545 | EC8B | 8E1E | 81D8 | 7EEC | 5702 | 2B56 |
| 0000002420 | 89C0 | F486 | 89FE | F286 | 1EFE | 3768 | 8D01 | F286 |
| 0000002440 | 16FD | 9A50 | 540A | 0121 | C483 | C608 | FA46 | 6A02 |
| 0000002460 | 6A00 | 8D00 | F286 | 16FE | 6A50 | 8D00 | FA8E | 16FE |
| 0000002500 | 8D51 | FC4E | 5116 | FF9A | 00FF | 8900 | 8A86 | 83FD |
| 0000002520 | 8ABE | 00FD | 0374 | EDE9 | FF00 | F4B6 | FFFE | F2B6 |
| 0000002540 | 6AFE | 1E04 | 4368 | 8D01 | 8486 | 16FD | 9A50 | 0152 |
| 0000002560 | 0000 | 8689 | FD8A | BE83 | FD8A | 7400 | E903 | 002D |
| 0000002600 | B6FF | FD86 | B6FF | FD84 | 868D | FDF2 | 5016 | 0A9A |
| 0000002620 | 9054 | 8301 | 08C4 | B6FF | FD86 | B6FF | FD84 | B59A |
| 0000002640 | 0001 | 2B00 | 89C0 | 8686 | 89FD | 8486 | FFFD | F4B6 |
| 0000002660 | FFFE | F2B6 | 6AFE | 1E04 | 5568 | 8D01 | 8486 | 16FD |
| 0000002700 | 9A50 | FFFF | 0000 | 8689 | FD8A | BE83 | FD8A | 7400 |
| 0000002720 | E903 | 005F | 86C7 | FD8C | 0000 | 04E9 | FF00 | 8C86 |
| 0000002740 | 83FD | 8CBE | 05FD | 037C | 31E9 | 6800 | 8C86 | 21FD |
| 0000002760 | 9205 | 1E00 | FF50 | 86B6 | FFFD | 84B6 | 9AFD | 5440 |
| 0000003000 | 01E3 | C483 | 3D08 | 0000 | 0374 | 0CE9 | 6B00 | 8C9E |
| 0000003020 | 21FD | 878A | 00B2 | 4688 | E9FA | FFC1 | B6FF | FD86 |
| 0000003040 | B6FF | FD84 | FF9A | 00FF | 2B00 | 89C0 | 8686 | 89FD |
| 0000003060 | 8486 | FFFD | F4B6 | FFFE | F2B6 | 6AFE | 9A00 | FFFF |
| 0000003100 | 0000 | 8689 | FD8A | 681E | 016B | 868D | FDF2 | 5016 |
| 0000003120 | A29A | 0E37 | 8302 | 08C4 | 8689 | FEF6 | 9689 | FEF8 |
| 0000003140 | 868B | FEF8 | 860B | FEF6 | 0374 | 06E9 | B800 | 0008 |
| 0000003160 | CAE9 | FF03 | F8B6 | FFFE | F6B6 | 9AFE | 364E | 022D |
| 0000003200 | C483 | 8D04 | F286 | 16FD | 1E50 | 6D68 | 9A01 | 37BA |
| 0000003220 | 026A | C483 | C708 | 9286 | 52FD | C700 | 9486 | 41FD |
| 0000003240 | C702 | 9086 | 00FD | C700 | 9886 | 56FD | C700 | 9A86 |
| 0000003260 | 50FD | C702 | 9686 | 00FD | C700 | 8E86 | 02FD | 6800 |
| 0000003300 | 025B | 5268 | 9A00 | 0261 | 0000 | DE68 | 6802 | 0056 |
| 0000003320 | E49A | 0002 | 6A00 | 9A10 | 0664 | 02A4 | C483 | 8D02 |
| 0000003340 | 8286 | 16FD | 8D50 | 8E8E | 16FD | 6A51 | 6800 | 03E8 |
| 0000003360 | FF9A | 00FF | 8900 | 8A86 | 83FD | 8ABE | 00FD | 0374 |
| 0000003400 | EAE9 | 8B00 | 8286 | E9FD | 00D0 | DDE9 | 1E00 | 8F68 |
| 0000003420 | 9A01 | 54DA | 02B3 | C483 | 0B04 | 75D0 | E903 | 0075 |
| 0000003440 | A89A | CE13 | 8902 | 8A86 | 83FD | 8ABE | 00FD | 0375 |
| 0000003460 | 10E9 | FF00 | 8AB6 | 1EFD | 9868 | 9A01 | 37BA | 02ED |
| 0000003500 | C483 | 6A06 | 6800 | 1388 | FF9A | 00FF | 6800 | 02F3 |
| 0000003520 | 5268 | 9A00 | FFFF | 0000 | 106A | 649A | FF06 | 83FF |

THU MAR 14 17:27:10 1991 CRV_ONS.DLL PAGE 3, LINE 119

| | | | | | | | | |
|---|---|---|---|---|---|---|---|---|
| 0000003540 | 02C4 | 6E68 | 6800 | 0052 | 006A | E868 | 9A03 | FFFF |
| 0000003560 | 0000 | 8689 | FD8A | BE83 | FD8A | 7500 | E903 | 0012 |
| 0000003600 | 681E | 01AE | BA9A | 2C37 | 8303 | 04C4 | F5B8 | E9FF |
| 0000003620 | 02AB | 3CE9 | 1E00 | BD68 | 9A01 | 37BA | 0334 | C483 |
| 0000003640 | 9A04 | 12FC | 034D | 8689 | FD88 | BE83 | FD88 | 7500 |
| 0000003660 | E903 | 0006 | F5B8 | E9FF | 0283 | 789A | 5614 | 8A03 |
| 0000003700 | FA46 | 9A50 | 114A | 038A | C483 | B802 | 0000 | 6CE9 |
| 0000003720 | E902 | 0016 | 13E9 | E900 | 0010 | C00B | 0375 | 29E9 |
| 0000003740 | 48FF | 0375 | 26E9 | E9FF | FFEA | 91E9 | 8300 | 8ABE |
| 0000003760 | 79FD | 0374 | 75E9 | 9A00 | 13A8 | 03A5 | 8689 | FD8A |
| 0000004000 | BE83 | FD8A | 7500 | E903 | 0010 | B6FF | FD8A | 681E |
| 0000004020 | 01D9 | BA9A | C437 | 8303 | 06C4 | 006A | 8868 | 9A13 |
| 0000004040 | 02D9 | 0000 | CA68 | 6803 | 0052 | 7E9A | 0004 | 6A00 |
| 0000004060 | 9A10 | 0664 | 03EE | C483 | 6802 | 0426 | 5268 | 6A00 |
| 0000004100 | 6800 | 03E8 | FE9A | 0002 | 8900 | 8A86 | 83FD | 8ABE |
| 0000004120 | 00FD | 0375 | 12E9 | 1E00 | EF68 | 9A01 | 37BA | 0403 |
| 0000004140 | C483 | B804 | FFF5 | D4E9 | E901 | 0012 | 681E | 01FE |
| 0000004160 | BA9A | 1737 | 8304 | 04C4 | F5B8 | E9FF | 01BF | 868D |
| 0000004200 | FDF2 | 5016 | 719A | 3F0E | 8304 | 04C4 | 86C7 | FD92 |
| 0000004220 | 0046 | 86C7 | FD94 | 0432 | 86C7 | FD98 | 004A | 86C7 |
| 0000004240 | FD9A | 0478 | 86C7 | FD8E | 0002 | 006A | 619A | 9510 |
| 0000004260 | 8304 | 02C4 | 8689 | FD88 | 86C7 | FDF0 | 0001 | 868D |
| 0000004300 | FD82 | 5016 | 8E8D | FD8E | 5116 | 006A | 8868 | 9A13 |
| 0000004320 | 04B0 | 0000 | 8689 | FD8A | 003D | 7400 | E903 | 00E2 |
| 0000004340 | 868B | FD82 | C8E9 | 6800 | 0486 | 4668 | 9A00 | 048C |
| 0000004360 | 0000 | CAE9 | 6800 | 04C8 | 4A68 | 9A00 | 04CE | 0000 |
| 0000004400 | 016A | 619A | E010 | 8304 | 02C4 | 8689 | FD88 | 868D |
| 0000004420 | FD82 | 5016 | 8E8D | FD8E | 5116 | 006A | 8868 | 9A13 |
| 0000004440 | 0281 | 0000 | 8689 | FD8A | 003D | 7400 | E903 | 0041 |
| 0000004460 | 868B | FD82 | 27E9 | 6800 | 022F | 4668 | 9A00 | 0256 |
| 0000004500 | 0000 | 29E9 | FF00 | F0B6 | 1EFD | 1168 | 9A02 | 37BA |
| 0000004520 | 050C | C483 | B806 | FFF4 | E2E9 | E900 | 0010 | C00B |
| 0000004540 | 0375 | D2E9 | 48FF | 0375 | DAE9 | E9FF | 0000 | 22E9 |
| 0000004560 | FF00 | F0B6 | 1EFD | 2668 | 9A02 | 37BA | 0518 | C483 |
| 0000004600 | 1E06 | 4168 | 9A02 | 37BA | 00B6 | C483 | B804 | FFF4 |
| 0000004620 | AAE9 | E900 | 0029 | B6FF | FDF0 | 681E | 025C | BA9A |
| 0000004640 | 5D37 | 8305 | 06C4 | F4B8 | E9FF | 0091 | 10E9 | 0B00 |
| 0000004660 | 75C0 | E903 | FF31 | 7548 | E903 | FF39 | D7E9 | E9FF |
| 0000004700 | 0016 | B6FF | FDF0 | 681E | 027E | BA9A | 6D37 | 8305 |
| 0000004720 | 06C4 | F4B8 | E9FF | 0065 | 006A | 619A | 8710 | 8305 |
| 0000004740 | 02C4 | 8689 | FD88 | 86FF | FDF0 | BE83 | FD88 | 7402 |
| 0000004760 | E903 | FECA | 0A9A | 9E0E | 8905 | 8886 | 83FD | 88BE |
| 0000005000 | 00FD | 0375 | 13E9 | 1E00 | 9668 | 9A02 | 37BA | 05B1 |
| 0000005020 | C483 | 8B04 | 8886 | E9FD | 0023 | 681E | 02BB | BA9A |
| 0000005040 | B937 | 8305 | 04C4 | FC9A | C212 | 8A05 | FA46 | 9A50 |
| 0000005060 | 114A | 0317 | C483 | B802 | 0000 | 00E9 | 5E00 | 835F |
| 0000005100 | 02ED | E58B | 5D1F | CB4D | 581E | 4590 | 8B55 | 1EEC |
| 0000005120 | D88E | EC81 | 0004 | 5657 | B81E | 03B5 | D88E | 681E |
| 0000005140 | 02DF | BA9A | FD37 | 8305 | 04C4 | 8F9A | 0E00 | 8906 |
| 0000005160 | FC46 | 7E83 | 00FC | 0375 | 1AE9 | 9A00 | 13A8 | 0620 |
| 0000005200 | 4689 | 6AFC | 6800 | 1388 | B09A | 0003 | 9A00 | 008F |
| 0000005220 | 0531 | 4689 | 8BFC | FC46 | 00E9 | 1F00 | 5F5E | ED83 |
| 0000005240 | 8B02 | 1FE5 | 4D5D | 1ECB | 9058 | 5545 | EC8B | 8E1E |
| 0000005260 | 81D8 | 00EC | 5700 | FF56 | 0676 | 681E | 02F0 | BA9A |
| 0000005300 | F537 | 8305 | 06C4 | 00E9 | 5E00 | 835F | 02ED | E58B |
| 0000005320 | 5D1F | CB4D | 581E | 4590 | 8B55 | 1EEC | D88E | EC81 |
| 0000005340 | 0000 | 5657 | 468B | 8E06 | 0606 | 260E | 06A3 | 6A02 |
| 0000005360 | 6A00 | 8D00 | 0646 | 5016 | 016A | 8068 | 8E00 | 0406 |
| 0000005400 | 260E | 36FF | 0208 | FF9A | 00FF | E900 | 0000 | 5F5E |

THU MAR 14 17:27:10 1991 CRV_ONS.DLL PAGE 4, LINE 178

| | | | | | | | | |
|---|---|---|---|---|---|---|---|---|
| 0000005420 | ED83 | 8B02 | 1FE5 | 4D5D | 1ECB | 9058 | 5545 | EC8B |
| 0000005440 | 8E1E | 81D8 | 04EC | 5700 | 1E56 | EAB8 | 8E05 | 68D8 |
| 0000005460 | 0128 | 006A | 76FF | FF0C | 0A76 | 969A | 515A | 8306 |
| 0000005500 | 08C4 | 068E | 0E08 | C426 | 021E | 2600 | 078A | E42A |
| 0000005520 | 4689 | C4FC | 0A5E | C726 | 0107 | 8B00 | FC46 | C8E9 |
| 0000005540 | C401 | 0A5E | C726 | 1A47 | 0009 | 068E | 0E08 | C426 |
| 0000005560 | 021E | 2600 | 478A | C401 | 0A5E | 8826 | 2447 | E1E9 |
| 0000005600 | C401 | 0A5E | C726 | 1A47 | 000A | 068E | 0E08 | C426 |
| 0000005620 | 021E | 2600 | 478A | C401 | 0A5E | 8826 | 2447 | C1E9 |
| 0000005640 | C401 | 0A5E | C726 | 1A47 | 000B | 068E | 0E08 | C426 |
| 0000005660 | 021E | 2600 | 478A | C401 | 0A5E | 8826 | 2447 | A1E9 |
| 0000005700 | C401 | 0A5E | C726 | 1A47 | 000C | 5EC4 | 2606 | 07C7 |
| 0000005720 | 0001 | 5EC4 | 260A | 47C6 | 0F24 | 5EC4 | 260A | 47C6 |
| 0000005740 | 1825 | 068E | 0E08 | C426 | 021E | 2600 | 478A | C401 |
| 0000005760 | 0A5E | 8826 | 2647 | 068E | 0E08 | C426 | 021E | 2600 |
| 0000006000 | 478A | 9802 | 5EC4 | 260A | 4789 | 8E28 | 0806 | 260E |
| 0000006020 | 1EC4 | 0002 | 8A26 | 0347 | C498 | 0A5E | 8926 | 2A47 |
| 0000006040 | 5EC4 | 260A | 7F83 | 0028 | 0374 | 19E9 | C400 | 0A5E |
| 0000006060 | 8326 | 2A7F | 7400 | E903 | 000C | 681E | 02FE | BA9A |
| 0000006100 | AB37 | 8308 | 04C4 | 19E9 | C401 | 0A5E | C726 | 1A47 |
| 0000006120 | 000C | 5EC4 | 2606 | 07C7 | 0001 | 5EC4 | 260A | 47C6 |
| 0000006140 | 0E24 | 5EC4 | 260A | 47C6 | 1825 | 068E | 0E08 | C426 |
| 0000006160 | 021E | 2600 | 478A | C401 | 0A5E | 8826 | 2647 | 068E |
| 0000006200 | 0E08 | C426 | 021E | 2600 | 478B | C402 | 0A5E | 8926 |
| 0000006220 | 2847 | 068E | 0E08 | C426 | 021E | 2600 | 478B | C404 |
| 0000006240 | 0A5E | 8926 | 2A47 | B9E9 | 8E00 | 0806 | 260E | 1EC4 |
| 0000006260 | 0002 | 8326 | 027F | 7401 | E903 | 0033 | 5EC4 | 260A |
| 0000006300 | 47C7 | 4A1A | 8E00 | 0806 | 260E | 1EC4 | 0002 | 8B26 |
| 0000006320 | 0447 | 5EC4 | 260A | 4789 | C426 | 0A5E | 8326 | 267F |
| 0000006340 | 7428 | E903 | 0006 | 06C7 | 0084 | 0001 | 14E9 | 8E00 |
| 0000006360 | 0806 | 260E | 1EC4 | 0002 | 8B26 | 0447 | 5EC4 | 260A |
| 0000006400 | 4789 | E91A | 005C | FD68 | 6808 | 0042 | 039A | 0009 |
| 0000006420 | FF00 | FC76 | 681E | 0317 | BA9A | CD37 | 8306 | 06C4 |
| 0000006440 | F3B8 | E9FF | 0057 | 39E9 | 3D00 | 00A4 | 0375 | 70E9 |
| 0000006460 | 7EFE | E903 | 0011 | A12D | 7500 | E903 | FE23 | 7548 |
| 0000006500 | E903 | FE3D | BFE9 | 2DFF | 00A5 | 0375 | 72E9 | 2DFE |
| 0000006520 | 0007 | 0375 | F2E9 | 2DFE | 0013 | 0375 | 4AE9 | E9FF |
| 0000006540 | FFA4 | 3E83 | 0084 | 7400 | E903 | 000B | BB68 | 6806 |
| 0000006560 | 0042 | FF9A | 00FF | B800 | 0000 | 00E9 | 1F00 | 5F5E |
| 0000006600 | ED83 | 8B02 | 1FE5 | 4D5D | 08CA | 1E00 | 9058 | 5545 |
| 0000006620 | EC8B | 8E1E | 81D8 | 10EC | 5700 | 1E56 | 97B8 | 8E08 |
| 0000006640 | 83D8 | 8C3E | 0100 | 0374 | 38E9 | C400 | 065E | 8B26 |
| 0000006660 | 2047 | 8B26 | 2257 | 4689 | 89F0 | F256 | 7E83 | 00F0 |
| 0000006700 | 0374 | 1BE9 | 8100 | F27E | 0F00 | 0374 | 11E9 | C400 |
| 0000006720 | 065E | 8B26 | 1C47 | 8B26 | 1E57 | 4689 | 89F0 | F256 |
| 0000006740 | 11E9 | C400 | 065E | 8B26 | 1C47 | 8B26 | 1E57 | 4689 |
| 0000006760 | 89F0 | F256 | 7E83 | 00F2 | 037D | B1E9 | 7E00 | E903 |
| 0000007000 | 0009 | 7E83 | 00F0 | 0377 | A3E9 | 8300 | F07E | 7400 |
| 0000007020 | E903 | 000A | 7E81 | 00F2 | 750F | E903 | 0090 | 468B |
| 0000007040 | 8BF0 | F256 | 8EA3 | 8900 | 9016 | 8300 | F27E | 7E00 |
| 0000007060 | E903 | 0021 | 037D | 0AE9 | 8100 | F07E | 00FF | 0372 |
| 0000007100 | 12E9 | C600 | F446 | 8AA7 | F046 | 4688 | C7F5 | FC46 |
| 0000007120 | 0002 | 28E9 | C600 | F446 | 8BA8 | F046 | 568B | 8AF2 |
| 0000007140 | 8AF2 | 8AD4 | 2AE0 | 8AC0 | F44E | ED2A | DB2B | C80B |
| 0000007160 | DA0B | 4E89 | 89F4 | F65E | 46C7 | 04FC | FF00 | FC76 |
| 0000007200 | 468D | 16F4 | 9A50 | 0C24 | 0A33 | C483 | 8906 | FA46 |
| 0000007220 | 7E83 | 00FA | 0375 | 0FE9 | FF00 | FA76 | 681E | 0332 |
| 0000007240 | BA9A | D137 | 8307 | 06C4 | 468B | E9FA | 0006 | 00B8 |
| 0000007260 | E900 | 0000 | 5E1F | 835F | 02ED | E58B | 5D1F | CA4D |

THU MAR 14 17:27:10 1991 CRV_ONS.DLL PAGE 5, LINE 237

| | | | | | | | | |
|---|---|---|---|---|---|---|---|---|
| 0000007300 | 0004 | 581E | 4590 | 8B55 | 1EEC | D88E | EC81 | 0010 |
| 0000007320 | 5657 | B81E | 092D | D88E | 5EC4 | 2606 | 478B | E91A |
| 0000007340 | 0166 | 46C6 | A1F4 | 5EC4 | 2606 | 478A | 8824 | F546 |
| 0000007360 | 46C7 | 02FC | E900 | 0175 | 46C6 | A2F4 | 5EC4 | 2606 |
| 0000007400 | 478A | 8824 | F546 | 46C7 | 02FC | E900 | 015F | 46C6 |
| 0000007420 | A4F4 | 5EC4 | 2606 | 478A | 8824 | F546 | 46C7 | 02FC |
| 0000007440 | E900 | 0149 | 5EC4 | 2606 | 7F80 | 0F24 | 0374 | 2AE9 |
| 0000007460 | C600 | F446 | C4A5 | 065E | 8A26 | 2647 | 4688 | C4F5 |
| 0000007500 | 065E | 8A26 | 2847 | 4688 | C4F6 | 065E | 8A26 | 2A47 |
| 0000007520 | 4688 | C7F7 | FC46 | 0004 | 27E9 | C600 | F446 | C4AC |
| 0000007540 | 065E | 8A26 | 2647 | 4688 | C4F5 | 065E | 8B26 | 2847 |
| 0000007560 | 4689 | C4F6 | 065E | 8B26 | 2A47 | 4689 | C7F8 | FC46 |
| 0000007600 | 0006 | E8E9 | 8300 | 8C3E | 0100 | 0374 | 14E9 | C400 |
| 0000007620 | 065E | 8B26 | 2047 | 8B26 | 2257 | 4689 | 89F0 | F256 |
| 0000007640 | 11E9 | C400 | 065E | 8B26 | 1C47 | 8B26 | 1E57 | 4689 |
| 0000007660 | 89F0 | F256 | 7E83 | 00F2 | 037D | 76E9 | 7E00 | E903 |
| 0000007700 | 0009 | 7E83 | 00F0 | 0377 | 68E9 | 8300 | F07E | 7400 |
| 0000007720 | E903 | 000A | 7E81 | 00F2 | 750F | E903 | 0055 | 7E83 |
| 0000007740 | 00F2 | 037E | 21E9 | 7D00 | E903 | 000A | 7E81 | FFF0 |
| 0000007760 | 7200 | E903 | 0012 | 46C6 | A7F4 | 468A | 88F0 | F546 |
| 0000010000 | 46C7 | 02FC | E900 | 0028 | 46C6 | A8F4 | 468B | 8BF0 |
| 0000010020 | F256 | F28A | D48A | E08A | C02A | 4E8A | 2AF4 | 2BED |
| 0000010040 | 0BDB | 0BC8 | 89DA | F44E | 5E89 | C7F6 | FC46 | 0004 |
| 0000010060 | 06E9 | B800 | 0000 | 4DE9 | E900 | 0031 | F2B8 | E9FF |
| 0000010100 | 0044 | 28E9 | E900 | 0025 | 092D | 7500 | E903 | FE92 |
| 0000010120 | 7548 | E903 | FEA2 | 7548 | E903 | FEB2 | 7548 | E903 |
| 0000010140 | FEC2 | 092D | 7500 | E903 | FF1B | CFE9 | FFFF | FC76 |
| 0000010160 | 468D | 16F4 | 9A50 | 0C24 | 0A18 | C483 | 8906 | FA46 |
| 0000010200 | 468B | E9FA | 0000 | 5E1F | 835F | 02ED | E58B | 5D1F |
| 0000010220 | CA4D | 0004 | 581E | 4590 | 8B55 | 1EEC | D88E | EC81 |
| 0000010240 | 0008 | 5657 | 46C7 | 00FC | 8E00 | 0406 | 260E | 36FF |
| 0000010260 | 0208 | 76FF | FF08 | 0676 | 76FF | 8D0A | FA46 | 5016 |
| 0000010300 | B29A | 000C | 8900 | F846 | 468D | 16FC | 6A50 | 6A00 |
| 0000010320 | 6A00 | 6802 | 0080 | 068E | 0E04 | FF26 | 0836 | 9A02 |
| 0000010340 | 0CD1 | 0000 | 4689 | 83F8 | FC7E | 7F00 | E903 | 0003 |
| 0000010360 | 05E9 | 8100 | FC46 | 0800 | 7E81 | 00FC | 7C01 | E903 |
| 0000010400 | 0098 | D968 | 680C | 004E | BB9A | 0003 | 8E00 | 0406 |
| 0000010420 | 260E | 36FF | 0208 | 681E | 036E | 026A | 468D | 16FA |
| 0000010440 | 9A50 | FFFF | 0000 | 4689 | 8DF8 | FC46 | 5016 | 006A |
| 0000010460 | 006A | 026A | 8068 | 8E00 | 0406 | 260E | 36FF | 0208 |
| 0000010500 | 979A | 0006 | 8900 | F846 | 6468 | 680A | 004E | 006A |
| 0000010520 | 8868 | 9A13 | 03D5 | 0000 | 4689 | 3DF8 | 0079 | 0374 |
| 0000010540 | 1FE9 | 9A00 | FFFF | 0000 | 003D | 7500 | E903 | 0003 |
| 0000010560 | 0FE9 | 1E00 | 4A68 | 9A03 | 37BA | 0C08 | C483 | E904 |
| 0000010600 | FFC6 | 7E83 | 00F8 | 0374 | 09E9 | B800 | 0000 | 0FE9 |
| 0000010620 | E900 | 0006 | 02B8 | E900 | 0006 | 00B8 | E900 | 0000 |
| 0000010640 | 5F5E | ED83 | 8B02 | 1FE5 | 4D5D | 1ECB | 9058 | 5545 |
| 0000010660 | EC8B | 8E1E | 81D8 | 08EC | 5700 | 1E56 | 93B8 | 8E0C |
| 0000010700 | C7D8 | FC46 | 0000 | 9D68 | 680D | 004E | 999A | 000C |
| 0000010720 | 8E00 | 0406 | 260E | 36FF | 0208 | 681E | 0398 | 026A |
| 0000010740 | 468D | 16FA | 9A50 | 0C51 | 0000 | 4689 | 8DF8 | FC46 |
| 0000010760 | 5016 | 006A | 006A | 026A | 8068 | 8E00 | 0406 | 260E |
| 0000011000 | 36FF | 0208 | 709A | 000C | 8900 | F846 | 4D68 | 680D |
| 0000011020 | 004E | 006A | 8868 | 9A13 | 0CE4 | 0000 | 4689 | 3DF8 |
| 0000011040 | 0079 | 0374 | 2DE9 | 9A00 | 0CF4 | 0000 | 003D | 7500 |
| 0000011060 | E903 | 0003 | 1DE9 | FF0D | 9036 | FF00 | 8E36 | FF00 |
| 0000011100 | FC76 | 76FF | 1E06 | 7468 | 9A03 | 37BA | 0D0A | C483 |
| 0000011120 | E90C | FFB8 | 7E83 | 00F8 | 0374 | 09E9 | B800 | 0000 |
| 0000011140 | 09E9 | E900 | 0006 | 02B8 | E900 | 0000 | 5E1F | 835F |

THU MAR 14 17:27:10 1991 CRV_ONS.DLL PAGE 6, LINE 296

| | | | | | | | | |
|---|---|---|---|---|---|---|---|---|
| 0000011160 | 02ED | E58B | 5D1F | CA4D | 0002 | 581E | 4590 | 8B55 |
| 0000011200 | 1EEC | D88E | EC81 | 0000 | 5657 | 36FF | 0F64 | 36FF |
| 0000011220 | 0F62 | 109A | 3A51 | 830E | 04C4 | 4068 | 680E | 0056 |
| 0000011240 | 5D9A | 000D | 6A00 | 9A13 | 0664 | 0DDC | C483 | 6802 |
| 0000011260 | 0D57 | 5668 | 6A00 | 6800 | 1388 | A89A | 000D | 3D00 |
| 0000011300 | 0000 | 0374 | 09E9 | B800 | 0000 | 09E9 | E900 | 0006 |
| 0000011320 | FFB8 | E9FF | 0000 | 5F5E | ED83 | 8B02 | 1FE5 | 4D5D |
| 0000011340 | 1ECB | 9058 | 5545 | EC8B | 8E1E | 81D8 | 44EC | 5700 |
| 0000011360 | C756 | E846 | FFFF | 46C7 | 01F4 | FF00 | 0876 | 76FF |
| 0000011400 | 8D06 | FC46 | 5016 | 468D | 16E6 | 6A50 | 6A00 | 6A00 |
| 0000011420 | 6A00 | 6A01 | 6A40 | 6A00 | 9A00 | 0034 | 0000 | 4689 |
| 0000011440 | 83EE | EE7E | 7500 | E903 | 0006 | FFB8 | E9FF | 0196 |
| 0000011460 | 016A | 0068 | 9AE0 | 599E | 0E25 | C483 | A304 | 0F62 |
| 0000011500 | 1689 | 0F64 | 64A1 | 0B0F | 6206 | 740F | E903 | 0006 |
| 0000011520 | F1B8 | E9FF | 0170 | 7E83 | 00F4 | 0377 | 36E9 | 8D01 |
| 0000011540 | BE46 | 4689 | 8CF0 | F256 | 76FF | FFFC | F276 | 76FF |
| 0000011560 | 6AF0 | 8D03 | F446 | 5016 | 499A | 000F | 8300 | F47E |
| 0000011600 | 7400 | E903 | 0003 | 0CE9 | 8D01 | F646 | 5016 | 468D |
| 0000011620 | 16FA | 1E50 | 9E68 | FF03 | F276 | 76FF | 9AF0 | 57C2 |
| 0000011640 | 0F72 | C483 | 8910 | EC46 | 76FF | FFFC | F276 | 76FF |
| 0000011660 | 6AF0 | 8D06 | F446 | 5016 | C69A | 000F | 8300 | F47E |
| 0000011700 | 7400 | E903 | 0003 | CCE9 | 8D00 | F846 | 5016 | 5016 |
| 0000011720 | 468D | 16EA | 1E50 | A568 | FF03 | F276 | 76FF | 9AF0 |
| 0000011740 | 57C2 | 1002 | C483 | 8914 | EC46 | 7E8D | 00F6 | 0374 |
| 0000011760 | 03E9 | E900 | 009F | 468B | 2BEA | E846 | C91B | C123 |
| 0000012000 | 4603 | 89E8 | E846 | 468A | 2AF6 | 03E4 | EA46 | 062B |
| 0000012020 | 008A | C91B | D1F7 | C123 | 0603 | 008A | 8AA3 | FF00 |
| 0000012040 | FC76 | 76FF | FFF2 | F076 | 468A | 2AF6 | D1E4 | 50E0 |
| 0000012060 | 468D | 16F4 | 9A50 | 101E | 0000 | 46C6 | 00BC | 07E9 |
| 0000012100 | FE00 | BC46 | 4683 | 02F0 | 468A | 38BC | F646 | 0377 |
| 0000012120 | 2AE9 | 8A00 | BC46 | E42A | 0603 | 0F62 | 168B | 0F64 |
| 0000012140 | 4603 | 52EA | 1E50 | AF68 | FF03 | F276 | 76FF | 9AF0 |
| 0000012160 | 57C2 | 0EC8 | C483 | 890C | EC46 | C4E9 | FFFF | FC76 |
| 0000012200 | 76FF | FFF2 | F076 | 046A | 468D | 16F4 | 9A50 | FFFF |
| 0000012220 | 0000 | C1E9 | FFFE | FC76 | 7C9A | 0000 | F600 | E846 |
| 0000012240 | 7501 | E903 | 0003 | 4EFF | F6E8 | 8A06 | 0100 | 0375 |
| 0000012260 | 04E9 | FF00 | 8A06 | 8B00 | E846 | 60A3 | A30F | 0F5E |
| 0000012300 | 00B8 | E900 | 0000 | 5F5E | ED83 | 8B02 | 1FE5 | 4D5D |
| 0000012320 | 1ECB | 9058 | 5545 | EC8B | 8E1E | 81D8 | 14EC | 5700 |
| 0000012340 | C756 | F246 | 0000 | 7E83 | 0006 | 0374 | 06E9 | A100 |
| 0000012360 | 0F60 | 5EA3 | A10F | 0F5E | 0639 | 008A | 0376 | 09E9 |
| 0000012400 | B800 | 0002 | A8E9 | E900 | 00A5 | 5EA1 | 890F | EE46 |
| 0000012420 | 46C7 | 00F0 | E900 | 0006 | 46FF | FFEE | F046 | 8AA1 |
| 0000012440 | 3900 | EE46 | 0372 | 1FE9 | 8100 | F07E | 07D0 | 0372 |
| 0000012460 | 15E9 | C400 | 621E | 8B0F | EE76 | 8A26 | 0200 | F246 |
| 0000012500 | E42A | 4689 | E9F2 | FFD0 | 468B | A3EE | 0F60 | 5EA1 |
| 0000012520 | 890F | F446 | 468B | 89F0 | F646 | 62A1 | 8B0F | 6416 |
| 0000012540 | 030F | 5E06 | 890F | F846 | 5689 | 8BFA | F246 | 4689 |
| 0000012560 | 6AFC | 6A00 | 8D00 | F446 | 5016 | 056A | 8068 | 8E00 |
| 0000012600 | 0406 | 260E | 36FF | 0208 | 959A | 000D | 8900 | EC46 |
| 0000012620 | 7E83 | 00EC | 0375 | 06E9 | B800 | FFFF | 10E9 | 6A00 |
| 0000012640 | 9A12 | 0664 | 0F30 | C483 | B802 | 0000 | 00E9 | 5E00 |
| 0000012660 | 835F | 02ED | E58B | 5D1F | CB4D | 581E | 4590 | 8B55 |
| 0000012700 | 1EEC | D88E | EC81 | 000A | 5657 | 46C6 | B3F6 | 468A |
| 0000012720 | 8806 | F746 | 2B68 | 680E | 005E | 319A | 000E | 6A00 |
| 0000012740 | 8D02 | F646 | 5016 | 249A | 340C | 8311 | 06C4 | 4689 |
| 0000012760 | 83FC | FC7E | 7500 | E903 | 0006 | 468B | E9FC | 0027 |
| 0000013000 | 6568 | 6811 | 005E | 006A | 8868 | 9A13 | 0E4B | 0000 |
| 0000013020 | 793D | 7400 | E903 | 0009 | F0B8 | E9FF | 0009 | 06E9 |

THU MAR 14 17:27:10 1991 CRV_ONS.DLL PAGE 7, LINE 355

| | | | | | | | | |
|---|---|---|---|---|---|---|---|---|
| 0000013040 | B800 | 0000 | 00E9 | 5E00 | 835F | 02ED | E58B | 5D1F |
| 0000013060 | CB4D | 581E | 4590 | 8B55 | 1EEC | D88E | EC81 | 000A |
| 0000013100 | 5657 | B81E | 1191 | D88E | 46C6 | B1F6 | 18B0 | 66F6 |
| 0000013120 | 8806 | F746 | 2068 | 6812 | 005E | 6B9A | 0011 | 6A00 |
| 0000013140 | 8D02 | F646 | 5016 | 249A | 140C | 8312 | 06C4 | 4689 |
| 0000013160 | 83FC | FC7E | 7500 | E903 | 0015 | 76FF | 1EFC | B368 |
| 0000013200 | 9A03 | 37BA | 123E | C483 | 8B06 | FC46 | 33E9 | 6800 |
| 0000013220 | 11D4 | 5E68 | 6A00 | 6800 | 1388 | 9C9A | 0011 | 3D00 |
| 0000013240 | 0079 | 0374 | 15E9 | 1E00 | CB68 | 9A03 | 37BA | 1179 |
| 0000013260 | C483 | B804 | FFF0 | 09E9 | E900 | 0006 | 00B8 | E900 |
| 0000013300 | 0000 | 5E1F | 835F | 02ED | E58B | 5D1F | CA4D | 0002 |
| 0000013320 | 581E | 4590 | 8B55 | 1EEC | D88E | EC81 | 000A | 5657 |
| 0000013340 | B81E | 11E5 | D88E | 46C6 | B2F6 | 468A | 8806 | F746 |
| 0000013360 | BC68 | 6812 | 005E | EB9A | 0011 | 6A00 | 8D02 | F646 |
| 0000013400 | 5016 | 249A | B00C | 8312 | 06C4 | 4689 | 83FC | FC7E |
| 0000013420 | 7500 | E903 | 0015 | 76FF | 1EFC | D868 | 9A03 | 37BA |
| 0000013440 | 12DA | C483 | 8B06 | FC46 | 33E9 | 6800 | 1272 | 5E68 |
| 0000013460 | 6A00 | 6800 | 1388 | 2B9A | 0012 | 3D00 | 0079 | 0374 |
| 0000013500 | 15E9 | 1E00 | F068 | 9A03 | 37BA | 11F9 | C483 | B804 |
| 0000013520 | FFF0 | 09E9 | E900 | 0006 | 00B8 | E900 | 0000 | 5E1F |
| 0000013540 | 835F | 02ED | E58B | 5D1F | CA4D | 0002 | 581E | 4590 |
| 0000013560 | 8B55 | 1EEC | D88E | EC81 | 0004 | 5657 | B81E | 1281 |
| 0000013600 | D88E | 006A | 006A | 006A | 006A | 046A | 8068 | 8E00 |
| 0000013620 | 0406 | 260E | 36FF | 0208 | 199A | 0011 | 8900 | FC46 |
| 0000013640 | 7E83 | 00FC | 0375 | 15E9 | FF00 | FC76 | 681E | 03FD |
| 0000013660 | BA9A | 5E37 | 8313 | 06C4 | FFB8 | E9FF | 004E | 6468 |
| 0000013700 | 6813 | 0056 | 879A | 0012 | 6A00 | 9A14 | 0664 | 1391 |
| 0000013720 | C483 | 6802 | 130E | 5668 | 6A00 | 6800 | 1388 | C79A |
| 0000013740 | 0012 | 8900 | FC46 | 003D | 7400 | E903 | 0009 | 00B8 |
| 0000013760 | E900 | 0018 | 15E9 | FF00 | FC76 | 681E | 0412 | BA9A |
| 0000014000 | 9537 | 8312 | 06C4 | FFB8 | E9FF | 0000 | 5E1F | 835F |
| 0000014020 | 02ED | E58B | 5D1F | CB4D | 581E | 4590 | 8B55 | 1EEC |
| 0000014040 | D88E | EC81 | 0004 | 5657 | B81E | 134F | D88E | 681E |
| 0000014060 | 0427 | BA9A | 4337 | 8313 | 04C4 | 006A | 006A | 006A |
| 0000014100 | 006A | 066A | 8068 | 8E00 | 0406 | 260E | 36FF | 0208 |
| 0000014120 | 299A | 0013 | 8900 | FC46 | 7E83 | 00FC | 0375 | 06E9 |
| 0000014140 | B800 | FFFF | 06E9 | B800 | 0000 | 00E9 | 1F00 | 5F5E |
| 0000014160 | ED83 | 8B02 | 1FE5 | 4D5D | 1ECB | 9058 | 5545 | EC8B |
| 0000014200 | 8E1E | 81D8 | 00EC | 5700 | 1E56 | BAB8 | 8E13 | 6AD8 |
| 0000014220 | 9A16 | D664 | 13C5 | C483 | 1F02 | 5F5E | ED83 | 8B02 |
| 0000014240 | 1FE5 | 4D5D | 1ECB | 9058 | 5545 | EC8B | 8E1E | 81D8 |
| 0000014260 | 08EC | 5700 | 1E56 | 1BB8 | 8E14 | C6D8 | F846 | 68AD |
| 0000014300 | 1447 | 5E68 | 9A00 | 1355 | 0000 | 026A | 468D | 16F8 |
| 0000014320 | 9A50 | 0C24 | 1424 | C483 | E906 | 0000 | 5E1F | 835F |
| 0000014340 | 02ED | E58B | 5D1F | CB4D | 581E | 4590 | 8B55 | 1EEC |
| 0000014360 | D88E | EC81 | 0008 | 5657 | B81E | 1450 | D88E | 46C6 |
| 0000014400 | AEF8 | 8A68 | 6814 | 005E | 569A | 0014 | 6A00 | 8D02 |
| 0000014420 | F846 | 5016 | 249A | 640C | 8314 | 06C4 | 00E9 | 1F00 |
| 0000014440 | 5F5E | ED83 | 8B02 | 1FE5 | 4D5D | 1ECB | 9058 | 5545 |
| 0000014460 | EC8B | 8E1E | 81D8 | 08EC | 5700 | 1E56 | 93B8 | 8E14 |
| 0000014500 | C6D8 | F846 | 68AF | 14CD | 5E68 | 9A00 | 1499 | 0000 |
| 0000014520 | 026A | 468D | 16F8 | 9A50 | 0C24 | 14A7 | C483 | E906 |
| 0000014540 | 0000 | 5E1F | 835F | 02ED | E58B | 5D1F | CB4D | 581E |
| 0000014560 | 4590 | 8B55 | 1EEC | D88E | EC81 | 0008 | 5657 | B81E |
| 0000014600 | 14D6 | D88E | 46C6 | B0F8 | 1068 | 6815 | 005E | DC9A |
| 0000014620 | 0014 | 6A00 | 8D02 | F846 | 5016 | 249A | EA0C | 8314 |
| 0000014640 | 06C4 | 00E9 | 1F00 | 5F5E | ED83 | 8B02 | 1FE5 | 4D5D |
| 0000014660 | 1ECB | 9058 | 5545 | EC8B | 8E1E | 81D8 | 0EEC | 5700 |
| 0000014700 | 1E56 | 19B8 | 8E15 | 68D8 | 15CE | 4E68 | 9A00 | 1630 |

THU MAR 14 17:27:10 1991 CRV_ONS.DLL PAGE 8, LINE 414

| | | | | | | | | |
|---|---|---|---|---|---|---|---|---|
| 0000014720 | 0000 | 068E | 0E04 | FF26 | 0836 | 1E02 | B468 | 6A04 |
| 0000014740 | 8D02 | FA46 | 5016 | 769A | 000D | 8900 | F846 | 7E83 |
| 0000014760 | 00F8 | 0375 | 0FE9 | FF00 | F876 | 681E | 0441 | BA9A |
| 0000015000 | C837 | 8315 | 06C4 | 468D | 16FC | 6A50 | 6A00 | 6A00 |
| 0000015020 | 6802 | 0080 | 068E | 0E04 | FF26 | 0836 | 9A02 | 13E1 |
| 0000015040 | 0000 | 4689 | 83F8 | F87E | 7500 | E903 | 000F | 76FF |
| 0000015060 | 1EF8 | 5468 | 9A04 | 37BA | 15FF | C483 | 6806 | 162A |
| 0000015100 | 4E68 | 6A00 | 6800 | 1388 | 709A | 0016 | 8900 | F846 |
| 0000015120 | 793D | 7400 | E903 | 001F | B89A | 000D | 3D00 | 0000 |
| 0000015140 | 0375 | 03E9 | E900 | 000F | 681E | 0469 | BA9A | 1A37 |
| 0000015160 | 8316 | 04C4 | C6E9 | 83FF | F87E | 7500 | E903 | 0015 |
| 0000015200 | 76FF | 1EF8 | 7368 | 9A04 | 37BA | 163E | C483 | B806 |
| 0000015220 | 0002 | 80E9 | C600 | F246 | 68B4 | 1665 | 5A68 | 9A00 |
| 0000015240 | 151F | 0000 | 026A | 468D | 16F2 | 9A50 | 0C24 | 1659 |
| 0000015260 | C483 | 8906 | F846 | 7E83 | 00F8 | 0375 | 15E9 | FF00 |
| 0000015300 | F876 | 681E | 0492 | BA9A | 8337 | 8316 | 06C4 | 468B |
| 0000015320 | E9F8 | 0041 | 5368 | 6815 | 005A | 006A | 8868 | 9A13 |
| 0000015340 | 136F | 0000 | 793D | 7400 | E903 | 0015 | 681E | 04AA |
| 0000015360 | BA9A | 2D37 | 8315 | 04C4 | F0B8 | E9FF | 0017 | 14E9 |
| 0000015400 | 8E00 | 0A06 | 260E | 00A0 | C400 | 065E | 8826 | B807 |
| 0000015420 | 0000 | 00E9 | 1F00 | 5F5E | ED83 | 8B02 | 1FE5 | 4D5D |
| 0000015440 | 04CA | 1E00 | 9058 | 5545 | EC8B | 8E1E | 81D8 | 0EEC |
| 0000015460 | 5700 | 1E56 | 58B8 | 8E15 | 68D8 | 1710 | 4E68 | 9A00 |
| 0000015500 | 176C | 0000 | 068E | 0E04 | FF26 | 0836 | 1E02 | E468 |
| 0000015520 | 6A04 | 8D02 | FA46 | 5016 | 779A | 0015 | 8900 | F846 |
| 0000015540 | 468D | 16FC | 6A50 | 6A00 | 6A00 | 6802 | 0080 | 068E |
| 0000015560 | 0E04 | FF26 | 0836 | 9A02 | 15AE | 0000 | 4689 | 68F8 |
| 0000015600 | 1766 | 4E68 | 6A00 | 6800 | 1388 | 9D9A | 0017 | 8900 |
| 0000015620 | F846 | 793D | 7400 | E903 | 0022 | E99A | 0015 | 3D00 |
| 0000015640 | 0000 | 0375 | 03E9 | E900 | 0012 | 76FF | 1EFC | BA68 |
| 0000015660 | 9A04 | 37BA | 177A | C483 | E906 | FFC3 | 7E83 | 00F8 |
| 0000015700 | 0375 | 06E9 | B800 | 0002 | 5DE9 | C600 | F246 | 8AB5 |
| 0000015720 | 0646 | 4688 | 68F3 | 1792 | 5A68 | 9A00 | 155E | 0000 |
| 0000015740 | 026A | 468D | 16F2 | 9A50 | 0C24 | 1591 | C483 | 8906 |
| 0000015760 | F846 | 7E83 | 00F8 | 0375 | 06E9 | 8B00 | F846 | 27E9 |
| 0000016000 | 6800 | 16C5 | 5A68 | 6A00 | 6800 | 1388 | D99A | 0015 |
| 0000016020 | 3D00 | 0079 | 0374 | 09E9 | B800 | FFF0 | 09E9 | E900 |
| 0000016040 | 0006 | 00B8 | E900 | 0000 | 5E1F | 835F | 02ED | E58B |
| 0000016060 | 5D1F | CA4D | 0002 | 581E | 4590 | 8B55 | 1EEC | D88E |
| 0000016100 | EC81 | 0000 | 5657 | B81E | 17DD | D88E | CA68 | 6816 |
| 0000016120 | 0042 | 9D9A | 0008 | C700 | 8406 | 0000 | 1F00 | 5F5E |
| 0000016140 | ED83 | 8B02 | 1FE5 | 4D5D | 1ECB | 9058 | 5545 | EC8B |
| 0000016160 | 8E1E | 81D8 | 00EC | 5700 | 1E56 | D8B8 | 8E17 | A1D8 |
| 0000016200 | 0084 | 00E9 | 1F00 | 5F5E | ED83 | 8B02 | 1FE5 | 4D5D |
| 0000016220 | 1ECB | 9058 | 5545 | EC8B | 8E1E | 81D8 | 00EC | 5700 |
| 0000016240 | 1E56 | 0BB8 | 8E18 | 8BD8 | 0646 | 84A3 | B800 | 0000 |
| 0000016260 | 00E9 | 1F00 | 5F5E | ED83 | 8B02 | 1FE5 | 4D5D | 02CA |
| 0000016300 | 1E00 | 9058 | 5545 | EC8B | 8E1E | 81D8 | 00EC | 5700 |
| 0000016320 | 1E56 | 33B8 | 8E18 | 8BD8 | 0646 | 8CA3 | 1F00 | 5F5E |
| 0000016340 | ED83 | 8B02 | 1FE5 | 4D5D | 02CA | 0000 | 581E | 4590 |
| 0000016360 | 8B55 | 1EEC | D88E | EC81 | 0000 | 5657 | B81E | 1863 |
| 0000016400 | D88E | 68B8 | 8C11 | E9DA | 0000 | 5E1F | 835F | 02ED |
| 0000016420 | E58B | 5D1F | CB4D | 581E | 4590 | 8B55 | 1EEC | D88E |
| 0000016440 | EC81 | 0000 | 5657 | B81E | 188E | D88E | 006A | 006A |
| 0000016460 | 0068 | 6A08 | 6A00 | 6800 | 18D0 | FF68 | 9AFF | 563A |
| 0000016500 | 1744 | C483 | 400E | 0374 | 06E9 | B800 | FFFF | 06E9 |
| 0000016520 | B800 | 0000 | 00E9 | 1F00 | 5F5E | ED83 | 8B02 | 1FE5 |
| 0000016540 | 4D5D | 1ECB | 9058 | 5545 | EC8B | 8E1E | 81D8 | 04EC |
| 0000016560 | 5700 | 6856 | 190F | 3668 | 9A05 | 1915 | 0000 | 1A68 |

THU MAR 14 17:27:10 1991 CRV_ONS.DLL PAGE 9, LINE 473

| | | | | | | | | |
|---|---|---|---|---|---|---|---|---|
| 0000016600 | 6819 | 0046 | 209A | 0019 | 6800 | 1925 | 4A68 | 9A00 |
| 0000016620 | 192B | 0000 | 3068 | 6819 | 004E | 369A | 0019 | 6800 |
| 0000016640 | 193B | 5268 | 9A00 | 1941 | 0000 | 4668 | 6819 | 0056 |
| 0000016660 | 4C9A | 0019 | 6800 | 1951 | 5A68 | 9A00 | 1957 | 0000 |
| 0000016700 | B868 | 6818 | 005E | D09A | 0016 | 1E00 | 6868 | 9A11 |
| 0000016720 | 17E3 | 0000 | 468D | 16FC | 6A50 | 6A00 | 6A00 | 6800 |
| 0000016740 | 0080 | 068E | 0E0C | FF26 | 0836 | 9A02 | 1708 | 0000 |
| 0000016760 | 468A | 8EFD | 0E06 | 260E | 00A2 | 8100 | FC66 | 00FF |
| 0000017000 | 468B | E9FC | 00B7 | A568 | 6819 | 0052 | AB9A | 0019 |
| 0000017020 | E900 | 00D3 | B368 | 6819 | 0056 | B99A | 0019 | E900 |
| 0000017040 | 00C5 | E468 | 6819 | 0536 | EA9A | 0019 | E900 | 00B7 |
| 0000017060 | 006A | 006A | 1B68 | 6800 | 0206 | 016A | 8068 | 8E00 |
| 0000017100 | 0C06 | 260E | 36FF | 0208 | 7C9A | 0019 | E900 | 0097 |
| 0000017120 | 94E9 | 6800 | 19F2 | 4668 | 9A0D | 19F8 | 0000 | 86E9 |
| 0000017140 | 6800 | 1A1E | 4A68 | 9A00 | 1A24 | 0000 | 78E9 | 1E00 |
| 0000017160 | EA68 | 9A04 | 37BA | 1A15 | C483 | E904 | 0069 | 681E |
| 0000017200 | 0514 | BA9A | C837 | 8318 | 04C4 | 5AE9 | 6800 | 1A2C |
| 0000017220 | 4E68 | 9A00 | 1A32 | 0000 | 4CE9 | 6800 | 1A3A | 5E68 |
| 0000017240 | 9A00 | 1A40 | 0000 | 3EE9 | 6800 | 1904 | 5A68 | 9A00 |
| 0000017260 | 1960 | 0000 | 30E9 | E900 | 002D | 2AE9 | 3D00 | 000C |
| 0000017300 | 0376 | F2E9 | D1FF | 93E0 | FF2E | 5DA7 | 961A | A419 |
| 0000017320 | B219 | C019 | E019 | E319 | F119 | FF19 | 0E19 | 1D1A |
| 0000017340 | 2B1A | 391A | 391A | E91A | FEEA | 5F5E | ED83 | 8B02 |
| 0000017360 | 1FE5 | 4D5D | 00CB | 581E | 4590 | 8B55 | 1EEC | D88E |
| 0000017400 | EC81 | 000C | 5657 | 3E83 | 055C | 7400 | E903 | 00DC |
| 0000017420 | 3E83 | 116C | 7400 | E903 | 0041 | 681E | 0536 | 0A9A |
| 0000017440 | 0019 | 8D00 | FA46 | 5016 | 006A | 006A | 036A | 8068 |
| 0000017460 | 8E00 | 1006 | 260E | 36FF | 0208 | D99A | 0019 | 8900 |
| 0000017500 | F446 | 7E83 | 00FA | 0374 | 0DE9 | 1E00 | 3668 | 6A05 |
| 0000017520 | 6AFF | 9AFF | 171B | 0000 | 06E9 | C700 | 6C06 | 0011 |
| 0000017540 | 8E00 | 1006 | 260E | 36FF | 0208 | 681E | 11D0 | 026A |
| 0000017560 | 468D | 16F6 | 9A50 | 1B4E | 0000 | 368B | 11D0 | E681 |
| 0000017600 | 00FF | EE81 | 00A0 | FE83 | 7D00 | E903 | 0058 | FE83 |
| 0000017620 | 7C0E | E903 | 0050 | DE8B | 808B | 055E | 4689 | 83FC |
| 0000017640 | FC7E | 7F00 | E903 | 001A | 068E | 0E10 | FF26 | 0836 |
| 0000017660 | 1E02 | D268 | FF11 | FC76 | 468D | 16F6 | 9A50 | 0F09 |
| 0000017700 | 0000 | 681E | 116E | 681E | 055C | 681E | 1170 | 681E |
| 0000017720 | 11D0 | F49A | 061F | 831A | 10C4 | 4689 | C7F8 | 5A06 |
| 0000017740 | 0005 | E900 | 0006 | FFB8 | E9FF | 0033 | 3E83 | 055C |
| 0000017760 | 7700 | E903 | 0026 | 5AA1 | 8B05 | D1C8 | 03E0 | D1C1 |
| 0000020000 | 05E0 | 1170 | 5EC4 | 2606 | 0789 | 8C26 | 025F | 06FF |
| 0000020020 | 055A | 0EFF | 055C | 00B8 | E900 | 0003 | E7E9 | 5EFE |
| 0000020040 | 835F | 02ED | E58B | 5D1F | CB4D | 581E | 4590 | 8B55 |
| 0000020060 | 1EEC | D88E | EC81 | 0000 | 5657 | B81E | 1997 | D88E |
| 0000020100 | 006A | 006A | 0068 | 6A08 | 6A00 | 6800 | 1BE4 | FF68 |
| 0000020120 | 9AFF | 563A | 1B65 | C483 | 400E | 0374 | 06E9 | B800 |
| 0000020140 | FFFF | 06E9 | B800 | 0000 | 00E9 | 1F00 | 5F5E | ED83 |
| 0000020160 | 8B02 | 1FE5 | 4D5D | 1ECB | 9058 | 5545 | EC8B | 8E1E |
| 0000020200 | 81D8 | 00EC | 5700 | 1E56 | 3668 | 9A05 | 1C50 | 0000 |
| 0000020220 | 681E | 0536 | FF6A | FF6A | 689A | 001C | C700 | 6C06 |
| 0000020240 | 0111 | 6800 | 19C5 | 0268 | 9A00 | 1A86 | 1BDC | C483 |
| 0000020260 | 3D04 | 0000 | 0374 | 23E9 | 6800 | 1C5E | 4268 | 9A00 |
| 0000020300 | 1AAF | 0000 | 681E | 053A | 9D9A | 0019 | 6800 | 1BCC |
| 0000020320 | 4268 | 6A00 | 6AFF | 9AFF | 1AE4 | 0000 | C4E9 | 5EFF |
| 0000020340 | 835F | 02ED | E58B | 5D1F | CB4D | 581E | 4590 | 8B55 |
| 0000020360 | 1EEC | D88E | EC81 | 0000 | 5657 | B81E | 1C4A | D88E |
| 0000020400 | 3AB8 | 8C05 | E9DA | 0000 | 5E1F | 835F | 02ED | E58B |
| 0000020420 | 5D1F | CB4D | 581E | 4590 | 8B55 | 1EEC | D88E | EC81 |
| 0000020440 | 000A | 5657 | 466B | 4A06 | 9A50 | 5106 | 1D0E | C483 |

THU MAR 14 17:27:10 1991 CRV_ONS.DLL PAGE 10, LINE 532

| | | | | | | | | |
|---|---|---|---|---|---|---|---|---|
| 0000020460 | A302 | 1240 | 1689 | 1242 | 42A1 | 0B12 | 4006 | 7412 |
| 0000020500 | E903 | 0006 | F1B8 | E9FF | 00DB | 40A1 | 8B12 | 4216 |
| 0000020520 | 8912 | F646 | 5689 | C7F8 | FC46 | 0000 | 03E9 | FF00 |
| 0000020540 | FC46 | 468B | 3906 | FC46 | 0372 | B2E9 | 6A00 | FF46 |
| 0000020560 | 0A76 | 76FF | FF08 | F876 | 76FF | 9AF6 | 5A38 | 1C3C |
| 0000020600 | C483 | C40A | F65E | C726 | 4647 | 0000 | 5EC4 | 26F6 |
| 0000020620 | 47C7 | 0048 | C700 | FA46 | 0000 | 03E9 | FF00 | FA46 |
| 0000020640 | 5EC4 | 8BF6 | FA46 | 3926 | 7707 | E903 | 0066 | 768B |
| 0000020660 | C1FA | 02E6 | 5EC4 | 26F6 | 408B | E902 | 003C | 768B |
| 0000020700 | C1FA | 02E6 | 5EC4 | 26F6 | 40C7 | A202 | E900 | 0041 |
| 0000020720 | 768B | C1FA | 02E6 | 5EC4 | 26F6 | 40C7 | A102 | E900 |
| 0000020740 | 002F | 768B | C1FA | 02E6 | 5EC4 | 26F6 | 40C7 | A402 |
| 0000020760 | E900 | 001D | 1AE9 | E900 | 0017 | 092D | 7500 | E903 |
| 0000021000 | FFCE | 7548 | E903 | FFB6 | 754B | E903 | FFD4 | E3E9 |
| 0000021020 | E9FF | FF89 | 4683 | 4608 | 46B3 | 4AF6 | 40E9 | 8BFF |
| 0000021040 | 0646 | 3CA3 | 5E12 | 835F | 02ED | E58B | 5D1F | CB4D |
| 0000021060 | 581E | 4590 | 8B55 | 1EEC | D88E | EC81 | 000E | 5657 |
| 0000021100 | 468B | 0306 | 3C06 | 8912 | FC46 | 466B | 4AFC | FF50 |
| 0000021120 | 4236 | FF12 | 4036 | 9A12 | 58CC | 1E49 | C483 | A306 |
| 0000021140 | 1240 | 1689 | 1242 | 42A1 | 0B12 | 4006 | 7412 | E903 |
| 0000021160 | 0006 | F1B8 | E9FF | 006B | 40A1 | 8B12 | 4216 | 8912 |
| 0000021200 | F646 | 5689 | A1F8 | 123C | 4689 | E9FA | 0003 | 46FF |
| 0000021220 | 8BFA | FA46 | 4639 | 77FC | E903 | 0041 | 466A | 76FF |
| 0000021240 | FF0A | 0876 | 4683 | 4608 | 466B | 4AFA | 0603 | 1240 |
| 0000021260 | 168B | 1242 | 5052 | 389A | BC5A | 831C | 0AC4 | 766B |
| 0000021300 | 4AFA | 1EC4 | 1240 | C726 | 4640 | 0000 | 766B | 4AFA |
| 0000021320 | 1EC4 | 1240 | C726 | 4840 | 0000 | B1E9 | 8BFF | FC46 |
| 0000021340 | 3CA3 | 5E12 | 835F | 02ED | E58B | 5D1F | CB4D | 581E |
| 0000021360 | 4590 | 8B55 | 1EEC | D88E | EC81 | 0008 | 5657 | 46C7 |
| 0000021400 | 00FC | E900 | 0003 | 46FF | A1FC | 123C | 4639 | 72FC |
| 0000021420 | E903 | 00D0 | 46C7 | 01F8 | C400 | 065E | 8B26 | 4447 |
| 0000021440 | 766B | 4AFC | 1EC4 | 1240 | 3926 | 4440 | 0374 | B0E9 |
| 0000021460 | C400 | 065E | 8B26 | 6B07 | FC5E | C44A | 4036 | 2612 |
| 0000021500 | 0039 | 0374 | 9AE9 | C700 | FA46 | 0000 | 03E9 | FF00 |
| 0000021520 | FA46 | 5EC4 | 8B06 | FA46 | 3926 | 7707 | E903 | 002E |
| 0000021540 | 768B | C1FA | 02E6 | 5EC4 | 2606 | 408A | 8B04 | FA76 |
| 0000021560 | E6C1 | 6B02 | FC4E | 034A | C4F1 | 401E | 2612 | 4038 |
| 0000021600 | 7504 | E903 | 0005 | 46C7 | 00F8 | E900 | FFC1 | 7E83 |
| 0000021620 | 01F8 | 0374 | 4AE9 | 8B00 | FC46 | 4689 | E9FA | 0003 |
| 0000021640 | 46FF | A1FA | 123C | 4639 | 72FA | E903 | 002C | 4A6A |
| 0000021660 | 466B | 4AFA | 0603 | 1240 | 168B | 1242 | 4A05 | 5200 |
| 0000021700 | 6B50 | FA46 | 034A | 4006 | 8B12 | 4216 | 5212 | 9A50 |
| 0000021720 | 5A38 | 1DEA | C483 | E90A | FFC6 | 0EFF | 123C | 03E9 |
| 0000021740 | E900 | FF22 | 7E83 | 00F8 | 0374 | 06E9 | B800 | FFEC |
| 0000021760 | 35E9 | 6B00 | 3C06 | 4A12 | FF50 | 4236 | FF12 | 4036 |
| 0000022000 | 9A12 | 58CC | 1F62 | C483 | A306 | 1240 | 1689 | 1242 |
| 0000022020 | 42A1 | 0B12 | 4006 | 7412 | E903 | 0006 | F1B8 | E9FF |
| 0000022040 | 0006 | 01B8 | E900 | 0000 | 5F5E | ED83 | 8B02 | 1FE5 |
| 0000022060 | 4D5D | 1ECB | 9058 | 5545 | EC8B | 8E1E | 81D8 | 00EC |
| 0000022100 | 5700 | FF56 | 4236 | FF12 | 4036 | 9A12 | 5110 | 1F94 |
| 0000022120 | C483 | C704 | 3C06 | 0012 | 5E00 | 835F | 02ED | E58B |
| 0000022140 | 5D1F | CB4D | 581E | 4590 | 8B55 | 1EEC | D88E | EC81 |
| 0000022160 | 000C | 5657 | 46C7 | FFFA | C7FF | FC46 | 0000 | 5EC4 |
| 0000022200 | 2606 | 078A | E42A | 37E9 | E901 | 0152 | 3E83 | 11D6 |
| 0000022220 | 7700 | E903 | 0007 | D6A1 | 4011 | 4689 | C7FC | FA46 |
| 0000022240 | 0000 | 39E9 | C701 | F846 | 0000 | 03E9 | FF00 | F846 |
| 0000022260 | 3CA1 | 3912 | F846 | 0372 | 02E9 | C401 | 065E | 8A26 |
| 0000022300 | 0147 | 766B | 4AF8 | 1EC4 | 1240 | 8B26 | 4670 | E6C1 |
| 0000022320 | 6B02 | F84E | 034A | C4F1 | 401E | 2612 | 4038 | 7404 |

THU MAR 14 17:27:10 1991 CRV_ONS.DLL PAGE 11, LINE 591

| | | | | | | | | |
|---|---|---|---|---|---|---|---|---|
| 0000022340 | E903 | 0079 | 766B | 4AF8 | 1EC4 | 1240 | 8B26 | 4670 |
| 0000022360 | E6C1 | 6B02 | F846 | 034A | C4F0 | 401E | 2612 | 408A |
| 0000022400 | C402 | 067E | 3A26 | 7405 | E903 | 0051 | 766B | 4AF8 |
| 0000022420 | 1EC4 | 1240 | FF26 | 4640 | 5E6B | 4AF8 | 36C4 | 1240 |
| 0000022440 | 8B26 | 6B00 | F876 | C44A | 401E | 2612 | 4039 | 7446 |
| 0000022460 | E903 | 000B | 46C7 | 01FA | E900 | 0081 | 1BE9 | A100 |
| 0000022500 | 11D6 | 8940 | FC46 | DAA1 | 6B11 | F876 | C44A | 401E |
| 0000022520 | 2612 | 4089 | C748 | FA46 | 0000 | 5DE9 | C400 | 065E |
| 0000022540 | 8A26 | 0147 | 766B | 4AF8 | 1EC4 | 1240 | 3826 | 0440 |
| 0000022560 | 0375 | 1FE9 | 6B00 | F876 | C44A | 401E | 2612 | 40C7 |
| 0000022600 | 0046 | 6B00 | F876 | C44A | 401E | 2612 | 40C7 | 0048 |
| 0000022620 | E900 | 0026 | 766B | 4AF8 | 1EC4 | 1240 | C726 | 4640 |
| 0000022640 | 0001 | 766B | 4AF8 | 1EC4 | 1240 | C726 | 4840 | 0001 |
| 0000022660 | 46C7 | 00FA | C700 | FC46 | 0001 | F0E9 | E9FE | 001E |
| 0000022700 | A42D | 7D00 | E903 | FEDD | 7F48 | E903 | FEBB | 4848 |
| 0000022720 | 037D | D0E9 | 48FE | 037F | B1E9 | E9FE | FEC7 | D6A1 |
| 0000022740 | C411 | 125E | 8926 | 8B07 | FA46 | C5E9 | FF00 | 0876 |
| 0000022760 | 76FF | 9A06 | 2268 | 21B0 | C483 | A104 | 11D6 | 462B |
| 0000023000 | C4FC | 0E5E | 8926 | 8B07 | FC46 | 0639 | 11D6 | 0377 |
| 0000023020 | 15E9 | FF00 | 0C76 | 76FF | 830A | 0A46 | 9A06 | 22A9 |
| 0000023040 | 21DC | C483 | E904 | FFDF | 9CE9 | A100 | 11D6 | C440 |
| 0000023060 | 0E5E | 8926 | 8307 | D63E | 0011 | 0377 | 15E9 | FF00 |
| 0000023100 | 0C76 | 76FF | 830A | 0A46 | 9A06 | 22A9 | 21F5 | C483 |
| 0000023120 | E904 | FFE1 | 066A | 76FF | FF08 | 0676 | 76FF | FF0C |
| 0000023140 | 0A76 | 389A | DE5A | 831F | 0AC4 | 5AE9 | C400 | 0E5E |
| 0000023160 | C726 | 0107 | 6B00 | F876 | C44A | 401E | 2612 | 408B |
| 0000023200 | C444 | 0A5E | 8926 | 0447 | 766B | 4AF8 | 1EC4 | 1240 |
| 0000023220 | 8B26 | 4240 | 5EC4 | 260A | 4789 | C402 | 0A5E | C626 |
| 0000023240 | BF07 | 46C7 | 00FC | 9A00 | 22FC | 2186 | 18E9 | E900 |
| 0000023260 | 0015 | 7540 | E903 | FF73 | 7548 | E903 | FF2F | 7548 |
| 0000023300 | E903 | FFA9 | 00E9 | 8B00 | FA46 | 00E9 | 5E00 | 835F |
| 0000023320 | 02ED | E58B | 5D1F | CB4D | 581E | 4590 | 8B55 | 1EEC |
| 0000023340 | D88E | EC81 | 0000 | 5657 | 468B | 8B06 | 0856 | 1E8B |
| 0000023360 | 11DA | CB8B | E3D1 | D903 | E3D1 | 8D1E | DCBF | 8B11 |
| 0000023400 | 1EF0 | 8E07 | A5DA | A5A5 | 9A1F | 2394 | 223A | 5F5E |
| 0000023420 | ED83 | 8B02 | 1FE5 | 4D5D | 1ECB | 9058 | 5545 | EC8B |
| 0000023440 | 8E1E | 81D8 | 00EC | 5700 | 8356 | D63E | 0011 | 0375 |
| 0000023460 | 28E9 | 6A00 | A106 | 11D8 | C88B | E0D1 | C103 | E0D1 |
| 0000023500 | DC05 | 1E11 | FF50 | 0876 | 76FF | 9A06 | 5A38 | 22E6 |
| 0000023520 | C483 | 9A0A | 235E | 229C | 06E9 | B800 | FFFE | 00E9 |
| 0000023540 | 5E00 | 835F | 02ED | E58B | 5D1F | CB4D | 581E | 4590 |
| 0000023560 | 8B55 | 1EEC | D88E | EC81 | 0004 | 5657 | 06C7 | 11D8 |
| 0000023600 | 0000 | 06C7 | 11DA | 0000 | 06C7 | 11D6 | 0000 | 46C7 |
| 0000023620 | 00FC | E900 | 0003 | 46FF | A1FC | 123C | 4639 | 72FC |
| 0000023640 | E903 | 001F | 766B | 4AFC | 1EC4 | 1240 | C726 | 4640 |
| 0000023660 | 0000 | 766B | 4AFC | 1EC4 | 1240 | C726 | 4840 | 0000 |
| 0000023700 | D3E9 | 5EFF | 835F | 02ED | E58B | 5D1F | CB4D | 581E |
| 0000023720 | 4590 | 8B55 | 1EEC | D88E | EC81 | 0000 | 5657 | 3E83 |
| 0000023740 | 11D8 | 740F | E903 | 0009 | 06C7 | 11D8 | 0000 | 04E9 |
| 0000023760 | FF00 | D806 | FF11 | D60E | 5E11 | 835F | 02ED | E58B |
| 0000024000 | 5D1F | CB4D | 581E | 4590 | 8B55 | 1EEC | D88E | EC81 |
| 0000024020 | 0000 | 5657 | 3E83 | 11DA | 740F | E903 | 0009 | 06C7 |
| 0000024040 | 11DA | 0000 | 04E9 | FF00 | DA06 | FF11 | D606 | 5E11 |
| 0000024060 | 835F | 02ED | E58B | 5D1F | CB4D | 581E | 4590 | 8B55 |
| 0000024100 | 1EEC | D88E | EC81 | 0000 | 5657 | B81E | 1C8C | D88E |
| 0000024120 | FC9A | DE22 | 1F22 | 5F5E | ED83 | 8B02 | 1FE5 | 4D5D |
| 0000024140 | 1ECB | 9058 | 5545 | EC8B | 8E1E | 81D8 | 90EC | 5700 |
| 0000024160 | 1E56 | DCB8 | 8E23 | 6AD8 | 9A01 | 293C | 23E3 | C483 |
| 0000024200 | 8902 | 7086 | 83FF | 70BE | 00FF | 0374 | 03E9 | E900 |

THU MAR 14 17:27:10 1991 CRV_ONS.DLL PAGE 12, LINE 650

| | | | | | | | | |
|---|---|---|---|---|---|---|---|---|
| 0000024220 | 0057 | 86C7 | FF72 | 0002 | 86C6 | FF76 | C701 | 7486 |
| 0000024240 | 09FF | C600 | 7A86 | 01FF | 86C7 | FF78 | 000A | 46C7 |
| 0000024260 | 28B6 | C700 | B446 | 0001 | 46C7 | 02B8 | C600 | BC46 |
| 0000024300 | C707 | BA46 | 0009 | 46C6 | 07C0 | 46C7 | 0ABE | C700 |
| 0000024320 | FC46 | 001A | 46C7 | 00FA | 8D00 | 7286 | 16FF | 6A50 |
| 0000024340 | 9A02 | 1CA4 | 240C | C483 | 1F06 | 5F5E | ED83 | 8B02 |
| 0000024360 | 1FE5 | 4D5D | 00CB | 581E | 4590 | 8B55 | 1EEC | D88E |
| 0000024400 | EC81 | 0008 | 5657 | 466B | 4406 | 9A50 | 5106 | 24F0 |
| 0000024420 | C483 | A302 | 1246 | 1689 | 1248 | 48A1 | 0B12 | 4606 |
| 0000024440 | 7412 | E903 | 0006 | F1B8 | E9FF | 0053 | 46A1 | 8B12 |
| 0000024460 | 4816 | 8912 | F846 | 5689 | C7FA | FC46 | 0000 | 03E9 |
| 0000024500 | FF00 | FC46 | 468B | 39FC | 0646 | 0377 | 2AE9 | 6A00 |
| 0000024520 | FF42 | 0A76 | 76FF | FF08 | FA76 | 76FF | 9AF8 | 5A38 |
| 0000024540 | 2474 | C483 | C40A | F85E | C726 | 4247 | 0000 | 4683 |
| 0000024560 | 4208 | 4683 | 44F8 | C8E9 | 8BFF | 0646 | 44A3 | 5E12 |
| 0000024600 | 835F | 02ED | E58B | 5D1F | CB4D | 581E | 4590 | 8B55 |
| 0000024620 | 1EEC | D88E | EC81 | 000E | 5657 | 44A1 | 0312 | 0646 |
| 0000024640 | 4689 | 6BFC | FC46 | 5044 | 36FF | 1248 | 36FF | 1246 |
| 0000024660 | CC9A | A258 | 8325 | 06C4 | 46A3 | 8912 | 4816 | A112 |
| 0000024700 | 1248 | 060B | 1246 | 0374 | 06E9 | B800 | FFF1 | 5DE9 |
| 0000024720 | A100 | 1246 | 168B | 1248 | 4689 | 89F6 | F856 | 44A1 |
| 0000024740 | 8912 | FA46 | 03E9 | FF00 | FA46 | 468B | 39FA | FC46 |
| 0000024760 | 0377 | 33E9 | 6A00 | FF42 | 0A76 | 76FF | 8308 | 0846 |
| 0000025000 | 6B42 | FA46 | 0344 | 4606 | 8B12 | 4816 | 5212 | 9A50 |
| 0000025020 | 5A38 | 249E | C483 | 6B0A | FA76 | C444 | 461E | 2612 |
| 0000025040 | 40C7 | 0042 | E900 | FFBF | 468B | A3FC | 1244 | 5F5E |
| 0000025060 | ED83 | 8B02 | 1FE5 | 4D5D | 1ECB | 9058 | 5545 | EC8B |
| 0000025100 | 8E1E | 81D8 | 08EC | 5700 | C756 | FC46 | 0000 | 03E9 |
| 0000025120 | FF00 | FC46 | 468B | 39FC | 4406 | 7712 | E903 | 00B7 |
| 0000025140 | 46C7 | 01F8 | C400 | 065E | 8B26 | 6B07 | FC5E | C444 |
| 0000025160 | 4636 | 2612 | 0039 | 0374 | 99E9 | C700 | FA46 | 000C |
| 0000025200 | 03E9 | FF00 | FA46 | 5EC4 | 8B06 | FA46 | 3926 | 7707 |
| 0000025220 | E903 | 002C | 768B | C1FA | 02E6 | 5EC4 | 2606 | 408A |
| 0000025240 | 6B04 | FC76 | 0311 | FA76 | E6C1 | C402 | 461E | 2612 |
| 0000025260 | 4038 | 7504 | E903 | 0005 | 46C7 | 00F8 | E900 | FFC3 |
| 0000025300 | 7E83 | 01F8 | 0374 | 4BE9 | 8B00 | FC46 | 4689 | E9FA |
| 0000025320 | 0003 | 46FF | 8BFA | FA46 | 0639 | 1244 | 0377 | 2CE9 |
| 0000025340 | 6A00 | 6B44 | FA46 | 0344 | 4606 | 8B12 | 4816 | 0512 |
| 0000025360 | 0044 | 5052 | 466B | 44FA | 0603 | 1246 | 168B | 1248 |
| 0000025400 | 5052 | 389A | C75A | 8326 | 0AC4 | C5E9 | FFFF | 440E |
| 0000025420 | E912 | 0003 | 3AE9 | 83FF | F87E | 7400 | E903 | 0006 |
| 0000025440 | ECB8 | E9FF | 0035 | 066B | 1244 | 5044 | 36FF | 1248 |
| 0000025460 | 36FF | 1246 | CC9A | 4358 | 8325 | 06C4 | 46A3 | 8912 |
| 0000025500 | 4816 | A112 | 1248 | 060B | 1246 | 0374 | 06E9 | B800 |
| 0000025520 | FFF1 | 06E9 | B800 | 0000 | 00E9 | 5E00 | 835F | 02ED |
| 0000025540 | E58B | 5D1F | CB4D | 581E | 4590 | 8B55 | 1EEC | D88E |
| 0000025560 | EC81 | 0000 | 5657 | 36FF | 1248 | 36FF | 1246 | 109A |
| 0000025600 | 9551 | 8326 | 04C4 | 06C7 | 1244 | 0000 | 5F5E | ED83 |
| 0000025620 | 8B02 | 1FE5 | 4D5D | 1ECB | 9058 | 5545 | EC8B | 8E1E |
| 0000025640 | 81D8 | 06EC | 5700 | 1E56 | 03B8 | 8E24 | C7D8 | FC46 |
| 0000025660 | 0000 | 5EC4 | 2606 | 478B | E91A | 0115 | 46C7 | 00FA |
| 0000025700 | E900 | 0003 | 46FF | 8BFA | FA46 | 0639 | 1244 | 0377 |
| 0000025720 | FBE9 | C400 | 065E | 8B26 | 1A47 | 766B | 44FA | 1EC4 |
| 0000025740 | 1246 | 7E6B | 11FA | 0326 | 4278 | E7C1 | C402 | 461E |
| 0000025760 | 2612 | 4139 | 7402 | E903 | 0082 | 5EC4 | 2606 | 478A |
| 0000026000 | 6B24 | FA76 | C444 | 461E | 6B12 | FA7E | 2611 | 7803 |
| 0000026020 | C142 | 02E7 | 1EC4 | 1246 | 3826 | 0441 | 0374 | 5BE9 |
| 0000026040 | 6B00 | FA76 | C444 | 461E | 2612 | 40FF | 6B42 | FA5E |
| 0000026060 | C444 | 4636 | 2612 | 008B | 766B | 44FA | 1EC4 | 1246 |

THU MAR 14 17:27:10 1991 CRV_ONS.DLL PAGE 13, LINE 709

| | | | | | | | | |
|---|---|---|---|---|---|---|---|---|
| 0000026100 | 3926 | 4240 | 0374 | 30E9 | C700 | FC46 | 0001 | 46C7 |
| 0000026120 | 00FA | E900 | 0003 | 46FF | 8BFA | FA46 | 0639 | 1244 |
| 0000026140 | 0377 | 11E9 | 6B00 | FA76 | C444 | 461E | 2612 | 40C7 |
| 0000026160 | 0042 | E900 | FFE0 | 55E9 | E900 | 004F | 5EC4 | 2606 |
| 0000026200 | 478B | 6B1A | FA76 | C444 | 461E | 2612 | 4039 | 7402 |
| 0000026220 | E903 | 0029 | 5EC4 | 2606 | 478A | 6B24 | FA76 | C444 |
| 0000026240 | 461E | 2612 | 4038 | 7404 | E903 | 0011 | 766B | 44FA |
| 0000026260 | 1EC4 | 1246 | C726 | 4240 | 0001 | 0EE9 | 6B00 | FA76 |
| 0000026300 | C444 | 461E | 2612 | 40C7 | 0042 | E900 | FEF6 | 12E9 |
| 0000026320 | 2D00 | 0009 | 037D | 0AE9 | 4800 | 7F48 | E903 | FEDC |
| 0000026340 | 00E9 | 8B00 | FC46 | 00E9 | 1F00 | 5F5E | ED83 | 8B02 |
| 0000026360 | 1FE5 | 4D5D | 04CA | 1E00 | 9058 | 5545 | EC8B | 8E1E |
| 0000026400 | 81D8 | 04EC | 5700 | 1E56 | 39B8 | 8E27 | C7D8 | FC46 |
| 0000026420 | 0000 | 03E9 | FF00 | FC46 | 468B | 39FC | 4406 | 7712 |
| 0000026440 | E903 | 0011 | 766B | 44FC | 1EC4 | 1246 | C726 | 4240 |
| 0000026460 | 0000 | E0E9 | 1FFF | 5F5E | ED83 | 8B02 | 1FE5 | 4D5D |
| 0000026500 | 1ECB | 9058 | 5545 | EC8B | 8E1E | 81D8 | 88EC | 5700 |
| 0000026520 | 1E56 | 99B8 | 8E28 | 6AD8 | 9A00 | 293C | 2927 | C483 |
| 0000026540 | 8902 | 7886 | 83FF | 78BE | 00FF | 0374 | 03E9 | E900 |
| 0000026560 | 002D | 86C7 | FF7A | 0002 | 86C6 | FF7E | C75A | 7C86 |
| 0000026600 | 09FF | C600 | 8246 | C75A | 8046 | 000A | 868D | FF7A |
| 0000026620 | 5016 | 016A | 869A | 1124 | 8327 | 06C4 | 00E9 | 1F00 |
| 0000026640 | 5F5E | ED83 | 8B02 | 1FE5 | 4D5D | 00CB | 581E | 4590 |
| 0000026660 | 8B55 | 1EEC | D88E | EC81 | 0030 | 5657 | 46C7 | 6FF2 |
| 0000026700 | 8C05 | F45E | 46C7 | 01EC | 2B01 | 89C0 | DC46 | 4689 |
| 0000026720 | 8EDA | 1206 | 260E | 3E83 | FFFF | 7500 | E903 | 001D |
| 0000026740 | 36FF | 05A4 | 36FF | 05A2 | 468D | 16D2 | 9A50 | FFFF |
| 0000026760 | 0000 | C483 | 3D08 | 0000 | 0374 | 0FE9 | 8E00 | 1406 |
| 0000027000 | 260E | 3E83 | 2A8D | 7500 | E903 | 003A | 681E | 0576 |
| 0000027020 | 468D | 16DE | 8D50 | D246 | 5016 | 468D | 16EE | 6A50 |
| 0000027040 | 1E66 | A668 | FF05 | A036 | FF05 | 9E36 | FF05 | A436 |
| 0000027060 | FF05 | A236 | 9A05 | FFFF | 0000 | C483 | 891E | EE46 |
| 0000027100 | 5689 | E9F0 | 0008 | C02B | 4689 | 89F0 | EE46 | 46C7 |
| 0000027120 | 00EA | 2B00 | 89C0 | F846 | 4689 | C7F6 | D046 | 0000 |
| 0000027140 | 006A | 006A | 468D | 16F6 | 6A50 | 6A00 | 6A00 | 6A00 |
| 0000027160 | 6A00 | 9A00 | 00D7 | 0000 | 4689 | 83EA | EA7E | 7400 |
| 0000027200 | E903 | 0044 | 7E83 | 0006 | 0375 | 1FE9 | FF00 | F876 |
| 0000027220 | 76FF | 1EF6 | 7D68 | 8D05 | D046 | 5016 | 468D | 16FA |
| 0000027240 | 9A50 | 2A51 | 0000 | 4689 | E9EA | 001C | 76FF | FFF8 |
| 0000027260 | F676 | 681E | 058E | 468D | 16D0 | 8D50 | FA46 | 5016 |
| 0000027300 | FF9A | 00FF | 8900 | EA46 | 76FF | FFF8 | F676 | 006A |
| 0000027320 | CE9A | 0001 | 8300 | EA7E | 7500 | E903 | 007E | 068E |
| 0000027340 | 0E12 | 8326 | 183E | 002B | 0375 | 09E9 | 8300 | D67E |
| 0000027360 | 74FE | E903 | 000F | 068E | 0E14 | 8326 | 303E | 002B |
| 0000027400 | 0375 | 51E9 | 8B00 | EA46 | 4689 | FFD8 | DC76 | 76FF |
| 0000027420 | 8DDA | D846 | 5016 | 76FF | FFEC | F476 | 76FF | 8DF2 |
| 0000027440 | DE4E | 5116 | 4E8D | 16EE | 8D51 | D24E | 5116 | 681E |
| 0000027460 | 05A6 | 8168 | FF00 | A036 | FF05 | 9E36 | FF05 | A436 |
| 0000027500 | FF05 | A236 | 9A05 | 2B79 | 0000 | C483 | 8B28 | D846 |
| 0000027520 | ACE9 | E900 | 0006 | 468B | E9EA | 00A3 | 76FF | FFFC |
| 0000027540 | FA76 | 76FF | FFD0 | 0676 | 9A9A | EC2B | 8328 | 08C4 |
| 0000027560 | 4689 | FFEA | D076 | 76FF | FFFC | FA76 | FF9A | 00FF |
| 0000027600 | 8E00 | 1206 | 260E | 3E83 | 2968 | 7500 | E903 | 0009 |
| 0000027620 | 7E83 | FED6 | 0374 | 0FE9 | 8E00 | 1406 | 260E | 3E83 |
| 0000027640 | FFFF | 7500 | E903 | 0051 | 468B | 89EA | D846 | 76FF |
| 0000027660 | FFDC | DA76 | 468D | 16D8 | FF50 | EC76 | 76FF | FFF4 |
| 0000027700 | F276 | 4E8D | 16DE | 8D51 | EE4E | 5116 | 4E8D | 16D2 |
| 0000027720 | 1E51 | A668 | C305 | 008A | 36FF | 05A0 | 36FF | 059E |
| 0000027740 | 36FF | 05A4 | 36FF | 05A2 | FF9A | 00FF | 8300 | 28C4 |

THU MAR 14 17:27:10 1991 CRV_ONS.DLL PAGE 14, LINE 768

| | | | | | | | | |
|---|---|---|---|---|---|---|---|---|
| 0000027760 | 468B | E9D8 | 0009 | 06E9 | 8B00 | EA46 | 00E9 | 5E00 |
| 0000030000 | 835F | 02ED | E58B | 5D1F | CB4D | 581E | 4590 | 8B55 |
| 0000030020 | 1EEC | D88E | EC81 | 0058 | 5657 | 46C7 | B4FA | 8C05 |
| 0000030040 | FC5E | 46C7 | 01EE | 2B01 | 89C0 | C046 | 4689 | 8EBE |
| 0000030060 | 1206 | 260E | 3E83 | 2CB4 | 7500 | E903 | 001D | 36FF |
| 0000030100 | 05A4 | 36FF | 05A2 | 468D | 16B2 | 9A50 | 297E | 0000 |
| 0000030120 | C483 | 3D08 | 0000 | 0374 | 0FE9 | 8E00 | 1406 | 260E |
| 0000030140 | 3E83 | 2CCC | 7500 | E903 | 003B | 681E | 05BB | 468D |
| 0000030160 | 16CA | 8D50 | B246 | 5016 | 468D | 16F2 | 6850 | 00A0 |
| 0000030200 | 681E | 0602 | 36FF | 05A0 | 36FF | 059E | 36FF | 05A4 |
| 0000030220 | 36FF | 05A2 | C69A | 0029 | 8300 | 1EC4 | 4689 | 89F2 |
| 0000030240 | F456 | 08E9 | 2B00 | 89C0 | F446 | 4689 | 2BF2 | 89C0 |
| 0000030260 | C446 | 4689 | 2BC2 | 89C0 | BC46 | 4689 | C7BA | EC46 |
| 0000030300 | 0000 | 7E83 | 0006 | 0375 | 26E9 | 6A00 | FF46 | 0876 |
| 0000030320 | 9E9A | 8959 | 832C | 04C4 | 4689 | 89BA | BC56 | 468B |
| 0000030340 | 0BBC | BA46 | 0374 | 05E9 | C700 | EC46 | 0007 | 23E9 |
| 0000030360 | 6A00 | FF42 | 0876 | 9E9A | 7259 | 832D | 04C4 | 4689 |
| 0000030400 | 89C2 | C456 | 468B | 0BC4 | C246 | 0374 | 05E9 | C700 |
| 0000030420 | EC46 | 0007 | 7E83 | 00EC | 0375 | 7EE9 | 8E00 | 1206 |
| 0000030440 | 260E | 3E83 | 2A75 | 7500 | E903 | 0009 | 7E83 | FEB6 |
| 0000030460 | 0374 | 0FE9 | 8E00 | 1406 | 260E | 3E83 | 2994 | 7500 |
| 0000030500 | E903 | 0051 | 468B | 89EC | B846 | 76FF | FFC0 | BE76 |
| 0000030520 | 468D | 16B8 | FF50 | EE76 | 76FF | FFFC | FA76 | 4E8D |
| 0000030540 | 16CA | 8D51 | F24E | 5116 | 4E8D | 16B2 | 1E51 | 0268 |
| 0000030560 | 6806 | 00B9 | 36FF | 05A0 | 36FF | 059E | 36FF | 05A4 |
| 0000030600 | 36FF | 05A2 | D69A | 002A | 8300 | 28C4 | 468B | E9B8 |
| 0000030620 | 041F | 06E9 | 8B00 | EC46 | 16E9 | C704 | F646 | 0000 |
| 0000030640 | 03E9 | FF00 | F646 | 468B | 39F6 | D846 | 0377 | 27E9 |
| 0000030660 | 8B03 | F65E | E3C1 | C402 | 0A76 | 8B26 | 2600 | 508B |
| 0000030700 | 8902 | AC46 | 5689 | 83AE | 067E | 7500 | E903 | 00D7 |
| 0000030720 | 468D | 16D6 | 1E50 | C268 | FF05 | AE76 | 76FF | 9AAC |
| 0000030740 | 57C2 | 2D97 | C483 | 890C | B046 | 7EB3 | 01B0 | 0375 |
| 0000030760 | 08E9 | C700 | EC46 | FFFF | DDE9 | 1E02 | CA68 | 8D05 |
| 0000031000 | D646 | 5016 | F29A | CD59 | 832D | 08C4 | 003D | 7400 |
| 0000031020 | E903 | 001D | 766B | 46F6 | 5EC4 | 26BA | 40C7 | 2844 |
| 0000031040 | 6B00 | F676 | C446 | BA5E | C726 | 4240 | 0001 | 3EE9 |
| 0000031060 | 1E00 | D768 | 8D05 | D646 | 5016 | F29A | FB59 | 832A |
| 0000031100 | 08C4 | 003D | 7400 | E903 | 001D | 766B | 46F6 | 5EC4 |
| 0000031120 | 26BA | 40C7 | 2844 | 6B00 | F676 | C446 | BA5E | C726 |
| 0000031140 | 4240 | 0001 | 08E9 | C700 | EC46 | FFFF | 69E9 | C402 |
| 0000031160 | AC5E | 8026 | 003F | 0375 | 12E9 | C400 | AC5E | 8026 |
| 0000031200 | 2D3F | 0375 | 06E9 | FF00 | AC46 | E2E9 | C4FF | AC5E |
| 0000031220 | 8026 | 003F | 0375 | 06E9 | FF00 | AC46 | 08E9 | C700 |
| 0000031240 | EC46 | FFFF | 31E9 | 8302 | 067E | 7500 | E903 | 000F |
| 0000031260 | 5E6B | 46F6 | 76C4 | 26BA | 00C7 | 0000 | 0CE9 | 6B00 |
| 0000031300 | F65E | C442 | C276 | C726 | 0000 | C700 | F046 | 0000 |
| 0000031320 | 5EC4 | 26AC | 3F80 | 7500 | E903 | 01B7 | 468D | 16D6 |
| 0000031340 | 8D50 | AA46 | 5016 | 681E | 05E3 | 76FF | FFAE | AC76 |
| 0000031360 | C29A | A457 | 832E | 10C4 | 4689 | 83B0 | B07E | 7502 |
| 0000031400 | E903 | 0008 | 46C7 | FFEC | E9FF | 0187 | 468D | 16D6 |
| 0000031420 | 9A50 | 546A | 2EBC | C483 | 8B04 | 80F0 | D57A | 742C |
| 0000031440 | E903 | 0013 | 468D | 16D6 | 9A50 | 546A | 2F46 | C483 |
| 0000031460 | 8B04 | C6F0 | D542 | 8D00 | D646 | 4689 | 8CC6 | C856 |
| 0000031500 | 5EC4 | 26C6 | 3F80 | 7500 | E903 | 0025 | 5EC4 | 26C6 |
| 0000031520 | 3F80 | 752C | E903 | 0019 | 5EC4 | 26C6 | 3F80 | 742C |
| 0000031540 | E903 | 0007 | 5EC4 | 26C6 | 07C6 | FF00 | C646 | CFE9 |
| 0000031560 | C4FF | AC5E | 8026 | 003F | 0375 | 1EE9 | C400 | AC5E |
| 0000031600 | 8026 | 2C3F | 0375 | 12E9 | C400 | AC5E | 8026 | 003F |
| 0000031620 | 0375 | 03E9 | FF00 | AC46 | D6E9 | C4FF | AC5E | 8026 |

THU MAR 14 17:27:10 1991 CRV_ONS.DLL PAGE 15, LINE 827

| | | | | | | | | |
|---|---|---|---|---|---|---|---|---|
| 0000031640 | 003F | 0375 | 03E9 | FF00 | AC46 | 681E | 05EE | 468D |
| 0000031660 | 16D6 | 9A50 | 59F2 | 2F67 | C483 | 3D08 | 0000 | 0374 |
| 0000031700 | 08E9 | C700 | F846 | 0009 | 4AE9 | 1E00 | F468 | 8D05 |
| 0000031720 | D646 | 5016 | F29A | 8859 | 832F | 08C4 | 003D | 7400 |
| 0000031740 | E903 | 0008 | 46C7 | 0AF8 | E900 | 0029 | 681E | 05FC |
| 0000031760 | 468D | 16D6 | 9A50 | 59F2 | 2C63 | C483 | 3D08 | 0000 |
| 0000032000 | 0374 | 08E9 | C700 | F846 | 000B | 08E9 | C700 | EC46 |
| 0000032020 | FFFF | 7EE9 | 8300 | 067E | 7500 | E903 | 0039 | 468A |
| 0000032040 | 6BAA | F676 | 8B46 | F04E | E1C1 | 0302 | C4F1 | BA5E |
| 0000032060 | 8826 | 0440 | 468B | 6BF8 | F676 | 8B46 | F04E | E1C1 |
| 0000032100 | 0302 | C4F1 | BA5E | 8926 | 0240 | 5E6B | 46F6 | 76C4 |
| 0000032120 | 26BA | 00FF | 36E9 | 8A00 | AA46 | 768B | C1F0 | 02E6 |
| 0000032140 | 4E6B | 42F6 | F103 | 5EC4 | 26C2 | 4068 | 8B04 | F846 |
| 0000032160 | 768B | C1F0 | 02E6 | 4E6B | 42F6 | F103 | 5EC4 | 26C2 |
| 0000032200 | 4089 | 6B02 | F65E | C442 | C276 | FF26 | FF00 | F046 |
| 0000032220 | 3DE9 | 83FE | 067E | 7500 | E903 | 0018 | 5E6B | 46F6 |
| 0000032240 | 76C4 | 26BA | 3883 | 7400 | E903 | 0005 | 46C7 | FFEC |
| 0000032260 | E9FF | 0015 | 5E6B | 42F6 | 76C4 | 26C2 | 3883 | 7400 |
| 0000032300 | E903 | 0005 | 46C7 | FFEC | 83FF | EC7E | 7500 | E903 |
| 0000032320 | 0003 | 03E9 | E900 | FCCB | 7E83 | 0006 | 0375 | 2BE9 |
| 0000032340 | 8300 | EC7E | 7400 | E903 | 0011 | 76FF | FFBC | BA76 |
| 0000032360 | 76FF | 9A08 | 1CA4 | 3094 | C483 | FF06 | BC76 | 76FF |
| 0000032400 | 9ABA | 5110 | 30B1 | C483 | E904 | 0028 | 7E83 | 00EC |
| 0000032420 | 0374 | 11E9 | FF00 | C476 | 76FF | FFC2 | 0876 | 869A |
| 0000032440 | BF24 | 8330 | 06C4 | 76FF | FFC4 | C276 | 109A | 8351 |
| 0000032460 | 832E | 04C4 | 068E | 0E12 | 8326 | C63E | 002B | 0375 |
| 0000032500 | 09E9 | 8300 | B67E | 74FE | E903 | 000F | 068E | 0E14 |
| 0000032520 | 8326 | F23E | 002B | 0375 | 50E9 | C700 | B846 | 0000 |
| 0000032540 | 76FF | FFC0 | BE76 | 468D | 16B8 | FF50 | EE76 | 76FF |
| 0000032560 | FFFC | FA76 | 4E8D | 16CA | 8D51 | F24E | 5116 | 4E8D |
| 0000032600 | 16B2 | 1E51 | 0268 | 6806 | 0151 | 36FF | 05A0 | 36FF |
| 0000032620 | 059E | 36FF | 05A4 | 36FF | 05A2 | 159A | 002D | 8300 |
| 0000032640 | 28C4 | 468B | E9B8 | 0009 | 06E9 | B800 | 0000 | 00E9 |
| 0000032660 | 5E00 | 835F | 02ED | E58B | 5D1F | CB4D | 0000 | 0000 |
| 0000032700 | 0000 | 0000 | 0000 | 0000 | 0000 | 0000 | 8B55 | 1EEC |
| 0000032720 | 1E68 | 1E06 | 2268 | 9A06 | FFFF | 0000 | 068E | 061E |
| 0000032740 | A126 | 0015 | 5EA3 | BB06 | 0628 | 1F8C | 65BE | 8312 |
| 0000032760 | FEE6 | 1E56 | FF9A | 00FF | 0B00 | 74C0 | 3304 | EBC0 |
| 0000033000 | 893A | 0477 | 894E | 2636 | 8306 | 03EE | 04C7 | 0001 |
| 0000033020 | 7789 | 8906 | 0877 | C683 | C702 | FE04 | 89FF | 0A77 |
| 0000033040 | 681E | 061C | 681E | 061A | FF9A | 00FF | E800 | 0020 |
| 0000033060 | 209A | 8634 | E830 | 0066 | 01B8 | 5D00 | 50CB | DE9A |
| 0000033100 | C333 | 9A31 | 3558 | 31D1 | FF68 | 9A00 | 32E7 | 31D6 |
| 0000033120 | BB1E | 000D | FF33 | 068E | 061C | FFB9 | 267F | 3D80 |
| 0000033140 | 7500 | 4701 | 8026 | 003D | 3174 | 3CBE | 8B06 | 8BD1 |
| 0000033160 | F3CB | 8BA6 | 74CA | 3308 | F2C0 | 74AE | EBE7 | 061C |
| 0000033200 | 071E | F78B | BF1F | 0663 | 2CAC | 7241 | C00E | 04E0 |
| 0000033220 | AC92 | 412C | 0572 | C20A | EBAA | 1FED | 00C3 | 02BB |
| 0000033240 | 5200 | D48B | A780 | 0663 | 50B7 | C48B | 1653 | 1650 |
| 0000033260 | 9A52 | FFFF | 0000 | C00B | 7558 | B110 | 3C40 | 7401 |
| 0000033300 | 3C06 | 7502 | B106 | 0808 | 638F | 4B06 | D679 | E85A |
| 0000033320 | 0026 | 00BE | BF0E | 0E00 | 5FE8 | BE01 | 0E00 | 00BF |
| 0000033340 | E80E | 0156 | 00B8 | 3D0E | 0E04 | 0B74 | 016A | 680E |
| 0000033360 | 32B9 | FF9A | 00FF | C300 | 0E8B | 0DF6 | 2AE3 | 06C4 |
| 0000033400 | 0DF8 | C28C | DB33 | 1EFF | 0DF4 | 0373 | 61E9 | 8E01 |
| 0000033420 | 2206 | 2606 | 1E8B | 0006 | 754B | C40D | FC06 | 8C0D |
| 0000033440 | BBC2 | 0003 | 1EFF | 0DF4 | B8C3 | 28E3 | D88E | 73A1 |
| 0000033460 | 0B08 | 75C0 | 0E10 | EEA1 | 0B0D | 75C0 | E805 | 001F |
| 0000033500 | 03EB | 24E8 | 6A00 | 6A03 | 6A00 | 9A00 | 3283 | 0000 |

THU MAR 14 17:27:10 1991 CRV_ONS.DLL PAGE 16, LINE 886

| | | | | | | | | |
|---|---|---|---|---|---|---|---|---|
| 0000033520 | 8B55 | 33EC | EBC9 | 551A | EC8B | 01B9 | EB00 | 5512 |
| 0000033540 | EC8B | 5756 | 00B9 | EB01 | 5508 | EC8B | 5756 | 01B9 |
| 0000033560 | E801 | 004B | 0A51 | 75C9 | BE12 | 1258 | 58BF | E812 |
| 0000033600 | 00B8 | 00BE | BF0E | 0E04 | AFE8 | BE00 | 0E04 | 04BF |
| 0000033620 | E80E | 00A6 | 04BE | BF0E | 0E04 | 9DE8 | E800 | 008C |
| 0000033640 | 0A58 | 75E4 | C713 | 7306 | 0108 | B800 | 0001 | 8A50 |
| 0000033660 | 0646 | 9A50 | FFFF | 0000 | 4EE8 | 5F00 | 5D5E | 55CB |
| 0000033700 | EC8B | 0D6A | 79E8 | 8322 | 02C4 | 068E | 0622 | 8B26 |
| 0000033720 | 061E | 4B00 | 168B | 0875 | FA83 | 75FF | 8904 | 751E |
| 0000033740 | 3908 | 751E | 9F08 | 0D6A | 7FE8 | 8322 | 02C4 | 749E |
| 0000033760 | 6A0A | E80E | 222A | C483 | EB02 | 3BC7 | 74D3 | 6A08 |
| 0000034000 | E80E | 223C | C483 | 5D02 | 55C3 | EC8B | 0D6A | 2FE8 |
| 0000034020 | 8322 | 02C4 | 06C7 | 0875 | FFFF | 0D6A | 4BE8 | 8322 |
| 0000034040 | 02C4 | 0E6A | 43E8 | 8322 | 02C4 | C35D | 0E8B | 0DF6 |
| 0000034060 | 07E3 | 02BB | FF00 | F41E | C30D | F73B | 0E73 | EF83 |
| 0000034100 | 8B04 | 0B05 | 0245 | F274 | 1DFF | EEEB | 00C3 | 8B55 |
| 0000034120 | B8EC | 00FC | 0E50 | 6FE8 | 8301 | 7A3E | 0008 | 0474 |
| 0000034140 | 1EFF | 0878 | FFB8 | 5000 | E80E | 015C | E58B | CB5D |
| 0000034160 | 02B8 | E900 | FDC7 | 5A59 | DC8B | D82B | 0B72 | FB81 |
| 0000034200 | 0200 | 0572 | E38B | 5152 | 52CB | 3351 | E9C0 | FDAD |
| 0000034220 | 14C8 | 0000 | 5657 | FF2B | F78B | 3639 | 061C | 0375 |
| 0000034240 | F0E9 | A100 | 061C | C92B | 4E89 | 89F4 | F646 | 4E89 |
| 0000034260 | 89F8 | FA46 | 0C6A | 76FF | FFFA | F876 | 681E | 063C |
| 0000034300 | 829A | 9454 | 8334 | 0AC4 | C00B | 1A74 | 8146 | FFFE |
| 0000034320 | 767F | E903 | 00BD | 5EC4 | FFF8 | F846 | 8026 | 003F |
| 0000034340 | EA75 | EB47 | 900D | 5EC4 | FFF8 | F846 | 8026 | 003F |
| 0000034360 | F475 | 5E8B | 26F8 | 3F80 | 7500 | 8DB9 | 0145 | 6A50 |
| 0000034400 | 9A04 | 599E | 34A3 | C483 | 8904 | F046 | 5689 | 56F2 |
| 0000034420 | 069A | D951 | 8334 | 02C4 | 4689 | 89FC | FE56 | 468B |
| 0000034440 | 0BF2 | F046 | 6D74 | C28B | 460B | 74FC | 8B66 | F046 |
| 0000034460 | 568B | A3F2 | 0869 | 1689 | 086B | 0C6A | 76FF | FFF6 |
| 0000034500 | F476 | 681E | 063C | 829A | DE54 | 8331 | 0AC4 | C00B |
| 0000034520 | 2C74 | 468B | 8BFC | FE56 | 5EC4 | 83F0 | F046 | 2604 |
| 0000034540 | 0789 | 8926 | 0257 | 5EC4 | FFF4 | F446 | 8A26 | C407 |
| 0000034560 | FC5E | 46FF | 26FC | 0788 | C00A | 0E74 | E8EB | 5EC4 |
| 0000034600 | FFF4 | F446 | 8026 | 003F | F475 | 5EC4 | 26F4 | 3F80 |
| 0000034620 | 7500 | 5EA7 | C95F | 90CB | 8B55 | 56EC | B857 | 32BA |
| 0000034640 | D88E | C08E | 568B | BE06 | 0E20 | 3BAD | 74C2 | 4010 |
| 0000034660 | 7496 | 970C | C033 | FFB9 | F2FF | 8BAE | EBF7 | 96EB |
| 0000034700 | 5E5F | E58B | CA5D | 0002 | 8B55 | 57EC | 76FF | 0E06 |
| 0000034720 | C5E8 | 0BFF | 74C0 | 921F | FA8B | C033 | FFB9 | F2FF |
| 0000034740 | F7AE | 49D1 | 8B50 | BBC4 | 0002 | 1E53 | 5152 | 5016 |
| 0000034760 | E99A | 0016 | 5B00 | 8B5F | 5DE5 | 02CA | 0000 | 1601 |
| 0000035000 | 0202 | 0203 | 1804 | 0D05 | 0906 | 0C07 | 0C08 | 0C09 |
| 0000035020 | 070A | 080B | 160C | 160D | 020F | 0D10 | 1211 | 0212 |
| 0000035040 | 0235 | 0D41 | 0243 | 0D52 | 0D53 | 0D57 | 0B59 | 0D6C |
| 0000035060 | 206D | 1C70 | 0972 | 1606 | 0A80 | 0A81 | 0982 | 0D84 |
| 0000035100 | 0BA4 | 02CE | 0BD7 | 0D00 | 1608 | 8B52 | E8D8 | 2168 |
| 0000035120 | 8E93 | 5AC2 | 8926 | 0247 | 8926 | B817 | FFFF | 8B99 |
| 0000035140 | 5DE5 | E8CB | 0008 | FFB8 | 99FF | E58B | CB5D | D88B |
| 0000035160 | 45E8 | 9321 | C28E | 8926 | 0247 | BB53 | 358E | 24B9 |
| 0000035200 | 0A00 | 75E4 | 2E1B | 073A | 1674 | 4343 | F7E2 | 133C |
| 0000035220 | 0472 | 243C | 0A76 | 3C43 | 72BC | 3C04 | 76CA | 4301 |
| 0000035240 | 8A2E | 0147 | 5B98 | 8926 | C307 | 8B55 | BBEC | 0002 |
| 0000035260 | 05EB | 8B55 | 33EC | E8DB | 20FE | C303 | CB5D | 04C8 |
| 0000035300 | 0000 | 46C7 | FFFC | C4FF | 065E | F626 | 0A47 | 7440 |
| 0000035320 | 2607 | 47C6 | 000A | 2CEB | C38B | 862D | B908 | 000C |
| 0000035340 | F799 | 89F9 | FE46 | E850 | 1F06 | C483 | FF02 | 0876 |
| 0000035360 | 76FF | 9A06 | 369A | 36B4 | C483 | 8904 | FC46 | 76FF |

THU MAR 14 17:27:10 1991 CRV_ONS.DLL PAGE 17, LINE 945

| | | | | | | | | |
|---|---|---|---|---|---|---|---|---|
| 0000035400 | E8FE | 1EF8 | 468B | C9FC | 90CB | 10C8 | 0000 | 5657 |
| 0000035420 | FFBF | 8BFF | 0676 | 44F6 | 830A | 0375 | 97E9 | 1E00 |
| 0000035440 | 9A56 | 3C06 | 36D9 | C483 | 8B04 | 8BF8 | 81DE | 86EB |
| 0000035460 | 8B08 | 6A87 | 890A | FA46 | 561E | BDE8 | 8302 | 04C4 |
| 0000035500 | 448A | 2A0B | 50E4 | 349A | F44B | 8336 | 02C4 | C00B |
| 0000035520 | 617C | 7E83 | 00FA | 5E74 | 681E | 0880 | 468D | 16F0 |
| 0000035540 | 9A50 | 540A | 3714 | C483 | 8D08 | F246 | 4689 | 8CFC |
| 0000035560 | FE56 | 7E80 | 5CF0 | 1474 | 681E | 0882 | 468D | 16F0 |
| 0000035600 | 9A50 | 53C4 | 372D | C483 | EB08 | 9004 | 4EFF | 6AFC |
| 0000035620 | FF0A | FE76 | 73FF | FFFC | FA76 | BE9A | 3A54 | 8337 |
| 0000035640 | 08C4 | 468D | 16F0 | 9A50 | 5B42 | 3453 | C483 | 0B04 |
| 0000035660 | 74C0 | BF03 | FFFF | 44C6 | 000A | C78B | 5F5E | CBC9 |
| 0000035700 | 08C8 | 0000 | 129A | 7E4A | 8937 | FC46 | 5689 | 0BFE |
| 0000035720 | 75D0 | 2B05 | 99C0 | 37EB | 76FF | 50FE | 76FF | FF0E |
| 0000035740 | 0C76 | 76FF | FF0A | 0876 | 76FF | 9A06 | 3A0E | 37B6 |
| 0000035760 | C483 | 890E | F846 | 5689 | 8BFA | FC46 | 862D | B908 |
| 0000036000 | 000C | F799 | 50F9 | F3E8 | 8B1D | F846 | 568B | C9FA |
| 0000036020 | 90CB | 8B55 | 6AEC | FF40 | 0C76 | 76FF | FF0A | 0876 |
| 0000036040 | 76FF | 9A06 | 3750 | 3686 | CBC9 | 08C8 | 0000 | B857 |
| 0000036060 | 0001 | E850 | 1DBA | C483 | 1E02 | 9268 | E808 | 0330 |
| 0000036100 | C483 | 8B04 | 8DF8 | 0A46 | 5016 | 76FF | FF08 | 0676 |
| 0000036120 | 681E | 0892 | 289A | 5745 | 8337 | 0CC4 | 4689 | 1EF8 |
| 0000036140 | 9268 | 5708 | 81E8 | 8303 | 06C4 | 016A | 8DE8 | 831D |
| 0000036160 | 02C4 | 468B | 5FF8 | CBC9 | 8B55 | 56EC | 8B57 | 0676 |
| 0000036200 | 448A | A80A | 7483 | A85F | 7540 | A85B | 7502 | 0C48 |
| 0000036220 | 8801 | 0A44 | FE8B | EF81 | 0886 | C781 | 0A66 | 0CA8 |
| 0000036240 | 0D75 | 05F6 | 7501 | 1E08 | E856 | 0186 | C483 | 8B04 |
| 0000036260 | 0644 | 0489 | 75FF | FF02 | 0874 | 3350 | 8ADB | 0B5C |
| 0000036300 | 0E53 | 75E8 | 8315 | 08C4 | C00B | 1174 | FF3D | 75FF |
| 0000036320 | 801A | 0A4C | EB20 | 800A | 0A4C | EB20 | 8009 | 0A4C |
| 0000036340 | C710 | 0444 | 0000 | FFB8 | EBFF | 8A25 | 63BF | 8006 |
| 0000036360 | 82E7 | FF80 | 7582 | 8A0B | 0A7C | C7F6 | 7582 | 8003 |
| 0000036400 | 200D | 8948 | 0444 | 1CC4 | C033 | 8A26 | 4307 | 1C89 |
| 0000036420 | 5E5F | CB5D | 8B55 | 56EC | 8B57 | 0876 | 448A | A80A |
| 0000036440 | 7482 | A864 | 7540 | C760 | 0444 | 0000 | 01A8 | 0B74 |
| 0000036460 | 10A8 | 5374 | 4C8B | 8906 | 240C | 0CFE | 2402 | 88EF |
| 0000036500 | 0A44 | FE8B | EF81 | 0886 | C781 | 0A66 | DB33 | 5C8A |
| 0000036520 | A80B | 7508 | A84B | 7504 | F618 | 0105 | 4275 | FE81 |
| 0000036540 | 0892 | 0674 | FE81 | 089E | 2675 | 87F6 | 0663 | 7440 |
| 0000036560 | B91F | 0001 | 1651 | 7E8D | 5706 | 0E53 | 23E8 | 8316 |
| 0000036600 | 08C4 | 01B9 | EB00 | B846 | FFFF | 4C80 | 200A | 65EB |
| 0000036620 | 1E53 | E856 | 009C | C483 | 5B04 | 44F6 | 080A | D174 |
| 0000036640 | 0C8B | 548B | 2B06 | 42CA | 1489 | 558B | 4A02 | 5489 |
| 0000036660 | E304 | 5125 | FF51 | 0874 | 74FF | 5306 | E80E | 15E2 |
| 0000036700 | C483 | 5908 | 7CC4 | 8B06 | 0656 | 8826 | 3B15 | 75C1 |
| 0000036720 | 33B6 | 8AC0 | 0646 | 1DEB | C033 | 87F6 | 0663 | 7420 |
| 0000036740 | B9E3 | 0002 | 5051 | 5350 | E80E | 1202 | C483 | 3308 |
| 0000036760 | 8BC0 | EBC8 | 5FCF | 5D5E | 00CB | 8B55 | 56EC | 768B |
| 0000037000 | 8A04 | 0A44 | 83A8 | 2674 | 08A8 | 2274 | 74FF | FF08 |
| 0000037020 | 0674 | 109A | E751 | 8337 | 04C4 | 6480 | F70A | C033 |
| 0000037040 | 4489 | 8906 | 0844 | 0489 | 4489 | 8902 | 0444 | 5D5E |
| 0000037060 | 00C3 | 8B55 | 56EC | 768B | B804 | 0200 | 9A50 | 5106 |
| 0000037100 | 39A5 | 8B59 | 81DE | 86EB | 8108 | 66C3 | 0B0A | 74D2 |
| 0000037120 | 800B | 0A4C | C708 | 0247 | 0200 | 0EEB | 4C80 | 040A |
| 0000037140 | 47C7 | 0102 | 8C00 | 8DDA | 0147 | 5489 | 8902 | 8904 |
| 0000037160 | 0854 | 4489 | C706 | 0444 | 0000 | 5D5E | 00C3 | 08C8 |
| 0000037200 | 0000 | 5657 | 5EC4 | 260A | 078A | 3D98 | 0077 | 4874 |
| 0000037220 | 0877 | 612C | 4C74 | 112C | 0674 | C02B | E999 | 00CC |
| 0000037240 | F62B | 46C6 | 01FC | 46C7 | 01FE | FF00 | 0A46 | 5EC4 |

THU MAR 14 17:27:10 1991 CRV_ONS.DLL PAGE 18, LINE 1004

| | | | | | | | | |
|---|---|---|---|---|---|---|---|---|
| 0000037260 | 260A | 3F80 | 7400 | 835B | FE7E | 7400 | 2655 | 078A |
| 0000037300 | 3D98 | 0074 | 3474 | 0877 | 2B2C | 1C74 | 372C | 3674 |
| 0000037320 | 46C7 | 00FE | EB00 | 90D4 | 01BE | C603 | FC46 | EB02 |
| 0000037340 | 90C5 | 09BE | EB01 | 90F4 | C6F7 | 0002 | E275 | CE83 |
| 0000037360 | 8302 | FEE6 | 46C6 | 80FC | B1EB | C6F7 | C000 | D075 |
| 0000037400 | CE81 | 4000 | A5EB | C6F7 | C000 | C475 | CE81 | 8000 |
| 0000037420 | 99EB | A468 | FF01 | 0E76 | FF56 | 0876 | 76FF | 9A06 |
| 0000037440 | 4BEC | 39D0 | C483 | 890A | FA46 | C00B | 037D | 69E9 |
| 0000037460 | FFFF | 8406 | 8B08 | 107E | C78B | 862D | 0508 | 0A66 |
| 0000037500 | 4689 | 8AF8 | FC46 | 4588 | 8B0A | F85E | 07C6 | 2B0C |
| 0000037520 | 89C0 | 0445 | 4789 | 8904 | 0245 | 0589 | 4589 | 8908 |
| 0000037540 | 0645 | 468A | 88FA | 0B45 | C78B | DA8C | 5F5E | CBC9 |
| 0000037560 | 8B55 | 56EC | 8B57 | 0476 | 4ABB | 810C | 92FE | 7408 |
| 0000037600 | BB09 | 0C4E | FE81 | 089E | 5875 | FE8B | EF81 | 0886 |
| 0000037620 | C781 | 0A66 | 44F6 | 0C0A | 4875 | 05F6 | 7501 | 8B43 |
| 0000037640 | 8B07 | 0257 | C88B | CA0B | 2174 | 4489 | 8906 | 0854 |
| 0000037660 | 0489 | 5489 | C702 | 0444 | 0200 | 45C7 | 0002 | 8002 |
| 0000037700 | 0A4C | C602 | 1105 | 01B8 | EB00 | 5319 | 00B8 | 5002 |
| 0000037720 | 069A | B251 | 5B3A | 0B5B | 74D2 | 8907 | 8907 | 0257 |
| 0000037740 | C8EB | C033 | 5E5F | C35D | 8B55 | 56EC | 8B57 | 0676 |
| 0000037760 | FE8B | EF81 | 0886 | C781 | 0A66 | 05F6 | 7410 | 332D |
| 0000040000 | 8ADB | 0B5C | 87F6 | 0663 | 7440 | 1E21 | 0E56 | 65E8 |
| 0000040020 | 8300 | 04C4 | 7E83 | 0004 | 1274 | C033 | 0588 | 4589 |
| 0000040040 | 8902 | 8904 | 0244 | 4489 | 8906 | 0844 | 5E5F | C35D |
| 0000040060 | 04C8 | 0000 | 468B | 0B08 | 0646 | 0875 | 006A | A7E8 |
| 0000040100 | EB00 | 9031 | 468B | 2D06 | 0886 | 0CB9 | 9900 | F9F7 |
| 0000040120 | 4689 | 50FC | 99E8 | 8319 | 02C4 | 76FF | FF08 | 0676 |
| 0000040140 | 069A | 4A3C | 833C | 04C4 | 4689 | FFFE | FC76 | 8BE8 |
| 0000040160 | 8B19 | FE46 | CBC9 | 02C8 | 0000 | 5657 | FF2B | 768B |
| 0000040200 | 8A06 | 0A44 | C88B | 0324 | 023C | 3F75 | C1F6 | 7508 |
| 0000040220 | 8B0D | 81DE | 86EB | F608 | 6687 | 010A | 2D74 | 048B |
| 0000040240 | 442B | 8906 | FE46 | C00B | 217E | FF50 | 0874 | 74FF |
| 0000040260 | 8A06 | 0B4C | ED2A | 9A51 | 4F32 | 3CC7 | C483 | 3908 |
| 0000040300 | FE46 | 0774 | 4C80 | 200A | FFBF | 8BFF | 0644 | 548B |
| 0000040320 | 8908 | 8904 | 0254 | 44C7 | 0004 | 8B00 | 5EC7 | C95F |
| 0000040340 | 90CB | 016A | 01E8 | CB00 | 04C8 | 0000 | 5657 | 86BE |
| 0000040360 | 2B08 | 89FF | FE7E | 026A | 45E8 | 8319 | 02C4 | 11EB |
| 0000040400 | 46C7 | FFFE | FFFF | FC76 | F1E8 | 8318 | 02C4 | C683 |
| 0000040420 | 390C | 4636 | 720C | 8B2B | 2DC6 | 0886 | 0CB9 | 9900 |
| 0000040440 | F9F7 | 4689 | 50FC | C7E8 | 8318 | 02C4 | 44F6 | 830A |
| 0000040460 | D374 | 561E | 069A | 633C | 833B | 04C4 | 7440 | 47C1 |
| 0000040500 | C3EB | 026A | 23E8 | 8319 | 02C4 | 7E83 | 0104 | 0475 |
| 0000040520 | C78B | 03EB | 468B | 5EFE | C95F | 02C2 | 9000 | 8B55 |
| 0000040540 | B8EC | 01B4 | 069A | A834 | 573E | C656 | B846 | 2B00 |
| 0000040560 | 89C0 | E846 | 4689 | C4C6 | 0A5E | 8026 | 003F | 0375 |
| 0000040600 | 5FE9 | 2607 | 1F8A | FF2A | 87F6 | 0CED | 7408 | FF2D |
| 0000040620 | E84E | 468D | 16E8 | FF50 | 0876 | 76FF | E806 | 07C6 |
| 0000040640 | FF50 | 0876 | 76FF | E806 | 07A0 | 46FF | C40A | 0A5E |
| 0000040660 | 8A26 | 2A1F | F6FF | ED87 | 080C | EE75 | 5E8B | 260A |
| 0000040700 | 3F80 | 7425 | E903 | 06F2 | 46C6 | 00C0 | C02A | 4688 |
| 0000040720 | 88FC | B646 | 4688 | 88F2 | F646 | 4688 | 88EE | 5286 |
| 0000040740 | 2BFE | 89C0 | EA46 | 4689 | 89BA | FE46 | 4689 | 89C4 |
| 0000040760 | C246 | 68EB | 9090 | 46FF | C40A | 0A5E | 8A26 | 2A07 |
| 0000041000 | 8BE4 | F6F8 | ED85 | 040C | 1A74 | 46FF | 8BBA | FE46 |
| 0000041020 | C88B | E0C1 | 0302 | D1C1 | 03E0 | 2DC7 | 0030 | 4689 |
| 0000041040 | EBFE | 9039 | 6C3D | 7400 | 771C | 3C2D | 744C | 7F13 |
| 0000041060 | 2C1F | 742A | 2C15 | 741C | EB23 | 901D | 46FE | EBFC |
| 0000041100 | 901B | 46FE | FEF6 | F646 | 12EB | 46FE | EBEE | 900D |
| 0000041120 | 4E2C | 0874 | 1A2C | E474 | 86FE | FE52 | BE80 | FE52 |

THU MAR 14 17:27:10 1991 CRV_ONS.DLL PAGE 19, LINE 1063

| | | | | | | | | |
|---|---|---|---|---|---|---|---|---|
| 0000041140 | 7400 | 8093 | EE7E | 7500 | C414 | 0E5E | 4683 | 040E |
| 0000041160 | 8B26 | 2607 | 578B | 8902 | F846 | 5689 | C6FA | 5286 |
| 0000041200 | 00FE | 5EC4 | 260A | 078A | 200C | E42A | F88B | FF83 |
| 0000041220 | 746E | 8329 | 63FF | 1674 | FF83 | 747B | 8D11 | E846 |
| 0000041240 | 5016 | 76FF | FF08 | 0676 | BBE8 | EB06 | 900D | 46FF |
| 0000041260 | FFE8 | 0876 | 76FF | E806 | 0662 | F08B | 7E83 | 00BA |
| 0000041300 | 0974 | 7E83 | 00FE | 0375 | 83E9 | 8B05 | E9C7 | 05A0 |
| 0000041320 | 7E83 | 00BA | 0675 | 46FF | FFBA | FE46 | 46C7 | 58BC |
| 0000041340 | 8C0C | BE5E | 23EB | 46C7 | 52BC | EB0C | 90F4 | 46FF |
| 0000041360 | C40A | 0A5E | 5E89 | 8CBC | BE46 | 8026 | 5E3F | 0C75 |
| 0000041400 | 478D | 8901 | BC46 | 468C | FEBE | B64E | 206A | 006A |
| 0000041420 | 468D | 16C8 | 9A50 | 5A96 | 3BF3 | C483 | 8308 | 7BFF |
| 0000041440 | 0374 | A9E9 | C400 | BC5E | 8026 | 5D3F | 0374 | 9DE9 |
| 0000041460 | C600 | C046 | FF5D | BC46 | 46C6 | 20D3 | 8FE9 | 9000 |
| 0000041500 | 8A26 | 8807 | F446 | 46FF | 3CBC | 752D | 800F | C07E |
| 0000041520 | 7400 | 8B09 | BC5E | 8026 | 5D3F | 1E75 | 5E8A | 88F4 |
| 0000041540 | C05E | 01B0 | CB8A | E180 | C007 | 03EB | FF2A | 568D |
| 0000041560 | 03C8 | D2DA | 36E0 | 0708 | 54EB | 46FF | 26BC | 078A |
| 0000041600 | 4688 | 3AF4 | C046 | 0676 | 4688 | EBF0 | 900D | 468A |
| 0000041620 | 88C0 | F046 | 468A | 88F4 | C046 | 468A | 88C0 | F446 |
| 0000041640 | 1CEB | 5E8A | B0F4 | 8A01 | 80CB | 07E1 | EBC0 | 2A03 |
| 0000041660 | 8DFF | C856 | DA03 | E0D2 | 0836 | FE07 | F446 | 468A |
| 0000041700 | 98F0 | 4E8A | 2AF4 | 3BED | 7DC1 | 88D7 | C06E | 5EC4 |
| 0000041720 | 26BC | 3F80 | 745D | E903 | FF66 | 8026 | 003F | 0375 |
| 0000041740 | FFE9 | 8304 | 7BFF | 0A75 | C38B | C28C | 4689 | 890A |
| 0000041760 | 0C56 | 468B | 8BF8 | FA56 | 8689 | FE54 | 9689 | FE56 |
| 0000042000 | 7E83 | 00BA | 0A74 | 468B | FFFE | FE4E | C00B | 4E74 |
| 0000042020 | FE83 | 74FF | 8B49 | C1DE | 03FB | 468D | 03C8 | 36D8 |
| 0000042040 | 078A | 4632 | 98B6 | 01BA | 8B00 | 8BCE | 80D9 | 07E1 |
| 0000042060 | E2D3 | C285 | 2874 | 7E80 | 00EE | 0E75 | C68B | 5EC4 |
| 0000042100 | FFF8 | F846 | 8826 | EB07 | 9005 | 86FF | FE54 | 46FF |
| 0000042120 | FFE8 | 0876 | 76FF | E806 | 04C2 | F08B | A2EB | 4EFF |
| 0000042140 | 56E8 | 76FF | FF08 | 0676 | DFE8 | 8B04 | F846 | 568B |
| 0000042160 | 39FA | 5486 | 75FE | 3909 | 5696 | 75FE | E903 | 0462 |
| 0000042200 | 7E80 | 00EE | 0374 | 29E9 | FF04 | C646 | FF83 | 7563 |
| 0000042220 | E903 | 041E | C28E | D88B | C626 | 0007 | 13E9 | 9004 |
| 0000042240 | 64BF | 8300 | 0DFE | 0675 | 46FE | EBF2 | 9006 | FE83 |
| 0000042260 | 752B | FF1F | FE4E | 0C75 | 7E83 | 00BA | 0674 | 86FE |
| 0000042300 | FE52 | 0EEB | 46FF | FFE8 | 0876 | 76FF | E806 | 044C |
| 0000042320 | F08B | FE83 | 7430 | E903 | 0155 | 46FF | FFE8 | 0876 |
| 0000042340 | 76FF | E806 | 0436 | F08B | 783C | 0474 | 583C | 1475 |
| 0000042360 | 46FF | FFE8 | 0876 | 76FF | E806 | 0420 | F08B | 78BF |
| 0000042400 | E900 | 012B | 46FF | 83EA | 78FF | 0674 | 6FBF | E900 |
| 0000042420 | 011D | 4EFF | 56E8 | 76FF | FF08 | 0676 | 2BE8 | BE04 |
| 0000042440 | 0030 | 0AE9 | 9001 | 7E80 | 00FC | 0675 | 46FE | BFF6 |
| 0000042460 | 0046 | FE83 | 752D | FE05 | F246 | 08EB | FE83 | 742B |
| 0000042500 | E903 | 00EB | 4EFF | 74FE | E903 | 0095 | 7E83 | 00BA |
| 0000042520 | 0375 | 8CE9 | FE00 | 5286 | E9FE | 00D3 | FF83 | 7478 |
| 0000042540 | 830D | 70FF | 0874 | FF83 | 7446 | E903 | 0084 | 84F6 |
| 0000042560 | 0CED | 7480 | 6A15 | 8D04 | C246 | 5016 | 829A | 9D5B |
| 0000042600 | 5641 | 79E8 | 8B03 | EBF0 | 9036 | FF83 | 7546 | 832C |
| 0000042620 | EA7E | 7400 | 8326 | 3AFE | 1C75 | 468B | 89C2 | EC46 |
| 0000042640 | C02B | 4689 | 89C4 | C246 | 46C7 | FFEA | BFFF | 0070 |
| 0000042660 | 30BE | EB00 | 900A | 46C7 | 00EA | FE00 | 5286 | 80FE |
| 0000042700 | 52BE | 00FE | 5C75 | 46FF | 8DEA | D044 | 0199 | C246 |
| 0000042720 | 5611 | 83C4 | BA7E | 7400 | FF08 | FE4E | 0375 | 74E9 |
| 0000042740 | FFFF | E846 | 76FF | FF08 | 0676 | 2FE8 | 8B03 | EBF0 |
| 0000042760 | 903E | 84F6 | 0CED | 7404 | 83C2 | 6FFF | 1475 | FE83 |
| 0000043000 | 7D38 | 6AB8 | 8D03 | C246 | 5016 | 829A | AE5B | EB41 |

THU MAR 14 17:27:10 1991 CRV_ONS.DLL PAGE 20, LINE 1122

| | | | | | | | | |
|---|---|---|---|---|---|---|---|---|
| 0000043020 | 90AE | 006A | 0A6A | 468D | 16C2 | 9A50 | 5B60 | 3CF7 |
| 0000043040 | 9DEB | 4EFF | 56E8 | 76FF | FF08 | 0676 | 1BE8 | 8003 |
| 0000043060 | 52BE | 00FE | 0375 | 23E9 | 83FF | 70FF | 0F75 | 7E80 |
| 0000043100 | 00F6 | 0974 | 468B | 8BEC | C24E | 4689 | 80C4 | F27E |
| 0000043120 | 7400 | F70A | C25E | 5683 | 00C4 | 5EF7 | 83C4 | 46FF |
| 0000043140 | 0575 | 46C7 | 00EA | 8300 | EA7E | 7500 | E903 | 0272 |
| 0000043160 | 7E80 | 00EE | 0374 | 39E9 | FF02 | C646 | 7E80 | 00F6 |
| 0000043200 | 1474 | 468B | 8BC2 | C456 | 5EC4 | 26F8 | 0789 | 8926 |
| 0000043220 | 0257 | 1DE9 | 9002 | 468B | C4C2 | F85E | 8926 | E907 |
| 0000043240 | 0210 | 468B | 99E8 | 4689 | 89C2 | C456 | CEEB | 868D |
| 0000043260 | FE58 | 4689 | 8CBC | BE56 | FE83 | 752D | 8B13 | 36D8 |
| 0000043300 | 07C6 | 8D2D | 5986 | 89FE | BC46 | 568C | EBBE | 9006 |
| 0000043320 | FE83 | 752B | FF11 | FE4E | 46FF | FFE8 | 0876 | 76FF |
| 0000043340 | E806 | 0238 | F08B | 7E83 | 00BA | 0774 | 7E81 | 5DFE |
| 0000043360 | 7E01 | C72D | FE46 | 015D | 26EB | 468B | FFFE | FE4E |
| 0000043400 | C00B | 2374 | 46FF | 8BEA | C4C6 | BC5E | 46FF | 26BC |
| 0000043420 | 0788 | 46FF | FFE8 | 0876 | 76FF | E806 | 01FE | F08B |
| 0000043440 | 84F6 | 0CED | 7504 | 83D3 | 2EFE | 4375 | 468B | FFFE |
| 0000043460 | FE4E | C00B | 3974 | 5EC4 | FFBC | BC46 | C626 | 2E07 |
| 0000043500 | 18EB | 468B | FFFE | FE4E | C00B | 2374 | 46FF | 8BEA |
| 0000043520 | C4C6 | BC5E | 46FF | 26BC | 0788 | 46FF | FFE8 | 0876 |
| 0000043540 | 76FF | E806 | 01B6 | F08B | 84F6 | 0CED | 7504 | 83D3 |
| 0000043560 | EA7E | 7500 | E903 | 0081 | C68B | 653C | 0474 | 453C |
| 0000043600 | 7775 | 468B | FFFE | FE4E | C00B | 6D74 | 5EC4 | FFBC |
| 0000043620 | BC46 | C626 | 6507 | 46FF | FFE8 | 0876 | 76FF | E806 |
| 0000043640 | 017A | F08B | FE83 | 752D | C40F | BC5E | 46FF | 26BC |
| 0000043660 | 07C6 | EB2D | 9008 | 9090 | FE83 | 752B | 8B35 | FE46 |
| 0000043700 | 4EFF | 0BFE | 75C0 | FF1D | FE46 | 26EB | 468B | FFFE |
| 0000043720 | FE4E | C00B | 2374 | 46FF | 8BEA | C4C6 | BC5E | 46FF |
| 0000043740 | 26BC | 0788 | 46FF | FFE8 | 0876 | 76FF | E806 | 012C |
| 0000043760 | F08B | 84F6 | 0CED | 7504 | FFD3 | E84E | FF56 | 0876 |
| 0000044000 | 76FF | E806 | 0144 | 7E83 | 00EA | 0375 | D3E9 | 8000 |
| 0000044020 | EE7E | 7400 | E903 | 009A | 46FF | C4C6 | BC5E | C626 |
| 0000044040 | 0007 | 868D | FE58 | 5016 | 76FF | FFFA | F876 | 468A |
| 0000044060 | 98F6 | 8E50 | 1606 | 260E | 1EFF | 0CD6 | C483 | EB0A |
| 0000044100 | 9071 | 5EC4 | 260A | 078A | E42A | C63B | 1274 | 4EFF |
| 0000044120 | 56E8 | 76FF | FF08 | 0676 | EFE8 | E900 | 0084 | 9090 |
| 0000044140 | 4EFE | 80B8 | EE7E | 7500 | 8349 | 0E6E | EB04 | 9043 |
| 0000044160 | 632D | 3D00 | 0018 | CA77 | E0D1 | 2E93 | A7FF | 4410 |
| 0000044200 | 3E60 | 40C2 | 423E | 423E | 423E | 43D2 | 4030 | 43D2 |
| 0000044220 | 43D2 | 43D2 | 43D2 | 4232 | 40C2 | 40B6 | 43D2 | 43D2 |
| 0000044240 | 3E76 | 43D2 | 40C2 | 43D2 | 43D2 | 4033 | 43D2 | 43D2 |
| 0000044260 | 3E7E | 46FE | FFBB | 0A46 | 20EB | 46FF | FFE8 | 0876 |
| 0000044300 | 76FF | E806 | 0056 | F08B | 5EC4 | FFDA | 0A46 | 8A26 |
| 0000044320 | 2A07 | 3BE4 | 74F0 | E903 | FF74 | FE83 | 74FF | E903 |
| 0000044340 | F895 | FE83 | 75FF | 830C | C67E | 7500 | 8006 | B87E |
| 0000044360 | 7400 | 8B05 | C646 | 02EB | C68B | 5F5E | CBC9 | 8B55 |
| 0000044400 | 8BEC | 045E | 87F6 | 0CED | 7404 | 8B05 | EBC3 | 9008 |
| 0000044420 | C38B | DF24 | 072D | C900 | 02C2 | 9000 | 04C8 | 0000 |
| 0000044440 | 5EC4 | 2604 | 4EFF | 7804 | 2615 | 078B | 8B26 | 0257 |
| 0000044460 | FF26 | 8B07 | 8ED8 | 26C2 | 078A | E42A | 07EB | 5306 |
| 0000044500 | 089A | EF38 | C944 | 04C2 | 9000 | 8B55 | 83EC | 087E |
| 0000044520 | 74FF | FF0E | 0676 | 76FF | FF04 | 0876 | CA9A | 0F4A |
| 0000044540 | C941 | 06C2 | 9000 | 8B55 | 56EC | 5EC4 | 2608 | 07FF |
| 0000044560 | 76FF | FF06 | 0476 | A3E8 | 8BFF | F6F0 | ED84 | 080C |
| 0000044600 | E875 | C95E | 08C2 | 9000 | 4580 | 458B | 45A1 | 45D5 |
| 0000044620 | 4601 | 4609 | 4632 | 4664 | 8B55 | B8EC | 0171 | E80E |
| 0000044640 | EED4 | 5756 | C033 | 4689 | 88F8 | FB46 | 76C4 | 260A |
| 0000044660 | 89AC | 0A76 | 4688 | 0AFE | 74C0 | 8306 | F87E | 7D00 |

THU MAR 14 17:27:10 1991 CRV_ONS.DLL PAGE 21, LINE 1181

| | | | | | | | | |
|---|---|---|---|---|---|---|---|---|
| 0000044700 | 8B06 | F846 | B5E9 | BB04 | 0C5A | 202C | 583C | 0577 |
| 0000044720 | 24D7 | EB0F | B002 | B100 | D203 | 02E0 | FB46 | FED7 |
| 0000044740 | D2C1 | 88E8 | FB46 | 8B98 | D1D8 | 2EE3 | A7FF | 4518 |
| 0000044760 | 568A | B9FE | 0001 | 36E8 | EB04 | 33B1 | 89C0 | F046 |
| 0000045000 | 4689 | 89F6 | EE46 | 46C7 | 20FC | 4800 | 4689 | EBF4 |
| 0000045020 | 8A9B | FE46 | 2D3C | 0675 | 4E80 | 04FC | 8EEB | 2B3C |
| 0000045040 | 0675 | 4E80 | 01FC | 84EB | 203C | 0775 | 4E80 | 02FC |
| 0000045060 | 79E9 | 3CFF | 7523 | 8007 | FC4E | E980 | FF6E | 4E80 |
| 0000045100 | 08FC | 67E9 | 8AFF | FE4E | F980 | 752A | E80F | 035C |
| 0000045120 | C00B | 1779 | D8F7 | 4E80 | 04FC | 0FEB | E980 | 3230 |
| 0000045140 | 8BED | F646 | 0ABB | F700 | 03E3 | 89C1 | F646 | 3BE9 |
| 0000045160 | C7FF | F446 | 0000 | 33E9 | 8AFF | FE4E | F980 | 752A |
| 0000045200 | E80C | 0328 | C00B | 1479 | FFB8 | EBFF | 800F | 30E9 |
| 0000045220 | ED32 | 468B | BBF4 | 000A | E3F7 | C103 | 4689 | E9F4 |
| 0000045240 | FF0A | 468A | 3CFE | 756C | 8006 | FC4E | EB10 | 3C22 |
| 0000045260 | 7546 | 8006 | FC4E | EB20 | 3C18 | 754E | 8006 | FD4E |
| 0000045300 | EB10 | 3C0E | 754C | 8006 | FD4E | EB04 | 8004 | FD4E |
| 0000045320 | E908 | FED8 | 468A | 3CFE | 7564 | E903 | 0194 | 693C |
| 0000045340 | 0375 | 8DE9 | 3C01 | 7575 | E903 | 018A | 583C | 0375 |
| 0000045360 | 89E9 | 3C01 | 7578 | E903 | 0188 | 6F3C | 0375 | A2E9 |
| 0000045400 | 3C01 | 7463 | 3C1A | 7473 | 3C27 | 746E | 3C51 | 7470 |
| 0000045420 | 3C60 | 7445 | 3C07 | 7447 | E903 | 00BB | B5E9 | E800 |
| 0000045440 | 028A | BE8D | FE8F | 0716 | 4FAA | 01B9 | E900 | 01F1 |
| 0000045460 | 90E8 | 0B02 | 75FF | 8C12 | 0BC0 | 75C0 | 1E0C | BF07 |
| 0000045500 | 0CB3 | 0E8B | 0CB9 | D8E9 | 5701 | 4E8B | E3F4 | 3207 |
| 0000045520 | F2C0 | 75AE | 4F01 | 2B59 | 87F9 | E9CF | 01C3 | 62E8 |
| 0000045540 | 8B02 | F846 | F6AB | FC46 | 7410 | 3303 | ABC0 | 3BE9 |
| 0000045560 | F6FE | FC46 | 7530 | E805 | 0232 | 39EB | 36E8 | F602 |
| 0000045600 | FD46 | 7518 | C630 | FF46 | B907 | 0010 | 0716 | 3352 |
| 0000045620 | 8DD2 | 97BE | BEFE | 0004 | B0E8 | B902 | 0010 | BE8D |
| 0000045640 | FE92 | 3358 | BED2 | 0004 | A0E8 | C602 | 9386 | 3AFE |
| 0000045660 | 09B9 | EB00 | C618 | FF46 | B907 | 0010 | 0716 | D233 |
| 0000045700 | BE8D | FE92 | 04BE | E800 | 0281 | 04B9 | 8D00 | 8FBE |
| 0000045720 | E9FE | 014D | 46FF | 80EE | FC4E | 8A40 | FE46 | 200C |
| 0000045740 | 8B98 | 83F0 | F47E | 7F00 | 7413 | C707 | F446 | 0006 |
| 0000045760 | 0AEB | 673D | 7500 | C705 | F446 | 0001 | BE8D | FE8F |
| 0000046000 | 76FF | FFEE | F476 | 1656 | FF57 | 1076 | 76FF | F60E |
| 0000046020 | FD46 | 7404 | FF0A | E21E | 830C | 0E46 | EB0A | FF08 |
| 0000046040 | CE1E | 830C | 0E46 | 8308 | 0EC4 | 46F6 | 80FC | 0F74 |
| 0000046060 | 7E83 | 00F4 | 0975 | 5716 | 1EFF | 0CDA | C483 | 8304 |
| 0000046100 | 67FE | 1075 | 46F7 | 80FC | 7500 | 1609 | FF57 | D21E |
| 0000046120 | 830C | 04C4 | 0716 | 8026 | 2D3D | 0575 | 8047 | FD4E |
| 0000046140 | B901 | FFFF | B057 | F200 | 4FAE | 2B59 | 87F9 | E9CF |
| 0000046160 | 00AF | 4E80 | 40FC | 46C6 | 0AFA | 35EB | 46C6 | 07FF |
| 0000046200 | 04EB | 46C6 | 27FF | 46F6 | 80FC | 1174 | 46C7 | 02F0 |
| 0000046220 | C600 | F246 | B230 | 0251 | FF56 | 5688 | C6F3 | FA46 |
| 0000046240 | EB10 | F60E | FC46 | 7480 | 8004 | FD4E | C602 | FA46 |
| 0000046260 | F608 | FC46 | 7410 | E805 | 00FB | 0EEB | EDE8 | F600 |
| 0000046300 | FC46 | 7440 | 9903 | 02EB | D233 | 46F6 | 40FC | 0F74 |
| 0000046320 | D20B | 0B7D | 4E80 | 01FD | D8F7 | D283 | F700 | 83DA |
| 0000046340 | F47E | 7D00 | C707 | F446 | 0001 | 04EB | 6680 | F7FC |
| 0000046360 | D88B | DA0B | 0575 | 46C7 | 00F0 | 8D00 | EB7E | 0716 |
| 0000046400 | 4E8A | 32FA | 8BED | F476 | 40E8 | F601 | FD46 | 7402 |
| 0000046420 | E30E | 2606 | 3D80 | 7430 | 4F06 | C626 | 3005 | EB41 |
| 0000046440 | F600 | FC46 | 7440 | F631 | FD46 | 7401 | C60B | F246 |
| 0000046460 | C72D | F046 | 0001 | 20EB | 46F6 | 01FC | 0B74 | 46C6 |
| 0000046500 | 2BF2 | 46C7 | 01F0 | EB00 | F60F | FC46 | 7402 | C609 |
| 0000046520 | F246 | C720 | F046 | 0001 | 468B | 2BF6 | 2BC1 | F046 |
| 0000046540 | 027D | C033 | 5706 | F651 | FC46 | 750C | 8B07 | B2C8 |

THU MAR 14 17:27:10 1991 CRV_ONS.DLL PAGE 22, LINE 1240

| | | | | | | | | |
|---|---|---|---|---|---|---|---|---|
| 0000046560 | E820 | 00BB | 1650 | 8D07 | F27E | 4E8B | E8F0 | 0091 |
| 0000046600 | F658 | FC46 | 7408 | F60D | FC46 | 7504 | 8B07 | B2C8 |
| 0000046620 | E830 | 009B | 5F59 | 5007 | 76E8 | 5800 | 46F6 | 04FC |
| 0000046640 | 0774 | C88B | 20B2 | 86E8 | E900 | FC00 | 76C4 | 260E |
| 0000046660 | 89AD | 0E76 | C4C3 | 0E76 | AD26 | D0EB | AD26 | 8992 |
| 0000046700 | 0E76 | F6C3 | FC46 | 7420 | E808 | FFE9 | C28E | F88B |
| 0000046720 | E8C3 | FFD8 | F88B | C00B | 0375 | C08E | 1EC3 | C307 |
| 0000046740 | 0698 | C457 | 065E | FF26 | 044F | 1078 | 8B26 | 263F |
| 0000046760 | 07FF | 8E26 | 0247 | 33AA | 5FC0 | C307 | 5251 | 5306 |
| 0000047000 | 0E50 | 0FE8 | 83EF | 06C4 | 595A | FF3D | 75FF | EBE8 |
| 0000047020 | E3E8 | 8B1B | 01F7 | F84E | 3357 | 26FF | E8AC | FFC0 |
| 0000047040 | F80B | F7E2 | FF0B | 745F | C705 | F846 | FFFF | E3C3 |
| 0000047060 | 0119 | F84E | 3357 | 8AFF | E8C2 | FFA4 | F80B | F7E2 |
| 0000047100 | FF0B | 745F | C705 | F846 | FFFF | FDC3 | 9357 | F60B |
| 0000047120 | 0A7F | DB0B | 0675 | D20B | 0275 | 1AEB | 3392 | F7D2 |
| 0000047140 | 93F1 | F1F7 | 8792 | 04D3 | 3C30 | 7639 | 0203 | FF46 |
| 0000047160 | 8BAA | 4EC2 | D8EB | 2B59 | 47CF | C3FC | 5E5F | E58B |
| 0000047200 | CB5D | 06C8 | 0000 | BE56 | 0886 | C02B | 4689 | 89FC |
| 0000047220 | FA46 | 026A | A9E8 | 830B | 02C4 | 0CEB | 76FF | E8FE |
| 0000047240 | 0B5A | C483 | 8302 | 0CC6 | 3639 | 0C46 | 3B72 | C68B |
| 0000047260 | 862D | B908 | 000C | F799 | 89F9 | FE46 | E850 | 0B30 |
| 0000047300 | C483 | F602 | 0A44 | 7583 | C7D3 | 0444 | 0000 | 44C6 |
| 0000047320 | 000A | C02B | 4489 | 8908 | 0644 | 4489 | 8902 | C604 |
| 0000047340 | 0B44 | 89FF | FA76 | 5E8C | 6AFC | E802 | 0B7C | C483 |
| 0000047360 | 8B02 | FA46 | 568B | 5EFC | CBC9 | 04C8 | 0000 | 8B56 |
| 0000047400 | 0676 | 468B | 2D08 | 0886 | 0CB9 | 9900 | F9F7 | 4689 |
| 0000047420 | 50FE | DBE8 | 830A | 02C4 | 76FF | FF0A | 0876 | 9A56 |
| 0000047440 | 4ACA | 44D3 | C483 | 8906 | FC46 | 76FF | E8FE | 0ACC |
| 0000047460 | C483 | 8B02 | FC46 | C95E | 90CB | 8B55 | 57EC | 8B56 |
| 0000047500 | 0676 | 7E8B | 8308 | FFFE | 1274 | 45F6 | 010A | 1275 |
| 0000047520 | 45F6 | 800A | 0674 | 45F6 | 020A | 0674 | FFB8 | EBFF |
| 0000047540 | 903E | 458B | 0B08 | 0645 | 0875 | 571E | C3E8 | 83EE |
| 0000047560 | 04C4 | 058B | 558B | 3902 | 0645 | 0D75 | 5539 | 7508 |
| 0000047600 | 8308 | 047D | 7500 | FFD5 | FF05 | 0445 | C68B | 0DFF |
| 0000047620 | 1DC4 | 8826 | 8007 | 0A65 | 80EF | 0A4D | 2A01 | 5EE4 |
| 0000047640 | C95F | 90CB | 8B55 | 8BEC | 065E | 1E3B | 0661 | 1272 |
| 0000047660 | 09BA | 3300 | E9C0 | EA92 | E853 | 0A58 | C483 | E902 |
| 0000047700 | EAA1 | E853 | 0A42 | C483 | 5302 | 299A | 0010 | 8500 |
| 0000047720 | 75C0 | C6E5 | 6387 | 0006 | E853 | 0A38 | C483 | 8B02 |
| 0000047740 | 5DE5 | 00CB | 8B55 | 83EC | 02EC | C033 | 09EB | 8B55 |
| 0000047760 | 83EC | 02EC | FFB8 | 89FF | FE46 | 5E8B | 3B06 | 611E |
| 0000050000 | 7206 | BA19 | 0009 | C033 | 3FE9 | 8BEA | FE4E | C90B |
| 0000050020 | 0774 | E853 | 09FE | C483 | E902 | EA47 | C00B | 0774 |
| 0000050040 | E853 | 09E4 | C483 | 8302 | 04EC | CC8B | FF53 | 0A76 |
| 0000050060 | 76FF | FF08 | 0C76 | 5116 | FF9A | 00FF | 5900 | 855A |
| 0000050100 | 75C0 | 80C8 | 63A7 | FD06 | 468B | 0BFE | 74C0 | 5307 |
| 0000050120 | C1E8 | 8309 | 02C4 | 8B91 | 5DE5 | 00CB | 8B55 | 83EC |
| 0000050140 | 0EEC | 7E8A | 8B0C | 0E46 | 4689 | EB0C | 5508 | EC8B |
| 0000050160 | EC83 | B70E | FF40 | 0876 | 76FF | 1606 | 568D | 52FE |
| 0000050200 | 8D16 | F856 | 3352 | 52D2 | 8B52 | 0C4E | 99E8 | 8B01 |
| 0000050220 | 0A46 | 00A9 | 7401 | 8008 | 10CA | 00A9 | 7504 | A92A |
| 0000050240 | 0200 | 2274 | CA80 | 5002 | 468D | FFFE | 0876 | 76FF |
| 0000050260 | 1606 | 3350 | 50C0 | 9A50 | FFFF | 0000 | C085 | 7558 |
| 0000050300 | 8B08 | FE4E | 03EB | CA80 | 5101 | 2552 | 0003 | C70A |
| 0000050320 | 3350 | 50C0 | 9A50 | 0EAA | 0000 | C00B | 1674 | 6E3D |
| 0000050340 | 7500 | F60E | F0C2 | 02BA | 7400 | BA03 | 0011 | 59E9 |
| 0000050360 | E9E9 | 009D | 468B | 3BFE | 6106 | 7206 | 500D | 5B9A |
| 0000050400 | 004B | BA00 | 0018 | C033 | E4EB | E850 | 08FA | C483 |
| 0000050420 | 8B02 | 50D0 | 8D16 | F45E | 1653 | 468D | 50F8 | 429A |

THU MAR 14 17:27:10 1991 CRV_ONS.DLL PAGE 23, LINE 1299

| | | | | | | | | |
|---|---|---|---|---|---|---|---|---|
| 0000050440 | 0032 | 0B00 | 75C0 | 8B61 | 0A46 | C933 | 00A9 | 7580 |
| 0000050460 | A90E | 4000 | 0775 | 06F6 | 0CBD | 7580 | B102 | 8880 |
| 0000050500 | F24E | 468A | 3CF4 | 7501 | C607 | F446 | E940 | 008F |
| 0000050520 | 023C | 0775 | 46C6 | 08F4 | 84E9 | 3200 | 88C0 | F446 |
| 0000050540 | C90A | F474 | 46F7 | 020A | 7400 | 5274 | FFB9 | 51FF |
| 0000050560 | B951 | 0002 | 1651 | 468D | 50FA | C99A | 004B | 0B00 |
| 0000050600 | 74C0 | 3D15 | 0083 | 0C74 | 76FF | E8FE | 0886 | C483 |
| 0000050620 | E902 | E8CF | C033 | 47EB | 1652 | 468D | 50F6 | 01B8 |
| 0000050640 | 5000 | 8D16 | F846 | 9A50 | 1B06 | 0000 | C00B | 1B75 |
| 0000050660 | 4639 | 74F8 | 802A | F67E | 751A | 5210 | 76FF | FFFC |
| 0000050700 | FA76 | FF9A | 00FF | 0B00 | 75C0 | 52BD | C033 | 5050 |
| 0000050720 | 1650 | 468D | 50FA | 0B9A | 004D | 0B00 | 75C0 | 8AA9 |
| 0000050740 | F44E | C1F6 | 7548 | FF28 | 0876 | 76FF | 1606 | 468D |
| 0000050760 | 50F8 | C033 | 5050 | 489A | 004C | F700 | F846 | 0001 |
| 0000051000 | 0374 | C980 | F710 | 0A46 | 0008 | 0374 | C980 | 0A20 |
| 0000051020 | F24E | C980 | 8B01 | 88C2 | 88D8 | 638F | 5306 | F3E8 |
| 0000051040 | 8307 | 02C4 | E58B | CB5D | 5CA1 | F706 | 23D0 | 33C1 |
| 0000051060 | A8C9 | 7580 | 8003 | 01C9 | 00C3 | 8B55 | 83EC | 08EC |
| 0000051100 | C033 | 5E8B | 3B06 | 611E | 7306 | 534D | B9E8 | 8307 |
| 0000051120 | 02C4 | 4E8B | E30C | F647 | 6387 | 0206 | 4075 | 3357 |
| 0000051140 | 8BD2 | 0C4E | 7EC4 | F608 | 6387 | 0806 | 1074 | 878A |
| 0000051160 | 0763 | 0A3C | 0874 | 42AA | C649 | 6387 | 0A07 | 0653 |
| 0000051200 | 5157 | 468D | 16FA | 9A50 | 4D38 | 0000 | 0B5F | 74C0 |
| 0000051220 | 530F | 7FE8 | 8307 | 02C4 | 09BA | E900 | E7AC | 4AEB |
| 0000051240 | 468B | 03FA | F6C2 | 6387 | 8006 | 3E74 | A780 | 0663 |
| 0000051260 | 56FB | 1E57 | C507 | 0876 | FE8B | C88B | 28E3 | 0DB4 |
| 0000051300 | 3C80 | 750A | 2606 | 8F80 | 0663 | AC04 | C43A | 2574 |
| 0000051320 | 1A3C | 0875 | 8026 | 638F | 0206 | 05EB | 0588 | E247 |
| 0000051340 | 8BEA | 2BC7 | 0846 | 1F06 | 5E5F | E853 | 0726 | C483 |
| 0000051360 | 8B02 | 5DE5 | 83CB | 01F9 | 0774 | 3C80 | 740A | EBE0 |
| 0000051400 | 26DB | 87F6 | 0663 | 744D | 0B2B | 75DB | 5323 | 468D |
| 0000051420 | 16F9 | 5150 | 468D | 16FA | 9A50 | 4E18 | 0000 | C085 |
| 0000051440 | 0E74 | 1F06 | 5E5F | E853 | 06EA | C483 | E902 | E733 |
| 0000051460 | 0AB0 | A8EB | 46C6 | 00F9 | 8D53 | F946 | 5016 | 8D51 |
| 0000051500 | FA46 | 5016 | AA9A | 004E | 0B00 | 75C0 | F7D5 | FA46 |
| 0000051520 | FFFF | 3674 | 7E83 | 010C | 3574 | F626 | 6387 | 0806 |
| 0000051540 | 1C75 | B853 | FFFF | 5050 | D8F7 | 8D50 | FC46 | 5016 |
| 0000051560 | 679A | 004D | 8000 | F97E | 750A | E90F | FF61 | 468A |
| 0000051600 | 26F9 | 8788 | 0763 | 0A3C | 0274 | 0DB0 | 4DE9 | 80FF |
| 0000051620 | F97E | 750A | EBC5 | 0099 | 8B55 | 83EC | 0EEC | C033 |
| 0000051640 | 09EB | 8B55 | 83EC | 0EEC | FFB8 | 89FF | F246 | 5E8B |
| 0000051660 | 3B06 | 611E | 7206 | BA08 | 0009 | C033 | 88E9 | 0BE6 |
| 0000051700 | 74C0 | 5307 | 41E8 | 8306 | 02C4 | 87F6 | 0663 | 7420 |
| 0000051720 | 5312 | C933 | 5151 | 4141 | 8D51 | F446 | 5016 | 019A |
| 0000051740 | 004F | F600 | 6387 | 8006 | 6674 | 5E8C | 8EFA | 0A46 |
| 0000051760 | 56C5 | 3308 | 89CD | FE46 | 4689 | FCFC | 5657 | FA8B |
| 0000052000 | F28B | 6689 | 8BF8 | 0C4E | 28E3 | 0AB0 | AEF2 | 3B75 |
| 0000052020 | EC83 | 8B02 | BADC | 0080 | E22B | D48B | FA8B | 0716 |
| 0000052040 | 4E8B | AC0C | 0A3C | 0D74 | FB3B | 1A74 | E2AA | E8F4 |
| 0000052060 | 0038 | AFE9 | B000 | 3B0D | 75FB | E803 | 002C | B0AA |
| 0000052100 | FF0A | FC46 | E2EB | 21E8 | EB00 | 5EE1 | 8E5F | FA5E |
| 0000052120 | C8E9 | 8B00 | F246 | C00B | 0974 | 76FF | E806 | 05B4 |
| 0000052140 | C483 | B802 | FFFC | E80E | E40C | 5350 | 1E51 | 1F06 |
| 0000052160 | CF8B | CA2B | 21E3 | 8B51 | 065E | 1E53 | 5152 | 468D |
| 0000052200 | 16F4 | 9A50 | 3581 | 0000 | 0B59 | 75C0 | 8B11 | F45E |
| 0000052220 | 5E01 | 3BFE | 72D9 | 1F07 | 5B59 | 8B58 | C3FA | 831F |
| 0000052240 | 08C4 | 7E83 | 00FE | 3C75 | C00B | 1874 | 6D3D | 7400 |
| 0000052260 | 3D0D | 0001 | 09BA | 7500 | BA08 | 001C | 03EB | 20BA |
| 0000052300 | F900 | 26EB | 5E8E | F6FA | 6387 | 4006 | 0E74 | 5E8E |

THU MAR 14 17:27:10 1991 CRV_ONS.DLL PAGE 24, LINE 1358

| | | | | | | | | |
|---|---|---|---|---|---|---|---|---|
| 0000052320 | 8B0A | 085E | 3F80 | 751A | F803 | 0EEB | 1CBA | 330D |
| 0000052340 | F9C0 | 06EB | 468B | 2BFE | FC46 | 668B | 5EF8 | 8E5F |
| 0000052360 | FA5E | 1472 | 5E8B | 0BF2 | 74DB | FF09 | 0676 | 13E8 |
| 0000052400 | 8305 | 02C4 | E58B | CB5D | 5E8B | 0BF2 | 74DB | FF09 |
| 0000052420 | 0676 | FFE8 | 8304 | 02C4 | 2FE9 | 8BE5 | 0C4E | C90B |
| 0000052440 | 0475 | C18B | CEEB | C51E | 0856 | 1E53 | 5152 | 468D |
| 0000052460 | 16F4 | 9A50 | 5014 | 0000 | 071E | 0B1F | 74C0 | 3D17 |
| 0000052500 | 006D | 0D74 | 013D | BA00 | 0009 | BC75 | 1CBA | EB00 |
| 0000052520 | BAB7 | 0020 | B2EB | 468B | 0BF4 | 75C0 | F697 | 6387 |
| 0000052540 | 4006 | 0A74 | DA8B | 8026 | 1A3F | 0275 | 86EB | 1CBA |
| 0000052560 | 3300 | EBC0 | 0093 | 2DEA | B251 | EA4A | 514C | 5109 |
| 0000052600 | 1AEA | 0E51 | EA51 | 511A | 5113 | 8B55 | 56EC | 76C4 |
| 0000052620 | 8C06 | E3C1 | 2605 | 4C80 | 01FE | 5D5E | 55CB | EC8B |
| 0000052640 | 096A | 9BE8 | 8304 | 02C4 | 76FF | 0E06 | 0DE8 | 5B00 |
| 0000052660 | 096A | B5E8 | 8304 | 02C4 | E58B | CB5D | 8B55 | 56EC |
| 0000052700 | 8B57 | 064E | F983 | 77E8 | 1E69 | C0A1 | 0B0C | 74C0 |
| 0000052720 | BF48 | 5234 | 368B | 0CC8 | 1EC5 | 0CC2 | 561E | FF57 |
| 0000052740 | 5FD7 | 735E | 8C2B | C5DA | 0C5F | D63B | EF75 | 1F58 |
| 0000052760 | C41E | C236 | 260C | 748B | C512 | BE1E | 8C0C | 3BDA |
| 0000053000 | 75D0 | 1FD9 | 811E | B0FF | 7452 | BF0E | 52B0 | C4EB |
| 0000053020 | 815E | 34FF | 7452 | EB0F | 070A | BF06 | 0CBE | E1E8 |
| 0000053040 | 7201 | E80E | 007E | 891F | C416 | 890C | C21E | EB0C |
| 0000053060 | 1F04 | C033 | 5F99 | 5D5E | 00CB | 5706 | F88B | FB03 |
| 0000053100 | 7F89 | 4F04 | 2D4F | 0016 | 778D | C714 | FE05 | 89FF |
| 0000053120 | 0A7F | 8948 | 8C04 | 8B1F | 8CC6 | 8EDA | 8DC2 | 067F |
| 0000053140 | ABFC | 47AB | 3347 | ABC0 | ABAB | 5FAB | C307 | 8B26 |
| 0000053160 | 0245 | C00B | 0975 | 8C26 | 025D | 8926 | EB1D | 0614 |
| 0000053200 | C426 | 0875 | 8C26 | 0E5C | 8926 | 0C5C | 478C | 8912 |
| 0000053220 | 1077 | 2607 | 5D8C | 260A | 5D89 | 2608 | 5D8C | 2606 |
| 0000053240 | 5D89 | C304 | 8041 | FEE1 | FC53 | 778B | 8B08 | 0A5F |
| 0000053260 | FF33 | 23EB | C38B | A85B | 7501 | 5342 | 778B | 8B06 |
| 0000053300 | 085F | DE3B | 3674 | 334B | EBFF | 900C | 548D | 3BFE |
| 0000053320 | 73D3 | 03E1 | 72F0 | AD23 | 01A8 | F074 | FE8B | 3B48 |
| 0000053340 | 73C1 | 0323 | 72F0 | 8B13 | ADD0 | 01A8 | DE74 | C203 |
| 0000053360 | 0205 | 8B00 | 89F7 | FE44 | E4EB | C08B | 8B5B | 0647 |
| 0000053400 | 4789 | F908 | 19EB | 895B | FE4C | 0974 | F903 | C12B |
| 0000053420 | 8948 | 2B05 | 03F9 | 89F9 | 087F | C68B | DA8C | C3F8 |
| 0000053440 | 5751 | 47F6 | 0102 | 6674 | B7E8 | 8B00 | 8BFE | A804 |
| 0000053460 | 7401 | 2B03 | 49C8 | 4141 | 778B | 0B04 | 74F6 | 034F |
| 0000053500 | 73CE | 3309 | BAC0 | FFF0 | 33E3 | 42EB | 2EB8 | 8E35 |
| 0000053520 | 26C0 | CCA1 | 3D0C | 2000 | 1674 | 00BA | 3B80 | 72D0 |
| 0000053540 | D106 | 75EA | EBF8 | 8322 | 08FA | 1D72 | E2D1 | C28B |
| 0000053560 | 8B48 | 03D0 | 73C1 | 3302 | F7C0 | 23D2 | 52C2 | 2EE8 |
| 0000053600 | 5A00 | 0D73 | FA83 | 74F0 | B805 | 0010 | E2EB | EBF9 |
| 0000053620 | 8B1B | 2BD0 | 0457 | 4789 | 8904 | 087F | 778B | 4A0A |
| 0000053640 | 1489 | 0342 | C7F2 | FE04 | 89FF | 0A77 | 595F | 8BC3 |
| 0000053660 | F6D0 | 0247 | 7404 | 4A0F | 778B | 4E04 | D63B | 0572 |
| 0000053700 | 5739 | 73FE | 4218 | 1E50 | 859A | 0031 | 0B00 | 75C0 |
| 0000053720 | 8B0F | F6C2 | 0247 | 7404 | 4A04 | 5789 | F8FE | 01EB |
| 0000053740 | C3F9 | 8B57 | 0877 | 773B | 750A | 8B03 | 0677 | 3DAD |
| 0000053760 | FFFE | 0874 | FE8B | FE24 | F003 | F2EB | 4F4F | F78B |
| 0000054000 | C35F | D18B | C283 | 8027 | F0E2 | 8B50 | 52C4 | 5016 |
| 0000054020 | C033 | 9A50 | FFFF | 0000 | 0B1F | 75C0 | 3314 | 26DB |
| 0000054040 | 458B | 890C | 0247 | C28B | 0FE8 | E8FE | FE40 | EBF8 |
| 0000054060 | F901 | 00C3 | 8B55 | 8BEC | 8BD7 | 1EDE | 7EC4 | 3306 |
| 0000054100 | B9C0 | FFFF | AEF2 | 758D | C4FF | 0A7E | FFB9 | F2FF |
| 0000054120 | F7AE | 2BD1 | 8CF9 | 8EC0 | 8ED8 | 0846 | FE87 | 468B |
| 0000054140 | F706 | 01C6 | 7400 | A402 | D149 | F3E9 | 13A5 | F3C9 |
| 0000054160 | 8BA4 | 8BF3 | 1FFA | C28C | CB5D | 8B55 | 8BEC | 8BD7 |

THU MAR 14 17:27:10 1991 CRV_DNS.DLL PAGE 25, LINE 1417

| | | | | | | | | |
|---|---|---|---|---|---|---|---|---|
| 0000054200 | 1EDE | 76C5 | 8B0A | 8CFE | 8ED8 | 33C0 | B9C0 | FFFF |
| 0000054220 | AEF2 | D1F7 | 7EC4 | 8B06 | A8C7 | 7401 | A402 | D149 |
| 0000054240 | F3E9 | 13A5 | F3C9 | 8BA4 | 8BF3 | 1FFA | C28C | CB5D |
| 0000054260 | 8B55 | 8BEC | 8BD7 | 1EDE | 76C5 | C406 | 0A7E | C033 |
| 0000054300 | FFB9 | F2FF | F7AE | 2BD1 | F3F9 | 74A6 | 1B05 | 1DC0 |
| 0000054320 | FFFF | 8B1F | 8BF3 | 5DFA | 00CB | 8B55 | 8BEC | C4D7 |
| 0000054340 | 067E | C033 | FFB9 | F2FF | F7AE | 49D1 | 8B91 | 5DFA |
| 0000054360 | 00CB | 8B55 | 57EC | 1E56 | 4E8B | E30E | 8B27 | C4D9 |
| 0000054400 | 067E | F78B | C033 | AEF2 | D9F7 | CB03 | FE8B | 76C5 |
| 0000054420 | F30A | 8AA6 | FF44 | C933 | 3A26 | FF45 | 0477 | 0474 |
| 0000054440 | 4949 | D1F7 | C18B | 5E1F | 8B5F | 5DE5 | 00CB | 8B55 |
| 0000054460 | 56EC | B357 | 8B01 | 0C4E | 468B | 3306 | 83D2 | 0AF9 |
| 0000054500 | 0175 | 1E99 | 7EC5 | E908 | 0611 | 04C8 | 0000 | A156 |
| 0000054520 | 0869 | 168B | 086B | 4689 | 89FC | FE56 | 0C6A | DFE8 |
| 0000054540 | 8300 | 02C4 | 468B | 0BFE | FC46 | 7674 | 468B | 0B08 |
| 0000054560 | 0646 | 6E74 | ,6FF | FF08 | 0676 | 6A9A | 2A54 | 8355 |
| 0000054600 | 04C4 | F08B | 5EC4 | 26FC | 478B | 2602 | 070B | 5274 |
| 0000054620 | FF26 | 0277 | FF26 | 9A37 | 546A | 554B | C483 | 3B04 |
| 0000054640 | 7EC6 | C439 | FC5E | C426 | 261F | 3880 | 753D | 562D |
| 0000054660 | 76FF | FF08 | 0676 | 5306 | 829A | 1854 | 8351 | 0AC4 |
| 0000054700 | C00B | 1875 | 0C6A | A1E8 | 8300 | 02C4 | 5EC4 | 26FC |
| 0000054720 | 078B | 8B26 | 0257 | C603 | EB40 | 9012 | 4683 | 04FC |
| 0000054740 | A2EB | 0C6A | 83E8 | 8300 | 02C4 | C02B | 5E99 | CBC9 |
| 0000054760 | 8B55 | 50EC | 468B | 0504 | 0014 | 4BEB | 8B55 | 50EC |
| 0000055000 | 468B | 0504 | 0014 | 69EB | 8B55 | 50EC | 468B | 0504 |
| 0000055020 | 0114 | 33EB | 8B55 | 50EC | 468B | 0504 | 0114 | 51EB |
| 0000055040 | 8B55 | 50EC | 468B | C104 | 02E0 | FF68 | 50FF | FF6A |
| 0000055060 | FF6A | 299A | 001C | 0B00 | 75C0 | 5829 | E58B | C35D |
| 0000055100 | 8B55 | 50EC | 468B | FF04 | EE06 | C10D | 02E0 | BB68 |
| 0000055120 | 5055 | FF6A | FF6A | FF9A | 00FF | 0B00 | 75C0 | 5805 |
| 0000055140 | E58B | C35D | 11B8 | E900 | DBD3 | 8B55 | 50EC | 468B |
| 0000055160 | C104 | 02E0 | DF68 | 5055 | 599A | 001C | 0B00 | 75C0 |
| 0000055200 | FFE3 | EE0E | 580D | E58B | C35D | 8B55 | FFEC | 0676 |
| 0000055220 | ADE8 | 83FF | 02C4 | E58B | CB5D | 8B55 | FFEC | 0676 |
| 0000055240 | C7E8 | 83FF | 02C4 | E58B | CB5D | 8B55 | 1EEC | 8B07 |
| 0000055260 | 0E4E | C90B | 3174 | C1F6 | 7501 | 8B2C | 0C56 | 468B |
| 0000055300 | 8B0A | 0BD8 | 75DA | 5112 | 069A | 0D51 | 5955 | D88B |
| 0000055320 | DA0B | 1374 | D88B | EB43 | 0B0A | 74D2 | A80A | 7501 |
| 0000055340 | 8B06 | 03D8 | 73C1 | BA08 | 0016 | C033 | 5BE9 | 6ADF |
| 0000055360 | 8BFF | 52CC | 5653 | 0E57 | BF68 | 1656 | 5251 | 8B50 |
| 0000055400 | 084E | 568B | 8B06 | 1276 | 7E8B | 9A10 | FFFF | 0000 |
| 0000055420 | 5E5F | C00B | 1374 | F65B | 01C3 | 0A74 | 534B | 109A |
| 0000055440 | 5B51 | 8356 | 04C4 | 3AE9 | 83DF | 04C4 | 5D58 | 56CB |
| 0000055460 | 0E57 | 1B68 | 5157 | E852 | 007E | 8E93 | 26C2 | 578B |
| 0000055500 | 0B22 | 74D2 | 5015 | 0653 | 2652 | 77FF | 9A20 | 5110 |
| 0000055520 | 56B1 | C483 | 0704 | 585B | D233 | 8926 | 2617 | 5789 |
| 0000055540 | 2602 | 5789 | 2608 | 5789 | 260A | 5789 | 2620 | 5789 |
| 0000055560 | A822 | 7401 | 4809 | 8C26 | 2257 | 8926 | 2047 | 0005 |
| 0000055600 | 2602 | 4789 | 3304 | E8ED | DB6E | 55CB | EC8B | 9BE8 |
| 0000055620 | E8DC | 0024 | D88B | C28E | C033 | 8926 | 2607 | 4789 |
| 0000055640 | 2602 | 4789 | 2608 | 4789 | 260A | 47C7 | 0004 | 6A02 |
| 0000055660 | 6A00 | 9A00 | 3344 | 0000 | 068E | 0622 | A126 | 0006 |
| 0000055700 | 3B48 | F006 | 770D | C107 | 06E0 | FFBA | C3FF | 5357 |
| 0000055720 | 6A51 | E80F | FE6A | C4B3 | 3B02 | F006 | 760D | 8B40 |
| 0000055740 | 05D8 | 0004 | FC25 | 8BFF | C1C8 | 06E0 | 5BBA | 5057 |
| 0000055760 | 9A52 | 5359 | 0000 | C00B | 3275 | 8B49 | 87F9 | F03E |
| 0000056000 | 2B0D | 51CF | C147 | 06E7 | E1C1 | 5705 | C28E | ABF3 |
| 0000056020 | 595F | C726 | 0445 | 0200 | C783 | E240 | 8BF5 | 6AC3 |
| 0000056040 | E80F | FE46 | C483 | 5902 | 5F5B | 9BEB | 10B8 | E900 |

THU MAR 14 17:27:10 1991 CRV_ONS.DLL PAGE 26, LINE 1476

| | | | | | | | | |
|---|---|---|---|---|---|---|---|---|
| 0000056060 | DA0B | 04C8 | 0000 | 5657 | 116A | 03E8 | 83FE | 02C4 |
| 0000056100 | 06C6 | 1256 | 8B49 | 0646 | 568B | A308 | 1252 | 1689 |
| 0000056120 | 1254 | 4CBE | 8912 | 8904 | 0254 | 5052 | 6A9A | 0954 |
| 0000056140 | 8358 | 04C4 | 50A3 | 8D12 | 0E46 | 5016 | 76FF | FF0C |
| 0000056160 | 0A76 | 681E | 124C | EE9A | E03C | 8356 | 0CC4 | F88B |
| 0000056200 | 116A | E5E8 | 83FD | 02C4 | C78B | 5F5E | CBC9 | 8B55 |
| 0000056220 | 6AEC | E809 | FDAA | C483 | FF02 | 0A76 | 76FF | FF08 |
| 0000056240 | 0676 | E80E | 000F | C483 | 6A06 | E809 | FDBC | C483 |
| 0000056260 | 8B02 | 5DE5 | 55CB | EC8B | 5756 | 8B1E | 0656 | F28B |
| 0000056300 | 468B | 8B08 | 0A4E | D00B | 5374 | 59E3 | DF8C | BEBB |
| 0000056320 | 510C | 67E8 | 5901 | 5B72 | 74FF | 51FE | 67E8 | 5900 |
| 0000056340 | 0B72 | C68B | DA8C | 6480 | FEFE | EB59 | 1E49 | 8E53 |
| 0000056360 | 51DF | E80E | F8C6 | 5B59 | 591F | E180 | 57FE | F88B |
| 0000056400 | C20B | 7458 | 8E2B | FCC2 | 5706 | 561E | E9D1 | A5F3 |
| 0000056420 | D88E | E80E | F874 | C483 | 5804 | EB5A | 5119 | E80E |
| 0000056440 | F89A | EB59 | 5011 | 0E56 | 5FE8 | 83F8 | 04C4 | 03E6 |
| 0000056460 | 13E8 | 3300 | 99C0 | 5F1F | 5D5E | 00CB | 1EEA | EF58 |
| 0000056500 | EA57 | 5845 | 58CF | 8B55 | 83EC | 02EC | 5756 | C7FC |
| 0000056520 | FE46 | 0000 | 7441 | 8005 | FEE1 | 01EB | 4E49 | 8B4E |
| 0000056540 | ADFE | 2450 | 89FE | 8B05 | 3BD0 | 73D1 | 0368 | 72F0 |
| 0000056560 | AD5A | 01A8 | 0874 | D003 | 8942 | 4815 | EBEB | FE3D |
| 0000056600 | 75FF | F641 | 0247 | 7401 | 8D3B | 0445 | C103 | 0773 |
| 0000056620 | 46C7 | 01FE | 2B00 | FFC8 | 3B05 | 087F | 0373 | 7F89 |
| 0000056640 | 5208 | E856 | F97A | 5A5E | 1173 | 46C7 | 01FE | 8300 |
| 0000056660 | 10F9 | 1072 | E9D1 | D183 | EB00 | FFE6 | 8D0D | 0275 |
| 0000056700 | C28B | A5EB | 01B8 | 4E00 | EB4E | 5A23 | EBF9 | 4639 |
| 0000056720 | 0346 | EBF1 | 8B19 | FE46 | F78B | F374 | C00B | 0E75 |
| 0000056740 | 0D89 | 4646 | F103 | E372 | D12B | 894A | 4A14 | 9159 |
| 0000056760 | 0125 | 8300 | FF25 | 0509 | 578B | 3B08 | 73FA | 3B07 |
| 0000057000 | 76F2 | 8903 | 087F | D9F7 | 5E5F | E58B | C35D | 8B55 |
| 0000057020 | 57EC | 468B | F706 | 0866 | 0573 | C033 | EB99 | 501A |
| 0000057040 | 069A | D451 | 5958 | D88B | DA0B | 0D74 | 8B50 | 8EF8 |
| 0000057060 | 33C2 | 41C0 | E9D1 | ABF3 | 5F58 | CB5D | 473B | 7506 |
| 0000057100 | C505 | 045F | 19EB | 531E | 1FC5 | 08EB | 1F5B | EBF9 |
| 0000057120 | C50F | 0C5F | D98C | F4E3 | C13B | F575 | C483 | F804 |
| 0000057140 | 00C3 | 8B55 | 8BEC | 1ED6 | 76C5 | C40A | 065E | FFB0 |
| 0000057160 | C00A | 2D74 | 26AC | 278A | 3A43 | 74E0 | 2CF3 | 3C41 |
| 0000057200 | 1A1A | 80C9 | 20E1 | C102 | 4104 | E086 | 412C | 1A3C |
| 0000057220 | C91A | E180 | 0220 | 04C1 | 3A41 | 74C4 | 1AD3 | 1CC0 |
| 0000057240 | 98FF | 8B1F | 5DF2 | 00CB | 8B55 | 8BEC | 0E4E | 571E |
| 0000057260 | E356 | C548 | 0A76 | 7EC4 | 8B06 | 48C1 | D78B | D2F7 |
| 0000057300 | C22B | DB1B | C323 | C203 | D68B | D2F7 | C22B | DB1B |
| 0000057320 | C323 | C203 | 9140 | C12B | E9D1 | A5F3 | C913 | A4F3 |
| 0000057340 | E391 | 0B18 | 75F6 | 8C07 | 05D8 | FFFF | D88E | FF0B |
| 0000057360 | C775 | C08C | 7A05 | 8E5A | EBC0 | 8BBE | 0646 | 568B |
| 0000057400 | 5E08 | 1F5F | CB5D | 8B55 | 8BEC | 0C4E | 38E3 | C457 |
| 0000057420 | 067E | D78B | DAF7 | 0C74 | D12B | DB1B | D323 | D103 |
| 0000057440 | D187 | D12B | 468B | 8A0A | D1E0 | F3E9 | 13AB | F3C9 |
| 0000057460 | 87AA | E3D1 | 8C10 | 81C3 | 85C3 | 8E5A | D1C3 | F3E9 |
| 0000057500 | 13AB | F3C9 | 5FAA | 468B | 8B06 | 0856 | CB5D | 4E8B |
| 0000057520 | 8B0E | 0646 | 568B | 1E08 | 7EC5 | 570A | 071E | 93FC |
| 0000057540 | C00A | 1374 | F983 | 750A | 0B0E | 79D2 | B00A | AA2D |
| 0000057560 | DBF7 | D283 | F700 | 8BDA | 92F7 | D233 | C00B | 0274 |
| 0000057600 | F1F7 | F793 | 92F1 | D387 | 3004 | 393C | 0276 | 2704 |
| 0000057620 | 8BAA | 0BC2 | 75C3 | 88E2 | 4F05 | 86AC | 8805 | FF44 |
| 0000057640 | 448D | 3B01 | 72C7 | 8CF2 | 58DA | 5F1F | 8B5E | 5DE5 |
| 0000057660 | 00CB | 8B55 | FFEC | 0876 | 76FF | 3306 | 50C0 | 9A50 |
| 0000057700 | FFFF | 0000 | C085 | 0374 | 98E9 | 8BDA | 5DE5 | 00CB |
| 0000057720 | 8B55 | 1EEC | C553 | 065E | 76FF | FF0C | 0A76 | 77FF |

THU MAR 14 17:27:10 1991 CRV_ONS.DLL PAGE 27, LINE 1535

```
0000057740  FF02  0E37  2BE8  8900  8907  0257  1F5B  CA5D
0000057760  0008  8B55  1EEC  C553  065E  078B  578B  8B02
0000060000  0A4E  E80E  003E  0789  5789  5B02  5D1F  06CA
0000060020  0000  8B55  8BEC  0846  4E8B  0B0C  8BC8  0A4E
0000060040  0975  468B  F706  5DE1  08CA  5300  E1F7  D88B
0000060060  468B  F706  0C66  D803  468B  F706  03E1  5BD3
0000060100  CA5D  0008  ED32  06E3  E0D1  D2D1  FAE2  2BCB
0000060120  0200  B300  0159  0000  0200  7D00  0257  0000
0000060140  0200  0500  0356  0000  0300  4401  0157  0500
0000060160  0300  DC01  0132  0700  0200  3400  041C  0000
0000060200  0300  6801  0131  0800  0300  D501  014E  8900
0000060220  0300  C401  0150  8A00  0500  CB00  0118  F300
0000060240  0218  DD00  0552  0000  0300  E701  0155  8C00
0000060260  0300  0901  0156  8D00  0300  C301  0155  8E00
0000060300  0300  1C01  011C  8F00  0300  2B01  0317  0100
0000060320  0300  9C01  0156  9100  0300  6001  0104  1600
0000060340  0500  DF00  011B  0700  031C  1901  0106  2000
0000060360  0500  C901  015A  8800  0300  A401  0153  2200
0000060400  0300  8201  0157  2600  0300  6101  042A  1A00
0000060420  0300  CB01  011A  3500  0300  2502  022C  2D00
0000060440  0300  6F01  014F  3A00  0300  8F01  014C  3B00
0000060460  0300  5001  015B  3C00  0300  2F01  0401  2500
0000060500  0300  0401  042A  2600  0300  2B02  0231  3C00
0000060520  0300  5301  014D  4400  0300  6601  014C  4600
0000060540  0500  CB02  0230  1100  0300  8701  014D  4B00
0000060560  0300  AF01  014C  4D00  0300  FE01  0400  3700
0000060600  0300  DC02  022B  4C00  0500  E302  0230  1F00
0000060620  0300  3201  042A  4300  0300  B901  0131  5B00
0000060640  0300  0D01  042B  5100  0000  0000  0000  0000
0000060660  0000  0000  0200  0000  0000  0000  0000  0000
0000060700  0000  0000  0000  0000  0000  0000  0000  0000
*
0000060760  0000  0000  0200  0000  0000  0000  0000  0000
0000061000  0000  0000  0000  0000  0000  0000  0000  0000
*
0000061060  0000  0000  0200  0000  0000  0000  0000  0000
0000061100  0000  0000  0000  0000  0000  0000  0000  0000
*
0000061160  0000  0000  0200  0000  0000  0000  0000  0000
0000061200  0000  0000  0000  0000  534D  5220  6E75  542D
0000061220  6D69  2065  694C  7262  7261  2079  202D  6F43
0000061240  7970  6972  6867  2074  6328  2029  3931  3039
0000061260  202C  694C  7263  736F  666F  2074  6F43  7072
0000061300  0018  0000  0000  0000  0000  0000  0000  0000
0000061320  0000  0000  0000  0000  0000  0000  0000  0000
0000061340  0000  7263  5F76  7573  2E74  0063  6E6F  2E73
0000061360  0070  5553  4954  544E  5245  0000  0062  0082
0000061400  006C  0088  0000  0F66  FFFF  0000  0000  0000
0000061420  0000  4F4D  5355  5F45  4235  0000  0000  0000
0000061440  0000  0000  0000  0000  0000  0000  0000  0000
0000061460  0000  4D00  554F  4553  4D5F  004D  0000  0000
0000061500  0000  0000  0000  0000  0000  0000  0000  0000
0000061520  0000  0100  494D  5243  534F  464F  0054  0000
0000061540  0000  0000  0000  0000  0000  0000  0000  0000
0000061560  0000  0000  5002  3253  0000  0000  0000  0000
0000061600  0000  0000  0000  0000  0000  0000  0000  0000
0000061620  0000  0000  0300  4353  5449  5845  0000  0000
0000061640  0000  0000  0000  0000  0000  0000  0000  0000
0000061660  0000  0000  0000  7304  7475  6966  656C  682E
```

THU MAR 14 17:27:10 1991 CRV_ONS.DLL PAGE 28, LINE 1594

| | | | | | | | | |
|---|---|---|---|---|---|---|---|---|
| 0000061700 | 7865 | 5400 | 3231 | 5F33 | 4E49 | 5F50 | 4F53 | 5446 |
| 0000061720 | 4157 | 4552 | 5400 | 3231 | 5F33 | 4E49 | 5F50 | 4F50 |
| 0000061740 | 4E49 | 4554 | 5F52 | 414E | 454D | 7200 | 0900 | 6F4C |
| 0000061760 | 6461 | 6E69 | 2067 | 6E69 | 7570 | 2074 | 7270 | 636F |
| 0000062000 | 7365 | 6F73 | 2072 | 6966 | 656C | 2520 | 0A73 | 4400 |
| 0000062020 | 574F | 4C4E | 414F | 0044 | 4809 | 7261 | 2064 | 6572 |
| 0000062040 | 6573 | 2074 | 7265 | 6F72 | 2072 | 6425 | 000A | 4909 |
| 0000062060 | 2046 | 6F42 | 746F | 6620 | 6961 | 0A6C | 0900 | 6E49 |
| 0000062100 | 7570 | 2074 | 6F63 | 6564 | 6120 | 726C | 6165 | 7964 |
| 0000062120 | 6C20 | 616F | 6564 | 0A64 | 0900 | 6148 | 6472 | 7220 |
| 0000062140 | 7365 | 7465 | 6520 | 7272 | 726F | 2520 | 0A64 | 0900 |
| 0000062160 | 4649 | 4220 | 6F6F | 2074 | 6166 | 6C69 | 000A | 4909 |
| 0000062200 | 2046 | 6F64 | 6E77 | 6F6C | 6461 | 6620 | 6961 | 0A6C |
| 0000062220 | 0900 | 6843 | 736B | 6D75 | 6520 | 7272 | 7020 | 6361 |
| 0000062240 | 206B | 6425 | 000A | 6F4E | 7220 | 7365 | 6F70 | 736E |
| 0000062260 | 2065 | 6F66 | 2072 | 6170 | 6B63 | 7465 | 2520 | 0A64 |
| 0000062300 | 0900 | 4649 | 7020 | 6361 | 656B | 2074 | 6572 | 7073 |
| 0000062320 | 6E6F | 6573 | 6520 | 7272 | 726F | 000A | 4909 | 2046 |
| 0000062340 | 6E69 | 6F63 | 7272 | 6365 | 2074 | 6170 | 6B63 | 7465 |
| 0000062360 | 7220 | 7365 | 6F70 | 736E | 2065 | 6425 | 000A | 7409 |
| 0000062400 | 6D69 | 2065 | 756F | 2074 | 6E6F | 7020 | 6361 | 656B |
| 0000062420 | 2074 | 6425 | 000A | 4909 | 2046 | 6F64 | 6E77 | 6F6C |
| 0000062440 | 6461 | 6520 | 646E | 6465 | 202C | 6F6E | 2074 | 7566 |
| 0000062460 | 636E | 6974 | 6E6F | 6E69 | 0A67 | 0900 | 6E49 | 7570 |
| 0000062500 | 2074 | 6F64 | 6E77 | 6F6C | 6461 | 6520 | 646E | 6465 |
| 0000062520 | 7320 | 6375 | 6563 | 7373 | 7566 | 6C6C | 0A79 | 4900 |
| 0000062540 | 696E | 6974 | 6C61 | 7A69 | 6E69 | 2067 | 5049 | 000A |
| 0000062560 | 4909 | 2046 | 7265 | 6F72 | 2072 | 6425 | 000A | 4D09 |
| 0000062600 | 766F | 2065 | 6F6D | 7375 | 2065 | 3028 | 302C | 2029 |
| 0000062620 | 7665 | 6E65 | 0A74 | 0900 | 4649 | 6520 | 7272 | 726F |
| 0000062640 | 6520 | 6576 | 746E | 7420 | 7079 | 2065 | 203D | 6425 |
| 0000062660 | 000A | 4909 | 2046 | 7277 | 7469 | 2065 | 7665 | 6E65 |
| 0000062700 | 2074 | 7265 | 2072 | 6425 | 000A | 4909 | 706E | 7475 |
| 0000062720 | 6620 | 6669 | 206F | 7566 | 6C6C | 2820 | 2035 | 6573 |
| 0000062740 | 2063 | 6974 | 656D | 6F20 | 7475 | 0A29 | 0000 | 00AB |
| 0000062760 | 0000 | 0000 | 5409 | 6D69 | 6F65 | 7475 | 6520 | 6576 |
| 0000063000 | 746E | 2520 | 2064 | 6966 | 6F66 | 2520 | 2064 | 6974 |
| 0000063020 | 656D | 2520 | 646C | 000A | 00AB | 0000 | 0000 | 3125 |
| 0000063040 | 2563 | 7832 | 2500 | 7834 | 3125 | 2563 | 6331 | 2500 |
| 0000063060 | 7832 | 0900 | 4649 | 7720 | 6972 | 6574 | 6520 | 6576 |
| 0000063100 | 746E | 6520 | 7272 | 2520 | 0A64 | 0900 | 4649 | 5420 |
| 0000063120 | 6D69 | 6F65 | 7475 | 000A | 4909 | 2046 | 7277 | 7469 |
| 0000063140 | 2065 | 7665 | 6E65 | 2074 | 7265 | 2072 | 6425 | 000A |
| 0000063160 | 4909 | 2046 | 6974 | 656D | 756F | 0A74 | 0900 | 4649 |
| 0000063200 | 6420 | 7665 | 6F69 | 7463 | 206C | 7265 | 2072 | 6425 |
| 0000063220 | 000A | 4909 | 2046 | 6553 | 206D | 6177 | 7469 | 6520 |
| 0000063240 | 7272 | 2520 | 0A64 | 0900 | 6F42 | 746F | 7420 | 206F |
| 0000063260 | 6E69 | 7570 | 2074 | 7270 | 636F | 7365 | 6F73 | 0A72 |
| 0000063300 | 0900 | 6F44 | 2073 | 7277 | 7469 | 2065 | 7265 | 2072 |
| 0000063320 | 6425 | 000A | 4409 | 736F | 6544 | 6976 | 636F | 6C74 |
| 0000063340 | 6520 | 7272 | 2520 | 0A64 | 0900 | 6954 | 656D | 756F |
| 0000063360 | 0A74 | 0900 | 6F44 | 5373 | 6D65 | 6177 | 7469 | 2F20 |
| 0000063400 | 4620 | 4C55 | 464C | 4649 | 204F | 7265 | 2072 | 6425 |
| 0000063420 | 000A | 4909 | 2046 | 7277 | 7469 | 2065 | 7665 | 6E65 |
| 0000063440 | 2074 | 7265 | 2072 | 6425 | 000A | 5409 | 6D69 | 6F65 |
| 0000063460 | 7475 | 000A | 00AB | 0000 | 0000 | 5309 | 7465 | 6420 |
| 0000063500 | 7665 | 6369 | 2065 | 7473 | 7461 | 7375 | 2820 | 2035 |
| 0000063520 | 6573 | 2063 | 2E74 | 296F | 202C | 6966 | 6F66 | 203D |
| 0000063540 | 6425 | 000A | 00AB | 0000 | 0000 | 4909 | 706E | 7475 |

THU MAR 14 17:27:10 1991 CRV_ONS.DLL PAGE 29, LINE 1653

```
0000063560  7020  6F72  6563  7373  726F  7220  6365  6965
0000063600  6576  2064  6C69  656C  6167  206C  7665  6E65
0000063620  2074  000A  4909  706E  7475  7020  6F72  6563
0000063640  7373  726F  7420  6D69  2065  756F  2074  7265
0000063660  6F72  2072  000A  0000  0000  0000  0000  0000
0000063700  0000  0000  0000  0000  0002  0000  0000  0002
0000063720  0000  0000  0000  0004  0000  0000  0000  7263
0000063740  5F76  656B  7379  632E  6F00  736E  702E  4700
0000063760  455F  5F57  0054  5F47  5745  545F  5400  3231
0000064000  5F33  4E49  5F50  4F53  5446  454B  0059  3154
0000064020  3332  495F  504E  485F  544F  454B  0059  055E
0000064040  05A4  0569  007E  7263  5F76  6E69  7469  6B5F
0000064060  7965  0073  5F47  5745  545F  4700  455F  5F57
0000064100  0054  2520  3032  2073  002D  4843  4345  5F4B
0000064120  4353  4552  4E45  4D00  4E41  4155  5F4C  5953
0000064140  434E  2000  6925  3A20  2520  3032  0073  5250
0000064160  5345  0053  4552  454C  5341  0045  4F4D  5355
0000064200  0045  6170  7372  5F65  6E61  5F64  6E69  7469
0000064220  635F  6766  695F  6574  006D  0000  0000  0000
0000064240  0006  0000  1260  125F  0000  0005  0000  0000
0000064260  0000  0000  0000  0000  0000  0000  435F  465F
0000064300  4C49  5F45  4E49  4F46  003D  0001  FFFF  0000
0000064320  0000  0000  0000  0000  0000  0000  0000  0000
0000064340  0001  8101  8181  0000  0000  0000  0000  0000
0000064360  0000  0000  0000  0000  0000  0000  0000  0000
*
0000064740  0000  0A00  0A0A  0A0A  0A0A  0A0A  0A0A  0A0A
0000064760  0A0A  0A0A  0A0A  0A0A  0A0A  0A0A  0A0A  0A0A
*
0000065340  0A0A  000A  0000  0000  0000  0000  0000  0000
0000065360  0000  0000  FF00  00FF  0000  0000  FFFF  FFFF
0000065400  005C  005C  0000  0006  088E  0000  0006  0E10
0000065420  0001  0000  0000  0000  0000  0000  0102  0000
0000065440  0000  0000  0000  0000  0202  0000  0000  0000
0000065460  0000  0000  0000  0000  0000  0000  0000  0000
*
0000066340  0000  0000  0000  0001  0200  0000  0000  0000
0000066360  0000  0000  0000  0000  0000  0000  0000  0000
*
0000067300  0000  0000  0000  0A5A  05A0  0000  0000  0000
0000067320  0000  0920  0D2D  005D  005D  0006  0600  0100
0000067340  0000  0010  0603  0600  1002  4504  4545  0505
0000067360  0505  3505  0030  0050  0000  2000  3020  5850
0000067400  0807  3000  3030  5057  0007  2000  0020  0000
0000067420  0000  6008  6060  6060  0060  7000  7870  7878
0000067440  0878  0807  0000  0007  0808  0008  0800  0800
0000067460  0000  2808  756E  6C6C  0629  0000  0000  0000
0000067500  0000  0000  0000  0000  0000  0003  2000  3400
0000067520  0E02  3400  0CD0  3400  0CD4  3400  0CD8  3400
0000067540  0CDC  3400  0CE0  0000  0000  0101  2000  2020
0000067560  2020  2020  2020  2828  2828  2028  2020  2020
0000067600  2020  2020  2020  2020  2020  2020  4820  1010
0000067620  1010  1010  1010  1010  1010  1010  8410  8484
0000067640  8484  8484  8484  1084  1010  1010  1010  8181
0000067660  8181  8181  0101  0101  0101  0101  0101  0101
0000067700  0101  0101  0101  0101  1010  1010  1010  8282
0000067720  8282  8282  0202  0202  0202  0202  0202  0202
0000067740  0202  0202  0202  0202  1010  1010  0020  0000
0000067760  0000  0000  0000  0000  0000  0000  0000  0000
```

THU MAR 14 17:27:10 1991 CRV_ONS.DLL PAGE 30, LINE 1712

```
*
0000070160   0003  0000  0000  0000  0000  0000  0000  0000
0000070200   3C72  FFFF  FFFF  0E04  0E06  0E08  0E0A  0E0C
0000070220   0E0E  FFFF  FFFF  0C48  3C3C  4D4E  4753  3E3E
0000070240   0000  3652  3030  0D30  2D0A  7320  6174  6B63
0000070260   6F20  6576  6672  6F6C  0D77  000A  0003  3652
0000070300   3030  0D33  2D0A  6920  746E  6765  7265  6420
0000070320   7669  6469  2065  7962  3020  0A0D  0800  5200
0000070340   3036  3830  0A0D  202D  6F6E  2074  6E65  756F
0000070360   6867  7320  6170  6563  6620  726F  6120  6772
0000070400   6D75  6E65  7374  0A0D  0900  5200  3036  3930
0000070420   0A0D  202D  6F6E  2074  6E65  756F  6867  7320
0000070440   6170  6563  6620  726F  6520  766E  7269  6E6F
0000070460   656D  746E  0A0D  FC00  0D00  000A  00FF  7572
0000070500   2D6E  6974  656D  6520  7272  726F  0020  0002
0000070520   3652  3030  0D32  2D0A  6620  6F6C  7461  6E69
0000070540   2D67  6F70  6E69  2074  7573  7070  726F  2074
0000070560   6F6E  2074  6F6C  6461  6465  0A0D  1100  5200
0000070600   3036  3731  0A0D  202D  6E75  7865  6570  7463
0000070620   6465  6D20  6C75  6974  6874  6572  6461  6C20
0000070640   636F  206B  7265  6F72  0D72  000A  0010  3652
0000070660   3130  0D36  2D0A  6E20  746F  6520  6F6E  6775
0000070700   2068  7073  6361  2065  6F66  2072  6874  6572
0000070720   6461  6420  7461  0D61  000A  FFFF  05FF  0200
0000070740   E400  010C  0000  0200  8800  0408  0000  0200
0000070760   1600  050E  0000  0200  1202  020E  1100  0200
0000071000   1402  020E  1F00  4E00  3042  E332  00E4  0000
0000071020   0000  0000  0000  0000  0000  1200  2E2E  6F5C
0000071040   6A62  735C  7475  645F  6665  6F2E  6A62  0001
0000071060   0000  187B  0000  0000  0001  2E12  5C2E  626F
0000071100   5C6A  7263  5F76  7573  2E74  626F  016A  7C00
0000071120   0918  0002  0000  0100  1300  2E2E  6F5C  6A62
0000071140   635C  7672  735F  7475  2E69  626F  016A  8600
0000071160   1E1A  0002  0000  0100  1300  2E2E  6F5C  6A62
0000071200   635C  7672  735F  7475  2E72  626F  016A  A400
0000071220   E11C  0007  0000  0100  1200  2E2E  6F5C  6A62
0000071240   635C  7672  735F  6B66  6F2E  6A62  0001  2486
0000071260   04B5  0000  0000  0001  2E12  5C2E  626F  5C6A
0000071300   7263  5F76  6F68  2E74  626F  016A  3C00  1029
0000071320   0008  0000  0100  1300  2E2E  6F5C  6A62  635C
0000071340   7672  6B5F  7965  2E73  626F  016A  5C00  D131
0000071360   0000  0100  0100  0B00  6C64  5C6C  7363  2E75
0000071400   7361  016D  2E00  AF32  0001  0100  0100  0E00
0000071420   6C64  5C6C  7363  6475  7461  612E  6D73  0001
0000071440   33DE  0022  0000  0001  0001  6F0F  3273  635C
0000071460   7472  6D30  6773  612E  6D73  0001  3400  0006
0000071500   0000  0001  0001  630A  7472  6630  2E70  7361
0000071520   016D  0600  1A34  0000  0100  0100  0A00  6863
0000071540   736B  6B74  612E  6D73  0001  3420  0108  0000
0000071560   0001  0001  640D  6C6C  735C  7465  6E65  7076
0000071600   632E  0001  3528  0065  0000  0001  0001  6F0F
0000071620   3273  6E5C  736D  6867  7264  612E  6D73  0001
0000071640   358E  00C0  0000  0001  0001  6F0E  3273  645C
0000071660   736F  6572  2E74  7361  016D  4E00  0236  0001
0000071700   0100  0100  0800  6366  6F6C  6573  632E  0001
0000071720   3750  006A  0000  0001  0001  6607  706F  6E65
0000071740   632E  0001  37BA  004E  0000  0001  0001  7008
0000071760   6972  746E  2E66  0063  0000  0000  0000  0100
0000072000   0000  0B00  635F  6C66  7375  2E68  7361  006D
```

THU MAR 14 17:27:10 1991 CRV_ONS.DLL PAGE 31, LINE 1771

| | | | | | | | | |
|---|---|---|---|---|---|---|---|---|
| 0000072020 | 000D | 0000 | 0000 | 0100 | 0000 | 0700 | 665F | 6C69 |
| 0000072040 | 2E65 | 0163 | 0800 | 9C38 | 0000 | 0100 | 0100 | 0B00 |
| 0000072060 | 665F | 6C69 | 7562 | 2E66 | 7361 | 016D | A400 | E538 |
| 0000072100 | 0000 | 0100 | 0100 | 0B00 | 665F | 736C | 7562 | 2E66 |
| 0000072120 | 7361 | 016D | 8A00 | 3739 | 0000 | 0100 | 0100 | 0C00 |
| 0000072140 | 665F | 6572 | 6265 | 6675 | 612E | 6D73 | 0001 | 39C2 |
| 0000072160 | 004B | 0000 | 0001 | 0001 | 5F0B | 6567 | 6274 | 6675 |
| 0000072200 | 612E | 6D73 | 0001 | 3A0E | 00F2 | 0000 | 0001 | 0001 |
| 0000072220 | 5F07 | 706F | 6E65 | 632E | 0001 | 3B00 | 00C0 | 0000 |
| 0000072240 | 0001 | 0001 | 5F0B | 6673 | 6274 | 6675 | 612E | 6D73 |
| 0000072260 | 0001 | 3BC0 | 012E | 0000 | 0001 | 0001 | 6608 | 6C66 |
| 0000072300 | 7375 | 2E68 | 0163 | EE00 | 2A3C | 0008 | 0100 | 0100 |
| 0000072320 | 0700 | 6E69 | 7570 | 2E74 | 0163 | 1800 | FA45 | 0004 |
| 0000072340 | 0100 | 0100 | 0A00 | 756F | 7074 | 7475 | 612E | 6D73 |
| 0000072360 | 0001 | 4A12 | 0078 | 0000 | 0001 | 0001 | 7308 | 7274 |
| 0000072400 | 6165 | 2E6D | 0163 | 8A00 | AA4A | 0000 | 0100 | 0100 |
| 0000072420 | 0800 | 6E75 | 6567 | 6374 | 632E | 0001 | 4B34 | 003F |
| 0000072440 | 0000 | 0001 | 0001 | 6F0D | 3273 | 635C | 6F6C | 6573 |
| 0000072460 | 612E | 6D73 | 0001 | 4B74 | 0077 | 0000 | 0001 | 0001 |
| 0000072500 | 6F0D | 3273 | 6C5C | 6573 | 6B65 | 612E | 6D73 | 0001 |
| 0000072520 | 4BEC | 01DD | 0000 | 0001 | 0001 | 6F0C | 3273 | 6F5C |
| 0000072540 | 6570 | 2E6E | 7361 | 016D | CA00 | 5D4D | 0001 | 0100 |
| 0000072560 | 0100 | 0C00 | 736F | 5C32 | 6572 | 6461 | 612E | 6D73 |
| 0000072600 | 0001 | 4F28 | 01DD | 0000 | 0001 | 0001 | 7709 | 6972 |
| 0000072620 | 6574 | 612E | 6D73 | 0000 | 0000 | 0000 | 0000 | 0001 |
| 0000072640 | 0000 | 740B | 7478 | 6F6D | 6564 | 612E | 6D73 | 0001 |
| 0000072660 | 5106 | 000A | 0000 | 0001 | 0001 | 6D0A | 6C61 | 6F6C |
| 0000072700 | 2E63 | 7361 | 016D | 1000 | 0A51 | 0000 | 0100 | 0100 |
| 0000072720 | 0800 | 7266 | 6565 | 612E | 6D73 | 0001 | 511A | 00AF |
| 0000072740 | 0000 | 0001 | 0001 | 660B | 616D | 6C6C | 636F | 612E |
| 0000072760 | 6D73 | 0000 | 0000 | 0000 | 0000 | 0001 | 0000 | 6609 |
| 0000073000 | 6164 | 6174 | 612E | 6D73 | 0001 | 51CA | 0034 | 0000 |
| 0000073020 | 0001 | 0001 | 690B | 696E | 7374 | 6765 | 612E | 6D73 |
| 0000073040 | 0001 | 51FE | 0036 | 0000 | 0001 | 0001 | 6C0B | 6E69 |
| 0000073060 | 736B | 6765 | 612E | 6D73 | 0001 | 5234 | 007C | 0000 |
| 0000073100 | 0001 | 0001 | 730C | 6165 | 6372 | 7368 | 2E67 | 7361 |
| 0000073120 | 016D | B000 | E252 | 0000 | 0100 | 0100 | 0B00 | 7267 |
| 0000073140 | 776F | 6573 | 2E67 | 7361 | 016D | 9200 | 3153 | 0000 |
| 0000073160 | 0100 | 0100 | 0A00 | 656E | 7377 | 6765 | 612E | 6D73 |
| 0000073200 | 0001 | 53C4 | 0046 | 0000 | 0001 | 0001 | 730A | 7274 |
| 0000073220 | 6163 | 2E74 | 7361 | 016D | 0A00 | 3654 | 0000 | 0100 |
| 0000073240 | 0100 | 0A00 | 7473 | 6372 | 7970 | 612E | 6D73 | 0001 |
| 0000073260 | 5440 | 0029 | 0000 | 0001 | 0001 | 730A | 7274 | 6D63 |
| 0000073300 | 2E70 | 7361 | 016D | 6A00 | 1754 | 0000 | 0100 | 0100 |
| 0000073320 | 0A00 | 7473 | 6C72 | 6E65 | 612E | 6D73 | 0001 | 5482 |
| 0000073340 | 003B | 0000 | 0001 | 0001 | 730B | 7274 | 636E | 706D |
| 0000073360 | 612E | 6D73 | 0001 | 54BE | 001C | 0000 | 0001 | 0001 |
| 0000073400 | 6908 | 6F74 | 2E61 | 7361 | 006D | 0000 | 0000 | 0000 |
| 0000073420 | 0100 | 0000 | 0C00 | 6D63 | 7369 | 6463 | 7461 | 612E |
| 0000073440 | 6D73 | 0000 | 0000 | 0000 | 0000 | 0001 | 0000 | 6309 |
| 0000073460 | 7974 | 6570 | 612E | 6D73 | 0001 | 54DA | 00A6 | 0000 |
| 0000073500 | 0001 | 0001 | 6708 | 7465 | 6E65 | 2E76 | 0163 | 8000 |
| 0000073520 | BA55 | 0000 | 0100 | 0100 | 0D00 | 736F | 5C32 | 6C6D |
| 0000073540 | 636F | 2E6B | 7361 | 016D | 3A00 | 0E56 | 0001 | 0100 |
| 0000073560 | 0100 | 0E00 | 6C64 | 5C6C | 6874 | 6572 | 6461 | 612E |
| 0000073600 | 6D73 | 0001 | 5748 | 007A | 0000 | 0001 | 0001 | 6410 |
| 0000073620 | 6C6C | 745C | 6469 | 6174 | 6C62 | 2E65 | 7361 | 016D |
| 0000073640 | C200 | 5C57 | 0000 | 0100 | 0100 | 0800 | 7373 | 6163 |
| 0000073660 | 666E | 632E | 0001 | 581E | 00AD | 0000 | 0001 | 0001 |

THU MAR 14 17:27:10 1991 CRV_ONS.DLL PAGE 32, LINE 1830

| | | | | | | | | |
|---|---|---|---|---|---|---|---|---|
| 0000073700 | 660C | 6572 | 6C61 | 6F6C | 2E63 | 7361 | 016D | CC00 |
| 0000073720 | 0A58 | 0000 | 0100 | 0100 | 0B00 | 6572 | 6C61 | 6F6C |
| 0000073740 | 2E63 | 7361 | 016D | D600 | C858 | 0000 | 0100 | 0100 |
| 0000073760 | 0A00 | 6572 | 6973 | 657A | 612E | 6D73 | 0001 | 599E |
| 0000074000 | 002E | 0000 | 0001 | 0001 | 630A | 6C61 | 6F6C | 2E63 |
| 0000074020 | 7361 | 016D | CC00 | 2559 | 0000 | 0100 | 0100 | 0B00 |
| 0000074040 | 6966 | 646E | 6573 | 2E67 | 7361 | 016D | F200 | 4559 |
| 0000074060 | 0000 | 0100 | 0100 | 0B00 | 7473 | 6972 | 6D63 | 2E70 |
| 0000074100 | 7361 | 016D | 3800 | 5E5A | 0000 | 0100 | 0100 | 0B00 |
| 0000074120 | 6D68 | 6D65 | 7063 | 2E79 | 7361 | 016D | 9600 | 485A |
| 0000074140 | 0000 | 0100 | 0100 | 0B00 | 6D68 | 6D65 | 6573 | 2E74 |
| 0000074160 | 7361 | 016D | DE00 | 635A | 0000 | 0100 | 0100 | 0800 |
| 0000074200 | 7478 | 616F | 612E | 6D73 | 0001 | 5B42 | 001D | 0000 |
| 0000074220 | 0001 | 0001 | 6F0E | 3273 | 755C | 6C6E | 6E69 | 2E6B |
| 0000074240 | 7361 | 016D | 6000 | 225B | 0000 | 0100 | 0100 | 0900 |
| 0000074260 | 6C61 | 756D | 2E6C | 7361 | 016D | 8200 | 1F5B | 0000 |
| 0000074300 | 0100 | 0100 | 0900 | 6C61 | 6873 | 2E6C | 7361 | 016D |
| 0000074320 | A200 | 325B | 0000 | 0100 | 0100 | 0800 | 6D6C | 6C75 |
| 0000074340 | 612E | 6D73 | 0001 | 5BD4 | 000B | 0000 | 0001 | 0001 |
| 0000074360 | 6C08 | 6873 | 2E6C | 7361 | 026D | 0400 | 6300 | 0E05 |
| 0000074400 | 735F | 7475 | 655F | 6576 | 746E | 705F | 7274 | 0206 |
| 0000074420 | 0004 | 0085 | 5F0D | 7573 | 5F74 | 616C | 7473 | 695F |
| 0000074440 | 746E | 0000 | 0004 | 0084 | 5F0D | 7573 | 5F74 | 6E69 |
| 0000074460 | 5F74 | 6164 | 6174 | 0042 | 0005 | 0086 | 5F0D | 7573 |
| 0000074500 | 5F74 | 6572 | 6461 | 735F | 6D65 | 0046 | 0005 | 0086 |
| 0000074520 | 5F14 | 7573 | 5F74 | 6C62 | 5F6B | 6572 | 6963 | 6576 |
| 0000074540 | 5F64 | 6573 | 4A6D | 0500 | 8600 | 1400 | 735F | 7475 |
| 0000074560 | 635F | 6B68 | 735F | 6D75 | 655F | 7272 | 735F | 6D65 |
| 0000074600 | 004E | 0005 | 0086 | 5F10 | 7573 | 5F74 | 6E65 | 5F64 |
| 0000074620 | 6572 | 5F63 | 6573 | 526D | 0500 | 8600 | 0F00 | 735F |
| 0000074640 | 7475 | 6B5F | 7265 | 656E | 5F6C | 6573 | 566D | 0500 |
| 0000074660 | 8600 | 0F00 | 735F | 7475 | 615F | 7070 | 696C | 5F63 |
| 0000074700 | 6573 | 5A6D | 0500 | 8600 | 1300 | 735F | 7475 | 6B5F |
| 0000074720 | 6462 | 735F | 6174 | 7574 | 5F73 | 6573 | 5E6D | 0500 |
| 0000074740 | 8600 | 1000 | 735F | 7475 | 635F | 6D6F | 616D | 646E |
| 0000074760 | 735F | 6D65 | 0208 | 0004 | 0085 | 5F0B | 7573 | 5F74 |
| 0000075000 | 6168 | 646E | 656C | 0000 | 0001 | 070D | 530C | 5455 |
| 0000075020 | 445F | 5652 | 4F5F | 4550 | 5C4E | 0100 | 0E00 | 0D07 |
| 0000075040 | 5553 | 5F54 | 4554 | 4D52 | 4E49 | 5441 | D845 | 0105 |
| 0000075060 | 1D00 | 0C07 | 5243 | 5F56 | 5553 | 5F54 | 4E49 | 5449 |
| 0000075100 | 0637 | 0001 | 0720 | 5F0A | 7573 | 5F74 | 7265 | 6F72 |
| 0000075120 | 6472 | 0106 | 2300 | 1407 | 735F | 7475 | 775F | 6972 |
| 0000075140 | 6574 | 695F | 746E | 7265 | 7572 | 7470 | 06A9 | 0001 |
| 0000075160 | 0725 | 530E | 5455 | 525F | 4145 | 5F44 | 5645 | 4E45 |
| 0000075200 | 1B54 | 0109 | 2800 | 1607 | 5553 | 5F54 | 5257 | 5449 |
| 0000075220 | 5F45 | 4954 | 494D | 474E | 455F | 4556 | 544E | 0A52 |
| 0000075240 | 0001 | 072A | 530F | 5455 | 575F | 4952 | 4554 | 455F |
| 0000075260 | 4556 | 544E | 0D3B | 0001 | 072F | 531A | 5455 | 535F |
| 0000075300 | 4E59 | 5F43 | 4957 | 4854 | 495F | 504E | 5455 | 455F |
| 0000075320 | 4556 | 544E | 4A53 | 0111 | 3A00 | 1107 | 735F | 7475 |
| 0000075340 | 6D5F | 756F | 6573 | 665F | 726F | 616D | C274 | 0111 |
| 0000075360 | 3C00 | 1007 | 5553 | 5F54 | 4954 | 494D | 474E | 555F |
| 0000075400 | 494E | 5354 | 1260 | 0001 | 073F | 5312 | 5455 | 545F |
| 0000075420 | 4D49 | 4E49 | 5F47 | 4544 | 4146 | 4C55 | FC54 | 0112 |
| 0000075440 | 4000 | 0907 | 5553 | 5F54 | 4552 | 4553 | A854 | 0113 |
| 0000075460 | 4100 | 0E07 | 5553 | 5F54 | 4148 | 4452 | 525F | 5345 |
| 0000075500 | 5445 | 1409 | 0001 | 0743 | 5312 | 5455 | 535F | 4F54 |
| 0000075520 | 5F50 | 4F4D | 5355 | 5F45 | 5553 | 354D | 0114 | 4400 |
| 0000075540 | 0B07 | 5553 | 5F54 | 4F43 | 4E4E | 4345 | 7854 | 0114 |

THU MAR 14 17:27:10 1991 CRV_ONS.DLL PAGE 33, LINE 1889

| | | | | | | | | |
|---|---|---|---|---|---|---|---|---|
| 0000075560 | 4500 | 0A07 | 5553 | 5F54 | 5942 | 4150 | 5353 | 14BB |
| 0000075600 | 0001 | 0746 | 5308 | 5455 | 4C5F | 434F | FE4B | 0114 |
| 0000075620 | 4700 | 0A07 | 5553 | 5F54 | 4E55 | 4F4C | 4B43 | 1541 |
| 0000075640 | 0001 | 0749 | 531C | 5455 | 475F | 5445 | 495F | 504E |
| 0000075660 | 5455 | 445F | 5645 | 4349 | 5345 | 535F | 4154 | 5554 |
| 0000075700 | B353 | 0116 | 4C00 | 1C07 | 5553 | 5F54 | 4553 | 5F54 |
| 0000075720 | 4E49 | 5550 | 5F54 | 4544 | 4956 | 4543 | 5F53 | 5453 |
| 0000075740 | 5441 | 5355 | 17C6 | 0001 | 074E | 5310 | 5455 | 525F |
| 0000075760 | 5345 | 4D55 | 5F45 | 4E49 | 5550 | F954 | 0117 | 4F00 |
| 0000076000 | 0F07 | 4653 | 5F4B | 4143 | 5450 | 5255 | 5F45 | 4C46 |
| 0000076020 | 2147 | 0118 | 5100 | 1707 | 5243 | 5F56 | 4553 | 5F54 |
| 0000076040 | 4653 | 5F4B | 4143 | 5450 | 5255 | 5F45 | 4C46 | 5147 |
| 0000076060 | 0118 | 5300 | 1507 | 5553 | 5F54 | 4146 | 5453 | 525F |
| 0000076100 | 5045 | 414C | 5F59 | 4150 | 4152 | 844D | 0500 | 8500 |
| 0000076120 | 0C00 | 735F | 6B66 | 635F | 7061 | 7574 | 6572 | 187C |
| 0000076140 | 0001 | 0648 | 4912 | 544E | 545F | 5248 | 4145 | 5F44 |
| 0000076160 | 4553 | 5F4D | 5450 | A652 | 0118 | 4900 | 1706 | 5243 |
| 0000076200 | 5F56 | 504F | 4E45 | 535F | 5455 | 495F | 544E | 545F |
| 0000076220 | 5248 | 4145 | BA44 | 011B | 1100 | 1806 | 5243 | 5F56 |
| 0000076240 | 504F | 4E45 | 535F | 5455 | 525F | 4145 | 5F44 | 4854 |
| 0000076260 | 4552 | 4441 | 1C7A | 0001 | 0615 | 5317 | 5455 | 525F |
| 0000076300 | 4145 | 5F44 | 4F54 | 435F | 5652 | 535F | 4D45 | 505F |
| 0000076320 | 5254 | 0536 | 0005 | 0086 | 5F11 | 7573 | 5F74 | 6572 |
| 0000076340 | 6461 | 695F | 746E | 735F | 6D65 | 053A | 0005 | 0086 |
| 0000076360 | 5F14 | 7573 | 5F74 | 6572 | 6461 | 745F | 5F6F | 7263 |
| 0000076400 | 5F76 | 6573 | A46D | 011C | B600 | 1906 | 635F | 7672 |
| 0000076420 | 625F | 6975 | 646C | 735F | 666F | 6B74 | 7965 | 5F73 |
| 0000076440 | 6174 | 6C62 | C065 | 011D | B800 | 1A06 | 635F | 7672 |
| 0000076460 | 615F | 6464 | 735F | 666F | 6B74 | 7965 | 5F73 | 6F74 |
| 0000076500 | 745F | 6261 | 656C | 1E7E | 0001 | 06BA | 5F1C | 7263 |
| 0000076520 | 5F76 | 6564 | 5F6C | 6F73 | 7466 | 656B | 7379 | 665F |
| 0000076540 | 6F72 | 5F6D | 6174 | 6C62 | C365 | 011F | BB00 | 1906 |
| 0000076560 | 635F | 7672 | 635F | 656C | 7261 | 735F | 666F | 6B74 |
| 0000076600 | 7965 | 5F73 | 6174 | 6C62 | CA65 | 0123 | C500 | 1906 |
| 0000076620 | 5243 | 5F56 | 5453 | 504F | 535F | 464F | 4B54 | 5945 |
| 0000076640 | 535F | 5145 | 4555 | 434E | F145 | 0123 | C600 | 1706 |
| 0000076660 | 5243 | 5F56 | 4E49 | 5449 | 535F | 464F | 4B54 | 5945 |
| 0000076700 | 5F53 | 4154 | 4C42 | F445 | 011F | BD00 | 1C06 | 735F |
| 0000076720 | 6165 | 6372 | 5F68 | 6F66 | 5F72 | 6F73 | 7466 | 656B |
| 0000076740 | 5F79 | 6573 | 7571 | 6E65 | 6563 | 2486 | 0001 | 06AC |
| 0000076760 | 5F18 | 7263 | 5F76 | 7562 | 6C69 | 5F64 | 6F68 | 6B74 |
| 0000077000 | 7965 | 5F73 | 6174 | 6C62 | 1A65 | 0125 | AE00 | 1906 |
| 0000077020 | 635F | 7672 | 615F | 6464 | 685F | 746F | 656B | 7379 |
| 0000077040 | 745F | 5F6F | 6174 | 6C62 | C965 | 0125 | B000 | 1A06 |
| 0000077060 | 635F | 7672 | 645F | 6C65 | 685F | 746F | 656B | 5F79 |
| 0000077100 | 7266 | 6D6F | 745F | 6261 | 656C | 26F6 | 0001 | 06B1 |
| 0000077120 | 5F18 | 7263 | 5F76 | 6C63 | 6165 | 5F72 | 6F68 | 6B74 |
| 0000077140 | 7965 | 5F73 | 6174 | 6C62 | 2765 | 0127 | B300 | 1506 |
| 0000077160 | 5243 | 5F56 | 4553 | 5241 | 4843 | 465F | 524F | 485F |
| 0000077200 | 544F | 454B | 8759 | 0128 | B400 | 1806 | 5243 | 5F56 |
| 0000077220 | 5453 | 504F | 485F | 544F | 454B | 5F59 | 4553 | 5551 |
| 0000077240 | 4E45 | 4543 | 28D1 | 0001 | 06B5 | 4316 | 5652 | 495F |
| 0000077260 | 494E | 5F54 | 4F48 | 4B54 | 5945 | 5F53 | 4154 | 4C42 |
| 0000077300 | 3C45 | 0129 | 5C00 | 0E05 | 635F | 7672 | 695F | 696E |
| 0000077320 | 5F74 | 656B | 7379 | 0F5E | 0005 | 0000 | 5F06 | 6465 |
| 0000077340 | 7461 | 6061 | 0512 | 0000 | 0400 | 655F | 646E | 315C |
| 0000077360 | 0001 | 0000 | 4306 | 495F | 494E | 2854 | 0506 | 0000 |
| 0000077400 | 0C00 | 5F5F | 686E | 6165 | 5F70 | 6564 | 6373 | 1260 |
| 0000077420 | 0005 | 0000 | 5F0C | 7473 | 6361 | 626B | 746F | 6F74 |

THU MAR 14 17:27:10 1991 CRV_ONS.DLL PAGE 34, LINE 1948

| | | | | | | | | |
|---|---|---|---|---|---|---|---|---|
| 0000077440 | 4E6D | 0506 | 0000 | 0C00 | 5F5F | 615F | 4244 | 7773 |
| 0000077460 | 6670 | 676C | 061A | 0005 | 0000 | 5F08 | 615F | 6D63 |
| 0000077500 | 6C64 | 4C6E | 0506 | 0000 | 0800 | 5F5F | 7361 | 6765 |
| 0000077520 | 6968 | 064A | 0005 | 0000 | 5F08 | 615F | 6573 | 6C67 |
| 0000077540 | 266F | 0506 | 0000 | 0800 | 5F5F | 7361 | 7A69 | 7364 |
| 0000077560 | 0624 | 0005 | 0000 | 5F08 | 615F | 6F74 | 7370 | 3C70 |
| 0000077600 | 0506 | 0000 | 0900 | 5F5F | 6361 | 6966 | 666E | D66F |
| 0000077620 | 00D6 | 0100 | 0900 | 5F5F | 4461 | 7542 | 6573 | 1C64 |
| 0000077640 | 0506 | 0000 | 0900 | 5F5F | 6561 | 766E | 6573 | 2067 |
| 0000077660 | 0506 | 0000 | 0A00 | 5F5F | 6874 | 6572 | 6461 | 6469 |
| 0000077700 | 061E | 0005 | 0000 | 5F0A | 675F | 6E69 | 6F66 | 6573 |
| 0000077720 | D667 | 00D6 | 0100 | 0A00 | 5F5F | 4461 | 6442 | 736F |
| 0000077740 | 7077 | 0622 | 0005 | 0000 | 5F0A | 6C5F | 6E69 | 6F66 |
| 0000077760 | 6573 | 7667 | 0098 | 0100 | 0A00 | 5F5F | 6361 | 7472 |
| 0000100000 | 7375 | 6465 | 0650 | 0005 | 0000 | 5F0B | 5F5F | 4461 |
| 0000100020 | 7242 | 6574 | 7272 | 31CD | 0001 | 0000 | 5F0B | 615F |
| 0000100040 | 736D | 5F67 | 7865 | 7469 | 065E | 0005 | 0000 | 5F0B |
| 0000100060 | 6F5F | 7673 | 7265 | 6973 | 6E6F | 32E7 | 0001 | 0000 |
| 0000100100 | 5F06 | 655F | 6978 | 9974 | 0133 | 0000 | 0C00 | 5F5F |
| 0000100120 | 6E75 | 6F6C | 6B63 | 7865 | 7469 | 0871 | 0005 | 0000 |
| 0000100140 | 5F07 | 635F | 6968 | 646C | 0661 | 0005 | 0000 | 5F07 |
| 0000100160 | 6E5F | 6966 | 656C | 322E | 0001 | 0000 | 5F07 | 635F |
| 0000100200 | 6E69 | 7469 | 0863 | 0005 | 0000 | 5F07 | 5F5F | 7261 |
| 0000100220 | 6367 | 32EF | 0001 | 0000 | 5F07 | 635F | 7865 | 7469 |
| 0000100240 | 065E | 0005 | 0000 | 5F0D | 645F | 736F | 6576 | 6D72 |
| 0000100260 | 6A61 | 726F | 0865 | 0005 | 0000 | 5F07 | 5F5F | 7261 |
| 0000100300 | 7667 | 065F | 0005 | 0000 | 5F0D | 645F | 736F | 6576 |
| 0000100320 | 6D72 | 6E69 | 726F | 0763 | 0005 | 0000 | 5F08 | 705F |
| 0000100340 | 7069 | 6365 | 6968 | 0508 | 0000 | 0800 | 655F | 766E |
| 0000100360 | 7269 | 6E6F | 0663 | 0005 | 0000 | 5F08 | 6F5F | 6673 |
| 0000100400 | 6C69 | 6065 | 0506 | 0000 | 0800 | 5F5F | 736F | 6F6D |
| 0000100420 | 6564 | 3288 | 0001 | 0000 | 5F08 | 695F | 696E | 6674 |
| 0000100440 | F470 | 050D | 0000 | 0800 | 5F5F | 7066 | 6E69 | 7469 |
| 0000100460 | 33BC | 0001 | 0000 | 5F08 | 745F | 7265 | 666D | 6D70 |
| 0000100500 | 0508 | 0000 | C300 | 5F5F | 6770 | 706D | 7274 | 32F9 |
| 0000100520 | 0001 | 0000 | 5F08 | 635F | 655F | 6978 | 6074 | 0506 |
| 0000100540 | 0000 | 0900 | 5F5F | 6F64 | 6D73 | 646F | 5E65 | 0506 |
| 0000100560 | 0000 | 0900 | 5F5F | 736F | 616D | 6F6A | 5F72 | 0506 |
| 0000100600 | 0000 | 0900 | 5F5F | 736F | 696D | 6F6E | 7372 | 0508 |
| 0000100620 | 0000 | 0A00 | 5F5F | 7865 | 7469 | 6F64 | 656E | 334F |
| 0000100640 | 0001 | 0000 | 5F0A | 6C5F | 636F | 656B | 6978 | 5C74 |
| 0000100660 | 0506 | 0000 | 0A00 | 5F5F | 6D75 | 7361 | 766B | 6C61 |
| 0000100700 | 33BC | 0001 | 0000 | 5F0A | 635F | 6574 | 6D72 | 7573 |
| 0000100720 | 7562 | 0508 | 0000 | 0A00 | 5F5F | 7865 | 7469 | 745F |
| 0000100740 | 6469 | 0652 | 0005 | 0000 | 5F05 | 665F | 6361 | 32E0 |
| 0000100760 | 0001 | 0000 | 5F05 | 7865 | 7469 | 33DE | 0001 | 0000 |
| 0000101000 | 5F0E | 465F | 5F46 | 534D | 4247 | 4E41 | 454E | 7852 |
| 0000101020 | 0508 | 0000 | 0900 | 5F5F | 6461 | 6762 | 736D | 7667 |
| 0000101040 | 0098 | 0100 | 0900 | 5F5F | 6361 | 7472 | 736D | 0067 |
| 0000101060 | 0134 | 0000 | 0800 | 5F5F | 7066 | 7274 | 7061 | 087C |
| 0000101100 | 0005 | 0000 | 5F0C | 615F | 6C61 | 7374 | 6B74 | 766F |
| 0000101120 | 0672 | 0134 | 0000 | 0800 | 5F5F | 6863 | 736B | 6B74 |
| 0000101140 | 3406 | 0001 | 0000 | 5F0A | 615F | 6346 | 6B68 | 7473 |
| 0000101160 | 206B | 0134 | 0000 | 0900 | 5F5F | 6573 | 6574 | 766E |
| 0000101200 | 2870 | 0135 | 0000 | 0B00 | 5F5F | 4D4E | 4753 | 545F |
| 0000101220 | 5845 | 5854 | 0135 | 0000 | 0C00 | 5F5F | 4D4E | 4753 |
| 0000101240 | 575F | 4952 | 4554 | 363A | 0001 | 0000 | 5F0B | 5F5F |
| 0000101260 | 6F64 | 6573 | 7272 | 6F6E | 3642 | 0001 | 0000 | 5F07 |
| 0000101300 | 655F | 7272 | 6F6E | 35F3 | 0001 | 0000 | 5F08 | 645F |

THU MAR 14 17:27:10 1991 CRV_ONS.DLL PAGE 35, LINE 2007

| | | | | | | | | |
|---|---|---|---|---|---|---|---|---|
| 0000101320 | 736F | 6572 | DA74 | 0135 | 0000 | 0900 | 5F5F | 6F64 |
| 0000101340 | 7273 | 7465 | 9A66 | 0136 | 0000 | 0B00 | 5F5F | 6366 |
| 0000101360 | 6F6C | 6573 | 6C5F | 4E6B | 0136 | 0000 | 0700 | 665F |
| 0000101400 | 6C63 | 736F | 5065 | 0137 | 0000 | 0800 | 5F5F | 7366 |
| 0000101420 | 706F | 6E65 | 37A2 | 0001 | 0000 | 5F06 | 6F66 | 6570 |
| 0000101440 | BA6E | 0137 | 0000 | 0700 | 705F | 6972 | 746E | 8466 |
| 0000101460 | 0508 | 0000 | 0800 | 5F5F | 6663 | 756C | 6873 | 0006 |
| 0000101500 | 0004 | 0000 | 5F07 | 625F | 6675 | 6E69 | 0886 | 0005 |
| 0000101520 | 0000 | 5F05 | 695F | 626F | 0A66 | 0005 | 0000 | 5F06 |
| 0000101540 | 695F | 626F | 4632 | 050C | 0000 | 0900 | 5F5F | 616C |
| 0000101560 | 7473 | 6F69 | 0862 | 0138 | 0000 | 0800 | 5F5F | 6966 |
| 0000101600 | 626C | 6675 | 38A4 | 0001 | 0000 | 5F08 | 665F | 736C |
| 0000101620 | 7562 | 8A66 | 0139 | 0000 | 0900 | 5F5F | 7266 | 6565 |
| 0000101640 | 7562 | C266 | 0139 | 0000 | 0800 | 5F5F | 6567 | 6274 |
| 0000101660 | 6675 | 3A0E | 0001 | 0000 | 5F0A | 6F5F | 6570 | 666E |
| 0000101700 | 6C69 | 7865 | 013B | 0000 | 0700 | 5F5F | 7466 | 7562 |
| 0000101720 | 0066 | 013B | 0000 | 0700 | 5F5F | 7473 | 7562 | 0666 |
| 0000101740 | 013C | 0000 | 0B00 | 5F5F | 6666 | 756C | 6873 | 6C5F |
| 0000101760 | C06B | 013B | 0000 | 0700 | 665F | 6C66 | 7375 | 7268 |
| 0000102000 | 013C | 0000 | 0900 | 665F | 756C | 6873 | 6C61 | EE6C |
| 0000102020 | 013C | 0000 | 0700 | 5F5F | 6E69 | 7570 | 2874 | 0145 |
| 0000102040 | 0000 | 0800 | 5F5F | 756F | 7074 | 7475 | 4A12 | 0001 |
| 0000102060 | 0000 | 5F0B | 675F | 7465 | 7473 | 6572 | 6D61 | 4A8A |
| 0000102100 | 0001 | 0000 | 5F07 | 6E75 | 6567 | 6374 | 4ACA | 0001 |
| 0000102120 | 0000 | 5F0B | 755F | 676E | 7465 | 5F63 | 6B6C | 4B34 |
| 0000102140 | 0001 | 0000 | 5F06 | 6C63 | 736F | 7E65 | 014B | 0000 |
| 0000102160 | 0600 | 6C5F | 6573 | 6B65 | 4B74 | 0001 | 0000 | 5F0A |
| 0000102200 | 6C5F | 6573 | 6B65 | 6C5F | EC6B | 014B | 0000 | 0600 |
| 0000102220 | 735F | 706F | 6E65 | 4BFD | 0001 | 0000 | 5F05 | 706F |
| 0000102240 | 6E65 | 4DB8 | 0001 | 0000 | 5F11 | 635F | 4558 | 494E |
| 0000102260 | 7458 | 446F | 534F | 6F6D | 6564 | 4DCA | 0001 | 0000 |
| 0000102300 | 5F05 | 6572 | 6461 | 4F32 | 0001 | 0000 | 5F06 | 7277 |
| 0000102320 | 7469 | 2865 | 014F | 0000 | 0A00 | 5F5F | 7277 | 7469 |
| 0000102340 | 5F65 | 6B6C | 0CBC | 0005 | 0000 | 5F07 | 665F | 6F6D |
| 0000102360 | 6564 | 0CBC | 0005 | 0000 | 5F08 | 695F | 6D6F | 646F |
| 0000102400 | 0665 | 0151 | 0000 | 0700 | 6D5F | 6C61 | 6F6C | 0B63 |
| 0000102420 | 0151 | 0000 | 0A00 | 6D5F | 6C61 | 6F6C | 5F63 | 6B6C |
| 0000102440 | 5115 | 0001 | 0000 | 5F08 | 7266 | 6565 | 6C5F | 106B |
| 0000102460 | 0151 | 0000 | 0500 | 665F | 6572 | 4C65 | 0151 | 0000 |
| 0000102500 | 0C00 | 5F5F | 6D66 | 6C61 | 6F6C | 5F63 | 6B6C | 511A |
| 0000102520 | 0001 | 0000 | 5F07 | 665F | 7266 | 6565 | 512D | 0001 |
| 0000102540 | 0000 | 5F09 | 665F | 616D | 6C6C | 636F | 511A | 0001 |
| 0000102560 | 0000 | 5F0A | 665F | 7266 | 6565 | 6C5F | BE6B | 050C |
| 0000102600 | 0000 | 0700 | 5F5F | 6866 | 6165 | CA70 | 0151 | 0000 |
| 0000102620 | 0900 | 5F5F | 6E69 | 7469 | 6573 | FE67 | 0151 | 0000 |
| 0000102640 | 0900 | 5F5F | 696C | 6B6E | 6573 | 3467 | 0152 | 0000 |
| 0000102660 | 0B00 | 5F5F | 6573 | 7261 | 6863 | 6573 | 3F67 | 0153 |
| 0000102700 | 0000 | 0800 | 5F5F | 6E69 | 7363 | 6765 | 52B0 | 0001 |
| 0000102720 | 0000 | 5F09 | 675F | 6F72 | 7377 | 6765 | 5372 | 0001 |
| 0000102740 | 0000 | 5F0A | 665F | 6E69 | 6C64 | 7361 | CC74 | 050C |
| 0000102760 | 0000 | 0A00 | 5F5F | 6D61 | 6C62 | 736B | 7A69 | 5392 |
| 0000103000 | 0001 | 0000 | 5F08 | 6E5F | 7765 | 6573 | C467 | 0153 |
| 0000103020 | 0000 | 0700 | 735F | 7274 | 6163 | 0A74 | 0154 | 0000 |
| 0000103040 | 0700 | 735F | 7274 | 7063 | 4079 | 0154 | 0000 | 0700 |
| 0000103060 | 735F | 7274 | 6D63 | 6A70 | 0154 | 0000 | 0700 | 735F |
| 0000103100 | 7274 | 656C | 826E | 0154 | 0000 | 0800 | 735F | 7274 |
| 0000103120 | 636E | 706D | 54BE | 0001 | 0000 | 5F05 | 7469 | 616F |
| 0000103140 | 0CCE | 0005 | 0000 | 5F0D | 635F | 6C66 | 6374 | 7476 |
| 0000103160 | 745F | 6261 | 0CEA | 0005 | 0000 | 5F08 | 615F | 6973 |

THU MAR 14 17:27:10 1991 CRV_ONS.DLL PAGE 36, LINE 2066

| | | | | | | | | |
|---|---|---|---|---|---|---|---|---|
| 0000103200 | 657A | EB43 | 050C | 0000 | 0800 | 5F5F | 7361 | 7A69 |
| 0000103220 | 4465 | 0CE8 | 0005 | 0000 | 5F0B | 735F | 6769 | 6E69 |
| 0000103240 | 6F74 | 6666 | 0CE6 | 0005 | 0000 | 5F0B | 735F | 6769 |
| 0000103260 | 6E69 | 7374 | 6765 | 0CEC | 0005 | 0000 | 5F07 | 635F |
| 0000103300 | 7974 | 6570 | 0CEC | 0005 | 0000 | 5F08 | 635F | 7974 |
| 0000103320 | 6570 | DA5F | 0154 | 0000 | 0700 | 675F | 7465 | 6E65 |
| 0000103340 | D076 | 0155 | 0000 | 0600 | 5F5F | 6F6C | 6B63 | 561A |
| 0000103360 | 0001 | 0000 | 5F07 | 6C5F | 636F | 666B | 55A4 | 0001 |
| 0000103400 | 0000 | 5F0D | 755F | 6C6E | 636F | 5F6B | 6966 | 656C |
| 0000103420 | 5580 | 0001 | 0000 | 5F0D | 6C5F | 636F | 5F6B | 7473 |
| 0000103440 | 6572 | 6D61 | 55FA | 0001 | 0000 | 5F08 | 755F | 6C6E |
| 0000103460 | 636F | EE6B | 050D | 0000 | 0900 | 5F5F | 6F6C | 6B63 |
| 0000103500 | 6E63 | 2A74 | 0156 | 0000 | 0900 | 5F5F | 6E75 | 6F6C |
| 0000103520 | 6B63 | 8C66 | 0155 | 0000 | 0F00 | 5F5F | 6E75 | 6F6C |
| 0000103540 | 6B63 | 735F | 7274 | 6165 | B06D | 0155 | 0000 | 0A00 |
| 0000103560 | 5F5F | 6177 | 7469 | 6F6C | 6B63 | 5598 | 0001 | 0000 |
| 0000103600 | 5F0B | 6C5F | 636F | 5F6B | 6966 | 656C | 563A | 0001 |
| 0000103620 | 0000 | 5F0D | 625F | 6765 | 6E69 | 6874 | 6572 | 6461 |
| 0000103640 | 571B | 0001 | 0000 | 5F0B | 655F | 646E | 6874 | 6572 |
| 0000103660 | 6461 | 5748 | 0001 | 0000 | 5F0B | 675F | 7465 | 6974 |
| 0000103700 | 7464 | 6261 | 0DF0 | 0005 | 0000 | 5F0B | 745F | 6469 |
| 0000103720 | 6174 | 6D62 | 7861 | 57C2 | 0001 | 0000 | 5F07 | 7373 |
| 0000103740 | 6163 | 666E | 5845 | 0001 | 0000 | 5F0D | 665F | 6572 |
| 0000103760 | 6C61 | 6F6C | 5F63 | 6B6C | 581E | 0001 | 0000 | 5F0A |
| 0000104000 | 665F | 6572 | 6C61 | 6F6C | CC63 | 0158 | 0000 | 0800 |
| 0000104020 | 725F | 6165 | 6C6C | 636F | 58D1 | 0001 | 0000 | 5F0B |
| 0000104040 | 6572 | 6C61 | 6F6C | 5F63 | 6B6C | 58D6 | 0001 | 0000 |
| 0000104060 | 5F08 | 725F | 7365 | 7A69 | 9E65 | 0159 | 0000 | 0700 |
| 0000104100 | 635F | 6C61 | 6F6C | CC63 | 0159 | 0000 | 0900 | 5F5F |
| 0000104120 | 6966 | 646E | 6573 | F267 | 0159 | 0000 | 0800 | 735F |
| 0000104140 | 7274 | 6369 | 706D | 59F2 | 0001 | 0000 | 5F08 | 7473 |
| 0000104160 | 6372 | 706D | 3869 | 015A | 0000 | 0700 | 6D5F | 6D65 |
| 0000104200 | 7063 | 9679 | 015A | 0000 | 0700 | 6D5F | 6D65 | 6573 |
| 0000104220 | EB74 | 015A | 0000 | 0700 | 5F5F | 7863 | 6F74 | DE61 |
| 0000104240 | 015A | 0000 | 0A00 | 5F5F | 6C63 | 6F74 | 7361 | 6275 |
| 0000104260 | 5B42 | 0001 | 0000 | 5F07 | 6572 | 6F6D | 6576 | 5B42 |
| 0000104300 | 0001 | 0000 | 5F07 | 6E75 | 696C | 6B6E | 5B60 | 0001 |
| 0000104320 | 0000 | 5F0A | 615F | 4646 | 6C61 | 756D | 606C | 015B |
| 0000104340 | 0000 | 0B00 | 5F5F | 4661 | 6146 | 6C75 | 756D | 826C |
| 0000104360 | 015B | 0000 | 0A00 | 5F5F | 4661 | 6146 | 736C | 6C68 |
| 0000104400 | 5BA2 | 0001 | 0000 | 5F08 | 615F | 6C46 | 756D | A26C |
| 0000104420 | 015B | 0000 | 0900 | 5F5F | 4661 | 6C75 | 756D | D46C |
| 0000104440 | 015B | 0000 | 0800 | 5F5F | 4661 | 736C | 6C68 | 0101 |
| 0000104460 | 8000 | 0101 | 8000 | 0101 | 8000 | 0101 | 8000 | 0101 |
| * | | | | | | | | |
| 0000106460 | 8000 | 0101 | 8000 | 0101 | 8000 | 0101 | 8000 | 0501 |
| 0000106500 | 7800 | 8320 | 0085 | 0101 | 8000 | 0101 | 8000 | 0101 |
| 0000106520 | 8000 | 0101 | 8000 | 0101 | 8000 | 0101 | 8000 | 0101 |
| * | | | | | | | | |
| 0000113100 | 8000 | 0101 | 8000 | 0101 | 8000 | 0101 | 8000 | 1601 |
| 0000113120 | 7900 | 0230 | 4883 | 8305 | 0549 | 0A82 | 7528 | 746E |
| 0000113140 | 6761 | 6567 | 2964 | 0169 | 0007 | 837F | 0085 | 0483 |
| 0000113160 | 0103 | 001A | 827F | 650A | 6576 | 746E | 745F | 7079 |
| 0000113200 | 0065 | 0982 | 7665 | 6E65 | 5F74 | 7562 | 0266 | 1601 |
| 0000113220 | 7900 | 0210 | 4B83 | 8305 | 054C | 0A82 | 7528 | 746E |
| 0000113240 | 6761 | 6567 | 2964 | 0169 | 0007 | 837F | 0084 | 8483 |
| 0000113260 | 0100 | 0019 | 827F | 650A | 6576 | 746E | 745F | 7079 |
| 0000113300 | 0065 | 0882 | 656B | 5F79 | 6F63 | 6564 | 0101 | 0016 |
| 0000113320 | 1079 | 8302 | 054E | 4F83 | 8205 | 280A | 6E75 | 6174 |

THU MAR 14 17:27:10 1991 CRV_ONS.DLL PAGE 37, LINE 2125

```
0000113340  6767  6465  6929  0701  7F00  8483  8300  0084
0000113360  1D01  7F00  0A82  7665  6E65  5F74  7974  6570
0000113400  8200  730C  6977  6374  5F68  7473  7461  0165
0000113420  1601  7900  0420  5183  8305  0552  0A82  7528
0000113440  746E  6761  6567  2964  0169  000D  837F  0084
0000113460  8483  8300  0080  8083  0100  0025  827F  650A
0000113500  6576  746E  745F  7079  0065  0C82  7773  7469
0000113520  6863  735F  6174  6574  8201  7801  8202  7901
0000113540  0103  0016  3079  8304  0554  5583  8205  280A
0000113560  6E75  6174  6767  6465  6929  0D01  7F00  8483
0000113600  8300  0084  8183  8300  0081  2101  7F00  0A82
0000113620  7665  6E65  5F74  7974  6570  8200  7008  6572
0000113640  7373  7275  0165  0182  0278  0182  0479  1601
0000113660  7900  0210  5783  8305  0558  0A82  7528  746E
0000113700  6761  6567  2964  0169  0007  837F  0084  8483
0000113720  0100  001D  827F  650A  6576  746E  745F  7079
0000113740  0065  0C82  6974  696D  676E  735F  6F68  7472
0000113760  0101  0016  3079  8304  055A  5B83  8205  280A
0000114000  6E75  6174  6767  6465  6929  0D01  7F00  8483
0000114020  8300  0084  8183  8300  0081  2C01  7F00  0A82
0000114040  7665  6E65  5F74  7974  6570  8200  6405  6D75
0000114060  796D  8201  6B08  7965  615F  7474  0272  0882
0000114100  7566  636E  6B5F  7965  0104  0016  1079  8302
0000114120  055D  5E83  8205  280A  6E75  6174  6767  6465
0000114140  6929  0701  7F00  8483  8300  0084  1601  7F00
0000114160  0A82  7665  6E65  5F74  7974  6570  8200  7005
0000114200  7261  6D61  0101  0016  3079  8309  0560  6183
0000114220  8205  280A  6E75  6174  6767  6465  6929  1C01
0000114240  7F00  4783  8305  054A  4D83  8305  0550  5383
0000114260  8305  0556  5983  8305  0082  5C83  0105  0085
0000114300  827F  630A  706F  5F79  7665  6E65  0074  0982
0000114320  656B  5F79  7665  6E65  0074  0B82  6C63  6369
0000114340  5F6B  7665  6E65  0074  0A82  6F6D  6576  655F
0000114360  6576  746E  8200  740C  6261  656C  5F74  7665
0000114400  6E65  0074  1282  6873  726F  5F74  6974  696D
0000114420  676E  655F  6576  746E  8200  660A  6E75  5F63
0000114440  7665  6E65  0074  0C82  6974  696D  676E  655F
0000114460  6576  746E  8200  630D  6D6F  616D  646E  655F
0000114500  6576  746E  0100  0001  0180  0007  737A  5F83
0000114520  8205  0100  000A  8075  8183  6400  8300  0201
0000114540  0101  8000  0101  8000  0101  8000  0101  8000
*
0000115000  0101  8000  0101  8000  0101  8000  0701  7800
0000115020  0085  8301  0080  0101  8000  0101  8000  0101
0000115040  8000  0101  8000  0101  8000  0101  8000  0101
*
0000116260  8000  0101  8000  1301  7900  0230  D683  8302
0000116300  02D7  0782  4D5F  5855  4553  694D  0701  7F00
0000116320  8583  8300  00C0  0F01  7F00  0482  657A  6F72
0000116340  8200  6804  6573  026D  0101  8000  1901  7900
0000116360  1085  0203  DB83  8302  02DC  0B82  4D5F  5855
0000116400  4553  4C4D  5349  6954  0701  7800  0085  8303
0000116420  02D5  0701  7F00  8583  8300  02DA  0F01  7F00
0000116440  0482  6D63  7378  8200  6104  786D  0273  0101
0000116460  8000  0101  8000  0101  8000  0101  8000  0101
*
0000116700  8000  0101  8000  0101  8000  0501  7800  8320
0000116720  0085  0101  8000  0101  8000  0101  8000  0101
0000116740  8000  0101  8000  0101  8000  0101  8000  0101
```

THU MAR 14 17:27:10 1991 CRV_DNS.DLL PAGE 38, LINE 2184

```
*
0000122100  8000  1201  7900  0560  A283  8304  04A3  0682
0000122120  695F  626F  6675  0169  0010  837F  00C0  8183
0000122140  8300  00C0  8083  8300  0080  2701  7F00  0482
0000122160  705F  7274  8200  5F04  6E63  0474  0582  625F
0000122200  7361  0665  0582  665F  616C  0A67  0582  665F
0000122220  6C69  0B65  0101  8000  0701  7A00  8373  04A1
0000122240  0082  0101  8000  0101  8000  0101  8000  0101
0000122260  8000  0101  8000  0101  8000  0101  8000  0101
*
0000122560  8000  0101  8000  0101  8000  1601  7900  0220
0000122600  DD83  8304  04DE  0A82  7528  746E  6761  6567
0000122620  2964  0169  0007  837F  0081  8183  0100  0009
0000122640  827F  7801  8200  7901  0102  0016  4079  8302
0000122660  04E0  E183  8204  280A  6E75  6174  6767  6465
0000122700  6929  0701  7F00  DC83  8304  04DC  0D01  7F00
0000122720  0382  696D  006E  0382  616D  0478  0101  8000
0000122740  1601  7900  0220  E483  8304  04E5  0A82  7528
0000122760  746E  6761  6567  2964  0169  0007  837F  0085
0000123000  8583  0100  0012  827F  7705  6469  6874  8200
0000123020  6806  6965  6867  0274  0101  8000  1601  7900
0000123040  0240  E883  8304  04E9  0A82  7528  746E  6761
0000123060  6567  2964  0169  0007  837F  04DC  E383  0104
0000123100  0011  827F  6F06  6972  6967  006E  0482  7261
0000123120  6165  0104  0001  0180  0001  0180  0001  0180
0000123140  0001  0180  0001  0180  0001  0180  0001  0180
*
0000123400  0001  0180  0001  0180  0016  3079  8303  0518
0000123420  1983  8205  280A  6E75  6174  6767  6465  6929
0000123440  0A01  7F00  8583  8300  0085  8583  0100  001A
0000123460  827F  7705  6469  6874  8200  6806  6965  6867
0000123500  0274  0582  6564  7470  0468  1801  7900  4085
0000123520  0801  1C83  8305  051D  0A82  7528  746E  6761
0000123540  6567  2964  0169  0007  8578  0080  8483  0100
0000123560  0019  837F  0081  1783  8305  0085  8583  8300
0000123600  00C4  8283  8300  00E4  1B83  0105  005A  827F
0000123620  7206  7065  6572  0073  0682  6964  656D  736E
0000123640  8202  6410  7461  5F61  616C  6579  5F72  6564
0000123660  7470  0868  0882  6973  5F67  6973  657A  820A
0000123700  7307  6769  705F  7274  820C  6209  6D74  5F70
0000123720  6973  657A  8210  6208  6D74  5F70  7470  1472
0000123740  0582  7073  7261  1865  0101  8000  1801  7900
0000123760  A085  0C05  2183  8305  0522  0A82  7528  746E
0000124000  6761  6567  2964  0169  0007  8578  0180  8483
0000124020  0100  0025  837F  0086  2C83  8302  022C  8683
0000124040  8300  0081  8583  8300  0086  8283  8300  0086
0000124060  DC83  8304  051A  2083  0105  007E  827F  6902
0000124100  0064  0482  616E  656D  8204  6609  6C69  5F65
0000124120  616E  656D  8224  6509  7078  745F  5F63  6469
0000124140  8244  7404  7079  4865  0C82  6572  5F66  696C
0000124160  656E  6E5F  6D75  824A  7209  6665  745F  5F63
0000124200  6469  824C  740A  6D69  5F65  7473  6D61  5070
0000124220  0682  6F61  5F69  6469  8254  6C08  636F  7461
0000124240  6F69  586E  0982  7462  706D  695F  666E  5C6F
0000124260  0582  7073  7261  8565  0084  0101  8000  0101
0000124300  8000  0101  8000  0101  8000  0101  8000  0101
*
0000124340  8000  0701  7A00  8373  051F  0082  0101  8000
0000124360  0101  8000  0101  8000  0101  8000  0101  8000
```

```
THU MAR 14 17:27:10 1991  CRV_ONS.DLL  PAGE 39, LINE 2243

*
0000125000  0101  8000  1801  7900  C085  0702  7683  8305
0000125020  0577  0A82  7528  746E  6761  6567  2964  0169
0000125040  0007  8578  0120  8483  0100  0016  837F  0086
0000125060  2C83  8302  04DF  8183  8300  0081  8283  8300
0000125100  0575  3801  7F00  0282  6469  8200  6E04  6D61
0000125120  0465  0482  6572  7463  8224  6104  7474  2C72
0000125140  0582  7564  6D6D  2E79  0A82  6974  656D  735F
0000125160  6174  706D  8230  7305  6170  6572  0134  0001
0000125200  0180  0001  0180  0001  0180  0001  0180  0001
*
0000125600  0180  0018  8579  0110  8311  05BA  BB83  8205
0000125620  280A  6E75  6174  6767  6465  6929  3401  7F00
0000125640  8583  8300  0085  8583  8300  0085  8583  8300
0000125660  0085  8183  8300  0085  8583  8300  0085  8483
0000125700  8300  0085  8583  8300  0085  8583  8300  0085
0000125720  8583  0100  0106  827F  7409  6D69  5F65  6E75
0000125740  7469  8200  6D0F  6E69  725F  6365  726F  5F64
0000125760  6974  656D  8202  7309  6174  6962  696C  7974
0000126000  8204  630F  7061  7574  6572  745F  6D69  6F65
0000126020  7475  8206  6B0A  7965  665F  726F  616D  0874
0000126040  1382  6F63  746E  6E69  6F75  7375  745F  6172
0000126060  6B63  6E69  0A67  0E82  6F6D  7375  5F65  7274
0000126100  6361  696B  676E  820C  6311  7061  7574  6572
0000126120  735F  6769  616E  7574  6572  820E  680B  746F
0000126140  656B  5F79  7973  636E  8210  640C  6665  7561
0000126160  746C  745F  6D69  1265  0982  616D  5F78  6564
0000126200  616C  1479  0B82  6166  7473  725F  7065  616C
0000126220  1679  0E82  6576  6972  7966  745F  6D69  6F65
0000126240  7475  8218  770C  6961  5F74  69~4  656D  756F
0000126260  1A74  0C82  7973  636E  745F  6D69  6F65  7475
0000126300  821C  7409  7268  7365  6F68  646C  821E  630C
0000126320  6568  6B63  6C5F  6F6F  756B  2070  0101  8000
0000126340  0701  7800  0085  8308  0080  0101  8000  0101
0000126360  8000  0101  8000  0101  8000  0101  8000  0101
*
0000126540  8000  0101  8000  0101  8000  0101  8000  1601
0000126560  7900  0240  E083  8305  05E1  0A82  7528  746E
0000126600  6761  6567  2964  0169  0007  837F  0082  8283
0000126620  0100  0017  827F  6408  6665  745F  6D69  0065
0000126640  0882  696D  5F6E  6974  656D  0104  0001  0180
0000126660  0001  0180  0001  0180  0001  0180  0001  0180
0000126700  0001  0180  0016  4079  8304  05E9  EA83  8205
0000126720  280A  6E75  6174  6767  6465  6929  0D01  7F00
0000126740  8483  8300  0084  8483  8300  04DC  2901  7F00
0000126760  0782  6261  5F73  6572  006C  0582  6E75  7469
0000127000  0173  0C82  7073  6365  6169  5F6C  7566  636E
0000127020  8202  6404  7369  0470  0101  8000  0101  8000
0000127040  0101  8000  1601  7900  0220  EF83  8305  05F0
0000127060  0A82  7528  746E  6761  6567  2964  0169  0007
0000127100  837F  0081  8183  0100  001E  827F  7309  6E79
0000127120  5F63  6F6D  6564  8200  730E  6E79  5F63  7865
0000127140  6365  6D5F  646F  0265  1601  7900  0230  F283
0000127160  8305  05F3  0A82  7528  746E  6761  6567  2964
0000127200  0169  0007  837F  0082  8183  0100  0019  827F
0000127220  7407  6365  5F68  6469  8200  740B  6365  5F68
0000127240  6572  7361  6E6F  0104  0001  0180  0001  0180
0000127260  0001  0180  0018  8579  0220  8303  05F8  F983
0000127300  8205  280A  6E75  6174  6767  6465  6929  0A01
```

THU MAR 14 17:27:10 1991 CRV_ONS.DLL PAGE 40, LINE 2302

| | | | | | | | | |
|---|---|---|---|---|---|---|---|---|
| 0000127320 | 7F00 | 2C83 | 8302 | 022C | 8683 | 0100 | 001A | 827F |
| 0000127340 | 6905 | 616D | 6567 | 8200 | 6404 | 6669 | 2066 | 0782 |
| 0000127360 | 6964 | 6666 | 695F | 4064 | 1801 | 7900 | 1085 | 0203 |
| 0000127400 | FC83 | 8305 | 05FD | 0A82 | 7528 | 746E | 6761 | 6567 |
| 0000127420 | 2964 | 0169 | 0007 | 8578 | 0300 | 2C83 | 0102 | 0007 |
| 0000127440 | 837F | 0085 | FB83 | 0105 | 0024 | 827F | 6E0E | 6D75 |
| 0000127460 | 6F5F | 5F66 | 6373 | 6572 | 6E65 | 0073 | 0F82 | 6D69 |
| 0000127500 | 6761 | 5F65 | 616E | 656D | 6C5F | 7369 | 0274 | 1601 |
| 0000127520 | 7900 | 0120 | FF83 | 8305 | 0600 | 0A82 | 7528 | 746E |
| 0000127540 | 6761 | 6567 | 2964 | 0169 | 0004 | 837F | 00C0 | 0A01 |
| 0000127560 | 7F00 | 0682 | 7473 | 6972 | 676E | 0100 | 0001 | 0180 |
| 0000127600 | 0001 | 0180 | 0001 | 0180 | 0016 | 3079 | 8302 | 0605 |
| 0000127620 | 0683 | 8206 | 280A | 6E75 | 6174 | 6767 | 6465 | 6929 |
| 0000127640 | 0701 | 7F00 | 5283 | 8300 | 0081 | 1E01 | 7F00 | 0C82 |
| 0000127660 | 7865 | 6563 | 7470 | 6F69 | 5F6E | 6469 | 8200 | 650B |
| 0000127700 | 6378 | 5F70 | 7473 | 7461 | 7375 | 0104 | 0016 | 2079 |
| 0000127720 | 8302 | 060B | 0C83 | 8206 | 280A | 6E75 | 6174 | 6767 |
| 0000127740 | 6465 | 6929 | 1601 | 7900 | 0208 | 0983 | 8306 | 060A |
| 0000127760 | 0A82 | 7528 | 746E | 6761 | 6567 | 2964 | 0169 | 0007 |
| 0000130000 | 837F | 0084 | 8483 | 0100 | 001B | 827F | 6B08 | 7965 |
| 0000130020 | 635F | 646F | 0065 | 0C82 | 7773 | 7469 | 6863 | 735F |
| 0000130040 | 6174 | 6574 | 0100 | 0007 | 837F | 0081 | 0883 | 0106 |
| 0000130060 | 0018 | 827F | 6B08 | 7965 | 745F | 7079 | 0065 | 0982 |
| 0000130100 | 656B | 5F79 | 6176 | 756C | 0265 | 1801 | 7900 | 3085 |
| 0000130120 | 0402 | 0F83 | 8306 | 0610 | 0A82 | 7528 | 746E | 6761 |
| 0000130140 | 6567 | 2964 | 0169 | 0007 | 8578 | 0200 | 0783 | 0106 |
| 0000130160 | 000D | 837F | 0085 | 0E83 | 8306 | 0081 | 8183 | 0100 |
| 0000130200 | 002E | 827F | 7308 | 7165 | 735F | 7A69 | 0065 | 0382 |
| 0000130220 | 6573 | 0271 | 0882 | 656B | 5F79 | 7461 | 7274 | 8242 |
| 0000130240 | 610E | 7463 | 7669 | 7461 | 6465 | 665F | 6E75 | 4463 |
| 0000130260 | 0101 | 8000 | 0101 | 8000 | 0101 | 8000 | 0101 | 8000 |
| * | | | | | | | | |
| 0000130320 | 1601 | 7900 | 0220 | 1A83 | 8306 | 061B | 0A82 | 7528 |
| 0000130340 | 746E | 6761 | 6567 | 2964 | 0169 | 0007 | 837F | 0081 |
| 0000130360 | 8183 | 0100 | 0017 | 827F | 6B08 | 7965 | 615F | 7474 |
| 0000130400 | 0072 | 0882 | 7566 | 636E | 6B5F | 7965 | 0102 | 0018 |
| 0000130420 | 8579 | 0210 | 8302 | 061D | 1E83 | 8206 | 280A | 6E75 |
| 0000130440 | 6174 | 6767 | 6465 | 6929 | 0701 | 7F00 | 8583 | 8300 |
| 0000130460 | 060E | 1201 | 7F00 | 0882 | 6573 | 5F71 | 6973 | 657A |
| 0000130500 | 8200 | 7303 | 7165 | 0102 | 0001 | 0180 | 0001 | 0180 |
| 0000130520 | 0001 | 0180 | 0001 | 0180 | 0001 | 0180 | 0018 | 8579 |
| 0000130540 | 02D0 | 8302 | 0625 | 2683 | 8206 | 280A | 6E75 | 6174 |
| 0000130560 | 6767 | 6465 | 6929 | 0701 | 7F00 | 7483 | 8305 | 0081 |
| 0000130600 | 1101 | 7F00 | 0682 | 6966 | 746C | 7265 | 8200 | 6D04 |
| 0000130620 | 646F | 5865 | 1801 | 7900 | 5085 | 0501 | 2883 | 8306 |
| 0000130640 | 0629 | 0A82 | 7528 | 746E | 6761 | 6567 | 2964 | 0169 |
| 0000130660 | 0010 | 837F | 022C | 8683 | 8300 | 0081 | 8183 | 8300 |
| 0000130700 | 0081 | 2B01 | 7F00 | 0482 | 616E | 656D | 8200 | 6C06 |
| 0000130720 | 6269 | 695F | 2064 | 0582 | 6C63 | 7361 | 2473 | 0582 |
| 0000130740 | 7473 | 6C79 | 2665 | 0782 | 706F | 635F | 646F | 2865 |
| 0000130760 | 0101 | 8000 | 0101 | 8000 | 0101 | 8000 | 1B01 | 7900 |
| 0000131000 | 0920 | 2E83 | 8306 | 062F | 0F82 | 5F69 | 5F75 | 736D |
| 0000131020 | 5F67 | 6170 | 6172 | 5F6D | 6974 | 1C01 | 7F00 | 8183 |
| 0000131040 | 8300 | 0085 | 8283 | 8300 | 0086 | 8883 | 8300 | 0080 |
| 0000131060 | 8483 | 8300 | 00C0 | C083 | 0100 | 006A | 827F | 6909 |
| 0000131100 | 755F | 735F | 6F68 | 7472 | 8200 | 690A | 755F | 755F |
| 0000131120 | 6873 | 726F | 0074 | 0882 | 5F69 | 5F75 | 6F6C | 676E |
| 0000131140 | 8200 | 6909 | 755F | 755F | 6F6C | 676E | 8200 | 6909 |
| 0000131160 | 755F | 665F | 6F6C | 7461 | 8200 | 6908 | 755F | 635F |

THU MAR 14 17:27:10 1991 CRV_ONS.DLL PAGE 41, LINE 2361

| | | | | | | | | |
|---|---|---|---|---|---|---|---|---|
| 0000131200 | 6168 | 0072 | 0982 | 5F69 | 5F75 | 6375 | 6168 | 0072 |
| 0000131220 | 0782 | 5F69 | 5F75 | 7473 | 0072 | 0982 | 5F69 | 5F75 |
| 0000131240 | 6C62 | 636F | 006B | 1901 | 7900 | 0230 | 3183 | 8306 |
| 0000131260 | 0632 | 0D82 | 5F69 | 736D | 5F67 | 6170 | 6172 | 5F6D |
| 0000131300 | 6974 | 0701 | 7F00 | 8583 | 8300 | 062D | 1001 | 7F00 |
| 0000131320 | 0482 | 7974 | 6570 | 8200 | 7605 | 6C61 | 6575 | 0102 |
| 0000131340 | 0001 | 0180 | 001C | 8579 | 0090 | 8309 | 0635 | 3683 |
| 0000131360 | 8206 | 690E | 6D5F | 6773 | 685F | 6165 | 6564 | 5F72 |
| 0000131400 | 6974 | 1C01 | 7F00 | 8183 | 8300 | 0081 | 8583 | 8300 |
| 0000131420 | 0085 | 8483 | 8300 | 0085 | 8583 | 8300 | 0081 | 8583 |
| 0000131440 | 0100 | 0047 | 827F | 7104 | 695F | 0064 | 0682 | 6F73 |
| 0000131460 | 7275 | 6563 | 8202 | 7003 | 6469 | 8204 | 7403 | 6469 |
| 0000131500 | 8206 | 7204 | 7365 | 0870 | 0882 | 6572 | 7073 | 745F |
| 0000131520 | 6469 | 820A | 6F07 | 5F70 | 6F63 | 6564 | 820C | 7404 |
| 0000131540 | 7079 | 0E65 | 0482 | 6973 | 657A | 0110 | 0015 | 8579 |
| 0000131560 | 00C0 | 8302 | 0639 | 3A83 | 8206 | 6907 | 6D5F | 6773 |
| 0000131600 | 745F | 0169 | 0005 | 3078 | 3083 | 0106 | 0007 | 837F |
| 0000131620 | 0634 | 3883 | 0106 | 0017 | 827F | 6806 | 6165 | 6564 |
| 0000131640 | 0072 | 0A82 | 6170 | 6172 | 5F6D | 696C | 7473 | 0112 |
| 0000131660 | 0001 | 0180 | 0001 | 0180 | 0001 | 0180 | 0001 | 0180 |
| * | | | | | | | | |
| 0000132140 | 0016 | 4079 | 8303 | 0669 | 6A83 | 8206 | 280A | 6E75 |
| 0000132160 | 6174 | 6767 | 6465 | 6929 | 0701 | 7A00 | 8373 | 060D |
| 0000132200 | 0082 | 0A01 | 7F00 | 8183 | 8300 | 0081 | 6883 | 0106 |
| 0000132220 | 002B | 827F | 6106 | 7463 | 6F69 | 006E | 0F82 | 756E |
| 0000132240 | 5F6D | 666F | 735F | 666F | 6B74 | 7965 | 0273 | 0C82 |
| 0000132260 | 6F73 | 7466 | 656B | 7379 | 705F | 7274 | 0104 | 0016 |
| 0000132300 | 4079 | 8303 | 066D | 6E83 | 8206 | 280A | 6E75 | 6174 |
| 0000132320 | 6767 | 6465 | 6929 | 0701 | 7A00 | 8373 | 061C | 0082 |
| 0000132340 | 0A01 | 7F00 | 8183 | 8300 | 0081 | 6C83 | 0106 | 0029 |
| 0000132360 | 827F | 6106 | 7463 | 6F69 | 006E | 0E82 | 756E | 5F6D |
| 0000132400 | 666F | 685F | 746F | 656B | 7379 | 8202 | 680B | 746F |
| 0000132420 | 656B | 7379 | 705F | 7274 | 0104 | 0018 | 8579 | 0170 |
| 0000132440 | 8305 | 0670 | 7183 | 8206 | 280A | 6E75 | 6174 | 6767 |
| 0000132460 | 6465 | 6929 | 1001 | 7F00 | 2C83 | 8302 | 0086 | 2D83 |
| 0000132500 | 8305 | 00E4 | 8583 | 0100 | 003D | 827F | 690A | 616D |
| 0000132520 | 6567 | 6E5F | 6D61 | 0065 | 0882 | 6D69 | 6761 | 5F65 |
| 0000132540 | 6469 | 8220 | 6909 | 616D | 6567 | 705F | 7274 | 8224 |
| 0000132560 | 6C09 | 7961 | 7265 | 705F | 7274 | 8228 | 6909 | 616D |
| 0000132600 | 6567 | 685F | 6C64 | 012C | 0001 | 0180 | 0001 | 0180 |
| 0000132620 | 0001 | 0180 | 0001 | 0180 | 0018 | 8579 | 0190 | 8302 |
| 0000132640 | 0677 | 7883 | 8206 | 280A | 6E75 | 6174 | 6767 | 6465 |
| 0000132660 | 6929 | 0701 | 7F00 | 8283 | 8300 | 066F | 1801 | 7F00 |
| 0000132700 | 0C82 | 7865 | 6563 | 7470 | 6F69 | 5F6E | 6469 | 8200 |
| 0000132720 | 6905 | 616D | 6567 | 0104 | 0001 | 0180 | 0016 | 4079 |
| 0000132740 | 8303 | 067C | 7D83 | 8206 | 280A | 6E75 | 6174 | 6767 |
| 0000132760 | 6465 | 6929 | 0701 | 7A00 | 8373 | 0676 | 0082 | 0A01 |
| 0000133000 | 7F00 | 8183 | 8300 | 0081 | 7B83 | 0106 | 002F | 827F |
| 0000133020 | 6106 | 7463 | 6F69 | 006E | 1182 | 756E | 5F6D | 666F |
| 0000133040 | 655F | 6378 | 7065 | 6974 | 6E6F | 0273 | 0E82 | 7865 |
| 0000133060 | 6563 | 7470 | 6F69 | 5F6E | 696C | 7473 | 0104 | 0018 |
| 0000133100 | 8579 | 0450 | 8303 | 067F | 8083 | 8206 | 280A | 6E75 |
| 0000133120 | 6174 | 6767 | 6465 | 6929 | 0A01 | 7F00 | 6F83 | 8306 |
| 0000133140 | 066F | 6F83 | 0106 | 001A | 827F | 6906 | 616D | 6567 |
| 0000133160 | 0031 | 0682 | 6D69 | 6761 | 3265 | 822E | 6404 | 6669 |
| 0000133200 | 5C66 | 1801 | 7900 | A085 | 0301 | 8383 | 8306 | 0684 |
| 0000133220 | 0A82 | 7528 | 746E | 6761 | 6567 | 2964 | 0169 | 0007 |
| 0000133240 | 737A | 6F83 | 8206 | 0100 | 000A | 837F | 0081 | 8283 |
| 0000133260 | 8306 | 066F | 2601 | 7F00 | 0E82 | 756E | 5F6D | 666F |

THU MAR 14 17:27:10 1991 CRV_DNS.DLL PAGE 42, LINE 2420

```
0000133300  735F  7263  6565  736E  8200  690A  616D  6567
0000133320  6C5F  7369  0274  0482  6964  6666  0106  0018
0000133340  8579  0210  8303  0686  8783  8206  280A  6E75
0000133360  6174  6767  6465  6929  0A01  7F00  2C83  8302
0000133400  022C  8183  0100  0019  827F  6906  616D  6567
0000133420  0031  0682  6D69  6761  3265  8220  6303  7475
0000133440  0140  0018  8579  0940  8307  068C  8D83  8206
0000133460  280A  6E75  6174  6767  6465  6929  1801  7900
0000133500  0085  1D08  8A83  8306  068B  0A82  7528  746E
0000133520  6761  6567  2964  0169  0058  837F  0084  BD83
0000133540  8305  0084  8483  8300  05E8  8183  8300  04E7
0000133560  EE83  8305  0624  7483  8305  0081  6B83  8306
0000133600  05F1  7A83  8306  0604  8183  8300  0667  6F83
0000133620  8306  067E  8183  8306  05FA  8583  8300  05F7
0000133640  8583  8306  05FE  B983  8305  0619  2783  8306
0000133660  0084  6F01  7F01  0A82  626B  5F64  7473  7461
0000133700  7375  8200  7409  7365  5F74  616E  656D  8200
0000133720  6B08  7965  635F  646F  0065  0C82  7773  7469
0000133740  6863  735F  6174  6574  8200  6C0C  636F  7461
0000133760  726F  645F  7369  0070  0E82  7274  6361  696B
0000134000  676E  6C5F  7665  6C65  8200  730C  6163  656C
0000134020  775F  6E69  6F64  0077  0982  7973  636E  6D5F
0000134040  646F  0065  0A82  6966  746C  7265  6D5F  6773
0000134060  8200  6606  6C69  6574  0072  0B82  7563  7272
0000134100  6E65  5F74  6F61  0069  0C82  6F68  6B74  7965
0000134120  5F73  696C  7473  8200  730A  6E79  5F63  7665
0000134140  6E65  0074  0E82  7865  6563  7470  6F69  5F6F
0000134160  696C  7473  8200  6510  6378  5F70  7473  7461
0000134200  7375  6C5F  7369  0074  0482  6F6D  6564  8200
0000134220  730D  666F  6B74  7965  5F73  696C  7473  8200
0000134240  6905  616D  6567  8200  6307  6D6F  6170  6572
0000134260  8200  770B  6961  5F74  6373  6572  6E65  8200
0000134300  690A  616D  6567  6C5F  7369  0074  0982  6D69
0000134320  6761  5F65  756E  006D  0A82  6D69  6761  5F65
0000134340  6964  6666  8200  680B  6C61  5F66  6D69  6761
0000134360  7365  8200  6D07  7361  6173  6567  8200  7006
0000134400  7261  6D61  0073  0882  7566  636E  6B5F  7965
0000134420  8200  6908  6F63  5F6E  736D  0067  0582  7564
0000134440  6D6D  0079  1601  7F00  8183  8300  0637  8183
0000134460  8300  05DF  8983  8306  0081  8583  0100  005A
0000134500  827F  7306  ,36F  6372  0065  0A82  736D  5F67
0000134520  6568  6461  7265  8202  650A  6576  746E  745F
0000134540  7079  1A65  0682  6974  696D  676E  821C  650B
0000134560  6576  746E  765F  6C61  6575  8224  720C  7465
0000134600  7275  5F6E  6176  756C  8565  0124  0982  6572
0000134620  7073  665F  616C  8567  0126  0101  8000  0101
0000134640  8000  0101  8000  0101  8000  1801  7900  0885
0000134660  0201  9383  8306  0694  0A82  7528  746E  6761
0000134700  6567  2964  0169  0007  837F  022C  8483  0100
0000134720  0011  827F  6E04  6D61  0065  0682  6F66  6D72
0000134740  7461  0120  000A  8075  8183  6400  8301  0696
0000134760  0401  7F00  8583  0100  0007  737A  8883  8206
0000135000  0100  0001  0180  0001  0180  0001  0180  0001
0000135020  0180  0001  0180  0001  0180  0001  0180  0001
*
0000135220  0180  0001  0180  0001  0180  0001  0180  0016
0000135240  3079  8302  06C0  C183  8206  280A  6E75  6174
0000135260  6767  6465  6929  0701  7F00  8583  8300  0304
0000135300  1A01  7F00  0A82  7665  6E65  5F74  7974  6570
```

THU MAR 14 17:27:10 1991 CRV_ONS.DLL PAGE 43, LINE 2479

| | | | | | | | | |
|---|---|---|---|---|---|---|---|---|
| 0000135320 | 8200 | 6509 | 6576 | 746E | 625F | 6675 | 0102 | 0016 |
| 0000135340 | 1079 | 8302 | 06C3 | C483 | 8206 | 280A | 6E75 | 6174 |
| 0000135360 | 6767 | 6465 | 6929 | 0701 | 7F00 | 8483 | 8300 | 0084 |
| 0000135400 | 1901 | 7F00 | 0A82 | 7665 | 6E65 | 5F74 | 7974 | 6570 |
| 0000135420 | 8200 | 6B08 | 7965 | 635F | 646F | 0165 | 1601 | 7900 |
| 0000135440 | 0210 | C683 | 8306 | 06C7 | 0A82 | 7528 | 746E | 6761 |
| 0000135460 | 6567 | 2964 | 0169 | 0007 | 837F | 0084 | 8483 | 0100 |
| 0000135500 | 001D | 827F | 650A | 6576 | 746E | 745F | 7079 | 0065 |
| 0000135520 | 0C82 | 7773 | 7469 | 6863 | 735F | 6174 | 6574 | 0101 |
| 0000135540 | 0016 | 2079 | 8304 | 06C9 | CA83 | 8206 | 280A | 6E75 |
| 0000135560 | 6174 | 6767 | 6465 | 6929 | 0D01 | 7F00 | 8483 | 8300 |
| 0000135600 | 0084 | 8083 | 8300 | 0080 | 2501 | 7F00 | 0A82 | 7665 |
| 0000135620 | 6E65 | 5F74 | 7974 | 6570 | 8200 | 730C | 6977 | 6374 |
| 0000135640 | 5F68 | 7473 | 7461 | 0165 | 0182 | 0278 | 0182 | 0379 |
| 0000135660 | 1601 | 7900 | 0430 | CC83 | 8306 | 06CD | 0A82 | 7528 |
| 0000135700 | 746E | 6761 | 6567 | 2964 | 0169 | 000D | 837F | 0084 |
| 0000135720 | 8483 | 8300 | 0081 | 8183 | 0100 | 0021 | 827F | 650A |
| 0000135740 | 6576 | 746E | 745F | 7079 | 0065 | 0882 | 7270 | 7365 |
| 0000135760 | 7573 | 6572 | 8201 | 7801 | 8202 | 7901 | 0104 | 0016 |
| 0000136000 | 1079 | 8302 | 06CF | D083 | 8206 | 280A | 6E75 | 6174 |
| 0000136020 | 6767 | 6465 | 6929 | 0701 | 7F00 | 8483 | 8300 | 0084 |
| 0000136040 | 1D01 | 7F00 | 0A82 | 7665 | 6E65 | 5F74 | 7974 | 6570 |
| 0000136060 | 8200 | 740C | 6D69 | 6E69 | 5F67 | 6873 | 726F | 0174 |
| 0000136100 | 1601 | 7900 | 0430 | D283 | 8306 | 06D3 | 0A82 | 7528 |
| 0000136120 | 746E | 6761 | 6567 | 2964 | 0169 | 000D | 837F | 0084 |
| 0000136140 | 8483 | 8300 | 0081 | 8183 | 0100 | 002C | 827F | 650A |
| 0000136160 | 6576 | 746E | 745F | 7079 | 0065 | 0582 | 7564 | 6D6D |
| 0000136200 | 0179 | 0882 | 656B | 5F79 | 7461 | 7274 | 8202 | 6608 |
| 0000136220 | 6E75 | 5F63 | 656B | 0479 | 1601 | 7900 | 0210 | D583 |
| 0000136240 | 8306 | 06D6 | 0A82 | 7528 | 746E | 6761 | 6567 | 2964 |
| 0000136260 | 0169 | 0007 | 837F | 0084 | 8483 | 0100 | 0016 | 827F |
| 0000136300 | 650A | 6576 | 746E | 745F | 7079 | 0065 | 0582 | 6170 |
| 0000136320 | 6172 | 016D | 1601 | 7900 | 0930 | D883 | 8306 | 06D9 |
| 0000136340 | 0A82 | 7528 | 746E | 6761 | 6567 | 2964 | 0169 | 001C |
| 0000136360 | 837F | 06BF | C283 | 8306 | 06C5 | C883 | 8306 | 06CB |
| 0000136400 | CE83 | 8306 | 06D1 | 8283 | 8300 | 06D4 | 8501 | 7F00 |
| 0000136420 | 0A82 | 6F63 | 7970 | 655F | 6576 | 746E | 8200 | 6B09 |
| 0000136440 | 7965 | 655F | 6576 | 746E | 8200 | 630B | 696C | 6B63 |
| 0000136460 | 655F | 6576 | 746E | 8200 | 6D0A | 766F | 5F65 | 7665 |
| 0000136500 | 6E65 | 0074 | 0C82 | 6174 | 6C62 | 7465 | 655F | 6576 |
| 0000136520 | 746E | 8200 | 7312 | 6F68 | 7472 | 745F | 6D69 | 6E69 |
| 0000136540 | 5F67 | 7665 | 6E65 | 0074 | 0A82 | 7566 | 636E | 655F |
| 0000136560 | 6576 | 746E | 8200 | 740C | 6D69 | 6E69 | 5F67 | 7665 |
| 0000136600 | 6E65 | 0074 | 0D82 | 6F63 | 6D6D | 6E61 | 5F64 | 7665 |
| 0000136620 | 6E65 | 0074 | 0101 | 8000 | 0701 | 7A00 | 8373 | 06D7 |
| 0000136640 | 0082 | 0101 | 8000 | 0101 | 8000 | 0101 | 8000 | 0101 |
| 0000136660 | 8000 | 0101 | 8000 | 0101 | 8000 | 0101 | 8000 | 0101 |
| * | | | | | | | | |
| 0000137060 | 8000 | 0101 | 8000 | 0501 | 7800 | 8350 | 0080 | 0501 |
| 0000137100 | 7800 | 8330 | 0080 | 0701 | 7800 | 0085 | 8310 | 0080 |
| 0000137120 | 0101 | 8000 | 0501 | 7800 | 8348 | 0080 | 0501 | 7800 |
| 0000137140 | 8320 | 0080 | 0501 | 7800 | 8338 | 0080 | 0701 | 7800 |
| 0000137160 | 2885 | 8305 | 0692 | 0A01 | 7500 | 8360 | 0081 | 0264 |
| 0000137200 | 0A83 | 0107 | 0007 | 837F | 06DB | 8183 | 0100 | 000A |
| 0000137220 | 8075 | 8183 | 6400 | 8301 | 070C | 0401 | 7F00 | C083 |
| 0000137240 | 0100 | 000A | 8075 | 8183 | 7300 | 8300 | 0201 | 0A01 |
| 0000137260 | 7500 | 8380 | 0081 | 0073 | 0183 | 0102 | 000A | 8075 |
| 0000137300 | 8183 | 6400 | 8300 | 0201 | 0501 | 7800 | 8360 | 0080 |
| 0000137320 | 0701 | 7800 | 9085 | 8300 | 0080 | 0701 | 7800 | B085 |

THU MAR 14 17:27:10 1991 CRV_ONS.DLL PAGE 44, LINE 2538

```
0000137340  8300  0080  0501  7800  8310  0080  0701  7800
0000137360  1085  8301  0080  0501  7800  8378  0080  0701
0000137400  7800  E085  8300  0080  0701  7800  9885  8300
0000137420  0080  0701  7800  A885  8300  0080  0701  7800
0000137440  D885  8300  0080  0701  7800  C085  8300  0080
0000137460  0701  7800  2885  8301  0080  0701  7800  2085
0000137500  8301  0080  0A01  7500  8380  0081  0073  0183
0000137520  0102  0007  8578  0088  8083  0100  0004  837F
0000137540  0081  0A01  7500  8380  0200  0164  1F83  0107
0000137560  0005  7078  8083  0100  0004  837F  0085  0A01
0000137600  7500  8380  0081  0164  2283  0107  0007  837F
0000137620  0697  C583  0100  000A  8075  8183  7300  8302
0000137640  0724  0701  7800  C885  8300  0080  0401  7F00
0000137660  9783  0106  000A  8075  8183  7300  8301  0727
0000137700  0401  7F00  9783  0106  000A  8075  8183  7300
0000137720  8301  0729  0701  7F00  DB83  8306  0081  0A01
0000137740  7500  8380  0081  0264  2B83  0107  0007  8578
0000137760  0118  8083  0100  0004  837F  0081  0A01  7500
0000140000  8380  0081  0173  2E83  0107  000A  8075  8183
0000140020  6400  8300  0201  0401  7F00  C083  0100  000A
0000140040  8075  8183  6400  8301  0731  0701  7800  4085
0000140060  8301  0080  0401  7F00  8583  0100  000A  8075
0000140100  8183  6400  8301  0734  1601  7900  0450  3783
0000140120  8307  0738  0A82  7528  746E  6761  6567  2964
0000140140  0169  000D  837F  0085  8583  8300  00C0  8583
0000140160  0100  001A  827F  6104  6464  0072  0482  6973
0000140200  657A  8202  7003  7274  8204  6302  0873  0401
0000140220  7F00  8483  0100  000A  8075  8183  6400  8301
0000140240  0739  0401  7F00  8483  0100  000A  8075  8183
0000140260  7300  8301  073B  0501  7800  8368  0080  0401
0000140300  7F00  8483  0100  000A  8075  8183  7300  8301
0000140320  073E  0A01  7500  8380  0081  0073  0183  0102
0000140340  000A  8075  8183  7300  8300  0201  0701  7800
0000140360  D085  8300  0080  0A01  7500  8380  0200  0073
0000140400  0183  0102  000A  8075  8183  7300  8300  0201
0000140420  0A01  7500  8380  0081  0073  0183  0102  000A
0000140440  8075  8183  7300  8300  0201  0A01  7500  8380
0000140460  0081  0073  0183  0102  0004  837F  00C4  0A01
0000140500  7500  8380  0081  0173  4883  0107  0007  8578
0000140520  00F8  8083  0100  0004  837F  0084  0A01  7500
0000140540  8380  0081  0173  4B83  0107  0007  8578  0150
0000140560  8083  0100  000A  8075  0083  7302  8300  0201
0000140600  0A01  7500  8380  0085  0073  0183  0102  0004
0000140620  837F  0085  0A01  7500  8380  0081  0173  5083
0000140640  0107  0004  837F  0081  0A01  7500  8380  0200
0000140660  0173  5283  0107  000A  8075  8183  6400  8300
0000140700  0201  0101  8000  0101  8000  0101  8000  0101
0000140720  8000  0101  8000  0101  8000  0101  8000  0101
*
0000151320  8000  0101  8000  0A01  7500  8380  0200  0164
0000151340  4783  0106  0004  837F  00C0  0A01  7500  8380
0000151360  00C6  0073  0183  0102  000A  8075  8183  7300
0000151400  8300  0201  0401  7F00  C083  0100  000A  8075
0000151420  0083  6402  8301  064A  0701  7800  5085  8301
0000151440  0080  0701  7800  1085  8301  0080  0A01  7500
0000151460  8380  0081  0064  0183  0102  0001  0180  0001
0000151500  0180  0001  0180  0001  0180  0001  0180  0001
*
0000153500  0180  0001  0180  0005  2078  8583  0100  0001
```

THU MAR 14 17:27:10 1991 CRV_ONS.DLL PAGE 45, LINE 2597

| | | | | | | | | |
|---|---|---|---|---|---|---|---|---|
| 0000153520 | 0180 | 0001 | 0180 | 0001 | 0180 | 0001 | 0180 | 0001 |
| * | | | | | | | | |
| 0000161220 | 0180 | 0001 | 0180 | 0016 | 3079 | 8302 | 05D8 | D983 |
| 0000161240 | 8205 | 280A | 6E75 | 6174 | 6767 | 6465 | 6929 | 0701 |
| 0000161260 | 7F00 | 8583 | 8300 | 0304 | 1A01 | 7F00 | 0A82 | 7665 |
| 0000161300 | 6E65 | 5F74 | 7974 | 6570 | 8200 | 6509 | 6576 | 746E |
| 0000161320 | 625F | 6675 | 0102 | 0016 | 1079 | 8302 | 05DB | DC83 |
| 0000161340 | 8205 | 280A | 6E75 | 6174 | 6767 | 6465 | 6929 | 0701 |
| 0000161360 | 7F00 | 8483 | 8300 | 0084 | 1901 | 7F00 | 0A82 | 7665 |
| 0000161400 | 6E65 | 5F74 | 7974 | 6570 | 8200 | 6B08 | 7965 | 635F |
| 0000161420 | 646F | 0165 | 1601 | 7900 | 0210 | DE83 | 8305 | 05DF |
| 0000161440 | 0A82 | 7528 | 746E | 6761 | 6567 | 2964 | 0169 | 0007 |
| 0000161460 | 837F | 0084 | 8483 | 0100 | 001D | 827F | 650A | 6576 |
| 0000161500 | 746E | 745F | 7079 | 0065 | 0C82 | 7773 | 7469 | 6863 |
| 0000161520 | 735F | 6174 | 6574 | 0101 | 0016 | 2079 | 8304 | 05E1 |
| 0000161540 | E283 | 8205 | 280A | 6E75 | 6174 | 6767 | 6465 | 6929 |
| 0000161560 | 0D01 | 7F00 | 8483 | 8300 | 0084 | 8083 | 8300 | 0080 |
| 0000161600 | 2501 | 7F00 | 0A82 | 7665 | 6E65 | 5F74 | 7974 | 6570 |
| 0000161620 | 8200 | 730C | 6977 | 6374 | 5F68 | 7473 | 7461 | 0165 |
| 0000161640 | 0182 | 0278 | 0182 | 0379 | 1601 | 7900 | 0430 | E483 |
| 0000161660 | 8305 | 05E5 | 0A82 | 7528 | 746E | 6761 | 6567 | 2964 |
| 0000161700 | 0169 | 000D | 837F | 0084 | 8483 | 8300 | 0081 | 8183 |
| 0000161720 | 0100 | 0021 | 827F | 650A | 6576 | 746E | 745F | 7079 |
| 0000161740 | 0065 | 0882 | 7270 | 7365 | 7573 | 6572 | 8201 | 7801 |
| 0000161760 | 8202 | 7901 | 0104 | 0016 | 1079 | 8302 | 05E7 | E883 |
| 0000162000 | 8205 | 280A | 6E75 | 6174 | 6767 | 6465 | 6929 | 0701 |
| 0000162020 | 7F00 | 8483 | 8300 | 0084 | 1D01 | 7F00 | 0A82 | 7665 |
| 0000162040 | 6E65 | 5F74 | 7974 | 6570 | 8200 | 740C | 6D69 | 6E69 |
| 0000162060 | 5F67 | 6873 | 726F | 0174 | 1601 | 7900 | 0430 | EA83 |
| 0000162100 | 8305 | 05EB | 0A82 | 7528 | 746E | 6761 | 6567 | 2964 |
| 0000162120 | 0169 | 000D | 837F | 0084 | 8483 | 8300 | 0081 | 8183 |
| 0000162140 | 0100 | 002C | 827F | 650A | 6576 | 746E | 745F | 7079 |
| 0000162160 | 0065 | 0582 | 7564 | 6D6D | 0179 | 0882 | 656B | 5F79 |
| 0000162200 | 7461 | 7274 | 8202 | 6608 | 6E75 | 5F63 | 656B | 0479 |
| 0000162220 | 1601 | 7900 | 0210 | ED83 | 8305 | 05EE | 0A82 | 7528 |
| 0000162240 | 746E | 6761 | 6567 | 2964 | 0169 | 0007 | 837F | 0084 |
| 0000162260 | 8483 | 0100 | 0016 | 827F | 650A | 6576 | 746E | 745F |
| 0000162300 | 7079 | 0065 | 0582 | 6170 | 6172 | 016D | 1601 | 7900 |
| 0000162320 | 0930 | F083 | 8305 | 05F1 | 0A82 | 7528 | 746E | 6761 |
| 0000162340 | 6567 | 2964 | 0169 | 001C | 837F | 05D7 | DA83 | 8305 |
| 0000162360 | 05DD | E083 | 8305 | 05E3 | E683 | 8305 | 05E9 | 8283 |
| 0000162400 | 8300 | 05EC | 8501 | 7F00 | 0A82 | 6F63 | 7970 | 655F |
| 0000162420 | 6576 | 746E | 8200 | 6B09 | 7965 | 655F | 6576 | 746E |
| 0000162440 | 8200 | 630B | 696C | 6B63 | 655F | 6576 | 746E | 8200 |
| 0000162460 | 6D0A | 766F | 5F65 | 7665 | 6E65 | 0074 | 0C82 | 6174 |
| 0000162500 | 6C62 | 7465 | 655F | 6576 | 746E | 8200 | 7312 | 6F68 |
| 0000162520 | 7472 | 745F | 6D69 | 6E69 | 5F67 | 7665 | 6E65 | 0074 |
| 0000162540 | 0A82 | 7566 | 636E | 655F | 6576 | 746E | 8200 | 740C |
| 0000162560 | 6D69 | 6E69 | 5F67 | 7665 | 6E65 | 0074 | 0D82 | 6F63 |
| 0000162600 | 6D6D | 6E61 | 5F64 | 7665 | 6E65 | 0074 | 0101 | 8000 |
| 0000162620 | 0701 | 7A00 | 8373 | 05EF | 0082 | 0101 | 8000 | 0101 |
| 0000162640 | 8000 | 0101 | 8000 | 0101 | 8000 | 0101 | 8000 | 0101 |
| * | | | | | | | | |
| 0000162740 | 8000 | 0101 | 8000 | 0101 | 8000 | 0701 | 7800 | E085 |
| 0000162760 | 8300 | 0081 | 0701 | 7A00 | 8373 | 05F3 | 0082 | 0101 |
| 0000163000 | 8000 | 0101 | 8000 | 0A01 | 7500 | 8380 | 0200 | 0164 |
| 0000163020 | 0D83 | 0106 | 0004 | 837F | 00C0 | 0401 | 7F00 | 0983 |
| 0000163040 | 0106 | 000A | 8075 | 8183 | 6400 | 8301 | 060E | 0701 |
| 0000163060 | 7800 | 0085 | 8303 | 05EF | 0A01 | 7500 | 8380 | 0081 |

THU MAR 14 17:27:10 1991 CRV_ONS.DLL PAGE 46, LINE 2656

```
0000163100  0073  0183  0102  0004  837F  00C0  0A01  7500
0000163120  8380  0200  0164  1283  0106  0001  0180  000A
0000163140  8075  C683  7300  8300  0201  0A01  7500  8380
0000163160  0081  0064  0183  0102  0001  0180  0001  0180
0000163200  0001  0180  0001  0180  0001  0180  0001  0180
*
0000165200  0001  0180  0005  2078  8583  0100  0001  0180
0000165220  0001  0180  0001  0180  0001  0180  0001  0180
*
0000173020  0001  0180  0001  0180  0001  0180  0016  2079
0000173040  8302  05ED  EE83  8205  280A  6E75  6174  6767
0000173060  6465  6929  1601  7900  0208  EB83  8305  05EC
0000173100  0A82  7528  746E  6761  6567  2964  0169  0007
0000173120  837F  0084  8483  0100  001B  827F  6B08  7965
0000173140  635F  646F  0065  0C82  7773  7469  6863  735F
0000173160  6174  6574  0100  0007  837F  0081  EA83  0105
0000173200  0018  827F  6B08  7965  745F  7079  0065  0982
0000173220  656B  5F79  6176  756C  0265  1801  7900  3085
0000173240  0402  F183  8305  05F2  0A82  7528  746E  6761
0000173260  6567  2964  0169  0007  8578  0200  E983  0105
0000173300  000D  837F  0085  F083  8305  0081  8183  0100
0000173320  002E  827F  7308  7165  735F  7A69  0065  0382
0000173340  6573  0271  0882  656B  5F79  7461  7274  8242
0000173360  610E  7463  7669  7461  6465  665F  6E75  4463
0000173400  0101  8000  0101  8000  0101  8000  0101  8000
*
0000174120  0101  8000  0101  8000  0101  8000  0701  7A00
0000174140  8373  05EF  0082  0101  8000  0101  8000  0101
0000174160  8000  0101  8000  0101  8000  0101  8000  0101
*
0000174540  8000  1601  7900  0230  8B83  8306  068C  0A82
0000174560  7528  746E  6761  6567  2964  0169  0007  837F
0000174600  0085  0483  0103  001A  827F  650A  6576  746E
0000174620  745F  7079  0065  0982  7665  6E65  5F74  7562
0000174640  0266  1601  7900  0210  8E83  8306  068F  0A82
0000174660  7528  746E  6761  6567  2964  0169  0007  837F
0000174700  0084  8483  0100  0019  827F  650A  6576  746E
0000174720  745F  7079  0065  0882  656B  5F79  6F63  6564
0000174740  0101  0016  1079  8302  0691  9283  8206  280A
0000174760  6E75  6174  6767  6465  6929  0701  7F00  8483
0000175000  8300  0084  1D01  7F00  0A82  7665  6E65  5F74
0000175020  7974  6570  8200  730C  6977  6374  5F68  7473
0000175040  7461  0165  1601  7900  0420  9483  8306  0695
0000175060  0A82  7528  746E  6761  6567  2964  0169  000D
0000175100  837F  0084  8483  8300  0080  8083  0100  0025
0000175120  827F  650A  6576  746E  745F  7079  0065  0C82
0000175140  7773  7469  6863  735F  6174  6574  8201  7801
0000175160  8202  7901  0103  0016  3079  8304  0697  9883
0000175200  8206  280A  6E75  6174  6767  6465  6929  0D01
0000175220  7F00  8483  8300  0084  8183  8300  0081  2101
0000175240  7F00  0A82  7665  6E65  5F74  7974  6570  8200
0000175260  7008  6572  7373  7275  0165  0182  0278  0182
0000175300  0479  1601  7900  0210  9A83  8306  069B  0A82
0000175320  7528  746E  6761  6567  2964  0169  0007  837F
0000175340  0084  8483  0100  001D  827F  650A  6576  746E
0000175360  745F  7079  0065  0C82  6974  696D  676E  735F
0000175400  6F68  7472  0101  0016  3079  8304  069D  9E83
0000175420  8206  280A  6E75  6174  6767  6465  6929  0D01
0000175440  7F00  8483  8300  0084  8183  8300  0081  2C01
```

```
THU MAR 14 17:27:10 1991  CRV_ONS.DLL  PAGE 47, LINE 2715

0000175460  7F00  0A82  7665  6E65  5F74  7974  6570  8200
0000175500  6405  6D75  796D  8201  6B08  7965  615F  7474
0000175520  0272  0882  7566  636E  6B5F  7965  0104  0016
0000175540  1079  8302  06A0  A183  8206  280A  6E75  6174
0000175560  6767  6465  6929  0701  7F00  8483  8300  0084
0000175600  1601  7F00  0A82  7665  6E65  5F74  7974  6570
0000175620  8200  7005  7261  6D61  0101  0016  3079  8309
0000175640  06A3  A483  8206  280A  6E75  6174  6767  6465
0000175660  6929  1C01  7F00  8A83  8306  068D  9083  8306
0000175700  0693  9683  8306  0699  9C83  8306  0082  9F83
0000175720  0106  0085  827F  630A  706F  5F79  7665  6E65
0000175740  0074  0982  656B  5F79  7665  6E65  0074  0B82
0000175760  6C63  6369  5F6B  7665  6E65  0074  0A82  6F6D
0000176000  6576  655F  6576  746E  8200  740C  6261  656C
0000176020  5F74  7665  6E65  0074  1282  6873  726F  5F74
0000176040  6974  696D  676E  655F  6576  746E  8200  660A
0000176060  6E75  5F63  7665  6E65  0074  0C82  6974  696D
0000176100  676E  655F  6576  746E  8200  630D  6D6F  616D
0000176120  646E  655F  6576  746E  0100  0001  0180  0007
0000176140  737A  A283  8206  0100  0001  0180  0001  0180
0000176160  0018  8579  0250  8306  06AA  AB83  8206  280A
0000176200  6E75  6174  6767  6465  6929  1301  7F00  8583
0000176220  8300  05F0  8183  8300  0081  8583  8300  0085
0000176240  4801  7F00  0882  6573  5F71  6973  657A  8200
0000176260  7303  7165  8202  6B08  7965  615F  7474  4272
0000176300  0E82  6361  6974  6176  6574  5F64  7566  636E
0000176320  8244  7309  7165  695F  646E  7865  8246  710B
0000176340  6575  6575  695F  646E  7865  0148  0018  8579
0000176360  0330  8304  06AE  AF83  8206  280A  6E75  6174
0000176400  6767  6465  6929  0701  7800  0085  8303  06A2
0000176420  0D01  7F00  8583  8300  0085  8583  8300  06AD
0000176440  3101  7F00  0A82  7571  7565  5F65  6973  657A
0000176460  8200  710B  6575  6575  735F  6174  7472  8202
0000176500  710A  6575  6575  6E5F  7865  0474  0582  7571
0000176520  7565  0665  0701  7A00  8373  06A9  0082  0A01
0000176540  7500  8380  0200  0164  B283  0106  0004  837F
0000176560  06A6  0A01  7500  8380  0081  0164  B483  0106
0000176600  0004  837F  06A6  0701  7F00  8583  8300  064A
0000176620  0A01  7500  8380  0081  0264  B583  0106  0007
0000176640  837F  0085  4A83  0106  000A  8075  8183  6400
0000176660  8302  06B7  0401  7F00  4A83  0106  000A  8075
0000176700  8183  6400  8301  06B9  0A01  7500  8380  0200
0000176720  0064  0183  0102  000D  837F  06A6  A683  8306
0000176740  00C5  C583  0100  000A  8075  8183  6400  8304
0000176760  06BC  0401  7F00  A683  0106  000A  8075  0083
0000177000  6402  8301  06BE  0401  7F00  A683  0106  000A
0000177020  8075  8183  6400  8301  06C0  0A01  7500  8380
0000177040  0200  0064  0183  0102  000A  8075  0083  6402
0000177060  8300  0201  0A01  7500  8380  0200  0064  0183
0000177100  0102  000A  8075  0083  7302  8300  0201  0A01
0000177120  7500  8380  0200  0073  0183  0102  0007  8578
0000177140  0460  EF83  0105  000A  8075  8183  6400  8300
0000177160  0201  0101  8000  0101  8000  0101  8000  0101
0000177200  8000  0101  8000  0101  8000  0101  8000  0101
*
0000177420  8000  0101  8000  0101  8000  0101  8000  0701
0000177440  7800  0085  8301  0080  0101  8000  0101  8000
0000177460  0101  8000  0101  8000  0101  8000  0101  8000
*
```

```
THU MAR 14 17:27:10 1991  CRV_ONS.DLL  PAGE 48, LINE 2774

0000204740   0101  8000  1601  7900  0220  DD83  8304  04DE
0000204760   0A82  7528  746E  6761  6567  2964  0169  0007
0000205000   837F  0081  8183  0100  0009  827F  7801  8200
0000205020   7901  0102  0016  4079  8302  04E0  E183  8204
0000205040   280A  6E75  6174  6767  6465  6929  0701  7F00
0000205060   DC83  8304  04DC  0D01  7F00  0382  696D  006F
0000205100   0382  616D  0478  0101  8000  1601  7900  0220
0000205120   E483  8304  04E5  0A82  7528  746E  6761  6567
0000205140   2964  0169  0007  837F  0085  8583  0100  0012
0000205160   827F  7705  6469  6874  8200  6806  6965  6867
0000205200   0274  0101  8000  1601  7900  0240  E883  8304
0000205220   04E9  0A82  7528  746E  6761  6567  2964  0169
0000205240   0007  837F  04DC  E383  0104  0011  827F  6F06
0000205260   6972  6967  006E  0482  7261  6165  0104  0001
0000205300   0180  0001  0180  0001  0180  0001  0180  0001
*
0000205560   0180  0016  3079  8303  0518  1983  8205  280A
0000205600   6E75  6174  6767  6465  6929  0A01  7F00  8583
0000205620   8300  0085  8583  0100  001A  827F  7705  6469
0000205640   6874  820C  6306  6965  6867  0274  0582  6564
0000205660   7470  0468  1801  7900  4085  0801  1C83  8305
0000205700   051D  0A82  7528  746E  6761  6567  2964  0169
0000205720   0007  8578  0080  8483  0100  0019  837F  0081
0000205740   1783  8305  0085  8583  8300  D0C4  8283  8300
0000205760   00E4  1B83  0105  005A  827F  7206  7065  6572
0000206000   0073  0682  6964  656D  736E  8202  6410  7461
0000206020   5F61  616C  6579  5F72  6564  7470  0868  0882
0000206040   6973  5F67  6973  657A  820A  7307  6769  705F
0000206060   7274  820C  6209  6D74  5F70  6973  657A  8210
0000206100   6208  6D74  5F70  7470  1472  0582  7073  7261
0000206120   1865  0101  8000  1801  7900  A085  0C05  2183
0000206140   8305  0522  0A82  7528  746E  6761  6567  2964
0000206160   0169  0007  8578  0180  8483  0100  0025  837F
0000206200   0086  2C83  8302  022C  8683  8300  0081  8583
0000206220   8300  0086  8283  8300  0086  DC83  8304  051A
0000206240   2083  0105  007E  827F  6902  0064  0482  616E
0000206260   656D  8204  6609  6C69  5F65  616E  656D  8224
0000206300   6509  7078  745F  5F63  6469  8244  7404  7079
0000206320   4865  0C82  6572  5F66  696C  656E  6E5F  6D75
0000206340   824A  7209  6665  745F  5F63  6469  824C  740A
0000206360   6D69  5F65  7473  6D61  5070  0682  6F61  5F69
0000206400   6469  8254  6C08  636F  7461  6F69  586E  0982
0000206420   7462  706D  695F  666E  5C6F  0582  7073  7261
0000206440   8565  0084  0101  8000  0101  8000  0101  8000
0000206460   0101  8000  0101  8000  0101  8000  0101  8000
0000206500   0101  8000  0101  8000  0101  8000  0701  7A00
0000206520   8373  051F  0082  0101  8000  0101  8000  0101
0000206540   8000  0101  8000  0101  8000  0101  8000  0101
*
0000207140   8000  0101  8000  0101  8000  0101  8000  1801
0000207160   7900  C085  0702  7683  8305  0577  0A82  7528
0000207200   746E  6761  6567  2964  0169  0007  8578  0120
0000207220   8483  0100  0016  837F  0086  2C83  8302  04DF
0000207240   8183  8300  0081  8283  8300  0575  3801  7F00
0000207260   0282  6469  8200  6E04  6D61  0465  0482  6572
0000207300   7463  8224  6104  7474  2C72  0582  7564  6D6D
0000207320   2E79  0A82  6974  656D  735F  6174  706D  8230
0000207340   7305  6170  6572  0134  0001  0180  0001  0180
0000207360   0001  0180  0001  0180  0001  0180  0001  0180
```

```
THU MAR 14 17:27:10 1991  CRV_ONS.DLL  PAGE 49, LINE 2833

*
0000207560  0001  0180  0018  8579  0110  8311  059C  9D83
0000207600  8205  280A  6E75  6174  6767  6465  6929  3401
0000207620  7F00  8583  8300  0085  8583  8300  0085  8583
0000207640  8300  0085  8183  8300  0085  8583  8300  0085
0000207660  8483  8300  0085  8583  8300  0085  8583  8300
0000207700  0085  8583  0100  0106  827F  7409  6D69  5F65
0000207720  6E75  7469  8200  6D0F  6E69  725F  6365  726F
0000207740  5F64  6974  656D  8202  7309  6174  6962  696C
0000207760  7974  8204  630F  7061  7574  6572  745F  6D69
0000210000  6F65  7475  8206  6B0A  7965  665F  726F  616D
0000210020  0874  1382  6F63  746E  6E69  6F75  7375  745F
0000210040  6172  6B63  6E69  0A67  0E82  6F6D  7375  5F65
0000210060  7274  6361  696B  676E  820C  6311  7061  7574
0000210100  6572  735F  6769  616E  7574  6572  820E  680B
0000210120  746F  656B  5F79  7973  636E  8210  640C  6665
0000210140  7561  746C  745F  6D69  1265  0982  616D  5F78
0000210160  6564  616C  1479  0B82  6166  7473  725F  7065
0000210200  616C  1679  0E82  6576  6972  7966  745F  6D69
0000210220  6F65  7475  8218  770C  6961  5F74  6974  656D
0000210240  756F  1A74  0C82  7973  636E  745F  6D69  6F65
0000210260  7475  821C  7409  7268  7365  6F68  646C  821E
0000210300  630C  6568  6B63  6C5F  6F6F  756B  2070  0101
0000210320  8000  0701  7800  0085  8308  0080  0101  8000
0000210340  0101  8000  0101  8000  0101  8000  0101  8000
*
0000210540  1601  7900  0240  C283  8305  05C3  0A82  7528
0000210560  746E  6761  6567  2964  0169  0007  837F  0082
0000210600  8283  0100  0017  827F  6408  6665  745F  6D69
0000210620  0065  0882  696D  5F6E  6974  656D  0104  0001
0000210640  0180  0001  0180  0001  0180  0001  0180  0001
0000210660  0180  0001  0180  0016  4079  8304  05CB  CC83
0000210700  8205  280A  [illegible]  6174  6767  6465  6929  0D01
0000210720  7F00  8483  8300  0084  8483  8300  04DC  2901
0000210740  7F00  0782  6261  5F73  6572  006C  0582  6E75
0000210760  7469  0173  0C82  7073  6365  6169  5F6C  7566
0000211000  636E  8202  6404  7369  0470  0101  8000  0101
0000211020  8000  0101  8000  1601  7900  0220  D183  8305
0000211040  05D2  0A82  7528  746E  6761  6567  2964  0169
0000211060  0007  837F  0081  8183  0100  001E  827F  7309
0000211100  6E79  5F63  6F6D  6564  8200  730E  6E79  5F63
0000211120  7865  6365  6D5F  646F  0265  1601  7900  0230
0000211140  D483  8305  05D5  0A82  7528  746E  6761  6567
0000211160  2964  0169  0007  837F  0082  8183  0100  0019
0000211200  827F  7407  6365  5F68  6469  8200  740B  6365
0000211220  5F68  6572  7361  6E6F  0104  0001  0180  0001
0000211240  0180  0001  0180  0018  8579  0220  8303  05DA
0000211260  DB83  8205  280A  6E75  6174  6767  6465  6929
0000211300  0A01  7F00  2C83  8302  022C  8683  0100  001A
0000211320  827F  6905  616D  6567  8200  6404  6669  2066
0000211340  0782  6964  6666  695F  4064  1801  7900  1085
0000211360  0203  DE83  8305  05DF  0A82  7528  746E  6761
0000211400  6567  2964  0169  0007  8578  0300  2C83  0102
0000211420  0007  837F  0085  DD83  0105  0024  827F  6E0E
0000211440  6D75  6F5F  5F66  6373  6572  6E65  0073  0F82
0000211460  6D69  6761  5F65  616E  656D  6C5F  7369  0274
0000211500  1601  7900  0120  E183  8305  05E2  0A82  7528
0000211520  746E  6761  6567  2964  0169  0004  837F  00C0
0000211540  0A01  7F00  0682  7473  6972  676E  0100  0001
```

THU MAR 14 17:27:10 1991 CRV_ONS.DLL PAGE 50, LINE 2892

| | | | | | | | | |
|---|---|---|---|---|---|---|---|---|
| 0000211560 | 0180 | 0001 | 0180 | 0001 | 0180 | 0016 | 3079 | 8302 |
| 0000211600 | 05E7 | E883 | 8205 | 280A | 6E75 | 6174 | 6767 | 6465 |
| 0000211620 | 6929 | 0701 | 7F00 | 8283 | 8300 | 0081 | 1E01 | 7F00 |
| 0000211640 | 0C82 | 7865 | 6563 | 7470 | 6F69 | 5F6E | 6469 | 8200 |
| 0000211660 | 650B | 6378 | 5F70 | 7473 | 7461 | 7375 | 0104 | 0016 |
| 0000211700 | 2079 | 8302 | 05ED | EE83 | 8205 | 280A | 6E75 | 6174 |
| 0000211720 | 6767 | 6465 | 6929 | 1601 | 7900 | 0208 | EB83 | 8305 |
| 0000211740 | 05EC | 0A82 | 7528 | 746E | 6761 | 6567 | 2964 | 0169 |
| 0000211760 | 0007 | 837F | 0084 | 8483 | 0100 | 001B | 827F | 6B08 |
| 0000212000 | 7965 | 635F | 646F | 0065 | 0C82 | 7773 | 7469 | 6863 |
| 0000212020 | 735F | 6174 | 6574 | 0100 | 0007 | 837F | 0081 | EA83 |
| 0000212040 | 0105 | 0018 | 827F | 6B08 | 7965 | 745F | 7079 | 0065 |
| 0000212060 | 0982 | 656B | 5F79 | 6176 | 756C | 0265 | 1801 | 7900 |
| 0000212100 | 3085 | 0402 | F183 | 8305 | 05F2 | 0A82 | 7528 | 746E |
| 0000212120 | 6761 | 6567 | 2964 | 0169 | 0007 | 8578 | 0200 | E983 |
| 0000212140 | 0105 | 000D | 837F | 0085 | F083 | 8305 | 0081 | 8183 |
| 0000212160 | 0100 | 002E | 827F | 7308 | 7165 | 735F | 7A69 | 0065 |
| 0000212200 | 0382 | 6573 | 0271 | 0882 | 656B | 5F79 | 7461 | 7274 |
| 0000212220 | 8242 | 610E | 7463 | 7669 | 7461 | 6465 | 665F | 6E75 |
| 0000212240 | 4463 | 0101 | 8000 | 0101 | 8000 | 0101 | 8000 | 0101 |
| 0000212260 | 8000 | 0101 | 8000 | 0101 | 8000 | 0101 | 8000 | 0101 |
| 0000212300 | 8000 | 1601 | 7900 | 0220 | FC83 | 8305 | 05FD | 0A82 |
| 0000212320 | 7528 | 746E | 6761 | 6567 | 2964 | 0169 | 0007 | 837F |
| 0000212340 | 0081 | 8183 | 0100 | 0017 | 827F | 6B08 | 7965 | 615F |
| 0000212360 | 7474 | 0072 | 0882 | 7566 | 636E | 6B5F | 7965 | 0102 |
| 0000212400 | 0018 | 8579 | 0210 | 8302 | 05FF | 0083 | 8206 | 280A |
| 0000212420 | 6E75 | 6174 | 6767 | 6465 | 6929 | 0701 | 7F00 | 8583 |
| 0000212440 | 8300 | 05F0 | 1201 | 7F00 | 0882 | 6573 | 5F71 | 6973 |
| 0000212460 | 657A | 8200 | 7303 | 7165 | 0102 | 0001 | 0180 | 0001 |
| 0000212500 | 0180 | 0001 | 0180 | 0001 | 0180 | 0001 | 0180 | 0018 |
| 0000212520 | 8579 | 02D0 | 8302 | 0607 | 0883 | 8206 | 280A | 6E75 |
| 0000212540 | 6174 | 6767 | 6465 | 6929 | 0701 | 7F00 | 7483 | 8305 |
| 0000212560 | 0081 | 1101 | 7F00 | 0682 | 6966 | 746C | 7265 | 8200 |
| 0000212600 | 6D04 | 646F | 5865 | 1801 | 7900 | 5085 | 0501 | 0A83 |
| 0000212620 | 8306 | 060B | 0A82 | 7528 | 746E | 6761 | 6567 | 2964 |
| 0000212640 | 0169 | 0010 | 837F | 022C | 8683 | 8300 | 0081 | 8183 |
| 0000212660 | 8300 | 0081 | 2B01 | 7F00 | 0482 | 616E | 656D | 8200 |
| 0000212700 | 6C06 | 6269 | 695F | 2064 | 0582 | 6C63 | 7361 | 2473 |
| 0000212720 | 0582 | 7473 | 6C79 | 2665 | 0782 | 706F | 635F | 646F |
| 0000212740 | 2865 | 0101 | 8000 | 0101 | 8000 | 0101 | 8000 | 1B01 |
| 0000212760 | 7900 | 0920 | 1083 | 8306 | 0611 | 0F82 | 5F69 | 5F75 |
| 0000213000 | 736D | 5F67 | 6170 | 6172 | 5F6D | 6974 | 1C01 | 7F00 |
| 0000213020 | 8183 | 8300 | 0085 | 8283 | 8300 | 0086 | 8883 | 8300 |
| 0000213040 | 0080 | 8483 | 8300 | 00C0 | C083 | 0100 | 006A | 827F |
| 0000213060 | 6909 | 755F | 735F | 6F68 | 7472 | 8200 | 690A | 755F |
| 0000213100 | 755F | 6873 | 726F | 0074 | 0882 | 5F69 | 5F75 | 6F6C |
| 0000213120 | 676E | 8200 | 6909 | 755F | 755F | 6F6C | 676E | 8200 |
| 0000213140 | 6909 | 755F | 665F | 6F6C | 7461 | 8200 | 6908 | 755F |
| 0000213160 | 635F | 6168 | 0072 | 0982 | 5F69 | 5F75 | 6375 | 6168 |
| 0000213200 | 0072 | 0782 | 5F69 | 5F75 | 7473 | 0072 | 0982 | 5F69 |
| 0000213220 | 5F75 | 6C62 | 636F | 006B | 1901 | 7900 | 0230 | 1383 |
| 0000213240 | 8306 | 0614 | 0D82 | 5F69 | 736D | 5F67 | 6170 | 6172 |
| 0000213260 | 5F6D | 6974 | 0701 | 7F00 | 8583 | 8300 | 060F | 1001 |
| 0000213300 | 7F00 | 0482 | 7974 | 6570 | 8200 | 7605 | 6C61 | 6575 |
| 0000213320 | 0102 | 0001 | 0180 | 001C | 8579 | 0090 | 8309 | 0617 |
| 0000213340 | 1883 | 8206 | 690E | 6D5F | 6773 | 685F | 6165 | 6564 |
| 0000213360 | 5F72 | 6974 | 1C01 | 7F00 | 8183 | 8300 | 0081 | 8583 |
| 0000213400 | 8300 | 0085 | 8483 | 8300 | 0085 | 8583 | 8300 | 0081 |
| 0000213420 | 8583 | 0100 | 0047 | 827F | 7104 | 695F | 0064 | 0682 |

THU MAR 14 17:27:10 1991 CRV_ONS.DLL PAGE 51, LINE 2951

| | | | | | | | | |
|---|---|---|---|---|---|---|---|---|
| 0000213440 | 6F73 | 7275 | 6563 | 8202 | 7003 | 6469 | 8204 | 7403 |
| 0000213460 | 6469 | 8206 | 7204 | 7365 | 0870 | 0882 | 6572 | 7073 |
| 0000213500 | 745F | 6469 | 820A | 6F07 | 5F70 | 6F63 | 6564 | 820C |
| 0000213520 | 7404 | 7079 | 0E65 | 0482 | 6973 | 657A | 0110 | 0015 |
| 0000213540 | 8579 | 00C0 | 8302 | 061B | 1C83 | 8206 | 6907 | 6D5F |
| 0000213560 | 6773 | 745F | 0169 | 0005 | 3078 | 1283 | 0106 | 0007 |
| 0000213600 | 837F | 0616 | 1A83 | 0106 | 0017 | 827F | 6806 | 6165 |
| 0000213620 | 6564 | 0072 | 0A82 | 6170 | 6172 | 5F6D | 696C | 7473 |
| 0000213640 | 0112 | 0001 | 0180 | 0001 | 0180 | 0001 | 0180 | 0001 |
| 0000213660 | 0180 | 0001 | 0180 | 0001 | 0180 | 0001 | 0180 | 0001 |
| * | | | | | | | | |
| 0000214120 | 0180 | 0016 | 4079 | 8303 | 064B | 4C83 | 8206 | 280A |
| 0000214140 | 6E75 | 6174 | 6767 | 6465 | 6929 | 0701 | 7A00 | 8373 |
| 0000214160 | 05EF | 0082 | 0A01 | 7F00 | 8183 | 8300 | 0081 | 4A83 |
| 0000214200 | 0106 | 002B | 827F | 6106 | 7463 | 6F69 | 006E | 0F82 |
| 0000214220 | 756E | 5F6D | 666F | 735F | 666F | 6B74 | 7965 | 0273 |
| 0000214240 | 0C82 | 6F73 | 7466 | 656B | 7379 | 705F | 7274 | 0104 |
| 0000214260 | 0016 | 4079 | 8303 | 064F | 5083 | 8206 | 280A | 6E75 |
| 0000214300 | 6174 | 6767 | 6465 | 6929 | 0701 | 7A00 | 8373 | 05FE |
| 0000214320 | 0082 | 0A01 | 7F00 | 8183 | 8300 | 0081 | 4E83 | 0106 |
| 0000214340 | 0029 | 827F | 6106 | 7463 | 6F69 | 006E | 0E82 | 756E |
| 0000214360 | 5F6D | 666F | 685F | 746F | 656B | 7379 | 8202 | 680B |
| 0000214400 | 746F | 656B | 7379 | 705F | 7274 | 0104 | 0018 | 8579 |
| 0000214420 | 0170 | 8305 | 0652 | 5383 | 8206 | 280A | 6E75 | 6174 |
| 0000214440 | 6767 | 6465 | 6929 | 1001 | 7F00 | 2C83 | 8302 | 0086 |
| 0000214460 | 2D83 | 8305 | 00E4 | 8583 | 0100 | 003D | 827F | 690A |
| 0000214500 | 616D | 6567 | 6E5F | 6D61 | 0065 | 0882 | 6D69 | 6761 |
| 0000214520 | 5F65 | 6469 | 8220 | 6909 | 616D | 6567 | 705F | 7274 |
| 0000214540 | 8224 | 6C09 | 7961 | 7265 | 705F | 7274 | 8228 | 6909 |
| 0000214560 | 616D | 6567 | 685F | 6C64 | 012C | 0001 | 0180 | 0001 |
| 0000214600 | 0180 | 0001 | 0180 | 0001 | 0180 | 0018 | 8579 | 0190 |
| 0000214620 | 8302 | 0659 | 5A83 | 8206 | 280A | 6E75 | 6174 | 6767 |
| 0000214640 | 6465 | 6929 | 0701 | 7F00 | 8283 | 8300 | 0651 | 1801 |
| 0000214660 | 7F00 | 0C82 | 7865 | 6563 | 7470 | 6F69 | 5F6E | 6469 |
| 0000214700 | 8200 | 6905 | 616D | 6567 | 0104 | 0001 | 0180 | 0016 |
| 0000214720 | 4079 | 8303 | 065E | 5F83 | 8206 | 280A | 6E75 | 6174 |
| 0000214740 | 6767 | 6465 | 6929 | 0701 | 7A00 | 8373 | 0658 | 0082 |
| 0000214760 | 0A01 | 7F00 | 8183 | 8300 | 0081 | 5D83 | 0106 | 002F |
| 0000215000 | 827F | 6106 | 7463 | 6F69 | 006E | 1182 | 756E | 5F6D |
| 0000215020 | 666F | 655F | 6378 | 7065 | 6974 | 6E6F | 0273 | 0E82 |
| 0000215040 | 7865 | 6563 | 7470 | 6F69 | 5F6E | 696C | 7473 | 0104 |
| 0000215060 | 0018 | 8579 | 0450 | 8303 | 0661 | 6283 | 8206 | 280A |
| 0000215100 | 6E75 | 6174 | 6767 | 6465 | 6929 | 0A01 | 7F00 | 5183 |
| 0000215120 | 8306 | 0651 | 5183 | 0106 | 001A | 827F | 6906 | 616D |
| 0000215140 | 6567 | 0031 | 0682 | 6D69 | 6761 | 3265 | 822E | 6404 |
| 0000215160 | 6669 | 5C66 | 1801 | 7900 | A085 | 0301 | 6583 | 8306 |
| 0000215200 | 0666 | 0A82 | 7528 | 746E | 6761 | 6567 | 2964 | 0169 |
| 0000215220 | 0007 | 737A | 5183 | 8206 | 0100 | 000A | 837F | 0081 |
| 0000215240 | 6483 | 8306 | 0651 | 2601 | 7F00 | 0E82 | 756E | 5F6D |
| 0000215260 | 666F | 735F | 7263 | 6565 | 736E | 8200 | 690A | 616D |
| 0000215300 | 6567 | 6C5F | 7369 | 0274 | 0482 | 6964 | 6666 | 0106 |
| 0000215320 | 0018 | 8579 | 0210 | 8303 | 0668 | 6983 | 8206 | 280A |
| 0000215340 | 6E75 | 6174 | 6767 | 6465 | 6929 | 0A01 | 7F00 | 2C83 |
| 0000215360 | 8302 | 022C | 8183 | 0100 | 0019 | 827F | 6906 | 616D |
| 0000215400 | 6567 | 0031 | 0682 | 6D69 | 6761 | 3265 | 8220 | 6303 |
| 0000215420 | 7475 | 0140 | 0018 | 8579 | 0940 | 8307 | 066E | 6F83 |
| 0000215440 | 8206 | 280A | 6E75 | 6174 | 6767 | 6465 | 6929 | 1801 |
| 0000215460 | 7900 | 0085 | 1D08 | 6C83 | 8306 | 066D | 0A82 | 7528 |
| 0000215500 | 746E | 6761 | 6567 | 2964 | 0169 | 0058 | 837F | 0084 |

THU MAR 14 17:27:10 1991 CRV_ONS.DLL PAGE 52, LINE 3010

```
0000215520  9F83  8305  0084  8483  8300  05CA  8183  8300
0000215540  04E7  D083  8305  0606  7483  8305  0081  4D83
0000215560  8306  05D3  5C83  8306  05E6  8183  8300  0649
0000215600  5183  8306  0660  6383  8306  05DC  8583  8300
0000215620  05D9  6783  8306  05E0  9B83  8305  05FB  0983
0000215640  8306  0084  6F01  7F01  0A82  626B  5F64  7473
0000215660  7461  7375  8200  7409  7365  5F74  616E  656D
0000215700  8200  6B08  7965  635F  646F  0065  0C82  7773
0000215720  7469  6863  735F  6174  6574  8200  6C0C  636F
0000215740  7461  726F  645F  7369  0070  0E82  7274  6361
0000215760  696B  676E  6C5F  7665  6C65  8200  730C  6163
0000216000  656C  775F  6E69  6F64  0077  0982  7973  636E
0000216020  6D5F  646F  0065  0A82  6966  746C  7265  6D5F
0000216040  6773  8200  6606  6C69  6574  0072  0B82  7563
0000216060  7272  6E65  5F74  6F61  0069  0C82  6F68  6B74
0000216100  7965  5F73  696C  7473  8200  730A  6E79  5F63
0000216120  7665  6E65  0074  0E82  7865  6563  7470  6F69
0000216140  5F6E  696C  7473  8200  6510  6378  5F70  7473
0000216160  7461  7375  6C5F  7369  0074  0482  6F6D  6564
0000216200  8200  730D  666F  6B74  7965  5F73  696C  7473
0000216220  8200  6905  616D  6567  8200  6307  6D6F  6170
0000216240  6572  8200  770B  6961  5F74  6373  6572  6E65
0000216260  8200  690A  616D  6567  6C5F  7369  0074  0982
0000216300  6D69  6761  5F65  756E  006D  0A82  6D69  6761
0000216320  5F65  6964  6666  8200  680B  6C61  5F66  6D69
0000216340  6761  7365  8200  6D07  7361  6173  6567  8200
0000216360  7006  7261  6D61  0073  0882  7566  636E  6B5F
0000216400  7965  8200  6908  6F63  5F6E  736D  0067  0582
0000216420  7564  6D6D  0079  1601  7F00  8183  8300  0619
0000216440  8183  8300  05C1  6B83  8306  0081  8583  0100
0000216460  005A  827F  7306  756F  6372  0065  0A82  736D
0000216500  5F67  6568  6461  7265  8202  650A  6576  746E
0000216520  745F  7079  1A65  0682  6974  696D  676E  821C
0000216540  650B  6576  746E  765F  6C61  6575  8224  720C
0000216560  7465  7275  5F6E  6176  756C  8565  0124  0982
0000216600  6572  7073  665F  616C  8567  0126  0101  8000
0000216620  0101  8000  0101  8000  0101  8000  0101  8000
0000216640  0101  8000  0101  8000  0101  8000  0701  7A00
0000216660  8373  066A  0082  0101  8000  0101  8000  0101
0000216700  8000  0101  8000  0101  8000  0101  8000  0101
*
0000217140  8000  0101  8000  0101  8000  0101  8000  1801
0000217160  7900  2085  0202  A883  8306  06A9  0A82  7528
0000217200  746E  6761  6567  2964  0169  0007  837F  05FE
0000217220  8583  0100  0016  827F  6806  746F  656B  0079
0000217240  0982  6573  5F71  6E69  6564  4278  0701  7A00
0000217260  8373  06A7  0082  0701  7F00  8583  8300  064E
0000217300  0A01  7500  8380  0081  0264  AB83  0106  0007
0000217320  837F  0085  4E83  0106  000A  8075  8183  6400
0000217340  8302  06AD  0401  7F00  4E83  0106  000A  8075
0000217360  8183  6400  8301  06AF  0A01  7500  8380  0200
0000217400  0064  0183  0102  0004  837F  0678  0A01  7500
0000217420  8380  0081  0173  B283  0106  000A  8075  0083
0000217440  7302  8300  0201  0A01  7500  8380  0200  0073
0000217460  0183  0102  0007  8578  0420  FE83  0105  0001
0000217500  0180  0001  0180  0016  3079  8303  0203  0483
0000217520  8202  280A  6E75  6174  6767  6465  6929  0A01
0000217540  7F00  8183  8300  0081  8183  0100  001C  827F
0000217560  7006  6361  5F6B  0068  0682  6966  656C  685F
```

```
THU MAR 14 17:27:10 1991  CRV_ONS.DLL  PAGE 53, LINE 3069

0000217600  8202 6606 6E75 5F63 0468 0701 7A00 8373
0000217620  00C0 0082 0101 8000 0101 8000 0101 8000
0000217640  0101 8000 0101 8000 0101 8000 0101 8000
*
0000220020  0101 8000 0101 8000 0101 8000 0501 7800
0000220040  8358 0080 0501 7800 8330 0080 0101 8000
0000220060  0101 8000 0101 8000 0101 8000 0101 8000
*
0000222100  0101 8000 0101 8000 0701 7A00 8373 0332
0000222120  0082 0A01 7500 8380 0081 0064 0183 0102
0000222140  0001 0180 0001 0180 0001 0180 0001 0180
*
0000225020  0016 2079 8302 04A3 A483 8204 280A 6E75
0000225040  6174 6767 6465 6929 1601 7900 0208 A183
0000225060  8304 04A2 0A82 7528 746E 6761 6567 2964
0000225100  0169 0007 837F 0084 8483 0100 001B 827F
0000225120  6B08 7965 635F 646F 0065 0C82 7773 7469
0000225140  6863 735F 6174 6574 0100 0007 837F 0081
0000225160  A083 0104 0018 827F 6B08 7965 745F 7079
0000225200  0065 0982 656B 5F79 6176 756C 0265 1801
0000225220  7900 3085 0402 A783 8304 04A8 0A82 7528
0000225240  746E 6761 6567 2964 0169 0007 8578 0200
0000225260  9F83 0104 000D 837F 0085 A683 8304 0081
0000225300  8183 0100 002E 827F 7308 7165 735F 7A69
0000225320  0065 0382 6573 0271 0882 656B 5F79 7461
0000225340  7274 8242 610E 7463 7669 7461 6465 665F
0000225360  6E75 4463 0101 8000 0101 8000 0101 8000
0000225400  0101 8000 0101 8000 0101 8000 0101 8000
*
0000225440  1801 7900 1085 0202 B583 8304 04B6 0A82
0000225460  7528 746E 6761 6567 2964 0169 0007 837F
0000225500  0085 A683 0104 0012 827F 7308 7165 735F
0000225520  7A69 0065 0382 6573 0271 0101 8000 0101
0000225540  8000 0101 8000 0101 8000 0101 8000 0101
*
0000226200  8000 0101 8000 0701 7A00 8373 04A5 0082
0000226220  0101 8000 0101 8000 0101 8000 0701 7A00
0000226240  8373 04B4 0082 0101 8000 0101 8000 0101
0000226260  8000 0101 8000 0101 8000 0101 8000 0101
*
0000226740  8000 0101 8000 0101 8000 0101 8000 0A01
0000226760  7500 8380 0081 0464 5A83 0105 000D 837F
0000227000  0085 8583 8300 0205 0083 0100 0004 837F
0000227020  0085 0A01 7500 8380 0081 0164 5B83 0105
0000227040  0001 0180 0001 0180 0005 7078 8083 0100
0000227060  0005 3878 8083 0100 0005 6078 8283 0100
0000227100  0007 8578 0088 8083 0100 0007 8578 0080
0000227120  8083 0100 000D 837F 0085 8583 8300 0205
0000227140  0083 0100 000A 8075 8183 6400 8304 0564
0000227160  0101 8000 0701 7800 C085 8300 0080 0701
0000227200  7800 A885 8300 0080 0501 7800 8340 0080
0000227220  0501 7800 8368 0080 0501 7800 8360 0080
0000227240  0514 0042 0005 0086 730C 7475 725F 6165
0000227260  5F64 6573 056D 000D 1A00 1500 0205 0400
0000227300  6300 0D05 7573 5F74 7665 6E65 5F74 7470
0000227320  1472 0605 0402 8500 0C00 7573 5F74 616C
0000227340  7473 695F 746E 0514 0000 0004 0084 730C
0000227360  7475 695F 746E 645F 7461 1B61 4605 0500
0000227400  8600 1300 7573 5F74 6C62 5F6B 6572 6963
```

THU MAR 14 17:27:10 1991 CRV_ONS.DLL PAGE 54, LINE 3128

| | | | | | | | | |
|---|---|---|---|---|---|---|---|---|
| 0000227420 | 6576 | 5F64 | 6573 | 1B6D | 4A05 | 0500 | 8600 | 1300 |
| 0000227440 | 7573 | 5F74 | 6863 | 5F6B | 7573 | 5F6D | 7265 | 5F72 |
| 0000227460 | 6573 | 176D | 4E05 | 0500 | 8600 | 0F00 | 7573 | 5F74 |
| 0000227500 | 6E65 | 5F64 | 6572 | 5F63 | 6573 | 166D | 5205 | 0500 |
| 0000227520 | 8600 | 0E00 | 7573 | 5F74 | 656B | 6E72 | 6C65 | 735F |
| 0000227540 | 6D65 | 0516 | 0056 | 0005 | 0086 | 730E | 7475 | 615F |
| 0000227560 | 7070 | 696C | 5F63 | 6573 | 1A6D | 5A05 | 0500 | 8600 |
| 0000227600 | 1200 | 7573 | 5F74 | 626B | 5F64 | 7473 | 7461 | 7375 |
| 0000227620 | 735F | 6D65 | 0517 | 005E | 0005 | 0086 | 730F | 7475 |
| 0000227640 | 635F | 6D6F | 616D | 646E | 735F | 6D65 | 1105 | 0001 |
| 0000227660 | 0000 | 011B | 0000 | 070D | 005C | 0016 | 0050 | 0000 |
| 0000227700 | 0C04 | 7573 | 5F74 | 7264 | 5F76 | 706F | 6E65 | 040C |
| 0000227720 | FFFA | 0085 | 6106 | 7463 | 6F69 | 0B6E | FC04 | 81FF |
| 0000227740 | 0500 | 7265 | 6F72 | 0172 | 1C02 | 5C01 | 0E00 | 3307 |
| 0000227760 | 1600 | 2700 | 0000 | 0400 | 730D | 7475 | 745F | 7265 |
| 0000230000 | 696D | 616E | 6574 | 0201 | 0117 | 008F | 070F | 0549 |
| 0000230020 | 0010 | 053E | 0000 | 0804 | 7573 | 5F74 | 6E69 | 7469 |
| 0000230040 | 0412 | FFFA | 0084 | 6D0C | 756F | 6573 | 665F | 726F |
| 0000230060 | 616D | 0E74 | FC04 | 85FF | 0800 | 7265 | 5F72 | 696C |
| 0000230100 | 656E | 0409 | FD84 | 00C0 | 6303 | 7068 | 0408 | FEF6 |
| 0000230120 | 04A5 | 6602 | 1270 | 8E04 | D9FD | 0C02 | 756D | 5F78 |
| 0000230140 | 6573 | 5F6D | 696C | 7473 | 0409 | FD88 | 0081 | 7203 |
| 0000230160 | 7365 | 0407 | FD8C | 0081 | 6901 | 040B | FD8A | 0081 |
| 0000230200 | 6505 | 7272 | 726F | 040F | FD82 | 0085 | 7309 | 6D65 |
| 0000230220 | 695F | 646E | 7865 | 040C | FDF0 | 0085 | 7006 | 6361 |
| 0000230240 | 656B | 1074 | F204 | 86FE | 0A00 | 6663 | 5F67 | 626F |
| 0000230260 | 5F6A | 6469 | 040E | FEFA | 05BD | 6508 | 7272 | 705F |
| 0000230300 | 7461 | 1868 | F204 | BDFD | 1205 | 6F64 | 6E77 | 6F6C |
| 0000230320 | 6461 | 665F | 6C69 | 5F65 | 616E | 656D | 0201 | 011B |
| 0000230340 | 05D8 | 071D | 005F | 0016 | 0053 | 0000 | 0C04 | 7263 |
| 0000230360 | 5F76 | 7573 | 5F74 | 6E69 | 7469 | 0409 | FFFC | 0081 |
| 0000230400 | 6503 | 7272 | 0201 | 0118 | 0637 | 0720 | 002D | 0010 |
| 0000230420 | 0022 | 0000 | 0904 | 7573 | 5F74 | 7265 | 6F72 | 0A72 |
| 0000230440 | 0604 | 8100 | 0400 | 7974 | 6570 | 0201 | 0122 | 0664 |
| 0000230460 | 0723 | 0045 | 0010 | 003A | 0000 | 1304 | 7573 | 5F74 |
| 0000230500 | 7277 | 7469 | 5F65 | 6E69 | 6574 | 7272 | 7075 | 0E74 |
| 0000230520 | 0604 | 8500 | 0800 | 6E69 | 5F74 | 7974 | 6570 | 0201 |
| 0000230540 | 011D | 06A9 | 0725 | 0272 | 0016 | 0264 | 0000 | 0E04 |
| 0000230560 | 7573 | 5F74 | 6572 | 6461 | 655F | 6576 | 746E | 040F |
| 0000230600 | 000A | 0697 | 6509 | 6576 | 746E | 705F | 7274 | 0410 |
| 0000230620 | 0006 | 00C5 | 6D0A | 756F | 6573 | 665F | 616C | 0967 |
| 0000230640 | FC04 | 81FF | 0300 | 7665 | 0165 | 2502 | 1B01 | 2809 |
| 0000230660 | 3707 | 1601 | 2900 | 0001 | 0400 | 7316 | 7475 | 775F |
| 0000230700 | 6972 | 6574 | 745F | 6D69 | 6E69 | 5F67 | 7665 | 6E65 |
| 0000230720 | 0F74 | 0604 | 9700 | 0906 | 7665 | 6E65 | 5F74 | 7470 |
| 0000230740 | 0C72 | FC04 | 81FF | 0600 | 6269 | 7479 | 7365 | 040B |
| 0000230760 | FFFA | 0081 | 6505 | 7272 | 726F | 040F | FFF4 | 06D7 |
| 0000231000 | 7309 | 7475 | 655F | 6576 | 746E | 040A | FFF0 | 0082 |
| 0000231020 | 7404 | 6D69 | 0165 | 1E02 | 5201 | 2A0A | D207 | 1601 |
| 0000231040 | C400 | 0001 | 0400 | 730F | 7475 | 775F | 6972 | 6574 |
| 0000231060 | 655F | 6576 | 746E | 040F | 0006 | 0697 | 6509 | 6576 |
| 0000231100 | 746E | 705F | 7274 | 040C | FFFC | 0081 | 6906 | 7962 |
| 0000231120 | 6574 | 0B73 | FA04 | 81FF | 0500 | 7265 | 6F72 | 0F72 |
| 0000231140 | F404 | D7FF | 0906 | 7573 | 5F74 | 7665 | 6E65 | 0574 |
| 0000231160 | 1500 | B70B | 0A00 | F004 | 82FF | 0400 | 6974 | 656D |
| 0000231200 | 0201 | 0201 | 011A | 0C24 | 072C | 0117 | 0010 | 010C |
| 0000231220 | 0000 | 0B04 | 7277 | 7469 | 5F65 | 7665 | 6E65 | 1374 |
| 0000231240 | 0604 | DB00 | 0D06 | 7573 | 5F74 | 7665 | 6E65 | 5F74 |
| 0000231260 | 7470 | 0C72 | 0A04 | 8100 | 0600 | 6269 | 7479 | 7365 |

THU MAR 14 17:27:10 1991 CRV_ONS.DLL PAGE 55, LINE 3187

| | | | | | | | | |
|---|---|---|---|---|---|---|---|---|
| 0000231300 | 040B | FFF8 | 0081 | 6505 | 7272 | 726F | 040A | FFFA |
| 0000231320 | 0085 | 6904 | 756E | 0A6D | FC04 | 81FF | 0400 | 6966 |
| 0000231340 | 6F66 | 0513 | 036E | 0005 | 06D7 | 700B | 7561 | 6573 |
| 0000231360 | 655F | 6576 | 746E | 0201 | 0129 | 0D3B | 072F | 00CF |
| 0000231400 | 0016 | 00C1 | 0000 | 1A04 | 7573 | 5F74 | 7973 | 636E |
| 0000231420 | 775F | 7469 | 5F68 | 6E69 | 7570 | 5F74 | 7665 | 6E65 |
| 0000231440 | 7374 | 0410 | 0006 | 0081 | 650A | 6576 | 746E | 745F |
| 0000231460 | 7079 | 0B65 | F804 | 81FF | 0500 | 7265 | 6F72 | 0A72 |
| 0000231500 | FA04 | 85FF | 0400 | 6E69 | 6D75 | 040A | FFFC | 0081 |
| 0000231520 | 6604 | 6669 | 136F | 9805 | 0503 | D700 | 0B06 | 6170 |
| 0000231540 | 7375 | 5F65 | 7665 | 6E65 | 0174 | 1F02 | 0A01 | 300E |
| 0000231560 | 6707 | 1000 | [illegible]00 | 0000 | 0400 | 7310 | 7475 | 655F |
| 0000231600 | 646E | 645F | 776F | 6C6E | 616F | 0164 | 2002 | 7101 |
| 0000231620 | 320E | F007 | 1001 | E500 | 0001 | 0400 | 7311 | 7475 |
| 0000231640 | 695F | 696E | 5F74 | 6F64 | 6E77 | 6F6C | 6461 | 040E |
| 0000231660 | 0006 | 00C0 | 6608 | 6C69 | 6E65 | 6D61 | 0C65 | E804 |
| 0000231700 | 85FF | 0600 | 696D | 616E | 7264 | 040C | FFE6 | 0085 |
| 0000231720 | 6106 | 7463 | 6F69 | 106E | FC04 | 85FF | 0A00 | 6568 |
| 0000231740 | 5F78 | 6168 | 646E | 656C | 0409 | FFEC | 0081 | 7203 |
| 0000231760 | 7365 | 0407 | FFBC | 0084 | 6901 | 040A | FFF6 | 0084 |
| 0000232000 | 6C04 | 6E65 | 0A67 | FA04 | 80FF | 0400 | 7473 | 6D61 |
| 0000232020 | 040B | FFF8 | 0080 | 7305 | 6174 | 316D | 040D | FFBE |
| 0000232040 | 0733 | 7407 | 6D65 | 7370 | 7274 | 0409 | FFF0 | 00C0 |
| 0000232060 | 7303 | 7274 | 040A | FFEA | 0085 | 6104 | 6464 | 0A72 |
| 0000232100 | F404 | 85FF | 0400 | 6E69 | 6D75 | 040B | FFEE | 0081 |
| 0000232120 | 6505 | 7272 | 726F | 0201 | 011E | 1061 | 0735 | 00E9 |
| 0000232140 | 0010 | 00DE | 0000 | 0F04 | 7573 | 5F74 | 6573 | 646E |
| 0000232160 | 705F | 6361 | 656B | 0A74 | 0604 | 8500 | 0400 | 7974 |
| 0000232200 | 6570 | 040B | FFEC | 0081 | 6505 | 7272 | 726F | 0407 |
| 0000232220 | FFEE | 0085 | 6901 | 0409 | FFF0 | 0085 | 6303 | 756F |
| 0000232240 | 040E | FFF2 | 0085 | 6308 | 6568 | 6B63 | 7573 | 096D |
| 0000232260 | F404 | 36FF | 0307 | 6170 | 0172 | 1F02 | 4A01 | 3A11 |
| 0000232300 | 7807 | 1000 | 6D00 | 0000 | 0400 | 7310 | 7475 | 6D5F |
| 0000232320 | 756F | 6573 | 665F | 726F | 616D | 0A74 | 0604 | 8400 |
| 0000232340 | 0400 | 7974 | 6570 | 040F | FFF6 | 06D7 | 7309 | 7475 |
| 0000232360 | 655F | 6576 | 746E | 0409 | FFFC | 0081 | 6503 | 7272 |
| 0000232400 | 0201 | 011F | 11C2 | 073C | 009E | 0016 | 0090 | 0000 |
| 0000232420 | 1004 | 7573 | 5F74 | 6974 | 696D | 676E | 755F | 696E |
| 0000232440 | 7374 | 0410 | 0006 | 0084 | 740A | 6D69 | 5F65 | 6E75 |
| 0000232460 | 7469 | 0F73 | F604 | D7FF | 0906 | 7573 | 5F74 | 7665 |
| 0000232500 | 6E65 | 0974 | FC04 | 81FF | 0300 | 7265 | 0172 | 2102 |
| 0000232520 | 6001 | 3F12 | 9C07 | 1600 | 8E00 | 0000 | 0400 | 7312 |
| 0000232540 | 7475 | 745F | 6D69 | 6E69 | 5F67 | 6564 | 6166 | 6C75 |
| 0000232560 | 1274 | 0604 | 8400 | 0C00 | 6564 | 6166 | 6C75 | 5F74 |
| 0000232600 | 6974 | 656D | 040F | FFF6 | 06D7 | 7309 | 7475 | 655F |
| 0000232620 | 6576 | 746E | 0409 | FFFC | 0081 | 6503 | 7272 | 0201 |
| 0000232640 | 0118 | 12FC | 0740 | 00AC | 0016 | 00A0 | 0000 | 0904 |
| 0000232660 | 7573 | 5F74 | 6572 | 6573 | 0B74 | FC04 | 81FF | 0500 |
| 0000232700 | 7265 | 6F72 | 0172 | 1D02 | A801 | 4113 | 6107 | 1600 |
| 0000232720 | 5500 | 0000 | 0400 | 730E | 7475 | 685F | 7261 | 5F64 |
| 0000232740 | 6572 | 6573 | 0B74 | FC04 | 81FF | 0500 | 7265 | 6F72 |
| 0000232760 | 0172 | 2102 | 0901 | 4314 | 2C07 | 1600 | 2000 | 0000 |
| 0000233000 | 0400 | 7312 | 7475 | 735F | 6F74 | 5F70 | 6F6D | 7375 |
| 0000233020 | 5F65 | 7573 | 016D | 1A02 | 3501 | 4414 | 4307 | 1600 |
| 0000233040 | 3700 | 0000 | 0400 | 730B | 7475 | 635F | 6E6F | 656E |
| 0000233060 | 7463 | 040F | FFF8 | 06D7 | 7309 | 7475 | 655F | 6576 |
| 0000233100 | 746E | 0201 | 0119 | 1478 | 0745 | 0043 | 0016 | 0037 |
| 0000233120 | 0000 | 0A04 | 7573 | 5F74 | 7962 | 6170 | 7373 | 040F |
| 0000233140 | FFF8 | 06D7 | 7309 | 7475 | 655F | 6576 | 746E | 0201 |

THU MAR 14 17:27:10 1991 CRV_ONS.DLL PAGE 56, LINE 3246

| | | | | | | | | |
|---|---|---|---|---|---|---|---|---|
| 0000233160 | 0117 | 14BB | 0746 | 0043 | 0016 | 0037 | 0000 | 0804 |
| 0000233200 | 7573 | 5F74 | 6F6C | 6B63 | 040F | FFF8 | 06D7 | 7309 |
| 0000233220 | 7475 | 655F | 6576 | 746E | 0201 | 0119 | 14FE | 0747 |
| 0000233240 | 0043 | 0016 | 0037 | 0000 | 0A04 | 7573 | 5F74 | 6E75 |
| 0000233260 | 6F6C | 6B63 | 040F | FFF8 | 06D7 | 7309 | 7475 | 655F |
| 0000233300 | 6576 | 746E | 0201 | 012B | 1541 | 0749 | 0172 | 0016 |
| 0000233320 | 0164 | 0000 | 1C04 | 7573 | 5F74 | 6567 | 5F74 | 6E69 |
| 0000233340 | 7570 | 5F74 | 6564 | 6976 | 6563 | 5F73 | 7473 | 7461 |
| 0000233360 | 7375 | 0414 | 0006 | 00C4 | 640E | 7665 | 6369 | 7365 |
| 0000233400 | 735F | 6174 | 7574 | 0F73 | F204 | D7FF | 0906 | 7573 |
| 0000233420 | 5F74 | 7665 | 6E65 | 0974 | FB04 | 81FF | 0300 | 7265 |
| 0000233440 | 0A72 | FC04 | 81FF | 0400 | 6966 | 6F66 | 040A | FFFA |
| 0000233460 | 0081 | 6904 | 756E | 136D | B405 | 0504 | D700 | 0B06 |
| 0000233500 | 6170 | 7375 | 5F65 | 7665 | 6E65 | 0174 | 2B02 | B301 |
| 0000233520 | 4C16 | 1307 | 1601 | 0500 | 0001 | 0400 | 731C | 7475 |
| 0000233540 | 735F | 7465 | 695F | 706E | 7475 | 645F | 7665 | 6369 |
| 0000233560 | 7365 | 735F | 6174 | 7574 | 1473 | 0604 | 8400 | 0E00 |
| 0000233600 | 6564 | 6976 | 6563 | 5F73 | 7473 | 7461 | 7375 | 040F |
| 0000233620 | FFF2 | 06D7 | 7309 | 7475 | 655F | 6576 | 746E | 0409 |
| 0000233640 | FFF8 | 0081 | 6503 | 7272 | 040A | FFFC | 0081 | 6604 |
| 0000233660 | 6669 | 0A6F | FA04 | 81FF | 0400 | 6E69 | 6D75 | 0513 |
| 0000233700 | 04E4 | 0005 | 06D7 | 700B | 7561 | 6573 | 655F | 6576 |
| 0000233720 | 746E | 0201 | 011F | 17C6 | 074E | 0033 | 0016 | 0027 |
| 0000233740 | 0000 | 1004 | 7573 | 5F74 | 6572 | 7573 | 656D | 695F |
| 0000233760 | 706E | 7475 | 0201 | 011E | 17F9 | 074F | 0028 | 0016 |
| 0000234000 | 001C | 0000 | 0F04 | 6673 | 5F6B | 6163 | 7470 | 7275 |
| 0000234020 | 5F65 | 6C66 | 0167 | 2602 | 2101 | 5118 | 3007 | 1600 |
| 0000234040 | 2200 | 0000 | 0400 | 6317 | 7672 | 735F | 7465 | 735F |
| 0000234060 | 6B66 | 635F | 7061 | 7574 | 6572 | 665F | 676C | 040A |
| 0000234100 | 0006 | 0085 | 6604 | 616C | 0167 | 2402 | 5101 | 5318 |
| 0000234120 | 2A07 | 1600 | 1C00 | 0000 | 0400 | 7315 | 7475 | 665F |
| 0000234140 | 7361 | 5F74 | 6572 | 6C70 | 7961 | 705F | 7261 | 6D61 |
| 0000234160 | 040A | 0006 | 0081 | 6604 | 7361 | 0174 | 0502 | 000D |
| 0000234200 | 1A00 | 1400 | 4205 | 0500 | 8600 | 0C00 | 7573 | 5F74 |
| 0000234220 | 6572 | 6461 | 735F | 6D65 | 0515 | 0002 | 0004 | 06DB |
| 0000234240 | 730D | 7475 | 655F | 6576 | 746E | 705F | 7274 | 050F |
| 0000234260 | 007C | 0005 | 00C0 | 4207 | 785F | 6946 | 656C | 0514 |
| 0000234300 | 0206 | 0004 | 0085 | 730C | 7475 | 6C5F | 7361 | 5F74 |
| 0000234320 | 6E69 | 1474 | 0005 | 0400 | 8400 | 0C00 | 7573 | 5F74 |
| 0000234340 | 6E69 | 5F74 | 6164 | 6174 | 050F | 0080 | 0005 | 00C0 |
| 0000234360 | 4207 | 785F | 6150 | 6B63 | 051B | 0046 | 0005 | 0086 |
| 0000234400 | 7313 | 7475 | 625F | 6B6C | 725F | 6365 | 7669 | 6465 |
| 0000234420 | 735F | 6D65 | 051B | 004A | 0005 | 0086 | 7313 | 7475 |
| 0000234440 | 635F | 6B68 | 735F | 6D75 | 655F | 7272 | 735F | 6D65 |
| 0000234460 | 0510 | 0F66 | 0005 | 0703 | 6608 | 6C69 | 5F65 | 7562 |
| 0000234500 | 1766 | 4E05 | 0500 | 8600 | 0F00 | 7573 | 5F74 | 6E65 |
| 0000234520 | 5F64 | 6572 | 5F63 | 6573 | 126D | 6605 | 0511 | 8100 |
| 0000234540 | 0A0D | 6966 | 656C | 695F | 646E | 7865 | 0516 | 0052 |
| 0000234560 | 0005 | 0086 | 730E | 7475 | 6B5F | 7265 | 656E | 5F6C |
| 0000234600 | 6573 | 146D | 8605 | 0500 | C000 | 0C00 | 6966 | 656C |
| 0000234620 | 625F | 6675 | 705F | 7274 | 0516 | 0056 | 0005 | 0086 |
| 0000234640 | 730E | 7475 | 615F | 7070 | 696C | 5F63 | 6573 | 0F6D |
| 0000234660 | 6205 | 050F | C400 | 0700 | 7573 | 5F74 | 656D | 1A6D |
| 0000234700 | 5A05 | 0500 | 8600 | 1200 | 7573 | 5F74 | 626B | 5F64 |
| 0000234720 | 7473 | 7461 | 7375 | 735F | 6D65 | 0515 | 0F5E | 0005 |
| 0000234740 | 0085 | 630D | 7275 | 5F72 | 6F6C | 6461 | 705F | 7274 |
| 0000234760 | 0517 | 005E | 0005 | 0086 | 730F | 7475 | 635F | 6D6F |
| 0000235000 | 616D | 646E | 735F | 6D65 | 0515 | 0F60 | 0005 | 0085 |
| 0000235020 | 6E0D | 7865 | 5F74 | 6F6C | 6461 | 705F | 7274 | 050E |

THU MAR 14 17:27:10 1991 CRV_ONS.DLL PAGE 57, LINE 3305

| | | | | | | | | |
|---|---|---|---|---|---|---|---|---|
| 0000235040 | 008A | 0005 | 0085 | 6D06 | 7861 | 6461 | 1372 | 8C05 |
| 0000235060 | 0500 | 8100 | 0B00 | 6166 | 7473 | 725F | 7065 | 616C |
| 0000235100 | 1379 | 8E05 | 0500 | 8200 | 0B00 | 616C | 7473 | 745F |
| 0000235120 | 6D69 | 6E69 | 1967 | 9205 | 0500 | 0800 | 1107 | 7573 |
| 0000235140 | 5F74 | 6F6D | 7375 | 5F65 | 6F66 | 6D72 | 7461 | 1273 |
| 0000235160 | 0805 | 0402 | 8500 | 0A00 | 7573 | 5F74 | 6168 | 646E |
| 0000235200 | 656C | 0513 | 0084 | 0005 | 0085 | 730B | 6B66 | 635F |
| 0000235220 | 7061 | 7574 | 6572 | 1105 | 0001 | 0000 | 0121 | 187C |
| 0000235240 | 0648 | 002A | 0016 | 001E | 0000 | 1204 | 6E69 | 5F74 |
| 0000235260 | 6874 | 6572 | 6461 | 735F | 6D65 | 705F | 7274 | 0201 |
| 0000235300 | 0126 | 18A6 | 0649 | 004D | 0016 | 0041 | 0000 | 1704 |
| 0000235320 | 7263 | 5F76 | 706F | 6E65 | 735F | 7475 | 695F | 746E |
| 0000235340 | 745F | 7268 | 6165 | 0164 | 2402 | F301 | 4B18 | 9206 |
| 0000235360 | 1001 | 8700 | 0001 | 0400 | 7315 | 7475 | 685F | 6E61 |
| 0000235400 | 6C64 | 5F65 | 6E69 | 6574 | 7272 | 7075 | 7374 | 0409 |
| 0000235420 | 0006 | 00C0 | 7003 | 7274 | 040E | FFFC | 0085 | 6908 |
| 0000235440 | 746E | 745F | 7079 | 0165 | 0502 | 000D | 1A00 | 1800 |
| 0000235460 | 3605 | 0505 | 8600 | 1000 | 7573 | 5F74 | 6572 | 6461 |
| 0000235500 | 695F | 746E | 735F | 6D65 | 0519 | 1168 | 0005 | 0086 |
| 0000235520 | 6911 | 746E | 745F | 7268 | 6165 | 5F64 | 7075 | 735F |
| 0000235540 | 6D65 | 0514 | 0206 | 0004 | 0085 | 730C | 7475 | 6C5F |
| 0000235560 | 7361 | 5F74 | 6E69 | 1474 | 0005 | 0400 | 8400 | 0C00 |
| 0000235600 | 7573 | 5F74 | 6E69 | 5F74 | 6164 | 6174 | 051B | 0046 |
| 0000235620 | 0005 | 0086 | 7313 | 7475 | 625F | 6B6C | 725F | 6365 |
| 0000235640 | 7669 | 6465 | 735F | 6D65 | 051B | 004A | 0005 | 0086 |
| 0000235660 | 7313 | 7475 | 635F | 6B68 | 735F | 6D75 | 655F | 7272 |
| 0000235700 | 735F | 6D65 | 0517 | 004E | 0005 | 0086 | 730F | 7475 |
| 0000235720 | 655F | 646E | 725F | 6365 | 735F | 6D65 | 0516 | 0052 |
| 0000235740 | 0005 | 0086 | 730E | 7475 | 6B5F | 7265 | 656E | 5F6C |
| 0000235760 | 6573 | 166D | 5605 | 0500 | 8600 | 0E00 | 7573 | 5F74 |
| 0000236000 | 7061 | 6C70 | 6369 | 735F | 6D65 | 051A | 005A | 0005 |
| 0000236020 | 0086 | 7312 | 7475 | 6B5F | 6462 | 735F | 6174 | 7574 |
| 0000236040 | 5F73 | 6573 | 176D | 5E05 | 0500 | 8600 | 0F00 | 7573 |
| 0000236060 | 5F74 | 6F63 | 6D6D | 6E61 | 5F64 | 6573 | 126D | 0805 |
| 0000236100 | 0402 | 8500 | 0A00 | 7573 | 5F74 | 6168 | 646E | 656C |
| 0000236120 | 1105 | 0001 | 0000 | 011E | 1A86 | 060F | 0134 | 0010 |
| 0000236140 | 0129 | 0000 | 0F04 | 6572 | 6461 | 6E5F | 7865 | 5F74 |
| 0000236160 | 7665 | 6E65 | 1474 | 0604 | 0900 | 0E06 | 7665 | 6E65 |
| 0000236200 | 5F74 | 7470 | 5F72 | 6461 | 7264 | 0D08 | 0081 | 030E |
| 0000236220 | 7665 | 0B65 | F404 | 81FF | 0500 | 7265 | 6F72 | 0C72 |
| 0000236240 | FC04 | 81FF | 0600 | 6269 | 7479 | 7365 | 040A | FFF6 |
| 0000236260 | 0085 | 6904 | 756E | 116D | FA04 | 81FF | 0B00 | 6966 |
| 0000236300 | 6F66 | 735F | 6174 | 7574 | 1373 | F804 | 81FF | 0D00 |
| 0000236320 | 6573 | 7261 | 6863 | 735F | 6174 | 7574 | 1173 | D005 |
| 0000236340 | 0511 | EF00 | 0905 | 7563 | 5F72 | 7665 | 6E65 | 1674 |
| 0000236360 | 7005 | 0511 | 1000 | 0E06 | 756F | 5F74 | 7665 | 6E65 |
| 0000236400 | 7374 | 625F | 6675 | 0518 | 055A | 0005 | 0085 | 6F10 |
| 0000236420 | 7475 | 655F | 6576 | 746E | 5F73 | 6E69 | 6564 | 1978 |
| 0000236440 | 5C05 | 0505 | 8500 | 1100 | 756E | 5F6D | 666F | 6F5F |
| 0000236460 | 7475 | 655F | 6576 | 746E | 1473 | 6E05 | 0511 | 8500 |
| 0000236500 | 0C00 | 7571 | 7565 | 5F65 | 656C | 676E | 6874 | 0201 |
| 0000236520 | 0127 | 1BBA | 0611 | 004D | 0016 | 0041 | 0000 | 1804 |
| 0000236540 | 7263 | 5F76 | 706F | 6E65 | 735F | 7475 | 725F | 6165 |
| 0000236560 | 5F64 | 6874 | 6572 | 6461 | 0201 | 0124 | 1C07 | 0613 |
| 0000236600 | 0073 | 0010 | 0068 | 0000 | 1504 | 7573 | 5F74 | 6572 |
| 0000236620 | 6461 | 695F | 706E | 7475 | 655F | 6576 | 746E | 0973 |
| 0000236640 | 0604 | C000 | 0300 | 7470 | 0172 | 2602 | 7A01 | 151C |
| 0000236660 | 2A06 | 1600 | 1E00 | 0000 | 0400 | 7317 | 7475 | 725F |
| 0000236700 | 6165 | 5F64 | 6F74 | 635F | 7672 | 735F | 6D65 | 705F |

THU MAR 14 17:27:10 1991 CRV_ONS.DLL PAGE 58, LINE 3364

| | | | | | | | | |
|---|---|---|---|---|---|---|---|---|
| 0000236720 | 7274 | 0201 | 0D05 | 0000 | 001A | 0518 | 0536 | 0005 |
| 0000236740 | 0086 | 7310 | 7475 | 725F | 6165 | 5F64 | 6E69 | 5F74 |
| 0000236760 | 6573 | 1B6D | 3A05 | 0505 | 8600 | 1300 | 7573 | 5F74 |
| 0000237000 | 6572 | 6461 | 745F | 5F6F | 7263 | 5F76 | 6573 | 136D |
| 0000237020 | 6C05 | 0511 | 8500 | 0B00 | 6966 | 7372 | 5F74 | 7665 |
| 0000237040 | 6E65 | 1274 | 3E05 | 0505 | 0800 | 0A06 | 7665 | 6E65 |
| 0000237060 | 5F74 | 6973 | 657A | 0514 | 0042 | 0005 | 0086 | 730C |
| 0000237100 | 7475 | 725F | 6165 | 5F64 | 6573 | 156D | 0205 | 0400 |
| 0000237120 | F300 | 0D05 | 7573 | 5F74 | 7665 | 6E65 | 5F74 | 7470 |
| 0000237140 | 1272 | 0805 | 0402 | 8500 | 0A00 | 7573 | 5F74 | 6168 |
| 0000237160 | 646E | 656C | 1105 | 0001 | 0000 | 0127 | 1CA4 | 06B6 |
| 0000237200 | 011C | 0010 | 0111 | 0000 | 1804 | 7263 | 5F76 | 7562 |
| 0000237220 | 6C69 | 5F64 | 6F73 | 7466 | 656B | 7379 | 745F | 6261 |
| 0000237240 | 656C | 0411 | 0006 | 0085 | 6E0B | 6D75 | 6F5F | 5F66 |
| 0000237260 | 656B | 7379 | 0412 | 0008 | 064A | 730C | 666F | 6B74 |
| 0000237300 | 7965 | 5F73 | 7562 | 0766 | FC04 | 85FF | 0100 | 0769 |
| 0000237320 | FA04 | 85FF | 0100 | 0E6A | F604 | B0FF | 0806 | 6574 |
| 0000237340 | 706D | 705F | 7274 | 0201 | 0128 | 1DC0 | 06B8 | 00BE |
| 0000237360 | 0010 | 00B3 | 0000 | 1904 | 7263 | 5F76 | 6461 | 5F64 |
| 0000237400 | 6F73 | 7466 | 656B | 7379 | 745F | 5F6F | 6174 | 6C62 |
| 0000237420 | 1165 | 0604 | 8500 | 0B00 | 756E | 5F6D | 666F | 6B5F |
| 0000237440 | 7965 | 1273 | 0804 | 4A00 | 0C06 | 6F73 | 7466 | 656B |
| 0000237460 | 7379 | 625F | 6675 | 0407 | FFFA | 0085 | 6901 | 040E |
| 0000237500 | FFF6 | 06B0 | 7408 | 6D65 | 5F70 | 7470 | 1772 | FC04 |
| 0000237520 | 85FF | 1100 | 6F74 | 6174 | 5F6C | 756E | 5F6D | 666F |
| 0000237540 | 6B5F | 7965 | 0173 | 2A02 | 7E01 | BA1E | 4506 | 1001 |
| 0000237560 | 3A00 | 0001 | 0400 | 631B | 7672 | 645F | 6C65 | 735F |
| 0000237600 | 666F | 6B74 | 7965 | 5F73 | 7266 | 6D6F | 745F | 6261 |
| 0000237620 | 656C | 0412 | 0006 | 064A | 730C | 666F | 6B74 | 7965 |
| 0000237640 | 5F73 | 7562 | 0766 | FC04 | 85FF | 0100 | 0769 | FA04 |
| 0000237660 | 85FF | 0100 | 0B6A | F804 | 85FF | 0500 | 616D | 6374 |
| 0000237700 | 0168 | 2702 | C301 | BB1F | 3106 | 1000 | 2600 | 0000 |
| 0000237720 | 0400 | 6318 | 7672 | 635F | 656C | 7261 | 735F | 666F |
| 0000237740 | 6B74 | 7965 | 5F73 | 6174 | 6C62 | 0165 | 2A02 | F401 |
| 0000237760 | BD1F | 7406 | 1002 | 6900 | 0002 | 0400 | 731B | 6165 |
| 0000240000 | 6372 | 5F68 | 6F66 | 5F72 | 6F73 | 7466 | 656B | 5F79 |
| 0000240020 | 6573 | 7571 | 6E65 | 6563 | 0412 | 0006 | 06A6 | 690C |
| 0000240040 | 5F6E | 7665 | 6E65 | 5F74 | 7470 | 1372 | 0A04 | A600 |
| 0000240060 | 0D06 | 756F | 5F74 | 7665 | 6E65 | 5F74 | 7470 | 1772 |
| 0000240100 | 0E04 | C500 | 1100 | 756E | 5F6D | 666F | 6F5F | 7475 |
| 0000240120 | 655F | 6576 | 746E | 1273 | 1204 | C500 | 0C00 | 7571 |
| 0000240140 | 7565 | 5F65 | 656C | 676E | 6874 | 0407 | FFF8 | 0085 |
| 0000240160 | 6901 | 0413 | FFFA | 0081 | 730D | 6165 | 6372 | 5F68 |
| 0000240200 | 7473 | 7461 | 7375 | 0413 | FFFC | 0085 | 6D0D | 7861 |
| 0000240220 | 715F | 6575 | 6575 | 6C5F | 6E65 | 0201 | 0123 | 2268 |
| 0000240240 | 06BF | 0041 | 0010 | 0036 | 0000 | 1404 | 6E65 | 6574 |
| 0000240260 | 5F72 | 7665 | 6E65 | 5F74 | 6F74 | 715F | 6575 | 6575 |
| 0000240300 | 040F | 0006 | 06A6 | 6509 | 6576 | 746E | 705F | 7274 |
| 0000240320 | 0201 | 0123 | 22A9 | 06C1 | 0053 | 0010 | 0048 | 0000 |
| 0000240340 | 1404 | 6567 | 5F74 | 7665 | 6E65 | 5F74 | 7266 | 6D6F |
| 0000240360 | 715F | 6575 | 6575 | 040F | 0006 | 06A6 | 6509 | 6576 |
| 0000240400 | 746E | 705F | 7274 | 0201 | 011A | 22FC | 06C2 | 0062 |
| 0000240420 | 0010 | 0057 | 0000 | 0B04 | 6C63 | 6165 | 5F6E | 7571 |
| 0000240440 | 7565 | 0765 | FC04 | 85FF | 0100 | 0169 | 1802 | 5E01 |
| 0000240460 | C323 | 3606 | 1000 | 2B00 | 0000 | 0400 | 6409 | 6365 |
| 0000240500 | 715F | 6575 | 6575 | 0201 | 0118 | 2394 | 06C4 | 0036 |
| 0000240520 | 0010 | 002B | 0000 | 0904 | 6E69 | 5F63 | 7571 | 7565 |
| 0000240540 | 0165 | 2802 | CA01 | C523 | 2706 | 1600 | 1B00 | 0000 |
| 0000240560 | 0400 | 6319 | 7672 | 735F | 6F74 | 5F70 | 6F73 | 7466 |

THU MAR 14 17:27:10 1991 CRV_ONS.DLL PAGE 59, LINE 3423

| | | | | | | | | |
|---|---|---|---|---|---|---|---|---|
| 0000240600 | 656B | 5F79 | 6573 | 7571 | 6E65 | 6563 | 0201 | 0126 |
| 0000240620 | 23F1 | 06C6 | 0094 | 0016 | 0088 | 0000 | 1704 | 7263 |
| 0000240640 | 5F76 | 6E69 | 7469 | 735F | 666F | 6B74 | 7965 | 5F73 |
| 0000240660 | 6174 | 6C62 | 0D65 | 7204 | C7FF | 0706 | 6F73 | 7466 |
| 0000240700 | 656B | 0B79 | 7004 | 81FF | 0500 | 7265 | 6F72 | 0172 |
| 0000240720 | 0502 | 000D | 1A00 | 1400 | 4005 | 0512 | B000 | 0C06 |
| 0000240740 | 6F73 | 7466 | 656B | 7379 | 705F | 7274 | 0514 | 123E |
| 0000240760 | 0005 | 0085 | 730C | 666F | 6B74 | 7965 | 5F73 | 756E |
| 0000241000 | 1A6D | 3C05 | 0512 | 8500 | 1200 | 6C61 | 6F6C | 5F63 |
| 0000241020 | 6F73 | 7466 | 656B | 7379 | 6E5F | 6D75 | 0513 | 11D6 |
| 0000241040 | 0005 | 06AC | 650B | 6576 | 746E | 715F | 6575 | 6575 |
| 0000241060 | 11G5 | 0001 | 0000 | 0126 | 2486 | 06AC | 0094 | 0010 |
| 0000241100 | 0089 | 0000 | 1704 | 7263 | 5F76 | 7562 | 6C69 | 5F64 |
| 0000241120 | 6F68 | 6B74 | 7965 | 5F73 | 6174 | 6C62 | 1165 | 0604 |
| 0000241140 | 8500 | 0B00 | 756E | 5F6D | 666F | 6B5F | 7965 | 1073 |
| 0000241160 | 0804 | 4E00 | 0A06 | 6F68 | 6B74 | 7965 | 625F | 6675 |
| 0000241200 | 0407 | FFFC | 0085 | 6901 | 040E | FFF8 | 06AA | 7408 |
| 0000241220 | 6D65 | 5F70 | 7470 | 0172 | 2702 | 1A01 | AE25 | AF06 |
| 0000241240 | 1000 | A400 | 0000 | 0400 | 6318 | 7672 | 615F | 6464 |
| 0000241260 | 685F | 746F | 656B | 7379 | 745F | 5F6F | 6174 | 6C62 |
| 0000241300 | 1165 | 0604 | 8500 | 0B00 | 756E | 5F6D | 666F | 6B5F |
| 0000241320 | 7965 | 1073 | 0804 | 4E00 | 0A06 | 6F68 | 6B74 | 7965 |
| 0000241340 | 625F | 6675 | 0407 | FFFA | 0085 | 6901 | 040E | FFF6 |
| 0000241360 | 06AA | 7408 | 6D65 | 5F70 | 7470 | 1772 | FC04 | 85FF |
| 0000241400 | 1100 | 6F74 | 6174 | 5F6C | 756E | 5F6D | 666F | 6B5F |
| 0000241420 | 7965 | 0173 | 2802 | C901 | B025 | 2D06 | 1001 | 2200 |
| 0000241440 | 0001 | 0400 | 6319 | 7672 | 645F | 6C65 | 685F | 746F |
| 0000241460 | 656B | 5F79 | 7266 | 6D6F | 745F | 6261 | 656C | 0410 |
| 0000241500 | 0006 | 064E | 680A | 746F | 656B | 5F79 | 7562 | 0766 |
| 0000241520 | FC04 | 85FF | 0100 | 0769 | FA04 | 85FF | 0100 | 0B6A |
| 0000241540 | F804 | 85FF | 0500 | 616D | 6374 | 0168 | 2602 | F601 |
| 0000241560 | B126 | 3106 | 1000 | 2600 | 0000 | 0400 | 6317 | 7672 |
| 0000241600 | 635F | 656C | 7261 | 685F | 746F | 656B | 7379 | 745F |
| 0000241620 | 6261 | 656C | 0201 | 0124 | 2727 | 06B3 | 0160 | 0016 |
| 0000241640 | 0152 | 0000 | 1504 | 7263 | 5F76 | 6573 | 7261 | 6863 |
| 0000241660 | 665F | 726F | 685F | 746F | 656B | 1279 | 0604 | 7800 |
| 0000241700 | 0C06 | 6E69 | 655F | 6576 | 746E | 705F | 7274 | 0407 |
| 0000241720 | FFFA | 0085 | 6901 | 0413 | FFFC | 0081 | 730D | 6165 |
| 0000241740 | 6372 | 5F68 | 7473 | 7461 | 7375 | 0201 | 0127 | 2887 |
| 0000241760 | 06B4 | 004A | 0016 | 003E | 0000 | 1804 | 7263 | 5F76 |
| 0000242000 | 7473 | 706F | 685F | 746F | 656B | 5F79 | 6573 | 7571 |
| 0000242020 | 6E65 | 6563 | 0407 | FFFC | 0085 | 6901 | 0201 | 0125 |
| 0000242040 | 28D1 | 06B5 | 006A | 0016 | 005E | 0000 | 1604 | 7263 |
| 0000242060 | 5F76 | 6E69 | 7469 | 685F | 746F | 656B | 7379 | 745F |
| 0000242100 | 6261 | 656C | 040C | FF7A | 06B6 | 6806 | 746F | 656B |
| 0000242120 | 0B79 | 7804 | 81FF | 0500 | 7265 | 6F72 | 0172 | 0502 |
| 0000242140 | 000D | 1A00 | 1300 | 4605 | 0512 | AA00 | 0806 | 6F68 |
| 0000242160 | 6B74 | 7965 | 5F73 | 7470 | 1072 | 4A05 | 0512 | 8500 |
| 0000242200 | 0800 | 656B | 7379 | 6E5F | 6D75 | 0519 | 1244 | 0005 |
| 0000242220 | 0085 | 6111 | 6C6C | 636F | 685F | 746F | 656B | 7379 |
| 0000242240 | 6E5F | 6D75 | 1105 | 0001 | 0000 | 011C | 293C | 055C |
| 0000242260 | 025E | 0010 | 0253 | 0000 | 0D04 | 7263 | 5F76 | 6E69 |
| 0000242300 | 7469 | 6B5F | 7965 | 0E73 | 0604 | 8500 | 0800 | 6F73 |
| 0000242320 | 7466 | 656B | 7379 | 040C | FFF2 | 00C0 | 5F06 | 745F |
| 0000242340 | 7079 | 0F65 | EC04 | 85FF | 0900 | 5F5F | 7862 | 745F |
| 0000242360 | 7079 | 0D65 | DA04 | 31FF | 0703 | 5F5F | 7270 | 6E69 |
| 0000242400 | 0B74 | D204 | 02FF | 0502 | 5F5F | 766C | 0D6C | DE04 |
| 0000242420 | 61FF | 0705 | 5F5F | 6C63 | 636F | 0D6B | EE04 | C0FF |
| 0000242440 | 0700 | 5F5F | 7473 | 6361 | 0E6B | D804 | 81FF | 0800 |

THU MAR 14 17:27:10 1991 CRV_ONS.DLL PAGE 60, LINE 3482

| | | | | | | | | |
|---|---|---|---|---|---|---|---|---|
| 0000242460 | 5F5F | 6572 | 7674 | 6C61 | 040B | FFEA | 0081 | 6505 |
| 0000242500 | 7272 | 726F | 0413 | FFF6 | 0086 | 730D | 7379 | 6574 |
| 0000242520 | 5F6D | 6663 | 5F67 | 6469 | 040A | FFDD | 0085 | 6104 |
| 0000242540 | 6772 | 0A63 | FA04 | 05FF | 0402 | 7261 | 7667 | 050E |
| 0000242560 | 05A6 | 0005 | 055F | 5F06 | 665F | 6E75 | 0163 | 2602 |
| 0000242600 | 9A01 | 652B | B205 | 1005 | A700 | 0005 | 0400 | 7017 |
| 0000242620 | 7261 | 6573 | 615F | 646E | 695F | 696E | 5F74 | 6663 |
| 0000242640 | 5F67 | 7469 | 6D65 | 040E | 0006 | 0085 | 7308 | 666F |
| 0000242660 | 6B74 | 7965 | 0A73 | 0804 | 8500 | 0400 | 7261 | 6367 |
| 0000242700 | 040A | 000A | 0205 | 6104 | 6772 | 0C76 | FA04 | C0FF |
| 0000242720 | 0600 | 5F5F | 7974 | 6570 | 040F | FFEE | 0085 | 5F09 |
| 0000242740 | 625F | 5F78 | 7974 | 6570 | 040D | FFBE | 0331 | 5F07 |
| 0000242760 | 705F | 6972 | 746E | 040B | FFB2 | 0202 | 5F05 | 6C5F |
| 0000243000 | 6C76 | 040D | FFCA | 0561 | 5F07 | 635F | 6F6C | 6B63 |
| 0000243020 | 040D | FFF2 | 00C0 | 5F07 | 735F | 6174 | 6B63 | 040E |
| 0000243040 | FFB8 | 0081 | 5F08 | 725F | 7465 | 6176 | 126C | C204 |
| 0000243060 | 06FF | 0C05 | 6F68 | 6B74 | 7965 | 745F | 6261 | 656C |
| 0000243100 | 0413 | FFBA | 0502 | 730D | 666F | 6B74 | 7965 | 745F |
| 0000243120 | 6261 | 656C | 0411 | FFF6 | 0085 | 760B | 6C61 | 6575 |
| 0000243140 | 695F | 646E | 7865 | 0407 | FFF0 | 0085 | 6901 | 0410 |
| 0000243160 | FFB0 | 0081 | 690A | 6574 | 736D | 725F | 6165 | 0A64 |
| 0000243200 | D604 | 68FF | 0405 | 7473 | 3172 | 040F | FFAA | 0081 |
| 0000243220 | 7309 | 6163 | 5F6E | 6F63 | 6564 | 0412 | FFAC | 00C0 |
| 0000243240 | 630C | 7275 | 705F | 736F | 7469 | 6F69 | 096E | C604 |
| 0000243260 | C0FF | 0300 | 6863 | 0B70 | F804 | 81FF | 0500 | 7665 |
| 0000243300 | 6E65 | 0B74 | EC04 | 81FF | 0500 | 7265 | 6F72 | 0E72 |
| 0000243320 | 0205 | 0506 | 6700 | 0605 | 5F5F | 7566 | 636E | 0201 |
| 0000243340 | 0D05 | 0000 | 001A | 050F | 059E | 0005 | 00C0 | 4207 |
| 0000243360 | 785F | 6946 | 656C | 050F | 05A2 | 0005 | 00C0 | 4207 |
| 0000243400 | 785F | 6150 | 6B63 | 0514 | 0000 | 0000 | 0081 | 420C |
| 0000243420 | 5F78 | 6544 | 7562 | 4D67 | 646F | 1465 | 0005 | 0000 |
| 0000243440 | 8100 | 0C00 | 7842 | 545F | 6D69 | 7365 | 6F4D | 6564 |
| 0000243460 | 6309 | 7672 | 735F | 7475 | 632E | 0001 | 01FB | 0070 |
| 0000243500 | 0000 | 0075 | 0016 | 0076 | 003B | 0077 | 0044 | 0078 |
| 0000243520 | 004A | 0079 | 0050 | 007F | 005C | 0080 | 0072 | 0081 |
| 0000243540 | 0083 | 0088 | 008F | 008D | 009F | 0098 | 00A9 | 0099 |
| 0000243560 | 00BB | 009B | 00BF | 009C | 00DF | 009E | 00E9 | 009F |
| 0000243600 | 0106 | 00A0 | 0110 | 00A1 | 0126 | 00A5 | 013D | 00A6 |
| 0000243620 | 015A | 00A7 | 0164 | 00A8 | 017B | 00A9 | 019D | 00AA |
| 0000243640 | 01A9 | 00AB | 01AC | 00AE | 01C3 | 00B1 | 01D6 | 00B2 |
| 0000243660 | 01F0 | 00B3 | 01FD | 00B4 | 0203 | 00B8 | 0213 | 00B9 |
| 0000243700 | 0225 | 00BA | 0231 | 00BB | 0237 | 00BC | 0243 | 00BD |
| 0000243720 | 0249 | 00BE | 024F | 00BF | 025A | 00C0 | 0265 | 00C2 |
| 0000243740 | 026F | 00C3 | 0289 | 00C5 | 0293 | 00C8 | 029A | 00CB |
| 0000243760 | 029D | 00CD | 02B0 | 00CE | 02B9 | 00CF | 02C3 | 00D0 |
| 0000244000 | 02D3 | 00D1 | 02DD | 00D2 | 02E8 | 00D3 | 02F2 | 00D4 |
| 0000244020 | 0306 | 00D6 | 0310 | 00D7 | 031C | 00DA | 0322 | 00DC |
| 0000244040 | 0325 | 00DD | 0331 | 00DE | 033A | 00DF | 0344 | 00E0 |
| 0000244060 | 034A | 00E1 | 034F | 00E2 | 035B | 00E4 | 0361 | 00E7 |
| 0000244100 | 0364 | 00E8 | 0367 | 00EA | 037A | 00EC | 0387 | 00ED |
| 0000244120 | 0390 | 00EE | 039A | 00EF | 03AA | 00F0 | 03B4 | 00F1 |
| 0000244140 | 03BF | 00F2 | 03C9 | 00F3 | 03DD | 00F5 | 03E7 | 00F6 |
| 0000244160 | 03F3 | 00F9 | 03F9 | 00FB | 03FC | 00FC | 0408 | 0101 |
| 0000244200 | 040E | 0102 | 041C | 0103 | 0428 | 0104 | 0434 | 0105 |
| 0000244220 | 043A | 0106 | 0448 | 0109 | 044E | 010A | 0470 | 010D |
| 0000244240 | 0477 | 010E | 0482 | 0110 | 0485 | 0111 | 0490 | 0113 |
| 0000244260 | 049E | 0114 | 04C0 | 0117 | 04C7 | 0118 | 04D2 | 011A |
| 0000244300 | 04D5 | 011B | 04E5 | 011C | 04EB | 011D | 04FE | 011F |
| 0000244320 | 0501 | 0120 | 0511 | 0121 | 051D | 0123 | 0523 | 0125 |

THU MAR 14 17:27:10 1991 CRV_ONS.DLL PAGE 61, LINE 3541

| | | | | | | | | |
|---|---|---|---|---|---|---|---|---|
| 0000244340 | 0526 | 0126 | 0536 | 0127 | 053C | 0128 | 054F | 012A |
| 0000244360 | 0552 | 012B | 0562 | 012D | 0568 | 012E | 0576 | 0130 |
| 0000244400 | 057A | 0131 | 0584 | 0132 | 058D | 0134 | 0597 | 0135 |
| 0000244420 | 05A3 | 0137 | 05AA | 0138 | 05B6 | 0139 | 05BB | 013A |
| 0000244440 | 05C7 | 013B | 05CD | 014E | 05D8 | 0151 | 05EE | 0152 |
| 0000244460 | 05FA | 0153 | 0602 | 0154 | 060B | 0155 | 0613 | 0156 |
| 0000244500 | 061D | 0158 | 0625 | 0159 | 062B | 0162 | 0637 | 0163 |
| 0000244520 | 0647 | 0165 | 0656 | 0166 | 0659 | 016C | 0664 | 016D |
| 0000244540 | 0674 | 016F | 067F | 0170 | 069E | 0178 | 06A9 | 017C |
| 0000244560 | 06BF | 017D | 06D2 | 017E | 06E3 | 017F | 06EB | 0182 |
| 0000244600 | 06F1 | 0183 | 06FA | 0184 | 070E | 0187 | 0711 | 0188 |
| 0000244620 | 071A | 0189 | 072E | 018C | 0731 | 018E | 073A | 018F |
| 0000244640 | 074E | 0192 | 0751 | 0193 | 075A | 0194 | 0762 | 0195 |
| 0000244660 | 076A | 0197 | 0772 | 0199 | 0786 | 019B | 079B | 019E |
| 0000244700 | 07B0 | 019F | 07CA | 01A0 | 07D6 | 01A3 | 07D9 | 01A4 |
| 0000244720 | 07E2 | 01A5 | 07EA | 01A6 | 07F2 | 01A8 | 07FA | 01AA |
| 0000244740 | 080E | 01AC | 0822 | 01AD | 0836 | 01B0 | 0839 | 01B2 |
| 0000244760 | 084C | 01B4 | 0855 | 01B5 | 0869 | 01B6 | 0876 | 01B8 |
| 0000245000 | 087C | 01BA | 087F | 01BB | 0893 | 01CC | 0896 | 01CD |
| 0000245020 | 08A1 | 01CE | 08B0 | 01CF | 08B6 | 01D2 | 08F2 | 01D3 |
| 0000245040 | 08FC | 01D4 | 0907 | 01D5 | 090D | 01DB | 091B | 01E0 |
| 0000245060 | 0931 | 01E2 | 093B | 01E3 | 094C | 01E4 | 095F | 01E6 |
| 0000245100 | 0970 | 01E7 | 0973 | 01E8 | 0984 | 01EA | 09AE | 01EB |
| 0000245120 | 09BB | 01ED | 09D3 | 01EE | 09D7 | 01EF | 09DD | 01F1 |
| 0000245140 | 09E2 | 01F3 | 09E5 | 01F4 | 09E9 | 01F5 | 0A08 | 01F7 |
| 0000245160 | 0A0D | 01F8 | 0A20 | 01F9 | 0A29 | 01FA | 0A38 | 01FC |
| 0000245200 | 0A3E | 01FD | 0A44 | 0203 | 0A52 | 0207 | 0A68 | 020A |
| 0000245220 | 0A72 | 020B | 0A76 | 020C | 0A80 | 020D | 0A85 | 0210 |
| 0000245240 | 0A88 | 0211 | 0A8C | 0212 | 0A96 | 0213 | 0A9B | 0216 |
| 0000245260 | 0A9E | 0218 | 0AA2 | 0219 | 0AAC | 021A | 0AB1 | 021D |
| 0000245300 | 0AB4 | 021F | 0AC1 | 0221 | 0AC5 | 0223 | 0ACF | 0225 |
| 0000245320 | 0AD9 | 0226 | 0AE3 | 0228 | 0AE8 | 022A | 0AEB | 022C |
| 0000245340 | 0AEF | 022E | 0AF9 | 0230 | 0B03 | 0231 | 0B0D | 0233 |
| 0000245360 | 0B12 | 0239 | 0B15 | 023A | 0B1F | 023B | 0B30 | 023C |
| 0000245400 | 0B33 | 023D | 0B44 | 023F | 0B6E | 0241 | 0B86 | 0242 |
| 0000245420 | 0B8A | 0243 | 0B90 | 0245 | 0B95 | 0247 | 0B98 | 0249 |
| 0000245440 | 0B9C | 024A | 0BBB | 024D | 0BC0 | 024E | 0BC3 | 024F |
| 0000245460 | 0BC9 | 0253 | 0BCC | 0254 | 0BD2 | 0255 | 0BD5 | 0256 |
| 0000245500 | 0BFD | 0257 | 0C10 | 0258 | 0C16 | 025F | 0C24 | 0262 |
| 0000245520 | 0C34 | 0265 | 0C39 | 0267 | 0C58 | 0269 | 0C77 | 026A |
| 0000245540 | 0C88 | 026C | 0C92 | 026E | 0C9D | 0270 | 0CB9 | 0273 |
| 0000245560 | 0CD8 | 0275 | 0CF3 | 0276 | 0D00 | 0277 | 0D03 | 0278 |
| 0000245600 | 0D0F | 0279 | 0D12 | 027A | 0D1B | 027B | 0D21 | 027C |
| 0000245620 | 0D24 | 027E | 0D2A | 027F | 0D30 | 0285 | 0D3B | 0288 |
| 0000245640 | 0D51 | 028B | 0D56 | 028C | 0D61 | 028D | 0D7D | 028F |
| 0000245660 | 0D9C | 0291 | 0DB7 | 0292 | 0DC4 | 0294 | 0DC7 | 0295 |
| 0000245700 | 0DE1 | 0296 | 0DE4 | 0297 | 0DED | 0298 | 0DF3 | 0299 |
| 0000245720 | 0DF6 | 029A | 0DFC | 029E | 0E0A | 029F | 0E1A | 02A0 |
| 0000245740 | 0E2A | 02A1 | 0E35 | 02A2 | 0E3F | 02A3 | 0E57 | 02A4 |
| 0000245760 | 0E5D | 02A6 | 0E60 | 02A7 | 0E66 | 02AD | 0E71 | 02AE |
| 0000246000 | 0E81 | 02B8 | 0E86 | 02BC | 0E8B | 02BD | 0EB1 | 02BE |
| 0000246020 | 0EBA | 02C0 | 0EC0 | 02C1 | 0ED4 | 02C2 | 0EE0 | 02C4 |
| 0000246040 | 0EE6 | 02C6 | 0EEF | 02C7 | 0EF8 | 02C8 | 0F0D | 02C9 |
| 0000246060 | 0F16 | 02CA | 0F19 | 02CB | 0F38 | 02CC | 0F4D | 02CD |
| 0000246100 | 0F56 | 02CE | 0F59 | 02D0 | 0F7A | 02D1 | 0F83 | 02D3 |
| 0000246120 | 0F86 | 02D4 | 0F96 | 02D6 | 0FAF | 02D8 | 0FCA | 02D9 |
| 0000246140 | 0FE3 | 02DC | 100D | 02DD | 1022 | 02DE | 1025 | 02DF |
| 0000246160 | 102D | 02E0 | 1036 | 02E1 | 1039 | 02E2 | 1043 | 02E4 |
| 0000246200 | 1047 | 02E5 | 1050 | 02E6 | 1056 | 02EC | 1061 | 02EF |

THU MAR 14 17:27:10 1991 CRV_ONS.DLL PAGE 62, LINE 3600

| | | | | | | | | |
|---|---|---|---|---|---|---|---|---|
| 0000246220 | 1071 | 02F7 | 1076 | 02F8 | 107F | 02FA | 1085 | 02FB |
| 0000246240 | 1091 | 02FC | 1097 | 02FF | 109A | 0300 | 10C3 | 0302 |
| 0000246260 | 10D8 | 0304 | 10DE | 0305 | 10E4 | 0306 | 10EA | 0307 |
| 0000246300 | 10FB | 030A | 1101 | 030B | 1120 | 030C | 1129 | 030E |
| 0000246320 | 112F | 030F | 1139 | 0312 | 113F | 0319 | 114A | 031D |
| 0000246340 | 115A | 031E | 115E | 031F | 1164 | 0320 | 116F | 0321 |
| 0000246360 | 1181 | 0322 | 118A | 0323 | 1190 | 0324 | 11A8 | 0325 |
| 0000246400 | 11AE | 0326 | 11B1 | 0327 | 11B7 | 032D | 11C2 | 0331 |
| 0000246420 | 11D8 | 0333 | 11DC | 0334 | 11E4 | 0335 | 11EF | 0336 |
| 0000246440 | 1201 | 0338 | 120A | 0339 | 1219 | 033B | 121F | 033D |
| 0000246460 | 1237 | 033E | 1243 | 0340 | 1249 | 0341 | 124C | 0342 |
| 0000246500 | 1252 | 0348 | 1260 | 034C | 1276 | 034D | 127A | 034E |
| 0000246520 | 1280 | 034F | 128B | 0350 | 129D | 0352 | 12A6 | 0353 |
| 0000246540 | 12B5 | 0355 | 12BB | 0357 | 12D3 | 0358 | 12DF | 035A |
| 0000246560 | 12E5 | 035B | 12E8 | 035C | 12EE | 0360 | 12FC | 0363 |
| 0000246600 | 1312 | 0364 | 1330 | 0366 | 1339 | 0367 | 1348 | 0369 |
| 0000246620 | 134E | 036A | 1359 | 036B | 1363 | 036C | 137E | 036D |
| 0000246640 | 1384 | 036F | 1387 | 0370 | 1396 | 0372 | 139C | 0376 |
| 0000246660 | 13A8 | 0379 | 13BE | 037A | 13CA | 037B | 13E8 | 037C |
| 0000246700 | 13F1 | 037D | 13F7 | 037E | 13FD | 0382 | 1409 | 0383 |
| 0000246720 | 141F | 0384 | 1429 | 0388 | 1435 | 038B | 144B | 038C |
| 0000246740 | 144F | 038D | 145A | 038E | 146C | 0392 | 1478 | 0395 |
| 0000246760 | 148E | 0396 | 1492 | 0397 | 149D | 0398 | 14AF | 039C |
| 0000247000 | 14BB | 039F | 14D1 | 03A0 | 14D5 | 03A1 | 14E0 | 03A2 |
| 0000247020 | 14F2 | 03A6 | 14FE | 03A9 | 1514 | 03AA | 1518 | 03AB |
| 0000247040 | 1523 | 03AC | 1535 | 03B2 | 1541 | 03B8 | 1557 | 03B9 |
| 0000247060 | 1562 | 03BA | 157E | 03BB | 1587 | 03BD | 1596 | 03BE |
| 0000247100 | 15B5 | 03BF | 15BE | 03C1 | 15CD | 03C3 | 15E8 | 03C4 |
| 0000247120 | 15F5 | 03C5 | 15F8 | 03C7 | 1604 | 03C8 | 1607 | 03CA |
| 0000247140 | 1610 | 03CB | 161F | 03CE | 1625 | 03CF | 1629 | 03D0 |
| 0000247160 | 1634 | 03D1 | 1646 | 03D3 | 164F | 03D4 | 165E | 03D6 |
| 0000247200 | 1664 | 03D8 | 167C | 03D9 | 1688 | 03DB | 168E | 03DD |
| 0000247220 | 1691 | 03DE | 169F | 03E0 | 16A5 | 03E6 | 16B3 | 03EC |
| 0000247240 | 16C9 | 03ED | 16D4 | 03EE | 16F0 | 03F0 | 170F | 03F2 |
| 0000247260 | 172A | 03F3 | 1737 | 03F4 | 173A | 03F5 | 1749 | 03F6 |
| 0000247300 | 174C | 03F7 | 1755 | 03F9 | 175B | 03FA | 175F | 03FB |
| 0000247320 | 1765 | 03FC | 1770 | 03FD | 1782 | 03FE | 178B | 03FF |
| 0000247340 | 1791 | 0400 | 17A9 | 0401 | 17AF | 0402 | 17B2 | 0403 |
| 0000247360 | 17B8 | 0408 | 17C6 | 0409 | 17DC | 040A | 17E7 | 040B |
| 0000247400 | 17ED | 0410 | 17F9 | 0411 | 180F | 0412 | 1815 | 0418 |
| 0000247420 | 1821 | 0419 | 1837 | 041A | 183D | 041B | 1843 | 0422 |
| 0000247440 | 1851 | 0423 | 1867 | 0424 | 186D | 630A | 7672 | 735F |
| 0000247460 | 7475 | 2E69 | 0163 | 3100 | 3C00 | 7C00 | 3D18 | 9200 |
| 0000247500 | 3E18 | 9A00 | 5118 | A600 | 5318 | BC00 | 5418 | DB00 |
| 0000247520 | 5518 | E100 | 5618 | E700 | 5E18 | F300 | 6118 | 0300 |
| 0000247540 | 6219 | 0E00 | 6319 | 1900 | 6419 | 2400 | 6519 | 2F00 |
| 0000247560 | 6619 | 3A00 | 6719 | 4500 | 6819 | 5000 | 6A19 | 5B00 |
| 0000247600 | 6E19 | 6400 | 6F19 | 8000 | 7019 | 8B00 | 7119 | 9000 |
| 0000247620 | 7419 | 9600 | 7519 | A100 | 7819 | A400 | 7919 | AF00 |
| 0000247640 | 7C19 | B200 | 7D19 | BD00 | 8119 | C000 | 8219 | DD00 |
| 0000247660 | 8519 | E000 | 8819 | E300 | 8919 | EE00 | 8C19 | F100 |
| 0000247700 | 8D19 | FC00 | 9019 | FF00 | 9119 | 0B00 | 941A | 0E00 |
| 0000247720 | 951A | 1A00 | 981A | 1D00 | 991A | 2800 | 9C1A | 2B00 |
| 0000247740 | 9D1A | 3600 | A11A | 3900 | A21A | 4400 | A51A | 4700 |
| 0000247760 | A61A | 4A00 | A81A | 7700 | AA1A | 7A00 | 0A1A | 7263 |
| 0000250000 | 5F76 | 7573 | 7274 | 632E | 0001 | 002B | 0051 | 1A86 |
| 0000250020 | 0060 | 1A96 | 0062 | 1AA0 | 0064 | 1AAA | 0066 | 1AB3 |
| 0000250040 | 0067 | 1AD2 | 0068 | 1ADB | 006A | 1AE8 | 006B | 1AEB |
| 0000250060 | 006D | 1AF1 | 006E | 1B0A | 006F | 1B16 | 0071 | 1B26 |

THU MAR 14 17:27:10 1991 CRV_ONS.DLL PAGE 63, LINE 3659

| | | | | | | | | |
|---|---|---|---|---|---|---|---|---|
| 0000250100 | 0072 | 1B2F | 0074 | 1B38 | 0076 | 1B52 | 0077 | 1B6D |
| 0000250120 | 0079 | 1B73 | 007B | 1B76 | 007D | 1B7C | 007F | 1B86 |
| 0000250140 | 0080 | 1BA2 | 0081 | 1BA6 | 0083 | 1BAC | 0084 | 1BAF |
| 0000250160 | 0098 | 1BBA | 009A | 1BD0 | 009B | 1BEF | 009C | 1BF5 |
| 0000250200 | 009D | 1BFB | 00A4 | 1C07 | 00A5 | 1C17 | 00A6 | 1C20 |
| 0000250220 | 00A7 | 1C2D | 00AA | 1C33 | 00AC | 1C49 | 00AD | 1C54 |
| 0000250240 | 00AE | 1C5D | 00B0 | 1C6C | 00B1 | 1C6F | 00B8 | 1C7A |
| 0000250260 | 00B9 | 1C90 | 00BA | 1C98 | 6309 | 7672 | 735F | 6B66 |
| 0000250300 | 632E | 0001 | 00A8 | 007C | 1CA4 | 0081 | 1CB4 | 0082 |
| 0000250320 | 1CC8 | 0083 | 1CDA | 0084 | 1CE7 | 0085 | 1CFD | 0086 |
| 0000250340 | 1D13 | 0087 | 1D1C | 0088 | 1D25 | 0089 | 1D3E | 008B |
| 0000250360 | 1D4E | 008C | 1D5D | 008E | 1D60 | 008F | 1D6F | 0091 |
| 0000250400 | 1D72 | 0092 | 1D81 | 0094 | 1D84 | 0095 | 1D87 | 0096 |
| 0000250420 | 1DA1 | 0097 | 1DA4 | 0098 | 1DA8 | 0099 | 1DAC | 009A |
| 0000250440 | 1DAF | 009B | 1DB5 | 00B1 | 1DC0 | 00B6 | 1DD0 | 00B8 |
| 0000250460 | 1DDA | 00B9 | 1DF6 | 00BA | 1E08 | 00BB | 1E15 | 00BC |
| 0000250500 | 1E2C | 00BD | 1E4E | 00BE | 1E5C | 00BF | 1E6A | 00C0 |
| 0000250520 | 1E6D | 00C1 | 1E73 | 00D5 | 1E7E | 00DA | 1E8E | 00DB |
| 0000250540 | 1EA4 | 00DF | 1EA9 | 00E0 | 1ED7 | 00E2 | 1EF0 | 00E3 |
| 0000250560 | 1F16 | 00E4 | 1F1B | 00E5 | 1F1E | 00E6 | 1F27 | 00E7 |
| 0000250600 | 1F3E | 00E8 | 1F6A | 00E9 | 1F6E | 00EC | 1F71 | 00ED |
| 0000250620 | 1F74 | 00EF | 1F83 | 00F0 | 1FA0 | 00F1 | 1FB2 | 00F2 |
| 0000250640 | 1FB8 | 0101 | 1FC3 | 0102 | 1FD3 | 0103 | 1FE3 | 0104 |
| 0000250660 | 1FE9 | 011F | 1FF4 | 0121 | 2004 | 0122 | 2009 | 0124 |
| 0000250700 | 200E | 0127 | 2019 | 012A | 201C | 012B | 2026 | 012C |
| 0000250720 | 202D | 012D | 2032 | 012F | 2035 | 0132 | 204B | 0135 |
| 0000250740 | 209C | 0137 | 20A8 | 0138 | 20C4 | 0139 | 20C9 | 013A |
| 0000250760 | 20CC | 013B | 20CF | 013C | 20D6 | 013D | 20E5 | 013F |
| 0000251000 | 20EA | 0141 | 20ED | 0144 | 2105 | 0145 | 2113 | 0146 |
| 0000251020 | 2121 | 0149 | 2124 | 014A | 2132 | 014B | 2140 | 014C |
| 0000251040 | 2145 | 014F | 214A | 0150 | 214D | 0151 | 216E | 0152 |
| 0000251060 | 2177 | 0154 | 217D | 0155 | 218B | 0156 | 2197 | 0157 |
| 0000251100 | 21A3 | 0158 | 21B8 | 015A | 21BB | 015B | 21C5 | 015C |
| 0000251120 | 21CF | 015D | 21E4 | 015E | 21FA | 0160 | 21FD | 0161 |
| 0000251140 | 2205 | 0162 | 2218 | 0163 | 222B | 0164 | 2232 | 0165 |
| 0000251160 | 2237 | 0166 | 223C | 0167 | 223F | 0168 | 2257 | 0169 |
| 0000251200 | 225D | 017A | 2268 | 017B | 2278 | 017C | 2299 | 017D |
| 0000251220 | 229E | 0192 | 22A9 | 0193 | 22B9 | 0195 | 22C3 | 0196 |
| 0000251240 | 22E3 | 0198 | 22E8 | 0199 | 22EB | 019A | 22F1 | 01AD |
| 0000251260 | 22FC | 01B0 | 230C | 01B1 | 2312 | 01B2 | 2318 | 01B4 |
| 0000251300 | 231E | 01B5 | 2334 | 01B6 | 2342 | 01B7 | 2350 | 01B8 |
| 0000251320 | 2353 | 01BE | 235E | 01BF | 236E | 01C0 | 2378 | 01C1 |
| 0000251340 | 237E | 01C2 | 2381 | 01C3 | 2385 | 01C4 | 2389 | 01C9 |
| 0000251360 | 2394 | 01CA | 23A4 | 01CB | 23AE | 01CC | 23B4 | 01CD |
| 0000251400 | 23B7 | 01CE | 23BB | 01CF | 23BF | 01E2 | 23CA | 01E3 |
| 0000251420 | 23E0 | 01E4 | 23E5 | 01F9 | 23F1 | 01FD | 2407 | 01FE |
| 0000251440 | 2415 | 01FF | 241F | 0203 | 2422 | 0204 | 2428 | 0205 |
| 0000251460 | 242D | 0206 | 2433 | 0207 | 2438 | 0208 | 243E | 0209 |
| 0000251500 | 2443 | 020B | 2448 | 020C | 244D | 020D | 2451 | 020E |
| 0000251520 | 2456 | 020F | 245A | 0210 | 245F | 0211 | 2464 | 0213 |
| 0000251540 | 2469 | 0215 | 2479 | 6309 | 7672 | 685F | 746F | 632E |
| 0000251560 | 0001 | 0056 | 005F | 2486 | 0063 | 2496 | 0064 | 24AA |
| 0000251600 | 0065 | 24B6 | 0066 | 24BC | 0067 | 24C9 | 0069 | 24DF |
| 0000251620 | 006A | 24F5 | 006B | 24FE | 006C | 2502 | 006D | 2506 |
| 0000251640 | 006E | 2509 | 006F | 250F | 0084 | 251A | 0089 | 252A |
| 0000251660 | 008B | 2533 | 008C | 254F | 008D | 255B | 008E | 2561 |
| 0000251700 | 008F | 256E | 0091 | 2585 | 0092 | 25A7 | 0093 | 25B5 |
| 0000251720 | 0094 | 25B8 | 0095 | 25BE | 00A8 | 25C9 | 00AD | 25D9 |
| 0000251740 | 00AF | 25F0 | 00B0 | 25F5 | 00B2 | 260B | 00B5 | 2624 |

THU MAR 14 17:27:10 1991 CRV_ONS.DLL PAGE 64, LINE 3718

| | | | | | | | | |
|---|---|---|---|---|---|---|---|---|
| 0000251760 | 00B6 | 2648 | 00B7 | 264D | 00B8 | 2650 | 00BA | 2659 |
| 0000252000 | 00BB | 2671 | 00BC | 269D | 00BD | 26A1 | 00C0 | 26A4 |
| 0000252020 | 00C1 | 26A7 | 00C2 | 26B0 | 00C4 | 26B6 | 00C5 | 26D3 |
| 0000252040 | 00C6 | 26DF | 00C7 | 26E5 | 00C8 | 26EB | 00D7 | 26F6 |
| 0000252060 | 00D8 | 2706 | 00D9 | 2716 | 00DA | 271C | 00F0 | 2727 |
| 0000252100 | 00F2 | 273D | 00F4 | 2742 | 00F9 | 274C | 0100 | 2763 |
| 0000252120 | 0103 | 27B1 | 0105 | 27BD | 0107 | 27D9 | 0108 | 27DE |
| 0000252140 | 0109 | 27F5 | 010A | 2806 | 010D | 2809 | 0112 | 280C |
| 0000252160 | 0115 | 283C | 0116 | 284A | 0119 | 284D | 011B | 285B |
| 0000252200 | 011C | 285E | 011D | 2873 | 011E | 2879 | 012F | 2887 |
| 0000252220 | 0132 | 289D | 0133 | 28B4 | 0134 | 28C5 | 0148 | 28D1 |
| 0000252240 | 014C | 28E7 | 014D | 28F5 | 014E | 28FF | 0152 | 2902 |
| 0000252260 | 0153 | 2908 | 0154 | 290D | 0155 | 2913 | 0156 | 2917 |
| 0000252300 | 0158 | 291C | 0159 | 292C | 015A | 292F | 630A | 7672 |
| 0000252320 | 6B5F | 7965 | 2E73 | 0163 | 7600 | 6500 | 3C00 | 6629 |
| 0000252340 | 4C00 | 6829 | DE00 | 6929 | E300 | 6A29 | EB00 | 7029 |
| 0000252360 | F000 | 7129 | 0B00 | 722A | 1400 | 762A | 1D00 | 772A |
| 0000252400 | 3900 | 7B2A | 3C00 | 7F2A | 5800 | 802A | 6500 | 812A |
| 0000252420 | 6E00 | 872A | EC00 | 892A | 0300 | 8A2B | 1100 | 8C2B |
| 0000252440 | 8F00 | 9F2B | 9A00 | A02B | AA00 | A22B | 3D00 | A32C |
| 0000252460 | 4500 | AA2C | 4D00 | AE2C | 5200 | AF2C | 5B00 | B02C |
| 0000252500 | 6E00 | B12C | 7900 | B32C | 7E00 | B42C | 8100 | B52C |
| 0000252520 | 9400 | B62C | 9F00 | B82C | A400 | B92C | AD00 | BE2C |
| 0000252540 | 2B00 | BF2D | 4100 | C12D | 5700 | C32D | 6000 | C42D |
| 0000252560 | 7A00 | C52D | 8300 | C62D | 8800 | C92D | 8B00 | CB2D |
| 0000252600 | A400 | CD2D | B100 | D02D | BE00 | D22D | DA00 | D42D |
| 0000252620 | E700 | D72D | F400 | D82D | F700 | D92D | FC00 | DC2D |
| 0000252640 | FF00 | DD2D | 1700 | DE2E | 1D00 | DF2E | 2900 | E02E |
| 0000252660 | 2C00 | E12E | 2F00 | E22E | 3400 | EB2E | 3700 | EC2E |
| 0000252700 | 4000 | ED2E | 4C00 | EE2E | 4F00 | F22E | 5B00 | F42E |
| 0000252720 | 6000 | F72E | 6C00 | F82E | 8B00 | F92E | 9400 | FA2E |
| 0000252740 | 9900 | FF2E | 9C00 | 002E | B401 | 042E | C701 | 052E |
| 0000252760 | D001 | 062E | E801 | 072E | F401 | 082E | FB01 | 092E |
| 0000253000 | FE01 | 0C2E | 0101 | 0D2F | 1901 | 0E2F | 2501 | 0F2F |
| 0000253020 | 2801 | 102F | 2B01 | 112F | 3701 | 172F | 3A01 | 182F |
| 0000253040 | 5301 | 192F | 5801 | 1A2F | 7401 | 1B2F | 7901 | 1C2F |
| 0000253060 | 9501 | 1D2F | 9A01 | 1E2F | 9D01 | 1F2F | A201 | 222F |
| 0000253100 | A501 | 242F | AE01 | 252F | C401 | 262F | DA01 | 282F |
| 0000253120 | E401 | 2A2F | E701 | 2B2F | FD01 | 2C2F | 1301 | 2F30 |
| 0000253140 | 1D01 | 3130 | 2001 | 3330 | 2301 | 3430 | 2C01 | 3530 |
| 0000253160 | 3C01 | 3730 | 4101 | 3830 | 4401 | 3930 | 5401 | 3C30 |
| 0000253200 | 5901 | 3D30 | 6201 | 4030 | 6501 | 4530 | 6801 | 4630 |
| 0000253220 | 7101 | 4730 | 7A01 | 4830 | 8B01 | 4A30 | 9901 | 4B30 |
| 0000253240 | 9C01 | 4C30 | A501 | 4D30 | B601 | 5130 | C401 | 5430 |
| 0000253260 | 4101 | 0031 | 6C0C | 696C | 6362 | 6C64 | 2E6C | 696C |
| 0000253300 | 0762 | 736F | 2E32 | 696C | 0A62 | 626C | 7069 | 746D |
| 0000253320 | 6C2E | 6269 | 630B | 7672 | 735F | 6974 | 6C2E | 6269 |
| 0000253340 | 6409 | 5F62 | 6970 | 6C2E | 6269 | 00A7 | 0101 | 0001 |
| 0000253360 | 0008 | 0000 | 001F | 0102 | 0001 | 06F2 | 0000 | 00FB |
| 0000253400 | 0103 | 0001 | 1727 | 0000 | 1025 | 0104 | 0001 | BC99 |
| 0000253420 | 0000 | 010C | 0101 | 0002 | 0027 | 0000 | 001F | 0102 |
| 0000253440 | 0002 | 07ED | 0000 | 026A | 0103 | 0002 | 274C | 0000 |
| 0000253460 | 2862 | 0104 | 0002 | BDA5 | 0000 | 0AEA | 0109 | 0002 |
| 0000253500 | D529 | 0000 | 07FA | 0101 | 0003 | 0046 | 0000 | 0020 |
| 0000253520 | 0102 | 0003 | 0A57 | 0000 | 0037 | 0103 | 0003 | 4FAE |
| 0000253540 | 0000 | 1177 | 0104 | 0003 | C88F | 0000 | 01BA | 0109 |
| 0000253560 | 0003 | DD23 | 0000 | 00D3 | 0101 | 0004 | 0066 | 0000 |
| 0000253600 | 0020 | 0102 | 0004 | 0A8E | 0000 | 0070 | 0103 | 0004 |
| 0000253620 | 6125 | 0000 | 133E | 0104 | 0004 | CA49 | 0000 | 0224 |

THU MAR 14 17:27:10 1991 CRV_ONS.DLL PAGE 65, LINE 3777

| | | | | | | | | |
|---|---|---|---|---|---|---|---|---|
| 0000253640 | 0109 | 0004 | DDF6 | 0000 | 00BB | 0101 | 0005 | 0086 |
| 0000253660 | 0000 | 001F | 0102 | 0005 | 0AFE | 0000 | 00E5 | 0103 |
| 0000253700 | 0005 | 7463 | 0000 | 17FB | 0104 | 0005 | CC6D | 0000 |
| 0000253720 | 03BC | 0109 | 0005 | DEB1 | 0000 | 02AE | 0101 | 0006 |
| 0000253740 | 00A5 | 0000 | 001F | 0102 | 0006 | 0BE3 | 0000 | 00D7 |
| 0000253760 | 0103 | 0006 | 8C5E | 0000 | 20D8 | 0104 | 0006 | D029 |
| 0000254000 | 0000 | 0274 | 0109 | 0006 | E15F | 0000 | 0166 | 0101 |
| 0000254020 | 0007 | 00C4 | 0000 | 0020 | 0102 | 0007 | 0CBA | 0000 |
| 0000254040 | 0015 | 0103 | 0007 | AD36 | 0000 | 0F63 | 0104 | 0007 |
| 0000254060 | D29D | 0000 | 028C | 0109 | 0007 | E2C5 | 0000 | 01E7 |
| 0000254100 | 0101 | 0008 | 00E4 | 0000 | 0018 | 0102 | 0008 | 0CCF |
| 0000254120 | 0000 | 0152 | 0101 | 0009 | 00FC | 0000 | 001B | 0102 |
| 0000254140 | 0009 | 0E21 | 0000 | 01D2 | 0101 | 000A | 0117 | 0000 |
| 0000254160 | 001C | 0102 | 000A | 0FF3 | 0000 | 0035 | 0101 | 000B |
| 0000254200 | 0133 | 0000 | 0017 | 0102 | 000B | 1028 | 0000 | 000F |
| 0000254220 | 0101 | 000C | 014A | 0000 | 0017 | 0102 | 000C | 1037 |
| 0000254240 | 0000 | 0033 | 0101 | 000D | 0161 | 0000 | 001A | 0102 |
| 0000254260 | 000D | 106A | 0000 | 0010 | 0101 | 000E | 017B | 0000 |
| 0000254300 | 001C | 0102 | 000E | 107A | 0000 | 0025 | 0101 | 000F |
| 0000254320 | 0197 | 0000 | 001B | 0102 | 000F | 109F | 0000 | 003F |
| 0000254340 | 0101 | 0010 | 01B2 | 0000 | 0015 | 0102 | 0010 | 10DE |
| 0000254360 | 0000 | 0020 | 0101 | 0011 | 01C7 | 0000 | 0014 | 0102 |
| 0000254400 | 0011 | 10FE | 0000 | 001C | 0101 | 0012 | 01DB | 0000 |
| 0000254420 | 0015 | 0102 | 0012 | 111A | 0000 | 000E | 0101 | 0013 |
| 0000254440 | 01F0 | 0000 | 0018 | 0102 | 0013 | 1128 | 0000 | 000F |
| 0000254460 | 0101 | 0014 | 0208 | 0000 | 0014 | 0102 | 0014 | 1137 |
| 0000254500 | 0000 | 0037 | 0101 | 0015 | 021C | 0000 | 0018 | 0102 |
| 0000254520 | 0015 | 116E | 0000 | 000F | 0101 | 0016 | 0234 | 0000 |
| 0000254540 | 0018 | 0102 | 0016 | 117D | 0000 | 000F | 0101 | 0017 |
| 0000254560 | 024C | 0000 | 0019 | 0102 | 0017 | 118C | 0000 | 0010 |
| 0000254600 | 0101 | 0018 | 0265 | 0000 | 0018 | 0102 | 0018 | 119C |
| 0000254620 | 0000 | 000F | 0101 | 0019 | 027D | 0000 | 0014 | 0102 |
| 0000254640 | 0019 | 11AB | 0000 | 0011 | 0101 | 001A | 0291 | 0000 |
| 0000254660 | 0018 | 0102 | 001A | 11BC | 0000 | 001C | 0101 | 001B |
| 0000254700 | 02A9 | 0000 | 0015 | 0102 | 001B | 11D8 | 0000 | 0030 |
| 0000254720 | 0101 | 001C | 02BE | 0000 | 0014 | 0102 | 001C | 1208 |
| 0000254740 | 0000 | 000E | 0101 | 001D | 02D2 | 0000 | 0017 | 0102 |
| 0000254760 | 001D | 1216 | 0000 | 000F | 0101 | 001E | 02E9 | 0000 |
| 0000255000 | 0015 | 0102 | 001E | 1225 | 0000 | 0012 | 0101 | 001F |
| 0000255020 | 02FE | 0000 | 0015 | 0102 | 001F | 1237 | 0000 | 0020 |
| 0000255040 | 0101 | 0020 | 0313 | 0000 | 001A | 0102 | 0020 | 1257 |
| 0000255060 | 0000 | 000D | 0101 | 0021 | 032D | 0000 | 001A | 0102 |
| 0000255100 | 0021 | 1264 | 0000 | 001E | 0101 | 0022 | 0347 | 0000 |
| 0000255120 | 0019 | 0102 | 0022 | 1282 | 0000 | 0031 | 0101 | 0023 |
| 0000255140 | 0360 | 0006 | 0019 | 0102 | 0023 | 12B3 | 0000 | 000C |
| 0000255160 | 0101 | 0024 | 0379 | 0000 | 0016 | 0102 | 0024 | 12BF |
| 0000255200 | 0000 | 001E | 0101 | 0025 | 038F | 0000 | 0018 | 0102 |
| 0000255220 | 0025 | 12DD | 0000 | 001D | 0101 | 0026 | 03A7 | 0000 |
| 0000255240 | 0017 | 0102 | 0026 | 12FA | 0000 | 001F | 0101 | 0027 |
| 0000255260 | 03BE | 0000 | 0015 | 0102 | 0027 | 1319 | 0000 | 001B |
| 0000255300 | 0101 | 0028 | 03D3 | 0000 | 0018 | 0102 | 0028 | 1334 |
| 0000255320 | 0000 | 0042 | 0101 | 0029 | 03EB | 0000 | 0016 | 0102 |
| 0000255340 | 0029 | 1376 | 0000 | 000E | 0101 | 002A | 0401 | 0000 |
| 0000255360 | 0018 | 0102 | 002A | 1384 | 0000 | 0010 | 0101 | 002B |
| 0000255400 | 0419 | 0000 | 0018 | 0102 | 002B | 1394 | 0000 | 0010 |
| 0000255420 | 0101 | 002C | 0431 | 0000 | 0019 | 0102 | 002C | 13A4 |
| 0000255440 | 0000 | 0012 | 0101 | 002D | 044A | 0000 | 0018 | 0102 |
| 0000255460 | 002D | 13B6 | 0000 | 0041 | 0101 | 002E | 0462 | 0000 |
| 0000255500 | 0017 | 0102 | 002E | 13F7 | 0000 | 000F | 0101 | 002F |

THU MAR 14 17:27:10 1991 CRV_ONS.DLL PAGE 66, LINE 3836

| | | | | | | | | |
|---|---|---|---|---|---|---|---|---|
| 0000255520 | 0479 | 0000 | 0017 | 0102 | 002F | 1406 | 0000 | 000E |
| 0000255540 | 0101 | 0030 | 0490 | 0000 | 0017 | 0102 | 0030 | 1414 |
| 0000255560 | 0000 | 000E | 0101 | 0031 | 04A7 | 0000 | 0017 | 0102 |
| 0000255600 | 0031 | 1422 | 0000 | 000E | 0101 | 0032 | 04BE | 0000 |
| 0000255620 | 0017 | 0102 | 0032 | 1430 | 0000 | 000E | 0101 | 0033 |
| 0000255640 | 04D5 | 0000 | 0018 | 0102 | 0033 | 143E | 0000 | 000F |
| 0000255660 | 0101 | 0034 | 04ED | 0000 | 0015 | 0102 | 0034 | 144D |
| 0000255700 | 0000 | 000C | 0101 | 0035 | 0502 | 0000 | 0019 | 0102 |
| 0000255720 | 0035 | 1459 | 0000 | 0056 | 0101 | 0036 | 051B | 0000 |
| 0000255740 | 0016 | 0102 | 0036 | 14AF | 0000 | 001D | 0101 | 0037 |
| 0000255760 | 0531 | 0000 | 0015 | 0102 | 0037 | 14CC | 0000 | 000E |
| 0000256000 | 01G1 | 0039 | 0546 | 0000 | 001A | 0102 | 0039 | 14DA |
| 0000256020 | 0000 | 00AB | 0101 | 003A | 0560 | 0000 | 001B | 0102 |
| 0000256040 | 003A | 1585 | 0000 | 0026 | 0101 | 003B | 057B | 0000 |
| 0000256060 | 001D | 0102 | 003B | 15AB | 0000 | 0024 | 0101 | 003C |
| 0000256100 | 0598 | 0000 | 0015 | 0102 | 003C | 15CF | 0000 | 000E |
| 0000256120 | 0101 | 003D | 05AD | 0000 | 0019 | 0102 | 003D | 15DD |
| 0000256140 | 0000 | 0025 | 0101 | 003E | 05C6 | 0000 | 0018 | 0102 |
| 0000256160 | 003E | 1602 | 0000 | 0021 | 0101 | 003F | 05DE | 0000 |
| 0000256200 | 0017 | 0102 | 003F | 1623 | 0000 | 000F | 0101 | 0040 |
| 0000256220 | 05F5 | 0000 | 0017 | 0102 | 0040 | 1632 | 0000 | 000E |
| 0000256240 | 0101 | 0041 | 060C | 0000 | 0018 | 0102 | 0041 | 1640 |
| 0000256260 | 0000 | 0010 | 0101 | 0042 | 0624 | 0000 | 0018 | 0102 |
| 0000256300 | 0042 | 1650 | 0000 | 001E | 0101 | 0043 | 063C | 0000 |
| 0000256320 | 0018 | 0102 | 0043 | 166E | 0000 | 000E | 0101 | 0044 |
| 0000256340 | 0654 | 0000 | 0018 | 0102 | 0044 | 167C | 0000 | 000E |
| 0000256360 | 0101 | 0045 | 066C | 0000 | 0015 | 0102 | 0045 | 168A |
| 0000256400 | 0000 | 001F | 0101 | 0046 | 0681 | 0000 | 001B | 0102 |
| 0000256420 | 0046 | 16A9 | 0000 | 001C | 0101 | 0047 | 069C | 0000 |
| 0000256440 | 0016 | 0102 | 0047 | 16C5 | 0000 | 0023 | 0101 | 0048 |
| 0000256460 | 06B2 | 0000 | 0016 | 0102 | 0048 | 16E8 | 0000 | 0011 |
| 0000256500 | 0101 | 0049 | 06C8 | 0000 | 0015 | 0102 | 0049 | 16F9 |
| 0000256520 | 0000 | 001F | 0101 | 004A | 06DD | 0000 | 0015 | 0102 |
| 0000256540 | 004A | 1718 | 0000 | 000F | 0106 | 0000 | E4AC | 0000 |
| 0000256560 | 0037 | 424E | 3230 | EB73 | 0000 | | | |
| 0000256572 | | | | | | | | |

THU MAR 14 17:27:50 1991 CRV_STI.DLL PAGE 1, LINE 1

| | | | | | | | | |
|---|---|---|---|---|---|---|---|---|
| 0000000000 | 5A4D | 002F | 002D | 0000 | 0004 | 0000 | FFFF | 0000 |
| 0000000020 | 00B6 | 0000 | 0000 | 0000 | 0040 | 0000 | 0000 | 0000 |
| 0000000040 | 0000 | 0000 | 0000 | 0000 | 0000 | 0000 | 0000 | 0000 |
| 0000000060 | 0000 | 0000 | 0000 | 0000 | 0000 | 0000 | 0080 | 0000 |
| 0000000100 | 1F0E | 0EBA | B400 | CD09 | B821 | 4C01 | 21CD | 6854 |
| 0000000120 | 7369 | 7020 | 6F72 | 7267 | 6D61 | 6320 | 6E61 | 6F6E |
| 0000000140 | 2074 | 7572 | 206E | 6E69 | 4420 | 534F | 6D20 | 646F |
| 0000000160 | 2E65 | 0D0D | 240A | 0000 | 0000 | 0000 | 0000 | 0000 |
| 0000000200 | 454E | 0A05 | 0400 | 006A | A0C5 | 85CE | 8006 | 0005 |
| 0000000220 | 0000 | 0000 | 3060 | 0001 | 0000 | 0000 | 0005 | 0005 |
| 0000000240 | 000F | 0040 | 0068 | 0068 | 0353 | 035D | 04EA | 0000 |
| 0000000260 | 0000 | 0004 | 0000 | 0001 | 0000 | 0000 | 0000 | 0000 |
| 0000000300 | 0050 | 4626 | 0D00 | 4626 | 04C9 | 00C6 | 0C01 | 0100 |
| 0000000320 | 0000 | 0000 | 0C01 | 0850 | 0000 | 0000 | 0C01 | 020C |
| 0000000340 | 04D6 | 0AA5 | 0D01 | 2680 | 6307 | 7672 | 735F | 6974 |
| 0000000360 | 0000 | 530A | 464F | 5F54 | 4241 | 524F | 0154 | 1200 |
| 0000000400 | 4F53 | 5446 | 455F | 4556 | 544E | 505F | 494F | 544E |
| 0000000420 | 5245 | 0002 | 4312 | 5652 | 415F | 4444 | 545F | 4345 |
| 0000000440 | 5F48 | 5645 | 4E45 | 0354 | 1100 | 5243 | 5F56 | 4552 |
| 0000000460 | 5053 | 535F | 5548 | 4454 | 574F | 044E | 1100 | 4F53 |
| 0000000500 | 5446 | 525F | 4145 | 5F44 | 4553 | 5F4D | 5450 | 0552 |
| 0000000520 | 1500 | 5243 | 5F56 | 5243 | 4145 | 4554 | 4D5F | 564F |
| 0000000540 | 5F45 | 5254 | 4341 | 064B | 1400 | 4F53 | 5446 | 435F |
| 0000000560 | 4F4C | 4553 | 445F | 4649 | 5F46 | 4554 | 5453 | 0007 |
| 0000000600 | 4315 | 5652 | 435F | 4552 | 5441 | 5F45 | 5953 | 434E |
| 0000000620 | 455F | 4556 | 544E | 0008 | 4319 | 5652 | 535F | 4E45 |
| 0000000640 | 5F44 | 4349 | 4E4F | 4C5F | 4145 | 4E52 | 455F | 444E |
| 0000000660 | 4445 | 0009 | 5318 | 464F | 5F54 | 4552 | 4441 | 545F |
| 0000000700 | 5F4F | 5243 | 5F56 | 4553 | 5F4D | 5450 | 0A52 | 1600 |
| 0000000720 | 5243 | 5F56 | 4553 | 444E | 535F | 464F | 4B54 | 5945 |
| 0000000740 | 455F | 4556 | 544E | 000B | 4314 | 5652 | 525F | 5345 |
| 0000000760 | 5F50 | 4554 | 4843 | 435F | 4552 | 5441 | 0C45 | 1500 |
| 0000001000 | 5243 | 5F56 | 5243 | 4145 | 4554 | 495F | 494E | 5F54 |
| 0000001020 | 5254 | 4341 | 0D4B | 1600 | 5243 | 5F56 | 4552 | 5053 |
| 0000001040 | 435F | 5041 | 5554 | 4552 | 455F | 4556 | 544E | 000E |
| 0000001060 | 5313 | 464F | 5F54 | 504F | 4E45 | 445F | 4649 | 5F46 |
| 0000001100 | 4554 | 5453 | 000F | 4310 | 5652 | 535F | 4E45 | 5F44 |
| 0000001120 | 5245 | 5F52 | 534D | 1047 | 1300 | 4F53 | 5446 | 545F |
| 0000001140 | 5248 | 4145 | 5F44 | 4553 | 5F4D | 5450 | 1152 | 0D00 |
| 0000001160 | 5243 | 5F56 | 4553 | 444E | 495F | 494E | 1254 | 1400 |
| 0000001200 | 5243 | 5F56 | 504F | 4E45 | 535F | 464F | 5F54 | 4854 |
| 0000001220 | 4552 | 4441 | 0013 | 4313 | 5652 | 535F | 4E45 | 5F44 |
| 0000001240 | 4946 | 544C | 5245 | 445F | 4645 | 0014 | 4315 | 5652 |
| 0000001260 | 435F | 4552 | 5441 | 5F45 | 5254 | 4341 | 5F4B | 5953 |
| 0000001300 | 434E | 0015 | 4314 | 5652 | 435F | 4552 | 5441 | 5F45 |
| 0000001320 | 4E45 | 5F44 | 5254 | 4341 | 164B | 0E00 | 4F53 | 5446 |
| 0000001340 | 4F5F | 4550 | 5F4E | 4554 | 5453 | 0017 | 4313 | 5652 |
| 0000001360 | 525F | 5345 | 5F50 | 424B | 5F44 | 5453 | 5441 | 5355 |
| 0000001400 | 0018 | 4315 | 5652 | 525F | 5345 | 5F50 | 4556 | 4952 |
| 0000001420 | 5946 | 455F | 4556 | 544E | 0019 | 4312 | 5652 | 435F |
| 0000001440 | 4F4C | 4553 | 445F | 5F42 | 5254 | 4341 | 1A4B | 0D00 |
| 0000001460 | 5243 | 5F56 | 4552 | 5053 | 495F | 494E | 1B54 | 1400 |
| 0000001500 | 4E49 | 5449 | 475F | 4F4C | 4142 | 5F4C | 5453 | 5F49 |
| 0000001520 | 4144 | 4154 | 001C | 4312 | 5652 | 535F | 4E45 | 5F44 |
| 0000001540 | 454B | 5F59 | 5645 | 4E45 | 1D54 | 1100 | 5243 | 5F56 |
| 0000001560 | 4553 | 444E | 495F | 4F43 | 5F4E | 534D | 1E47 | 0F00 |
| 0000001600 | 4F53 | 5446 | 435F | 4F4C | 4553 | 545F | 5345 | 1F54 |
| 0000001620 | 1200 | 5243 | 5F56 | 4552 | 5053 | 475F | 4E45 | 455F |
| 0000001640 | 4556 | 544E | 0020 | 4312 | 5652 | 525F | 5345 | 5F50 |

THU MAR 14 17:27:50 1991 CRV_STI.DLL PAGE 2, LINE 60

| | | | | | | | | |
|---|---|---|---|---|---|---|---|---|
| 0000001660 | 454B | 5F59 | 5645 | 4E45 | 2154 | 1400 | 5243 | 5F56 |
| 0000001700 | 4552 | 5053 | 4C5F | 434F | 5441 | 524F | 505F | 534F |
| 0000001720 | 0022 | 0100 | 0A00 | 1300 | 9A00 | A000 | 0000 | 4408 |
| 0000001740 | 534F | 4143 | 4C4C | 0853 | 414E | 504D | 5049 | 5345 |
| 0000001760 | 6C06 | 6962 | 6D70 | 0D74 | 425F | 5F58 | 4544 | 5542 |
| 0000002000 | 4D47 | 444F | 0D45 | 425F | 5F58 | 4954 | 454D | 4D53 |
| 0000002020 | 444F | 0945 | 425F | 5F58 | 5F42 | 4953 | 0E47 | 425F |
| 0000002040 | 5F58 | 4544 | 5542 | 4547 | 544E | 5245 | 5F0F | 5842 |
| 0000002060 | 445F | 4245 | 4755 | 4552 | 5554 | 4E52 | 5F0E | 5842 |
| 0000002100 | 565F | 494F | 5244 | 5445 | 5255 | 0E4E | 425F | 5F58 |
| 0000002120 | 4544 | 5542 | 5047 | 4952 | 544E | 5F0D | 5842 | 445F |
| 0000002140 | 4245 | 4755 | 5250 | 4649 | 5F0E | 5842 | 505F | 4341 |
| 0000002160 | 464B | 4C49 | 4554 | 0552 | 4244 | 505F | 0249 | 4849 |
| 0000002200 | 0122 | BE01 | 0117 | 1792 | D001 | 012E | 28BF | 6801 |
| 0000002220 | 0117 | 1C08 | 2B01 | 0118 | 1ECC | E801 | 0123 | 173E |
| 0000002240 | 7201 | 0121 | 2E08 | 7001 | 011B | 2B82 | A701 | 0118 |
| 0000002260 | 248C | 3A01 | 0100 | 18DE | 6601 | 0107 | 224E | C901 |
| 0000002300 | 011D | 1E36 | 7001 | 0118 | 2A81 | 4901 | 012C | 1E9C |
| 0000002320 | F201 | 0127 | 0000 | 0401 | 0120 | 22F7 | E601 | 0117 |
| 0000002340 | 2911 | 5701 | 012D | 2AF9 | 0000 | 630B | 7672 | 735F |
| 0000002360 | 6974 | 4420 | 4C4C | 0000 | 0000 | 0000 | 0000 | 0000 |
| 0000002400 | 581E | 4590 | 8B55 | 1EEC | D88E | EC81 | 0000 | 5657 |
| 0000002420 | B81E | FFFF | D88E | 068E | 094C | C02B | A326 | 0202 |
| 0000002440 | A326 | 0200 | C02B | A326 | 0206 | A326 | 0204 | 5E1F |
| 0000002460 | 835F | 02ED | E58B | 5D1F | CB4D | 581E | 4590 | 8B55 |
| 0000002500 | 1EEC | D88E | EC81 | 0000 | 5657 | B81E | 0012 | D88E |
| 0000002520 | 60B8 | 8C0B | E9DA | 0000 | 5E1F | 835F | 02ED | E58B |
| 0000002540 | 5D1F | CB4D | 581E | 4590 | 8B55 | 1EEC | D88E | EC81 |
| 0000002560 | 0026 | 5657 | 46C7 | 74FA | 8C00 | FC5E | 46C7 | 00F4 |
| 0000002600 | 2B00 | 89C0 | E446 | 4689 | 8EE2 | 4E06 | 2609 | 3E83 |
| 0000002620 | FFFF | 7500 | E903 | 001D | 36FF | 005A | 36FF | 0058 |
| 0000002640 | 468D | 16DA | 9A50 | FFFF | 0000 | C483 | 3D08 | 0000 |
| 0000002660 | 0374 | 0FE9 | 8E00 | 5006 | 2609 | 3E83 | FFFF | 7500 |
| 0000002700 | E903 | 003B | 681E | 0078 | 468D | 16E6 | 8D50 | DA46 |
| 0000002720 | 5016 | 468D | 16F6 | 6850 | 00CF | 681E | 00B0 | 36FF |
| 0000002740 | 0056 | 36FF | 0054 | 36FF | 005A | 36FF | 0058 | FF9A |
| 0000002760 | 00FF | 8300 | 1EC4 | 4689 | 89F6 | F856 | 08E9 | 2B00 |
| 0000003000 | 89C0 | F846 | 4689 | 83F6 | 703E | 0000 | 0375 | 95E9 |
| 0000003020 | 1E00 | 6C68 | 9A00 | FFFF | 0000 | 068E | 094E | 8326 |
| 0000003040 | 903E | 0000 | 0375 | 45E9 | 8300 | DE7E | 75FE | E903 |
| 0000003060 | 003C | 681E | 007C | 468D | 16E6 | 8D50 | F646 | 5016 |
| 0000003100 | 468D | 16DA | 1E50 | B068 | 6800 | 00D6 | 36FF | 0056 |
| 0000003120 | 36FF | 0054 | 36FF | 005A | 36FF | 0058 | 681E | 0091 |
| 0000003140 | FF68 | 68FF | FFFF | FF9A | 00FF | 8300 | 26C4 | 068E |
| 0000003160 | 0952 | FF26 | 0A36 | 1E02 | 6C68 | 1E00 | 5E68 | FF0B |
| 0000003200 | 0876 | 76FF | 6806 | 0400 | 681E | 0BCA | FF9A | 00FF |
| 0000003220 | 8900 | F246 | 7E83 | 00F2 | 0375 | 03E9 | E900 | 0006 |
| 0000003240 | 06C7 | 0070 | 0000 | 681E | 006C | 006A | 006A | FF9A |
| 0000003260 | 00FF | 8900 | F246 | 468B | E9F2 | 0126 | 068E | 094E |
| 0000003300 | 8326 | 2F3E | 0002 | 0375 | 09E9 | 8300 | DE7E | 74FE |
| 0000003320 | E903 | 000F | 068E | 0950 | 8326 | 9B3E | 0002 | 0375 |
| 0000003340 | 39E9 | 8D00 | E646 | 5016 | 468D | 16F6 | 8D50 | DA46 |
| 0000003360 | 5016 | 681E | 00B0 | E168 | FF00 | 5636 | FF00 | 5436 |
| 0000003400 | FF00 | 5A36 | FF00 | 5836 | 9A00 | 02CA | 0000 | C483 |
| 0000003420 | C71A | E046 | 0000 | 41E9 | E901 | 0003 | 3BE9 | C701 |
| 0000003440 | 7006 | 0100 | E900 | 00CC | 068E | 094E | 8326 | 833E |
| 0000003460 | 0002 | 0375 | 45E9 | 8300 | DE7E | 75FE | E903 | 003C |
| 0000003500 | 681E | 0099 | 468D | 16E6 | 8D50 | F646 | 5016 | 468D |
| 0000003520 | 16DA | 1E50 | B068 | 6800 | 00E7 | 36FF | 0056 | 36FF |

THU MAR 14 17:27:50 1991 CRV_STI.DLL PAGE 3, LINE 119

| | | | | | | | | |
|---|---|---|---|---|---|---|---|---|
| 0000003540 | 0054 | 36FF | 005A | 36FF | 0058 | 681E | 00A8 | 6168 |
| 0000003560 | 6801 | 0164 | 679A | 0001 | 8300 | 26C4 | 068E | 094E |
| 0000003600 | 8326 | FE3E | 0002 | 0375 | 09E9 | 8300 | DE7E | 74FE |
| 0000003620 | E903 | 000F | 068E | 0950 | 8326 | 163E | 0003 | 0375 |
| 0000003640 | 39E9 | 8D00 | E646 | 5016 | 468D | 16F6 | 8D50 | DA46 |
| 0000003660 | 5016 | 681E | 00B0 | E868 | FF00 | 5636 | FF00 | 5436 |
| 0000003700 | FF00 | 5A36 | FF00 | 5836 | 9A00 | 0345 | 0000 | C483 |
| 0000003720 | C71A | E046 | 0000 | 81E9 | E900 | 0003 | 7BE9 | E900 |
| 0000003740 | 0012 | C00B | 0375 | 36E9 | 2DFF | 0079 | 0375 | CBE9 |
| 0000003760 | E9FE | FF34 | 10E9 | 8EFE | 4E06 | 2609 | 3E83 | 0121 |
| 0000004000 | 7500 | E903 | 0009 | 7E83 | FEDE | 0374 | 0FE9 | 8E00 |
| 0000004020 | 5006 | 2609 | 3E83 | 00BC | 7500 | E903 | 0039 | 468D |
| 0000004040 | 16E6 | 8D50 | F646 | 5016 | 468D | 16DA | 1E50 | B068 |
| 0000004060 | 6800 | 00EB | 36FF | 0056 | 36FF | 0054 | 36FF | 005A |
| 0000004100 | 36FF | 0058 | FF9A | 00FF | 8300 | 1AC4 | 46C7 | 00E0 |
| 0000004120 | E900 | 0006 | 03E9 | E900 | 0000 | 5F5E | ED83 | 8B02 |
| 0000004140 | 1FE5 | 4D5D | 1ECB | 9058 | 5545 | EC8B | 8E1E | 81D8 |
| 0000004160 | 08EC | 5700 | 2B56 | 89C0 | FC46 | 4689 | 8DFA | FA46 |
| 0000004200 | 5016 | 169A | 0001 | 8D00 | FA46 | 5016 | FF9A | 00FF |
| 0000004220 | 8900 | F846 | 7E83 | 00F8 | 0375 | 06E9 | 8B00 | F846 |
| 0000004240 | 17E9 | 8D00 | FA46 | 5016 | FF6A | FF6A | AF9A | 0001 |
| 0000004260 | 8900 | F846 | 468B | E9F8 | 0000 | 5F5E | ED83 | 8B02 |
| 0000004300 | 1FE5 | 4D5D | 1ECB | 9058 | 5545 | EC8B | 8E1E | 81D8 |
| 0000004320 | 0AEC | 5700 | 8356 | FA3E | 0000 | 0375 | 4BE9 | 1E00 |
| 0000004340 | 6868 | 9A00 | 0383 | 0000 | 068E | 0954 | FF26 | 0836 |
| 0000004360 | 1E02 | 6868 | 1E00 | 5E68 | 1E0B | 5E68 | 6811 | 0100 |
| 0000004400 | 681E | 0BCA | 8D9A | 0001 | 8900 | F846 | 7E83 | 00F8 |
| 0000004420 | 0375 | 0FE9 | FF00 | F876 | 681E | 00BD | 529A | FF35 |
| 0000004440 | 83FF | 06C4 | 06C7 | 00FA | 0000 | 681E | 0068 | 006A |
| 0000004460 | 006A | AD9A | 0003 | 3D00 | 0000 | 0374 | 8DE9 | C700 |
| 0000004500 | 7206 | 0000 | 1E00 | 6868 | 9A00 | 03E4 | 0000 | 06C7 |
| 0000004520 | 00FA | 0001 | 3E83 | 0BCA | 7400 | E903 | 0006 | CDB8 |
| 0000004540 | E909 | 02F7 | 1EC4 | 00EA | 8326 | 0C7F | 7424 | E903 |
| 0000004560 | 005A | F2A1 | 3900 | F406 | 7700 | E903 | 0018 | 681E |
| 0000004600 | 0C2E | CA9A | A329 | 8304 | 04C4 | F4A1 | A300 | 00F2 |
| 0000004620 | F8A1 | A300 | 00F6 | 186A | 681E | 115E | 681E | 0C30 |
| 0000004640 | C89A | B545 | 8304 | 0AC4 | 06C7 | 0C48 | 0024 | 681E |
| 0000004660 | 0D56 | 649A | 2200 | 8305 | 04C4 | 5EC4 | 2606 | 07C7 |
| 0000004700 | 0C2E | 8C26 | 025F | 00B8 | E900 | 028F | F2A1 | 3900 |
| 0000004720 | F406 | 7600 | E903 | 011C | 3E83 | 0070 | 7500 | E903 |
| 0000004740 | 004B | 681E | 006C | 5B9A | 0005 | 8E00 | 5206 | 2609 |
| 0000004760 | 36FF | 020A | 681E | 006C | 681E | 125E | 681E | 0D56 |
| 0000005000 | 0068 | 1E04 | 6068 | 9A12 | 0405 | 0000 | 4689 | 83F8 |
| 0000005020 | F87E | 7500 | E903 | 000F | 76FF | 1EF8 | D368 | 9A00 |
| 0000005040 | 3552 | 0590 | C483 | C706 | 7006 | 0000 | 8D00 | F646 |
| 0000005060 | 5016 | 681E | 0BCC | FF6A | FF6A | FF9A | 00FF | 3D00 |
| 0000005100 | 0000 | 0374 | ADE9 | 8300 | F67E | 7400 | E903 | 006C |
| 0000005120 | 06C7 | 0072 | 0000 | 681E | 0068 | 4A9A | 0004 | C700 |
| 0000005140 | FA06 | 0100 | 8300 | CA3E | 000B | 0374 | 06E9 | B800 |
| 0000005160 | 09CD | E6E9 | C401 | EA1E | 2600 | 7F83 | 240C | 0374 |
| 0000005200 | 36E9 | 6A00 | 1E18 | 5E68 | 1E11 | 3068 | 9A0C | 45C8 |
| 0000005220 | 05A2 | C483 | C70A | 4806 | 240C | 1E00 | 5668 | 9A0D |
| 0000005240 | 0064 | 063A | C483 | C404 | 065E | C726 | 2E07 | 260C |
| 0000005260 | 5F8C | B802 | 0000 | A2E9 | E901 | 0038 | 06C7 | 0070 |
| 0000005300 | 0001 | 3E83 | 1260 | 7400 | E903 | 0006 | CDB8 | E909 |
| 0000005320 | 0189 | 1EC4 | 00EE | 8B26 | 1047 | F4A3 | A100 | 00EE |
| 0000005340 | 168B | 00F0 | 1205 | A300 | 115A | 1689 | 115C | 06C7 |
| 0000005360 | 00F2 | 0000 | F2A1 | 3900 | F406 | 7700 | E903 | 0155 |
| 0000005400 | 1EC4 | 115A | 8B26 | 8907 | FC46 | 7E83 | 0DFC | 0374 |

THU MAR 14 17:27:50 1991 CRV_STI.DLL PAGE 4, LINE 178

| | | | | | | | | |
|---|---|---|---|---|---|---|---|---|
| 0000005420 | E2E9 | A100 | 00F8 | 0639 | 00F6 | 0373 | 3CE9 | 1E00 |
| 0000005440 | F668 | 1E00 | F868 | 1E00 | 5668 | C411 | 5A1E | 2611 |
| 0000005460 | 77FF | 2604 | 77FF | 9A02 | 169D | 0674 | C483 | 8910 |
| 0000005500 | FA46 | 7E83 | 00FA | 0375 | 10E9 | 8300 | F206 | 0600 |
| 0000005520 | 0683 | 115A | 8B06 | FA46 | 00E9 | A101 | 00F8 | 0639 |
| 0000005540 | 00F6 | 0372 | 8BE9 | 6A00 | 1E18 | 5668 | 1E0D | 3068 |
| 0000005560 | 9A0C | 45C8 | 0688 | C483 | 1E0A | 2E68 | 1E0C | F668 |
| 0000005600 | 1E00 | 5668 | 9A11 | 1158 | 041F | C483 | 890C | FA46 |
| 0000005620 | F8A1 | 3900 | F606 | 7300 | E903 | 0013 | 06C7 | 0D54 |
| 0000005640 | 0001 | 0683 | 00F2 | 8306 | 5A06 | 0611 | 06E9 | C700 |
| 0000005660 | 5406 | 000D | 8300 | FA7E | 7400 | E903 | 0015 | 5EC4 |
| 0000005700 | 2606 | 07C7 | 0C2E | 8C26 | 025F | 00B8 | E900 | 008B |
| 0000005720 | 1FE9 | 8300 | 543E | 000D | 0375 | 0FE9 | C700 | 5206 |
| 0000005740 | FF0D | 1EFF | 2E68 | 9A0C | 2911 | 0702 | 468B | E9FA |
| 0000005760 | 0069 | 60E9 | 6A00 | 1E18 | 5668 | 1E0D | 3068 | 9A0C |
| 0000006000 | 45C8 | 0716 | C483 | 1E0A | 2E68 | 1E0C | F268 | 1E00 |
| 0000006020 | 5A68 | 9A11 | 095C | 0485 | C483 | 890C | FA46 | 7E83 |
| 0000006040 | 00FA | 0374 | 15E9 | C400 | 065E | C726 | 2E07 | 260C |
| 0000006060 | 5F8C | B802 | 0000 | 22E9 | E900 | 0019 | 7E81 | CCFA |
| 0000006100 | 7409 | E903 | 0009 | 468B | E9FA | 000F | 06E9 | 8B00 |
| 0000006120 | FA46 | 06E9 | B800 | 0000 | 00E9 | 5E00 | 835F | 02ED |
| 0000006140 | E58B | 5D1F | CB4D | 581E | 4590 | 8B55 | 1EEC | D88E |
| 0000006160 | EC81 | 0000 | 5657 | B81E | 004C | D88E | 006A | 006A |
| 0000006200 | 0068 | 6A20 | 6A00 | 6800 | 0790 | FF68 | 9AFF | 4412 |
| 0000006220 | 06EA | C483 | 400E | 0374 | 06E9 | B800 | FFFF | 06E9 |
| 0000006240 | B800 | 0000 | 00E9 | 1F00 | 5F5E | ED83 | 8B02 | 1FE5 |
| 0000006260 | 4D5D | 1ECB | 9058 | 5545 | EC8B | 8E1E | 81D8 | 0CEC |
| 0000006300 | 5700 | 2B56 | 89C0 | FC46 | 4689 | 1EFA | FC68 | 8D00 |
| 0000006320 | F446 | 5016 | 006A | 026A | 006A | 006A | 006A | 006A |
| 0000006340 | FF9A | 00FF | 8900 | F846 | 7E83 | 00F8 | 0375 | 0CE9 |
| 0000006360 | 1E00 | 0968 | 9A01 | 3552 | 0830 | C483 | 8D04 | FA46 |
| 0000006400 | 5016 | 739A | 0008 | 6800 | 080E | 0A68 | 6802 | FFFF |
| 0000006420 | 0868 | 8D02 | FA46 | 5016 | FF9A | 00FF | 8900 | F846 |
| 0000006440 | 7E83 | 00F8 | 0375 | 0CE9 | 1E00 | 1B68 | 9A01 | 3552 |
| 0000006460 | 0856 | C483 | 8D04 | FA46 | 5016 | FF6A | FF6A | 339A |
| 0000006500 | 0004 | 8900 | F846 | 7E83 | 00F8 | 0375 | 0CE9 | 1E00 |
| 0000006520 | 2E68 | 9A01 | 3552 | 088A | C483 | 1E04 | 6068 | 9A0B |
| 0000006540 | FFFF | 0000 | 06C7 | 0BD0 | 0068 | 1E8C | 0BD2 | 681E |
| 0000006560 | 0068 | 9E9A | 0008 | 8900 | F846 | 7E83 | 00F8 | 0375 |
| 0000006600 | 0CE9 | 1E00 | 4268 | 9A01 | 3552 | 08D5 | C483 | C704 |
| 0000006620 | D606 | 6C0B | 8C00 | D81E | 1E0B | 6C68 | 9A00 | 04E7 |
| 0000006640 | 0000 | 4689 | 83F8 | F87E | 7500 | E903 | 000C | 681E |
| 0000006660 | 0157 | 529A | 8835 | 8307 | 04C4 | 06C7 | 0BCC | 0002 |
| 0000006700 | 06C7 | 0B68 | 0068 | 1E8C | 0B6A | 06C7 | 0B6E | 0060 |
| 0000006720 | 1E8C | 0B70 | 06C7 | 0B64 | 0002 | 681E | 0064 | C59A |
| 0000006740 | 4603 | 8309 | 04C4 | 4689 | 3DF8 | 0000 | 0374 | 4BE9 |
| 0000006760 | 1E00 | 6068 | 9A00 | 0803 | 0000 | 681E | 005C | 609A |
| 0000007000 | 0008 | 8D00 | F646 | 5016 | 681E | 0B64 | FF6A | FF6A |
| 0000007020 | 3B9A | 0005 | 3D00 | 0000 | 0374 | 1CE9 | 8300 | F67E |
| 0000007040 | 7400 | E903 | 0013 | 06C7 | 0072 | 0001 | 681E | 0060 |
| 0000007060 | FF6A | FF6A | 3F9A | 0008 | E900 | 000F | 76FF | 1EF8 |
| 0000007100 | 6C68 | 9A01 | 3552 | 07F8 | C483 | E906 | FF8C | 00E9 |
| 0000007120 | 5E00 | 835F | 02ED | E58B | 5D1F | CB4D | 581E | 4590 |
| 0000007140 | 8B55 | 1EEC | D88E | EC81 | 0006 | 5657 | 5EC4 | 2606 |
| 0000007160 | 1FC4 | 8B26 | C407 | 0E5E | 8926 | 1A47 | 5EC4 | 260E |
| 0000007200 | 07C7 | 0000 | 5EC4 | 260E | 87C7 | 0126 | 0001 | 5EC4 |
| 0000007220 | 260A | 0783 | C402 | 065E | 8326 | 0207 | 5EC4 | 260E |
| 0000007240 | 478B | E91A | 0700 | 9EE9 | C407 | 065E | C426 | 261F |
| 0000007260 | 078A | 5EC4 | 260E | 4788 | C424 | 0A5E | FF26 | C407 |

THU MAR 14 17:27:50 1991 CRV_STI.DLL PAGE 5, LINE 237

| | | | | | | | | |
|---|---|---|---|---|---|---|---|---|
| 0000007300 | 065E | FF26 | E907 | 077F | 7CE9 | C407 | 065E | FF26 |
| 0000007320 | 0277 | FF26 | 8B37 | 0E46 | 568B | 0510 | 0024 | 5052 |
| 0000007340 | CE9A | E142 | 8308 | 08C4 | 5EC4 | 260A | 0781 | 0100 |
| 0000007360 | 5EC4 | 2606 | 0781 | 0100 | 4CE9 | E907 | 0749 | 5EC4 |
| 0000007400 | 2606 | 1FC4 | 8A26 | C407 | 0E5E | 8826 | 2447 | 5EC4 |
| 0000007420 | 2606 | 1FC4 | 8B26 | 0247 | 8B26 | 0457 | 5EC4 | 260E |
| 0000007440 | 4789 | 261C | 5789 | C41E | 065E | C426 | 261F | 478B |
| 0000007460 | 2606 | 578B | C408 | 0E5E | 8926 | 2047 | 8926 | 2257 |
| 0000007500 | 5EC4 | 260A | 0783 | C40A | 065E | 8326 | 0A07 | F6E9 |
| 0000007520 | C406 | 065E | C426 | 261F | 078A | 5EC4 | 260E | 4788 |
| 0000007540 | C424 | 065E | C426 | 261F | 478B | 2602 | 578B | C404 |
| 0000007560 | 0E5E | 8926 | 1C47 | 8926 | 1E57 | 5EC4 | 2606 | 1FC4 |
| 0000007600 | 8B26 | 0647 | 8B26 | 0857 | 5EC4 | 260E | 4789 | 2620 |
| 0000007620 | 5789 | C422 | 0A5E | 8326 | 0A07 | 5EC4 | 2606 | 0783 |
| 0000007640 | E90A | 06A3 | 5EC4 | 2606 | 1FC4 | 8A26 | C407 | 0E5E |
| 0000007660 | 8826 | 2447 | 5EC4 | 2606 | 1FC4 | 8A26 | 0147 | 5EC4 |
| 0000007700 | 260E | 4788 | C425 | 065E | C426 | 261F | 478A | C402 |
| 0000007720 | 0E5E | 8826 | 2647 | 5EC4 | 2606 | 1FC4 | 8B26 | 0447 |
| 0000007740 | 5EC4 | 260E | 4789 | C428 | 065E | C426 | 261F | 478B |
| 0000007760 | C406 | 0E5E | 8926 | 2A47 | 5EC4 | 2606 | 1FC4 | 8B26 |
| 0000010000 | 0847 | 8B26 | 0A57 | 5EC4 | 260E | 4789 | 261C | 5789 |
| 0000010020 | C41E | 065E | C426 | 261F | 478B | 260C | 578B | C40E |
| 0000010040 | 0E5E | 8926 | 2047 | 8926 | 2257 | 5EC4 | 260A | 0783 |
| 0000010060 | C410 | 065E | 8326 | 1007 | 0CE9 | E906 | 0609 | 06E9 |
| 0000010100 | C406 | 065E | C426 | 261F | 078B | 8B26 | 0257 | 5EC4 |
| 0000010120 | 260E | 4789 | 261C | 5789 | C41E | 065E | C426 | 261F |
| 0000010140 | 478B | 2604 | 578B | C406 | 0E5E | 8926 | 2047 | 8926 |
| 0000010160 | 2257 | 5EC4 | 260A | 0783 | C408 | 065E | 8326 | 0807 |
| 0000010200 | C4E9 | FF05 | 1076 | 76FF | C40E | 065E | C426 | 261F |
| 0000010220 | 77FF | 2602 | 37FF | C19A | CC15 | 830B | 08C4 | 4689 |
| 0000010240 | C4FC | 0A5E | 8326 | 0607 | 5EC4 | 2606 | 0783 | 8306 |
| 0000010260 | FC7E | 7500 | E903 | 001F | 468B | C4FC | 0E5E | 8926 |
| 0000010300 | 2487 | FF01 | 1076 | 76FF | 9A0E | 2A44 | 0C58 | C483 |
| 0000010320 | 8B04 | FC46 | 76E9 | C405 | 0E5E | 8326 | 1A7F | 7418 |
| 0000010340 | E903 | 007C | 5EC4 | 260E | 47C7 | A848 | 260A | 5F8C |
| 0000010360 | 8E4A | 4C06 | 2609 | 36FF | 0202 | FF26 | 0036 | 8B02 |
| 0000010400 | 0E46 | 568B | 0510 | 0024 | 5052 | 7A6A | 006A | 006A |
| 0000010420 | 006A | 468B | 8B0E | 1056 | 4805 | 5200 | 9A50 | FFFF |
| 0000010440 | 0000 | 4689 | 83FA | FA7E | 7500 | E903 | 0032 | 7E81 |
| 0000010460 | ABFA | 7401 | E903 | 000D | 5EC4 | 260E | 87C7 | 0124 |
| 0000010500 | FFE5 | 0AE9 | C400 | 0E5E | C726 | 2487 | E401 | FFFF |
| 0000010520 | 1076 | 76FF | 9A0E | 2C49 | 09E3 | 468B | E9FA | 04ED |
| 0000010540 | E4E9 | E904 | 04E1 | 5EC4 | 2606 | 1FC4 | 8B26 | C407 |
| 0000010560 | 0E5E | 8926 | 2447 | 5EC4 | 260A | 0783 | C402 | 065E |
| 0000010600 | 8326 | 0207 | C0E9 | E904 | 04BD | 5EC4 | 260E | 87C7 |
| 0000010620 | 0124 | 0000 | 76FF | FF10 | 0E76 | 119A | CC29 | 8E0C |
| 0000010640 | 4C06 | 2609 | 36FF | 0202 | FF26 | 0036 | 6A02 | 9A01 |
| 0000010660 | 0CC5 | 0000 | 068E | 094C | FF26 | 0636 | 2602 | 36FF |
| 0000010700 | 0204 | 016A | FF9A | 00FF | 9A00 | 0365 | 0B99 | 4689 |
| 0000010720 | 83FA | FA7E | 7500 | E903 | 0006 | 468B | E9FA | 046D |
| 0000010740 | 64E9 | C404 | 065E | C426 | 261F | 078B | 8B26 | 0257 |
| 0000010760 | 5EC4 | 260E | 4789 | 261C | 5789 | C41E | 065E | C426 |
| 0000011000 | 261F | 478B | 2604 | 578B | C406 | 0E5E | 8926 | 2047 |
| 0000011020 | 8926 | 2257 | 5EC4 | 2606 | 078B | 8B26 | 0257 | 0805 |
| 0000011040 | 5200 | 8B50 | 0E46 | 568B | 0510 | 0024 | 5052 | CE9A |
| 0000011060 | 9D42 | 830C | 08C4 | 5EC4 | 260A | 0783 | C428 | 065E |
| 0000011100 | 8326 | 2807 | 00E9 | C404 | 065E | C426 | 261F | 078B |
| 0000011120 | 8B26 | 0257 | 5EC4 | 260E | 4789 | 261C | 5789 | C41E |
| 0000011140 | 065E | C426 | 261F | 478B | 2604 | 578B | C406 | 0E5E |

THU MAR 14 17:27:50 1991 CRV_STI.DLL PAGE 6, LINE 296

| | | | | | | | | |
|---|---|---|---|---|---|---|---|---|
| 0000011160 | 8926 | 2047 | 8926 | 2257 | 5EC4 | 2606 | 078B | 8B26 |
| 0000011200 | 0257 | 0805 | 5200 | 8B50 | 0E46 | 568B | 0510 | 0024 |
| 0000011220 | 5052 | CE9A | 3142 | 830D | 08C4 | 5EC4 | 260A | 0783 |
| 0000011240 | C428 | 065E | 8326 | 2807 | 5EC4 | 260E | 47C7 | A848 |
| 0000011260 | 260A | 5F8C | 8E4A | 4C06 | 2609 | 36FF | 0202 | FF26 |
| 0000011300 | 0036 | 8B02 | 0E46 | 568B | 0510 | 0024 | 5052 | 786A |
| 0000011320 | 006A | 006A | 006A | 006A | 006A | 468B | 8B0E | 1056 |
| 0000011340 | 5005 | 5200 | C450 | 0E5E | FF26 | 4A77 | FF26 | 4877 |
| 0000011360 | 468B | 8B0E | 1056 | 4C05 | 5200 | 9A50 | FFFF | 0000 |
| 0000011400 | 4689 | 83FA | FA7E | 7500 | E903 | 0032 | 7E81 | ABFA |
| 0000011420 | 7401 | E903 | 000D | 5EC4 | 260E | 87C7 | 0124 | FFE5 |
| 0000011440 | 0AE9 | C400 | 0E5E | C726 | 2487 | E401 | FFFF | 1076 |
| 0000011460 | 76FF | 9A0E | 2C49 | 0D95 | 468B | E9FA | 030F | 06E9 |
| 0000011500 | E903 | 0303 | 5A6A | 5EC4 | 2606 | 77FF | 2602 | 37FF |
| 0000011520 | 468B | 8B0E | 1056 | 2405 | 5200 | 9A50 | 45C8 | 0E36 |
| 0000011540 | C483 | C40A | 0A5E | 8326 | 5A07 | 5EC4 | 2606 | 0783 |
| 0000011560 | E95A | 02D3 | D0E9 | C402 | 065E | C426 | 261F | 078B |
| 0000011600 | 5EC4 | 260E | 4789 | C424 | 0A5E | 8326 | 0207 | 5EC4 |
| 0000011620 | 2606 | 0783 | E902 | 02AF | 5EC4 | 2606 | 1FC4 | 8B26 |
| 0000011640 | C407 | 0E5E | 8926 | 2447 | 5EC4 | 260A | 0783 | C402 |
| 0000011660 | 065E | 8326 | 0207 | 8EE9 | E902 | 028B | 5EC4 | 2606 |
| 0000011700 | 1FC4 | 8B26 | C407 | 0E5E | 8926 | 2447 | 46C7 | 00FA |
| 0000011720 | E900 | 0003 | 46FF | C4FA | 065E | C426 | 8B1F | FA46 |
| 0000011740 | 3926 | 7707 | E903 | 0033 | 5EC4 | 2606 | 078B | 8B26 |
| 0000011760 | 0257 | 4E8B | C1FA | 05E1 | C103 | 0205 | 5200 | 8B50 |
| 0000012000 | FA46 | E0C1 | 0305 | 0E46 | 568B | 0510 | 0026 | 5052 |
| 0000012020 | CE9A | 5E42 | 830E | 08C4 | B9E9 | C4FF | 0A5E | 8326 |
| 0000012040 | 6207 | 5EC4 | 2606 | 0783 | E962 | 021B | 5EC4 | 2606 |
| 0000012060 | 1FC4 | 8B26 | C407 | 0E5E | 8926 | 2447 | 5EC4 | 260A |
| 0000012100 | 0783 | C402 | 065E | 8326 | 0207 | FAE9 | C401 | 065E |
| 0000012120 | FF26 | 0277 | FF26 | 8B37 | 0E46 | 568B | 0510 | 0024 |
| 0000012140 | 5052 | CE9A | 8742 | 830F | 08C4 | 5EC4 | 2606 | 078B |
| 0000012160 | 8B26 | 0257 | 2005 | 5200 | 8B50 | 0E46 | 568B | 0510 |
| 0000012200 | 0044 | 5052 | CE9A | D142 | 830F | 08C4 | 5EC4 | 2606 |
| 0000012220 | 1FC4 | 8B26 | 4047 | 8B26 | 4257 | 5EC4 | 260E | 4789 |
| 0000012240 | 2664 | 5789 | C466 | 0A5E | 8326 | 4407 | 5EC4 | 2606 |
| 0000012260 | 0783 | E944 | C191 | 8EE9 | C401 | 065E | FF26 | 0277 |
| 0000012300 | FF26 | 8B37 | 0E46 | 568B | 0510 | 0024 | 5052 | CE9A |
| 0000012320 | F342 | 830F | 08C4 | 5EC4 | 2606 | 078B | 8B26 | 0257 |
| 0000012340 | 2005 | 5200 | 8B50 | 0E46 | 568B | 0510 | 0044 | 5052 |
| 0000012360 | CE9A | 3C42 | 8310 | 08C4 | 5EC4 | 2606 | 1FC4 | 8B26 |
| 0000012400 | 4047 | 8B26 | 4257 | 5EC4 | 260E | 4789 | 2664 | 5789 |
| 0000012420 | C466 | 0A5E | 8326 | 4407 | 5EC4 | 2606 | 0783 | E944 |
| 0000012440 | 0125 | 226A | 5EC4 | 2606 | 77FF | 2602 | 37FF | 468B |
| 0000012460 | 8B0E | 1056 | 2405 | 5200 | 9A50 | 45C8 | 106C | C483 |
| 0000012500 | C40A | 0A5E | 8326 | 2207 | 5EC4 | 2606 | 0783 | E922 |
| 0000012520 | 00F5 | 2A6A | 5EC4 | 2606 | 77FF | 2602 | 37FF | 468B |
| 0000012540 | 8B0E | 1056 | 2405 | 5200 | 9A50 | 45C8 | 0F13 | C483 |
| 0000012560 | C40A | 0A5E | 8326 | 2A07 | 5EC4 | 2606 | 0783 | E92A |
| 0000012600 | 00C5 | 5EC4 | 260E | 87C7 | 0124 | FFFF | 76FF | FF10 |
| 0000012620 | 0E76 | 079A | 652A | 830F | 04C4 | FFB8 | E9FF | 00AD |
| 0000012640 | A4E9 | E900 | 00A1 | 3D48 | 0047 | 0376 | D3E9 | D1FF |
| 0000012660 | 93E0 | FF2E | B7A7 | A610 | A909 | C809 | C809 | CB09 |
| 0000012700 | CB09 | FB09 | FB09 | FE09 | FE09 | 5109 | A40A | 820A |
| 0000012720 | 8210 | 8210 | 8210 | 8210 | 8210 | 3B10 | 3E0B | 410B |
| 0000012740 | 820B | 8210 | 8210 | 8310 | 630B | 820C | 8210 | 8210 |
| 0000012760 | 8210 | 8210 | 8210 | 8210 | 6610 | 870C | 870C | 870C |
| 0000013000 | 8A0C | 870C | E30C | 820C | E310 | 470C | 410D | 410E |
| 0000013020 | 440E | 740E | 440E | 440E | 440E | 820E | 4410 | 770E |

THU MAR 14 17:27:50 1991 CRV_STI.DLL PAGE 7, LINE 355

| | | | | | | | | |
|---|---|---|---|---|---|---|---|---|
| 0000013040 | 980E | B90E | BC0E | 2C0E | 4D0F | 820F | 8210 | 8210 |
| 0000013060 | 8210 | B610 | B90F | 520F | 5210 | 5210 | 8210 | 5210 |
| 0000013100 | 8210 | 8210 | 2210 | B810 | 0000 | 00E9 | 5E00 | 835F |
| 0000013120 | 02ED | E58B | 5D1F | CB4D | 581E | 4590 | 8B55 | 1EEC |
| 0000013140 | D88E | EC81 | 0004 | 5657 | 5EC4 | 260E | 07C7 | 0003 |
| 0000013160 | 5EC4 | 2606 | 1FC4 | 8A26 | 2A07 | E9E4 | 02E0 | 5EC4 |
| 0000013200 | 260E | 47C7 | 0F1A | A000 | 0AA6 | 5EC4 | 260E | 4788 |
| 0000013220 | A024 | 0B5C | 5EC4 | 260E | 4788 | C425 | 065E | C426 |
| 0000013240 | 261F | 478A | C401 | 0E5E | 8826 | 2647 | 5EC4 | 2606 |
| 0000013260 | 1FC4 | 8B26 | 0247 | 5EC4 | 260E | 4789 | C428 | 065E |
| 0000013300 | C426 | 261F | 478B | C404 | 0E5E | 8926 | 2A47 | 5EC4 |
| 0000013320 | 26GE | 478B | A328 | 0BC6 | 5EC4 | 260E | 478B | A32A |
| 0000013340 | 0BC8 | 5EC4 | 260A | 0783 | C406 | 065E | 8326 | 0607 |
| 0000013360 | 86E9 | C402 | 0E5E | C726 | 1A47 | 0018 | 5EC4 | 2B0E |
| 0000013400 | 26C0 | 4789 | 261E | 4789 | C41C | 0E5E | C02B | 8926 |
| 0000013420 | 2247 | 8926 | 2047 | 5EC4 | 2606 | 078B | 8B26 | 0257 |
| 0000013440 | 5240 | 8B50 | 0E46 | 568B | 0510 | 0024 | 5052 | CE9A |
| 0000013460 | 2F42 | 8313 | 08C4 | 5EC4 | 2606 | 1FC4 | 8B26 | 2247 |
| 0000013500 | 8B26 | 2457 | 5EC4 | 260E | 4789 | 2644 | 5789 | C446 |
| 0000013520 | 0A5E | 8326 | 2607 | 5EC4 | 2606 | 0783 | 8E26 | 4C06 |
| 0000013540 | 2609 | 36FF | 0202 | FF26 | 0036 | 8B02 | 0E46 | 568B |
| 0000013560 | 0510 | 0024 | 5052 | 7A6A | 006A | 006A | 006A | 468B |
| 0000013600 | 8B0E | 1056 | 4805 | 5200 | 9A50 | 0C1E | 0000 | 4689 |
| 0000013620 | 83FC | FC7E | 7500 | E903 | 0006 | 468B | E9FC | 01DF |
| 0000013640 | D6E9 | C401 | 0E5E | C726 | 1A47 | 000C | A6A0 | C40A |
| 0000013660 | 0E5E | 8826 | 2447 | 5CA0 | C40B | 0E5E | 8826 | 2547 |
| 0000013700 | 5EC4 | 2606 | 1FC4 | 8A26 | 0147 | 5EC4 | 260E | 4788 |
| 0000013720 | C426 | 065E | C426 | 261F | 478B | C402 | 0E5E | 8926 |
| 0000013740 | 2847 | 5EC4 | 2606 | 1FC4 | 8B26 | 0447 | 5EC4 | 260E |
| 0000013760 | 4789 | C42A | 0E5E | 8B26 | 2847 | C6A3 | C40B | 0E5E |
| 0000014000 | 8B26 | 2A47 | C8A3 | C40B | 0A5E | 8326 | 0607 | 5EC4 |
| 0000014020 | 2606 | 0783 | 8B06 | 0E46 | 568B | 0510 | 001C | 5052 |
| 0000014040 | 76FF | FF0C | 0A76 | 76FF | FF08 | 0676 | 8A9A | 4E14 |
| 0000014060 | 8313 | 0CC4 | 468B | 8B0E | 1056 | 2005 | 5200 | FF50 |
| 0000014100 | 0C76 | 76FF | FF0A | 0876 | 76FF | 9A06 | 148A | 1095 |
| 0000014120 | C483 | E90C | 0123 | 5EC4 | 260E | 47C7 | 0C1A | A000 |
| 0000014140 | 0AA6 | 5EC4 | 260E | 4788 | A024 | 0B5C | 5EC4 | 260E |
| 0000014160 | 4788 | C425 | 065E | C426 | 261F | 478A | C401 | 0E5E |
| 0000014200 | 8826 | 2647 | 3E80 | 0AA6 | 740F | E903 | 003D | 5EC4 |
| 0000014220 | 2606 | 1FC4 | 8A26 | 0247 | C498 | 0E5E | 8926 | 2847 |
| 0000014240 | 5EC4 | 2606 | 1FC4 | 8A26 | 0347 | C498 | 0E5E | 8926 |
| 0000014260 | 2A47 | 5EC4 | 260E | 478B | 0128 | C606 | C40B | 0E5E |
| 0000014300 | 8B26 | 2A47 | 0601 | 0BC8 | 32E9 | C400 | 065E | C426 |
| 0000014320 | 261F | 478A | 9802 | 0601 | 0BC6 | 5EC4 | 2606 | 1FC4 |
| 0000014340 | 8A26 | 0347 | 0198 | C806 | A10B | 0BC6 | 5EC4 | 260E |
| 0000014360 | 4789 | A128 | 0BC8 | 5EC4 | 260E | 4789 | C42A | 0A5E |
| 0000014400 | 8326 | 0407 | 5EC4 | 2606 | 0783 | 8B04 | 0E46 | 568B |
| 0000014420 | 0510 | 001C | 5052 | 76FF | FF0C | 0A76 | 76FF | FF08 |
| 0000014440 | 0676 | 8A9A | 4414 | 8314 | 0CC4 | 468B | 8B0E | 1056 |
| 0000014460 | 2005 | 5200 | FF50 | 0C76 | 76FF | FF0A | 0876 | 76FF |
| 0000014500 | 9A06 | 148A | 1231 | C483 | E90C | 002D | 5EC4 | 260A |
| 0000014520 | 07FF | 5EC4 | 2606 | 07FF | 1EE9 | E900 | 001B | 7548 |
| 0000014540 | E903 | FD8F | 7548 | E903 | FD14 | 7548 | E903 | FE33 |
| 0000014560 | 7548 | E903 | FEE0 | D3E9 | B8FF | 0000 | 00E9 | 5E00 |
| 0000014600 | 835F | 02ED | E58B | 5D1F | CB4D | 581E | 4590 | 8B55 |
| 0000014620 | 1EEC | D88E | EC81 | 0006 | 5657 | 5EC4 | 2606 | 1FC4 |
| 0000014640 | 8A26 | 2A07 | E9E4 | 004F | C02B | 4689 | 89FC | FA46 |
| 0000014660 | 67E9 | C700 | FA46 | 0004 | 46C7 | 00FC | E900 | 005A |
| 0000014700 | 46C7 | 08FA | C700 | FC46 | 0000 | 4DE9 | C700 | FA46 |

THU MAR 14 17:27:50 1991 CRV_STI.DLL PAGE 8, LINE 414

| | | | | | | | | |
|---|---|---|---|---|---|---|---|---|
| 0000014720 | 000C | 46C7 | 00FC | E900 | 0040 | 46C7 | 10FA | C700 |
| 0000014740 | FC46 | 0000 | 33E9 | C700 | FA46 | FFFF | 46C7 | FFFC |
| 0000014760 | E9FF | 0026 | 23E9 | 2D00 | 0005 | 0375 | A9E9 | 48FF |
| 0000015000 | 0375 | AEE9 | 48FF | 0375 | B5E9 | 48FF | 0375 | BCE9 |
| 0000015020 | 48FF | 0375 | C3E9 | E9FF | FFCD | 7E83 | 00FC | 037D |
| 0000015040 | 53E9 | 7E00 | E903 | 0009 | 7E83 | 00FA | 0377 | 45E9 |
| 0000015060 | C400 | 065E | C426 | 261F | 478A | 2A01 | 2BE4 | 8AD2 |
| 0000015100 | FA4E | F980 | 7500 | E903 | 0011 | E0D1 | D2D1 | C9FE |
| 0000015120 | F980 | 7500 | E903 | 0003 | EFE9 | C4FF | 0E5E | 8926 |
| 0000015140 | 2607 | 5789 | C402 | 0A5E | 8326 | 0207 | 5EC4 | 2606 |
| 0000015160 | 0783 | E902 | 0040 | 468B | 0BFC | FA46 | 0374 | 29E9 |
| 0000015200 | C400 | 065E | C426 | 261F | 478A | 2A01 | C4E4 | 0E5E |
| 0000015220 | 8926 | 2607 | 47C7 | 0002 | C400 | 0A5E | 8326 | 0207 |
| 0000015240 | 5EC4 | 2606 | 0783 | E902 | 000C | 5EC4 | 2B0E | 26C0 |
| 0000015260 | 4789 | 2602 | 0789 | 5F5E | ED83 | 8B02 | 1FE5 | 4D5D |
| 0000015300 | 1ECB | 9058 | 5545 | EC8B | 8E1E | 81D8 | 08EC | 5700 |
| 0000015320 | 8E56 | 4C06 | 2609 | 36FF | 0202 | FF26 | 0036 | FF02 |
| 0000015340 | 0876 | 76FF | 8D06 | F846 | 5016 | FF9A | 00FF | 8900 |
| 0000015360 | FC46 | 7EB3 | 00FC | 0375 | 06E9 | B800 | FFE4 | 91E9 |
| 0000015400 | C400 | F85E | 8A26 | 2847 | E42A | 75E9 | C400 | 0A5E |
| 0000015420 | C726 | 1A47 | 0018 | 5EC4 | 26F8 | 478B | 262A | 578B |
| 0000015440 | C42C | 0A5E | 8926 | 1C47 | 8926 | 1E57 | 5EC4 | 26F8 |
| 0000015460 | 478B | 262E | 578B | C430 | 0A5E | 8926 | 2047 | 8926 |
| 0000015500 | 2257 | 468B | 8BF8 | FA56 | 3205 | 5200 | 8B50 | 0A46 |
| 0000015520 | 568B | 050C | 0024 | 5052 | CE9A | 2542 | 8314 | 08C4 |
| 0000015540 | 5EC4 | 26F8 | 478B | 2652 | 578B | C454 | 0A5E | 8926 |
| 0000015560 | 4447 | 8926 | 4657 | 13E9 | B800 | FFE2 | 13E9 | E900 |
| 0000015600 | 000A | 4848 | 0375 | 84E9 | E9FF | FFED | 00B8 | E900 |
| 0000015620 | 0000 | 5F5E | ED83 | 8B02 | 1FE5 | 4D5D | 1ECB | 9058 |
| 0000015640 | 5545 | EC8B | 8E1E | 81D8 | 04EC | 5700 | 8E56 | 4C06 |
| 0000015660 | 2609 | 36FF | 0202 | FF26 | 0036 | FF02 | 0876 | 76FF |
| 0000015700 | FF06 | 0C76 | 76FF | 9A0A | 15EB | 0000 | 4689 | 83FC |
| 0000015720 | FC7E | 7500 | E903 | 0006 | E4B8 | E9FF | 0055 | 5EC4 |
| 0000015740 | 260A | 1FC4 | 8026 | 287F | 7501 | E903 | 0006 | E2B8 |
| 0000015760 | E9FF | 003F | 5EC4 | 260A | 1FC4 | 8B26 | 0447 | 5EC4 |
| 0000016000 | 260E | 0789 | 5EC4 | 260A | 1FC4 | 8A26 | 2947 | A6A2 |
| 0000016020 | C40A | 0A5E | C426 | 261F | 478A | A22A | 0B5C | 5EC4 |
| 0000016040 | 260A | 0783 | C42C | 125E | C726 | 2C07 | B800 | 0000 |
| 0000016060 | 00E9 | 5E00 | 835F | 02ED | E58B | 5D1F | CB4D | 581E |
| 0000016100 | 4590 | 8B55 | 1EEC | D88E | EC81 | 0000 | 5657 | B81E |
| 0000016120 | 0778 | D88E | 5CB8 | 8C00 | E9DA | 0000 | 5E1F | 835F |
| 0000016140 | 02ED | E58B | 5D1F | CB4D | 581E | 4590 | 8B55 | 1EEC |
| 0000016160 | D88E | EC81 | 0000 | 5657 | B81E | 1750 | D88E | 60B8 |
| 0000016200 | 8C00 | E9DA | 0000 | 5E1F | 835F | 02ED | E58B | 5D1F |
| 0000016220 | CB4D | 581E | 4590 | 8B55 | 1EEC | D88E | EC81 | 0000 |
| 0000016240 | 5657 | B81E | 177A | D88E | 64A1 | 8B00 | 6616 | E900 |
| 0000016260 | 0000 | 5E1F | 835F | 02ED | E58B | 5D1F | CB4D | 581E |
| 0000016300 | 4590 | 8B55 | 1EEC | D88E | EC81 | 0000 | 5657 | B81E |
| 0000016320 | 17A4 | D88E | 72A1 | E900 | 0000 | 5E1F | 835F | 02ED |
| 0000016340 | E58B | 5D1F | CB4D | 581E | 4590 | 8B55 | 1EEC | D88F |
| 0000016360 | EC81 | 0000 | 5657 | B81E | 17D0 | D88E | 068E | 094C |
| 0000016400 | FF26 | 0236 | 2602 | 36FF | 0200 | 016A | B09A | 000C |
| 0000016420 | 8E00 | 4C06 | 2B09 | 26C0 | 02A3 | 2602 | 00A3 | 1F02 |
| 0000016440 | 5F5E | ED83 | 8B02 | 1FE5 | 4D5D | 1ECB | 9058 | 5545 |
| 0000016460 | EC8B | 8E1E | 81D8 | 00EC | 5700 | 1E56 | F8B8 | 8E17 |
| 0000016500 | 8ED8 | 4C06 | 2609 | 36FF | 0206 | FF26 | 0436 | 6A02 |
| 0000016520 | 9A01 | 180D | 0000 | 068E | 094C | C02B | A326 | 0206 |
| 0000016540 | A326 | 0204 | 5E1F | 835F | 02ED | E58B | 5D1F | CB4D |
| 0000016560 | 581E | 4590 | 8B55 | 1EEC | D88E | EC81 | 0000 | 5657 |

THU MAR 14 17:27:50 1991 CRV_STI.DLL PAGE 9, LINE 473

| | | | | | | | | |
|---|---|---|---|---|---|---|---|---|
| 0000016600 | B81E | 183D | D88E | 468B | 8B06 | 0856 | 068E | 094C |
| 0000016620 | A326 | 0200 | 8926 | 0216 | 1F02 | 5F5E | ED83 | 8B02 |
| 0000016640 | 1FE5 | 4D5D | 04CA | 1E00 | 9058 | 5545 | EC8B | 8E1E |
| 0000016660 | 81D8 | 00EC | 5700 | 1E56 | 82B8 | 8E18 | 8BD8 | 0646 |
| 0000016700 | 568B | 8E08 | 4C06 | 2609 | 04A3 | 2602 | 1689 | 0206 |
| 0000016720 | 5E1F | 835F | 02ED | E58B | 5D1F | CA4D | 0004 | 581E |
| 0000016740 | 4590 | 8B55 | 1EEC | D88E | EC81 | 0000 | 5657 | B81E |
| 0000016760 | 18B9 | D88E | 06C7 | 01A6 | 226C | 1E8C | 01A8 | 1EC4 |
| 0000017000 | 01A6 | C726 | 0E47 | 0002 | 00E9 | 1F00 | 5F5E | ED83 |
| 0000017020 | 8B02 | 1FE5 | 4D5D | 1ECB | 9058 | 5545 | EC8B | 8E1E |
| 0000017040 | 81D8 | 04EC | 5700 | 8356 | 067E | 7400 | E903 | 000D |
| 0000017060 | 7E81 | 0008 | 740F | E903 | 0003 | 1AE9 | 8301 | 087E |
| 0000017100 | 7E00 | E903 | 0011 | 037D | 09E9 | 8300 | 067E | 7600 |
| 0000017120 | E903 | 0003 | 00E9 | 8301 | A406 | 0201 | 468B | 8908 |
| 0000017140 | FC46 | 7E83 | 10FC | 0373 | 1BE9 | C400 | 681E | 2622 |
| 0000017160 | 07C6 | 8A09 | FC46 | 1EC4 | 2268 | 8826 | 0147 | 0683 |
| 0000017200 | 2268 | E902 | 00D1 | 468B | 8B06 | 0856 | C48A | E28A |
| 0000017220 | D68A | E6D0 | F61A | FAD1 | D8D1 | FAD1 | D8D1 | FAD1 |
| 0000017240 | D8D1 | FAD1 | D8D1 | 4689 | 83FC | FC7E | 7310 | E903 |
| 0000017260 | 001B | 1EC4 | 2268 | C626 | 0807 | 468A | C4FC | 681E |
| 0000017300 | 2622 | 4788 | 8301 | 6806 | 0222 | 8AE9 | 8B00 | 0646 |
| 0000017320 | 568B | 8A08 | 8AC4 | 8AE2 | D0D6 | 1AE6 | 89F6 | FC46 |
| 0000017340 | 7E83 | 10FC | 0373 | 1BE9 | C400 | 681E | 2622 | 07C6 |
| 0000017360 | 8A07 | FC46 | 1EC4 | 2268 | 8826 | 0147 | 0683 | 2268 |
| 0000017400 | E902 | 0053 | 468B | 8B06 | 0856 | FAD1 | D8D1 | FAD1 |
| 0000017420 | D8D1 | FAD1 | D8D1 | FAD1 | D8D1 | 4689 | 83FC | FC7E |
| 0000017440 | 7310 | E903 | 0016 | 1EC4 | 2268 | C626 | 0607 | 468A |
| 0000017460 | C4FC | 681E | 2622 | 4788 | E901 | 0013 | 1EC4 | 2268 |
| 0000017500 | C626 | 0507 | 468A | C406 | 681E | 2622 | 4788 | 8301 |
| 0000017520 | 6806 | 0222 | 00E9 | 5E00 | 835F | 02ED | E58B | 5D1F |
| 0000017540 | CB4D | 581E | 4590 | 8B55 | 1EEC | D88E | EC81 | 0004 |
| 0000017560 | 5657 | C02B | 66A3 | A312 | 1264 | A4A1 | A301 | 1268 |
| 0000017600 | 068E | 0956 | FF26 | 0236 | 2602 | 36FF | 0200 | 8C68 |
| 0000017620 | 1E00 | 6468 | 9A12 | FFFF | 0000 | 4689 | 83FC | FC7E |
| 0000017640 | 7500 | E903 | 0006 | 468B | E9FC | 0078 | 1EC4 | 01A6 |
| 0000017660 | C726 | 1047 | 0004 | 1EC4 | 01A6 | FF26 | 1077 | 681E |
| 0000017700 | 1264 | A6A1 | 8B01 | A816 | 0501 | 0012 | 5052 | C89A |
| 0000017720 | 5B45 | 8316 | 0AC4 | 0E8B | 01A6 | 1E8B | 01A8 | C183 |
| 0000017740 | 3B12 | 74C1 | E903 | 000A | D33B | 0374 | 03E9 | E900 |
| 0000017760 | 0000 | 1EC4 | 01A6 | C726 | 0C47 | 000D | 068E | 0958 |
| 0000020000 | FF26 | 0A36 | FF02 | A836 | FF01 | A636 | 9A01 | FFFF |
| 0000020020 | 0000 | 4689 | 83FC | FC7E | 7500 | E903 | 0000 | 468B |
| 0000020040 | E9FC | 0000 | 5F5E | ED83 | 8B02 | 1FE5 | 4D5D | 1ECB |
| 0000020060 | 9058 | 5545 | EC8B | 8E1E | 81D8 | 04EC | 5700 | A156 |
| 0000020100 | 01A4 | 68A3 | 8E12 | 5606 | 2609 | 36FF | 0202 | FF26 |
| 0000020120 | 0036 | 1E02 | 6468 | 9A12 | FFFF | 0000 | 4689 | 8BFC |
| 0000020140 | FC46 | 00E9 | 5E00 | 835F | 02ED | E58B | 5D1F | CB4D |
| 0000020160 | 581E | 4590 | 8B55 | 1EEC | D88E | EC81 | 0004 | 5657 |
| 0000020200 | B81E | 18F0 | D88E | 06C7 | 2268 | 1264 | 1E8C | 226A |
| 0000020220 | 06C6 | 128C | C401 | 065E | 8A26 | 2447 | 62A2 | A012 |
| 0000020240 | 1262 | 8DA2 | C412 | 065E | 8A26 | 2547 | 63A2 | A012 |
| 0000020260 | 1263 | 8EA2 | C712 | A406 | 2C01 | 8300 | 6806 | 2C22 |
| 0000020300 | 5EC4 | 2606 | 478B | A328 | 2264 | 5EC4 | 2606 | 478B |
| 0000020320 | A32A | 2266 | 629A | EF1A | 891B | FC46 | 7E83 | 00FC |
| 0000020340 | 0375 | 0FE9 | FF00 | FC76 | 681E | 01AA | 529A | D135 |
| 0000020360 | 831A | 06C4 | 468B | E9FC | 0000 | 5E1F | 835F | 02ED |
| 0000020400 | E58B | 5D1F | CA4D | 0004 | 581E | 4590 | 8B55 | 1EEC |
| 0000020420 | D88E | EC81 | 0004 | 5657 | B81E | 1B82 | D88E | 3E81 |
| 0000020440 | 01A4 | 0FCA | 0377 | 98E9 | C400 | 681E | 2622 | 07C6 |

THU MAR 14 17:27:50 1991 CRV_STI.DLL PAGE 10, LINE 532

| | | | | | | | | |
|---|---|---|---|---|---|---|---|---|
| 0000020460 | C402 | 065E | 8A26 | 2647 | 1EC4 | 2268 | 8826 | 0147 |
| 0000020500 | 64A1 | C422 | 681E | 2622 | 4789 | A102 | 2266 | 1EC4 |
| 0000020520 | 2268 | 8926 | 0447 | 0683 | 01A4 | 8306 | 6806 | 0622 |
| 0000020540 | 2F9A | 7B1B | 891C | FC46 | 7E83 | 00FC | 0375 | 15E9 |
| 0000020560 | FF00 | FC76 | 681E | 01BF | 529A | 9E35 | 831C | 06C4 |
| 0000020600 | 468B | E9FC | 0135 | 06C7 | 2268 | 1264 | 1E8C | 226A |
| 0000020620 | 06C7 | 01A4 | 002C | 0683 | 2268 | 9A2C | 1A62 | 1CB6 |
| 0000020640 | 4689 | 83FC | FC7E | 7500 | E903 | 0015 | 76FF | 1EFC |
| 0000020660 | D768 | 9A01 | 3552 | 1BD7 | C483 | 8B06 | FC46 | FAE9 |
| 0000020700 | C400 | 065E | 8A26 | 2647 | 1EC4 | 2268 | 8826 | 0147 |
| 0000020720 | 5EC4 | 2606 | 7F80 | 0E24 | 0374 | 47E9 | C400 | 681E |
| 0000020740 | 2622 | 07C6 | C403 | 065E | 8B26 | 2847 | 1EC4 | 2268 |
| 0000020760 | 8926 | 0247 | 5EC4 | 2606 | 478B | C42A | 681E | 2622 |
| 0000021000 | 4789 | C404 | 065E | 8B26 | 2847 | 64A3 | C422 | 065E |
| 0000021020 | 8B26 | 2A47 | 66A3 | 8322 | A406 | 0601 | 0683 | 2268 |
| 0000021040 | E906 | 0046 | 1EC4 | 2268 | C626 | 0407 | 5EC4 | 2606 |
| 0000021060 | 478A | C428 | 681E | 2622 | 4788 | C402 | 065E | 8A26 |
| 0000021100 | 2A47 | 1EC4 | 2268 | 8826 | 0347 | 5EC4 | 2606 | 478B |
| 0000021120 | 0128 | 6406 | C422 | 065E | 8B26 | 2A47 | 0601 | 2266 |
| 0000021140 | 0683 | 01A4 | 8304 | 6806 | 0422 | 5EC4 | 2606 | 77FF |
| 0000021160 | 261E | 77FF | 9A1C | 1917 | 1DB0 | C483 | C404 | 065E |
| 0000021200 | 8B26 | 2047 | 8B26 | 2257 | 5EC4 | 2606 | 5739 | 7D1E |
| 0000021220 | E903 | 0021 | 037E | 09E9 | 2600 | 4739 | 771C | E903 |
| 0000021240 | 0013 | 5EC4 | 2606 | 77FF | 2622 | 77FF | 9A20 | 1917 |
| 0000021260 | 1C63 | C483 | B804 | 0000 | 00E9 | 1F00 | 5F5E | ED83 |
| 0000021300 | 8B02 | 1FE5 | 4D5D | 04CA | 1E00 | 9058 | 5545 | EC8B |
| 0000021320 | 8E1E | 81D8 | 00EC | 5700 | 1E56 | 1AB8 | 8E1C | C4D8 |
| 0000021340 | 681E | 2622 | 07C6 | 8B01 | 0646 | 568B | 0508 | 0024 |
| 0000021360 | 5052 | 68A1 | 8B22 | 6A16 | 4022 | 5052 | CE9A | 7842 |
| 0000021400 | 831D | 08C4 | 5EC4 | 2606 | 478B | 2644 | 578B | C446 |
| 0000021420 | 681E | 2622 | 4789 | 2622 | 5789 | 8324 | A406 | 2601 |
| 0000021440 | 0683 | 2268 | E926 | 0000 | 5E1F | 835F | 02ED | E58B |
| 0000021460 | 5D1F | CA4D | 0004 | 581E | 4590 | 8B55 | 1EEC | D88E |
| 0000021500 | EC81 | 0000 | 5657 | B81E | 1DDB | D88E | 1EC4 | 2268 |
| 0000021520 | C626 | 0207 | 5EC4 | 2606 | 478A | C426 | 681E | 2622 |
| 0000021540 | 4788 | C401 | 065E | 8B26 | 2847 | 1EC4 | 2268 | 8926 |
| 0000021560 | 0247 | 5EC4 | 2606 | 478B | C42A | 681E | 2622 | 4789 |
| 0000021600 | 8304 | A406 | 0601 | 0683 | 2268 | E906 | 0000 | 5E1F |
| 0000021620 | 835F | 02ED | E58B | 5D1F | CA4D | 0004 | 581E | 4590 |
| 0000021640 | 8B55 | 1EEC | D88E | EC81 | 0004 | 5657 | B81E | 1E48 |
| 0000021660 | D88E | 2F9A | FF1B | 891D | FC46 | 468B | E9FC | 0000 |
| 0000021700 | 5E1F | 835F | 02ED | E58B | 5D1F | CB4D | 581E | 4590 |
| 0000021720 | 8B55 | 1EEC | D88E | EC81 | 0060 | 5657 | B81E | 1EAE |
| 0000021740 | D88E | 46C6 | 02CE | C02B | 4689 | 89A8 | A646 | 46C7 |
| 0000021760 | 56AA | C400 | 085E | 8B26 | 1C47 | 8B26 | 1E57 | 4689 |
| 0000022000 | 89D0 | D256 | 5EC4 | 2608 | 478B | 2620 | 578B | 8922 |
| 0000022020 | D446 | 5689 | 8BD6 | 0846 | 568B | 050A | 0024 | 5052 |
| 0000022040 | 468D | 16D8 | 9A50 | 42CE | 1FA3 | C483 | C408 | 085E |
| 0000022060 | 8B26 | 4447 | 8B26 | 4657 | 4689 | 89F8 | FA56 | 068E |
| 0000022100 | 0956 | FF26 | 0236 | 2602 | 36FF | 0200 | 8D68 | 8D00 |
| 0000022120 | A646 | 5016 | 969A | 001A | 8900 | FC46 | 7E83 | 00FC |
| 0000022140 | 0375 | 06E9 | B800 | FFE4 | 8BE9 | 8B00 | 0646 | 4689 |
| 0000022160 | 8BA4 | A646 | 568B | 89A8 | A046 | 5689 | C4A2 | A61E |
| 0000022200 | 2601 | 47C7 | 0610 | C400 | A61E | 2601 | 77FF | 8D10 |
| 0000022220 | A046 | 5016 | A6A1 | 8B01 | A816 | 0501 | 0012 | 5052 |
| 0000022240 | C89A | B545 | 831E | 0AC4 | 0E8B | 01A6 | 1E8B | 01A8 |
| 0000022260 | C183 | 3B12 | 74C1 | E903 | 000A | D33B | 0374 | 03E9 |
| 0000022300 | E900 | 0000 | 1EC4 | 01A6 | C726 | 0C47 | 0019 | 068E |
| 0000022320 | 0958 | FF26 | 0A36 | FF02 | A836 | FF01 | A636 | 9A01 |

THU MAR 14 17:27:50 1991 CRV_STI.DLL PAGE 11, LINE 591

| | | | | | | | | |
|---|---|---|---|---|---|---|---|---|
| 0000022340 | 1B0E | 0000 | 4689 | 83FC | FC7E | 7500 | E903 | 0000 |
| 0000022360 | 468B | E9FC | 0000 | 5E1F | 835F | 02ED | E58B | 5D1F |
| 0000022400 | CA4D | 0006 | 581E | 4590 | 8B55 | 1EEC | D88E | EC81 |
| 0000022420 | 0018 | 5657 | B81E | 1EDE | D88E | 5EC4 | 2606 | 478B |
| 0000022440 | E91A | 00F2 | 5EC4 | 2606 | 478A | 8824 | E846 | 5EC4 |
| 0000022460 | 2606 | 478B | 261C | 578B | 891E | EA46 | 5689 | C4EC |
| 0000022500 | 065E | 8B26 | 2047 | 8B26 | 2257 | 4689 | 89EE | F056 |
| 0000022520 | 1EC4 | 01A6 | C726 | 1047 | 000A | 1EC4 | 01A6 | FF26 |
| 0000022540 | 1077 | 468D | 16E8 | A150 | 01A6 | 168B | 01A8 | 1205 |
| 0000022560 | 5200 | 9A50 | 45C8 | 20EC | C483 | 8B0A | A60E | 8B01 |
| 0000022600 | A81E | 8301 | 12C1 | C13B | 0374 | 0AE9 | 3B00 | 74D3 |
| 0000022620 | E903 | 0003 | 00E9 | E900 | 0093 | 5EC4 | 2606 | 478A |
| 0000022640 | 8824 | F446 | 5EC4 | 2606 | 478B | 261C | 578B | 891E |
| 0000022660 | F646 | 5689 | C4F8 | 065E | 8B26 | 2047 | 8B26 | 2257 |
| 0000022700 | 4689 | 89FA | FC56 | 1EC4 | 01A6 | C726 | 1047 | 000A |
| 0000022720 | 1EC4 | 01A6 | FF26 | 1077 | 468D | 16F4 | A150 | 01A6 |
| 0000022740 | 168B | 01A8 | 1205 | 5200 | 9A50 | 45C8 | 1F28 | C483 |
| 0000022760 | 8B0A | A60E | 8B01 | A81E | 8301 | 12C1 | C13B | 0374 |
| 0000023000 | 0AE9 | 3B00 | 74D3 | E903 | 0003 | 00E9 | E900 | 001D |
| 0000023020 | 1AE9 | E900 | 0017 | 092D | 7D00 | E903 | FFF2 | 7F48 |
| 0000023040 | E903 | FF00 | 7548 | E903 | FF70 | E3E9 | C4FF | 065E |
| 0000023060 | 8B26 | 1A47 | 1EC4 | 01A6 | 8926 | 0C47 | 068E | 0958 |
| 0000023100 | FF26 | 0A36 | FF02 | A836 | FF01 | A636 | 9A01 | 1FE0 |
| 0000023120 | 0000 | 4689 | 83F2 | F27E | 7500 | E903 | 0000 | 468B |
| 0000023140 | E9F2 | 0000 | 5E1F | 835F | 02ED | E58B | 5D1F | CA4D |
| 0000023160 | 0004 | 581E | 4590 | 8B55 | 1EEC | D88E | EC81 | 000E |
| 0000023200 | 5657 | B81E | 2016 | D88E | 5EC4 | 2606 | 7F83 | 4A1A |
| 0000023220 | 0374 | A5E9 | C400 | 065E | 8B26 | 2647 | 4689 | C4F4 |
| 0000023240 | 065E | 8B26 | 1C47 | 8B26 | 1E57 | 4689 | 89F6 | F856 |
| 0000023260 | 5EC4 | 2606 | 478B | 2620 | 578B | 8922 | FA46 | 5689 |
| 0000023300 | C4FC | A61E | 2601 | 47C7 | 0A10 | C400 | A61E | 2601 |
| 0000023320 | 77FF | 8D10 | F446 | 5016 | A6A1 | 8BC1 | A816 | 0501 |
| 0000023340 | 0012 | 5052 | C89A | 7645 | 8320 | 0AC4 | 0E8B | 01A6 |
| 0000023360 | 1E8B | 01A8 | C183 | 3B12 | 74C1 | E903 | 000A | D33B |
| 0000023400 | 0374 | 03E9 | E900 | 0000 | 1EC4 | 01A6 | C726 | 0C47 |
| 0000023420 | 0021 | 068E | 0958 | FF26 | 0A36 | FF02 | A836 | FF01 |
| 0000023440 | A636 | 9A01 | 214E | 0000 | 4689 | 83F2 | F27E | 7500 |
| 0000023460 | E903 | 0000 | 468B | E9F2 | 0006 | FFB8 | E9FF | 0000 |
| 0000023500 | 5E1F | 835F | 02ED | E58B | 5D1F | CA4D | 0004 | 581E |
| 0000023520 | 4590 | 8B55 | 1EEC | D88E | EC81 | 0004 | 5657 | B81E |
| 0000023540 | 2184 | D88E | 1EC4 | 01A6 | C726 | 1047 | 0058 | 1EC4 |
| 0000023560 | 01A6 | FF26 | 1077 | 468B | 8B06 | 0856 | 2405 | 5200 |
| 0000023600 | A150 | 01A6 | 168B | 01A8 | 1205 | 5200 | 9A50 | 45C8 |
| 0000023620 | 21E7 | C483 | 8B0A | A60E | 8B01 | A81E | 8301 | 12C1 |
| 0000023640 | C13B | 0374 | 0AE9 | 3B00 | 74D3 | E903 | 0003 | 00E9 |
| 0000023660 | C400 | A61E | 2601 | 47C7 | 330C | 8E00 | 5806 | 2609 |
| 0000023700 | 36FF | 020A | 36FF | 01A8 | 36FF | 01A6 | 249A | 0022 |
| 0000023720 | 8900 | FC46 | 7E83 | 00FC | 0375 | 06E9 | 8B00 | FC46 |
| 0000023740 | 06E9 | B800 | FFFF | 00E9 | 1F00 | 5F5E | ED83 | 8B02 |
| 0000023760 | 1FE5 | 4D5D | 04CA | 1E00 | 9058 | 5545 | EC8B | 8E1E |
| 0000024000 | 81D8 | 08EC | 5700 | 1E56 | 60B8 | 8E22 | FFD8 | 0876 |
| 0000024020 | 76FF | 9A06 | 4304 | 2322 | C483 | 0504 | 0013 | 9A50 |
| 0000024040 | 4010 | 2350 | C483 | 8902 | F846 | 5689 | 8BFA | FA46 |
| 0000024060 | 460B | 74F8 | E903 | 0006 | FFB8 | E9FF | 009C | 5EC4 |
| 0000024100 | 26F8 | 47C7 | 020E | FF00 | 0876 | 76FF | 9A06 | 4304 |
| 0000024120 | 2378 | C483 | 4004 | 5EC4 | 26F8 | 4789 | C410 | F85E |
| 0000024140 | FF26 | 1077 | 76FF | FF08 | 0676 | 468B | 8BF8 | FA56 |
| 0000024160 | 1205 | 5200 | 9A50 | 45C8 | 23C0 | C483 | 8B0A | F84E |
| 0000024200 | 5E8B | 83FA | 12C1 | C13B | 0374 | 0AE9 | 3B00 | 74D3 |

THU MAR 14 17:27:50 1991 CRV_STI.DLL PAGE 12, LINE 650

| | | | | | | | | |
|---|---|---|---|---|---|---|---|---|
| 0000024220 | E903 | 0003 | 00E9 | C400 | F85E | C726 | 0C47 | 0047 |
| 0000024240 | 068E | 0958 | FF26 | 0A36 | FF02 | FA76 | 76FF | 9AF8 |
| 0000024260 | 22CD | 0000 | 4689 | FFFC | FA76 | 76FF | 9AF8 | 401A |
| 0000024300 | 2290 | C483 | 8304 | FC7E | 7500 | E903 | 0006 | 468B |
| 0000024320 | E9FC | 0006 | FFB8 | E9FF | 0000 | 5E1F | 835F | 02ED |
| 0000024340 | E58B | 5D1F | CA4D | 0004 | 581E | 4590 | 8B55 | 1EEC |
| 0000024360 | D88E | EC81 | 0008 | 5657 | B81E | 2309 | D88E | 186A |
| 0000024400 | 109A | 1640 | 8323 | 02C4 | 4689 | 89F8 | FA56 | 468B |
| 0000024420 | 0BFA | F846 | 0374 | 06E9 | B800 | FFFF | 5FE9 | C400 |
| 0000024440 | F85E | C726 | 0E47 | 0001 | 5EC4 | 26F8 | 47C7 | 0110 |
| 0000024460 | 8B00 | 0646 | 5EC4 | 26F8 | 4789 | C414 | F85E | C726 |
| 0000024500 | 0C47 | 0046 | 068E | 0958 | FF26 | 0A36 | FF02 | FA76 |
| 0000024520 | 76FF | 9AF8 | 23B0 | 0000 | 4689 | FFFC | FA76 | 76FF |
| 0000024540 | 9AF8 | 401A | 2403 | C483 | 8304 | FC7E | 7500 | E903 |
| 0000024560 | 0006 | 468B | E9FC | 0006 | FFB8 | E9FF | 0000 | 5E1F |
| 0000024600 | 835F | 02ED | E58B | 5D1F | CA4D | 0002 | 581E | 4590 |
| 0000024620 | 8B55 | 1EEC | D88E | EC81 | 002C | 5657 | B81E | 23FA |
| 0000024640 | D88E | 46C7 | ECFA | 8C01 | FC5E | 46C7 | 01F2 | 2B01 |
| 0000024660 | 89C0 | E246 | 4689 | 8EE0 | 5A06 | 2609 | 3E83 | 01C3 |
| 0000024700 | 7500 | E903 | 001D | 36FF | 01A2 | 36FF | 01A0 | 468D |
| 0000024720 | 16D8 | 9A50 | 00A6 | 0000 | C483 | 3D08 | 0000 | 0374 |
| 0000024740 | 0FE9 | 8E00 | 5C06 | 2609 | 3E83 | 26BB | 7500 | E903 |
| 0000024760 | 003B | 681E | 01F3 | 468D | 16E6 | 8D50 | D846 | 5016 |
| 0000025000 | 468D | 16F6 | 6850 | 029D | 681E | 0242 | 36FF | 019E |
| 0000025020 | 36FF | 019C | 36FF | 01A2 | 36FF | 01A0 | EF9A | 0000 |
| 0000025040 | 8300 | 1EC4 | 4689 | 89F6 | F856 | 08E9 | 2B00 | 89C0 |
| 0000025060 | F846 | 4689 | C7F6 | E446 | 0001 | 46C7 | 00F4 | 8E00 |
| 0000025100 | 5A06 | 2609 | 3E83 | 259D | 7500 | E903 | 0048 | 7E83 |
| 0000025120 | FEDC | 0375 | 3FE9 | FF00 | 0E76 | 681E | 01FA | 468D |
| 0000025140 | 16E6 | 8D50 | F646 | 5016 | 468D | 16D8 | 1E50 | 4268 |
| 0000025160 | 6802 | 02A3 | 36FF | 019E | 36FF | 019C | 36FF | 01A2 |
| 0000025200 | 36FF | 01A0 | 681E | 0209 | F868 | 6825 | 25FB | 759A |
| 0000025220 | 0002 | 8300 | 28C4 | 068E | 095A | 8326 | 0C3E | 0026 |
| 0000025240 | 0375 | 60E9 | 8300 | DC7E | 75FE | E903 | 0057 | 76FF |
| 0000025260 | FF0C | 0A76 | 681E | 0211 | 468B | 0B0C | 0A46 | 0375 |
| 0000025300 | 06E9 | B800 | 0001 | 03E9 | B800 | 0000 | 8D50 | E646 |
| 0000025320 | 5016 | 468D | 16F6 | 8D50 | D846 | 5016 | 681E | 0242 |
| 0000025340 | A568 | FF02 | 9E36 | FF01 | 9C36 | FF01 | A236 | FF01 |
| 0000025360 | A036 | 1E01 | 2168 | 6802 | 2667 | 6A68 | 9A26 | 266D |
| 0000025400 | 0000 | C483 | 8E2C | 5A06 | 2609 | 3E83 | 26A3 | 7500 |
| 0000025420 | E903 | 0060 | 7E83 | FEDC | 0375 | 57E9 | FF00 | 0876 |
| 0000025440 | 76FF | 1E06 | 296B | 8B02 | 0846 | 460B | 7506 | E903 |
| 0000025460 | 0006 | 01B8 | E900 | 0003 | 00B8 | 5000 | 468D | 16E6 |
| 0000025500 | 8D50 | F646 | 5016 | 468D | 16D8 | 1E50 | 4268 | 6802 |
| 0000025520 | 02A7 | 36FF | 019E | 36FF | 019C | 36FF | 01A2 | 36FF |
| 0000025540 | 01A0 | 681E | 0239 | 6F68 | 6802 | 0272 | FF9A | 00FF |
| 0000025560 | 8300 | 2CC4 | 468B | 05E4 | 0003 | C88B | E0D1 | C103 |
| 0000025600 | E0D1 | 9A50 | 4010 | 2761 | C483 | 8902 | D446 | 5689 |
| 0000025620 | 8BD6 | D646 | 460B | 74D4 | E903 | 007D | 068E | 095A |
| 0000025640 | 8326 | 6D3E | 0027 | 0375 | 09E9 | 8300 | DC7E | 74FE |
| 0000025660 | E903 | 000F | 068E | 095C | 8326 | 853E | 0027 | 0375 |
| 0000025700 | 50E9 | C700 | DE46 | 0007 | 76FF | FFE2 | E076 | 468D |
| 0000025720 | 16DE | FF50 | F276 | 76FF | FFFC | FA76 | 4E8D | 16E6 |
| 0000025740 | 8D51 | F64E | 5116 | 4E8D | 16D8 | 1E51 | 4268 | 6802 |
| 0000025760 | 02AC | 36FF | 019E | 36FF | 019C | 36FF | 01A2 | 36FF |
| 0000026000 | 01A0 | CE9A | 0027 | 8300 | 28C4 | 468B | E9DE | 00D4 |
| 0000026020 | 06E9 | B800 | 0007 | CBE9 | C400 | D45E | C726 | 0E47 |
| 0000026040 | 0001 | 468B | C4E4 | D45E | 8926 | 1047 | 5EC4 | 26D4 |
| 0000026060 | 47C7 | 490C | 8B00 | 0E46 | 5EC4 | 26D4 | 4789 | 8E14 |

THU MAR 14 17:27:50 1991 CRV_STI.DLL PAGE 13, LINE 709

| | | | | | | | | |
|---|---|---|---|---|---|---|---|---|
| 0000026100 | 5806 | 2609 | 36FF | 020A | 36FF | 01A8 | 36FF | 01A6 |
| 0000026120 | 549A | 0024 | 8900 | F446 | 76FF | FFD6 | D476 | 1A9A |
| 0000026140 | 6440 | 8324 | 04C4 | 068E | 095A | 8326 | BE3E | 0024 |
| 0000026160 | 0375 | 09E9 | 8300 | DC7E | 74FE | E903 | 000F | 068E |
| 0000026200 | 095C | 8326 | DB3E | 0001 | 0375 | 51E9 | 8B00 | F446 |
| 0000026220 | 4689 | FFDE | E276 | 76FF | 8DE0 | DE46 | 5016 | 76FF |
| 0000026240 | FFF2 | FC76 | 76FF | 8DFA | E64E | 5116 | 4E8D | 16F6 |
| 0000026260 | 8D51 | D84E | 5116 | 681E | 0242 | B968 | FF02 | 9E36 |
| 0000026300 | FF01 | 9C36 | FF01 | A236 | FF01 | A036 | 9A01 | FFFF |
| 0000026320 | 0000 | C483 | 8B28 | DE46 | 09E9 | E900 | 0006 | 468B |
| 0000026340 | E9F4 | 0000 | 5E1F | 835F | 02ED | E58B | 5D1F | CA4D |
| 0000026360 | 000A | 581E | 4590 | 8B55 | 1EEC | D88E | EC81 | 0000 |
| 0000026400 | 5657 | B81E | 249E | D88E | 186A | 109A | 4440 | 8328 |
| 0000026420 | 02C4 | 6CA3 | 8926 | 6E16 | A126 | 266E | 060B | 266C |
| 0000026440 | 0374 | 06E9 | B800 | FFFF | 88E9 | C400 | 6C1E | 2626 |
| 0000026460 | 47C7 | 010E | C400 | 6C1E | 2626 | 47C7 | 0110 | 6A00 |
| 0000026500 | 9A1E | 4010 | 287B | C483 | A302 | 2670 | 1689 | 2672 |
| 0000026520 | 72A1 | 0B26 | 7006 | 7426 | E903 | 0006 | FFB8 | E9FF |
| 0000026540 | 0051 | 1EC4 | 2670 | C726 | 0E47 | 0001 | 1EC4 | 2670 |
| 0000026560 | C726 | 1047 | 0002 | 246A | 109A | 8640 | 8326 | 02C4 |
| 0000026600 | 74A3 | 8926 | 7616 | A126 | 2676 | 060B | 2674 | 0374 |
| 0000026620 | 06E9 | B800 | FFFF | 1AE9 | C400 | 741E | 2626 | 47C7 |
| 0000026640 | 010E | C400 | 741E | 2626 | 47C7 | 0310 | B800 | 0000 |
| 0000026660 | 00E9 | 1F00 | 5F5E | ED83 | 8B02 | 1FE5 | 4D5D | 1ECB |
| 0000026700 | 9058 | 5545 | EC8B | 8E1E | 81D8 | 00EC | 5700 | 1E56 |
| 0000026720 | 04B8 | 8E28 | FFD8 | 6E36 | FF26 | 6C36 | 9A26 | 401A |
| 0000026740 | 28F0 | C483 | FF04 | 7236 | FF26 | 7036 | 9A26 | 401A |
| 0000026760 | 2900 | C483 | FF04 | 7636 | FF26 | 7436 | 9A26 | 401A |
| 0000027000 | 280D | C483 | 1F04 | 5F5E | ED83 | 8B02 | 1FE5 | 4D5D |
| 0000027020 | 1ECB | 9058 | 5545 | EC8B | 8E1E | 81D8 | 00EC | 5700 |
| 0000027040 | 1E56 | D1B8 | 8E28 | C4D8 | 065E | 8B26 | 2487 | E901 |
| 0000027060 | 004A | 1EC4 | 266C | C726 | 1447 | 0000 | 65E9 | C400 |
| 0000027100 | 6C1E | 2626 | 47C7 | C814 | E900 | 0058 | 1EC4 | 266C |
| 0000027120 | C726 | 1447 | 00D9 | 4BE9 | C400 | 6C1E | 2626 | 47C7 |
| 0000027140 | CE14 | E900 | 003E | 5EC4 | 2606 | 878B | 0124 | 1EC4 |
| 0000027160 | 266C | 8926 | 1447 | 2BE9 | E900 | 0028 | E52D | 75FF |
| 0000027200 | E903 | FFD5 | 082D | 7500 | E903 | FFCD | 4848 | 0375 |
| 0000027220 | B9E9 | 2DFF | 0010 | 0375 | A4E9 | 48FF | 0375 | 91E9 |
| 0000027240 | E9FF | FFC2 | 468B | 8B06 | 0856 | 0205 | 5200 | FF50 |
| 0000027260 | 6E36 | FF26 | 6C36 | 9A26 | FFFF | 0000 | 5E1F | 835F |
| 0000027300 | 02ED | E58B | 5D1F | CA4D | 0004 | 581E | 4590 | 8B55 |
| 0000027320 | 1EEC | D88E | EC81 | 0000 | 5657 | 1EC4 | 266C | C726 |
| 0000027340 | 1447 | 00D2 | 468B | 8B06 | 0856 | 0205 | 5200 | FF50 |
| 0000027360 | 6E36 | FF26 | 6C36 | 9A26 | 29B8 | 0000 | 5F5E | ED83 |
| 0000027400 | 8B02 | 1FE5 | 4D5D | 1ECB | 9058 | 5545 | EC8B | 8E1E |
| 0000027420 | 81D8 | 00EC | 5700 | C456 | 6C1E | 2626 | 47C7 | D314 |
| 0000027440 | 8B00 | 0646 | 568B | 0508 | 0002 | 5052 | 36FF | 266E |
| 0000027460 | 36FF | 266C | F89A | 0029 | 5E00 | 835F | 02ED | E58B |
| 0000027500 | 5D1F | CB4D | 581E | 4590 | 8B55 | 1EEC | D88E | EC81 |
| 0000027520 | 0000 | 5657 | 1EC4 | 266C | C726 | 1447 | 00C9 | 468B |
| 0000027540 | 8B06 | 0856 | 0205 | 5200 | FF50 | 6E36 | FF26 | 6C36 |
| 0000027560 | 9A26 | 2A35 | 0000 | 5F5E | ED83 | 8B02 | 1FE5 | 4D5D |
| 0000027600 | 1ECB | 9058 | 5545 | EC8B | 8E1E | 81D8 | 00EC | 5700 |
| 0000027620 | 1E56 | 23B8 | 8E29 | C4D8 | 065E | 8326 | 24BF | 0001 |
| 0000027640 | 0374 | 0DE9 | C400 | 701E | 2626 | 47C7 | 0014 | E900 |
| 0000027660 | 000A | 1EC4 | 2670 | C726 | 1447 | 00C8 | 5EC4 | 2606 |
| 0000027700 | 478A | 2A24 | C4E4 | 701E | 2626 | 4789 | 261A | 47C7 |
| 0000027720 | 001C | 8B00 | 0646 | 568B | 0508 | 0002 | 5052 | 36FF |
| 0000027740 | 2672 | 36FF | 2670 | 729A | 002A | 1F00 | 5F5E | ED83 |

THU MAR 14 17:27:50 1991 CRV_STI.DLL PAGE 14, LINE 768

| | | | | | | | | |
|---|---|---|---|---|---|---|---|---|
| 0000027760 | 8B02 | 1FE5 | 4D5D | 04CA | 1E00 | 9058 | 5545 | EC8B |
| 0000030000 | 8E1E | 81D8 | 00EC | 5700 | 1E56 | 93B8 | 8E2A | C4D8 |
| 0000030020 | 065E | 8326 | 24BF | 0001 | 0374 | 0DE9 | C400 | 741E |
| 0000030040 | 2626 | 47C7 | 0014 | E900 | 000A | 1EC4 | 2674 | C726 |
| 0000030060 | 1447 | 00C8 | 5EC4 | 2606 | 478B | 9928 | 1EC4 | 2674 |
| 0000030100 | 8926 | 1A47 | 8926 | 1C57 | 5EC4 | 2606 | 478B | 992A |
| 0000030120 | 1EC4 | 2674 | 8926 | 2047 | 8926 | 2257 | 468B | 8B06 |
| 0000030140 | 0856 | 0205 | 5200 | FF50 | 7636 | FF26 | 7436 | 9A26 |
| 0000030160 | 2AE7 | 0000 | 5E1F | 835F | 02ED | E58B | 5D1F | CA4D |
| 0000030200 | 0004 | 581E | 4590 | 8B55 | 1EEC | D88E | EC81 | 0000 |
| 0000030220 | 5657 | B81E | 2B0B | D88E | 5EC4 | 2606 | 878B | 0124 |
| 0000030240 | 4AE9 | C400 | 701E | 2626 | 47C7 | 0014 | E900 | 005C |
| 0000030260 | 1EC4 | 2670 | C726 | 1447 | 00C8 | 4FE9 | C400 | 701E |
| 0000030300 | 2626 | 47C7 | CD14 | E900 | 0042 | 1EC4 | 2670 | C726 |
| 0000030320 | 1447 | 00D9 | 35E9 | C400 | 065E | 8B26 | 2487 | C401 |
| 0000030340 | 701E | 2626 | 4789 | E914 | 0022 | 1FE9 | 2D00 | FFEE |
| 0000030360 | 0375 | C8E9 | 48FF | 0375 | CFE9 | 2DFF | 0010 | 0375 |
| 0000030400 | ADE9 | 48FF | 0375 | 9AE9 | E9FF | FFCB | 5EC4 | 2606 |
| 0000030420 | 478B | 2644 | 578B | C446 | 701E | 2626 | 4789 | 261A |
| 0000030440 | 5789 | 8B1C | 0646 | 568B | 0508 | 0002 | 5052 | 36FF |
| 0000030460 | 2672 | 36FF | 2670 | 709A | 002B | 1F00 | 5F5E | ED83 |
| 0000030500 | 8B02 | 1FE5 | 4D5D | 04CA | 1E00 | 9058 | 5545 | EC8B |
| 0000030520 | 8E1E | 81D8 | 00EC | 5700 | 1E56 | 94B8 | 8E2B | C4D8 |
| 0000030540 | 065E | 8B26 | 2487 | E901 | 0071 | 1EC4 | 2670 | C726 |
| 0000030560 | 1447 | 0000 | A3E9 | C400 | 701E | 2626 | 47C7 | C814 |
| 0000030600 | E900 | 0096 | 1EC4 | 2670 | C726 | 1447 | 00CD | 89E9 |
| 0000030620 | C400 | 701E | 2626 | 47C7 | D914 | E900 | 007C | 1EC4 |
| 0000030640 | 2670 | C726 | 1447 | 00D4 | 6FE9 | C400 | 701E | 2626 |
| 0000030660 | 47C7 | CE14 | E900 | 0062 | 1EC4 | 2670 | C726 | 1447 |
| 0000030700 | 00DA | 55E9 | C400 | 065E | 8B26 | 2487 | C401 | 701E |
| 0000030720 | 2626 | 4789 | E914 | 0042 | 3FE9 | 3D00 | FFEF | 0375 |
| 0000030740 | AEE9 | 7EFF | E903 | 0019 | E52D | 75FF | E903 | FFBB |
| 0000030760 | 7548 | E903 | FFC2 | 082D | 7500 | E903 | FF86 | C4E9 |
| 0000031000 | 2DFF | FFF0 | 0375 | 95E9 | 2DFF | 000F | 0375 | 66E9 |
| 0000031020 | 48FF | 0375 | 53E9 | E9FF | FFAB | 5EC4 | 2606 | 478B |
| 0000031040 | 2644 | 578B | C446 | 701E | 2626 | 4789 | 261A | 5789 |
| 0000031060 | 8B1C | 0646 | 568B | 0508 | 0002 | 5052 | 36FF | 2672 |
| 0000031100 | 36FF | 2670 | 379A | 002C | 1F00 | 5F5E | ED83 | 8B02 |
| 0000031120 | 1FE5 | 4D5D | 04CA | 1E00 | 9058 | 5545 | EC8B | 8E1E |
| 0000031140 | 81D8 | 00EC | 5700 | 1E56 | 5BB8 | 8E2C | 83D8 | 543E |
| 0000031160 | 0002 | 0375 | 46E9 | C400 | 701E | 2626 | 47C7 | D614 |
| 0000031200 | A1D0 | 0256 | 168B | 0258 | 1EC4 | 2670 | 8926 | 1A47 |
| 0000031220 | 8926 | 1C57 | 06C7 | 0254 | 0000 | C02B | 58A3 | A302 |
| 0000031240 | 0256 | 468B | 8B06 | 0856 | 0205 | 5200 | FF50 | 7236 |
| 0000031260 | FF26 | 7036 | 9A26 | 2DF6 | 0000 | 3DE9 | C400 | 065E |
| 0000031300 | 8326 | 24BF | 0001 | 0374 | 0DE9 | C400 | 6C1E | 2626 |
| 0000031320 | 47C7 | 0014 | E900 | 000A | 1EC4 | 266C | C726 | 1447 |
| 0000031340 | 00C8 | 468B | 8B06 | 0856 | 0205 | 5200 | FF50 | 6E36 |
| 0000031360 | FF26 | 6C36 | 9A26 | 2D45 | 0000 | 5E1F | 835F | 02ED |
| 0000031400 | E58B | 5D1F | CA4D | 0004 | 581E | 4590 | 8B55 | 1EEC |
| 0000031420 | D88E | EC81 | 0008 | 5657 | B81E | 2D69 | D88E | 1EC4 |
| 0000031440 | 2670 | C02B | 8926 | 1C47 | 8926 | 1A47 | 5EC4 | 2606 |
| 0000031460 | BF83 | 0124 | 7400 | E903 | 004B | 468D | 16FA | FF50 |
| 0000031500 | 0876 | 76FF | 9A06 | 2F57 | 28E0 | C483 | 8908 | F846 |
| 0000031520 | 7E83 | 00F8 | 0374 | 1FE9 | 8B00 | FA46 | 568B | C4FC |
| 0000031540 | 701E | 2626 | 4789 | 261A | 5789 | C41C | 701E | 2626 |
| 0000031560 | 47C7 | 0014 | E900 | 000A | 1EC4 | 2670 | C726 | 1447 |
| 0000031600 | FFE4 | 25E9 | C400 | 065E | 8326 | 24BF | EE01 | 0374 |
| 0000031620 | 0DE9 | C400 | 701E | 2626 | 47C7 | CD14 | E900 | 000A |

THU MAR 14 17:27:50 1991 CRV_STI.DLL PAGE 15, LINE 827

| | | | | | | | | |
|---|---|---|---|---|---|---|---|---|
| 0000031640 | 1EC4 | 2670 | C726 | 1447 | 00C8 | 468B | 8B06 | 0856 |
| 0000031660 | 0205 | 5200 | FF50 | 7236 | FF26 | 7036 | 9A26 | 2DB6 |
| 0000031700 | 0000 | 5E1F | 835F | 02ED | E58B | 5D1F | CA4D | 0004 |
| 0000031720 | 581E | 4590 | 8B55 | 1EEC | D88E | EC81 | 0008 | 5657 |
| 0000031740 | B81E | 2E1A | D88E | 5EC4 | 2606 | BF83 | 0124 | 7400 |
| 0000031760 | E903 | 004A | 468D | 16FA | FF50 | 0876 | 76FF | 9A06 |
| 0000032000 | 2F57 | 2F33 | C483 | 8908 | F846 | 7E83 | 00F8 | 0374 |
| 0000032020 | 16E9 | C700 | 5406 | 0102 | 8B00 | FA46 | 568B | A3FC |
| 0000032040 | 0256 | 1689 | 0258 | 15E9 | FF00 | F876 | 681E | 025A |
| 0000032060 | 529A | 4835 | 832E | 06C4 | 468B | E9F8 | 000B | 5EC4 |
| 0000032100 | 2606 | 878B | 0124 | 00E9 | 1F00 | 5F5E | ED83 | 8B02 |
| 0000032120 | 1FE5 | 4D5D | 04CA | 1E00 | 9058 | 5545 | EC8B | 8E1E |
| 0000032140 | 81D8 | 5EEC | 5700 | C456 | 0A5E | C02B | 8926 | 0247 |
| 0000032160 | 8926 | C407 | 065E | 8B26 | 1A47 | 69E9 | C600 | CA46 |
| 0000032200 | C702 | A646 | 0056 | 5EC4 | 2606 | 478B | 261C | 578B |
| 0000032220 | 891E | CC46 | 5689 | C4CE | 065E | 8B26 | 2047 | 8B26 |
| 0000032240 | 2257 | 4689 | 89D0 | D256 | 468B | 8B06 | 0856 | 2405 |
| 0000032260 | 5200 | 8D50 | D446 | 5016 | CE9A | 0242 | 832F | 08C4 |
| 0000032300 | 5EC4 | 2606 | 478B | 2644 | 578B | 8946 | F446 | 5689 |
| 0000032320 | 8DF6 | A246 | 4689 | 8CF8 | FA56 | 14E9 | B800 | FFE2 |
| 0000032340 | 62E9 | E900 | 000B | 182D | 7500 | E903 | FF8F | ECE9 |
| 0000032360 | C4FF | F85E | C02B | 8926 | 0247 | 8926 | 8E07 | 5E06 |
| 0000032400 | 2609 | 36FF | 0202 | FF26 | 0036 | 6802 | 008D | 76FF |
| 0000032420 | FFFA | F876 | 559A | 001F | 8900 | FC46 | 7E83 | 00FC |
| 0000032440 | 0375 | 06E9 | B800 | FFE4 | 1AE9 | C400 | F85E | 8B26 |
| 0000032460 | 2607 | 578B | C402 | 0A5E | 8926 | 2607 | 5789 | B802 |
| 0000032500 | 0000 | 00E9 | 5E00 | 835F | 02ED | E58B | 5D1F | CB4D |
| 0000032520 | 0000 | 0000 | 0000 | 0000 | 0000 | 0000 | 0000 | 0000 |
| 0000032540 | 8B55 | 1EEC | 7668 | 1E02 | 7A68 | 9A02 | FFFF | 0000 |
| 0000032560 | 068E | 0276 | A126 | 0015 | B6A3 | BB02 | 0280 | 1F8C |
| 0000032600 | 85BE | 8326 | FEE6 | 1E56 | FF9A | 00FF | 0B00 | 74C0 |
| 0000032620 | 3304 | EBC0 | 893A | 0477 | 894E | 7E36 | 8302 | 03EE |
| 0000032640 | 04C7 | 0001 | 7789 | 8906 | 0877 | C683 | C702 | FE04 |
| 0000032660 | 89FF | 0A77 | 681E | 0274 | 681E | 0272 | FF9A | 00FF |
| 0000032700 | E800 | 0020 | 249A | BB33 | E82F | 0066 | 01B8 | 5D00 |
| 0000032720 | 50CB | E29A | C732 | 9A30 | 345C | 30D5 | FF68 | 9A00 |
| 0000032740 | 31EB | 30DA | BB1E | 000D | FF33 | 068E | 0274 | FFB9 |
| 0000032760 | 267F | 3D80 | 7500 | 4701 | 8026 | 003D | 3174 | 94BE |
| 0000033000 | 8B02 | 8BD1 | F3CB | 8BA6 | 74CA | 3308 | F2C0 | 74AE |
| 0000033020 | EBE7 | 061C | 071E | F78B | BF1F | 02BB | 2CAC | 7241 |
| 0000033040 | C00E | 04E0 | AC92 | 412C | 0572 | C20A | EBAA | 1FED |
| 0000033060 | 00C3 | 02BB | 5200 | D48B | A780 | 02BB | 50B7 | C48B |
| 0000033100 | 1653 | 1650 | 9A52 | FFFF | 0000 | C00B | 7558 | B110 |
| 0000033120 | 3C40 | 7401 | 3C06 | 7502 | B106 | 0808 | BB8F | 4B02 |
| 0000033140 | D679 | E85A | 0026 | 48BE | BF09 | 0948 | 5FE8 | BE01 |
| 0000033160 | 0948 | 48BF | E809 | 0156 | 48B8 | 3D09 | 094C | 0B74 |
| 0000033200 | 016A | 680E | 31BD | FF9A | 00FF | C300 | 0E8B | 093E |
| 0000033220 | 2AE3 | 06C4 | 0940 | C28C | DB33 | 1EFF | 093C | 0373 |
| 0000033240 | 61E9 | 8E01 | 7A06 | 2602 | 1E8B | 0006 | 754B | C40D |
| 0000033260 | 4406 | 8C09 | BBC2 | 0003 | 1EFF | 093C | B8C3 | 2EE2 |
| 0000033300 | D88E | CBA1 | 0B04 | 75C0 | 0E10 | 36A1 | 0B09 | 75C0 |
| 0000033320 | E805 | 001F | 03EB | 24E8 | 6A00 | 6A03 | 6A00 | 9A00 |
| 0000033340 | 3187 | 0000 | 8B55 | 33EC | EBC9 | 551A | EC8B | 01B9 |
| 0000033360 | EB00 | 5512 | EC8B | 5756 | 00B9 | EB01 | 5508 | EC8B |
| 0000033400 | 5756 | 01B9 | E801 | 004B | 0A51 | 75C9 | BE12 | 2678 |
| 0000033420 | 78BF | E826 | 00B8 | 48BE | BF09 | 094C | AFE8 | BE00 |
| 0000033440 | 094C | 4CBF | E809 | 00A6 | 4CBE | BF09 | 094C | 9DE8 |
| 0000033460 | E800 | 008C | 0A58 | 75E4 | C713 | CB06 | 0104 | B800 |
| 0000033500 | 0001 | 8A50 | 0646 | 9A50 | FFFF | 0000 | 4EE8 | 5F00 |

THU MAR 14 17:27:50 1991 CRV_STI.DLL PAGE 16, LINE 886

| | | | | | | | | |
|---|---|---|---|---|---|---|---|---|
| 0000033520 | 5D5E | 55CB | EC8B | 0D6A | 4DE8 | 8311 | 02C4 | 068E |
| 0000033540 | 027A | 8B26 | 061E | 4B00 | 168B | 04CD | FA83 | 75FF |
| 0000033560 | 8904 | CD1E | 3904 | CD1E | 9F04 | 0D6A | 53E8 | 8311 |
| 0000033600 | 02C4 | 749E | 6A0A | E80E | 10FE | C483 | EB02 | 3BC7 |
| 0000033620 | 74D3 | 6A08 | E80E | 1110 | C483 | 5D02 | 55C3 | EC8B |
| 0000033640 | 0D6A | 03E8 | 8311 | 02C4 | 06C7 | 04CD | FFFF | 0D6A |
| 0000033660 | 1FE8 | 8311 | 02C4 | 0E6A | 17E8 | 8311 | 02C4 | C35D |
| 0000033700 | 0E8B | 093E | 07E3 | 02BB | FF00 | 3C1E | C309 | F73B |
| 0000033720 | 0E73 | EF83 | 8B04 | 0B05 | 0245 | F274 | 1DFF | EEEB |
| 0000033740 | 00C3 | 8B55 | B8EC | 00FC | 0E50 | 6FE8 | 8301 | D23E |
| 0000033760 | 0004 | 0474 | 1EFF | 04D0 | FFB8 | 5000 | E80E | 015C |
| 0000034000 | E58B | CB5D | 02B8 | E900 | FDC7 | 5A59 | DC8B | D82B |
| 0000034020 | 0B72 | FB81 | 0200 | 0572 | E38B | 5152 | 52CB | 3351 |
| 0000034040 | E9C0 | FDAD | 14C8 | 0000 | 5657 | FF2B | F78B | 3639 |
| 0000034060 | 0274 | 0375 | F0E9 | A100 | 0274 | C92B | 4E89 | 89F4 |
| 0000034100 | F646 | 4E89 | 89F8 | FA46 | 0C6A | 76FF | FFFA | F876 |
| 0000034120 | 681E | 0294 | 1C9A | 9843 | 8333 | 0AC4 | C00B | 1A74 |
| 0000034140 | 8146 | FFFE | 767F | E903 | 00BD | 5EC4 | FFF8 | F846 |
| 0000034160 | 8026 | 003F | EA75 | EB47 | 900D | 5EC4 | FFF8 | F846 |
| 0000034200 | 8026 | 003F | F475 | 5E8B | 26F8 | 3F80 | 7500 | 8DB9 |
| 0000034220 | 0145 | 6A50 | 9A04 | 459A | 33A7 | C483 | 8904 | F046 |
| 0000034240 | 5689 | 56F2 | 109A | DD40 | 8333 | 02C4 | 4689 | 89FC |
| 0000034260 | FE56 | 468B | 0BF2 | F046 | 6D74 | C28B | 460B | 74FC |
| 0000034300 | 8B66 | F046 | 568B | A3F2 | 04C1 | 1689 | 04C3 | 0C6A |
| 0000034320 | 76FF | FFF6 | F476 | 681E | 0294 | 1C9A | E243 | 8330 |
| 0000034340 | 0AC4 | C00B | 2C74 | 468B | 8BFC | FE56 | 5EC4 | 83F0 |
| 0000034360 | F046 | 2604 | 0789 | 8926 | 0257 | 5EC4 | FFF4 | F446 |
| 0000034400 | 8A26 | C407 | FC5E | 46FF | 26FC | 0788 | C00A | 0E74 |
| 0000034420 | E8EB | 5EC4 | FFF4. | F446 | 8026 | 003F | F475 | 5EC4 |
| 0000034440 | 26F4 | 3F80 | 7500 | 5EA7 | C95F | 90CB | 8B55 | 56EC |
| 0000034460 | B857 | 31BE | D88E | C08E | 568B | BE06 | 0968 | 3BAD |
| 0000034500 | 74C2 | 4010 | 7496 | 970C | C033 | FFB9 | F2FF | 8BAE |
| 0000034520 | EBF7 | 96EB | 5E5F | E58B | CA5D | 0002 | 8B55 | 57EC |
| 0000034540 | 76FF | 0E06 | C5E8 | 0BFF | 74C0 | 921F | FA8B | C033 |
| 0000034560 | FFB9 | F2FF | F7AE | 49D1 | 8B50 | BBC4 | 0002 | 1E53 |
| 0000034600 | 5152 | 5016 | FF9A | 00FF | 5B00 | 8B5F | 5DE5 | 02CA |
| 0000034620 | 0000 | 1601 | 0202 | 0203 | 1804 | 0D05 | 0906 | 0C07 |
| 0000034640 | 0C08 | 0C09 | 070A | 080B | 160C | 160D | 020F | 0D10 |
| 0000034660 | 1211 | 0212 | 0235 | 0D41 | 0243 | 0D52 | 0D53 | 0D57 |
| 0000034700 | 0B59 | 0D6C | 206D | 1C70 | 0972 | 1606 | 0A80 | 0A81 |
| 0000034720 | 0982 | 0D84 | 0BA4 | 02CE | 0BD7 | 0D00 | 1608 | 8B52 |
| 0000034740 | E8D8 | 103C | 8E93 | 5AC2 | 8926 | 0247 | 8926 | B817 |
| 0000034760 | FFFF | 8B99 | 5DE5 | E8CB | 0008 | FFB8 | 99FF | E58B |
| 0000035000 | CB5D | D88B | 19E8 | 9310 | C28E | 8926 | 0247 | BB53 |
| 0000035020 | 3492 | 24B9 | 0A00 | 75E4 | 2E1B | 073A | 1674 | 4343 |
| 0000035040 | F7E2 | 133C | 0472 | 243C | 0A76 | 3C43 | 72BC | 3C04 |
| 0000035060 | 76CA | 4301 | 8A2E | 0147 | 5B9B | 8926 | C307 | 8B55 |
| 0000035100 | BBEC | 0002 | 05EB | 8B55 | 33EC | E8DB | 0FD2 | C303 |
| 0000035120 | CB5D | 08C8 | 0000 | B857 | 0001 | E850 | 0DFA | C483 |
| 0000035140 | 1E02 | E668 | E804 | 016A | C483 | 8B04 | 8DF8 | 0A46 |
| 0000035160 | 5016 | 76FF | FF08 | 0676 | 681E | 04E6 | D09A | 5738 |
| 0000035200 | 8333 | 0CC4 | 4689 | 1EF8 | E668 | 5704 | BBE8 | 8301 |
| 0000035220 | 06C4 | 016A | CDE8 | 830D | 02C4 | 468B | 5FF8 | CBC9 |
| 0000035240 | 8B55 | 56EC | 8B57 | 0876 | 448A | A80A | 7482 | A864 |
| 0000035260 | 7540 | C760 | 0444 | 0000 | 01A8 | 0B74 | 10A8 | 5374 |
| 0000035300 | 4C8B | 8906 | 240C | 0CFE | 2402 | 88EF | 0A44 | FE8B |
| 0000035320 | EF81 | 04DA | C781 | 06BA | DB33 | 5C8A | A80B | 7508 |
| 0000035340 | A84B | 7504 | F618 | 0105 | 4275 | FE81 | 04E6 | 0674 |
| 0000035360 | FE81 | 04F2 | 2675 | 87F6 | 02BB | 7440 | B91F | 0001 |

THU MAR 14 17:27:50 1991 CRV_STI.DLL PAGE 17, LINE 945

| | | | | | | | | |
|---|---|---|---|---|---|---|---|---|
| 0000035400 | 1651 | 7E8D | 5706 | 0E53 | 31E8 | 8308 | 08C4 | 01B9 |
| 0000035420 | EB00 | B846 | FFFF | 4C80 | 200A | 65EB | 1E53 | E856 |
| 0000035440 | 0064 | C483 | 5B04 | 44F6 | 080A | D174 | 0C8B | 548B |
| 0000035460 | 2B06 | 42CA | 1489 | 558B | 4A02 | 5489 | E304 | 5125 |
| 0000035500 | FF51 | 0874 | 74FF | 5306 | E80E | 07F0 | C483 | 5908 |
| 0000035520 | 7CC4 | 8B06 | 0656 | 8826 | 3B15 | 75C1 | 33B6 | 8AC0 |
| 0000035540 | 0646 | 1DEB | C033 | 87F6 | 02BB | 7420 | B9E3 | 0002 |
| 0000035560 | 5051 | 5350 | E80E | 074C | C483 | 3308 | 8BC0 | EBC8 |
| 0000035600 | 5FCF | 5D5E | 00CB | 8B55 | 56EC | 768B | B804 | 0200 |
| 0000035620 | 9A50 | 4010 | 357F | 8B59 | 81DE | DAEB | 8104 | BAC3 |
| 0000035640 | 0B06 | 74D2 | 800B | 0A4C | C708 | 0247 | 0200 | 0EEB |
| 0000035660 | 4C80 | 040A | 47C7 | 0102 | 8C00 | 8DDA | 0147 | 5489 |
| 0000035700 | 8902 | 8904 | 0854 | 4489 | C706 | 0444 | 0000 | 5D5E |
| 0000035720 | 00C3 | 8B55 | 56EC | 8B57 | 0476 | 9EBB | 8108 | E6FE |
| 0000035740 | 7404 | BB09 | 08A2 | FE81 | 04F2 | 5875 | FE8B | EF81 |
| 0000035760 | 04DA | C781 | 06BA | 44F6 | 0C0A | 4875 | D5F6 | 7501 |
| 0000036000 | 8B43 | 8B07 | 0257 | C88B | CA0B | 2174 | 4489 | 8906 |
| 0000036020 | 0854 | 0489 | 5489 | C702 | 0444 | 0200 | 45C7 | 0002 |
| 0000036040 | 8002 | 0A4C | C602 | 1105 | 01B8 | EB00 | 5319 | 00B8 |
| 0000036060 | 5002 | 109A | 9440 | 5B36 | 0B5B | 74D2 | 8907 | 8907 |
| 0000036100 | 0257 | C8EB | C033 | 5E5F | C35D | 8B55 | 56EC | 8B57 |
| 0000036120 | 0676 | FE8B | EF81 | 04DA | C781 | 06BA | 05F6 | 7410 |
| 0000036140 | 332D | 8ADB | 0B5C | 87F6 | 02BB | 7440 | 1E21 | 0E56 |
| 0000036160 | 65E8 | 8300 | 04C4 | 7E83 | 0004 | 1274 | C033 | 0588 |
| 0000036200 | 4589 | 8902 | 8904 | 0244 | 4489 | 8906 | 0844 | 5E5F |
| 0000036220 | C35D | 04C8 | 0000 | 468B | 0B08 | 0646 | 0875 | 006A |
| 0000036240 | A7E8 | EB00 | 9031 | 468B | 2D06 | 04DA | 0CB9 | 9900 |
| 0000036260 | F9F7 | 4689 | 50FC | 9FE8 | 830B | 02C4 | 76FF | FF08 |
| 0000036300 | 0676 | D89A | 1C37 | 8338 | 04C4 | 4689 | FFFE | FC76 |
| 0000036320 | 91E8 | 8B0B | FE46 | CBC9 | 02C8 | 0000 | 5657 | FF2B |
| 0000036340 | 768B | 8A06 | 0A44 | C88B | 0324 | 023C | 3F75 | C1F6 |
| 0000036360 | 7508 | 8B0D | 81DE | DAEB | F604 | BA87 | 0106 | 2D74 |
| 0000036400 | 048B | 442B | 8906 | FE46 | C00B | 217E | FF50 | 0874 |
| 0000036420 | 74FF | 8A06 | 0B4C | ED2A | 9A51 | 3E3C | 3899 | C483 |
| 0000036440 | 3908 | FE46 | 0774 | 4C80 | 200A | FFBF | 8BFF | 0644 |
| 0000036460 | 548B | 8908 | 8904 | 0254 | 44C7 | 0004 | 8B00 | 5EC7 |
| 0000036500 | C95F | 90CB | 016A | 01E8 | CB00 | 04C8 | 0000 | 5657 |
| 0000036520 | DABE | 2B04 | 89FF | FE7E | 026A | 4BE8 | 830B | 02C4 |
| 0000036540 | 11EB | 46C7 | FFFE | FFFF | FC76 | F7E8 | 830A | 02C4 |
| 0000036560 | C683 | 390C | 9A36 | 7208 | 8B2B | 2DC6 | 04DA | 0CB9 |
| 0000036600 | 9900 | F9F7 | 4689 | 50FC | CDE8 | 830A | 02C4 | 44F6 |
| 0000036620 | 830A | D374 | 561E | D89A | 3537 | 8337 | 04C4 | 7440 |
| 0000036640 | 47C1 | C3EB | 026A | 29E8 | 830B | 02C4 | 7E83 | 0104 |
| 0000036660 | 0475 | C78B | 03EB | 468B | 5EFE | C95F | 02C2 | 9000 |
| 0000036700 | 3928 | 3933 | 3949 | 397D | 39A9 | 39B1 | 39DA | 3A0C |
| 0000036720 | 8B55 | B8EC | 0171 | E80E | FA30 | 5756 | C033 | 4689 |
| 0000036740 | 88F8 | FB46 | 76C4 | 260A | 89AC | 0A76 | 4688 | 0AFE |
| 0000036760 | 74C0 | 8306 | F87E | 7D00 | 8B06 | F846 | B5E9 | BB04 |
| 0000037000 | 08A6 | 202C | 583C | 0577 | 24D7 | EB0F | B002 | B100 |
| 0000037020 | D203 | 02E0 | FB46 | FED7 | D2C1 | 88E8 | FB46 | 8B98 |
| 0000037040 | D1D8 | 2EE3 | A7FF | 38C0 | 568A | B9FE | 0001 | 36E8 |
| 0000037060 | EB04 | 33B1 | 89C0 | F046 | 4689 | 89F6 | EE46 | 46C7 |
| 0000037100 | 20FC | 4800 | 4689 | EBF4 | 8A9B | FE46 | 2D3C | 0675 |
| 0000037120 | 4E80 | 04FC | 8EEB | 2B3C | 0675 | 4E80 | 01FC | 84EB |
| 0000037140 | 203C | 0775 | 4E80 | 02FC | 79E9 | 3CFF | 7523 | 8007 |
| 0000037160 | FC4E | E980 | FF6E | 4E80 | 08FC | 67E9 | 8AFF | FE4E |
| 0000037200 | F980 | 752A | E80F | 035C | C00B | 1779 | D8F7 | 4E80 |
| 0000037220 | 04FC | 0FEB | E980 | 3230 | 8BED | F646 | 0ABB | F700 |
| 0000037240 | 03E3 | 89C1 | F646 | 3BE9 | C7FF | F446 | 0000 | 33E9 |

THU MAR 14 17:27:50 1991 CRV_STI.DLL PAGE 18, LINE 1004

| | | | | | | | | |
|---|---|---|---|---|---|---|---|---|
| 0000037260 | 8AFF | FE4E | F980 | 752A | E80C | 0328 | C00B | 1479 |
| 0000037300 | FFB8 | EBFF | 800F | 30E9 | ED32 | 468B | BBF4 | 000A |
| 0000037320 | E3F7 | C103 | 4689 | E9F4 | FF0A | 468A | 3CFE | 756C |
| 0000037340 | 8006 | FC4E | EB10 | 3C22 | 7546 | 8006 | FC4E | EB20 |
| 0000037360 | 3C18 | 754E | 8006 | FD4E | EB10 | 3C0E | 754C | 8006 |
| 0000037400 | FD4E | EB04 | 8004 | FD4E | E908 | FED8 | 468A | 3CFE |
| 0000037420 | 7564 | E903 | 0194 | 693C | 0375 | 8DE9 | 3C01 | 7575 |
| 0000037440 | E903 | 018A | 583C | 0375 | 89E9 | 3C01 | 7578 | E903 |
| 0000037460 | 0188 | 6F3C | 0375 | A2E9 | 3C01 | 7463 | 3C1A | 7473 |
| 0000037500 | 3C27 | 746E | 3C51 | 7470 | 3C60 | 7445 | 3C07 | 7447 |
| 0000037520 | E903 | 00BB | B5E9 | E800 | 028A | BE8D | FE8F | 0716 |
| 0000037540 | 4FAA | 01B9 | E900 | 01F1 | 90E8 | 0B02 | 75FF | 8C12 |
| 0000037560 | 0BC0 | 75C0 | 1E0C | BF07 | 08FF | 0E8B | 0905 | D8E9 |
| 0000037600 | 5701 | 4E8B | E3F4 | 3207 | F2C0 | 75AE | 4F01 | 2B59 |
| 0000037620 | 87F9 | E9CF | 01C3 | 62E8 | 8B02 | F846 | F6AB | FC46 |
| 0000037640 | 7410 | 3303 | ABCD | 3BE9 | F6FE | FC46 | 7530 | E805 |
| 0000037660 | 0232 | 39EB | 36E8 | F602 | FD46 | 7518 | C630 | FF46 |
| 0000037700 | B907 | 0010 | 0716 | 3352 | 8DD2 | 97BE | BEFE | 0004 |
| 0000037720 | B0E8 | B902 | 0010 | BE8D | FE92 | 3358 | BED2 | 0004 |
| 0000037740 | A0E8 | C602 | 9386 | 3AFE | 09B9 | EB00 | C618 | FF46 |
| 0000037760 | B907 | 0010 | 0716 | D233 | BE8D | FE92 | 04BE | E800 |
| 0000040000 | 0281 | 04B9 | 8D00 | 8FBE | E9FE | 014D | 46FF | 80EE |
| 0000040020 | FC4E | 8A40 | FE46 | 200C | 8B98 | 83F0 | F47E | 7F00 |
| 0000040040 | 7413 | C707 | F446 | 0006 | 0AEB | 673D | 7500 | C705 |
| 0000040060 | F446 | 0001 | BE8D | FE8F | 76FF | FFEE | F476 | 1656 |
| 0000040100 | FF57 | 1076 | 76FF | F60E | FD46 | 7404 | FF0A | 2C1E |
| 0000040120 | 8309 | 0E46 | EB0A | FF08 | 181E | 8309 | 0E46 | 8308 |
| 0000040140 | 0EC4 | 46F6 | 80FC | 0F74 | 7E83 | 00F4 | 0975 | 5716 |
| 0000040160 | 1EFF | 0924 | C483 | 8304 | 67FE | 1075 | 46F7 | 80FC |
| 0000040200 | 7500 | 1609 | FF57 | 1C1E | 8309 | 04C4 | 0716 | 8026 |
| 0000040220 | 2D3D | 0575 | 8047 | FD4E | B901 | FFFF | B057 | F200 |
| 0000040240 | 4FAE | 2B59 | 87F9 | E9CF | 00AF | 4E80 | 40FC | 46C6 |
| 0000040260 | 0AFA | 35EB | 46C6 | 07FF | 04EB | 46C6 | 27FF | 46F6 |
| 0000040300 | 80FC | 1174 | 46C7 | 02F0 | C600 | F246 | B230 | 0251 |
| 0000040320 | FF56 | 5688 | C6F3 | FA46 | EB10 | F60E | FC46 | 7480 |
| 0000040340 | 8004 | FD4E | C602 | FA46 | F608 | FC46 | 7410 | E805 |
| 0000040360 | 00FB | 0EEB | EDE8 | F600 | FC46 | 7440 | 9903 | 02EB |
| 0000040400 | D233 | 46F6 | 40FC | 0F74 | D20B | 0B7D | 4E80 | 01FD |
| 0000040420 | D8F7 | D283 | F700 | 83DA | F47E | 7D00 | C707 | F446 |
| 0000040440 | 0001 | 04EB | 6680 | F7FC | D88B | DA0B | 0575 | 46C7 |
| 0000040460 | 00F0 | 8D00 | EB7E | 0716 | 4E8A | 32FA | 8BED | F476 |
| 0000040500 | 40E8 | F601 | FD46 | 7402 | E30E | 2606 | 3D80 | 7430 |
| 0000040520 | 4F06 | C626 | 3005 | EB41 | F600 | FC46 | 7440 | F631 |
| 0000040540 | FD46 | 7401 | C60B | F246 | C72D | F046 | 0001 | 20EB |
| 0000040560 | 46F6 | 01FC | 0B74 | 46C6 | 2BF2 | 46C7 | 01F0 | EB00 |
| 0000040600 | F60F | FC46 | 7402 | C609 | F246 | C720 | F046 | 0001 |
| 0000040620 | 468B | 2BF6 | 2BC1 | F046 | 027D | C033 | 5706 | F651 |
| 0000040640 | FC46 | 750C | 8B07 | B2C8 | E820 | 00BB | 1650 | 8D07 |
| 0000040660 | F27E | 4E8B | E8F0 | 0091 | F658 | FC46 | 7408 | F60D |
| 0000040700 | FC46 | 7504 | 8B07 | B2C8 | E830 | 009B | 5F59 | 5007 |
| 0000040720 | 76E8 | 5800 | 46F6 | 04FC | 0774 | C88B | 20B2 | 86E8 |
| 0000040740 | E900 | FC00 | 76C4 | 260E | 89AD | 0E76 | C4C3 | 0E76 |
| 0000040760 | AD26 | D08B | AD26 | 8992 | 0E76 | F6C3 | FC46 | 7420 |
| 0000041000 | E808 | FFE9 | C28E | F88B | E8C3 | FFD8 | F88B | C00B |
| 0000041020 | 0375 | C08E | 1EC3 | C307 | D698 | C457 | 065E | FF26 |
| 0000041040 | 044F | 1078 | 8B26 | 263F | D7FF | 8E26 | 0247 | 33AA |
| 0000041060 | 5FC0 | C307 | 5251 | 5306 | 0E50 | 63E8 | 83F8 | 06C4 |
| 0000041100 | 595A | FF3D | 75FF | EBE8 | E3E8 | 8B1B | 01F7 | F84E |
| 0000041120 | 3357 | 26FF | E8AC | FFC0 | F80B | F7E2 | FF0B | 745F |

THU MAR 14 17:27:50 1991 CRV_STI.DLL PAGE 19, LINE 1063

| | | | | | | | | |
|---|---|---|---|---|---|---|---|---|
| 0000041140 | C705 | F846 | FFFF | E3C3 | 0119 | F84E | 3357 | 8AFF |
| 0000041160 | E8C2 | FFA4 | F80B | F7E2 | FF0B | 745F | C705 | F846 |
| 0000041200 | FFFF | FDC3 | 9357 | F60B | 0A7F | DB0B | 0675 | D20B |
| 0000041220 | 0275 | 1AEB | 3392 | F7D2 | 93F1 | F1F7 | 8792 | 04D3 |
| 0000041240 | 3C30 | 7639 | 0203 | FF46 | 8BAA | 4EC2 | D8EB | 2B59 |
| 0000041260 | 47CF | C3FC | 5E5F | E58B | CB5D | 8B55 | 83EC | 02EC |
| 0000041300 | C033 | 09EB | 8B55 | 83EC | 02EC | FFB8 | 89FF | FE46 |
| 0000041320 | 5E8B | 3B06 | B91E | 7202 | BA19 | 0009 | C033 | FDE9 |
| 0000041340 | 8BF6 | FE4E | C90B | 0774 | E853 | 0590 | C483 | E902 |
| 0000041360 | F705 | C00B | 0774 | E853 | 0576 | C483 | 8302 | 04EC |
| 0000041400 | CC8B | FF53 | 0A76 | 76FF | FF08 | 0C76 | 5116 | FF9A |
| 0000041420 | 00FF | 5900 | 855A | 75C0 | 80C8 | BBA7 | FD02 | 468B |
| 0000041440 | 0BFE | 74C0 | 5307 | 53E8 | 8305 | 02C4 | 8B91 | 5DE5 |
| 0000041460 | 00CB | 8B55 | 83EC | 0EEC | C033 | 09EB | 8B55 | 83EC |
| 0000041500 | 0EEC | FFB8 | 89FF | F246 | 5E8B | 3B06 | B91E | 7202 |
| 0000041520 | BA08 | 0009 | C033 | 85E9 | 0BF6 | 74C0 | 5307 | 0FE8 |
| 0000041540 | 8305 | 02C4 | 87F6 | 02BB | 7420 | 5312 | C933 | 5151 |
| 0000041560 | 4141 | 8D51 | F446 | 5016 | 0F9A | 003E | F600 | BB87 |
| 0000041600 | 8002 | 6674 | 5E8C | 8EFA | 0A46 | 56C5 | 3308 | 89C0 |
| 0000041620 | FE46 | 4689 | FCFC | 5657 | FA8B | F28B | 6689 | 8BF8 |
| 0000041640 | 0C4E | 28E3 | 0AB0 | AEF2 | 3B75 | EC83 | 8B02 | BADC |
| 0000041660 | 0080 | E22B | D48B | FA8B | 0716 | 4E8B | AC0C | 0A3C |
| 0000041700 | 0D74 | FB3B | 1A74 | E2AA | E8F4 | 0038 | AFE9 | B000 |
| 0000041720 | 3B0D | 75FB | E803 | 002C | B0AA | FF0A | FC46 | E2EB |
| 0000041740 | 21E8 | EB00 | 5EE1 | 8E5F | FA5E | C8E9 | 8B00 | F246 |
| 0000041760 | C00B | 0974 | 76FF | E806 | 0482 | C483 | B802 | FFFC |
| 0000042000 | E80E | F406 | 5350 | 1E51 | 1F06 | CF8B | CA2B | 21E3 |
| 0000042020 | 8B51 | 065E | 1E53 | 5152 | 468D | 16F4 | 9A50 | 3485 |
| 0000042040 | 0000 | 0B59 | 75C0 | 8B11 | F45E | 5E01 | 3BFE | 72D9 |
| 0000042060 | 1F07 | 5B59 | 8B58 | C3FA | 831F | 08C4 | 7E83 | 00FE |
| 0000042100 | 3C75 | C00B | 1874 | 6D3D | 7400 | 3D0D | 0001 | 09BA |
| 0000042120 | 7500 | BA08 | 001C | 03EB | 20BA | F900 | 26EB | 5E8E |
| 0000042140 | F6FA | BB87 | 4002 | 0E74 | 5E8E | 8B0A | 085E | 3F80 |
| 0000042160 | 751A | F803 | 0EEB | 1CBA | 3300 | F9C0 | 06EB | 468B |
| 0000042200 | 2BFE | FC46 | 668B | 5EF8 | 8E5F | FA5E | 1472 | 5E8B |
| 0000042220 | 0BF2 | 74DB | FF09 | 0676 | E1E8 | 8303 | 02C4 | E58B |
| 0000042240 | CB5D | 5E8B | 0BF2 | 74DB | FF09 | 0676 | CDE8 | 8303 |
| 0000042260 | 02C4 | 29E9 | 8BF5 | 0C4E | C90B | 0475 | C18B | CEEB |
| 0000042300 | C51E | 0856 | 1E53 | 5152 | 468D | 16F4 | 9A50 | 3F1E |
| 0000042320 | 0000 | 071E | 0B1F | 74C0 | 3D17 | 006D | 0D74 | 013D |
| 0000042340 | BA00 | 0009 | BC75 | 1CBA | EB00 | BAB7 | 0020 | B2EB |
| 0000042360 | 468B | 0BF4 | 75C0 | F697 | BB87 | 4002 | 0A74 | DA8B |
| 0000042400 | 8026 | 1A3F | 0275 | 86EB | 1CBA | 3300 | EBC0 | 0093 |
| 0000042420 | 37EA | C540 | EA37 | 4056 | 4013 | 24EA | 1840 | EA40 |
| 0000042440 | 4024 | 401D | 8B55 | 56EC | 76C4 | 8C06 | E3C1 | 2605 |
| 0000042460 | 4C80 | 01FE | 5D5E | 55CB | EC8B | 096A | 69E8 | 8303 |
| 0000042500 | 02C4 | 76FF | 0E06 | 0DE8 | 5B00 | 096A | 83E8 | 8303 |
| 0000042520 | 02C4 | E58B | CB5D | 8B55 | 56EC | 8B57 | 064E | F983 |
| 0000042540 | 77E8 | 1E69 | 0AA1 | 0B09 | 74C0 | BF48 | 413E | 368B |
| 0000042560 | 0912 | 1EC5 | 090C | 561E | FF57 | 5FD7 | 735E | 8C2B |
| 0000042600 | C5DA | 0C5F | D63B | EF75 | 1F58 | C41E | 0C36 | 2609 |
| 0000042620 | 748B | C512 | 081E | 8C09 | 3BDA | 75D0 | 1FD9 | 811E |
| 0000042640 | BAFF | 7441 | BF0E | 41BA | C4EB | 815E | 3EFF | 7441 |
| 0000042660 | EB0F | 07DA | BF06 | 0908 | E1E8 | 7201 | E80E | 007E |
| 0000042700 | 891F | 0E16 | 8909 | 0C1E | EB09 | 1F04 | C033 | 5F99 |
| 0000042720 | 5D5E | 00CB | 5706 | F88B | FB03 | 7F89 | 4F04 | 2D4F |
| 0000042740 | 0016 | 778D | C714 | FE05 | 89FF | 0A7F | 8948 | 8C04 |
| 0000042760 | 8B1F | 8CC6 | 8EDA | 8DC2 | 067F | ABFC | 47AB | 3347 |
| 0000043000 | ABC0 | ABAB | 5FAB | C307 | 8B26 | 0245 | C00B | 0975 |

THU MAR 14 17:27:50 1991 CRV_STI.DLL PAGE 20, LINE 1122

| | | | | | | | | |
|---|---|---|---|---|---|---|---|---|
| 0000043020 | 8C26 | 025D | 8926 | EB1D | 0614 | C426 | 0875 | 8C26 |
| 0000043040 | 0E5C | 8926 | 0C5C | 478C | 8912 | 1077 | 2607 | 5D8C |
| 0000043060 | 260A | 5D89 | 2608 | 5D8C | 2606 | 5D89 | C304 | 8041 |
| 0000043100 | FEE1 | FC53 | 778B | 8B08 | 0A5F | FF33 | 23EB | C38B |
| 0000043120 | A85B | 7501 | 5342 | 778B | 8B06 | 085F | DE3B | 3674 |
| 0000043140 | 334B | EBFF | 900C | 548D | 3BFE | 73D3 | 03E1 | 72F0 |
| 0000043160 | AD23 | 01A8 | F074 | FE8B | 3B48 | 73C1 | 0323 | 72F0 |
| 0000043200 | 8B13 | ADD0 | 01A8 | DE74 | C203 | 0205 | 8B00 | 89F7 |
| 0000043220 | FE44 | E4EB | C08B | 8B5B | 0647 | 4789 | F908 | 19EB |
| 0000043240 | 895B | FE4C | 0974 | F903 | C12B | 8948 | 2B05 | 03F9 |
| 0000043260 | 89F9 | 087F | C68B | DA8C | C3F8 | 5751 | 47F6 | 0102 |
| 0000043300 | 6674 | B7E8 | 8B00 | 8BFE | A804 | 7401 | 2B03 | 49C8 |
| 0000043320 | 4141 | 778B | 0B04 | 74F6 | 034F | 73CE | 3309 | BAC0 |
| 0000043340 | FFF0 | 33E3 | 42EB | 32B8 | 8E34 | 26C0 | 16A1 | 3D09 |
| 0000043360 | 2000 | 1674 | 00BA | 3B80 | 72D0 | D106 | 75EA | EBF8 |
| 0000043400 | 8322 | 08FA | 1D72 | E2D1 | C28B | 8B48 | 03D0 | 73C1 |
| 0000043420 | 3302 | F7C0 | 23D2 | 52C2 | 2EE8 | 5A00 | 0D73 | FA83 |
| 0000043440 | 74F0 | B805 | 0010 | E2EB | EBF9 | 8B1B | 2BD0 | 0457 |
| 0000043460 | 4789 | 8904 | 087F | 778B | 4A0A | 1489 | 0342 | C7F2 |
| 0000043500 | FE04 | 89FF | 0A77 | 595F | 8BC3 | F6D0 | 0247 | 7404 |
| 0000043520 | 4A0F | 778B | 4E04 | D63B | 0572 | 5739 | 73FE | 4218 |
| 0000043540 | 1E50 | 899A | 0030 | 0B00 | 75C0 | 8B0F | F6C2 | 0247 |
| 0000043560 | 7404 | 4A04 | 5789 | F8FE | 01EB | C3F9 | 8B57 | 0877 |
| 0000043600 | 773B | 750A | 8B03 | 0677 | 3DAD | FFFE | 0874 | FE8B |
| 0000043620 | FE24 | F003 | F2EB | 4F4F | F78B | C35F | D18B | C283 |
| 0000043640 | 8027 | F0E2 | 8B50 | 52C4 | 5016 | C033 | 9A50 | FFFF |
| 0000043660 | 0000 | 0B1F | 75C0 | 3314 | 26DB | 458B | 890C | 0247 |
| 0000043700 | C28B | 0FE8 | E8FE | FE40 | EBF8 | F901 | 00C3 | 8B55 |
| 0000043720 | 8BEC | 8BD7 | 1EDE | 76C5 | 8B0A | 8CFE | 8ED8 | 33C0 |
| 0000043740 | B9C0 | FFFF | AEF2 | D1F7 | 7EC4 | 8B06 | A8C7 | 7401 |
| 0000043760 | A402 | D149 | F3E9 | 13A5 | F3C9 | 8BA4 | 8BF3 | 1FFA |
| 0000044000 | C28C | CB5D | 8B55 | 8BEC | C4D7 | 067E | C033 | FFB9 |
| 0000044020 | F2FF | F7AE | 49D1 | 8B91 | 5DFA | 00CB | 8B55 | 57EC |
| 0000044040 | 1E56 | 4E8B | E30E | 8B27 | C4D9 | 067E | F78B | C033 |
| 0000044060 | AEF2 | D9F7 | CB03 | FE8B | 76C5 | F30A | 8AA6 | FF44 |
| 0000044100 | C933 | 3A26 | FF45 | 0477 | 0474 | 4949 | D1F7 | C18B |
| 0000044120 | 5E1F | 8B5F | 5DE5 | 00CB | 8B55 | 50EC | 468B | 0504 |
| 0000044140 | 0014 | 4BEB | 8B55 | 50EC | 468B | 0504 | 0014 | 69EB |
| 0000044160 | 8B55 | 50EC | 468B | 0504 | 0114 | 33EB | 8B55 | 50EC |
| 0000044200 | 468B | 0504 | 0114 | 51EB | 8B55 | 50EC | 468B | C104 |
| 0000044220 | 02E0 | FF68 | 50FF | FF6A | FF6A | 359A | 0009 | 0B00 |
| 0000044240 | 75C0 | 5829 | E58B | C35D | 8B55 | 50EC | 468B | FF04 |
| 0000044260 | 3606 | C109 | 02E0 | 9368 | 5043 | FF6A | FF6A | FF9A |
| 0000044300 | 00FF | 0B00 | 75C0 | 5805 | E58B | C35D | 11B8 | E900 |
| 0000044320 | ECFF | 8B55 | 50EC | 468B | C104 | 02E0 | B768 | 5043 |
| 0000044340 | FF9A | 0008 | 0B00 | 75C0 | FFE3 | 360E | 5809 | E58B |
| 0000044360 | C35D | 8B55 | FFEC | 0676 | ADE8 | 83FF | 02C4 | E58B |
| 0000044400 | CB5D | 8B55 | FFEC | 0676 | C7E8 | 83FF | 02C4 | E58B |
| 0000044420 | CB5D | 8B55 | 1EEC | 8B07 | 0E4E | C90B | 3174 | C1F6 |
| 0000044440 | 7501 | 8B2C | 0C56 | 468B | 8B0A | 0BD8 | 75DA | 5112 |
| 0000044460 | 109A | 2240 | 5940 | D88B | DA0B | 1374 | D88B | EB43 |
| 0000044500 | 0B0A | 74D2 | A80A | 7501 | 8B06 | 03D8 | 73C1 | BA08 |
| 0000044520 | 0016 | C033 | 87E9 | 6AF0 | 8BFF | 52CC | 5653 | 0E57 |
| 0000044540 | 9768 | 1644 | 5251 | 8B50 | 084E | 568B | 8B06 | 1276 |
| 0000044560 | 7E8B | 9A10 | FFFF | 0000 | 5E5F | C00B | 1374 | F65B |
| 0000044600 | 01C3 | 0A74 | 534B | 1A9A | 3340 | 8344 | 04C4 | 66E9 |
| 0000044620 | 83F0 | 04C4 | 5D58 | 56CB | 0E57 | F368 | 5144 | E852 |
| 0000044640 | 007E | 8E93 | 26C2 | 578B | 0B22 | 74D2 | 5015 | 0653 |
| 0000044660 | 2652 | 77FF | 9A20 | 401A | 4489 | C483 | 0704 | 585B |

THU MAR 14 17:27:50 1991 CRV_STI.DLL PAGE 21, LINE 1181

| | | | | | | | | |
|---|---|---|---|---|---|---|---|---|
| 0000044700 | D233 | 8926 | 2617 | 5789 | 2602 | 5789 | 2608 | 5789 |
| 0000044720 | 260A | 5789 | 2620 | 5789 | A822 | 7401 | 4809 | 8C26 |
| 0000044740 | 2257 | 8926 | 2047 | 0005 | 2602 | 4789 | 3304 | E8ED |
| 0000044760 | EC9A | 55CB | EC8B | C7E8 | E8ED | 0024 | D88B | C28E |
| 0000045000 | C033 | 8926 | 2607 | 4789 | 2602 | 4789 | 2608 | 4789 |
| 0000045020 | 260A | 47C7 | 0004 | 6A02 | 6A00 | 9A00 | 3248 | 0000 |
| 0000045040 | 068E | 027A | A126 | 0006 | 3B48 | 3806 | 7709 | C107 |
| 0000045060 | 06ED | FFBA | C3FF | 5357 | 6A51 | E80F | FE6A | C483 |
| 0000045100 | 3B02 | 3806 | 7609 | 8B40 | 05D8 | 0004 | FC25 | 8BFF |
| 0000045120 | C1C8 | 06E0 | 33BA | 5045 | 9A52 | 4263 | 0000 | C00B |
| 0000045140 | 3275 | 8B49 | 87F9 | 383E | 2B09 | 51CF | C147 | 06E7 |
| 0000045160 | E1G1 | 5705 | C28E | ABF3 | 595F | C726 | 0445 | 0200 |
| 0000045200 | C783 | E240 | 8BF5 | 6AC3 | E80F | FE46 | C483 | 5902 |
| 0000045220 | 5F5B | 9BEB | 10B8 | E900 | EB37 | 8B55 | 57EC | 468B |
| 0000045240 | F706 | 0866 | 0573 | C033 | EB99 | 501A | 109A | B840 |
| 0000045260 | 5944 | D88B | DA0B | 0D74 | 8B50 | 8EF8 | 33C2 | 41C0 |
| 0000045300 | E9D1 | ABF3 | 5F58 | CB5D | 8B55 | 8BEC | 0E4E | 571E |
| 0000045320 | E356 | C548 | 0A76 | 7EC4 | 8B06 | 48C1 | D78B | D2F7 |
| 0000045340 | C22B | DB1B | C323 | C203 | D68B | D2F7 | C22B | DB1B |
| 0000045360 | C323 | C203 | 9140 | C12B | E9D1 | A5F3 | C913 | A4F3 |
| 0000045400 | E391 | 0B18 | 75F6 | 8C07 | 05D8 | FFFF | D88E | FF0B |
| 0000045420 | C775 | C08C | 0A05 | 8E46 | EBC0 | 8BBE | 0646 | 568B |
| 0000045440 | 5E08 | 1F5F | CB5D | 002C | 0002 | 45AF | 0001 | 0000 |
| 0000045460 | 0103 | 1B58 | 0004 | 0064 | 0203 | 258F | 0003 | 006E |
| 0000045500 | 0205 | 24EA | 0003 | 0028 | 0002 | 4555 | 0002 | 0000 |
| 0000045520 | 0002 | 43DD | 0003 | 0000 | 0103 | 451C | 0001 | 0005 |
| 0000045540 | 0103 | 31E0 | 0001 | 0007 | 0002 | 0808 | 0004 | 0000 |
| 0000045560 | 0103 | 306C | 0001 | 0008 | 0103 | 07E1 | 0002 | 0001 |
| 0000045600 | 0103 | 3FCE | 0001 | 008A | 0002 | 41E7 | 0005 | 0000 |
| 0000045620 | 0103 | 43BF | 0001 | 008C | 0103 | 43E1 | 0001 | 008D |
| 0000045640 | 0203 | 25FE | 0003 | 007D | 0205 | 258C | 0003 | 0036 |
| 0000045660 | 0103 | 439B | 0001 | 008E | 0103 | 08F6 | 0001 | 008F |
| 0000045700 | 0103 | 4474 | 0001 | 0091 | 0103 | 0508 | 0001 | 0095 |
| 0000045720 | 0103 | 0911 | 0001 | 0016 | 0203 | 24D4 | 0003 | 008B |
| 0000045740 | 0103 | 128A | 0004 | 0003 | 0105 | 4615 | 0001 | 0088 |
| 0000045760 | 0103 | 42AE | 0001 | 0022 | 0103 | 455A | 0001 | 0026 |
| 0000046000 | 0103 | 038D | 0005 | 000B | 0103 | 2751 | 0005 | 000C |
| 0000046020 | 0103 | 0819 | 0005 | 000D | 0103 | 2EBE | 0005 | 0010 |
| 0000046040 | 0103 | 0DFC | 0004 | 001B | 0202 | 2589 | 0003 | 0036 |
| 0000046060 | 0103 | 3E79 | 0001 | 003A | 0103 | 16C8 | 0004 | 002D |
| 0000046100 | 0005 | 078B | 0001 | 07B3 | 0103 | 3146 | 0001 | 004D |
| 0000046120 | 0203 | 251D | 0003 | 0040 | 0103 | 3015 | 0004 | 003C |
| 0000046140 | 0103 | 30BD | 0001 | 005B | 0103 | 1852 | 0004 | 0046 |
| 0000046160 | 0203 | 2703 | 0003 | 004F | 0203 | 020A | 0003 | 005F |
| 0000046200 | 0205 | 2546 | 0003 | 001A | 0000 | 0000 | 0000 | 0000 |
| 0000046220 | 0000 | 0000 | 0200 | 0000 | 0000 | 0000 | 0000 | 0000 |
| 0000046240 | 0000 | 0000 | 0000 | 0000 | 0000 | 0000 | 0000 | 0000 |
| * | | | | | | | | |
| 0000046320 | 0000 | 0000 | 0200 | 0000 | 0000 | 0000 | 0000 | 0000 |
| 0000046340 | 0000 | 0000 | 0000 | 0000 | 0000 | 0000 | 0000 | 0000 |
| * | | | | | | | | |
| 0000046420 | 0000 | 0000 | 0200 | 0000 | 0000 | 0000 | 0000 | 0000 |
| 0000046440 | 0000 | 0000 | 0000 | 0000 | 0000 | 0000 | 0000 | 0000 |
| * | | | | | | | | |
| 0000046520 | 0000 | 0000 | 0200 | 0000 | 0000 | 0000 | 0000 | 0000 |
| 0000046540 | 0000 | 0000 | 0000 | 0000 | 534D | 5220 | 6E75 | 542D |
| 0000046560 | 6D69 | 2065 | 694C | 7262 | 7261 | 2079 | 202D | 6F43 |
| 0000046600 | 7970 | 6972 | 6867 | 2074 | 6328 | 2029 | 3931 | 3039 |
| 0000046620 | 202C | 694D | 7263 | 736F | 666F | 2074 | 6F43 | 7072 |

THU MAR 14 17:27:50 1991 CRV_STI.DLL PAGE 22, LINE 1240

```
0000046640   0018   7263   5F76   6F73   7466   632E   7300   6974
0000046660   702E   0000   0042   005A   004D   FFFF   0000   0000
0000046700   0000   0000   0000   0000   0000   0000   0000   0000
0000046720   0001   0000   6E69   0074   6E69   0074   6C43   6165
0000046740   2072   202D   6572   6461   7341   6E79   2E63   2E2E
0000046760   6200   645F   6265   6775   4500   7272   726F   6920
0000047000   206E   6C63   6165   006E   5F62   6564   7562   0067
0000047020   6C63   6165   5F6E   5F67   6970   6570   0900   6552
0000047040   6461   4120   7973   636E   6520   7272   726F   2520
0000047060   0A64   0900   6552   6461   4120   7973   636E   6520
0000047100   7272   726F   2520   0A64   0000   115E   00F0   0D56
0000047120   0056   0000   0000   0000   0000   0001   705C   7069
0000047140   5C65   5243   5F56   7075   0900   616D   656B   7020
0000047160   7069   2065   7265   6F72   0A72   0900   5F69   7263
0000047200   5F76   6E69   7469   6520   7272   726F   000A   6909
0000047220   2068   6573   206D   6177   7469   6520   7272   726F
0000047240   000A   6609   7361   2074   6573   206D   6573   2074
0000047260   7265   6F72   0A72   0900   6572   6461   7320   6D65
0000047300   7320   7465   6520   7272   726F   000A   7209   6165
0000047320   2064   656E   7478   655F   6576   746E   2020   7265
0000047340   6F72   2C72   2520   0A64   0000   7263   5F76   6573
0000047360   646E   632E   7300   6974   702E   0000   018A   01A2
0000047400   0195   01A8   0000   226C   00EC   7009   7475   745F
0000047420   6172   6B63   6520   7272   726F   2520   0A64   0900
0000047440   7075   6164   6574   745F   6172   6B63   6520   7272
0000047460   726F   2520   0A64   0900   7570   5F74   7274   6361
0000047500   206B   7265   6F72   2072   6425   000A   5F47   5745
0000047520   545F   4700   455F   5F57   0054   7265   6F72   2072
0000047540   6F63   6564   2520   2E64   6200   655F   7272   726F
0000047560   6600   7269   7473   705F   7261   6D61   203A   7325
0000047600   6200   655F   7272   726F   6600   7269   7473   705F
0000047620   7261   6D61   203A   7325   6200   655F   7272   726F
0000047640   0000   7263   5F76   6573   646E   655F   7272   6D5F
0000047660   6773   0000   0000   0000   0000   7243   6165   6574
0000047700   7420   6365   2068   626F   206A   7265   2072   6425
0000047720   000A   0000   0000   0000   0006   0000   2680   267F
0000047740   0000   0005   0000   0000   0000   0000   0000   0000
0000047760   0000   0000   435F   465F   4C49   5F45   4E49   4F46
0000050000   003D   0001   FFFF   0000   0000   0000   0000   0000
0000050020   0000   0000   0000   0000   0001   8101   8181   0000
0000050040   0000   0000   0000   0000   0000   0000   0000   0000
*
0000050420   0000   0000   0000   0000   0000   0A00   0A0A   0A0A
0000050440   0A0A   0A0A   0A0A   0A0A   0A0A   0A0A   0A0A   0A0A
*
0000051020   0A0A   0A0A   0A0A   0A0A   0A0A   000A   0000   0000
0000051040   0000   0000   0000   0000   0000   0000   FF00   00FF
0000051060   0000   0000   FFFF   FFFF   0000   0000   04E2   0000
0000051100   0000   095E   0001   0000   0000   0000   0000   0000
0000051120   0102   0000   0000   0000   0000   0000   0202   0000
0000051140   0000   0000   0000   0000   0000   0000   0000   0000
*
0000052020   0000   0000   0000   0000   0000   0001   0200   0000
0000052040   0000   0000   0000   0000   0000   0000   0000   0000
*
0000052760   0000   0000   0000   0000   0000   06AE   019E   0000
0000053000   0000   0000   0000   0006   0600   0100   0000   0010
0000053020   0603   0600   1002   4504   4545   0505   0505   3505
0000053040   0030   0050   0000   2000   3020   5850   0807   3000
```

THU MAR 14 17:27:50 1991 CRV_STI.DLL PAGE 23, LINE 1299

| | | | | | | | | |
|---|---|---|---|---|---|---|---|---|
| 0000053060 | 3030 | 5057 | 0007 | 2000 | 0020 | 0000 | 0000 | 6008 |
| 0000053100 | 6060 | 6060 | 0060 | 7000 | 7870 | 7878 | 0878 | 0807 |
| 0000053120 | 0000 | 0007 | 0808 | 0008 | 0800 | 0800 | 0000 | 2808 |
| 0000053140 | 756E | 6C6C | 0629 | 0000 | 0000 | 0000 | 0000 | 0000 |
| 0000053160 | 0000 | 0000 | 0003 | 2000 | 3304 | 094A | 3304 | 091A |
| 0000053200 | 3304 | 091E | 3304 | 0922 | 3304 | 0926 | 3304 | 092A |
| 0000053220 | 0000 | 0000 | 0101 | 0000 | 0003 | 0000 | 0000 | 0000 |
| 0000053240 | 0000 | 0000 | 0000 | 0000 | 3844 | FFFF | FFFF | FFFF |
| 0000053260 | FFFF | 094C | 0952 | 0954 | 0956 | 094E | 0950 | 0958 |
| 0000053300 | 3C3C | 4D4E | 4753 | 3E3E | 0000 | 3652 | 3030 | 0D30 |
| 0000053320 | 2D0A | 7320 | 6174 | 6B63 | 6F20 | 6576 | 6672 | 6F6C |
| 0000053340 | 0D77 | 000A | 0003 | 3652 | 3030 | 0D33 | 2D0A | 6920 |
| 0000053360 | 746E | 6765 | 7265 | 6420 | 7669 | 6469 | 2065 | 7962 |
| 0000053400 | 3020 | 0A0D | 0800 | 5200 | 3036 | 3830 | 0A0D | 202D |
| 0000053420 | 6F6E | 2074 | 6E65 | 756F | 6867 | 7320 | 6170 | 6563 |
| 0000053440 | 6620 | 726F | 6120 | 6772 | 6D75 | 6E65 | 7374 | 0A0D |
| 0000053460 | 0900 | 5200 | 3036 | 3930 | 0A0D | 202D | 6F6E | 2074 |
| 0000053500 | 6E65 | 756F | 6867 | 7320 | 6170 | 6563 | 6620 | 726F |
| 0000053520 | 6520 | 766E | 7269 | 6E6F | 656D | 746E | 0A0D | FC00 |
| 0000053540 | 0D00 | 000A | 00FF | 7572 | 2D6E | 6974 | 656D | 6520 |
| 0000053560 | 7272 | 726F | 0020 | 0002 | 3652 | 3030 | 0D32 | 2D0A |
| 0000053600 | 6620 | 6F6C | 7461 | 6E69 | 2D67 | 6F70 | 6E69 | 2074 |
| 0000053620 | 7573 | 7070 | 726F | 2074 | 6F6E | 2074 | 6F6C | 6461 |
| 0000053640 | 6465 | 0A0D | 1100 | 5200 | 3036 | 3731 | 0A0D | 202D |
| 0000053660 | 6E75 | 7865 | 6570 | 7463 | 6465 | 6D20 | 6C75 | 6974 |
| 0000053700 | 6874 | 6572 | 6461 | 6C20 | 636F | 206B | 7265 | 6F72 |
| 0000053720 | 0D72 | 000A | 0010 | 3652 | 3130 | 0D36 | 2D0A | 6E20 |
| 0000053740 | 746F | 6520 | 6F6E | 6775 | 2068 | 7073 | 6361 | 2065 |
| 0000053760 | 6F66 | 2072 | 6874 | 6572 | 6461 | 6420 | 7461 | 0D61 |
| 0000054000 | 000A | FFFF | 05FF | 0200 | 2E00 | 0109 | 0000 | 0200 |
| 0000054020 | DC00 | 0404 | 0000 | 0200 | 9C00 | 0508 | 0000 | 0200 |
| 0000054040 | 5A02 | 0309 | 1A00 | 0200 | 5C02 | 0309 | 2800 | 4E00 |
| 0000054060 | 3042 | AF32 | 009A | 0100 | 0000 | DE00 | 0018 | 0000 |
| 0000054100 | 0100 | 1300 | 2E2E | 6F5C | 6A62 | 635C | 7672 | 735F |
| 0000054120 | 666F | 2E74 | 626F | 016A | DE00 | 1418 | 000F | 0000 |
| 0000054140 | 0100 | 1300 | 2E2E | 6F5C | 6A62 | 635C | 7672 | 735F |
| 0000054160 | 6E65 | 2E64 | 626F | 016A | F200 | 5E27 | 0008 | 0000 |
| 0000054200 | 0100 | 1300 | 2E2E | 6F5C | 6A62 | 635C | 7672 | 725F |
| 0000054220 | 7365 | 2E70 | 626F | 016A | 6000 | D130 | 0000 | 0100 |
| 0000054240 | 0100 | 0B00 | 6C64 | 5C6C | 7363 | 2E75 | 7361 | 016D |
| 0000054260 | 3200 | AF31 | 0001 | 0100 | 0100 | 0E00 | 6C64 | 5C6C |
| 0000054300 | 7363 | 6475 | 7461 | 612E | 6D73 | 0001 | 32E2 | 0022 |
| 0000054320 | 0000 | 0001 | 0001 | 6F0F | 3273 | 635C | 7472 | 6D30 |
| 0000054340 | 6773 | 612E | 6D73 | 0001 | 3304 | 0006 | 0000 | 0001 |
| 0000054360 | 0001 | 630A | 7472 | 6630 | 2E70 | 7361 | 016D | 0A00 |
| 0000054400 | 1A33 | 0000 | 0100 | 0100 | 0A00 | 6863 | 736B | 6B74 |
| 0000054420 | 612E | 6D73 | 0001 | 3324 | 0108 | 0000 | 0001 | 0001 |
| 0000054440 | 640D | 6C6C | 735C | 7465 | 6E65 | 7076 | 632E | 0001 |
| 0000054460 | 342C | 0065 | 0000 | 0001 | 0001 | 6F0F | 3273 | 6E5C |
| 0000054500 | 736D | 6867 | 7264 | 612E | 6D73 | 0001 | 3492 | 00C0 |
| 0000054520 | 0000 | 0001 | 0001 | 6F0E | 3273 | 645C | 736F | 6572 |
| 0000054540 | 2E74 | 7361 | 016D | 5200 | 4E35 | 0000 | 0100 | 0100 |
| 0000054560 | 0800 | 7270 | 6E69 | 6674 | 632E | 0000 | 0000 | 0000 |
| 0000054600 | 0000 | 0001 | 0000 | 5F0B | 6663 | 756C | 6873 | 612E |
| 0000054620 | 6D73 | 0000 | 0000 | 0000 | 0000 | 0001 | 0000 | 5F07 |
| 0000054640 | 6966 | 656C | 632E | 0001 | 35A0 | 00E5 | 0000 | 0001 |
| 0000054660 | 0001 | 5F0B | 6C66 | 6273 | 6675 | 612E | 6D73 | 0001 |
| 0000054700 | 3686 | 004B | 0000 | 0001 | 0001 | 5F0B | 6567 | 6274 |
| 0000054720 | 6675 | 612E | 6D73 | 0001 | 36D2 | 00C0 | 0000 | 0001 |

THU MAR 14 17:27:50 1991 CRV_STI.DLL PAGE 24, LINE 1358

| | | | | | | | | |
|---|---|---|---|---|---|---|---|---|
| 0000054740 | 0001 | 5F0B | 6673 | 6274 | 6675 | 612E | 6D73 | 0001 |
| 0000054760 | 3792 | 012E | 0000 | 0001 | 0001 | 6608 | 6C66 | 7375 |
| 0000055000 | 2E68 | 0163 | C000 | FA38 | 0004 | 0100 | 0100 | 0A00 |
| 0000055020 | 756F | 7074 | 7475 | 612E | 6D73 | 00U1 | 3DBA | 0077 |
| 0000055040 | 0000 | 0001 | 0001 | 6F0D | 3273 | 6C5C | 6573 | 6B65 |
| 0000055060 | 612E | 6D73 | 0001 | 3E32 | 01DD | 0000 | 0001 | 0001 |
| 0000055100 | 7709 | 6972 | 6574 | 612E | 6D73 | 0001 | 4010 | 000A |
| 0000055120 | 0000 | 0001 | 0001 | 6D0A | 6C61 | 6F6C | 2E63 | 7361 |
| 0000055140 | 016D | 1A00 | 0A40 | 0000 | 0100 | 0100 | 0800 | 7266 |
| 0000055160 | 6565 | 612E | 6D73 | 0001 | 4024 | 00AF | 0000 | 0001 |
| 0000055200 | 0001 | 660B | 616D | 6C6C | 636F | 612E | 6D73 | 0000 |
| 0000055220 | 0000 | 0000 | 0000 | 0001 | 0000 | 6609 | 6164 | 6174 |
| 0000055240 | 612E | 6D73 | 0001 | 40D4 | 0034 | 0000 | 0001 | 0001 |
| 0000055260 | 690B | 696E | 7374 | 6765 | 612E | 6D73 | 0001 | 4108 |
| 0000055300 | 0036 | 0000 | 0001 | 0001 | 6C0B | 6E69 | 736B | 6765 |
| 0000055320 | 612E | 6D73 | 0001 | 413E | 007C | 0000 | 0001 | 0001 |
| 0000055340 | 730C | 6165 | 6372 | 7368 | 2E67 | 7361 | 016D | BA00 |
| 0000055360 | E241 | 0000 | 0100 | 0100 | 0B00 | 7267 | 776F | 6573 |
| 0000055400 | 2E67 | 7361 | 016D | 9C00 | 3142 | 0000 | 0100 | 0100 |
| 0000055420 | 0A00 | 656E | 7377 | 6765 | 612E | 6D73 | 0001 | 42CE |
| 0000055440 | 0036 | 0000 | 0001 | 0001 | 730A | 7274 | 7063 | 2E79 |
| 0000055460 | 7361 | 016D | 0400 | 1743 | 0000 | 0100 | 0100 | 0A00 |
| 0000055500 | 7473 | 6C72 | 6E65 | 612E | 6D73 | 0001 | 431C | 003B |
| 0000055520 | 0000 | 0001 | 0001 | 730B | 7274 | 636E | 706D | 612E |
| 0000055540 | 6D73 | 0000 | 0000 | 0000 | 0000 | 0001 | 0000 | 630C |
| 0000055560 | 696D | 6373 | 6164 | 2E74 | 7361 | 016D | 5800 | BA43 |
| 0000055600 | 0000 | 0100 | 0100 | 0D00 | 736F | 5C32 | 6C6D | 636F |
| 0000055620 | 2E6B | 7361 | 016D | 1200 | 0E44 | 0001 | 0100 | 0100 |
| 0000055640 | 0E00 | 6C64 | 5C6C | 6874 | 6572 | 6461 | 612E | 6D73 |
| 0000055660 | 0001 | 4520 | 007A | 0000 | 0001 | 0001 | 6410 | 6C6C |
| 0000055700 | 745C | 6469 | 6174 | 6C62 | 2E65 | 7361 | 016D | 9A00 |
| 0000055720 | 2E45 | 0000 | 0100 | 0100 | 0A00 | 6163 | 6C6C | 636F |
| 0000055740 | 612E | 6D73 | 0001 | 45C8 | 005E | 0000 | 0001 | 0001 |
| 0000055760 | 680B | 656D | 636D | 7970 | 612E | 6D73 | 0208 | 0004 |
| 0000056000 | 0085 | 5FDE | 5F66 | 6970 | 6570 | 685F | 6E61 | 6C64 |
| 0000056020 | DA65 | 0402 | 8500 | 0E00 | 675F | 705F | 7069 | 5F65 |
| 0000056040 | 6168 | 646E | 656C | 0200 | 0004 | 061F | 5F09 | 7473 |
| 0000056060 | 5F69 | 6164 | 6174 | 0000 | 0001 | 06B4 | 4914 | 494E |
| 0000056100 | 5F54 | 4C47 | 424F | 4C41 | 535F | 4954 | 445F | 5441 |
| 0000056120 | 3A41 | 0100 | B500 | 1306 | 4F53 | 5446 | 545F | 5248 |
| 0000056140 | 4145 | 5F44 | 4553 | 5F4D | 5450 | 6652 | 0107 | C700 |
| 0000056160 | 1406 | 5243 | 5F56 | 504F | 4E45 | 535F | 464F | 5F54 |
| 0000056200 | 4854 | 4552 | 4441 | 173E | 0001 | 06E7 | 5318 | 464F |
| 0000056220 | 5F54 | 4552 | 4441 | 545F | 5F4F | 5243 | 5F56 | 4553 |
| 0000056240 | 5F4D | 5450 | 6852 | 0117 | E800 | 1106 | 4F53 | 5446 |
| 0000056260 | 525F | 4145 | 5F44 | 4553 | 5F4D | 5450 | 9252 | 0117 |
| 0000056300 | E900 | 1206 | 4F53 | 5446 | 455F | 4556 | 544E | 505F |
| 0000056320 | 494F | 544E | 5245 | 17BE | 0001 | 06EA | 530A | 464F |
| 0000056340 | 5F54 | 4241 | 524F | E654 | 0117 | EB00 | 0F06 | 4F53 |
| 0000056360 | 5446 | 435F | 4F4C | 4553 | 545F | 5345 | 2B54 | 0118 |
| 0000056400 | EC00 | 1406 | 4F53 | 5446 | 435F | 4F4C | 4553 | 445F |
| 0000056420 | 4649 | 5F46 | 4554 | 5453 | 1870 | 0001 | 06EE | 530E |
| 0000056440 | 464F | 5F54 | 504F | 4E45 | 545F | 5345 | A754 | 0118 |
| 0000056460 | F000 | 1306 | 4F53 | 5446 | 4F5F | 4550 | 5F4E | 4944 |
| 0000056500 | 4646 | 545F | 5345 | 5C54 | 0500 | 8600 | 1500 | 735F |
| 0000056520 | 666F | 5F74 | 6572 | 6461 | 745F | 5F6F | 7263 | 5F76 |
| 0000056540 | 6573 | 606D | 0500 | 8600 | 0E00 | 735F | 666F | 5F74 |
| 0000056560 | 6572 | 6461 | 735F | 6D65 | 0064 | 0005 | 0668 | 5F0F |
| 0000056600 | 6F73 | 7466 | 655F | 6576 | 746E | 705F | 7274 | 2172 |

THU MAR 14 17:27:50 1991 CRV_STI.DLL PAGE 25, LINE 1417

| | | | | | | | | |
|---|---|---|---|---|---|---|---|---|
| 0000056620 | 0001 | 0702 | 4316 | 5652 | 535F | 4E45 | 5F44 | 4F53 |
| 0000056640 | 5446 | 454B | 5F59 | 5645 | 4E45 | 4E54 | 0122 | 0400 |
| 0000056660 | 1307 | 5243 | 5F56 | 4553 | 444E | 465F | 4C49 | 4554 |
| 0000056700 | 5F52 | 4544 | F746 | 0122 | 0600 | 1107 | 5243 | 5F56 |
| 0000056720 | 4553 | 444E | 495F | 4F43 | 5F4E | 534D | E847 | 0123 |
| 0000056740 | 0800 | 1907 | 5243 | 5F56 | 4553 | 444E | 495F | 4F43 |
| 0000056760 | 5F4E | 454C | 5241 | 5F4E | 4E45 | 4544 | 8C44 | 0124 |
| 0000057000 | 0A00 | 1007 | 5243 | 5F56 | 4553 | 444E | 455F | 5252 |
| 0000057020 | 4D5F | 4753 | 18DE | 0001 | 06E8 | 430D | 5652 | 535F |
| 0000057040 | 4E45 | 5F44 | 4E49 | 5449 | 1B70 | 0001 | 06F0 | 4315 |
| 0000057060 | 5652 | 435F | 4552 | 5441 | 5F45 | 4E49 | 5449 | 545F |
| 0000057100 | 4152 | 4B43 | 1C08 | 0001 | 06F3 | 4315 | 5652 | 435F |
| 0000057120 | 4552 | 5441 | 5F45 | 4F4D | 4556 | 545F | 4152 | 4B43 |
| 0000057140 | 1DC9 | 0001 | 06F8 | 4315 | 5652 | 435F | 4552 | 5441 |
| 0000057160 | 5F45 | 5254 | 4341 | 5F4B | 5953 | 434E | 1E36 | 0001 |
| 0000057200 | 06FB | 4314 | 5652 | 435F | 4552 | 5441 | 5F45 | 4E45 |
| 0000057220 | 5F44 | 5254 | 4341 | 9C4B | 011E | FCG0 | 1206 | 5243 |
| 0000057240 | 5F56 | 4C43 | 534F | 5F45 | 4244 | 545F | 4152 | 4B43 |
| 0000057260 | 1ECC | 0001 | 06FE | 4315 | 5652 | 435F | 4552 | 5441 |
| 0000057300 | 5F45 | 5953 | 434E | 455F | 4556 | 544E | 2004 | 0001 |
| 0000057320 | 0700 | 4312 | 5652 | 535F | 4E45 | 5F44 | 454B | 5F59 |
| 0000057340 | 5645 | 4E45 | 5754 | 012D | C900 | 1206 | 5243 | 5F56 |
| 0000057360 | 4552 | 5053 | 4B5F | 5945 | 455F | 4556 | 544E | 2E08 |
| 0000057400 | 0001 | 06CB | 4314 | 5652 | 525F | 5345 | 5F50 | 4554 |
| 0000057420 | 4843 | 435F | 4552 | 5441 | D045 | 012E | CD00 | 1206 |
| 0000057440 | 5243 | 5F56 | 4441 | 5F44 | 4554 | 4843 | 455F | 4556 |
| 0000057460 | 544E | 27F2 | 0001 | 06B6 | 430D | 5652 | 525F | 5345 |
| 0000057500 | 5F50 | 4E49 | 5449 | 28BF | 0001 | 06B7 | 4311 | 5652 |
| 0000057520 | 525F | 5345 | 5F50 | 4853 | 5455 | 4F44 | 4E57 | 2911 |
| 0000057540 | 0001 | 06B9 | 4312 | 5652 | 525F | 5345 | 5F50 | 4547 |
| 0000057560 | 5F4E | 5645 | 4E45 | CA54 | 0129 | BB00 | 1506 | 635F |
| 0000057600 | 7672 | 725F | 7365 | 5F70 | 6261 | 726F | 5F74 | 7665 |
| 0000057620 | 6E65 | 0774 | 012A | BD00 | 1606 | 635F | 7672 | 725F |
| 0000057640 | 7365 | 5F70 | 6C69 | 656C | 6167 | 5F6C | 6F63 | 6564 |
| 0000057660 | 2A44 | 0001 | 06BF | 5F14 | 7263 | 5F76 | 6572 | 7073 |
| 0000057700 | 745F | 6365 | 5F68 | 7665 | 6E65 | 8174 | 012A | C100 |
| 0000057720 | 1306 | 5243 | 5F56 | 4552 | 5053 | 4B5F | 4442 | 535F |
| 0000057740 | 4154 | 5554 | F953 | 012A | C300 | 1406 | 5243 | 5F56 |
| 0000057760 | 4552 | 5053 | 4C5F | 434F | 5441 | 524F | 505F | 534F |
| 0000060000 | 2B82 | 0001 | 06C5 | 4316 | 5652 | 525F | 5345 | 5F50 |
| 0000060020 | 4143 | 5450 | 5255 | 5F45 | 5645 | 4E45 | 4954 | 012C |
| 0000060040 | C700 | 1506 | 5243 | 5F56 | 4552 | 5053 | 565F | 5245 |
| 0000060060 | 4649 | 5F59 | 5645 | 4E45 | A654 | 050A | 0000 | 0600 |
| 0000060100 | 655F | 6164 | 6174 | 2680 | 0005 | 0000 | 5F04 | 6E65 |
| 0000060120 | 6064 | 0130 | 0000 | 0600 | 5F43 | 4E49 | 5449 | 0280 |
| 0000060140 | 0005 | 0000 | 5F0C | 6E5F | 6568 | 7061 | 645F | 7365 |
| 0000060160 | 8063 | 0526 | 0000 | 0C00 | 735F | 6174 | 6B63 | 6F62 |
| 0000060200 | 7474 | 6D6F | 02A6 | 0005 | 0000 | 5F0C | 5F5F | 4461 |
| 0000060220 | 7342 | 7077 | 6C66 | 7267 | 0502 | 0000 | 0800 | 5F5F |
| 0000060240 | 6361 | 646D | 6E6C | 02A4 | 0005 | 0000 | 5F08 | 615F |
| 0000060260 | 6573 | 6867 | A269 | 0502 | 0000 | 0800 | 5F5F | 7361 |
| 0000060300 | 6765 | 6F6C | 027E | 0005 | 0000 | 5F08 | 615F | 6973 |
| 0000060320 | 647A | 7C73 | 0502 | 0000 | 0800 | 5F5F | 7461 | 706F |
| 0000060340 | 7073 | 0294 | 0005 | 0000 | 5F09 | 615F | 6663 | 6E69 |
| 0000060360 | 6F66 | D6D6 | 0000 | 0001 | 5F09 | 615F | 4244 | 7375 |
| 0000060400 | 6465 | 0274 | 0005 | 0000 | 5F09 | 615F | 6E65 | 7376 |
| 0000060420 | 6765 | 0278 | 0005 | 0000 | 5F0A | 745F | 7268 | 6165 |
| 0000060440 | 6964 | 7664 | 0502 | 0000 | 0A00 | 5F5F | 6967 | 666E |
| 0000060460 | 736F | 6765 | D6D6 | 0000 | 0001 | 5F0A | 615F | 4244 |

THU MAR 14 17:27:50 1991 CRV_STI.DLL PAGE 26, LINE 1476

| | | | | | | | | |
|---|---|---|---|---|---|---|---|---|
| 0000060500 | 6F64 | 7773 | ,A70 | 0502 | 0000 | 0A00 | 5F5F | 696C |
| 0000060520 | 666E | 736F | 6765 | 9876 | 0000 | 0001 | 5F0A | 615F |
| 0000060540 | 7263 | 7574 | 6573 | A864 | 0502 | 0000 | 0B00 | 5F5F |
| 0000060560 | 615F | 4244 | 7472 | 7265 | D172 | 0130 | 0000 | 0B00 |
| 0000060600 | 5F5F | 6D61 | 6773 | 655F | 6978 | B674 | 0502 | 0000 |
| 0000060620 | 0B00 | 5F5F | 736F | 6576 | 7372 | 6F69 | EB6E | 0131 |
| 0000060640 | 0000 | 0600 | 5F5F | 7865 | 7469 | 329D | 0001 | 0000 |
| 0000060660 | 5F0C | 755F | 6C6E | 636F | 656B | 6978 | C974 | 0504 |
| 0000060700 | 0000 | 0700 | 5F5F | 6863 | 6C69 | B964 | 0502 | 0000 |
| 0000060720 | 0700 | 5F5F | 666E | 6C69 | 3265 | 0131 | 0000 | 0700 |
| 0000060740 | 5F5F | 6963 | 696E | BB74 | 0504 | 0000 | 0700 | 5F5F |
| 0000060760 | 615F | 6772 | F363 | 0131 | 0000 | 0700 | 5F5F | 6563 |
| 0000061000 | 6978 | B674 | 0502 | 0000 | 0D00 | 5F5F | 6F64 | 7673 |
| 0000061020 | 7265 | 616D | 6F6A | BD72 | 0504 | 0000 | 0700 | 5F5F |
| 0000061040 | 615F | 6772 | B776 | 0502 | 0000 | 0D00 | 5F5F | 6F64 |
| 0000061060 | 7673 | 7265 | 696D | 6F6E | BB72 | 0503 | 0000 | 0800 |
| 0000061100 | 5F5F | 6970 | 6570 | 6863 | 04C1 | 0005 | 0000 | 5F08 |
| 0000061120 | 6E65 | 6976 | 6F72 | B86E | 0502 | 0000 | 0800 | 5F5F |
| 0000061140 | 736F | 6966 | 656C | 02B8 | 0005 | 0000 | 5F08 | 6F5F |
| 0000061160 | 6D73 | 646F | 8C65 | 0131 | 0000 | 0800 | 5F5F | 6E69 |
| 0000061200 | 7469 | 7066 | 093C | 0005 | 0000 | 5F08 | 665F | 6970 |
| 0000061220 | 696E | C074 | 0132 | 0000 | 0800 | 5F5F | 6574 | 6D72 |
| 0000061240 | 7066 | 04C5 | 0005 | 0000 | 5F08 | 705F | 6D67 | 7470 |
| 0000061260 | FD72 | 0131 | 0000 | 0800 | 5F5F | 5F63 | 7865 | 7469 |
| 0000061300 | 02B8 | 0005 | 0000 | 5F09 | 645F | 736F | 6F6D | 6564 |
| 0000061320 | 02B6 | 0005 | 0000 | 5F09 | 6F5F | 6D73 | 6A61 | 726F |
| 0000061340 | 02B7 | 0005 | 0000 | 5F09 | 6F5F | 6D73 | 6E69 | 726F |
| 0000061360 | 04CB | 0005 | 0000 | 5F0A | 655F | 6978 | 6474 | 6E6F |
| 0000061400 | 5365 | 0132 | 0000 | 0A00 | 5F5F | 6F6C | 6B63 | 7865 |
| 0000061420 | 7469 | 02B4 | 0005 | 0000 | 5F0A | 755F | 616D | 6B73 |
| 0000061440 | 6176 | C06C | 0132 | 0000 | 0A00 | 5F5F | 7463 | 7265 |
| 0000061460 | 736D | 6275 | 04CD | 0005 | 0000 | 5F0A | 655F | 6978 |
| 0000061500 | 5F74 | 6974 | AA64 | 0502 | 0000 | 0500 | 5F5F | 6166 |
| 0000061520 | E463 | 0131 | 0000 | 0500 | 655F | 6978 | E274 | 0132 |
| 0000061540 | 0000 | 0E00 | 5F5F | 4646 | 4D5F | 4753 | 4142 | 4E4E |
| 0000061560 | 5245 | 04D0 | 0005 | 0000 | 5F09 | 615F | 6264 | 6D67 |
| 0000061600 | 6773 | 9876 | 0000 | 0001 | 5F09 | 615F | 7263 | 6D74 |
| 0000061620 | 6773 | 3304 | 0001 | 0000 | 5F08 | 665F | 7470 | 6172 |
| 0000061640 | D470 | 0504 | 0000 | 0C00 | 5F5F | 6161 | 746C | 7473 |
| 0000061660 | 6F6B | 7276 | 330A | 0001 | 0000 | 5F08 | 635F | 6B68 |
| 0000061700 | 7473 | 0A6B | 0133 | 0000 | 0A00 | 5F5F | 4661 | 6863 |
| 0000061720 | 736B | 6B74 | 3324 | 0001 | 0000 | 5F09 | 735F | 7465 |
| 0000061740 | 6E65 | 7076 | 342C | 0001 | 0000 | 5F0B | 4E5F | 534D |
| 0000061760 | 5F47 | 4554 | 5458 | 345C | 0001 | 0000 | 5F0C | 4E5F |
| 0000062000 | 534D | 5F47 | 5257 | 5449 | 3E45 | 0135 | 0000 | 0B00 |
| 0000062020 | 5F5F | 645F | 736F | 7265 | 6E72 | 466F | 0135 | 0000 |
| 0000062040 | 0700 | 5F5F | 7265 | 6E72 | F76F | 0134 | 0000 | 0800 |
| 0000062060 | 5F5F | 6F64 | 7273 | 7465 | 34DE | 0001 | 0000 | 5F09 |
| 0000062100 | 645F | 736F | 6572 | 6674 | 3552 | 0001 | 0000 | 5F07 |
| 0000062120 | 7270 | 6E69 | 6674 | 04D8 | 0005 | 0000 | 5F08 | 635F |
| 0000062140 | 6C66 | 7375 | 0068 | 0400 | 0000 | 0700 | 5F5F | 7562 |
| 0000062160 | 6966 | DA6E | 0504 | 0000 | 0500 | 5F5F | 6F69 | BA62 |
| 0000062200 | 0506 | 0000 | 0600 | 5F5F | 6F69 | 3262 | 089A | 0005 |
| 0000062220 | 0000 | 5F09 | 6C5F | 7361 | 6974 | 626F | 35A0 | 0001 |
| 0000062240 | 0000 | 5F08 | 665F | 736C | 7562 | 8666 | 0136 | 0000 |
| 0000062260 | 0800 | 5F5F | 6567 | 6274 | 6675 | 374A | 0001 | 0000 |
| 0000062300 | 5F07 | 665F | 6274 | 6675 | 36D2 | 0001 | 0000 | 5F07 |
| 0000062320 | 735F | 6274 | 6675 | 37D8 | 0001 | 0000 | 5F08 | 665F |
| 0000062340 | 6C66 | 7375 | 5F68 | 6B6C | 3792 | 0001 | 0000 | 5F07 |

THU MAR 14 17:27:50 1991 CRV_STI.DLL PAGE 27, LINE 1535

| | | | | | | | | |
|---|---|---|---|---|---|---|---|---|
| 0000062360 | 6666 | 756C | 6873 | 3844 | 0001 | 0000 | 5F09 | 6C66 |
| 0000062400 | 7375 | 6168 | 6C6C | 38D0 | 0001 | 0000 | 5F08 | 6F5F |
| 0000062420 | 7475 | 7570 | C474 | 013D | 0000 | 0600 | 6C5F | 6573 |
| 0000062440 | 6B65 | 3DBA | 0001 | 0000 | 5F0A | 6C5F | 6573 | 6B65 |
| 0000062460 | 6C5F | 3C6B | 013E | 0000 | 0600 | 775F | 6972 | 6574 |
| 0000062500 | 3E32 | 0001 | 0000 | 5F0A | 775F | 6972 | 6574 | 6C5F |
| 0000062520 | 106B | 0140 | 0000 | 0700 | 6D5F | 6C61 | 6F6C | 1563 |
| 0000062540 | 0140 | 0000 | 0A00 | 6D5F | 6C61 | 6F6C | 5F63 | 6B6C |
| 0000062560 | 401F | 0001 | 0000 | 5F08 | 7266 | 6565 | 6C5F | 1A6B |
| 0000062600 | 0140 | 0000 | 0500 | 665F | 6572 | 5665 | 0140 | 0000 |
| 0000062620 | 0C00 | 5F5F | 6D66 | 6C61 | 6F6C | 5F63 | 6B6C | 4024 |
| 0000062640 | 0001 | 0000 | 5F07 | 665F | 7266 | 6565 | 4037 | 0001 |
| 0000062660 | 0000 | 5F09 | 665F | 616D | 6C6C | 636F | 4024 | 0001 |
| 0000062700 | 0000 | 5F0A | 635F | 7266 | 6565 | 6C5F | 086B | 0509 |
| 0000062720 | 0000 | 0700 | 5F5F | 6866 | 6165 | D470 | 0140 | 0000 |
| 0000062740 | 0900 | 5F5F | 6E69 | 7469 | 6573 | 0867 | 0141 | 0000 |
| 0000062760 | 0900 | 5F5F | 696C | 6B6E | 6573 | 3E67 | 0141 | 0000 |
| 0000063000 | 0B00 | 5F5F | 6573 | 7261 | 6863 | 6573 | 4967 | 0142 |
| 0000063020 | 0000 | 0800 | 5F5F | 6E69 | 7363 | 6765 | 41BA | 0001 |
| 0000063040 | 0000 | 5F09 | 675F | 6F72 | 7377 | 6765 | 427C | 0001 |
| 0000063060 | 0000 | 5F0A | 665F | 6E69 | 6C64 | 7361 | 1674 | 0509 |
| 0000063100 | 0000 | 0A00 | 5F5F | 6D61 | 6C62 | 736B | 7A69 | 429C |
| 0000063120 | 0001 | 0000 | 5F08 | 6E5F | 7765 | 6573 | CE67 | 0142 |
| 0000063140 | 0000 | 0700 | 735F | 7274 | 7063 | 0479 | 0143 | 0000 |
| 0000063160 | 0700 | 735F | 7274 | 656C | 1C6E | 0143 | 0000 | 0800 |
| 0000063200 | 735F | 7274 | 636E | 706D | 0918 | 0005 | 0000 | 5F0D |
| 0000063220 | 635F | 6C66 | 6374 | 7476 | 745F | 6261 | 0934 | 0005 |
| 0000063240 | 0000 | 5F08 | 615F | 6973 | 657A | 3543 | 0509 | 0000 |
| 0000063260 | 0800 | 5F5F | 7361 | 7A69 | 4465 | 0932 | 0005 | 0000 |
| 0000063300 | 5F0B | 735F | 6769 | 6E69 | 6F74 | 6666 | 0930 | 0005 |
| 0000063320 | 0000 | 5F0B | 735F | 6769 | 6E69 | 7374 | 6765 | 43A8 |
| 0000063340 | 0001 | 0000 | 5F06 | 6C5F | 636F | F26B | 0143 | 0000 |
| 0000063360 | 0700 | 5F5F | 6F6C | 6B63 | 7C66 | 0143 | 0000 | 0D00 |
| 0000063400 | 5F5F | 6E75 | 6F6C | 6B63 | 665F | 6C69 | 5865 | 0143 |
| 0000063420 | 0000 | 0D00 | 5F5F | 6F6C | 6B63 | 735F | 7274 | 6165 |
| 0000063440 | D26D | 0143 | 0000 | 0800 | 5F5F | 6E75 | 6F6C | 6B63 |
| 0000063460 | 0936 | 0005 | 0000 | 5F09 | 6C5F | 636F | 636B | 746E |
| 0000063500 | 4402 | 0001 | 0000 | 5F09 | 755F | 6C6E | 636F | 666B |
| 0000063520 | 4364 | 0001 | 0000 | 5F0F | 755F | 6C6E | 636F | 5F6B |
| 0000063540 | 7473 | 6572 | 6D61 | 4388 | 0001 | 0000 | 5F0A | 775F |
| 0000063560 | 6961 | 6C74 | 636F | 706B | 0143 | 0000 | 0B00 | 5F5F |
| 0000063600 | 6F6C | 6B63 | 665F | 6C69 | 1265 | 0144 | 0000 | 0D00 |
| 0000063620 | 5F5F | 6562 | 6967 | 746E | 7268 | 6165 | F364 | 0144 |
| 0000063640 | 0000 | 0B00 | 5F5F | 6E65 | 7464 | 7268 | 6165 | 2064 |
| 0000063660 | 0145 | 0000 | 0B00 | 5F5F | 6567 | 7474 | 6469 | 6174 |
| 0000063700 | 3862 | 0509 | 0000 | 0B00 | 5F5F | 6974 | 7464 | 6261 |
| 0000063720 | 616D | 9A78 | 0145 | 0000 | 0700 | 635F | 6C61 | 6F6C |
| 0000063740 | C863 | 0145 | 0000 | 0700 | 6D5F | 6D65 | 7063 | 0179 |
| 0000063760 | 000A | 8075 | 8183 | 6400 | 8300 | 0201 | 0101 | 8000 |
| 0000064000 | 0101 | 8000 | 0101 | 8000 | 0101 | 8000 | 0101 | 8000 |
| * | | | | | | | | |
| 0000064220 | 0101 | 8000 | 0501 | 7800 | 8368 | 0080 | 0101 | 8000 |
| 0000064240 | 0101 | 8000 | 0101 | 8000 | 0101 | 8000 | 0701 | 7800 |
| 0000064260 | 0085 | 8301 | 0080 | 0101 | 8000 | 0101 | 8000 | 0101 |
| 0000064300 | 8000 | 0101 | 8000 | 0101 | 8000 | 0101 | 8000 | 0101 |
| * | | | | | | | | |
| 0000065520 | 8000 | 0101 | 8000 | 1301 | 7900 | 0230 | D683 | 8302 |
| 0000065540 | 02D7 | 0782 | 4D5F | 5855 | 4553 | 694D | 0701 | 7F00 |
| 0000065560 | 8583 | 8300 | 00C0 | 0F01 | 7F00 | 0482 | 657A | 6F72 |

```
THU MAR 14 17:27:50 1991  CRV_STI.DLL  PAGE 28, LINE 1594

0000065600  8200  6804  6573  026D  0101  8000  1901  7900
0000065620  1085  0203  DB83  8302  02DC  0B82  4D5F  5855
0000065640  4553  4C4D  5349  6954  0701  7800  0085  8303
0000065660  02D5  0701  7F00  8583  8300  02DA  0F01  7F00
0000065700  0482  6D63  7378  8200  6104  786D  0273  0101
0000065720  8000  0101  8000  0101  8000  0101  8000  0101
*
0000071340  8000  0101  8000  0101  8000  1601  7900  0220
0000071360  A583  8304  04A6  0A82  7528  746E  6761  6567
0000071400  2964  0169  0007  837F  0081  8183  0100  0009
0000071420  827F  7801  8200  7901  0102  0016  4079  8302
0000071440  04A8  A983  8204  280A  6E75  6174  6767  6465
0000071460  6929  0701  7F00  A483  8304  04A4  0D01  7F00
0000071500  0382  696D  006E  0382  616D  0478  0101  8000
0000071520  1601  7900  0220  AC83  8304  04AD  0A82  7528
0000071540  746E  6761  6567  2964  0169  0007  837F  0085
0000071560  8583  0100  0012  827F  7705  6469  6874  8200
0000071600  6806  6965  6867  0274  0101  8000  1601  7900
0000071620  0240  B083  8304  04B1  0A82  7528  746E  6761
0000071640  6567  2964  0169  0007  837F  04A4  AB83  0104
0000071660  0011  827F  6F06  6972  6967  006E  0482  7261
0000071700  6165  0104  0001  0180  0001  0180  0001  0180
0000071720  0001  0180  0001  0180  0001  0180  0001  0180
*
0000072160  0001  0180  0001  0180  0016  3079  8303  04E0
0000072200  E183  8204  280A  6E75  6174  6767  6465  6929
0000072220  0A01  7F00  8583  8300  0085  8583  0100  001A
0000072240  827F  7705  6469  6874  8200  6806  6965  6867
0000072260  0274  0582  6564  7470  0468  1801  7900  4085
0000072300  0801  E483  8304  04E5  0A82  7528  746E  6761
0000072320  6567  2964  0169  0007  8578  0080  8483  0100
0000072340  0019  837F  0081  DF83  8304  0085  8583  8300
0000072360  00C4  8283  8300  0DE4  E383  0104  005A  827F
0000072400  7206  7065  6572  0073  0682  6964  656D  736E
0000072420  8202  6410  7461  5F61  616C  6579  5F72  6564
0000072440  7470  0868  0882  6973  5F67  6973  657A  820A
0000072460  7307  6769  705F  7274  820C  6209  6D74  5F70
0000072500  6973  657A  8210  6208  6D74  5F70  7470  1472
0000072520  0582  7073  7261  1865  0101  8000  1801  7900
0000072540  A085  0C05  E983  8304  04EA  0A82  7528  746E
0000072560  6761  6567  2964  0169  0007  8578  0180  8483
0000072600  0100  0025  837F  0086  2C83  8302  022C  8683
0000072620  8300  0081  8583  8300  0086  8283  8300  0086
0000072640  A483  8304  04E2  E883  0104  007E  827F  6902
0000072660  0064  0482  616E  656D  8204  6609  6C69  5F65
0000072700  616E  656D  8224  6509  7078  745F  5F63  6469
0000072720  8244  7404  7079  4865  0C82  6572  5F66  696C
0000072740  656E  6E5F  6D75  824A  7209  6665  745F  5F63
0000072760  6469  824C  740A  6D69  5F65  7473  6D61  5070
0000073000  0682  6F61  5F69  6469  8254  6C08  636F  7461
0000073020  6F69  586E  0982  7462  706D  695F  666E  5C6F
0000073040  0582  7073  7261  8565  0084  0101  8000  0101
0000073060  8000  0101  8000  0101  8000  0101  8000  0101
*
0000073120  8000  0701  7A00  8373  04E7  0082  0101  8000
0000073140  0101  8000  0101  8000  0101  8000  0101  8000
*
0000073560  0101  8000  1801  7900  C085  0702  3E83  8305
0000073600  053F  0A82  7528  746E  6761  6567  2964  0169
```

```
THU MAR 14 17:27:50 1991  CRV_STI.DLL  PAGE 29, LINE 1653

0000073620  0007  8578  0120  8483  0100  0016  837F  0086
0000073640  2C83  8302  04A7  8183  8300  0081  8283  8300
0000073660  053D  3801  7F00  0282  6469  8200  6E04  6D61
0000073700  0465  0482  6572  7463  8224  6104  7474  2C72
0000073720  0582  7564  6D6D  2E79  0A82  6974  656D  735F
0000073740  6174  706D  8230  7305  6170  6572  0134  0001
0000073760  0180  0001  0180  0001  0180  0001  0180  0001
*
0000074160  0180  0001  0180  0001  0180  0018  8579  0140
0000074200  8303  0565  6683  8205  280A  6E75  6174  6767
0000074220  6465  6929  0701  7800  1085  8301  0084  0A01
0000074240  7F00  8683  8300  0085  6483  0105  0015  827F
0000074260  6902  0064  0482  6973  657A  8204  7305  6170
0000074300  6572  0106  0001  0180  0001  0180  0001  0180
0000074320  0001  0180  0001  0180  0001  0180  0001  0180
*
0000074360  0001  0180  0001  0180  0018  8579  0110  8311
0000074400  0575  7683  8205  280A  6E75  6174  6767  6465
0000074420  6929  3401  7F00  8583  8300  0085  8583  8300
0000074440  0085  8583  8300  0085  8183  8300  0085  8583
0000074460  8300  0085  8483  8300  0085  8583  8300  0085
0000074500  8583  8300  0085  8583  0100  0106  827F  7409
0000074520  6D69  5F65  6E75  7469  8200  6D0F  6E69  725F
0000074540  6365  726F  5F64  6974  656D  8202  7309  6174
0000074560  6962  696C  7974  8204  630F  7061  7574  6572
0000074600  745F  6D69  6F65  7475  8206  6B0A  7965  665F
0000074620  726F  616D  0874  1382  6F63  746E  6E69  6F75
0000074640  7375  745F  6172  6B63  6E69  0A67  0E82  6F6D
0000074660  7375  5F65  7274  6361  696B  676E  820C  6311
0000074700  7061  7574  6572  735F  6769  616E  7574  6572
0000074720  820E  680B  746F  656B  5F79  7973  636E  8210
0000074740  640C  6665  7561  746C  745F  6D69  1265  0982
0000074760  616D  5F78  6564  616C  1479  0B82  6166  7473
0000075000  725F  7065  616C  1679  0E82  6576  6972  7966
0000075020  745F  6D69  6F65  7475  8218  770C  6961  5F74
0000075040  6974  656D  756F  1A74  0C82  7973  636E  745F
0000075060  6D69  6F65  7475  821C  7409  7268  7365  6F68
0000075100  646C  821E  630C  6568  6B63  6C5F  6F6F  756B
0000075120  2070  0101  8000  0701  7800  0085  8308  0080
0000075140  0101  8000  0101  8000  0101  8000  0101  8000
*
0000075340  0101  8000  1601  7900  0240  9B83  8305  059C
0000075360  0A82  7528  746E  6761  6567  2964  0169  0007
0000075400  837F  0082  8283  0100  0017  827F  6408  6665
0000075420  745F  6D69  0065  0882  696D  5F6E  6974  656D
0000075440  0104  0001  0180  0001  0180  0001  0180  0001
0000075460  0180  0001  0180  0001  0180  0016  4079  8304
0000075500  05A4  A583  8205  280A  6E75  6174  6767  6465
0000075520  6929  0D01  7F00  8483  8300  0084  8483  8300
0000075540  04A4  2901  7F00  0782  6261  5F73  6572  006C
0000075560  0582  6E75  7469  0173  0C82  7073  6365  6169
0000075600  5F6C  7566  636E  8202  6404  7369  0470  0101
0000075620  8000  0101  8000  0101  8000  1601  7900  0220
0000075640  AA83  8305  05AB  0A82  7528  746E  6761  6567
0000075660  2964  0169  0007  837F  0081  8183  0100  001E
0000075700  827F  7309  6E79  5F63  6F6D  6564  8200  730E
0000075720  6E79  5F63  7865  6365  6D5F  646F  0265  1601
0000075740  7900  0230  AD83  8305  05AE  0A82  7528  746E
0000075760  6761  6567  2964  0169  0007  837F  0082  8183
```

THU MAR 14 17:27:50 1991 CRV_STI.DLL PAGE 30, LINE 1712

| | | | | | | | | |
|---|---|---|---|---|---|---|---|---|
| 0000076000 | 0100 | 0019 | 827F | 7407 | 6365 | 5F68 | 6469 | 8200 |
| 0000076020 | 740B | 6365 | 5F68 | 6572 | 7361 | 6E6F | 0104 | 0001 |
| 0000076040 | 0180 | 0001 | 0180 | 0001 | 0180 | 0018 | 8579 | 0220 |
| 0000076060 | 8303 | 05B3 | B483 | 8205 | 280A | 6E75 | 6174 | 6767 |
| 0000076100 | 6465 | 6929 | 0A01 | 7F00 | 2C83 | 8302 | 022C | 8683 |
| 0000076120 | 0100 | 001A | 827F | 6905 | 616D | 6567 | 8200 | 6404 |
| 0000076140 | 6669 | 2066 | 0782 | 6964 | 6666 | 695F | 4064 | 1801 |
| 0000076160 | 7900 | 1085 | 0203 | B783 | 8305 | 05B8 | 0A82 | 7528 |
| 0000076200 | 746E | 6761 | 6567 | 2964 | 0169 | 0007 | 8578 | 0300 |
| 0000076220 | 2C83 | 0102 | 0007 | 837F | 0085 | B683 | 0105 | 0024 |
| 0000076240 | 827F | 6E0E | 6D75 | 6F5F | 5F66 | 6373 | 6572 | 6E65 |
| 0000076260 | 0073 | 0F82 | 6D69 | 6761 | 5F65 | 616E | 656D | 6C5F |
| 0000076300 | 7369 | 0274 | 1601 | 7900 | 0120 | BA83 | 8305 | 05BB |
| 0000076320 | 0A82 | 7528 | 746E | 6761 | 6567 | 2964 | 0169 | 0004 |
| 0000076340 | 837F | 00C0 | 0A01 | 7F00 | 0682 | 7473 | 6972 | 676E |
| 0000076360 | 0100 | 0001 | 0180 | 0001 | 0180 | 0001 | 0180 | 0016 |
| 0000076400 | 3079 | 8302 | 05C0 | C183 | 8205 | 280A | 6E75 | 6174 |
| 0000076420 | 6767 | 6465 | 6929 | 0701 | 7F00 | 8283 | 8300 | 0081 |
| 0000076440 | 1E01 | 7F00 | 0C82 | 7865 | 6563 | 7470 | 6F69 | 5F6E |
| 0000076460 | 6469 | 8200 | 650B | 6378 | 5F70 | 7473 | 7461 | 7375 |
| 0000076500 | 0104 | 0016 | 2079 | 8302 | 05C6 | C783 | 8205 | 280A |
| 0000076520 | 6E75 | 6174 | 6767 | 6465 | 6929 | 1601 | 7900 | 0208 |
| 0000076540 | C483 | 8305 | 05C5 | 0A82 | 7528 | 746E | 6761 | 6567 |
| 0000076560 | 2964 | 0169 | 0007 | 837F | 0084 | 8483 | 0100 | 0018 |
| 0000076600 | 827F | 6B08 | 7965 | 635F | 646F | 0065 | 0C82 | 7773 |
| 0000076620 | 7469 | 6863 | 735F | 6174 | 6574 | 0100 | 0007 | 837F |
| 0000076640 | 0081 | C383 | 0105 | 0018 | 827F | 6B08 | 7965 | 745F |
| 0000076660 | 7079 | 0065 | 0982 | 656B | 5F79 | 6176 | 756C | 0265 |
| 0000076700 | 1801 | 7900 | 3085 | 0402 | CA83 | 8305 | 05CB | 0A82 |
| 0000076720 | 7528 | 746E | 6761 | 6567 | 2964 | 0169 | 0007 | 8578 |
| 0000076740 | 0200 | C283 | 0105 | 000D | 837F | 0085 | C983 | 8305 |
| 0000076760 | 0081 | 8183 | 0100 | 002E | 827F | 7308 | 7165 | 735F |
| 0000077000 | 7A69 | 0065 | 0382 | 6573 | 0271 | 0882 | 656B | 5F79 |
| 0000077020 | 7461 | 7274 | 8242 | 610E | 7463 | 7669 | 7461 | 6465 |
| 0000077040 | 665F | 6E75 | 4463 | 0101 | 8000 | 0101 | 8000 | 0101 |
| 0000077060 | 8000 | 0101 | 8000 | 0101 | 8000 | 0101 | 8000 | 0101 |
| 0000077100 | 8000 | 0101 | 8000 | 1601 | 7900 | 0220 | D583 | 8305 |
| 0000077120 | 05D6 | 0A82 | 7528 | 746E | 6761 | 6567 | 2964 | 0169 |
| 0000077140 | 0007 | 837F | 0081 | 8183 | 0100 | 0017 | 827F | 6B08 |
| 0000077160 | 7965 | 615F | 7474 | 0072 | 0882 | 7566 | 636E | 6B5F |
| 0000077200 | 7965 | 0102 | 0018 | 8579 | 0210 | 8302 | 05D8 | D983 |
| 0000077220 | 8205 | 280A | 6E75 | 6174 | 6767 | 6465 | 6929 | 0701 |
| 0000077240 | 7F00 | 8583 | 8300 | 05C9 | 1201 | 7F00 | 0882 | 6573 |
| 0000077260 | 5F71 | 6973 | 657A | 8200 | 7303 | 7165 | 0102 | 0001 |
| 0000077300 | 0180 | 0001 | 0180 | 0001 | 0180 | 0001 | 0180 | 0001 |
| 0000077320 | 0180 | 0018 | 8579 | 02D0 | 8302 | 05E0 | E183 | 8205 |
| 0000077340 | 280A | 6E75 | 6174 | 6767 | 6465 | 6929 | 0701 | 7F00 |
| 0000077360 | 3C83 | 8305 | 0081 | 1101 | 7F00 | 0682 | 6966 | 746C |
| 0000077400 | 7265 | 8200 | 6D04 | 646F | 5865 | 1801 | 7900 | 5085 |
| 0000077420 | 0501 | E383 | 8305 | 05E4 | 0A82 | 7528 | 746E | 6761 |
| 0000077440 | 6567 | 2964 | 0169 | 0010 | 837F | 022C | 8683 | 8300 |
| 0000077460 | 0081 | 8183 | 8300 | 0081 | 2B01 | 7F00 | 0482 | 616E |
| 0000077500 | 656D | 8200 | 6CD6 | 6269 | 695F | 2064 | 0582 | 6C63 |
| 0000077520 | 7361 | 2473 | 0582 | 7473 | 6C79 | 2665 | 0782 | 706F |
| 0000077540 | 635F | 646F | 2865 | 0101 | 8000 | 0101 | 8000 | 0101 |
| 0000077560 | 8000 | 1B01 | 7900 | 0920 | E983 | 8305 | 05EA | 0F82 |
| 0000077600 | 5F69 | 5F75 | 736D | 5F67 | 6170 | 6172 | 5F6D | 6974 |
| 0000077620 | 1C01 | 7F00 | 8183 | 8300 | 0085 | 8283 | 8300 | 0086 |
| 0000077640 | 8883 | 8300 | 0080 | 8483 | 8300 | 00C0 | C083 | 0100 |

THU MAR 14 17:27:50 1991 CRV_STI.DLL PAGE 31, LINE 1771

```
0000077660  006A  827F  6909  755F  735F  6F68  7472  8200
0000077700  690A  755F  755F  6873  726F  0074  0882  5F69
0000077720  5F75  6F6C  676E  8200  6909  755F  755F  6F6C
0000077740  676E  8200  6909  755F  665F  6F6C  7461  8200
0000077760  6908  755F  635F  6168  0072  0982  5F69  5F75
0000100000  6375  6168  0072  0782  5F69  5F75  7473  0072
0000100020  0982  5F69  5F75  6C62  636F  006B  1901  7900
0000100040  0230  EC83  8305  05ED  0D82  5F69  736D  5F67
0000100060  6170  6172  5F6D  6974  0701  7F00  8583  8300
0000100100  05E8  1001  7F00  0482  7974  6570  8200  7605
0000100120  6C61  6575  0102  0001  0180  001C  8579  0090
0000100140  8309  05F0  F183  8205  690E  6D5F  6773  685F
0000100160  6165  6564  5F72  6974  1C01  7F00  8183  8300
0000100200  0081  8583  8300  0085  8483  8300  0085  8583
0000100220  8300  0081  8583  0100  0047  827F  7104  695F
0000100240  0064  0682  6F73  7275  6563  8202  7003  6469
0000100260  8204  7403  6469  8206  7204  7365  0870  0882
0000100300  6572  7073  745F  6469  820A  6F07  5F70  6F63
0000100320  6564  820C  7404  7079  0E65  0482  6973  657A
0000100340  0110  0015  8579  00C0  8302  05F4  F583  8205
0000100360  6907  6D5F  6773  745F  0169  0005  3078  EB83
0000100400  0105  0007  837F  05EF  F383  0105  0017  827F
0000100420  6806  6165  6564  0072  0A82  6170  6172  5F6D
0000100440  696C  7473  0112  0001  0180  0001  0180  0001
0000100460  0180  0007  737A  F283  8205  0100  0001  0180
0000100500  0001  0180  0001  0180  0001  0180  0001  0180
*
0000100720  0016  4079  8302  0620  2183  8206  280A  6E75
0000100740  6174  6767  6465  6929  0701  7F00  8683  8300
0000100760  0086  1801  7F00  0682  7374  5F74  6469  8200
0000101000  640B  6669  5F66  7374  5F74  6469  0104  0016
0000101020  4079  8303  0624  2583  8206  280A  6E75  6174
0000101040  6767  6465  6929  0701  7A00  8373  05C8  0082
0000101060  0A01  7F00  8183  8300  0081  2383  0106  002B
0000101100  827F  6106  7463  6F69  006E  0F82  756E  5F6D
0000101120  666F  735F  666F  6B74  7965  0273  0C82  6F73
0000101140  7466  656B  7379  705F  7274  0104  0016  4079
0000101160  8303  0628  2983  8206  280A  6E75  6174  6767
0000101200  6465  6929  0701  7A00  8373  05D7  0082  0A01
0000101220  7F00  8183  8300  0081  2783  0106  0029  827F
0000101240  6106  7463  6F69  006E  0E82  756E  5F6D  666F
0000101260  685F  746F  656B  7379  8202  680B  746F  656B
0000101300  7379  705F  7274  0104  0018  8579  0170  8305
0000101320  062B  2C83  8206  280A  6E75  6174  6767  6465
0000101340  6929  1001  7F00  2C83  8302  0086  F583  8304
0000101360  00E4  8583  0100  003D  827F  690A  616D  6567
0000101400  6E5F  6D61  0065  0882  6D69  6761  5F65  6469
0000101420  8220  6909  616D  6567  705F  7274  8224  6C09
0000101440  7961  7265  705F  7274  8228  6909  616D  6567
0000101460  685F  6C64  012C  0001  0180  0001  0180  0001
0000101500  0180  0001  0180  0018  8579  0190  8302  0632
0000101520  3383  8206  280A  6E75  6174  6767  6465  6929
0000101540  0701  7F00  8283  8300  062A  1801  7F00  0C82
0000101560  7865  6563  7470  6F69  5F6E  6469  8200  6905
0000101600  616D  6567  0104  0001  0180  0016  4079  8303
0000101620  0637  3883  8206  280A  6E75  6174  6767  6465
0000101640  6929  0701  7A00  8373  0631  0082  0A01  7F00
0000101660  8183  8300  0081  3683  0106  002F  827F  6106
0000101700  7463  6F69  006E  1182  756E  5F6D  666F  655F
```

THU MAR 14 17:27:50 1991 CRV_STI.DLL PAGE 32, LINE 1830

| | | | | | | | | |
|---|---|---|---|---|---|---|---|---|
| 0000101720 | 6378 | 7065 | 6974 | 6E6F | 0273 | 0E82 | 7865 | 6563 |
| 0000101740 | 7470 | 6F69 | 5F6E | 696C | 7473 | 0104 | 0018 | 8579 |
| 0000101760 | 0450 | 8303 | 063A | 3B83 | 8206 | 280A | 6E75 | 6174 |
| 0000102000 | 6767 | 6465 | 6929 | 0A01 | 7F00 | 2A83 | 8306 | 062A |
| 0000102020 | 2A83 | 0106 | 001A | 827F | 6906 | 616D | 6567 | 0031 |
| 0000102040 | 0682 | 6D69 | 6761 | 3265 | 822E | 6404 | 6669 | 5C66 |
| 0000102060 | 1801 | 7900 | A085 | 0301 | 3E83 | 8306 | 063F | 0A82 |
| 0000102100 | 7528 | 746E | 6761 | 6567 | 2964 | 0169 | 0007 | 737A |
| 0000102120 | 2A83 | 8206 | 0100 | 000A | 837F | 0081 | 3D83 | 8306 |
| 0000102140 | 062A | 2601 | 7F00 | 0E82 | 756E | 5F6D | 666F | 735F |
| 0000102160 | 7263 | 6565 | 736E | 8200 | 690A | 616D | 6567 | 6C5F |
| 0000102200 | 7369 | 0274 | 0482 | 6964 | 6666 | 0106 | 0018 | 8579 |
| 0000102220 | 0210 | 8303 | 0641 | 4283 | 8206 | 280A | 6E75 | 6174 |
| 0000102240 | 6767 | 6465 | 6929 | 0A01 | 7F00 | 2C83 | 8302 | 022C |
| 0000102260 | 8183 | 0100 | 0019 | 827F | 6906 | 616D | 6567 | 0031 |
| 0000102300 | 0682 | 6D69 | 6761 | 3265 | 8220 | 6303 | 7475 | 0140 |
| 0000102320 | 0018 | 8579 | 0940 | 8307 | 0647 | 4883 | 8206 | 280A |
| 0000102340 | 6E75 | 6174 | 6767 | 6465 | 6929 | 1801 | 7900 | 0085 |
| 0000102360 | 1D08 | 4583 | 8306 | 0646 | 0A82 | 7528 | 746E | 6761 |
| 0000102400 | 6567 | 2964 | 0169 | 0058 | 837F | 0084 | 7883 | 8305 |
| 0000102420 | 0084 | 8483 | 8300 | 05A3 | 8183 | 8300 | 04AF | A983 |
| 0000102440 | 8305 | 05DF | 3C83 | 8305 | 0081 | 2683 | 8306 | 05AC |
| 0000102460 | 3583 | 8306 | 05BF | 8183 | 8300 | 0622 | 2A83 | 8306 |
| 0000102500 | 0639 | 3C83 | 8306 | 05B5 | 8583 | 8300 | 05B2 | 4083 |
| 0000102520 | 8306 | 05B9 | 7483 | 8305 | 05D4 | E283 | 8305 | 0084 |
| 0000102540 | 6F01 | 7F01 | 0A82 | 626B | 5F64 | 7473 | 7461 | 7375 |
| 0000102560 | 8200 | 7409 | 7365 | 5F74 | 616E | 656D | 8200 | 6B08 |
| 0000102600 | 7965 | 635F | 646F | 0065 | 0C82 | 7773 | 7469 | 6863 |
| 0000102620 | 735F | 6174 | 6574 | 8200 | 6C0C | 636F | 7461 | 726F |
| 0000102640 | 645F | 7369 | 0070 | 0E82 | 7274 | 6361 | 696B | 676E |
| 0000102660 | 6C5F | 7665 | 6C65 | 8200 | 730C | 6163 | 656C | 775F |
| 0000102700 | 6E69 | 6F64 | 0077 | 0982 | 7973 | 636E | 6D5F | 646F |
| 0000102720 | 0065 | 0A82 | 6966 | 746C | 7265 | 6D5F | 6773 | 8200 |
| 0000102740 | 6606 | 6C69 | 6574 | 0072 | 0B82 | 7563 | 7272 | 6E65 |
| 0000102760 | 5F74 | 6F61 | 0069 | 0C82 | 6F68 | 6B74 | 7965 | 5F73 |
| 0000103000 | 696C | 7473 | 8200 | 730A | 6E79 | 5F63 | 7665 | 6E65 |
| 0000103020 | 0074 | 0E82 | 7865 | 6563 | 7470 | 6F69 | 5F6E | 696C |
| 0000103040 | 7473 | 8200 | 6510 | 6378 | 5F70 | 7473 | 7461 | 7375 |
| 0000103060 | 6C5F | 7369 | 0074 | 0482 | 6F6D | 6564 | 8200 | 730D |
| 0000103100 | 666F | 6B74 | 7965 | 5F73 | 696C | 7473 | 8200 | 6905 |
| 0000103120 | 616D | 6567 | 8200 | 6307 | 6D6F | 6170 | 6572 | 8200 |
| 0000103140 | 770B | 6961 | 5F74 | 6373 | 6572 | 6E65 | 8200 | 690A |
| 0000103160 | 616D | 6567 | 6C5F | 7369 | 0074 | 0982 | 6D69 | 6761 |
| 0000103200 | 5F65 | 756E | 006D | 0A82 | 6D69 | 6761 | 5F65 | 6964 |
| 0000103220 | 6666 | 8200 | 680B | 6C61 | 5F66 | 6D69 | 6761 | 7365 |
| 0000103240 | 8200 | 6D07 | 7361 | 6173 | 6567 | 8200 | 7006 | 7261 |
| 0000103260 | 6D61 | 0073 | 0882 | 7566 | 636E | 6B5F | 7965 | 8200 |
| 0000103300 | 6908 | 6F63 | 5F6E | 736D | 0067 | 0582 | 7564 | 6D6D |
| 0000103320 | 0079 | 1601 | 7F00 | 8183 | 8300 | 05F2 | 8183 | 8300 |
| 0000103340 | 059A | 4483 | 8306 | 0081 | 8583 | 0100 | 005A | 827F |
| 0000103360 | 7306 | 756F | 6372 | 0065 | 0A82 | 736D | 5F67 | 6568 |
| 0000103400 | 6461 | 7265 | 8202 | 650A | 6576 | 746E | 745F | 7079 |
| 0000103420 | 1A65 | 0682 | 6974 | 696D | 676E | 821C | 650B | 6576 |
| 0000103440 | 746E | 765F | 6C61 | 6575 | 8224 | 720C | 7465 | 7275 |
| 0000103460 | 5F6E | 6176 | 756C | 8565 | 0124 | 0982 | 6572 | 7073 |
| 0000103500 | 665F | 616C | 8567 | 0126 | 0101 | 8000 | 0101 | 8000 |
| 0000103520 | 0101 | 8000 | 0101 | 8000 | 1801 | 7900 | 5085 | 0201 |
| 0000103540 | 4E83 | 8306 | 064F | 0A82 | 7528 | 746E | 6761 | 6567 |
| 0000103560 | 2964 | 0169 | 0007 | 837F | 0563 | 8483 | 0100 | 0016 |

THU MAR 14 17:27:50 1991 CRV_STI.DLL PAGE 33, LINE 1889

```
0000103600  827F  6707  6E65  685F  7264  8200  6708  6E65
0000103620  745F  7079  2865  0101  8000  0101  8000  0101
0000103640  8000  0101  8000  0101  8000  0101  8000  0101
*
0000103740  8000  0101  8000  0101  8000  0701  7A00  8373
0000103760  0643  0082  0101  8000  0101  8000  0701  7A00
0000104000  8373  0643  0082  0101  8000  0101  8000  0101
0000104020  8000  0101  8000  0101  8000  0101  8000  0101
*
0000104120  8000  0101  8000  1601  7900  0330  7E83  8306
0000104140  067F  0A82  7528  746E  6761  6567  2964  0169
0000104160  000A  837F  0081  8183  8300  0081  1C01  7F00
0000104200  0682  6170  6B63  685F  8200  6606  6C69  5F65
0000104220  0268  0682  7566  636E  685F  0104  0001  0180
0000104240  0001  0180  0001  0180  0001  0180  0001  0180
*
0000104440  0001  0180  0005  5878  8083  0100  0005  3078
0000104460  8083  0100  0001  0180  0001  0180  0007  737A
0000104500  6883  8206  0100  0001  0180  0001  0180  000A
0000104520  8075  0083  6402  8301  06AA  0401  7F00  C083
0000104540  0100  0007  737A  C483  8200  0100  000A  8075
0000104560  8183  6400  8303  06AD  0A01  7F00  AB83  8306
0000104600  00C5  6883  0106  000A  8075  0083  6402  8303
0000104620  06AF  0A01  7F00  AB83  8306  00C5  C283  0100
0000104640  000A  8075  8183  6400  8302  06B1  0701  7F00
0000104660  8683  8300  0668  0A01  7500  8380  0081  0464
0000104700  B383  0106  000D  837F  0086  AB83  8306  00C5
0000104720  C583  0100  000A  8075  0083  7302  8300  0201
0000104740  0A01  7500  8380  00C6  0073  0183  0102  0004
0000104760  837F  00C4  0A01  7500  8380  0200  0164  B683
0000105000  0106  0001  0180  0005  6878  8083  0100  0005
0000105020  2078  8083  0100  0007  737A  BC83  8206  0100
0000105040  000A  8075  8183  6400  8300  0201  0501  7800
0000105060  8360  0082  0501  7800  8340  0080  0701  7800
0000105100  A885  8300  0080  0501  7800  8378  0080  0A01
0000105120  7500  8380  0081  0064  0183  0102  0004  837F
0000105140  06A6  0A01  7500  8380  0081  0164  C283  0106
0000105160  0007  8578  2000  8483  0100  0007  8578  0800
0000105200  8483  0100  0007  8578  00B0  8083  0100  000A
0000105220  8075  8183  7300  8300  0201  0401  7F00  C083
0000105240  0100  000A  8075  0083  6402  8301  06C8  0701
0000105260  7800  9085  8300  0080  0701  7800  9885  8300
0000105300  0080  0701  7800  A085  8300  0080  0701  7800
0000105320  E885  8300  0080  0A01  7F00  AB83  8306  00C5
0000105340  6883  0106  000A  8075  8183  6400  8303  06CE
0000105360  0101  8000  0101  8000  0101  8000  0101  8000
*
0000105420  0A01  7F00  AB83  8306  00C5  6883  0106  000A
0000105440  8075  8183  6400  8303  06D8  0101  8000  0101
0000105460  8000  0101  8000  0A01  7F00  AB83  8306  00C5
0000105500  C283  0100  000A  8075  0083  6402  8303  06DD
0000105520  0101  8000  0701  7F00  8683  8300  0668  0A01
0000105540  7500  8380  0081  0264  ED83  0106  0007  737A
0000105560  4D83  8206  0100  0001  0180  000D  837F  0086
0000105600  AB83  8306  00C5  C583  0100  000A  8075  8183
0000105620  6400  8304  06E4  0101  8000  0A01  7500  8380
0000105640  00C6  0073  0183  0102  000A  8075  C683  7300
0000105660  8300  0201  0A01  7500  8380  0665  0073  0183
0000105700  0102  000A  8075  8583  7300  8300  0201  0A01
```

```
THU MAR 14 17:27:50 1991  CRV_STI.DLL  PAGE 34, LINE 1948

0000105720  7500  8380  0200  0073  0183  0102  000A  8075
0000105740  0083  7302  8300  0201  0401  7F00  8683  0100
0000105760  000A  8075  0083  7302  8301  06ED  0401  7F00
0000106000  8683  0100  000A  8075  0083  7302  8301  06EF
0000106020  0A01  7500  8380  0081  0064  0183  0102  0001
0000106040  0180  0001  0180  0001  0180  0001  0180  0001
*
0000106300  0180  0001  0180  0001  0180  0007  8578  0100
0000106320  8083  0100  0001  0180  0001  0180  0001  0180
0000106340  0001  0180  0001  0180  0001  0180  0001  0180
*
0000113240  0001  0180  0001  0180  0007  737A  A383  8204
0000113260  0100  000A  8075  8183  6400  8300  0201  0101
0000113300  8000  0101  8000  0101  8000  0101  8000  0101
*
0000113740  8000  0101  8000  0101  8000  0101  8000  1601
0000113760  7900  0220  F183  8304  04F2  0A82  7528  746E
0000114000  6761  6567  2964  0169  0007  837F  0081  8183
0000114020  0100  0009  827F  7801  8200  7901  0102  0016
0000114040  4079  8302  04F4  F583  8204  280A  6E75  6174
0000114060  6767  6465  6929  0701  7F00  F083  8304  04F0
0000114100  0D01  7F00  0382  696D  006E  0382  616D  0478
0000114120  0101  8000  1601  7900  0220  F883  8304  04F9
0000114140  0A82  7528  746E  6761  6567  2964  0169  0007
0000114160  837F  0085  8583  0100  0012  827F  7705  6469
0000114200  6874  8200  6806  6965  6867  0274  0101  8000
0000114220  1601  7900  0240  FC83  8304  04FD  0A82  7528
0000114240  746E  6761  6567  2964  0169  0007  837F  04F0
0000114260  F783  0104  0011  827F  6F06  6972  6967  006E
0000114300  0482  7261  6165  0104  0001  0180  0001  0180
0000114320  0001  0180  0001  0180  0001  0180  0001  0180
*
0000114560  0001  0180  0001  0180  0001  0180  0016  3079
0000114600  8303  052C  2D83  8205  280A  6E75  6174  6767
0000114620  6465  6929  0A01  7F00  8583  8300  0085  8583
0000114640  0100  001A  827F  7705  6469  6874  8200  6806
0000114660  6965  6867  0274  0582  6564  7470  0468  1801
0000114700  7900  4085  0801  3083  8305  0531  0A82  7528
0000114720  746E  6761  6567  2964  0169  0007  8578  0080
0000114740  8483  0100  0019  837F  0081  2B83  8305  0085
0000114760  8583  8300  00C4  8283  8300  00E4  2F83  0105
0000115000  005A  827F  7206  7065  6572  0073  0682  6964
0000115020  656D  736E  8202  6410  7461  5F61  616C  6579
0000115040  5F72  6564  7470  0868  0882  6973  5F67  6973
0000115060  657A  820A  7307  6769  705F  7274  820C  6209
0000115100  6D74  5F70  6973  657A  8210  6208  6D74  5F70
0000115120  7470  1472  0582  7073  7261  1865  0101  8000
0000115140  1801  7900  A085  0C05  3583  8305  0536  0A82
0000115160  7528  746E  6761  6567  2964  0169  0007  8578
0000115200  0180  8483  0100  0025  837F  0086  2C83  8302
0000115220  022C  8683  8300  0081  8583  8300  0086  8283
0000115240  8300  0086  F083  8304  052E  3483  0105  007E
0000115260  827F  6902  0064  0482  616E  656D  8204  6609
0000115300  6C69  5F65  616E  656D  8224  6509  7078  745F
0000115320  5F63  6469  8244  7404  7079  4865  0C82  6572
0000115340  5F66  696C  656E  6E5F  6D75  824A  7209  6665
0000115360  745F  5F63  6469  824C  740A  6D69  5F65  7473
0000115400  6D61  5070  0682  6F61  5F69  6469  8254  6C08
0000115420  636F  7461  6F69  586E  0982  7462  706D  695F
```

```
THU MAR 14 17:27:50 1991  CRV_STI.DLL  PAGE 35, LINE 2007

0000115440  666E  5C6F  0582  7073  7261  8565  0084  0101
0000115460  8000  0101  8000  0101  8000  0101  8000  0101
*
0000115520  8000  0101  8000  0701  7A00  8373  0533  0082
0000115540  0101  8000  0101  8000  0101  8000  0101  8000
*
0000116160  0101  8000  0101  8000  1801  7900  C085  0702
0000116200  8A83  8305  058B  0A82  7528  746E  6761  6567
0000116220  2964  0169  0007  8578  0120  8483  0100  0016
0000116240  837F  0086  2C83  8302  04F3  8183  8300  0081
0000116260  8283  8300  0589  3801  7F00  0282  6469  8200
0000116300  6E04  6D61  0465  0482  6572  7463  8224  6104
0000116320  7474  2C72  0582  7564  6D6D  2E79  0A82  6974
0000116340  656D  735F  6174  706D  8230  7305  6170  6572
0000116360  0134  0001  0180  0001  0180  0001  0180  0001
0000116400  0180  0001  0180  0001  0180  0001  0180  0001
*
0000116560  0180  0001  0180  0001  0180  0001  0180  0018
0000116600  8579  0140  8303  05B1  B283  8205  280A  6E75
0000116620  6174  6767  6465  6929  0701  7800  1085  8301
0000116640  0084  0A01  7F00  8683  8300  0085  B083  0105
0000116660  0015  827F  6902  0064  0482  6973  657A  8204
0000116700  7305  6170  6572  0106  0001  0180  0001  0180
0000116720  0001  0180  0001  0180  0001  0180  0001  0180
*
0000116760  0001  0180  0001  0180  0001  0180  0018  8579
0000117000  0110  8311  05C1  C283  8205  280A  6E75  6174
0000117020  6767  6465  6929  3401  7F00  8583  8300  0085
0000117040  8583  8300  0085  8583  8300  0085  8183  8300
0000117060  0085  8583  8300  0085  8483  8300  0085  8583
0000117100  8300  0085  8583  8300  0085  8583  0100  0106
0000117120  827F  7409  6D69  5F65  6E75  7469  8200  6D0F
0000117140  6E69  725F  6365  726F  5F64  6974  656D  8202
0000117160  7309  6174  6962  696C  7974  8204  630F  7061
0000117200  7574  6572  745F  6D69  6F65  7475  8206  6B0A
0000117220  7965  665F  726F  616D  0874  1382  6F63  746E
0000117240  6E69  6F75  7375  745F  6172  6B63  6E69  0A67
0000117260  0E82  6F6D  7375  5F65  7274  6361  696B  676E
0000117300  820C  6311  7061  7574  6572  735F  6769  616E
0000117320  7574  6572  820E  680B  746F  656B  5F79  7973
0000117340  636E  8210  640C  6665  7561  746C  745F  6D69
0000117360  1265  0982  616D  5F78  6564  616C  1479  0B82
0000117400  6166  7473  725F  7065  616C  1679  0E82  6576
0000117420  6972  7966  745F  6D69  6F65  7475  8218  770C
0000117440  6961  5F74  6974  656D  756F  1A74  0C82  7973
0000117460  636E  745F  6D69  6F65  7475  821C  7409  7268
0000117500  7365  6F68  646C  821E  630C  6568  6B63  6C5F
0000117520  6F6F  756B  2070  0101  8000  0701  7800  0085
0000117540  8308  0080  0101  8000  0101  8000  0101  8000
0000117560  0101  8000  0101  8000  0101  8000  0101  8000
*
0000117740  0101  8000  0101  8000  1601  7900  0240  E783
0000117760  8305  05E8  0A82  7528  746E  6761  6567  2964
0000120000  0169  0007  837F  0082  8283  0100  0017  827F
0000120020  6408  6665  745F  6D69  0065  0882  696D  5F6E
0000120040  6974  656D  0104  0016  5079  8302  05EA  EB83
0000120060  8205  280A  6E75  6174  6767  6465  6929  0701
0000120100  7F00  8483  8300  05E6  1001  7F00  0382  656B
0000120120  0079  0682  6974  696D  676E  0102  0016  5079
```

THU MAR 14 17:27:50 1991 CRV_STI.DLL PAGE 36, LINE 2066

| | | | | | | | | |
|---|---|---|---|---|---|---|---|---|
| 0000120140 | 8302 | 05ED | EE83 | 8205 | 280A | 6E75 | 6174 | 6767 |
| 0000120160 | 6465 | 6929 | 0701 | 7F00 | 8483 | 8300 | 05E6 | 1101 |
| 0000120200 | 7F00 | 0482 | 6B6D | 7965 | 8200 | 7406 | 6D69 | 6E69 |
| 0000120220 | 0267 | 1601 | 7900 | 0440 | F083 | 8305 | 05F1 | 0A82 |
| 0000120240 | 7528 | 746E | 6761 | 6567 | 2964 | 0169 | 000D | 837F |
| 0000120260 | 0084 | 8483 | 8300 | 0084 | F083 | 0104 | 0029 | 827F |
| 0000120300 | 6107 | 7362 | 725F | 6C65 | 8200 | 7505 | 696E | 7374 |
| 0000120320 | 8201 | 730C | 6570 | 6963 | 6C61 | 665F | 6E75 | 0263 |
| 0000120340 | 0482 | 6964 | 7073 | 0104 | 0001 | 0180 | 0001 | 0180 |
| 0000120360 | 0001 | 0180 | 0016 | 2079 | 8302 | 05F6 | F783 | 8205 |
| 0000120400 | 280A | 6E75 | 6174 | 6767 | 6465 | 6929 | 0701 | 7F00 |
| 0000120420 | 8183 | 8300 | 0081 | 1E01 | 7F00 | 0982 | 7973 | 636E |
| 0000120440 | 6D5F | 646F | 0065 | 0E82 | 7973 | 636E | 655F | 6578 |
| 0000120460 | 5F63 | 6F6D | 6564 | 0102 | 0016 | 3079 | 8302 | 05F9 |
| 0000120500 | FA83 | 8205 | 280A | 6E75 | 6174 | 6767 | 6465 | 6929 |
| 0000120520 | 0701 | 7F00 | 8283 | 8300 | 0081 | 1901 | 7F00 | 0782 |
| 0000120540 | 6574 | 6863 | 695F | 0064 | 0B82 | 6574 | 6863 | 725F |
| 0000120560 | 6165 | 6F73 | 046E | 0101 | 8000 | 0101 | 8000 | 0101 |
| 0000120600 | 8000 | 1801 | 7900 | 2085 | 0302 | FF83 | 8305 | 0600 |
| 0000120620 | 0A82 | 7528 | 746E | 6761 | 6567 | 2964 | 0169 | 000A |
| 0000120640 | 837F | 022C | 2C83 | 8302 | 0086 | 1A01 | 7F00 | 0582 |
| 0000120660 | 6D69 | 6761 | 0065 | 0482 | 6964 | 6666 | 8220 | 6407 |
| 0000120700 | 6669 | 5F66 | 6469 | 0140 | 0018 | 8579 | 0310 | 8302 |
| 0000120720 | 0603 | 0483 | 8206 | 280A | 6E75 | 6174 | 6767 | 6465 |
| 0000120740 | 6929 | 0701 | 7800 | 0085 | 8303 | 022C | 0701 | 7F00 |
| 0000120760 | 8583 | 8300 | 0602 | 2401 | 7F00 | 0E82 | 756E | 5F6D |
| 0000121000 | 666F | 735F | 7263 | 6565 | 736E | 8200 | 690F | 616D |
| 0000121020 | 6567 | 6E5F | 6D61 | 5F65 | 696C | 7473 | 0102 | 0016 |
| 0000121040 | 2079 | 8301 | 0606 | 0783 | 8206 | 280A | 6E75 | 6174 |
| 0000121060 | 6767 | 6465 | 6929 | 0401 | 7F00 | C083 | 0100 | 000A |
| 0000121100 | 827F | 7306 | 7274 | 6E69 | 0067 | 0101 | 8000 | 0101 |
| 0000121120 | 8000 | 0101 | 8000 | 1601 | 7900 | 0230 | 0C83 | 8306 |
| 0000121140 | 060D | 0A82 | 7528 | 746E | 6761 | 6567 | 2964 | 0169 |
| 0000121160 | 0007 | 837F | 0082 | 8183 | 0100 | 001E | 827F | 650C |
| 0000121200 | 6378 | 7065 | 6974 | 6E6F | 695F | 0064 | 0B82 | 7865 |
| 0000121220 | 7063 | 735F | 6174 | 7574 | 0473 | 1601 | 7900 | 0220 |
| 0000121240 | 1283 | 8306 | 0613 | 0A82 | 7528 | 746E | 6761 | 6567 |
| 0000121260 | 2964 | 0169 | 0016 | 0879 | 8302 | 0610 | 1183 | 8206 |
| 0000121300 | 280A | 6E75 | 6174 | 6767 | 6465 | 6929 | 0701 | 7F00 |
| 0000121320 | 8483 | 8300 | 0084 | 1B01 | 7F00 | 0882 | 656B | 5F79 |
| 0000121340 | 6F63 | 6564 | 8200 | 730C | 6977 | 6374 | 5F68 | 7473 |
| 0000121360 | 7461 | 0065 | 0701 | 7F00 | 8183 | 8300 | 060F | 1801 |
| 0000121400 | 7F00 | 0882 | 656B | 5F79 | 7974 | 6570 | 8200 | 6B09 |
| 0000121420 | 7965 | 765F | 6C61 | 6575 | 0102 | 0018 | 8579 | 0230 |
| 0000121440 | 8304 | 0616 | 1783 | 8206 | 280A | 6E75 | 6174 | 6767 |
| 0000121460 | 6465 | 6929 | 0701 | 7800 | 0085 | 8302 | 060E | 0D01 |
| 0000121500 | 7F00 | 8583 | 8300 | 0615 | 8183 | 8300 | 0081 | 2E01 |
| 0000121520 | 7F00 | 0882 | 6573 | 5F71 | 6973 | 657A | 8200 | 7303 |
| 0000121540 | 7165 | 8202 | 6B08 | 7965 | 615F | 7474 | 4272 | 0E82 |
| 0000121560 | 6361 | 6974 | 6176 | 6574 | 5F64 | 7566 | 636E | 0144 |
| 0000121600 | 0001 | 0180 | 0001 | 0180 | 0001 | 0180 | 0001 | 0180 |
| 0000121620 | 0001 | 0180 | 0016 | 5079 | 8302 | 061E | 1F83 | 8206 |
| 0000121640 | 280A | 6E75 | 6174 | 6767 | 6465 | 6929 | 0701 | 7F00 |
| 0000121660 | 8183 | 8300 | 05E6 | 1B01 | 7F00 | 0E82 | 6361 | 6974 |
| 0000121700 | 6176 | 6574 | 5F64 | 7566 | 636E | 8200 | 7406 | 6D69 |
| 0000121720 | 6E69 | 0267 | 1601 | 7900 | 0220 | 2183 | 8306 | 0622 |
| 0000121740 | 0A82 | 7528 | 746E | 6761 | 6567 | 2964 | 0169 | 0007 |
| 0000121760 | 837F | 0081 | 8183 | 0100 | 0017 | 827F | 6B08 | 7965 |
| 0000122000 | 615F | 7474 | 0072 | 0882 | 7566 | 636E | 6B5F | 7965 |

THU MAR 14 17:27:50 1991 CRV_STI.DLL PAGE 37, LINE 2125

```
0000122020  0102  0018  8579  0210  8302  0624  2583  8206
0000122040  280A  6E75  6174  6767  6465  6929  0701  7F00
0000122060  8583  8300  0615  1201  7F00  0882  6573  5F71
0000122100  6973  657A  8200  7303  7165  0102  0001  0180
0000122120  0001  0180  0001  0180  0001  0180  0001  0180
0000122140  0018  8579  02D0  8302  062C  2D83  8206  280A
0000122160  6E75  6174  6767  6465  6929  0701  7F00  8883
0000122200  8305  0081  1101  7F00  0682  6966  746C  7265
0000122220  8200  6D04  646F  5865  1801  7900  5085  0501
0000122240  2F83  8306  0630  0A82  7528  746E  6761  6567
0000122260  2964  0169  0010  837F  022C  8683  8300  0081
0000122300  8183  8300  0081  2B01  7F00  0482  616E  656D
0000122320  8200  6C06  6269  695F  2064  0582  6C63  7361
0000122340  2473  0582  7473  6C79  2665  0782  706F  635F
0000122360  646F  2865  0101  8000  0101  8000  0101  8000
0000122400  1B01  7900  0920  3583  8306  0636  0F82  5F69
0000122420  5F75  736D  5F67  6170  6172  5F6D  6974  1C01
0000122440  7F00  8183  8300  0085  8283  8300  0086  8883
0000122460  8300  0080  8483  8300  00C0  C083  0100  006A
0000122500  827F  6909  755F  735F  6F68  7472  8200  690A
0000122520  755F  755F  6873  726F  0074  0882  5F69  5F75
0000122540  6F6C  676E  8200  6909  755F  755F  6F6C  676E
0000122560  8200  6909  755F  665F  6F6C  7461  8200  6908
0000122600  755F  635F  6168  0072  0982  5F69  5F75  6375
0000122620  6168  0072  0782  5F69  5F75  7473  0072  0982
0000122640  5F69  5F75  6C62  636F  006B  1901  7900  0230
0000122660  3883  8306  0639  0D82  5F69  736D  5F67  6170
0000122700  6172  5F6D  6974  0701  7F00  8583  8300  0634
0000122720  1001  7F00  0482  7974  6570  8200  7605  6C61
0000122740  6575  0102  0001  0180  001C  8579  0090  8309
0000122760  063C  3D83  8206  690E  6D5F  6773  685F  6165
0000123000  6564  5F72  6974  1C01  7F00  8183  8300  0081
0000123020  8583  8300  0085  8483  8300  0085  8583  830n
0000123040  0081  8583  0100  0047  827F  7104  695F  0064
0000123060  0682  6F73  7275  6563  8202  7003  6469  8204
0000123100  7403  6469  8206  7204  7365  0870  0882  6572
0000123120  7073  745F  6469  820A  6F07  5F70  6F63  6564
0000123140  820C  7404  7079  0E65  0482  6973  657A  0110
0000123160  0015  8579  00C0  8302  0640  4183  8206  6907
0000123200  6D5F  6773  745F  0169  0005  3078  3783  0106
0000123220  0007  837F  063B  3F83  0106  0017  827F  6806
0000123240  6165  6564  0072  0A82  6170  6172  5F6D  696C
0000123260  7473  0112  0001  0180  0001  0180  0001  0180
0000123300  0007  737A  3E83  8206  0100  0001  0180  0001
0000123320  0180  0001  0180  0001  0180  0001  0180  0001
*
0000123520  0180  0001  0180  0001  0180  0001  0180  0016
0000123540  4079  8302  066C  6D83  8206  280A  6E75  6174
0000123560  6767  6465  6929  0701  7F00  8683  8300  0086
0000123600  1801  7F00  0682  7374  5F74  6469  8200  640B
0000123620  6669  5F66  7374  5F74  6469  0104  0016  4079
0000123640  8303  0670  7183  8206  280A  6E75  6174  6767
0000123660  6465  6929  0701  7A00  8373  0614  0082  0A01
0000123700  7F00  8183  8300  0081  6F83  0106  002B  827F
0000123720  6106  7463  6F69  006E  0F82  756E  5F6D  666F
0000123740  735F  666F  6B74  7965  0273  0C82  6F73  7466
0000123760  656B  7379  705F  7274  0104  0016  4079  8303
0000124000  0674  7583  8206  280A  6E75  6174  6767  6465
0000124020  6929  0701  7A00  8373  0623  0082  0A01  7F00
```

THU MAR 14 17:27:50 1991 CRV_STI.DLL PAGE 38, LINE 2184

| | | | | | | | | |
|---|---|---|---|---|---|---|---|---|
| 0000124040 | 8183 | 8300 | 0081 | 7383 | 0106 | 0029 | 827F | 6106 |
| 0000124060 | 7463 | 6F69 | 006E | 0E82 | 756E | 5F6D | 666F | 685F |
| 0000124100 | 746F | 656B | 7379 | 8202 | 680B | 746F | 656B | 7379 |
| 0000124120 | 705F | 7274 | 0104 | 0018 | 8579 | 0170 | 8305 | 0677 |
| 0000124140 | 7883 | 8206 | 280A | 6E75 | 6174 | 6767 | 6465 | 6929 |
| 0000124160 | 1001 | 7F00 | 2C83 | 8302 | 0086 | 4183 | 8305 | 00E4 |
| 0000124200 | 8583 | 0100 | 003D | 827F | 690A | 616D | 6567 | 6E5F |
| 0000124220 | 6D61 | 0065 | 0882 | 6D69 | 6761 | 5F65 | 6469 | 8220 |
| 0000124240 | 6909 | 616D | 6567 | 705F | 7274 | 8224 | 6C09 | 7961 |
| 0000124260 | 7265 | 705F | 7274 | 8228 | 6909 | 616D | 6567 | 685F |
| 0000124300 | 6C64 | 012C | 0001 | 0180 | 0001 | 0180 | 0001 | 0180 |
| 0000124320 | 0001 | 0180 | 0018 | 8579 | 0190 | 8302 | 067E | 7F83 |
| 0000124340 | 8206 | 280A | 6E75 | 6174 | 6767 | 6465 | 6929 | 0701 |
| 0000124360 | 7F00 | 8283 | 8300 | 0676 | 1801 | 7F00 | 0C82 | 7865 |
| 0000124400 | 6563 | 7470 | 6F69 | 5F6E | 6469 | 8200 | 6905 | 616D |
| 0000124420 | 6567 | 0104 | 0001 | 0180 | 0016 | 4079 | 8303 | 0683 |
| 0000124440 | 8483 | 8206 | 280A | 6E75 | 6174 | 6767 | 6465 | 6929 |
| 0000124460 | 0701 | 7A00 | 8373 | 067D | 0082 | 0A01 | 7F00 | 8183 |
| 0000124500 | 8300 | 0081 | 8283 | 0106 | 002F | 827F | 6106 | 7463 |
| 0000124520 | 6F69 | 006E | 1182 | 756E | 5F6D | 666F | 655F | 6378 |
| 0000124540 | 7065 | 6974 | 6E6F | 0273 | 0E82 | 7865 | 6563 | 7470 |
| 0000124560 | 6F69 | 5F6E | 696C | 7473 | 0104 | 0018 | 8579 | 0450 |
| 0000124600 | 8303 | 0686 | 8783 | 8206 | 280A | 6E75 | 6174 | 6767 |
| 0000124620 | 6465 | 6929 | 0A01 | 7F00 | 7683 | 8306 | 0676 | 7683 |
| 0000124640 | 0106 | 001A | 827F | 6906 | 616D | 6567 | 0031 | 0682 |
| 0000124660 | 6D69 | 6761 | 3265 | 822E | 6404 | 6669 | 5C66 | 1801 |
| 0000124700 | 7900 | A085 | 0301 | 8A83 | 8306 | 068B | 0A82 | 7528 |
| 0000124720 | 746E | 6761 | 6567 | 2964 | 0169 | 0007 | 737A | 7683 |
| 0000124740 | 8206 | 0100 | 000A | 837F | 0081 | 8983 | 8306 | 0676 |
| 0000124760 | 2601 | 7F00 | 0E82 | 756E | 5F6D | 666F | 735F | 7263 |
| 0000125000 | 6565 | 736E | 8200 | 690A | 616D | 6567 | 6C5F | 7369 |
| 0000125020 | 0274 | 0482 | 6964 | 6666 | 0106 | 0018 | 8579 | 0210 |
| 0000125040 | 8303 | 068D | 8E83 | 8206 | 280A | 6E75 | 6174 | 6767 |
| 0000125060 | 6465 | 6929 | 0A01 | 7F00 | 2C83 | 8302 | 022C | 8183 |
| 0000125100 | 0100 | 0019 | 827F | 6906 | 616D | 6567 | 0031 | 0682 |
| 0000125120 | 6D69 | 6761 | 3265 | 8220 | 6303 | 7475 | 0140 | 0018 |
| 0000125140 | 8579 | 0940 | 8307 | 0693 | 9483 | 8206 | 280A | 6E75 |
| 0000125160 | 6174 | 6767 | 6465 | 6929 | 1801 | 7900 | 0085 | 1D08 |
| 0000125200 | 9183 | 8306 | 0692 | 0A82 | 7528 | 746E | 6761 | 6567 |
| 0000125220 | 2964 | 0169 | 0058 | 837F | 0084 | C483 | 8305 | 0084 |
| 0000125240 | 8483 | 8300 | 05EF | 8183 | 8300 | 04FB | F583 | 8305 |
| 0000125260 | 062B | 8883 | 8305 | 0081 | 7283 | 8306 | 05F8 | 8183 |
| 0000125300 | 8306 | 060B | 8183 | 8300 | 066E | 7683 | 8306 | 0685 |
| 0000125320 | 8883 | 8306 | 0601 | 8583 | 8300 | 05FE | 8C83 | 8306 |
| 0000125340 | 0605 | C083 | 8305 | 0620 | 2E83 | 8306 | 0084 | 6F01 |
| 0000125360 | 7F01 | 0A82 | 626B | 5F64 | 7473 | 7461 | 7375 | 8200 |
| 0000125400 | 7409 | 7365 | 5F74 | 616E | 656D | 8200 | 6808 | 7965 |
| 0000125420 | 635F | 646F | 0065 | 0C82 | 7773 | 7469 | 6863 | 735F |
| 0000125440 | 6174 | 6574 | 8200 | 6C0C | 636F | 7461 | 726F | 645F |
| 0000125460 | 7369 | 0070 | 0E82 | 7274 | 6361 | 696B | 676E | 6C5F |
| 0000125500 | 7665 | 6C65 | 8200 | 730C | 6163 | 656C | 775F | 6E69 |
| 0000125520 | 6F64 | 0077 | 0982 | 7973 | 636E | 6D5F | 646F | 0065 |
| 0000125540 | 0A82 | 6966 | 746C | 7265 | 6D5F | 6773 | 8200 | 6606 |
| 0000125560 | 6C69 | 6574 | 0072 | 0B82 | 7563 | 7272 | 6E65 | 5F74 |
| 0000125600 | 6F61 | 0069 | 0C82 | 6F68 | 6B74 | 7965 | 5F73 | 696C |
| 0000125620 | 7473 | 8200 | 730A | 6E79 | 5F63 | 7665 | 6E65 | 0074 |
| 0000125640 | 0E82 | 7865 | 6563 | 7470 | 6F69 | 5F6E | 696C | 7473 |
| 0000125660 | 8200 | 6510 | 6378 | 5F70 | 7473 | 7461 | 7375 | 6C5F |
| 0000125700 | 7369 | 0074 | 0482 | 6F6D | 6564 | 8200 | 730D | 666F |

```
THU MAR 14 17:27:50 1991  CRV_STI.DLL  PAGE 39, LINE 2243

0000125720  6B74  7965  5F73  696C  7473  8200  6905  616D
0000125740  6567  8200  6307  6D6F  6170  6572  8200  770B
0000125760  6961  5F74  6373  6572  6E65  8200  690A  616D
0000126000  6567  6C5F  7369  0074  0982  6D69  6761  5F65
0000126020  756E  006D  0A82  6D69  6761  5F65  6964  6666
0000126040  8200  680B  6C61  5F66  6D69  6761  7365  8200
0000126060  6D07  7361  6173  6567  8200  7006  7261  6D61
0000126100  0073  0882  7566  636E  6B5F  7965  8200  6908
0000126120  6F63  5F6E  736D  0067  0582  7564  6D6D  0079
0000126140  1601  7F00  8183  8300  063E  8183  8300  05E6
0000126160  9083  8306  0081  8583  0100  005A  827F  7306
0000126200  756F  6372  0065  0A82  736D  5F67  6568  6461
0000126220  7265  8202  650A  6576  746E  745F  7079  1A65
0000126240  0682  6974  696D  676E  821C  650B  6576  746E
0000126260  765F  6C61  6575  8224  720C  7465  7275  5F6E
0000126300  6176  756C  8565  0124  0982  6572  7073  665F
0000126320  616C  8567  0126  0101  8000  0101  8000  0101
0000126340  8000  0101  8000  0701  7A00  8373  068F  0082
0000126360  0101  8000  0101  8000  0101  8000  0101  8000
*
0000126440  0101  8000  0101  8000  0101  8000  1801  7900
0000126460  B085  0502  AA83  8306  06AB  0A82  7528  746E
0000126500  6761  6567  2964  0169  0010  837F  05AF  8483
0000126520  8300  05E6  2C83  8302  0086  3701  7F00  0782
0000126540  6567  5F6E  6468  0072  0882  6567  5F6E  7974
0000126560  6570  8228  7406  6D69  6E69  2A67  0A82  6D69
0000126600  6761  5F65  616E  656D  8232  6908  616D  6567
0000126620  695F  5264  0101  8000  0101  8000  0101  8000
0000126640  0101  8000  0101  8000  0101  8000  0101  8000
*
0000126720  0101  8000  0101  8000  1601  7900  0330  BE83
0000126740  8306  06BF  0A82  7528  746E  6761  6567  2964
0000126760  0169  000A  837F  0081  8183  8300  0081  1C01
0000127000  7F00  0682  6170  6B63  685F  8200  6606  6C69
0000127020  5F65  0268  0682  7566  636E  685F  0104  0001
0000127040  0180  0001  0180  0001  0180  0001  0180  0001
*
0000127240  0180  0001  0180  0005  5878  8083  0100  0005
0000127260  3078  8083  0100  0007  8578  8000  8483  0100
0000127300  0007  8578  2000  8483  0100  0001  0180  0001
0000127320  0180  000A  8075  0083  7302  8300  0201  0401
0000127340  7F00  8283  0100  000A  8075  0083  6402  8301
0000127360  06E9  0101  8000  0A01  7500  8380  0081  0064
0000127400  0183  0102  0001  0180  000A  8075  8183  6400
0000127420  8300  0201  0401  7F00  9983  0106  000A  8075
0000127440  8183  7300  8301  06EF  0701  7800  A885  8300
0000127460  0080  0401  7F00  9983  0106  000A  8075  8183
0000127500  7300  8301  06F2  0101  8000  0701  7800  C085
0000127520  8300  0080  0101  8000  0401  7F00  9983  0106
0000127540  000A  8075  0083  7302  8301  06F7  0101  8000
0000127560  0401  7F00  9983  0106  000A  8075  0083  7302
0000127600  8301  06FA  0A01  7500  8380  0081  0073  0183
0000127620  0102  0007  837F  0699  8183  0100  000A  8075
0000127640  8183  7300  8302  06FD  0401  7F00  9983  0106
0000127660  000A  8075  8183  7300  8301  06FF  0401  7F00
0000127700  9983  0106  000A  8075  8183  7300  8301  0701
0000127720  0401  7F00  9983  0106  000A  8075  8183  7300
0000127740  8301  0703  0401  7F00  C083  0100  000A  8075
0000127760  8183  7300  8301  0705  0401  7F00  8583  0100
```

```
THU MAR 14 17:27:50 1991  CRV_STI.DLL  PAGE 40, LINE 2302

0000130000  000A  8075  8183  7300  8301  0707  0A01  7F00
0000130020  8183  8300  00C0  C083  0100  000A  8075  8183
0000130040  7300  8303  0709  0101  8000  0101  8000  0701
0000130060  7800  8885  8300  0080  0501  7800  8338  0080
0000130100  0501  7800  8360  0082  0501  7800  8340  0080
0000130120  0501  7800  8378  0080  0701  7800  8085  8300
0000130140  0080  0A01  7500  8380  0081  0064  0183  0102
0000130160  0001  0180  0001  0180  0001  0180  0001  0180
*
0000130420  0001  0180  0001  0180  0001  0180  0007  8578
0000130440  0100  8083  0100  0001  0180  0001  0180  0001
0000130460  0180  0001  0180  0001  0180  0001  0180  0001
*
0000135740  0180  0001  0180  0001  0180  0001  0180  0016
0000135760  2079  8302  04E0  E183  8204  28CA  6E75  6174
0000136000  6767  6465  6929  0701  7F00  8183  8300  0081
0000136020  0901  7F00  0182  0078  0182  0279  1601  7900
0000136040  0240  E383  8304  04E4  0A82  7528  746E  6761
0000136060  6567  2964  0169  0007  837F  04DF  DF83  0104
0000136100  000D  827F  6D03  6E69  8200  6D03  7861  0104
0000136120  0001  0180  0016  2079  8302  04E7  E883  8204
0000136140  280A  6E75  6174  6767  6465  6929  0701  7F00
0000136160  8583  8300  0085  1201  7F00  0582  6977  7464
0000136200  0068  0682  6568  6769  7468  0102  0001  0180
0000136220  0016  4079  8302  04EB  EC83  8204  280A  6E75
0000136240  6174  6767  6465  6929  0701  7F00  DF83  8304
0000136260  04E6  1101  7F00  0682  726F  6769  6E69  8200
0000136300  6104  6572  0461  0101  8000  0101  8000  0101
0000136320  8000  0101  8000  0101  8000  0101  8000  0101
*
0000136560  8000  0101  8000  0101  8000  1601  7900  0330
0000136600  1B83  8305  051C  0A82  7528  746E  6761  6567
0000136620  2964  0169  000A  837F  0085  8583  8300  0085
0000136640  1A01  7F00  0582  6977  7464  0068  0682  6568
0000136660  6769  7468  8202  6405  7065  6874  0104  0018
0000136700  8579  0140  8308  051F  2083  8205  280A  6E75
0000136720  6174  6767  6465  6929  0701  7800  8085  8300
0000136740  0084  1901  7F00  8183  8300  051A  8583  8300
0000136760  0085  C483  8300  0082  E483  8300  051E  5A01
0000137000  7F00  0682  6572  7270  7365  8200  6406  6D69
0000137020  6E65  0273  1082  6164  6174  6C5F  7961  7265
0000137040  645F  7065  6874  8208  7308  6769  735F  7A69
0000137060  0A65  0782  6973  5F67  7470  0C72  0982  7462
0000137100  706D  735F  7A69  1065  0882  7462  706D  705F
0000137120  7274  8214  7305  6170  6572  0118  0001  0180
0000137140  0018  8579  05A0  830C  0524  2583  8205  280A
0000137160  6E75  6174  6767  6465  6929  0701  7800  8085
0000137200  8301  0084  2501  7F00  8683  8300  022C  2C83
0000137220  8302  0086  8183  8300  0085  8683  8300  0082
0000137240  8683  8300  04DF  1D83  8305  0523  7E01  7F00
0000137260  0282  6469  8200  6E04  6D61  0465  0982  6966
0000137300  656C  6E5F  6D61  2465  0982  7865  5F70  6374
0000137320  695F  4464  0482  7974  6570  8248  720C  6665
0000137340  6C5F  6E69  5F65  756E  4A6D  0982  6572  5F66
0000137360  6374  695F  4C64  0A82  6974  656D  735F  6174
0000137400  706D  8250  6106  696F  695F  5464  0882  6F6C
0000137420  6163  6974  6E6F  8258  6209  6D74  5F70  6E69
0000137440  6F66  825C  7305  6170  6572  8485  0100  0001
0000137460  0180  0001  0180  0001  0180  0001  0180  0001
```

```
THU MAR 14 17:27:50 1991  CRV_STI.DLL  PAGE 41, LINE 2361

*
0000137520  0180  0001  0180  0007  737A  2283  8205  0100
0000137540  0001  0180  0001  0180  0001  0180  0001  0180
*
0000140160  0001  0180  0001  0180  0018  8579  02C0  8307
0000140200  0579  7A83  8205  280A  6E75  6174  6767  6465
0000140220  6929  0701  7800  2085  8301  0084  1601  7F00
0000140240  8683  8300  022C  E283  8304  0081  8183  8300
0000140260  0082  7883  0105  0038  827F  6902  0064  0482
0000140300  616E  656D  8204  7204  6365  2474  0482  7461
0000140320  7274  822C  6405  6D75  796D  822E  740A  6D69
0000140340  5F65  7473  6D61  3070  0582  7073  7261  3465
0000140360  0101  8000  0101  8000  0101  8000  0101  8000
*
0000140560  0101  8000  0101  8000  0101  8000  1801  7900
0000140600  4085  0301  A083  8305  05A1  0A82  7528  746E
0000140620  6761  6567  2964  0169  0007  8578  0110  8483
0000140640  0100  000A  837F  0086  8583  8300  059F  1501
0000140660  7F00  0282  6469  8200  7304  7A69  0465  0582
0000140700  7073  7261  0665  0101  8000  0101  8000  0101
0000140720  8000  0101  8000  0101  8000  0101  8000  0101
*
0000140760  8000  0101  8000  0101  8000  1801  7900  1085
0000141000  1101  B083  8305  05B1  0A82  7528  746E  6761
0000141020  6567  2964  0169  0034  837F  0085  8583  8300
0000141040  0085  8583  8300  0085  8583  8300  0081  8583
0000141060  8300  0085  8583  8300  0084  8583  8300  0085
0000141100  8583  8300  0085  8583  8300  0085  0601  7F01
0000141120  0982  6974  656D  755F  696E  0074  0F82  696D
0000141140  5F6E  6572  6F63  6472  745F  6D69  0265  0982
0000141160  7473  6261  6C69  7469  0479  0F82  6163  7470
0000141200  7275  5F65  6974  656D  756F  0674  0A82  656B
0000141220  5F79  6F66  6D72  7461  8208  6313  6E6F  6974
0000141240  756E  756F  5F73  7274  6361  696B  676E  820A
0000141260  6D0E  756F  6573  745F  6172  6B63  6E69  0C67
0000141300  1182  6163  7470  7275  5F65  6973  6E67  7461
0000141320  7275  0E65  0B82  6F68  6B74  7965  735F  6E79
0000141340  1063  0C82  6564  6166  6C75  5F74  6974  656D
0000141360  8212  6D09  7861  645F  6C65  7961  8214  660B
0000141400  7361  5F74  6572  6C70  7961  8216  760E  7265
0000141420  6669  5F79  6974  656D  756F  1874  0C82  6177
0000141440  7469  745F  6D69  6F65  7475  821A  730C  6E79
0000141460  5F63  6974  656D  756F  1C74  0982  6874  6572
0000141500  6873  6C6F  1E64  0C82  6863  6365  5F6B  6F6C
0000141520  6B6F  7075  0120  0001  0180  0007  8578  0800
0000141540  8083  0100  0001  0180  0001  0180  0001  0180
0000141560  0001  0180  0001  0180  0001  0180  0001  0180
*
0000141740  0001  0180  0001  0180  0016  4079  8302  05D6
0000141760  D783  8205  280A  6E75  6174  6767  6465  6929
0000142000  0701  7F00  8283  8300  0082  1701  7F00  0882
0000142020  6564  5F66  6974  656D  8200  6D08  6E69  745F
0000142040  6D69  0465  0101  8000  0101  8000  0101  8000
0000142060  0101  8000  0101  8000  0101  8000  1601  7900
0000142100  0440  DF83  8305  05ED  0A82  7528  746E  6761
0000142120  6567  2964  0169  000D  837F  0084  8483  8300
0000142140  0084  DF83  0104  0029  827F  6107  7362  725F
0000142160  6C65  8200  7505  696E  7374  8201  730C  6570
0000142200  6963  6C61  665F  6E75  0263  0482  6964  7073
```

THU MAR 14 17:27:50 1991 CRV_STI.DLL PAGE 42, LINE 2420

| | | | | | | | | |
|---|---|---|---|---|---|---|---|---|
| 0000142220 | 0104 | 0001 | 0180 | 0001 | 0180 | 0001 | 0180 | 0016 |
| 0000142240 | 2079 | 8302 | 05E5 | E683 | 8205 | 280A | 6E75 | 6174 |
| 0000142260 | 6767 | 6465 | 6929 | 0701 | 7F00 | 8183 | 8300 | 0081 |
| 0000142300 | 1E01 | 7F00 | 0982 | 7973 | 636E | 6D5F | 646F | 0065 |
| 0000142320 | 0E82 | 7973 | 636E | 655F | 6578 | 5F63 | 6F6D | 6564 |
| 0000142340 | 0102 | 0016 | 3079 | 8302 | 05E8 | E983 | 8205 | 280A |
| 0000142360 | 6E75 | 6174 | 6767 | 6465 | 6929 | 0701 | 7F00 | 8283 |
| 0000142400 | 8300 | 0081 | 1901 | 7F00 | 0782 | 6574 | 6863 | 695F |
| 0000142420 | 0064 | 0B82 | 6574 | 6863 | 725F | 6165 | 6F73 | 046E |
| 0000142440 | 0101 | 8000 | 0101 | 8000 | 0101 | 8000 | 1801 | 7900 |
| 0000142460 | 2085 | 0302 | EE83 | 8305 | 05EF | 0A82 | 7528 | 746E |
| 0000142500 | 6761 | 6567 | 2964 | 0169 | 000A | 837F | 022C | 2C83 |
| 0000142520 | 8302 | 0086 | 1A01 | 7F00 | 0582 | 6D69 | 6761 | 0065 |
| 0000142540 | 0482 | 6964 | 6666 | 8220 | 6407 | 6669 | 5F66 | 6469 |
| 0000142560 | 0140 | 0018 | 8579 | 0310 | 8302 | 05F2 | F383 | 8205 |
| 0000142600 | 280A | 6E75 | 6174 | 6767 | 6465 | 6929 | 0701 | 7800 |
| 0000142620 | 0085 | 8303 | 022C | 0701 | 7F00 | 8583 | 8300 | 05F1 |
| 0000142640 | 2401 | 7F00 | 0E82 | 756E | 5F6D | 666F | 735F | 7263 |
| 0000142660 | 6565 | 736E | 8200 | 690F | 616D | 6567 | 6E5F | 6D61 |
| 0000142700 | 5F65 | 696C | 7473 | 0102 | 0016 | 2079 | 8301 | 05F5 |
| 0000142720 | F683 | 8205 | 280A | 6E75 | 6174 | 6767 | 6465 | 6929 |
| 0000142740 | 0401 | 7F00 | C083 | 0100 | 000A | 827F | 7306 | 7274 |
| 0000142760 | 6E69 | 0067 | 0101 | 8000 | 0101 | 8000 | 0101 | 8000 |
| 0000143000 | 1601 | 7900 | 0230 | FB83 | 8305 | 05FC | 0A82 | 7528 |
| 0000143020 | 746E | 6761 | 6567 | 2964 | 0169 | 0007 | 837F | 0082 |
| 0000143040 | 8183 | 0100 | 001E | 827F | 650C | 6378 | 7065 | 6974 |
| 0000143060 | 6E6F | 695F | 0064 | 0882 | 7865 | 7063 | 735F | 6174 |
| 0000143100 | 7574 | 0473 | 1601 | 7900 | 0220 | 0183 | 8306 | 0602 |
| 0000143120 | 0A82 | 7528 | 746E | 6761 | 6567 | 2964 | 0169 | 0016 |
| 0000143140 | 0879 | 8302 | 05FF | 0083 | 8206 | 280A | 6E75 | 6174 |
| 0000143160 | 6767 | 6465 | 6929 | 0701 | 7F00 | 8483 | 8300 | 0084 |
| 0000143200 | 1B01 | 7F00 | 0882 | 656B | 5F79 | 6F63 | 6564 | 8200 |
| 0000143220 | 730C | 6977 | 6374 | 5F68 | 7473 | 7461 | 0065 | 0701 |
| 0000143240 | 7F00 | 8183 | 8300 | 05FE | 1801 | 7F00 | 0882 | 656B |
| 0000143260 | 5F79 | 7974 | 6570 | 8200 | 6B09 | 7965 | 765F | 6C61 |
| 0000143300 | 6575 | 0102 | 0018 | 8579 | 0230 | 8304 | 0605 | 0683 |
| 0000143320 | 8206 | 280A | 6E75 | 6174 | 6767 | 6465 | 6929 | 0701 |
| 0000143340 | 7800 | 0085 | 8302 | 05FD | DD01 | 7F00 | 8583 | 8300 |
| 0000143360 | 0604 | 8183 | 8300 | 0081 | 2E01 | 7F00 | 0882 | 6573 |
| 0000143400 | 5F71 | 6973 | 657A | 8200 | 7303 | 7165 | 8202 | 6B08 |
| 0000143420 | 7965 | 615F | 7474 | 4272 | 0E82 | 6361 | 6974 | 6176 |
| 0000143440 | 6574 | 5F64 | 7566 | 636E | 0144 | 0001 | 0180 | 0001 |
| 0000143460 | 0180 | 0001 | 0180 | 0001 | 0180 | 0001 | 0180 | 0001 |
| 0000143500 | 0180 | 0001 | 0180 | 0001 | 0180 | 0016 | 2079 | 8302 |
| 0000143520 | 0610 | 1183 | 8206 | 280A | 6E75 | 6174 | 6767 | 6465 |
| 0000143540 | 6929 | 0701 | 7F00 | 8183 | 8300 | 0081 | 1701 | 7F00 |
| 0000143560 | 0882 | 656B | 5F79 | 7461 | 7274 | 8200 | 6608 | 6E75 |
| 0000143600 | 5F63 | 656B | 0279 | 1801 | 7900 | 1085 | 0202 | 1383 |
| 0000143620 | 8306 | 0614 | 0A82 | 7528 | 746E | 6761 | 6567 | 2964 |
| 0000143640 | 0169 | 0007 | 837F | 0085 | 0483 | 0106 | 0012 | 827F |
| 0000143660 | 7308 | 7165 | 735F | 7A69 | 0065 | 0382 | 6573 | 0271 |
| 0000143700 | 0101 | 8000 | 0101 | 8000 | 0101 | 8000 | 0101 | 8000 |
| 0000143720 | 0101 | 8000 | 1801 | 7900 | D085 | 0202 | 1B83 | 8306 |
| 0000143740 | 061C | 0A82 | 7528 | 746E | 6761 | 6567 | 2964 | 0169 |
| 0000143760 | 0007 | 837F | 0577 | 8183 | 0100 | 0011 | 827F | 6606 |
| 0000144000 | 6C69 | 6574 | 0072 | 0482 | 6F6D | 6564 | 0158 | 0018 |
| 0000144020 | 8579 | 0150 | 8305 | 061E | 1F83 | 8206 | 280A | 6E75 |
| 0000144040 | 6174 | 6767 | 6465 | 6929 | 1001 | 7F00 | 2C83 | 8302 |
| 0000144060 | 0086 | 8183 | 8300 | 0081 | 8183 | 0100 | 002B | 827F |

```
THU MAR 14 17:27:50 1991  CRV_STI.DLL  PAGE 43, LINE 2479

0000144100  6E04  6D61  0065  0682  696C  5F62  6469  8220
0000144120  6305  616C  7373  8224  7305  7974  656C  8226
0000144140  6F07  5F70  6F63  6564  0128  0001  0180  0001
0000144160  0180  0001  0180  001B  2079  8309  0624  2583
0000144200  8206  690F  755F  6D5F  6773  705F  7261  6D61
0000144220  745F  0169  001C  837F  0081  8583  8300  0082
0000144240  8683  8300  0088  8083  8300  0084  C083  8300
0000144260  00C0  6A01  7F00  0982  5F69  5F75  6873  726F
0000144300  0074  0A82  5F69  5F75  7375  6F68  7472  8200
0000144320  6908  755F  6C5F  6E6F  0067  0982  5F69  5F75
0000144340  6C75  6E6F  0067  0982  5F69  5F75  6C66  616F
0000144360  0074  0882  5F69  5F75  6863  7261  8200  6909
0000144400  755F  755F  6863  7261  8200  6907  755F  735F
0000144420  7274  8200  6909  755F  625F  6F6C  6B63  0100
0000144440  0019  3079  8302  0627  2883  8206  690D  6D5F
0000144460  6773  705F  7261  6D61  745F  0169  0007  837F
0000144500  0085  2383  0106  0010  827F  7404  7079  0065
0000144520  0582  6176  756C  0265  0101  8000  1C01  7900
0000144540  9085  0900  2B83  8306  062C  0E82  5F69  736D
0000144560  5F67  6568  6461  7265  745F  0169  001C  837F
0000144600  0081  8183  8300  0085  8583  8300  0084  8583
0000144620  8300  0085  8183  8300  0085  4701  7F00  0482
0000144640  5F71  6469  8200  7306  756F  6372  0265  0382
0000144660  6970  0464  0382  6974  0664  0482  6572  7073
0000144700  8208  7208  7365  5F70  6974  0A64  0782  706F
0000144720  635F  646F  0C65  0482  7974  6570  820E  7304
0000144740  7A69  1065  1501  7900  C085  0200  2F83  8306
0000144760  0630  0782  5F69  736D  5F67  6974  0501  7800
0000145000  8330  0626  0701  7F00  2A83  8306  062E  1701
0000145020  7F00  0682  6568  6461  7265  8200  700A  7261
0000145040  6D61  6C5F  7369  1274  0101  8000  0101  8000
0000145060  0101  8000  0701  7A00  8373  062D  0082  0101
0000145100  8000  0101  8000  0101  8000  0101  8000  0101
*
0000145320  8000  1601  7900  0240  5B83  8306  065C  0A82
0000145340  7528  746E  6761  6567  2964  0169  0007  837F
0000145360  0086  8683  0100  0018  827F  7406  7473  695F
0000145400  0064  0B82  6964  6666  745F  7473  695F  0464
0000145420  1601  7900  0340  5F83  8306  0660  0A82  7528
0000145440  746E  6761  6567  2964  0169  0007  737A  0383
0000145460  8206  0100  000A  837F  0081  8183  8300  065E
0000145500  2B01  7F00  0682  6361  6974  6E6F  8200  6E0F
0000145520  6D75  6F5F  5F66  6F73  7466  656B  7379  8202
0000145540  730C  666F  6B74  7965  5F73  7470  0472  1601
0000145560  7900  0340  6383  8306  0664  0A82  7528  746E
0000145600  6761  6567  2964  0169  0007  737A  1283  8206
0000145620  0100  000A  837F  0081  8183  8300  0662  2901
0000145640  7F00  0682  6361  6974  6E6F  8200  6E0E  6D75
0000145660  6F5F  5F66  6F68  6B74  7965  0273  0B82  6F68
0000145700  6B74  7965  5F73  7470  0472  1801  7900  7085
0000145720  0501  6683  8306  0667  0A82  7528  746E  6761
0000145740  6567  2964  0169  0010  837F  022C  8683  8300
0000145760  0530  E483  8300  0085  3D01  7F00  0A82  6D69
0000146000  6761  5F65  616E  656D  8200  6908  616D  6567
0000146020  695F  2064  0982  6D69  6761  5F65  7470  2472
0000146040  0982  616C  6579  5F72  7470  2872  0982  6D69
0000146060  6761  5F65  6468  2C6C  0101  8000  0101  8000
0000146100  0101  8000  0101  8000  1801  7900  9085  0201
0000146120  6D83  8306  066E  0A82  7528  746E  6761  6567
```

THU MAR 14 17:27:50 1991 CRV_STI.DLL PAGE 44, LINE 2538

| | | | | | | | | |
|---|---|---|---|---|---|---|---|---|
| 0000146140 | 2964 | 0169 | 0007 | 837F | 0082 | 6583 | 0106 | 0018 |
| 0000146160 | 827F | 650C | 6378 | 7065 | 6974 | 6E6F | 695F | 0064 |
| 0000146200 | 0582 | 6D69 | 6761 | 0465 | 0101 | 8000 | 1601 | 7900 |
| 0000146220 | 0340 | 7283 | 8306 | 0673 | 0A82 | 7528 | 746E | 6761 |
| 0000146240 | 6567 | 2964 | 0169 | 0007 | 737A | 6C83 | 8206 | 0100 |
| 0000146260 | 000A | 837F | 0081 | 8183 | 8300 | 0671 | 2F01 | 7F00 |
| 0000146300 | 0682 | 6361 | 6974 | 6E6F | 8200 | 6E11 | 6D75 | 6F5F |
| 0000146320 | 5F66 | 7865 | 6563 | 7470 | 6F69 | 736E | 8202 | 650E |
| 0000146340 | 6378 | 7065 | 6974 | 6E6F | 6C5F | 7369 | 0474 | 1801 |
| 0000146360 | 7900 | 5085 | 0304 | 7583 | 8306 | 0676 | 0A82 | 7528 |
| 0000146400 | 746E | 6761 | 6567 | 2964 | 0169 | 000A | 837F | 0665 |
| 0000146420 | 6583 | 8306 | 0665 | 1A01 | 7F00 | 0682 | 6D69 | 6761 |
| 0000146440 | 3165 | 8200 | 6906 | 616D | 6567 | 2E32 | 0482 | 6964 |
| 0000146460 | 6666 | 015C | 0018 | 8579 | 01A0 | 8303 | 0679 | 7A83 |
| 0000146500 | 8206 | 280A | 6E75 | 6174 | 6767 | 6465 | 6929 | 0701 |
| 0000146520 | 7A00 | 8373 | 0665 | 0082 | 0A01 | 7F00 | 8183 | 8300 |
| 0000146540 | 0678 | 6583 | 0106 | 0026 | 827F | 6E0E | 6D75 | 6F5F |
| 0000146560 | 5F66 | 6373 | 6572 | 6E65 | 0073 | 0A82 | 6D69 | 6761 |
| 0000146600 | 5F65 | 696C | 7473 | 8202 | 6404 | 6669 | 0666 | 1801 |
| 0000146620 | 7900 | 1085 | 0302 | 7C83 | 8306 | 067D | 0A82 | 7528 |
| 0000146640 | 746E | 6761 | 6567 | 2964 | 0169 | 000A | 837F | 022C |
| 0000146660 | 2C83 | 8302 | 0081 | 1901 | 7F00 | 0682 | 6D69 | 6761 |
| 0000146700 | 3165 | 8200 | 6906 | 616D | 6567 | 2032 | 0382 | 7563 |
| 0000146720 | 4074 | 1801 | 7900 | 4085 | 0709 | 8283 | 8306 | 0683 |
| 0000146740 | 0A82 | 7528 | 746E | 6761 | 6567 | 2964 | 0169 | 0018 |
| 0000146760 | 8579 | 0800 | 831D | 0680 | 8183 | 8206 | 280A | 6E75 |
| 0000147000 | 6174 | 6767 | 6465 | 6929 | 5801 | 7F00 | 8483 | 8300 |
| 0000147020 | 05B3 | 8483 | 8300 | 0084 | DE83 | 8305 | 0081 | EA83 |
| 0000147040 | 8304 | 05E4 | 1A83 | 8306 | 0577 | 8183 | 8300 | 0661 |
| 0000147060 | E783 | 8305 | 0670 | FA83 | 8305 | 0081 | 5D83 | 8306 |
| 0000147100 | 0665 | 7483 | 8306 | 0677 | F083 | 8305 | 0085 | ED83 |
| 0000147120 | 8305 | 067B | F483 | 8305 | 05AF | 0F83 | 8306 | 061D |
| 0000147140 | 8483 | 0100 | 016F | 827F | 6B0A | 6462 | 735F | 6174 |
| 0000147160 | 7574 | 0073 | 0982 | 6574 | 7473 | 6E5F | 6D61 | 0065 |
| 0000147200 | 0882 | 656B | 5F79 | 6F63 | 6564 | 8200 | 730C | 6977 |
| 0000147220 | 6374 | 5F68 | 7473 | 7461 | 0065 | 0C82 | 6F6C | 6163 |
| 0000147240 | 6F74 | 5F72 | 6964 | 7073 | 8200 | 740E | 6172 | 6B63 |
| 0000147260 | 6E69 | 5F67 | 656C | 6576 | 006C | 0C82 | 6373 | 6C61 |
| 0000147300 | 5F65 | 6977 | 646E | 776F | 8200 | 7309 | 6E79 | 5F63 |
| 0000147320 | 6F6D | 6564 | 8200 | 660A | 6C69 | 6574 | 5F72 | 736D |
| 0000147340 | 0067 | 0682 | 6966 | 746C | 7265 | 8200 | 630B | 7275 |
| 0000147360 | 6572 | 746E | 615F | 696F | 8200 | 680C | 746F | 656B |
| 0000147400 | 7379 | 6C5F | 7369 | 0074 | 0A82 | 7973 | 636E | 655F |
| 0000147420 | 6576 | 746E | 8200 | 650E | 6378 | 7065 | 6974 | 6E6F |
| 0000147440 | 6C5F | 7369 | 0074 | 1082 | 7865 | 7063 | 735F | 6174 |
| 0000147460 | 7574 | 5F73 | 696C | 7473 | 8200 | 6D04 | 646F | 0065 |
| 0000147500 | 0D82 | 6F73 | 7466 | 656B | 7379 | 6C5F | 7369 | 0074 |
| 0000147520 | 0582 | 6D69 | 6761 | 0065 | 0782 | 6F63 | 706D | 7261 |
| 0000147540 | 0065 | 0B82 | 6177 | 7469 | 735F | 7263 | 6565 | 006E |
| 0000147560 | 0A82 | 6D69 | 6761 | 5F65 | 696C | 7473 | 8200 | 6909 |
| 0000147600 | 616D | 6567 | 6E5F | 6D75 | 8200 | 690A | 616D | 6567 |
| 0000147620 | 645F | 6669 | 0066 | 0B82 | 6168 | 666C | 695F | 616D |
| 0000147640 | 6567 | 0073 | 0782 | 616D | 7373 | 6761 | 0065 | 0682 |
| 0000147660 | 6170 | 6172 | 736D | 8200 | 6608 | 6E75 | 5F63 | 656B |
| 0000147700 | 0079 | 0882 | 6369 | 6E6F | 6D5F | 6773 | 8200 | 6405 |
| 0000147720 | 6D75 | 796D | 0100 | 0016 | 837F | 0081 | 2D83 | 8306 |
| 0000147740 | 0081 | D583 | 8305 | 067F | 8183 | 8300 | 0085 | 5A01 |
| 0000147760 | 7F00 | 0682 | 6F73 | 7275 | 6563 | 8200 | 6D0A | 6773 |
| 0000150000 | 685F | 6165 | 6564 | 0272 | 0A82 | 7665 | 6E65 | 5F74 |

THU MAR 14 17:27:50 1991 CRV_STI.DLL PAGE 45, LINE 2597

| | | | | | | | | |
|---|---|---|---|---|---|---|---|---|
| 0000150020 | 7974 | 6570 | 821A | 7406 | 6D69 | 6E69 | 1C67 | 0B82 |
| 0000150040 | 7665 | 6E65 | 5F74 | 6176 | 756C | 2465 | 0C82 | 6572 |
| 0000150060 | 7574 | 6E72 | 765F | 6C61 | 6575 | 2485 | 8201 | 7209 |
| 0000150100 | 7365 | 5F70 | 6C66 | 6761 | 2685 | 0101 | 0001 | 0180 |
| 0000150120 | 0001 | 0180 | 0001 | 0180 | 0001 | 0180 | 0007 | 737A |
| 0000150140 | 7E83 | 8206 | 0100 | 0001 | 0180 | 0001 | 0180 | 0001 |
| 0000150160 | 0180 | 0001 | 0180 | 0001 | 0180 | 0001 | 0180 | 0018 |
| 0000150200 | 8579 | 0150 | 8302 | 0690 | 9183 | 8206 | 280A | 6E75 |
| 0000150220 | 6174 | 6767 | 6465 | 6929 | 0701 | 7F00 | 9E83 | 8305 |
| 0000150240 | 0084 | 1601 | 7F00 | 0782 | 6567 | 5F6E | 6468 | 0072 |
| 0000150260 | 0882 | 6567 | 5F6E | 7974 | 6570 | 0128 | 0001 | 0180 |
| 0000150300 | 0001 | 0180 | 0001 | 0180 | 0001 | 0180 | 0018 | 8579 |
| 0000150320 | 02B0 | 8305 | 0697 | 9883 | 8206 | 280A | 6E75 | 6174 |
| 0000150340 | 6767 | 6465 | 6929 | 1001 | 7F00 | 9E83 | 8305 | 0084 |
| 0000150360 | D583 | 8305 | 022C | 8683 | 0100 | 0037 | 827F | 6707 |
| 0000150400 | 6E65 | 685F | 7264 | 8200 | 6708 | 6E65 | 745F | 7079 |
| 0000150420 | 2865 | 0682 | 6974 | 696D | 676E | 822A | 690A | 616D |
| 0000150440 | 6567 | 6E5F | 6D61 | 3265 | 0882 | 6D69 | 6761 | 5F65 |
| 0000150460 | 6469 | 0152 | 0001 | 0180 | 0001 | 0180 | 0001 | 0180 |
| 0000150500 | 0001 | 0180 | 0001 | 0180 | 0001 | 0180 | 0001 | 0180 |
| * | | | | | | | | |
| 0000150640 | 000A | 8075 | 8183 | 6400 | 8302 | 06B5 | 0701 | 7F00 |
| 0000150660 | 8883 | 8306 | 00C6 | 0A01 | 7500 | 8380 | 0081 | 0073 |
| 0000150700 | 0183 | 0102 | 000A | 8075 | 0083 | 7302 | 8300 | 0201 |
| 0000150720 | 0401 | 7F00 | 8883 | 0106 | 000A | 8075 | 0083 | 7302 |
| 0000150740 | 8301 | 06B8 | 0401 | 7F00 | 8883 | 0106 | 000A | 8075 |
| 0000150760 | 0083 | 6402 | 8301 | 06BA | 0401 | 7F00 | 8883 | 0106 |
| 0000151000 | 000A | 8075 | 0083 | 6402 | 8301 | 06BC | 0401 | 7F00 |
| 0000151020 | 8883 | 0106 | 000A | 8075 | 0083 | 6402 | 8301 | 06BE |
| 0000151040 | 0401 | 7F00 | 8883 | 0106 | 000A | 8075 | 0083 | 7302 |
| 0000151060 | 8301 | 06C0 | 0401 | 7F00 | 8883 | 0106 | 000A | 8075 |
| 0000151100 | 0083 | 7302 | 8301 | 06C2 | 0401 | 7F00 | 8883 | 0106 |
| 0000151120 | 000A | 8075 | 0083 | 7302 | 8301 | 06C4 | 0401 | 7F00 |
| 0000151140 | 8883 | 0106 | 000A | 8075 | 0083 | 7302 | 8301 | 06C6 |
| 0000151160 | 0401 | 7F00 | 8883 | 0106 | 000A | 8075 | 0083 | 7302 |
| 0000151200 | 8301 | 06C8 | 0401 | 7F00 | 8883 | 0106 | 000A | 8075 |
| 0000151220 | 0083 | 7302 | 8301 | 06CA | 0401 | 7F00 | 8883 | 0106 |
| 0000151240 | 000A | 8075 | 8183 | 7300 | 8301 | 06CC | 0701 | 7800 |
| 0000151260 | C085 | 8300 | 0080 | 0701 | 7F00 | 8883 | 8306 | 00C6 |
| 0000151300 | 0A01 | 7500 | 8380 | 0081 | 0264 | CF83 | 0106 | 0007 |
| 0000151320 | 737A | 8F83 | 8206 | 0500 | 0111 | 0000 | 2300 | 0001 |
| 0000151340 | B400 | 3A06 | 1600 | 2E00 | 0000 | 0400 | 6914 | 696E |
| 0000151360 | 5F74 | 6C67 | 626F | 6C61 | 735F | 6974 | 645F | 7461 |
| 0000151400 | 0161 | 2202 | 3A01 | B500 | 2A06 | 1600 | 1E00 | 0000 |
| 0000151420 | 0400 | 7313 | 666F | 5F74 | 6874 | 6572 | 6461 | 735F |
| 0000151440 | 6D65 | 705F | 7274 | 0201 | 011B | 0064 | 06B7 | 0301 |
| 0000151460 | 0010 | 02F6 | 0000 | 0C04 | 6C63 | 6165 | 5F6E | 5F67 |
| 0000151500 | 6970 | 6570 | 040D | 0006 | 00C4 | 6D07 | 6773 | 705F |
| 0000151520 | 7274 | 040C | FFFA | 00C0 | 5F06 | 745F | 7079 | 0F65 |
| 0000151540 | F404 | 85FF | 0900 | 5F5F | 7862 | 745F | 7079 | 0D65 |
| 0000151560 | E204 | BBFF | 0706 | 5F5F | 7270 | 6E69 | 0B74 | DA04 |
| 0000151600 | 7DFF | 0506 | 5F5F | 766C | 0D6C | E604 | BDFF | 0706 |
| 0000151620 | 5F5F | 6C63 | 636F | 0D6B | F604 | C0FF | 0700 | 5F5F |
| 0000151640 | 7473 | 6361 | 0E6B | E004 | 81FF | 0800 | 5F5F | 6572 |
| 0000151660 | 7674 | 6C61 | 0409 | FFF2 | 0081 | 7203 | 7365 | 050E |
| 0000151700 | 00B0 | 0005 | 0227 | 5F06 | 665F | 6E75 | 0163 | 2002 |
| 0000151720 | 6501 | C103 | 6006 | 1000 | 5500 | 0000 | 0400 | 7211 |
| 0000151740 | 6365 | 6E6F | 656E | 7463 | 735F | 666F | 6574 | 7473 |
| 0000151760 | 0409 | FFF8 | 0085 | 6503 | 7272 | 0409 | FFFA | 0086 |

THU MAR 14 17:27:50 1991 CRV_STI.DLL PAGE 46, LINE 2656

| | | | | | | | | |
|---|---|---|---|---|---|---|---|---|
| 0000152000 | 7303 | 6D65 | 0201 | 011E | 03C5 | 06C3 | 03A1 | 0010 |
| 0000152020 | 0396 | 0000 | 0F04 | 6572 | 6461 | 6E5F | 7865 | 5F74 |
| 0000152040 | 7665 | 6E65 | 1474 | 0604 | A600 | 0E06 | 7665 | 6E65 |
| 0000152060 | 5F74 | 7470 | 5F72 | 6461 | 7264 | 0409 | FFFA | 0081 |
| 0000152100 | 6503 | 7272 | 0409 | FFF8 | 0085 | 7203 | 7365 | 040F |
| 0000152120 | FFF6 | 0085 | 7309 | 6D65 | 695F | 646E | 7865 | 0410 |
| 0000152140 | FFFC | 0081 | 650A | 6576 | 746E | 745F | 7079 | 0E65 |
| 0000152160 | 6005 | 0512 | 8500 | 0600 | 6E69 | 6D75 | 675F | 050D |
| 0000152200 | 125E | 0005 | 0081 | 6505 | 7272 | 675F | 050B | 0D56 |
| 0000152220 | 0005 | 06C4 | 6D03 | 6773 | 050D | 115E | 0005 | 06C5 |
| 0000152240 | 6605 | 6D5F | 6773 | 050F | 00EA | 0005 | 05F9 | 6607 |
| 0000152260 | 6D5F | 6773 | 705F | 050D | 00EE | 0005 | 05F9 | 6D05 |
| 0000152300 | 6773 | 705F | 050D | 0C2E | 0005 | 0643 | 6505 | 6576 |
| 0000152320 | 746E | 050F | 115A | 0005 | 00C4 | 6D07 | 6773 | 705F |
| 0000152340 | 7274 | 0511 | 00F2 | 0005 | 0085 | 6D09 | 6773 | 695F |
| 0000152360 | 646E | 7865 | 0510 | 00F4 | 0005 | 0085 | 6D08 | 6773 |
| 0000152400 | 735F | 7A69 | 1165 | 5605 | 0511 | C400 | 0900 | 7274 |
| 0000152420 | 6361 | 5F6B | 7470 | 1372 | F605 | 0500 | 8500 | 0B00 |
| 0000152440 | 7274 | 6361 | 5F6B | 6E69 | 6564 | 1278 | F805 | 0500 |
| 0000152460 | 8500 | 0A00 | 7274 | 6361 | 5F6B | 6973 | 657A | 0512 |
| 0000152500 | 00FA | 0005 | 0085 | 610A | 6F62 | 7472 | 665F | 616C |
| 0000152520 | 0167 | 2302 | 6601 | C707 | 4D06 | 1600 | 4100 | 0000 |
| 0000152540 | 0400 | 6314 | 7672 | 6F5F | 6570 | 5F6E | 6F73 | 7466 |
| 0000152560 | 745F | 7268 | 6165 | 0164 | 2502 | B301 | C907 | A906 |
| 0000152600 | 1001 | 9E00 | 0001 | 0400 | 7316 | 666F | 5F74 | 6572 |
| 0000152620 | 6461 | 695F | 706E | 7475 | 655F | 6576 | 746E | 0973 |
| 0000152640 | 0604 | C000 | 0300 | 7470 | 0972 | F804 | 85FF | 0300 |
| 0000152660 | 7265 | 0972 | FA04 | 86FF | 0300 | 6573 | 0F6D | F604 |
| 0000152700 | 85FF | 0900 | 6573 | 5F6D | 6E69 | 6564 | 0C78 | F404 |
| 0000152720 | 85FF | 0600 | 7564 | 5F6D | 7068 | 0201 | 0128 | 095C |
| 0000152740 | 06CF | 07FC | 0010 | 07F1 | 0000 | 1904 | 7274 | 6E61 |
| 0000152760 | 6C73 | 7461 | 5F65 | 6F73 | 7466 | 7365 | 5F74 | 6F63 |
| 0000153000 | 6D6D | 6E61 | 0964 | 0604 | AB00 | 0306 | 7562 | 0F66 |
| 0000153020 | 0A04 | C500 | 0900 | 7562 | 5F66 | 6E69 | 6564 | 0F78 |
| 0000153040 | 0E04 | 6800 | 0906 | 7665 | 6E65 | 5F74 | 7470 | 0572 |
| 0000153060 | 8300 | E00B | 0900 | FC04 | 81FF | 0300 | 7265 | 0B72 |
| 0000153100 | FA04 | 81FF | 0500 | 7265 | 6F72 | 0172 | 0502 | 8A00 |
| 0000153120 | 590C | 0900 | FA04 | 81FF | 0300 | 7265 | 0172 | 0502 |
| 0000153140 | 4700 | FA0D | 0B00 | FA04 | 81FF | 0500 | 7265 | 6F72 |
| 0000153160 | 0172 | 0502 | BC00 | 700E | 0700 | FA04 | 85FF | 0100 |
| 0000153200 | 0169 | 0102 | 2302 | 5801 | D911 | 3206 | 1003 | 2700 |
| 0000153220 | 0003 | 0400 | 7014 | 6F72 | 6563 | 7373 | 6D5F | 766F |
| 0000153240 | 5F65 | 6F6C | 6163 | 6F74 | 0F72 | 0604 | AB00 | 0906 |
| 0000153260 | 7274 | 6361 | 5F6B | 7562 | 1166 | 0A04 | C500 | 0B00 |
| 0000153300 | 7274 | 6361 | 5F6B | 6E69 | 6564 | 0F78 | 0E04 | 6800 |
| 0000153320 | 0906 | 7665 | 6E65 | 5F74 | 7470 | 0B72 | FC04 | 81FF |
| 0000153340 | 0500 | 7265 | 6F72 | 0172 | 2502 | 8A01 | DE14 | 3706 |
| 0000153360 | 1001 | 2C00 | 0001 | 0400 | 7016 | 6F72 | 6563 | 7373 |
| 0000153400 | 6C5F | 636F | 7461 | 726F | 745F | 6D69 | 6E69 | 0F67 |
| 0000153420 | 0604 | AB00 | 0906 | 7274 | 6361 | 5F6B | 7562 | 1166 |
| 0000153440 | 0A04 | C500 | 0B00 | 7274 | 6361 | 5F6B | 6E69 | 6564 |
| 0000153460 | 0C78 | 0E04 | C200 | 0600 | 6974 | 696D | 676E | 040B |
| 0000153500 | FFFA | 0082 | 7305 | 6163 | 656C | 0201 | 0123 | 15C1 |
| 0000153520 | 06E1 | 00DC | 0010 | 00D1 | 0000 | 1404 | 7263 | 5F76 |
| 0000153540 | 6567 | 5F74 | 6574 | 6863 | 665F | 6F72 | 5F6D | 6264 |
| 0000153560 | 040D | 0006 | 0086 | 7407 | 6365 | 5F68 | 6469 | 040F |
| 0000153600 | 000A | 0668 | 6509 | 6576 | 746E | 705F | 7274 | 040E |
| 0000153620 | FFF8 | 06E2 | 7408 | 6365 | 5F68 | 7470 | 0972 | FC04 |
| 0000153640 | 81FF | 0300 | 7265 | 0172 | 2002 | 9D01 | E516 | A106 |

THU MAR 14 17:27:50 1991 CRV_STI.DLL PAGE 47, LINE 2715

| | | | | | | | | |
|---|---|---|---|---|---|---|---|---|
| 0000153660 | 1000 | 9600 | 0000 | 0400 | 6711 | 7465 | 745F | 6172 |
| 0000153700 | 6B63 | 665F | 6F72 | 5F6D | 6264 | 040E | 0006 | 0086 |
| 0000153720 | 7408 | 6172 | 6B63 | 695F | 0F64 | 0A04 | AB00 | 0906 |
| 0000153740 | 7274 | 6361 | 5F6B | 7562 | 1066 | 0E04 | C500 | 0A00 |
| 0000153760 | 7274 | 6361 | 5F6B | 6973 | 657A | 0411 | 0012 | 00C5 |
| 0000154000 | 740B | 6172 | 6B63 | 695F | 646E | 7865 | 0409 | FFFC |
| 0000154020 | 0081 | 6503 | 7272 | 0201 | 0127 | 173E | 06E7 | 002A |
| 0000154040 | 0016 | 001E | 0000 | 1804 | 6F73 | 7466 | 725F | 6165 |
| 0000154060 | 5F64 | 6F74 | 635F | 7672 | 735F | 6D65 | 705F | 7274 |
| 0000154100 | 0201 | 0120 | 1768 | 06E8 | 002A | 0016 | 001E | 0000 |
| 0000154120 | 1104 | 6F73 | 7466 | 725F | 6165 | 5F64 | 6573 | 5F6D |
| 0000154140 | 7470 | 0172 | 2102 | 9201 | E917 | 2C06 | 1600 | 2000 |
| 0000154160 | 0000 | 0400 | 7312 | 666F | 5F74 | 7665 | 6E65 | 5F74 |
| 0000154200 | 6F70 | 6E69 | 6574 | 0172 | 1902 | BE01 | EA17 | 2806 |
| 0000154220 | 1600 | 1C00 | 0000 | 0400 | 730A | 666F | 5F74 | 6261 |
| 0000154240 | 726F | 0174 | 1E02 | E601 | EB17 | 4506 | 1600 | 3900 |
| 0000154260 | 0000 | 0400 | 730F | 666F | 5F74 | 6C63 | 736F | 5F65 |
| 0000154300 | 6574 | 7473 | 0201 | 0123 | 182B | 06EC | 0045 | 0016 |
| 0000154320 | 0039 | 0000 | 1404 | 6F73 | 7466 | 635F | 6F6C | 6573 |
| 0000154340 | 645F | 6669 | 5F66 | 6574 | 7473 | 0201 | 011D | 1870 |
| 0000154360 | 06EE | 0037 | 0016 | 0029 | 0000 | 0E04 | 6F73 | 7466 |
| 0000154400 | 6F5F | 6570 | 5F6E | 6574 | 7473 | 040C | 0006 | 0086 |
| 0000154420 | 7406 | 7473 | 695F | 0164 | 2202 | A701 | F018 | 3706 |
| 0000154440 | 1600 | 2900 | 0000 | 0400 | 7313 | 666F | 5F74 | 706F |
| 0000154460 | 6E65 | 645F | 6669 | 5F66 | 6574 | 7473 | 040C | 0006 |
| 0000154500 | 0086 | 7406 | 7473 | 695F | 0164 | 0502 | 000D | 1A00 |
| 0000154520 | 1500 | 0805 | 0402 | 8500 | 0D00 | 5F66 | 6970 | 6570 |
| 0000154540 | 685F | 6E61 | 6C64 | 1565 | 0A05 | 0402 | 8500 | 0D00 |
| 0000154560 | 5F67 | 6970 | 6570 | 685F | 6E61 | 6C64 | 1065 | 0005 |
| 0000154600 | 0402 | 1F00 | 0806 | 7473 | 5F69 | 6164 | 6174 | 050F |
| 0000154620 | 0054 | 0005 | 00C0 | 4207 | 785F | 6946 | 656C | 050F |
| 0000154640 | 0058 | 0005 | 00C0 | 4207 | 785F | 6150 | 6B63 | 051C |
| 0000154660 | 005C | 0005 | 0086 | 7314 | 666F | 5F74 | 6572 | 6461 |
| 0000154700 | 745F | 5F6F | 7263 | 5F76 | 6573 | 156D | 6005 | 0500 |
| 0000154720 | 8600 | 0D00 | 6F73 | 7466 | 725F | 6165 | 5F64 | 6573 |
| 0000154740 | 166D | 6405 | 0500 | 6800 | 0E06 | 6F73 | 7466 | 655F |
| 0000154760 | 6576 | 746E | 705F | 7274 | 051A | 0B60 | 0005 | 0086 |
| 0000155000 | 7312 | 666F | 5F74 | 6874 | 6572 | 6461 | 755F | 5F70 |
| 0000155020 | 6573 | 156D | A605 | 050A | 8400 | 0D00 | 6F6D | 7375 |
| 0000155040 | 5F65 | 6261 | 5F73 | 6572 | 136C | 5C05 | 050B | 8400 |
| 0000155060 | 0B00 | 6F6D | 7375 | 5F65 | 6E75 | 7469 | 1773 | C605 |
| 0000155100 | 050B | 8100 | 0F00 | 616C | 7473 | 785F | 705F | 736F |
| 0000155120 | 7469 | 6F69 | 176E | C805 | 050B | 8100 | 0F00 | 616C |
| 0000155140 | 7473 | 795F | 705F | 736F | 7469 | 6F69 | 146E | CC05 |
| 0000155160 | 050B | D900 | 0C02 | 756D | 5F78 | 6573 | 5F6D | 696C |
| 0000155200 | 7473 | 051A | 0B64 | 0005 | 02D9 | 6112 | 6F62 | 7472 |
| 0000155220 | 6D5F | 7875 | 735F | 6D65 | 6C5F | 7369 | 1974 | 6805 |
| 0000155240 | 0500 | 8600 | 1100 | 7263 | 5F76 | 6166 | 7473 | 705F |
| 0000155260 | 7069 | 5F65 | 6573 | 196D | 6C05 | 0500 | 8600 | 1100 |
| 0000155300 | 7263 | 5F76 | 6572 | 6461 | 705F | 7069 | 5F65 | 6573 |
| 0000155320 | 146D | 0005 | 0000 | 8100 | 0C00 | 7842 | 445F | 6265 |
| 0000155340 | 6775 | 6F4D | 6564 | 050E | 0BCA | 0005 | 0085 | 6906 |
| 0000155360 | 756E | 5F6D | 1461 | 0005 | 0000 | 8100 | 0C00 | 7842 |
| 0000155400 | 545F | 6D69 | 7365 | 6F4D | 6564 | 050D | 0B5E | 0005 |
| 0000155420 | 0081 | 6505 | 7272 | 615F | 0513 | 0AA8 | 0005 | 04E7 |
| 0000155440 | 760B | 7265 | 695F | 676D | 685F | 7264 | 0510 | 0000 |
| 0000155460 | 0000 | 0081 | 4208 | 5F78 | 5F42 | 6973 | 1467 | 7005 |
| 0000155500 | 0500 | 8500 | 0C00 | 6567 | 5F6E | 736D | 5F67 | 6C66 |
| 0000155520 | 6761 | 0517 | 0072 | 0005 | 0085 | 730F | 666F | 5F74 |

THU MAR 14 17:27:50 1991 CRV_STI.DLL PAGE 48, LINE 2774

| | | | | | | | | |
|---|---|---|---|---|---|---|---|---|
| 0000155540 | 6261 | 726F | 5F74 | 6C66 | 6761 | 1105 | 0001 | 0000 |
| 0000155560 | 011C | 18DE | 06E8 | 0039 | 0016 | 002D | 0000 | 0D04 |
| 0000155600 | 7263 | 5F76 | 6573 | 646E | 695F | 696E | 0174 | 2502 |
| 0000155620 | 1701 | EA19 | 4B06 | 1001 | 4000 | 0001 | 0400 | 7016 |
| 0000155640 | 6F72 | 6563 | 7373 | 6C5F | 636F | 7461 | 726F | 745F |
| 0000155660 | 6D69 | 6E69 | 0C67 | 0604 | 8200 | 0600 | 6974 | 696D |
| 0000155700 | 676E | 0407 | FFFC | 0085 | 7401 | 0201 | 011E | 1A62 |
| 0000155720 | 06EC | 00CD | 0010 | 00C2 | 0000 | 0F04 | 7570 | 5F74 |
| 0000155740 | 7274 | 6361 | 5F6B | 6E69 | 645F | 0962 | FC04 | 81FF |
| 0000155760 | 0300 | 7265 | 0172 | 2102 | 2F01 | EE1B | 4106 | 1000 |
| 0000156000 | 3600 | 0000 | 0400 | 7512 | 6470 | 7461 | 5F65 | 7274 |
| 0000156020 | 6361 | 5F6B | 6E69 | 645F | 0962 | FC04 | 81FF | 0300 |
| 0000156040 | 7265 | 0172 | 2402 | 7001 | F01B | 9806 | 1600 | 8A00 |
| 0000156060 | 0000 | 0400 | 6315 | 7672 | 635F | 6572 | 7461 | 5F65 |
| 0000156100 | 6E69 | 7469 | 745F | 6172 | 6B63 | 040F | 0006 | 0699 |
| 0000156120 | 6509 | 6576 | 746E | 705F | 7274 | 0409 | FFFC | 0081 |
| 0000156140 | 6503 | 7272 | 0201 | 0124 | 1C08 | 06F3 | 01C1 | 0016 |
| 0000156160 | 01B3 | 0000 | 1504 | 7263 | 5F76 | 7263 | 6165 | 6574 |
| 0000156200 | 6D5F | 766F | 5F65 | 7274 | 6361 | 0F6B | 0604 | 9900 |
| 0000156220 | 0906 | 7665 | 6E65 | 5F74 | 7470 | 0972 | FC04 | 81FF |
| 0000156240 | 0300 | 7265 | 0172 | 2402 | C901 | F81D | 6D06 | 1600 |
| 0000156260 | 5F00 | 0000 | 0400 | 6315 | 7672 | 635F | 6572 | 7461 |
| 0000156300 | 5F65 | 7274 | 6361 | 5F6B | 7973 | 636E | 040F | 0006 |
| 0000156320 | 0699 | 6509 | 6576 | 746E | 705F | 7274 | 0201 | 0123 |
| 0000156340 | 1E36 | 06FB | 0066 | 0016 | 0058 | 0000 | 1404 | 7263 |
| 0000156360 | 5F76 | 7263 | 6165 | 6574 | 655F | 646E | 745F | 6172 |
| 0000156400 | 6B63 | 040F | 0006 | 0699 | 6509 | 6576 | 746E | 705F |
| 0000156420 | 7274 | 0201 | 0121 | 1E9C | 06FC | 0030 | 0016 | 0024 |
| 0000156440 | 0000 | 1204 | 7263 | 5F76 | 6C63 | 736F | 5F65 | 6264 |
| 0000156460 | 745F | 6172 | 6B63 | 0409 | FFFC | 0081 | 6503 | 7272 |
| 0000156500 | 0201 | 0124 | 1ECC | 06FE | 0138 | 0016 | 012A | 0000 |
| 0000156520 | 1504 | 7263 | 5F76 | 7263 | 6165 | 6574 | 735F | 6E79 |
| 0000156540 | 5F63 | 7665 | 6E65 | 0F74 | 0804 | 9900 | 0906 | 7665 |
| 0000156560 | 6E65 | 5F74 | 7470 | 1172 | 0604 | 8100 | 0B00 | 7973 |
| 0000156600 | 636E | 725F | 6165 | 6F73 | 0E6E | A604 | A9FF | 0806 |
| 0000156620 | 7973 | 636E | 625F | 6675 | 0410 | FFAD | 05F8 | 730A |
| 0000156640 | 6E79 | 5F63 | 7665 | 6E65 | 0974 | FC04 | 81FF | 0300 |
| 0000156660 | 7265 | 0172 | 2102 | 0401 | 0020 | 6E07 | 1601 | 6000 |
| 0000156700 | 0001 | 0400 | 6312 | 7672 | 735F | 6E65 | 5F64 | 656B |
| 0000156720 | 5F79 | 7665 | 6E65 | 0F74 | 0604 | 9900 | 0906 | 7665 |
| 0000156740 | 6E65 | 5F74 | 7470 | 0F72 | E804 | E9FF | 0905 | 656B |
| 0000156760 | 5F79 | 7665 | 6E65 | 1074 | F404 | ECFF | 0A05 | 6B6D |
| 0000157000 | 7965 | 655F | 6576 | 746E | 0409 | FFF2 | 0081 | 6503 |
| 0000157020 | 7272 | 0201 | 0125 | 2172 | 0702 | 00DC | 0016 | 00CE |
| 0000157040 | 0000 | 1604 | 7263 | 5F76 | 6573 | 646E | 735F | 666F |
| 0000157060 | 6B74 | 7965 | 655F | 6576 | 746E | 040F | 0006 | 0699 |
| 0000157100 | 6509 | 6576 | 746E | 705F | 7274 | 040F | FFF4 | 061D |
| 0000157120 | 7309 | 6B66 | 655F | 6576 | 746E | 0409 | FFF2 | 0081 |
| 0000157140 | 6503 | 7272 | 0201 | 0122 | 224E | 0704 | 00A9 | 0016 |
| 0000157160 | 009B | 0000 | 1304 | 7263 | 5F76 | 6573 | 646E | 665F |
| 0000157200 | 6C69 | 6574 | 5F72 | 6564 | 0F66 | 0604 | 9900 | 0906 |
| 0000157220 | 7665 | 6E65 | 5F74 | 7470 | 0972 | FC04 | 81FF | 0300 |
| 0000157240 | 7265 | 0172 | 2002 | F701 | 0622 | F107 | 1600 | E300 |
| 0000157260 | 0000 | 0400 | 6311 | 7672 | 735F | 6E65 | 5F64 | 6369 |
| 0000157300 | 6E6F | 6D5F | 6773 | 0409 | 0006 | 00C0 | 6D03 | 6773 |
| 0000157320 | 0409 | FFFC | 0081 | 6503 | 7272 | 040D | FFF8 | 0645 |
| 0000157340 | 6D07 | 6773 | 705F | 7274 | 0201 | 0128 | 23E8 | 0708 |
| 0000157360 | 00A4 | 0016 | 0096 | 0000 | 1904 | 7263 | 5F76 | 6573 |
| 0000157400 | 646E | 695F | 6F63 | 5F6E | 656C | 7261 | 5F6E | 6E65 |

THU MAR 14 17:27:50 1991 CRV_STI.DLL PAGE 49, LINE 2833

| | | | | | | | | |
|---|---|---|---|---|---|---|---|---|
| 0000157420 | 6564 | 0C64 | 0604 | 8500 | 0600 | 6572 | 7573 | 746C |
| 0000157440 | 0409 | FFFC | 0081 | 6503 | 7272 | 040D | FFF8 | 0645 |
| 0000157460 | 6D07 | 6773 | 705F | 7274 | 0201 | 011F | 248C | 070A |
| 0000157500 | 0366 | 0016 | 0358 | 0000 | 1004 | 7263 | 5F76 | 6573 |
| 0000157520 | 646E | 655F | 7272 | 6D5F | 6773 | 0410 | 000E | 0081 |
| 0000157540 | 650A | 7272 | 726F | 635F | 646F | 1165 | 0A04 | C000 |
| 0000157560 | 0B00 | 6966 | 7372 | 5F74 | 6170 | 6172 | 126D | 0604 |
| 0000157600 | C000 | 0C00 | 6573 | 6F63 | 646E | 705F | 7261 | 6D61 |
| 0000157620 | 040C | FFFA | 00C0 | 5F06 | 745F | 7079 | 0F65 | F204 |
| 0000157640 | 85FF | 0900 | 5F5F | 7862 | 745F | 7079 | 0D65 | E004 |
| 0000157660 | A2FF | 0704 | 5F5F | 7270 | 6E69 | 0B74 | D804 | BDFF |
| 0000157700 | 0506 | 5F5F | 766C | 0D6C | E604 | 0FFF | 0707 | 5F5F |
| 0000157720 | 6C63 | 636F | 0D6B | F604 | C0FF | 0700 | 5F5F | 7473 |
| 0000157740 | 6361 | 0E6B | DE04 | 81FF | 0800 | 5F5F | 6572 | 7674 |
| 0000157760 | 6C61 | 040D | FFD4 | 0645 | 6507 | 7272 | 6D5F | 6773 |
| 0000160000 | 0415 | FFE4 | 0085 | 6E0F | 6F5F | 5F66 | 736D | 5F67 |
| 0000160020 | 6170 | 6172 | 736D | 0409 | FFF4 | 0081 | 6503 | 7272 |
| 0000160040 | 050E | 0242 | 0005 | 070D | 5F06 | 665F | 6E75 | 0163 |
| 0000160060 | 0502 | 000D | 1A00 | 0F00 | 9C05 | 0501 | C000 | 0700 |
| 0000160100 | 5F42 | 4678 | 6C69 | 0F65 | A005 | 0501 | C000 | 0700 |
| 0000160120 | 5F42 | 5078 | 6361 | 116B | 6405 | 0512 | E400 | 0906 |
| 0000160140 | 7274 | 6361 | 5F6B | 7562 | 1166 | 6805 | 0522 | C400 |
| 0000160160 | 0900 | 7274 | 6361 | 5F6B | 7470 | 1372 | A405 | 0501 |
| 0000160200 | 8500 | 0B00 | 7274 | 6361 | 5F6B | 6E69 | 6564 | 1578 |
| 0000160220 | 6205 | 0512 | 8400 | 0D00 | 6F6D | 7375 | 5F65 | 6261 |
| 0000160240 | 5F73 | 6572 | 156C | 0A05 | 0402 | 8500 | 0D00 | 5F67 |
| 0000160260 | 6970 | 6570 | 685F | 6E61 | 6C64 | 1365 | 6305 | 0512 |
| 0000160300 | 8400 | 0B00 | 6F6D | 7375 | 5F65 | 6E75 | 7469 | 1073 |
| 0000160320 | 0005 | 0402 | 6B00 | 0806 | 7473 | 5F69 | 6164 | 6174 |
| 0000160340 | 0517 | 2264 | 0005 | 0081 | 6C0F | 7361 | 5F74 | 5F78 |
| 0000160360 | 6F70 | 6973 | 6974 | 6E6F | 0517 | 2266 | 0005 | 0081 |
| 0000160400 | 6C0F | 7361 | 5F74 | 5F79 | 6F70 | 6973 | 6974 | 6E6F |
| 0000160420 | 050B | 226C | 0005 | 06E5 | 6D03 | 6773 | 050F | 01A6 |
| 0000160440 | 0005 | 0645 | 6D07 | 6773 | 705F | 7274 | 0514 | 0000 |
| 0000160460 | 0000 | 0081 | 420C | 5F78 | 6544 | 7562 | 4D67 | 646F |
| 0000160500 | 1465 | 0005 | 0000 | 8100 | 0C00 | 7842 | 545F | 6D69 |
| 0000160520 | 7365 | 6F4D | 6564 | 0510 | 0000 | 0000 | 0081 | 4208 |
| 0000160540 | 5F78 | 5F42 | 6973 | 0567 | 0111 | 0000 | 1C00 | F201 |
| 0000160560 | B627 | CD06 | 1600 | C100 | 0000 | 0400 | 630D | 7672 |
| 0000160600 | 725F | 7365 | 5F70 | 6E69 | 7469 | 0201 | 0120 | 28BF |
| 0000160620 | 06B7 | 0052 | 0016 | 0046 | 0000 | 1104 | 7263 | 5F76 |
| 0000160640 | 6572 | 7073 | 735F | 7568 | 6474 | 776F | 016E | 2102 |
| 0000160660 | 1101 | B929 | B906 | 1600 | AB00 | 0000 | 0400 | 6312 |
| 0000160700 | 7672 | 725F | 7365 | 5F70 | 6567 | 5F6E | 7665 | 6E65 |
| 0000160720 | 0F74 | 0604 | 8800 | 0906 | 7665 | 6E65 | 5F74 | 7470 |
| 0000160740 | 0172 | 2302 | CA01 | BB29 | 3D06 | 1000 | 3200 | 0000 |
| 0000160760 | 0400 | 6314 | 7672 | 725F | 7365 | 5F70 | 6261 | 726F |
| 0000161000 | 5F74 | 7665 | 6E65 | 0F74 | 0604 | 8800 | 0906 | 7665 |
| 0000161020 | 6E65 | 5F74 | 7470 | 0172 | 2402 | 0701 | BD2A | 3D06 |
| 0000161040 | 1000 | 3200 | 0000 | 0400 | 6315 | 7672 | 725F | 7365 |
| 0000161060 | 5F70 | 6C69 | 656C | 6167 | 5F6C | 6F63 | 6564 | 040F |
| 0000161100 | 0006 | 0688 | 6509 | 6576 | 746E | 705F | 7274 | 0201 |
| 0000161120 | 0122 | 2A44 | 06BF | 003D | 0010 | 0032 | 0000 | 1304 |
| 0000161140 | 7263 | 5F76 | 6572 | 7073 | 745F | 6365 | 5F68 | 7665 |
| 0000161160 | 6E65 | 0F74 | 0604 | 8800 | 0906 | 7665 | 6E65 | 5F74 |
| 0000161200 | 7470 | 0172 | 2202 | 8101 | C12A | 7806 | 1600 | 6A00 |
| 0000161220 | 0000 | 0400 | 6313 | 7672 | 725F | 7365 | 5F70 | 626B |
| 0000161240 | 5F64 | 7473 | 7461 | 7375 | 040F | 0006 | 0688 | 6509 |
| 0000161260 | 6576 | 746E | 705F | 7274 | 0201 | 0123 | 2AF9 | 06C3 |

THU MAR 14 17:27:50 1991 CRV_STI.DLL PAGE 50, LINE 2892

| | | | | | | | | |
|---|---|---|---|---|---|---|---|---|
| 0000161300 | 0089 | 0016 | 007B | 000D | 1404 | 7263 | 5F76 | 6572 |
| 0000161320 | 7073 | 6C5F | 636F | 7461 | 726F | 705F | 736F | 040F |
| 0000161340 | 0006 | 0688 | 6509 | 6576 | 746E | 705F | 7274 | 0201 |
| 0000161360 | 0125 | 2B82 | 06C5 | 00C7 | 0016 | 00B9 | 0000 | 1604 |
| 0000161400 | 7263 | 5F76 | 6572 | 7073 | 635F | 7061 | 7574 | 6572 |
| 0000161420 | 655F | 6576 | 746E | 040F | 0006 | 0688 | 6509 | 6576 |
| 0000161440 | 746E | 705F | 7274 | 0201 | 0124 | 2C49 | 06C7 | 010E |
| 0000161460 | 0016 | 0100 | 0000 | 1504 | 7263 | 5F76 | 6572 | 7073 |
| 0000161500 | 765F | 7265 | 6669 | 5F79 | 7665 | 6E65 | 0F74 | 0604 |
| 0000161520 | 8800 | 0906 | 7665 | 6E65 | 5F74 | 7470 | 0172 | 2102 |
| 0000161540 | 5701 | C92D | B106 | 1600 | A300 | 0000 | 0400 | 6312 |
| 0000161560 | 7672 | 725F | 7365 | 5F70 | 656B | 5F79 | 7665 | 6E65 |
| 0000161600 | 0F74 | 0604 | 8800 | 0906 | 7665 | 6E65 | 5F74 | 7470 |
| 0000161620 | 0172 | 2302 | 0801 | CB2E | C806 | 1600 | BA00 | 0000 |
| 0000161640 | 0400 | 6314 | 7672 | 725F | 7365 | 5F70 | 6574 | 6863 |
| 0000161660 | 635F | 6572 | 7461 | 0F65 | 0604 | 8800 | 0906 | 7665 |
| 0000161700 | 6E65 | 5F74 | 7470 | 0D72 | FA04 | 86FF | 0700 | 6574 |
| 0000161720 | 6863 | 695F | 0964 | F804 | 81FF | 0300 | 7265 | 0172 |
| 0000161740 | 2102 | D001 | CD2E | 8706 | 1600 | 7900 | 0000 | 0400 |
| 0000161760 | 6312 | 7672 | 615F | 6464 | 745F | 6365 | 5F68 | 7665 |
| 0000162000 | 6E65 | 0F74 | 0604 | 8800 | 0906 | 7665 | 6E65 | 5F74 |
| 0000162020 | 7470 | 0D72 | FA04 | 86FF | 0700 | 6574 | 6863 | 695F |
| 0000162040 | 0964 | F804 | 81FF | 0300 | 7265 | 0172 | 2102 | 5701 |
| 0000162060 | D02F | F906 | 1000 | EE00 | 0000 | 0400 | 6312 | 6572 |
| 0000162100 | 7461 | 5F65 | 6574 | 6863 | 6F5F | 6A62 | 6365 | 0F74 |
| 0000162120 | 0604 | 8800 | 0906 | 7665 | 6E65 | 5F74 | 7470 | 0D72 |
| 0000162140 | 0A04 | C600 | 0700 | 6574 | 6863 | 695F | 0E64 | A204 |
| 0000162160 | 96FF | 0806 | 7973 | 636E | 625F | 6675 | 040E | FFF8 |
| 0000162200 | 06D1 | 7408 | 6365 | 5F68 | 7470 | 0972 | FC04 | 81FF |
| 0000162220 | 0300 | 7265 | 0172 | 0502 | 000D | 1A00 | 1000 | 0005 |
| 0000162240 | 0402 | 5A00 | 0806 | 7473 | 5F69 | 6164 | 6174 | 0519 |
| 0000162260 | 0254 | 0005 | 0085 | 6311 | 7672 | 615F | 6464 | 745F |
| 0000162300 | 6365 | 5F68 | 6C66 | 6761 | 0513 | 0256 | 0005 | 0086 |
| 0000162320 | 630B | 7672 | 745F | 6365 | 5F68 | 6469 | 051D | 266C |
| 0000162340 | 0005 | 0634 | 7208 | 7365 | 6F70 | 736E | 0E65 | 7005 |
| 0000162360 | 0526 | 3400 | 0606 | 6572 | 7073 | 315F | 050E | 2674 |
| 0000162400 | 0005 | 0634 | 7206 | 7365 | 5F70 | 0A32 | 7263 | 5F76 |
| 0000162420 | 6F73 | 7466 | 632E | 0001 | 01CE | 00B6 | 0000 | 00B7 |
| 0000162440 | 0016 | 00B8 | 0024 | 00B9 | 002E | 00C0 | 003A | 00C1 |
| 0000162460 | 0050 | 00C2 | 0058 | 00CE | 0064 | 00CF | 0074 | 00D4 |
| 0000162500 | 0107 | 00D5 | 0111 | 00D6 | 011A | 00D8 | 016E | 00D9 |
| 0000162520 | 0194 | 00DB | 019D | 00DC | 01A0 | 00DE | 01A6 | 00DF |
| 0000162540 | 01B6 | 00E1 | 01BC | 00E4 | 021F | 00E5 | 0225 | 00E7 |
| 0000162560 | 0228 | 00E8 | 027C | 00E9 | 02DF | 00EA | 02F4 | 00EB |
| 0000162600 | 02F7 | 00EC | 035A | 00F6 | 0365 | 00F8 | 0375 | 00FB |
| 0000162620 | 037D | 00FC | 0387 | 00FD | 0394 | 00FE | 039D | 00FF |
| 0000162640 | 03A3 | 0100 | 03B4 | 0101 | 03BA | 010B | 03C5 | 0120 |
| 0000162660 | 03D5 | 0122 | 03DF | 0124 | 03E8 | 0125 | 040C | 0127 |
| 0000162700 | 0415 | 0129 | 0424 | 012B | 042A | 012D | 043F | 012E |
| 0000162720 | 0445 | 012F | 044E | 0130 | 0454 | 0131 | 045E | 0132 |
| 0000162740 | 0464 | 0134 | 0472 | 0136 | 047E | 0137 | 048A | 0138 |
| 0000162760 | 0490 | 013A | 0496 | 013B | 04A8 | 013C | 04AE | 013D |
| 0000163000 | 04BA | 013E | 04C6 | 0142 | 04CC | 0144 | 04D8 | 0146 |
| 0000163020 | 04E2 | 0148 | 04EB | 0149 | 050F | 014B | 0518 | 014D |
| 0000163040 | 0527 | 0150 | 052D | 0152 | 0547 | 0154 | 0550 | 0155 |
| 0000163060 | 0556 | 0156 | 055F | 0157 | 0565 | 0158 | 056F | 0159 |
| 0000163100 | 0575 | 015B | 0583 | 015C | 0595 | 015D | 059B | 015E |
| 0000163120 | 05A7 | 015F | 05B3 | 0162 | 05B9 | 0164 | 05BC | 0165 |
| 0000163140 | 05C2 | 0166 | 05CC | 0167 | 05D2 | 0168 | 05DD | 0169 |

THU MAR 14 17:27:50 1991 CRV_STI.DLL PAGE 51, LINE 2951

| | | | | | | | | |
|---|---|---|---|---|---|---|---|---|
| 0000163160 | 05EE | 016D | 05F4 | 016F | 0600 | 0170 | 060A | 0172 |
| 0000163200 | 0613 | 0176 | 061F | 0177 | 0642 | 017A | 064B | 017C |
| 0000163220 | 0650 | 017D | 0655 | 0180 | 065B | 0182 | 0667 | 0183 |
| 0000163240 | 0679 | 0184 | 0690 | 0186 | 069C | 0188 | 06A2 | 018A |
| 0000163260 | 06A7 | 018C | 06AC | 018D | 06AF | 018F | 06B5 | 0191 |
| 0000163300 | 06BE | 0192 | 06CA | 0194 | 06D0 | 0196 | 06D3 | 0198 |
| 0000163320 | 06DD | 0199 | 06E3 | 019B | 06EC | 019F | 06F2 | 01A1 |
| 0000163340 | 06F5 | 01A2 | 0707 | 01A3 | 071E | 01A5 | 0727 | 01A6 |
| 0000163360 | 0733 | 01A8 | 0739 | 01A9 | 0746 | 01AA | 074C | 01AB |
| 0000163400 | 074F | 01AE | 0755 | 01AF | 075B | 01C2 | 0766 | 01C4 |
| 0000163420 | 077C | 01C5 | 079B | 01C6 | 07A1 | 01C7 | 07A7 | 01E6 |
| 0000163440 | 07B3 | 01E8 | 07C3 | 01EE | 07CB | 01EF | 07E8 | 01F1 |
| 0000163460 | 07F1 | 01F5 | 07FD | 01F6 | 0807 | 01F7 | 0820 | 01F9 |
| 0000163500 | 0829 | 01FB | 0835 | 01FC | 0846 | 01FE | 084F | 0201 |
| 0000163520 | 085B | 0204 | 0864 | 0205 | 086E | 0206 | 087A | 0208 |
| 0000163540 | 0883 | 020A | 088F | 020B | 0899 | 020C | 08A5 | 020E |
| 0000163560 | 08AE | 0210 | 08BA | 0213 | 08C0 | 0214 | 08CA | 0215 |
| 0000163600 | 08D4 | 0219 | 08DA | 021B | 08F1 | 021C | 08FA | 021E |
| 0000163620 | 0903 | 0220 | 091D | 0222 | 0926 | 0223 | 092C | 0227 |
| 0000163640 | 0939 | 0229 | 093C | 022B | 094B | 022C | 094E | 022D |
| 0000163660 | 0951 | 0239 | 095C | 023C | 096C | 023D | 097C | 023E |
| 0000163700 | 0984 | 023F | 098E | 0240 | 0995 | 0244 | 099C | 0247 |
| 0000163720 | 09A6 | 024A | 09A9 | 024B | 09B9 | 024C | 09BF | 024D |
| 0000163740 | 09C5 | 0251 | 09C8 | 0255 | 09CB | 0256 | 09E8 | 0257 |
| 0000163760 | 09F0 | 0258 | 09F8 | 025C | 09FB | 0261 | 09FE | 0263 |
| 0000164000 | 0A0E | 0265 | 0A27 | 0266 | 0A40 | 0267 | 0A47 | 0268 |
| 0000164020 | 0A4E | 026C | 0A51 | 026E | 0A61 | 0270 | 0A7A | 0271 |
| 0000164040 | 0A93 | 0272 | 0A9A | 0273 | 0AA1 | 0277 | 0AA4 | 0279 |
| 0000164060 | 0AB4 | 027B | 0AC5 | 027D | 0AD6 | 027F | 0AE7 | 0281 |
| 0000164100 | 0AF8 | 0283 | 0B11 | 0284 | 0B2A | 0285 | 0B31 | 0286 |
| 0000164120 | 0B38 | 0289 | 0B3B | 028C | 0B3E | 028F | 0B41 | 0290 |
| 0000164140 | 0B59 | 0291 | 0B72 | 0292 | 0B79 | 0293 | 0B80 | 029B |
| 0000164160 | 0B83 | 029C | 0BA1 | 029D | 0BA8 | 029E | 0BAF | 02A0 |
| 0000164200 | 0BB8 | 02A1 | 0BC3 | 02A2 | 0BD1 | 02A4 | 0BD7 | 02A7 |
| 0000164220 | 0BE4 | 02AB | 0BF1 | 02AD | 0C25 | 02AF | 0C2E | 02B1 |
| 0000164240 | 0C38 | 02B2 | 0C42 | 02B3 | 0C45 | 02B4 | 0C4F | 02B5 |
| 0000164260 | 0C5A | 02B8 | 0C60 | 02BC | 0C63 | 02BF | 0C66 | 02C0 |
| 0000164300 | 0C76 | 02C1 | 0C7D | 02C2 | 0C84 | 02C8 | 0C87 | 02CF |
| 0000164320 | 0C8A | 02D0 | 0C94 | 02D2 | 0C9F | 02D3 | 0CB4 | 02D5 |
| 0000164340 | 0CC9 | 02D6 | 0CD1 | 02D7 | 0CDA | 02D9 | 0CE0 | 02DF |
| 0000164360 | 0CE3 | 02E1 | 0CFB | 02E3 | 0D14 | 02E4 | 0D36 | 02E5 |
| 0000164400 | 0D3D | 02E6 | 0D44 | 02ED | 0D47 | 02EF | 0D5F | 02F1 |
| 0000164420 | 0D78 | 02F3 | 0D9A | 02F4 | 0DA1 | 02F6 | 0DA8 | 02FC |
| 0000164440 | 0DB5 | 02FE | 0E03 | 0300 | 0E0C | 0301 | 0E16 | 0302 |
| 0000164460 | 0E20 | 0303 | 0E23 | 0304 | 0E2D | 0305 | 0E38 | 0307 |
| 0000164500 | 0E3E | 030C | 0E41 | 0314 | 0E44 | 0315 | 0E63 | 0316 |
| 0000164520 | 0E6A | 0317 | 0E71 | 031A | 0E74 | 031D | 0E77 | 031E |
| 0000164540 | 0E87 | 031F | 0E8E | 0320 | 0E95 | 0323 | 0E98 | 0324 |
| 0000164560 | 0EA8 | 0325 | 0EAF | 0326 | 0EB6 | 0329 | 0EB9 | 0330 |
| 0000164600 | 0EBC | 0332 | 0ECC | 0334 | 0EE8 | 0335 | 0F1B | 0336 |
| 0000164620 | 0F22 | 0337 | 0F29 | 033B | 0F2C | 033C | 0F3C | 033D |
| 0000164640 | 0F43 | 033E | 0F4A | 0342 | 0F4D | 0344 | 0F6A | 0346 |
| 0000164660 | 0F8C | 0347 | 0FA5 | 0348 | 0FAC | 0349 | 0FB3 | 034C |
| 0000164700 | 0FB6 | 0350 | 0FB9 | 0352 | 0FD6 | 0354 | 0FF8 | 0355 |
| 0000164720 | 1011 | 0356 | 1018 | 0357 | 101F | 035A | 1022 | 035B |
| 0000164740 | 1041 | 035C | 1048 | 035D | 104F | 0364 | 1052 | 0365 |
| 0000164760 | 1071 | 0366 | 1078 | 0367 | 107F | 036B | 1082 | 036C |
| 0000165000 | 108C | 036D | 109A | 036E | 10A0 | 036F | 10A3 | 0370 |
| 0000165020 | 1147 | 0371 | 114D | 037D | 1158 | 0380 | 1168 | 0381 |

THU MAR 14 17:27:50 1991 CRV_STI.DLL PAGE 52, LINE 3010

| | | | | | | | | |
|---|---|---|---|---|---|---|---|---|
| 0000165040 | 1170 | 0384 | 117E | 0385 | 1187 | 0386 | 1191 | 0388 |
| 0000165060 | 119B | 038A | 11AC | 038C | 11BD | 038D | 11CE | 038E |
| 0000165100 | 11D8 | 038F | 11E2 | 0390 | 11E9 | 0391 | 11F0 | 0394 |
| 0000165120 | 11F3 | 0395 | 11FC | 0396 | 1209 | 0398 | 1216 | 039A |
| 0000165140 | 1236 | 039B | 124F | 039C | 1256 | 03A2 | 125D | 03A4 |
| 0000165160 | 1291 | 03A5 | 129A | 03A6 | 12A0 | 03A9 | 12A3 | 03AA |
| 0000165200 | 12AC | 03AB | 12B6 | 03AD | 12C0 | 03AF | 12D1 | 03B1 |
| 0000165220 | 12E2 | 03B2 | 12F3 | 03B3 | 12FD | 03B4 | 1307 | 03B5 |
| 0000165240 | 130E | 03B7 | 1315 | 03B9 | 1334 | 03BA | 1353 | 03BD |
| 0000165260 | 1356 | 03BE | 135F | 03BF | 1369 | 03C1 | 1373 | 03C2 |
| 0000165300 | 1384 | 03C5 | 138E | 03C7 | 13A0 | 03C8 | 13B2 | 03C9 |
| 0000165320 | 13BD | 03CB | 13C8 | 03CF | 13CB | 03D1 | 13DA | 03D2 |
| 0000165340 | 13E9 | 03D3 | 13F3 | 03D5 | 13FD | 03D6 | 1404 | 03D8 |
| 0000165360 | 140B | 03DA | 142A | 03DB | 1449 | 03DE | 144C | 03DF |
| 0000165400 | 1452 | 03E0 | 1458 | 03E1 | 145B | 03E2 | 1479 | 03E3 |
| 0000165420 | 147F | 03EF | 148A | 03F2 | 149A | 03F5 | 14A8 | 03F6 |
| 0000165440 | 14B0 | 03F9 | 14B3 | 03FA | 14BD | 03FD | 14C0 | 03FE |
| 0000165460 | 14CA | 0401 | 14CD | 0402 | 14D7 | 0405 | 14DA | 0406 |
| 0000165500 | 14E4 | 0409 | 14E7 | 040A | 14F1 | 040C | 14F4 | 040D |
| 0000165520 | 151A | 0410 | 1531 | 0411 | 1565 | 0412 | 156C | 0414 |
| 0000165540 | 1573 | 0416 | 1581 | 0417 | 1599 | 0418 | 15A0 | 041A |
| 0000165560 | 15A7 | 041B | 15AA | 041C | 15B6 | 0427 | 15C1 | 042C |
| 0000165600 | 15D1 | 042D | 15F2 | 042E | 15FB | 042F | 1601 | 0432 |
| 0000165620 | 160D | 0434 | 1616 | 0436 | 162C | 0438 | 1642 | 043A |
| 0000165640 | 1660 | 043B | 1676 | 043E | 1679 | 043F | 167F | 0440 |
| 0000165660 | 168C | 0441 | 1692 | 044E | 169D | 0452 | 16AD | 0453 |
| 0000165700 | 16CF | 0454 | 16D8 | 0455 | 16DE | 0456 | 16EE | 0457 |
| 0000165720 | 16F4 | 0458 | 1704 | 0459 | 1711 | 045A | 171E | 045B |
| 0000165740 | 1725 | 045C | 172D | 045D | 1733 | 0464 | 173E | 0465 |
| 0000165760 | 1754 | 0466 | 175C | 046D | 1768 | 046E | 177E | 046F |
| 0000166000 | 1786 | 0476 | 1792 | 0477 | 17AB | 0478 | 17B2 | 047F |
| 0000166020 | 17BE | 0480 | 17D4 | 0481 | 17DA | 0488 | 17E6 | 0489 |
| 0000166040 | 17FC | 048A | 1811 | 048B | 181F | 0492 | 182B | 0493 |
| 0000166060 | 1841 | 0494 | 1856 | 0495 | 1864 | 049C | 1870 | 049D |
| 0000166100 | 1886 | 049E | 1899 | 04A5 | 18A7 | 04A6 | 18BD | 04A7 |
| 0000166120 | 18D0 | 630A | 7672 | 735F | 6E65 | 2E64 | 0163 | ED00 |
| 0000166140 | 5E00 | DE00 | 5F18 | F400 | 6018 | FE00 | 6118 | 0800 |
| 0000166160 | 6219 | 0B00 | 6C19 | 1700 | 6F19 | 2700 | 7019 | 3A00 |
| 0000166200 | 7119 | 3D00 | 7219 | 5400 | 7319 | 5700 | 7419 | 5C00 |
| 0000166220 | 7519 | 6200 | 7719 | 6B00 | 7819 | 7300 | 7919 | 7E00 |
| 0000166240 | 7A19 | 8300 | 7C19 | 8600 | 7D19 | A900 | 7F19 | B200 |
| 0000166260 | 8019 | BA00 | 8119 | C500 | 8219 | CA00 | 8419 | CD00 |
| 0000166300 | 8519 | E000 | 8719 | E900 | 8819 | F100 | 8919 | FC00 |
| 0000166320 | 8A19 | 0100 | 8C1A | 0400 | 8D1A | 1D00 | 8F1A | 2600 |
| 0000166340 | 901A | 2E00 | 921A | 3900 | 941A | 3C00 | 951A | 4400 |
| 0000166360 | 971A | 4F00 | 981A | 5400 | 991A | 5700 | A31A | 6200 |
| 0000166400 | A71A | 7200 | A81A | 7A00 | AA1A | 8000 | AB1A | 9D00 |
| 0000166420 | AC1A | A600 | AF1A | AC00 | B11A | F200 | B21A | FC00 |
| 0000166440 | B31A | 1500 | B61B | 1E00 | B71B | 2400 | C11B | 2F00 |
| 0000166460 | C51B | 3F00 | C71B | 4500 | C81B | 5F00 | C91B | 6500 |
| 0000166500 | DA1B | 7000 | DE1B | 8600 | DF1B | 9000 | E01B | 9500 |
| 0000166520 | E11B | 9F00 | E21B | A500 | E31B | AF00 | E41B | B500 |
| 0000166540 | E51B | BB00 | E71B | C000 | E81B | CA00 | EA1B | D400 |
| 0000166560 | EB1B | DC00 | EC1B | E500 | ED1B | F400 | EE1B | FA00 |
| 0000166600 | FF1B | 0800 | 021C | 1E01 | 051C | 2901 | 071C | 3101 |
| 0000166620 | 081C | 4001 | 091C | 4B01 | 0A1C | 5601 | 0B1C | 5B01 |
| 0000166640 | 0D1C | 6001 | 0E1C | 6801 | 101C | 7101 | 111C | 8001 |
| 0000166660 | 151C | 8601 | 161C | 9001 | 171C | 9601 | 1A1C | 9B01 |
| 0000166700 | 1B1C | A301 | 1D1C | AC01 | 1E1C | BB01 | 241C | C101 |

THU MAR 14 17:27:50 1991 CRV_STI.DLL PAGE 53, LINE 3069

| | | | | | | | | |
|---|---|---|---|---|---|---|---|---|
| 0000166720 | 251C | D001 | 271C | DD01 | 291C | E501 | 2B1C | F401 |
| 0000166740 | 2C1C | 0301 | 2D1D | 0D01 | 2E1D | 1701 | 2F1D | 1C01 |
| 0000166760 | 311D | 2101 | 331D | 2401 | 351D | 2C01 | 371D | 3B01 |
| 0000167000 | 381D | 4A01 | 391D | 5501 | 3A1D | 6001 | 3B1D | 6501 |
| 0000167020 | 3D1D | 6A01 | 3E1D | 7D01 | 3F1D | A201 | 401D | B501 |
| 0000167040 | 411D | BB01 | 521D | C901 | 541D | DF01 | 561D | E701 |
| 0000167060 | 571D | 0401 | 581E | 1B01 | 591E | 2001 | 5A1E | 2501 |
| 0000167100 | 5B1E | 2801 | 6C1E | 3601 | 6F1E | 4C01 | 711E | 5401 |
| 0000167120 | 721E | 6301 | 731E | 7201 | 741E | 8101 | 751E | 8601 |
| 0000167140 | 771E | 8B01 | 781E | 8E01 | 8A1E | 9C01 | 8D1E | B201 |
| 0000167160 | 8E1E | BA01 | 8F1E | C001 | A11E | CC01 | A61E | E201 |
| 0000167200 | A71E | E601 | A81E | EE01 | A91E | F301 | AA1E | 0401 |
| 0000167220 | AB1F | 1501 | AC1F | 2D01 | AE1F | 3E01 | AF1F | 5C01 |
| 0000167240 | B01F | 6501 | B11F | 6B01 | B21F | 7101 | B51F | 7D01 |
| 0000167260 | B61F | C401 | B71F | CE01 | B81F | E701 | BB1F | F001 |
| 0000167300 | BC1F | F601 | CD1F | 0401 | D220 | 1A01 | DA20 | 2401 |
| 0000167320 | DB20 | 2E01 | DC20 | 3F01 | DD20 | 5001 | DE20 | 9701 |
| 0000167340 | E220 | 9A01 | E320 | A401 | E420 | B501 | E520 | C601 |
| 0000167360 | E620 | 0D01 | E921 | 1001 | EA21 | 1301 | EC21 | 2D01 |
| 0000167400 | ED21 | 3C01 | EE21 | 5501 | F121 | 5E01 | F221 | 6401 |
| 0000167420 | 0221 | 7202 | 0621 | 8802 | 0821 | 9502 | 0921 | 9F02 |
| 0000167440 | 0A21 | B002 | 0B21 | C102 | 0C21 | 0802 | 0D22 | 1202 |
| 0000167460 | 0E22 | 2B02 | 1122 | 3402 | 1322 | 3A02 | 1422 | 4002 |
| 0000167500 | 2522 | 4E02 | 2822 | 6402 | 2A22 | B102 | 2B22 | BB02 |
| 0000167520 | 2C22 | D402 | 2D22 | DD02 | 2E22 | E302 | 2F22 | E902 |
| 0000167540 | 4122 | F702 | 4522 | 0D02 | 4623 | 2D02 | 4723 | 3802 |
| 0000167560 | 4923 | 3E02 | 4A23 | 4702 | 4B23 | 9702 | 4C23 | A002 |
| 0000167600 | 4E23 | B702 | 5023 | C502 | 5123 | CE02 | 5223 | D402 |
| 0000167620 | 5323 | DA02 | 6523 | E802 | 6923 | FE02 | 6A23 | 0E02 |
| 0000167640 | 6B24 | 1902 | 6D24 | 1F02 | 6E24 | 2802 | 6F24 | 3102 |
| 0000167660 | 7024 | 3B02 | 7124 | 4402 | 7324 | 5B02 | 7524 | 6902 |
| 0000167700 | 7624 | 7202 | 7724 | 7802 | 7824 | 7E02 | 9C24 | 8C02 |
| 0000167720 | 9D24 | A202 | A024 | 3502 | A125 | 3A02 | A325 | 3F02 |
| 0000167740 | A425 | 9602 | A625 | 0502 | AA26 | 7402 | AB26 | 9102 |
| 0000167760 | AC26 | 9C02 | B126 | 1902 | B227 | 2202 | B327 | 2C02 |
| 0000170000 | B427 | 3502 | B627 | 3F02 | B727 | 5802 | B927 | 6602 |
| 0000170020 | BB27 | E402 | 0A27 | 7263 | 5F76 | 6572 | 7073 | 632E |
| 0000170040 | 0001 | 00A2 | 004E | 27F2 | 004F | 2808 | 0050 | 2825 |
| 0000170060 | 0051 | 282B | 0052 | 2835 | 0054 | 283F | 0055 | 285C |
| 0000170100 | 0056 | 2862 | 0057 | 286C | 0059 | 2876 | 005A | 2893 |
| 0000170120 | 005B | 2899 | 005C | 28A3 | 005D | 28AD | 005E | 28B3 |
| 0000170140 | 006F | 28BF | 0070 | 28D5 | 0071 | 28E5 | 0072 | 28F5 |
| 0000170160 | 0073 | 2905 | 0084 | 2911 | 0085 | 2927 | 0088 | 2932 |
| 0000170200 | 0089 | 293C | 008C | 293F | 008D | 2949 | 0090 | 294C |
| 0000170220 | 0091 | 2956 | 0095 | 2959 | 0096 | 2963 | 0099 | 2966 |
| 0000170240 | 009A | 2976 | 009B | 2979 | 009C | 29A4 | 009D | 29BC |
| 0000170260 | 00AE | 29CA | 00AF | 29DA | 00B0 | 29E4 | 00B1 | 29FC |
| 0000170300 | 00C2 | 2A07 | 00C3 | 2A17 | 00C4 | 2A21 | 00C5 | 2A39 |
| 0000170320 | 00D6 | 2A44 | 00D7 | 2A54 | 00D8 | 2A5E | 00D9 | 2A76 |
| 0000170340 | 00EB | 2A81 | 00EC | 2A97 | 00ED | 2AA5 | 00EE | 2AAF |
| 0000170360 | 00EF | 2AB2 | 00F1 | 2ABC | 00F3 | 2AD3 | 00F4 | 2AEB |
| 0000170400 | 0106 | 2AF9 | 0107 | 2B0F | 0108 | 2B1D | 0109 | 2B27 |
| 0000170420 | 010A | 2B2A | 010C | 2B34 | 010D | 2B48 | 010F | 2B5C |
| 0000170440 | 0110 | 2B74 | 0122 | 2B82 | 0123 | 2B98 | 0126 | 2BA3 |
| 0000170460 | 0127 | 2BAD | 012A | 2BB0 | 012B | 2BBA | 012E | 2BBD |
| 0000170500 | 012F | 2BC7 | 0132 | 2BCA | 0133 | 2BD4 | 0136 | 2BD7 |
| 0000170520 | 0137 | 2BE7 | 0138 | 2BEA | 0139 | 2C0C | 013B | 2C23 |
| 0000170540 | 013C | 2C3B | 014E | 2C49 | 014F | 2C5F | 0152 | 2C6A |
| 0000170560 | 0153 | 2C74 | 0156 | 2C77 | 0157 | 2C81 | 015A | 2C84 |

THU MAR 14 17:27:50 1991 CRV_STI.DLL PAGE 54, LINE 3128

| | | | | | | | | |
|---|---|---|---|---|---|---|---|---|
| 0000170600 | 015B | 2C8E | 015E | 2C91 | 015F | 2C9B | 0162 | 2C9E |
| 0000170620 | 0163 | 2CA8 | 0166 | 2CAB | 0167 | 2CB5 | 016A | 2CB8 |
| 0000170640 | 016B | 2CC2 | 016E | 2CC5 | 016F | 2CD5 | 0170 | 2CD8 |
| 0000170660 | 0173 | 2D1A | 0175 | 2D31 | 0176 | 2D49 | 0188 | 2D57 |
| 0000170700 | 0189 | 2D6D | 018B | 2D77 | 018C | 2D81 | 018D | 2D94 |
| 0000170720 | 018E | 2D9A | 0190 | 2DA2 | 0192 | 2DBA | 0194 | 2DBD |
| 0000170740 | 0195 | 2DCB | 0196 | 2DD5 | 0197 | 2DD8 | 0199 | 2DE2 |
| 0000170760 | 019B | 2DFA | 01AD | 2E08 | 01B1 | 2E1E | 01B2 | 2E2C |
| 0000171000 | 01B4 | 2E3A | 01B5 | 2E50 | 01B7 | 2E59 | 01B8 | 2E6B |
| 0000171020 | 01BA | 2E75 | 01BB | 2E78 | 01BD | 2E82 | 01BE | 2E93 |
| 0000171040 | 01BF | 2E9D | 01C0 | 2EA0 | 01C2 | 2EAA | 01C3 | 2EC2 |
| 0000171060 | 01D7 | 2ED0 | 01DB | 2EE6 | 01DD | 2EF4 | 01DE | 2F0A |
| 0000171100 | 01E0 | 2F13 | 01E1 | 2F19 | 01E3 | 2F26 | 01E5 | 2F29 |
| 0000171120 | 01E6 | 2F38 | 01E9 | 2F3E | 01EA | 2F49 | 01F5 | 2F57 |
| 0000171140 | 01FA | 2F67 | 01FB | 2F73 | 01FE | 2F7D | 01FF | 2F81 |
| 0000171160 | 0200 | 2F86 | 0201 | 2F97 | 0203 | 2FA8 | 0204 | 2FC0 |
| 0000171200 | 0205 | 2FD1 | 0206 | 2FDA | 0209 | 2FDD | 020A | 2FE3 |
| 0000171220 | 020B | 2FF1 | 020D | 2FFD | 020E | 301C | 020F | 3025 |
| 0000171240 | 0211 | 302B | 0212 | 303F | 0213 | 3045 | 0C00 | 6C6C |
| 0000171260 | 6269 | 6463 | 6C6C | 6C2E | 6269 | 6F07 | 3273 | 6C2E |
| 0000171300 | 6269 | 6C0A | 6962 | 6D70 | 2E74 | 696C | 0962 | 6264 |
| 0000171320 | 705F | 2E69 | 696C | 0662 | 6869 | 6C2E | 6269 | 0058 |
| 0000171340 | 0101 | 0001 | 0008 | 0000 | 0020 | 0102 | 0001 | 03CD |
| 0000171360 | 0000 | 0192 | 0103 | 0001 | 0FC0 | 0000 | 2421 | 0104 |
| 0000171400 | 0001 | 7AA8 | 0000 | 0893 | 0109 | 0001 | 8CDC | 0000 |
| 0000171420 | 0747 | 0101 | 0002 | 0028 | 0000 | 0020 | 0102 | 0002 |
| 0000171440 | 055F | 0000 | 0157 | 0103 | 0002 | 33E1 | 0000 | 2452 |
| 0000171460 | 0104 | 0002 | 833B | 0000 | 05FD | 0109 | 0002 | 9423 |
| 0000171500 | 0000 | 03C3 | 0101 | 0003 | 0048 | 0000 | 0020 | 0102 |
| 0000171520 | 0003 | 06B6 | 0000 | 0154 | 0103 | 0003 | 5833 | 0000 |
| 0000171540 | 2275 | 0104 | 0003 | 8938 | 0000 | 03A4 | 0109 | 0003 |
| 0000171560 | 97E6 | 0000 | 0297 | 0101 | 0004 | 0068 | 0000 | 0018 |
| 0000171600 | 0102 | 0004 | 080A | 0000 | 0152 | 0101 | 0005 | 0080 |
| 0000171620 | 0000 | 001B | 0102 | 0005 | 095C | 0000 | 01D2 | 0101 |
| 0000171640 | 0006 | 009B | 0000 | 001C | 0102 | 0006 | 0B2E | 0000 |
| 0000171660 | 0035 | 0101 | 0007 | 00B7 | 0000 | 0017 | 0102 | 0007 |
| 0000171700 | 0B63 | 0000 | 000F | 0101 | 0008 | 00CE | 0000 | 0017 |
| 0000171720 | 0102 | 0008 | 0B72 | 0000 | 0033 | 0101 | 0009 | 00E5 |
| 0000171740 | 0000 | 001A | 0102 | 0009 | 0BA5 | 0000 | 0010 | 0101 |
| 0000171760 | 000A | 00FF | 0000 | 001C | 0102 | 000A | 0BB5 | 0000 |
| 0000172000 | 0025 | 0101 | 000B | 011B | 0000 | 001B | 0102 | 000B |
| 0000172020 | 0BDA | 0000 | 003F | 0101 | 000C | 0136 | 0000 | 0015 |
| 0000172040 | 0102 | 000C | 0C19 | 0000 | 000E | 0101 | 000D | 014B |
| 0000172060 | 0000 | 0018 | 0102 | 000D | 0C27 | 0000 | 000F | 0101 |
| 0000172100 | 000E | 0163 | 0000 | 0014 | 0102 | 000E | 0C36 | 000D |
| 0000172120 | 0037 | 0101 | 000F | 0177 | 0000 | 0018 | 0102 | 000F |
| 0000172140 | 0C6D | 0000 | 000F | 0101 | 0010 | 018F | 0000 | 0018 |
| 0000172160 | 0102 | 0010 | 0C7C | 0000 | 000F | 0101 | 0011 | 01A7 |
| 0000172200 | 0000 | 0018 | 0102 | 0011 | 0C8B | 0000 | 001C | 0101 |
| 0000172220 | 0012 | 01BF | 0000 | 0015 | 0102 | 0012 | 0CA7 | 0000 |
| 0000172240 | 0030 | 0101 | 0013 | 01D4 | 0000 | 0017 | 0102 | 0013 |
| 0000172260 | 0CD7 | 0000 | 000F | 0101 | 0014 | 01EB | 0000 | 001A |
| 0000172300 | 0102 | 0014 | 0CE6 | 0000 | 001E | 0101 | 0015 | 0205 |
| 0000172320 | 0000 | 0016 | 0102 | 0015 | 0D04 | 0000 | 001E | 0101 |
| 0000172340 | 0016 | 021B | 0000 | 0017 | 0102 | 0016 | 0D22 | 0000 |
| 0000172360 | 001F | 0101 | 0017 | 0232 | 0000 | 0015 | 0102 | 0017 |
| 0000172400 | 0D41 | 0000 | 001B | 0101 | 0018 | 0247 | 0000 | 0018 |
| 0000172420 | 0102 | 0018 | 0D5C | 0000 | 0042 | 0101 | 0019 | 025F |
| 0000172440 | 0000 | 0016 | 0102 | 0019 | 0D9E | 0000 | 000E | 0101 |

THU MAR 14 17:27:50 1991 CRV_STI.DLL PAGE 55, LINE 3187

| | | | | | | | | |
|---|---|---|---|---|---|---|---|---|
| 0000172460 | 001A | 0275 | 0000 | 0018 | 0102 | 001A | 0DAC | 0000 |
| 0000172500 | 0010 | 0101 | 001B | 028D | 0000 | 0018 | 0102 | 001B |
| 0000172520 | 0DBC | 0000 | 0010 | 0101 | 001C | 02A5 | 0000 | 0019 |
| 0000172540 | 0102 | 001C | 0DCC | 0000 | 0012 | 0101 | 001D | 02BE |
| 0000172560 | 0000 | 0018 | 0102 | 001D | 0DDE | 0000 | 0041 | 0101 |
| 0000172600 | 001E | 02D6 | 0000 | 0017 | 0102 | 001E | 0E1F | 0000 |
| 0000172620 | 000F | 0101 | 001F | 02ED | 0000 | 0017 | 0102 | 001F |
| 0000172640 | 0E2E | 0000 | 000E | 0101 | 0020 | 0304 | 0000 | 0017 |
| 0000172660 | 0102 | 0020 | 0E3C | 0000 | 000E | 0101 | 0021 | 031B |
| 0000172700 | 0000 | 0018 | 0102 | 0021 | 0E4A | 0000 | 000F | 0101 |
| 0000172720 | 0022 | 0333 | 0000 | 0019 | 0102 | 0022 | 0E59 | 0000 |
| 0000172740 | 0056 | 0101 | 0024 | 034C | 0000 | 001A | 0102 | 0024 |
| 0000172760 | 0EAF | 0000 | 00AB | 0101 | 0025 | 0366 | 0000 | 001B |
| 0000173000 | 0102 | 0025 | 0F5A | 0000 | 0026 | 0101 | 0026 | 0381 |
| 0000173020 | 0000 | 001D | 0102 | 0026 | 0F80 | 0000 | 0024 | 0101 |
| 0000173040 | 0027 | 039E | 0000 | 0017 | 0102 | 0027 | 0FA4 | 0000 |
| 0000173060 | 000E | 0101 | 0028 | 03B5 | 0000 | 0018 | 0102 | 0028 |
| 0000173100 | 0FB2 | 0000 | 000E | 0106 | 0000 | 9A7D | 0000 | 0032 |
| 0000173120 | 424E | 3230 | 9E29 | 0000 | | | | |
| 0000173130 | | | | | | | | |

```
THU MAR 14 17:28:26 1991  CRVN.EXE  PAGE 1, LINE 1

0000000000  5A4D  01DA  0030  0000  0004  0000  FFFF  0000
0000000020  00B6  0000  0000  0000  0040  0000  0000  0000
0000000040  0000  0000  0000  0000  0000  0000  0000  0000
0000000060  0000  0000  0000  0000  0000  0000  0080  0000
0000000100  1F0E  0EBA  B400  CD09  B821  4C01  21CD  6854
0000000120  7369  7020  6F72  7267  6D61  6320  6E61  6F6E
0000000140  2074  7572  206E  6E69  4420  534F  6D20  646F
0000000160  2E65  0D0D  240A  0000  0000  0000  0000  0000
0000000200  454E  0A05  0128  0002  B05E  EB75  020A  0005
0000000220  4000  6000  0010  0001  0000  0005  0005  0006
0000000240  0028  0040  0068  0068  006F  007B  01AA  0000
0000000260  0000  0004  0000  0001  0000  0000  0000  0000
0000000300  001E  4BC1  0D00  4BC2  0522  00C6  0C01  0100
0000000320  0000  0000  0C01  0850  0000  0000  0C01  0222
0000000340  052F  0CC0  0D01  0FB0  4303  5652  0000  0100
0000000360  0A00  1000  1800  2000  2800  0000  4408  534F
0000000400  4143  4C4C  0553  4244  505F  0749  7263  5F76
0000000420  7069  0773  7263  5F76  6E6F  0773  7263  5F76
0000000440  7473  0669  626C  7069  746D  5F0D  5842  445F
0000000460  4245  4755  4F4D  4544  5F0D  5842  545F  4D49
0000000500  5345  4F4D  4544  5F09  5842  425F  535F  4749
0000000520  5F0E  5842  445F  4245  4755  4E45  4554  0F52
0000000540  425F  5F58  4544  5542  5247  5445  5255  0E4E
0000000560  425F  5F58  4F56  4449  4552  5554  4E52  5F0E
0000000600  5842  445F  4245  4755  5250  4E49  0B54  425F
0000000620  5F58  5250  434F  5345  0E53  425F  5F58  4150
0000000640  4B43  4946  544C  5245  0000  5424  5345  3154
0000000660  3332  4320  5652  4D20  646F  6C75  2065  4328
0000000700  2029  654D  6372  7275  2C79  3120  3939  0030
0000000720  0000  0000  0000  0000  0000  0000  0000  0000
*
0000000760  A3FC  0044  1E89  0042  8949  4E0E  BB00  0050
0000001000  1F8C  E483  89FE  0467  FEB8  50FF  6789  F70A
0000001020  50D0  6789  8906  0867  2689  0046  681E  0048
0000001040  681E  004C  FF9A  00FF  8E00  4806  2600  15A1
0000001060  A300  0086  46E8  9A00  02ED  FFFF  689A  5A04
0000001100  9A00  00EA  005F  36FF  0294  36FF  0292  36FF
0000001120  0290  36FF  028E  36FF  028C  679A  6432  5000
0000001140  E80E  00FE  FFB8  8EFF  B8D8  0003  0E50  03E8
0000001160  0E02  A7E8  B804  00FF  0E50  ECE8  BB00  000D
0000001200  FF33  068E  0044  FFB9  267F  3D80  7500  4701
0000001220  8026  003D  3174  64BE  8B00  8BD1  F3CB  8BA6
0000001240  74CA  3308  F2C0  74AE  EBE7  061C  071E  F78B
0000001260  BF1F  008C  2CAC  7241  C00E  04E0  AC92  412C
0000001300  0572  C20A  EBAA  16ED  C31F  286A  FF9A  00FF
0000001320  BB00  0002  8B52  80D4  8CA7  B700  8B50  53C4
0000001340  5016  5216  FF9A  00FF  0B00  58C0  1075  40B1
0000001360  013C  0674  023C  0675  08B1  8F08  008C  794B
0000001400  5AD6  C033  5050  DC8B  BA50  0084  520E  5316
0000001420  FF9A  00FF  5800  E858  0013  44BE  BF0B  0B44
0000001440  3DE8  BE01  0B44  48BF  E80B  0134  8BCB  3A0E
0000001460  E30B  8B2E  4436  C400  3C06  8C0B  33C2  FFDB
0000001500  381E  730B  E903  014E  068E  004C  8B26  061E
0000001520  4B00  0D75  06C4  0B40  C28C  03BB  FF00  381E
0000001540  C30B  8B55  33EC  EBC9  551A  EC8B  01B9  EB00
0000001560  5512  EC8B  5756  00B9  EB01  5508  EC8B  5756
0000001600  01B9  E801  005F  0A51  75C9  BE12  0FB0  B0BF
0000001620  E80F  00CC  48BE  BF0B  0B4C  C3E8  BE00  0B4C
0000001640  4CBF  E80B  00BA  4CBE  BF0B  0B4C  B1E8  9A00
```

THU MAR 14 17:28:26 1991 CRVN.EXE PAGE 2, LINE 60

| | | | | | | | | |
|---|---|---|---|---|---|---|---|---|
| 0000001660 | 02BC | 007D | C00B | 1174 | 0A58 | 50E4 | 0B75 | 7E83 |
| 0000001700 | 0006 | 0575 | 46C7 | FF06 | E800 | 0086 | 0A58 | 75E4 |
| 0000001720 | B80D | 0001 | 8A50 | 0646 | 9A50 | FFFF | 0000 | 4EE8 |
| 0000001740 | 5F00 | 5D5E | 55CB | EC8B | 0D6A | 8BE8 | 8306 | 02C4 |
| 0000001760 | 068E | 004C | 8B26 | 061E | 4B00 | 168B | 029C | FA83 |
| 0000002000 | 75FF | 8904 | 9C1E | 3902 | 9C1E | 9F02 | 0D6A | 8DE8 |
| 0000002020 | 8306 | 02C4 | 749E | 6A0A | E80E | 063C | C483 | EB02 |
| 0000002040 | 3BC7 | 74D3 | 6A08 | E80E | 064E | C483 | 5D02 | 55C3 |
| 0000002060 | EC8B | 0D6A | 41E8 | 8306 | 02C4 | 06C7 | 029C | FFFF |
| 0000002100 | 0D6A | 59E8 | 8306 | 02C4 | 0E6A | 51E8 | 8306 | 02C4 |
| 0000002120 | C35D | 0E8B | 0B3A | 07E3 | 02BB | FF00 | 381E | C30B |
| 0000002140 | F73B | 0E73 | EF83 | 8B04 | 0B05 | 0245 | F274 | 1DFF |
| 0000002160 | EEEB | 00C3 | 8B55 | B8EC | 00FC | 0E50 | 9DE8 | 8302 |
| 0000002200 | A03E | 0002 | 0474 | 1EFF | 029E | FFB8 | 5000 | E80E |
| 0000002220 | 028A | E58B | CB5D | 02B8 | E900 | FDD0 | 3356 | B9F6 |
| 0000002240 | 0042 | E432 | ACFC | E032 | FBE2 | F480 | 7455 | 0E0F |
| 0000002260 | C1E8 | B8FF | 0001 | 0E50 | 61E8 | B802 | 0001 | CB5E |
| 0000002300 | 068F | 02A4 | 068F | 02A6 | 42A1 | 8E00 | 441E | 8B00 |
| 0000002320 | 4EF0 | 0674 | 7C80 | 00FF | F775 | 8936 | 9636 | 3602 |
| 0000002340 | 1E8C | 0298 | F696 | FF04 | 0175 | 3696 | 3689 | 02A2 |
| 0000002360 | D233 | 01BF | AC00 | 0A42 | 75C0 | ACFA | 203C | FB74 |
| 0000002400 | 093C | F774 | C00A | 6374 | 4E47 | 3CAC | 7420 | 3CEC |
| 0000002420 | 7409 | 0AE8 | 74C0 | 3C54 | 7422 | 3C24 | 745C | 4203 |
| 0000002440 | E8EB | C933 | AC41 | 5C3C | FA74 | 223C | 0474 | D103 |
| 0000002460 | D7EB | C18B | E9D1 | D113 | 01A8 | CE75 | 01EB | AC4E |
| 0000002500 | C00A | 2774 | 223C | C274 | 5C3C | 0374 | EB42 | 33F0 |
| 0000002520 | 41C9 | 3CAC | 745C | 3CFA | 7422 | 0304 | EBD1 | 8BDF |
| 0000002540 | D1C1 | 13E9 | A8D1 | 7501 | EBD6 | 169F | 891F | 8C3E |
| 0000002560 | 0302 | 47D7 | E7D1 | E7D1 | C78B | C203 | 2440 | E8FE |
| 0000002600 | 01D0 | 0673 | 08B8 | E900 | FCE2 | 8EA3 | 8902 | 9016 |
| 0000002620 | 8B02 | 03D8 | 8EF8 | 26C2 | 3F89 | 8C26 | 0247 | C383 |
| 0000002640 | 8B04 | A236 | 8E02 | 441E | AC00 | 0AAA | 75C0 | EBFA |
| 0000002660 | 3303 | AAC0 | 3CAC | 7420 | 3CFB | 7409 | 0AF7 | 74C0 |
| 0000002700 | 2675 | 3F89 | 8C26 | 0247 | C383 | 4E04 | 3CAC | 7420 |
| 0000002720 | 3CE0 | 7409 | 0ADC | 74C0 | 3C5A | 7422 | 3C27 | 745C |
| 0000002740 | AA03 | E8EB | C933 | AC41 | 5C3C | FA74 | 223C | 0674 |
| 0000002760 | 5CB0 | AAF3 | D5EB | 5CB0 | E9D1 | AAF3 | 0673 | 22B0 |
| 0000003000 | EBAA | 4EC9 | 0AAC | 74C0 | 3C2A | 7422 | 3CBF | 745C |
| 0000003020 | AA03 | F0EB | C933 | AC41 | 5C3C | FA74 | 223C | 0674 |
| 0000003040 | 5CB0 | AAF3 | DDEB | 5CB0 | E9D1 | AAF3 | 9E73 | 22B0 |
| 0000003060 | EBAA | 33D1 | AAC0 | C726 | 0007 | 2600 | 47C7 | 0002 |
| 0000003100 | 1600 | FF1F | A42E | 0002 | 8B55 | 83EC | 08EC | 8E1E |
| 0000003120 | 4406 | 8C00 | FC46 | 5E8C | 33FE | 33C0 | 33F6 | B9FF |
| 0000003140 | FFFF | 3A26 | 7405 | F206 | 46AE | 75AE | 8BFA | 40C7 |
| 0000003160 | FE24 | 8B46 | D1FE | D1E6 | E8E6 | 00D6 | 1772 | 5689 |
| 0000003200 | 50F8 | C68B | CBE8 | 7200 | A30C | 0292 | 1689 | 0294 |
| 0000003220 | 5689 | EBFA | B806 | 0009 | D1E9 | 8BFB | 8BCF | 33D8 |
| 0000003240 | 5FF6 | 1E06 | 1F07 | E349 | 8B35 | 8E04 | FE46 | 3B26 |
| 0000003260 | 6406 | 7500 | 510E | 5756 | 64BF | B900 | 0006 | A7F3 |
| 0000003300 | 5E5F | 8E59 | F846 | 0B74 | 5E8E | 89FA | 8C3F | 0247 |
| 0000003320 | C383 | 8E04 | FC5E | AAAC | C00A | FA75 | CBE2 | 5E8E |
| 0000003340 | 89FA | 890F | 024F | 8B1F | 5DE5 | 00CB | 8B55 | 56EC |
| 0000003360 | B857 | 0085 | D88E | C08E | 568B | BE06 | 0B5E | 3BAD |
| 0000003400 | 74C2 | 4010 | 7496 | 970C | C033 | FFB9 | F2FF | 8BAE |
| 0000003420 | EBF7 | 96EB | 5E5F | E58B | CA5D | 0002 | 8B55 | 57EC |
| 0000003440 | 76FF | 0E06 | C5E8 | 0BFF | 74C0 | 921F | FA8B | C033 |
| 0000003460 | FFB9 | F2FF | F7AE | 49D1 | 8B50 | BBC4 | 0002 | 1E53 |
| 0000003500 | 5152 | 5016 | FF9A | 00FF | 5B00 | 8B5F | 5DE5 | 02CA |
| 0000003520 | 0000 | 8B55 | 06EC | 00B9 | 8704 | B60E | 5102 | 9A50 |

THU MAR 14 17:28:26 1991 CRVN.EXE PAGE 3, LINE 119

| | | | | | | | | |
|---|---|---|---|---|---|---|---|---|
| 0000003540 | 0594 | 01D2 | 8F5B | B606 | 8B02 | 0BCA | 75C8 | F901 |
| 0000003560 | 5D07 | 00C3 | B1EA | 8205 | EA05 | 05D0 | 0597 | 8B55 |
| 0000003600 | 56EC | 76C4 | 8C06 | E3C1 | 2605 | 4C80 | 01FE | 5D5E |
| 0000003620 | 55CB | EC8B | 096A | DFE8 | 8302 | 02C4 | 76FF | 0E06 |
| 0000003640 | 0DE8 | 5B00 | 096A | F5E8 | 8302 | 02C4 | E58B | CB5D |
| 0000003660 | 8B55 | 56EC | 8B57 | 064E | F983 | 77E8 | 1E69 | AAA1 |
| 0000003700 | 0B02 | 74C0 | BF48 | 06B8 | 368B | 02B2 | 1EC5 | 02AC |
| 0000003720 | 561E | FF57 | 5FD7 | 735E | 8C2B | C5DA | 0C5F | D63B |
| 0000003740 | EF75 | 1F58 | C41E | AC36 | 2602 | 748B | C512 | A81E |
| 0000003760 | 8C02 | 3BDA | 75D0 | 1FD9 | 811E | 34FF | 7407 | BF0E |
| 0000004000 | 0734 | C4EB | 815E | B8FF | 7406 | EB0F | 070A | BF06 |
| 0000004020 | 02A8 | E1E8 | 7201 | E80E | 007E | 891F | AE16 | 8902 |
| 0000004040 | AC1E | EB02 | 1F04 | C033 | 5F99 | 5D5E | 00CB | 5706 |
| 0000004060 | F88B | FB03 | 7F89 | 4F04 | 2D4F | 0016 | 778D | C714 |
| 0000004100 | FE05 | 89FF | 0A7F | 8948 | 8C04 | 8B1F | 8CC6 | 8EDA |
| 0000004120 | 8DC2 | 067F | ABFC | 47AB | 3347 | ABC0 | ABAB | 5FAB |
| 0000004140 | C307 | 8B26 | 0245 | C00B | 0975 | 8C26 | 025D | 8926 |
| 0000004160 | EB1D | 0614 | C426 | 0875 | 8C26 | 0E5C | 8926 | 0C5C |
| 0000004200 | 478C | 8912 | 1077 | 2607 | 5D8C | 260A | 5D89 | 2608 |
| 0000004220 | 5D8C | 2606 | 5D89 | C304 | 8041 | FEE1 | FC53 | 778B |
| 0000004240 | 8B08 | 0A5F | FF33 | 23EB | C38B | A85B | 7501 | 5342 |
| 0000004260 | 778B | 8B06 | 085F | DE3B | 3674 | 334B | EBFF | 900C |
| 0000004300 | 548D | 3BFE | 73D3 | 03E1 | 72F0 | AD23 | 01A8 | F074 |
| 0000004320 | FE8B | 3B48 | 73C1 | 0323 | 72F0 | 8B13 | ADD0 | 01A8 |
| 0000004340 | DE74 | C203 | 0205 | 8B00 | 89F7 | FE44 | E4EB | C08B |
| 0000004360 | 8B5B | 0647 | 4789 | F908 | 19EB | 895B | FE4C | 0974 |
| 0000004400 | F903 | C12B | 8948 | 2B05 | 03F9 | 89F9 | 087F | C68B |
| 0000004420 | DA8C | C3F8 | 5751 | 47F6 | 0102 | 6674 | B7E8 | 8B00 |
| 0000004440 | 8BFE | A804 | 7401 | 2B03 | 49C8 | 4141 | 778B | 0B04 |
| 0000004460 | 74F6 | 034F | 73CE | 3309 | BAC0 | FFF0 | 33E3 | 42EB |
| 0000004500 | 12B8 | 8E05 | 26C0 | B6A1 | 3D02 | 2000 | 1674 | 00BA |
| 0000004520 | 3B80 | 72D0 | D106 | 75EA | EBF8 | 8322 | 08FA | 1D72 |
| 0000004540 | E2D1 | C28B | 8B48 | 03D0 | 73C1 | 3302 | F7C0 | 23D2 |
| 0000004560 | 52C2 | 2EE8 | 5A00 | 0D73 | FA83 | 74F0 | B805 | 0010 |
| 0000004600 | E2EB | EBF9 | 8B1B | 2BD0 | 0457 | 4789 | 8904 | 087F |
| 0000004620 | 778B | 4A0A | 1489 | 0342 | C7F2 | FE04 | 89FF | 0A77 |
| 0000004640 | 595F | 8BC3 | F6D0 | 0247 | 7404 | 4A0F | 778B | 4E04 |
| 0000004660 | D63B | 0572 | 5739 | 73FE | 4218 | 1E50 | FF9A | 00FF |
| 0000004700 | 0B00 | 75C0 | 8B0F | F6C2 | 0247 | 7404 | 4A04 | 5789 |
| 0000004720 | F8FE | 01EB | C3F9 | 8B57 | 0877 | 773B | 750A | 8B03 |
| 0000004740 | 0677 | 3DAD | FFFE | 0874 | FE8B | FE24 | F003 | F2EB |
| 0000004760 | 4F4F | F78B | C35F | D18B | C283 | 8027 | F0E2 | 8B50 |
| 0000005000 | 52C4 | 5016 | C033 | 9A50 | FFFF | 0000 | 0B1F | 75C0 |
| 0000005020 | 3314 | 26DB | 458B | 890C | 0247 | C28B | 0FE8 | E8FE |
| 0000005040 | FE40 | EBF8 | F901 | 00C3 | 8B55 | 50EC | 468B | 0504 |
| 0000005060 | 0014 | 4BEB | 8B55 | 50EC | 468B | 0504 | 0014 | 65EB |
| 0000005100 | 8B55 | 50EC | 468B | 0504 | 0114 | 33EB | 8B55 | 50EC |
| 0000005120 | 468B | 0504 | 0114 | 4DEB | 8B55 | 50EC | 468B | C104 |
| 0000005140 | 02E0 | FF68 | 50FF | FF6A | FF6A | FF9A | 00FF | 0B00 |
| 0000005160 | 75C0 | 5825 | E58B | C35D | 8B55 | 50EC | 468B | C104 |
| 0000005200 | 02E0 | 8368 | 5008 | FF6A | FF6A | FF9A | 00FF | 0B00 |
| 0000005220 | 75C0 | 5805 | E58B | C35D | 11B8 | E900 | F7CE | 8B55 |
| 0000005240 | 50EC | 468B | C104 | 02E0 | A368 | 5008 | FF9A | 00FF |
| 0000005260 | 0B00 | 75C0 | 58E3 | E58B | C35D | 8B55 | FFEC | 0676 |
| 0000005300 | B5E8 | 83FF | 02C4 | E58B | CB5D | 8B55 | FFEC | 0676 |
| 0000005320 | CBE8 | 83FF | 02C4 | E58B | CB5D | 04C8 | 0000 | 46C7 |
| 0000005340 | FFFC | C4FF | 065E | F626 | 0A47 | 7440 | 2607 | 47C6 |
| 0000005360 | 000A | 2CEB | C38B | 522D | B905 | 000C | F799 | 89F9 |
| 0000005400 | FE46 | E850 | FF22 | C483 | FF02 | 0876 | 76FF | 9A06 |

THU MAR 14 17:28:26 1991 CRVN.EXE PAGE 4, LINE 178

| | | | | | | | | |
|---|---|---|---|---|---|---|---|---|
| 0000005420 | 0946 | 0960 | C483 | 8904 | FC46 | 76FF | E8FE | FF14 |
| 0000005440 | 468B | C9FC | 90CB | 10C8 | 0000 | 5657 | FFBF | 8BFF |
| 0000005460 | 0676 | 44F6 | 830A | 0375 | 97E9 | 1E00 | 9A56 | 1064 |
| 0000005500 | 0985 | C483 | 8B04 | 8BF8 | 81DE | 52EB | 8B05 | 3687 |
| 0000005520 | 8907 | FA46 | 561E | BBE8 | 8304 | 04C4 | 448A | 2A0B |
| 0000005540 | 50E4 | BE9A | A016 | 8309 | 02C4 | C00B | 617C | 7E83 |
| 0000005560 | 00FA | 5E74 | 681E | 0544 | 468D | 16F0 | 9A50 | 0AB4 |
| 0000005600 | 09C0 | C483 | 8D08 | F246 | 4689 | 8CFC | FE56 | 7E80 |
| 0000005620 | 5CF0 | 1474 | 681E | 0546 | 468D | 16F0 | 9A50 | 16FE |
| 0000005640 | 09D9 | C483 | EB08 | 9004 | 4EFF | 6AFC | FF0A | FE76 |
| 0000005660 | 76FF | FFFC | FA76 | 989A | E617 | 8309 | 08C4 | 468D |
| 0000005700 | 16F0 | 9A50 | 1892 | 49AF | C483 | 0B04 | 74C0 | BF03 |
| 0000005720 | FFFF | 44C6 | 000A | C78B | 5F5E | CBC9 | 08C8 | 0000 |
| 0000005740 | 469A | 2A16 | 890A | FC46 | 5689 | 0BFE | 75D0 | 2B05 |
| 0000005760 | 99C0 | 37EB | 76FF | 50FE | 76FF | FF0E | 0C76 | 76FF |
| 0000006000 | FF0A | 0876 | 76FF | 9A06 | 0E6C | 0A62 | C483 | 890E |
| 0000006020 | F846 | 5689 | 8BFA | FC46 | 522D | B905 | 000C | F799 |
| 0000006040 | 50F9 | 0FE8 | 8BFE | F846 | 568B | C9FA | 90CB | 8B55 |
| 0000006060 | 6AEC | FF40 | 0C76 | 76FF | FF0A | 0876 | 76FF | 9A06 |
| 0000006100 | 09FC | 0932 | CBC9 | 08C8 | 0000 | B857 | 0001 | E850 |
| 0000006120 | FDD6 | C483 | 1E02 | 5E68 | E805 | 04E2 | C483 | 8B04 |
| 0000006140 | 8DF8 | 0A46 | 5016 | 76FF | FF08 | 0676 | 681E | 055E |
| 0000006160 | 5C9A | 0311 | 830A | 0CC4 | 4689 | 1EF8 | 5E68 | 5705 |
| 0000006200 | 33E8 | 8305 | 06C4 | 016A | A9E8 | 83FD | 02C4 | 468B |
| 0000006220 | 5FF8 | CBC9 | 8B55 | 8BEC | 8BD7 | 1EDE | 76C5 | 8B0A |
| 0000006240 | 8CFE | 8ED8 | 33C0 | B9C0 | FFFF | AEF2 | D1F7 | 7EC4 |
| 0000006260 | 8B06 | A8C7 | 7401 | A402 | D149 | F3E9 | 13A5 | F3C9 |
| 0000006300 | 8BA4 | 8BF3 | 1FFA | C28C | CB5D | 8B55 | 8BEC | 8BD7 |
| 0000006320 | 1EDE | 76C5 | C406 | 0A7E | C033 | FFB9 | F2FF | F7AE |
| 0000006340 | 2BD1 | F3F9 | 74A6 | 1B05 | 1DC0 | FFFF | 8B1F | 8BF3 |
| 0000006360 | 5DFA | 00CB | 04C8 | 0000 | A156 | 0292 | 168B | 0294 |
| 0000006400 | 4689 | 89FC | FE56 | 0C6A | 6DE8 | 83FD | 02C4 | 468B |
| 0000006420 | 0BFE | FC46 | 7674 | 468B | 0B08 | 0646 | 6E74 | 76FF |
| 0000006440 | FF08 | 0676 | 449A | 6417 | 830B | 04C4 | F08B | 5EC4 |
| 0000006460 | 26FC | 478B | 2602 | 070B | 5274 | FF26 | 0277 | FF26 |
| 0000006500 | 9A37 | 1744 | 0B85 | C483 | 3B04 | 7EC6 | C439 | FC5E |
| 0000006520 | C426 | 261F | 3B80 | 753D | 562D | 76FF | FF08 | 0676 |
| 0000006540 | 5306 | 5C9A | 9317 | 830A | 0AC4 | C00B | 1875 | 0C6A |
| 0000006560 | 2BE8 | 83FD | 02C4 | 5EC4 | 26FC | 078B | 8B26 | 0257 |
| 0000006600 | C603 | EB40 | 9012 | 4683 | 04FC | A2EB | 0C6A | 0DE8 |
| 0000006620 | 83FD | 02C4 | C02B | 5E99 | CBC9 | 04C8 | 0000 | 5657 |
| 0000006640 | 126A | D3E8 | 83FC | 02C4 | 06C6 | 0FAC | 8B42 | 0646 |
| 0000006660 | 568B | A308 | 0FA8 | 1689 | 0FAA | A2BE | 890F | 8904 |
| 0000006700 | 0254 | 06C7 | 0FA6 | 7FFF | 468D | 160E | FF50 | 0C76 |
| 0000006720 | 76FF | 1E0A | 9A56 | 115C | 0C1B | C483 | 8B0C | FFF8 |
| 0000006740 | A60E | 780F | C40F | A21E | FF0F | A206 | 260F | 07C6 |
| 0000006760 | EB00 | 900D | 561E | 006A | 4E9A | 470D | 830B | 06C4 |
| 0000007000 | 126A | 99E8 | 83FC | 02C4 | C78B | 5F5E | CBC9 | 0EC8 |
| 0000007020 | 0000 | 068E | 0B54 | C726 | 8006 | 0009 | 8D00 | F646 |
| 0000007040 | 5016 | B49A | 6217 | 830C | 04C4 | 006A | E868 | 8B03 |
| 0000007060 | F646 | 568B | 2BF8 | 4806 | 1B05 | 4A16 | 5205 | 9A50 |
| 0000007100 | 18B0 | 0C83 | C88B | 468B | 2BFA | 4C06 | 8B05 | 99DA |
| 0000007120 | C103 | D313 | 4689 | 89F2 | F456 | CBC9 | 681E | 0548 |
| 0000007140 | B49A | F817 | 830B | 04C4 | 90CB | 8B55 | 83EC | 0CEC |
| 0000007160 | 468D | 16F4 | 9A50 | FFFF | 0000 | C51E | 065E | 2FB8 |
| 0000007200 | 8800 | 0247 | 4788 | 8805 | 0867 | 468A | B5F9 | F60A |
| 0000007220 | 05F5 | 3030 | 0789 | 468A | 98F8 | F5F6 | 3005 | 8930 |
| 0000007240 | 0347 | 468B | 2DFA | 07D0 | 0373 | 6405 | F600 | 05F5 |
| 0000007260 | 3030 | 4789 | 9306 | DA8C | 8B1F | 5DE5 | 00CB | 8B55 |

THU MAR 14 17:28:26 1991 CRVN.EXE PAGE 5, LINE 237

| | | | | | | | | |
|---|---|---|---|---|---|---|---|---|
| 0000007300 | 83EC | 0CEC | 468D | 16F4 | 9A50 | 0C96 | 0000 | C51E |
| 0000007320 | 065E | 3AB8 | 8800 | 0247 | 4788 | 8805 | 0867 | 468A |
| 0000007340 | B5F4 | F60A | 05F5 | 3030 | 0789 | 468A | 98F5 | F5F6 |
| 0000007360 | 3005 | 8930 | 0347 | 468A | 98F6 | F5F6 | 3005 | 8930 |
| 0000007400 | 0647 | 8C93 | 1FDA | E58B | CB5D | 8B55 | 8CEC | C5D9 |
| 0000007420 | 065E | D38B | 0BEB | 612C | 1A3C | 0473 | 4104 | 0788 |
| 0000007440 | 8A43 | 0A07 | 75C0 | 92EF | DA8C | D98E | CB5D | 8B55 |
| 0000007460 | 56EC | 8B57 | 0876 | 448A | A80A | 7482 | A864 | 7540 |
| 0000007500 | C760 | 0444 | 0000 | 01A8 | 0B74 | 10A8 | 5374 | 4C8B |
| 0000007520 | 8906 | 240C | 0CFE | 2402 | 88EF | 0A44 | FE8B | EF81 |
| 0000007540 | 0552 | C781 | 0732 | DB33 | 5C8A | A80B | 7508 | A84B |
| 0000007560 | 7504 | F618 | 0105 | 4275 | FE81 | 055E | 0674 | FE81 |
| 0000007600 | 056A | 2675 | 87F6 | 008C | 7440 | B91F | 0001 | 1651 |
| 0000007620 | 7E8D | 5706 | 0E53 | C7E8 | 830E | 08C4 | 01B9 | EB00 |
| 0000007640 | B846 | FFFF | 4C80 | 200A | 65EB | 1E53 | E856 | 0C04 |
| 0000007660 | C483 | 5B04 | 44F6 | 080A | D174 | 0C8B | 548B | 2B06 |
| 0000007700 | 42CA | 1489 | 558B | 4A02 | 5489 | E304 | 5125 | FF51 |
| 0000007720 | 0874 | 74FF | 5306 | E80E | 0E86 | C483 | 5908 | 7CC4 |
| 0000007740 | 8B06 | 0656 | 8826 | 3B15 | 75C1 | 33B6 | 8AC0 | 0646 |
| 0000007760 | 1DEB | C033 | 87F6 | 008C | 7420 | B9E3 | 0002 | 5051 |
| 0000010000 | 5350 | E80E | 0C04 | C483 | 3308 | 8BC0 | EBC8 | 5FCF |
| 0000010020 | 5D5E | 00CB | 8B55 | 56EC | 768B | 8A04 | DA44 | 83A8 |
| 0000010040 | 2674 | 08A8 | 2274 | 74FF | FF08 | 0674 | 6A9A | 451E |
| 0000010060 | 830C | 04C4 | 6480 | F70A | C033 | 4489 | 8906 | 0844 |
| 0000010100 | 0489 | 4489 | 8902 | 0444 | 5D5E | 00C3 | 08C8 | 0000 |
| 0000010120 | 5657 | 5EC4 | 260A | 078A | 3D98 | 0077 | 4874 | 0877 |
| 0000010140 | 612C | 4C74 | 112C | 0674 | C02B | E999 | 00CC | F62B |
| 0000010160 | 46C6 | 01FC | 46C7 | 01FE | FF00 | 0A46 | 5EC4 | 260A |
| 0000010200 | 3F80 | 7400 | 835B | FE7E | 7400 | 2655 | 078A | 3D98 |
| 0000010220 | 0074 | 3474 | 0877 | 2B2C | 1C74 | 372C | 3674 | 46C7 |
| 0000010240 | 00FE | EB00 | 90D4 | 01BE | C603 | FC46 | EB02 | 90C5 |
| 0000010260 | 09BE | EB01 | 90F4 | C6F7 | 0002 | E275 | CE83 | 8302 |
| 0000010300 | FEE6 | 46C6 | 80FC | B1EB | C6F7 | C000 | D075 | CE81 |
| 0000010320 | 4000 | A5EB | C6F7 | C000 | C475 | CE81 | 8000 | 99EB |
| 0000010340 | A468 | FF01 | 0E76 | FF56 | 0876 | 76FF | 9A06 | 1A98 |
| 0000010360 | 0E4F | C483 | 890A | FA46 | C00B | 037D | 69E9 | FFFF |
| 0000010400 | 8606 | 8B09 | 107E | C78B | 522D | 0505 | 0732 | 4689 |
| 0000010420 | 8AF8 | FC46 | 4588 | 8B0A | F85E | 07C6 | 2B00 | 89C0 |
| 0000010440 | 0445 | 4789 | 8904 | 0245 | 0589 | 4589 | 8908 | 0645 |
| 0000010460 | 468A | 88FA | 0B45 | C78B | DA8C | 5F5E | CBC9 | 8B55 |
| 0000010500 | 56EC | 8B57 | 0476 | 16BB | 8109 | 5EFE | 7405 | BB09 |
| 0000010520 | 091A | FE81 | 056A | 5875 | FE8B | EF81 | 0552 | C781 |
| 0000010540 | 0732 | 44F6 | 0C0A | 4875 | 05F6 | 7501 | 8B43 | 8B07 |
| 0000010560 | 0257 | C88B | CA0B | 2174 | 4489 | 8906 | 0854 | 0489 |
| 0000010600 | 5489 | C702 | 0444 | 0200 | 45C7 | 0002 | 8002 | 0A4C |
| 0000010620 | C602 | 1105 | 01B8 | EB00 | 5319 | 00B8 | 5002 | 949A |
| 0000010640 | 1005 | 5B0F | 0B5B | 74D2 | 8907 | 8907 | 0257 | C8EB |
| 0000010660 | C033 | 5E5F | C35D | 8B55 | 56EC | 8B57 | 0676 | FE8B |
| 0000010700 | EF81 | 0552 | C781 | 0732 | 05F6 | 7410 | 332D | 8ADB |
| 0000010720 | 0B5C | 87F6 | 008C | 7440 | 1E21 | 0E56 | 65E8 | 8300 |
| 0000010740 | 04C4 | 7E83 | 0004 | 1274 | C033 | 0588 | 4589 | 8902 |
| 0000010760 | 8904 | 0244 | 4489 | 8906 | 0844 | 5E5F | C35D | 04C8 |
| 0000011000 | 0000 | 468B | 0B08 | 0646 | 0875 | 006A | A7E8 | EB00 |
| 0000011020 | 9031 | 468B | 2D06 | 0552 | 0CB9 | 9900 | F9F7 | 4689 |
| 0000011040 | 50FC | 03E8 | 83F8 | 02C4 | 76FF | FF08 | 0676 | 649A |
| 0000011060 | A810 | 8310 | 04C4 | 4689 | FFFE | FC76 | F5E8 | 8BF7 |
| 0000011100 | FE46 | CBC9 | 02C8 | 0000 | 5657 | FF2B | 768B | 8A06 |
| 0000011120 | 0A44 | C88B | 0324 | 023C | 3F75 | C1F6 | 7508 | 8B0D |
| 0000011140 | 81DE | 52EB | F605 | 3287 | 0107 | 2D74 | 048B | 442B |

THU MAR 14 17:28:26 1991 CRVN.EXE PAGE 6, LINE 296

| | | | | | | | | |
|---|---|---|---|---|---|---|---|---|
| 0000011160 | 8906 | FE46 | C00B | 217E | FF50 | 0874 | 74FF | 8A06 |
| 0000011200 | 0B4C | ED2A | 9A51 | 1C80 | 1125 | C483 | 3908 | FE46 |
| 0000011220 | 0774 | 4C80 | 200A | FFBF | 8BFF | 0644 | 548B | 8908 |
| 0000011240 | 8904 | 0254 | 44C7 | 0004 | 8B00 | 5EC7 | C95F | 90CB |
| 0000011260 | 016A | 01E8 | CB00 | 04C8 | 0000 | 5657 | 52BE | 2B05 |
| 0000011300 | 89FF | FE7E | 026A | AFE8 | 83F7 | 02C4 | 11EB | 46C7 |
| 0000011320 | FFFE | FFFF | FC76 | 5BE8 | 83F7 | 02C4 | C683 | 390C |
| 0000011340 | 1236 | 7209 | 8B2B | 2DC6 | 0552 | 0CB9 | 9900 | F9F7 |
| 0000011360 | 4689 | 50FC | 31E8 | 83F7 | 02C4 | 44F6 | 830A | D374 |
| 0000011400 | 561E | 649A | C110 | 830F | 04C4 | 7440 | 47C1 | C3EB |
| 0000011420 | 026A | 89E8 | 83F7 | 02C4 | 7E83 | 0104 | 0475 | C78B |
| 0000011440 | 03EB | 468B | 5EFE | C95F | 02C2 | 9000 | 11B4 | 11BF |
| 0000011460 | 11D5 | 1209 | 1235 | 123D | 1266 | 1298 | 8B55 | B8EC |
| 0000011500 | 0171 | E80E | 077C | 5756 | C033 | 4689 | 88F8 | FB46 |
| 0000011520 | 76C4 | 260A | 89AC | 0A76 | 4688 | 0AFE | 74C0 | 8306 |
| 0000011540 | F87E | 7D00 | 8B06 | F846 | B5E9 | BB04 | 091E | 202C |
| 0000011560 | 583C | 0577 | 24D7 | EB0F | B002 | B100 | D203 | 02E0 |
| 0000011600 | FB46 | FED7 | D2C1 | 88E8 | FB46 | 8B98 | D1D8 | 2EE3 |
| 0000011620 | A7FF | 114C | 568A | B9FE | 0001 | 36E8 | EB04 | 33B1 |
| 0000011640 | 89C0 | F046 | 4689 | 89F6 | EE46 | 46C7 | 20FC | 4800 |
| 0000011660 | 4689 | EBF4 | 8A9B | FE46 | 2D3C | 0675 | 4E80 | 04FC |
| 0000011700 | 8EEB | 2B3C | 0675 | 4E80 | 01FC | 84EB | 203C | 0775 |
| 0000011720 | 4E80 | 02FC | 79E9 | 3CFF | 7523 | 8007 | FC4E | E980 |
| 0000011740 | FF6E | 4E80 | 08FC | 67E9 | 8AFF | FE4E | F980 | 752A |
| 0000011760 | E80F | 035C | C00B | 1779 | D8F7 | 4E80 | 04FC | 0FEB |
| 0000012000 | E980 | 3230 | 8BED | F646 | 0ABB | F700 | 03E3 | 89C1 |
| 0000012020 | F646 | 3BE9 | C7FF | F446 | 0000 | 33E9 | 8AFF | FE4E |
| 0000012040 | F980 | 752A | E80C | 0328 | C00B | 1479 | FFB8 | EBFF |
| 0000012060 | 800F | 30E9 | ED32 | 468B | BBF4 | 000A | E3F7 | C103 |
| 0000012100 | 4689 | E9F4 | FF0A | 468A | 3CFE | 756C | 8006 | FC4E |
| 0000012120 | EB10 | 3C22 | 7546 | 8006 | FC4E | EB20 | 3C18 | 754E |
| 0000012140 | 8006 | FD4E | EB10 | 3C0E | 754C | 8006 | FD4E | EB04 |
| 0000012160 | 8004 | FD4E | E908 | FED8 | 468A | 3CFE | 7564 | E903 |
| 0000012200 | 0194 | 693C | 0375 | 8DE9 | 3C01 | 7575 | E903 | 018A |
| 0000012220 | 583C | 0375 | 89E9 | 3C01 | 7578 | E903 | 0188 | 6F3C |
| 0000012240 | 0375 | A2E9 | 3C01 | 7463 | 3C1A | 7473 | 3C27 | 746E |
| 0000012260 | 3C51 | 7470 | 3C60 | 7445 | 3C07 | 7447 | E903 | 00BB |
| 0000012300 | B5E9 | E800 | 028A | BE8D | FE8F | 0716 | 4FAA | 01B9 |
| 0000012320 | E900 | 01F1 | 90E8 | 0B02 | 75FF | 8C12 | 0BC0 | 75C0 |
| 0000012340 | 1E0C | BF07 | 0977 | 0E8B | 097D | D8E9 | 5701 | 4E8B |
| 0000012360 | E3F4 | 3207 | F2C0 | 75AE | 4F01 | 2B59 | 87F9 | E9CF |
| 0000012400 | 01C3 | 62E8 | 8B02 | F846 | F6AB | FC46 | 7410 | 3303 |
| 0000012420 | ABC0 | 3BE9 | F6FE | FC46 | 7530 | E805 | 0232 | 39EB |
| 0000012440 | 36E8 | F602 | FD46 | 7518 | C630 | FF46 | B907 | 0010 |
| 0000012460 | 0716 | 3352 | 8DD2 | 97BE | BEFE | 0004 | B0E8 | B902 |
| 0000012500 | 0010 | BE8D | FE92 | 3358 | BED2 | 0004 | A0E8 | C602 |
| 0000012520 | 9386 | 3AFE | 09B9 | EB00 | C618 | FF46 | B907 | 0010 |
| 0000012540 | 0716 | D233 | BE8D | FE92 | 04BE | E800 | 0281 | 04B9 |
| 0000012560 | 8D00 | 8FBE | E9FE | 014D | 46FF | 80EE | FC4E | 8A40 |
| 0000012600 | FE46 | 200C | 8B98 | 83F0 | F47E | 7F00 | 7413 | C707 |
| 0000012620 | F446 | 0006 | 0AEB | 673D | 7500 | C705 | F446 | 0001 |
| 0000012640 | BE8D | FE8F | 76FF | FFEE | F476 | 1656 | FF57 | 1076 |
| 0000012660 | 76FF | F60E | FD46 | 7404 | FF0A | 9C1E | 8309 | 0E46 |
| 0000012700 | EB0A | FF08 | 881E | 8309 | 0E46 | 8308 | 0EC4 | 46F6 |
| 0000012720 | 80FC | 0F74 | 7E83 | 00F4 | 0975 | 5716 | 1EFF | 0994 |
| 0000012740 | C483 | 8304 | 67FE | 1075 | 46F7 | 80FC | 7500 | 1609 |
| 0000012760 | FF57 | 8C1E | 8309 | 04C4 | 0716 | 8026 | 2D3D | 0575 |
| 0000013000 | 8047 | FD4E | B901 | FFFF | B057 | F200 | 4FAE | 2B59 |
| 0000013020 | 87F9 | E9CF | 00AF | 4E80 | 40FC | 46C6 | 0AFA | 35EB |

THU MAR 14 17:28:26 1991 CRVN.EXE PAGE 7, LINE 355

| | | | | | | | | |
|---|---|---|---|---|---|---|---|---|
| 0000013040 | 46C6 | 07FF | 04EB | 46C6 | 27FF | 46F6 | 80FC | 1174 |
| 0000013060 | 46C7 | 02F0 | C600 | F246 | B230 | 0251 | FF56 | 5688 |
| 0000013100 | C6F3 | FA46 | EB10 | F60E | FC46 | 7480 | 8004 | FD4E |
| 0000013120 | C602 | FA46 | F608 | FC46 | 7410 | E805 | 00FB | 0EEB |
| 0000013140 | EDE8 | F600 | FC46 | 7440 | 9903 | 02EB | D233 | 46F6 |
| 0000013160 | 40FC | 0F74 | D20B | 0B7D | 4E80 | 01FD | D8F7 | D283 |
| 0000013200 | F700 | 83DA | F47E | 7D00 | C707 | F446 | 0001 | 04EB |
| 0000013220 | 6680 | F7FC | D88B | DA0B | 0575 | 46C7 | 00F0 | 8D00 |
| 0000013240 | EB7E | 0716 | 4E8A | 32FA | 8BED | F476 | 40E8 | F601 |
| 0000013260 | FD46 | 7402 | E30E | 2606 | 3D80 | 7430 | 4FD6 | C626 |
| 0000013300 | 3005 | EB41 | F600 | FC46 | 7440 | F631 | FD46 | 7401 |
| 0000013320 | C60B | F246 | C72D | F046 | 0001 | 20EB | 46F6 | 01FC |
| 0000013340 | 0B74 | 46C6 | 2BF2 | 46C7 | 01F0 | EB00 | F60F | FC46 |
| 0000013360 | 7402 | C609 | F246 | C720 | F046 | 0001 | 468B | 2BF6 |
| 0000013400 | 2BC1 | F046 | 027D | C033 | 5706 | F651 | FC46 | 750C |
| 0000013420 | 8B07 | B2C8 | E820 | 00BB | 1650 | 8D07 | F27E | 4E8B |
| 0000013440 | E8F0 | 0091 | F658 | FC46 | 7408 | F60D | FC46 | 7504 |
| 0000013460 | 8B07 | B2C8 | E830 | 009B | 5F59 | 5007 | 76E8 | 5800 |
| 0000013500 | 46F6 | 04FC | 0774 | C88B | 20B2 | 86E8 | E900 | FC00 |
| 0000013520 | 76C4 | 260E | 89AD | 0E76 | C4C3 | 0E76 | AD26 | D08B |
| 0000013540 | AD26 | 8992 | 0E76 | F6C3 | FC46 | 7420 | E808 | FFE9 |
| 0000013560 | C28E | F88B | E8C3 | FFD8 | F88B | C00B | 0375 | C08E |
| 0000013600 | 1EC3 | C307 | 0698 | C457 | 065E | FF26 | 044F | 1078 |
| 0000013620 | 8B26 | 263F | 07FF | 8E26 | 0247 | 33AA | 5FC0 | C307 |
| 0000013640 | 5251 | 5306 | 0E50 | 85E8 | 83F7 | 06C4 | 595A | FF3D |
| 0000013660 | 75FF | EBE8 | E3E8 | 8B1B | 01F7 | F84E | 3357 | 26FF |
| 0000013700 | E8AC | FFC0 | F80B | F7E2 | FF0B | 745F | C705 | F846 |
| 0000013720 | FFFF | E3C3 | 0119 | F84E | 3357 | 8AFF | E8C2 | FFA4 |
| 0000013740 | F80B | F7E2 | FF0B | 745F | C705 | F846 | FFFF | FDC3 |
| 0000013760 | 9357 | F60B | 0A7F | DB0B | 0675 | D20B | 0275 | 1AEB |
| 0000014000 | 3392 | F7D2 | 93F1 | F1F7 | 8792 | 04D3 | 3C30 | 7639 |
| 0000014020 | 0203 | FF46 | 8BAA | 4EC2 | D8EB | 2B59 | 47CF | C3FC |
| 0000014040 | 5E5F | E58B | CB5D | 06C8 | 0000 | BE56 | 0552 | C02B |
| 0000014060 | 4689 | 89FC | FA46 | 026A | 3DE8 | 83F2 | 02C4 | 0CEB |
| 0000014100 | 76FF | E8FE | F1EE | C483 | 8302 | 0CC6 | 3639 | 0912 |
| 0000014120 | 3B72 | C68B | 522D | B905 | 000C | F799 | 89F9 | FE46 |
| 0000014140 | E850 | F1C4 | C483 | F602 | 0A44 | 7583 | C7D3 | 0444 |
| 0000014160 | 0000 | 44C6 | 000A | C02B | 4489 | 8908 | 0644 | 4489 |
| 0000014200 | 8902 | C604 | 0B44 | 89FF | FA76 | 5E8C | 6AFC | E802 |
| 0000014220 | F20C | C483 | 8B02 | FA46 | 568B | 5EFC | CBC9 | 8B55 |
| 0000014240 | 8BEC | 065E | 1E3B | 008A | 1272 | 09BA | 3300 | E9C0 |
| 0000014260 | D28E | E853 | F196 | C483 | E902 | 029D | E853 | F180 |
| 0000014300 | C483 | 5302 | FF9A | D0FF | 8500 | 75C0 | C6E5 | 8C87 |
| 0000014320 | 0000 | E853 | F176 | C483 | 8B02 | 5DE5 | 00CB | 8B55 |
| 0000014340 | 8BEC | 8BD7 | 1EDE | 7EC4 | 3306 | B9C0 | FFFF | AEF2 |
| 0000014360 | 758D | C4FF | 0A7E | FFB9 | F2FF | F7AE | 2BD1 | 8CF9 |
| 0000014400 | 8EC0 | 8ED8 | 0846 | FE87 | 468B | F706 | 01C6 | 7400 |
| 0000014420 | A402 | D149 | F3E9 | 13A5 | F3C9 | 8BA4 | 8BF3 | 1FFA |
| 0000014440 | C28C | CB5D | 8B55 | 8BEC | C4D7 | 067E | C033 | FFB9 |
| 0000014460 | F2FF | F7AE | 49D1 | 8B91 | 5DFA | 00CB | 8B55 | 57EC |
| 0000014500 | 1E56 | 4E8B | E30E | 8B27 | C4D9 | 067E | F78B | C033 |
| 0000014520 | AEF2 | D9F7 | CB03 | FE8B | 76C5 | F30A | 8AA6 | FF44 |
| 0000014540 | C933 | 3A26 | FF45 | 0477 | 0474 | 4949 | D1F7 | C18B |
| 0000014560 | 5E1F | 8B5F | 5DE5 | 00CB | 8B55 | 56EC | B357 | 8B01 |
| 0000014600 | 0C4E | 468B | 3306 | 83D2 | 0AF9 | 0175 | 1E99 | 7EC5 |
| 0000014620 | E908 | 098B | 1EC8 | 0000 | 749A | CC1E | 6A17 | 6A00 |
| 0000014640 | FF3C | E836 | FF09 | E636 | 9A09 | 2196 | 181B | 5EC4 |
| 0000014660 | 2606 | 4789 | A106 | 09EA | 8926 | 0847 | 468D | 16E2 |
| 0000014700 | 9A50 | 0CEA | 0000 | 468A | 2AE5 | 8BE4 | C1C8 | 02E0 |

THU MAR 14 17:28:26 1991 CRVN.EXE PAGE 8, LINE 414

| | | | | | | | | |
|---|---|---|---|---|---|---|---|---|
| 0000014720 | C103 | E0DI | 5EC4 | 2606 | 4789 | 8A04 | E446 | E42A |
| 0000014740 | 8A50 | E346 | 8A50 | E246 | 8A50 | E646 | 8A50 | E746 |
| 0000014760 | 8B50 | E846 | BC2D | 5007 | 3C9A | 7220 | 8318 | 0CC4 |
| 0000015000 | 5EC4 | 2606 | 0789 | 8926 | 0257 | 468B | 2DE8 | 076C |
| 0000015020 | 4689 | 8AF8 | E246 | E42A | 4689 | 8AF2 | E75E | FF2A |
| 0000015040 | 894B | F65E | E3D1 | 468A | 89E6 | F446 | 8703 | 09C0 |
| 0000015060 | 4689 | F6FC | E846 | 7503 | 800A | E77E | 7602 | 4004 |
| 0000015100 | 4689 | 83FC | EA3E | 0009 | 1C74 | 468D | 16EE | 9A50 |
| 0000015120 | IF6E | 1051 | C483 | 0B04 | 74C0 | C40B | 065E | C726 |
| 0000015140 | 0847 | 0001 | 09EB | 5EC4 | 2606 | 47C7 | 0008 | C900 |
| 0000015160 | 90CB | 8B55 | FFEC | 0876 | 76FF | 3306 | 50C0 | 9A50 |
| 0000015200 | FFFF | 0000 | C085 | 0374 | CEE9 | 8B00 | 5DE5 | 00CB |
| 0000015220 | 8B55 | 8BEC | 0846 | 4E8B | 0B0C | 8BC8 | 0A4E | 0975 |
| 0000015240 | 468B | F706 | 5DE1 | 08CA | 5300 | E1F7 | D88B | 468B |
| 0000015260 | F706 | 0C66 | D803 | 468B | F706 | 03E1 | 5BD3 | CA5D |
| 0000015300 | 0008 | 5A59 | DC8B | D82B | 1972 | FB81 | 0200 | 1372 |
| 0000015320 | E852 | 0988 | 8E93 | 5AC2 | 3B26 | 0447 | 0572 | E08B |
| 0000015340 | 5152 | 52CB | A151 | 0982 | 7540 | 3305 | E9C0 | E77C |
| 0000015360 | 2EFF | 0982 | 1601 | 0202 | 0203 | 1864 | 0D05 | 0906 |
| 0000015400 | 0C07 | 0C08 | 0C09 | 070A | 080B | 160C | 160D | 020F |
| 0000015420 | 0D10 | 1211 | 0212 | 0235 | 0D41 | 0243 | 0D52 | 0D53 |
| 0000015440 | 0D57 | 0B59 | 0D6C | 206D | 1C70 | 0972 | 1606 | 0A80 |
| 0000015460 | 0A81 | 0982 | 0D84 | 0BA4 | 02CE | 0BD7 | 0D00 | 1608 |
| 0000015500 | 8B52 | E8D8 | 0916 | 8E93 | 5AC2 | 8926 | 0247 | 8926 |
| 0000015520 | B817 | FFFF | 8B99 | 5DE5 | E8CB | 0008 | FFB8 | 99FF |
| 0000015540 | E58B | CB5D | D88B | F3E8 | 9308 | C28E | 8926 | 0247 |
| 0000015560 | BB53 | 1914 | 24B9 | 0A00 | 75E4 | 2E1B | 073A | 1674 |
| 0000015600 | 4343 | F7E2 | 133C | 0472 | 243C | 0A76 | 3C43 | 72BC |
| 0000015620 | 3C04 | 76CA | 4301 | 8A2E | 0147 | 5B98 | 8926 | C307 |
| 0000015640 | 8B55 | 8BEC | 0002 | 05EB | 8B55 | 33EC | E8DB | 08AC |
| 0000015660 | C303 | CB5D | 8B55 | 56EC | 768B | B804 | 0200 | 9A50 |
| 0000015700 | 0594 | 17BB | 8B59 | 81DE | 52EB | 8105 | 32C3 | 0B07 |
| 0000015720 | 74D2 | 800B | 0A4C | C708 | 0247 | 0200 | 0EEB | 4C80 |
| 0000015740 | 040A | 47C7 | 0102 | 8C00 | 8DDA | 0147 | 5489 | 8902 |
| 0000015760 | 8904 | 0854 | 4489 | C706 | 0444 | 0000 | 5D5E | 00C3 |
| 0000016000 | 8B55 | 83EC | 02EC | C033 | 09EB | 8B55 | 83EC | 02EC |
| 0000016020 | FFB8 | 89FF | FE46 | 5E8B | 3B06 | 8A1E | 7200 | BA19 |
| 0000016040 | 0009 | C033 | 19E9 | 8BFF | FE4E | C90B | 0774 | E853 |
| 0000016060 | EE1A | C483 | E902 | FF21 | C00B | 0774 | E853 | EE00 |
| 0000016100 | C483 | 8302 | 04EC | CC8B | FF53 | 0A76 | 76FF | FF08 |
| 0000016120 | 0C76 | 5116 | FF9A | 00FF | 5900 | 855A | 75C0 | 80C8 |
| 0000016140 | 8CA7 | FD00 | 468B | 0BFE | 74C0 | 5307 | DDE8 | 83ED |
| 0000016160 | 02C4 | 8B91 | 5DE5 | 00CB | 8B55 | 83EC | 0EEC | 7E8A |
| 0000016200 | 8B0C | 0E46 | 4689 | EB0C | 5508 | EC8B | EC83 | B70E |
| 0000016220 | FF40 | 0876 | 76FF | 1606 | 568D | 52FE | 8D16 | F856 |
| 0000016240 | 3352 | 52D2 | 8B52 | 0C4E | 99E8 | 8B01 | 0A46 | 00A9 |
| 0000016260 | 7401 | 8008 | 10CA | 00A9 | 7504 | A92A | 0200 | 2274 |
| 0000016300 | CA80 | 5002 | 468D | FFFE | 0876 | 76FF | 1606 | 3350 |
| 0000016320 | 50C0 | 9A50 | FFFF | 0000 | C085 | 7558 | 8B08 | FE4E |
| 0000016340 | 03EB | CA80 | 5101 | 2552 | 0003 | C70A | 3350 | 50C0 |
| 0000016360 | 9A50 | FFFF | 0000 | C00B | 1674 | 6E3D | 7500 | F60E |
| 0000016400 | F0C2 | 02BA | 7400 | BA03 | 0011 | 33E9 | E9FE | 009D |
| 0000016420 | 468B | 3BFE | 8A06 | 7200 | 500D | E59A | 0016 | BA00 |
| 0000016440 | 0018 | C033 | E4EB | E850 | ED16 | C483 | 8B02 | 50D0 |
| 0000016460 | 8D16 | F45E | 1653 | 468D | 50F8 | 059A | 0001 | 0B00 |
| 0000016500 | 75C0 | 8B61 | 0A46 | C933 | 00A9 | 7580 | A90E | 4000 |
| 0000016520 | 0775 | 06F6 | 0A31 | 7580 | B102 | 8880 | F24E | 468A |
| 0000016540 | 3CF4 | 7501 | C607 | F446 | E940 | 008F | 023C | 0775 |
| 0000016560 | 46C6 | 08F4 | 84E9 | 3200 | 88C0 | F446 | C90A | F474 |

THU MAR 14 17:28:26 1991 CRVN.EXE PAGE 9, LINE 473

| | | | | | | | | |
|---|---|---|---|---|---|---|---|---|
| 0000016600 | 46F7 | 020A | 7400 | 5274 | FFB9 | 51FF | B951 | 0002 |
| 0000016620 | 1651 | 468D | 50FA | 759A | 001A | 0800 | 74C0 | 3D15 |
| 0000016640 | 0083 | 0C74 | ,6FF | E8FE | ECA2 | C483 | E902 | FDA9 |
| 0000016660 | C033 | 47EB | 1652 | 468D | 50F6 | 01B8 | 5000 | 8D16 |
| 0000016700 | F846 | 9A50 | FFFF | 0000 | C00B | 1B75 | 4639 | 74F8 |
| 0000016720 | 802A | F67E | 751A | 5210 | 76FF | FFFC | FA76 | FF9A |
| 0000016740 | 00FF | 0B00 | 75C0 | 52BD | C033 | 5050 | 1650 | 468D |
| 0000016760 | 50FA | B79A | 001B | 0B00 | 75C0 | 8AA9 | F44E | C1F6 |
| 0000017000 | 7548 | FF28 | 0876 | 76FF | 1606 | 468D | 50F8 | C033 |
| 0000017020 | 5050 | F49A | 001A | F700 | F846 | 0001 | 0374 | C980 |
| 0000017040 | F710 | 0A46 | 0008 | 0374 | C980 | 0A20 | F24E | C980 |
| 0000017060 | 8B01 | 8BC2 | 88D8 | 8C8F | 5300 | 0FE8 | 83EC | 02C4 |
| 0000017100 | E58B | CB5D | 84A1 | F700 | 23D0 | 33C1 | ABC9 | 7580 |
| 0000017120 | 8003 | 01C9 | 00C3 | 8B55 | 83EC | 0EEC | C033 | 09EB |
| 0000017140 | 8B55 | 83EC | 0EEC | FFB8 | 89FF | F246 | 5E8B | 3B06 |
| 0000017160 | 8A1E | 7200 | BA08 | 0009 | C033 | C3E9 | 0BFC | 74C0 |
| 0000017200 | 5307 | BBE8 | 83EB | 02C4 | 87F6 | 008C | 7420 | 5312 |
| 0000017220 | C933 | 5151 | 4141 | 8D51 | F446 | 5016 | 139A | 001C |
| 0000017240 | F600 | 8C87 | 8000 | 7D74 | 5E8C | 8EFA | 0A46 | 56C5 |
| 0000017260 | 3308 | 89C0 | FE46 | 4689 | FCFC | 5657 | FA8B | F28B |
| 0000017300 | 6689 | 8BF8 | 0C4E | 3FE3 | 0AB0 | AEF2 | 5275 | 8E1E |
| 0000017320 | FA5E | 309A | E222 | 3D19 | 00A8 | 4C76 | 831F | 02EC |
| 0000017340 | DC8B | 00BA | 3D02 | 0228 | 0373 | 80BA | 2B00 | 8BE2 |
| 0000017360 | 8BD4 | 16FA | 8B07 | 0C4E | 3CAC | 740A | 3B0D | 74FB |
| 0000017400 | AA1A | F4E2 | 38E8 | E900 | 00AF | 0DB0 | FB3B | 0375 |
| 0000017420 | 2CE8 | AA00 | 0AB0 | 46FF | EBFC | E8E2 | 0021 | E1EB |
| 0000017440 | 5F5E | 5E8E | E9FA | 00C8 | 468B | 0BF2 | 74C0 | FF09 |
| 0000017460 | 0676 | 17E8 | 83EB | 02C4 | FCB8 | 0EFF | 83E8 | 50FB |
| 0000017500 | 5153 | 061E | 8B1F | 2BCF | E3CA | 5121 | 5E8B | 5306 |
| 0000017520 | 521E | 8D51 | F446 | 5016 | 659A | 0005 | 5900 | C00B |
| 0000017540 | 1175 | 5E8B | 01F4 | FE5E | D93B | 0772 | 591F | 585B |
| 0000017560 | FA8B | 1FC3 | C483 | 8308 | FE7E | 7500 | 0B3C | 74C0 |
| 0000017600 | 3D18 | 006D | 0D74 | 013D | BA00 | 0009 | 0875 | 1CBA |
| 0000017620 | EB00 | BA03 | 0020 | EBF9 | 8E26 | FA5E | 87F6 | 008C |
| 0000017640 | 7440 | 8E0E | 0A5E | 5E8B | 8008 | 1A3F | 0375 | EBF8 |
| 0000017660 | BA0E | 001C | C033 | EBF9 | 8B06 | FE46 | 462B | 8BFC |
| 0000017700 | F866 | 5F5E | 5E8E | 72FA | 8B14 | F25E | DB0B | 0974 |
| 0000017720 | 76FF | E806 | EA76 | C483 | 8B02 | 5DE5 | 8BCB | F25E |
| 0000017740 | DB0B | 0974 | 76FF | E806 | EA62 | C483 | E902 | FB50 |
| 0000017760 | 4E8B | 0B0C | 75C9 | 8B04 | EBC1 | 1ECE | 56C5 | 5308 |
| 0000020000 | 521E | 8D51 | F446 | 5016 | 799A | 001D | 1E00 | 1F07 |
| 0000020020 | C00B | 1774 | 6D3D | 7400 | 3D0D | 0001 | 09BA | 7500 |
| 0000020040 | BABC | 001C | B7EB | 20BA | EB00 | 8BB2 | F446 | C00B |
| 0000020060 | 9775 | 87F6 | 008C | 7440 | 8B0A | 26DA | 3F80 | 751A |
| 0000020100 | EB02 | BA86 | 001C | C033 | 93EB | 9EEA | F505 | EA1C |
| 0000020120 | 059E | 1E6D | 0B6A | 1FE8 | 83EA | 02C4 | 3E83 | 0FAE |
| 0000020140 | 7500 | E807 | 0022 | 06FF | 0FAE | 0B6A | 2FE8 | 83EA |
| 0000020160 | 02C4 | 90CB | 0B6A | FFE8 | 83E9 | 02C4 | 09E8 | 6A00 |
| 0000020200 | E80B | EA1A | C483 | CB02 | 04C8 | 0000 | 1E56 | DA68 |
| 0000020220 | 9A09 | 0B14 | 1EE1 | C483 | 8904 | FC46 | 5689 | 0BFE |
| 0000020240 | 75D0 | E903 | 00A4 | 5EC4 | 26FC | 3F80 | 7500 | E903 |
| 0000020260 | 0098 | 036A | 5006 | 36FF | 09EE | 36FF | 09EC | 4E9A |
| 0000020300 | F822 | 831E | 0AC4 | 006A | 1068 | 830E | FC46 | FF03 |
| 0000020320 | FE76 | 76FF | 9AFC | 2278 | 1F02 | C483 | 5204 | 9A50 |
| 0000020340 | 18B0 | 1F4D | E6A3 | 8909 | E816 | 2B09 | 8EF6 | FE46 |
| 0000020360 | 5E8B | 26FC | 3880 | 7400 | 261A | 008A | C88B | 8B98 |
| 0000020400 | F6D8 | 3387 | 040A | 0575 | F980 | 752D | 4606 | FE83 |
| 0000020420 | 7C03 | 8BDD | FC5E | 8026 | 0038 | 1874 | 036A | DE03 |
| 0000020440 | 5306 | 36FF | 09F2 | 36FF | 09F0 | 4E9A | 7222 | 831E |

THU MAR 14 17:28:26 1991 CRVN.EXE PAGE 10, LINE 532

| | | | | | | | | |
|---|---|---|---|---|---|---|---|---|
| 0000020460 | 0AC4 | 08EB | 1EC4 | 09F0 | C626 | 0007 | 1EC4 | 09F0 |
| 0000020500 | 8026 | 013F | C01B | A340 | 09EA | C95E | 90C3 | 04C8 |
| 0000020520 | 0000 | C456 | 065E | 8326 | 087F | 7D03 | E903 | 00B6 |
| 0000020540 | 8326 | 087F | 7E09 | E903 | 00AC | 8326 | 087F | 7E03 |
| 0000020560 | 260A | 7F83 | 0908 | 037D | 81E9 | 2600 | 778B | 810A |
| 0000020600 | 6CC6 | 8107 | C2FE | 7E07 | 2617 | 7F83 | 0308 | 1075 |
| 0000020620 | 8B26 | 085F | E3D1 | 878B | 09C0 | 0705 | EB00 | 900B |
| 0000020640 | 8B26 | 085F | E3D1 | 878B | 09C2 | 4689 | F7FC | 03C6 |
| 0000020660 | 7500 | FF03 | FC46 | 5E8B | 2606 | 778B | 830A | 46EE |
| 0000020700 | 448D | 9901 | C233 | C22B | F8C1 | 3302 | 2BC2 | 69C2 |
| 0000020720 | 6DCE | 0301 | 03C1 | FC46 | 0405 | B900 | 0007 | F799 |
| 0000020740 | 2BF9 | FC56 | DAF7 | 8326 | 087F | 7503 | 2615 | 573B |
| 0000020760 | 7C0E | 7509 | 2621 | 7F83 | 0204 | 1A7C | 01B8 | EB00 |
| 0000021000 | 9017 | 5EC4 | 8B06 | 26C2 | 4739 | 7C0E | 75EF | 2607 |
| 0000021020 | 7F83 | 0104 | E67C | C02B | C95E | 90CB | 16C8 | 0000 |
| 0000021040 | 5657 | 768B | [illegible] | 6801 | 5180 | 448D | 9903 | C233 |
| 0000021060 | C22B | F8C1 | 3302 | 2BC2 | 99C2 | 5052 | B09A | 8E18 |
| 0000021100 | 8920 | EA46 | 5689 | 8BEC | 085E | E3D1 | BF8B | 09BE |
| 0000021120 | C68B | 04B9 | 9900 | F9F7 | D20B | 0775 | 7E83 | 0208 |
| 0000021140 | 017E | 8B47 | 0A46 | C703 | 4689 | 9AFC | 1E74 | 20B1 |
| 0000021160 | 006A | 3C6A | 006A | 3C6A | 006A | 186A | C669 | 016D |
| 0000021200 | 4603 | 030A | 99C7 | 4405 | 830E | 00D2 | 5052 | B09A |
| 0000021220 | C418 | 8B20 | 8BC8 | 0C46 | DA8B | 0399 | 13C1 | 52D3 |
| 0000021240 | 9A50 | 18B0 | 20D7 | C88B | 468B | 8B0E | 99DA | C103 |
| 0000021260 | D313 | 5052 | B09A | 1518 | 8B21 | 8BC8 | 1046 | DA8B |
| 0000021300 | 0399 | 13C1 | 03D3 | E606 | 1309 | E816 | 0109 | EA46 |
| 0000021320 | 5611 | 8DEC | 5044 | 4689 | 8BF8 | 0846 | 8948 | F646 |
| 0000021340 | 468B | 890C | F246 | 3E83 | 09EA | 7400 | 8D1A | EE46 |
| 0000021360 | 5016 | 6E9A | B41F | 831E | 04C4 | C00B | 0974 | 6E81 |
| 0000021400 | 10EA | 830E | EC5E | 8B00 | EA46 | 568B | 5EEC | C95F |
| 0000021420 | 90CB | 4E8B | 8B0E | 0646 | 568B | 1E08 | 7EC5 | 570A |
| 0000021440 | 071E | 93FC | C00A | 1374 | F983 | 750A | 0B0E | 79D2 |
| 0000021460 | B00A | AA2D | DBF7 | D283 | F700 | 8BDA | 92F7 | D233 |
| 0000021500 | C00B | 0274 | F1F7 | F793 | 92F1 | D387 | 3004 | 393C |
| 0000021520 | 0276 | 2704 | 8BAA | 0BC2 | 75C3 | 88E2 | 4F05 | 86AC |
| 0000021540 | 8805 | FF44 | 448D | 3B01 | 72C7 | 8CF2 | 58DA | 5F1F |
| 0000021560 | 8B5E | 5DE5 | 00CB | 8B55 | 57EC | 5356 | FF33 | 468B |
| 0000021600 | 0B08 | 7DC0 | 4711 | 568B | F706 | F7D8 | 1DDA | 0000 |
| 0000021620 | 4689 | 8908 | 0656 | 468B | 0B0C | 7DC0 | 4711 | 568B |
| 0000021640 | F70A | F7D8 | 1DDA | 0000 | 4689 | 890C | 0A56 | C00B |
| 0000021660 | 1575 | 4E8B | 8B0A | 0846 | D233 | F1F7 | D88B | 468B |
| 0000021700 | F706 | 8BF1 | EBD3 | 8B38 | 8BD8 | 0A4E | 568B | 8B08 |
| 0000021720 | 0646 | EBD1 | D9D1 | EAD1 | D8D1 | DB0B | F475 | F1F7 |
| 0000021740 | F08B | 66F7 | 910C | 468B | F70A | 03E6 | 72D1 | 3B0C |
| 0000021760 | 0856 | 0777 | 0672 | 463B | 7606 | 4E01 | D233 | 4F96 |
| 0000022000 | 0775 | DAF7 | D8F7 | DA83 | 5B00 | 5F5E | CA5D | 0008 |
| 0000022020 | 5A59 | E852 | 0046 | D88B | C28E | 265A | 478B | 3B04 |
| 0000022040 | 73C4 | 2B07 | F7C4 | 52D8 | CB51 | C033 | F9EB | 8B55 |
| 0000022060 | 57EC | 1E56 | 7EC4 | C506 | 0A76 | DF8B | 4E8B | E30E |
| 0000022100 | AC0C | C00A | 0374 | E2AA | 32F8 | F3C0 | 8BAA | 8CC3 |
| 0000022120 | 1FC2 | 5F5E | E58B | CB5D | 7BE9 | 0000 | 068E | 004C |
| 0000022140 | A126 | 0006 | 3B48 | 3406 | 770B | C107 | 06E0 | FFBA |
| 0000022160 | C3FF | 5357 | 6A51 | E80F | E5FE | C483 | 3B02 | 3406 |
| 0000022200 | 760B | 8B40 | 05D8 | 0004 | FC25 | 8BFF | C1C8 | 06E0 |
| 0000022220 | 8FBA | 5022 | 9A52 | 07DD | 0000 | C00B | 3275 | 8B49 |
| 0000022240 | 87F9 | 343E | 2B0B | 51CF | C147 | 06E7 | E1C1 | 5705 |
| 0000022260 | C28E | ABF3 | 595F | C726 | 0445 | 0200 | C783 | E240 |
| 0000022300 | 8BF5 | 6AC3 | E80F | E5D6 | C483 | 5902 | 5F5B | 9BEB |
| 0000022320 | 10B8 | E900 | DD96 | 8B55 | 57EC | 1E56 | 76C5 | 3306 |

THU MAR 14 17:28:26 1991 CRVN.EXE PAGE 11, LINE 591

| | | | | | | | | |
|---|---|---|---|---|---|---|---|---|
| 0000022340 | 99C0 | DB33 | 3CAC | 7420 | 3CFB | 7409 | 50F7 | 2D3C |
| 0000022360 | 0474 | 2B3C | 0175 | 3CAC | 7739 | 2C1F | 7230 | D11B |
| 0000022400 | D1E3 | 8BD2 | 8BCB | D1FA | D1E3 | D1D2 | D1E3 | 03D2 |
| 0000022420 | 13D9 | 03D7 | 83D8 | 00D2 | DCEB | 3C58 | 932D | 0775 |
| 0000022440 | D8F7 | D283 | F700 | 1FDA | 5F5E | CB5D | 581E | 4590 |
| 0000022460 | 8B55 | 1EEC | D88E | EC81 | 000A | 5657 | 068E | 0B4C |
| 0000022500 | C726 | 1606 | 0002 | FF00 | 7836 | FF0E | 7636 | 6A0E |
| 0000022520 | 1E03 | C968 | 8D02 | F646 | 5016 | C29A | 0023 | 8900 |
| 0000022540 | F846 | 013D | 1B00 | F7C0 | 3DD8 | 0000 | 0375 | 0BE9 |
| 0000022560 | 8B00 | F646 | 068E | 0B4C | A326 | 0216 | 068E | 0B4C |
| 0000022600 | C726 | 0006 | 0102 | 2600 | 06C7 | 0212 | 0020 | 36FF |
| 0000022620 | 0E78 | 36FF | 0E76 | 016A | 681E | 02DA | 468D | 16FA |
| 0000022640 | 9A50 | FFFF | 0000 | 4689 | 3DF8 | 0001 | C01B | D8F7 |
| 0000022660 | 003D | 7500 | E903 | 000B | 468B | 8EFA | 4C06 | 260B |
| 0000022700 | 12A3 | 5E02 | 835F | 02ED | E58B | 5D1F | CB4D | 581E |
| 0000022720 | 4590 | 8B55 | 1EEC | D88E | EC81 | 061A | 5657 | 86C7 |
| 0000022740 | FAF2 | 0000 | 86C6 | FAF4 | C600 | F286 | 00F9 | 681E |
| 0000022760 | 0316 | 681E | 0312 | 026A | 016A | FF9A | 00FF | 8900 |
| 0000023000 | F286 | 2BFA | A3C0 | 0E78 | 76A3 | 6A0E | 6A00 | 1E00 |
| 0000023020 | 7668 | 6A0E | 8D00 | FA86 | 16FD | 8D50 | FC46 | 5016 |
| 0000023040 | FF9A | 00FF | 8900 | FA86 | 3DFE | 0001 | C01B | 3D40 |
| 0000023060 | 0000 | 0375 | 34E9 | 8B00 | FA86 | 89FE | F486 | 8DFB |
| 0000023100 | FA86 | 16FD | 8D50 | F486 | 16FA | 9A50 | 0AB4 | 2483 |
| 0000023120 | C483 | FF08 | FC76 | 681E | 031A | 868D | F9F2 | 5016 |
| 0000023140 | BA9A | B10B | 8324 | 0AC4 | 3EE9 | C704 | C006 | 040C |
| 0000023160 | 8C03 | C21E | 1E0C | 1F68 | 1E03 | C068 | 9A0C | FFFF |
| 0000023200 | 0000 | 681E | 0324 | 36FF | 0CC2 | 36FF | 0CC0 | EA9A |
| 0000023220 | 140A | 8325 | 08C4 | 003D | 7400 | E903 | 0009 | 06C7 |
| 0000023240 | 0310 | 0001 | 06E9 | C700 | 1006 | 0003 | 1E00 | 7068 |
| 0000023260 | 9A0E | FFFF | 0000 | 3E83 | 0310 | 7500 | E903 | 000F |
| 0000023300 | 006A | 036A | 1F6A | 36FF | 0E70 | FF9A | 00FF | 9A00 |
| 0000023320 | FFFF | 0000 | 8689 | FAF2 | BE83 | FAF2 | 7500 | E903 |
| 0000023340 | 000A | 86C6 | FAF4 | C600 | F286 | 00F9 | FF9A | 00FF |
| 0000023360 | 9A00 | 234C | 059C | FF9A | 00FF | 9A00 | FFFF | 0000 |
| 0000023400 | 2D9A | 0025 | A300 | 0E12 | 1689 | 0E14 | FF9A | 00FF |
| 0000023420 | 5200 | 9A50 | 2565 | 0000 | 8689 | FAF2 | BE83 | FAF2 |
| 0000023440 | 7500 | E903 | 000A | 86C6 | FAF4 | C600 | F286 | 00F9 |
| 0000023460 | FF9A | 00FF | A300 | 02F4 | 1689 | 02F6 | 36FF | 02F6 |
| 0000023500 | 36FF | 02F4 | FF9A | 00FF | 9A00 | FFFF | 0000 | 8689 |
| 0000023520 | FAF2 | BE83 | FAF2 | 7500 | E903 | 000A | 86C6 | FAF4 |
| 0000023540 | C600 | F286 | 00F9 | 36FF | 02F6 | 36FF | 02F4 | FF6A |
| 0000023560 | FF6A | 8B9A | 0008 | 8300 | F2BE | 00FA | 0375 | 4DE9 |
| 0000023600 | 8000 | F4BE | 00FA | 0374 | 09E9 | B800 | 0000 | 00BA |
| 0000023620 | E900 | 0006 | 868D | FAF4 | D28C | 8689 | F9EA | 9689 |
| 0000023640 | F9EC | B6FF | FAF2 | B6FF | F9EC | B6FF | F9EA | BE80 |
| 0000023660 | F9F2 | 7400 | E903 | 0009 | 00B8 | BA00 | 0000 | 06E9 |
| 0000023700 | 8D00 | F286 | 8CF9 | 52D2 | 9A50 | FFFF | 0000 | FF9A |
| 0000023720 | 00FF | 8900 | F286 | 83FA | F2BE | 00FA | 0375 | 11E9 |
| 0000023740 | FF00 | F2B6 | 6AFA | 6A00 | 6A00 | 6A00 | 9A00 | 264B |
| 0000023760 | 0000 | FF9A | 00FF | A300 | 02F4 | 1689 | 02F6 | 36FF |
| 0000024000 | 02F6 | 36FF | 02F4 | F79A | 0026 | 9A00 | FFFF | 0000 |
| 0000024020 | 8689 | FAF2 | BE83 | FAF2 | 7500 | E903 | 0011 | B6FF |
| 0000024040 | FAF2 | 006A | 006A | 006A | 006A | 1C9A | 0027 | FF00 |
| 0000024060 | F636 | FF02 | F436 | 6A02 | 6AFF | 9AFF | 2593 | 0000 |
| 0000024100 | 3E83 | 0310 | 7500 | E903 | 000D | 026A | 026A | 006A |
| 0000024120 | 006A | DF9A | 0026 | 9A00 | FFFF | 0000 | 8689 | FAF2 |
| 0000024140 | BE83 | FAF2 | 7500 | E903 | 000E | 868B | FAF2 | 8689 |
| 0000024160 | FBF4 | 00E9 | E902 | 0032 | 068E | 0B4C | A026 | 0200 |
| 0000024200 | 9A50 | FFFF | 0000 | 8689 | FAF2 | 068E | 0B4C | A026 |

THU MAR 14 17:28:26 1991  CRVN.EXE  PAGE 12, LINE 650

| | | | | | | | | |
|---|---|---|---|---|---|---|---|---|
| 0000024220 | 0212 | 9A50 | FFFF | 0000 | 8689 | FAF2 | 068E | 0B4C |
| 0000024240 | FF26 | 1636 | 9A02 | FFFF | 0000 | 3E83 | 0310 | 7500 |
| 0000024260 | E903 | 000F | 006A | 036A | 1F6A | 36FF | 0E70 | 6F9A |
| 0000024300 | 0028 | 9A00 | 26F0 | 0000 | 18A3 | 890E | 1A16 | 9A0E |
| 0000024320 | FFFF | 0000 | 5052 | 349A | 0025 | 8900 | F286 | C7FA |
| 0000024340 | 0E06 | 020E | 8300 | F2BE | 00FA | 0375 | 11E9 | FF00 |
| 0000024360 | F2B6 | 6AFA | 6A00 | 6A00 | 6A00 | 9A00 | 2740 | 0000 |
| 0000024400 | FF9A | 00FF | 8900 | F286 | 83FA | F2BE | 00FA | 0375 |
| 0000024420 | 11E9 | FF00 | F2B6 | 6AFA | 6A00 | 6A00 | 6A00 | 9A00 |
| 0000024440 | 25EA | 0000 | 681E | 0325 | 868D | FBFA | 5016 | B49A |
| 0000024460 | 8C0A | 8327 | 08C4 | 868D | FBFA | 8689 | FBF6 | 968C |
| 0000024500 | FBF8 | 36FF | 0E78 | 36FF | 0E76 | 046A | 681E | 032C |
| 0000024520 | 868D | FBF6 | 5016 | FE9A | 0027 | FF00 | F8B6 | FFFB |
| 0000024540 | F6B6 | 8DFB | FC86 | 16FE | 9A50 | 0AB4 | 279E | C483 |
| 0000024560 | 1E08 | 3E68 | 8D03 | FC86 | 16FE | 9A50 | 0A4E | 27C6 |
| 0000024600 | C483 | 8908 | EE86 | 89F9 | F096 | 0BF9 | 74D0 | E903 |
| 0000024620 | 0009 | 86C7 | FBF4 | 0008 | DAE9 | FF00 | F0B6 | FFF9 |
| 0000024640 | EEB6 | 9AF9 | 08FA | 27D8 | C483 | 1E04 | 4068 | 8D03 |
| 0000024660 | FA86 | 16FB | 9A50 | 0AB4 | 2820 | C483 | 8D08 | FA86 |
| 0000024700 | 89FB | F686 | 8CFB | F896 | FFFB | 7836 | FF0E | 7636 |
| 0000024720 | 6A0E | 1E04 | 4468 | 8D03 | F686 | 16FB | 9A50 | FFFF |
| 0000024740 | 0000 | 8689 | FEFA | 013D | 1B00 | F7C0 | 3DD8 | 0000 |
| 0000024760 | 0375 | 18E9 | FF00 | F8B6 | FFFB | F6B6 | 9AFB | 0D2A |
| 0000025000 | 283C | C483 | 8904 | F686 | 89FB | F896 | 1EFB | 5868 |
| 0000025020 | FF03 | F8B6 | FFFB | F6B6 | 9AFB | 0AEA | 2876 | C483 |
| 0000025040 | 3D08 | 0000 | 0374 | 0AE9 | 6A00 | 9A01 | 2856 | 0000 |
| 0000025060 | 07E9 | 6A00 | 9A00 | FFFF | 0000 | 3E83 | 0310 | 7500 |
| 0000025100 | E903 | 000F | 006A | 036A | E16A | 36FF | 0E70 | EB9A |
| 0000025120 | 0024 | 6A00 | 6801 | 246E | FF68 | 9AFF | FFFF | 0000 |
| 0000025140 | 36FF | 0E78 | 36FF | 0E76 | 016A | FF9A | 00FF | B80U |
| 0000025160 | 0000 | 57E9 | FF00 | F4B6 | 6AFB | 6A00 | 6A00 | 6A00 |
| 0000025200 | 9A00 | 260E | 0000 | 36FF | 0E78 | 36FF | 0E76 | 016A |
| 0000025220 | 8B9A | 0028 | 6A00 | 6801 | 2751 | 7968 | 9A28 | 287C |
| 0000025240 | 0000 | 868B | FBF4 | 23E9 | FF00 | 7836 | FF0E | 7636 |
| 0000025260 | 6A0E | 9A01 | 28B1 | 0000 | 016A | B868 | 6828 | 28BD |
| 0000025300 | BE9A | 0028 | 8B00 | F486 | E9FB | 0000 | 5F5E | ED83 |
| 0000025320 | 8B02 | 1FE5 | 4D5D | 1ECB | 9058 | 5545 | EC8B | 8E1E |
| 0000025340 | 81D8 | 14EC | 5700 | C756 | EC46 | 0000 | 468D | 16EE |
| 0000025360 | 1E50 | 0E68 | 6A0E | 6A00 | 9A00 | 2A4C | 0000 | 4689 |
| 0000025400 | 3DF4 | 0000 | 0374 | F1E9 | FF00 | 0876 | 76FF | FF06 |
| 0000025420 | EE76 | 681E | 035C | 969A | 532C | 8329 | 0AC4 | 4689 |
| 0000025440 | C4EC | 065E | C426 | 261F | 3F83 | 7401 | E903 | 00C1 |
| 0000025460 | 2E9A | 6B0C | C92A | F046 | 5689 | 83F2 | FE3E | 0002 |
| 0000025500 | 0375 | 11E9 | 2B00 | 89C0 | FC46 | 4689 | C7FA | FE06 |
| 0000025520 | 0002 | E900 | 0014 | 468B | 8BF0 | F256 | 062B | 0CC4 |
| 0000025540 | 161B | 0CC6 | 4689 | 89FA | FC56 | 468B | 8BF0 | F256 |
| 0000025560 | C4A3 | 890C | C616 | 8B0C | FA46 | 568B | C4FC | 065E |
| 0000025600 | C426 | 261F | 4789 | 261C | 5789 | C71E | F446 | 0001 |
| 0000025620 | 7E83 | 00F4 | 0374 | 44E9 | 8300 | F67E | 74FF | E903 |
| 0000025640 | 0009 | 7E83 | FFF8 | 0375 | 32E9 | 8B00 | FA46 | 568B |
| 0000025660 | 39FC | F856 | 037E | 1CE9 | 7D00 | E903 | 0008 | 4639 |
| 0000025700 | 72F6 | E903 | 000F | 468B | 8BF6 | F856 | 4629 | 19FA |
| 0000025720 | FC56 | 08E9 | 2B00 | 89C0 | FC46 | 4689 | 8BFA | FA46 |
| 0000025740 | 568B | C4FC | 065E | C426 | 261F | 4789 | 2620 | 5789 |
| 0000025760 | 8B22 | EC46 | 74E9 | E902 | 0024 | 7E83 | 79F4 | 0374 |
| 0000026000 | 1BE9 | 8300 | 5C3E | 0003 | 0375 | 11E9 | 9A00 | 2B60 |
| 0000026020 | 0000 | 06C7 | 035C | 0000 | 06C7 | 035E | 0001 | 468D |
| 0000026040 | 16EE | 1E50 | 0E68 | 6A0E | 6A00 | 9A64 | 2B79 | 0000 |
| 0000026060 | 4689 | 3DF4 | 0000 | 0374 | F1E9 | FF00 | 0876 | 76FF |

THU MAR 14 17:28:26 1991 CRVN.EXE PAGE 13, LINE 709

| | | | | | | | | |
|---|---|---|---|---|---|---|---|---|
| 0000026100 | FF06 | EE76 | 681E | 035C | 969A | 852C | 832A | 0AC4 |
| 0000026120 | 4689 | C4EC | 065E | C426 | 261F | 3F83 | 7401 | E903 |
| 0000026140 | 00C1 | 2E9A | DB0C | 8928 | F046 | 5689 | 83F2 | FE3E |
| 0000026160 | 0002 | 0375 | 11E9 | 2B00 | 89C0 | FC46 | 4689 | C7FA |
| 0000026200 | FE06 | 0002 | E900 | 0014 | 468B | 8BF0 | F256 | 062B |
| 0000026220 | 0CC4 | 161B | 0CC6 | 4689 | 89FA | FC56 | 468B | 8BF0 |
| 0000026240 | F256 | C4A3 | 890C | C616 | 8B0C | FA46 | 568B | C4FC |
| 0000026260 | 065E | C426 | 261F | 4789 | 261C | 5789 | C71E | F446 |
| 0000026300 | 0001 | 7E83 | 00F4 | 0374 | 44E9 | 8300 | F67E | 74FF |
| 0000026320 | E903 | 0009 | 7E83 | FFF8 | 0375 | 32E9 | 8B00 | FA46 |
| 0000026340 | 568B | 39FC | F856 | 037E | 1CE9 | 7D00 | E903 | 0008 |
| 0000026360 | 4639 | 72F6 | E903 | 000F | 468B | 8BF6 | F856 | 4629 |
| 0000026400 | 19FA | FC56 | 08E9 | 2B00 | 89C0 | FC46 | 4689 | 8BFA |
| 0000026420 | FA46 | 568B | C4FC | 065E | C426 | 261F | 4789 | 2620 |
| 0000026440 | 5789 | 8B22 | EC46 | 42E9 | E901 | 001E | 7E83 | 79F4 |
| 0000026460 | 0374 | 15E9 | 8300 | 5E3E | 0003 | 0375 | 0BE9 | 9A00 |
| 0000026500 | FFFF | 0000 | 06C7 | 035E | 0000 | 468D | 16EE | 1E50 |
| 0000026520 | 0E68 | 6A0E | 6800 | 1388 | FF9A | 00FF | 8900 | F446 |
| 0000026540 | 793D | 7400 | E903 | 0003 | DFE9 | 83FF | F47E | 7400 |
| 0000026560 | E903 | 00F1 | 76FF | FF08 | 0676 | 76FF | 1EEE | 5C68 |
| 0000026600 | 9A03 | 2C96 | 2BBE | C483 | 890A | EC46 | 5EC4 | 2606 |
| 0000026620 | 1FC4 | 8326 | 013F | 0374 | C1E9 | 9A00 | 0C2E | 2939 |
| 0000026640 | 4689 | 89F0 | F256 | 3E83 | 02FE | 7500 | E903 | 0011 |
| 0000026660 | C02B | 4689 | 89FC | FA46 | 06C7 | 02FE | 0000 | 14E9 |
| 0000026700 | 8B00 | F046 | 568B | 2BF2 | C406 | 1B0C | C616 | 890C |
| 0000026720 | FA46 | 5689 | 8BFC | F046 | 568B | A3F2 | 0CC4 | 1689 |
| 0000026740 | 0CC6 | 468B | 8BFA | FC56 | 5EC4 | 2606 | 1FC4 | 8926 |
| 0000026760 | 1C47 | 8926 | 1E57 | 46C7 | 01F4 | 8300 | F47E | 7400 |
| 0000027000 | E903 | 0044 | 7E83 | FFF6 | 0374 | 09E9 | 8300 | F87E |
| 0000027020 | 75FF | E903 | 0032 | 468B | 8BFA | FC56 | 5639 | 7EF8 |
| 0000027040 | E903 | 001C | 037D | 08E9 | 3900 | F646 | 0372 | 0FE9 |
| 0000027060 | 8B00 | F646 | 568B | 29F8 | FA46 | 5619 | E9FC | 0008 |
| 0000027100 | C02B | 4689 | 89FC | FA46 | 468B | 8BFA | FC56 | 5EC4 |
| 0000027120 | 2606 | 1FC4 | 8926 | 2047 | 8926 | 2257 | 468B | E9EC |
| 0000027140 | 0009 | 06E9 | B800 | FFFF | 00E9 | 5E00 | 835F | 02ED |
| 0000027160 | E58B | 5D1F | CB4D | 581E | 4590 | 8B55 | 1EEC | D88E |
| 0000027200 | EC81 | 0006 | 5657 | 46C7 | 00FA | 8B00 | 0A46 | 66E9 |
| 0000027220 | 9A00 | FFFF | 0000 | 5EC4 | 260C | 0789 | 8926 | 0257 |
| 0000027240 | 219A | 0025 | 5200 | 9A50 | 2CDA | 0000 | 4689 | E9FA |
| 0000027260 | 0055 | E49A | 0026 | 5200 | 9A50 | 2627 | 0000 | 4689 |
| 0000027300 | 1EFA | 7A68 | FF0E | 0876 | 76FF | 9A06 | FFFF | 0000 |
| 0000027320 | 4689 | 83FC | FC7E | 7500 | E903 | 0006 | 468B | E9FC |
| 0000027340 | 002B | 5EC4 | 260C | 07C7 | 0E7A | 8C26 | 025F | 16E9 |
| 0000027360 | E900 | 0013 | 10E9 | 0B00 | 75C0 | E903 | FF93 | 7548 |
| 0000027400 | E903 | FFAE | EAE9 | B8FF | 0000 | 00E9 | 5E00 | 835F |
| 0000027420 | 02ED | E58B | 5D1F | CB4D | 581E | 4590 | 8B55 | 1EEC |
| 0000027440 | D88E | EC81 | 0024 | 5657 | 46C7 | 60FA | 8C03 | FC5E |
| 0000027460 | 46C7 | 00F4 | 2B00 | 89C0 | E646 | 4689 | 8EE4 | 4E06 |
| 0000027500 | 260B | 3E83 | FFFF | 7500 | E903 | 001D | 36FF | 02F2 |
| 0000027520 | 36FF | 02F0 | 468D | 16DC | 9A50 | FFFF | 0000 | C483 |
| 0000027540 | 3D08 | 0000 | 0374 | 0FE9 | 8E00 | 5006 | 260B | 3E83 |
| 0000027560 | 2E65 | 7500 | E903 | 003B | 681E | 0364 | 468D | 16E8 |
| 0000027600 | 8D50 | DC46 | 5016 | 468D | 16F6 | 6850 | 025B | 681E |
| 0000027620 | 037C | 36FF | 02EE | 36FF | 02EC | 36FF | 02F2 | 36FF |
| 0000027640 | 02F0 | FF9A | 00FF | 8300 | 1EC4 | 4689 | 89F6 | F856 |
| 0000027660 | 08E9 | 2B00 | 89C0 | F846 | 4689 | 8EF6 | 4E06 | 260B |
| 0000027700 | 3E83 | 2E4D | 7500 | E903 | 0048 | 7E83 | FEE0 | 0375 |
| 0000027720 | 3FE9 | FF00 | 0676 | 681E | 0368 | 468D | 16E8 | 8D50 |
| 0000027740 | F646 | 5016 | 468D | 16DC | 1E50 | 7C68 | 6803 | 025C |

THU MAR 14 17:28:26 1991 CRVN.EXE PAGE 14, LINE 768

| | | | | | | | | |
|---|---|---|---|---|---|---|---|---|
| 0000027760 | 36FF | 02EE | 36FF | 02EC | 36FF | 02F2 | 36FF | 02F0 |
| 0000030000 | 681E | 0374 | FF68 | 68FF | FFFF | FF9A | 00FF | 8300 |
| 0000030020 | 28C4 | FF9A | 00FF | 9A00 | FFFF | 0000 | 016A | 76FF |
| 0000030040 | 9A06 | 01FA | 0000 | 068E | 0B4E | 8326 | 643E | 002D |
| 0000030060 | 0375 | 09E9 | 8300 | E07E | 74FE | E903 | 000F | 068E |
| 0000030100 | 0B50 | 8326 | FF3E | 00FF | 0375 | 39E9 | 8D00 | E846 |
| 0000030120 | 5016 | 468D | 16F6 | 8D50 | DC46 | 5016 | 681E | 037C |
| 0000030140 | 6068 | FF02 | EE36 | FF02 | EC36 | FF02 | F236 | FF02 |
| 0000030160 | F036 | 9A02 | FFFF | 0000 | C483 | C71A | E246 | 0000 |
| 0000030200 | 06E9 | E900 | 0003 | 00E9 | 5E00 | 835F | 02ED | E58B |
| 0000030220 | 5D1F | CB4D | 581E | 4590 | 8B55 | 1EEC | D88E | EC81 |
| 0000030240 | 0004 | 5657 | FF9A | 00FF | 9A00 | FFFF | 0000 | 016A |
| 0000030260 | FF9A | 00FF | 8900 | FC46 | 003D | 7500 | E903 | 000F |
| 0000030300 | 76FF | 1EFC | 8968 | 9A03 | 0A66 | 2F09 | C483 | 9A06 |
| 0000030320 | FFFF | 0000 | 4689 | 3DFC | 0000 | 0375 | 0FE9 | FF00 |
| 0000030340 | FC76 | 681E | 03A2 | 669A | A40A | 832B | 06C4 | 339A |
| 0000030360 | 002E | 9A00 | 2E38 | 0000 | FF9A | 00FF | 8900 | FC46 |
| 0000030400 | 003D | 7500 | E903 | 000F | 76FF | 1EFC | BC68 | 9A03 |
| 0000030420 | 0A66 | 2EEA | C483 | 9A06 | FFFF | 0000 | 036A | 006A |
| 0000030440 | 006A | E19A | 0028 | 5E00 | 835F | 02ED | E58B | 5D1F |
| 0000030460 | CA4D | 0002 | 581E | 4590 | 8B55 | 1EEC | D88E | EC81 |
| 0000030500 | 0004 | 5657 | 5EC4 | 2606 | 3F83 | 7501 | E903 | 000E |
| 0000030520 | 76FF | FF08 | 0676 | FF9A | 00FF | 8900 | FC46 | 76FF |
| 0000030540 | FF08 | 0676 | FF9A | 00FF | E900 | 0000 | 5F5E | ED83 |
| 0000030560 | 8B02 | 1FE5 | 4D5D | 1ECB | 9058 | 5545 | EC8B | 8E1E |
| 0000030600 | 81D8 | 00EC | 5700 | FF56 | 0876 | 76FF | 9A06 | 2F77 |
| 0000030620 | 0000 | 00E9 | 5E00 | 835F | 02ED | E58B | 5D1F | CB4D |
| 0000030640 | 581E | 4590 | 8B55 | 1EEC | D88E | EC81 | 0136 | 5657 |
| 0000030660 | 00B8 | E900 | 01F6 | 86C7 | FEF0 | 0018 | 5EC4 | 2606 |
| 0000030700 | 478B | 261C | 578B | 891E | F286 | 89FE | F496 | C4FE |
| 0000030720 | 065E | 8B26 | 2047 | 8B26 | 2257 | 8689 | FED0 | 9689 |
| 0000030740 | FED2 | 5EC4 | 2B06 | 26C0 | 4789 | 261E | 4789 | C41C |
| 0000030760 | 065E | C02B | 8926 | 2247 | 8926 | 2047 | 5EC4 | 2606 |
| 0000031000 | 3F83 | 7501 | E903 | 0083 | 76FF | FF08 | 0676 | AE9A |
| 0000031020 | 002F | 8900 | CA86 | 6AFE | 9A18 | FFFF | 0000 | 8689 |
| 0000031040 | FECA | 868D | FECC | 5016 | FF9A | 00FF | 8900 | CA86 |
| 0000031060 | 83FE | CABE | 00FE | 0374 | 50E9 | 8300 | CCBE | FFFE |
| 0000031100 | 0374 | 0AE9 | 8300 | CEBE | FFFE | 0375 | 3CE9 | 8B00 |
| 0000031120 | CC86 | 8BFE | CE96 | 39FE | D296 | 7DFE | E903 | 0021 |
| 0000031140 | 037E | 09E9 | 3900 | D086 | 77FE | E903 | 0013 | 868B |
| 0000031160 | FECC | 968B | FECE | 8629 | FED0 | 9619 | FED2 | 0AE9 |
| 0000031200 | 2B00 | 89C0 | D286 | 89FE | D086 | 8BFE | D086 | 8BFE |
| 0000031220 | D296 | 89FE | F686 | 89FE | F896 | C4FE | 065E | 8326 |
| 0000031240 | 1A7F | 740B | E903 | 001D | 868D | FED6 | 5016 | FF9A |
| 0000031260 | 00FF | 8D00 | D686 | 16FE | 9A50 | FFFF | 0000 | 8689 |
| 0000031300 | FECA | 0FE9 | 8D00 | D686 | 16FE | 9A50 | FFFF | 0000 |
| 0000031320 | 8689 | FECA | BE83 | FECA | 7500 | E903 | 0010 | B6FF |
| 0000031340 | FECA | 681E | 03D2 | 669A | 900A | 8331 | 06C4 | 5EC4 |
| 0000031360 | 2606 | 7F83 | 1A1A | 0374 | 09E9 | C700 | D486 | 00FE |
| 0000031400 | E900 | 001C | 5EC4 | 2606 | 7F83 | 0B1A | 0374 | 09E9 |
| 0000031420 | C700 | D486 | 02FE | E900 | 0006 | 86C7 | FED4 | 0001 |
| 0000031440 | BE83 | FECA | 7400 | E903 | 004B | 5EC4 | 2606 | 3F83 |
| 0000031460 | 7401 | E903 | 0016 | 868D | FED6 | 5016 | B6FF | FED4 |
| 0000031500 | FF9A | 00FF | 8900 | CA86 | E9FE | 000F | 868D | FED6 |
| 0000031520 | 5016 | FF9A | 00FF | 8900 | CA86 | 83FE | CABE | 00FE |
| 0000031540 | 0375 | 10E9 | FF00 | CAB6 | 1EFE | EA68 | 9A03 | 0A66 |
| 0000031560 | 2F32 | C483 | 8306 | CABE | 00FE | 0375 | 26E9 | 8B00 |
| 0000031600 | F286 | 8BFE | F496 | C4FE | 065E | 8926 | 1C47 | 8926 |
| 0000031620 | 1E57 | 868B | FEF6 | 968B | FEF8 | 5EC4 | 2606 | 4789 |

THU MAR 14 17:28:26 1991 CRVN.EXE PAGE 15, LINE 827

| | | | | | | | | |
|---|---|---|---|---|---|---|---|---|
| 0000031640 | 2620 | 5789 | 8B22 | CA86 | E9FE | 0000 | 5F5E | ED83 |
| 0000031660 | 8B02 | 1FE5 | 4D5D | 1ECB | 9058 | 5545 | EC8B | 8E1E |
| 0000031700 | 81D8 | 2CEC | 5701 | 1E56 | E668 | 9A0C | FFFF | 0000 |
| 0000031720 | 0AA3 | A10E | 0E0A | 8689 | FED4 | 3E83 | 0CE6 | 7401 |
| 0000031740 | E903 | 0051 | 681E | 0CE6 | FF9A | 00FF | 8300 | D4BE |
| 0000031760 | 00FE | 0374 | 2DE9 | 8D00 | D686 | 16FE | 9A50 | 30CF |
| 0000032000 | 0000 | 868D | FED6 | 5016 | DA9A | 0030 | 8900 | FA46 |
| 0000032020 | 7E83 | 00FA | 0374 | 0BE9 | 8D00 | D686 | 16FE | 9A50 |
| 0000032040 | FFFF | 0000 | FF9A | 00FF | 9A00 | 0C2E | 3109 | C4A3 |
| 0000032060 | 890C | C616 | 8B0C | D486 | E9FE | 0000 | 5F5E | ED83 |
| 0000032100 | 8B02 | 1FE5 | 4D5D | 1ECB | 9058 | 5545 | EC8B | 8E1E |
| 0000032120 | 81D8 | CCEC | 5700 | 1E56 | 026B | 9A04 | FFFF | 0000 |
| 0000032140 | C483 | 8904 | F446 | 5689 | C7F6 | FA46 | 0406 | 5E8C |
| 0000032160 | C7FC | E046 | 0101 | C02B | 4689 | 89CC | CA46 | 068E |
| 0000032200 | 0B4E | 8326 | 4E3E | 0033 | 0375 | 1EE9 | FF00 | F236 |
| 0000032220 | FF02 | F036 | 8D02 | 3886 | 16FF | 9A50 | 2D7A | 0000 |
| 0000032240 | C483 | 3D08 | 0000 | 0374 | 0FE9 | 8E00 | 5006 | 260B |
| 0000032260 | 3E83 | 2D90 | 7500 | E903 | 003C | 681E | 040A | 468D |
| 0000032300 | 16CE | 8D50 | 3886 | 16FF | 8D50 | EE46 | 5016 | 0368 |
| 0000032320 | 1E03 | 3E68 | FF05 | EE36 | FF02 | EC36 | FF02 | F236 |
| 0000032340 | FF02 | F036 | 9A02 | 2DC3 | 0000 | C483 | 891E | EE46 |
| 0000032360 | 5689 | E9F0 | 0008 | C02B | 4689 | 89F0 | EE46 | 86C7 |
| 0000032400 | FF36 | 0000 | 86C7 | FF44 | 0000 | 00B8 | 8900 | 4086 |
| 0000032420 | 89FF | 4286 | 89FF | 4686 | 8DFF | 4886 | 16FF | 9A50 |
| 0000032440 | 0C8A | 33AC | C483 | 8E04 | 4E06 | 260B | 3E83 | 33B8 |
| 0000032460 | 7500 | E903 | 004D | BE83 | FF3C | 75FE | E903 | 0043 |
| 0000032500 | 868D | FF48 | 5016 | 681E | 040E | 468D | 16CE | 8D50 |
| 0000032520 | EE46 | 5016 | 868D | FF38 | 5016 | 681E | 053E | 1368 |
| 0000032540 | FF03 | EE36 | FF02 | EC36 | FF02 | F236 | FF02 | F036 |
| 0000032560 | 1E02 | 1668 | 6804 | 3400 | 0368 | 9A34 | 3406 | 0000 |
| 0000032600 | C483 | 8D2A | 4886 | 16FF | 9A50 | 0CDE | 3410 | C483 |
| 0000032620 | 8E04 | 4E06 | 260B | 3E83 | 2DE2 | 7500 | E903 | 004D |
| 0000032640 | BE83 | FF3C | 75FE | E903 | 0043 | 868D | FF48 | 5016 |
| 0000032660 | 681E | 041E | 468D | 16CE | 8D50 | EE46 | 5016 | 868D |
| 0000032700 | FF38 | 5016 | 681E | 053E | 1568 | FF03 | EE36 | FF02 |
| 0000032720 | EC36 | FF02 | F236 | FF02 | F036 | 1E02 | 2668 | 6804 |
| 0000032740 | 2E25 | 2868 | 9A2E | 2E2B | 0000 | C483 | 9A2A | 23EE |
| 0000032760 | 3423 | 4689 | 3DE2 | 0000 | 0375 | 0BE9 | FF00 | E276 |
| 0000033000 | 389A | 542D | 8334 | 02C4 | 5868 | 6802 | 00AF | 3A9A |
| 0000033020 | 0034 | 6800 | 04B0 | AF68 | 9A00 | FFFF | 0000 | 46C7 |
| 0000033040 | 00EC | 8300 | EC7E | 7501 | E903 | 141F | 468D | 16E4 |
| 0000033060 | 9A50 | 28F7 | 324C | C483 | 8904 | DA46 | 7E83 | 00DA |
| 0000033100 | 0375 | 00E9 | 8300 | FC3E | 0002 | 0374 | 2DE9 | 8E00 |
| 0000033120 | 4C06 | 260B | 3E83 | 0216 | 7401 | E903 | 001E | 5EC4 |
| 0000033140 | 26E4 | 478B | 261C | 578B | C41E | E45E | 2B26 | 2047 |
| 0000033160 | 1B26 | 2257 | 0601 | 0300 | 1611 | 0302 | 5EC4 | 26E4 |
| 0000033200 | 478B | E91A | 12F9 | 3E83 | 02F8 | 7400 | E903 | 000B |
| 0000033220 | EC9A | 0034 | C700 | F806 | 0102 | 8B00 | E446 | 568B |
| 0000033240 | 05E6 | 0024 | 5052 | FF9A | 00FF | C400 | E45E | 8926 |
| 0000033260 | 2487 | FF01 | E676 | 76FF | 9AE4 | FFFF | 0000 | 63E9 |
| 0000033300 | 8313 | F83E | 0002 | 0374 | 0BE9 | 9A00 | FFFF | 0000 |
| 0000033320 | 06C7 | 02F8 | 0001 | FF9A | 00FF | C400 | E45E | 8A26 |
| 0000033340 | 2447 | 9A50 | FFFF | 0000 | 5EC4 | 26E4 | 8789 | 0124 |
| 0000033360 | 3E83 | 02FA | 7500 | E903 | 0005 | FF9A | 00FF | FF00 |
| 0000033400 | E676 | 76FF | 9AE4 | FFFF | 0000 | 17E9 | 9A13 | 2EC5 |
| 0000033420 | 0000 | C02B | 4689 | 89EA | E846 | 468B | 8BE4 | E656 |
| 0000033440 | 2405 | 5200 | 8D50 | E846 | 5016 | 4E8D | 16DC | 6A51 |
| 0000033460 | FF02 | F876 | FF9A | 00FF | 8900 | E246 | 76FF | FFEA |
| 0000033500 | E876 | FF9A | 00FF | FF00 | EA76 | 76FF | 9AE8 | FFFF |

THU MAR 14 17:28:26 1991 CRVN.EXE PAGE 16, LINE 886

| | | | | | | | | |
|---|---|---|---|---|---|---|---|---|
| 0000033520 | 0000 | 468B | C4E2 | E45E | 8926 | 2487 | FF01 | E676 |
| 0000033540 | 76FF | 9AE4 | 35E2 | 0000 | B9E9 | 9A12 | 360C | 0000 |
| 0000033560 | C02B | 4689 | 89EA | E846 | 468B | 8BE4 | E656 | 2405 |
| 0000033600 | 5200 | 8D50 | E846 | 5016 | 4E8D | 16DC | 6A51 | FF02 |
| 0000033620 | F876 | 559A | 0035 | 8900 | E246 | 76FF | FFEA | E876 |
| 0000033640 | FF9A | 00FF | FF00 | EA76 | 76FF | 9AE8 | FFFF | 0000 |
| 0000033660 | 468B | C4E2 | E45E | 8926 | 2487 | FF01 | E676 | 76FF |
| 0000033700 | 9AE4 | 3604 | 0000 | 5BE9 | 9A12 | 352E | 0000 | FF9A |
| 0000033720 | 00FF | C400 | E45E | C726 | 2487 | 0001 | FF00 | E676 |
| 0000033740 | 76FF | 9AE4 | 3626 | 0000 | 39E9 | 9A12 | 2ECA | 0000 |
| 0000033760 | FF9A | 00FF | C400 | E45E | C726 | 2487 | 0001 | FF00 |
| 0000034000 | E676 | 76FF | 9AE4 | 3526 | 0000 | 17E9 | C712 | 3486 |
| 0000034020 | 00FF | 8300 | EC7E | 7402 | E903 | 000E | 46C7 | 00EC |
| 0000034040 | 9A00 | 3245 | 0000 | 8689 | FF34 | 7E83 | 00EC | 0374 |
| 0000034060 | 2BE9 | 8301 | F83E | 0002 | 0374 | 0BE9 | 9A00 | 37AE |
| 0000034100 | 0000 | 06C7 | 02F8 | 0001 | 76FF | FFE6 | E476 | FF9A |
| 0000034120 | 00FF | 8900 | F246 | BE83 | FF36 | 7500 | E903 | 0020 |
| 0000034140 | 5EC4 | 26E4 | 3F83 | 7401 | E903 | 000E | 76FF | FFE6 |
| 0000034160 | E476 | C09A | B82F | 8336 | 04C4 | 86C7 | FF36 | 0000 |
| 0000034200 | 7E83 | 01F2 | 0374 | 06E9 | C700 | 3686 | 01FF | FF00 |
| 0000034220 | E676 | 76FF | 9AE4 | 2F54 | 3342 | C483 | C404 | E45E |
| 0000034240 | 8926 | 2487 | 8E01 | 4E06 | 260B | 3E83 | 32A5 | 7500 |
| 0000034260 | E903 | 0058 | BE83 | FF3C | 75FE | E903 | 004E | 5EC4 |
| 0000034300 | 26E4 | 478A | 2A24 | 50E4 | 5EC4 | 26E4 | 77FF | 1E1A |
| 0000034320 | 2E68 | 8D04 | CE46 | 5016 | 468D | 16EE | 8D50 | 3886 |
| 0000034340 | 16FF | 1E50 | 3E68 | 6805 | 038A | 36FF | 02EE | 36FF |
| 0000034360 | 02EC | 36FF | 02F2 | 36FF | 02F0 | 681E | 0444 | 9668 |
| 0000034400 | 6833 | 3399 | 9C9A | 0033 | 8300 | 2AC4 | 5EC4 | 26E4 |
| 0000034420 | 3F83 | 7401 | E903 | 0038 | 3E83 | 02FA | 7400 | E903 |
| 0000034440 | 000B | 76FF | FFE6 | E476 | FF9A | 00FF | 8100 | 34BE |
| 0000034460 | F3FF | 7406 | E903 | 0015 | 0C6A | 3A9A | 0030 | 8900 |
| 0000034500 | DA46 | 5868 | 6802 | 00AF | 2F9A | 0034 | E900 | 000B |
| 0000034520 | 76FF | FFE6 | E476 | FF9A | 00FF | E900 | 0067 | 7E83 |
| 0000034540 | 03EC | 0374 | 13E9 | FF00 | E676 | 76FF | 9AE4 | FFFF |
| 0000034560 | 0000 | 5EC4 | 26E4 | 8789 | 0124 | 7E83 | 04EC | 0374 |
| 0000034600 | 42E9 | 8300 | F83E | 0002 | 0374 | 0BE9 | 9A00 | 34B1 |
| 0000034620 | 0000 | 06C7 | 02F8 | 0001 | 76FF | FFE6 | E476 | FF9A |
| 0000034640 | 00FF | 8900 | C846 | 7E83 | 01C8 | 0374 | 16E9 | FF00 |
| 0000034660 | E676 | 76FF | 9AE4 | 2F54 | 3695 | C483 | C404 | E45E |
| 0000034700 | 8926 | 2487 | E901 | 105C | 76FF | FFE6 | E476 | FF9A |
| 0000034720 | 00FF | C400 | E45E | 8926 | 2487 | FF01 | E676 | 76FF |
| 0000034740 | 9AE4 | 389F | 0000 | 3BE9 | C410 | E45E | 8326 | 7C7F |
| 0000034760 | 7401 | E903 | 004A | 868D | FF40 | 5016 | 76FF | FFEC |
| 0000035000 | FA36 | FF02 | F836 | 9A02 | 48F8 | 3893 | C483 | C70A |
| 0000035020 | EC46 | 0003 | 06C7 | 02F8 | 0001 | D89A | 0038 | C700 |
| 0000035040 | FA06 | 0002 | 9A00 | 38E3 | 0000 | 76FF | FFE6 | E476 |
| 0000035060 | 679A | 0038 | C400 | E45E | 8926 | 2487 | E901 | 0038 |
| 0000035100 | 76FF | FFE6 | E476 | FF9A | 00FF | C400 | E45E | 8926 |
| 0000035120 | 2487 | 9A01 | 3911 | 0000 | 169A | 0039 | 8D00 | 4086 |
| 0000035140 | 16FF | 8D50 | EC46 | 5016 | 681E | 02FA | 681E | 02F8 |
| 0000035160 | 469A | C749 | 8338 | 10C4 | 76FF | FFE6 | E476 | 3C9A |
| 0000035200 | 0039 | E900 | 0F9E | 5EC4 | 26E4 | 7F83 | 017C | 0374 |
| 0000035220 | 4AE9 | 8D00 | 4086 | 16FF | FF50 | EC76 | 36FF | 02FA |
| 0000035240 | 36FF | 02F8 | F89A | 3048 | 8339 | 0AC4 | 46C7 | 03EC |
| 0000035260 | C700 | F806 | 0102 | 9A00 | 365E | 0000 | 06C7 | 02FA |
| 0000035300 | 0000 | F79A | 0034 | FF00 | E676 | 76FF | 9AE4 | 3904 |
| 0000035320 | 0000 | 5EC4 | 26E4 | 8789 | 0124 | 38E9 | FF00 | E676 |
| 0000035340 | 76FF | 9AE4 | FFFF | 0000 | 5EC4 | 26E4 | 8789 | 0124 |
| 0000035360 | 0F9A | 002F | 9A00 | FFFF | 0000 | 868D | FF40 | 5016 |

THU MAR 14 17:28:26 1991 CRVN.EXE PAGE 17, LINE 945

| | | | | | | | | |
|---|---|---|---|---|---|---|---|---|
| 0000035400 | 468D | 16EC | 1E50 | FA68 | 1E02 | F868 | 9A02 | 4946 |
| 0000035420 | 39A9 | C483 | FF10 | E676 | 76FF | 9AE4 | 395D | 0000 |
| 0000035440 | 01E9 | FF0F | E676 | 76FF | 9AE4 | FFFF | 0000 | 5EC4 |
| 0000035460 | 26E4 | 8789 | 0124 | 76FF | FFE6 | E476 | 7A9A | 0039 |
| 0000035500 | E900 | 0EE0 | 006A | FF9A | 00FF | C400 | E45E | 8926 |
| 0000035520 | 2487 | FF01 | E676 | 76FF | 9AE4 | 399B | 0000 | C3E9 |
| 0000035540 | FF0E | E676 | 76FF | 9AE4 | FFFF | 0000 | 5EC4 | 26E4 |
| 0000035560 | 8789 | 0124 | 76FF | FFE6 | E476 | C99A | 0039 | E900 |
| 0000035600 | 0EA2 | 681E | U44A | 149A | D80B | 8337 | 04C4 | D00B |
| 0000035620 | 0375 | 1BE9 | 9A00 | FFFF | 0000 | 5EC4 | 26E4 | 8789 |
| 0000035640 | 0124 | 76FF | FFE6 | E476 | 849A | 0035 | E900 | 0E74 |
| 0000035660 | 06C7 | 02FA | 0001 | 1B9A | 0035 | C700 | F806 | 0102 |
| 0000035700 | 9A00 | 383B | 0000 | 76FF | FFE6 | E476 | FF9A | 00FF |
| 0000035720 | C400 | E45E | 8926 | 2487 | FF01 | E676 | 76FF | 9AE4 |
| 0000035740 | 3802 | 0000 | 068E | 0B4E | 8326 | CC3E | 0036 | 0375 |
| 0000035760 | 4FE9 | 8300 | 3CBE | FEFF | 0375 | 45E9 | C400 | E45E |
| 0000036000 | FF26 | 24B7 | 1E01 | 5A68 | 8D04 | CE46 | 5016 | 468D |
| 0000036020 | 16EE | 8D50 | 3886 | 16FF | 1E50 | 3E68 | 6805 | 041E |
| 0000036040 | 36FF | 02EE | 36FF | 02EC | 36FF | 02F2 | 36FF | 02F0 |
| 0000036060 | 681E | 046D | 1F68 | 6837 | 3722 | 259A | 0037 | 8300 |
| 0000036100 | 28C4 | DFE9 | 830D | EC7E | 7402 | E903 | 0013 | 46C7 |
| 0000036120 | 00EC | FF00 | E676 | 76FF | 9AE4 | 31D7 | 3AA0 | C483 |
| 0000036140 | 9A04 | 3C15 | 0000 | 06C7 | 02F8 | 0001 | 868D | FF40 |
| 0000036160 | 5016 | 76FF | FFEC | FA36 | FF02 | F836 | 9A02 | 48F8 |
| 0000036200 | 3AD9 | C483 | C70A | FA06 | 0102 | 9A00 | 39D7 | 0000 |
| 0000036220 | 76FF | FFE6 | E476 | 1E9A | 0032 | C400 | E45E | 8926 |
| 0000036240 | 2487 | 8D01 | 4086 | 16FF | 8D50 | EC46 | 5016 | 681E |
| 0000036260 | 02FA | 681E | 02F8 | 469A | D049 | 833B | 10C4 | 76FF |
| 0000036300 | FFE6 | E476 | FF9A | 00FF | 8E00 | 4E06 | 260B | 3E83 |
| 0000036320 | 3B54 | 7500 | E903 | 0055 | BE83 | FF3C | 75FE | E903 |
| 0000036340 | 004B | 5EC4 | 26E4 | 77FF | C42A | E45E | FF26 | 2877 |
| 0000036360 | 681E | 0475 | 468D | 16CE | 8D50 | EE46 | 5016 | 868D |
| 0000036400 | FF38 | 5016 | 681E | 053E | 3A68 | FF04 | EE36 | FF02 |
| 0000036420 | EC36 | FF02 | F236 | FF02 | F036 | 1E02 | 9068 | 6804 |
| 0000036440 | 3B9E | A168 | 9A3B | 3BA4 | 0000 | C483 | 8E2A | 4E06 |
| 0000036460 | 260B | 3E83 | 3A0B | 7500 | E903 | 004F | BE83 | FF3C |
| 0000036500 | 75FE | E903 | 0045 | 5EC4 | 26E4 | B7FF | 0124 | 681E |
| 0000036520 | 0498 | 468D | 16CE | 8D50 | EE46 | 50!6 | 868D | FF38 |
| 0000036540 | 5016 | 681E | 053E | 3D68 | FF04 | EE36 | FF02 | EC36 |
| 0000036560 | FF02 | F236 | FF02 | F036 | 1E02 | A668 | 6804 | 3A55 |
| 0000036600 | 5868 | 9A3A | 3A5B | 0000 | C483 | E928 | 0C96 | 46C7 |
| 0000036620 | 00E2 | 8300 | EC7E | 7504 | E903 | 0040 | 868D | FF40 |
| 0000036640 | 5016 | 76FF | FFEC | FA36 | FF02 | F836 | 9A02 | 48F8 |
| 0000036660 | 3C7C | C483 | 9A0A | 3C99 | 0000 | 4689 | 83E2 | E27E |
| 0000036700 | 7500 | E903 | 0016 | 468B | C4E2 | E45E | 8926 | 2487 |
| 0000036720 | FF01 | E676 | 76FF | 9AE4 | 3C88 | 0000 | 7E83 | 00E2 |
| 0000036740 | 0374 | 87E9 | C700 | EC46 | 0004 | 3E83 | 02F8 | 7400 |
| 0000036760 | E903 | 000B | E29A | 0039 | C700 | F806 | 0102 | 8300 |
| 0000037000 | FA3E | 0002 | 0375 | 0BE9 | 9A00 | 3846 | 0000 | 06C7 |
| 0000037020 | 02FA | 0000 | 76FF | FFE6 | E476 | BF9A | 0037 | 8900 |
| 0000037040 | C846 | 7E83 | 03C8 | 0374 | 36E9 | 9A00 | FFFF | 0000 |
| 0000037060 | 4689 | 83E2 | E27E | 7400 | E903 | 0025 | 749A | 0038 |
| 0000037100 | 9A00 | 3879 | 0000 | 868D | FF40 | 5016 | 468D | 16EC |
| 0000037120 | 1E50 | FA68 | 1E02 | F868 | 9A02 | 4946 | 382A | C483 |
| 0000037140 | FF10 | E676 | 76FF | 9AE4 | 3CBB | 0000 | B5E9 | 830B |
| 0000037160 | EC7E | 7504 | E903 | 002F | FF9A | 00FF | 8900 | E246 |
| 0000037200 | 7E83 | 00E2 | 0375 | 19E9 | 8B00 | E246 | 5EC4 | 26E4 |
| 0000037220 | 8789 | 0124 | 76FF | FFE6 | E476 | 009A | 003A | E900 |
| 0000037240 | 0005 | 46C7 | 04EC | FF00 | E676 | 76FF | 9AE4 | 3F32 |

THU MAR 14 17:28:26 1991 CRVN.EXE PAGE 18, LINE 1004

| | | | | | | | | |
|---|---|---|---|---|---|---|---|---|
| 0000037260 | 0000 | 4689 | 83C8 | C87E | 7403 | E903 | 0016 | 4C9A |
| 0000037300 | 003C | 8900 | E246 | 7E83 | 00E2 | 0374 | 05E9 | C700 |
| 0000037320 | EC46 | 0000 | 76FF | FFE6 | E476 | 7B9A | 003E | E900 |
| 0000037340 | 0B42 | 3E83 | 02F8 | 7400 | E903 | 000B | 219A | 003F |
| 0000037360 | C700 | F806 | 0102 | 8300 | EC7E | 7400 | E903 | 0095 |
| 0000037400 | 46C7 | 02EC | 8B00 | E446 | 568B | 1EE6 | E6BF | 8B0C |
| 0000037420 | 1EF0 | 8E07 | B9DA | 0094 | A5F3 | C41F | E45E | 8326 |
| 0000037440 | 013F | 0374 | 6EE9 | 1E00 | E668 | 9A0C | FFFF | 0000 |
| 0000037460 | 4689 | 83DA | DA7E | 7500 | E903 | 0059 | 068E | 0B4E |
| 0000037500 | 8326 | 133E | 003E | 0375 | 4AE9 | 8300 | 3CBE | FEFF |
| 0000037520 | 0375 | 40E9 | FF00 | DA76 | 681E | 04AE | 468D | 16CE |
| 0000037540 | 8D50 | EE46 | 5016 | 868D | FF38 | 5016 | 681E | 053E |
| 0000037560 | 9468 | FF04 | EE36 | FF02 | EC36 | FF02 | F236 | FF02 |
| 0000037600 | F036 | 1E02 | C468 | 6804 | 3E58 | 5B68 | 9A3E | 3E5E |
| 0000037620 | 0000 | C483 | 8328 | EC7E | 7402 | E903 | 0130 | 76FF |
| 0000037640 | FFE6 | E476 | 499A | 003F | C400 | E45E | 8926 | 2487 |
| 0000037660 | C401 | E45E | 8326 | 013F | 0374 | 8BE9 | 8300 | FA3E |
| 0000037700 | 0002 | 0374 | 7EE9 | C400 | E45E | 8326 | 24BF | 0001 |
| 0000037720 | 0374 | 70E9 | FF00 | E676 | 76FF | 9AE4 | FFFF | 0000 |
| 0000037740 | 4689 | 83DA | DA7E | 7500 | E903 | 0059 | 068E | 0B4E |
| 0000037760 | 8326 | 943E | 003E | 0375 | 4AE9 | 8300 | 3CBE | FEFF |
| 0000040000 | 0375 | 40E9 | FF00 | DA76 | 681E | 04CC | 468D | 16CE |
| 0000040020 | 8D50 | EE46 | 5016 | 868D | FF38 | 5016 | 681E | 053E |
| 0000040040 | B068 | FF04 | EE36 | FF02 | EC36 | FF02 | F236 | FF02 |
| 0000040060 | F036 | 1E02 | E268 | 6804 | 3EDE | E168 | 9A3E | 3EE4 |
| 0000040100 | 0000 | C483 | E928 | 0083 | 5EC4 | 26E4 | 3F83 | 7400 |
| 0000040120 | E903 | 000B | 76FF | FFE6 | E476 | 839A | 003F | C400 |
| 0000040140 | E45E | 8326 | 24BF | 0001 | 0375 | 5EE9 | 8E00 | 4E06 |
| 0000040160 | 260B | 3E83 | 3AF0 | 7500 | E903 | 004F | BE83 | FF3C |
| 0000040200 | 75FE | E903 | 0045 | 5EC4 | 26E4 | B7FF | 0124 | 681E |
| 0000040220 | 04EA | 468D | 16CE | 8D50 | EE46 | 5016 | 868D | FF38 |
| 0000040240 | 5016 | 681E | 053E | C568 | FF04 | EE36 | FF02 | EC36 |
| 0000040260 | FF02 | F236 | FF02 | F036 | 1E02 | 0168 | 6805 | 3B40 |
| 0000040300 | 4368 | 9A3B | 3B46 | 0000 | C483 | E928 | 0067 | 7E83 |
| 0000040320 | 03EC | 0374 | 16E9 | FF00 | E676 | 76FF | 9AE4 | 378E |
| 0000040340 | 0000 | 5EC4 | 26E4 | 8789 | 0124 | 48E9 | 8300 | EC7E |
| 0000040360 | 7404 | E903 | 003F | 3E83 | 02F8 | 7400 | E903 | 000B |
| 0000040400 | 829A | 003A | C700 | F806 | 0102 | FF00 | E676 | 76FF |
| 0000040420 | 9AE4 | 3C3B | 0000 | 4689 | 83C8 | C87E | 7401 | E903 |
| 0000040440 | 0013 | 76FF | FFE6 | E476 | 859A | 002F | C400 | E45E |
| 0000040460 | 8926 | 2487 | E901 | 08EC | 46C7 | 02EC | FF00 | E676 |
| 0000040500 | 76FF | 9AE4 | FFFF | 0000 | 5EC4 | 26E4 | 8789 | 0124 |
| 0000040520 | 5EC4 | 26E4 | 3F83 | 7400 | E903 | 000B | 76FF | FFE6 |
| 0000040540 | E476 | F89A | 003B | E900 | 08BA | 7E83 | 02EC | 0374 |
| 0000040560 | 1BE9 | C700 | EC46 | 0000 | 76FF | FFE6 | E476 | EC9A |
| 0000040600 | 0031 | C400 | E45E | 8926 | 2487 | E901 | 000A | 5EC4 |
| 0000040620 | 26E4 | 87C7 | 0124 | 00C8 | 5EC4 | 26E4 | 3F83 | 7501 |
| 0000040640 | E903 | 000B | 76FF | FFE6 | E476 | A29A | 0040 | E900 |
| 0000040660 | 0872 | C02B | 02A3 | A303 | 0300 | 5EC4 | 26E4 | 7F83 |
| 0000040700 | 0124 | 0374 | 6BE9 | C700 | FC06 | 0102 | 1E00 | 0968 |
| 0000040720 | 9A05 | 0A66 | 4010 | C483 | 8304 | EC7E | 7402 | E903 |
| 0000040740 | 0013 | 46C7 | 00EC | FF00 | E676 | 76FF | 9AE4 | 31D7 |
| 0000040760 | 4031 | C483 | C704 | 3686 | 01FF | 9A00 | 4109 | 0000 |
| 0000041000 | 4689 | 9ADA | 3C2A | 0000 | 06C7 | 02FA | 0000 | 2E9A |
| 0000041020 | 590C | A340 | 0CC4 | 1689 | 0CC6 | 3E83 | 02F8 | 7400 |
| 0000041040 | E903 | 000B | 0D9A | 003D | C700 | F806 | 0102 | E900 |
| 0000041060 | 003F | 681E | 0519 | 669A | 8C0A | 8340 | 04C4 | 06C7 |
| 0000041100 | 02FC | 0000 | AA9A | 0040 | C700 | FA06 | 0102 | C700 |
| 0000041120 | 3686 | 00FF | 8300 | EC7E | 7402 | E903 | 0013 | 46C7 |

THU MAR 14 17:28:26 1991 CRVN.EXE PAGE 19, LINE 1063

| | | | | | | | | |
|---|---|---|---|---|---|---|---|---|
| 0000041140 | 00EC | FF00 | E676 | 76FF | 9AE4 | 31D7 | 40EB | C483 |
| 0000041160 | C404 | E45E | C726 | 2487 | 0001 | FF00 | E676 | 76FF |
| 0000041200 | 9AE4 | 4101 | 0000 | 9BE9 | 9A07 | 3AAC | 0000 | 06C7 |
| 0000041220 | 02FA | 0001 | 179A | 0041 | C700 | F806 | 0002 | 9A00 |
| 0000041240 | 4122 | 0000 | FF9A | 00FF | 9A00 | FFFF | 0000 | 86C7 |
| 0000041260 | FF36 | 0000 | 7E83 | 02EC | 0374 | 13E9 | C700 | EC46 |
| 0000041300 | 0000 | 76FF | FFE6 | E476 | D79A | 7C31 | 833A | 04C4 |
| 0000041320 | 5EC4 | 26E4 | 87C7 | 0124 | 0000 | 76FF | FFE6 | E476 |
| 0000041340 | FB9A | 003C | E900 | 073C | 5D9A | 003C | 8900 | DA46 |
| 0000041360 | 06C7 | 02FA | 0001 | 149A | 002F | C700 | F806 | 0002 |
| 0000041400 | 9A00 | FFFF | 0000 | 7E83 | 02EC | 0374 | 13E9 | C700 |
| 0000041420 | EC46 | 0000 | 76FF | FFE6 | E476 | D79A | 9131 | 8341 |
| 0000041440 | 04C4 | 6B9A | 0041 | 9A00 | 4170 | 0000 | 86C7 | FF36 |
| 0000041460 | 0000 | 5EC4 | 26E4 | 87C7 | 0124 | 0000 | 76FF | FFE6 |
| 0000041500 | E476 | A79A | 0041 | E900 | 06DA | BB9A | 0042 | 9A00 |
| 0000041520 | 42C0 | 0000 | 86C7 | FF36 | 0000 | 7E83 | 02EC | 0374 |
| 0000041540 | 13E9 | C700 | EC46 | 0000 | 76FF | FFE6 | E476 | D79A |
| 0000041560 | C831 | 8341 | 04C4 | 5EC4 | 26E4 | 87C7 | 0124 | 0000 |
| 0000041600 | 76FF | FFE6 | E476 | BF9A | 0041 | E900 | 0696 | 5EC4 |
| 0000041620 | 26E4 | 87C7 | 0124 | 0000 | 76FF | FFE6 | E476 | 1C9A |
| 0000041640 | 0042 | 6A00 | 9A00 | 2D38 | 4208 | C483 | C702 | EC46 |
| 0000041660 | 0001 | 6FE9 | 8306 | EC7E | 7503 | E903 | 0042 | 3E83 |
| 0000041700 | 02F8 | 7400 | E903 | 000B | B09A | 0042 | C700 | F806 |
| 0000041720 | 0102 | C400 | E45E | 8326 | 003F | 0374 | 21E9 | FF00 |
| 0000041740 | E676 | 76FF | 9AE4 | 2F97 | 427D | C483 | C404 | E45E |
| 0000041760 | 8926 | 2487 | FF01 | E676 | 76FF | 9AE4 | 3FCB | 0000 |
| 0000042000 | 21E9 | 8306 | EC7E | 7404 | E903 | 003A | 006A | 006A |
| 0000042020 | CE9A | 003C | 8900 | C846 | 7E83 | 02C8 | 0374 | 00E9 |
| 0000042040 | 9A00 | FFFF | 0000 | 003D | 7500 | E903 | 0015 | 1C9A |
| 0000042060 | 0040 | 9A00 | 4024 | 0000 | 06C7 | 02FA | 0000 | 629A |
| 0000042100 | 003C | E900 | 003C | 7E83 | 02EC | 0374 | 13E9 | C700 |
| 0000042120 | EC46 | 0000 | 76FF | FFE6 | E476 | D79A | F431 | 833F |
| 0000042140 | 04C4 | 5EC4 | 26E4 | 87C7 | 0124 | 0000 | 76FF | FFE6 |
| 0000042160 | E476 | FF9A | 00FF | 6800 | 0258 | AF68 | 9A00 | 3769 |
| 0000042200 | 0000 | 9FE9 | 8305 | F83E | 0002 | 0374 | 0BE9 | 9A00 |
| 0000042220 | 4045 | 0000 | 06C7 | 02F8 | 0001 | C59A | 0040 | 9A00 |
| 0000042240 | 40CA | 0000 | 86C7 | FF36 | 0000 | 7E83 | 02EC | 0374 |
| 0000042260 | 13E9 | C700 | EC46 | 0000 | 76FF | FFE6 | E476 | D79A |
| 0000042300 | BA31 | 8343 | 04C4 | 3E83 | 02FC | 7500 | E903 | 000D |
| 0000042320 | 4F9A | 0043 | 3D00 | 0000 | 0374 | 0EE9 | FF00 | E676 |
| 0000042340 | 76FF | 9AE4 | 43DD | 0000 | 4689 | 6ADA | 9A28 | 43E7 |
| 0000042360 | 0000 | 4689 | 68DA | 0258 | AF68 | 9A00 | 433A | 0000 |
| 0000042400 | 76FF | FFE6 | E476 | FF9A | 00FF | C400 | E45E | 8926 |
| 0000042420 | 2487 | 6801 | 04B0 | AF68 | 9A00 | 43F5 | 0000 | 06C7 |
| 0000042440 | 02FE | 0001 | 3E83 | 02FC | 7500 | E903 | 0022 | CA9A |
| 0000042460 | 0043 | 3D00 | 0000 | 0375 | 15E9 | 9A00 | 4435 | 0000 |
| 0000042500 | 3A9A | 0044 | C700 | FA06 | 0002 | 9A00 | 4445 | 0000 |
| 0000042520 | 76FF | FFE6 | E476 | 509A | 0044 | E900 | 04C6 | 3E83 |
| 0000042540 | 02F8 | 7400 | E903 | 000B | 629A | 0044 | C700 | F806 |
| 0000042560 | 0102 | 9A00 | 446D | 0000 | 729A | 0044 | C700 | 3686 |
| 0000042600 | 00FF | 8300 | EC7E | 7402 | E903 | 0013 | 46C7 | 00EC |
| 0000042620 | FF00 | E676 | 76FF | 9AE4 | 31D7 | 4493 | C483 | 8304 |
| 0000042640 | FC3E | 0002 | 0375 | 0DE9 | 9A00 | 4428 | 0000 | 003D |
| 0000042660 | 7400 | E903 | 000E | 76FF | FFE6 | E476 | 2F9A | 0030 |
| 0000042700 | 8900 | DA46 | 2A6A | 9B9A | 0044 | 8900 | DA46 | 5868 |
| 0000042720 | 6802 | 00AF | 139A | 0044 | FF00 | E676 | 76FF | 9AE4 |
| 0000042740 | FFFF | 0000 | 5EC4 | 26E4 | 8789 | 0124 | B068 | 6804 |
| 0000042760 | 00AF | A99A | 0044 | C700 | FE06 | 0102 | 8300 | FC3E |
| 0000043000 | 0002 | 0375 | 22E9 | 9A00 | 4242 | 0000 | 003D | 7500 |

THU MAR 14 17:28:26 1991 CRVN.EXE PAGE 20, LINE 1122

| | | | | | | | | |
|---|---|---|---|---|---|---|---|---|
| 0000043020 | E903 | 0015 | 4F9A | 0042 | 9A00 | 4254 | 0000 | 06C7 |
| 0000043040 | 02FA | 0000 | 5F9A | 0042 | FF00 | E676 | 76FF | 9AE4 |
| 0000043060 | FFFF | 0000 | EDE9 | 8303 | F83E | 0002 | 0374 | 0BE9 |
| 0000043100 | 9A00 | 41E9 | 0000 | 06C7 | 02F8 | 0001 | 439A | 0041 |
| 0000043120 | 9A00 | 4148 | 0000 | 86C7 | FF36 | 0000 | 7E83 | 02EC |
| 0000043140 | 0374 | 13E9 | C700 | EC46 | 0000 | 76FF | FFE6 | E476 |
| 0000043160 | D79A | 3D31 | 8341 | 04C4 | 2B6A | 5B9A | 0037 | 8900 |
| 0000043200 | DA46 | 5868 | 6802 | 00AF | 9E9A | 0042 | 8E00 | 4C06 |
| 0000043220 | 260B | 3E83 | 0216 | 7400 | E903 | 0015 | 5EC4 | 26E4 |
| 0000043240 | 478B | 261C | 578B | A31E | 0300 | 1689 | 0302 | 13E9 |
| 0000043260 | C400 | E45E | 8B26 | 2047 | 8B26 | 2257 | 0601 | 0300 |
| 0000043300 | 1611 | 0302 | 76FF | FFE6 | E476 | 36FF | 0302 | 36FF |
| 0000043320 | 0300 | FF9A | 00FF | C400 | E45E | 8926 | 2487 | 6801 |
| 0000043340 | 04B0 | AF68 | 9A00 | 431C | 0000 | C02B | 02A3 | A303 |
| 0000043360 | 0300 | 5EC4 | 26E4 | BF83 | 0124 | 7500 | E903 | 0056 |
| 0000043400 | 068E | 0B4E | 8326 | 633E | 003D | 0375 | 47E9 | 8300 |
| 0000043420 | 3CBE | FEFF | 0375 | 3DE9 | 1E00 | 2A68 | 8D05 | CE46 |
| 0000043440 | 5016 | 468D | 16EE | 8D50 | 3886 | 16FF | 1E50 | 3E68 |
| 0000043460 | 6805 | 05EB | 36FF | 02EE | 36FF | 02EC | 36FF | 02F2 |
| 0000043500 | 36FF | 02F0 | 681E | 0536 | A868 | 683D | 3DAB | AE9A |
| 0000043520 | 003D | 8300 | 26C4 | 76FF | FFE6 | E476 | 019A | 0046 |
| 0000043540 | E900 | 02C0 | 186A | 529A | 0046 | 8900 | DA46 | 068E |
| 0000043560 | 0B4C | 8326 | 163E | 0002 | 0374 | 15E9 | C400 | E45E |
| 0000043600 | 8B26 | 1C47 | 8B26 | 1E57 | 00A3 | 8903 | 0216 | E903 |
| 0000043620 | 0013 | 5EC4 | 26E4 | 478B | 2620 | 578B | 0122 | 0006 |
| 0000043640 | 1103 | 0216 | FF03 | E676 | 76FF | FFE4 | 0236 | FF03 |
| 0000043660 | 0036 | 9A03 | FFFF | 0000 | 5EC4 | 26E4 | 8789 | 0124 |
| 0000043700 | C02B | 02A3 | A303 | 0300 | 86C7 | FF36 | 0000 | 5EC4 |
| 0000043720 | 26E4 | 3F83 | 7400 | E903 | 000B | 76FF | FFE6 | E476 |
| 0000043740 | FF9A | 00FF | E900 | 023C | 7E83 | 02EC | 0374 | 13E9 |
| 0000043760 | C700 | EC46 | 0000 | 76FF | FFE6 | E476 | D79A | 3931 |
| 0000044000 | 8346 | 04C4 | 5EC4 | 26E4 | 3F83 | 7401 | E903 | 0011 |
| 0000044020 | 76FF | FFE6 | E476 | C09A | 0F2F | 8347 | 04C4 | 52E9 |
| 0000044040 | FF00 | E676 | 76FF | 9AE4 | 4304 | 0000 | 4689 | 6ADA |
| 0000044060 | 9A1A | 430E | 0000 | 4689 | FFDA | E676 | 76FF | 9AE4 |
| 0000044100 | 30EC | 0000 | 5EC4 | 26E4 | 8789 | 0124 | 5EC4 | 26E4 |
| 0000044120 | BF83 | 0124 | 7400 | E903 | 000E | 76FF | FFE6 | E476 |
| 0000044140 | FF9A | 00FF | E900 | 000B | 76FF | FFE6 | E476 | 779A |
| 0000044160 | 0043 | E900 | 01AE | 76FF | FFE6 | E476 | FF9A | 00FF |
| 0000044200 | C400 | E45E | 8926 | 2487 | FF01 | E676 | 76FF | 9AE4 |
| 0000044220 | 46D1 | 0000 | 8DE9 | FF01 | E676 | 76FF | 9AE4 | FFFF |
| 0000044240 | 0000 | 5EC4 | 26E4 | 8789 | 0124 | 76FF | FFE6 | E476 |
| 0000044260 | F29A | 0046 | E900 | 016C | 76FF | FFE6 | E476 | FF9A |
| 0000044300 | 00FF | C400 | E45E | 8926 | 2487 | FF01 | E676 | 76FF |
| 0000044320 | 9AE4 | 4728 | 0000 | 4BE9 | 8D01 | 4086 | 16FF | 8D50 |
| 0000044340 | EC46 | 5016 | 681E | 02FA | 681E | 02F8 | 469A | E149 |
| 0000044360 | 8342 | 10C4 | FF9A | 00FF | C400 | E45E | 8926 | 2487 |
| 0000044400 | FF01 | E676 | 76FF | 9AE4 | 4749 | 0000 | 15E9 | FF01 |
| 0000044420 | E676 | 76FF | 9AE4 | FFFF | 0000 | 5EC4 | 26E4 | 8789 |
| 0000044440 | 0124 | 76FF | FFE6 | E476 | 639A | 0041 | E900 | 00F4 |
| 0000044460 | 76FF | FFE6 | E476 | 6A9A | 1F4A | 8346 | 04C4 | 5EC4 |
| 0000044500 | 26E4 | 8789 | 0124 | 76FF | FFE6 | E476 | 959A | 0047 |
| 0000044520 | E900 | 00D0 | FF9A | 00FF | C400 | E45E | 8926 | 2487 |
| 0000044540 | E901 | 00C0 | 5EC4 | 26E4 | 87C7 | 0124 | 0000 | 76FF |
| 0000044560 | FFE6 | E476 | B09A | 0046 | E900 | 00A8 | A5E9 | 4800 |
| 0000044600 | 493D | 7600 | E903 | FFDC | E0D1 | 2E93 | A7FF | 47B0 |
| 0000044620 | 34A6 | 34E1 | 3A65 | 4784 | 352D | 358B | 35E9 | 360B |
| 0000044640 | 362D | 362D | 362D | 3D02 | 4784 | 3F58 | 3F8A | 4784 |
| 0000044660 | 4784 | 4784 | 39A2 | 4784 | 41D5 | 4784 | 4784 | 4584 |

THU MAR 14 17:28:26 1991 CRVN.EXE PAGE 21, LINE 1181

| | | | | | | | | |
|---|---|---|---|---|---|---|---|---|
| 0000044700 | 4784 | 4608 | 4784 | 4784 | 4784 | 4784 | 4784 | 4784 |
| 0000044720 | 4784 | 3FD2 | 40A9 | 4108 | 416A | 4774 | 41AE | 42A5 |
| 0000044740 | 4784 | 437E | 4457 | 4784 | 4784 | 37E8 | 4784 | 4784 |
| 0000044760 | 3809 | 38A6 | 4784 | 3943 | 3964 | 3981 | 4784 | 4696 |
| 0000045000 | 46B7 | 46D8 | 4784 | 4784 | 4784 | 4784 | 46F9 | 472F |
| 0000045020 | 3BAE | 3C8F | 3C8F | 4784 | 3C8F | 4784 | 4784 | 4750 |
| 0000045040 | 4784 | 4223 | 5EC4 | 26E4 | 3F83 | 7500 | E903 | 000C |
| 0000045060 | 5EC4 | 26E4 | 3F83 | 7403 | E903 | 000C | FF9A | 00FF |
| 0000045100 | 5200 | 9A50 | 08CD | 0000 | D8E9 | 8EEB | 4E06 | 260B |
| 0000045120 | 3E83 | 4527 | 7500 | E903 | 000A | BE83 | FF3C | 74FE |
| 0000045140 | E903 | 000F | 068E | 0B50 | 8326 | D23E | 0032 | 0375 |
| 0000045160 | 54E9 | C700 | 3E86 | 00FF | FF00 | CC76 | 76FF | 8DCA |
| 0000045200 | 3E86 | 16FF | FF50 | E076 | 76FF | FFFC | FA76 | 4E8D |
| 0000045220 | 16CE | 8D51 | EE4E | 5116 | 8E8D | FF38 | 5116 | 681E |
| 0000045240 | 053E | 4E68 | FF06 | EE36 | FF02 | EC36 | FF02 | F236 |
| 0000045260 | FF02 | F036 | 9A02 | FFFF | 0000 | C483 | 8B28 | 3E86 |
| 0000045300 | E9FF | 0009 | 06E9 | B800 | 0000 | 00E9 | 5E00 | 835F |
| 0000045320 | 02ED | E58B | 5D1F | CB4D | 581E | 4590 | 8B55 | 1EEC |
| 0000045340 | D88E | EC81 | 0000 | 5657 | 5EC4 | 260C | 7F83 | 0006 |
| 0000045360 | 0374 | 26E9 | 8B00 | 0646 | 5EC4 | 260C | 0789 | 468B |
| 0000045400 | C408 | 0C5E | 8926 | 0247 | 5EC4 | 260C | 47C7 | 0106 |
| 0000045420 | 8B00 | 0A46 | 5EC4 | 260C | 4789 | 5E04 | 835F | 02ED |
| 0000045440 | E58B | 5D1F | CB4D | 581E | 4590 | 8B55 | 1EEC | D88E |
| 0000045460 | EC81 | 0000 | 5657 | 5EC4 | 2612 | 7F83 | 0006 | 0375 |
| 0000045500 | 73E9 | C400 | 125E | 8B26 | 0247 | 5EC4 | 260A | 0789 |
| 0000045520 | 5EC4 | 2612 | 078B | 5EC4 | 2606 | 0789 | 5EC4 | 2612 |
| 0000045540 | 478B | C404 | 0E5E | 8926 | C407 | 125E | C726 | 0647 |
| 0000045560 | 0000 | 5EC4 | 2612 | 7F83 | 0102 | 0374 | 08E9 | 9A00 |
| 0000045600 | 4065 | 0000 | 11E9 | 9A00 | 4361 | 0000 | 2E9A | 590C |
| 0000045620 | A347 | 0CC4 | 1689 | 0CC6 | 5EC4 | 2612 | 3F83 | 7401 |
| 0000045640 | E903 | 0008 | 899A | 0043 | E900 | 000A | B59A | 0040 |
| 0000045660 | 9A00 | 40CD | 0000 | 5F5E | ED83 | 8B02 | 1FE5 | 4D5D |
| 0000045700 | 1ECB | 9058 | 5545 | EC8B | 8E1E | 81D8 | 00EC | 5700 |
| 0000045720 | 8356 | F83E | 0002 | 0374 | 0BE9 | 9A00 | 49C5 | 0000 |
| 0000045740 | 06C7 | 02F8 | 0001 | 76FF | FF08 | 0676 | C79A | 0034 |
| 0000045760 | 5E00 | 835F | 02ED | E58B | 5D1F | CB4D | 581E | 4590 |
| 0000046000 | 8B55 | 1EEC | D88E | EC81 | 0000 | 5657 | 3E83 | 02F8 |
| 0000046020 | 7400 | E903 | 000B | FC9A | 0049 | C700 | F806 | 0102 |
| 0000046040 | 9A00 | 49A8 | 0000 | 468A | 5006 | 049A | 0035 | 8300 |
| 0000046060 | FA3E | 0002 | 0375 | 05E9 | 9A00 | 49A0 | 0000 | 5F5E |
| 0000046100 | ED83 | 8B02 | 1FE5 | 4D5D | 00CB | 581E | 4590 | 8B55 |
| 0000046120 | 1EEC | D88E | EC81 | 0004 | 5657 | 068E | 0B52 | A126 |
| 0000046140 | 0204 | 5EC4 | 2606 | 4739 | 7528 | E903 | 0035 | 5EC4 |
| 0000046160 | 2606 | 478B | 8E28 | 5206 | 260B | 04A3 | 6A02 | C465 |
| 0000046200 | 065E | 006A | FF26 | 2877 | BC9A | 004A | 8900 | FC46 |
| 0000046220 | 666A | 5EC4 | 6A06 | 2600 | 77FF | 9A28 | 4AF2 | 0000 |
| 0000046240 | 4689 | 8EFC | 5206 | 260B | 06A1 | C402 | 065E | 3926 |
| 0000046260 | 2A47 | 0375 | 22E9 | C400 | 065E | 8B26 | 2A47 | 068E |
| 0000046300 | 0B52 | A326 | 0206 | 6B6A | 5EC4 | 6A06 | 2600 | 77FF |
| 0000046320 | 9A2A | 4B73 | 0000 | 4689 | 8EFC | 5206 | 260B | 12A1 |
| 0000046340 | C402 | 065E | 3926 | 3647 | 0375 | 1CE9 | C400 | 065E |
| 0000046360 | 8B26 | 3647 | 068E | 0B52 | A326 | 0212 | A026 | 0212 |
| 0000046400 | 9A5D | 26B4 | 0000 | 4689 | C4FC | 065E | 8B26 | 3A47 |
| 0000046420 | 068E | 0B52 | A326 | 0216 | 5EC4 | 2606 | 77FF | 9A3A |
| 0000046440 | 26C6 | 0000 | 068E | 0B52 | A126 | 021C | 5EC4 | 2606 |
| 0000046460 | 4739 | 7540 | E903 | 0022 | 5EC4 | 2606 | 478B | 8E40 |
| 0000046500 | 5206 | 260B | 1CA3 | 6A02 | C46C | 065E | 006A | FF26 |
| 0000046520 | 4077 | A99A | 004B | 8900 | FC46 | 068E | 0B52 | A126 |
| 0000046540 | 021E | 5EC4 | 2606 | 4739 | 7542 | E903 | 0022 | 5EC4 |

THU MAR 14 17:28:26 1991 CRVN.EXE PAGE 22, LINE 1240

| | | | | | | | | |
|---|---|---|---|---|---|---|---|---|
| 0000046560 | 2606 | 478B | 8E42 | 5206 | 260B | 1EA3 | 6A02 | C467 |
| 0000046600 | 065E | 006A | FF26 | 4277 | FF9A | 00FF | 8900 | FC46 |
| 0000046620 | 00B8 | E900 | 0000 | 5F5E | ED83 | 8B02 | 1FE5 | 4D5D |
| 0000046640 | 8ECB | 0200 | 5F00 | 0120 | 0000 | 0300 | 0602 | 0633 |
| 0000046660 | 5500 | 0200 | B100 | 0222 | 0000 | 0500 | 6C02 | 0645 |
| 0000046700 | 4B00 | 0200 | C900 | 0308 | 0000 | 0300 | 4201 | 012E |
| 0000046720 | 0500 | 0300 | 4301 | 012F | 0700 | 0300 | 4501 | 0100 |
| 0000046740 | 0800 | 0300 | E401 | 011B | 8900 | 0300 | 2901 | 011E |
| 0000046760 | 8A00 | 0300 | 7301 | 0126 | 0B00 | 0200 | 6100 | 0507 |
| 0000047000 | 0000 | 0300 | AB01 | 0108 | 8C00 | 0300 | D602 | 0648 |
| 0000047020 | 6400 | 0300 | 6401 | 0148 | 8D00 | 0300 | 5C01 | 0126 |
| 0000047040 | 8E00 | 0300 | C801 | 012C | 8F00 | 0300 | 6001 | 0346 |
| 0000047060 | 0100 | 0300 | D601 | 033B | 0400 | 0300 | B601 | 0339 |
| 0000047100 | 0500 | 0300 | 1A01 | 0129 | 1600 | 0300 | D401 | 0345 |
| 0000047120 | 0600 | 0300 | B701 | 033A | 0700 | 0300 | 9E01 | 0124 |
| 0000047140 | 9800 | 0300 | 0001 | 0344 | 0800 | 0300 | 0D01 | 044A |
| 0000047160 | 0100 | 0300 | DF01 | 033C | 0900 | 0300 | 4C01 | 0328 |
| 0000047200 | 0A00 | 0300 | 4B01 | 044A | 0300 | 0300 | EE01 | 0338 |
| 0000047220 | 0B00 | 0300 | 9402 | 062E | 7400 | 0300 | CD01 | 0449 |
| 0000047240 | 0400 | 0300 | EF01 | 0337 | 0C00 | 0300 | EC01 | 042C |
| 0000047260 | 0500 | 0300 | 6E01 | 0335 | 0D00 | 0300 | 8801 | 0339 |
| 0000047300 | 0E00 | 0300 | 9901 | 0443 | 0600 | 0300 | 6401 | 033F |
| 0000047320 | 0F00 | 0300 | 1901 | 042F | 0800 | 0300 | 2701 | 0343 |
| 0000047340 | 1000 | 0300 | 3701 | 044A | 0900 | 0300 | F301 | 0344 |
| 0000047360 | 1100 | 0300 | E201 | 0117 | 2100 | 0300 | 2801 | 0108 |
| 0000047400 | 2200 | 0300 | D401 | 0228 | 1A00 | 0300 | B201 | 052C |
| 0000047420 | 0200 | 0300 | 5C01 | 0443 | 0A00 | 0300 | 9D01 | 0346 |
| 0000047440 | 1200 | 0300 | 2C01 | 0426 | 0B00 | 0300 | 7301 | 0531 |
| 0000047460 | 0300 | 0300 | 4901 | 0330 | 1300 | 0300 | 3801 | 052F |
| 0000047500 | 0400 | 0300 | 8701 | 0445 | 0C00 | 0300 | 5D01 | 0548 |
| 0000047520 | 0500 | 0300 | A901 | 034A | 1500 | 0300 | B601 | 0122 |
| 0000047540 | 2600 | 0300 | 4001 | 044B | 0E00 | 0300 | FC01 | 053D |
| 0000047560 | 0600 | 0300 | 1301 | 0426 | 0F00 | 0300 | 8C01 | 0535 |
| 0000047600 | 0700 | 0300 | 1101 | 0336 | 1700 | 0300 | 2201 | 044B |
| 0000047620 | 1000 | 0300 | 6101 | 0531 | 0800 | 0300 | 4A01 | 0339 |
| 0000047640 | 1800 | 0300 | 2E01 | 042A | 1100 | 0300 | C101 | 052C |
| 0000047660 | 0A00 | 0300 | F101 | 0442 | 1200 | 0300 | A201 | 0426 |
| 0000047700 | 1300 | 0300 | 6F02 | 0645 | 8300 | 0300 | ED01 | 0339 |
| 0000047720 | 1B00 | 0300 | 9301 | 0542 | 0B00 | 0300 | 4201 | 044A |
| 0000047740 | 1400 | 0300 | EF01 | 0335 | 1C00 | 0300 | 8101 | 0546 |
| 0000047760 | 0C00 | 0300 | 4C01 | 053D | 0D00 | 0300 | D201 | 0349 |
| 0000050000 | 1D00 | 0300 | 9401 | 0443 | 1500 | 0300 | 4101 | 0224 |
| 0000050020 | 2600 | 0300 | 4801 | 0446 | 1600 | 0300 | 8F01 | 0546 |
| 0000050040 | 0E00 | 0300 | EF01 | 0425 | 1700 | 0300 | 9F01 | 033F |
| 0000050060 | 1F00 | 0300 | C101 | 0535 | 0F00 | 0300 | A201 | 0528 |
| 0000050100 | 1000 | 0300 | C501 | 043D | 1800 | 0300 | 6701 | 0339 |
| 0000050120 | 2000 | 0300 | 5101 | 0525 | 1100 | 0300 | 7801 | 0426 |
| 0000050140 | 1900 | 0300 | CC01 | 0335 | 2100 | 0300 | 0D01 | 0525 |
| 0000050160 | 1200 | 0300 | 0601 | 0145 | 3200 | 0300 | FE01 | 033E |
| 0000050200 | 2200 | 0300 | 6A01 | 0525 | 1300 | 0300 | 6F01 | 0436 |
| 0000050220 | 1B00 | 0300 | 1501 | 0347 | 2300 | 0300 | 7B01 | 0223 |
| 0000050240 | 2C00 | 0300 | 2101 | 0427 | 1C00 | 0300 | 2901 | 0332 |
| 0000050260 | 2400 | 0300 | 4001 | 0532 | 1500 | 0300 | 6C01 | 0443 |
| 0000050300 | 1D00 | 0300 | 3601 | 0347 | 2500 | 0300 | D301 | 042C |
| 0000050320 | 1E00 | 0300 | 0901 | 0532 | 1600 | 0300 | 7501 | 0347 |
| 0000050340 | 2600 | 0300 | 1701 | 0325 | 2700 | 0300 | 6301 | 0535 |
| 0000050360 | 1700 | 0300 | 5A01 | 044A | 1F00 | 0300 | DA01 | 0534 |
| 0000050400 | 1800 | 0300 | DF01 | 0346 | 2800 | 0300 | F001 | 032E |
| 0000050420 | 2900 | 0300 | 7D01 | 0545 | 1900 | 0300 | 4201 | 0536 |

```
THU MAR 14 17:28:26 1991  CRVN.EXE  PAGE 23, LINE 1299

0000050440   1A00   0300   7C02   0632   9200   0300   3101   0342
0000050460   2A00   0300   BD01   011C   3A00   0300   F001   0524
0000050500   1B00   0300   5101   0338   2B00   0300   3B01   011B
0000050520   3B00   0300   1C01   0525   1C00   0300   BE01   0346
0000050540   2C00   0300   A001   0118   3C00   0300   4901   0537
0000050560   1D00   0300   7701   0227   3700   0300   EA01   0535
0000050600   1F00   0300   6D01   0547   2000   0300   7701   0537
0000050620   2100   0300   E501   053A   2200   0300   FF01   011B
0000050640   4400   0300   BC02   0632   9E00   0300   1201   011B
0000050660   4600   0300   D101   022E   4000   0300   3301   011C
0000050700   4B00   0500   DE00   0128   B400   032E   5B01   011B
0000050720   4D00   0300   ED01   0100   5500   0300   3101   0101
0000050740   5900   0200   6902   0645   4B00   0300   D201   0124
0000050760   5E00   0300   B301   0235   5700   0500   7202   0648
0000051000   2F00   0300   1B01   0224   6000   0500   8B02   0648
0000051020   3D00   0000   0000   0000   0000   0000   0000   0000
0000051040   0000   0000   11B0   0000   0000   0000   0000   0000
0000051060   0000   0000   0000   0000   0000   0000   0000   0000
*
0000051140   0000   0000   0200   0000   0000   0000   0000   0000
0000051160   0000   0000   0000   0000   0000   0000   0000   0000
*
0000051240   0000   0000   0200   0000   0000   0000   0000   0000
0000051260   0000   0000   0000   0000   0000   0000   0000   0000
*
0000051340   0000   0000   0200   0000   0000   0000   0000   0000
0000051360   0000   0000   0000   0000   534D   5220   6E75   542D
0000051400   6D69   2065   694C   7262   7261   2079   202D   6F43
0000051420   7970   6972   6867   2074   6328   2029   3931   3039
0000051440   202C   694D   7263   736F   666F   2074   6F43   7072
0000051460   0018   0000   0000   0000   0000   0006   0000   0000
0000051500   0000   0005   0000   0000   0000   0000   0000   0000
0000051520   0000   0000   435F   465F   4C49   5F45   4E49   4F46
0000051540   003D   0001   FFFF   0000   0000   0000   0000   0000
0000051560   0000   0000   0000   0000   0001   0100   8181   0081
0000051600   0000   0000   0000   0000   0000   0000   0000   0000
*
0000052160   0000   0000   0000   0000   0000   0000   0A0A   0A0A
0000052200   0A0A   0A0A   0A0A   0A0A   0A0A   0A0A   0A0A   0A0A
*
0000052560   0A0A   0A0A   0A0A   0A0A   0A0A   0A0A   0000   0000
0000052600   0000   0000   0000   0000   0000   0000   FFFF   0000
0000052620   0000   0000   0000   0000   0000   0000   0000   0000
0000052640   0000   0000   0003   2000   7263   5F76   706E   6F72
0000052660   632E   6300   7672   702E   5400   3231   5F33   4146
0000052700   5453   525F   5045   414C   0059   3154   3332   445F
0000052720   4645   5541   544C   545F   4D49   0045   02B8   02F2
0000052740   02C3   FFFF   0000   0000   0000   0001   0000   0001
0000052760   0000   0000   0000   0000   0000   0000   0000   0000
0000053000   0000   5243   0056   5243   0056   2528   2964   5000
0000053020   4952   004F   6700   7073   6F6D   006E   3154   3332
0000053040   475F   5053   535F   464F   5754   5241   0045   0072
0000053060   464F   0046   3154   3332   4D5F   554F   4553   545F
0000053100   4152   4B43   4E49   0047   4E4F   0000   0000   0000
0000053120   6E69   0074   6E69   0074   6873   7475   6F64   6E77
0000053140   2520   0064   5F62   7265   6F72   0072   7263   5F76
0000053160   6873   7475   6F64   6E77   6400   5F62   6574   6D72
0000053200   6E69   7461   2065   7473   7461   7375   3D20   2520
0000053220   0064   7367   5F70   6574   6D72   6E69   7461   2065
```

```
THU MAR 14 17:28:26 1991  CRVN.EXE  PAGE 24, LINE 1358

0000053240   7473   7461   7375   3D20   2520   0064   7573   2074
0000053260   6C63   736F   2065   7473   7461   7375   3D20   2520
0000053300   0064   4309   7061   7574   6572   7320   6E79   2063
0000053320   7265   6F72   2072   6425   000A   7953   636E   6320
0000053340   6572   7461   6465   202C   7265   6F72   2072   6425
0000053360   000A   5243   0056   6E69   0074   6E69   0074   6164
0000053400   6574   2520   0073   5F62   6564   7562   0067   6974
0000053420   656D   2520   0073   5F62   6564   7562   0067   6B20
0000053440   7965   7420   7079   2065   6425   7620   6C61   6575
0000053460   2520   0078   5F62   626B   0064   5453   4241   4C49
0000053500   5449   5F59   4843   4345   004B   656C   7261   206E
0000053520   7473   7461   7375   3D20   2520   0A64   6200   645F
0000053540   6265   6775   6700   7465   6C5F   636F   7461   726F
0000053560   203A   2078   203D   6425   7920   3D20   2520   0064
0000053600   5F62   6564   7562   0067   7320   6174   7574   2073
0000053620   203D   6425   000A   5F62   6564   7562   0067   7263
0000053640   6165   6574   6920   696E   2074   7274   6520   7272
0000053660   2520   0064   5F62   7265   6F72   0072   7263   6165
0000053700   6574   6D20   766F   2065   7274   6520   7272   2520
0000053720   0064   5F62   7265   6F72   0072   6D20   766F   2065
0000053740   7274   6361   206B   7265   6F72   2072   203D   6425
0000053760   6200   645F   6265   6775   0900   6553   2074   6572
0000054000   6F63   6472   6F20   0A6E   0900   6553   2074   6572
0000054020   6F63   6472   6F20   6666   000A   6556   6972   7966
0000054040   6620   6961   006C   5F62   6564   7562   0067   616D
0000054060   6E69   0000   005C   005C   0000   0000   0000   0000
0000054100   0000   0000   055A   0000   0000   0B52   0001   0000
0000054120   0000   0000   0000   0000   0102   0000   0000   0000
0000054140   0000   0000   0202   0000   0000   0000   0000   0000
0000054160   0000   0000   0000   0000   0000   0000   0000   0000
*
0000055040   0000   0001   0200   0000   0000   0000   0000   0000
0000055060   0000   0000   0000   0000   0000   0000   0000   0000
*
0000056000   0000   0726   0B54   0000   0000   0000   0000   0006
0000056020   0600   0100   0000   0010   0603   0600   1002   4504
0000056040   4545   0505   0505   3505   0030   0050   0000   2000
0000056060   3020   5850   0807   3000   3030   5057   0007   2000
0000056100   0020   0000   0000   6008   6060   6060   0060   7000
0000056120   7870   7878   0878   0807   0000   0007   0808   0008
0000056140   0800   0800   0000   2808   756E   6C6C   0629   0000
0000056160   0000   FFFF   FFFF   0000   02B6   0B4A   02B6   098A
0000056200   02B6   098E   02B6   0992   02B6   0996   02B6   099A
0000056220   0000   0000   0101   FFFF   001E   003B   005A   0078
0000056240   0097   00B5   00D4   00F3   0111   0130   014E   016D
0000056260   FFFF   001E   003A   0059   0077   0096   00B4   00D3
0000056300   00F2   0110   012F   014D   016C   5A54   0000   5350
0000056320   0054   4450   0054   7080   0000   0001   09DE   09F2
0000056340   09E2   0914   7553   4D6E   6E6F   7554   5765   6465
0000056360   6854   4675   6972   6153   0074   614A   466E   6265
0000056400   614D   4172   7270   614D   4A79   6E75   754A   416C
0000056420   6775   6553   4F70   7463   6F4E   4476   6365   0000
0000056440   0000   2000   2020   2020   2020   2020   2828   2828
0000056460   2028   2020   2020   2020   2020   2020   2020   2020
0000056500   2020   4820   1010   1010   1010   1010   1010   1010
0000056520   1010   8410   8484   8484   8484   8484   1084   1010
0000056540   1010   1010   8181   8181   8181   0101   0101   0101
0000056560   0101   0101   0101   0101   0101   0101   0101   1010
0000056600   1010   1010   8282   8282   8282   0202   0202   0202
```

THU MAR 14 17:28:26 1991 CRVN.EXE PAGE 25, LINE 1417

| | | | | | | | | |
|---|---|---|---|---|---|---|---|---|
| 0000056620 | 0202 | 0202 | 0202 | 0202 | 0202 | 0202 | 0202 | 1010 |
| 0000056640 | 1010 | 0020 | 0000 | 0000 | 0000 | 0000 | 0000 | 0000 |
| 0000056660 | 0000 | 0000 | 0000 | 0000 | 0000 | 0000 | 0000 | 0000 |
| * | | | | | | | | |
| 0000057040 | 0000 | 0000 | 0003 | 0000 | 0000 | 0000 | 0000 | 0000 |
| 0000057060 | 0000 | 0000 | 0C7C | FFFF | 10D0 | 0B46 | FFFF | FFFF |
| 0000057100 | FFFF | 0B4C | 02EE | 3C3C | 4D4E | 4753 | 3E3E | 0000 |
| 0000057120 | 3652 | 3030 | 0D30 | 2D0A | 7320 | 6174 | 6B63 | 6F20 |
| 0000057140 | 6576 | 6672 | 6F6C | 0D77 | 000A | 0003 | 3652 | 3030 |
| 0000057160 | 0D33 | 2D0A | 6920 | 746E | 6765 | 7265 | 6420 | 7669 |
| 0000057200 | 6469 | 2065 | 7962 | 3020 | 0A0D | 0800 | 5200 | 3036 |
| 0000057220 | 3830 | 0A0D | 202D | 6F6E | 2074 | 6E65 | 756F | 6867 |
| 0000057240 | 7320 | 6170 | 6563 | 6620 | 726F | 6120 | 6772 | 6D75 |
| 0000057260 | 6E65 | 7374 | 0A0D | 0900 | 5200 | 3036 | 3930 | 0A0D |
| 0000057300 | 202D | 6F6E | 2074 | 6E65 | 756F | 6867 | 7320 | 6170 |
| 0000057320 | 6563 | 6620 | 726F | 6520 | 766E | 7269 | 6E6F | 656D |
| 0000057340 | 746E | 0A0D | FC00 | 0D00 | 000A | 00FF | 7572 | 2D6E |
| 0000057360 | 6974 | 656D | 6520 | 7272 | 726F | 0020 | 0002 | 3652 |
| 0000057400 | 3030 | 0D32 | 2D0A | 6620 | 6F6C | 7461 | 6E69 | 2D67 |
| 0000057420 | 6F70 | 6E69 | 2074 | 7573 | 7070 | 726F | 2074 | 6F6E |
| 0000057440 | 2074 | 6F6C | 6461 | 6465 | 0A0D | 0100 | 5200 | 3036 |
| 0000057460 | 3130 | 0A0D | 202D | 756E | 6C6C | 7020 | 696F | 746E |
| 0000057500 | 7265 | 6120 | 7373 | 6769 | 6D6E | 6E65 | 0D74 | 000A |
| 0000057520 | 0011 | 3652 | 3130 | 0D37 | 2D0A | 7520 | 656E | 7078 |
| 0000057540 | 6365 | 6574 | 2064 | 756D | 746C | 7469 | 7268 | 6165 |
| 0000057560 | 2064 | 6F6C | 6B63 | 6520 | 7272 | 726F | 0A0D | 1000 |
| 0000057600 | 5200 | 3036 | 3631 | 0A0D | 202D | 6F6E | 2074 | 6E65 |
| 0000057620 | 756F | 6867 | 7320 | 6170 | 6563 | 6620 | 726F | 7420 |
| 0000057640 | 7268 | 6165 | 2064 | 6164 | 6174 | 0A0D | FF00 | FFFF |
| 0000057660 | 0005 | 0002 | 099E | 0001 | 0000 | 0002 | 0554 | 0004 |
| 0000057700 | 0000 | 0002 | 09EE | 0005 | 0000 | 0202 | 0B4E | 0006 |
| 0000057720 | 002F | 0202 | 0B50 | 0006 | 003D | 424E | 3230 | 6B38 |
| 0000057740 | 0000 | 0001 | 0010 | 00DA | 0000 | 0001 | 0001 | 6F0C |
| 0000057760 | 3273 | 635C | 7472 | 2E30 | 7361 | 016D | EA00 | A900 |
| 0000060000 | 0001 | 0100 | 0100 | 0F00 | 736F | 5C32 | 7263 | 3074 |
| 0000060020 | 6164 | 2E74 | 7361 | 016D | 9400 | 2202 | 0000 | 0100 |
| 0000060040 | 0100 | 0F00 | 736F | 5C32 | 7263 | 3074 | 736D | 2E67 |
| 0000060060 | 7361 | 016D | B600 | 0602 | 0000 | 0100 | 0100 | 0A00 |
| 0000060100 | 7263 | 3074 | 7066 | 612E | 6D73 | 0001 | 02BC | 0024 |
| 0000060120 | 0000 | 0001 | 0001 | 630A | 6B68 | 7573 | 2E6D | 7361 |
| 0000060140 | 016D | E000 | 8702 | 0001 | 0100 | 0100 | 0F00 | 736F |
| 0000060160 | 5C32 | 7473 | 6164 | 6772 | 2E76 | 7361 | 016D | 6800 |
| 0000060200 | A304 | 0000 | 0100 | 0100 | 0F00 | 736F | 5C32 | 7473 |
| 0000060220 | 6564 | 766E | 2E70 | 7361 | 016D | 0C00 | 6505 | 0000 |
| 0000060240 | 0100 | 0100 | 0F00 | 736F | 5C32 | 6D6E | 6773 | 6468 |
| 0000060260 | 2E72 | 7361 | 016D | 7200 | 2105 | 0000 | 0100 | 0100 |
| 0000060300 | 1000 | 736F | 5C32 | 7473 | 6164 | 6C6C | 636F | 612E |
| 0000060320 | 6D73 | 0001 | 0594 | 000A | 0000 | 0001 | 0001 | 6D0A |
| 0000060340 | 6C61 | 6F6C | 2E63 | 7361 | 016D | 9E00 | AF05 | 0000 |
| 0000060360 | 0100 | 0100 | 0B00 | 6D66 | 6C61 | 6F6C | 2E63 | 7361 |
| 0000060400 | 006D | 0000 | 0000 | 0000 | 0100 | 0000 | 0900 | 6466 |
| 0000060420 | 7461 | 2E61 | 7361 | 016D | 4E00 | 3406 | 0000 | 0100 |
| 0000060440 | 0100 | 0B00 | 6E69 | 7469 | 6573 | 2E67 | 7361 | 016D |
| 0000060460 | 8200 | 3606 | 0000 | 0100 | 0100 | 0B00 | 696C | 6B6E |
| 0000060500 | 6573 | 2E67 | 7361 | 016D | B800 | 7C06 | 0000 | 0100 |
| 0000060520 | 0100 | 0C00 | 6573 | 7261 | 6863 | 6773 | 612E | 6D73 |
| 0000060540 | 0001 | 0734 | 00E2 | 0000 | 0001 | 0001 | 670B | 6F72 |
| 0000060560 | 7377 | 6765 | 612E | 6D73 | 0001 | 0816 | 0031 | 0000 |
| 0000060600 | 0001 | 0001 | 6E0A | 7765 | 6573 | 2E67 | 7361 | 016D |

THU MAR 14 17:28:26 1991 CRVN.EXE PAGE 26, LINE 1476

| | | | | | | | | |
|---|---|---|---|---|---|---|---|---|
| 0000060620 | 4800 | B208 | 0000 | 0100 | 0100 | 0D00 | 736F | 5C32 |
| 0000060640 | 6C6D | 636F | 2E6B | 7361 | 016D | 4C00 | 1D23 | 0027 |
| 0000060660 | 0200 | 0100 | 0A00 | 7263 | 5F76 | 706E | 6F72 | 632E |
| 0000060700 | 0001 | 4A6A | 0157 | 0000 | 0002 | 0001 | 630A | 7672 |
| 0000060720 | 705F | 7261 | 2E6D | 0163 | FA00 | 0208 | 0001 | 0100 |
| 0000060740 | 0100 | 0800 | 6366 | 6F6C | 6573 | 632E | 0001 | 09FC |
| 0000060760 | 006A | 0000 | 0001 | 0001 | 6607 | 706F | 6E65 | 632E |
| 0000061000 | 0001 | 0A66 | 004E | 0000 | 0001 | 0001 | 7008 | 6972 |
| 0000061020 | 746E | 2E66 | 0163 | B400 | 360A | 0000 | 0100 | 0100 |
| 0000061040 | 0A00 | 7473 | 6372 | 7970 | 612E | 6D73 | 0001 | 0AEA |
| 0000061060 | 0029 | 0000 | 0001 | 0001 | 730A | 7274 | 6D63 | 2E70 |
| 0000061100 | 7361 | 016D | 1400 | A60B | 0000 | 0100 | 0100 | 0800 |
| 0000061120 | 6567 | 6574 | 766E | 632E | 0001 | 0BBA | 0074 | 0000 |
| 0000061140 | 0001 | 0001 | 7309 | 7270 | 6E69 | 6674 | 632E | 0001 |
| 0000061160 | 0C2E | 005C | 0000 | 0001 | 0001 | 6307 | 6F6C | 6B63 |
| 0000061200 | 632E | 0001 | 0C8A | 0053 | 0000 | 0001 | 0001 | 6F0F |
| 0000061220 | 3273 | 735C | 7274 | 6164 | 6574 | 612E | 6D73 | 0001 |
| 0000061240 | 0CDE | 004C | 0000 | 0001 | 0001 | 6F0F | 3273 | 735C |
| 0000061260 | 7274 | 6974 | 656D | 612E | 6D73 | 0001 | 0D2A | 0024 |
| 0000061300 | 0000 | 0001 | 0001 | 730A | 7274 | 7075 | 2E72 | 7361 |
| 0000061320 | 006D | 0000 | 0000 | 0000 | 0100 | 0000 | 0700 | 665F |
| 0000061340 | 6C69 | 2E65 | 0163 | 4E00 | E50D | 0000 | 0100 | 0100 |
| 0000061360 | 0B00 | 665F | 736C | 7562 | 2E66 | 7361 | 016D | 3400 |
| 0000061400 | 370E | 000D | 0100 | 0100 | 0C0D | 665F | 6572 | 6265 |
| 0000061420 | 6675 | 612E | 6D73 | 0001 | 0E6C | 00F2 | 0000 | 0001 |
| 0000061440 | 0001 | 5F07 | 706F | 6E65 | 632E | 0001 | 0F5E | 00C0 |
| 0000061460 | 0000 | 0001 | 0001 | 5F0B | 6673 | 6274 | 6675 | 612E |
| 0000061500 | 6D73 | 0001 | 101E | 012E | 0000 | 0001 | 0001 | 6608 |
| 0000061520 | 6C66 | 7375 | 2E68 | 0163 | 4C00 | FA11 | 0004 | 0100 |
| 0000061540 | 0100 | 0A00 | 756F | 7074 | 7475 | 612E | 6D73 | 0001 |
| 0000061560 | 1646 | 0078 | 0000 | 0001 | 0001 | 7308 | 7274 | 6165 |
| 0000061600 | 2E6D | 0163 | BE00 | 3F16 | 0000 | 0100 | 0100 | 0D00 |
| 0000061620 | 736F | 5C32 | 6C63 | 736F | 2E65 | 7361 | 016D | FE00 |
| 0000061640 | 4616 | 0000 | 0100 | 0100 | 0A00 | 7473 | 6372 | 7461 |
| 0000061660 | 612E | 6D73 | 0001 | 1744 | 0017 | 0000 | 0001 | 0001 |
| 0000061700 | 730A | 7274 | 656C | 2E6E | 7361 | 016D | 5C00 | 3B17 |
| 0000061720 | 0000 | 0100 | 0100 | 0B00 | 7473 | 6E72 | 6D63 | 2E70 |
| 0000061740 | 7361 | 016D | 9800 | 1C17 | 0000 | 0100 | 0100 | 0800 |
| 0000061760 | 7469 | 616F | 612E | 6D73 | 0001 | 17B4 | 00DE | 0000 |
| 0000062000 | 0001 | 0001 | 6F0B | 3273 | 665C | 6974 | 656D | 632E |
| 0000062020 | 0000 | 0000 | 0000 | 0000 | 0001 | 0000 | 5F0C | 6963 |
| 0000062040 | 696E | 7474 | 2E6D | 7361 | 016D | 9200 | 1D18 | 0000 |
| 0000062060 | 0100 | 0100 | 0E00 | 736F | 5C32 | 6E75 | 696C | 6B6E |
| 0000062100 | 612E | 6D73 | 0001 | 18B0 | 0032 | 0000 | 0001 | 0001 |
| 0000062120 | 6C08 | 756D | 2E6C | 7361 | 016D | E200 | 3218 | 0000 |
| 0000062140 | 0100 | 0100 | 0A00 | 6863 | 736B | 6B74 | 612E | 6D73 |
| 0000062160 | 0001 | 1914 | 00C0 | 0000 | 0001 | 0001 | 6F0E | 3273 |
| 0000062200 | 645C | 736F | 6572 | 2E74 | 7361 | 006D | 0000 | 0000 |
| 0000062220 | 0000 | 0100 | 0000 | 0B00 | 635F | 6C66 | 7375 | 2E68 |
| 0000062240 | 7361 | 016D | D400 | 4B19 | 0000 | 0100 | 0100 | 0B00 |
| 0000062260 | 675F | 7465 | 7562 | 2E66 | 7361 | 016D | 2000 | 771A |
| 0000062300 | 0000 | 0100 | 0100 | 0D00 | 736F | 5C32 | 736C | 6565 |
| 0000062320 | 2E6B | 7361 | 016D | 9800 | DD1A | 0001 | 0100 | 0100 |
| 0000062340 | 0C00 | 736F | 5C32 | 706F | 6E65 | 612E | 6D73 | 0001 |
| 0000062360 | 1C76 | 01F4 | 0000 | 0001 | 0001 | 7709 | 6972 | 6574 |
| 0000062400 | 612E | 6D73 | 0001 | 1E6A | 000A | 0000 | 0001 | 0001 |
| 0000062420 | 6608 | 6572 | 2E65 | 7361 | 006D | 0000 | 0000 | 0000 |
| 0000062440 | 0100 | 0000 | 0C00 | 6D63 | 7369 | 6463 | 7461 | 612E |
| 0000062460 | 6D73 | 0000 | 0000 | 0000 | 0000 | 0001 | 0000 | 6406 |

THU MAR 14 17:28:26 1991 CRVN.EXE PAGE 27, LINE 1535

| | | | | | | | | |
|---|---|---|---|---|---|---|---|---|
| 0000062500 | 7961 | 2E73 | 0163 | 7400 | C81E | 0001 | 0100 | 0100 |
| 0000062520 | 0700 | 7A74 | 6573 | 2E74 | 0063 | 0000 | 0000 | 0000 |
| 0000062540 | 0100 | 0000 | 0900 | 6974 | 656D | 6573 | 2E74 | 0163 |
| 0000062560 | 3C00 | F620 | 0000 | 0100 | 0100 | 0A00 | 7464 | 786F |
| 0000062600 | 6974 | 656D | 632E | 0001 | 2132 | 0063 | 0000 | 0001 |
| 0000062620 | 0001 | 7808 | 6F74 | 2E61 | 7361 | 016D | 9600 | 9A21 |
| 0000062640 | 0000 | 0100 | 0100 | 0800 | 646C | 7669 | 612E | 6D73 |
| 0000062660 | 0001 | 2230 | 001E | 0000 | 0001 | 0001 | 730C | 6174 |
| 0000062700 | 6B63 | 7661 | 2E61 | 7361 | 006D | 0000 | 0000 | 0000 |
| 0000062720 | 0100 | 0000 | 0B00 | 7874 | 6D74 | 646F | 2E65 | 7361 |
| 0000062740 | 016D | 4E00 | 2A22 | 0000 | 0100 | 0100 | 0B00 | 7473 |
| 0000062760 | 6E72 | 7063 | 2E79 | 7361 | 016D | 7800 | 0322 | 0000 |
| 0000063000 | 0100 | 0100 | 0800 | 7461 | 6C6F | 612E | 6D73 | 0000 |
| 0000063020 | 0000 | 0000 | 0000 | 0001 | 0000 | 6309 | 7974 | 6570 |
| 0000063040 | 612E | 6D73 | 0001 | 227C | 007A | 0000 | 0001 | 0001 |
| 0000063060 | 6410 | 6C6C | 745C | 6469 | 6174 | 6C62 | 2E65 | 7361 |
| 0000063100 | 016D | F600 | 5622 | 0000 | 0100 | 0100 | 0800 | 7461 |
| 0000063120 | 786F | 612E | 6D73 | 0CC0 | 0005 | 0000 | 5F06 | 6465 |
| 0000063140 | 7461 | B061 | 050F | 0000 | 0400 | 655F | 646E | 0050 |
| 0000063160 | 0005 | 0000 | 5F0C | 6E5F | 6568 | 7061 | 645F | 7365 |
| 0000063200 | 7663 | 0500 | 0000 | 0C00 | 5F5F | 615F | 4244 | 7773 |
| 0000063220 | 6670 | 676C | 0042 | 0005 | 0000 | 5F08 | 615F | 6D63 |
| 0000063240 | 6C64 | 746E | 0500 | 0000 | 0800 | 5F5F | 7361 | 6765 |
| 0000063260 | 6968 | 0072 | 0005 | 0000 | 5F08 | 615F | 6573 | 6C67 |
| 0000063300 | 4E6F | 0500 | 0000 | 0800 | 5F5F | 7361 | 7A69 | 7364 |
| 0000063320 | 0010 | 0001 | 0000 | 5F08 | 615F | 7473 | 7261 | 4674 |
| 0000063340 | 0500 | 0000 | 0800 | 5F5F | 7461 | 706F | 7073 | 0064 |
| 0000063360 | 0005 | 0000 | 5F09 | 615F | 6663 | 6E69 | 6F66 | D6D6 |
| 0000063400 | 0000 | 0001 | 5F09 | 615F | 4244 | 7375 | 6465 | 0044 |
| 0000063420 | 0005 | 0000 | 5F09 | 615F | 6E65 | 7376 | 6765 | 0084 |
| 0000063440 | 0001 | 0000 | 5F09 | 635F | 6E69 | 4474 | 5649 | 004A |
| 0000063460 | 0005 | 0000 | 5F0A | 745F | 7268 | 6165 | 6964 | 4864 |
| 0000063500 | 0500 | 0000 | 0A00 | 5F5F | 6967 | 666E | 736F | 6765 |
| 0000063520 | D6D6 | 0000 | 0001 | 5F0A | 615F | 4244 | 6F64 | 7773 |
| 0000063540 | 4C70 | 0500 | 0000 | 0A00 | 5F5F | 696C | 666E | 736F |
| 0000063560 | 6765 | 9876 | 0000 | 0001 | 5F0A | 615F | 7263 | 7574 |
| 0000063600 | 6573 | 7864 | 0500 | 0000 | 0B00 | 5F5F | 615F | 4244 |
| 0000063620 | 7472 | 7265 | 8C72 | 0100 | 0000 | 0B00 | 5F5F | 6D61 |
| 0000063640 | 6773 | 655F | 6978 | 8674 | 0500 | 0000 | 0B00 | 5F5F |
| 0000063660 | 736F | 6576 | 7372 | 6F69 | 896E | 0101 | 0000 | 0600 |
| 0000063700 | 5F5F | 7865 | 7469 | 024F | 0001 | 0000 | 5F0C | 755F |
| 0000063720 | 6C6E | 636F | 656B | 6978 | 9A74 | 0502 | 0000 | 0700 |
| 0000063740 | 5F5F | 6863 | 6C69 | 8A64 | 0500 | 0000 | 0700 | 5F5F |
| 0000063760 | 666E | 6C69 | EA65 | 0100 | 0000 | 0700 | 5F5F | 6963 |
| 0000064000 | 696E | 8C74 | 0502 | 0000 | 0700 | 5F5F | 615F | 6772 |
| 0000064020 | 9163 | 0101 | 0000 | 0700 | 5F5F | 6563 | 6978 | 8674 |
| 0000064040 | 0500 | 0000 | 0D00 | 5F5F | 6F64 | 7673 | 7265 | 616D |
| 0000064060 | 6F6A | 8E72 | 0502 | 0000 | 0700 | 5F5F | 615F | 6772 |
| 0000064100 | 8776 | 0500 | 0000 | 0D00 | 5F5F | 6F64 | 7673 | 7265 |
| 0000064120 | 696D | 6F6E | 8C72 | 0501 | 0000 | 0800 | 5F5F | 6970 |
| 0000064140 | 6570 | 6863 | 0292 | 0005 | 0000 | 5F08 | 6E65 | 6976 |
| 0000064160 | 6F72 | 8C6E | 0500 | 0000 | 0800 | 5F5F | 736F | 6966 |
| 0000064200 | 656C | 0088 | 0005 | 0000 | 5F08 | 6F5F | 6D73 | 646F |
| 0000064220 | 4D65 | 0101 | 0000 | 0800 | 5F5F | 6E69 | 7469 | 7066 |
| 0000064240 | 0B38 | 0005 | 0000 | 5F08 | 665F | 6970 | 696E | 7274 |
| 0000064260 | 0102 | 0000 | 0800 | 5F5F | 6574 | 6D72 | 7066 | 0296 |
| 0000064300 | 0005 | 0000 | 5F08 | 705F | 6D67 | 7470 | 9B72 | 0101 |
| 0000064320 | 0000 | 0800 | 5F5F | 5F63 | 7865 | 7469 | 0088 | 0005 |
| 0000064340 | 0000 | 5F09 | 645F | 736F | 6F6D | 6564 | 0086 | 0005 |

THU MAR 14 17:28:26 1991 CRVN.EXE PAGE 28, LINE 1594

| | | | | | | | | |
|---|---|---|---|---|---|---|---|---|
| 0000064360 | 0000 | 5F09 | 6F5F | 6D73 | 6A61 | 726F | 0087 | 0005 |
| 0000064400 | 0000 | 5F09 | 6F5F | 6D73 | 6E69 | 726F | 0205 | 0001 |
| 0000064420 | 0000 | 5F0A | 6C5F | 636F | 656B | 6978 | 8474 | 0500 |
| 0000064440 | 0000 | 0A00 | 5F5F | 6D75 | 7361 | 766B | 6C61 | 0272 |
| 0000064460 | 0001 | 0000 | 5F0A | 635F | 6574 | 6D72 | 7573 | 9C62 |
| 0000064500 | 0502 | 0000 | 0A00 | 5F5F | 7865 | 7469 | 745F | 6469 |
| 0000064520 | 007A | 0005 | 0000 | 5F05 | 665F | 6361 | 0182 | 0001 |
| 0000064540 | 0000 | 5F05 | 7865 | 7469 | 0294 | 0001 | 0000 | 5F0E |
| 0000064560 | 465F | 5F46 | 534D | 4247 | 4E41 | 454E | 9E52 | 0502 |
| 0000064600 | 0000 | 0900 | 5F5F | 6461 | 6762 | 736D | 7667 | 0098 |
| 0000064620 | 0100 | 0900 | 5F5F | 6361 | 7472 | 736D | B667 | 0102 |
| 0000064640 | 0000 | 0800 | 5F5F | 7066 | 7274 | 7061 | 02BC | 0001 |
| 0000064660 | 0000 | 5F0B | 6E5F | 6C75 | 636C | 6568 | 6B63 | 0042 |
| 0000064700 | 0005 | 0000 | 5F0B | 615F | 756E | 6C6C | 6973 | 657A |
| 0000064720 | 02E0 | 0001 | 0000 | 5F09 | 735F | 7465 | 7261 | 7667 |
| 0000064740 | 0468 | 0001 | 0000 | 5F09 | 735F | 7465 | 6E65 | 7076 |
| 0000064760 | 050C | 0001 | 0000 | 5F0B | 4E5F | 534D | 5F47 | 4554 |
| 0000065000 | 5458 | 053C | 0001 | 0000 | 5F0C | 4E5F | 534D | 5F47 |
| 0000065020 | 5257 | 5449 | 7245 | 0105 | 0000 | 0A00 | 5F5F | 7473 |
| 0000065040 | 6164 | 6C6C | 636F | 0594 | 0001 | 0000 | 5F07 | 616D |
| 0000065060 | 6C6C | 636F | 0599 | 0001 | 0000 | 5F0A | 616D | 6C6C |
| 0000065100 | 636F | 6C5F | D06B | 0105 | 0000 | 0C00 | 5F5F | 6D66 |
| 0000065120 | 6C61 | 6F6C | 5F63 | 6B6C | 059E | 0001 | 0000 | 5F07 |
| 0000065140 | 665F | 7266 | 6565 | 05B1 | 0001 | 0000 | 5F09 | 665F |
| 0000065160 | 616D | 6C6C | 636F | 059E | 0001 | 0000 | 5F0A | 665F |
| 0000065200 | 7266 | 6565 | 6C5F | A86B | 0502 | 0000 | 0700 | 5F5F |
| 0000065220 | 6866 | 6165 | 4E70 | 0106 | 0000 | 0900 | 5F5F | 6E69 |
| 0000065240 | 7469 | 6573 | 8267 | 0106 | 0000 | 0900 | 5F5F | 696C |
| 0000065260 | 6B6E | 6573 | B867 | 0106 | 0000 | 0B00 | 5F5F | 6573 |
| 0000065300 | 7261 | 6B63 | 6573 | C367 | 0107 | 0000 | 0800 | 5F5F |
| 0000065320 | 6E69 | 7363 | 6765 | 0734 | 0001 | 0000 | 5F09 | 675F |
| 0000065340 | 6F72 | 7377 | 6765 | 07F6 | 0001 | 0000 | 5F0A | 665F |
| 0000065360 | 6E69 | 6C64 | 7361 | B674 | 0502 | 0000 | 0A00 | 5F5F |
| 0000065400 | 6D61 | 6C62 | 736B | 7A69 | 0816 | 0001 | 0000 | 5F08 |
| 0000065420 | 6E5F | 7765 | 6573 | 9867 | 0108 | 0000 | 0600 | 5F5F |
| 0000065440 | 6F6C | 6B63 | 08DA | 0001 | 0000 | 5F07 | 6C5F | 636F |
| 0000065460 | 666B | 086C | 0001 | 0000 | 5F0D | 755F | 6C6E | 636F |
| 0000065500 | 5F6B | 6966 | 656C | 0848 | 0001 | 0000 | 5F0D | 6C5F |
| 0000065520 | 636F | 5F6B | 7473 | 6572 | 6D61 | 08BE | 0001 | 0000 |
| 0000065540 | 5F08 | 755F | 6C6E | 636F | EA6B | 0108 | 0000 | 0900 |
| 0000065560 | 5F5F | 6E75 | 6F6C | 6B63 | 5466 | 0108 | 0000 | 0F00 |
| 0000065600 | 5F5F | 6E75 | 6F6C | 6B63 | 735F | 7274 | 6165 | 786D |
| 0000065620 | 0108 | 0000 | 0A00 | 5F5F | 6177 | 7469 | 6F6C | 6B63 |
| 0000065640 | 0860 | 0001 | 0000 | 5F0B | 6C5F | 636F | 5F6B | 6966 |
| 0000065660 | 656C | 0200 | 0004 | 060A | 5F0E | 6C67 | 626F | 6C61 |
| 0000065700 | 705F | 7261 | 6D61 | 6773 | 0132 | 8800 | 0507 | 6D5F |
| 0000065720 | 6961 | 6A6E | 014A | D600 | 0F05 | 635F | 7672 | 735F |
| 0000065740 | 7465 | 705F | 7261 | 6D61 | 4673 | 0109 | 0000 | 0B00 |
| 0000065760 | 5F5F | 6366 | 6F6C | 6573 | 6C5F | FA6B | 0108 | 0000 |
| 0000066000 | 0700 | 665F | 6C63 | 736F | FC65 | 0109 | 0000 | 0800 |
| 0000066020 | 5F5F | 7366 | 706F | 6E65 | 0A4E | 0001 | 0000 | 5F06 |
| 0000066040 | 6F66 | 6570 | 666E | 010A | 0000 | 0700 | 705F | 6972 |
| 0000066060 | 746E | B466 | 010A | 0000 | 0700 | 735F | 7274 | 7063 |
| 0000066100 | EA79 | 010A | 0000 | 0700 | 735F | 7274 | 6D63 | 1470 |
| 0000066120 | 010B | 0000 | 0700 | 675F | 7465 | 6E65 | BA76 | 010B |
| 0000066140 | 0000 | 0800 | 735F | 7270 | 6E69 | 6674 | 0C7C | 0001 |
| 0000066160 | 0000 | 5F0A | 695F | 696E | 7474 | 6D69 | 2E65 | 010C |
| 0000066200 | 0000 | 0600 | 635F | 6F6C | 6B63 | 0C8A | 0001 | 0000 |
| 0000066220 | 5F09 | 735F | 7274 | 6164 | 6574 | 0CDE | 0001 | 0000 |

THU MAR 14 17:28:26 1991 CRVN.EXE PAGE 29, LINE 1653

| | | | | | | | | |
|---|---|---|---|---|---|---|---|---|
| 0000066240 | 5F09 | 735F | 7274 | 6974 | 656D | 0D2A | 0001 | 0000 |
| 0000066260 | 5F07 | 7473 | 7572 | 7270 | 0000 | 0004 | 0000 | 5F07 |
| 0000066300 | 625F | 6675 | 6E69 | 0552 | 0005 | 0000 | 5F05 | 695F |
| 0000066320 | 626F | 0732 | 0005 | 0000 | 5F06 | 695F | 626F | 1232 |
| 0000066340 | 0509 | 0000 | 0900 | 5F5F | 616C | 7473 | 6F69 | 4E62 |
| 0000066360 | 010D | 0000 | 0800 | 5F5F | 6C66 | 6273 | 6675 | 0E34 |
| 0000066400 | 0001 | 0000 | 5F09 | 665F | 6572 | 6265 | 6675 | 0E6C |
| 0000066420 | 0001 | 0000 | 5F0A | 6F5F | 6570 | 666E | 6C69 | D665 |
| 0000066440 | 010F | 0000 | 0700 | 5F5F | 7466 | 7562 | 5E66 | 010F |
| 0000066460 | 0000 | 0700 | 5F5F | 7473 | 7562 | 6466 | 0110 | 0000 |
| 0000066500 | 0B00 | 5F5F | 6666 | 756C | 6873 | 6C5F | 1E6B | 0110 |
| 0000066520 | 0000 | 0700 | 665F | 6C66 | 7375 | D068 | 0110 | 0000 |
| 0000066540 | 0900 | 665F | 756C | 6873 | 6C61 | 5C6C | 0111 | 0000 |
| 0000066560 | 0800 | 5F5F | 756F | 7074 | 7475 | 1646 | 0001 | 0000 |
| 0000066600 | 5F0B | 675F | 7465 | 7473 | 6572 | 6D61 | 16BE | 0001 |
| 0000066620 | 0000 | 5F06 | 6C63 | 736F | FE65 | 0116 | 0000 | 0700 |
| 0000066640 | 735F | 7274 | 6163 | 4474 | 0117 | 0000 | 0700 | 735F |
| 0000066660 | 7274 | 656C | 5C6E | 0117 | 0000 | 0800 | 735F | 7274 |
| 0000066700 | 636E | 706D | 1798 | 0001 | 0000 | 5F05 | 7469 | 616F |
| 0000066720 | 17B4 | 0001 | 0000 | 5F06 | 7466 | 6D69 | 8065 | 0509 |
| 0000066740 | 0000 | 0800 | 5F5F | 6963 | 6974 | 656D | 1892 | 0001 |
| 0000066760 | 0000 | 5F07 | 6572 | 6F6D | 6576 | 1892 | 0001 | 0000 |
| 0000067000 | 5F07 | 6E75 | 696C | 6B6E | 18B0 | 0001 | 0000 | 5F08 |
| 0000067020 | 615F | 6C46 | 756D | B06C | 0118 | 0000 | 0900 | 5F5F |
| 0000067040 | 4661 | 6C75 | 756D | 826C | 0509 | 0000 | 0C00 | 5F5F |
| 0000067060 | 6161 | 746C | 7473 | 6F6B | 7276 | 18E2 | 0001 | 0000 |
| 0000067100 | 5F08 | 635F | 6B68 | 7473 | E26B | 0118 | 0000 | 0A00 |
| 0000067120 | 5F5F | 4661 | 6863 | 736B | 6B74 | 19C0 | 0001 | 0000 |
| 0000067140 | 5F0B | 5F5F | 6F64 | 6573 | 7272 | 6F6E | 19C8 | 0001 |
| 0000067160 | 0000 | 5F07 | 655F | 7272 | 6F6E | 1979 | 0001 | 0000 |
| 0000067200 | 5F08 | 645F | 736F | 6572 | 6074 | 0119 | 0000 | 0900 |
| 0000067220 | 5F5F | 6F64 | 7273 | 7465 | 8666 | 0509 | 0000 | 0800 |
| 0000067240 | 5F5F | 6663 | 756C | 6873 | 19D4 | 0001 | 0000 | 5F08 |
| 0000067260 | 675F | 7465 | 7562 | 2A66 | 011A | 0000 | 0600 | 6C5F |
| 0000067300 | 6573 | 6B65 | 1A20 | 0001 | 0000 | 5F0A | 6C5F | 6573 |
| 0000067320 | 6B65 | 6C5F | 986B | 011A | 0000 | 0600 | 735F | 706F |
| 0000067340 | 6E65 | 1AA9 | 0001 | 0000 | 5F05 | 706F | 6E65 | 1C64 |
| 0000067360 | 0001 | 0000 | 5F11 | 635F | 4558 | 494E | 7458 | 446F |
| 0000067400 | 534F | 6F6D | 6564 | 1C80 | 0001 | 0000 | 5F06 | 7277 |
| 0000067420 | 7469 | 7665 | 011C | 0000 | 0A00 | 5F5F | 7277 | 7469 |
| 0000067440 | 5F65 | 6B6C | 1E6F | 0001 | 0000 | 5F08 | 7266 | 6565 |
| 0000067460 | 6C5F | 6A6B | 011E | 0000 | 0500 | 665F | 6572 | 8865 |
| 0000067500 | 0509 | 0000 | 0D00 | 5F5F | 6663 | 746C | 7663 | 5F74 |
| 0000067520 | 6174 | A462 | 0509 | 0000 | 0800 | 5F5F | 7361 | 7A69 |
| 0000067540 | 4365 | 09A5 | 0005 | 0000 | 5F08 | 615F | 6973 | 657A |
| 0000067560 | A244 | 0509 | 0000 | 0B00 | 5F5F | 6973 | 6967 | 746E |
| 0000067600 | 666F | A066 | 0509 | 0000 | 0B00 | 5F5F | 6973 | 6967 |
| 0000067620 | 746E | 6573 | C067 | 0509 | 0000 | 0600 | 5F5F | 6164 |
| 0000067640 | 7379 | 09A6 | 0005 | 0000 | 5F08 | 6C5F | 6470 | 7961 |
| 0000067660 | 9473 | 011E | 0000 | 0600 | 745F | 737A | 7465 | 1F6E |
| 0000067700 | 0001 | 0000 | 5F09 | 695F | 6973 | 646E | 7473 | 1E74 |
| 0000067720 | 0001 | 0000 | 5F08 | 5F5F | 7A74 | 6573 | EA74 | 0509 |
| 0000067740 | 0000 | 0900 | 645F | 7961 | 696C | 6867 | E674 | 0509 |
| 0000067760 | 0000 | 0900 | 745F | 6D69 | 7A65 | 6E6F | EC65 | 0509 |
| 0000070000 | 0000 | 0700 | 745F | 6E7A | 6D61 | F465 | 0509 | 0000 |
| 0000070020 | 0900 | 5F5F | 645F | 616E | 656D | 0A73 | 050A | 0000 |
| 0000070040 | 0900 | 5F5F | 6D5F | 616E | 656D | 3C73 | 0120 | 0000 |
| 0000070060 | 0A00 | 5F5F | 7464 | 786F | 6974 | 656D | 213F | 0001 |
| 0000070100 | 0000 | 5F07 | 635F | 7478 | 616F | 2132 | 0001 | 0000 |

THU MAR 14 17:28:26 1991 CRVN.EXE PAGE 30, LINE 1712

```
0000070120  5F0A  635F  746C  616F  7573  9662  0121  0000
0000070140  0800  5F5F  4661  646C  7669  2230  0001  0000
0000070160  5F0B  7473  6361  616B  6176  6C69  0A30  0005
0000070200  0000  5F07  665F  6F6D  6564  0A30  0005  0000
0000070220  5F08  695F  6D6F  646F  4E65  0122  0000  0800
0000070240  735F  7274  636E  7970  2278  0001  0000  5F05
0000070260  7461  6C6F  0A32  0005  0000  5F07  635F  7974
0000070300  6570  0A32  0005  0000  5F08  635F  7974  6570
0000070320  7C5F  0122  0000  0B00  5F5F  6567  7474  6469
0000070340  6174  3462  050B  0000  0B00  5F5F  6974  7464
0000070360  6261  616D  F678  0122  0000  0700  5F5F  6163
0000070400  6F74  0178  000A  8075  8183  6400  8300  0201
0000070420  0101  8000  1601  7900  0330  0383  8302  0204
0000070440  0A82  7528  746E  6761  6567  2964  0169  000A
0000070460  837F  0081  8183  8300  0081  1C01  7F00  0682
0000070500  6170  6B63  685F  8200  6606  6C69  5F65  0268
0000070520  0682  7566  636E  685F  0104  0007  737A  C083
0000070540  8200  0100  0001  0180  0001  0180  0001  0180
0000070560  0001  0180  0001  0180  0001  0180  0001  0180
*
0000070740  0001  0180  0001  0180  0001  0180  0005  5878
0000070760  8083  0100  0005  3078  8083  0100  0001  0180
0000071000  0001  0180  0001  0180  0001  0180  0001  0180
*
0000071220  0005  6878  8083  0100  0001  0180  0001  0180
0000071240  0001  0180  0001  0180  0007  8578  0100  8083
0000071260  0100  0001  0180  0001  0180  0001  0180  0001
0000071300  0180  0001  0180  0001  0180  0001  0180  0001
*
0000071440  0180  0001  0180  0001  0180  0001  0180  0014
0000071460  3079  8303  0275  7683  8202  5F08  4950  4944
0000071500  464E  694F  0A01  7F00  8583  8300  0085  8583
0000071520  0100  0019  827F  7003  6469  8200  7403  6469
0000071540  8202  7009  6469  6150  6572  746E  0104  0001
0000071560  0180  0001  0180  0001  0180  0001  0180  0001
*
0000072140  0180  0001  0180  0005  6078  8083  0100  0001
0000072160  0180  0001  0180  0001  0180  0001  0180  0001
*
0000072600  0180  0001  0180  0001  0180  0013  3079  8302
0000072620  02FE  FF83  8202  5F07  554D  5358  4D45  0169
0000072640  0007  837F  0085  C083  0100  000F  827F  7A04
0000072660  7265  006F  0482  7368  6D65  0102  0001  0180
0000072700  0019  8579  0310  8302  0303  0483  8203  5F0B
0000072720  554D  5358  4D45  494C  5453  0169  0007  8578
0000072740  0300  FD83  0102  0007  837F  0085  0283  0103
0000072760  000F  827F  6304  786D  0073  0482  6D61  7378
0000073000  0102  0001  0180  0001  0180  0001  0180  0001
0000073020  0180  0001  0180  0001  0180  0001  0180  0001
*
0000073220  0180  0001  0180  0005  2878  8083  0100  0001
0000073240  0180  0001  0180  0001  0180  0001  0180  0001
*
0000076020  0180  0001  0180  0012  6079  8305  048A  8B83
0000076040  8204  5F06  6F69  7562  6966  1001  7F00  C083
0000076060  8300  0081  C083  8300  0080  8083  0100  0027
0000076100  827F  5F04  7470  0072  0482  635F  746E  8204
0000076120  5F05  6162  6573  8206  5F05  6C66  6761  820A
0000076140  5F05  6966  656C  010B  0001  0180  0007  737A
```

```
THU MAR 14 17:28:26 1991  CRVN.EXE  PAGE 31, LINE 1771

0000076160  8983  8204  0100  0001  0180  0001  0180  0001
0000076200  0180  0001  0180  0001  0180  0001  0180  0001
*
0000076540  0180  0007  737A  CA83  8204  0100  000A  8075
0000076560  8183  6400  8300  0201  0101  8000  0101  8000
0000076600  0101  8000  0101  8000  0101  8000  0101  8000
*
0000077400  1601  7900  0220  2E83  8305  052F  0A82  7528
0000077420  746E  6761  6567  2964  0169  0007  837F  0081
0000077440  8183  0100  0009  827F  7801  8200  7901  0102
0000077460  0016  4079  8302  0531  3283  8205  280A  6E75
0000077500  6174  6767  6465  6929  0701  7F00  2D83  8305
0000077520  052D  0D01  7F00  0382  696D  006E  0382  616D
0000077540  0478  0101  8000  1601  7900  0220  3583  8305
0000077560  0536  0A82  7528  746E  6761  6567  2964  0169
0000077600  0007  837F  0085  8583  0100  0012  827F  7705
0000077620  6469  6874  8200  6806  6965  6867  0274  0101
0000077640  8000  1601  7900  0240  3983  8305  053A  0A82
0000077660  7528  746E  6761  6567  2964  0169  0007  837F
0000077700  052D  3483  0105  0011  827F  6F06  6972  6967
0000077720  006E  0482  7261  6165  0104  0001  0180  0001
0000077740  0180  0001  0180  0001  0180  0001  0180  0001
*
0000100020  0180  0016  2079  8301  054A  4B83  8205  280A
0000100040  6E75  6174  6767  6465  6929  0401  7F00  8683
0000100060  0100  0009  827F  6405  6D75  796D  0100  0001
0000100100  0180  0001  0180  0001  0180  0001  0180  0001
*
0000100240  0180  0001  0180  0001  0180  0001  0180  0016
0000100260  3079  8303  0569  6A83  8205  280A  6E75  6174
0000100300  6767  6465  6929  0A01  7F00  8583  8300  0085
0000100320  8583  0100  001A  827F  7705  6469  6874  8200
0000100340  6806  6965  6867  0274  0582  6564  7470  0468
0000100360  1801  7900  4085  0801  6D83  8305  056E  0A82
0000100400  7528  746E  6761  6567  2964  0169  0007  8578
0000100420  0080  8483  0100  0019  837F  0081  6883  8305
0000100440  0085  8583  8300  00C4  8283  8300  00E4  6C83
0000100460  0105  005A  827F  7206  7065  6572  0073  0682
0000100500  6964  656D  736E  8202  6410  7461  5F61  616C
0000100520  6579  5F72  6564  7470  0868  0882  6973  5F67
0000100540  6973  657A  820A  7307  6769  705F  7274  820C
0000100560  6209  6D74  5F70  6973  657A  8210  6208  6D74
0000100600  5F70  7470  1472  0582  7073  7261  1865  0101
0000100620  8000  1801  7900  A085  0C05  7283  8305  0573
0000100640  0A82  7528  746E  6761  6567  2964  0169  0007
0000100660  8578  0180  8483  0100  0025  837F  0086  5483
0000100700  8302  0254  8683  8300  0081  8583  8300  0086
0000100720  8283  8300  0086  2D83  8305  056B  7183  0105
0000100740  007E  827F  6902  0064  0482  616E  656D  8204
0000100760  6609  6C69  5F65  616E  656D  8224  6509  7078
0000101000  745F  5F63  6469  8244  7404  7079  4865  0C82
0000101020  6572  5F66  696C  656E  6E5F  6D75  824A  7209
0000101040  6665  745F  5F63  6469  824C  740A  6D69  5F65
0000101060  7473  6D61  5070  0682  6F61  5F69  6469  8254
0000101100  6C08  636F  7461  6F69  586E  0982  7462  706D
0000101120  695F  666E  5C6F  0582  7073  7261  8565  0084
0000101140  0101  8000  0101  8000  0101  8000  0101  8000
*
0000101200  0101  8000  0101  8000  0701  7A00  8373  0570
```

THU MAR 14 17:28:26 1991 CRVN.EXE PAGE 32, LINE 1830

```
0000101220  0082  0101  8000  0101  8000  0101  8000  0101
0000101240  8000  0101  8000  0101  8000  0101  8000  0101
*
0000101640  8000  0101  8000  0101  8000  1801  7900  C085
0000101660  0702  C783  8305  05C8  0A82  7528  746E  6761
0000101700  6567  2964  0169  0007  8578  0120  8483  0100
0000101720  0016  837F  0086  5483  8302  0530  8183  8300
0000101740  0081  8283  8300  05C6  3801  7F00  0282  6469
0000101760  8200  6E04  6D61  0465  0482  6572  7463  8224
0000102000  6104  7474  2C72  0582  7564  6D6D  2E79  0A82
0000102020  6974  656D  735F  6174  706D  8230  7305  6170
0000102040  6572  0134  0001  0180  0001  0180  0001  0180
0000102060  0001  0180  0001  0180  0001  0180  0001  0180
*
0000102440  0001  0180  0001  0180  0018  8579  0110  8311
0000102460  060B  0C83  8206  280A  6E75  6174  6767  6465
0000102500  6929  3401  7F00  8583  8300  0085  8583  8300
0000102520  0085  8583  8300  0085  8183  8300  0085  8583
0000102540  8300  0085  8483  8300  0085  8583  8300  0085
0000102560  8583  8300  0085  8583  0100  0106  827F  7409
0000102600  6D69  5F65  6E75  7469  8200  6D0F  6E69  725F
0000102620  6365  726F  5F64  6974  656D  8202  7309  6174
0000102640  6962  696C  7974  8204  630F  7061  7574  6572
0000102660  745F  6D69  6F65  7475  8206  6B0A  7965  665F
0000102700  726F  616D  0874  1382  6F63  746E  6E69  6F75
0000102720  7375  745F  6172  6B63  6E69  0A67  0E82  6F6D
0000102740  7375  5F65  7274  6361  696B  676E  820C  6311
0000102760  7061  7574  6572  735F  6769  616E  7574  6572
0000103000  820E  680B  746F  656B  5F79  7973  636E  8210
0000103020  640C  6665  7561  746C  745F  6D69  1265  0982
0000103040  616D  5F78  6564  616C  1479  0B82  6166  7473
0000103060  725F  7065  616C  1679  0E82  6576  6972  7966
0000103100  745F  6D69  6F65  7475  8218  770C  6961  5F74
0000103120  6974  656D  756F  1A74  0C82  7973  636E  745F
0000103140  6D69  6F65  7475  821C  7409  7268  7365  6F68
0000103160  646C  821E  630C  6568  6B63  6C5F  6F6F  756B
0000103200  2070  0101  8000  0701  7800  0085  8308  0080
0000103220  0101  8000  0101  8000  0101  8000  0101  8000
*
0000103420  0101  8000  1601  7900  0240  3183  8306  0632
0000103440  0A82  7528  746E  6761  6567  2964  0169  0007
0000103460  837F  0082  8283  0100  0017  827F  6408  6665
0000103500  745F  6D69  0065  0882  696D  5F6E  6974  656D
0000103520  0104  0001  0180  0001  0180  0001  0180  0001
0000103540  0180  0001  0180  0001  0180  0016  4079  8304
0000103560  063A  3B83  8206  280A  6E75  6174  6767  6465
0000103600  6929  0D01  7F00  8483  8300  0084  8483  8300
0000103620  052D  2901  7F00  0782  6261  5F73  6572  006C
0000103640  0582  6E75  7469  0173  0C82  7073  6365  6169
0000103660  5F6C  7566  636E  8202  6404  7369  0470  0101
0000103700  8000  0101  8000  0101  8000  1601  7900  0220
0000103720  4083  8306  0641  0A82  7528  746E  6761  6567
0000103740  2964  0169  0007  837F  0081  8183  0100  001E
0000103760  827F  7309  6E79  5F63  6F6D  6564  8200  730E
0000104000  6E79  5F63  7865  6365  6D5F  646F  0265  1601
0000104020  7900  0230  4383  8306  0644  0A82  7528  746E
0000104040  6761  6567  2964  0169  0007  837F  0082  8183
0000104060  0100  0019  827F  7407  6365  5F68  6469  8200
0000104100  740B  6365  5F68  6572  7361  6E6F  0104  0001
```

THU MAR 14 17:28:26 1991 CRVN.EXE PAGE 33, LINE 1889

| | | | | | | | | |
|---|---|---|---|---|---|---|---|---|
| 0000104120 | 0180 | 0001 | 0180 | 0001 | 0180 | 0018 | 8579 | 0220 |
| 0000104140 | 8303 | 0649 | 4A83 | 8206 | 280A | 6E75 | 6174 | 6767 |
| 0000104160 | 6465 | 6929 | 0A01 | 7F00 | 5483 | 8302 | 0254 | 8683 |
| 0000104200 | 0100 | 001A | 827F | 6905 | 616D | 6567 | 8200 | 6404 |
| 0000104220 | 6669 | 2066 | 0782 | 6964 | 6666 | 695F | 4064 | 1801 |
| 0000104240 | 7900 | 1085 | 0203 | 4D83 | 8306 | 064E | 0AB2 | 7528 |
| 0000104260 | 746E | 6761 | 6567 | 2964 | 0169 | 0007 | 8578 | 030ΰ |
| 0000104300 | 5483 | 0102 | 0007 | 837F | 0085 | 4C83 | 0106 | 0024 |
| 0000104320 | 827F | 6E0E | 6D75 | 6F5F | 5F66 | 6373 | 6572 | 6E65 |
| 0000104340 | 0073 | 0F82 | 6D69 | 6761 | 5F65 | 616E | 656D | 6C5F |
| 0000104360 | 7369 | 0274 | 1601 | 7900 | 0120 | 5083 | 8306 | 0651 |
| 0000104400 | 0A82 | 7528 | 746E | 6761 | 6567 | 2964 | 0169 | 0004 |
| 0000104420 | 837F | 00C0 | 0A01 | 7F00 | 0682 | 7473 | 6972 | 676E |
| 0000104440 | 0100 | 0001 | 0180 | 0001 | 0180 | 0001 | 0180 | 0016 |
| 0000104460 | 3079 | 8302 | 0656 | 5783 | 8206 | 280A | 6E75 | 6174 |
| 0000104500 | 6767 | 6465 | 6929 | 0701 | 7F00 | 8283 | 8300 | 0081 |
| 0000104520 | 1E01 | 7F00 | 0C82 | 7865 | 6563 | 7470 | 6F69 | 5F6E |
| 0000104540 | 6469 | 8200 | 650B | 6378 | 5F70 | 7473 | 7461 | 7375 |
| 0000104560 | 0104 | 0016 | 2079 | 8302 | 065C | 5D63 | 8206 | 280A |
| 0000104600 | 6E75 | 6174 | ⁝767 | 6465 | 6929 | 1601 | 7900 | 0208 |
| 0000104620 | 5A83 | 8306 | 065B | 0A82 | 7528 | 746E | 6761 | 6567 |
| 0000104640 | 2964 | 0169 | 0007 | 837F | 0084 | 8483 | 0100 | 001B |
| 0000104660 | 827F | 6B08 | 7965 | 635F | 646F | 0065 | 0C82 | 7773 |
| 0000104700 | 7469 | 6863 | 735F | 6174 | 6574 | 0100 | 0007 | 837F |
| 0000104720 | 0081 | 5983 | 0106 | 0018 | 827F | 6B08 | 7965 | 745F |
| 0000104740 | 7079 | 0065 | 0982 | 656B | 5F79 | 6176 | 756C | 0265 |
| 0000104760 | 1801 | 7900 | 3085 | 0402 | 6083 | 8306 | 0661 | 0A82 |
| 0000105000 | 7528 | 746E | 6761 | 6567 | 2964 | 0169 | 0007 | 8578 |
| 0000105020 | 0200 | 5883 | 0106 | 000D | 837F | 0085 | 5F83 | 8306 |
| 0000105040 | 0081 | 8183 | 0100 | 002E | 827F | 7308 | 7165 | 735F |
| 0000105060 | 7A69 | 0065 | 0382 | 6573 | 0271 | 0882 | 656B | 5F79 |
| 0000105100 | 7461 | 7274 | 8242 | 610E | 7463 | 7669 | 7461 | 6465 |
| 0000105120 | 665F | 6E75 | 4463 | 0101 | 8000 | 0101 | 8000 | 0101 |
| 0000105140 | 8000 | 0101 | 8000 | 0101 | 8000 | 0101 | 8000 | 0101 |
| 0000105160 | 8000 | 0101 | 8000 | 1601 | 7900 | 0220 | 6B83 | 8306 |
| 0000105200 | 066C | 0A82 | 7528 | 746E | 6761 | 6567 | 2964 | 0169 |
| 0000105220 | 0007 | 837F | 0081 | 8183 | 0100 | 0017 | 827F | 6B08 |
| 0000105240 | 7965 | 615F | 7474 | 0072 | 0882 | 7566 | 636E | 6B5F |
| 0000105260 | 7965 | 0102 | 0018 | 8579 | 0210 | 8302 | 066E | 6F83 |
| 0000105300 | 8206 | 280A | 6E75 | 6174 | 6767 | 6465 | 6929 | 0701 |
| 0000105320 | 7F00 | 8583 | 8300 | 065F | 1201 | 7F00 | 0882 | 6573 |
| 0000105340 | 5F71 | 6973 | 657A | 8200 | 7303 | 7165 | 0102 | 0001 |
| 0000105360 | 0180 | 0001 | 0180 | 0001 | 0180 | 0001 | 0180 | 0001 |
| 0000105400 | 0180 | 0018 | 8579 | 02D0 | 8302 | 0676 | 7783 | 8206 |
| 0000105420 | 280A | 6E75 | 6174 | 6767 | 6465 | 6929 | 0701 | 7F00 |
| 0000105440 | C583 | 8305 | 0081 | 1101 | 7F00 | 0682 | 6966 | 746C |
| 0000105460 | 7265 | 8200 | 6D04 | 646F | 5865 | 1801 | 7900 | 5085 |
| 0000105500 | 0501 | 7983 | 8306 | 067A | 0A82 | 7528 | 746E | 6761 |
| 0000105520 | 6567 | 2964 | 0169 | 0010 | 837F | 0254 | 8683 | 8300 |
| 0000105540 | 0081 | 8183 | 8300 | 0081 | 2B01 | 7FU0 | 0482 | 616E |
| 0000105560 | 656D | 8200 | 6C06 | 6269 | 695F | 2064 | 0582 | 6C63 |
| 0000105600 | 7361 | 2473 | 0582 | 7473 | 6C79 | 2665 | 0782 | 706F |
| 0000105620 | 635F | 646F | 2865 | 0101 | 8000 | 0101 | 8000 | 0101 |
| 0000105640 | 8000 | 1B01 | 7900 | 0920 | 7F83 | 8306 | 0680 | 0F82 |
| 0000105660 | 5F69 | 5F75 | 736D | 5F67 | 6170 | 6172 | 5F6D | 6974 |
| 0000105700 | 1C01 | 7F00 | 8183 | 8300 | 0085 | 8283 | 8300 | 0086 |
| 0000105720 | 8883 | 8300 | 0080 | 8483 | 8300 | 00C0 | C083 | 0100 |
| 0000105740 | 006A | 827F | 6909 | 755F | 735F | 6F68 | 7472 | 8200 |
| 0000105760 | 690A | 755F | 755F | 6873 | 726F | 0074 | 0882 | 5F69 |

THU MAR 14 17:28:26 1991 CRVN.EXE PAGE 34, LINE 1948

```
0000106000   5F75   6F6C   676E   8200   6909   755F   755F   6F6C
0000106020   676E   8200   6909   755F   665F   6F6C   7461   8200
0000106040   6908   755F   635F   6168   0072   0982   5F69   5F75
0000106060   6375   6168   0072   0782   5F69   5F75   7473   0072
0000106100   0982   5F69   5F75   6C62   636F   006B   1901   7900
0000106120   0230   8283   8306   0683   0D82   5F69   736D   5F67
0000106140   6170   6172   5F6D   6974   0701   7F00   8583   8300
0000106160   067E   1001   7F00   0482   7974   6570   8200   7605
0000106200   6C61   6575   0102   0001   0180   001C   8579   0090
0000106220   8309   0686   8783   8206   690E   6D5F   6773   685F
0000106240   6165   6564   5F72   6974   1C01   7F00   8183   8300
0000106260   0081   8583   8300   0085   8483   8300   0085   8583
0000106300   8300   0081   8583   0100   0047   827F   7104   695F
0000106320   0064   0682   6F73   7275   6563   8202   7003   6469
0000106340   8204   7403   6469   8206   7204   7365   0870   0882
0000106360   6572   7073   745F   6469   820A   6F07   5F70   6F63
0000106400   6564   820C   7404   7079   0E65   0482   6973   657A
0000106420   0110   0015   8579   00C0   8302   068A   8B83   8206
0000106440   6907   6D5F   6773   745F   0169   0005   3078   8183
0000106460   0106   0007   837F   0685   8983   0106   0017   827F
0000106500   6806   6165   6564   0072   0A82   6170   6172   5F6D
0000106520   696C   7473   0112   0001   0180   0001   0180   0001
0000106540   0180   0001   0180   0001   0180   0001   0180   0001
*
0000107000   0180   0001   0180   0016   4079   8303   06BA   BB83
0000107020   8206   280A   6E75   6174   6767   6465   6929   0701
0000107040   7A00   8373   065E   0082   0A01   7F00   8183   8300
0000107060   0081   B983   0106   002B   827F   6106   7463   6F69
0000107100   006E   0F82   756E   5F6D   666F   735F   666F   6B74
0000107120   7965   0273   0C82   6F73   7466   656B   7379   705F
0000107140   7274   0104   0016   4079   8303   06BE   BF83   8206
0000107160   280A   6E75   6174   6767   6465   6929   0701   7A00
0000107200   8373   066D   0082   0A01   7F00   8183   8300   0081
0000107220   BD83   0106   0029   827F   6106   7463   6F69   006E
0000107240   0E82   756E   5F6D   666F   685F   746F   656B   7379
0000107260   8202   680B   746F   656B   7379   705F   7274   0104
0000107300   0018   8579   0170   8305   06C1   C283   8206   280A
0000107320   6E75   6174   6767   6465   6929   1001   7F00   5483
0000107340   8302   0086   7E83   8305   00E4   8583   0100   003D
0000107360   827F   690A   616D   6567   6E5F   6D61   0065   0882
0000107400   6D69   6761   5F65   6469   8220   6909   616D   6567
0000107420   705F   7274   8224   6C09   7961   7265   705F   7274
0000107440   8228   6909   616D   6567   685F   6C64   012C   0001
0000107460   0180   0001   0180   0001   0180   0001   0180   0018
0000107500   8579   0190   8302   06C8   C983   8206   280A   6E75
0000107520   6174   6767   6465   6929   0701   7F00   8283   8300
0000107540   06C0   1801   7F00   0C82   7865   6563   7470   6F69
0000107560   5F6E   6469   8200   6905   616D   6567   0104   0001
0000107600   0180   0016   4079   8303   06CD   CE83   8206   280A
0000107620   6E75   6174   6767   6465   6929   0701   7A00   8373
0000107640   06C7   0082   0A01   7F00   8183   8300   0081   CC83
0000107660   0106   002F   827F   6106   7463   6F69   006E   1182
0000107700   756E   5F6D   666F   655F   6378   7065   6974   6E6F
0000107720   0273   0E82   7865   6563   7470   6F69   5F6E   696C
0000107740   7473   0104   0018   8579   0450   8303   06D0   D183
0000107760   8206   280A   6E75   6174   6767   6465   6929   0A01
0000110000   7F00   C083   8306   06C0   C083   0106   001A   827F
0000110020   6906   616D   6567   0031   0682   6D69   6761   3265
0000110040   822E   6404   6669   5C66   1801   7900   A085   0301
```

THU MAR 14 17:28:26 1991 CRVN.EXE PAGE 35, LINE 2007

| | | | | | | | | |
|---|---|---|---|---|---|---|---|---|
| 0000110060 | D483 | 8306 | 06D5 | 0A82 | 7528 | 746E | 6761 | 6567 |
| 0000110100 | 2964 | 0169 | 0007 | 737A | C083 | 8206 | 0100 | 000A |
| 0000110120 | 837F | 0081 | D383 | 8306 | 06C0 | 2601 | 7F00 | 0E82 |
| 0000110140 | 756E | 5F6D | 666F | 735F | 7263 | 6565 | 736E | 8200 |
| 0000110160 | 690A | 616D | 6567 | 6C5F | 7369 | 0274 | 0482 | 6964 |
| 0000110200 | 6666 | 0106 | 0018 | 8579 | 0210 | 8303 | 06D7 | D883 |
| 0000110220 | 8206 | 280A | 6E75 | 6174 | 6767 | 6465 | 6929 | 0A01 |
| 0000110240 | 7F00 | 5483 | 8302 | 0254 | 8183 | 0100 | 0019 | 827F |
| 0000110260 | 6906 | 616D | 6567 | 0031 | 0682 | 6D69 | 6761 | 3265 |
| 0000110300 | 8220 | 6303 | 7475 | 0140 | 0018 | 8579 | 0940 | 8307 |
| 0000110320 | 06DD | DE83 | 8206 | 280A | 6E75 | 6174 | 6767 | 6465 |
| 0000110340 | 6929 | 1801 | 7900 | 0085 | 1D08 | DB83 | 8306 | 06DC |
| 0000110360 | 0A82 | 7528 | 746E | 6761 | 6567 | 2964 | .0169 | 0058 |
| 0000110400 | 837F | 0084 | 0E83 | 8306 | 0084 | 8483 | 8300 | 0639 |
| 0000110420 | 8183 | 8300 | 0538 | 3F83 | 8306 | 0675 | C583 | 8305 |
| 0000110440 | 0081 | BC83 | 8306 | 0642 | CB83 | 8306 | 0655 | 8183 |
| 0000110460 | 8300 | 06B8 | C083 | 8306 | 06CF | D283 | 8306 | 064B |
| 0000110500 | 8583 | 8300 | 0648 | D683 | 8306 | 064F | 0A83 | 8306 |
| 0000110520 | 066A | 7883 | 8306 | 0084 | 6F01 | 7F01 | 0A82 | 626B |
| 0000110540 | 5F64 | 7473 | 7461 | 7375 | 8200 | 7409 | 7365 | 5F74 |
| 0000110560 | 616E | 656D | 8200 | 6B08 | 7965 | 635F | 646F | 0065 |
| 0000110600 | 0C82 | 7773 | 7469 | 6863 | 735F | 6174 | 6574 | 8200 |
| 0000110620 | 6C0C | 636F | 7461 | 726F | 645F | 7369 | 0070 | 0E82 |
| 0000110640 | 7274 | 6361 | 696B | 676E | 6C5F | 7665 | 6C65 | 8200 |
| 0000110660 | 730C | 6163 | 656C | 775F | 6E69 | 6F64 | 0077 | 0982 |
| 0000110700 | 7973 | 636E | 6D5F | 646F | 0065 | 0A82 | 6966 | 746C |
| 0000110720 | 7265 | 6D5F | 6773 | 8200 | 6606 | 6C69 | 6574 | 0072 |
| 0000110740 | 0B82 | 7563 | 7272 | 6E65 | 5F74 | 6F61 | 0069 | 0C82 |
| 0000110760 | 6F68 | 6B74 | 7965 | 5F73 | 696C | 7473 | 8200 | 730A |
| 0000111000 | 6E79 | 5F63 | 7665 | 6E65 | 0074 | 0E82 | 7865 | 6563 |
| 0000111020 | 7470 | 6F69 | 5F6E | 696C | 7473 | 8200 | 6510 | 6378 |
| 0000111040 | 5F70 | 7473 | 7461 | 7375 | 6C5F | 7369 | 0074 | 0482 |
| 0000111060 | 6F6D | 6564 | 8200 | 730D | 666F | 6B74 | 7965 | 5F73 |
| 0000111100 | 696C | 7473 | 8200 | 6905 | 616D | 6567 | 8200 | 6307 |
| 0000111120 | 6D6F | 6170 | 6572 | 8200 | 770B | 6961 | 5F74 | 6373 |
| 0000111140 | 6572 | 6E65 | 8200 | 690A | 616D | 6567 | 6C5F | 7369 |
| 0000111160 | 0074 | 0982 | 6D69 | 6761 | 5F65 | 756E | 006D | 0A82 |
| 0000111200 | 6D69 | 6761 | 5F65 | 6964 | 6666 | 8200 | 680B | 6C61 |
| 0000111220 | 5F66 | 6D69 | 6761 | 7365 | 8200 | 6D07 | 7361 | 6173 |
| 0000111240 | 6567 | 8200 | 7006 | 7261 | 6D61 | 0073 | 0882 | 7566 |
| 0000111260 | 636E | 6B5F | 7965 | 8200 | 6908 | 6F63 | 5F6E | 736D |
| 0000111300 | 0067 | 0582 | 7564 | 6D6D | 0079 | 1601 | 7F00 | 8183 |
| 0000111320 | 8300 | 0688 | 8183 | 8300 | 0630 | DA83 | 8306 | 0081 |
| 0000111340 | 8583 | 0100 | 005A | 827F | 7306 | 756F | 6372 | 0065 |
| 0000111360 | 0A82 | 736D | 5F67 | 6568 | 6461 | 7265 | 8202 | 650A |
| 0000111400 | 6576 | 746E | 745F | 7079 | 1A65 | 0682 | 6974 | 696D |
| 0000111420 | 676E | 821C | 650B | 6576 | 746E | 765F | 6C61 | 6575 |
| 0000111440 | 8224 | 720C | 7465 | 7275 | 5F6E | 6176 | 756C | 8565 |
| 0000111460 | 0124 | 0982 | 6572 | 7073 | 665F | 616C | 8567 | 0126 |
| 0000111500 | 0101 | 8000 | 0101 | 8000 | 0101 | 8000 | 0101 | 8000 |
| 0000111520 | 0701 | 7A00 | 8373 | 06D9 | 0082 | 0101 | 8000 | 0101 |
| 0000111540 | 8000 | 0101 | 8000 | 0101 | 8000 | 0101 | 8000 | 0101 |
| * | | | | | | | | |
| 0000112360 | 8000 | 0101 | 8000 | 1601 | 7900 | 0440 | 4C83 | 8307 |
| 0000112400 | 074D | 0A82 | 7528 | 746E | 6761 | 6567 | 2964 | 0169 |
| 0000112420 | 000D | 837F | 0085 | 8583 | 8300 | 0081 | 8583 | 0100 |
| 0000112440 | 0036 | 827F | 7310 | 7475 | 635F | 6E6F | 656E | 7463 |
| 0000112460 | 665F | 616C | 0067 | 0D82 | 7573 | 5F74 | 6F6C | 6B63 |
| 0000112500 | 665F | 616C | 0267 | 0482 | 6F6D | 6564 | 8204 | 7308 |

THU MAR 14 17:28:26 1991 CRVN.EXE PAGE 36, LINE 2066

| | | | | | | | | |
|---|---|---|---|---|---|---|---|---|
| 0000112520 | 7465 | 665F | 616C | 0667 | 0101 | 8000 | 0701 | 7800 |
| 0000112540 | F085 | 8300 | 0080 | 0501 | 7800 | 8308 | 0080 | 0701 |
| 0000112560 | 7A00 | 8373 | 06E3 | 0082 | 0101 | 8000 | 0101 | 8000 |
| 0000112600 | 0A01 | 7500 | 8380 | 0081 | 0364 | 5583 | 0107 | 000A |
| 0000112620 | 837F | 00C5 | 8583 | 8300 | 0751 | 0A01 | 7500 | 8380 |
| 0000112640 | 0200 | 0173 | 5783 | 0107 | 0004 | 837F | 0085 | 0701 |
| 0000112660 | 7A00 | 8373 | 074B | 0082 | 0A01 | 7500 | 8380 | 0200 |
| 0000112700 | 0464 | 5A83 | 0107 | 000D | 837F | 0085 | 8583 | 8300 |
| 0000112720 | 0081 | 5883 | 0107 | 000A | 8075 | 0083 | 6402 | 8304 |
| 0000112740 | 075C | 0D01 | 7F00 | C583 | 8300 | 00C5 | C183 | 8300 |
| 0000112760 | 0758 | 0101 | 8000 | 0101 | 8000 | 0101 | 8000 | 0101 |
| 0000113000 | 8000 | 0A01 | 7500 | 8380 | 0200 | 0064 | 0183 | 0102 |
| 0000113020 | 0007 | 8578 | 0088 | 8083 | 0100 | 0007 | 8578 | 0090 |
| 0000113040 | 8083 | 0100 | 000A | 8075 | 8183 | 6400 | 8300 | 0201 |
| 0000113060 | 0701 | 7800 | 0085 | 8310 | 0080 | 0501 | 7800 | 8320 |
| 0000113100 | 0080 | 0501 | 7800 | 8328 | 0080 | 0501 | 7800 | 8338 |
| 0000113120 | 0080 | 0501 | 7800 | 8310 | 0080 | 0701 | 7800 | A085 |
| 0000113140 | 8300 | 0080 | 0501 | 7800 | 8318 | 0080 | 0401 | 7F00 |
| 0000113160 | 5183 | 0107 | 000A | 8075 | 8183 | 6400 | 8301 | 076C |
| 0000113200 | 0A01 | 7F00 | C583 | 8300 | 0085 | 5183 | 0107 | 000A |
| 0000113220 | 8075 | 8183 | 6400 | 8303 | 076E | 0401 | 7F00 | 8183 |
| 0000113240 | 0100 | 000A | 8075 | 0083 | 6402 | 8301 | 0770 | 0101 |
| 0000113260 | 8000 | 0101 | 8000 | 0501 | 7800 | 8360 | 0082 | 0501 |
| 0000113300 | 7800 | 8340 | 0080 | 0501 | 7800 | 8360 | 0080 | 0401 |
| 0000113320 | 7F00 | 8583 | 0100 | 000A | 8075 | 0083 | 7302 | 8301 |
| 0000113340 | 0777 | 0701 | 7800 | C885 | 8300 | 0080 | 0701 | 7800 |
| 0000113360 | D085 | 8300 | 0080 | 0701 | 7800 | B085 | 8300 | 0080 |
| 0000113400 | 0401 | 7F00 | E383 | 0106 | 000A | 8075 | 8183 | 6400 |
| 0000113420 | 8301 | 077C | 0401 | 7F00 | E383 | 0106 | 000A | 8075 |
| 0000113440 | 8183 | 6400 | 8301 | 077E | 0401 | 7F00 | E383 | 0106 |
| 0000113460 | 000A | 8075 | 8183 | 6400 | 8301 | 0780 | 0701 | 7800 |
| 0000113500 | C085 | 8300 | 0080 | 0401 | 7F00 | E383 | 0106 | 000A |
| 0000113520 | 8075 | 8183 | 6400 | 8301 | 0783 | 0101 | 8000 | 0101 |
| 0000113540 | 8000 | 0701 | 7F00 | 8183 | 8300 | 0205 | 0A01 | 7500 |
| 0000113560 | 8380 | 0081 | 0264 | 8783 | 0107 | 0007 | 8578 | 0400 |
| 0000113600 | 8083 | 0100 | 0007 | 8578 | 0080 | 8083 | 0100 | 0007 |
| 0000113620 | 8578 | 0098 | 8083 | 0100 | 0007 | 8578 | 00D8 | 8083 |
| 0000113640 | 0100 | 0005 | 7078 | 8083 | 0100 | 0007 | 8578 | 00B8 |
| 0000113660 | 8083 | 0100 | 000D | 837F | 0085 | 8583 | 8300 | 0081 |
| 0000113700 | 5883 | 0107 | 000A | 8075 | 0083 | 6402 | 8304 | 078F |
| 0000113720 | 0D01 | 7F00 | C583 | 8300 | 00C5 | C183 | 8300 | 0758 |
| 0000113740 | 0A01 | 7500 | 8380 | 0200 | 0464 | 9183 | 0107 | 0004 |
| 0000113760 | 837F | 00C4 | 0A01 | 7500 | 8380 | 0200 | 0164 | 9383 |
| 0000114000 | 0107 | 0004 | 837F | 0084 | 0A01 | 7500 | 8380 | 0200 |
| 0000114020 | 0164 | 9583 | 0107 | 0001 | 0180 | 0001 | 0180 | 0001 |
| 0000114040 | 0180 | 0001 | 0180 | 0001 | 0180 | 0001 | 0180 | 0001 |
| * | | | | | | | | |
| 0000114300 | 0180 | 0001 | 0180 | 0007 | 8578 | 0100 | 8083 | 0100 |
| 0000114320 | 0001 | 0180 | 0001 | 0180 | 0001 | 0180 | 0001 | 0180 |
| * | | | | | | | | |
| 0000120240 | 0001 | 0180 | 0001 | 0180 | 0016 | 2079 | 8302 | 0424 |
| 0000120260 | 2583 | 8204 | 280A | 6E75 | 6174 | 6767 | 6465 | 6929 |
| 0000120300 | 0701 | 7F00 | 8183 | 8300 | 0081 | 0901 | 7F00 | 0182 |
| 0000120320 | 0078 | 0182 | 0279 | 1601 | 7900 | 0240 | 2783 | 8304 |
| 0000120340 | 0428 | 0A82 | 7528 | 746E | 6761 | 6567 | 2964 | 0169 |
| 0000120360 | 0007 | 837F | 0423 | 2383 | 0104 | 000D | 827F | 6D03 |
| 0000120400 | 6E69 | 8200 | 6D03 | 7861 | 0104 | 0001 | 0180 | 0016 |
| 0000120420 | 2079 | 8302 | 042B | 2C83 | 8204 | 280A | 6E75 | 6174 |
| 0000120440 | 6767 | 6465 | 6929 | 0701 | 7F00 | 8583 | 8300 | 0085 |

```
THU MAR 14 17:28:26 1991  CRVN.EXE  PAGE 37, LINE 2125

0000120460  1201  7F00  0582  6977  7464  0068  0682  6568
0000120500  6769  7468  0102  0001  0180  0016  4079  8302
0000120520  042F  3083  8204  280A  6E75  6174  6767  6465
0000120540  6929  0701  7F00  2383  8304  042A  1101  7F00
0000120560  0682  726F  6769  6E69  8200  6104  6572  0461
0000120600  0101  8000  0101  8000  0101  8000  0101  8000
*
0000121060  0101  8000  1601  7900  0330  5F83  8304  0460
0000121100  0A82  7528  746E  6761  6567  2964  0169  000A
0000121120  837F  0085  8583  8300  0085  1A01  7F00  0582
0000121140  6977  7464  0068  0682  6568  6769  7468  8202
0000121160  6405  7065  6874  0104  0018  8579  0140  8308
0000121200  0463  6483  8204  280A  6E75  6174  6767  6465
0000121220  6929  0701  7800  8085  8300  0084  1901  7F00
0000121240  8183  8300  045E  8583  8300  0085  C483  8300
0000121260  0082  E483  8300  0462  5A01  7F00  0682  6572
0000121300  7270  7365  8200  6406  6D69  6E65  0273  1082
0000121320  6164  6174  6C5F  7961  7265  645F  7065  6874
0000121340  8208  7308  6769  735F  7A69  0A65  0782  6973
0000121360  5F67  7470  0C72  0982  7462  706D  735F  7A69
0000121400  1065  0882  7462  706D  705F  7274  8214  7305
0000121420  6170  6572  0118  0001  0180  0018  8579  05A0
0000121440  830C  0468  6983  8204  280A  6E75  6174  6767
0000121460  6465  6929  0701  7800  8085  8301  0084  2501
0000121500  7F00  8683  8300  022C  2C83  8302  0086  8183
0000121520  8300  0085  8683  8300  0082  8683  8300  0423
0000121540  6183  8304  0467  7E01  7F00  0282  6469  8200
0000121560  6E04  6D61  0465  0982  6966  656C  6E5F  6D61
0000121600  2465  0982  7865  5F70  6374  695F  4464  0482
0000121620  7974  6570  8248  720C  6665  6C5F  6E69  5F65
0000121640  756E  4A6D  0982  6572  5F66  6374  695F  4C64
0000121660  0A82  6974  656D  735F  6174  706D  8250  6106
0000121700  696F  695F  5464  0882  6F6C  6163  6974  6E6F
0000121720  8258  6209  6D74  5F70  6E69  6F66  825C  7305
0000121740  6170  6572  8485  0100  0001  0180  0001  0180
0000121760  0001  0180  0001  0180  0001  0180  0001  0180
*
0000122020  0007  737A  6683  8204  0100  0001  0180  0001
0000122040  0180  0001  0180  0001  0180  0001  0180  0001
*
0000122460  0180  0018  8579  02C0  8307  04BD  BE83  8204
0000122500  280A  6E75  6174  6767  6465  6929  0701  7800
0000122520  2085  8301  0084  1601  7F00  8683  8300  022C
0000122540  2683  8304  0081  8183  8300  0082  BC83  0104
0000122560  0038  827F  6902  0064  0482  616E  656D  8204
0000122600  7204  6365  2474  0482  7461  7274  822C  6405
0000122620  6D75  796D  822E  740A  6D69  5F65  7473  6D61
0000122640  3070  0582  7073  7261  3465  0101  8000  0101
0000122660  8000  0101  8000  0101  8000  0101  8000  0101
*
0000123060  8000  0101  8000  1801  7900  1085  1101  E383
0000123100  8304  04E4  0A82  7528  746E  6761  6567  2964
0000123120  0169  0034  837F  0085  8583  8300  0085  8583
0000123140  8300  0085  8583  8300  0081  8583  8300  0085
0000123160  8583  8300  0084  8583  8300  0085  8583  8300
0000123200  0085  8583  8300  0085  0601  7F01  0982  6974
0000123220  656D  755F  696E  0074  0F82  696D  5F6E  6572
0000123240  6F63  6472  745F  6D69  0265  0982  7473  6261
0000123260  6C69  7469  0479  0F82  6163  7470  7275  5F65
```

THU MAR 14 17:28:26 1991 CRVN.EXE PAGE 38, LINE 2184

```
0000123300  6974  656D  756F  0674  0A82  656B  5F79  6F66
0000123320  6D72  7461  8208  6313  6E6F  6974  756E  756F
0000123340  5F73  7274  6361  696B  676E  820A  6D0E  756F
0000123360  6573  745F  6172  6B63  6E69  0C67  1182  6163
0000123400  7470  7275  5F65  6973  6E67  7461  7275  0E65
0000123420  0B82  6F68  6B74  7965  735F  6E79  1063  0C82
0000123440  6564  6166  6C75  5F74  6974  656D  8212  6D09
0000123460  7861  645F  6C65  7961  8214  660B  7361  5F74
0000123500  6572  6C70  7961  8216  760E  7265  6669  5F79
0000123520  6974  656D  756F  1874  0C82  6177  7469  745F
0000123540  6D69  6F65  7475  821A  730C  6E79  5F63  6974
0000123560  656D  756F  1C74  0982  6874  6572  6873  6C6F
0000123600  1E64  0C82  6863  6365  5F6B  6F6C  6B6F  7075
0000123620  0120  0001  0180  0007  8578  0800  8083  0100
0000123640  0001  0180  0001  0180  0001  0180  0001  0180
*
0000124040  0001  0180  0016  4079  8302  0509  0A83  8205
0000124060  280A  6E75  6174  6767  6465  6929  0701  7F00
0000124100  8283  8300  0082  1701  7F00  0882  6564  5F66
0000124120  6974  656D  8200  6D08  6E69  745F  6D69  0465
0000124140  0101  8000  0101  8000  0101  8000  0101  8000
0000124160  0101  8000  0101  8000  1601  7900  0440  1283
0000124200  8305  0513  0A82  7528  746E  6761  6567  2964
0000124220  0169  000D  837F  0084  8483  8300  0084  2383
0000124240  0104  0029  827F  6107  7362  725F  6C65  8200
0000124260  7505  696E  7374  8201  730C  6570  6963  6C61
0000124300  665F  6E75  0263  0482  6964  7073  0104  0001
0000124320  0180  0001  0180  0001  0180  0016  2079  8302
0000124340  0518  1983  8205  280A  6E75  6174  6767  6465
0000124360  6929  0701  7F00  8183  8300  0081  1E01  7F00
0000124400  0982  7973  636E  6D5F  646F  0065  0E82  7973
0000124420  636E  655F  6578  5F63  6F6D  6564  0102  0016
0000124440  3079  8302  051B  1C83  8205  280A  6E75  6174
0000124460  6767  6465  6929  0701  7F00  8283  8300  0081
0000124500  1901  7F00  0782  6574  6863  695F  0064  0B82
0000124520  6574  6863  725F  6165  6F73  046E  0101  8000
0000124540  0101  8000  0101  8000  1801  7900  2085  0302
0000124560  2183  8305  0522  0A82  7528  746E  6761  6567
0000124600  2964  0169  000A  837F  022C  2C83  8302  0086
0000124620  1A01  7F00  0582  6D69  6761  0065  0482  6964
0000124640  6666  8220  6407  6669  5F66  6469  0140  0018
0000124660  8579  0310  8302  0525  2683  8205  280A  6E75
0000124700  6174  6767  6465  6929  0701  7800  0085  8303
0000124720  022C  0701  7F00  8583  8300  0524  2401  7F00
0000124740  0E82  756E  5F6D  666F  735F  7263  6565  736E
0000124760  8200  690F  616D  6567  6E5F  6D61  5F65  696C
0000125000  7473  0102  0016  2079  8301  0528  2983  8205
0000125020  280A  6E75  6174  6767  6465  6929  0401  7F00
0000125040  C083  0100  000A  827F  7306  7274  6E69  0067
0000125060  0101  8000  0101  8000  0101  8000  1601  7900
0000125100  0230  2E83  8305  052F  0A82  7528  746E  6761
0000125120  6567  2964  0169  0007  837F  0082  8183  0100
0000125140  001E  827F  650C  6378  7065  6974  6E6F  695F
0000125160  0064  0B82  7865  7063  735F  6174  7574  0473
0000125200  1601  7900  0220  3483  8305  0535  0A82  7528
0000125220  746E  6761  6567  2964  0169  0016  0879  8302
0000125240  0532  3383  8205  280A  6E75  6174  6767  6465
0000125260  6929  0701  7F00  8483  8300  0084  1B01  7F00
0000125300  0882  656B  5F79  6F63  6564  8200  730C  6977
```

THU MAR 14 17:28:26 1991 CRVN.EXE PAGE 39, LINE 2243

| | | | | | | | | |
|---|---|---|---|---|---|---|---|---|
| 0000125320 | 6374 | 5F68 | 7473 | 7461 | 0065 | 0701 | 7F00 | 8183 |
| 0000125340 | 8300 | 0531 | 1801 | 7F00 | 0882 | 656B | 5F79 | 7974 |
| 0000125360 | 6570 | 8200 | 6B09 | 7965 | 765F | 6C61 | 6575 | 0102 |
| 0000125400 | 0018 | 8579 | 0230 | 8304 | 0538 | 3983 | 8205 | 280A |
| 0000125420 | 6E75 | 6174 | 6767 | 6465 | 6929 | 0701 | 7800 | 0085 |
| 0000125440 | 8302 | 0530 | 0D01 | 7F00 | 8583 | 8300 | 0537 | 8183 |
| 0000125460 | 8300 | 0081 | 2E01 | 7F00 | 0882 | 6573 | 5F71 | 6973 |
| 0000125500 | 657A | 8200 | 7303 | 7165 | 8202 | 6B08 | 7965 | 615F |
| 0000125520 | 7474 | 4272 | 0E82 | 6361 | 6974 | 6176 | 6574 | 5F64 |
| 0000125540 | 7566 | 636E | 0144 | 0001 | 0180 | 0001 | 0180 | 0001 |
| 0000125560 | 0180 | 0001 | 0180 | 0001 | 0180 | 0001 | 0180 | 00U1 |
| 0000125600 | 0180 | 0001 | 0180 | 0016 | 2079 | 8302 | 0543 | 4483 |
| 0000125620 | 8205 | 280A | 6E75 | 6174 | 6767 | 6465 | 6929 | 0701 |
| 0000125640 | 7F00 | 8183 | 8300 | 0081 | 1701 | 7F00 | 0882 | 656B |
| 0000125660 | 5F79 | 7461 | 7274 | 8200 | 6608 | 6E75 | 5F63 | 656B |
| 0000125700 | 0279 | 1801 | 7900 | 1085 | 0202 | 4683 | 8305 | 0547 |
| 0000125720 | 0A82 | 7528 | 746E | 6761 | 6567 | 2964 | 0169 | 0007 |
| 0000125740 | 837F | 0085 | 3783 | 0105 | 0012 | 827F | 7308 | 7165 |
| 0000125760 | 735F | 7A69 | 0065 | 0382 | 6573 | 0271 | 0101 | 8000 |
| 0000126000 | 0101 | 8000 | 0101 | 8000 | 0101 | 8000 | 0101 | 8000 |
| 0000126020 | 1801 | 7900 | D085 | 0202 | 4E83 | 8305 | 054F | 0A82 |
| 0000126040 | 7528 | 746E | 6761 | 6567 | 2964 | 0169 | 0007 | 837F |
| 0000126060 | 04BB | 8183 | 0100 | 0011 | 827F | 6606 | 6C69 | 6574 |
| 0000126100 | 0072 | 0482 | 6F6D | 6564 | 0158 | 0018 | 8579 | 0150 |
| 0000126120 | 8305 | 0551 | 5283 | 8205 | 280A | 6E75 | 6174 | 6767 |
| 0000126140 | 6465 | 6929 | 1001 | 7F00 | 2C83 | 8302 | 0086 | 8183 |
| 0000126160 | 8300 | 0081 | 8183 | 0100 | 002B | 827F | 6E04 | 6D61 |
| 0000126200 | 0065 | 0682 | 696C | 5F62 | 6469 | 8220 | 6305 | 616C |
| 0000126220 | 7373 | 8224 | 7305 | 7974 | 656C | 8226 | 6F07 | 5F70 |
| 0000126240 | 6F63 | 6564 | 0128 | 0001 | 0180 | 0001 | 0180 | 0001 |
| 0000126260 | 0180 | 001B | 2079 | 8309 | 0557 | 5883 | 8205 | 690F |
| 0000126300 | 755F | 6D5F | 6773 | 705F | 7261 | 6D61 | 745F | 0169 |
| 0000126320 | 001C | 837F | 0081 | 8583 | 8300 | 0082 | 8683 | 8300 |
| 0000126340 | 0088 | 8083 | 8300 | 0084 | C083 | 8300 | 00C0 | 6A01 |
| 0000126360 | 7F00 | 0982 | 5F69 | 5F75 | 6873 | 726F | 0074 | 0A82 |
| 0000126400 | 5F69 | 5F75 | 7375 | 6F68 | 7472 | 8200 | 6908 | 755F |
| 0000126420 | 6C5F | 6E6F | 0067 | 0982 | 5F69 | 5F75 | 6C75 | 6E6F |
| 0000126440 | 0067 | 0982 | 5F69 | 5F75 | 6C66 | 616F | 0074 | 0882 |
| 0000126460 | 5F69 | 5F75 | 6863 | 7261 | 8200 | 6909 | 755F | 755F |
| 0000126500 | 6863 | 7261 | 8200 | 6907 | 755F | 735F | 7274 | 8200 |
| 0000126520 | 6909 | 755F | 625F | 6F6C | 6B63 | 0100 | 0019 | 3079 |
| 0000126540 | 8302 | 055A | 5B83 | 8205 | 690D | 6D5F | 6773 | 705F |
| 0000126560 | 7261 | 6D61 | 745F | 0169 | 0007 | 837F | 0085 | 5683 |
| 0000126600 | 0105 | 0010 | 827F | 7404 | 7079 | 0065 | 0582 | 6176 |
| 0000126620 | 756C | 0265 | 0101 | 8000 | 1C01 | 7900 | 9085 | 0900 |
| 0000126640 | 5E83 | 8305 | 055F | 0E82 | 5F69 | 736D | 5F67 | 6568 |
| 0000126660 | 6461 | 7265 | 745F | 0169 | 001C | 837F | 0081 | 8183 |
| 0000126700 | 8300 | 0085 | 8583 | 8300 | 0084 | 8583 | 8300 | 0085 |
| 0000126720 | 8183 | 8300 | 0085 | 4701 | 7F00 | 0482 | 5F71 | 6469 |
| 0000126740 | 8200 | 7306 | 756F | 6372 | 0265 | 0382 | 6970 | 0464 |
| 0000126760 | 0382 | 6974 | 0664 | 0482 | 6572 | 7073 | 8208 | 7208 |
| 0000127000 | 7365 | 5F70 | 6974 | 0A64 | 0782 | 706F | 635F | 646F |
| 0000127020 | 0C65 | 0482 | 7974 | 6570 | 820E | 7304 | 7A69 | 1065 |
| 0000127040 | 1501 | 7900 | C085 | 0200 | 6283 | 8305 | 0563 | 0782 |
| 0000127060 | 5F69 | 736D | 5F67 | 6974 | 0501 | 7800 | 8330 | 0559 |
| 0000127100 | 0701 | 7F00 | 5D83 | 8305 | 0561 | 1701 | 7F00 | 0682 |
| 0000127120 | 6568 | 6461 | 7265 | 8200 | 700A | 7261 | 6D61 | 6C5F |
| 0000127140 | 7369 | 1274 | 0101 | 8000 | 0101 | 8000 | 0101 | 8000 |
| 0000127160 | 0101 | 8000 | 0101 | 8000 | 0101 | 8000 | 0101 | 8000 |

THU MAR 14 17:28:26 1991  CRVN.EXE  PAGE 40, LINE 2302

*

| | | | | | | | | |
|---|---|---|---|---|---|---|---|---|
| 0000127420 | 0101 | 8000 | 1601 | 7900 | 0340 | 9283 | 8305 | 0593 |
| 0000127440 | 0A82 | 7528 | 746E | 6761 | 6567 | 2964 | 0169 | 0007 |
| 0000127460 | 737A | 3683 | 8205 | 0100 | 000A | 837F | 0081 | 8183 |
| 0000127500 | 8300 | 0591 | 2B01 | 7F00 | 0682 | 6361 | 6974 | 6E6F |
| 0000127520 | 8200 | 6E0F | 6D75 | 6F5F | 5F66 | 6F73 | 7466 | 656B |
| 0000127540 | 7379 | 8202 | 730C | 666F | 6B74 | 7965 | 5F73 | 7470 |
| 0000127560 | 0472 | 1601 | 7900 | 0340 | 9683 | 8305 | 0597 | 0A82 |
| 0000127600 | 7528 | 746E | 6761 | 6567 | 2964 | 0169 | 0007 | 737A |
| 0000127620 | 4583 | 8205 | 0100 | 000A | 837F | 0081 | 8183 | 8300 |
| 0000127640 | 0595 | 2901 | 7F00 | 0682 | 6361 | 6974 | 6E6F | 8200 |
| 0000127660 | 6E0E | 6D75 | 6F5F | 5F66 | 6F68 | 6B74 | 7965 | 0273 |
| 0000127700 | 0B82 | 6F66 | 6B74 | 7965 | 5F73 | 7470 | 0472 | 1801 |
| 0000127720 | 7900 | 7085 | 0501 | 9983 | 8305 | 059A | 0A82 | 7528 |
| 0000127740 | 746E | 6761 | 6567 | 2964 | 0169 | 0010 | 837F | 022C |
| 0000127760 | 8683 | 8300 | 0474 | E483 | 8300 | 0085 | 3D01 | 7F00 |
| 0000130000 | 0A82 | 6D69 | 6761 | 5F65 | 616E | 656D | 8200 | 6908 |
| 0000130020 | 616D | 6567 | 695F | 2064 | 0982 | 6D69 | 6761 | 5F65 |
| 0000130040 | 7470 | 2472 | 0982 | 616C | 6579 | 5F72 | 7470 | 2872 |
| 0000130060 | 0982 | 6D69 | 6761 | 5F65 | 6468 | 2C6C | 0101 | 8000 |
| 0000130100 | 0101 | 8000 | 0101 | 8000 | 0101 | 8000 | 1801 | 7900 |
| 0000130120 | 9085 | 0201 | A083 | 8305 | 05A1 | 0A82 | 7528 | 746E |
| 0000130140 | 6761 | 6567 | 2964 | 0169 | 0007 | 837F | 0082 | 9883 |
| 0000130160 | 0105 | 0018 | 827F | 650C | 6378 | 7065 | 6974 | 6E6F |
| 0000130200 | 695F | 0064 | 0582 | 6D69 | 6761 | 0465 | 0101 | 8000 |
| 0000130220 | 1601 | 7900 | 0340 | A583 | 8305 | 05A6 | 0A82 | 7528 |
| 0000130240 | 746E | 6761 | 6567 | 2964 | 0169 | 0007 | 737A | 9F83 |
| 0000130260 | 8205 | 0100 | 000A | 837F | 0081 | 8183 | 8300 | 05A4 |
| 0000130300 | 2F01 | 7F00 | 0682 | 6361 | 6974 | 6E6F | 8200 | 6E11 |
| 0000130320 | 6D75 | 6F5F | 5F66 | 7865 | 6563 | 7470 | 6F69 | 736E |
| 0000130340 | 8202 | 650E | 6378 | 7065 | 6974 | 6E6F | 6C5F | 7369 |
| 0000130360 | 0474 | 1801 | 7900 | 5085 | 0304 | A883 | 8305 | 05A9 |
| 0000130400 | 0A82 | 7528 | 746E | 6761 | 6567 | 2964 | 0169 | 000A |
| 0000130420 | 837F | 0598 | 9883 | 8305 | 0598 | 1A01 | 7F00 | 0682 |
| 0000130440 | 6D69 | 6761 | 3165 | 8200 | 6906 | 616D | 6567 | 2E32 |
| 0000130460 | 0482 | 6964 | 6666 | 015C | 0018 | 8579 | 01A0 | 8303 |
| 0000130500 | 05AC | AD83 | 8205 | 280A | 6E75 | 6174 | 6767 | 6465 |
| 0000130520 | 6929 | 0701 | 7A00 | 8373 | 0598 | 0082 | 0A01 | 7F00 |
| 0000130540 | 8183 | 8300 | 05AB | 9883 | 0105 | 0026 | 827F | 6E0E |
| 0000130560 | 6D75 | 6F5F | 5F66 | 6373 | 6572 | 6E65 | 0073 | 0A82 |
| 0000130600 | 6D69 | 6761 | 5F65 | 696C | 7473 | 8202 | 6404 | 6669 |
| 0000130620 | 0666 | 1801 | 7900 | 1085 | 0302 | AF83 | 8305 | 05B0 |
| 0000130640 | 0A82 | 7528 | 746E | 6761 | 6567 | 2964 | 0169 | 000A |
| 0000130660 | 837F | 022C | 2C83 | 8302 | 0081 | 1901 | 7F00 | 0682 |
| 0000130700 | 6D69 | 6761 | 3165 | 8200 | 6906 | 616D | 6567 | 2032 |
| 0000130720 | 0382 | 7563 | 4074 | 1801 | 7900 | 4085 | 0709 | B583 |
| 0000130740 | 8305 | 05B6 | 0A82 | 7528 | 746E | 6761 | 6567 | 2964 |
| 0000130760 | 0169 | 0018 | 8579 | 0800 | 831D | 05B3 | B483 | 8205 |
| 0000131000 | 280A | 6E75 | 6174 | 6767 | 6465 | 6929 | 5801 | 7F00 |
| 0000131020 | 8483 | 8300 | 04E6 | 8483 | 8300 | 0084 | 1183 | 8305 |
| 0000131040 | 0081 | 2E83 | 8304 | 0517 | 4D83 | 8305 | 04BB | 8183 |
| 0000131060 | 8300 | 0594 | 1A83 | 8305 | 05A3 | 2D83 | 8305 | 0081 |
| 0000131100 | 9083 | 8305 | 0598 | A783 | 8305 | 05AA | 2383 | 8305 |
| 0000131120 | 0085 | 2083 | 8305 | 05AE | 2783 | 8305 | 04E2 | 4283 |
| 0000131140 | 8305 | 0550 | 8483 | 0100 | 016F | 827F | 6B0A | 6462 |
| 0000131160 | 735F | 6174 | 7574 | 0073 | 0982 | 6574 | 7473 | 6E5F |
| 0000131200 | 6D61 | 0065 | 0882 | 656B | 5F79 | 6F63 | 6564 | 8200 |
| 0000131220 | 730C | 6977 | 6374 | 5F68 | 7473 | 7461 | 0065 | 0C82 |
| 0000131240 | 6F6C | 6163 | 6F74 | 5F72 | 6964 | 7073 | 8200 | 740E |

```
THU MAR 14 17:28:26 1991  CRVN.EXE  PAGE 41, LINE 2361

0000131260   6172  6B63  6E69  5F67  656C  6576  006C  0C82
0000131300   6373  6C61  5F65  6977  646E  776F  8200  7309
0000131320   6E79  5F63  6F6D  6564  8200  660A  6C69  6574
0000131340   5F72  736D  0067  0682  6966  746C  7265  8200
0000131360   630B  7275  6572  746E  615F  696F  8200  680C
0000131400   746F  656B  7379  6C5F  7369  0074  0A82  7973
0000131420   636E  655F  6576  746E  8200  650E  6378  7065
0000131440   6974  6E6F  6C5F  7369  0074  1082  7865  7063
0000131460   735F  6174  7574  5F73  696C  7473  8200  6D04
0000131500   646F  0065  0D82  6F73  7466  656B  7379  6C5F
0000131520   7369  0074  0582  6D69  6761  0065  0782  6F63
0000131540   706D  7261  0065  0B82  6177  7469  735F  7263
0000131560   6565  006E  0A82  6D69  6761  5F65  696C  7473
0000131600   8200  6909  616D  6567  6E5F  6D75  8200  690A
0000131620   616D  6567  645F  6669  0066  0B82  6168  666C
0000131640   695F  616D  6567  0073  0782  616D  7373  6761
0000131660   0065  0682  6170  6172  736D  8200  6608  6E75
0000131700   5F63  656B  0079  0882  6369  6E6F  6D5F  6773
0000131720   8200  6405  6D75  796D  0100  0016  837F  0081
0000131740   6083  8305  0081  0883  8305  05B2  8183  8300
0000131760   0085  5A01  7F00  0682  6F73  7275  6563  8200
0000132000   6D0A  6773  685F  6165  6564  0272  0A82  7665
0000132020   6E65  5F74  7974  6570  821A  7406  6D69  6E69
0000132040   1C67  0B82  7665  6E65  5F74  6176  756C  2465
0000132060   0C82  6572  7574  6E72  765F  6C61  6575  2485
0000132100   8201  7209  7365  5F70  6C66  6761  2685  0101
0000132120   0001  0180  0001  0180  0001  0180  0001  0180
*
0000132160   0001  0180  0001  0180  0001  0180  0007  737A
0000132200   B183  8205  0100  0001  0180  0001  0180  0001
0000132220   0180  0001  0180  0001  0180  0001  0180  0001
*
0000132300   0180  0001  0180  0001  0180  0001  0180  0004
0000132320   837F  05C2  0A01  7500  8380  0081  0164  D583
0000132340   0505  0111  0000  1F00  4C01  6123  A207  1000
0000132360   9700  0000  0400  6910  696E  5F74  6C67  626F
0000132400   6C61  645F  7461  0961  F804  81FF  0300  7265
0000132420   0F72  FA04  86FF  0900  6C75  6E6F  5F67  6170
0000132440   0E72  F604  85FF  0800  6F62  6C6F  705F  7261
0000132460   0201  0117  23EE  0764  0509  0010  04FE  0000
0000132500   0804  7263  5F76  6E69  7469  0409  FAF2  0081
0000132520   6503  7272  0411  FAF4  060E  650B  7272  705F
0000132540   7261  6D61  315F  0411  F9F2  060E  650B  7272
0000132560   705F  7261  6D61  325F  040F  FEFC  060E  6609
0000132600   6C69  5F65  616E  656D  040B  FBFA  0765  6605
0000132620   616E  656D  040D  FBF6  00C0  7007  7261  705F
0000132640   7274  040C  F9EE  048D  6606  6C69  5F65  0E70
0000132660   FA04  0EFD  0806  7265  5F72  6170  6874  040E
0000132700   FFFC  0085  6508  7272  6C5F  6E69  0C65  FA04
0000132720   81FE  0600  7473  7461  7375  0410  FBF4  0081
0000132740   670A  6F6C  6162  5F6C  7265  0F72  950B  0028
0000132760   650A  7272  725F  7465  7275  146E  C90B  0028
0000133000   650F  7272  705F  7069  5F65  6572  7574  6E72
0000133020   0201  011D  28F7  076D  039F  0010  0394  0000
0000133040   0E04  6567  5F74  656E  7478  655F  6576  746E
0000133060   0414  0006  0751  650E  6576  746E  705F  7274
0000133100   615F  6464  0B72  F404  81FF  0500  7265  6F72
0000133120   0F72  EE04  85FF  0900  6573  5F6D  6E69  6564
0000133140   0C78  EC04  85FF  0600  6572  7573  746C  0410
```

THU MAR 14 17:28:26 1991 CRVN.EXE PAGE 42, LINE 2420

| | | | | | | | | |
|---|---|---|---|---|---|---|---|---|
| 0000133160 | FFFA | 0082 | 640A | 6C65 | 6174 | 745F | 6D69 | 1065 |
| 0000133200 | F004 | 82FF | 0A00 | 7563 | 7272 | 745F | 6D69 | 7265 |
| 0000133220 | 0411 | FFF6 | 0082 | 730B | 6174 | 6C62 | 5F65 | 6974 |
| 0000133240 | 656D | 0512 | 035C | 0005 | 0085 | 6D0A | 756F | 6573 |
| 0000133260 | 665F | 616C | 1267 | 5E05 | 0503 | 8500 | 0A00 | 616C |
| 0000133300 | 7473 | 6D5F | 756F | 6573 | 0201 | 0121 | 2C96 | 076F |
| 0000133320 | 00A2 | 0010 | 0097 | 0000 | 1204 | 6E69 | 7570 | 5F74 |
| 0000133340 | 7665 | 6E65 | 5F74 | 7773 | 7469 | 6863 | 0414 | 0006 |
| 0000133360 | 00C5 | 6D0E | 756F | 6573 | 665F | 616C | 5F67 | 7470 |
| 0000133400 | 0F72 | 0A04 | 8500 | 0900 | 6573 | 5F6D | 6E69 | 6564 |
| 0000133420 | 1778 | 0C04 | 5100 | 1107 | 7665 | 6E65 | 5F74 | 7470 |
| 0000133440 | 5F72 | 6461 | 7264 | 7365 | 0973 | FA04 | 85FF | 0300 |
| 0000133460 | 6572 | 0B73 | FC04 | 81FF | 0500 | 7265 | 6F72 | 0D72 |
| 0000133500 | 7A05 | 050E | D900 | 0506 | 7665 | 6E65 | 0174 | 1B02 |
| 0000133520 | 3801 | 712D | 7C07 | 1001 | 7100 | 0001 | 0400 | 630C |
| 0000133540 | 7672 | 735F | 7568 | 6474 | 776F | 0A6E | 0604 | 8100 |
| 0000133560 | 0400 | 6F63 | 6564 | 040C | FFFA | 00C0 | 5F06 | 745F |
| 0000133600 | 7079 | 0F65 | F404 | 85FF | 0900 | 5F5F | 7862 | 745F |
| 0000133620 | 7079 | 0D65 | E404 | C9FF | 0704 | 5F5F | 7270 | 6E69 |
| 0000133640 | 0B74 | DC04 | 02FF | 0502 | 5F5F | 766C | 0D6C | E804 |
| 0000133660 | 74FF | 0707 | 5F5F | 6C63 | 636F | 0D6B | F604 | C0FF |
| 0000133700 | 0700 | 5F5F | 7473 | 6361 | 0E6B | E204 | 81FF | 0800 |
| 0000133720 | 5F5F | 6572 | 7674 | 6C61 | 050E | 037C | 0005 | 024F |
| 0000133740 | 5F06 | 665F | 6E75 | 0163 | 1B02 | B401 | 782E | A007 |
| 0000133760 | 1000 | 9300 | 0000 | 0400 | 630C | 7672 | 635F | 656C |
| 0000134000 | 6E61 | 755F | 0A70 | 0604 | 8500 | 0400 | 6F63 | 6564 |
| 0000134020 | 0409 | FFFC | 0081 | 6503 | 7272 | 0201 | 0126 | 2F54 |
| 0000134040 | 077D | 0043 | 0010 | 0038 | 0000 | 1704 | 7263 | 5F76 |
| 0000134060 | 6F6D | 7375 | 5F65 | 656B | 6279 | 756F | 6472 | 6B5F |
| 0000134100 | 7965 | 0F73 | 0604 | E300 | 0906 | 7665 | 6E65 | 5F74 |
| 0000134120 | 7470 | 0972 | FC04 | 81FF | 0300 | 7265 | 0172 | 1902 |
| 0000134140 | 9701 | 7F2F | 2907 | 1000 | 1E00 | 0000 | 0400 | 630A |
| 0000134160 | 7672 | 745F | 6D69 | 6E69 | 0F67 | 0604 | E300 | 0906 |
| 0000134200 | 7665 | 6E65 | 5F74 | 7470 | 0172 | 2202 | C001 | 812F |
| 0000134220 | 1707 | 1002 | 0C00 | 0002 | 0400 | 6313 | 7672 | 635F |
| 0000134240 | 6572 | 7461 | 5F65 | 7561 | 6F74 | 7973 | 636E | 040F |
| 0000134260 | 0006 | 06E3 | 6509 | 6576 | 746E | 705F | 7274 | 0413 |
| 0000134300 | FED6 | 06D9 | 630D | 7061 | 7973 | 636E | 655F | 6576 |
| 0000134320 | 746E | 0411 | FECC | 0082 | 730B | 6174 | 6C62 | 5F65 |
| 0000134340 | 6974 | 656D | 0410 | FED0 | 0082 | 640A | 6C65 | 6174 |
| 0000134360 | 745F | 6D69 | 0B65 | CA04 | 81FE | 0500 | 7265 | 6F72 |
| 0000134400 | 0E72 | D404 | 81FE | 0800 | 7973 | 636E | 6B5F | 7965 |
| 0000134420 | 0201 | 011A | 31D7 | 0784 | 0090 | 0010 | 0085 | 0000 |
| 0000134440 | 0B04 | 6C63 | 736F | 5F65 | 7274 | 6361 | 0F6B | 0604 |
| 0000134460 | E300 | 0906 | 7665 | 6E65 | 5F74 | 7470 | 1372 | D604 |
| 0000134500 | D9FE | 0D06 | 6163 | 7370 | 6E79 | 5F63 | 7665 | 6E65 |
| 0000134520 | 0C74 | D404 | 81FE | 0600 | 6572 | 7573 | 746C | 0201 |
| 0000134540 | 0113 | 3267 | 0788 | 1691 | 0010 | 1686 | 0000 | 0404 |
| 0000134560 | 616D | 6E69 | 040A | 0006 | 0081 | 6104 | 6772 | 0A63 |
| 0000134600 | 0804 | D500 | 0402 | 7261 | 7667 | 040B | FF38 | 0202 |
| 0000134620 | 5F05 | 6C5F | 6C76 | 040D | FFCE | 0774 | 5F07 | 635F |
| 0000134640 | 6F6C | 6B63 | 040D | FFEE | 00C0 | 5F07 | 735F | 6174 |
| 0000134660 | 6B63 | 040E | FF3E | 0081 | 5F08 | 725F | 7465 | 6176 |
| 0000134700 | 0B6C | DA04 | 81FF | 0500 | 7265 | 6F72 | 0F72 | E404 |
| 0000134720 | E3FF | 0906 | 7665 | 6E65 | 5F74 | 7470 | 0C72 | F204 |
| 0000134740 | 81FF | 0600 | 6F68 | 6B74 | 7965 | 0411 | FF36 | 0085 |
| 0000134760 | 680B | 746F | 656B | 5F79 | 6C66 | 6761 | 040A | FFEC |
| 0000135000 | 0081 | 6D04 | 646F | 1465 | 4004 | 4BFF | 0E07 | 7263 |
| 0000135020 | 5F76 | 6C6F | 5F64 | 7473 | 7461 | 7375 | 0409 | FFE2 |

THU MAR 14 17:28:26 1991 CRVN.EXE PAGE 43, LINE 2479

| | | | | | | | | |
|---|---|---|---|---|---|---|---|---|
| 0000135040 | 0081 | 6503 | 7272 | 040C | FFE8 | 0086 | 7406 | 7473 |
| 0000135060 | 695F | 0F64 | DC04 | 49FF | 0905 | 6873 | 7261 | 5F65 |
| 0000135100 | 6468 | 106C | F804 | 81FF | 0A00 | 6F6C | 6B63 | 735F |
| 0000135120 | 6F63 | 6570 | 040D | FF48 | 0789 | 7407 | 6D69 | 6265 |
| 0000135140 | 6675 | 0419 | FFC8 | 0081 | 6913 | 6F63 | 5F6E | 6F63 |
| 0000135160 | 746E | 6F72 | 5F6C | 7473 | 7461 | 7375 | 040C | FFF4 |
| 0000135200 | 00C0 | 5F06 | 705F | 6F72 | 0C63 | FA04 | C0FF | 0600 |
| 0000135220 | 5F5F | 7974 | 6570 | 040F | FFE0 | 0085 | 5F09 | 625F |
| 0000135240 | 5F78 | 7974 | 6570 | 040D | FFCA | 04C9 | 5F07 | 705F |
| 0000135260 | 6972 | 746E | 050E | 053E | 0005 | 032A | 5F06 | 665F |
| 0000135300 | 6E75 | 0563 | 2D00 | BB36 | 0C01 | 3404 | 81FF | 0600 |
| 0000135320 | 6572 | 7573 | 746C | 0201 | 0005 | 39D0 | 0092 | 040B |
| 0000135340 | FF34 | 0084 | 7305 | 6174 | 6574 | 0201 | 0201 | 011B |
| 0000135360 | 48F8 | 0790 | 004E | 0010 | 0043 | 0000 | 0C04 | 7473 |
| 0000135400 | 726F | 5F65 | 7473 | 7461 | 7375 | 0416 | 0006 | 0085 |
| 0000135420 | 7310 | 7475 | 635F | 6E6F | 656E | 7463 | 665F | 616C |
| 0000135440 | 1367 | 0804 | 8500 | 0D00 | 7573 | 5F74 | 6F6C | 6B63 |
| 0000135460 | 665F | 616C | 0A67 | 0A04 | 8100 | 0400 | 6F6D | 6564 |
| 0000135500 | 0418 | 000C | 0758 | 6F12 | 646C | 635F | 7672 | 735F |
| 0000135520 | 6174 | 7574 | 5F73 | 7470 | 0172 | 1D02 | 4601 | 9249 |
| 0000135540 | 9B07 | 1000 | 9000 | 0000 | 0400 | 720E | 7365 | 6F74 |
| 0000135560 | 6572 | 735F | 6174 | 7574 | 1673 | 0604 | C500 | 1000 |
| 0000135600 | 7573 | 5F74 | 6F63 | 6E6E | 6365 | 5F74 | 6C66 | 6761 |
| 0000135620 | 0413 | 000A | 00C5 | 730D | 7475 | 6C5F | 636F | 5F6B |
| 0000135640 | 6C66 | 6761 | 040A | 000E | 00C1 | 6D04 | 646F | 1865 |
| 0000135660 | 1204 | 5800 | 1207 | 6C6F | 5F64 | 7263 | 5F76 | 7473 |
| 0000135700 | 7461 | 7375 | 705F | 7274 | 0201 | 011E | 49E1 | 0794 |
| 0000135720 | 003B | 0010 | 0030 | 0000 | 0F04 | 6567 | 5F74 | 6E69 |
| 0000135740 | 7570 | 5F74 | 7473 | 7461 | 0B65 | 0604 | C400 | 0500 |
| 0000135760 | 7473 | 7461 | 0165 | 1E02 | 1C01 | 964A | 4D07 | 1000 |
| 0000136000 | 4200 | 0000 | 0400 | 730F | 7465 | 695F | 706E | 7475 |
| 0000136020 | 735F | 6174 | 6574 | 040B | 0006 | 0084 | 7305 | 6174 |
| 0000136040 | 6574 | 0201 | 0D05 | 0000 | 001A | 050B | 0E70 | 0005 |
| 0000136060 | 0274 | 7003 | 6469 | 050F | 02EC | 0005 | 00C0 | 4207 |
| 0000136100 | 785F | 6946 | 656C | 0516 | 02F4 | 0005 | 00C6 | 740E |
| 0000136120 | 7268 | 6165 | 5F64 | 6573 | 5F6D | 7470 | 1872 | F805 |
| 0000136140 | 0502 | 8500 | 1000 | 7573 | 5F74 | 6F63 | 6E6E | 6365 |
| 0000136160 | 5F74 | 6C66 | 6761 | 050F | 02F0 | 0005 | 00C0 | 4207 |
| 0000136200 | 785F | 6150 | 6B63 | 0515 | 02FA | 0005 | 0085 | 730D |
| 0000136220 | 7475 | 6C5F | 636F | 5F6B | 6C66 | 6761 | 0513 | 02FC |
| 0000136240 | 0005 | 0085 | 720B | 6365 | 726F | 5F64 | 6F6D | 6564 |
| 0000136260 | 0516 | 02FE | 0005 | 0085 | 720E | 7365 | 7465 | 745F |
| 0000136300 | 6D69 | 5F65 | 6C66 | 1467 | 0005 | 0503 | 8600 | 0C00 |
| 0000136320 | 6F74 | 5F74 | 6964 | 5F66 | 6974 | 656D | 0515 | 0200 |
| 0000136340 | 0004 | 060A | 670D | 6F6C | 6162 | 5F6C | 6170 | 6172 |
| 0000136360 | 736D | 0512 | 0CC4 | 0005 | 0082 | 6C0A | 7361 | 5F74 |
| 0000136400 | 6974 | 656D | 1472 | 0E05 | 050E | 0100 | 0C03 | 756D |
| 0000136420 | 5F78 | 6573 | 5F6D | 696C | 7473 | 0512 | 0E76 | 0005 |
| 0000136440 | 0086 | 630A | 6766 | 6F5F | 6A62 | 695F | 1364 | C805 |
| 0000136460 | 050C | 4F00 | 0B07 | 6373 | 6572 | 6E65 | 6E5F | 6D61 |
| 0000136500 | 1165 | 0405 | 0503 | B500 | 0902 | 7270 | 6F69 | 665F |
| 0000136520 | 616C | 1567 | C005 | 050C | C000 | 0D00 | 7270 | 6F69 |
| 0000136540 | 665F | 616C | 5F67 | 7470 | 1072 | 1005 | 0503 | 8500 |
| 0000136560 | 0800 | 7270 | 6F69 | 755F | 6573 | 0510 | 0CE6 | 0005 |
| 0000136600 | 06D9 | 7408 | 5F72 | 7665 | 6E65 | 1474 | 0005 | 0000 |
| 0000136620 | 8100 | 0C00 | 7842 | 445F | 6265 | 6775 | 6F4D | 6564 |
| 0000136640 | 0514 | 0000 | 0000 | 0081 | 420C | 5F78 | 6954 | 656D |
| 0000136660 | 4D73 | 646F | 1065 | 0005 | 0000 | 8100 | 0800 | 7842 |
| 0000136700 | 425F | 735F | 6769 | 1105 | 0001 | 0000 | 011D | 4A6A |

THU MAR 14 17:28:26 1991 CRVN.EXE PAGE 44, LINE 2538

| | | | | | | | | |
|---|---|---|---|---|---|---|---|---|
| 0000136720 | 05D6 | 0157 | 0010 | 014C | 0000 | 0E04 | 7263 | 5F76 |
| 0000136740 | 6573 | 5F74 | 6170 | 6172 | 736D | 040F | 0006 | 05C2 |
| 0000136760 | 6509 | 6576 | 746E | 705F | 7274 | 0409 | FFFC | 0081 |
| 0000137000 | 6503 | 7272 | 0201 | 0515 | 0200 | 0004 | 04E2 | 670D |
| 0000137020 | 6F6C | 6162 | 5F6C | 6170 | 6172 | 736D | 0D05 | 0000 |
| 0000137040 | 001A | 630A | 7672 | 6E5F | 7270 | 2E6F | 0163 | 0800 |
| 0000137060 | BC03 | 4C00 | C123 | 5C00 | C223 | 6700 | C423 | 9100 |
| 0000137100 | C623 | 9C00 | C823 | A700 | C923 | AE00 | CB23 | D800 |
| 0000137120 | CD23 | E300 | D723 | EE00 | D823 | FE00 | E323 | 0400 |
| 0000137140 | E424 | 0900 | E624 | 0E00 | E724 | 2300 | E824 | 2B00 |
| 0000137160 | EB24 | 5700 | EC24 | 5F00 | ED24 | 7300 | EE24 | 8800 |
| 0000137200 | F524 | 8B00 | F624 | 9500 | F724 | A200 | F824 | BE00 |
| 0000137220 | F924 | C400 | FA24 | C700 | FC24 | CD00 | FD24 | D600 |
| 0000137240 | FE24 | E000 | 0124 | EF01 | 0224 | F801 | 0324 | 0201 |
| 0000137260 | 0425 | 0701 | 0625 | 0C01 | 0825 | 1101 | 0925 | 1601 |
| 0000137300 | 0A25 | 1B01 | 0D25 | 2001 | 0E25 | 2C01 | 0F25 | 3C01 |
| 0000137320 | 1025 | 4601 | 1125 | 4B01 | 1525 | 5001 | 1625 | 5C01 |
| 0000137340 | 1725 | 6901 | 1825 | 7201 | 1925 | 7C01 | 1A25 | 8101 |
| 0000137360 | 1C25 | 8601 | 2025 | 9701 | 2225 | A101 | 2525 | EE01 |
| 0000137400 | 2625 | F701 | 2725 | 0101 | 2A26 | 1201 | 2B26 | 1E01 |
| 0000137420 | 2C26 | 2B01 | 2D26 | 3401 | 2E26 | 3E01 | 3026 | 4F01 |
| 0000137440 | 3226 | 6001 | 3326 | 6A01 | 3726 | 7701 | 3826 | 8001 |
| 0000137460 | 3A26 | 8A01 | 3B26 | 9201 | 3E26 | 9501 | 4026 | 9801 |
| 0000137500 | 4126 | AA01 | 4226 | BC01 | 4426 | CA01 | 4526 | D401 |
| 0000137520 | 4826 | E301 | 4926 | EF01 | 4A26 | FF01 | 4C26 | 0501 |
| 0000137540 | 4D27 | 0F01 | 5027 | 2001 | 5127 | 2901 | 5227 | 3301 |
| 0000137560 | 5727 | 4401 | 5827 | 5601 | 5A27 | 6201 | 5B27 | 7B01 |
| 0000137600 | 5C27 | 9101 | 5E27 | B201 | 5F27 | B801 | 6127 | BB01 |
| 0000137620 | 9127 | CB01 | 9227 | DD01 | 9327 | E901 | 9527 | 1501 |
| 0000137640 | 9628 | 2D01 | 9728 | 4901 | 9828 | 5001 | 9928 | 5301 |
| 0000137660 | 9B28 | 5A01 | 9D28 | 6401 | 9F28 | 7301 | A028 | 8001 |
| 0000137700 | A128 | 8F01 | A428 | 9501 | A628 | A601 | A728 | B501 |
| 0000137720 | A928 | C201 | AC28 | C901 | AE28 | D801 | B128 | E501 |
| 0000137740 | B228 | EC01 | C428 | F701 | C928 | 0701 | CE29 | 0C01 |
| 0000137760 | D029 | 2901 | D129 | 4101 | D329 | 5001 | D429 | 5B01 |
| 0000140000 | D629 | 6501 | D729 | 6D01 | D929 | 7301 | DA29 | 7601 |
| 0000140020 | DB29 | 8A01 | DC29 | 9701 | DE29 | AB01 | DF29 | B001 |
| 0000140040 | E129 | CB01 | E229 | FD01 | E429 | 1101 | E62A | 1701 |
| 0000140060 | E72A | 2301 | E92A | 2D01 | EA2A | 3201 | EB2A | 3801 |
| 0000140100 | EE2A | 3E01 | F02A | 5B01 | F12A | 7301 | F32A | 8201 |
| 0000140120 | F42A | 8D01 | F62A | 9701 | F72A | 9F01 | F92A | A501 |
| 0000140140 | FA2A | A801 | FB2A | BC01 | FC2A | C901 | FE2A | DD01 |
| 0000140160 | FF2A | E201 | 012A | FD02 | 022A | 2F02 | 042B | 4302 |
| 0000140200 | 062B | 4902 | 072B | 5502 | 092B | 5F02 | 0A2B | 6402 |
| 0000140220 | 0D2B | 6A02 | 102B | 8B02 | 122B | 9402 | 132B | AC02 |
| 0000140240 | 152B | BB02 | 162B | C602 | 182B | D002 | 192B | D802 |
| 0000140260 | 1B2B | DE02 | 1C2B | E102 | 1D2B | F502 | 1E2B | 0202 |
| 0000140300 | 202C | 1602 | 212C | 1B02 | 232C | 3602 | 242C | 6802 |
| 0000140320 | 262C | 7C02 | 292C | 8202 | 2B2C | 8502 | 2C2C | 8B02 |
| 0000140340 | 382C | 9602 | 3A2C | A602 | 3D2C | AB02 | 402C | B102 |
| 0000140360 | 412C | C002 | 422C | CF02 | 452C | D202 | 462C | E102 |
| 0000140400 | 472C | F302 | 482C | FC02 | 492C | 0202 | 4A2D | 0E02 |
| 0000140420 | 4D2D | 1102 | 4E2D | 1402 | 4F2D | 2702 | 502D | 2D02 |
| 0000140440 | 5A2D | 3802 | 5B2D | 4802 | 5C2D | DB02 | 5D2D | 3202 |
| 0000140460 | 5E2E | 3702 | 5F2E | 3C02 | 602E | 4602 | 612E | A902 |
| 0000140500 | 692E | B402 | 6C2E | C402 | 6D2E | C902 | 6E2E | CE02 |
| 0000140520 | 6F2E | E002 | 712E | EF02 | 722E | FF02 | 742E | 0E02 |
| 0000140540 | 752F | 1302 | 762F | 1802 | 772F | 2802 | 792F | 3702 |
| 0000140560 | 7B2F | 3C02 | 7D2F | 4702 | 852F | 5402 | 882F | 6402 |

THU MAR 14 17:28:26 1991 CRVN.EXE PAGE 45, LINE 2597

| | | | | | | | | |
|---|---|---|---|---|---|---|---|---|
| 0000140600 | 892F | 7002 | 8A2F | 7E02 | 8B2F | 8C02 | 912F | 9702 |
| 0000140620 | 922F | A702 | 932F | B502 | 992F | C002 | A02F | D002 |
| 0000140640 | A22F | D602 | A32F | DC02 | A42F | EF02 | A52F | 0202 |
| 0000140660 | A630 | 0F02 | A730 | 1C02 | A930 | 2802 | AA30 | 3702 |
| 0000140700 | AB30 | 4202 | AC30 | 5102 | AE30 | 6F02 | B030 | AB02 |
| 0000140720 | B230 | BB02 | B430 | C802 | B530 | D302 | B730 | E202 |
| 0000140740 | B830 | E502 | B930 | F402 | BB30 | FE02 | BD30 | 0E02 |
| 0000140760 | BE31 | 1B02 | BF31 | 2102 | C031 | 3102 | C131 | 3702 |
| 0000141000 | C231 | 3A02 | C331 | 4002 | C531 | 4A02 | C631 | 5602 |
| 0000141020 | C731 | 6902 | C831 | 6C02 | C931 | 7B02 | CB31 | 8502 |
| 0000141040 | CE31 | 9502 | D031 | 9F02 | D131 | B202 | D331 | C502 |
| 0000141060 | D431 | CC02 | DE31 | D702 | E131 | E702 | E231 | FA02 |
| 0000141100 | E431 | 0402 | E532 | 0D02 | E632 | 1702 | E832 | 2202 |
| 0000141120 | E932 | 3002 | EA32 | 3902 | EC32 | 4402 | EF32 | 4902 |
| 0000141140 | F132 | 5502 | F232 | 5C02 | 0132 | 6703 | 0232 | 7703 |
| 0000141160 | 0332 | 8903 | 0832 | 1E03 | 0A33 | 2403 | 1233 | 3903 |
| 0000141200 | 1333 | 4703 | 1433 | A303 | 1533 | B103 | 1633 | 0D03 |
| 0000141220 | 1734 | 1D03 | 1A34 | 2803 | 1B34 | 3303 | 1D34 | 3E03 |
| 0000141240 | 1F34 | 4303 | 2134 | 4C03 | 2234 | 5C03 | 2434 | 6503 |
| 0000141260 | 2634 | 7E03 | 2834 | 9C03 | 2B34 | A603 | 2D34 | B003 |
| 0000141300 | 2E34 | B503 | 3134 | BB03 | 3234 | D303 | 3334 | DE03 |
| 0000141320 | 3634 | E103 | 3834 | EB03 | 3934 | F003 | 3B34 | F603 |
| 0000141340 | 3D34 | FB03 | 3E34 | 1003 | 3F35 | 1A03 | 4035 | 1F03 |
| 0000141360 | 4135 | 2A03 | 4435 | 2D03 | 4535 | 3203 | 4735 | 3A03 |
| 0000141400 | 4835 | 5C03 | 4935 | 6703 | 4A35 | 7203 | 4B35 | 7D03 |
| 0000141420 | 4C35 | 8803 | 4F35 | 8B03 | 5035 | 9003 | 5235 | 9803 |
| 0000141440 | 5335 | BA03 | 5435 | C503 | 5535 | D003 | 5635 | DB03 |
| 0000141460 | 5735 | E603 | 5A35 | E903 | 5B35 | EE03 | 5C35 | F303 |
| 0000141500 | 5D35 | FD03 | 5E35 | 0803 | 6136 | 0B03 | 6236 | 1003 |
| 0000141520 | 6336 | 1503 | 6436 | 1F03 | 6536 | 2A03 | 6B36 | 2D03 |
| 0000141540 | 6C36 | 3303 | 6E36 | 3C03 | 6F36 | 4103 | 7136 | 4A03 |
| 0000141560 | 7336 | 5303 | 7536 | 5D03 | 7636 | 6203 | 7836 | 6803 |
| 0000141600 | 7936 | 7603 | 7E36 | 8003 | 7F36 | 8C03 | 8036 | 9A03 |
| 0000141620 | 8236 | A003 | 8436 | A903 | 8736 | AF03 | 8836 | C503 |
| 0000141640 | 8C36 | 2C03 | 8E37 | 3803 | 8F37 | 4203 | 9037 | 4D03 |
| 0000141660 | 9337 | 5803 | 9537 | 6203 | 9F37 | 6D03 | A037 | 7003 |
| 0000141700 | A237 | 7B03 | A337 | 7E03 | A537 | 8703 | A737 | 9A03 |
| 0000141720 | A837 | A303 | A937 | AD03 | AA37 | B203 | AD37 | BB03 |
| 0000141740 | AF37 | C603 | B137 | CF03 | B537 | E503 | B937 | E803 |
| 0000141760 | BA37 | FB03 | BB37 | 0603 | BE38 | 0903 | C138 | 1603 |
| 0000142000 | C238 | 2F03 | C338 | 3403 | C438 | 3A03 | C538 | 3F03 |
| 0000142020 | C638 | 4503 | C838 | 4A03 | CA38 | 5D03 | CD38 | 6003 |
| 0000142040 | CF38 | 7303 | D138 | 7803 | D338 | 7D03 | D538 | 9803 |
| 0000142060 | D638 | A303 | D938 | A603 | DC38 | B303 | DD38 | CC03 |
| 0000142100 | DE38 | D103 | DF38 | D703 | E038 | DC03 | E138 | E203 |
| 0000142120 | E338 | E703 | E538 | FA03 | E838 | FD03 | E938 | 1003 |
| 0000142140 | EB39 | 1503 | ED39 | 1A03 | EF39 | 3503 | F039 | 4003 |
| 0000142160 | F439 | 4303 | F539 | 5603 | F639 | 6103 | FA39 | 6403 |
| 0000142200 | FB39 | 7303 | FC39 | 7E03 | 0039 | 8104 | 0139 | 9404 |
| 0000142220 | 0239 | 9F04 | 0539 | A204 | 0839 | B504 | 0939 | C204 |
| 0000142240 | 0A39 | CD04 | 1239 | D004 | 1339 | D604 | 1439 | DB04 |
| 0000142260 | 1539 | E104 | 1739 | E604 | 1B39 | F904 | 1D39 | 0404 |
| 0000142300 | 203A | 6204 | 243A | 6504 | 263A | 6E04 | 273A | 7304 |
| 0000142320 | 2A3A | 8104 | 2B3A | 8604 | 2F3A | 8C04 | 303A | A504 |
| 0000142340 | 313A | AB04 | 333A | B004 | 353A | C304 | 363A | DE04 |
| 0000142360 | 383A | E904 | 3C3A | 4D04 | 3F3B | AB04 | 423B | AE04 |
| 0000142400 | 433B | B304 | 453B | BC04 | 463B | D504 | 473B | DD04 |
| 0000142420 | 483B | E604 | 493B | F104 | 4C3B | FC04 | 4D3B | 0504 |
| 0000142440 | 4F3C | 0A04 | 503C | 1404 | 513C | 1904 | 533C | 1F04 |

THU MAR 14 17:28:26 1991 CRVN.EXE PAGE 46, LINE 2656

| | | | | | | | | |
|---|---|---|---|---|---|---|---|---|
| 0000142460 | 543C | 2904 | 553C | 2E04 | 573C | 3404 | 583C | 4204 |
| 0000142500 | 593C | 4B04 | 5A3C | 5304 | 5B3C | 5C04 | 5D3C | 6104 |
| 0000142520 | 603C | 6604 | 683C | 8104 | 6A3C | 8C04 | 6F3C | 8F04 |
| 0000142540 | 703C | 9804 | 713C | A004 | 723C | A904 | 733C | B404 |
| 0000142560 | 753C | BF04 | 763C | C204 | 793C | C704 | 7A3C | D504 |
| 0000142600 | 7B3C | DE04 | 7C3C | E604 | 7D3C | EF04 | 7F3C | F404 |
| 0000142620 | 803C | FF04 | 843C | 0204 | 863D | 0C04 | 873D | 1104 |
| 0000142640 | 893D | 1704 | 8B3D | 2004 | 8C3D | 2504 | 8F3D | 3B04 |
| 0000142660 | 913D | 4704 | 923D | 5304 | 943D | 5C04 | 993D | B504 |
| 0000142700 | 9C3D | BE04 | A73D | D104 | A93D | DD04 | AA3D | E704 |
| 0000142720 | AC3D | F504 | AD3D | 0304 | AF3E | 0C04 | B53E | 6504 |
| 0000142740 | B73E | 6804 | B83E | 7404 | C33E | 7F04 | C43E | 8D04 |
| 0000142760 | C83E | EB04 | C93E | EE04 | CB3E | F704 | CD3E | 0A04 |
| 0000143000 | CE3F | 0D04 | CF3F | 1604 | D03F | 2004 | D13F | 2504 |
| 0000143020 | D43F | 2B04 | D63F | 3904 | DA3F | 4204 | DD3F | 5504 |
| 0000143040 | E03F | 5804 | E23F | 5D04 | E33F | 7004 | E43F | 7C04 |
| 0000143060 | E53F | 8704 | E83F | 8A04 | EA3F | 9304 | EC3F | 9804 |
| 0000143100 | EE3F | AB04 | F03F | AE04 | F23F | B804 | F33F | C404 |
| 0000143120 | F43F | CF04 | F73F | D204 | F83F | DA04 | FA3F | E704 |
| 0000143140 | FB3F | ED04 | FC3F | F904 | FE3F | 0204 | FF40 | 0704 |
| 0000143160 | 0140 | 1505 | 0340 | 1B05 | 0540 | 2305 | 0640 | 2805 |
| 0000143200 | 0740 | 2E05 | 0840 | 3A05 | 0A40 | 4405 | 0B40 | 4905 |
| 0000143220 | 0E40 | 4F05 | 1040 | 5205 | 1140 | 5E05 | 1240 | 6405 |
| 0000143240 | 1340 | 6905 | 1440 | 6F05 | 1540 | 7505 | 1740 | 7E05 |
| 0000143260 | 1840 | 8305 | 1B40 | 9105 | 1C40 | 9B05 | 1D40 | A605 |
| 0000143300 | 2040 | A905 | 2140 | AE05 | 2240 | B405 | 2340 | B905 |
| 0000143320 | 2440 | BF05 | 2540 | C405 | 2640 | C905 | 2740 | CE05 |
| 0000143340 | 2840 | D405 | 2A40 | DD05 | 2B40 | E205 | 2D40 | F005 |
| 0000143360 | 2E40 | FA05 | 2F40 | 0505 | 3241 | 0805 | 3341 | 1005 |
| 0000143400 | 3441 | 1605 | 3541 | 1B05 | 3641 | 2105 | 3741 | 2605 |
| 0000143420 | 3941 | 2F05 | 3A41 | 3405 | 3C41 | 4205 | 3D41 | 4705 |
| 0000143440 | 3E41 | 4C05 | 3F41 | 5205 | 4041 | 5C05 | 4141 | 6705 |
| 0000143460 | 4441 | 6A05 | 4541 | 6F05 | 4641 | 7405 | 4741 | 7A05 |
| 0000143500 | 4941 | 8305 | 4A41 | 8805 | 4C41 | 9605 | 4D41 | A005 |
| 0000143520 | 4E41 | AB05 | 5141 | AE05 | 5241 | B805 | 5341 | C305 |
| 0000143540 | 5441 | CD05 | 5541 | D205 | 5841 | D505 | 5A41 | DE05 |
| 0000143560 | 5C41 | E805 | 5D41 | ED05 | 5F41 | F305 | 6241 | FF05 |
| 0000143600 | 6341 | 1505 | 6642 | 2005 | 6942 | 2305 | 6B42 | 2C05 |
| 0000143620 | 6C42 | 3805 | 7142 | 4105 | 7242 | 4E05 | 7442 | 5305 |
| 0000143640 | 7542 | 5805 | 7642 | 5E05 | 7942 | 6305 | 7A42 | 6605 |
| 0000143660 | 7B42 | 6F05 | 7C42 | 7405 | 7F42 | 8205 | 8042 | 8C05 |
| 0000143700 | 8142 | 9705 | 8442 | A205 | 8742 | A505 | 8942 | AF05 |
| 0000143720 | 8A42 | B405 | 8C42 | BA05 | 8D42 | BF05 | 8E42 | C405 |
| 0000143740 | 8F42 | CA05 | 9142 | D305 | 9242 | D805 | 9442 | E605 |
| 0000143760 | 9542 | FD05 | 9642 | 0B05 | 9743 | 1505 | 9943 | 2005 |
| 0000144000 | 9A43 | 3305 | 9D43 | 3E05 | 9E43 | 4405 | A043 | 5B05 |
| 0000144020 | A243 | 6005 | A343 | 6505 | A443 | 6B05 | A643 | 7005 |
| 0000144040 | A743 | 7B05 | AA43 | 7E05 | AC43 | 8805 | AD43 | 8D05 |
| 0000144060 | AF43 | 9305 | B043 | 9805 | B143 | 9D05 | B243 | A305 |
| 0000144100 | B443 | AC05 | B543 | B105 | B743 | BF05 | B843 | D605 |
| 0000144120 | B943 | E405 | BA43 | EE05 | BC43 | F905 | BD43 | 0C05 |
| 0000144140 | C044 | 1705 | C144 | 1D05 | C344 | 3405 | C544 | 3905 |
| 0000144160 | C644 | 3E05 | C744 | 4405 | C944 | 4905 | CA44 | 5405 |
| 0000144200 | CD44 | 5705 | CF44 | 6105 | D044 | 6605 | D244 | 6C05 |
| 0000144220 | D344 | 7105 | D444 | 7605 | D544 | 7C05 | D744 | 8505 |
| 0000144240 | D844 | 8A05 | DC44 | 9805 | DD44 | A205 | DE44 | AD05 |
| 0000144260 | DF44 | BC05 | E044 | CE05 | E144 | D105 | E644 | E405 |
| 0000144300 | E744 | FF05 | E844 | 0A05 | E945 | 1205 | EB45 | 2005 |
| 0000144320 | EE45 | 7605 | EF45 | 8105 | F345 | 8405 | F445 | 8E05 |

THU MAR 14 17:28:26 1991 CRVN.EXE PAGE 47, LINE 2715

| | | | | | | | | |
|---|---|---|---|---|---|---|---|---|
| 0000144340 | F545 | 9D05 | F645 | AF05 | F745 | B205 | F945 | C505 |
| 0000144360 | FA45 | E005 | FB45 | E805 | FC45 | EE05 | FD45 | FA05 |
| 0000144400 | FE45 | 0505 | 0146 | 0806 | 0346 | 1106 | 0446 | 1606 |
| 0000144420 | 0646 | 2406 | 0746 | 3006 | 0846 | 3E06 | 0A46 | 4106 |
| 0000144440 | 0C46 | 4F06 | 0E46 | 5906 | 0F46 | 6C06 | 1046 | 7A06 |
| 0000144460 | 1146 | 8506 | 1246 | 8806 | 1446 | 9306 | 1F46 | 9606 |
| 0000144500 | 2046 | A906 | 2146 | B406 | 2546 | B706 | 2646 | CA06 |
| 0000144520 | 2746 | D506 | 2B46 | D806 | 2C46 | EB06 | 2D46 | F606 |
| 0000144540 | 3146 | F906 | 3246 | 1406 | 3347 | 2106 | 3447 | 2C06 |
| 0000144560 | 3847 | 2F06 | 3947 | 4206 | 3A47 | 4D06 | 3D47 | 5006 |
| 0000144600 | 3E47 | 6606 | 3F47 | 7106 | 4247 | 7406 | 4347 | 8106 |
| 0000144620 | 4647 | 8406 | 4747 | 8E06 | 4847 | 9906 | 4947 | 9C06 |
| 0000144640 | 4B47 | 4406 | 4C48 | 5C06 | 4D48 | 6806 | 4E48 | 6B06 |
| 0000144660 | 4F48 | ED06 | 5D48 | F806 | 5E48 | 0806 | 5F49 | 1506 |
| 0000144700 | 6049 | 1E06 | 6149 | 2806 | 6249 | 3106 | 6449 | 3B06 |
| 0000144720 | 7149 | 4606 | 7249 | 5606 | 7449 | 6306 | 7549 | 7006 |
| 0000144740 | 7649 | 7C06 | 7749 | 8906 | 7849 | 9206 | 7949 | 9F06 |
| 0000144760 | 7A49 | A406 | 7C49 | A706 | 7D49 | AC06 | 7F49 | B806 |
| 0000145000 | 8049 | C406 | 8149 | C906 | 8349 | CC06 | 8449 | D106 |
| 0000145020 | 8749 | D606 | 9149 | E106 | 9249 | F106 | 9449 | FB06 |
| 0000145040 | 9549 | 0006 | 974A | 0606 | 984A | 1106 | A34A | 1C06 |
| 0000145060 | A44A | 2C06 | A64A | 3606 | A74A | 3B06 | A94A | 4106 |
| 0000145100 | AA4A | 4606 | AB4A | 4F06 | AC4A | 5906 | AD4A | 5E06 |
| 0000145120 | 0A4A | 7263 | 5F76 | 6170 | 6D72 | 632E | 0001 | 0015 |
| 0000145140 | 003A | 4A6A | 004F | 4A7A | 0051 | 4A8E | 0053 | 4A9D |
| 0000145160 | 0055 | 4AB0 | 0059 | 4AC3 | 005C | 4AD7 | 005E | 4AE6 |
| 0000145200 | 0074 | 4AF9 | 0077 | 4B0D | 0078 | 4B1C | 007B | 4B29 |
| 0000145220 | 007C | 4B38 | 0090 | 4B44 | 0093 | 4B58 | 0095 | 4B67 |
| 0000145240 | 0099 | 4B7A | 009B | 4B8E | 009D | 4B9D | 00A8 | 4BB0 |
| 0000145260 | 00A9 | 4BB6 | 0B00 | 6C6C | 6269 | 6D63 | 2E74 | 696C |
| 0000145300 | 0862 | 7263 | 6E76 | 6C2E | 6269 | 6F07 | 3273 | 6C2E |
| 0000145320 | 6269 | 6906 | 2E68 | 696C | 0962 | 6264 | 705F | 2E69 |
| 0000145340 | 696C | 0B62 | 7263 | 5F76 | 7069 | 2E73 | 696C | 0B62 |
| 0000145360 | 7263 | 5F76 | 6E6F | 2E73 | 696C | 0B62 | 7263 | 5F76 |
| 0000145400 | 7473 | 2E69 | 696C | 0A62 | 626C | 7069 | 746D | 6C2E |
| 0000145420 | 6269 | 0093 | 0101 | 0002 | 0008 | 0000 | 0019 | 0102 |
| 0000145440 | 0002 | 067C | 0000 | 0151 | 0101 | 0003 | 0021 | 0000 |
| 0000145460 | 001C | 0102 | 0003 | 07CD | 0000 | 01C1 | 0101 | 0004 |
| 0000145500 | 003D | 0000 | 001C | 0102 | 0004 | 098E | 0000 | 0035 |
| 0000145520 | 0101 | 0005 | 0059 | 0000 | 0017 | 0102 | 0005 | 09C3 |
| 0000145540 | 0000 | 000F | 0101 | 0006 | 0070 | 0000 | 0017 | 0102 |
| 0000145560 | 0006 | 09D2 | 0000 | 0024 | 0101 | 0007 | 0087 | 0000 |
| 0000145600 | 001C | 0102 | 0007 | 09F6 | 0000 | 0010 | 0101 | 0008 |
| 0000145620 | 00A3 | 0000 | 001C | 0102 | 0008 | 0A06 | 000D | 0010 |
| 0000145640 | 0101 | 0009 | 00BF | 0000 | 001C | 0102 | 0009 | 0A16 |
| 0000145660 | 0000 | 0025 | 0101 | 000A | 00DB | 0000 | 001D | 0102 |
| 0000145700 | 000A | 0A3B | 0000 | 0011 | 0101 | 000B | 00F8 | 0000 |
| 0000145720 | 0017 | 0102 | 000B | 0A4C | 0000 | 001F | 0101 | 000C |
| 0000145740 | 010F | 0000 | 0018 | 0102 | 000C | 0A6B | 0000 | 0042 |
| 0000145760 | 0101 | 000D | 0127 | 0000 | 0016 | 0102 | 000D | 0AAD |
| 0000146000 | 0000 | 000E | 0101 | 000E | 013D | 0000 | 0018 | 0102 |
| 0000146020 | 000E | 0ABB | 0000 | 0010 | 0101 | 000F | 0155 | 0000 |
| 0000146040 | 0018 | 0102 | 000F | 0ACB | 0000 | 0010 | 0101 | 0010 |
| 0000146060 | 016D | 0000 | 0019 | 0102 | 0010 | 0ADB | 0000 | 0012 |
| 0000146100 | 0101 | 0011 | 0186 | 0000 | 0018 | 0102 | 0011 | 0AED |
| 0000146120 | 0000 | 0041 | 0101 | 0012 | 019E | 0000 | 0017 | 0102 |
| 0000146140 | 0012 | 0B2E | 0000 | 000F | 0101 | 0013 | 01B5 | 0000 |
| 0000146160 | 001A | 0102 | 0013 | 0B3D | 0000 | 009B | 0101 | 0014 |
| 0000146200 | 01CF | 0000 | 0017 | 0102 | 0014 | 0BD8 | 0000 | 0021 |

THU MAR 14 17:28:26 1991 CRVN.EXE PAGE 48, LINE 2774

| | | | | | | | | |
|---|---|---|---|---|---|---|---|---|
| 0000146220 | 0103 | 0014 | 1129 | 0000 | 2712 | 0104 | 0014 | 5507 |
| 0000146240 | 0000 | 08E5 | 0109 | 0014 | 5E48 | 0000 | 0C2F | 0101 |
| 0000146260 | 0015 | 01E6 | 0000 | 0017 | 0102 | 0015 | 0BF9 | 0000 |
| 0000146300 | 0016 | 0103 | 0015 | 383B | 0000 | 1CCC | 0104 | 0015 |
| 0000146320 | 5DEC | 0000 | 005C | 0109 | 0015 | 6A77 | 0000 | 0063 |
| 0000146340 | 0101 | 0099 | 01FD | 0000 | 0015 | 0102 | 0099 | 0C0F |
| 0000146360 | 0000 | 0020 | 0101 | 009A | 0212 | 0000 | 0014 | 0102 |
| 0000146400 | 009A | 0C2F | 0000 | 001C | 0101 | 009B | 0226 | 0000 |
| 0000146420 | 0015 | 0102 | 009B | 0C4B | 0000 | 000E | 0101 | 009C |
| 0000146440 | 023B | 0000 | 0017 | 0102 | 009C | 0C59 | 0000 | 000E |
| 0000146460 | 0101 | 009D | 0252 | 0000 | 0017 | 0102 | 009D | 0C67 |
| 0000146500 | 0000 | 000E | 0101 | 009E | 0269 | 0000 | 0015 | 0102 |
| 0000146520 | 009E | 0C75 | 0000 | 000E | 0101 | 009F | 027E | 0000 |
| 0000146540 | 0016 | 0102 | 009F | 0C83 | 0000 | 000F | 0101 | 00A0 |
| 0000146560 | 0294 | 0000 | 0014 | 0102 | 00A0 | 0C92 | 0000 | 001E |
| 0000146600 | 0101 | 00A1 | 02A8 | 0000 | 001C | 0102 | 00A1 | 0CB0 |
| 0000146620 | 0000 | 0010 | 0101 | 00A2 | 02C4 | 0000 | 001C | 0102 |
| 0000146640 | 00A2 | 0CC0 | 0000 | 0010 | 0101 | 00A3 | 02E0 | 0000 |
| 0000146660 | 0017 | 0102 | 00A3 | 0CD0 | 0000 | 000E | 0101 | 00A4 |
| 0000146700 | 02F7 | 0000 | 0014 | 0102 | 00A4 | 0CDE | 0000 | 0037 |
| 0000146720 | 0101 | 00A5 | 030B | 0000 | 0018 | 0102 | 00A5 | 0D15 |
| 0000146740 | 0000 | 000F | 0101 | 00A6 | 0323 | 0000 | 0019 | 0102 |
| 0000146760 | 00A6 | 0D24 | 0000 | 0010 | 0101 | 00A7 | 033C | 0000 |
| 0000147000 | 0014 | 0102 | 00A7 | 0D34 | 0000 | 0011 | 0101 | 00A8 |
| 0000147020 | 0350 | 0000 | 0018 | 0102 | 00A8 | 0D45 | 0000 | 001C |
| 0000147040 | 0101 | 00A9 | 0368 | 0000 | 0015 | 0102 | 00A9 | 0D61 |
| 0000147060 | 0000 | 0030 | 0101 | 00AA | 037D | 0000 | 0017 | 0102 |
| 0000147100 | 00AA | 0D91 | 0000 | 000F | 0101 | 00AB | 0394 | 0000 |
| 0000147120 | 0015 | 0102 | 00AB | 0DA0 | 0000 | 0012 | 0101 | 00AC |
| 0000147140 | 03A9 | 0000 | 001A | 0102 | 00AC | 0DB2 | 0000 | 000D |
| 0000147160 | 0101 | 00AD | 03C3 | 0000 | 0017 | 0102 | 00AD | 0DBF |
| 0000147200 | 0000 | 000E | 0101 | 00AE | 03DA | 0000 | 0017 | 0102 |
| 0000147220 | 00AE | 0DCD | 0000 | 000E | 0101 | 00AF | 03F1 | 0000 |
| 0000147240 | 0018 | 0102 | 00AF | 0DDB | 0000 | 000F | 0101 | 00B0 |
| 0000147260 | 0409 | 0000 | 0015 | 0102 | 00B0 | 0DEA | 0000 | 000C |
| 0000147300 | 0101 | 00B1 | 041E | 0000 | 0018 | 0102 | 00B1 | 0DF6 |
| 0000147320 | 0000 | 000D | 0101 | 00B2 | 0436 | 0000 | 0019 | 0102 |
| 0000147340 | 00B2 | 0E03 | 0000 | 000F | 0101 | 00B3 | 044F | 0000 |
| 0000147360 | 001B | 0102 | 00B3 | 0E12 | 0000 | 001C | 0101 | 00B4 |
| 0000147400 | 046A | 0000 | 0015 | 0102 | 00B4 | 0E2E | 0000 | 001F |
| 0000147420 | 0101 | 00B5 | 047F | 0000 | 0017 | 0102 | 00B5 | 0E4D |
| 0000147440 | 0000 | 0033 | 0101 | 00B6 | 0496 | 0000 | 001B | 0102 |
| 0000147460 | 00B6 | 0E80 | 0000 | 003F | 0101 | 00B7 | 04B1 | 0000 |
| 0000147500 | 0018 | 0102 | 00B7 | 0EBF | 0000 | 000F | 0101 | 00B8 |
| 0000147520 | 04C9 | 0000 | 0018 | 0102 | 00B8 | 0ECE | 0000 | 000F |
| 0000147540 | 0101 | 00B9 | 04E1 | 0000 | 001A | 0102 | 00B9 | 0EDD |
| 0000147560 | 0000 | 001E | 0101 | 00BA | 04FB | 0000 | 0019 | 0102 |
| 0000147600 | 00BA | 0EFB | 0000 | 0031 | 0101 | 00BB | 0514 | 0000 |
| 0000147620 | 0016 | 0102 | 00BB | 0F2C | 0000 | 001E | 0101 | 00BC |
| 0000147640 | 052A | 0000 | 0015 | 0102 | 00BC | 0F4A | 0000 | 001B |
| 0000147660 | 0101 | 00BD | 053F | 0000 | 0019 | 0102 | 00BD | 0F65 |
| 0000147700 | 0000 | 0056 | 0101 | 00BE | 0558 | 0000 | 0013 | 0102 |
| 0000147720 | 00BE | 0FBB | 0000 | 001C | 0101 | 00BF | 056B | 0000 |
| 0000147740 | 0014 | 0102 | 00BF | 0FD7 | 0000 | 002C | 0101 | 00C0 |
| 0000147760 | 057F | 0000 | 0016 | 0102 | 00C0 | 1003 | 0000 | 004E |
| 0000150000 | 0101 | 00C1 | 0595 | 0000 | 0017 | 0102 | 00C1 | 1051 |
| 0000150020 | 0000 | 0011 | 0101 | 00C2 | 05AC | 0000 | 0015 | 0102 |
| 0000150040 | 00C2 | 1062 | 0000 | 001F | 0101 | 00C3 | 05C1 | 0000 |
| 0000150060 | 0015 | 0102 | 00C3 | 1081 | 0000 | 000F | 0101 | 00C4 |

THU MAR 14 17:28:26 1991 CRVN.EXE PAGE 49, LINE 2833

| | | | | | | | | |
|---|---|---|---|---|---|---|---|---|
| 0000150100 | 05D6 | 0000 | 0019 | 0102 | 00C4 | 1090 | 0000 | 0012 |
| 0000150120 | 0101 | 00C5 | 05EF | 0000 | 0018 | 0102 | 00C5 | 10A2 |
| 0000150140 | 0000 | 001D | 0101 | 00C6 | 0607 | 0000 | 0018 | 0102 |
| 0000150160 | 00C6 | 10BF | 0000 | 000F | 0101 | 00C7 | 061F | 0000 |
| 0000150200 | 0015 | 0102 | 00C7 | 10CE | 0000 | 000C | 0101 | 00C8 |
| 0000150220 | 0634 | 0000 | 0016 | 0102 | 00C8 | 10DA | 0000 | 001D |
| 0000150240 | 0101 | 00C9 | 064A | 0000 | 001D | 0102 | 00C9 | 10F7 |
| 0000150260 | 0000 | 0024 | 0101 | 00CA | 0667 | 0000 | 0015 | 0102 |
| 0000150300 | 00CA | 111B | 0000 | 000E | 0106 | 0000 | 6ADA | 0000 |
| 0000150320 | 005E | 424E | 3230 | 7100 | 0000 | | | |
| 0000150332 | | | | | | | | |

THU MAR 14 17:31:54 1991 DB_PI.DLL PAGE 1, LINE 1

```
0000000000  5A4D  0059  01FF  0000  0004  0000  FFFF  0000
0000000020  00B6  0000  0000  0000  0040  0000  0000  0000
0000000040  0000  0000  0000  0000  0000  0000  0000  0000
0000000060  0000  0000  0000  0000  0000  0000  0030  0000
0000000100  1F0E  0EBA  B400  CD09  B821  4C01  21CD  6854
0000000120  7369  7020  6F72  7267  6D61  6320  6E61  6F6E
0000000140  2074  7572  206E  6E69  4420  534F  6D20  646F
0000000160  2E65  0D0D  240A  0000  0000  0000  0000  0000
0000000200  454E  0A05  0907  01D5  0BF7  7F52  8006  000B
0000000220  0000  0000  0010  0004  0000  0000  000B  0003
0000000240  001B  0040  0098  0098  085F  0865  0B5C  0000
0000000260  0000  0004  0000  0001  0000  0000  0000  0000
0000000300  0068  F2EB  0D00  F2EC  0FF1  ECE5  0D00  ECE5
0000000320  1ECA  A2A8  0D00  A2A9  2901  DFA8  0D00  DFA8
0000000340  3710  4B3B  0D00  4B3C  3BCC  00C6  0C01  0100
0000000360  0000  0000  0C01  0850  3BD9  022C  0C01  023A
0000000400  0000  0000  0C01  8000  0000  0000  0C01  0306
0000000420  3BFC  3C6F  0D01  5B70  4405  5F42  4950  0000
0000000440  440E  5F42  4553  5F54  4D49  5F47  4552  0146
0000000460  1500  4244  525F  4C45  4145  4553  545F  5453
0000000500  535F  5243  5049  0254  0D00  4244  415F  4343
0000000520  5345  5F53  4D49  0347  1500  4244  535F  4145
0000000540  4352  5F48  4946  544C  5245  4C5F  5349  0454
0000000560  0800  4244  415F  4C4C  434F  0005  440D  5F42
0000000600  4544  454C  4554  495F  474D  0006  440E  5F42
0000000620  4F43  5950  465F  5F57  424F  074A  0F00  4244
0000000640  475F  5445  495F  4F43  5F4E  4448  0852  0E00
0000000660  4244  475F  5445  415F  5050  505F  4449  0009
0000000700  440E  5F42  4552  454C  5341  5F45  4D49  0A47
0000000720  0C00  4244  465F  4552  5F45  4349  4E4F  000B
0000000740  440D  5F42  4C41  4F4C  5F43  4349  4E4F  000C
0000000760  440E  5F42  4547  5F54  4D49  5F47  4448  0D52
0000001000  0D00  4244  475F  5445  465F  4C49  4554  0E52
0000001020  0900  4244  4D5F  4D45  4553  0F54  0E00  4244
0000001040  525F  4145  4C4C  434F  495F  474D  0010  440F
0000001060  5F42  4553  5F54  4349  4E4F  485F  5244  0011
0000001100  440E  5F42  4553  5F54  4D49  5F47  4448  1252
0000001120  1100  4244  555F  4C4E  414F  5F44  5746  545F
0000001140  4552  1345  1100  4244  495F  474D  455F  444E
0000001160  415F  4343  5345  1453  0A00  4244  475F  5445
0000001200  415F  494F  0015  4411  5F42  4D49  5F47  4341
0000001220  4543  5353  535F  4749  0016  4411  5F42  4552
0000001240  4F4D  4556  465F  5F57  5254  4545  0017  4413
0000001260  5F42  4D49  5F47  4341  4543  5353  4C5F  5941
0000001300  5245  0018  4412  5F42  4547  5F54  5746  4F5F
0000001320  4A42  445F  5441  1941  0D00  4244  555F  4C4E
0000001340  414F  5F44  4643  1A47  1300  4244  495F  474D
0000001360  535F  4154  5452  415F  4343  5345  1B53  0B00
0000001400  4244  4C5F  5349  5F54  4F41  1C49  1000  4244
0000001420  495F  474D  435F  4E41  4543  5F4C  504F  001D
0000001440  440B  5F42  4F4C  4441  535F  4244  001E  440E
0000001460  5F42  454D  5F4D  4F4E  5F54  4843  1F52  0A00
0000001500  4244  525F  4145  4C4C  434F  0020  4414  5F42
0000001520  5246  4545  495F  544E  4745  4952  5954  455F
0000001540  2152  1100  4244  475F  5445  465F  5F57  4F4C
0000001560  5047  5441  2248  1000  4244  435F  4552  5441
0000001600  5F45  5746  4F5F  4A42  0023  440F  5F42  454E
0000001620  5458  475F  424F  5F4A  4449  0024  4407  5F42
0000001640  5246  4545  0025  440B  5F42  4F4C  4441  435F
```

THU MAR 14 17:31:54 1991 DB_PI.DLL PAGE 2, LINE 60

| | | | | | | | | |
|---|---|---|---|---|---|---|---|---|
| 0000001660 | 4746 | 0026 | 440E | 5F42 | 4552 | 4F43 | 4556 | 5F52 |
| 0000001700 | 4453 | 2742 | 0B00 | 4244 | 415F | 4444 | 495F | 4F43 |
| 0000001720 | 284E | 0D00 | 4244 | 535F | 4148 | 4552 | 545F | 5345 |
| 0000001740 | 2954 | 1200 | 4244 | 495F | 474D | 535F | 4154 | 5452 |
| 0000001760 | 575F | 4952 | 4554 | 002A | 440E | 5F42 | 494C | 5453 |
| 0000002000 | 445F | 4952 | 4556 | 2B53 | 1300 | 4244 | 475F | 5445 |
| 0000002020 | 435F | 4746 | 4E5F | 4D55 | 495F | 4554 | 2C4D | 0B00 |
| 0000002040 | 4244 | 475F | 5445 | 475F | 424F | 2D4A | 1500 | 4244 |
| 0000002060 | 465F | 5F57 | 4449 | 465F | 4F52 | 5F4D | 4F4C | 5047 |
| 0000002100 | 5441 | 2E48 | 1500 | 4244 | 535F | 5445 | 435F | 5255 |
| 0000002120 | 4552 | 544E | 465F | 4C4F | 4544 | 2F52 | 1000 | 4244 |
| 0000002140 | 445F | 4C45 | 5445 | 5F45 | 4946 | 544C | 5245 | 0030 |
| 0000002160 | 440C | 5F42 | 4C43 | 4145 | 5F4E | 5354 | 3154 | 1000 |
| 0000002200 | 4244 | 445F | 4C45 | 5445 | 5F45 | 5746 | 4F5F | 4A42 |
| 0000002220 | 0032 | 4418 | 5F42 | 4547 | 5F54 | 4643 | 5F47 | 554E |
| 0000002240 | 5F4D | 5449 | 4D45 | 4C5F | 5349 | 3354 | 0F00 | 4244 |
| 0000002260 | 4C5F | 414F | 5F44 | 5746 | 545F | 4552 | 3445 | 1500 |
| 0000002300 | 4244 | 4C5F | 5349 | 5F54 | 5746 | 4F5F | 4A42 | 435F |
| 0000002320 | 4948 | 444C | 3553 | 0C00 | 4244 | 415F | 4C4C | 434F |
| 0000002340 | 415F | 494F | 0036 | 4413 | 5F42 | 4547 | 5F54 | 4643 |
| 0000002360 | 5F47 | 5453 | 5F52 | 5449 | 4D45 | 0037 | 440F | 5F42 |
| 0000002400 | 4F41 | 5F49 | 4441 | 5F44 | 4C46 | 5254 | 0038 | 440C |
| 0000002420 | 5F42 | 494C | 5453 | 475F | 424F | 394A | 1400 | 4244 |
| 0000002440 | 475F | 4E45 | 5245 | 5441 | 5F45 | 4D49 | 5F47 | 414E |
| 0000002460 | 454D | 003A | 4409 | 5F42 | 5053 | 535F | 5445 | 003B |
| 0000002500 | 440E | 5F42 | 5243 | 4145 | 4554 | 475F | 424F | 3C4A |
| 0000002520 | 0C00 | 4244 | 415F | 4C4C | 434F | 495F | 474D | 003D |
| 0000002540 | 4405 | 5F42 | 5043 | 003E | 4413 | 5F42 | 4F41 | 5F49 |
| 0000002560 | 4547 | 5F54 | 4C46 | 5254 | 4C5F | 5453 | 003F | 440C |
| 0000002600 | 5F42 | 4554 | 4D52 | 4E49 | 5441 | 4045 | 1100 | 4244 |
| 0000002620 | 475F | 5445 | 545F | 5453 | 485F | 4145 | 4544 | 4152 |
| 0000002640 | 0B00 | 4244 | 465F | 4552 | 5F45 | 4D49 | 4247 | 1800 |
| 0000002660 | 4244 | 475F | 5445 | 435F | 4746 | 535F | 5254 | 4C5F |
| 0000002700 | 5349 | 5F54 | 5449 | 4D45 | 0043 | 440C | 5F42 | 4E49 |
| 0000002720 | 4554 | 5247 | 5449 | 4459 | 0800 | 4244 | 465F | 4552 |
| 0000002740 | 4441 | 0045 | 440D | 5F42 | 4C43 | 534F | 5F45 | 4554 |
| 0000002760 | 5453 | 0046 | 4405 | 5F42 | 5544 | 0047 | 440E | 5F42 |
| 0000003000 | 4F4D | 4556 | 465F | 5F57 | 424F | 484A | 1100 | 4244 |
| 0000003020 | 535F | 5445 | 545F | 5453 | 485F | 4145 | 4544 | 4952 |
| 0000003040 | 0F00 | 4244 | 465F | 4552 | 5F45 | 5354 | 5F54 | 4448 |
| 0000003060 | 4A52 | 0900 | 4244 | 4D5F | 4D45 | 4843 | 4B52 | 0900 |
| 0000003100 | 4244 | 4D5F | 4D45 | 4D43 | 4C50 | 0F00 | 4244 | 415F |
| 0000003120 | 494F | 445F | 4C45 | 465F | 544C | 4D52 | 0B00 | 4244 |
| 0000003140 | 475F | 5445 | 495F | 4F43 | 4E4E | 0D00 | 4244 | 4C5F |
| 0000003160 | 5349 | 5F54 | 4349 | 4E4F | 4F53 | 1300 | 4244 | 465F |
| 0000003200 | 4552 | 5F45 | 5746 | 4F5F | 4A42 | 495F | 464E | 504F |
| 0000003220 | 1300 | 4244 | 465F | 4552 | 5F45 | 5453 | 4952 | 474E |
| 0000003240 | 4C5F | 5349 | 5154 | 0E00 | 4244 | 445F | 4C45 | 5445 |
| 0000003260 | 5F45 | 4F47 | 4A42 | 0052 | 440C | 5F42 | 5053 | 535F |
| 0000003300 | 4145 | 4352 | 5348 | 1100 | 4244 | 435F | 4552 | 5441 |
| 0000003320 | 5F45 | 5746 | 545F | 4552 | 5445 | 1000 | 4244 | 495F |
| 0000003340 | 474D | 575F | 4952 | 4554 | 535F | 4749 | 0055 | 440C |
| 0000003360 | 5F42 | 494C | 5453 | 495F | 474D | 5653 | 0C00 | 4244 |
| 0000003400 | 4F5F | 4550 | 5F4E | 4554 | 5453 | 0057 | 4415 | 5F42 |
| 0000003420 | 5746 | 4C5F | 474F | 4150 | 4854 | 465F | 4F52 | 5F4D |
| 0000003440 | 4449 | 0058 | 440D | 5F42 | 4E55 | 4F4C | 4441 | 535F |
| 0000003460 | 4244 | 0059 | 4409 | 5F42 | 454D | 434D | 5950 | 005A |
| 0000003500 | 4414 | 5F42 | 4D49 | 5F47 | 4552 | 454C | 5341 | 5F45 |
| 0000003520 | 414C | 4559 | 5B52 | 1200 | 4244 | 435F | 4552 | 5441 |

THU MAR 14 17:31:54 1991 DB_PI.DLL PAGE 3, LINE 119

| | | | | | | | | |
|---|---|---|---|---|---|---|---|---|
| 0000003540 | 5F45 | 5953 | 434E | 495F | 474D | 005C | 440F | 5F42 |
| 0000003560 | 4F41 | 5F49 | 4547 | 5F54 | 4C46 | 5254 | 005D | 440D |
| 0000003600 | 5F42 | 4441 | 5F44 | 4946 | 544C | 5245 | 005E | 440E |
| 0000003620 | 5F42 | 4544 | 454C | 4554 | 495F | 4F43 | 5F4E | 0700 |
| 0000003640 | 4244 | 495F | 494E | 6054 | 0E00 | 4244 | 465F | 5F57 |
| 0000003660 | 424F | 5F4A | 4953 | 455A | 0061 | 440D | 5F42 | 4544 |
| 0000003700 | 454C | 4554 | 415F | 494F | 0062 | 4410 | 5F42 | 4547 |
| 0000003720 | 5F54 | 5746 | 505F | 5241 | 4E45 | 6354 | 0E00 | 4244 |
| 0000003740 | 4D5F | 444F | 4649 | 5F59 | 4F47 | 4A42 | 0064 | 440A |
| 0000003760 | 5F42 | 4441 | 5F44 | 4D49 | 6547 | 0C00 | 4244 | 435F |
| 0000004000 | 454C | 4E41 | 535F | 4244 | 0066 | 440A | 5F42 | 4441 |
| 0000004020 | 5F44 | 4F41 | 6749 | 1200 | 4244 | 525F | 4345 | 564F |
| 0000004040 | 5245 | 535F | 4255 | 5254 | 4545 | 0068 | 4416 | 5F42 |
| 0000004060 | 5243 | 4145 | 4554 | 465F | 5F57 | 424F | 5F4A | 4843 |
| 0000004100 | 4C49 | 6944 | 1300 | 4F44 | 5F53 | 5257 | 5449 | 5F45 |
| 0000004120 | 4244 | 465F | 5257 | 5449 | 6A45 | 0D00 | 4244 | 4C5F |
| 0000004140 | 5349 | 5F54 | 4C46 | 5254 | 6B53 | 0900 | 4244 | 465F |
| 0000004160 | 5257 | 5449 | 6C45 | 1200 | 4244 | 495F | 474D | 575F |
| 0000004200 | 4952 | 4554 | 4C5F | 5941 | 5245 | 006D | 4410 | 5F42 |
| 0000004220 | 4552 | 4947 | 5453 | 5245 | 485F | 4E57 | 6E44 | 1200 |
| 0000004240 | 4244 | 495F | 474D | 525F | 4C45 | 4145 | 4553 | 535F |
| 0000004260 | 4749 | 006F | 4414 | 5F42 | 4341 | 4543 | 5353 | 545F |
| 0000004300 | 5453 | 535F | 5243 | 5049 | 7054 | 1000 | 4244 | 495F |
| 0000004320 | 474D | 455F | 444E | 575F | 4952 | 4554 | 0071 | 0100 |
| 0000004340 | 0A00 | 9100 | 0000 | 4408 | 534F | 4143 | 4C4C | 0653 |
| 0000004360 | 626C | 7069 | 746D | 5F0D | 5842 | 445F | 4245 | 4755 |
| 0000004400 | 4F4D | 4544 | 5F0D | 5842 | 545F | 4D49 | 5345 | 4F4D |
| 0000004420 | 4544 | 5F09 | 5842 | 425F | 535F | 4749 | 5F0E | 5842 |
| 0000004440 | 445F | 4245 | 4755 | 4E45 | 4554 | 0F52 | 425F | 5F58 |
| 0000004460 | 4544 | 5542 | 5247 | 5445 | 5255 | 0E4E | 425F | 5F58 |
| 0000004500 | 4F56 | 4449 | 4552 | 5554 | 4E52 | 5F0E | 5842 | 445F |
| 0000004520 | 4245 | 4755 | 5250 | 4E49 | 0D54 | 425F | 5F58 | 4544 |
| 0000004540 | 5542 | 4347 | 444F | 0E45 | 425F | 5F58 | 4150 | 4B43 |
| 0000004560 | 4946 | 544C | 5245 | 4208 | 5254 | 4143 | 4C4C | 0753 |
| 0000004600 | 5442 | 4352 | 4C41 | 034C | 0101 | EA13 | 9501 | 0173 |
| 0000004620 | C5B4 | 0201 | 4501 | 0380 | 0101 | 06CF | 2501 | 01D0 |
| 0000004640 | 46E7 | 0201 | 9901 | 0212 | 0101 | 0C85 | 0401 | 02CB |
| 0000004660 | 0102 | 0398 | 0001 | 0100 | 0101 | DBFD | 0202 | FF01 |
| 0000004700 | 017C | AF67 | 0101 | 9401 | 01B3 | 0102 | 14FE | 0102 |
| 0000004720 | 7A01 | 01E0 | 1A0B | 0203 | C401 | 0164 | 92D7 | 3F01 |
| 0000004740 | 0151 | 0101 | 13A0 | 0201 | 3601 | 014A | 0101 | 310B |
| 0000004760 | 0301 | 6501 | 0349 | 0102 | 4032 | CE01 | 01A6 | 3A7B |
| 0000005000 | 0101 | D201 | 0162 | 0102 | B509 | 0101 | 1E01 | 0108 |
| 0000005020 | 0103 | A0EC | 0104 | C201 | 013C | 29C9 | 4C01 | 0199 |
| 0000005040 | 0975 | 0302 | C301 | 013E | 891E | 0201 | E501 | 0104 |
| 0000005060 | 0101 | 619E | 0201 | BE01 | 0118 | 0101 | 214F | 0301 |
| 0000005100 | 9101 | 034C | 0101 | A474 | 6001 | 0135 | 1C74 | 0201 |
| 0000005120 | 6001 | 027A | 0101 | 6DBE | EE01 | 012D | 0103 | 5014 |
| 0000005140 | 0102 | 9D01 | 0117 | 4082 | 0201 | DA01 | 0189 | 0103 |
| 0000005160 | 56EC | 0201 | 8C01 | 0598 | 0101 | AA2D | 5201 | 01D6 |
| 0000005200 | 8E3F | DC01 | 0193 | ADAC | 0202 | CC01 | 01CB | A424 |
| 0000005220 | 0103 | 0B01 | 0103 | 7DCB | 2401 | 02BB | 0103 | 5B75 |
| 0000005240 | C401 | 019F | 0102 | C7B3 | 0101 | F701 | 015B | 0103 |
| 0000005260 | A14E | 0103 | EC01 | 014A | 8AD5 | 3901 | 0589 | 0102 |
| 0000005300 | B1DC | 1E01 | 01AC | 9C56 | 1201 | 010E | 1632 | 0101 |
| 0000005320 | 2501 | 0134 | 0103 | 5B1C | 0103 | D701 | 019C | 8F90 |
| 0000005340 | 2801 | 010D | 0102 | 2AC0 | 0104 | A201 | 01D3 | 512C |
| 0000005360 | 0601 | 0139 | 6600 | 0202 | 8601 | 01A9 | 58F5 | 0101 |
| 0000005400 | DE01 | 03EC | 0102 | A209 | FA01 | 0176 | 0983 | 0102 |

THU MAR 14 17:31:54 1991 DB_PI.DLL PAGE 4, LINE 178

| | | | | | | | | |
|---|---|---|---|---|---|---|---|---|
| 0000005420 | 0001 | 0100 | 4F01 | 0201 | AB01 | 048F | 0101 | 43B5 |
| 0000005440 | 4A01 | 01A0 | BD8D | C701 | 0169 | 0102 | 8B3C | 0301 |
| 0000005460 | EC01 | 0187 | 0101 | 2598 | 0204 | E001 | 01C0 | 87B9 |
| 0000005500 | 0501 | 01BA | 2328 | 0101 | 9D01 | 010A | 0102 | 5F86 |
| 0000005520 | 0101 | 0A01 | 016F | 0102 | 2FD9 | 0000 | 4417 | 2042 |
| 0000005540 | 7250 | 636F | 6465 | 7275 | 6C61 | 4920 | 746E | 7265 |
| 0000005560 | 6166 | 6563 | 0000 | 0000 | 0000 | 0000 | 0000 | 0000 |
| 0000005600 | 581E | 4590 | 8B55 | 1EEC | D88E | EC81 | 002E | 5657 |
| 0000005620 | B81E | FFFF | D88E | 46C7 | 51FA | 8C00 | FC5E | 46C7 |
| 0000005640 | 01F2 | 2B01 | 89C0 | E446 | 4689 | 8EE2 | 5606 | 263A |
| 0000005660 | 3E83 | FFFF | 7500 | E903 | 001D | 36FF | 0066 | 36FF |
| 0000005700 | 0064 | 468D | 16DA | 9A50 | FFFF | 0000 | C483 | 3D08 |
| 0000005720 | 0000 | 0374 | 0FE9 | 8E00 | 5806 | 263A | 3E83 | 00EA |
| 0000005740 | 7500 | E903 | 003A | 681E | 0058 | 468D | 16E6 | 8D50 |
| 0000005760 | DA46 | 5016 | 468D | 16F6 | 6A50 | 1E76 | 6868 | FF00 |
| 0000006000 | 6236 | FF00 | 6036 | FF00 | 6636 | FF00 | 6436 | 9A00 |
| 0000006020 | FFFF | 0000 | C483 | 891E | F646 | 5689 | E9F8 | 0008 |
| 0000006040 | C02B | 4689 | 89F8 | F646 | 786A | FF9A | 00FF | 8900 |
| 0000006060 | F446 | 468D | 16D2 | 9A50 | CC2A | 01B9 | C483 | 8904 |
| 0000006100 | F446 | 7E83 | 00F4 | 0375 | 7EE9 | 8E00 | 5606 | 263A |
| 0000006120 | 3E83 | 01CE | 7500 | E903 | 0009 | 7E83 | FEDE | 0374 |
| 0000006140 | 0FE9 | 8E00 | 5806 | 263A | 3E83 | 01E6 | 7500 | E903 |
| 0000006160 | 0051 | 468B | 89F4 | E046 | 76FF | FFE4 | E276 | 468D |
| 0000006200 | 16E0 | FF50 | F276 | 76FF | FFFC | FA76 | 4E8D | 16E6 |
| 0000006220 | 8D51 | F64E | 5116 | 4E8D | 16DA | 1E51 | 6868 | 6800 |
| 0000006240 | 0083 | 36FF | 0062 | 36FF | 0060 | 36FF | 0066 | 36FF |
| 0000006260 | 0064 | 2F9A | 0002 | 8300 | 28C4 | 468B | E9E0 | 01BD |
| 0000006300 | 06E9 | 8B00 | F446 | B4E9 | 6A01 | FF1F | 1076 | 76FF |
| 0000006320 | 8B0E | D246 | 568B | 05D4 | 0004 | 5052 | 049A | 8228 |
| 0000006340 | 8301 | 0AC4 | 5EC4 | 26D2 | 47C6 | 0023 | 1F6A | 76FF |
| 0000006360 | FF0C | 0A76 | 468B | 8BD2 | D456 | 2405 | 5200 | 9A50 |
| 0000006400 | 2804 | 0258 | C483 | C40A | D25E | C626 | 4347 | 8B00 |
| 0000006420 | 0846 | 5EC4 | 26D2 | 4789 | 6A44 | 6802 | 01A9 | AC68 |
| 0000006440 | 9A01 | 01AF | 0000 | 016A | 7B68 | 6802 | FFFF | FF9A |
| 0000006460 | 00FF | 8900 | F446 | 5B9A | FFDC | 89FF | F446 | 7E83 |
| 0000006500 | 00F4 | 0375 | 7EE9 | 8E00 | 5606 | 263A | 3E83 | 0287 |
| 0000006520 | 7500 | E903 | 0009 | 7E83 | FEDE | 0374 | 0FE9 | 8E00 |
| 0000006540 | 5806 | 263A | 3E83 | 029F | 7500 | E903 | 0051 | 468B |
| 0000006560 | 89F4 | E046 | 76FF | FFE4 | E276 | 468D | 16E0 | FF50 |
| 0000006600 | F276 | 76FF | FFFC | FA76 | 4E8D | 16E6 | 8D51 | F64E |
| 0000006620 | 5116 | 4E8D | 16DA | 1E51 | 6868 | 6800 | 009B | 36FF |
| 0000006640 | 0062 | 36FF | 0060 | 36FF | 0066 | 36FF | 0064 | E79A |
| 0000006660 | 0002 | 8300 | 28C4 | 468B | E9E0 | 00C1 | 06E9 | 8B00 |
| 0000006700 | F446 | B8E9 | 8300 | 087E | 7402 | E903 | 0023 | 016A |
| 0000006720 | 076A | 2068 | 9AA1 | 33D9 | 026C | C483 | 8906 | D646 |
| 0000006740 | 5689 | FFD8 | D876 | 76FF | 9AD6 | 2448 | FFFF | C483 |
| 0000006760 | 6A04 | 6A00 | FF00 | 0876 | 779A | FF0B | 83FF | 06C4 |
| 0000007000 | 068E | 3A56 | 8326 | 323E | 0000 | 0375 | 09E9 | 8300 |
| 0000007020 | DE7E | 74FE | E903 | 000F | 068E | 3A58 | 8326 | FF3E |
| 0000007040 | 00FF | 0375 | 50E9 | C700 | E046 | 0000 | 76FF | FFE4 |
| 0000007060 | E276 | 468D | 16E0 | FF50 | F276 | 76FF | FFFC | FA76 |
| 0000007100 | 4E8D | 16E6 | 8D51 | F64E | 5116 | 4E8D | 16DA | 1E51 |
| 0000007120 | 6868 | 6800 | 00A9 | 36FF | 0062 | 36FF | 0060 | 36FF |
| 0000007140 | 0066 | 36FF | 0064 | FF9A | 00FF | 8300 | 28C4 | 468B |
| 0000007160 | E9E0 | 0009 | 06E9 | B80D | 0000 | 00E9 | 1F00 | 5F5E |
| 0000007200 | ED83 | 8B02 | 1FE5 | 4D5D | 0CCA | 1E00 | 9058 | 5545 |
| 0000007220 | EC8B | 8E1E | 81D8 | 26EC | 5700 | 1E56 | 12B8 | 8E00 |
| 0000007240 | C7D8 | FA46 | 0070 | 5E8C | C7FC | F246 | 0101 | C02B |
| 0000007260 | 4689 | 89E4 | E246 | 068E | 3A56 | 8326 | CC3E | 0003 |

THU MAR 14 17:31:54 1991 DB_PI.DLL PAGE 5, LINE 237

| | | | | | | | | |
|---|---|---|---|---|---|---|---|---|
| 0000007300 | 0375 | 1DE9 | FF00 | 6636 | FF00 | 6436 | 8D00 | DA46 |
| 0000007320 | 5016 | 489A | 0000 | 8300 | 08C4 | 003D | 7400 | E903 |
| 0000007340 | 000F | 068E | 3A58 | 8326 | E43E | 0003 | 0375 | 3BE9 |
| 0000007360 | 1E00 | 7768 | 8D00 | E646 | 5016 | 468D | 16DA | 8D50 |
| 0000007400 | F646 | 5016 | C768 | 1E00 | 7E68 | FF00 | 6236 | FF00 |
| 0000007420 | 6036 | FF00 | 6636 | FF00 | 6436 | 9A00 | 0090 | 0000 |
| 0000007440 | C483 | 891E | F646 | 5689 | E9F8 | 0008 | C02B | 4689 |
| 0000007460 | 89F8 | F646 | F79A | 7460 | 8905 | F446 | 7E83 | 00F4 |
| 0000007500 | 0375 | 7EE9 | 8E00 | 5606 | 263A | 3E83 | 046B | 7500 |
| 0000007520 | E903 | 0009 | 7E83 | FEDE | 0374 | 0FE9 | 8E00 | 5806 |
| 0000007540 | 263A | 3E83 | 0483 | 7500 | E903 | 0051 | 468B | 89F4 |
| 0000007560 | E046 | 76FF | FFE4 | E276 | 468D | 16E0 | FF50 | F276 |
| 0000007600 | 76FF | FFFC | FA76 | 4E8D | 16E6 | 8D51 | F64E | 5116 |
| 0000007620 | 4E8D | 16DA | 1E51 | 7E68 | 6800 | 00CE | 36FF | 0062 |
| 0000007640 | 36FF | 0060 | 36FF | 0066 | 36FF | 0064 | CC9A | 0004 |
| 0000007660 | 8300 | 28C4 | 468B | E9E0 | 0255 | 06E9 | 8B00 | F446 |
| 0000007700 | 4CE9 | 9A02 | 2C19 | 044E | 4689 | 9AF4 | 3070 | FFFF |
| 0000007720 | 4689 | 9AF4 | DAB0 | 0579 | 4689 | 83F4 | F47E | 7500 |
| 0000007740 | E903 | 007E | 068E | 3A56 | 8326 | FA3E | 0004 | 0375 |
| 0000007760 | 09E9 | 8300 | DE7E | 74FE | E903 | 000F | 068E | 3A58 |
| 0000010000 | 8326 | 123E | 0005 | 0375 | 51E9 | 8B00 | F446 | 4689 |
| 0000010020 | FFE0 | E476 | 76FF | 8DE2 | E046 | 5016 | 76FF | FFF2 |
| 0000010040 | FC76 | 76FF | 8DFA | E64E | 5116 | 4E8D | 16F6 | 8D51 |
| 0000010060 | DA4E | 5116 | 681E | 007E | D868 | FF00 | 6236 | FF00 |
| 0000010100 | 6036 | FF00 | 6636 | FF00 | 6436 | 9A00 | 055B | 0000 |
| 0000010120 | C483 | 8B28 | E046 | B6E9 | E901 | 0006 | 468B | E9F4 |
| 0000010140 | 01AD | 919A | FF15 | 89FF | F446 | 7E83 | 00F4 | 0375 |
| 0000010160 | 7EE9 | 8E00 | 5606 | 263A | 3E83 | 058E | 7500 | E903 |
| 0000010200 | 0009 | 7E83 | FEDE | 0374 | 0FE9 | 8E00 | 5806 | 263A |
| 0000010220 | 3E83 | 05A6 | 7500 | E903 | 0051 | 468B | 89F4 | E046 |
| 0000010240 | 76FF | FFE4 | E276 | 468D | 16E0 | FF50 | F276 | 76FF |
| 0000010260 | FFFC | FA76 | 4E8D | 16E6 | 8D51 | F64E | 5116 | 4E8D |
| 0000010300 | 16DA | 1E51 | 7E68 | 6800 | 00DD | 36FF | 0062 | 36FF |
| 0000010320 | 0060 | 36FF | 0066 | 36FF | 0064 | EF9A | 0005 | 8300 |
| 0000010340 | 28C4 | 468B | E9E0 | 0127 | 06E9 | 8B00 | F446 | 1EE9 |
| 0000010360 | 9A01 | 0C28 | 0608 | 189A | BACE | 8900 | F446 | 7E83 |
| 0000010400 | 00F4 | 0375 | 7EE9 | 8E00 | 5606 | 263A | 3E83 | 0619 |
| 0000010420 | 7500 | E903 | 0009 | 7E83 | FEDE | 0374 | 0FE9 | 8E00 |
| 0000010440 | 5806 | 263A | 3E83 | 0631 | 7500 | E903 | 0051 | 468B |
| 0000010460 | 89F4 | E046 | 76FF | FFE4 | E276 | 468D | 16E0 | FF50 |
| 0000010500 | F276 | 76FF | FFFC | FA76 | 4E8D | 16E6 | 8D51 | F64E |
| 0000010520 | 5116 | 4E8D | 16DA | 1E51 | 7E68 | 6800 | 00E9 | 36FF |
| 0000010540 | 0062 | 36FF | 0060 | 36FF | 0066 | 36FF | 0064 | 799A |
| 0000010560 | 0006 | 8300 | 28C4 | 468B | E9E0 | 0093 | 06E9 | 8B00 |
| 0000010600 | F446 | 8AE9 | 6A00 | 6802 | 019C | 9F68 | 9A01 | 01A2 |
| 0000010620 | 0000 | 068E | 3A56 | 8326 | D23E | 0000 | 0375 | 09E9 |
| 0000010640 | 8300 | DE7E | 74FE | E903 | 000F | 068E | 3A58 | 8326 |
| 0000010660 | 5E3E | 0000 | 0375 | 50E9 | C700 | E046 | 0000 | 76FF |
| 0000010700 | FFE4 | E276 | 468D | 16E0 | FF50 | F276 | 76FF | FFFC |
| 0000010720 | FA76 | 4E8D | 16E6 | 8D51 | F64E | 5116 | 4E8D | 16DA |
| 0000010740 | 1E51 | 7E68 | 6800 | 00EE | 36FF | 0062 | 36FF | 0060 |
| 0000010760 | 36FF | 0066 | 36FF | 0064 | 339A | 0001 | 8300 | 28C4 |
| 0000011000 | 468B | E9E0 | 0009 | 06E9 | B800 | 0000 | 00E9 | 1F00 |
| 0000011020 | 5F5E | ED83 | 8B02 | 1FE5 | 4D5D | 02CA | 1E00 | 9058 |
| 0000011040 | 5545 | EC8B | 8E1E | 81D8 | 00EC | 5700 | 9A56 | 1591 |
| 0000011060 | 04E5 | 409A | 5F0F | 6A01 | 6A03 | 6A00 | 9A00 | 060E |
| 0000011100 | 0000 | 5F5E | ED83 | 8B02 | 1FE5 | 4D5D | 02CA | 1E00 |
| 0000011120 | 9058 | 5545 | EC8B | 8E1E | 81D8 | 26EC | 5700 | 1E56 |
| 0000011140 | 1DB8 | 8E03 | C7D8 | FA46 | 008B | 5E8C | C7FC | F446 |

THU MAR 14 17:31:54 1991 DB_PI.DLL PAGE 6, LINE 296

| | | | | | | | | |
|---|---|---|---|---|---|---|---|---|
| 0000011160 | 0107 | C02B | 4689 | 89E6 | E446 | 068E | 3A56 | 8326 |
| 0000011200 | 7F3E | 0007 | 0375 | 1DE9 | FF00 | 6636 | FF00 | 6436 |
| 0000011220 | 8D00 | DA46 | 5016 | 539A | 0003 | 8300 | 08C4 | 003D |
| 0000011240 | 7400 | E903 | 000F | 068E | 3A58 | 8326 | 973E | 0007 |
| 0000011260 | 0375 | 3BE9 | 1E00 | 9268 | 8D00 | E846 | 5016 | 468D |
| 0000011300 | 16DA | 8D50 | F646 | 5016 | 2768 | 1E01 | 9A68 | FF00 |
| 0000011320 | 6236 | FF00 | 6036 | FF00 | 6636 | FF00 | 6436 | 9A00 |
| 0000011340 | 039C | 0000 | C483 | 891E | F646 | 5689 | E9F8 | 0008 |
| 0000011360 | C02B | 4689 | 89F8 | F646 | 068E | 3A56 | 8326 | 3D3E |
| 0000011400 | 0003 | 0375 | 09E9 | 8300 | DE7E | 74FE | E903 | 000F |
| 0000011420 | 068E | 3A58 | 6326 | 693E | 0003 | 0375 | 61E9 | FF00 |
| 0000011440 | 0676 | 016A | 769A | 0833 | 8308 | 04C4 | 4689 | 89E0 |
| 0000011460 | E256 | 76FF | FFE6 | E476 | 468D | 16E0 | FF50 | F476 |
| 0000011500 | 76FF | FFFC | FA76 | 4E8D | 16E8 | 8D51 | F64E | 5116 |
| 0000011520 | 4E8D | 16DA | 1E51 | 9A68 | 6800 | 0128 | 36FF | 0062 |
| 0000011540 | 36FF | 0060 | 36FF | 0066 | 36FF | 0064 | 2D9A | 0004 |
| 0000011560 | 8300 | 28C4 | 468B | 8BE0 | E256 | 13E9 | E900 | 0010 |
| 0000011600 | 76FF | 6A06 | 9A01 | 3376 | 06B5 | C483 | E904 | 0000 |
| 0000011620 | 5E1F | 835F | 02ED | E58B | 5D1F | CA4D | 0002 | 581E |
| 0000011640 | 4590 | 8B55 | 1EEC | D88E | EC81 | 0026 | 5657 | B81E |
| 0000011660 | 06E1 | D88E | 46C7 | A3FA | 8C00 | FC5E | 46C7 | 07F4 |
| 0000011700 | 2B01 | 89C0 | E646 | 4689 | 8EE4 | 5606 | 263A | 3E83 |
| 0000011720 | 08CE | 7500 | E903 | 001D | 36FF | 0066 | 36FF | 0064 |
| 0000011740 | 468D | 16DA | 9A50 | 0717 | 0000 | C483 | 3D08 | 0000 |
| 0000011760 | 0374 | 0FE9 | 8E00 | 5806 | 263A | 3E83 | 08E6 | 7500 |
| 0000012000 | E903 | 003B | 681E | 00AA | 468D | 16E8 | 8D50 | DA46 |
| 0000012020 | 5016 | 468D | 16F6 | 6850 | 0146 | 681E | 00B2 | 36FF |
| 0000012040 | 0062 | 36FF | 0060 | 36FF | 0066 | 36FF | 0064 | 609A |
| 0000012060 | 0007 | 8300 | 1EC4 | 4689 | 89F6 | F856 | 08E9 | 2B00 |
| 0000012100 | 89C0 | F846 | 4689 | 8EF6 | 5606 | 263A | 3E83 | 0701 |
| 0000012120 | 7500 | E903 | 0009 | 7E83 | FEDE | 0374 | 0FE9 | 8E00 |
| 0000012140 | 5806 | 263A | 3E83 | 072D | 7500 | E903 | 0065 | 76FF |
| 0000012160 | FF06 | 0A76 | 76FF | 9A08 | 32A4 | 095F | C483 | 8906 |
| 0000012200 | E046 | 5689 | FFE2 | E676 | 76FF | 8DE4 | E046 | 5016 |
| 0000012220 | 76FF | FFF4 | FC76 | 76FF | 8DFA | E84E | 5116 | 4E8D |
| 0000012240 | 16F6 | 8D51 | DA4E | 5116 | 681E | 00B2 | 4768 | FF01 |
| 0000012260 | 6236 | FF00 | 6036 | FF00 | 6636 | FF00 | 6436 | 9A00 |
| 0000012300 | 07ED | 0000 | C483 | 8B28 | E046 | 568B | E9E2 | 0017 |
| 0000012320 | 14E9 | FF00 | 0676 | 76FF | FF0A | 0876 | A49A | A732 |
| 0000012340 | 8307 | 06C4 | 00E9 | 1F00 | 5F5E | ED83 | 8B02 | 1FE5 |
| 0000012360 | 4D5D | 06CA | 1E00 | 9058 | 5545 | EC8B | 8E1E | 81D8 |
| 0000012400 | 24EC | 5700 | 1E56 | 30B8 | 8E08 | C7D8 | FA46 | 00BD |
| 0000012420 | 5E8C | C7FC | F446 | 0000 | C02B | 4689 | 89E6 | E446 |
| 0000012440 | 068E | 3A56 | 8326 | 333E | 000A | 0375 | 1DE9 | FF00 |
| 0000012460 | 6636 | FF00 | 6436 | 8D00 | DC46 | 5016 | 669A | 0008 |
| 0000012500 | 8300 | 08C4 | 003D | 7400 | E903 | 000F | 068E | 3A58 |
| 0000012520 | 8326 | 4B3E | 000A | 0375 | 3BE9 | 1E00 | C168 | 8D00 |
| 0000012540 | E846 | 5016 | 468D | 16DC | 8D50 | F646 | 5016 | 6468 |
| 0000012560 | 1E0: | C668 | FF00 | 6236 | FF00 | 6036 | FF00 | 6636 |
| 0000012600 | FF00 | 6436 | 9A00 | 08AF | 0000 | C483 | 891E | F646 |
| 0000012620 | 5689 | E9F8 | 0008 | C02B | 4689 | 89F8 | F646 | 76FF |
| 0000012640 | FF08 | 0676 | 489A | FA24 | 8308 | 04C4 | 068E | 3A56 |
| 0000012660 | 8326 | 503E | 0008 | 0375 | 09E9 | 8300 | E07E | 74FE |
| 0000012700 | E903 | 000F | 068E | 3A58 | 8326 | 7C3E | 0008 | 0375 |
| 0000012720 | 39E9 | 8D00 | E846 | 5016 | 468D | 16F6 | 8D50 | DC46 |
| 0000012740 | 5016 | 681E | 00C6 | 6668 | FF01 | 6236 | FF00 | 6036 |
| 0000012760 | FF00 | 6636 | FF00 | 6436 | 9A00 | FFFF | 0000 | C483 |
| 0000013000 | C71A | E246 | 0000 | 06E9 | E900 | 0003 | 00E9 | 1F00 |
| 0000013020 | 5F5E | ED83 | 8B02 | 1FE5 | 4D5D | 04CA | 1E00 | 9058 |

THU MAR 14 17:31:54 1991 DB_PI.DLL PAGE 7, LINE 355

| | | | | | | | | |
|---|---|---|---|---|---|---|---|---|
| 0000013040 | 5545 | EC8B | 8E1E | 81D8 | 08EC | 5700 | 1E56 | 87B8 |
| 0000013060 | 8E09 | 8DD8 | F846 | 5016 | C79A | 56CE | 8304 | 04C4 |
| 0000013100 | 4689 | 83FC | FC7E | 7500 | E903 | 0006 | 468B | E9FC |
| 0000013120 | 001B | 76FF | FF08 | 0676 | 5EC4 | 26F8 | 77FF | 9A44 |
| 0000013140 | 0B77 | 03B7 | C483 | B806 | 0000 | 00E9 | 1F00 | 5F5E |
| 0000013160 | ED83 | 8B02 | 1FE5 | 4D5D | 04CA | 1E00 | 9058 | 5545 |
| 0000013200 | EC8B | 8E1E | 81D8 | 00EC | 5700 | 1E56 | CE68 | FF00 |
| 0000013220 | 0A76 | 76FF | 9A08 | 2750 | 0B30 | C483 | 8B08 | 0646 |
| 0000013240 | 33E9 | 1E00 | D268 | FF00 | 0A76 | 76FF | 9A08 | 270A |
| 0000013260 | 0B45 | C483 | E908 | 002E | 681E | 00DA | 76FF | FF0A |
| 0000013300 | 0876 | 0A9A | 2727 | 830A | 08C4 | 19E9 | B800 | 01AD |
| 0000013320 | 19E9 | E900 | 0010 | 4848 | 0375 | C6E9 | 48FF | 0375 |
| 0000013340 | D5E9 | E9FF | FFE7 | 00B8 | E900 | 0000 | 5F5E | ED83 |
| 0000013360 | 8B02 | 1FE5 | 4D5D | 1ECB | 9058 | 5545 | EC8B | 8E1E |
| 0000013400 | 81D8 | 10EC | 5701 | 8D56 | F286 | 16FE | FF50 | 0676 |
| 0000013420 | FB9A | E20A | 830A | 06C4 | 4689 | 83F8 | F87E | 7500 |
| 0000013440 | E903 | 0003 | 76E9 | 9A00 | 41E8 | 0BDA | 8689 | FEF0 |
| 0000013460 | 468D | 16F2 | 9A50 | FFFF | 0000 | 4689 | 83F8 | F87E |
| 0000013500 | 7400 | E903 | 0007 | 468B | 89F2 | F086 | 1EFE | E168 |
| 0000013520 | 8D00 | F286 | 16FE | 9A50 | 0656 | 0C0A | C483 | 8908 |
| 0000013540 | FA46 | 5689 | 8BFC | FC46 | 460B | 74FA | E903 | 0003 |
| 0000013560 | 2AE9 | FF00 | 0A76 | 76FF | FF08 | F0B6 | 1EFE | E368 |
| 0000013600 | FF00 | FC76 | 76FF | 9AFA | 066E | 0C18 | C483 | FF0E |
| 0000013620 | FC76 | 76FF | 9AFA | 0502 | 0B18 | C483 | 5E04 | 835F |
| 0000013640 | 02ED | E58B | 5D1F | CB4D | 581E | 4590 | 8B55 | 1EEC |
| 0000013660 | D88E | EC81 | 0108 | 5657 | 468D | 16F8 | 9A50 | CEC7 |
| 0000013700 | 0ABB | C483 | 8904 | FC46 | 868D | FEF8 | 5016 | 5EC4 |
| 0000013720 | 26F8 | 77FF | 9A44 | 0AFB | 0B93 | C483 | 8906 | FC46 |
| 0000013740 | 7E83 | 00FC | 0375 | 03E9 | E900 | 000E | 868D | FEF8 |
| 0000013760 | 5016 | 1C9A | AA42 | 830B | 04C4 | 5F5E | ED83 | 8B02 |
| 0000014000 | 1FE5 | 4D5D | 1ECB | 9058 | 5545 | EC8B | 8E1E | 81D8 |
| 0000014020 | 08EC | 5701 | 1E56 | AFB8 | 8E0A | 8DD8 | F886 | 16FE |
| 0000014040 | FF50 | 0E76 | FB9A | 580A | 830C | 06C4 | 4689 | 83F8 |
| 0000014060 | F87E | 7500 | E903 | 0006 | 468B | E9F8 | 005B | 681E |
| 0000014100 | 00EA | 868D | FEF8 | 5016 | 569A | 0006 | 830D | 08C4 |
| 0000014120 | 4689 | 89FA | FC56 | 468B | 0BFC | FA46 | 0374 | 06E9 |
| 0000014140 | B800 | 01AB | 32E9 | FF00 | 0876 | 76FF | FF06 | 0C76 |
| 0000014160 | 76FF | 1E0A | EC68 | FF00 | FC76 | 76FF | 9AFA | 0874 |
| 0000014200 | 0D0E | C483 | FF10 | FC76 | 76FF | 9AFA | 0502 | 0C75 |
| 0000014220 | C483 | B804 | 0000 | 00E9 | 1F00 | 5F5E | ED83 | 8B02 |
| 0000014240 | 1FE5 | 4D5D | 0ACA | 0000 | 581E | 4590 | 8B55 | 1EEC |
| 0000014260 | D88E | EC81 | 012E | 5657 | B81E | 0C97 | D88E | 86C7 |
| 0000014300 | FEFA | 0101 | 9E8C | FEFC | 86C7 | FEEE | 0101 | C02B |
| 0000014320 | 8689 | FEDC | 8689 | FEDA | 068E | 3A5A | 8326 | A73E |
| 0000014340 | 0009 | 0375 | 1EE9 | FF00 | 1C36 | FF01 | 1A36 | 8D01 |
| 0000014360 | D286 | 16FE | 9A50 | 09BD | 0000 | C483 | 3D08 | 0000 |
| 0000014400 | 0374 | 0FE9 | 8E00 | 5C06 | 263A | 3E83 | 0E1F | 7500 |
| 0000014420 | E903 | 003F | 681E | 0108 | 868D | FEDE | 5016 | 868D |
| 0000014440 | FED2 | 5016 | 868D | FEF6 | 5016 | 6D6A | 681E | 011E |
| 0000014460 | 36FF | 0118 | 36FF | 0116 | 36FF | 011C | 36FF | 011A |
| 0000014500 | 069A | 000A | 8300 | 1EC4 | 8689 | FEF6 | 9689 | FEF8 |
| 0000014520 | 0AE9 | 2B00 | 89C0 | F886 | 89FE | F686 | 8DFE | EA86 |
| 0000014540 | 16FE | FF50 | 0C76 | 76FF | 9A0A | DB63 | 0E9B | C483 |
| 0000014560 | 8908 | F086 | 83FE | F0BE | 00FE | 0375 | 8BE9 | 8E00 |
| 0000014600 | 5A06 | 263A | 3E83 | 0EC0 | 7500 | E903 | 000A | BE83 |
| 0000014620 | FED6 | 74FE | E903 | 000F | 068E | 3A5C | 8326 | D93E |
| 0000014640 | 000E | 0375 | 5CE9 | 8B00 | F086 | 89FE | D886 | FFFE |
| 0000014660 | DCB6 | FFFE | DAB6 | 8DFE | D886 | 16FE | FF50 | EEB6 |
| 0000014700 | FFFE | FCB6 | FFFE | FAB6 | 8DFE | DE8E | 16FE | 8D51 |

THU MAR 14 17:31:54 1991 DB_PI.DLL PAGE 8, LINE 414

| | | | | | | | | |
|---|---|---|---|---|---|---|---|---|
| 0000014720 | F68E | 16FE | 8D51 | D28E | 16FE | 1E51 | 1E68 | 6A01 |
| 0000014740 | FF76 | 1836 | FF01 | 1636 | FF01 | 1C36 | FF01 | 1A36 |
| 0000014760 | 9A01 | 0F2A | 0000 | C483 | 8B28 | D886 | E9FE | 0512 |
| 0000015000 | 07E9 | 8B00 | F086 | E9FE | 0508 | 868D | FEF2 | 5016 |
| 0000015020 | B6FF | FEEC | B6FF | FEEA | E59A | E0D3 | 830F | 08C4 |
| 0000015040 | 8689 | FEF0 | 8E81 | FEF0 | 01AB | 0375 | 20E9 | 8301 |
| 0000015060 | F0BE | 00FE | 0374 | 8BE9 | 8E00 | 5A06 | 263A | 3E83 |
| 0000015100 | 0F4B | 7500 | E903 | 000A | BE83 | FED6 | 74FE | E903 |
| 0000015120 | 000F | 068E | 3A5C | 8326 | 643E | 000F | 0375 | 5AE9 |
| 0000015140 | C700 | D886 | AAFE | FF01 | DCB6 | FFFE | DAB6 | 8DFE |
| 0000015160 | D886 | 16FE | FF50 | EEB6 | FFFE | FCB6 | FFFE | FAB6 |
| 0000015200 | 8DFE | DE8E | 16FE | 8D51 | F68E | 16FE | 8D51 | D28E |
| 0000015220 | 16FE | 1E51 | 1E68 | 6A01 | FF7C | 1836 | FF01 | 1636 |
| 0000015240 | FF01 | 1C36 | FF01 | 1A36 | 9A01 | 0FB7 | 0000 | C483 |
| 0000015260 | 8B28 | D886 | E9FE | 045A | 06E9 | B800 | 01AA | 51E9 |
| 0000015300 | E904 | 008B | 068E | 3A5A | 8326 | FA3E | 000F | 0375 |
| 0000015320 | 0AE9 | 8300 | D6BE | FEFE | 0374 | 0FE9 | 8E00 | 5C06 |
| 0000015340 | 263A | 3E83 | 1013 | 7500 | E903 | 005C | 868B | FEF0 |
| 0000015360 | 8689 | FED8 | B6FF | FEDC | B6FF | FEDA | 868D | FED8 |
| 0000015400 | 5016 | B6FF | FEEE | B6FF | FEFC | B6FF | FEFA | 8E8D |
| 0000015420 | FEDE | 5116 | 8E8D | FEF6 | 5116 | 8E8D | FED2 | 5116 |
| 0000015440 | 681E | 011E | 7E6A | 36FF | 0118 | 36FF | 0116 | 36FF |
| 0000015460 | 011C | 36FF | 011A | 679A | 0010 | 8300 | 28C4 | 868B |
| 0000015500 | FED8 | CDE9 | E903 | 0007 | 868B | FEF0 | C3E9 | 8D03 |
| 0000015520 | F286 | 16FE | FF50 | ECB6 | FFFE | EAB6 | 9AFE | D4A7 |
| 0000015540 | 109B | C483 | 8908 | F086 | 83FE | F0BE | 00FE | 0375 |
| 0000015560 | 8CE9 | 8E00 | 5A06 | 263A | 3E83 | 10C5 | 7500 | E903 |
| 0000015600 | 000A | BE83 | FED6 | 74FE | E903 | 000F | 068E | 3A5C |
| 0000015620 | 8326 | DE3E | 0010 | 0375 | 5DE9 | 8B00 | F086 | 89FE |
| 0000015640 | D886 | FFFE | DCB6 | FFFE | DAB6 | 8DFE | D886 | 16FE |
| 0000015660 | FF50 | EEB6 | FFFE | FCB6 | FFFE | FAB6 | 8DFE | DE8E |
| 0000015700 | 16FE | 8D51 | F68E | 16FE | 8D51 | D28E | 16FE | 1E51 |
| 0000015720 | 1E68 | 6801 | 0084 | 36FF | 0118 | 36FF | 0116 | 36FF |
| 0000015740 | 011C | 36FF | 011A | 329A | 0011 | 8300 | 28C4 | 868B |
| 0000015760 | FED8 | 1DE9 | E903 | 0007 | 868B | FEF0 | 13E9 | 8B03 |
| 0000016000 | 0846 | 460B | 7406 | E903 | 00F9 | 868D | FEFE | 5016 |
| 0000016020 | B6FF | FEEC | B6FF | FEEA | EC9A | B9DB | 8310 | 08C4 |
| 0000016040 | 8689 | FEF0 | 8E83 | FEF0 | 7500 | E903 | 009C | B6FF |
| 0000016060 | FEEC | B6FF | FEEA | 619A | 40D6 | 830C | 04C4 | 068E |
| 0000016100 | 3A5A | 8326 | 5F3E | 000D | 0375 | 0AE9 | 8300 | D6BE |
| 0000016120 | FEFE | 0374 | 0FE9 | 8E00 | 5C06 | 263A | 3E83 | 09D3 |
| 0000016140 | 7500 | E903 | 005D | 868B | FEF0 | 8689 | FED8 | B6FF |
| 0000016160 | FEDC | B6FF | FEDA | 868D | FED8 | 5016 | B6FF | FEEE |
| 0000016200 | B6FF | FEFC | B6FF | FEFA | 8E8D | FEDE | 5116 | 8E8D |
| 0000016220 | FEF6 | 5116 | 8E8D | FED2 | 5116 | 681E | 011E | 8E68 |
| 0000016240 | FF00 | 1836 | FF01 | 1636 | FF01 | 1C36 | FF01 | 1A36 |
| 0000016260 | 9A01 | 0940 | 0000 | C483 | 8B28 | D886 | E9FE | 0252 |
| 0000016300 | 07E9 | 8B00 | F086 | E9FE | 0248 | 681E | 010F | 868D |
| 0000016320 | FEFE | 5016 | 0A9A | 6927 | 8311 | 08C4 | 681E | 0110 |
| 0000016340 | 868D | FEFE | 5016 | 0A9A | 7B27 | 8311 | 08C4 | 681E |
| 0000016360 | 0112 | 868D | FEFE | 5016 | 0A9A | 5A27 | 8312 | 08C4 |
| 0000016400 | C6E9 | 8D00 | FE86 | 16FE | FF50 | 0876 | 76FF | FF06 |
| 0000016420 | F4B6 | FFFE | F2B6 | 9AFE | DE65 | 11B8 | C483 | 890C |
| 0000016440 | F086 | 83FE | F0BE | 00FE | 0375 | 9CE9 | FF00 | ECB6 |
| 0000016460 | FFFE | EAB6 | 9AFE | D661 | 1278 | C483 | 8E04 | 5A06 |
| 0000016500 | 263A | 3E83 | 1284 | 7500 | E903 | 000A | BE83 | FED6 |
| 0000016520 | 74FE | E903 | 000F | 068E | 3A5C | 8326 | 9D3E | 0012 |
| 0000016540 | 0375 | 5DE9 | 8B00 | F086 | 89FE | D886 | FFFE | DCB6 |
| 0000016560 | FFFE | DAB6 | 8DFE | D886 | 16FE | FF50 | EEB6 | FFFE |

THU MAR 14 17:31:54 1991 DB_PI.DLL PAGE 9, LINE 473

| | | | | | | | | |
|---|---|---|---|---|---|---|---|---|
| 0000016600 | FCB6 | FFFE | FAB6 | 8DFE | DE8E | 16FE | 8D51 | F68E |
| 0000016620 | 16FE | 8D51 | D28E | 16FE | 1E51 | 1E68 | 6801 | 009A |
| 0000016640 | 36FF | 0118 | 36FF | 0116 | 36FF | 011C | 36FF | 011A |
| 0000016660 | F19A | 0012 | 8300 | 28C4 | 868B | FED8 | 53E9 | E901 |
| 0000016700 | 0007 | 868B | FEF0 | 49E9 | 8D01 | FE86 | 16FE | FF50 |
| 0000016720 | F4B6 | FFFE | F2B6 | 9AFE | 771A | 0CCB | C483 | 8908 |
| 0000016740 | F086 | 83FE | F0BE | 00FE | 0375 | 9CE9 | FF00 | ECB6 |
| 0000016760 | FFFE | EAB6 | 9AFE | D661 | 0DEC | C483 | 8ED4 | 5A06 |
| 0000017000 | 263A | 3E83 | 1310 | 7500 | E903 | 000A | BE83 | FED6 |
| 0000017020 | 74FE | E903 | 000F | 068E | 3A5C | 8326 | 293E | 0013 |
| 0000017040 | 0375 | 5DE9 | 8B00 | F086 | 89FE | D886 | FFFE | DCB6 |
| 0000017060 | FFFE | DAB6 | 8DFE | D886 | 16FE | FF50 | EEB6 | FFFE |
| 0000017100 | FCB6 | FFFE | FAB6 | 8DFE | DE8E | 16FE | 8D51 | F68E |
| 0000017120 | 16FE | 8D51 | D28E | 16FE | 1E51 | 1E68 | 6801 | 00A2 |
| 0000017140 | 36FF | 0118 | 36FF | 0116 | 36FF | 011C | 36FF | 011A |
| 0000017160 | 7B9A | 0013 | 8300 | 28C4 | 868B | FED8 | 93E9 | E900 |
| 0000017200 | 0007 | 868B | FEF0 | 89E9 | 8E00 | 5A06 | 263A | 3E83 |
| 0000017220 | 0E06 | 7500 | E903 | 000A | BE83 | FED6 | 74FE | E903 |
| 0000017240 | 000F | 068E | 3A5C | 8326 | 8C3E | 000D | 0375 | 5BE9 |
| 0000017260 | C700 | D886 | 00FE | FF00 | DCB6 | FFFE | DAB6 | 8DFE |
| 0000017300 | D886 | 16FE | FF50 | EEB6 | FFFE | FCB6 | FFFE | FAB6 |
| 0000017320 | 8DFE | DE8E | 16FE | 8D51 | F68E | 16FE | 8D51 | D28E |
| 0000017340 | 16FE | 1E51 | 1E68 | 6801 | 00A5 | 36FF | 0118 | 36FF |
| 0000017360 | 0116 | 36FF | 011C | 36FF | 011A | 729A | 000E | 8300 |
| 0000017400 | 28C4 | 868B | FED8 | 09E9 | E900 | 0006 | 00B8 | E900 |
| 0000017420 | 0000 | 5E1F | 835F | 02ED | E58B | 5D1F | CA4D | 0008 |
| 0000017440 | 581E | 4590 | 8B55 | 1EEC | D88E | EC81 | 028A | 5657 |
| 0000017460 | B81E | 0D3A | D88E | 86C7 | FD9A | 0130 | 9E8C | FD9C |
| 0000017500 | 86C7 | FD92 | 0101 | C02B | 8689 | FD80 | 8689 | FD7E |
| 0000017520 | 068E | 3A5A | 8326 | 7F3E | 0014 | 0375 | 1EE9 | FF00 |
| 0000017540 | 1C36 | FF01 | 1A36 | 8D01 | 7686 | 16FD | 9A50 | 0D76 |
| 0000017560 | 0000 | C483 | 3D08 | 0000 | 0374 | 0FE9 | 8E00 | 5C06 |
| 0000017600 | 263A | 3E83 | 1498 | 7500 | E903 | 0040 | 681E | 0137 |
| 0000017620 | 868D | FD82 | 5016 | 868D | FD76 | 5016 | 868D | FD96 |
| 0000017640 | 5016 | C668 | 1E00 | 3E68 | FF01 | 1836 | FF01 | 1636 |
| 0000017660 | FF01 | 1C36 | FF01 | 1A36 | 9A01 | 0DC1 | 0000 | C483 |
| 0000017700 | 891E | 9686 | 89FD | 9896 | E9FD | 000A | C02B | 8689 |
| 0000017720 | FD98 | 8689 | FD96 | 868D | FD8E | 5016 | 76FF | FF08 |
| 0000017740 | 0676 | 639A | 0FDB | 8315 | 08C4 | 8689 | FD94 | BE83 |
| 0000017760 | FD94 | 7500 | E903 | 008C | 068E | 3A5A | 8326 | 293E |
| 0000020000 | 0015 | 0375 | 0AE9 | 8300 | 7ABE | FEFD | 0374 | 0FE9 |
| 0000020020 | 8E00 | 5C06 | 263A | 3E83 | 1542 | 7500 | E903 | 005D |
| 0000020040 | 868B | FD94 | 8689 | FD7C | B6FF | FD80 | B6FF | FD7E |
| 0000020060 | 868D | FD7C | 5016 | B6FF | FD92 | B6FF | FD9C | B6FF |
| 0000020100 | FD9A | 8E8D | FD82 | 5116 | 8E8D | FD96 | 5116 | 8E8D |
| 0000020120 | FD76 | 5116 | 681E | 013E | CE68 | FF00 | 1836 | FF01 |
| 0000020140 | 1636 | FF01 | 1C36 | FF01 | 1A36 | 9A01 | 1596 | 0000 |
| 0000020160 | C483 | 8B28 | 7C86 | E9FD | 0295 | 07E9 | 8B00 | 9486 |
| 0000020200 | E9FD | 028B | B6FF | FD90 | B6FF | FD8E | B29A | BFD9 |
| 0000020220 | 8315 | 04C4 | 8689 | FD94 | BE83 | FD94 | 7500 | E903 |
| 0000020240 | 008C | 068E | 3A5A | 8326 | D93E | 0015 | 0375 | 0AE9 |
| 0000020260 | 8300 | 7ABE | FEFD | 0374 | 0FE9 | 8E00 | 5C06 | 263A |
| 0000020300 | 3E83 | 15F2 | 7500 | E903 | 005D | 868B | FD94 | 8689 |
| 0000020320 | FD7C | B6FF | FD80 | B6FF | FD7E | 868D | FD7C | 5016 |
| 0000020340 | B6FF | FD92 | B6FF | FD9C | B6FF | FD9A | 8E8D | FD82 |
| 0000020360 | 5116 | 8E8D | FD96 | 5116 | 8E8D | FD76 | 5116 | 681E |
| 0000020400 | 013E | D568 | FF00 | 1836 | FF01 | 1636 | FF01 | 1C36 |
| 0000020420 | FF01 | 1A36 | 9A01 | 1646 | 0000 | C483 | 8B28 | 7C86 |
| 0000020440 | E9FD | 01EB | 07E9 | 8B00 | 9486 | E9FD | 01E1 | 868D |

THU MAR 14 17:31:54 1991 DB_PI.DLL PAGE 10, LINE 532

| | | | | | | | | |
|---|---|---|---|---|---|---|---|---|
| 0000020460 | FD9E | 5016 | B6FF | FD90 | B6FF | FD8E | 0B9A | 9AD3 |
| 0000020500 | 8311 | 08C4 | 8689 | FD94 | BE83 | FD94 | 7500 | E903 |
| 0000020520 | 008C | 068E | 3A5A | 8326 | 813E | 0016 | 0375 | 0AE9 |
| 0000020540 | 8300 | 7ABE | FEFD | 0374 | 0FE9 | 8E00 | 5C06 | 263A |
| 0000020560 | 3E83 | 169A | 7500 | E903 | 005D | 868B | FD94 | 8689 |
| 0000020600 | FD7C | B6FF | FD80 | B6FF | FD7E | 868D | FD7C | 5016 |
| 0000020620 | B6FF | FD92 | B6FF | FD9C | B6FF | FD9A | 8E8D | FD82 |
| 0000020640 | 5116 | 8E8D | FD96 | 5116 | 8E8D | FD76 | 5116 | 681E |
| 0000020660 | 013E | DA68 | FF00 | 1836 | FF01 | 1636 | FF01 | 1C36 |
| 0000020700 | FF01 | 1A36 | 9A01 | 16EE | 0000 | C483 | 8B28 | 7C86 |
| 0000020720 | E9FD | 013B | 07E9 | 8B00 | 9486 | E9FD | 0131 | 868D |
| 0000020740 | FD9E | 5016 | F99A | 5778 | 8311 | 04C4 | 8689 | FD94 |
| 0000020760 | BE83 | FD94 | 7500 | E903 | 008C | 068E | 3A5A | 8326 |
| 0000021000 | 0D3E | 0017 | 0375 | 0AE9 | 8300 | 7ABE | FEFD | 0374 |
| 0000021020 | 0FE9 | 8E00 | 5C06 | 263A | 3E83 | 1726 | 7500 | E903 |
| 0000021040 | 005D | 868B | FD94 | 8689 | FD7C | B6FF | FD80 | B6FF |
| 0000021060 | FD7E | 868D | FD7C | 5016 | B6FF | FD92 | B6FF | FD9C |
| 0000021100 | B6FF | FD9A | 8E8D | FD82 | 5116 | 8E8D | FD96 | 5116 |
| 0000021120 | 8E8D | FD76 | 5116 | 681E | 013E | DF68 | FF00 | 1836 |
| 0000021140 | FF01 | 1636 | FF01 | 1C36 | FF01 | 1A36 | 9A01 | 1231 |
| 0000021160 | 0000 | C483 | 8B28 | 7C86 | E9FD | 0093 | 07E9 | 8B00 |
| 0000021200 | 9486 | E9FD | 0089 | 068E | 3A5A | 8326 | C43E | 0011 |
| 0000021220 | 0375 | DAE9 | 8300 | 7ABE | FEFD | 0374 | DFE9 | 8E00 |
| 0000021240 | 5C06 | 263A | 3E83 | 11DD | 7500 | E903 | 005B | 86C7 |
| 0000021260 | FD7C | 0000 | B6FF | FD80 | B6FF | FD7E | 868D | FD7C |
| 0000021300 | 5016 | B6FF | FD92 | B6FF | FD9C | B6FF | FD9A | 8E8D |
| 0000021320 | FD82 | 5116 | 8E8D | FD96 | 5116 | 8E8D | FD76 | 5116 |
| 0000021340 | 681E | 013E | E168 | FF00 | 1836 | FF01 | 1636 | FF01 |
| 0000021360 | 1C36 | FF01 | 1A36 | 9A01 | 14EC | 0000 | C483 | 8B28 |
| 0000021400 | 7C86 | E9FD | 0009 | 06E9 | B800 | 0000 | 00E9 | 1F00 |
| 0000021420 | 5F5E | ED83 | 8B02 | 1FE5 | 4D5D | 04CA | 1E00 | 9058 |
| 0000021440 | 5545 | EC8B | 8E1E | 81D8 | 2EEC | 5700 | 1E56 | B2B8 |
| 0000021460 | 8E13 | C7D8 | FA46 | 0150 | 5E8C | C7FC | EE46 | 0101 |
| 0000021500 | C02B | 4689 | 89DC | DA46 | 068E | 3A5A | 8326 | 6C3E |
| 0000021520 | 0018 | 0375 | 1DE9 | FF00 | 1C36 | FF01 | 1A36 | 8D01 |
| 0000021540 | D246 | 5016 | EE9A | 0013 | 8300 | 08C4 | 003D | 7400 |
| 0000021560 | E903 | 000F | 068E | 3A5C | B326 | 843E | 0018 | 0375 |
| 0000021600 | 3BE9 | 1ED0 | 5768 | 8D01 | DE46 | 5016 | 468D | 16D2 |
| 0000021620 | 8D50 | F646 | 5016 | 0768 | 1E01 | 5E68 | FF01 | 1836 |
| 0000021640 | FF01 | 1636 | FF01 | 1C36 | FF01 | 1A36 | 9A01 | 143A |
| 0000021660 | 0000 | C483 | 891E | F646 | 5689 | E9F8 | 0008 | C02B |
| 0000021700 | 4689 | 89F8 | F646 | 468D | 16EA | FF50 | 0876 | 76FF |
| 0000021720 | 9A06 | DB63 | 18F1 | C483 | 8908 | F046 | 7E83 | 00F0 |
| 0000021740 | 0375 | 7EE9 | 8E00 | 5A06 | 263A | 3E83 | 1909 | 7500 |
| 0000021760 | E903 | 0009 | 7E83 | FED6 | 0374 | DFE9 | 8E00 | 5C06 |
| 0000022000 | 263A | 3E83 | 1921 | 7500 | E903 | 0051 | 468B | 89F0 |
| 0000022020 | D846 | 76FF | FFDC | DA76 | 468D | 16D8 | FF50 | EE76 |
| 0000022040 | 76FF | FFFC | FA76 | 4E8D | 16DE | 8D51 | F64E | 5116 |
| 0000022060 | 4E8D | 16D2 | 1E51 | 5E68 | 6801 | 010F | 36FF | 0118 |
| 0000022100 | 36FF | 0116 | 36FF | 011C | 36FF | 011A | 6A9A | 0019 |
| 0000022120 | 8300 | 28C4 | 468B | E9D8 | 0123 | 06E9 | 8B00 | F046 |
| 0000022140 | 1AE9 | 8D01 | F246 | 5016 | 76FF | FFEC | EA76 | 949A |
| 0000022160 | 65D7 | 8314 | 08C4 | 4689 | 83F0 | F07E | 7500 | E903 |
| 0000022200 | 007E | 068E | 3A5A | 8326 | 873E | 0019 | 0375 | 09E9 |
| 0000022220 | 8300 | D67E | 74FE | E903 | 000F | 068E | 3A5C | 8326 |
| 0000022240 | 9F3E | 0019 | 0375 | 51E9 | 8B00 | F046 | 4689 | FFD8 |
| 0000022260 | DC76 | 76FF | 8DDA | D846 | 5016 | 76FF | FFEE | FC76 |
| 0000022300 | 76FF | 8DFA | DE4E | 5116 | 4E8D | 16F6 | 8D51 | D24E |
| 0000022320 | 5116 | 681E | 015E | 1268 | FF01 | 1836 | FF01 | 1636 |

THU MAR 14 17:31:54 1991 DB_PI.DLL PAGE 11, LINE 591

| | | | | | | | | |
|---|---|---|---|---|---|---|---|---|
| 0000022340 | FF01 | 1C36 | FF01 | 1A36 | 9A01 | 19E7 | 000D | C483 |
| 0000022360 | 8B28 | D846 | 86E9 | E900 | 0006 | 468B | E9F0 | 007D |
| 0000022400 | 068E | 3A5A | 8326 | D73E | 0013 | 0375 | 09E9 | 8300 |
| 0000022420 | D67E | 74FE | E903 | 000F | 068E | 3A5C | 8326 | 043E |
| 0000022440 | 0014 | 0375 | 50E9 | C700 | D846 | 0000 | 76FF | FFDC |
| 0000022460 | DA76 | 468D | 16D8 | FF50 | EE76 | 76FF | FFFC | FA76 |
| 0000022500 | 4E8D | 16DE | 8D51 | F64E | 5116 | 4E8D | 16D2 | 1E51 |
| 0000022520 | 5E68 | 6801 | 0114 | 36FF | 0118 | 36FF | 0116 | 36FF |
| 0000022540 | 011C | 36FF | 011A | 789A | 0017 | 8300 | 28C4 | 468B |
| 0000022560 | E9D8 | 0009 | 06E9 | B800 | 0000 | 00E9 | 1F00 | 5F5E |
| 0000022600 | ED83 | 8B02 | 1FE5 | 4D5D | 04CA | 1E00 | 9058 | 5545 |
| 0000022620 | EC8B | 8E1E | 81D8 | 2AEC | 5700 | 1E56 | AFB8 | 8E17 |
| 0000022640 | C7D8 | FA46 | 016E | 5E8C | C7FC | F246 | 0101 | C02B |
| 0000022660 | 4689 | 89E0 | DE46 | 068E | 3A5A | 8326 | DA3E | 001A |
| 0000022700 | 0375 | 1DE9 | FF00 | 1C36 | FF01 | 1A36 | 8D01 | D646 |
| 0000022720 | 5016 | E59A | 0017 | 8300 | 08C4 | 003D | 7400 | E903 |
| 0000022740 | 000F | 068E | 3A5C | 8326 | F23E | 001A | 0375 | 3BE9 |
| 0000022760 | 1E00 | 7568 | 8D01 | E246 | 5016 | 468D | 16D6 | 8D50 |
| 0000023000 | F646 | 5016 | 3E68 | 1E01 | 7C68 | FF01 | 1836 | FF01 |
| 0000023020 | 1636 | FF01 | 1C36 | FF01 | 1A36 | 9A01 | 182E | 0000 |
| 0000023040 | C483 | 891E | F646 | 5689 | E9F8 | 0008 | C02B | 4689 |
| 0000023060 | 89F8 | F646 | 468D | 16EE | FF50 | 0876 | 76FF | 9A06 |
| 0000023100 | DB63 | 1B5A | C483 | 8908 | F446 | 7E83 | 00F4 | 0375 |
| 0000023120 | 7EE9 | 8E00 | 5A06 | 263A | 3E83 | 1B72 | 7500 | E903 |
| 0000023140 | 0009 | 7E83 | FEDA | 0374 | 0FE9 | 8E00 | 5C06 | 263A |
| 0000023160 | 3E83 | 1B8A | 7500 | E903 | 0051 | 468B | 89F4 | DC46 |
| 0000023200 | 76FF | FFE0 | DE76 | 468D | 16DC | FF50 | F276 | 76FF |
| 0000023220 | FFFC | FA76 | 4E8D | 16E2 | 8D51 | F64E | 5116 | 4E8D |
| 0000023240 | 16D6 | 1E51 | 7C68 | 6801 | 0145 | 36FF | 0118 | 36FF |
| 0000023260 | 0116 | 36FF | 011C | 36FF | 011A | D39A | 001B | 8300 |
| 0000023300 | 28C4 | 468B | E9DC | 011E | 06E9 | 8B00 | F446 | 15E9 |
| 0000023320 | FF01 | F076 | 76FF | 9AEE | D9B2 | 1854 | C483 | 8904 |
| 0000023340 | F446 | 7E83 | 00F4 | 0375 | 7EE9 | 8E00 | 5A06 | 263A |
| 0000023360 | 3E83 | 1BF0 | 7500 | E903 | 0009 | 7E83 | FEDA | 0374 |
| 0000023400 | 0FE9 | 8E00 | 5C06 | 263A | 3E83 | 1C08 | 7500 | E903 |
| 0000023420 | 0051 | 468B | 89F4 | DC46 | 76FF | FFE0 | DE76 | 468D |
| 0000023440 | 16DC | FF50 | F276 | 76FF | FFFC | FA76 | 4E8D | 16E2 |
| 0000023460 | 8D51 | F64E | 5116 | 4E8D | 16D6 | 1E51 | 7C68 | 6801 |
| 0000023500 | 0148 | 36FF | 0118 | 36FF | 0116 | 36FF | 011C | 36FF |
| 0000023520 | 011A | 509A | 001C | 8300 | 28C4 | 468B | E9DC | 0086 |
| 0000023540 | 06E9 | 8B00 | F446 | 7DE9 | 8E00 | 5A06 | 263A | 3E83 |
| 0000023560 | 17CF | 7500 | E903 | 0009 | 7E83 | FEDA | 0374 | 0FE9 |
| 0000023600 | 8E00 | 5C06 | 263A | 3E83 | 17FB | 7500 | E903 | 0050 |
| 0000023620 | 46C7 | 00DC | FF00 | E076 | 76FF | 8DDE | DC46 | 5016 |
| 0000023640 | 76FF | FFF2 | FC76 | 76FF | 8DFA | E24E | 5116 | 4E8D |
| 0000023660 | 16F6 | 8D51 | D64E | 5116 | 681E | 017C | 4A68 | FF01 |
| 0000023700 | 1836 | FF01 | 1636 | FF01 | 1C36 | FF01 | 1A36 | 9A01 |
| 0000023720 | 18CD | 0000 | C483 | 8B28 | DC46 | 09E9 | E900 | 0006 |
| 0000023740 | 00B8 | E900 | 0000 | 5E1F | 835F | 02ED | E58B | 5D1F |
| 0000023760 | CA4D | 0004 | 581E | 4590 | 8B55 | 1EEC | D88E | EC81 |
| 0000024000 | 002E | 5657 | B81E | 1A1D | D88E | 46C7 | 8EFA | 8C01 |
| 0000024020 | FC5E | 46C7 | 01EA | 2B01 | 89C0 | DC46 | 4689 | 8EDA |
| 0000024040 | 5A06 | 263A | 3E83 | 1D4E | 7500 | E903 | 001D | 36FF |
| 0000024060 | 011C | 36FF | 011A | 468D | 16D2 | 9A50 | 1A53 | 0000 |
| 0000024100 | C483 | 3D08 | 0000 | 0374 | 0FE9 | 8E00 | 5C06 | 263A |
| 0000024120 | 3E83 | 1D66 | 7500 | E903 | 003B | 681E | 0195 | 468D |
| 0000024140 | 16DE | 8D50 | D246 | 5016 | 468D | 16F6 | 6850 | 016C |
| 0000024160 | 681E | 019C | 36FF | 0118 | 36FF | 0116 | 36FF | 011C |
| 0000024200 | 36FF | 011A | 9C9A | 001A | 8300 | 1EC4 | 4689 | 89F6 |

THU MAR 14 17:31:54 1991 DB_PI.DLL PAGE 12, LINE 650

| | | | | | | | | |
|---|---|---|---|---|---|---|---|---|
| 0000024220 | F856 | 08E9 | 2B00 | 89C0 | F846 | 4689 | 8DF6 | EC46 |
| 0000024240 | 5016 | 468D | 16F2 | FF50 | 0876 | 76FF | FF06 | DC76 |
| 0000024260 | 76FF | 9A0A | D834 | 1E97 | C483 | 8910 | F046 | 7E83 |
| 0000024300 | 00F0 | 0375 | 7EE9 | 8E00 | 5A06 | 263A | 3E83 | 1E13 |
| 0000024320 | 7500 | E903 | 0009 | 7E83 | FED6 | 0374 | 0FE9 | 8E00 |
| 0000024340 | 5C06 | 263A | 3E83 | 1E2B | 7500 | E903 | 0051 | 468B |
| 0000024360 | 89F0 | D846 | 76FF | FFDC | DA76 | 468D | 16D8 | FF50 |
| 0000024400 | EA76 | 76FF | FFFC | FA76 | 4E8D | 16DE | 8D51 | F64E |
| 0000024420 | 5116 | 4E8D | 16D2 | 1E51 | 9C68 | 6801 | 0174 | 36FF |
| 0000024440 | 0118 | 36FF | 0116 | 36FF | 011C | 36FF | 011A | 749A |
| 0000024460 | 001E | 8300 | 28C4 | 468B | E9D8 | 0294 | 06E9 | 8B00 |
| 0000024500 | F046 | 8BE9 | 8B02 | 0846 | 460B | 7406 | E903 | 00BA |
| 0000024520 | 468B | 0BEE | EC46 | 0375 | AFE9 | C400 | EC5E | 8D26 |
| 0000024540 | 003F | 0375 | A3E9 | 8D00 | 0646 | 5016 | 76FF | FFEE |
| 0000024560 | EC76 | 76FF | FFF4 | F276 | 3B9A | 6789 | 8316 | 0CC4 |
| 0000024600 | 4689 | 83F0 | F07E | 7500 | E903 | 007E | 068E | 3A5A |
| 0000024620 | 8326 | AF3E | 001E | 0375 | 09E9 | 8300 | D67E | 74FE |
| 0000024640 | E903 | 000F | 068E | 3A5C | 8326 | C73E | 001E | 0375 |
| 0000024660 | 51E9 | 8B00 | F046 | 4689 | FFD8 | DC76 | 76FF | 8DDA |
| 0000024700 | D846 | 5016 | 76FF | FFEA | FC76 | 76FF | 8DFA | DE4E |
| 0000024720 | 5116 | 4E8D | 16F6 | 8D51 | D24E | 5116 | 681E | 019C |
| 0000024740 | 7B68 | FF01 | 1836 | FF01 | 1636 | FF01 | 1C36 | FF01 |
| 0000024760 | 1A36 | 9A01 | 1F10 | 0000 | C483 | 8B28 | D846 | CFE9 |
| 0000025000 | E901 | 0006 | 468B | E9F0 | 01C6 | 5EC4 | 26F2 | 77FF |
| 0000025020 | 2602 | 37FF | 289A | 47DC | 831F | 04C4 | 4689 | 83F0 |
| 0000025040 | F07E | 7500 | E903 | 007E | 068E | 3A5A | 8326 | 5C3E |
| 0000025060 | 001F | 0375 | 09E9 | 8300 | D67E | 74FE | E903 | 000F |
| 0000025100 | 068E | 3A5C | 8326 | 743E | 001F | 0375 | 51E9 | 8B00 |
| 0000025120 | F046 | 4689 | FFD8 | DC76 | 76FF | 8DDA | D846 | 5016 |
| 0000025140 | 76FF | FFEA | FC76 | 76FF | 8DFA | DE4E | 5116 | 4E8D |
| 0000025160 | 16F6 | 8D51 | D24E | 5116 | 681E | 019C | 8168 | FF01 |
| 0000025200 | 1836 | FF01 | 1636 | FF01 | 1C36 | FF01 | 1A36 | 9A01 |
| 0000025220 | 1FBD | 0000 | C483 | 8B28 | D846 | 33E9 | E901 | 0006 |
| 0000025240 | 468B | E9F0 | 012A | 468B | 0B08 | 0646 | 0375 | 13E9 |
| 0000025260 | 8B00 | 0646 | 568B | C408 | F25E | 8926 | 5887 | 2602 |
| 0000025300 | 9789 | 025A | A99A | C2EA | 891A | F046 | 7E83 | 00F0 |
| 0000025320 | 0375 | 7EE9 | 8E00 | 5A06 | 263A | 3E83 | 1FDA | 7500 |
| 0000025340 | E903 | 0009 | 7E83 | FED6 | 0374 | 0FE9 | 8E00 | 5C06 |
| 0000025360 | 263A | 3E83 | 1FF2 | 7500 | E903 | 0051 | 468B | 89F0 |
| 0000025400 | D846 | 76FF | FFDC | DA76 | 468D | 16D8 | FF50 | EA76 |
| 0000025420 | 76FF | FFFC | FA76 | 4E8D | 16DE | 8D51 | F64E | 5116 |
| 0000025440 | 4E8D | 16D2 | 1E51 | 9C68 | 6801 | 018A | 36FF | 0118 |
| 0000025460 | 36FF | 0116 | 36FF | 011C | 36FF | 011A | 3A9A | 0020 |
| 0000025500 | 8300 | 28C4 | 468B | E9D8 | 0086 | 06E9 | 8B00 | F046 |
| 0000025520 | 7DE9 | 8E00 | 5A06 | 263A | 3E83 | 1A3D | 7500 | E903 |
| 0000025540 | 0009 | 7E83 | FED6 | 0374 | 0FE9 | 8E00 | 5C06 | 263A |
| 0000025560 | 3E83 | 1A69 | 7500 | E903 | 0050 | 46C7 | 00D8 | FF00 |
| 0000025600 | DC76 | 76FF | 8DDA | D846 | 5016 | 76FF | FFEA | FC76 |
| 0000025620 | 76FF | 8DFA | DE4E | 5116 | 4E8D | 16F6 | 8D51 | D24E |
| 0000025640 | 5116 | 681E | 019C | 8C68 | FF01 | 1836 | FF01 | 1636 |
| 0000025660 | FF01 | 1C36 | FF01 | 1A36 | 9A01 | 1B3B | 0000 | C483 |
| 0000025700 | 8B28 | D846 | 09E9 | E900 | 0006 | 00B8 | E900 | 0000 |
| 0000025720 | 5E1F | 835F | 02ED | E58B | 5D1F | CA4D | 0008 | 581E |
| 0000025740 | 4590 | 8B55 | 1EEC | D88E | EC81 | 0106 | 5657 | 76FF |
| 0000025760 | FF08 | 0676 | 868D | FEFA | 5016 | 509A | 8F27 | 8320 |
| 0000026000 | 08C4 | 681E | 01B2 | 868D | FEFA | 5016 | 0A9A | BF27 |
| 0000026020 | 8320 | 08C4 | 306A | 868D | FEFA | 5016 | CF9A | FB29 |
| 0000026040 | 8320 | 06C4 | 003D | 7400 | E903 | 0006 | 00B8 | E900 |
| 0000026060 | 0092 | 681E | 01BF | 868D | FEFA | 5016 | 0A9A | CD27 |

THU MAR 14 17:31:54 1991 DB_PI.DLL PAGE 13, LINE 709

| | | | | | | | | |
|---|---|---|---|---|---|---|---|---|
| 0000026100 | 8320 | 08C4 | 868D | FEFA | 5016 | B09A | EB27 | 8320 |
| 0000026120 | 04C4 | F08B | 828D | FEFA | 4689 | 8CFA | FC56 | 681E |
| 0000026140 | 01C1 | 76FF | FFFC | FA76 | 509A | 1B27 | 8321 | 08C4 |
| 0000026160 | 2F6A | 868D | FEFA | 5016 | CF9A | 2B29 | 8321 | 06C4 |
| 0000026200 | 003D | 7400 | E903 | 0006 | 00B8 | E900 | 0036 | 681E |
| 0000026220 | 01CC | 76FF | FFFC | FA76 | 509A | FB27 | 831D | 08C4 |
| 0000026240 | 2F6A | 868D | FEFA | 5016 | CF9A | B029 | 8306 | 06C4 |
| 0000026260 | 003D | 7400 | E903 | 0006 | 00B8 | E900 | 0006 | 01B8 |
| 0000026300 | E900 | 0000 | 5F5E | ED83 | 8B02 | 1FE5 | 4D5D | 1ECB |
| 0000026320 | 9058 | 5545 | EC8B | 8E1E | 81D8 | 30EC | 5701 | 1E56 |
| 0000026340 | 86B8 | 8E1C | C7D8 | F246 | 0000 | C02B | 4689 | 89D4 |
| 0000026360 | D246 | 46C7 | 00F8 | C700 | EE46 | 0000 | 46C7 | D8FA |
| 0000026400 | 8C01 | FC5E | 46C7 | 01F0 | 2B01 | 89C0 | E046 | 4689 |
| 0000026420 | 8EDE | 5A06 | 263A | 3E83 | 222F | 7500 | E903 | 001D |
| 0000026440 | 36FF | 011C | 36FF | 011A | 468D | 16D6 | 9A50 | 1CBC |
| 0000026460 | 0000 | C483 | 3D08 | 0000 | 0374 | 0FE9 | 8E00 | 5C06 |
| 0000026500 | 263A | 3E83 | 2247 | 7500 | E903 | 003B | 681E | 01DF |
| 0000026520 | 468D | 16E2 | 8D50 | D646 | 5016 | 468D | 16F4 | 6850 |
| 0000026540 | 01D8 | 681E | 01E6 | 36FF | 0118 | 36FF | 0116 | 36FF |
| 0000026560 | 011C | 36FF | 011A | 059A | 001D | 8300 | 1EC4 | 4689 |
| 0000026600 | 89F4 | F656 | 08E9 | 2B00 | 89C0 | F646 | 4689 | 8DF4 |
| 0000026620 | D246 | 5016 | 3C9A | 9F43 | 8320 | 04C4 | 4689 | 83F2 |
| 0000026640 | F27E | 7500 | E903 | 007E | D68E | 3A5A | 8326 | A63E |
| 0000026660 | 001C | 0375 | 09E9 | 8300 | DA7E | 74FE | E903 | 000F |
| 0000026700 | 068E | 3A5C | 8326 | D23E | 001C | 0375 | 51E9 | 8B00 |
| 0000026720 | F246 | 4689 | FFDC | E076 | 76FF | 8DDE | DC46 | 5016 |
| 0000026740 | 76FF | FFF0 | FC76 | 76FF | 8DFA | E24E | 5116 | 4E8D |
| 0000026760 | 16F4 | 8D51 | D64E | 5116 | 681E | 01E6 | DC68 | FF01 |
| 0000027000 | 1836 | FF01 | 1636 | FF01 | 1C36 | FF01 | 1A36 | 9A01 |
| 0000027020 | 1DAF | 0000 | C483 | 8B28 | DC46 | EDE9 | E902 | 0006 |
| 0000027040 | 468B | E9F2 | 02E4 | 6683 | FCD2 | 6683 | FFD4 | 5EC4 |
| 0000027060 | 260A | 07C7 | 0000 | 5EC4 | 2B06 | 26C0 | 4789 | 2602 |
| 0000027100 | 0789 | 46C7 | 00F8 | E900 | 0003 | 46FF | 83F8 | F87E |
| 0000027120 | 7E19 | E903 | 017D | 01B8 | BA00 | 0000 | 4E8A | 80F8 |
| 0000027140 | 00F9 | 0375 | 11E9 | D100 | D1E0 | FED2 | 80C9 | 00F9 |
| 0000027160 | 0375 | 03E9 | E900 | FFEF | 4623 | 23D2 | D456 | D00B |
| 0000027200 | 0374 | 03E9 | E900 | FFC2 | 468A | 04F8 | 8841 | D286 |
| 0000027220 | C6FE | D386 | 3AFE | 86C6 | FED4 | 8300 | 0E7E | 7500 |
| 0000027240 | E903 | 003B | 868D | FED2 | 5016 | 5E9A | A720 | 830C |
| 0000027260 | 04C4 | 8689 | FED0 | BE83 | FED0 | 7500 | E903 | 0009 |
| 0000027300 | 7E83 | 020E | 0375 | 13E9 | 8300 | D0BE | 00FE | 0374 |
| 0000027320 | 0CE9 | 8300 | 0E7E | 7401 | E903 | 0003 | 6BE9 | C4FF |
| 0000027340 | 0A5E | 468B | 26EE | 0739 | 0374 | BAE9 | 8B00 | EE46 |
| 0000027360 | 0505 | C100 | 05E0 | C450 | 065E | FF26 | 0277 | FF26 |
| 0000027400 | 9A37 | 32A4 | 2445 | C483 | C406 | 065E | 8926 | 2607 |
| 0000027420 | 5789 | 8B02 | 0846 | 460B | 7406 | E903 | 0085 | 5EC4 |
| 0000027440 | 260A | 07C7 | 0000 | 068E | 3A5A | 8326 | 973E | 0024 |
| 0000027460 | 0375 | 09E9 | 8300 | DA7E | 74FE | E903 | 000F | 068E |
| 0000027500 | 3A5C | 8326 | AF3E | 0024 | 0375 | 50E9 | C700 | DC46 |
| 0000027520 | 0007 | 76FF | FFE0 | DE76 | 468D | 16DC | FF50 | F076 |
| 0000027540 | 76FF | FFFC | FA76 | 4E8D | 16E2 | 8D51 | F44E | 5116 |
| 0000027560 | 4E8D | 16D6 | 1E51 | E668 | 6801 | 0203 | 36FF | 0118 |
| 0000027600 | 36FF | 0116 | 36FF | 011C | 36FF | 011A | F79A | 0024 |
| 0000027620 | 8300 | 28C4 | 468B | E9DC | 0170 | 06E9 | B800 | 0007 |
| 0000027640 | 67E9 | 8301 | EE46 | 8D05 | D286 | 16FE | C450 | 0A5E |
| 0000027660 | 8B26 | C107 | 05E0 | 5EC4 | 2606 | 0703 | 8B26 | 0257 |
| 0000027700 | 5052 | 509A | 6A27 | 8324 | 08C4 | 5EC4 | 260A | 07FF |
| 0000027720 | 77E9 | C4FE | 0A5E | 8B26 | C107 | 05E0 | C450 | 065E |
| 0000027740 | FF26 | 0277 | FF26 | 9A37 | 32A4 | 207D | C483 | C406 |

THU MAR 14 17:31:54 1991 DB_PI.DLL PAGE 14, LINE 768

| | | | | | | | | |
|---|---|---|---|---|---|---|---|---|
| 0000027760 | 065E | 8926 | 2607 | 5789 | C402 | 065E | 8B26 | 0247 |
| 0000030000 | 0B26 | 7407 | E903 | 0085 | 5EC4 | 260A | 07C7 | 0000 |
| 0000030020 | 068E | 3A5A | 8326 | 143E | 0025 | 0375 | 09E9 | 830C |
| 0000030040 | DA7E | 74FE | E903 | 000F | 068E | 3A5C | 8326 | 2C3E |
| 0000030060 | 0025 | 0375 | 50E9 | C700 | DC46 | 0007 | 76FF | FFE0 |
| 0000030100 | DE76 | 468D | 16DC | FF50 | F076 | 76FF | FFFC | FA76 |
| 0000030120 | 4E8D | 16E2 | 8D51 | F44E | 5116 | 4E8D | 16D6 | 1E51 |
| 0000030140 | E668 | 6801 | 0212 | 36FF | 0118 | 36FF | 0116 | 36FF |
| 0000030160 | 011C | 36FF | 011A | 749A | 0025 | 8300 | 28C4 | 468B |
| 0000030200 | E9DC | 0086 | 06E9 | B800 | 0007 | 7DE9 | 8E00 | 5A06 |
| 0000030220 | 263A | 3E83 | 2198 | 7500 | E903 | 0009 | 7E83 | FEDA |
| 0000030240 | 0374 | 0FE9 | 8E00 | 5C06 | 263A | 3E83 | 21C4 | 7500 |
| 0000030260 | E903 | 0050 | 46C7 | 00DC | FF00 | E076 | 76FF | 8DDE |
| 0000030300 | DC46 | 5016 | 76FF | FFF0 | FC76 | 76FF | 8DFA | E24E |
| 0000030320 | 5116 | 4E8D | 16F4 | 8D51 | D64E | 5116 | 681E | 01E6 |
| 0000030340 | 1568 | FF02 | 1836 | FF01 | 1636 | FF01 | 1C36 | FF01 |
| 0000030360 | 1A36 | 9A01 | 2290 | 0000 | C483 | 8B28 | DC46 | 09E9 |
| 0000030400 | E900 | 0006 | 00B8 | E900 | 0000 | 5E1F | 835F | 02ED |
| 0000030420 | E58B | 5D1F | CA4D | 000A | 581E | 4590 | 8B55 | 1EEC |
| 0000030440 | D88E | EC81 | 012E | 5657 | B81E | 2161 | D88E | 46C7 |
| 0000030460 | 06FA | 8C02 | FC5E | 86C7 | FEEA | 0101 | C02B | 8689 |
| 0000030500 | FEDC | 8689 | FEDA | 068E | 3A5E | 8326 | AD3E | 0023 |
| 0000030520 | 0375 | 1EE9 | FF00 | 1A36 | FF02 | 1836 | 8D02 | D286 |
| 0000030540 | 16FE | 9A50 | 21AE | 0000 | C483 | 3D08 | 0000 | 0374 |
| 0000030560 | 0FE9 | 8E00 | 6006 | 263A | 3E83 | 2676 | 7500 | E903 |
| 0000030600 | 003F | 681E | 020D | 868D | FEDE | 5016 | 868D | FED2 |
| 0000030620 | 5016 | 868D | FEF6 | 5016 | 776A | 681E | 021C | 36FF |
| 0000030640 | 0216 | 36FF | 0214 | 36FF | 021A | 36FF | 0218 | F79A |
| 0000030660 | 0021 | 8300 | 1EC4 | 8689 | FEF6 | 9689 | FEF8 | 0AE9 |
| 0000030700 | 2B00 | 89C0 | F886 | 89FE | F686 | 8BFE | 0846 | 460B |
| 0000030720 | 7406 | E903 | 0086 | 068E | 3A5E | 8326 | 1D3E | 0027 |
| 0000030740 | 0375 | 0AE9 | 8300 | D6BE | FEFE | 0374 | 0FE9 | 8E00 |
| 0000030760 | 6006 | 263A | 3E83 | 2736 | 7500 | E903 | 0058 | 86C7 |
| 0000031000 | FED8 | 0017 | B6FF | FEDC | B6FF | FEDA | 868D | FED8 |
| 0000031020 | 5016 | B6FF | FEEA | 76FF | FFFC | FA76 | 8E8D | FEDE |
| 0000031040 | 5116 | 8E8D | FEF6 | 5116 | 8E8D | FED2 | 5116 | 681E |
| 0000031060 | 021C | 7F6A | 36FF | 0216 | 36FF | 0214 | 36FF | 021A |
| 0000031100 | 36FF | 0218 | 889A | 0027 | 8300 | 28C4 | 868B | FED8 |
| 0000031120 | E8E9 | E902 | 0006 | 17B8 | E900 | 02DF | 5EC4 | 2B06 |
| 0000031140 | 26C0 | 4789 | 2602 | 0789 | 868D | FEEC | 5016 | 868D |
| 0000031160 | FEF2 | 5016 | 76FF | FF16 | 1476 | 76FF | FF1A | 1876 |
| 0000031200 | 349A | C2D8 | 8327 | 10C4 | 8689 | FEF0 | BE83 | FEF0 |
| 0000031220 | 7500 | E903 | 008A | 068E | 3A5E | 8326 | DC3E | 0027 |
| 0000031240 | 0375 | 0AE9 | 8300 | D6BE | FEFE | 0374 | 0FE9 | 8E00 |
| 0000031260 | 6006 | 263A | 3E83 | 27F5 | 7500 | E903 | 005B | 868B |
| 0000031300 | FEF0 | 8689 | FED8 | B6FF | FEDC | B6FF | FEDA | 868D |
| 0000031320 | FED8 | 5016 | B6FF | FEEA | 76FF | FFFC | FA76 | 8E8D |
| 0000031340 | FEDE | 5116 | 8E8D | FEF6 | 5116 | 8E8D | FED2 | 5116 |
| 0000031360 | 681E | 021C | 8468 | FF00 | 1636 | FF02 | 1436 | FF02 |
| 0000031400 | 1A36 | FF02 | 1836 | 9A02 | 2847 | 0000 | C483 | 8B28 |
| 0000031420 | D886 | E9FE | 0225 | 07E9 | 8B00 | F086 | E9FE | 021B |
| 0000031440 | 468B | 0B0C | 0A46 | 0375 | BEE9 | 8D00 | FA86 | 16FE |
| 0000031460 | FF50 | 0C76 | 76FF | FF0A | F4B6 | FFFE | F2B6 | 9AFE |
| 0000031500 | DE65 | 1D36 | C483 | 890C | F086 | 83FE | F0BE | 00FE |
| 0000031520 | 0375 | 8AE9 | 8E00 | 5E06 | 263A | 3E83 | 28B1 | 7500 |
| 0000031540 | E903 | 000A | BE83 | FED6 | 74FE | E903 | 000F | 068E |
| 0000031560 | 3A60 | 8326 | CA3E | 0028 | 0375 | 5BE9 | 8B00 | F086 |
| 0000031600 | 89FE | D886 | FFFE | DCB6 | FFFE | DAB6 | 8DFE | D886 |
| 0000031620 | 16FE | FF50 | EAB6 | FFFE | FC76 | 76FF | 8DFA | DE8E |

THU MAR 14 17:31:54 1991 DB_PI.DLL PAGE 15, LINE 827

| | | | | | | | | |
|---|---|---|---|---|---|---|---|---|
| 0000031640 | 16FE | 8D51 | F68E | 16FE | 8D51 | D28E | 16FE | 1E51 |
| 0000031660 | 1C68 | 6802 | 0089 | 36FF | 0216 | 36FF | 0214 | 36FF |
| 0000031700 | 021A | 36FF | 0218 | 1C9A | 0029 | 8300 | 28C4 | 868B |
| 0000031720 | FED8 | 66E9 | E901 | 0007 | 868B | FEF0 | 5CE9 | 8D01 |
| 0000031740 | FA86 | 89FE | 0A46 | 568C | FF0C | 0876 | 76FF | FF06 |
| 0000031760 | 0C76 | 76FF | FF0A | 0E76 | 76FF | FF12 | 1076 | 76FF |
| 0000032000 | FF16 | 1476 | B6FF | FEEE | B6FF | FEEC | B6FF | FEF4 |
| 0000032020 | B6FF | FEF2 | 6E9A | 8480 | 8323 | 1AC4 | 8689 | FEF0 |
| 0000032040 | BE83 | FEF0 | 7500 | E903 | 008A | 068E | 3A5E | 8326 |
| 0000032060 | 3B3E | 0029 | 0375 | 0AE9 | 8300 | D6BE | FEFE | 0374 |
| 0000032100 | 0FE9 | 8E00 | 6006 | 263A | 3E83 | 2954 | 7500 | E903 |
| 0000032120 | 005B | 868B | FEF0 | 8689 | FED8 | B6FF | FEDC | B6FF |
| 0000032140 | FEDA | 868D | FED8 | 5016 | B6FF | FEEA | 76FF | FFFC |
| 0000032160 | FA76 | 8E8D | FEDE | 5116 | 8E8D | FEF6 | 5116 | 8E8D |
| 0000032200 | FED2 | 5116 | 681E | 021C | 8F68 | FF00 | 1636 | FF02 |
| 0000032220 | 1436 | FF02 | 1A36 | FF02 | 1836 | 9A02 | 240D | 000n |
| 0000032240 | C483 | 8B28 | D886 | E9FE | 0091 | 07E9 | 8B00 | F086 |
| 0000032260 | E9FE | 0087 | 068E | 3A5E | 8326 | CD3E | 0025 | 0375 |
| 0000032300 | 0AE9 | 8300 | D6BE | FEFE | 0374 | 0FE9 | 8E00 | 6006 |
| 0000032320 | 263A | 3E83 | 23C5 | 7500 | E903 | 0059 | 86C7 | FED8 |
| 0000032340 | 0000 | B6FF | FEDC | B6FF | FEDA | 868D | FED8 | 5016 |
| 0000032360 | B6FF | FEEA | 76FF | FFFC | FA76 | 8E8D | FEDE | 5116 |
| 0000032400 | 8E8D | FEF6 | 5116 | 8E8D | FED2 | 5116 | 681E | 021C |
| 0000032420 | 9168 | FF00 | 1636 | FF02 | 1436 | FF02 | 1A36 | FF02 |
| 0000032440 | 1836 | 9A02 | 26C5 | 0000 | C483 | 8B28 | D886 | E9FE |
| 0000032460 | 0009 | 06E9 | B800 | 0000 | 00E9 | 1F00 | 5F5E | ED83 |
| 0000032500 | 8B02 | 1FE5 | 4D5D | 16CA | 1E00 | 9058 | 5545 | EC8B |
| 0000032520 | 8E1E | 81D8 | 2EEC | 5701 | 1E56 | AAB8 | 8E25 | C7D8 |
| 0000032540 | FA46 | 0233 | 5E8C | C7FC | EA86 | 01FE | 2B01 | 89C0 |
| 0000032560 | DC86 | 89FE | DA86 | 8EFE | 5E06 | 263A | 3E83 | 2A8F |
| 0000032600 | 7500 | E903 | 001E | 36FF | 021A | 36FF | 0218 | 868D |
| 0000032620 | FED2 | 5016 | E49A | 0025 | 8300 | 08C4 | 003D | 7400 |
| 0000032640 | E903 | 000F | 068E | 3A60 | 8326 | A83E | 002A | 0375 |
| 0000032660 | 40E9 | 1E00 | 3A68 | 8D02 | DE86 | 16FE | 8D50 | D286 |
| 0000032700 | 16FE | 8D50 | F686 | 16FE | 6850 | 00C7 | 681E | 0242 |
| 0000032720 | 36FF | 0216 | 36FF | 0214 | 36FF | 021A | 36FF | 0218 |
| 0000032740 | 2F9A | 0026 | 8300 | 1EC4 | 8689 | FEF6 | 9689 | FEF8 |
| 0000032760 | 0AE9 | 2B00 | 89C0 | F886 | 89FE | F686 | 8BFE | 0846 |
| 0000033000 | 460B | 7406 | E903 | 0087 | 068E | 3A5E | 8326 | 4E3E |
| 0000033020 | 002B | 0375 | 0AE9 | 8300 | D6BE | FEFE | 0374 | 0FE9 |
| 0000033040 | 8E00 | 6006 | 263A | 3E83 | 2B67 | 7500 | E903 | 0059 |
| 0000033060 | 86C7 | FED8 | 0017 | B6FF | FEDC | B6FF | FEDA | 868D |
| 0000033100 | FED8 | 5016 | B6FF | FEEA | 76FF | FFFC | FA76 | 8E8D |
| 0000033120 | FEDE | 5116 | 8E8D | FEF6 | 5116 | 8E8D | FED2 | 5116 |
| 0000033140 | 681E | 0242 | D068 | FF00 | 1636 | FF02 | 1436 | FF02 |
| 0000033160 | 1A36 | FF02 | 1836 | 9A02 | 2BB9 | 0000 | C483 | 8B28 |
| 0000033200 | D886 | E9FE | 02DA | 06E9 | B800 | 0017 | D1E9 | C402 |
| 0000033220 | 065E | C02B | 8926 | 0247 | 8926 | 8D07 | EC86 | 16FE |
| 0000033240 | 8D50 | F286 | 16FE | 6A50 | 6A00 | FF00 | 1276 | 76FF |
| 0000033260 | 9A10 | D834 | 2BF3 | C483 | 8910 | F086 | 83FE | F0BE |
| 0000033300 | 00FE | 0375 | 8AE9 | 8E00 | 5E06 | 263A | 3E83 | 2C0D |
| 0000033320 | 7500 | E903 | 000A | BE83 | FED6 | 74FE | E903 | 000F |
| 0000033340 | 068E | 3A60 | 8326 | 263E | 002C | 0375 | 5BE9 | 8B00 |
| 0000033360 | F086 | 89FE | D886 | FFFE | DCB6 | FFFE | DAB6 | 8DFE |
| 0000033400 | D886 | 16FE | FF50 | EAB6 | FFFE | FC76 | 76FF | 8DFA |
| 0000033420 | DE8E | 16FE | 8D51 | F68E | 16FE | 8D51 | D28E | 16FE |
| 0000033440 | 1E51 | 4268 | 6802 | 00D6 | 36FF | 0216 | 36FF | 0214 |
| 0000033460 | 36FF | 021A | 36FF | 0218 | 789A | 002C | 8300 | 28C4 |
| 0000033500 | 868B | FED8 | 19E9 | E902 | 0007 | 868B | FEF0 | 0FE9 |

THU MAR 14 17:31:54 1991 DB_PI.DLL PAGE 16, LINE 886

| | | | | | | | | |
|---|---|---|---|---|---|---|---|---|
| 0000033520 | 8B02 | 0C46 | 460B | 750A | E903 | 00BE | 868D | FEFA |
| 0000033540 | 5016 | 76FF | FF0C | 0A76 | B6FF | FEF4 | B6FF | FEF2 |
| 0000033560 | 659A | 03DE | 8327 | 0CC4 | 8689 | FEF0 | BE83 | FEF0 |
| 0000033600 | 7500 | E903 | 008A | 068E | 3A5E | 8326 | D63E | 002C |
| 0000033620 | 0375 | 0AE9 | 8300 | D6BE | FEFE | 0374 | 0FE9 | 8E00 |
| 0000033640 | 6006 | 263A | 3E83 | 2CEF | 7500 | E903 | 005B | 868B |
| 0000033660 | FEF0 | 8689 | FED8 | B6FF | FEDC | B6FF | FEDA | 868D |
| 0000033700 | FED8 | 5016 | B6FF | FEEA | 76FF | FFFC | FA76 | 8E8D |
| 0000033720 | FEDE | 5116 | 8E8D | FEF6 | 5116 | 8E8D | FED2 | 5116 |
| 0000033740 | 681E | 0242 | DC68 | FF00 | 1636 | FF02 | 1436 | FF02 |
| 0000033760 | 1A36 | FF02 | 1836 | 9A02 | 2D41 | 0000 | C483 | 8B28 |
| 0000034000 | D886 | E9FE | 015A | 07E9 | 8B00 | F086 | E9FE | 0150 |
| 0000034020 | 868D | FEFA | 4689 | 8C0A | 0C56 | 76FF | FF08 | 0676 |
| 0000034040 | 76FF | FF0C | 0A76 | 76FF | FF0E | EEB6 | FFFE | ECB6 |
| 0000034060 | FFFE | F4B6 | FFFE | F2B6 | 9AFE | 82A0 | 2897 | C483 |
| 0000034100 | 8912 | F086 | 83FE | F0BE | 00FE | 0375 | 8AE9 | 8E00 |
| 0000034120 | 5E06 | 263A | 3E83 | 2D60 | 7500 | E903 | 000A | BE83 |
| 0000034140 | FED6 | 74FE | E903 | 000F | 068E | 3A60 | 8326 | 793E |
| 0000034160 | 002D | 0375 | 5BE9 | 8B00 | F086 | 89FE | D886 | FFFE |
| 0000034200 | DCB6 | FFFE | DAB6 | 8DFE | D886 | 16FE | FF50 | EAB6 |
| 0000034220 | FFFE | FC76 | 76FF | 8DFA | DE8E | 16FE | 8D51 | F68E |
| 0000034240 | 16FE | 8D51 | D28E | 16FE | 1E51 | 4268 | 6802 | 00E3 |
| 0000034260 | 36FF | 0216 | 36FF | 0214 | 36FF | 021A | 36FF | 0218 |
| 0000034300 | A49A | 0029 | 8300 | 28C4 | 868B | FED8 | 91E9 | E900 |
| 0000034320 | 0007 | 868B | FEF0 | 87E9 | 8E00 | 5E06 | 263A | 3E83 |
| 0000034340 | 265D | 7500 | E903 | 000A | BE83 | FED6 | 74FE | E903 |
| 0000034360 | 000F | 068E | 3A60 | 8326 | FA3E | 0025 | 0375 | 59E9 |
| 0000034400 | C700 | D886 | 00FE | FF00 | DCB6 | FFFE | DAB6 | 8DFE |
| 0000034420 | D886 | 16FE | FF50 | EAB6 | FFFE | FC76 | 76FF | 8DFA |
| 0000034440 | DE8E | 16FE | 8D51 | F68E | 16FE | 8D51 | D28E | 16FE |
| 0000034460 | 1E51 | 4268 | 6802 | 00E5 | 36FF | 0216 | 36FF | 0214 |
| 0000034500 | 36FF | 021A | 36FF | 0218 | F89A | 002A | 8300 | 28C4 |
| 0000034520 | 868B | FED8 | 09E9 | E900 | 0006 | 00B8 | E900 | 0000 |
| 0000034540 | 5E1F | 835F | 02ED | E58B | 5D1F | CA4D | 000E | 581E |
| 0000034560 | 4590 | 8B55 | 1EEC | D88E | EC81 | 002E | 5657 | B81E |
| 0000034600 | 29DB | D88E | 46C7 | 53FA | 8C02 | FC5E | 46C7 | 01EA |
| 0000034620 | 2B01 | 89C0 | DC46 | 4689 | 8EDA | 5E06 | 263A | 3E83 |
| 0000034640 | 2EA9 | 7500 | E903 | 001D | 36FF | 021A | 36FF | 0218 |
| 0000034660 | 468D | 16D2 | 9A50 | 2A15 | 0000 | C483 | 3D08 | 0000 |
| 0000034700 | 0374 | 0FE9 | 8E00 | 6006 | 263A | 3E83 | 2EC1 | 7500 |
| 0000034720 | E903 | 003B | 681E | 025A | 468D | 16DE | 8D50 | D246 |
| 0000034740 | 5016 | 468D | 16F6 | 6850 | 011D | 681E | 0262 | 36FF |
| 0000034760 | 0216 | 36FF | 0214 | 36FF | 021A | 36FF | 0218 | 619A |
| 0000035000 | 002A | 8300 | 1EC4 | 4689 | 89F6 | F856 | 08E9 | 2B00 |
| 0000035020 | 89C0 | F846 | 4689 | 8BF6 | 0846 | 460B | 7406 | E903 |
| 0000035040 | 007D | 068E | 3A5E | 8326 | 5C3E | 002F | 0375 | 09E9 |
| 0000035060 | 8300 | D67E | 74FE | E903 | 000F | 068E | 3A60 | 8326 |
| 0000035100 | 743E | 002F | 0375 | 50E9 | C700 | D846 | 0017 | 76FF |
| 0000035120 | FFDC | DA76 | 468D | 16D8 | FF50 | EA76 | 76FF | FFFC |
| 0000035140 | FA76 | 4E8D | 16DE | 8D51 | F64E | 5116 | 4E8D | 16D2 |
| 0000035160 | 1E51 | 6268 | 6802 | 0125 | 36FF | 0216 | 36FF | 0214 |
| 0000035200 | 36FF | 021A | 36FF | 0218 | BD9A | 002F | 8300 | 28C4 |
| 0000035220 | 468B | E9D8 | 01E7 | 06E9 | B800 | 0017 | DEE9 | C401 |
| 0000035240 | 065E | C02B | 8926 | 0247 | 8926 | 8D07 | EC46 | 5016 |
| 0000035260 | 468D | 16F2 | FF50 | 0E76 | 76FF | FF0C | 1276 | 76FF |
| 0000035300 | 9A10 | D834 | 2B34 | C483 | 8910 | F046 | 7E83 | 00F0 |
| 0000035320 | 0375 | 7EE9 | 8E00 | 5E06 | 263A | 3E83 | 3009 | 7500 |
| 0000035340 | E903 | 0009 | 7E83 | FED6 | 0374 | 0FE9 | 8E00 | 6006 |
| 0000035360 | 263A | 3E83 | 3021 | 7500 | E903 | 0051 | 468B | 89F0 |

THU MAR 14 17:31:54 1991 DB_PI.DLL PAGE 17, LINE 945

| | | | | | | | | |
|---|---|---|---|---|---|---|---|---|
| 0000035400 | D846 | 76FF | FFDC | DA76 | 468D | 16D8 | FF50 | EA76 |
| 0000035420 | 76FF | FFFC | FA76 | 4E8D | 16DE | 8D51 | F64E | 5116 |
| 0000035440 | 4E8D | 16D2 | 1E51 | 6268 | 6802 | 012A | 36FF | 0216 |
| 0000035460 | 36FF | 0214 | 36FF | 021A | 36FF | 0218 | 6A9A | 0030 |
| 0000035500 | 8300 | 28C4 | 468B | E9D8 | 0133 | 06E9 | 8B00 | F046 |
| 0000035520 | 2AE9 | FF01 | 0876 | 76FF | FF06 | 0A76 | 76FF | FF0E |
| 0000035540 | 0C76 | 76FF | FFEE | EC76 | 76FF | FFF4 | F276 | 3D9A |
| 0000035560 | BC83 | 832C | 12C4 | 4689 | 83F0 | F07E | 7500 | E903 |
| 0000035600 | 007E | 068E | 3A5E | 8326 | 873E | 0030 | 0375 | 09E9 |
| 0000035620 | 8300 | D67E | 74FE | E903 | 000F | 068E | 3A60 | 8326 |
| 0000035640 | 9F3E | 0030 | 0375 | 51E9 | 8B00 | F046 | 4689 | FFD8 |
| 0000035660 | DC76 | 76FF | 8DDA | D846 | 5016 | 76FF | FFEA | FC76 |
| 0000035700 | 76FF | 8DFA | DE4E | 5116 | 4E8D | 16F6 | 8D51 | D24E |
| 0000035720 | 5116 | 681E | 0262 | 2E68 | FF01 | 1636 | FF02 | 1436 |
| 0000035740 | FF02 | 1A36 | FF02 | 1836 | 9A02 | 30E7 | 0000 | C483 |
| 0000035760 | 8B28 | D846 | 86E9 | E900 | 0006 | 468B | E9F0 | 007D |
| 0000036000 | 068E | 3A5E | 8326 | FE3E | 0029 | 0375 | 09E9 | 8300 |
| 0000036020 | D67E | 74FE | E903 | 000F | 068E | 3A6D | 8326 | 2B3E |
| 0000036040 | 002A | 0375 | 50E9 | C700 | D846 | 0000 | 76FF | FFDC |
| 0000036060 | DA76 | 468D | 16D8 | FF50 | EA76 | 76FF | FFFC | FA76 |
| 0000036100 | 4E8D | 16DE | 8D51 | F64E | 5116 | 4E8D | 16D2 | 1E51 |
| 0000036120 | 6268 | 6802 | 0130 | 36FF | 0216 | 36FF | 0214 | 36FF |
| 0000036140 | 021A | 36FF | 0218 | C99A | 002D | 8300 | 28C4 | 468B |
| 0000036160 | E9D8 | 0009 | 06E9 | B800 | 0000 | 0DE9 | 1F00 | 5F5E |
| 0000036200 | ED83 | 8B02 | 1FE5 | 4D5D | 0ECA | 1E00 | 9058 | 5545 |
| 0000036220 | EC8B | 8E1E | 81D8 | 2EEC | 5700 | 1E56 | 00B8 | 8E2E |
| 0000036240 | C7D8 | FA46 | 0273 | 5E8C | C7FC | EA46 | 0101 | C02B |
| 0000036260 | 4689 | 89DC | DA46 | 068E | 3A5E | 8326 | C63E | 0031 |
| 0000036300 | 0375 | 1DE9 | FF00 | 1A36 | FF02 | 1836 | 8D02 | D246 |
| 0000036320 | 5016 | 369A | 002E | 8300 | 08C4 | 003D | 7400 | E903 |
| 0000036340 | 000F | 068E | 3A60 | 8326 | DE3E | 0031 | 0375 | 3BE9 |
| 0000036360 | 1E00 | 7A68 | 8D02 | DE46 | 5016 | 468D | 16D2 | 8D50 |
| 0000036400 | F646 | 5016 | 6068 | 1E01 | 8268 | FF02 | 1636 | FF02 |
| C000036420 | 1436 | FF02 | 1A36 | FF02 | 1836 | 9A02 | 2E7F | 0000 |
| 0000036440 | C483 | 891E | F646 | 5689 | E9F8 | 0008 | C02B | 4689 |
| 0000036460 | 89F8 | F646 | 468B | 0B08 | 0646 | 0374 | 7DE9 | 8E00 |
| 0000036500 | 5E06 | 263A | 3E83 | 3279 | 7500 | E903 | 0009 | 7E83 |
| 0000036520 | FED6 | 0374 | 0FE9 | 8E00 | 6006 | 263A | 3E83 | 3291 |
| 0000036540 | 7500 | E903 | 0050 | 46C7 | 17D8 | FF00 | DC76 | 76FF |
| 0000036560 | 8DDA | D846 | 5016 | 76FF | FFEA | FC76 | 76FF | 8DFA |
| 0000036600 | DE4E | 5116 | 4E8D | 16F6 | 8D51 | D24E | 5116 | 681E |
| 0000036620 | 0282 | 6868 | FF01 | 1636 | FF02 | 1436 | FF02 | 1A36 |
| 0000036640 | FF02 | 1836 | 9A02 | 32DA | 0000 | C483 | 8B28 | D846 |
| 0000036660 | E4E9 | E901 | 0006 | 17B8 | E900 | 01DB | 5EC4 | 2B06 |
| 0000036700 | 26C0 | 4789 | 2602 | 0789 | 468D | 16EC | 8D50 | F246 |
| 0000036720 | 5016 | 76FF | FF0C | 0A76 | 76FF | FF10 | 0E76 | 349A |
| 0000036740 | 44D8 | 832F | 10C4 | 4689 | 83F0 | F07E | 7500 | E903 |
| 0000036760 | 007E | 068E | 3A5E | 8326 | 233E | 0033 | 0375 | 09E9 |
| 0000037000 | 8300 | D67E | 74FE | E903 | 000F | 068E | 3A60 | 8326 |
| 0000037020 | 3B3E | 0033 | 0375 | 51E9 | 8B00 | F046 | 4689 | FFD8 |
| 0000037040 | DC76 | 76FF | 8DDA | D846 | 5016 | 76FF | FFEA | FC76 |
| 0000037060 | 76FF | 8DFA | DE4E | 5116 | 4E8D | 16F6 | 8D51 | D24E |
| 0000037100 | 5116 | 681E | 0282 | 6D68 | FF01 | 1636 | FF02 | 1436 |
| 0000037120 | FF02 | 1A36 | FF02 | 1836 | 9A02 | 3384 | 0000 | C483 |
| 0000037140 | 8B28 | D846 | 30E9 | E901 | 0006 | 468B | E9F0 | 0127 |
| 0000037160 | 76FF | FF08 | 0676 | 76FF | FF0C | 0A76 | 76FF | FFEE |
| 0000037200 | EC76 | 76FF | FFF4 | F276 | 429A | F186 | 832F | 10C4 |
| 0000037220 | 4689 | 83F0 | F07E | 7500 | E903 | 007E | 068E | 3A5E |
| 0000037240 | 8326 | A13E | 0033 | 0375 | 09E9 | 8300 | D67E | 74FE |

THU MAR 14 17:31:54 1991 DB_PI.DLL PAGE 18, LINE 1004

| | | | | | | | | |
|---|---|---|---|---|---|---|---|---|
| 0000037260 | E903 | 000F | 068E | 3A60 | 8326 | B93E | 0033 | 0375 |
| 0000037300 | 51E9 | 8B00 | F046 | 4689 | FFD8 | DC76 | 76FF | 8DDA |
| 0000037320 | D846 | 5016 | 76FF | FFEA | FC76 | 76FF | 8DFA | DE4E |
| 0000037340 | 5116 | 4E8D | 16F6 | 8D51 | D24E | 5116 | 681E | 0282 |
| 0000037360 | 7168 | FF01 | 1636 | FF02 | 1436 | FF02 | 1A36 | FF02 |
| 0000037400 | 1836 | 9A02 | 3401 | 0000 | C483 | 8B28 | D846 | 86E9 |
| 0000037420 | E900 | 0006 | 468B | E9F0 | 007D | 068E | 3A5E | 8326 |
| 0000037440 | 203E | 002E | 0375 | 09E9 | 8300 | D67E | 74FE | E903 |
| 0000037460 | 000F | 068E | 3A60 | 8326 | 4C3E | 002E | 0375 | 50E9 |
| 0000037500 | C700 | D846 | 0000 | 76FF | FFDC | DA76 | 468D | 16D8 |
| 0000037520 | FF50 | EA76 | 76FF | FFFC | FA76 | 4E8D | 16DE | 8D51 |
| 0000037540 | F64E | 5116 | 4E8D | 16D2 | 1E51 | 8268 | 6802 | 0173 |
| 0000037560 | 36FF | 0216 | 36FF | 0214 | 36FF | 021A | 36FF | 0218 |
| 0000037600 | 099A | 002F | 8300 | 28C4 | 468B | E9D8 | 0009 | 06E9 |
| 0000037620 | B800 | 0000 | 00E9 | 1F00 | 5F5E | ED83 | 8B02 | 1FE5 |
| 0000037640 | 4D5D | 0CCA | 1E00 | 9058 | 5545 | EC8B | 8E1E | 81D8 |
| 0000037660 | 24EC | 5700 | 1E56 | 1DB8 | 8E31 | C7D8 | FA46 | 0295 |
| 0000037700 | 5E8C | C7FC | F446 | 0000 | C02B | 4689 | 89E6 | E446 |
| 0000037720 | 068E | 3A5E | 8326 | 3D3E | 0031 | 0375 | 1DE9 | FF00 |
| 0000037740 | 1A36 | FF02 | 1836 | 8D02 | DC46 | 5016 | 539A | 0031 |
| 0000037760 | 8300 | 08C4 | 003D | 7400 | E903 | 000F | 068E | 3A60 |
| 0000040000 | 8326 | 693E | 0031 | 0375 | 3BE9 | 1E00 | 9968 | 8D02 |
| 0000040020 | E846 | 5016 | 468D | 16DC | 8D50 | F646 | 5016 | 8F68 |
| 0000040040 | 1E01 | 9E68 | FF02 | 1636 | FF02 | 1436 | FF02 | 1A36 |
| 0000040060 | FF02 | 1836 | 9A02 | 319C | 0000 | C483 | 891E | F646 |
| 0000040100 | 5689 | E9F8 | 0008 | C02B | 4689 | 89F8 | F646 | 5EC4 |
| 0000040120 | 2606 | 77FF | 264A | 77FF | 9A48 | 2448 | 34EA | C483 |
| 0000040140 | FF04 | 0876 | 76FF | 9A06 | 2448 | 330B | C483 | 8E04 |
| 0000040160 | 5E06 | 263A | 3E83 | 3457 | 7500 | E903 | 0009 | 7E83 |
| 0000040200 | FEE0 | 0374 | DFE9 | 8E00 | 6006 | 263A | 3E83 | 3483 |
| 0000040220 | 7500 | E903 | 0039 | 468D | 16E8 | 8D50 | F646 | 5016 |
| 0000040240 | 468D | 16DC | 1E50 | 9E68 | 6802 | 0194 | 36FF | 0216 |
| 0000040260 | 36FF | 0214 | 36FF | 021A | 36FF | 0218 | 7A9A | 000A |
| 0000040300 | 8300 | 1AC4 | 46C7 | 00E2 | E900 | 0006 | 03E9 | E900 |
| 0000040320 | 0000 | 5E1F | 835F | 02ED | E58B | 5D1F | CA4D | 0004 |
| 0000040340 | 581E | 4590 | 8B55 | 1EEC | D88E | EC81 | 002E | 5657 |
| 0000040360 | B81E | 3437 | D88E | 46C7 | B2FA | 8C02 | FC5E | 46C7 |
| 0000040400 | 01EA | 2B01 | 89C0 | DC46 | 4689 | 8EDA | 5E06 | 263A |
| 0000040420 | 3E83 | 3626 | 7500 | E903 | 001D | 36FF | 021A | 36FF |
| 0000040440 | 0218 | 468D | 16D2 | 9A50 | 346D | 000D | C483 | 3D08 |
| 0000040460 | 0000 | 0374 | 0FE9 | 8E00 | 6006 | 263A | 3E83 | 363E |
| 0000040500 | 7500 | E903 | 003B | 681E | 02B9 | 468D | 16DE | 8D50 |
| 0000040520 | D246 | 5016 | 468D | 16F6 | 6850 | 01B2 | 681E | 02C0 |
| 0000040540 | 36FF | 0216 | 36FF | 0214 | 36FF | 021A | 36FF | 0218 |
| 0000040560 | B69A | 0034 | 8300 | 1EC4 | 4689 | 89F6 | F856 | 08E9 |
| 0000040600 | 2B00 | 89C0 | F846 | 4689 | 8BF6 | 0C46 | 460B | 750A |
| 0000040620 | E903 | 000B | 468B | 0B08 | 0646 | 0374 | 7DE9 | 8E00 |
| 0000040640 | 5E06 | 263A | 3E83 | 36D7 | 7500 | E903 | 0009 | 7E83 |
| 0000040660 | FED6 | 0374 | 0FE9 | 8E00 | 6006 | 263A | 3E83 | 36EF |
| 0000040700 | 7500 | E903 | 0050 | 46C7 | 17D8 | FF00 | DC76 | 76FF |
| 0000040720 | 8DDA | D846 | 5016 | 76FF | FFEA | FC76 | 76FF | 8DFA |
| 0000040740 | DE4E | 5116 | 4E8D | 16F6 | 8D51 | D24E | 5116 | 681E |
| 0000040760 | D2C0 | BA68 | FF01 | 1636 | FFD2 | 1436 | FF02 | 1A36 |
| 0000041000 | FF02 | 1836 | 9A02 | 3738 | 0000 | C483 | 8B28 | D846 |
| 0000041020 | 65E9 | E902 | 0006 | 17B8 | E900 | 025C | 5EC4 | 2B06 |
| 0000041040 | 26C0 | 4789 | 2602 | 0789 | 468D | 16EC | 8D50 | F246 |
| 0000041060 | 5016 | 006A | 006A | 76FF | FF0C | 0A76 | 349A | 61D8 |
| 0000041100 | 8332 | 10C4 | 4689 | 83F0 | F07E | 7500 | E903 | 007E |
| 0000041120 | 068E | 3A5E | 8326 | 613E | 0037 | 0375 | 09E9 | 8300 |

THU MAR 14 17:31:54 1991 DB_PI.DLL PAGE 19, LINE 1063

| | | | | | | | | |
|---|---|---|---|---|---|---|---|---|
| 0000041140 | D67E | 74FE | E903 | 000F | 068E | 3A60 | 8326 | 793E |
| 0000041160 | 0037 | 0375 | 51E9 | 8B00 | F046 | 4689 | FFD8 | DC76 |
| 0000041200 | 76FF | 8DDA | D846 | 5016 | 76FF | FFEA | FC76 | 76FF |
| 0000041220 | 8DFA | DE4E | 5116 | 4E8D | 16F6 | 8D51 | D24E | 5116 |
| 0000041240 | 681E | 02C0 | BF68 | FF01 | 1636 | FF02 | 1436 | FF02 |
| 0000041260 | 1A36 | FF02 | 1836 | 9A02 | 37C1 | 0000 | C483 | 8B28 |
| 0000041300 | D846 | B3E9 | E901 | 0006 | 468B | E9F0 | 01AA | 5EC4 |
| 0000041320 | 26EC | 3F80 | 7400 | E903 | 007D | 068E | 3A5E | 8326 |
| 0000041340 | 043E | 0038 | 0375 | 09E9 | 8300 | D67E | 74FE | E903 |
| 0000041360 | 000F | 068E | 3A60 | 8326 | 1C3E | 0038 | 0375 | 50E9 |
| 0000041400 | C700 | D846 | 01B3 | 76FF | FFDC | DA76 | 468D | 16D8 |
| 0000041420 | FF50 | EA76 | 76FF | FFFC | FA76 | 4E8D | 16DE | 8D51 |
| 0000041440 | F64E | 5116 | 4E8D | 16D2 | 1E51 | C068 | 6802 | 01C3 |
| 0000041460 | 36FF | 0216 | 36FF | 0214 | 36FF | 021A | 36FF | 0218 |
| 0000041500 | 659A | 0038 | 8300 | 28C4 | 468B | E9D8 | 012A | 06E9 |
| 0000041520 | B800 | 01B3 | 21E9 | FF01 | 0876 | 76FF | FF06 | EE76 |
| 0000041540 | 76FF | FFEC | F476 | 76FF | 9AF2 | 893B | 34DC | C483 |
| 0000041560 | 890C | F046 | 7E83 | 00F0 | 0375 | 7EE9 | 8E00 | 5E06 |
| 0000041600 | 263A | 3E83 | 3882 | 7500 | E903 | 0009 | 7E83 | FED6 |
| 0000041620 | 0374 | 0FE9 | 8E00 | 6006 | 263A | 3E83 | 389A | 7500 |
| 0000041640 | E903 | 0051 | 468B | 89F0 | D846 | 76FF | FFDC | DA76 |
| 0000041660 | 468D | 16D8 | FF50 | EA76 | 76FF | FFFC | FA76 | 4E8D |
| 0000041700 | 16DE | 8D51 | F64E | 5116 | 4E8D | 16D2 | 1E51 | C068 |
| 0000041720 | 6802 | 01C8 | 36FF | 0216 | 36FF | 0214 | 36FF | 021A |
| 0000041740 | 36FF | 0218 | E29A | 0038 | 8300 | 28C4 | 468B | E9D8 |
| 0000041760 | 0086 | 06E9 | 8B00 | F046 | 7DE9 | 8E00 | 5E06 | 263A |
| 0000042000 | 3E83 | 34F6 | 7500 | E903 | 0009 | 7E83 | FED6 | 0374 |
| 0000042020 | 0FE9 | 8E00 | 6006 | 263A | 3E83 | 350E | 7500 | E903 |
| 0000042040 | 0050 | 46C7 | 00D8 | FF00 | DC76 | 76FF | 8DDA | D846 |
| 0000042060 | 5016 | 76FF | FFEA | FC76 | 76FF | 8DFA | DE4E | 5116 |
| 0000042100 | 4E8D | 16F6 | 8D51 | D24E | 5116 | 681E | 02C0 | CA68 |
| 0000042120 | FF01 | 1636 | FF02 | 1436 | FF02 | 1A36 | FF02 | 1836 |
| 0000042140 | 9A02 | 3226 | 0000 | C483 | 8B28 | D846 | 09E9 | E900 |
| 0000042160 | 0006 | 00B8 | E900 | 0000 | 5E1F | 835F | 02ED | E58B |
| 0000042200 | 5D1F | CA4D | 00D8 | 581E | 4590 | 8B55 | 1EEC | D88E |
| 0000042220 | EC81 | 0038 | 5657 | B81E | 3572 | D88E | 46C7 | D6FA |
| 0000042240 | 8C02 | FC5E | 46C7 | 01E0 | 2B01 | 89C0 | D246 | 4689 |
| 0000042260 | 8ED0 | 5E06 | 263A | 3E83 | 39C1 | 7500 | E903 | 001D |
| 0000042300 | 36FF | 021A | 36FF | 0218 | 468D | 16C8 | 9A50 | 35A8 |
| 0000042320 | 0000 | C483 | 3D08 | 0000 | 0374 | 0FE9 | 8E0D | 6006 |
| 0000042340 | 263A | 3E83 | 39D9 | 7500 | E903 | 003B | 681E | 02DD |
| 0000042360 | 468D | 16D4 | 8D50 | C846 | 5016 | 468D | 16EC | 6850 |
| 0000042400 | 01EB | 681E | 02E4 | 36FF | 0216 | 36FF | 0214 | 36FF |
| 0000042420 | 021A | 36FF | 0218 | F19A | 0035 | 8300 | 1EC4 | 4689 |
| 0000042440 | 89EC | EE56 | 08E9 | 2B00 | 89C0 | EE46 | 4689 | 8BEC |
| 0000042460 | 0846 | 460B | 7406 | E903 | 007D | 068E | 3A5E | 8326 |
| 0000042500 | 723E | 003A | 0375 | 09E9 | 8300 | CC7E | 74FE | E903 |
| 0000042520 | 000F | 068E | 3A60 | 8326 | 8A3E | 003A | 0375 | 50E9 |
| 0000042540 | C700 | CE46 | 0017 | 76FF | FFD2 | D076 | 468D | 16CE |
| 0000042560 | FF50 | E076 | 76FF | FFFC | FA76 | 4E8D | 16D4 | 8D51 |
| 0000042600 | EC4E | 5116 | 4E8D | 16C8 | 1E51 | E468 | 6802 | 01F3 |
| 0000042620 | 36FF | 0216 | 36FF | 0214 | 36FF | 021A | 36FF | 0218 |
| 0000042640 | D39A | 003A | 8300 | 28C4 | 468B | E9CE | 0286 | 06E9 |
| 0000042660 | B800 | 0017 | 7DE9 | C402 | 065E | C02B | 8926 | 0247 |
| 0000042700 | 8926 | 8D07 | E246 | 5016 | 468D | 16E8 | FF50 | 0C76 |
| 0000042720 | 76FF | 6A0A | 6A00 | 9A00 | D834 | 3AFB | C483 | 8910 |
| 0000042740 | E646 | 7E83 | 00E6 | 0375 | 7EE9 | 8E00 | 5E06 | 263A |
| 0000042760 | 3E83 | 3B13 | 7500 | E903 | 0009 | 7E83 | FECC | 0374 |
| 0000043000 | 0FE9 | 8E00 | 6006 | 263A | 3E83 | 3B2B | 7500 | E903 |

THU MAR 14 17:31:54 1991 DB_PI.DLL PAGE 20, LINE 1122

| | | | | | | | | |
|---|---|---|---|---|---|---|---|---|
| 0000043020 | 0051 | 468B | 89E6 | CE46 | 76FF | FFD2 | D076 | 468D |
| 0000043040 | 16CE | FF50 | E076 | 76FF | FFFC | FA76 | 4E8D | 16D4 |
| 0000043060 | 8D51 | EC4E | 5116 | 4E8D | 16C8 | 1E51 | E468 | 6802 |
| 0000043100 | 01F8 | 36FF | 0216 | 36FF | 0214 | 36FF | 021A | 36FF |
| 0000043120 | 0218 | 749A | 003B | 8300 | 28C4 | 468B | E9CE | 01D4 |
| 0000043140 | 06E9 | 8B00 | E646 | CBE9 | 8D01 | F046 | 5016 | 5EC4 |
| 0000043160 | 26E8 | 77FF | 2602 | 37FF | EC9A | BFDB | 8336 | 08C4 |
| 0000043200 | 4689 | 83E6 | E67E | 7500 | E903 | 007E | 068E | 3A5E |
| 0000043220 | 8326 | C03E | 003B | 0375 | 09E9 | 8300 | CC7E | 74FE |
| 0000043240 | E903 | 000F | 068E | 3A60 | 8326 | D83E | 003B | 0375 |
| 0000043260 | 51E9 | 8B00 | E646 | 4689 | FFCE | D276 | 76FF | 8DD0 |
| 0000043300 | CE46 | 5016 | 76FF | FFE0 | FC76 | 76FF | 8DFA | D44E |
| 0000043320 | 5116 | 4E8D | 16EC | 8D51 | C84E | 5116 | 681E | 02E4 |
| 0000043340 | FC68 | FF01 | 1636 | FF02 | 1436 | FF02 | 1A36 | FF02 |
| 0000043360 | 1836 | 9A02 | 3C21 | 0000 | C483 | 8B28 | CE46 | 33E9 |
| 0000043400 | E901 | 0006 | 468B | E9E6 | 012A | 76FF | FF08 | 0676 |
| 0000043420 | 468D | 16F0 | FF50 | 0C76 | 76FF | 6A0A | 6A00 | FF00 |
| 0000043440 | EA76 | 76FF | 9AE8 | 89C9 | 37EC | C483 | 8914 | E646 |
| 0000043460 | 7E83 | 00E6 | 0375 | 7EE9 | 8E00 | 5E06 | 263A | 3E83 |
| 0000043500 | 3C3E | 7500 | E903 | 0009 | 7E83 | FECC | 0374 | 0FE9 |
| 0000043520 | 8E00 | 6006 | 263A | 3E83 | 3C56 | 7500 | E903 | 0051 |
| 0000043540 | 468B | 89E6 | CE46 | 76FF | FFD2 | D076 | 468D | 16CE |
| 0000043560 | FF50 | E076 | 76FF | FFFC | FA76 | 4E8D | 16D4 | 8D51 |
| 0000043600 | EC4E | 5116 | 4E8D | 16C8 | 1E51 | E468 | 6802 | 0200 |
| 0000043620 | 36FF | 0216 | 36FF | 0214 | 36FF | 021A | 36FF | 0218 |
| 0000043640 | 9E9A | 003C | 83D0 | 28C4 | 468B | E9CE | 0086 | 06E9 |
| 0000043660 | 8B00 | E646 | 7DE9 | 8E00 | 5E06 | 263A | 3E83 | 3592 |
| 0000043700 | 7500 | E903 | 0009 | 7E83 | FECC | 0374 | 0FE9 | 8E00 |
| 0000043720 | 6006 | 263A | 3E83 | 35BE | 7500 | E903 | 0050 | 46C7 |
| 0000043740 | 00CE | FF00 | D276 | 76FF | 8DD0 | CE46 | 5016 | 76FF |
| 0000043760 | FFE0 | FC76 | 76FF | 8DFA | D44E | 5116 | 4E8D | 16EC |
| 0000044000 | 8D51 | C84E | 5116 | 681E | 02E4 | 0268 | FF02 | 1636 |
| 0000044020 | FF02 | 1436 | FF02 | 1A36 | FF02 | 1836 | 9A02 | 3686 |
| 0000044040 | 0000 | C483 | 8B28 | CE46 | 09E9 | E900 | 0006 | 00B8 |
| 0000044060 | E900 | 0000 | 5E1F | 835F | 02ED | E58B | 5D1F | CA4D |
| 0000044100 | 0008 | 581E | 4590 | 8B55 | 1EEC | D88E | EC81 | 0038 |
| 0000044120 | 5657 | B81E | 3918 | D88E | 46C7 | FAFA | 8C02 | FC5E |
| 0000044140 | 46C7 | 01E0 | 2B01 | 89C0 | D246 | 4689 | 8ED0 | 5E06 |
| 0000044160 | 263A | 3E83 | 3D7D | 7500 | E903 | 001D | 36FF | 021A |
| 0000044200 | 36FF | 0218 | 468D | 16C8 | 9A50 | 394E | 0000 | C483 |
| 0000044220 | 3D08 | 0000 | 0374 | 0FE9 | 8E00 | 6006 | 263A | 3E83 |
| 0000044240 | 3D95 | 7500 | E903 | 003B | 681E | 0301 | 468D | 16D4 |
| 0000044260 | 8D50 | C846 | 5016 | 468D | 16EC | 6850 | 022C | 681E |
| 0000044300 | 0308 | 36FF | 0216 | 36FF | 0214 | 36FF | 021A | 36FF |
| 0000044320 | 0218 | 979A | 0039 | 8300 | 1EC4 | 4689 | 89EC | EE56 |
| 0000044340 | 08E9 | 2B00 | 89C0 | EE46 | 4689 | 8BEC | 0846 | 460B |
| 0000044360 | 7406 | E903 | 007D | 068E | 3A5E | 8326 | 303E | 003E |
| 0000044400 | 0375 | 09E9 | 8300 | CC7E | 74FE | E903 | 000F | 068E |
| 0000044420 | 3A60 | 8326 | 483E | 003E | 0375 | 50E9 | C700 | CE46 |
| 0000044440 | 0017 | 76FF | FFD2 | D076 | 468D | 16CE | FF50 | E076 |
| 0000044460 | 76FF | FFFC | FA76 | 4E8D | 16D4 | 8D51 | EC4E | 5116 |
| 0000044500 | 4E8D | 16C8 | 1E51 | 0868 | 6803 | 0234 | 36FF | 0216 |
| 0000044520 | 36FF | 0214 | 36FF | 021A | 36FF | 0218 | 919A | 003E |
| 0000044540 | 8300 | 28C4 | 468B | E9CE | 028A | 06E9 | B800 | 0017 |
| 0000044560 | 81E9 | C402 | 065E | C02B | 8926 | 0247 | 8926 | 8D07 |
| 0000044600 | E246 | 5016 | 468D | 16E8 | FF50 | 0C76 | 76FF | FF0A |
| 0000044620 | 1076 | 76FF | 9A0E | D834 | 3EB9 | C483 | 8910 | E646 |
| 0000044640 | 7E83 | 00E6 | 0375 | 7EE9 | 8E00 | 5E06 | 263A | 3E83 |
| 0000044660 | 3ED1 | 7500 | E903 | 0009 | 7E83 | FECC | 0374 | 0FE9 |

THU MAR 14 17:31:54 1991 DB_PI.DLL PAGE 21, LINE 1181

| | | | | | | | | |
|---|---|---|---|---|---|---|---|---|
| 0000044700 | 8E00 | 6006 | 263A | 3E83 | 3EE9 | 7500 | E903 | 0051 |
| 0000044720 | 468B | 89E6 | CE46 | 76FF | FFD2 | D076 | 468D | 16CE |
| 0000044740 | FF50 | E076 | 76FF | FFFC | FA76 | 4E8D | 16D4 | 8D51 |
| 0000044760 | EC4E | 5116 | 4E8D | 16C8 | 1E51 | 0868 | 6803 | 0239 |
| 0000045000 | 36FF | 0216 | 36FF | 0214 | 36FF | 021A | 36FF | 0218 |
| 0000045020 | 329A | 003F | 8300 | 28C4 | 468B | E9CE | 01D6 | 06E9 |
| 0000045040 | 8B00 | E646 | CDE9 | 8D01 | F046 | 5016 | 5EC4 | 26E8 |
| 0000045060 | 77FF | 2602 | 37FF | EC9A | 5ADB | 833A | 08C4 | 4689 |
| 0000045100 | 83E6 | E67E | ,500 | E903 | 007E | 068E | 3A5E | 8326 |
| 0000045120 | 803E | 003F | 0375 | 09E9 | 8300 | CC7E | 74FE | E903 |
| 0000045140 | 000F | 068E | 3A60 | 8326 | 983E | 003F | 0375 | 51E9 |
| 0000045160 | 8B00 | E646 | 4689 | FFCE | D276 | 76FF | 8DD0 | CE46 |
| 0000045200 | 5016 | 76FF | FFE0 | FC76 | 76FF | 8DFA | D44E | 5116 |
| 0000045220 | 4E8D | 16EC | 8D51 | C84E | 5116 | 681E | 0308 | 3D68 |
| 0000045240 | FF02 | 1636 | FF02 | 1436 | FF02 | 1A36 | FF02 | 1836 |
| 0000045260 | 9A02 | 3FE1 | 0000 | C483 | 8B28 | CE46 | 35E9 | E901 |
| 0000045300 | 0006 | 468B | E9E6 | 012C | 76FF | FF08 | 0676 | 468D |
| 0000045320 | 16F0 | FF50 | 0C76 | 76FF | FF0A | E476 | 76FF | FFE2 |
| 0000045340 | EA76 | 76FF | 9AE8 | 89C9 | 3BA8 | C483 | 8914 | E646 |
| 0000045360 | 7E83 | 00E6 | 0375 | 7EE9 | 8E00 | 5E06 | 263A | 3E83 |
| 0000045400 | 3FFE | 7500 | E903 | 0009 | 7E83 | FECC | 0374 | 0FE9 |
| 0000045420 | 8E00 | 6006 | 263A | 3E83 | 4016 | 7500 | E903 | 0051 |
| 0000045440 | 468B | 89E6 | CE46 | 76FF | FFD2 | D076 | 468D | 16CE |
| 0000045460 | FF50 | E076 | 76FF | FFFC | FA76 | 4E8D | 16D4 | 8D51 |
| 0000045500 | EC4E | 5116 | 4E8D | 16C8 | 1E51 | 0868 | 6803 | 0242 |
| 0000045520 | 36FF | 0216 | 36FF | 0214 | 36FF | 021A | 36FF | 0218 |
| 0000045540 | 5E9A | 0040 | 8300 | 28C4 | 468B | E9CE | 0086 | 06E9 |
| 0000045560 | 8B00 | E646 | 7DE9 | 8E00 | 5E06 | 263A | 3E83 | 3938 |
| 0000045600 | 7500 | E903 | 0009 | 7E83 | FECC | 0374 | 0FE9 | 8E00 |
| 0000045620 | 6006 | 263A | 3E83 | 3964 | 7500 | E903 | 0050 | 46C7 |
| 0000045640 | 00CE | FF00 | D276 | 76FF | 8DD0 | CE46 | 5016 | 76FF |
| 0000045660 | FFE0 | FC76 | 76FF | 8DFA | D44E | 5116 | 4E8D | 16EC |
| 0000045700 | 8D51 | C84E | 5116 | 681E | 0308 | 4468 | FF02 | 1636 |
| 0000045720 | FF02 | 1436 | FF02 | 1A36 | FF02 | 1836 | 9A02 | 3A21 |
| 0000045740 | 0000 | C483 | 8B28 | CE46 | 09E9 | E900 | 0006 | 00B8 |
| 0000045760 | E900 | 0000 | 5E1F | 835F | 02ED | E58B | 5D1F | CA4D |
| 0000046000 | 000C | 581E | 4590 | 8B55 | 1EEC | D88E | EC81 | 002E |
| 0000046020 | 5657 | B81E | 3CD4 | D88E | 46C7 | 1AFA | 8C03 | FC5E |
| 0000046040 | 46C7 | 01EA | 2B01 | 89C0 | DC46 | 4689 | 8EDA | 5E06 |
| 0000046060 | 263A | 3E83 | 4148 | 7500 | E903 | 001D | 36FF | 021A |
| 0000046100 | 36FF | 0218 | 468D | 16D2 | 9A50 | 3D0A | 0000 | C483 |
| 0000046120 | 3D08 | 0000 | 0374 | 0FE9 | 8E00 | 6006 | 263A | 3E83 |
| 0000046140 | 4160 | 7500 | E903 | 003B | 681E | 0321 | 468D | 16DE |
| 0000046160 | 8D50 | D246 | 5016 | 468D | 16F6 | 6850 | 026C | 681E |
| 0000046200 | 0328 | 36FF | 0216 | 36FF | 0214 | 36FF | 021A | 36FF |
| 0000046220 | 0218 | 539A | 003D | 8300 | 1EC4 | 4689 | 89F6 | F856 |
| 0000046240 | 08E9 | 2B00 | 89C0 | F846 | 4689 | 8BF6 | 0C46 | 460B |
| 0000046260 | 750A | E903 | 000B | 468B | 0B08 | 0646 | 0374 | 7DE9 |
| 0000046300 | 8E00 | 5E06 | 263A | 3E83 | 4203 | 7500 | E903 | 0009 |
| 0000046320 | 7E83 | FED6 | 0374 | 0FE9 | 8E00 | 6006 | 263A | 3E83 |
| 0000046340 | 421B | 7500 | E903 | 0050 | 46C7 | 17D8 | FF00 | DC76 |
| 0000046360 | 76FF | 8DDA | D846 | 5016 | 76FF | FFEA | FC76 | 76FF |
| 0000046400 | 8DFA | DE4E | 5116 | 4E8D | 16F6 | 8D51 | D24E | 5116 |
| 0000046420 | 681E | 0328 | 7568 | FF02 | 1636 | FF02 | 1436 | FF02 |
| 0000046440 | 1A36 | FF02 | 1836 | 9A02 | 4264 | 0000 | C483 | 8B28 |
| 0000046460 | D846 | F2E9 | E901 | 0006 | 17B8 | E900 | 01E9 | 5EC4 |
| 0000046500 | 260A | 07C7 | 0000 | 5EC4 | 2B06 | 26C0 | 4789 | 2602 |
| 0000046520 | 0789 | 468D | 16EC | 8D50 | F246 | 5016 | 76FF | FF10 |
| 0000046540 | 0E76 | 76FF | FF14 | 1276 | 349A | 18D8 | 833E | 10C4 |

THU MAR 14 17:31:54 1991 DB_PI.DLL PAGE 22, LINE 1240

| | | | | | | | | |
|---|---|---|---|---|---|---|---|---|
| 0000046560 | 4689 | 83F0 | F07E | 7500 | E903 | 007E | 068E | 3A5E |
| 0000046600 | 8326 | B33E | 0042 | 0375 | 09E9 | 8300 | D67E | 74FE |
| 0000046620 | E903 | 000F | 068E | 3A60 | 8326 | CB3E | 0042 | 0375 |
| 0000046640 | 51E9 | 8B00 | F046 | 4689 | FFD8 | DC76 | 76FF | 8DDA |
| 0000046660 | D846 | 5016 | 76FF | FFEA | FC76 | 76FF | 8DFA | DE4E |
| 0000046700 | 5116 | 4E8D | 16F6 | 8D51 | D24E | 5116 | 681E | 0328 |
| 0000046720 | 7C68 | FF02 | 1636 | FF02 | 1436 | FF02 | 1A36 | FF02 |
| 0000046740 | 1836 | 9A02 | 4314 | 0000 | C483 | 8B2B | D846 | 36E9 |
| 0000046760 | E901 | 0006 | 468B | E9F0 | 012D | 76FF | FF08 | 0676 |
| 0000047000 | 76FF | FF0C | 0A76 | 76FF | FF10 | 0E76 | 76FF | FFEE |
| 0000047020 | EC76 | 76FF | FFF4 | F276 | 3E9A | 688D | 833F | 14C4 |
| 0000047040 | 4689 | 83F0 | F07E | 7500 | E903 | 007E | 068E | 3A5E |
| 0000047060 | 8326 | 313E | 0043 | 0375 | 09E9 | 8300 | D67E | 74FE |
| 0000047100 | E903 | 000F | 068E | 3A60 | 8326 | 493E | 0043 | 0375 |
| 0000047120 | 51E9 | 8B00 | F046 | 4689 | FFD8 | DC76 | 76FF | 8DDA |
| 0000047140 | D846 | 5016 | 76FF | FFEA | FC76 | 76FF | 8DFA | DE4E |
| 0000047160 | 5116 | 4E8D | 16F6 | 8D51 | D24E | 5116 | 681E | 0328 |
| 0000047200 | 8168 | FF02 | 1636 | FF02 | 1436 | FF02 | 1A36 | FF02 |
| 0000047220 | 1836 | 9A02 | 4391 | 0000 | C483 | 8B28 | D846 | 86E9 |
| 0000047240 | E900 | 0006 | 468B | E9FD | 007D | 068E | 3A5E | 8326 |
| 0000047260 | F43E | 003C | 0375 | 09E9 | 8300 | D67E | 74FE | E903 |
| 0000047300 | 000F | 068E | 3A60 | 8326 | 203E | 003D | 0375 | 50E9 |
| 0000047320 | C700 | D846 | 0000 | 76FF | FFDC | DA76 | 468D | 16D8 |
| 0000047340 | FF50 | EA76 | 76FF | FFFC | FA76 | 4E8D | 16DE | 8D51 |
| 0000047360 | F64E | 5116 | 4E8D | 16D2 | 1E51 | 2868 | 6803 | 0283 |
| 0000047400 | 36FF | 0216 | 36FF | 0214 | 36FF | 021A | 36FF | 0218 |
| 0000047420 | DD9A | 003D | 8300 | 28C4 | 468B | E9D8 | 0009 | 06E9 |
| 0000047440 | B800 | 0000 | 00E9 | 1F0D | 5F5E | ED83 | 8B02 | 1FE5 |
| 0000047460 | 4D5D | 10CA | 1E00 | 9058 | 5545 | EC8B | 8E1E | 81D8 |
| 0000047500 | 2EEC | 5700 | 1E56 | 94B8 | 8E40 | C7D8 | FA46 | 033E |
| 0000047520 | 5E8C | C7FC | EA46 | 0101 | C02B | 4689 | 89DC | DA46 |
| 0000047540 | 068E | 3A5E | 8326 | 7B3E | 0044 | 0375 | 1DE9 | FF00 |
| 0000047560 | 1A36 | FF02 | 1836 | 8D02 | D246 | 5016 | CA9A | 0040 |
| 0000047600 | 8300 | 08C4 | 003D | 7400 | E903 | 000F | 068E | 3A60 |
| 0000047620 | 8326 | 933E | 0044 | 0375 | 3BE9 | 1E00 | 4568 | 8D03 |
| 0000047640 | DE46 | 5016 | 468D | 16D2 | 8D50 | F646 | 5016 | AC68 |
| 0000047660 | 1E02 | 4C68 | FF03 | 1636 | FF02 | 1436 | FF02 | 1A36 |
| 0000047700 | FF02 | 1836 | 9A02 | 4113 | 0000 | C483 | 891E | F646 |
| 0000047720 | 5689 | E9F8 | 0008 | C02B | 4689 | 89F8 | F646 | 468B |
| 0000047740 | 0B0C | 0A46 | 0375 | 0BE9 | 8B00 | 0846 | 460B | 7406 |
| 0000047760 | E903 | 007D | 068E | 3A5E | 8326 | 353E | 0045 | 0375 |
| 0000050000 | 09E9 | 8300 | D67E | 74FE | E903 | 000F | 068E | 3A60 |
| 0000050020 | 8326 | 4D3E | 0045 | 0375 | 50E9 | C700 | D846 | 0017 |
| 0000050040 | 76FF | FFDC | DA76 | 468D | 16D8 | FF50 | EA76 | 76FF |
| 0000050060 | FFFC | FA76 | 4E8D | 16DE | 8D51 | F64E | 5116 | 4E8D |
| 0000050100 | 16D2 | 1E51 | 4C68 | 6803 | 02B5 | 36FF | 0216 | 36FF |
| 0000050120 | 0214 | 36FF | 021A | 36FF | 0218 | 969A | 0045 | 8300 |
| 0000050140 | 28C4 | 468B | E9D8 | 01F1 | 06E9 | B800 | 0017 | E8E9 |
| 0000050160 | C401 | 0A5E | C02B | 8926 | 0247 | 8926 | C407 | 065E |
| 0000050200 | C626 | 0007 | 468D | 16EC | 8D50 | F246 | 5016 | 76FF |
| 0000050220 | FF10 | 0E76 | 76FF | FF14 | 1276 | 349A | EBD8 | 8341 |
| 0000050240 | 10C4 | 4689 | 83F0 | F07E | 7500 | E903 | 007E | 068E |
| 0000050260 | 3A5E | 8326 | E53E | 0045 | 0375 | 09E9 | 8300 | D67E |
| 0000050300 | 74FE | E903 | 000F | 068E | 3A60 | 8326 | FD3E | 0045 |
| 0000050320 | 0375 | 51E9 | 8B00 | F046 | 4689 | FFD8 | DC76 | 76FF |
| 0000050340 | 8DDA | D846 | 5016 | 76FF | FFEA | FC76 | 76FF | 8DFA |
| 0000050360 | DE4E | 5116 | 4E8D | 16F6 | 8D51 | D24E | 5116 | 681E |
| 0000050400 | 034C | BC68 | FF02 | 1636 | FF02 | 1436 | FF02 | 1A36 |
| 0000050420 | FF02 | 1836 | 9A02 | 4646 | 0000 | C483 | 8B28 | D846 |

THU MAR 14 17:31:54 1991 DB_PI.DLL PAGE 23, LINE 1299

| | | | | | | | | |
|---|---|---|---|---|---|---|---|---|
| 0000050440 | 36E9 | E901 | 0006 | 468B | E9F0 | 012D | 76FF | FF08 |
| 0000050460 | 0676 | 76FF | FF0C | 0A76 | 76FF | FF10 | 0E76 | 76FF |
| 0000050500 | FFEE | EC76 | 76FF | FFF4 | F276 | 789A | 9B90 | 8342 |
| 0000050520 | 14C4 | 4689 | 83F0 | F07E | 7500 | E903 | 007E | 068E |
| 0000050540 | 3A5E | 8326 | 633E | 0046 | 0375 | 09E9 | 8300 | D67E |
| 0000050560 | 74FE | E903 | 000F | 068E | 3A60 | 8326 | 7B3E | 0046 |
| 0000050600 | 0375 | 51E9 | 8B00 | F046 | 4689 | FFD8 | DC76 | 76FF |
| 0000050620 | 8DDA | D846 | 5016 | 76FF | FFEA | FC76 | 76FF | 8DFA |
| 0000050640 | DE4E | 5116 | 4E8D | 16F6 | 8D51 | D24E | 5116 | 681E |
| 0000050660 | 034C | C168 | FF02 | 1636 | FF02 | 1436 | FF02 | 1A36 |
| 0000050700 | FF02 | 1836 | 9A02 | 46C3 | 0000 | C483 | 8B28 | D846 |
| 0000050720 | 86E9 | E900 | 0006 | 468B | E9F0 | 007D | 068E | 3A5E |
| 0000050740 | 8326 | B43E | 0040 | 0375 | 09E9 | 8300 | D67E | 74FE |
| 0000050760 | E903 | 000F | 068E | 3A60 | 8326 | E03E | 0040 | 0375 |
| 0000051000 | 50E9 | C700 | D846 | 0000 | 76FF | FFDC | DA76 | 468D |
| 0000051020 | 16D8 | FF50 | EA76 | 76FF | FFFC | FA76 | 4E8D | 16DE |
| 0000051040 | 8D51 | F64E | 5116 | 4E8D | 16D2 | 1E51 | 4C68 | 6803 |
| 0000051060 | 02C3 | 36FF | 0216 | 36FF | 0214 | 36FF | 021A | 36FF |
| 0000051100 | 0218 | A89A | 0041 | 8300 | 28C4 | 468B | E9D8 | 0009 |
| 0000051120 | 06E9 | B800 | 0000 | 00E9 | 1F00 | 5F5E | ED83 | 8B02 |
| 0000051140 | 1FE5 | 4D5D | 10CA | 1E00 | 9058 | 5545 | EC8B | 8E1E |
| 0000051160 | 81D8 | 36EC | 5700 | 1E56 | C7B8 | 8E43 | C7D8 | FA46 |
| 0000051200 | 035D | 5E8C | C7FC | EE46 | 0101 | C02B | 4689 | 89E0 |
| 0000051220 | DE46 | 068E | 3A5E | 8326 | CE3E | 0047 | 0375 | 1DE9 |
| 0000051240 | FF00 | 1A36 | FF02 | 1836 | 8D02 | D246 | 5016 | FD9A |
| 0000051260 | 0043 | 8300 | 08C4 | 003D | 7400 | E903 | 000F | 068E |
| 0000051300 | 3A60 | 8326 | E63E | 0047 | 0375 | 3BE9 | 1E00 | 6468 |
| 0000051320 | 8D03 | E246 | 5016 | 468D | 16D2 | 8D50 | F246 | 5016 |
| 0000051340 | 0468 | 1E03 | 6C68 | FF03 | 1636 | FF02 | 1436 | FF02 |
| 0000051360 | 1A36 | FF02 | 1836 | 9A02 | 4446 | 0000 | C483 | 891E |
| 0000051400 | F246 | 5689 | E9F4 | 0008 | C02B | 4689 | 89F4 | F246 |
| 0000051420 | 468B | 0B08 | 0646 | 0375 | 2CE9 | 8B00 | 1646 | 460B |
| 0000051440 | 7414 | E903 | 000B | 468B | 0B1A | 1846 | 0375 | 16E9 |
| 0000051460 | 8B00 | 0E46 | 460B | 740C | E903 | 0088 | 468B | 0B12 |
| 0000051500 | 1046 | 0374 | 7DE9 | 8E00 | 5E06 | 263A | 3E83 | 4881 |
| 0000051520 | 7500 | E903 | 0009 | 7E83 | FED6 | 0374 | 0FE9 | 8E00 |
| 0000051540 | 6006 | 263A | 3E83 | 4899 | 7500 | E903 | 0050 | 46C7 |
| 0000051560 | 17D8 | FF00 | E076 | 76FF | 8DDE | D846 | 5016 | 76FF |
| 0000051600 | FFEE | FC76 | 76FF | 8DFA | E24E | 5116 | 4E8D | 16F2 |
| 0000051620 | 8D51 | D24E | 5116 | 681E | 036C | 1068 | FF03 | 1636 |
| 0000051640 | FF02 | 1436 | FF02 | 1A36 | FF02 | 1836 | 9A02 | 48E2 |
| 0000051660 | 0000 | C483 | 8B28 | D846 | A3E9 | E902 | 0006 | 17B8 |
| 0000051700 | E900 | 029A | 5EC4 | 2B06 | 26C0 | 4789 | 2602 | 0789 |
| 0000051720 | 468D | 16CE | 8D50 | DA46 | 5016 | 76FF | FF16 | 1476 |
| 0000051740 | 76FF | FF1A | 1876 | 349A | 11D8 | 8349 | 10C4 | 4689 |
| 0000051760 | 83F0 | F07E | 7500 | E903 | 007E | 068E | 3A5E | 8326 |
| 0000052000 | 293E | 0049 | 0375 | 09E9 | 8300 | D67E | 74FE | E903 |
| 0000052020 | 000F | 068E | 3A60 | 8326 | 413E | 0049 | 0375 | 51E9 |
| 0000052040 | 8B00 | F046 | 4689 | FFD8 | E076 | 76FF | 8DDE | D846 |
| 0000052060 | 5016 | 76FF | FFEE | FC76 | 76FF | 8DFA | E24E | 5116 |
| 0000052100 | 4E8D | 16F2 | 8D51 | D24E | 5116 | 681E | 036C | 1A68 |
| 0000052120 | FF03 | 1636 | FF02 | 1436 | FF02 | 1A36 | FF02 | 1836 |
| 0000052140 | 9A02 | 498A | 0000 | C483 | 8B28 | D846 | EFE9 | E901 |
| 0000052160 | 0006 | 468B | E9F0 | 01E6 | 468D | 16F6 | 8D50 | CA46 |
| 0000052200 | 5016 | 76FF | FF0E | 0C76 | 76FF | FF12 | 1076 | 349A |
| 0000052220 | 1DD8 | 8345 | 10C4 | 4689 | 83F0 | F07E | 7500 | E903 |
| 0000052240 | 007E | 068E | 3A5E | 8326 | EA3E | 0049 | 0375 | 09E9 |
| 0000052260 | 8300 | D67E | 74FE | E903 | 000F | 068E | 3A60 | 8326 |
| 0000052300 | 023E | 004A | 0375 | 51E9 | 8B00 | F046 | 4689 | FFD8 |

THU MAR 14 17:31:54 1991 DB_PI.DLL PAGE 24, LINE 1358

| | | | | | | | | |
|---|---|---|---|---|---|---|---|---|
| 0000052320 | E076 | 76FF | 8DDE | D846 | 5016 | 76FF | FFEE | FC76 |
| 0000052340 | 76FF | 8DFA | E24E | 5116 | 4E8D | 16F2 | 8D51 | D24E |
| 0000052360 | 5116 | 681E | 036C | 1F68 | FF03 | 1636 | FF02 | 1436 |
| 0000052400 | FF02 | 1A36 | FF02 | 1836 | 9A02 | 4A4B | 0000 | C483 |
| 0000052420 | 8B28 | D846 | 47E9 | E901 | 0006 | 468B | E9F0 | 013E |
| 0000052440 | 76FF | FF08 | 0676 | 016A | 76FF | FF0A | 0E76 | 76FF |
| 0000052460 | FF0C | F876 | 76FF | FFF6 | CC76 | 76FF | FFCA | 1676 |
| 0000052500 | 76FF | FF14 | D076 | 76FF | FFCE | DC76 | 76FF | 9ADA |
| 0000052520 | 95C0 | 45CD | C483 | 8920 | F046 | 7E83 | 00F0 | 0375 |
| 0000052540 | 7EE9 | 8E00 | 5E06 | 263A | 3E83 | 4A68 | 7500 | E903 |
| 0000052560 | 0009 | 7E83 | FED6 | 0374 | 0FE9 | 8E00 | 6006 | 263A |
| 0000052600 | 3E83 | 4A80 | 7500 | E903 | 0051 | 468B | 89F0 | D846 |
| 0000052620 | 76FF | FFE0 | DE76 | 468D | 16D8 | FF50 | EE76 | 76FF |
| 0000052640 | FFFC | FA76 | 4E8D | 16E2 | 8D51 | F24E | 5116 | 4E8D |
| 0000052660 | 16D2 | 1E51 | 6C68 | 6803 | 0326 | 36FF | 0216 | 36FF |
| 0000052700 | 0214 | 36FF | 021A | 36FF | 0218 | DB9A | 0044 | 8300 |
| 0000052720 | 28C4 | 468B | E9D8 | 0086 | 06E9 | 8B00 | F046 | 7DE9 |
| 0000052740 | 8E00 | 5E06 | 263A | 3E83 | 43E7 | 7500 | E903 | 0009 |
| 0000052760 | 7E83 | FED6 | 0374 | 0FE9 | 8E00 | 6006 | 263A | 3E83 |
| 0000053000 | 4413 | 7500 | E903 | 0050 | 46C7 | 00D8 | FF00 | E076 |
| 0000053020 | 76FF | 8DDE | D846 | 5016 | 76FF | FFEE | FC76 | 76FF |
| 0000053040 | 8DFA | E24E | 5116 | 4E8D | 16F2 | 8D51 | D24E | 5116 |
| 0000053060 | 681E | 036C | 2968 | FF03 | 1636 | FF02 | 1436 | FF02 |
| 0000053100 | 1A36 | FF02 | 1836 | 9A02 | 482E | 0000 | C483 | 8B28 |
| 0000053120 | D846 | 09E9 | E900 | 0006 | 00B8 | E900 | 0000 | 5E1F |
| 0000053140 | 835F | 02ED | E58B | 5D1F | CA4D | 0016 | 581E | 4590 |
| 0000053160 | 8B55 | 1EEC | D88E | EC81 | 0036 | 5657 | B81E | 46F9 |
| 0000053200 | D88E | 46C7 | 7BFA | 8C03 | FC5E | 46C7 | 01EE | 2B01 |
| 0000053220 | 89C0 | E046 | 4689 | 8EDE | 5E06 | 263A | 3E83 | 4BD3 |
| 0000053240 | 7500 | E903 | 001D | 36FF | 021A | 36FF | 0218 | 468D |
| 0000053260 | 16D2 | 9A50 | 472F | 0000 | C483 | 3D08 | 0000 | 0374 |
| 0000053300 | 0FE9 | 8E00 | 6006 | 263A | 3E83 | 4BEB | 7500 | E903 |
| 0000053320 | 003B | 681E | 0382 | 468D | 16E2 | 8D50 | D246 | 5016 |
| 0000053340 | 468D | 16F2 | 6850 | 036B | 681E | 038A | 36FF | 0216 |
| 0000053360 | 36FF | 0214 | 36FF | 021A | 36FF | 0218 | 789A | 0047 |
| 0000053400 | 8300 | 1EC4 | 4689 | 89F2 | F456 | 08E9 | 2B00 | 89Cu |
| 0000053420 | F446 | 4689 | 8BF2 | 0846 | 460B | 7506 | E903 | 002C |
| 0000053440 | 468B | 0B16 | 1446 | 0374 | 0BE9 | 8B00 | 1A46 | 460B |
| 0000053460 | 7518 | E903 | 0016 | 468B | 0B0E | 0C46 | 0374 | 88E9 |
| 0000053500 | 8B00 | 1246 | 460B | 7410 | E903 | 007D | 068E | 3A5E |
| 0000053520 | 8326 | 863E | 004C | 0375 | 09E9 | 8300 | D67E | 74FE |
| 0000053540 | E903 | 000F | 068E | 3A60 | 8326 | 9E3E | 004C | 0375 |
| 0000053560 | 50E9 | C700 | D846 | 0017 | 76FF | FFE0 | DE76 | 468D |
| 0000053600 | 16D8 | FF50 | EE76 | 76FF | FFFC | FA76 | 4E8D | 16E2 |
| 0000053620 | 8D51 | F24E | 5116 | 4E8D | 16D2 | 1E51 | 8A68 | 6803 |
| 0000053640 | 0378 | 36FF | 0216 | 36FF | 0214 | 36FF | 021A | 36FF |
| 0000053660 | 0218 | E79A | 004C | 8300 | 28C4 | 468B | E9D8 | 02B3 |
| 0000053700 | 06E9 | B800 | 0017 | AAE9 | C402 | 065E | C02B | 8926 |
| 0000053720 | 0247 | 8926 | 0007 | CE46 | 5016 | 468D | 16DA | FF50 |
| 0000053740 | 1676 | 76FF | FF14 | 1A76 | 76FF | 9A1B | D834 | 4D16 |
| 0000053760 | C483 | 8910 | F046 | 7E83 | 00F0 | 0375 | 7EE9 | 8E00 |
| 0000054000 | 5E06 | 263A | 3E83 | 4D2E | 7500 | E903 | 0009 | 7E83 |
| 0000054020 | FED6 | 0374 | 0FE9 | 8E00 | 6006 | 263A | 3E83 | 4D46 |
| 0000054040 | 7500 | E903 | 0051 | 468B | 89F0 | D846 | 76FF | FFE0 |
| 0000054060 | DE76 | 468D | 16D8 | FF50 | EE76 | 76FF | FFFC | FA76 |
| 0000054100 | 4E8D | 16E2 | 8D51 | F24E | 5116 | 4E8D | 16D2 | 1E51 |
| 0000054120 | 8A68 | 6803 | 0382 | 36FF | 0216 | 36FF | 0214 | 36FF |
| 0000054140 | 021A | 36FF | 0218 | 8F9A | 004D | 8300 | 28C4 | 468B |
| 0000054160 | E9D8 | 01FF | 06E9 | 8B00 | F046 | F6E9 | 8D01 | F646 |

THU MAR 14 17:31:54 1991 DB_PI.DLL PAGE 25, LINE 1417

| | | | | | | | | |
|---|---|---|---|---|---|---|---|---|
| 0000054200 | 5016 | 468D | 16CA | FF50 | 0E76 | 76FF | FF0C | 1276 |
| 0000054220 | 76FF | 9A10 | D834 | 4869 | C483 | 8910 | F046 | 7E83 |
| 0000054240 | 00F0 | 0375 | 7EE9 | 8E00 | 5E06 | 263A | 3E83 | 4DFF |
| 0000054260 | 7500 | E903 | 0009 | 7E83 | FED6 | 0374 | 0FE9 | 8E00 |
| 0000054300 | 6006 | 263A | 3E83 | 4E17 | 7500 | E903 | 0051 | 468B |
| 0000054320 | 89F0 | D846 | 76FF | FFE0 | DE76 | 468D | 16D8 | FF50 |
| 0000054340 | EE76 | 76FF | FFFC | FA76 | 4E8D | 16E2 | 8D51 | F24E |
| 0000054360 | 5116 | 4E8D | 16D2 | 1E51 | 8A68 | 6803 | 0387 | 36FF |
| 0000054400 | 0216 | 36FF | 0214 | 36FF | 021A | 36FF | 0218 | 609A |
| 0000054420 | 004E | 8300 | 28C4 | 468B | E9D8 | 0157 | 06E9 | 8B00 |
| 0000054440 | F046 | 4EE9 | 8B01 | 0C46 | 568B | C40E | 065E | 8926 |
| 0000054460 | 2607 | 5789 | FF02 | 0876 | 76FF | 6A06 | FF00 | 0A76 |
| 0000054500 | 76FF | FF0E | 0C76 | 76FF | FFF8 | F676 | 76FF | FFCC |
| 0000054520 | CA76 | 76FF | FF16 | 1476 | 76FF | FFD0 | CE76 | 76FF |
| 0000054540 | FFDC | DA76 | C09A | D295 | 8349 | 20C4 | 4689 | 83F0 |
| 0000054560 | F07E | 7500 | E903 | 007E | 068E | 3A5E | 8326 | 7D3E |
| 0000054600 | 004E | 0375 | 09E9 | 8300 | D67E | 74FE | E903 | 000F |
| 0000054620 | 068E | 3A60 | 8326 | 953E | 004E | 0375 | 51E9 | 8B00 |
| 0000054640 | F046 | 4689 | FFD8 | E076 | 76FF | 8DDE | D846 | 5016 |
| 0000054660 | 76FF | FFEE | FC76 | 76FF | 8DFA | E24E | 5116 | 4E8D |
| 0000054700 | 16F2 | 8D51 | D24E | 5116 | 681E | 038A | 9068 | FF03 |
| 0000054720 | 1636 | FF02 | 1436 | FF02 | 1A36 | FF02 | 1836 | 9A02 |
| 0000054740 | 4AC8 | 0000 | C483 | 8B28 | D846 | 86E9 | E900 | 0006 |
| 0000054760 | 468B | E9F0 | 007D | 068E | 3A5E | 8326 | 193E | 0047 |
| 0000055000 | 0375 | 09E9 | 8300 | D67E | 74FE | E903 | 000F | 068E |
| 0000055020 | 3A60 | 8326 | 453E | 0047 | 0375 | 50E9 | C700 | D846 |
| 0000055040 | 0000 | 76FF | FFE0 | DE76 | 468D | 16D8 | FF50 | EE76 |
| 0000055060 | 76FF | FFFC | FA76 | 4E8D | 16E2 | 8D51 | F24E | 5116 |
| 0000055100 | 4E8D | 16D2 | 1E51 | 8A68 | 6803 | 0393 | 36FF | 0216 |
| 0000055120 | 36FF | 0214 | 36FF | 021A | 36FF | 0218 | 339A | 004C |
| 0000055140 | 8300 | 28C4 | 468B | E9D8 | 0009 | 06E9 | B800 | 0000 |
| 0000055160 | 00E9 | 1F00 | 5F5E | ED83 | 8B02 | 1FE5 | 4D5D | 16CA |
| 0000055200 | 1E00 | 9058 | 5545 | EC8B | 8E1E | 81D8 | 2AEC | 5700 |
| 0000055220 | 1E56 | FEB8 | 8E4A | C7D8 | F446 | 0000 | 46C7 | 99FA |
| 0000055240 | 8C03 | FC5E | 46C7 | 01F2 | 2B01 | 89C0 | E446 | 4689 |
| 0000055260 | 8EE2 | 5E06 | 263A | 3E83 | 4FF7 | 7500 | E903 | 001D |
| 0000055300 | 36FF | 021A | 36FF | 0218 | 468D | 16D6 | 9A50 | 4B34 |
| 0000055320 | 0000 | C483 | 3D08 | 0000 | 0374 | 0FE9 | 8E00 | 6006 |
| 0000055340 | 263A | 3E83 | 500F | 7500 | E903 | 003B | 681E | 03A0 |
| 6000055360 | 468D | 16E6 | 8D50 | D646 | 5016 | 468D | 16F6 | 6850 |
| 0000055400 | 03BE | 681E | 03A8 | 36FF | 0216 | 36FF | 0214 | 36FF |
| 0000055420 | 021A | 36FF | 0218 | 7D9A | 004B | 8300 | 1EC4 | 4689 |
| 0000055440 | 89F6 | F856 | 08E9 | 2B00 | 89C0 | F846 | 4689 | FFF6 |
| 0000055460 | 1276 | 76FF | FF10 | 0E76 | 76FF | 8D0C | DE46 | 5016 |
| 0000055500 | 0B9A | DA31 | 894F | F446 | 7E83 | 00F4 | 0375 | 9DE9 |
| 0000055520 | FF00 | E076 | 76FF | 9ADE | 0975 | 5096 | C02B | 4689 |
| 0000055540 | 89E0 | DE46 | 5EC4 | 2B06 | 26C0 | 4789 | 2602 | 0789 |
| 0000055560 | 068E | 3A5E | 8326 | A73E | 0050 | 0375 | 09E9 | 8300 |
| 0000055600 | DA7E | 74FE | E903 | 000F | 068E | 3A60 | 8326 | BF3E |
| 0000055620 | 0050 | 0375 | 51E9 | 8B00 | F446 | 4689 | FFDC | E476 |
| 0000055640 | 76FF | 8DE2 | DC46 | 5016 | 76FF | FFF2 | FC76 | 76FF |
| 0000055660 | 8DFA | E64E | 5116 | 4E8D | 16F6 | 8D51 | D64E | 5116 |
| 0000055700 | 681E | 03A8 | C468 | FF03 | 1636 | FF02 | 1436 | FF02 |
| 0000055720 | 1A36 | FF02 | 1836 | 9A02 | 5108 | 0000 | C483 | 8B28 |
| 0000055740 | DC46 | B9E9 | E900 | 0006 | 468B | E9F4 | 00B0 | 76FF |
| 0000055760 | FF08 | 0676 | 76FF | C40A | DE5E | FF26 | 4A77 | FF26 |
| 0000056000 | 4877 | EA9A | 1730 | 8322 | 0AC4 | 4689 | FFF4 | E076 |
| 0000056020 | 76FF | 9ADE | 0975 | 232D | C02B | 4689 | 89E0 | DE46 |
| 0000056040 | 068E | 3A5E | 8326 | 1E3E | 004B | 0375 | 09E9 | 8300 |

THU MAR 14 17:31:54 1991 DB_PI.DLL PAGE 26, LINE 1476

| | | | | | | | | |
|---|---|---|---|---|---|---|---|---|
| 0000056060 | DA7E | 74FE | E903 | 000F | 068E | 3A60 | 8326 | 4A3E |
| 0000056100 | 004B | 0375 | 51E9 | 8B00 | F446 | 4689 | FFDC | E476 |
| 0000056120 | 76FF | 8DE2 | DC46 | 5016 | 76FF | FFF2 | FC76 | 76FF |
| 0000056140 | 8DFA | E64E | 5116 | 4E8D | 16F6 | 8D51 | D64E | 5116 |
| 0000056160 | 681E | 03A8 | CA68 | FF03 | 1636 | FF02 | 1436 | FF02 |
| 0000056200 | 1A36 | FF02 | 1836 | 9A02 | 4EDD | 0000 | C483 | 8B28 |
| 0000056220 | DC46 | 09E9 | E900 | 0006 | 468B | E9F4 | 0000 | 5E1F |
| 0000056240 | 835F | 02ED | E58B | 5D1F | CA4D | 000E | 581E | 4590 |
| 0000056260 | 8B55 | 1EEC | D88E | EC81 | 0038 | 5657 | B81E | 4F13 |
| 0000056300 | D88E | 46C7 | CCF6 | 8C03 | F85E | 46C7 | 01E6 | 2B01 |
| 0000056320 | 89C0 | D846 | 4689 | 8ED6 | 6206 | 263A | 3E83 | 4F38 |
| 0000056340 | 7500 | E903 | 001D | 36FF | 042E | 36FF | 042C | 468D |
| 0000056360 | 16CE | 9A50 | 4F4E | 0000 | C483 | 3D08 | 0000 | 0374 |
| 0000056400 | 0FE9 | 8E00 | 6406 | 263A | 3E83 | 51FF | 7500 | E903 |
| 0000056420 | 003B | 681E | 03D3 | 468D | 16DA | 8D50 | CE46 | 5016 |
| 0000056440 | 468D | 16F2 | 6850 | 0089 | 681E | 0430 | 36FF | 042A |
| 0000056460 | 36FF | 0428 | 36FF | 042E | 36FF | 042C | 979A | 004F |
| 0000056500 | 8300 | 1EC4 | 4689 | 89F2 | F456 | 08E9 | 2B00 | 89C0 |
| 0000056520 | F446 | 4689 | 8BF2 | 1046 | 460B | 740E | E903 | 007D |
| 0000056540 | 068E | 3A62 | 8326 | 7E3E | 0052 | 0375 | 09E9 | 8300 |
| 0000056560 | D27E | 74FE | E903 | 000F | 068E | 3A64 | 8326 | 963E |
| 0000056600 | 0052 | 0375 | 50E9 | C700 | D446 | 0017 | 76FF | FFD8 |
| 0000056620 | D676 | 468D | 16D4 | FF50 | E676 | 76FF | FFF8 | F676 |
| 0000056640 | 4E8D | 16DA | 8D51 | F24E | 5116 | 4E8D | 16CE | 1E51 |
| 0000056660 | 3068 | 6804 | 0095 | 36FF | 042A | 36FF | 0428 | 36FF |
| 0000056700 | 042E | 36FF | 042C | DE9A | 0052 | 8300 | 28C4 | 468B |
| 0000056720 | E9D4 | 0995 | 06E9 | B800 | 0017 | 8CE9 | C409 | 0E5E |
| 0000056740 | 8B26 | 0247 | 0B26 | 7407 | E903 | 0123 | 468B | 0B14 |
| 0000056760 | 1246 | 0374 | 7DE9 | 8E00 | 6206 | 263A | 3E83 | 5318 |
| 0000057000 | 7500 | E903 | 0009 | 7E83 | FED2 | 0374 | 0FE9 | 8E00 |
| 0000057020 | 6406 | 263A | 3E83 | 5330 | 7500 | E903 | 0050 | 46C7 |
| 0000057040 | 17D4 | FF00 | D876 | 76FF | 8DD6 | D446 | 5016 | 76FF |
| 0000057060 | FFE6 | F876 | 76FF | 8DF6 | DA4E | 5116 | 4E8D | 16F2 |
| 0000057100 | 8D51 | CE4E | 5116 | 681E | 0430 | 9A68 | FF00 | 2A36 |
| 0000057120 | FF04 | 2836 | FF04 | 2E36 | FF04 | 2C36 | 9A04 | 5379 |
| 0000057140 | 0000 | C483 | 8B28 | D446 | FEE9 | E908 | 0006 | 17B8 |
| 0000057160 | E900 | 08F5 | 76FF | FF14 | 1276 | 76FF | FF10 | 0E76 |
| 0000057200 | 609A | C335 | 894F | EC46 | 7E83 | 00EC | 0375 | 7EE9 |
| 0000057220 | 8E00 | 6206 | 263A | 3E83 | 53C2 | 7500 | E903 | 0009 |
| 0000057240 | 7E83 | FED2 | 0374 | 0FE9 | 8E00 | 6406 | 263A | 3E83 |
| 0000057260 | 53DA | 7500 | E903 | 0051 | 468B | 89EC | D446 | 76FF |
| 0000057300 | FFD8 | D676 | 468D | 16D4 | FF50 | E676 | 76FF | FFF8 |
| 0000057320 | F676 | 4E8D | 16DA | 8D51 | F24E | 5116 | 4E8D | 16CE |
| 0000057340 | 1E51 | 3068 | 6804 | 009C | 36FF | 042A | 36FF | 0428 |
| 0000057360 | 36FF | 042E | 36FF | 042C | 239A | 0054 | 8300 | 28C4 |
| 0000057400 | 468B | E9D4 | 0863 | 06E9 | 8B00 | EC46 | 5AE9 | 8D08 |
| 0000057420 | E846 | 5016 | 468D | 16EE | C450 | 0E5E | FF26 | 0277 |
| 0000057440 | FF26 | 6A37 | 6A00 | 9A00 | D834 | 5484 | C483 | 8910 |
| 0000057460 | EC46 | 7E83 | 00EC | 0375 | 7EE9 | 8E00 | 6206 | 263A |
| 0000057500 | 3E83 | 54E4 | 7500 | E903 | 0009 | 7E83 | FED2 | 0374 |
| 0000057520 | 0FE9 | 8E00 | 6406 | 263A | 3E83 | 54FC | 7500 | E903 |
| 0000057540 | 0051 | 468B | 89EC | D446 | 76FF | FFD8 | D676 | 468D |
| 0000057560 | 16D4 | FF50 | E676 | 76FF | FFF8 | F676 | 4E8D | 16DA |
| 0000057600 | 8D51 | F24E | 5116 | 4E8D | 16CE | 1E51 | 3068 | 6804 |
| 0000057620 | 00A1 | 36FF | 042A | 36FF | 0428 | 36FF | 042E | 36FF |
| 0000057640 | 042C | 589A | 0050 | 8300 | 28C4 | 468B | E9D4 | 07B9 |
| 0000057660 | 06E9 | 8B00 | EC46 | B0E9 | C407 | 0E5E | 8A26 | 0347 |
| 0000057700 | E42A | 293D | 7400 | E903 | 0026 | 76FF | FF10 | 0E76 |
| 0000057720 | 681E | 03DA | 5EC4 | 260E | 77FF | 2602 | 37FF | 006A |

THU MAR 14 17:31:54 1991 DB_PI.DLL PAGE 27, LINE 1535

| | | | | | | | | |
|---|---|---|---|---|---|---|---|---|
| 0000057740 | 006A | 76FF | FFF0 | EE76 | C49A | CC8A | 8354 | 14C4 |
| 0000057760 | 468D | 16FA | 6A50 | C400 | 0E5E | FF26 | 0277 | FF26 |
| 0000060000 | 9A37 | CF64 | 4C6E | C483 | 890A | EC46 | 7E83 | 00EC |
| 0000060020 | 0374 | ECE9 | C401 | FA5E | 468B | 2608 | 4739 | 7C24 |
| 0000060040 | E903 | 0159 | 5EC4 | 26FA | 77FF | 8B30 | FA46 | 568B |
| 0000060060 | 05FC | 0034 | 5052 | 76FF | C408 | 0E5E | FF26 | 0277 |
| 0000060100 | FF26 | FF37 | F076 | 76FF | 9AEE | A6EE | 4DE7 | C483 |
| 0000060120 | 8910 | EC46 | 7E83 | 00EC | 0375 | 7EE9 | 8E00 | 6206 |
| 0000060140 | 263A | 3E83 | 515E | 7500 | E903 | 0009 | 7E83 | FED2 |
| 0000060160 | 0374 | 0FE9 | 8E00 | 6406 | 263A | 3E83 | 4F64 | 7500 |
| 0000060200 | E903 | 0051 | 468B | 89EC | D446 | 76FF | FFD8 | D676 |
| 0000060220 | 468D | 16D4 | FF50 | E676 | 76FF | FFF8 | F676 | 4E8D |
| 0000060240 | 16DA | 8D51 | F24E | 5116 | 4E8D | 16CE | 1E51 | 3068 |
| 0000060260 | 6804 | 00B3 | 36FF | 042A | 36FF | 0428 | 36FF | 042E |
| 0000060300 | 36FF | 042C | E79A | 0055 | 8300 | 28C4 | 468B | E9D4 |
| 0000060320 | 0697 | 06E9 | 8B00 | EC46 | 8EE9 | 8B06 | 0846 | 5EC4 |
| 0000060340 | 26FA | 4789 | FF24 | FC76 | 76FF | 9AFA | 6921 | 5303 |
| 0000060360 | C483 | 8904 | EC46 | 7E83 | 00EC | 0375 | 7EE9 | 8E00 |
| 0000060400 | 6206 | 263A | 3E83 | 560B | 7500 | E903 | 0009 | 7E83 |
| 0000060420 | FED2 | 0374 | 0FE9 | 8E00 | 6406 | 263A | 3E83 | 5623 |
| 0000060440 | 7500 | E903 | 0051 | 468B | 89EC | D446 | 76FF | FFD8 |
| 0000060460 | D676 | 468D | 16D4 | FF50 | E676 | 76FF | FFF8 | F676 |
| 0000060500 | 4E8D | 16DA | 8D51 | F24E | 5116 | 4E8D | 16CE | 1E51 |
| 0000060520 | 3068 | 6804 | 00BC | 36FF | 042A | 36FF | 0428 | 36FF |
| 0000060540 | 042E | 36FF | 042C | 6B9A | 0056 | 8300 | 28C4 | 468B |
| 0000060560 | E9D4 | 05F5 | 06E9 | 8B00 | EC46 | ECE9 | C405 | FA5E |
| 0000060600 | FF26 | 2C47 | 068E | 3A62 | 8326 | AB3E | 0056 | 0375 |
| 0000060620 | 09E9 | 8300 | D27E | 74FE | E903 | 000F | 068E | 3A64 |
| 0000060640 | 8326 | C33E | 0056 | 0375 | 50E9 | C700 | D446 | 0000 |
| 0000060660 | 76FF | FFD8 | D676 | 468D | 16D4 | FF50 | E676 | 76FF |
| 0000060700 | FFF8 | F676 | 4E8D | 16DA | 8D51 | F24E | 5116 | 4E8D |
| 0000060720 | 16CE | 1E51 | 3068 | 6804 | 00C4 | 36FF | 042A | 36FF |
| 0000060740 | 0428 | 36FF | 042E | 36FF | 042C | 0C9A | 0057 | 8300 |
| 0000060760 | 28C4 | 468B | E9D4 | 0571 | 06E9 | B800 | 0000 | 68E9 |
| 0000061000 | 8D05 | FA46 | 5016 | 5EC4 | 260E | 77FF | 2602 | 37FF |
| 0000061020 | 4D9A | 80D0 | 8357 | 08C4 | 4689 | 83EC | EC7E | 7500 |
| 0000061040 | E903 | 007E | 068E | 3A62 | 8326 | 8C3E | 0057 | 0375 |
| 0000061060 | 09E9 | 8300 | D27E | 74FE | E903 | 000F | 068E | 3A64 |
| 0000061100 | 8326 | A43E | 0057 | 0375 | 51E9 | 8B00 | EC46 | 4689 |
| 0000061120 | FFD4 | D876 | 76FF | 8DD6 | D446 | 5016 | 76FF | FFE6 |
| 0000061140 | F876 | 76FF | 8DF6 | DA4E | 5116 | 4E8D | 16F2 | 8D51 |
| 0000061160 | CE4E | 5116 | 681E | 0430 | CD68 | FF00 | 2A36 | FF04 |
| 0000061200 | 2836 | FF04 | 2E36 | FF04 | 2C36 | 9A04 | 57ED | 0000 |
| 0000061220 | C483 | 8B28 | D446 | D0E9 | E904 | 0006 | 468B | E9EC |
| 0000061240 | 04C7 | 468B | 8BFA | FC56 | 3005 | 5200 | 8B50 | FA46 |
| 0000061260 | 568B | 05FC | 0034 | 5052 | 468B | 8BFA | FC56 | 0405 |
| 0000061300 | 5200 | FF50 | 0676 | 76FF | FF08 | 0C76 | 76FF | C40A |
| 0000061320 | 0E5E | FF26 | 0277 | FF26 | FF37 | F076 | 76FF | 9AEE |
| 0000061340 | A4F0 | 5841 | C483 | 891C | EC46 | 7E83 | 00EC | 0375 |
| 0000061360 | 90E9 | C400 | 0E5E | FF26 | 0277 | FF26 | 9A37 | D231 |
| 0000061400 | 53AA | C483 | 8E04 | 6206 | 263A | 3E83 | 51E7 | 7500 |
| 0000061420 | E903 | 0009 | 7E83 | FED2 | 0374 | 0FE9 | 8E00 | 6406 |
| 0000061440 | 263A | 3E83 | 518A | 7500 | E903 | 0051 | 468B | 89EC |
| 0000061460 | D446 | 76FF | FFD8 | D676 | 468D | 16D4 | FF50 | E676 |
| 0000061500 | 76FF | FFF8 | F676 | 4E8D | 16DA | 8D51 | F24E | 5116 |
| 0000061520 | 4E8D | 16CE | 1E51 | 3068 | 6804 | 00D6 | 36FF | 042A |
| 0000061540 | 36FF | 0428 | 36FF | 042E | 36FF | 042C | 479A | 0052 |
| 0000061560 | 8300 | 28C4 | 468B | E9D4 | 03EF | 06E9 | 8B00 | EC46 |
| 0000061600 | E6E9 | 8B03 | 0846 | 5EC4 | 26FA | 4789 | 8B24 | 0646 |

THU MAR 14 17:31:54 1991 DB_PI.DLL PAGE 28, LINE 1594

| | | | | | | | | |
|---|---|---|---|---|---|---|---|---|
| 0000061620 | 5EC4 | 26FA | 4789 | C426 | FA5E | C726 | 2C47 | 0001 |
| 0000061640 | 468B | 0B0C | 0A46 | 0375 | 1BE9 | 6A00 | FF04 | 0C76 |
| 0000061660 | 76FF | 8B0A | FA46 | 568B | 05FC | 0028 | 5052 | 309A |
| 0000061700 | 583E | 8358 | 0AC4 | 681E | 03DD | 468B | 8BFA | FC56 |
| 0000061720 | 3805 | 5201 | 9A50 | 2750 | 586F | C483 | 1E08 | E468 |
| 0000061740 | 8B03 | FA46 | 568B | 05FC | 015C | 5052 | 509A | 8627 |
| 0000061760 | 8358 | 08C4 | 681E | 03EB | 468B | 8BFA | FC56 | 0605 |
| 0000062000 | 5202 | 9A50 | 2750 | 589D | C483 | 1E08 | F268 | 8B03 |
| 0000062020 | FA46 | 568B | 05FC | 02B0 | 5052 | 509A | B427 | 8358 |
| 0000062040 | 08C4 | 681E | 03F9 | 468B | 8BFA | FC56 | 5A05 | 5203 |
| 0000062060 | 9A50 | 2750 | 546B | C483 | C708 | CC46 | 0078 | 03E9 |
| 0000062100 | FF00 | CC46 | 7E83 | 7BCC | 037C | 7CE9 | 8B00 | FA46 |
| 0000062120 | 568B | 05FC | 0034 | 5052 | 668A | 2ACC | 03C0 | FA46 |
| 0000062140 | 568B | 2DFC | 7486 | 5052 | 509A | 0727 | 8359 | 08C4 |
| 0000062160 | 681E | 0400 | 668A | 2ACC | 03C0 | FA46 | 568B | 2DFC |
| 0000062200 | 7486 | 5052 | 0A9A | 2327 | 8359 | 08C4 | 681E | 0402 |
| 0000062220 | 668A | 2ACC | 03C0 | FA46 | 568B | 2DFC | 7486 | 5052 |
| 0000062240 | 0A9A | 5B27 | 8359 | 08C4 | 7669 | AACC | C400 | FA5E |
| 0000062260 | C726 | 4E80 | B4B2 | 6900 | CC76 | 00AA | 5EC4 | 26FA |
| 0000062300 | 80C7 | B24C | 0000 | 78E9 | 1EFF | 0568 | 8B04 | FA46 |
| 0000062320 | 568B | 05FC | 0902 | 5052 | 509A | 7227 | 8359 | 08C4 |
| 0000062340 | 681E | 040C | 468B | 8BFA | FC56 | AC05 | 5209 | 9A50 |
| 0000062360 | 2750 | 5989 | C483 | 1E08 | 1368 | 8B04 | FA46 | 568B |
| 0000062400 | 05FC | 0A56 | 5052 | 509A | 6227 | 8357 | 08C4 | 5EC4 |
| 0000062420 | 26FA | 87C7 | 08FA | 0028 | 5EC4 | 26FA | 87C7 | 09A4 |
| 0000062440 | 0028 | 5EC4 | 26FA | 87C7 | 0A4E | 0028 | 5EC4 | 26FA |
| 0000062460 | 87C7 | 08F8 | 0000 | 5EC4 | 26FA | 87C7 | 09A2 | 0000 |
| 0000062500 | 5EC4 | 26FA | 87C7 | 0A4C | 0000 | 681E | 041A | 468B |
| 0000062520 | 8BFA | FC56 | AE05 | 5207 | 9A50 | 2750 | 5A07 | C483 |
| 0000062540 | C408 | FA5E | C726 | A687 | 6C07 | C400 | FA5E | C726 |
| 0000062560 | A487 | 0007 | 1E00 | 2168 | 8B04 | FA46 | 568B | 05FC |
| 0000062600 | 0704 | 5052 | 509A | EB27 | 8358 | 08C4 | 5EC4 | 26FA |
| 0000062620 | 87C7 | 06FC | 0058 | 5EC4 | 26FA | 87C7 | 06FA | 0000 |
| 0000062640 | 468D | 16C8 | 9A50 | CEC7 | 5693 | C483 | 8904 | EC46 |
| 0000062660 | 7E83 | 00EC | 0375 | 7EE9 | 8E00 | 6206 | 263A | 3E83 |
| 0000062700 | 5AF5 | 7500 | E903 | 0009 | 7E83 | FED2 | 0374 | 0FE9 |
| 0000062720 | 8E00 | 6406 | 263A | 3E83 | 5B0D | 7500 | E903 | 0051 |
| 0000062740 | 468B | 89EC | D446 | 76FF | FFD8 | D676 | 468D | 16D4 |
| 0000062760 | FF50 | E676 | 76FF | FFF8 | F676 | 4E8D | 16DA | 8D51 |
| 0000063000 | F24E | 5116 | 4E8D | 16CE | 1E51 | 3068 | 6804 | 0127 |
| 0000063020 | 36FF | 042A | 36FF | 0428 | 36FF | 042E | 36FF | 042C |
| 0000063040 | 569A | 005B | 8300 | 28C4 | 468B | E9D4 | 013B | 06E9 |
| 0000063060 | 8B00 | EC46 | 32E9 | C401 | C85E | 8326 | 447F | 7402 |
| 0000063100 | E903 | 00A8 | 5EC4 | 260E | 77FF | 2602 | 37FF | 786A |
| 0000063120 | 76FF | 9A08 | 62D2 | 556E | 4689 | 83EC | EC7E | 7500 |
| 0000063140 | E903 | 0088 | 7E81 | B8EC | 7501 | E903 | 007E | 068E |
| 0000063160 | 3A62 | 8326 | 733E | 005B | 0375 | 09E9 | 8300 | D27E |
| 0000063200 | 74FE | E903 | 000F | 068E | 3A64 | 8326 | 8B3E | 005B |
| 0000063220 | 0375 | 51E9 | 8B00 | EC46 | 4689 | FFD4 | D876 | 76FF |
| 0000063240 | 8DD6 | D446 | 5016 | 76FF | FFE6 | F876 | 76FF | 8DF6 |
| 0000063260 | DA4E | 5116 | 4E8D | 16F2 | 8D51 | CE4E | 5116 | 681E |
| 0000063300 | 0430 | 2C68 | FF01 | 2A36 | FF04 | 2836 | FF04 | 2E36 |
| 0000063320 | FF04 | 2C36 | 9A04 | 5BD3 | 0000 | C483 | 8B28 | D446 |
| 0000063340 | 86E9 | E900 | 0006 | 468B | E9EC | 007D | 068E | 3A62 |
| 0000063360 | 8326 | 863E | 0055 | 0375 | 09E9 | 8300 | D27E | 74FE |
| 0000063400 | E903 | 000F | 068E | 3A64 | 8326 | 9E3E | 0055 | 0375 |
| 0000063420 | 50E9 | C700 | D446 | 0000 | 76FF | FFD8 | D676 | 468D |
| 0000063440 | 16D4 | FF50 | E676 | 76FF | FFF8 | F676 | 4E8D | 16DA |
| 0000063460 | 8D51 | F24E | 5116 | 4E8D | 16CE | 1E51 | 3068 | 6804 |

THU MAR 14 17:31:54 1991 DB_PI.DLL PAGE 29, LINE 1653

| | | | | | | | | |
|---|---|---|---|---|---|---|---|---|
| 0000063500 | 0130 | 36FF | 042A | 36FF | 0428 | 36FF | 042E | 36FF |
| 0000063520 | 042C | 459A | 0055 | 8300 | 28C4 | 468B | E9D4 | 0009 |
| 0000063540 | 06E9 | B800 | 0000 | 00E9 | 1F00 | 5F5E | ED83 | 8B02 |
| 0000063560 | 1FE5 | 4D5D | 10CA | 1E00 | 9058 | 5545 | EC8B | 8E1E |
| 0000063600 | 81D8 | 32EC | 5700 | 1E56 | 3EB8 | 8E51 | C7D8 | F646 |
| 0000063620 | 043D | 5E8C | C7F8 | E646 | 0101 | C02B | 4689 | 89D8 |
| 0000063640 | D646 | 068E | 3A62 | 8326 | C83E | 005C | 0375 | 1DE9 |
| 0000063660 | FF00 | 2E36 | FF04 | 2C36 | 8D04 | CE46 | 5016 | 749A |
| 0000063700 | 0051 | 8300 | 08C4 | 003D | 7400 | E903 | 000F | 068E |
| 0000063720 | 3A64 | 8326 | E03E | 005C | 0375 | 3BE9 | 1E00 | 4468 |
| 0000063740 | 8D04 | DA46 | 5016 | 468D | 16CE | 8D50 | F246 | 5016 |
| 0000063760 | 5768 | 1E01 | 4C68 | FF04 | 2A36 | FF04 | 2836 | FF04 |
| 0000064000 | 2E36 | FF04 | 2C36 | 9A04 | 51BD | 0000 | C483 | 891E |
| 0000064020 | F246 | 5689 | E9F4 | 0008 | C02B | 4689 | 89F4 | F246 |
| 0000064040 | 468D | 16FA | 6A50 | FF00 | 0A76 | 76FF | 9A08 | CF64 |
| 0000064060 | 5E95 | C483 | 890A | EC46 | 7E83 | 0DEC | 0375 | 7EE9 |
| 0000064100 | 8E00 | 6206 | 263A | 3E83 | 5D70 | 7500 | E903 | 0009 |
| 0000064120 | 7E83 | FED2 | 0374 | DFE9 | 8E00 | 6406 | 263A | 3E83 |
| 0000064140 | 5D88 | 7500 | E903 | 0051 | 468B | 89EC | D446 | 76FF |
| 0000064160 | FFD8 | D676 | 468D | 16D4 | FF50 | E676 | 76FF | FFF8 |
| 0000064200 | F676 | 4E8D | 16DA | 8D51 | F24E | 5116 | 4E8D | 16CE |
| 0000064220 | 1E51 | 4C68 | 6804 | 0161 | 36FF | 042A | 36FF | 0428 |
| 0000064240 | 36FF | 042E | 36FF | 042C | D09A | 005D | 8300 | 28C4 |
| 0000064260 | 468B | E9D4 | 03B3 | 06E9 | 8B00 | EC46 | AAE9 | C403 |
| 0000064300 | FA5E | 8326 | 2C7F | 7700 | E903 | 0007 | 5EC4 | 26FA |
| 0000064320 | 4FFF | C42C | FA5E | 8326 | 2C7F | 7700 | E903 | 0086 |
| 0000064340 | 7E83 | 0006 | 0374 | 7DE9 | 8E00 | 6206 | 263A | 3E83 |
| 0000064360 | 5E07 | 7500 | E903 | 0009 | 7E83 | FED2 | 0374 | 0FE9 |
| 0000064400 | 8E00 | 6406 | 263A | 3E83 | 5E1F | 7500 | E903 | 0050 |
| 0000064420 | 46C7 | 00D4 | FF00 | D876 | 76FF | 8DD6 | D446 | 5016 |
| 0000064440 | 76FF | FFE6 | F876 | 76FF | 8DF6 | DA4E | 5116 | 4E8D |
| 0000064460 | 16F2 | 8D51 | CE4E | 5116 | 681E | 044C | 6968 | FF01 |
| 0000064500 | 2A36 | FF04 | 2836 | FF04 | 2E36 | FF04 | 2C36 | 9A04 |
| 0000064520 | 5E68 | 0000 | C483 | 8B28 | D446 | 0CE9 | E903 | 0006 |
| 0000064540 | 00B8 | E900 | 0303 | 76FF | FFFC | FA76 | 219A | D669 |
| 0000064560 | 835A | 04C4 | 4689 | 83EC | EC7E | 7500 | E903 | 007E |
| 0000064600 | 068E | 3A62 | 8326 | AD3E | 005E | 0375 | 09E9 | 8300 |
| 0000064620 | D27E | 74FE | E903 | 000F | 068E | 3A64 | 8326 | C53E |
| 0000064640 | 005E | 0375 | 51E9 | 8B00 | EC46 | 4689 | FFD4 | D876 |
| 0000064660 | 76FF | 8DD6 | D446 | 5016 | 76FF | FFE6 | F876 | 76FF |
| 0000064700 | 8DF6 | DA4E | 5116 | 4E8D | 16F2 | 8D51 | CE4E | 5116 |
| 0000064720 | 681E | 044C | 6E68 | FF01 | 2A36 | FF04 | 2836 | FF04 |
| 0000064740 | 2E36 | FF04 | 2C36 | 9A04 | 5F0E | 0000 | C483 | 8B28 |
| 0000064760 | D446 | 74E9 | E902 | 0006 | 468B | E9EC | 026B | 468D |
| 0000065000 | 16E8 | 8D50 | EE46 | 5016 | 76FF | FF0A | 0876 | 006A |
| 0000065020 | 006A | 349A | 28D8 | 835A | 10C4 | 4689 | 83EC | EC7E |
| 0000065040 | 7500 | E903 | 007E | 068E | 3A62 | 8326 | 5D3E | 005F |
| 0000065060 | 0375 | 09E9 | 8300 | D27E | 74FE | E903 | 000F | 068E |
| 0000065100 | 3A64 | 8326 | 753E | 005F | 0375 | 51E9 | 8B00 | EC46 |
| 0000065120 | 4689 | FFD4 | D876 | 76FF | 8DD6 | D446 | 5016 | 76FF |
| 0000065140 | FFE6 | F876 | 76FF | 8DF6 | DA4E | 5116 | 4E8D | 16F2 |
| 0000065160 | 8D51 | CE4E | 5116 | 681E | 044C | 7268 | FF01 | 2A36 |
| 0000065200 | FF04 | 2836 | FF04 | 2E36 | FF04 | 2C36 | 9A04 | 5AA1 |
| 0000065220 | 0000 | C483 | 8B28 | D446 | CEE9 | E901 | 0006 | 468B |
| 0000065240 | E9EC | 01C5 | 5EC4 | 26FA | 77FF | 8B30 | FA46 | 568B |
| 0000065260 | 05FC | 0D34 | 5052 | 76FF | FF0A | 0876 | 76FF | FFF0 |
| 0000065300 | EE76 | AD9A | DCA6 | 8359 | 0EC4 | 4689 | 83EC | EC7E |
| 0000065320 | 7500 | E903 | 007E | 068E | 3A62 | 8326 | 403E | 005A |
| 0000065340 | 0375 | 09E9 | 8300 | D27E | 74FE | E903 | 000F | 068E |

THU MAR 14 17:31:54 1991 DB_PI.DLL PAGE 30, LINE 1712

| | | | | | | | | |
|---|---|---|---|---|---|---|---|---|
| 0000065360 | 3A64 | 8326 | 583E | 005A | 0375 | 51E9 | 8B00 | EC46 |
| 0000065400 | 4689 | FFD4 | D876 | 76FF | 8DD6 | D446 | 5016 | 76FF |
| 0000065420 | FFE6 | F876 | 76FF | 8DF6 | DA4E | 5116 | 4E8D | 16F2 |
| 0000065440 | 8D51 | CE4E | 5116 | 681E | 044C | 7768 | FF01 | 2A36 |
| 0000065460 | FF04 | 2836 | FF04 | 2E36 | FF04 | 2C36 | 9A04 | 6056 |
| 0000065500 | 0000 | C483 | 8B28 | D446 | 1EE9 | E901 | 0006 | 468B |
| 0000065520 | E9EC | 0115 | 76FF | FF0A | 0876 | 319A | B0D2 | 835C |
| 0000065540 | 04C4 | 4689 | 83EC | EC7E | 7500 | E903 | 007E | 068E |
| 0000065560 | 3A62 | 8326 | 733E | 0060 | 0375 | 09E9 | 8300 | D27E |
| 0000065600 | 74FE | E903 | 000F | 068E | 3A64 | 8326 | 8B3E | 0060 |
| 0000065620 | 0375 | 51E9 | 8B00 | EC46 | 4689 | FFD4 | D876 | 76FF |
| 0000065640 | 8DD6 | D446 | 5016 | 76FF | FFE6 | F876 | 76FF | 8DF6 |
| 0000065660 | DA4E | 5116 | 4E8D | 16F2 | 8D51 | CE4E | 5116 | 681E |
| 0000065700 | 044C | 7B68 | FF01 | 2A36 | FF04 | 2836 | FF04 | 2E36 |
| 0000065720 | FF04 | 2C36 | 9A04 | 60D3 | 0000 | C483 | 8B28 | D446 |
| 0000065740 | 86E9 | E900 | 0006 | 468B | E9EC | 007D | 068E | 3A62 |
| 0000065760 | 8326 | 293E | 005C | 0375 | 09E9 | 8300 | D27E | 74FE |
| 0000066000 | E903 | 000F | 068E | 3A64 | 8326 | 553E | 005C | 0375 |
| 0000066020 | 50E9 | C700 | D446 | 0000 | 76FF | FFD8 | D676 | 468D |
| 0000066040 | 16D4 | FF50 | E676 | 76FF | FFF8 | F676 | 4E8D | 16DA |
| 0000066060 | 8D51 | F24E | 5116 | 4E8D | 16CE | 1E51 | 4C68 | 6804 |
| 0000066100 | 017D | 36FF | 042A | 36FF | 0428 | 36FF | 042E | 36FF |
| 0000066120 | 042C | 299A | 005D | 8300 | 28C4 | 468B | E9D4 | 0009 |
| 0000066140 | 06E9 | B800 | 0000 | 00E9 | 1F00 | 5F5E | ED83 | 8B02 |
| 0000066160 | 1FE5 | 4D5D | 06CA | 1E00 | 9058 | 5545 | EC8B | 8E1E |
| 0000066200 | 81D8 | 0CEC | 5700 | C756 | FC46 | 0000 | 468D | 16F4 |
| 0000066220 | 9A50 | CEC7 | 5FDD | C483 | 8904 | FC46 | 7E83 | 00FC |
| 0000066240 | 0375 | 06E9 | 8B00 | FC46 | 68E9 | C700 | F846 | 0000 |
| 0000066260 | 03E9 | FF00 | F846 | 5EC4 | 8BF4 | F846 | 3926 | CA87 |
| 0000066300 | 7702 | E903 | 0047 | 768B | C1F8 | 03E6 | 5EC4 | 26F4 |
| 0000066320 | 808B | 02D0 | 0B26 | CE80 | 7502 | E903 | 002C | 768B |
| 0000066340 | C1F8 | 03E6 | 5EC4 | 26F4 | B0FF | 02D0 | FF26 | CEB0 |
| 0000066360 | 6A02 | 9A01 | 5BF7 | 5DEF | 4689 | 83FA | FA7E | 7500 |
| 0000066400 | E903 | 0006 | 468B | 89FA | FC46 | A6E9 | 8BFF | FC46 |
| 0000066420 | 00E9 | 5E00 | 835F | 02ED | E58B | 5D1F | CB4D | 581E |
| 0000066440 | 4590 | 8B55 | 1EEC | D88E | EC81 | 0024 | 5657 | B81E |
| 0000066460 | 5C09 | D88E | 46C7 | 5AFA | 8C04 | FC5E | 46C7 | 01F4 |
| 0000066500 | 2B01 | 89C0 | E646 | 4689 | 8EE4 | 6206 | 263A | 3E83 |
| 0000066520 | 624E | 7500 | E903 | 001D | 36FF | 042E | 36FF | 042C |
| 0000066540 | 468D | 16DC | 9A50 | 5C3F | 0000 | C483 | 3D08 | 0000 |
| 0000066560 | 0374 | 0FE9 | 8E00 | 6406 | 263A | 3E83 | 6266 | 7500 |
| 0000066600 | E903 | 003B | 681E | 0461 | 468D | 16E8 | 8D50 | DC46 |
| 0000066620 | 5016 | 468D | 16F6 | 6850 | 01C3 | 681E | 0468 | 36FF |
| 0000066640 | 042A | 36FF | 0428 | 36FF | 042E | 36FF | 042C | 889A |
| 0000066660 | 005C | 8300 | 1EC4 | 4689 | 89F6 | F856 | 08E9 | 2B00 |
| 0000066700 | 89C0 | F846 | 4689 | 8EF6 | 6206 | 263A | 3E83 | 5FF5 |
| 0000066720 | 7500 | E903 | 0009 | 7E83 | FEE0 | 0374 | 0FE9 | 8E00 |
| 0000066740 | 6406 | 263A | 3E83 | 600D | 7500 | E903 | 0050 | 46C7 |
| 0000066760 | 00E2 | FF00 | E676 | 76FF | 8DE4 | E246 | 5016 | 76FF |
| 0000067000 | FFF4 | FC76 | 76FF | 8DFA | E84E | 5116 | 4E8D | 16F6 |
| 0000067020 | 8D51 | DC4E | 5116 | 681E | 0468 | C668 | FF01 | 2A36 |
| 0000067040 | FF04 | 2836 | FF04 | 2E36 | FF04 | 2C36 | 9A04 | 5FBE |
| 0000067060 | 0000 | C483 | 8B28 | E246 | 09E9 | E900 | 0006 | 00B8 |
| 0000067100 | E900 | 0000 | 5E1F | 835F | 02ED | E58B | 5D1F | CA4D |
| 0000067120 | 0008 | 581E | 4590 | 8B55 | 1EEC | D88E | EC81 | 002C |
| 0000067140 | 5657 | B81E | 61B0 | D88E | 46C7 | 76F6 | 8C04 | F85E |
| 0000067160 | 46C7 | 01EE | 2B01 | 89C0 | E046 | 4689 | 8EDE | 6206 |
| 0000067200 | 263A | 3E83 | 61D0 | 7500 | E903 | 001D | 36FF | 042E |
| 0000067220 | 36FF | 042C | 468D | 16D6 | 9A50 | 61E6 | 0000 | C483 |

THU MAR 14 17:31:54 1991 DB_PI.DLL PAGE 31, LINE 1771

| | | | | | | | | |
|---|---|---|---|---|---|---|---|---|
| 0000067240 | 3D08 | 0000 | 0374 | 0FE9 | 8E00 | 6406 | 263A | 3E83 |
| 0000067260 | 61FC | 7500 | E903 | 003B | 681E | 047D | 468D | 16E2 |
| 0000067300 | 8D50 | D646 | 5016 | 468D | 16F2 | 6850 | 01E9 | 681E |
| 0000067320 | 0484 | 36FF | 042A | 36FF | 0428 | 36FF | 042E | 36FF |
| 0000067340 | 042C | 2F9A | 0062 | 8300 | 1EC4 | 4689 | 89F2 | F456 |
| 0000067360 | 08E9 | 2B00 | 89C0 | F446 | 4689 | 8DF2 | FA46 | 5016 |
| 0000067400 | 76FF | FF06 | 0C76 | 76FF | 9A0A | CF64 | 6114 | C483 |
| 0000067420 | 890A | F046 | 7E83 | 00F0 | 0375 | 7EE9 | 8E00 | 6206 |
| 0000067440 | 263A | 3E83 | 64DF | 7500 | E903 | 0009 | 7E83 | FEDA |
| 0000067460 | 0374 | 0FE9 | 8E00 | 6406 | 263A | 3E83 | 64F7 | 7500 |
| 0000067500 | E903 | 0051 | 468B | 89F0 | DC46 | 76FF | FFE0 | DE76 |
| 0000067520 | 468D | 16DC | FF50 | EE76 | 76FF | FFF8 | F676 | 4E8D |
| 0000067540 | 16E2 | 8D51 | F24E | 5116 | 4E8D | 16D6 | 1E51 | 8468 |
| 0000067560 | 6804 | 01F2 | 36FF | 042A | 36FF | 0428 | 36FF | 042E |
| 0000067600 | 36FF | 042C | 3F9A | 0065 | 8300 | 28C4 | 468B | E9DC |
| 0000067620 | 01E0 | 06E9 | 8B00 | F046 | D7E9 | 8B01 | 0846 | 3AE9 |
| 0000067640 | FF01 | 0676 | 76FF | FFFC | FA76 | 819A | 4433 | 8364 |
| 0000067660 | 06C4 | 4689 | E9F0 | 013C | 76FF | FF06 | FC76 | 76FF |
| 0000067700 | 9AFA | 2EDF | 6489 | C483 | 8906 | F046 | 25E9 | E901 |
| 0000067720 | 0122 | 7E83 | 7808 | 037D | 11E9 | 8300 | 087E | 7C7B |
| 0000067740 | E903 | 0008 | 46C7 | 01D4 | E900 | 0005 | 46C7 | 00D4 |
| 0000067760 | 8300 | D47E | 7500 | E903 | 001A | 76FF | FF06 | 0876 |
| 0000070000 | 76FF | FFFC | FA76 | 909A | CD0A | 8364 | 08C4 | 4689 |
| 0000070020 | E9F0 | 00C1 | 7E81 | 8C08 | 7D00 | E903 | 0012 | 7E81 |
| 0000070040 | 8F08 | 7C00 | E903 | 0008 | 46C7 | 01D4 | E900 | 0005 |
| 0000070060 | 46C7 | 00D4 | 8300 | D47E | 7500 | E903 | 001A | 76FF |
| 0000070100 | FF06 | 0876 | 76FF | FFFC | FA76 | DA9A | 4637 | 8304 |
| 0000070120 | 08C4 | 4689 | E9F0 | 007D | 068E | 3A62 | 8326 | 7B3C |
| 0000070140 | 0065 | 0375 | 09E9 | 8300 | DA7E | 74FE | E903 | 000F |
| 0000070160 | 068E | 3A64 | 8326 | 933E | 0065 | 0375 | 50E9 | C700 |
| 0000070200 | DC46 | 01AD | 76FF | FFE0 | DE76 | 468D | 16DC | FF50 |
| 0000070220 | EE76 | 76FF | FFF8 | F676 | 4E8D | 16E2 | 8D51 | F24E |
| 0000070240 | 5116 | 4E8D | 16D6 | 1E51 | 8468 | 6804 | 020A | 36FF |
| 0000070260 | 042A | 36FF | 0428 | 36FF | 042E | 36FF | 042C | DC9A |
| 0000070300 | 0065 | 8300 | 28C4 | 468B | E9DC | 00A6 | 06E9 | B800 |
| 0000070320 | 01AD | 9DE9 | E900 | 001C | 19E9 | 2D00 | 0016 | 0375 |
| 0000070340 | D5E9 | 48FE | 0375 | B8E9 | 2DFE | 004E | 0375 | DEE9 |
| 0000070360 | E9FE | FEDE | 068E | 3A62 | 8326 | 043E | 0063 | 0375 |
| 0000070400 | D9E9 | 8300 | DA7E | 74FE | E903 | 000F | 068E | 3A64 |
| 0000070420 | 8326 | 303E | 0063 | 0375 | 51E9 | 8BC0 | F046 | 4689 |
| 0000070440 | FFDC | E076 | 76FF | 8DDE | DC46 | 5016 | 76FF | FFEE |
| 0000070460 | F876 | 76FF | 8DF6 | E24E | 5116 | 4E8D | 16F2 | 8D51 |
| 0000070500 | D64E | 5116 | 681E | 0484 | 0F68 | FF02 | 2A36 | FF04 |
| 0000070520 | 2836 | FF04 | 2E36 | FF04 | 2C36 | 9A04 | 62AE | 0000 |
| 0000070540 | C483 | 8B28 | DC46 | 09E9 | E900 | 0006 | 468B | E9F0 |
| 0000070560 | 0000 | 5E1F | 835F | 02ED | E58B | 5D1F | CA4D | 0008 |
| 0000070600 | 581E | 4590 | 8B55 | 1EEC | D88E | EC81 | 002C | 5657 |
| 0000070620 | B81E | 62E4 | D88E | 46C7 | 90F6 | 8C04 | F85E | 46C7 |
| 0000070640 | 01EE | 2B01 | 89C0 | E046 | 4689 | 8EDE | 6206 | 263A |
| 0000070660 | 3E83 | 66D1 | 7500 | E903 | 001D | 36FF | 042E | 36FF |
| 0000070700 | 042C | 468D | 16D6 | 9A50 | 631A | 0000 | C483 | 3D08 |
| 0000070720 | 0000 | 0374 | 0FE9 | 8E00 | 6406 | 263A | 3E83 | 66E9 |
| 0000070740 | 7500 | E903 | 003B | 681E | 0497 | 468D | 16E2 | 8D50 |
| 0000070760 | D646 | 5016 | 468D | 16F2 | 6850 | 022E | 681E | 049E |
| 0000071000 | 36FF | 042A | 36FF | 0428 | 36FF | 042E | 36FF | 042C |
| 0000071020 | 639A | 0063 | 8300 | 1EC4 | 4689 | 89F2 | F456 | 08E9 |
| 0000071040 | 2B00 | 89C0 | F446 | 4689 | 8DF2 | FA46 | 5016 | 006A |
| 0000071060 | 76FF | FF0A | 0876 | 649A | 8CCF | 8363 | 0AC4 | 4689 |
| 0000071100 | 83F0 | F07E | 7500 | E903 | 007E | 068E | 3A62 | 8326 |

THU MAR 14 17:31:54 1991 DB_PI.DLL PAGE 32, LINE 1830

| | | | | | | | | |
|---|---|---|---|---|---|---|---|---|
| 0000071120 | 003E | 0068 | 0375 | 09E9 | 8300 | DA7E | 74FE | E903 |
| 0000071140 | 000F | 068E | 3A64 | 8326 | 183E | 0068 | 0375 | 51E9 |
| 0000071160 | 8B00 | F046 | 4689 | FFDC | E076 | 76FF | 8DDE | DC46 |
| 0000071200 | 5016 | 76FF | FFEE | F876 | 76FF | 8DF6 | E24E | 5116 |
| 0000071220 | 4E8D | 16F2 | 8D51 | D64E | 5116 | 681E | 049E | 3768 |
| 0000071240 | FF02 | 2A36 | FFD4 | 2836 | FF04 | 2E36 | FF04 | 2C36 |
| 0000071260 | 9A04 | 6860 | 0000 | C483 | 8B28 | DC46 | D4E9 | E901 |
| 0000071300 | 0006 | 468B | E9F0 | 01CB | 468B | E906 | 012E | 76FF |
| 0000071320 | FFFC | FA76 | D99A | 6B34 | 8367 | 04C4 | 4689 | E9F0 |
| 0000071340 | 0133 | 76FF | FFFC | FA76 | 289A | AD30 | 8367 | 04C4 |
| 0000071360 | 4689 | E9F0 | 011F | 1CE9 | 8301 | 067E | 7D78 | E903 |
| 0000071400 | 0011 | 7E83 | 7B06 | 037C | 08E9 | C700 | D446 | 0001 |
| 0000071420 | 05E9 | C700 | D446 | 0000 | 7E83 | 00D4 | 0375 | 17E9 |
| 0000071440 | FF00 | 0676 | 76FF | FFFC | FA76 | 329A | EEDC | 8367 |
| 0000071460 | 06C4 | 4689 | E9F0 | 00BE | 7E81 | 8C06 | 7D00 | E903 |
| 0000071500 | 0012 | 7E81 | 8F06 | 7C00 | E903 | 0008 | 46C7 | 01D4 |
| 0000071520 | E900 | 0005 | 46C7 | 00D4 | 8300 | D47E | 7500 | E903 |
| 0000071540 | 0017 | 76FF | FF06 | FC76 | 76FF | 9AFA | 396C | 642D |
| 0000071560 | C483 | 8906 | F046 | 7DE9 | 8E00 | 6206 | 263A | 3E83 |
| 0000071600 | 689C | 7500 | E903 | 0009 | 7E83 | FEDA | 0374 | 0FE9 |
| 0000071620 | 8E00 | 6406 | 263A | 3E83 | 68B4 | 7500 | E903 | 0050 |
| 0000071640 | 46C7 | ADDC | FF01 | E076 | 76FF | 8DDE | DC46 | 5016 |
| 0000071660 | 76FF | FFEE | F876 | 76FF | 8DF6 | E24E | 5116 | 4E8D |
| 0000071700 | 16F2 | 8D51 | D64E | 5116 | 681E | 049E | 4E68 | FF02 |
| 0000071720 | 2A36 | FF04 | 2836 | FF04 | 2E36 | FF04 | 2C36 | 9A04 |
| 0000071740 | 68FD | 0000 | C483 | 8B28 | DC46 | A6E9 | E900 | 0006 |
| 0000071760 | ADB8 | E901 | 009D | 1CE9 | E900 | 0019 | 162D | 7500 |
| 0000072000 | E903 | FEDE | 7548 | E903 | FEC4 | 4E2D | 7500 | E903 |
| 0000072020 | FEE4 | E4E9 | 8EFE | 6206 | 263A | 3E83 | 63A4 | 7500 |
| 0000072040 | E903 | 0009 | 7E83 | FEDA | 0374 | 0FE9 | 8E00 | 6406 |
| 0000072060 | 263A | 3E83 | 63BC | 7500 | E903 | 0051 | 468B | 89F0 |
| 0000072100 | DC46 | 76FF | FFE0 | DE76 | 468D | 16DC | FF50 | EE76 |
| 0000072120 | 76FF | FFF8 | F676 | 4E8D | 16E2 | 8D51 | F24E | 5116 |
| 0000072140 | 4E8D | 16D6 | 1E51 | 9E68 | 6804 | 0253 | 36FF | 042A |
| 0000072160 | 36FF | 0428 | 36FF | 042E | 36FF | 042C | 059A | 0064 |
| 0000072200 | 8300 | 28C4 | 468B | E9DC | 0009 | 06E9 | 8B00 | F046 |
| 0000072220 | 00E9 | 1F00 | 5F5E | ED83 | 8B02 | 1FE5 | 4D5D | 06CA |
| 0000072240 | 1E00 | 9058 | 5545 | EC8B | 8E1E | 81D8 | 06EC | 5700 |
| 0000072260 | C756 | FC46 | 0000 | 76FF | FF08 | 0676 | A29A | 5F39 |
| 0000072300 | 8369 | 04C4 | 4689 | 83FA | FA7E | 7500 | E903 | 0006 |
| 0000072320 | 468B | 89FA | FC46 | 76FF | FF08 | 0676 | 8B9A | 7F0C |
| 0000072340 | 8369 | 04C4 | 4689 | 83FA | FA7E | 7500 | E903 | 0006 |
| 0000072360 | 468B | 89FA | FC46 | 76FF | FF08 | 0676 | D99A | 9F34 |
| 0000072400 | 8369 | 04C4 | 4689 | 83FA | FA7E | 7500 | E903 | 0006 |
| 0000072420 | 468B | 89FA | FC46 | 76FF | FF08 | 0676 | 289A | 5730 |
| 0000072440 | 8367 | 04C4 | 4689 | 83FA | FA7E | 7500 | E903 | 0006 |
| 0000072460 | 468B | 89FA | FC46 | 468B | E9FC | 0000 | 5F5E | ED83 |
| 0000072500 | 8B02 | 1FE5 | 4D5D | 1ECB | 9058 | 5545 | EC8B | 8E1E |
| 0000072520 | 81D8 | 2EEC | 5700 | 1E56 | 12B8 | 8E66 | C7D8 | F646 |
| 0000072540 | 04AC | 5E8C | C7F8 | EC46 | 0101 | C02B | 4689 | 89DE |
| 0000072560 | DC46 | 068E | 3A62 | 8326 | 9D3E | 006A | 0375 | 1DE9 |
| 0000072600 | FF00 | 2E36 | FF04 | 2C36 | 8D04 | D446 | 5016 | 489A |
| 0000072620 | 0066 | 8300 | 08C4 | 003D | 7400 | E903 | 000F | 068E |
| 0000072640 | 3A64 | 8326 | B53E | 006A | 0375 | 3BE9 | 1E00 | B368 |
| 0000072660 | 8D04 | E046 | 5016 | 468D | 16D4 | 8D50 | F046 | 5016 |
| 0000072700 | A268 | 1E02 | BA68 | FF04 | 2A36 | FF04 | 2836 | FF04 |
| 0000072720 | 2E36 | FF04 | 2C36 | 9A04 | 6691 | 0000 | C483 | 891E |
| 0000072740 | F046 | 5689 | E9F2 | 0008 | C02B | 4689 | 89F2 | F046 |
| 0000072760 | 46C7 | 00F4 | 8D00 | FA46 | 5016 | 026A | 76FF | FF0A |

THU MAR 14 17:31:54 1991 DB_PI.DLL PAGE 33, LINE 1889

| | | | | | | | | |
|---|---|---|---|---|---|---|---|---|
| 0000073000 | 0876 | 649A | B9CF | 8366 | 0AC4 | 4689 | 83EE | EE7E |
| 0000073020 | 7500 | E903 | 007E | 068E | 3A62 | 8326 | 7D3E | 006C |
| 0000073040 | 0375 | 09E9 | 8300 | D87E | 74FE | E903 | 000F | 068E |
| 0000073060 | 3A64 | 8326 | 953E | 006C | 0375 | 51E9 | 8B00 | EE46 |
| 0000073100 | 4689 | FFDA | DE76 | 76FF | 8DDC | DA46 | 5016 | 76FF |
| 0000073120 | FFEC | F876 | 76FF | 8DF6 | E04E | 5116 | 4E8D | 16F0 |
| 0000073140 | 8D51 | D44E | 5116 | 681E | 04BA | AC68 | FF02 | 2A36 |
| 0000073160 | FF04 | 2836 | FF04 | 2E36 | FF04 | 2C36 | 9A04 | 6CDD |
| 0000073200 | 0000 | C483 | 8B28 | DA46 | A5E9 | E902 | 0006 | 468B |
| 0000073220 | E9EE | 029C | 468B | E906 | 01DF | 76FF | FFFC | FA76 |
| 0000073240 | 219A | 3735 | 836B | 04C4 | 4689 | E9EE | 0204 | 76FF |
| 0000073260 | FFFC | FA76 | E89A | 4B30 | 836B | 04C4 | 4689 | E9EE |
| 0000073300 | 01F0 | 76FF | FFFC | FA76 | D49A | 5F0F | 836B | 04C4 |
| 0000073320 | 4689 | E9EE | 01DC | 76FF | FFFC | FA76 | 7C9A | 763A |
| 0000073340 | 836B | 04C4 | 4689 | E9EE | 01C8 | C5E9 | FF01 | FC76 |
| 0000073360 | 76FF | 9AFA | 3521 | 6B96 | C483 | 8904 | EE46 | 7E83 |
| 0000073400 | 00EE | 0375 | 06E9 | 8B00 | EE46 | 4689 | FFF4 | FC76 |
| 0000073420 | 76FF | 9AFA | 30E8 | 6BB6 | C483 | 8904 | EE46 | 7E83 |
| 0000073440 | 00EE | 0375 | 06E9 | 8B00 | EE46 | 4689 | FFF4 | FC76 |
| 0000073460 | 76FF | 9AFA | 0FD4 | 6BD6 | C483 | 8904 | EE46 | 7E83 |
| 0000073500 | 00EE | 0375 | 06E9 | 8B00 | EE46 | 4689 | FFF4 | FC76 |
| 0000073520 | 76FF | 9AFA | 3A7C | 6C2A | C483 | 8904 | EE46 | 7E83 |
| 0000073540 | 00EE | 0375 | 06E9 | 8B00 | EE46 | 4689 | 8BF4 | F446 |
| 0000073560 | 4689 | E9EE | 013C | 7E83 | 7806 | 037D | 11E9 | 8300 |
| 0000073600 | 067E | 7C7B | E903 | 0008 | 46C7 | 01D2 | E900 | 0005 |
| 0000073620 | 46C7 | 00D2 | 8300 | D27E | 7500 | E903 | 0017 | 76FF |
| 0000073640 | FF06 | FC76 | 76FF | 9AFA | 0E29 | 6C6B | C483 | 8906 |
| 0000073660 | EE46 | BEE9 | 8100 | 067E | 008C | 037D | 12E9 | 8100 |
| 0000073700 | 067E | 008F | 037C | 08E9 | C700 | D246 | 0001 | 05E9 |
| 0000073720 | C700 | D246 | 0000 | 7E83 | 00D2 | 0375 | 17E9 | FF00 |
| 0000073740 | 0676 | 76FF | FFFC | FA76 | 189A | 3F3A | 8369 | 06C4 |
| 0000073760 | 4689 | E9EE | 007D | 068E | 3A62 | 8326 | 393E | 006D |
| 0000074000 | 0375 | 09E9 | 8300 | D87E | 74FE | E903 | 000F | 068E |
| 0000074020 | 3A64 | 8326 | 513E | 006D | 0375 | 50E9 | C700 | DA46 |
| 0000074040 | 01AD | 76FF | FFDE | DC76 | 468D | 16DA | FF50 | EC76 |
| 0000074060 | 76FF | FFF8 | F676 | 4E8D | 16E0 | 8D51 | F04E | 5116 |
| 0000074100 | 4E8D | 16D4 | 1E51 | BA68 | 6804 | 02D8 | 36FF | 042A |
| 0000074120 | 36FF | 0428 | 36FF | 042E | 36FF | 042C | 329A | 0067 |
| 0000074140 | 8300 | 28C4 | 468B | E9DA | 00C6 | 06E9 | B800 | 01AD |
| 0000074160 | BDE9 | E900 | 003C | 39E9 | 3D00 | 0065 | 0375 | 69E9 |
| 0000074200 | 7EFE | E903 | 0011 | 162D | 7500 | E903 | FE20 | 7548 |
| 0000074220 | E903 | FE06 | DFE9 | 2DFE | 0077 | 0375 | 23E9 | 2DFE |
| 0000074240 | 0014 | 0375 | 2FE9 | 2DFE | 0006 | 0375 | 3EE9 | E9FE |
| 0000074260 | FEC4 | 068E | 3A62 | 8326 | 323E | 0066 | 0375 | 09E9 |
| 0000074300 | 8300 | D87E | 74FE | E903 | 000F | 068E | 3A64 | 8326 |
| 0000074320 | 5E3E | 0066 | 0375 | 51E9 | 8B00 | EE46 | 4689 | FFDA |
| 0000074340 | DE76 | 76FF | 8DDC | DA46 | 5016 | 76FF | FFEC | F876 |
| 0000074360 | 76FF | 8DF6 | E04E | 5116 | 4E8D | 16F0 | 8D51 | D44E |
| 0000074400 | 5116 | 681E | 04BA | DD68 | FF02 | 2A36 | FF04 | 2836 |
| 0000074420 | FF04 | 2E36 | FF04 | 2C36 | 9A04 | 6AFE | 0000 | C483 |
| 0000074440 | 8B28 | DA46 | 09E9 | E900 | 0006 | 468B | E9EE | 0000 |
| 0000074460 | 5E1F | 835F | 02ED | E58B | 5D1F | CA4D | 0006 | 581E |
| 0000074500 | 4590 | 8B55 | 1EEC | D88E | EC81 | 0024 | 5657 | B81E |
| 0000074520 | 69D9 | D88E | 46C7 | C7FA | 8C04 | FC5E | 46C7 | 01F4 |
| 0000074540 | 2B01 | 89C0 | E646 | 4689 | 8EE4 | 6206 | 263A | 3E83 |
| 0000074560 | 6E6E | 7500 | E903 | 001D | 36FF | 042E | 36FF | 042C |
| 0000074600 | 468D | 16DC | 9A50 | 6A0F | 0000 | C483 | 3D08 | 0000 |
| 0000074620 | 0374 | 0FE9 | 8E00 | 6406 | 263A | 3E83 | 6E86 | 7500 |
| 0000074640 | E903 | 003B | 681E | 04CE | 468D | 16E8 | 8D50 | DC46 |

THU MAR 14 17:31:54 1991 DB_PI.DLL PAGE 34, LINE 1948

| | | | | | | | | |
|---|---|---|---|---|---|---|---|---|
| 0000074660 | 5016 | 468D | 16F6 | 6850 | 02F7 | 681E | 04D6 | 36FF |
| 0000074700 | 042A | 36FF | 0428 | 36FF | 042E | 36FF | 042C | 589A |
| 0000074720 | 006A | 8300 | 1EC4 | 4689 | 89F6 | F856 | 08E9 | 2B00 |
| 0000074740 | 89C0 | F846 | 4689 | 8EF6 | 6206 | 263A | 3E83 | 69F9 |
| 0000074760 | 7500 | E903 | 0009 | 7E83 | FEE0 | 0374 | 0FE9 | 8E00 |
| 0000075000 | 6406 | 263A | 3E83 | 6A25 | 7500 | E903 | 005C | 76FF |
| 0000075020 | FF08 | 0676 | 9168 | 9A00 | 69C7 | 6EF6 | 4689 | FFE2 |
| 0000075040 | E676 | 76FF | 8DE4 | E246 | 5016 | 76FF | FFF4 | FC76 |
| 0000075060 | 76FF | 8DFA | E84E | 5116 | 4E8D | 16F6 | 8D51 | DC4E |
| 0000075100 | 5116 | 681E | 04D6 | FA68 | FF02 | 2A56 | FF04 | 2836 |
| 0000075120 | FF04 | 2E36 | FF04 | 2C36 | 9A04 | 6D9A | 0000 | C483 |
| 0000075140 | 8B28 | E246 | 14E9 | E900 | 0011 | 76FF | FF08 | 0676 |
| 0000075160 | 9168 | 9A00 | 69C7 | 6176 | 00E9 | 1F00 | 5F5E | ED83 |
| 0000075200 | 8B02 | 1FE5 | 4D5D | 04CA | 0000 | 581E | 4590 | 8B55 |
| 0000075220 | 1EEC | D88E | EC81 | 0036 | 5657 | B81E | 6DD0 | D88E |
| 0000075240 | 46C7 | F4F6 | 8C04 | F85E | 46C7 | 01E2 | 2B01 | 89C0 |
| 0000075260 | D446 | 4689 | 8ED2 | 6606 | 263A | 3E83 | 6DF0 | 7500 |
| 0000075300 | E903 | 001D | 36FF | 0510 | 36FF | 050E | 468D | 16CA |
| 0000075320 | 9A50 | 6E06 | 0000 | C483 | 3D08 | 0000 | 0374 | 0FE9 |
| 0000075340 | 8E00 | 6806 | 263A | 3E83 | 7007 | 7500 | E903 | 003B |
| 0000075360 | 681E | D4FB | 468D | 16D6 | 8D50 | CA46 | 5016 | 468D |
| 0000075400 | 16F2 | 6850 | 00AA | 681E | 0512 | 36FF | 050C | 36FF |
| 0000075420 | 050A | 36FF | 0510 | 36FF | 050E | 4F9A | 006E | 8300 |
| 0000075440 | 1EC4 | 4689 | 89F2 | F456 | 08E9 | 2B00 | 89C0 | F446 |
| 0000075460 | 4689 | 8AF2 | 0F46 | E42A | 293D | 7400 | E903 | 00C7 |
| 0000075500 | 468D | 16E4 | 8D50 | EE46 | 5016 | 76FF | FF0E | 0C76 |
| 0000075520 | 006A | 006A | 349A | 98D8 | 8370 | 10C4 | 4689 | 83E8 |
| 0000075540 | E87E | 7500 | E903 | 007E | 068E | 3A66 | 8326 | B03E |
| 0000075560 | 0070 | 0375 | 09E9 | 8300 | CE7E | 74FE | E903 | 000F |
| 0000075600 | 068E | 3A68 | 8326 | C83E | 0070 | 0375 | 51E9 | 8B00 |
| 0000075620 | E846 | 4689 | FFD0 | D476 | 76FF | 8DD2 | D046 | 5016 |
| 0000075640 | 76FF | FFE2 | F876 | 76FF | 8DF6 | D64E | 5116 | 4E8D |
| 0000075660 | 16F2 | 8D51 | CA4E | 5116 | 681E | 0512 | B868 | FF00 |
| 0000075700 | 0C36 | FF05 | DA36 | FF05 | 1036 | FF05 | 0E36 | 9A05 |
| 0000075720 | 7111 | 0000 | C483 | 8B28 | D046 | 2AE9 | E903 | 0006 |
| 0000075740 | 468B | E9E8 | 0321 | 468D | 160C | 1E50 | 0268 | FF05 |
| 0000075760 | 0E76 | 76FF | 6A0C | 6A00 | FF00 | F076 | 76FF | 9AEE |
| 0000076000 | 8AC4 | 7135 | C483 | 8D14 | FA46 | 5016 | 76FF | FF0A |
| 0000076020 | 0E76 | 76FF | 9A0C | CF64 | 6A85 | C483 | 890A | E846 |
| 0000076040 | 7E83 | 00E8 | 0375 | 7EE9 | 8E00 | 6606 | 263A | 3E83 |
| 0000076060 | 7201 | 7500 | E903 | 0009 | 7E83 | FECE | 0374 | 0FE9 |
| 0000076100 | 8E00 | 6806 | 263A | 3E83 | 7219 | 7500 | E903 | 0051 |
| 0000076120 | 468B | 89E8 | D046 | 76FF | FFD4 | D276 | 468D | 16D0 |
| 0000076140 | FF50 | E276 | 76FF | FFF8 | F676 | 4E8D | 16D6 | 8D51 |
| 0000076160 | F24E | 5116 | 4E8D | 16CA | 1E51 | 1268 | 6805 | 00C2 |
| 0000076200 | 36FF | 050C | 36FF | 050A | 36FF | 0510 | 36FF | 050E |
| 0000076220 | 619A | 0072 | 8300 | 28C4 | 468B | E9D0 | 0269 | D6E9 |
| 0000076240 | 8B00 | E846 | 60E9 | 8B02 | FA46 | 568B | 05FC | 0138 |
| 0000076260 | 5052 | B09A | 4A27 | 8371 | 04C4 | 4E8B | 8BFA | FC56 |
| 0000076300 | C183 | 5234 | 8B51 | 9AF0 | 27B0 | 7158 | C483 | 0304 |
| 0000076320 | 83F0 | 02C6 | 9A56 | 243E | 717F | C483 | C402 | 065E |
| 0000076340 | 8926 | 2607 | 5789 | 8B02 | FA46 | 568B | 05FC | 0034 |
| 0000076360 | 5052 | 5EC4 | 2606 | 77FF | 2602 | 37FF | 509A | 9527 |
| 0000076400 | 8371 | 08C4 | 681E | 0505 | 5EC4 | 2606 | 77FF | 2602 |
| 0000076420 | 37FF | 0A9A | B227 | 8371 | 08C4 | 468B | 8BFA | FC56 |
| 0000076440 | 3805 | 5201 | C450 | 065E | FF26 | 0277 | FF26 | 9A37 |
| 0000076460 | 270A | 71E4 | C483 | 6A08 | C42F | 065E | FF26 | 0277 |
| 0000076500 | FF26 | 9A37 | 29CF | 5085 | C483 | 3D06 | 0000 | 0374 |
| 0000076520 | 37E9 | 1E01 | 0768 | C405 | 065E | FF26 | 0277 | FF26 |

THU MAR 14 17:31:54 1991 DB_PI.DLL PAGE 35, LINE 2007

| | | | | | | | | |
|---|---|---|---|---|---|---|---|---|
| 0000076540 | 9A37 | 0656 | 7280 | C483 | 8908 | EA46 | 5689 | 8BEC |
| 0000076560 | EC46 | 460B | 74EA | E903 | 007D | 068E | 3A66 | 8326 |
| 0000076600 | 943E | 0072 | 0375 | 09E9 | 8300 | CE7E | 74FE | E903 |
| 0000076620 | 000F | 068E | 3A68 | 8326 | AC3E | 0072 | 0375 | 50E9 |
| 0000076640 | C700 | D046 | 0008 | 76FF | FFD4 | D276 | 468D | 16D0 |
| 0000076660 | FF50 | E276 | 76FF | FFF8 | F676 | 4E8D | 16D6 | 8D51 |
| 0000076700 | F24E | 5116 | 4E8D | 16CA | 1E51 | 1268 | 6805 | 00D7 |
| 0000076720 | 36FF | 050C | 36FF | 050A | 36FF | 0510 | 36FF | 050E |
| 0000076740 | F49A | 0072 | 8300 | 28C4 | 468B | E9D0 | 0119 | 06E9 |
| 0000076760 | B800 | 0008 | 10E9 | FF01 | EC76 | 76FF | 9AEA | 0502 |
| 0000077000 | 5F45 | C483 | 3D04 | 0000 | 0375 | 7DE9 | 8E00 | 6606 |
| 0000077020 | 263A | 3E83 | 7311 | 7500 | E903 | 0009 | 7E83 | FECE |
| 0000077040 | 0374 | 0FE9 | 8E00 | 6806 | 263A | 3E83 | 6E1C | 7500 |
| 0000077060 | E903 | 0050 | 46C7 | 09D0 | FF00 | D476 | 76FF | 8DD2 |
| 0000077100 | D046 | 5016 | 76FF | FFE2 | F876 | 76FF | 8DF6 | D64E |
| 0000077120 | 5116 | 4E8D | 16F2 | 8D51 | CA4E | 5116 | 681E | 0512 |
| 0000077140 | D968 | FF00 | 0C36 | FF05 | 0A36 | FF05 | 1036 | FF05 |
| 0000077160 | 0E36 | 9A05 | 6EDA | 0000 | C483 | 8B28 | D046 | 86E9 |
| 0000077200 | E900 | 0006 | 09B8 | E900 | 007D | 068E | 3A66 | 8326 |
| 0000077220 | 3C3E | 006F | 0375 | 09E9 | 8300 | CE7E | 74FE | E903 |
| 0000077240 | 000F | 068E | 3A68 | 8326 | 683E | 006F | 0375 | 50E9 |
| 0000077260 | C700 | D046 | 0000 | 76FF | FFD4 | D276 | 468D | 16D0 |
| 0000077300 | FF50 | E276 | 76FF | FFF8 | F676 | 4E8D | 16D6 | 8D51 |
| 0000077320 | F24E | 5116 | 4E8D | 16CA | 1E51 | 1268 | 6805 | 00DC |
| 0000077340 | 36FF | 050C | 36FF | 050A | 36FF | 0510 | 36FF | 050E |
| 0000077360 | 509A | 0070 | 8300 | 28C4 | 468B | E9D0 | 0009 | 06E9 |
| 0000077400 | B800 | 0000 | 00E9 | 1F00 | 5F5E | ED83 | 8B02 | 1FE5 |
| 0000077420 | 4D5D | 0ACA | 1E00 | 9058 | 5545 | EC8B | 8E1E | 81D8 |
| 0000077440 | 24EC | 5700 | 1E56 | 1CB8 | 8E6F | C7D8 | FA46 | 0527 |
| 0000077460 | 5E8C | C7FC | F446 | 0101 | C02B | 4689 | 89E6 | E446 |
| 0000077500 | 068E | 3A66 | 8326 | 453E | 0074 | 0375 | 1DE9 | FF00 |
| 0000077520 | 1036 | FF05 | 0E36 | 8D05 | DC46 | 5016 | 529A | 006F |
| 0000077540 | 8300 | 08C4 | 003D | 7400 | E903 | 000F | 068E | 3A68 |
| 0000077560 | 8326 | 5D3E | 0074 | 0375 | 3BE9 | 1E00 | 2E68 | 8D05 |
| 0000077600 | E846 | 5016 | 468D | 16DC | 8D50 | F646 | 5016 | F768 |
| 0000077620 | 1E00 | 3668 | FF05 | 0C36 | FF05 | 0A36 | FF05 | 1036 |
| 0000077640 | FF05 | 0E36 | 9A05 | 6F9B | 0000 | C483 | 891E | F646 |
| 0000077660 | 5689 | E9F8 | 0008 | C02B | 4689 | 89F8 | F646 | 068E |
| 0000077700 | 3A66 | 8326 | EF3E | 006F | 0375 | 09E9 | 8300 | E07E |
| 0000077720 | 74FE | E903 | 000F | 068E | 3A68 | 8326 | 293E | 0073 |
| 0000077740 | 0375 | 50E9 | C700 | E246 | 0000 | 76FF | FFE6 | E476 |
| 0000077760 | 468D | 16E2 | FF50 | F476 | 76FF | FFFC | FA76 | 4E8D |
| 0000100000 | 16E8 | 8D51 | F64E | 5116 | 4E8D | 16DC | 1E51 | 3668 |
| 0000100020 | 6805 | 00FD | 36FF | 050C | 36FF | 050A | 36FF | 0510 |
| 0000100040 | 36FF | 050E | 719A | 0073 | 8300 | 28C4 | 468B | E9E2 |
| 0000100060 | 0009 | 06E9 | B800 | 0000 | 00E9 | 1F00 | 5F5E | ED83 |
| 0000100100 | 8B02 | 1FE5 | 4D5D | 08CA | 1E00 | 9058 | 5545 | EC8B |
| 0000100120 | 8E1E | 81D8 | 0AEC | 5700 | 6856 | 74F8 | 0468 | 1E02 |
| 0000100140 | 4C68 | FF05 | 0876 | 76FF | 9A06 | 0874 | 7500 | C483 |
| 0000100160 | FF0C | 0C76 | 76FF | 680A | 751D | 0468 | 9A02 | 2786 |
| 0000100200 | 7525 | C483 | 3D08 | 0000 | 0375 | 06E9 | B800 | 000C |
| 0000100220 | E3E9 | FF00 | 0876 | 76FF | 6806 | 010D | 3A68 | 6875 |
| 0000100240 | 0204 | 109A | 422D | 8375 | 0AC4 | D00B | 0374 | 06E9 |
| 0000100260 | B800 | 000C | BFE9 | 6A00 | 680A | 756A | 0468 | 9A02 |
| 0000100300 | 3C10 | 7572 | C483 | 8906 | FA46 | 5689 | 8BFC | FC46 |
| 0000100320 | 460B | 74FA | E903 | 0006 | 0CB8 | E900 | 0098 | 5EC4 |
| 0000100340 | 26FA | 07C6 | 1E00 | 4F68 | 6805 | 7586 | 0468 | 9A02 |
| 0000100360 | 3C6C | 7591 | C483 | 8908 | F846 | 468B | 05F8 | 0204 |
| 0000100400 | 4689 | C7FA | FC46 | FFFF | 76FF | FFFC | FA76 | B09A |

THU MAR 14 17:31:54 1991 DB_PI.DLL PAGE 36, LINE 2066

| | | | | | | | | |
|---|---|---|---|---|---|---|---|---|
| 0000100420 | E327 | 8375 | 04C4 | 4689 | 83F6 | F67E | 7700 | E903 |
| 0000100440 | 0026 | 5E8B | C4F6 | FA76 | 8026 | FF78 | 7520 | E903 |
| 0000100460 | 0010 | 5E8B | C4F6 | FA76 | 8026 | FF78 | 7409 | E903 |
| 0000100500 | 0006 | 4EFF | E9F6 | FFD1 | 5EC4 | 8BFA | F676 | C626 |
| 0000100520 | 0000 | 1F6A | 76FF | FFFC | FA76 | 76FF | FF10 | 0E76 |
| 0000100540 | 049A | 8228 | 8370 | 0AC4 | 5EC4 | 260E | 47C6 | 001F |
| 0000100560 | 00B8 | E900 | CJ00 | 5F5E | ED83 | 8B02 | 1FE5 | 4D5D |
| 0000100600 | 1ECB | 9058 | 5545 | EC8B | 8E1E | 81D8 | 0CEC | 5700 |
| 0000100620 | C456 | 0E5E | C02B | 8926 | 0247 | 8926 | FF07 | 0C76 |
| 0000100640 | 76FF | FF0A | 0876 | 76FF | 9A06 | 0874 | 7646 | C483 |
| 0000100660 | 8908 | F846 | 76FF | FF08 | 0676 | 0068 | 6801 | 765B |
| 0000100700 | 0468 | 9A02 | 2D10 | 7663 | C483 | 0B0A | 74D0 | E903 |
| 0000100720 | 0006 | 0CB8 | E900 | 013F | 0A6A | 8868 | 6876 | 0204 |
| 0000100740 | 109A | 903C | 8376 | 06C4 | 4689 | 89FA | FC56 | 468B |
| 0000100760 | 0BFC | FA46 | 0374 | 06E9 | B800 | 000C | 18E9 | 2B01 |
| 0000101000 | 89C0 | FC46 | 4689 | 68FA | 74DA | 0468 | 9A02 | 27B0 |
| 0000101020 | 74EC | C483 | 8904 | F446 | 468B | 48F4 | 4689 | E9F6 |
| 0000101040 | 0003 | 4EFF | 83F6 | F67E | 7D00 | E903 | 0026 | 068E |
| 0000101060 | 3A6A | 5E8B | 26F6 | BF80 | 0204 | 7520 | E903 | 0011 |
| 0000101100 | 5E8B | 26F6 | BF80 | 0204 | 7509 | E903 | 0003 | 03E9 |
| 0000101120 | E900 | FFCE | 068E | 3A6A | 5E8B | 26F4 | 87C6 | 0204 |
| 0000101140 | C700 | F646 | 0000 | 03E9 | FF00 | F646 | 7E81 | 00F6 |
| 0000101160 | 7C01 | E903 | 0026 | 068E | 3A6A | 5E8B | 26F6 | BF80 |
| 0000101200 | 0204 | 7520 | E903 | 0011 | 5E8B | 26F6 | BF80 | 0204 |
| 0000101220 | 7509 | E903 | 0003 | 03E9 | E900 | FFCD | 468B | 05F6 |
| 0000101240 | 0204 | 7C68 | 5077 | B09A | 5127 | 8377 | 04C4 | 4689 |
| 0000101260 | 83F4 | F47E | 7400 | E903 | 000F | 5EC4 | 2B0E | 26C0 |
| 0000101300 | 4789 | 2602 | 0789 | 48E9 | 8B00 | F446 | 5040 | 3E9A |
| 0000101320 | 8C24 | 8377 | 02C4 | 5EC4 | 260E | 0789 | 8926 | 0257 |
| 0000101340 | 5EC4 | 260E | 478B | 2602 | 070B | 0374 | 06E9 | B800 |
| 0000101360 | 0007 | 22E9 | 8B00 | F646 | 0405 | 6802 | 763E | C450 |
| 0000101400 | 0E5E | FF26 | 0277 | FF26 | 9A37 | 2750 | 762C | C483 |
| 0000101420 | B808 | 0000 | 00E9 | 5E00 | 835F | 02ED | E58B | 5D1F |
| 0000101440 | CB4D | 581E | 4590 | 8B55 | 1EEC | D88E | EC81 | 0046 |
| 0000101460 | 5657 | 5EC4 | 260A | 87C7 | 0120 | 0000 | 5EC4 | 2B0A |
| 0000101500 | 26C0 | 8789 | 0124 | 8926 | 2287 | 8D01 | BE46 | 5016 |
| 0000101520 | 468D | 16DE | 1E50 | 5368 | FF05 | 0876 | 76FF | 9A06 |
| 0000101540 | 319A | 7895 | C483 | 8910 | BA46 | 023D | 7400 | E903 |
| 0000101560 | 0122 | 5EC4 | 2606 | 3F80 | 753A | E903 | 0006 | 46FF |
| 0000101600 | E906 | FFEE | 4EFF | C406 | 065E | 8026 | 203F | 0375 |
| 0000101620 | 06E9 | B800 | 01BF | 13E9 | 8301 | 0646 | C402 | 065E |
| 0000101640 | 8026 | 203F | 0374 | 06E9 | FF00 | 0646 | EEE9 | C4FF |
| 0000101660 | 065E | 8026 | 003F | 0375 | 12E9 | C400 | 065E | 8026 |
| 0000101700 | 203F | 0375 | 06E9 | FF00 | 0646 | E2E9 | C4FF | 065E |
| 0000101720 | 8026 | 003F | 0375 | 12E9 | C400 | 065E | 8026 | 203F |
| 0000101740 | 0374 | 06E9 | FF00 | 0646 | E2E9 | C4FF | 0A5E | 8B26 |
| 0000101760 | 2087 | 2601 | 87FF | 0120 | 4689 | C4BC | 0A5E | 6B26 |
| 0000102000 | 2087 | 2201 | C450 | 0A5E | FF26 | 24B7 | 2601 | B7FF |
| 0000102020 | 0122 | A49A | C432 | 8378 | 06C4 | 5EC4 | 260A | 8789 |
| 0000102040 | 0122 | 8926 | 2497 | 8D01 | DE46 | 5016 | 5EC4 | 260A |
| 0000102060 | 878B | 0122 | 8B26 | 2497 | 6B01 | BC4E | 0322 | 52C1 |
| 0000102100 | 9A50 | 2750 | 78D5 | C483 | 1E08 | 5F68 | 8D05 | BE46 |
| 0000102120 | 5016 | 869A | F427 | 8378 | 08C4 | 003D | 7400 | E903 |
| 0000102140 | 0006 | 01B8 | E900 | 0019 | 681E | 0563 | 468D | 16BE |
| 0000102160 | 9A50 | 2786 | 7729 | C483 | 3D08 | 0001 | C01B | 0225 |
| 0000102200 | 6B00 | BC5E | C422 | 0A76 | C426 | 22B4 | 2601 | 4089 |
| 0000102220 | E920 | FEB7 | 7E83 | FFBA | 0374 | 09E9 | B800 | 0000 |
| 0000102240 | 09E9 | E900 | 0006 | 0CB8 | E900 | 0000 | 5F5E | ED83 |
| 0000102260 | 8B02 | 1FE5 | 4D5D | 1ECB | 9058 | 5545 | EC8B | 8E1E |

THU MAR 14 17:31:54 1991 DB_PI.DLL PAGE 37, LINE 2125

| | | | | | | | | |
|---|---|---|---|---|---|---|---|---|
| 0000102300 | 81D8 | 06EC | 5700 | 1E56 | 6768 | FF05 | 0876 | 76FF |
| 0000102320 | 9A06 | 066E | 79ED | C483 | C708 | FC46 | 0000 | 03E9 |
| 0000102340 | FF00 | FC46 | 5EC4 | 8B0A | FC46 | 3926 | 2087 | 7701 |
| 0000102360 | E903 | 0081 | 5EC4 | 260A | 9FC4 | 0122 | 766B | 22FC |
| 0000102400 | 8026 | 0038 | 0375 | 69E9 | 6B00 | FC5E | C422 | 0A76 |
| 0000102420 | C426 | 22B4 | 2601 | 7883 | 0120 | 0374 | 06E9 | B800 |
| 0000102440 | 0575 | 1FE9 | 6B00 | FC5E | C422 | 0A76 | C426 | 22B4 |
| 0000102460 | 2601 | 7883 | 0220 | 0374 | 06E9 | B800 | 0579 | 03E9 |
| 0000102500 | B800 | 057D | 4689 | 1EFA | 76FF | C4FA | 0A5E | 8B26 |
| 0000102520 | 2287 | 2601 | 978B | 0124 | 4E6B | 22FC | C103 | 5052 |
| 0000102540 | 681E | 0582 | 76FF | FF08 | 0676 | 6E9A | 0206 | 837A |
| 0000102560 | 10C4 | 6CE9 | 1EFF | 9468 | FF05 | 0876 | 76FF | 9A06 |
| 0000102600 | 066E | 77E2 | C483 | B808 | 0000 | 00E9 | 5E00 | 835F |
| 0000102620 | 02ED | E58B | 5D1F | CB4D | 581E | 4590 | 8B55 | 1EEC |
| 0000102640 | D88E | EC81 | 001A | 5657 | 006A | 006A | 089A | 4239 |
| 0000102660 | 837A | 04C4 | 4689 | 89FA | FC56 | 468D | 16FA | 9A50 |
| 0000102700 | 3610 | 7A62 | C483 | 5204 | 1E50 | 9668 | 6A05 | 6A64 |
| 0000102720 | 1E64 | A268 | 1E05 | A768 | FF05 | 0876 | 76FF | 9A06 |
| 0000102740 | 066E | 7A74 | C483 | 1E18 | C168 | FF05 | 0876 | 76FF |
| 0000102760 | 9A06 | 066E | 7A98 | C483 | FF08 | 0876 | 76FF | FF06 |
| 0000103000 | 0C76 | 76FF | 9A0A | 8672 | 7B1C | C483 | FF08 | 0876 |
| 0000103020 | 76FF | 6A06 | 9A0A | 1D60 | 7AAA | C483 | 1E06 | C968 |
| 0000103040 | FF05 | 0876 | 76FF | 9A06 | 066E | 7B2C | C483 | FF08 |
| 0000103060 | 0876 | 76FF | C406 | 0A5E | 8326 | 207F | 7428 | E903 |
| 0000103100 | 0006 | D1B8 | E905 | 004F | 5EC4 | 260A | 7F83 | 2920 |
| 0000103120 | 0374 | 06E9 | B800 | 05D4 | 3CE9 | C400 | 0A5E | 8326 |
| 0000103140 | 207F | 742A | E903 | 0006 | D7B8 | E905 | 0029 | 5EC4 |
| 0000103160 | 260A | 7F83 | 2B20 | 0374 | 06E9 | B800 | 05DA | 16E9 |
| 0000103200 | C400 | 0A5E | 8326 | 207F | 742C | E903 | 0006 | DDB8 |
| 0000103220 | E905 | 0003 | E0B8 | 1E05 | 9A50 | 8672 | 7B57 | C483 |
| 0000103240 | FF08 | 0876 | 76FF | 6A06 | 9A0A | 1D60 | 7B3E | C483 |
| 0000103260 | 1E06 | E868 | FF05 | 0876 | 76FF | 9A06 | 066E | 7B67 |
| 0000103300 | C483 | FF08 | 0876 | 76FF | 8B06 | 0A46 | 568B | 050C |
| 0000103320 | 0022 | 5052 | 729A | 2386 | 836B | 08C4 | 76FF | FF08 |
| 0000103340 | 0676 | 0A6A | 609A | 541D | 8379 | 06C4 | 76FF | FF08 |
| 0000103360 | 0676 | 0A6A | 609A | 941D | 837B | 06C4 | 5EC4 | 260A |
| 0000103400 | 77FF | 2644 | 77FF | 1E42 | F268 | FF05 | 0876 | 76FF |
| 0000103420 | 9A06 | 066E | 7BA6 | C483 | 1E0C | FF68 | FF05 | 0876 |
| 0000103440 | 76FF | 9A06 | 066E | 7BCF | C483 | FF08 | 0876 | 76FF |
| 0000103460 | 8B06 | 0A46 | 568B | 050C | 0046 | 5052 | 729A | FA86 |
| 0000103500 | 837B | 08C4 | 76FF | FF08 | 0676 | 0A6A | 609A | E11D |
| 0000103520 | 837B | 06C4 | 681E | 060B | 76FF | FF08 | 0676 | 6E9A |
| 0000103540 | 0A06 | 837C | 08C4 | 76FF | FF08 | 0676 | 468B | 8B0A |
| 0000103560 | 0C56 | AA05 | 5200 | 9A50 | 8672 | 7C63 | C483 | FF08 |
| 0000103600 | 0876 | 76FF | 6A06 | 9A0A | 1D60 | 7C1A | C483 | FF06 |
| 0000103620 | 0876 | 76FF | 6A06 | 9A0A | 1D60 | 7C2C | C483 | 1E06 |
| 0000103640 | 1368 | FF06 | 0876 | 76FF | 9A06 | 066E | 7C73 | C483 |
| 0000103660 | FF08 | 0876 | 76FF | C406 | 0A5E | 8B26 | 1887 | 2601 |
| 0000103700 | 870B | 0116 | 0374 | 08E9 | B800 | 061E | DA8C | 0DE9 |
| 0000103720 | C400 | 0A5E | 8B26 | 1687 | 2601 | 978B | 0118 | 5052 |
| 0000103740 | 729A | BC86 | 837C | 08C4 | 76FF | FF08 | 0676 | 0A6A |
| 0000103760 | 609A | 851D | 837C | 06C4 | 681E | 061F | 76FF | FF08 |
| 0000104000 | 0676 | 6E9A | CC06 | 837C | 08C4 | 76FF | FF08 | 0676 |
| 0000104020 | 5EC4 | 260A | 878B | 011C | 0B26 | 1A87 | 7401 | E903 |
| 0000104040 | 0008 | 2AB8 | 8C06 | E9DA | 000D | 5EC4 | 260A | 878B |
| 0000104060 | 011A | 8B26 | 1C97 | 5201 | 9A50 | 8672 | 7D25 | C483 |
| 0000104100 | FF08 | 0876 | 76FF | 6A06 | 9A0A | 1D60 | 7CDC | C483 |
| 0000104120 | FF06 | 0876 | 76FF | 6A06 | 9A0A | 1D60 | 7CEE | C483 |
| 0000104140 | 1E06 | 2B68 | FF06 | 0876 | 76FF | 9A06 | 066E | 7D35 |

THU MAR 14 17:31:54 1991 DB_PI.DLL PAGE 38, LINE 2184

| | | | | | | | | |
|---|---|---|---|---|---|---|---|---|
| 0000104160 | C483 | FF08 | 0876 | 76FF | C406 | 0A5E | 8B26 | 1087 |
| 0000104200 | 2601 | 870B | 010E | 0374 | 08E9 | B800 | 063A | DA8C |
| 0000104220 | 0DE9 | C400 | 0A5E | 8B26 | 0E87 | 2601 | 978B | 0110 |
| 0000104240 | 5052 | 729A | 7E86 | 837D | 08C4 | 76FF | FF08 | 0676 |
| 0000104260 | 0A6A | 609A | 471D | 837D | 06C4 | 681E | 063B | 76FF |
| 0000104300 | FF08 | 0676 | 6E9A | 8E06 | 837D | 08C4 | 76FF | FF08 |
| 0000104320 | 0676 | 5EC4 | 260A | 878B | 0114 | 0B26 | 1287 | 7401 |
| 0000104340 | E903 | 0008 | 47B8 | 8C06 | E9DA | 000D | 5EC4 | 260A |
| 0000104360 | 878B | 0112 | 8B26 | 1497 | 5201 | 9A50 | 8672 | 7A88 |
| 0000104400 | C483 | FF08 | 0876 | 76FF | 6A06 | 9A0A | 1D60 | 7D9E |
| 0000104420 | C483 | FF06 | 0876 | 76FF | 6A06 | 9A0A | 1D60 | 7A2F |
| 0000104440 | C483 | FF06 | 0C76 | 76FF | FF0A | 0876 | 76FF | 9A06 |
| 0000104460 | 7937 | 6E9A | C483 | 8908 | F846 | 468B | E9F8 | 0000 |
| 0000104500 | 5F5E | ED83 | 8B02 | 1FE5 | 4D5D | 1ECB | 9058 | 5545 |
| 0000104520 | EC8B | 8E1E | 81D8 | 3AEC | 5702 | 1E56 | A7B8 | 8E73 |
| 0000104540 | C7D8 | F646 | 0648 | 5E8C | C7F8 | E286 | 01FD | 2B01 |
| 0000104560 | 89C0 | D486 | 89FD | D286 | 8EFD | 6606 | 263A | 3E83 |
| 0000104600 | 7EB3 | 7500 | E903 | 001E | 36FF | 0510 | 36FF | 050E |
| 0000104620 | 868D | FDCA | 5016 | DD9A | 0073 | 8300 | 08C4 | 003D |
| 0000104640 | 7400 | E903 | 000F | 068E | 3A68 | 8326 | CC3E | 007E |
| 0000104660 | 0375 | 40E9 | 1E00 | 4F68 | 8D06 | D686 | 16FD | 8D50 |
| 0000104700 | CA86 | 16FD | 8D50 | F086 | 16FE | 6850 | 022B | 681E |
| 0000104720 | 065A | 36FF | 050C | 36FF | 050A | 36FF | 0510 | 36FF |
| 0000104740 | 050E | 269A | 0074 | 8300 | 1EC4 | 8689 | FEF0 | 9689 |
| 0000104760 | FEF2 | 0AE9 | 2B00 | 89C0 | F286 | 89FE | F086 | 2BFE |
| 0000105000 | 89C0 | EE86 | 89FD | EC86 | 8DFD | FA46 | 5016 | 006A |
| 0000105020 | 76FF | FF0C | 0A76 | 649A | 55CF | 8381 | 0AC4 | 8689 |
| 0000105040 | FDEA | BE83 | FDEA | 7500 | E903 | 008A | 068E | 3A66 |
| 0000105060 | 8326 | 603E | 007F | 0375 | 0AE9 | 8300 | CEBE | FEFD |
| 0000105100 | 0374 | 0FE9 | 8E00 | 6806 | 263A | 3E83 | 7F79 | 7500 |
| 0000105120 | E903 | 005B | 868B | FDEA | 8689 | FDD0 | B6FF | FDD4 |
| 0000105140 | B6FF | FDD2 | 868D | FDD0 | 5016 | B6FF | FDE2 | 76FF |
| 0000105160 | FFF8 | F676 | 8E8D | FDD6 | 5116 | 8E8D | FEF0 | 5116 |
| 0000105200 | 8E8D | FDCA | 5116 | 681E | 065A | 3C68 | FF02 | 0C36 |
| 0000105220 | FF05 | 0A36 | FF05 | 1036 | FF05 | 0E36 | 9A05 | 7FCB |
| 0000105240 | 0000 | C483 | 8B28 | D086 | E9FD | 0485 | 07E9 | 8B00 |
| 0000105260 | EA86 | E9FD | 047B | 5EC4 | 26FA | 77FF | 2602 | 37FF |
| 0000105300 | 868D | FDC6 | 5016 | 069A | 2639 | 8981 | EA86 | 83FD |
| 0000105320 | EABE | 00FD | 0375 | 8AE9 | 8E00 | 6606 | 263A | 3E83 |
| 0000105340 | 8054 | 7500 | E903 | 000A | BE83 | FDCE | 74FE | E903 |
| 0000105360 | 000F | 068E | 3A68 | 8326 | 6D3E | 0080 | 0375 | 5BE9 |
| 0000105400 | 8B00 | EA86 | 89FD | D086 | FFFD | D4B6 | FFFD | D2B6 |
| 0000105420 | 8DFD | D086 | 16FD | FF50 | E2B6 | FFFD | F876 | 76FF |
| 0000105440 | 8DF6 | D68E | 16FD | 8D51 | F08E | 16FE | 8D51 | CA8E |
| 0000105460 | 16FD | 1E51 | 5A68 | 6806 | 0240 | 36FF | 050C | 36FF |
| 0000105500 | 050A | 36FF | 0510 | 36FF | 050E | BD9A | 0080 | 8300 |
| 0000105520 | 28C4 | 868B | FDD0 | D8E9 | E903 | 0007 | 868B | FDEA |
| 0000105540 | CEE9 | 8B03 | FA46 | 568B | 05FC | 0034 | 5052 | 868D |
| 0000105560 | FEF6 | 5016 | 509A | 0927 | 8380 | 08C4 | 681E | 0656 |
| 0000105600 | 868D | FEF6 | 5016 | 0A9A | 2227 | 8380 | 08C4 | 468B |
| 0000105620 | 8BFA | FC56 | 5C05 | 5201 | 8D50 | F686 | 16FE | 9A50 |
| 0000105640 | 270A | 802F | C483 | 6808 | 0126 | 016A | 769A | FD33 |
| 0000105660 | 8380 | 04C4 | 5EC4 | 2606 | 0789 | 8926 | 0257 | 5EC4 |
| 0000105700 | 2606 | 478B | 2602 | 070B | 0374 | 87E9 | 8E00 | 6606 |
| 0000105720 | 263A | 3E83 | 73C7 | 7500 | E903 | 000A | BE83 | FDCE |
| 0000105740 | 74FE | E903 | 000F | 068E | 3A68 | 8326 | F33E | 0073 |
| 0000105760 | 0375 | 59E9 | C700 | D086 | 07FD | FF00 | D4B6 | FFFD |
| 0000106000 | D2B6 | 8DFD | D086 | 16FD | FF50 | E2B6 | FFFD | F876 |
| 0000106020 | 76FF | 8DF6 | D68E | 16FD | 8D51 | F08E | 16FE | 8D51 |

THU MAR 14 17:31:54 1991 DB_PI.DLL PAGE 39, LINE 2243

| | | | | | | | | |
|---|---|---|---|---|---|---|---|---|
| 0000106040 | CA8E | 16FD | 1E51 | 5A68 | 6806 | 0247 | 36FF | 050C |
| 0000106060 | 36FF | 050A | 36FF | 0510 | 36FF | 050E | A59A | 0074 |
| 0000106100 | 8300 | 28C4 | 868B | FDD0 | E6E9 | E902 | 0006 | 07B8 |
| 0000106120 | E900 | 02DD | 5EC4 | 26FA | 478A | 2A03 | 3DE4 | 002A |
| 0000106140 | 0375 | 20E9 | 8B00 | FA46 | 568B | 05FC | 0004 | 5052 |
| 0000106160 | 5EC4 | 2606 | 77FF | 2602 | 37FF | 509A | 7927 | 8381 |
| 0000106200 | 08C4 | 38E9 | 1E00 | 5868 | C406 | FA5E | FF26 | 0277 |
| 0000106220 | FF26 | 8D37 | EC86 | 16FD | C450 | 065E | FF26 | 0277 |
| 0000106240 | FF26 | 9A37 | 43B5 | 7DB2 | 8689 | FDEA | BE83 | FDEA |
| 0000106260 | 7500 | E903 | 0007 | 868B | FDEA | 74E9 | 8A02 | 0D46 |
| 0000106300 | E42A | 5EC4 | 2606 | 1FC4 | 8926 | 2047 | 868D | FDE4 |
| 0000106320 | 5016 | C79A | D7CE | 836F | 04C4 | 868B | FDE4 | 968B |
| 0000106340 | FDE6 | 0405 | 5200 | C450 | 065E | 8B26 | 2607 | 578B |
| 0000106360 | 0502 | 0022 | 5052 | 509A | 8527 | 8381 | 08C4 | 006A |
| 0000106400 | 006A | 089A | 7739 | 837B | 04C4 | 5EC4 | 2606 | 1FC4 |
| 0000106420 | 8926 | 4247 | 8926 | 4457 | 5EC4 | 2606 | 1FC4 | C626 |
| 0000106440 | 4647 | C400 | 065E | C426 | 261F | 87C6 | 00AA | C400 |
| 0000106460 | 065E | C426 | 2B1F | 26C0 | 8789 | 0110 | 8926 | 0E87 |
| 0000106500 | C401 | 065E | C426 | 2B1F | 26C0 | 8789 | 0114 | 8926 |
| 0000106520 | 1287 | C401 | 065E | C426 | 2B1F | 26C0 | 8789 | 0118 |
| 0000106540 | 8926 | 1687 | C401 | 065E | C426 | 2B1F | 26C0 | 8789 |
| 0000106560 | 011C | 8926 | 1A87 | C401 | 065E | C426 | 261F | 87C7 |
| 0000106600 | 0120 | 0000 | 5EC4 | 2606 | 1FC4 | C02B | 8926 | 2487 |
| 0000106620 | 2601 | 8789 | 0122 | 2F6A | 868D | FEF6 | 5016 | CF9A |
| 0000106640 | C629 | 8371 | 06C4 | 003D | 7400 | E903 | 0087 | 068E |
| 0000106660 | 3A66 | 8326 | 2E3E | 0083 | 0375 | 0AE9 | 8300 | CEBE |
| 0000106700 | FEFD | 0374 | 0FE9 | 8E00 | 6806 | 263A | 3E83 | 8347 |
| 0000106720 | 7500 | E903 | 0059 | 86C7 | FDD0 | 0000 | B6FF | FDD4 |
| 0000106740 | B6FF | FDD2 | 868D | FDD0 | 5016 | B6FF | FDE2 | 76FF |
| 0000106760 | FFF8 | F676 | 8E8D | FDD6 | 5116 | 8E8D | FEF0 | 5116 |
| 0000107000 | 8E8D | FDCA | 5116 | 681E | 065A | 6368 | FF02 | 0C36 |
| 0000107020 | FF05 | 0A36 | FF05 | 1036 | FF05 | 0E36 | 9A05 | 8399 |
| 0000107040 | 0000 | C483 | 8B28 | D086 | E9FD | 0105 | 06E9 | B800 |
| 0000107060 | 0000 | FCE9 | 8D00 | E886 | 16FD | 8D50 | F486 | 16FE |
| 0000107100 | 8D50 | F086 | 16FD | 6850 | 82CE | FF68 | 68FF | 8319 |
| 0000107120 | FF68 | C4FF | 065E | FF26 | 0277 | FF26 | 6A37 | 8D01 |
| 0000107140 | F686 | 16FE | 9A50 | 7B98 | 7BBF | C483 | 891E | EA86 |
| 0000107160 | 81FD | EABE | ABFD | 7401 | E903 | 0006 | 86C7 | FDEA |
| 0000107200 | 0000 | BE83 | FDEA | 7500 | E903 | 001B | 5EC4 | 2606 |
| 0000107220 | 77FF | 2602 | 37FF | 399A | 4989 | C47F | 065E | C02B |
| 0000107240 | 8926 | 0247 | 8926 | 8E07 | 6606 | 263A | 3E83 | 7E00 |
| 0000107260 | 7500 | E903 | 000A | BE83 | FDCE | 74FE | E903 | 000F |
| 0000107300 | 068E | 3A68 | 8326 | 2D3E | 007E | 0375 | 5BE9 | 8B00 |
| 0000107320 | EA86 | 89FD | D086 | FFFD | D4B6 | FFFD | D2B6 | 8DFD |
| 0000107340 | D086 | 16FD | FF50 | E2B6 | FFFD | F876 | 76FF | 8DF6 |
| 0000107360 | D68E | 16FD | 8D51 | F08E | 16FE | 8D51 | CA8E | 16FD |
| 0000107400 | 1E51 | 5A68 | 6806 | 0271 | 36FF | 050C | 36FF | 050A |
| 0000107420 | 36FF | 0510 | 36FF | 050E | 1E9A | 007F | 8300 | 28C4 |
| 0000107440 | 868B | FDD0 | 0AE9 | E900 | 0007 | 868B | FDEA | 00E9 |
| 0000107460 | 1F00 | 5F5E | ED83 | 8B02 | 1FE5 | 4D5D | 08CA | 1E00 |
| 0000107500 | 9058 | 5545 | EC8B | 8E1E | 81D8 | 06EC | 5700 | 1E56 |
| 0000107520 | 6C68 | FF06 | 0C76 | 76FF | 9A0A | 2786 | 8416 | C483 |
| 0000107540 | 3D08 | 0000 | 0374 | 40E9 | FF00 | 1076 | 76FF | 6A0E |
| 0000107560 | 9A01 | 85EB | 8460 | C483 | C406 | 0E5E | 8026 | 003F |
| 0000107600 | 0375 | 1EE9 | 6A00 | FF1F | 1076 | 76FF | FF0E | 0876 |
| 0000107620 | 76FF | 9A06 | 2804 | 8436 | C483 | C40A | 065E | C626 |
| 0000107640 | 1F47 | B800 | 0000 | D0E9 | 1E04 | 7168 | FF06 | 0C76 |
| 0000107660 | 76FF | 9A0A | 2786 | 8472 | C483 | 3D08 | 0000 | 0374 |
| 0000107700 | 7AE9 | C400 | 0E5E | 8026 | 003F | 0374 | 06E9 | B800 |

THU MAR 14 17:31:54 1991 DB_PI.DLL PAGE 40, LINE 2302

| | | | | | | | | |
|---|---|---|---|---|---|---|---|---|
| 0000107720 | 0000 | A4E9 | FF04 | 1076 | 76FF | 6A0E | 9A01 | 85EB |
| 0000107740 | 84E2 | C483 | 1E06 | 7668 | FF06 | 1076 | 76FF | 9A0E |
| 0000107760 | 2786 | 849B | C483 | 3D08 | 0000 | 0374 | 0FE9 | C400 |
| 0000110000 | 065E | C726 | 2047 | 002A | 00B8 | E900 | 046B | 681E |
| 0000110020 | 0679 | 76FF | FF10 | 0E76 | 869A | CA27 | 8384 | 08C4 |
| 0000110040 | 003D | 7400 | E903 | 000F | 5EC4 | 2606 | 47C7 | 2B20 |
| 0000110060 | B800 | 0000 | 42E9 | B804 | 01BF | 3CE9 | 1E04 | 7C68 |
| 0000110100 | FF06 | 0C76 | 76FF | 9A0A | 2786 | 850F | C483 | 3D08 |
| 0000110120 | 0000 | 0374 | 4BE9 | FF00 | 1076 | 76FF | 6A0E | 9A00 |
| 0000110140 | 85EB | 85AD | C483 | C406 | 0E5E | 8026 | 003F | 0374 |
| 0000110160 | 06E9 | B800 | 0000 | 00E9 | 6A04 | FF1F | 1076 | 76FF |
| 0000110200 | 8B0E | 0646 | 568B | 0508 | 0022 | 5052 | 049A | 2F28 |
| 0000110220 | 8385 | 0AC4 | 5EC4 | 2606 | 47C6 | 0041 | 00B8 | E900 |
| 0000110240 | 03D7 | 681E | 0683 | 76FF | FF0C | 0A76 | 869A | 6027 |
| 0000110260 | 8385 | 08C4 | 003D | 7400 | E903 | 004C | 5EC4 | 260E |
| 0000110300 | 3F80 | 7400 | E903 | 0006 | 00B8 | E900 | 03AB | 468D |
| 0000110320 | 16FA | 1E50 | 8868 | FF06 | 1076 | 76FF | 9A0E | 319A |
| 0000110340 | 8595 | C483 | 480C | 0375 | 06E9 | B800 | 01BF | 88E9 |
| 0000110360 | 8B03 | FA46 | 568B | C4FC | 065E | 8926 | 4247 | 8926 |
| 0000110400 | 4457 | 00B8 | E900 | 0371 | 681E | 068C | 76FF | FF0C |
| 0000110420 | 0A76 | 869A | C827 | 8385 | 08C4 | 003D | 7400 | E903 |
| 0000110440 | 003A | 76FF | FF10 | 0E76 | 006A | EB9A | 0185 | 8386 |
| 0000110460 | 06C4 | 636A | 76FF | FF10 | 0E76 | 468B | 8B06 | 0856 |
| 0000110500 | 4605 | 5200 | 9A50 | 2804 | 85E9 | C483 | C40A | 065E |
| 0000110520 | C626 | A987 | 0000 | 00B8 | E900 | 031D | 681E | 0695 |
| 0000110540 | 76FF | FF0C | 0A76 | 869A | 1C27 | 8386 | 08C4 | 003D |
| 0000110560 | 7400 | E903 | 003A | 76FF | FF10 | 0E76 | 006A | EB9A |
| 0000110600 | 5585 | 8386 | 06C4 | 636A | 76FF | FF10 | 0E76 | 468B |
| 0000110620 | 8B06 | 0856 | AA05 | 5200 | 9A50 | 2804 | 863D | C483 |
| 0000110640 | C40A | 065E | C626 | 0D87 | 0001 | 00B8 | E900 | 02C9 |
| 0000110660 | 681E | 069A | 76FF | FF0C | 0A76 | 869A | 7727 | 8386 |
| 0000110700 | 08C4 | 003D | 7400 | E903 | 0082 | 76FF | FF10 | 0E76 |
| 0000110720 | 006A | EB9A | E885 | 8382 | 06C4 | 5EC4 | 260E | 3F80 |
| 0000110740 | 7400 | E903 | 0006 | 00B8 | E900 | 028D | 016A | 76FF |
| 0000110760 | FF10 | 0E76 | B09A | 8127 | 8386 | 04C4 | 5040 | 769A |
| 0000111000 | F733 | 837F | 04C4 | 5EC4 | 2606 | 8789 | 0116 | 8926 |
| 0000111020 | 1897 | C401 | 065E | 8B26 | 1887 | 2601 | 870B | 0116 |
| 0000111040 | 0374 | 06E9 | B800 | 0007 | 4EE9 | FF02 | 1076 | 76FF |
| 0000111060 | C40E | 065E | FF26 | 18B7 | 2601 | B7FF | 0116 | 509A |
| 0000111100 | D927 | 8386 | 08C4 | 00B8 | E900 | 022D | 681E | 06A2 |
| 0000111120 | 76FF | FF0C | 0A76 | 869A | 1327 | 8387 | 08C4 | 003D |
| 0000111140 | 7400 | E903 | 0082 | 76FF | FF10 | 0E76 | 006A | EB9A |
| 0000111160 | 8D85 | 8387 | 06C4 | 5EC4 | 260E | 3F80 | 7400 | E903 |
| 0000111200 | 0006 | 00B8 | E900 | 01F1 | 016A | 76FF | FF10 | 0E76 |
| 0000111220 | B09A | 1D27 | 8387 | 04C4 | 5040 | 769A | 5D33 | 8387 |
| 0000111240 | 04C4 | 5EC4 | 2606 | 8789 | 011A | 8926 | 1C97 | C401 |
| 0000111260 | 065E | 8B26 | 1C87 | 2601 | 870B | 011A | 0374 | 06E9 |
| 0000111300 | B800 | 0007 | B2E9 | FF01 | 1076 | 76FF | C40E | 065E |
| 0000111320 | FF26 | 1CB7 | 2601 | B7FF | 011A | 509A | 7527 | 8387 |
| 0000111340 | 08C4 | 00B8 | E900 | 0191 | 681E | 06AA | 76FF | FF0C |
| 0000111360 | 0A76 | 869A | AF27 | 8387 | 08C4 | 003D | 7400 | E903 |
| 0000111400 | 0082 | 76FF | FF10 | 0E76 | 006A | EB9A | 2985 | 8388 |
| 0000111420 | 06C4 | 5EC4 | 260E | 3F80 | 7400 | E903 | 0006 | 00B8 |
| 0000111440 | E900 | 0155 | 016A | 76FF | FF10 | 0E76 | B09A | B927 |
| 0000111460 | 8387 | 04C4 | 5040 | 769A | F933 | 8387 | 04C4 | 5EC4 |
| 0000111500 | 2606 | 8789 | 010E | 8926 | 1097 | C401 | 065E | 8B26 |
| 0000111520 | 1087 | 2601 | 870B | 010E | 0374 | 06E9 | B800 | 0007 |
| 0000111540 | 16E9 | FF01 | 1076 | 76FF | C40E | 065E | FF26 | 10B7 |
| 0000111560 | 2601 | B7FF | 010E | 509A | 1127 | 8388 | 08C4 | 00B8 |

THU MAR 14 17:31:54 1991 DB_PI.DLL PAGE 41, LINE 2361

| | | | | | | | | |
|---|---|---|---|---|---|---|---|---|
| 0000111600 | E900 | 00F5 | 681E | 06B6 | 76FF | FF0C | 0A76 | 869A |
| 0000111620 | 4B27 | 8388 | 08C4 | 003D | 7400 | E903 | 0082 | 76FF |
| 0000111640 | FF10 | 0E76 | 006A | EB9A | C585 | 8388 | 06C4 | 5EC4 |
| 0000111660 | 260E | 3F80 | 7400 | E903 | 0006 | 00B8 | E900 | 00B9 |
| 0000111700 | 016A | 76FF | FF10 | 0E76 | B09A | 5527 | 8388 | 04C4 |
| 0000111720 | 5040 | 769A | 9533 | 8388 | 04C4 | 5EC4 | 2606 | 8789 |
| 0000111740 | 0112 | 8926 | 1497 | C401 | 065E | 8B26 | 1487 | 2601 |
| 0000111760 | 870B | 0112 | 0374 | 06E9 | B800 | 0007 | 7AE9 | FF00 |
| 0000112000 | 1076 | 76FF | C40E | 065E | FF26 | 14B7 | 2601 | B7FF |
| 0000112020 | 0112 | 509A | AD27 | 8388 | 08C4 | 00B8 | E900 | 0059 |
| 0000112040 | 681E | 06BF | 76FF | FF0C | 0A76 | 869A | DC27 | 8383 |
| 0000112060 | 08C4 | 003D | 7400 | E903 | 0039 | 76FF | FF10 | 0E76 |
| 0000112100 | 006A | EB9A | F485 | 8383 | 06C4 | 5EC4 | 260E | 3F80 |
| 0000112120 | 7400 | E903 | 0006 | 00B8 | E900 | 001D | 76FF | FF08 |
| 0000112140 | 0676 | 76FF | FF10 | 0E76 | A29A | C877 | 8382 | 08C4 |
| 0000112160 | 06E9 | B800 | 01BF | 00E9 | 5E00 | 835F | 02ED | E58B |
| 0000112200 | 5D1F | CB4D | 581E | 4590 | 8B55 | 1EEC | D88E | EC81 |
| 0000112220 | 0000 | 5657 | 5EC4 | 2B0E | 26C0 | 4789 | 2602 | 0789 |
| 0000112240 | 5EC4 | 2612 | 07C7 | 0000 | ABB8 | E901 | 0000 | 5F5E |
| 0000112260 | ED83 | 8B02 | 1FE5 | 4D5D | 1ECB | 9058 | 5545 | EC8B |
| 0000112300 | 8E1E | 81D8 | 24EC | 5700 | 1E56 | DDB8 | 8E7D | C7D8 |
| 0000112320 | FA46 | 06CA | 5E8C | C7FC | F446 | 0000 | C02B | 4689 |
| 0000112340 | 89E6 | E446 | 068E | 3A66 | 8326 | 6B3E | 008A | 0375 |
| 0000112360 | 1DE9 | FF00 | 1036 | FF05 | 0E36 | 8D05 | DC46 | 5016 |
| 0000112400 | 179A | 007E | 8300 | 08C4 | 003D | 7400 | E903 | 000F |
| 0000112420 | 068E | 3A68 | 8326 | 833E | 008A | 0375 | 3BE9 | 1E00 |
| 0000112440 | CE68 | 8D06 | E846 | 5016 | 468D | 16DC | 8D50 | F646 |
| 0000112460 | 5016 | 1A68 | 1E03 | D268 | FF06 | 0C36 | FF05 | 0A36 |
| 0000112500 | FF05 | 1036 | FF05 | 0E36 | 9A05 | 7E63 | 0000 | C483 |
| 0000112520 | 891E | F646 | 5689 | E9F8 | 0008 | C02B | 4689 | 89F8 |
| 0000112540 | F646 | 468B | 0B08 | 0646 | 0375 | 77E9 | C400 | 065E |
| 0000112560 | FF26 | 10B7 | 2601 | B7FF | 010E | 489A | 1224 | 838A |
| 0000112600 | 04C4 | 5EC4 | 2606 | B7FF | 0114 | FF26 | 12B7 | 9A01 |
| 0000112620 | 2448 | 8A27 | C483 | C404 | 065E | FF26 | 18B7 | 2601 |
| 0000112640 | B7FF | 0116 | 489A | 3C24 | 838A | 04C4 | 5EC4 | 2606 |
| 0000112660 | B7FF | 011C | FF26 | 1AB7 | 9A01 | 2448 | 8A51 | C483 |
| 0000112700 | C404 | 065E | FF26 | 24B7 | 2601 | B7FF | 0122 | 489A |
| 0000112720 | 5F24 | 838A | 04C4 | 76FF | FF08 | 0676 | 489A | C124 |
| 0000112740 | 8386 | 04C4 | 068E | 3A66 | 8326 | 353E | 0082 | 0375 |
| 0000112760 | 09E9 | 8300 | E07E | 74FE | E903 | 000F | 068E | 3A68 |
| 0000113000 | 8326 | 4E3E | 0082 | 0375 | 39E9 | 8D00 | E846 | 5016 |
| 0000113020 | 468D | 16F6 | 8D50 | DC46 | 5016 | 681E | 06D2 | 2568 |
| 0000113040 | FF03 | 0C36 | FF05 | 0A36 | FF05 | 1036 | FF05 | 0E36 |
| 0000113060 | 9A05 | 353D | 0000 | C483 | C71A | E246 | 0000 | 06E9 |
| 0000113100 | E900 | 0003 | 00E9 | 1F00 | 5F5E | ED83 | 8B02 | 1FE5 |
| 0000113120 | 4D5D | 04CA | 1E00 | 9058 | 5545 | EC8B | 8E1E | 81D8 |
| 0000113140 | 2EEC | 5701 | 1E56 | 4BB8 | 8E89 | C7D8 | F646 | 06E2 |
| 0000113160 | 5E8C | C7F8 | EA46 | 0101 | C02B | 4689 | 89DC | DA46 |
| 0000113200 | 068E | 3A66 | 8326 | 6B3E | 0089 | 0375 | 1DE9 | FF00 |
| 0000113220 | 1036 | FF05 | 0E36 | 8D05 | D246 | 5016 | 819A | 0089 |
| 0000113240 | 8300 | 08C4 | 003D | 7400 | E903 | 000F | 068E | 3A68 |
| 0000113260 | 8326 | 973E | 0089 | 0375 | 3BE9 | 1E00 | E968 | 8D06 |
| 0000113300 | DE46 | 5016 | 468D | 16D2 | 8D50 | F246 | 5016 | 3E68 |
| 0000113320 | 1E03 | F668 | FF06 | 0C36 | FF05 | 0A36 | FF05 | 1036 |
| 0000113340 | FF05 | 0E36 | 9A05 | 89CA | 0000 | C483 | 891E | F246 |
| 0000113360 | 5689 | E9F4 | 0008 | C02B | 4689 | 89F4 | F246 | C02B |
| 0000113400 | 4689 | 89F0 | EE46 | 468D | 16FA | 6A50 | FF02 | 0C76 |
| 0000113420 | 76FF | 9A0A | CF64 | 7E99 | C483 | 890A | EC46 | 7E83 |
| 0000113440 | 00EC | 0375 | 7EE9 | 8E00 | 6606 | 263A | 3E83 | 8C93 |

THU MAR 14 17:31:54 1991 DB_PI.DLL PAGE 42, LINE 2420

| | | | | | | | | |
|---|---|---|---|---|---|---|---|---|
| 0000113460 | 7500 | E903 | 0009 | 7E83 | FED6 | 0374 | 0FE9 | 8E00 |
| 0000113500 | 6806 | 263A | 3E83 | 8CAB | 7500 | E903 | 0051 | 468B |
| 0000113520 | 89EC | D846 | 76FF | FFDC | DA76 | 468D | 16D8 | FF50 |
| 0000113540 | EA76 | 76FF | FFF8 | F676 | 4E8D | 16DE | 8D51 | F24E |
| 0000113560 | 5116 | 4E8D | 16D2 | 1E51 | F668 | 6806 | 034B | 36FF |
| 0000113600 | 050C | 36FF | 050A | 36FF | 0510 | 36FF | 050E | F39A |
| 0000113620 | 008C | 8300 | 28C4 | 468B | E9D8 | 0215 | 06E9 | 8B00 |
| 0000113640 | EC46 | 0CE9 | 8B02 | FA46 | 568B | 05FC | 0034 | 5052 |
| 0000113660 | 868D | FED2 | 5016 | 509A | 4B27 | 838C | 08C4 | 681E |
| 0000113700 | 06F0 | 868D | FED2 | 5016 | 0A9A | 6427 | 838C | 08C4 |
| 0000113720 | 468B | 8BFA | FC56 | 5C05 | 5201 | 8D50 | D286 | 16FE |
| 0000113740 | 9A50 | 270A | 8C76 | C483 | 1E08 | F268 | 8D06 | D286 |
| 0000113760 | 16FE | 9A50 | 0656 | 8D29 | C483 | 8908 | EE46 | 5689 |
| 0000114000 | 8BF0 | F046 | 460B | 74EE | E903 | 007D | 068E | 3A66 |
| 0000114020 | 8326 | 3D3E | 008D | 0375 | 09E9 | 8300 | D67E | 74FE |
| 0000114040 | E903 | 000F | 068E | 3A68 | 8326 | 553E | 008D | 0375 |
| 0000114060 | 50E9 | C700 | D846 | 0008 | 76FF | FFDC | DA76 | 468D |
| 0000114100 | 16D8 | FF50 | EA76 | 76FF | FFF8 | F676 | 4E8D | 16DE |
| 0000114120 | 8D51 | F24E | 5116 | 4E8D | 16D2 | 1E51 | F668 | 6806 |
| 0000114140 | 0355 | 36FF | 050C | 36FF | 050A | 36FF | 0510 | 36FF |
| 0000114160 | 050E | 9D9A | 008D | 8300 | 28C4 | 468B | E9D8 | 0131 |
| 0000114200 | 06E9 | B800 | 0008 | 28E9 | FF01 | 0876 | 76FF | FF06 |
| 0000114220 | F076 | 76FF | 9AEE | 7A18 | 88EB | C483 | 8908 | EC46 |
| 0000114240 | 76FF | FFF0 | EE76 | 029A | FD05 | 8389 | 04C4 | 003D |
| 0000114260 | 7500 | E903 | 007D | 068E | 3A66 | 8326 | BA3E | 008D |
| 0000114300 | 0375 | 09E9 | 8300 | D67E | 74FE | E903 | 000F | 068E |
| 0000114320 | 3A68 | 8326 | D23E | 008D | 0375 | 50E9 | C700 | D846 |
| 0000114340 | 0009 | 76FF | FFDC | DA76 | 468D | 16D8 | FF50 | EA76 |
| 0000114360 | 76FF | FFF8 | F676 | 4E8D | 16DE | 8D51 | F24E | 5116 |
| 0000114400 | 4E8D | 16D2 | 1E51 | F668 | 6806 | 035B | 36FF | 050C |
| 0000114420 | 36FF | 050A | 36FF | 0510 | 36FF | 050E | 1B9A | 008E |
| 0000114440 | 8300 | 28C4 | 468B | E9D8 | 0087 | 06E9 | B800 | 0009 |
| 0000114460 | 7EE9 | 8E00 | 6606 | 263A | 3E83 | 8B07 | 7500 | E903 |
| 0000114500 | 0009 | 7E83 | FED6 | 0374 | 0FE9 | 8E00 | 6806 | 263A |
| 0000114520 | 3E83 | 8B33 | 7500 | E903 | 0051 | 468B | 89EC | D846 |
| 0000114540 | 76FF | FFDC | DA76 | 468D | 16D8 | FF50 | EA76 | 76FF |
| 0000114560 | FFF8 | F676 | 4E8D | 16DE | 8D51 | F24E | 5116 | 4E8D |
| 0000114600 | 16D2 | 1E51 | F668 | 6806 | 035D | 36FF | 050C | 36FF |
| 0000114620 | 050A | 36FF | 0510 | 36FF | 050E | 9E9A | 0082 | 8300 |
| 0000114640 | 28C4 | 468B | E9D8 | 0009 | 06E9 | 8B00 | EC46 | 00E9 |
| 0000114660 | 1F00 | 5F5E | ED83 | 8B02 | 1FE5 | 4D5D | 08CA | 1E00 |
| 0000114700 | 9058 | 5545 | EC8B | 8E1E | 81D8 | 24EC | 5700 | 1E56 |
| 0000114720 | E7B8 | 8E8A | C7D8 | FA46 | 0708 | 5E8C | C7FC | F446 |
| 0000114740 | 0101 | C02B | 4689 | 89E6 | E446 | 068E | 3A66 | 8326 |
| 0000114760 | EF3E | 008E | 0375 | 1DE9 | FF00 | 1036 | FF05 | 0E36 |
| 0000115000 | 8D05 | DC46 | 5016 | 1D9A | 008B | 8300 | 08C4 | 003D |
| 0000115020 | 7400 | E903 | 000F | 068E | 3A68 | 8326 | 073E | 008F |
| 0000115040 | 0375 | 3BE9 | 1E00 | 0F68 | 8D07 | E846 | 5016 | 468D |
| 0000115060 | 16DC | 8D50 | F646 | 5016 | 8C68 | 1E03 | 1668 | FF07 |
| 0000115100 | 0C36 | FF05 | 0A36 | FF05 | 1036 | FF05 | 0E36 | 9A05 |
| 0000115120 | 8B66 | 0000 | C483 | 891E | F646 | 5689 | E9F8 | 0008 |
| 0000115140 | C02B | 4689 | 89F8 | F646 | 068E | 3A66 | 8326 | AE3E |
| 0000115160 | 008B | 0375 | 09E9 | 8300 | E07E | 74FE | E903 | 000F |
| 0000115200 | 068E | 3A68 | 8326 | C63E | 008B | 0375 | 5FE9 | FF00 |
| 0000115220 | 0876 | 76FF | FF06 | 0A76 | 099A | 7AEA | 838F | 06C4 |
| 0000115240 | 4689 | FFE2 | E676 | 76FF | 8DE4 | E246 | 5016 | 76FF |
| 0000115260 | FFF4 | FC76 | 76FF | 8DFA | E84E | 5116 | 4E8D | 16F6 |
| 0000115300 | 8D51 | DC4E | 5116 | 681E | 0716 | 9168 | FF03 | 0C36 |
| 0000115320 | FF05 | 0A36 | FF05 | 1036 | FF05 | 0E36 | 9A05 | 8C0F |

THU MAR 14 17:31:54 1991 DB_PI.DLL PAGE 43, LINE 2479

| | | | | | | | | |
|---|---|---|---|---|---|---|---|---|
| 0000115340 | 0000 | C483 | 8B28 | E246 | 17E9 | E900 | 0014 | 76FF |
| 0000115360 | FF08 | 0676 | 76FF | 9A0A | EA09 | 8B96 | C483 | E906 |
| 0000115400 | 0000 | 5E1F | 835F | 02ED | E58B | 5D1F | CA4D | 0006 |
| 0000115420 | 581E | 4590 | 8B55 | 1EEC | D88E | EC81 | 0056 | 5657 |
| 0000115440 | B81E | 8E51 | D88E | 46C7 | 20DA | 8C07 | DC5E | 46C7 |
| 0000115460 | 01C6 | 2B01 | 89C0 | B846 | 4689 | 8EB6 | 6606 | 263A |
| 0000115500 | 3E83 | 9070 | 7500 | E903 | 001D | 36FF | 0510 | 36FF |
| 0000115520 | 050E | 468D | 16AE | 9A50 | 8E87 | 000D | C483 | 3D08 |
| 0000115540 | 0000 | 0374 | 0FE9 | 8E00 | 6806 | 263A | 3E83 | 9088 |
| 0000115560 | 7500 | E903 | 003B | 681E | 0727 | 468D | 16BA | 8D50 |
| 0000115600 | AE46 | 5016 | 468D | 16D4 | 6850 | 03B1 | 681E | 072E |
| 0000115620 | 36FF | 050C | 36FF | 050A | 36FF | 0510 | 36FF | 050E |
| 0000115640 | D09A | 008E | 8300 | 1EC4 | 4689 | 89D4 | D656 | 08E9 |
| 0000115660 | 2B00 | 89C0 | D646 | 4689 | C7D4 | D846 | 0000 | C02B |
| 0000115700 | 4689 | 89AC | AA46 | 46C7 | 00C8 | 8D00 | AA46 | 5016 |
| 0000115720 | 468D | 16D8 | 9A50 | E9A2 | 9285 | C483 | 8908 | CA46 |
| 0000115740 | 7E83 | 00CA | 0375 | 7EE9 | 8E00 | 6606 | 263A | 3E83 |
| 0000115760 | 9102 | 7500 | E903 | 0009 | 7E83 | FEB2 | 0374 | 0FE9 |
| 0000116000 | 8E00 | 6806 | 263A | 3E83 | 911A | 7500 | E903 | 0051 |
| 0000116020 | 468B | 89CA | B446 | 76FF | FFB8 | B676 | 468D | 16B4 |
| 0000116040 | FF50 | C676 | 76FF | FFDC | DA76 | 4E8D | 16BA | 8D51 |
| 0000116060 | D44E | 5116 | 4E8D | 16AE | 1E51 | 2E68 | 6807 | 03BD |
| 0000116100 | 36FF | 050C | 36FF | 050A | 36FF | 0510 | 36FF | 050E |
| 0000116120 | 719A | 0091 | 8300 | 28C4 | 468B | E9B4 | 02EF | 06E9 |
| 0000116140 | 8B00 | CA46 | E6E9 | 8302 | D87E | 7500 | E903 | 000B |
| 0000116160 | 468B | 0BAC | AA46 | 0374 | 9AE9 | 8E00 | 6606 | 263A |
| 0000116200 | 3E83 | 91BB | 7500 | E903 | 0009 | 7E83 | FEB2 | 0374 |
| 0000116220 | 0FE9 | 8E00 | 6806 | 263A | 3E83 | 91D3 | 7500 | E903 |
| 0000116240 | 005F | 76FF | FF0C | 0A76 | 76FF | FF08 | 0676 | 609A |
| 0000116260 | 9035 | 8991 | B446 | 76FF | FFB8 | B676 | 468D | 16B4 |
| 0000116300 | FF50 | C676 | 76FF | FFDC | DA76 | 4E8D | 16BA | 8D51 |
| 0000116320 | D44E | 5116 | 4E8D | 16AE | 1E51 | 2E68 | 6807 | 03C3 |
| 0000116340 | 36FF | 050C | 36FF | 050A | 36FF | 0510 | 36FF | 050E |
| 0000116360 | 2A9A | 0092 | 8300 | 28C4 | 468B | E9B4 | 024F | 14E9 |
| 0000116400 | FF00 | 0C76 | 76FF | FF0A | 0876 | 76FF | 9A06 | 3560 |
| 0000116420 | 91EA | 38E9 | 8D02 | DE46 | 5016 | 76FF | FF0C | 0A76 |
| 0000116440 | 3D9A | 2142 | 8382 | 08C4 | 4689 | 83CA | CA7E | 7500 |
| 0000116460 | E903 | 009A | 068E | 3A66 | 8326 | 9D3E | 0092 | 0375 |
| 0000116500 | 09E9 | 8300 | B27E | 74FE | E903 | 000F | 068E | 3A68 |
| 0000116520 | 8326 | B53E | 0092 | 0375 | 5FE9 | FF00 | 0C76 | 76FF |
| 0000116540 | FF0A | 0876 | 76FF | 9A06 | 3560 | 9249 | 4689 | FFB4 |
| 0000116560 | B876 | 76FF | 8DB6 | B446 | 5016 | 76FF | FFC6 | DC76 |
| 0000116600 | 76FF | 8DDA | BA4E | 5116 | 4E8D | 16D4 | 8D51 | AE4E |
| 0000116620 | 5116 | 681E | 072E | CB68 | FF03 | 0C36 | FF05 | 0A36 |
| 0000116640 | FF05 | 1036 | FF05 | 0E36 | 9A05 | 92FE | 0000 | C483 |
| 0000116660 | 8B28 | B446 | 96E9 | E901 | 0014 | 76FF | FF0C | 0A76 |
| 0000116700 | 76FF | FF08 | 0676 | 609A | 1835 | E98D | 017F | 46C7 |
| 0000116720 | 00C8 | E900 | 0003 | 46FF | 8BC8 | C846 | 4639 | 77D8 |
| 0000116740 | E903 | 00EB | 468D | 16CC | 8D50 | D046 | 5016 | 5E8B |
| 0000116760 | C1C8 | 02E3 | 76C4 | 26AA | 70FF | 2602 | 30FF | 006A |
| 0000117000 | 006A | 349A | 1BD8 | 838F | 10C4 | 4689 | 83CA | CA7E |
| 0000117020 | 7500 | E903 | 007E | 068E | 3A66 | 8326 | 563E | 0093 |
| 0000117040 | 0375 | 09E9 | 8300 | B27E | 74FE | E903 | 000F | 068E |
| 0000117060 | 3A68 | 8326 | 9D3E | 008E | 0375 | 51E9 | 8B00 | CA46 |
| 0000117100 | 4689 | FFB4 | B876 | 76FF | 8DB6 | B446 | 5016 | 76FF |
| 0000117120 | FFC6 | DC76 | 76FF | 8DDA | BA4E | 5116 | 4E8D | 16D4 |
| 0000117140 | 8D51 | AE4E | 5116 | 681E | 072E | D368 | FF03 | 0C36 |
| 0000117160 | FF05 | 0A36 | FF05 | 1036 | FF05 | 0E36 | 9A05 | 8F5E |
| 0000117200 | 0000 | C483 | 8B28 | B446 | C2E9 | E900 | 0006 | 468B |

THU MAR 14 17:31:54 1991 DB_PI.DLL PAGE 44, LINE 2538

| | | | | | | | | |
|---|---|---|---|---|---|---|---|---|
| 0000117220 | E9CA | 00B9 | 76FF | FF08 | 0676 | 468D | 16DE | 8B50 |
| 0000117240 | C85E | E3C1 | C402 | AA76 | FF26 | 0270 | FF26 | FF30 |
| 0000117260 | D276 | 76FF | 9AD0 | A36A | 8C39 | C483 | 8910 | CA46 |
| 0000117300 | 7E83 | 00CA | 0374 | 03E9 | E900 | 0003 | 07E9 | 8EFF |
| 0000117320 | 6606 | 263A | 3E83 | 8E71 | 7500 | E903 | 0009 | 7E83 |
| 0000117340 | FEB2 | 0374 | 0FE9 | 8E00 | 6806 | 263A | 3E83 | 8FEE |
| 0000117360 | 7500 | E903 | 0051 | 468B | 89CA | B446 | 76FF | FFB8 |
| 0000117400 | B676 | 468D | 16B4 | FF50 | C676 | 76FF | FFDC | DA76 |
| 0000117420 | 4E8D | 16BA | 8D51 | D44E | 5116 | 4E8D | 16AE | 1E51 |
| 0000117440 | 2E68 | 6807 | 03DC | 36FF | 050C | 36FF | 050A | 36FF |
| 0000117460 | 0510 | 36FF | 050E | D19A | 0090 | 8300 | 28C4 | 468B |
| 0000117500 | E9B4 | 0009 | 06E9 | 8B00 | CA46 | 00E9 | 1F00 | 5F5E |
| 0000117520 | ED83 | 8B02 | 1FE5 | 4D5D | 08CA | 0000 | 581E | 4590 |
| 0000117540 | 8B55 | 1EEC | D88E | EC81 | 002C | 5657 | B81E | 8FA2 |
| 0000117560 | D88E | 46C7 | 4AF6 | 8C07 | F85E | 46C7 | 01EE | 2B01 |
| 0000117600 | 89C0 | E046 | 4689 | 8EDE | 6C06 | 263A | 3E83 | 8FC2 |
| 0000117620 | 7500 | E903 | 001D | 36FF | 075E | 36FF | 075C | 468D |
| 0000117640 | 16D6 | 9A50 | 8FD8 | 0000 | C483 | 3D08 | 0000 | 0374 |
| 0000117660 | 0FE9 | 8E00 | 6E06 | 263A | 3E83 | 94C9 | 7500 | E903 |
| 0000117700 | 003A | 681E | 0751 | 468D | 16E2 | 8D50 | D646 | 5016 |
| 0000117720 | 468D | 16F2 | 6A50 | 1E66 | 6068 | FF07 | 5A36 | FF07 |
| 0000117740 | 5836 | FF07 | 5E36 | FF07 | 5C36 | 9A07 | 9021 | 0000 |
| 0000117760 | C483 | 891E | F246 | 5689 | E9F4 | 0008 | C02B | 4689 |
| 0000120000 | 89F4 | F246 | 468B | 0B08 | 0646 | 0375 | 1BE9 | C400 |
| 0000120020 | 065E | 8326 | 047F | 7728 | E903 | 000E | 5EC4 | 2606 |
| 0000120040 | 7F81 | FF04 | 737F | E903 | 007C | 068E | 3A6C | 8326 |
| 0000120060 | 573E | 0095 | 0375 | 09E9 | 8300 | DA7E | 74FE | E903 |
| 0000120100 | 000F | 068E | 3A6E | 8326 | 6F3E | 0095 | 0375 | 4FE9 |
| 0000120120 | C700 | DC46 | 0013 | 76FF | FFE0 | DE76 | 468D | 16DC |
| 0000120140 | FF50 | EE76 | 76FF | FFF8 | F676 | 4E8D | 16E2 | 8D51 |
| 0000120160 | F24E | 5116 | 4E8D | 16D6 | 1E51 | 6068 | 6A07 | FF71 |
| 0000120200 | 5A36 | FF07 | 5836 | FF07 | 5E36 | FF07 | 5C36 | 9A07 |
| 0000120220 | 95B6 | 0000 | C483 | 8B28 | DC46 | 21E9 | E904 | 0006 |
| 0000120240 | 13B8 | E900 | 0418 | 7E81 | 8C0A | 7D00 | E903 | 0012 |
| 0000120260 | 7E81 | 8F0A | 7C00 | E903 | 0008 | 46C7 | 01D4 | E900 |
| 0000120300 | 0005 | 46C7 | 00D4 | 8300 | D47E | 7400 | E903 | 007C |
| 0000120320 | 068E | 3A6C | 8326 | 1C3E | 0096 | 0375 | 09E9 | 8300 |
| 0000120340 | DA7E | 74FE | E903 | 000F | 068E | 3A6E | 8326 | 343E |
| 0000120360 | 0096 | 0375 | 4FE9 | C700 | DC46 | 01AD | 76FF | FFE0 |
| 0000120400 | DE76 | 468D | 16DC | FF50 | EE76 | 76FF | FFF8 | F676 |
| 0000120420 | 4E8D | 16E2 | 8D51 | F24E | 5116 | 4E8D | 16D6 | 1E51 |
| 0000120440 | 6068 | 6A07 | FF74 | 5A36 | FF07 | 5836 | FF07 | 5E36 |
| 0000120460 | FF07 | 5C36 | 9A07 | 967B | 0000 | C483 | 8B28 | DC46 |
| 0000120500 | 7BE9 | E903 | 0006 | ADB8 | E901 | 0372 | 5EC4 | 2606 |
| 0000120520 | 478A | 2A03 | 3DE4 | 0000 | 0375 | B4E9 | C400 | 065E |
| 0000120540 | 8A26 | 0347 | E42A | 8C3D | 7D00 | E903 | 0019 | 5EC4 |
| 0000120560 | 2606 | 478A | 2A03 | 3DE4 | 008F | 037C | 08E9 | C700 |
| 0000120600 | D446 | 0001 | 05E9 | C700 | D446 | 0000 | 7E83 | 00D4 |
| 0000120620 | 0374 | 7CE9 | 8E00 | 6C06 | 263A | 3E83 | 96B9 | 7500 |
| 0000120640 | E903 | 0009 | 7E83 | FEDA | 0374 | 0FE9 | 8E00 | 6E06 |
| 0000120660 | 263A | 3E83 | 96D1 | 7500 | E903 | 004F | 46C7 | ACDC |
| 0000120700 | FF01 | E076 | 76FF | 8DDE | DC46 | 5016 | 76FF | FFEE |
| 0000120720 | F876 | 76FF | 8DF6 | E24E | 5116 | 4E8D | 16F2 | 8D51 |
| 0000120740 | D64E | 5116 | 681E | 0760 | 786A | 36FF | 075A | 36FF |
| 0000120760 | 0758 | 36FF | 075E | 36FF | 075C | 1A9A | 0097 | 8300 |
| 0000121000 | 28C4 | 468B | E9DC | 02B6 | 06E9 | B800 | 01AC | ADE9 |
| 0000121020 | 8D02 | FA46 | 5016 | 026A | 76FF | FF0E | 0C76 | 649A |
| 0000121040 | 58CF | 8390 | 0AC4 | 4689 | 83F0 | F07E | 7500 | E903 |
| 0000121060 | 007E | 068E | 3A6C | 8326 | 893E | 0097 | 0375 | 09E9 |

THU MAR 14 17:31:54 1991 DB_PI.DLL PAGE 45, LINE 2597

| | | | | | | | | |
|---|---|---|---|---|---|---|---|---|
| 0000121100 | 8300 | DA7E | 74FE | E903 | 000F | 068E | 3A6E | 8326 |
| 0000121120 | A13E | 0097 | 0375 | 51E9 | 8B00 | F046 | 4689 | FFDC |
| 0000121140 | E076 | 76FF | 8DDE | DC46 | 5016 | 76FF | FFEE | F876 |
| 0000121160 | 76FF | 8DF6 | E24E | 5116 | 4E8D | 16F2 | 8D51 | D64E |
| 0000121200 | 5116 | 681E | 0760 | 8068 | FF00 | 5A36 | FF07 | 5836 |
| 0000121220 | FF07 | 5E36 | FF07 | 5C36 | 9A07 | 93B7 | 0000 | C483 |
| 0000121240 | 8B28 | DC46 | 17E9 | E902 | 0006 | 468B | E9F0 | 020E |
| 0000121260 | 7669 | AA0A | C400 | FA5E | 8326 | 00B8 | 00AC | 0375 |
| 0000121300 | 13E9 | 6900 | 0A76 | 00AA | 5EC4 | 26FA | B883 | AC00 |
| 0000121320 | 7402 | E903 | 001E | 5EC4 | 26FA | 77FF | FF24 | 0A76 |
| 0000121340 | 76FF | FFFC | FA76 | DA9A | F137 | 8386 | 08C4 | 4689 |
| 0000121360 | E9F0 | 0005 | 46C7 | 00F0 | 8300 | F07E | 7500 | E903 |
| 0000121400 | 007E | 068E | 3A6C | 8326 | 0E3E | 0094 | 0375 | 09E9 |
| 0000121420 | 8300 | DA7E | 74FE | E903 | 000F | 068E | 3A6E | 8326 |
| 0000121440 | 6E3E | 0093 | 0375 | 51E9 | 8B00 | F046 | 4689 | FFDC |
| 0000121460 | E076 | 76FF | 8DDE | DC46 | 5016 | 76FF | FFEE | F876 |
| 0000121500 | 76FF | 8DF6 | E24E | 5116 | 4E8D | 16F2 | 8D51 | D64E |
| 0000121520 | 5116 | 681E | 0760 | 8568 | FF00 | 5A36 | FF07 | 5836 |
| 0000121540 | FF07 | 5E36 | FF07 | 5C36 | 9A07 | 9928 | 0000 | C483 |
| 0000121560 | 8B28 | DC46 | 47E9 | E901 | 0006 | 468B | E9F0 | 013E |
| 0000121600 | 5EC4 | 2606 | 478B | 2602 | 070B | 0375 | 6AE9 | C400 |
| 0000121620 | 065E | 8B26 | 2607 | 578B | 2502 | FFFF | E281 | 00FF |
| 0000121640 | 6E8A | 2A0A | 2BC9 | 0BDB | 0BC3 | C4D1 | 065E | 8926 |
| 0000121660 | 2607 | 5789 | 6902 | 0A76 | 00AA | 5EC4 | 26FA | 808B |
| 0000121700 | AC06 | 8B26 | 0890 | C4AC | 065E | 3B26 | 0257 | 0376 |
| 0000121720 | 14E9 | 7300 | E903 | 0008 | 3B26 | 7207 | E903 | 0007 |
| 0000121740 | 8B26 | 0257 | 8B26 | 6907 | 0A76 | 00AA | 5EC4 | 26FA |
| 0000121760 | 8089 | AC06 | 8926 | 0890 | 6AAC | 6A22 | 8B00 | 0646 |
| 0000122000 | 568B | 0508 | 0006 | 5052 | 8E9A | B83E | 8398 | 08C4 |
| 0000122020 | 006A | 76FF | FF08 | 0676 | 5EC4 | 2606 | 77FF | FF04 |
| 0000122040 | 0876 | 76FF | 6906 | 0A46 | 00AA | 4603 | 8BFA | FC56 |
| 0000122060 | 802D | 5254 | 9A50 | D049 | 9338 | C483 | 8910 | F046 |
| 0000122100 | 068E | 3A6C | 8326 | B13E | 0094 | 0375 | 09E9 | 8300 |
| 0000122120 | DA7E | 74FE | E903 | 000F | 068E | 3A6E | 8326 | 3A3E |
| 0000122140 | 0094 | 0375 | 51E9 | 8B00 | F046 | 4689 | FFDC | E076 |
| 0000122160 | 76FF | 8DDE | DC46 | 5016 | 76FF | FFEE | F876 | 76FF |
| 0000122200 | 8DF6 | E24E | 5116 | 4E8D | 16F2 | 8D51 | D64E | 5116 |
| 0000122220 | 681E | 0760 | 9868 | FF00 | 5A36 | FF07 | 5836 | FF07 |
| 0000122240 | 5E36 | FF07 | 5C36 | 9A07 | 9510 | 0000 | C483 | 8B28 |
| 0000122260 | DC46 | 09E9 | E900 | 0006 | 468B | E9F0 | 0000 | 5E1F |
| 0000122300 | 835F | 02ED | E58B | 5D1F | CA4D | 000A | 581E | 4590 |
| 0000122320 | 8B55 | 1EEC | D88E | EC81 | 002C | 5657 | B81E | 93EE |
| 0000122340 | D88E | 46C7 | 6FF6 | 8C07 | F85E | 46C7 | 01EE | 2B01 |
| 0000122360 | 89C0 | E046 | 4689 | 8EDE | 6C06 | 263A | 3E83 | 9A07 |
| 0000122400 | 7500 | E903 | 001D | 36FF | 075E | 36FF | 075C | 468D |
| 0000122420 | 16D6 | 9A50 | 9424 | 0000 | C483 | 3D08 | 0000 | 0374 |
| 0000122440 | 0FE9 | 8E00 | 6E06 | 263A | 3E83 | 9A1F | 7500 | E903 |
| 0000122460 | 003B | 681E | 0776 | 468D | 16E2 | 8D50 | D646 | 5016 |
| 0000122500 | 468D | 16F2 | 6850 | 00BC | 681E | 077E | 36FF | 075A |
| 0000122520 | 36FF | 0758 | 36FF | 075E | 36FF | 075C | 6C9A | 0094 |
| 0000122540 | 8300 | 1EC4 | 4689 | 89F2 | F456 | 08E9 | 2B00 | 89C0 |
| 0000122560 | F446 | 4689 | 8BF2 | 0846 | 460B | 7406 | E903 | 007D |
| 0000122600 | 068E | 3A6C | 8326 | AE3E | 009A | 0375 | 09E9 | 8300 |
| 0000122620 | DA7E | 74FE | E903 | 000F | 068E | 3A6E | 8326 | C63E |
| 0000122640 | 009A | 0375 | 50E9 | C700 | DC46 | 0017 | 76FF | FFE0 |
| 0000122660 | DE76 | 468D | 16DC | FF50 | EE76 | 76FF | FFF8 | F676 |
| 0000122700 | 4E8D | 16E2 | 8D51 | F24E | 5116 | 4E8D | 16D6 | 1E51 |
| 0000122720 | 7E68 | 6807 | 00C4 | 36FF | 075A | 36FF | 0758 | 36FF |
| 0000122740 | 075E | 36FF | 075C | 0E9A | 009B | 8300 | 28C4 | 468B |

THU MAR 14 17:31:54 1991 DB_PI.DLL PAGE 46, LINE 2656

| | | | | | | | | |
|---|---|---|---|---|---|---|---|---|
| 0000122760 | E9DC | 0255 | 06E9 | B800 | 0017 | 4CE9 | 8102 | 0A7E |
| 0000123000 | 008C | 037D | 12E9 | 8100 | 0A7E | 008F | 037C | 08E9 |
| 0000123020 | C700 | D446 | 0001 | 05E9 | C700 | D446 | 0000 | 7E83 |
| 0000123040 | 00D4 | 0374 | 7DE9 | 8E00 | 6C06 | 263A | 3E83 | 9B4C |
| 0000123060 | 7500 | E903 | 0009 | 7E83 | FEDA | 0374 | 0FE9 | 8E00 |
| 0000123100 | 6E06 | 263A | 3E83 | 9B64 | 7500 | E903 | 0050 | 46C7 |
| 0000123120 | ADDC | FF01 | E076 | 76FF | 8DDE | DC46 | 5016 | 76FF |
| 0000123140 | FFEE | F876 | 76FF | 8DF6 | E24E | 5116 | 4E8D | 16F2 |
| 0000123160 | 8D51 | D64E | 5116 | 681E | 077E | C768 | FF00 | 5A36 |
| 0000123200 | FF07 | 5836 | FF07 | 5E36 | FF07 | 5C36 | 9A07 | 9BAD |
| 0000123220 | 0000 | C483 | 8B28 | DC46 | AEE9 | E901 | 0006 | ADB8 |
| 0000123240 | E901 | 01A5 | 468D | 16FA | 6A50 | FF02 | 0E76 | 76FF |
| 0000123260 | 9A0C | CF64 | 96A1 | C483 | 890A | F046 | 7E83 | 00F0 |
| 0000123300 | 0375 | 7EE9 | 8E00 | 6C06 | 263A | 3E83 | 9C1C | 7500 |
| 0000123320 | E903 | 0009 | 7E83 | FEDA | 0374 | 0FE9 | 8E00 | 6E06 |
| 0000123340 | 263A | 3E83 | 9C34 | 7500 | E903 | 0051 | 468B | 89F0 |
| 0000123360 | DC46 | 76FF | FFE0 | DE76 | 468D | 16DC | FF50 | EE76 |
| 0000123400 | 76FF | FFF8 | F676 | 4E8D | 16E2 | 8D51 | F24E | 5116 |
| 0000123420 | 4E8D | 16D6 | 1E51 | 7E68 | 6807 | 00CB | 36FF | 075A |
| 0000123440 | 36FF | 0758 | 36FF | 075E | 36FF | 075C | 7D9A | 009C |
| 0000123460 | 8300 | 28C4 | 468B | E9DC | 010F | 06E9 | 8B00 | F046 |
| 0000123500 | 06E9 | 6901 | 0A76 | 00AA | 5EC4 | 26FA | B883 | AC00 |
| 0000123520 | 7500 | E903 | 0013 | 7669 | AA0A | C400 | FA5E | 8326 |
| 0000123540 | 00B8 | 02AC | 0374 | 1EE9 | C400 | FA5E | FF26 | 2477 |
| 0000123560 | 76FF | FF0A | FC76 | 76FF | 9AFA | 37DA | 9769 | C483 |
| 0000123600 | 8908 | F046 | 05E9 | C700 | F046 | 0000 | 7E83 | 00F0 |
| 0000123620 | 0375 | 7EE9 | 8E00 | 6C06 | 263A | 3E83 | 98C7 | 7500 |
| 0000123640 | E903 | 0009 | 7E83 | FEDA | 0374 | 0FE9 | 8E00 | 6E06 |
| 0000123660 | 263A | 3E83 | 98DF | 7500 | E903 | 0051 | 468B | 89F0 |
| 0000123700 | DC46 | 76FF | FFE0 | DE76 | 468D | 16DC | FF50 | EE76 |
| 0000123720 | 76FF | FFF8 | F676 | 4E8D | 16E2 | 8D51 | F24E | 5116 |
| 0000123740 | 4E8D | 16D6 | 1E51 | 7E68 | 6807 | 00CF | 36FF | 075A |
| 0000123760 | 36FF | 0758 | 36FF | 075E | 36FF | 075C | EA9A | 0097 |
| 0000124000 | 8300 | 28C4 | 468B | E9DC | 003F | 06E9 | 8B00 | F046 |
| 0000124020 | 36E9 | 6900 | 0A76 | 00AA | 5EC4 | 26FA | 8083 | AC06 |
| 0000124040 | 2601 | 9083 | AC08 | 6900 | 0A76 | 00AA | 5EC4 | 26FA |
| 0000124060 | 808B | AC06 | 8B26 | 0890 | C4AC | 065E | 8926 | 2607 |
| 0000124100 | 5789 | B802 | 0000 | 00E9 | 1F00 | 5F5E | ED83 | 8B02 |
| 0000124120 | 1FE5 | 4D5D | 0ACA | 1E00 | 9058 | 5545 | EC8B | 8E1E |
| 0000124140 | 81D8 | 2EEC | 5700 | 1E56 | 5EB8 | 8E99 | C7D8 | F646 |
| 0000124160 | 078E | 5E8C | C7F8 | EE46 | 0101 | C02B | 4689 | 89E0 |
| 0000124200 | DE46 | 068E | 3A6C | 8326 | A83E | 009D | 0375 | 1DE9 |
| 0000124220 | FF00 | 5E36 | FF07 | 5C36 | 8D07 | D446 | 5016 | 949A |
| 0000124240 | 0099 | 8300 | 08C4 | 003D | 7400 | E903 | 000F | 068E |
| 0000124260 | 3A6E | 8326 | C03E | 009D | 0375 | 3BE9 | 1E00 | 9568 |
| 0000124300 | 8D07 | E246 | 5016 | 468D | 16D4 | 8D50 | F246 | 5016 |
| 0000124320 | F468 | 1E00 | 9C68 | FF07 | 5A36 | FF07 | 5836 | FF07 |
| 0000124340 | 5E36 | FF07 | 5C36 | 9A07 | 99DD | 0000 | C483 | 891E |
| 0000124360 | F246 | 5689 | E9F4 | 0008 | C02B | 4689 | 89F4 | F246 |
| 0000124400 | 468D | 16FA | 6A50 | FF02 | 0C76 | 76FF | 9A0A | CF64 |
| 0000124420 | 9B34 | C483 | 890A | F046 | 7E83 | 00F0 | 0375 | 7EE9 |
| 0000124440 | 8E00 | 6C06 | 263A | 3E83 | 9E58 | 7500 | E903 | 0009 |
| 0000124460 | 7E83 | FED8 | 0374 | 0FE9 | 8E00 | 6E06 | 263A | 3E83 |
| 0000124500 | 9E70 | 7500 | E903 | 0051 | 468B | 89F0 | DA46 | 76FF |
| 0000124520 | FFE0 | DE76 | 468D | 16DA | FF50 | EE76 | 76FF | FFF8 |
| 0000124540 | F676 | 4E8D | 16E2 | 8D51 | F24E | 5116 | 4E8D | 16D4 |
| 0000124560 | 1E51 | 9C68 | 6807 | 00FE | 36FF | 075A | 36FF | 0758 |
| 0000124600 | 36FF | 075E | 36FF | 075C | B89A | 009E | 8300 | 28C4 |
| 0000124620 | 468B | E9DA | 0226 | 06E9 | 8B00 | F046 | 1DE9 | 8A02 |

THU MAR 14 17:31:54 1991 DB_PI.DLL PAGE 47, LINE 2715

| | | | | | | | | |
|---|---|---|---|---|---|---|---|---|
| 0000124640 | 0946 | E42A | 4689 | 81DC | DC7E | 008C | 037D | 12E9 |
| 0000124660 | 8100 | DC7E | 008F | 037C | 08E9 | C700 | D246 | 0001 |
| 0000124700 | 05E9 | C700 | D246 | 0000 | 7E83 | 00D2 | 0374 | 7DE9 |
| 0000124720 | 8E00 | 6C06 | 263A | 3E83 | 9F27 | 7500 | E903 | 0009 |
| 0000124740 | 7E83 | FED8 | 0374 | 0FE9 | 8E00 | 6E06 | 263A | 3E83 |
| 0000124760 | 9F3F | 7500 | E903 | 0050 | 46C7 | ACDA | FF01 | E076 |
| 0000125000 | 76FF | 8DDE | DA46 | 5016 | 76FF | FFEE | F876 | 76FF |
| 0000125020 | 8DF6 | E24E | 5116 | 4E8D | 16F2 | 8D51 | D44E | 5116 |
| 0000125040 | 681E | 079C | 0368 | FF01 | 5A36 | FF07 | 5836 | FF07 |
| 0000125060 | 5E36 | FF07 | 5C36 | 9A07 | 9F88 | 0000 | C483 | 8B28 |
| 0000125100 | DA46 | 77E9 | E901 | 0006 | ACB8 | E901 | 016E | 7669 |
| 0000125120 | AADC | C400 | FA5E | 8326 | 00B8 | 00AC | 0375 | 13E9 |
| 0000125140 | 6900 | DC76 | 00AA | 5EC4 | 26FA | B883 | AC00 | 7402 |
| 0000125160 | E903 | 001E | 5EC4 | 26FA | 77FF | FF24 | DC76 | 76FF |
| 0000125200 | FFFC | FA76 | DA9A | FC37 | 839B | 08C4 | 4689 | E9F0 |
| 0000125220 | 0005 | 46C7 | 00F0 | 8300 | F07E | 7500 | E903 | 007E |
| 0000125240 | 068E | 3A6C | 8326 | C53E | 009F | 0375 | 09E9 | 8300 |
| 0000125260 | D87E | 74FE | E903 | 000F | 068E | 3A6E | 8326 | DD3E |
| 0000125300 | 009F | 0375 | 51E9 | 8B00 | F046 | 4689 | FFDA | E076 |
| 0000125320 | 76FF | 8DDE | DA46 | 5016 | 76FF | FFEE | F876 | 76FF |
| 0000125340 | 8DF6 | E24E | 5116 | 4E8D | 16F2 | 8D51 | D44E | 5116 |
| 0000125360 | 681E | 079C | 0768 | FF01 | 5A36 | FF07 | 5836 | FF07 |
| 0000125400 | 5E36 | FF07 | 5C36 | 9A07 | A026 | 0000 | C483 | 8B28 |
| 0000125420 | DA46 | A7E9 | E900 | 0006 | 468B | E9F0 | 009E | 468D |
| 0000125440 | 1606 | 6950 | DC46 | 00AA | 4603 | 8BFA | FC56 | 802D |
| 0000125460 | 5254 | 9A50 | D3E1 | 988B | C483 | 8908 | F046 | 068E |
| 0000125500 | 3A6C | 8326 | 7E3E | 0099 | 0375 | 09E9 | 8300 | D87E |
| 0000125520 | 74FE | E903 | 000F | 068E | 3A6E | 8326 | AA3E | 0099 |
| 0000125540 | 0375 | 51E9 | 8B00 | F046 | 4689 | FFDA | E076 | 76FF |
| 0000125560 | 8DDE | DA46 | 5016 | 76FF | FFEE | F876 | 76FF | 8DF6 |
| 0000125600 | E24E | 5116 | 4E8D | 16F2 | 8D51 | D44E | 5116 | 681E |
| 0000125620 | 079C | 0B68 | FF01 | 5A36 | FF07 | 5836 | FF07 | 5E36 |
| 0000125640 | FF07 | 5C36 | 9A07 | 9A67 | 0000 | C483 | 8B28 | DA46 |
| 0000125660 | 09E9 | E900 | 0006 | 468B | E9F0 | 0000 | 5E1F | 835F |
| 0000125700 | 02ED | E58B | 5D1F | CA4D | 0008 | 581E | 4590 | 8B55 |
| 0000125720 | 1EEC | D88E | EC81 | 002E | 5657 | B81E | 9CE9 | D88E |
| 0000125740 | 46C7 | ABF6 | 8C07 | F85E | 46C7 | 01EE | 2B01 | 89C0 |
| 0000125760 | E046 | 4689 | 8EDE | 6C06 | 263A | 3E83 | A120 | 7500 |
| 0000126000 | E903 | 001D | 36FF | 075E | 36FF | 075C | 468D | 16D4 |
| 0000126020 | 9A50 | 9D1F | 0000 | C483 | 3D08 | 0000 | 0374 | 0FE9 |
| 0000126040 | 8E00 | 6E06 | 263A | 3E83 | A138 | 7500 | E903 | 003B |
| 0000126060 | 681E | 07B2 | 468D | 16E2 | 8D50 | D446 | 5016 | 468D |
| 0000126100 | 16F2 | 6850 | 012E | 681E | 07BA | 36FF | 075A | 36FF |
| 0000126120 | 0758 | 36FF | 075E | 36FF | 075C | 689A | 009D | 8300 |
| 0000126140 | 1EC4 | 4689 | 89F2 | F456 | 08E9 | 2B00 | 89C0 | F446 |
| 0000126160 | 4689 | 8BF2 | 0846 | 460B | 7506 | E903 | 001B | 5EC4 |
| 0000126200 | 2606 | 7F83 | 2804 | 0377 | 0EE9 | C400 | 065E | 8126 |
| 0000126220 | 047F | 7FFF | 0373 | 7DE9 | 8E00 | 6C06 | 263A | 3E83 |
| 0000126240 | A1BE | 7500 | E903 | 0009 | 7E83 | FED8 | 0374 | 0FE9 |
| 0000126260 | 8E00 | 6E06 | 263A | 3E83 | A1D6 | 7500 | E903 | 0050 |
| 0000126300 | 46C7 | 13DA | FF00 | E076 | 76FF | 8DDE | DA46 | 5016 |
| 0000126320 | 76FF | FFEE | F876 | 76FF | 8DF6 | E24E | 5116 | 4E8D |
| 0000126340 | 16F2 | 8D51 | D44E | 5116 | 681E | 07BA | 3A68 | FF01 |
| 0000126360 | 5A36 | FF07 | 5836 | FF07 | 5E36 | FF07 | 5C36 | 9A07 |
| 0000126400 | A21F | 0000 | C483 | 8B28 | DA46 | D9E9 | E902 | 0006 |
| 0000126420 | 13B8 | E900 | 02D0 | 468D | 16FA | 6A50 | FF02 | 0C76 |
| 0000126440 | 76FF | 9A0A | CF64 | 9D90 | C483 | 890A | F046 | 7E83 |
| 0000126460 | 00F0 | 0375 | 7EE9 | 8E00 | 6C06 | 263A | 3E83 | 9D09 |
| 0000126500 | 7500 | E903 | 0009 | 7E83 | FED8 | 0374 | 0FE9 | 8E00 |

THU MAR 14 17:31:54 1991 DB_PI.DLL PAGE 48, LINE 2774

| | | | | | | | | |
|---|---|---|---|---|---|---|---|---|
| 0000126520 | 6E06 | 263A | 3E83 | 9D35 | 7500 | E903 | 0051 | 468B |
| 0000126540 | 89F0 | DA46 | 76FF | FFE0 | DE76 | 468D | 16DA | FF50 |
| 0000126560 | EE76 | 76FF | FFF8 | F676 | 4E8D | 16E2 | 8D51 | F24E |
| 0000126600 | 5116 | 4E8D | 16D4 | 1E51 | BA68 | 68D7 | 013F | 36FF |
| 0000126620 | 075A | 36FF | 0758 | 36FF | 075E | 36FF | 075C | 099A |
| 0000126640 | 009E | 8300 | 28C4 | 468B | E9DA | 023A | 06E9 | 8B00 |
| 0000126660 | F046 | 31E9 | C402 | 065E | 8A26 | 0347 | E42A | 4689 |
| 0000126700 | 81DC | DC7E | 008C | 037D | 12E9 | 8100 | DC7E | 008F |
| 0000126720 | 037C | 08E9 | C700 | D246 | 0001 | 05E9 | C700 | D246 |
| 0000126740 | 0000 | 7E83 | 00D2 | 0374 | 7DE9 | 8E00 | 6C06 | 263A |
| 0000126760 | 3E83 | A341 | 7500 | E903 | 0009 | 7E83 | FED8 | 0374 |
| 0000127000 | 0FE9 | 8E00 | 6E06 | 263A | 3E83 | A359 | 7500 | E903 |
| 0000127020 | 0050 | 46C7 | ACDA | FF01 | E076 | 76FF | 8DDE | DA46 |
| 0000127040 | 5016 | 76FF | FFEE | F876 | 76FF | 8DF6 | E24E | 5116 |
| 0000127060 | 4E8D | 16F2 | 8D51 | D44E | 5116 | 681E | 07BA | 4568 |
| 0000127100 | FF01 | 5A36 | FF07 | 5836 | FF07 | 5E36 | FF07 | 5C36 |
| 0000127120 | 9A07 | A3A2 | 0000 | C483 | 8B28 | DA46 | 87E9 | E901 |
| 0000127140 | 0006 | ACB8 | E901 | 017E | 7669 | AADC | C400 | FA5E |
| 0000127160 | 8326 | 00B8 | 00AC | 0375 | 13E9 | 6900 | DC76 | 00AA |
| 0000127200 | 5EC4 | 26FA | B883 | AC00 | 7402 | E903 | 001E | 5EC4 |
| 0000127220 | 26FA | 77FF | FF24 | DC76 | 76FF | FFFC | FA76 | DA9A |
| 0000127240 | 0737 | 839F | 08C4 | 4689 | E9F0 | 0005 | 46C7 | 00F0 |
| 0000127260 | 8300 | F07E | 7500 | E903 | 007E | 068E | 3A6C | 8326 |
| 0000127300 | EF3E | 00A3 | 0375 | 09E9 | 8300 | D87E | 74FE | E903 |
| 0000127320 | 000F | 068E | 3A6E | 8326 | 073E | 00A4 | 0375 | 51E9 |
| 0000127340 | 8B00 | F046 | 4689 | FFDA | E076 | 76FF | 8DDE | DA46 |
| 0000127360 | 5016 | 76FF | FFEE | F876 | 76FF | 8DF6 | E24E | 5116 |
| 0000127400 | 4E8D | 16F2 | 8D51 | D44E | 5116 | 681E | 07BA | 4968 |
| 0000127420 | FF01 | 5A36 | FF07 | 5836 | FF07 | 5E36 | FF07 | 5C36 |
| 0000127440 | 9A07 | A450 | 0000 | C483 | 8B28 | DA46 | B7E9 | E900 |
| 0000127460 | 0006 | 468B | E9F0 | 00AE | 016A | 76FF | FF08 | 0676 |
| 0000127500 | 5EC4 | 2606 | 77FF | FF04 | 0876 | 76FF | 6906 | DC46 |
| 0000127520 | 00AA | 4603 | 8BFA | FC56 | 802D | 5254 | 9A50 | D049 |
| 0000127540 | 9FB6 | C483 | 8910 | F046 | 068E | 3A6C | 8326 | 7C3E |
| 0000127560 | 00A0 | 0375 | 09E9 | 8300 | D87E | 74FE | E903 | 000F |
| 0000127600 | 068E | 3A6E | 8326 | A83E | 00A0 | 0375 | 51E9 | 8B00 |
| 0000127620 | F046 | 4689 | FFDA | E076 | 76FF | 8DDE | DA46 | 5016 |
| 0000127640 | 76FF | FFEE | F876 | 76FF | 8DF6 | E24E | 5116 | 4E8D |
| 0000127660 | 16F2 | 8D51 | D44E | 5116 | 681E | 07BA | 5068 | FF01 |
| 0000127700 | 5A36 | FF07 | 5836 | FF07 | 5E36 | FF07 | 5C36 | 9A07 |
| 0000127720 | A180 | 0000 | C483 | 8B28 | DA46 | 09E9 | E900 | 0006 |
| 0000127740 | 468B | E9F0 | 0000 | 5E1F | 835F | 02ED | E58B | 5D1F |
| 0000127760 | CA4D | 0008 | 581E | 4590 | 8B55 | 1EEC | D88E | EC81 |
| 0000130000 | 0058 | 5657 | B81E | A05C | D88E | 46C7 | C9F6 | 8C07 |
| 0000130020 | F85E | 46C7 | 01C6 | 2B01 | 89C0 | B646 | 4689 | 8EB4 |
| 0000130040 | 6C06 | 263A | 3E83 | A551 | 7500 | E903 | 001D | 36FF |
| 0000130060 | 075E | 36FF | 075C | 468D | 16AA | 9A50 | A092 | 0000 |
| 0000130100 | C483 | 3D08 | 0000 | 0374 | 0FE9 | 8E00 | 6E06 | 263A |
| 0000130120 | 3E83 | A569 | 7500 | E903 | 003B | 681E | 07D0 | 468D |
| 0000130140 | 16BA | 8D50 | AA46 | 5016 | 468D | 16F2 | 6850 | 0173 |
| 0000130160 | 681E | 07D8 | 36FF | 075A | 36FF | 0758 | 36FF | 075E |
| 0000130200 | 36FF | 075C | DB9A | 00A0 | 8300 | 1EC4 | 4689 | 89F2 |
| 0000130220 | F456 | 08E9 | 2B00 | 89C0 | F446 | 4689 | C4F2 | 065E |
| 0000130240 | C02B | 8926 | 0247 | 8926 | 8D07 | FA46 | 5016 | 006A |
| 0000130260 | 76FF | FF10 | 0E76 | 649A | A6CF | 83A1 | 0AC4 | 4689 |
| 0000130300 | 83F0 | F07E | 7500 | E903 | 007E | 068E | 3A6C | 8326 |
| 0000130320 | 013E | 00A6 | 0375 | 09E9 | 8300 | AE7E | 74FE | E903 |
| 0000130340 | 000F | 068E | 3A6E | 8326 | 193E | 00A6 | 0375 | 51E9 |
| 0000130360 | 8B00 | F046 | 4689 | FFB0 | B676 | 76FF | 8DB4 | B046 |

THU MAR 14 17:31:54 1991 DB_PI.DLL PAGE 49, LINE 2833

| | | | | | | | | |
|---|---|---|---|---|---|---|---|---|
| 0000130400 | 5016 | 76FF | FFC6 | F876 | 76FF | 8DF6 | BA4E | 5116 |
| 0000130420 | 4E8D | 16F2 | 8D51 | AA4E | 5116 | 681E | 07D8 | 8168 |
| 0000130440 | FF01 | 5A36 | FF07 | 5836 | FF07 | 5E36 | FF07 | 5C36 |
| 0000130460 | 9A07 | A661 | 0000 | C483 | 8B28 | B046 | 60E9 | E904 |
| 0000130500 | 0006 | 468B | E9F0 | 0457 | 468A | 2A0D | 89E4 | B246 |
| 0000130520 | 7E81 | 8CB2 | 7D00 | E903 | 0012 | 7E81 | 8FB2 | 7C00 |
| 0000130540 | E903 | 0008 | 46C7 | 01A8 | E900 | 0005 | 46C7 | 00A8 |
| 0000130560 | 8300 | A87E | 7400 | E903 | 007D | 06GE | 3A6C | 8326 |
| 0000130600 | D03E | 00A6 | 0375 | 09E9 | 8300 | AE7E | 74FE | E903 |
| 0000130620 | 000F | 068E | 3A6E | 8326 | E83E | 00A6 | 0375 | 50E9 |
| 0000130640 | C700 | B046 | 01AC | 76FF | FFB6 | B476 | 468D | 16B0 |
| 0000130660 | FF50 | C676 | 76FF | FFF8 | F676 | 4E8D | 16BA | 8D51 |
| 0000130700 | F24E | 5116 | 4E8D | 16AA | 1E51 | D868 | 6807 | 0186 |
| 0000130720 | 36FF | 075A | 36FF | 0758 | 36FF | 075E | 36FF | 075C |
| 0000130740 | 419A | 00A7 | 8300 | 28C4 | 468B | E9B0 | 03B1 | 06E9 |
| 0000130760 | B800 | 01AC | A8E9 | 6903 | B276 | 00AA | 5EC4 | 26FA |
| 0000131000 | B883 | AC00 | 7500 | E903 | 0013 | 7669 | AAB2 | C400 |
| 0000131020 | FA5E | 8326 | 00B8 | 02AC | 0374 | 1EE9 | C400 | FA5E |
| 0000131040 | FF26 | 2477 | 76FF | FFB2 | FC76 | 76FF | 9AFA | 37DA |
| 0000131060 | A321 | C483 | 8908 | F046 | 05E9 | C700 | F046 | 0000 |
| 0000131100 | 7E83 | 00F0 | 0375 | 9EE9 | 8E00 | 6C06 | 263A | 3E83 |
| 0000131120 | A7B0 | 7500 | E903 | 0009 | 7E83 | FEAE | 0374 | 0FE9 |
| 0000131140 | 8E00 | 6E06 | 263A | 3E83 | A7C8 | 7500 | E903 | 0061 |
| 0000131160 | 7E81 | 9DF0 | 7401 | E903 | 0006 | ABB8 | E901 | 0003 |
| 0000131200 | 468B | 89F0 | B046 | 76FF | FFB6 | B476 | 468D | 16B0 |
| 0000131220 | FF50 | C676 | 76FF | FFF8 | F676 | 4E8D | 16BA | 8D51 |
| 0000131240 | F24E | 5116 | 4E8D | 16AA | 1E51 | D868 | 6807 | 018B |
| 0000131260 | 36FF | 075A | 36FF | 0758 | 36FF | 075E | 36FF | 075C |
| 0000131300 | 119A | 00A8 | 8300 | 28C4 | 468B | E9B0 | 02D1 | 16E9 |
| 0000131320 | 8100 | F07E | 019D | 0374 | 06E9 | B800 | 01AB | 03E9 |
| 0000131340 | 8B00 | F046 | B8E9 | C702 | B846 | 0028 | 468D | 16C8 |
| 0000131360 | 8D50 | B846 | 5016 | 468D | 160A | 6950 | B246 | 00AA |
| 0000131400 | 4603 | 8BFA | FC56 | 802D | 5254 | 9A50 | D6BE | A82D |
| 0000131420 | C483 | 8910 | F046 | 7E83 | 00F0 | 0375 | 88E9 | 8100 |
| 0000131440 | F07E | 01FA | 0375 | 7EE9 | 8E00 | 6C06 | 263A | 3E83 |
| 0000131460 | A272 | 7500 | E903 | 0009 | 7E83 | FEAE | 0374 | 0FE9 |
| 0000131500 | 8E00 | 6E06 | 263A | 3E83 | A28A | 7500 | E903 | 0051 |
| 0000131520 | 468B | 89F0 | B046 | 76FF | FFB6 | B476 | 468D | 16B0 |
| 0000131540 | FF50 | C676 | 76FF | FFF8 | F676 | 4E8D | 16BA | 8D51 |
| 0000131560 | F24E | 5116 | 4E8D | 16AA | 1E51 | D868 | 6807 | 0195 |
| 0000131600 | 36FF | 075A | 36FF | 0758 | 36FF | 075E | 36FF | 075C |
| 0000131620 | D29A | 00A2 | 8300 | 28C4 | 468B | E9B0 | 0201 | 06E9 |
| 0000131640 | 8B00 | F046 | F8E9 | FF01 | CC76 | 3E9A | E024 | 83A3 |
| 0000131660 | 02C4 | 5EC4 | 2606 | 0789 | 8926 | 0257 | 5EC4 | 2606 |
| 0000131700 | 478B | 2602 | 070B | 0374 | 7DE9 | 8E00 | 6C06 | 263A |
| 0000131720 | 3E83 | A92B | 7500 | E903 | 0009 | 7E83 | FEAE | 0374 |
| 0000131740 | 0FE9 | 8E00 | 6E06 | 263A | 3E83 | A943 | 7500 | E903 |
| 0000131760 | 0050 | 46C7 | 07B0 | FF00 | B676 | 76FF | 8DB4 | B046 |
| 0000132000 | 5016 | 76FF | FFC6 | F876 | 76FF | 8DF6 | BA4E | 5116 |
| 0000132020 | 4E8D | 16F2 | 8D51 | AA4E | 5116 | 681E | 07D8 | 9868 |
| 0000132040 | FF01 | 5A36 | FF07 | 5836 | FF07 | 5E36 | FF07 | 5C36 |
| 0000132060 | 9A07 | A98C | 0000 | C483 | 8B28 | B046 | 60E9 | E901 |
| 0000132100 | 0006 | 07B8 | E900 | 0157 | 468B | 89CC | B846 | 5EC4 |
| 0000132120 | 2606 | 77FF | 2602 | 37FF | 468D | 16B8 | 8D50 | 0A46 |
| 0000132140 | 5016 | 4669 | AAB2 | 0300 | FA46 | 568B | 2DFC | 5480 |
| 0000132160 | 5052 | BE9A | 13D6 | 83A9 | 10C4 | 4689 | 83F0 | F07E |
| 0000132200 | 7500 | E903 | 009C | 5EC4 | 2606 | 77FF | 2602 | 37FF |
| 0000132220 | 489A | 8E24 | 83A7 | 04C4 | 5EC4 | 2B06 | 26C0 | 4789 |
| 0000132240 | 2602 | 0789 | 068E | 3A6C | 8326 | A93E | 00A9 | 0375 |

THU MAR 14 17:31:54 1991 DB_PI.DLL PAGE 50, LINE 2892

| | | | | | | | | |
|---|---|---|---|---|---|---|---|---|
| 0000132260 | 09E9 | 8300 | AE7E | 74FE | E903 | 000F | 068E | 3A6E |
| 0000132300 | 8326 | C13E | 00A9 | 0375 | 51E9 | 8B00 | F046 | 4689 |
| 0000132320 | FFB0 | B676 | 76FF | 8DB4 | B046 | 5016 | 76FF | FFC6 |
| 0000132340 | F876 | 76FF | 8DF6 | BA4E | 5116 | 4E8D | 16F2 | 8D51 |
| 0000132360 | AA4E | 5116 | 681E | 07D8 | A168 | FF01 | 5A36 | FF07 |
| 0000132400 | 5836 | FF07 | 5E36 | FF07 | 5C36 | 9A07 | AA09 | 0000 |
| 0000132420 | C483 | 8B28 | B046 | 86E9 | E900 | 0006 | 468B | E9F0 |
| 0000132440 | 007D | 068E | 3A6C | 8326 | A63E | 00A4 | 0375 | 09E9 |
| 0000132460 | 8300 | AE7E | 74FE | E903 | 000F | 068E | 3A6E | 8326 |
| 0000132500 | D23E | 00A4 | 0375 | 50E9 | C700 | B046 | 0000 | 76FF |
| 0000132520 | FFB6 | B476 | 468D | 16B0 | FF50 | C676 | 76FF | FFF8 |
| 0000132540 | F676 | 4E8D | 16BA | 8D51 | F24E | 5116 | 4E8D | 16AA |
| 0000132560 | 1E51 | D868 | 6807 | 01A4 | 36FF | 075A | 36FF | 0758 |
| 0000132600 | 36FF | 075E | 36FF | 075C | B29A | 00A5 | 8300 | 28C4 |
| 0000132620 | 468B | E9B0 | 0009 | 06E9 | B800 | 0000 | 00E9 | 1F00 |
| 0000132640 | 5F5E | ED83 | 8B02 | 1FE5 | 4D5D | DCCA | 1E00 | 9058 |
| 0000132660 | 5545 | EC8B | 8E1E | 81D8 | 2CEC | 5700 | 1E56 | 86B8 |
| 0000132700 | 8EA4 | C7D8 | F646 | 07E4 | 5E8C | C7F8 | EE46 | 0101 |
| 0000132720 | C02B | 4689 | 89E0 | DE46 | 068E | 3A6C | 8326 | 1B3E |
| 0000132740 | 00AB | 0375 | 1DE9 | FF00 | 5E36 | FF07 | 5C36 | 8D07 |
| 0000132760 | D646 | 5016 | BC9A | 00A4 | 8300 | 08C4 | 003D | 7400 |
| 0000133000 | E903 | 000F | 068E | 3A6E | 8326 | 333E | 00AB | 0375 |
| 0000133020 | 3BE9 | 1E00 | EB68 | 8D07 | E246 | 5016 | 468D | 16D6 |
| 0000133040 | 8D50 | F246 | 5016 | C768 | 1E01 | F268 | FF07 | 5A36 |
| 0000133060 | FF07 | 5836 | FF07 | 5E36 | FF07 | 5C36 | 9A07 | A505 |
| 0000133100 | 0000 | C483 | 891E | F246 | 5689 | E9F4 | 0008 | C02B |
| 0000133120 | 4689 | 89F4 | F246 | 5EC4 | 260A | 07C7 | 0000 | 5EC4 |
| 0000133140 | 2B06 | 26C0 | 4789 | 2602 | 0789 | 7E81 | 8C0E | 7D00 |
| 0000133160 | E903 | 0012 | 7E81 | 8F0E | 7C00 | E903 | 0008 | 46C7 |
| 0000133200 | 01D4 | E900 | 0005 | 46C7 | 00D4 | 8300 | D47E | 7400 |
| 0000133220 | E903 | 007D | 068E | 3A6C | 8326 | B93E | 00AB | 0375 |
| 0000133240 | 09E9 | 8300 | DA7E | 74FE | E903 | 000F | 068E | 3A6E |
| 0000133260 | 8326 | D13E | 00AB | 0375 | 50E9 | C700 | DC46 | 01AD |
| 0000133300 | 76FF | FFE0 | DE76 | 468D | 16DC | FF50 | EE76 | 76FF |
| 0000133320 | FFF8 | F676 | 4E8D | 16E2 | 8D51 | F24E | 5116 | 4E8D |
| 0000133340 | 16D6 | 1E51 | F268 | 6807 | 01D1 | 36FF | 075A | 36FF |
| 0000133360 | 0758 | 36FF | 075E | 36FF | 075C | 1A9A | 00AC | 8300 |
| 0000133400 | 28C4 | 468B | E9DC | 0216 | 06E9 | B800 | 01AD | 0DE9 |
| 0000133420 | 8D02 | FA46 | 5016 | 006A | 76FF | FF12 | 1076 | 649A |
| 0000133440 | 39CF | 83A5 | 0AC4 | 4689 | 83F0 | F07E | 7500 | E903 |
| 0000133460 | 007E | 068E | 3A6C | 8326 | 893E | 00AC | 0375 | 09E9 |
| 0000133500 | 8300 | DA7E | 74FE | E903 | 000F | 068E | 3A6E | 8326 |
| 0000133520 | A13E | 00AC | 0375 | 51E9 | 8B00 | F046 | 4689 | FFDC |
| 0000133540 | E076 | 76FF | 8DDE | DC46 | 5016 | 76FF | FFEE | F876 |
| 0000133560 | 76FF | 8DF6 | E24E | 5116 | 4E8D | 16F2 | 8D51 | D64E |
| 0000133600 | 5116 | 681E | 07F2 | D568 | FF01 | 5A36 | FF07 | 5836 |
| 0000133620 | FF07 | 5E36 | FF07 | 5C36 | 9A07 | ACEA | 0000 | C483 |
| 0000133640 | 8B28 | DC46 | 77E9 | E901 | 0006 | 468B | E9F0 | 016E |
| 0000133660 | 7669 | AA0E | C400 | FA5E | 8326 | 00B8 | 00AC | 0375 |
| 0000133700 | 13E9 | 6900 | 0E76 | 00AA | 5EC4 | 26FA | B883 | AC00 |
| 0000133720 | 7402 | E903 | 001E | 5EC4 | 26FA | 77FF | FF24 | 0E76 |
| 0000133740 | 76FF | FFFC | FA76 | DA9A | 1837 | 83AD | 08C4 | 4689 |
| 0000133760 | E9F0 | 0005 | 46C7 | 00F0 | 8300 | F07E | 7500 | E903 |
| 0000134000 | 007E | 068E | 3A6C | 8326 | 273E | 00AD | 0375 | 09E9 |
| 0000134020 | 8300 | DA7E | 74FE | E903 | 000F | 068E | 3A6E | 8326 |
| 0000134040 | 3F3E | 00AD | 0375 | 51E9 | 8B00 | F046 | 4689 | FFDC |
| 0000134060 | E076 | 76FF | 8DDE | DC46 | 5016 | 76FF | FFEE | F876 |
| 0000134100 | 76FF | 8DF6 | E24E | 5116 | 4E8D | 16F2 | 8D51 | D64E |
| 0000134120 | 5116 | 681E | 07F2 | D868 | FF01 | 5A36 | FF07 | 5836 |

THU MAR 14 17:31:54 1991 DB_PI.DLL PAGE 51, LINE 2951

| | | | | | | | | |
|---|---|---|---|---|---|---|---|---|
| 0000134140 | FF07 | 5E36 | FF07 | 5C36 | 9A07 | AD88 | 0000 | C483 |
| 0000134160 | 8B28 | DC46 | A7E9 | E900 | 0006 | 468B | E9F0 | 009E |
| 0000134200 | 76FF | FF08 | 0676 | 76FF | FF0C | 0A76 | 76FF | FF0E |
| 0000134220 | FC76 | 76FF | 9AFA | 3B01 | A6B0 | C483 | 890E | F046 |
| 0000134240 | 068E | 3A6C | 8326 | 523E | 00A8 | 0375 | 09E9 | 8300 |
| 0000134260 | DA7E | 74FE | E903 | 000F | 068E | 3A6E | 8326 | 6A3E |
| 0000134300 | 00A8 | 0375 | 51E9 | 8B00 | F046 | 4689 | FFDC | E076 |
| 0000134320 | 76FF | 8DDE | DC46 | 5016 | 76FF | FFEE | F876 | 76FF |
| 0000134340 | 8DF6 | E24E | 5116 | 4E8D | 16F2 | 8D51 | D64E | 5116 |
| 0000134360 | 681E | 07F2 | DD68 | FF01 | 5A36 | FF07 | 5836 | FF07 |
| 0000134400 | 5E36 | FF07 | 5C36 | 9A07 | A8B2 | 0000 | C483 | 8B28 |
| 0000134420 | DC46 | 09E9 | E900 | 0006 | 468B | E9F0 | 0000 | 5E1F |
| 0000134440 | 835F | 02ED | E58B | 5D1F | CA4D | 000E | 581E | 4590 |
| 0000134460 | 8B55 | 1EEC | D88E | EC81 | 0032 | 5657 | B81E | AA3F |
| 0000134500 | D88E | 46C7 | 0EF6 | 8C08 | F85E | 46C7 | 01EA | 2B01 |
| 0000134520 | 89C0 | DC46 | 4689 | 8EDA | 7006 | 263A | 3E83 | AA5F |
| 0000134540 | 7500 | E903 | 001D | 36FF | 0822 | 36FF | 0820 | 468D |
| 0000134560 | 16D2 | 9A50 | AA75 | 0000 | C483 | 3D08 | 0000 | 0374 |
| 0000134600 | 0FE9 | 8E00 | 7206 | 263A | 3E83 | AE9F | 7500 | E903 |
| 0000134620 | 003A | 681E | 0815 | 468D | 16DE | 8D50 | D246 | 5016 |
| 0000134640 | 468D | 16F2 | 6A50 | 1E5F | 2468 | FF08 | 1E36 | FF08 |
| 0000134660 | 1C36 | FF08 | 2236 | FF08 | 2036 | 9A08 | AABE | 0000 |
| 0000134700 | C483 | 891E | F246 | 5689 | E9F4 | 0008 | C02B | 4689 |
| 0000134720 | 89F4 | F246 | 5EC4 | 2B06 | 26C0 | 4789 | 2602 | 0789 |
| 0000134740 | 7E83 | 000E | 0376 | 93E9 | 8300 | 0C7E | 7E00 | E903 |
| 0000134760 | 008A | 037D | 09E9 | 8300 | 0A7E | 7600 | E903 | 007C |
| 0000135000 | 068E | 3A70 | 8326 | 243E | 00AF | 0375 | 09E9 | 8300 |
| 0000135020 | D67E | 74FE | E903 | 000F | 068E | 3A72 | 8326 | 3C3E |
| 0000135040 | 00AF | 0375 | 4FE9 | C700 | D846 | 0015 | 76FF | FFDC |
| 0000135060 | DA76 | 468D | 16D8 | FF50 | EA76 | 76FF | FFF8 | F676 |
| 0000135100 | 4E8D | 16DE | 8D51 | F24E | 5116 | 4E8D | 16D2 | 1E51 |
| 0000135120 | 2468 | 6A08 | FF6A | 1E36 | FF08 | 1C36 | FF08 | 2236 |
| 0000135140 | FF08 | 2036 | 9A08 | AF84 | 0000 | C483 | 8B28 | D846 |
| 0000135160 | 93E9 | E904 | 0006 | 15B8 | E900 | 048A | 468D | 16FA |
| 0000135200 | 6A50 | FF00 | 1276 | 76FF | 9A10 | CF64 | ABA1 | C483 |
| 0000135220 | 890A | EC46 | 7E83 | 00EC | 0375 | 7DE9 | 8E00 | 7006 |
| 0000135240 | 263A | 3E83 | AFF6 | 7500 | E903 | 0009 | 7E83 | FED6 |
| 0000135260 | 0374 | 0FE9 | 8E00 | 7206 | 263A | 3E83 | B00E | 7500 |
| 0000135300 | E903 | 0050 | 468B | 89EC | D846 | 76FF | FFDC | DA76 |
| 0000135320 | 468D | 16D8 | FF50 | EA76 | 76FF | FFF8 | F676 | 4E8D |
| 0000135340 | 16DE | 8D51 | F24E | 5116 | 4E8D | 16D2 | 1E51 | 2468 |
| 0000135360 | 6A08 | FF6E | 1E36 | FF08 | 1C36 | FF08 | 2236 | FF08 |
| 0000135400 | 2036 | 9A08 | B055 | 0000 | C483 | 8B28 | D846 | F5E9 |
| 0000135420 | E903 | 0006 | 468B | E9EC | 03EC | 468B | 8B0A | 0C56 |
| 0000135440 | 4603 | 830E | 00D2 | B405 | 8300 | 00D2 | 4689 | 89CE |
| 0000135460 | D056 | 7E83 | 01D0 | 037E | 26E9 | 7D01 | E903 | 0009 |
| 0000135500 | 7E83 | 00CE | 0372 | 18E9 | FF01 | CE76 | 016A | 769A |
| 0000135520 | ED33 | 83B0 | 04C4 | 5EC4 | 2606 | 0789 | 8926 | 0257 |
| 0000135540 | 5EC4 | 2606 | 478B | 2602 | 070B | 0374 | 7CE9 | 8E00 |
| 0000135560 | 7006 | 263A | 3E83 | B112 | 7500 | E903 | 0009 | 7E83 |
| 0000135600 | FED6 | 0374 | 0FE9 | 8E00 | 7206 | 263A | 3E83 | B12A |
| 0000135620 | 7500 | E903 | 004F | 46C7 | 07D8 | FF00 | DC76 | 76FF |
| 0000135640 | 8DDA | D846 | 5016 | 76FF | FFEA | F876 | 76FF | 8DF6 |
| 0000135660 | DE4E | 5116 | 4E8D | 16F2 | 8D51 | D24E | 5116 | 681E |
| 0000135700 | 0824 | 796A | 36FF | 081E | 36FF | 081C | 36FF | 0822 |
| 0000135720 | 36FF | 0820 | 729A | 00B1 | 8300 | 28C4 | 468B | E9D8 |
| 0000135740 | 0324 | 06E9 | B800 | 0007 | 1BE9 | 8303 | 0E7E | 7500 |
| 0000135760 | E903 | 001E | 5EC4 | 2606 | 078B | 8B26 | 0257 | B405 |
| 0000136000 | C400 | 065E | C426 | 261F | 4789 | 2668 | 5789 | E96A |

THU MAR 14 17:31:54 1991 DB_PI.DLL PAGE 52, LINE 3010

| | | | | | | | | |
|---|---|---|---|---|---|---|---|---|
| 0000136020 | 0010 | 5EC4 | 2606 | 1FC4 | C02B | 8926 | 6A47 | 8926 |
| 0000136040 | 6847 | 468B | 0B0C | 0A46 | 0375 | 21E9 | C400 | 065E |
| 0000136060 | 8B26 | 2607 | 578B | 0302 | 0E46 | B405 | C400 | 065E |
| 0000136100 | C426 | 261F | 4789 | 2670 | 5789 | E972 | 0010 | 5EC4 |
| 0000136120 | 2606 | 1FC4 | C02B | 8926 | 7247 | 8926 | 7047 | E1E° |
| 0000136140 | 8B01 | 0E46 | B405 | 5000 | 016A | 769A | F533 | 83A8 |
| 0000136160 | 04C4 | 5EC4 | 2606 | 0789 | 8926 | 0257 | 5EC4 | 2606 |
| 0000136200 | 478B | 2602 | 070B | 0374 | 7DE9 | 8E00 | 7006 | 263A |
| 0000136220 | 3E83 | ADDE | 7500 | E903 | 0009 | 7E83 | FED6 | 0374 |
| 0000136240 | 0FE9 | 8E00 | 7206 | 263A | 3E83 | AA8B | 7500 | E903 |
| 0000136260 | 0050 | 46C7 | 07D8 | FF00 | DC76 | 76FF | 8DDA | D846 |
| 0000136300 | 5016 | 76FF | FFEA | F876 | 76FF | 8DF6 | DE4E | 5116 |
| 0000136320 | 4E8D | 16F2 | 8D51 | D24E | 5116 | 681E | 0824 | 8E68 |
| 0000136340 | FF00 | 1E36 | FF08 | 1C36 | FF08 | 2236 | FF08 | 2036 |
| 0000136360 | 9A08 | AB7B | 0000 | C483 | 8B28 | D846 | 07E9 | E902 |
| 0000136400 | 0006 | 07B8 | E900 | 01FE | 7E83 | 000E | 0375 | 1EE9 |
| 0000136420 | C400 | 065E | 8B26 | 2607 | 578B | 0502 | 00B4 | 5EC4 |
| 0000136440 | 2606 | 1FC4 | 8926 | 6847 | 8926 | 6A57 | 10E9 | C400 |
| 0000136460 | 065E | C426 | 281F | 26C0 | 4789 | 266A | 4789 | 6A68 |
| 0000136500 | 6A01 | FF00 | 0C76 | 76FF | 9A0A | 436A | B201 | D00B |
| 0000136520 | 0374 | 15E9 | 8B00 | 0A46 | 568B | 050C | 0001 | D283 |
| 0000136540 | 8900 | EE46 | 5689 | E9F0 | 000C | 468B | 8B0A | 0C56 |
| 0000136560 | 4689 | 89EE | F056 | 016A | 76FF | FFF0 | EE76 | D99A |
| 0000136600 | 3433 | 83B2 | 06C4 | 5EC4 | 2606 | 1FC4 | 8926 | 7047 |
| 0000136620 | 8926 | 7257 | 5EC4 | 2606 | 1FC4 | 8B26 | 7247 | 0B26 |
| 0000136640 | 7047 | 0374 | 9BE9 | C400 | 065E | FF26 | 0277 | FF26 |
| 0000136660 | 9A37 | 2448 | B2F6 | C483 | C404 | 065E | C02B | 8926 |
| 0000136700 | 0247 | 8926 | 8E07 | 7006 | 263A | 3E83 | B310 | 7500 |
| 0000136720 | E903 | 0009 | 7E83 | FED6 | 0374 | 0FE9 | 8E00 | 7206 |
| 0000136740 | 263A | 3E83 | B328 | 7500 | E903 | 0050 | 46C7 | 07D8 |
| 0000136760 | FF00 | DC76 | 76FF | 8DDA | D846 | 5016 | 76FF | FFEA |
| 0000137000 | F876 | 76FF | 8DF6 | DE4E | 5116 | 4E8D | 16F2 | 8D51 |
| 0000137020 | D24E | 5116 | 681E | 0824 | A768 | FF00 | 1E36 | FF08 |
| 0000137040 | 1C36 | FF08 | 2236 | FF08 | 2036 | 9A08 | B370 | 0000 |
| 0000137060 | C483 | 8B28 | D846 | CDE9 | E900 | 0006 | 07B8 | E900 |
| 0000137100 | 00C4 | 5EC4 | 2606 | 1FC4 | C726 | 4847 | 0000 | 468B |
| 0000137120 | C40E | 065E | C426 | 261F | 4789 | 8B66 | 0A46 | 568B |
| 0000137140 | C40C | 065E | C426 | 261F | 4789 | 266C | 5789 | 6A6E |
| 0000137160 | 6A00 | 9A00 | 3908 | AFD1 | C483 | C404 | 065E | C426 |
| 0000137200 | 261F | 4789 | 2650 | 5789 | 8E52 | 7006 | 263A | 3E83 |
| 0000137220 | AE87 | 7500 | E903 | 0009 | 7E83 | FED6 | 0374 | 0FE9 |
| 0000137240 | 8E00 | 7206 | 263A | 3E83 | AE0A | 7500 | E903 | 0050 |
| 0000137260 | 46C7 | 00D8 | FF00 | DC76 | 76FF | 8DDA | D846 | 5016 |
| 0000137300 | 76FF | FFEA | F876 | 76FF | 8DF6 | DE4E | 5116 | 4E8D |
| 0000137320 | 16F2 | 8D51 | D24E | 5116 | 681E | 0824 | B168 | FF00 |
| 0000137340 | 1E36 | FF08 | 1C36 | FF08 | 2236 | FF08 | 2036 | 9A08 |
| 0000137360 | AEE6 | 0000 | C483 | 8B28 | D846 | 09E9 | E900 | 0006 |
| 0000137400 | 00B8 | E900 | 0000 | 5E1F | 835F | 02ED | E58B | 5D1F |
| 0000137420 | CA4D | 000E | 581E | 4590 | 8B55 | 1EEC | D88E | EC81 |
| 0000137440 | 0036 | 5657 | B81E | ADBE | D88E | 46C7 | 31F6 | 8C08 |
| 0000137460 | F85E | 46C7 | 01E6 | 2B01 | 89C0 | D846 | 4689 | 8ED6 |
| 0000137500 | 7006 | 263A | 3E83 | B45B | 7500 | E903 | 001D | 36FF |
| 0000137520 | 0822 | 36FF | 0820 | 468D | 16CA | 9A50 | ADF4 | 0000 |
| 0000137540 | C483 | 3D08 | 0000 | 0374 | 0FE9 | 8E00 | 7206 | 263A |
| 0000137560 | 3E83 | B473 | 7500 | E903 | 003B | 681E | 0838 | 468D |
| 0000137600 | 16DA | 8D50 | CA46 | 5016 | 468D | 16F2 | 6850 | 00D8 |
| 0000137620 | 681E | 0840 | 36FF | 081E | 36FF | 081C | 36FF | 0822 |
| 0000137640 | 36FF | 0820 | 3C9A | 00AE | 8300 | 1EC4 | 4689 | 89F2 |
| 0000137660 | F456 | 08E9 | 2B00 | 89C0 | F446 | 4689 | C4F2 | 065E |

THU MAR 14 17:31:54 1991 DB_PI.DLL PAGE 53, LINE 3069

| | | | | | | | | |
|---|---|---|---|---|---|---|---|---|
| 0000137700 | C02B | 8926 | 0247 | 8926 | 8B07 | 1246 | 460B | 7410 |
| 0000137720 | E903 | 007D | 068E | 3A70 | 8326 | EC3E | 00B4 | 0375 |
| 0000137740 | 09E9 | 8300 | CE7E | 74FE | E903 | 000F | 068E | 3A72 |
| 0000137760 | 8326 | 043E | 00B5 | 0375 | 50E9 | C700 | D046 | 0017 |
| 0000140000 | 76FF | FFD8 | D676 | 468D | 16D0 | FF50 | E676 | 76FF |
| 0000140020 | FFF8 | F676 | 4E8D | 16DA | 8D51 | F24E | 5116 | 4E8D |
| 0000140040 | 16CA | 1E51 | 4068 | 6808 | 00E4 | 36FF | 081E | 36FF |
| 0000140060 | 081C | 36FF | 0822 | 36FF | 0820 | 4C9A | 00B5 | 8300 |
| 0000140100 | 28C4 | 468B | E9D0 | 064E | 06E9 | B800 | 0017 | 45E9 |
| 0000140120 | 8306 | 0E7E | 7600 | E903 | 0088 | 468B | 0B0C | 0A46 |
| 0000140140 | 0375 | 7DE9 | 8E00 | 7006 | 263A | 3E83 | B58A | 7500 |
| 0000140160 | E903 | 0009 | 7E83 | FECE | 0374 | 0FE9 | 8E00 | 7206 |
| 0000140200 | 263A | 3E83 | B5A2 | 7500 | E903 | 0050 | 46C7 | 15D0 |
| 0000140220 | FF00 | D876 | 76FF | 8DD6 | D046 | 5016 | 76FF | FFE6 |
| 0000140240 | F876 | 76FF | 8DF6 | DA4E | 5116 | 4E8D | 16F2 | 8D51 |
| 0000140260 | CA4E | 5116 | 681E | 0840 | E568 | FF00 | 1E36 | FF08 |
| 0000140300 | 1C36 | FF08 | 2236 | FF08 | 2036 | 9A08 | B5EB | 0000 |
| 0000140320 | C483 | 8B28 | D046 | BDE9 | E905 | 0006 | 15B8 | E900 |
| 0000140340 | 05B4 | 468D | 16FA | 6A50 | FF02 | 1676 | 76FF | 9A14 |
| 0000140360 | CF64 | AF0C | C483 | 890A | EC46 | 7E83 | 00EC | 0375 |
| 0000140400 | 7EE9 | 8E00 | 7006 | 263A | 3E83 | B67E | 7500 | E903 |
| 0000140420 | 0009 | 7E83 | FECE | 0374 | 0FE9 | 8E00 | 7206 | 263A |
| 0000140440 | 3E83 | B696 | 7500 | E903 | 0051 | 468B | 89EC | D046 |
| 0000140460 | 76FF | FFD8 | D676 | 468D | 16D0 | FF50 | E676 | 76FF |
| 0000140500 | FFF8 | F676 | 4E8D | 16DA | 8D51 | F24E | 5116 | 4E8D |
| 0000140520 | 16CA | 1E51 | 4068 | 6808 | 00E9 | 36FF | 081E | 36FF |
| 0000140540 | 081C | 36FF | 0822 | 36FF | 0820 | DE9A | 00B6 | 8300 |
| 0000140560 | 28C4 | 468B | E9D0 | 051E | 06E9 | 8B00 | EC46 | 15E9 |
| 0000140600 | C405 | 105E | 8B26 | 6C47 | 8B26 | 6E57 | 5EC4 | 2610 |
| 0000140620 | 4703 | 8366 | 00D2 | B405 | 8300 | 00D2 | 4689 | 89D2 |
| 0000140640 | D456 | 468B | 8B0A | 0C56 | 4603 | 830E | 00D2 | B405 |
| 0000140660 | 8300 | 00D2 | 4389 | 89E8 | EA56 | 7E83 | 01EA | 037E |
| 0000140700 | 78E9 | 7D01 | E903 | 0009 | 7E83 | 00E8 | 0372 | 6AE9 |
| 0000140720 | FF01 | E876 | 016A | 769A | CC33 | 83B1 | 04C4 | 5EC4 |
| 0000140740 | 2606 | 0789 | 8926 | 0257 | 5EC4 | 2606 | 478B | 2602 |
| 0000140760 | 070B | 0374 | 7DE9 | 8E00 | 7006 | 263A | 3E83 | B24C |
| 0000141000 | 7500 | E903 | 0009 | 7E83 | FECE | 0374 | 0FE9 | 8E00 |
| 0000141020 | 7206 | 263A | 3E83 | B264 | 7500 | E903 | 0050 | 46C7 |
| 0000141040 | 07D0 | FF00 | D876 | 76FF | 8DD6 | D046 | 5016 | 76FF |
| 0000141060 | FFE6 | F876 | 76FF | 8DF6 | DA4E | 5116 | 4E8D | 16F2 |
| 0000141100 | 8D51 | CA4E | 5116 | 681E | 0840 | F468 | FF00 | 1E36 |
| 0000141120 | FF0B | 1C36 | FF08 | 2236 | FF08 | 2036 | 9A08 | B2AC |
| 0000141140 | 0000 | C483 | 8B28 | D046 | 2BE9 | E904 | 0006 | 07B8 |
| 0000141160 | E900 | 0422 | B468 | FF00 | 1276 | 76FF | C410 | 065E |
| 0000141200 | FF26 | 0277 | FF26 | 9A37 | 3E30 | B78C | C483 | 8B0A |
| 0000141220 | 0C46 | 460B | 750A | E903 | 007A | 5EC4 | 2606 | 1FC4 |
| 0000141240 | 8B26 | 6847 | 8B26 | 6A57 | 4603 | C40E | 065E | C426 |
| 0000141260 | 261F | 4789 | 2670 | 5789 | C472 | 105E | 8B26 | 7247 |
| 0000141300 | 0B26 | 7047 | 0375 | 48E9 | C400 | 105E | 8B26 | 6C47 |
| 0000141320 | 8B26 | 6E57 | 563B | 7D0C | E903 | 0013 | 037E | 08E9 |
| 0000141340 | 3B00 | 0A46 | 0377 | 06E9 | 8B00 | 0C56 | 468B | 500A |
| 0000141360 | 5EC4 | 2610 | 77FF | 2672 | 77FF | C470 | 065E | C426 |
| 0000141400 | 261F | 77FF | 2672 | 77FF | 9A70 | 3E30 | B7C7 | C483 |
| 0000141420 | E90A | 0010 | 5EC4 | 2606 | 1FC4 | C02B | 8926 | 7247 |
| 0000141440 | 8926 | 7047 | 468B | 8B0A | 0C56 | 5EC4 | 2606 | 1FC4 |
| 0000141460 | 8926 | 6C47 | 8926 | 6E57 | 2FE9 | 8B02 | 0E46 | B405 |
| 0000141500 | 5000 | 016A | 769A | 7833 | 83B8 | 04C4 | 5EC4 | 2606 |
| 0000141520 | 0789 | 8926 | 0257 | 5EC4 | 2606 | 478B | 2602 | 070B |
| 0000141540 | 0374 | 7DE9 | 8E00 | 7006 | 263A | 3E83 | B90A | 7500 |

THU MAR 14 17:31:54 1991 DB_PI.DLL PAGE 54, LINE 3128

| | | | | | | | | |
|---|---|---|---|---|---|---|---|---|
| 0000141560 | E903 | 0009 | 7E83 | FECE | 0374 | 0FE9 | 8E00 | 7206 |
| 0000141600 | 263A | 3E83 | B922 | 7500 | E903 | 0050 | 46C7 | 07D0 |
| 0000141620 | FF00 | D876 | 76FF | 8DD6 | D046 | 5016 | 76FF | FFE6 |
| 0000141640 | F876 | 76FF | 8DF6 | DA4E | 5116 | 4E8D | 16F2 | 8D51 |
| 0000141660 | CA4E | 5116 | 681E | 0840 | 1368 | FF01 | 1E36 | FF08 |
| 0000141700 | 1C36 | FF08 | 2236 | FF08 | 2036 | 9A08 | B96A | 0000 |
| 0000141720 | C483 | 8B28 | D046 | BDE9 | E902 | 0006 | 07B8 | E900 |
| 0000141740 | 02B4 | B468 | FF00 | 1276 | 76FF | C410 | 065E | FF26 |
| 0000141760 | 0277 | FF26 | 9A37 | 3E30 | B88A | C483 | 6A0A | 6A01 |
| 0000142000 | FF00 | 0C76 | 76FF | 9A0A | 436A | B8BF | D00B | 0374 |
| 0000142020 | 15E9 | 8B00 | 0A46 | 568B | 050C | 0001 | D283 | 8900 |
| 0000142040 | EE46 | 5689 | E9F0 | 000C | 468B | 8B0A | 0C56 | 4689 |
| 0000142060 | 89EE | F056 | 016A | 76FF | FFF0 | EE76 | D99A | F233 |
| 0000142100 | 83B8 | 06C4 | 5EC4 | 2606 | 1FC4 | 8926 | 7047 | 8926 |
| 0000142120 | 7257 | 5EC4 | 2606 | 1FC4 | 8B26 | 7247 | 0B26 | 7047 |
| 0000142140 | 0374 | 9BE9 | C400 | 065E | FF26 | 0277 | FF26 | 9A37 |
| 0000142160 | 2448 | BA4C | C483 | C404 | 065E | C02B | 8926 | 0247 |
| 0000142200 | 8926 | 8E07 | 7006 | 263A | 3E83 | BAA0 | 7500 | E903 |
| 0000142220 | 0009 | 7E83 | FECE | 0374 | 0FE9 | 8E00 | 7206 | 263A |
| 0000142240 | 3E83 | B3F2 | 7500 | E903 | 0050 | 46C7 | 07D0 | FF00 |
| 0000142260 | D876 | 76FF | 8DD6 | D046 | 5016 | 76FF | FFE6 | F876 |
| 0000142300 | 76FF | 8DF6 | DA4E | 5116 | 4E8D | 16F2 | 8D51 | CA4E |
| 0000142320 | 5116 | 681E | 0840 | 2A68 | FF01 | 1E36 | FF08 | 1C36 |
| 0000142340 | FF08 | 2236 | FF08 | 2036 | 9A08 | B4BB | 0000 | C483 |
| 0000142360 | 8B28 | D046 | 9FE9 | E901 | 0006 | 07B8 | E900 | 0196 |
| 0000142400 | 468B | 8B0A | 0C56 | 5EC4 | 2606 | 1FC4 | 8926 | 6C47 |
| 0000142420 | 8926 | 6E57 | 5EC4 | 2610 | 478B | 2672 | 470B | 7570 |
| 0000142440 | E903 | 0046 | 5EC4 | 2606 | 1FC4 | FF26 | 7277 | FF26 |
| 0000142460 | 7077 | 5EC4 | 2610 | 77FF | 2672 | 77FF | C470 | 105E |
| 0000142500 | 8B26 | 6C47 | 8B26 | 6E57 | 563B | 7D0C | E903 | 0013 |
| 0000142520 | 037E | 08E9 | 3B00 | 0A46 | 0377 | 06E9 | 8B00 | 0C56 |
| 0000142540 | 468B | 520A | 9A50 | A986 | B572 | 7E83 | 000E | 0375 |
| 0000142560 | 61E9 | C400 | 065E | 8B26 | 2607 | 578B | 0502 | 00B4 |
| 0000142600 | 5EC4 | 2606 | 1FC4 | 8926 | 6847 | 8926 | 6A57 | 5EC4 |
| 0000142620 | 2610 | 478B | 266A | 470B | 7568 | E903 | 0033 | 5EC4 |
| 0000142640 | 2610 | 478B | 2B66 | 0E46 | C91B | C123 | 4603 | 500E |
| 0000142660 | 5EC4 | 2610 | 77FF | 266A | 77FF | C468 | 065E | C426 |
| 0000142700 | 261F | 77FF | 266A | 77FF | 9A68 | 3E30 | BA86 | C483 |
| 0000142720 | E90A | 0010 | 5EC4 | 2606 | 1FC4 | C02B | 8926 | 6A47 |
| 0000142740 | 8926 | 6847 | 468B | C40E | 065E | C426 | 261F | 4789 |
| 0000142760 | FF66 | 1276 | 76FF | 9A10 | 1762 | AC69 | C483 | 6A04 |
| 0000143000 | 6A00 | 9A00 | 3908 | B659 | C483 | C404 | 065E | C426 |
| 0000143020 | 261F | 4789 | 2650 | 5789 | 8E52 | 7006 | 263A | 3E83 |
| 0000143040 | B3C6 | 7500 | E903 | 0009 | 7E83 | FECE | 0374 | 0FE9 |
| 0000143060 | 8E00 | 7206 | ?63A | 3E83 | B804 | 7500 | E903 | 0050 |
| 0000143100 | 46C7 | 00D0 | FF00 | D876 | 76FF | 8DD6 | D046 | 5016 |
| 0000143120 | 76FF | FFE6 | F876 | 76FF | 8DF6 | DA4E | 5116 | 4E8D |
| 0000143140 | 16F2 | 8D51 | CA4E | 5116 | 681E | 0840 | 4F68 | FF01 |
| 0000143160 | 1E36 | FF08 | 1C36 | FF08 | 2236 | FF08 | 2036 | 9A08 |
| 0000143200 | B84C | 0000 | C483 | 8B28 | D046 | 09E9 | E900 | 0006 |
| 0000143220 | 00B8 | E900 | 0000 | 5E1F | 835F | 02ED | E58B | 5D1F |
| 0000143240 | CA4D | 0012 | 581E | 4590 | 8B55 | 1EEC | D88E | EC81 |
| 0000143260 | 002A | 5657 | B81E | B3A6 | D88E | 46C7 | 4FF6 | 8C08 |
| 0000143300 | F85E | 46C7 | 01EE | 2B01 | B9C0 | E046 | 4689 | 8EDE |
| 0000143320 | 7006 | 263A | 3E83 | BBDF | 7500 | E903 | 001D | 36FF |
| 0000143340 | 0822 | 36FF | 0820 | 468D | 16D6 | 9A50 | B3DC | 0000 |
| 0000143360 | C483 | 3D08 | 0000 | 0374 | 0FE9 | 8E00 | 7206 | 263A |
| 0000143400 | 3E83 | BBF7 | 7500 | E903 | 003B | 681E | 0856 | 468D |
| 0000143420 | 16E2 | 8D50 | D646 | 5016 | 468D | 16F2 | 6850 | 0170 |

THU MAR 14 17:31:54 1991 DB_PI.DLL PAGE 55, LINE 3187

| | | | | | | | | |
|---|---|---|---|---|---|---|---|---|
| 0000143440 | 681E | 085E | 36FF | 081E | 36FF | 081C | 36FF | 0822 |
| 0000143460 | 36FF | 0820 | 259A | 00B4 | 8300 | 1EC4 | 4689 | 89F2 |
| 0000143500 | F456 | 08E9 | 2B00 | 89C0 | F446 | 4689 | 8BF2 | 0846 |
| 0000143520 | 460B | 7406 | E903 | 007D | 068E | 3A70 | 8326 | 7D3E |
| 0000143540 | 00BC | 0375 | 09E9 | 8300 | DA7E | 74FE | E903 | 000F |
| 0000143560 | 068E | 3A72 | 8326 | 953E | 00BC | 0375 | 50E9 | C700 |
| 0000143600 | DC46 | 0017 | 76FF | FFE0 | DE76 | 468D | 16DC | FF50 |
| 0000143620 | EE76 | 76FF | FFF8 | F676 | 4E8D | 16E2 | 8D51 | F24E |
| 0000143640 | 5116 | 4E8D | 16D6 | 1E51 | 5E68 | 6808 | 0177 | 36FF |
| 0000143660 | 081E | 36FF | 081C | 36FF | 0822 | 36FF | 0820 | DE9A |
| 0000143700 | 00BC | 8300 | 28C4 | 468B | E9DC | 0133 | 06E9 | B800 |
| 0000143720 | 0017 | 2AE9 | 8D01 | FA46 | 5016 | 026A | 76FF | FF0C |
| 0000143740 | 0A76 | 649A | E8CF | 83B9 | 0AC4 | 4689 | 83F0 | F07E |
| 0000143760 | 7500 | E903 | 007E | 068E | 3A70 | 8326 | 093E | 00BD |
| 0000144000 | 0375 | 09E9 | 8300 | DA7E | 74FE | E903 | 000F | 068E |
| 0000144020 | 3A72 | 8326 | 213E | 00BD | 0375 | 51E9 | 8B00 | F046 |
| 0000144040 | 4689 | FFDC | E076 | 76FF | 8DDE | DC46 | 5016 | 76FF |
| 0000144060 | FFEE | F876 | 76FF | 8DF6 | E24E | 5116 | 4E8D | 16F2 |
| 0000144100 | 8D51 | D64E | 5116 | 681E | 085E | 7B68 | FF01 | 1E36 |
| 0000144120 | FF08 | 1C36 | FF08 | 2236 | FF08 | 2036 | 9A08 | BD69 |
| 0000144140 | 0000 | C483 | 8B28 | DC46 | 94E9 | E900 | 0006 | 468B |
| 0000144160 | E9F0 | 008B | 76FF | FF08 | 0676 | 629A | 7A17 | 83BA |
| 0000144200 | 04C4 | 068E | 3A70 | 8326 | EC3E | 00B7 | 0375 | 09E9 |
| 0000144220 | 8300 | DA7E | 74FE | E903 | 000F | 068E | 3A72 | 8326 |
| 0000144240 | B83E | 00BA | 0375 | 50E9 | C700 | DC46 | 0000 | 76FF |
| 0000144260 | FFE0 | DE76 | 468D | 16DC | FF50 | EE76 | 76FF | FFF8 |
| 0000144300 | F676 | 4E8D | 16E2 | 8D51 | F24E | 5116 | 4E8D | 16D6 |
| 0000144320 | 1E51 | 5E68 | 6808 | 0180 | 36FF | 081E | 36FF | 081C |
| 0000144340 | 36FF | 0822 | 36FF | 0820 | 009A | 00BB | 8300 | 28C4 |
| 0000144360 | 468B | E9DC | 0009 | 06E9 | B800 | 0000 | 00E9 | 1F00 |
| 0000144400 | 5F5E | ED83 | 8B02 | 1FE5 | 4D5D | 08CA | 1E00 | 9058 |
| 0000144420 | 5545 | EC8B | 8E1E | 81D8 | E6EC | 5700 | 1E56 | 36B8 |
| 0000144440 | 8EBB | C7D8 | F646 | 086A | 5E8C | C7F8 | 3886 | 01FF |
| 0000144460 | 2B01 | 89C0 | 2A86 | 89FF | 2886 | 8EFF | 7006 | 263A |
| 0000144500 | 3E83 | BE60 | 7500 | E903 | 001E | 36FF | 0822 | 36FF |
| 0000144520 | 0820 | 868D | FF20 | 5016 | 6C9A | 00BB | 8300 | 08C4 |
| 0000144540 | 003D | 7400 | E903 | 000F | 068E | 3A72 | 8326 | 793E |
| 0000144560 | 00BE | 0375 | 3DE9 | 1E00 | 7168 | 8D08 | 2C86 | 16FF |
| 0000144600 | 8D50 | 2086 | 16FF | 8D50 | F246 | 5016 | C168 | 1E01 |
| 0000144620 | 7868 | FF08 | 1E36 | FF08 | 1C36 | FF08 | 2236 | FF08 |
| 0000144640 | 2036 | 9A08 | BBB5 | 0000 | C483 | 891E | F246 | 5689 |
| 0000144660 | E9F4 | 0008 | C02B | 4689 | B9F4 | F246 | 86C7 | FF3A |
| 0000144700 | 0000 | 5EC4 | 2B06 | 26C0 | 4789 | 2602 | 0789 | 468B |
| 0000144720 | 0B12 | 1046 | 0374 | 86E9 | 8E00 | 7006 | 263A | 3E83 |
| 0000144740 | BF19 | 7500 | E903 | 000A | BE83 | FF24 | 74FE | E903 |
| 0000144760 | 000F | 068E | 3A72 | 8326 | 323E | 00BF | 0375 | 58E9 |
| 0000145000 | C700 | 2686 | 17FF | FF00 | 2AB6 | FFFF | 28B6 | 8DFF |
| 0000145020 | 2686 | 16FF | FF50 | 38B6 | FFFF | F876 | 76FF | 8DF6 |
| 0000145040 | 2C8E | 16FF | 8D51 | F24E | 5116 | 8E8D | FF20 | 5116 |
| 0000145060 | 681E | 0878 | CD68 | FF01 | 1E36 | FF08 | 1C36 | FF08 |
| 0000145100 | 2236 | FF08 | 2036 | 9A08 | BF81 | 0000 | C483 | 8B28 |
| 0000145120 | 2686 | E9FF | 06D0 | 06E9 | B800 | 0017 | C7E9 | C406 |
| 0000145140 | 105E | 8326 | 487F | 7D78 | E903 | 0016 | 5EC4 | 2610 |
| 0000145160 | 7F83 | 7B48 | 037C | 09E9 | C700 | 1E86 | 01FF | E900 |
| 0000145200 | 0006 | 86C7 | FF1E | 0000 | BE83 | FF1E | 7400 | E903 |
| 0000145220 | 0086 | 068E | 3A70 | 8326 | C03E | 00BF | 0375 | 0AE9 |
| 0000145240 | 8300 | 24BE | FEFF | 0374 | 0FE9 | 8E00 | 7206 | 263A |
| 0000145260 | 3E83 | BFD9 | 7500 | E903 | 0058 | 86C7 | FF26 | 01AD |
| 0000145300 | B6FF | FF2A | 36FF | FF28 | 868D | FF26 | 5016 | B6FF |

THU MAR 14 17:31:54 1991 DB_PI.DLL PAGE 56, LINE 3246

| | | | | | | | | |
|---|---|---|---|---|---|---|---|---|
| 0000145320 | FF38 | 76FF | FFF8 | F676 | 8E8D | FF2C | 5116 | 4E8D |
| 0000145340 | 16F2 | 8D51 | 208E | 16FF | 1E51 | 7868 | 6808 | 01CF |
| 0000145360 | 36FF | 081E | 36FF | 081C | 36FF | 0822 | 36FF | 0820 |
| 0000145400 | 299A | 00C0 | 8300 | 28C4 | 868B | FF26 | 17E9 | E906 |
| 0000145420 | 0006 | ADB8 | E901 | 060E | 468D | 16FA | 6A50 | FF02 |
| 0000145440 | 1676 | 76FF | 9A14 | CF64 | BC65 | C483 | 890A | F046 |
| 0000145460 | 7E83 | 00F0 | 0375 | 87E9 | 8E00 | 7006 | 263A | 3E83 |
| 0000145500 | BB56 | 7500 | E903 | 000A | BE83 | FF24 | 74FE | E903 |
| 0000145520 | 000F | 068E | 3A72 | 8326 | 823E | 00BB | 0375 | 59E9 |
| 0000145540 | 8B00 | F046 | 8689 | FF26 | B6FF | FF2A | B6FF | FF28 |
| 0000145560 | 868D | FF26 | 5016 | B6FF | FF38 | 76FF | FFF8 | F676 |
| 0000145600 | 8E8D | FF2C | 5116 | 4E8D | 16F2 | 8D51 | 208E | 16FF |
| 0000145620 | 1E51 | 7868 | 6808 | 01D4 | 36FF | 081E | 36FF | 081C |
| 0000145640 | 36FF | 0822 | 36FF | 0820 | 3F9A | 00BC | 8300 | 28C4 |
| 0000145660 | 868B | FF26 | 6FE9 | E905 | 0006 | 468B | E9F0 | 0566 |
| 0000145700 | 468B | 8B10 | 1256 | 0405 | 5200 | 8B50 | 1046 | 568B |
| 0000145720 | 0512 | 0004 | 5052 | 3D9A | A342 | 8391 | 08C4 | 4689 |
| 0000145740 | 83F0 | F07E | 7500 | E903 | 0087 | 068E | 3A70 | 8326 |
| 0000145760 | 803E | 00C1 | 0375 | 0AE9 | 8300 | 24BE | FEFF | 0374 |
| 0000146000 | 0FE9 | 8E00 | 7206 | 263A | 3E83 | C199 | 7500 | E903 |
| 0000146020 | 0059 | 468B | 89F0 | 2686 | FFFF | 2AB6 | FFFF | 28B6 |
| 0000146040 | 8DFF | 2686 | 16FF | FF50 | 38B6 | FFFF | F876 | 76FF |
| 0000146060 | 8DF6 | 2C8E | 16FF | 8D51 | F24E | 5116 | 8E8D | FF20 |
| 0000146100 | 5116 | 681E | 0878 | D768 | FF01 | 1E36 | FF08 | 1C36 |
| 0000146120 | FF08 | 2236 | FF08 | 2036 | 9A08 | C1E9 | 0000 | C483 |
| 0000146140 | 8B28 | 2686 | E9FF | 04BE | 06E9 | 8B00 | F046 | B5E9 |
| 0000146160 | 6A04 | 6A30 | 8B00 | 1046 | 568B | 0512 | 0084 | 5052 |
| 0000146200 | 8E9A | 1A3E | 83C1 | 08C4 | 106A | 006A | 468B | 8B10 |
| 0000146220 | 1256 | 7405 | 5200 | 9A50 | 3E8E | B70A | C483 | C408 |
| 0000146240 | 105E | 8B26 | 0247 | 0B26 | 7407 | E903 | 0171 | 868D |
| 0000146260 | FF3C | 5016 | 006A | 006A | 006A | 5EC4 | 2610 | 77FF |
| 0000146300 | 8B48 | 1046 | 568B | 0512 | 0004 | 5052 | 76FF | FFFC |
| 0000146320 | FA76 | 669A | CC01 | 83C2 | 14C4 | 4689 | 83F0 | F07E |
| 0000146340 | 7500 | E903 | 009D | 7E81 | ABFD | 7401 | E903 | 0009 |
| 0000146360 | 86C7 | FF3A | 0000 | 87E9 | 8E00 | 7006 | 263A | 3E83 |
| 0000146400 | C213 | 7500 | E903 | 000A | BE83 | FF24 | 74FE | E903 |
| 0000146420 | 000F | 068E | 3A72 | 8326 | 2C3E | 00C2 | 0375 | 59E9 |
| 0000146440 | 8B00 | F046 | 8689 | FF26 | B6FF | FF2A | B6FF | FF28 |
| 0000146460 | 868D | FF26 | 5016 | B6FF | FF38 | 76FF | FFF8 | F676 |
| 0000146500 | 8E8D | FF2C | 5116 | 4E8D | 16F2 | 8D51 | 208E | 16FF |
| 0000146520 | 1E51 | 7868 | 6808 | 01E9 | 36FF | 081E | 36FF | 081C |
| 0000146540 | 36FF | 0822 | 36FF | 0820 | 7B9A | 00C2 | 8300 | 28C4 |
| 0000146560 | 868B | FF26 | AFE9 | E903 | 0006 | 468B | E9F0 | 03A6 |
| 0000146600 | 99E9 | 8300 | 0E7E | 7400 | E903 | 0089 | 068E | 3A70 |
| 0000146620 | 8326 | F73E | 00C2 | 0375 | 0AE9 | 8300 | 24BE | FEFF |
| 0000146640 | 0374 | 0FE9 | 8E00 | 7206 | 263A | 3E83 | C310 | 7500 |
| 0000146660 | E903 | 0058 | 86C7 | FF26 | 01AA | B6FF | FF2A | B6FF |
| 0000146700 | FF28 | 868D | FF26 | 5016 | B6FF | FF38 | 76FF | FFF8 |
| 0000146720 | F676 | 8E8D | FF2C | 5116 | 4E8D | 16F2 | 8D51 | 208E |
| 0000146740 | 16FF | 1E51 | 7868 | 6808 | 01ED | 36FF | 081E | 36FF |
| 0000146760 | 081C | 36FF | 0822 | 36FF | 0820 | 609A | 00C3 | 8300 |
| 0000147000 | 28C4 | 868B | FF26 | 1DE9 | E903 | 0006 | AAB8 | E901 |
| 0000147020 | 0314 | 07E9 | 8B00 | 0E46 | 8689 | FF3A | 7DE9 | 8D01 |
| 0000147040 | 3C86 | 16FF | 6A50 | C400 | 105E | FF26 | 0277 | FF26 |
| 0000147060 | C437 | 105E | FF26 | 4877 | 468B | 8B10 | 1256 | 0405 |
| 0000147100 | 5200 | FF50 | FC76 | 76FF | 9AFA | 0166 | BCFD | C483 |
| 0000147120 | 8914 | F046 | 7E83 | 00FD | 0375 | 9DE9 | 8100 | F07E |
| 0000147140 | 01AB | 0374 | 09E9 | C700 | 3A86 | 00FF | E900 | 0087 |
| 0000147160 | 068E | 3A70 | 8326 | 933E | 00C3 | 0375 | 0AE9 | 8300 |

THU MAR 14 17:31:54 1991 DB_PI.DLL PAGE 57, LINE 3305

| | | | | | | | | |
|---|---|---|---|---|---|---|---|---|
| 0000147200 | 24BE | FEFF | 0374 | 0FE9 | 8E00 | 7206 | 263A | 3E83 |
| 0000147220 | C3AC | 7500 | E903 | 0059 | 468B | 89F0 | 2686 | FFFF |
| 0000147240 | 2AB6 | FFFF | 28B6 | 8DFF | 2686 | 16FF | FF50 | 38B6 |
| 0000147260 | FFFF | F876 | 76FF | 8DF6 | 2C8E | 16FF | 8D51 | F24E |
| 0000147300 | 5116 | 8E8D | FF20 | 5116 | 681E | 0878 | FD68 | FF01 |
| 0000147320 | 1E36 | FF08 | 1C36 | FF08 | 2236 | FF08 | 2036 | 9A08 |
| 0000147340 | C3FB | 0000 | C483 | 8B28 | 2686 | E9FF | 0238 | 06E9 |
| 0000147360 | 8B00 | F046 | 2FE9 | E902 | 00A2 | 7E83 | 000E | 0375 |
| 0000147400 | 09E9 | 8300 | 0E7E | 7402 | E903 | 0089 | 068E | 3A70 |
| 0000147420 | 8326 | C23E | 00BD | 0375 | 0AE9 | 8300 | 24BE | FEFF |
| 0000147440 | 0374 | 0FE9 | 8E00 | 7206 | 263A | 3E83 | BDEF | 7500 |
| 0000147460 | E903 | 0058 | 86C7 | FF26 | 01AA | B6FF | FF2A | B6FF |
| 0000147500 | FF28 | 868D | FF26 | 5016 | B6FF | FF38 | 76FF | FFF8 |
| 0000147520 | F676 | 8E8D | FF2C | 5116 | 4E8D | 16F2 | 8D51 | 208E |
| 0000147540 | 16FF | 1E51 | 7868 | 6808 | 0202 | 36FF | 081E | 36FF |
| 0000147560 | 081C | 36FF | 0822 | 36FF | 0820 | C89A | 00BE | 8300 |
| 0000147600 | 28C4 | 868B | FF26 | 9DE9 | E901 | 0006 | AAB8 | E901 |
| 0000147620 | 0194 | 07E9 | 8B00 | 0E46 | 8689 | FF3A | BE83 | FF3A |
| 0000147640 | 7500 | E903 | 0009 | 868D | FF60 | D28C | 06E9 | B800 |
| 0000147660 | 0000 | 00BA | 8900 | 1A86 | 89FF | 1C96 | FFFF | 0876 |
| 0000147700 | 76FF | FF06 | 1276 | 76FF | 6A10 | FF01 | 0A76 | 76FF |
| 0000147720 | FF0C | 3AB6 | FFFF | 1CB6 | FFFF | 1AB6 | FFFF | FC76 |
| 0000147740 | 76FF | 9AFA | 1120 | C155 | C483 | 8918 | F046 | 7E83 |
| 0000147760 | 00F0 | 0375 | 93E9 | C400 | 065E | C02B | 8926 | 0247 |
| 0000150000 | 8926 | 8E07 | 7006 | 263A | 3E83 | C526 | 7500 | E903 |
| 0000150020 | 000A | BE83 | FF24 | 74FE | E903 | 000F | 068E | 3A72 |
| 0000150040 | 8326 | 3F3E | 00C5 | 0375 | 59E9 | 8B00 | F046 | 8689 |
| 0000150060 | FF26 | B6FF | FF2A | B6FF | FF28 | 868D | FF26 | 5016 |
| 0000150100 | B6FF | FF38 | 76FF | FFF8 | F676 | 8E8D | FF2C | 5116 |
| 0000150120 | 4E8D | 16F2 | 8D51 | 208E | 16FF | 1E51 | 7868 | 6808 |
| 0000150140 | 0211 | 36FF | 081E | 36FF | 081C | 36FF | 0822 | 36FF |
| 0000150160 | 0820 | 8F9A | 00C5 | 8300 | 28C4 | 868B | FF26 | A5E9 |
| 0000150200 | E900 | 0006 | 468B | E9F0 | 009C | 7E83 | 00F0 | 0375 |
| 0000150220 | 0CE9 | C400 | 065E | C02B | 8926 | 0247 | 8926 | 8E07 |
| 0000150240 | 7006 | 263A | 3E83 | C071 | 7500 | E903 | 000A | BE83 |
| 0000150260 | FF24 | 74FE | E903 | 000F | 068E | 3A72 | 8326 | 8A3E |
| 0000150300 | 00C0 | 0375 | 59E9 | 8B00 | F046 | 8689 | FF26 | B6FF |
| 0000150320 | FF2A | B6FF | FF28 | 868D | FF26 | 5016 | B6FF | FF38 |
| 0000150340 | 76FF | FFF8 | F676 | 8E8D | FF2C | 5116 | 4E8D | 16F2 |
| 0000150360 | 8D51 | 208E | 16FF | 1E51 | 7868 | 6808 | 0215 | 36FF |
| 0000150400 | 081E | 36FF | 081C | 36FF | 0822 | 36FF | 0820 | DA9A |
| 0000150420 | 00C0 | 8300 | 28C4 | 868B | FF26 | 09E9 | E900 | 0006 |
| 0000150440 | 468B | E9F0 | 0000 | 5E1F | 835F | 02ED | E58B | 5D1F |
| 0000150460 | CA4D | 0012 | 581E | 4590 | 8B55 | 1EEC | D88E | EC81 |
| 0000150500 | 0206 | 5657 | B81E | BD9F | D88E | 46C7 | 83F6 | 8C08 |
| 0000150520 | F85E | 46C7 | 01E6 | 2B01 | 89C0 | 0486 | 89FF | 0286 |
| 0000150540 | 8EFF | 7006 | 263A | 3E83 | C6AA | 7500 | E903 | 001E |
| 0000150560 | 36FF | 0822 | 36FF | 0820 | 868D | FEFA | 5016 | D99A |
| 0000150600 | 00BD | 8300 | 08C4 | 003D | 7400 | E903 | 000F | 068E |
| 0000150620 | 3A72 | 8326 | C33E | 00C6 | 0375 | 3DE9 | 1E00 | 8A68 |
| 0000150640 | 8D08 | 2686 | 16FF | 8D50 | FA86 | 16FE | 8D50 | F246 |
| 0000150660 | 5016 | 4168 | 1E02 | 9468 | FF08 | 1E36 | FF08 | 1C36 |
| 0000150700 | FF08 | 2236 | FF08 | 2036 | 9A08 | BE24 | 0000 | C483 |
| 0000150720 | 891E | F246 | 5689 | E9F4 | 0008 | C02B | 4689 | 89F4 |
| 0000150740 | F246 | 46C7 | 00F0 | C400 | 065E | C02B | 8926 | 0247 |
| 0000150760 | 8926 | C607 | 0686 | 00FF | 468B | 0B0E | 0C46 | 0374 |
| 0000151000 | 17E9 | 8D00 | 0686 | 16FF | FF50 | 1476 | 76FF | 9A12 |
| 0000151020 | 423D | C059 | C483 | 8908 | F046 | 7E83 | 00F0 | 0375 |
| 0000151040 | 86E9 | 8E00 | 7006 | 263A | 3E83 | C752 | 7500 | E903 |

THU MAR 14 17:31:54 19,i DB_PI.DLL PAGE 58, LINE 3364

| | | | | | | | | |
|---|---|---|---|---|---|---|---|---|
| 0000151060 | 000A | BE83 | FEFE | 74FE | E903 | 000F | 068E | 3A72 |
| 0000151100 | 8326 | 6B3E | 00C7 | 0375 | 58E9 | 8B00 | F046 | 8689 |
| 0000151120 | FF00 | B6FF | FF04 | B6FF | FF02 | 868D | FF00 | 5016 |
| 0000151140 | 76FF | FFE6 | F876 | 76FF | 8DF6 | 268E | 16FF | 8D51 |
| 0000151160 | F24E | 5116 | 8E8D | FEFA | 5116 | 681E | 0894 | 5468 |
| 0000151200 | FF02 | 1E36 | FF08 | 1C36 | FF08 | 2236 | FF08 | 2036 |
| 0000151220 | 9A08 | C7BA | 0000 | C483 | 8B28 | 0086 | E9FF | 03D6 |
| 0000151240 | 06E9 | 8B00 | F046 | CDE9 | 8D03 | FA46 | 5016 | 76FF |
| 0000151260 | FF0A | 1876 | 76FF | 9A16 | CF64 | BFA8 | C483 | 890A |
| 0000151300 | F046 | 7E83 | 00F0 | 0375 | 86E9 | 8E00 | 7006 | 263A |
| 0000151320 | 3E83 | C809 | 7500 | E903 | 000A | BE83 | FEFE | 74FE |
| 0000151340 | E903 | 000F | 068E | 3A72 | 8326 | 223E | 00C8 | 0375 |
| 0000151360 | 58E9 | 8B00 | F046 | 8689 | FF00 | B6FF | FF04 | B6FF |
| 0000151400 | FF02 | 868D | FF00 | 5016 | 76FF | FFE6 | F876 | 76FF |
| 0000151420 | 8DF6 | 268E | 16FF | 8D51 | F24E | 5116 | 8E8D | FEFA |
| 0000151440 | 5116 | 681E | 0894 | 5868 | FF02 | 1E36 | FF08 | 1C36 |
| 0000151460 | FF08 | 2236 | FF08 | 2036 | 9A08 | C871 | 0000 | C483 |
| 0000151500 | 8B28 | 0086 | E9FF | 032E | 06E9 | 8B00 | F046 | 25E9 |
| 0000151520 | 8D03 | 3286 | 16FF | 6A50 | FF00 | 0E76 | 76FF | FF0C |
| 0000151540 | 1076 | 868D | FF06 | 5016 | 76FF | FFFC | FA76 | 669A |
| 0000151560 | 6601 | 83C4 | 14C4 | 4689 | 83F0 | F07E | 7500 | E903 |
| 0000151600 | 0086 | 068E | 3A70 | 8326 | B53E | 00C8 | 0375 | 0AE9 |
| 0000151620 | 8300 | FEBE | FEFE | 0374 | DFE9 | 8E00 | 7206 | 263A |
| 0000151640 | 3E83 | C8CE | 7500 | E903 | 0058 | 468B | 89F0 | 0086 |
| 0000151660 | FFFF | 04B6 | FFFF | 02B6 | 8DFF | 0086 | 16FF | FF50 |
| 0000151700 | E676 | 76FF | FFF8 | F676 | 8E8D | FF26 | 5116 | 4E8D |
| 0000151720 | 16F2 | 8D51 | FA8E | 16FE | 1E51 | 9468 | 6808 | 025E |
| 0000151740 | 36FF | 081E | 36FF | 081C | 36FF | 0822 | 36FF | 0820 |
| 0000151760 | 1D9A | 00C9 | 8300 | 28C4 | 868B | FF00 | 77E9 | E902 |
| 0000152000 | 0006 | 468B | E9F0 | 026E | 76FF | FF18 | 1676 | 76FF |
| 0000152020 | FF98 | A076 | 76FF | FF9E | 0876 | 76FF | 9A06 | ADAC |
| 0000152040 | 9131 | 4689 | 83F0 | F07E | 7500 | E903 | 0086 | 068E |
| 0000152060 | 3A70 | 8326 | 8A3E | 00C4 | 0375 | 0AE9 | 8300 | FEBE |
| 0000152100 | FEFE | 0374 | 0FE9 | 8E00 | 7206 | 263A | 3E83 | C4A3 |
| 0000152120 | 7500 | E903 | 0058 | 468B | 89F0 | 0086 | FFFF | 04B6 |
| 0000152140 | FFFF | 02B6 | 8DFF | 0086 | 16FF | FF50 | E676 | 76FF |
| 0000152160 | FFF8 | F676 | 8E8D | FF26 | 5116 | 4E8D | 16F2 | 8D51 |
| 0000152200 | FA8E | 16FE | 1E51 | 9468 | 6808 | 0267 | 36FF | 081E |
| 0000152220 | 36FF | 081C | 36FF | 0822 | 36FF | 0820 | F39A | 00C4 |
| 0000152240 | 8300 | 28C4 | 868B | FF00 | CBE9 | E901 | 0006 | 468B |
| 0000152260 | E9F0 | 01C2 | BE80 | FF56 | 7500 | E903 | 00D7 | A68A |
| 0000152300 | FF7A | C02A | 4603 | 8BFA | FC56 | 862D | 5274 | 8D50 |
| 0000152320 | FA86 | 16FD | 9A50 | 2750 | C96A | C483 | 1E08 | 9168 |
| 0000152340 | 8D08 | FA86 | 16FD | 9A50 | 270A | C103 | C483 | 8D08 |
| 0000152360 | 5686 | 16FF | 8D50 | FA86 | 16FD | 9A50 | 270A | C958 |
| 0000152400 | C483 | C408 | 065E | FF26 | 0277 | FF26 | 8D37 | FA86 |
| 0000152420 | 16FD | 9A50 | 1A2F | C7F1 | C483 | 8908 | F046 | 7E83 |
| 0000152440 | 00F0 | 0374 | 6BE9 | C400 | 065E | C426 | 261F | 478B |
| 0000152460 | 2668 | 578B | 896A | E846 | 5689 | C4EA | 065E | C426 |
| 0000152500 | 261F | 478B | 2670 | 578B | 8972 | EC46 | 5689 | 68EE |
| 0000152520 | 00B4 | 868D | FF32 | 5016 | 5EC4 | 2606 | 77FF | 2602 |
| 0000152540 | 37FF | 309A | 7E3E | 83C9 | 0AC4 | 468B | 8BE8 | EA56 |
| 0000152560 | 5EC4 | 2606 | 1FC4 | 8926 | 6847 | 8926 | 6A57 | 468B |
| 0000152600 | 8BEC | EE56 | 5EC4 | 2606 | 1FC4 | 8926 | 7047 | 8926 |
| 0000152620 | 7257 | 31E9 | C400 | 065E | FF26 | 0277 | FF26 | 8B37 |
| 0000152640 | 9E46 | 4603 | 5098 | 76FF | FF0E | 0C76 | 76FF | 8D10 |
| 0000152660 | 0686 | 16FF | FF50 | FC76 | 76FF | 9AFA | 0166 | C996 |
| 0000152700 | C483 | 8914 | F046 | 7E83 | 00F0 | 0375 | 21E9 | FF00 |
| 0000152720 | 1876 | 76FF | C416 | 065E | FF26 | 0277 | FF26 | 9A37 |

THU MAR 14 17:31:54 1991 DB_PI.DLL PAGE 59, LINE 3423

| | | | | | | | | |
|---|---|---|---|---|---|---|---|---|
| 0000152740 | BB24 | C8A0 | 5EC4 | 2B06 | 26C0 | 4789 | 2602 | 0789 |
| 0000152760 | 068E | 3A70 | 8326 | E83E | 00C5 | 0375 | 0AE9 | 8300 |
| 0000153000 | FEBE | FEFE | 0374 | 0FE9 | 8E00 | 7206 | 263A | 3E83 |
| 0000153020 | C615 | 7500 | E903 | 0058 | 468B | 89F0 | 0086 | FFFF |
| 0000153040 | 04B6 | FFFF | 02B6 | 8DFF | 0086 | 16FF | FF50 | E676 |
| 0000153060 | 76FF | FFF8 | F676 | 8E8D | FF26 | 5116 | 4E8D | 16F2 |
| 0000153100 | 8D51 | FA8E | 16FE | 1E51 | 9468 | 6808 | 0291 | 36FF |
| 0000153120 | 081E | 36FF | 081C | 36FF | 0822 | 36FF | 0820 | 129A |
| 0000153140 | 00C7 | 8300 | 28C4 | 868B | FF00 | 09E9 | E900 | 0006 |
| 0000153160 | 468B | E9F0 | 0000 | 5E1F | 835F | 02ED | E58B | 5D1F |
| 0000153200 | CA4D | 0014 | 531E | 4590 | 8B55 | 1EEC | D88E | EC81 |
| 0000153220 | 0030 | 5657 | B81E | C5C6 | D88E | 46C7 | A2F6 | 8C08 |
| 0000153240 | F85E | 46C7 | 01EA | 2B01 | 89C0 | DC46 | 4689 | 8EDA |
| 0000153260 | 7006 | 263A | 3E83 | CBBF | 7500 | E903 | 001D | 36FF |
| 0000153300 | 0822 | 36FF | 0820 | 468D | 16D2 | 9A50 | C5FF | 0000 |
| 0000153320 | C483 | 3D08 | 0000 | 0374 | 0FE9 | 8E00 | 7206 | 263A |
| 0000153340 | 3E83 | CBD7 | 7500 | E903 | 003B | 681E | 08A9 | 468D |
| 0000153360 | 16DE | 8D50 | D246 | 5016 | 468D | 16F2 | 6850 | 02C5 |
| 0000153400 | 681E | 08B0 | 36FF | 081E | 36FF | 081C | 36FF | 0822 |
| 0000153420 | 36FF | 0820 | 4A9A | 00C6 | 8300 | 1EC4 | 4689 | 89F2 |
| 0000153440 | F456 | 08E9 | 2B00 | 89C0 | F446 | 4689 | 8BF2 | 0E46 |
| 0000153460 | 460B | 740C | E903 | 007D | 068E | 3A70 | 8326 | 6C3E |
| 0000153500 | 00CC | 0375 | 09E9 | 8300 | D67E | 74FE | E903 | 00UF |
| 0000153520 | 068E | 3A72 | 8326 | 843E | 00CC | 0375 | 50E9 | C700 |
| 0000153540 | D846 | 0017 | 76FF | FFDC | DA76 | 468D | 16D8 | FF50 |
| 0000153560 | EA76 | 76FF | FFF8 | F676 | 4E8D | 16DE | 8D51 | F24E |
| 0000153600 | 5116 | 4E8D | 16D2 | 1E51 | B068 | 6808 | 02CD | 36FF |
| 0000153620 | 081E | 36FF | 081C | 36FF | 0822 | 36FF | 0820 | CC9A |
| 0000153640 | 00CC | 8300 | 28C4 | 468B | E9D8 | 03EB | 06E9 | B800 |
| 0000153660 | 0017 | E2E9 | C403 | 0C5E | 8326 | 487F | 7D78 | E903 |
| 0000153700 | 0015 | 5EC4 | 260C | 7F83 | 7B48 | 037C | 08E9 | C700 |
| 0000153720 | D046 | 0001 | 05E9 | C700 | D046 | 0000 | 7E83 | 00D0 |
| 0000153740 | 0374 | 7DE9 | 8E00 | 7006 | 263A | 3E83 | CD13 | 7500 |
| 0000153760 | E903 | 0009 | 7E83 | FED6 | 0374 | 0FE9 | 8E00 | 7206 |
| 0000154000 | 263A | 3E83 | CD2B | 7500 | E903 | 0050 | 46C7 | ADD8 |
| 0000154020 | FF01 | DC76 | 76FF | 8DDA | D846 | 5016 | 76FF | FFEA |
| 0000154040 | F876 | 76FF | 8DF6 | DE4E | 5116 | 4E8D | 16F2 | 8D51 |
| 0000154060 | D24E | 5116 | 681E | 08B0 | CF68 | FF02 | 1E36 | FF08 |
| 0000154100 | 1C36 | FF08 | 2236 | FF08 | 2036 | 9A08 | CD74 | 0000 |
| 0000154120 | C483 | 8B28 | D846 | 3EE9 | E903 | 0006 | ADB8 | E901 |
| 0000154140 | 0335 | 468B | 8B0C | 0E56 | 0405 | 5200 | 8B50 | 0C46 |
| 0000154160 | 568B | 050E | 0004 | 5052 | 3D9A | 9242 | 83C6 | 08C4 |
| 0000154200 | 4689 | 83F0 | F07E | 7500 | E903 | 007E | 068E | 3A70 |
| 0000154220 | 8326 | BB3E | 00CD | 0375 | 09E9 | 8300 | D67E | 74FE |
| 0000154240 | E903 | 000F | 068E | 3A72 | 8326 | D33E | 00CD | 0375 |
| 0000154260 | 51E9 | 8B00 | F046 | 4689 | FFD8 | DC76 | 76FF | 8DDA |
| 0000154300 | D846 | 5016 | 76FF | FFEA | F876 | 76FF | 8DF6 | DE4E |
| 0000154320 | 5116 | 4E8D | 16F2 | 8D51 | D24E | 5116 | 681E | 08B0 |
| 0000154340 | D268 | FF02 | 1E36 | FF08 | 1C36 | FF08 | 2236 | FF08 |
| 0000154360 | 2036 | 9A08 | CE1C | 0000 | C483 | 8B28 | D846 | 96E9 |
| 0000154400 | E902 | 0006 | 468B | E9F0 | 028D | 7E83 | 010A | 0374 |
| 0000154420 | 5AE9 | 8D01 | FA46 | 5016 | 026A | 76FF | FF12 | 1076 |
| 0000154440 | 649A | 3ACF | 83C7 | 0AC4 | 4689 | 83F0 | F07E | 7500 |
| 0000154460 | E903 | 007E | 068E | 3A70 | 8326 | 733E | 00CE | 0375 |
| 0000154500 | 09E9 | 8300 | D67E | 74FE | E903 | 000F | 068E | 3A72 |
| 0000154520 | 8326 | 8B3E | 00CE | 0375 | 51E9 | 8B00 | F046 | 4689 |
| 0000154540 | FFD8 | DC76 | 76FF | 8DDA | D846 | 5016 | 76FF | FFEA |
| 0000154560 | F876 | 76FF | 8DF6 | DE4E | 5116 | 4E8D | 16F2 | 8D51 |
| 0000154600 | D24E | 5116 | 681E | 08B0 | D768 | FF02 | 1E36 | FF08 |

THU MAR 14 17:31:54 1991 DB_PI.DLL PAGE 60, LINE 3482

| | | | | | | | | |
|---|---|---|---|---|---|---|---|---|
| 0000154620 | 1C36 | FF08 | 2236 | FF08 | 2036 | 9A08 | CADF | 0000 |
| 0000154640 | C483 | 8B28 | D846 | EEE9 | E901 | 0006 | 468B | E9F0 |
| 0000154660 | 01E5 | 468D | 16EC | FF50 | 0E76 | 76FF | 6A0C | FF01 |
| 0000154700 | 0676 | 76FF | 6A08 | 8B01 | 0C46 | 568B | 050E | 0024 |
| 0000154720 | 5052 | 76FF | FFFC | FA76 | 209A | 3E11 | 83CA | 18C4 |
| 0000154740 | 4689 | 83F0 | F07E | 7500 | E903 | 007E | 068E | 3A70 |
| 0000154760 | 8326 | 773E | 00CA | 0375 | 09E9 | 8300 | D67E | 74FE |
| 0000155000 | E903 | 000F | 068E | 3A72 | 8326 | 903E | 00CA | 0375 |
| 0000155020 | 51E9 | 8B00 | F046 | 4689 | FFD8 | DC76 | 76FF | 8DDA |
| 0000155040 | D846 | 5016 | 76FF | FFEA | F876 | 76FF | 8DF6 | DE4E |
| 0000155060 | 5116 | 4E8D | 16F2 | 8D51 | D24E | 5116 | 681E | 08B0 |
| 0000155100 | DD68 | FF02 | 1E36 | FF08 | 1C36 | FF08 | 2236 | FF08 |
| 0000155120 | 2036 | 9A08 | CF76 | 0000 | C483 | 8B28 | D846 | 36E9 |
| 0000155140 | E901 | 0006 | 468B | E9F0 | 012D | ADE9 | 8D00 | FA46 |
| 0000155160 | 5016 | 006A | 76FF | FF12 | 1076 | 649A | A3CF | 83CD |
| 0000155200 | 0AC4 | 4689 | 83F0 | F07E | 7500 | E903 | 007E | 068E |
| 0000155220 | 3A70 | 8326 | A13E | 00CF | 0375 | 09E9 | 8300 | D67E |
| 0000155240 | 74FE | E903 | 000F | 068E | 3A72 | 8326 | B93E | 00CF |
| 0000155260 | 0375 | 51E9 | 8B00 | F046 | 4689 | FFD8 | DC76 | 76FF |
| 0000155300 | 8DDA | D846 | 5016 | 76FF | FFEA | F876 | 76FF | 8DF6 |
| 0000155320 | DE4E | 5116 | 4E8D | 16F2 | 8D51 | D24E | 5116 | 681E |
| 0000155340 | 08B0 | E268 | FF02 | 1E36 | FF08 | 1C36 | FF08 | 2236 |
| 0000155360 | FF08 | 2036 | 9A08 | D001 | 0000 | C483 | 8B28 | D846 |
| 0000155400 | 94E9 | E900 | 0006 | 468B | E9F0 | 008B | 76FF | FF0E |
| 0000155420 | 0C76 | 629A | 5B17 | 83CE | 04C4 | 068E | 3A70 | 8326 |
| 0000155440 | 363E | 00CB | 0375 | 09E9 | 8300 | D67E | 74FE | E903 |
| 0000155460 | 000F | 068E | 3A72 | 8326 | 623E | 00CB | 0375 | 50E9 |
| 0000155500 | C700 | D846 | 0000 | 76FF | FFDC | DA76 | 468D | 16D8 |
| 0000155520 | FF50 | EA76 | 76FF | FFF8 | F676 | 4E8D | 16DE | 8D51 |
| 0000155540 | F24E | 5116 | 4E8D | 16D2 | 1E51 | B068 | 6808 | 02E8 |
| 0000155560 | 36FF | 081E | 36FF | 081C | 36FF | 0822 | 36FF | 0820 |
| 0000155600 | 1F9A | 00CC | 8300 | 28C4 | 468B | E9D8 | 0009 | 06E9 |
| 0000155620 | B800 | 0000 | 00E9 | 1F00 | 5F5E | ED83 | 8B02 | 1FE5 |
| 0000155640 | 4D5D | 0ECA | 1E00 | 9058 | 5545 | EC8B | 8E1E | 81D8 |
| 0000155660 | FEEC | 5700 | 1E56 | 16B8 | 8ECB | C7D8 | F646 | 08BF |
| 0000155700 | 5E8C | C7F8 | EE46 | 0101 | C02B | 8689 | FF0C | 8689 |
| 0000155720 | FF0A | 068E | 3A70 | 8326 | 003E | 00D1 | 0375 | 1EE9 |
| 0000155740 | FF00 | 2236 | FF08 | 2036 | 8D08 | 0286 | 16FF | 9A50 |
| 0000155760 | CB4C | 0000 | C483 | 3D08 | 0000 | 0374 | 0FE9 | 8E00 |
| 0000156000 | 7206 | 263A | 3E83 | D119 | 7500 | E903 | 003D | 681E |
| 0000156020 | 08C6 | 868D | FF2E | 5016 | 868D | FF02 | 5016 | 468D |
| 0000156040 | 16F2 | 6850 | 030E | 681E | 08CE | 36FF | 081E | 36FF |
| 0000156060 | 081C | 36FF | 0822 | 36FF | 0820 | 959A | 00CB | 8300 |
| 0000156100 | 1EC4 | 4689 | 89F2 | F456 | 08E9 | 2B00 | 89C0 | F446 |
| 0000156120 | 4689 | C7F2 | F046 | 0000 | 468D | 16FA | 6A50 | FF02 |
| 0000156140 | 1276 | 76FF | 9A10 | CF64 | CEFD | C483 | 890A | F046 |
| 0000156160 | 7E83 | 00F0 | 0375 | 86E9 | 8E00 | 7006 | 263A | 3E83 |
| 0000156200 | D1B6 | 7500 | E903 | 000A | BE83 | FF06 | 74FE | E903 |
| 0000156220 | 000F | 068E | 3A72 | 8326 | CF3E | 00D1 | 0375 | 58E9 |
| 0000156240 | 8B00 | F046 | 8689 | FF08 | B6FF | FF0C | B6FF | FF0A |
| 0000156260 | 868D | FF08 | 5016 | 76FF | FFEE | F876 | 76FF | 8DF6 |
| 0000156300 | 2E8E | 16FF | 8D51 | F24E | 5116 | 8E8D | FF02 | 5116 |
| 0000156320 | 681E | 08CE | 1768 | FF03 | 1E36 | FF08 | 1C36 | FF08 |
| 0000156340 | 2236 | FF08 | 2036 | 9A08 | D21E | 0000 | C483 | 8B28 |
| 0000156360 | 0886 | E9FF | 021E | 06E9 | 8B00 | F046 | 15E9 | C602 |
| 0000156400 | 0E86 | 00FF | 468B | 0B08 | 0646 | 0374 | 17E9 | 8D00 |
| 0000156420 | 0E86 | 16FF | FF50 | 0E76 | 76FF | 9A0C | 423D | CCFB |
| 0000156440 | C483 | 8908 | F046 | 7E83 | 00F0 | 0375 | 86E9 | 8E00 |
| 0000156460 | 7006 | 263A | 3E83 | D26D | 7500 | E903 | 000A | BE83 |

THU MAR 14 17:31:54 1991 DB_PI.DLL PAGE 61, LINE 3541

| | | | | | | | | |
|---|---|---|---|---|---|---|---|---|
| 0000156500 | FF06 | 74FE | E903 | 000F | 068E | 3A72 | 8326 | 863E |
| 0000156520 | 00D2 | 0375 | 58E9 | 8B00 | F046 | 8689 | FF08 | B6FF |
| 0000156540 | FF0C | B6FF | FF0A | 868D | FF08 | 5016 | 76FF | FFEE |
| 0000156560 | F876 | 76FF | 8DF6 | 2E8E | 16FF | 8D51 | F24E | 5116 |
| 0000156600 | 8E8D | FF02 | 5116 | 681E | 08CE | 1F6B | FF03 | 1E36 |
| 0000156620 | FF08 | 1C36 | FF08 | 2236 | FF08 | 2036 | 9A08 | D2D5 |
| 0000156640 | 0000 | C483 | 8B28 | 0886 | E9FF | 0168 | 06E9 | 8B00 |
| 0000156660 | F046 | 5FE9 | 8D01 | 3A86 | 16FF | 6A50 | FF00 | 0876 |
| 0000156700 | 76FF | FF06 | 0A76 | 868D | FF0E | 5016 | 76FF | FFFC |
| 0000156720 | FA76 | 669A | 2301 | 83D3 | 14C4 | 4689 | 83F0 | F07E |
| 0000156740 | 7500 | E903 | 0086 | 068E | 3A70 | 8326 | F33E | 00D2 |
| 0000156760 | 0375 | 0AE9 | 8300 | 06BE | FEFF | 0374 | 0FE9 | 8E00 |
| 0000157000 | 7206 | 263A | 3E83 | D30C | 7500 | E903 | 0058 | 468B |
| 0000157020 | 89F0 | 0886 | FFFF | 0CB6 | FFFF | 0AB6 | 8DFF | 0886 |
| 0000157040 | 16FF | FF50 | EE76 | 76FF | FFF8 | F676 | 8E8D | FF2E |
| 0000157060 | 5116 | 4E8D | 16F2 | 8D51 | 028E | 16FF | 1E51 | CE68 |
| 0000157100 | 6808 | 0325 | 36FF | 081E | 36FF | 081C | 36FF | 0822 |
| 0000157120 | 36FF | 0820 | 6C9A | 00D3 | 8300 | 28C4 | 868B | FF08 |
| 0000157140 | B1E9 | E900 | 0006 | 468B | E9F0 | 00A8 | 068E | 3A70 |
| 0000157160 | 8326 | 153E | 00CF | 0375 | 0AE9 | 8300 | 06BE | FEFF |
| 0000157200 | 0374 | 0FE9 | 8E00 | 7206 | 263A | 3E83 | CF2D | 7500 |
| 0000157220 | E903 | 0069 | 868D | FF3A | 5016 | 76FF | FFFC | FA76 |
| 0000157240 | 7C9A | 8C0D | 83D3 | 08C4 | 8689 | FF08 | B6FF | FF0C |
| 0000157260 | B6FF | FF0A | 868D | FF08 | 5016 | 76FF | FFEE | F876 |
| 0000157300 | 76FF | 8DF6 | 2E8E | 16FF | 8D51 | F24E | 5116 | 8E8D |
| 0000157320 | FF02 | 5116 | 681E | 08CE | 2868 | FF03 | 1E36 | FF08 |
| 0000157340 | 1C36 | FF08 | 2236 | FF08 | 2036 | 9A08 | CED4 | 0000 |
| 0000157360 | C483 | 8B28 | 0886 | E9FF | 001A | 17E9 | 8D00 | 3A86 |
| 0000157400 | 16FF | FF50 | FC76 | 76FF | 9AFA | 0D7C | CF95 | C483 |
| 0000157420 | E908 | 0000 | 5E1F | 835F | 02ED | E58B | 5D1F | CA4D |
| 0000157440 | 000E | 581E | 4590 | 8B55 | 1EEC | D88E | EC81 | 002C |
| 0000157460 | 5657 | B81E | D037 | D88E | 46C7 | DCF6 | 8C08 | F85E |
| 0000157500 | 46C7 | 01EE | 2B01 | 89C0 | E046 | 4689 | 8EDE | 7006 |
| 0000157520 | 263A | 3E83 | D48E | 7500 | E903 | 001D | 36FF | 0822 |
| 0000157540 | 36FF | 0820 | 468D | 16D6 | 9A50 | D070 | 0000 | C483 |
| 0000157560 | 3D08 | 0000 | 0374 | 0FE9 | 8E00 | 7206 | 263A | 3E83 |
| 0000157600 | D4A6 | 7500 | E903 | 003B | 681E | 08E3 | 468D | 16E2 |
| 0000157620 | 8D50 | D64E | 0016 | 468D | 16F2 | 6850 | 0354 | 681E |
| 0000157640 | 08EA | 36FF | 081E | 36FF | 081C | 36FF | 0822 | 36FF |
| 0000157660 | 0820 | BB9A | 00D0 | 8300 | 1EC4 | 4689 | 89F2 | F456 |
| 0000157700 | 08E9 | 2B00 | 89C0 | F446 | 4689 | C4F2 | 0A5E | C726 |
| 0000157720 | 0007 | C400 | 065E | C02B | 8926 | 0247 | 8926 | 8307 |
| 0000157740 | 107E | 7D78 | E903 | 0011 | 7E83 | 7B10 | 037C | 08E9 |
| 0000157760 | C700 | D446 | 0001 | 05E9 | C700 | D446 | 0000 | 7E83 |
| 0000160000 | 00D4 | 0374 | 7DE9 | 8E00 | 7006 | 263A | 3E83 | D52C |
| 0000160020 | 7500 | E903 | 0009 | 7E83 | FEDA | 0374 | 0FE9 | 8E00 |
| 0000160040 | 7206 | 263A | 3E83 | D544 | 7500 | E903 | 0050 | 46C7 |
| 0000160060 | ADDC | FF01 | E076 | 76FF | 8DDE | DC46 | 5016 | 76FF |
| 0000160100 | FFEE | F876 | 76FF | 8DF6 | E24E | 5116 | 4E8D | 16F2 |
| 0000160120 | 8D51 | D64E | 5116 | 681E | 08EA | 5F68 | FF03 | 1E36 |
| 0000160140 | FF08 | 1C36 | FF08 | 2236 | FF08 | 2036 | 9A08 | D58D |
| 0000160160 | 0000 | C483 | 8B28 | DC46 | 49E9 | E901 | 0006 | ADB8 |
| 0000160200 | E901 | 0140 | 468D | 16FA | 6A50 | FF00 | 1476 | 76FF |
| 0000160220 | 9A12 | CF64 | D0E8 | C483 | 890A | F046 | 7E83 | 00F0 |
| 0000160240 | 0375 | 7EE9 | 8E00 | 7006 | 263A | 3E83 | D059 | 7500 |
| 0000160260 | E903 | 0009 | 7E83 | FEDA | 0374 | 0FE9 | 8E00 | 7206 |
| 0000160300 | 263A | 3E83 | D086 | 7500 | E903 | 0051 | 468B | 89F0 |
| 0000160320 | DC46 | 76FF | FFE0 | DE76 | 468D | 16DC | FF50 | EE76 |
| 0000160340 | 76FF | FFF8 | F676 | 4E8D | 16E2 | 8D51 | F24E | 5116 |

THU MAR 14 17:31:54 1991 DB_PI.DLL PAGE 62, LINE 3600

| | | | | | | | | |
|---|---|---|---|---|---|---|---|---|
| 0000160360 | 4E8D | 16D6 | 1E51 | EA68 | 6808 | 0363 | 36FF | 081E |
| 0000160400 | 36FF | 081C | 36FF | 0822 | 36FF | 0820 | 689A | 00D1 |
| 0000160420 | 8300 | 28C4 | 468B | E9DC | 00AA | 06E9 | 8B00 | F046 |
| 0000160440 | A1E9 | FF00 | 0876 | 7[illegible]F | FF06 | 0C76 | 76FF | FF0A |
| 0000160460 | 0E76 | 76FF | FF10 | FC76 | 76FF | 9AFA | 06E2 | D255 |
| 0000160500 | C483 | 8910 | F046 | 068E | 3A70 | 8326 | D43E | 00D3 |
| 0000160520 | 0375 | 09E9 | 8300 | DA7E | 74FE | E903 | 000F | 068E |
| 0000160540 | 3A72 | 8326 | 003E | 00D4 | 0375 | 51E9 | 8B00 | F046 |
| 0000160560 | 4689 | FFDC | E076 | 76FF | 8DDE | DC46 | 5016 | 76FF |
| 0000160600 | FFEE | F876 | 76FF | 8DF6 | E24E | 5116 | 4E8D | 16F2 |
| 0000160620 | 8D51 | D64E | 5116 | 681E | 08EA | 6868 | FF03 | 1E36 |
| 0000160640 | FF08 | 1C36 | FF08 | 2236 | FF08 | 2036 | 9A08 | D4EE |
| 0000160660 | 0000 | C483 | 8B28 | DC46 | 09E9 | E900 | 0006 | 468B |
| 0000160700 | E9F0 | 0000 | 5E1F | 835F | 02ED | E58B | 5D1F | CA4D |
| 0000160720 | 0010 | 581E | 4590 | 8B55 | 1EEC | D88E | EC81 | 012A |
| 0000160740 | 5657 | B81E | D3B4 | D88E | 46C7 | F7F6 | 8C08 | F85E |
| 0000160760 | 86C7 | FEF4 | 0101 | C02B | 8689 | FEE4 | 8689 | FEE2 |
| 0000161000 | 068E | 3A70 | 8326 | 383E | 00D7 | 0375 | 1EE9 | FF00 |
| 0000161020 | 2236 | FF08 | 2036 | 8D08 | D886 | 16FE | 9A50 | D3EA |
| 0000161040 | 0000 | C483 | 3D08 | 0000 | 0374 | 0FE9 | 8E00 | 7206 |
| 0000161060 | 263A | 3E83 | D751 | 7500 | E903 | 0040 | 681E | 08FE |
| 0000161100 | 868D | FEE6 | 5016 | 868D | FED8 | 5016 | 868D | FF1E |
| 0000161120 | 5016 | 9968 | 1E03 | 2468 | FF09 | 1E36 | FF08 | 1C36 |
| 0000161140 | FF08 | 2236 | FF08 | 2036 | 9A08 | D433 | 0000 | C483 |
| 0000161160 | 891E | 1E86 | 89FF | 2096 | E9FF | 000A | C02B | 8689 |
| 0000161200 | FF20 | 8689 | FF1E | 7E83 | 780E | 037D | 12E9 | 8300 |
| 0000161220 | 0E7E | 7C7B | E903 | 0009 | 86C7 | FED6 | 0001 | 06E9 |
| 0000161240 | C700 | D686 | 00FE | 8300 | D6BE | 00FE | 0374 | 87E9 |
| 0000161260 | 8E00 | 7006 | 263A | 3E83 | D7E2 | 7500 | E903 | 000A |
| 0000161300 | BE83 | FEDC | 74FE | E903 | 000F | 068E | 3A72 | 8326 |
| 0000161320 | FB3E | 00D7 | 0375 | 59E9 | C700 | DE86 | ADFE | FF01 |
| 0000161340 | E4B6 | FFFE | E2B6 | 8DFE | DE86 | 16FE | FF50 | F4B6 |
| 0000161360 | FFFE | F876 | 76FF | 8DF6 | E68E | 16FE | 8D51 | 1E8E |
| 0000161400 | 16FF | 8D51 | D88E | 16FE | 1E51 | 2468 | 6809 | 03A8 |
| 0000161420 | 36FF | 081E | 36FF | 081C | 36FF | 0822 | 36FF | 0820 |
| 0000161440 | 4D9A | 00D8 | 8300 | 28C4 | 868B | FEDE | 40E9 | E904 |
| 0000161460 | 0006 | ADB8 | E901 | 0437 | 468D | 16FA | 6A50 | FF00 |
| 0000161500 | 1276 | 76FF | 9A10 | CF64 | D514 | C483 | 890A | 1A86 |
| 0000161520 | 83FF | 1ABE | 00FF | 0375 | 8AE9 | 8E00 | 7006 | 263A |
| 0000161540 | 3E83 | D95F | 7500 | E903 | 000A | BE83 | FEDC | 74FE |
| 0000161560 | E903 | 000F | 068E | 3A72 | 8326 | 783E | 00D9 | 0375 |
| 0000161600 | 5BE9 | 8B00 | 1A86 | 89FF | DE86 | FFFE | E4B6 | FFFE |
| 0000161620 | E2B6 | 8DFE | DE86 | 16FE | FF50 | F4B6 | FFFE | F876 |
| 0000161640 | 76FF | 8DF6 | E68E | 16FE | 8D51 | 1E8E | 16FF | 8D51 |
| 0000161660 | D88E | 16FE | 1E51 | 2468 | 6809 | 03AC | 36FF | 081E |
| 0000161700 | 36FF | 081C | 36FF | 0822 | 36FF | 0820 | CA9A | 00D9 |
| 0000161720 | 8300 | 28C4 | 868B | FEDE | 94E9 | E903 | 0007 | 868B |
| 0000161740 | FF1A | 8AE9 | 8B03 | 0C46 | 460B | 740A | E903 | 0068 |
| 0000161760 | 468B | E90E | 0042 | 681E | 0905 | 868D | FEFA | 5016 |
| 0000162000 | 509A | 9827 | 83D8 | 08C4 | 44E9 | 1EC0 | 0B68 | 8D09 |
| 0000162020 | FA86 | 16FE | 9450 | 2750 | D8AD | C483 | E908 | 002F |
| 0000162040 | 681E | 0911 | 868D | FEFA | 5016 | 509A | E127 | 83D8 |
| 0000162060 | 08C4 | 1AE9 | E900 | 0017 | 782D | 7500 | E903 | FFB6 |
| 0000162100 | 7548 | E903 | FFC5 | 7548 | E903 | FFD4 | 00E9 | C700 |
| 0000162120 | E086 | 05FE | E900 | 002D | 76FF | FF0C | 0A76 | B09A |
| 0000162140 | FB27 | 83D8 | 04C4 | 8689 | FEE0 | 056A | 76FF | FF0C |
| 0000162160 | 0A76 | 868D | FEFA | 5016 | 049A | 1A28 | 83D9 | 0AC4 |
| 0000162200 | 86C6 | FEFF | 6800 | 03E7 | 868D | FEFA | 5016 | 681E |
| 0000162220 | 0917 | 468D | 16D6 | 9A50 | 3126 | DA11 | C483 | 690E |

THU MAR 14 17:31:54 1991 DB_PI.DLL PAGE 63, LINE 3659

| | | | | | | | | |
|---|---|---|---|---|---|---|---|---|
| 0000162240 | 0E76 | 00AA | 5EC4 | 26FA | B883 | B24C | 7400 | E903 |
| 0000162260 | 00B0 | 5EC4 | 26FA | 77FF | FF24 | 0E76 | 76FF | FFFC |
| 0000162300 | FA76 | 909A | BE0A | 83D5 | 08C4 | 8689 | FF1A | BE83 |
| 0000162320 | FF1A | 7500 | E903 | 008A | 068E | 3A70 | 8326 | CD3E |
| 0000162340 | 00D5 | 0375 | 0AE9 | 8300 | DCBE | FEFE | 0374 | 0FE9 |
| 0000162360 | 8E00 | 7206 | 263A | 3E83 | D5E5 | 7500 | E903 | 005B |
| 0000162400 | 868B | FF1A | 8689 | FEDE | B6FF | FEE4 | B6FF | FEE2 |
| 0000162420 | 868D | FEDE | 5016 | B6FF | FEF4 | 76FF | FFF8 | F676 |
| 0000162440 | 8E8D | FEE6 | 5116 | 8E8D | FF1E | 5116 | 8E8D | FED8 |
| 0000162460 | 5116 | 681E | 0924 | CC68 | FF03 | 1E36 | FF08 | 1C36 |
| 0000162500 | FF08 | 2236 | FF08 | 2036 | 9A08 | D62E | 0000 | C483 |
| 0000162520 | 8B28 | DE86 | E9FE | 0217 | 07E9 | 8B00 | 1A86 | E9FF |
| 0000162540 | 020D | 86C7 | FEF8 | 00B4 | 868D | FF22 | 5016 | 868D |
| 0000162560 | FEF8 | 5016 | 468D | 16D6 | 6A50 | 6A01 | 690B | 0E4E |
| 0000162600 | 00AA | 4E03 | 8BFA | FC56 | E981 | 4E34 | 5152 | 1B9A |
| 0000162620 | E5D8 | 83C9 | 14C4 | 8689 | FF1A | BE81 | FF1A | 01BC |
| 0000162640 | 0375 | 1FE9 | FF00 | E0B6 | 8DFE | FA86 | 16FE | 8D50 |
| 0000162660 | D646 | 5016 | 2E9A | FB28 | 83DA | 0AC4 | 003D | 7500 |
| 0000162700 | E903 | 0009 | 86C7 | FF1C | 0001 | FDE9 | 8300 | 1ABE |
| 0000162720 | 00FF | 0375 | 98E9 | 8100 | 1ABE | FAFF | 7501 | E903 |
| 0000162740 | 008D | 068E | 3A70 | 8326 | 6F3E | 00DB | 0375 | 0AE9 |
| 0000162760 | 8300 | DCBE | FEFE | 0374 | 0FE9 | 8E00 | 7206 | 263A |
| 0000163000 | 3E83 | DB88 | 7500 | E903 | 005B | 868B | FF1A | 8689 |
| 0000163020 | FEDE | B6FF | FEE4 | B6FF | FEE2 | 868D | FEDE | 5016 |
| 0000163040 | B6FF | FEF4 | 76FF | FFF8 | F676 | 8E8D | FEE6 | 5116 |
| 0000163060 | 8E8D | FF1E | 5116 | 8E8D | FED8 | 5116 | 681E | 0924 |
| 0000163100 | DB68 | FF03 | 1E36 | FF08 | 1C36 | FF08 | 2236 | FF08 |
| 0000163120 | 2036 | 9A08 | DBD8 | 0000 | C483 | 8B28 | DE86 | E9FE |
| 0000163140 | 010D | 07E9 | 8B00 | 1A86 | E9FF | 0103 | 5BE9 | 8B00 |
| 0000163160 | E0B6 | 8DFE | D642 | 5016 | 6A9A | 0C28 | 83DB | 04C4 |
| 0000163200 | 8689 | FF1C | 468D | 16D6 | 9A50 | 27B0 | DB63 | C483 |
| 0000163220 | 2B04 | E086 | F7FE | 05D8 | 0003 | 8689 | FEF2 | 86C7 |
| 0000163240 | FEF6 | 0001 | 04E9 | FF00 | F686 | 8BFE | F686 | 39FE |
| 0000163260 | F286 | 7DFE | E903 | 000E | 0AB8 | F700 | 1CAE | 89FF |
| 0000163300 | 1C86 | E9FF | FFE1 | 86FF | FF1C | B6FF | FF1C | 036A |
| 0000163320 | 868D | FEFA | 5016 | 681E | 091C | 76FF | FF08 | 0676 |
| 0000163340 | 269A | 8331 | 83D8 | 10C4 | 068E | 3A70 | 8326 | 873E |
| 0000163360 | 00D6 | 0375 | 0AE9 | 8300 | DCBE | FEFE | 0374 | 0FE9 |
| 0000163400 | 8E00 | 7206 | 263A | 3E83 | D6B4 | 7500 | E903 | 0059 |
| 0000163420 | 86C7 | FEDE | 0000 | B6FF | FEE4 | B6FF | FEE2 | 868D |
| 0000163440 | FEDE | 5016 | B6FF | FEF4 | 76FF | FFF8 | F676 | 8E8D |
| 0000163460 | FEE6 | 5116 | 8E8D | FF1E | 5116 | 8E8D | FED8 | 5116 |
| 0000163500 | 681E | 0924 | EB68 | FF03 | 1E36 | FF08 | 1C36 | FF08 |
| 0000163520 | 2236 | FF08 | 2036 | 9A08 | D7A1 | 0000 | C483 | 8B28 |
| 0000163540 | DE86 | E9FE | 0009 | 06E9 | B800 | 0000 | 00E9 | 1F00 |
| 0000163560 | 5F5E | ED83 | 8B02 | 1FE5 | 4D5D | 0ECA | 1E00 | 9058 |
| 0000163600 | 5545 | EC8B | 8E1E | 81D8 | 4CEC | 5700 | 1E56 | 64B8 |
| 0000163620 | 8ED6 | C7D8 | F646 | 0939 | 5E8C | C7F8 | CE46 | 0101 |
| 0000163640 | C02B | 4689 | 89C0 | BE46 | 068E | 3A70 | 8326 | BD3E |
| 0000163660 | 00DC | 0375 | 1DE9 | FF00 | 2236 | FF08 | 2036 | 8D08 |
| 0000163700 | B646 | 5016 | 9E9A | 00D6 | 8300 | 08C4 | 003D | 7400 |
| 0000163720 | E903 | 000F | 068E | 3A72 | 8326 | D53E | 00DC | 0375 |
| 0000163740 | 3BE9 | 1E00 | 4068 | 8D09 | C246 | 5016 | 468D | 16B6 |
| 0000163760 | 8D50 | D246 | 5016 | 1968 | 1E04 | 4868 | FF09 | 1E36 |
| 0000164000 | FF08 | 1C36 | FF08 | 2236 | FF08 | 2036 | 9A08 | D6EA |
| 0000164020 | 0000 | C483 | 891E | D246 | 5689 | E9D4 | 0008 | C02B |
| 0000164040 | 4689 | 89D4 | D246 | 46C7 | 00D0 | 8B00 | 0846 | 460B |
| 0000164060 | 7406 | E903 | 007D | 068E | 3A70 | 8326 | 523E | 00DD |
| 0000164100 | 0375 | 09E9 | 8300 | BA7E | 74FE | E903 | 000F | 068E |

THU MAR 14 17:31:54 1991 DB_PI.DLL PAGE 64, LINE 3718

| | | | | | | | | |
|---|---|---|---|---|---|---|---|---|
| 0000164120 | 3A72 | 8326 | 6A3E | 00DD | 0375 | 50E9 | C700 | BC46 |
| 0000164140 | 0017 | 76FF | FFC0 | BE76 | 468D | 16BC | FF50 | CE76 |
| 0000164160 | 76FF | FFF8 | F676 | 4E8D | 16C2 | 8D51 | D24E | 5116 |
| 0000164200 | 4E8D | 16B6 | 1E51 | 4868 | 6809 | 0420 | 36FF | 081E |
| 0000164220 | 36FF | 081C | 36FF | 0822 | 36FF | 0820 | B29A | 00DD |
| 0000164240 | 8300 | 28C4 | 468B | E9BC | 0342 | 06E9 | B800 | 0017 |
| 0000164260 | 39E9 | 8B03 | 0C46 | 460B | 750A | E903 | 008A | 468A |
| 0000164300 | 2A0D | 3BE4 | 0E46 | 0375 | 7DE9 | 8E00 | 7006 | 263A |
| 0000164320 | 3E83 | DDF7 | 7500 | E903 | 0009 | 7E83 | FEBA | 0374 |
| 0000164340 | 0FE9 | 8E00 | 7206 | 263A | 3E83 | DE0F | 7500 | E903 |
| 0000164360 | 0050 | 46C7 | ADBC | FF01 | C076 | 76FF | 8DBE | BC46 |
| 0000164400 | 5016 | 76FF | FFCE | F876 | 76FF | 8DF6 | C24E | 5116 |
| 0000164420 | 4E8D | 16D2 | 8D51 | B64E | 5116 | 681E | 0948 | 2368 |
| 0000164440 | FF04 | 1E36 | FF08 | 1C36 | FF08 | 2236 | FF08 | 2036 |
| 0000164460 | 9A08 | DE57 | 0000 | C483 | 8B28 | BC46 | ADE9 | E902 |
| 0000164500 | 0006 | ADB8 | E901 | 02A4 | 7E83 | 780E | 037D | 11E9 |
| 0000164520 | 8300 | 0E7E | 7C7B | E903 | 0008 | 46C7 | 01B4 | E900 |
| 0000164540 | 0005 | 46C7 | 00B4 | 8300 | B47E | 7400 | E903 | 007D |
| 0000164560 | 068E | 3A70 | 8326 | 953E | 00DE | 0375 | 09E9 | 8300 |
| 0000164600 | BA7E | 74FE | E903 | 000F | 068E | 3A72 | 8326 | AD3E |
| 0000164620 | 00DE | 0375 | 50E9 | C700 | BC46 | 01AD | 76FF | FFC0 |
| 0000164640 | BE76 | 468D | 16BC | FF50 | CE76 | 76FF | FFF8 | F676 |
| 0000164660 | 4E8D | 16C2 | 8D51 | D24E | 5116 | 4E8D | 16B6 | 1E51 |
| 0000164700 | 4868 | 6809 | 0425 | 36FF | 081E | 36FF | 081C | 36FF |
| 0000164720 | 0822 | 36FF | 0820 | F69A | 00DE | 8300 | 28C4 | 468B |
| 0000164740 | E9BC | 0208 | 06E9 | B800 | 01AD | FFE9 | 8D01 | FA46 |
| 0000164760 | 5016 | 006A | 76FF | FF16 | 1476 | 649A | C8CF | 83D7 |
| 0000165000 | 0AC4 | 4689 | 83D0 | D07E | 7500 | E903 | 007E | 068E |
| 0000165020 | 3A70 | 8326 | 693E | 00DA | 0375 | 09E9 | 8300 | BA7E |
| 0000165040 | 74FE | E903 | 000F | 068E | 3A72 | 8326 | 823E | 00DA |
| 0000165060 | 0375 | 51E9 | 8B00 | D046 | 4689 | FFBC | C076 | 76FF |
| 0000165100 | 8DBE | BC46 | 5016 | 76FF | FFCE | F876 | 76FF | 8DF6 |
| 0000165120 | C24E | 5116 | 4E8D | 16D2 | 8D51 | B64E | 5116 | 681E |
| 0000165140 | 0948 | 2968 | FF04 | 1E36 | FF08 | 1C36 | FF08 | 2236 |
| 0000165160 | FF08 | 2036 | 9A08 | DAD4 | 0000 | C483 | 8B28 | BC46 |
| 0000165200 | 69E9 | E901 | 0006 | 468B | E9D0 | 0160 | 46C6 | 00D6 |
| 0000165220 | 468B | 0B0C | 0A46 | 0374 | 16E9 | 8D00 | D646 | 5016 |
| 0000165240 | 76FF | FF12 | 1076 | 3D9A | 9E42 | 83D1 | 08C4 | 4689 |
| 0000165260 | 83D0 | D07E | 7500 | E903 | 007E | 068E | 3A70 | 8326 |
| 0000165300 | F53E | 00DF | 0375 | 09E9 | 8300 | BA7E | 74FE | E903 |
| 0000165320 | 000F | 068E | 3A72 | 8326 | 0D3E | 00E0 | 0375 | 51E9 |
| 0000165340 | 8B00 | D046 | 4689 | FFBC | C076 | 76FF | 8DBE | BC46 |
| 0000165360 | 5016 | 76FF | FFCE | F876 | 76FF | 8DF6 | C24E | 5116 |
| 0000165400 | 4E8D | 16D2 | 8D51 | B64E | 5116 | 681E | 0948 | 2E68 |
| 0000165420 | FF04 | 1E36 | FF08 | 1C36 | FF08 | 2236 | FF08 | 2036 |
| 0000165440 | 9A08 | E056 | 0000 | C483 | 8B28 | BC46 | BDE9 | E900 |
| 0000165460 | 0006 | 468B | E9D0 | 00B4 | 76FF | FF08 | 0676 | 006A |
| 0000165500 | 76FF | FF0C | 0A76 | 76FF | 8D0E | D646 | 5016 | 76FF |
| 0000165520 | FFFC | FA76 | 669A | 4501 | 83D9 | 14C4 | 4689 | 81D0 |
| 0000165540 | D07E | 01FA | 0374 | 05E9 | C700 | D046 | 0000 | 068E |
| 0000165560 | 3A70 | 8326 | 2F3E | 00DC | 0375 | 09E9 | 8300 | BA7E |
| 0000165600 | 74FE | E903 | 000F | 068E | 3A72 | 8326 | 5B3E | 00DC |
| 0000165620 | 0375 | 51E9 | 8B00 | D046 | 4689 | FFBC | C076 | 76FF |
| 0000165640 | 8DBE | BC46 | 5016 | 76FF | FFCE | F876 | 76FF | 8DF6 |
| 0000165660 | C24E | 5116 | 4E8D | 16D2 | 8D51 | B64E | 5116 | 681E |
| 0000165700 | 0948 | 3868 | FF04 | 1E36 | FF08 | 1C36 | FF08 | 2236 |
| 0000165720 | FF08 | 2036 | 9A08 | DD1D | 0000 | C483 | 8B28 | BC46 |
| 0000165740 | 09E9 | E900 | 0006 | 468B | E9D0 | 0000 | 5E1F | 835F |
| 0000165760 | 02ED | E58B | 5D1F | CA4D | 0012 | 581E | 4590 | 8B55 |

THU MAR 14 17:31:54 1991 DB_PI.DLL PAGE 65, LINE 3777

| | | | | | | | | |
|---|---|---|---|---|---|---|---|---|
| 0000166000 | 1EEC | D88E | EC81 | 0032 | 5657 | B81E | DC0F | D88E |
| 0000166020 | 46C7 | 57F6 | 8C09 | F85E | 46C7 | 01EE | 2B01 | 89C0 |
| 0000166040 | DC46 | 4689 | 8EDA | 7006 | 263A | 3E83 | E144 | 7500 |
| 0000166060 | E903 | 001D | 36FF | 0822 | 36FF | 0820 | 468D | 16D2 |
| 0000166100 | 9A50 | DC45 | 0000 | C483 | 3D08 | 0000 | 0374 | 0FE9 |
| 0000166120 | 8E00 | 7206 | 263A | 3E83 | E15C | 7500 | E903 | 003B |
| 0000166140 | 681E | 095E | 468D | 16DE | 8D50 | D246 | 5016 | 468D |
| 0000166160 | 16F2 | 6850 | 0466 | 681E | 0966 | 36FF | 081E | 36FF |
| 0000166200 | 081C | 36FF | 0822 | 36FF | 0820 | 8E9A | 00DC | 8300 |
| 0000166220 | 1EC4 | 4689 | 89F2 | F456 | 08E9 | 2B00 | 89C0 | F446 |
| 0000166240 | 4689 | C7F2 | F046 | 0000 | 5EC4 | 2606 | 478A | 2A03 |
| 0000166260 | C4E4 | 065E | 3B26 | 4847 | 0375 | 7DE9 | 8E00 | 7006 |
| 0000166300 | 263A | 3E83 | E1F1 | 7500 | E903 | 0009 | 7E83 | FED6 |
| 0000166320 | 0374 | 0FE9 | 8E00 | 7206 | 263A | 3E83 | E209 | 7500 |
| 0000166340 | E903 | 0050 | 46C7 | 13D8 | FF00 | DC76 | 76FF | 8DDA |
| 0000166360 | D846 | 5016 | 76FF | FFEE | F876 | 76FF | 8DF6 | DE4E |
| 0000166400 | 5116 | 4E8D | 16F2 | 8D51 | D24E | 5116 | 681E | 0966 |
| 0000166420 | 7168 | FF04 | 1E36 | FF08 | 1C36 | FF08 | 2236 | FF08 |
| 0000166440 | 2036 | 9A08 | E251 | 0000 | C483 | 8B28 | D846 | 54E9 |
| 0000166460 | E908 | 0006 | 13B8 | E900 | 084B | 5EC4 | 2606 | 7F83 |
| 0000166500 | 7848 | 037D | 15E9 | C400 | 065E | 8326 | 487F | 7C7B |
| 0000166520 | E903 | 0008 | 46C7 | 01CE | E900 | 0005 | 46C7 | 00CE |
| 0000166540 | 8300 | CE7E | 7400 | E903 | 007D | 068E | 3A70 | 8326 |
| 0000166560 | 8F3E | 00E2 | 0375 | 09E9 | 8300 | D67E | 74FE | E903 |
| 0000166600 | 000F | 068E | 3A72 | 8326 | A73E | 00E2 | 0375 | 50E9 |
| 0000166620 | C700 | D846 | 0013 | 76FF | FFDC | DA76 | 468D | 16D8 |
| 0000166640 | FF50 | EE76 | 76FF | FFF8 | F676 | 4E8D | 16DE | 8D51 |
| 0000166660 | F24E | 5116 | 4E8D | 16D2 | 1E51 | 6668 | 6809 | 0473 |
| 0000166700 | 36FF | 081E | 36FF | 081C | 36FF | 0822 | 36FF | 0820 |
| 0000166720 | F09A | 00E2 | 8300 | 28C4 | 468B | E9D8 | 07A7 | 06E9 |
| 0000166740 | B800 | 0013 | 9EE9 | 8D07 | FA46 | 5016 | 026A | 76FF |
| 0000166760 | FFDC | 0A76 | 649A | 7DCF | 83DE | 0AC4 | 4689 | 83F0 |
| 0000167000 | F07E | 7500 | E903 | 007E | 068E | 3A70 | 8326 | 2B3E |
| 0000167020 | 00E3 | 0375 | 09E9 | 8300 | D67E | 74FE | E903 | 000F |
| 0000167040 | 068E | 3A72 | 8326 | 433E | 00E3 | 0375 | 51E9 | 8B00 |
| 0000167060 | F046 | 4689 | FFD8 | DC76 | 76FF | 8DDA | D846 | 5016 |
| 0000167100 | 76FF | FFEE | F876 | 76FF | 8DF6 | DE4E | 5116 | 4E8D |
| 0000167120 | 16F2 | 8D51 | D24E | 5116 | 681E | 0966 | 7668 | FF04 |
| 0000167140 | 1E36 | FF08 | 1C36 | FF08 | 2236 | FF08 | 2036 | 9A08 |
| 0000167160 | E38B | 0000 | C483 | 8B28 | D846 | 08E9 | E907 | 0006 |
| 0000167200 | 468B | E9F0 | 06FF | 016A | B468 | 9A00 | 3376 | DA37 |
| 0000167220 | C483 | 8904 | EA46 | 5689 | 8BEC | EC46 | 460B | 74EA |
| 0000167240 | E903 | 007D | 068E | 3A70 | 8326 | E63E | 00E3 | 0375 |
| 0000167260 | 09E9 | 8300 | D67E | 74FE | E903 | 000F | 068E | 3A72 |
| 0000167300 | 8326 | FE3E | 00E3 | 0375 | 50E9 | C700 | D846 | 0007 |
| 0000167320 | 76FF | FFDC | DA76 | 468D | 16D8 | FF50 | EE76 | 76FF |
| 0000167340 | FFF8 | F676 | 4E8D | 16DE | 8D51 | F24E | 5116 | 4E8D |
| 0000167360 | 16D2 | 1E51 | 6668 | 6809 | 047F | 36FF | 081E | 36FF |
| 0000167400 | 081C | 36FF | 0822 | 36FF | 0820 | A29A | 00DF | 8300 |
| 0000167420 | 28C4 | 468B | E9D8 | 066D | 06E9 | B800 | 0007 | 64E9 |
| 0000167440 | FF06 | EC76 | 76FF | 6AEA | C400 | 065E | FF26 | 0277 |
| 0000167460 | FF26 | C437 | 065E | FF26 | 4877 | 468B | 8B06 | 0856 |
| 0000167500 | 0405 | 5200 | FF50 | FC76 | 76FF | 9AFA | 0166 | DFD7 |
| 0000167520 | C483 | 8914 | F046 | 7E83 | 00F0 | 0375 | 7EE9 | 8E00 |
| 0000167540 | 7006 | 263A | 3E83 | DF41 | 7500 | E903 | 0009 | 7E83 |
| 0000167560 | FED6 | 0374 | 0FE9 | 8E00 | 7206 | 263A | 3E83 | DF59 |
| 0000167600 | 7500 | E903 | 0051 | 468B | 89F0 | D846 | 76FF | FFDC |
| 0000167620 | DA76 | 468D | 16D8 | FF50 | EE76 | 76FF | FFF8 | F676 |
| 0000167640 | 4E8D | 16DE | 8D51 | F24E | 5116 | 4E8D | 16D2 | 1E51 |

THU MAR 14 17:31:54 1991 DB_PI.DLL PAGE 66, LINE 3836

| | | | | | | | | |
|---|---|---|---|---|---|---|---|---|
| 0000167660 | 6668 | 6809 | 0485 | 36FF | 081E | 36FF | 081C | 36FF |
| 0000167700 | 0822 | 36FF | 0820 | 029A | 00E5 | 83C0 | 28C4 | 468B |
| 0000167720 | E9D8 | 05B1 | 06E9 | 8B00 | F046 | A8E9 | C405 | EA5E |
| 0000167740 | 8026 | 247F | 7400 | E903 | 0195 | 5EC4 | 26EA | 478B |
| 0000167760 | C46C | EA5E | 0326 | 6647 | B405 | 5000 | 76FF | FFEC |
| 0000170000 | EA76 | A49A | 6C32 | 83E5 | 06C4 | 4689 | 89EA | EC56 |
| 0000170020 | 468B | 0BEC | EA46 | 0374 | 7DE9 | 8E00 | 7006 | 263A |
| 0000170040 | 3E83 | E580 | 7500 | E903 | 0009 | 7E83 | FED6 | 0374 |
| 0000170060 | 0FE9 | 8E00 | 7206 | 263A | 3E83 | E598 | 7500 | E903 |
| 0000170100 | 0050 | 46C7 | 07D8 | FF00 | DC76 | 76FF | 8DDA | D846 |
| 0000170120 | 5016 | 76FF | FFEE | F876 | 76FF | 8DF6 | DE4E | 5116 |
| 0000170140 | 4E8D | 16F2 | 8D51 | D24E | 5116 | 681E | 0966 | 8D68 |
| 0000170160 | FF04 | 1E36 | FF08 | 1C36 | FF08 | 2236 | FF08 | 2036 |
| 0000170200 | 9A08 | E5E1 | 0000 | C483 | 8B28 | D846 | F6E9 | E904 |
| 0000170220 | 0006 | 07B8 | E900 | 04ED | 76FF | FFEC | EA76 | 5EC4 |
| 0000170240 | 2606 | 478B | C46C | 065E | 0326 | 6647 | C450 | 065E |
| 0000170260 | FF26 | 0277 | FF26 | C437 | 065E | FF26 | 4877 | 468B |
| 0000170300 | 8B06 | 0856 | 0405 | 5200 | FF50 | FC76 | 76FF | 9AFA |
| 0000170320 | 0166 | E3CE | C483 | 8914 | F046 | 7E83 | 00F0 | 0375 |
| 0000170340 | 94E9 | FF00 | EC76 | 76FF | 9AEA | 2448 | E62D | C483 |
| 0000170360 | 2B04 | 89C0 | EC46 | 4689 | 8EEA | 7006 | 263A | 3E83 |
| 0000170400 | E641 | 7500 | E903 | 0009 | 7E83 | FED6 | 0374 | 0FE9 |
| 0000170420 | 8E00 | 7206 | 263A | 3E83 | E659 | 7500 | E903 | 0051 |
| 0000170440 | 468B | 89F0 | D846 | 76FF | FFDC | DA76 | 468D | 16D8 |
| 0000170460 | FF50 | EE76 | 76FF | FFF8 | F676 | 4E8D | 16DE | 8D51 |
| 0000170500 | F24E | 5116 | 4E8D | 16D2 | 1E51 | 6668 | 6809 | 0497 |
| 0000170520 | 36FF | 081E | 36FF | 081C | 36FF | 0822 | 36FF | 0820 |
| 0000170540 | A19A | 00E6 | 8300 | 28C4 | 468B | E9D8 | 0417 | 06E9 |
| 0000170560 | 8B00 | F046 | 0EE9 | C704 | D046 | 0000 | 05E9 | C700 |
| 0000170600 | D046 | 0001 | 5EC4 | 2606 | 478B | 2650 | 578B | C452 |
| 0000170620 | EA5E | 3926 | 5047 | 0374 | 09E9 | 2600 | 5739 | 7552 |
| 0000170640 | E903 | 0093 | 76FF | FFEC | EA76 | 489A | D024 | 83E6 |
| 0000170660 | 04C4 | C02B | 4689 | 89EC | EA46 | D68E | 3A70 | 8326 |
| 0000170700 | DD3E | 00E7 | 0375 | 09E9 | 8300 | D67E | 74FE | E903 |
| 0000170720 | 000F | 068E | 3A72 | 8326 | D83E | 00E0 | 0375 | 50E9 |
| 0000170740 | C700 | D846 | 01A8 | 76FF | FFDC | DA76 | 468D | 16D8 |
| 0000170760 | FF50 | EE76 | 76FF | FFF8 | F676 | 4E8D | 16DE | 8D51 |
| 0000171000 | F24E | 5116 | 4E8D | 16D2 | 1E51 | 6668 | 6809 | 04A7 |
| 0000171020 | 36FF | 081E | 36FF | 081C | 36FF | 0822 | 36FF | 0820 |
| 0000171040 | A49A | 00E1 | 8300 | 28C4 | 468B | E9D8 | 0357 | 06E9 |
| 0000171060 | B800 | 01A8 | 4EE9 | 8B03 | EA46 | 568B | 05EC | 0004 |
| 0000171100 | 5052 | 468B | 8B06 | 0856 | 0405 | 5200 | 9A50 | 2786 |
| 0000171120 | E6FB | C483 | 3D08 | 0000 | 0375 | 05E9 | C700 | F046 |
| 0000171140 | 0013 | 468B | 8BEA | EC56 | 2405 | 5200 | 8B50 | 0646 |
| 0000171160 | 568B | 0508 | 0024 | 5052 | 869A | C927 | 83E7 | 08C4 |
| 0000171200 | 003D | 7500 | E903 | 0005 | 46C7 | 13F0 | C400 | 065E |
| 0000171220 | 8B26 | 4847 | 5EC4 | 26EA | 4739 | 7448 | E903 | 0039 |
| 0000171240 | 5EC4 | 2606 | 478B | C45C | EA5E | 3926 | 5C47 | 0374 |
| 0000171260 | 26E9 | C400 | 065E | 8B26 | 5E47 | 5EC4 | 26EA | 4739 |
| 0000171300 | 745E | E903 | 0013 | 5EC4 | 2606 | 478B | C460 | EA5E |
| 0000171320 | 3926 | 6047 | 0375 | 05E9 | C700 | F046 | 0013 | 5EC4 |
| 0000171340 | 2606 | 478B | C462 | EA5E | 3926 | 6247 | 0374 | 4FE9 |
| 0000171360 | C400 | 065E | 8B26 | 6447 | 5EC4 | 26EA | 4739 | 7464 |
| 0000171400 | E903 | 003C | 5EC4 | 26EA | 478B | C466 | 065E | 3926 |
| 0000171420 | 6647 | 0374 | 29E9 | C400 | 065E | 8B26 | 6C47 | 8B26 |
| 0000171440 | 6E57 | 5EC4 | 26EA | 4739 | 746C | E903 | 0012 | 3926 |
| 0000171460 | 6E57 | 0374 | 09E9 | 8300 | F07E | 7413 | E903 | 0093 |
| 0000171500 | 76FF | FFEC | EA76 | 489A | 0E24 | 83E3 | 04C4 | C02B |
| 0000171520 | 4689 | 89EC | EA46 | 068E | 3A70 | 8326 | AC3E | 00E0 |

THU MAR 14 17:31:54 1991 DB_PI.DLL PAGE 67, LINE 3895

| | | | | | | | | |
|---|---|---|---|---|---|---|---|---|
| 0000171540 | 0375 | 09E9 | 8300 | D67E | 74FE | E903 | 000F | 068E |
| 0000171560 | 3A72 | 8326 | 133E | 00E9 | 0375 | 50E9 | C700 | D846 |
| 0000171600 | 0013 | 76FF | FFDC | DA76 | 468D | 16D8 | FF50 | EE76 |
| 0000171620 | 76FF | FFF8 | F676 | 4E8D | 16DE | 8D51 | F24E | 5116 |
| 0000171640 | 4E8D | 16D2 | 1E51 | 6668 | 6809 | 04C6 | 36FF | 081E |
| 0000171660 | 36FF | 081C | 36FF | 0822 | 36FF | 0820 | 5C9A | 00E9 |
| 0000171700 | 8300 | 28C4 | 468B | E9D8 | 01BB | 06E9 | B800 | 0013 |
| 0000171720 | B2E9 | C401 | 065E | 8B26 | 4447 | 8B26 | 4657 | 5EC4 |
| 0000171740 | 26EA | 4789 | 2644 | 5789 | C446 | 065E | 8B26 | 4A47 |
| 0000171760 | 5EC4 | 26EA | 4789 | C44A | 065E | 8B26 | 4C47 | 8B26 |
| 0000172000 | 4E57 | 5EC4 | 26EA | 4789 | 264C | 5789 | C44E | 065E |
| 0000172020 | 8B26 | 5447 | 8B26 | 5657 | 5EC4 | 26EA | 4789 | 2654 |
| 0000172040 | 5789 | C456 | 065E | 8B26 | 5847 | 8B26 | 5A57 | 5EC4 |
| 0000172060 | 26EA | 4789 | 2658 | 5789 | 6A5A | FF01 | D076 | 76FF |
| 0000172100 | FFEC | EA76 | 76FF | FFFC | FA76 | 009A | 5200 | 83E5 |
| 0000172120 | 0CC4 | 4689 | 83F0 | F07E | 7500 | E903 | 0094 | 76FF |
| 0000172140 | FFEC | EA76 | 439A | 8524 | 83E4 | 04C4 | C02B | 4689 |
| 0000172160 | 89EC | EA46 | 068E | 3A70 | 8326 | A23E | 00E4 | 0375 |
| 0000172200 | 09E9 | 8300 | D67E | 74FE | E903 | 000F | 068E | 3A72 |
| 0000172220 | 8326 | BA3E | 00E4 | 0375 | 51E9 | 8B00 | F046 | 4689 |
| 0000172240 | FFD8 | DC76 | 76FF | 8DDA | D846 | 5016 | 76FF | FFEE |
| 0000172260 | F876 | 76FF | 8DF6 | DE4E | 5116 | 4E8D | 16F2 | 8D51 |
| 0000172300 | D24E | 5116 | 681E | 0966 | DC68 | FF04 | 1E36 | FF08 |
| 0000172320 | 1C36 | FF08 | 2236 | FF08 | 2036 | 9A08 | E447 | 0000 |
| 0000172340 | C483 | 8B28 | D846 | 9CE9 | E900 | 0006 | 468B | E9F0 |
| 0000172360 | 0093 | 76FF | FFEC | EA76 | 489A | E724 | 83E8 | 04C4 |
| 0000172400 | C02B | 4689 | 89EC | EA46 | 068E | 3A70 | 8326 | FB3E |
| 0000172420 | 00E8 | 0375 | 09E9 | 8300 | D67E | 74FE | E903 | 000F |
| 0000172440 | 068E | 3A72 | 8326 | F53E | 00E7 | 0375 | 50E9 | C700 |
| 0000172460 | D846 | 0000 | 76FF | FFDC | DA76 | 468D | 16D8 | FF50 |
| 0000172500 | EE76 | 76FF | FFF8 | F676 | 4E8D | 16DE | 8D51 | F24E |
| 0000172520 | 5116 | 4E8D | 16D2 | 1E51 | 6668 | 6809 | 04E0 | 36FF |
| 0000172540 | 081E | 36FF | 081C | 36FF | 0822 | 36FF | 0820 | 3D9A |
| 0000172560 | 00E8 | 8300 | 28C4 | 468B | E9D8 | 0009 | 06E9 | B800 |
| 0000172600 | 0000 | 00E9 | 1F00 | 5F5E | ED83 | 8B02 | 1FE5 | 4D5D |
| 0000172620 | 08CA | 1E00 | 9058 | 5545 | EC8B | 8E1E | 81D8 | DAEC |
| 0000172640 | 5700 | 1E56 | 8CB8 | 8EE0 | C7D8 | FA46 | 0975 | 5E8C |
| 0000172660 | C7FC | F246 | 0101 | C02B | 8689 | FF30 | 8689 | FF2E |
| 0000172700 | 068E | 3A70 | 8326 | F93E | 00EA | 0375 | 1EE9 | FF00 |
| 0000172720 | 2236 | FF08 | 2036 | 8D08 | 2686 | 16FF | 9A50 | E0C2 |
| 0000172740 | 0000 | C483 | 3D08 | 0000 | 0374 | 0FE9 | 8E00 | 7206 |
| 0000172760 | 263A | 3E83 | EB12 | 7500 | E903 | 003D | 681E | 097C |
| 0000173000 | 868D | FF32 | 5016 | 868D | FF26 | 5016 | 468D | 16F6 |
| 0000173020 | 6850 | 0509 | 681E | 0984 | 36FF | 081E | 36FF | 081C |
| 0000173040 | 36FF | 0822 | 36FF | 0820 | 0B9A | 00E1 | 8300 | 1EC4 |
| 0000173060 | 4689 | 89F6 | F856 | 08E9 | 2B00 | 89C0 | F846 | 4689 |
| 0000173100 | C7F6 | F446 | 0000 | 76FF | FF18 | 1676 | 76FF | FF14 |
| 0000173120 | 1276 | 76FF | FF10 | 0E76 | 76FF | 8D0C | 3E86 | 16FF |
| 0000173140 | 9A50 | DBFD | EC45 | 4689 | 83F4 | F47E | 7500 | E903 |
| 0000173160 | 0086 | 068E | 3A70 | 8326 | A63E | 00EB | 0375 | 0AE9 |
| 0000173200 | 8300 | 2ABE | FEFF | 0374 | 0FE9 | 8E00 | 7206 | 263A |
| 0000173220 | 3E83 | EBBF | 7500 | E903 | 0058 | 468B | 89F4 | 2C86 |
| 0000173240 | FFFF | 30B6 | FFFF | 2EB6 | 8DFF | 2C86 | 16FF | FF50 |
| 0000173260 | F276 | 76FF | FFFC | FA76 | 8E8D | FF32 | 5116 | 4E8D |
| 0000173300 | 16F6 | 8D51 | 268E | 16FF | 1E51 | 8468 | 6809 | 050F |
| 0000173320 | 36FF | 081E | 36FF | 081C | 36FF | 0822 | 36FF | 0820 |
| 0000173340 | 0D9A | 00EC | 8300 | 28C4 | 868B | FF2C | 61E9 | E901 |
| 0000173360 | 0006 | 468B | E9F4 | 0158 | 468A | 2A0B | 3DE4 | 0029 |
| 0000173400 | 0375 | 9FE9 | 8A00 | 0B46 | E42A | 2B3D | 7500 | E903 |

THU MAR 14 17:31:54 1991 DB_PI.DLL PAGE 68, LINE 3954

| | | | | | | | | |
|---|---|---|---|---|---|---|---|---|
| 0000173420 | 0092 | 468A | 2A0B | 3DE4 | 002A | 0375 | 85E9 | 8E00 |
| 0000173440 | 7006 | 263A | 3E83 | EC51 | 7500 | E903 | 000A | BE83 |
| 0000173460 | FF2A | 74FE | E903 | 000F | 068E | 3A72 | 8326 | 6A3E |
| 0000173500 | 00EC | 0375 | 57E9 | C700 | 2C86 | 13FF | FF00 | 30B6 |
| 0000173520 | FFFF | 2EB6 | 8DFF | 2C86 | 16FF | FF50 | F276 | 76FF |
| 0000173540 | FFFC | FA76 | 8E8D | FF32 | 5116 | 4E8D | 16F6 | 8D51 |
| 0000173560 | 268E | 16FF | 1E51 | 8468 | 6809 | 0516 | 36FF | 081E |
| 0000173600 | 36FF | 081C | 36FF | 0822 | 36FF | 0820 | B99A | 00EC |
| 0000173620 | 8300 | 28C4 | 868B | FF2C | B5E9 | E900 | 0006 | 13B8 |
| 0000173640 | E900 | 00AC | 468B | 8B08 | 0A56 | 4689 | 898A | 8C56 |
| 0000173660 | 468B | 8906 | 8846 | 76FF | FF18 | 1676 | 868D | FF3E |
| 0000173700 | 5016 | 7A9A | 62E0 | 89CA | F446 | 068E | 3A70 | 8326 |
| 0000173720 | 8F3E | 00E9 | 0375 | 0AE9 | 8300 | 2ABE | FEFF | 0374 |
| 0000173740 | 0FE9 | 8E00 | 7206 | 263A | 3E83 | E9A7 | 7500 | E903 |
| 0000173760 | 0058 | 468B | 89F4 | 2C86 | FFFF | 30B6 | FFFF | 2EB6 |
| 0000174000 | 8DFF | 2C86 | 16FF | FF50 | F276 | 76FF | FFFC | FA76 |
| 0000174020 | 8E8D | FF32 | 5116 | 4E8D | 16F6 | 8D51 | 268E | 16FF |
| 0000174040 | 1E51 | 8468 | 6809 | 051D | 36FF | 081E | 36FF | 081C |
| 0000174060 | 36FF | 0822 | 36FF | 0820 | EF9A | 00E9 | 8300 | 28C4 |
| 0000174100 | 868B | FF2C | 09E9 | E900 | 0006 | 468B | E9F4 | 0000 |
| 0000174120 | 5E1F | 835F | 02ED | E58B | 5D1F | CA4D | 0014 | 581E |
| 0000174140 | 459D | 8B55 | 1EEC | D88E | EC81 | 002A | 5657 | B81E |
| 0000174160 | EA25 | D88E | 46C7 | 93F6 | 8C09 | F85E | 46C7 | 01EE |
| 0000174200 | 2B01 | 89C0 | E046 | 4689 | 8EDE | 7006 | 263A | 3E83 |
| 0000174220 | EDA5 | 7500 | E903 | 001D | 36FF | 0822 | 36FF | 0820 |
| 0000174240 | 468D | 16D6 | 9A50 | EA5E | 0000 | C483 | 3D08 | 0000 |
| 0000174260 | 0374 | 0FE9 | 8E00 | 7206 | 263A | 3E83 | EDBD | 7500 |
| 0000174300 | E903 | 003B | 681E | 099A | 468D | 16E2 | 8D50 | D646 |
| 0000174320 | 5016 | 468D | 16F2 | 6850 | 053B | 681E | 09A2 | 36FF |
| 0000174340 | 081E | 36FF | 081C | 36FF | 0822 | 36FF | 0820 | A99A |
| 0000174360 | 00EA | 8300 | 1EC4 | 4689 | 89F2 | F456 | 08E9 | 2B00 |
| 0000174400 | 89C0 | F446 | 4689 | C4F2 | 065E | C02B | 8926 | 0247 |
| 0000174420 | 8926 | 8B07 | 0C46 | 460B | 740A | E903 | 007D | 068E |
| 0000174440 | 3A70 | 8326 | 2F3E | 00EE | 0375 | 09E9 | 8300 | DA7E |
| 0000174460 | 74FE | E903 | 000F | 068E | 3A72 | 8326 | 473E | 00EE |
| 0000174500 | 0375 | 50E9 | C700 | DC46 | 0017 | 76FF | FFE0 | DE76 |
| 0000174520 | 468D | 16DC | FF50 | EE76 | 76FF | FFF8 | F676 | 4E8D |
| 0000174540 | 16E2 | 8D51 | F24E | 5116 | 4E8D | 16D6 | 1E51 | A268 |
| 0000174560 | 6809 | 0544 | 36FF | 081E | 36FF | 081C | 36FF | 0822 |
| 0000174600 | 36FF | 0820 | 8F9A | 00EE | 8300 | 28C4 | 468B | E9DC |
| 0000174620 | 04CC | 06E9 | B800 | 0017 | C3E9 | C404 | 0A5E | 8326 |
| 0000174640 | 487F | 757A | E903 | 007D | 068E | 3A70 | 8326 | D63E |
| 0000174660 | 00EE | 0375 | D9E9 | 8300 | DA7E | 74FE | E903 | 000F |
| 0000174700 | 068E | 3A72 | 8326 | EE3E | 00EE | 0375 | 50E9 | C700 |
| 0000174720 | DC46 | 01AD | 76FF | FFE0 | DE76 | 468D | 16DC | FF50 |
| 0000174740 | EE76 | 76FF | FFF8 | F676 | 4E8D | 16E2 | 8D51 | F24E |
| 0000174760 | 5116 | 4E8D | 16D6 | 1E51 | A268 | 6809 | 0546 | 36FF |
| 0000175000 | 081E | 36FF | 081C | 36FF | 0822 | 36FF | 0820 | 519A |
| 0000175020 | 00EF | 8300 | 28C4 | 468B | E9DC | 0442 | 06E9 | B800 |
| 0000175040 | 01AD | 39E9 | C404 | 0A5E | 8B26 | 6C47 | 8B26 | 6E57 |
| 0000175060 | 5EC4 | 260A | 4703 | 8366 | 00D2 | FA83 | 7D00 | E903 |
| 0000175100 | 00BF | 037E | 08E9 | 3D00 | 01F4 | 0377 | B2E9 | 8E00 |
| 0000175120 | 7006 | 263A | 3E83 | EFA9 | 7500 | E903 | 0009 | 7E83 |
| 0000175140 | FEDA | 0374 | 0FE9 | 8E00 | 7206 | 263A | 3E83 | EFC1 |
| 0000175160 | 7500 | E903 | 006B | 76FF | FF10 | 0E76 | 76FF | FF0C |
| 0000175200 | 0A76 | 006A | 006A | 006A | 76FF | FF08 | 0676 | 8D9A |
| 0000175220 | 7CBD | 89EF | DC46 | 76FF | FFE0 | DE76 | 468D | 16DC |
| 0000175240 | FF50 | EE76 | 76FF | FFF8 | F676 | 4E8D | 16E2 | 8D51 |
| 0000175260 | F24E | 5116 | 4E8D | 16D6 | 1E51 | A268 | 6809 | 054E |

THU MAR 14 17:31:54 1991 DB_PI.DLL PAGE 69, LINE 4013

| | | | | | | | | |
|---|---|---|---|---|---|---|---|---|
| 0000175300 | 36FF | 081E | 36FF | 081C | 36FF | 0822 | 36FF | 0820 |
| 0000175320 | 0A9A | 00F0 | 8300 | 28C4 | 468B | E9DC | 0380 | 20E9 |
| 0000175340 | FF00 | 1076 | 76FF | FF0E | 0C76 | 76FF | 6A0A | 6A00 |
| 0000175360 | 6A00 | FF00 | 0876 | 76FF | 9A06 | BD8D | EAE4 | 5DE9 |
| 0000175400 | 8D03 | FA46 | 5016 | 026A | 76FF | FF10 | 0E76 | 649A |
| 0000175420 | 77CF | 83E2 | 0AC4 | 4689 | 83F0 | F07E | 7500 | E903 |
| 0000175440 | 007E | 068E | 3A70 | 8326 | 5E3E | 00F0 | 0375 | 09E9 |
| 0000175460 | 8300 | DA7E | 74FE | E903 | 000F | 068E | 3A72 | 8326 |
| 0000175500 | 763E | 00F0 | 0375 | 51E9 | 8B00 | F046 | 4689 | FFDC |
| 0000175520 | E076 | 76FF | 8DDE | DC46 | 5016 | 76FF | FFEE | F876 |
| 0000175540 | 76FF | 8DF6 | E24E | 5116 | 4E8D | 16F2 | 8D51 | D64E |
| 0000175560 | 5116 | 681E | 09A2 | 5368 | FF05 | 1E36 | FF08 | 1C36 |
| 0000175600 | FF08 | 2236 | FF08 | 2036 | 9A08 | EB61 | 0000 | C483 |
| 0000175620 | 8B28 | DC46 | C7E9 | E902 | 0006 | 468B | E9F0 | 02BE |
| 0000175640 | 5EC4 | 260A | 7F80 | 0004 | 0375 | ABE9 | 8B00 | 0A46 |
| 0000175660 | 568B | 050C | 0004 | 5052 | 468B | 8BDA | 0C56 | 0405 |
| 0000175700 | 5200 | 9A50 | 423D | DF29 | C483 | 8908 | F046 | 7E83 |
| 0000175720 | 00F0 | 0375 | 7EE9 | 8E00 | 7006 | 263A | 3E83 | EA47 |
| 0000175740 | 7500 | E903 | 0009 | 7E83 | FEDA | 0374 | 0FE9 | 8E00 |
| 0000175760 | 7206 | 263A | 3E83 | EA74 | 7500 | E903 | 0051 | 468B |
| 0000176000 | 89F0 | DC46 | 76FF | FFE0 | DE76 | 468D | 16DC | FF50 |
| 0000176020 | EE76 | 76FF | FFF8 | F676 | 4E8D | 16E2 | 8D51 | F24E |
| 0000176040 | 5116 | 4E8D | 16D6 | 1E51 | A268 | 6809 | 0559 | 36FF |
| 0000176060 | 081E | 36FF | 081C | 36FF | 0822 | 36FF | 0820 | 6D9A |
| 0000176100 | 00F1 | 8300 | 28C4 | 468B | E9DC | 0212 | 06E9 | 8B00 |
| 0000176120 | F046 | 09E9 | E902 | 00AB | 76FF | FF10 | 0E76 | 5EC4 |
| 0000176140 | 260A | 77FF | 6A48 | 6A00 | 8B00 | 0A46 | 568B | 050C |
| 0000176160 | 0004 | 5052 | 529A | 11D6 | 89EF | F046 | 7E83 | 00F0 |
| 0000176200 | 0375 | 7EE9 | 8E00 | 7006 | 263A | 3E83 | F1EA | 7500 |
| 0000176220 | E903 | 0009 | 7E83 | FEDA | 0374 | 0FE9 | 8E00 | 7206 |
| 0000176240 | 263A | 3E83 | F202 | 7500 | E903 | 0051 | 468B | 89F0 |
| 0000176260 | DC46 | 76FF | FFE0 | DE76 | 468D | 16DC | FF50 | EE76 |
| 0000176300 | 76FF | FFF8 | F676 | 4E8D | 16E2 | 8D51 | F24E | 5116 |
| 0000176320 | 4E8D | 16D6 | 1E51 | A268 | 6809 | 0561 | 36FF | 081E |
| 0000176340 | 36FF | 081C | 36FF | 0822 | 36FF | 0820 | 4B9A | 00F2 |
| 0000176360 | 8300 | 28C4 | 468B | E9DC | 0164 | 06E9 | 8B00 | F046 |
| 0000176400 | 5BE9 | 6A01 | 6A30 | 8B00 | 0A46 | 568B | 050C | 0084 |
| 0000176420 | 5052 | 8E9A | AC3E | 83F1 | 08C4 | 106A | 006A | 468B |
| 0000176440 | 8B0A | 0C56 | 7405 | 5200 | 9A50 | 3E8E | E97B | C483 |
| 0000176460 | FF08 | 0876 | 76FF | FF06 | 0C76 | 76FF | 6A0A | 6A00 |
| 0000176500 | 6A00 | 6A00 | 6A00 | 6A00 | FF00 | FC76 | 76FF | 9AFA |
| 0000176520 | 1120 | E8CD | C483 | 8918 | F046 | 7E83 | 00F0 | 0375 |
| 0000176540 | 7EE9 | 8E00 | 7006 | 263A | 3E83 | F268 | 7500 | E903 |
| 0000176560 | 0009 | 7E83 | FEDA | 0374 | 0FE9 | 8E00 | 7206 | 263A |
| 0000176600 | 3E83 | F280 | 7500 | E903 | 0051 | 468B | 89F0 | DC46 |
| 0000176620 | 76FF | FFE0 | DE76 | 468D | 16DC | FF50 | EE76 | 76FF |
| 0000176640 | FFF8 | F676 | 4E8D | 16E2 | 8D51 | F24E | 5116 | 4E8D |
| 0000176660 | 16D6 | 1E51 | A268 | 6809 | 056E | 36FF | 081E | 36FF |
| 0000176700 | 081C | 36FF | 0822 | 36FF | 0820 | C89A | 00F2 | 8300 |
| 0000176720 | 28C4 | 468B | E9DC | 0086 | 06E9 | 8B00 | F046 | 7DE9 |
| 0000176740 | 8E00 | 7006 | 263A | 3E83 | ED10 | 7500 | E903 | 0009 |
| 0000176760 | 7E83 | FEDA | 0374 | 0FE9 | 8E00 | 7206 | 263A | 3E83 |
| 0000177000 | ED3C | 7500 | E903 | 0050 | 46C7 | 00DC | FF00 | E076 |
| 0000177020 | 76FF | 8DDE | DC46 | 5016 | 76FF | FFEE | F876 | 76FF |
| 0000177040 | 8DF6 | E24E | 5116 | 4E8D | 16F2 | 8D51 | D64E | 5116 |
| 0000177060 | 681E | 09A2 | 7068 | FF05 | 1E36 | FF08 | 1C36 | FF08 |
| 0000177100 | 2236 | FF08 | 2036 | 9A08 | EE05 | 0000 | C483 | 8B28 |
| 0000177120 | DC46 | 09E9 | E900 | 0006 | 00B8 | E900 | 0000 | 5E1F |
| 0000177140 | 835F | 02ED | E58B | 5D1F | CA4D | 130C | 0200 | F700 |

THU MAR 14 17:31:54 1991 DB_PI.DLL PAGE 70, LINE 4072

| | | | | | | | | |
|---|---|---|---|---|---|---|---|---|
| 0000177160 | 01F0 | 0000 | 0200 | 9100 | 02EF | 0000 | 0200 | D200 |
| 0000177200 | 03F1 | 0000 | 0300 | BE01 | 0106 | 0700 | 0200 | 9500 |
| 0000177220 | 04F1 | 0000 | 0300 | 2602 | 02ED | 8200 | 0200 | 4600 |
| 0000177240 | 05F0 | 0000 | 0500 | CB00 | 0182 | 0400 | 0289 | 2300 |
| 0000177260 | 0A77 | 0000 | 0200 | F000 | 0BEC | 0000 | 0500 | 0B00 |
| 0000177300 | 0106 | 9D00 | 0306 | 6F02 | 02ED | 3700 | 0500 | 0C02 |
| 0000177320 | 02F1 | 1100 | 0300 | BF02 | 02F0 | 4600 | 0300 | AB01 |
| 0000177340 | 0100 | 5500 | 0500 | 2402 | 02F1 | 1F00 | 0500 | D100 |
| 0000177360 | 0182 | BF00 | 0383 | B202 | 028A | 5600 | 0300 | B601 |
| 0000177400 | 010B | 5E00 | 0000 | 0000 | 0000 | 0000 | 0000 | 0000 |
| 0000177420 | 581E | 4590 | 8B55 | 1EEC | D88E | EC81 | 0028 | 5657 |
| 0000177440 | B81E | FFFF | D88E | 46C7 | C5FA | 8C09 | FC5E | 46C7 |
| 0000177460 | 01F4 | 2B01 | 89C0 | E646 | 4689 | 8EE4 | 7406 | 263A |
| 0000177500 | 3E83 | FFFF | 7500 | E903 | 001D | 36FF | 09DA | 36FF |
| 0000177520 | 09D8 | 468D | 16DC | 9A50 | FFFF | 0000 | C483 | 3D08 |
| 0000177540 | 0000 | 0374 | 0FE9 | 8E00 | 7606 | 263A | 3E83 | 00D9 |
| 0000177560 | 7500 | E903 | 003A | 681E | 09CC | 468D | 16E8 | 8D50 |
| 0000177600 | DC46 | 5016 | 468D | 16F6 | 6A50 | 1E6B | DC68 | FF09 |
| 0000177620 | D636 | FF09 | D436 | FF09 | DA36 | FF09 | D836 | 9A09 |
| 0000177640 | FFFF | 0000 | C483 | 891E | F646 | 5689 | E9F8 | 0008 |
| 0000177660 | C02B | 4689 | 89F8 | F646 | 7E83 | 000C | 0375 | 09E9 |
| 0000177700 | 8300 | 0A7E | 7400 | E903 | 007C | 068E | 3A74 | 8326 |
| 0000177720 | 6F3E | 0001 | 0375 | 09E9 | 8300 | E07E | 74FE | E903 |
| 0000177740 | 000F | 068E | 3A76 | 8326 | 873E | 0001 | 0375 | 4FE9 |
| 0000177760 | C700 | E246 | 0017 | 76FF | FFE6 | E476 | 468D | 16E2 |
| 0000200000 | FF50 | F476 | 76FF | FFFC | FA76 | 4E8D | 16E8 | 8D51 |
| 0000200020 | F64E | 5116 | 4E8D | 16DC | 1E51 | DC68 | 6A09 | FF70 |
| 0000200040 | D636 | FF09 | D436 | FF09 | DA36 | FF09 | D836 | 9A09 |
| 0000200060 | 01CE | 0000 | C483 | 8B28 | E246 | 5DE9 | E902 | 0006 |
| 0000200100 | 17B8 | E900 | 0254 | 468B | 2B0C | 05D2 | 0056 | D283 |
| 0000200120 | D100 | D1E0 | 03D2 | 0A46 | D283 | 8900 | D846 | 5689 |
| 0000200140 | 83DA | DA7E | 7301 | E903 | 008A | 0376 | 09E9 | 8300 |
| 0000200160 | D87E | 7300 | E903 | 007C | 068E | 3A74 | 8326 | 113E |
| 0000200200 | 0002 | 0375 | 09E9 | 8300 | E07E | 74FE | E903 | 000F |
| 0000200220 | 068E | 3A76 | 8326 | 293E | 0002 | 0375 | 4FE9 | C700 |
| 0000200240 | E246 | 0013 | 76FF | FFE6 | E476 | 468D | 16E2 | FF50 |
| 0000200260 | F476 | 76FF | FFFC | FA76 | 4E8D | 16E8 | 8D51 | F64E |
| 0000200300 | 5116 | 4E8D | 16DC | 1E51 | DC68 | 6A09 | FF78 | D636 |
| 0000200320 | FF09 | D436 | FF09 | DA36 | FF09 | D836 | 9A09 | 0270 |
| 0000200340 | 0000 | C483 | 8B28 | E246 | AFE9 | E901 | 0006 | 13B8 |
| 0000200360 | E900 | 01A6 | 76FF | 6AD8 | 9A01 | 3376 | FFFF | C483 |
| 0000200400 | C404 | 065E | 8926 | 2607 | 5789 | C402 | 065E | 8B26 |
| 0000200420 | 0247 | 0B26 | 7407 | E903 | 007C | 068E | 3A74 | 8326 |
| 0000200440 | 143E | 0003 | 0375 | 09E9 | 8300 | E07E | 74FE | E903 |
| 0000200460 | 000F | 068E | 3A76 | 8326 | 2C3E | 0003 | 0375 | 4FE9 |
| 0000200500 | C700 | E246 | 0007 | 76FF | FFE6 | E476 | 468D | 16E2 |
| 0000200520 | FF50 | F476 | 76FF | FFFC | FA76 | 4E8D | 16E8 | 8D51 |
| 0000200540 | F64E | 5116 | 4E8D | 16DC | 1E51 | DC68 | 6A09 | FF7D |
| 0000200560 | D636 | FF09 | D436 | FF09 | DA36 | FF09 | D836 | 9A09 |
| 0000200600 | 0374 | 0000 | C483 | 8B28 | E246 | 0DE9 | E901 | 0006 |
| 0000200620 | 07B8 | E900 | 0104 | 468B | C40C | 065E | C426 | 261F |
| 0000200640 | 4789 | 2644 | 47C7 | 0046 | 8B00 | 0A46 | 5EC4 | 2606 |
| 0000200660 | 1FC4 | 8926 | 6647 | 5EC4 | 2606 | 078B | 8B26 | 0257 |
| 0000200700 | AC05 | C400 | 065E | C426 | 261F | 4789 | 265C | 5789 |
| 0000200720 | C45E | 065E | C426 | 261F | 478B | 265C | 578B | C45E |
| 0000200740 | 065E | C426 | 261F | 4703 | C444 | 065E | C426 | 261F |
| 0000200760 | 4789 | 2660 | 5789 | C462 | 065E | C426 | 261F | 478B |
| 0000201000 | 2660 | 578B | C462 | 065E | C426 | 261F | 4703 | C444 |
| 0000201020 | 065E | C426 | 261F | 4789 | 2668 | 5789 | 8E6A | 7406 |

THU MAR 14 17:31:54 1991 DB_PI.DLL PAGE 71, LINE 4131

| | | | | | | | | |
|---|---|---|---|---|---|---|---|---|
| 0000201040 | 263A | 3E83 | 0032 | 7500 | E903 | 0009 | 7E83 | FEE0 |
| 0000201060 | 0374 | 0FE9 | 8E00 | 7606 | 263A | 3E83 | FFFF | 7500 |
| 0000201100 | E903 | 0050 | 46C7 | 00E2 | FF00 | E676 | 76FF | 8DE4 |
| 0000201120 | E246 | 5016 | 76FF | FFF4 | FC76 | 76FF | 8DFA | E84E |
| 0000201140 | 5116 | 4E8D | 16F6 | 8D51 | DC4E | 5116 | 681E | 09DC |
| 0000201160 | 8668 | FF00 | D636 | FF09 | D436 | FF09 | DA36 | FF09 |
| 0000201200 | D836 | 9A09 | FFFF | 0000 | C483 | 8B28 | E246 | 09E9 |
| 0000201220 | E900 | 0006 | 00B8 | E900 | 0000 | 5E1F | 835F | 02ED |
| 0000201240 | E58B | 5D1F | CA4D | 0008 | 581E | 4590 | 8B55 | 1EEC |
| 0000201260 | D88E | EC81 | 0024 | 5657 | B81E | 0012 | D88E | 46C7 |
| 0000201300 | EAFA | 8C09 | FC5E | 46C7 | 01F4 | 2B01 | 89C0 | E646 |
| 0000201320 | 4689 | 8EE4 | 7406 | 263A | 3E83 | 0461 | 7500 | E903 |
| 0000201340 | 001D | 36FF | 09DA | 36FF | 09D8 | 468D | 16DC | 9A50 |
| 0000201360 | 0048 | 0000 | C483 | 3D08 | 0000 | 0374 | 0FE9 | 8E00 |
| 0000201400 | 7606 | 263A | 3E83 | 0479 | 7500 | E903 | 003B | 681E |
| 0000201420 | 09F1 | 468D | 16E8 | 8D50 | DC46 | 5016 | 468D | 16F6 |
| 0000201440 | 6850 | 00A2 | 681E | 09F8 | 36FF | 09D6 | 36FF | 09D4 |
| 0000201460 | 36FF | 09DA | 36FF | 09D8 | 909A | 0000 | 8300 | 1EC4 |
| 0000201500 | 4689 | 89F6 | F856 | 08E9 | 2B00 | 89C0 | F846 | 4689 |
| 0000201520 | 8BF6 | 0846 | 460B | 7506 | E903 | 000E | 76FF | FF08 |
| 0000201540 | 0676 | 489A | EC24 | 8301 | 04C4 | 068E | 3A74 | 8326 |
| 0000201560 | C13E | 0000 | 0375 | 09E9 | 8300 | E07E | 74FE | E903 |
| 0000201600 | 000F | 068E | 3A76 | 8326 | 5E3E | 0000 | 0375 | 50E9 |
| 0000201620 | C700 | E246 | 0000 | 76FF | FFE6 | E476 | 468D | 16E2 |
| 0000201640 | FF50 | F476 | 76FF | FFFC | FA76 | 4E8D | 16E8 | 8D51 |
| 0000201660 | F64E | 5116 | 4E8D | 16DC | 1E51 | F868 | 6809 | 00A7 |
| 0000201700 | 36FF | 09D6 | 36FF | 09D4 | 36FF | 09DA | 36FF | 09D8 |
| 0000201720 | 209A | 0001 | 8300 | 28C4 | 468B | E9E2 | 0009 | 06E9 |
| 0000201740 | B800 | 0000 | 00E9 | 1F00 | 5F5E | ED83 | 8B02 | 1FE5 |
| 0000201760 | 4D5D | 04CA | 1E00 | 9058 | 5545 | EC8B | 8E1E | 81D8 |
| 0000202000 | 2AEC | 5700 | 1E56 | AAB8 | 8E03 | C7D8 | FA46 | 0A05 |
| 0000202020 | 5E8C | C7FC | EE46 | 0101 | C02B | 4689 | 89E0 | DE46 |
| 0000202040 | 068E | 3A74 | 8326 | A03E | 0005 | 0375 | 1DE9 | FF00 |
| 0000202060 | DA36 | FF09 | D836 | 8D09 | D646 | 5016 | E09A | 0003 |
| 0000202100 | 8300 | 08C4 | 003D | 7400 | E903 | 000F | 068E | 3A76 |
| 0000202120 | 8326 | B83E | 0005 | 0375 | 3BE9 | 1E00 | 0C68 | 8D0A |
| 0000202140 | E246 | 5016 | 468D | 16D6 | 8D50 | F646 | 5016 | D268 |
| 0000202160 | 1E00 | 1468 | FF0A | D636 | FF09 | D436 | FF09 | DA36 |
| 0000202200 | FF09 | D836 | 9A09 | 0429 | 0000 | C483 | 891E | F646 |
| 0000202220 | 5689 | E9F8 | 0008 | C02B | 4689 | 89F8 | F646 | 468B |
| 0000202240 | 0B0A | 0846 | 0374 | 7DE9 | 8E00 | 7406 | 263A | 3E83 |
| 0000202260 | 0630 | 7500 | E903 | 0009 | 7E83 | FEDA | 0374 | 0FE9 |
| 0000202300 | 8E00 | 7606 | 263A | 3E83 | 0648 | 7500 | E903 | 0050 |
| 0000202320 | 46C7 | 17DC | FF00 | E076 | 76FF | 8DDE | DC46 | 5016 |
| 0000202340 | 76FF | FFEE | FC76 | 76FF | 8DFA | E24E | 5116 | 4E8D |
| 0000202360 | 16F6 | 8D51 | D64E | 5116 | 681E | 0A14 | D968 | FF00 |
| 0000202400 | D636 | FF09 | D436 | FF09 | DA36 | FF09 | D836 | 9A09 |
| 0000202420 | 0696 | 0000 | C483 | 8B26 | DC46 | 68E9 | E903 | 0006 |
| 0000202440 | 17B8 | E900 | 035F | 7E81 | D20C | 7400 | E903 | 0009 |
| 0000202460 | 7E83 | 000E | 0375 | 7DE9 | 8E00 | 7406 | 263A | 3E83 |
| 0000202500 | 06C8 | 7500 | E903 | 0009 | 7E83 | FEDA | 0374 | 0FE9 |
| 0000202520 | 8E00 | 7606 | 263A | 3E83 | 06E0 | 7500 | E903 | 0050 |
| 0000202540 | 46C7 | 97DC | FF01 | E076 | 76FF | 8DDE | DC46 | 5016 |
| 0000202560 | 76FF | FFEE | FC76 | 76FF | 8DFA | E24E | 5116 | 4E8D |
| 0000202600 | 16F6 | 8D51 | D64E | 5116 | 681E | 0A14 | DC68 | FF00 |
| 0000202620 | D636 | FF09 | D436 | FF09 | DA36 | FF09 | D836 | 9A09 |
| 0000202640 | 0729 | 0000 | C483 | 8B28 | DC46 | D8E9 | E902 | 0006 |
| 0000202660 | 97B8 | E901 | 02CF | 468D | 16F0 | 6A50 | 9A02 | 2B4E |
| 0000202700 | FFFF | C483 | 8906 | F446 | 7E83 | 00F4 | 0375 | 7EE9 |

THU MAR 14 17:31:54 1991 DB_PI.DLL PAGE 72, LINE 4190

| | | | | | | | | |
|---|---|---|---|---|---|---|---|---|
| 0000202720 | 8E00 | 7406 | 263A | 3E83 | 0770 | 7500 | E903 | 0009 |
| 0000202740 | 7E83 | FEDA | 0374 | 0FE9 | 8E00 | 7606 | 263A | 3E83 |
| 0000202760 | 0788 | 7500 | E903 | 0051 | 468B | 89F4 | DC46 | 76FF |
| 0000203000 | FFE0 | DE76 | 468D | 16DC | FF50 | EE76 | 76FF | FFFC |
| 0000203020 | FA76 | 4E8D | 16E2 | 8D51 | F64E | 5116 | 4E8D | 16D6 |
| 0000203040 | 1E51 | 1468 | 680A | 00E0 | 36FF | 09D6 | 36FF | 09D4 |
| 0000203060 | 36FF | 09DA | 36FF | 09D8 | D19A | 0007 | 8300 | 28C4 |
| 0000203100 | 468B | E9DC | 023F | 06E9 | 8B00 | F446 | 36E9 | 8B02 |
| 0000203120 | 0846 | 568B | 050A | 0004 | 5052 | 468B | 8B08 | 0A56 |
| 0000203140 | 0405 | 5200 | 9A50 | 423D | FFFF | C483 | 8908 | F446 |
| 0000203160 | 7E83 | 00F4 | 0375 | 7EE9 | 8E00 | 7406 | 263A | 3E83 |
| 0000203200 | 0881 | 7500 | E903 | 0009 | 7E83 | FEDA | 0374 | 0FE9 |
| 0000203220 | 8E00 | 7606 | 263A | 3E83 | 0899 | 7500 | E903 | 0051 |
| 0000203240 | 468B | 89F4 | DC46 | 76FF | FFE0 | DE76 | 468D | 16DC |
| 0000203260 | FF50 | EE76 | 76FF | FFFC | FA76 | 4E8D | 16E2 | 8D51 |
| 0000203300 | F64E | 5116 | 4E8D | 16D6 | 1E51 | 1468 | 680A | 00E5 |
| 0000203320 | 36FF | 09D6 | 36FF | 09D4 | 36FF | 09DA | 36FF | 09D8 |
| 0000203340 | C19A | 0004 | 8300 | 28C4 | 468B | E9DC | 0197 | 06E9 |
| 0000203360 | 8B00 | F446 | 8EE9 | 6A01 | 6A00 | 9A00 | 3908 | 081C |
| 0000203400 | C483 | C404 | 085E | 8926 | 2447 | 8926 | 2657 | 5EC4 |
| 0000203420 | 2B08 | 26C0 | 4789 | 2602 | 0789 | 406A | 006A | 468B |
| 0000203440 | 8B08 | 0A56 | 6C05 | 5200 | 9A50 | 3E8E | 0833 | C483 |
| 0000203460 | 6A08 | 6A10 | 8B00 | 0846 | 568B | 050A | 004C | 5052 |
| 0000203500 | 8E9A | 693E | 8308 | 08C4 | 76FF | 8B06 | 0846 | 568B |
| 0000203520 | 050A | 0004 | 5052 | 5EC4 | 2608 | 478B | 0544 | 0056 |
| 0000203540 | E0D1 | 5EC4 | 2608 | 4703 | 5066 | 76FF | FF0A | 0876 |
| 0000203560 | 76FF | FFF2 | F076 | 499A | 55D0 | 8304 | 10C4 | 4689 |
| 0000203600 | 83F4 | F47E | 7500 | E903 | 007E | 068E | 3A74 | 8326 |
| 0000203620 | CA3E | 0003 | 0375 | 09E9 | 8300 | DA7E | 74FE | E903 |
| 0000203640 | 000F | 068E | 3A76 | 8326 | F63E | 0003 | 0375 | 51E9 |
| 0000203660 | 8B00 | F446 | 4689 | FFDC | E076 | 76FF | 8DDE | DC46 |
| 0000203700 | 5016 | 76FF | FFEE | FC76 | 76FF | 8DFA | E24E | 5116 |
| 0000203720 | 4E8D | 16F6 | 8D51 | D64E | 5116 | 681E | 0A14 | F668 |
| 0000203740 | FF00 | D636 | FF09 | D436 | FF09 | DA36 | FF09 | D836 |
| 0000203760 | 9A09 | 095F | 0000 | C483 | 8B28 | DC46 | 86E9 | E900 |
| 0000204000 | 0006 | 468B | E9F4 | 007D | 068E | 3A74 | 8326 | 173E |
| 0000204020 | 0005 | 0375 | 09E9 | 8300 | DA7E | 74FE | E903 | 000F |
| 0000204040 | 068E | 3A76 | 8326 | 433E | 0005 | 0375 | 50E9 | C700 |
| 0000204060 | DC46 | 0000 | 76FF | FFE0 | DE76 | 468D | 16DC | FF50 |
| 0000204100 | EE76 | 76FF | FFFC | FA76 | 4E8D | 16E2 | 8D51 | F64E |
| 0000204120 | 5116 | 4E8D | 16D6 | 1E51 | 1468 | 680A | 00F8 | 36FF |
| 0000204140 | 09D6 | 36FF | 09D4 | 36FF | 09DA | 36FF | 09D8 | 009A |
| 0000204160 | 0006 | 8300 | 28C4 | 468B | E9DC | 0009 | 06E9 | B800 |
| 0000204200 | 0000 | 00E9 | 1F00 | 5F5E | ED83 | 8B02 | 1FE5 | 4D5D |
| 0000204220 | 0ACA | 1E00 | 9058 | 5545 | EC8B | 8E1E | 81D8 | 4AEC |
| 0000204240 | 5700 | 1E56 | F7B8 | 8E04 | C7D8 | DA46 | 0A20 | 5E8C |
| 0000204260 | C7DC | CE46 | 0101 | C02B | 4689 | 89C0 | BE46 | 068E |
| 0000204300 | 3A74 | 8326 | 4A3E | 000A | 0375 | 1DE9 | FF00 | DA36 |
| 0000204320 | FF09 | D836 | 8D09 | B646 | 5016 | 2D9A | 0005 | 8300 |
| 0000204340 | 08C4 | 003D | 7400 | E903 | 000F | 068E | 3A76 | 8326 |
| 0000204360 | 623E | 000A | 0375 | 3BE9 | 1E00 | 2768 | 8D0A | C246 |
| 0000204400 | 5016 | 468D | 16B6 | 8D50 | D646 | 5016 | 1A68 | 1E01 |
| 0000204420 | 2E68 | FF0A | D636 | FF09 | D436 | FF09 | DA36 | FF09 |
| 0000204440 | D836 | 9A09 | 0576 | 0000 | C483 | 891E | D646 | 5689 |
| 0000204460 | E9D8 | 0008 | C02B | 4689 | 89D8 | D646 | 468B | 0B08 |
| 0000204500 | 0646 | 0375 | 0CE9 | C400 | 065E | 8026 | 003F | 0374 |
| 0000204520 | 7DE9 | 8E00 | 7406 | 263A | 3E83 | 0ADA | 7500 | E903 |
| 0000204540 | 0009 | 7E83 | FEBA | 0374 | 0FE9 | 8E00 | 7606 | 263A |
| 0000204560 | 3E83 | 0AF2 | 7500 | E903 | 0050 | 46C7 | 17BC | FF00 |

THU MAR 14 17:31:54 1991 DB_PI.DLL PAGE 73, LINE 4249

| | | | | | | | | |
|---|---|---|---|---|---|---|---|---|
| 0000204600 | C076 | 76FF | 8DBE | BC46 | 5016 | 76FF | FFCE | DC76 |
| 0000204620 | 76FF | 8DDA | C24E | 5116 | 4E8D | 16D6 | 8D51 | B64E |
| 0000204640 | 5116 | 681E | 0A2E | 2268 | FF01 | D636 | FF09 | D436 |
| 0000204660 | FF09 | DA36 | FF09 | D836 | 9A09 | 0B3A | 0000 | C483 |
| 0000204700 | 8B28 | BC46 | 65E9 | E902 | 0006 | 17B8 | E900 | 025C |
| 0000204720 | 7E81 | D20A | 7400 | E903 | 0009 | 7E83 | 000C | 0375 |
| 0000204740 | 7DE9 | 8E00 | 7406 | 263A | 3E83 | 0B72 | 7500 | E903 |
| 0000204760 | 0009 | 7E83 | FEBA | 0374 | 0FE9 | 8E00 | 7606 | 263A |
| 0000205000 | 3E83 | 0B8A | 7500 | E903 | 0050 | 46C7 | 97BC | FF01 |
| 0000205020 | C076 | 76FF | 8DBE | BC46 | 5016 | 76FF | FFCE | DC76 |
| 0000205040 | 76FF | 8DDA | C24E | 5116 | 4E8D | 16D6 | 8D51 | B64E |
| 0000205060 | 5116 | 681E | 0A2E | 2568 | FF01 | D636 | FF09 | D436 |
| 0000205100 | FF09 | DA36 | FF09 | D836 | 9A09 | 0BD3 | 0000 | C483 |
| 0000205120 | 8B28 | BC46 | D5E9 | E901 | 0006 | 97B8 | E901 | 01CC |
| 0000205140 | 468D | 16D0 | 6A50 | 9A02 | 2B4E | 06B0 | C483 | 8906 |
| 0000205160 | D446 | 7E83 | 00D4 | 0375 | 7EE9 | 8E00 | 7406 | 263A |
| 0000205200 | 3E83 | 0C28 | 7500 | E903 | 0009 | 7E83 | FEBA | 0374 |
| 0000205220 | 0FE9 | 8E00 | 7606 | 263A | 3E83 | 0C40 | 7500 | E903 |
| 0000205240 | 0051 | 468B | 89D4 | BC46 | 76FF | FFC0 | BE76 | 468D |
| 0000205260 | 16BC | FF50 | CE76 | 76FF | FFDC | DA76 | 4E8D | 16C2 |
| 0000205300 | 8D51 | D64E | 5116 | 4E8D | 16B6 | 1E51 | 2E68 | 680A |
| 0000205320 | 0129 | 36FF | 09D6 | 36FF | 09D4 | 36FF | 09DA | 36FF |
| 0000205340 | 09D8 | 899A | 000C | 8300 | 28C4 | 468B | E9BC | 013C |
| 0000205360 | 06E9 | 8B00 | D446 | 33E9 | 6A01 | FF1F | 0876 | 76FF |
| 0000205400 | 8D06 | DE46 | 5016 | 049A | 1028 | 830C | 0AC4 | 46C6 |
| 0000205420 | 00FD | 468D | 16DE | FF50 | D276 | 76FF | 9AD0 | D3E1 |
| 0000205440 | 07EE | C483 | 8908 | D446 | 7E83 | 00D4 | 0375 | 7EE9 |
| 0000205460 | 8E00 | 7406 | 263A | 3E83 | 0CA6 | 7500 | E903 | 0009 |
| 0000205500 | 7E83 | FEBA | 0374 | 0FE9 | 8E00 | 7606 | 263A | 3E83 |
| 0000205520 | 0CBE | 7500 | E903 | 0051 | 468B | 89D4 | BC46 | 76FF |
| 0000205540 | FFC0 | BE76 | 468D | 16BC | FF50 | CE76 | 76FF | FFDC |
| 0000205560 | DA76 | 4E8D | 16C2 | 8D51 | D64E | 5116 | 4E8D | 16B6 |
| 0000205600 | 1E51 | 2E68 | 680A | 0130 | 36FF | 09D6 | 36FF | 09D4 |
| 0000205620 | 36FF | 09DA | 36FF | 09D8 | 069A | 000D | 8300 | 28C4 |
| 0000205640 | 468B | E9BC | 0086 | 06E9 | 8B00 | D446 | 7DE9 | 8E00 |
| 0000205660 | 7406 | 263A | 3E83 | 08FF | 7500 | E903 | 0009 | 7E83 |
| 0000205700 | FEBA | 0374 | 0FE9 | 8E00 | 7606 | 263A | 3E83 | 0917 |
| 0000205720 | 7500 | E903 | 0050 | 46C7 | 00BC | FF00 | C076 | 76FF |
| 0000205740 | 8DBE | BC46 | 5016 | 76FF | FFCE | DC76 | 76FF | 8DDA |
| 0000205760 | C24E | 5116 | 4E8D | 16D6 | 8D51 | B64E | 5116 | 681E |
| 0000206000 | 0A2E | 3268 | FF01 | D636 | FF09 | D436 | FF09 | DA36 |
| 0000206020 | FF09 | D836 | 9A09 | 08E2 | 0000 | C483 | 8B28 | BC46 |
| 0000206040 | 09E9 | E900 | 0006 | 00B8 | E900 | 0000 | 5E1F | 835F |
| 0000206060 | 02ED | E58B | 5D1F | CA4D | 0008 | 581E | 4590 | 8B55 |
| 0000206100 | 1EEC | D88E | EC81 | 0026 | 5657 | 468B | 0B0C | 0A46 |
| 0000206120 | 0375 | 0CE9 | C400 | 0A5E | 8026 | 003F | 0374 | 06E9 |
| 0000206140 | B800 | 0017 | B0E9 | 8100 | 067E | 00D2 | 0374 | 09E9 |
| 0000206160 | 8300 | 087E | 7500 | E903 | 0006 | 97B8 | E901 | 0097 |
| 0000206200 | 76FF | FF10 | 0E76 | 006A | 4E9A | 5A2B | 830B | 06C4 |
| 0000206220 | 4689 | 83DC | DC7E | 7500 | E903 | 0019 | 7E81 | 9DDC |
| 0000206240 | 7401 | E903 | 0009 | ABB8 | E901 | 006B | 06E9 | 8B00 |
| 0000206260 | DC46 | 62E9 | 6A00 | FF1F | 0C76 | 76FF | 8D0A | DE46 |
| 0000206300 | 5016 | 049A | E028 | 830D | 0AC4 | 46C6 | 00FD | 46C7 |
| 0000206320 | ACDA | FF00 | 1476 | 76FF | 8D12 | DA46 | 5016 | 468D |
| 0000206340 | 16DE | C450 | 0E5E | FF26 | 0277 | FF26 | 9A37 | D6BE |
| 0000206360 | 0BF9 | C483 | 8910 | DC46 | 7E83 | 00DC | 0375 | 10E9 |
| 0000206400 | 8100 | DC7E | 01FA | 0375 | 06E9 | 8B00 | DC46 | 06E9 |
| 0000206420 | B800 | 0000 | 00E9 | 5E00 | 835F | 02ED | E58B | 5D1F |
| 0000206440 | CB4D | 581E | 4590 | 8B55 | 1EEC | D88E | EC81 | 00D8 |

THU MAR 14 17:31:54 1991 DB_PI.DLL PAGE 74, LINE 4308

| | | | | | | | | |
|---|---|---|---|---|---|---|---|---|
| 0000206460 | 5657 | B81E | 0995 | D88E | 46C7 | 3DFA | 8C0A | FC5E |
| 0000206500 | 86C7 | FF42 | 0101 | C02B | 8689 | FF32 | 8689 | FF30 |
| 0000206520 | 068E | 3A74 | 8326 | D33E | 000E | 0375 | 1EE9 | FF00 |
| 0000206540 | DA36 | FF09 | D836 | 8D09 | 2886 | 16FF | 9A50 | 09CB |
| 0000206560 | 0000 | C483 | 3D08 | 0000 | 0374 | 0FE9 | 8E00 | 7606 |
| 0000206600 | 263A | 3E83 | 0EEC | 7500 | E903 | 003D | 681E | 0A44 |
| 0000206620 | 868D | FF36 | 5016 | 868D | FF28 | 5016 | 468D | 16F6 |
| 0000206640 | 6850 | 018A | 681E | 0A4C | 36FF | 09D6 | 36FF | 09D4 |
| 0000206660 | 36FF | 09DA | 35FF | 09D8 | 149A | 000A | 8300 | 1EC4 |
| 0000206700 | 4689 | 89F6 | F856 | 08E9 | 2B00 | 89C0 | F846 | 4689 |
| 0000206720 | 8BF6 | 0846 | 460B | 7406 | E903 | 0086 | 068E | 3A74 |
| 0000206740 | 8326 | 933E | 000F | 0375 | DAE9 | 8300 | 2CBE | FEFF |
| 0000206760 | 0374 | 0FE9 | 8E00 | 7606 | 263A | 3E83 | 0FAC | 7500 |
| 0000207000 | E903 | 0058 | 86C7 | FF2E | 0017 | B6FF | FF32 | B6FF |
| 0000207020 | FF30 | 868D | FF2E | 5016 | B6FF | FF42 | 76FF | FFFC |
| 0000207040 | FA76 | 8E8D | FF36 | 5116 | 4E8D | 16F6 | 8D51 | 288E |
| 0000207060 | 16FF | 1E51 | 4C68 | 680A | 0194 | 36FF | 09D6 | 36FF |
| 0000207100 | 09D4 | 36FF | 09DA | 36FF | 09D8 | FD9A | 000F | 8300 |
| 0000207120 | 28C4 | 868B | FF2E | 42E9 | E903 | 0006 | 17B8 | E900 |
| 0000207140 | 0339 | 5EC4 | 2B06 | 26C0 | 4789 | 2602 | 0789 | 868D |
| 0000207160 | FF4A | 5016 | 868D | FF44 | 5016 | 76FF | FF0C | 0A76 |
| 0000207200 | 76FF | FF10 | 0E76 | 2A9A | FF0D | 83FF | 10C4 | 8689 |
| 0000207220 | FF48 | BE83 | FF48 | 7500 | E903 | 0089 | 068E | 3A74 |
| 0000207240 | 8326 | 503E | 0010 | 0375 | 0AE9 | 8300 | 2CBE | FEFF |
| 0000207260 | 0374 | 0FE9 | 8E0D | 7606 | 263A | 3E83 | 1069 | 7500 |
| 0000207300 | E903 | 005A | 868B | FF48 | 8689 | FF2E | B6FF | FF32 |
| 0000207320 | B6FF | FF30 | 868D | FF2E | 5016 | B6FF | FF42 | 76FF |
| 0000207340 | FFFC | FA76 | 8E8D | FF36 | 5116 | 4E8D | 16F6 | 8D51 |
| 0000207360 | 288E | 16FF | 1E51 | 4C68 | 680A | 019B | 36FF | 09D6 |
| 0000207400 | 36FF | 09D4 | 36FF | 09DA | 36FF | 09D8 | B89A | 0010 |
| 0000207420 | 8300 | 28C4 | 868B | FF2E | 80E9 | E902 | 0007 | 868B |
| 0000207440 | FF48 | 76E9 | 8B02 | 8E46 | 5605 | D100 | 03E0 | B046 |
| 0000207460 | 8689 | FF34 | B6FF | FF34 | 3E9A | F024 | 8310 | 02C4 |
| 0000207500 | 5EC4 | 2606 | 0789 | 8926 | 0257 | 5EC4 | 2606 | 478B |
| 0000207520 | 2602 | 070B | 0374 | 86E9 | 8E00 | 7406 | 263A | 3E83 |
| 0000207540 | 111C | 7500 | E903 | 000A | BE83 | FF2C | 74FE | E903 |
| 0000207560 | 000F | 068E | 3A76 | 8326 | 353E | 0011 | 0375 | 58E9 |
| 0000207600 | C700 | 2E86 | 07FF | FF00 | 32B6 | FFFF | 30B6 | 8DFF |
| 0000207620 | 2E86 | 16FF | FF50 | 42B6 | FFFF | FC76 | 76FF | 8DFA |
| 0000207640 | 368E | 16FF | 8D51 | F64E | 5116 | 8E8D | FF28 | 5116 |
| 0000207660 | 681E | 0A4C | A368 | FF01 | D636 | FF09 | D436 | FF09 |
| 0000207700 | DA36 | FF09 | D836 | 9A09 | 1186 | 0000 | C483 | 8B28 |
| 0000207720 | 2E86 | E9FF | 01C5 | 06E9 | B800 | 0007 | BCE9 | C401 |
| 0000207740 | 065E | FF26 | 0277 | FF26 | 8D37 | 3486 | 16FF | 8D50 |
| 0000207760 | 4E86 | 16FF | FF50 | 46B6 | FFFF | 44B6 | 9AFF | D6BE |
| 0000210000 | 1110 | C483 | 8910 | 4886 | 83FF | 48BE | 00FF | 0375 |
| 0000210020 | 9BE9 | C400 | 065E | FF26 | 0277 | FF26 | 9A37 | 2448 |
| 0000210040 | 0DB5 | C483 | 8E04 | 7406 | 263A | 3E83 | 09B5 | 7500 |
| 0000210060 | E903 | 000A | BE83 | FF2C | 74FE | E903 | 000F | 068E |
| 0000210100 | 3A76 | 8326 | E13E | 0009 | 0375 | 5AE9 | 8B00 | 4886 |
| 0000210120 | 89FF | 2E86 | FFFF | 32B6 | FFFF | 30B6 | 8DFF | 2E86 |
| 0000210140 | 16FF | FF50 | 42B6 | FFFF | FC76 | 76FF | 8DFA | 368E |
| 0000210160 | 16FF | 8D51 | F64E | 5116 | 8E8D | FF28 | 5116 | 681E |
| 0000210200 | 0A4C | AB68 | FF01 | D636 | FF09 | D436 | FF09 | DA36 |
| 0000210220 | FF09 | D836 | 9A09 | DAAA | 0000 | C483 | 8B28 | 2E86 |
| 0000210240 | E9FF | 00F7 | 07E9 | 8B00 | 4886 | E9FF | 00ED | 5EC4 |
| 0000210260 | 2606 | 078B | 8B26 | 0257 | AC05 | C400 | 065E | C426 |
| 0000210300 | 261F | 4789 | 265C | 5789 | C45E | 065E | C426 | 261F |
| 0000210320 | 478B | 265C | 578B | C45E | 065E | C426 | 261F | 4703 |

THU MAR 14 17:31:54 1991 DB_PI.DLL PAGE 75, LINE 4367

| | | | | | | | | |
|---|---|---|---|---|---|---|---|---|
| 0000210340 | C444 | 065E | C426 | 261F | 4789 | 2660 | 5789 | C462 |
| 0000210360 | 065E | C426 | 261F | 478B | 2660 | 578B | C462 | 065E |
| 0000210400 | C426 | 261F | 4703 | C444 | 065E | C426 | 261F | 4789 |
| 0000210420 | 2668 | 5789 | 8E6A | 7406 | 263A | 3E83 | 0E47 | 7500 |
| 0000210440 | E903 | 000A | BE83 | FF2C | 74FE | E903 | 000F | 068E |
| 0000210460 | 3A76 | 8326 | 743E | 000E | 0375 | 58E9 | C700 | 2E86 |
| 0000210500 | 00FF | FF00 | 32B6 | FFFF | 30B6 | 8DFF | 2E86 | 16FF |
| 0000210520 | FF50 | 42B6 | FFFF | FC76 | 76FF | 8DFA | 368E | 16FF |
| 0000210540 | 8D51 | F64E | 5116 | 8E8D | FF28 | 5116 | 681E | 0A4C |
| 0000210560 | B168 | FF01 | D636 | FF09 | D436 | FF09 | DA36 | FF09 |
| 0000210600 | D836 | 9A09 | 0F3B | 0000 | C483 | 8B28 | 2E86 | E9FF |
| 0000210620 | 0009 | 06E9 | B800 | 0000 | 00E9 | 1F00 | 5F5E | ED83 |
| 0000210640 | 8B0Z | 1FE5 | 4D5D | 0CCA | 1E00 | 9058 | 5545 | EC8B |
| 0000210660 | 8E1E | 81D8 | 2AEC | 5700 | 1E56 | 24B8 | 8E0E | C7D8 |
| 0000210700 | FA46 | 0A58 | 5E8C | C7FC | EE46 | 0101 | C02B | 4689 |
| 0000210720 | 89E0 | DE46 | 068E | 3A74 | 8326 | 543E | 0013 | 0375 |
| 0000210740 | IDE9 | FF00 | DA36 | FF09 | D836 | 8D09 | D646 | 5016 |
| 0000210760 | 5E9A | 000E | 8300 | 08C4 | 003D | 7400 | E903 | 000F |
| 0000211000 | 068E | 3A76 | 8326 | 6C3E | 0013 | 0375 | 3BE9 | 1E00 |
| 0000211020 | 5F68 | 8D0A | E246 | 5016 | 468D | 16D6 | 8D50 | F646 |
| 0000211040 | 5016 | D768 | 1E01 | 6668 | FF0A | D636 | FF09 | D436 |
| 0000211060 | FF09 | DA36 | FF09 | D836 | 9A09 | DEA9 | 0000 | C483 |
| 0000211100 | 891E | F646 | 5689 | E9F8 | 0008 | C02B | 4689 | 89F8 |
| 0000211120 | F646 | 468B | 0B08 | 0646 | 0374 | 7DE9 | 8E00 | 7406 |
| 0000211140 | 263A | 3E83 | 13FC | 7500 | E903 | 0009 | 7E83 | FEDA |
| 0000211160 | 0374 | 0FE9 | 8E00 | 7606 | 263A | 3E83 | 1414 | 7500 |
| 0000211200 | E903 | 0050 | 46C7 | 17DC | FF00 | E076 | 76FF | 8DDE |
| 0000211220 | DC46 | 5016 | 76FF | FFEE | FC76 | 76FF | 8DFA | E24E |
| 0000211240 | 5116 | 4E8D | 16F6 | 8D51 | D64E | 5116 | 681E | 0A66 |
| 0000211260 | DE68 | FF01 | D636 | FF09 | D436 | FF09 | DA36 | FF09 |
| 0000211300 | D836 | 9A09 | 145D | 0000 | C483 | 8B28 | DC46 | 2FE9 |
| 0000211320 | E901 | 0006 | 17B8 | E900 | 0126 | 76FF | FF08 | 0676 |
| 0000211340 | 468D | 16F0 | FF50 | 0C76 | 76FF | FF0A | 1076 | 76FF |
| 0000211360 | 9A0E | 0D2A | 0F79 | C483 | 8910 | F446 | 7E83 | 00F4 |
| 0000211400 | 0375 | 7EE9 | 8E00 | 7406 | 263A | 3E83 | 147A | 7500 |
| 0000211420 | E903 | 0009 | 7E83 | FEDA | 0374 | 0FE9 | 8E00 | 7606 |
| 0000211440 | 263A | 3E83 | 1492 | 7500 | E903 | 0051 | 468B | 89F4 |
| 0000211460 | DC46 | 76FF | FFE0 | DE76 | 468D | 16DC | FF50 | EE76 |
| 0000211500 | 76FF | FFFC | FA76 | 4E8D | 16E2 | 8D51 | F64E | 5116 |
| 0000211520 | 4E8D | 16D6 | 1E51 | 6668 | 680A | 01E2 | 36FF | 09D6 |
| 0000211540 | 36FF | 09D4 | 36FF | 09DA | 36FF | 09D8 | DA9A | 0014 |
| 0000211560 | 8300 | 28C4 | 468B | E9DC | 0086 | 06E9 | 8B00 | F446 |
| 0000211600 | 7DE9 | 8E00 | 7406 | 263A | 3E83 | 120C | 7500 | E903 |
| 0000211620 | 0009 | 7E83 | FEDA | 0374 | 0FE9 | 8E00 | 7606 | 263A |
| 0000211640 | 3E83 | 1225 | 7500 | E903 | 0050 | 46C7 | 00DC | FF00 |
| 0000211660 | E076 | 76FF | 8DDE | DC46 | 5016 | 76FF | FFEE | FC76 |
| 0000211700 | 76FF | 8DFA | E24E | 5116 | 4E8D | 16F6 | 8D51 | D64E |
| 0000211720 | 5116 | 681E | 0A66 | E468 | FF01 | D636 | FF09 | D436 |
| 0000211740 | FF09 | DA36 | FF09 | D836 | 9A09 | 1274 | 0000 | C483 |
| 0000211760 | 8B28 | DC46 | 09E9 | E900 | 0006 | 00B8 | E900 | 0000 |
| 0000212000 | 5E1F | 835F | 02ED | E58B | 5D1F | CA4D | 000C | 581E |
| 0000212020 | 4590 | 8B55 | 1EEC | D88E | EC81 | 0024 | 5657 | B81E |
| 0000212040 | 12AB | D88E | 46C7 | 76FA | 8C0A | FC5E | 46C7 | 01F4 |
| 0000212060 | 2B01 | 89C0 | E646 | 4689 | 8EE4 | 7406 | 263A | 3E83 |
| 0000212100 | 15AE | 7500 | E903 | 001D | 36FF | 09DA | 36FF | 09D8 |
| 0000212120 | 468D | 16DC | 9A50 | 12E1 | 0000 | C483 | 3D08 | 0000 |
| 0000212140 | 0374 | 0FE9 | 8E00 | 7606 | 263A | 3E83 | 15C6 | 7500 |
| 0000212160 | E903 | 003B | 681E | 0A7D | 468D | 16E8 | 8D50 | DC46 |
| 0000212200 | 5016 | 468D | 16F6 | 6850 | 020A | 681E | 0A84 | 36FF |

THU MAR 14 17:31:54 1991 DB_PI.DLL PAGE 76, LINE 4426

| | | | | | | | | |
|---|---|---|---|---|---|---|---|---|
| 0000212220 | 09D6 | 36FF | 09D4 | 36FF | 09DA | 36FF | 09D8 | 2A9A |
| 0000212240 | 0013 | 8300 | 1EC4 | 4689 | 89F6 | F856 | 08E9 | 2B00 |
| 0000212260 | 89C0 | F846 | 4689 | 8EF6 | 7406 | 263A | 3E83 | 12CB |
| 0000212300 | 7500 | E903 | 0009 | 7E83 | FEE0 | 0374 | 0FE9 | 8E00 |
| 0000212320 | 7606 | 263A | 3E83 | 12F7 | 7500 | E903 | 0050 | 46C7 |
| 0000212340 | 90E2 | FF01 | E676 | 76FF | 8DE4 | E246 | 5016 | 76FF |
| 0000212360 | FFF4 | FC76 | 76FF | 8DFA | E84E | 5116 | 4E8D | 16F6 |
| 0000212400 | 8D51 | DC4E | 5116 | 681E | 0A84 | 0E68 | FF02 | D636 |
| 0000212420 | FF09 | D436 | FF09 | DA36 | FF09 | D836 | 9A09 | 13B4 |
| 0000212440 | 0000 | C483 | 8B28 | E246 | 09E9 | E900 | 0006 | 90B8 |
| 0000212460 | E901 | 0000 | 5E1F | 835F | 02ED | E58B | 5D1F | CA4D |
| 0000212500 | 0008 | 581E | 4590 | 8B55 | 1EEC | D88E | EC81 | 002A |
| 0000212520 | 5657 | B81E | 1510 | D88E | 46C7 | 94FA | 8C0A | FC5E |
| 0000212540 | 46C7 | 01EE | 2B01 | 89C0 | E046 | 4689 | 8EDE | 7406 |
| 0000212560 | 263A | 3E83 | 1530 | 7500 | E903 | 001D | 36FF | 09DA |
| 0000212600 | 36FF | 09D8 | 468D | 16D6 | 9A50 | 1546 | 0000 | C483 |
| 0000212620 | 3D08 | 0000 | 0374 | 0FE9 | 8E00 | 7606 | 263A | 3E83 |
| 0000212640 | 155C | 7500 | E903 | 003B | 681E | DA9B | 468D | 16E2 |
| 0000212660 | 8D50 | D646 | 5016 | 468D | 16F6 | 6850 | 0232 | 681E |
| 0000212700 | DAA2 | 36FF | 09D6 | 36FF | 09D4 | 36FF | 09DA | 36FF |
| 0000212720 | 09D8 | 8F9A | 0015 | 8300 | 1EC4 | 4689 | 89F6 | F856 |
| 0000212740 | 08E9 | 2B00 | 89C0 | F846 | 4689 | C4F6 | 0A5E | C726 |
| 0000212760 | 0007 | C400 | 065E | C02B | 8926 | 0247 | 8926 | 8D07 |
| 0000213000 | F046 | 5016 | 006A | 4E9A | 7B2B | 830D | 06C4 | 4689 |
| 0000213020 | 83F4 | F47E | 7500 | E903 | 0108 | 7E81 | 9DF4 | 7401 |
| 0000213040 | E903 | 0080 | 068E | 3A74 | 8326 | 9B3E | 0017 | 0375 |
| 0000213060 | 09E9 | 8300 | DA7E | 74FE | E903 | 000F | 068E | 3A76 |
| 0000213100 | 8326 | B33E | 0017 | 0375 | 50E9 | C700 | DC46 | 01BC |
| 0000213120 | 76FF | FFE0 | DE76 | 468D | 16DC | FF50 | EE76 | 76FF |
| 0000213140 | FFFC | FA76 | 4E8D | 16E2 | 8D51 | F64E | 5116 | 4E8D |
| 0000213160 | 16D6 | 1E51 | A268 | 680A | 023F | 36FF | 09D6 | 36FF |
| 0000213200 | 09D4 | 36FF | 09DA | 36FF | 09D8 | FC9A | 0017 | 8300 |
| 0000213220 | 28C4 | 468B | E9DC | 0128 | 06E9 | B800 | 01BC | 1FE9 |
| 0000213240 | E901 | 007E | 068E | 3A74 | 8326 | 393E | 0018 | 0375 |
| 0000213260 | 09E9 | 8300 | DA7E | 74FE | E903 | 000F | 068E | 3A76 |
| 0000213300 | 8326 | 513E | 0018 | 0375 | 51E9 | 8B00 | F446 | 4689 |
| 0000213320 | FFDC | E076 | 76FF | 8DDE | DC46 | 5016 | 76FF | FFEE |
| 0000213340 | FC76 | 76FF | 8DFA | E24E | 5116 | 4E8D | 16F6 | 8D51 |
| 0000213360 | D64E | 5116 | 681E | 0AA2 | 4168 | FF02 | D636 | FF09 |
| 0000213400 | D436 | FF09 | DA36 | FF09 | D836 | 9A09 | 189A | 0000 |
| 0000213420 | C483 | 8B28 | DC46 | A7E9 | E900 | 0006 | 468B | E9F4 |
| 0000213440 | 009E | 76FF | FF08 | 0676 | 76FF | FF0C | 0A76 | 76FF |
| 0000213460 | FF0E | F276 | 76FF | 9AF0 | 2C91 | 16F9 | C483 | 890E |
| 0000213500 | F446 | 068E | 3A74 | 8326 | 643E | 0016 | 0375 | 09E9 |
| 0000213520 | 8300 | DA7E | 74FE | E903 | 000F | 068E | 3A76 | 8326 |
| 0000213540 | 903E | 0016 | 0375 | 51E9 | 8B00 | F446 | 4689 | FFDC |
| 0000213560 | E076 | 76FF | 8DDE | DC46 | 5016 | 76FF | FFEE | FC76 |
| 0000213600 | 76FF | 8DFA | E24E | 5116 | 4E8D | 16F6 | 8D51 | D64E |
| 0000213620 | 5116 | 681E | 0AA2 | 4668 | FF02 | D636 | FF09 | D436 |
| 0000213640 | FF09 | DA36 | FF09 | D836 | 9A09 | 160E | 0000 | C483 |
| 0000213660 | 8B28 | DC46 | 09E9 | E900 | 0006 | 468B | E9F4 | 0000 |
| 0000213700 | 5E1F | 835F | 02ED | E58B | 5D1F | CA4D | 000E | 581E |
| 0000213720 | 4590 | 8B55 | 1EEC | D88E | EC81 | 013C | 5657 | B81E |
| 0000213740 | 1644 | D88E | 46C7 | BFF6 | 8C0A | F85E | 46C7 | 01E6 |
| 0000213760 | 2801 | 89C0 | D846 | 4689 | 8ED6 | 7806 | 263A | 3E83 |
| 0000214000 | 171B | 7500 | E903 | 001E | 36FF | 0ADE | 36FF | 0ADC |
| 0000214020 | 868D | FECE | 5016 | 7A9A | 0016 | 8300 | 08C4 | 003D |
| 0000214040 | 7400 | E903 | 000F | 068E | 3A7A | 8326 | 9F3E | 0019 |
| 0000214060 | 0375 | 3CE9 | 1E00 | C668 | 8D0A | DA46 | 5016 | 868D |

THU MAR 14 17:31:54 1991  DB_PI.DLL  PAGE 77, LINE 4485

| | | | | | | | | |
|---|---|---|---|---|---|---|---|---|
| 0000214100 | FECE | 5016 | 468D | 16EE | 6850 | 00B5 | 681E | 0AE0 |
| 0000214120 | 36FF | 0ADA | 36FF | 0AD8 | 36FF | 0ADE | 36FF | 0ADC |
| 0000214140 | C39A | 0016 | 8300 | 1EC4 | 4689 | 89EE | F056 | 08E9 |
| 0000214160 | 2B00 | 89C0 | F046 | 4689 | 8BEE | 1646 | 460B | 7514 |
| 0000214200 | E903 | 000B | 468B | 0B08 | 0646 | 0374 | 82E9 | 8E00 |
| 0000214220 | 7806 | 263A | 3E83 | 1A3B | 7500 | E903 | 000A | BE83 |
| 0000214240 | FED2 | 74FE | E903 | 000F | 068E | 3A7A | 8326 | 543E |
| 0000214260 | 001A | 0375 | 54E9 | C700 | D486 | 17FE | FF00 | D876 |
| 0000214300 | 76FF | 8DD6 | D486 | 16FE | FF50 | E676 | 76FF | FFF8 |
| 0000214320 | F676 | 4E8D | 16DA | 8D51 | EE4E | 5116 | 8E8D | FECE |
| 0000214340 | 5116 | 681E | 0AE0 | C168 | FF00 | DA36 | FF0A | D836 |
| 0000214360 | FF0A | DE36 | FF0A | DC36 | 9A0A | 1A9F | 0000 | C483 |
| 0000214400 | 8B28 | D486 | E9FE | 0922 | 06E9 | B800 | 0017 | 19E9 |
| 0000214420 | C409 | 145E | 8326 | 487F | 7D78 | E903 | 0016 | 5EC4 |
| 0000214440 | 2614 | 7F83 | 7B48 | 037C | 09E9 | C700 | C486 | 01FE |
| 0000214460 | E900 | 0006 | 86C7 | FEC4 | 0000 | BE83 | FEC4 | 7400 |
| 0000214500 | E903 | 0082 | 068E | 3A78 | 8326 | EA3E | 001A | 0375 |
| 0000214520 | 0AE9 | 8300 | D2BE | FEFE | 0374 | 0FE9 | 8E00 | 7A06 |
| 0000214540 | 263A | 3E83 | 1B03 | 7500 | E903 | 0054 | 86C7 | FED4 |
| 0000214560 | 01AD | 76FF | FFD8 | D676 | 868D | FED4 | 5016 | 76FF |
| 0000214600 | FFE6 | F876 | 76FF | 8DF6 | DA4E | 5116 | 4E8D | 16EE |
| 0000214620 | 8D51 | CE8E | 16FE | 1E51 | E068 | 680A | 00C3 | 36FF |
| 0000214640 | 0ADA | 36FF | 0AD8 | 36FF | 0ADE | 36FF | 0ADC | 4F9A |
| 0000214660 | 001B | 8300 | 28C4 | 868B | FED4 | 6DE9 | E908 | 0006 |
| 0000214700 | ADB8 | E901 | 0864 | 5EC4 | 2B06 | 26C0 | 4789 | 2602 |
| 0000214720 | 0789 | 468D | 16FA | 6A50 | FF02 | 1A76 | 76FF | 9A18 |
| 0000214740 | CF64 | 1C55 | C483 | 890A | EC46 | 7E83 | 00EC | 0375 |
| 0000214760 | 83E9 | 8E00 | 7806 | 263A | 3E83 | 1B97 | 7500 | E903 |
| 0000215000 | 000A | BE83 | FED2 | 74FE | E903 | 000F | 068E | 3A7A |
| 0000215020 | 8326 | B03E | 001B | 0375 | 55E9 | 8B00 | EC46 | 8689 |
| 0000215040 | FED4 | 76FF | FFD8 | D676 | 868D | FED4 | 5016 | 76FF |
| 0000215060 | FFE6 | F876 | 76FF | 8DF6 | DA4E | 5116 | 4E8D | 16EE |
| 0000215100 | 8D51 | CE8E | 16FE | 1E51 | E068 | 680A | 00CA | 36FF |
| 0000215120 | 0ADA | 36FF | 0AD8 | 36FF | 0ADE | 36FF | 0ADC | FC9A |
| 0000215140 | 001B | 8300 | 28C4 | 868B | FED4 | BDE9 | E907 | 0006 |
| 0000215160 | 468B | E9EC | 07B4 | 468B | 8B14 | 1656 | 0405 | 520C |
| 0000215200 | 8B50 | 1446 | 568B | 0516 | 0004 | 5052 | 3D9A | 5842 |
| 0000215220 | 8307 | 08C4 | 4689 | 83EC | EC7E | 7500 | E903 | 0083 |
| 0000215240 | 068E | 3A78 | 8326 | 6D3E | 001C | 0375 | 0AE9 | 8300 |
| 0000215260 | D2BE | FEFE | 0374 | 0FE9 | 8E00 | 7A06 | 263A | 3E83 |
| 0000215300 | 1C86 | 7500 | E903 | 0055 | 468B | 89EC | D486 | FFFE |
| 0000215320 | D876 | 76FF | 8DD6 | D486 | 16FE | FF50 | E676 | 76FF |
| 0000215340 | FFF8 | F676 | 4E8D | 16DA | 8D51 | EE4E | 5116 | 8E8D |
| 0000215360 | FECE | 5116 | 681E | 0AE0 | CD68 | FF00 | DA36 | FF0A |
| 0000215400 | D836 | FF0A | DE36 | FF0A | DC36 | 9A0A | 177B | 0000 |
| 0000215420 | C483 | 8B28 | D486 | E9FE | 0710 | 06E9 | 8B00 | EC46 |
| 0000215440 | 07E9 | 6A07 | 6A30 | 8B00 | 1446 | 568B | 0516 | 0084 |
| 0000215460 | 5052 | 8E9A | 3C3E | 831C | 08C4 | 1D6A | 006A | 468B |
| 0000215500 | 8B14 | 1656 | 7405 | 5200 | 9A50 | 3E8E | 102B | C483 |
| 0000215520 | 8D08 | F246 | 5016 | 76FF | FF0C | 0A76 | 76FF | FF1A |
| 0000215540 | 1876 | 769A | E4DF | 8313 | 0CC4 | 4689 | 83EC | EC7E |
| 0000215560 | 7500 | E903 | 0083 | 068E | 3A7B | 8326 | F03E | 0018 |
| 0000215600 | 0375 | 0AE9 | 8300 | D2BE | FEFE | 0374 | 0FE9 | 8E00 |
| 0000215620 | 7A06 | 263A | 3E83 | 1733 | 7500 | E903 | 0055 | 468B |
| 0000215640 | 89EC | D486 | FFFE | D876 | 76FF | 8DD6 | D486 | 16FE |
| 0000215660 | FF50 | E676 | 76FF | FFF8 | F676 | 4E8D | 16DA | 8D51 |
| 0000215700 | EE4E | 5116 | 8E8D | FECE | 5116 | 681E | 0AE0 | D768 |
| 0000215720 | FF00 | DA36 | FF0A | D836 | FF0A | DE36 | FF0A | DC36 |
| 0000215740 | 9A0A | 1E10 | 0000 | C483 | 8B28 | D486 | E9FE | 063A |

THU MAR 14 17:31:54 1991 DB_PI.DLL PAGE 78, LINE 4544

| | | | | | | | | |
|---|---|---|---|---|---|---|---|---|
| 0000215760 | 06E9 | 8B00 | EC46 | 31E9 | C406 | F25E | C726 | 0247 |
| 0000216000 | 0000 | B468 | FF00 | 1676 | 76FF | 8B14 | F246 | 568B |
| 0000216020 | 05F4 | 000C | 5052 | 309A | 443E | 831E | 0AC4 | 468B |
| 0000216040 | C412 | F25E | 8926 | C687 | 8B00 | 1046 | 5EC4 | 26F2 |
| 0000216060 | 8789 | 00C8 | 468B | C40E | F25E | 8926 | CA87 | 8B00 |
| 0000216100 | FA46 | 568B | C4FC | F25E | 8926 | 0847 | 8926 | 0A57 |
| 0000216120 | 5EC4 | 26F2 | 87C7 | 00F4 | 0000 | 5EC4 | 2614 | 478B |
| 0000216140 | 266C | 578B | C46E | 145E | 0326 | 6647 | D283 | 8300 |
| 0000216160 | 00FA | 037D | CFE9 | 7E01 | E903 | 0008 | F43D | 7701 |
| 0000216200 | E903 | 01C2 | 468B | 8BF2 | F456 | D405 | 5200 | 1E50 |
| 0000216220 | CD68 | C40A | 145E | FF26 | 4877 | 76FF | FFFC | FA76 |
| 0000216240 | 589A | 901E | 831E | 0EC4 | 4689 | 83EC | EC7E | 7500 |
| 0000216260 | E903 | 0083 | 068E | 3A78 | 8326 | A83E | 001E | 0375 |
| 0000216300 | 0AE9 | 8300 | D2BE | FEFE | 0374 | 0FE9 | 8E00 | 7A06 |
| 0000216320 | 263A | 3E83 | 1EC1 | 7500 | E903 | 0055 | 468B | 89EC |
| 0000216340 | D486 | FFFE | D876 | 76FF | 8DD6 | D486 | 16FE | FF50 |
| 0000216360 | E676 | 76FF | FFF8 | F676 | 4E8D | 16DA | 8D51 | EE4E |
| 0000216400 | 5116 | 8E8D | FECE | 5116 | 681E | 0AE0 | E968 | FF00 |
| 0000216420 | DA36 | FF0A | D836 | FF0A | DE36 | FF0A | DC36 | 9A0A |
| 0000216440 | 1F0D | 0000 | C483 | 8B28 | D486 | E9FE | 04FC | 06E9 |
| 0000216460 | 8B00 | EC46 | F3E9 | C404 | 145E | 8A26 | 4867 | C02A |
| 0000216500 | 4603 | 8BFA | FC56 | 862D | 5274 | 8D50 | D686 | 16FE |
| 0000216520 | 9A50 | 2750 | 1E56 | C483 | 1E08 | D568 | 8D0A | D686 |
| 0000216540 | 16FE | 9A50 | 270A | 1E6F | C483 | 8B08 | F246 | 568B |
| 0000216560 | 05F4 | 00D4 | 5052 | 868D | FED6 | 5016 | 0A9A | 5F27 |
| 0000216600 | 8320 | 08C4 | 468B | 8BF2 | F456 | D005 | 5200 | 6A50 |
| 0000216620 | 8D01 | D686 | 16FE | FF50 | 1676 | 76FF | 9A14 | 1ECD |
| 0000216640 | 182A | C483 | 890E | EC46 | 7E83 | 00EC | 0375 | 83E9 |
| 0000216660 | 8E00 | 7806 | 263A | 3E83 | 1F9A | 7500 | E903 | 000A |
| 0000216700 | BE83 | FED2 | 74FE | E903 | 000F | 068E | 3A7A | 8326 |
| 0000216720 | B33E | 001F | 0375 | 55E9 | 8B00 | EC46 | 8689 | FED4 |
| 0000216740 | 76FF | FFD8 | D676 | 868D | FED4 | 5016 | 76FF | FFE6 |
| 0000216760 | F876 | 76FF | 8DF6 | DA4E | 5116 | 4E8D | 16EE | 8D51 |
| 0000217000 | CE8E | 16FE | 1E51 | E068 | 680A | 00F4 | 36FF | 0ADA |
| 0000217020 | 36FF | 0AD8 | 36FF | 0ADE | 36FF | 0ADC | FF9A | 001F |
| 0000217040 | 8300 | 28C4 | 868B | FED4 | FFE9 | E903 | 0006 | 468B |
| 0000217060 | E9EC | 03F6 | 5EC4 | 2BF2 | 26C0 | 8789 | 00C2 | 8926 |
| 0000217100 | C087 | E900 | 0168 | 5EC4 | 2BF2 | 26C0 | 8789 | 00CE |
| 0000217120 | 8926 | CC87 | C400 | F25E | 8B26 | CC87 | 2600 | 978B |
| 0000217140 | 00CE | 5EC4 | 26F2 | 8789 | 00D0 | 8926 | D297 | FF00 |
| 0000217160 | 1A76 | 76FF | C418 | 145E | FF26 | 6677 | 5EC4 | 2614 |
| 0000217200 | 77FF | 266E | 77FF | 8B6C | F246 | 568B | 05F4 | 00C0 |
| 0000217220 | 5052 | AC9A | FFAD | 89FF | EC46 | 7E83 | 00EC | 0375 |
| 0000217240 | 83E9 | 8E00 | 7806 | 263A | 3E83 | 1986 | 7500 | E903 |
| 0000217260 | 000A | BE83 | FED2 | 74FE | E903 | 000F | 068E | 3A7A |
| 0000217300 | 8326 | 1D3E | 0019 | 0375 | 55E9 | 8B00 | EC46 | 8689 |
| 0000217320 | FED4 | 76FF | FFD8 | D676 | 868D | FED4 | 5016 | 76FF |
| 0000217340 | FFE6 | F876 | 76FF | 8DF6 | DA4E | 5116 | 4E8D | 16EE |
| 0000217360 | 8D51 | CE8E | 16FE | 1E51 | E068 | 680A | 0100 | 36FF |
| 0000217400 | 0ADA | 36FF | 0AD8 | 36FF | 0ADE | 36FF | 0ADC | EA9A |
| 0000217420 | 0019 | 8300 | 28C4 | 868B | FED4 | 0DE9 | E903 | 0006 |
| 0000217440 | 468B | E9EC | 0304 | 5EC4 | 26F2 | 9FC4 | 00C0 | 8B26 |
| 0000217460 | 7047 | 8B26 | 7257 | 8689 | FEC6 | 9689 | FEC8 | 5EC4 |
| 0000217500 | 26F2 | 9FC4 | 00C0 | 8B26 | 6847 | 8B26 | 6A57 | 8689 |
| 0000217520 | FECA | 9689 | FECC | B468 | FF00 | 1676 | 76FF | C414 |
| 0000217540 | F25E | FF26 | C2B7 | 2600 | B7FF | 00C0 | 309A | 253E |
| 0000217560 | 831C | 0AC4 | 868B | FEC6 | 968B | FEC8 | 5EC4 | 26F2 |
| 0000217600 | 9FC4 | 00C0 | 8926 | 7047 | 8926 | 7257 | 868B | FECA |
| 0000217620 | 968B | FECC | 5EC4 | 26F2 | 9FC4 | 00C0 | 8926 | 6847 |

THU MAR 14 17:31:54 1991 DB_PI.DLL PAGE 79, LINE 4603

| | | | | | | | | |
|---|---|---|---|---|---|---|---|---|
| 0000217640 | 8926 | 6A57 | 5EC4 | 26F2 | 87C7 | 00C8 | 0000 | 5EC4 |
| 0000217660 | 2614 | 478B | 4862 | 5EC4 | 2B14 | 26D2 | 77F7 | 4064 |
| 0000217700 | 006A | C450 | 145E | FF26 | 6E77 | FF26 | 6C77 | 9E9A |
| 0000217720 | D642 | 8920 | E846 | 5689 | 6AEA | 6A01 | FFD0 | EA76 |
| 0000217740 | 76FF | 9AE8 | 436A | 20F2 | D00B | 0374 | 08E9 | 8300 |
| 0000217760 | E846 | 8301 | EA56 | 6A00 | FF01 | EA76 | 76FF | 9AE8 |
| 0000220000 | 33D9 | 21C2 | C483 | C406 | 065E | 8926 | 2607 | 5789 |
| 0000220020 | C402 | 065E | 8B26 | 0247 | 0B26 | 7407 | E903 | 0082 |
| 0000220040 | 068E | 3A78 | 8326 | AB3E | 001D | 0375 | 0AE9 | 8300 |
| 0000220060 | D2BE | FEFE | 0374 | 0FE9 | 8E00 | 7A06 | 263A | 3E83 |
| 0000220100 | 1DC4 | 7500 | E903 | 0054 | 86C7 | FED4 | 0007 | 76FF |
| 0000220120 | FFD8 | D676 | 868D | FED4 | 5016 | 76FF | FFE6 | F876 |
| 0000220140 | 76FF | 8DF6 | DA4E | 5116 | 4E8D | 16EE | 8D51 | CE8E |
| 0000220160 | 16FE | 1E51 | E068 | 680A | 0120 | 36FF | 0ADA | 36FF |
| 0000220200 | 0AD8 | 36FF | 0ADE | 36FF | 0ADC | D29A | 001C | 8300 |
| 0000220220 | 28C4 | 868B | FED4 | 91E9 | E901 | 0006 | 07B8 | E900 |
| 0000220240 | 0188 | 5EC4 | 2606 | 078B | 8B26 | 0257 | 5EC4 | 26F2 |
| 0000220260 | 8789 | 00F6 | 8926 | F897 | C400 | F25E | 8326 | C8BF |
| 0000220300 | 0000 | 0375 | D2E9 | 6A00 | FF01 | EA76 | 76FF | 9AE8 |
| 0000220320 | 33D9 | 21F3 | C483 | C406 | F25E | 8926 | FA87 | 2600 |
| 0000220340 | 9789 | 00FC | 5EC4 | 26F2 | 878B | 00FC | 0B26 | FA87 |
| 0000220360 | 7400 | E903 | 00A0 | 5EC4 | 2606 | 77FF | 2602 | 37FF |
| 0000220400 | CA9A | 0933 | 831D | 04C4 | 5EC4 | 2B06 | 26C0 | 4789 |
| 0000220420 | 2602 | 0789 | 068E | 3A78 | 8326 | 9F3E | 0022 | 0375 |
| 0000220440 | 0AE9 | 8300 | D2BE | FEFE | 0374 | 0FE9 | 8E00 | 7A06 |
| 0000220460 | 263A | 3E83 | 22B8 | 7500 | E903 | 0054 | 86C7 | FED4 |
| 0000220500 | 0007 | 76FF | FFD8 | D676 | 868D | FED4 | 5016 | 76FF |
| 0000220520 | FFE6 | F876 | 76FF | 8DF6 | DA4E | 5116 | 4E8D | 16EE |
| 0000220540 | 8D51 | CE8E | 16FE | 1E51 | E068 | 680A | 012A | 36FF |
| 0000220560 | 0ADA | 36FF | 0AD8 | 36FF | 0ADE | 36FF | 0ADC | 039A |
| 0000220600 | 0023 | 8300 | 28C4 | 868B | FED4 | 9DE9 | E900 | 0006 |
| 0000220620 | 07B8 | E900 | 0094 | 0FE9 | C400 | F25E | C02B | 8926 |
| 0000220640 | FC87 | 2600 | 8789 | 00FA | 068E | 3A78 | 8326 | 173E |
| 0000220660 | 0021 | 0375 | 0AE9 | 8300 | D2BE | FEFE | 0374 | 0FE9 |
| 0000220700 | 8E00 | 7A06 | 263A | 3E83 | 2130 | 7500 | E903 | 0054 |
| 0000220720 | 86C7 | FED4 | 0000 | 76FF | FFD8 | D676 | 868D | FED4 |
| 0000220740 | 5016 | 76FF | FFE6 | F876 | 76FF | 8DF6 | DA4E | 5116 |
| 0000220760 | 4E8D | 16EE | 8D51 | CE8E | 16FE | 1E51 | E068 | 680A |
| 0000221000 | 0130 | 36FF | 0ADA | 36FF | 0AD8 | 36FF | 0ADE | 36FF |
| 0000221020 | 0ADC | 7B9A | 0021 | 8300 | 28C4 | 868B | FED4 | 09E9 |
| 0000221040 | E900 | 0006 | 00B8 | E900 | 0000 | 5E1F | 835F | 02ED |
| 0000221060 | E58B | 5D1F | CA4D | 0016 | 581E | 4590 | 8B55 | 1EEC |
| 0000221100 | D88E | EC81 | 0036 | 5657 | B81E | 18D0 | D88E | 46C7 |
| 0000221120 | F3F6 | 8C0A | F85E | 46C7 | 01E6 | 2B01 | 89C0 | D846 |
| 0000221140 | 4689 | 8ED6 | 7806 | 263A | 3E83 | 23F2 | 7500 | E903 |
| 0000221160 | 001D | 36FF | 0ADE | 36FF | 0ADC | 468D | 16CE | 9A50 |
| 0000221200 | 1907 | 0000 | C483 | 3D08 | 0000 | 0374 | 0FE9 | 8E00 |
| 0000221220 | 7A06 | 263A | 3E83 | 240A | 7500 | E903 | 003B | 681E |
| 0000221240 | 0AFA | 468D | 16DA | 8D50 | CE46 | 5016 | 468D | 16EA |
| 0000221260 | 6850 | 0159 | 681E | 0B02 | 36FF | 0ADA | 36FF | 0AD8 |
| 0000221300 | 36FF | 0ADE | 36FF | 0ADC | 519A | 0019 | 8300 | 1EC4 |
| 0000221320 | 4689 | 89EA | EC56 | 08E9 | 2B00 | 89C0 | EC46 | 4689 |
| 0000221340 | 8BEA | 0846 | 460B | 7506 | E903 | 000F | 5EC4 | 2606 |
| 0000221360 | 478B | 2602 | 070B | 0374 | 7DE9 | 8E00 | 7806 | 263A |
| 0000221400 | 3E83 | 2490 | 7500 | E903 | 0009 | 7E83 | FED2 | 0374 |
| 0000221420 | 0FE9 | 8E00 | 7A06 | 263A | 3E83 | 24A8 | 7500 | E903 |
| 0000221440 | 0050 | 46C7 | 17D4 | FF00 | D876 | 76FF | 8DD6 | D446 |
| 0000221460 | 5016 | 76FF | FFE6 | F876 | 76FF | 8DF6 | DA4E | 5116 |
| 0000221500 | 4E8D | 16EA | 8D51 | CE4E | 5116 | 681E | 0B02 | 6268 |

THU MAR 14 17:31:54 1991 DB_PI.DLL PAGE 80, LINE 4662

| | | | | | | | | |
|---|---|---|---|---|---|---|---|---|
| 0000221520 | FF01 | DA36 | FF0A | D836 | FF0A | DE36 | FF0A | DC36 |
| 0000221540 | 9A0A | 24F1 | 0000 | C483 | 8B28 | D446 | 53E9 | E906 |
| 0000221560 | 0006 | 17B8 | E900 | 064A | 468D | 16FA | 6A50 | FF02 |
| 0000221600 | 1076 | 76FF | 9A0E | CF64 | 2518 | C483 | 890A | E846 |
| 0000221620 | 7E83 | 00E8 | 0375 | 7EE9 | 8E00 | 7806 | 263A | 3E83 |
| 0000221640 | 2530 | 7500 | E903 | 0009 | 7E83 | FED2 | 0374 | 0FE9 |
| 0000221660 | 8E00 | 7A06 | 263A | 3E83 | 2548 | 7500 | E903 | 0051 |
| 0000221700 | 468B | 89E8 | D446 | 76FF | FFD8 | D676 | 468D | 16D4 |
| 0000221720 | FF50 | E676 | 76FF | FFF8 | F676 | 4E8D | 16DA | 8D51 |
| 0000221740 | EA4E | 5116 | 4E8D | 16CE | 1E51 | 0268 | 680B | 0166 |
| 0000221760 | 36FF | 0ADA | 36FF | 0AD8 | 36FF | 0ADE | 36FF | 0ADC |
| 0000222000 | 919A | 0025 | 8300 | 28C4 | 468B | E9D4 | 05B4 | 06E9 |
| 0000222020 | 8B00 | E846 | ABE9 | 8D05 | EE46 | 5016 | 76FF | FF0C |
| 0000222040 | 1076 | 76FF | 9A0E | E12D | 1AD2 | C483 | 890A | E846 |
| 0000222060 | 7E83 | 00E8 | 0375 | 7EE9 | 8E00 | 7806 | 263A | 3E83 |
| 0000222100 | 25D7 | 7500 | E903 | 0009 | 7E83 | FED2 | 0374 | 0FE9 |
| 0000222120 | 8E00 | 7A06 | 263A | 3E83 | 25EF | 7500 | E903 | 0051 |
| 0000222140 | 468B | 89E8 | D446 | 76FF | FFD8 | D676 | 468D | 16D4 |
| 0000222160 | FF50 | E676 | 76FF | FFF8 | F676 | 4E8D | 16DA | 8D51 |
| 0000222200 | EA4E | 5116 | 4E8D | 16CE | 1E51 | 0268 | 680B | 016A |
| 0000222220 | 36FF | 0ADA | 36FF | 0AD8 | 36FF | 0ADE | 36FF | 0ADC |
| 0000222240 | 379A | 0026 | 8300 | 28C4 | 468B | E9D4 | 0514 | 06E9 |
| 0000222260 | 8B00 | E846 | 0BE9 | C405 | EE5E | 8026 | 307F | 7400 |
| 0000222300 | E903 | 0099 | 5EC4 | 26EE | BF83 | 00C8 | 7500 | E903 |
| 0000222320 | 008B | 5EC4 | 26EE | BF83 | 00F4 | 7500 | E903 | 007D |
| 0000222340 | 068E | 3A78 | 8326 | 613E | 0026 | 0375 | 09E9 | 8300 |
| 0000222360 | D27E | 74FE | E903 | 000F | 068E | 3A7A | 8326 | 793E |
| 0000222400 | 0026 | 0375 | 50E9 | C700 | D446 | 01A1 | 76FF | FFD8 |
| 0000222420 | D676 | 468D | 16D4 | FF50 | E676 | 76FF | FFF8 | F676 |
| 0000222440 | 4E8D | 16DA | 8D51 | EA4E | 5116 | 4E8D | 16CE | 1E51 |
| 0000222460 | 0268 | 680B | 016C | 36FF | 0ADA | 36FF | 0AD8 | 36FF |
| 0000222500 | 0ADE | 36FF | 0ADC | C19A | 0026 | 8300 | 28C4 | 468B |
| 0000222520 | E9D4 | 046E | 06E9 | B800 | 01A1 | 65E9 | C404 | EE5E |
| 0000222540 | 8326 | 027F | 7500 | E903 | 007D | 068E | 3A78 | 8326 |
| 0000222560 | 0B3E | 0022 | 0375 | 09E9 | 8300 | D27E | 74FE | E903 |
| 0000222600 | 000F | 068E | 3A7A | 8326 | 243E | 0022 | 0375 | 50E9 |
| 0000222620 | C700 | D446 | 01A6 | 76FF | FFD8 | D676 | 468D | 16D4 |
| 0000222640 | FF50 | E676 | 76FF | FFF8 | F676 | 4E8D | 16DA | 8D51 |
| 0000222660 | EA4E | 5116 | 4E8D | 16CE | 1E51 | 0268 | 680B | 016F |
| 0000222700 | 36FF | 0ADA | 36FF | 0AD8 | 36FF | 0ADE | 36FF | 0ADC |
| 0000222720 | 6F9A | 0022 | 8300 | 28C4 | 468B | E9D4 | 03E4 | 06E9 |
| 0000222740 | B800 | 01A6 | DBE9 | C403 | EE5E | 8B26 | D287 | 2600 |
| 0000222760 | 870B | 00D0 | 0375 | 0BE9 | C401 | EE5E | 8326 | C8BF |
| 0000223000 | 0000 | 0375 | 43E9 | C400 | EE5E | FF26 | D2B7 | 2600 |
| 0000223020 | B7FF | 00D0 | 468B | 8BEE | F056 | FA05 | 5200 | FF50 |
| 0000223040 | 0876 | 76FF | FF06 | 0A76 | 76FF | FFF0 | EE76 | 76FF |
| 0000223060 | 8B0C | EE46 | 568B | 05F0 | 000C | 5052 | D19A | 6226 |
| 0000223100 | 8327 | 18C4 | 4689 | E9E8 | 0030 | 5EC4 | 2606 | 77FF |
| 0000223120 | 2602 | 37FF | 76FF | C40A | EE5E | FF26 | D2B7 | 2600 |
| 0000223140 | B7FF | 00D0 | 468B | 8BEE | F056 | 0C05 | 5200 | 9A50 |
| 0000223160 | 24F1 | 1D93 | C483 | 890E | E846 | 7E83 | 00E8 | 0375 |
| 0000223200 | 7EE9 | 8E00 | 7806 | 263A | 3E83 | 281E | 7500 | E903 |
| 0000223220 | 0009 | 7E83 | FED2 | 0374 | 0FE9 | 8E00 | 7A06 | 263A |
| 0000223240 | 3E83 | 2836 | 7500 | E903 | 0051 | 468B | 89E8 | D446 |
| 0000223260 | 76FF | FFD8 | D676 | 468D | 16D4 | FF50 | E676 | 76FF |
| 0000223300 | FFF8 | F676 | 4E8D | 16DA | 8D51 | EA4E | 5116 | 4E8D |
| 0000223320 | 16CE | 1E51 | 0268 | 680B | 017F | 36FF | 0ADA | 36FF |
| 0000223340 | 0AD8 | 36FF | 0ADE | 36FF | 0ADC | 7E9A | 0028 | 8300 |
| 0000223360 | 28C4 | 468B | E9D4 | 02CA | 06E9 | 8B00 | E846 | C1E9 |

THU MAR 14 17:31:54 1991 DB_PI.DLL PAGE 81, LINE 4721

| | | | | | | | | |
|---|---|---|---|---|---|---|---|---|
| 0000223400 | E902 | 0241 | 5EC4 | 26EE | 9FC4 | 00C0 | 8B26 | 6247 |
| 0000223420 | C448 | EE5E | C426 | C09F | 2B00 | 26D2 | 77F7 | 3B64 |
| 0000223440 | 0A46 | 0372 | 7DE9 | 8E00 | 7806 | 263A | 3E83 | 29BF |
| 0000223460 | 7500 | E903 | 0009 | 7E83 | FED2 | 0374 | 0FE9 | 8E00 |
| 0000223500 | 7A06 | 263A | 3E83 | 29D7 | 7500 | E903 | 0050 | 46C7 |
| 0000223520 | 13D4 | FF00 | D876 | 76FF | 8DD6 | D446 | 5016 | 76FF |
| 0000223540 | FFE6 | F876 | 76FF | 8DF6 | DA4E | 5116 | 4E8D | 16EA |
| 0000223560 | 8D51 | CE4E | 5116 | 681E | 0B02 | 8568 | FF01 | DA36 |
| 0000223600 | FF0A | D836 | FF0A | DE36 | FF0A | DC36 | 9A0A | 2A1F |
| 0000223620 | 0000 | C483 | 8B28 | D446 | 27E9 | E902 | 0006 | 13B8 |
| 0000223640 | E900 | 021E | 006A | 76FF | C40A | EE5E | C426 | C09F |
| 0000223660 | 2600 | 478B | 4862 | 5EC4 | 26EE | 9FC4 | 00C0 | D22B |
| 0000223700 | F726 | 6477 | 6A40 | 5000 | 5EC4 | 26EE | 9FC4 | 00C0 |
| 0000223720 | FF26 | 6E77 | FF26 | 6C77 | 9E9A | D242 | 5228 | 9A50 |
| 0000223740 | 4338 | 2936 | 4689 | 89F2 | F456 | 468B | 8BF2 | F456 |
| 0000223760 | 5EC4 | 26EE | 9FC4 | 00C0 | 0326 | 7047 | D283 | B900 |
| 0000224000 | FFFF | E2D3 | 0326 | 7257 | 5052 | 5EC4 | 2606 | 77FF |
| 0000224020 | 2602 | 37FF | 5EC4 | 26EE | 9FC4 | 00C0 | 8B26 | 6247 |
| 0000224040 | C448 | EE5E | C426 | C09F | 2B00 | 26D2 | 77F7 | 4064 |
| 0000224060 | 006A | C450 | EE5E | C426 | C09F | 2600 | 77FF | 266E |
| 0000224100 | 77FF | 9A6C | 429E | 2975 | 006A | 76FF | C40A | EE5E |
| 0000224120 | C426 | C09F | 8B00 | 26C8 | 478B | 4862 | 5EC4 | 26EE |
| 0000224140 | 9FC4 | 00C0 | F28B | D22B | F726 | 6477 | 6A40 | 5000 |
| 0000224160 | 5EC4 | 26EE | 9FC4 | 00C0 | FF26 | 6E77 | FF26 | 6C77 |
| 0000224200 | F98B | 9E9A | 7C42 | 5229 | 9A50 | 4338 | 20C1 | 5EC4 |
| 0000224220 | 26EE | 9FC4 | 00C0 | 4689 | 89CA | CC56 | 8B26 | 6C47 |
| 0000224240 | 8B26 | 6E57 | 462B | 1BCA | CC56 | D63B | 037D | 10E9 |
| 0000224260 | 7E00 | E903 | 0007 | C73B | 0377 | 04E9 | 8B00 | 8BD6 |
| 0000224300 | 52C7 | 9A50 | A986 | 2478 | 068E | 3A78 | 8326 | 3C3E |
| 0000224320 | 002A | 0375 | 09E9 | 8300 | D27E | 74FE | E903 | 000F |
| 0000224340 | 068E | 3A7A | 8326 | 543E | 002A | 0375 | 50E9 | C700 |
| 0000224360 | D446 | 0000 | 76FF | FFD8 | D676 | 468D | 16D4 | FF50 |
| 0000224400 | E676 | 76FF | FFF8 | F676 | 4E8D | 16DA | 8D51 | EA4E |
| 0000224420 | 5116 | 4E8D | 16CE | 1E51 | 0268 | 680B | 018D | 36FF |
| 0000224440 | 0ADA | 36FF | 0AD8 | 36FF | 0ADE | 36FF | 0ADC | 9C9A |
| 0000224460 | 002A | 8300 | 28C4 | 468B | E9D4 | 0086 | 06E9 | B800 |
| 0000224500 | 0000 | 7DE9 | 8E00 | 7806 | 263A | 3E83 | 235A | 7500 |
| 0000224520 | E903 | 0009 | 7E83 | FED2 | 0374 | 0FE9 | 8E00 | 7A06 |
| 0000224540 | 263A | 3E83 | 2386 | 7500 | E903 | 0050 | 46C7 | 00D4 |
| 0000224560 | FF00 | D876 | 76FF | 8DD6 | D446 | 5016 | 76FF | FFE6 |
| 0000224600 | F876 | 76FF | 8DF6 | DA4E | 5116 | 4E8D | 16EA | 8D51 |
| 0000224620 | CE4E | 5116 | 681E | 0B02 | 9168 | FF01 | DA36 | FF0A |
| 0000224640 | D836 | FF0A | DE36 | FF0A | DC36 | 9A0A | 2452 | 0000 |
| 0000224660 | C483 | 8B28 | D446 | 09E9 | E900 | 0006 | 00B8 | E900 |
| 0000224700 | 0000 | 5E1F | 835F | 02ED | E58B | 5D1F | CA4D | 000C |
| 0000224720 | 581E | 4590 | 8B55 | 1EEC | D88E | EC81 | 002E | 5657 |
| 0000224740 | B81E | 233A | D88E | 46C7 | 15F6 | 8C0B | F85E | 46C7 |
| 0000224760 | 01EA | 2B01 | 89C0 | DC46 | 4689 | 8EDA | 7806 | 263A |
| 0000225000 | 3E83 | 2B7B | 7500 | E903 | 001D | 36FF | 0ADE | 36FF |
| 0000225020 | 0ADC | 468D | 16D2 | 9A50 | 2370 | 0000 | C483 | 3D08 |
| 0000225040 | 0000 | 0374 | 0FE9 | 8E00 | 7A06 | 263A | 3E83 | 2B93 |
| 0000225060 | 7500 | E903 | 003B | 681E | 0B1C | 468D | 16DE | 8D50 |
| 0000225100 | D246 | 5016 | 468D | 16EE | 6850 | 01B4 | 681E | 0B24 |
| 0000225120 | 36FF | 0ADA | 36FF | 0AD8 | 36FF | 0ADE | 36FF | 0ADC |
| 0000225140 | B99A | 0023 | 8300 | 1EC4 | 4689 | 89EE | F056 | 08E9 |
| 0000225160 | 2B00 | 89C0 | F046 | 4689 | 8BEE | 0846 | 460B | 7406 |
| 0000225200 | E903 | 007D | 068E | 3A78 | 8326 | 193E | 002C | 0375 |
| 0000225220 | 09E9 | 8300 | D67E | 74FE | E903 | 000F | 068E | 3A7A |
| 0000225240 | 8326 | 313E | 002C | 0375 | 50E9 | C700 | D846 | 0017 |

THU MAR 14 17:31:54 1991 DB_PI.DLL PAGE 82, LINE 4780

| | | | | | | | | |
|---|---|---|---|---|---|---|---|---|
| 0000225260 | 76FF | FFDC | DA76 | 468D | 16D8 | FF50 | EA76 | 76FF |
| 0000225300 | FFF8 | F676 | 4E8D | 16DE | 8D51 | EE4E | 5116 | 4E8D |
| 0000225320 | 16D2 | 1E51 | 2468 | 680B | 01BB | 36FF | 0ADA | 36FF |
| 0000225340 | 0AD8 | 36FF | DADE | 36FF | 0ADC | 7A9A | 002C | 8300 |
| 0000225360 | 28C4 | 468B | E9D8 | 03E3 | 06E9 | B800 | 0017 | DAE9 |
| 0000225400 | 8D03 | FA46 | 5016 | 026A | 76FF | FF0E | 0C76 | 649A |
| 0000225420 | A1CF | 832C | DAC4 | 4689 | 83EC | EC7E | 7500 | E903 |
| 0000225440 | 007E | 068E | 3A78 | 8326 | B93E | 002C | 0375 | 09E9 |
| 0000225460 | 8300 | D67E | 74FE | E903 | 000F | 068E | 3A7A | 8326 |
| 0000225500 | D13E | 002C | 0375 | 51E9 | 8B00 | EC46 | 4689 | FFD8 |
| 0000225520 | DC76 | 76FF | 8DDA | D846 | 5016 | 76FF | FFEA | F876 |
| 0000225540 | 76FF | 8DF6 | DE4E | 5116 | 4E8D | 16EE | 8D51 | D24E |
| 0000225560 | 5116 | 681E | 0B24 | BF68 | FF01 | DA36 | FF0A | D836 |
| 0000225600 | FF0A | DE36 | FF0A | DC36 | 9A0A | 2D1A | 0000 | C483 |
| 0000225620 | 8B28 | D846 | [illegible]4E9 | E903 | 0006 | 468B | E9EC | 033B |
| 0000225640 | 468D | 16F2 | FF50 | 0A76 | 76FF | FF0E | 0C76 | 2D9A |
| 0000225660 | B6E1 | 8329 | 0AC4 | 4689 | 83EC | EC7E | 7500 | E903 |
| 0000225700 | 007E | 068E | 3A78 | 8326 | 603E | 002D | 0375 | 09E9 |
| 0000225720 | 8300 | D67E | 74FE | E903 | 000F | 068E | 3A7A | 8326 |
| 0000225740 | 783E | 002D | 0375 | 51E9 | 8B00 | EC46 | 4689 | FFD8 |
| 0000225760 | DC76 | 76FF | 8DDA | D846 | 5016 | 76FF | FFEA | F876 |
| 0000226000 | 76FF | 8DF6 | DE4E | 5116 | 4E8D | 16EE | 8D51 | D24E |
| 0000226020 | 5116 | 681E | 0B24 | C368 | FF01 | DA36 | FF0A | D836 |
| 0000226040 | FF0A | DE36 | FF0A | DC36 | 9A0A | 2DC0 | 0000 | C483 |
| 0000226060 | 8B28 | D846 | A4E9 | E902 | 0006 | 468B | E9EC | 029B |
| 0000226100 | 5EC4 | 26F2 | 7F80 | 0030 | 0374 | 99E9 | C400 | F25E |
| 0000226120 | 8326 | C8BF | 0000 | 0375 | 8BE9 | C400 | F25E | 8326 |
| 0000226140 | F4BF | 0000 | 0375 | 7DE9 | 8E00 | 7806 | 263A | 3E83 |
| 0000226160 | 2DEA | 7500 | E903 | 0009 | 7E83 | FED6 | 0374 | 0FE9 |
| 0000226200 | 8E00 | 7A06 | 263A | 3E83 | 2E02 | 7500 | E903 | 0050 |
| 0000226220 | 46C7 | A1D8 | FF01 | DC76 | 76FF | 8DDA | D846 | 5016 |
| 0000226240 | 76FF | FFEA | F876 | 76FF | 8DF6 | DE4E | 5116 | 4E8D |
| 0000226260 | 16EE | 8D51 | D24E | 5116 | 681E | 0B24 | C568 | FF01 |
| 0000226300 | DA36 | FF0A | D836 | FF0A | DE36 | FF0A | DC36 | 9A0A |
| 0000226320 | 2E4A | 0000 | C483 | 8B28 | D846 | FEE9 | E901 | 0006 |
| 0000226340 | A1B8 | E901 | 01F5 | 5EC4 | 26F2 | 7F83 | 0002 | 0375 |
| 0000226360 | 7DE9 | 8E00 | 7806 | 263A | 3E83 | 277A | 7500 | E903 |
| 0000226400 | 0009 | 7E83 | FED6 | 0374 | 0FE9 | 8E00 | 7A06 | 263A |
| 0000226420 | 3E83 | 2792 | 7500 | E903 | 0050 | 46C7 | A6D8 | FF01 |
| 0000226440 | DC76 | 76FF | 8DDA | D846 | 5016 | 76FF | FFEA | F876 |
| 0000226460 | 76FF | 8DF6 | DE4E | 5116 | 4E8D | 16EE | 8D51 | D24E |
| 0000226500 | 5116 | 681E | 0B24 | C868 | FF01 | DA36 | FF0A | D836 |
| 0000226520 | FF0A | DE36 | FF0A | DC36 | 9A0A | 27DB | 0000 | C483 |
| 0000226540 | 8B28 | D846 | 74E9 | E901 | 0006 | A6B8 | E901 | 016B |
| 0000226560 | 5EC4 | 26F2 | 878B | 00D2 | 0B26 | D087 | 7500 | E903 |
| 0000226600 | 00B3 | 5EC4 | 26F2 | B7FF | 00D2 | FF26 | D0B7 | FF00 |
| 0000226620 | 0876 | 76FF | 8B06 | F246 | 568B | 05F4 | 000C | 5052 |
| 0000226640 | F89A | 2F22 | 8327 | 0CC4 | 4689 | 83EC | EC7E | 7500 |
| 0000226660 | E903 | 007E | 068E | 3A78 | 8326 | 553E | 002F | 0375 |
| 0000226700 | 09E9 | 8300 | D67E | 74FE | E903 | 000F | 068E | 3A7A |
| 0000226720 | 8326 | 6D3E | 002F | 0375 | 51E9 | 8B00 | EC46 | 4689 |
| 0000226740 | FFD8 | DC76 | 76FF | 8DDA | D846 | 5016 | 76FF | FFEA |
| 0000226760 | F876 | 76FF | 8DF6 | DE4E | 5116 | 4E8D | 16EE | 8D51 |
| 0000227000 | D24E | 5116 | 681E | 0B24 | CF68 | FF01 | DA36 | FF0A |
| 0000227020 | D836 | FF0A | DE36 | FF0A | DC36 | 9A0A | 2FB5 | 0000 |
| 0000227040 | C483 | 8B28 | D846 | B2E9 | E900 | 0006 | 468B | E9EC |
| 0000227060 | 00A9 | 29E9 | C400 | F25E | C426 | C09F | 2600 | 77FF |
| 0000227100 | 266A | 77FF | FF68 | 0876 | 76FF | C406 | F25E | C426 |
| 0000227120 | C09F | 6A00 | 2600 | 77FF | 9A66 | A986 | 2C01 | 068E |

THU MAR 14 17:31:54 1991 DB_PI.DLL PAGE 83, LINE 4839

| | | | | | | | | |
|---|---|---|---|---|---|---|---|---|
| 0000227140 | 3A78 | 8326 | F23E | 002A | 0375 | 09E9 | 8300 | D67E |
| 0000227160 | 74FE | E903 | 000F | 068E | 3A7A | 8326 | 1E3E | 002B |
| 0000227200 | 0375 | 50E9 | C700 | D846 | 0000 | 76FF | FFDC | DA76 |
| 0000227220 | 468D | 16D8 | FF50 | EA76 | 76FF | FFF8 | F676 | 4E8D |
| 0000227240 | 16DE | 8D51 | EE4E | 5116 | 4E8D | 16D2 | 1E51 | 2468 |
| 0000227260 | 680B | 01D9 | 36FF | 0ADA | 36FF | 0AD8 | 36FF | 0ADE |
| 0000227300 | 36FF | 0ADC | DB9A | 002B | 8300 | 28C4 | 468B | E9D8 |
| 0000227320 | 0009 | 06E9 | B800 | 0000 | 00E9 | 1F00 | 5F5E | ED83 |
| 0000227340 | 8B02 | 1FE5 | 4D5D | 0ACA | 1E00 | 9058 | 5545 | EC8B |
| 0000227360 | 8E1E | 81D8 | ECEC | 5700 | 1E56 | D2B8 | 8E2A | C7D8 |
| 0000227400 | F646 | 0B35 | 5E8C | C7F8 | 3686 | 01FF | 2B01 | 89C0 |
| 0000227420 | 2886 | 89FF | 2686 | 8EFF | 7806 | 263A | 3E83 | 2EAB |
| 0000227440 | 7500 | E903 | 001E | 36FF | 0ADE | 36FF | 0ADC | 868D |
| 0000227460 | FF1E | 5016 | 089A | 002B | 8300 | 08C4 | 003D | 7400 |
| 0000227500 | E903 | 000F | 068E | 3A7A | 8326 | C33E | 002E | 0375 |
| 0000227520 | 3DE9 | 1E00 | 3C68 | 8D0B | 2A86 | 16FF | 8D50 | 1E86 |
| 0000227540 | 16FF | 8D50 | EE46 | 5016 | FC68 | 1E01 | 4468 | FF0B |
| 0000227560 | DA36 | FF0A | D836 | FF0A | DE36 | FF0A | DC36 | 9A0A |
| 0000227600 | 2B51 | 0000 | C483 | 891E | EE46 | 5689 | E9F0 | 0008 |
| 0000227620 | C02B | 4689 | 89F0 | EE46 | 86C7 | FF1C | 0000 | 468B |
| 0000227640 | 0B0C | 0A46 | 0374 | 86E9 | 8E00 | 7806 | 263A | 3E83 |
| 0000227660 | 3147 | 7500 | E903 | 000A | BE83 | FF22 | 74FE | E903 |
| 0000227700 | 000F | 068E | 3A7A | 8326 | 603E | 0031 | 0375 | 58E9 |
| 0000227720 | C700 | 2486 | 17FF | FF00 | 28B6 | FFFF | 26B6 | 8DFF |
| 0000227740 | 2486 | 16FF | FF50 | 36B6 | FFFF | F876 | 76FF | 8DF6 |
| 0000227760 | 2A8E | 16FF | 8D51 | EE4E | 5116 | 8E8D | FF1E | 5116 |
| 0000230000 | 681E | 0B44 | 0868 | FF02 | DA36 | FFCA | D836 | FF0A |
| 0000230020 | DE36 | FF0A | DC36 | 9A0A | 31B0 | 0000 | C483 | 8B28 |
| 0000230040 | 2486 | E9FF | 0957 | 06E9 | B800 | 0017 | 4EE9 | 8D09 |
| 0000230060 | FA46 | 5016 | 026A | 76FF | FF12 | 1076 | 649A | D8CF |
| 0000230100 | 8331 | 0AC4 | 4689 | 83EC | EC7E | 7500 | E903 | 0087 |
| 0000230120 | 068E | 3A78 | 8326 | F03E | 0031 | 0375 | 0AE9 | 8300 |
| 0000230140 | 22BE | FEFF | 0374 | 0FE9 | 8E00 | 7A06 | 263A | 3E83 |
| 0000230160 | 3209 | 7500 | E903 | 0059 | 468B | 89EC | 2486 | FFFF |
| 0000230200 | 28B6 | FFFF | 26B6 | 8DFF | 2486 | 16FF | FF50 | 36B6 |
| 0000230220 | FFFF | F876 | 76FF | 8DF6 | 2A8E | 16FF | 8D51 | EE4E |
| 0000230240 | 5116 | 8E8D | FF1E | 5116 | 681E | 0B44 | 0D68 | FF02 |
| 0000230260 | DA36 | FF0A | D836 | FF0A | DE36 | FF0A | DC36 | 9A0A |
| 0000230300 | 3259 | 0000 | C483 | 8B28 | 2486 | E9FF | 08AF | 06E9 |
| 0000230320 | 8B00 | EC46 | A6E9 | 8D08 | F246 | 5016 | 76FF | FF0E |
| 0000230340 | 1276 | 76FF | 9A10 | E12D | 2F4C | C483 | 890A | EC46 |
| 0000230360 | 7E83 | 00EC | 0375 | 87E9 | 8E00 | 7806 | 263A | 3E83 |
| 0000230400 | 3284 | 7500 | E903 | 000A | BE83 | FF22 | 74FE | E903 |
| 0000230420 | 000F | 068E | 3A7A | 8326 | 9D3E | 0032 | 0375 | 59E9 |
| 0000230440 | 8B00 | EC46 | 8689 | FF24 | B6FF | FF28 | B6FF | FF26 |
| 0000230460 | 868D | FF24 | 5016 | B6FF | FF36 | 76FF | FFF8 | F676 |
| 0000230500 | 8E8D | FF2A | 5116 | 4E8D | 16EE | 8D51 | 1E8E | 16FF |
| 0000230520 | 1E51 | 4468 | 680B | 0212 | 36FF | 0ADA | 36FF | 0AD8 |
| 0000230540 | 36FF | 0ADE | 36FF | 0ADC | EC9A | 0032 | 8300 | 28C4 |
| 0000230560 | 868B | FF24 | 06E9 | E908 | 0006 | 468B | E9EC | 07FD |
| 0000230600 | 5EC4 | 26F2 | 7F83 | 0002 | 0375 | 86E9 | 8E00 | 7806 |
| 0000230620 | 263A | 3E83 | 3333 | 7500 | E903 | 000A | BE83 | FF22 |
| 0000230640 | 74FE | E903 | 000F | 068E | 3A7A | 8326 | 4C3E | 0033 |
| 0000230660 | 0375 | 58E9 | C700 | 2486 | A6FF | FF01 | 28B6 | FFFF |
| 0000230700 | 26B6 | 8DFF | 2486 | 16FF | FF50 | 36B6 | FFFF | F876 |
| 0000230720 | 76FF | 8DF6 | 2A8E | 16FF | 8D51 | EE4E | 5116 | 8E8D |
| 0000230740 | FF1E | 5116 | 681E | 0B44 | 1568 | FF02 | DA36 | FF0A |
| 0000230760 | D836 | FF0A | DE36 | FF0A | DC36 | 9AGA | 339B | 0000 |
| 0000231000 | C483 | 8B28 | 2486 | E9FF | 0773 | 06E9 | B800 | 01A6 |

THU MAR 14 17:31:54 1991 DB_PI.DLL PAGE 84, LINE 4898

| | | | | | | | | |
|---|---|---|---|---|---|---|---|---|
| 0000231020 | 6AE9 | C407 | F25E | 8026 | 307F | 7400 | E903 | 00A2 |
| 0000231040 | 5EC4 | 26F2 | BF83 | 00C8 | 7500 | E903 | 0094 | 5EC4 |
| 0000231060 | 26F2 | BF83 | 0DF4 | 7500 | E903 | 0086 | 068E | 3A78 |
| 0000231100 | 8326 | DE3E | 0033 | 0375 | 0AE9 | 8300 | 22BE | FEFF |
| 0000231120 | 0374 | 0FE9 | 8E00 | 7A06 | 263A | 3E83 | 33F7 | 7500 |
| 0000231140 | E903 | 0058 | 86C7 | FF24 | 01A1 | B6FF | FF28 | B6FF |
| 0000231160 | FF26 | 868D | FF24 | 5016 | B6FF | FF36 | 76FF | FFF8 |
| 0000231200 | F676 | 8E8D | FF2A | 5116 | 4E8D | 16EE | 8D51 | 1E8E |
| 0000231220 | 16FF | 1E51 | 4468 | 680B | 0217 | 36FF | 0ADA | 36FF |
| 0000231240 | 0AD8 | 36FF | 0ADE | 36FF | 0ADC | 0C9A | 002F | 8300 |
| 0000231260 | 28C4 | 868B | FF24 | C4E9 | E906 | 0006 | A1B8 | E901 |
| 0000231300 | 06BB | 5EC4 | 26F2 | BF83 | 00C8 | 7500 | E903 | 009E |
| 0000231320 | 76FF | 9A0E | 2809 | 2E93 | C483 | 8902 | EC46 | 7E83 |
| 0000231340 | 00EC | 0375 | 87E9 | 8E00 | 7806 | 263A | 3E83 | 300E |
| 0000231360 | 7500 | E903 | 000A | BE83 | FF22 | 74FE | E903 | 000F |
| 0000231400 | 068E | 3A7A | 8326 | 3B3E | 0030 | 0375 | 59E9 | 8B00 |
| 0000231420 | EC46 | 8689 | FF24 | B6FF | FF28 | B6FF | FF26 | 868D |
| 0000231440 | FF24 | 5016 | B6FF | FF36 | 76FF | FFF8 | F676 | 8E8D |
| 0000231460 | FF2A | 5116 | 4E8D | 16EE | 8D51 | 1E8E | 16FF | 1E51 |
| 0000231500 | 4468 | 680B | 021B | 36FF | 0ADA | 36FF | 0AD8 | 36FF |
| 0000231520 | 0ADE | 36FF | 0ADC | 6E9A | 0035 | 8300 | 28C4 | 868B |
| 0000231540 | FF24 | 18E9 | E906 | 0006 | 468B | E9EC | 060F | 5EC4 |
| 0000231560 | 260A | 77FF | 2602 | 37FF | CA9A | 8C33 | 8334 | 04C4 |
| 0000231600 | 5EC4 | 2B0A | 26C0 | 4789 | 2602 | 0789 | 5EC4 | 26F2 |
| 0000231620 | B7FF | 00FC | FF26 | FAB7 | 9A00 | 33CA | 28CB | C483 |
| 0000231640 | C404 | F25E | C02B | 8926 | FC87 | 2600 | 8789 | 00FA |
| 0000231660 | 468B | 8BF2 | F456 | 0C05 | 8900 | 1486 | 89FF | 1696 |
| 0000231700 | C4FF | F25E | 8B26 | D287 | 2600 | 870B | 00D0 | 0375 |
| 0000231720 | C2E9 | C400 | F25E | FF26 | D2B7 | 2600 | B7FF | 00D0 |
| 0000231740 | B6FF | FF16 | B6FF | FF14 | 769A | B621 | 8335 | 08C4 |
| 0000231760 | 4689 | 83EC | EC7E | 7500 | E903 | 0099 | 76FF | FF12 |
| 0000232000 | 1076 | 76FF | 6A0E | 6A00 | 9A00 | 3A7B | 35F8 | 068E |
| 0000232020 | 3A78 | 8326 | 013E | 0036 | 0375 | 0AE9 | 8300 | 22BE |
| 0000232040 | FEFF | 0374 | 0FE9 | 8E00 | 7A06 | 263A | 3E83 | 361A |
| 0000232060 | 7500 | E903 | 0059 | 468B | 89EC | 2486 | FFFF | 28B6 |
| 0000232100 | FFFF | 26B6 | 8DFF | 2486 | 16FF | FF50 | 36B6 | FFFF |
| 0000232120 | F876 | 76FF | 8DF6 | 2A8E | 16FF | 8D51 | EE4E | 5116 |
| 0000232140 | 8E8D | FF1E | 5116 | 681E | 0B44 | 2A68 | FF02 | DA36 |
| 0000232160 | FF0A | D836 | FF0A | DE36 | FF0A | DC36 | 9A0A | 366A |
| 0000232200 | 0000 | C483 | 8B28 | 2486 | E9FF | 04F1 | 06E9 | 8B00 |
| 0000232220 | EC46 | E8E9 | 8D04 | 3886 | 16FF | 6A50 | C400 | 149E |
| 0000232240 | 26FF | 77FF | 2602 | 37FF | 9EC4 | FF14 | FF26 | 4877 |
| 0000232260 | 868B | FF14 | 968B | FF16 | 0405 | 5200 | FF50 | FC76 |
| 0000232300 | 76FF | 9AFA | 0166 | 33C6 | C483 | 8914 | EC46 | 7E83 |
| 0000232320 | 00EC | 0375 | BDE9 | 8100 | EC7E | 01AB | 0374 | 17E9 |
| 0000232340 | C400 | F25E | C726 | C687 | 0000 | 2B00 | 89C0 | 1A86 |
| 0000232360 | 89FF | 1886 | E9FF | 0099 | 76FF | FF12 | 1076 | 76FF |
| 0000232400 | 6A0E | 6A00 | 9A00 | 3A7B | 36A2 | 068E | 3A78 | 8326 |
| 0000232420 | AB3E | 0036 | 0375 | 0AE9 | 8300 | 22BE | FEFF | 0374 |
| 0000232440 | 0FE9 | 8E00 | 7A06 | 263A | 3E83 | 36C4 | 7500 | E903 |
| 0000232460 | 0059 | 468B | 89EC | 2486 | FFFF | 28B6 | FFFF | 26B6 |
| 0000232500 | 8DFF | 2486 | 16FF | FF50 | 36B6 | FFFF | F876 | 76FF |
| 0000232520 | 8DF6 | 2A8E | 16FF | 8D51 | EE4E | 5116 | 8E8D | FF1E |
| 0000232540 | 5116 | 681E | 0B44 | 3B68 | FF02 | DA36 | FF0A | D836 |
| 0000232560 | FF0A | DE36 | FF0A | DC36 | 9A0A | 3713 | 0000 | C483 |
| 0000232600 | 8B28 | 2486 | E9FF | 03F5 | 06E9 | 8B00 | EC46 | ECE9 |
| 0000232620 | E903 | 00B2 | 5EC4 | 26F2 | BF83 | 00C6 | 7400 | E903 |
| 0000232640 | 0098 | 76FF | FF12 | 1076 | 76FF | 6A0E | 6A00 | 9A00 |
| 0000232660 | 3A7B | 3774 | 068E | 3A78 | 8326 | BD3E | 0037 | 0375 |

THU MAR 14 17:31:54 1991  DB_PI.DLL  PAGE 85, LINE 4957

| | | | | | | | | |
|---|---|---|---|---|---|---|---|---|
| 0000232700 | 0AE9 | 8300 | 22BE | FEFF | 0374 | 0FE9 | 8E00 | 7A06 |
| 0000232720 | 263A | 3E83 | 37D6 | 7500 | E903 | 0058 | 86C7 | FF24 |
| 0000232740 | 01AA | B6FF | FF28 | B6FF | FF26 | 868D | FF24 | 5016 |
| 0000232760 | B6FF | FF36 | 76FF | FFF8 | F676 | 8E8D | FF2A | 5116 |
| 0000233000 | 4E8D | 16EE | 8D51 | 1E8E | 16FF | 1E51 | 4468 | 680B |
| 0000233020 | 0241 | 36FF | 0ADA | 36FF | 0AD8 | 36FF | 0ADE | 36FF |
| 0000233040 | 0ADC | 089A | 0031 | 8300 | 28C4 | 868B | FF24 | 4CE9 |
| 0000233060 | E903 | 0006 | AAB8 | E901 | 0343 | 868D | FF5C | 8689 |
| 0000233100 | FF18 | 968C | FF1A | 5EC4 | 26F2 | 878B | 00D2 | 0B26 |
| 0000233120 | D087 | 7500 | E903 | 0037 | B6FF | FF16 | B6FF | FF14 |
| 0000233140 | 5EC4 | 26F2 | B7FF | 00C6 | 468B | 8BF2 | F456 | D405 |
| 0000233160 | 5200 | FF50 | 1AB6 | FFFF | 18B6 | FFFF | FC76 | 76FF |
| 0000233200 | 9AFA | 70E9 | 37A5 | C483 | 8912 | EC46 | F0E9 | C400 |
| 0000233220 | F25E | FF26 | C2B7 | 2600 | B7FF | 00C0 | 5EC4 | 26F2 |
| 0000233240 | B7FF | 00C6 | B6FF | FF1A | B6FF | FF18 | 76FF | FFFC |
| 0000233260 | FA76 | 379A | 2F73 | 8331 | 0EC4 | 4689 | 83EC | EC7E |
| 0000233300 | 7500 | E903 | 0087 | 068E | 3A78 | 8326 | A03E | 0030 |
| 0000233320 | 0375 | DAE9 | 8300 | 22BE | FEFF | 0374 | 0FE9 | 8E00 |
| 0000233340 | 7A06 | 263A | 3E83 | 30B9 | 7500 | E903 | 0059 | 468B |
| 0000233360 | 89EC | 2486 | FFFF | 28B6 | FFFF | 26B6 | 8DFF | 2486 |
| 0000233400 | 16FF | FF50 | 36B6 | FFFF | F876 | 76FF | 8DF6 | 2A8E |
| 0000233420 | 16FF | 8D51 | EE4E | 5116 | 8E8D | FF1E | 5116 | 681E |
| 0000233440 | 0B44 | 5668 | FF02 | DA36 | FF0A | D836 | FF0A | DE36 |
| 0000233460 | FF0A | DC36 | 9A0A | 38FA | 0000 | C483 | 8B28 | 2486 |
| 0000233500 | E9FF | 0239 | 06E9 | 8B00 | EC46 | 30E9 | C402 | F25E |
| 0000233520 | C426 | C09F | 2600 | 078B | 8B26 | 0257 | 9EC4 | FF14 |
| 0000233540 | 8926 | 2607 | 5789 | FF02 | 1276 | 76FF | C410 | F25E |
| 0000233560 | FF26 | C2B7 | 2600 | B7FF | 00C0 | 249A | 85BB | 831F |
| 0000233600 | EC7E | 7500 | E903 | 0099 | 76FF | FF12 | 1076 | 76FF |
| 0000233620 | 6A0E | 6A00 | 9A00 | 3A7B | 394C | 068E | 3A78 | 8326 |
| 0000233640 | 643E | 0039 | 0375 | 0AE9 | 8300 | 22BE | FEFF | 0374 |
| 0000233660 | 0FE9 | 8E00 | 7A06 | 263A | 3E83 | 397D | 7500 | E903 |
| 0000233700 | 0059 | 468B | 89EC | 2486 | FFFF | 28B6 | FFFF | 26B6 |
| 0000233720 | 8DFF | 2486 | 16FF | FF50 | 36B6 | FFFF | F876 | 76FF |
| 0000233740 | 8DF6 | 2A8E | 16FF | 8D51 | EE4E | 5116 | 8E8D | FF1E |
| 0000233760 | 5116 | 681E | 0B44 | 5E68 | FF02 | DA36 | FF0A | D836 |
| 0000234000 | FF0A | DE36 | FF0A | DC36 | 9A0A | 39CD | 0000 | C483 |
| 0000234020 | 8B28 | 2486 | E9FF | 0165 | 06E9 | 8B00 | EC46 | 5CE9 |
| 0000234040 | C401 | F25E | 8326 | C8BF | 0000 | 0375 | 0CE9 | C400 |
| 0000234060 | F25E | 8B26 | F487 | 8900 | 1C86 | C4FF | 149E | 26FF |
| 0000234100 | 078B | 8B26 | 0257 | 5EC4 | 2606 | 0789 | 8926 | 0257 |
| 0000234120 | 76FF | FF0E | 1276 | 76FF | 9A10 | E21A | 34FC | C483 |
| 0000234140 | 8906 | EC46 | 7E83 | 00EC | 0375 | 87E9 | 8E00 | 7806 |
| 0000234160 | 263A | 3E83 | 3505 | 7500 | E903 | 000A | BE83 | FF22 |
| 0000234200 | 74FE | E903 | 000F | 068E | 3A7A | 8326 | 1E3E | 0035 |
| 0000234220 | 0375 | 59E9 | 8B00 | EC46 | 8689 | FF24 | B6FF | FF28 |
| 0000234240 | B6FF | FF26 | 868D | FF24 | 5016 | B6FF | FF36 | 76FF |
| 0000234260 | FFF8 | F676 | 8E8D | FF2A | 5116 | 4E8D | 16EE | 8D51 |
| 0000234300 | 1E8E | 16FF | 1E51 | 4468 | 680B | 026C | 36FF | 0ADA |
| 0000234320 | 36FF | 0AD8 | 36FF | 0ADE | 36FF | 0ADC | 479A | 0034 |
| 0000234340 | 8300 | 28C4 | 868B | FF24 | 92E9 | E900 | 0006 | 468B |
| 0000234360 | E9EC | 0089 | 068E | 3A78 | 8326 | 913E | 003B | 0375 |
| 0000234400 | 0AE9 | 8300 | 22BE | FEFF | 0374 | 0FE9 | 8E00 | 7A06 |
| 0000234420 | 263A | 3E83 | 38AA | 7500 | E903 | 005A | 868B | FF1C |
| 0000234440 | 8689 | FF24 | D5FF | FF28 | B6FF | FF26 | 868D | FF24 |
| 0000234460 | 5016 | B6FF | FF36 | 76FF | FFF8 | F676 | 8E8D | FF2A |
| 0000234500 | 5116 | 4E8D | 16EE | 8D51 | 1E8E | 16FF | 1E51 | 4468 |
| 0000234520 | 680B | 026F | 36FF | 0ADA | 36FF | 0AD8 | 36FF | 0ADE |
| 0000234540 | 36FF | 0ADC | 269A | 0038 | 8300 | 28C4 | 868B | FF24 |

THU MAR 14 17:31:54 1991 DB_PI.DLL PAGE 86, LINE 5016

| | | | | | | | | |
|---|---|---|---|---|---|---|---|---|
| 0000234560 | 0AE9 | E900 | 0007 | 868B | FF1C | 00E9 | 1F00 | 5F5E |
| 0000234600 | ED83 | 8B02 | 1FE5 | 4D5D | 0ECA | 1E00 | 9058 | 5545 |
| 0000234620 | EC8B | 8E1E | 81D8 | 2AEC | 5701 | 1E56 | EBB8 | 8E2F |
| 0000234640 | C7D8 | FA46 | 0B55 | 5E8C | C7FC | EE46 | 0101 | C02B |
| 0000234660 | 4689 | 89E0 | DE46 | 068E | 3A78 | 8326 | 4F3E | 003B |
| 0000234700 | 0375 | 1EE9 | FF00 | DE36 | FF0A | DC36 | 8D0A | D686 |
| 0000234720 | 16FE | 9A50 | 3025 | 0000 | C483 | 3D08 | 0000 | 0374 |
| 0000234740 | 0FE9 | 8E00 | 7A06 | 263A | 3E83 | 3B68 | 7500 | E903 |
| 0000234760 | 003C | 681E | 0B5C | 468D | 16E2 | 8D50 | D686 | 16FE |
| 0000235000 | 8D50 | F246 | 5016 | 9068 | 1E02 | 6668 | FF0B | DA36 |
| 0000235020 | FF0A | D836 | FF0A | DE36 | FF0A | DC36 | 9A0A | 3070 |
| 0000235040 | 0000 | C483 | 891E | F246 | 5689 | E9F4 | 0008 | C02B |
| 0000235060 | 4689 | 89F4 | F246 | 468D | 16F6 | FF50 | 0A76 | 76FF |
| 0000235100 | FF0E | 0C76 | 2D9A | 88E1 | 8338 | 0AC4 | 4689 | 83F0 |
| 0000235120 | F07E | 7500 | E903 | 0083 | 068E | 3A78 | 8326 | F73E |
| 0000235140 | 003B | 0375 | 0AE9 | 8300 | DABE | FEFE | 0374 | 0FE9 |
| 0000235160 | 8E00 | 7A06 | 263A | 3E83 | 3C10 | 7500 | E903 | 0055 |
| 0000235200 | 468B | 89F0 | DC86 | FFFE | E076 | 76FF | 8DDE | DC86 |
| 0000235220 | 16FE | FF50 | EE76 | 76FF | FFFC | FA76 | 4E8D | 16E2 |
| 0000235240 | 8D51 | F24E | 5116 | 8E8D | FED6 | 5116 | 681E | 0B66 |
| 0000235260 | 9A68 | FF02 | DA36 | FF0A | D836 | FF0A | DE36 | FF0A |
| 0000235300 | DC36 | 9A0A | 3C5C | 0000 | C483 | 8B28 | DC86 | E9FE |
| 0000235320 | 0462 | 06E9 | 8B00 | F046 | 59E9 | C404 | F65E | 8326 |
| 0000235340 | C8BF | 0000 | 0375 | 9AE9 | FF00 | 0A76 | 099A | FA28 |
| 0000235360 | 833C | 02C4 | 4689 | 83F0 | F07E | 7500 | E903 | 0083 |
| 0000235400 | 068E | 3A78 | 8326 | 633E | 003D | 0375 | 0AE9 | 8300 |
| 0000235420 | DABE | FEFE | 0374 | 0FE9 | 8E00 | 7A06 | 263A | 3E83 |
| 0000235440 | 3D7C | 7500 | E903 | 0055 | 468B | 89F0 | DC86 | FFFE |
| 0000235460 | E076 | 76FF | 8DDE | DC86 | 16FE | FF50 | EE76 | 76FF |
| 0000235500 | FFFC | FA76 | 4E8D | 16E2 | 8D51 | F24E | 5116 | 8E8D |
| 0000235520 | FED6 | 5116 | 681E | 0B66 | A068 | FF02 | DA36 | FF0A |
| 0000235540 | D836 | FF0A | DE36 | FF0A | DC36 | 9A0A | 3DC7 | 0000 |
| 0000235560 | C483 | 8B28 | DC86 | E9FE | 03BA | 06E9 | 8B00 | F046 |
| 0000235600 | B1E9 | C403 | F65E | 8A26 | 5467 | C02A | 5EC4 | 26F6 |
| 0000235620 | 4703 | 2608 | 578B | 2D0A | 7486 | 5052 | 868D | FEDE |
| 0000235640 | 5016 | 509A | A727 | 833C | 08C4 | 681E | 0B63 | 868D |
| 0000235660 | FEDE | 5016 | 0A9A | C027 | 833C | 08C4 | 468B | 8BF6 |
| 0000235700 | F856 | D405 | 5200 | 8D50 | DE86 | 16FE | 9A50 | 270A |
| 0000235720 | 3D40 | C483 | C408 | F65E | 8326 | 027F | 7500 | E903 |
| 0000235740 | 0030 | 5EC4 | 26F6 | 7F80 | 0030 | 0375 | 23E9 | C400 |
| 0000235760 | F65E | FF26 | CEB7 | 2600 | B7FF | 00CC | 468B | 8BF6 |
| 0000236000 | F856 | 0C05 | 5200 | 9A50 | 2176 | 3D2F | C483 | 8908 |
| 0000236020 | F046 | 5EC4 | 26F6 | 878B | 00D2 | 0B26 | D087 | 7500 |
| 0000236040 | E903 | 01E3 | 5EC4 | 26F6 | B7FF | 00D2 | FF26 | D0B7 |
| 0000236060 | 8B00 | F646 | 568B | 05F8 | 000C | 5052 | 769A | DB21 |
| 0000236100 | 8334 | 08C4 | 4689 | 8DF0 | DE86 | 16FE | 9A50 | 421C |
| 0000236120 | 3D50 | C483 | 3D04 | 0000 | 0375 | AAE9 | 9A01 | 04F6 |
| 0000236140 | 346B | C28E | D88B | 8B26 | E907 | 0189 | 068E | 3A78 |
| 0000236160 | 8326 | E53E | 003D | 0375 | 0AE9 | 8300 | DABE | FEFE |
| 0000236200 | 0374 | 0FE9 | 8E00 | 7A06 | 263A | 3E83 | 3DFE | 7500 |
| 0000236220 | E903 | 0054 | 86C7 | FEDC | 01A4 | 76FF | FFE0 | DE76 |
| 0000236240 | 868D | FEDC | 5016 | 76FF | FFEE | FC76 | 76FF | 8DFA |
| 0000236260 | E24E | 5116 | 4E8D | 16F2 | 8D51 | D68E | 16FE | 1E51 |
| 0000236300 | 6668 | 680B | 02B4 | 36FF | 0ADA | 36FF | 0AD8 | 36FF |
| 0000236320 | 0ADE | 36FF | 0ADC | 559A | 003A | 8300 | 28C4 | 868D |
| 0000236340 | FEDC | 4FE9 | E902 | 0006 | A4B8 | E901 | 0246 | 068E |
| 0000236360 | 3A78 | 8326 | EB3E | 0039 | 0375 | 0AE9 | 8300 | DABE |
| 0000236400 | FEFE | 0374 | 0FE9 | 8E00 | 7A06 | 263A | 3E83 | 3A04 |
| 0000236420 | 7500 | E903 | 0054 | 86C7 | FEDC | 01B7 | 76FF | FFE0 |

THU MAR 14 17:31:54 1991 DB_PI.DLL PAGE 87, LINE 5075

| | | | | | | | | |
|---|---|---|---|---|---|---|---|---|
| 0000236440 | DE76 | 868D | FEDC | 5016 | 76FF | FFEE | FC76 | 76FF |
| 0000236460 | 8DFA | E24E | 5116 | 4E8D | 16F2 | 8D51 | D68E | 16FE |
| 0000236500 | 1E51 | 6668 | 680B | 02B6 | 36FF | 0ADA | 36FF | 0AD8 |
| 0000236520 | 36FF | 0ADE | 36FF | 0ADC | CB9A | 003E | 8300 | 28C4 |
| 0000236540 | 868B | FEDC | CDE9 | E901 | 0006 | B7B8 | E901 | 01C4 |
| 0000236560 | 068E | 3A78 | 8326 | A83E | 003F | 0375 | 0AE9 | 8300 |
| 0000236600 | DABE | FEFE | 0374 | 0FE9 | 8E00 | 7A06 | 263A | 3E83 |
| 0000236620 | 3FC1 | 7500 | E903 | 0054 | 86C7 | FEDC | 000A | 76FF |
| 0000236640 | FFE0 | DE76 | 868D | FEDC | 5016 | 76FF | FFEE | FC76 |
| 0000236660 | 76FF | 8DFA | E24E | 5116 | 4E8D | 16F2 | 8D51 | D68E |
| 0000236700 | 16FE | 1E51 | 6668 | 680B | 02B8 | 36FF | 0ADA | 36FF |
| 0000236720 | 0AD8 | 36FF | 0ADE | 36FF | 0ADC | 0D9A | 0040 | 8300 |
| 0000236740 | 28C4 | 868B | FEDC | 4BE9 | E901 | 0006 | 0AB8 | E900 |
| 0000236760 | 0142 | 12E9 | 4800 | 7548 | E903 | FEF2 | 0B2D | 7500 |
| 0000237000 | E903 | FE68 | 69E9 | C4FF | F65E | 8326 | 027F | 7500 |
| 0000237020 | E903 | 000D | 5EC4 | 26F6 | 7F80 | 0030 | 0374 | 12E9 |
| 0000237040 | C400 | F65E | 8B26 | D287 | 2600 | 870B | 00D0 | 0374 |
| 0000237060 | 1DE9 | C400 | F65E | FF26 | 0677 | FF26 | 0477 | 5EC4 |
| 0000237100 | 26F6 | B7FF | 00C2 | FF26 | C0B7 | 9A00 | BB24 | 386D |
| 0000237120 | 468B | 0B08 | 0646 | 0375 | 1EE9 | C400 | 065E | FF26 |
| 0000237140 | 0277 | FF26 | 9A37 | 33CA | 3F79 | C483 | C404 | 065E |
| 0000237160 | C02B | 8926 | 0247 | 8926 | C407 | F65E | FF26 | FCB7 |
| 0000237200 | 2600 | B7FF | 00FA | CA9A | 9533 | 833C | 04C4 | 5EC4 |
| 0000237220 | 2BF6 | 26C0 | 8789 | 00FC | 8926 | FA87 | FF00 | 0A76 |
| 0000237240 | 76FF | FF0E | 0C76 | 1A9A | 37E2 | 833B | 06C4 | 4689 |
| 0000237260 | 8EF0 | 7806 | 263A | 3E83 | 3AAD | 7500 | E903 | 000A |
| 0000237300 | BE83 | FEDA | 74FE | E903 | 000F | 068E | 3A7A | 8326 |
| 0000237320 | DA3E | 003A | 0375 | 55E9 | 8B00 | F046 | 8689 | FEDC |
| 0000237340 | 76FF | FFE0 | DE76 | 868D | FEDC | 5016 | 76FF | FFEE |
| 0000237360 | FC76 | 76FF | 8DFA | E24E | 5116 | 4E8D | 16F2 | 8D51 |
| 0000237400 | D68E | 16FE | 1E51 | 6668 | 680B | 02D0 | 36FF | 0ADA |
| 0000237420 | 36FF | 0AD8 | 36FF | 0ADE | 36FF | 0ADC | B49A | 003B |
| 0000237440 | 8300 | 28C4 | 868B | FEDC | 09E9 | E900 | 0006 | 468B |
| 0000237460 | E9F0 | 0000 | 5E1F | 835F | 02ED | E58B | 5D1F | CA4D |
| 0000237500 | 000A | 581E | 4590 | 8B55 | 1EEC | D88E | EC81 | 0152 |
| 0000237520 | 5657 | B81E | 3A8D | D88E | 46C7 | 77F6 | 8C0B | F85E |
| 0000237540 | 46C7 | 01E6 | 2B01 | 89C0 | B846 | 4689 | 8EB6 | 7806 |
| 0000237560 | 263A | 3E83 | 40FF | 7500 | E903 | 001E | 36FF | 0ADE |
| 0000237600 | 36FF | 0ADC | 868D | FEAE | 5016 | C49A | 003A | 8300 |
| 0000237620 | 08C4 | 003D | 7400 | E903 | 000F | 068E | 3A7A | 8326 |
| 0000237640 | 183E | 0041 | 0375 | 3CE9 | 1E00 | 7E68 | 8D0B | DA46 |
| 0000237660 | 5016 | 868D | FEAE | 5016 | 468D | 16EE | 6850 | 031E |
| 0000237700 | 681E | 0B88 | 36FF | 0ADA | 36FF | 0AD8 | 36FF | 0ADE |
| 0000237720 | 36FF | 0ADC | 0E9A | 003B | 8300 | 1EC4 | 4689 | 89EE |
| 0000237740 | F056 | 08E9 | 2B00 | 89C0 | F046 | 4689 | C7EE | EC46 |
| 0000237760 | 0000 | 468B | 0B0C | 0A46 | 0375 | 0BE9 | 8B00 | 0846 |
| 0000240000 | 460B | 7406 | E903 | 0082 | 068E | 3A78 | 8326 | BB3E |
| 0000240020 | 0041 | 0375 | 0AE9 | 8300 | B2BE | FEFE | 0374 | 0FE9 |
| 0000240040 | 8E00 | 7A06 | 263A | 3E83 | 41D4 | 7500 | E903 | 0054 |
| 0000240060 | 86C7 | FEB4 | 0017 | 76FF | FFB8 | B676 | 868D | FEB4 |
| 0000240100 | 5016 | 76FF | FFE6 | F876 | 76FF | 8DF6 | DA4E | 5116 |
| 0000240120 | 4E8D | 16EE | 8D51 | AE8E | 16FE | 1E51 | 8868 | 680B |
| 0000240140 | 032A | 36FF | 0ADA | 36FF | 0AD8 | 36FF | 0ADE | 36FF |
| 0000240160 | 0ADC | 209A | 0042 | 8300 | 28C4 | 868B | FEB4 | B7E9 |
| 0000240200 | E908 | 0006 | 17B8 | E900 | 08AE | 5EC4 | 2B06 | 26C0 |
| 0000240220 | 4789 | 2602 | 0789 | 46C6 | 00BA | 468B | 0B1A | 1846 |
| 0000240240 | 0374 | A2E9 | 8D00 | BA46 | 5016 | 76FF | FF20 | 1E76 |
| 0000240260 | 3D9A | 7F42 | 831B | 08C4 | 4689 | 83EC | EC7E | 7500 |
| 0000240300 | E903 | 0083 | 068E | 3A78 | 8326 | 603E | 0042 | 0375 |

THU MAR 14 17:31:54 1991 DB_PI.DLL PAGE 88, LINE 5134

| | | | | | | | | |
|---|---|---|---|---|---|---|---|---|
| 0000240320 | 0AE9 | 8300 | B2BE | FEFE | 0374 | 0FE9 | 8E00 | 7A06 |
| 0000240340 | 263A | 3E83 | 4279 | 7500 | E903 | 0055 | 468B | 89EC |
| 0000240360 | B486 | FFFE | B876 | 76FF | 8DB6 | B486 | 16FE | FF50 |
| 0000240400 | E676 | 76FF | FFF8 | F676 | 4E8D | 16DA | 8D51 | EE4E |
| 0000240420 | 5116 | 8E8D | FEAE | 5116 | 681E | 0B88 | 3468 | FF03 |
| 0000240440 | DA36 | FF0A | D836 | FF0A | DE36 | FF0A | DC36 | 9A0A |
| 0000240460 | 42C5 | 0000 | C483 | 8B28 | B486 | E9FE | 07FA | 06E9 |
| 0000240500 | 8B00 | EC46 | F1E9 | 8D07 | FA46 | 5016 | 76FF | FF16 |
| 0000240520 | 2476 | 76FF | 9A22 | CF64 | 43A3 | C483 | 890A | EC46 |
| 0000240540 | 7E83 | 00EC | 0375 | 83E9 | 8E00 | 7806 | 263A | 3E83 |
| 0000240560 | 4313 | 7500 | E903 | 000A | BE83 | FEB2 | 74FE | E903 |
| 0000240600 | 000F | 068E | 3A7A | 8326 | 2C3E | 0043 | 0375 | 55E9 |
| 0000240620 | 8B00 | EC46 | 8689 | FEB4 | 76FF | FFB8 | B676 | 868D |
| 0000240640 | FEB4 | 5016 | 76FF | FFE6 | F876 | 76FF | 8DF6 | DA4E |
| 0000240660 | 5116 | 4E8D | 16EE | 8D51 | AE8E | 16FE | 1E51 | 8868 |
| 0000240700 | 680B | 033A | 36FF | 0ADA | 36FF | 0AD8 | 36FF | 0ADE |
| 0000240720 | 36FF | 0ADC | 789A | 0043 | 8300 | 28C4 | 868B | FEB4 |
| 0000240740 | 55E9 | E907 | 0006 | 468B | E9EC | 074C | 76FF | FF0C |
| 0000240760 | 0A76 | 006A | 76FF | FF1A | 1876 | 76FF | 8D1C | BA46 |
| 0000241000 | 5016 | 76FF | FFFC | FA76 | 669A | DF01 | 833B | 14C4 |
| 0000241020 | 4689 | 83EC | EC7E | 7500 | E903 | 0083 | 068E | 3A78 |
| 0000241040 | 8326 | BB3E | 0043 | 0375 | 0AE9 | 8300 | B2BE | FEFE |
| 0000241060 | 0374 | 0FE9 | 8E00 | 7A06 | 263A | 3E83 | 43D4 | 7500 |
| 0000241100 | E903 | 0055 | 468B | 89EC | B486 | FFFE | B876 | 76FF |
| 0000241120 | 8DB6 | B486 | 16FE | FF50 | E676 | 76FF | FFF8 | F676 |
| 0000241140 | 4E8D | 16DA | 8D51 | EE4E | 5116 | 8E8D | FEAE | 5116 |
| 0000241160 | 681E | 0B88 | 4168 | FF03 | DA36 | FF0A | D836 | FF0A |
| 0000241200 | DE36 | FF0A | DC36 | 9A0A | 3E49 | 0000 | C483 | 8B28 |
| 0000241220 | B486 | E9FE | 06A2 | 06E9 | 8B00 | EC46 | 99E9 | 8D06 |
| 0000241240 | F246 | 5016 | 76FF | FF10 | 0E76 | 76FF | FF24 | 2276 |
| 0000241260 | 769A | 99DF | 833F | 0CC4 | 4689 | 83EC | EC7E | 7500 |
| 0000241300 | E903 | 0083 | 068E | 3A78 | 8326 | 673E | 003E | 0375 |
| 0000241320 | 0AE9 | 8300 | B2BE | FEFE | 0374 | 0FE9 | 8E00 | 7A06 |
| 0000241340 | 263A | 3E83 | 3E80 | 7500 | E903 | 0055 | 468B | 89EC |
| 0000241360 | B486 | FFFE | B876 | 76FF | 8DB6 | B486 | 16FE | FF50 |
| 0000241400 | E676 | 76FF | FFF8 | F676 | 4E8D | 16DA | 8D51 | EE4E |
| 0000241420 | 5116 | 8E8D | FEAE | 5116 | 681E | 0B88 | 4668 | FF03 |
| 0000241440 | DA36 | FF0A | D836 | FF0A | DE36 | FF0A | DC36 | 9A0A |
| 0000241460 | 4163 | 0000 | C483 | 8B28 | B486 | E9FE | 05FA | 06E9 |
| 0000241500 | 8B00 | EC46 | F1E9 | C405 | F25E | C726 | 0247 | 0001 |
| 0000241520 | B468 | FF00 | 0C76 | 76FF | 8B0A | F246 | 568B | 05F4 |
| 0000241540 | 000C | 5052 | 309A | 583E | 833F | 0AC4 | 468B | C416 |
| 0000241560 | F25E | 8926 | C487 | 8B00 | 1446 | 5EC4 | 26F2 | 8789 |
| 0000241600 | 00C8 | 468B | C412 | F25E | 8926 | CA87 | 8B00 | FA46 |
| 0000241620 | 568B | C4FC | F25E | 8926 | 0847 | 8926 | 0A57 | 5EC4 |
| 0000241640 | 26F2 | 87C7 | 00F4 | 0000 | 5EC4 | 26F2 | 7F80 | 0030 |
| 0000241660 | 0375 | 0FE9 | C401 | 0A5E | 8A26 | 4867 | C02A | 4603 |
| 0000241700 | 8BFA | FC56 | 862D | 5274 | 8D50 | B686 | 16FE | 9A50 |
| 0000241720 | 2750 | 44D4 | C483 | 1E08 | 8568 | 8D0B | B686 | 16FE |
| 0000241740 | 9A50 | 270A | 44ED | C483 | 8B08 | F246 | 568B | 05F4 |
| 0000241760 | 0030 | 5052 | 868D | FEB6 | 5016 | 0A9A | 8A27 | 8347 |
| 0000242000 | 08C4 | 468B | 8BF2 | F456 | CC05 | 5200 | 6A50 | 8D00 |
| 0000242020 | B686 | 16FE | FF50 | 0C76 | 76FF | 9A0A | 1ECD | 46AC |
| 0000242040 | C483 | 890E | EC46 | 7E83 | 00EC | 0375 | 83E9 | 8E00 |
| 0000242060 | 7806 | 263A | 3E83 | 45EF | 7500 | E903 | 000A | BE83 |
| 0000242100 | FEB2 | 74FE | E903 | 000F | 068E | 3A7A | 8326 | 083E |
| 0000242120 | 0046 | 0375 | 55E9 | 8B00 | EC46 | 8689 | FEB4 | 76FF |
| 0000242140 | FFB8 | B676 | 868D | FEB4 | 5016 | 76FF | FFE6 | F876 |
| 0000242160 | 76FF | 8DF6 | DA4E | 5116 | 4E8D | 16EE | 8D51 | AE8E |

THU MAR 14 17:31:54 1991 DB_PI.DLL PAGE 89, LINE 5193

| | | | | | | | | |
|---|---|---|---|---|---|---|---|---|
| 0000242200 | 16FE | 1E51 | 8868 | 680B | 035C | 36FF | 0ADA | 36FF |
| 0000242220 | 0AD8 | 36FF | 0ADE | 36FF | 0ADC | 549A | 0046 | 8300 |
| 0000242240 | 28C4 | 868B | FEB4 | 8FE9 | E904 | 0006 | 468B | E9EC |
| 0000242260 | 0486 | 5EC4 | 2BF2 | 26C0 | 8789 | 00C2 | 8926 | C087 |
| 0000242300 | E900 | 01A4 | 76FF | FF24 | 2276 | 5EC4 | 260A | 77FF |
| 0000242320 | C466 | 0A5E | FF26 | 6E77 | FF26 | 6C77 | 468B | 8BF2 |
| 0000242340 | F456 | C005 | 5200 | 9A50 | ADAC | 46D3 | 4689 | 83EC |
| 0000242360 | EC7E | 7500 | E903 | 0083 | 068E | 3A78 | 8326 | DC3E |
| 0000242400 | 0046 | 0375 | 0AE9 | 8300 | B2BE | FEFE | 0374 | 0FE9 |
| 0000242420 | 8E00 | 7A06 | 263A | 3E83 | 46F5 | 7500 | E903 | 0055 |
| 0000242440 | 468B | 89EC | B486 | FFFE | B876 | 76FF | 8DB6 | B486 |
| 0000242460 | 16FE | FF50 | E676 | 76FF | FFF8 | F676 | 4E8D | 16DA |
| 0000242500 | 8D51 | EE4E | 5116 | 8E8D | FEAE | 5116 | 681E | 0B88 |
| 0000242520 | 6668 | FF03 | DA36 | FF0A | D836 | FF0A | DE36 | FF0A |
| 0000242540 | DC36 | 9A0A | 4741 | 0000 | C483 | 8B28 | B486 | E9FE |
| 0000242560 | 03C6 | 06E9 | 8B00 | EC46 | BDE9 | C403 | F25E | FF26 |
| 0000242600 | C2B7 | 2600 | B7FF | 00C0 | 5EC4 | 260A | 478B | C46C |
| 0000242620 | 0A5E | 0326 | 6647 | C450 | 0A5E | FF26 | 0277 | FF26 |
| 0000242640 | C437 | 0A5E | FF26 | 4877 | 468B | 8B0A | 0C56 | 0405 |
| 0000242660 | 5200 | FF50 | FC76 | 76FF | 9AFA | 0166 | 42FB | C483 |
| 0000242700 | 8914 | EC46 | 7E83 | 00EC | 0375 | 9BE9 | FF00 | 2476 |
| 0000242720 | 76FF | C422 | F25E | FF26 | C2B7 | 2600 | B7FF | 00C0 |
| 0000242740 | 249A | FCBB | 8E47 | 7806 | 263A | 3E83 | 4805 | 7500 |
| 0000242760 | E903 | 000A | BE83 | FEB2 | 74FE | E903 | 000F | 068E |
| 0000243000 | 3A7A | 8326 | 1E3E | 0048 | 0375 | 55E9 | 8B00 | EC46 |
| 0000243020 | 8689 | FEB4 | 76FF | FFB8 | B676 | 868D | FEB4 | 5016 |
| 0000243040 | 76FF | FFE6 | F876 | 76FF | 8DF6 | DA4E | 5116 | 4E8D |
| 0000243060 | 16EE | 8D51 | AE8E | 16FE | 1E51 | 8868 | 680B | 036F |
| 0000243100 | 36FF | 0ADA | 36FF | 0AD8 | 36FF | 0ADE | 36FF | 0ADC |
| 0000243120 | 209A | 0044 | 8300 | 28C4 | 868B | FEB4 | D9E9 | E902 |
| 0000243140 | 0006 | 468B | E9EC | 02D0 | 5EC4 | 2BF2 | 26C0 | 8789 |
| 0000243160 | 00D2 | 8926 | D087 | C400 | 0A5E | 8B26 | 6247 | C448 |
| 0000243200 | 0A5E | D22B | F726 | 6477 | 6A40 | 5000 | 5EC4 | 260A |
| 0000243220 | 77FF | 266E | 77FF | 9A6C | 429E | 479F | 4689 | 89E8 |
| 0000243240 | EA56 | 016A | 006A | 76FF | FFEA | E876 | 6A9A | BB43 |
| 0000243260 | 0B47 | 74D0 | E903 | 0008 | 4683 | 01E8 | 5683 | 00EA |
| 0000243300 | 016A | 76FF | FFEA | E876 | D99A | 5753 | 8344 | 06C4 |
| 0000243320 | 5EC4 | 2606 | 0789 | 8926 | 0257 | 5EC4 | 2606 | 478B |
| 0000243340 | 2602 | 070B | 0374 | A7E9 | C400 | F25E | 8026 | 307F |
| 0000243360 | 7500 | E903 | 0018 | 76FF | FF24 | 2276 | 5EC4 | 26F2 |
| 0000243400 | B7FF | 00C2 | FF26 | C0B7 | 9A00 | BB24 | 3F3E | 068E |
| 0000243420 | 3A78 | 8326 | 643E | 0040 | 0375 | 0AE9 | 8300 | B2BE |
| 0000243440 | FEFE | 0374 | 0FE9 | 8E00 | 7A06 | 263A | 3E83 | 4091 |
| 0000243460 | 7500 | E903 | 0054 | 86C7 | FEB4 | 0007 | 76FF | FFB8 |
| 0000243500 | B676 | 868D | FEB4 | 5016 | 76FF | FFE6 | F876 | 76FF |
| 0000243520 | 8DF6 | DA4E | 5116 | 4E8D | 16EE | 8D51 | AE8E | 16FE |
| 0000243540 | 1E51 | 8868 | 680B | 0386 | 36FF | 0ADA | 36FF | 0AD8 |
| 0000243560 | 36FF | 0ADE | 36FF | 0ADC | 7D9A | 0049 | 8300 | 28C4 |
| 0000243600 | 868B | FEB4 | B1E9 | E901 | 0006 | 07B8 | E900 | 01A8 |
| 0000243620 | 5EC4 | 2606 | 078B | 8B26 | 0257 | 5EC4 | 26F2 | 8789 |
| 0000243640 | 00F6 | 8926 | F897 | 8300 | 147E | 7500 | E903 | 00F7 |
| 0000243660 | 016A | 76FF | FFEA | E876 | D99A | DC33 | 8348 | 06C4 |
| 0000243700 | 5EC4 | 26F2 | 8789 | 00FA | 8926 | FC97 | C400 | F25E |
| 0000243720 | 8B26 | FC87 | 2600 | 870B | 00FA | 0374 | C5E9 | C400 |
| 0000243740 | 065E | FF26 | 0277 | FF26 | 9A37 | 33CA | 44C2 | C483 |
| 0000243760 | C404 | 065E | C02B | 8926 | 0247 | 8926 | C407 | F25E |
| 0000244000 | 8026 | 307F | 7500 | E903 | 0018 | 76FF | FF24 | 2276 |
| 0000244020 | 5EC4 | 26F2 | B7FF | 00C2 | FF26 | C0B7 | 9A00 | BB24 |
| 0000244040 | 45DA | 068E | 3A78 | 8326 | AD3E | 0049 | 0375 | 0AE9 |

THU MAR 14 17:31:54 1991 DB_PI.DLL PAGE 90, LINE 5252

| | | | | | | | | |
|---|---|---|---|---|---|---|---|---|
| 0000244060 | 8300 | B2BE | FEFE | 0374 | 0FE9 | 8E00 | 7A06 | 263A |
| 0000244100 | 3E83 | 49C6 | 7500 | E903 | 0054 | 86C7 | FEB4 | 0007 |
| 0000244120 | 76FF | FFB8 | B676 | 868D | FEB4 | 5016 | 76FF | FFE6 |
| 0000244140 | F876 | 76FF | 8DF6 | DA4E | 5116 | 4E8D | 16EE | 8D51 |
| 0000244160 | AE8E | 16FE | 1E51 | 8868 | 680B | 0393 | 36FF | 0ADA |
| 0000244200 | 36FF | 0AD8 | 36FF | 0ADE | 36FF | 0ADC | 119A | 004A |
| 0000244220 | 8300 | 28C4 | 868B | FEB4 | 9DE9 | E900 | 0006 | 07B8 |
| 0000244240 | E900 | 0094 | 0FE9 | C400 | F25E | C02B | 8926 | FC87 |
| 0000244260 | 2600 | 8789 | 00FA | 068E | 3A78 | 8326 | 263E | 0045 |
| 0000244300 | 0375 | 0AE9 | 8300 | B2BE | FEFE | 0374 | 0FE9 | 8E00 |
| 0000244320 | 7A06 | 263A | 3E83 | 453F | 7500 | E903 | 0054 | 86C7 |
| 0000244340 | FEB4 | 0000 | 76FF | FFB8 | B676 | 868D | FEB4 | 5016 |
| 0000244360 | 76FF | FFE6 | F876 | 76FF | 8DF6 | DA4E | 5116 | 4E8D |
| 0000244400 | 16EE | 8D51 | AE8E | 16FE | 1E51 | 8868 | 680B | 0399 |
| 0000244420 | 36FF | 0ADA | 36FF | 0AD8 | 36FF | 0ADE | 36FF | 0ADC |
| 0000244440 | 8B9A | 0045 | 8300 | 28C4 | 868B | FEB4 | 09E9 | E900 |
| 0000244460 | 0006 | 00B8 | E900 | 0000 | 5E1F | 835F | 02ED | E58B |
| 0000244500 | 5D1F | CA4D | 0020 | 581E | 4590 | 8B55 | 1EEC | D88E |
| 0000244520 | EC81 | 002E | 5657 | B81E | 4044 | D88E | 46C7 | 9CF6 |
| 0000244540 | 8C0B | F85E | 46C7 | 01EA | 2B01 | 89C0 | DC46 | 4689 |
| 0000244560 | 8EDA | 7806 | ¿63A | 3E83 | 4AF1 | 7500 | E903 | 001D |
| 0000244600 | 36FF | 0ADE | 36FF | 0ADC | 468D | 16D2 | 9A50 | 407B |
| 0000244620 | 0000 | C483 | 3D08 | 0000 | 0374 | 0FE9 | 8E00 | 7A06 |
| 0000244640 | 263A | 3E83 | 4B09 | 7500 | E903 | 003B | 681E | 0BA3 |
| 0000244660 | 468D | 16DE | 8D50 | D246 | 5016 | 468D | 16EE | 6850 |
| 0000244700 | 03B7 | 681E | 0BAA | 36FF | 0ADA | 36FF | 0AD8 | 36FF |
| 0000244720 | 0ADE | 36FF | 0ADC | C59A | 0040 | 8300 | 1EC4 | 4689 |
| 0000244740 | 89EE | F056 | 08E9 | 2B00 | 89C0 | F046 | 4689 | 8BEE |
| 0000244760 | 0846 | 460B | 7406 | E903 | 007D | 068E | 3A78 | 8326 |
| 0000245000 | 8F3E | 004B | 0375 | 09E9 | 8300 | D67E | 74FE | E903 |
| 0000245020 | 000F | 068E | 3A7A | 8326 | A73E | 004B | 0375 | 50E9 |
| 0000245040 | C700 | D846 | 0017 | 76FF | FFDC | DA76 | 468D | 16D8 |
| 0000245060 | FF50 | EA76 | 76FF | FFF8 | F676 | 4E8D | 16DE | 8D51 |
| 0000245100 | EE4E | 5116 | 4E8D | 16D2 | 1E51 | AA68 | 680B | 03BF |
| 0000245120 | 36FF | 0ADA | 36FF | 0AD8 | 36FF | 0ADE | 36FF | 0ADC |
| 0000245140 | F09A | 004B | 8300 | 28C4 | 468B | E9D8 | 0459 | 06E9 |
| 0000245160 | B800 | 0017 | 50E9 | 8D04 | FA46 | 5016 | 006A | 76FF |
| 0000245200 | FF10 | 0E76 | 649A | 17CF | 834C | 0AC4 | 4689 | 83EC |
| 0000245220 | EC7E | 7500 | E903 | 007E | 068E | 3A78 | 8326 | 2F3E |
| 0000245240 | 004C | 0375 | 09E9 | 8300 | D67E | 74FE | E903 | 000F |
| 0000245260 | 068E | 3A7A | 8326 | 473E | 004C | 0375 | 51E9 | 8B00 |
| 0000245300 | EC46 | 4689 | FFD8 | DC76 | 76FF | 8DDA | D846 | 5016 |
| 0000245320 | 76FF | FFEA | F876 | 76FF | 8DF6 | DE4E | 5116 | 4E8D |
| 0000245340 | 16EE | 8D51 | D24E | 5116 | 681E | 0BAA | C368 | FF03 |
| 0000245360 | DA36 | FF0A | D836 | FF0A | DE36 | FF0A | DC36 | 9A0A |
| 0000245400 | 4C90 | 0000 | C483 | 8B28 | D846 | BAE9 | E903 | 0006 |
| 0000245420 | 468B | E9EC | 03B1 | 468D | 16F2 | FF50 | 0C76 | 76FF |
| 0000245440 | FF10 | 0E76 | 2D9A | 48E1 | 8342 | 0AC4 | 4689 | 83EC |
| 0000245460 | EC7E | 7500 | E903 | 007E | 068E | 3A78 | 8326 | BA3E |
| 0000245500 | 004C | 0375 | 09E9 | 8300 | D67E | 74FE | E903 | 000F |
| 0000245520 | 068E | 3A7A | 8326 | D23E | 004C | 0375 | 51E9 | 8B00 |
| 0000245540 | EC46 | 4689 | FFD8 | DC76 | 76FF | 8DDA | D846 | 5016 |
| 0000245560 | 76FF | FFEA | F876 | 76FF | 8DF6 | DE4E | 5116 | 4E8D |
| 0000245600 | 16EE | 8D51 | D24E | 5116 | 681E | 0BAA | C768 | FF03 |
| 0000245620 | DA36 | FF0A | D836 | FF0A | DE36 | FF0A | DC36 | 9A0A |
| 0000245640 | 4D1A | 0000 | C483 | 8B28 | D846 | 1AE9 | E903 | 0006 |
| 0000245660 | 468B | E9EC | 0311 | 5EC4 | 26F2 | 7F83 | 0002 | 0374 |
| 0000245700 | 7DE9 | 8E00 | 7806 | 263A | 3E83 | 4D60 | 7500 | E903 |
| 0000245720 | 0009 | 7E83 | FED6 | 0374 | 0FE9 | 8E00 | 7A06 | 263A |

THU MAR 14 17:31:54 1991 DB_PI.DLL PAGE 91, LINE 5311

| | | | | | | | | |
|---|---|---|---|---|---|---|---|---|
| 0000245740 | 3E83 | 4D78 | 7500 | E903 | 0050 | 46C7 | A6D8 | FF01 |
| 0000245760 | DC76 | 76FF | 8DDA | D846 | 5016 | 76FF | FFEA | F876 |
| 0000246000 | 76FF | 8DF6 | DE4E | 5116 | 4E8D | 16EE | 8D51 | D24E |
| 0000246020 | 5116 | 681E | 0BAA | CA68 | FF03 | DA36 | FF0A | D836 |
| 0000246040 | FF0A | DE36 | FF0A | DC36 | 9A0A | 4DC0 | 0000 | C483 |
| 0000246060 | 8B28 | D846 | 90E9 | E902 | 0006 | A6B8 | E901 | 0287 |
| 0000246100 | 5EC4 | 26F2 | 7F80 | 0030 | 0374 | 99E9 | C400 | F25E |
| 0000246120 | 8326 | C8BF | 0000 | 0375 | 8BE9 | C400 | F25E | 8326 |
| 0000246140 | F4BF | 0000 | 0375 | 7DE9 | 8E00 | 7806 | 263A | 3E83 |
| 0000246160 | 4919 | 7500 | E903 | 0009 | 7E83 | FED6 | 0374 | 0FE9 |
| 0000246200 | 8E00 | 7A06 | 263A | 3E83 | 4932 | 7500 | E903 | 0050 |
| 0000246220 | 46C7 | A1D8 | FF01 | DC76 | 76FF | 8DDA | D846 | 5016 |
| 0000246240 | 76FF | FFEA | F876 | 76FF | 8DF6 | DE4E | 5116 | 4E8D |
| 0000246260 | 16EE | 8D51 | D24E | 5116 | 681E | 0BAA | CC68 | FF03 |
| 0000246300 | DA36 | FF0A | D836 | FF0A | DE36 | FF0A | DC36 | 9A0A |
| 0000246320 | 4869 | 0000 | C483 | 8B28 | D846 | EAE9 | E901 | 0006 |
| 0000246340 | A1B8 | E901 | 01E1 | 5EC4 | 26F2 | 7F80 | 0030 | 0375 |
| 0000246360 | B6E9 | FF00 | 0876 | 76FF | FF06 | 0A76 | 5EC4 | 26F2 |
| 0000246400 | B7FF | 00CE | FF26 | CCB7 | 8B00 | F246 | 568B | 05F4 |
| 0000246420 | 000C | 5052 | B79A | 0E23 | 8345 | 0EC4 | 4689 | 83EC |
| 0000246440 | EC7E | 7500 | E903 | 007E | 068E | 3A78 | 8326 | C33E |
| 0000246460 | 004E | 0375 | 09E9 | 8300 | D67E | 74FE | E903 | 000F |
| 0000246500 | 068E | 3A7A | 8326 | DB3E | 004E | 0375 | 51E9 | 8B00 |
| 0000246520 | EC46 | 4689 | FFD8 | DC76 | 76FF | 8DDA | D846 | 5016 |
| 0000246540 | 76FF | FFEA | F876 | 76FF | 8DF6 | DE4E | 5116 | 4E8D |
| 0000246560 | 16EE | 8D51 | D24E | 5116 | 681E | 0BAA | D468 | FF03 |
| 0000246600 | DA36 | FF0A | D836 | FF0A | DE36 | FF0A | DC36 | 9A0A |
| 0000246620 | 4F24 | 0000 | C483 | 8B28 | D846 | 2AE9 | E901 | 0006 |
| 0000246640 | 468B | E9EC | 0121 | A1E9 | FF00 | 0876 | 76FF | FF06 |
| 0000246660 | 0A76 | 76FF | FFF4 | F276 | C59A | 774F | 834B | 0AC4 |
| 0000246700 | 4689 | 83EC | EC7E | 7500 | E903 | 007E | 068E | 3A78 |
| 0000246720 | 8326 | 413E | 004F | 0375 | 09E9 | 8300 | D67E | 74FE |
| 0000246740 | E903 | 000F | 068E | 3A7A | 8326 | 593E | 004F | 0375 |
| 0000246760 | 51E9 | 8B00 | FC46 | 4689 | FFD8 | DC76 | 76FF | 8DDA |
| 0000247000 | D846 | 5016 | 76FF | FFEA | F876 | 76FF | 8DF6 | DE4E |
| 0000247020 | 5116 | 4E8D | 16EE | 8D51 | D24E | 5116 | 681E | 0BAA |
| 0000247040 | DA68 | FF03 | DA36 | FF0A | D836 | FF0A | DE36 | FF0A |
| 0000247060 | DC36 | 9A0A | 4FA1 | 0000 | C483 | 8B28 | D846 | 86E9 |
| 0000247100 | E900 | 0006 | 468B | E9EC | 007D | 068E | 3A78 | 8326 |
| 0000247120 | 683E | 004A | 0375 | 09E9 | 8300 | D67E | 74FE | E903 |
| 0000247140 | 000F | 068E | 3A7A | 8326 | 943E | 004A | 0375 | 50E9 |
| 0000247160 | C700 | D846 | 0000 | 76FF | FFDC | DA76 | 468D | 16D8 |
| 0000247200 | FF50 | EA76 | 76FF | FFF8 | F676 | 4E8D | 16DE | 8D51 |
| 0000247220 | EE4E | 5116 | 4E8D | 16D2 | 1E51 | AA68 | 680B | 03DD |
| 0000247240 | 36FF | 0ADA | 36FF | 0AD8 | 36FF | 0ADE | 36FF | 0ADC |
| 0000247260 | 519A | 004B | 8300 | 28C4 | 468B | E9D8 | 0009 | 06E9 |
| 0000247300 | B800 | 0000 | 00E9 | 1F00 | 5F5E | ED83 | 8B02 | 1FE5 |
| 0000247320 | 4D5D | 0CCA | 1E00 | 9058 | 5545 | EC8B | 8E1E | 81D8 |
| 0000247340 | 0CEC | 5700 | C756 | F446 | 0000 | 5EC4 | 2606 | 9FC4 |
| 0000247360 | 00C0 | 8B26 | 6247 | C448 | 065E | C426 | C09F | 2B00 |
| 0000247400 | 26D2 | 77F7 | 3B64 | 0A46 | 0372 | 06E9 | B800 | 0013 |
| 0000247420 | 31E9 | C401 | 065E | FF26 | 0677 | FF26 | 0477 | 468B |
| 0000247440 | 8B06 | 0856 | 1005 | 5200 | C450 | 065E | FF26 | 5477 |
| 0000247460 | 5EC4 | 2606 | 77FF | 260E | 77FF | 6A0C | 8D00 | FA46 |
| 0000247500 | 5016 | B49A | 83C5 | 8950 | F446 | 7E83 | 00F4 | 0375 |
| 0000247520 | 06E9 | 8B00 | F446 | EBE9 | C400 | FA5E | 8B26 | 5047 |
| 0000247540 | 8B26 | 5257 | 5EC4 | 2606 | 4739 | 745C | E903 | 0009 |
| 0000247560 | 3926 | 5E57 | 0375 | 22E9 | C400 | 065E | FF26 | 0677 |
| 0000247600 | FF26 | 0477 | 76FF | FFFC | FA76 | 006A | 006A | 006A |

THU MAR 14 17:31:54 1991 DB_PI.DLL PAGE 92, LINE 5370

| | | | | | | | | |
|---|---|---|---|---|---|---|---|---|
| 0000247620 | 049A | 29CB | 8851 | 01A8 | A9E9 | 6A00 | FF00 | 0A76 |
| 0000247640 | 5EC4 | 2606 | 478B | 486E | 5EC4 | 2B06 | 26D2 | 77F7 |
| 0000247660 | 4070 | 006A | C450 | 065E | FF26 | 7A77 | FF26 | 7877 |
| 0000247700 | 9E9A | BA42 | 5250 | 9A50 | 4338 | 5106 | 4689 | 89F6 |
| 0000247720 | F856 | 76FF | FF0E | 0C76 | 468B | 8BF6 | F856 | 5EC4 |
| 0000247740 | 26FA | 4703 | 8370 | 00D2 | F0B9 | D328 | 26E2 | 5703 |
| 0000247760 | 5272 | C450 | 065E | 8B26 | 6E47 | C448 | 065E | D22B |
| 0000250000 | F726 | 7077 | 6A40 | 5000 | 5EC4 | 2606 | 77FF | 267A |
| 0000250020 | 77FF | 9A78 | 429E | 48AB | 5052 | 869A | ABA9 | C44E |
| 0000250040 | 065E | FF26 | 0677 | FF26 | 0477 | 76FF | FFFC | FA76 |
| 0000250060 | 006A | 006A | 006A | 049A | 10CB | 8949 | F446 | 468B |
| 0000250100 | E9F4 | 0000 | 5F5E | ED83 | 8B02 | 1FE5 | 4D5D | 1ECB |
| 0000250120 | 9058 | 5545 | EC8B | 8E1E | 81D8 | 2EEC | 5700 | 1E56 |
| 0000250140 | 48B8 | 8E4A | C7D8 | F646 | 0BBE | 5E8C | C7F8 | EA46 |
| 0000250160 | 0101 | C02B | 4689 | 89DC | DA46 | 068E | 3A78 | 8326 |
| 0000250200 | FA3E | 0051 | 0375 | 1DE9 | FF00 | DE36 | FF0A | DC36 |
| 0000250220 | 8D0A | D246 | 5016 | 7E9A | 004A | 8300 | 08C4 | 003D |
| 0000250240 | 7400 | E903 | 000F | 068E | 3A7A | 8326 | 123E | 0052 |
| 0000250260 | 0375 | 3BE9 | 1E00 | C568 | 8D0B | DE46 | 5016 | 468D |
| 0000250300 | 16D2 | 8D50 | EE46 | 5016 | 3368 | 1E04 | CC68 | FF0B |
| 0000250320 | DA36 | FF0A | D836 | FF0A | DE36 | FF0A | DC36 | 9A0A |
| 0000250340 | 4AC7 | 0000 | C483 | 891E | EE46 | 5689 | E9F0 | 0008 |
| 0000250360 | C02B | 4689 | 89F0 | EE46 | 468B | 0B08 | 0646 | 0374 |
| 0000250400 | 7DE9 | 8E00 | 7806 | 263A | 3E83 | 5298 | 7500 | E903 |
| 0000250420 | 0009 | 7E83 | FED6 | 0374 | 0FE9 | 8E00 | 7A06 | 263A |
| 0000250440 | 3E83 | 52B0 | 7500 | E903 | 0050 | 46C7 | 17D8 | FF00 |
| 0000250460 | DC76 | 76FF | 8DDA | D846 | 5016 | 76FF | FFEA | F876 |
| 0000250500 | 76FF | 8DF6 | DE4E | 5116 | 4E8D | 16EE | 8D51 | D24E |
| 0000250520 | 5116 | 6B1E | 0BCC | 3A68 | FF04 | DA36 | FF0A | D836 |
| 0000250540 | FF0A | DE36 | FF0A | DC36 | 9A0A | 52F9 | 0000 | C483 |
| 0000250560 | 8B28 | D846 | 56E9 | E904 | 0006 | 17B8 | E900 | 044D |
| 0000250600 | 468D | 16FA | 6A50 | FF00 | 0E76 | 76FF | 9A0C | CF64 |
| 0000250620 | 5320 | C483 | 890A | EC46 | 7E83 | 00EC | 0375 | 7EE9 |
| 0000250640 | 8E00 | 7806 | 263A | 3E83 | 5338 | 7500 | E903 | 0009 |
| 0000250660 | 7E83 | FED6 | 0374 | 0FE9 | 8E00 | 7A06 | 263A | 3E83 |
| 0000250700 | 5350 | 7500 | E903 | 0051 | 468B | 89EC | D846 | 76FF |
| 0000250720 | FFDC | DA76 | 468D | 16D8 | FF50 | EA76 | 76FF | FFF8 |
| 0000250740 | F676 | 4E8D | 16DE | 8D51 | EE4E | 5116 | 4E8D | 16D2 |
| 0000250760 | 1E51 | CC68 | 680B | 043E | 36FF | 0ADA | 36FF | 0AD8 |
| 0000251000 | 36FF | 0ADE | 36FF | 0ADC | 999A | 0053 | 8300 | 28C4 |
| 0000251020 | 468B | E9D8 | 03B7 | 06E9 | 8B00 | EC46 | AEE9 | 8D03 |
| 0000251040 | F246 | 5016 | 76FF | FF0A | 0E76 | 76FF | 9A0C | E12D |
| 0000251060 | 510D | C483 | 890A | EC46 | 7E83 | 00EC | 0375 | 7EE9 |
| 0000251100 | 8E00 | 7806 | 263A | 3E83 | 53C3 | 7500 | E903 | 0009 |
| 0000251120 | 7E83 | FED6 | 0374 | 0FE9 | 8E00 | 7A06 | 263A | 3E83 |
| 0000251140 | 53DB | 7500 | E903 | 0051 | 468B | 89EC | D846 | 76FF |
| 0000251160 | FFDC | DA76 | 468D | 16D8 | FF50 | EA76 | 76FF | FFF8 |
| 0000251200 | F676 | 4E8D | 16DE | 8D51 | EE4E | 5116 | 4E8D | 16D2 |
| 0000251220 | 1E51 | CC68 | 680B | 0443 | 36FF | 0ADA | 36FF | 0AD8 |
| 0000251240 | 36FF | 0ADE | 36FF | 0ADC | 239A | 0054 | 8300 | 28C4 |
| 0000251260 | 468B | E9D8 | 0317 | 06E9 | 8B00 | EC46 | 0EE9 | C403 |
| 0000251300 | F25E | 8326 | 027F | 7400 | E903 | 007D | 068E | 3A78 |
| 0000251320 | 8326 | 693E | 0054 | 0375 | 09E9 | 8300 | D67E | 74FE |
| 0000251340 | E903 | 000F | 068E | 3A7A | 8326 | 813E | 0054 | 0375 |
| 0000251360 | 50E9 | C700 | D846 | 01A6 | 76FF | FFDC | DA76 | 468D |
| 0000251400 | 16D8 | FF50 | EA76 | 76FF | FFF8 | F676 | 4E8D | 16DE |
| 0000251420 | 8D51 | EE4E | 5116 | 4E8D | 16D2 | 1E51 | CC68 | 680B |
| 0000251440 | 0446 | 36FF | 0ADA | 36FF | 0AD8 | 36FF | 0ADE | 36FF |
| 0000251460 | 0ADC | C99A | 0054 | 8300 | 28C4 | 468B | E9D8 | 028D |

THU MAR 14 17:31:54 1991 DB_PI.DLL PAGE 93, LINE 5429

| | | | | | | | | |
|---|---|---|---|---|---|---|---|---|
| 0000251500 | 06E9 | B800 | 01A6 | 84E9 | C402 | F25E | 8026 | 307F |
| 0000251520 | 7400 | E903 | 0099 | 5EC4 | 26F2 | BF83 | 00C8 | 7500 |
| 0000251540 | E903 | 008B | 5EC4 | 26F2 | BF83 | 00F4 | 7500 | E903 |
| 0000251560 | 007D | 068E | 3A78 | 8326 | F33E | 0054 | 0375 | 09E9 |
| 0000251600 | 8300 | D67E | 74FE | E903 | 000F | 068E | 3A7A | 8326 |
| 0000251620 | 373E | 004E | 0375 | 50E9 | C700 | D846 | 01A1 | 76FF |
| 0000251640 | FFDC | DA76 | 468D | 16D8 | FF50 | EA76 | 76FF | FFF8 |
| 0000251660 | F676 | 4E8D | 16DE | 8D51 | EE4E | 5116 | 4E8D | 16D2 |
| 0000251700 | 1E51 | CC68 | 680B | 0448 | 36FF | 0ADA | 36FF | 0AD8 |
| 0000251720 | 36FF | 0ADE | 36FF | 0ADC | 809A | 004E | 8300 | 28C4 |
| 0000251740 | 468B | E9D8 | 01E7 | 06E9 | B800 | 01A1 | DEE9 | C401 |
| 0000251760 | F25E | 8326 | 727F | 7400 | E903 | 007D | 068E | 3A78 |
| 0000252000 | 8326 | IF3E | 004E | 0375 | 09E9 | 8300 | D67E | 74FE |
| 0000252020 | E903 | 000F | 068E | 3A7A | 8326 | E13E | 0055 | 0375 |
| 0000252040 | 50E9 | C700 | D846 | 01AD | 76FF | FFDC | DA76 | 468D |
| 0000252060 | 16D8 | FF50 | EA76 | 76FF | FFF8 | F676 | 4E8D | 16DE |
| 0000252100 | 8D51 | EE4E | 5116 | 4E8D | 16D2 | 1E51 | CC68 | 680B |
| 0000252120 | 044B | 36FF | 0ADA | 36FF | 0AD8 | 36FF | 0ADE | 36FF |
| 0000252140 | 0ADC | 2A9A | 0056 | 8300 | 28C4 | 468B | E9D8 | 015D |
| 0000252160 | 06E9 | B800 | 01AD | 54E9 | C401 | F25E | 8026 | 307F |
| 0000252200 | 7500 | E903 | 002C | 5EC4 | 26F2 | B7FF | 00CE | FF26 |
| 0000252220 | CCB7 | FF00 | 0876 | 76FF | 8B06 | F246 | 568B | 05F4 |
| 0000252240 | 000C | 5052 | 399A | 0722 | 834E | 0CC4 | 4689 | E9EC |
| 0000252260 | 0017 | 76FF | FF08 | 0676 | 76FF | FFF4 | F276 | CB9A |
| 0000252300 | 8056 | 8352 | 08C4 | 4689 | 83EC | EC7E | 7500 | E903 |
| 0000252320 | 007E | 068E | 3A78 | 8326 | 473E | 0056 | 0375 | 09E9 |
| 0000252340 | 8300 | D67E | 74FE | E903 | 000F | 068E | 3A7A | 8326 |
| 0000252360 | 5F3E | 0056 | 0375 | 51E9 | 8B00 | EC46 | 4689 | FFD8 |
| 0000252400 | DC76 | 76FF | 8DDA | D846 | 5016 | 76FF | FFEA | F876 |
| 0000252420 | 76FF | 8DF6 | DE4E | 5116 | 4E8D | 16EE | 8D51 | D24E |
| 0000252440 | 5116 | 681E | 0BCC | 5868 | FF04 | DA36 | FF0A | D836 |
| 0000252460 | FF0A | DE36 | FF0A | DC36 | 9A0A | 56A7 | 0000 | C483 |
| 0000252500 | 8B28 | D846 | 86E9 | E900 | 0006 | 468B | E9EC | 007D |
| 0000252520 | 068E | 3A78 | 8326 | 713E | 0051 | 0375 | 09E9 | 8300 |
| 0000252540 | D67E | 74FE | E903 | 000F | 068E | 3A7A | 8326 | 9D3E |
| 0000252560 | 0051 | 0375 | 50E9 | C700 | D846 | 0000 | 76FF | FFDC |
| 0000252600 | DA76 | 468D | 16D8 | FF50 | EA76 | 76FF | FFF8 | F676 |
| 0000252620 | 4E8D | 16DE | 8D51 | EE4E | 5116 | 4E8D | 16D2 | 1E51 |
| 0000252640 | CC68 | 680B | 045A | 36FF | 0ADA | 36FF | 0AD8 | 36FF |
| 0000252660 | 0ADE | 36FF | 0ADC | 5A9A | 0052 | 8300 | 28C4 | 468B |
| 0000252700 | E9D8 | 0009 | 06E9 | B800 | 0000 | 00E9 | 1F00 | 5F5E |
| 0000252720 | ED83 | 8B02 | 1FE5 | 4D5D | 0ACA | 1E00 | 9058 | 5545 |
| 0000252740 | EC8B | 8E1E | 81D8 | 08EC | 5700 | C756 | F846 | 0000 |
| 0000252760 | 5EC4 | 2606 | 77FF | 2606 | 77FF | 8B04 | 0646 | 568B |
| 0000253000 | 0508 | 0010 | 5052 | 5EC4 | 2606 | 77FF | C454 | 065E |
| 0000253020 | FF26 | 0E77 | FF26 | 0C77 | 006A | 468D | 16FA | 9A50 |
| 0000253040 | C5B4 | 5760 | 4689 | 83F8 | F87E | 7500 | E903 | 0006 |
| 0000253060 | 468B | E9F8 | 0086 | 5EC4 | 26FA | 478B | 2650 | 578B |
| 0000253100 | C452 | 065E | 3926 | 5C47 | 0374 | 09E9 | 2600 | 5739 |
| 0000253120 | 755E | E903 | 0022 | 5EC4 | 2606 | 77FF | 2606 | 77FF |
| 0000253140 | FF04 | FC76 | 76FF | 6AFA | 6A00 | 6A00 | 9A00 | CB04 |
| 0000253160 | 5035 | A8B8 | E901 | 0044 | 76FF | FF0C | 0A76 | 5EC4 |
| 0000253200 | 26FA | 77FF | 266A | 77FF | C468 | 065E | 006A | FF26 |
| 0000253220 | 7277 | 869A | B1A9 | C455 | 065E | FF26 | 0677 | FF26 |
| 0000253240 | 0477 | 76FF | FFFC | FA76 | 006A | 006A | 006A | 049A |
| 0000253260 | 12CB | 8957 | F846 | 468B | E9F8 | 0000 | 5F5E | ED83 |
| 0000253300 | 8B02 | 1FE5 | 4D5D | 1ECB | 9058 | 5545 | EC8B | 8E1E |
| 0000253320 | 81D8 | 04EC | 5702 | 8B56 | 0646 | 568B | 0508 | 00D4 |
| 0000253340 | 5052 | 681E | 0BDE | 5EC4 | 2606 | 77FF | C454 | 065E |

THU MAR 14 17:31:54 1991 DB_PI.DLL PAGE 94, LINE 5488

| | | | | | | | | |
|---|---|---|---|---|---|---|---|---|
| 0000253360 | FF26 | 0A77 | FF26 | 0877 | 589A | CA1E | 8358 | 0EC4 |
| 0000253400 | 8689 | FEFC | BE83 | FEFC | 7500 | E903 | 0007 | 868B |
| 0000253420 | FEFC | E5E9 | C400 | 065E | 8A26 | 5467 | C02A | 5EC4 |
| 0000253440 | 2606 | 4703 | 2608 | 578B | 2D0A | 7486 | 5052 | 868D |
| 0000253460 | FDFC | 5016 | 509A | 3927 | 8358 | 08C4 | 681E | 0BE6 |
| 0000253500 | 868D | FDFC | 5016 | 0A9A | 5227 | 8358 | 08C4 | 468B |
| 0000253520 | 8B06 | 0856 | D405 | 5200 | 8D50 | FC86 | 16FD | 9A50 |
| 0000253540 | 270A | 5879 | C483 | C408 | 065E | 8A26 | 5467 | C02A |
| 0000253560 | 5EC4 | 2606 | 4703 | 2608 | 578B | 2D0A | 7486 | 5052 |
| 0000253600 | 868D | FEFE | 5016 | 509A | 8B27 | 8358 | 08C4 | 681E |
| 0000253620 | 0BE8 | 868D | FEFE | 5016 | 0A9A | A427 | 8358 | 08C4 |
| 0000253640 | 468B | 8B06 | 0856 | 3005 | 5200 | 8D50 | FE86 | 16FE |
| 0000253660 | 9A50 | 270A | 50B3 | C483 | 8B08 | 0646 | 568B | 0508 |
| 0000253700 | 00D0 | 5052 | 016A | 868D | FDFC | 5016 | 468B | 8B06 |
| 0000253720 | 0856 | 0C05 | 5200 | 9A50 | 1ECD | 5597 | C483 | 890E |
| 0000253740 | FC86 | 83FE | FCBE | 00FE | 0375 | 07E9 | 8B00 | FC86 |
| 0000253760 | E9FE | 0006 | 00B8 | E900 | 0000 | 5F5E | ED83 | 8B02 |
| 0000254000 | 1FE5 | 4D5D | 1ECB | 9058 | 5545 | EC8B | 8E1E | 81D8 |
| 0000254020 | 34EC | 5700 | 1E56 | 51B8 | 8E51 | C7D8 | D046 | 0000 |
| 0000254040 | 46C7 | EAFA | 8C0B | FC5E | 46C7 | 01EA | 2B01 | 89C0 |
| 0000254060 | DC46 | 4689 | 8EDA | 7806 | 263A | 3E83 | 59CC | 7500 |
| 0000254100 | E903 | 001D | 36FF | 0ADE | 36FF | 0ADC | 468D | 16D2 |
| 0000254120 | 9A50 | 5187 | 0000 | C483 | 3D08 | 0000 | 0374 | 0FE9 |
| 0000254140 | 8E00 | 7A06 | 263A | 3E83 | 59E4 | 7500 | E903 | 003B |
| 0000254160 | 681E | 0BF1 | 468D | 16DE | 8D50 | D246 | 5016 | 468D |
| 0000254200 | 16EE | 6850 | 04EA | 681E | 0BF8 | 36FF | 0ADA | 36FF |
| 0000254220 | 0AD8 | 36FF | 0ADE | 36FF | 0ADC | D09A | 0051 | 8300 |
| 0000254240 | 1EC4 | 4689 | 89EE | F056 | 08E9 | 2B00 | 89C0 | F046 |
| 0000254260 | 4689 | 8DEE | F646 | 5016 | 76FF | FF0E | 1276 | 76FF |
| 0000254300 | 9A10 | E12D | 5CAD | C483 | 890A | EC46 | 7E83 | 00EC |
| 0000254320 | 0375 | 7EE9 | 8E00 | 7806 | 263A | 3E83 | 5A73 | 7500 |
| 0000254340 | E903 | 0009 | 7E83 | FED6 | 0374 | 0FE9 | 8E00 | 7A06 |
| 0000254360 | 263A | 3E83 | 5A8B | 7500 | E903 | 0051 | 468B | 89EC |
| 0000254400 | D846 | 76FF | FFDC | DA76 | 468D | 16D8 | FF50 | EA76 |
| 0000254420 | 76FF | FFFC | FA76 | 4E8D | 16DE | 8D51 | EE4E | 5116 |
| 0000254440 | 4E8D | 16D2 | 1E51 | F868 | 680B | 04EE | 36FF | 0ADA |
| 0000254460 | 36FF | 0AD8 | 36FF | 0ADE | 36FF | 0ADC | D39A | 005A |
| 0000254500 | 8300 | 28C4 | 468B | E9D8 | 053E | 06E9 | 8B00 | EC46 |
| 0000254520 | 35E9 | C405 | F65E | 8026 | 307F | 7400 | E903 | 0099 |
| 0000254540 | 5EC4 | 26F6 | BF83 | 00C8 | 7500 | E903 | 008B | 5EC4 |
| 0000254560 | 26F6 | BF83 | 00F4 | 7500 | E903 | 007D | 068E | 3A78 |
| 0000254600 | 8326 | 073E | 005B | 0375 | 09E9 | 8300 | D67E | 74FE |
| 0000254620 | E903 | 000F | 068E | 3A7A | 8326 | 1F3E | 005B | 0375 |
| 0000254640 | 50E9 | C700 | D846 | 01A1 | 76FF | FFDC | DA76 | 468D |
| 0000254660 | 16D8 | FF50 | EA76 | 76FF | FFFC | FA76 | 4E8D | 16DE |
| 0000254700 | 8D51 | EE4E | 5116 | 4E8D | 16D2 | 1E51 | F868 | 680B |
| 0000254720 | 04F0 | 36FF | 0ADA | 36FF | 0AD8 | 36FF | 0ADE | 36FF |
| 0000254740 | 0ADC | 689A | 005B | 8300 | 28C4 | 468B | E9D8 | 0498 |
| 0000254760 | 06E9 | B800 | 01A1 | 8FE9 | C404 | F65E | 8326 | C4BF |
| 0000255000 | 0200 | 037D | 09E9 | 8300 | 0C7E | 7400 | E903 | 007E |
| 0000255020 | 068E | 3A78 | 8326 | B63E | 005C | 0375 | 09E9 | 8300 |
| 0000255040 | D67E | 74FE | E903 | 000F | 068E | 3A7A | 8326 | 0B3E |
| 0000255060 | 0055 | 0375 | 51E9 | 8B00 | D046 | 4689 | FFD8 | DC76 |
| 0000255100 | 76FF | 8DDA | D846 | 5016 | 76FF | FFEA | FC76 | 76FF |
| 0000255120 | 8DFA | DE4E | 5116 | 4E8D | 16EE | 8D51 | D24E | 5116 |
| 0000255140 | 681E | 0BF8 | F668 | FF04 | DA36 | FF0A | D836 | FF0A |
| 0000255160 | DE36 | FF0A | DC36 | 9A0A | 5553 | 0000 | C483 | 8B28 |
| 0000255200 | D846 | 03E9 | E904 | 0006 | 468B | E9D0 | 03FA | 5EC4 |
| 0000255220 | 26F6 | 7F80 | 0030 | 0374 | A1E9 | 6A01 | FF00 | 0A76 |

THU MAR 14 17:31:54 1991 DB_PI.DLL PAGE 95, LINE 5547

| | | | | | | | | |
|---|---|---|---|---|---|---|---|---|
| 0000255240 | 5EC4 | 26F6 | 9FC4 | 00C0 | 8B26 | 6247 | C448 | F65E |
| 0000255260 | C426 | C09F | 2B00 | 26D2 | 77F7 | 4064 | 006A | C450 |
| 0000255300 | F65E | C426 | C09F | 2600 | 77FF | 266E | 77FF | 9A6C |
| 0000255320 | 429E | 5BC9 | 5052 | 389A | 2D43 | 895C | F246 | 5689 |
| 0000255340 | 8BF4 | F246 | 568B | C4F4 | F65E | C426 | C09F | 2600 |
| 0000255360 | 4703 | 8370 | 00D2 | D9B9 | D350 | 26E2 | 5703 | 5272 |
| 0000255400 | C450 | 065E | FF26 | 0277 | FF26 | C437 | F65E | C426 |
| 0000255420 | C09F | 2600 | 478B | 4862 | 5EC4 | 26F6 | 9FC4 | 00C0 |
| 0000255440 | D22B | F726 | 6477 | 6A40 | 5000 | 5EC4 | 26F6 | 9FC4 |
| 0000255460 | 00C0 | FF26 | 6E77 | FF26 | 6C77 | 9E9A | 6C42 | 6A5C |
| 0000255500 | FF00 | DA76 | 5EC4 | 26F6 | 9FC4 | 00C0 | C88B | 8B26 |
| 0000255520 | 6247 | C448 | F65E | C426 | C09F | 8B00 | 2BF2 | 26D2 |
| 0000255540 | 77F7 | 4064 | 006A | C450 | F65E | C426 | C09F | 2600 |
| 0000255560 | 77FF | 266E | 77FF | 8B6C | 9AF9 | 429E | 5C73 | 5052 |
| 0000255600 | 389A | 2743 | C458 | F65E | C426 | C09F | 8900 | CC46 |
| 0000255620 | 5689 | 26CE | 478B | 266C | 578B | 2B6E | CC46 | 561B |
| 0000255640 | 3BCE | 7DD6 | E903 | 0010 | 037E | 07E9 | 3B00 | 77C7 |
| 0000255660 | E903 | 0004 | D68B | C78B | 5052 | 869A | 85A9 | 8E57 |
| 0000255700 | 7806 | 263A | 3E83 | 55C9 | 7500 | E903 | 0009 | 7E83 |
| 0000255720 | FED6 | 0374 | 0FE9 | 8E00 | 7A06 | 263A | 3E83 | 5D70 |
| 0000255740 | 7500 | E903 | 0050 | 46C7 | 00D8 | FF00 | DC76 | 76FF |
| 0000255760 | 8DDA | D846 | 5016 | 76FF | FFEA | FC76 | 76FF | 8DFA |
| 0000256000 | DE4E | 5116 | 4E8D | 16EE | 8D51 | D24E | 5116 | 681E |
| 0000256020 | 0BF8 | 0568 | FF05 | DA36 | FF0A | D836 | FF0A | DE36 |
| 0000256040 | FF0A | DC36 | 9A0A | 5DB9 | 0000 | C483 | 8B28 | D846 |
| 0000256060 | 55E9 | E902 | 0006 | 00B8 | E900 | 024C | 5EC4 | 26F6 |
| 0000256100 | BF83 | 00C8 | 7500 | E903 | 0095 | 76FF | 9A0E | 2809 |
| 0000256120 | 5EBF | C483 | 8902 | EC46 | 7E83 | 00EC | 0375 | 7EE9 |
| 0000256140 | 8E00 | 7806 | 263A | 3E83 | 5E02 | 7500 | E903 | 0009 |
| 0000256160 | 7E83 | FED6 | 0374 | 0FE9 | 8E00 | 7A06 | 263A | 3E83 |
| 0000256200 | 5E1A | 7500 | E903 | 0051 | 468B | 89EC | D846 | 76FF |
| 0000256220 | FFDC | DA76 | 468D | 16D8 | FF50 | EA76 | 76FF | FFFC |
| 0000256240 | FA76 | 4E8D | 16DE | 8D51 | EE4E | 5116 | 4E8D | 16D2 |
| 0000256260 | 1E51 | F868 | 680B | 050B | 36FF | 0ADA | 36FF | 0AD8 |
| 0000256300 | 36FF | 0ADE | 36FF | 0ADC | 639A | 005E | 8300 | 28C4 |
| 0000256320 | 468B | E9D8 | 01B2 | 06E9 | 8B00 | EC46 | A9E9 | C401 |
| 0000256340 | F65E | 8B26 | D287 | 2600 | 870B | 00D0 | 0374 | 98E9 |
| 0000256360 | FF00 | F876 | 76FF | 9AF6 | 57B7 | 59B4 | C483 | 8904 |
| 0000256400 | EC46 | 7E83 | 00EC | 0375 | 7EE9 | 8E00 | 7806 | 263A |
| 0000256420 | 3E83 | 5F01 | 7500 | E903 | 0009 | 7E83 | FED6 | 0374 |
| 0000256440 | 0FE9 | 8E00 | 7A06 | 263A | 3E83 | 5F19 | 7500 | E903 |
| 0000256460 | 0051 | 468B | 89EC | D846 | 76FF | FFDC | DA76 | 468D |
| 0000256500 | 16D8 | FF50 | EA76 | 76FF | FFFC | FA76 | 4E8D | 16DE |
| 0000256520 | 8D51 | EE4E | 5116 | 4E8D | 16D2 | 1E51 | F868 | 680B |
| 0000256540 | 0512 | 36FF | 0ADA | 36FF | 0AD8 | 36FF | 0ADE | 36FF |
| 0000256560 | 0ADC | 629A | 005F | 8300 | 28C4 | 468B | E9D8 | 0108 |
| 0000256600 | 06E9 | 8B00 | EC46 | FFE9 | C400 | F65E | 8326 | C8BF |
| 0000256620 | 0000 | 0375 | 43E9 | C400 | F65E | FF26 | D2B7 | 2600 |
| 0000256640 | B7FF | 00D0 | 468B | 8BF6 | F856 | FA05 | 5200 | FF50 |
| 0000256660 | 0876 | 76FF | FF06 | 0A76 | 76FF | FFF8 | F676 | 76FF |
| 0000256700 | 8B0E | F646 | 568B | 05F8 | 000C | 5052 | D19A | F226 |
| 0000256720 | 835E | 18C4 | 4689 | E9EC | 0030 | 5EC4 | 2606 | 77FF |
| 0000256740 | 2602 | 37FF | 76FF | C40A | F65E | FF26 | D2B7 | 2600 |
| 0000256760 | B7FF | 00D0 | 468B | 8BF6 | F856 | 0C05 | 5200 | 9A50 |
| 0000257000 | 24F1 | 57EB | C483 | 890E | EC46 | 068E | 3A78 | 8326 |
| 0000257020 | 2C3E | 0059 | 0375 | 09E9 | 8300 | D67E | 74FE | E903 |
| 0000257040 | 000F | 068E | 3A7A | 8326 | 583E | 0059 | 0375 | 51E9 |
| 0000257060 | 8B00 | EC46 | 4689 | FFD8 | DC76 | 76FF | 8DDA | D846 |
| 0000257100 | 5016 | 76FF | FFEA | FC76 | 76FF | 8DFA | DE4E | 5116 |

THU MAR 14 17:31:54 1991 DB_PI.DLL PAGE 96, LINE 5606

| | | | | | | | | |
|---|---|---|---|---|---|---|---|---|
| 0000257120 | 4E8D | 16EE | 8D51 | D24E | 5116 | 681E | 0BF8 | 2168 |
| 0000257140 | FF05 | DA36 | FF0A | D836 | FF0A | DE36 | FF0A | DC36 |
| 0000257160 | 9A0A | 5A2D | 0000 | C483 | 8B28 | D846 | 09E9 | E900 |
| 0000257200 | 0006 | 468B | E9EC | 0000 | 5E1F | 835F | 02ED | E58B |
| 0000257220 | 5D1F | CA4D | 000E | 581E | 4590 | 8B55 | 1EEC | D88E |
| 0000257240 | EC81 | 002C | 5657 | B81E | 5907 | D88E | 46C7 | 0DFA |
| 0000257260 | 8C0C | FC5E | 46C7 | 01EE | 2B01 | 89C0 | E046 | 4689 |
| 0000257300 | 8EDE | 7806 | 263A | 3E83 | 605D | 7500 | E903 | 001D |
| 0000257320 | 36FF | 0ADE | 36FF | 0ADC | 468D | 16D6 | 9A50 | 5942 |
| 0000257340 | 0000 | C483 | 3D08 | 0000 | 0374 | 0FE9 | 8E00 | 7A06 |
| 0000257360 | 263A | 3E83 | 6075 | 7500 | E903 | 003B | 681E | 0C14 |
| 0000257400 | 468D | 16E2 | 8D50 | D646 | 5016 | 468D | 16F2 | 6850 |
| 0000257420 | 0543 | 681E | 0C1C | 36FF | 0ADA | 36FF | 0AD8 | 36FF |
| 0000257440 | 0ADE | 36FF | 0ADC | 8B9A | 0059 | 8300 | 1EC4 | 4689 |
| 0000257460 | 89F2 | F456 | 08E9 | 2B00 | 89C0 | F446 | 4689 | C7F2 |
| 0000257500 | D446 | 0000 | 468D | 16F6 | FF50 | 0C76 | 76FF | FF10 |
| 0000257520 | 0E76 | 2D9A | 43E1 | 8362 | 0AC4 | 4689 | 83F0 | F07E |
| 0000257540 | 7500 | E903 | 007E | 068E | 3A78 | 8326 | 043E | 0061 |
| 0000257560 | 0375 | 09E9 | 8300 | DA7E | 74FE | E903 | 000F | 068E |
| 0000257600 | 3A7A | 8326 | 1C3E | 0061 | 0375 | 51E9 | 8B00 | F046 |
| 0000257620 | 4689 | FFDC | E076 | 76FF | 8DDE | DC46 | 5016 | 76FF |
| 0000257640 | FFEE | FC76 | 76FF | 8DFA | E24E | 5116 | 4E8D | 16F2 |
| 0000257660 | 8D51 | D64E | 5116 | 681E | 0C1C | 4B68 | FF05 | DA36 |
| 0000257700 | FF0A | D836 | FF0A | DE36 | FF0A | DC36 | 9A0A | 6164 |
| 0000257720 | 0000 | C483 | 8B28 | DC46 | EBE9 | E903 | 0006 | 468B |
| 0000257740 | E9F0 | 03E2 | 5EC4 | 26F6 | 7F80 | 0030 | 0374 | 99E9 |
| 0000257760 | C400 | F65E | 8326 | C8BF | 0000 | 0375 | 8BE9 | C400 |
| 0000260000 | F65E | 8326 | F4BF | 0000 | 0375 | 7DE9 | 8E00 | 7806 |
| 0000260020 | 263A | 3E83 | 6198 | 7500 | E903 | 0009 | 7E83 | FEDA |
| 0000260040 | 0374 | 0FE9 | 8E00 | 7A06 | 263A | 3E83 | 61B0 | 7500 |
| 0000260060 | E903 | 0050 | 46C7 | A1DC | FF01 | E076 | 76FF | 8DDE |
| 0000260100 | DC46 | 5016 | 76FF | FFEE | FC76 | 76FF | 8DFA | E24E |
| 0000260120 | 5116 | 4E8D | 16F2 | 8D51 | D64E | 5116 | 681E | 0C1C |
| 0000260140 | 4D68 | FF05 | DA36 | FF0A | D836 | FF0A | DE36 | FF0A |
| 0000260160 | DC36 | 9A0A | 61F9 | 0000 | C483 | 8B28 | DC46 | 45E9 |
| 0000260200 | E903 | 0006 | A1B8 | E901 | 033C | 5EC4 | 26F6 | BF83 |
| 0000260220 | 00C4 | 7D02 | E903 | 0009 | 7E83 | 000A | 0374 | 7EE9 |
| 0000260240 | 8E00 | 7806 | 263A | 3E83 | 5D58 | 7500 | E903 | 0009 |
| 0000260260 | 7E83 | FEDA | 0374 | 0FE9 | 8E00 | 7A06 | 263A | 3E83 |
| 0000260300 | 5CCE | 7500 | E903 | 0051 | 468B | 89D4 | DC46 | 76FF |
| 0000260320 | FFE0 | DE76 | 468D | 16DC | FF50 | EE76 | 76FF | FFFC |
| 0000260340 | FA76 | 4E8D | 16E2 | 8D51 | F24E | 5116 | 4E8D | 16D6 |
| 0000260360 | 1E51 | 1C68 | 680C | 0553 | 36FF | 0ADA | 36FF | 0AD8 |
| 0000260400 | 36FF | 0ADE | 36FF | 0ADC | 169A | 005D | 8300 | 28C4 |
| 0000260420 | 468B | E9DC | 02B0 | 06E9 | 8B00 | D446 | A7E9 | C402 |
| 0000260440 | F65E | 8026 | 307F | 7400 | E903 | 00A6 | 5EC4 | 26F6 |
| 0000260460 | 9FC4 | 00C0 | FF26 | 6A77 | FF26 | 6877 | 76FF | FF08 |
| 0000260500 | 0676 | 5EC4 | 26F6 | 9FC4 | 00C0 | 006A | FF26 | 6677 |
| 0000260520 | 869A | EAA9 | 8E5D | 7806 | 263A | 3E83 | 62EE | 7500 |
| 0000260540 | E903 | 0009 | 7E83 | FEDA | 0374 | 0FE9 | 8E00 | 7A06 |
| 0000260560 | 263A | 3E83 | 6306 | 7500 | E903 | 0050 | 46C7 | 00DC |
| 0000260600 | FF00 | E076 | 76FF | 8DDE | DC46 | 5016 | 76FF | FFEE |
| 0000260620 | FC76 | 76FF | 8DFA | E24E | 5116 | 4E8D | 16F2 | 8D51 |
| 0000260640 | D64E | 5116 | 681E | 0C1C | 5C68 | FF05 | DA36 | FF0A |
| 0000260660 | D836 | FF0A | DE36 | FF0A | DC36 | 9A0A | 634F | 0000 |
| 0000260700 | C483 | 8B28 | DC46 | FDE9 | E901 | 0006 | 00B8 | E900 |
| 0000260720 | 01F4 | 5EC4 | 26F6 | BF83 | 00C8 | 7500 | E903 | 0095 |
| 0000260740 | 76FF | 9A0C | 2809 | 6430 | C483 | 8902 | F046 | 7E83 |
| 0000260760 | 00F0 | 0375 | 7EE9 | 8E00 | 7806 | 263A | 3E83 | 6398 |

THU MAR 14 17:31:54 1991 DB_PI.DLL PAGE 97, LINE 5665

| | | | | | | | | |
|---|---|---|---|---|---|---|---|---|
| 0000261000 | 7500 | E903 | 0009 | 7E83 | FEDA | 0374 | 0FE9 | 8E00 |
| 0000261020 | 7A06 | 263A | 3E83 | 63B0 | 7500 | E903 | 0051 | 468B |
| 0000261040 | 89F0 | DC46 | 76FF | FFE0 | DE76 | 468D | 16DC | FF50 |
| 0000261060 | EE76 | 76FF | FFFC | FA76 | 4E8D | 16E2 | 8D51 | F24E |
| 0000261100 | 5116 | 4E8D | 16D6 | 1E51 | 1C68 | 680C | 0562 | 36FF |
| 0000261120 | 0ADA | 36FF | 0AD8 | 36FF | 0ADE | 36FF | 0ADC | F99A |
| 0000261140 | 0063 | 8300 | 28C4 | 468B | E9DC | 015A | 06E9 | 8B00 |
| 0000261160 | F046 | 51E9 | C401 | F65E | 8B26 | D287 | 2600 | 870B |
| 0000261200 | 00D0 | 0374 | 98E9 | FF00 | F876 | 76FF | 9AF6 | 57B7 |
| 0000261220 | 6045 | C483 | 8904 | F046 | 7E83 | 00F0 | 0375 | 7EE9 |
| 0000261240 | 8E00 | 7806 | 263A | 3E83 | 643F | 7500 | E903 | 0009 |
| 0000261260 | 7E83 | FEDA | 0374 | 0FE9 | 8E00 | 7A06 | 263A | 3E83 |
| 0000261300 | 6457 | 7500 | E903 | 0051 | 468B | 89F0 | DC46 | 76FF |
| 0000261320 | FFE0 | DE76 | 468D | 16DC | FF50 | EE76 | 76FF | FFFC |
| 0000261340 | FA76 | 4E8D | 16E2 | 8D51 | F24E | 5116 | 4E8D | 16D6 |
| 0000261360 | 1E51 | 1C68 | 680C | 0569 | 36FF | 0ADA | 36FF | 0AD8 |
| 0000261400 | 36FF | 0ADE | 36FF | 0ADC | A09A | 0064 | 8300 | 28C4 |
| 0000261420 | 468B | E9DC | 00B0 | 06E9 | 8B00 | F046 | A7E9 | C400 |
| 0000261440 | F65E | FF26 | D2B7 | 2600 | B7FF | 00D0 | 76FF | FF08 |
| 0000261460 | 0676 | 468B | 8BF6 | F856 | 0C05 | 5200 | 9A50 | 22F8 |
| 0000261500 | 5D40 | C483 | 890C | F046 | 068E | 3A78 | 8326 | B83E |
| 0000261520 | 005F | 0375 | 09E9 | 8300 | DA7E | 74FE | E903 | 000F |
| 0000261540 | 068E | 3A7A | 8326 | E43E | 005F | 0375 | 51E9 | 8B00 |
| 0000261560 | F046 | 4689 | FFDC | E076 | 76FF | 8DDE | DC46 | 5016 |
| 0000261600 | 76FF | FFEE | FC76 | 76FF | 8DFA | E24E | 5116 | 4E8D |
| 0000261620 | 16F2 | 8D51 | D64E | 5116 | 681E | 0C1C | 7168 | FF05 |
| 0000261640 | DA36 | FF0A | D836 | FF0A | DE36 | FF0A | DC36 | 9A0A |
| 0000261660 | 60BE | 0000 | C483 | 8B28 | DC46 | 09E9 | E900 | 0006 |
| 0000261700 | 468B | E9F0 | 0000 | 5E1F | 835F | 02ED | E58B | 5D1F |
| 0000261720 | CA4D | 000C | 581E | 4590 | 8B55 | 1EEC | D88E | EC81 |
| 0000261740 | 0034 | 5657 | B81E | 5F98 | D88E | 46C7 | 2FF6 | 8C0C |
| 0000261760 | F85E | 46C7 | 01E6 | 2B01 | 89C0 | D846 | 4689 | 8ED6 |
| 0000262000 | 7806 | 263A | 3E83 | 658C | 7500 | E903 | 001D | 36FF |
| 0000262020 | 0ADE | 36FF | 0ADC | 468D | 16CE | 9A50 | 5FCE | 0000 |
| 0000262040 | C483 | 3D08 | 0000 | 0374 | 0FE9 | 8E00 | 7A06 | 263A |
| 0000262060 | 3E83 | 65A4 | 7500 | E903 | 003B | 681E | 0C36 | 468D |
| 0000262100 | 16DA | 8D50 | CE46 | 5016 | 468D | 16EE | 6850 | 0591 |
| 0000262120 | 681E | 0C3E | 36FF | 0ADA | 36FF | 0AD8 | 36FF | 0ADE |
| 0000262140 | 36FF | 0ADC | 179A | 0060 | 8300 | 1EC4 | 4689 | 89EE |
| 0000262160 | F056 | 08E9 | 2B00 | 89C0 | F046 | 4689 | 2BEE | 89C0 |
| 0000262200 | EA46 | 4689 | C7E8 | CC46 | 0000 | 468B | 0B08 | 0646 |
| 0000262220 | 0374 | 7DE9 | 8E00 | 7806 | 263A | 3E83 | 6648 | 7500 |
| 0000262240 | E903 | 0009 | 7E83 | FED2 | 0374 | 0FE9 | 8E00 | 7A06 |
| 0000262260 | 263A | 3E83 | 6660 | 7500 | E903 | 0050 | 46C7 | 17D4 |
| 0000262300 | FF00 | D876 | 76FF | 8DD6 | D446 | 5016 | 76FF | FFE6 |
| 0000262320 | F876 | 76FF | 8DF6 | DA4E | 5116 | 4E8D | 16EE | 8D51 |
| 0000262340 | CE4E | 5116 | 681E | 0C3E | 9B68 | FF05 | DA36 | FF0A |
| 0000262360 | D836 | FF0A | DE36 | FF0A | DC36 | 9A0A | 66A9 | 0000 |
| 0000262400 | C483 | 8B28 | D446 | 4DE9 | E907 | 0006 | 17B8 | E900 |
| 0000262420 | 0744 | 5EC4 | 2606 | 77FF | 2602 | 37FF | CA9A | C233 |
| 0000262440 | 835B | 04C4 | 5EC4 | 2B06 | 26C0 | 4789 | 2602 | 0789 |
| 0000262460 | 468D | 16FA | 6A50 | FF00 | 1076 | 76FF | 9A0E | CF64 |
| 0000262500 | 66D0 | C483 | 890A | EC46 | 7E83 | 00EC | 0375 | 7EE9 |
| 0000262520 | 8E00 | 7806 | 263A | 3E83 | 66E8 | 7500 | E903 | 0009 |
| 0000262540 | 7E83 | FED2 | 0374 | 0FE9 | 8E00 | 7A06 | 263A | 3E83 |
| 0000262560 | 6700 | 7500 | E903 | 0051 | 468B | 89EC | D446 | 76FF |
| 0000262600 | FFD8 | D676 | 468D | 16D4 | FF50 | E676 | 76FF | FFF8 |
| 0000262620 | F676 | 4E8D | 16DA | 8D51 | EE4E | 5116 | 4E8D | 16CE |
| 0000262640 | 1E51 | 3E68 | 680C | 05A1 | 36FF | 0ADA | 36FF | 0AD8 |

THU MAR 14 17:31:54 1991 DB_PI.DLL PAGE 98, LINE 5724

| | | | | | | | | |
|---|---|---|---|---|---|---|---|---|
| 0000262660 | 36FF | 0ADE | 36FF | 0ADC | 499A | 0067 | 8300 | 28C4 |
| 0000262700 | 468B | E9D4 | 0690 | 06E9 | 8B00 | EC46 | 87E9 | 8D06 |
| 0000262720 | F246 | 5016 | 76FF | FFDC | 1076 | 76FF | 9A0E | E12D |
| 0000262740 | 6380 | C483 | 890A | EC46 | 7E83 | 00EC | 0375 | 7EE9 |
| 0000262760 | 8E00 | 7806 | 263A | 3E83 | 6773 | 7500 | E903 | 0009 |
| 0000263000 | 7E83 | FED2 | 0374 | 0FE9 | 8E00 | 7A06 | 263A | 3E83 |
| 0000263020 | 678B | 7500 | E903 | 0051 | 468B | 89EC | D446 | 76FF |
| 0000263040 | FFD8 | D676 | 468D | 16D4 | FF50 | E676 | 76FF | FFF8 |
| 0000263060 | F676 | 4E8D | 16DA | 8D51 | EE4E | 5116 | 4E8D | 16CE |
| 0000263100 | 1E51 | 3E68 | 680C | 05A5 | 36FF | 0ADA | 36FF | 0AD8 |
| 0000263120 | 36FF | 0ADE | 36FF | 0ADC | D39A | 0067 | 8300 | 28C4 |
| 0000263140 | 468B | E9D4 | 05F0 | 06E9 | 8B00 | EC46 | E7E9 | C405 |
| 0000263160 | F25E | 8326 | 027F | 7400 | E903 | 007D | 068E | 3A78 |
| 0000263200 | 8326 | 193E | 0068 | 0375 | D9E9 | 8300 | D27E | 74FE |
| 0000263220 | E903 | 000F | 068E | 3A7A | 8326 | 313E | 0068 | 0375 |
| 0000263240 | 50E9 | C700 | D446 | 01A6 | 76FF | FFD8 | D676 | 468D |
| 0000263260 | 16D4 | FF50 | E676 | 76FF | FFF8 | F676 | 4E8D | 16DA |
| 0000263300 | 8D51 | EE4E | 5116 | 4E8D | 16CE | 1E51 | 3E68 | 680C |
| 0000263320 | 05A8 | 36FF | 0ADA | 36FF | 0AD8 | 36FF | 0ADE | 36FF |
| 0000263340 | 0ADC | 799A | 0068 | 8300 | 28C4 | 468B | E9D4 | 0566 |
| 0000263360 | 06E9 | B800 | 01A6 | 5DE9 | C405 | F25E | 8026 | 307F |
| 0000263400 | 7400 | E903 | 0099 | 5EC4 | 26F2 | BF83 | 00C8 | 7500 |
| 0000263420 | E903 | 008B | 5EC4 | 26F2 | BF83 | 00F4 | 7500 | E903 |
| 0000263440 | 007D | 068E | 3A78 | 8326 | 4C3E | 0062 | 0375 | 09E9 |
| 0000263460 | 8300 | D27E | 74FE | E903 | 000F | 068E | 3A7A | 8326 |
| 0000263500 | 643E | 0062 | 0375 | 50E9 | C700 | D446 | 01A1 | 76FF |
| 0000263520 | FFD8 | D676 | 468D | 16D4 | FF50 | E676 | 76FF | FFF8 |
| 0000263540 | F676 | 4E8D | 16DA | 8D51 | EE4E | 5116 | 4E8D | 16CE |
| 0000263560 | 1E51 | 3E68 | 680C | 05AA | 36FF | 0ADA | 36FF | 0AD8 |
| 0000263600 | 36FF | 0ADE | 36FF | 0ADC | AC9A | 0062 | 8300 | 28C4 |
| 0000263620 | 468B | E9D4 | 04C0 | 06E9 | B800 | 01A1 | B7E9 | C404 |
| 0000263640 | F25E | 8026 | 307F | 7500 | E903 | 031C | 5EC4 | 26F2 |
| 0000263660 | BF83 | 00C8 | 7500 | E903 | 00B9 | 76FF | 9A0C | 2809 |
| 0000263700 | 697E | C483 | 8902 | EC46 | 7E83 | 00EC | 0375 | 7EE9 |
| 0000263720 | 8E00 | 7806 | 263A | 3E83 | 69CB | 7500 | E903 | 0009 |
| 0000263740 | 7E83 | FED2 | 0374 | 0FE9 | 8E00 | 7A06 | 263A | 3E83 |
| 0000263760 | 69E3 | 7500 | E903 | 0051 | 468B | 89EC | D446 | 76FF |
| 0000264000 | FFD8 | D676 | 468D | 16D4 | FF50 | E676 | 76FF | FFF8 |
| 0000264020 | F676 | 4E8D | 16DA | 8D51 | EE4E | 5116 | 4E8D | 16CE |
| 0000264040 | 1E51 | 3E68 | 680C | 05B0 | 36FF | 0ADA | 36FF | 0AD8 |
| 0000264060 | 36FF | 0ADE | 36FF | 0ADC | 2C9A | 006A | 8300 | 28C4 |
| 0000264100 | 468B | E9D4 | 0410 | 06E9 | 8B00 | EC46 | 07E9 | C404 |
| 0000264120 | F25E | FF26 | FCB7 | 2600 | B7FF | 00FA | CA9A | 0F33 |
| 0000264140 | 8366 | 04C4 | 5EC4 | 2BF2 | 26C0 | 8789 | 00FC | 8926 |
| 0000264160 | FA87 | C400 | F25E | FF26 | CEB7 | 260D | B7FF | 00CC |
| 0000264200 | 468B | 8BF2 | F456 | 0C05 | 5200 | 9A50 | 2176 | 69B3 |
| 0000264220 | C483 | 8908 | EC46 | 5EC4 | 26F2 | 878B | 00D2 | 0B26 |
| 0000264240 | D087 | 7500 | E903 | 017D | 5EC4 | 26F2 | B7FF | 00D2 |
| 0000264260 | FF26 | D0B7 | 8B00 | F246 | 568B | 05F4 | 000C | 5052 |
| 0000264300 | 769A | 0221 | 836C | 08C4 | 4689 | 83EC | EC7E | 7500 |
| 0000264320 | E903 | 007E | 068E | 3A78 | 8326 | 9E3E | 006A | 0375 |
| 0000264340 | 09E9 | 8300 | D27E | 74FE | E903 | 000F | 068E | 3A7A |
| 0000264360 | 8326 | B63E | 006A | 0375 | 51E9 | 8B00 | EC46 | 4689 |
| 0000264400 | FFD4 | D876 | 76FF | 8DD6 | D446 | 5016 | 76FF | FFE6 |
| 0000264420 | F876 | 76FF | 8DF6 | DA4E | 5116 | 4E8D | 16EE | 8D51 |
| 0000264440 | CE4E | 5116 | 681E | 0C3E | BE68 | FFC5 | DA36 | FF0A |
| 0000264460 | D836 | FF0A | DE36 | FF0A | DC36 | 9A0A | 6AFF | 0000 |
| 0000264500 | C483 | 8B28 | D446 | 0DE9 | E903 | 0006 | 468B | E9EC |
| 0000264520 | 0304 | 7E83 | 000A | 0375 | 37E9 | 8B00 | F246 | 568B |

THU MAR 14 17:31:54 1991 DB_PI.DLL PAGE 99, LINE 5783

| | | | | | | | | |
|---|---|---|---|---|---|---|---|---|
| 0000264540 | 05F4 | 000C | 5052 | 016A | 468B | 8BF2 | F456 | D405 |
| 0000264560 | 5200 | 8B50 | F246 | 568B | 05F4 | 0030 | 5052 | 76FF |
| 0000264600 | FFFC | FA76 | E99A | 9270 | 836A | 12C4 | 4689 | E9EC |
| 0000264620 | 0093 | 76FF | FF10 | 0E76 | 76FF | 6A0C | 6A00 | 9A00 |
| 0000264640 | 3A7B | 6630 | 4689 | 8EEC | 7806 | 263A | 3E83 | 6B25 |
| 0000264660 | 7500 | E903 | 0009 | 7E83 | FED2 | 0374 | 0FE9 | 8E00 |
| 0000264700 | 7A06 | 263A | 3E83 | 6B3D | 7500 | E903 | 0051 | 468B |
| 0000264720 | 89EC | D446 | 76FF | FFD8 | D676 | 468D | 16D4 | FF50 |
| 0000264740 | E676 | 76FF | FFF8 | F676 | 4E8D | 16DA | 8D51 | EE4E |
| 0000264760 | 5116 | 4E8D | 16CE | 1E51 | 3E68 | 680C | 05C9 | 36FF |
| 0000265000 | 0ADA | 36FF | 0AD8 | 36FF | 0ADE | 36FF | 0ADC | 869A |
| 0000265020 | 006B | 8300 | 28C4 | 468B | E9D4 | 023A | 06E9 | 8B00 |
| 0000265040 | EC46 | 31E9 | 8302 | EC7E | 7500 | E903 | 007E | 068E |
| 0000265060 | 3A78 | 8326 | F63E | 0064 | 0375 | 09E9 | 8300 | D27E |
| 0000265100 | 74FE | E903 | 000F | 068E | 3A7A | 8326 | 223E | 0065 |
| 0000265120 | 0375 | 51E9 | 8B00 | EC46 | 4689 | FFD4 | D876 | 76FF |
| 0000265140 | 8DD6 | D446 | 5016 | 76FF | FFE6 | F876 | 76FF | 8DF6 |
| 0000265160 | DA4E | 5116 | 4E8D | 16EE | 8D51 | CE4E | 5116 | 681E |
| 0000265200 | 0C3E | CE68 | FF05 | DA36 | FF0A | D836 | FF0A | DE36 |
| 0000265220 | FF0A | DC36 | 9A0A | 65EC | 0000 | C483 | 8B28 | D446 |
| 0000265240 | B3E9 | E901 | 0006 | 468B | E9EC | 01AA | 5EC4 | 26F2 |
| 0000265260 | BF83 | 00C8 | 7500 | E903 | 000B | 5EC4 | 26F2 | 878B |
| 0000265300 | 00F4 | 4689 | E9CC | 0075 | 7E83 | 000A | 0375 | 4CE9 |
| 0000265320 | 8D00 | E846 | 5016 | 5EC4 | 26F2 | B7FF | 00C2 | FF26 |
| 0000265340 | C0B7 | 6A00 | C401 | F25E | FF26 | CAB7 | C400 | F25E |
| 0000265360 | FF26 | C8B7 | 6A00 | C401 | F25E | 8B26 | C087 | 2600 |
| 0000265400 | 978B | 00C2 | 2405 | 5200 | FF50 | FC76 | 76FF | 9AFA |
| 0000265420 | 1120 | 62D6 | C483 | 8918 | CC46 | 20E9 | C400 | F25E |
| 0000265440 | FF26 | 0677 | FF26 | 0477 | 5EC4 | 26F2 | B7FF | 00C2 |
| 0000265460 | FF26 | C0B7 | 9A00 | BB24 | 57A1 | 4689 | FFCC | 0C76 |
| 0000265500 | 76FF | FF10 | 0E76 | 1A9A | 77E2 | 836A | 06C4 | 4689 |
| 0000265520 | 83EC | EC7E | 7500 | E903 | 007E | 068E | 3A78 | 8326 |
| 0000265540 | CF3E | 006C | 0375 | 09E9 | 8300 | D27E | 74FE | E903 |
| 0000265560 | 000F | 068E | 3A7A | 8326 | E73E | 006C | 0375 | 51E9 |
| 0000265600 | 8B00 | EC46 | 4689 | FFD4 | D876 | 76FF | 8DD6 | D446 |
| 0000265620 | 5016 | 76FF | FFE6 | F876 | 76FF | 8DF6 | DA4E | 5116 |
| 0000265640 | 4E8D | 16EE | 8D51 | CE4E | 5116 | 681E | 0C3E | EE68 |
| 0000265660 | FF05 | DA36 | FF0A | D836 | FF0A | DE36 | FF0A | DC36 |
| 0000265700 | 9A0A | 6D30 | 0000 | C483 | 8B28 | D446 | 87E9 | E900 |
| 0000265720 | 0006 | 468B | E9EC | 007E | 068E | 3A78 | 8326 | C83E |
| 0000265740 | 0068 | 0375 | D9E9 | 8300 | D27E | 74FE | E903 | 000F |
| 0000265760 | 068E | 3A7A | 8326 | E03E | 0068 | 0375 | 51E9 | 8B00 |
| 0000266000 | CC46 | 4689 | FFD4 | D876 | 76FF | 8DD6 | D446 | 5016 |
| 0000266020 | 76FF | FFE6 | F876 | 76FF | 8DF6 | DA4E | 5116 | 4E8D |
| 0000266040 | 16EE | 8D51 | CE4E | 5116 | 681E | 0C3E | F068 | FF05 |
| 0000266060 | DA36 | FF0A | D836 | FF0A | DE36 | FF0A | DC36 | 9A0A |
| 0000266100 | 6929 | 0000 | C483 | 8B28 | D446 | 09E9 | E900 | 0006 |
| 0000266120 | 468B | E9CC | 0000 | 5E1F | 835F | 02ED | E58B | 5D1F |
| 0000266140 | CA4D | 000C | 581E | 4590 | 8B55 | 1EEC | D88E | EC81 |
| 0000266160 | 002E | 5657 | 46C7 | 50FA | 8C0C | FC5E | 46C7 | 01EA |
| 0000266200 | 2B01 | 89C0 | DC46 | 4689 | 8EDA | 7806 | 263A | 3E83 |
| 0000266220 | 6E1F | 7500 | E903 | 001D | 36FF | 0ADE | 36FF | 0ADC |
| 0000266240 | 468D | 16D2 | 9A50 | 650C | 0000 | C483 | 3D08 | 0000 |
| 0000266260 | 0374 | 0FE9 | 8E00 | 7A06 | 263A | 3E83 | 6E37 | 7500 |
| 0000266300 | E903 | 003B | 681E | 0C57 | 468D | 16DE | 8D50 | D246 |
| 0000266320 | 5016 | 468D | 16EE | 6850 | 0623 | 681E | 0C5E | 36FF |
| 0000266340 | 0ADA | 36FF | 0AD8 | 36FF | 0ADE | 36FF | 0ADC | 559A |
| 0000266360 | 0065 | 8300 | 1EC4 | 4689 | 89EE | F056 | 08E9 | 2B00 |
| 0000266400 | 89C0 | F046 | 4689 | 8DEE | F646 | 5016 | 006A | 76FF |

THU MAR 14 17:31:54 1991 DB_PI.DLL PAGE 100, LINE 5842

| | | | | | | | | |
|---|---|---|---|---|---|---|---|---|
| 0000266420 | FF08 | 0676 | 649A | A7CF | 836E | 0AC4 | 4689 | 83EC |
| 0000266440 | EC7E | 7500 | E903 | 007E | 068E | 3A78 | 8326 | BF3E |
| 0000266460 | 006E | 0375 | 09E9 | 8300 | D67E | 74FE | E903 | 000F |
| 0000266500 | 068E | 3A7A | 8326 | D73E | 006E | 0375 | 51E9 | 8B00 |
| 0000266520 | EC46 | 4689 | FFD8 | DC76 | 76FF | 8DDA | D846 | 5016 |
| 0000266540 | 76FF | FFEA | FC76 | 76FF | 8DFA | DE4E | 5116 | 4E8D |
| 0000266560 | 16EE | 8D51 | D24E | 5116 | 681E | 0C5E | 2868 | FF06 |
| 0000266600 | DA36 | FF0A | D836 | FF0A | DE36 | FF0A | DC36 | 9A0A |
| 0000266620 | 6F20 | 0000 | C483 | 8B28 | D846 | 51E9 | E902 | 0006 |
| 0000266640 | 468B | E9EC | 0248 | 468D | 16F2 | FF50 | 0A76 | 76FF |
| 0000266660 | FF08 | 0676 | 2D9A | 39E1 | 836C | 0AC4 | 4689 | 83EC |
| 0000266700 | EC7E | 7500 | E903 | 007E | 068E | 3A78 | 8326 | 4B3E |
| 0000266720 | 006F | 0375 | 09E9 | 8300 | D67E | 74FE | E903 | 000F |
| 0000266740 | 068E | 3A7A | 8326 | 633E | 006F | 0375 | 51E9 | 8B00 |
| 0000266760 | EC46 | 4689 | FFD8 | DC76 | 76FF | 8DDA | D846 | 5016 |
| 0000267000 | 76FF | FFEA | FC76 | 76FF | 8DFA | DE4E | 5116 | 4E8D |
| 0000267020 | 16EE | 8D51 | D24E | 5116 | 681E | 0C5E | 2D68 | FF06 |
| 0000267040 | DA36 | FF0A | D836 | FF0A | DE36 | FF0A | DC36 | 9A0A |
| 0000267060 | 6FAB | 0000 | C483 | 8B28 | D846 | B1E9 | E901 | 0006 |
| 0000267100 | 468B | E9EC | 01A8 | 5EC4 | 26F2 | BF83 | 00C8 | 7400 |
| 0000267120 | E903 | 007D | 068E | 3A78 | 8326 | DF3E | 006F | 0375 |
| 0000267140 | 09E9 | 8300 | D67E | 74FE | E903 | 000F | 068E | 3A7A |
| 0000267160 | 8326 | F73E | 006F | 0375 | 50E9 | C700 | D846 | 0000 |
| 0000267200 | 76FF | FFDC | DA76 | 468D | 16D8 | FF50 | EA76 | 76FF |
| 0000267220 | FFFC | FA76 | 4E8D | 16DE | 8D51 | EE4E | 5116 | 4E8D |
| 0000267240 | 16D2 | 1E51 | 5E68 | 680C | 0630 | 36FF | 0ADA | 36FF |
| 0000267260 | 0AD8 | 36FF | 0ADE | 36FF | 0ADC | 409A | 0070 | 8300 |
| 0000267300 | 28C4 | 468B | E9D8 | 0126 | 06E9 | B800 | 0000 | 1DE9 |
| 0000267320 | FF01 | 0A76 | 099A | B028 | 8368 | 02C4 | 4689 | 83EC |
| 0000267340 | EC7E | 7500 | E903 | 007E | 068E | 3A78 | 8326 | 5D3E |
| 0000267360 | 0070 | 0375 | 09E9 | 8300 | D67E | 74FE | E903 | 000F |
| 0000267400 | 068E | 3A7A | 8326 | 753E | 0070 | 0375 | 51E9 | 8B00 |
| 0000267420 | EC46 | 4689 | FFD8 | DC76 | 76FF | 8DDA | D846 | 5016 |
| 0000267440 | 76FF | FFEA | FC76 | 76FF | 8DFA | DE4E | 5116 | 4E8D |
| 0000267460 | 16EE | 8D51 | D24E | 5116 | 681E | 0C5E | 3468 | FF06 |
| 0000267500 | DA36 | FF0A | D836 | FF0A | DE36 | FF0A | DC36 | 9A0A |
| 0000267520 | 70C3 | 0000 | C483 | 8B28 | D846 | 91E9 | E900 | 0006 |
| 0000267540 | 468B | E9EC | 0088 | 068E | 3A78 | 8326 | 513E | 006C |
| 0000267560 | 0375 | 09E9 | 8300 | D67E | 74FE | E903 | 000F | 068E |
| 0000267600 | 3A7A | 8326 | 693E | 006C | 0375 | 56E9 | C400 | F25E |
| 0000267620 | 8B26 | F487 | 8900 | D846 | 76FF | FFDC | DA76 | 468D |
| 0000267640 | 16D8 | FF50 | EA76 | 76FF | FFFC | FA76 | 4E8D | 16DE |
| 0000267660 | 8D51 | EE4E | 5116 | 4E8D | 16D2 | 1E51 | 5E68 | 680C |
| 0000267700 | 0636 | 36FF | 0ADA | 36FF | 0AD8 | 36FF | 0ADE | 36FF |
| 0000267720 | 0ADC | B29A | 006C | 8300 | 28C4 | 468B | E9D8 | 000E |
| 0000267740 | 0BE9 | C400 | F25E | 8B26 | F487 | E900 | 0000 | 5F5E |
| 0000267760 | ED83 | 8B02 | 1FE5 | 4D5D | 1ECB | 9058 | 5545 | EC8B |
| 0000270000 | 8E1E | 81D8 | 04EC | 5702 | 6A56 | 6A00 | 9A00 | 3908 |
| 0000270020 | 7181 | C483 | C404 | 145E | 8926 | 5047 | 8926 | 5257 |
| 0000270040 | 7E83 | 0012 | 0375 | 14E9 | 8300 | 127E | 7502 | E903 |
| 0000270060 | 000B | 468B | 0B0C | 0A46 | 0374 | 40E9 | 8B00 | 1446 |
| 0000270100 | 568B | 0516 | 0024 | 5052 | 468B | 8B14 | 1656 | 0405 |
| 0000270120 | 5200 | C450 | 145E | FF26 | 4877 | 76FF | FF08 | 0676 |
| 0000270140 | 589A | 9A1E | 8371 | 0EC4 | 4689 | 83FC | FC7E | 7500 |
| 0000270160 | E903 | 0006 | 468B | E9FC | 01C2 | 19E9 | FF00 | 0C76 |
| 0000270200 | 76FF | 8B0A | 1446 | 568B | 0516 | 0024 | 5052 | 509A |
| 0000270220 | E227 | 8371 | 08C4 | 76FF | 6A12 | FF01 | 1676 | 76FF |
| 0000270240 | FF14 | 0876 | 76FF | 9A06 | 0000 | 72E2 | C483 | 890C |
| 0000270260 | FC46 | 7E83 | 00FC | 0375 | 06E9 | 8B00 | FC46 | 7BE9 |

THU MAR 14 17:31:54 1991 DB_PI.DLL PAGE 101, LINE 5901

| | | | | | | | | |
|---|---|---|---|---|---|---|---|---|
| 0000270300 | 8B01 | 0C46 | 460B | 750A | E903 | 0062 | 7E83 | 0112 |
| 0000270320 | 0374 | 59E9 | C400 | 145E | 8A26 | 4867 | C02A | 4603 |
| 0000270340 | 8B06 | 0856 | 862D | 5274 | 8D50 | FC86 | 16FE | 9A50 |
| 0000270360 | 2750 | 71F4 | C483 | 1E08 | 7568 | 8D0C | FC86 | 16FE |
| 0000270400 | 9A50 | 270A | 7208 | C483 | FF08 | 0C76 | 76FF | 8D0A |
| 0000270420 | FC86 | 16FE | 9A50 | 270A | 7216 | C483 | 8D08 | FC86 |
| 0000270440 | 16FE | 9A50 | 421C | 723B | C483 | 8904 | FC46 | 5EC4 |
| 0000270460 | 2614 | 678A | 2A48 | 03C0 | 0646 | 568B | 2D08 | 7486 |
| 0000270500 | 5052 | 868D | FEFC | 5016 | 509A | 4D27 | 8372 | 08C4 |
| 0000270520 | 681E | 0C77 | 868D | FEFC | 5016 | 0A9A | 6627 | 8372 |
| 0000270540 | 08C4 | 468B | 8B14 | 1656 | 2405 | 5200 | 8D50 | FC86 |
| 0000270560 | 16FE | 9A50 | 270A | 7288 | C483 | C408 | 145E | 8A26 |
| 0000270600 | 4867 | C02A | 4603 | 8B06 | 0856 | 862D | 5274 | 8D50 |
| 0000270620 | FC86 | 16FD | 9A50 | 2750 | 729A | C483 | 1E08 | 7968 |
| 0000270640 | 8D0C | FC86 | 16FD | 9A50 | 270A | 72AE | C483 | FF08 |
| 0000270660 | 1076 | 76FF | 8D0E | FC86 | 16FD | 9A50 | 270A | 72C2 |
| 0000270700 | C483 | 8D08 | FC86 | 16FE | 8D50 | FC86 | 16FD | 9A50 |
| 0000270720 | 41F8 | 72EA | C483 | 8908 | FC46 | 7E83 | 00FC | 0375 |
| 0000270740 | 53E9 | FF00 | 1676 | 76FF | FF14 | 0876 | 76FF | 9A06 |
| 0000270760 | 02FE | 6FC7 | C483 | 9A08 | 04F6 | 694F | C28E | D88B |
| 0000271000 | 8B26 | E907 | 0018 | 46C7 | A4FC | E901 | 0022 | 46C7 |
| 0000271020 | B7FC | E901 | 001A | 46C7 | 0DFC | E900 | 0012 | 4848 |
| 0000271040 | 0375 | E9E9 | 2DFF | 000B | 0375 | D9E9 | E9FF | FFE6 |
| 0000271060 | 468B | E9FC | 0006 | 00B8 | E900 | 0000 | 5F5E | ED83 |
| 0000271100 | 8B02 | 1FE5 | 4D5D | 1ECB | 9058 | 5545 | EC8B | 8E1E |
| 0000271120 | 81D8 | 04EC | 5701 | C756 | FC86 | 00FE | 6A00 | 6A00 |
| 0000271140 | 9A00 | 3908 | 7100 | C483 | C404 | 105E | 8926 | 5047 |
| 0000271160 | 8926 | 5257 | 76FF | 6A0E | FF00 | 1276 | 76FF | FF10 |
| 0000271200 | 0876 | 76FF | 9A06 | 0000 | 7153 | C483 | 890C | FC86 |
| 0000271220 | 83FE | FCBE | 00FE | 0375 | 07E9 | 8B00 | FC86 | E9FE |
| 0000271240 | 00C0 | 468B | 0B0C | 0A46 | 0375 | 15E9 | C400 | 0A5E |
| 0000271260 | 8026 | 003F | 0375 | 09E9 | 8300 | 0E7E | 7501 | E903 |
| 0000271300 | 0006 | 00B8 | E900 | 009A | 5EC4 | 2610 | 678A | 2A48 |
| 0000271320 | 03C0 | 0646 | 568B | 2D08 | 7486 | 5052 | 868D | FEFE |
| 0000271340 | 5016 | 509A | E727 | 8373 | 08C4 | 681E | 0C7B | 868D |
| 0000271360 | FEFE | 5016 | 0A9A | FB27 | 8373 | 08C4 | 76FF | FF0C |
| 0000271400 | 0A76 | 868D | FEFE | 5016 | 0A9A | 0927 | 8374 | 08C4 |
| 0000271420 | 868D | FEFE | 5016 | 1C9A | 1942 | 8374 | 04C4 | 003D |
| 0000271440 | 7500 | E903 | 0036 | F69A | 5404 | 8E73 | 8BC2 | 26D8 |
| 0000271460 | 078B | 15E9 | B800 | 01A4 | 27E9 | B800 | 01B7 | 21E9 |
| 0000271500 | B800 | 000A | 1BE9 | E900 | 0012 | 4848 | 0375 | EAE9 |
| 0000271520 | 2DFF | 000B | 0375 | DCE9 | E9FF | FFE5 | 00B8 | E900 |
| 0000271540 | 0000 | 5F5E | ED83 | 8B02 | 1FE5 | 4D5D | 00CB | 581E |
| 0000271560 | 4590 | 8B55 | 1EEC | D88E | EC81 | 0168 | 5657 | 468D |
| 0000271600 | 16F8 | 9A50 | CEC7 | 6E07 | C483 | 8904 | FC46 | 7E83 |
| 0000271620 | 00FC | 0375 | 06E9 | 8B00 | FC46 | 9AE9 | 8B01 | F846 |
| 0000271640 | 568B | 05FA | 005C | 5EC4 | 2608 | 0789 | 8926 | 0257 |
| 0000271660 | 5EC4 | 2608 | 1FC4 | 8326 | 80BF | 0000 | 0374 | 70E9 |
| 0000271700 | C401 | F85E | 8B26 | 0887 | 2601 | 870B | 0106 | 0374 |
| 0000271720 | 06E9 | B800 | 01AB | 5EE9 | C401 | F85E | FF26 | 08B7 |
| 0000271740 | 2601 | B7FF | 0106 | 006A | 006A | 468D | 16F0 | 9A50 |
| 0000271760 | 310B | 6C28 | 4689 | 83FC | FC7E | 7500 | E903 | 0006 |
| 0000272000 | 468B | E9FC | 0131 | 5EC4 | 26F0 | 478B | 2648 | 578B |
| 0000272020 | 894A | F446 | 5689 | FFF6 | F276 | 76FF | 9AF0 | 2448 |
| 0000272040 | 7524 | C483 | FF04 | F676 | 76FF | 8DF4 | F086 | 16FE |
| 0000272060 | 9A50 | 2750 | 7536 | C483 | 1E08 | 8D68 | 8D0C | F086 |
| 0000272100 | 16FE | 9A50 | 270A | 7553 | C483 | C408 | 085E | 8B26 |
| 0000272120 | 2607 | 578B | 0502 | 008A | 5052 | 868D | FEF0 | 5016 |
| 0000272140 | 0A9A | B327 | 8375 | 08C4 | 2F6A | 868D | FEF0 | 5016 |

THU MAR 14 17:31:54 1991 DB_PI.DLL PAGE 102, LINE 5960

| | | | | | | | | |
|---|---|---|---|---|---|---|---|---|
| 0000272160 | CF9A | 9929 | 8375 | 06C4 | 003D | 7400 | E903 | 0065 |
| 0000272200 | 7E83 | 0206 | 037D | 48E9 | 6A00 | 6A00 | 6A05 | 6A00 |
| 0000272220 | 6801 | 0400 | 76FF | FFF6 | F476 | 166A | 5EC4 | 2608 |
| 0000272240 | 77FF | 2602 | 37FF | 099A | EE16 | 8375 | 14C4 | 4689 |
| 0000272260 | 83FC | FC7E | 7500 | E903 | 0014 | 76FF | FFF6 | F476 |
| 0000272300 | 489A | CA24 | 8375 | 04C4 | 468B | E9FC | 0069 | 14E9 |
| 0000272320 | FF00 | F676 | 76FF | 9AF4 | 2448 | 7608 | C483 | B804 |
| 0000272340 | 019D | 52E9 | 6A00 | 6A16 | 6A00 | FF01 | F676 | 76FF |
| 0000272360 | C4F4 | 085E | FF26 | 0277 | FF26 | 9A37 | 0D63 | 41A3 |
| 0000272400 | C483 | 890E | FC46 | 7E83 | 00FC | 0375 | 14E9 | FF00 |
| 0000272420 | F676 | 76FF | 9AF4 | 2448 | 761C | C483 | 8B04 | FC46 |
| 0000272440 | 14E9 | FF00 | F676 | 76FF | 9AF4 | 2448 | 73D5 | C483 |
| 0000272460 | B804 | 0000 | 00E9 | 5E00 | 835F | 02ED | E58B | 5D1F |
| 0000272500 | CB4D | 581E | 4590 | 8B55 | 1EEC | D88E | EC81 | 0008 |
| 0000272520 | 5657 | 468B | 0B08 | 0646 | 0375 | 79E9 | 8D00 | FA46 |
| 0000272540 | 5016 | 76FF | FF0A | 0876 | 76FF | 9A06 | CF64 | 76D2 |
| 0000272560 | C483 | 890A | F846 | 7E83 | 00F8 | 0375 | 06E9 | 8B00 |
| 0000272600 | F846 | 7AE9 | C400 | FA5E | 8326 | FABF | 0006 | 0374 |
| 0000272620 | 18E9 | C400 | FA5E | FF26 | 2477 | 76FF | FFFC | FA76 |
| 0000272640 | DF9A | 782E | 8373 | 06C4 | 03E9 | B800 | 0000 | 4689 |
| 0000272660 | 83F8 | F87E | 7500 | E903 | 0006 | 468B | E9F8 | 003F |
| 0000272700 | 468B | 8BFA | FC56 | 7A05 | C406 | 0C5E | 8926 | 2607 |
| 0000272720 | 5789 | E902 | 0023 | 76FF | FF0E | 0C76 | 76FF | 9A0A |
| 0000272740 | 745E | 7476 | C483 | 8906 | F846 | 7E83 | 00F8 | 0375 |
| 0000272760 | 06E9 | 8B00 | F846 | 06E9 | B800 | 0000 | 00E9 | 5E00 |
| 0000273000 | 835F | 02ED | E58B | 5D1F | CB4D | 581E | 4590 | 8B55 |
| 0000273020 | 1EEC | D88E | EC81 | 002A | 5657 | B81E | 64D6 | D88E |
| 0000273040 | 46C7 | 98FA | 8C0C | FC5E | 46C7 | 01EE | 2B01 | 89C0 |
| 0000273060 | E046 | 4689 | 8EDE | 7C06 | 263A | 3E83 | 6D80 | 7500 |
| 0000273100 | E903 | 001D | 36FF | 0C96 | 36FF | 0C94 | 468D | 16D6 |
| 0000273120 | 9A50 | 6D96 | 0000 | C483 | 3D08 | 0000 | 0374 | 0FE9 |
| 0000273140 | 8E00 | 7E06 | 263A | 3E83 | 77DA | 7500 | E903 | 003B |
| 0000273160 | 681E | 0C9F | 468D | 16E2 | 8D50 | D646 | 5016 | 468D |
| 0000273200 | 16F6 | 6850 | 00FC | 681E | 0CA6 | 36FF | 0C92 | 36FF |
| 0000273220 | 0C90 | 36FF | 0C96 | 36FF | 0C94 | DF9A | 006D | 8300 |
| 0000273240 | 1EC4 | 4689 | 89F6 | F856 | 08E9 | 2B00 | 89C0 | F846 |
| 0000273260 | 4689 | 8BF6 | 0A46 | 460B | 7508 | E903 | 000D | 5EC4 |
| 0000273300 | 2608 | 7F80 | 0004 | 0374 | 7DE9 | 8E00 | 7C06 | 263A |
| 0000273320 | 3E83 | 7869 | 7500 | E903 | 0009 | 7E83 | FEDA | 0374 |
| 0000273340 | 0FE9 | 8E00 | 7E06 | 263A | 3E83 | 7881 | 7500 | E903 |
| 0000273360 | 0050 | 46C7 | 13DC | FF00 | E076 | 76FF | 8DDE | DC46 |
| 0000273400 | 5016 | 76FF | FFEE | FC76 | 76FF | 8DFA | E24E | 5116 |
| 0000273420 | 4E8D | 16F6 | 8D51 | D64E | 5116 | 681E | 0CA6 | 0468 |
| 0000273440 | FF01 | 9236 | FF0C | 9036 | FF0C | 9636 | FF0C | 9436 |
| 0000273460 | 9A0C | 78CA | 0000 | C483 | 8B28 | DC46 | 23E9 | E902 |
| 0000273500 | 0006 | 13B8 | E900 | 021A | 468B | 8B08 | 0A56 | 0405 |
| 0000273520 | 5200 | 8B50 | 0846 | 568B | 050A | 0004 | 5052 | 3D9A |
| 0000273540 | 6342 | 8375 | 08C4 | 4689 | 83F4 | F47E | 7500 | E903 |
| 0000273560 | 007E | 068E | 3A7C | 8326 | 083E | 0079 | 0375 | 09E9 |
| 0000273600 | 8300 | DA7E | 74FE | E903 | 000F | 068E | 3A7E | 8326 |
| 0000273620 | 203E | 0079 | 0375 | 51E9 | 8B00 | F446 | 4689 | FFDC |
| 0000273640 | E076 | 76FF | 8DDE | DC46 | 5016 | 76FF | FFEE | FC76 |
| 0000273660 | 76FF | 8DFA | E24E | 5116 | 4E8D | 16F6 | 8D51 | D64E |
| 0000273700 | 5116 | 681E | 0CA6 | 0768 | FF01 | 9236 | FF0C | 9036 |
| 0000273720 | FF0C | 9636 | FF0C | 9436 | 9A0C | 7969 | 0000 | C483 |
| 0000273740 | 8B28 | DC46 | 7BE9 | E901 | 0006 | 468B | E9F4 | 0172 |
| 0000273760 | 468D | 16F0 | 6A50 | FF02 | 0E76 | 76FF | 9A0C | 7632 |
| 0000274000 | 765E | C483 | 890A | F446 | 7E83 | 00F4 | 0375 | 7EE9 |
| 0000274020 | 8E00 | 7C06 | 263A | 3E83 | 772C | 7500 | E903 | 0009 |

THU MAR 14 17:31:54 1991 DB_PI.DLL PAGE 103, LINE 6019

| | | | | | | | | |
|---|---|---|---|---|---|---|---|---|
| 0000274040 | 7E83 | FEDA | 0374 | 0FE9 | 8E00 | 7E06 | 263A | 3E83 |
| 0000274060 | 6DAC | 7500 | E903 | 0051 | 468B | 89F4 | DC46 | 76FF |
| 0000274100 | FFE0 | DE76 | 468D | 16DC | FF50 | EE76 | 76FF | FFFC |
| 0000274120 | FA76 | 4E8D | 16E2 | 8D51 | F64E | 5116 | 4E8D | 16D6 |
| 0000274140 | 1E51 | A668 | 680C | 010F | 36FF | 0C92 | 36FF | 0C90 |
| 0000274160 | 36FF | 0C96 | 36FF | 0C94 | 809A | 006E | 8300 | 28C4 |
| 0000274200 | 468B | E9DC | 00DC | 06E9 | 8B00 | F446 | D3E9 | 6A00 |
| 0000274220 | 6A00 | 9A00 | 3908 | 79A8 | C483 | C404 | 085E | 8926 |
| 0000274240 | 3047 | 8926 | 3257 | 246A | 006A | 468B | 8B08 | 0A56 |
| 0000274260 | 3405 | 5200 | 9A50 | 3E8E | 79CC | C483 | FF08 | 0676 |
| 0000274300 | 468B | 8B08 | 0A56 | 0405 | 5200 | 6A50 | FF58 | 0A76 |
| 0000274320 | 76FF | FF08 | F276 | 76FF | 9AF0 | D049 | 7510 | C483 |
| 0000274340 | 8910 | F446 | 068E | 3A7C | 8326 | C23E | 0077 | 0375 |
| 0000274360 | 09E9 | 8300 | DA7E | 74FE | E903 | 000F | 068E | 3A7E |
| 0000274400 | 8326 | 583E | 0077 | 0375 | 51E9 | 8B00 | F446 | 4689 |
| 0000274420 | FFDC | E076 | 76FF | 8DDE | DC46 | 5016 | 76FF | FFEE |
| 0000274440 | FC76 | 76FF | 8DFA | E24E | 5116 | 4E8D | 16F6 | 8D51 |
| 0000274460 | D64E | 5116 | 681E | 0CA6 | 1C68 | FF01 | 9236 | FF0C |
| 0000274500 | 9036 | FF0C | 9636 | FF0C | 9436 | 9A0C | 7822 | 0000 |
| 0000274520 | C483 | 8B28 | DC46 | 09E9 | E900 | 0006 | 468B | E9F4 |
| 0000274540 | 0000 | 5E1F | 835F | 02ED | E58B | 5D1F | CA4D | 000E |
| 0000274560 | 581E | 4590 | 8B55 | 1EEC | D88E | EC81 | 006A | 5657 |
| 0000274600 | B81E | 770C | D88E | 46C7 | B2FA | 8C0C | FC5E | 46C7 |
| 0000274620 | 01CE | 2B01 | 89C0 | C046 | 4689 | 8EBE | 7C06 | 263A |
| 0000274640 | 3E83 | 7B2F | 7500 | E903 | 001D | 36FF | 0C96 | 36FF |
| 0000274660 | 0C94 | 468D | 16B6 | 9A50 | 7742 | 0000 | C483 | 3D08 |
| 0000274700 | 0000 | 0374 | 0FE9 | 8E00 | 7E06 | 263A | 3E83 | 7B47 |
| 0000274720 | 7500 | E903 | 003B | 681E | 0CB9 | 468D | 16C2 | 8D50 |
| 0000274740 | B646 | 5016 | 468D | 16D6 | 6850 | 0145 | 681E | 0CC0 |
| 0000274760 | 36FF | 0C92 | 36FF | 0C90 | 36FF | 0C96 | 36FF | 0C94 |
| 0000275000 | 8B9A | 0077 | 8300 | 1EC4 | 4689 | 89D6 | D856 | 08E9 |
| 0000275020 | 2B00 | 89C0 | D846 | 4689 | 8DD6 | 9646 | 5016 | 76FF |
| 0000275040 | FF08 | 0676 | 3D9A | 5142 | 8378 | 08C4 | 4689 | 83D4 |
| 0000275060 | D47E | 7500 | E903 | 007E | 068E | 3A7C | 8326 | CE3E |
| 0000275100 | 007B | 0375 | 09E9 | 8300 | BA7E | 74FE | E903 | 000F |
| 0000275120 | 068E | 3A7E | 8326 | E63E | 007B | 0375 | 51E9 | 8B00 |
| 0000275140 | D446 | 4689 | FFBC | C076 | 76FF | 8DBE | BC46 | 5016 |
| 0000275160 | 76FF | FFCE | FC76 | 76FF | 8DFA | C24E | 5116 | 4E8D |
| 0000275200 | 16D6 | 8D51 | B64E | 5116 | 681E | 0CC0 | 4F68 | FF01 |
| 0000275220 | 9236 | FF0C | 9036 | FF0C | 9636 | FF0C | 9436 | 9A0C |
| 0000275240 | 7C2F | 0000 | C483 | 8B28 | BC46 | 54E9 | E901 | 0006 |
| 0000275260 | 468B | E9D4 | 014B | 468D | 16D0 | 6A50 | FF02 | 0C76 |
| 0000275300 | 76FF | 9A0A | 7632 | 78F0 | C483 | 890A | D446 | 7E83 |
| 0000275320 | 00D4 | 0375 | 7EE9 | 8E00 | 7C06 | 263A | 3E83 | 7C7A |
| 0000275340 | 7500 | E903 | 0009 | 7E83 | FEBA | 0374 | 0FE9 | 8E00 |
| 0000275360 | 7E06 | 263A | 3E83 | 7C92 | 7500 | E903 | 0051 | 468B |
| 0000275400 | 89D4 | BC46 | 76FF | FFC0 | BE76 | 468D | 16BC | FF50 |
| 0000275420 | CE76 | 76FF | FFFC | FA76 | 4E8D | 16C2 | 8D51 | D64E |
| 0000275440 | 5116 | 4E8D | 16B6 | 1E51 | C068 | 680C | 0157 | 36FF |
| 0000275460 | 0C92 | 36FF | 0C90 | 36FF | 0C96 | 36FF | 0C94 | DB9A |
| 0000275500 | 007C | 8300 | 28C4 | 468B | E9BC | 00B5 | 06E9 | 8B00 |
| 0000275520 | D446 | ACE9 | 6A00 | 8D1F | 9646 | 5016 | 468D | 16DA |
| 0000275540 | 9A50 | 2804 | 7C6B | C483 | C60A | F946 | 8D00 | DA46 |
| 0000275560 | 5016 | 76FF | FFD2 | D076 | E19A | 86D3 | 8379 | 08C4 |
| 0000275600 | 4689 | 8ED4 | 7C06 | 263A | 3E83 | 79DB | 7500 | E903 |
| 0000275620 | 0009 | 7E83 | FEBA | 0374 | 0FE9 | 8E00 | 7E06 | 263A |
| 0000275640 | 3E83 | 79F3 | 7500 | E903 | 0051 | 468B | 89D4 | BC46 |
| 0000275660 | 76FF | FFC0 | BE76 | 468D | 16BC | FF50 | CE76 | 76FF |
| 0000275700 | FFFC | FA76 | 4E8D | 16C2 | 8D51 | D64E | 5116 | 4E8D |

THU MAR 14 17:31:54 1991 DB_PI.DLL PAGE 104, LINE 6078

| | | | | | | | | |
|---|---|---|---|---|---|---|---|---|
| 0000275720 | 16B6 | 1E51 | C068 | 680C | 0160 | 36FF | 0C92 | 36FF |
| 0000275740 | 0C90 | 36FF | 0C96 | 36FF | 0C94 | 3C9A | 0D7A | 8300 |
| 0000275760 | 28C4 | 468B | E9BC | 0009 | 06E9 | 8B00 | D446 | 00E9 |
| 0000276000 | 1F00 | 5F5E | ED83 | 8B02 | 1FE5 | 4D5D | 0CCA | 1E00 |
| 0000276020 | 9058 | 5545 | EC8B | 8E1E | 81D8 | 6CEC | 5700 | 1E56 |
| 0000276040 | 72B8 | 8E7A | C7D8 | FA46 | 0CCF | 5E8C | C7FC | CE46 |
| 0000276060 | 0101 | C02B | 4689 | 89BE | BC46 | 068E | 3A7C | 8326 |
| 0000276100 | BA3E | 007D | 0375 | 1DE9 | FF00 | 9636 | FF0C | 9436 |
| 0000276120 | 8D0C | B446 | 5016 | A89A | 007A | 8300 | 08C4 | 003D |
| 0000276140 | 7400 | E903 | 000F | 068E | 3A7E | 8326 | D23E | 007D |
| 0000276160 | 0375 | 3BE9 | 1E00 | D668 | 8D0C | C246 | 5016 | 468D |
| 0000276200 | 16B4 | 8D50 | D646 | 5016 | 8E68 | 1E01 | DE68 | FF0C |
| 0000276220 | 9236 | FF0C | 9036 | FF0C | 9636 | FF0C | 9436 | 9A0C |
| 0000276240 | 7AF1 | 0000 | C483 | 891E | D646 | 5689 | E9D8 | 0008 |
| 0000276260 | C02B | 4689 | 89D8 | D646 | 468B | 0B08 | 0646 | 0374 |
| 0000276300 | 7DE9 | 8E00 | 7C06 | 263A | 3E83 | 7E56 | 7500 | E903 |
| 0000276320 | 0009 | 7E83 | FEB8 | 0374 | 0FE9 | 8E00 | 7E06 | 263A |
| 0000276340 | 3E83 | 7E6E | 7500 | E903 | 0050 | 46C7 | 13BA | FF00 |
| 0000276360 | BE76 | 76FF | 8DBC | BA46 | 5016 | 76FF | FFCE | FC76 |
| 0000276400 | 76FF | 8DFA | C24E | 5116 | 4E8D | 16D6 | 8D51 | B44E |
| 0000276420 | 5116 | 681E | 0CDE | 9B68 | FF01 | 9236 | FF0C | 9036 |
| 0000276440 | FF0C | 9636 | FF0C | 9436 | 9A0C | 7EB7 | 0000 | C483 |
| 0000276460 | 8B28 | BA46 | 10E9 | E902 | 0006 | 13B8 | E900 | 0207 |
| 0000276500 | 468D | 1694 | FF50 | 0C76 | 76FF | 9A0A | 423D | 7B17 |
| 0000276520 | C483 | 8908 | D446 | 7E83 | 00D4 | 0375 | 7EE9 | 8E00 |
| 0000276540 | 7C06 | 263A | 3E83 | 7F04 | 7500 | E903 | 0009 | 7E83 |
| 0000276560 | FEB8 | 0374 | 0FE9 | 8E00 | 7E06 | 263A | 3E83 | 7F1C |
| 0000276600 | 7500 | E903 | 0051 | 468B | 89D4 | BA46 | 76FF | FFBE |
| 0000276620 | BC76 | 468D | 16BA | FF50 | CE76 | 76FF | FFFC | FA76 |
| 0000276640 | 4E8D | 16C2 | 8D51 | D64E | 5116 | 4E8D | 16B4 | 1E51 |
| 0000276660 | DE68 | 680C | 019D | 36FF | 0C92 | 36FF | 0C90 | 36FF |
| 0000276700 | 0C96 | 36FF | 0C94 | 659A | 007F | 8300 | 28C4 | 468B |
| 0000276720 | E9BA | 0173 | 06E9 | 8B00 | D446 | 6AE9 | 8D01 | D046 |
| 0000276740 | 5016 | 006A | 76FF | FF10 | 0E76 | 329A | B676 | 837B |
| 0000276760 | 0AC4 | 4689 | 83D4 | D47E | 7500 | E9C3 | 008D | 7E81 |
| 0000277000 | 9DD4 | 7401 | E903 | 0005 | 46C7 | ABD4 | 8E01 | 7C06 |
| 0000277020 | 263A | 3E83 | 7FC0 | 7500 | E903 | 0009 | 7E83 | FEB8 |
| 0000277040 | 0374 | 0FE9 | 8E00 | 7E06 | 263A | 3E83 | 7FD8 | 7500 |
| 0000277060 | E903 | 0051 | 468B | 89D4 | BA46 | 76FF | FFBE | BC76 |
| 0000277100 | 468D | 16BA | FF50 | CE76 | 76FF | FFFC | FA76 | 4E8D |
| 0000277120 | 16C2 | 8D51 | D64E | 5116 | 4E8D | 16B4 | 1E51 | DE68 |
| 0000277140 | 680C | 01A8 | 36FF | 0C92 | 36FF | 0C90 | 36FF | 0C96 |
| 0000277160 | 36FF | 0C94 | 219A | 0080 | 8300 | 28C4 | 468B | E9BA |
| 0000277200 | 00C5 | 06E9 | 8B00 | D446 | BCE9 | C700 | C046 | 0058 |
| 0000277220 | 1F6A | 468D | 1694 | 8D50 | DA46 | 5016 | 049A | B128 |
| 0000277240 | 837F | 0AC4 | 46C6 | 00F9 | 76FF | FF08 | 0676 | 468D |
| 0000277260 | 16C0 | 8D50 | DA46 | 5016 | 76FF | FFD2 | D076 | BE9A |
| 0000277300 | 54D6 | 837C | 10C4 | 4689 | 8ED4 | 7C06 | 263A | 3E83 |
| 0000277320 | 7A92 | 7500 | E903 | 0009 | 7E83 | FEB8 | 0374 | 0FE9 |
| 0000277340 | 8E00 | 7E06 | 263A | 3E83 | 7ABE | 7500 | E903 | 0051 |
| 0000277360 | 468B | 89D4 | BA46 | 76FF | FFBE | BC76 | 468D | 16BA |
| 0000277400 | FF50 | CE76 | 76FF | FFFC | FA76 | 4E8D | 16C2 | 8D51 |
| 0000277420 | D64E | 5116 | 4E8D | 16B4 | 1E51 | DE68 | 680C | 01B4 |
| 0000277440 | 36FF | 0C92 | 36FF | 0C90 | 36FF | 0C96 | 36FF | 0C94 |
| 0000277460 | 909A | 007B | 8300 | 28C4 | 468B | E9BA | 0009 | 06E9 |
| 0000277500 | 8B00 | D446 | 00E9 | 1F00 | 5F5E | ED83 | 8B02 | 1FE5 |
| 0000277520 | 4D5D | 10CA | 1E00 | 9058 | 5545 | EC8B | 8E1E | 81D8 |
| 0000277540 | 3AEC | 5700 | 1E56 | 11B8 | 8E7D | C7D8 | F846 | 0CEC |
| 0000277560 | 5E8C | C7FA | E046 | 0101 | C02B | 4689 | 89D0 | CE46 |

THU MAR 14 17:31:54 1991 DB_PI.DLL PAGE 105, LINE 6137

| | | | | | | | | |
|---|---|---|---|---|---|---|---|---|
| 0000277600 | 068E | 3A7C | 8326 | 293E | 0081 | 0375 | 1DE9 | FF00 |
| 0000277620 | 9636 | FF0C | 9436 | 8D0C | C646 | 5016 | 479A | 007D |
| 0000277640 | 8300 | 08C4 | 003D | 7400 | E903 | 000F | 068E | 3A7E |
| 0000277660 | 8326 | 413E | 0081 | 0375 | 3BE9 | 1E00 | F368 | 8D0C |
| 0000277700 | D446 | 5016 | 468D | 16C6 | 8D50 | F446 | 5016 | EB68 |
| 0000277720 | 1E01 | FA68 | FF0C | 9236 | FF0C | 9036 | FF0C | 9636 |
| 0000277740 | FF0C | 9436 | 9A0C | 7D90 | 0000 | C483 | 891E | F446 |
| 0000277760 | 5689 | E9F6 | 0008 | C02B | 4689 | 89F6 | F446 | 46C7 |
| 0000300000 | 00F2 | C700 | FC46 | 0000 | 7E83 | 0012 | 0375 | 21E9 |
| 0000300020 | 8B00 | 1046 | 460B | 750E | E903 | 0016 | 468B | 0B0C |
| 0000300040 | 0A46 | 0375 | 0BE9 | 8B00 | 0846 | 460B | 7406 | E903 |
| 0000300060 | 007D | 068E | 3A7C | 8326 | C43E | 0081 | 0375 | 09E9 |
| 0000300100 | 8300 | CA7E | 74FE | E903 | 000F | 068E | 3A7E | 8326 |
| 0000300120 | DC3E | 0081 | 0375 | 50E9 | C700 | CC46 | 0013 | 76FF |
| 0000300140 | FFD0 | CE76 | 468D | 16CC | FF50 | E076 | 76FF | FFFA |
| 0000300160 | F876 | 4E8D | 16D4 | 8D51 | F44E | 5116 | 4E8D | 16C6 |
| 0000300200 | 1E51 | FA68 | 680C | 01FB | 36FF | 0C92 | 36FF | 0C90 |
| 0000300220 | 36FF | 0C96 | 36FF | 0C94 | 249A | 0082 | 8300 | 28C4 |
| 0000300240 | 468B | E9CC | C315 | 06E9 | B800 | 0013 | 0CE9 | 6A06 |
| 0000300260 | FF20 | 1276 | 769A | 8933 | 8382 | 04C4 | 4689 | 89E4 |
| 0000300300 | E656 | 468B | 0BE6 | E446 | 0374 | 7DE9 | 8E00 | 7C06 |
| 0000300320 | 263A | 3E83 | 8295 | 7500 | E903 | 0009 | 7E83 | FECA |
| 0000300340 | 0374 | 0FE9 | 8E00 | 7E06 | 263A | 3E83 | 82AD | 7500 |
| 0000300360 | E903 | 0050 | 46C7 | 07CC | FF00 | D076 | 76FF | 8DCE |
| 0000300400 | CC46 | 5016 | 76FF | FFE0 | FA76 | 76FF | 8DF8 | D44E |
| 0000300420 | 5116 | 4E8D | 16F4 | 8D51 | C64E | 5116 | 681E | 0CFA |
| 0000300440 | FE68 | FF01 | 9236 | FF0C | 9036 | FF0C | 9636 | FF0C |
| 0000300460 | 9436 | 9A0C | 82F6 | 0000 | C483 | 8B28 | CC46 | 7AE9 |
| 0000300500 | E905 | 0006 | 07B8 | E900 | 0571 | 46C7 | 00E2 | E900 |
| 0000300520 | 0003 | 46FF | 8BE2 | 1246 | 4639 | 72E2 | E903 | 00BF |
| 0000300540 | 468B | C1E2 | 05E0 | 4603 | 8BE4 | E656 | 5052 | 468B |
| 0000300560 | C1E2 | 05E0 | 4603 | 8B0E | 1056 | 5052 | 3D9A | 3E42 |
| 0000300600 | 837E | 08C4 | 4689 | 83F0 | F07E | 7500 | E903 | 008C |
| 0000300620 | 76FF | FFE6 | E476 | 489A | 4824 | 8383 | 04C4 | 068E |
| 0000300640 | 3A7C | 8326 | 543E | 0083 | 0375 | 09E9 | 8300 | CA7E |
| 0000300660 | 74FE | E903 | 000F | 068E | 3A7E | 8326 | 6C3E | 0083 |
| 0000300700 | 0375 | 51E9 | 8B00 | F046 | 4689 | FFCC | D076 | 76FF |
| 0000300720 | 8DCE | CC46 | 5016 | 76FF | FFE0 | FA76 | 76FF | 8DF8 |
| 0000300740 | D44E | 5116 | 4E8D | 16F4 | 8D51 | C64E | 5116 | 681E |
| 0000300760 | 0CFA | 0468 | FF02 | 9236 | FF0C | 9036 | FF0C | 9636 |
| 0000301000 | FF0C | 9436 | 9A0C | 83B5 | 0000 | C483 | 8B28 | CC46 |
| 0000301020 | A8E9 | E904 | 0006 | 468B | E9F0 | 049F | 33E9 | 8DFF |
| 0000301040 | EC46 | 5016 | 006A | 76FF | FF16 | 1476 | 329A | E476 |
| 0000301060 | 8383 | 0AC4 | 4689 | 83F0 | F07E | 7500 | E903 | 009B |
| 0000301100 | 7E81 | 9DF0 | 7401 | E903 | 0005 | 46C7 | ABF0 | FF01 |
| 0000301120 | E676 | 76FF | 9AE4 | 2448 | 7F8F | C483 | 8E04 | 7C06 |
| 0000301140 | 263A | 3E83 | 7D31 | 7500 | E903 | 0009 | 7E83 | FECA |
| 0000301160 | 0374 | 0FE9 | 8E00 | 7E06 | 263A | 3E83 | 7D5D | 7500 |
| 0000301200 | E903 | 0051 | 468B | 89F0 | CC46 | 76FF | FFD0 | CE76 |
| 0000301220 | 468D | 16CC | FF50 | E076 | 76FF | FFFA | F876 | 4E8D |
| 0000301240 | 16D4 | 8D51 | F44E | 5116 | 4E8D | 16C6 | 1E51 | FA68 |
| 0000301260 | 680C | 0211 | 36FF | 0C92 | 36FF | 0C90 | 36FF | 0C96 |
| 0000301300 | 36FF | 0C94 | 1A9A | 007E | 8300 | 28C4 | 468B | E9CC |
| 0000301320 | 03E9 | 06E9 | 8B00 | F046 | E0E9 | 8B03 | 1646 | 460B |
| 0000301340 | 7514 | E903 | 00CD | 468D | 16E8 | 6A50 | 6A00 | 6A00 |
| 0000301360 | 9A00 | 7632 | 7EDD | C483 | 890A | F046 | 7E81 | 9DF0 |
| 0000301400 | 7501 | E903 | 000A | 7E81 | 96F0 | 7401 | E903 | 000B |
| 0000301420 | C02B | 4689 | 89EA | E846 | 95E9 | 8300 | F07E | 7500 |
| 0000301440 | E903 | 008C | 76FF | FFE6 | E476 | 489A | BF24 | 8384 |

THU MAR 14 17:31:54 1991 DB_PI.DLL PAGE 106, LINE 6196

| | | | | | | | | |
|---|---|---|---|---|---|---|---|---|
| 0000301460 | 04C4 | 068E | 3A7C | 8326 | F23E | 0084 | 0375 | 09E9 |
| 0000301500 | 8300 | CA7E | 74FE | E903 | 000F | 068E | 3A7E | 8326 |
| 0000301520 | 0A3E | 0085 | 0375 | 51E9 | 8B00 | F046 | 4689 | FFCC |
| 0000301540 | D076 | 76FF | 8DCE | CC46 | 5016 | 76FF | FFE0 | FA76 |
| 0000301560 | 76FF | 8DF8 | D44E | 5116 | 4E8D | 16F4 | 8D51 | C64E |
| 0000301600 | 5116 | 681E | 0CFA | 1C68 | FF02 | 9236 | FF0C | 9036 |
| 0000301620 | FF0C | 9636 | FF0C | 9436 | 9A0C | 8552 | 0000 | C483 |
| 0000301640 | 8B28 | CC46 | 14E9 | E903 | 0006 | 468B | E9F0 | 030B |
| 0000301660 | 08E9 | 2B00 | 89C0 | EA46 | 4689 | 8BE8 | 1246 | 5EC4 |
| 0000301700 | 260A | 0789 | 5EC4 | 260A | 076B | 5058 | 3E9A | E624 |
| 0000301720 | 8384 | 02C4 | 5EC4 | 2606 | 0789 | 8926 | 0257 | 5EC4 |
| 0000301740 | 26C6 | 478B | 2602 | 070B | 0374 | 8BE9 | FF00 | E676 |
| 0000301760 | 76FF | 9AE4 | 2448 | 85B1 | C483 | 8E04 | 7C06 | 263A |
| 0000302000 | 3E83 | 863B | 7500 | E903 | 0009 | 7E83 | FECA | 0374 |
| 0000302020 | 0FE9 | 8E00 | 7E06 | 263A | 3E83 | 8653 | 7500 | E903 |
| 0000302040 | 0050 | 46C7 | 07CC | FF00 | D076 | 76FF | 8DCE | CC46 |
| 0000302060 | 5016 | 76FF | FFE0 | FA76 | 76FF | 8DF8 | D44E | 5116 |
| 0000302100 | 4E8D | 16F4 | 8D51 | C64E | 5116 | 681E | 0CFA | 2968 |
| 0000302120 | FF02 | 9236 | FF0C | 9036 | FF0C | 9636 | FF0C | 9436 |
| 0000302140 | 9A0C | 869C | 0000 | C483 | 8B28 | CC46 | 4CE9 | E902 |
| 0000302160 | 0006 | 07B8 | E900 | 0243 | 46C7 | 58D2 | C700 | E246 |
| 0000302200 | 0000 | 03E9 | FF00 | E246 | 468B | 3912 | E246 | 0372 |
| 0000302220 | 38E9 | C401 | 065E | 8B26 | 2607 | 578B | 6B02 | F24E |
| 0000302240 | 0358 | 52C1 | 8D50 | D246 | 5016 | 4E8B | C1E2 | 05E1 |
| 0000302260 | 4E03 | 8BE4 | E656 | 5152 | 76FF | FFEE | EC76 | BE9A |
| 0000302300 | FCD6 | 8385 | 10C4 | 4689 | 81F0 | F07E | 01AB | 0374 |
| 0000302320 | 41E9 | 8B00 | EA46 | 460B | 75E8 | E903 | 0036 | 5EC4 |
| 0000302340 | 2606 | 078B | 8B26 | 0257 | 4E6B | 58F2 | C103 | 5052 |
| 0000302360 | 468D | 16D2 | 8B50 | E246 | E0C1 | 0305 | E446 | 568B |
| 0000302400 | 52E6 | FF50 | EA76 | 76FF | 9AE8 | D6BE | 862F | C483 |
| 0000302420 | 8910 | F046 | 7E83 | 00F0 | 0375 | A8E9 | 8100 | F07E |
| 0000302440 | 01AB | 0374 | 0FE9 | 8B00 | F046 | 4689 | C4FC | 0A5E |
| 0000302460 | FF26 | E90F | 008C | 76FF | FFE6 | E476 | 489A | E224 |
| 0000302500 | 8386 | 04C4 | 068E | 3A7C | 8326 | 343E | 0087 | 0375 |
| 0000302520 | 09E9 | 8300 | CA7E | 74FE | E903 | 000F | 068E | 3A7E |
| 0000302540 | 8326 | 4C3E | 0087 | 0375 | 51E9 | 8B00 | F046 | 4689 |
| 0000302560 | FFCC | D076 | 76FF | 8DCE | CC46 | 5016 | 76FF | FFE0 |
| 0000302600 | FA76 | 76FF | 8DF8 | D44E | 5116 | 4E8D | 16F4 | 8D51 |
| 0000302620 | C64E | 5116 | 681E | 0CFA | 3F68 | FF02 | 9236 | FF0C |
| 0000302640 | 9036 | FF0C | 9636 | FF0C | 9436 | 9A0C | 8795 | 0000 |
| 0000302660 | C483 | 8B28 | CC46 | 02E9 | E901 | 00D6 | 468B | E9F0 |
| 0000302700 | 00F9 | 03E9 | FF00 | F246 | BAE9 | C4FE | 0A5E | 468B |
| 0000302720 | 2612 | 0739 | 0372 | 56E9 | C400 | 0A5E | 8326 | 003F |
| 0000302740 | 0374 | 26E9 | C400 | 065E | FF26 | 0277 | FF26 | 9A37 |
| 0000302760 | 2448 | 8710 | C483 | C404 | 065E | C02B | 8926 | 0247 |
| 0000303000 | 8926 | C707 | FC46 | 01BC | 24E9 | C400 | 0A5E | 6B26 |
| 0000303020 | 5807 | C450 | 065E | FF26 | 0277 | FF26 | 9A37 | 32A4 |
| 0000303040 | 8728 | C483 | C406 | 065E | 8926 | 2607 | 5789 | FF02 |
| 0000303060 | E676 | 76FF | 9AE4 | 2448 | 81A7 | C483 | 8E04 | 7C06 |
| 0000303100 | 263A | 3E83 | 8077 | 7500 | E903 | 0009 | 7E83 | FECA |
| 0000303120 | 0374 | 0FE9 | 8E00 | 7E06 | 263A | 3E83 | 80A3 | 7500 |
| 0000303140 | E903 | 0051 | 468B | 89FC | CC46 | 76FF | FFD0 | CE76 |
| 0000303160 | 468D | 16CC | FF50 | E076 | 76FF | FFFA | F876 | 4E8D |
| 0000303200 | 16D4 | 8D51 | F44E | 5116 | 4E8D | 16C6 | 1E51 | FA68 |
| 0000303220 | 680C | 024F | 36FF | 0C92 | 36FF | 0C90 | 36FF | 0C96 |
| 0000303240 | 36FF | 0C94 | 899A | 0081 | 8300 | 28C4 | 468B | E9CC |
| 0000303260 | 0009 | 06E9 | 8B00 | FC46 | 00E9 | 1F00 | 5F5E | ED83 |
| 0000303300 | 8B02 | 1FE5 | 4D5D | 12CA | 1E00 | 9058 | 5545 | EC8B |
| 0000303320 | 8E1E | 81D8 | 2AEC | 5700 | 1E56 | 57B8 | 8E80 | C7D8 |

THU MAR 14 17:31:54 1991 DB_PI.DLL PAGE 107, LINE 6255

| | | | | | | | | |
|---|---|---|---|---|---|---|---|---|
| 0000303340 | FA46 | 0D10 | 5E8C | C7FC | EE46 | 0101 | C02B | 4689 |
| 0000303360 | 89E0 | DE46 | 068E | 3A7C | 8326 | B73E | 0088 | 0375 |
| 0000303400 | 1DE9 | FF00 | 9636 | FF0C | 9436 | 8D0C | D646 | 5016 |
| 0000303420 | 8D9A | 0080 | 8300 | 08C4 | 003D | 7400 | E903 | 000F |
| 0000303440 | 068E | 3A7E | 8326 | CF3E | 0088 | 0375 | 3BE9 | 1E00 |
| 0000303460 | 1768 | 8D0D | E246 | 5016 | 468D | 16D6 | 8D50 | F646 |
| 0000303500 | 5016 | 7F68 | 1E02 | 1E68 | FF0D | 9236 | FF0C | 9036 |
| 0000303520 | FF0C | 9636 | FF0C | 9436 | 9A0C | 80D6 | 0000 | C483 |
| 0000303540 | 891E | F646 | 5689 | E9F8 | 0008 | C02B | 4689 | 89F8 |
| 0000303560 | F646 | 5EC4 | 260A | 07C7 | 0000 | 5EC4 | 2B06 | 26C0 |
| 0000303600 | 4789 | 2602 | 0789 | 468D | 16F0 | 6A50 | FF00 | 1276 |
| 0000303620 | 76FF | 9A10 | 7632 | 831F | C483 | 890A | F446 | 7E83 |
| 0000303640 | 00F4 | 0375 | 97E9 | 8100 | F47E | 019D | 0375 | 0AE9 |
| 0000303660 | 8100 | F47E | 0196 | 0374 | 05E9 | C700 | F446 | 01BC |
| 0000303700 | 068E | 3A7C | 8326 | 553E | 0089 | 0375 | 09E9 | 8300 |
| 0000303720 | DA7E | 74FE | E903 | 000F | 068E | 3A7E | 8326 | 6D3E |
| 0000303740 | 0089 | 0375 | 51E9 | 8B00 | F446 | 4689 | FFDC | E076 |
| 0000303760 | 76FF | 8DDE | DC46 | 5016 | 76FF | FFEE | FC76 | 76FF |
| 0000304000 | 8DFA | E24E | 5116 | 4E8D | 16F6 | 8D51 | D64E | 5116 |
| 0000304020 | 681E | 0D1E | 9168 | FF02 | 9236 | FF0C | 9036 | FF0C |
| 0000304040 | 9636 | FF0C | 9436 | 9A0C | 89B6 | 0000 | C483 | 8B28 |
| 0000304060 | DC46 | A7E9 | E900 | 0006 | 468B | E9F4 | 009E | 76FF |
| 0000304100 | FF08 | 0676 | 76FF | FF0C | 0A76 | 76FF | FF0E | F276 |
| 0000304120 | 76FF | 9AF0 | 3142 | 7693 | C483 | 890E | F446 | 068E |
| 0000304140 | 3A7C | 8326 | 293E | 0084 | 0375 | 09E9 | 8300 | DA7E |
| 0000304160 | 74FE | E903 | 000F | 068E | 3A7E | 8326 | 413E | 0084 |
| 0000304200 | 0375 | 51E9 | 8B00 | F446 | 4689 | FFDC | E076 | 76FF |
| 0000304220 | 8DDE | DC46 | 5016 | 76FF | FFEE | FC76 | 76FF | 8DFA |
| 0000304240 | E24E | 5116 | 4E8D | 16F6 | 8D51 | D64E | 5116 | 681E |
| 0000304260 | 0D1E | 9668 | FF02 | 9236 | FF0C | 9036 | FF0C | 9636 |
| 0000304300 | FF0C | 9436 | 9A0C | 848A | 0000 | C483 | 8B28 | DC46 |
| 0000304320 | 09E9 | E900 | 0006 | 468B | E9F4 | 0000 | 5E1F | 835F |
| 0000304340 | 02ED | E58B | 5D1F | CA4D | 000E | 581E | 4590 | 8B55 |
| 0000304360 | 1EEC | D88E | EC81 | 002A | 5657 | B81E | 87CB | D88E |
| 0000304400 | 46C7 | 3AFA | 8C0D | FC5E | 46C7 | 07F4 | 2B01 | 89C0 |
| 0000304420 | E646 | 4689 | 8EE4 | 8006 | 263A | 3E83 | 87EB | 7500 |
| 0000304440 | E903 | 001D | 36FF | 0D56 | 36FF | 0D54 | 468D | 16DA |
| 0000304460 | 9A50 | 8801 | 0000 | C483 | 3D08 | 0000 | 0374 | 0FE9 |
| 0000304500 | 8E00 | 8206 | 263A | 3E83 | 8AC6 | 7500 | E903 | 003A |
| 0000304520 | 681E | 0D45 | 468D | 16E8 | 8D50 | DA46 | 5016 | 468D |
| 0000304540 | 16F6 | 6A50 | 1E59 | 5868 | FF0D | 5236 | FF0D | 5036 |
| 0000304560 | FF0D | 5636 | FF0D | 5436 | 9A0D | 884A | 0000 | C483 |
| 0000304600 | 891E | F646 | 5689 | E9F8 | 0008 | C02B | 4689 | 89F8 |
| 0000304620 | F646 | CC68 | 6A00 | 9A01 | 3376 | 841D | C483 | 8904 |
| 0000304640 | D646 | 5689 | C4D8 | D65E | C726 | 2447 | 0003 | 5EC4 |
| 0000304660 | 26D6 | 47C7 | 0026 | 8E00 | 8006 | 263A | 3E83 | 8A0C |
| 0000304700 | 7500 | E903 | 0009 | 7E83 | FEDE | 0374 | 0FE9 | 8E00 |
| 0000304720 | 8206 | 263A | 3E83 | 8817 | 7500 | E903 | 0059 | 468B |
| 0000304740 | 8BD6 | D856 | 4689 | 89E0 | E256 | 76FF | FFE6 | E476 |
| 0000304760 | 468D | 16E0 | FF50 | F476 | 76FF | FFFC | FA76 | 4E8D |
| 0000305000 | 16E8 | 8D51 | F64E | 5116 | 4E8D | 16DA | 1E51 | 5868 |
| 0000305020 | 6A0D | FF64 | 5236 | FF0D | 5036 | FF0D | 5636 | FF0D |
| 0000305040 | 5436 | 9A0D | 8918 | 0000 | C483 | 8B28 | E046 | 568B |
| 0000305060 | E9E2 | 000C | 09E9 | 8B00 | D646 | 568B | E9D8 | 0000 |
| 0000305100 | 5E1F | 835F | 02ED | E58B | 5D1F | CB4D | 581E | 4590 |
| 0000305120 | 8B55 | 1EEC | D88E | EC81 | 002C | 5657 | B81E | 89EC |
| 0000305140 | D88E | 46C7 | 65F6 | 8C0D | F85E | 46C7 | 01EE | 2B01 |
| 0000305160 | 89C0 | E046 | 4689 | 8EDE | 8006 | 263A | 3E83 | 8C04 |
| 0000305200 | 7500 | E903 | 001D | 36FF | 0D56 | 36FF | 0D54 | 468D |

THU MAR 14 17:31:54 1991 DB_PI.DLL PAGE 108, LINE 6314

| | | | | | | | | |
|---|---|---|---|---|---|---|---|---|
| 0000305220 | 16D6 | 9A50 | 8A22 | 0000 | C483 | 3D08 | 0000 | 0374 |
| 0000305240 | 0FE9 | 8E0D | 8206 | 263A | 3E83 | 8C1C | 7500 | E903 |
| 0000305260 | 003B | 681E | 0D6C | 468D | 16E2 | 8D50 | D646 | 5016 |
| 0000305300 | 468D | 16F2 | 6850 | 0087 | 681E | 0D74 | 36FF | 0D52 |
| 0000305320 | 36FF | 0D50 | 36FF | 0D56 | 36FF | 0D54 | 6A9A | 008A |
| 0000305340 | 8300 | 1EC4 | 4689 | 89F2 | F456 | 08E9 | 2B00 | 89C0 |
| 0000305360 | F446 | 4689 | 8BF2 | 0A46 | 460B | 7508 | E903 | 000D |
| 0000305400 | 5EC4 | 2608 | 7F83 | 0024 | 0374 | 7DE9 | 8E00 | 8006 |
| 0000305420 | 263A | 3E83 | 8CA2 | 7500 | E903 | 0009 | 7E83 | FEDA |
| 0000305440 | 0374 | 0FE9 | 8E00 | 8206 | 263A | 3E83 | 8CBA | 7500 |
| 0000305460 | E903 | 0050 | 46C7 | 13DC | FF00 | E076 | 76FF | 8DDE |
| 0000305500 | DC46 | 5016 | 76FF | FFEE | F876 | 76FF | 8DF6 | E24E |
| 0000305520 | 5116 | 4E8D | 16F2 | 8D51 | D64E | 5116 | 681E | 0D74 |
| 0000305540 | 9068 | FF00 | 5236 | FF0D | 5036 | FF0D | 5636 | FF0D |
| 0000305560 | 5436 | 9A0D | 8D03 | 0000 | C483 | 8B28 | DC46 | 2CE9 |
| 0000305600 | E903 | 0006 | 13B8 | E900 | 0323 | 468D | 16FA | 6A50 |
| 0000305620 | FF02 | 0E76 | 76FF | 9A0C | CF64 | 8886 | C483 | 890A |
| 0000305640 | F046 | 7E83 | 00F0 | 0375 | 7EE9 | 8E00 | 8006 | 263A |
| 0000305660 | 3E83 | 8D55 | 7500 | E903 | 0009 | 7E83 | FEDA | 0374 |
| 0000305700 | 0FE9 | 8E00 | 8206 | 263A | 3E83 | 8D6D | 7500 | E903 |
| 0000305720 | 0051 | 468B | 89F0 | DC46 | 76FF | FFE0 | DE76 | 468D |
| 0000305740 | 16DC | FF50 | EE76 | 76FF | FFF8 | F676 | 4E8D | 16E2 |
| 0000305760 | 8D51 | F24E | 5116 | 4E8D | 16D6 | 1E51 | 7468 | 680D |
| 0000306000 | 0094 | 36FF | 0D52 | 36FF | 0D50 | 36FF | 0D56 | 36FF |
| 0000306020 | 0D54 | B69A | 008D | 8300 | 28C4 | 468B | E9DC | 028D |
| 0000306040 | 06E9 | 8B00 | F046 | 84E9 | C402 | FA5E | 8326 | A4BF |
| 0000306060 | 0007 | 0374 | 18E9 | C400 | FA5E | FF26 | 2477 | 76FF |
| 0000306100 | FFFC | FA76 | 819A | 4633 | 8389 | 06C4 | 03E9 | B800 |
| 0000306120 | 0000 | 4689 | 83F0 | F07E | 7500 | E903 | 007E | 068E |
| 0000306140 | 3A80 | 8326 | 253E | 008E | 0375 | 09E9 | 8300 | DA7E |
| 0000306160 | 74FE | E903 | 000F | 068E | 3A82 | 8326 | 3D3E | 008E |
| 0000306200 | 0375 | 51E9 | 8B00 | F046 | 4689 | FFDC | E076 | 76FF |
| 0000306220 | 8DDE | DC46 | 5016 | 76FF | FFEE | F876 | 76FF | 8DF6 |
| 0000306240 | E24E | 5116 | 4E8D | 16F2 | 8D51 | D64E | 5116 | 681E |
| 0000306260 | 0D74 | 9868 | FF00 | 5236 | FF0D | 5036 | FF0D | 5636 |
| 0000306300 | FF0D | 5436 | 9A0D | 8E85 | 0000 | C483 | 8B28 | DC46 |
| 0000306320 | DAE9 | E901 | 0006 | 468B | E9F0 | 01D1 | 5EC4 | 2608 |
| 0000306340 | 478B | 2602 | 070B | 0375 | FAE9 | C400 | 085E | 8A26 |
| 0000306360 | 0347 | E42A | 4689 | 83D4 | D47E | 7400 | E903 | 0025 |
| 0000306400 | 5EC4 | 2608 | 078B | 8B26 | 0257 | FF25 | 81FF | FFE2 |
| 0000306420 | 0D00 | 0000 | CA81 | 1700 | 5EC4 | 2608 | 0789 | 8926 |
| 0000306440 | 0257 | 86E9 | 8300 | D47E | 7517 | E903 | 007D | 068E |
| 0000306460 | 3A80 | 8326 | AE3E | 008A | 0375 | 09E9 | 8300 | DA7E |
| 0000306500 | 74FE | E903 | 000F | 068E | 3A82 | 8326 | 383E | 008A |
| 0000306520 | 0375 | 50E9 | C700 | DC46 | 01AC | 76FF | FFE0 | DE76 |
| 0000306540 | 468D | 16DC | FF50 | EE76 | 76FF | FFF8 | F676 | 4E8D |
| 0000306560 | 16E2 | 8D51 | F24E | 5116 | 4E8D | 16D6 | 1E51 | 7468 |
| 0000306600 | 680D | 00A3 | 36FF | 0D52 | 36FF | 0D50 | 36FF | 0D56 |
| 0000306620 | 36FF | 0D54 | 149A | 008B | 8300 | 28C4 | 468B | E9DC |
| 0000306640 | 010B | 06E9 | B800 | 01AC | 02E9 | C401 | FA5E | 8B26 |
| 0000306660 | AA87 | 2607 | 978B | 07AC | 5EC4 | 2608 | 573B | 7602 |
| 0000306700 | E903 | 0014 | 0373 | 08E9 | 2600 | 073B | 0372 | 07E9 |
| 0000306720 | 2600 | 578B | 2602 | 078B | 5EC4 | 26FA | 8789 | 07AA |
| 0000306740 | 8926 | AC97 | 6A07 | 6A24 | 8B00 | 0846 | 568B | 050A |
| 0000306760 | 0028 | 5052 | 8E9A | 8A3E | 838A | 08C4 | 76FF | FF06 |
| 0000307000 | 0A76 | 76FF | C408 | 085E | 8B26 | 2447 | E0C1 | 0505 |
| 0000307020 | 004C | FF50 | 0A76 | 76FF | 8B08 | FA46 | 568B | 05FC |
| 0000307040 | 0724 | 5052 | 499A | E7D0 | 838E | 10C4 | 4689 | 8EF0 |
| 0000307060 | 8006 | 263A | 7E83 | 8B6E | 7500 | E903 | 0009 | 7E83 |

THU MAR 14 17:31:54 1991 DB_PI.DLL PAGE 109, LINE 6373

| | | | | | | | | |
|---|---|---|---|---|---|---|---|---|
| 0000307100 | FEDA | 0374 | 0FE9 | 8E00 | 8206 | 263A | 3E83 | 8B9A |
| 0000307120 | 7500 | E903 | 0051 | 468B | 89F0 | DC46 | 76FF | FFE0 |
| 0000307140 | DE76 | 468D | 16DC | FF50 | EE76 | 76FF | FFF8 | F676 |
| 0000307160 | 4E8D | 16E2 | 8D51 | F24E | 5116 | 4E8D | 16D6 | 1E51 |
| 0000307200 | 7468 | 680D | 00B1 | 36FF | 0D52 | 36FF | 0D50 | 36FF |
| 0000307220 | 0D56 | 36FF | 0D54 | 649A | 008C | 8300 | 28C4 | 468B |
| 0000307240 | E9DC | 0009 | 06E9 | 8B00 | F046 | 00E9 | 1F00 | 5F5E |
| 0000307260 | ED83 | 8B02 | 1FE5 | 4D5D | 0ACA | 1E00 | 9058 | 5545 |
| 0000307300 | EC8B | 8E1E | 81D8 | 2AEC | 5700 | 1E56 | 4EB8 | 8E8B |
| 0000307320 | C7D8 | F646 | 0D7F | 5E8C | C7F8 | EE46 | 0101 | C02B |
| 0000307340 | 4689 | 89E0 | DE46 | 068E | 3A80 | 8326 | 7C3E | 0090 |
| 0000307360 | 0375 | 1DE9 | FF00 | 5636 | FF0D | 5436 | 8D0D | D646 |
| 0000307400 | 5016 | 849A | 008B | 8300 | 08C4 | 003D | 7400 | E903 |
| 0000307420 | 000F | 068E | 3A82 | 8326 | 943E | 0090 | 0375 | 3BE9 |
| 0000307440 | 1E00 | 8668 | 8D0D | E246 | 5016 | 468D | 16D6 | 8D50 |
| 0000307460 | F246 | 5016 | D268 | 1E00 | 8E68 | FF0D | 5236 | FF0D |
| 0000307500 | 5036 | FF0D | 5636 | FF0D | 5436 | 9A0D | 8BCD | 0000 |
| 0000307520 | C483 | 891E | F246 | 5689 | E9F4 | 0008 | C02B | 4689 |
| 0000307540 | 89F4 | F246 | 468D | 16FA | 6A50 | FF02 | 0C76 | 76FF |
| 0000307560 | 9A0A | CF64 | 8C8A | C483 | 890A | F046 | 7E83 | 00F0 |
| 0000307600 | 0375 | 7EE9 | 8E00 | 8006 | 263A | 3E83 | 9107 | 7500 |
| 0000307620 | E903 | 0009 | 7E83 | FEDA | 0374 | 0FE9 | 8E00 | 8206 |
| 0000307640 | 263A | 3E83 | 911F | 7500 | E903 | 0051 | 468B | 89F0 |
| 0000307660 | DC46 | 76FF | FFE0 | DE76 | 468D | 16DC | FF50 | EE76 |
| 0000307700 | 76FF | FFF8 | F676 | 4E8D | 16E2 | 8D51 | F24E | 5116 |
| 0000307720 | 4E8D | 16D6 | 1E51 | 8E68 | 680D | 00DB | 36FF | 0D52 |
| 0000307740 | 36FF | 0D50 | 36FF | 0D56 | 36FF | 0D54 | 679A | 0091 |
| 0000307760 | 8300 | 28C4 | 468B | E9DC | 01DF | 06E9 | 8B00 | F046 |
| 0000310000 | D6E9 | 8A01 | 0946 | E42A | 173D | 7500 | E903 | 007D |
| 0000310020 | 068E | 3A80 | 8326 | B93E | 0091 | 0375 | 09E9 | 8300 |
| 0000310040 | DA7E | 74FE | E903 | 000F | 068E | 3A82 | 8326 | D13E |
| 0000310060 | 0091 | 0375 | 50E9 | C700 | DC46 | 01AC | 76FF | FFE0 |
| 0000310100 | DE76 | 468D | 16DC | FF50 | EE76 | 76FF | FFF8 | F676 |
| 0000310120 | 4E8D | 16E2 | 8D51 | F24E | 5116 | 4E8D | 16D6 | 1E51 |
| 0000310140 | 8E68 | 680D | 00DE | 36FF | 0D52 | 36FF | 0D50 | 36FF |
| 0000310160 | 0D56 | 36FF | 0D54 | 1A9A | 0092 | 8300 | 28C4 | 468B |
| 0000310200 | E9DC | 0155 | 06E9 | B800 | 01AC | 4CE9 | C401 | FA5E |
| 0000310220 | 8326 | A4BF | 0007 | 0374 | 18E9 | C400 | FA5E | FF26 |
| 0000310240 | 2477 | 76FF | FFFC | FA76 | 819A | 3733 | 838D | 06C4 |
| 0000310260 | 03E9 | B800 | 0000 | 4689 | 83F0 | F07E | 7500 | E903 |
| 0000310300 | 007E | 068E | 3A80 | 8326 | 523E | 0092 | 0375 | 09E9 |
| 0000310320 | 8300 | DA7E | 74FE | E903 | 000F | 068E | 3A82 | 8326 |
| 0000310340 | 6A3E | 0092 | 0375 | 51E9 | 8B00 | F046 | 4689 | FFDC |
| 0000310360 | E076 | 76FF | 8DDE | DC46 | 5016 | 76FF | FFEE | F876 |
| 0000310400 | 76FF | 8DF6 | E24E | 5116 | 4E8D | 16F2 | 8D51 | D64E |
| 0000310420 | 5116 | 681E | 0D8E | E268 | FF00 | 5236 | FF0D | 5036 |
| 0000310440 | FF0D | 5636 | FF0D | 5436 | 9A0D | 92B3 | 0000 | C483 |
| 0000310460 | 8B28 | DC46 | A2E9 | E900 | 0006 | 468B | E9F0 | 0099 |
| 0000310500 | 468D | 1606 | 8B50 | FA46 | 568B | 05FC | 0724 | 5052 |
| 0000310520 | E19A | 17D3 | 838F | 08C4 | 4689 | 8EF0 | 8006 | 263A |
| 0000310540 | 3E83 | 8F26 | 7500 | E903 | 0009 | 7E83 | FEDA | 0374 |
| 0000310560 | 0FE9 | 8E00 | 8206 | 263A | 3E83 | 8F3E | 7500 | E903 |
| 0000310600 | 0051 | 468B | 89F0 | DC46 | 76FF | FFE0 | DE76 | 468D |
| 0000310620 | 16DC | FF50 | EE76 | 76FF | FFF8 | F676 | 4E8D | 16E2 |
| 0000310640 | 8D51 | F24E | 5116 | 4E8D | 16D6 | 1E51 | 8E68 | 680D |
| 0000310660 | 00E6 | 36FF | 0D52 | 36FF | 0D50 | 36FF | 0D56 | 36FF |
| 0000310700 | 0D54 | 879A | 008F | 8300 | 28C4 | 468B | E9DC | 0009 |
| 0000310720 | 06E9 | 8B00 | F046 | 00E9 | 1F00 | 5F5E | ED83 | 8B02 |
| 0000310740 | 1FE5 | 4D5D | 08CA | 1E00 | 9058 | 5545 | EC8B | 8E1E |

THU MAR 14 17:31:54 1991 DB_PI.DLL PAGE 110, LINE 6432

| | | | | | | | | |
|---|---|---|---|---|---|---|---|---|
| 0000310760 | 81D8 | 98EC | 5700 | 1E56 | BDB8 | 8E8F | C7D8 | F646 |
| 0000311000 | 0D9C | 5E8C | C7F8 | 8246 | 0101 | C02B | 8689 | FF72 |
| 0000311020 | 8689 | FF70 | 068E | 3A80 | 8326 | B93E | 0093 | 0375 |
| 0000311040 | 1EE9 | FF00 | 5636 | FFDD | 5436 | 8D0D | 6886 | 16FF |
| 0000311060 | 9A50 | 8FF3 | 0000 | C483 | 3D08 | 0000 | 0374 | 0FE9 |
| 0000311100 | 8E00 | 8206 | 263A | 3E83 | 93D2 | 7500 | E903 | 003D |
| 0000311120 | 681E | 0DA3 | 868D | FF76 | 5016 | 868D | FF68 | 5016 |
| 0000311140 | 468D | 16F2 | 6850 | 0108 | 681E | 0DAA | 36FF | 0D52 |
| 0000311160 | 36FF | 0D50 | 36FF | 0D56 | 36FF | 0D54 | 3C9A | 0090 |
| 0000311200 | 8300 | 1EC4 | 4689 | 89F2 | F456 | 08E9 | 2B00 | 89C0 |
| 0000311220 | F446 | 4689 | C4F2 | 065E | C02B | 8926 | 0247 | 8926 |
| 0000311240 | 8D07 | FA46 | 5016 | 006A | 76FF | FF10 | 0E76 | 649A |
| 0000311260 | 64CF | 8390 | 0AC4 | 4689 | 83F0 | F07E | 7500 | E903 |
| 0000311300 | 0086 | 068E | 3A80 | 8326 | 4C3E | 00?4 | 0375 | 0AE9 |
| 0000311320 | 8300 | 6CBE | FEFF | 0374 | 0FE9 | 8E00 | 8206 | 263A |
| 0000311340 | 3E83 | 9465 | 7500 | E903 | 0058 | 468B | 89F0 | 6E86 |
| 0000311360 | FFFF | 72B6 | FFFF | 70B6 | 8DFF | 6E86 | 16FF | FF50 |
| 0000311400 | 8276 | 76FF | FFF8 | F676 | 8E8D | FF76 | 5116 | 4E8D |
| 0000311420 | 16F2 | 8D51 | 688E | 16FF | 1E51 | AA68 | 680D | 0115 |
| 0000311440 | 36FF | 0D52 | 36FF | 0D50 | 36FF | 0D56 | 36FF | 0D54 |
| 0000311460 | B39A | 0094 | 8300 | 28C4 | 868B | FF6E | 4FE9 | E904 |
| 0000311500 | 0006 | 468B | E9F0 | 0446 | 468A | 2A0D | 3DE4 | 0017 |
| 0000311520 | 0375 | 85E9 | 8E00 | 8006 | 263A | 3E83 | 9506 | 7500 |
| 0000311540 | E903 | 000A | BE83 | FF6C | 74FE | E903 | 000F | 068E |
| 0000311560 | 3A82 | 8326 | 1F3E | 0095 | 0375 | 57E9 | C700 | 6E86 |
| 0000311600 | ACFF | FF01 | 72B6 | FFFF | 70B6 | 8DFF | 6E86 | 16FF |
| 0000311620 | FF50 | 8276 | 76FF | FFF8 | F676 | 8E8D | FF76 | 5116 |
| 0000311640 | 4E8D | 16F2 | 8D51 | 688E | 16FF | 1E51 | AA68 | 680D |
| 0000311660 | 0118 | 36FF | 0D52 | 36FF | 0D50 | 36FF | 0D56 | 36FF |
| 0000311700 | 0D54 | 7E9A | 0095 | 8300 | 28C4 | 868B | FF6E | BDE9 |
| 0000311720 | E903 | 0006 | ACB8 | E901 | 03B4 | 5EC4 | 26FA | BF83 |
| 0000311740 | 07A4 | 7400 | E903 | 0018 | 5EC4 | 26FA | 77FF | FF24 |
| 0000311760 | FC76 | 76FF | 9AFA | 3381 | 919B | C483 | E906 | 0003 |
| 0000312000 | 00B8 | 8900 | F046 | 7E83 | 00F0 | 0375 | A6E9 | 8E00 |
| 0000312020 | 8006 | 263A | 3E83 | 95EB | 7500 | E903 | 000A | BE83 |
| 0000312040 | FF6C | 74FE | E903 | 000F | 068E | 3A82 | 8326 | 043E |
| 0000312060 | 0096 | 0375 | 68E9 | 8100 | F07E | 019D | 0374 | 06E9 |
| 0000312100 | B800 | 01AB | 03E9 | 8B00 | F046 | 8689 | FF6E | B6FF |
| 0000312120 | FF72 | B6FF | FF70 | 868D | FF6E | 5016 | 76FF | FF82 |
| 0000312140 | F876 | 76FF | 8DF6 | 768E | 16FF | 8D51 | F24E | 5116 |
| 0000312160 | 8E8D | FF68 | 5116 | 681E | 0DAA | 1D68 | FF01 | 5236 |
| 0000312200 | FF0D | 5036 | FF0D | 5636 | FF0D | 5436 | 9A0D | 9653 |
| 0000312220 | 0000 | C483 | 8B28 | 6E86 | E9FF | 02F2 | 16E9 | 8100 |
| 0000312240 | F07E | 019D | 0374 | 06E9 | B800 | 01AB | 03E9 | 8B00 |
| 0000312260 | F046 | D9E9 | C702 | 7486 | 6CFF | 8D00 | 8446 | 5016 |
| 0000312300 | 868D | FF74 | 5016 | 468D | 160A | 8B50 | FA46 | 568B |
| 0000312320 | 05FC | 0724 | 5052 | BE9A | 43D6 | 8392 | 10C4 | 4689 |
| 0000312340 | 83F0 | F07E | 7500 | E903 | 0090 | 7E81 | FAF0 | 7501 |
| 0000312360 | E903 | 0086 | 068E | 3A80 | 8326 | DD3E | 008F | 0375 |
| 0000312400 | 0AE9 | 8300 | 6CBE | FEFF | 0374 | 0FE9 | 8E00 | 8206 |
| 0000312420 | 263A | 3E83 | 9009 | 7500 | E903 | 0058 | 468B | 89F0 |
| 0000312440 | 6E86 | FFFF | 72B6 | FFFF | 70B6 | 8DFF | 6E86 | 16FF |
| 0000312460 | FF50 | 8276 | 76FF | FFF8 | F676 | 8E8D | FF76 | 5116 |
| 0000312500 | 4E8D | 16F2 | 8D51 | 688E | 16FF | 1E51 | AA68 | 680D |
| 0000312520 | 0127 | 36FF | 0D52 | 36FF | 0D50 | 36FF | 0D56 | 36FF |
| 0000312540 | 0D54 | DD9A | 0090 | 8300 | 28C4 | 868B | FF6E | 1DE9 |
| 0000312560 | E902 | 0006 | 468B | E9F0 | 0214 | 468B | C1A8 | 05E0 |
| 0000312600 | 4C05 | 8900 | 7486 | FFFF | 74B6 | 9AFF | 243E | 9744 |
| 0000312620 | C483 | C402 | 065E | 8926 | 2607 | 5789 | C402 | 065E |

THU MAR 14 17:31:54 19°1 DB_PI.DLL PAGE 111, LINE 6491

| | | | | | | | | |
|---|---|---|---|---|---|---|---|---|
| 0000312640 | 8B26 | 0247 | 0B26 | 7407 | E903 | 0085 | 068E | 3A80 |
| 0000312660 | 8326 | 7A3E | 0097 | 0375 | 0AE9 | 8300 | 6CBE | FEFF |
| 0000312700 | 0374 | 0FE9 | 8E00 | 8206 | 263A | 3E83 | 9793 | 7500 |
| 0000312720 | E903 | 0057 | 86C7 | FF6E | 0007 | B6FF | FF72 | B6FF |
| 0000312740 | FF70 | 868D | FF6E | 5016 | 76FF | FF82 | F876 | 76FF |
| 0000312760 | 8DF6 | 768E | 16FF | 8D51 | F24E | 5116 | 8E8D | FF68 |
| 0000313000 | 5116 | 681E | 0DAA | 2C68 | FF01 | 5236 | FF0D | 5036 |
| 0000313020 | FF0D | 5636 | FF0D | 5436 | 9A0D | 97E2 | 0000 | C483 |
| 0000313040 | 8B28 | 6E86 | E9FF | 0166 | 06E9 | B800 | 0007 | 5DE9 |
| 0000313060 | C401 | 065E | FF26 | 0277 | FF26 | 8D37 | 7486 | 16FF |
| 0000313100 | 8D50 | 0A46 | 5016 | 468B | 8BFA | FC56 | 2405 | 5207 |
| 0000313120 | 9A50 | D6BE | 9762 | C483 | 8910 | F046 | 7E83 | 00F0 |
| 0000313140 | 0375 | A4E9 | C400 | 065E | FF26 | 0277 | FF26 | 9A37 |
| 0000313160 | 2448 | 95C9 | C483 | C404 | 065E | C02B | 8926 | 0247 |
| 0000313200 | 8926 | 8E07 | 8006 | 263A | 3E83 | 9800 | 7500 | E903 |
| 0000313220 | 000A | BE83 | FF6C | 74FE | E903 | 000F | 068E | 3A82 |
| 0000313240 | 8326 | 193E | 0098 | 0375 | 58E9 | 8B00 | F046 | 8689 |
| 0000313260 | FF6E | B6FF | FF72 | B6FF | FF70 | 868D | FF6E | 5016 |
| 0000313300 | 76FF | FF82 | F876 | 76FF | 8DF6 | 768E | 16FF | 8D51 |
| 0000313320 | F24E | 5116 | 8E8D | FF68 | 5116 | 681E | 0DAA | 3468 |
| 0000313340 | FF01 | 5236 | FF0D | 5036 | FF0D | 5636 | FF0D | 5436 |
| 0000313360 | 9A0D | 9867 | 0000 | C483 | 8B28 | 6E86 | E9FF | 008E |
| 0000313400 | 06E9 | 8B00 | F046 | 85E9 | 8E00 | 8006 | 263A | 3E83 |
| 0000313420 | 930B | 7500 | E903 | 000A | BE83 | FF6C | 74FE | E903 |
| 0000313440 | 000F | 068E | 3A82 | 8326 | 383E | 0093 | 0375 | 57E9 |
| 0000313460 | C700 | 6E86 | 00FF | FF00 | 72B6 | FFFF | 70B6 | 8DFF |
| 0000313500 | 6E86 | 16FF | FF50 | 8276 | 76FF | FFF8 | F676 | 8E8D |
| 0000313520 | FF76 | 5116 | 4E8D | 16F2 | 8D51 | 688E | 16FF | 1E51 |
| 0000313540 | AA68 | 680D | 0137 | 36FF | 0D52 | 36FF | 0D50 | 36FF |
| 0000313560 | 0D56 | 36FF | 0D54 | 219A | 0094 | 8300 | 28C4 | 868B |
| 0000313600 | FF6E | 09E9 | E900 | 0006 | 00B8 | E900 | 0000 | 5E1F |
| 0000313620 | 835F | 02ED | E58B | 5D1F | CA4D | 000C | 581E | 4590 |
| 0000313640 | 8B55 | 1EEC | D88E | EC81 | 002A | 5657 | B81E | 92E9 |
| 0000313660 | D88E | 46C7 | B5FA | 8C0D | FC5E | 46C7 | 01F2 | 2B01 |
| 0000313700 | 89C0 | E446 | 4689 | 8EE2 | 8006 | 263A | 3E83 | 995B |
| 0000313720 | 7500 | E903 | 001D | 36FF | 0D56 | 36FF | 0D54 | 468D |
| 0000313740 | 16DA | 9A50 | 9322 | 0000 | C483 | 3D08 | 0000 | 0374 |
| 0000313760 | 0FE9 | 8E00 | 8206 | 263A | 3E83 | 9973 | 7500 | E903 |
| 0000314000 | 003B | 681E | 0DBC | 468D | 16E6 | 8D50 | DA46 | 5016 |
| 0000314020 | 468D | 16F6 | 6850 | 0163 | 681E | 0DC4 | 36FF | 0D52 |
| 0000314040 | 36FF | 0D50 | 36FF | 0D56 | 36FF | 0D54 | 6D9A | 0093 |
| 0000314060 | 8300 | 1EC4 | 4689 | 89F6 | F856 | 08E9 | 2B00 | 89C0 |
| 0000314100 | F846 | 4689 | C7F6 | F446 | 0000 | 468B | 0B0E | 0C46 |
| 0000314120 | 0375 | 0FE9 | C400 | 0C5E | 8B26 | 0247 | 0B26 | 7407 |
| 0000314140 | E903 | 007D | 068E | 3A80 | 8326 | 5D3E | 009A | 0375 |
| 0000314160 | 09E9 | 8300 | DE7E | 74FE | E903 | 000F | 068E | 3A82 |
| 0000314200 | 8326 | 753E | 009A | 0375 | 50E9 | C700 | E046 | 0017 |
| 0000314220 | 76FF | FFE4 | E276 | 468D | 16E0 | FF50 | F276 | 76FF |
| 0000314240 | FFFC | FA76 | 4E8D | 16E6 | 8D51 | F64E | 5116 | 4E8D |
| 0000314260 | 16DA | 1E51 | C468 | 680D | 016A | 36FF | 0D52 | 36FF |
| 0000314300 | 0D50 | 36FF | 0D56 | 36FF | 0D54 | BD9A | 009A | 8300 |
| 0000314320 | 28C4 | 468B | E9E0 | 0280 | 06E9 | B800 | 0017 | 77E9 |
| 0000314340 | C402 | 0C5E | 8B26 | 2607 | 578B | 8902 | D646 | 5689 |
| 0000314360 | 83D8 | 0A7E | 75FF | E903 | 000F | 5EC4 | 8BD6 | 0A46 |
| 0000314400 | 3926 | 2647 | 037C | 0AE9 | C400 | D65E | 8B26 | 2647 |
| 0000314420 | 4689 | C40A | D65E | 8B26 | 2647 | 5EC4 | 26D6 | 4739 |
| 0000314440 | 7424 | E903 | 00CD | 5EC4 | 26D6 | 4783 | 0324 | 5EC4 |
| 0000314460 | 26D6 | 478B | C124 | 05E0 | 4C05 | 5000 | 76FF | FFD8 |
| 0000314500 | D676 | A49A | 1632 | 839B | 06C4 | 4689 | 89D6 | D856 |

THU MAR 14 17:31:54 1991 DB_PI.DLL PAGE 112, LINE 6550

| | | | | | | | | |
|---|---|---|---|---|---|---|---|---|
| 0000314520 | 468B | 0BD8 | D646 | 0374 | 88E9 | C400 | 0C5E | C426 |
| 0000314540 | 261F | 6F83 | 0324 | 068E | 3A80 | 8326 | 4D3E | 009B |
| 0000314560 | 0375 | 09E9 | 8300 | DE7E | 74FE | E903 | 000F | 068E |
| 0000314600 | 3A82 | 8326 | 653E | 009B | 0375 | 50E9 | C700 | E046 |
| 0000314620 | 0007 | 76FF | FFE4 | E276 | 468D | 16E0 | FF50 | F276 |
| 0000314640 | 76FF | FFFC | FA76 | 4E8D | 16E6 | 8D51 | F64E | 5116 |
| 0000314660 | 4E8D | 16DA | 1E51 | C468 | 680D | 0178 | 36FF | 0D52 |
| 0000314700 | 36FF | 0D50 | 36FF | 0D56 | 36FF | 0D54 | AE9A | 009B |
| 0000314720 | 8300 | 28C4 | 468B | E9E0 | 017E | 06E9 | B800 | 0007 |
| 0000314740 | 75E9 | 8B01 | D646 | 568B | C4D8 | 0C5E | 8926 | 2607 |
| 0000314760 | 5789 | C402 | D65E | 8B26 | 2647 | 462B | C10A | 05E0 |
| 0000315000 | 8B50 | 0A46 | E0C1 | 0305 | D646 | 568B | 05D8 | 004C |
| 0000315020 | 5052 | 468B | C10A | 05E0 | 4603 | 8BD6 | D856 | 6C05 |
| 0000315040 | 5200 | 9A50 | 3D0A | 967E | C483 | 8B0A | 0A46 | E0C1 |
| 0000315060 | 0305 | D646 | 568B | 05D8 | 004C | 5052 | 76FF | FF08 |
| 0000315100 | 0676 | 3D9A | 6F42 | 8382 | 08C4 | 4689 | 83F4 | F47E |
| 0000315120 | 7500 | E903 | 007E | 068E | 3A80 | 8326 | D23E | 009B |
| 0000315140 | 0375 | 09E9 | 8300 | DE7E | 74FE | E903 | 000F | 068E |
| 0000315160 | 3A82 | 8326 | EA3E | 009B | 0375 | 51E9 | 8B00 | F446 |
| 0000315200 | 4689 | FFE0 | E476 | 76FF | 8DE2 | E046 | 5016 | 76FF |
| 0000315220 | FFF2 | FC76 | 76FF | 8DFA | E64E | 5116 | 4E8D | 16F6 |
| 0000315240 | 8D51 | DA4E | 5116 | 681E | 0DC4 | 8668 | FF01 | 5236 |
| 0000315260 | FF0D | 5036 | FF0D | 5636 | FF0D | 5436 | 9A0D | 9C32 |
| 0000315300 | 0000 | C483 | 8B28 | E046 | 8DE9 | E900 | 0006 | 468B |
| 0000315320 | E9F4 | 0084 | 5EC4 | 26D6 | 47FF | 8E26 | 8006 | 263A |
| 0000315340 | 3E83 | 96A3 | 7500 | E903 | 0009 | 7E83 | FEDE | 0374 |
| 0000315360 | 0FE9 | 8E00 | 8206 | 263A | 3E83 | 96BC | 7500 | E903 |
| 0000315400 | 0050 | 46C7 | 00E0 | FF00 | E476 | 76FF | 8DE2 | E046 |
| 0000315420 | 5016 | 76FF | FFF2 | FC76 | 76FF | 8DFA | E64E | 5116 |
| 0000315440 | 4E8D | 16F6 | 8D51 | DA4E | 5116 | 681E | 0DC4 | 8C68 |
| 0000315460 | FF01 | 5236 | FF0D | 5036 | FF0D | 5636 | FF0D | 5436 |
| 0000315500 | 9A0D | 970A | 0000 | C483 | 8B28 | E046 | 09E9 | E900 |
| 0000315520 | 0006 | 00B8 | E900 | 0000 | 5E1F | 835F | 02ED | E58B |
| 0000315540 | 5D1F | CA4D | 000A | 581E | 4590 | 8B55 | 1EEC | D88E |
| 0000315560 | EC81 | 0048 | 5657 | B81E | 989E | D88E | 46C7 | D4FA |
| 0000315600 | 8C0D | FC5E | 46C7 | 01F0 | 2B01 | 89C0 | E246 | 4689 |
| 0000315620 | 8EE0 | 8006 | 263A | 3E83 | 9D25 | 7500 | E903 | 001D |
| 0000315640 | 36FF | 0D56 | 36FF | 0D54 | 468D | 16D8 | 9A50 | 98D4 |
| 0000315660 | 0000 | C483 | 3D08 | 0000 | 0374 | 0FE9 | 8E00 | 8206 |
| 0000315700 | 263A | 3E83 | 9D3D | 7500 | E903 | 003B | 681E | 0DDB |
| 0000315720 | 468D | 16E4 | 8D50 | D846 | 5016 | 46GD | 16F6 | 6850 |
| 0000315740 | 01B8 | 681E | 0DE2 | 36FF | 0D52 | 36FF | 0D50 | 36FF |
| 0000315760 | 0D56 | 36FF | 0D54 | 1D9A | 0099 | 8300 | 1EC4 | 4689 |
| 0000316000 | 89F6 | F856 | 08E9 | 2B00 | 89C0 | F846 | 4689 | C7F6 |
| 0000316020 | F446 | 0000 | 468B | 0B0E | 0C46 | 0375 | 0FE9 | C400 |
| 0000316040 | 0C5E | 8B26 | 0247 | 0B26 | 7407 | E903 | 007D | 068E |
| 0000316060 | 3A80 | 8326 | CE3E | 009D | 0375 | 09E9 | 8300 | DC7E |
| 0000316100 | 74FE | E903 | 000F | 068E | 3A82 | 8326 | E63E | 009D |
| 0000316120 | 0375 | 50E9 | C700 | DE46 | 0017 | 76FF | FFE2 | E076 |
| 0000316140 | 468D | 16DE | FF50 | F076 | 76FF | FFFC | FA76 | 4E8D |
| 0000316160 | 16E4 | 8D51 | F64E | 5116 | 4E8D | 16D8 | 1E51 | E268 |
| 0000316200 | 680D | 01C0 | 36FF | 0D52 | 36FF | 0D50 | 36FF | 0D56 |
| 0000316220 | 36FF | 0D54 | 2F9A | 009E | 8300 | 28C4 | 468B | E9DE |
| 0000316240 | 0469 | 06E9 | B800 | 0017 | 60E9 | C604 | B846 | 8300 |
| 0000316260 | 0A7E | 74FF | E903 | 0204 | 468D | 16B8 | FF50 | 0876 |
| 0000316300 | 76FF | 9A06 | 423D | 9B35 | C483 | 8908 | F446 | 7E83 |
| 0000316320 | 00F4 | 0375 | 7EE9 | 8E00 | 8006 | 263A | 3E83 | 9E58 |
| 0000316340 | 7500 | E903 | 0009 | 7E83 | FEDC | 0374 | 0FE9 | 8E00 |
| 0000316360 | 8206 | 263A | 3E83 | 9E70 | 7500 | E903 | 0051 | 468B |

THU MAR 14 17:31:54 1991 DB_PI.DLL PAGE 113, LINE 6609

| | | | | | | | | |
|---|---|---|---|---|---|---|---|---|
| 0000316400 | 89F4 | DE46 | 76FF | FFE2 | E076 | 468D | 16DE | FF50 |
| 0000316420 | F076 | 76FF | FFFC | FA76 | 4E8D | 16E4 | 8D51 | F64E |
| 0000316440 | 5116 | 4E8D | 16D8 | 1E51 | E268 | 680D | 01C7 | 36FF |
| 0000316460 | 0D52 | 36FF | 0D50 | 36FF | 0D56 | 36FF | 0D54 | B89A |
| 0000316500 | 009E | 8300 | 28C4 | 468B | E9DE | 03BF | 06E9 | 8B00 |
| 0000316520 | F446 | B6E9 | 8D03 | B846 | D18C | C80B | 0374 | 7DE9 |
| 0000316540 | 8E00 | 8006 | 263A | 3E83 | 9F33 | 7500 | E903 | 0009 |
| 0000316560 | 7E83 | FEDC | 0374 | 0FE9 | 8E00 | 8206 | 263A | 3E83 |
| 0000316600 | 9F4B | 7500 | E903 | 0050 | 46C7 | 17DE | FF00 | E276 |
| 0000316620 | 76FF | 8DE0 | DE46 | 5016 | 76FF | FFF0 | FC76 | 76FF |
| 0000316640 | 8DFA | E44E | 5116 | 4E8D | 16F6 | 8D51 | D84E | 5116 |
| 0000316660 | 681E | 0DE2 | C968 | FF01 | 5236 | FF0D | 5036 | FF0D |
| 0000316700 | 5636 | FF0D | 5436 | 9A0D | 9F93 | 0000 | C483 | 8B28 |
| 0000316720 | DE46 | 36E9 | E903 | 0006 | 17B8 | E900 | 032D | 46C7 |
| 0000316740 | 00F2 | E900 | 0003 | 46FF | C4F2 | 0C5E | C426 | 8B1F |
| 0000316760 | F246 | 3926 | 2647 | 037F | 38E9 | 8D00 | B846 | 5016 |
| 0000317000 | 5EC4 | 260C | 078B | 8B26 | 0257 | 4E8B | C1F2 | 05E1 |
| 0000317020 | C103 | 4C05 | 5200 | 9A50 | 2786 | 9A35 | C483 | 3D08 |
| 0000317040 | 0000 | 0374 | 09E9 | 8B00 | F246 | 4689 | E90A | 0003 |
| 0000317060 | B3E9 | 83FF | 0A7E | 74FF | E903 | 007D | 068E | 3A80 |
| 0000317100 | 8326 | C53E | 009F | 0375 | 09E9 | 8300 | DC7E | 74FE |
| 0000317120 | E903 | 000F | 068E | 3A82 | 8326 | DD3E | 009F | 0375 |
| 0000317140 | 50E9 | C700 | DE46 | 01AB | 76FF | FFE2 | E076 | 468D |
| 0000317160 | 16DE | FF50 | F076 | 76FF | FFFC | FA76 | 4E8D | 16E4 |
| 0000317200 | 8D51 | F64E | 5116 | 4E8D | 16D8 | 1E51 | E268 | 680D |
| 0000317220 | 01D3 | 36FF | 0D52 | 36FF | 0D50 | 36FF | 0D56 | 36FF |
| 0000317240 | 0D54 | BB9A | 0099 | 8300 | 28C4 | 468B | E9DE | 025B |
| 0000317260 | 06E9 | B800 | 01AB | 52E9 | E902 | 008F | 5EC4 | 260C |
| 0000317300 | 1FC4 | 468B | 260A | 4739 | 7E26 | E903 | 007D | 068E |
| 0000317320 | 3A80 | 8326 | BE3E | 0098 | 0375 | 09E9 | 8300 | DC7E |
| 0000317340 | 74FE | E903 | 000F | 068E | 3A82 | 8326 | EA3E | 0098 |
| 0000317360 | 0375 | 50E9 | C700 | DE46 | 0013 | 76FF | FFE2 | E076 |
| 0000317400 | 468D | 16DE | FF50 | F076 | 76FF | FFFC | FA76 | 4E8D |
| 0000317420 | 16E4 | 8D51 | F64E | 5116 | 4E8D | 16D8 | 1E51 | E268 |
| 0000317440 | 680D | 01D7 | 36FF | 0D52 | 36FF | 0D50 | 36FF | 0D56 |
| 0000317460 | 36FF | 0D54 | 859A | 009D | 8300 | 28C4 | 468B | E9DE |
| 0000317500 | 01C9 | 06E9 | B800 | 0013 | C0E9 | C401 | 0C5E | C426 |
| 0000317520 | 261F | 478B | 2B26 | 0A46 | C148 | 05E0 | 8B50 | 0A46 |
| 0000317540 | E0C1 | C405 | 0C5E | 0326 | 2607 | 578B | 0502 | 006C |
| 0000317560 | 5052 | 468B | C10A | 05E0 | 5EC4 | 260C | 0703 | 8B26 |
| 0000317600 | 0257 | 4C05 | 5200 | 9A50 | 3D0A | 9F0A | C483 | C40A |
| 0000317620 | 0C5E | C426 | 261F | 4FFF | C426 | 0C5E | C426 | 261F |
| 0000317640 | 478B | 2D24 | 0003 | 5EC4 | 260C | 1FC4 | 3B26 | 2647 |
| 0000317660 | 0373 | D9E9 | C400 | 0C5E | C426 | 261F | 478B | 2D26 |
| 0000317700 | 0001 | C91B | D1F7 | C123 | 0105 | C400 | 0C5E | C426 |
| 0000317720 | 261F | 4789 | C424 | 0C5E | C426 | 261F | 478B | C124 |
| 0000317740 | 05E0 | 4C05 | 5000 | 5EC4 | 260C | 77FF | 2602 | 37FF |
| 0000317760 | A49A | 7A32 | 83A0 | 06C4 | 5EC4 | 260C | 0789 | 8926 |
| 0000320000 | 0257 | 5EC4 | 260C | 478B | 2602 | 070B | 0374 | 7DE9 |
| 0000320020 | 8E00 | 8006 | 263A | 3E83 | A185 | 7500 | E903 | 0009 |
| 0000320040 | 7E83 | FEDC | 0374 | 0FE9 | 8E00 | 8206 | 263A | 3E83 |
| 0000320060 | A19D | 7500 | E903 | 0050 | 46C7 | 07DE | FF00 | E276 |
| 0000320100 | 76FF | 8DE0 | DE46 | 5016 | 76FF | FFF0 | FC76 | 76FF |
| 0000320120 | 8DFA | E44E | 5116 | 4E8D | 16F6 | 8D51 | D84E | 5116 |
| 0000320140 | 681E | 0DE2 | EB68 | FF01 | 5236 | FF0D | 5036 | FF0D |
| 0000320160 | 5636 | FF0D | 5436 | 9A0D | A1E5 | 0000 | C483 | 8B28 |
| 0000320200 | DE46 | 86E9 | E900 | 0006 | 07B8 | E900 | 007D | 068E |
| 0000320220 | 3A80 | 8326 | 883E | 009C | 0375 | 09E9 | 8300 | DC7E |
| 0000320240 | 74FE | E903 | 000F | 068E | 3A82 | 8326 | B43E | 009C |

THU MAR 14 17:31:54 1991 DB_PI.DLL PAGE 114, LINE 6668

| | | | | | | | | |
|---|---|---|---|---|---|---|---|---|
| 0000320260 | 0375 | 50E9 | C700 | DE46 | 0000 | 76FF | FFE2 | E076 |
| 0000320300 | 468D | 16DE | FF50 | F076 | 76FF | FFFC | FA76 | 4E8D |
| 0000320320 | 16E4 | 8D51 | F64E | 5116 | 4E8D | 16D8 | 1E51 | E268 |
| 0000320340 | 680D | 01EE | 36FF | 0D52 | 36FF | 0D50 | 36FF | 0D56 |
| 0000320360 | 36FF | 0D54 | 259A | 00A0 | 8300 | 28C4 | 468B | E9DE |
| 0000320400 | 0009 | 06E9 | B800 | 0000 | 00E9 | 1F00 | 5F5E | ED83 |
| 0000320420 | 8B02 | 1FE5 | 4D5D | 0ACA | 1E00 | 9058 | 5545 | EC8B |
| 0000320440 | 8E1E | 81D8 | 24EC | 5700 | 1E56 | 68B8 | 8E9C | C7D8 |
| 0000320460 | FA46 | 0DF2 | 5E8C | C7FC | F446 | 0101 | C02B | 4689 |
| 0000320500 | 89E6 | E446 | 068E | 3A80 | 8326 | DC3E | 00A2 | 0375 |
| 0000320520 | 1DE9 | FF00 | 5636 | FF0D | 5436 | 8D0D | DC46 | 5016 |
| 0000320540 | 9E9A | 009C | 8300 | 08C4 | 003D | 7400 | E903 | 000F |
| 0000320560 | 068E | 3A82 | 8326 | F43E | 00A2 | 0375 | 3BE9 | 1E00 |
| 0000320600 | F968 | 8D0D | E846 | 5016 | 468D | 16DC | 8D50 | F646 |
| 0000320620 | 5016 | 1868 | 1E02 | 0068 | FF0E | 5236 | FF0D | 5036 |
| 0000320640 | FF0D | 5636 | FF0D | 5436 | 9A0D | 9CE7 | 0000 | C483 |
| 0000320660 | 891E | F646 | 5689 | E9F8 | 0008 | C02B | 4689 | 89F8 |
| 0000320700 | F646 | 468B | 0B0E | 0C46 | 0375 | 18E9 | 8300 | 0A7E |
| 0000320720 | 7D00 | E903 | 000F | 5EC4 | 8B0C | 0A46 | 3926 | 2647 |
| 0000320740 | 037E | 7DE9 | 8E00 | 8006 | 263A | 3E83 | A359 | 7500 |
| 0000320760 | E903 | 0009 | 7E83 | FEE0 | 0374 | 0FE9 | 8E00 | 8206 |
| 0000321000 | 263A | 3E83 | A371 | 7500 | E903 | 0050 | 46C7 | 13E2 |
| 0000321020 | FF00 | E676 | 76FF | 8DE4 | E246 | 5016 | 76FF | FFF4 |
| 0000321040 | FC76 | 76FF | 8DFA | E84E | 5116 | 4E8D | 16F6 | 8D51 |
| 0000321060 | DC4E | 5116 | 681E | 0E00 | 1E68 | FF02 | 5236 | FF0D |
| 0000321100 | 5036 | FF0D | 5636 | FF0D | 5436 | 9A0D | A3DD | 0000 |
| 0000321120 | C483 | 8B28 | E246 | CDE9 | E900 | 0006 | 13B8 | E900 |
| 0000321140 | 00C4 | 068E | 3A80 | 8326 | 083E | 00A1 | 0375 | 09E9 |
| 0000321160 | 8300 | E07E | 74FE | E903 | 000F | 068E | 3A82 | 8326 |
| 0000321200 | 203E | 00A1 | 0375 | 74E9 | 6A00 | 6A00 | FF00 | 1276 |
| 0000321220 | 76FF | 8B10 | 0A46 | E0C1 | 0305 | 0C46 | 568B | 050E |
| 0000321240 | 004C | 5052 | 76FF | FF08 | 0676 | FF9A | 117C | 89A4 |
| 0000321260 | E246 | 76FF | FFE6 | E476 | 468D | 16E2 | FF50 | F476 |
| 0000321300 | 76FF | FFFC | FA76 | 4E8D | 16E8 | 8D51 | F64E | 5116 |
| 0000321320 | 4E8D | 16DC | 1E51 | 0068 | 680E | 0223 | 36FF | 0D52 |
| 0000321340 | 36FF | 0D50 | 36FF | 0D56 | 36FF | 0D54 | 689A | 00A1 |
| 0000321360 | 8300 | 28C4 | 468B | E9E2 | 002C | 29E9 | 6A00 | 6A00 |
| 0000321400 | FF00 | 1276 | 75FF | 8B10 | 0A46 | E0C1 | 0305 | 0C46 |
| 0000321420 | 568B | 050E | 004C | 5052 | 76FF | FF08 | 0676 | FF9A |
| 0000321440 | A17C | E993 | 0000 | 5E1F | 835F | 02ED | E58B | 5D1F |
| 0000321460 | CA4D | 000E | 581E | 4590 | 8B55 | 1EEC | D88E | EC81 |
| 0000321500 | 0024 | 5657 | B81E | A21B | D88E | 46C7 | 10FA | 8C0E |
| 0000321520 | FC5E | 46C7 | 01F4 | 2B01 | 89C0 | E646 | 4689 | 8EE4 |
| 0000321540 | 8006 | 263A | 3E83 | A4DF | 7500 | E903 | 001D | 36FF |
| 0000321560 | 0D56 | 36FF | 0D54 | 468D | 16DC | 9A50 | A251 | 0000 |
| 0000321600 | C483 | 3D08 | 0000 | 0374 | 0FE9 | 8E00 | 8206 | 263A |
| 0000321620 | 3E83 | A4F7 | 7500 | E903 | 003B | 681E | 0E17 | 468D |
| 0000321640 | 16E8 | 8D50 | DC46 | 5016 | 468D | 16F6 | 6850 | 024A |
| 0000321660 | 681E | 0E1E | 36FF | 0D52 | 36FF | 0D50 | 36FF | 0D56 |
| 0000321700 | 36FF | 0D54 | 9A9A | 00A2 | 8300 | 1EC4 | 4689 | 89F6 |
| 0000321720 | F856 | 08E9 | 2B00 | 89C0 | F846 | 4689 | 8BF6 | 1046 |
| 0000321740 | 460B | 740E | E903 | 007D | 068E | 3A80 | 8326 | 7D3E |
| 0000321760 | 00A5 | 0375 | 09E9 | 8300 | E07E | 74FE | E903 | 000F |
| 0000322000 | 068E | 3A82 | 8326 | 953E | 00A5 | 0375 | 50E9 | C700 |
| 0000322020 | E246 | 0017 | 76FF | FFE6 | E476 | 468D | 16E2 | FF50 |
| 0000322040 | F476 | 76FF | FFFC | FA76 | 4E8D | 16E8 | 8D51 | F64E |
| 0000322060 | 5116 | 4E8D | 16DC | 1E51 | 1E68 | 680E | 024D | 36FF |
| 0000322100 | 0D52 | 36FF | 0D50 | 36FF | 0D56 | 36FF | 0D54 | DD9A |
| 0000322120 | 00A5 | 8300 | 28C4 | 468B | E9E2 | 0174 | 06E9 | B800 |

THU MAR 14 17:31:54 1991 DB_PI.DLL PAGE 115, LINE 6727

| | | | | | | | | |
|---|---|---|---|---|---|---|---|---|
| 0000322140 | 0017 | 6BE9 | C401 | 0E5E | 8326 | 267F | 7400 | E903 |
| 0000322160 | 0094 | 5EC4 | 260A | 07C7 | 0000 | 5EC4 | 2B06 | 26C0 |
| 0000322200 | 4789 | 2602 | 0789 | 068E | 3A80 | 8326 | FD3E | 00A5 |
| 0000322220 | 0375 | 09E9 | 8300 | E07E | 74FE | E903 | 000F | 068E |
| 0000322240 | 3A82 | 8326 | 153E | 00A6 | 0375 | 50E9 | C700 | E246 |
| 0000322260 | 0000 | 76FF | FFE6 | E476 | 468D | 16E2 | FF50 | F476 |
| 0000322300 | 76FF | FFFC | FA76 | 4E8D | 16E8 | 8D51 | F64E | 5116 |
| 0000322320 | 4E8D | 16DC | 1E51 | 1E68 | 680E | 0252 | 36FF | 0D52 |
| 0000322340 | 36FF | 0D50 | 36FF | 0D56 | 36FF | 0D54 | 849A | 00A6 |
| 0000322360 | 8300 | 28C4 | 468B | E9E2 | 00D6 | 06E9 | B800 | 0000 |
| 0000322400 | CDE9 | E900 | 00CA | 068E | 3A80 | 8326 | 3B3E | 00A2 |
| 0000322420 | 0375 | 09E9 | 8300 | E07E | 74FE | E903 | 000F | 068E |
| 0000322440 | 3A82 | 8326 | 673E | 00A2 | 0375 | 77E9 | FF00 | 1476 |
| 0000322460 | 76FF | C412 | 0E5E | FF26 | 2677 | 468B | 8B0E | 1056 |
| 0000322500 | 4C05 | 5200 | FF50 | 0C76 | 76FF | FF0A | 0876 | 76FF |
| 0000322520 | 9A06 | 8045 | A6BB | 4689 | FFE2 | E676 | 76FF | 8DE4 |
| 0000322540 | E246 | 5016 | 76FF | FFF4 | FC76 | 76FF | 8DFA | E84E |
| 0000322560 | 5116 | 4E8D | 16F6 | 8D51 | DC4E | 5116 | 681E | 0E1E |
| 0000322600 | 5768 | FF02 | 5236 | FF0D | 5036 | FF0D | 5636 | FF0D |
| 0000322620 | 5436 | 9A0D | A33C | 0000 | C483 | 8B28 | E246 | 2FE9 |
| 0000322640 | E900 | 002C | 76FF | FF14 | 1276 | 5EC4 | 260E | 77FF |
| 0000322660 | 8B26 | 0E46 | 568B | 0510 | 004C | 5052 | 76FF | FF0C |
| 0000322700 | 0A76 | 76FF | FF08 | 0676 | 459A | 9D80 | E9A3 | 0000 |
| 0000322720 | 5E1F | 835F | 02ED | E58B | 5D1F | CA4D | 0010 | 581E |
| 0000322740 | 4590 | 8B55 | 1EEC | D88E | EC81 | 002A | 5657 | B81E |
| 0000322760 | A436 | D88E | 46C7 | 32F6 | 8C0E | F85E | 46C7 | 01EE |
| 0000323000 | 2B01 | 89C0 | E046 | 4689 | 8EDE | 8006 | 263A | 3E83 |
| 0000323020 | A7B3 | 7500 | E903 | 001D | 36FF | 0D56 | 36FF | 0D54 |
| 0000323040 | 468D | 16D6 | 9A50 | A46C | 0000 | C483 | 3D08 | 0000 |
| 0000323060 | 0374 | 0FE9 | 8E00 | 8206 | 263A | 3E83 | A7CB | 7500 |
| 0000323100 | E903 | 003B | 681E | 0E39 | 468D | 16E2 | 8D50 | D646 |
| 0000323120 | 5016 | 468D | 16F2 | 6850 | 0277 | 681E | 0E40 | 36FF |
| 0000323140 | 0D52 | 36FF | 0D50 | 36FF | 0D56 | 36FF | 0D54 | B59A |
| 0000323160 | 00A4 | 8300 | 1EC4 | 4689 | 89F2 | F456 | 08E9 | 2B00 |
| 0000323200 | 89C0 | F446 | 4689 | C4F2 | 0A5E | C726 | 0007 | C400 |
| 0000323220 | 065E | C02B | 8926 | 0247 | 8926 | 8D07 | FA46 | 5016 |
| 0000323240 | 006A | 76FF | FF10 | 0E76 | 649A | 44CF | 83A6 | 0AC4 |
| 0000323260 | 4689 | 83F0 | F07E | 7500 | E903 | 007E | 068E | 3A80 |
| 0000323300 | 8326 | 663E | 00A8 | 0375 | 09E9 | 8300 | DA7E | 74FE |
| 0000323320 | E903 | 000F | 068E | 3A82 | 8326 | 7E3E | 00A8 | 0375 |
| 0000323340 | 51E9 | 8B00 | F046 | 4689 | FFDC | E076 | 76FF | 8DDE |
| 0000323360 | DC46 | 5016 | 76FF | FFEE | F876 | 76FF | 8DF6 | E24E |
| 0000323400 | 5116 | 4E8D | 16F2 | 8D51 | D64E | 5116 | 681E | 0E40 |
| 0000323420 | 8468 | FF02 | 5236 | FF0D | 5036 | FF0D | 5636 | FF0D |
| 0000323440 | 5436 | 9A0D | A8C7 | 0000 | C483 | 8B28 | DC46 | 57E9 |
| 0000323460 | E901 | 0006 | 468B | E9F0 | 014E | 5EC4 | 26FA | BF83 |
| 0000323500 | 07A4 | 7400 | E903 | 0018 | 5EC4 | 26FA | 77FF | FF24 |
| 0000323520 | FC76 | 76FF | 9AFA | 3381 | A8F2 | C483 | E906 | 0003 |
| 0000323540 | 00B8 | 8900 | F046 | 7E83 | 00F0 | 0375 | 7EE9 | 8E00 |
| 0000323560 | 8006 | 263A | 3E83 | A901 | 7500 | E903 | 0009 | 7E83 |
| 0000323600 | FEDA | 0374 | 0FE9 | 8E00 | 8206 | 263A | 3E83 | A919 |
| 0000323620 | 7500 | E903 | 0051 | 468B | 89F0 | DC46 | 76FF | FFE0 |
| 0000323640 | DE76 | 468D | 16DC | FF50 | EE76 | 76FF | FFF8 | F676 |
| 0000323660 | 4E8D | 16E2 | 8D51 | F24E | 5116 | 4E8D | 16D6 | 1E51 |
| 0000323700 | 4068 | 680E | 0287 | 36FF | 0D52 | 36FF | 0D50 | 36FF |
| 0000323720 | 0D56 | 36FF | 0D54 | 629A | 00A9 | 8300 | 28C4 | 468B |
| 0000323740 | E9DC | 00A4 | 06E9 | 8B00 | F046 | 9BE9 | FF00 | 0876 |
| 0000323760 | 76FF | FF06 | 0C76 | 76FF | FF0A | FC76 | 76FF | 9AFA |
| 0000324000 | 357B | 94E8 | C483 | 890C | F046 | 068E | 3A80 | 8326 |

THU MAR 14 17:31:54 1991 DB_PI.DLL PAGE 116, LINE 6786

| | | | | | | | | |
|---|---|---|---|---|---|---|---|---|
| 0000324020 | 563E | 00A4 | 0375 | 09E9 | 8300 | DA7E | 74FE | E903 |
| 0000324040 | 000F | 068E | 3A82 | 8326 | 823E | 00A4 | 0375 | 51E9 |
| 0000324060 | 8B00 | F046 | 4689 | FFDC | E076 | 76FF | 8DDE | DC46 |
| 0000324100 | 5016 | 76FF | FFEE | F876 | 76FF | 8DF6 | E24E | 5116 |
| 0000324120 | 4E8D | 16F2 | 8D51 | D64E | 5116 | 681E | 0E40 | 8B68 |
| 0000324140 | FF02 | 5236 | FF0D | 5036 | FF0D | 5636 | FF0D | 5436 |
| 0000324160 | 9A0D | A53F | 0000 | C483 | 8B28 | DC46 | 09E9 | E900 |
| 0000324200 | 0006 | 468B | E9F0 | 0000 | 5E1F | 835F | 02ED | E58B |
| 0000324220 | 5D1F | CA4D | 000C | 581E | 4590 | 8B55 | 1EEC | D88E |
| 0000324240 | EC81 | 002A | 5657 | B81E | A6E0 | D88E | 46C7 | 5AFA |
| 0000324260 | 8C0E | FC5E | 46C7 | 07F0 | 2B01 | 89C0 | E246 | 4689 |
| 0000324300 | 8EE0 | 8406 | 263A | 3E83 | A700 | 7500 | E903 | 001D |
| 0000324320 | 36FF | 0E7A | 36FF | 0E78 | 468D | 16D6 | 9A50 | A716 |
| 0000324340 | 0000 | C483 | 3D08 | 0000 | 0374 | 0FE9 | 8E00 | 8606 |
| 0000324360 | 263A | 3E83 | AA6C | 7500 | E903 | 003A | 681E | 0E67 |
| 0000324400 | 468D | 16E4 | 8D50 | D646 | 5016 | 468D | 16F6 | 6A50 |
| 0000324420 | 1E6E | 7C68 | FF0E | 7636 | FF0E | 7436 | FF0E | 7A36 |
| 0000324440 | FF0E | 7836 | 9A0E | A75F | 0000 | C483 | 891E | F646 |
| 0000324460 | 5689 | E9F8 | 0008 | C02B | 4689 | 89F8 | F646 | C02B |
| 0000324500 | 4689 | 89F4 | F246 | 7E83 | 0008 | 037E | 97E9 | 7D00 |
| 0000324520 | E903 | 0009 | 7E83 | 0006 | 0376 | 89E9 | 8E00 | 8406 |
| 0000324540 | 263A | 3E83 | AB8E | 7500 | E903 | 0009 | 7E83 | FEDA |
| 0000324560 | 0374 | 0FE9 | 8E00 | 8606 | 263A | 3E83 | ABA6 | 7500 |
| 0000324600 | E903 | 0059 | 468B | 8B0E | 1056 | 4689 | 89DC | DE56 |
| 0000324620 | 76FF | FFE2 | E076 | 468D | 16DC | FF50 | F076 | 76FF |
| 0000324640 | FFFC | FA76 | 4E8D | 16E4 | 8D51 | F64E | 5116 | 4E8D |
| 0000324660 | 16D6 | 1E51 | 7C68 | 6A0E | FF73 | 7636 | FF0E | 7436 |
| 0000324700 | FF0E | 7A36 | FF0E | 7836 | 9A0E | ABF4 | 0000 | C483 |
| 0000324720 | 8B28 | DC46 | 568B | E9DE | 0146 | 09E9 | 8B00 | 0E46 |
| 0000324740 | 568B | E910 | 013A | C02B | 4689 | 89F4 | F246 | 08E9 |
| 0000324760 | 8300 | F246 | 83FF | F456 | 8B00 | F246 | 568B | 05F4 |
| 0000325000 | FFFF | D283 | 3B00 | 0856 | 037E | 46E9 | 7D00 | E903 |
| 0000325020 | 0008 | 463B | 7606 | E903 | 0039 | FF6A | 468B | 8BF2 |
| 0000325040 | F456 | 4603 | 830A | 00D2 | 2FB9 | D3AB | 03E2 | 0C56 |
| 0000325060 | 5052 | 468B | 8BF2 | F456 | 4603 | 830E | 00D2 | 60B9 |
| 0000325100 | D3AB | 03E2 | 1056 | 5052 | 309A | 503E | 83AB | 0AC4 |
| 0000325120 | 9EE9 | 6AFF | 6A00 | FFFF | 0876 | 76FF | 9A06 | 436A |
| 0000325140 | AB82 | 8B50 | F246 | 568B | 03F4 | 0A46 | D283 | B900 |
| 0000325160 | AB76 | E2D3 | 5603 | 520C | 8B50 | F246 | 568B | 03F4 |
| 0000325200 | 0E46 | D283 | B900 | 5BE7 | E2D3 | 5603 | 5210 | 9A50 |
| 0000325220 | 3E30 | A0E3 | C483 | 8E0A | 8406 | 263A | 3E83 | A9B8 |
| 0000325240 | 7500 | E903 | 0009 | 7E83 | FEDA | 0374 | 0FE9 | 8E00 |
| 0000325260 | 8606 | 263A | 3E83 | A72C | 7500 | E903 | 0059 | 468B |
| 0000325300 | 8B0E | 1056 | 4689 | 89DC | DE56 | 76FF | FFE2 | E076 |
| 0000325320 | 468D | 16DC | FF50 | F076 | 76FF | FFFC | FA76 | 4E8D |
| 0000325340 | 16E4 | 8D51 | F64E | 5116 | 4E8D | 16D6 | 1E51 | 7C68 |
| 0000325360 | 6A0E | FF7A | 7636 | FF0E | 7436 | FF0E | 7A36 | FF0E |
| 0000325400 | 7836 | 9A0E | A814 | 0000 | C483 | 8B28 | DC46 | 568B |
| 0000325420 | E9DE | 000C | 09E9 | 8B00 | 0E46 | 568B | E910 | 0000 |
| 0000325440 | 5E1F | 835F | 02ED | E58B | 5D1F | CA4D | 000C | 581E |
| 0000325460 | 4590 | 8B55 | 1EEC | D88E | EC81 | 002A | 5657 | B81E |
| 0000325500 | A998 | D88E | 46C7 | 86FA | 8C0E | FC5E | 46C7 | 01EE |
| 0000325520 | 2B01 | 89C0 | E046 | 4689 | 8EDE | 8406 | 263A | 3E83 |
| 0000325540 | ACED | 7500 | E903 | 001D | 36FF | 0E7A | 36FF | 0E78 |
| 0000325560 | 468D | 16D6 | 9A50 | A9CE | 0000 | C483 | 3D08 | 0000 |
| 0000325600 | 0374 | 0FE9 | 8E00 | 8606 | 263A | 3E83 | AD05 | 7500 |
| 0000325620 | E903 | 003B | 681E | 0E8A | 468D | 16E2 | 8D50 | D646 |
| 0000325640 | 5016 | 468D | 16F6 | 6850 | 009E | 681E | 0E8E | 36FF |
| 0000325660 | 0E76 | 36FF | 0E74 | 36FF | 0E7A | 36FF | 0E78 | 169A |

THU MAR 14 17:31:54 1991 DB_PI.DLL PAGE 117, LINE 6845

| | | | | | | | | |
|---|---|---|---|---|---|---|---|---|
| 0000325700 | 00AA | 8300 | 1EC4 | 4689 | 89F6 | F856 | 08E9 | 2B00 |
| 0000325720 | 89C0 | F846 | 4689 | 2BF6 | 89C0 | F246 | 4689 | 83F0 |
| 0000325740 | 087E | 7E00 | E903 | 008B | 037D | 09E9 | 8300 | 067E |
| 0000325760 | 7600 | E903 | 007D | 068E | 3A84 | 8326 | DF3E | 00AD |
| 0000326000 | 0375 | 09E9 | 8300 | DA7E | 74FE | E903 | 000F | 068E |
| 0000326020 | 3A86 | 8326 | F73E | 00AD | 0375 | 50E9 | C700 | DC46 |
| 0000326040 | 0000 | 76FF | FFE0 | DE76 | 468D | 16DC | FF50 | EE76 |
| 0000326060 | 76FF | FFFC | FA76 | 4E8D | 16E2 | 8D51 | F64E | 5116 |
| 0000326100 | 4E8D | 16D6 | 1E51 | 8E68 | 680E | 00A5 | 36FF | 0E76 |
| 0000326120 | 36FF | 0E74 | 36FF | 0E7A | 36FF | 0E78 | 409A | 00AE |
| 0000326140 | 8300 | 28C4 | 468B | E9DC | 01FF | 06E9 | B800 | 0000 |
| 0000326160 | F6E9 | 2B01 | 89C0 | F246 | 4689 | E9F0 | 0008 | 4683 |
| 0000326200 | FFF0 | 5683 | 00F2 | 468B | 8BF0 | F256 | FF05 | 83FF |
| 0000326220 | 00D2 | 563B | 7E08 | E903 | 00CF | 037D | 08E9 | 3B00 |
| 0000326240 | 0646 | 0376 | C2E9 | 6A00 | 8BFF | F046 | 568B | 03F2 |
| 0000326260 | 0A46 | D283 | B900 | ADBC | E2D3 | 5603 | 520C | 8B50 |
| 0000326300 | F046 | 568B | 03F2 | 0E46 | D283 | B900 | AE9D | E2D3 |
| 0000326320 | 5603 | 5210 | 9A50 | 3DD4 | AE8D | C483 | 890A | F446 |
| 0000326340 | 003D | 7500 | E903 | 007E | 068E | 3A84 | 8326 | 603E |
| 0000326360 | 00AE | 0375 | 09E9 | 8300 | DA7E | 74FE | E903 | 000F |
| 0000326400 | 068E | 3A86 | 8326 | 783E | 00AE | 0375 | 51E9 | 8B00 |
| 0000326420 | F446 | 4689 | FFDC | E076 | 76FF | 8DDE | DC46 | 5016 |
| 0000326440 | 76FF | FFEE | FC76 | 76FF | 8DFA | E24E | 5116 | 4E8D |
| 0000326460 | 16F6 | 8D51 | D64E | 5116 | 681E | 0E8E | AA68 | FF00 |
| 0000326500 | 7636 | FF0E | 7436 | FF0E | 7A36 | FF0E | 7836 | 9A0E |
| 0000326520 | AF02 | 0000 | C483 | 8B2B | DC46 | 0CE9 | E901 | 0006 |
| 0000326540 | 468B | E9F4 | 0103 | 15E9 | 8EFF | 8406 | 263A | 3E83 |
| 0000326560 | AA54 | 7500 | E903 | 0009 | 7E83 | FEDA | 0374 | 0FE9 |
| 0000326600 | 8E00 | 8606 | 263A | 3E83 | A9E4 | 7500 | E903 | 0092 |
| 0000326620 | 006A | FF6A | 76FF | FF08 | 0676 | 6A9A | BF43 | 50AE |
| 0000326640 | 468B | 8BF0 | F256 | 4603 | 830A | 00D2 | B3B9 | D3AE |
| 0000326660 | 03E2 | 0C56 | 5052 | 468B | 8BF0 | F256 | 4603 | 830E |
| 0000326700 | 00D2 | 2FB9 | D3AF | 03E2 | 1056 | 5052 | D49A | 1F3D |
| 0000326720 | 83AF | 0AC4 | 4689 | FFDC | E076 | 76FF | 8DDE | DC46 |
| 0000326740 | 5016 | 76FF | FFEE | FC76 | 76FF | 8DFA | E24E | 5116 |
| 0000326760 | 4E8D | 16F6 | 8D51 | D64E | 5116 | 681E | 0E8E | AC68 |
| 0000327000 | FF00 | 7636 | FF0E | 7436 | FF0E | 7A36 | FF0E | 7836 |
| 0000327020 | 9A0E | AABA | 0000 | C483 | 8B28 | DC46 | 4AE9 | E900 |
| 0000327040 | 0047 | 006A | FF6A | 76FF | FF08 | 0676 | 6A9A | 5143 |
| 0000327060 | 50AF | 468B | 8BF0 | F256 | 4603 | 830A | 00D2 | 45B9 |
| 0000327100 | D3AF | 03E2 | 0C56 | 5052 | 468B | 8BF0 | F256 | 4603 |
| 0000327120 | 830E | 00D2 | 19B9 | D3AB | 03E2 | 1056 | 5052 | D49A |
| 0000327140 | 3B3D | 83AB | 0AC4 | 00E9 | 1F00 | 5F5E | ED83 | 8B02 |
| 0000327160 | 1FE5 | 4D5D | 0CCA | 1E00 | 9058 | 5545 | EC8B | 8E1E |
| 0000327200 | 81D8 | 2AEC | 5700 | 1E56 | 30B8 | 8EAC | C7D8 | FA46 |
| 0000327220 | 0E99 | 5E8C | C7FC | F046 | 0107 | C02B | 4689 | 89E2 |
| 0000327240 | E046 | 068E | 3A84 | 8326 | 363E | 00B0 | 0375 | 1DE9 |
| 0000327260 | FF00 | 7A36 | FF0E | 7836 | 8D0E | D646 | 5016 | 669A |
| 0000327300 | 00AC | 8300 | 08C4 | 003D | 7400 | E903 | 000F | 068E |
| 0000327320 | 3A86 | 8326 | 4E3E | 00B0 | 0375 | 3BE9 | 1E00 | A668 |
| 0000327340 | 8D0E | E446 | 5016 | 468D | 16D6 | 8D50 | F646 | 5016 |
| 0000327360 | CE68 | 1E00 | B468 | FF0E | 7636 | FF0E | 7436 | FF0E |
| 0000327400 | 7A36 | FF0E | 7836 | 9A0E | ACAF | 0000 | C483 | 891E |
| 0000327420 | F646 | 5689 | E9F8 | 0008 | C02B | 4689 | 89F8 | F646 |
| 0000327440 | C02B | 4689 | 89F4 | F246 | 7E83 | 0008 | 037E | 98E9 |
| 0000327460 | 7D00 | E903 | 0009 | 7E83 | 0006 | 0376 | 8AE9 | 8E00 |
| 0000327500 | 8406 | 263A | 3E83 | B14B | 7500 | E903 | 0009 | 7E83 |
| 0000327520 | FEDA | 0374 | 0FE9 | 8E00 | 8606 | 263A | 3E83 | B163 |
| 0000327540 | 7500 | E903 | 005A | 468B | 8B0C | 0E56 | 4689 | 89DC |

THU MAR 14 17:31:54 1991 DB_PI.DLL PAGE 118, LINE 6904

| | | | | | | | | |
|---|---|---|---|---|---|---|---|---|
| 0000327560 | DE56 | 76FF | FFE2 | E076 | 468D | 16DC | FF50 | F076 |
| 0000327600 | 76FF | FFFC | FA76 | 4E8D | 16E4 | 8D51 | F64E | 5116 |
| 0000327620 | 4E8D | 16D6 | 1E51 | B468 | 680E | 00D2 | 36FF | 0E76 |
| 0000327640 | 36FF | 0E74 | 36FF | 0E7A | 36FF | 0E78 | B29A | 00B1 |
| 0000327660 | 8300 | 28C4 | 468B | 8BDC | DE56 | 21E9 | E901 | 0009 |
| 0000327700 | 468B | 8B0C | 0E56 | 15E9 | 2B01 | 89C0 | F446 | 4689 |
| 0000327720 | E9F2 | 0008 | 4683 | FFF2 | 5683 | 00F4 | 468B | 8BF2 |
| 0000327740 | F456 | FF05 | 83FF | 00D2 | 563B | 7E08 | E903 | 0033 |
| 0000327760 | 037D | 08E9 | 3B00 | 0646 | 0376 | 26E9 | 6A00 | FFFF |
| 0000330000 | 0A76 | 468B | 8BF2 | F456 | 4603 | 830C | 00D2 | 33B9 |
| 0000330020 | D3B1 | 03E2 | 0E56 | 5052 | 8E9A | 203E | 83B1 | 08C4 |
| 0000330040 | B1E9 | 6AFF | 6A00 | FFFF | 0876 | 76FF | 9A06 | 436A |
| 0000330060 | B13F | FF50 | 0A76 | 468B | 8BF2 | F456 | 4603 | 830C |
| 0000330100 | 00D2 | A6B9 | D3AD | 03E2 | 0E56 | 5052 | 8E9A | C83E |
| 0000330120 | 83AD | 08C4 | 068E | 3A84 | 8326 | 503E | 00AC | 0375 |
| 0000330140 | 09E9 | 8300 | DA7E | 74FE | E903 | 000F | 068E | 3A86 |
| 0000330160 | 8326 | 7C3E | 00AC | 0375 | 5AE9 | 8B00 | 0C46 | 568B |
| 0000330200 | 890E | DC46 | 5689 | FFDE | E276 | 76FF | 8DE0 | DC46 |
| 0000330220 | 5016 | 76FF | FFF0 | FC76 | 76FF | 8DFA | E44E | 5116 |
| 0000330240 | 4E8D | 16F6 | 8D51 | D64E | 5116 | 681E | 0EB4 | D968 |
| 0000330260 | FF00 | 7636 | FF0E | 7436 | FF0E | 7A36 | FF0E | 7836 |
| 0000330300 | 9A0E | AD4D | 0000 | C483 | 8B28 | DC46 | 568B | E9DE |
| 0000330320 | 000C | 09E9 | 8B00 | 0C46 | 568B | E90E | 0000 | 5E1F |
| 0000330340 | 835F | 02ED | E58B | 5D1F | CA4D | 000A | 581E | 4590 |
| 0000330360 | 8B55 | 1EEC | D88E | EC81 | 002E | 5657 | B81E | AF79 |
| 0000330400 | D88E | 46C7 | BEFA | 8C0E | FC5E | 46C7 | 07EC | 2B01 |
| 0000330420 | 89C0 | DE46 | 4689 | 8EDC | 8406 | 263A | 3E83 | B2AB |
| 0000330440 | 7500 | E903 | 001D | 36FF | 0E7A | 36FF | 0E78 | 468D |
| 0000330460 | 16D2 | 9A50 | AFAF | 0000 | C483 | 3D08 | 0000 | 0374 |
| 0000330500 | 0FE9 | 8E00 | 8606 | 263A | 3E83 | B2C3 | 7500 | E903 |
| 0000330520 | 003B | 681E | 0ECB | 468D | 16E0 | 8D50 | D246 | 5016 |
| 0000330540 | 468D | 16F6 | 6850 | 00FC | 681E | 0ED8 | 36FF | 0E76 |
| 0000330560 | 36FF | 0E74 | 36FF | 0E7A | 36FF | 0E78 | F89A | 00AF |
| 0000330600 | 8300 | 1EC4 | 4689 | 89F6 | F856 | 08E9 | 2B00 | 89C0 |
| 0000330620 | F846 | 4689 | 2BF6 | 89C0 | F046 | 4689 | 83EE | 087E |
| 0000330640 | 7E00 | E903 | 0094 | 037D | 09E9 | 8300 | 067E | 7600 |
| 0000330660 | E903 | 0086 | 068E | 3A84 | 8326 | 953E | 00B3 | 0375 |
| 0000330700 | 09E9 | 8300 | D67E | 74FE | E903 | 000F | 068E | 3A86 |
| 0000330720 | 8326 | AD3E | 00B3 | 0375 | 56E9 | 2B00 | 89C0 | DA46 |
| 0000330740 | 4689 | FFD8 | DE76 | 76FF | 8DDC | D846 | 5016 | 76FF |
| 0000330760 | FFEC | FC76 | 76FF | 8DFA | E04E | 5116 | 4E8D | 16F6 |
| 0000331000 | 8D51 | D24E | 5116 | 681E | 0ED8 | 0268 | FF01 | 7636 |
| 0000331020 | FF0E | 7436 | FF0E | 7A36 | FF0E | 7836 | 9A0E | B3FC |
| 0000331040 | 0000 | C483 | 8B28 | D846 | 568B | E9DA | 01DD | 09E9 |
| 0000331060 | B800 | 0000 | 00BA | E900 | 01D1 | C02B | 4689 | 89F0 |
| 0000331100 | EE46 | 08E9 | 8300 | EE46 | 83FF | F056 | 8B00 | EE46 |
| 0000331120 | 568B | 05F0 | FFFF | D283 | 3B00 | 0856 | 037E | CAE9 |
| 0000331140 | 7D00 | E903 | 0008 | 463B | 7606 | E903 | 00BD | FF6A |
| 0000331160 | 76FF | 8B0A | EE46 | 568B | 03F0 | 0C46 | D283 | B900 |
| 0000331200 | B462 | E2D3 | 5603 | 520E | 9A50 | 3CC8 | B44F | C483 |
| 0000331220 | 8908 | F246 | 5689 | 0BF4 | 75D0 | E903 | 008A | 068E |
| 0000331240 | 3A84 | 8326 | 223E | 00B4 | 0375 | 09E9 | 8300 | D67E |
| 0000331260 | 74FE | E903 | 000F | 068E | 3A86 | 8326 | 3A3E | 00B4 |
| 0000331300 | 0375 | 5AE9 | 8B00 | F246 | 568B | 89F4 | D846 | 5689 |
| 0000331320 | FFDA | DE76 | 76FF | 8DDC | D846 | 5016 | 76FF | FFEC |
| 0000331340 | FC76 | 76FF | 8DFA | E04E | 5116 | 4E8D | 16F6 | 8D51 |
| 0000331360 | D24E | 5116 | 681E | 0ED8 | 0768 | FF01 | 7636 | FF0E |
| 0000331400 | 7436 | FF0E | 7A36 | FF0E | 7836 | 9A0E | B4B4 | 0000 |
| 0000331420 | C483 | 8B28 | D846 | 568B | E9DA | 00EF | 09E9 | 8B00 |

THU MAR 14 17:31:54 1991 DB_PI.DLL PAGE 119, LINE 6963

| | | | | | | | | |
|---|---|---|---|---|---|---|---|---|
| 0000331440 | F246 | 568B | E9F4 | 00E3 | 1AE9 | 8EFF | 8406 | 263A |
| 0000331460 | 3E83 | AF99 | 7500 | E903 | 0009 | 7E83 | FED6 | 0374 |
| 0000331500 | 0FE9 | 8E00 | 8606 | 263A | 3E83 | AFC5 | 7500 | E903 |
| 0000331520 | 0085 | 006A | FF6A | 76FF | FF08 | 0676 | 6A9A | 6E43 |
| 0000331540 | 50B4 | 76FF | 8B0A | EE46 | 568B | 03F0 | 0C46 | D283 |
| 0000331560 | B900 | B4E7 | E2D3 | 5603 | 520E | 9A50 | 3CC8 | B4D4 |
| 0000331600 | C483 | 8908 | D846 | 5689 | FFDA | DE76 | 76FF | 8DDC |
| 0000331620 | D846 | 5016 | 76FF | FFEC | FC76 | 76FF | 8DFA | E04E |
| 0000331640 | 5116 | 4E8D | 16F6 | 8D51 | D24E | 5116 | 681E | 0ED8 |
| 0000331660 | 0968 | FF01 | 7636 | FF0E | 7436 | FF0E | 7A36 | FF0E |
| 0000331700 | 7836 | 9A0E | B09D | 0000 | C483 | 8B28 | D846 | 568B |
| 0000331720 | E9DA | 0037 | 34E9 | 6A00 | 6A00 | FFFF | 0876 | 76FF |
| 0000331740 | 9A06 | 436A | B4F3 | FF50 | 0A76 | 468B | 8BEE | F056 |
| 0000331760 | 4603 | 830C | 00D2 | FFB9 | D3B0 | 03E2 | 0E56 | 5052 |
| 0000332000 | C89A | 0B3C | 83B1 | 08C4 | 00E9 | 1F00 | 5F5E | ED83 |
| 0000332020 | 8B02 | 1FE5 | 4D5D | 0ACA | 1E00 | 9058 | 5545 | EC8B |
| 0000332040 | 8E1E | 81D8 | 30EC | 5700 | 1E56 | EEB8 | 8EB1 | C7D8 |
| 0000332060 | FA46 | 0EE2 | 5E8C | C7FC | F046 | 0107 | C02B | 4689 |
| 0000332100 | 89DE | DC46 | 068E | 3A84 | 8326 | F93E | 00B5 | 0375 |
| 0000332120 | 1DE9 | FF00 | 7A36 | FF0E | 7836 | 8D0E | D246 | 5016 |
| 0000332140 | 249A | 00B2 | 8300 | 08C4 | 003D | 7400 | E903 | 000F |
| 0000332160 | 068E | 3A86 | 8326 | 113E | 00B6 | 0375 | 3BE9 | 1E00 |
| 0000332200 | EF68 | 8D0E | E046 | 5016 | 468D | 16D2 | 8D50 | F646 |
| 0000332220 | 5016 | 2A68 | 1E01 | FC68 | FF0E | 7636 | FF0E | 7436 |
| 0000332240 | FF0E | 7A36 | FF0E | 7836 | 9A0E | B26D | 0000 | C483 |
| 0000332260 | 891E | F646 | 5689 | E9F8 | 0008 | C02B | 4689 | 89F8 |
| 0000332300 | F646 | 46C7 | 00D0 | 8B00 | 0C46 | 568B | 890E | EC46 |
| 0000332320 | 5689 | 83EE | 0C7E | 7500 | E903 | 0190 | FFB8 | 2BFF |
| 0000332340 | 0C46 | 4689 | FFD0 | D046 | 468B | 2BD0 | 3BD2 | 0856 |
| 0000332360 | 037D | B3E9 | 7E00 | E903 | 0008 | 463B | 7306 | E903 |
| 0000332400 | 00A6 | 068E | 3A84 | 8326 | C03E | 00B6 | 0375 | 09E9 |
| 0000332420 | 8300 | D67E | 74FE | E903 | 000F | 068E | 3A86 | 8326 |
| 0000332440 | D83E | 00B6 | 0375 | 68E9 | FF00 | 0676 | 76FF | FF0A |
| 0000332460 | EE76 | 76FF | 9AEC | 3CF0 | B690 | C483 | 8908 | D846 |
| 0000332500 | 5689 | FFDA | DE76 | 76FF | 8DDC | D846 | 5016 | 76FF |
| 0000332520 | FFF0 | FC76 | 76FF | 8DFA | E04E | 5116 | 4E8D | 16F6 |
| 0000332540 | 8D51 | D24E | 5116 | 681E | 0EFC | 4168 | FF01 | 7636 |
| 0000332560 | FF0E | 7436 | FF0E | 7A36 | FF0E | 7836 | 9A0E | B727 |
| 0000332600 | 0000 | C483 | 8B28 | D846 | 568B | E9DA | 0379 | 17E9 |
| 0000332620 | FF00 | 0676 | 76FF | FF0A | EE76 | 76FF | 9AEC | 3CF0 |
| 0000332640 | B6A7 | C483 | E908 | 035F | 76FF | FFD0 | 0A76 | 76FF |
| 0000332660 | FFEE | EC76 | F09A | B13C | 83B7 | 08C4 | 4689 | 89EC |
| 0000332700 | EE56 | D00B | 0375 | 8AE9 | 8E00 | 8406 | 263A | 3E83 |
| 0000332720 | B7CA | 7500 | E903 | 0009 | 7E83 | FED6 | 0374 | 0FE9 |
| 0000332740 | 8E00 | 8606 | 263A | 3E83 | B7E2 | 7500 | E903 | 005A |
| 0000332760 | 468B | 8BEC | EE56 | 4689 | 89D8 | DA56 | 76FF | FFDE |
| 0000333000 | DC76 | 468D | 16D8 | FF50 | F076 | 76FF | FFFC | FA76 |
| 0000333020 | 4E8D | 16E0 | 8D51 | F64E | 5116 | 4E8D | 16D2 | 1E51 |
| 0000333040 | FC68 | 680E | 0145 | 36FF | 0E76 | 36FF | 0E74 | 36FF |
| 0000333060 | 0E7A | 36FF | 0E78 | 319A | 00B8 | 8300 | 28C4 | 468B |
| 0000333100 | 8BD8 | DA56 | C0E9 | E902 | 0009 | 468B | 8BEC | EE56 |
| 0000333120 | B4E9 | 8B02 | D046 | D22B | 4603 | 830C | 00D2 | A5B9 |
| 0000333140 | D3B7 | 03E2 | 0E56 | 4689 | 89EC | EE56 | 468B | 2BD0 |
| 0000333160 | 29D2 | 0646 | 5619 | 8B08 | D046 | 4689 | C7F2 | F446 |
| 0000333200 | 0000 | 468B | 8BF2 | F456 | 0005 | 8300 | 01D2 | 563B |
| 0000333220 | 7E08 | E903 | 01A3 | 037D | 08E9 | 3B00 | 0646 | 0376 |
| 0000333240 | 96E9 | 6A01 | FFFF | 0A76 | 468B | 8BF2 | F456 | 4603 |
| 0000333260 | 830C | 00D2 | 70B9 | D3B3 | 03E2 | 0E56 | 5052 | F09A |
| 0000333300 | 483C | 83A8 | 08C4 | 4689 | 89EC | EE56 | D00B | 0375 |

THU MAR 14 17:31:54 1991 DB_PI.DLL PAGE 120, LINE 7022

| | | | | | | | | |
|---|---|---|---|---|---|---|---|---|
| 0000333320 | 8AE9 | 8E00 | 8406 | 263A | 3E83 | B20E | 7500 | E903 |
| 0000333340 | 0009 | 7E83 | FED6 | 0374 | 0FE9 | 8E00 | 8606 | 263A |
| 0000333360 | 3E83 | B23A | 7500 | E903 | 005A | 468B | 8BEC | EE56 |
| 0000333400 | 4689 | 89D8 | DA56 | 76FF | FFDE | DC76 | 468D | 16D6 |
| 0000333420 | FF50 | F076 | 76FF | FFFC | FA76 | 4E8D | 16E0 | 8D51 |
| 0000333440 | F64E | 5116 | 4E8D | 16D2 | 1E51 | FC68 | 680E | 0158 |
| 0000333460 | 36FF | 0E76 | 36FF | 0E74 | 36FF | 0E7A | 36FF | 0E78 |
| 0000333500 | 0E9A | 00B3 | 8300 | 28C4 | 468B | 8BD8 | DA56 | B6E9 |
| 0000333520 | E901 | 0009 | 468B | 8BEC | EE56 | AAE9 | 8301 | F246 |
| 0000333540 | 83FF | F456 | 8B00 | F246 | 568B | 03F4 | 0C46 | D283 |
| 0000333560 | B900 | B8AC | E2D3 | 5603 | 8E0E | 8BC2 | 8AD8 | 0A46 |
| 0000333600 | 3826 | 7507 | E903 | 00A6 | 068E | 3A84 | 8326 | 303E |
| 0000333620 | 00B9 | 0375 | 09E9 | 8300 | D67E | 74FE | E903 | 000F |
| 0000333640 | 068E | 3A86 | 8326 | 483E | 00B9 | 0375 | 68E9 | 8B00 |
| 0000333660 | F246 | 568B | 03F4 | 0C46 | D283 | B900 | B914 | E2D3 |
| 0000333700 | 5603 | 890E | D846 | 5689 | FFDA | DE76 | 76FF | 8DDC |
| 0000333720 | D846 | 5016 | 75FF | FFFD | FC76 | 76FF | 8DFA | ED4E |
| 0000333740 | 5116 | 4E8D | 16F6 | 8D51 | D24E | 5116 | 681E | 0EFC |
| 0000333760 | 5C68 | FF01 | 7636 | FF0E | 7436 | FF0E | 7A36 | FFDE |
| 0000334000 | 7836 | 9A0E | B9B9 | 0000 | C483 | 8B28 | D846 | 568B |
| 0000334020 | E9DA | 00F3 | 17E9 | 8B00 | F246 | 568B | 03F4 | 0C46 |
| 0000334040 | D283 | B900 | B967 | E2D3 | 5603 | E90E | 00D9 | 4683 |
| 0000334060 | 01F2 | 5683 | 00F4 | 49E9 | 8EFE | 8406 | 263A | 3E83 |
| 0000334100 | B53B | 7500 | E903 | 0009 | 7E83 | FED6 | 0374 | 0FE9 |
| 0000334120 | 8E00 | 8606 | 263A | 3E83 | B567 | 7500 | E903 | 007C |
| 0000334140 | 468B | 2B06 | F246 | FF50 | 0A76 | 468B | 8BF2 | F456 |
| 0000334160 | 4603 | 830C | 00D2 | E3B9 | D3B9 | 03E2 | 0E56 | 5052 |
| 0000334200 | F09A | EF3C | 83B9 | 08C4 | 4689 | 89D8 | DA56 | 76FF |
| 0000334220 | FFDE | DC76 | 468D | 16D8 | FF50 | F076 | 76FF | FFFC |
| 0000334240 | FA76 | 4E8D | 16E0 | 8D51 | F64E | 5116 | 4E8D | 16D2 |
| 0000334260 | 1E51 | FC68 | 680E | 0162 | 36FF | 0E76 | 36FF | 0E74 |
| 0000334300 | 36FF | 0E7A | 36FF | 0E78 | 6E9A | 00B6 | 8300 | 28C4 |
| 0000334320 | 468B | 8BD8 | DA56 | 2EE9 | E900 | 002B | 468B | 2B06 |
| 0000334340 | F246 | FF50 | 0A76 | 468B | 8BF2 | F456 | 4603 | 830C |
| 0000334360 | 00D2 | 4FB9 | D3B7 | 03E2 | 0E56 | 5052 | F09A | 283C |
| 0000334400 | 83B6 | 08C4 | 00E9 | 1F00 | 5F5E | ED83 | 8B02 | 1FE5 |
| 0000334420 | 4D5D | 0ACA | 1E00 | 9058 | 5545 | EC8B | 8E1E | 81D8 |
| 0000334440 | 30EC | 5700 | 1E56 | 1BB8 | 8EB5 | C7D8 | FA46 | 0FDB |
| 0000334460 | 5E8C | C7FC | EE46 | 0108 | C02B | 4689 | 89E0 | DE46 |
| 0000334500 | 068E | 3A84 | 8326 | B53E | 00BA | 0375 | 1DE9 | FF00 |
| 0000334520 | 7A36 | FF0E | 7836 | 8D0E | D446 | 5016 | 519A | 00B5 |
| 0000334540 | 8300 | 08C4 | 003D | 7400 | E903 | 000F | 068E | 3A86 |
| 0000334560 | 8326 | 753E | 00BB | 0375 | 3BE9 | 1E00 | 1568 | 8D0F |
| 0000334600 | E246 | 5016 | 468D | 16D4 | 8D50 | F246 | 5016 | 8868 |
| 0000334620 | 1E01 | EE68 | FF0F | 7636 | FF0E | 7436 | FFDE | 7A36 |
| 0000334640 | FF0E | 7836 | 9A0E | B59A | 0000 | C483 | 891E | F246 |
| 0000334660 | 5689 | E9F4 | 0008 | C02B | 4689 | 89F4 | F246 | 068E |
| 0000334700 | 3A84 | 8326 | 5D3E | 00BB | 0375 | 6BE9 | 8300 | D87E |
| 0000334720 | 75FE | E903 | 0062 | 468D | 16E2 | 8D50 | F246 | 5016 |
| 0000334740 | 468D | 16D4 | 1E50 | EE68 | 680F | 0198 | 36FF | 0E76 |
| 0000334760 | 36FF | 0E74 | 36FF | 0E7A | 36FF | 0E78 | 681E | 0F1F |
| 0000335000 | FF68 | 68FF | FFFF | FF9A | 00FF | 8300 | 22C4 | 003D |
| 0000335020 | 7500 | E903 | 0022 | 76FF | FF0C | 0A76 | 76FF | FF10 |
| 0000335040 | 0E76 | 389A | F443 | 01BB | FC06 | 110F | FE16 | 1E0F |
| 0000335060 | 7C68 | 9A3C | FFFF | 0000 | 7E83 | 000C | 037D | 25E9 |
| 0000335100 | 7E00 | E903 | 0009 | 7E83 | 000A | 0377 | 17E9 | 8300 |
| 0000335120 | 107E | 7E00 | E903 | 0098 | 037D | 09E9 | 8300 | 0E7E |
| 0000335140 | 7600 | E903 | 008A | 068E | 3A84 | 8326 | 583E | 00BC |
| 0000335160 | 0375 | 09E9 | 8300 | D87E | 74FE | E903 | 000F | 068E |

THU MAR 14 17:31:54 1991 DB_PI.DLL PAGE 121, LINE 7081

| | | | | | | | | |
|---|---|---|---|---|---|---|---|---|
| 0000335200 | 3A86 | 8326 | 703E | 00BC | 0375 | 5AE9 | 8B00 | 0A46 |
| 0000335220 | 568B | 890C | DA46 | 5689 | FFDC | E076 | 76FF | 8DDE |
| 0000335240 | DA46 | 5016 | 76FF | FFEE | FC76 | 76FF | 8DFA | E24E |
| 0000335260 | 5116 | 4E8D | 16F2 | 8D51 | D44E | 5116 | 681E | 0FEE |
| 0000335300 | 9B68 | FF01 | 7636 | FF0E | 7436 | FF0E | 7A36 | FF0E |
| 0000335320 | 7836 | 9A0E | BCCF | 0000 | C483 | 8B28 | DA46 | 568B |
| 0000335340 | E9DC | 04FE | 09E9 | 8B00 | 0A46 | 568B | E90C | 04F2 |
| 0000335360 | 006A | 0068 | FF80 | 1076 | 76FF | FF0E | 0C76 | 76FF |
| 0000335400 | 9A0A | 4338 | BBFB | 5052 | 9E9A | 1442 | 89BC | F846 |
| 0000335420 | 006A | 0068 | FF80 | 1076 | 76FF | FF0E | 0C76 | 76FF |
| 0000335440 | 9A0A | 4338 | BC1B | 5052 | 6A9A | 3E43 | 89BC | F646 |
| 0000335460 | 7E83 | 00F8 | 0377 | D2E9 | FF00 | 0876 | 76FF | FF06 |
| 0000335500 | F876 | 0068 | FF80 | 1476 | 76FF | 9A12 | 08B6 | BC8C |
| 0000335520 | C483 | 890C | F046 | 468B | 39F0 | F846 | 0375 | AAE9 |
| 0000335540 | 8E00 | 8406 | 263A | 3E83 | BD63 | 7500 | E903 | 0009 |
| 0000335560 | 7E83 | FED8 | 0374 | 0FE9 | 8E00 | 8606 | 263A | 3E83 |
| 0000335600 | BD7B | 7500 | E903 | 006A | 76FF | FF10 | 0E76 | 668A |
| 0000335620 | C0F0 | 07E4 | C02A | 006A | 9A50 | 429E | BCF6 | 4689 |
| 0000335640 | 89DA | DC56 | 76FF | FFE0 | DE76 | 468D | 16DA | FF50 |
| 0000335660 | EE76 | 76FF | FFFC | FA76 | 4E8D | 16E2 | 8D51 | F24E |
| 0000335700 | 5116 | 4E8D | 16D4 | 1E51 | EE68 | 680F | 01A4 | 36FF |
| 0000335720 | 0E76 | 36FF | 0E74 | 36FF | 0E7A | 36FF | 0E78 | F49A |
| 0000335740 | 00B8 | 8300 | 28C4 | 468B | 8BDA | DC56 | F3E9 | E903 |
| 0000335760 | 0019 | 76FF | FF10 | 0E76 | 668A | C0F0 | 07E4 | C02A |
| 0000336000 | 006A | 9A50 | 429E | BD4B | D7E9 | 8303 | F67E | 7700 |
| 0000336020 | E903 | 00FC | 76FF | FF08 | 0676 | 016A | 76FF | 8BF6 |
| 0000336040 | F846 | D22B | F28A | D48A | E08A | C02A | E0D1 | D2D1 |
| 0000336060 | E0D1 | D2D1 | E0D1 | D2D1 | E0D1 | D2D1 | E0D1 | D2D1 |
| 0000336100 | E0D1 | D2D1 | E0D1 | D2D1 | 4603 | 8312 | 00D2 | 62B9 |
| 0000336120 | D3B8 | 03E2 | 1456 | 5052 | B69A | 9408 | 83BD | 0CC4 |
| 0000336140 | 4689 | 83F6 | F07E | 7501 | E903 | 00A4 | 068E | 3A84 |
| 0000336160 | 8326 | 7F3E | 00B8 | 0375 | 09E9 | 8300 | D87E | 74FE |
| 0000336200 | E903 | 000F | 068E | 3A86 | 8326 | 973E | 00B8 | 0375 |
| 0000336220 | 67E9 | FF00 | 1076 | 76FF | 690E | F046 | 8001 | 006A |
| 0000336240 | 9A50 | 429E | B37C | 4689 | 89DA | DC56 | 76FF | FFE0 |
| 0000336260 | DE76 | 468D | 16DA | FF50 | EE76 | 76FF | FFFC | FA76 |
| 0000336300 | 4E8D | 16E2 | 8D51 | F24E | 5116 | 4E8D | 16D4 | 1E51 |
| 0000336320 | EE68 | 680F | 01AC | 36FF | 0E76 | 36FF | 0E74 | 36FF |
| 0000336340 | 0E7A | 36FF | 0E78 | C49A | 00BB | 8300 | 28C4 | 468B |
| 0000336360 | 8BDA | DC56 | EBE9 | E902 | 0016 | 76FF | FF10 | 0E76 |
| 0000336400 | 4669 | 01F0 | 6A80 | 5000 | 9E9A | 1542 | E9BB | 02D2 |
| 0000336420 | 068E | 3A84 | 8326 | DC3E | 00BE | 0375 | 39E9 | 8302 |
| 0000336440 | D87E | 75FE | E903 | 0230 | 468D | 16E2 | 8D50 | F24E |
| 0000336460 | 5116 | 568D | 16D4 | 1E52 | EE68 | 680F | 01BD | 36FF |
| 0000336500 | 0E76 | 36FF | 0E74 | 36FF | 0E7A | 36FF | 0E78 | 681E |
| 0000336520 | 0F30 | 6168 | 68BF | BF64 | F79A | 00BA | 8300 | 22C4 |
| 0000336540 | 003D | 7500 | E903 | 01F0 | 681E | 3C70 | 249A | 00BB |
| 0000336560 | A000 | 3C70 | E42A | 0E8A | 3C7C | ED2A | C12B | C06B |
| 0000336600 | 8A3C | 7D0E | 2A3C | 2BED | 8AC1 | 710E | 2A3C | 03ED |
| 0000336620 | 6BC1 | 3CC0 | 0E8A | 3C7E | ED2A | C12B | 0E8A | 3C72 |
| 0000336640 | ED2A | C103 | 4689 | 8DD2 | D25E | 6B9A | B55A | A0BE |
| 0000336660 | 3C73 | E42A | 0E8A | 3C7F | ED2A | C12B | 4689 | 8DD0 |
| 0000336700 | D05E | 6B9A | BE5A | 8DBE | 881E | 9A3A | 5DE4 | BEC3 |
| 0000336720 | B69A | CD5F | 8DBE | F81E | 530F | 5C9A | D35E | 5BBE |
| 0000336740 | 6C9A | F45B | 8EBE | 8406 | 263A | 3E83 | BF75 | 7500 |
| 0000336760 | E903 | 008A | 7E83 | FED8 | 0375 | 81E9 | 8D00 | FC1E |
| 0000337000 | 9A0F | 5A75 | BEFD | 1E8D | 3A8C | 069A | 065F | 8DBF |
| 0000337020 | F81E | 9A0F | 5E0C | BF10 | EC83 | 8B08 | 9ADC | 5BC7 |
| 0000337040 | BF21 | 36FF | 0FFE | 36FF | 0FFC | 1E8D | 0FF8 | BC9A |

THU MAR 14 17:31:54 1991 DB_PI.DLL PAGE 122, LINE 7140

| | | | | | | | | |
|---|---|---|---|---|---|---|---|---|
| 0000337060 | 2659 | 9ABF | 6096 | BF30 | EC83 | 8B08 | 9ADC | 5BC7 |
| 0000337100 | BF95 | 681E | 0F41 | 468D | 16E2 | 8D50 | F246 | 5016 |
| 0000337120 | 468D | 16D4 | 1E50 | EE68 | 680F | 01BD | 36FF | 0E76 |
| 0000337140 | 36FF | 0E74 | 36FF | 0E7A | 36FF | 0E78 | 681E | 0F96 |
| 0000337160 | 3B68 | 68C0 | C03E | 419A | 00C0 | 8300 | 3AC4 | 068E |
| 0000337200 | 3A84 | 8326 | 4F3E | 00C0 | 0375 | CBE9 | 8300 | D87E |
| 0000337220 | 75FE | E903 | 00C2 | 76FF | FF10 | 0E76 | 76FF | FF0C |
| 0000337240 | 0A76 | 389A | D543 | 52BF | A050 | 3C70 | E42A | 0E8A |
| 0000337260 | 3C7C | ED2A | C12B | C06B | 8A3C | 7D0E | 2A3C | 2BED |
| 0000337300 | 8AC1 | 710E | 2A3C | 03ED | 6BC1 | 3CC0 | 0E8A | 3C7E |
| 0000337320 | ED2A | C12B | 0E8A | 3C72 | ED2A | C103 | 4689 | 8DD0 |
| 0000337340 | D05E | 6B9A | ED5A | A0BF | 3C73 | E42A | 0E8A | 3C7F |
| 0000337360 | ED2A | C12B | 4689 | 8DD2 | D25E | 6B9A | F65A | 8DBF |
| 0000337400 | 881E | 9A3A | 5DE4 | BFFB | B69A | 005F | 9AC0 | 6096 |
| 0000337420 | C00A | EC83 | 8B08 | 9ADC | 5BC7 | BDFB | 681E | 0FA7 |
| 0000337440 | 468D | 16E2 | 8D50 | F246 | 5016 | 468D | 16D4 | 1E50 |
| 0000337460 | EE68 | 680F | 01BD | 36FF | 0E76 | 36FF | 0E74 | 36FF |
| 0000337500 | 0E7A | 36FF | 0E78 | 681E | 0FDC | F168 | 68BA | BAF4 |
| 0000337520 | FF9A | 00FF | 8300 | 32C4 | 068E | 3A84 | 8326 | 373E |
| 0000337540 | 00BA | 0375 | 09E9 | 8300 | D87E | 74FE | E903 | 000F |
| 0000337560 | 068E | 3A86 | 8326 | 633E | 00BA | 0375 | 5AE9 | 8B00 |
| 0000337600 | 0A46 | 568B | 890C | DA46 | 5689 | FFDC | E076 | 76FF |
| 0000337620 | 8DDE | DA46 | 5016 | 76FF | FFEE | FC76 | 76FF | 8DFA |
| 0000337640 | E24E | 5116 | 4E8D | 16F2 | 8D51 | D44E | 5116 | 681E |
| 0000337660 | 0FEE | C068 | FF01 | 7636 | FF0E | 7436 | FF0E | 7A36 |
| 0000337700 | FF0E | 7836 | 9A0E | BDD7 | 0000 | C483 | 8B28 | DA46 |
| 0000337720 | 568B | E9DC | 000C | 09E9 | 8B00 | 0A46 | 568B | E90C |
| 0000337740 | 0000 | 5E1F | 835F | 02ED | E58B | 5D1F | CA4D | 0010 |
| 0000337760 | 581E | 4590 | 8B55 | 1EEC | D88E | EC81 | 0042 | 5657 |
| 0000340000 | B81E | BA17 | D88E | 46C7 | 00E4 | 2B00 | 89C0 | E846 |
| 0000340020 | 4689 | C7E6 | FA46 | 1000 | 5E8C | C7FC | EE46 | 0108 |
| 0000340040 | C02B | 4689 | 89D0 | CE46 | 068E | 3A84 | 8326 | E33E |
| 0000340060 | 00C1 | 0375 | 1DE9 | FF00 | 7A36 | FF0E | 7836 | 8D0E |
| 0000340100 | C446 | 5016 | 4D9A | 00BA | 8300 | 08C4 | 003D | 7400 |
| 0000340120 | E903 | 000F | 068E | 3A86 | 8326 | FB3E | 00C1 | 0375 |
| 0000340140 | 3BE9 | 1E00 | 0A68 | 8D10 | D846 | 5016 | 468D | 16C4 |
| 0000340160 | 8D50 | F246 | 5016 | DE68 | 1E01 | F468 | FF10 | 7636 |
| 0000340200 | FF0E | 7436 | FF0E | 7A36 | FF0E | 7836 | 9A0E | BA96 |
| 0000340220 | 0000 | C483 | 891E | F246 | 5689 | E9F4 | 0008 | C02B |
| 0000340240 | 4689 | 89F4 | F246 | 5EC4 | 26D6 | 478A | 2A0B | 89E4 |
| 0000340260 | C246 | 76FF | FFC2 | 0876 | 76FF | 9A06 | 2EF0 | C1D7 |
| 0000340300 | C483 | 5204 | 6A50 | 8D00 | F646 | 5016 | FF9A | 00FF |
| 0000340320 | 8900 | F046 | 7E83 | 00F0 | 0375 | 95E9 | FF00 | F076 |
| 0000340340 | 681E | 1014 | C39A | 710A | 83C2 | 06C4 | 068E | 3A84 |
| 0000340360 | 8326 | 003E | 00C3 | 0375 | 09E9 | 8300 | C87E | 74FE |
| 0000340400 | E903 | 000F | 068E | 3A86 | 8326 | 183E | 00C3 | 0375 |
| 0000340420 | 56E9 | 2B00 | 89C0 | CC46 | 4689 | FFCA | D076 | 76FF |
| 0000340440 | 8DCE | CA46 | 5016 | 76FF | FFEE | FC76 | 76FF | 8DFA |
| 0000340460 | D84E | 5116 | 4E8D | 16F2 | 8D51 | C44E | 5116 | 681E |
| 0000340500 | 10F4 | E468 | FF01 | 7636 | FF0E | 7436 | FF0E | 7A36 |
| 0000340520 | FF0E | 7836 | 9A0E | C366 | 0000 | C483 | 8B28 | CA46 |
| 0000340540 | 568B | E9CC | 054F | 09E9 | B800 | 0000 | 00BA | E900 |
| 0000340560 | 0543 | 76FF | FF10 | 0E76 | 76FF | FF0C | 0A76 | 389A |
| 0000340600 | E843 | 89C2 | EA46 | 5689 | 8BEC | EA46 | 568B | 01EC |
| 0000340620 | F006 | 1110 | F216 | 1E10 | 9468 | 9A3C | BE5D | 0000 |
| 0000340640 | 468B | 8B12 | 1456 | 4689 | 89D4 | D656 | 7E83 | 0012 |
| 0000340660 | 0375 | 95E9 | B801 | FFFF | 462B | 8912 | E446 | 46FF |
| 0000340700 | FFE4 | C276 | 76FF | FFD6 | D476 | 76FF | 8DE4 | D246 |
| 0000340720 | 5016 | FF9A | 00FF | 8900 | F046 | 7E83 | 00F0 | 0374 |

THU MAR 14 17:31:54 1991 DB_PI.DLL PAGE 123, LINE 7199

| | | | | | | | | |
|---|---|---|---|---|---|---|---|---|
| 0000340740 | 0BE9 | 8B00 | E446 | 4639 | 75D2 | E903 | 00A3 | 76FF |
| 0000340760 | 1EF0 | 3A68 | 9A10 | 0A88 | C2F4 | C483 | 1E06 | 0268 |
| 0000341000 | 9A31 | 0E8E | BE9D | C483 | 8E04 | 8406 | 263A | 3E83 |
| 0000341020 | C3A2 | 7500 | E903 | 0009 | 7E83 | FEC8 | 0374 | 0FE9 |
| 0000341040 | 8E00 | 8606 | 263A | 3E83 | C3BA | 7500 | E903 | 0059 |
| 0000341060 | 468B | 89D2 | CA46 | 46C7 | 00CC | FF00 | D076 | 76FF |
| 0000341100 | 8DCE | CA46 | 5016 | 76FF | FFEE | FC76 | 76FF | 8DFA |
| 0000341120 | D84E | 5116 | 4E8D | 16F2 | 8D51 | C44E | 5116 | 681E |
| 0000341140 | 10F4 | F968 | FF01 | 7636 | FF0E | 7436 | FF0E | 7A36 |
| 0000341160 | FF0E | 7836 | 9A0E | C405 | 0000 | C483 | 8B28 | CA46 |
| 0000341200 | 568B | E9CC | 042F | 08E9 | 8B00 | D246 | D22B | 24E9 |
| 0000341220 | 8B04 | E446 | D22B | 563B | 7DEC | E903 | 0093 | 037E |
| 0000341240 | 08E9 | 3B00 | EA46 | 0373 | 86E9 | 8E00 | 8406 | 263A |
| 0000341260 | 3E83 | BE07 | 7500 | E903 | 0009 | 7E83 | FEC8 | 0374 |
| 0000341300 | 0FE9 | 8E00 | 8606 | 263A | 3E83 | C067 | 7500 | E903 |
| 0000341320 | 0056 | C02B | 4689 | 89CC | CA46 | 76FF | FFD0 | CE76 |
| 0000341340 | 468D | 16CA | FF50 | EE76 | 76FF | FFFC | FA76 | 4E8D |
| 0000341360 | 16D8 | 8D51 | F24E | 5116 | 4E8D | 16C4 | 1E51 | F468 |
| 0000341400 | 6810 | 01FE | 36FF | 0E76 | 36FF | 0E74 | 36FF | 0E7A |
| 0000341420 | 36FF | 0E78 | B69A | 00C0 | 8300 | 28C4 | 468B | 8BCA |
| 0000341440 | CC56 | 90E9 | E903 | 0009 | 00B8 | BA00 | 0000 | 84E9 |
| 0000341460 | 8B03 | E446 | D22B | 4603 | 8312 | 00D2 | 7EB9 | D3C4 |
| 0000341500 | 03E2 | 1456 | 4689 | 89D4 | D656 | 468B | 2BE4 | 29D2 |
| 0000341520 | EA46 | 5619 | 8BEC | E446 | 4689 | C7E6 | E846 | 0000 |
| 0000341540 | 468B | 8BE6 | E856 | 0005 | 8380 | 00D2 | 563B | 7EEC |
| 0000341560 | E903 | 0102 | 037D | 08E9 | 3B00 | EA46 | 0376 | F5E9 |
| 0000341600 | 8B00 | E646 | 568B | 03E8 | 1246 | D283 | B900 | BD3F |
| 0000341620 | E2D3 | 5603 | 8914 | D446 | 5689 | FFD6 | C276 | 76FF |
| 0000341640 | FFD6 | D476 | 0068 | 8D80 | D246 | 5016 | 8C9A | 00C5 |
| 0000341660 | 8900 | F046 | 7E83 | 00F0 | 0374 | 0AE9 | 8100 | D27E |
| 0000341700 | 8000 | 0375 | A3E9 | FF00 | F076 | 681E | 105B | 889A |
| 0000341720 | CD0A | 83C4 | 06C4 | 681E | 3102 | 8E9A | B40E | 83C5 |
| 0000341740 | 04C4 | 068E | 3A84 | 8326 | CC3E | 00C5 | 0375 | 09E9 |
| 0000341760 | 8300 | C87E | 74FE | E903 | 000F | 068E | 3A86 | 8326 |
| 0000342000 | E43E | 00C5 | 0375 | 59E9 | 8B00 | D246 | 4689 | C7CA |
| 0000342020 | CC46 | 0000 | 76FF | FFD0 | CE76 | 468D | 16CA | FF50 |
| 0000342040 | EE76 | 76FF | FFFC | FA76 | 4E8D | 16D8 | 8D51 | F24E |
| 0000342060 | 5116 | 4E8D | 16C4 | 1E51 | F468 | 6810 | 0211 | 36FF |
| 0000342100 | 0E76 | 36FF | 0E74 | 36FF | 0E7A | 36FF | 0E78 | 329A |
| 0000342120 | 00C6 | 8300 | 28C4 | 468B | 8BCA | CC56 | 56E9 | E902 |
| 0000342140 | 0008 | 468B | 2BD2 | E9D2 | 024B | 4681 | 00E6 | 8380 |
| 0000342160 | E856 | E900 | FEEA | 76FF | 8BC2 | E646 | 568B | 03E8 |
| 0000342200 | 1246 | D283 | B900 | C42D | E2D3 | 5603 | 5214 | 8B50 |
| 0000342220 | EA46 | 462B | 50E6 | 468D | 16D2 | 9A50 | C2C3 | 000C |
| 0000342240 | 4689 | 83F0 | F07E | 7400 | E903 | 000E | 468B | 2BEA |
| 0000342260 | E646 | 463B | 75D2 | E903 | 00A3 | 76FF | 1EF0 | 7C68 |
| 0000342300 | 9A10 | 0A88 | C5C0 | C483 | 1E06 | 0268 | 9A31 | 0E8E |
| 0000342320 | C692 | C483 | 8E04 | 8406 | 263A | 3E83 | C722 | 7500 |
| 0000342340 | E903 | 0009 | 7E83 | FEC8 | 0374 | 0FE9 | 8E00 | 8606 |
| 0000342360 | 263A | 3E83 | C73A | 7500 | E903 | 0059 | 468B | 89D2 |
| 0000342400 | CA46 | 46C7 | 00CC | FF00 | D076 | 76FF | 8DCE | CA46 |
| 0000342420 | 5016 | 76FF | FFEE | FC76 | 76FF | 8DFA | D84E | 5116 |
| 0000342440 | 4E8D | 16F2 | 8D51 | C44E | 5116 | 681E | 10F4 | 1C68 |
| 0000342460 | FF02 | 7636 | FF0E | 7436 | FF0E | 7A36 | FF0E | 7836 |
| 0000342500 | 9A0E | C789 | 0000 | C483 | 8B28 | CA46 | 568B | E9CC |
| 0000342520 | 0163 | 08E9 | 8B00 | D246 | D22B | 58E9 | 1E01 | 8868 |
| 0000342540 | 9A3C | C28C | 0000 | 88A0 | 2A3C | 8AE4 | 940E | 2A3C |
| 0000342560 | 2BED | 6BC1 | 3CC0 | 0E8A | 3C95 | ED2A | C12B | 0E8A |
| 0000342600 | 3C89 | ED2A | C103 | C06B | 8A3C | 960E | 2A3C | 2BED |

THU MAR 14 17:31:54 1991 DB_PI.DLL PAGE 124, LINE 7258

| | | | | | | | | |
|---|---|---|---|---|---|---|---|---|
| 0000342620 | 8AC1 | 8A0E | 2A3C | 03ED | 89C1 | C046 | 5E8D | 9AC0 |
| 0000342640 | 5A6B | C6AA | 8BAD | 2A3C | 8AE4 | 970E | 2A3C | 2BED |
| 0000342660 | 89C1 | BE46 | 5E8D | 9ABE | 5A6B | C6B3 | 1E8D | 3A88 |
| 0000342700 | E49A | B85D | 9AC6 | 5FB6 | C6C2 | 1E8D | 10EC | 9A53 |
| 0000342720 | 5E5C | C6C8 | 9A5B | 5B6C | C6D1 | 1E8D | 10F0 | 759A |
| 0000342740 | DA5A | 8DC6 | 8C1E | 9A3A | 5F06 | C6E3 | 1E8D | 1DEC |
| 0000342760 | 0C9A | ED5E | 83C6 | 08EC | DC8B | C79A | FE5B | FFC6 |
| 0000343000 | F236 | FF10 | F036 | 8D10 | EC1E | 9A10 | 598C | C703 |
| 0000343020 | 969A | 0D60 | 83C7 | 08EC | DC8B | C79A | 165B | 1EC7 |
| 0000343040 | 9D68 | 9A10 | 0A88 | C1AE | C483 | 8E18 | 8406 | 263A |
| 0000343060 | 3E83 | C11F | 7500 | E903 | 0009 | 7E83 | FEC8 | 0374 |
| 0000343100 | 0FE9 | 8E00 | 8606 | 263A | 3E83 | C14B | 7500 | E903 |
| 0000343120 | 005A | 468B | 8B0A | 0C56 | 4689 | 89CA | CC56 | 76FF |
| 0000343140 | FFD0 | CE76 | 468D | 16CA | FF50 | EE76 | 76FF | FFFC |
| 0000343160 | FA76 | 4E8D | 16D8 | 8D51 | F24E | 5116 | 4E8D | 16C4 |
| 0000343200 | 1E51 | F468 | 6810 | 0229 | 36FF | 0E76 | 36FF | 0E74 |
| 0000343220 | 36FF | 0E7A | 36FF | 0E78 | 469A | 00C2 | 8300 | 28C4 |
| 0000343240 | 468B | 8BCA | CC56 | 0CE9 | E900 | 0009 | 468B | 8B0A |
| 0000343260 | 0C56 | 00E9 | 1F00 | 5F5E | ED83 | 8B02 | 1FE5 | 4D5D |
| 0000343300 | 10CA | 1E00 | 9058 | 5545 | EC8B | 8E1E | 81D8 | 2CEC |
| 0000343320 | 5700 | 1E56 | F2B8 | 8EC0 | C7D8 | FA46 | 10FE | 5E8C |
| 0000343340 | C7FC | EE46 | 0108 | C02B | 4689 | 89E0 | DE46 | 068E |
| 0000343360 | 3A84 | 8326 | 913E | 00C8 | 0375 | 1DE9 | FF00 | 7A36 |
| 0000343400 | FF0E | 7836 | 8D0E | D446 | 5016 | 359A | 00C1 | 8300 |
| 0000343420 | 08C4 | 003D | 7400 | E903 | 000F | 068E | 3A86 | 8326 |
| 0000343440 | A93E | 00C8 | 0375 | 3BE9 | 1E00 | 0868 | 8D11 | E246 |
| 0000343460 | 5016 | 468D | 16D4 | 8D50 | F246 | 5016 | 4F68 | 1E02 |
| 0000343500 | 1268 | FF11 | 7636 | FF0E | 7436 | FF0E | 7A36 | FF0E |
| 0000343520 | 7836 | 9A0E | C17E | 0000 | C483 | 891E | F246 | 5689 |
| 0000343540 | E9F4 | 0008 | C02B | 4689 | 89F4 | F246 | 7E83 | 000C |
| 0000343560 | 037D | 25E9 | 7E00 | E903 | 0009 | 7E83 | 000A | 0377 |
| 0000343600 | 17E9 | 8300 | 107E | 7E00 | E903 | 0098 | 037D | 09E9 |
| 0000343620 | 8300 | 0E7E | 7600 | E903 | 008A | 068E | 3A84 | 8326 |
| 0000343640 | 8C3E | 00C9 | 0375 | 09E9 | 8300 | D87E | 74FE | E903 |
| 0000343660 | 000F | 068E | 3A86 | 8326 | A43E | 00C9 | 0375 | 5AE9 |
| 0000343700 | 8B00 | 0A46 | 568B | 890C | DA46 | 5689 | FFDC | E076 |
| 0000343720 | 76FF | 8DDE | DA46 | 5016 | 76FF | FFEE | FC76 | 76FF |
| 0000343740 | 8DFA | E24E | 5116 | 4E8D | 16F2 | 8D51 | D44E | 5116 |
| 0000343760 | 681E | 1112 | 5668 | FF02 | 7636 | FFDE | 7436 | FF0E |
| 0000344000 | 7A36 | FF0E | 7836 | 9A0E | CA03 | 0000 | C483 | 8B28 |
| 0000344020 | DA46 | 568B | E9DC | 02B6 | 09E9 | 8B00 | 0A46 | 568B |
| 0000344040 | E90C | 02AA | 006A | 0068 | FF80 | 1076 | 76FF | FF0E |
| 0000344060 | 0C76 | 76FF | 9A0A | 4338 | C92F | 5052 | 9E9A | 4842 |
| 0000344100 | 89C9 | F846 | 006A | 0068 | FF80 | 1076 | 76FF | FF0E |
| 0000344120 | 0C76 | 76FF | 9A0A | 4338 | C94F | 5052 | 6A9A | 7243 |
| 0000344140 | 89C9 | F646 | 7E83 | 00F8 | 0377 | D2E9 | FF00 | 0876 |
| 0000344160 | 76FF | FFD6 | F876 | 0068 | FF80 | 1476 | 76FF | 9A12 |
| 0000344200 | 06C8 | C9C0 | C483 | 890C | F046 | 468B | 39F0 | F846 |
| 0000344220 | 0375 | AAE9 | 8E00 | 8406 | 263A | 3E83 | CA97 | 7500 |
| 0000344240 | E903 | 0009 | 7E83 | FED8 | 0374 | 0FE9 | 8E00 | 8606 |
| 0000344260 | 263A | 3E83 | CAAF | 7500 | E903 | 006A | 76FF | FF10 |
| 0000344300 | 0E76 | 668A | C0F0 | 07E4 | C02A | 006A | 9A50 | 429E |
| 0000344320 | CA2A | 4689 | 89DA | DC56 | 76FF | FFE0 | DE76 | 468D |
| 0000344340 | 16DA | FF50 | EE76 | 76FF | FFFC | FA76 | 4E8D | 16E2 |
| 0000344360 | 8D51 | F24E | 5116 | 4E8D | 16D4 | 1E51 | 1268 | 6811 |
| 0000344400 | 025F | 36FF | 0E76 | 36FF | 0E74 | 36FF | 0E7A | 36FF |
| 0000344420 | 0E78 | 0B9A | 00CB | 8300 | 28C4 | 468B | 8BDA | DC56 |
| 0000344440 | ABE9 | E901 | 0019 | 76FF | FF10 | 0E76 | 668A | C0F0 |
| 0000344460 | 07E4 | C02A | 006A | 9A50 | 429E | CA7F | 8FE9 | 8301 |

THU MAR 14 17:31:54 1991 DB_PI.DLL PAGE 125, LINE 7317

| | | | | | | | | |
|---|---|---|---|---|---|---|---|---|
| 0000344500 | F67E | 7700 | E903 | 00FC | 76FF | FF08 | 0676 | 016A |
| 0000344520 | 76FF | 8BF6 | F846 | D22B | F28A | D48A | E08A | C02A |
| 0000344540 | E0D1 | D2D1 | E0D1 | D2D1 | E0D1 | D2D1 | E0D1 | D2D1 |
| 0000344560 | E0D1 | D2D1 | E0D1 | D2D1 | E0D1 | D2D1 | 4603 | 8312 |
| 0000344600 | 00D2 | 76B9 | D3C5 | 03E2 | 1456 | 5052 | C89A | C806 |
| 0000344620 | 83CA | 0CC4 | 4689 | 83F0 | F07E | 75D1 | E903 | 00A4 |
| 0000344640 | 068E | 3A84 | 8326 | 3B3E | 00CB | 0375 | 09E9 | 8300 |
| 0000344660 | D87E | 74FE | E903 | 000F | 068E | 3A86 | 8326 | 533E |
| 0000344700 | 00CB | 0375 | 67E9 | FF00 | 1076 | 76FF | 690E | F046 |
| 0000344720 | 8001 | 006A | 9A50 | 429E | CB2F | 4689 | 89DA | DC56 |
| 0000344740 | 76FF | FFE0 | DE76 | 468D | 16DA | FF50 | EE76 | 76FF |
| 0000344760 | FFFC | FA76 | 4E8D | 16E2 | 8D51 | F24E | 5116 | 4E8D |
| 0000345000 | 16D4 | 1E51 | 1268 | 6811 | 0267 | 36FF | 0E76 | 36FF |
| 0000345020 | 0E74 | 36FF | 0E7A | 36FF | 0E78 | 3F9A | 00C5 | 8300 |
| 0000345040 | 28C4 | 468B | 8BDA | DC56 | A3E9 | E900 | 0016 | 76FF |
| 0000345060 | FF10 | 0E76 | 4669 | 01F0 | 6A80 | 5000 | 9E9A | C142 |
| 0000345100 | E9C4 | 008A | 068E | 3A84 | 8326 | D93E | 00C4 | 0375 |
| 0000345120 | 09E9 | 8300 | D87E | 74FE | E903 | 000F | 068E | 3A86 |
| 0000345140 | 8326 | F13E | 00C4 | 0375 | 5AE9 | 8B00 | 0A46 | 568B |
| 0000345160 | 890C | DA46 | 5689 | FFDC | E076 | 76FF | 8DDE | DA46 |
| 0000345200 | 5016 | 76FF | FFEE | FC76 | 76FF | 8DFA | E24E | 5116 |
| 0000345220 | 4E8D | 16F2 | 8D51 | D44E | 5116 | 681E | 1112 | 6A68 |
| 0000345240 | FF02 | 7636 | FF0E | 7436 | FF0E | 7A36 | FF0E | 7836 |
| 0000345260 | 9A0E | C8F8 | 0000 | C483 | 8B28 | DA46 | 568B | E9DC |
| 0000345300 | 000C | 09E9 | 8B00 | 0A46 | 568B | E90C | 0000 | 5E1F |
| 0000345320 | 835F | 02ED | E58B | 5D1F | CA4D | 0010 | 581E | 4590 |
| 0000345340 | 8B55 | 1EEC | D88E | EC81 | 0000 | 5657 | B81E | C7C5 |
| 0000345360 | D88E | 468B | 0B10 | 0E46 | 0375 | 0BE9 | 8B00 | 0C46 |
| 0000345400 | 460B | 740A | E903 | 0006 | 17B8 | E900 | 001D | 76FF |
| 0000345420 | FF06 | 0876 | 76FF | FF0C | 0A76 | 76FF | FF10 | 0E76 |
| 0000345440 | 7C9A | B636 | 839D | 0CC4 | 00E9 | 1F00 | 5F5E | ED83 |
| 0000345460 | 8B02 | 1FE5 | 4D5D | 0CCA | 0000 | 581E | 4590 | 8B55 |
| 0000345500 | 1EEC | D88E | EC81 | 0008 | 5657 | 5EC4 | 2B06 | 26C0 |
| 0000345520 | 4789 | 2602 | 0789 | 32A1 | 0B11 | 3006 | 7511 | E903 |
| 0000345540 | 0013 | 1EC4 | 1130 | 8326 | 003F | 0375 | 06E9 | B800 |
| 0000345560 | 0194 | A8E9 | 6801 | 030E | 016A | 769A | B233 | 83CC |
| 0000345600 | 04C4 | 30A3 | 8911 | 3216 | A111 | 1132 | 060B | 1130 |
| 0000345620 | 0374 | 06E9 | B800 | 0007 | 82E9 | C401 | 301E | 2611 |
| 0000345640 | 87C7 | 02CA | 0008 | 1EC4 | 1130 | C726 | CC87 | 0002 |
| 0000345660 | C400 | 301E | 2611 | 07C7 | 0001 | C068 | 6A04 | 9A01 |
| 0000345700 | 3376 | CCEA | C483 | C404 | 301E | 2611 | 4789 | 2650 |
| 0000345720 | 5789 | C452 | 301E | 2611 | 47C7 | 024C | C400 | 301E |
| 0000345740 | 2611 | 47C7 | 004E | 1E00 | 1C68 | A111 | 1130 | 168B |
| 0000345760 | 1132 | E605 | 5200 | 9A50 | 2750 | CD23 | C483 | C408 |
| 0000346000 | 301E | 2611 | 87C7 | 00E0 | 0000 | 1EC4 | 1130 | C726 |
| 0000346020 | DE87 | 5800 | C400 | 301E | 2611 | 87C7 | 00DC | 0000 |
| 0000346040 | 681E | 1123 | 30A1 | 8B11 | 3216 | 0511 | 0194 | 5052 |
| 0000346060 | 509A | 2827 | 83C9 | 08C4 | 1EC4 | 1130 | C726 | 8E87 |
| 0000346100 | 0001 | C400 | 301E | 2611 | 87C7 | 018C | 00AC | 1EC4 |
| 0000346120 | 1130 | C726 | 8A87 | 0001 | C400 | 301E | 2611 | 87C7 |
| 0000346140 | 01B8 | 0000 | 1EC4 | 1130 | C02B | 8926 | BC87 | 2601 |
| 0000346160 | 8789 | 01BA | 1EC4 | 1130 | C726 | BE87 | 0001 | C400 |
| 0000346200 | 301E | 2B11 | 26C0 | 8789 | 01C2 | 8926 | C087 | A101 |
| 0000346220 | 1130 | 168B | 1132 | 5EC4 | 2606 | 0789 | 8926 | 0257 |
| 0000346240 | 119A | AADF | 89CD | FC46 | 7E83 | 00FC | 0375 | 06E9 |
| 0000346260 | 8B00 | FC46 | 66E9 | 9A00 | E36A | A79B | 4689 | 83FC |
| 0000346300 | FC7E | 7500 | E903 | 0006 | 468B | E9FC | 004F | 681E |
| 0000346320 | 112A | 468D | 16F8 | 9A50 | FFFF | 0000 | 4689 | 83FA |
| 0000346340 | FA7E | 7500 | E903 | 0006 | 05B8 | E900 | 002F | 76FF |

THU MAR 14 17:31:54 1991 DB_PI.DLL PAGE 126, LINE 7376

| | | | | | | | | |
|---|---|---|---|---|---|---|---|---|
| 0000346360 | 68F8 | 0100 | 30A1 | 8B11 | 3216 | 0511 | 01CA | 5052 |
| 0000346400 | FF9A | 00FF | 8900 | FA46 | 7E83 | 00FA | 0375 | 06E9 |
| 0000346420 | B800 | 0005 | 06E9 | 8B00 | FC46 | 00E9 | 5E00 | 835F |
| 0000346440 | 02ED | E58B | 5D1F | CB4D | 581E | 4590 | 8B55 | 1EEC |
| 0000346460 | D88E | EC81 | 0000 | 5657 | 32A1 | 0B11 | 3006 | 7511 |
| 0000346500 | E903 | 000D | 1EC4 | 1130 | 8326 | 003F | 0374 | 06E9 |
| 0000346520 | B800 | 0195 | 75E9 | C400 | 301E | 2611 | 77FF | 2652 |
| 0000346540 | 77FF | 9A50 | 2448 | CE89 | C483 | C404 | 301E | 2B11 |
| 0000346560 | 26C0 | 4789 | 2652 | 4789 | C450 | 301E | 2611 | BF83 |
| 0000346600 | 01BE | 7700 | E903 | 0026 | 1EC4 | 1130 | FF26 | C2B7 |
| 0000346620 | 2601 | B7FF | 01C0 | 489A | A924 | 83CE | 04C4 | 1EC4 |
| 0000346640 | 1130 | C02B | 8926 | C287 | 2601 | 8789 | 01C0 | 36FF |
| 0000346660 | 1132 | 36FF | 1130 | 489A | 6D24 | 83CC | 04C4 | C02B |
| 0000346700 | 32A3 | A311 | 1130 | 00B8 | E900 | 0000 | 5F5E | ED83 |
| 0000346720 | 8B02 | 1FE5 | 4D5D | 1ECB | 9058 | 5545 | EC8B | 8E1E |
| 0000346740 | 81D8 | 00EC | 5700 | C456 | 065E | C02B | 8926 | 0247 |
| 0000346760 | 8926 | A107 | 1132 | 060B | 1130 | 0375 | 0DE9 | C400 |
| 0000347000 | 301E | 2611 | 3F83 | 7400 | E903 | 0006 | 95B8 | E901 |
| 0000347020 | 0017 | 30A1 | 8B11 | 3216 | C411 | 065E | 8926 | 2607 |
| 0000347040 | 5789 | B802 | 0000 | 00E9 | 5E00 | 835F | 02ED | E58B |
| 0000347060 | 5D1F | CB4D | 581E | 4590 | 8B55 | 1EEC | D88E | EC81 |
| 0000347100 | 0000 | 5657 | 32A1 | 0B11 | 3006 | 7511 | E903 | 000D |
| 0000347120 | 1EC4 | 1130 | 8326 | 003F | 0374 | 06E9 | B800 | 0001 |
| 0000347140 | 03E9 | B800 | 0000 | 00E9 | 5E00 | 835F | 02ED | E58B |
| 0000347160 | 5D1F | CB4D | 581E | 4590 | 8B55 | 1EEC | D88E | EC81 |
| 0000347200 | 0004 | 5657 | 5EC4 | 2B0C | 26C0 | 4789 | 2602 | 0789 |
| 0000347220 | 32A1 | 0B11 | 3006 | 7511 | E903 | 000D | 1EC4 | 1130 |
| 0000347240 | 8326 | 003F | 0374 | 06E9 | B800 | 0195 | A3E9 | C700 |
| 0000347260 | FC46 | D000 | 03E9 | FF00 | FC46 | 1EC4 | 1130 | 468B |
| 0000347300 | 26FC | 8739 | 02CA | 0377 | 48E9 | 8B00 | 0646 | 568B |
| 0000347320 | 8B08 | FC76 | E6C1 | C403 | 301E | 2611 | 8039 | 02CE |
| 0000347340 | 0374 | 2BE9 | 2600 | 9039 | 02D0 | 0374 | 21E9 | 8B00 |
| 0000347360 | FC76 | E6C1 | C403 | 301E | 2611 | 808B | 02D2 | 8B26 |
| 0000347400 | D490 | C402 | 0C5E | 8926 | 2607 | 5789 | E902 | 0003 |
| 0000347420 | A4E9 | C4FF | 0C5E | 8B26 | 0247 | 0B26 | 7407 | E903 |
| 0000347440 | 0006 | 9BB8 | E901 | 002A | 5EC4 | 260C | 1FC4 | 468B |
| 0000347460 | 260A | 4739 | 7C24 | E903 | 0012 | 5EC4 | 2B0C | 26C0 |
| 0000347500 | 4789 | 2602 | 0789 | A6B8 | E901 | 0006 | 00B8 | E900 |
| 0000347520 | 0000 | 5F5E | ED83 | 8B02 | 1FE5 | 4D5D | 1ECB | 9058 |
| 0000347540 | 5545 | EC8B | 8E1E | 81D8 | 0AEC | 5700 | C456 | 0A5E |
| 0000347560 | C02B | 8926 | 0247 | 8926 | A107 | 1132 | 060B | 1130 |
| 0000347600 | 0375 | 0DE9 | C400 | 301E | 2611 | 3F83 | 7400 | E903 |
| 0000347620 | 0006 | 95B8 | E901 | 019E | 1EC4 | 1130 | 8B26 | CA87 |
| 0000347640 | C402 | 301E | 2611 | 8739 | 02CC | 0374 | A6E9 | C400 |
| 0000347660 | 301E | 2611 | 878B | 02CA | 0805 | 8900 | FC46 | 468B |
| 0000347700 | C1FC | 03E0 | CE05 | 5002 | 36FF | 1132 | 36FF | 1130 |
| 0000347720 | A49A | E432 | 83D0 | 06C4 | 4689 | 89F8 | FA56 | 468B |
| 0000347740 | 0BFA | F846 | 0374 | 2EE9 | FF00 | 3236 | FF11 | 3036 |
| 0000347760 | 9A11 | 26FC | D0F5 | C483 | 5004 | 36FF | 1132 | 36FF |
| 0000350000 | 1130 | A49A | 4032 | 83D1 | 06C4 | 30A3 | 8911 | 3216 |
| 0000350020 | B811 | 0007 | 1FE9 | 8B01 | F846 | 568B | A3FA | 1130 |
| 0000350040 | 1689 | 1132 | 468B | C4FC | 301E | 2611 | 8789 | 02CA |
| 0000350060 | 406A | 006A | 1EC4 | 1130 | 8B26 | CC87 | C102 | 03E0 |
| 0000350100 | 0603 | 1130 | 168B | 1132 | CED5 | 5202 | 9A50 | 3E8E |
| 0000350120 | D182 | C483 | C708 | F646 | 0000 | 03E9 | FF00 | F646 |
| 0000350140 | 1EC4 | 1130 | 468B | 26F6 | 8739 | 02CA | 0377 | BFE9 |
| 0000350160 | 8B00 | F676 | E6C1 | C403 | 301E | 2611 | 808B | 02D0 |
| 0000350200 | 0B26 | CE80 | 7402 | E903 | 00A3 | 7668 | 6A0A | 9A01 |
| 0000350220 | 3376 | CE56 | C483 | 8B04 | F676 | E6C1 | C403 | 301E |

THU MAR 14 17:31:54 1991 DB_PI.DLL PAGE 127, LINE 7435

| | | | | | | | | |
|---|---|---|---|---|---|---|---|---|
| 0000350240 | 2611 | 8089 | 02D2 | 8926 | D490 | 8B02 | F676 | E6C1 |
| 0000350260 | C403 | 301E | 2611 | 808B | 02D4 | 0B26 | D280 | 7402 |
| 0000350300 | E903 | 0006 | 07B8 | E900 | 006C | 468B | 8B06 | 0856 |
| 0000350320 | 768B | C1F6 | 03E6 | 1EC4 | 1130 | C426 | D298 | 2602 |
| 0000350340 | 0789 | 8926 | 0257 | 468B | 8B06 | 0856 | 768B | C1F6 |
| 0000350360 | 03E6 | 1EC4 | 1130 | 8926 | CE80 | 2602 | 9089 | 02D0 |
| 0000350400 | 1EC4 | 1130 | FF26 | CC87 | 8B02 | F676 | E6C1 | C403 |
| 0000350420 | 301E | 2611 | 808B | 02D2 | 8B26 | D490 | C402 | 0A5E |
| 0000350440 | 8926 | 2607 | 5789 | B802 | 0000 | 09E9 | E900 | FF2D |
| 0000350460 | FBB8 | E901 | U000 | 5F5E | ED83 | 8B02 | 1FE5 | 4D5D |
| 0000350500 | 1ECB | 9058 | 5545 | EC8B | 8E1E | 81D8 | 04EC | 5700 |
| 0000350520 | A156 | 1132 | 060B | 1130 | 0375 | 0DE9 | C400 | 301E |
| 0000350540 | 2611 | 3F83 | 7400 | E903 | 0006 | 95B8 | E901 | 00A0 |
| 0000350560 | 46C7 | 00FC | E900 | 0003 | 46FF | C4FC | 301E | 8B11 |
| 0000350600 | FC46 | 3926 | CA87 | 7702 | E903 | 007E | 468B | 8B06 |
| 0000350620 | 0856 | 768B | C1FC | 03E6 | 1EC4 | 1130 | 3926 | CE80 |
| 0000350640 | 7402 | E903 | 006I | 3926 | D090 | 7402 | E903 | 0057 |
| 0000350660 | 768B | C1FC | 03E6 | 1EC4 | 1130 | FF26 | D4B0 | 2602 |
| 0000350700 | B0FF | 02D2 | 489A | C324 | 83D0 | 04C4 | 768B | C1FC |
| 0000350720 | 03E6 | 1EC4 | 1130 | C02B | 8926 | D480 | 2602 | 8089 |
| 0000350740 | 02D2 | 768B | C1FC | 03E6 | 1EC4 | 1130 | C02B | 8926 |
| 0000350760 | D080 | 2602 | 8089 | 02CE | 1EC4 | 1130 | FF26 | CC8F |
| 0000351000 | B802 | 0000 | 09E9 | E900 | FF6E | 9BB8 | E901 | 0000 |
| 0000351020 | 5F5E | ED83 | 8B02 | 1FE5 | 4D5D | 1ECB | 9058 | 5545 |
| 0000351040 | EC8B | 8E1E | 81D8 | 24EC | 5700 | 6856 | 0260 | 006A |
| 0000351060 | 76FF | FF0C | 0A76 | 8E9A | 763E | 83D3 | 08C4 | 468B |
| 0000351100 | 8B06 | 0856 | 5EC4 | 260A | 0789 | 8926 | 0257 | 468D |
| 0000351120 | 16DE | FF50 | 0876 | 76FF | 9A06 | DBEC | CD93 | C483 |
| 0000351140 | 8908 | DC46 | 7E83 | 00DC | 0375 | 06E9 | 8B00 | DC46 |
| 0000351160 | 77E9 | 8D00 | DE46 | 5016 | 468B | 8B0A | 0C56 | 0405 |
| 0000351200 | 5200 | 9A50 | 2750 | D38D | C483 | 1E08 | 4868 | 8B11 |
| 0000351220 | 0A46 | 568B | 050C | 0004 | 5052 | 0A9A | A427 | 83D3 |
| 0000351240 | 08C4 | 681E | 1155 | 468B | 8B0A | 0C56 | 8E05 | 5201 |
| 0000351260 | 9A50 | 2750 | D3BB | C483 | 1E08 | 6068 | 8B11 | 0A46 |
| 0000351300 | 568B | 050C | 0238 | 5052 | 509A | B727 | 83D2 | 08C4 |
| 0000351320 | 5EC4 | 260A | 87C7 | 0184 | 0000 | 5EC4 | 260A | 87C7 |
| 0000351340 | 022E | 0000 | 00B8 | E900 | 0000 | 5F5E | ED83 | 8B02 |
| 0000351360 | 1FE5 | 4D5D | 1ECB | 9058 | 5545 | EC8B | 8E1E | 81D8 |
| 0000351400 | 04EC | 5700 | C456 | 0A5E | C02B | 8926 | 0247 | 8926 |
| 0000351420 | A107 | 1132 | 060B | 1130 | 0375 | 0DE9 | C400 | 301E |
| 0000351440 | 2611 | 3F83 | 7400 | E903 | 0006 | 95B8 | E901 | 007C |
| 0000351460 | 468B | 0B08 | 0646 | 0374 | 06E9 | B800 | 0196 | 6BE9 |
| 0000351500 | C700 | FC46 | 0000 | 03E9 | FF00 | FC46 | 1EC4 | 1130 |
| 0000351520 | 468B | 26FC | 4739 | 774C | E903 | 004A | 468B | 8B06 |
| 0000351540 | 0856 | 1EC4 | 1130 | C426 | 505F | 7669 | 60FC | 2602 |
| 0000351560 | 0039 | 0374 | 2CE9 | 2600 | 5039 | 7402 | E903 | 0023 |
| 0000351600 | 1EC4 | 1130 | 8B26 | 5047 | 8B26 | 5257 | 4E69 | 60FC |
| 0000351620 | 0302 | C4C1 | 0A5E | 8926 | 2607 | 5789 | B802 | 0000 |
| 0000351640 | 09E9 | E900 | FFA3 | ABB8 | E901 | 0000 | 5F5E | ED83 |
| 0000351660 | 8B02 | 1FE5 | 4D5D | 1ECB | 9058 | 5545 | EC8B | 8E1E |
| 0000351700 | 81D8 | 0CEC | 5700 | C456 | 0A5E | C02B | 8926 | 0247 |
| 0000351720 | 8926 | A107 | 1132 | 060B | 1130 | 0375 | 0DE9 | C400 |
| 0000351740 | 301E | 2611 | 3F83 | 7400 | E903 | 0006 | 95B8 | E901 |
| 0000351760 | 0174 | 7E83 | 0008 | 0376 | 09E9 | 8300 | 067E | 7301 |
| 0000352000 | E903 | 0012 | 7E83 | 0008 | 0376 | 09E9 | 8300 | 067E |
| 0000352020 | 771F | E903 | 0006 | 96B8 | E901 | 014A | 1EC4 | 1130 |
| 0000352040 | 8B26 | 4E47 | 1EC4 | 1130 | 3926 | 4C47 | 0374 | 81E9 |
| 0000352060 | C400 | 301E | 2611 | 478B | 054C | 0002 | 4689 | 69FC |
| 0000352100 | FC46 | 026D | C450 | 301E | 2611 | 77FF | 2652 | 77FF |

THU MAR 14 17:31:54 1991 DB_PI.DLL PAGE 128, LINE 7494

| | | | | | | | | |
|---|---|---|---|---|---|---|---|---|
| 0000352120 | 9A50 | 32A4 | D59D | C483 | 8906 | F846 | 5689 | 8BFA |
| 0000352140 | FA46 | 460B | 74F8 | E903 | 0006 | 07B8 | E900 | 00F6 |
| 0000352160 | 468B | 8BF8 | FA56 | 1EC4 | 1130 | 8926 | 5047 | 8926 |
| 0000352200 | 5257 | 468B | C4FC | 301E | 2611 | 4789 | 684C | 04C0 |
| 0000352220 | 006A | 1EC4 | 1130 | 6926 | 4E47 | 0260 | 1EC4 | 1130 |
| 0000352240 | 0326 | 5047 | 8B26 | 5257 | 5052 | 8E9A | 293E | 83D3 |
| 0000352260 | 08C4 | 46C7 | 00F4 | E900 | 0003 | 46FF | C4F4 | 301E |
| 0000352300 | 8B11 | F446 | 3926 | 4C47 | 0377 | 93E9 | C400 | 301E |
| 0000352320 | 2611 | 5FC4 | 6950 | F476 | 0260 | 8B26 | 0240 | DB26 |
| 0000352340 | 7400 | E903 | 0077 | 1EC4 | 1130 | 8B26 | 5047 | 8B26 |
| 0000352360 | 5257 | 4E69 | 60F4 | 0302 | C4C1 | 0A5E | 8926 | 2607 |
| 0000352400 | 5789 | C402 | 0A5E | FF26 | 0277 | FF26 | FF37 | 0876 |
| 0000352420 | 76FF | 9A06 | D30B | D34C | C483 | 8908 | F646 | 7E83 |
| 0000352440 | 00F6 | 0375 | 28E9 | C400 | 301E | 2611 | 5FC4 | 6950 |
| 0000352460 | F476 | 0260 | C02B | 8926 | 0240 | 8926 | C400 | 0A5E |
| 0000352500 | C02B | 8926 | 0247 | 8926 | 8B07 | F646 | 17E9 | C400 |
| 0000352520 | 301E | 2611 | 47FF | B84E | 0000 | 09E9 | E900 | FF5A |
| 0000352540 | FBB8 | E901 | 0000 | 5F5E | ED83 | 8B02 | 1FE5 | 4D5D |
| 0000352560 | 1ECB | 9058 | 5545 | EC8B | 8E1E | 81D8 | 04EC | 5700 |
| 0000352600 | A156 | 1132 | 060B | 1130 | 0375 | 0DE9 | C400 | 301E |
| 0000352620 | 2611 | 3F83 | 7400 | E903 | 0006 | 95B8 | E901 | 00F9 |
| 0000352640 | 46C7 | 00FC | E900 | 0003 | 46FF | C4FC | 301E | 8B11 |
| 0000352660 | FC46 | 3926 | 4C47 | 0377 | D8E9 | 8B00 | 0646 | 568B |
| 0000352700 | C408 | 301E | 2611 | 5FC4 | 6950 | FC76 | 0260 | 3926 |
| 0000352720 | 7400 | E903 | 00BA | 3926 | 0250 | 0374 | B1E9 | C400 |
| 0000352740 | 301E | 2611 | 5FC4 | 6950 | FC76 | 0260 | C02B | 8926 |
| 0000352760 | 0240 | 8926 | C400 | 301E | 2611 | 4FFF | 8B4E | 0646 |
| 0000353000 | 568B | C408 | 301E | 2611 | 4739 | 7448 | E903 | 0017 |
| 0000353020 | 3926 | 4A57 | 0374 | 0EE9 | C400 | 301E | 2B11 | 26C0 |
| 0000353040 | 4789 | 264A | 4789 | C448 | 301E | 2611 | 478B | 054E |
| 0000353060 | 0004 | 1EC4 | 1130 | 3B26 | 4C47 | 0372 | 4BE9 | C400 |
| 0000353100 | 301E | 2611 | 6F83 | 024C | 1EC4 | 1130 | 6926 | 4C47 |
| 0000353120 | 0260 | C450 | 301E | 2611 | 77FF | 2652 | 77FF | 9A50 |
| 0000353140 | 32A4 | D544 | C483 | C406 | 301E | 2611 | 4789 | 2650 |
| 0000353160 | 5789 | C452 | 301E | 2611 | 478B | 2652 | 470B | 7450 |
| 0000353200 | E903 | 0006 | 07B8 | E900 | 000F | 00B8 | E900 | 0009 |
| 0000353220 | 15E9 | B8FF | 01AB | 00E9 | 5E00 | 835F | 02ED | E58B |
| 0000353240 | 5D1F | CB4D | 581E | 4590 | 8B55 | 1EEC | D88E | EC81 |
| 0000353260 | 0004 | 5657 | 76FF | FF0C | 0A76 | 76FF | FF08 | 0676 |
| 0000353300 | E59A | DAD3 | 83D7 | 08C4 | 4689 | 81FC | FC7E | 01AB |
| 0000353320 | 0375 | 06E9 | 8B00 | FC46 | 5EE9 | FF00 | 0C76 | 76FF |
| 0000353340 | FF0A | 0876 | 76FF | 9A06 | D4A7 | D818 | C483 | 8908 |
| 0000353360 | FC46 | 7E83 | 00FC | 0375 | 06E9 | 8B00 | FC46 | 38E9 |
| 0000353400 | C400 | 0A5E | FF26 | 0277 | FF26 | 9A37 | 7BDF | D752 |
| 0000353420 | C483 | 8904 | FC46 | 7E83 | 00FC | 0375 | 14E9 | FF00 |
| 0000353440 | 0876 | 76FF | 9A06 | D661 | D606 | C483 | 8B04 | FC46 |
| 0000353460 | 06E9 | B800 | 0000 | 00E9 | 5E00 | 835F | 02ED | E58B |
| 0000353500 | 5D1F | CB4D | 581E | 4590 | 8B55 | 1EEC | D88E | EC81 |
| 0000353520 | 000A | 5657 | 32A1 | 0B11 | 3006 | 7511 | E903 | 000D |
| 0000353540 | 1EC4 | 1130 | 8326 | 003F | 0374 | 06E9 | B800 | 0195 |
| 0000353560 | 44E9 | C401 | 125E | C02B | 8926 | 0247 | 8926 | 8B07 |
| 0000353600 | 0C46 | 460B | 750A | E903 | 0014 | 468B | 250C | 00FC |
| 0000353620 | E8C1 | 8902 | F646 | 46C7 | 00F8 | E900 | 00ED | 468B |
| 0000353640 | 0BD8 | 0646 | 0374 | 12E9 | C400 | 0E5E | C02B | 8926 |
| 0000353660 | 0247 | 8926 | B807 | 0017 | FCE9 | 1E00 | 6C68 | FF11 |
| 0000353700 | 0876 | 76FF | 9A06 | 3C6C | D8FD | C483 | 8908 | FC46 |
| 0000353720 | 468B | 8B06 | 0856 | 4603 | C4FC | 125E | 8926 | 2607 |
| 0000353740 | 5789 | C402 | 065E | 768B | 26FC | 3880 | 7400 | E903 |
| 0000353760 | 0012 | 5EC4 | 2B0E | 26C0 | 4789 | 2602 | 0789 | 17B8 |

THU MAR 14 17:31:54 1991 DB_PI.DLL PAGE 129, LINE 7553

| | | | | | | | | |
|---|---|---|---|---|---|---|---|---|
| 0000354000 | E900 | 00B3 | 76FF | FF08 | 0676 | B09A | FE27 | 83D7 |
| 0000354020 | 04C4 | 463B | 77FC | E903 | 004E | 5E8B | C4FC | 0676 |
| 0000354040 | 8026 | 0178 | 743A | E903 | 003E | 468D | 16F6 | FF50 |
| 0000354060 | 0876 | 76FF | 9A06 | DB63 | D7B3 | C483 | 8908 | FA46 |
| 0000354100 | 7E83 | 00FA | 0375 | 06E9 | 8B00 | FA46 | 68E9 | 8B00 |
| 0000354120 | 0646 | 568B | 0308 | FC46 | 0205 | C400 | 125E | 8926 |
| 0000354140 | 2607 | 5789 | E902 | 0023 | 1EC4 | 1130 | 8B26 | 4847 |
| 0000354160 | 8B26 | 4A57 | 4689 | 89F6 | F856 | 468B | 0BF8 | F646 |
| 0000354200 | 0374 | 06E9 | B800 | 01A0 | 2CE9 | FF00 | 1076 | 76FF |
| 0000354220 | FFDE | F876 | 76FF | 9AF6 | D794 | D928 | C483 | 8908 |
| 0000354240 | FA46 | 7E83 | 00FA | 0375 | 06E9 | 8B00 | FA46 | 06E9 |
| 0000354260 | B800 | 0000 | 00E9 | 5E00 | 835F | 02ED | E58B | 5D1F |
| 0000354300 | CB4D | 581E | 4590 | 8B55 | 1EEC | D88E | EC81 | 000A |
| 0000354320 | 5657 | 468D | 16FA | FF50 | 0876 | 76FF | 9A06 | D3E5 |
| 0000354340 | DA88 | C483 | 8908 | F846 | 7E83 | 00F8 | 0375 | 19E9 |
| 0000354360 | 8100 | F87E | 01AB | 0374 | 09E9 | B800 | 0000 | B4E9 |
| 0000354400 | E900 | 0006 | 468B | E9F8 | 00AB | 46C7 | 00F6 | E900 |
| 0000354420 | 0003 | 46FF | C4F6 | 301E | 8B11 | F646 | 3926 | CA87 |
| 0000354440 | 7702 | E903 | 0049 | 768B | C1F6 | 03E6 | 1EC4 | 1130 |
| 0000354460 | 8B26 | D080 | 2602 | 800B | 02CE | 0375 | 2DE9 | 8B00 |
| 0000354500 | F676 | E6C1 | C403 | 301E | 2611 | 808B | 02D0 | FC25 |
| 0000354520 | C100 | 02E8 | D22B | 463B | 7406 | E903 | 000E | 563B |
| 0000354540 | 7408 | E903 | 0006 | A7B8 | E901 | 0049 | A3E9 | FFF[illegible] |
| 0000354560 | FC76 | 76FF | 9AFA | 7D9D | D8B8 | C483 | 8904 | F846 |
| 0000354600 | 7E83 | 00F8 | 0375 | 06E9 | 8B00 | F846 | 26E9 | FF00 |
| 0000354620 | 0876 | 76FF | 9A06 | D661 | D98A | C483 | 8904 | F846 |
| 0000354640 | 7E83 | 00F8 | 0375 | 06E9 | 8B00 | F846 | 06E9 | B800 |
| 0000354660 | 0000 | 00E9 | 5E0D | 835F | 02ED | E58B | 5D1F | CB4D |
| 0000354700 | 581E | 4590 | 8B55 | 1EEC | D88E | EC81 | 0008 | 5657 |
| 0000354720 | 46C7 | 00FA | A100 | 1132 | 060B | 1130 | 0375 | 0DE9 |
| 0000354740 | C400 | 301E | 2611 | 3F83 | 7400 | E903 | 0006 | 95B8 |
| 0000354760 | E901 | 0074 | 46C7 | 00F8 | E900 | 0003 | 46FF | C4F8 |
| 0000355000 | 301E | 8B11 | F846 | 3926 | 4C47 | 0377 | 53E9 | C400 |
| 0000355020 | 301E | 2611 | 5FC4 | 6950 | F876 | 0260 | 8B26 | 0240 |
| 0000355040 | 0B26 | 7500 | E903 | 0037 | 1EC4 | 1130 | C426 | 505F |
| 0000355060 | 7669 | 60F8 | 2602 | 70FF | 2602 | 30FF | B29A | D0D9 |
| 0000355100 | 83D9 | 04C4 | 4689 | 83FC | FC7E | 7500 | E903 | 000F |
| 0000355120 | 7E83 | 00FA | 0374 | 06E9 | 8B00 | FC46 | 4689 | E9FA |
| 0000355140 | FF9A | 468B | E9FA | 0000 | 5F5E | ED83 | 8B02 | 1FE5 |
| 0000355160 | 4D5D | 1ECB | 9058 | 5545 | EC8B | 8E1E | 81D8 | 04EC |
| 0000355200 | 5700 | A156 | 1132 | 060B | 1130 | 0375 | 0DE9 | C400 |
| 0000355220 | 301E | 2611 | 3F83 | 7400 | E903 | 0006 | 95B8 | E901 |
| 0000355240 | 004F | 5EC4 | 2606 | 078A | 5098 | F29A | 6829 | 83DA |
| 0000355260 | 02C4 | 4688 | 80FC | FC7E | 7D41 | E903 | 0009 | 7E80 |
| 0000355300 | 5AFC | 037F | 12E9 | C400 | 0A5E | C02B | 8926 | 0247 |
| 0000355320 | 8926 | B807 | 0196 | 18E9 | 8A00 | FC46 | 2D98 | 0040 |
| 0000355340 | C499 | 0A5E | 8926 | 2607 | 5789 | B802 | 0000 | 00E9 |
| 0000355360 | 5E00 | 835F | 02ED | E58B | 5D1F | CB4D | 581E | 4590 |
| 0000355400 | 8B55 | 1EEC | D88E | EC81 | 0000 | 5657 | 468A | 0406 |
| 0000355420 | C440 | 0A5E | 8826 | C407 | 0A5E | C626 | 0147 | C43A |
| 0000355440 | 0A5E | C626 | 0247 | B800 | 0000 | 00E9 | 5E00 | 835F |
| 0000355460 | 02ED | E58B | 5D1F | CB4D | 581E | 4590 | 8B55 | 1EEC |
| 0000355500 | D88E | EC81 | 0000 | 5657 | 468B | 8B06 | 0856 | 1EC4 |
| 0000355520 | 1130 | 8926 | 4847 | 8926 | 4A57 | 00B8 | E900 | 0000 |
| 0000355540 | 5F5E | ED83 | 8B02 | 1FE5 | 4D5D | 1ECB | 9058 | 5545 |
| 0000355560 | EC8B | 8E1E | 81D8 | 12EC | 5701 | 2B56 | 89C0 | F046 |
| 0000355600 | 4689 | 2BEE | 89C0 | F446 | 4689 | 2BF2 | 89C0 | F846 |
| 0000355620 | 4689 | 6AF6 | 6A00 | 8D00 | EE46 | 5016 | 006A | 8E8D |
| 0000355640 | FEEE | 5116 | 4E8D | 16FA | 9A51 | 3EC3 | DCBE | 4689 |

THU MAR 14 17:31:54 1991 DB_PI.DLL PAGE 130, LINE 7612

| | | | | | | | | |
|---|---|---|---|---|---|---|---|---|
| 0000355660 | 83FC | FC7E | 7400 | E903 | 0181 | 76FF | FFF0 | EE76 |
| 0000355700 | 046A | 681E | 1170 | 468D | 16F2 | 9A50 | 56EC | DD1C |
| 0000355720 | 4689 | 83FC | FC7E | 7400 | E903 | 0035 | 468D | 16F6 |
| 0000355740 | FF50 | F476 | 76FF | 9AF2 | DB63 | DB2F | C483 | 8908 |
| 0000355760 | FC46 | 7E83 | 00FC | 0375 | 08E9 | 2B00 | 89C0 | F846 |
| 0000356000 | 4689 | FFF6 | F476 | 76FF | 9AF2 | 2448 | DE39 | C483 |
| 0000356020 | FF04 | F076 | 76FF | 6AEE | 1E04 | 8068 | A111 | 1130 |
| 0000356040 | 168B | 1132 | 0605 | 5201 | 9A50 | 56EC | DD55 | 4689 |
| 0000356060 | 83FC | FC7E | 7500 | E903 | 0010 | 1EC4 | 1130 | C726 |
| 0000356100 | 0687 | 4001 | 2611 | 9F8C | 0108 | 76FF | FFF0 | EE76 |
| 0000356120 | 046A | 681E | 1195 | 30A1 | 8B11 | 3216 | 0511 | 01B4 |
| 0000356140 | 5052 | EC9A | 9256 | 89DD | FC46 | 7E83 | 00FC | 0375 |
| 0000356160 | 10E9 | C400 | 301E | 2611 | 87C7 | 01B4 | 1144 | 8C26 |
| 0000356200 | B69F | C701 | 3406 | 0011 | C700 | 3606 | 0011 | FF00 |
| 0000356220 | F076 | 76FF | 6AEE | 1E03 | AB68 | 1E11 | 3868 | 9A11 |
| 0000356240 | 4C91 | DDB9 | 4689 | 83FC | FC7E | 7500 | E903 | 0006 |
| 0000356260 | 06C7 | 1138 | 0000 | 76FF | FFF0 | EE76 | 036A | 681E |
| 0000356300 | 11BD | 681E | 113A | 919A | E04C | 89DD | FC46 | 7E83 |
| 0000356320 | 00FC | 0375 | 06E9 | C700 | 3A06 | 0011 | FF00 | F076 |
| 0000356340 | 76FF | 6AEE | 1E03 | CC68 | 1E11 | 3C68 | 9A11 | 4C91 |
| 0000356360 | DE07 | 4689 | 83FC | FC7E | 7500 | E903 | 0006 | 06C7 |
| 0000356400 | 113C | 0000 | 76FF | FFF0 | EE76 | 036A | 681E | 11DB |
| 0000356420 | 681E | 113E | 919A | 264C | 89DE | FC46 | 7E83 | 00FC |
| 0000356440 | 0375 | 06E9 | C700 | 3E06 | 0011 | FF00 | F076 | 76FF |
| 0000356460 | 6AEE | 9A00 | 4965 | B973 | 4689 | 8BFC | F846 | 460B |
| 0000356500 | 74F6 | E903 | 000C | BE9A | 9D41 | 99DB | 4689 | 89F6 |
| 0000356520 | F856 | 468B | 8BF6 | F856 | 1EC4 | 1130 | 8926 | 4847 |
| 0000356540 | 8926 | 4A57 | 00B8 | E900 | 0000 | 5F5E | ED83 | 8B02 |
| 0000356560 | 1FE5 | 4D5D | 1ECB | 9058 | 5545 | EC8B | 8E1E | 81D8 |
| 0000356600 | 04EC | 5700 | FF56 | 0C76 | 76FF | 9A0A | 27B0 | DEA7 |
| 0000356620 | C483 | 3D04 | 0002 | 0373 | 24E9 | C400 | 0A5E | 8026 |
| 0000356640 | 017F | 743A | E903 | 0017 | 76FF | FF0C | 0A76 | 76FF |
| 0000356660 | FF10 | 0E76 | 509A | E827 | 83DE | 08C4 | 3EE9 | FF00 |
| 0000356700 | 1076 | 76FF | C40E | 065E | FF26 | 0277 | FF26 | 9A37 |
| 0000356720 | DBEC | DCDA | C483 | 8908 | FC46 | 7E83 | 00FC | 0375 |
| 0000356740 | 06E9 | 8B00 | FC46 | 2DE9 | FF00 | 0C76 | 76FF | FF0A |
| 0000356760 | 1076 | 76FF | 9A0E | 270A | DCFC | C483 | C408 | 0E5E |
| 0000357000 | 8026 | 027F | 755C | E903 | 0006 | B1B8 | E901 | 0006 |
| 0000357020 | 00B8 | E900 | 0000 | 5F5E | ED83 | 8B02 | 1FE5 | 4D5D |
| 0000357040 | 1ECB | 9058 | 5545 | EC8B | 8E1E | 81D8 | 00EC | 5700 |
| 0000357060 | 6856 | 00FE | 056A | 769A | 7E33 | 83DE | 04C4 | 1EC4 |
| 0000357100 | 1130 | 8926 | 5847 | 8926 | 5A57 | 1EC4 | 1130 | 8B26 |
| 0000357120 | 5A47 | 0B26 | 5847 | 0374 | 06E9 | B800 | 0007 | 1AE9 |
| 0000357140 | C400 | 301E | 2611 | 47C7 | 0456 | C400 | 301E | 2611 |
| 0000357160 | 47C7 | 0054 | B800 | 0000 | 00E9 | 5E00 | 835F | 02ED |
| 0000357200 | E58B | 5D1F | CB4D | 581E | 4590 | 8B55 | 1EEC | D88E |
| 0000357220 | EC81 | 0008 | 5657 | 468B | 0B10 | 0E46 | 0374 | 06E9 |
| 0000357240 | B800 | 0017 | 8BE9 | C401 | 0E5E | C02B | 8926 | 0247 |
| 0000357260 | 8926 | A107 | 1132 | 060B | 1130 | 0375 | 0DE9 | C400 |
| 0000357300 | 301E | 2611 | 3F83 | 7400 | E903 | 0006 | 95B8 | E901 |
| 0000357320 | 0160 | 1EC4 | 1130 | 8B26 | 5647 | 1EC4 | 1130 | 3926 |
| 0000357340 | 5447 | 0374 | B0E9 | C400 | 301E | 2611 | 478B | 0556 |
| 0000357360 | 0005 | C069 | 00FE | C450 | 301E | 2611 | 77FF | 265A |
| 0000357400 | 77FF | 9A58 | 32A4 | E01B | C483 | 8906 | FA46 | 5689 |
| 0000357420 | 8BFC | FC46 | 460B | 74FA | E903 | 003B | 1EC4 | 1130 |
| 0000357440 | FF26 | 5A77 | FF26 | 5877 | FC9A | 3026 | 83E0 | 04C4 |
| 0000357460 | C450 | 301E | 2611 | 77FF | 265A | 77FF | 9A58 | 32A4 |
| 0000357500 | E082 | C483 | C406 | 301E | 2611 | 4789 | 2658 | 5789 |
| 0000357520 | B85A | 0007 | DBE9 | 8B00 | FA46 | 568B | C4FC | 301E |

THU MAR 14 17:31:54 1991 DB_PI.DLL PAGE 131, LINE 7671

| | | | | | | | | |
|---|---|---|---|---|---|---|---|---|
| 0000357540 | 2611 | 4789 | 2658 | 5789 | C45A | 301E | 2611 | 4783 |
| 0000357560 | 0556 | F668 | 6A04 | C400 | 301E | 2611 | 4769 | FE54 |
| 0000357600 | C400 | 301E | 2611 | 4703 | 2658 | 578B | 525A | 9A50 |
| 0000357620 | 3E8E | DF29 | C483 | C708 | F846 | 0000 | 03E9 | FF00 |
| 0000357640 | F846 | 1EC4 | 1130 | 468B | 26F8 | 4739 | 7756 | E903 |
| 0000357660 | 007A | 1EC4 | 1130 | C426 | 585F | 7669 | FEF8 | 2600 |
| 0000357700 | 3883 | 7400 | E903 | 0061 | 468B | C4F8 | 0A5E | 8926 |
| 0000357720 | C407 | 301E | 2611 | 478B | 2658 | 578B | 695A | F84E |
| 0000357740 | 00FE | C103 | 5EC4 | 260E | 0789 | 8926 | 0257 | 1EC4 |
| 0000357760 | 1130 | C426 | 585F | 7669 | FEF8 | 2600 | 00C7 | 0001 |
| 0000360000 | 468B | 8B06 | 0856 | 5E69 | FEF8 | C400 | 3036 | 2611 |
| 0000360020 | 74C4 | 2658 | 4089 | 2604 | 5089 | C406 | 301E | 2611 |
| 0000360040 | 47FF | B854 | 0000 | 09E9 | E900 | FF73 | F4B8 | E901 |
| 0000360060 | 0000 | 5F5E | ED83 | 8B02 | 1FE5 | 4D5D | 1ECB | 9058 |
| 0000360100 | 5545 | EC8B | 8E1E | 81D8 | 00EC | 5700 | 8B56 | 0E46 |
| 0000360120 | 460B | 740C | E903 | 0006 | 17B8 | E900 | 00C1 | 5EC4 |
| 0000360140 | 2B0C | 26C0 | 4789 | 2602 | 0789 | 32A1 | 0B11 | 3006 |
| 0000360160 | 7511 | E903 | 000D | 1EC4 | 1130 | 8326 | 003F | 0374 |
| 0000360200 | 06E9 | B800 | 0195 | 96E9 | C400 | 301E | 8B11 | 0A46 |
| 0000360220 | 3926 | 5647 | 0377 | 16E9 | C400 | 301E | 2611 | 5FC4 |
| 0000360240 | 6958 | 0A76 | 00FE | 8326 | 0038 | 0374 | 06E9 | B800 |
| 0000360260 | 01AB | 6AE9 | 8B00 | 0646 | 568B | 6908 | 0A5E | 00FE |
| 0000360300 | 36C4 | 1130 | C426 | 5874 | 3926 | 0440 | 0374 | 09E9 |
| 0000360320 | 2600 | 5039 | 7506 | E903 | 0006 | ACB8 | E901 | 003F |
| 0000360340 | 1EC4 | 1130 | C426 | 585F | 7669 | FE0A | 2600 | 3883 |
| 0000360360 | 7400 | E903 | 0006 | ABB8 | E901 | 0023 | 1EC4 | 1130 |
| 0000360400 | 8B26 | 5847 | 8B26 | 5A57 | 4E69 | FE0A | 0300 | C4C1 |
| 0000360420 | 0C5E | 8926 | 2607 | 5789 | B802 | 0000 | 00E9 | 5E00 |
| 0000360440 | 835F | 02ED | E58B | 5D1F | CB4D | 581E | 4590 | 8B55 |
| 0000360460 | 1EEC | D88E | EC81 | 0008 | 5657 | 468D | 16FA | FF50 |
| 0000360500 | 0A76 | 76FF | FF08 | 0676 | 2D9A | C2E1 | 83DE | 0AC4 |
| 0000360520 | 4689 | 83F8 | F87E | 7500 | E903 | 0006 | 468B | E9F8 |
| 0000360540 | 0029 | FE68 | 6A00 | FF00 | FC76 | 76FF | 9AFA | 3E8E |
| 0000360560 | DFF6 | C483 | C408 | FA5E | C726 | 0007 | C400 | 301E |
| 0000360600 | 2611 | 4FFF | B854 | 0000 | 00E9 | 5E00 | 835F | 02ED |
| 0000360620 | E58B | 5D1F | CB4D | 581E | 4590 | 8B55 | 1EEC | D88E |
| 0000360640 | EC81 | 000A | 5657 | 46C7 | 00F6 | C700 | F846 | 0000 |
| 0000360660 | 03E9 | FF00 | F846 | 1EC4 | 1130 | 468B | 26F8 | 4739 |
| 0000360700 | 7356 | E903 | 006B | 1EC4 | 1130 | 8B26 | 5847 | 8B26 |
| 0000360720 | 5A57 | 4E69 | FEF8 | 0300 | 89C1 | FA46 | 5689 | C4FC |
| 0000360740 | FA5E | 8326 | 003F | 0375 | 43E9 | 8B00 | 0646 | 568B |
| 0000360760 | C408 | FA5E | 3926 | 0447 | 0374 | 31E9 | 2600 | 5739 |
| 0000361000 | 7406 | E903 | 0028 | 76FF | FF08 | 0676 | 76FF | 8BF8 |
| 0000361020 | FA46 | 568B | D5FC | 00F6 | 5052 | 7B9A | 3B3A | 89E2 |
| 0000361040 | F646 | 7E83 | D0F6 | 0375 | 03E9 | E900 | 0003 | 82E9 |
| 0000361060 | 8BFF | F646 | 00E9 | 5E00 | 835F | 02ED | E58B | 5D1F |
| 0000361100 | CB4D | 581E | 4590 | 8B55 | 1EEC | D88E | EC81 | 0000 |
| 0000361120 | 5657 | 30A1 | 8B11 | 3216 | 0511 | 01CA | 5052 | 76FF |
| 0000361140 | FF08 | 0676 | 509A | 6027 | 83E2 | 08C4 | 00E9 | 5E00 |
| 0000361160 | 835F | 02ED | E58B | 5D1F | CB4D | 581E | 4590 | 8B55 |
| 0000361200 | 1EEC | D88E | EC81 | 0000 | 5657 | 1EC4 | 1130 | C02B |
| 0000361220 | 8926 | C687 | 2601 | 8789 | 01C4 | 1EC4 | 1130 | C726 |
| 0000361240 | C887 | 0001 | B800 | 0000 | 00E9 | 5E00 | 835F | 02ED |
| 0000361260 | E58B | 5D1F | CB4D | 581E | 4590 | 8B55 | 1EEC | D88E |
| 0000361300 | EC81 | 0016 | 5657 | 46C7 | 00FA | C700 | EE46 | 0000 |
| 0000361320 | 46C7 | 00EA | B800 | 0000 | 4689 | 89F8 | EC46 | 46C7 |
| 0000361340 | 00FC | C400 | 301E | 2611 | 878B | 01C4 | 8B26 | C697 |
| 0000361360 | 8901 | F446 | 5689 | C7F6 | EE46 | 0000 | 03E9 | FF00 |
| 0000361400 | EE46 | 1EC4 | 1130 | 468B | 26EE | 8739 | 01C8 | 0377 |

THU MAR 14 17:31:54 1991 DB_PI.DLL PAGE 132, LINE 7730

| | | | | | | | | |
|---|---|---|---|---|---|---|---|---|
| 0000361420 | E1E9 | 8B00 | EE76 | C68B | E6C1 | 0302 | D1F0 | C4E6 |
| 0000361440 | F45E | 8B26 | 0840 | 0B26 | 0640 | 0374 | 17E9 | 8300 |
| 0000361460 | F87E | 7400 | E903 | 000B | 468B | 89EE | EA46 | 46C7 |
| 0000361500 | 01F8 | E900 | 00AB | 5E8B | 8BEE | C1C3 | 02E3 | D803 |
| 0000361520 | E3D1 | 76C4 | 8BF4 | 0646 | 568B | 2608 | 0039 | 0374 |
| 0000361540 | 8EE9 | 2600 | 5039 | 7402 | E903 | 0085 | 7E83 | 000A |
| 0000361560 | 0375 | 63E9 | 8B00 | EE76 | C68B | E6C1 | 0302 | D1F0 |
| 0000361600 | C4E6 | F45E | FF26 | 0870 | FF26 | 0670 | C09A | 1344 |
| 0000361620 | 83CC | 04C4 | 4689 | 83FA | FA7E | 7500 | E903 | 0006 |
| 0000361640 | 468B | E9FA | 0232 | 7E83 | 00F8 | 0374 | 0BE9 | 8B00 |
| 0000361660 | EE46 | 4689 | C7EA | F846 | 0001 | 46C7 | 01EC | 8B00 |
| 0000361700 | EE76 | C68B | E6C1 | 0302 | D1F0 | C4E6 | F45E | 8B26 |
| 0000361720 | 0440 | 4689 | E9FC | 0019 | 768B | 8BEE | C1C6 | 02E6 |
| 0000361740 | F003 | E6D1 | 5EC4 | 26F4 | 40FF | B804 | 0000 | E7E9 |
| 0000361760 | E901 | FF0B | 7E83 | 00F8 | 0374 | 30E9 | C401 | 301E |
| 0000362000 | 2611 | 878B | 01C4 | 8B26 | C697 | 8901 | F046 | 5689 |
| 0000362020 | C4F2 | 301E | 2611 | 878B | 01C8 | 0505 | 8B00 | C1C8 |
| 0000362040 | 02E0 | C103 | E0D1 | C450 | 301E | 2611 | B7FF | 01C6 |
| 0000362060 | FF26 | C4B7 | 9A01 | 32A4 | E57E | C483 | C406 | 301E |
| 0000362100 | 2611 | 8789 | 01C4 | 8926 | C697 | C401 | 301E | 2611 |
| 0000362120 | 878B | 01C4 | 8B26 | C697 | 8901 | F446 | 5689 | 8BF6 |
| 0000362140 | F646 | 460B | 74F4 | E903 | 0051 | 1EC4 | 1130 | 8B26 |
| 0000362160 | C887 | 8B01 | C1C8 | 02E0 | C103 | E0D1 | C450 | 301E |
| 0000362200 | 2611 | B7FF | 01C6 | FF26 | C4B7 | 9A01 | 32A4 | E357 |
| 0000362220 | C483 | C406 | 301E | 2611 | 8789 | 01C4 | 8926 | C697 |
| 0000362240 | C401 | 301E | 2611 | 878B | 01C4 | 8B26 | C697 | 8901 |
| 0000362260 | F446 | 5689 | B8F6 | 0007 | 1DE9 | C701 | EE46 | 0000 |
| 0000362300 | 03E9 | FF00 | EE46 | 7E83 | 05EE | 0372 | 43E9 | C400 |
| 0000362320 | 301E | 2611 | B78B | 01C8 | 7603 | 8BEE | C1C6 | 02E6 |
| 0000362340 | F003 | E6D1 | 5EC4 | 26F4 | 40C7 | 0004 | C400 | 301E |
| 0000362360 | 2611 | B78B | 01C8 | 7603 | 8BEE | C1C6 | 02E6 | F003 |
| 0000362400 | E6D1 | 5EC4 | 2BF4 | 26C0 | 4089 | 2608 | 4089 | E906 |
| 0000362420 | FFB1 | 46C7 | 01F8 | C400 | 301E | 2611 | 878B | 01C8 |
| 0000362440 | 4689 | C4EA | 301E | 2611 | 8783 | 01C8 | 8305 | F87E |
| 0000362460 | 7500 | E903 | 009C | 76FF | FF0E | 0C76 | 056A | 646A |
| 0000362500 | 9C9A | 7F43 | 83E4 | 08C4 | 4689 | 83FA | FA7E | 7400 |
| 0000362520 | E903 | 0075 | 5EC4 | 260C | 078B | 8B26 | 0257 | 768B |
| 0000362540 | 8BEA | C1CE | 02E6 | F103 | E6D1 | 5EC4 | 26F4 | 4089 |
| 0000362560 | 2606 | 5089 | 8308 | EC7E | 7500 | E903 | 001A | 468B |
| 0000362600 | 40FC | 768B | 8BEA | C1CE | 02E6 | F103 | E6D1 | 5EC4 |
| 0000362620 | 26F4 | 4089 | E904 | 0015 | 768B | 8BEA | C1C6 | 02E6 |
| 0000362640 | F003 | E6D1 | 5EC4 | 26F4 | 40C7 | 0104 | 8B00 | EA5E |
| 0000362660 | C38B | E3C1 | 0302 | D1D8 | C4E3 | F476 | 468B | 8B06 |
| 0000362700 | 0856 | 8926 | 2600 | 5089 | 8B02 | FA46 | 09E9 | E900 |
| 0000362720 | 0006 | F4B8 | E901 | 0000 | 5F5E | ED83 | 8B02 | 1FE5 |
| 0000362740 | 4D5D | 1ECB | 9058 | 5545 | EC8B | 8E1E | 81D8 | 0AEC |
| 0000362760 | 5700 | C756 | FC46 | 0000 | 1EC4 | 1130 | 8B26 | C487 |
| 0000363000 | 2601 | 978B | 01C6 | 4689 | 89F8 | FA56 | 46C7 | 00F6 |
| 0000363020 | E900 | 0003 | 46FF | C4F6 | 301E | 8B11 | F646 | 3926 |
| 0000363040 | C887 | 7701 | E903 | 0103 | 5E8B | 8BF6 | C1C3 | 02E3 |
| 0000363060 | D803 | E3D1 | 76C4 | 8BF8 | 0646 | 568B | 2608 | 0039 |
| 0000363100 | 0374 | 09E9 | 2600 | 5039 | 7502 | E903 | 0003 | C3E9 |
| 0000363120 | 8BFF | F676 | C68B | E6C1 | 0302 | D1F0 | C4E6 | F85E |
| 0000363140 | 8B26 | 0840 | 0B26 | 0640 | 0374 | 06E9 | B800 | 0195 |
| 0000363160 | BEE9 | 8300 | 0A7E | 7500 | E903 | 0018 | 768B | 8BF6 |
| 0000363200 | C1C6 | 02E6 | F003 | E6D1 | 5EC4 | 26F8 | 40C7 | 0004 |
| 0000363220 | E900 | 0013 | 768B | 8BF6 | C1C6 | 02E6 | F003 | E6D1 |
| 0000363240 | 5EC4 | 26F8 | 48FF | 8B04 | F676 | C68B | E6C1 | 0302 |
| 0000363260 | D1F0 | C4E6 | F85E | 8326 | 0478 | 7700 | E903 | 0006 |

THU MAR 14 17:31:54 1991 DB_PI.DLL PAGE 133, LINE 7789

| | | | | | | | | |
|---|---|---|---|---|---|---|---|---|
| 0000363300 | 00B8 | E900 | 006B | 768B | 8BF6 | C1C6 | 02E6 | F003 |
| 0000363320 | E6D1 | 5EC4 | 26F8 | 70FF | 2608 | 70FF | 9A06 | 44C0 |
| 0000363340 | E633 | C483 | 8904 | FC46 | 7E83 | 00FC | 0375 | 06E9 |
| 0000363360 | 8B00 | FC46 | 3AE9 | 8B00 | F676 | C68B | E6C1 | 0302 |
| 0000363400 | D1F0 | C4E6 | F85E | C726 | 0440 | 0000 | 768B | 8BF6 |
| 0000363420 | C1C6 | 02E6 | F003 | E6D1 | 5EC4 | 2BF8 | 26C0 | 4089 |
| 0000363440 | 2608 | 4089 | E906 | 0003 | E9E9 | B8FE | 0000 | 00E9 |
| 0000363460 | 5E00 | 835F | 02ED | E58B | 5D1F | CB4D | 581E | 4590 |
| 0000363500 | 8B55 | 1EEC | D88E | EC81 | 000A | 5657 | 46C7 | 00FC |
| 0000363520 | C400 | 301E | 2611 | 878B | 01C4 | 8B26 | C697 | 8901 |
| 0000363540 | F846 | 5689 | C7FA | F646 | 0000 | 03E9 | FF00 | F646 |
| 0000363560 | 1EC4 | 1130 | 468B | 26F6 | 8739 | 01C8 | 0377 | 78E9 |
| 0000363600 | 8B00 | F65E | C38B | E3C1 | 0302 | D1D8 | C4E3 | F876 |
| 0000363620 | 468B | 8B06 | 0856 | 3926 | 7400 | E903 | 0009 | 3926 |
| 0000363640 | 0250 | 0375 | 03E9 | E900 | FFC3 | 768B | 8BF6 | C1C6 |
| 0000363660 | 02E6 | F003 | E6D1 | 5EC4 | 26F8 | 408B | 2608 | 400B |
| 0000363700 | 7406 | E903 | 0009 | 95B8 | E901 | 0033 | 27E9 | 8B00 |
| 0000363720 | F676 | C68B | E6C1 | 0302 | D1F0 | C4F.6 | F85E | 8B26 |
| 0000363740 | 0640 | 8B26 | 0850 | 5EC4 | 260A | 0789 | 8926 | 0257 |
| 0000363760 | 00B8 | E900 | 0009 | 74E9 | B8FF | 0195 | 00E9 | 5E00 |
| 0000364000 | 835F | 02ED | E58B | 5D1F | CB4D | 581E | 4590 | 8B55 |
| 0000364020 | 1EEC | D88E | EC81 | 0000 | 5657 | 32A1 | 0B11 | 3006 |
| 0000364040 | 7511 | E903 | 000D | 1EC4 | 1130 | 8326 | 003F | 0374 |
| 0000364060 | 06E9 | B800 | 0195 | 1AE9 | A100 | 1130 | 168B | 1132 |
| 0000364100 | 5C05 | C400 | 065E | 8926 | 2607 | 5789 | B802 | 0000 |
| 0000364120 | 00E9 | 5E00 | 835F | 02ED | E58B | 5D1F | CB4D | 581E |
| 0000364140 | 4590 | 8B55 | 1EEC | D88E | EC81 | 0000 | 5657 | 32A1 |
| 0000364160 | 0B11 | 3006 | 7511 | E903 | 000D | 1EC4 | 1130 | 8326 |
| 0000364200 | 003F | 0374 | 06E9 | B800 | 0195 | 1AE9 | A100 | 1130 |
| 0000364220 | 168B | 1132 | 0A05 | C401 | 065E | 8926 | 2607 | 5789 |
| 0000364240 | B802 | 0000 | 00E9 | 5E00 | 835F | 02ED | E58B | 5D1F |
| 0000364260 | CB4D | 581E | 4590 | 8B55 | 1EEC | D8BE | EC81 | 0000 |
| 0000364300 | 5657 | 32A1 | 0B11 | 3006 | 7511 | E903 | 000D | 1EC4 |
| 0000364320 | 1130 | 8326 | 003F | 0374 | 06E9 | B800 | 0195 | 2DE9 |
| 0000364340 | C400 | 301E | 2611 | 878B | 01BE | 5EC4 | 2606 | 0789 |
| 0000364360 | 1EC4 | 1130 | 8B26 | C087 | 2601 | 978B | 01C2 | 5EC4 |
| 0000364400 | 260A | 0789 | 8926 | 0257 | 00B8 | E900 | 0000 | 5F5E |
| 0000364420 | ED83 | 8B02 | 1FE5 | 4D5D | 1ECB | 9058 | 5545 | EC8B |
| 0000364440 | 8E1E | 81D8 | 00EC | 5700 | A156 | 1132 | 060B | 1130 |
| 0000364460 | 0375 | 0DE9 | C400 | 301E | 2611 | 3F83 | 7400 | E903 |
| 0000364500 | 0006 | 95B8 | E901 | 0066 | 1EC4 | 1130 | 8326 | B8BF |
| 0000364520 | 0001 | 0375 | 2FE9 | C400 | 301E | 2611 | 878B | 01BC |
| 0000364540 | 0B26 | BA87 | 7501 | E903 | 001C | 1EC4 | 1130 | FF26 |
| 0000364560 | B8B7 | C401 | 301E | 2611 | B7FF | 01BC | FF26 | BAB7 |
| 0000364600 | 9A01 | 5B1C | DC9C | 468B | C406 | 301E | 2611 | 8789 |
| 0000364620 | 01B8 | 468B | 8B08 | 0A56 | 1EC4 | 1130 | 8926 | BA87 |
| 0000364640 | 2601 | 9789 | 01BC | A99A | 0DEA | E9E3 | 0000 | 5F5E |
| 0000364660 | ED83 | 8B02 | 1FE5 | 4D5D | 1ECB | 9058 | 5545 | EC8B |
| 0000364700 | 8E1E | 81D8 | 0CEC | 5700 | C756 | FC46 | 0000 | C02B |
| 0000364720 | 4689 | 89F6 | F446 | 1EC4 | 1130 | 8326 | BEBF | 0001 |
| 0000364740 | 0375 | 44E9 | C400 | 301E | 2611 | 878B | 01C2 | 0B26 |
| 0000364760 | C087 | 7501 | E903 | 0031 | 1EC4 | 1130 | FF26 | C2B7 |
| 0000365000 | 2601 | B7FF | 01C0 | 489A | 5124 | 83EB | 04C4 | 1EC4 |
| 0000365020 | 1130 | C726 | BE87 | 0001 | C400 | 301E | 2B11 | 26C0 |
| 0000365040 | 8789 | 01C2 | 8926 | C087 | C401 | 301E | 2611 | BF83 |
| 0000365060 | 01B8 | 7500 | E903 | 0013 | 1EC4 | 1130 | 8B26 | BC87 |
| 0000365100 | 2601 | 870B | 01BA | 0374 | 06E9 | B800 | 0000 | 08E9 |
| 0000365120 | C401 | 301E | 2611 | 878B | 01B8 | E0C1 | 5002 | 3E9A |
| 0000365140 | 2824 | 83E5 | 02C4 | 4689 | 89F4 | F656 | 468B | 0BF6 |

THU MAR 14 17:31:54 1991 DB_PI.DLL PAGE 134, LINE 7848

| | | | | | | | | |
|---|---|---|---|---|---|---|---|---|
| 0000365160 | F446 | 0374 | 06E9 | B800 | 0007 | DCE9 | C700 | F846 |
| 0000365200 | 0000 | 03E9 | FF00 | F846 | 1EC4 | 1130 | 468B | 26F8 |
| 0000365220 | 8739 | 01B8 | 0377 | 3BE9 | C400 | 301E | 2611 | 9FC4 |
| 0000365240 | 01BA | 768B | C1F8 | 02E6 | FF26 | 0270 | FF26 | 8B30 |
| 0000365260 | FC46 | E0C1 | 0302 | F446 | 568B | 52F6 | 9A50 | 3560 |
| 0000365300 | 74E2 | 4689 | 83FA | FA7E | 7400 | E903 | 0003 | 46FF |
| 0000365320 | E9FC | FFB1 | 1EC4 | 1130 | 468B | 26FC | 8739 | 01B8 |
| 0000365340 | 0377 | 4EE9 | 8300 | FC7E | 7400 | E903 | 0019 | 76FF |
| 0000365360 | FFF6 | F476 | 489A | 0724 | 83EC | 04C4 | C02B | 4689 |
| 0000365400 | 89F6 | F446 | 2CE9 | 8B00 | FC46 | E0C1 | 5002 | 76FF |
| 0000365420 | FFF6 | F476 | A49A | F932 | 83EA | 06C4 | 4689 | 89F4 |
| 0000365440 | F656 | 468B | 0BF6 | F446 | 0374 | 06E9 | B800 | 0007 |
| 0000365460 | 26E9 | 8B00 | FC46 | 1EC4 | 1130 | 8926 | BE87 | 8B01 |
| 0000365500 | F446 | 568B | C4F6 | 301E | 2611 | 8789 | 01C0 | 8926 |
| 0000365520 | C297 | B801 | 0000 | 00E9 | 5E00 | 835F | 02ED | E58B |
| 0000365540 | 5D1F | CB4D | 581E | 4590 | 8B55 | 1EEC | D88E | EC81 |
| 0000365560 | 0004 | 5657 | 7E83 | 7806 | 037D | 11E9 | 8300 | 067E |
| 0000365600 | 7C7B | E903 | 0008 | 46C7 | 01FC | E900 | 0005 | 46C7 |
| 0000365620 | 00FC | 8300 | FC7E | 7500 | E903 | 000F | 5E8B | D106 |
| 0000365640 | 8BE3 | 4487 | E910 | 0042 | 3FE9 | 8100 | 067E | 008C |
| 0000365660 | 037D | 12E9 | 8100 | 067E | 008F | 037C | 08E9 | C700 |
| 0000365700 | FC46 | 0001 | 05E9 | C700 | FC46 | 0000 | 7E83 | 00FC |
| 0000365720 | 0375 | 0FE9 | 8B00 | 065E | E3D1 | 878B | 1022 | 09E9 |
| 0000365740 | E900 | 0006 | 00B8 | E900 | 0000 | 5F5E | ED83 | 8B02 |
| 0000365760 | 1FE5 | 4D5D | 15CB | 0200 | B000 | 01EB | 0000 | 0300 |
| 0000366000 | 4902 | 02BE | 7400 | 0200 | 9900 | 02EA | 0000 | 0200 |
| 0000366020 | 7400 | 03EA | 0000 | 0200 | E700 | 04EB | 0000 | 0300 |
| 0000366040 | FB02 | 02C7 | 8200 | 0300 | 9D01 | 01C4 | 8A00 | 0200 |
| 0000366060 | D000 | 05E7 | 0000 | 0500 | 7301 | 01CA | 8700 | 0300 |
| 0000366100 | 5201 | 01C6 | 2100 | 0200 | DE00 | 0BCB | 0000 | 0200 |
| 0000366120 | 4302 | 02BE | 2D00 | 0300 | C801 | 01CD | 2F00 | 0300 |
| 0000366140 | F101 | 01CD | 3000 | 0300 | BD01 | 01C1 | 3A00 | 0300 |
| 0000366160 | 4402 | 02C8 | 3700 | 0500 | E502 | 02C7 | 1100 | 0300 |
| 0000366200 | A202 | 02CB | 4600 | 0500 | 1102 | 02C8 | 1F00 | 0500 |
| 0000366220 | 4602 | 02BE | 2D00 | 0300 | 6702 | 02BF | 6500 | 0000 |
| 0000366240 | 581E | 4590 | 8B55 | 1EEC | D88E | EC81 | 00BC | 5657 |
| 0000366260 | 5EC4 | 260A | 7769 | AA48 | C400 | 065E | 8326 | 4CB8 |
| 0000366300 | 00B2 | 0374 | 1FE9 | C400 | 065E | FF26 | 2477 | 5EC4 |
| 0000366320 | 260A | 77FF | FF48 | 0876 | 76FF | 9A06 | 0A90 | 00D4 |
| 0000366340 | C483 | E908 | 0003 | 00B8 | 8900 | FA46 | 7E83 | 00FA |
| 0000366360 | 0375 | 06E9 | 8B00 | FA46 | 00E9 | C701 | 4486 | B4FF |
| 0000366400 | 8300 | 0E7E | 7400 | E903 | 0012 | 5EC4 | 260A | 478B |
| 0000366420 | C46C | 0A5E | 0326 | 6647 | 8601 | FF44 | 7E83 | 0110 |
| 0000366440 | 0375 | 14E9 | C700 | FC46 | 0000 | 5EC4 | 2B0A | 26C0 |
| 0000366460 | 4789 | 2602 | 0789 | 8AE9 | C700 | FC46 | 0001 | 5EC4 |
| 0000366500 | 260A | 478B | 2602 | 070B | 0374 | 76E9 | 8D00 | 4686 |
| 0000366520 | 16FF | 6A50 | 6A00 | 6A00 | C400 | 0A5E | FF26 | 4877 |
| 0000366540 | 468B | 8B0A | 0C56 | 0405 | 5200 | FF50 | 0876 | 76FF |
| 0000366560 | 9A06 | 0166 | FFFF | C483 | 8914 | FA46 | 7E81 | ABFA |
| 0000366600 | 7401 | E903 | 000F | 5EC4 | 2B0A | 26C0 | 4789 | 2602 |
| 0000366620 | 0789 | 2EE9 | 8300 | FA7E | 7500 | E903 | 0013 | 7E81 |
| 0000366640 | FAFA | 7501 | E903 | 0009 | 468B | E9FA | 004D | 12E9 |
| 0000366660 | 8B00 | 4686 | 8BFF | 4896 | C4FF | 0A5E | 8926 | 2607 |
| 0000366700 | 5789 | FF02 | FC76 | 76FF | FF0C | 0A76 | B6FF | FF44 |
| 0000366720 | 76FF | FF0C | 0A76 | 5EC4 | 260A | 4769 | AA48 | 0300 |
| 0000366740 | 0646 | 568B | 2D08 | 4E34 | 5052 | 499A | FFD0 | 83FF |
| 0000366760 | 10C4 | 4689 | 8BFA | FA46 | 00E9 | 5E00 | 835F | 02ED |
| 0000367000 | E58B | 5D1F | CB4D | 581E | 4590 | 8B55 | 1EEC | D88E |
| 0000367020 | EC81 | 0010 | 5657 | 468B | 0B12 | 1046 | 0375 | 13E9 |

THU MAR 14 17:31:54 1991 DB_PI.DLL PAGE 135, LINE 7907

| | | | | | | | | |
|---|---|---|---|---|---|---|---|---|
| 0000367040 | 8A00 | 1346 | E42A | 463B | 750E | E903 | 0006 | ADB8 |
| 0000367060 | E901 | 015F | 7E83 | 780E | 037D | 11E9 | 8300 | 0E7C |
| 0000367100 | 7C7B | E903 | 0008 | 46C7 | 01F0 | E900 | 0005 | 46C7 |
| 0000367120 | 00F0 | 8300 | F07E | 7400 | E903 | 0006 | ADB8 | E901 |
| 0000367140 | 0131 | 7669 | AA0E | C400 | 065E | 8326 | 4CB8 | 00B2 |
| 0000367160 | 0374 | 1BE9 | C400 | 065E | FF26 | 2477 | 76FF | FF0E |
| 0000367200 | 0876 | 76FF | 9A06 | 0A90 | 003E | C483 | E908 | 0003 |
| 0000367220 | 00B8 | 8900 | FC46 | 7E83 | 00FC | 0375 | 16E9 | 8100 |
| 0000367240 | FC7E | 019D | 0374 | 06E9 | B800 | 01AB | 03E9 | 8B00 |
| 0000367260 | FC46 | DEE9 | C400 | 165E | 8B26 | 6847 | 8B26 | 6A57 |
| 0000367300 | 4689 | 89F4 | F656 | 5EC4 | 2616 | 478B | 2670 | 578B |
| 0000367320 | 8972 | F846 | 5689 | 8BFA | 1446 | B405 | 8900 | F246 |
| 0000367340 | 468B | 0B12 | 1046 | 0374 | 33E9 | FF00 | 1876 | 76FF |
| 0000367360 | 8D16 | F246 | 5016 | 76FF | FF0C | 0A76 | 016A | 056A |
| 0000367400 | 4669 | AA0E | 0300 | 0646 | 568B | 2D08 | 4E34 | 5052 |
| 0000367420 | 1B9A | A1D8 | 8302 | 14C4 | 4689 | E9FC | 002B | 76FF |
| 0000367440 | FF18 | 1676 | 468D | 16F2 | 8D50 | 1046 | 5016 | 4669 |
| 0000367460 | AA0E | 0300 | 0646 | 568B | 2D08 | 4E34 | 5052 | BE9A |
| 0000367500 | 4DD6 | 8301 | 10C4 | 4689 | 81FC | FC7E | 01FA | 0374 |
| 0000367520 | 0FE9 | 8300 | 147E | 7400 | E903 | 0006 | 00B8 | E900 |
| 0000367540 | 0031 | 7E83 | 0014 | 0375 | 22E9 | 8B00 | F446 | 568B |
| 0000367560 | C4F6 | 165E | 8926 | 6847 | 8926 | 6A57 | 468B | 8BF8 |
| 0000367600 | FA56 | 5EC4 | 2616 | 4789 | 2670 | 5789 | 8B72 | FC46 |
| 0000367620 | 00E9 | 5E00 | 835F | 02ED | E58B | 5D1F | CB4D | 581E |
| 0000367640 | 4590 | 8B55 | 1EEC | D88E | EC81 | 0004 | 5657 | 5EC4 |
| 0000367660 | 260A | 7769 | AA48 | C400 | 065E | 8326 | 4CB8 | 00B2 |
| 0000367700 | 0374 | 1FE9 | C400 | 065E | FF26 | 2477 | 5EC4 | 260A |
| 0000367720 | 77FF | FF48 | 0876 | 76FF | 9A06 | 0A90 | 01E8 | C483 |
| 0000367740 | E908 | 0003 | 00B8 | 8900 | FC46 | 7E83 | 00FC | 0375 |
| 0000367760 | 06E9 | 8B00 | FC46 | 2BE9 | FF00 | 0C76 | 76FF | C40A |
| 0000370000 | 0A5E | 6926 | 4847 | 00AA | 4603 | 8B06 | 0856 | 342D |
| 0000370020 | 524E | 9A50 | D3E1 | 0273 | C483 | 8908 | FC46 | 468B |
| 0000370040 | E9FC | 0000 | 5F5E | ED83 | 8B02 | 1FE5 | 4D5D | 1ECB |
| 0000370060 | 9058 | 5545 | EC8B | 8E1E | 81D8 | 00EC | 5700 | C456 |
| 0000370100 | 1A5E | 8B26 | 0247 | 0B26 | 7407 | E903 | 000F | 00B8 |
| 0000370120 | C400 | 125E | 8926 | C407 | 165E | 8926 | C407 | 125E |
| 0000370140 | 8B26 | C407 | 165E | 3926 | 7307 | E903 | 0040 | 5EC4 |
| 0000370160 | 2612 | 0783 | C405 | 125E | 6B26 | 2807 | C450 | 1A5E |
| 0000370200 | FF26 | 0277 | FF26 | 9A37 | 32A4 | 042A | C483 | C406 |
| 0000370220 | 1A5E | 8926 | 2607 | 5789 | C402 | 1A5E | 8B26 | 0247 |
| 0000370240 | 0B26 | 7407 | E903 | 0006 | 07B8 | E900 | 0063 | 76FF |
| 0000370260 | FF08 | 0676 | 5EC4 | 2616 | 076B | C428 | 1A5E | 0326 |
| 0000370300 | 2607 | 578B | 5202 | 9A50 | 2750 | 0376 | C483 | 8B08 |
| 0000370320 | 0A46 | 568B | C40C | 165E | 6B26 | 2837 | 5EC4 | 261A |
| 0000370340 | 1FC4 | 8926 | 2040 | 8926 | 2250 | 466B | 8B0E | 1056 |
| 0000370360 | 5EC4 | 2616 | 376B | C428 | 1A5E | C426 | 261F | 4089 |
| 0000370400 | 2624 | 5089 | C426 | 165E | FF26 | B807 | 0000 | 00E9 |
| 0000370420 | 5E00 | 835F | 02ED | E58B | 5D1F | CB4D | 581E | 4590 |
| 0000370440 | 8B55 | 1EEC | D88E | EC81 | 0000 | 5657 | 468B | F708 |
| 0000370460 | 0666 | C450 | 0A5E | FF26 | 0277 | FF26 | 9A37 | 32A4 |
| 0000370500 | 03EA | C483 | C406 | 0A5E | 8926 | 2607 | 5789 | C402 |
| 0000370520 | 0A5E | 8B26 | 0247 | 0B26 | 7407 | E903 | 0006 | 07B8 |
| 0000370540 | E900 | 0006 | 00B8 | E900 | 0000 | 5F5E | ED83 | 8B02 |
| 0000370560 | 1FE5 | 4D5D | 1ECB | 9058 | 5545 | EC8B | 8E1E | 81D8 |
| 0000370600 | 00EC | 5700 | C456 | 065E | 8B26 | 2447 | 8B26 | 2657 |
| 0000370620 | 5EC4 | 260A | 4739 | 7424 | E903 | 0077 | 3926 | 2657 |
| 0000370640 | 0374 | 6EE9 | C400 | 065E | 8B26 | 2047 | 8B26 | 2257 |
| 0000370660 | 5EC4 | 260A | 4739 | 7420 | E903 | 0023 | 3926 | 2257 |
| 0000370700 | 0374 | 1AE9 | FF00 | 0C76 | 76FF | FF0A | 0876 | 76FF |

THU MAR 14 17:31:54 1991 DB_PI.DLL PAGE 136, LINE 7966

| | | | | | | | | |
|---|---|---|---|---|---|---|---|---|
| 0000370720 | 9A06 | 2786 | 04A0 | C483 | E908 | 006B | 34E9 | C400 |
| 0000370740 | 065E | 8B26 | 2047 | 8B26 | 2257 | 5EC4 | 260A | 5739 |
| 0000370760 | 7622 | E903 | 0017 | 0373 | 09E9 | 2600 | 4739 | 7220 |
| 0000371000 | E903 | 0009 | 01B8 | E900 | 003D | 06E9 | B800 | FFFF |
| 0000371020 | 34E9 | C400 | 065E | 8B26 | 2447 | 8B26 | 2657 | 5EC4 |
| 0000371040 | 260A | 5739 | 7E26 | E903 | 0017 | 037D | 09E9 | 2600 |
| 0000371060 | 4739 | 7224 | E903 | 0009 | 01B8 | E900 | 0009 | 06E9 |
| 0000371100 | B800 | FFFF | 00E9 | 5E00 | 835F | 02ED | E58B | 5D1F |
| 0000371120 | CB4D | 581E | 4590 | 8B55 | 1EEC | D88E | EC81 | 0004 |
| 0000371140 | 5657 | 76FF | FF0C | 0A76 | 76FF | FF08 | 0676 | 869A |
| 0000371160 | 3427 | 8305 | 08C4 | 4689 | 83FC | FC7E | 7500 | E903 |
| 0000371200 | 0009 | 468B | E9FC | 0037 | 34E9 | C400 | 065E | 8B26 |
| 0000371220 | 2047 | 8B26 | 2257 | 5EC4 | 260A | 5739 | 7622 | E903 |
| 0000371240 | 0017 | 0373 | 09E9 | 2600 | 4739 | 7220 | E903 | 0009 |
| 0000371260 | 01B8 | E900 | 0009 | 06E9 | B800 | FFFF | 00E9 | 5E00 |
| 0000371300 | 835F | 02ED | E58B | 5D1F | CB4D | 581E | 4590 | 8B55 |
| 0000371320 | 1EEC | D88E | EC81 | 0000 | 5657 | 5EC4 | 260C | 478B |
| 0000371340 | 2602 | 070B | 0374 | 2CE9 | 6A00 | FF24 | 0A76 | 769A |
| 0000371360 | A033 | 8306 | 04C4 | 5EC4 | 260C | 0789 | 8926 | 0257 |
| 0000371400 | 5EC4 | 260C | 478B | 2602 | 070B | 0374 | 06E9 | B800 |
| 0000371420 | 0007 | 62E9 | FF00 | 0A4E | 5EC4 | 2606 | 078B | 8B26 |
| 0000371440 | 0257 | 4E6B | 280A | C103 | 5052 | 466B | 240A | 5EC4 |
| 0000371460 | 260C | 0703 | 8B26 | 0257 | 0405 | 5200 | 9A50 | 2750 |
| 0000371500 | 05D1 | C483 | 6B08 | 0A5E | C428 | 0676 | C426 | 2634 |
| 0000371520 | 408B | 2620 | 508B | 6B22 | 0A5E | C424 | 0C76 | C426 |
| 0000371540 | 2634 | 0089 | 8926 | 0250 | 7E83 | 000A | 0376 | A4E9 |
| 0000371560 | B8FF | 0000 | 00E9 | 5E00 | 835F | 02ED | E58B | 5D1F |
| 0000371600 | CB4D | 581E | 4590 | 8B55 | 1EEC | D88E | EC81 | 00F0 |
| 0000371620 | 5657 | 7E83 | ,30A | 037D | 12E9 | 8300 | 0A7E | 7C7B |
| 0000371640 | E903 | 0009 | 86C7 | FF10 | 0001 | 06E9 | C700 | 1086 |
| 0000371660 | 00FF | 8300 | 10BE | 00FF | 0374 | 06E9 | B800 | 01AD |
| 0000371700 | B9E9 | 8302 | 0C7E | 7501 | E903 | 0018 | 7E83 | 030C |
| 0000371720 | 0375 | 0FE9 | 8300 | 0C7E | 7502 | E903 | 0006 | BDB8 |
| 0000371740 | E901 | 0298 | 7669 | AA0A | C400 | 065E | 8326 | 4CB8 |
| 0000371760 | 00B2 | 0374 | 1BE9 | C400 | 065E | FF26 | 2477 | 76FF |
| 0000372000 | FF0A | 0876 | 76FF | 9A06 | 0A90 | 07B5 | C483 | E908 |
| 0000372020 | 0003 | 00B8 | 8900 | F646 | 7E83 | 00F6 | 0375 | 16E9 |
| 0000372040 | 8100 | F67E | 019D | 0374 | 06E9 | B800 | 01BC | 03E9 |
| 0000372060 | 8B00 | F646 | 45E9 | 8B02 | 0C46 | 57E9 | C700 | EE46 |
| 0000372100 | 0000 | 468D | 89F2 | 1286 | 8CFF | 1496 | C7FF | EA46 |
| 0000372120 | FFFF | 46C7 | E6EC | E907 | 004F | 46C7 | 00EE | 8D00 |
| 0000372140 | F246 | 8689 | FF12 | 968C | FF14 | 3CE9 | C700 | EE46 |
| 0000372160 | 0001 | 868D | FF16 | 8689 | FF12 | 968C | FF14 | 46C7 |
| 0000372200 | FFEA | C7FF | EC46 | 08A3 | 1EE9 | B800 | 01BD | EBE9 |
| 0000372220 | E901 | 0015 | 7548 | E903 | FFD3 | 7548 | E903 | FFBA |
| 0000372240 | 7548 | E903 | FF97 | E2E9 | C7FF | F046 | 00B4 | 868D |
| 0000372260 | FF36 | 5016 | 468D | 16F0 | FF50 | 14B6 | FFFF | 12B6 |
| 0000372300 | FFFF | EE76 | 0C6A | 4669 | AA0A | 0300 | 0646 | 568B |
| 0000372320 | 2D08 | 4E34 | 5052 | 1B9A | E2D8 | 8308 | 14C4 | 4689 |
| 0000372340 | 83F6 | F67E | 7500 | E903 | 0010 | 7E81 | FAF6 | 7501 |
| 0000372360 | E903 | 0006 | 468B | E9F6 | 0182 | 46C7 | 00F6 | C400 |
| 0000372400 | 125E | C02B | 8926 | 0247 | 8926 | 2B07 | 89C0 | FC46 |
| 0000372420 | 4689 | 83FA | F67E | 7400 | E903 | 0080 | 468D | 16FA |
| 0000372440 | FF50 | 1076 | 76FF | 8D0E | F846 | 5016 | 76FF | FF88 |
| 0000372460 | 8676 | B6FF | FF38 | B6FF | FF36 | 868D | FF3A | 5016 |
| 0000372500 | 8F9A | 2903 | 8309 | 18C4 | 4689 | 83F6 | F67E | 7500 |
| 0000372520 | E903 | 0003 | BCE9 | 8DFF | 3686 | 16FF | 8D50 | F046 |
| 0000372540 | 5016 | B6FF | FF14 | B6FF | FF12 | 76FF | 6AEE | 6906 |
| 0000372560 | 0A46 | 00AA | 4603 | 8B06 | 0856 | 342D | 524E | 9A50 |

THU MAR 14 17:31:54 1991 DB_PI.DLL PAGE 137, LINE 8025

| | | | | | | | | |
|---|---|---|---|---|---|---|---|---|
| 0000372600 | D81B | 0985 | C483 | 8914 | F646 | 7E81 | FAF6 | 7401 |
| 0000372620 | E903 | 0005 | 46C7 | 00F6 | E900 | FF77 | 7E81 | BCF6 |
| 0000372640 | 7401 | E903 | 00A9 | 46C7 | 00F6 | C400 | 0E5E | 468B |
| 0000372660 | 26F8 | 0739 | 0372 | 27E9 | 8D00 | FA46 | 5016 | 286A |
| 0000372700 | 5EC4 | 260E | 37FF | 7C9A | 5D04 | 8309 | 08C4 | 4689 |
| 0000372720 | 83F6 | F67E | 7500 | E903 | 0006 | 468B | E9F6 | 009C |
| 0000372740 | 7E83 | 020C | 0374 | 25E9 | FF00 | 1476 | 76FF | C412 |
| 0000372760 | 0E5E | FF26 | 8D37 | FA46 | 5016 | 2A9A | 9E06 | 8309 |
| 0000373000 | 0AC4 | 4689 | 8BF6 | F646 | 71E9 | E900 | 003E | 76FF |
| 0000373020 | FFEC | EA76 | 286A | 5EC4 | 260E | 37FF | 76FF | FFFC |
| 0000373040 | FA76 | 3A9A | C13F | 8309 | 0CC4 | 76FF | FF14 | 1276 |
| 0000373060 | 5EC4 | 260E | 37FF | 468D | 16FA | 9A50 | 062A | 033C |
| 0000373100 | C483 | 890A | F646 | 468B | E9F6 | 0030 | 2DE9 | 8300 |
| 0000373120 | 0C7E | 7401 | E903 | 0016 | 76FF | FFFC | FA76 | 489A |
| 0000373140 | 5124 | 8306 | 04C4 | C02B | 4689 | 89FC | FA46 | 5EC4 |
| 0000373160 | 260E | 07C7 | 0000 | 468B | E9F6 | 0000 | 5F5E | ED83 |
| 0000373200 | 8B02 | 1FE5 | 4D5D | 1ECB | 9058 | 5545 | EC8B | 8E1E |
| 0000373220 | 81D8 | B8EC | 5700 | C456 | 065E | C726 | 8487 | 0100 |
| 0000373240 | 6A00 | 6A00 | 6A05 | 6A01 | 6A0B | 6A01 | 6A00 | 6A0E |
| 0000373260 | 6A01 | 680A | 0400 | 76FF | FF0C | 0A76 | 76FF | FF0E |
| 0000373300 | 0876 | 76FF | 9A06 | 1B6A | 0A4D | C483 | 891E | 4886 |
| 0000373320 | 83FF | 48BE | 00FF | 0375 | 07E9 | 8B00 | 4886 | E9FF |
| 0000373340 | 0043 | 106A | 76FF | FF12 | 1076 | CF9A | 6529 | 830A |
| 0000373360 | 06C4 | 003D | 7400 | E903 | 0025 | 016A | 76FF | FF12 |
| 0000373400 | 1076 | DE9A | FF2A | 83FF | 06C4 | 8689 | FF48 | BE83 |
| 0000373420 | FF48 | 7500 | E903 | 0007 | 868B | FF48 | 06E9 | B800 |
| 0000373440 | 0000 | 00E9 | 5E00 | 835F | 02ED | E58B | 5D1F | CB4D |
| 0000373460 | 581E | 4590 | 8B55 | 1EEC | D88E | EC81 | 0006 | 5657 |
| 0000373500 | 468B | E90C | 003C | 46C7 | FEFC | E9FF | 0056 | 76FF |
| 0000373520 | 9A0A | EC54 | FFFF | C483 | 3D02 | 0000 | 0375 | 08E9 |
| 0000373540 | C700 | FC46 | FFFF | 05E9 | C700 | FC46 | 0001 | 33E9 |
| 0000373560 | C700 | FC46 | FFFF | 2BE9 | B800 | 01A6 | 48E9 | E901 |
| 0000373600 | 0022 | C00B | 037D | F0E9 | 48FF | 037F | B7E9 | 48FF |
| 0000373620 | 037D | E4E9 | 48FF | 037F | B3E9 | 48FF | 0375 | D0E9 |
| 0000373640 | E9FF | FFD5 | 7669 | AA0A | C400 | 065E | 8326 | 4CB8 |
| 0000373660 | 00B2 | 0374 | DCE9 | FF00 | 0A76 | 016A | 76FF | 8BFC |
| 0000373700 | 0646 | 568B | 0508 | 0034 | 5052 | 4669 | AA0A | 0300 |
| 0000373720 | 0646 | 568B | 2D08 | 4E34 | 5052 | 639A | DF0D | 830B |
| 0000373740 | 0EC4 | 4689 | 81FA | FA7E | 019D | 0374 | 9BE9 | 8300 |
| 0000373760 | 0C7E | 7D02 | E903 | 0092 | 668A | 2A0A | 03C0 | 0646 |
| 0000374000 | 568B | 2D08 | 7486 | 5052 | 76FF | 8BDA | 0646 | 568B |
| 0000374020 | 0508 | 0034 | 5052 | 4669 | AA0A | 0300 | 0646 | 568B |
| 0000374040 | 2D08 | 4E34 | 5052 | E79A | 6A09 | 8307 | 0EC4 | 4689 |
| 0000374060 | 81FA | FA7E | 01B8 | 0374 | 05E9 | C700 | FA46 | 0000 |
| 0000374100 | 7E83 | 00FA | 0375 | 10E9 | 8100 | FA7E | 01B8 | 0375 |
| 0000374120 | 06E9 | 8B00 | FA46 | 6EE9 | FF00 | 0A76 | 016A | 76FF |
| 0000374140 | 8BFC | 0646 | 568B | 0508 | 0034 | 5052 | 4669 | AA0A |
| 0000374160 | 0300 | 0646 | 568B | 2D08 | 4E34 | 5052 | 639A | 190D |
| 0000374200 | 830C | 0EC4 | 4689 | E9FA | 0006 | 468B | E9FA | 0037 |
| 0000374220 | 2EE9 | FF00 | 0A76 | 016A | 76FF | 8BFC | 0646 | 568B |
| 0000374240 | 0508 | 0034 | 5052 | 4669 | AA0A | 0300 | 0646 | 568B |
| 0000374260 | 2D08 | 4E34 | 5052 | 639A | 280D | 830A | 0EC4 | 4689 |
| 0000374300 | 8BFA | FA46 | 00E9 | 5E00 | 835F | 02ED | E58B | 5D1F |
| 0000374320 | CB4D | 581E | 4590 | 8B55 | 1EEC | D88E | EC81 | 0004 |
| 0000374340 | 5657 | 76FF | FF0A | 0876 | 76FF | 9A06 | 1DCD | 0B89 |
| 0000374360 | C483 | 8906 | FC46 | 7E83 | 00FC | 0375 | 06E9 | 8B00 |
| 0000374400 | FC46 | 1BE9 | 6900 | 0A46 | 00AA | 4603 | 8B06 | 0856 |
| 0000374420 | 342D | 524E | 9A50 | 145E | 0B3D | C483 | E904 | 0000 |
| 0000374440 | 5F5E | ED83 | 8B02 | 1FE5 | 4D5D | 1ECB | 9058 | 5545 |

THU MAR 14 17:31:54 1991 DB_PI.DLL PAGE 138, LINE 8084

| | | | | | | | | |
|---|---|---|---|---|---|---|---|---|
| 0000374460 | EC8B | 8E1E | 81D8 | 06EC | 5701 | C756 | FA86 | 78FE |
| 0000374500 | E900 | 0004 | 86FF | FEFA | BE83 | FEFA | 7C7B | E903 |
| 0000374520 | 00A4 | B669 | FEFA | 00AA | 5EC4 | 2606 | B883 | B24C |
| 0000374540 | 7500 | E903 | 008D | 8669 | FEFA | 00AA | 4603 | 8B06 |
| 0000374560 | 0856 | 342D | 524E | 9A50 | 145E | 0D4B | C483 | 8904 |
| 0000374600 | FC46 | 7E83 | 00FC | 0375 | 10E9 | 8100 | FC7E | 019F |
| 0000374620 | 0375 | 06E9 | 8B00 | FC46 | 76E9 | 1E00 | EA68 | 8D11 |
| 0000374640 | FC86 | 16FE | 9A50 | 2750 | 0D1A | C483 | 1E08 | F268 |
| 0000374660 | 8D11 | FC86 | 16FE | 9A50 | 270A | 0D2C | C483 | 1E08 |
| 0000374700 | F468 | 8D11 | FC86 | 16FE | 9A50 | 270A | 0839 | C483 |
| 0000374720 | 8D08 | FC86 | 16FE | 8A50 | FAA6 | 2AFE | D3C0 | 0646 |
| 0000374740 | 568B | 2D08 | 7486 | 5052 | A99A | 782E | 830C | 08C4 |
| 0000374760 | 4689 | E9FC | FF4E | 5EC4 | 2606 | 77FF | 2602 | 37FF |
| 0000375000 | 869A | B4E2 | 830A | 04C4 | 4689 | 8BFC | FC46 | 00E9 |
| 0000375020 | 5E00 | 835F | 02ED | E58B | 5D1F | CB4D | 581E | 4590 |
| 0000375040 | 8B55 | 1EEC | D88E | EC81 | 0104 | 5657 | 46C7 | 00FC |
| 0000375060 | C400 | 0A5E | 8026 | 247F | 7500 | E903 | 0069 | 5EC4 |
| 0000375100 | 260A | 678A | 2A48 | 03C0 | 0646 | 568B | 2D08 | 7486 |
| 0000375120 | 5052 | 868D | FEFC | 5016 | 509A | CD27 | 830D | 08C4 |
| 0000375140 | 681E | 11F6 | 868D | FEFC | 5016 | 0A9A | E627 | 830D |
| 0000375160 | 08C4 | 468B | 8B0A | 0C56 | 2405 | 5200 | 8D50 | FC86 |
| 0000375200 | 16FE | 9A50 | 270A | 0DF4 | C483 | 8D08 | FC86 | 16FE |
| 0000375220 | 9A50 | 421C | 0D08 | C483 | 3D04 | 0000 | 0375 | 06E9 |
| 0000375240 | B800 | 000A | 17E9 | FF00 | 0C76 | 76FF | FF0A | 0876 |
| 0000375260 | 76FF | 9A06 | 02FE | 0C4E | C483 | E908 | 0000 | 5F5E |
| 0000375300 | ED83 | 8B02 | 1FE5 | 4D5D | 1ECB | 9058 | 5545 | EC8B |
| 0000375320 | 8E1E | 81D8 | C0EC | 5701 | C756 | FA46 | 0000 | 46C7 |
| 0000375340 | 00FC | C700 | F846 | 00B4 | 7669 | AA0A | C400 | 065E |
| 0000375360 | 8326 | 4CB8 | 00B2 | 0374 | 1BE9 | C400 | 065E | FF26 |
| 0000375400 | 2477 | 76FF | FF0A | 0876 | 76FF | 9A06 | 0A90 | 0F0B |
| 0000375420 | C483 | 8908 | FA46 | 7E83 | 00FA | 0375 | 06E9 | B800 |
| 0000375440 | 01BE | 44E9 | 8101 | FA7E | 01BC | 0375 | 9FE9 | 8100 |
| 0000375460 | FA7E | 01F4 | 037E | 95E9 | 8D00 | 4086 | 16FF | 8D50 |
| 0000375500 | F846 | 5016 | 468D | 16F4 | 6A50 | 6A00 | 690C | 0A46 |
| 0000375520 | 00AA | 4603 | 8B06 | 0856 | 342D | 524E | 9A50 | D81B |
| 0000375540 | 0F79 | C483 | 8914 | FA46 | 7E81 | FAFA | 7401 | E903 |
| 0000375560 | 0005 | 46C7 | 00FA | 8300 | FA7E | 7500 | E903 | 0012 |
| 0000375600 | 7E81 | BCFA | 7501 | E903 | 0008 | 46C7 | BEFC | E901 |
| 0000375620 | 0021 | 7E81 | BCFA | 7501 | E903 | 0017 | 868D | FF40 |
| 0000375640 | 5016 | 76FF | FF08 | 0676 | 7C9A | 160D | 830E | 08C4 |
| 0000375660 | 4689 | 83FA | FA7E | 7500 | E903 | 000F | 7E81 | F4FA |
| 0000375700 | 7D01 | E903 | 0005 | 46C7 | BEFC | E901 | FF57 | 468B |
| 0000375720 | 8B06 | 0856 | 3405 | 5200 | 6950 | 0A46 | 00AA | 4603 |
| 0000375740 | 8B06 | 0856 | 342D | 524E | 9A50 | 2838 | 0FBB | C483 |
| 0000375760 | 8908 | FA46 | 7E83 | 00FA | 0374 | 0FE9 | 6900 | 0A76 |
| 0000376000 | 00AA | 5EC4 | 2606 | 80C7 | B24C | 0000 | 681E | 11F8 |
| 0000376020 | 868D | FE4D | 5016 | 509A | 8B27 | 830F | 08C4 | 681E |
| 0000376040 | 1200 | 868D | FE4D | 5016 | 0A9A | 9D27 | 830F | 08C4 |
| 0000376060 | 681E | 1202 | 868D | FE40 | 5016 | 0A9A | BB27 | 830D |
| 0000376100 | 08C4 | 868D | FE40 | 5016 | 668A | 2A0A | D3C0 | 0646 |
| 0000376120 | 568B | 2D08 | 7486 | 5052 | A99A | DA2E | 830C | 08C4 |
| 0000376140 | 4689 | 8BFA | FA46 | 00E9 | 5E00 | 835F | 02ED | E58B |
| 0000376160 | 5D1F | CB4D | 581E | 4590 | 8B55 | 1EEC | D88E | EC81 |
| 0000376200 | 0008 | 5657 | 46C7 | 00FC | C700 | F846 | 0078 | 03E9 |
| 0000376220 | FF00 | F846 | 7E83 | 7BF8 | 037C | 26E9 | FF00 | F876 |
| 0000376240 | 76FF | FF0E | 0676 | 299A | 6E0E | 830E | 06C4 | 4689 |
| 0000376260 | 83FA | FA7E | 7500 | E903 | 0006 | 468B | 89FA | FC46 |
| 0000376300 | CEE9 | 8BFF | FC46 | 00E9 | 5E00 | 835F | 02ED | E58B |
| 0000376320 | 5D1F | CB4D | 581E | 4590 | 8B55 | 1EEC | D88E | EC81 |

THU MAR 14 17:31:54 1991 DB_PI.DLL PAGE 139, LINE 8143

| | | | | | | | | |
|---|---|---|---|---|---|---|---|---|
| 0000376340 | 00BA | 5657 | 7669 | AA0A | C400 | 065E | 8326 | 4CB8 |
| 0000376360 | 00B2 | 0374 | 1BE9 | C400 | 065E | FF26 | 2477 | 76FF |
| 0000376400 | FF0A | 0876 | 76FF | 9A06 | 0A90 | 1009 | C483 | E908 |
| 0000376420 | 0003 | 00B8 | 8900 | FC46 | 7E83 | 00FC | 0375 | 06E9 |
| 0000376440 | 8B00 | FC46 | 6DE9 | C700 | 4686 | B4FF | 8D00 | 4886 |
| 0000376460 | 16FF | 8D50 | 4686 | 16FF | FF50 | 0E76 | 76FF | 6A0C |
| 0000376500 | 6A00 | 690D | 0A46 | 00AA | 4603 | 8B06 | 0856 | 342D |
| 0000376520 | 524E | 9A50 | D81B | 0EC0 | C483 | 8914 | FC46 | 7E81 |
| 0000376540 | FAFC | 7401 | E903 | 0005 | 46C7 | 00FC | 8300 | FC7E |
| 0000376560 | 7500 | E903 | 0006 | 468B | E9FC | 0018 | 868B | FF48 |
| 0000376600 | 968B | FF4A | 5EC4 | 260C | 0789 | 8926 | 0257 | 00B8 |
| 0000376620 | E900 | 0000 | 5F5E | ED83 | 8B02 | 1FE5 | 4D5D | 1ECB |
| 0000376640 | 9058 | 5545 | EC8B | 8E1E | 81D8 | 00EC | 5700 | B856 |
| 0000376660 | 01C1 | 00E9 | 5E00 | 835F | 02ED | E58B | 5D1F | CB4D |
| 0000376700 | 581E | 4590 | 8B55 | 1EEC | D88E | EC81 | 0106 | 5657 |
| 0000376720 | 86C7 | FEFA | 0000 | 46C7 | 00FC | 6A00 | 6A00 | 9A00 |
| 0000376740 | 3908 | 11C9 | C483 | C404 | 165E | 8926 | 5047 | 8926 |
| 0000376760 | 5257 | 5EC4 | 2616 | 478B | 266C | 578B | C46E | 165E |
| 0000377000 | 0326 | 6647 | D283 | 8300 | 00FA | 037D | F5E9 | 7E00 |
| 0000377020 | E903 | 0008 | F43D | 7701 | E903 | 00E8 | 468B | 0B0C |
| 0000377040 | 0A46 | 0375 | 4AE9 | C400 | 0A5E | 8026 | 003F | 0375 |
| 0000377060 | 3EE9 | 8300 | 0E7E | 7401 | E903 | 0035 | 468B | 8B16 |
| 0000377100 | 1856 | 2405 | 3B00 | 0A46 | 0374 | 08E9 | 3B00 | 0C56 |
| 0000377120 | 0375 | 19E9 | FF00 | 0C76 | 76FF | 8B0A | 1646 | 568B |
| 0000377140 | 0518 | 0024 | 5052 | 509A | 2B27 | 8312 | 08C4 | 2EE9 |
| 0000377160 | 8B00 | 1646 | 568B | 0518 | 0024 | 5052 | 468B | 8B16 |
| 0000377200 | 1856 | 0405 | 5200 | C450 | 165E | FF26 | 4877 | 76FF |
| 0000377220 | FF08 | 0676 | 589A | FB1E | 8312 | 0EC4 | 4689 | 83FC |
| 0000377240 | FC7E | 7500 | E903 | 0006 | 468B | E9FC | 0194 | 5EC4 |
| 0000377260 | 2616 | 678A | 2A48 | 03C0 | 0646 | 568B | 2D08 | 7486 |
| 0000377300 | 5052 | 868D | FEFC | 5016 | 509A | 3D27 | 8312 | 08C4 |
| 0000377320 | 681E | 1204 | 868D | FEFC | 5016 | 0A9A | 5627 | 8312 |
| 0000377340 | 08C4 | 468B | 8B16 | 1856 | 2405 | 5200 | 8D50 | FC86 |
| 0000377360 | 16FE | 9A50 | 270A | 1296 | C483 | C708 | FA86 | 01FE |
| 0000377400 | E900 | 0081 | 7E83 | 010E | 0374 | 70E9 | C400 | 0A5E |
| 0000377420 | 8026 | 003F | 0375 | 64E9 | C400 | 165E | 8A26 | 4867 |
| 0000377440 | C02A | 4603 | 8B06 | 0856 | 862D | 5274 | 8D50 | FC86 |
| 0000377460 | 16FE | 9A50 | 2750 | 12A8 | C483 | 1E08 | 0668 | 8D12 |
| 0000377500 | FC86 | 16FE | 9A50 | 270A | 12BC | C483 | FF08 | 0C76 |
| 0000377520 | 76FF | 8D0A | FC86 | 16FE | 9A50 | 270A | 12CA | C483 |
| 0000377540 | 8D08 | FC86 | 16FE | 9A50 | 421C | 10B6 | C483 | 3D04 |
| 0000377560 | 0000 | 0375 | 06E9 | B800 | 000A | C5E9 | C400 | 165E |
| 0000377600 | C626 | 2447 | FF00 | 0E76 | B6FF | FEFA | 76FF | FF18 |
| 0000377620 | 1676 | 76FF | FF08 | 0676 | 009A | 5400 | 8313 | 0CC4 |
| 0000377640 | 4689 | 83FC | FC7E | 7500 | E903 | 0006 | 468B | E9FC |
| 0000377660 | 0090 | 5EC4 | 2616 | 078B | 8B26 | 0257 | 5EC4 | 261A |
| 0000377700 | 0789 | 8926 | 0257 | 5EC4 | 2616 | 7F80 | 0024 | 0375 |
| 0000377720 | 69E9 | 8300 | 107E | 7500 | E903 | 0023 | 76FF | 8D14 |
| 0000377740 | FC86 | 16FE | FF50 | 1876 | 76FF | FF16 | 0876 | 76FF |
| 0000377760 | 9A06 | 1D06 | 1371 | C483 | 890E | FC46 | 1AE9 | FF00 |
| 0000400000 | 1476 | 868D | FEFC | 5016 | 76FF | FF18 | 1676 | FC9A |
| 0000400020 | 9117 | 8313 | 0AC4 | 4689 | 83FC | FC7E | 7500 | E903 |
| 0000400040 | 001A | 76FF | FF18 | 1676 | 76FF | FF08 | 0676 | FE9A |
| 0000400060 | 6A02 | 831D | 08C4 | 468B | E9FC | 0006 | 00B8 | E900 |
| 0000400100 | 0000 | 5F5E | ED83 | 8B02 | 1FE5 | 4D5D | 1ECB | 9058 |
| 0000400120 | 5545 | EC8B | 8E1E | 81D8 | CAEC | 5701 | C756 | 3886 |
| 0000400140 | 00FE | 8300 | 0A7E | 7D78 | E903 | 0012 | 7E83 | 7B0A |
| 0000400160 | 037C | 09E9 | C700 | 3686 | 01FE | E900 | 0006 | 86C7 |
| 0000400200 | FE36 | 0000 | BE83 | FE36 | 7400 | E903 | 0006 | ADB8 |

THU MAR 14 17:31:54 1991 DB_PI.DLL PAGE 140, LINE 8202

| | | | | | | | | |
|---|---|---|---|---|---|---|---|---|
| 0000400220 | E901 | 0362 | 7669 | AA0A | C400 | 065E | 8326 | 4CB8 |
| 0000400240 | 00B2 | 0374 | 1BE9 | C400 | 065E | FF26 | 2477 | 76FF |
| 0000400260 | FF0A | 0876 | 76FF | 9A06 | 0A90 | 11F7 | C483 | E908 |
| 0000400300 | 0003 | 00B8 | 8900 | F846 | 7E83 | 00F8 | 0375 | 16E9 |
| 0000400320 | 8100 | F87E | 019D | 0374 | 06E9 | B800 | 01BC | 03E9 |
| 0000400340 | 8B00 | F846 | 0FE9 | C703 | F646 | 00B4 | 868D | FF3E |
| 0000400360 | 5016 | 468D | 16F6 | 8D50 | FA46 | 5016 | 006A | 0C6A |
| 0000400400 | 4669 | AA0A | 0300 | 0646 | 568B | 2D08 | 4E34 | 5052 |
| 0000400420 | 1B9A | 42D8 | 8311 | 14C4 | 4689 | 83F8 | F87E | 7500 |
| 0000400440 | E903 | 0020 | 7E81 | FAF8 | 7501 | E903 | 0016 | 7E81 |
| 0000400460 | BCF8 | 7401 | E903 | 0006 | 00B8 | E900 | 0003 | 468B |
| 0000400500 | E9F8 | 02B2 | 5EC4 | 2B12 | 26C0 | 4789 | 2602 | 0789 |
| 0000400520 | C02B | 8689 | FF3C | 8689 | FF3A | 46C7 | 00F8 | 8300 |
| 0000400540 | F87E | 7400 | E903 | 01C4 | BE80 | FF62 | 7500 | E903 |
| 0000400560 | 0164 | 668A | 2A86 | 03C0 | 0646 | 568B | 2D08 | 7486 |
| 0000400600 | 5052 | 868D | FE3A | 5016 | 509A | FD27 | 8314 | 08C4 |
| 0000400620 | 681E | 1208 | 868D | FE3A | 5016 | 0A9A | 1127 | 8315 |
| 0000400640 | 08C4 | 868D | FF62 | 5016 | 868D | FE3A | 5016 | 0A9A |
| 0000400660 | 6D27 | 8315 | 08C4 | 2F6A | 868D | FE3A | 5016 | CF9A |
| 0000400700 | 4C29 | 830F | 06C4 | 003D | 7400 | E903 | 0108 | 5EC4 |
| 0000400720 | 2612 | 478B | 2602 | 070B | 0374 | 0CE9 | B800 | 0000 |
| 0000400740 | 4689 | C4F2 | 0E5E | 8926 | C407 | 0E5E | 468B | 26F2 |
| 0000400760 | 0739 | 0373 | 6BE9 | 8300 | F246 | 6B05 | F246 | 5026 |
| 0000401000 | 5EC4 | 2612 | 77FF | 2602 | 37FF | A49A | A232 | 8315 |
| 0000401020 | 06C4 | 5EC4 | 2612 | 0789 | 8926 | 0257 | 5EC4 | 2612 |
| 0000401040 | 478B | 2602 | 070B | 0374 | 06E9 | B800 | 0007 | C5E9 |
| 0000401060 | 6901 | F246 | 00B4 | FF50 | 3CB6 | FFFF | 3AB6 | 9AFF |
| 0000401100 | 32A4 | 15DE | C483 | 8906 | 3A86 | 89FF | 3C96 | 8BFF |
| 0000401120 | 3C86 | 0BFF | 3A86 | 74FF | E903 | 0006 | 07B8 | E900 |
| 0000401140 | 0194 | 868D | FF42 | 5016 | 5EC4 | 260E | 076B | C426 |
| 0000401160 | 125E | 0326 | 2607 | 578B | 5202 | 9A50 | 2750 | 165D |
| 0000401200 | C483 | 8B08 | 3E86 | 8BFF | 4096 | C4FF | 0E5E | 6B26 |
| 0000401220 | 2637 | 5EC4 | 2612 | 1FC4 | 8926 | 2040 | 8926 | 2250 |
| 0000401240 | 5EC4 | 260E | 376B | C426 | 125E | C426 | 261F | 40C7 |
| 0000401260 | 0224 | C400 | 0E5E | 6926 | B41F | C400 | 3AB6 | 1EFF |
| 0000401300 | 388D | B68D | FF3E | D08C | D88E | 5AB9 | F300 | 1FA5 |
| 0000401320 | 5EC4 | 260E | 07FF | 868D | FF3E | 5016 | 468D | 16F6 |
| 0000401340 | 8D50 | FA46 | 5016 | 006A | 066A | 4669 | AA0A | 0300 |
| 0000401360 | 0646 | 568B | 2D08 | 4E34 | 5052 | 1B9A | 73D8 | 8314 |
| 0000401400 | 14C4 | 4689 | 81F8 | F87E | 01FA | 0374 | 05E9 | C700 |
| 0000401420 | F846 | 0000 | 86FF | FE38 | BE81 | FE38 | 0A8C | 037D |
| 0000401440 | 06E9 | B800 | 01F8 | CDE9 | E900 | FE33 | 7E81 | BCF8 |
| 0000401460 | 7401 | E903 | 00BA | 46C7 | 00F8 | 8300 | 0C7E | 7500 |
| 0000401500 | E903 | 006E | 46C7 | 00F4 | E900 | 0003 | 46FF | C4F4 |
| 0000401520 | 0E5E | 468B | 26F4 | 0739 | 0377 | 55E9 | 6900 | F446 |
| 0000401540 | 00B4 | 8603 | FF3A | 968B | FF3C | 5052 | 76FF | FF08 |
| 0000401560 | 0676 | FE9A | 3102 | 8317 | 08C4 | 4689 | 83F8 | F87E |
| 0000401600 | 7400 | E903 | 0013 | 5E6B | 26F4 | 76C4 | 2612 | 34C4 |
| 0000401620 | C726 | 2440 | 0065 | 16E9 | 6B00 | F45E | C426 | 1276 |
| 0000401640 | C426 | 2634 | 40C7 | 6624 | 8B00 | F846 | 47E9 | E900 |
| 0000401660 | FF9A | 5EC4 | 8B0E | F246 | 3926 | 7207 | E903 | 0019 |
| 0000401700 | 76FF | FF14 | 1276 | 266A | 5EC4 | 260E | 37FF | 7C9A |
| 0000401720 | 1A04 | 8314 | 08C4 | 4689 | FFF8 | 3CB6 | FFFF | 3AB6 |
| 0000401740 | 9AFF | 0975 | FFFF | C02B | 8689 | FF3C | 8689 | FF3A |
| 0000401760 | 468B | E9F8 | 0000 | 5F5E | ED83 | 8B02 | 1FE5 | 4D5D |
| 0000402000 | 00CB | 581E | 4590 | 8B55 | 1EEC | D88E | EC81 | 0000 |
| 0000402020 | 5657 | 5EC4 | 2606 | 478B | 266C | 578B | C46E | 065E |
| 0000402040 | 0326 | 6647 | D283 | 0500 | 00B4 | D283 | 8300 | 01FA |
| 0000402060 | 037E | 26E9 | 7D00 | E903 | 0008 | 003D | 7200 | E903 |

THU MAR 14 17:31:54 1991 DB_PI.DLL PAGE 141, LINE 8261

| | | | | | | | | |
|---|---|---|---|---|---|---|---|---|
| 0000402100 | 0019 | 76FF | FF08 | 0676 | 489A | C924 | 8317 | 04C4 |
| 0000402120 | C02B | 4689 | 8908 | 0646 | 36E9 | C400 | 065E | FF26 |
| 0000402140 | 7277 | FF26 | 7077 | CA9A | E433 | 8317 | 04C4 | 5EC4 |
| 0000402160 | 2B06 | 26C0 | 4789 | 2672 | 4789 | FF70 | 0876 | 76FF |
| 0000402200 | 9A06 | 2448 | 14EB | C483 | 2B04 | 89C0 | 0846 | 4689 |
| 0000402220 | 5E06 | 835F | 02ED | E58B | 5D1F | CB4D | 581E | 4590 |
| 0000402240 | 8B55 | 1EEC | D88E | EC81 | 0060 | 5657 | C02B | 4689 |
| 0000402260 | 89FC | FA46 | 46C7 | 00F8 | 8B00 | 0846 | 460B | 7506 |
| 0000402300 | E903 | 000B | 468B | 0B0C | 0A46 | 0374 | 06E9 | B800 |
| 0000402320 | 0017 | EFE9 | 1E01 | 1E68 | FF12 | 0C76 | 76FF | 9A0A |
| 0000402340 | 0656 | 187B | C483 | 8908 | FA46 | 5689 | 8BFC | FC46 |
| 0000402360 | 460B | 74FA | E903 | 0017 | 08B8 | 8900 | F846 | 003D |
| 0000402400 | 7400 | E903 | 0006 | 8EE9 | E901 | 0003 | 88E9 | 6A01 |
| 0000402420 | 6A58 | 8D00 | A046 | 5016 | 8E9A | 8C3E | 8318 | 08C4 |
| 0000402440 | 046A | 026A | 468D | 16A0 | 9A50 | 3E8E | 18B8 | C483 |
| 0000402460 | C708 | A446 | 0064 | 46C7 | 64A6 | C400 | 065E | 8A26 |
| 0000402500 | 0347 | E42A | 4689 | C7A8 | AC46 | 0064 | 46C7 | 00AE |
| 0000402520 | 6A00 | 6A00 | 9A00 | 3908 | 18F6 | C483 | 8904 | B046 |
| 0000402540 | 5689 | C4B2 | 065E | 8B26 | 6C47 | 8B26 | 6E57 | 5EC4 |
| 0000402560 | 2606 | 4703 | 8366 | 00D2 | 0C05 | 8301 | 00D2 | 4689 |
| 0000402600 | 89B4 | B656 | 76FF | FFFC | FA76 | 016A | 586A | 468D |
| 0000402620 | 16A0 | 9A50 | 08B6 | 1934 | C483 | 480C | 0375 | 17E9 |
| 0000402640 | B800 | 000B | 4689 | 3DF8 | 0000 | 0374 | 06E9 | E900 |
| 0000402660 | 00E5 | 03E9 | E900 | 00DF | 76FF | FFFC | FA76 | 016A |
| 0000402700 | 5EC4 | 2606 | 478B | 0566 | 00B4 | FF50 | 0876 | 76FF |
| 0000402720 | 9A06 | 08B6 | 19C7 | C483 | 480C | 0375 | 17E9 | B800 |
| 0000402740 | 000B | 4689 | 3DF8 | 0000 | 0374 | 06E9 | E900 | 00A7 |
| 0000402760 | 03E9 | E900 | 00A1 | 5EC4 | 2606 | 7F83 | 006E | 037D |
| 0000403000 | 5BE9 | 7E00 | E903 | 000A | 8326 | 6C7F | 7700 | E903 |
| 0000403020 | 004C | 5EC4 | 2606 | 77FF | 2672 | 77FF | C470 | 065E |
| 0000403040 | FF26 | 6E77 | FF26 | 6C77 | 006A | 016A | 76FF | FFFC |
| 0000403060 | FA76 | 059A | 63BA | 3D0D | 0001 | 0374 | 08E9 | 8300 |
| 0000403100 | 00FA | 0375 | 17E9 | B800 | 000B | 4689 | 3DF8 | 0000 |
| 0000403120 | 0374 | 06E9 | E900 | 003F | 03E9 | E900 | 0039 | 76FF |
| 0000403140 | FFFC | FA76 | 029A | AB05 | 8317 | 04C4 | 003D | 7500 |
| 0000403160 | E903 | 0006 | 09B8 | E900 | 004A | 7E83 | 000E | 0375 |
| 0000403200 | 0EE9 | FF00 | 0876 | 76FF | 9A06 | 1762 | 16D5 | C483 |
| 0000403220 | B804 | 0000 | 2DE9 | 8B00 | FC46 | 460B | 75FA | E903 |
| 0000403240 | 001C | 76FF | FFFC | FA76 | 029A | 1905 | 831A | 04C4 |
| 0000403260 | 76FF | FF0C | 0A76 | 1C9A | 4242 | 8318 | 04C4 | 468B |
| 0000403300 | E9F8 | 0000 | 5F5E | ED83 | 8B02 | 1FE5 | 4D5D | 1ECB |
| 0000403320 | 9058 | 5545 | EC8B | 8E1E | 81D8 | 6EEC | 5700 | 2B56 |
| 0000403340 | 89CD | FC46 | 4689 | C7FA | F846 | 0000 | 468B | 0B0C |
| 0000403360 | 0A46 | 0374 | 06E9 | B800 | 0017 | 0AE9 | C402 | 0A5E |
| 0000403400 | 8B26 | 6647 | 4689 | C4EA | 0A5E | 8B26 | 6C47 | 8B26 |
| 0000403420 | 6E57 | 4689 | 89EC | EE56 | 681E | 1221 | 76FF | FF08 |
| 0000403440 | 0676 | 569A | C406 | 831A | 08C4 | 4689 | 89FA | FC56 |
| 0000403460 | 468B | 0BFC | FA46 | 0374 | 17E9 | B800 | 0008 | 4689 |
| 0000403500 | 3DF8 | 0000 | 0374 | 06E9 | E900 | 0193 | 03E9 | E900 |
| 0000403520 | 018D | 76FF | FFFC | FA76 | 016A | 586A | 468D | 1692 |
| 0000403540 | 9A50 | 06C8 | 1A0B | C483 | 480C | 0375 | 17E9 | B800 |
| 0000403560 | 000C | 4689 | 3DF8 | 0000 | 0374 | 06E9 | E900 | 015F |
| 0000403600 | 03E9 | E900 | 0159 | 5EC4 | 260A | 478B | 2668 | 578B |
| 0000403620 | 896A | F046 | 5689 | C4F2 | 0A5E | 8B26 | 7047 | 8B26 |
| 0000403640 | 7257 | 4689 | 89F4 | F656 | 76FF | FFFC | FA76 | 016A |
| 0000403660 | 468B | 05EA | 00B4 | FF50 | 0C76 | 76FF | 9A0A | 06C8 |
| 0000403700 | 1C15 | C483 | 480C | 0375 | 17E9 | B800 | 000C | 4689 |
| 0000403720 | 3DF8 | 0000 | 0374 | 06E9 | E900 | 0103 | 03E9 | E900 |
| 0000403740 | 00FD | 468B | 8BF0 | F256 | 5EC4 | 260A | 4789 | 2668 |

THU MAR 14 17:31:54 1991 DB_PI.DLL PAGE 142, LINE 8320

| | | | | | | | | |
|---|---|---|---|---|---|---|---|---|
| 0000403760 | 5789 | 8B6A | F446 | 568B | C4F6 | 0A5E | 8926 | 7047 |
| 0000404000 | 8926 | 7257 | 468B | 8BEC | EE56 | 5EC4 | 260A | 4739 |
| 0000404020 | 746C | E903 | 0018 | 3926 | 6E57 | 0374 | 0FE9 | C400 |
| 0000404040 | 0A5E | 468B | 26EA | 4739 | 7566 | E903 | 0032 | 468B |
| 0000404060 | 8BEC | EE56 | 5EC4 | 260A | 4789 | 266C | 5789 | 8B6E |
| 0000404100 | EA46 | 5EC4 | 260A | 4789 | B866 | 01B0 | 4689 | 3DF8 |
| 0000404120 | 0000 | 0374 | 06E9 | E900 | 0085 | 03E9 | E900 | 007F |
| 0000404140 | 5EC4 | 260A | 77FF | 2672 | 77FF | C470 | 0A5E | FF26 |
| 0000404160 | 6E77 | FF26 | 6C77 | 006A | D16A | 76FF | FFFC | FA76 |
| 0000404200 | B39A | 95C7 | 3D19 | 0001 | 0374 | 08E9 | 8300 | 00FA |
| 0000404220 | 0375 | 17E9 | B800 | 000C | 4689 | 3DF8 | 0000 | 0374 |
| 0000404240 | 06E9 | E900 | 0039 | 03E9 | E900 | 0033 | 76FF | FFFC |
| 0000404260 | FA76 | 029A | 8505 | 831A | 04C4 | 003D | 7500 | E903 |
| 0000404300 | 0017 | 09B8 | 8900 | F846 | 003D | 7400 | E903 | 0006 |
| 0000404320 | 0CE9 | E900 | 0003 | 06E9 | B800 | 0000 | 28E9 | 8300 |
| 0000404340 | F87E | 7500 | E903 | 0019 | 468B | 0BFC | FA46 | 0375 |
| 0000404360 | 0EE9 | FF00 | FC76 | 76FF | 9AFA | 0502 | 1B20 | C483 |
| 0000404400 | 8B04 | F846 | 00E9 | 5E00 | 835F | 02ED | E58B | 5D1F |
| 0000404420 | CB4D | 581E | 4590 | 8B55 | 1EEC | D88E | EC81 | 0004 |
| 0000404440 | 5657 | 681E | 120E | FF6A | FF6A | FF9A | 00FF | FF00 |
| 0000404460 | A836 | 1E3D | A868 | FF3C | A636 | FF3C | A436 | 9A3C |
| 0000404500 | 17FC | 1CC6 | C483 | 890A | FC46 | 7E83 | 00FC | 0375 |
| 0000404520 | 33E9 | FF00 | A636 | FF3C | A436 | FF3C | A236 | FF3C |
| 0000404540 | A036 | 9A3C | 02FE | 19EC | C483 | 1E08 | 2468 | 9A12 |
| 0000404560 | 0A88 | 1CE1 | C483 | FF04 | FC76 | 681E | 1253 | 889A |
| 0000404600 | 5C0A | 831C | 06C4 | 681E | 120E | FF9A | 00FF | 1E00 |
| 0000404620 | 0A68 | 9A12 | FFFF | 0000 | 87E9 | 5EFF | 835F | 02ED |
| 0000404640 | E58B | 5D1F | CB4D | 581E | 4590 | 8B55 | 1EEC | D88E |
| 0000404660 | EC81 | 0000 | 5657 | 3E83 | 1212 | 7400 | E903 | 0028 |
| 0000404700 | 681E | 120E | AF9A | 001D | 6A00 | 6A00 | 6800 | 1000 |
| 0000404720 | 006A | 006A | 7068 | 681D | FFFF | 889A | 9F2B | 831D |
| 0000404740 | 0EC4 | 06C7 | 1212 | 0001 | 681E | 120A | 006A | D068 |
| 0000404760 | 9A07 | 1C8B | 0000 | 793D | 7400 | E903 | 001A | 76FF |
| 0000405000 | FF12 | 1076 | 76FF | FF0E | 0C76 | 76FF | 9A0A | 17FC |
| 0000405020 | 1CA2 | C483 | E90A | 004A | 468B | 8B06 | 0856 | A0A3 |
| 0000405040 | 893C | A216 | 8B3C | 0A46 | 568B | A30C | 3CA4 | 1689 |
| 0000405060 | 3CA6 | 76FF | FF10 | 0E76 | 681E | 3CA8 | 509A | D227 |
| 0000405100 | 831C | 08C4 | 468B | A312 | 3DA8 | 681E | 120A | EB9A |
| 0000405120 | 001C | 1E00 | 0E68 | 9A12 | 1CF4 | 0000 | 00B8 | E900 |
| 0000405140 | 0000 | 5F5E | ED83 | 8B02 | 1FE5 | 4D5D | 1ECB | 9058 |
| 0000405160 | 5545 | EC8B | 8E1E | 81D8 | 00EC | 5700 | 1E56 | 0A68 |
| 0000405200 | 6A12 | 6804 | 93E0 | 529A | 001D | 3D00 | 0079 | 0374 |
| 0000405220 | 09E9 | B800 | 01FC | 09E9 | E900 | 0006 | 00B8 | E900 |
| 0000405240 | 0000 | 5F5E | ED83 | 8B02 | 1FE5 | 4D5D | 1ECB | 9058 |
| 0000405260 | 5545 | EC8B | 8E1E | 81D8 | 00EC | 5700 | 6A56 | FF08 |
| 0000405300 | 0876 | 76FF | FF06 | 0E76 | 76FF | 9A0C | 2804 | 1E48 |
| 0000405320 | C483 | C40A | 0C5E | C626 | 0847 | 1E00 | 7168 | FF12 |
| 0000405340 | 0E76 | 76FF | 9A0C | 270A | 1D3D | C483 | 5E08 | 835F |
| 0000405360 | 02ED | E58B | 5D1F | CB4D | 581E | 4590 | 8B55 | 1EEC |
| 0000405400 | D88E | EC81 | 0028 | 5657 | 46C7 | 00DC | 8A00 | 0A66 |
| 0000405420 | C02A | 4603 | 8B06 | 0856 | 862D | 8974 | D846 | 5689 |
| 0000405440 | 6ADA | FF08 | 0E76 | 76FF | 8D0C | DE46 | 5016 | 049A |
| 0000405460 | 2E28 | 831E | 0AC4 | 46C6 | 00E6 | 76FF | FF12 | 1076 |
| 0000405500 | 006A | 76FF | FFDA | D876 | 681E | 1272 | 468D | 16DE |
| 0000405520 | 9A50 | 3AEA | 1521 | C483 | 8912 | DC46 | 468B | E9DC |
| 0000405540 | 0000 | 5F5E | ED83 | 8B02 | 1FE5 | 4D5D | 1ECB | 9058 |
| 0000405560 | 5545 | EC8B | 8E1E | 81D8 | 60EC | 5700 | C756 | FA46 |
| 0000405600 | 0000 | 468B | 0B08 | 0646 | 0375 | 0BE9 | 8B00 | 0C46 |
| 0000405620 | 460B | 740A | E903 | 0006 | 17B8 | E900 | 026D | 76FF |

THU MAR 14 17:31:54 1991 DB_PI.DLL PAGE 143, LINE 8379

| | | | | | | | | |
|---|---|---|---|---|---|---|---|---|
| 0000405640 | FF0C | 0A76 | 468D | 16F8 | 8D50 | FC46 | 5016 | 5EC4 |
| 0000405660 | 2606 | 478B | 2B66 | C4D2 | 065E | 0326 | 6C47 | 1326 |
| 0000405700 | 6E57 | 0C05 | 8301 | 00D2 | 5052 | 006A | 116A | 116A |
| 0000405720 | 006A | 006A | FF9A | 00FF | 8900 | FA46 | 003D | 7500 |
| 0000405740 | E903 | 007C | 468B | E9FA | 0027 | A4B8 | E901 | 021B |
| 0000405760 | 08B8 | E900 | 0215 | 0EB8 | E900 | 020F | A5B8 | E901 |
| 0000406000 | 0209 | 0DB8 | E900 | 0203 | 08B8 | E900 | 01FD | 4FE9 |
| 0000406020 | 3D00 | 0024 | 0375 | E9E9 | 7EFF | E903 | 0021 | 042D |
| 0000406040 | 7500 | E903 | FFCA | 7548 | E903 | FFBE | 152D | 7500 |
| 0000406060 | E903 | FFCE | 062D | 7500 | E903 | FFC6 | C9E9 | 2DFF |
| 0000406100 | 0052 | 0375 | A9E9 | 2DFF | 001A | 0375 | ADE9 | 48FF |
| 0000406120 | 7548 | E903 | FF9A | 4848 | 0375 | 99E9 | E9FF | FFA8 |
| 0000406140 | 76FF | 9AF8 | FFFF | 0000 | 003D | 7500 | E903 | 0006 |
| 0000406160 | 09B8 | E900 | 0195 | 7E83 | 000E | 0375 | 1FE9 | 1E00 |
| 0000406200 | 7368 | FF12 | 0C76 | 76FF | 9A0A | 0656 | 200B | C483 |
| 0000406220 | C408 | 105E | 8926 | 2607 | 5789 | E902 | 001C | 681E |
| 0000406240 | 1277 | 76FF | FF0C | 0A76 | 569A | 4C06 | 8320 | 08C4 |
| 0000406260 | 5EC4 | 2610 | 0789 | 8926 | 0257 | 5EC4 | 2610 | 478B |
| 0000406300 | 2602 | 070B | 0374 | 17E9 | B800 | 0008 | 4689 | 3DFA |
| 0000406320 | 0000 | 0374 | 06E9 | E900 | 00FC | 03E9 | E900 | 00F6 |
| 0000406340 | 586A | 006A | 468D | 16A0 | 9A50 | 3E8E | 205D | C483 |
| 0000406360 | 6A08 | 6A04 | 8D02 | A046 | 5016 | 8E9A | 893E | 8320 |
| 0000406400 | 08C4 | 46C7 | 64A4 | C700 | A646 | 0064 | 5EC4 | 2606 |
| 0000406420 | 478A | 2A03 | 89E4 | A846 | 46C7 | 64AC | C700 | AE46 |
| 0000406440 | 0000 | 006A | 006A | 089A | D439 | 8320 | 04C4 | 4689 |
| 0000406460 | 89B0 | B256 | 5EC4 | 2606 | 478B | 266C | 578B | C46E |
| 0000406500 | 065E | 0326 | 6647 | D283 | 0500 | 010C | D283 | 8900 |
| 0000406520 | B446 | 5689 | 83B6 | 0E7E | 7500 | E903 | 0072 | 5EC4 |
| 0000406540 | 2610 | 77FF | 2602 | 37FF | 016A | 586A | 468D | 16A0 |
| 0000406560 | 9A50 | 08B6 | 210E | C483 | 480C | 0375 | 17E9 | B800 |
| 0000406600 | 000B | 4689 | 3DFA | 0000 | 0374 | 06E9 | E900 | 0046 |
| 0000406620 | 03E9 | E900 | 0040 | 5EC4 | 2610 | 77FF | 2602 | 37FF |
| 0000406640 | 016A | B468 | FF00 | 0876 | 76FF | 9A06 | 08B6 | 1E91 |
| 0000406660 | C483 | 480C | 0375 | 17E9 | B800 | 000B | 4689 | 3DFA |
| 0000406700 | 0000 | 0374 | 06E9 | E900 | 000C | 03E9 | E900 | 0006 |
| 0000406720 | 00B8 | E900 | 0035 | 5EC4 | 2610 | 478B | 2602 | 070B |
| 0000406740 | 0375 | 20E9 | C400 | 105E | FF26 | 0277 | FF26 | 9A37 |
| 0000406760 | 0502 | 2160 | C483 | FF04 | 0C76 | 76FF | 9A0A | 421C |
| 0000407000 | 1FEC | C483 | 8B04 | FA46 | 00E9 | 5E00 | 835F | 02ED |
| 0000407020 | E58B | 5D1F | CB4D | 581E | 4590 | 8B55 | 1EEC | D88E |
| 0000407040 | EC81 | 000A | 5657 | 76FF | FF0C | 0A76 | 8E9A | 520E |
| 0000407060 | 8321 | 04C4 | 003D | 7500 | E903 | 0006 | 0BB8 | E900 |
| 0000407100 | 008C | 026A | FF6A | FF6A | 76FF | FF0C | 0A76 | 229A |
| 0000407120 | CD2E | 8321 | 0AC4 | 003D | 7500 | E903 | 0006 | 0DB8 |
| 0000407140 | E900 | 006A | 76FF | FF0C | 0A76 | F09A | EA2E | 8321 |
| 0000407160 | 04C4 | 4689 | 89FA | FC56 | 76FF | FF0C | 0A76 | 016A |
| 0000407200 | 016A | 468D | 16F8 | 9A50 | 06C8 | 2204 | C483 | 890C |
| 0000407220 | F646 | 76FF | FF0C | 0A76 | 016A | 016A | 468D | 16F8 |
| 0000407240 | 9A50 | 08B6 | 2215 | C483 | 890C | F646 | 76FF | FF0C |
| 0000407260 | 0A76 | 029A | 8F05 | 8321 | 04C4 | 003D | 7500 | E903 |
| 0000407300 | 0006 | 09B8 | E900 | 0006 | 00B8 | E900 | 0000 | 5F5E |
| 0000407320 | ED83 | 8B02 | 1FE5 | 4D5D | 1ECB | 9058 | 5545 | EC8B |
| 0000407340 | 8E1E | 81D8 | 0AEC | 5700 | C756 | F646 | 010C | 76FF |
| 0000407360 | FF10 | 0E76 | F09A | 9F2E | 8322 | 04C4 | 4689 | 89FA |
| 0000407400 | FC56 | 7E83 | FFFA | 0374 | 0FE9 | 8300 | FC7E | 74FF |
| 0000407420 | E903 | 0006 | 0DB8 | E900 | 0073 | 468B | 2BF6 | 3BD2 |
| 0000407440 | FA46 | 0374 | 08E9 | 3B00 | FC56 | 0375 | 23E9 | 6A00 |
| 0000407460 | 6A00 | FF00 | F676 | 76FF | FF10 | 0E76 | 229A | CA2E |
| 0000407500 | 8322 | 0AC4 | 003D | 7500 | E903 | 0006 | 0CB8 | E900 |

THU MAR 14 17:31:54 1991 DB_PI.DLL PAGE 144, LINE 8438

| | | | | | | | | |
|---|---|---|---|---|---|---|---|---|
| 0000407520 | 003B | 76FF | FF10 | 0E76 | 5EC4 | 2606 | 77FF | 6A66 |
| 0000407540 | FF01 | 0C76 | 76FF | 9A0A | 06C8 | 21B1 | C483 | 890C |
| 0000407560 | F846 | 5EC4 | 8B06 | F846 | 3926 | 6647 | 0377 | 06E9 |
| 0000407600 | B800 | 000C | 06E9 | B800 | 0000 | 00E9 | 5E00 | 835F |
| 0000407620 | 02ED | E58B | 5D1F | CB4D | 581E | 4590 | 8B55 | 1EEC |
| 0000407640 | D88E | EC81 | 000A | 5657 | 46C7 | 0CF6 | FF01 | 1076 |
| 0000407660 | 76FF | 9A0E | 2EF0 | 235E | C483 | 8904 | FA46 | 5689 |
| 0000407700 | 83FC | FA7E | 74FF | E903 | 000F | 7E83 | FFFC | 0374 |
| 0000407720 | 06E9 | B800 | 000D | 73E9 | 8B00 | F646 | D22B | 463B |
| 0000407740 | 74FA | E903 | 0008 | 563B | 75FC | E903 | 0023 | 006A |
| 0000407760 | 006A | 76FF | FFF6 | 1076 | 76FF | 9A0E | 2E22 | 2389 |
| 0000410000 | C483 | 3D0A | 0000 | 0375 | 06E9 | B800 | 000B | 3BE9 |
| 0000410020 | FF00 | 1076 | 76FF | C40E | 065E | FF26 | 6677 | 016A |
| 0000410040 | 76FF | FF0C | 0A76 | B69A | 5708 | 8322 | 0CC4 | 4689 |
| 0000410060 | C4F8 | 065E | 468B | 26F8 | 4739 | 7766 | E903 | 0006 |
| 0000410100 | 0BB8 | E900 | 0006 | 00B8 | E900 | 0000 | 5F5E | ED83 |
| 0000410120 | 8B02 | 1FE5 | 4D5D | 1ECB | 9058 | 5545 | EC8B | 8E1E |
| 0000410140 | 81D8 | 1AEC | 5700 | C756 | EE46 | 0000 | 5EC4 | 2606 |
| 0000410160 | 478B | C462 | 065E | D22B | F726 | 6477 | 4689 | 8BFC |
| 0000410200 | FC46 | 4639 | 730E | E903 | 0006 | 13B8 | E900 | 00F6 |
| 0000410220 | 006A | 76FF | C4FC | 065E | FF26 | 6E77 | FF26 | 6C77 |
| 0000410240 | 9E9A | 1942 | 8924 | EA46 | 5689 | FFEC | EC76 | 76FF |
| 0000410260 | 6AEA | FF00 | 0E76 | 389A | 3A43 | C424 | 065E | 0326 |
| 0000410300 | 6647 | D283 | 0500 | 010C | D283 | 8900 | F446 | 5689 |
| 0000410320 | FFF6 | 0C76 | 76FF | 9A0A | 2EF0 | 248B | C483 | 8904 |
| 0000410340 | F046 | 5689 | 83F2 | F07E | 74FF | E903 | 000F | 7E83 |
| 0000410360 | FFF2 | 0374 | 06E9 | B800 | 000D | 89E9 | 8B00 | F446 |
| 0000410400 | 568B | 2BF6 | F046 | 561B | 89F2 | E646 | 5689 | 8BE8 |
| 0000410420 | E846 | 460B | 75E6 | E903 | 0024 | 016A | 76FF | FFE8 |
| 0000410440 | E676 | 76FF | FF0C | 0A76 | 229A | 162E | 8323 | 0AC4 |
| 0000410460 | 003D | 7500 | E903 | 0006 | 0DB8 | E900 | 0048 | 76FF |
| 0000410500 | FF12 | 1076 | 006A | 016A | 76FF | FFEC | EA76 | 76FF |
| 0000410520 | FF0C | 0A76 | B39A | E3C7 | 891B | F846 | 5689 | 8BFA |
| 0000410540 | EA46 | 568B | 39EC | FA56 | 037E | 13E9 | 7D00 | E903 |
| 0000410560 | 0008 | 4639 | 72F8 | E903 | 0006 | 0CB8 | E900 | 0006 |
| 0000410600 | 00B8 | E900 | 0000 | 5F5E | ED83 | 8B02 | 1FE5 | 4D5D |
| 0000410620 | 1ECB | 9058 | 5545 | EC8B | 8E1E | 81D8 | 1AEC | 5700 |
| 0000410640 | C756 | EE46 | 0000 | 5EC4 | 2606 | 478B | 4862 | 5EC4 |
| 0000410660 | 2B06 | 26D2 | 77F7 | 4064 | 4689 | 8BFC | FC46 | 4639 |
| 0000410700 | 730E | E903 | 0006 | 13B8 | E900 | 0106 | 5EC4 | 2606 |
| 0000410720 | 478B | 4862 | 5EC4 | 2B06 | 26D2 | 77F7 | 4064 | 006A |
| 0000410740 | C450 | 065E | FF26 | 6E77 | FF26 | 6C77 | 9E9A | 6542 |
| 0000410760 | 8925 | EA46 | 5689 | FFEC | EC76 | 76FF | 6AEA | FF00 |
| 0000411000 | 0E76 | 389A | 8643 | C425 | 065E | 0326 | 6647 | D283 |
| 0000411020 | 0500 | 010C | D283 | 8900 | F446 | 5689 | FFF6 | 0C76 |
| 0000411040 | 76FF | 9A0A | 2EF0 | 25D7 | C483 | 8904 | F046 | 5689 |
| 0000411060 | 83F2 | F07E | 74FF | E903 | 000F | 7E83 | FFF2 | 0374 |
| 0000411100 | 06E9 | B800 | 000D | 89E9 | 8B00 | F446 | 568B | 2BF6 |
| 0000411120 | F046 | 561B | 89F2 | E646 | 5689 | 8BE8 | E846 | 460B |
| 0000411140 | 75E6 | E903 | 0024 | 016A | 76FF | FFE8 | E676 | 76FF |
| 0000411160 | FF0C | 0A76 | 229A | 032E | 8324 | 0AC4 | 003D | 7500 |
| 0000411200 | E903 | 0006 | 0DB8 | E900 | 0048 | 76FF | FF12 | 1076 |
| 0000411220 | 006A | 016A | 76FF | FFEC | EA76 | 76FF | FF0C | 0A76 |
| 0000411240 | 059A | B7BA | 8924 | F846 | 5689 | 8BFA | EA46 | 568B |
| 0000411260 | 39EC | FA56 | 037E | 13E9 | 7D00 | E903 | 0008 | 4639 |
| 0000411300 | 72F8 | E903 | 0006 | 0BB8 | E900 | 0006 | 00B8 | E900 |
| 0000411320 | 0000 | 5F5E | ED83 | 8B02 | 1FE5 | 4D5D | 1ECB | 9058 |
| 0000411340 | 5545 | EC8B | 8E1E | 81D8 | 04EC | 5700 | 1E56 | 1868 |
| 0000411360 | 6A12 | 6AFF | 9AFF | 1DE7 | 0000 | 36FF | 3DBC | 36FF |

THU MAR 14 17:31:54 1991 DB_PI.DLL PAGE 145, LINE 8497

| | | | | | | | | |
|---|---|---|---|---|---|---|---|---|
| 0000411400 | 3DBA | 36FF | 3DB8 | 36FF | 3DB6 | 36FF | 3DB4 | 36FF |
| 0000411420 | 3DAC | 36FF | 3DAA | F19A | 3524 | 831D | 0EC4 | 4689 |
| 0000411440 | 83FC | FC7E | 7500 | E903 | 0027 | 468B | C4FC | AE1E |
| 0000411460 | 263D | 8789 | 00F4 | 681E | 127A | 889A | AC0A | 8326 |
| 0000411500 | 04C4 | 76FF | 1EFC | A968 | 9A12 | 0A88 | 254F | C483 |
| 0000411520 | 1E06 | 1868 | 9A12 | 1D25 | 0000 | 681E | 1214 | B89A |
| 0000411540 | 001D | E900 | FF87 | 5F5E | ED83 | 8B02 | 1FE5 | 4D5D |
| 0000411560 | 1ECB | 9058 | 5545 | EC8B | 8E1E | 81D8 | 04EC | 5700 |
| 0000411600 | C756 | FC46 | 0000 | 3E83 | 121C | 7400 | E903 | 0028 |
| 0000411620 | 681E | 1218 | B69A | 0026 | 6A00 | 6A00 | 6800 | 1000 |
| 0000411640 | 006A | 006A | 5568 | 6827 | FFFF | 889A | 9D2B | 8326 |
| 0000411660 | 0EC4 | 06C7 | 121C | 0001 | 681E | 1214 | 006A | D068 |
| 0000411700 | 9A07 | 2656 | 0000 | 793D | 7400 | E903 | 004F | B2A1 |
| 0000411720 | 393D | 0A46 | 0375 | 27E9 | C400 | 125E | FF26 | 0277 |
| 0000411740 | FF26 | FF37 | 1076 | 76FF | FF1C | 1A76 | 76FF | FF08 |
| 0000411760 | 0676 | F19A | 6624 | 8327 | 0EC4 | A1E9 | E900 | 001D |
| 0000412000 | 76FF | 9A0A | 2809 | 2679 | C483 | 8902 | FC46 | 7E83 |
| 0000412020 | 00FC | 0375 | 06E9 | 8B00 | FC46 | 81E9 | 8B00 | 0646 |
| 0000412040 | 568B | A308 | 3DAA | 1689 | 3DAC | 468B | 8B0C | 0E56 |
| 0000412060 | AEA3 | 893D | B016 | 8B3D | 0A46 | B2A3 | 8B3D | 1A46 |
| 0000412100 | 568B | A31C | 3DB4 | 1689 | 3DB6 | 468B | A310 | 3DB8 |
| 0000412120 | 5EC4 | 2612 | 078B | 8B26 | 0257 | BAA3 | 893D | BC16 |
| 0000412140 | C43D | 165E | 8B26 | 2607 | 578B | C402 | 125E | 8926 |
| 0000412160 | 2607 | 5789 | A102 | 3DBA | 168B | 3DBC | 5EC4 | 2616 |
| 0000412200 | 0789 | 8926 | 0257 | 681E | 1214 | F59A | 0026 | 1E00 |
| 0000412220 | 1868 | 9A12 | 26BF | 0000 | 00B8 | E900 | 0000 | 5F5E |
| 0000412240 | ED83 | 8B02 | 1FE5 | 4D5D | 1ECB | 9058 | 5545 | EC8B |
| 0000412260 | 8E1E | 81D8 | 00EC | 5700 | A156 | 3DB2 | 4639 | 7506 |
| 0000412300 | E903 | 0006 | 00B8 | E900 | 0025 | 681E | 1214 | 046A |
| 0000412320 | E068 | 9A93 | 2722 | 0000 | 793D | 7400 | E903 | 0009 |
| 0000412340 | FCB8 | E901 | 0009 | 06E9 | B800 | 0000 | 00E9 | 5E00 |
| 0000412360 | 835F | 02ED | E58B | 5D1F | CB4D | 581E | 4590 | 8B55 |
| 0000412400 | 1EEC | D88E | EC81 | 000E | 5657 | 5EC4 | 2606 | 478B |
| 0000412420 | 266E | 470B | 746C | E903 | 001A | 76FF | FF0E | 0C76 |
| 0000412440 | 76FF | FF0A | 0876 | 76FF | 9A06 | 17FC | 28AA | C483 |
| 0000412460 | E90A | 0153 | 468D | 16F8 | 6A50 | FF01 | 0C76 | 76FF |
| 0000412500 | FF0A | 0876 | 76FF | 9A06 | 1ECD | 28E8 | C483 | 890E |
| 0000412520 | F246 | 7E83 | 00F2 | 0375 | 06E9 | 8B00 | F246 | 26E9 |
| 0000412540 | C401 | 065E | 8326 | 667F | 7500 | E903 | 0031 | 76FF |
| 0000412560 | FFFA | F876 | 5EC4 | 2606 | 77FF | 266A | 77FF | FF68 |
| 0000412600 | 0876 | 76FF | 9A06 | 22F8 | 298A | C483 | 890C | F246 |
| 0000412620 | 7E83 | 00F2 | 0375 | 06E9 | 8B00 | F246 | E8E9 | C700 |
| 0000412640 | FC46 | 0000 | 03E9 | FF00 | FC46 | 5EC4 | 2606 | 478B |
| 0000412660 | C462 | 065E | D22B | F726 | 6477 | 463B | 77FC | E903 |
| 0000412700 | 0082 | 006A | 76FF | C4FC | 065E | 006A | FF26 | 6477 |
| 0000412720 | 5EC4 | 6A06 | 2600 | 77FF | C462 | 065E | FF26 | 6E77 |
| 0000412740 | FF26 | 6C77 | 9E9A | 4E42 | 5229 | 9A50 | 4338 | 2955 |
| 0000412760 | 5052 | 389A | C043 | 8927 | F446 | 5689 | 8BF6 | F446 |
| 0000413000 | 568B | C4F6 | 065E | 0326 | 7047 | D283 | B900 | FFFF |
| 0000413020 | E2D3 | 0326 | 7257 | 5052 | 76FF | FFFC | FA76 | 76FF |
| 0000413040 | FFF8 | 0876 | 76FF | 9A06 | 24F1 | 29B3 | C483 | 890E |
| 0000413060 | F246 | 7E83 | 00F2 | 0375 | 06E9 | 8B00 | F246 | 46E9 |
| 0000413100 | E900 | FF63 | 76FF | FFFA | F876 | 76FF | FF08 | 0676 |
| 0000413120 | 769A | DC21 | 8329 | 08C4 | 4689 | 83F2 | F27E | 7500 |
| 0000413140 | E903 | 0006 | 468B | E9F2 | 001D | 7E83 | 000E | 0375 |
| 0000413160 | 0EE9 | FF00 | 0876 | 76FF | 9A06 | 1762 | 2705 | C483 |
| 0000413200 | B804 | 0000 | 00E9 | 5E00 | 835F | 02ED | E58B | 5D1F |
| 0000413220 | CB4D | 581E | 4590 | 8B55 | 1EEC | D88E | EC81 | 01B4 |
| 0000413240 | 5657 | 5EC4 | 2606 | 878B | 00AC | 0B26 | AA87 | 7400 |

THU MAR 14 17:31:54 1991 DB_PI.DLL PAGE 146, LINE 8556

| | | | | | | | | |
|---|---|---|---|---|---|---|---|---|
| 0000413260 | E903 | 0006 | ABB8 | E901 | 0129 | 5EC4 | 2606 | B7FF |
| 0000413300 | 00AC | FF26 | AAB7 | 6A00 | 6A00 | 8D00 | 4C86 | 16FE |
| 0000413320 | 9A50 | 310B | 2A6D | 4689 | 83FC | FC7E | 7500 | E903 |
| 0000413340 | 0006 | 468B | E9FC | 00FB | 9EC4 | FE4C | FF26 | 4A77 |
| 0000413360 | FF26 | 4877 | 76FF | FF0E | 0C76 | 509A | 8827 | 832A |
| 0000413400 | 08C4 | B6FF | FE4E | B6FF | FE4C | 259A | 4434 | 2B17 |
| 0000413420 | 89C0 | 4E86 | 89FE | 4C86 | FFFE | 0E76 | 76FF | 8D0C |
| 0000413440 | 5086 | 16FE | 9A50 | 2750 | 2A9A | C483 | 1E08 | C868 |
| 0000413460 | 8D12 | 5086 | 16FE | 9A50 | 270A | 2AB3 | C483 | 8B08 |
| 0000413500 | 0646 | 568B | 0508 | 008A | 5052 | 868D | FE50 | 5016 |
| 0000413520 | 0A9A | 0527 | 832B | 08C4 | 2F6A | 868D | FE50 | 5016 |
| 0000413540 | CF9A | 2629 | 832B | 06C4 | 003D | 7400 | E903 | 006D |
| 0000413560 | 7E83 | 020A | 037C | 06E9 | B800 | 019D | 64E9 | C400 |
| 0000413600 | 065E | C726 | 8487 | 0000 | C400 | 065E | C726 | 8287 |
| 0000413620 | AC00 | 1E00 | CA68 | 8B12 | 0646 | 568B | 0508 | 008A |
| 0000413640 | 5052 | 509A | 4727 | 8329 | 08C4 | 006A | 056A | 016A |
| 0000413660 | 146A | 0068 | FF04 | 0E76 | 76FF | 6A0C | FF19 | 0876 |
| 0000413700 | 76FF | 9A06 | 1609 | 1EB4 | C483 | 8914 | FC46 | 7E83 |
| 0000413720 | 00FC | 0375 | 06E9 | 8B00 | FC46 | 06E9 | B800 | 0000 |
| 0000413740 | 00E9 | 5E00 | 835F | 02ED | E58B | 5D1F | CB4D | 581E |
| 0000413760 | 4590 | 8B55 | 1EEC | D88E | EC81 | 0108 | 5657 | 468D |
| 0000414000 | 16FA | 9A50 | E94E | 2603 | C483 | 8904 | F846 | 7E83 |
| 0000414020 | 00F8 | 0375 | 06E9 | 8B00 | F846 | 91E9 | 8B00 | FA46 |
| 0000414040 | 568B | C4FC | 085E | 8926 | 2607 | 5789 | C402 | 085E |
| 0000414060 | C426 | 261F | BF83 | 0080 | 7500 | E903 | 0011 | 5EC4 |
| 0000414100 | 2608 | 1FC4 | 8326 | 80BF | 0200 | 0374 | 59E9 | 8D00 |
| 0000414120 | F886 | 16FE | FF50 | 0676 | 76FF | FFFC | FA76 | F29A |
| 0000414140 | 8C29 | 8328 | 0AC4 | 4689 | 83F8 | F87E | 7500 | E903 |
| 0000414160 | 0006 | 468B | E9F8 | 0036 | 196A | 006A | 016A | 868D |
| 0000414200 | FEF8 | 5016 | 5EC4 | 2608 | 77FF | 2602 | 37FF | 639A |
| 0000414220 | C30D | 832A | 0EC4 | 4689 | 83F8 | F87E | 7500 | E903 |
| 0000414240 | 0006 | 468B | E9F8 | 0006 | 00B8 | E900 | 0000 | 5F5E |
| 0000414260 | ED83 | 8B02 | 1FE5 | 4D5D | 1ECB | 9058 | 5545 | EC8B |
| 0000414300 | 8E1E | 81D8 | 0BEC | 5700 | 8D56 | FA46 | 5016 | 4E9A |
| 0000414320 | 66E9 | 832B | 04C4 | 4689 | 83F8 | F87E | 7500 | E903 |
| 0000414340 | 0006 | 468B | E9F8 | 003E | 5EC4 | 26FA | BF83 | 0080 |
| 0000414360 | 7500 | E903 | 002A | 76FF | FFFC | FA76 | 5E9A | F114 |
| 0000414400 | 832B | 04C4 | 4689 | 83F8 | F87E | 7500 | E903 | 0010 |
| 0000414420 | 7E81 | 9FF8 | 7401 | E903 | 0006 | 468B | E9F8 | 0006 |
| 0000414440 | 00B8 | E900 | 0000 | 5F5E | ED83 | 8B02 | 1FE5 | 4D5D |
| 0000414460 | 1ECB | 9058 | 5545 | EC8B | 8E1E | 81D8 | DAEC | 5700 |
| 0000414500 | 8356 | 0A7E | 7501 | E903 | 0006 | BDB8 | E901 | 01DA |
| 0000414520 | 46C7 | 00F8 | 8D00 | 2A86 | 89FF | 2686 | 8CFF | 2896 |
| 0000414540 | C7FF | 4A86 | ACFF | 8D00 | 4C86 | 16FF | 8D50 | 4A86 |
| 0000414560 | 16FF | FF50 | 28B6 | FFFF | 26B6 | FFFF | F876 | 0C6A |
| 0000414600 | 76FF | FF08 | 0676 | 1B9A | 1ED8 | 832D | 14C4 | 4689 |
| 0000414620 | 83FA | FA7E | 7500 | E903 | 0010 | 7E81 | FAFA | 7501 |
| 0000414640 | E903 | 0006 | 468B | E9FA | 0180 | 46C7 | 00FA | C70C |
| 0000414660 | FC46 | 0005 | 468B | C1FC | 05E0 | 9A50 | 243E | 2A5D |
| 0000414700 | C483 | C402 | 105E | 8926 | 2607 | 5789 | C402 | 105E |
| 0000414720 | 8B26 | 0247 | 0B26 | 7407 | E903 | 0006 | 07B8 | E900 |
| 0000414740 | 0148 | 5EC4 | 260C | 07C7 | 0000 | 7E83 | 00FA | 0374 |
| 0000414760 | AFE9 | C400 | 0C5E | 468B | 26FC | 0739 | 0373 | 3CE9 |
| 0000415000 | 8300 | FC46 | 8B05 | FC46 | E0C1 | 5005 | 5EC4 | 2610 |
| 0000415020 | 77FF | 2602 | 37FF | A49A | BB32 | 832D | 06C4 | 5EC4 |
| 0000415040 | 2610 | 0789 | 8926 | 0257 | 5EC4 | 2610 | 478B | 2602 |
| 0000415060 | 070B | 0374 | 06E9 | B800 | 0007 | EDE9 | 8D00 | 5086 |
| 0000415100 | 16FF | C450 | 0C5E | 8B26 | C107 | 05E0 | 5EC4 | 2610 |
| 0000415120 | 0703 | 8B26 | 0257 | 5052 | 509A | E827 | 832D | 08C4 |

THU MAR 14 17:31:54 1991 DB_PI.DLL PAGE 147, LINE 8615

| | | | | | | | | |
|---|---|---|---|---|---|---|---|---|
| 0000415140 | 5EC4 | 260C | 07FF | 868D | FF4C | 5016 | 868D | FF4A |
| 0000415160 | 5016 | B6FF | FF28 | B6FF | FF26 | 76FF | 6AF8 | FF06 |
| 0000415200 | 0876 | 76FF | 9A06 | D81B | 2E31 | C483 | 8914 | FA46 |
| 0000415220 | 7E81 | FAFA | 7401 | E903 | 0005 | 46C7 | 00FA | E900 |
| 0000415240 | FF48 | 7E81 | BCFA | 7401 | E903 | 0052 | 5EC4 | 8B0C |
| 0000415260 | FC46 | 3926 | 7207 | E903 | 003B | 5EC4 | 260C | 078B |
| 0000415300 | E0C1 | 5005 | 5EC4 | 2610 | 77FF | 2602 | 37FF | A49A |
| 0000415320 | 6B32 | 832E | 06C4 | 5EC4 | 2610 | 0789 | 8926 | 0257 |
| 0000415340 | 5EC4 | 2610 | 478B | 2602 | 070B | 0374 | 06E9 | B800 |
| 0000415360 | 0007 | 35E9 | B800 | 0000 | 2FE9 | E900 | 002C | 5EC4 |
| 0000415400 | 2610 | 77FF | 2602 | 37FF | 489A | E924 | 832C | 04C4 |
| 0000415420 | 5EC4 | 2B10 | 26C0 | 4789 | 2602 | 0789 | 5EC4 | 260C |
| 0000415440 | 07C7 | 0000 | 468B | E9FA | 0000 | 5F5E | ED83 | 8B02 |
| 0000415460 | 1FE5 | 4D5D | 00CB | 581E | 4590 | 8B55 | 1EEC | D88E |
| 0000415500 | EC81 | 005A | 5657 | 5EC4 | 2606 | 87C7 | 0084 | 0000 |
| 0000415520 | 006A | 056A | 006A | 016A | 0068 | FF04 | 0C76 | 76FF |
| 0000415540 | 6A0A | FF16 | 0876 | 76FF | 9A06 | 1609 | 2C5F | C483 |
| 0000415560 | E914 | 0000 | 5F5E | ED83 | 8B02 | 1FE5 | 4D5D | 1ECB |
| 0000415600 | 9058 | 5545 | EC8B | 8E1E | 81D8 | 06EC | 5700 | 8B56 |
| 0000415620 | 0A46 | 21E9 | C700 | FC46 | FFFE | 3BE9 | C700 | FC46 |
| 0000415640 | 0001 | 33E9 | C700 | FC46 | FFFF | 2BE9 | B800 | 01A6 |
| 0000415660 | 0AE9 | E901 | 0022 | C00B | 037D | F0E9 | 48FF | 037F |
| 0000415700 | D2E9 | 48FF | 037D | E4E9 | 48FF | 037F | CEE9 | 48FF |
| 0000415720 | 0375 | D0E9 | E9FF | FFD5 | 5EC4 | 2606 | BF83 | 06FA |
| 0000415740 | 7400 | E903 | 00A9 | 166A | 006A | 76FF | 8BFC | 0646 |
| 0000415760 | 568B | 0508 | 0034 | 5052 | 468B | 8B06 | 0856 | 7A05 |
| 0000416000 | 5206 | 9A50 | 0D63 | 2FDB | C483 | 890E | FA46 | 7E81 |
| 0000416020 | 9DFA | 7401 | E903 | 006E | 7E83 | 020A | 037D | 65E9 |
| 0000416040 | 8B00 | 0646 | 568B | 0508 | 0034 | 5052 | 468B | 8B06 |
| 0000416060 | 0856 | 7A05 | 5206 | 9A50 | 2E96 | 2BC1 | C483 | 8908 |
| 0000416100 | FA46 | 7E83 | 00FA | 0375 | 10E9 | 8100 | FA7E | 01B8 |
| 0000416120 | 0375 | 06E9 | 8B00 | FA46 | 62E9 | 6A00 | 6A16 | FF00 |
| 0000416140 | FC76 | 468B | 8B06 | 0856 | 3405 | 5200 | 8B50 | 0646 |
| 0000416160 | 568B | 0508 | 067A | 5052 | 639A | 0F0D | 8330 | 0EC4 |
| 0000416200 | 4689 | E9FA | 0006 | 468B | E9FA | 0031 | 28E9 | 6A00 |
| 0000416220 | 6A16 | FF00 | FC76 | 468B | 8B06 | 0856 | 3405 | 5200 |
| 0000416240 | 8B50 | 0646 | 568B | 0508 | 067A | 5052 | 639A | CC0D |
| 0000416260 | 832E | 0EC4 | 4689 | 8BFA | FA46 | 00E9 | 5E00 | 835F |
| 0000416300 | 02ED | E58B | 5D1F | CB4D | 581E | 4590 | 8B55 | 1EEC |
| 0000416320 | D88E | EC81 | 0000 | 5657 | 5EC4 | 2606 | BF83 | 06FA |
| 0000416340 | 7500 | E903 | 0019 | 468B | 8B06 | 0856 | 7A05 | 5206 |
| 0000416360 | 9A50 | 145E | 2F66 | C483 | E904 | 0009 | 06E9 | B800 |
| 0000416400 | 0000 | D0E9 | 5E00 | 835F | 02ED | E58B | 5D1F | CB4D |
| 0000416420 | 581E | 4590 | 8B55 | 1EEC | D88E | EC81 | 0008 | 5657 |
| 0000416440 | 468D | 16F8 | 9A50 | E8FA | 2C31 | C483 | 8904 | FC46 |
| 0000416460 | 7E83 | 00FC | 0375 | 06E9 | 8B00 | FC46 | 3EE9 | C400 |
| 0000416500 | F85E | 8326 | 80BF | 0000 | 0375 | 2AE9 | FF00 | FA76 |
| 0000416520 | 76FF | 9AF8 | 145E | 3054 | C483 | 8904 | FC46 | 7E83 |
| 0000416540 | 00FC | 0375 | 10E9 | 8100 | FC7E | 019F | 0374 | 06E9 |
| 0000416560 | 8B00 | FC46 | 06E9 | B800 | 0000 | 00E9 | 5E00 | 835F |
| 0000416600 | 02ED | E58B | 5D1F | CB4D | 581E | 4590 | 8B55 | 1EEC |
| 0000416620 | D88E | EC81 | 0004 | 5657 | 46C7 | 00FC | 8B00 | 0646 |
| 0000416640 | 568B | 0508 | 0034 | 5052 | 468B | 8B06 | 0856 | 7A05 |
| 0000416660 | 5206 | 9A50 | 2838 | 30B6 | C483 | 8908 | FC46 | 7E83 |
| 0000416700 | 00FC | 0374 | 0AE9 | C400 | 065E | C726 | FA87 | 0006 |
| 0000416720 | 8B00 | FC46 | 00E9 | 5E00 | 835F | 02ED | E58B | 5D1F |
| 0000416740 | CB4D | 581E | 4590 | 8B55 | 1EEC | D88E | EC81 | 0086 |
| 0000416760 | 5657 | 7E83 | 010A | 0375 | 06E9 | B800 | 01BD | CCE9 |
| 0000417000 | C701 | A046 | 0000 | 868D | FF7E | 8689 | FF7A | 968C |

THU MAR 14 17:31:54 1991 DB_PI.DLL PAGE 148, LINE 8674

| | | | | | | | | |
|---|---|---|---|---|---|---|---|---|
| 0000417020 | FF7C | 46C7 | 589E | 8D00 | A446 | 5016 | 468D | 169E |
| 0000417040 | FF50 | 7CB6 | FFFF | 7AB6 | FFFF | A076 | 0C6A | 76FF |
| 0000417060 | FF08 | 0676 | 1B9A | 79D8 | 832D | 14C4 | 4689 | 83A2 |
| 0000417100 | A27E | 7500 | E903 | 0010 | 7E81 | FAA2 | 7501 | E903 |
| 0000417120 | 0006 | 468B | E9A2 | 0175 | 46C7 | 00A2 | C700 | FC46 |
| 0000417140 | 0005 | 468B | C1FC | 05E0 | 9A50 | 243E | 321F | C483 |
| 0000417160 | C402 | 105E | 8926 | 2607 | 5789 | C402 | 105E | 8B26 |
| 0000417200 | 0247 | 0B26 | 7407 | E903 | 0006 | 07B8 | E900 | 013D |
| 0000417220 | 7E83 | 00A2 | 0374 | ACE9 | C400 | 0C5E | 468B | 26FC |
| 0000417240 | 0739 | 0373 | 3CE9 | 8300 | FC46 | 8B05 | FC46 | EDC1 |
| 0000417260 | 5005 | 5EC4 | 2610 | 77FF | 2602 | 37FF | A49A | 6032 |
| 0000417300 | 8332 | 06C4 | 5EC4 | 2610 | 0789 | 8926 | 0257 | 5EC4 |
| 0000417320 | 2610 | 478B | 2602 | 070B | 0374 | 06E9 | B800 | 0007 |
| 0000417340 | EAE9 | 8D00 | A846 | 5016 | 5EC4 | 260C | 078B | EDC1 |
| 0000417360 | C405 | 105E | 0326 | 2607 | 578B | 5202 | 9A50 | 2750 |
| 0000417400 | 328B | C483 | C408 | 0C5E | FF26 | 8D07 | A446 | 5016 |
| 0000417420 | 468D | 169E | FF50 | 7CB6 | FFFF | 7AB6 | FFFF | A076 |
| 0000417440 | 066A | 76FF | FF08 | 0676 | 1B9A | D4D8 | 8332 | 14C4 |
| 0000417460 | 4689 | 81A2 | A27E | 01FA | 0374 | 05E9 | C700 | A246 |
| 0000417500 | 0000 | 4BE9 | 81FF | A27E | 01BC | 0374 | 52E9 | C400 |
| 0000417520 | 0C5E | 468B | 26FC | 0739 | 0372 | 3BE9 | C400 | 0C5E |
| 0000417540 | 8B26 | C107 | 05E0 | C450 | 105E | FF26 | 0277 | FF26 |
| 0000417560 | 9A37 | 32A4 | 330E | C483 | C406 | 105E | 8926 | 2607 |
| 0000417600 | 5789 | C402 | 105E | 8B26 | 0247 | 0B26 | 7407 | E903 |
| 0000417620 | 0006 | 07B8 | E900 | 0035 | 00B8 | E900 | 002F | 2CE9 |
| 0000417640 | C400 | 105E | FF26 | 0277 | FF26 | 9A37 | 2448 | 3197 |
| 0000417660 | C483 | C404 | 105E | C02B | 8926 | 0247 | 8926 | C407 |
| 0000417700 | 0C5E | C726 | 0007 | 8B00 | A246 | 00E9 | 5E00 | 835F |
| 0000417720 | 02ED | E58B | 5D1F | CB4D | 581E | 4590 | 8B55 | 1EEC |
| 0000417740 | D88E | EC81 | 006E | 5657 | 5EC4 | 2606 | 87C7 | 0084 |
| 0000417760 | 0001 | 006A | 016A | 016A | 016A | 0068 | FF04 | 0C76 |
| 0000420000 | 76FF | 6A0A | FF17 | 0876 | 76FF | 9A06 | 1609 | 3116 |
| 0000420020 | C483 | E914 | 0000 | 5F5E | ED83 | 8B02 | 1FE5 | 4D5D |
| 0000420040 | 1ECB | 9058 | 5545 | EC8B | 8E1E | 81D8 | 06EC | 5700 |
| 0000420060 | 8B56 | 0A46 | 21E9 | C700 | FC46 | FFFE | 3BE9 | C700 |
| 0000420100 | FC46 | 0001 | 33E9 | C700 | FC46 | FFFF | 2BE9 | B800 |
| 0000420120 | 01A6 | 19E9 | E901 | 0022 | C00B | 037D | F0E9 | 48FF |
| 0000420140 | 037F | D2E9 | 48FF | 037D | E4E9 | 48FF | 037F | CEE9 |
| 0000420160 | 48FF | 0375 | D0E9 | E9FF | FFD5 | 5EC4 | 2606 | BF83 |
| 0000420200 | 07A4 | 7400 | E903 | 00B8 | 176A | 016A | 76FF | 8BFC |
| 0000420220 | 0646 | 568B | 0508 | 0034 | 5052 | 468B | 8B06 | 0856 |
| 0000420240 | 2405 | 5207 | 9A50 | 0D63 | 348C | C483 | 890E | FA46 |
| 0000420260 | 7E81 | 9DFA | 7401 | E903 | 007D | 7E83 | 020A | 037D |
| 0000420300 | 74E9 | 8B00 | 0646 | 568B | 0508 | 0034 | 5052 | 468B |
| 0000420320 | 8B06 | 0856 | 2405 | 5207 | 9A50 | 3338 | 2F9A | C483 |
| 0000420340 | 8908 | FA46 | 7E81 | B8FA | 7401 | E903 | 0005 | 46C7 |
| 0000420360 | 00FA | 8300 | FA7E | 7500 | E903 | 0010 | 7E81 | B8FA |
| 0000420400 | 7501 | E903 | 0006 | 468B | E9FA | 0062 | 176A | 016A |
| 0000420420 | 76FF | 8BFC | 0646 | 568B | 0508 | 0034 | 5052 | 468B |
| 0000420440 | 8B06 | 0856 | 2405 | 5207 | 9A50 | 0D63 | 34C0 | C483 |
| 0000420460 | 890E | FA46 | 06E9 | 8B00 | FA46 | 31E9 | E900 | 0028 |
| 0000420500 | 176A | 016A | 76FF | 8BFC | 0646 | 568B | 0508 | 0034 |
| 0000420520 | 5052 | 468B | 8B06 | 0856 | 2405 | 5207 | 9A50 | 0D63 |
| 0000420540 | 336E | C483 | 890E | FA46 | 468B | E9FA | 0000 | 5F5E |
| 0000420560 | ED83 | 8B02 | 1FE5 | 4D5D | 1ECB | 9058 | 5545 | EC8B |
| 0000420600 | 8E1E | 81D8 | 00EC | 5700 | C456 | 065E | 8326 | A4BF |
| 0000420620 | 0007 | 0375 | 19E9 | 8B00 | 0646 | 568B | 0508 | 0724 |
| 0000420640 | 5052 | 5E9A | 0814 | 8334 | 04C4 | 09E9 | E900 | 0006 |
| 0000420660 | 00B8 | E900 | 0000 | 5F5E | ED83 | 8B02 | 1FE5 | 4D5D |

THU MAR 14 17:31:54 1991 DB_PI.DLL PAGE 149, LINE 8733

| | | | | | | | | |
|---|---|---|---|---|---|---|---|---|
| 0000420700 | 1ECB | 9058 | 5545 | EC8B | 8E1E | 81D8 | 04EC | 5700 |
| 0000420720 | C756 | FC46 | 0000 | 468B | 8B06 | 0856 | 3405 | 5200 |
| 0000420740 | 8B50 | 0646 | 568B | 0508 | 0724 | 5052 | 389A | 0528 |
| 0000420760 | 8335 | 08C4 | 4689 | 83FC | FC7E | 7400 | E903 | 000A |
| 0000421000 | 5EC4 | 2606 | 87C7 | 07A4 | 0000 | 468B | E9FC | 0000 |
| 0000421020 | 5F5E | ED83 | 8B02 | 1FE5 | 4D5D | 1ECB | 9058 | 5545 |
| 0000421040 | EC8B | 8E1E | 81D8 | 7EEC | 5700 | C756 | 8646 | 0000 |
| 0000421060 | 468D | 898A | 8246 | 568C | C784 | 8846 | 006C | 468D |
| 0000421100 | 1690 | 8D50 | 8846 | 5016 | 76FF | FF84 | 8276 | 76FF |
| 0000421120 | 6A86 | 8B0C | 0646 | 568B | 0508 | 0724 | 5052 | 1B9A |
| 0000421140 | F6D8 | 8335 | 14C4 | 4689 | 838E | 8E7E | 7500 | E903 |
| 0000421160 | 0010 | 7E81 | FA8E | 7501 | E903 | 0006 | 468B | E98E |
| 0000421200 | 0172 | 46C7 | 008E | C700 | FC46 | 0005 | 468B | C1FC |
| 0000421220 | 02E0 | 9A50 | 243E | 31CC | C483 | C402 | 0E5E | 8926 |
| 0000421240 | 2607 | 5789 | C402 | 0E5E | 8B26 | 0247 | 0B26 | 7407 |
| 0000421260 | E903 | 0006 | 07B8 | E900 | 013A | 7E83 | 008E | 0374 |
| 0000421300 | A9E9 | C400 | 0A5E | 468B | 26FC | 0739 | 0373 | 3CE9 |
| 0000421320 | 8300 | FC46 | 8B05 | FC46 | E0C1 | 5002 | 5EC4 | 260E |
| 0000421340 | 77FF | 2602 | 37FF | A49A | B232 | 8336 | 06C4 | 5EC4 |
| 0000421360 | 260E | 0789 | 8926 | 0257 | 5EC4 | 260E | 478B | 2602 |
| 0000421400 | 070B | 0374 | 06E9 | B800 | 0007 | E7E9 | C400 | 0A5E |
| 0000421420 | 8B26 | C11F | 02E3 | 76C4 | 260E | 34C4 | 468B | 8B90 |
| 0000421440 | 9256 | 8926 | 2600 | 5089 | C402 | 0A5E | FF26 | 8D07 |
| 0000421460 | 9046 | 5016 | 468D | 1688 | FF50 | 8476 | 76FF | FF82 |
| 0000421500 | 8676 | 066A | 468B | 8B06 | 0856 | 2405 | 5207 | 9A50 |
| 0000421520 | D81B | 36FB | C483 | 8914 | 8E46 | 7E81 | FA8E | 7401 |
| 0000421540 | E903 | 0005 | 46C7 | 008E | E900 | FF4E | 7E81 | BC8E |
| 0000421560 | 7401 | E903 | 0052 | 5EC4 | 8B0A | FC46 | 3926 | 7207 |
| 0000421600 | E903 | 003B | 5EC4 | 260A | 078B | E0C1 | 5002 | 5EC4 |
| 0000421620 | 260E | 77FF | 2602 | 37FF | A49A | 3532 | 8337 | 06C4 |
| 0000421640 | 5EC4 | 260E | 0789 | 8926 | 0257 | 5EC4 | 260E | 478B |
| 0000421660 | 2602 | 070B | 0374 | 06E9 | B800 | 0007 | 35E9 | B800 |
| 0000421700 | 0000 | 2FE9 | E900 | 002C | 5EC4 | 260E | 77FF | 2602 |
| 0000421720 | 37FF | 489A | C124 | 8335 | 04C4 | 5EC4 | 2B0E | 26C0 |
| 0000421740 | 4789 | 2602 | 0789 | 5EC4 | 260A | 07C7 | 0000 | 468B |
| 0000421760 | E98E | 0000 | 5F5E | ED83 | 8B02 | 1FE5 | 4D5D | 00CB |
| 0000422000 | 581E | 4590 | 8B55 | 1EEC | D88E | EC81 | 002C | 5657 |
| 0000422020 | 7E81 | 8C0E | 7D00 | E903 | 0012 | 7E81 | 8F0E | 7C00 |
| 0000422040 | E903 | 0008 | 46C7 | 01D4 | E900 | 0005 | 46C7 | 00D4 |
| 0000422060 | 8300 | D47E | 7400 | E903 | 0006 | ADB8 | E901 | 002F |
| 0000422100 | 5EC4 | 2606 | 87C7 | 0084 | 0001 | 006A | 016A | 016A |
| 0000422120 | 056A | 0068 | FF04 | 0C76 | 76FF | FF0A | 0E76 | 76FF |
| 0000422140 | FF08 | 0676 | 099A | 4F16 | 8335 | 14C4 | 00E9 | 5E00 |
| 0000422160 | 835F | 02ED | E58B | 5D1F | CB4D | 581E | 4590 | 8B55 |
| 0000422200 | 1EEC | D88E | EC81 | 0006 | 5657 | 468B | E90C | 003C |
| 0000422220 | 46C7 | FEFC | E9FF | 0056 | 76FF | 9A0A | EC54 | 3088 |
| 0000422240 | C483 | 3D02 | 0000 | 0375 | 08E9 | C700 | FC46 | FFFF |
| 0000422260 | 05E9 | C700 | FC46 | 0001 | 33E9 | C700 | FC46 | FFFF |
| 0000422300 | 2BE9 | B800 | 01A6 | 38E9 | E901 | 0022 | C00B | 037D |
| 0000422320 | F0E9 | 48FF | 037F | B7E9 | 48FF | 037D | E4E9 | 48FF |
| 0000422340 | 037F | B3E9 | 48FF | 0375 | D0E9 | E9FF | FFD5 | 7669 |
| 0000422360 | AA0A | C400 | 065E | 8326 | 00B8 | 00AC | 0374 | CCE9 |
| 0000422400 | FF00 | 0A76 | 016A | 76FF | 8BFC | 0646 | 568B | 0508 |
| 0000422420 | 0034 | 5052 | 4669 | AA0A | 0300 | 0646 | 568B | 2D08 |
| 0000422440 | 5480 | 5052 | 639A | 190D | 8339 | 0EC4 | 4689 | 81FA |
| 0000422460 | FA7E | 019D | 0374 | 8BE9 | 8300 | 0C7E | 7D02 | E903 |
| 0000422500 | 0082 | 76FF | 8B0A | 0646 | 568B | 0508 | 0034 | 5052 |
| 0000422520 | 4669 | AA0A | 0300 | 0646 | 568B | 2D08 | 5480 | 5052 |
| 0000422540 | 609A | 3C37 | 8334 | 0AC4 | 4689 | 81FA | FA7E | 01B8 |

THU MAR 14 17:31:54 1991 DB_PI.DLL PAGE 150, LINE 8792

| | | | | | | | | |
|---|---|---|---|---|---|---|---|---|
| 0000422560 | 0374 | 05E9 | C700 | FA46 | 0000 | 7E83 | 00FA | 0375 |
| 0000422600 | 10E9 | 8100 | FA7E | 01B8 | 0375 | 06E9 | 8B00 | FA46 |
| 0000422620 | 6EE9 | FF00 | 0A76 | 016A | 76FF | 8BFC | 0646 | 568B |
| 0000422640 | 0508 | 0034 | 5052 | 4669 | AA0A | 0300 | 0646 | 568B |
| 0000422660 | 2D08 | 5480 | 5052 | 639A | 530D | 8339 | 0EC4 | 4689 |
| 0000422700 | E9FA | 0006 | 468B | E9FA | 0037 | 2EE9 | FF00 | 0A76 |
| 0000422720 | 016A | 76FF | 8BFC | 0646 | 568B | 0508 | 0034 | 5052 |
| 0000422740 | 4669 | AA0A | 0300 | 0646 | 568B | 2D08 | 5480 | 5052 |
| 0000422760 | 639A | C70D | 8337 | 0EC4 | 4689 | 8BFA | FA46 | 00E9 |
| 0000423000 | 5E00 | 835F | 02ED | E58B | 5D1F | CB4D | 581E | 4590 |
| 0000423020 | 8B55 | 1EEC | D88E | EC81 | 0000 | 5657 | 4669 | AA0A |
| 0000423040 | 0300 | 0646 | 568B | 2D08 | 5480 | 5052 | 5E9A | 8714 |
| 0000423060 | 8338 | 04C4 | 00E9 | 5E00 | 835F | 02ED | E58B | 5D1F |
| 0000423100 | CB4D | 581E | 4590 | 8B55 | 1EEC | D88E | EC81 | 0006 |
| 0000423120 | 5657 | 46C7 | 8CFA | E900 | 0003 | 46FF | 81FA | FA7E |
| 0000423140 | 008F | 037C | 40E9 | 6900 | FA76 | 00AA | 5EC4 | 2606 |
| 0000423160 | B883 | AC00 | 7500 | E903 | 002A | 4669 | AAFA | 0300 |
| 0000423200 | 0646 | 568B | 2D08 | 5480 | 5052 | 5E9A | 8F14 | 8339 |
| 0000423220 | 04C4 | 4689 | 83FC | FC7E | 7500 | E903 | 0006 | 468B |
| 0000423240 | E9FC | 0009 | B3E9 | B8FF | 0000 | 00E9 | 5E00 | 835F |
| 0000423260 | 02ED | E58B | 5D1F | CB4D | 581E | 4590 | 8B55 | 1EEC |
| 0000423300 | D88E | EC81 | 0004 | 5657 | 46C7 | 00FC | 8B00 | 0646 |
| 0000423320 | 568B | 0508 | 0034 | 5052 | 4669 | AA0A | 0300 | 0646 |
| 0000423340 | 568B | 2D08 | 5480 | 5052 | 389A | ED28 | 8339 | 08C4 |
| 0000423360 | 4689 | 83FC | FC7E | 7400 | E903 | 000F | 7669 | AA0A |
| 0000423400 | C400 | 065E | C726 | 0080 | 00AC | 8B00 | FC46 | 00E9 |
| 0000423420 | 5E00 | 835F | 02ED | E58B | 5D1F | CB4D | 581E | 4590 |
| 0000423440 | 8B55 | 1EEC | D88E | EC81 | 0008 | 5657 | 46C7 | 00FC |
| 0000423460 | C700 | F846 | 008C | 03E9 | FF00 | F846 | 7E81 | 8FF8 |
| 0000423500 | 7C00 | E903 | 004A | 468B | 8B06 | 0856 | 3405 | 5200 |
| 0000423520 | 6950 | F846 | 00AA | 4603 | 8B06 | 0856 | 802D | 5254 |
| 0000423540 | 9A50 | 259C | 3A4B | C483 | 8908 | FA46 | 7E83 | 00FA |
| 0000423560 | 0375 | 09E9 | 8B00 | FA46 | 4689 | E9FC | 000F | 7669 |
| 0000423600 | AAF8 | C400 | 065E | C726 | 0080 | 00AC | E900 | FFA9 |
| 0000423620 | 468B | E9FC | 0000 | 5F5E | ED83 | 8B02 | 1FE5 | 4D5D |
| 0000423640 | 1ECB | 9058 | 5545 | EC8B | 8E1E | 81D8 | 3AEC | 5700 |
| 0000423660 | C756 | CA46 | 0000 | 468D | 89F6 | C646 | 568C | C7C8 |
| 0000423700 | CC46 | 0028 | 468D | 16CE | 8D50 | CC46 | 5016 | 76FF |
| 0000423720 | FFC8 | C676 | 76FF | 6ACA | 690C | 0A46 | 00AA | 4603 |
| 0000423740 | 8B06 | 0856 | 802D | 5254 | 9A50 | D81B | 3B81 | C483 |
| 0000423760 | 8914 | FA46 | 7E83 | 00FA | 0375 | 10E9 | 8100 | FA7E |
| 0000424000 | 01FA | 0375 | 06E9 | 8B00 | FA46 | 77E9 | C701 | FA46 |
| 0000424020 | 0000 | 46C7 | 05FC | 8B00 | FC46 | E0C1 | 5002 | 3E9A |
| 0000424040 | D424 | 833B | 02C4 | 5EC4 | 2610 | 0789 | 8926 | 0257 |
| 0000424060 | 5EC4 | 2610 | 478B | 2602 | 070B | 0374 | 06E9 | B800 |
| 0000424100 | 0007 | 3FE9 | 8301 | FA7E | 7400 | E903 | 00AE | 5EC4 |
| 0000424120 | 8B0C | FC46 | 3926 | 7307 | E903 | 003C | 4683 | 05FC |
| 0000424140 | 468B | C1FC | 02E0 | C450 | 105E | FF26 | 0277 | FF26 |
| 0000424160 | 9A37 | 32A4 | 3C42 | C483 | C406 | 105E | 8926 | 2607 |
| 0000424200 | 5789 | C402 | 105E | 8B26 | 0247 | 0B26 | 7407 | E903 |
| 0000424220 | 0006 | 07B8 | E900 | 00EC | 5EC4 | 260C | 1F8B | E3C1 |
| 0000424240 | C402 | 1076 | C426 | 8B34 | CE46 | 568B | 26D0 | 0089 |
| 0000424260 | 8926 | 0250 | 5EC4 | 260C | 07FF | 468D | 16CE | 8D50 |
| 0000424300 | CC46 | 5016 | 76FF | FFC8 | C676 | 76FF | 6ACA | 6906 |
| 0000424320 | 0A46 | 00AA | 4603 | 8B06 | 0856 | 802D | 5254 | 9A50 |
| 0000424340 | D81B | 3C8B | C483 | 8914 | FA46 | 7E81 | FAFA | 7401 |
| 0000424360 | E903 | 0005 | 46C7 | 00FA | E900 | FF49 | 7E81 | BCFA |
| 0000424400 | 7401 | E903 | 0052 | 5EC4 | 8B0C | FC46 | 3926 | 7207 |
| 0000424420 | E903 | 003B | 5EC4 | 260C | 078B | E0C1 | 5002 | 5EC4 |

THU MAR 14 17:31:54 1991 DB_PI.DLL PAGE 151, LINE 8851

| | | | | | | | | |
|---|---|---|---|---|---|---|---|---|
| 0000424440 | 2610 | 77FF | 2602 | 37FF | A49A | C532 | 833C | 06C4 |
| 0000424460 | 5EC4 | 2610 | 0789 | 8926 | 0257 | 5EC4 | 2610 | 478B |
| 0000424500 | 2602 | 070B | 0374 | 06E9 | B800 | 0007 | 35E9 | B800 |
| 0000424520 | 0000 | 2FE9 | E900 | 002C | 5EC4 | 2610 | 77FF | 2602 |
| 0000424540 | 37FF | 489A | 4924 | 8336 | 04C4 | 5EC4 | 2B10 | 26C0 |
| 0000424560 | 4789 | 2602 | 0789 | 5EC4 | 260C | 07C7 | 0000 | 468B |
| 0000424600 | E9FA | 0000 | 5F5E | ED83 | 8B02 | 1FE5 | 4D5D | 00CB |
| 0000424620 | 581E | 4590 | 8B55 | 1EEC | D88E | EC81 | 000A | 5657 |
| 0000424640 | 468A | 880A | FC46 | 468B | 8B06 | 0856 | 4689 | 89F8 |
| 0000424660 | FA56 | 7EC4 | 8B06 | 0C4E | C033 | 468A | F3FC | 75AE |
| 0000424700 | C607 | F646 | E900 | 0004 | 46C6 | 01F6 | C28C | 458D |
| 0000424720 | 80FF | F67E | 7500 | E903 | 0003 | 09E9 | B800 | 0000 |
| 0000424740 | 00BA | E900 | 0000 | 5F5E | ED83 | 8B02 | 1FE5 | 4D5D |
| 0000424760 | 00CB | 581E | 4590 | 8B55 | 1EEC | D88E | EC81 | 000u |
| 0000425000 | 5657 | 76FF | FF08 | 0676 | 76FF | FF0C | 0A76 | 509A |
| 0000425020 | 8327 | 833D | 08C4 | 681E | 12E0 | 76FF | FF0C | 0A76 |
| 0000425040 | 0A9A | 9527 | 833D | 08C4 | 681E | 12E2 | 76FF | FF0C |
| 0000425060 | 0A76 | 0A9A | 4C27 | 833B | 08C4 | 00B8 | E900 | 0000 |
| 0000425100 | 5F5E | ED83 | 8B02 | 1FE5 | 4D5D | 1ECB | 9058 | 5545 |
| 0000425120 | EC8B | 8E1E | 81D8 | 06EC | 5700 | 1E56 | FA68 | 9A12 |
| 0000425140 | 2A08 | 3DEF | C483 | 8904 | FA46 | 5689 | 8BFC | FC46 |
| 0000425160 | 460B | 74FA | E903 | 0008 | 46C7 | F6FA | 8C12 | FC5E |
| 0000425200 | 76FF | FFFC | FA76 | 76FF | FF08 | 0676 | 509A | FD27 |
| 0000425220 | 833D | 08C4 | 76FF | FFFC | FA76 | B09A | 1E27 | 833E |
| 0000425240 | 04C4 | F08B | 5EC4 | 26FA | 7880 | 5CFF | 0375 | 12E9 |
| 0000425260 | 1E00 | 0868 | FF13 | 0876 | 76FF | 9A06 | 270A | 3E30 |
| 0000425300 | C483 | 1E08 | CA68 | FF13 | 0876 | 76FF | 9A06 | 270A |
| 0000425320 | 3D71 | C483 | B808 | 0000 | 00E9 | 5E00 | 835F | 02ED |
| 0000425340 | E58B | 5D1F | CB4D | 581E | 4590 | 8B55 | 1EEC | D88E |
| 0000425360 | EC81 | 0006 | 5657 | 76FF | FF08 | 0676 | 329A | FEE3 |
| 0000425400 | 8337 | 04C4 | 5C6A | 76FF | FF08 | 0676 | 3E9A | 9B3C |
| 0000425420 | 833E | 06C4 | 4689 | 89FA | FC56 | 468B | 0BFC | FA46 |
| 0000425440 | 0374 | 06E9 | B800 | 01B1 | 2DE9 | FF00 | FA46 | 681E |
| 0000425460 | 1315 | 76FF | FFFC | FA76 | 509A | AD27 | 833E | 08C4 |
| 0000425500 | 681E | 131D | 76FF | FFFC | FA76 | 0A9A | C227 | 833D |
| 0000425520 | 08C4 | 00B8 | E900 | 0000 | 5F5E | ED83 | 8B02 | 1FE5 |
| 0000425540 | 4D5D | 1ECB | 9058 | 5545 | EC8B | 8E1E | 81D8 | 34EC |
| 0000425560 | 5702 | 1E56 | FFB8 | 8EFF | C7D8 | FA46 | 1328 | 5E8C |
| 0000425600 | C7FC | E846 | 0101 | C02B | 8689 | FEDA | 8689 | FED8 |
| 0000425620 | 068E | 3A94 | 8326 | FF3E | 00FF | 0375 | 1EE9 | FF00 |
| 0000425640 | F436 | FF12 | F236 | 8D12 | D086 | 16FE | 9A50 | FFFF |
| 0000425660 | 0000 | C483 | 3D08 | 0000 | 0374 | 0FE9 | 8E00 | 9606 |
| 0000425700 | 263A | 3E83 | 3FAF | 7500 | E903 | 003C | 681E | 132F |
| 0000425720 | 468D | 16DC | 8D50 | D086 | 16FE | 8D50 | F446 | 5016 |
| 0000425740 | 1A68 | 1E01 | 3668 | FF13 | F036 | FF12 | EE36 | FF12 |
| 0000425760 | F436 | FF12 | F236 | 9A12 | FFFF | 0000 | C483 | 891E |
| 0000426000 | F446 | 5689 | E9F6 | 0008 | C02B | 4689 | 89F6 | F446 |
| 0000426020 | 46C7 | 00F2 | 2B00 | 89C0 | CE86 | 89FD | CC86 | C7FD |
| 0000426040 | F046 | 0000 | 468B | 0B12 | 1046 | 0374 | 84E9 | 8E00 |
| 0000426060 | 9406 | 263A | 3E83 | 408E | 7500 | E903 | 000A | BE83 |
| 0000426100 | FED4 | 74FE | E903 | 000F | 068E | 3A96 | 8326 | A73E |
| 0000426120 | 0040 | 0375 | 56E9 | C700 | D686 | 17FE | FF00 | DAB6 |
| 0000426140 | FFFE | D8B6 | 8DFE | D686 | 16FE | FF50 | E876 | 76FF |
| 0000426160 | FFFC | FA76 | 4E8D | 16DC | 8D51 | F44E | 5116 | 8E8D |
| 0000426200 | FED0 | 5116 | 681E | 1336 | 2668 | FF01 | F036 | FF12 |
| 0000426220 | EE36 | FF12 | F436 | FF12 | F236 | 9A12 | 40F5 | 0000 |
| 0000426240 | C483 | 8B28 | D686 | E9FE | 094D | 06E9 | B800 | 0017 |
| 0000426260 | 44E9 | 8B09 | 0C46 | 460B | 740A | E903 | 000A | 868D |
| 0000426300 | FDD0 | 4689 | 8C0A | 0C56 | 468B | 0B08 | 0646 | 0374 |

THU MAR 14 17:31:54 1991 DB_PI.DLL PAGE 152, LINE 8910

| | | | | | | | | |
|---|---|---|---|---|---|---|---|---|
| 0000426320 | 09E9 | 8D00 | F846 | 4689 | 8C06 | 0856 | 5EC4 | 2610 |
| 0000426340 | 478B | 2602 | 070B | 0374 | C1E9 | 8B00 | 1646 | 460B |
| 0000426360 | 7414 | E903 | 0008 | 46C7 | 01F2 | E900 | 00AE | 468B |
| 0000426400 | 8B14 | 1656 | 4689 | 89EA | EC56 | 76FF | FF16 | 1476 |
| 0000426420 | 76FF | FF12 | 1076 | 609A | 3E35 | 8941 | F046 | 7E83 |
| 0000426440 | 00F0 | 0375 | 85E9 | 8E00 | 9406 | 263A | 3E83 | 4153 |
| 0000426460 | 7500 | E903 | 000A | BE83 | FED4 | 74FE | E903 | 000F |
| 0000426500 | 068E | 3A96 | 8326 | 6C3E | 0041 | 0375 | 57E9 | 8B00 |
| 0000426520 | F046 | 8689 | FED6 | B6FF | FEDA | B6FF | FED8 | 868D |
| 0000426540 | FED6 | 5016 | 76FF | FFE8 | FC76 | 76FF | 8DFA | DC4E |
| 0000426560 | 5116 | 4E8D | 16F4 | 8D51 | D08E | 16FE | 1E51 | 3668 |
| 0000426600 | 6813 | 0132 | 36FF | 12F0 | 36FF | 12EE | 36FF | 12F4 |
| 0000426620 | 36FF | 12F2 | BA9A | 0041 | 8300 | 28C4 | 868B | FED6 |
| 0000426640 | 54E9 | E908 | 0006 | 468B | E9F0 | 084B | 7E83 | 00F2 |
| 0000426660 | 0374 | 2EE9 | C400 | 105E | 8126 | C83F | 7400 | E903 |
| 0000426700 | 000A | 8326 | 027F | 7500 | E903 | 0017 | 5EC4 | 2610 |
| 0000426720 | 77FF | 2602 | 37FF | 468D | 16EA | 9A50 | 3906 | 2A34 |
| 0000426740 | 4689 | 83F0 | F07E | 7500 | E903 | 0085 | 068E | 3A94 |
| 0000426760 | 8326 | 223E | 0042 | 0375 | 0AE9 | 8300 | D4BE | FEFE |
| 0000427000 | 0374 | 0FE9 | 8E00 | 9606 | 263A | 3E83 | 423B | 7500 |
| 0000427020 | E903 | 0057 | 468B | 89F0 | D686 | FFFE | DAB6 | FFFE |
| 0000427040 | D8B6 | 8DFE | D686 | 16FE | FF50 | E876 | 76FF | FFFC |
| 0000427060 | FA76 | 4E8D | 16DC | 8D51 | F44E | 5116 | 8E8D | FED0 |
| 0000427100 | 5116 | 681E | 1336 | 3968 | FF01 | F036 | FF12 | EE36 |
| 0000427120 | FF12 | F436 | FF12 | F236 | 9A12 | 4289 | 0000 | C483 |
| 0000427140 | 8B28 | D686 | E9FE | 078F | 06E9 | 8B00 | F046 | 86E9 |
| 0000427160 | 8D07 | CC86 | 16FD | C450 | 105E | FF26 | 0277 | FF26 |
| 0000427200 | 9A37 | E82C | 4213 | C483 | 8908 | F046 | 7E83 | 00F0 |
| 0000427220 | 0374 | ABE9 | 8300 | 0E7E | 7400 | E903 | 00A2 | 868D |
| 0000427240 | FDCC | 5016 | 006A | 5EC4 | 2610 | 77FF | 2602 | 37FF |
| 0000427260 | A69A | 5FE3 | 833E | 0AC4 | 4689 | 8EF0 | 9406 | 263A |
| 0000427300 | 3E83 | 3EF7 | 7500 | E903 | 000A | BE83 | FED4 | 74FE |
| 0000427320 | E903 | 000F | 068E | 3A96 | 8326 | FF3E | 00FF | 0375 |
| 0000427340 | 57E9 | 8B00 | F046 | 8689 | FED6 | B6FF | FEDA | B6FF |
| 0000427360 | FED8 | 868D | FED6 | 5016 | 76FF | FFE8 | FC76 | 76FF |
| 0000427400 | 8DFA | DC4E | 5116 | 4E8D | 16F4 | 8D51 | D08E | 16FE |
| 0000427420 | 1E51 | 3668 | 6813 | 0142 | 36FF | 12F0 | 36FF | 12EE |
| 0000427440 | 36FF | 12F4 | 36FF | 12F2 | FF9A | 00FF | 8300 | 28C4 |
| 0000427460 | 868B | FED6 | C0E9 | E906 | 0006 | 468B | E9F0 | 06B7 |
| 0000427500 | 868D | FDCC | 5016 | 016A | 5EC4 | 2610 | 77FF | 2602 |
| 0000427520 | 37FF | A69A | 74E3 | 8343 | 0AC4 | 4689 | 83F0 | F07E |
| 0000427540 | 7500 | E903 | 0085 | 068E | 3A94 | 8326 | 803E | 0043 |
| 0000427560 | 0375 | 0AE9 | 8300 | D4BE | FEFE | 0374 | 0FE9 | 8E00 |
| 0000427600 | 9606 | 263A | 3E83 | 4399 | 7500 | E903 | 0057 | 468B |
| 0000427620 | 89F0 | D686 | FFFE | DAB6 | FFFE | D8B6 | 8DFE | D686 |
| 0000427640 | 16FE | FF50 | E876 | 76FF | FFFC | FA76 | 4E8D | 16DC |
| 0000427660 | 8D51 | F44E | 5116 | 8E8D | FED0 | 5116 | 681E | 1336 |
| 0000427700 | 4968 | FF01 | F036 | FF12 | EE36 | FF12 | F436 | FF12 |
| 0000427720 | F236 | 9A12 | 43E7 | 0000 | C483 | 8B28 | D686 | E9FE |
| 0000427740 | 0615 | 06E9 | 8B00 | F046 | 0CE9 | 8D06 | DC86 | 16FE |
| 0000427760 | 9A50 | 3E46 | 442E | C483 | 8904 | F046 | 7E83 | 00F0 |
| 0000430000 | 0375 | 99E9 | 6A00 | C401 | 105E | FF26 | 0277 | FF26 |
| 0000430020 | 9A37 | E6D3 | 4465 | C483 | 8E06 | 9406 | 263A | 3E83 |
| 0000430040 | 4471 | 7500 | E903 | 000A | BE83 | FED4 | 74FE | E903 |
| 0000430060 | 000F | 068E | 3A96 | 8326 | 8A3E | 0044 | 0375 | 57E9 |
| 0000430100 | 8B00 | F046 | 8689 | FED6 | B6FF | FEDA | B6FF | FED8 |
| 0000430120 | 868D | FED6 | 5016 | 76FF | FFE8 | FC76 | 76FF | 8DFA |
| 0000430140 | DC4E | 5116 | 4E8D | 16F4 | 8D51 | D08E | 16FE | 1E51 |
| 0000430160 | 3668 | 6813 | 0151 | 36FF | 12F0 | 36FF | 12EE | 36FF |

THU MAR 14 17:31:54 1991 DB_PI.DLL PAGE 153, LINE 8969

| | | | | | | | | |
|---|---|---|---|---|---|---|---|---|
| 0000430200 | 12F4 | 36FF | 12F2 | D89A | 0044 | 8300 | 28C4 | 868B |
| 0000430220 | FED6 | 62E9 | E905 | 0006 | 468B | E9F0 | 0559 | 468D |
| 0000430240 | 16EE | FF50 | 0876 | 76FF | FF06 | 0C76 | 76FF | 680A |
| 0000430260 | 4416 | FF68 | 68FF | 464F | FF68 | FFFF | CEB6 | FFFD |
| 0000430300 | CCB6 | 6AFD | 8D01 | DC8E | 16FE | 9A51 | 7B98 | 4593 |
| 0000430320 | C483 | 891E | F046 | 7E83 | 08F0 | 0374 | 0EE9 | 8300 |
| 0000430340 | EE7E | 7500 | E903 | 0005 | 46C7 | 00F0 | 8300 | F07E |
| 0000430360 | 7500 | E903 | 0099 | 016A | 5EC4 | 2610 | 77FF | 2602 |
| 0000430400 | 37FF | D39A | B3E6 | 8345 | 06C4 | 068E | 3A94 | 8326 |
| 0000430420 | 0D3E | 0045 | 0375 | 0AE9 | 8300 | D4BE | FEFE | 0374 |
| 0000430440 | 0FE9 | 8E00 | 9606 | 263A | 3E83 | 4526 | 7500 | E903 |
| 0000430460 | 0057 | 468B | 89F0 | D686 | FFFE | DAB6 | FFFE | D8B6 |
| 0000430500 | 8DFE | D686 | 16FE | FF50 | E876 | 76FF | FFFC | FA76 |
| 0000430520 | 4E8D | 16DC | 8D51 | F44E | 5116 | 8E8D | FED0 | 5116 |
| 0000430540 | 681E | 1336 | 5C68 | FF01 | F036 | FF12 | EE36 | FF12 |
| 0000430560 | F436 | FF12 | F236 | 9A12 | 4573 | 0000 | C483 | 8B28 |
| 0000430600 | D686 | E9FE | 0471 | 06E9 | 8B00 | F046 | 68E9 | C404 |
| 0000430620 | 105E | 8126 | C83F | 7400 | E903 | 008E | 8326 | 027F |
| 0000430640 | 7400 | E903 | 0084 | 068E | 3A94 | 8326 | BF3E | 0045 |
| 0000430660 | 0375 | 0AE9 | 8300 | D4BE | FEFE | 0374 | 0FE9 | 8E00 |
| 0000430700 | 9606 | 263A | 3E83 | 45D8 | 7500 | E903 | 0056 | 86C7 |
| 0000430720 | FED6 | 0000 | B6FF | FEDA | B6FF | FED8 | 868D | FED6 |
| 0000430740 | 5016 | 76FF | FFE8 | FC76 | 76FF | 8DFA | DC4E | 5116 |
| 0000430760 | 4E8D | 16F4 | 8D51 | D08E | 16FE | 1E51 | 3668 | 6813 |
| 0000431000 | 0161 | 36FF | 12F0 | 36FF | 12EE | 36FF | 12F4 | 36FF |
| 0000431020 | 12F2 | 269A | 0046 | 8300 | 28C4 | 868B | FED6 | D6E9 |
| 0000431040 | E903 | 0006 | 00B8 | E900 | 03CD | 868D | FEDC | 5016 |
| 0000431060 | AB9A | C33D | 8338 | 04C4 | 4689 | 83F0 | F07E | 7500 |
| 0000431100 | E903 | 0099 | 016A | 5EC4 | 2610 | 77FF | 2602 | 37FF |
| 0000431120 | D39A | E4E6 | 8341 | 06C4 | 068E | 3A94 | 8326 | 963E |
| 0000431140 | 003F | 0375 | 0AE9 | 8300 | D4BE | FEFE | 0374 | 0FE9 |
| 0000431160 | 8E00 | 9606 | 263A | 3E83 | 3F24 | 7500 | E903 | 0057 |
| 0000431200 | 468B | 89F0 | D686 | FFFE | DAB6 | FFFE | D8B6 | 8DFE |
| 0000431220 | D686 | 16FE | FF50 | E876 | 76FF | FFFC | FA76 | 4E8D |
| 0000431240 | 16DC | 8D51 | F44E | 5116 | 8E8D | FED0 | 5116 | 681E |
| 0000431260 | 1336 | 6A68 | FF01 | F036 | FF12 | EE36 | FF12 | F436 |
| 0000431300 | FF12 | F236 | 9A12 | 3FFC | 0000 | C483 | 8B28 | D686 |
| 0000431320 | E9FE | 0323 | 06E9 | 8B00 | F046 | 1AE9 | 8D03 | EE46 |
| 0000431340 | 5016 | 76FF | FF08 | 0676 | 76FF | FF0C | 0A76 | C468 |
| 0000431360 | 683A | 4805 | 0268 | 6848 | 480B | B6FF | FDCE | B6FF |
| 0000431400 | FDCC | 016A | 8E8D | FEDC | 5116 | 989A | 467B | 8347 |
| 0000431420 | 1EC4 | 4689 | 83F0 | F07E | 7408 | E903 | 000E | 7E83 |
| 0000431440 | 00EE | 0375 | 05E9 | C700 | F046 | 0000 | 7E83 | 00F0 |
| 0000431460 | 0375 | 99E9 | 6A00 | C401 | 105E | FF26 | 0277 | FF26 |
| 0000431500 | 9A37 | E6D3 | 4766 | C483 | 8E06 | 9406 | 263A | 3E83 |
| 0000431520 | 4772 | 7500 | E903 | 000A | BE83 | FED4 | 74FE | E903 |
| 0000431540 | 000F | 068E | 3A96 | 8326 | 8B3E | 0047 | 0375 | 57E9 |
| 0000431560 | 8B00 | F046 | 8689 | FED6 | B6FF | FEDA | B6FF | FED8 |
| 0000431600 | 868D | FED6 | 5016 | 76FF | FFE8 | FC76 | 76FF | 8DFA |
| 0000431620 | DC4E | 5116 | 4E8D | 16F4 | 8D51 | D08E | 16FE | 1E51 |
| 0000431640 | 3668 | 6813 | 0175 | 36FF | 12F0 | 36FF | 12EE | 36FF |
| 0000431660 | 12F4 | 36FF | 12F2 | D99A | 0047 | 8300 | 28C4 | 868B |
| 0000431700 | FED6 | 32E9 | E902 | 0006 | 468B | E9F0 | 0229 | 7E83 |
| 0000431720 | 00F2 | 0374 | [illegible]3E9 | 8D01 | DC86 | 16FE | FF50 | EC76 |
| 0000431740 | 76FF | 9AEA | 3D52 | 4820 | C483 | 8908 | F046 | 7E83 |
| 0000431760 | 00F0 | 0375 | 99E9 | 6A00 | C401 | 105E | FF26 | 0277 |
| 0000432000 | FF26 | 9A37 | E6D3 | 4849 | C483 | 8E06 | 9406 | 263A |
| 0000432020 | 3E83 | 4855 | 7500 | E903 | 000A | BE83 | FED4 | 74FE |
| 0000432040 | E903 | 000F | 068E | 3A96 | 8326 | 6E3E | 0048 | 0375 |

THU MAR 14 17:31:54 1991 DB_PI.DLL PAGE 154, LINE 9028

| | | | | | | | | |
|---|---|---|---|---|---|---|---|---|
| 0000432060 | 57E9 | 8B00 | F046 | 8689 | FED6 | B6FF | FEDA | B6FF |
| 0000432100 | FED8 | 868D | FED6 | 5016 | 76FF | FFE8 | FC76 | 76FF |
| 0000432120 | 8DFA | DC4E | 5116 | 4E8D | 16F4 | 8D51 | D08E | 16FE |
| 0000432140 | 1E51 | 3668 | 6813 | 0180 | 36FF | 12F0 | 36FF | 12EE |
| 0000432160 | 36FF | 12F4 | 36FF | 12F2 | BB9A | 0048 | 8300 | 28C4 |
| 0000432200 | 868B | FED6 | 70E9 | E901 | 0006 | 468B | E9F0 | 0167 |
| 0000432220 | 468D | 16EE | FF50 | 0876 | 76FF | FF06 | 0C76 | 76FF |
| 0000432240 | 680A | 4808 | 1368 | 6844 | 4410 | 1968 | FF44 | CEB6 |
| 0000432260 | FFFD | CCB6 | 6AFD | 8D00 | DC8E | 16FE | 9A51 | 7B98 |
| 0000432300 | 4354 | C483 | 891E | F046 | 7E83 | 08F0 | 0374 | A1E9 |
| 0000432320 | 8300 | EE7E | 7500 | E903 | 0098 | 016A | 5EC4 | 2610 |
| 0000432340 | 77FF | 2602 | 37FF | D39A | B5E6 | 8342 | 06C4 | 068E |
| 0000432360 | 3A94 | 8326 | D93E | 0048 | 0375 | 0AE9 | 8300 | D4BE |
| 0000432400 | FEFE | 0374 | 0FE9 | 8E00 | 9606 | 263A | 3E83 | 48F2 |
| 0000432420 | 7500 | E903 | 0056 | 86C7 | FED6 | 0000 | B6FF | FEDA |
| 0000432440 | B6FF | FED8 | 868D | FED6 | 5016 | 76FF | FFE8 | FC76 |
| 0000432460 | 76FF | 8DFA | DC4E | 5116 | 4E8D | 16F4 | 8D51 | D08E |
| 0000432500 | 16FE | 1E51 | 3668 | 6813 | 018C | 36FF | 12F0 | 36FF |
| 0000432520 | 12EE | 36FF | 12F4 | 36FF | 12F2 | 409A | 0049 | 8300 |
| 0000432540 | 28C4 | 868B | FED6 | 8EE9 | E900 | 0006 | 00B8 | E900 |
| 0000432560 | 0085 | 068E | 3A94 | 8326 | CD3E | 0042 | 0375 | 0AE9 |
| 0000432600 | 8300 | D4BE | FEFE | 0374 | 0FE9 | 8E00 | 9606 | 263A |
| 0000432620 | 3E83 | 42E6 | 7500 | E903 | 0057 | 468B | 89F0 | D686 |
| 0000432640 | FFFE | DAB6 | FFFE | D8B6 | 8DFE | D686 | 16FE | FF50 |
| 0000432660 | E876 | 76FF | FFFC | FA76 | 4E8D | 16DC | 8D51 | F44E |
| 0000432700 | 5116 | 8E8D | FED0 | 5116 | 681E | 1336 | 9168 | FF01 |
| 0000432720 | F036 | FF12 | EE36 | FF12 | F436 | FF12 | F236 | 9A12 |
| 0000432740 | 4334 | 0000 | C483 | 8B28 | D686 | E9FE | 0009 | 06E9 |
| 0000432760 | 8B00 | F046 | 00E9 | 1F00 | 5F5E | ED83 | 8B02 | 1FE5 |
| 0000433000 | 4D5D | 12CA | 1E00 | 9058 | 5545 | EC8B | 8E1E | 81D8 |
| 0000433020 | 24EC | 5700 | 1E56 | D5B8 | 8E3E | C7D8 | FA46 | 1342 |
| 0000433040 | 5E8C | C7FC | F446 | 0101 | C02B | 4689 | 89E6 | E446 |
| 0000433060 | 068E | 3A94 | 8326 | 153E | 004A | 0375 | 1DE9 | FF00 |
| 0000433100 | F436 | FF12 | F236 | 8D12 | DC46 | 5016 | 0E9A | 003F |
| 0000433120 | 8300 | 08C4 | 003D | 7400 | E903 | 000F | 068E | 3A96 |
| 0000433140 | 8326 | 2D3E | 004A | 0375 | 3BE9 | 1E00 | 4968 | 8D13 |
| 0000433160 | E846 | 5016 | 468D | 16DC | 8D50 | F646 | 5016 | B868 |
| 0000433200 | 1E01 | 5068 | FF13 | F036 | FF12 | EE36 | FF12 | F436 |
| 0000433220 | FF12 | F236 | 9A12 | 3F58 | 0000 | C483 | 891E | F646 |
| 0000433240 | 5689 | E9F8 | 0008 | C02B | 4689 | 89F8 | F646 | 068E |
| 0000433260 | 3A94 | 8326 | B03E | 0046 | 0375 | 09E9 | 8300 | E07E |
| 0000433300 | 74FE | E903 | 000F | 068E | 3A96 | 8326 | C93E | 0046 |
| 0000433320 | 0375 | 5FE9 | FF00 | 0676 | 76FF | FF0A | 0876 | D39A |
| 0000433340 | A0E6 | 834A | 06C4 | 4689 | FFE2 | E676 | 76FF | 8DE4 |
| 0000433360 | E246 | 5016 | 76FF | FFF4 | FC76 | 76FF | 8DFA | E84E |
| 0000433400 | 5116 | 4E8D | 16F6 | 8D51 | DC4E | 5116 | 681E | 1350 |
| 0000433420 | BA68 | FF01 | F036 | FF12 | EE36 | FF12 | F436 | FF12 |
| 0000433440 | F236 | 9A12 | 4717 | 0000 | C483 | 8B28 | E246 | 17E9 |
| 0000433460 | E900 | 0014 | 76FF | FF06 | 0A76 | 76FF | 9A08 | E6D3 |
| 0000433500 | 46A4 | C483 | E906 | 0000 | 5E1F | 835F | 02ED | E58B |
| 0000433520 | 5D1F | CA4D | 0006 | 581E | 4590 | 8B55 | 1EEC | D88E |
| 0000433540 | EC81 | 000C | 5657 | 468B | E90A | 0198 | 76FF | FF0E |
| 0000433560 | 0C76 | 681E | 135E | 76FF | FFD8 | 0676 | 9A9A | 0C31 |
| 0000433600 | 834B | 0CC4 | 7548 | E903 | 0006 | BFB8 | E901 | 0196 |
| 0000433620 | 00B8 | E900 | 0190 | 87E9 | FF01 | 0E76 | 76FF | 1E0C |
| 0000433640 | 6268 | FF13 | 0876 | 76FF | 9A06 | 319A | 4B39 | C483 |
| 0000433660 | 480C | 0375 | 06E9 | B800 | 01BF | 69E9 | B801 | 0000 |
| 0000433700 | 63E9 | E901 | 015A | 76FF | FF0E | 0C76 | 681E | 1366 |
| 0000433720 | 76FF | FF08 | 0676 | 9A9A | 6F31 | 833E | 0CC4 | 7448 |

THU MAR 14 17:31:54 1991 DB_PI.DLL PAGE 155, LINE 9087

| | | | | | | | | |
|---|---|---|---|---|---|---|---|---|
| 0000433740 | E903 | 0009 | 00B8 | E900 | 013C | 23E9 | 8D00 | F846 |
| 0000433760 | 5016 | 681E | 1369 | 76FF | FF08 | 0676 | 9A9A | 9431 |
| 0000434000 | 834B | 0CC4 | 7548 | E903 | 0006 | BFB8 | E901 | 0116 |
| 0000434020 | 46C6 | 00FD | 468D | 89F8 | F446 | 568C | C4F6 | F45E |
| 0000434040 | 8026 | 003F | 0375 | 1CE9 | C400 | F45E | 8A26 | 9807 |
| 0000434060 | 9A50 | 29F2 | 4BB1 | C483 | C402 | F45E | 8826 | FF07 |
| 0000434100 | F446 | D8E9 | 1EFF | 6D68 | 8D13 | F846 | 5016 | 869A |
| 0000434120 | CA27 | 834B | 08C4 | 003D | 7500 | E903 | 005F | 681E |
| 0000434140 | 1372 | 468D | 16F8 | 9A50 | 2786 | 4BL3 | C483 | 3D08 |
| 0000434160 | 0000 | 0375 | 46E9 | 1E00 | 7568 | 8D13 | F846 | 5016 |
| 0000434200 | 869A | FC27 | 834B | 08C4 | 003D | 7500 | E903 | 0022 |
| 0000434220 | 681E | 137B | 468D | 16F8 | 9A50 | 2786 | 4C41 | C483 |
| 0000434240 | 3D08 | 0000 | 0375 | 09E9 | B800 | 01BF | 77E9 | E900 |
| 0000434260 | 0008 | 5EC4 | 260C | 07C7 | 0000 | 08E9 | C400 | 0C5E |
| 0000434300 | C726 | 0107 | B800 | 0000 | 5BE9 | E900 | 0052 | 76FF |
| 0000434320 | FF0E | 0C76 | 681E | 137F | 76FF | FF08 | 0676 | 9A9A |
| 0000434340 | DF31 | 834A | 0CC4 | 7548 | E903 | 0006 | BFB8 | E901 |
| 0000434360 | 0034 | 00B8 | E900 | 002E | 25E9 | B800 | 01AD | 25E9 |
| 0000434400 | E900 | 001C | C00B | 0375 | 61E9 | 48FE | 0375 | 88E9 |
| 0000434420 | 48FE | 0375 | B7E9 | 48FF | 0375 | A9E9 | E9FE | FFDB |
| 0000434440 | 00B8 | E900 | 0000 | 5F5E | ED83 | 8B02 | 1FE5 | 4D5D |
| 0000434460 | 1ECB | 9058 | 5545 | EC8B | 8E1E | 81D8 | 54EC | 5700 |
| 0000434500 | 1E56 | 77B8 | 8E49 | C7D8 | FA46 | 1382 | 5E8C | C7FC |
| 0000434520 | F046 | 0101 | C02B | 4689 | 89DE | DC46 | 068E | 3A94 |
| 0000434540 | 8326 | AB3E | 004D | 0375 | 1DE9 | FF00 | F436 | FF12 |
| 0000434560 | F236 | 8D12 | D446 | 5016 | AD9A | 0049 | 8300 | 08C4 |
| 0000434600 | 003D | 7400 | E903 | 000F | 068E | 3A96 | 8326 | C33E |
| 0000434620 | 004D | 0375 | 3BE9 | 1E00 | 8968 | 8D13 | E446 | 5016 |
| 0000434640 | 468D | 16D4 | 8D50 | F646 | 5016 | 3468 | 1E02 | 9068 |
| 0000434660 | FF13 | F036 | FF12 | EE36 | FF12 | F436 | FF12 | F236 |
| 0000434700 | 9A12 | 49F6 | 0000 | C483 | 891E | F646 | 5689 | E9F8 |
| 0000434720 | 0008 | C02B | 4689 | 89F8 | F646 | 46C7 | 00F2 | 2B00 |
| 0000434740 | 89C0 | CE46 | 4689 | 8BCC | 1246 | 460B | 7510 | E903 |
| 0000434760 | 000D | 98A1 | 8B3A | 9A16 | 893A | D046 | 5689 | 6AD2 |
| 0000435000 | FF1F | 0C76 | 76FF | 8D0A | AC46 | 5016 | 049A | DE28 |
| 0000435020 | 834E | 0AC4 | 46C6 | 00CB | 468D | 16AC | 9A50 | 878C |
| 0000435040 | 4F72 | C483 | 8D04 | CC46 | 5016 | 76FF | FF12 | 1076 |
| 0000435060 | 2C9A | 41E8 | 834A | 08C4 | 4689 | 83F2 | F27E | 7500 |
| 0000435100 | E903 | 007E | 068E | 3A94 | 8326 | 523E | 004E | 0375 |
| 0000435120 | 09E9 | 8300 | D87E | 74FE | E903 | 000F | 068E | 3A96 |
| 0000435140 | 8326 | 6A3E | 004E | 0375 | 51E9 | 8B00 | F246 | 4689 |
| 0000435160 | FFDA | DE76 | 76FF | 8DDC | DA46 | 5016 | 76FF | FFF0 |
| 0000435200 | FC76 | 76FF | 8DFA | E44E | 5116 | 4E8D | 16F6 | 8D51 |
| 0000435220 | D44E | 5116 | 681E | 1390 | 4A68 | FF02 | F036 | FF12 |
| 0000435240 | EE36 | FF12 | F436 | FF12 | F236 | 9A12 | 4EB3 | 0000 |
| 0000435260 | C483 | 8B28 | DA46 | EDE9 | E901 | 0006 | 468B | E9F2 |
| 0000435300 | 01E4 | 468D | 16F4 | 8D50 | E046 | 5016 | 468D | 16AC |
| 0000435320 | FF50 | CE76 | 76FF | 9ACC | 4A1E | 4655 | C483 | 8910 |
| 0000435340 | F246 | 7E83 | 00F2 | 0375 | 7EE9 | 8E00 | 9406 | 263A |
| 0000435360 | 3E83 | 4EEA | 7500 | E903 | 0009 | 7E83 | FED8 | 0374 |
| 0000435400 | 0FE9 | 8E00 | 9606 | 263A | 3E83 | 4F02 | 7500 | E903 |
| 0000435420 | 0051 | 468B | 89F2 | DA46 | 76FF | FFDE | DC76 | 468D |
| 0000435440 | 16DA | FF50 | F076 | 76FF | FFFC | FA76 | 4E8D | 16E4 |
| 0000435460 | 8D51 | F64E | 5116 | 4E8D | 16D4 | 1E51 | 9068 | 6813 |
| 0000435500 | 024E | 36FF | 12F0 | 36FF | 12EE | 36FF | 12F4 | 36FF |
| 0000435520 | 12F2 | 4A9A | 004F | 8300 | 28C4 | 468B | E9DA | 0146 |
| 0000435540 | 06E9 | 8B00 | F246 | 3DE9 | C401 | E05E | 8026 | 7F3F |
| 0000435560 | 0374 | 8BE9 | FF00 | E276 | 76FF | 9AE0 | 2448 | 4F83 |
| 0000435600 | C483 | 8E04 | 9406 | 263A | 3E83 | 4F8F | 7500 | E903 |

THU MAR 14 17:31:54 1991 DB_PI.DLL PAGE 156, LINE 9146

| | | | | | | | | |
|---|---|---|---|---|---|---|---|---|
| 0000435620 | 0009 | 7E83 | FED8 | 0374 | 0FE9 | 8E00 | 9606 | 263A |
| 0000435640 | 3E83 | 4FA7 | 7500 | E903 | 0050 | 46C7 | BFDA | FF01 |
| 0000435660 | DE76 | 76FF | 8DDC | DA46 | 5016 | 76FF | FFF0 | FC76 |
| 0000435700 | 76FF | 8DFA | E44E | 5116 | 4E8D | 16F6 | 8D51 | D44E |
| 0000435720 | 5116 | 681E | 1390 | 5268 | FF02 | F036 | FF12 | EE36 |
| 0000435740 | FF12 | F436 | FF12 | F236 | 9A12 | 4FF0 | 0000 | C483 |
| 0000435760 | 8B28 | DA46 | AFE9 | E900 | 0006 | BFB8 | E901 | 00A6 |
| 0000436000 | 76FF | FF08 | 0676 | 76FF | FF0E | E276 | 76FF | 9AE0 |
| 0000436020 | 4AB6 | 466D | C483 | 890A | F246 | 76FF | FFE2 | E076 |
| 0000436040 | 489A | 5F24 | 834B | 04C4 | 068E | 3A94 | 8326 | 973E |
| 0000436060 | 0049 | 0375 | 09E9 | 8300 | D87E | 74FE | E903 | 000F |
| 0000436100 | 068E | 3A96 | 8326 | C33E | 0049 | 0375 | 51E9 | 8B00 |
| 0000436120 | F246 | 4689 | FFDA | DE76 | 76FF | 8DDC | DA46 | 5016 |
| 0000436140 | 76FF | FFF0 | FC76 | 76FF | 8DFA | E44E | 5116 | 4E8D |
| 0000436160 | 16F6 | 8D51 | D44E | 5116 | 681E | 1390 | 5768 | FF02 |
| 0000436200 | F036 | FF12 | EE36 | FF12 | F436 | FF12 | F236 | 9A12 |
| 0000436220 | 4A84 | 0000 | C483 | 8B28 | DA46 | 09E9 | E900 | 0006 |
| 0000436240 | 468B | E9F2 | 0000 | 5E1F | 835F | 02ED | E58B | 5D1F |
| 0000436260 | CA4D | 000E | 581E | 4590 | 8B55 | 1EEC | D88E | EC81 |
| 0000436300 | 005E | 5657 | B81E | 4CA3 | D88E | 46C7 | A4FA | 8C13 |
| 0000436320 | FC5E | 46C7 | 01E8 | 2B01 | 89C0 | D246 | 4689 | 8ED0 |
| 0000436340 | 9406 | 263A | 3E83 | 4CC3 | 7500 | E9C3 | 001D | 36FF |
| 0000436360 | 12F4 | 36FF | 12F2 | 468D | 16C8 | 9A50 | 4CD9 | 0000 |
| 0000436400 | C483 | 3D08 | 0000 | 0374 | 0FE9 | 8E00 | 9606 | 263A |
| 0000436420 | 3E83 | 4CEF | 7500 | E903 | 003B | 681E | 13AB | 468D |
| 0000436440 | 16DC | 8D50 | C846 | 5016 | 46BD | 16F2 | 6850 | 0290 |
| 0000436460 | 681E | 13B2 | 36FF | 12F0 | 36FF | 12EE | 36FF | 12F4 |
| 0000436500 | 36FF | 12F2 | 229A | 004D | 8300 | 1EC4 | 4689 | 89F2 |
| 0000436520 | F456 | 08E9 | 2B00 | 89C0 | F446 | 4689 | C7F2 | EE46 |
| 0000436540 | 0000 | 46C7 | 00EA | C700 | A246 | 0000 | C02B | 4689 |
| 0000436560 | 89F8 | F646 | C02B | 4689 | 89A6 | A446 | 1F6A | 76FF |
| 0000436600 | FF10 | 0E76 | 468D | 16A8 | 9A50 | 2804 | 5321 | C483 |
| 0000436620 | C60A | C746 | 8D00 | A846 | 5016 | 8C9A | 8087 | 834D |
| 0000436640 | 04C4 | 468D | 16A4 | FF50 | 1676 | 76FF | 9A14 | E82C |
| 0000436660 | 4D93 | C483 | 8908 | EE46 | 7E83 | 00EE | 0375 | 7EE9 |
| 0000436700 | 8E00 | 9406 | 263A | 3E83 | 51CC | 7500 | E903 | 0009 |
| 0000436720 | 7E83 | FECC | 0374 | 0FE9 | 8E00 | 9606 | 263A | 3E83 |
| 0000436740 | 51E4 | 7500 | E903 | 0051 | 468B | 89EE | CE46 | 76FF |
| 0000436760 | FFD2 | D076 | 468D | 16CE | FF50 | E876 | 76FF | FFFC |
| 0000437000 | FA76 | 4E8D | 16DC | 8D51 | F24E | 5116 | 4E8D | 16C8 |
| 0000437020 | 1E51 | B268 | 6813 | 02A6 | 36FF | 12F0 | 36FF | 12EE |
| 0000437040 | 36FF | 12F4 | 36FF | 12F2 | 2C9A | 0052 | 8300 | 28C4 |
| 0000437060 | 468B | E9CE | 0548 | 06E9 | 8B00 | EE46 | 3FE9 | 8B05 |
| 0000437100 | 1246 | A0E9 | C700 | EC46 | 0004 | B4E9 | C700 | EC46 |
| 0000437120 | 0004 | ACE9 | C700 | EC46 | 0002 | A4E9 | C700 | EC46 |
| 0000437140 | 0004 | 9CE9 | 8E00 | 9406 | 263A | 3E83 | 5291 | 7500 |
| 0000437160 | E903 | 0009 | 7E83 | FECC | 0374 | 0FE9 | 8E00 | 9606 |
| 0000437200 | 263A | 3E83 | 52A9 | 7500 | E903 | 0050 | 46C7 | ADCE |
| 0000437220 | FF01 | D276 | 76FF | 8DD0 | CE46 | 5016 | 76FF | FFE8 |
| 0000437240 | FC76 | 76FF | 8DFA | DC4E | 5116 | 4E8D | 16F2 | 8D51 |
| 0000437260 | C84E | 5116 | 681E | 13B2 | B668 | FF02 | F036 | FF12 |
| 0000437300 | EE36 | FF12 | F436 | FF12 | F236 | 9A12 | 52F2 | 0000 |
| 0000437320 | C483 | 8B28 | CE46 | A5E9 | E904 | 0006 | AD88 | E901 |
| 0000437340 | 049C | 1CE9 | 0B00 | 75C0 | E903 | FF59 | 7548 | E903 |
| 0000437360 | FF5B | 7548 | E903 | FF65 | 7548 | E903 | FF57 | 64E9 |
| 0000437400 | 8DFF | F046 | 5016 | 468D | 16D4 | 8D50 | A846 | 5016 |
| 0000437420 | 76FF | FFA6 | A476 | 1E9A | 3A4A | 834E | 10C4 | 4689 |
| 0000437440 | 83EE | EE7E | 7500 | E903 | 007E | 068E | 3A94 | 8326 |
| 0000437460 | 3E3E | 0053 | 0375 | 09E9 | 8300 | CC7E | 74FE | E903 |

THU MAR 14 17:31:54 1991 DB_PI.DLL PAGE 157, LINE 9205

| | | | | | | | | |
|---|---|---|---|---|---|---|---|---|
| 0000437500 | 000F | 068E | 3A96 | 8326 | 563E | 0053 | 0375 | 51E9 |
| 0000437520 | 8B00 | EE46 | 4689 | FFCE | D276 | 76FF | 8DD0 | CE46 |
| 0000437540 | 5016 | 76FF | FFE8 | FC76 | 76FF | 8DFA | DC4E | 5116 |
| 0000437560 | 4E8D | 16F2 | 8D51 | C84E | 5116 | 681E | 13B2 | BA68 |
| 0000437600 | FF02 | F036 | FF12 | EE36 | FF12 | F436 | FF12 | F236 |
| 0000437620 | 9A12 | 539E | 0000 | C483 | 8B28 | CE46 | DFE9 | E903 |
| 0000437640 | 0006 | 468B | E9EE | 03D6 | 468B | 8BD4 | D656 | 4689 |
| 0000437660 | 89D8 | DA56 | 46C7 | 00A2 | FF00 | EC76 | 056A | 769A |
| 0000437700 | EE33 | 8353 | 04C4 | 4689 | 89F6 | F856 | 468B | 0BF8 |
| 0000437720 | F646 | 0374 | 7DE9 | 8E00 | 9406 | 263A | 3E83 | 5419 |
| 0000437740 | 7500 | E903 | 0009 | 7E83 | FECC | 0374 | 0FE9 | 8E00 |
| 0000437760 | 9606 | 263A | 3E83 | 5431 | 7500 | E903 | 0050 | 46C7 |
| 0000440000 | 07CE | FF00 | D276 | 76FF | 8DD0 | CE46 | 5016 | 76FF |
| 0000440020 | FFE8 | FC76 | 76FF | 8DFA | DC4E | 5116 | 4E8D | 16F2 |
| 0000440040 | 8D51 | C84E | 5116 | 681E | 13B2 | C168 | FF02 | F036 |
| 0000440060 | FF12 | EE36 | FF12 | F436 | FF12 | F236 | 9A12 | 5479 |
| 0000440100 | 0000 | C483 | 8B28 | CE46 | 33E9 | E903 | 0006 | 07B8 |
| 0000440120 | E900 | 032A | 46C7 | 05EA | 8B00 | DA46 | 460B | 75D8 |
| 0000440140 | E903 | 0135 | 5EC4 | 26D8 | 3F80 | 757F | E903 | 0129 |
| 0000440160 | 468B | 39EA | A246 | 0373 | B8E9 | 8B00 | EA46 | 0505 |
| 0000440200 | F700 | EC66 | FF50 | F876 | 76FF | 9AF6 | 32A4 | 540D |
| 0000440220 | C483 | 8906 | F646 | 5689 | 8BF8 | F846 | 460B | 74F6 |
| 0000440240 | E903 | 008B | 76FF | FFF8 | F676 | 489A | 6F24 | 834D |
| 0000440260 | 04C4 | 068E | 3A94 | 8326 | 463E | 0050 | 0375 | 09E9 |
| 0000440300 | 8300 | CC7E | 74FE | E903 | 000F | 068E | 3A96 | 8326 |
| 0000440320 | 723E | 0050 | 0375 | 50E9 | C700 | CE46 | 0007 | 76FF |
| 0000440340 | FFD2 | D076 | 468D | 16CE | FF50 | E876 | 76FF | FFFC |
| 0000440360 | FA76 | 4E8D | 16DC | 8D51 | F24E | 5116 | 4E8D | 16C8 |
| 0000440400 | 1E51 | B268 | 6813 | 02CC | 36FF | 12F0 | 36FF | 12EE |
| 0000440420 | 36FF | 12F4 | 36FF | 12F2 | 0C9A | 004E | 8300 | 28C4 |
| 0000440440 | 468B | E9CE | 0258 | 06E9 | B800 | 0007 | 4FE9 | 8302 |
| 0000440460 | EA46 | 8B05 | A246 | 66F7 | 03EC | F646 | 568B | 52F8 |
| 0000440500 | FF50 | 1276 | 76FF | FFDA | D876 | B69A | FD4A | 8350 |
| 0000440520 | 0AC4 | 4689 | 83EE | EE7E | 7500 | E903 | 0011 | 76FF |
| 0000440540 | FFD6 | D476 | 489A | DD24 | 8354 | 04C4 | 2AE9 | FF00 |
| 0000440560 | A246 | 206A | 76FF | FFDA | D876 | 109A | 023C | 8355 |
| 0000440600 | 06C4 | 4689 | 89D8 | DA56 | 468B | 0BDA | D846 | 0375 |
| 0000440620 | 03E9 | FF00 | D846 | C0E9 | FFFE | D676 | 76FF | 9AD4 |
| 0000440640 | 2448 | 5517 | C483 | 8B04 | A246 | 66F7 | 50EC | 76FF |
| 0000440660 | FFF8 | F676 | A49A | C632 | 8355 | 06C4 | 4689 | 89F6 |
| 0000440700 | F856 | D00B | 0374 | 7DE9 | 8E00 | 9406 | 263A | 3E83 |
| 0000440720 | 55D2 | 7500 | E903 | 0009 | 7E83 | FECC | 0374 | 0FE9 |
| 0000440740 | 8E00 | 9606 | 263A | 3E83 | 55EA | 7500 | E903 | 0050 |
| 0000440760 | 46C7 | 07CE | FF00 | D276 | 76FF | 8DD0 | CE46 | 5016 |
| 0000441000 | 76FF | FFE8 | FC76 | 76FF | 8DFA | DC4E | 5116 | 4E8D |
| 0000441020 | 16F2 | 8D51 | C84E | 5116 | 681E | 13B2 | E268 | FF02 |
| 0000441040 | F036 | FF12 | EE36 | FF12 | F436 | FF12 | F236 | 9A12 |
| 0000441060 | 5632 | 0000 | C483 | 8B28 | CE46 | 41E9 | E901 | 0006 |
| 0000441100 | 07B8 | E900 | 0138 | 468B | 0BDA | D846 | 0375 | 97E9 |
| 0000441120 | C400 | D85E | 8026 | 7F3F | 0374 | 8BE9 | FF00 | F876 |
| 0000441140 | 76FF | 9AF6 | 2448 | 50EC | C483 | 8E04 | 9406 | 263A |
| 0000441160 | 3E83 | 5668 | 7500 | E903 | 0009 | 7E83 | FECC | 0374 |
| 0000441200 | 0FE9 | 8E00 | 9606 | 263A | 3E83 | 5680 | 7500 | E903 |
| 0000441220 | 0050 | 46C7 | BFCE | FF01 | D276 | 76FF | 8DD0 | CE46 |
| 0000441240 | 5016 | 76FF | FFE8 | FC76 | 76FF | 8DFA | DC4E | 5116 |
| 0000441260 | 4E8D | 16F2 | 8D51 | C84E | 5116 | 681E | 13B2 | E868 |
| 0000441300 | FF02 | F036 | FF12 | EE36 | FF12 | F436 | FF12 | F236 |
| 0000441320 | 9A12 | 56C8 | 0000 | C483 | 8B28 | CE46 | 9FE9 | E900 |
| 0000441340 | 0006 | BFB8 | E901 | 0096 | 468B | 8BF6 | F856 | 5EC4 |

THU MAR 14 17:31:54 1991 DB_PI.DLL PAGE 158, LINE 9264

| | | | | | | | | |
|---|---|---|---|---|---|---|---|---|
| 0000441360 | 2606 | 0789 | 8926 | 0257 | 468B | C4A2 | 0A5E | 8926 |
| 0000441400 | 8E07 | 9406 | 263A | 3E83 | 5128 | 7500 | E903 | 0009 |
| 0000441420 | 7E83 | FECC | 0374 | 0FE9 | 8E00 | 9606 | 263A | 3E83 |
| 0000441440 | 5140 | 7500 | E903 | 0050 | 46C7 | 00CE | FF00 | D276 |
| 0000441460 | 76FF | 8DD0 | CE46 | 5016 | 76FF | FFE8 | FC76 | 76FF |
| 0000441500 | 8DFA | DC4E | 5116 | 4E8D | 16F2 | 8D51 | C84E | 5116 |
| 0000441520 | 681E | 13B2 | ED68 | FF02 | F036 | FF12 | EE36 | FF12 |
| 0000441540 | F436 | FF12 | F236 | 9A12 | 5189 | 0000 | C483 | 8B28 |
| 0000441560 | CE46 | 09E9 | E900 | 0006 | 00B8 | E900 | 0000 | 5E1F |
| 0000441600 | 835F | 02ED | E58B | 5D1F | CA4D | 0012 | 581E | 4590 |
| 0000441620 | 8B55 | 1EEC | D88E | EC81 | 005C | 5657 | B81E | 5026 |
| 0000441640 | D88E | 46C7 | CBFA | 8C13 | FC5E | 46C7 | 01E6 | 2B01 |
| 0000441660 | 89C0 | D446 | 4689 | 8ED2 | 9406 | 263A | 3E83 | 57C5 |
| 0000441700 | 7500 | E903 | 001D | 36FF | 12F4 | 36FF | 12F2 | 468D |
| 0000441720 | 16CA | 9A50 | 505C | 0000 | C483 | 3D08 | 0000 | 0374 |
| 0000441740 | 0FE9 | 8E00 | 9606 | 263A | 3E83 | 57DD | 7500 | E903 |
| 0000441760 | 003B | 681E | 13D2 | 468D | 16DA | 8D50 | CA46 | 5016 |
| 0000442000 | 468D | 16F4 | 6850 | 031D | 681E | 13DA | 36FF | 12F0 |
| 0000442020 | 36FF | 12EE | 36FF | 12F4 | 36FF | 12F2 | A59A | 0050 |
| 0000442040 | 8300 | 1EC4 | 4689 | 89F4 | F656 | 08E9 | 2B00 | 89C0 |
| 0000442060 | F646 | 4689 | C7F4 | F046 | 0000 | 46C7 | 01F8 | C700 |
| 0000442100 | C846 | 0000 | C02B | 4689 | 89A6 | A446 | 7E83 | 040E |
| 0000442120 | 0375 | 86E9 | 8300 | 0E7E | 7505 | E903 | 007D | 068E |
| 0000442140 | 3A94 | 8326 | 873E | 0058 | 0375 | 09E9 | 8300 | CE7E |
| 0000442160 | 74FE | E903 | 000F | 068E | 3A96 | 8326 | 9F3E | 0058 |
| 0000442200 | 0375 | 50E9 | C700 | D046 | 01AD | 76FF | FFD4 | D276 |
| 0000442220 | 468D | 16D0 | FF50 | E676 | 76FF | FFFC | FA76 | 4E8D |
| 0000442240 | 16DA | 8D51 | F44E | 5116 | 4E8D | 16CA | 1E51 | DA68 |
| 0000442260 | 6813 | 032C | 36FF | 12F0 | 36FF | 12EE | 36FF | 12F4 |
| 0000442300 | 36FF | 12F2 | E89A | 0058 | 8300 | 28C4 | 468B | E9D0 |
| 0000442320 | 02DC | 06E9 | B800 | 01AD | D3E9 | 6A02 | FF1F | 0C76 |
| 0000442340 | 76FF | 8D0A | A846 | 5016 | 049A | C728 | 8354 | 0AC4 |
| 0000442360 | 46C6 | 00C7 | 468D | 16A8 | 9A50 | 878C | 54AD | C483 |
| 0000442400 | 8D04 | A446 | 5016 | 76FF | FF12 | 1076 | 2C9A | 10E8 |
| 0000442420 | 8351 | 08C4 | 4689 | 83F0 | F07E | 750D | E903 | 007E |
| 0000442440 | 068E | 3A94 | 8326 | 2E3E | 0059 | 0375 | 09E9 | 8300 |
| 0000442460 | CE7E | 74FE | E903 | 000F | 068E | 3A96 | 8326 | 463E |
| 0000442500 | 0059 | 0375 | 51E9 | 8B00 | F046 | 4689 | FFD0 | D476 |
| 0000442520 | 76FF | 8DD2 | D046 | 5016 | 76FF | FFE6 | FC76 | 76FF |
| 0000442540 | 8DFA | DA4E | 5116 | 4E8D | 16F4 | 8D51 | CA4E | 5116 |
| 0000442560 | 681E | 13DA | 3668 | FF03 | F036 | FF12 | EE36 | FF12 |
| 0000442600 | F436 | FF12 | F236 | 9A12 | 598F | 0000 | C483 | 8B28 |
| 0000442620 | D046 | 19E9 | E902 | 0006 | 468B | E9F0 | 0210 | 468D |
| 0000442640 | 16F2 | 8D50 | D646 | 5016 | 468D | 16A8 | FF50 | A676 |
| 0000442660 | 76FF | 9AA4 | 4A1E | 5279 | C483 | 8910 | F046 | 7E83 |
| 0000442700 | 00F0 | 0375 | 7EE9 | 8E00 | 9406 | 263A | 3E83 | 5A98 |
| 0000442720 | 7500 | E903 | 0009 | 7E83 | FECE | 0374 | 0FE9 | 8E00 |
| 0000442740 | 9606 | 263A | 3E83 | 5AB0 | 7500 | E903 | 0051 | 468B |
| 0000442760 | 89F0 | D046 | 76FF | FFD4 | D276 | 468D | 16D0 | FF50 |
| 0000443000 | E676 | 76FF | FFFC | FA76 | 4E8D | 16DA | 8D51 | F44E |
| 0000443020 | 5116 | 4E8D | 16CA | 1E51 | DA68 | 6813 | 0339 | 36FF |
| 0000443040 | 12F0 | 36FF | 12EE | 36FF | 12F4 | 36FF | 12F2 | 909A |
| 0000443060 | 0055 | 8300 | 28C4 | 468B | E9D0 | 0172 | 06E9 | 8B00 |
| 0000443100 | F046 | 69E9 | 8301 | 0E7E | 7404 | E903 | 007A | 468B |
| 0000443120 | 8BD6 | D856 | 4689 | 89E8 | EA56 | 5EC4 | 26E8 | 078A |
| 0000443140 | 8998 | F846 | 7E83 | 00F8 | 0375 | 54E9 | C400 | E85E |
| 0000443160 | 8026 | 7F3F | 0374 | 0BE9 | 8300 | C87E | 1B01 | F7C0 |
| 0000443200 | 89D8 | C846 | 5EC4 | 26E8 | 3F80 | 7500 | E903 | 001D |
| 0000443220 | 5EC4 | 26E8 | 3F80 | 7420 | E903 | 0009 | 7E83 | 00C8 |

THU MAR 14 17:31:54 1991 DB_PI.DLL PAGE 159, LINE 9323

| | | | | | | | | |
|---|---|---|---|---|---|---|---|---|
| 0000443240 | 0375 | 08E9 | C700 | F846 | 0001 | 05E9 | C700 | F846 |
| 0000443260 | 0000 | 7E83 | 00F8 | 0375 | 03E9 | FF00 | E846 | A3E9 |
| 0000443300 | C4FF | E85E | C626 | 0007 | 468B | 8BD6 | D856 | 4689 |
| 0000443320 | 89EC | EE56 | 4689 | 89E8 | EA56 | 5EC4 | 26E8 | 3F80 |
| 0000443340 | 1B01 | 40C0 | 4689 | C4F8 | E85E | 8026 | 003F | 0375 |
| 0000443360 | 27E9 | C400 | E85E | 8026 | 7F3F | 0374 | 06E9 | FF00 |
| 0000443400 | E846 | E2E9 | C4FF | E85E | 8A26 | C407 | EC5E | 8826 |
| 0000443420 | FF07 | E846 | 46FF | E9EC | FFCD | 5EC4 | 26EC | 07C6 |
| 0000443440 | 8B00 | D646 | 568B | C4D8 | 065E | 8926 | 2607 | 5789 |
| 0000443460 | 8E02 | 9406 | 263A | 3E83 | 5530 | 7500 | E903 | 0009 |
| 0000443500 | 7E83 | FECE | 0374 | 0FE9 | 8E00 | 9606 | 263A | 3E83 |
| 0000443520 | 5548 | 7500 | E903 | 0050 | 46C7 | 00D0 | FF00 | D476 |
| 0000443540 | 76FF | 8DD2 | D046 | 5016 | 76FF | FFE6 | FC76 | 76FF |
| 0000443560 | 8DFA | DA4E | 5116 | 4E8D | 16F4 | 8D51 | CA4E | 5116 |
| 0000443600 | 681E | 13DA | 6268 | FF03 | F036 | FF12 | EE36 | FF12 |
| 0000443620 | F436 | FF12 | F236 | 9A12 | 5825 | 0000 | C483 | 8B28 |
| 0000443640 | D046 | 09E9 | E900 | 0006 | 00B8 | E900 | 0000 | 5E1F |
| 0000443660 | 835F | 02ED | E58B | 5D1F | CA4D | 000E | 581E | 4590 |
| 0000443700 | 8B55 | 1EEC | D88E | EC81 | 0000 | 5657 | B81E | 56FE |
| 0000443720 | D88E | 7E83 | 000A | 0375 | 1EE9 | FF00 | 0A4E | 5E8B |
| 0000443740 | C10A | 02E3 | 76C4 | 2606 | 70FF | 2602 | 30FF | 489A |
| 0000443760 | 6224 | 835B | 04C4 | D9E9 | FFFF | 0876 | 76FF | 9A06 |
| 0000444000 | 2448 | 584B | C483 | 1F04 | 5F5E | ED83 | 8B02 | 1FE5 |
| 0000444020 | 4D5D | 06CA | 1E00 | 9058 | 5545 | EC8B | 8E1E | 81D8 |
| 0000444040 | 62EC | 5700 | 1E56 | 2EB8 | 8E5B | C7D8 | C646 | 0000 |
| 0000444060 | 46C7 | 00E8 | 2B00 | 89C0 | A046 | 4689 | C79E | FA46 |
| 0000444100 | 13EE | 5E8C | C7FC | EA46 | 0101 | C02B | 4689 | 89D6 |
| 0000444120 | D446 | 068E | 3A94 | 8326 | 1E3E | 0057 | 0375 | 1DE9 |
| 0000444140 | FF00 | F436 | FF12 | F236 | 8D12 | CC46 | 5016 | 349A |
| 0000444160 | 0057 | 8300 | 08C4 | 003D | 7400 | E903 | 000F | 068E |
| 0000444200 | 3A96 | 8326 | 4A3E | 0057 | 0375 | 3BE9 | 1E00 | F568 |
| 0000444220 | 8D13 | D846 | 5016 | 468D | 16CC | 8D50 | F646 | 5016 |
| 0000444240 | B068 | 1E03 | FC68 | FF13 | F036 | FF12 | EE36 | FF12 |
| 0000444260 | F436 | FF12 | F236 | 9A12 | 577D | 0000 | C483 | 891E |
| 0000444300 | F646 | 5689 | E9F8 | 0008 | C02B | 4689 | 89F8 | F646 |
| 0000444320 | IF6A | 76FF | FF10 | 0E76 | 468D | 16A2 | 9A50 | 2804 |
| 0000444340 | 5B51 | C483 | C60A | C146 | 8D00 | A246 | 5016 | 8C9A |
| 0000444360 | 5C87 | 8358 | 04C4 | 468D | 169E | FF50 | 1476 | 76FF |
| 0000444400 | 9A12 | E82C | 586F | C483 | 8908 | EC46 | 7E83 | 00EC |
| 0000444420 | 0375 | 7EE9 | 8E00 | 9406 | 263A | 3E83 | 5D23 | 7500 |
| 0000444440 | E903 | 0009 | 7E83 | FED0 | 0374 | 0FE9 | 8E00 | 9606 |
| 0000444460 | 263A | 3E83 | 5D3B | 7500 | E903 | 0051 | 468B | 89EC |
| 0000444500 | D246 | 76FF | FFD6 | D476 | 468D | 16D2 | FF50 | EA76 |
| 0000444520 | 76FF | FFFC | FA76 | 4E8D | 16D8 | 8D51 | F64E | 5116 |
| 0000444540 | 4E8D | 16CC | 1E51 | FC68 | 6813 | 03B9 | 36FF | 12F0 |
| 0000444560 | 36FF | 12EE | 36FF | 12F4 | 36FF | 12F2 | 849A | 005D |
| 0000444600 | 8300 | 28C4 | 468B | E9D2 | D5F1 | 06E9 | 8B00 | EC46 |
| 0000444620 | E8E9 | 8D05 | F246 | 5016 | 468D | 16C8 | 8D50 | A246 |
| 0000444640 | 5016 | 76FF | FFA0 | 9E76 | 1E9A | 164A | 8359 | 10C4 |
| 0000444660 | 4689 | 83EC | EC7E | 7500 | E903 | 007E | 068E | 3A94 |
| 0000444700 | 8326 | D43E | 005D | 0375 | 09E9 | 8300 | D07E | 74FE |
| 0000444720 | E903 | 000F | 068E | 3A96 | 8326 | EC3E | 005D | 0375 |
| 0000444740 | 51E9 | 8B00 | EC46 | 4689 | FFD2 | D676 | 76FF | 8DD4 |
| 0000444760 | D246 | 5016 | 76FF | FFEA | FC76 | 76FF | 8DFA | D84E |
| 0000445000 | 5116 | 4E8D | 16F6 | 8D51 | CC4E | 5116 | 681E | 13FC |
| 0000445020 | BD68 | FF03 | F036 | FF12 | EE36 | FF12 | F436 | FF12 |
| 0000445040 | F236 | 9A12 | 5E34 | 0000 | C483 | 8B28 | D246 | 4AE9 |
| 0000445060 | E905 | 0006 | 468B | E9EC | 0541 | 046A | 056A | 769A |
| 0000445100 | C833 | 835D | 04C4 | 5EC4 | 2606 | 0789 | 8926 | 0257 |

THU MAR 14 17:31:54 1991 DB_PI.DLL PAGE 160, LINE 9382

| | | | | | | | | |
|---|---|---|---|---|---|---|---|---|
| 0000445120 | 5EC4 | 2606 | 478B | 2602 | 070B | 0374 | 8BE9 | FF00 |
| 0000445140 | CA76 | 76FF | 9AC8 | 2448 | 5F6B | C483 | 8E04 | 9406 |
| 0000445160 | 263A | 3E83 | 5FAD | 7500 | E903 | 0009 | 7E83 | FED0 |
| 0000445200 | 0374 | 0FE9 | 8E00 | 9606 | 263A | 3E83 | 5FC5 | 7500 |
| 0000445220 | E903 | 0050 | 46C7 | 07D2 | FF00 | D676 | 76FF | 8DD4 |
| 0000445240 | D246 | 5016 | 76FF | FFEA | FC76 | 76FF | 8DFA | D84E |
| 0000445260 | 5116 | 4E8D | 16F6 | 8D51 | CC4E | 5116 | 681E | 13FC |
| 0000445300 | C368 | FF03 | F036 | FF12 | EE36 | FF12 | F436 | FF12 |
| 0000445320 | F236 | 9A12 | 5AF8 | 0000 | C483 | 8B28 | D246 | 9AE9 |
| 0000445340 | E904 | 0006 | 07B8 | E900 | 0491 | 5EC4 | 260A | 07C7 |
| 0000445360 | 0000 | 46C7 | 05E8 | 8B00 | C846 | 568B | 89CA | EE46 |
| 0000445400 | 5689 | 89F0 | E446 | 5689 | 89E6 | C246 | 5689 | C4C4 |
| 0000445420 | EE5E | 8026 | 003F | 0375 | 1BE9 | 8B03 | EE46 | 568B |
| 0000445440 | 89F0 | E446 | 5689 | 89E6 | C246 | 5689 | C4C4 | EE5E |
| 0000445460 | 8A26 | 9807 | 4689 | 83F4 | F47E | 7500 | E903 | 0081 |
| 0000445500 | 5EC4 | 26EE | 3F80 | 747F | E903 | 0032 | 7E83 | 01C6 |
| 0000445520 | C01B | D8F7 | 4689 | FFC6 | EE46 | 5EC4 | 26EE | 3F80 |
| 0000445540 | 7500 | E903 | 0015 | 5EC4 | 26EE | 3F80 | 7420 | E903 |
| 0000445560 | 000C | 7E83 | 00C6 | 0374 | 03E9 | E900 | 0043 | 5EC4 |
| 0000445600 | 26EE | 078A | 5EC4 | 26E4 | 0788 | 46FF | FFEE | E446 |
| 0000445620 | 5EC4 | 26EE | 3F80 | 7500 | E903 | 001D | 5EC4 | 26EE |
| 0000445640 | 3F80 | 7420 | E903 | 0009 | 7E83 | 00C6 | 0375 | 08E9 |
| 0000445660 | C700 | F446 | 0001 | 05E9 | C700 | F446 | 0000 | 76E9 |
| 0000445700 | C4FF | EE5E | 8026 | 203F | 0374 | 03E9 | FF00 | EE46 |
| 0000445720 | 5EC4 | 26E4 | 3F80 | 7500 | E903 | 0007 | 5EC4 | 26E4 |
| 0000445740 | 07C6 | C40D | 0A5E | 468B | 26E8 | 0739 | 0374 | D6E9 |
| 0000445760 | C400 | 0A5E | 8B26 | 0507 | 0005 | E0C1 | 5002 | 5EC4 |
| 0000446000 | 2606 | 77FF | 2602 | 37FF | A49A | 9232 | 835F | 06C4 |
| 0000446020 | 5EC4 | 2606 | 0789 | 8926 | 0257 | 5EC4 | 2606 | 478B |
| 0000446040 | 2602 | 070B | 0374 | 9AE9 | FF00 | CA76 | 76FF | 9AC8 |
| 0000446060 | 2448 | 5C40 | C483 | C404 | 0A5E | 8326 | 003F | 0374 |
| 0000446100 | 03E9 | E900 | 0000 | 068E | 3A94 | 8326 | B93E | 005B |
| 0000446120 | 0375 | 09E9 | 8300 | D07E | 74FE | E903 | 000F | 068E |
| 0000446140 | 3A96 | 8326 | E53E | 005B | 0375 | 50E9 | C700 | D246 |
| 0000446160 | 0007 | 76FF | FFD6 | D476 | 468D | 16D2 | FF50 | EA76 |
| 0000446200 | 76FF | FFFC | FA76 | 4E8D | 16D8 | 8D51 | F64E | 5116 |
| 0000446220 | 4E8D | 16CC | 1E51 | FC68 | 6813 | 03EC | 36FF | 12F0 |
| 0000446240 | 36FF | 12EE | 36FF | 12F4 | 36FF | 12F2 | 539A | 0061 |
| 0000446260 | 8300 | 28C4 | 468B | E9D2 | 02C1 | 06E9 | B800 | 0007 |
| 0000446300 | B8E9 | 8302 | E846 | 6A05 | FF01 | C476 | 76FF | 9AC2 |
| 0000446320 | 27B0 | 603C | C483 | 4004 | 9A50 | 3376 | 607B | C483 |
| 0000446340 | C404 | 0A5E | 8B26 | C11F | 02E3 | 76C4 | 2606 | 34C4 |
| 0000446360 | 8926 | 2600 | 5089 | C402 | 0A5E | 8B26 | C11F | 02E3 |
| 0000446400 | 76C4 | 2606 | 34C4 | 8B26 | 0240 | 0B26 | 7400 | E903 |
| 0000446420 | 00F7 | 76FF | FFCA | C876 | 489A | 9F24 | 8360 | 04C4 |
| 0000446440 | 5EC4 | 260A | 0FFF | 5EC4 | 260A | 1F8B | E3C1 | C402 |
| 0000446460 | 0676 | C426 | 2634 | 70FF | 2602 | 30FF | 489A | C924 |
| 0000446500 | 8360 | 04C4 | 5EC4 | 260A | 3F83 | 7400 | E903 | FFD0 |
| 0000446520 | 5EC4 | 260A | 1F8B | E3C1 | C402 | 0676 | C426 | 2634 |
| 0000446540 | 70FF | 2602 | 30FF | 489A | DB24 | 8360 | 04C4 | 5EC4 |
| 0000446560 | 2606 | 77FF | 2602 | 37FF | 489A | 8824 | 8361 | 04C4 |
| 0000446600 | 5EC4 | 2B06 | 26C0 | 4789 | 2602 | 0789 | 068E | 3A94 |
| 0000446620 | 8326 | 7C3E | 005C | 0375 | 09E9 | 8300 | D07E | 74FE |
| 0000446640 | E903 | 000F | 068E | 3A96 | 8326 | 943E | 005C | 0375 |
| 0000446660 | 50E9 | C700 | D246 | 0007 | 76FF | FFD6 | D476 | 468D |
| 0000446700 | 16D2 | FF50 | EA76 | 76FF | FFFC | FA76 | 4E8D | 16D8 |
| 0000446720 | 8D51 | F64E | 5116 | 4E8D | 16CC | 1E51 | FC68 | 6813 |
| 0000446740 | 03FB | 36FF | 12F0 | 36FF | 12EE | 36FF | 12F4 | 36FF |
| 0000446760 | 12F2 | DD9A | 005C | 8300 | 28C4 | 468B | E9D2 | 017B |

THU MAR 14 17:31:54 1991 DB_PI.DLL PAGE 161, LINE 9441

| | | | | | | | | |
|---|---|---|---|---|---|---|---|---|
| 0000447000 | 06E9 | B800 | 0007 | 72E9 | FF01 | C476 | 76FF | C4C2 |
| 0000447020 | 0A5E | 8B26 | C11F | 02E3 | 76C4 | 2606 | 34C4 | FF26 |
| 0000447040 | 0270 | FF26 | 9A30 | 2750 | 5DA1 | C483 | C408 | 0A5E |
| 0000447060 | FF26 | E907 | FCD9 | 76FF | FFCA | C876 | 489A | BB24 |
| 0000447100 | 8361 | 04C4 | 5EC4 | 260A | 078B | E0C1 | 5002 | 5EC4 |
| 0000447120 | 2606 | 77FF | 2602 | 37FF | A49A | 3232 | 8360 | 06C4 |
| 0000447140 | 5EC4 | 2606 | 0789 | 8926 | 0257 | 5EC4 | 2606 | 478B |
| 0000447160 | 2602 | 070B | 0374 | 85E9 | C400 | 0A5E | C726 | 0007 |
| 0000447200 | 8E00 | 9406 | 263A | 3E83 | 6265 | 7500 | E903 | 0009 |
| 0000447220 | 7E83 | FED0 | 0374 | 0FE9 | 8E00 | 9606 | 263A | 3E83 |
| 0000447240 | 627D | 7500 | E903 | 0050 | 46C7 | 07D2 | FF00 | D676 |
| 0000447260 | 76FF | 8DD4 | D246 | 5016 | 76FF | FFEA | FC76 | 76FF |
| 0000447300 | 8DFA | D84E | 5116 | 4E8D | 16F6 | 8D51 | CC4E | 5116 |
| 0000447320 | 681E | 13FC | 0868 | FF04 | F036 | FF12 | EE36 | FF12 |
| 0000447340 | F436 | FF12 | F236 | 9A12 | 62C5 | 0000 | C483 | 8B28 |
| 0000447360 | D246 | 86E9 | E900 | 0006 | 07B8 | E900 | 007D | 068E |
| 0000447400 | 3A94 | 8326 | F33E | 0060 | 0375 | 09E9 | 8300 | D07E |
| 0000447420 | 74FE | E903 | 000F | 068E | 3A96 | 8326 | 0B3E | 0061 |
| 0000447440 | 0375 | 50E9 | C700 | D246 | 0000 | 76FF | FFD6 | D476 |
| 0000447460 | 468D | 16D2 | FF50 | EA76 | 76FF | FFFC | FA76 | 4E8D |
| 0000447500 | 16D8 | 8D51 | F64E | 5116 | 4E8D | 16CC | 1E51 | FC68 |
| 0000447520 | 6813 | 040B | 36FF | 12F0 | 36FF | 12EE | 36FF | 12F4 |
| 0000447540 | 36FF | 12F2 | 0D9A | 0060 | 8300 | 28C4 | 468B | E9D2 |
| 0000447560 | 0009 | 06E9 | B800 | 0000 | 00E9 | 1F00 | 5F5E | ED83 |
| 0000447600 | 8B02 | 1FE5 | 4D5D | 10CA | 0000 | 581E | 459D | 8B55 |
| 0000447620 | 1EEC | D88E | EC81 | 0000 | 5657 | 3E83 | 143E | 7400 |
| 0000447640 | E903 | 0006 | 06C7 | 1430 | 0001 | 30A1 | A314 | 143E |
| 0000447660 | 30A1 | E914 | 0000 | 5F5E | ED83 | 8B02 | 1FE5 | 4D5D |
| 0000447700 | 1ECB | 9058 | 5545 | EC8B | 8E1E | 81D8 | 04EC | 5700 |
| 0000447720 | C456 | 0E5E | FF26 | 0277 | FF26 | 9A37 | 27B0 | 634E |
| 0000447740 | C483 | FF04 | 0876 | 76FF | 8B06 | 9AF0 | 27B0 | 6390 |
| 0000447760 | C483 | 0304 | 89F0 | FC76 | 5EC4 | 8B0A | FC46 | 3926 |
| 0000450000 | 7E07 | E903 | 0068 | 5EC4 | 260A | 3F83 | 7400 | E903 |
| 0000450020 | 000C | 5EC4 | 2B0E | 26C0 | 4789 | 2602 | 0789 | 468B |
| 0000450040 | 40FC | C450 | 0E5E | FF26 | 0277 | FF26 | 9A37 | 32A4 |
| 0000450060 | 63BF | C483 | C406 | 0E5E | 8926 | 2607 | 5789 | C402 |
| 0000450100 | 0E5E | 8B26 | 0247 | 0B26 | 7407 | E903 | 0016 | 5EC4 |
| 0000450120 | 260A | 07C7 | 0000 | 226A | 681E | 3DBE | 7A9A | FB41 |
| 0000450140 | 8363 | 06C4 | 468B | 40FC | 5EC4 | 260A | 0789 | 3E83 |
| 0000450160 | 1436 | 7500 | E903 | 0006 | 46FF | E906 | 000A | 5EC4 |
| 0000450200 | 260E | 1FC4 | C626 | 0007 | 76FF | FF08 | 0676 | 5EC4 |
| 0000450220 | 260E | 77FF | 2602 | 37FF | 0A9A | 9F27 | 8361 | 08C4 |
| 0000450240 | 00E9 | 5E00 | 835F | 02ED | E58B | 5D1F | CB4D | 581E |
| 0000450260 | 4590 | 8B55 | 1EEC | D88E | EC81 | 0006 | 5657 | 22A0 |
| 0000450300 | 8E54 | 9C06 | 263A | 368B | 0304 | 068E | 3A9E | C426 |
| 0000450320 | 001E | 2600 | 0088 | 1CA1 | 3954 | 1E06 | 7454 | E903 |
| 0000450340 | 011A | 3E83 | 2D52 | 7500 | E903 | 0049 | EA9A | 0162 |
| 0000450360 | 3D65 | 0000 | 0375 | 06E9 | B800 | FFFF | 5DE9 | B001 |
| 0000450400 | BB0A | 0000 | 1E89 | 541E | 1E89 | 541C | 068E | 3A9C |
| 0000450420 | 8926 | 041E | 8803 | 2487 | A254 | 5422 | 1CA1 | 0554 |
| 0000450440 | 5424 | 068E | 3A9E | A326 | 0000 | 8C26 | 021E | C700 |
| 0000450460 | 5206 | 002D | C700 | 1A06 | 0054 | FF00 | 4C36 | FF2D |
| 0000450500 | 4A36 | 682D | 0080 | 681E | 5424 | 109A | C02D | 8364 |
| 0000450520 | 0AC4 | D00B | 0375 | 12E9 | 1E00 | 2468 | 9A54 | 27B0 |
| 0000450540 | 64EA | C483 | 8904 | FA46 | 24E9 | C400 | 4A1E | 262D |
| 0000450560 | 47F6 | 200A | 0374 | 08E9 | C700 | FA46 | 0000 | 0EE9 |
| 0000450600 | 6A00 | 1E22 | BE68 | 9A3D | 417A | 633E | C483 | 8306 |
| 0000450620 | FA7E | 7400 | E903 | 0057 | 06C7 | 2D52 | 0001 | EA9A |
| 0000450640 | 4A62 | 3D65 | 0000 | 0375 | 06E9 | B800 | FFFF | ABE9 |

THU MAR 14 17:31:54 1991 DB_PI.DLL PAGE 162, LINE 9500

| | | | | | | | | |
|---|---|---|---|---|---|---|---|---|
| 0000450660 | B000 | BB0A | 0000 | 1E89 | 541E | 1E89 | 541C | 068E |
| 0000450700 | 3A9C | 8926 | 041E | 8803 | 2487 | A254 | 5422 | 1CA1 |
| 0000450720 | 0554 | 5424 | 068E | 3A9E | A326 | 0000 | 8C26 | 021E |
| 0000450740 | C700 | 5206 | 002D | 9A00 | 640E | 5C51 | 6DE9 | C700 |
| 0000450760 | 1C06 | FF54 | 8BFF | FA46 | A348 | 541E | 06FF | 541C |
| 0000451000 | 1E8B | 541C | 878A | 5424 | 8998 | FC46 | 1AA1 | 0554 |
| 0000451020 | 5424 | 068E | 3A9E | A326 | 0000 | 8C26 | 021E | 8B00 |
| 0000451040 | 1C1E | 2B54 | 1A1E | 4354 | 068E | 3A9C | 8926 | 041E |
| 0000451060 | 8E03 | 9E06 | 263A | 36C4 | 0000 | 8A26 | A200 | 5422 |
| 0000451100 | 068E | 3A9C | 8B26 | 0436 | 8E03 | 9E06 | 263A | 1EC4 |
| 0000451120 | 0000 | C626 | 0000 | 468B | E9FC | 0000 | 5F5E | ED83 |
| 0000451140 | 8B02 | 1FE5 | 4D5D | 1ECB | 9058 | 5545 | EC8B | 8E1E |
| 0000451160 | 81D8 | 00EC | 5700 | 8E56 | 9C06 | 263A | 04A1 | 8E03 |
| 0000451200 | 9E06 | 263A | 1EC4 | 0000 | D803 | 22A0 | 2654 | 0788 |
| 0000451220 | 3E83 | 541C | 7400 | E903 | 003C | FFBF | 8B00 | 1E36 |
| 0000451240 | E954 | 0001 | 394E | 1C36 | 7E54 | E903 | 0018 | 848A |
| 0000451260 | 5424 | 8588 | 5424 | DE8B | 808B | 5526 | DF8B | 8189 |
| 0000451300 | 5526 | E94F | FFDE | FFB8 | 2B00 | 1E06 | A354 | 541C |
| 0000451320 | 06C7 | 541E | 00FF | 3E83 | 541C | 7E00 | E903 | 000E |
| 0000451340 | 226A | 681E | 3DBE | 7A9A | AD41 | 8364 | 06C4 | 1AA1 |
| 0000451360 | 3954 | 1C06 | 7D54 | E903 | 0017 | 1E8B | 541C | BF80 |
| 0000451400 | 5424 | 740A | E903 | 0009 | 1E8B | 541C | 87C6 | 5423 |
| 0000451420 | 8A0A | 0646 | 1E8B | 541C | 8788 | 5424 | 0EFF | 541C |
| 0000451440 | 1AA1 | 0554 | 5424 | 068E | 3A9E | A326 | 0000 | 8C26 |
| 0000451460 | 021E | 8B00 | 1C1E | 2B54 | 1A1E | 4354 | 068E | 3A9C |
| 0000451500 | 8926 | 041E | 8E03 | 9E06 | 263A | 36C4 | 0000 | 8A26 |
| 0000451520 | A200 | 5422 | 068E | 3A9C | 8B26 | 0436 | 8E03 | 9E06 |
| 0000451540 | 263A | 1EC4 | 0000 | C626 | 0000 | 5F5E | ED83 | 8B02 |
| 0000451560 | 1FE5 | 4D5D | 1ECB | 9058 | 5545 | EC8B | 8E1E | 81D8 |
| 0000451600 | 10EC | 5700 | 8356 | 543E | 002D | 0375 | 42E9 | B000 |
| 0000451620 | BB0A | 0000 | 1E89 | 541E | 1E89 | 541C | 068E | 3A9C |
| 0000451640 | 8926 | 041E | 8803 | 2487 | A254 | 5422 | 1CA1 | 0554 |
| 0000451660 | 5424 | 068E | 3A9E | A326 | 0000 | 8C26 | 021E | C700 |
| 0000451700 | 5206 | 002D | C700 | 2006 | 0154 | C700 | 5406 | 002D |
| 0000451720 | E900 | 0340 | 1CA1 | 8954 | FC46 | 1AA1 | 0554 | 5424 |
| 0000451740 | 068E | 3A9E | A326 | 0000 | 8C26 | 021E | 8B00 | 1C1E |
| 0000451760 | 2B54 | 1A1E | 4354 | 068E | 3A9C | 8926 | 041E | 8E03 |
| 0000452000 | 9E06 | 263A | 3EC4 | 0000 | 8A26 | A201 | 5422 | 068E |
| 0000452020 | 3A9C | 8B26 | 043E | 8E03 | 9E06 | 263A | 1EC4 | 0000 |
| 0000452040 | C626 | 0001 | 468B | E9FA | 0285 | 1E8B | 48E6 | E3D1 |
| 0000452060 | 87FF | 48D0 | 0DB8 | E900 | 0574 | D7E9 | B802 | 0009 |
| 0000452100 | 6BE9 | E905 | 02CE | 0AB8 | E900 | 0562 | C5E9 | 8B02 |
| 0000452120 | E61E | D148 | FFE3 | D087 | 8E48 | 9E06 | 263A | 00A1 |
| 0000452140 | 2600 | 168B | 0002 | 068E | 3A9C | 0326 | 0406 | A303 |
| 0000452160 | 48E8 | 1689 | 48EA | 1EC4 | 48E8 | 8026 | 5C3F | 0375 |
| 0000452200 | 07E9 | FF00 | E80E | E948 | FFEC | 1EC4 | 48E8 | C626 |
| 0000452220 | 0007 | 226A | C79A | 2765 | 8368 | 02C4 | 3E83 | 1436 |
| 0000452240 | 7400 | E903 | 0008 | 1EC4 | 1438 | C626 | 0007 | 681E |
| 0000452260 | 1438 | 681E | 143C | 068E | 3A9E | FF26 | 0236 | 2600 |
| 0000452300 | 36FF | 0000 | 219A | 8363 | 8368 | 0CC4 | 06C7 | 1436 |
| 0000452320 | 0001 | 0DB8 | E900 | 04D6 | 39E9 | 8E02 | 9E06 | 263A |
| 0000452340 | 00A1 | 2600 | 168B | 0002 | 068E | 3A9C | 0326 | 0406 |
| 0000452360 | A303 | 48E8 | 1689 | 48EA | 3E83 | 1436 | 7400 | E903 |
| 0000452400 | 0008 | 1EC4 | 1438 | C626 | 0007 | 681E | 1438 | 681E |
| 0000452420 | 143C | 068E | 3A9E | FF26 | 0236 | 2600 | 36FF | 0000 |
| 0000452440 | 219A | 8D63 | 8368 | 0CC4 | 226A | C79A | BA65 | 8368 |
| 0000452460 | 02C4 | 06C7 | 1436 | 0001 | 0DB8 | E900 | 0470 | D3E9 |
| 0000452500 | 1E01 | 3868 | 1E14 | 3C68 | 8E14 | 9E06 | 263A | 36FF |
| 0000452520 | 0002 | FF26 | 0036 | 9A00 | 6321 | 644F | C483 | C70C |

THU MAR 14 17:31:54 1991 DB_PI.DLL PAGE 163, LINE 9559

| | | | | | | | | |
|---|---|---|---|---|---|---|---|---|
| 0000452540 | 3606 | 0014 | B800 | 0006 | 43E9 | E904 | 01A6 | 1E8B |
| 0000452560 | 48E6 | E3D1 | 87FF | 48D0 | 08B8 | E900 | 0430 | 93E9 |
| 0000452600 | B801 | 0020 | 27E9 | E904 | 018A | 1E8B | 48E6 | E3D1 |
| 0000452620 | 87FF | 48D0 | 1FB8 | E900 | 0414 | 77E9 | B801 | 001F |
| 0000452640 | 0BE9 | E904 | 016E | 1E8B | 48E6 | E3D1 | 87FF | 48D0 |
| 0000452660 | 1DB8 | E900 | 03F8 | 5BE9 | B801 | 0002 | EFE9 | E903 |
| 0000452700 | 0152 | 01B8 | E900 | 03E6 | 49E9 | B801 | 0004 | DDE9 |
| 0000452720 | E903 | 0140 | 18B8 | E900 | 03D4 | 37E9 | 6A01 | 9A0A |
| 0000452740 | 65C7 | 67F7 | C483 | B802 | 000D | C1E9 | E903 | 0124 |
| 0000452760 | 03B8 | E900 | 03B8 | 1BE9 | 8B01 | E61E | D148 | FFE3 |
| 0000453000 | D087 | B848 | 001C | A5E9 | E903 | 0108 | 1E8B | 48E6 |
| 0000453020 | E3D1 | 87FF | 48D0 | 0DB8 | E900 | 0392 | F5E9 | B800 |
| 0000453040 | 000C | 89E9 | E903 | 00EC | 07B8 | E900 | 0380 | E3E9 |
| 0000453060 | 8B00 | E61E | D148 | FFE3 | D087 | B848 | 001A | 6DE9 |
| 0000453100 | E903 | 00D0 | 1EB8 | E900 | 0364 | 24E9 | 8E00 | 9C06 |
| 0000453120 | 263A | 3E8B | 0304 | 068E | 3A9E | C426 | 001E | A000 |
| 0000453140 | 5422 | 8826 | 8B01 | FC46 | 1CA3 | FF54 | F646 | E5E9 |
| 0000453160 | E902 | 00A0 | 36FF | 2D50 | 36FF | 2D4E | 068E | 3A9E |
| 0000453200 | FF26 | 0236 | 2600 | 36FF | 0000 | A69A | 072D | 836A |
| 0000453220 | 08C4 | 7FE9 | E900 | 007C | 00B8 | E900 | 0310 | 226A |
| 0000453240 | 681E | 3DBE | 7A9A | 4941 | 8366 | 06C4 | 65E9 | 4000 |
| 0000453260 | 293D | 7600 | E903 | FFE6 | E0D1 | 2E93 | A7FF | 6A20 |
| 0000453300 | 69F5 | 69F8 | 678A | 679D | 67A6 | 67AF | 683B | 68A1 |
| 0000453320 | 68CE | 68E1 | 68E1 | 68E1 | 68E1 | 68E1 | 68EA | 68EA |
| 0000453340 | 68FD | 68FD | 6906 | 6919 | 6922 | 692B | 692B | 692B |
| 0000453360 | 692B | 692B | 692B | 692B | 692B | 692B | 692B | 6934 |
| 0000453400 | 693D | 6950 | 6959 | 696C | 696C | 697F | 6988 | 6991 |
| 0000453420 | 69A4 | 69D4 | 068E | 3A9C | 8B26 | 043E | 8E03 | 9E06 |
| 0000453440 | 263A | 1EC4 | 0000 | 22A0 | 2654 | 0188 | 368B | 5420 |
| 0000453460 | 1E8B | 541C | BF80 | 5424 | 740A | E903 | 0001 | A146 |
| 0000453500 | 541C | A340 | 541A | 1CA1 | 3954 | 1E06 | 7454 | E903 |
| 0000453520 | 0186 | 3E83 | 541E | 7D7F | E903 | 0083 | 1EA1 | 2B54 |
| 0000453540 | 1A06 | 8954 | F246 | 7E83 | 00F2 | 037D | 43E9 | C700 |
| 0000453560 | F846 | 0000 | 03E9 | FF00 | F846 | 468B | 39F2 | F846 |
| 0000453600 | 037E | 2DE9 | 8B00 | F846 | 0603 | 541A | 4689 | 8BF4 |
| 0000453620 | F45E | 878A | 5424 | 5E8B | 88F8 | 2487 | 8B54 | F45E |
| 0000453640 | E3D1 | 87BB | 5526 | 5E8B | D1F8 | 89E3 | 2687 | E955 |
| 0000453660 | FFC5 | 06C7 | 541A | 0000 | 468B | A3F2 | 541E | 3E83 |
| 0000453700 | 541E | 7D7F | E903 | 000E | 226A | 681E | 3DBE | 7A9A |
| 0000453720 | ED41 | 8369 | 06C4 | 1EA1 | A354 | 541C | 6CE9 | 8300 |
| 0000453740 | 523E | 002D | 0375 | 62E9 | A100 | 541A | 0639 | 541E |
| 0000453760 | 037D | 03E9 | E900 | 0140 | EA9A | 4262 | 3D69 | 0000 |
| 0000454000 | 0375 | 08E9 | C700 | FA46 | 0000 | 3BE9 | B000 | BB0A |
| 0000454020 | 0000 | 1E89 | 541E | 1E89 | 541C | 068E | 3A9C | 8926 |
| 0000454040 | 041E | 8803 | 2487 | A254 | 5422 | 1CA1 | 0554 | 5424 |
| 0000454060 | 068E | 3A9E | A326 | 0000 | 8C26 | 021E | C700 | 5206 |
| 0000454100 | 002D | C700 | FA46 | FFFF | 89E9 | FFFB | 4C36 | FF2D |
| 0000454120 | 4A36 | 682D | 0080 | 1CA1 | 0554 | 5425 | 501E | 109A |
| 0000454140 | D82D | 836B | 0AC4 | D00B | 0375 | 16E9 | A100 | 541C |
| 0000454160 | 2505 | 1E54 | 9A50 | 27B0 | 6C02 | C483 | 8904 | F246 |
| 0000454200 | 24E9 | C400 | 4A1E | 262D | 47F6 | 200A | 0374 | 08E9 |
| 0000454220 | C700 | F246 | 0000 | 0EE9 | 6A00 | 1E22 | BE68 | 9A3D |
| 0000454240 | 417A | 6C23 | C483 | 8306 | F27E | 7400 | E903 | 0021 |
| 0000454260 | 3E83 | 2D52 | 7500 | E903 | 000E | 226A | 681E | 3DBE |
| 0000454300 | 7A9A | 3141 | 836B | 06C4 | 06C7 | 2D52 | 0001 | 18E9 |
| 0000454320 | 8BFF | F246 | 0601 | 541E | 06FF | 541C | 1E8B | 541C |
| 0000454340 | 878A | 5424 | 4688 | 8AF0 | F046 | 8B98 | 8BD8 | 8BC3 |
| 0000454360 | 8BDE | F298 | 0314 | D1D8 | 39E3 | C4B7 | 7521 | E903 |
| 0000454400 | 0009 | DE8B | B08B | 1598 | DCE9 | 8AFF | F046 | 8B98 |

THU MAR 14 17:31:54 1991 DB_PI.DLL PAGE 164, LINE 9618

| | | | | | | | | |
|---|---|---|---|---|---|---|---|---|
| 0000454420 | 8BD8 | 8BC3 | 8BDE | F298 | 0314 | D1D8 | 8BE3 | 3EB7 |
| 0000454440 | 8B16 | 1C1E | D154 | 89E3 | 26B7 | 8B55 | 81DE | F2B8 |
| 0000454460 | 4314 | 7405 | E903 | FE0E | 1AA1 | 3954 | 1C06 | 7D54 |
| 0000454500 | E903 | 005E | 1E8B | 541C | E3D1 | B78B | 5526 | 848A |
| 0000454520 | 14A8 | 8998 | F646 | 7E83 | 00F6 | 0375 | 1BE9 | 8A00 |
| 0000454540 | A984 | 9814 | 463B | 7FF6 | E903 | 000E | 5E8B | 8AF6 |
| 0000454560 | 4087 | 9814 | 4689 | E9FA | FA5A | 0EFF | 541C | 1AA1 |
| 0000454600 | 3954 | 1C06 | 7C54 | E903 | 0003 | 15E9 | 8B00 | 1C1E |
| 0000454620 | D154 | 8BE3 | 26B7 | 8A55 | A884 | 9814 | 4689 | E9F6 |
| 0000454640 | FFB4 | 06FF | 541C | 46C7 | FEFA | E9FF | FA2C | 5F5E |
| 0000454660 | ED83 | 8B02 | 1FE5 | 4D5D | 1ECB | 9058 | 5545 | EC8B |
| 0000454700 | 8E1E | 81D8 | 0CEC | 5702 | C756 | FC46 | 0000 | 468B |
| 0000454720 | 0B08 | 0646 | 0375 | 0BE9 | 8B00 | 0C46 | 460B | 740A |
| 0000454740 | E903 | 0006 | 17B8 | E900 | 027E | 5EC4 | 2606 | 3F80 |
| 0000454760 | 755C | E903 | 00FB | 5EC4 | 2606 | 3F80 | 752F | E903 |
| 0000455000 | 00EF | 76FF | FF08 | 0676 | B09A | C127 | 836B | 04C4 |
| 0000455020 | 033D | 7300 | E903 | 00D9 | 5EC4 | 2606 | 7F80 | 3A01 |
| 0000455040 | 0374 | 1AE9 | C400 | 065E | 8026 | 027F | 755C | E903 |
| 0000455060 | 00BF | 5EC4 | 2606 | 7F80 | 2F02 | 0375 | B2E9 | 8A00 |
| 0000455100 | E626 | 2A48 | 05C0 | 47EC | 501E | 868D | FEFC | 5016 |
| 0000455120 | 509A | C127 | 836D | 08C4 | 868D | FEFC | 5016 | B09A |
| 0000455140 | 0A27 | 836E | 04C4 | F08B | 828D | FEFC | 8689 | FEF8 |
| 0000455160 | 968C | FEFA | 9EC4 | FEF8 | 8026 | 5C3F | 0375 | 14E9 |
| 0000455200 | C400 | F89E | 26FE | 3F80 | 752F | E903 | 0007 | 8EFF |
| 0000455220 | FEF8 | DFE9 | FFFF | F886 | C4FE | F89E | 26FE | 07C6 |
| 0000455240 | 8D00 | FC86 | 16FE | 9A50 | 27B0 | 6E24 | C483 | 2D04 |
| 0000455260 | 00FF | D8F7 | FF50 | 0876 | 76FF | 8D06 | FC86 | 16FE |
| 0000455300 | 9A50 | 27C8 | 6E42 | C483 | C60A | FB46 | 8D00 | FC86 |
| 0000455320 | 16FE | 8A50 | E62E | 2A48 | 81C9 | ECC1 | 1E48 | 9A51 |
| 0000455340 | 2750 | 6E60 | C483 | 8D08 | FC86 | 89FE | 0646 | 568C |
| 0000455360 | FF08 | 0876 | 76FF | 8D06 | F486 | 16FD | 9A50 | 2750 |
| 0000455400 | 6E6E | C483 | 8D08 | F486 | 16FD | 9A50 | 27B0 | 6EDA |
| 0000455420 | C483 | 8B04 | 8DF0 | F482 | 89FD | F886 | 8CFE | FA96 |
| 0000455440 | C4FE | F89E | 26FE | 3F80 | 755C | E903 | 0014 | 9EC4 |
| 0000455460 | FEF8 | 8026 | 2F3F | 0375 | 07E9 | FF00 | F88E | E9FE |
| 0000455500 | FFDF | 9EC4 | FEF8 | C626 | 0007 | 868D | FDF4 | 5016 |
| 0000455520 | 006A | 006A | 868D | FEF4 | 5016 | 0B9A | C031 | 896F |
| 0000455540 | FC46 | 7E83 | 00FC | 0375 | 06E9 | 8B00 | FC46 | F7E9 |
| 0000455560 | FF00 | 0876 | 76FF | 9A06 | 27B0 | 6F1F | C483 | 0304 |
| 0000455600 | 0646 | 568B | 8908 | F886 | 89FE | FA96 | C4FE | F89E |
| 0000455620 | 26FE | 3F80 | 755C | E903 | 0014 | 9EC4 | FEF8 | 8026 |
| 0000455640 | 2F3F | 0375 | 07E9 | FF00 | F88E | E9FE | FFDF | 86FF |
| 0000455660 | FEF8 | 016A | B6FF | FEFA | B6FF | FEF8 | B09A | 3527 |
| 0000455700 | 836F | 04C4 | 9EC4 | FEF4 | FF26 | 4A77 | FF26 | 4877 |
| 0000455720 | F08B | B09A | 4327 | 836F | 04C4 | F003 | C683 | 5602 |
| 0000455740 | 769A | 8033 | 836F | 04C4 | 5EC4 | 260A | 0789 | 8926 |
| 0000455760 | 0257 | 5EC4 | 260A | 478B | 2602 | 070B | 0374 | 06E9 |
| 0000456000 | B800 | 0007 | 61E9 | C400 | F49E | 26FE | 77FF | 264A |
| 0000456020 | 77FF | C448 | 0A5E | FF26 | 0277 | FF26 | 9A37 | 2750 |
| 0000456040 | 6F96 | C483 | 1E08 | 5668 | C42D | 0A5E | FF26 | 0277 |
| 0000456060 | FF26 | 9A37 | 270A | 6FB0 | C483 | FF08 | FAB6 | FFFE |
| 0000456100 | F8B6 | C4FE | 0A5E | FF26 | 0277 | FF26 | 9A37 | 270A |
| 0000456120 | 6D6B | C483 | FF08 | F6B6 | FFFE | F4B6 | 9AFE | 3425 |
| 0000456140 | 4079 | 00B8 | E900 | 0000 | 5F5E | ED83 | 8B02 | 1FE5 |
| 0000456160 | 4D5D | 1ECB | 9058 | 5545 | EC8B | 8E1E | 81D8 | 06EC |
| 0000456200 | 5701 | 8B56 | 0846 | 460B | 7506 | E903 | 000B | 468B |
| 0000456220 | 0B0C | 0A46 | 0374 | 06E9 | B800 | 0017 | 5CE9 | C401 |
| 0000456240 | 065E | 8026 | 403F | 0375 | 06E9 | B800 | 0013 | 4AE9 |
| 0000456260 | FF01 | 0646 | 76FF | FF08 | 0676 | B09A | 5527 | 8370 |

THU MAR 14 17:31:54 1991 DB_PI.DLL PAGE 165, LINE 9677

| | | | | | | | | |
|---|---|---|---|---|---|---|---|---|
| 0000456300 | 04C4 | 033D | 7700 | E903 | 0077 | 5EC4 | 2606 | 7F80 |
| 0000456320 | 3A01 | 0374 | 6AE9 | C400 | 065E | 8026 | 027F | 755C |
| 0000456340 | E903 | 0006 | BFB8 | E901 | 0111 | 016A | 76FF | FF08 |
| 0000456360 | 0676 | B09A | 5F27 | 8370 | 04C4 | 5040 | 769A | 9633 |
| 0000456400 | 8370 | 04C4 | 5EC4 | 260A | 0789 | 8926 | 0257 | 5EC4 |
| 0000456420 | 260A | 478B | 2602 | 070B | 0374 | 06E9 | B800 | 0007 |
| 0000456440 | D8E9 | FF00 | 0876 | 76FF | C406 | 0A5E | FF26 | 0277 |
| 0000456460 | FF26 | 9A37 | 2750 | 70B5 | C483 | B808 | 0000 | BAE9 |
| 0000456500 | 8A00 | E626 | 2A48 | 05C0 | 3CD0 | 501E | 868D | FEFA |
| 0000456520 | 5016 | 509A | C527 | 8370 | 08C4 | 5C6A | 868D | FEFA |
| 0000456540 | 5016 | 3E9A | E53C | 8370 | 06C4 | 4689 | 89FA | FC56 |
| 0000456560 | 46FF | C4FA | ·A5E | C626 | 0007 | 016A | 868D | FEFA |
| 0000456600 | 5016 | B09A | F527 | 8370 | 04C4 | 76FF | FF08 | 0676 |
| 0000456620 | F08B | B09A | 0127 | 8371 | 04C4 | F003 | 5646 | 769A |
| 0000456640 | 3833 | 8371 | 04C4 | 5EC4 | 260A | 0789 | 8926 | 0257 |
| 0000456660 | 5EC4 | 260A | 478B | 2602 | 070B | 0374 | 06E9 | B800 |
| 0000456700 | 0007 | 36E9 | 8D00 | FA86 | 16FE | C450 | 0A5E | FF26 |
| 0000456720 | 0277 | FF26 | 9A37 | 2750 | 7150 | C483 | FF08 | 0876 |
| 0000456740 | 76FF | C406 | 0A5E | FF26 | 0277 | FF26 | 9A37 | 270A |
| 0000456760 | 6DB3 | C483 | B808 | 0000 | 00E9 | 5E00 | 835F | 02ED |
| 0000457000 | E58B | 5D1F | CB4D | 581E | 4590 | 8B55 | 1EEC | D88E |
| 0000457020 | EC81 | 0004 | 5657 | 06C7 | 48E6 | 0000 | 76FF | FF08 |
| 0000457040 | 0676 | 268A | 48E6 | C02A | EC05 | 1E48 | 9A50 | 2750 |
| 0000457060 | 71A9 | C483 | 8308 | 0A7E | 7500 | E903 | 004C | 016A |
| 0000457100 | 76FF | FF08 | 0676 | B09A | B327 | 8371 | 04C4 | 5040 |
| 0000457120 | 769A | E233 | 8371 | 04C4 | 26A3 | 8957 | 2816 | A157 |
| 0000457140 | 5728 | 060B | 5726 | 0374 | 06E9 | B800 | 0007 | 50E9 |
| 0000457160 | FF01 | 0876 | 76FF | FF06 | 2836 | FF57 | 2636 | 9A57 |
| 0000457200 | 2750 | 7229 | C483 | E908 | 0029 | 681E | 5726 | 268A |
| 0000457220 | 48E6 | C02A | EC05 | 1E48 | 9A50 | 6D19 | 6B5B | C483 |
| 0000457240 | 8908 | FC46 | 7E83 | 00FC | 0375 | 06E9 | 8B00 | FC46 |
| 0000457260 | 0EE9 | FF01 | 2836 | FF57 | 2636 | 8A57 | E626 | 2A48 |
| 0000457300 | 05C0 | 3DD0 | 501E | 509A | 3D27 | 8372 | 08C4 | 681E |
| 0000457320 | 2D58 | 36FF | 5728 | 36FF | 5726 | 569A | A606 | 8372 |
| 0000457340 | 08C4 | 1E8B | 48E6 | E3C1 | 8902 | EE87 | 8953 | F097 |
| 0000457360 | 8B53 | E61E | C148 | 02E3 | 878B | 53EE | 978B | 53F0 |
| 0000457400 | 4AA3 | 892D | 4C16 | A12D | 2D4C | 060B | 2D4A | 0374 |
| 0000457420 | 21E9 | FF00 | 2836 | FF57 | 2636 | 9A57 | 0975 | 7311 |
| 0000457440 | C02B | 28A3 | A357 | 5726 | 06C7 | 142E | 0000 | 08B8 |
| 0000457460 | E900 | 008D | 1E8B | 48E6 | E3C1 | FF02 | F0B7 | FF53 |
| 0000457500 | EEB7 | 9A53 | 30C4 | 72D6 | C483 | C704 | 3006 | 0014 |
| 0000457520 | 8B00 | E61E | D148 | C7E3 | D0B7 | 0148 | C700 | 3206 |
| 0000457540 | 0014 | C700 | 3606 | 0014 | 6A00 | FF20 | 3A36 | FF14 |
| 0000457560 | 3836 | 9A14 | 32A4 | 701D | C483 | A306 | 1438 | 1689 |
| 0000457600 | 143A | 3AA1 | 0B14 | 3806 | 7414 | E903 | 0006 | 07B8 |
| 0000457620 | E900 | 002D | 06C7 | 143C | 0020 | 06C7 | 1434 | 0000 |
| 0000457640 | 06C7 | 142E | 0001 | 36FF | 5728 | 36FF | 5726 | 759A |
| 0000457660 | BD09 | 2B6E | A3C0 | 5728 | 26A3 | B857 | 0000 | 00E9 |
| 0000457700 | 5E00 | 835F | 02ED | E58B | 5D1F | CB4D | 581E | 4590 |
| 0000457720 | 8B55 | 1EEC | D88E | EC81 | 0000 | 5657 | 76FF | FF08 |
| 0000457740 | 0676 | B09A | 7627 | 8373 | 04C4 | 5EC4 | 260A | 073B |
| 0000457760 | 037D | 76E9 | C400 | 0A5E | 8326 | 003F | 0374 | 0CE9 |
| 0000460000 | C400 | 0E5E | C02B | 8926 | 0247 | 8926 | FF07 | 0876 |
| 0000460020 | 76FF | 9A06 | 27B0 | 738A | C483 | 4004 | C450 | 0E5E |
| 0000460040 | FF26 | 0277 | FF26 | 9A37 | 32A4 | 73BF | C483 | C406 |
| 0000460060 | 0E5E | 8926 | 2607 | 5789 | C402 | 0E5E | 8B26 | 0247 |
| 0000460100 | 0B26 | 7407 | E903 | 000E | 5EC4 | 260A | 07C7 | 0000 |
| 0000460120 | 07B8 | E900 | 0033 | 76FF | FF08 | 0676 | B09A | DE27 |
| 0000460140 | 8373 | 04C4 | C440 | 0A5E | 8926 | FF07 | 0876 | 76FF |

THU MAR 14 17:31:54 1991 DB_PI.DLL PAGE 166, LINE 9736

| | | | | | | | | |
|---|---|---|---|---|---|---|---|---|
| 0000460160 | C406 | 0E5E | FF26 | 0277 | FF26 | 9A37 | 2750 | 7190 |
| 0000460200 | C483 | B808 | 0000 | 00E9 | 5E00 | 835F | 02ED | E58B |
| 0000460220 | 5D1F | CB4D | 581E | 4590 | 8B55 | 1EEC | D88E | EC81 |
| 0000460240 | 000A | 5657 | 468B | 8B06 | 0856 | 4689 | 89F6 | F856 |
| 0000460260 | 4689 | 89FA | FC56 | 5EC4 | 26FA | 3F80 | 7422 | E903 |
| 0000460300 | 0007 | 5EC4 | 26FA | 07C6 | FF7F | F646 | 46FF | C4FA |
| 0000460320 | F65E | 8026 | 003F | 0375 | 73E9 | C400 | F65E | 8026 |
| 0000460340 | 223F | 0375 | 67E9 | C400 | F65E | 8026 | 5C3F | 0374 |
| 0000460360 | 46E9 | FF00 | F646 | 5EC4 | 26F6 | 078A | E998 | 0023 |
| 0000460400 | 5EC4 | 26FA | 07C6 | E909 | 002C | 5EC4 | 26FA | 07C6 |
| 0000460420 | E90A | 0022 | 5EC4 | 26F6 | 078A | 5EC4 | 26FA | 0788 |
| 0000460440 | 13E9 | 2D00 | 006E | 0375 | DFE9 | 2DFF | 0006 | 0375 |
| 0000460460 | CDE9 | E9FF | FFDE | 0CE9 | C400 | F65E | 8A26 | C407 |
| 0000460500 | FA5E | 8826 | FF07 | FA46 | 46FF | E9F6 | FF81 | 5EC4 |
| 0000460520 | 26F6 | 3F80 | 7422 | E903 | 000A | 5EC4 | 26FA | 07C6 |
| 0000460540 | FF7F | FA46 | 5EC4 | 26FA | 07C6 | B800 | 0000 | 00E9 |
| 0000460560 | 5E00 | 835F | 02ED | E58B | 5D1F | CB4D | 581E | 4590 |
| 0000460600 | 8B55 | 1EEC | D88E | EC81 | 0000 | 5657 | 1E8B | 48E6 |
| 0000460620 | E3C1 | FF02 | F0B7 | FF53 | EEB7 | 9A53 | 0502 | 7345 |
| 0000460640 | C483 | FF04 | E60E | 8348 | E63E | 0048 | 037C | DBE9 |
| 0000460660 | 5EFF | 835F | 02ED | E58B | 5D1F | CB4D | 581E | 4590 |
| 0000460700 | 8B55 | 1EEC | D88E | EC81 | 0106 | 5657 | 3E83 | 142E |
| 0000460720 | 7400 | E903 | 0006 | 95B8 | E901 | 057C | 268A | 48E6 |
| 0000460740 | C02A | EC05 | 1E48 | FF50 | 1476 | 76FF | 9A12 | 2750 |
| 0000460760 | 756C | C483 | 8B08 | E61E | D148 | 8BE3 | D087 | C448 |
| 0000461000 | 0E5E | 8926 | 1E07 | BE68 | 9A3D | 4150 | 74FE | C483 |
| 0000461020 | C404 | 065E | 8926 | C407 | 065E | 8326 | 003F | 0374 |
| 0000461040 | 0EE9 | 9A00 | 66D5 | 75D5 | 5EC4 | 2606 | 0789 | 08E9 |
| 0000461060 | C400 | 065E | C726 | 2207 | 8B00 | E61E | D148 | 8BE3 |
| 0000461100 | D087 | C448 | 0E5E | 8926 | C407 | 065E | 8B26 | E907 |
| 0000461120 | 04A7 | 5EC4 | 2606 | 07C7 | 000C | 3E83 | 1432 | 7400 |
| 0000461140 | E903 | 0031 | 76FF | FF0C | 0A76 | 681E | 1434 | 681E |
| 0000461160 | 2D5A | 2C9A | 1B73 | 8376 | 0CC4 | 8689 | FEFC | BE83 |
| 0000461200 | FEFC | 7500 | E903 | 0006 | 06C7 | 142E | 0000 | 868B |
| 0000461220 | FEFC | C3E9 | E904 | 04B7 | 06C7 | 1432 | 0000 | 76FF |
| 0000461240 | FF0C | 0A76 | 681E | 1434 | 068E | 3A9E | A126 | 0000 |
| 0000461260 | 8B26 | 0216 | 4000 | 5052 | 2C9A | 5F73 | 8376 | 0CC4 |
| 0000461300 | 8689 | FEFC | BE83 | FEFC | 7500 | E903 | 0006 | 06C7 |
| 0000461320 | 142E | 0000 | 868B | FEFC | 7DE9 | E904 | 0471 | 06C7 |
| 0000461340 | 1432 | 0000 | 76FF | FF0C | 0A76 | 681E | 1434 | 068E |
| 0000461360 | 3A9E | FF26 | 0236 | 2600 | 36FF | 0000 | 2C9A | FC73 |
| 0000461400 | 8371 | 0CC4 | 8689 | FEFC | BE83 | FEFC | 7500 | E903 |
| 0000461420 | 0006 | 06C7 | 142E | 0000 | 868B | FEFC | 39E9 | E904 |
| 0000461440 | 042D | 2AE9 | 8304 | 323E | 0014 | 0375 | 76E9 | C701 |
| 0000461460 | 3206 | 0014 | 8300 | E63E | 0A48 | 037D | 13E9 | C400 |
| 0000461500 | 065E | C726 | 1F07 | 9A00 | 74DC | 7714 | C0B8 | E901 |
| 0000461520 | 0406 | 06FF | 48E6 | 38A1 | 8B14 | 3A16 | 4014 | 5052 |
| 0000461540 | 868D | FEFE | 5016 | 509A | D727 | 8376 | 08C4 | 868D |
| 0000461560 | FEFE | 5016 | B09A | F827 | 8376 | 04C4 | F08B | 82C6 |
| 0000461600 | FEFD | 8D00 | FE86 | 16FE | 8A50 | E62E | 2A48 | 81C9 |
| 0000461620 | ECC1 | 1E48 | 9A51 | 2750 | 775D | C483 | 8008 | FEBE |
| 0000461640 | 40FE | 0375 | 19E9 | 1E00 | 2A68 | 8D57 | FE86 | 16FE |
| 0000461660 | 9A50 | 6D19 | 772D | C483 | 8908 | FC86 | E9FE | 0016 |
| 0000461700 | 681E | 572A | 868D | FEFE | 5016 | D39A | D16F | 8377 |
| 0000461720 | 08C4 | 8689 | FEFC | BE83 | FEFC | 7500 | E903 | 0007 |
| 0000461740 | 868B | FEFC | 71E9 | FF03 | 2C36 | FF57 | 2A36 | 8A57 |
| 0000461760 | E626 | 2A48 | 05C0 | 3DD0 | 501E | 509A | 7127 | 8377 |
| 0000462000 | 08C4 | 681E | 2D5C | 36FF | 572C | 36FF | 572A | 569A |
| 0000462020 | EB06 | 8377 | 08C4 | 1E8B | 48E6 | E3C1 | 8902 | EE87 |

THU MAR 14 17:31:54 1991 DB_PI.DLL PAGE 167, LINE 9795

| | | | | | | | | |
|---|---|---|---|---|---|---|---|---|
| 0000462040 | 8953 | F097 | 8B53 | E61E | C148 | 02E3 | 878B | 53EE |
| 0000462060 | 978B | 53F0 | 4AA3 | 892D | 4C16 | A12D | 2D4C | 060B |
| 0000462100 | 2D4A | 0374 | 32E9 | FF00 | 2C36 | FF57 | 2A36 | 9A57 |
| 0000462120 | 0975 | 727E | C02B | 2CA3 | A357 | 572A | 06C7 | 142E |
| 0000462140 | 0000 | 5EC4 | 2606 | 07C7 | 001F | 0EFF | 48E6 | DC9A |
| 0000462160 | 2A74 | B878 | 0008 | DFE9 | 8B02 | E61E | C148 | 02E3 |
| 0000462200 | B7FF | 53F0 | B7FF | 53EE | C49A | B230 | 8378 | 04C4 |
| 0000462220 | 1E8B | 48E6 | E3D1 | 87C7 | 48D0 | 0001 | 06C7 | 1430 |
| 0000462240 | 0001 | 75E9 | C700 | 3206 | 0014 | 8300 | 363E | 0014 |
| 0000462260 | 0374 | 1EE9 | FF00 | 0C76 | 76FF | 1E0A | 3468 | FF14 |
| 0000462300 | 3A36 | FF14 | 3836 | 9A14 | 732C | 7857 | C483 | 890C |
| 0000462320 | FC86 | 83FE | FCBE | 00FE | 0375 | 0DE9 | C700 | 2E06 |
| 0000462340 | 0014 | 8B00 | FC86 | E9FE | 026E | 5EC4 | 260A | 77FF |
| 0000462360 | 2602 | 37FF | F49A | 9873 | 8378 | 04C4 | 8689 | FEFC |
| 0000462400 | BE83 | FEFC | 7500 | E903 | 0006 | 06C7 | 142E | 0000 |
| 0000462420 | 868B | FEFC | 41E9 | E902 | 0235 | 32E9 | FF02 | 0C76 |
| 0000462440 | 76FF | 1E0A | 3468 | 8E14 | 9E06 | 263A | 36FF | 0002 |
| 0000462460 | FF26 | 0036 | 9A00 | 732C | 78D6 | C483 | 1E0C | 5E68 |
| 0000462500 | 8E2D | 9E06 | 263A | 36FF | 0002 | FF26 | 0036 | 9A00 |
| 0000462520 | 2786 | 7550 | C483 | 3D08 | 0000 | 0375 | 22E9 | C700 |
| 0000462540 | 3206 | 0014 | C400 | 065E | C726 | 2107 | C700 | 2E06 |
| 0000462560 | 0014 | 9A00 | 74DC | 790B | BFB8 | E901 | 01DA | 06E9 |
| 0000462600 | C700 | 3206 | 0114 | E900 | 01C5 | 06C7 | 1432 | 0000 |
| 0000462620 | 76FF | FF0C | 0A76 | 681E | 1434 | 068E | 3A9E | FF26 |
| 0000462640 | 0236 | 2600 | 36FF | 0000 | 2C9A | 8673 | 8375 | 0CC4 |
| 0000462660 | 8689 | FEFC | BE83 | FEFC | 7500 | E903 | 0006 | 06C7 |
| 0000462700 | 142E | 0000 | 868B | FEFC | 8DE9 | E901 | 0181 | 06C7 |
| 0000462720 | 1432 | 0000 | 76FF | FF0C | 0A76 | 681E | 1434 | 068E |
| 0000462740 | 3A9E | FF26 | 0236 | 2600 | 36FF | 0000 | 2C9A | 9173 |
| 0000462760 | 8379 | 0CC4 | 8689 | FEFC | BE83 | FEFC | 7500 | E903 |
| 0000463000 | 0006 | 06C7 | 142E | 0000 | 868B | FEFC | 49E9 | E901 |
| 0000463020 | 013D | 06C7 | 1432 | 0000 | 5EC4 | 2606 | 07C7 | 001A |
| 0000463040 | 76FF | FF0C | 0A76 | 681E | 1434 | 681E | 2D67 | 2C9A |
| 0000463060 | CF73 | 8379 | 0CC4 | 8689 | FEFC | BE83 | FEFC | 7500 |
| 0000463100 | E903 | 0006 | 06C7 | 142E | 0000 | 868B | FEFC | 07E9 |
| 0000463120 | E901 | 00FB | 76FF | FF0C | 0A76 | 681E | 1434 | 068E |
| 0000463140 | 3A9E | FF26 | 0236 | 2600 | 36FF | 0000 | 2C9A | E373 |
| 0000463160 | 8379 | 0CC4 | 06C7 | 1432 | 0000 | 06C7 | 142E | 0000 |
| 0000463200 | D59A | F366 | 5D79 | 0000 | 0375 | 03E9 | E900 | FFF0 |
| 0000463220 | DC9A | 4E74 | B87A | 01BF | BDE9 | 8B00 | E61E | C148 |
| 0000463240 | 02E3 | B7FF | 53F0 | B7FF | 53EE | 029A | C905 | 8376 |
| 0000463260 | 04C4 | 3E83 | 48E6 | 7F00 | E903 | 0023 | 0EFF | 48E6 |
| 0000463300 | 1E8B | 48E6 | E3C1 | 8B02 | EE87 | 8B53 | F097 | A353 |
| 0000463320 | 2D4A | 1689 | 2D4C | 06C7 | 1430 | 0000 | 06E9 | B800 |
| 0000463340 | 0000 | 73E9 | E900 | 0067 | 64E9 | 9A00 | 74DC | 76AA |
| 0000463360 | F4B8 | E901 | 0062 | 56E9 | 3D00 | 0022 | 0376 | EAE9 |
| 0000463400 | D1FF | 93E0 | FF2E | 69A7 | FB7A | 3E79 | 3E76 | 3E76 |
| 0000463420 | F876 | 8275 | 8576 | 3E76 | 7D76 | EA78 | 2E78 | 4B79 |
| 0000463440 | B27A | 4875 | 4B7A | 4B7A | 4B7A | 4B7A | 4B7A | 4B7A |
| 0000463460 | 4B7A | 4B7A | 4B7A | B27A | B275 | 4B75 | 727A | 4B79 |
| 0000463500 | 727A | 7279 | 3E79 | B476 | B479 | B479 | B479 | E979 |
| 0000463520 | FAB3 | F4B8 | E901 | 0000 | 5F5E | ED83 | 8B02 | 1FE5 |
| 0000463540 | 4D5D | 00CB | 581E | 4590 | 8B55 | 1EEC | D88E | EC81 |
| 0000463560 | 0004 | 5657 | 5EC4 | 260E | 77FF | 2602 | 37FF | B09A |
| 0000463600 | F127 | 837A | 04C4 | 76FF | FF08 | 0676 | F08B | B09A |
| 0000463620 | 3927 | 837B | 04C4 | F003 | 7689 | C4FC | 0A5E | 468B |
| 0000463640 | 26FC | 0739 | 037E | 66E9 | C400 | 0A5E | 8326 | 003F |
| 0000463660 | 0374 | 12E9 | C400 | 0E5E | 8B26 | 0247 | 0B26 | 7407 |
| 0000463700 | E903 | 0003 | 00E9 | 8B00 | FC46 | 5040 | 5EC4 | 260E |

THU MAR 14 17:31:54 1991 DB_PI.DLL PAGE 168, LINE 9854

| | | | | | | | | |
|---|---|---|---|---|---|---|---|---|
| 0000463720 | 77FF | 2602 | 37FF | A49A | 8232 | 837B | 06C4 | 5EC4 |
| 0000463740 | 260E | 0789 | 8926 | 0257 | 5EC4 | 260E | 478B | 2602 |
| 0000463760 | 070B | 0374 | 0EE9 | C400 | 0A5E | C726 | 0007 | B800 |
| 0000464000 | 0007 | 28E9 | 8B00 | FC46 | C440 | 0A5E | 8926 | FF07 |
| 0000464020 | 0876 | 76FF | C406 | 0E5E | FF26 | 0277 | FF26 | 9A37 |
| 0000464040 | 270A | 7A0D | C483 | B808 | 0000 | 00E9 | 5E00 | 835F |
| 0000464060 | 02ED | E58B | 5D1F | CB4D | 581E | 4590 | 8B55 | 1EEC |
| 0000464100 | D88E | EC81 | 0046 | 5657 | C02B | 4689 | 89DA | D846 |
| 0000464120 | 46C7 | 00D0 | B800 | 001A | 4689 | 89FC | D646 | 46C7 |
| 0000464140 | 02C6 | 2B00 | 89C0 | D446 | 4689 | B8D2 | 0000 | 4689 |
| 0000464160 | 89CC | CA46 | 46C7 | 00CE | C400 | 185E | C626 | 0007 |
| 0000464200 | 5EC4 | 261C | 07C7 | 0000 | 5EC4 | 2620 | 07C7 | 0000 |
| 0000464220 | 206A | 3E9A | 2024 | 837C | 02C4 | 6CA3 | 892D | 6E16 |
| 0000464240 | A12D | 2D6E | 060B | 2D6C | 0374 | 06E9 | B800 | 0007 |
| 0000464260 | CDE9 | C709 | 7006 | 202D | 6A00 | 6A01 | 9A10 | 3376 |
| 0000464300 | 7C41 | C483 | 8904 | D246 | 5689 | 8BD4 | D446 | 460B |
| 0000464320 | 74D2 | E903 | 0016 | 36FF | 2D6E | 36FF | 2D6C | 489A |
| 0000464340 | 8424 | 837C | 04C4 | 07B8 | E900 | 0994 | 1EC4 | 2D6C |
| 0000464360 | C626 | 0007 | 76FF | FF0A | 0876 | 76FF | 9A06 | 7166 |
| 0000464400 | 7CD2 | C483 | 8906 | D046 | 7E83 | 00D0 | 0375 | 1EE9 |
| 0000464420 | C400 | 205E | C726 | 0107 | FF00 | 6E36 | FF2D | 6C36 |
| 0000464440 | 9A2D | 2448 | 7CFA | C483 | 8B04 | D046 | 51E9 | 8309 |
| 0000464460 | FC7E | 7500 | E903 | 08B1 | 7E83 | 1FFC | 0375 | A8E9 |
| 0000464500 | 8308 | FC7E | 7520 | E903 | 089F | 7E83 | 21FC | 0375 |
| 0000464520 | 96E9 | 8B08 | FC46 | 4689 | FFD6 | 1A76 | 76FF | FF18 |
| 0000464540 | 1E76 | 76FF | 8D1C | D246 | 5016 | 468D | 16FC | 9A50 |
| 0000464560 | 751C | 7DDA | C483 | 8910 | D046 | 7E83 | 00D0 | 0375 |
| 0000464600 | 68E9 | A100 | 2D6E | 060B | 2D6C | 0375 | 24E9 | FF00 |
| 0000464620 | 6E36 | FF2D | 6C36 | 9A2D | 2448 | 7D2A | C483 | B804 |
| 0000464640 | 0000 | 00BA | A300 | 2D6C | 1689 | 2D6E | D00B | 0374 |
| 0000464660 | 03E9 | E900 | 0000 | 468B | 0BD4 | D246 | 0375 | 21E9 |
| 0000464700 | FF00 | D476 | 76FF | 9AD2 | 2448 | 7D74 | C483 | B804 |
| 0000464720 | 0000 | 00BA | 8900 | D246 | 5689 | 0BD4 | 74D0 | E903 |
| 0000464740 | 0003 | 00E9 | 8B00 | D046 | 95E9 | 8308 | C67E | 7403 |
| 0000464760 | E903 | 0071 | 7E83 | 03FC | 0375 | 68E9 | A100 | 2D6E |
| 0000465000 | 060B | 2D6C | 0375 | 24E9 | FF00 | 6E36 | FF2D | 6C36 |
| 0000465020 | 9A2D | 2448 | 7DA4 | C483 | B804 | 0000 | 00BA | A300 |
| 0000465040 | 2D6C | 1689 | 2D6E | D00B | 0374 | 03E9 | E900 | 0000 |
| 0000465060 | 468B | 0BD4 | D246 | 0375 | 21E9 | FF00 | D476 | 76FF |
| 0000465100 | 9AD2 | 2448 | 7E02 | C483 | B804 | 0000 | 00BA | 8900 |
| 0000465120 | D246 | 5689 | 0BD4 | 74D0 | E903 | 0003 | 00E9 | B800 |
| 0000465140 | 01BF | 1BE9 | 8B08 | FC46 | 27E9 | 1E07 | 6C68 | 1E2D |
| 0000465160 | 7068 | 1E2D | 6A68 | 9A2D | 7AC4 | 794F | C483 | 890C |
| 0000465200 | D046 | 7E83 | 00D0 | 0375 | 68E9 | A100 | 2D6E | 060B |
| 0000465220 | 2D6C | 0375 | 24E9 | FF00 | 6E36 | FF2D | 6C36 | 9A2D |
| 0000465240 | 2448 | 7E32 | C483 | B804 | 0000 | 00BA | A300 | 2D6C |
| 0000465260 | 1689 | 2D6E | D00B | 0374 | 03E9 | E900 | 0000 | 468B |
| 0000465300 | 0BD4 | D246 | 0375 | 21E9 | FF00 | D476 | 76FF | 9AD2 |
| 0000465320 | 2448 | 7AE1 | C483 | B804 | 0000 | 00BA | 8900 | D246 |
| 0000465340 | 5689 | 0BD4 | 74D0 | E903 | 0003 | 00E9 | 8B00 | D046 |
| 0000465360 | 8DE9 | E907 | 06F0 | 681E | 2D6C | 631E | 2D70 | 76FF |
| 0000465400 | FFD4 | D276 | C49A | DB7A | 837F | 0CC4 | 4689 | 83D0 |
| 0000465420 | D07E | 7500 | E903 | 0068 | 6EA1 | 0B2D | 6C06 | 752D |
| 0000465440 | E903 | 0024 | 36FF | 2D6E | 36FF | 2D6C | 489A | BF24 |
| 0000465460 | 837E | 04C4 | 00B8 | BA00 | 0000 | 6CA3 | 892D | 6E16 |
| 0000465500 | 0B2D | 74D0 | E903 | 0003 | 00E9 | 8B00 | D446 | 460B |
| 0000465520 | 75D2 | E903 | 0021 | 76FF | FFD4 | D276 | 489A | 0324 |
| 0000465540 | 837F | 04C4 | 00B8 | BA00 | 0000 | 4689 | 89D2 | D456 |
| 0000465560 | D00B | 0374 | 03E9 | E900 | 0000 | 468B | E9D0 | 0700 |

THU MAR 14 17:31:54 1991 DB_PI.DLL PAGE 169, LINE 9913

| | | | | | | | | |
|---|---|---|---|---|---|---|---|---|
| 0000465600 | 63E9 | 8306 | C67E | 7503 | E903 | 0068 | 6EA1 | 0B2D |
| 0000465620 | 6C06 | 752D | E903 | 0024 | 36FF | 2D6E | 36FF | 2D6C |
| 0000465640 | 489A | 3324 | 837F | 04C4 | 00B8 | BA00 | 0000 | 6CA3 |
| 0000465660 | 892D | 6E16 | 0B2D | 74D0 | E903 | 0003 | 00E9 | 8B00 |
| 0000465700 | D446 | 460B | 75D2 | E903 | 0021 | 76FF | FFD4 | D276 |
| 0000465720 | 489A | 6C24 | 837F | 04C4 | 00B8 | BA00 | 0000 | 4689 |
| 0000465740 | 89D2 | D456 | D00B | 0374 | 03E9 | E900 | 0000 | BFB8 |
| 0000465760 | E901 | 068C | 46C7 | 0DC6 | E900 | 05EA | 1F6A | 76FF |
| 0000466000 | FFD4 | D276 | 468D | 16DC | 9A50 | 2804 | 7FAC | C483 |
| 0000466020 | C60A | FB46 | C400 | 6C1E | 262D | 07C6 | C700 | C646 |
| 0000466040 | 0003 | 46C7 | 01CE | E900 | 05BC | 7E83 | 00CC | 0374 |
| 0000466060 | F3E9 | 8300 | D67E | 741A | E903 | 002E | 1F6A | 76FF |
| 0000466100 | FFD4 | D276 | 468D | 16DC | 9A50 | 2804 | 8003 | C483 |
| 0000466120 | C60A | FB46 | C400 | 6C1E | 262D | 07C6 | C700 | C646 |
| 0000466140 | 0003 | 46C7 | 01CE | E900 | 00B9 | 681E | 2D6C | 681E |
| 0000466160 | 2D70 | 76FF | FFD4 | D276 | C49A | 417A | 8381 | 0CC4 |
| 0000466200 | 4689 | 83D0 | D07E | 7500 | E903 | 0097 | 6EA1 | 0B2D |
| 0000466220 | 6C06 | 752D | E903 | 0024 | 36FF | 2D6E | 36FF | 2D6C |
| 0000466240 | 489A | 3324 | 8380 | 04C4 | 00B8 | BA00 | 0000 | 6CA3 |
| 0000466260 | 892D | 6E16 | 0B2D | 74D0 | E903 | 0003 | 00E9 | 8B00 |
| 0000466300 | D446 | 460B | 75D2 | E903 | 0021 | 76FF | FFD4 | D276 |
| 0000466320 | 489A | 6224 | 8380 | 04C4 | 00B8 | BA00 | 0000 | 4689 |
| 0000466340 | 89D2 | D456 | D00B | 0374 | 03E9 | E900 | 0000 | 468B |
| 0000466360 | 0BDA | D846 | 0375 | 21E9 | FF00 | DA76 | 76FF | 9AD8 |
| 0000466400 | 2448 | 80A6 | C483 | B804 | 0000 | 00BA | 8900 | D846 |
| 0000466420 | 5689 | 0BDA | 74D0 | E903 | 0003 | 00E9 | 8B00 | D046 |
| 0000466440 | 5DE9 | E905 | 022A | 7E83 | 00CA | 0375 | 9AE9 | A100 |
| 0000466460 | 2D6E | 060B | 2D6C | 0375 | 24E9 | FF00 | 6E36 | FF2D |
| 0000466500 | 6C36 | 9A2D | 2448 | 80D6 | C483 | B804 | 0000 | 00BA |
| 0000466520 | A300 | 2D6C | 1689 | 2D6E | D00B | 0374 | 03E9 | E900 |
| 0000466540 | 0000 | 468B | 0BD4 | D246 | 0375 | 21E9 | FF00 | D476 |
| 0000466560 | 76FF | 9AD2 | 2448 | 8105 | C483 | B804 | 0000 | 00BA |
| 0000466600 | 8900 | D246 | 5689 | 0BD4 | 74D0 | E903 | 0003 | 00E9 |
| 0000466620 | 8B00 | DA46 | 460B | 75D8 | E903 | 0021 | 76FF | FFDA |
| 0000466640 | D876 | 489A | 7724 | 8381 | 04C4 | 00B8 | BA00 | 000D |
| 0000466660 | 4689 | 89D8 | DA56 | D00B | 0374 | 03E9 | E900 | 0000 |
| 0000466700 | BFB8 | E901 | 04BA | 87E9 | C701 | CA46 | 0001 | 468D |
| 0000466720 | 16C8 | 8D50 | D846 | 5016 | 76FF | FFD4 | D276 | 8C9A |
| 0000466740 | 6087 | 837C | 04C4 | 5052 | 76FF | FF0E | 0C76 | 5EFF |
| 0000466760 | 8314 | 10C4 | 4689 | 83D0 | D07E | 7500 | E903 | 0097 |
| 0000467000 | 6EA1 | 0B2D | 6C06 | 752D | E903 | 0024 | 36FF | 2D6E |
| 0000467020 | 36FF | 2D6C | 489A | A724 | 8381 | 04C4 | 00B8 | BA00 |
| 0000467040 | 0000 | 6CA3 | 892D | 6E16 | 0B2D | 74D0 | E903 | 0003 |
| 0000467060 | 00E9 | 8B00 | D446 | 460B | 75D2 | E903 | 0021 | 76FF |
| 0000467100 | FFD4 | D276 | 489A | D624 | 8381 | 04C4 | 00B8 | BA00 |
| 0000467120 | 0000 | 4689 | 89D2 | D456 | D00B | 0374 | 03E9 | E900 |
| 0000467140 | 0000 | 468B | 0BDA | D846 | 0375 | 21E9 | FF00 | DA76 |
| 0000467160 | 76FF | 9AD8 | 2448 | 7BF5 | C483 | B804 | 0000 | 00BA |
| 0000467200 | 8900 | D846 | 5689 | 0BDA | 74D0 | E903 | 0003 | 00E9 |
| 0000467220 | 8B00 | D046 | E9E9 | 1E03 | 6C68 | 1E2D | 7068 | FF2D |
| 0000467240 | DA76 | 76FF | 9AD8 | 7AC4 | 7E67 | C483 | 890C | D046 |
| 0000467260 | 7E83 | 00D0 | 0375 | 97E9 | 8B00 | DA46 | 460B | 75D8 |
| 0000467300 | E903 | 0021 | 76FF | FFDA | D876 | 489A | 5C24 | 8382 |
| 0000467320 | 04C4 | 00B8 | BA00 | 0000 | 4689 | 89D8 | DA56 | D00B |
| 0000467340 | 0374 | 03E9 | E900 | 0000 | 468B | 0BD4 | D246 | 0375 |
| 0000467360 | 21E9 | FF00 | D476 | 76FF | 9AD2 | 2448 | 7E8F | C483 |
| 0000467400 | B804 | 0000 | 00BA | 8900 | D246 | 5689 | 0BD4 | 74D0 |
| 0000467420 | E903 | 0003 | 00E9 | A100 | 2D6E | 060B | 2D6C | 0375 |
| 0000467440 | 24E9 | FF00 | 6E36 | FF2D | 6C36 | 9A2D | 2448 | 82E3 |

THU MAR 14 17:31:54 1991 DB_PI.DLL PAGE 170, LINE 9972

| | | | | | | | | |
|---|---|---|---|---|---|---|---|---|
| 0000467460 | C483 | B804 | 0000 | 00BA | A300 | 2D6C | 1689 | 2D6E |
| 0000467500 | D00B | 0374 | 03E9 | E900 | 0000 | 468B | E9D0 | 0330 |
| 0000467520 | 93E9 | C702 | CC46 | 0001 | 46C7 | 00CA | E900 | 0286 |
| 0000467540 | 46C7 | 00CC | C700 | CA46 | 0000 | 79E9 | 8302 | CE7E |
| 0000467560 | 7500 | E903 | 003A | 016A | 36FF | 2D6E | 36FF | 2D6C |
| 0000467600 | B09A | 3927 | 8383 | 04C4 | 5040 | 36FF | 2D6E | 36FF |
| 0000467620 | 2D6C | 468D | 16DC | 9A50 | 878C | 8208 | C483 | 5204 |
| 0000467640 | FF50 | 0E76 | 76FF | FF0C | 105E | C483 | 8910 | D046 |
| 0000467660 | 7E83 | 00D0 | 0374 | 09E9 | 8300 | FC7E | 7400 | E903 |
| 0000467700 | 0097 | 6EA1 | 0B2D | 6C06 | 752D | E903 | 0024 | 36FF |
| 0000467720 | 2D6E | 36FF | 2D6C | 489A | 6924 | 8383 | 04C4 | 00B8 |
| 0000467740 | BA00 | 0000 | 6CA3 | 892D | 6E16 | 0B2D | 74D0 | E903 |
| 0000467760 | 0003 | 00E9 | 8B00 | D446 | 460B | 75D2 | E903 | 0021 |
| 0000470000 | 76FF | FFD4 | D276 | 489A | 9824 | 8383 | 04C4 | 00B8 |
| 0000470020 | BA00 | 0000 | 4689 | 89D2 | D456 | D00B | 0374 | 03E9 |
| 0000470040 | E900 | 0000 | 468B | 0BDA | D846 | 0375 | 21E9 | FF00 |
| 0000470060 | DA76 | 76FF | 9AD8 | 2448 | 83D8 | C483 | B804 | 0000 |
| 0000470100 | 00BA | 8900 | D846 | 5689 | 0BDA | 74D0 | E903 | 0003 |
| 0000470120 | 00E9 | 8B00 | D046 | 27E9 | C702 | CE46 | 0000 | 85E9 |
| 0000470140 | A101 | 2D6E | 060B | 2D6C | 0375 | 24E9 | FF00 | 6E36 |
| 0000470160 | FF2D | 6C36 | 9A2D | 2448 | 8408 | C483 | B804 | 0000 |
| 0000470200 | 00BA | A300 | 2D6C | 1689 | 2D6E | D00B | 0374 | 03E9 |
| 0000470220 | E900 | 0000 | 468B | 0BD4 | D246 | 0375 | 21E9 | FF00 |
| 0000470240 | D476 | 76FF | 9AD2 | 2448 | 8437 | C483 | B804 | 0000 |
| 0000470260 | 00BA | 8900 | D246 | 5689 | 0BD4 | 74D0 | E903 | 0003 |
| 0000470300 | 00E9 | 8B00 | DA46 | 460B | 75D8 | E903 | 0021 | 76FF |
| 0000470320 | FFDA | D876 | 489A | 6F24 | 8384 | 04C4 | 00B8 | BA00 |
| 0000470340 | 0000 | 4689 | 89D8 | DA56 | D00B | 0374 | 03E9 | E900 |
| 0000470360 | 0000 | BFB8 | E901 | 0188 | 6EA1 | 0B2D | 6C06 | 752D |
| 0000470400 | E903 | 0024 | 36FF | 2D6E | 36FF | 2D6C | 489A | 9F24 |
| 0000470420 | 8384 | 04C4 | 00B8 | BA00 | 0000 | 6CA3 | 892D | 6E16 |
| 0000470440 | 0B2D | 74D0 | E903 | 0003 | 00E9 | 8B00 | D446 | 460B |
| 0000470460 | 75D2 | E903 | 0021 | 76FF | FFD4 | D276 | 489A | CE24 |
| 0000470500 | 8384 | 04C4 | 00B8 | BA00 | 0000 | 4689 | 89D2 | D456 |
| 0000470520 | D00B | 0374 | 03E9 | E900 | 0000 | 468B | 0BDA | D846 |
| 0000470540 | 0375 | 21E9 | FF00 | DA76 | 76FF | 9AD8 | 2448 | 8560 |
| 0000470560 | C483 | B804 | 0000 | 00BA | 8900 | D846 | 5689 | 0BDA |
| 0000470600 | 74D0 | E903 | 0003 | 00E9 | B800 | 01F4 | F1E9 | E900 |
| 0000470620 | 0054 | 213D | 7600 | E903 | FF5E | E0D1 | 2E93 | A7FF |
| 0000470640 | 8502 | 82CD | 7F8A | 7F5C | 7EE3 | 7E56 | 8458 | 7E56 |
| 0000470660 | 7E56 | 8458 | 82B3 | 82C0 | 8458 | 7DCB | 8458 | 8458 |
| 0000470700 | 8458 | 8458 | 8458 | 8458 | 8458 | 8458 | 8458 | 8458 |
| 0000470720 | 8458 | 8458 | 8458 | 82CD | 8458 | 8458 | 8458 | 7E56 |
| 0000470740 | 83C1 | 83C1 | 83C1 | 46E9 | A1F7 | 2D6E | 060B | 2D6C |
| 0000470760 | 0375 | 24E9 | FF00 | 6E36 | FF2D | 6C36 | 9A2D | 2448 |
| 0000471000 | 8590 | C483 | B804 | 0000 | 00BA | A300 | 2D6C | 1689 |
| 0000471020 | 2D6E | D00B | 0374 | 03E9 | E900 | 0000 | 468B | 0BDA |
| 0000471040 | D846 | 0375 | 21E9 | FF00 | DA76 | 76FF | 9AD8 | 2448 |
| 0000471060 | 85BF | C483 | B804 | 0000 | 00BA | 8900 | D846 | 5689 |
| 0000471100 | 0BDA | 74D0 | E903 | 0003 | 00E9 | 8B00 | D446 | 460B |
| 0000471120 | 75D2 | E903 | 0021 | 76FF | FFD4 | D276 | 489A | 2D24 |
| 0000471140 | 8382 | 04C4 | 00B8 | BA00 | 0000 | 4689 | 89D2 | D456 |
| 0000471160 | D00B | 0374 | 03E9 | E900 | 0000 | 00B8 | E900 | 0000 |
| 0000471200 | 5F5E | ED83 | 8B02 | 1FE5 | 4D5D | 1ECB | 9058 | 5545 |
| 0000471220 | EC8B | 8E1E | 81D8 | 0CEC | 5700 | C756 | F446 | 0000 |
| 0000471240 | 468B | 8B08 | 0A56 | 4689 | 89FA | FC56 | 4689 | 89F6 |
| 0000471260 | F856 | 5EC4 | 26F6 | 3F80 | 7500 | E903 | 003C | 5EC4 |
| 0000471300 | 26F6 | 3F80 | 7420 | E903 | 0009 | 7E83 | 0006 | 0374 |
| 0000471320 | 27E9 | C400 | F65E | 8026 | 7F3F | 0374 | 06E9 | FF00 |

THU MAR 14 17:31:54 1991 DB_PI.DLL PAGE 171, LINE 10031

| | | | | | | | | |
|---|---|---|---|---|---|---|---|---|
| 0000471340 | F646 | CDE9 | C4FF | F65E | 8A26 | C407 | FA5E | 8826 |
| 0000471360 | FF07 | FA46 | 46FF | E9F6 | FFB8 | 5EC4 | 26FA | 07C6 |
| 0000471400 | B800 | 0000 | 00E9 | 5E00 | B35F | 02ED | E58B | 5D1F |
| 0000471420 | CB4D | 581E | 4590 | 8B55 | 1EEC | D88E | EC81 | 0004 |
| 0000471440 | 5657 | 46C7 | 00FC | FF00 | 0C76 | 76FF | 6A0A | 9A22 |
| 0000471460 | 1D60 | 828E | C483 | C406 | 065E | 8026 | 003F | 0375 |
| 0000471500 | C8E9 | FF00 | FC46 | 3CB9 | 8B00 | FC46 | F799 | 89F9 |
| 0000471520 | FC56 | 7E83 | 00FC | 0374 | 12E9 | FF00 | 0C76 | 76FF |
| 0000471540 | 1E0A | 7268 | 9A2D | 2DA6 | 86E4 | C483 | C408 | 065E |
| 0000471560 | 8A26 | 9807 | 6DE9 | FF00 | 0C76 | 76FF | 1E0A | 7668 |
| 0000471600 | 9A2D | 2DA6 | 86F9 | C483 | E908 | 0079 | 76FF | FF0C |
| 0000471620 | 0A76 | 681E | 2D79 | A69A | 0E2D | 8387 | 08C4 | 64E9 |
| 0000471640 | FF00 | 0C76 | 76FF | 1E0A | 7C68 | 9A2D | 2DA6 | 8723 |
| 0000471660 | C483 | E908 | 004F | 76FF | FF0C | 0A76 | 681E | 2D7F |
| 0000471700 | A69A | 3C2D | 8387 | 08C4 | 3AE9 | FF00 | 0C76 | 76FF |
| 0000471720 | C40A | 065E | 8A26 | 9807 | 9A50 | 1D60 | 8776 | C483 |
| 0000471740 | E906 | 0021 | 092D | 7500 | E903 | FF8B | 7548 | E903 |
| 0000471760 | FF9A | 182D | 7500 | E903 | FFA7 | 3A2D | 7500 | E903 |
| 0000472000 | FFB4 | C6E9 | FFFF | 0646 | 2CE9 | FFFF | 0C76 | 76FF |
| 0000472020 | 6A0A | 9A22 | 1D60 | 8692 | C483 | B806 | 0000 | 00E9 |
| 0000472040 | 5E00 | 835F | 02ED | E58B | 5D1F | CB4D | 581E | 4590 |
| 0000472060 | 8B55 | 1EEC | D88E | EC81 | 0006 | 5657 | 468B | 8B06 |
| 0000472100 | 0856 | 4689 | 89FA | FC56 | 5EC4 | 26FA | 3F80 | 7500 |
| 0000472120 | E903 | 0023 | 5EC4 | 26FA | 078A | 8B98 | F6D8 | 5D87 |
| 0000472140 | 0235 | 0375 | 0AE9 | C400 | FA5E | 8026 | 202F | 00E9 |
| 0000472160 | FF00 | FA46 | D1E9 | 8BFF | 0646 | 568B | E908 | 0000 |
| 0000472200 | 5F5E | ED83 | 8B02 | 1FE5 | 4D5D | 00CB | 581E | 4590 |
| 0000472220 | 8B55 | 1EEC | D88E | EC81 | 0024 | 5657 | B81E | 5B87 |
| 0000472240 | D88E | 46C7 | 92FA | 8C2D | FC5E | 46C7 | 01F4 | 2B01 |
| 0000472260 | 89C0 | E646 | 4689 | 8EE4 | A006 | 263A | 3E83 | 61E8 |
| 0000472300 | 7500 | E903 | 001D | 36FF | 2DA6 | 36FF | 2DA4 | 468D |
| 0000472320 | 16DC | 9A50 | 5BCF | 0000 | C483 | 3D08 | 0000 | 0374 |
| 0000472340 | 0FE9 | 8E00 | A206 | 263A | 3E83 | 88B3 | 7500 | E903 |
| 0000472360 | 003A | 681E | 2D99 | 468D | 16E8 | 8D50 | DC46 | 5016 |
| 0000472400 | 468D | 16F6 | 6A50 | 1E77 | AE68 | FF2D | A236 | FF2D |
| 0000472420 | A036 | FF2D | A636 | FF2D | A436 | 9A2D | 5C18 | 0000 |
| 0000472440 | C483 | 891E | F646 | 5689 | E9F8 | 0008 | C02B | 4689 |
| 0000472460 | 89F8 | F646 | 068E | 3AA0 | 8326 | 1E3E | 0088 | 0375 |
| 0000472500 | 09E9 | 8300 | E07E | 74FE | E903 | 000F | 068E | 3AA2 |
| 0000472520 | 8326 | 003E | 0062 | 0375 | 4FE9 | C700 | E246 | 0000 |
| 0000472540 | 76FF | FFE6 | E476 | 468D | 16E2 | FF50 | F476 | 76FF |
| 0000472560 | FFFC | FA76 | 4E8D | 16E8 | 8D51 | F64E | 5116 | 4E8D |
| 0000472600 | 16DC | 1E51 | AE68 | 6A2D | FF7A | A236 | FF2D | A036 |
| 0000472620 | FF2D | A636 | FF2D | A436 | 9A2D | 6248 | 0000 | C483 |
| 0000472640 | 8B28 | E246 | 09E9 | E900 | 0006 | 00B8 | E900 | 0000 |
| 0000472660 | 5E1F | 835F | D2ED | E58B | 5D1F | CA4D | 0012 | 581E |
| 0000472700 | 4590 | 8B55 | 1EEC | D88E | EC81 | 002C | 5657 | B81E |
| 0000472720 | 87FE | D88E | 46C7 | C1F6 | 8C2D | F85E | 46C7 | 01EE |
| 0000472740 | 2B01 | 89C0 | E046 | 4689 | 8EDE | A006 | 263A | 3E83 |
| 0000472760 | 89EF | 7500 | E903 | 001D | 36FF | 2DA6 | 36FF | 2DA4 |
| 0000473000 | 468D | 16D6 | 9A50 | 8834 | 0000 | C483 | 3D08 | 0000 |
| 0000473020 | 0374 | 0FE9 | 8E00 | A206 | 263A | 3E83 | 8A07 | 7500 |
| 0000473040 | E903 | 003B | 681E | 2DC8 | 468D | 16E2 | 8D50 | D646 |
| 0000473060 | 5016 | 468D | 16F2 | 6850 | 00A4 | 681E | 2DD0 | 36FF |
| 0000473100 | 2DA2 | 36FF | 2DA0 | 36FF | 2DA6 | 36FF | 2DA4 | 7C9A |
| 0000473120 | 0088 | 8300 | 1EC4 | 4689 | 89F2 | F456 | 08E9 | 2B00 |
| 0000473140 | 89C0 | F446 | 4689 | 8DF2 | FA46 | 5016 | 026A | 76FF |
| 0000473160 | FF18 | 1676 | 649A | 64CF | 835C | 0AC4 | 4689 | 83F0 |
| 0000473200 | F07E | 7500 | E903 | 007E | 068E | 3AA0 | 8326 | 5D3E |

THU MAR 14 17:31:54 1991 DB_PI.DLL PAGE 172, LINE 10090

| | | | | | | | | |
|---|---|---|---|---|---|---|---|---|
| 0000473220 | 008B | 0375 | 09E9 | 8300 | DA7E | 74FE | E903 | 000F |
| 0000473240 | 068E | 3AA2 | 8326 | 753E | 008B | 0375 | 51E9 | 8B00 |
| 0000473260 | F046 | 4689 | FFDC | E076 | 76FF | 8DDE | DC46 | 5016 |
| 0000473300 | 76FF | FFEE | F876 | 76FF | 8DF6 | E24E | 5116 | 4E8D |
| 0000473320 | 16F2 | 8D51 | D64E | 5116 | 681E | 2DD0 | AD68 | FF00 |
| 0000473340 | A236 | FF2D | A036 | FF2D | A636 | FF2D | A436 | 9A2D |
| 0000473360 | 8BBD | 0000 | C483 | 8B28 | DC46 | 0FE9 | E905 | 0006 |
| 0000473400 | 468B | E9F0 | 0506 | 468B | C412 | 0E5E | 8926 | 8B07 |
| 0000473420 | 1446 | 64E9 | 8B01 | FA46 | 568B | 05FC | 07AE | 5052 |
| 0000473440 | 76FF | FFFC | FA76 | 7A9A | A88F | 838A | 08C4 | 4689 |
| 0000473460 | E9F0 | 015E | 468B | 8BFA | FC56 | 0405 | 5207 | FF50 |
| 0000473500 | FC76 | 76FF | 9AFA | 8F7A | 8AFD | C483 | 8908 | F046 |
| 0000473520 | 3FE9 | B801 | 01AD | B3E9 | E904 | 0136 | 7E83 | 7814 |
| 0000473540 | 037D | 11E9 | 8300 | 147E | 7C7B | E903 | 0008 | 46C7 |
| 0000473560 | 01D4 | E900 | 0005 | 46C7 | 00D4 | 8300 | D47E | 7500 |
| 0000473600 | E903 | 0024 | 4669 | AA14 | 0300 | FA46 | 568B | 2DFC |
| 0000473620 | 4DAA | 5052 | 76FF | FFFC | FA76 | 7A9A | 4B8F | 838B |
| 0000473640 | 08C4 | 4689 | E9F0 | 00CB | 7E81 | 8C14 | 7D00 | E903 |
| 0000473660 | 0012 | 7E81 | 8F14 | 7C00 | E903 | 0008 | 46C7 | 01D4 |
| 0000473700 | E900 | 0005 | 46C7 | 00D4 | 8300 | D47E | 7500 | E903 |
| 0000473720 | 0024 | 4669 | AA14 | 0300 | FA46 | 568B | 2DFC | 53F6 |
| 0000473740 | 5052 | 76FF | FFFC | FA76 | 7A9A | AB8F | 838C | 08C4 |
| 0000473760 | 4689 | E9F0 | 007D | 068E | 3AA0 | 8326 | 023E | 008C |
| 0000474000 | 0375 | 09E9 | 8300 | DA7E | 74FE | E903 | 000F. | 068E |
| 0000474020 | 3AA2 | 8326 | 1A3E | 008C | 0375 | 50E9 | C700 | DC46 |
| 0000474040 | 01AD | 76FF | FFE0 | DE76 | 468D | 16DC | FF50 | EE76 |
| 0000474060 | 76FF | FFF8 | F676 | 4E8D | 16E2 | 8D51 | F24E | 5116 |
| 0000474100 | 4E8D | 16D6 | 1E51 | D068 | 682D | 00CE | 36FF | 2DA2 |
| 0000474120 | 36FF | 2DA0 | 36FF | 2DA6 | 36FF | 2DA4 | 639A | 008C |
| 0000474140 | 8300 | 28C4 | 468B | E9DC | 03A2 | 06E9 | B800 | 01AD |
| 0000474160 | 99E9 | E903 | 001C | 19E9 | 2D00 | 0016 | 0375 | B3E9 |
| 0000474200 | 48FE | 0375 | 8EE9 | 2DFE | 004E | 0375 | C4E9 | E9FE |
| 0000474220 | FECA | 7E83 | 00F0 | 0375 | 7EE9 | 8E00 | A006 | 263A |
| 0000474240 | 3E83 | 889B | 7500 | E903 | 0009 | 7E83 | FEDA | 0374 |
| 0000474260 | 0FE9 | 8E00 | A206 | 263A | 3E83 | 884A | 7500 | E903 |
| 0000474300 | 0051 | 468B | 89F0 | DC46 | 76FF | FFE0 | DE76 | 468D |
| 0000474320 | 16DC | FF50 | EE76 | 76FF | FFF8 | F676 | 4E8D | 16E2 |
| 0000474340 | 8D51 | F24E | 5116 | 4E8D | 16D6 | 1E51 | D068 | 682D |
| 0000474360 | 00D3 | 36FF | 2DA2 | 36FF | 2DA0 | 36FF | 2DA6 | 36FF |
| 0000474400 | 2DA4 | FA9A | 0088 | 8300 | 28C4 | 468B | E9DC | 02FC |
| 0000474420 | 06E9 | 8B00 | F046 | F3E9 | 8302 | 127E | 7400 | E903 |
| 0000474440 | 0049 | 46C7 | 0112 | 8B00 | 1246 | 5EC4 | 260E | 0789 |
| 0000474460 | 76FF | FF08 | 0676 | 76FF | FF0C | 0A76 | 76FF | FF12 |
| 0000474500 | 1476 | 76FF | FFFC | FA76 | AB9A | FA93 | 8382 | 10C4 |
| 0000474520 | 4689 | FFF0 | 1246 | 7E83 | 0412 | 037E | 09E9 | 8300 |
| 0000474540 | F07E | 7400 | E903 | FFBF | 2CE9 | 8B00 | 1246 | 5EC4 |
| 0000474560 | 260E | 0789 | 76FF | FF08 | 0676 | 76FF | FF0C | 0A76 |
| 0000474600 | 76FF | FF12 | 1476 | 76FF | FFFC | FA76 | AB9A | 1A93 |
| 0000474620 | 838D | 10C4 | 4689 | 83F0 | F07E | 7500 | E903 | 01EE |
| 0000474640 | 468B | E914 | 01CF | 468B | 8BFA | FC56 | AE05 | 5207 |
| 0000474660 | FF50 | FC76 | 76FF | 9AFA | 91DB | 8D36 | C483 | E908 |
| 0000474700 | 01CC | 468B | 8BFA | FC56 | 0405 | 5207 | FF50 | FC76 |
| 0000474720 | 76FF | 9AFA | 91DB | 8DFF | C483 | E908 | 01B0 | 068E |
| 0000474740 | 3AAD | 8326 | 593E | 008E | 0375 | 09E9 | 8300 | DA7E |
| 0000474760 | 74FE | E903 | 000F | 068E | 3AA2 | 8326 | 713E | 008E |
| 0000475000 | 0375 | 50E9 | C700 | DC46 | 01AD | 76FF | FFE0 | DE76 |
| 0000475020 | 468D | 16DC | FF50 | EE76 | 76FF | FFF8 | F676 | 4E8D |
| 0000475040 | 16E2 | 8D51 | F24E | 5116 | 4E8D | 16D6 | 1E51 | D068 |
| 0000475060 | 682D | 00F8 | 36FF | 2DA2 | 36FF | 2DA0 | 36FF | 2DA6 |

THU MAR 14 17:31:54 1991 DB_PI.DLL PAGE 173, LINE 10149

| | | | | | | | | |
|---|---|---|---|---|---|---|---|---|
| 0000475100 | 36FF | 2DA4 | B99A | 008E | 8300 | 28C4 | 468B | E9DC |
| 0000475120 | 01BA | 06E9 | B800 | 01AD | B1E9 | E901 | 0130 | 7E83 |
| 0000475140 | 7814 | 037D | 11E9 | 8300 | 147E | 7C7B | E903 | 0008 |
| 0000475160 | 46C7 | 01D4 | E900 | 0005 | 46C7 | 00D4 | 8300 | D47F |
| 0000475200 | 7500 | E903 | 0021 | 4669 | AA14 | 0300 | FA46 | 568B |
| 0000475220 | 2DFC | 4DAA | 5052 | 76FF | FFFC | FA76 | DB9A | 4A91 |
| 0000475240 | 838E | 08C4 | C8E9 | 8100 | 147E | 008C | 037D | 12E9 |
| 0000475260 | 8100 | 147E | 008F | 037C | 08E9 | C700 | D446 | 0001 |
| 0000475300 | 05E9 | C700 | D446 | 0000 | 7E83 | 00D4 | 0375 | 21E9 |
| 0000475320 | 6900 | 1446 | 00AA | 4603 | 8BFA | FC56 | F62D | 5253 |
| 0000475340 | FF50 | FC76 | 76FF | 9AFA | 91DB | 8A89 | C483 | E908 |
| 0000475360 | 007D | 068E | 3AA0 | 8326 | 503E | 0089 | 0375 | 09E9 |
| 0000475400 | 8300 | DA7E | 74FE | E903 | 000F | 068E | 3AA2 | 8326 |
| 0000475420 | 7C3E | 0089 | 0375 | 50E9 | C700 | DC46 | 01AD | 76FF |
| 0000475440 | FFE0 | DE76 | 468D | 16DC | FF50 | EE76 | 76FF | FFF8 |
| 0000475460 | F676 | 4E8D | 16E2 | 8D51 | F24E | 5116 | 4E8D | 16D6 |
| 0000475500 | 1E51 | D068 | 682D | 0105 | 36FF | 2DA2 | 36FF | 2DA0 |
| 0000475520 | 36FF | 2DA6 | 36FF | 2DA4 | 509A | 008A | 8300 | 28C4 |
| 0000475540 | 468B | E9DC | 00A6 | 06E9 | B800 | 01AD | 9DE9 | E900 |
| 0000475560 | 001C | 19E9 | 2D00 | 0016 | 0375 | 45E9 | 48FE | 0375 |
| 0000475600 | 23E9 | 2DFE | 004E | 0375 | 53E9 | E9FE | FED0 | 068E |
| 0000475620 | 3AA0 | 8326 | 453E | 008D | 0375 | 09E9 | 8300 | DA7E |
| 0000475640 | 74FE | E903 | 000F | 068E | 3AA2 | 8326 | 5D3E | 008D |
| 0000475660 | 0375 | 51E9 | 8B00 | F046 | 4689 | FFDC | E076 | 76FF |
| 0000475700 | 8DDE | DC46 | 5016 | 76FF | FFEE | F876 | 76FF | 8DF6 |
| 0000475720 | E24E | 5116 | 4E8D | 16F2 | 8D51 | D64E | 5116 | 681E |
| 0000475740 | 2DD0 | 0C68 | FF01 | A236 | FF2D | A036 | FF2D | A636 |
| 0000475760 | FF2D | A436 | 9A2D | 8DA5 | 0000 | C483 | 8B28 | DC46 |
| 0000476000 | 09E9 | E900 | 0006 | 468B | E9F0 | 0000 | 5E1F | 835F |
| 0000476020 | 02ED | E58B | 5D1F | CA4D | 0014 | 581E | 4590 | 8B55 |
| 0000476040 | 1EEC | D88E | EC81 | 0208 | 5657 | 86C7 | FDFC | 0000 |
| 0000476060 | 468B | 8B06 | 0856 | 3405 | 5200 | 8D50 | FE86 | 16FD |
| 0000476100 | 9A50 | 2750 | 8FB6 | C483 | 1E08 | DF68 | 8D2D | FE86 |
| 0000476120 | 16FD | 9A50 | 270A | 8FCA | C483 | FF08 | 0C76 | 76FF |
| 0000476140 | 8D0A | FE86 | 16FD | 9A50 | 270A | 8FFC | C483 | 6A08 |
| 0000476160 | 8D2F | FE86 | 16FD | 9A50 | 29CF | 907C | C483 | 3D06 |
| 0000476200 | 0000 | 0374 | 06E9 | B800 | 01B7 | E3E9 | 8D01 | FE86 |
| 0000476220 | 16FD | 8D50 | FE8E | 16FE | 9A51 | 2750 | 900C | C483 |
| 0000476240 | 6A08 | FF2E | 0C76 | 76FF | 9A0A | 3C3E | 902B | C483 |
| 0000476260 | 8906 | F886 | 89FD | FA96 | 0BFD | 75D0 | E903 | 001B |
| 0000476300 | 2E6A | 868D | FDFE | 5016 | 3E9A | 443C | 8390 | 06C4 |
| 0000476320 | 8689 | FDF8 | 9689 | FDFA | 1CE9 | 8D00 | FE86 | 16FD |
| 0000476340 | 9A50 | 27B0 | 906C | C483 | 8B04 | 8DF0 | FE82 | 89FD |
| 0000476360 | F886 | 8CFD | FA96 | C4FD | F89E | 26FD | 07C6 | 1E00 |
| 0000476400 | E168 | 8D2D | FE86 | 16FD | 9A50 | 270A | 9092 | C483 |
| 0000476420 | 6A08 | 8D2F | FE86 | 16FD | 9A50 | 29CF | 911D | C483 |
| 0000476440 | 3D06 | 0000 | 0375 | 0EE9 | 8D00 | FE86 | 16FD | 9A50 |
| 0000476460 | 421C | 90A6 | C483 | 8D04 | FE86 | 16FD | 8D50 | FE86 |
| 0000476500 | 16FE | 9A50 | 41F8 | 90C5 | C483 | 8908 | FC86 | 83FD |
| 0000476520 | FCBE | 00FD | 0374 | 09E9 | C700 | FC86 | 00FD | E900 |
| 0000476540 | 0036 | F69A | 0D04 | 8E91 | 8BC2 | 26D8 | 078B | 15E9 |
| 0000476560 | B800 | 01A4 | F9E9 | B800 | 019D | F3E9 | B800 | 01C1 |
| 0000476600 | EDE9 | E900 | 0012 | 4848 | 0375 | EAE9 | 2DFF | 000B |
| 0000476620 | 0375 | DCE9 | E9FF | FFE5 | 9EC4 | FDF8 | C626 | 0007 |
| 0000476640 | 681E | 2DE6 | 868D | FDFE | 5016 | 0A9A | 3F27 | 8391 |
| 0000476660 | 08C4 | 2F6A | 868D | FDFE | 5016 | CF9A | 8129 | 8391 |
| 0000476700 | 06C4 | 003D | 7400 | E903 | 0006 | 00B8 | E900 | 00A0 |
| 0000476720 | 868D | FDFE | 5016 | 8E8D | FEFE | 5116 | 509A | 4F27 |
| 0000476740 | 8391 | 08C4 | 2E6A | 868D | FDFE | 5016 | 3E9A | 713C |

THU MAR 14 17:31:54 1991 DB_PI.DLL PAGE 174, LINE 10208

| | | | | | | | | |
|---|---|---|---|---|---|---|---|---|
| 0000476760 | 8391 | 06C4 | 8689 | FDF8 | 9689 | FDFA | 9EC4 | FDF8 |
| 0000477000 | C626 | 0007 | 681E | 2DEB | 868D | FDFE | 5016 | 0A9A |
| 0000477020 | 9727 | 8391 | 08C4 | 2F6A | 868D | FDFE | 5016 | CF9A |
| 0000477040 | AF29 | 8391 | 06C4 | 003D | 7500 | E903 | 000E | 868D |
| 0000477060 | FDFE | 5016 | 1C9A | C842 | 8386 | 04C4 | 006A | 016A |
| 0000477100 | 868D | FDFE | 5016 | 868D | FEFE | 5016 | 7C9A | 0B36 |
| 0000477120 | 835D | 0CC4 | 8689 | FDFC | BE83 | FDFC | 7500 | E903 |
| 0000477140 | 0007 | 868B | FDFC | 07E9 | 8B00 | FC86 | E9FD | 0000 |
| 0000477160 | 5F5E | ED83 | 8B02 | 1FE5 | 4D5D | 1ECB | 9058 | 5545 |
| 0000477200 | EC8B | 8E1E | 81D8 | 08EC | 5702 | C756 | FC86 | 00FD |
| 0000477220 | 8B00 | 0646 | 568B | 0508 | 0034 | 5052 | 868D | FDFE |
| 0000477240 | 5016 | 509A | 1727 | 8392 | 08C4 | 681E | 2DF0 | 868D |
| 0000477260 | FDFE | 5016 | 0A9A | 2B27 | 8392 | 08C4 | 76FF | FF0C |
| 0000477300 | 0A76 | 868D | FDFE | 5016 | 0A9A | 3F27 | 8392 | 08C4 |
| 0000477320 | 868D | FDFE | 5016 | 8E8D | FEFE | 5116 | 509A | 4F27 |
| 0000477340 | 8392 | 08C4 | 2E6A | 76FF | FF0C | 0A76 | 3E9A | 6E3C |
| 0000477360 | 8392 | 06C4 | 8689 | FDF8 | 9689 | FDFA | D00B | 0375 |
| 0000477400 | 1BE9 | 6A00 | 8D2E | FE86 | 16FD | 9A50 | 3C3E | 9287 |
| 0000477420 | C483 | 8906 | F886 | 89FD | FA96 | E9FD | 001C | 868D |
| 0000477440 | FDFE | 5016 | B09A | AF27 | 8392 | 04C4 | F08B | 828D |
| 0000477460 | FDFE | 8689 | FDF8 | 968C | FDFA | 9EC4 | FDF8 | C626 |
| 0000477500 | 0007 | 681E | 2DF2 | 868D | FDFE | 5016 | 0A9A | A427 |
| 0000477520 | 838F | 08C4 | 2F6A | 868D | FDFE | 5016 | CF9A | E529 |
| 0000477540 | 8392 | 06C4 | 003D | 7400 | E903 | 0006 | B7B8 | E901 |
| 0000477560 | 00CE | 006A | 016A | 868D | FEFE | 5016 | 868D | FDFE |
| 0000477600 | 5016 | 7C9A | DA36 | 838F | 0CC4 | 8689 | FDFC | BE83 |
| 0000477620 | FDFC | 7500 | E903 | 0007 | 868B | FDFC | A1E9 | C400 |
| 0000477640 | F89E | 26FD | 07C6 | 1E00 | F768 | 8D2D | FE86 | 16FD |
| 0000477660 | 9A50 | 270A | 9346 | C483 | 6A08 | 8D2F | FE86 | 16FD |
| 0000477700 | 9A50 | 29CF | 9390 | C483 | 3D06 | 0000 | 0374 | 06E9 |
| 0000477720 | B800 | 0000 | 69E9 | 8D00 | FE86 | 16FD | 8D50 | FE8E |
| 0000477740 | 16FE | 9A51 | 2750 | 9356 | C483 | 6A08 | 8D2E | FE86 |
| 0000477760 | 16FD | 9A50 | 3C3E | 9378 | C483 | 8906 | F886 | 89FD |
| 0000500000 | FA96 | C4FD | F89E | 26FD | 07C6 | 1E00 | FC68 | 8D2D |
| 0000500020 | FE86 | 16FD | 9A50 | 270A | 9205 | C483 | 6A08 | 6A00 |
| 0000500040 | 8D01 | FE86 | 16FD | 8D50 | FE86 | 16FE | 9A50 | 367C |
| 0000500060 | 92BF | C483 | 890C | FC86 | 8BFD | FC86 | E9FD | 0000 |
| 0000500100 | 5F5E | ED83 | 8B02 | 1FE5 | 4D5D | 1ECB | 9058 | 5545 |
| 0000500120 | EC8B | 8E1E | 81D8 | 14EC | 5701 | 2B56 | 89C0 | F086 |
| 0000500140 | 89FE | EE86 | C7FE | F446 | 0000 | C02B | 4689 | 89FC |
| 0000500160 | FA46 | C02B | 4689 | 89F8 | F646 | 00B8 | C400 | 125E |
| 0000500200 | 8926 | C407 | 0E5E | 8926 | 8B07 | 0A46 | 55E9 | 8B01 |
| 0000500220 | 0646 | 568B | 0508 | 0724 | 8689 | FEEE | 9689 | FEF0 |
| 0000500240 | 468B | 8B06 | 0856 | 3405 | 5200 | FF50 | F0B6 | FFFE |
| 0000500260 | EEB6 | 9AFE | 3338 | 9448 | C483 | 8908 | F446 | 3CE9 |
| 0000500300 | 8B01 | 0646 | 568B | 0508 | 067A | 8689 | FEEE | 9689 |
| 0000500320 | FEF0 | 468B | 8B06 | 0856 | 3405 | 5200 | FF50 | F0B6 |
| 0000500340 | FFFE | EEB6 | 9AFE | 2E96 | 94C6 | C483 | 8908 | F446 |
| 0000500360 | 0AE9 | B801 | 01AD | 54E9 | E902 | 0101 | 7E83 | 780A |
| 0000500400 | 037D | 12E9 | 8300 | 0A7E | 7C7B | E903 | 0009 | 86C7 |
| 0000500420 | FEEC | 0001 | 06E9 | C700 | EC86 | 00FE | 8300 | ECBE |
| 0000500440 | 00FE | 0375 | 4AE9 | 6900 | 0A46 | 00AA | 4603 | 8B06 |
| 0000500460 | 0856 | 342D | 894E | EE86 | 89FE | F096 | 8AFE | 0A66 |
| 0000500500 | C02A | 4603 | 8B06 | 0856 | 862D | 5274 | FF50 | 0A76 |
| 0000500520 | 468B | 8B06 | 0856 | 3405 | 5200 | FF50 | F0B6 | FFFE |
| 0000500540 | EEB6 | 9AFE | 09E7 | 952D | C483 | 890E | F446 | 6DE9 |
| 0000500560 | 8100 | 0A7E | 008C | 037D | 13E9 | 8100 | 0A7E | 008F |
| 0000500600 | 037C | 09E9 | C700 | EC86 | 01FE | E900 | 0006 | 86C7 |
| 0000500620 | FEEC | 0000 | BE83 | FEEC | 7500 | E903 | 003A | 4669 |

THU MAR 14 17:31:54 1991 DB_PI.DLL PAGE 175, LINE 10267

| | | | | | | | | |
|---|---|---|---|---|---|---|---|---|
| 0000500640 | AA0A | 0300 | 0646 | 568B | 2D08 | 5480 | 8689 | FEEE |
| 0000500660 | 9689 | FEF0 | 76FF | 8B0A | 0646 | 568B | 0508 | 0034 |
| 0000500700 | 5052 | B6FF | FEF0 | B6FF | FEEE | 609A | 8E37 | 8395 |
| 0000500720 | 0AC4 | 4689 | E9F4 | 0006 | ADB8 | E901 | 016F | 1CE9 |
| 0000500740 | E900 | 0019 | 162D | 7500 | E903 | FED5 | 7548 | E903 |
| 0000500760 | FE9D | 4E2D | 7500 | E903 | FEF9 | FFE9 | 83FE | F47E |
| 0000501000 | 7500 | E903 | 0006 | 468B | E9F4 | 0141 | 7E83 | 020C |
| 0000501020 | 0374 | 78E9 | 6A00 | 6A00 | 8D00 | F646 | 5016 | 006A |
| 0000501040 | 868D | FEF2 | 5016 | 468D | 16F2 | 9A50 | 3EC3 | 95B4 |
| 0000501060 | 4689 | 83F4 | F47E | 7500 | E903 | 0006 | 468B | E9F4 |
| 0000501100 | 010B | 006A | 006A | 046A | 681E | 2E01 | 468D | 16FA |
| 0000501120 | 9A50 | 56EC | 95E8 | 4689 | 81F4 | F47E | 01AB | 0374 |
| 0000501140 | 0DE9 | C700 | F446 | 0000 | 46C7 | A8FA | 8C2D | FC5E |
| 0000501160 | 7E83 | 00F4 | 0375 | 06E9 | 8B00 | F446 | CEE9 | 6A00 |
| 0000501200 | 6A00 | 6A00 | 9A00 | 4965 | 8CEF | 4689 | 8BF4 | 0C46 |
| 0000501220 | 99E9 | FF00 | 1476 | 76FF | FF12 | 1076 | 76FF | FF0E |
| 0000501240 | FC76 | 76FF | 8BFA | 0646 | 568B | 0508 | 0034 | 5052 |
| 0000501260 | B6FF | FEF0 | B6FF | FEEE | 76FF | 9A0C | 0000 | 9324 |
| 0000501300 | C483 | 8916 | F446 | 7E83 | 00F4 | 0375 | 06E9 | 8B00 |
| 0000501320 | F446 | 78E9 | E900 | 006F | 7E83 | 780A | 037D | 12E9 |
| 0000501340 | 8300 | 0A7E | 7C7B | E903 | 0009 | 86C7 | FEEC | 0001 |
| 0000501360 | 06E9 | C700 | EC86 | 00FE | 8300 | ECBE | 00FE | 0375 |
| 0000501400 | 17E9 | 8B00 | 0A46 | 5299 | FF50 | 0876 | 76FF | 9A06 |
| 0000501420 | 10FF | 9416 | C483 | E908 | 0006 | C1B8 | E901 | 002D |
| 0000501440 | 24E9 | B800 | 0013 | 24E9 | E900 | 001B | 7D48 | E903 |
| 0000501460 | FFF1 | 7F48 | E903 | FF5B | 7548 | E903 | FF9A | 7548 |
| 0000501500 | E903 | FF4F | DCE9 | B8FF | 0000 | 00E9 | 5E00 | 835F |
| 0000501520 | 02ED | E58B | 5D1F | CB4D | 581E | 4590 | 8B55 | 1EEC |
| 0000501540 | D88E | EC81 | 000A | 5657 | 76FF | FF08 | 0676 | 76FF |
| 0000501560 | 6A0A | 9A02 | 62D2 | 96ED | 4689 | 8BF8 | F846 | 91E9 |
| 0000501600 | FF00 | 0876 | 76FF | FF06 | 0A76 | 009A | B266 | 8977 |
| 0000501620 | F846 | 7E83 | 00F8 | 0374 | 08E9 | C400 | 0E5E | C726 |
| 0000501640 | 0107 | 8B00 | F846 | 89E9 | C400 | 0E5E | C726 | 0107 |
| 0000501660 | B800 | 0000 | 7BE9 | 8300 | 0C7E | 7500 | E903 | 0047 |
| 0000501700 | 76FF | FF08 | 0676 | 76FF | 6A0A | 8D01 | FC46 | 5016 |
| 0000501720 | 468D | 16F6 | 8D50 | FA46 | 5016 | 1E9A | 7289 | 8996 |
| 0000501740 | F846 | 7E83 | 00F8 | 0374 | 0BE9 | C400 | 0E5E | C726 |
| 0000501760 | 6807 | E900 | 0008 | 5EC4 | 260E | 07C7 | 0069 | 468B |
| 0000502000 | E9F8 | 002E | 08E9 | C400 | 0E5E | C726 | 0407 | E900 |
| 0000502020 | 001A | C00B | 0375 | 68E9 | 2DFF | 019D | 0375 | 88E9 |
| 0000502040 | 2DFF | 0007 | 0375 | 80E9 | E9FF | FF8B | 00B8 | E900 |
| 0000502060 | 0000 | 5F5E | ED83 | 8B02 | 1FE5 | 4D5D | 1ECB | 9058 |
| 0000502100 | 5545 | EC8B | 8E1E | 81D8 | 00EC | 5700 | C456 | 1E5E |
| 0000502120 | 8B26 | C407 | 225E | 3926 | 7607 | E903 | 0040 | 5EC4 |
| 0000502140 | 2622 | 0783 | C405 | 225E | 6B26 | 3007 | C450 | 1A5E |
| 0000502160 | FF26 | 0277 | FF26 | 9A37 | 32A4 | 981D | C483 | C406 |
| 0000502200 | 1A5E | 8926 | 2607 | 5789 | C402 | 1A5E | 8B26 | 0247 |
| 0000502220 | 0B26 | 7407 | E903 | 0006 | 07B8 | E900 | 00A8 | 76FF |
| 0000502240 | FF08 | 0676 | 5EC4 | 261E | 076B | C430 | 1A5E | 0326 |
| 0000502260 | 2607 | 578B | 0502 | 0004 | 5052 | 509A | 1427 | 8393 |
| 0000502300 | 08C4 | 5EC4 | 261E | 1F6B | C430 | 1A76 | C426 | 8B34 |
| 0000502320 | 0A46 | 568B | 260C | 0089 | 8926 | 0250 | 468B | C40E |
| 0000502340 | 1E5E | 6B26 | 3037 | 5EC4 | 261A | 1FC4 | 8926 | 2440 |
| 0000502360 | 468B | 8B12 | 1456 | 5EC4 | 261E | 376B | C430 | 1A5E |
| 0000502400 | C426 | 261F | 4089 | 262C | 5089 | 8B2E | 1046 | 5EC4 |
| 0000502420 | 261E | 376B | C430 | 1A5E | C426 | 261F | 4089 | 8B2A |
| 0000502440 | 1646 | 568B | C418 | 1E5E | 6B26 | 3037 | 5EC4 | 261A |
| 0000502460 | 1FC4 | 8926 | 2640 | 8926 | 2850 | 5EC4 | 261E | 07FF |
| 0000502500 | 00B8 | E900 | 0000 | 5F5E | ED83 | 8B02 | 1FE5 | 4D5D |

THU MAR 14 17:31:54 1991 DB_PI.DLL PAGE 176, LINE 10326

| | | | | | | | | |
|---|---|---|---|---|---|---|---|---|
| 0000502520 | 1ECB | 9058 | 5545 | EC8B | 8E1E | 81D8 | 14EC | 5701 |
| 0000502540 | C756 | F046 | 0000 | 46C7 | 00FA | 2B00 | 89C0 | F646 |
| 0000502560 | 4689 | C7F4 | F246 | 0001 | 468B | 8B06 | 0856 | 3405 |
| 0000502600 | 5200 | 8D50 | EE86 | 16FE | 9A50 | 2750 | 98FE | C483 |
| 0000502620 | 1E08 | 2268 | 8D2E | EE86 | 16FE | 9A50 | 270A | 9912 |
| 0000502640 | C483 | FF08 | 1276 | 76FF | 8D10 | EE86 | 16FE | 9A50 |
| 0000502660 | 270A | 97DA | C483 | 6A08 | 8D2F | EE86 | 16FE | 9A50 |
| 0000502700 | 29CF | 961E | C483 | 3D06 | 0000 | 0375 | FBE9 | 8D01 |
| 0000502720 | F246 | 5016 | 76FF | FF14 | 0E76 | 76FF | FF0C | 0A76 |
| 0000502740 | B89A | 9296 | 8399 | 0CC4 | 4689 | 83F0 | F07E | 7500 |
| 0000502760 | E903 | 0006 | 468B | E9F0 | 01D6 | 7E83 | 01F2 | 0375 |
| 0000503000 | 46E9 | FF00 | 2276 | 76FF | FF20 | 1E76 | 76FF | FF1C |
| 0000503020 | 1A76 | 76FF | FF18 | 0C76 | 76FF | 6A0A | 6A00 | FF00 |
| 0000503040 | F276 | 76FF | 6A0E | 6A00 | FF00 | 1276 | 76FF | 9A10 |
| 0000503060 | 979D | 99DD | C483 | 8920 | F046 | 7E83 | 68F2 | 0375 |
| 0000503100 | 06E9 | 8B00 | F046 | 87E9 | 8301 | 167E | 7402 | E903 |
| 0000503120 | 0178 | 7E83 | 780E | 037D | 6FE9 | 8301 | 0E7E | 7E7B |
| 0000503140 | E903 | 0166 | 468D | 16F4 | 8D50 | FA46 | 5016 | 76FF |
| 0000503160 | FF14 | 0E76 | 76FF | FF08 | 0676 | AD9A | 3F13 | 839A |
| 0000503200 | 10C4 | 4689 | 83F0 | F07E | 7500 | E903 | 00BF | 7E81 |
| 0000503220 | F8F0 | 7401 | E903 | 00AF | 76FF | FF0C | 0A76 | 76FF |
| 0000503240 | 9A0E | 6600 | 96D6 | 4689 | 83F0 | F07E | 7500 | E903 |
| 0000503260 | 0006 | 468B | E9F0 | 0118 | 7E83 | 0014 | 0375 | 42E9 |
| 0000503300 | FF00 | 0C76 | 76FF | FF0A | 0E76 | 016A | 468D | 16FC |
| 0000503320 | 8D50 | EC86 | 16FE | 8D50 | F846 | 5016 | 1E9A | 9C89 |
| 0000503340 | 899A | F046 | 7E83 | 00F0 | 0374 | 08E9 | C700 | F246 |
| 0000503360 | 0068 | 0BE9 | C700 | F246 | 0069 | 468B | E9F0 | 00D0 |
| 0000503400 | 0AE9 | C700 | F046 | 0000 | 46C7 | 04F2 | FF00 | 2276 |
| 0000503420 | 76FF | FF20 | 1E76 | 76FF | FF1C | 1A76 | 76FF | FF18 |
| 0000503440 | 0C76 | 76FF | 6A0A | 6A00 | FF00 | F276 | 76FF | 6A0E |
| 0000503460 | 6A00 | FF00 | 1276 | 76FF | 9A10 | 979D | 9B1F | C483 |
| 0000503500 | 8920 | F046 | 06E9 | 8B00 | F046 | 83E9 | 8300 | FA7E |
| 0000503520 | 7500 | E903 | 0074 | 46C7 | 00EE | E900 | 0003 | 46FF |
| 0000503540 | 8BEE | FA46 | 4639 | 72EE | E903 | 005E | 76FF | FF22 |
| 0000503560 | 2076 | 76FF | FF1E | 1C76 | 76FF | FF1A | 1876 | 76FF |
| 0000503600 | FF0C | 0A76 | 006A | 006A | 766B | 26EE | 5EC4 | 26F4 |
| 0000503620 | 70FF | 6B24 | EE76 | C426 | F45E | 8A26 | 2340 | E42A |
| 0000503640 | 6B50 | EE76 | C426 | F45E | FF26 | 2270 | FF26 | 2070 |
| 0000503660 | 466B | 26EE | 4603 | 8BF4 | F656 | 5052 | 9D9A | 3D97 |
| 0000503700 | 8397 | 20C4 | 4689 | E9F0 | FF94 | 468B | E9F0 | 0000 |
| 0000503720 | 5F5E | ED83 | 8B02 | 1FE5 | 4D5D | 1ECB | 9058 | 5545 |
| 0000503740 | EC8B | 8E1E | 81D8 | 08EC | 5700 | 8D56 | FA46 | 5016 |
| 0000503760 | 026A | 76FF | FF08 | 0676 | 649A | D7CF | 8389 | 0AC4 |
| 0000504000 | 4689 | 83F8 | F87E | 7500 | E903 | 0006 | 468B | E9F8 |
| 0000504020 | 021A | 76FF | FF18 | 1676 | 76FF | FF14 | 1276 | 76FF |
| 0000504040 | FF10 | 0E76 | 76FF | FF0C | 0A76 | 681E | 2E24 | 176A |
| 0000504060 | 76FF | FF08 | 0676 | 76FF | FFFC | FA76 | B19A | E398 |
| 0000504100 | 839B | 1EC4 | 4689 | 83F8 | F87E | 7500 | E903 | 0006 |
| 0000504120 | 468B | E9F8 | 01D6 | 76FF | FF18 | 1676 | 76FF | FF14 |
| 0000504140 | 1276 | 76FF | FF10 | 0E76 | 76FF | FF0C | 0A76 | 681E |
| 0000504160 | 2E2B | 166A | 76FF | FF08 | 0676 | 76FF | FFFC | FA76 |
| 0000504200 | B19A | 2898 | 839C | 1EC4 | 4689 | 83F8 | F87E | 7500 |
| 0000504220 | E903 | 0006 | 468B | E9F8 | 0192 | 76FF | FF18 | 1676 |
| 0000504240 | 76FF | FF14 | 1276 | 76FF | FF10 | 0E76 | 76FF | FF0C |
| 0000504260 | 0A76 | 681E | 2E32 | 8C68 | FF00 | 0876 | 76FF | FF06 |
| 0000504300 | FC76 | 76FF | 9AFA | 98B1 | 9C6D | C483 | 891E | F846 |
| 0000504320 | 7E83 | 00F8 | 0375 | 06E9 | 8B00 | F846 | 4DE9 | FF01 |
| 0000504340 | 1876 | 76FF | FF16 | 1476 | 76FF | FF12 | 1076 | 76FF |
| 0000504360 | FF0E | 0C76 | 76FF | 1E0A | 3968 | 682E | 008D | 76FF |

THU MAR 14 17:31:54 1991 DB_PI.DLL PAGE 177, LINE 10385

| | | | | | | | | |
|---|---|---|---|---|---|---|---|---|
| 0000504400 | FF08 | 0676 | 76FF | FFFC | FA76 | B19A | B298 | 839C |
| 0000504420 | 1EC4 | 4689 | 83F8 | F87E | 7500 | E903 | 0006 | 468B |
| 0000504440 | E9F8 | 0108 | 76FF | FF18 | 1676 | 76FF | FF14 | 1276 |
| 0000504460 | 76FF | FF10 | 0E76 | 76FF | FF0C | 0A76 | 681E | 2E40 |
| 0000504500 | 8E68 | FF00 | 0876 | 76FF | FF06 | FC76 | 76FF | 9AFA |
| 0000504520 | 98B1 | 9CF6 | C483 | 891E | F846 | 7E83 | 00F8 | 0375 |
| 0000504540 | 06E9 | 8B00 | F846 | C3E9 | FF00 | 1876 | 76FF | FF16 |
| 0000504560 | 1476 | 76FF | FF12 | 1076 | 76FF | FF0E | 0C76 | 76FF |
| 0000504600 | 1E0A | 4768 | 6A2E | FF7A | 0876 | 76FF | FF06 | FC76 |
| 0000504620 | 76FF | 9AFA | 98B1 | 9D3A | C483 | 891E | F846 | 7E83 |
| 0000504640 | 00F8 | 0375 | 06E9 | 8B00 | F846 | 7FE9 | FF00 | 1876 |
| 0000504660 | 76FF | FF16 | 1476 | 76FF | FF12 | 1076 | 76FF | FF0E |
| 0000504700 | 0C76 | 76FF | 1E0A | 4E68 | 6A2E | FF78 | 0876 | 76FF |
| 0000504720 | FF06 | FC76 | 76FF | 9AFA | 98B1 | 9D7E | C483 | 891E |
| 0000504740 | F846 | 7E83 | 00F8 | 0375 | 06E9 | 8B00 | F846 | 3BE9 |
| 0000504760 | FF00 | 1876 | 76FF | FF16 | 1476 | 76FF | FF12 | 1076 |
| 0000505000 | 76FF | FF0E | 0C76 | 76FF | 1E0A | 5568 | 6A2E | FF79 |
| 0000505020 | 0876 | 76FF | FF06 | FC76 | 76FF | 9AFA | 98B1 | 9943 |
| 0000505040 | C483 | 891E | F846 | 468B | E9F8 | 0000 | 5F5E | ED83 |
| 0000505060 | 8B02 | 1FE5 | 4D5D | 1ECB | 9058 | 5545 | EC8B | 8E1E |
| 0000505100 | 81D8 | 10EC | 5701 | 8A56 | 1146 | E42A | 4689 | 8DF2 |
| 0000505120 | F286 | 16FE | 8D50 | F846 | 5016 | 76FF | FF14 | 0C76 |
| 0000505140 | 76FF | FF0A | 1076 | 76FF | FF0E | 0876 | 76FF | 9A06 |
| 0000505160 | 7E08 | 9E59 | C483 | 8916 | F646 | 7E83 | 00F6 | 0375 |
| 0000505200 | 06E9 | 8B00 | F646 | D0E9 | 8301 | F87E | 7501 | E903 |
| 0000505220 | 003D | 76FF | FF20 | 1E76 | 76FF | FF1C | 1A76 | 76FF |
| 0000505240 | FF18 | 1676 | 006A | 006A | 006A | 006A | 76FF | FFF8 |
| 0000505260 | F276 | 76FF | FF10 | 0E76 | 76FF | FF0C | 0A76 | 9D9A |
| 0000505300 | B397 | 839E | 20C4 | 4689 | 8BF6 | F646 | 8AE9 | 8301 |
| 0000505320 | 127E | 7F00 | E903 | 00B1 | 7E83 | 2AF2 | 037D | A8E9 |
| 0000505340 | 8300 | F27E | 7E2C | E903 | 009F | 868D | FEF2 | 5016 |
| 0000505360 | 76FF | FF10 | 0E76 | 0F9A | 07A7 | 839F | 08C4 | 4689 |
| 0000505400 | 83F6 | F67E | 7400 | E903 | 007F | 006A | 006A | 468D |
| 0000505420 | 160E | 6A50 | 6A00 | 6A00 | 6A02 | 9A00 | 512C | 9ED5 |
| 0000505440 | 4689 | 83F6 | F67E | 7500 | E903 | 0006 | 468B | E9F6 |
| 0000505460 | 0127 | 76FF | FF20 | 1E76 | 76FF | FF1C | 1A76 | 76FF |
| 0000505500 | FF18 | 1676 | 76FF | FF12 | 1476 | 76FF | FF10 | 0E76 |
| 0000505520 | 3B9A | 869B | 839F | 14C4 | 4689 | 83F6 | F67E | 7500 |
| 0000505540 | E903 | 0006 | 468B | E9F6 | 00EF | 76FF | FF10 | 0E76 |
| 0000505560 | 006A | F79A | A95B | 899F | F646 | 7E83 | 00F6 | 0375 |
| 0000505600 | 06E9 | 8B00 | F646 | D0E9 | 8D00 | FA46 | 5016 | 868D |
| 0000505620 | FEF0 | 5016 | 76FF | FF10 | 0E76 | 006A | 006A | 76FF |
| 0000505640 | FF08 | 0676 | 3E9A | EC8D | 8398 | 14C4 | 4689 | 83F6 |
| 0000505660 | F67E | 7500 | E903 | 0019 | 7E81 | BCF6 | 7401 | E903 |
| 0000505700 | 0009 | 00B8 | E900 | 0091 | 06E9 | 8B00 | F646 | 88E9 |
| 0000505720 | C700 | F446 | 0000 | 03E9 | FF00 | F446 | 468B | 39F4 |
| 0000505740 | F086 | 77FE | E903 | 0058 | 76FF | FF20 | 1E76 | 76FF |
| 0000505760 | FF1C | 1A76 | 76FF | FF18 | 1676 | 76FF | FF14 | 1276 |
| 0000506000 | 5E6B | 24F4 | 76C4 | 26FA | 70FF | 2602 | 30FF | 466B |
| 0000506020 | 24F4 | 4603 | 8BFA | FC56 | 0405 | 5200 | FF50 | 0876 |
| 0000506040 | 76FF | 9A06 | 9D97 | 9B9F | C483 | 891C | F646 | 7E83 |
| 0000506060 | 00F6 | 0375 | 06E9 | 8B00 | F646 | 1CE9 | E900 | FF99 |
| 0000506100 | 76FF | FFFC | FA76 | 759A | 0409 | 2B9A | 89C0 | FC46 |
| 0000506120 | 4689 | B8FA | 0000 | 00E9 | 5E00 | 835F | 02ED | E58B |
| 0000506140 | 5D1F | CB4D | 581E | 4590 | 8B55 | 1EEC | D88E | EC81 |
| 0000506160 | 000E | 5657 | B81E | 8930 | D88E | 5EC4 | 260A | 07C7 |
| 0000506200 | 0000 | 5EC4 | 2B06 | 26C0 | 4789 | 2602 | 0789 | 46C7 |
| 0000506220 | 00FC | 8D00 | F246 | 5016 | 468D | 16F8 | FF50 | 1476 |
| 0000506240 | 76FF | FF12 | 1876 | 76FF | 9A16 | D834 | 9B5B | C483 |

THU MAR 14 17:31:54 1991 DB_PI.DLL PAGE 178, LINE 10444

| | | | | | | | | |
|---|---|---|---|---|---|---|---|---|
| 0000506260 | 8910 | F646 | 7E83 | 00F6 | 0375 | 06E9 | 8B00 | F646 |
| 0000506300 | BBE9 | 8B00 | 1446 | 460B | 7412 | E903 | 0013 | 76FF |
| 0000506320 | FF18 | 1676 | 468D | 1612 | 9A50 | 3560 | 9E7E | 4689 |
| 0000506340 | 83F6 | F67E | 7500 | E903 | 0006 | 468B | E9F6 | 008E |
| 0000506360 | 468D | 16FC | FF50 | 0C76 | 76FF | FF0A | 0876 | 76FF |
| 0000506400 | FF06 | 0E76 | 76FF | FF10 | 1476 | 76FF | 1E12 | 5C68 |
| 0000506420 | FF2E | FA76 | 76FF | 9AF8 | 9D97 | 9E21 | C483 | 891C |
| 0000506440 | F646 | 7E83 | 00F6 | 0375 | 06E9 | 8B00 | F646 | 4DE9 |
| 0000506460 | C400 | 0A5E | 468B | 26FC | 0739 | 0372 | 39E9 | C400 |
| 0000506500 | 0A5E | 6B26 | 3007 | C450 | 065E | FF26 | 0277 | FF26 |
| 0000506520 | 9A37 | 32A4 | 9DD2 | C483 | C406 | 065E | 8926 | 2607 |
| 0000506540 | 5789 | C402 | 065E | 8B26 | 0247 | 0B26 | 7407 | E903 |
| 0000506560 | 0006 | 07B8 | E900 | 0006 | 00B8 | E900 | 0000 | 5E1F |
| 0000506600 | 835F | 02ED | E58B | 5D1F | CA4D | 0014 | 581E | 4590 |
| 0000506620 | 8B55 | 1EEC | D88E | EC81 | 0004 | 5657 | B81E | 9FD6 |
| 0000506640 | D88E | 46C7 | 00FC | E900 | 0003 | 46FF | 8BFC | 0646 |
| 0000506660 | 4639 | 72FC | E903 | 001A | 766B | 30FC | 5EC4 | 2608 |
| 0000506700 | 70FF | 262E | 70FF | 9A2C | 2448 | A13B | C483 | E904 |
| 0000506720 | FFD8 | 76FF | FF0A | 0876 | 489A | B424 | 83A0 | 04C4 |
| 0000506740 | 5E1F | 835F | 02ED | E58B | 5D1F | CA4D | 0006 | 581E |
| 0000506760 | 4590 | 8B55 | 1EEC | D88E | EC81 | 0024 | 5657 | B81E |
| 0000507000 | A0FE | D88E | 46C7 | 6DFA | 8C2E | FC5E | 46C7 | 01F4 |
| 0000507020 | 2B01 | 89C0 | E646 | 4689 | 8EE4 | A406 | 263A | 3E83 |
| 0000507040 | 8EF5 | 7500 | E903 | 001D | 36FF | 2E82 | 36FF | 2E80 |
| 0000507060 | 468D | 16DC | 9A50 | 8966 | 0000 | C483 | 3D08 | 0000 |
| 0000507100 | 0374 | 0FE9 | 8E00 | A606 | 263A | 3E83 | A215 | 7500 |
| 0000507120 | E903 | 003A | 681E | 2E74 | 468D | 16E8 | 8D50 | DC46 |
| 0000507140 | 5016 | 468D | 16F6 | 6A50 | 1E4E | 8468 | FF2E | 7E36 |
| 0000507160 | FF2E | 7C36 | FF2E | 8236 | FF2E | 8036 | 9A2E | 89AF |
| 0000507200 | 0000 | C483 | 891E | F646 | 5689 | E9F8 | 0008 | C02B |
| 0000507220 | 4689 | 89F8 | F646 | 068E | 3AA4 | 8326 | 803E | 00A1 |
| 0000507240 | 0375 | 09E9 | 8300 | E07E | 74FE | E903 | 000F | 068E |
| 0000507260 | 3AA6 | 8326 | 0D3E | 008F | 0375 | 64E9 | FF00 | 0876 |
| 0000507300 | 76FF | FF06 | 0A76 | 76FF | FF0E | 0C76 | EA9A | 9330 |
| 0000507320 | 83A2 | 0AC4 | 4689 | FFE2 | E676 | 76FF | 8DE4 | E246 |
| 0000507340 | 5016 | 76FF | FFF4 | FC76 | 76FF | 8DFA | E84E | 5116 |
| 0000507360 | 4E8D | 16F6 | 8D51 | DC4E | 5116 | 681E | 2E84 | 4F6A |
| 0000507400 | 36FF | 2E7E | 36FF | 2E7C | 36FF | 2E82 | 36FF | 2E80 |
| 0000507420 | 569A | 008F | 8300 | 28C4 | 468B | E9E2 | 001D | 1AE9 |
| 0000507440 | FF00 | 0876 | 76FF | FF06 | 0A76 | 76FF | FF0E | 0C76 |
| 0000507460 | EA9A | 2230 | 8399 | 0AC4 | 00E9 | 1F00 | 5F5E | ED83 |
| 0000507500 | 8B02 | 1FE5 | 4D5D | 0ACA | 0017 | 0002 | A03C | 0001 |
| 0000507520 | 0000 | 0002 | A00C | 0002 | 0000 | 0002 | A07A | 0003 |
| 0000507540 | 0000 | 0002 | A12A | 0004 | 0000 | 0005 | 07E1 | 0003 |
| 0000507560 | 05B2 | 0203 | A196 | 0002 | 0082 | 0002 | A22F | 0005 |
| 0000507600 | 0000 | 0103 | 27F4 | 0001 | 008D | 0103 | 2834 | 0001 |
| 0000507620 | 008E | 0103 | 27EB | 0001 | 008F | 0005 | 2708 | 0003 |
| 0000507640 | 263D | 0105 | 296E | 0001 | 0087 | 0002 | A160 | 000B |
| 0000507660 | 0000 | 0005 | 07B0 | 0003 | 04D5 | 0005 | 4652 | 0005 |
| 0000507700 | 4A1E | 0103 | 1FC4 | 0001 | 003B | 0203 | A1DE | 0002 |
| 0000507720 | 0037 | 0103 | 1F35 | 0001 | 0046 | 0205 | A1FD | 0002 |
| 0000507740 | 0011 | 0005 | 1D38 | 0003 | 1C72 | 0203 | A271 | 0002 |
| 0000507760 | 0046 | 0205 | A1AC | 0002 | 001F | 0005 | 4658 | 0005 |
| 0000510000 | 46C7 | 0000 | 0000 | 0000 | 0000 | 0000 | 0000 | 0000 |
| 0000510020 | 0000 | 0000 | 0000 | 0000 | 0000 | 0000 | 0000 | 0000 |
| 0000510040 | 8B55 | 1EEC | 8E68 | 1E2E | 9268 | 9A2E | FFFF | 0000 |
| 0000510060 | 068E | 2E8E | A126 | 0015 | CEA3 | BB2E | 2E98 | 1F8C |
| 0000510100 | 75BE | 835B | FEE6 | 1E56 | FF9A | 00FF | 0B00 | 74C0 |
| 0000510120 | 3304 | EBC0 | 893A | 0477 | 894E | 9636 | 832E | 03EE |

THU MAR 14 17:31:54 1991 DB_PI.DLL PAGE 179, LINE 10503

| | | | | | | | | |
|---|---|---|---|---|---|---|---|---|
| 0000510140 | 04C7 | 0001 | 7789 | 8906 | 0877 | C683 | C702 | FE04 |
| 0000510160 | 89FF | 0A77 | 681E | 2E8C | 681E | 2E8A | FF9A | 00FF |
| 0000510200 | E800 | 0020 | D49A | FF02 | E8FF | 0066 | 01B8 | 5D00 |
| 0000510220 | 50CB | 929A | 7702 | 9A00 | 040C | 0085 | FF68 | 9A00 |
| 0000510240 | 019B | 008A | BB1E | 000D | FF33 | 068E | 2E8C | FFB9 |
| 0000510260 | 267F | 3D80 | 7500 | 4701 | 8026 | 003D | 3174 | ACBE |
| 0000510300 | 8B2E | 8BD1 | F3CB | 8BA6 | 74CA | 3308 | F2C0 | 74AE |
| 0000510320 | EBE7 | 061C | 071E | F78B | BF1F | 2ED3 | 2CAC | 7241 |
| 0000510340 | C00E | 04E0 | AC92 | 412C | 0572 | C20A | EBAA | 1FED |
| 0000510360 | 00C3 | 02BB | 5200 | D48B | A780 | 2ED3 | 50B7 | C48B |
| 0000510400 | 1653 | 1650 | 9A52 | FFFF | 0000 | C00B | 7558 | B110 |
| 0000510420 | 3C40 | 7401 | 3C06 | 7502 | B106 | 0808 | D38F | 4B2E |
| 0000510440 | D679 | E85A | 0026 | 4EBE | BF3A | 3A4E | 5FE8 | BE01 |
| 0000510460 | 3A4E | 52BF | E83A | 0156 | 52B8 | 3D3A | 3A56 | 0B74 |
| 0000510500 | 016A | 680E | 016D | FF9A | 00FF | C300 | 0E8B | 3A44 |
| 0000510520 | 2AE3 | 06C4 | 3A46 | C28C | DB33 | 1EFF | 3A42 | 0373 |
| 0000510540 | 61E9 | 8E01 | 9206 | 262E | 1E8B | 0006 | 754B | C40D |
| 0000510560 | 4A06 | 8C3A | BBC2 | 0003 | 1EFF | 3A42 | B8C3 | FFFF |
| 0000510600 | D88E | E3A1 | 0B30 | 75C0 | 0E10 | 5EA1 | 0B36 | 75C0 |
| 0000510620 | E805 | 001F | 03EB | 24E8 | 6A00 | 6A03 | 6A00 | 9A00 |
| 0000510640 | 0137 | 0000 | 8B55 | 33EC | EBC9 | 551A | EC8B | 01B9 |
| 0000510660 | EB00 | 5512 | EC8B | 5756 | 00B9 | EB01 | 5508 | EC8B |
| 0000510700 | 5756 | 01B9 | E801 | 004B | 0A51 | 75C9 | BE12 | 5B62 |
| 0000510720 | 62BF | E85B | 00B8 | 52BE | BF3A | 3A56 | AFE8 | BE00 |
| 0000510740 | 3A56 | 56BF | E83A | 00A6 | 56BE | BF3A | 3A56 | 9DE8 |
| 0000510760 | E800 | 008C | 0A58 | 75E4 | C713 | E306 | 0130 | B800 |
| 0000511000 | 0001 | 8A50 | 0646 | 9A50 | FFFF | 0000 | 4EE8 | 5F00 |
| 0000511020 | 5D5E | 55CB | EC8B | 0D6A | 13E8 | 8329 | 02C4 | 068E |
| 0000511040 | 2E92 | 8B26 | 061E | 4B00 | 168B | 30E5 | FA83 | 75FF |
| 0000511060 | 8904 | E51E | 3930 | E51E | 9F30 | 0D6A | 19E8 | 8329 |
| 0000511100 | 02C4 | 749E | 6A0A | E80E | 28C4 | C483 | EB02 | 3BC7 |
| 0000511120 | 74D3 | 6A08 | E80E | 28D6 | C483 | 5D02 | 55C3 | EC8B |
| 0000511140 | 0D6A | C9E8 | 8328 | 02C4 | 06C7 | 30E5 | FFFF | 0D6A |
| 0000511160 | E5E8 | 8328 | 02C4 | 0E6A | DDE8 | 8328 | 02C4 | C35D |
| 0000511200 | 0E8B | 3A44 | 07E3 | 02BB | FF00 | 421E | C33A | F73B |
| 0000511220 | 0E73 | EF83 | 8B04 | 0B05 | 0245 | F274 | 1DFF | EEEB |
| 0000511240 | 00C3 | 8B55 | B8EC | 00FC | 0E50 | 6FE8 | 8301 | EA3E |
| 0000511260 | 0030 | 0474 | 1EFF | 30E8 | FFB8 | 5000 | E80E | 015C |
| 0000511300 | E58B | CB5D | 02B8 | E900 | FDC7 | 5A59 | DC8B | D82B |
| 0000511320 | 0B72 | FB81 | 0200 | 0572 | E38B | 5152 | 52CB | 3351 |
| 0000511340 | E9C0 | FDAD | 14C8 | 0000 | 5657 | FF2B | F78B | 3639 |
| 0000511360 | 2E8C | 0375 | F0E9 | A100 | 2E8C | C92B | 4E89 | 89F4 |
| 0000511400 | F646 | 4E89 | 89F8 | FA46 | 0C6A | 76FF | FFFA | F876 |
| 0000511420 | 681E | 2EAC | 2E9A | 4828 | 8303 | 0AC4 | C00B | 1A74 |
| 0000511440 | 8146 | FFFE | 767F | E903 | 00BD | 5EC4 | FFF8 | F846 |
| 0000511460 | 8026 | 003F | EA75 | EB47 | 900D | 5EC4 | FFF8 | F846 |
| 0000511500 | 8026 | 003F | F475 | 5E8B | 26F8 | 3F80 | 7500 | 8DB9 |
| 0000511520 | 0145 | 6A50 | 9A04 | 3376 | 0357 | C483 | 8904 | F046 |
| 0000511540 | 5689 | 56F2 | 3E9A | 8D24 | 8303 | 02C4 | 4689 | 89FC |
| 0000511560 | FE56 | 468B | 0BF2 | F046 | 6D74 | C28B | 460B | 74FC |
| 0000511600 | 8B66 | F046 | 568B | A3F2 | 30D9 | 1689 | 30DB | 0C6A |
| 0000511620 | 76FF | FFF6 | F476 | 681E | 2EAC | 2E9A | 9228 | 8300 |
| 0000511640 | 0AC4 | C00B | 2C74 | 468B | 8BFC | FE56 | 5EC4 | 83F0 |
| 0000511660 | F046 | 2604 | 0789 | 8926 | 0257 | 5EC4 | FFF4 | F446 |
| 0000511700 | 8A26 | C407 | FC5E | 46FF | 26FC | 0788 | C00A | 0E74 |
| 0000511720 | E8EB | 5EC4 | FFF4 | F446 | 8026 | 003F | F475 | 5EC4 |
| 0000511740 | 26F4 | 3F80 | 7500 | 5EA7 | C95F | 90CB | 8B55 | 56EC |
| 0000511760 | B857 | 016E | D88E | C08E | 568B | BE06 | 3ABA | 3BAD |
| 0000512000 | 74C2 | 4010 | 7496 | 970C | C033 | FFB9 | F2FF | 8BAE |

THU MAR 14 17:31:54 1991 DB_PI.DLL PAGE 180, LINE 10562

| | | | | | | | | |
|---|---|---|---|---|---|---|---|---|
| 0000512020 | EBF7 | 96EB | 5E5F | E58B | CA5D | 0002 | 8B55 | 57EC |
| 0000512040 | 76FF | 0E06 | C5E8 | 0BFF | 74C0 | 921F | FA8B | C033 |
| 0000512060 | FFB9 | F2FF | F7AE | 49D1 | 8B50 | BBC4 | 0002 | 1E53 |
| 0000512100 | 5152 | 5016 | FF9A | 00FF | 5B00 | 8B5F | 5DE5 | 02CA |
| 0000512120 | 0000 | 1601 | 0202 | 0203 | 1804 | 0D05 | 0906 | 0C07 |
| 0000512140 | 0C08 | 0C09 | 070A | 080B | 160C | 160D | 020F | 0D10 |
| 0000512160 | 1211 | 0212 | 0235 | 0D41 | 0243 | 0D52 | 0D53 | 0D57 |
| 0000512200 | 0B59 | 0D6C | 206D | 1C70 | 0972 | 1606 | 0A80 | 0A81 |
| 0000512220 | 0982 | 0D84 | 0BA4 | 02CE | 0BD7 | 0D00 | 1608 | 8B52 |
| 0000512240 | E8D8 | 2802 | [illegible] | 5AC2 | 8926 | 0247 | 8926 | B817 |
| 0000512260 | FFFF | 8B99 | 5DE5 | E8CB | 0008 | FFB8 | 99FF | E58B |
| 0000512300 | CB5D | D88B | DFE8 | 9327 | C28E | 8926 | 0247 | BB53 |
| 0000512320 | 0442 | 24B9 | 0A00 | 75E4 | 2E1B | 073A | 1674 | 4343 |
| 0000512340 | F7E2 | 133C | 0472 | 243C | 0A76 | 3C43 | 72BC | 3C04 |
| 0000512360 | 76CA | 4301 | 8A2E | 0147 | 5B98 | 8926 | C307 | 8B55 |
| 0000512400 | BBEC | 0002 | 05EB | 8B55 | 33EC | E8DB | 2798 | C303 |
| 0000512420 | CB5D | 04C8 | 0000 | 46C7 | FFFC | C4FF | 065E | F626 |
| 0000512440 | 0A47 | 7440 | 2607 | 47C6 | 000A | 2CEB | C38B | F62D |
| 0000512460 | B930 | 000C | F799 | 89F9 | FE46 | E850 | 25A0 | C483 |
| 0000512500 | FF02 | 0876 | 76FF | 9A06 | 054E | 0568 | C483 | 8904 |
| 0000512520 | FC46 | 76FF | E8FE | 2592 | 468B | C9FC | 90CB | 10C8 |
| 0000512540 | 0000 | 5657 | FFBF | 8BFF | 0676 | 44F6 | 830A | 0375 |
| 0000512560 | 97E9 | 1E00 | 9A56 | 0ED4 | 058D | C483 | 8B04 | 8BF8 |
| 0000512600 | 81DE | F6EB | 8B30 | DA87 | 8932 | FA46 | 561E | D7E8 |
| 0000512620 | 8306 | 04C4 | 448A | 2A0B | 50E4 | 4E9A | A81E | 8305 |
| 0000512640 | 02C4 | C00B | 617C | 7E83 | 00FA | 5E74 | 681E | 30F0 |
| 0000512660 | 468D | 16F0 | 9A50 | 2750 | 05C8 | C483 | 8D08 | F246 |
| 0000512700 | 4689 | 8CFC | FE56 | 7E80 | 5CF0 | 1474 | 681E | 30F2 |
| 0000512720 | 468D | 16F0 | 9A50 | 270A | 05E1 | C483 | EB08 | 9004 |
| 0000512740 | 4EFF | 6AFC | FF0A | FE76 | 76FF | FFFC | FA76 | 289A |
| 0000512760 | EE29 | 8305 | 08C4 | 468D | 16F0 | 9A50 | 421C | 0307 |
| 0000513000 | C483 | 0B04 | 74C0 | BF03 | FFFF | 44C6 | 000A | C78B |
| 0000513020 | 5F5E | CBC9 | 08C8 | 0000 | E09A | 321C | 8906 | FC46 |
| 0000513040 | 5689 | 0BFE | 75D0 | 2B05 | 99C0 | 37EB | 76FF | 50FE |
| 0000513060 | 76FF | FF0E | 0C76 | 76FF | FF0A | 0876 | 76FF | 9A06 |
| 0000513100 | 0CDC | 066A | C483 | 890E | F846 | 5689 | 8BFA | FC46 |
| 0000513120 | F62D | B930 | 000C | F799 | 50F9 | 8DE8 | 8B24 | F846 |
| 0000513140 | 568B | C9FA | 90CB | 8B55 | 6AEC | FF40 | 0C76 | 76FF |
| 0000513160 | FF0A | 0876 | 76FF | 9A06 | 0604 | 053A | CBC9 | 08C8 |
| 0000513200 | 0000 | 5657 | 768B | 8B06 | 2DC6 | 30F6 | 0CB9 | 9900 |
| 0000513220 | F9F7 | 4689 | 50FA | 45E8 | 8324 | 02C4 | 561E | 3DE8 |
| 0000513240 | 8307 | 04C4 | F88B | 468D | 160E | FF50 | 0C76 | 76FF |
| 0000513260 | 1E0A | 9A56 | 17F6 | 060B | C483 | 890C | F846 | 561E |
| 0000513300 | E857 | 0792 | C483 | FF06 | FA76 | 1DE8 | 8324 | 02C4 |
| 0000513320 | 468B | 5EF8 | C95F | 90CB | 8B55 | 8BEC | 0E46 | F62D |
| 0000513340 | 993D | 0CB9 | F700 | 50F1 | F3E8 | 8323 | 02C4 | FF50 |
| 0000513360 | 1076 | 76FF | FF0E | 0C76 | 76FF | FF0A | 0876 | 76FF |
| 0000513400 | 0E06 | 0DE8 | 8300 | 0CC4 | 535B | DDE8 | 8323 | 02C4 |
| 0000513420 | CB5D | 8B55 | 83EC | 04EC | 5756 | 468B | F70A | 0C66 |
| 0000513440 | C88B | CA0B | 6174 | 4689 | 89FC | FE56 | 5EC4 | 8B06 |
| 0000513460 | 0E76 | D20B | 1F75 | FF3D | 74FF | 8B1A | 03CB | 72C8 |
| 0000513500 | 5014 | 5253 | C88B | 6AE8 | 8B00 | 5AC8 | 585B | C12B |
| 0000513520 | DA83 | EB00 | 833C | 01FB | 0577 | 00B9 | EB80 | 8B04 |
| 0000513540 | F7CB | 51D9 | 5350 | E852 | 0049 | C88B | 5B5A | 5F58 |
| 0000513560 | C12B | DA83 | 3B00 | 72CF | 0318 | 73D9 | 8C0C | 81C1 |
| 0000513600 | FFC1 | 8EFF | EBC1 | EB02 | 8B24 | 0BC8 | 75CA | EBA3 |
| 0000513620 | 8B00 | 0BC8 | 74CA | 8B13 | FC4E | C82B | C18B | 4E8B |
| 0000513640 | 1BFE | 8BCA | F7D1 | 0A76 | 03EB | 468B | 5F0C | 8B5E |
| 0000513660 | 5DE5 | 55CB | EC8B | EC83 | 8904 | FE4E | D6BF | 8B32 |

THU MAR 14 17:31:54 1991 DB_PI.DLL PAGE 181, LINE 10621

| | | | | | | | | |
|---|---|---|---|---|---|---|---|---|
| 0000513700 | 2DC6 | 30F6 | F803 | 44F6 | 0C0A | 0575 | 05F6 | 7401 |
| 0000513720 | 8B05 | 0245 | 03EB | 00B8 | 8902 | FC46 | 44F6 | 0C0A |
| 0000513740 | 0575 | 05F6 | 7401 | 8B33 | 0444 | C00B | 2C74 | C13B |
| 0000513760 | 0276 | C18B | 5350 | 0651 | FF50 | 0274 | 34FF | 5306 |
| 0000514000 | E80E | 363C | C483 | 070A | 5B59 | 2B58 | 29C8 | 0444 |
| 0000514020 | D803 | 0401 | 00EB | 62E3 | C2EB | 4E3B | 72FC | 3330 |
| 0000514040 | 8BD2 | F7C1 | FC76 | C18B | C22B | 5153 | 5006 | 5306 |
| 0000514060 | C033 | 448A | 500B | E80E | 18BA | C483 | 0708 | 5B59 |
| 0000514100 | C00B | 2C74 | FF3D | 74FF | 2B2D | 03C8 | EBD8 | 53C7 |
| 0000514120 | 0651 | 561E | E80E | 028E | C483 | 0704 | 5B59 | FF3D |
| 0000514140 | 74FF | 2617 | 0788 | 4943 | 458B | 8902 | FC46 | A6EB |
| 0000514160 | 4C80 | 100A | 04EB | 4C80 | 200A | 468B | 2BFE | 8BC1 |
| 0000514200 | 5DE5 | 00C3 | 08C8 | 0000 | 468B | 2D06 | 30F6 | 0CB9 |
| 0000514220 | 9900 | F9F7 | 4689 | 50FA | 43E8 | 8322 | 02C4 | 468D |
| 0000514240 | 160E | FF50 | 0C76 | 76FF | FF0A | 0876 | 76FF | 9A06 |
| 0000514260 | 0FBC | 06A6 | C483 | 890C | F846 | 76FF | E8FA | 222A |
| 0000514300 | 468B | C9F8 | 90CB | 8B55 | 8BEC | 0E46 | F62D | 9930 |
| 0000514320 | 0CB9 | F700 | 50F1 | 05E8 | 8322 | 02C4 | FF50 | 1076 |
| 0000514340 | 76FF | FF0E | 0C76 | 76FF | FF0A | 0876 | 76FF | 0E06 |
| 0000514360 | 0DE8 | 8300 | 0CC4 | 535B | EFE8 | 8321 | 02C4 | CB5D |
| 0000514400 | 8B55 | 83EC | 04EC | 5756 | 468B | F70A | 0C66 | C88B |
| 0000514420 | CA0B | 6174 | 4689 | 89FC | FE56 | 5EC4 | 8B06 | 0E76 |
| 0000514440 | D20B | 1F75 | FF3D | 74FF | 8B1A | 03CB | 72C8 | 5014 |
| 0000514460 | 5253 | C88B | 6AE8 | 8B00 | 5AC8 | 585B | C12B | DA83 |
| 0000514500 | EB00 | 833C | 01FB | 0577 | 00B9 | EB80 | 8B04 | F7CB |
| 0000514520 | 51D9 | 5350 | E852 | 0049 | C88B | 5B5A | 5F58 | C12B |
| 0000514540 | DA83 | 3B00 | 72CF | 0318 | 73D9 | 8C0C | 81C1 | 71C1 |
| 0000514560 | 8E07 | EBC1 | EB02 | 8B24 | 0BC8 | 75CA | EBA3 | 8B00 |
| 0000514600 | 0BC8 | 74CA | 8B13 | FC4E | C82B | C18B | 4E8B | 1BFE |
| 0000514620 | 8BCA | F7D1 | 0A76 | 03EB | 468B | 5F0C | 8B5E | 5DE5 |
| 0000514640 | 55CB | EC8B | EC83 | 8904 | FE4E | D6BF | 8B32 | 2DC6 |
| 0000514660 | 30F6 | F803 | 44F6 | 0C0A | 0575 | 05F6 | 7401 | 8B05 |
| 0000514700 | 0245 | 03EB | 00B8 | 8902 | FC46 | 44F6 | 080A | 0575 |
| 0000514720 | 05F6 | 7401 | 8B36 | 0444 | C00B | 2F74 | C13B | 0276 |
| 0000514740 | C18B | 5350 | 0651 | 0650 | FF53 | 0274 | 34FF | E80E |
| 0000514760 | 344E | C483 | 070A | 5B59 | 2B58 | 29C8 | 0444 | D803 |
| 0000515000 | 0401 | 00EB | C90B | C275 | 83E9 | 3B00 | FC4E | 5072 |
| 0000515020 | 44F6 | 080A | 0575 | 05F6 | 7401 | 5313 | 0651 | 561E |
| 0000515040 | E80E | 04C0 | C483 | 0704 | 5B59 | C00B | 6075 | D233 |
| 0000515060 | C18B | 76F7 | 8BFC | 2BC1 | 50C2 | 5153 | 5006 | 5306 |
| 0000515100 | C033 | 448A | 500B | E80E | 1812 | C483 | 0708 | 5B59 |
| 0000515120 | 3D5A | FFFF | 3474 | C82B | C23B | 2E75 | D803 | A4EB |
| 0000515140 | C033 | 8A26 | 5307 | 0651 | 561E | 0E50 | 13E8 | 8301 |
| 0000515160 | 06C4 | 5907 | 3D5B | FFFF | 1474 | 4943 | 458B | 0B02 |
| 0000515200 | 75C0 | 4001 | 4689 | E9FC | FF7A | 4C80 | 200A | 468B |
| 0000515220 | 2BFE | 8BC1 | 5DE5 | 00C3 | 08C8 | 0000 | B857 | 0001 |
| 0000515240 | E850 | 203A | C483 | 1E02 | 0268 | E831 | 0330 | C483 |
| 0000515260 | 8B04 | 8DF8 | 0A46 | 5016 | 76FF | FF08 | 0676 | 681E |
| 0000515300 | 3102 | F69A | A217 | 8308 | 0CC4 | 4689 | 1EF8 | 0268 |
| 0000515320 | 5731 | 81E8 | 8303 | 06C4 | 016A | 0DE8 | 8320 | 02C4 |
| 0000515340 | 468B | 5FF8 | CBC9 | 8B55 | 56EC | 8B57 | 0676 | 448A |
| 0000515360 | A80A | 7483 | A85F | 7540 | A85B | 7502 | 0C48 | 8801 |
| 0000515400 | 0A44 | FE8B | EF81 | 30F6 | C781 | 32D6 | 0CA8 | 0D75 |
| 0000515420 | 05F6 | 7501 | 1E08 | E856 | 0186 | C483 | 8B04 | 0644 |
| 0000515440 | 0489 | 75FF | FF02 | 0874 | 3350 | 8ADB | 0B5C | 0E53 |
| 0000515460 | C1E8 | 8315 | 08C4 | C00B | 1174 | FF3D | 75FF | 801A |
| 0000515500 | 0A4C | EB20 | 800A | 0A4C | EB20 | 8009 | 0A4C | C710 |
| 0000515520 | 0444 | 0000 | FFB8 | EBFF | 8A25 | D3BF | 802E | 82E7 |
| 0000515540 | FF80 | 7582 | 8A0B | 0A7C | C7F6 | 7582 | 8003 | 200D |

THU MAR 14 17:31:54 1991 DB_PI.DLL PAGE 182, LINE 10680

| | | | | | | | | |
|---|---|---|---|---|---|---|---|---|
| 0000515560 | 8948 | 0444 | 1CC4 | C033 | 8A26 | 4307 | 1C89 | 5E5F |
| 0000515600 | CB5D | 8B55 | 56EC | 8B57 | 0876 | 448A | A80A | 7482 |
| 0000515620 | A864 | 7540 | C760 | 0444 | 0000 | 01A8 | 0B74 | 10A8 |
| 0000515640 | 5374 | 4C8B | 8906 | 240C | 0CFE | 2402 | 88EF | 0A44 |
| 0000515660 | FE8B | EF81 | 30F6 | C781 | 32D6 | DB33 | 5C8A | A80B |
| 0000515700 | 7508 | A84B | 7504 | F618 | 0105 | 4275 | FE81 | 3102 |
| 0000515720 | 0674 | FE81 | 310E | 2675 | 87F6 | 2ED3 | 7440 | B91F |
| 0000515740 | 0001 | 1651 | 7E8D | 5706 | 0E53 | 6FE8 | 8316 | 08C4 |
| 0000515760 | 01B9 | EB00 | B846 | FFFF | 4C80 | 200A | 65EB | 1E53 |
| 0000516000 | E856 | 0D9C | C483 | 5B04 | 44F6 | 080A | D174 | 0C8B |
| 0000516020 | 548B | 2B06 | 42CA | 1489 | 558B | 4A02 | 5489 | E304 |
| 0000516040 | 5125 | FF51 | 0874 | 74FF | 5306 | E80E | 162E | C483 |
| 0000516060 | 5908 | 7CC4 | 8B06 | 0656 | 8826 | 3B15 | 75C1 | 33B6 |
| 0000516100 | 8AC0 | 0646 | 1DEB | C033 | 87F6 | 2ED3 | 7420 | B9E3 |
| 0000516120 | 0002 | 5051 | 5350 | E80E | 124E | C483 | 3308 | 8BC0 |
| 0000516140 | EBC8 | 5FCF | 5D5E | 00CB | 8B55 | 56EC | 768B | 8A04 |
| 0000516160 | 0A44 | 83A8 | 2674 | 08A8 | 2274 | 74FF | FF08 | 0674 |
| 0000516200 | 489A | B524 | 830A | 04C4 | 6480 | F70A | C033 | 4489 |
| 0000516220 | 8906 | 0844 | 0489 | 4489 | 8902 | 0444 | 5D5E | 00C3 |
| 0000516240 | 8B55 | 56EC | 768B | B804 | 0200 | 9A50 | 243E | 0C73 |
| 0000516260 | 8B59 | 81DE | F6EB | 8130 | D6C3 | 0B32 | 74D2 | 800B |
| 0000516300 | 0A4C | C70B | 0247 | 0200 | 0EEB | 4C80 | 040A | 47C7 |
| 0000516320 | 0102 | 8C00 | 8DDA | 0147 | 5489 | 8902 | 8904 | 0854 |
| 0000516340 | 4489 | C706 | 0444 | 0000 | 5D5E | 00C3 | 08C8 | 0000 |
| 0000516360 | 5657 | 5EC4 | 260A | 078A | 3D98 | 0077 | 4874 | 0877 |
| 0000516400 | 612C | 4C74 | 112C | 0674 | C02B | E999 | 00CC | F62B |
| 0000516420 | 46C6 | 01FC | 46C7 | 01FE | FF0D | 0A46 | 5EC4 | 260A |
| 0000516440 | 3F80 | 7400 | 835B | FE7E | 740D | 2655 | 078A | 3D98 |
| 0000516460 | 0074 | 3474 | 0877 | 2B2C | 1C74 | 372C | 3674 | 46C7 |
| 0000516500 | 00FE | EB00 | 90D4 | 01BE | C603 | FC46 | EB02 | 90C5 |
| 0000516520 | 09BE | EB01 | 90F4 | C6F7 | 0002 | E275 | CE83 | 8302 |
| 0000516540 | FEE6 | 46C6 | 80FC | B1EB | C6F7 | C000 | D075 | CE81 |
| 0000516560 | 4000 | A5EB | C6F7 | C000 | C475 | CE81 | 8000 | 99EB |
| 0000516600 | A468 | FF01 | 0E76 | FF56 | 0876 | 76FF | 9A06 | 1F06 |
| 0000516620 | 0C9E | C483 | 890A | FA46 | C00B | 037D | 69E9 | FFFF |
| 0000516640 | F406 | 8B30 | 107E | C78B | F62D | 0530 | 32D6 | 4689 |
| 0000516660 | 8AF8 | FC46 | 4588 | 8B0A | F85E | 07C6 | 2B00 | 89C0 |
| 0000516700 | 0445 | 4789 | 8904 | 0245 | 0589 | 4589 | 8908 | 0645 |
| 0000516720 | 468A | 88FA | 0B45 | C78B | DA8C | 5F5E | CBC9 | 8B55 |
| 0000516740 | 56EC | 8B57 | 0476 | BABB | 8134 | 02FE | 7431 | BB09 |
| 0000516760 | 34BE | FE81 | 310E | 5875 | FE8B | EF81 | 30F6 | C781 |
| 0000517000 | 32D6 | 44F6 | 0C0A | 4875 | 05F6 | 7501 | 8B43 | 8B07 |
| 0000517020 | 0257 | C88B | CA0B | 2174 | 4489 | 8906 | 0854 | 0489 |
| 0000517040 | 5489 | C702 | 0444 | 0200 | 45C7 | 0002 | 8002 | 0A4C |
| 0000517060 | C602 | 1105 | 01B8 | EB00 | 5319 | 00B8 | 5002 | 3E9A |
| 0000517100 | 8024 | 5B0D | 0B5B | 74D2 | 8907 | 8907 | 0257 | C8EB |
| 0000517120 | C033 | 5E5F | C35D | 8B55 | 56EC | 8B57 | 0676 | FE8B |
| 0000517140 | EF81 | 30F6 | C781 | 32D6 | 05F6 | 7410 | 332D | 8ADB |
| 0000517160 | 0B5C | 87F6 | 2ED3 | 7440 | 1E21 | 0E56 | 65E8 | 8300 |
| 0000517200 | 04C4 | 7E83 | 0004 | 1274 | C033 | 0588 | 4589 | 8902 |
| 0000517220 | 8904 | 0244 | 4489 | 8906 | 0844 | 5E5F | C35D | 04C8 |
| 0000517240 | 0000 | 468B | 0B08 | 0646 | 0875 | 006A | A7E8 | EB00 |
| 0000517260 | 9031 | 468B | 2D06 | 30F6 | 0CB9 | 9900 | F9F7 | 4689 |
| 0000517300 | 50FC | 19E8 | 831C | 02C4 | 76FF | FF08 | 0676 | D49A |
| 0000517320 | 180E | 830F | 04C4 | 4689 | FFFE | FC76 | 0BE8 | 8B1C |
| 0000517340 | FE46 | CBC9 | 02C8 | 0000 | 5657 | FF2B | 768B | 8A06 |
| 0000517360 | 0A44 | C88B | 0324 | 023C | 3F75 | C1F6 | 7508 | 8B0D |
| 0000517400 | 81DE | F6EB | F630 | D687 | 0132 | 2D74 | 048B | 442B |
| 0000517420 | 8906 | FE46 | C00B | 217E | FF50 | 0874 | 74FF | 8A06 |

THU MAR 14 17:31:54 1991 DB_PI.DLL PAGE 183, LINE 10739

| | | | | | | | | |
|---|---|---|---|---|---|---|---|---|
| 0000517440 | 0B4C | ED2A | 9A51 | 224C | 0F95 | C483 | 3908 | FE46 |
| 0000517460 | 0774 | 4C80 | 200A | FFBF | 8BFF | 0644 | 548B | 8908 |
| 0000517500 | 8904 | 0254 | 44C7 | 0004 | 8B00 | 5EC7 | C95F | 90CB |
| 0000517520 | 016A | 01E8 | CB00 | 04C8 | 0000 | 5657 | F6BE | 2B30 |
| 0000517540 | 89FF | FE7E | 026A | C5E8 | 831B | 02C4 | 11EB | 46C7 |
| 0000517560 | FFFE | FFFF | FC76 | 71E8 | 831B | 02C4 | C683 | 390C |
| 0000517600 | B636 | 7234 | 8B2B | 2DC6 | 30F6 | 0CB9 | 9900 | F9F7 |
| 0000517620 | 4689 | 50FC | 47E8 | 831B | 02C4 | 44F6 | 830A | D374 |
| 0000517640 | 561E | D49A | 310E | 830E | 04C4 | 7440 | 47C1 | C3EB |
| 0000517660 | 026A | A3E8 | 831B | 02C4 | 7E83 | 0104 | 0475 | C78B |
| 0000517700 | 03EB | 468B | 5EFE | C95F | 02C2 | 9000 | 8B55 | B8EC |
| 0000517720 | 01B4 | BA9A | 7602 | 5711 | C656 | B846 | 2B00 | 89C0 |
| 0000517740 | E846 | 4689 | C4C6 | 0A5E | 8026 | 003F | 0375 | 5FE9 |
| 0000517760 | 2607 | 1F8A | FF2A | 87F6 | 355D | 7408 | FF2D | E84E |
| 0000520000 | 468D | 16E8 | FF50 | 0876 | 76FF | E806 | 07C6 | FF50 |
| 0000520020 | 0876 | 76FF | E806 | 07A0 | 46FF | C40A | 0A5E | 8A26 |
| 0000520040 | 2A1F | F6FF | 5D87 | 0835 | EE75 | 5E8B | 260A | 3F80 |
| 0000520060 | 7425 | E903 | 06F2 | 46C6 | 00C0 | C02A | 4688 | 88FC |
| 0000520100 | B646 | 4688 | 88F2 | F646 | 4688 | 88EE | 5286 | 2BFE |
| 0000520120 | 89C0 | EA46 | 4689 | 89BA | FE46 | 4689 | 89C4 | C246 |
| 0000520140 | 68EB | 9090 | 46FF | C40A | 0A5E | 8A26 | 2A07 | 8BE4 |
| 0000520160 | F6F8 | 5D85 | 0435 | 1A74 | 46FF | 8BBA | FE46 | C88B |
| 0000520200 | E0C1 | D302 | D1C1 | D3E0 | 2DC7 | 0030 | 4689 | EBFE |
| 0000520220 | 9039 | 6C3D | 7400 | 771C | 3C2D | 744C | 7F13 | 2C1F |
| 0000520240 | 742A | 2C15 | 741C | EB23 | 901D | 46FE | EBFC | 901B |
| 0000520260 | 46FE | FEF6 | F646 | 12EB | 46FE | EBEE | 900D | 4E2C |
| 0000520300 | 0874 | 1A2C | E474 | 86FE | FE52 | BE80 | FE52 | 7400 |
| 0000520320 | 8093 | EE7E | 7500 | C414 | 0E5E | 4683 | 040E | 8B26 |
| 0000520340 | 2607 | 578B | 8902 | F846 | 5689 | C6FA | 5286 | 00FE |
| 0000520360 | 5EC4 | 260A | 078A | 200C | E42A | F88B | FF83 | 746E |
| 0000520400 | 8329 | 63FF | 1674 | FF83 | 747B | 8D11 | E846 | 5016 |
| 0000520420 | 76FF | FF08 | 0676 | BBE8 | EB06 | 900D | 46FF | FFE8 |
| 0000520440 | 0876 | 76FF | E806 | 0662 | F08B | 7E83 | 00BA | 0974 |
| 0000520460 | 7E83 | 00FE | 0375 | 83E9 | 8B05 | E9C7 | 05A0 | 7E83 |
| 0000520500 | 00BA | 0675 | 46FF | FFBA | FE46 | 46C7 | C8BC | 8C34 |
| 0000520520 | BE5E | 23EB | 46C7 | C2BC | EB34 | 90F4 | 46FF | C40A |
| 0000520540 | 0A5E | 5E89 | 8CBC | BE46 | 8026 | 5E3F | 0C75 | 478D |
| 0000520560 | 8901 | BC46 | 468C | FEBE | B64E | 206A | 006A | 468D |
| 0000520600 | 16C8 | 9A50 | 3E8E | 0EC1 | C483 | 8308 | 7BFF | 0374 |
| 0000520620 | A9E9 | C400 | BC5E | 8026 | 5D3F | 0374 | 9DE9 | C600 |
| 0000520640 | C046 | FF5D | BC46 | 46C6 | 20D3 | 8FE9 | 9000 | 8A26 |
| 0000520660 | 8807 | F446 | 46FF | 3CBC | 752D | 800F | C07E | 7400 |
| 0000520700 | 8B09 | BC5E | 8026 | 5D3F | 1E75 | 5E8A | 88F4 | C05E |
| 0000520720 | 01B0 | CB8A | E180 | C007 | 03EB | FF2A | 568D | 03C8 |
| 0000520740 | D2DA | 36E0 | 0708 | 54EB | 46FF | 26BC | 078A | 4688 |
| 0000520760 | 3AF4 | C046 | 0676 | 4688 | EBF0 | 900D | 468A | 88C0 |
| 0000521000 | F046 | 468A | 88F4 | C046 | 468A | 88C0 | F446 | 1CEB |
| 0000521020 | 5E8A | B0F4 | 8A01 | 80CB | 07E1 | EBC0 | 2A03 | 8DFF |
| 0000521040 | C856 | DA03 | E0D2 | 0836 | FE07 | F446 | 468A | 98F0 |
| 0000521060 | 4E8A | 2AF4 | 3BED | 7DC1 | 88D7 | C06E | 5EC4 | 26BC |
| 0000521100 | 3F80 | 745D | E903 | FF66 | 8026 | 003F | 0375 | FFE9 |
| 0000521120 | 8304 | 7BFF | 0A75 | C38B | C28C | 4689 | 890A | 0C56 |
| 0000521140 | 468B | 8BF8 | FA56 | 8689 | FE54 | 9689 | FE56 | 7E83 |
| 0000521160 | 00BA | 0A74 | 468B | FFFE | FE4E | C00B | 4E74 | FE83 |
| 0000521200 | 74FF | 8B49 | C1DE | 03FB | 468D | 03C8 | 36D8 | 078A |
| 0000521220 | 4632 | 98B6 | 01BA | 8B00 | 8BCE | 80D9 | 07E1 | E2D3 |
| 0000521240 | C285 | 2874 | 7E80 | 00EE | 0E75 | C68B | 5EC4 | FFF8 |
| 0000521260 | F846 | 8826 | EB07 | 9005 | 86FF | FE54 | 46FF | FFE8 |
| 0000521300 | 0876 | 76FF | E806 | 04C2 | F08B | A2EB | 4EFF | 56E8 |

THU MAR 14 17:31:54 1991 DB_PI.DLL PAGE 184, LINE 10798

| | | | | | | | | |
|---|---|---|---|---|---|---|---|---|
| 0000521320 | 76FF | FF08 | 0676 | DFE8 | 8B04 | F846 | 568B | 39FA |
| 0000521340 | 5486 | 75FE | 3909 | 5696 | 75FE | E903 | 0462 | 7E80 |
| 0000521360 | 00EE | 0374 | 29E9 | FF04 | C646 | FF83 | 7563 | E903 |
| 0000521400 | 041E | C28E | D88B | C626 | 0007 | 13E9 | 9004 | 64BF |
| 0000521420 | 8300 | 2DFE | 0675 | 46FE | EBF2 | 9006 | FE83 | 752B |
| 0000521440 | FF1F | FE4E | 0C75 | 7E83 | 00BA | 0674 | 86FE | FE52 |
| 0000521460 | 0EEB | 46FF | FFE8 | 0876 | 76FF | E806 | 044C | F08B |
| 0000521500 | FE83 | 7430 | E903 | 0155 | 46FF | FFE8 | 0876 | 76FF |
| 0000521520 | E806 | 0436 | F08B | 783C | 0474 | 583C | 1475 | 46FF |
| 0000521540 | FFE8 | 0876 | 76FF | E806 | 0420 | F08B | 78BF | E900 |
| 0000521560 | 012B | 46FF | 83EA | 78FF | 0674 | 6FBF | E900 | 011D |
| 0000521600 | 4EFF | 56E8 | 76FF | FF08 | 0676 | 2BE8 | BE04 | 0030 |
| 0000521620 | DAE9 | 9001 | 7E80 | 00FC | 0675 | 46FE | BFF6 | 0046 |
| 0000521640 | FE83 | 752D | FE05 | F246 | 08EB | FE83 | 742B | E903 |
| 0000521660 | 00EB | 4EFF | 74FE | E903 | 0095 | 7E83 | 00BA | 0375 |
| 0000521700 | 8CE9 | FE00 | 5286 | E9FE | 00D3 | FF83 | 7478 | 830D |
| 0000521720 | 70FF | 0874 | FF83 | 7446 | E903 | 0084 | 84F6 | 355D |
| 0000521740 | 7480 | 6A15 | 8D04 | C246 | 5016 | 7E9A | 6B42 | 5614 |
| 0000521760 | 79E8 | 8B03 | EBF0 | 9036 | FF83 | 7546 | 832C | EA7E |
| 0000522000 | 7400 | 8326 | 3AFE | 1C75 | 468B | 89C2 | EC46 | C02B |
| 0000522020 | 4689 | 89C4 | C246 | 46C7 | FFEA | BFFF | 0070 | 30BE |
| 0000522040 | EB00 | 900A | 46C7 | 00EA | FE00 | 5286 | 80FE | 52BE |
| 0000522060 | 00FE | 5C75 | 46FF | 8DEA | D044 | 0199 | C246 | 5611 |
| 0000522100 | 83C4 | BA7E | 7400 | FF08 | FE4E | 0375 | 74E9 | FFFF |
| 0000522120 | E846 | 76FF | FF08 | 0676 | 2FE8 | 8B03 | EBF0 | 903E |
| 0000522140 | 84F6 | 355D | 7404 | 83C2 | 6FFF | 1475 | FE83 | 7D38 |
| 0000522160 | 6AB8 | 8D03 | C246 | 5016 | 7E9A | 7C42 | EB14 | 90AE |
| 0000522200 | 006A | 0A6A | 468D | 16C2 | 9A50 | 423A | 0FC5 | 9DEB |
| 0000522220 | 4EFF | 56E8 | 76FF | FF08 | 0676 | 1BE8 | 8003 | 52BE |
| 0000522240 | 00FE | 0375 | 23E9 | 83FF | 70FF | 0F75 | 7E80 | 00F6 |
| 0000522260 | 0974 | 468B | 8BEC | C24E | 4689 | 80C4 | F27E | 7400 |
| 0000522300 | F70A | C25E | 5683 | 00C4 | 5EF7 | 83C4 | 46FF | 0575 |
| 0000522320 | 46C7 | 00EA | 8300 | EA7E | 7500 | E903 | 0272 | 7E80 |
| 0000522340 | 00EE | 0374 | 39E9 | FF02 | C646 | 7E80 | 00F6 | 1474 |
| 0000522360 | 468B | 8BC2 | C456 | 5EC4 | 26F8 | 0789 | 8926 | 0257 |
| 0000522400 | 1DE9 | 9002 | 468B | C4C2 | F85E | 8926 | E907 | 0210 |
| 0000522420 | 468B | 99E8 | 4689 | 89C2 | C456 | CEEB | 868D | FE58 |
| 0000522440 | 4689 | 8CBC | BE56 | FE83 | 752D | 8B13 | 36D8 | 07C6 |
| 0000522460 | 8D2D | 5986 | 89FE | BC46 | 568C | EBBE | 9006 | FE83 |
| 0000522500 | 752B | FF11 | FE4E | 46FF | FFE8 | 0876 | 76FF | E806 |
| 0000522520 | 0238 | F08B | 7E83 | 00BA | 0774 | 7E81 | 5DFE | 7E01 |
| 0000522540 | C72D | FE46 | 015D | 26EB | 468B | FFFE | FE4E | C00B |
| 0000522560 | 2374 | 46FF | 8BEA | C4C6 | BC5E | 46FF | 26BC | 0788 |
| 0000522600 | 46FF | FFE8 | 0876 | 76FF | E806 | 01FE | F08B | 84F6 |
| 0000522620 | 355D | 7504 | 83D3 | 2EFE | 4375 | 468B | FFFE | FE4E |
| 0000522640 | C00B | 3974 | 5EC4 | FFBC | BC46 | C626 | 2E07 | 18EB |
| 0000522660 | 468B | FFFE | FE4E | C00B | 2374 | 46FF | 8BEA | C4C6 |
| 0000522700 | BC5E | 46FF | 26BC | 0788 | 46FF | FFE8 | 0876 | 76FF |
| 0000522720 | E806 | 01B6 | F08B | 84F6 | 355D | 7504 | 83D3 | EA7E |
| 0000522740 | 7500 | E903 | 0081 | C68B | 653C | 0474 | 453C | 7775 |
| 0000522760 | 468B | FFFE | FE4E | C00B | 6D74 | 5EC4 | FFBC | BC46 |
| 0000523000 | C626 | 6507 | 46FF | FFE8 | 0876 | 76FF | E806 | 017A |
| 0000523020 | F08B | FE83 | 752D | C40F | BC5E | 46FF | 26BC | 07C6 |
| 0000523040 | EB2D | 9008 | 9090 | FE83 | 752B | 8B35 | FE46 | 4EFF |
| 0000523060 | 0BFE | 75C0 | FF1D | FE46 | 26EB | 468B | FFFE | FE4E |
| 0000523100 | C00B | 2374 | 46FF | 8BEA | C4C6 | BC5E | 46FF | 26BC |
| 0000523120 | 0788 | 46FF | FFE8 | 0876 | 76FF | E806 | 012C | F08B |
| 0000523140 | 84F6 | 355D | 7504 | FFD3 | E84E | FF56 | 0876 | 76FF |
| 0000523160 | E806 | 0144 | 7E83 | 00EA | 0375 | D3E9 | 8000 | EE7E |

THU MAR 14 17:31:54 1991 DB_PI.DLL PAGE 185, LINE 10857

| | | | | | | | | |
|---|---|---|---|---|---|---|---|---|
| 0000523200 | 7400 | E903 | 009A | 46FF | C4C6 | BC5E | C626 | 0007 |
| 0000523220 | 868D | FE58 | 5016 | 76FF | FFFA | F876 | 468A | 98F6 |
| 0000523240 | 8E50 | A806 | 263A | 1EFF | 3546 | C483 | EB0A | 9071 |
| 0000523260 | 5EC4 | 260A | 078A | E42A | C63B | 1274 | 4EFF | 56E8 |
| 0000523300 | 76FF | FF08 | 0676 | EFE8 | E900 | 0084 | 9090 | 4EFE |
| 0000523320 | 80B8 | EE7E | 7500 | 8349 | 0E6E | EB04 | 9043 | 632D |
| 0000523340 | 3D00 | 0018 | CA77 | E0D1 | 2E93 | A7FF | 16DE | 112E |
| 0000523360 | 1390 | 150C | 150C | 150C | 16A0 | 12FE | 16A0 | 16A0 |
| 0000523400 | 16A0 | 16A0 | 1500 | 1390 | 1384 | 16A0 | 16A0 | 1144 |
| 0000523420 | 16A0 | 1390 | 16A0 | 16A0 | 1301 | 16A0 | 16A0 | 114C |
| 0000523440 | 46FE | FFB8 | 0A46 | 20EB | 46FF | FFE8 | 0876 | 76FF |
| 0000523460 | E806 | 0056 | F08B | 5EC4 | FF0A | 0A46 | 8A26 | 2A07 |
| 0000523500 | 3BE4 | 74F0 | E903 | FF74 | FE83 | 74FF | E903 | F895 |
| 0000523520 | FE83 | 75FF | 830C | C67E | 7500 | 8006 | B87E | 7400 |
| 0000523540 | 8B05 | C646 | 02EB | C68B | 5F5E | CBC9 | 8B55 | 8BEC |
| 0000523560 | 045E | 87F6 | 355D | 7404 | 8B05 | EBC3 | 9008 | C38B |
| 0000523600 | DF24 | 072D | C900 | 02C2 | 9000 | 04C8 | 0000 | 5EC4 |
| 0000523620 | 2604 | 4FFF | 7804 | 2615 | 078B | 8B26 | 0257 | FF26 |
| 0000523640 | 8B07 | 8ED8 | 26C2 | 078A | E42A | 07EB | 5306 | D69A |
| 0000523660 | BD0A | C917 | 04C2 | 9000 | 8B55 | 83EC | 087E | 74FF |
| 0000523700 | FF0E | 0676 | 76FF | FF04 | 0876 | E49A | DD1D | C913 |
| 0000523720 | 06C2 | 9000 | 8B55 | 56EC | 5EC4 | 2608 | 07FF | 76FF |
| 0000523740 | FF06 | 0476 | A3E8 | 8BFF | F6F0 | 5D84 | 0835 | E875 |
| 0000523760 | C95E | 08C2 | 9000 | 184E | 1859 | 186F | 18A3 | 18CF |
| 0000524000 | 18D7 | 1900 | 1932 | 8B55 | B8EC | 0171 | E80E | EABA |
| 0000524020 | 5756 | C033 | 4689 | 88F8 | FB46 | 76C4 | 260A | 89AC |
| 0000524040 | 0A76 | 4688 | 0AFE | 74C0 | 8306 | F87E | 7D00 | 8B06 |
| 0000524060 | F846 | B5E9 | BB04 | 34CA | 202C | 583C | 0577 | 24D7 |
| 0000524100 | EB0F | B002 | B100 | D203 | 02E0 | FB46 | FED7 | D2C1 |
| 0000524120 | 88E8 | FB46 | 8B98 | D1D8 | 2EE3 | A7FF | 17E6 | 568A |
| 0000524140 | B9FE | 0001 | 36E8 | EB04 | 33B1 | 89C0 | F046 | 4689 |
| 0000524160 | 89F6 | EE46 | 46C7 | 20FC | 4800 | 4689 | EBF4 | 8A9B |
| 0000524200 | FE46 | 2D3C | 0675 | 4E80 | 04FC | 8EEB | 2B3C | 0675 |
| 0000524220 | 4E80 | 01FC | 84EB | 203C | 0775 | 4E80 | 02FC | 79E9 |
| 0000524240 | 3CFF | 7523 | 8007 | FC4E | E980 | FF6E | 4E80 | 08FC |
| 0000524260 | 67E9 | 8AFF | FE4E | F980 | 752A | E80F | 035C | C00B |
| 0000524300 | 1779 | D8F7 | 4E80 | 04FC | 0FEB | E980 | 3230 | 8BED |
| 0000524320 | F646 | 0ABB | F700 | 03E3 | 89C1 | F646 | 3BE9 | C7FF |
| 0000524340 | F446 | 0000 | 33E9 | 8AFF | FE4E | F980 | 752A | E80C |
| 0000524360 | 0328 | C00B | 1479 | FFB8 | EBFF | 800F | 30E9 | ED32 |
| 0000524400 | 468B | BBF4 | 000A | E3F7 | C103 | 4689 | E9F4 | FF0A |
| 0000524420 | 468A | 3CFE | 756C | 8006 | FC4E | EB10 | 3C22 | 7546 |
| 0000524440 | 8006 | FC4E | EB20 | 3C18 | 754E | 8006 | FD4E | EB10 |
| 0000524460 | 3C0E | 754C | 8006 | FD4E | EB04 | 8004 | FD4E | E908 |
| 0000524500 | FED8 | 468A | 3CFE | 7564 | E903 | 0194 | 693C | 0375 |
| 0000524520 | 8DE9 | 3C01 | 7575 | E903 | 018A | 583C | 0375 | 89E9 |
| 0000524540 | 3C01 | 7578 | E903 | 0188 | 6F3C | 0375 | A2E9 | 3C01 |
| 0000524560 | 7463 | 3C1A | 7473 | 3C27 | 746E | 3C51 | 7470 | 3C60 |
| 0000524600 | 7445 | 3C07 | 7447 | E903 | 00BB | B5E9 | E800 | 028A |
| 0000524620 | BE8D | FE8F | 0716 | 4FAA | 01B9 | E900 | 01F1 | 90E8 |
| 0000524640 | 0B02 | 75FF | 8C12 | 0BC0 | 75C0 | 1E0C | BF07 | 3523 |
| 0000524660 | 0E8B | 3529 | D8E9 | 5701 | 4E8B | E3F4 | 3207 | F2C0 |
| 0000524700 | 75AE | 4F01 | 2B59 | 87F9 | E9CF | 01C3 | 62E8 | 8B02 |
| 0000524720 | F846 | F6AB | FC46 | 7410 | 3303 | ABC0 | 3BE9 | F6FE |
| 0000524740 | FC46 | 7530 | E805 | 0232 | 39EB | 36E8 | F602 | FD46 |
| 0000524760 | 7518 | C630 | FF46 | B907 | 0010 | 0716 | 3352 | 8DD2 |
| 0000525000 | 97BE | BEFE | 0004 | B0E8 | B902 | 0010 | BE8D | FE92 |
| 0000525020 | 3358 | BED2 | 0004 | A0E8 | C602 | 9386 | 3AFE | 09B9 |
| 0000525040 | EB00 | C618 | FF46 | B907 | 0010 | 0716 | D233 | BE8D |

THU MAR 14 17:31:54 1991 DB_PI.DLL PAGE 186, LINE 10916

| | | | | | | | | |
|---|---|---|---|---|---|---|---|---|
| 0000525060 | FE92 | 04BE | E800 | 0281 | 04B9 | 8D00 | 8FBE | E9FE |
| 0000525100 | 014D | 46FF | 80EE | FC4E | 8A4D | FE46 | 200C | 8B98 |
| 0000525120 | 83F0 | F47E | 7F00 | 7413 | C707 | F446 | 0006 | 0AEB |
| 0000525140 | 673D | 7500 | C705 | F446 | 0001 | 8E8D | FE8F | 76FF |
| 0000525160 | FFEE | F476 | 1656 | FF57 | 1076 | 76FF | F60E | FD46 |
| 0000525200 | 7404 | FF0A | 521E | 8335 | 0E46 | EB0A | FF08 | 3E1E |
| 0000525220 | 8335 | 0E46 | 8308 | 0EC4 | 46F6 | 80FC | 0F74 | 7E83 |
| 0000525240 | 00F4 | 0975 | 5716 | 1EFF | 354A | C483 | 8304 | 67FE |
| 0000525260 | 1075 | 46F7 | 80FC | 7500 | 1609 | FF57 | 421E | 8335 |
| 0000525300 | 04C4 | 0716 | 8026 | 2D3D | 0575 | 8047 | FD4E | B901 |
| 0000525320 | FFFF | B057 | F200 | 4FAE | 2B59 | 87F9 | E9CF | 00AF |
| 0000525340 | 4E80 | 40FC | 46C6 | 0AFA | 35EB | 46C6 | 07FF | 04EB |
| 0000525360 | 46C6 | 27FF | 46F6 | 80FC | 1174 | 46C7 | 02F0 | C600 |
| 0000525400 | F246 | B230 | 0251 | FF56 | 5688 | C6F3 | FA46 | EB10 |
| 0000525420 | F60E | FC46 | 7480 | 8004 | FD4E | C602 | FA46 | F608 |
| 0000525440 | FC46 | 7410 | E805 | 00FB | 0EEB | EDE8 | F600 | FC46 |
| 0000525460 | 7440 | 9903 | 02EB | D233 | 46F6 | 40FC | 0F74 | D20B |
| 0000525500 | 0B7D | 4E80 | 01FD | D8F7 | D283 | F700 | 83DA | F47E |
| 0000525520 | 7D00 | C707 | F446 | 0001 | 04EB | 6680 | F7FC | D88B |
| 0000525540 | DA0B | 0575 | 46C7 | 00F0 | 8D00 | EB7E | 0716 | 4E8A |
| 0000525560 | 32FA | 8BED | F476 | 40E8 | F601 | FD46 | 7402 | E30E |
| 0000525600 | 2606 | 3D80 | 7430 | 4F06 | C626 | 3005 | EB41 | F600 |
| 0000525620 | FC46 | 7440 | F631 | FD46 | 7401 | C60B | F246 | C72D |
| 0000525640 | F046 | 0001 | 20EB | 46F6 | 01FC | 0B74 | 46C6 | 2BF2 |
| 0000525660 | 46C7 | 01F0 | EB00 | F60F | FC46 | 7402 | C609 | F246 |
| 0000525700 | C720 | F046 | 0001 | 468B | 2BF6 | 2BC1 | F046 | 027D |
| 0000525720 | C033 | 5706 | F651 | FC46 | 750C | 8B07 | B2C8 | E820 |
| 0000525740 | 00BB | 1650 | 8D07 | F27E | 4E8B | E8F0 | 0091 | F658 |
| 0000525760 | FC46 | 7408 | F60D | FC46 | 7504 | 8B07 | B2C8 | E830 |
| 0000526000 | 009B | 5F59 | 5007 | 76E8 | 5800 | 46F6 | 04FC | 0774 |
| 0000526020 | C88B | 20B2 | 86E8 | E900 | FC00 | 76C4 | 260E | 89AD |
| 0000526040 | 0E76 | C4C3 | 0E76 | AD26 | D08B | AD26 | 8992 | 0E76 |
| 0000526060 | F6C3 | FC46 | 7420 | E808 | FFE9 | C28E | F88B | E8C3 |
| 0000526100 | FFD8 | F88B | C00B | 0375 | C08E | 1EC3 | C307 | 0698 |
| 0000526120 | C457 | 065E | FF26 | 044F | 1078 | 8B26 | 263F | 07FF |
| 0000526140 | 8E26 | 0247 | 33AA | 5FC0 | C307 | 5251 | 5306 | 0E50 |
| 0000526160 | 0FE8 | 83EF | 06C4 | 595A | FF3D | 75FF | EBE8 | E3E8 |
| 0000526200 | 8B1B | 01F7 | F84E | 3357 | 26FF | E8AC | FFC0 | F80B |
| 0000526220 | F7E2 | FF0B | 745F | C705 | F846 | FFFF | E3C3 | 0119 |
| 0000526240 | F84E | 3357 | 8AFF | E8C2 | FFA4 | F80B | F7E2 | FF0B |
| 0000526260 | 745F | C705 | F846 | FFFF | FDC3 | 9357 | F60B | 0A7F |
| 0000526300 | DB0B | 0675 | D20B | 0275 | 1AEB | 3392 | F7D2 | 93F1 |
| 0000526320 | F1F7 | 8792 | 04D3 | 3C30 | 7639 | 0203 | FF46 | 8BAA |
| 0000526340 | 4EC2 | D8EB | 2B59 | 47CF | C3FC | 5E5F | E58B | CB5D |
| 0000526360 | 06C8 | 0000 | BE56 | 30F6 | C02B | 4689 | 89FC | FA46 |
| 0000526400 | 026A | 29E8 | 830E | 02C4 | 0CEB | 76FF | E8FE | 0DDA |
| 0000526420 | C483 | 8302 | 0CC6 | 3639 | 34B6 | 3B72 | C68B | F62D |
| 0000526440 | B930 | 000C | F799 | 89F9 | FE46 | E850 | 0DB0 | C483 |
| 0000526460 | F602 | 0A44 | 7583 | C7D3 | 0444 | 0000 | 44C6 | 000A |
| 0000526500 | C02B | 4489 | 8908 | 0644 | 4489 | 8902 | C604 | 0B44 |
| 0000526520 | 89FF | FA76 | 5E8C | 6AFC | E802 | 0DFC | C483 | 8B02 |
| 0000526540 | FA46 | 568B | 5EFC | CBC9 | 8B55 | BBEC | 3102 | 06EB |
| 0000526560 | 8B55 | 8BEC | 085E | C38B | F62D | 9930 | 0CB9 | F700 |
| 0000526600 | 50F1 | E850 | 0D58 | C483 | FF02 | 044F | 0F78 | 07FF |
| 0000526620 | 1FC4 | 468A | 2606 | 4788 | 32FF | EBE4 | 1E0C | FF53 |
| 0000526640 | 0676 | E80E | EDDC | C483 | 5B06 | E853 | 0D3C | C483 |
| 0000526660 | 5D02 | 00CB | 04C8 | 0000 | 8B56 | 0676 | 468B | 2D08 |
| 0000526700 | 30F6 | 0CB9 | 9900 | F9F7 | 4689 | 50FE | 0FE8 | 830D |
| 0000526720 | 02C4 | 76FF | FF0A | 0876 | 9A56 | 1DE4 | 17A1 | C483 |

THU MAR 14 17:31:54 1991 DB_PI.DLL PAGE 187, LINE 10975

| | | | | | | | | |
|---|---|---|---|---|---|---|---|---|
| 0000526740 | 8906 | FC46 | 76FF | E8FE | 0D00 | C483 | 8B02 | FC46 |
| 0000526760 | C95E | 90CB | 8B55 | 57EC | 8B56 | 0676 | 7E8B | 8308 |
| 0000527000 | FFFE | 1274 | 45F6 | 010A | 1275 | 45F6 | 800A | 0674 |
| 0000527020 | 45F6 | 020A | 0674 | FFB8 | EBFF | 903E | 458B | 0B08 |
| 0000527040 | 0645 | 0875 | 571E | 77E8 | 83EE | 04C4 | 058B | 558B |
| 0000527060 | 3902 | 0645 | 0D75 | 5539 | 7508 | 8308 | 047D | 7500 |
| 0000527100 | FFD5 | FF05 | 0445 | C68B | 0DFF | 1DC4 | 8826 | 8007 |
| 0000527120 | 0A65 | 80EF | 0A4D | 2A01 | 5EE4 | C95F | 90CB | 8B55 |
| 0000527140 | 8BEC | 065E | 1E3B | 2ED1 | 1272 | 09BA | 3300 | E9C0 |
| 0000527160 | E62C | E853 | 0C8C | C483 | E902 | E63B | E853 | 0C76 |
| 0000527200 | C483 | 5302 | FF9A | 00FF | 8500 | 75C0 | C6E5 | D387 |
| 0000527220 | 002E | E853 | 0C6C | C483 | 8B02 | 5DE5 | 00CB | 8B55 |
| 0000527240 | 83EC | 02EC | C033 | 09EB | 8B55 | 83EC | 02EC | FFB8 |
| 0000527260 | 89FF | FE46 | 5E8B | 3B06 | D11E | 722E | BA19 | 0009 |
| 0000527300 | C033 | D9E9 | 8BE5 | FE4E | C90B | 0774 | E853 | 0C32 |
| 0000527320 | C483 | E902 | E5E1 | C00B | 0774 | E853 | 0C18 | C483 |
| 0000527340 | 8302 | 04EC | CC8B | FF53 | 0A76 | 76FF | FF08 | 0C76 |
| 0000527360 | 5116 | FF9A | 00FF | 5900 | 855A | 75C0 | 80C8 | D3A7 |
| 0000527400 | FD2E | 468B | 0BFE | 74C0 | 5307 | F5E8 | 830B | 02C4 |
| 0000527420 | 8B91 | 5DE5 | 00CB | 8B55 | 83EC | 0EEC | 7E8A | 8B0C |
| 0000527440 | 0E46 | 4689 | EB0C | 5508 | EC8B | EC83 | B70E | FF40 |
| 0000527460 | 0876 | 76FF | 1606 | 568D | 52FE | 8D16 | F856 | 3352 |
| 0000527500 | 52D2 | 8B52 | 0C4E | 99E8 | 8B01 | 0A46 | 00A9 | 7401 |
| 0000527520 | 8008 | 10CA | 00A9 | 7504 | A92A | 0200 | 2274 | CA80 |
| 0000527540 | 5002 | 468D | FFFE | 0876 | 76FF | 1606 | 3350 | 50C0 |
| 0000527560 | 9A50 | FFFF | 0000 | C085 | 7558 | 8B08 | FE4E | 03EB |
| 0000527600 | CA80 | 5101 | 2552 | 0003 | C70A | 3350 | 50C0 | 9A50 |
| 0000527620 | FFFF | 0000 | C00B | 1674 | 6E3D | 7500 | F60E | F0C2 |
| 0000527640 | 02BA | 7400 | BA03 | 0011 | F3E9 | E9E4 | 009D | 468B |
| 0000527660 | 3BFE | D106 | 722E | 500D | 759A | 001E | BA00 | 0018 |
| 0000527700 | C033 | E4EB | E850 | 0B2E | C483 | 8B02 | 50D0 | 8D16 |
| 0000527720 | F45E | 1653 | 468D | 50F8 | F69A | 0000 | 0B00 | 75C0 |
| 0000527740 | 8B61 | 0A46 | C933 | 00A9 | 7580 | A90E | 4000 | 0775 |
| 0000527760 | 06F6 | 352D | 7580 | B102 | 8880 | F24E | 468A | 3CF4 |
| 0000530000 | 7501 | C607 | F446 | E940 | 008F | 023C | 0775 | 46C6 |
| 0000530020 | 08F4 | 84E9 | 3200 | 88C0 | F446 | C90A | F474 | 46F7 |
| 0000530040 | 020A | 7400 | 5274 | FFB9 | 51FF | B951 | 0002 | 165I |
| 0000530060 | 468D | 50FA | E39A | 001E | 0B00 | 74C0 | 3D15 | 0083 |
| 0000530100 | 0C74 | 76FF | E8FE | 0ABA | C483 | E902 | E469 | C033 |
| 0000530120 | 47EB | 1652 | 468D | 50F6 | 01B8 | 5000 | 8D16 | F846 |
| 0000530140 | 9A50 | FFFF | 0000 | C00B | 1B75 | 4639 | 74F8 | 802A |
| 0000530160 | F67E | 751A | 5210 | 76FF | FFFC | FA76 | FF9A | 00FF |
| 0000530200 | 0B00 | 75C0 | 52BD | C033 | 505D | 1650 | 468D | 50FA |
| 0000530220 | 259A | 0020 | 0B00 | 75C0 | 8AA9 | F44E | C1F6 | 7548 |
| 0000530240 | FF28 | 0876 | 76FF | 1606 | 468D | 50F8 | C033 | 5050 |
| 0000530260 | 629A | 001F | F700 | F846 | 0001 | 0374 | C980 | F710 |
| 0000530300 | 0A46 | 0008 | 0374 | C980 | 0A20 | F24E | C980 | 8B01 |
| 0000530320 | 8BC2 | 88D8 | D38F | 532E | 27E8 | 830A | 02C4 | E58B |
| 0000530340 | CB5D | CCA1 | F72E | 23D0 | 33C1 | A8C9 | 7580 | 8003 |
| 0000530360 | 01C9 | 00C3 | 8B55 | 83EC | 08EC | C033 | 5E8B | 3B06 |
| 0000530400 | D11E | 732E | 534D | EDE8 | 8309 | 02C4 | 4E8B | E30C |
| 0000530420 | F647 | D387 | 022E | 4075 | 3357 | 8BD2 | 0C4E | 7EC4 |
| 0000530440 | F608 | D387 | 082E | 1074 | 878A | 2FD3 | 0A3C | 0874 |
| 0000530460 | 42AA | C649 | D387 | 0A2F | 0653 | 5157 | 468D | 16FA |
| 0000530500 | 9A50 | 2052 | 0000 | 0B5F | 74C0 | 530F | B3E8 | 8309 |
| 0000530520 | 02C4 | 09BA | E900 | E346 | 4AEB | 468B | 03FA | F6C2 |
| 0000530540 | D387 | 802E | 3E74 | A780 | 2ED3 | 56FB | 1E57 | C507 |
| 0000530560 | 0876 | FE8B | C88B | 28E3 | 0DB4 | 3C80 | 750A | 2606 |
| 0000530600 | 8F80 | 2ED3 | AC04 | C43A | 2574 | 1A3C | 0875 | 8026 |

THU MAR 14 17:31:54 1991 DB_PI.DLL PAGE 188, LINE 11034

| | | | | | | | | |
|---|---|---|---|---|---|---|---|---|
| 0000530620 | D38F | 022E | 05EB | 0588 | E247 | 8BEA | 2BC7 | 0846 |
| 0000530640 | 1F06 | 5E5F | E853 | 095A | C483 | 8B02 | 5DE5 | 83CB |
| 0000530660 | 01F9 | 0774 | 3C80 | 740A | EBE0 | 26DB | 87F6 | 2ED3 |
| 0000530700 | 7440 | 0B2B | 75DB | 5323 | 468D | 16F9 | 5150 | 468D |
| 0000530720 | 16FA | 9A50 | 2132 | 0000 | C085 | 0E74 | 1F06 | 5E5F |
| 0000530740 | E853 | 091E | C483 | E902 | E2CD | 0AB0 | A8EB | 46C6 |
| 0000530760 | 00F9 | 8D53 | F946 | 5016 | 8D51 | FA46 | 5016 | C49A |
| 0000531000 | 0021 | 0B00 | 75C0 | F7D5 | FA46 | FFFF | 3674 | 7E83 |
| 0000531020 | 010C | 3574 | F626 | D387 | 082E | 1C75 | B853 | FFFF |
| 0000531040 | 5050 | D8F7 | 8D50 | FC46 | 5016 | 819A | 0020 | 8000 |
| 0000531060 | F97E | 750A | E90F | FF61 | 468A | 26F9 | 8788 | 2FD3 |
| 0000531100 | 0A3C | 0274 | 0DB0 | 4DE9 | 80FF | F97E | 750A | EBC5 |
| 0000531120 | 0099 | 8B55 | 83EC | 0EEC | C033 | 09EB | 8B55 | 83EC |
| 0000531140 | 0EEC | FFB8 | 89FF | F246 | 5E8B | 3B06 | D11E | 722E |
| 0000531160 | BA08 | 0009 | C033 | 25E9 | 0BE2 | 74C0 | 5307 | 75E8 |
| 0000531200 | 8308 | 02C4 | 87F6 | 2ED3 | 7420 | 5312 | C933 | 5151 |
| 0000531220 | 4141 | 8D51 | F446 | 5016 | 1B9A | 0022 | F600 | D387 |
| 0000531240 | 802E | 6674 | 5E8C | 8EFA | 0A46 | 56C5 | 3308 | 89C0 |
| 0000531260 | FE46 | 4689 | FCFC | 5657 | FA8B | F28B | 6689 | 8BF8 |
| 0000531300 | 0C4E | 28E3 | 0AB0 | AEF2 | 3B75 | EC83 | 8B02 | BADC |
| 0000531320 | 0080 | E22B | D48B | FA8B | D716 | 4E8B | AC0C | 0A3C |
| 0000531340 | 0D74 | FB3B | 1A74 | E2AA | E8F4 | 0038 | AFE9 | B000 |
| 0000531360 | 3B0D | 75FB | E803 | 002C | B0AA | FF0A | FC46 | E2EB |
| 0000531400 | 21E8 | EB00 | 5EE1 | 8E5F | FA5E | C8E9 | 8B00 | F246 |
| 0000531420 | C00B | 0974 | 76FF | E806 | 07E8 | C483 | B802 | FFFC |
| 0000531440 | E80E | DFA6 | 5350 | 1E51 | 1F06 | CF8B | CA2B | 21E3 |
| 0000531460 | 8B51 | 065E | 1E53 | 5152 | 468D | 16F4 | 9A50 | 0435 |
| 0000531500 | 0000 | 0B59 | 75C0 | 8B11 | F45E | 5E01 | 3BFE | 72D9 |
| 0000531520 | 1F07 | 5B59 | 8B58 | C3FA | 831F | 08C4 | 7E83 | 00FE |
| 0000531540 | 3C75 | C00B | 1874 | 6D3D | 7400 | 3D0D | 0001 | 09BA |
| 0000531560 | 7500 | BA08 | 001C | 03EB | 20BA | F900 | 26EB | 5E8E |
| 0000531600 | F6FA | D387 | 402E | 0E74 | 5E8E | 8B0A | 085E | 3F80 |
| 0000531620 | 751A | F803 | 0EEB | 1CBA | 3300 | F9C0 | 06EB | 468B |
| 0000531640 | 2BFE | FC46 | 668B | 5EF8 | 8E5F | FA5E | 1472 | 5E8B |
| 0000531660 | 0BF2 | 74DB | FF09 | 0676 | 47E8 | 8307 | 02C4 | E58B |
| 0000531700 | CB5D | 5E8B | 0BF2 | 74DB | FF09 | 0676 | 33E8 | 8307 |
| 0000531720 | 02C4 | C9E9 | 8BE0 | 0C4E | C90B | 0475 | C18B | CEEB |
| 0000531740 | C51E | 0856 | 1E53 | 5152 | 468D | 16F4 | 9A50 | 232E |
| 0000531760 | 0000 | 071E | 0B1F | 74C0 | 3D17 | 006D | 0D74 | 013D |
| 0000532000 | BA00 | 0009 | 8C75 | 1CBA | EB00 | BAB7 | 0020 | B2EB |
| 0000532020 | 468B | 0BF4 | 75C0 | F697 | D387 | 402E | 0A74 | DA8B |
| 0000532040 | 8026 | 1A3F | 0275 | 86EB | 1CBA | 3300 | EBC0 | 0093 |
| 0000532060 | 5A59 | E852 | 0870 | D88B | C28E | 265A | 478B | 3B04 |
| 0000532100 | 73C4 | 2B07 | F7C4 | 52D8 | CB51 | C033 | F9EB | 65EA |
| 0000532120 | CC24 | EA1D | 2484 | 2441 | 52EA | 4624 | EA24 | 2452 |
| 0000532140 | 244B | 8B55 | 56EC | 76C4 | 8C06 | E3C1 | 2605 | 4C80 |
| 0000532160 | 01FE | 5D5E | 55CB | EC8B | 096A | B1E8 | 8306 | 02C4 |
| 0000532200 | 76FF | 0E06 | 0DE8 | 5B00 | 096A | CBE8 | 8306 | 02C4 |
| 0000532220 | E58B | CB5D | 8B55 | 56EC | 8B57 | 064E | F983 | 77E8 |
| 0000532240 | 1E69 | 30A1 | 0B35 | 74C0 | BF48 | 256C | 368B | 353B |
| 0000532260 | 1EC5 | 3532 | 561E | FF57 | 5FD7 | 735E | 8C2B | C5DA |
| 0000532300 | 0C5F | D63B | EF75 | 1F58 | C41E | 3236 | 2635 | 748B |
| 0000532320 | C512 | 2E1E | 8C35 | 3BDA | 75D0 | 1FD9 | 811E | E8FF |
| 0000532340 | 7425 | BF0E | 25E8 | C4EB | 815E | 6CFF | 7425 | EB0F |
| 0000532360 | 070A | BF06 | 352E | E1E8 | 7201 | E80E | 007E | 891F |
| 0000532400 | 3416 | 8935 | 321E | EB35 | 1F04 | C033 | 5F99 | 5D5E |
| 0000532420 | 00CB | 5706 | F88B | FB03 | 7F89 | 4F04 | 2D4F | 0016 |
| 0000532440 | 778D | C714 | FE05 | 89FF | 0A7F | 8948 | 8C04 | 8B1F |
| 0000532460 | 8CC6 | 8EDA | 8DC2 | 067F | ABFC | 47AB | 3347 | ABC0 |

THU MAR 14 17:31:54 1991 DB_PI.DLL PAGE 189, LINE 11093

| | | | | | | | | |
|---|---|---|---|---|---|---|---|---|
| 0000532500 | ABAB | 5FAB | C307 | 8B26 | 0245 | C00B | 0975 | 8C26 |
| 0000532520 | 025D | 8926 | EB1D | 0614 | C426 | 0875 | 8C26 | 0E5C |
| 0000532540 | 8926 | 0C5C | 478C | 8912 | 1077 | 2607 | 5D8C | 260A |
| 0000532560 | 5D89 | 2608 | 5D8C | 2606 | 5D89 | C304 | 8041 | FEE1 |
| 0000532600 | FC53 | 778B | 8B08 | 0A5F | FF33 | 23EB | C38B | A85B |
| 0000532620 | 7501 | 5342 | 778B | 8B06 | 085F | DE3B | 3674 | 334B |
| 0000532640 | EBFF | 900C | 546D | 3BFE | 73D3 | 03E1 | 72F0 | AD23 |
| 0000532660 | 01A8 | F074 | FE8B | 3B48 | 73C1 | 0323 | 72F0 | 8B13 |
| 0000532700 | ADD0 | 01A8 | DE74 | C203 | 0205 | 8B00 | 89F7 | FE44 |
| 0000532720 | E4EB | C08B | 8B5B | 0647 | 4789 | F908 | 19EB | 895B |
| 0000532740 | FE4C | 0974 | F903 | C12B | 8948 | 2B05 | 03F9 | 89F9 |
| 0000532760 | 087F | C68B | DA8C | C3F8 | 5751 | 47F6 | 0102 | 6674 |
| 0000533000 | B7E8 | 8B00 | 8BFE | A804 | 7401 | 2B03 | 49C8 | 4141 |
| 0000533020 | 778B | 0B04 | 74F6 | 034F | 73CE | 3309 | BAC0 | FFF0 |
| 0000533040 | 33E3 | 42EB | E2BB | 8E03 | 26C0 | 3CA1 | 3D35 | 2000 |
| 0000533060 | 1674 | 00BA | 3B80 | 72D0 | D106 | 75EA | EBF8 | 832C |
| 0000533100 | 08FA | 1D72 | E2D1 | C28B | 8B48 | 03D0 | 73C1 | 3302 |
| 0000533120 | F7C0 | 23D2 | 52C2 | 2EE8 | 5A00 | 0D73 | FA83 | 74F0 |
| 0000533140 | B805 | 0010 | E2EB | EBF9 | 8B1B | 2BD0 | 0457 | 4789 |
| 0000533160 | 8904 | 087F | 778B | 4A0A | 1489 | 0342 | C7F2 | FE04 |
| 0000533200 | 89FF | 0A77 | 595F | 8BC3 | F6D0 | 0247 | 7404 | 4A0F |
| 0000533220 | 778B | 4E04 | D63B | 0572 | 5739 | 73FE | 4218 | 1E50 |
| 0000533240 | 399A | 0000 | 0B00 | 75C0 | 8B0F | F6C2 | 0247 | 7404 |
| 0000533260 | 4A04 | 5789 | F8FE | 01EB | C3F9 | 8B57 | 0877 | 773B |
| 0000533300 | 750A | 8B03 | 0677 | 3DAD | FFFE | 0874 | FE8B | FE24 |
| 0000533320 | F003 | F2EB | 4F4F | F78B | C35F | D18B | C283 | 8027 |
| 0000533340 | F0E2 | 8B50 | 52C4 | 5016 | C033 | 9A50 | FFFF | 0000 |
| 0000533360 | 0B1F | 75C0 | 3314 | 26DB | 458B | 89CC | 0247 | C28B |
| 0000533400 | 0FE8 | E8FE | FE40 | EBFB | F901 | 00C3 | 8B55 | C4EC |
| 0000533420 | 065E | 8B26 | FE47 | FE24 | CB5D | 8B55 | 8BEC | 8BD7 |
| 0000533440 | 1EDE | 7EC4 | 3306 | B9C0 | FFFF | AEF2 | 758D | C4FF |
| 0000533460 | 0A7E | FFB9 | F2FF | F7AE | 2BD1 | 8CF9 | 8EC0 | 8ED8 |
| 0000533500 | 0846 | FE87 | 468B | F706 | 01C6 | 7400 | A402 | D149 |
| 0000533520 | F3E9 | 13A5 | F3C9 | 8BA4 | 8BF3 | 1FFA | C28C | CB5D |
| 0000533540 | 8B55 | 8BEC | 8BD7 | 1EDE | 76C5 | 8B0A | 8CFE | 8ED8 |
| 0000533560 | 33C0 | B9C0 | FFFF | AEF2 | D1F7 | 7EC4 | 8B06 | A8C7 |
| 0000533600 | 7401 | A402 | D149 | F3E9 | 13A5 | F3C9 | 8BA4 | 8BF3 |
| 0000533620 | 1FFA | C28C | CB5D | 8B55 | 8BEC | 8BD7 | 1EDE | 76C5 |
| 0000533640 | C406 | 0A7E | C033 | FFB9 | F2FF | F7AE | 2BD1 | F3F9 |
| 0000533660 | 74A6 | 1B05 | 1DC0 | FFFF | 8B1F | 8BF3 | 5DFA | 00CB |
| 0000533700 | 8B55 | 8BEC | C4D7 | 067E | C033 | FFB9 | F2FF | F7AE |
| 0000533720 | 49D1 | 8B91 | 5DFA | 00CB | 8B55 | 57EC | 1E56 | 7EC4 |
| 0000533740 | 8B06 | 33D7 | B9C0 | FFFF | AEF2 | 8B4F | 06F7 | 7EC4 |
| 0000533760 | 8B0A | 8BDF | 0E4E | AEF2 | 0175 | 2B41 | 0E4E | D9F7 |
| 0000534000 | FE8B | F38B | 1F06 | F307 | AAA4 | C28B | C28C | 5E1F |
| 0000534020 | 5D5F | 00CB | 8B55 | 57EC | 1E56 | 7EC4 | C506 | 0A76 |
| 0000534040 | DF8B | 4E8B | E30E | AC0C | C00A | 0374 | E2AA | 32F8 |
| 0000534060 | F3C0 | 8BAA | 8CC3 | 1FC2 | 5F5E | E58B | CB5D | 8B55 |
| 0000534100 | 57EC | 1E56 | 4E8B | E30E | 8B27 | C4D9 | 067E | F78B |
| 0000534120 | C033 | AEF2 | D9F7 | CB03 | FE8B | 76C5 | F30A | 8AA6 |
| 0000534140 | FF44 | C933 | 3A26 | FF45 | 0477 | 0474 | 4949 | D1F7 |
| 0000534160 | C18B | 5E1F | 8B5F | 5DE5 | 00CB | 65E9 | 0000 | 61E9 |
| 0000534200 | 0000 | 12C8 | 0000 | 5657 | 03EB | 46FF | C408 | 085E |
| 0000534220 | 8A26 | 9807 | D88B | 87F6 | 355D | 7508 | 6AED | 6A00 |
| 0000534240 | 0600 | 76FF | 9A08 | 27B0 | 28AB | C483 | 5004 | 76FF |
| 0000534260 | FF0A | 0876 | 468D | 50F0 | 599A | 5061 | 8324 | 0CC4 |
| 0000534300 | 0805 | 8B00 | 065E | FB8B | F08B | 0716 | 8E1E | A5DA |
| 0000534320 | A5A5 | 1FA5 | 5E89 | 8BEE | 8CC3 | 5ED2 | C95F | 06CA |
| 0000534340 | 9000 | 8B55 | 57EC | 1E56 | 76C5 | 3306 | 99C0 | DB33 |

THU MAR 14 17:31:54 1991 DB_PI.DLL PAGE 190, LINE 11152

| | | | | | | | | |
|---|---|---|---|---|---|---|---|---|
| 0000534360 | 3CAC | 7420 | 3CFB | 7409 | 50F7 | 2D3C | 0474 | 2B3C |
| 0000534400 | 0175 | 3CAC | 7739 | 2C1F | 7230 | D11B | D1E3 | 8BD2 |
| 0000534420 | 8BCB | D1FA | D1E3 | D1D2 | D1E3 | 03D2 | 13D9 | 03D7 |
| 0000534440 | 83D8 | 00D2 | DCEB | 3C58 | 932D | 0775 | D8F7 | D283 |
| 0000534460 | F700 | 1FDA | 5F5E | CB5D | 8B55 | 56EC | B357 | 8B01 |
| 0000534500 | 0C4E | 468B | 3306 | 83D2 | 0AF9 | 0175 | 1E99 | 7EC5 |
| 0000534520 | E908 | 159F | 08C8 | 0000 | 5EC4 | 260C | 478B | 2606 |
| 0000534540 | 578B | 8908 | F846 | 5689 | C4FA | 065E | C626 | 3007 |
| 0000534560 | 478D | 8901 | FC46 | 468C | EBFE | 9026 | 5EC4 | 26F8 |
| 0000534600 | 3F80 | 7400 | 260F | 078A | 5EC4 | 26FC | 0788 | 46FF |
| 0000534620 | EBF8 | 9008 | 5EC4 | 26FC | 07C6 | FF30 | FC46 | 4EFF |
| 0000534640 | 830A | 0A7E | 7F00 | C4D5 | FC5E | C626 | 0007 | 7E83 |
| 0000534660 | 000A | 1F7C | 5EC4 | 26F8 | 3F80 | 7C35 | EB16 | 9005 |
| 0000534700 | C626 | 3007 | 4EFF | C4FC | FC5E | 8026 | 393F | F074 |
| 0000534720 | FE26 | C407 | 065E | 8026 | 313F | 0A75 | 5EC4 | 260C |
| 0000534740 | 47FF | EB02 | 900F | C38B | C28C | 5240 | 5250 | 9A53 |
| 0000534760 | 2750 | 2898 | CBC9 | 8B55 | 8BEC | 0646 | 202D | C900 |
| 0000535000 | 90CB | 8B55 | 8BEC | 065E | 87F6 | 355D | 7402 | 8D05 |
| 0000535020 | E047 | 02EB | C38B | CBC9 | 04C8 | 0000 | A156 | 30D9 |
| 0000535040 | 168B | 30DB | 4689 | 89FC | FE56 | 0C6A | FFE8 | 8300 |
| 0000535060 | 02C4 | 468B | 0BFE | FC46 | 7674 | 468B | 0B08 | 0646 |
| 0000535100 | 6E74 | 76FF | FF08 | 0676 | B09A | 5827 | 832A | 04C4 |
| 0000535120 | F08B | 5EC4 | 26FC | 478B | 2602 | 070B | 5274 | FF26 |
| 0000535140 | 0277 | FF26 | 9A37 | 27B0 | 2A79 | C483 | 3B04 | 7EC6 |
| 0000535160 | C439 | FC5E | C426 | 261F | 3880 | 753D | 562D | 76FF |
| 0000535200 | FF08 | 0676 | 5306 | 2E9A | E228 | 8329 | 0AC4 | C00B |
| 0000535220 | 1875 | 0C6A | C1E8 | 8300 | 02C4 | 5EC4 | 26FC | D78B |
| 0000535240 | 8B26 | 0257 | C603 | EB40 | 9012 | 4683 | 04FC | A2EB |
| 0000535260 | 0C6A | A3E8 | 8300 | 02C4 | C02B | 5E99 | CBC9 | 8B55 |
| 0000535300 | 53EC | 8B51 | 0646 | 568B | 8B08 | 0C5E | FFB9 | D3FF |
| 0000535320 | D3EA | 2BEB | 0A46 | D31B | 5B59 | CA5D | 0008 | 8B55 |
| 0000535340 | 50EC | 468B | 0504 | 0014 | 4BEB | 8B55 | 50EC | 468B |
| 0000535360 | 0504 | 0014 | 69EB | 8B55 | 50EC | 468B | 0504 | 0114 |
| 0000535400 | 33EB | 8B55 | 50EC | 468B | 0504 | 0114 | 51EB | 8B55 |
| 0000535420 | 50EC | 468B | C104 | 02E0 | FF68 | 50FF | FF6A | FF6A |
| 0000535440 | FF9A | 00FF | 0B00 | 75C0 | 5829 | E58B | C35D | 8B55 |
| 0000535460 | 50EC | 468B | FF04 | 5E06 | C136 | 02E0 | 0968 | 502B |
| 0000535500 | FF6A | FF6A | FF9A | 00FF | 0B00 | 75C0 | 5805 | E58B |
| 0000535520 | C35D | 11B8 | E900 | D539 | 8B55 | 50EC | 468B | C104 |
| 0000535540 | 02E0 | 2D68 | 502B | FF9A | 00FF | 0B00 | 75C0 | FFE3 |
| 0000535560 | 5E0E | 5836 | E58B | C35D | 8B55 | FFEC | 0676 | ADE8 |
| 0000535600 | 83FF | 02C4 | E58B | CB5D | 8B55 | FFEC | 0676 | C7E8 |
| 0000535620 | 83FF | 02C4 | E58B | CB5D | 8B55 | 1EEC | 8B07 | 0E4E |
| 0000535640 | C90B | 3174 | C1F6 | 7501 | 8B2C | 0C56 | 468B | 8B0A |
| 0000535660 | 0BD8 | 75DA | 5112 | 3E9A | 3B24 | 592A | D88B | DA0B |
| 0000535700 | 1374 | D88B | EB43 | 0B0A | 74D2 | A80A | 7501 | 8B06 |
| 0000535720 | 03D8 | 73C1 | BA08 | 0016 | C033 | C1E9 | 6AD8 | 8BFF |
| 0000535740 | 52CC | 5653 | 0E57 | 0D68 | 162C | 5251 | 8B50 | 084E |
| 0000535760 | 568B | 8B06 | 1276 | 7E8B | 9A10 | FFFF | 0000 | 5E5F |
| 0000536000 | C00B | 1374 | F65B | 01C3 | 0A74 | 534B | 489A | A924 |
| 0000536020 | 832B | 04C4 | A0E9 | 83D8 | 04C4 | 5D58 | 56CB | 0E57 |
| 0000536040 | 6968 | 512C | E852 | 007E | 8E93 | 26C2 | 578B | 0B22 |
| 0000536060 | 74D2 | 5015 | 0653 | 2652 | 77FF | 9A20 | 2448 | 2BFF |
| 0000536100 | C483 | 0704 | 585B | D233 | 8926 | 2617 | 5789 | 2602 |
| 0000536120 | 5789 | 2608 | 5789 | 260A | 5789 | 2620 | 5789 | A822 |
| 0000536140 | 7401 | 4809 | 8C26 | 2257 | 8926 | 2047 | 0005 | 2602 |
| 0000536160 | 4789 | 3304 | E8ED | D4D4 | 55CB | EC8B | 01E8 | E8D6 |
| 0000536200 | 0024 | D88B | C28E | C033 | 8926 | 2607 | 4789 | 2602 |
| 0000536220 | 4789 | 2608 | 4789 | 260A | 47C7 | 0004 | 6A02 | 6A00 |

THU MAR 14 17:31:54 1991 DB_PI.DLL PAGE 191, LINE 11211

| | | | | | | | | |
|---|---|---|---|---|---|---|---|---|
| 0000536240 | 9A00 | 01F8 | 0000 | 068E | 2E92 | A126 | 0006 | 3B48 |
| 0000536260 | 6006 | 7736 | C107 | 06E0 | FFBA | C3FF | 5357 | 6A51 |
| 0000536300 | E80F | FE6A | C483 | 3B02 | 6006 | 7636 | 8B40 | 05D8 |
| 0000536320 | 0004 | FC25 | 8BFF | C1C8 | 06E0 | A9BA | 502C | 9A52 |
| 0000536340 | 2691 | 0000 | C00B | 3275 | 8B49 | 87F9 | 603E | 2B36 |
| 0000536360 | 51CF | C147 | 06E7 | E1C1 | 5705 | C28E | ABF3 | 595F |
| 0000536400 | C726 | 0445 | 0200 | C783 | E240 | 8BF5 | 6AC3 | E80F |
| 0000536420 | FE46 | C483 | 5902 | 5F5B | 9BEB | 10B8 | E900 | D371 |
| 0000536440 | 8B55 | 56EC | 8B57 | 0C5E | C38B | F62D | 9930 | 0CB9 |
| 0000536460 | F700 | 50F1 | E850 | FDA6 | C483 | 8B02 | 0A56 | D20B |
| 0000536500 | 547E | C44A | 067E | D20B | 5674 | 4F8B | E304 | 3B20 |
| 0000536520 | 76CA | 8B02 | 1ECA | 37C5 | 0AB4 | 9051 | AAAC | C43A |
| 0000536540 | FAE0 | 1F58 | 3789 | 3374 | 4729 | 2B04 | EBD0 | 06D7 |
| 0000536560 | 5253 | 531E | E80E | DD6E | C483 | 5A04 | 075B | FF3D |
| 0000536600 | 74FF | AA08 | 0A3C | 1874 | EB4A | 3BBB | 067E | 0674 |
| 0000536620 | 47F6 | 200A | 0A74 | C033 | EB99 | 2B0E | 29C1 | 0447 |
| 0000536640 | C033 | 8BAA | 0646 | 568B | 5B08 | E853 | FD3C | C483 |
| 0000536660 | 5F02 | 5D5E | 00CB | 04C8 | 0000 | 5657 | 76FF | FF08 |
| 0000536700 | 0676 | B09A | F227 | 832D | 04C4 | F88B | 468B | 2D0A |
| 0000536720 | 30F6 | 0CB9 | 9900 | F9F7 | 4689 | 50FC | FFE8 | 83FC |
| 0000536740 | 02C4 | 76FF | FF0C | 0A76 | F3E8 | 83DF | 04C4 | F08B |
| 0000536760 | 76FF | FF0C | 0A76 | 6A57 | FF01 | 0876 | 76FF | 9A06 |
| 0000537000 | 08F0 | 2C2E | C483 | 890C | FE46 | 76FF | FF0C | 0A76 |
| 0000537020 | E856 | E042 | C483 | FF06 | FC76 | CDE8 | 83FC | 02C4 |
| 0000537040 | 7E39 | 75FE | 2B05 | EBC0 | 9004 | FFB8 | 5EFF | C95F |
| 0000537060 | 90CB | 04C8 | 0000 | 468B | 2D06 | 30F6 | 0CB9 | 9900 |
| 0000537100 | F9F7 | 4689 | 50FE | 95E8 | 83FC | 02C4 | 76FF | FF0E |
| 0000537120 | 0C76 | 76FF | FF0A | 0876 | 76FF | 9A06 | 2E62 | 2E7F |
| 0000537140 | C483 | 890A | FC46 | 76FF | E8FE | FC7E | 468B | C9FC |
| 0000537160 | 90CB | 04C8 | 0000 | 8B56 | 0676 | 44F6 | 830A | 0C74 |
| 0000537200 | 7E83 | 020E | 067F | 7E83 | 000E | 167D | F69A | A104 |
| 0000537220 | 892E | FC46 | 5689 | C4FE | FC5E | C726 | 1607 | EB00 |
| 0000537240 | 9054 | 6480 | EF0A | 7E83 | 010E | 1575 | 561E | 2C9A |
| 0000537260 | B62F | 832E | 04C4 | 4601 | 110A | 0C56 | 46C7 | 000E |
| 0000537300 | 1E00 | 9A56 | 0ED4 | 2ED7 | C483 | F604 | 0A44 | 7480 |
| 0000537320 | 8004 | 0A64 | FFFC | 0E76 | 76FF | FF0C | 0A76 | 448A |
| 0000537340 | 2A0B | 50E4 | 989A | B51E | 832D | 08C4 | FF3D | 75FF |
| 0000537360 | 3B09 | 75D0 | B805 | FFFF | 02EB | C02B | C95E | 90CB |
| 0000537400 | 06C8 | 0000 | 468B | 2D06 | 30F6 | 0CB9 | 9900 | F9F7 |
| 0000537420 | 4689 | 50FE | C7E8 | 83FB | 02C4 | 76FF | FF08 | 0676 |
| 0000537440 | 2C9A | 5C2F | 832F | 04C4 | 4689 | 89FA | FC56 | 76FF |
| 0000537460 | E8FE | FBB6 | 468B | 8BFA | FC56 | CBC9 | 18C8 | 0000 |
| 0000537500 | 8B56 | 0676 | C68B | F62D | 0530 | 32D6 | 4689 | 8AF0 |
| 0000537520 | 0B44 | E42A | 4689 | 83F4 | 047C | 7D00 | C705 | 0444 |
| 0000537540 | 0000 | 016A | 006A | 006A | 9A50 | 1E98 | 2FEB | C483 |
| 0000537560 | 8908 | FC46 | 5689 | 0BFE | 7DD2 | B807 | FFFF | E999 |
| 0000537600 | 014F | 44F6 | 080A | 1E75 | 5E8B | F6F0 | 0107 | 1675 |
| 0000537620 | 448B | 99D4 | C88B | DA8B | 468B | 8BFC | FE56 | C12B |
| 0000537640 | D31B | 2CE9 | 9001 | 048B | 442B | 8906 | F646 | 44F6 |
| 0000537660 | 030A | 3E74 | 5E8B | F6F4 | D387 | 802E | 2474 | 448B |
| 0000537700 | 8B06 | 0854 | 4689 | 89EC | EE56 | 0FEB | 5EC4 | 26EC |
| 0000537720 | 3F80 | 750A | FF03 | F646 | 46FF | 8BEC | 3904 | EC46 |
| 0000537740 | EA72 | 468B | 0BFE | FC46 | 2475 | 468B | 2BF6 | E9D2 |
| 0000537760 | 00DF | 44F6 | 800A | EA75 | F69A | 3504 | 8930 | E846 |
| 0000540000 | 5689 | C4EA | E85E | C726 | 1607 | E900 | FF6D | 44F6 |
| 0000540020 | 010A | 0375 | ^EE9 | 8300 | 047C | 7500 | C709 | F646 |
| 0000540040 | 0000 | A0E9 | 9000 | 048B | 442B | 0306 | 0444 | 4689 |
| 0000540060 | 8BF2 | F45E | 87F6 | 2ED3 | 7480 | 6A7F | 6A02 | 6A00 |
| 0000540100 | 5300 | 989A | 8E1E | 8330 | 08C4 | 463B | 75FC | 3B41 |

THU MAR 14 17:31:54 1991 DB_PI.DLL PAGE 192, LINE 11270

| | | | | | | | | |
|---|---|---|---|---|---|---|---|---|
| 0000540120 | FE56 | 3C75 | 468B | 03F2 | 0644 | 4689 | 8BF8 | 0644 |
| 0000540140 | 548B | 8908 | EC46 | 5689 | EBEE | 9010 | 5EC4 | 26EC |
| 0000540160 | 3F80 | 750A | FF03 | F246 | 46FF | 8BEC | F846 | 4639 |
| 0000540200 | 72EC | 8BE9 | F05E | 07F6 | 7420 | FF2F | F246 | 2AEB |
| 0000540220 | 006A | 76FF | FFFE | FC76 | 76FF | 9AF4 | 1E98 | 2E4E |
| 0000540240 | C483 | 8B08 | F05E | 478B | 8902 | F246 | 5E8B | F6F4 |
| 0000540260 | D387 | 042E | 0474 | 8940 | F246 | 468B | 2BF2 | 29D2 |
| 0000540300 | FC46 | 5619 | 8BFE | FC46 | 568B | 03FE | F646 | D2B3 |
| 0000540320 | 5E00 | CBC9 | 02C8 | 0000 | 5657 | 768B | 8A06 | 0B44 |
| 0000540340 | E42A | F88B | C68B | F62D | B930 | 000C | F799 | 89F9 |
| 0000540360 | FE46 | E850 | F9E8 | C483 | 1E02 | 9A56 | 0ED4 | 3114 |
| 0000540400 | C483 | 8004 | D3A5 | FD2E | 6480 | CF0A | 44F6 | 800A |
| 0000540420 | 0874 | 448A | 240A | 88FC | 0A44 | 006A | 006A | 006A |
| 0000540440 | 9A57 | 1E98 | 2F13 | C483 | FF08 | FE76 | BBE8 | 83F9 |
| 0000540460 | 02C4 | 5F5E | CBC9 | 04C8 | 0000 | 5657 | 126A | EDE8 |
| 0000540500 | 83F9 | 02C4 | 06C6 | 5738 | 8B42 | 0646 | 568B | A308 |
| 0000540520 | 5734 | 1689 | 5736 | 2EBE | 8957 | 8904 | 0254 | 06C7 |
| 0000540540 | 5732 | 7FFF | 468D | 160E | FF50 | 0C76 | 76FF | 1E0A |
| 0000540560 | 9A56 | 17F6 | 3187 | C483 | 8B0C | FFF8 | 320E | 7857 |
| 0000540600 | C40F | 2E1E | FF57 | 2E06 | 2657 | 07C6 | EB00 | 900D |
| 0000540620 | 561E | 006A | 729A | EE0B | 8330 | 06C4 | 126A | B7E8 |
| 0000540640 | 83F9 | 02C4 | C78B | 5F5E | CBC9 | 04C8 | 0000 | 5657 |
| 0000540660 | 116A | 79E8 | 83F9 | 02C4 | 06C6 | 5744 | 8B49 | 0646 |
| 0000540700 | 568B | A308 | 5740 | 1689 | 5742 | 3ABE | 8957 | 8904 |
| 0000540720 | 0254 | 5052 | B09A | E127 | 8331 | 04C4 | 3EA3 | 8D57 |
| 0000540740 | 0E46 | 5016 | 76FF | FF0C | 0A76 | 681E | 573A | BC9A |
| 0000540760 | 640F | 8331 | 0CC4 | F88B | 116A | 5BE8 | 83F9 | 02C4 |
| 0000541000 | C78B | 5F5E | CBC9 | 8B55 | 6AEC | E809 | F920 | C483 |
| 0000541020 | FF02 | 0A76 | 76FF | FF08 | 0676 | E80E | 00UF | C483 |
| 0000541040 | 6A06 | E809 | F932 | C483 | 8B02 | 5DE5 | 55CB | EC8B |
| 0000541060 | 5756 | 8B1E | 0656 | F28B | 468B | 8B08 | 0A4E | D00B |
| 0000541100 | 5374 | 59E3 | DF8C | 2EBB | 5135 | 67E8 | 5901 | 5B72 |
| 0000541120 | 74FF | 51FE | 67E8 | 5900 | 0B72 | C68B | DA8C | 6480 |
| 0000541140 | FEFE | EB59 | 1E49 | 8E53 | 51DF | E80E | F226 | 5B59 |
| 0000541160 | 591F | E180 | 57FE | F88B | C20B | 7458 | 8E2B | FCC2 |
| 0000541200 | 5706 | 561E | E9D1 | A5F3 | D88E | E80E | F1D4 | C483 |
| 0000541220 | 5804 | EB5A | 5119 | E80E | F1FA | EB59 | 5011 | 0E56 |
| 0000541240 | BFE8 | 83F1 | 04C4 | 03EB | 13E8 | 3300 | 99C0 | 5F1F |
| 0000541260 | 5D5E | 00CB | F6EA | C731 | EA31 | 321D | 32A7 | 8B55 |
| 0000541300 | 83EC | 02EC | 5756 | C7FC | FE46 | 0000 | 7441 | 8005 |
| 0000541320 | FEE1 | 01EB | 4E49 | 8B4E | ADFE | 2450 | 89FE | 8B05 |
| 0000541340 | 3BD0 | 73D1 | 0368 | 72F0 | AD5A | 01A8 | 0874 | D003 |
| 0000541360 | 8942 | 4815 | EBE8 | FE3D | 75FF | F641 | 0247 | 7401 |
| 0000541400 | 8D3B | 0445 | C103 | 0773 | 46C7 | 01FE | 2B00 | FFC8 |
| 0000541420 | 3B05 | 087F | 0373 | 7F89 | 5208 | E856 | F2DA | 5A5E |
| 0000541440 | 1173 | 46C7 | 01FE | 8300 | 10F9 | 1072 | E9D1 | D183 |
| 0000541460 | EB00 | FFE6 | 8D0D | 0275 | C28B | A5EB | 01B8 | 4E00 |
| 0000541500 | EB4E | 5A23 | EBF9 | 4639 | 0346 | EBF1 | 8B19 | FE46 |
| 0000541520 | F78B | F374 | C00B | 0E75 | 0D89 | 4646 | F103 | E372 |
| 0000541540 | D12B | 894A | 4A14 | 9159 | 0125 | 8300 | FE25 | 0509 |
| 0000541560 | 578B | 3B08 | 73FA | 3B07 | 76F2 | 8903 | 087F | D9F7 |
| 0000541600 | 5E5F | E58B | C35D | 8B55 | 57EC | 468B | F706 | 0866 |
| 0000541620 | 0573 | C033 | EB99 | 501A | 3E9A | AC24 | 5932 | D88B |
| 0000541640 | DA0B | 0D74 | 8B50 | 8EF8 | 33C2 | 41C0 | E9D1 | ABF3 |
| 0000541660 | 5F58 | CB5D | 473B | 7506 | C505 | 045F | 19EB | 531E |
| 0000541700 | 1FC5 | 08EB | 1F5B | EBF9 | C50F | 0C5F | D98C | F4E3 |
| 0000541720 | C13B | F575 | C483 | F804 | 00C3 | 8B55 | FFEC | 0876 |
| 0000541740 | FF9A | 00FF | 8B00 | 5DE5 | 55CB | EC8B | EC83 | 5602 |
| 0000541760 | 8B57 | 0A5E | 468B | F706 | 8BE3 | 8BC8 | 8BFA | 0846 |

THU MAR 14 17:31:54 1991 DB_PI.DLL PAGE 193, LINE 11329

| | | | | | | | | |
|---|---|---|---|---|---|---|---|---|
| 0000542000 | E3F7 | C703 | D08B | C10B | 7074 | F633 | 478D | 83FF |
| 0000542020 | 02FA | 0477 | 0872 | 06E3 | C323 | 5E75 | 16EB | FA83 |
| 0000542040 | 7201 | 2311 | 74C3 | 330D | F7C0 | 8BF3 | 03F2 | 72CA |
| 0000542060 | BA49 | 0001 | 5152 | 468D | 16FE | 3350 | 50C0 | 9A50 |
| 0000542100 | FFFF | 0000 | C085 | 3275 | 468B | FCFE | FF33 | D98B |
| 0000542120 | D285 | 1674 | C08E | C033 | 00B9 | F380 | 40AB | BDB9 |
| 0000542140 | D32A | 8CE0 | 03C1 | 4AC1 | EA75 | CB8B | 06E3 | C08E |
| 0000542160 | C033 | AAF3 | 568B | 96FE | 03EB | C033 | 5F99 | 8B5E |
| 0000542200 | 5DE5 | 00CB | 8B55 | 56EC | 768B | 8B04 | B9C6 | 000A |
| 0000542220 | F799 | 04F9 | C430 | 065E | 46FF | 2606 | 0788 | C68B |
| 0000542240 | F799 | 80F9 | 30C2 | 5E8B | FF06 | 0646 | 8826 | 8B17 |
| 0000542260 | 0646 | C28C | C95E | 06C2 | 9000 | 12C8 | 0000 | E856 |
| 0000542300 | F7E4 | C28E | D88B | 5E89 | 8CF2 | F446 | 8B26 | 1A47 |
| 0000542320 | 0B26 | 1847 | 2E75 | 1A6A | 3E9A | 8B24 | 8333 | 02C4 |
| 0000542340 | 5EC4 | 26F2 | 4789 | 2618 | 5789 | 8B1A | 26C2 | 470B |
| 0000542360 | 7518 | C70B | EE46 | 5746 | 5E8C | EBF0 | 9015 | 8B26 |
| 0000542400 | 1847 | 08EB | 8B26 | 1847 | 8B26 | 1A57 | 4689 | 89EE |
| 0000542420 | F056 | 468B | 8BEE | F056 | 4689 | 89F6 | F856 | 5EC4 |
| 0000542440 | 2606 | 478B | 8B0C | D1C8 | 03E0 | 89C1 | FA46 | 8B26 |
| 0000542460 | 0847 | C88B | E0D1 | C103 | 4689 | C7FC | FE46 | 0000 |
| 0000542500 | 768B | 8BFE | FA5E | 808A | 36C2 | 5EC4 | 26EE | 0788 |
| 0000542520 | 5E8B | 8AFC | D880 | 8B36 | EE5E | 8826 | 0447 | 46FF |
| 0000542540 | FFFE | EE46 | 7E83 | 03FE | D67C | 5E8B | 83EE | EE46 |
| 0000542560 | 2604 | 07C6 | 8B20 | EE5E | 46FF | 26EE | 07C6 | 0620 |
| 0000542600 | 76FF | C4EE | 065E | FF26 | 0677 | F7E8 | 8EFE | 8BC2 |
| 0000542620 | 26D8 | 07C6 | 8D20 | 0147 | 5006 | 5EC4 | 2606 | 77FF |
| 0000542640 | E804 | FEE0 | C28E | D88B | C626 | 3A07 | 478D | 0601 |
| 0000542660 | C450 | 065E | FF26 | 0277 | C9E8 | 8EFE | 8BC2 | 26D8 |
| 0000542700 | 07C6 | 8D3A | 0147 | 5006 | 5EC4 | 2606 | 37FF | B3E8 |
| 0000542720 | 8EFE | 8BC2 | 26D8 | 07C6 | 8D20 | 0147 | 5006 | 5EC4 |
| 0000542740 | 2606 | 478B | B90A | 0064 | D88B | F799 | 05F9 | 0013 |
| 0000542760 | 8B50 | E8F3 | FE8E | 5052 | 64B9 | 8B00 | 99C6 | F9F7 |
| 0000543000 | E852 | FE80 | C28E | D88B | C626 | 0A07 | 8943 | EE5E |
| 0000543020 | 468C | 26F0 | 07C6 | 8B00 | F646 | 568B | 5EF8 | CBC9 |
| 0000543040 | 04C8 | 0000 | 76FF | FF08 | 0676 | 849A | 3038 | 8336 |
| 0000543060 | 04C4 | 5689 | 0BFE | 74D0 | FF0F | FE76 | 9A50 | 34AA |
| 0000543100 | 34CB | C483 | EB04 | 9004 | C02B | C999 | 90CB | 14C8 |
| 0000543120 | 0000 | 5657 | 5EC4 | 2606 | 7F81 | CE02 | 7712 | 720F |
| 0000543140 | 2607 | 3F81 | A600 | 0673 | C02B | E999 | 0222 | 35E8 |
| 0000543160 | 8EF6 | 8BC2 | 89D8 | F45E | 468C | 26F6 | 478B | 261E |
| 0000543200 | 470B | 751C | 6A2D | 9A12 | 243E | 36C3 | C483 | C402 |
| 0000543220 | F45E | 8926 | 1C47 | 8926 | 1E57 | C28B | 0B26 | 1C47 |
| 0000543240 | 0A75 | 46C7 | 96F8 | 8C36 | FA5E | 14EB | 8B26 | 1C47 |
| 0000543260 | 08EB | 8B26 | 1C47 | 8B26 | 1E57 | 4689 | 89F8 | FA56 |
| 0000543300 | E168 | 6801 | 3380 | 5EC4 | 2606 | 77FF | 2602 | 37FF |
| 0000543320 | 769A | E144 | 6A36 | 68FE | AE80 | E168 | 6801 | 3380 |
| 0000543340 | 5EC4 | 2606 | 77FF | 2602 | 37FF | F08B | FA8B | 169A |
| 0000543360 | 0744 | C437 | F85E | 8926 | 0A47 | 9940 | C233 | C22B |
| 0000543400 | F8C1 | 3302 | 2BC2 | 8BC2 | 8BCE | 6AF0 | 5600 | 4E89 |
| 0000543420 | 89EC | EE7E | 389A | A743 | 0337 | EC46 | D713 | 4689 |
| 0000543440 | 89FC | FE56 | 468E | 83FA | FE7E | 7D00 | 812D | FC46 |
| 0000543460 | 3380 | 5681 | E1FE | 8B01 | F85E | 8B26 | 0A47 | B940 |
| 0000543500 | 0004 | F799 | 0BF9 | 75D2 | 810A | FC46 | 5180 | 5683 |
| 0000543520 | 01FE | 264E | 4FFF | EB0A | 90CE | 5EC4 | 26F8 | 4781 |
| 0000543540 | B20A | 2607 | 478B | B90A | 0004 | D88B | F799 | 0BF9 |
| 0000543560 | 75D2 | 8B25 | B9C3 | 0064 | F799 | 0BF9 | 75D2 | 8B11 |
| 0000543600 | F85E | 8B26 | 0A47 | 90B9 | 9901 | F9F7 | D20B | 0875 |
| 0000543620 | 46C7 | 62F0 | EB36 | 9006 | 46C7 | 7CF0 | 8C36 | F25E |
| 0000543640 | 5E8B | 26F8 | 6F81 | 6C0A | 6A07 | 6801 | 5180 | 76FF |

THU MAR 14 17:31:54 1991 DB_PI.DLL PAGE 194, LINE 11388

| | | | | | | | | |
|---|---|---|---|---|---|---|---|---|
| 0000543660 | FFFE | FC76 | 9E9A | BD42 | C437 | F85E | 8926 | 0E47 |
| 0000543700 | 016A | 8068 | 8D51 | FC46 | 5016 | 5C9A | 1942 | C438 |
| 0000543720 | F85E | C726 | 0847 | 0001 | 07EB | 5EC4 | 26F8 | 47FF |
| 0000543740 | C408 | F85E | 8B26 | 0E47 | 8B26 | 085F | E3D1 | 7EC4 |
| 0000543760 | 26F0 | 0139 | E47C | 5EC4 | 26F8 | 4FFF | 2608 | 5F8B |
| 0000544000 | C408 | F87E | 8B26 | 0E45 | E3D1 | 7EC4 | 8BF0 | 26C8 |
| 0000544020 | 012B | 5EC4 | 26F8 | 4789 | 6A06 | 6800 | 0E10 | 76FF |
| 0000544040 | FFFE | FC76 | F98B | 9E9A | 3342 | C438 | F85E | 8926 |
| 0000544060 | 0447 | 006A | 3C6A | 006A | 1068 | 8D0E | FC46 | 5016 |
| 0000544100 | 5C9A | 4042 | 5238 | 8950 | EC46 | 5689 | 9AEE | 429E |
| 0000544120 | 3856 | 5EC4 | 26F8 | 4789 | 6A02 | 6A00 | FF3C | EE76 |
| 0000544140 | 76FF | 9AEC | 436A | 361D | 5EC4 | 26F8 | 0789 | 6926 |
| 0000544160 | 0A47 | 016D | C703 | C603 | CA2D | B963 | 0007 | D22B |
| 0000544200 | F1F7 | 8926 | 0C57 | C726 | 1047 | 0000 | C38B | C28C |
| 0000544220 | 5F5E | CBC9 | 08C8 | 0000 | 529A | AD39 | C438 | 065E |
| 0000544240 | 8B26 | 2607 | 578B | 2B02 | B406 | 1B36 | B616 | 8936 |
| 0000544260 | FC46 | 5689 | 8DFE | FC46 | 5016 | 3E9A | D036 | 8338 |
| 0000544300 | 04C4 | 4689 | 89F8 | FA56 | D00B | 0675 | C02B | EB99 |
| 0000544320 | 9044 | 3E83 | 36B8 | 7400 | FF36 | FA76 | 9A50 | 3A4C |
| 0000544340 | 38EA | C483 | 0B04 | 74C0 | 8126 | FC46 | 0E10 | 5683 |
| 0000544360 | 00FE | 468D | 16FC | 9A50 | 363E | 367A | C483 | 8E04 |
| 0000544400 | 8BC2 | 89D8 | F85E | 468C | 26FA | 47C7 | 0110 | 8B00 |
| 0000544420 | F846 | 568B | C9FA | 90CB | 8B55 | 83EC | 0CEC | 468D |
| 0000544440 | 16F4 | 9A50 | FFFF | 0000 | 00B4 | 468A | 50F6 | 468A |
| 0000544460 | 50F5 | 468A | 50F4 | 468A | 50F8 | 460A | 50F9 | 468B |
| 0000544500 | 2DFA | 07BC | 9A50 | 3B1A | 388B | C483 | 830C | 087E |
| 0000544520 | 7400 | C40A | 065E | 8926 | 0257 | 8926 | 8B07 | 5DE5 |
| 0000544540 | 00CB | 0B6A | C7E8 | 83F1 | 02C4 | 3E83 | 5760 | 7500 |
| 0000544560 | E807 | 0022 | 06FF | 5760 | 0B6A | DBE8 | 83F1 | 02C4 |
| 0000544600 | 90CB | 0B6A | A7E8 | 83F1 | 02C4 | 09E8 | 6A00 | E80B |
| 0000544620 | F1C6 | C483 | CB02 | 04C8 | 0000 | 1E56 | A868 | 9A36 |
| 0000544640 | 2A08 | 39BF | C483 | 8904 | FC46 | 5689 | 0BFE | 75D0 |
| 0000544660 | E903 | 00A4 | 5EC4 | 26FC | 3F80 | 7500 | E903 | 0098 |
| 0000544700 | 036A | 5006 | 36FF | 36BC | 36FF | 36BA | 049A | D628 |
| 0000544720 | 8339 | 0AC4 | 006A | 1068 | 830E | FC46 | FF03 | FE76 |
| 0000544740 | 76FF | 9AFC | 286E | 39E0 | C483 | 5204 | 9A50 | 4338 |
| 0000544760 | 3A2B | B4A3 | 8936 | B616 | 2B36 | 8EF6 | FE46 | 5E8B |
| 0000545000 | 26FC | 3880 | 7400 | 261A | 008A | C88B | 8B98 | F6D8 |
| 0000545020 | 5D87 | 0435 | 0575 | F980 | 752D | 4606 | FE83 | 7C03 |
| 0000545040 | 8BDD | FC5E | 8026 | 0038 | 1874 | 036A | DE03 | 5306 |
| 0000545060 | 36FF | 36C0 | 36FF | 36BE | 049A | 3828 | 8339 | 0AC4 |
| 0000545100 | 08EB | 1EC4 | 36BE | C626 | 0007 | 1EC4 | 36BE | 8026 |
| 0000545120 | 013F | C01B | A340 | 36B8 | C95E | 90C3 | 04C8 | 0000 |
| 0000545140 | C456 | 065E | 8326 | 087F | 7D03 | E903 | 00B6 | 8326 |
| 0000545160 | 087F | 7E09 | E903 | 00AC | 8326 | 087F | 7E03 | 260A |
| 0000545200 | 7F83 | 0908 | 037D | 81E9 | 2600 | 778B | 810A | 6CC6 |
| 0000545220 | 8107 | C2FE | 7E07 | 2617 | 7F83 | 0308 | 1075 | 8B26 |
| 0000545240 | 085F | E3D1 | 878B | 367C | 0705 | EB00 | 900B | 8B26 |
| 0000545260 | 085F | E3D1 | 878B | 367E | 4689 | F7FC | 03C6 | 7500 |
| 0000545300 | FF03 | FC46 | 5E8B | 2606 | 778B | 830A | 46EE | 448D |
| 0000545320 | 9901 | C233 | C22B | F8C1 | 3302 | 2BC2 | 69C2 | 6DCE |
| 0000545340 | 0301 | D3C1 | FC46 | 0405 | B900 | 0007 | F799 | 2BF9 |
| 0000545360 | FC56 | DAF7 | 8326 | 087F | 7503 | 2615 | 573B | 7C0E |
| 0000545400 | 7509 | 2621 | 7F83 | 0204 | 1A7C | 01B8 | EB00 | 9017 |
| 0000545420 | 5EC4 | 8B06 | 26C2 | 4739 | 7C0E | 75EF | 2607 | 7F83 |
| 0000545440 | 0104 | E67C | C02B | C95E | 90CB | 16C8 | 0000 | 5657 |
| 0000545460 | 768B | 6A06 | 6801 | 5180 | 448D | 9903 | C233 | C22B |
| 0000545500 | F8C1 | 3302 | 2BC2 | 99C2 | 5052 | 389A | 6C43 | 893B |
| 0000545520 | EA46 | 5689 | 8BEC | 085E | E3D1 | BF8B | 367A | C68B |

THU MAR 14 17:31:54 1991  DB_PI.DLL  PAGE 195, LINE 11447

| | | | | | | | | |
|---|---|---|---|---|---|---|---|---|
| 0000545540 | 04B9 | 9900 | F9F7 | D20B | 0775 | 7E83 | 0208 | 017E |
| 0000545560 | 8B47 | 0A46 | C703 | 4689 | 9AFC | 3952 | 3B8F | 006A |
| 0000545600 | 3C6A | 006A | 3C6A | 006A | 186A | C669 | 016D | 4603 |
| 0000545620 | 030A | 99C7 | 4405 | 830E | 00D2 | 5052 | 389A | A243 |
| 0000545640 | 8B3B | 8BC8 | 0C46 | DA8B | 0399 | 13C1 | 52D3 | 9A50 |
| 0000545660 | 4338 | 3BB5 | C88B | 468B | 8B0E | 99DA | C103 | D313 |
| 0000545700 | 5052 | 389A | F343 | 8B3B | 8BC8 | 1046 | DA8B | 0399 |
| 0000545720 | 13C1 | 03D3 | R406 | 1336 | B616 | 0136 | EA46 | 5611 |
| 0000545740 | 8DEC | 5044 | 4689 | 8BF8 | 0846 | 8948 | F646 | 468B |
| 0000545760 | 890C | F246 | 3E83 | 36B8 | 7400 | 8D1A | EE46 | 5016 |
| 0000546000 | 4C9A | 923A | 8339 | 04C4 | C00B | 0974 | 6E81 | 10EA |
| 0000546020 | 830E | EC5E | 8B00 | EA46 | 568B | 5EEC | C95F | 90CB |
| 0000546040 | 8B55 | 57EC | 7EC4 | 8B06 | 33DF | B9C0 | FFFF | AEF2 |
| 0000546060 | F741 | 8AD9 | 0A46 | FB8B | AEF2 | 264F | 0538 | 0474 |
| 0000546100 | FF33 | C78E | C78B | C28C | 8B5F | 5DE5 | 00CB | 8B55 |
| 0000546120 | 57EC | 7EC4 | 3306 | B9C0 | FFFF | AEF2 | F741 | 4FD9 |
| 0000546140 | 468A | FDDA | AEF2 | 2647 | 0538 | 0674 | C033 | D08B |
| 0000546160 | 04EB | C78B | C28C | 5FFC | E58B | CB5D | 8B55 | 83EC |
| 0000546200 | 20EC | 5756 | C51E | 0A76 | D08C | C08E | 10B9 | 3300 |
| 0000546220 | 8DC0 | E07E | ABF3 | 0AAC | 74C0 | 8B14 | 8BF8 | B0C8 |
| 0000546240 | 8001 | 07E1 | E0D2 | 03B1 | EFD3 | 4308 | EBE0 | C5E7 |
| 0000546260 | 0676 | FFBB | 43FF | 25AC | 00FF | 1474 | F88B | C88B |
| 0000546300 | 01B0 | E180 | D207 | B1E0 | D303 | 22EF | E043 | E575 |
| 0000546320 | 1F93 | 5E5F | E58B | CB5D | 8B55 | 57EC | 4E8B | E30C |
| 0000546340 | C42C | 067E | D78B | DAF7 | 0C74 | D12B | DB1B | D323 |
| 0000546360 | D103 | D187 | D12B | 468A | F20A | 74AE | 8715 | E3D1 |
| 0000546400 | 8C0C | 81C2 | 5FC2 | 8E09 | F2C2 | 74AE | 3305 | 99C0 |
| 0000546420 | 05EB | C28C | 458D | 5FFF | CB5D | 8B55 | 8BEC | 0E4E |
| 0000546440 | 571E | 0B56 | 75C9 | E903 | 00AF | 76C5 | C40A | 067E |
| 0000546460 | 561E | 5706 | AE9A | 3D2A | 8B3B | 0E4E | D20B | 5778 |
| 0000546500 | C12B | DA83 | 7300 | 4950 | F103 | 0773 | D88C | F505 |
| 0000546520 | 8E3C | 03D8 | 73F9 | 8C07 | 05C0 | 3D3F | C08E | 8B41 |
| 0000546540 | 48C1 | C72B | DB1B | C323 | C703 | C62B | DB1B | C323 |
| 0000546560 | C603 | 9140 | C12B | F3FD | FCA4 | E391 | 835C | FFFE |
| 0000546600 | 0775 | D88C | 4A2D | 8E3D | 83D8 | FFFF | D175 | C08C |
| 0000546620 | 752D | 8E3D | EBC0 | 8BC8 | 48C1 | D78B | D2F7 | C22B |
| 0000546640 | DB1B | C323 | C203 | D68B | D2F7 | C22B | DB1B | C323 |
| 0000546660 | C203 | 9140 | C12B | E9D1 | A5F3 | C913 | A4F3 | E391 |
| 0000546700 | 0B18 | 75F6 | 8C07 | 05D8 | 3D81 | D88E | FF0B | C775 |
| 0000546720 | C08C | B805 | 8E3D | EBC0 | 8BBE | 0646 | 568B | 5E08 |
| 0000546740 | 1F5F | CB5D | 8B55 | 33EC | 8BC0 | 0E4E | 4FE3 | 571E |
| 0000546760 | C556 | 0676 | 7EC4 | 8B0A | 48C1 | D78B | D2F7 | C22B |
| 0000547000 | DB1B | C323 | C203 | D68B | D2F7 | C22B | DB1B | C323 |
| 0000547020 | C203 | 9140 | C12B | A6F3 | 1B75 | E391 | 0B1D | 75F6 |
| 0000547040 | 8C07 | 05D8 | 3DC3 | D88E | FF0B | CB75 | C08C | 1405 |
| 0000547060 | 8E3E | EBC0 | 1BC2 | 1DC0 | FFFF | 5F5E | 5D1F | 00CB |
| 0000547100 | 8B55 | 8BEC | 0E4E | 571E | E356 | C548 | 0A76 | 7EC4 |
| 0000547120 | 8B06 | 48C1 | D78B | D2F7 | C22B | DB1B | C323 | C203 |
| 0000547140 | D68B | D2F7 | C22B | DB1B | C323 | C203 | 9140 | C12B |
| 0000547160 | E9D1 | A5F3 | C913 | A4F3 | E391 | 0B18 | 75F6 | 8C07 |
| 0000547200 | 05D8 | 3E1F | D88E | FF0B | C775 | C08C | 7205 | 8E3E |
| 0000547220 | EBC0 | 8BBE | 0646 | 568B | 5E08 | 1F5F | CB5D | 8B55 |
| 0000547240 | 8BEC | 0C4E | 38E3 | C457 | 067E | D78B | DAF7 | 0C74 |
| 0000547260 | D12B | DB1B | D323 | D103 | D187 | D12B | 468B | 8A0A |
| 0000547300 | D1E0 | F3E9 | 13AB | F3C9 | 87AA | E3D1 | 8C10 | 81C3 |
| 0000547320 | 7DC3 | 8E3E | D1C3 | F3E9 | 13AB | F3C9 | 5FAA | 468B |
| 0000547340 | 8B06 | 0856 | CB5D | 4E8B | 8B0E | 0646 | 568B | 1E08 |
| 0000547360 | 7EC5 | 570A | 071E | 93FC | C00A | 1374 | F983 | 750A |
| 0000547400 | 0B0E | 79D2 | B00A | AA2D | DBF7 | D283 | F700 | 8BDA |

THU MAR 14 17:31:54 1991 DB_PI.DLL PAGE 196, LINE 11506

| | | | | | | | | |
|---|---|---|---|---|---|---|---|---|
| 0000547420 | 92F7 | D233 | C00B | 0274 | F1F7 | F793 | 92F1 | D387 |
| 0000547440 | 3004 | 393C | 0276 | 2704 | 8BAA | 0BC2 | 75C3 | 88E2 |
| 0000547460 | 4F05 | 86AC | 8805 | FF44 | 448D | 3B01 | 72C7 | 8CF2 |
| 0000547500 | 58DA | 5F1F | 8B5E | 5DE5 | 00CB | 8B55 | 56EC | 8357 |
| 0000547520 | 0C7E | 7400 | 8B2A | 0A4E | 25E3 | 7449 | 8B22 | 087E |
| 0000547540 | 768B | 5106 | 5657 | 7603 | 1B0C | 25C0 | 3EC1 | F803 |
| 0000547560 | 5657 | 5EFF | 830E | 08C4 | 0B59 | 78CD | E208 | 5FE4 |
| 0000547600 | 8B5E | 5DE5 | 8BCB | 0A46 | 3348 | D1C9 | E0E8 | F7FC |
| 0000547620 | B8D9 | 0008 | E1F7 | 3072 | F08B | 209A | 2724 | 3B3D |
| 0000547640 | 72C6 | 5525 | FC8B | 468B | 480A | 66F7 | 030C | 0646 |
| 0000547660 | D283 | B900 | 344F | E2D3 | 5603 | 5208 | FF5D | 0876 |
| 0000547700 | 76FF | EB06 | 5D0C | B7EB | FCB8 | 0EFF | FBE8 | EBC2 |
| 0000547720 | 3BAE | 73E7 | 8BF0 | 8BEC | 025E | 768B | 3B00 | 065E |
| 0000547740 | 0C72 | 0577 | 763B | 7204 | 8305 | 08C4 | E3EB | EC83 |
| 0000547760 | 8B08 | 064E | 568B | 8904 | FE4E | 5689 | 36FC | 5503 |
| 0000550000 | 1B12 | 25C0 | 3F5C | C803 | 5E89 | 89FA | F876 | 5251 |
| 0000550020 | 0336 | 1275 | C01B | F425 | 033F | 3BD8 | 0476 | 0575 |
| 0000550040 | 5E3B | 7406 | 531F | 76FF | FF02 | 0076 | 5653 | FF36 |
| 0000550060 | 145D | C483 | 5B08 | C00B | 0A7F | D474 | 5E89 | 89FA |
| 0000550100 | F876 | CCEB | 595A | 5653 | F28B | 2B36 | 1275 | C01B |
| 0000550120 | 0725 | 2B40 | 51C8 | 5651 | 76FF | FF02 | 0076 | FF36 |
| 0000550140 | 145D | C483 | 5908 | C00B | 147F | 0874 | 4E89 | 89FE |
| 0000550160 | FC76 | D6EB | 763B | 7500 | 3BD1 | 024E | CC75 | D68B |
| 0000550200 | 5B5E | CB3B | 2672 | 0477 | D63B | 2076 | 8E1E | 8EDB |
| 0000550220 | 36C1 | 458B | 8712 | E8FA | 00A5 | FA87 | 891F | FE4E |
| 0000550240 | 5689 | 89FC | FA5E | 7689 | E9F8 | FF62 | 8B36 | 1245 |
| 0000550260 | C18E | FA87 | 561E | 76C5 | E800 | 0083 | 1F5E | FA87 |
| 0000550300 | 768B | 8B04 | 065E | 762B | 1BFC | 25C0 | 4041 | D82B |
| 0000550320 | 5E2B | 03FE | 0076 | C01B | BC25 | 0340 | 03D8 | 025E |
| 0000550340 | 762B | 1BF8 | 25C0 | 40C9 | D82B | 2C72 | 5E2B | 72FA |
| 0000550360 | 8B27 | 025E | 4E8B | 8B00 | FE46 | 4689 | 8B02 | FC46 |
| 0000550400 | 4689 | 8B00 | FA46 | 4689 | 8BFE | F846 | 4689 | 89FC |
| 0000550420 | FA5E | 4E89 | E9F8 | FEBD | 5E8B | 8B06 | 044E | 468B |
| 0000550440 | 89FA | 0646 | 468B | 89F8 | 0446 | 468B | 89FE | FA46 |
| 0000550460 | 468B | 89FC | F846 | 5E89 | 89FE | FC4E | 96E9 | 53FE |
| 0000550500 | D88B | C3F7 | 0001 | 0A74 | 8A4B | 2600 | 0186 | 0088 |
| 0000550520 | 0C74 | EB83 | 8B02 | 2600 | 0187 | 0089 | F475 | C35B |
| 0000550540 | C58B | EC8B | DA8C | 5EC5 | 8904 | 8907 | 027F | 7789 |
| 0000550560 | 8904 | 0667 | 4E8B | 8900 | 084F | 4E8B | 8902 | 0A4F |
| 0000550600 | 5789 | 8E0C | 8BDA | 33E8 | CBCD | EC8B | 468B | 0B08 |
| 0000550620 | 75C0 | 4001 | 5EC5 | 8B04 | 027F | 778B | 8B04 | 0667 |
| 0000550640 | EC8B | 4F8B | 8908 | 004E | 4F8B | 890A | 024E | 2F8B |
| 0000550660 | 5F8E | CB0C | 078A | E42A | 578D | 5301 | DC8B | 02B9 |
| 0000550700 | 5100 | 521E | 1650 | 9A53 | 23DE | 0000 | CB5B | EC83 |
| 0000550720 | 8B06 | 16C4 | 4050 | 1640 | 9A50 | FFFF | 0000 | 8358 |
| 0000550740 | 04C4 | 55CB | EC8B | 76FF | 9A06 | FFFF | 0000 | C00B |
| 0000550760 | FFB8 | 75FF | 4001 | CB5D | 5050 | 8B50 | 16C4 | 9A50 |
| 0000551000 | FFFF | 0000 | 5B58 | CB5B | 8B55 | FFEC | 0876 | 76FF |
| 0000551020 | FF06 | 0C76 | 76FF | 330A | 50C0 | 9A50 | FFFF | 0000 |
| 0000551040 | C00B | 0374 | 90E9 | 8BC2 | 5DE5 | 00CB | 8B55 | FFEC |
| 0000551060 | 0876 | 76FF | 3306 | 50C0 | 9A50 | FFFF | 0000 | C085 |
| 0000551100 | 0374 | 72E9 | 8BC2 | 5DE5 | 00CB | 8B55 | 1EEC | C553 |
| 0000551120 | 065E | 76FF | FF0C | 0A76 | 77FF | FF02 | 0E37 | E7E8 |
| 0000551140 | 8900 | 8907 | 0257 | 1F5B | CA5D | 0008 | 8B55 | 1EEC |
| 0000551160 | C553 | 065E | 76FF | FF0C | 0A76 | 77FF | FF02 | 0E37 |
| 0000551200 | F7E8 | 8900 | 0257 | 0789 | 1F5B | CA5D | 0008 | 8B55 |
| 0000551220 | 1EEC | C553 | 065E | 078B | 578B | 8B02 | 0A4E | E80E |
| 0000551240 | 0178 | 0789 | 5789 | 5B02 | 5D1F | 06CA | 0000 | 8B55 |
| 0000551260 | 57EC | 5356 | FF33 | 468B | 0B08 | 7DC0 | 4711 | 568B |

THU MAR 14 17:31:54 1991 DB_PI.DLL PAGE 197, LINE 11565

| | | | | | | | | |
|---|---|---|---|---|---|---|---|---|
| 0000551300 | F706 | F7D8 | 1DDA | 0000 | 4689 | 8908 | 0656 | 468B |
| 0000551320 | 0B0C | 7DC0 | 4711 | 568B | F70A | F7D8 | 1DDA | 0000 |
| 0000551340 | 4689 | 890C | 0A56 | C00B | 1575 | 4E8B | 8B0A | 0846 |
| 0000551360 | D233 | F1F7 | D88B | 468B | F706 | 8BF1 | EBD3 | 8B38 |
| 0000551400 | 8BD8 | 0A4E | 568B | 8B08 | 0646 | EBD1 | D9D1 | EAD1 |
| 0000551420 | D8D1 | DB0B | F475 | F1F7 | F08B | 66F7 | 910C | 468B |
| 0000551440 | F70A | 03E6 | 72D1 | 3B0C | 0856 | 0777 | 0672 | 463B |
| 0000551460 | 7606 | 4ED1 | D233 | 4F96 | 0775 | DAF7 | D8F7 | DA83 |
| 0000551500 | 5B00 | 5F5E | CA5D | 0008 | 8B55 | 8BEC | 0846 | 4E8B |
| 0000551520 | 0B0C | 8BC8 | 0A4E | 0975 | 468B | F706 | 5DE1 | 08CA |
| 0000551540 | 5300 | E1F7 | D88B | 468B | F706 | 0C66 | D803 | 468B |
| 0000551560 | F706 | 03E1 | 5BD3 | CA5D | 0008 | 8B55 | 53EC | 3357 |
| 0000551600 | 8BFF | 0846 | C00B | 117D | 8B47 | 0656 | D8F7 | DAF7 |
| 0000551620 | 001D | 8900 | 0846 | 5689 | 8B06 | 0C46 | C00B | 107D |
| 0000551640 | 568B | F70A | F7D8 | 1DDA | 0000 | 4689 | 890C | 0A56 |
| 0000551660 | C00B | 1875 | 4E8B | 8B0A | 0846 | D233 | F1F7 | 468B |
| 0000551700 | F706 | 8BF1 | 33C2 | 4FD2 | 4379 | 48EB | D88B | 4E8B |
| 0000551720 | 8B0A | 0856 | 468B | D106 | D1EB | D1D9 | D1EA | 0BD8 |
| 0000551740 | 75DB | F7F4 | 8BF1 | F7C8 | 0C66 | F791 | 0A66 | D103 |
| 0000551760 | 0C72 | 563B | 7708 | 7207 | 3B0B | 0646 | 0676 | 462B |
| 0000552000 | 1B0A | 0C56 | 462B | 1B06 | 0856 | 794F | F707 | F7DA |
| 0000552020 | 83D8 | 00DA | 5B5F | CA5D | 0008 | ED32 | 06E3 | E0Di |
| 0000552040 | D2D1 | FAE2 | 00CB | 8B55 | 53EC | 8B56 | 0C46 | C00B |
| 0000552060 | 1575 | 4E8B | 8B0A | 0846 | D233 | F1F7 | D88B | 468B |
| 0000552100 | F706 | 8BF1 | EBD3 | 8B38 | 8BC8 | 0A5E | 568B | 8B08 |
| 0000552120 | 0646 | E9D1 | DBD1 | EAD1 | D8D1 | C90B | F475 | F3F7 |
| 0000552140 | F08B | 66F7 | 910C | 468B | F70A | 03E6 | 72D1 | 3B0C |
| 0000552160 | 0856 | 0777 | 0672 | 463B | 7606 | 4ED1 | D233 | 5E96 |
| 0000552200 | 5D5B | 08CA | 0000 | 8B55 | 53EC | 468B | 0B0C | 75C0 |
| 0000552220 | 8B15 | 0A4E | 468B | 3308 | F7D2 | 8BF1 | 0646 | FIF7 |
| 0000552240 | C28B | D233 | 45EB | C88B | 5E8B | 8B0A | 0856 | 468B |
| 0000552260 | D106 | D1E9 | D1DB | D1EA | 0BD8 | 75C9 | F7F4 | 8BF3 |
| 0000552300 | F7C8 | 0C66 | F791 | 0A66 | D103 | 0C72 | 563B | 7708 |
| 0000552320 | 7207 | 3B0B | 0646 | 0676 | 462B | 1B0A | 0C56 | 462B |
| 0000552340 | 1B06 | 0856 | DAF7 | D8F7 | DA83 | 5B00 | CA5D | 0008 |
| 0000552360 | 831E | 03FB | 1677 | 0D74 | 2FE8 | 8E14 | C7D8 | 8606 |
| 0000552400 | 1601 | EB00 | A307 | 36FE | 1689 | 3700 | 1FF8 | A1CB |
| 0000552420 | 0186 | 162D | B300 | F60C | CBF3 | F38B | 08BF | 8C00 |
| 0000552440 | 8CC0 | 8ED9 | 8EC1 | FCD8 | A5A5 | D98E | 08BE | C300 |
| 0000552460 | F38B | 08BF | 8C00 | 8CC0 | 8ED9 | 8EC1 | FCD8 | A5A5 |
| 0000552500 | A5A5 | D98E | 08BE | C300 | 758B | 89FC | FC7D | 45C6 |
| 0000552520 | 07FE | 03EB | 758B | FCFC | C033 | 0C8B | 548B | F702 |
| 0000552540 | 80C2 | 747F | 8925 | D105 | D1FA | D1D9 | D1D8 | D1FA |
| 0000552560 | D1D9 | D1D8 | D1FA | D1D9 | 89D8 | 0245 | 4D89 | 8004 |
| 0000552600 | 8FE6 | C281 | 3800 | 5589 | C306 | 0589 | 4589 | 8902 |
| 0000552620 | 0445 | 4589 | C306 | 3E8B | 0186 | 8BFC | 8B0C | 0254 |
| 0000552640 | C033 | C2F7 | 7F80 | 2974 | FAD1 | D9D1 | D8D1 | FAD1 |
| 0000552660 | D9D1 | D8D1 | FAD1 | D9D1 | D8D1 | E680 | 818F | 00C2 |
| 0000552700 | C738 | 0005 | 8900 | 0245 | 4D89 | 8904 | 0655 | F78B |
| 0000552720 | 8BC3 | 8AC8 | EBD0 | 8BEA | 863E | FC01 | 8BAD | ADC8 |
| 0000552740 | C80A | D48A | 8AAD | 8AF0 | ADDC | F88A | E2D1 | D3D1 |
| 0000552760 | E2D1 | D3D1 | E2D1 | D3D1 | CD0A | 0374 | CA80 | B101 |
| 0000553000 | 0A80 | 8AF9 | 22EC | 25E9 | 7FF0 | E03D | 7747 | 2D3D |
| 0000553020 | 3800 | 3B72 | E0D1 | E0D1 | E0D1 | D13A | 0777 | 1572 |
| 0000553040 | C6F6 | 7401 | 8010 | 01C6 | D383 | 7300 | 0508 | 0080 |
| 0000553060 | 803D | 747F | 0B17 | 74C0 | 8016 | 7FE7 | C70A | E50A |
| 0000553100 | 4589 | 8A02 | 8AE3 | 89C6 | 8B05 | C3F7 | 71E9 | 331A |
| 0000553120 | 89C0 | 8905 | 0245 | F78B | 33C3 | 8BD2 | 8BDA | 8BD0 |
| 0000553140 | EBC3 | 8B1D | 33D0 | 0BDB | 79D2 | F715 | EBDA | 8B11 |

THU MAR 14 17:31:54 1991 DB_PI.DLL PAGE 198, LINE 11624

| | | | | | | | | |
|---|---|---|---|---|---|---|---|---|
| 0000553160 | 8BDA | 8BD0 | 0BC3 | 79C0 | F707 | F7DB | 83DA | 00DB |
| 0000553200 | C48A | 8024 | 9EB4 | 75E9 | 3304 | 8BD2 | 8BDA | 8BC8 |
| 0000553220 | EBC3 | 8B1D | 33C8 | 0BDB | 79C9 | F715 | EBD9 | 8B11 |
| 0000553240 | 8BDA | 8BC8 | 0BC3 | 79C0 | F707 | F7DB | 83D9 | 00DB |
| 0000553260 | C48A | 8024 | FF33 | D233 | 60BD | E985 | 07B6 | 3AE8 |
| 0000553300 | EB00 | E80D | 002B | 08EB | 35E8 | EB00 | E803 | 0026 |
| 0000553320 | C0D1 | D283 | 7500 | D167 | C3C8 | 9CE8 | EB00 | E80D |
| 0000553340 | 003E | 08EB | 5DE8 | EB00 | E803 | 0039 | D20B | 4E75 |
| 0000553360 | E8C3 | 002C | 0DEB | 2CE8 | EB00 | E808 | 007B | 03EB |
| 0000553400 | 41E8 | 3300 | 0BC9 | 79FF | F70D | F7D1 | F7D2 | F5D8 |
| 0000553420 | D283 | 8300 | 00D1 | C2D1 | D183 | 7500 | D121 | C3CA |
| 0000553440 | 56E8 | EB00 | E803 | 001C | DB33 | 01B5 | E822 | CD0A |
| 0000553460 | F980 | F581 | DB13 | C313 | D283 | 7200 | C301 | 7FE9 |
| 0000553500 | E919 | 00A4 | 92AD | D60A | 93AD | 91AD | 91AD | EE83 |
| 0000553520 | 8B08 | B6F9 | 220F | 80F1 | 10CE | E580 | D17F | D1E9 |
| 0000553540 | D1E9 | D1E9 | 0BE9 | 74C9 | 81D8 | FEE9 | 7203 | 8378 |
| 0000553560 | 20F9 | CA7F | E983 | EB25 | 332F | 8AD2 | ACDA | F88A |
| 0000553600 | 8AAD | ACC8 | C186 | EE83 | 8A04 | 8BE9 | 83F9 | 7FE1 |
| 0000553620 | E4D0 | D1D0 | D0F9 | 0BDC | 74C9 | 804D | 7EE9 | 4772 |
| 0000553640 | F983 | 7F20 | 8399 | 20E9 | D9F7 | F980 | 7C08 | 801A |
| 0000553660 | 01FA | D0F5 | 80D2 | 01E2 | D30A | DF8A | F88A | C48A |
| 0000553700 | E68A | F632 | E980 | EB08 | E3E1 | 8015 | 01FA | 01B2 |
| 0000553720 | DA80 | D000 | D1EE | D1D8 | D0DB | 80DA | 00D2 | F3E2 |
| 0000553740 | CA8A | D08B | C38B | F9C3 | 00B1 | D180 | 3300 | 8BC0 |
| 0000553760 | C3D0 | CBE9 | E818 | 0068 | 07B0 | 31E8 | 8B01 | 8636 |
| 0000554000 | 0301 | 067C | EF83 | 8B10 | 80D7 | 7FE6 | FA81 | 7FF0 |
| 0000554020 | E073 | 7C89 | 8B06 | C3FE | A5E9 | E818 | 0087 | 03B0 |
| 0000554040 | 0BE8 | 8B01 | 8636 | 0301 | 027C | EF81 | 0080 | D78B |
| 0000554060 | E680 | 817F | 80FA | 737F | 89DF | 027C | FE8B | E8C3 |
| 0000554100 | 001E | 368B | 0186 | EF83 | 0110 | 067C | FE8B | E8C3 |
| 0000554120 | 0053 | 368B | 0186 | EF81 | 0080 | 7C01 | 8B02 | C3FE |
| 0000554140 | 8BFC | 863E | 8C01 | 8CC0 | 8ED9 | A5C1 | A5A5 | 8EA5 |
| 0000554160 | 8BC0 | 8636 | BA01 | 0010 | 4C8B | 8B06 | 83F9 | 0FE1 |
| 0000554200 | CA0A | 4C89 | 8306 | F0E7 | CF8B | E580 | B87F | 0035 |
| 0000554220 | E9D1 | E9D1 | E9D1 | E9D1 | E981 | 0433 | 047D | D9F7 |
| 0000554240 | 3FEB | 82E9 | FC00 | 3E8B | 0186 | C08C | D98C | C18E |
| 0000554260 | A5A5 | C08E | 368B | 0186 | 80BA | 8B00 | 024C | F98B |
| 0000554300 | E183 | 0A7F | 89CA | 024C | E783 | 8B80 | 80CF | 7FE5 |
| 0000554320 | 18B8 | D100 | 8AE1 | 32CD | 81ED | 96E9 | 7D00 | F748 |
| 0000554340 | 3BD9 | 8BC8 | 7CEF | 8114 | 00E7 | 0B80 | 3BFA | 74C8 |
| 0000554360 | 8B0A | 8BC8 | 81EF | 00E5 | 2B80 | 33EA | 80D2 | 08F9 |
| 0000554400 | 147C | FA80 | F501 | 00B2 | D280 | DA00 | C614 | 0004 |
| 0000554420 | E980 | 4608 | E7EB | 348A | 0CE3 | 88BB | 8A01 | D7C1 |
| 0000554440 | EE8A | E822 | 2C88 | 33C3 | 8BC9 | 8AD1 | C334 | 01BB |
| 0000554460 | 8A00 | 8AEF | E3E1 | D106 | D0EA | E2D7 | 0AFA | 22D7 |
| 0000554500 | 0ADE | 80D3 | 81FA | 01B2 | DA80 | 7400 | 8B02 | 8AFD |
| 0000554520 | D3CC | 8BE2 | 860E | 9801 | C803 | CE2B | F202 | 3488 |
| 0000554540 | 06E3 | 8046 | 0014 | FAE2 | 00C3 | C3F7 | 7F80 | 4C74 |
| 0000554560 | D3D1 | C3F5 | 57E9 | 8017 | 7FCC | E4D0 | 8BC3 | 0244 |
| 0000554600 | 8B26 | 025D | 80A9 | 747F | F7E1 | A9D0 | 7F80 | D0F7 |
| 0000554620 | E274 | D3F7 | C3F7 | 7F80 | D3F7 | D874 | EC8A | EF32 |
| 0000554640 | D578 | E3D1 | E0D1 | 0B73 | 8793 | 8CF7 | 8CC2 | 8ED9 |
| 0000554660 | 8EC1 | 3BDA | 75C3 | 8B05 | 2604 | 053B | F7C3 | F0C3 |
| 0000554700 | 747F | D15E | F5D3 | E9C3 | 1704 | CC80 | D07F | C3E4 |
| 0000554720 | 448B | 2606 | 5D8B | A906 | 7FF0 | E174 | D0F7 | F0A9 |
| 0000554740 | F77F | 74D0 | F7E2 | F7D3 | F0C3 | F77F | 74D3 | 8AD8 |
| 0000554760 | 32EC | 78EF | D1D5 | D1E3 | 73E0 | 930B | F787 | C28C |
| 0000555000 | D98C | C18E | DA8E | C33B | 1775 | 448B | 2604 | 453B |
| 0000555020 | 7504 | 8B0E | 0244 | 3B26 | 0245 | 0575 | 048B | 3B26 |

THU MAR 14 17:31:54 1991 DB_PI.DLL PAGE 199, LINE 11683

| | | | | | | | | |
|---|---|---|---|---|---|---|---|---|
| 0000555040 | C305 | F787 | 458B | 8002 | 80F4 | 03EB | 458B | 8B02 |
| 0000555060 | 015D | 358A | 00B2 | CF80 | 8B80 | 024C | 7C8B | 8BFF |
| 0000555100 | 0174 | E781 | FF00 | CE81 | 8000 | C1D1 | C0D1 | ED0A |
| 0000555120 | 6574 | E40A | 5B74 | EC3A | 0573 | F387 | FA87 | 2A91 |
| 0000555140 | F6E5 | 80DC | 18FC | 4977 | C9D0 | E8D0 | D9D0 | 8A91 |
| 0000555160 | B5CD | E300 | 8055 | 0EF9 | 127C | D20B | 0374 | CB80 |
| 0000555200 | 8B01 | 33D3 | 80DB | 10E9 | 1D72 | 3E74 | F980 | 7E05 |
| 0000555220 | 0A2B | 74D2 | 8003 | 01CE | D68A | F38A | DF8A | FD8A |
| 0000555240 | E980 | 7708 | 7417 | D123 | D1E2 | FED3 | 75C1 | EBF8 |
| 0000555260 | 8B19 | 8BDE | 8BD7 | D0C1 | E9E8 | 0097 | C2F6 | 743F |
| 0000555300 | 8003 | 20CA | EBD1 | DAD1 | FAE2 | C2F6 | 743F | 8003 |
| 0000555320 | 20CA | E0D0 | 1470 | D703 | DE13 | 5073 | DBD1 | DAD1 |
| 0000555340 | C4FE | FC80 | 75FF | E945 | 15D6 | FA2B | F31B | D78B |
| 0000555360 | DE8B | 0A73 | D3F7 | DAF7 | 83F5 | 00D3 | D0F6 | DB0B |
| 0000555400 | 0B75 | EC80 | 7610 | 876A | 0BDA | 74DB | 0A64 | 75FF |
| 0000555420 | 800F | 08EC | 5B76 | FB8A | DE8A | F28A | D232 | FF0A |
| 0000555440 | 0A78 | CCFE | 4B74 | E2D1 | D3D1 | F671 | 3E80 | 0190 |
| 0000555460 | 7400 | E903 | 017C | FA80 | 7780 | 7207 | F614 | 01C6 |
| 0000555500 | 0F74 | C680 | 8301 | 00D3 | 0773 | C4FE | FC80 | 74FF |
| 0000555520 | D03A | D1E0 | A9D8 | 7F80 | 1774 | 8024 | E780 | 0A7F |
| 0000555540 | 8BC7 | 863E | 8901 | 0245 | E38A | C68A | 0589 | F78B |
| 0000555560 | 80C3 | 903E | 0001 | 0374 | 7EE9 | 3301 | 8BC0 | 863E |
| 0000555600 | 8901 | 0245 | 0589 | F78B | 79C3 | E9E6 | 1532 | ADFC |
| 0000555620 | 348B | D196 | D0E0 | 0AD8 | 74E4 | 8BD6 | 024D | E1D1 |
| 0000555640 | D9D0 | ED0A | CB74 | 3D8B | D88B | C132 | EC80 | 8080 |
| 0000555660 | 7FED | E502 | D370 | C480 | 8080 | FFFC | CD74 | 3250 |
| 0000555700 | 8AFF | 80EF | 80CB | C980 | 8B80 | 8BEB | F7C6 | 8BE7 |
| 0000555720 | 0BDA | 9FC0 | 8B50 | F7C5 | 03E7 | 83D8 | 00D2 | FA8B |
| 0000555740 | C18B | E6F7 | D803 | FA13 | 9E58 | 0374 | CB80 | 8B01 |
| 0000555760 | F6C5 | 03E1 | 8BC7 | 93D3 | 0A58 | 78FF | D10B | D1E2 |
| 0000556000 | 0AD3 | 75E4 | E90A | FF69 | C4FE | FC80 | 74FF | E9AD |
| 0000556020 | FF1A | F787 | 4D8B | D102 | D0E1 | 8BD9 | 0244 | E0D1 |
| 0000556040 | D8D0 | ED0A | 5C74 | E40A | DB74 | C132 | EC80 | 8081 |
| 0000556060 | 7FED | E52A | 0371 | 7BE9 | 80FF | 80C4 | FC80 | 75FF |
| 0000556100 | E903 | FF78 | 5D8B | 8A01 | 322D | 80C9 | 80CF | 3E80 |
| 0000556120 | 0190 | 7400 | D108 | D1EB | 02D9 | 903E | 5001 | 548B |
| 0000556140 | 8A01 | 3224 | 80C0 | 80CE | EAD1 | D8D1 | 1AE8 | 8B00 |
| 0000556160 | E8EE | 0011 | C20B | D68B | 0374 | CA80 | 8B01 | E9DD |
| 0000556200 | FF76 | 42E9 | 3B14 | 73D3 | F71D | 96F3 | C033 | 15E3 |
| 0000556220 | FA8B | C68B | E1F7 | D8F7 | FA1B | D78B | 0773 | 034E |
| 0000556240 | 13C1 | 73D3 | C3F9 | FFBE | 2BFF | 03C1 | 8BD0 | 73C1 |
| 0000556260 | C3ED | 06C6 | 0190 | 8A00 | 922E | 0A01 | 74ED | 8007 |
| 0000556300 | 0EED | EC3A | 3C77 | E40A | 3874 | 36FF | 0186 | 06C7 |
| 0000556320 | 0186 | 0193 | 5350 | 3352 | 32D2 | E8DB | FE4E | 5B5A |
| 0000556340 | C758 | 8606 | 9701 | 5001 | 5253 | FF32 | 0FE8 | 5AFE |
| 0000556360 | 585B | 068F | 0186 | 33E9 | 33FE | 33C0 | 33DB | A2D2 |
| 0000556400 | 0190 | 36FF | 0186 | 06C7 | 0186 | 0197 | 5350 | E852 |
| 0000556420 | FE1A | C033 | 93A3 | A301 | 0195 | D3EB | F787 | 6D8B |
| 0000556440 | 8106 | 00F5 | EB80 | 8B1D | 8BF7 | 863E | A501 | A5A5 |
| 0000556460 | 80AD | 7FE4 | E680 | 0A80 | ABE6 | 368B | 0186 | FE8B |
| 0000556500 | 8BC3 | 066D | 8BFC | 0644 | E5D1 | DED0 | E0D1 | DAD0 |
| 0000556520 | E025 | 74FF | 83D2 | E0E5 | E83B | 0977 | F787 | 8695 |
| 0000556540 | 0BD6 | 74C0 | 2BC2 | F7C5 | 3DD8 | 06A0 | B977 | E6D0 |
| 0000556560 | DDD1 | E2D0 | DDD1 | D157 | D1C0 | D1C0 | 86C0 | 8BE0 |
| 0000556600 | ACF8 | E08A | C032 | AD92 | AD91 | AD93 | E480 | 800F |
| 0000556620 | 10CC | FF0B | 6374 | FF83 | 7C0E | 0B18 | 74D2 | 8003 |
| 0000556640 | 01C9 | D18B | CB8B | D88B | C033 | EF83 | 7710 | 74E7 |
| 0000556660 | 7248 | 8323 | 06FF | 2B7C | D20A | 0374 | CE80 | 8A01 |
| 0000556700 | 8AD6 | 8AF1 | 8ACD | 8AEB | 8ADF | 8AF8 | 32C4 | 83E4 |

THU MAR 14 17:31:54 1991 DB_PI.DLL PAGE 200, LINE 11742

| | | | | | | | | |
|---|---|---|---|---|---|---|---|---|
| 0000556720 | 08EF | 0F77 | 2374 | E2D1 | D1D1 | D3D1 | D0D1 | 7547 |
| 0000556740 | EBF5 | 8716 | F6CF | 3FC2 | 0374 | CA80 | D120 | D1E8 |
| 0000556760 | D1DB | D1DF | E2DA | 87F6 | 5ECF | F697 | 3FC2 | 0374 |
| 0000557000 | CA80 | D120 | 70E5 | D13B | D0E5 | 02D8 | 1334 | 014C |
| 0000557020 | 5C13 | 5003 | 509F | 748B | 8105 | FFE6 | 810F | 00CE |
| 0000557040 | 5810 | 589E | FE13 | C7F7 | 2000 | 1374 | DFD1 | DBD1 |
| 0000557060 | D9D1 | DAD1 | C583 | 8320 | E0FD | 0375 | 81E9 | E912 |
| 0000557100 | 0087 | E5D1 | D8D0 | D0F6 | 342A | 4C1B | 1B01 | 035C |
| 0000557120 | 748B | 9F05 | E681 | 0FFF | CE81 | 1000 | 1B9E | 73FE |
| 0000557140 | 3313 | F6F6 | F7D0 | F7D7 | F7D3 | F7D1 | F5DA | CE13 |
| 0000557160 | DE13 | FE13 | BEFC | 0004 | FF0B | 1875 | C7F6 | 75E0 |
| 0000557200 | 8113 | 00ED | 7602 | 4E40 | 3D74 | FB8B | D98B | CA8B |
| 0000557220 | D233 | E4EB | C7F7 | 1FE0 | 1875 | ED81 | 0100 | 2776 |
| 0000557240 | 8A97 | 8AE0 | 8AC7 | 8AFB | 8ADD | 8AE9 | 8ACE | B2F2 |
| 0000557260 | 9700 | C7F7 | 1000 | 1175 | ED83 | 7420 | D170 | D1E2 |
| 0000557300 | D1D1 | D1D3 | EBD7 | EBEB | FC64 | 3E80 | 01A8 | 7400 |
| 0000557320 | E903 | 0385 | FA80 | 7780 | 7207 | F61F | 01C6 | 1A74 |
| 0000557340 | C680 | 8301 | 00D1 | D383 | 8300 | 00D7 | C7F7 | 2000 |
| 0000557360 | 0874 | C583 | 8320 | E0FD | 3074 | F78B | 3E8B | 0186 |
| 0000557400 | DE87 | 8024 | E780 | D10F | 74ED | 8622 | 32E0 | 0BC0 |
| 0000557420 | 0AC5 | 89C7 | 0645 | 5D8B | 8A05 | AAC6 | C18B | 8BAB |
| 0000557440 | ABC6 | EF83 | 8B05 | C3F7 | 0379 | 93E9 | FC11 | 3E80 |
| 0000557460 | 01A8 | 7400 | E903 | 0377 | C033 | 3E8B | 0186 | F78B |
| 0000557500 | ABAB | ABAB | FE8B | FCC3 | 448B | 8B06 | 25D0 | 7FF0 |
| 0000557520 | DB74 | 4D8B | 3306 | 81D1 | F0E1 | 747F | D1D0 | D1E0 |
| 0000557540 | 2DE1 | 8000 | E981 | 7FE0 | C103 | BC70 | 0005 | 3D80 |
| 0000557560 | FFE0 | B674 | E6D0 | D8D1 | E850 | 0181 | 0374 | CA80 |
| 0000557600 | 5D01 | E5D1 | D8D0 | C7F7 | 1000 | 0E75 | E2D1 | D1D1 |
| 0000557620 | D3D1 | D7D1 | ED0B | 0A75 | 93EB | C583 | 8320 | E0FD |
| 0000557640 | 8874 | 24E9 | E9FF | 111F | F787 | 8BFC | 064D | D18B |
| 0000557660 | E181 | 7FF0 | EF74 | 448B | 3306 | 25D0 | 7FF0 | 9B74 |
| 0000557700 | E0D1 | E1D1 | 202D | 8180 | E0E9 | 2B7F | 70C1 | 059B |
| 0000557720 | 8000 | E03D | 74FF | D09B | D1E6 | 50D8 | 8AAC | 32E8 |
| 0000557740 | ADC9 | AD93 | AD92 | E480 | 800F | 10CC | 5092 | F78B |
| 0000557760 | C683 | BF05 | 01A6 | ADFD | E480 | 800F | 10CC | A5AB |
| 0000560000 | 46A5 | A447 | C6FC | 0005 | 3E80 | 01A8 | 7400 | FD1F |
| 0000560020 | A6BF | 8B01 | ADF7 | E88B | E8D1 | 2602 | 01A8 | D1AB |
| 0000560040 | ADED | D8D1 | ADAB | D8D1 | ADAB | D8D1 | FCAB | D158 |
| 0000560060 | D1EA | D1D8 | D1DB | E8D9 | 003F | E857 | 003B | E857 |
| 0000560100 | 0037 | E857 | 0033 | C30B | C10B | C20B | D78B | 5B59 |
| 0000560120 | 745F | 8003 | 01CA | C2F6 | 7407 | 8003 | 08CA | EFD1 |
| 0000560140 | DBD1 | D9D1 | DAD1 | EFD1 | DBD1 | D9D1 | DAD1 | EFD1 |
| 0000560160 | DBD1 | D9D1 | DAD1 | 08E9 | 8BFF | A636 | 3301 | 3BFF |
| 0000560200 | 73D6 | 0B5C | 75D2 | 3B04 | 77F0 | F73B | 52F6 | 3397 |
| 0000560220 | 8BED | A1F5 | 01A0 | C00B | 0474 | E7F7 | F28B | A150 |
| 0000560240 | 01A2 | C00B | 0674 | E7F7 | F003 | EA13 | A4A1 | 0B01 |
| 0000560260 | 74C0 | F708 | 03E7 | 83E8 | 00D2 | 5A92 | DAF7 | CE1B |
| 0000560300 | DD1B | 1B5D | 95E8 | 9192 | 7393 | 4F13 | 0E03 | 01A0 |
| 0000560320 | 1E13 | 01A2 | 0613 | 01A4 | 1613 | 01A6 | ED73 | 4FC3 |
| 0000560340 | 0E2B | 01A0 | 1E1B | 01A2 | 061B | 01A4 | 0E03 | 01A2 |
| 0000560360 | 1E13 | 01A4 | C213 | 168B | 01A0 | EBF5 | 8AC9 | 0644 |
| 0000560400 | E432 | 0F24 | 100C | 9CA3 | 8A01 | 0645 | 0F24 | 100C |
| 0000560420 | 9EA3 | 3301 | 8BDB | 8BEB | E30C | 911A | 0D8B | 08E3 |
| 0000560440 | E1F7 | E88B | CA8B | 048B | 558B | 0B02 | 74D2 | F706 |
| 0000560460 | 03E2 | 13C8 | 55DA | ED33 | 448B | 0B02 | 74C0 | 8B0E |
| 0000560500 | 0B15 | 74D2 | F708 | 03E2 | 13C8 | D1DA | 58D5 | C10B |
| 0000560520 | 8B50 | 0244 | C00B | 0D74 | 558B | 0B02 | 74D2 | F706 |
| 0000560540 | 03E2 | 13D8 | 33EA | 8BC9 | 0B04 | 74C0 | 8B0F | 0455 |
| 0000560560 | D20B | 0874 | E2F7 | D803 | EA13 | D1D1 | 448B | 0B04 |

THU MAR 14 17:31:54 1991 DB_PI.DLL PAGE 201, LINE 11801

| | | | | | | | | |
|---|---|---|---|---|---|---|---|---|
| 0000560600 | 74C0 | 8B0F | 0B15 | 74D2 | F709 | 03E2 | 13D8 | 83EA |
| 0000560620 | 00D1 | 0B58 | 50C3 | 048B | C00B | 0874 | 26F7 | 019E |
| 0000560640 | E803 | CA13 | 058B | C00B | 0874 | 26F7 | 019C | E803 |
| 0000560660 | CA13 | DB33 | 448B | 0B02 | 74C0 | 8B0F | 0455 | D20B |
| 0000560700 | 0874 | E2F7 | E803 | CA13 | D3D1 | 448B | 0B04 | 74C0 |
| 0000560720 | 8B10 | 0255 | D20B | 0974 | E2F7 | E803 | CA13 | D383 |
| 0000560740 | 5500 | ED33 | 458B | 0B02 | 74C0 | F708 | 9C26 | 0301 |
| 0000560760 | 13C8 | 8BDA | 0244 | C00B | 0874 | 26F7 | 019E | C803 |
| 0000561000 | DA13 | 448B | 0B04 | 74C0 | 8B1A | 0455 | D20B | 0B74 |
| 0000561020 | E2F7 | C803 | DA13 | D5D1 | 448B | F704 | 9E26 | 0301 |
| 0000561040 | 13D8 | 8BEA | 0445 | C00B | 0874 | 26F7 | 019C | D803 |
| 0000561060 | EA13 | 9CA0 | F601 | 9E26 | 0301 | 97C5 | D15A | D1E2 |
| 0000561100 | D1D1 | D1D3 | D1D7 | D1E2 | D1D1 | D1D3 | D1D7 | D1E2 |
| 0000561120 | D1D1 | D1D3 | 5ED7 | F60B | C6C3 | A806 | 0001 | 368B |
| 0000561140 | 01A9 | F60B | 0874 | EE81 | 04C0 | F53B | 5077 | ED0B |
| 0000561160 | 4C74 | 36FF | 0186 | 06C7 | 0186 | 01AB | 5150 | 5352 |
| 0000561200 | 5755 | DB33 | C933 | D233 | 3EE8 | 5FFC | 5B5D | 595A |
| 0000561220 | C758 | 8606 | B301 | 5001 | 5251 | 5553 | 3357 | E8FF |
| 0000561240 | FBD2 | 5D5F | 5A5B | 5859 | 068F | 0186 | 1AE9 | 33FC |
| 0000561260 | 33C0 | 33C9 | 33D2 | 33DB | 33ED | A2FF | 01A8 | 36FF |
| 0000561300 | 0186 | 06C7 | 0186 | 01B3 | 5150 | 5352 | 5755 | F8E8 |
| 0000561320 | BFFB | 01AB | C033 | ABAB | ABAB | C6EB | 5653 | 648A |
| 0000561340 | 2E09 | 478A | 2509 | 8080 | C43A | 1675 | C683 | 830A |
| 0000561360 | 0AC3 | 05B9 | 8300 | 02EE | EB83 | 8B02 | 2E04 | 073B |
| 0000561400 | F3E1 | 5B5E | 56C3 | 95AD | 92AD | 93AD | 33AD | B9FF |
| 0000561420 | 0005 | E8D1 | DBD1 | DAD1 | DDD1 | DFD1 | F4E2 | E3D1 |
| 0000561440 | D0D1 | 013D | F500 | DBD1 | FE2D | 5E03 | 3C89 | 6C89 |
| 0000561460 | 8902 | 0454 | 5C89 | 8906 | 0844 | 66C3 | FFFC | FFFF |
| 0000561500 | FFFF | 00FF | CD00 | CCCC | CCCC | CCCC | FDCC | BEFF |
| 0000561520 | 01C8 | 04C6 | C601 | 0144 | 3330 | 8BC0 | 40D0 | 075B |
| 0000561540 | C31F | E81E | 05C4 | C08E | FC50 | BCBF | 5701 | 04B9 |
| 0000561560 | F300 | 5EA5 | D88E | 4C8B | 8006 | 0764 | B37F | F720 |
| 0000561600 | F0C1 | 747F | 0B06 | 79C9 | B302 | 532D | 76E8 | 33FF |
| 0000561620 | BEFF | 01C3 | A8AC | 7480 | 8AB6 | ADF8 | FE05 | 8B3F |
| 0000561640 | BAC8 | 4D10 | E2F7 | B091 | F64D | 03E4 | 13C8 | B0D7 |
| 0000561660 | F69A | 03E7 | 13C8 | 81FA | F4E9 | 8112 | 43DF | 5713 |
| 0000561700 | DFF7 | BCBE | E801 | 053D | 2BBB | E853 | FF0E | 725F |
| 0000561720 | 4709 | BB57 | 5335 | C6E8 | 5F03 | AD57 | AD97 | AD95 |
| 0000561740 | AD92 | AD93 | F791 | 8BD9 | 33F7 | E3C0 | D10C | D1EB |
| 0000561760 | D1DA | D1DD | D0DE | E2DC | 80F4 | 56C4 | D681 | 039A |
| 0000562000 | E913 | D113 | D913 | C9BF | B901 | 0010 | C032 | 5351 |
| 0000562020 | 5552 | 5056 | E4D0 | D6D1 | D5D1 | D2D1 | D3D1 | D0D0 |
| 0000562040 | E4D0 | D6D1 | D5D1 | D2D1 | D3D1 | D0D0 | 0259 | 59E5 |
| 0000562060 | F113 | 1359 | 59E9 | D113 | 1359 | 14D9 | D000 | D1E4 |
| 0000562100 | D1D6 | D1D5 | D1D2 | D0D3 | 04D0 | AA30 | E259 | 4FBD |
| 000056212D | B049 | FD30 | AEF3 | 83FC | 12C1 | C8BE | 8801 | B80C |
| 0000562140 | 0001 | 5B5A | 1F07 | 58C3 | C980 | 8030 | 40C9 | D78B |
| 0000562160 | FF33 | EF8B | 9FE8 | 3301 | E9DB | 00C6 | 1E39 | 01E8 |
| 0000562200 | DB33 | 26E8 | 7202 | 8BE1 | E8F8 | 021F | E072 | 8B50 |
| 0000562220 | F7C7 | E826 | 8B01 | 8BF8 | 8BEA | F7C3 | E82E | 0B01 |
| 0000562240 | 75D2 | 03C4 | 8BC5 | 72D8 | 58BE | F803 | D383 | 7300 |
| 0000562260 | EBD8 | 50B5 | 5153 | E852 | 0470 | D88E | C08E | 595A |
| 0000562300 | 585B | 89FC | DE3E | 0301 | 89CE | E0DE | A301 | 01EA |
| 0000562320 | 1689 | 01EC | C033 | E4A3 | A301 | 01E2 | E6A3 | 9101 |
| 0000562340 | 585A | A258 | 01DA | A258 | 01DB | E852 | 01AD | 0375 |
| 0000562360 | CD80 | 0B80 | 75DB | E885 | 00E7 | DB33 | FDE8 | 7401 |
| 0000562400 | 4E41 | 443C | 1C74 | 453C | 1274 | 3E80 | 01DB | 7400 |
| 0000562420 | 3C31 | 742B | 3C06 | 742D | 7502 | 4E27 | C981 | 0402 |
| 0000562440 | 03EB | C980 | C70E | EA06 | 0001 | 4600 | 6CE8 | 9F01 |

THU MAR 14 17:31:54 1991 DB_PI.DLL PAGE 202, LINE 11860

| | | | | | | | | |
|---|---|---|---|---|---|---|---|---|
| 0000562460 | E850 | 008P | C5F6 | 7502 | 8003 | 40C9 | 9E58 | 0275 |
| 0000562500 | DBF7 | 3E8B | 01EA | FF0B | 0675 | C1F7 | 1872 | 0374 |
| 0000562520 | C980 | 0330 | 03FB | E63E | F601 | 10C5 | 0475 | 3E2B |
| 0000562540 | 01EC | FF81 | 0190 | 507F | 5156 | F2BE | E801 | 0395 |
| 0000562560 | 3E8B | 01DE | 06C6 | 01FC | E800 | 01AD | 5E59 | 3875 |
| 0000562600 | EEA1 | 8B01 | F01E | F601 | 80C5 | 1374 | D3F7 | D8F7 |
| 0000562620 | 83F5 | 00D3 | 45F7 | F006 | 747F | 8004 | 074D | 8380 |
| 0000562640 | E43E | 0701 | 0376 | C980 | 8A08 | FC2E | 8301 | E43E |
| 0000562660 | 0001 | 0375 | CD80 | C302 | C980 | C301 | FFBB | C63F |
| 0000562700 | E806 | 0A01 | E4E8 | 7200 | 8117 | CCFB | 770C | 80ED |
| 0000562720 | 02CD | E3D1 | C303 | E3D1 | E3D1 | D803 | DE78 | DFEB |
| 0000562740 | 33C3 | 8BFF | 8BEF | 8BDF | E8D7 | 00D6 | 2872 | E850 |
| 0000562760 | 008A | 0358 | 83D0 | 00D3 | D583 | 8300 | 00D7 | FF81 |
| 0000563000 | 1999 | E572 | BBE8 | 7200 | 0A0D | 74C0 | 8003 | 01CA |
| 0000563020 | 06FF | 01E6 | EEEB | C78B | C50B | 060B | 01E6 | 1675 |
| 0000563040 | C7F6 | 7480 | F617 | 80C5 | 0F74 | FB81 | 8000 | 0975 |
| 0000563060 | D20B | 0575 | 06EB | C980 | 8010 | 20C9 | 1689 | 01EE |
| 0000563100 | 1E89 | 01F0 | C78B | C50B | C30B | C20B | 1C74 | FF81 |
| 0000563120 | 1999 | 0973 | 25E8 | FF00 | E60E | EB01 | B8F1 | 0040 |
| 0000563140 | FF0B | 0678 | E848 | 002A | F6EB | 8B56 | BFF7 | 01F2 |
| 0000563160 | AB92 | AB93 | AB95 | AB96 | AB92 | C35E | 5557 | 8B53 |
| 0000563200 | E8C2 | 000E | 0BE8 | 0300 | 58D0 | D813 | 1358 | 58E8 |
| 0000563220 | F813 | E2D1 | D3D1 | D5D1 | D7D1 | E8C3 | 005E | 0874 |
| 0000563240 | 2D3C | 0674 | 2B3C | 0175 | 4E46 | E8C3 | 004E | 4A74 |
| 0000563260 | 302C | 4572 | 093C | 027E | 072C | 063A | 01E8 | 397D |
| 0000563300 | 1DEB | 37E8 | 7400 | 3C33 | 742E | 2C20 | 7230 | 3C2A |
| 0000563320 | 7709 | F626 | 10C5 | 0E74 | 0EFF | 01E6 | CD80 | FF08 |
| 0000563340 | E406 | 3201 | C3E4 | CD80 | EB20 | F6F4 | 10C5 | 0975 |
| 0000563360 | 06FF | 01E2 | CD80 | EB10 | 4EC9 | C3F9 | 363B | 01E0 |
| 0000563400 | 2473 | AC36 | 3E80 | 01DA | 7400 | 3CJ0 | 7420 | 3CED |
| 0000563420 | 7409 | 3CE9 | 740A | 3CE5 | 740D | 3CE1 | 7261 | 3C06 |
| 0000563440 | 777A | 2402 | C35F | C032 | 57C3 | 92AD | 91AD | 95AD |
| 0000563460 | 8BAD | 0BF8 | 0BC5 | 0BC1 | 74C2 | AD49 | FE05 | 7803 |
| 0000563500 | D13E | D1E7 | D1E8 | BBDF | 0005 | E2D1 | D1D1 | D5D1 |
| 0000563520 | D7D1 | D0D1 | D7D0 | CBFE | F075 | 2243 | 0AD9 | 33D3 |
| 0000563540 | 81F6 | 01FA | F580 | CE13 | EE13 | FE13 | C613 | D780 |
| 0000563560 | A900 | FFF0 | 0E74 | F03D | F57F | D780 | EB00 | 800F |
| 0000563600 | FC0E | 0101 | C033 | D88B | C88B | E88B | F88B | F78B |
| 0000563620 | 895F | 890D | 026D | 7589 | 8904 | 0645 | FF0A | BDC3 |
| 0000563640 | 01FE | 08B9 | 8B00 | 33FD | F3C0 | 2EAB | 478B | 0108 |
| 0000563660 | 0844 | 07BF | B800 | C004 | C72B | E022 | C42A | C42A |
| 0000563700 | D8F6 | 0404 | 8B98 | 53C8 | 2B56 | 2BD9 | 83DF | 08C3 |
| 0000563720 | F103 | F72B | C683 | 8B06 | 2E04 | 27F7 | 013E | 0046 |
| 0000563740 | 113E | 0256 | 833E | 0456 | 8300 | 02EE | C383 | E202 |
| 0000563760 | 5EE6 | 835B | 02C5 | 754F | 83BC | 0EED | F587 | 91AD |
| 0000564000 | 0BAD | ADC8 | C80B | CD0A | 92AD | D10A | 97AD | 91AD |
| 0000564020 | 93AD | 8BAD | 0BF5 | 78C0 | FF0D | 084C | E2D1 | D7D1 |
| 0000564040 | D1D1 | D3D1 | D0D1 | 01BD | 2300 | 0BEF | 33D5 | 81ED |
| 0000564060 | 01FA | F580 | FD13 | CD13 | DD13 | C513 | D5D1 | 6C01 |
| 0000564100 | D108 | 0BCD | 89C5 | 893C | 024C | 5C89 | 8904 | 0644 |
| 0000564120 | 00C3 | 0000 | 0000 | 0000 | 04A0 | 0000 | 0000 | 0000 |
| 0000564140 | 0000 | 07C8 | 0000 | 0000 | 0000 | 4000 | 0E9C | 0000 |
| 0000564160 | 0000 | 0000 | BC20 | 1BBE | 0000 | 0000 | BF04 | 1BC9 |
| 0000564200 | 368E | 9E00 | 70B5 | A82B | C5AD | 6B9D | D500 | CFA6 |
| 0000564220 | 49FF | 781F | D5C2 | E000 | E98C | C980 | BA47 | AA93 |
| 0000564240 | 8E01 | F9DE | FB9D | 7EEB | 53AA | CD03 | CCCC | CCCC |
| 0000564260 | CCCC | FDCC | 0AFF | A3D7 | 3D70 | D70A | FAA3 | 2CFF |
| 0000564300 | 1965 | 58E2 | B717 | F3D1 | FDFF | 61CE | 1184 | CC77 |
| 0000564320 | E6AB | 5BFF | 4DE1 | BEC4 | 9594 | CBE6 | BAFF | 3994 |

THU MAR 14 17:31:54 1991 DB_PI.DLL PAGE 203, LINE 11919

| | | | | | | | | |
|---|---|---|---|---|---|---|---|---|
| 0000564340 | AD45 | B11E | 96CF | A5FF | 39E9 | 27A5 | 7FEA | 2CA5 |
| 0000564360 | A1FF | BCE4 | 7C64 | D046 | 57DD | 3AFE | 7A19 | 2563 |
| 0000564400 | 3143 | AEC0 | BBFC | 5841 | FF0B | 0579 | 9BBB | F758 |
| 0000564420 | 83DF | 0AEB | C383 | 0B0A | 74FF | D10D | 73EF | 53F5 |
| 0000564440 | E857 | FE7B | 5B5F | ECEB | 00C3 | 02C8 | 0000 | 061E |
| 0000564460 | 15B8 | 8E26 | E8D8 | D36E | C28E | D88B | 8B26 | 0647 |
| 0000564500 | C00B | 3275 | 3A68 | 1602 | 468D | 50FE | 006A | DC9A |
| 0000564520 | 0026 | 0B00 | 75C0 | 8B23 | FE46 | 8926 | 0647 | 561E |
| 0000564540 | 8E57 | 33C0 | B8FF | FFFF | D88E | F633 | 3AB9 | F302 |
| 0000564560 | 8CA4 | 5FC0 | 1F5E | 1F07 | C3C9 | 46C7 | 00FE | EB00 |
| 0000564600 | 00F5 | 5756 | D88C | C08E | 02BE | BF37 | 353E | 0AB9 |
| 0000564620 | F300 | 5FA5 | CB5E | D08C | C08E | 04EB | D88C | C08E |
| 0000564640 | 531E | 85E8 | 5BFF | D88E | 5756 | F38B | 1E8B | 0186 |
| 0000564660 | C383 | 8B0C | 8CFB | 8CC0 | 8ED9 | 8EC1 | FCD8 | A5A5 |
| 0000564700 | D98E | F38B | FB81 | 0172 | 4374 | 1E89 | 0186 | 7789 |
| 0000564720 | C6FC | FE47 | 5F03 | 1F5E | 8CCB | 8ED0 | EBC0 | 8C04 |
| 0000564740 | 8ED8 | 1EC0 | E853 | FF42 | 8E5B | 56D8 | 8B57 | 8BF3 |
| 0000564760 | 861E | 8301 | 0CC3 | FB8B | C08C | D98C | C18E | D88E |
| 0000565000 | A5FC | A5A5 | 8EA5 | 8BD9 | 81F3 | 72FB | 7401 | 890F |
| 0000565020 | 861E | C601 | FE47 | 8907 | FC77 | 5E5F | CB1F | B4E9 |
| 0000565040 | 1E06 | E853 | FF04 | 8E5B | 56D8 | 8C57 | EBD0 | 1E0E |
| 0000565060 | 1E07 | E853 | FEF4 | 8E5B | 56D8 | 8C57 | 8CC0 | 8ED9 |
| 0000565100 | 8EC1 | FCD8 | F38B | 1E8B | 0186 | C383 | 8B0C | ADFB |
| 0000565120 | 4588 | A5FE | 3CA5 | 7403 | A502 | 81A5 | 72FB | 7401 |
| 0000565140 | 89BD | 861E | 8901 | FC5F | D98E | 5E5F | CB1F | D08C |
| 0000565160 | C08E | 8B26 | 2607 | 578B | EB02 | 8C14 | 8ED0 | 26C0 |
| 0000565200 | 078B | EB99 | 8B0A | 8B07 | 0257 | 03EB | 078B | 1E99 |
| 0000565220 | 5250 | E853 | FE94 | 8E5B | 5AD8 | 5658 | 8B57 | 8BDA |
| 0000565240 | 8AD0 | 24C7 | 7980 | F707 | F7DB | 83DA | 00DB | 3E8B |
| 0000565260 | 0186 | C783 | 810C | 72FF | 7401 | 891D | 863E | 8901 |
| 0000565300 | FC7D | D98C | C18E | FF80 | 7500 | C610 | FE45 | B403 |
| 0000565320 | E89E | F02A | 5E5F | CB1F | 43E9 | C6FF | FE45 | 5507 |
| 0000565340 | 60BD | 8B87 | 33CB | 8BDB | E8FB | F388 | 5F5D | 1F5E |
| 0000565360 | 1ECB | E853 | FE34 | 8E5B | 56D8 | 8C57 | 8ED8 | 8BC0 |
| 0000565400 | 863E | 8B01 | FC75 | 458A | 83FE | 0CC7 | FF81 | 0172 |
| 0000565420 | A774 | 3E89 | 0186 | 7D89 | 88FC | FE45 | A5FC | 3CA5 |
| 0000565440 | 7403 | A502 | 5FA5 | 1F5E | 1ECB | E853 | FDFC | 8E5B |
| 0000565460 | 56D8 | 8B57 | 863E | 8301 | 0CC7 | FF81 | 0172 | 9874 |
| 0000565500 | 3E89 | 0186 | 7D89 | C6FC | FE45 | 8C03 | 8ED8 | 33C0 |
| 0000565520 | FCC0 | ABAB | 5E5F | CB1F | D08C | 02EB | D88C | C08E |
| 0000565540 | 531E | C5E8 | 5BFD | D88E | 5756 | FB8B | 8BFC | 861E |
| 0000565560 | 8301 | 8606 | 0C01 | 19EB | D08C | 02EB | D88C | C08E |
| 0000565600 | 531E | A5E8 | 5BFD | D88E | 5756 | FB8B | 8BFC | 861E |
| 0000565620 | 8001 | FE7F | 7503 | 8B0E | FC77 | A5A5 | 2E83 | 0186 |
| 0000565640 | 5F0C | 1F5E | 55CB | 2689 | 022E | 778B | 57FC | 26E8 |
| 0000565660 | 5FEA | DE8B | EB5D | 8CE3 | EBD0 | 8C02 | 8ED8 | 1EC0 |
| 0000565700 | E853 | FD66 | 8E5B | 56D8 | 8B57 | FCFB | 1E8B | 0186 |
| 0000565720 | 0683 | 0186 | EB0C | 8C19 | EBD0 | 8C02 | 8ED8 | 1EC0 |
| 0000565740 | E853 | FD46 | 8E5B | 56D8 | 8B57 | FCFB | 1E8B | 0186 |
| 0000565760 | 7F80 | 07FE | 1075 | 778B | A5FC | A5A5 | 83A5 | 862E |
| 0000566000 | 0C01 | 5E5F | CB1F | DF87 | 3DE8 | 8BE9 | 87F7 | EBDF |
| 0000566020 | 8CE8 | EBD0 | 8C02 | 8ED8 | 1EC0 | E853 | FD0C | 8E5B |
| 0000566040 | 56D8 | 8B57 | 8BFB | 861E | 8301 | 8606 | 0C01 | 18EB |
| 0000566060 | D08C | 02EB | D88C | C08E | 531E | EDE8 | 5BFC | D88E |
| 0000566100 | 5756 | FB8B | 1E8B | 0186 | F38B | 478A | 83FE | 862E |
| 0000566120 | 0C01 | ABFC | A5A5 | 033C | 0274 | A5A5 | 5E5F | CB1F |
| 0000566140 | B3B8 | BA46 | 46BD | 4BEB | E1B8 | BA46 | 46E6 | 43EB |
| 0000566160 | E19A | 8D5C | 9F3F | 2688 | 022C | 72B8 | BA5C | 5C77 |
| 0000566200 | 31EB | 9BE8 | EBEA | E80D | EA9B | 08EB | EAE8 | EBEA |

THU MAR 14 17:31:54 1991 DB_PI.DLL PAGE 204, LINE 11978

| | | | | | | | | |
|---|---|---|---|---|---|---|---|---|
| 0000566220 | E803 | EAB0 | 8A50 | 2C26 | 9E02 | 7358 | F707 | 83D8 |
| 0000566240 | 00D2 | DAF7 | 9AC3 | 5CE1 | 5C63 | 8A9F | B8FC | 5C7C |
| 0000566260 | 81BA | 1E5C | 5350 | 5251 | E853 | FC6E | 8E5B | 5AD8 |
| 0000566300 | 5B59 | 5658 | 8857 | 2C3E | 5502 | 2689 | 022E | 5153 |
| 0000566320 | 368B | 0186 | EE83 | 890C | 8636 | 8001 | 0A7C | 8B03 |
| 0000566340 | 0874 | 0475 | D0FF | 02EB | D2FF | 5B59 | 5F5D | 1F5E |
| 0000566360 | 1ECB | E853 | FC34 | 8E5B | 57D8 | 3E8B | 0186 | 5D8A |
| 0000566400 | 32FE | F6FF | 7F01 | 1475 | FB80 | 7403 | F609 | FF41 |
| 0000566420 | 75F0 | 5F09 | CB1F | 41F6 | 80FF | F774 | 01F6 | 5F80 |
| 0000566440 | 751F | 0B03 | CBE4 | CBF9 | 531E | FDE8 | 5BFB | D88E |
| 0000566460 | 8B57 | 863E | 8A01 | FE5D | FF32 | 2180 | 5F7F | CB1F |
| 0000566500 | 531E | E5E8 | 5BFB | D88E | 5756 | 3E8B | 0186 | 5D8A |
| 0000566520 | 8BFE | FC75 | F73B | 0975 | FF32 | 3180 | 5F80 | 1F5E |
| 0000566540 | 89CB | FC7D | D98C | C18E | A5FC | FB80 | 7503 | AD09 |
| 0000566560 | F480 | AB80 | 5E5F | CB1F | A5A5 | 80AD | 80F4 | 5FAB |
| 0000566600 | 1F5E | 1ECB | E853 | FBA2 | 8E5B | 56D8 | 8C57 | 8ED0 |
| 0000566620 | EBC0 | 1E0A | E853 | FB92 | 8E5B | 56D8 | E857 | E77A |
| 0000566640 | 04EB | 071E | EDEB | 08B8 | E900 | 00C7 | 531E | 79E8 |
| 0000566660 | 5BFB | D88E | 5756 | D08C | C08E | 0AEB | 531E | 69E8 |
| 0000566700 | 5BFB | D88E | 5756 | 51E8 | EBE7 | 1E04 | EB07 | B8ED |
| 0000566720 | 0004 | 9EE9 | 1E00 | E853 | FB50 | 8E5B | 56D8 | 8C57 |
| 0000566740 | 8ED0 | EBC0 | 1E0A | E853 | FB40 | 8E5B | 56D8 | E857 |
| 0000566760 | E728 | 04EB | 071E | EDEB | 0CB8 | EB00 | 1E76 | E853 |
| 0000567000 | FB28 | 8E5B | 56D8 | 8C57 | 8ED0 | EBC0 | 1E0A | E853 |
| 0000567020 | FB18 | 8E5B | 56D8 | E857 | E700 | 04EB | 071E | EDEB |
| 0000567040 | 14B8 | EB00 | 1E4E | E853 | FB00 | 8E5B | 56D8 | 8C57 |
| 0000567060 | 8ED0 | EBC0 | 1E0A | E853 | FAF0 | 8E5B | 56D8 | E857 |
| 0000567100 | E6D8 | 04EB | 071E | EDEB | 10B8 | EB00 | 1E26 | E853 |
| 0000567120 | FAD8 | 8E5B | 56D8 | 8C57 | 8ED0 | EBC0 | 1E0A | E853 |
| 0000567140 | FAC8 | 8E5B | 56D8 | E857 | E6B0 | 04EB | 071E | EDEB |
| 0000567160 | 00B8 | 8B00 | 8BD8 | 863E | 8C01 | 8ED9 | 80C1 | FE7D |
| 0000567200 | 7407 | 8711 | FC7D | 8955 | 2E26 | FF02 | 1097 | 5D02 |
| 0000567220 | 5E5F | CB1F | C383 | BF02 | 0008 | BAE8 | 8BE6 | 8BF7 |
| 0000567240 | 863E | EB01 | 1EDE | E853 | FA80 | 8E5B | 56D8 | 8C57 |
| 0000567260 | 8ED0 | EBC0 | 1E0A | E853 | FA70 | 8E5B | 56D8 | E857 |
| 0000567300 | E66E | 04EB | 071E | EDEB | 0AB8 | E900 | 00C7 | 531E |
| 0000567320 | 57E8 | 5BFA | D88E | 5756 | D08C | C08E | 0AEB | 531E |
| 0000567340 | 47E8 | 5BFA | D88E | 5756 | 45E8 | EBE6 | 1E04 | EB07 |
| 0000567360 | B8ED | 0006 | 9EE9 | 1E00 | E853 | FA2E | 8E5B | 56D8 |
| 0000567400 | 8C57 | 8ED0 | EBC0 | 1E0A | E853 | FA1E | 8E5B | 56D8 |
| 0000567420 | E857 | E61C | 04EB | 071E | EDEB | 0EB8 | EB00 | 1E76 |
| 0000567440 | E853 | FA06 | 8E5B | 56D8 | 8C57 | 8ED0 | EBC0 | 1E0A |
| 0000567460 | E853 | F9F6 | 8E5B | 56D8 | E857 | E5F4 | 04EB | 071E |
| 0000567500 | EDEB | 16B8 | EB00 | 1E4E | E853 | F9DE | 8E5B | 56D8 |
| 0000567520 | 8C57 | 8ED0 | EBC0 | 1E0A | E853 | F9CE | 8E5B | 56D8 |
| 0000567540 | E857 | E5CC | 04EB | 071E | EDEB | 12B8 | EB00 | 1E26 |
| 0000567560 | E853 | F9B6 | 8E5B | 56D8 | 8C57 | 8ED0 | EBC0 | 1E0A |
| 0000567600 | E853 | F9A6 | 8E5B | 56D8 | E857 | E5A4 | 04EB | 071E |
| 0000567620 | EDEB | 02B8 | 8B00 | 8BD8 | 863E | 8C01 | 8ED9 | 80C1 |
| 0000567640 | FE7D | 7407 | 5605 | 9FE8 | 5EE5 | D6E9 | BBFE | 0004 |
| 0000567660 | 21EB | 08BB | EB00 | BB1C | 000C | 17EB | 10BB | EB00 |
| 0000567700 | BB12 | 0014 | 0DEB | 00BB | EB00 | BB08 | 001C | 03EB |
| 0000567720 | 18BB | 1E00 | E853 | F952 | 8E5B | 56D8 | 8B57 | 863E |
| 0000567740 | 8001 | FE7D | 7407 | 803A | F27D | 7407 | 832C | 0CEF |
| 0000567760 | 3E89 | 0186 | D88C | C08E | 758B | 89FC | FC7D | 7D8B |
| 0000570000 | 8308 | 1CFB | 3D73 | FB83 | 7318 | 5540 | 2689 | 022E |
| 0000570020 | 97FF | 0210 | 5F5D | 1F5E | 83CB | 02C3 | 29E8 | EBE5 |
| 0000570040 | 83CC | 02C3 | 7D80 | 07F2 | C374 | EF83 | 890C | 863E |
| 0000570060 | E801 | E514 | BEEB | F787 | 2E83 | 0186 | 550C | 2689 |

THU MAR 14 17:31:54 1991 DB_PI.DLL PAGE 205, LINE 12037

| | | | | | | | | |
|---|---|---|---|---|---|---|---|---|
| 0000570100 | 022E | 97FF | 020C | 5F5D | 1F5E | 83CB | 862E | 0C01 |
| 0000570120 | 8955 | 2E26 | FF02 | 1097 | 5D02 | 259F | 4100 | E8D1 |
| 0000570140 | E4D0 | E00A | 5E5F | 9E1F | D0CB | D0E3 | 8AE3 | D0FB |
| 0000570160 | 02E7 | 32DF | EBFF | BB03 | 000C | 531E | ABE8 | 5BF8 |
| 0000570200 | D88E | 5756 | D88C | C08E | 8BFC | 8636 | 4E01 | 8B4E |
| 0000570220 | 2BFE | B9FB | 0005 | 87AD | 8905 | FE44 | 1D8B | 4747 |
| 0000570240 | F4E2 | 5E5F | CB1F | 5756 | E81E | F87E | D88E | 3E8B |
| 0000570260 | 0186 | 7D80 | 07FE | 0374 | 8DE8 | 1FE4 | 5E5F | 00CB |
| 0000570300 | 3068 | B034 | EB84 | 6813 | 3330 | 83B0 | 0CEB | 3068 |
| 0000570320 | B031 | EB81 | 6805 | 3031 | 8AB0 | 681E | 5921 | 831F |
| 0000570340 | 003E | 0037 | 0674 | 1EFF | 36FE | C31F | E39A | 9860 |
| 0000570360 | 1F5C | 55C3 | EC8B | EC83 | 1E02 | CCBB | 8E60 | 8BDB |
| 0000570400 | 085E | 1E89 | 371A | 8C3C | 0675 | 06C7 | 371A | 3231 |
| 0000570420 | E42A | 4689 | 9AFE | 0292 | 60DF | 16BB | 9A37 | 41A4 |
| 0000570440 | 6108 | FDB8 | 5000 | 0C9A | 1004 | 8B61 | FE46 | E405 |
| 0000570460 | 50FF | 0C9A | 1904 | FF61 | FE76 | 949A | 2501 | 1F61 |
| 0000570500 | E58B | CB5D | 8B55 | 83EC | 64EC | 5756 | 331E | 8BDB |
| 0000570520 | 1056 | 01B8 | E800 | 002B | 763B | 730C | 8005 | 40C9 |
| 0000570540 | 0D89 | 5F1F | 8B5E | 5DE5 | 55CB | EC8B | EC83 | 5664 |
| 0000570560 | 1E57 | C033 | D233 | 5E8B | E810 | 0007 | 5F1F | 8B5E |
| 0000570600 | 5DE5 | FCCB | 5055 | 006A | 006A | D08C | C08E | D88E |
| 0000570620 | 4E8B | 830C | 64F9 | 0676 | 40B1 | F633 | 26EB | 76C5 |
| 0000570640 | 8D08 | 9C7E | A4F3 | D88E | 4E8B | 8D0C | 9C76 | 7689 |
| 0000570660 | 8B08 | 0E46 | 4E01 | BF08 | 0230 | F6E8 | 5DF2 | 762B |
| 0000570700 | 0308 | 0C76 | 7E8B | 3606 | 0D89 | 8936 | 0275 | 8936 |
| 0000570720 | 0445 | 8936 | 065D | 30BE | 8B02 | 3604 | 4589 | 8B08 |
| 0000570740 | 0244 | 8936 | 0A45 | 448B | 3604 | 4589 | 8B0C | 0644 |
| 0000570760 | 8936 | 0E45 | C78B | D28C | 00C3 | 8B55 | 56EC | 1E57 |
| 0000571000 | 1F16 | 768D | 5506 | 59E8 | 5DF1 | 8B1F | 26C8 | 98AC |
| 0000571020 | FE8B | F803 | C626 | 0005 | 7E8B | 320E | 36FF | 1D89 |
| 0000571040 | 8936 | 0255 | 8936 | 044D | 8936 | 0675 | 8C36 | 0845 |
| 0000571060 | D28C | C78B | 5E5F | E58B | CB5D | 8B55 | 83EC | 0AEC |
| 0000571100 | 5EC4 | 2606 | 078A | 8B98 | F6D8 | 5D87 | 0135 | 0674 |
| 0000571120 | 478D | EB20 | 9008 | 5E8B | 2606 | 078A | 3D98 | 0065 |
| 0000571140 | 1374 | 46FF | C406 | 065E | 8A26 | 9807 | D88B | 87F6 |
| 0000571160 | 355D | 7504 | C4ED | 065E | 8A26 | 8807 | FE46 | C626 |
| 0000571200 | 2E07 | 46FF | C406 | 065E | 8A26 | 8807 | FC46 | 468A |
| 0000571220 | 26FE | 0788 | 468A | 88FC | FE46 | 5EC4 | FF06 | 0646 |
| 0000571240 | 8026 | 003F | DF75 | E58B | CB5D | 8B55 | 83EC | 08EC |
| 0000571260 | 09EB | 8026 | 2E3F | 0C74 | 46FF | C406 | 065E | 8026 |
| 0000571300 | 003F | EE75 | 43FF | 2606 | 3F80 | 7400 | EB56 | 9010 |
| 0000571320 | 8026 | 653F | 1274 | 8026 | 453F | 0C74 | 46FF | 8B06 |
| 0000571340 | 065E | 8026 | 003F | E875 | C38B | C28C | 4EFF | 8906 |
| 0000571360 | FC46 | 5689 | EBFE | 9004 | 4EFF | 8B06 | 065E | 8026 |
| 0000571400 | 303F | F474 | 8026 | 2E3F | 0375 | 4EFF | C406 | FC5E |
| 0000571420 | 46FF | 26FC | 078A | 46FF | C406 | 065E | 8826 | 0A07 |
| 0000571440 | 75C0 | 8BEA | 5DE5 | 90CB | 8B55 | 8DEC | AA1E | 9A3A |
| 0000571460 | 59CF | 632A | 5EC4 | 9A06 | 59D3 | 632F | BB9A | 5B5F |
| 0000571500 | 7263 | B807 | 0001 | E58B | CB5D | C02B | E58B | CB5D |
| 0000571520 | 8B55 | 83EC | 10EC | 5657 | 7E83 | 0006 | 2274 | 76FF |
| 0000571540 | FF0E | 0C76 | 468D | 50F8 | 729A | 7D28 | 8B63 | 1EF0 |
| 0000571560 | 1F16 | 7EC4 | A508 | A5A5 | 1FA5 | 5F5E | E58B | CB5D |
| 0000571600 | 76FF | FF0E | 0C76 | 468D | 50F0 | 729A | 8428 | 8B63 |
| 0000571620 | 9AD8 | 59C9 | 638C | 5EC4 | 9A08 | 5B70 | 642C | 5F5E |
| 0000571640 | E58B | CB5D | 8B55 | 83EC | 06EC | 5657 | 5EC4 | 2612 |
| 0000571660 | 478B | 4802 | 7E80 | 0016 | 2E74 | 8326 | 2D3F | 0675 |
| 0000571700 | 01B8 | EB00 | 9003 | C02B | 4603 | 8B0A | 0C56 | 4689 |
| 0000571720 | 89FA | FC56 | 5052 | 7E83 | 000E | 067E | 01B8 | EB00 |
| 0000571740 | 9003 | C02B | E850 | 045C | 468B | 8B0A | 0C56 | 4689 |

THU MAR 14 17:31:54 1991 DB_PI.DLL PAGE 206, LINE 12096

| | | | | | | | | |
|---|---|---|---|---|---|---|---|---|
| 0000571760 | 89FA | FC56 | 5EC4 | 2612 | 3F83 | 752D | 8E0C | 8BC2 |
| 0000572000 | 26D8 | 07C6 | 402D | 4689 | 83FA | 0E7E | 7E00 | C412 |
| 0000572020 | FA5E | 8A26 | 0147 | 8826 | 4307 | 5E89 | 26FA | 07C6 |
| 0000572040 | B82E | 371C | 501E | 7E80 | 0116 | C01B | D8F7 | 4603 |
| 0000572060 | 8BFA | FC56 | 4603 | 520E | 9A50 | 2750 | 64DF | C483 |
| 0000572100 | 8908 | FA46 | 5689 | 83FC | 107E | 7400 | C407 | FA5E |
| 0000572120 | C626 | 4507 | 46FF | C4FA | 125E | C426 | 067F | 8026 |
| 0000572140 | 303D | 5C74 | 468E | 2614 | 778B | 4E02 | 0D79 | C68B |
| 0000572160 | D8F7 | F08B | 5EC4 | 26FA | 07C6 | FF2D | FA46 | FE83 |
| 0000572200 | 7C64 | 8B15 | B9C6 | 0064 | F799 | C4F9 | FA5E | 0026 |
| 0000572220 | 8B07 | 99C6 | F9F7 | F28B | 46FF | 83FA | 0AFE | 157C |
| 0000572240 | C68B | 0AB9 | 9900 | F9F7 | 5EC4 | 26FA | 0700 | C68B |
| 0000572260 | F799 | 8BF9 | 8BF2 | FFC6 | FA46 | 5EC4 | 26FA | 0700 |
| 0000572300 | 468B | 8B0A | 0C56 | 5F5E | E58B | CB5D | 8B55 | 83EC |
| 0000572320 | 28EC | 468D | 50EA | 468D | 50DC | 5EC4 | 2606 | 77FF |
| 0000572340 | 2606 | 77FF | 2604 | 77FF | 2602 | 37FF | EA9A | 2C61 |
| 0000572360 | 8365 | 0CC4 | 468D | 89DC | E646 | 568C | 16E8 | 8B50 |
| 0000572400 | 0E4E | 5141 | 7E83 | 000E | 067E | 01B8 | EB00 | 9003 |
| 0000572420 | C02B | 5EC4 | 89E6 | DA46 | 2650 | 078B | 4689 | 58D8 |
| 0000572440 | 8326 | 2D3F | 0675 | 01B8 | EB00 | 9003 | C02B | 4603 |
| 0000572460 | 03DA | 0A46 | 568B | 520C | 9A50 | 2944 | 6651 | C483 |
| 0000572500 | 2A0A | 50C0 | 76FF | FFE8 | E676 | 76FF | FF10 | 0E76 |
| 0000572520 | 76FF | FF0C | 0A76 | 76FF | FF08 | 0676 | E80E | FE44 |
| 0000572540 | 468B | 8B0A | 0C56 | E58B | CB5D | 8B55 | 83EC | 0CEC |
| 0000572560 | C456 | 105E | 8B26 | 0247 | 8948 | FE46 | 7E80 | 0014 |
| 0000572600 | 3474 | 8326 | 2D3F | 0675 | 01B8 | EB00 | 9003 | C02B |
| 0000572620 | 4603 | 8B0A | 0C56 | 4689 | 89F4 | F656 | 4E8B | 390E |
| 0000572640 | FE4E | 1275 | C28E | D88B | 768B | 26FE | 00C6 | 0330 |
| 0000572660 | 43DE | C626 | 0007 | 468B | 8B0A | 0C56 | 4689 | 89F4 |
| 0000572700 | F656 | 5EC4 | 2610 | 3F83 | 752D | 8E0C | 8BC2 | 26D8 |
| 0000572720 | 07C6 | 402D | 4689 | C4F4 | 105E | 8326 | 027F | 7F00 |
| 0000572740 | FF19 | F676 | 76FF | B8F4 | 0001 | E850 | 0256 | 5EC4 |
| 0000572760 | 26F4 | 07C6 | FF30 | F446 | 07EB | 8B26 | 0247 | 4601 |
| 0000573000 | 83F4 | 0E7E | 7E00 | FF5F | F676 | 76FF | B8F4 | 0001 |
| 0000573020 | E850 | 0230 | 5EC4 | 26F4 | 07C6 | FF2E | F446 | 5EC4 |
| 0000573040 | 2610 | 7F83 | 0002 | 3E7D | 7E80 | 0014 | 0874 | 8B26 |
| 0000573060 | 0247 | D8F7 | 0EEB | 8B26 | 0247 | D8F7 | 463B | 7E0E |
| 0000573100 | 8B03 | 0E46 | 4689 | FF0E | F676 | 76FF | 50F4 | F3E8 |
| 0000573120 | FF01 | 0E76 | 30B8 | 5000 | 76FF | FFF6 | F476 | 8E9A |
| 0000573140 | 853E | 8366 | 08C4 | 468B | 8B0A | 0C56 | 8B5E | 5DE5 |
| 0000573160 | 90CB | 8B55 | 83EC | 26EC | 468D | 50EA | 468D | 50DC |
| 0000573200 | 5EC4 | 2606 | 77FF | 2606 | 77FF | 2604 | 77FF | 2602 |
| 0000573220 | 37FF | EA9A | BF61 | 8366 | 0CC4 | 468D | 89DC | E646 |
| 0000573240 | 568C | 16E8 | 8B50 | DE4E | 4E03 | 510E | D88B | 3650 |
| 0000573260 | 078B | 4689 | 58DA | 8336 | 2D3F | 0675 | 01B8 | EB00 |
| 0000573300 | 9003 | C02B | 4603 | 8B0A | 0C56 | 5052 | 449A | 2D29 |
| 0000573320 | 8361 | 0AC4 | C02A | FF50 | E876 | 76FF | FFE6 | 0E76 |
| 0000573340 | 76FF | FF0C | 0A76 | 76FF | FF08 | 0676 | E80E | FE7A |
| 0000573360 | 468B | 8B0A | 0C56 | E58B | CB5D | 8B55 | 83EC | 32EC |
| 0000573400 | 468D | 50E4 | 468D | 50D8 | 5EC4 | 2606 | 77FF | 2606 |
| 0000573420 | 77FF | 2604 | 77FF | 2602 | 37FF | EA9A | 4761 | 8367 |
| 0000573440 | 0CC4 | 468B | 48DA | 4689 | 8DE2 | D846 | 4689 | 8CD4 |
| 0000573460 | D656 | 5016 | 76FF | 8B0E | 36D8 | 3F83 | 752D | B805 |
| 0000573500 | 0001 | 02EB | C02B | 4603 | 8B0A | 0C56 | 4689 | 89FC |
| 0000573520 | FE56 | 5052 | 449A | 4629 | 8368 | 0AC4 | 468B | 48DA |
| 0000573540 | 4689 | 3BD2 | E246 | 047E | 01B0 | 02EB | C02A | 4688 |
| 0000573560 | 8BFA | D246 | 4689 | 3DE2 | FFFC | 057C | 463B | 7C0E |
| 0000573600 | B027 | 5001 | 76FF | FFD6 | D476 | 76FF | FF10 | 0E76 |
| 0000573620 | 76FF | FF0C | 0A76 | 76FF | FF08 | 0676 | E80E | FC04 |

THU MAR 14 17:31:54 1991 DB_PI.DLL PAGE 207, LINE 12155

| | | | | | | | | |
|---|---|---|---|---|---|---|---|---|
| 0000573640 | C483 | 8B12 | 5DE5 | 90CB | 7E80 | 00FA | 1474 | 5EC4 |
| 0000573660 | FFFC | FC46 | 8026 | 003F | F475 | 5E8B | 26FC | 47C6 |
| 0000573700 | 00FE | 01B0 | FF50 | D676 | 76FF | FFD4 | 0E76 | 76FF |
| 0000573720 | FF0C | 0A76 | 76FF | FF08 | 0676 | E80E | FD8C | E58B |
| 0000573740 | CB5D | 8B55 | 83EC | 0E7E | 7465 | 8306 | 0E7E | 7545 |
| 0000573760 | FF1D | 1276 | 76FF | FF10 | 0C76 | 76FF | FF0A | 0876 |
| 0000574000 | 76FF | 0E06 | C5E8 | 8BFC | 8BE5 | 5DE5 | 90CB | 7E83 |
| 0000574020 | 660E | 1675 | 76FF | FF10 | 0C76 | 76FF | FF0A | 0876 |
| 0000574040 | 76FF | 0E06 | 4BE8 | EBFE | 90DE | 76FF | FF12 | 1076 |
| 0000574060 | 76FF | FF0C | 0A76 | 76FF | FF08 | 0676 | E80E | FEBA |
| 0000574100 | E58B | CB5D | 8B55 | 83EC | 047E | 7400 | FF25 | 0876 |
| 0000574120 | 76FF | 9A06 | 27B0 | 6860 | E58B | 5040 | 76FF | FF08 |
| 0000574140 | 0676 | 468B | 8B06 | 0856 | 4603 | 5204 | 9A50 | 3D0A |
| 0000574160 | 6322 | E58B | C25D | 0006 | 581E | 4590 | 8B55 | 1EEC |
| 0000574200 | D88E | EC83 | 1E18 | D068 | 9A39 | 2A08 | 6898 | C483 |
| 0000574220 | 8904 | EE46 | 5689 | 8BF0 | 0846 | 460B | 7506 | 6A1F |
| 0000574240 | 5200 | 76FF | 9AEE | 6EEC | 68EA | C483 | 0B06 | 75C0 |
| 0000574260 | B807 | 0001 | 9FE9 | 9000 | C02B | 99E9 | 9000 | 46C7 |
| 0000574300 | D8F2 | 8C39 | F45E | 468B | 8B06 | 0856 | 4689 | 89F6 |
| 0000574320 | F856 | C02B | 4689 | 89FC | FA46 | 468B | 0BF0 | EE46 |
| 0000574340 | 4674 | 36FF | 30DB | 36FF | 30D9 | 468D | 16EE | FF50 |
| 0000574360 | F076 | 76FF | 6AEE | 9A00 | 6AEC | 68F8 | C483 | 890E |
| 0000574400 | EC46 | 7540 | 9A1E | 04F6 | 6907 | C28E | D88B | 8326 |
| 0000574420 | 023F | 1474 | F69A | 4404 | 8E69 | 8BC2 | 26D8 | 3F83 |
| 0000574440 | 740D | 8B05 | EC46 | 2EEB | 3E80 | 2ED0 | 7400 | C707 |
| 0000574460 | EE46 | 39DB | 05EB | 46C7 | E3EE | 8C39 | F05E | 36FF |
| 0000574500 | 30DB | 36FF | 30D9 | 468D | 16EE | 1E50 | 76FF | 6AEE |
| 0000574520 | 9A00 | 6D1E | DF72 | 4D4D | E58B | 5D1F | CB4D | 8B55 |
| 0000574540 | FFEC | 0876 | 76FF | 3306 | 50C0 | 9A50 | FFFF | 0000 |
| 0000574560 | C085 | 0374 | 40E9 | 8B9B | 5DE5 | 00CB | 8B55 | FFEC |
| 0000574600 | 0876 | 76FF | 3306 | 50C0 | 9A50 | FFFF | 0000 | C085 |
| 0000574620 | 0374 | 22E9 | 8B9B | 5DE5 | 00CB | 581E | 4590 | 8B55 |
| 0000574640 | 1EEC | D88E | 1AB8 | 9A00 | 02BA | 69BD | 46C7 | 00F8 |
| 0000574660 | 8300 | 147E | 7400 | E903 | 00AC | 468B | 8B08 | 0A56 |
| 0000574700 | 4689 | 89EC | EE56 | 681E | 39F0 | 089A | F22A | 8369 |
| 0000574720 | 04C4 | 4689 | 8908 | 0A56 | 4689 | 89FA | FC56 | D00B |
| 0000574740 | 0374 | 89E9 | 8000 | D03E | 002E | 0874 | 46C7 | F808 |
| 0000574760 | EB39 | 9006 | 46C7 | 0008 | 8C3A | 0A5E | 0468 | 9A01 |
| 0000575000 | 243E | 6A1C | C483 | 8902 | FA46 | 5689 | 0BFC | 75D0 |
| 0000575020 | B807 | FFFF | DDE9 | 9000 | 46FF | FFF8 | FC76 | 1E50 |
| 0000575040 | 0C68 | FF3A | 0A76 | 76FF | 9A08 | 7018 | 6A2F | C483 |
| 0000575060 | C40C | FA5E | 8026 | 003F | 2075 | 5306 | 489A | 3724 |
| 0000575100 | 836A | 04C4 | F69A | 8904 | 896A | E646 | 5689 | C4E8 |
| 0000575120 | E65E | C726 | 0807 | EB00 | 90B8 | C38B | C28C | 4689 |
| 0000575140 | 8908 | 0A56 | 08EB | C02B | 4689 | 89FC | FA46 | 76FF |
| 0000575160 | FFEE | EC76 | 76FF | FFFC | FA76 | 76FF | FF0A | 0876 |
| 0000575200 | 468D | 16F4 | 8D50 | F046 | 5016 | 76FF | FF12 | 1076 |
| 0000575220 | 76FF | FF0E | 0C76 | 249A | AC71 | 836A | 1CC4 | 7540 |
| 0000575240 | E903 | FF6D | 76FF | FFF6 | F476 | 76FF | FFF2 | F076 |
| 0000575260 | 76FF | FF0A | 0876 | 76FF | 9A06 | 755E | 6AC3 | C483 |
| 0000575300 | 890E | EA46 | 7E83 | 00F8 | 0E74 | 76FF | FFFC | FA76 |
| 0000575320 | 489A | D124 | 836A | 04C4 | 76FF | FFF2 | F076 | 489A |
| 0000575340 | DF24 | 836A | 04C4 | 76FF | FFF6 | F476 | 489A | FC24 |
| 0000575360 | 8B6A | EA46 | 4D4D | E58B | 5D1F | CB4D | 581E | 4590 |
| 0000575400 | 8B55 | 1EEC | D88E | 16B8 | 9A00 | 02BA | 6B23 | 3E80 |
| 0000575420 | 2ED0 | 7400 | B805 | 3A1B | 03EB | 20B8 | A33A | 3A28 |
| 0000575440 | 5C6A | 468B | 8B08 | 0A56 | 4689 | 89EA | EC56 | 5052 |
| 0000575460 | 3E9A | 393C | 836B | 06C4 | 4689 | 89EE | F056 | 2F6A |
| 0000575500 | 76FF | FFEC | EA76 | 3E9A | 5E3C | 836B | 06C4 | 4689 |

THU MAR 14 17:31:54 1991 DB_PI.DLL PAGE 208, LINE 12214

| | | | | | | | | |
|---|---|---|---|---|---|---|---|---|
| 0000575520 | 89FA | FC56 | D00B | 7E75 | 468B | 0BF0 | EE46 | 0374 |
| 0000575540 | 8FE9 | 6A00 | FF3A | EC76 | 76FF | 9AEA | 3C10 | 6B76 |
| 0000575560 | C483 | 8906 | EE46 | 5689 | 0BF0 | 75D0 | FF75 | EC76 |
| 0000575600 | 76FF | 9AEA | 27B0 | 6B82 | C483 | 0504 | 0003 | 9A50 |
| 0000575620 | 243E | 6BA3 | C483 | 8902 | EA46 | 5689 | 0BEC | 75D0 |
| 0000575640 | B807 | FFFF | 7EE9 | 9001 | 681E | 3A25 | 76FF | 50EC |
| 0000575660 | 509A | B727 | 836B | 08C4 | 76FF | FF0A | 0876 | 76FF |
| 0000575700 | FFEC | EA76 | 0A9A | ED27 | 836B | 08C4 | 468B | 8BEA |
| 0000575720 | EC56 | 4040 | 16EB | 468B | 0BF0 | EE46 | 0874 | 468B |
| 0000575740 | 39EE | FA46 | 0C76 | 468B | 8BFA | FC56 | 4689 | 89EE |
| 0000575760 | F056 | 2E6A | 76FF | FFF0 | EE76 | 3E9A | 083C | 836C |
| 0000576000 | 06C4 | 4689 | 89F6 | F856 | D00B | 3674 | FF1E | 2836 |
| 0000576020 | FF3A | F876 | 9A50 | 6F28 | 6C26 | C483 | 5008 | 76FF |
| 0000576040 | FF12 | 1076 | 76FF | FF0E | 0C76 | 76FF | FFEC | EA76 |
| 0000576060 | 76FF | 9A06 | 698A | 6C3B | C483 | 8910 | F446 | C6E9 |
| 0000576100 | 9000 | 76FF | FFEC | EA76 | B09A | 4727 | 836C | 04C4 |
| 0000576120 | 0505 | 5000 | 3E9A | 6624 | 836C | 02C4 | 4689 | 89EE |
| 0000576140 | F056 | D00B | 0375 | 38E9 | FFFF | EC76 | 76FF | FFEA |
| 0000576160 | F076 | 9A50 | 2750 | 6C74 | C483 | FF08 | EC76 | 76FF |
| 0000576200 | 9AEA | 27B0 | 6CAE | C483 | 0304 | EE46 | 568B | 89F0 |
| 0000576220 | F646 | 5689 | C7F8 | F446 | FFFF | 46C7 | 02F2 | EB00 |
| 0000576240 | 9004 | 4EFF | 83F2 | F27E | 7C00 | 8B4E | F25E | E3D1 |
| 0000576260 | FF1E | 28B7 | FF3A | F876 | 76FF | 9AF6 | 2750 | 6CBE |
| 0000576300 | C483 | 6A08 | FF00 | FD76 | 76FF | 9AEE | 6EEC | 6CE1 |
| 0000576320 | C483 | 4006 | CC74 | 76FF | FFF2 | 1276 | 76FF | FF10 |
| 0000576340 | 0E76 | 76FF | FF0C | F076 | 76FF | FFEE | 0676 | 8A9A |
| 0000576360 | F269 | 836C | 10C4 | 4689 | FFF4 | F076 | 76FF | 9AEE |
| 0000576400 | 2448 | 6D10 | C483 | 8B04 | 0846 | 568B | 390A | EA46 |
| 0000576420 | 0575 | 5639 | 74EC | FF0B | EC76 | 76FF | 9AEA | 2448 |
| 0000576440 | 687C | 468B | 4DF4 | 8B4D | 1FE5 | 4D5D | 90CB | 581E |
| 0000576460 | 4590 | 8B55 | 1EEC | D88E | EC83 | 5610 | C02B | 4689 |
| 0000576500 | 89F2 | F046 | 76FF | FF12 | 1076 | 76FF | FF0E | 0C76 |
| 0000576520 | 76FF | FF0A | 0876 | 76FF | 9A06 | 6AEC | 6D5D | C483 |
| 0000576540 | 890E | FC46 | 7440 | E903 | 0170 | F69A | 7704 | 8E6D |
| 0000576560 | 8BC2 | 26D8 | 3F83 | 7402 | E903 | 015E | 2F6A | 76FF |
| 0000576600 | FF0A | 0876 | 109A | 8E3C | 836D | 06C4 | D00B | 0374 |
| 0000576620 | 47E9 | 6A01 | FF5C | DA76 | 76FF | 9A08 | 3C10 | 6DB4 |
| 0000576640 | C483 | 0B06 | 74D0 | E903 | 0130 | 5EC4 | 2608 | 3F80 |
| 0000576660 | 7400 | 260A | 7F80 | 3A01 | 0375 | 1DE9 | 1E01 | 2E68 |
| 0000576700 | 9A3A | 2A08 | 6DCC | C483 | 8904 | F446 | 5689 | 0BF6 |
| 0000576720 | 75D0 | E903 | 0104 | 0468 | 9A01 | 243E | 6E11 | C483 |
| 0000576740 | 8902 | F046 | 5689 | 0BF2 | 75D0 | E903 | 00EC | 0368 |
| 0000576760 | FF01 | F276 | 76FF | FFF0 | F676 | 76FF | E8F4 | 017E |
| 0000577000 | C483 | 890A | F446 | 5689 | 0BF6 | 75D0 | E903 | 00CA |
| 0000577020 | 5EC4 | 26F0 | 3F80 | 7500 | E903 | 00BE | 5306 | B09A |
| 0000577040 | 3327 | 836E | 04C4 | 5EC4 | 03F0 | 4BD8 | 8026 | 5C3F |
| 0000577060 | 1674 | 8026 | 2F3F | 1074 | 681E | 3A33 | FF06 | F076 |
| 0000577100 | CA9A | 4127 | 836E | 08C4 | 76FF | FF0A | 0876 | B09A |
| 0000577120 | 5127 | 836E | 04C4 | 76FF | FFF2 | F076 | F08B | B09A |
| 0000577140 | 6D27 | 836E | 04C4 | F003 | FE81 | 0104 | 6C73 | 76FF |
| 0000577160 | FF0A | 0876 | 76FF | FFF2 | F076 | 0A9A | 8A27 | 836E |
| 0000577200 | 08C4 | 76FF | FF12 | 1076 | 76FF | FF0E | 0C76 | 76FF |
| 0000577220 | FFF2 | F076 | 76FF | 9A06 | 6AEC | 6E98 | C483 | 890E |
| 0000577240 | FC46 | 7540 | 9A35 | 04F6 | 6EDB | C28E | D88B | 8326 |
| 0000577260 | 023F | 0375 | 37E9 | C4FF | F05E | 8026 | 5C3F | 0674 |
| 0000577300 | 8026 | 2F3F | 1475 | 8026 | 017F | 755C | E903 | FF1E |
| 0000577320 | 8026 | 017F | 752F | E903 | FF14 | 468B | 0BF2 | F046 |
| 0000577340 | 0E74 | 76FF | FFF2 | F076 | 489A | 9A24 | 8369 | 04C4 |
| 0000577360 | 468B | 5EFC | 4D4D | E58B | 5D1F | CB4D | 8B55 | 83EC |

THU MAR 14 17:31:54 1991 DB_PI.DLL PAGE 209, LINE 12273

| | | | | | | | | |
|---|---|---|---|---|---|---|---|---|
| 0000577400 | 02EC | 76FF | FF08 | 0676 | 8D16 | FE46 | 3350 | 50C0 |
| 0000577420 | 9A50 | 20A1 | 0000 | C00B | 1675 | 46F6 | 020A | 1374 |
| 0000577440 | 46F7 | 01FE | 7400 | BA0C | 000D | 05B8 | E900 | 956E |
| 0000577460 | 84E9 | 8B95 | 5DE5 | 00CB | 8B55 | 8BEC | 1ED6 | 76C5 |
| 0000577500 | C40A | 065E | FFBD | C00A | 2D74 | 26AC | 278A | 3A43 |
| 0000577520 | 74E0 | 2CF3 | 3C41 | 1A1A | 80C9 | 20E1 | C102 | 4104 |
| 0000577540 | E086 | 412C | 1A3C | C91A | E180 | 0220 | 04C1 | 3A41 |
| 0000577560 | 74C4 | 1AD3 | 1CC0 | 98FF | 8B1F | 5DF2 | 00CB | 04C8 |
| 0000577600 | 0000 | 468B | 8B04 | 0656 | 4689 | 89FC | FE56 | 4EFF |
| 0000577620 | 740C | EB79 | 9044 | 8026 | 3B3F | 6774 | 8026 | 223F |
| 0000577640 | 2274 | 8A26 | C407 | 085E | 8826 | FF07 | 0446 | 46FF |
| 0000577660 | FF08 | 0C4E | 2375 | 468B | 8B04 | 0656 | 4689 | 89FC |
| 0000577700 | FE56 | 48EB | 46FF | C404 | 045E | 8026 | 003F | 1475 |
| 0000577720 | 8026 | 003F | 0374 | 46FF | C404 | 045E | 8026 | 003F |
| 0000577740 | B475 | 1FEB | 8026 | 223F | E674 | 8A26 | C407 | 085E |
| 0000577760 | 8826 | FF07 | 0446 | 46FF | FF08 | 0C4E | C975 | B6EB |
| 0000600000 | 46FF | 8B04 | 045E | 8026 | 3B3F | F474 | 5EC4 | 2608 |
| 0000600020 | 07C6 | 8B00 | 0446 | 568B | 3906 | FC46 | 0875 | 5639 |
| 0000600040 | 75FE | 2B03 | 99C0 | C3C9 | 08C8 | 0000 | 6A56 | FF00 |
| 0000600060 | 0876 | 76FF | 9A06 | 6EEC | 703D | C483 | 0B06 | 75C0 |
| 0000600100 | 6841 | 0104 | 76FF | FF10 | 0E76 | E09A | 5575 | 8370 |
| 0000600120 | 06C4 | 5EC4 | 260E | 7F80 | 0003 | 0E74 | 681E | 3A36 |
| 0000600140 | 5306 | 0A9A | 6927 | 8370 | 08C4 | 76FF | FF08 | 0676 |
| 0000600160 | 76FF | FF10 | 0E76 | 0A9A | 7B27 | 8370 | 08C4 | B0E9 |
| 0000600200 | 9000 | 76FF | FF0C | 0A76 | 089A | B92A | 8370 | 04C4 |
| 0000600220 | 4689 | 89FC | FE56 | D00B | 0375 | 8DE9 | 6A00 | FF00 |
| 0000600240 | 1076 | 76FF | FF0E | FE76 | 76FF | E8FC | FED0 | C483 |
| 0000600260 | 890A | FC46 | 5689 | 0BFE | 74D0 | C46F | 0E5E | 8026 |
| 0000600300 | 003F | 6674 | 5306 | B09A | FB27 | 8370 | 04C4 | 5EC4 |
| 0000600320 | 030E | 89D8 | F85E | 468C | 26FA | 478A | 98FF | F08B |
| 0000600340 | FE83 | 742F | 8317 | 5CFE | 1274 | FE83 | 743A | 260D |
| 0000600360 | 07C6 | 8D5C | 0147 | 4689 | 8CF8 | FA46 | 76FF | FF08 |
| 0000600400 | 0676 | 76FF | FFFA | F876 | 509A | 0B27 | 8371 | 08C4 |
| 0000600420 | 006A | 76FF | FF10 | 0E76 | EC9A | 4C6E | 836D | 06C4 |
| 0000600440 | C00B | 0374 | 76E9 | EBFF | 9008 | 5EC4 | 260E | 07C6 |
| 0000600460 | 5E00 | CBC9 | 14C8 | 0000 | 5657 | 468B | 0B0C | 0A46 |
| 0000600500 | 0D75 | D9A1 | 8B30 | DB16 | 8930 | 0A46 | 5689 | 8B0C |
| 0000600520 | 0646 | 568B | 8908 | F446 | 5689 | BEF6 | 0002 | 16EB |
| 0000600540 | 4683 | 04F4 | FF26 | 0277 | FF26 | 9A37 | 27B0 | 7189 |
| 0000600560 | C483 | 4004 | F003 | 5EC4 | 26F4 | 478B | 2602 | 070B |
| 0000600600 | 0674 | FE81 | 7FFF | D876 | 468B | 0B1C | 1A46 | 2274 |
| 0000600620 | 76FF | FF1C | 1A76 | B09A | 9927 | 8371 | 04C4 | 76FF |
| 0000600640 | FF20 | 1E76 | F88B | B09A | BA27 | 8371 | 04C4 | F803 |
| 0000600660 | F703 | 7689 | 81FC | FFFE | 727F | C41D | 125E | C02B |
| 0000600700 | 8926 | 0247 | 8926 | 9A07 | 04F6 | 71CC | 4689 | 89F0 |
| 0000600720 | F256 | 5EC4 | E9F0 | 0110 | 9A56 | 243E | 71EE | C483 |
| 0000600740 | C402 | 0E5E | 8926 | 2607 | 5789 | 0B02 | 75D0 | C433 |
| 0000600760 | 125E | C02B | 8926 | 0247 | 8926 | 9A07 | 04F6 | 7201 |
| 0000601000 | 4689 | 89EC | EE56 | 5EC4 | 26EC | 07C7 | 000C | EE9A |
| 0000601020 | 3204 | 8E72 | 8BC2 | 26D8 | 07C7 | 0008 | FFB8 | E9FF |
| 0000601040 | 0347 | 468B | 8B0A | 0C56 | 4689 | 89F4 | F656 | 02BE |
| 0000601060 | EB00 | 9017 | 4683 | 04F4 | FF26 | 0277 | FF26 | 9A37 |
| 0000601100 | 27B0 | 7290 | C483 | 4004 | F003 | 5EC4 | 26F4 | 478B |
| 0000601120 | 2602 | 070B | 0674 | FE81 | 7FFF | D876 | 3E83 | 3A3E |
| 0000601140 | 7400 | A11F | 2ED1 | 4689 | EBFE | 9004 | 4EFF | 83FE |
| 0000601160 | FE7E | 7400 | 8B12 | FE5E | BF80 | 2ED2 | 7500 | EB08 |
| 0000601200 | 90EB | 46C7 | 00FE | 8300 | FE7E | 7400 | 8B0A | FE46 |
| 0000601220 | 0705 | D100 | 03E0 | FFF0 | 1876 | 76FF | 9A16 | 27B0 |
| 0000601240 | 72B9 | C483 | 2B04 | 03D2 | FC46 | D213 | C603 | D283 |

THU MAR 14 17:31:54 1991 DB_PI.DLL PAGE 210, LINE 12332

| | | | | | | | | |
|---|---|---|---|---|---|---|---|---|
| 0000601260 | 0B00 | 7CD2 | 7F49 | 3D05 | 7FFE | 4276 | 5EC4 | 260E |
| 0000601300 | 77FF | 2602 | 37FF | 489A | CD24 | 8372 | 04C4 | 5EC4 |
| 0000601320 | 2B0E | 26C0 | 4789 | 2602 | 0789 | F69A | E004 | 8972 |
| 0000601340 | EC46 | 5689 | C4EE | EC5E | C726 | 0707 | 9A00 | 04EE |
| 0000601360 | 72F2 | C28E | D88B | C726 | 0A07 | E900 | FF1E | 9A56 |
| 0000601400 | 243E | 7312 | C483 | C402 | 125E | 8926 | 2607 | 5789 |
| 0000601420 | 0B02 | 75DC | C419 | 0E5E | FF26 | 0277 | FF26 | 9A37 |
| 0000601440 | 2448 | 734D | C483 | C404 | 0E5E | C5E9 | 90FE | 5EC4 |
| 0000601460 | 260E | 078B | 8B26 | 0257 | 4689 | 89F8 | FA56 | 4E8B |
| 0000601500 | 8806 | 085E | 4E89 | 89F4 | F65E | 7E8B | 0B1C | 1A7E |
| 0000601520 | 7874 | 76FF | FF1C | 1A76 | 5052 | 509A | 5F27 | 8373 |
| 0000601540 | 08C4 | 681E | 3A38 | 76FF | FF1C | 1A76 | B09A | 7527 |
| 0000601560 | 8373 | 04C4 | 4E8B | 8BF8 | FA56 | C803 | 8941 | F84E |
| 0000601600 | 5152 | 509A | 8927 | 8373 | 08C4 | 76FF | FF20 | 1E76 |
| 0000601620 | 76FF | FFFA | F876 | 0A9A | 9727 | 8373 | 08C4 | 76FF |
| 0000601640 | FF20 | 1E76 | B09A | DA27 | 8373 | 04C4 | D88B | 5E03 |
| 0000601660 | 8EF8 | FA46 | 5E89 | 26F8 | 47C6 | 20FF | 468B | 8BF4 |
| 0000601700 | F656 | 0405 | 8900 | F446 | 4BEB | 5EC4 | 26F4 | 478B |
| 0000601720 | 2602 | 070B | 0675 | 46FF | EBF8 | 903A | FF26 | 0277 |
| 0000601740 | FF26 | 5237 | 76FF | 9AF8 | 2750 | 73FC | C483 | 8B08 |
| 0000601760 | F446 | 568B | 89F6 | EC46 | 5689 | 83EE | F446 | C404 |
| 0000602000 | EC5E | FF26 | 0277 | FF26 | 9A37 | 27B0 | 7421 | C483 |
| 0000602020 | 4004 | 4601 | C4F8 | F45E | 8B26 | 0247 | 0B26 | 7407 |
| 0000602040 | 264D | 77FF | 2602 | 37FF | 76FF | FFFA | F876 | 509A |
| 0000602060 | 4327 | 8374 | 08C4 | 468B | 8BF4 | F656 | 4689 | 89EC |
| 0000602100 | EE56 | 4683 | 04F4 | 5EC4 | 26EC | 77FF | 2602 | 37FF |
| 0000602120 | B09A | BD27 | 8374 | 04C4 | 4601 | C4F8 | F85E | C626 |
| 0000602140 | 2007 | 478D | 8901 | F846 | 468C | EBFA | 90A8 | C02A |
| 0000602160 | 5EC4 | 26F8 | 4788 | 26FF | 0788 | 5EC4 | 2612 | 078B |
| 0000602200 | 8B26 | 0257 | 4689 | 89F8 | FA56 | 5EC4 | 890A | F45E |
| 0000602220 | 468C | 26F6 | 4F8B | 2602 | 0F0B | 1575 | 7E83 | 00FE |
| 0000602240 | 0F75 | C28E | D88B | C626 | 0007 | 8940 | F846 | 5689 |
| 0000602260 | C4FA | F45E | 8B26 | 0247 | 0B26 | 7407 | 263D | 77FF |
| 0000602300 | 2602 | 37FF | 76FF | FFFA | F876 | 509A | 2827 | 8370 |
| 0000602320 | 08C4 | 468B | 8BF4 | F656 | 4689 | 89EC | EE56 | 4683 |
| 0000602340 | 04F4 | 5EC4 | 26EC | 77FF | 2602 | 37FF | B09A | FD27 |
| 0000602360 | 8374 | 04C4 | 0140 | F846 | B7EB | 7E83 | 00FE | 6074 |
| 0000602400 | 681E | 2EAC | 76FF | FFFA | F876 | 509A | 0927 | 8375 |
| 0000602420 | 08C4 | 681E | 2EAC | B09A | 5E27 | 8371 | 04C4 | 4601 |
| 0000602440 | 2BF8 | EBF6 | 9027 | 848A | 2ED3 | C88B | F8C0 | 2404 |
| 0000602460 | 040F | C441 | F85E | 46FF | 26F8 | 0788 | E180 | 800F |
| 0000602500 | 41C1 | 5EC4 | FFF8 | F846 | 8826 | 460F | 468B | FFFE |
| 0000602520 | FE4E | C00B | D075 | 5EC4 | FFF8 | F846 | C626 | 0007 |
| 0000602540 | 5EC4 | 26F8 | 07C6 | 2B00 | 5EC0 | C95F | 90CB | 8B55 |
| 0000602560 | 83EC | 04EC | 468B | 3306 | 3DD2 | 0000 | 2074 | 3D42 |
| 0000602600 | 0002 | 1A74 | 033D | 7400 | 4215 | 013D | 7400 | 8B0F |
| 0000602620 | 3DD0 | 0004 | 0874 | 16BA | 3300 | E9C0 | 8F00 | C033 |
| 0000602640 | 5050 | 5250 | 76FF | FF0E | 0C76 | 76FF | FF12 | 1076 |
| 0000602660 | 468D | 16FC | FF50 | 0A76 | 76FF | C708 | E106 | 0130 |
| 0000602700 | 9A00 | FFFF | 0000 | 06C7 | 30E1 | 0000 | C00B | 0374 |
| 0000602720 | E4E9 | 838E | 067E | 7502 | 5005 | E80E | 8BCD | 468B |
| 0000602740 | 83FC | 067E | 7500 | 8A05 | 8AE0 | FE46 | E58B | CB5D |
| 0000602760 | 8B55 | FFEC | 0A76 | 76FF | FF08 | 0676 | 006A | F69A |
| 0000603000 | 0C75 | C976 | 90CB | 12C8 | 0000 | 8B56 | 0C76 | 46C7 |
| 0000603020 | 01FA | 8300 | 067E | 7500 | 9A08 | 41BE | 7643 | 4689 |
| 0000603040 | FF06 | 0676 | 468D | 16FC | 8D50 | FA46 | 5016 | D99A |
| 0000603060 | 0076 | 8B00 | 0846 | 568B | 890A | F646 | 5689 | 0BF8 |
| 0000603100 | 75D0 | 8B52 | FA46 | 0305 | 3B00 | 7EC6 | 8B02 | 56F0 |
| 0000603120 | 3E9A | 5524 | 8376 | 02C4 | 4689 | 89F6 | F856 | D00B |

THU MAR 14 17:31:54 1991 DB_PI.DLL PAGE 211, LINE 12391

| | | | | | | | | |
|---|---|---|---|---|---|---|---|---|
| 0000603140 | 2A75 | F69A | 6804 | 8976 | F246 | 5689 | C4F4 | F25E |
| 0000603160 | C726 | 0C07 | 9A00 | 04EE | 76B4 | C28E | D88B | C726 |
| 0000603200 | 0807 | 8B00 | F646 | 568B | E9F8 | 009B | 568B | 89F8 |
| 0000603220 | 0846 | 5689 | 8A0A | 0646 | 4004 | 5EC4 | FFF6 | F646 |
| 0000603240 | 8826 | C407 | F65E | 46FF | 26F6 | 07C6 | C43A | F65E |
| 0000603260 | 46FF | 26F6 | 07C6 | 8B5C | FA46 | 0305 | 3B00 | 76C6 |
| 0000603300 | 9A19 | 04F6 | 76E7 | 4689 | 89EE | F056 | 5EC4 | 26EE |
| 0000603320 | 07C7 | 0022 | C02B | EB99 | 904E | 76FF | FF06 | F876 |
| 0000603340 | 76FF | 8DF6 | FA46 | 5016 | FF9A | 00FF | 8900 | FE46 |
| 0000603360 | C00B | 2A74 | F69A | FA04 | 8976 | EE46 | 5689 | C4F0 |
| 0000603400 | EE5E | C726 | 0D07 | 9A00 | 04EE | 74DF | 4689 | 89F2 |
| 0000603420 | F456 | 468B | C4FE | F25E | 8926 | EB07 | 90B7 | 468B |
| 0000603440 | 8BF6 | F856 | 032D | 5E00 | CBC9 | 581E | 4590 | 8B55 |
| 0000603460 | 1EEC | D88E | EC81 | 00A0 | 5657 | 106A | 468B | 8B06 |
| 0000603500 | 0856 | 0405 | 5200 | 9A50 | 29CF | 7757 | C483 | 3D06 |
| 0000603520 | 0000 | 0374 | 27E9 | 6A00 | 8B01 | 0646 | 568B | 0508 |
| 0000603540 | 0004 | 5052 | DE9A | A82A | 8377 | 06C4 | 4689 | 83F8 |
| 0000603560 | F87E | 7500 | E903 | 0006 | 468B | E9F8 | 0180 | 5EC4 |
| 0000603600 | 2606 | 87C7 | 0186 | 0070 | 5EC4 | 2606 | 87C7 | 0188 |
| 0000603620 | 0001 | 006A | 016A | 016A | 016A | 0068 | 8B04 | 0646 |
| 0000603640 | 568B | 0508 | 0004 | 5052 | 276A | 468B | 8B06 | 0856 |
| 0000603660 | 0405 | 5201 | 9A50 | 1609 | 7820 | C483 | 8914 | F846 |
| 0000603700 | 7E83 | 00F8 | 0375 | 19E9 | 8100 | F87E | 01B8 | 0374 |
| 0000603720 | 09E9 | B800 | 01AA | 25E9 | E901 | 0006 | 468B | E9F8 |
| 0000603740 | 011C | 5EC4 | 2606 | 87C7 | 0184 | 0000 | 5EC4 | 2606 |
| 0000603760 | 87C7 | 0230 | 0028 | 5EC4 | 2606 | 87C7 | 0232 | 0001 |
| 0000604000 | 006A | 016A | 016A | 0E6A | 056A | 006A | 0E6A | 006A |
| 0000604020 | 016A | 0068 | 8B04 | 0646 | 568B | 0508 | 0004 | 5052 |
| 0000604040 | 276A | 468B | 8B06 | 0856 | AE05 | 5201 | 9A50 | 1B6A |
| 0000604060 | 7859 | C483 | 891E | F846 | 7E83 | 00F8 | 0375 | 33E9 |
| 0000604100 | 8100 | F87E | 01B8 | 0374 | 05E9 | C700 | F846 | 01AA |
| 0000604120 | 468B | 8B06 | 0856 | 0405 | 5200 | 8B50 | 0646 | 568B |
| 0000604140 | 0508 | 0104 | 5052 | 9C9A | FF25 | 83FF | 08C4 | 468B |
| 0000604160 | E9F8 | 008A | 5EC4 | 2606 | 87C7 | 022E | 0000 | 76FF |
| 0000604200 | FF08 | 0676 | DF9A | 917B | 8378 | 04C4 | 4689 | 83F8 |
| 0000604220 | F87E | 7500 | E903 | 0014 | 76FF | FF08 | 0676 | F99A |
| 0000604240 | B078 | 8378 | 04C4 | 468B | E9F8 | 0052 | 468D | 16FA |
| 0000604260 | FF50 | 0C76 | 76FF | FF0A | 0876 | 76FF | 9A06 | B314 |
| 0000604300 | 78CA | C483 | 890C | F846 | 7E83 | 00F8 | 0375 | 14E9 |
| 0000604320 | FF00 | 0876 | 76FF | 9A06 | 78F9 | 670D | C483 | 8B04 |
| 0000604340 | F846 | 19E9 | 8B00 | FA46 | 568B | C4FC | 065E | 8926 |
| 0000604360 | 5887 | 2602 | 9789 | 025A | 00B8 | E900 | 0000 | 5F5E |
| 0000604400 | ED83 | 8B02 | 1FE5 | 4D5D | 1ECB | 9058 | 5545 | EC8B |
| 0000604420 | 8E1E | 81D8 | 0CEC | 5700 | 2B56 | 89C0 | F846 | 4689 |
| 0000604440 | 6AF6 | 8B10 | 0646 | 568B | 0508 | 0004 | 5052 | CF9A |
| 0000604460 | 8029 | 837A | 06C4 | 003D | 7400 | E903 | 0006 | 96B8 |
| 0000604500 | E901 | 01AD | 5EC4 | 2606 | BF83 | 0184 | 7500 | E903 |
| 0000604520 | 000E | 5EC4 | 2606 | BF83 | 022E | 7400 | E903 | 0020 |
| 0000604540 | 76FF | FF08 | 0676 | DF9A | 797B | 8379 | 04C4 | 4689 |
| 0000604560 | 83F4 | F47E | 7500 | E903 | 0006 | 468B | E9F4 | 0171 |
| 0000604600 | 76FF | FF08 | 0676 | 429A | 9EA7 | 8379 | 04C4 | 4689 |
| 0000604620 | 83F4 | F47E | 7500 | E903 | 0006 | 468B | E9F4 | 0151 |
| 0000604640 | 468D | 16FA | FF50 | 0876 | 76FF | 9A06 | AEB0 | 79B8 |
| 0000604660 | C483 | 8908 | F446 | 7E83 | 00F4 | 0375 | 37E9 | FF00 |
| 0000604700 | 0876 | 76FF | 9A06 | A7EF | 79FA | C483 | 3D04 | 0000 |
| 0000604720 | 0374 | 09E9 | 8B00 | F446 | 16E9 | E901 | 0018 | 7E83 |
| 0000604740 | 00F4 | 0374 | 09E9 | B800 | 01F7 | 04E9 | E901 | 0006 |
| 0000604760 | 468B | E9F4 | 00FB | 468D | 16F6 | FF50 | FC76 | 76FF |
| 0000605000 | FFFA | 0876 | 76FF | 9A06 | BD0D | 7A39 | C483 | 890C |

THU MAR 14 17:31:54 1991 DB_PI.DLL PAGE 212, LINE 12450

| | | | | | | | | |
|---|---|---|---|---|---|---|---|---|
| 0000605020 | F446 | 7E83 | 00F4 | 0375 | 5CE9 | 8100 | F47E | 01AB |
| 0000605040 | 0374 | 1BE9 | 8B00 | FA46 | 568B | 89FC | F646 | 5689 |
| 0000605060 | 0BF8 | 75D0 | E903 | 0008 | 46C7 | 00F4 | E900 | 0037 |
| 0000605100 | 76FF | FF08 | 0676 | EF9A | 77A7 | 8378 | 04C4 | 003D |
| 0000605120 | 7400 | E903 | 0009 | 468B | E9F4 | 0095 | 18E9 | 8300 |
| 0000605140 | F47E | 7400 | E903 | 0009 | F7B8 | E901 | 0083 | 06E9 |
| 0000605160 | 8B00 | F446 | 7AE9 | 8B00 | 0646 | 568B | 0508 | 0004 |
| 0000605200 | 5052 | 468B | 8B06 | 0856 | 0405 | 5201 | 9A50 | 259C |
| 0000605220 | 773A | C483 | 8908 | F446 | 7E83 | 00F4 | 0375 | 06E9 |
| 0000605240 | 8800 | F446 | 4AE9 | C400 | 065E | C726 | 8487 | 0201 |
| 0000605260 | 8B00 | 0646 | 568B | 0508 | 0004 | 5052 | 468B | 8B06 |
| 0000605300 | 0856 | AE05 | 5201 | 9A50 | 259C | 7921 | C483 | 8908 |
| 0000605320 | F446 | 7E83 | 00F4 | 0375 | 06E9 | 8B00 | F446 | 10E9 |
| 0000605340 | C400 | 065E | C726 | 2E87 | 0202 | B800 | 0000 | 00E9 |
| 0000605360 | 5E0D | 835F | 02ED | E58B | 5D1F | CB4D | 581E | 4590 |
| 0000605400 | 8B55 | 1EEC | D88E | EC81 | 0010 | 5657 | 46C7 | 04F6 |
| 0000605420 | C400 | 065E | C02B | 8926 | 8C87 | 2601 | 8789 | 018A |
| 0000605440 | 46C7 | 28F4 | E900 | 0003 | 46FF | 83F4 | F47E | 7C2D |
| 0000605460 | E903 | 00AA | 668A | 2AF4 | 2BC0 | 83C9 | FFC9 | FF0D |
| 0000605500 | 8900 | F04E | 4689 | 8DF2 | F046 | 5016 | 4E8D | 16F5 |
| 0000605520 | 1651 | 6A50 | 6A00 | 8B3D | 064E | 568B | 8108 | 04C1 |
| 0000605540 | 5201 | 9A51 | D81B | 7959 | C483 | 8914 | FC46 | 7E83 |
| 0000605560 | 00FC | 0374 | 4AE9 | 8B00 | F046 | 568B | 25F2 | FFFF |
| 0000605600 | E283 | 8903 | F846 | 5689 | 8BFA | F846 | 568B | C4FA |
| 0000605620 | 065E | 3926 | 8C97 | 7601 | E903 | 0022 | 0373 | 0AE9 |
| 0000605640 | 2600 | 8739 | 018A | 0372 | 13E9 | 8B00 | F846 | 568B |
| 0000605660 | C4FA | 065E | 8926 | 8A87 | 2601 | 9789 | 018C | 1AE9 |
| 0000605700 | 8100 | FC7E | 01AB | 0375 | 10E9 | 8100 | FC7E | 01BC |
| 0000605720 | 0375 | 06E9 | 8B00 | FC46 | 09E9 | E900 | FF4A | 00B8 |
| 0000605740 | E900 | 0000 | 5F5E | ED83 | 8B02 | 1FE5 | 4D5D | 1ECB |
| 0000605760 | 9058 | 5545 | EC8B | 8E1E | 81D8 | 04EC | 5701 | 8B56 |
| 0000606000 | 0646 | 568B | 0508 | 0004 | 5052 | 868D | FEFC | 5016 |
| 0000606020 | 509A | 1527 | 837C | 08C4 | 681E | 3722 | 868D | FEFC |
| 0000606040 | 5016 | 0A9A | 2E27 | 837C | 08C4 | 468B | 8B06 | 0856 |
| 0000606060 | 8E05 | 5201 | 8D50 | FC86 | 16FE | 9A50 | 270A | 7C9A |
| 0000606100 | C483 | 6A08 | 8D2F | FC86 | 16FE | 9A50 | 29CF | 7C7A |
| 0000606120 | C483 | 3D06 | 0000 | 0374 | 06E9 | B800 | 0196 | 41E9 |
| 0000606140 | C401 | 065E | C726 | 8687 | 7001 | 6A00 | 6A00 | 6A01 |
| 0000606160 | 8B01 | 0646 | 568B | 0508 | 0004 | 5052 | 468B | 8B06 |
| 0000606200 | 0856 | 0405 | 5201 | 9A50 | 0D63 | 7D00 | C483 | 890E |
| 0000606220 | FC46 | 7E83 | 00FC | 0375 | 06E9 | 8B00 | FC46 | 01E9 |
| 0000606240 | FF01 | 0876 | 76FF | 9A06 | 7AEC | 7CC5 | C483 | 8904 |
| 0000606260 | FC46 | 7E83 | 00FC | 0375 | 06E9 | 8B00 | FC46 | E1E9 |
| 0000606300 | 8B00 | 0646 | 568B | 0508 | 0004 | 5052 | 868D | FEFC |
| 0000606320 | 5016 | 509A | D727 | 837C | 08C4 | 681E | 3724 | 868D |
| 0000606340 | FEFC | 5016 | 0A9A | F027 | 837C | 08C4 | 468B | 8B06 |
| 0000606360 | 0856 | 3805 | 5202 | 8D50 | FC86 | 16FE | 9A50 | 270A |
| 0000606400 | 7D56 | C483 | 6A08 | 8D2F | FC86 | 16FE | 9A50 | 29CF |
| 0000606420 | 7D3C | C483 | 3D06 | 0000 | 0374 | 06E9 | B800 | 0196 |
| 0000606440 | 7FE9 | C400 | 065E | C726 | 3087 | 2802 | 6A00 | 6A00 |
| 0000606460 | 6A01 | 8B01 | 0646 | 568B | 0508 | 0004 | 5052 | 468B |
| 0000606500 | 8B06 | 0856 | AE05 | 5201 | 9A50 | 0D63 | 7ABA | C483 |
| 0000606520 | 890E | FC46 | 7E83 | 00FC | 0375 | 14E9 | FF00 | 0876 |
| 0000606540 | 76FF | 9A06 | 7D9D | 7D75 | C483 | 8B04 | FC46 | 31E9 |
| 0000606560 | 8B00 | 0646 | 568B | 0508 | 0258 | 5052 | 76FF | FF08 |
| 0000606600 | 0676 | B09A | 56AE | 837B | 08C4 | 4689 | 83FC | FC7E |
| 0000606620 | 7500 | E903 | 0006 | 468B | E9FC | 0006 | 00B8 | E900 |
| 0000606640 | 0000 | 5F5E | ED83 | 8B02 | 1FE5 | 4D5D | 1ECB | 9058 |
| 0000606660 | 5545 | EC8B | 8E1E | 81D8 | 04EC | 5700 | 8B56 | 0646 |

THU MAR 14 17:31:54 1991 DB_PI.DLL PAGE 213, LINE 12509

| | | | | | | | | |
|---|---|---|---|---|---|---|---|---|
| 0000606700 | 568B | 0508 | 0104 | 5052 | 5E9A | E014 | 837D | 04C4 |
| 0000606720 | 4689 | 83FC | FC7E | 7500 | E903 | 0006 | 468B | E9FC |
| 0000606740 | 002B | 468B | 8B06 | 0856 | AE05 | 5201 | 9A50 | 145E |
| 0000606760 | 7C3E | C483 | 8904 | FC46 | 7E83 | 00FC | 0375 | 06E9 |
| 0000607000 | 8B00 | FC46 | 06E9 | B800 | 0000 | 00E9 | 5E00 | 835F |
| 0000607020 | 02ED | E58B | 5D1F | CB4D | 581E | 4590 | 8B55 | 1EEC |
| 0000607040 | D88E | EC81 | 0302 | 5657 | 5EC4 | 2614 | 07C7 | 0001 |
| 0000607060 | 868D | FE06 | 4689 | 8CF6 | F856 | 86C7 | FCFE | 01F0 |
| 0000607100 | 76FF | FFF8 | F676 | 868D | FCFE | 5016 | 468D | 160A |
| 0000607120 | 8B50 | 0646 | 568B | 0508 | 0104 | 5052 | BE9A | 81D6 |
| 0000607140 | 837E | 10C4 | 8689 | FE04 | BE83 | FE04 | 7500 | E903 |
| 0000607160 | 0007 | 868B | FE04 | F9E9 | C401 | F65E | 8B26 | 2E47 |
| 0000607200 | 4603 | 8BF6 | F856 | 5052 | 76FF | FF1A | 1876 | 509A |
| 0000607220 | C427 | 837E | 08C4 | 106A | 76FF | FF1A | 1876 | CF9A |
| 0000607240 | BB29 | 837D | 06C4 | 003D | 7400 | E903 | 0061 | 7E83 |
| 0000607260 | 0012 | 0375 | 46E9 | 8D00 | 0086 | 16FD | 6A50 | FF01 |
| 0000607300 | 0C76 | 76FF | FF0A | 1076 | 76FF | FF0E | 0876 | 76FF |
| 0000607320 | 9A06 | 833D | 7F26 | C483 | 8912 | 0486 | 83FE | 04BE |
| 0000607340 | 00FE | 0375 | 0BE9 | C400 | 145E | C726 | 6607 | E900 |
| 0000607360 | 0008 | 5EC4 | 2614 | 07C7 | 0065 | 08E9 | C400 | 145E |
| 0000607400 | C726 | 0207 | 8B00 | 0486 | E9FE | 0166 | 5DE9 | 8A01 |
| 0000607420 | 0D46 | E42A | 293D | 7400 | E903 | 0150 | 468D | 16FA |
| 0000607440 | 6A50 | 1EFF | 2668 | FF37 | 0C76 | 76FF | FF0A | 0876 |
| 0000607460 | 76FF | 9A06 | C803 | 7F6A | C483 | 8912 | 0486 | 83FE |
| 0000607500 | 04BE | 00FE | 0375 | 6FE9 | 8100 | 04BE | ABFE | 7401 |
| 0000607520 | E903 | 005A | 7E83 | 0012 | 0375 | 46E9 | 8D00 | 0086 |
| 0000607540 | 16FD | 6A50 | FF01 | 0C76 | 76FF | FF0A | 1076 | 76FF |
| 0000607560 | FF0E | 0876 | 76FF | 9A06 | 833D | 7FCA | C483 | 8912 |
| 0000607600 | 0486 | 83FE | 04BE | 00FE | 0375 | 0BE9 | C400 | 145E |
| 0000607620 | C726 | 6607 | E900 | 0008 | 5EC4 | 2614 | 07C7 | 0067 |
| 0000607640 | 08E9 | C400 | 145E | C726 | 0307 | E900 | 0007 | 868B |
| 0000607660 | FE04 | BDE9 | E900 | 00B4 | 868D | FD04 | 5016 | 76FF |
| 0000607700 | FF16 | 1476 | 76FF | 1E12 | 2968 | FF37 | FC76 | 76FF |
| 0000607720 | FFFA | 0876 | 76FF | 9A06 | 7E08 | 800E | C483 | 8916 |
| 0000607740 | 0486 | 83FE | 04BE | 00FE | 0375 | 6BE9 | 8100 | 04BE |
| 0000607760 | ADFE | 7401 | E903 | 0056 | 7E83 | 0012 | 0375 | 4DE9 |
| 0000610000 | 8D00 | 0086 | 16FD | 6A50 | FF01 | 0C76 | 76FF | FF0A |
| 0000610020 | 1076 | 76FF | FF0E | 0876 | 76FF | 9A06 | 833D | 7C03 |
| 0000610040 | C483 | 8912 | 0486 | 83FE | 04BE | 00FE | 0375 | 12E9 |
| 0000610060 | C400 | 145E | C726 | 6607 | 8B00 | 0486 | E9FE | 0032 |
| 0000610100 | 08E9 | C400 | 145E | C726 | 6707 | E900 | 0007 | 868B |
| 0000610120 | FE04 | 1DE9 | E900 | 0014 | 5EC4 | 2614 | 3F83 | 7501 |
| 0000610140 | E903 | 0008 | 5EC4 | 2614 | 07C7 | 0003 | 00B8 | E900 |
| 0000610160 | 0000 | 5F5E | ED83 | 8B02 | 1FE5 | 4D5D | 00CB | 581E |
| 0000610200 | 4590 | 8B55 | 1EEC | D88E | EC81 | 0024 | 5657 | 76FF |
| 0000610220 | FF08 | 0676 | 429A | C5A7 | 8380 | 04C4 | 4689 | 3DDC |
| 0000610240 | 0000 | 0375 | 06E9 | 8B00 | DC46 | F8E9 | 8D01 | DE46 |
| 0000610260 | 5016 | 76FF | FF14 | 1276 | 3D9A | 9142 | 837E | 08C4 |
| 0000610300 | 4689 | 83DC | DC7E | 7500 | E903 | 0037 | 76FF | FF08 |
| 0000610320 | 0676 | EF9A | 12A7 | 8381 | 04C4 | 003D | 7400 | E903 |
| 0000610340 | 0009 | 468B | E9DC | 01BD | 18E9 | 8300 | DC7E | 7400 |
| 0000610360 | E903 | 0009 | F7B8 | E901 | 01AB | 06E9 | 8B00 | DC46 |
| 0000610400 | A2E9 | 8B01 | 1046 | 460B | 740E | E903 | 005C | 468D |
| 0000610420 | 160E | FF50 | 0C76 | 76FF | FF0A | 0876 | 76FF | 9A06 |
| 0000610440 | A92F | 812C | C483 | 890C | DC46 | 7E83 | 00DC | 0375 |
| 0000610460 | 37E9 | FF00 | 0876 | 76FF | 9A06 | A7EF | 8176 | C483 |
| 0000610500 | 3D04 | 0000 | 0374 | 09E9 | 8B00 | DC46 | 56E9 | E901 |
| 0000610520 | 0018 | 7E83 | 00DC | 0374 | 09E9 | B800 | 01F7 | 44E9 |
| 0000610540 | E901 | 0006 | 468B | E9DC | 013B | 76FF | FF1E | 1C76 |

THU MAR 14 17:31:54 1991 DB_PI.DLL PAGE 214, LINE 12568

| | | | | | | | | |
|---|---|---|---|---|---|---|---|---|
| 0000610560 | FF6A | 468D | 16DE | FF50 | 1076 | 76FF | FF0E | 0876 |
| 0000610600 | 76FF | 9A06 | C803 | 819A | C483 | 8912 | DC46 | 7E81 |
| 0000610620 | ABDC | 7501 | E903 | 0074 | 7E83 | 00DC | 0374 | 34E9 |
| 0000610640 | FF00 | 0876 | 76FF | 9A06 | A7EF | 81CE | C483 | 3D04 |
| 0000610660 | 0000 | 0374 | 09E9 | B800 | 01AA | E8E9 | E900 | 0012 |
| 0000610700 | 09E9 | B800 | 01F7 | DCE9 | E900 | 0006 | AAB8 | E901 |
| 0000610720 | 00D3 | 37E9 | FF00 | 0876 | 76FF | 9A06 | A7EF | 821F |
| 0000610740 | C483 | 3D04 | 0000 | 0374 | 09E9 | 8B00 | DC46 | B4E9 |
| 0000610760 | E900 | 0018 | 7E83 | 00DC | 0374 | 09E9 | B800 | 01F7 |
| 0000611000 | A2E9 | E900 | 0006 | 468B | E9DC | 0099 | 76FF | FF1E |
| 0000611020 | 1C76 | 76FF | FF1A | 1876 | 76FF | 8D16 | DE46 | 5016 |
| 0000611040 | 76FF | FF10 | 0E76 | 76FF | FF08 | 0676 | 0D9A | 39BC |
| 0000611060 | 8382 | 16C4 | 4689 | 83DC | DC7E | 7500 | E903 | 0037 |
| 0000611100 | 76FF | FF08 | 0676 | EF9A | 70A7 | 8382 | 04C4 | 003D |
| 0000611120 | 7400 | E903 | 0009 | 468B | E9DC | 0049 | 18E9 | 8300 |
| 0000611140 | DC7E | 7400 | E903 | 0009 | F7B8 | E901 | 0037 | 06E9 |
| 0000611160 | 8B00 | DC46 | 2EE9 | FF00 | 0876 | 76FF | 9A06 | A7EF |
| 0000611200 | 7E4F | C483 | 3D04 | 0000 | 0374 | 09E9 | B800 | 0000 |
| 0000611220 | 12E9 | E900 | 000F | F7B8 | E901 | 0009 | 06E9 | B800 |
| 0000611240 | 0000 | 00E9 | 5E00 | 835F | 02ED | E58B | 5D1F | CB4D |
| 0000611260 | 581E | 4590 | 8B55 | 1EEC | D88E | EC81 | 0204 | 5657 |
| 0000611300 | 468B | 0B0C | 0A46 | 0374 | 06E9 | B800 | 0017 | 71E9 |
| 0000611320 | 8D00 | FC86 | 16FD | 8D50 | FC86 | 16FE | FF50 | 0C76 |
| 0000611340 | 76FF | 9A0A | ADF1 | 8315 | C483 | 890C | FC46 | 7E83 |
| 0000611360 | 00FC | 0375 | 06E9 | 8B00 | FC46 | 45E9 | FF00 | 1676 |
| 0000611400 | 76FF | FF14 | 1276 | 76FF | FF10 | 0E76 | 868D | FDFC |
| 0000611420 | 5016 | 006A | 006A | 868D | FEFC | 5016 | 76FF | FF08 |
| 0000611440 | 0676 | 6E9A | 8780 | 8380 | 1AC4 | 4689 | 83FC | FC7E |
| 0000611460 | 7500 | E903 | 0006 | 468B | E9FC | 0006 | 00B8 | E900 |
| 0000611500 | 0000 | 5F5E | ED83 | 8B02 | 1FE5 | 4D5D | 1ECB | 9058 |
| 0000611520 | 5545 | EC8B | 8E1E | 81D8 | 0CEC | 5700 | C456 | 145E |
| 0000611540 | C02B | 8926 | 0247 | 8926 | FF07 | 0876 | 76FF | 9A06 |
| 0000611560 | A742 | 8397 | C483 | 8904 | F446 | 003D | 7500 | E903 |
| 0000611600 | 0006 | 468B | E9F4 | 02BF | 468B | 0B10 | 0E46 | 0374 |
| 0000611620 | 98E9 | 8B00 | 0C46 | 460B | 740A | E903 | 0031 | 76FF |
| 0000611640 | FF08 | 0676 | EF9A | D3A7 | 8383 | 04C4 | 003D | 7400 |
| 0000611660 | E903 | 0009 | 17B8 | E900 | 028D | 12E9 | E900 | 0009 |
| 0000611700 | F7B8 | E901 | 0281 | 06E9 | B800 | 0017 | 78E9 | 8D02 |
| 0000611720 | 0E46 | 5016 | 76FF | FF0C | 0A76 | 76FF | FF08 | 0676 |
| 0000611740 | 2F9A | EDA9 | 8383 | 0CC4 | 4689 | 83F4 | F47E | 7500 |
| 0000611760 | E903 | 0037 | 76FF | FF08 | 0676 | EF9A | 29A7 | 8384 |
| 0000612000 | 04C4 | 003D | 7400 | E903 | 0009 | 468B | E9F4 | 0237 |
| 0000612020 | 18E9 | 8300 | F47E | 7400 | E903 | 0009 | F7B8 | E901 |
| 0000612040 | 0225 | 06E9 | 8B00 | F446 | 1CE9 | 8D02 | FA46 | 5016 |
| 0000612060 | 76FF | FF08 | 0676 | B09A | 43AE | 8384 | 08C4 | 4689 |
| 0000612100 | 83F4 | F47E | 7500 | E903 | 0037 | 76FF | FF08 | 0676 |
| 0000612120 | EF9A | 90A7 | 8384 | 04C4 | 003D | 7400 | E903 | 0009 |
| 0000612140 | 468B | E9F4 | 01E1 | 18E9 | 8300 | F47E | 7400 | E903 |
| 0000612160 | 0009 | F7B8 | E901 | 01CF | 06E9 | 8B00 | F446 | C6E9 |
| 0000612200 | 8B01 | 0E46 | 568B | 3910 | FA46 | 0374 | 39E9 | 3900 |
| 0000612220 | FC56 | 0374 | 31E9 | FF00 | 0876 | 76FF | 9A06 | A7EF |
| 0000612240 | 84CE | C483 | 3D04 | 0000 | 0374 | 09E9 | B800 | 01AE |
| 0000612260 | 94E9 | E901 | 0012 | 09E9 | B800 | 01F7 | 88E9 | E901 |
| 0000612300 | 0006 | AEB8 | E901 | 017F | 468A | 2A11 | 3DE4 | 002A |
| 0000612320 | 0374 | 31E9 | FF00 | 0876 | 76FF | 9A06 | A7EF | 8526 |
| 0000612340 | C483 | 3D04 | 0000 | 0374 | 09E9 | B800 | 01AD | 56E9 |
| 0000612360 | E901 | 0012 | 09E9 | B800 | 01F7 | 4AE9 | E901 | 0006 |
| 0000612400 | ADB8 | E901 | 0141 | 7E83 | 0112 | 0375 | ADE9 | 8A00 |
| 0000612420 | 1146 | E42A | 283D | 7400 | E903 | 00A0 | 468D | 16F6 |

THU MAR 14 17:31:54 1991 DB_PI.DLL PAGE 215, LINE 12627

| | | | | | | | | |
|---|---|---|---|---|---|---|---|---|
| 0000612440 | 6A50 | 6A00 | 6A00 | FF00 | 1076 | 76FF | FF0E | 0876 |
| 0000612460 | 76FF | 9A06 | C803 | 854A | C483 | 8912 | F446 | 7E81 |
| 0000612500 | ABF4 | 7501 | E903 | 0074 | 7E83 | 00F4 | 0374 | 34E9 |
| 0000612520 | FF00 | 0876 | 76FF | 9A06 | A7EF | 857E | C483 | 3D04 |
| 0000612540 | 0000 | 0374 | 09E9 | B800 | 01AA | DAE9 | E900 | 0012 |
| 0000612560 | 09E9 | B800 | 01F7 | CEE9 | E900 | 0006 | AAB8 | E901 |
| 0000612600 | 00C5 | 37E9 | FF00 | 0876 | 76FF | 9A06 | A7EF | 85C1 |
| 0000612620 | C483 | 3D04 | 0000 | 0374 | 09E9 | 8B00 | F446 | A6E9 |
| 0000612640 | E900 | 0018 | 7E83 | 00F4 | 0374 | 09E9 | B800 | 01F7 |
| 0000612660 | 94E9 | E900 | 0006 | 468B | E9F4 | 008B | 76FF | FF16 |
| 0000612700 | 1476 | 76FF | FF10 | 0E76 | 76FF | FF08 | 0676 | 0D9A |
| 0000612720 | DBBD | 8385 | 0CC4 | 4689 | 83F4 | F47E | 7500 | E903 |
| 0000612740 | 0037 | 76FF | FF08 | 0676 | EF9A | 12A7 | 8386 | 04C4 |
| 0000612760 | 003D | 7400 | E903 | 0009 | 468B | E9F4 | 0049 | 18E9 |
| 0000613000 | 8300 | F47E | 7400 | E903 | 0009 | F7B8 | E901 | 0037 |
| 0000613020 | 06E9 | 8B00 | F446 | 2EE9 | FF00 | 0876 | 76FF | 9A06 |
| 0000613040 | A7EF | 82D6 | C483 | 3D04 | 0000 | 0374 | 09E9 | B800 |
| 0000613060 | 0000 | 12E9 | E900 | 000F | F7B8 | E901 | 0009 | 06E9 |
| 0000613100 | B800 | 0000 | 00E9 | 5E00 | 835F | 02ED | E58B | 5D1F |
| 0000613120 | CB4D | 581E | 4590 | 8B55 | 1EEC | D88E | EC81 | 007A |
| 0000613140 | 5657 | 5EC4 | 2B12 | 26C0 | 4789 | 2602 | 0789 | 76FF |
| 0000613160 | FF08 | 0676 | 429A | 62A7 | 8383 | 04C4 | 4689 | 3DF8 |
| 0000613200 | 0000 | 0375 | 06E9 | 8B00 | F846 | B3E9 | 8B02 | 1046 |
| 0000613220 | 460B | 740E | E903 | 005C | 468D | 160E | FF50 | 0C76 |
| 0000613240 | 76FF | FF0A | 0876 | 76FF | 9A06 | A92F | 86B6 | C483 |
| 0000613260 | 890C | F846 | 7E83 | 00F8 | 0375 | 37E9 | FF00 | 0876 |
| 0000613300 | 76FF | 9A06 | A7EF | 8706 | C483 | 3D04 | 0000 | 0374 |
| 0000613320 | 09E9 | 8B00 | F846 | 67E9 | E902 | 0018 | 7E83 | 00F8 |
| 0000613340 | 0374 | 09E9 | B800 | 01F7 | 55E9 | E902 | 0006 | 468B |
| 0000613360 | E9F8 | 024C | 46C7 | 7086 | 8D00 | 8846 | 5016 | 468D |
| 0000613400 | 1686 | 8D50 | 0E46 | 5016 | 468B | 8B06 | 0856 | 0405 |
| 0000613420 | 5201 | 9A50 | D6BE | 872A | C483 | 8910 | F846 | 7E83 |
| 0000613440 | 00F8 | 0375 | 41E9 | 8100 | F87E | 01FA | 0375 | 37E9 |
| 0000613460 | FF00 | 0876 | 76FF | 9A06 | A7EF | 875D | C483 | 3D04 |
| 0000613500 | 0000 | 0374 | 09E9 | 8B00 | F846 | F3E9 | E901 | 0018 |
| 0000613520 | 7E83 | 00F8 | 0374 | 09E9 | B800 | 01F7 | E1E9 | E901 |
| 0000613540 | 0006 | 468B | E9F8 | 01D8 | 4C6A | 3E9A | 8424 | 8387 |
| 0000613560 | 02C4 | 5EC4 | 2612 | 0789 | 8926 | 0257 | 5EC4 | 2612 |
| 0000613600 | 478B | 2602 | 070B | 0374 | 31E9 | FF00 | 0876 | 76FF |
| 0000613620 | 9A06 | A7EF | 87D6 | C483 | 3D04 | 0000 | 0374 | 09E9 |
| 0000613640 | B800 | 0007 | 99E9 | E901 | 0012 | 09E9 | B800 | 01F7 |
| 0000613660 | 8DE9 | E901 | 0006 | 07B8 | E900 | 0184 | 468B | 8B88 |
| 0000613700 | 8A56 | 5EC4 | 2612 | 1FC4 | 8926 | 2607 | 5789 | 8D02 |
| 0000613720 | 8C46 | 5016 | 5EC4 | 2612 | 078B | 8B26 | 0257 | 0405 |
| 0000613740 | 5200 | 9A50 | 2750 | 8806 | C483 | 8B08 | AC46 | 568B |
| 0000613760 | C4AE | 125E | C426 | 261F | 4789 | 2624 | 5789 | C426 |
| 0000614000 | 125E | C426 | 261F | 47C6 | 0028 | 468B | 89B4 | 8646 |
| 0000614020 | 76FF | 9A86 | 243E | 8825 | C483 | 8902 | FA46 | 5689 |
| 0000614040 | 8BFC | FC46 | 460B | 74FA | E903 | 0031 | 76FF | FF08 |
| 0000614060 | 0676 | EF9A | 6BA7 | 8388 | 04C4 | 003D | 7400 | E903 |
| 0000614100 | 0009 | 07B8 | E900 | 00F8 | 12E9 | E900 | 0009 | F7B8 |
| 0000614120 | E901 | 00EC | 06E9 | B800 | 0007 | E3E9 | FF00 | FC76 |
| 0000614140 | 76FF | 8DFA | 8646 | 5016 | 468D | 160E | 8B50 | 0646 |
| 0000614160 | 568B | 0508 | 0104 | 5052 | BE9A | 8ED6 | 8388 | 10C4 |
| 0000614200 | 4689 | 83F8 | F87E | 7400 | E903 | 006F | 5EC4 | 26FA |
| 0000614220 | 478B | 032E | FA46 | 568B | 52FC | 9A50 | 27B0 | 8898 |
| 0000614240 | C483 | 4004 | 9A50 | 243E | 88DE | C483 | C402 | 125E |
| 0000614260 | C426 | 261F | 4789 | 2648 | 5789 | C44A | 125E | C426 |
| 0000614300 | 261F | 478B | 264A | 470B | 7548 | E903 | 0028 | 5EC4 |

THU MAR 14 17:31:54 1991 DB_PI.DLL PAGE 216, LINE 12686

| | | | | | | | | |
|---|---|---|---|---|---|---|---|---|
| 0000614320 | 26FA | 478B | 032E | FA46 | 568B | 52FC | C450 | 125E |
| 0000614340 | C426 | 261F | 77FF | 264A | 77FF | 9A48 | 2750 | 88F4 |
| 0000614360 | C483 | E908 | 0005 | 46C7 | D7F8 | FF00 | FC76 | 76FF |
| 0000614400 | 9AFA | 2448 | 8902 | C483 | FF04 | 0876 | 76FF | 9A06 |
| 0000614420 | A7EF | 8667 | C483 | 3D04 | 0000 | 0374 | 09E9 | 8B00 |
| 0000614440 | F846 | 1BE9 | E900 | 0018 | 7E83 | 00F8 | 0374 | 09E9 |
| 0000614460 | B800 | 01F7 | 09E9 | E900 | 0006 | 468B | E9F8 | 0000 |
| 0000614500 | 5F5E | ED83 | 8B02 | 1FE5 | 4D5D | 1ECB | 9058 | 5545 |
| 0000614520 | EC8B | 8E1E | 81D8 | 04EC | 5700 | FF56 | 0876 | 76FF |
| 0000614540 | 9A06 | A742 | 897F | C483 | 8904 | FC46 | 003D | 7500 |
| 0000614560 | E903 | 0006 | 468B | E9FC | 0054 | 76FF | FF10 | 0E76 |
| 0000614600 | 76FF | FF0C | 0A76 | 76FF | FF08 | 0676 | 2F9A | 90A9 |
| 0000614620 | 8389 | 0CC4 | 4689 | FFFC | 0876 | 76FF | 9A06 | A7EF |
| 0000614640 | 869C | C483 | 3D04 | 0000 | 0374 | 09E9 | 8B00 | FC46 |
| 0000614660 | 1BE9 | E900 | 0018 | 7E83 | 00FC | 0374 | 09E9 | B800 |
| 0000614700 | 01F7 | 09E9 | E900 | 0006 | 468B | E9FC | 0000 | 5F5E |
| 0000614720 | ED83 | 8B02 | 1FE5 | 4D5D | 1ECB | 9058 | 5545 | EC8B |
| 0000614740 | 8E1E | 81D8 | 04EC | 5700 | FF56 | 0876 | 76FF | 9A06 |
| 0000614760 | A742 | 8A17 | C483 | 8904 | FC46 | 003D | 7500 | E903 |
| 0000615000 | 0006 | 468B | E9FC | 00C1 | 468B | 0B10 | 0E46 | 0374 |
| 0000615020 | 5CE9 | 8D00 | 0E46 | 5016 | 76FF | FF0C | 0A76 | 76FF |
| 0000615040 | FF08 | 0676 | 2F9A | 31A9 | 838A | 0CC4 | 4689 | 83FC |
| 0000615060 | FC7E | 7500 | E903 | 0037 | 76FF | FF08 | 0676 | EF9A |
| 0000615100 | 7AA7 | 838A | 04C4 | 003D | 7400 | E903 | 0009 | 468B |
| 0000615120 | E9FC | 0075 | 18E9 | 8300 | FC7E | 7400 | E903 | 0009 |
| 0000615140 | F7B8 | E901 | 0063 | 06E9 | 8B00 | FC46 | 5AE9 | FF00 |
| 0000615160 | 1876 | 76FF | FF16 | 1476 | 76FF | FF12 | 1076 | 76FF |
| 0000615200 | FF0E | 0876 | 76FF | 9A06 | ABB7 | 8A8B | C483 | 8910 |
| 0000615220 | FC46 | 76FF | FF08 | 0676 | EF9A | 54A7 | 8389 | 04C4 |
| 0000615240 | 003D | 7400 | E903 | 0009 | 468B | E9FC | 001B | 18E9 |
| 0000615260 | 8300 | FC7E | 7400 | E903 | 0009 | F7B8 | E901 | 0009 |
| 0000615300 | 06E9 | 8B00 | FC46 | 00E9 | 5E00 | 835F | 02ED | E58B |
| 0000615320 | 5D1F | CB4D | 581E | 4590 | 8B55 | 1EEC | D88E | EC81 |
| 0000615340 | 0004 | 5657 | 76FF | FF08 | 0676 | 429A | 12A7 | 838B |
| 0000615360 | 04C4 | 4689 | 3DFC | 0000 | 0375 | 06E9 | 8B00 | FC46 |
| 0000615400 | C3E9 | 8B00 | 1046 | 460B | 740E | E903 | 005C | 468D |
| 0000615420 | 160E | FF50 | 0C76 | 76FF | FF0A | 0876 | 76FF | 9A06 |
| 0000615440 | A92F | 8B2C | C483 | 890C | FC46 | 7E83 | 00FC | 0375 |
| 0000615460 | 37E9 | FF00 | 0876 | 76FF | 9A06 | A7EF | 8B77 | C483 |
| 0000615500 | 3D04 | 0000 | 0374 | 09E9 | 8B00 | FC46 | 77E9 | E900 |
| 0000615520 | 0018 | 7E83 | 00FC | 0374 | 09E9 | B800 | 01F7 | 65E9 |
| 0000615540 | E900 | 0006 | 468B | E9FC | 005C | 76FF | FF18 | 1676 |
| 0000615560 | FF6A | 76FF | FF14 | 1276 | 76FF | FF10 | 0E76 | 76FF |
| 0000615600 | FF08 | 0676 | 039A | 88C8 | 838B | 12C4 | 4689 | FFFC |
| 0000615620 | 0876 | 76FF | 9A06 | A7EF | 89E2 | C483 | 3D04 | 0000 |
| 0000615640 | 0374 | 09E9 | 8B00 | FC46 | 1BE9 | E900 | 0018 | 7E83 |
| 0000615660 | 00FC | 0374 | 09E9 | B800 | 01F7 | 09E9 | E900 | 0006 |
| 0000615700 | 468B | E9FC | 0000 | 5F5E | ED83 | 8B02 | 1FE5 | 4D5D |
| 0000615720 | 1ECB | 9058 | 5545 | EC8B | 8E1E | 81D8 | 04EC | 5700 |
| 0000615740 | C456 | 0E5E | 8B26 | C407 | 125E | 3926 | 7407 | E903 |
| 0000615760 | 0040 | 5EC4 | 2612 | 0783 | C40A | 125E | 6B26 | 2407 |
| 0000616000 | C450 | 165E | FF26 | 0277 | FF26 | 9A37 | 32A4 | 8ADD |
| 0000616020 | C483 | C406 | 165E | 8926 | 2607 | 5789 | C402 | 165E |
| 0000616040 | 8B26 | 0247 | 0B26 | 7407 | E903 | 0006 | 07B8 | E900 |
| 0000616060 | 0111 | 46C7 | 00FC | C400 | 0E5E | 468B | 26FC | 0739 |
| 0000616100 | 0377 | 31E9 | C400 | 165E | 8B26 | 2607 | 578B | 6B02 |
| 0000616120 | FC4E | 0324 | 05C1 | 0004 | 5052 | 76FF | FF0C | 0A76 |
| 0000616140 | 869A | A927 | 838C | 08C4 | 003D | 7F00 | E903 | 0006 |
| 0000616160 | 46FF | E9FC | FFC1 | 5EC4 | 8B0E | FC46 | 3926 | 7407 |

THU MAR 14 17:31:54 1991 DB_PI.DLL PAGE 217, LINE 12745

| | | | | | | | | |
|---|---|---|---|---|---|---|---|---|
| 0000616200 | E903 | 003D | 468B | 8B06 | 0856 | 5EC4 | 2616 | 1FC4 |
| 0000616220 | 766B | 24FC | 8926 | 2600 | 5089 | FF02 | 0C76 | 76FF |
| 0000616240 | C40A | 165E | 8B26 | 2607 | 578B | 6B02 | FC4E | 0324 |
| 0000616260 | 05C1 | 0004 | 5052 | 509A | E827 | 838C | 08C4 | 76E9 |
| 0000616300 | C400 | 0E5E | 8B26 | 2B07 | FC46 | C06B | 5024 | 5EC4 |
| 0000616320 | 2616 | 078B | 8B26 | 0257 | 4E6B | 24FC | C103 | 5052 |
| 0000616340 | 5EC4 | 2616 | 078B | 8B26 | 0257 | 4E6B | 24FC | C103 |
| 0000616360 | 2405 | 5200 | 9A50 | 3D0A | 8D22 | C483 | 8B0A | 0646 |
| 0000616400 | 568B | C408 | 165E | C426 | 6B1F | FC76 | 2624 | 0089 |
| 0000616420 | 8926 | 0250 | 76FF | FF0C | 0A76 | 5EC4 | 2616 | 078B |
| 0000616440 | 8B26 | 0257 | 4E6B | 24FC | C103 | 0405 | 5200 | 9A50 |
| 0000616460 | 2750 | 8BFE | C483 | C408 | 0E5E | FF26 | B807 | 0000 |
| 0000616500 | 00E9 | 5E00 | 835F | 02ED | E58B | 5D1F | CB4D | 581E |
| 0000616520 | 4590 | 8B55 | 1EEC | D88E | EC81 | 007A | 5657 | 46C7 |
| 0000616540 | 0086 | FF00 | 0876 | 76FF | 9A06 | A742 | 8D91 | C483 |
| 0000616560 | 8904 | FA46 | 003D | 7500 | E903 | 0006 | 468B | E9FA |
| 0000616600 | 02FB | 468B | 0B10 | 0E46 | 0374 | 5CE9 | 8D00 | 0E46 |
| 0000616620 | 5016 | 76FF | FF0C | 0A76 | 76FF | FF08 | 0676 | 2F9A |
| 0000616640 | ABA9 | 838D | 0CC4 | 4689 | 83FA | FA7E | 7500 | E903 |
| 0000616660 | 0037 | 76FF | FF08 | 0676 | EF9A | F9A7 | 838D | 04C4 |
| 0000616700 | 003D | 7400 | E903 | 0009 | 468B | E9FA | 02AF | 18E9 |
| 0000616720 | 8300 | FA7E | 7400 | E903 | 0009 | F7B8 | E901 | 029D |
| 0000616740 | 06E9 | 8B00 | FA46 | 94E9 | C702 | 8846 | 0070 | 468D |
| 0000616760 | 168A | 8D50 | 8846 | 5016 | 006A | 76FF | FF10 | 0E76 |
| 0000617000 | 76FF | FF08 | 0676 | E29A | 18CA | 838E | 12C4 | 4689 |
| 0000617020 | 8BFA | FA46 | 73E9 | C700 | FA46 | 0000 | 85E9 | FF00 |
| 0000617040 | 0876 | 76FF | 9A06 | A7EF | 8E49 | C483 | 3D04 | 0000 |
| 0000617060 | 0374 | 09E9 | B800 | 01BC | 42E9 | E902 | 0012 | 09E9 |
| 0000617100 | B800 | 01F7 | 36E9 | E902 | 0006 | BCB8 | E901 | 022D |
| 0000617120 | 76FF | FF08 | 0676 | EF9A | D5A7 | 838E | 04C4 | 003D |
| 0000617140 | 7400 | E903 | 0009 | 468B | E9FA | 0211 | 18E9 | 8300 |
| 0000617160 | FA7E | 7400 | E903 | 0009 | F7B8 | E901 | 01FF | 06E9 |
| 0000617200 | 8B00 | FA46 | F6E9 | E901 | 001A | C00B | 0375 | 86E9 |
| 0000617220 | 2DFF | 01AB | 0375 | 86E9 | 2DFF | 004F | 0375 | 76E9 |
| 0000617240 | E9FF | FFAC | 5EC4 | 2612 | 07C7 | 0000 | 5EC4 | 2B16 |
| 0000617260 | 26C0 | 4789 | 2602 | 0789 | 46C7 | 00FC | 8300 | FA7E |
| 0000617300 | 7400 | E903 | 00B3 | 76FF | FF18 | 1676 | 76FF | FF14 |
| 0000617320 | 1276 | 468D | 16FC | 8D50 | 8E46 | 5016 | 76FF | FF8C |
| 0000617340 | 8A76 | C19A | EF8B | 838E | 14C4 | 4689 | 83FA | FA7E |
| 0000617360 | 7500 | E903 | 0037 | 76FF | FF08 | 0676 | EF9A | 3DA7 |
| 0000617400 | 838F | 04C4 | 003D | 7400 | E903 | 0009 | 468B | E9FA |
| 0000617420 | 016B | 18E9 | 8300 | FA7E | 7400 | E903 | 0009 | F7B8 |
| 0000617440 | E901 | 0159 | 06E9 | 8B00 | FA46 | 50E9 | C701 | 8846 |
| 0000617460 | 0070 | 468D | 168A | 8D50 | 8846 | 5016 | 016A | 76FF |
| 0000617500 | FF10 | 0E76 | 76FF | FF08 | 0676 | E29A | 80CA | 838F |
| 0000617520 | 12C4 | 4689 | 81FA | FA7E | 01FA | 0374 | 05E9 | C700 |
| 0000617540 | FA46 | 0000 | 46FF | 8186 | 867E | 0A8C | 037D | 05E9 |
| 0000617560 | C700 | FA46 | 01F8 | 44E9 | 81FF | FA7E | 01BC | 0375 |
| 0000617600 | 51E9 | C400 | 165E | FF26 | 0277 | FF26 | 9A37 | 2448 |
| 0000617620 | 8F96 | C483 | C404 | 125E | C726 | 0007 | FF00 | 0876 |
| 0000617640 | 76FF | 9A06 | A7EF | 8FF0 | C483 | 3D04 | 0000 | 0374 |
| 0000617660 | 09E9 | 8B00 | FA46 | C4E9 | E900 | 0018 | 7E83 | 00FA |
| 0000617700 | 0374 | 09E9 | B800 | 01F7 | B2E9 | E900 | 0006 | 468B |
| 0000617720 | E9FA | 00A9 | 5EC4 | 8B12 | FC46 | 3926 | 7507 | E903 |
| 0000617740 | 006D | 468B | C4FC | 125E | 8926 | C407 | 125E | 6B26 |
| 0000617760 | 2407 | C450 | 165E | FF26 | 0277 | FF26 | 9A37 | 32A4 |
| 0000620000 | 9017 | C483 | C406 | 165E | 8926 | 2607 | 5789 | C402 |
| 0000620020 | 165E | 8B26 | 0247 | 0B26 | 7407 | E903 | 0031 | 76FF |
| 0000620040 | FF08 | 0676 | EF9A | 48A7 | 8390 | 04C4 | 003D | 7400 |

THU MAR 14 17:31:54 1991 DB_PI.DLL PAGE 218, LINE 12804

| | | | | | | | | |
|---|---|---|---|---|---|---|---|---|
| 0000620060 | E903 | 0009 | 07B8 | E900 | 0043 | 12E9 | E900 | 0009 |
| 0000620100 | F7B8 | E901 | 0037 | 06E9 | B800 | 0007 | 2EE9 | FF00 |
| 0000620120 | 0876 | 76FF | 9A06 | A7EF | 8C53 | C483 | 3D04 | 0000 |
| 0000620140 | 0374 | 09E9 | B800 | 0000 | 12E9 | E900 | 000F | F7B8 |
| 0000620160 | E901 | 0009 | 06E9 | B800 | 0000 | 00E9 | 5E00 | 835F |
| 0000620200 | 02ED | E58B | 5D1F | CB4D | 581E | 4590 | 8B55 | 1EEC |
| 0000620220 | D88E | EC81 | 007A | 5657 | 76FF | FF08 | 0676 | 429A |
| 0000620240 | C6A7 | 8390 | 04C4 | 4689 | 3DF8 | 0000 | 0375 | 06E9 |
| 0000620260 | 8B00 | F846 | FFE9 | 8B01 | 1046 | 460B | 740E | E903 |
| 0000620300 | 005C | 468D | 160E | FF50 | 0C76 | 76FF | FF0A | 0876 |
| 0000620320 | 76FF | 9A06 | A92F | 90E0 | C483 | 89CC | F846 | 7E83 |
| 0000620340 | 00F8 | 0375 | 37E9 | FF00 | 0876 | 76FF | 9A06 | A7EF |
| 0000620360 | 9123 | C483 | 3D04 | 0000 | 0374 | 09E9 | 8B00 | F846 |
| 0000620400 | B3E9 | E901 | 0018 | 7E83 | 00F8 | 0374 | 09E9 | B800 |
| 0000620420 | 01F7 | A1E9 | E901 | 0006 | 468B | E9F8 | 0198 | 76FF |
| 0000620440 | FF14 | 1276 | 76FF | FF10 | 0E76 | 76FF | FF08 | 0676 |
| 0000620460 | A99A | 3DC9 | 8391 | 0CC4 | 4689 | 83F8 | F87E | 7500 |
| 0000620500 | E903 | 0037 | 76FF | FF08 | 0676 | EF9A | 79A7 | 8391 |
| 0000620520 | 04C4 | 003D | 7400 | E903 | 0009 | 468B | E9F8 | 0156 |
| 0000620540 | 18E9 | 8300 | F87E | 7400 | E903 | 0009 | F7B8 | E901 |
| 0000620560 | 0144 | 06E9 | 8B00 | F846 | 3BE9 | 8D01 | FA46 | 5016 |
| 0000620600 | 76FF | FF08 | 0676 | B09A | 93AE | 8391 | 08C4 | 4689 |
| 0000620620 | 83F8 | F87E | 7500 | E903 | 0037 | 76FF | FF08 | 0676 |
| 0000620640 | EF9A | E8A7 | 8391 | 04C4 | 003D | 7400 | E903 | 0009 |
| 0000620660 | 468B | E9F8 | 0100 | 18E9 | 8300 | F87E | 7400 | E903 |
| 0000620700 | 0009 | F7B8 | E901 | 00EE | 06E9 | 8B00 | F846 | E5E9 |
| 0000620720 | 8B00 | FA46 | 568B | C4FC | 125E | 3926 | 7407 | E903 |
| 0000620740 | 001E | 3926 | 0257 | 0374 | 15E9 | 1E00 | 2C68 | FF37 |
| 0000620760 | 1876 | 76FF | 9A16 | 2750 | 9213 | C483 | E908 | 0088 |
| 0000621000 | 46C7 | 7086 | 8D00 | 8846 | 5016 | 468D | 1686 | FF50 |
| 0000621020 | 1476 | 76FF | 8B12 | 0646 | 568B | 0508 | 0104 | 5052 |
| 0000621040 | BE9A | 37D6 | 8392 | 10C4 | 4689 | 83F8 | F87E | 7500 |
| 0000621060 | E903 | 0041 | 7E81 | FAF8 | 7501 | E903 | 0037 | 76FF |
| 0000621100 | FF08 | 0676 | EF9A | 73A7 | 8392 | 04C4 | 003D | 7400 |
| 0000621120 | E903 | 0009 | 468B | E9F8 | 005C | 18E9 | 8300 | F87E |
| 0000621140 | 7400 | E903 | 0009 | F7B8 | E901 | 004A | 06E9 | 8B00 |
| 0000621160 | F846 | 41E9 | 8D00 | 8C46 | 5016 | 76FF | FF18 | 1676 |
| 0000621200 | 509A | 8127 | 8392 | 08C4 | 76FF | FF08 | 0676 | EF9A |
| 0000621220 | 5CA7 | 838D | 04C4 | 003D | 7400 | E903 | 0009 | 00B8 |
| 0000621240 | E900 | 0012 | 0FE9 | B800 | 01F7 | 09E9 | E900 | 0006 |
| 0000621260 | 00B8 | E900 | 0000 | 5F5E | ED83 | 8B02 | 1FE5 | 4D5D |
| 0000621300 | 1ECB | 9058 | 5545 | EC8B | 8E1E | 81D8 | 0EEC | 5700 |
| 0000621320 | 8D56 | FA46 | 5016 | 76FF | FF08 | 0676 | B09A | 26AE |
| 0000621340 | 8393 | 08C4 | 4689 | 83F8 | F87E | 7500 | E903 | 0006 |
| 0000621360 | 468B | E9F8 | 02CF | 468B | 8B0A | 0C56 | 4639 | 74FA |
| 0000621400 | E903 | 000E | 5639 | 74FC | E903 | 0006 | AEB8 | E901 |
| 0000621420 | 02B3 | 468B | 8B06 | 0856 | 4639 | 740E | E903 | 0008 |
| 0000621440 | 5639 | 7510 | E903 | 0041 | 468D | 16FA | FF50 | 1076 |
| 0000621460 | 76FF | 9A0E | AEB0 | 9391 | C483 | 8908 | F846 | 7E83 |
| 0000621500 | 00F8 | 0375 | 06E9 | 8B00 | F846 | 78E9 | 8B02 | 1646 |
| 0000621520 | 568B | 3918 | FA46 | 0374 | 0EE9 | 3900 | FC56 | 0374 |
| 0000621540 | 06E9 | B800 | 01AE | 5CE9 | 8B02 | 1646 | 568B | 3918 |
| 0000621560 | FA46 | 0374 | 0EE9 | 3900 | FC56 | 0374 | 06E9 | B800 |
| 0000621600 | 01AE | 40E9 | 8D02 | F446 | 5016 | FF6A | 76FF | FF1C |
| 0000621620 | 1A76 | 76FF | FF14 | 1276 | 76FF | FF10 | 0E76 | 039A |
| 0000621640 | 3CC8 | 8394 | 12C4 | 4689 | 83F8 | F87E | 7400 | E903 |
| 0000621660 | 003E | 468B | 8B16 | 1856 | 4639 | 74F4 | E903 | 0008 |
| 0000621700 | 5639 | 75F6 | E903 | 0025 | 468B | 8B0A | 0C56 | 4639 |
| 0000621720 | 74F4 | E903 | 0011 | 5639 | 74F6 | E903 | 0009 | 7E83 |

THU MAR 14 17:31:54 1991 DB_PI.DLL PAGE 219, LINE 12863

| | | | | | | | | |
|---|---|---|---|---|---|---|---|---|
| 0000621740 | 001E | 0375 | 06E9 | B800 | 01AA | D8E9 | E901 | 0010 |
| 0000621760 | 7E81 | ABF8 | 7501 | E903 | 0006 | 468B | E9F8 | 01C5 |
| 0000622000 | 468B | 8B06 | 0856 | 4639 | 740E | E903 | 00B4 | 5639 |
| 0000622020 | 7410 | E903 | 00AC | 468B | 0B18 | 1646 | 0375 | 63E9 |
| 0000622040 | 8B00 | 0A46 | 568B | 390C | 1646 | 0374 | 08E9 | 3900 |
| 0000622060 | 1856 | 0375 | 44E9 | FF00 | 1876 | 76FF | FF16 | 0C76 |
| 0000622100 | 76FF | FF0A | 0876 | 76FF | 9A06 | CA1F | 945E | C483 |
| 0000622120 | 3D0C | 0000 | 0374 | 22E9 | FF00 | 0C76 | 76FF | FF0A |
| 0000622140 | 1876 | 76FF | FF16 | 0876 | 76FF | 9A06 | CA1F | 949F |
| 0000622160 | C483 | 3D0C | 0000 | 0375 | 06E9 | B800 | 01A8 | 44E9 |
| 0000622200 | E901 | 003E | 468B | 8B0A | 0C56 | 4639 | 7412 | E903 |
| 0000622220 | 0008 | 5639 | 7514 | E903 | 0022 | 76FF | FF!4 | 1276 |
| 0000622240 | 76FF | FF0C | 0A76 | 76FF | FF08 | 0676 | 1F9A | DFCA |
| 0000622260 | 8394 | 0CC4 | 003D | 7500 | E903 | 0006 | A8B8 | E901 |
| 0000622300 | 0103 | 468A | 2A0D | 3DE4 | 002A | 0374 | 51E9 | 8A00 |
| 0000622320 | 1546 | E42A | 293D | 7500 | E903 | 0006 | ADB8 | E901 |
| 0000622340 | 00E3 | 681E | 372E | 76FF | FF1C | 1A76 | 869A | 9127 |
| 0000622360 | 8390 | 08C4 | 003D | 7500 | E903 | 0006 | ADB8 | E901 |
| 0000622400 | 00C3 | 468B | 0B18 | 1646 | 0375 | 13E9 | 8A00 | 1946 |
| 0000622420 | E42A | 2A3D | 7500 | E903 | 0006 | ADB8 | E901 | 00A5 |
| 0000622440 | 468A | 2A0D | 3DE4 | 002C | 0374 | 31E9 | 8A00 | 1546 |
| 0000622460 | E42A | 293D | 7500 | E903 | 0006 | ADB8 | E901 | 0085 |
| 0000622500 | 468B | 0B18 | 1646 | 0375 | 13E9 | 8A00 | 1946 | E42A |
| 0000622520 | 2C3D | 7500 | E903 | 0006 | ADB8 | E901 | 0067 | 468A |
| 0000622540 | 2A0D | 3DE4 | 0028 | 0374 | 54E9 | 8D00 | F246 | 5016 |
| 0000622560 | 76FF | FF0C | :A76 | 76FF | FF08 | 0676 | 869A | 98CE |
| 0000622600 | 8395 | 0CC4 | 4689 | 83F8 | F87E | 7500 | E903 | 0006 |
| 0000622620 | 468B | E9F8 | 002F | 76FF | FFF2 | 1476 | 76FF | FF12 |
| 0000622640 | 1076 | 76FF | 9A0E | CDB7 | 92CF | C483 | 890A | F846 |
| 0000622660 | 7E83 | 00F8 | 0375 | 06E9 | 8B00 | F846 | 06E9 | B800 |
| 0000622700 | 0000 | 00E9 | 5E00 | 835F | 02ED | E58B | 5D1F | CB4D |
| 0000622720 | 581E | 4590 | 8B55 | 1EEC | D88E | EC81 | 01BE | 5657 |
| 0000622740 | 76FF | FF08 | 0676 | 429A | 0EA7 | 8396 | 04C4 | 4689 |
| 0000622760 | 3DF8 | 0000 | 0375 | 06E9 | 8B00 | F846 | 70E9 | 8B0D |
| 0000623000 | 0646 | 568B | 3908 | 1246 | 0374 | 08E9 | 3900 | 1456 |
| 0000623020 | 0375 | 2DE9 | FF00 | 1476 | 76FF | 9A12 | A742 | 9627 |
| 0000623040 | C483 | 8904 | F846 | 003D | 7500 | E903 | 0014 | 76FF |
| 0000623060 | FF08 | 0676 | EF9A | 51A7 | 8396 | 04C4 | 468B | E9F8 |
| 0000623100 | 0D2D | 468B | 0B10 | 0E46 | 0374 | FFE9 | 8D00 | 0E46 |
| 0000623120 | 5016 | 76FF | FF0C | 0A76 | 76FF | FF08 | 0676 | 2F9A |
| 0000623140 | 81A9 | 8396 | 0CC4 | 4689 | 83F8 | F87E | 7500 | E903 |
| 0000623160 | 00DA | 468B | 8B06 | 0856 | 4639 | 7412 | E903 | 0042 |
| 0000623200 | 5639 | 7414 | E903 | 003A | 76FF | FF08 | 0676 | EF9A |
| 0000623220 | BBA7 | 8396 | 04C4 | 003D | 7400 | E903 | 0009 | 468B |
| 0000623240 | E9F8 | 0CCB | 18E9 | 8300 | F87E | 7400 | E903 | 0009 |
| 0000623260 | F7B8 | E901 | 0CB9 | 06E9 | 8B00 | F846 | B0E9 | E90C |
| 0000623300 | 008A | 76FF | FF08 | 0676 | EF9A | DAA7 | 8396 | 04C4 |
| 0000623320 | 003D | 7500 | E903 | 0009 | 7E83 | 00F8 | 0375 | 3AE9 |
| 0000623340 | FF00 | 1476 | 76FF | 9A12 | A7EF | 9714 | C483 | 3D04 |
| 0000623360 | 0000 | 0374 | 09E9 | 8B00 | F846 | 72E9 | E90C | 0018 |
| 0000623400 | 7E83 | 00F8 | 0374 | 09E9 | B800 | 01F7 | 60E9 | E90C |
| 0000623420 | 0006 | 468B | E9F8 | 0C57 | 31E9 | FF00 | 1476 | 76FF |
| 0000623440 | 9A12 | A7EF | 975B | C483 | 3D04 | 0000 | 0374 | 09E9 |
| 0000623460 | B800 | 01F7 | 38E9 | E90C | 0012 | 09E9 | B800 | 01F7 |
| 0000623500 | 2CE9 | E90C | 0006 | F7B8 | E901 | 0C23 | 468B | 0B1C |
| 0000623520 | 1A46 | 0374 | 14E9 | 8D01 | 1A46 | 5016 | 76FF | FF18 |
| 0000623540 | 1676 | 76FF | FF14 | 1276 | 2F9A | A0A9 | 8397 | 0CC4 |
| 0000623560 | 4689 | 83F8 | F87E | 7500 | E903 | 00EF | 7E81 | ABF8 |
| 0000623600 | 7401 | E903 | 000B | C02B | 4689 | 891C | 1A46 | DAE9 |

THU MAR 14 17:31:54 1991 DB_PI.DLL PAGE 220, LINE 12922

| | | | | | | | | |
|---|---|---|---|---|---|---|---|---|
| 0000623620 | 8B00 | 0646 | 568B | 3908 | 1246 | 0374 | 42E9 | 3900 |
| 0000623640 | 1456 | 0374 | 3AE9 | FF00 | 0876 | 76FF | 9A06 | A7EF |
| 0000623660 | 97DA | C483 | 3D04 | 0000 | 0374 | 09E9 | 8B00 | F846 |
| 0000623700 | ACE9 | E90B | 0018 | 7E83 | 00F8 | 0374 | 09E9 | B800 |
| 0000623720 | 01F7 | 9AE9 | E90B | 0006 | 468B | E9F8 | 0B91 | 8AE9 |
| 0000623740 | FF00 | 0876 | 76FF | 9A06 | A7EF | 97F9 | C483 | 3D04 |
| 0000623760 | 0000 | 0375 | 09E9 | 8300 | F87E | 7500 | E903 | 003A |
| 0000624000 | 76FF | FF14 | 1276 | EF9A | 33A7 | 8398 | 04C4 | 003D |
| 0000624020 | 7400 | E903 | 0009 | 468B | E9F8 | 0B53 | 18E9 | 8300 |
| 0000624040 | F87E | 7400 | E903 | 0009 | F7B8 | E901 | 0B41 | 06E9 |
| 0000624060 | 8B00 | F846 | 38E9 | E90B | 0031 | 76FF | FF14 | 1276 |
| 0000624100 | EF9A | 8EA7 | 8398 | 04C4 | 003D | 7400 | E903 | 0009 |
| 0000624120 | F7B8 | E901 | 0B19 | 12E9 | E900 | 0009 | F7B8 | E901 |
| 0000624140 | 0B0D | 06E9 | B800 | 01F7 | 04E9 | 8B0B | 1C46 | 460B |
| 0000624160 | 751A | E903 | 02FC | 7E83 | 001E | 0374 | C5E9 | 8B00 |
| 0000624200 | 0646 | 568B | 3908 | 1246 | 0374 | 3CE9 | 3900 | 1456 |
| 0000624220 | 0374 | 34E9 | FF00 | 0876 | 76FF | 9A06 | A7EF | 98C2 |
| 0000624240 | C483 | 3D04 | 0000 | 0374 | 09E9 | B800 | 01AA | BEE9 |
| 0000624260 | E90A | 0012 | 09E9 | B800 | 01F7 | B2E9 | E90A | 0006 |
| 0000624300 | AAB8 | E901 | 0AA9 | 7BE9 | FF00 | 0876 | 76FF | 9A06 |
| 0000624320 | A7EF | 98D8 | C483 | 3D04 | 0000 | 0375 | 00E9 | FF00 |
| 0000624340 | 1476 | 76FF | 9A12 | A7EF | 990C | C483 | 3D04 | 0000 |
| 0000624360 | 0374 | 09E9 | B800 | 01AA | 74E9 | E90A | 0012 | 09E9 |
| 0000624400 | B800 | 01F7 | 68E9 | E90A | 0006 | AAB8 | E901 | 0A5F |
| 0000624420 | 31E9 | FF00 | 1476 | 76FF | 9A12 | A7EF | 9948 | C483 |
| 0000624440 | 3D04 | 0000 | 0374 | 09E9 | B800 | 01F7 | 40E9 | E90A |
| 0000624460 | 0012 | 09E9 | B800 | 01F7 | 34E9 | E90A | 0006 | F7B8 |
| 0000624500 | E901 | 0A2B | 468D | 16FA | FF50 | 1C76 | 76FF | FF1A |
| 0000624520 | 1476 | 76FF | 9A12 | C9A9 | 9978 | C483 | 89DC | F846 |
| 0000624540 | 7E83 | 00F8 | 0375 | DAE9 | 8B00 | 0646 | 568B | 3908 |
| 0000624560 | 1246 | 0374 | 42E9 | 3900 | 1456 | 0374 | 3AE9 | FF00 |
| 0000624600 | 0876 | 76FF | 9A06 | A7EF | 956F | C483 | 3D04 | 0000 |
| 0000624620 | 0374 | 09E9 | 8B00 | F846 | D4E9 | E909 | 0018 | 7E83 |
| 0000624640 | 00F8 | 0374 | 09E9 | B800 | 01F7 | C2E9 | E909 | 0006 |
| 0000624660 | 468B | E9F8 | 09B9 | 8AE9 | FF00 | 0876 | 76FF | 9A06 |
| 0000624700 | A7EF | 99D1 | C483 | 3D04 | 0000 | 0375 | 09E9 | 8300 |
| 0000624720 | F87E | 7500 | E903 | 003A | 76FF | FF14 | 1276 | EF9A |
| 0000624740 | 0BA7 | 839A | 04C4 | 003D | 7400 | E903 | 0009 | 468B |
| 0000624760 | E9F8 | 097B | 18E9 | 8300 | F87E | 7400 | E903 | 0009 |
| 0000625000 | F7B8 | E901 | 0969 | 06E9 | 8B00 | F846 | 60E9 | E909 |
| 0000625020 | 0031 | 76FF | FF14 | 1276 | EF9A | 57A7 | 839A | 04C4 |
| 0000625040 | 003D | 7400 | E903 | 0009 | F7B8 | E901 | 0941 | 12E9 |
| 0000625060 | E900 | 0009 | F7B8 | E901 | 0935 | 06E9 | B800 | 01F7 |
| 0000625100 | 2CE9 | C709 | 6686 | 70FE | 8D00 | 8846 | 5016 | 868D |
| 0000625120 | FE66 | 5016 | 468D | 161A | 8B50 | 1246 | 568B | 0514 |
| 0000625140 | 0104 | 5052 | BE9A | 91D6 | 839A | 10C4 | 4689 | 83F8 |
| 0000625160 | F87E | 7500 | E903 | 00E4 | 7E81 | FAF8 | 7501 | E903 |
| 0000625200 | 00DA | 468B | 8B06 | 0856 | 4639 | 7412 | E903 | 0042 |
| 0000625220 | 5639 | 7414 | E903 | 003A | 76FF | FF08 | 0676 | EF9A |
| 0000625240 | CBA7 | 839A | 04C4 | 003D | 7400 | E903 | 0009 | 468B |
| 0000625260 | E9F8 | 08BB | 18E9 | 8300 | F87E | 7400 | E903 | 0009 |
| 0000625300 | F7B8 | E901 | 08A9 | 06E9 | 8B00 | F846 | A0E9 | E908 |
| 0000625320 | 008A | 76FF | FF08 | 0676 | EF9A | EAA7 | 839A | 04C4 |
| 0000625340 | 003D | 7500 | E903 | 0009 | 7E83 | 00F8 | 0375 | 3AE9 |
| 0000625360 | FF00 | 1476 | 76FF | 9A12 | A7EF | 9B24 | C483 | 3D04 |
| 0000625400 | 0000 | 0374 | 09E9 | 8B00 | F846 | 62E9 | E908 | 0018 |
| 0000625420 | 7E83 | 00F8 | 0374 | 09E9 | B800 | 01F7 | 50E9 | E908 |
| 0000625440 | 0006 | 468B | E9F8 | 0847 | 31E9 | FF00 | 1476 | 76FF |
| 0000625460 | 9A12 | A7EF | 9B5A | C483 | 3D04 | 0000 | 0374 | 09E9 |

THU MAR 14 17:31:54 1991 DB_PI.DLL PAGE 221, LINE 12981

| | | | | | | | | |
|---|---|---|---|---|---|---|---|---|
| 0000625500 | B800 | 01F7 | 28E9 | E908 | 0012 | 09E9 | B800 | 01F7 |
| 0000625520 | 1CE9 | E908 | 0006 | F7B8 | E901 | 0813 | 468D | 168C |
| 0000625540 | 8D50 | 4686 | 16FE | 9A50 | 2750 | 9B77 | C483 | E908 |
| 0000625560 | 02F9 | 868D | FF68 | 5016 | 868D | FE68 | 5016 | 76FF |
| 0000625600 | FF18 | 1676 | F19A | A7AD | 839B | 0CC4 | 4689 | 83F8 |
| 0000625620 | F87E | 7500 | E903 | 00DA | 468B | 8B06 | 0856 | 4639 |
| 0000625640 | 7412 | E903 | 0042 | 5639 | 7414 | E903 | 003A | 76FF |
| 0000625660 | FF08 | 0676 | EF9A | E1A7 | 839B | 04C4 | 003D | 7400 |
| 0000625700 | E903 | 0009 | 468B | E9F8 | 07A5 | 18E9 | 8300 | F87E |
| 0000625720 | 7400 | E903 | 0009 | F7B8 | E901 | 0793 | 06E9 | 8B00 |
| 0000625740 | F846 | 8AE9 | E907 | 008A | 76FF | FF08 | 0676 | EF9A |
| 0000625760 | 00A7 | 839C | 04C4 | 003D | 7500 | E903 | 0009 | 7E83 |
| 0000626000 | 00F8 | 0375 | 3AE9 | FF00 | 1476 | 76FF | 9A12 | A7EF |
| 0000626020 | 9C3A | C483 | 3D04 | 0000 | 0374 | 09E9 | 8B00 | F846 |
| 0000626040 | 4CE9 | E907 | 0018 | 7E83 | 00F8 | 0374 | 09E9 | B800 |
| 0000626060 | 01F7 | 3AE9 | E907 | 0006 | 468B | E9F8 | 0731 | 31E9 |
| 0000626100 | FF00 | 1476 | 76FF | 9A12 | A7EF | 9CA1 | C483 | 3D04 |
| 0000626120 | 0000 | 0374 | 09E9 | B800 | 01F7 | 12E9 | E907 | 0012 |
| 0000626140 | 09E9 | B800 | 01F7 | 06E9 | E907 | 0006 | F7B8 | E901 |
| 0000626160 | 06FD | 868D | FE46 | 5016 | 868D | FF68 | 5016 | 3D9A |
| 0000626200 | AB42 | 8380 | 08C4 | 4689 | 83F8 | F87E | 7500 | E903 |
| 0000626220 | 00DA | 468B | 8B06 | 0856 | 4639 | 7412 | E903 | 0042 |
| 0000626240 | 5639 | 7414 | E903 | 003A | 76FF | FF08 | 0676 | EF9A |
| 0000626260 | DBA7 | 839C | 04C4 | 003D | 7400 | E903 | 0009 | 468B |
| 0000626300 | E9F8 | 06AB | 18E9 | 8300 | F87E | 7400 | E903 | 0009 |
| 0000626320 | F7B8 | E901 | 0699 | 06E9 | 8B00 | F846 | 90E9 | E906 |
| 0000626340 | 008A | 76FF | FF08 | 0676 | EF9A | FAA7 | 839C | 04C4 |
| 0000626360 | 003D | 7500 | E903 | 0009 | 7E83 | 00F8 | 0375 | 3AE9 |
| 0000626400 | FF00 | 1476 | 76FF | 9A12 | A7EF | 95D9 | C483 | 3D04 |
| 0000626420 | 0000 | 0374 | 09E9 | 8B00 | F846 | 52E9 | E906 | 0018 |
| 0000626440 | 7E83 | 00F8 | 0374 | 09E9 | B800 | 01F7 | 40E9 | E906 |
| 0000626460 | 0006 | 468B | E9F8 | 0637 | 31E9 | FF00 | 1476 | 76FF |
| 0000626500 | 9A12 | A7EF | 9D70 | C483 | 3D04 | 0000 | 0374 | 09E9 |
| 0000626520 | B800 | 01F7 | 18E9 | E906 | 0012 | 09E9 | B800 | 01F7 |
| 0000626540 | 0CE9 | E906 | 0006 | F7B8 | E901 | 0603 | 468D | 16FA |
| 0000626560 | 8D50 | 6886 | 16FE | FF50 | 1476 | 76FF | 9A12 | A92F |
| 0000626600 | 9DA0 | C483 | 890C | F846 | 7E83 | 00F8 | 0375 | DAE9 |
| 0000626620 | 8B00 | 0646 | 568B | 3908 | 1246 | 0374 | 42E9 | 3900 |
| 0000626640 | 1456 | 0374 | 3AE9 | FF00 | 0876 | 76FF | 9A06 | A7EF |
| 0000626660 | 9DDA | C483 | 3D04 | 0000 | 0374 | 09E9 | 8B00 | F846 |
| 0000626700 | ACE9 | E905 | 0018 | 7E83 | 00F8 | 0374 | 09E9 | B800 |
| 0000626720 | 01F7 | 9AE9 | E905 | 0006 | 468B | E9F8 | 0591 | 8AE9 |
| 0000626740 | FF00 | 0876 | 76FF | 9A06 | A7EF | 9DF9 | C483 | 3D04 |
| 0000626760 | 0000 | 0375 | 09E9 | 8300 | F87E | 7500 | E903 | 003A |
| 0000627000 | 76FF | FF14 | 1276 | EF9A | 33A7 | 839E | 04C4 | 003D |
| 0000627020 | 7400 | E903 | 0009 | 468B | E9F8 | 0553 | 18E9 | 8300 |
| 0000627040 | F87E | 7400 | E903 | 0009 | F7B8 | E901 | 0541 | 06E9 |
| 0000627060 | 8B00 | F846 | 38E9 | E905 | 0031 | 76FF | FF14 | 1276 |
| 0000627100 | EF9A | 85A7 | 839E | 04C4 | 003D | 7400 | E903 | 0009 |
| 0000627120 | F7B8 | E901 | 0519 | 12E9 | E900 | 0009 | F7B8 | E901 |
| 0000627140 | 050D | 06E9 | B800 | 01F7 | 04E9 | FF05 | 2076 | 868D |
| 0000627160 | FE46 | 5016 | 76FF | FF1C | 1A76 | 76FF | FFFC | FA76 |
| 0000627200 | 76FF | FF14 | 1276 | 76FF | FF10 | 0E76 | 76FF | FF08 |
| 0000627220 | 0676 | B19A | B592 | 839E | 1AC4 | 4689 | 83F8 | F87E |
| 0000627240 | 7500 | E903 | 00DA | 468B | 8B06 | 0856 | 4639 | 7412 |
| 0000627260 | E903 | 0042 | 5639 | 7414 | E903 | 003A | 76FF | FF08 |
| 0000627300 | 0676 | EF9A | EFA7 | 839E | 04C4 | 003D | 7400 | E903 |
| 0000627320 | 0009 | 468B | E9F8 | 0497 | 18E9 | 8300 | F87E | 7400 |
| 0000627340 | E903 | 0009 | F7B8 | E901 | 0485 | 06E9 | 8B00 | F846 |

THU MAR 14 17:31:54 1991 DB_PI.DLL PAGE 222, LINE 13040

| | | | | | | | | |
|---|---|---|---|---|---|---|---|---|
| 0000627360 | 7CE9 | E904 | 008A | 76FF | FF08 | 0676 | EF9A | 0EA7 |
| 0000627400 | 839F | 04C4 | 003D | 7500 | E903 | 0009 | 7E83 | 00F8 |
| 0000627420 | 0375 | 3AE9 | FF00 | 1476 | 76FF | 9A12 | A7EF | 9F48 |
| 0000627440 | C483 | 3D04 | 0000 | 0374 | 09E9 | 8B00 | F846 | 3EE9 |
| 0000627460 | E904 | 0018 | 7E83 | 00F8 | 0374 | 09E9 | B800 | 01F7 |
| 0000627500 | 2CE9 | E904 | 0006 | 468B | E9F8 | 0423 | 31E9 | FF00 |
| 0000627520 | 1476 | 76FF | 9A12 | A7EF | 9F90 | C483 | 3D04 | 0000 |
| 0000627540 | 0374 | 09E9 | B800 | 01F7 | 04E9 | E904 | 0012 | 09E9 |
| 0000627560 | B800 | 01F7 | F8E9 | E903 | 0006 | F7B8 | E901 | 03EF |
| 0000627600 | 468B | 0B1C | 1A46 | 0375 | 00E9 | 8D01 | 4286 | 16FE |
| 0000627620 | FF50 | 1C76 | 76FF | FF1A | 1476 | 76FF | 9A12 | BD0D |
| 0000627640 | 99B2 | C483 | 890C | F846 | 7E83 | 00F8 | 0375 | DAE9 |
| 0000627660 | 8B00 | 0646 | 568B | 3908 | 1246 | 0374 | 42E9 | 3900 |
| 0000627700 | 1456 | 0374 | 3AE9 | FF00 | 0876 | 76FF | 9A06 | A7EF |
| 0000627720 | 9FFA | C483 | 3D04 | 0000 | 0374 | 09E9 | 8B00 | F846 |
| 0000627740 | 8CE9 | E903 | 0018 | 7E83 | 00F8 | 0374 | 09E9 | B800 |
| 0000627760 | 01F7 | 7AE9 | E903 | 0006 | 468B | E9F8 | 0371 | 8AE9 |
| 0000630000 | FF00 | 0876 | 76FF | 9A06 | A7EF | A019 | C483 | 3D04 |
| 0000630020 | 0000 | 0375 | 09E9 | 8300 | F87E | 7500 | E903 | 003A |
| 0000630040 | 76FF | FF14 | 1276 | EF9A | 53A7 | 83A0 | 04C4 | 003D |
| 0000630060 | 7400 | E903 | 0009 | 468B | E9F8 | 0333 | 18E9 | 8300 |
| 0000630100 | F87E | 7400 | E903 | 0009 | F7B8 | E901 | 0321 | 06E9 |
| 0000630120 | 8B00 | F846 | 18E9 | E903 | 0031 | 76FF | FF14 | 1276 |
| 0000630140 | EF9A | A9A7 | 83A0 | 04C4 | 003D | 7400 | E903 | 0009 |
| 0000630160 | F7B8 | E901 | 02F9 | 12E9 | E900 | 0009 | F7B8 | E901 |
| 0000630200 | 02ED | 06E9 | B800 | 01F7 | E4E9 | FF02 | 2476 | 76FF |
| 0000630220 | FF22 | 2076 | 868D | FE46 | 5016 | 76FF | FFFC | FA76 |
| 0000630240 | 76FF | FF14 | 1276 | 006A | 006A | 76FF | FF10 | 0E76 |
| 0000630260 | 76FF | FF08 | 0676 | 839A | D9C2 | 83A0 | 1EC4 | 4689 |
| 0000630300 | 83F8 | F87E | 7500 | E903 | 00DA | 468B | 8B06 | 0856 |
| 0000630320 | 4639 | 7412 | E903 | 0042 | 5639 | 7414 | E903 | 003A |
| 0000630340 | 76FF | FF08 | 0676 | EF9A | 13A7 | 83A1 | 04C4 | 003D |
| 0000630360 | 7400 | E903 | 0009 | 468B | E9F8 | 0273 | 18E9 | 8300 |
| 0000630400 | F87E | 7400 | E903 | 0009 | F7B8 | E901 | 0261 | 06E9 |
| 0000630420 | 8B00 | F846 | 58E9 | E902 | 008A | 76FF | FF08 | 0676 |
| 0000630440 | EF9A | 32A7 | 83A1 | 04C4 | 003D | 7500 | E903 | 0009 |
| 0000630460 | 7E83 | 00F8 | 0375 | 3AE9 | FF00 | 1476 | 76FF | 9A12 |
| 0000630500 | A7EF | A16C | C483 | 3D04 | 0000 | 0374 | 09E9 | 8B00 |
| 0000630520 | F846 | 1AE9 | E902 | 0018 | 7E83 | 00F8 | 0374 | 09E9 |
| 0000630540 | B800 | 01F7 | 08E9 | E902 | 0006 | 468B | E9F8 | 01FF |
| 0000630560 | 31E9 | FF00 | 1476 | 76FF | 9A12 | A7EF | A1B2 | C483 |
| 0000630600 | 3D04 | 0000 | 0374 | 09E9 | B800 | 01F7 | E0E9 | E901 |
| 0000630620 | 0012 | 09E9 | B800 | 01F7 | D4E9 | E901 | 0006 | F7B8 |
| 0000630640 | E901 | 01CB | 7E83 | 0020 | 0374 | 00E9 | 8D01 | 4286 |
| 0000630660 | 16FE | FF50 | 1076 | 76FF | FF0E | 0876 | 76FF | 9A06 |
| 0000630700 | BD0D | A1E2 | C483 | 890C | F846 | 7E83 | 00F8 | 0375 |
| 0000630720 | DAE9 | 8B00 | 0646 | 568B | 3908 | 1246 | 0374 | 42E9 |
| 0000630740 | 3900 | 1456 | 0374 | 3AE9 | FF00 | 0876 | 76FF | 9A06 |
| 0000630760 | A7EF | A21C | C483 | 3D04 | 0000 | 0374 | 09E9 | 8B00 |
| 0000631000 | F846 | 6AE9 | E901 | 0018 | 7E83 | 00F8 | 0374 | 09E9 |
| 0000631020 | B800 | 01F7 | 58E9 | E901 | 0006 | 468B | E9F8 | 014F |
| 0000631040 | 8AE9 | FF00 | 0876 | 76FF | 9A06 | A7EF | A23B | C483 |
| 0000631060 | 3D04 | 0000 | 0375 | 09E9 | 8300 | F87E | 7500 | E903 |
| 0000631100 | 003A | 76FF | FF14 | 1276 | EF9A | 75A7 | 83A2 | 04C4 |
| 0000631120 | 003D | 7400 | E903 | 0009 | 468B | E9F8 | 0111 | 18E9 |
| 0000631140 | 8300 | F87E | 7400 | E903 | 0009 | F7B8 | E901 | 00FF |
| 0000631160 | 06E9 | 8B00 | F846 | F6E9 | E900 | 0031 | 76FF | FF14 |
| 0000631200 | 1276 | EF9A | BCA7 | 83A2 | 04C4 | 003D | 7400 | E903 |
| 0000631220 | 0009 | F7B8 | E901 | 00D7 | 12E9 | E900 | 0009 | F7B8 |

THU MAR 14 17:31:54 1991 DB_PI.DLL PAGE 223, LINE 13099

| | | | | | | | | |
|---|---|---|---|---|---|---|---|---|
| 0000631240 | E901 | 00CB | 06E9 | B800 | 01F7 | C2E9 | 8B00 | 0646 |
| 0000631260 | 568B | 3908 | 1246 | 0374 | 39E9 | 3900 | 1456 | 0374 |
| 0000631300 | 31E9 | FF00 | 0876 | 76FF | 9A06 | A7EF | A2ED | C483 |
| 0000631320 | 3D04 | 0000 | 0374 | 09E9 | B800 | 0000 | 90E9 | E900 |
| 0000631340 | 000F | F7B8 | E901 | 0087 | 06E9 | B800 | 0000 | 7EE9 |
| 0000631360 | E900 | 007B | 76FF | FF08 | 0676 | EF9A | 06A7 | 83A3 |
| 0000631400 | 04C4 | 003D | 7500 | E903 | 0003 | 31E9 | FF00 | 1476 |
| 0000631420 | 76FF | 9A12 | A7EF | A337 | C483 | 3D04 | 0000 | 0374 |
| 0000631440 | 09E9 | B800 | 0000 | 46E9 | E900 | 000F | F7B8 | E901 |
| 0000631460 | 003D | 06E9 | B800 | 0000 | 34E9 | E900 | 0031 | 76FF |
| 0000631500 | FF14 | 1276 | EF9A | 34A7 | 839D | 04C4 | 003D | 7400 |
| 0000631520 | E903 | 0009 | F7B8 | E901 | 0015 | 12E9 | E900 | 0009 |
| 0000631540 | F7B8 | E901 | 0009 | 06E9 | B800 | 01F7 | 00E9 | 5E00 |
| 0000631560 | 835F | 02ED | E58B | 5D1F | CB4D | 581E | 4590 | 8B55 |
| 0000631600 | 1EEC | D88E | EC81 | 00A4 | 5657 | 86C7 | FF5C | 0028 |
| 0000631620 | 468B | 8B0A | 0C56 | 8689 | FF60 | 9689 | FF62 | 468D |
| 0000631640 | 16D6 | 8D50 | 5C86 | 16FF | 8D50 | 6086 | 16FF | 6A50 |
| 0000631660 | 6A01 | 8B05 | 0646 | 568B | 0508 | 01AE | 5052 | 1B9A |
| 0000631700 | 2ED8 | 83A4 | 14C4 | 4689 | 83D4 | D47E | 7500 | E903 |
| 0000631720 | 0006 | 468B | E9D4 | 011C | 468B | 8B0A | 0C56 | 8639 |
| 0000631740 | FF60 | 0374 | 09E9 | 3900 | 6296 | 75FF | E903 | 0006 |
| 0000631760 | ABB8 | E901 | 00FE | 7E83 | 00D4 | 0374 | EFE9 | 8A00 |
| 0000632000 | DD46 | E42A | 293D | 7500 | E903 | 000D | 468A | 2ADD |
| 0000632020 | 3DE4 | 002B | 0374 | 7AE9 | C700 | 5E86 | 70FF | 8D00 |
| 0000632040 | 6486 | 16FF | 8D50 | 5E86 | 16FF | 8D50 | DA46 | 5016 |
| 0000632060 | 468B | 8B06 | 0856 | 0405 | 5201 | 9A50 | D6BE | A45E |
| 0000632100 | C483 | 8910 | D446 | 7E83 | 00D4 | 0375 | 10E9 | 8100 |
| 0000632120 | D47E | 01FA | 0375 | 06E9 | 8B00 | D446 | 95E9 | 8D00 |
| 0000632140 | 6886 | 16FF | FF50 | 1076 | 76FF | 9A0E | 2786 | A4A6 |
| 0000632160 | C483 | 3D08 | 0000 | 0374 | 18E9 | 8B00 | 6486 | 8BFF |
| 0000632200 | 6696 | C4FF | 125E | 8926 | 2607 | 5789 | B802 | 0000 |
| 0000632220 | 61E9 | 8D00 | D646 | 5016 | 868D | FF5C | 5016 | 868D |
| 0000632240 | FF60 | 5016 | 016A | 066A | 468B | 8B06 | 0856 | AE05 |
| 0000632260 | 5201 | 9A50 | D81B | 9FC0 | C483 | 8914 | D446 | 7E83 |
| 0000632300 | 00D4 | 0375 | 06E9 | 8B00 | D446 | 27E9 | 8B00 | 0A46 |
| 0000632320 | 568B | 390C | 6086 | 74FF | E903 | 0009 | 9639 | FF62 |
| 0000632340 | 0375 | 06E9 | B800 | 01AB | 09E9 | E900 | FF08 | 468B |
| 0000632360 | E9D4 | 0000 | 5F5E | ED83 | 8B02 | 1FE5 | 4D5D | 00CB |
| 0000632400 | 581E | 4590 | 8B55 | 1EEC | D88E | EC81 | 01FC | 5657 |
| 0000632420 | 468A | 2A0D | 89E4 | 0A86 | 83FE | 0ABE | 2AFE | 0375 |
| 0000632440 | 1AE9 | 8300 | 0ABE | 2BFE | 0375 | 10E9 | 8300 | 0ABE |
| 0000632460 | 2CFE | 0375 | 06E9 | B800 | 01AD | 75E9 | FF01 | 0876 |
| 0000632500 | 76FF | 9A06 | A742 | A581 | C483 | 8904 | 0C86 | 3DFE |
| 0000632520 | 0000 | 0375 | 07E9 | 8B00 | 0C86 | E9FE | 0154 | 86C7 |
| 0000632540 | FE04 | 01F0 | 868D | FE0E | 8689 | FE06 | 968C | FE08 |
| 0000632560 | B6FF | FE08 | B6FF | FE06 | 868D | FE04 | 5016 | 468D |
| 0000632600 | 160A | 8B50 | 0646 | 568B | 0508 | 0104 | 5052 | BE9A |
| 0000632620 | 9DD6 | 83A5 | 10C4 | 8689 | FE0C | BE83 | FE0C | 7500 |
| 0000632640 | E903 | 003A | 76FF | FF08 | 0676 | EF9A | E4A7 | 83A5 |
| 0000632660 | 04C4 | 003D | 7400 | E903 | 000A | 868B | FE0C | F1E9 |
| 0000632700 | E900 | 001A | BE83 | FE0C | 7400 | E903 | 0009 | F7B8 |
| 0000632720 | E901 | 00DE | 07E9 | 8B00 | 0C86 | E9FE | 00D4 | 868B |
| 0000632740 | FE06 | 968B | FE08 | 0405 | 5200 | FF50 | 1876 | 76FF |
| 0000632760 | 9A16 | 2750 | A604 | C483 | C408 | 069E | 26FE | 478B |
| 0000633000 | 032E | 0686 | 8BFE | 0896 | 52FE | FF50 | 1C76 | 76FF |
| 0000633020 | 9A1A | 2750 | A628 | C483 | FF08 | 1C76 | 76FF | 9A1A |
| 0000633040 | 2A9F | 9C71 | C483 | 3D04 | 0000 | 0374 | 31E9 | FF00 |
| 0000633060 | 0876 | 76FF | 9A06 | A7EF | A66B | C483 | 3D04 | 0000 |
| 0000633100 | 0374 | 09E9 | B800 | 01B1 | 67E9 | E900 | 0012 | 09E9 |

THU MAR 14 17:31:54 1991 DB_PI.DLL PAGE 224, LINE 13158

| | | | | | | | | |
|---|---|---|---|---|---|---|---|---|
| 0000633120 | B800 | 01F7 | 5BE9 | E900 | 0006 | B1B8 | E901 | 0052 |
| 0000633140 | 76FF | FF20 | 1E76 | 76FF | FF1C | 1A76 | 76FF | FF0C |
| 0000633160 | 0A76 | 76FF | FF08 | 0676 | 089A | 7DC4 | 83A6 | 10C4 |
| 0000633200 | 8689 | FEDC | 76FF | FF08 | 0676 | EF9A | B1A7 | 83A3 |
| 0000633220 | 04C4 | 003D | 7400 | E903 | 0009 | 00B8 | E900 | 0012 |
| 0000633240 | 0FE9 | B800 | 01F7 | 09E9 | E900 | 0006 | 00B8 | E900 |
| 0000633260 | 0000 | 5F5E | ED83 | 8B02 | 1FE5 | 4D5D | 1ECB | 9058 |
| 0000633300 | 5545 | EC8B | 8E1E | 81D8 | 04EC | 5700 | FF56 | 1276 |
| 0000633320 | 76FF | FF10 | 0E76 | 76FF | FF0C | 0A76 | 76FF | FF08 |
| 0000633340 | 0676 | CF9A | 36C4 | 83A5 | 0EC4 | 4689 | B8FC | 0000 |
| 0000633360 | 00E9 | 5E00 | 835F | 02ED | E58B | 5D1F | CB4D | 581E |
| 0000633400 | 4590 | 8B55 | 1EEC | D88E | EC81 | 0000 | 5657 | 00B8 |
| 0000633420 | E900 | 0000 | 5F5E | ED83 | 8B02 | 1FE5 | 4D5D | 1ECB |
| 0000633440 | 9058 | 5545 | EC8B | 8E1E | 81D8 | 00EC | 5700 | FF56 |
| 0000633460 | 0C76 | 76FF | FF0A | 0876 | 76FF | 9A06 | C582 | A6D5 |
| 0000633500 | C483 | E908 | 0000 | 5F5E | ED83 | 8B02 | 1FE5 | 4D5D |
| 0000633520 | 00CB | 581E | 4590 | 8B55 | 1EEC | D88E | EC81 | 000A |
| 0000633540 | 5657 | 46C7 | 00F6 | 8D00 | FA46 | 5016 | 76FF | FF08 |
| 0000633560 | 0676 | B09A | C0AE | 83A7 | 08C4 | 4689 | 83F8 | F87E |
| 0000633600 | 7500 | E903 | 0006 | 468B | E9F8 | 0068 | 46C7 | AFF8 |
| 0000633620 | 8101 | F87E | 01AF | 0374 | 40E9 | 83C0 | F67E | 7C14 |
| 0000633640 | E903 | 0037 | 7E83 | 00F6 | 037F | 0AE9 | 6A00 | 6800 |
| 0000633660 | 1388 | FF9A | 00FF | FF00 | F646 | 9068 | 8D01 | FA46 |
| 0000633700 | 5016 | 468B | 8B06 | 0856 | 0405 | 5201 | 9A50 | DC57 |
| 0000633720 | A72E | C483 | 890A | F846 | B6E9 | 83FF | F87E | 7400 |
| 0000633740 | E903 | 000A | 5EC4 | 2606 | 87C7 | 025C | 0001 | 468B |
| 0000633760 | E9F8 | 0000 | 5F5E | ED83 | 8B02 | 1FE5 | 4D5D | 1ECB |
| 0000634000 | 9058 | 5545 | EC8B | 8E1E | 81D8 | 08EC | 5700 | 8D56 |
| 0000634020 | FA46 | 5016 | 76FF | FF08 | 0676 | B09A | 37AE | 83A8 |
| 0000634040 | 08C4 | 4689 | 83F8 | F87E | 7500 | E903 | 0006 | 468B |
| 0000634060 | E9F8 | 0053 | 468D | 16FA | 8B50 | 0646 | 568B | 0508 |
| 0000634100 | 0104 | 5052 | 5C9A | 56DD | 83A8 | 08C4 | 4689 | 83F8 |
| 0000634120 | F87E | 7500 | E903 | 0016 | 468B | 8B06 | 0856 | 0405 |
| 0000634140 | 5201 | 9A50 | DEC6 | A765 | C483 | 8904 | F846 | 7E83 |
| 0000634160 | 00F8 | 0374 | DAE9 | C400 | 065E | C726 | 5C87 | 0002 |
| 0000634200 | 8B00 | F846 | 00E9 | 5E00 | 835F | 02ED | E58B | 5D1F |
| 0000634220 | CB4D | 581E | 4590 | 8B55 | 1EEC | D88E | EC81 | 0000 |
| 0000634240 | 5657 | 5EC4 | 260A | 07C7 | 0000 | 5EC4 | 2606 | 1FC4 |
| 0000634260 | 8026 | 5C3F | 0375 | 0FE9 | C400 | 065E | C426 | 261F |
| 0000634300 | 3F80 | 742F | E903 | 0009 | 5EC4 | 2606 | 07FF | D9E9 |
| 0000634320 | C4FF | 065E | C426 | 261F | 3F80 | 7400 | E903 | 0006 |
| 0000634340 | FEB8 | E901 | 004E | 5EC4 | 260A | 378B | 5EC4 | 2606 |
| 0000634360 | 1FC4 | 8026 | 5C38 | 0375 | 33E9 | C400 | 0A5E | 8B26 |
| 0000634400 | C437 | 065E | C426 | 261F | 3880 | 752F | E903 | 001E |
| 0000634420 | 5EC4 | 260A | 378B | 5EC4 | 2606 | 1FC4 | 8026 | 0038 |
| 0000634440 | 0375 | 09E9 | C400 | 0A5E | FF26 | E907 | FFB8 | 00B8 |
| 0000634460 | E900 | 0000 | 5F5E | ED83 | 8B02 | 1FE5 | 4D5D | 1ECB |
| 0000634500 | 9058 | 5545 | EC8B | 8E1E | 81D8 | 12EC | 5700 | C456 |
| 0000634520 | 0E5E | C02B | 8926 | 0247 | 8926 | 8B07 | 0A46 | 568B |
| 0000634540 | 890C | F046 | 5689 | 8BF2 | F246 | 460B | 75F0 | E903 |
| 0000634560 | 0040 | 5EC4 | 26F0 | 3F80 | 755C | E903 | 000C | 5EC4 |
| 0000634600 | 26F0 | 3F80 | 742F | E903 | 0028 | 468D | 16F4 | FF50 |
| 0000634620 | 0876 | 76FF | 9A06 | AEB0 | A9D3 | C483 | 89D8 | F846 |
| 0000634640 | 7E83 | 00F8 | 0375 | 06E9 | 8B00 | F846 | 4EE9 | E9D1 |
| 0000634660 | 0024 | 5EC4 | 2606 | 878B | 0258 | 8B26 | 5A97 | 8902 |
| 0000634700 | F446 | 5689 | 8BF6 | F246 | 460B | 74F0 | E903 | 0006 |
| 0000634720 | 00B8 | E900 | 0127 | 468D | 16EE | 8D50 | F04E | 5116 |
| 0000634740 | 829A | 08A8 | 83AA | 08C4 | 4689 | 3DF8 | 0000 | 0374 |
| 0000634760 | E4E9 | C400 | F05E | 8026 | 2E3F | 0374 | 8FE9 | 8300 |

THU MAR 14 17:31:54 1991 DB_PI.DLL PAGE 225, LINE 13217

| | | | | | | | | |
|---|---|---|---|---|---|---|---|---|
| 0000635000 | EE7E | 7402 | E903 | 0057 | 76FF | 1EEE | 3268 | FF37 |
| 0000635020 | F276 | 76FF | 9AF0 | 282E | AA29 | C483 | 3D0A | 0000 |
| 0000635040 | 0374 | 3AE9 | 8D00 | FA46 | 5016 | 76FF | FFF6 | F476 |
| 0000635060 | 76FF | FF08 | 0676 | A99A | 68C9 | 83AA | 0CC4 | 4689 |
| 0000635100 | 83F8 | F87E | 7500 | E903 | 0006 | 468B | E9F8 | 00AD |
| 0000635120 | 468B | 8BFA | FC56 | 4689 | 89F4 | F656 | 2CE9 | 8300 |
| 0000635140 | EE7E | 7401 | E903 | 001D | 76FF | 1EEE | 3568 | FF37 |
| 0000635160 | F276 | 76FF | 9AF0 | 282E | AA9B | C483 | 3D0A | 0000 |
| 0000635200 | 0375 | 06E9 | B800 | 01B3 | 72E9 | E900 | 0040 | 468D |
| 0000635220 | 16FA | FF50 | EE76 | 76FF | FFF2 | F076 | 76FF | FFF6 |
| 0000635240 | F476 | 76FF | FF08 | 0676 | 039A | 0DC8 | 83A8 | 12C4 |
| 0000635260 | 4689 | 83F8 | F87E | 7500 | E903 | 0006 | ABB8 | E901 |
| 0000635300 | 003B | 468B | 8BFA | FC56 | 4689 | 89F4 | F656 | 468B |
| 0000635320 | 01EE | F046 | FFE9 | 81FE | F87E | 01FE | 0375 | 06E9 |
| 0000635340 | 8B00 | F846 | 16E9 | 8B00 | F446 | 568B | C4F6 | 0E5E |
| 0000635360 | 8926 | 2607 | 5789 | B802 | 0000 | 00E9 | 5E00 | 835F |
| 0000635400 | 02ED | E58B | 5D1F | CB4D | 581E | 4590 | 8B55 | 1EEC |
| 0000635420 | D88E | EC81 | 007A | 5657 | 46C7 | 708A | 8D00 | 8C46 |
| 0000635440 | 5016 | 468D | 168A | 8D50 | 0A46 | 5016 | 468B | 8B06 |
| 0000635460 | 0856 | 0405 | 5201 | 9A50 | D6BE | AB53 | C483 | 8910 |
| 0000635500 | FC46 | 7E83 | 00FC | 0375 | 10E9 | 8100 | FC7E | 01FA |
| 0000635520 | 0375 | 06E9 | 8B00 | FC46 | 61E9 | 8D00 | 9046 | 5016 |
| 0000635540 | B09A | 8227 | 83AB | 04C4 | 4689 | C486 | 0E5E | C426 |
| 0000635560 | 261F | 078A | 4688 | 8B88 | 8646 | 5EC4 | 260E | 0729 |
| 0000635600 | 468D | 1690 | C450 | 0E5E | FF26 | 0277 | FF26 | 9A37 |
| 0000635620 | 2750 | A988 | C483 | 8A08 | 8846 | 5EC4 | 260E | 1FC4 |
| 0000635640 | 768B | 2686 | 0088 | 5EC4 | 260E | 0FFF | 5EC4 | 260E |
| 0000635660 | 1FC4 | C626 | 5C07 | 00B8 | E900 | 0000 | 5F5E | ED83 |
| 0000635700 | 8B02 | 1FE5 | 4D5D | 1ECB | 9058 | 5545 | EC8B | 8E1E |
| 0000635720 | 81D8 | 18EC | 5701 | C756 | EE46 | 0000 | 5EC4 | 2B12 |
| 0000635740 | 26C0 | 4789 | 2602 | 0789 | 468A | 2A0D | 3DE4 | 0028 |
| 0000635760 | 037D | 16E9 | 8A00 | 0D46 | E42A | 2D3D | 7C00 | E903 |
| 0000636000 | 0009 | 86C7 | FEE8 | 0001 | 06E9 | C700 | E886 | 00FE |
| 0000636020 | 8300 | E8BE | 00FE | 0374 | 06E9 | B800 | 01AC | D5E9 |
| 0000636040 | 8D01 | FA46 | 5016 | 76FF | FF08 | 0676 | B09A | A2AE |
| 0000636060 | 83AC | 08C4 | 4689 | 83F0 | F07E | 7500 | E903 | 0006 |
| 0000636100 | 468B | E9F0 | 01B0 | 468D | 89ED | F646 | 568C | C4F8 |
| 0000636120 | F65E | C626 | 0007 | 468B | 8B0A | 0C56 | 4639 | 74FA |
| 0000636140 | E903 | 0012 | 5639 | 74FC | E903 | 000A | 4EFF | C4F6 |
| 0000636160 | F65E | C626 | 5C07 | 468B | 8B0A | 0C56 | 8689 | FEEA |
| 0000636200 | 9689 | FEEC | 868B | FEEA | 968B | FEEC | 4639 | 74FA |
| 0000636220 | E903 | 0008 | 5639 | 75FC | E903 | 007E | 468D | 16F6 |
| 0000636240 | FF50 | ECB6 | FFFE | EAB6 | FFFE | 0876 | 76FF | 9A06 |
| 0000636260 | AAF8 | ACCF | C483 | 890C | F046 | 7E83 | 00F0 | 0375 |
| 0000636300 | 06E9 | 8B00 | F046 | 2DE9 | 8D01 | F246 | 5016 | B6FF |
| 0000636320 | FEEC | B6FF | FEEA | 76FF | FF08 | 0676 | A99A | 1EC9 |
| 0000636340 | 83AD | 0CC4 | 4689 | 83F0 | F07E | 7500 | E903 | 0006 |
| 0000636360 | 468B | E9F0 | 0100 | 468B | 8BF2 | F456 | 8689 | FEEA |
| 0000636400 | 9689 | FEEC | 46FF | 81EE | EE7E | 0A8C | 037D | 06E9 |
| 0000636420 | B800 | 01F8 | DFE9 | E900 | FF6A | 468B | 0B10 | 0E46 |
| 0000636440 | 0375 | 7CE9 | FF00 | 1076 | 76FF | 9A0E | 27B0 | AD2E |
| 0000636460 | C483 | FF04 | F876 | 76FF | 8BF6 | 9AF0 | 27B0 | AD3A |
| 0000636500 | C483 | 0304 | 46F0 | 9A56 | 243E | AD71 | C483 | C402 |
| 0000636520 | 125E | 8926 | 2607 | 5789 | C402 | 125E | 8B26 | 0247 |
| 0000636540 | 0B26 | 7407 | E903 | 0006 | 07B8 | E900 | 0088 | 76FF |
| 0000636560 | FF10 | 0E76 | 5EC4 | 2612 | 77FF | 2602 | 37FF | 509A |
| 0000636600 | 8927 | 83AD | 08C4 | 76FF | FFF8 | F676 | 5EC4 | 2612 |
| 0000636620 | 77FF | 2602 | 37FF | 0A9A | 9A27 | 83AD | 08C4 | 4FE9 |
| 0000636640 | FF00 | F876 | 76FF | 9AF6 | 27B0 | ADA4 | C483 | 4004 |

THU MAR 14 17:31:54 1991 DB_PI.DLL PAGE 226, LINE 13276

| | | | | | | | | |
|---|---|---|---|---|---|---|---|---|
| 0000636660 | 9A50 | 243E | ADDB | C483 | C402 | 125E | 8926 | 2607 |
| 0000636700 | 5789 | C402 | 125E | 8B26 | 0247 | 0B26 | 7407 | E903 |
| 0000636720 | 0006 | 07B8 | E900 | 001E | 76FF | FFF8 | F676 | 5EC4 |
| 0000636740 | 2612 | 77FF | 2602 | 37FF | 509A | 2A27 | 83AB | 08C4 |
| 0000636760 | 00B8 | E900 | 0000 | 5F5E | ED83 | 8B02 | 1FE5 | 4D5D |
| 0000637000 | 1ECB | 9058 | 5545 | EC8B | 8E1E | 81D8 | 0AEC | 5700 |
| 0000637020 | FF56 | 0876 | 76FF | FF06 | 0C76 | 76FF | 9A0A | 2750 |
| 0000637040 | AE20 | C483 | 6A08 | FF5C | 0C76 | 76FF | 9A0A | 3C3E |
| 0000637060 | AE36 | C483 | 8906 | FA46 | 5689 | 6AFC | FF2F | 0C76 |
| 0000637100 | 76FF | 9A0A | 3C3E | AE72 | C483 | 8906 | F646 | 5689 |
| 0000637120 | 8BF8 | FA46 | 4639 | 77F6 | E903 | 000C | 468B | 8BF6 |
| 0000637140 | F856 | 4689 | 89FA | FC56 | 468B | 0BFC | FA46 | 0374 |
| 0000637160 | 1EE9 | FF00 | 0C76 | 76FF | FF0A | 1076 | 76FF | 9A0E |
| 0000637200 | 2750 | AE93 | C483 | C408 | 0A5E | C626 | 0007 | 1EE9 |
| 0000637220 | FF00 | FA46 | 76FF | FFFC | FA76 | 76FF | FF10 | 0E76 |
| 0000637240 | 509A | 1F27 | 83AC | 08C4 | 5EC4 | 26FA | 07C6 | B800 |
| 0000637260 | 0000 | 00E9 | 5E00 | 835F | 02ED | E58B | 5D1F | CB4D |
| 0000637300 | 581E | 4590 | 8B55 | 1EEC | D88E | EC81 | 0000 | 5657 |
| 0000637320 | 5EC4 | 260A | 07C7 | 0001 | C726 | 0247 | 0000 | 5EC4 |
| 0000637340 | 260A | 078B | 8B26 | 0257 | FF25 | 81FF | FFE2 | 0D00 |
| 0000637360 | 0000 | CA81 | 2800 | 5EC4 | 260A | 0789 | 8926 | 0257 |
| 0000637400 | 5EC4 | 2606 | 078B | E0C1 | 2B02 | C4C9 | 0A5E | 8B26 |
| 0000637420 | 2617 | 778B | 8302 | FFE2 | E681 | FF03 | CA0B | C60B |
| 0000637440 | 5EC4 | 260A | 0F89 | 8926 | 0247 | 00B8 | E900 | 0000 |
| 0000637460 | 5F5E | ED83 | 8B02 | 1FE5 | 4D5D | 1ECB | 9058 | 5545 |
| 0000637500 | EC8B | 8E1E | 81D8 | 42EC | 5702 | 8B56 | 1446 | 460B |
| 0000637520 | 7412 | E903 | 00FA | 86C7 | FDBE | 01F0 | 868D | FDEE |
| 0000637540 | 8689 | FDC0 | 968C | FDC2 | B6FF | FDC2 | B6FF | FDC0 |
| 0000637560 | 868D | FDBE | 5016 | 468D | 160A | 8B50 | 0646 | 568B |
| 0000637600 | 0508 | 0104 | 5052 | BE9A | 0BD6 | 83B0 | 10C4 | 8689 |
| 0000637620 | FDE4 | BE83 | FDE4 | 7500 | E903 | 0007 | 868B | FDE4 |
| 0000637640 | 38E9 | 8D01 | DE46 | 5016 | 76FF | FF10 | 0E76 | 3D9A |
| 0000637660 | F142 | 83AF | 08C4 | 8689 | FDE4 | BE83 | FDE4 | 7500 |
| 0000637700 | E903 | 0007 | 868B | FDE4 | 10E9 | C401 | C09E | 26FD |
| 0000637720 | 478B | 032E | C086 | 8BFD | C296 | 89FD | EA86 | 89FD |
| 0000637740 | EC96 | 8DFD | C486 | 16FD | 6A50 | FF00 | ECB6 | FFFD |
| 0000637760 | EAB6 | FFFD | 1876 | 76FF | 8D16 | DE4E | 5116 | EA9A |
| 0000640000 | 123A | 83A6 | 12C4 | 8689 | FDE4 | B6FF | FDEC | B6FF |
| 0000640020 | FDEA | 76FF | FF1C | 1A76 | 509A | 1D27 | 83B0 | 08C4 |
| 0000640040 | 681E | 3738 | 76FF | FF1C | 1A76 | 0A9A | 3127 | 83B0 |
| 0000640060 | 08C4 | 868D | FDC4 | 5016 | 76FF | FF1C | 1A76 | 0A9A |
| 0000640100 | 4B27 | 83B0 | 08C4 | 868B | FDE4 | 8EE9 | E900 | 0085 |
| 0000640120 | 2E6A | 76FF | FF14 | 1276 | 3E9A | 633C | 83B0 | 06C4 |
| 0000640140 | 8689 | FDE6 | 9689 | FDE8 | 5C6A | 76FF | FF14 | 1276 |
| 0000640160 | 3E9A | A13C | 83B0 | 06C4 | 8689 | FDEA | 9689 | FDEC |
| 0000640200 | 868B | FDE8 | 860B | FDE6 | 0375 | 15E9 | 8B00 | E686 |
| 0000640220 | 39FD | EA86 | 72FD | E903 | 0008 | 9EC4 | FDE6 | C626 |
| 0000640240 | 0007 | 76FF | FF14 | 1276 | 76FF | FF1C | 1A76 | 509A |
| 0000640260 | C027 | 83B0 | 08C4 | 468B | 0B18 | 1646 | 0375 | 14E9 |
| 0000640300 | FF00 | 1876 | 76FF | FF16 | 1C76 | 76FF | 9A1A | 270A |
| 0000640320 | AE10 | C483 | B808 | 0000 | 00E9 | 5E00 | 835F | 02ED |
| 0000640340 | E58B | 5D1F | CB4D | 581E | 4590 | 8B55 | 1EEC | D88E |
| 0000640360 | EC81 | 010A | 5657 | 76FF | FF08 | 0676 | 868D | FEF8 |
| 0000640400 | 5016 | 509A | 0727 | 83B1 | 08C4 | 681E | 373A | 868D |
| 0000640420 | FEF8 | 5016 | 0A9A | 1927 | 83B1 | 08C4 | 681E | 373C |
| 0000640440 | 868D | FEF8 | 5016 | 0A9A | 2B27 | 83B1 | 08C4 | 681E |
| 0000640460 | 3743 | 868D | FEF8 | 5016 | 569A | B606 | 83B1 | 08C4 |
| 0000640500 | 4689 | 89FA | FC56 | 468B | 0BFC | FA46 | 0374 | 06E9 |
| 0000640520 | B800 | 0008 | 9AE9 | FF00 | 1676 | 76FF | FF14 | 1276 |

THU MAR 14 17:31:54 1991 DB_PI.DLL PAGE 227, LINE 13335

| | | | | | | | | |
|---|---|---|---|---|---|---|---|---|
| 0000640540 | 76FF | FF10 | 0E76 | 76FF | 830C | 0A7E | 7428 | E903 |
| 0000640560 | 0006 | 46B8 | E937 | 003F | 7E83 | 290A | 0374 | 06E9 |
| 0000640600 | B800 | 3749 | 30E9 | 8300 | 0A7E | 742A | E903 | 0006 |
| 0000640620 | 4CB8 | E937 | 0021 | 7E83 | 2B0A | 0374 | 06E9 | B800 |
| 0000640640 | 374F | 12E9 | 8300 | 0A7E | 742C | E903 | 0006 | 52B8 |
| 0000640660 | E937 | 0003 | 55B8 | 1E37 | 1E50 | 5D68 | FF37 | FC76 |
| 0000640700 | 76FF | 9AFA | 066E | B1C4 | C483 | FF18 | FC76 | 76FF |
| 0000640720 | 9AFA | 0502 | AF79 | C483 | 8904 | F846 | 7E83 | 00F8 |
| 0000640740 | 0375 | 06E9 | B800 | 0009 | 06E9 | B800 | 0000 | 00E9 |
| 0000640760 | 5E00 | 835F | 02ED | E58B | 5D1F | CB4D | 581E | 4590 |
| 0000641000 | 8B55 | 1EEC | D88E | EC81 | 0106 | 5657 | 868D | FEFC |
| 0000641020 | 5016 | 76FF | FF18 | 1676 | 76FF | FF14 | 1276 | 76FF |
| 0000641040 | FF10 | 0E76 | 76FF | FF0C | 0A76 | 76FF | FF08 | 0676 |
| 0000641060 | 2B9A | 43AF | 83B2 | 18C4 | 4689 | 83FC | FC7E | 7500 |
| 0000641100 | E903 | 0006 | 468B | E9FC | 00CF | 868D | FEFC | 5016 |
| 0000641120 | B09A | 5927 | 83B2 | 04C4 | 4603 | 401A | 8689 | FEFA |
| 0000641140 | B6FF | FEFA | 016A | 769A | 9533 | 83B2 | 04C4 | 5EC4 |
| 0000641160 | 261C | 0789 | 8926 | 0257 | 5EC4 | 261C | 478B | 2602 |
| 0000641200 | 070B | 0374 | 06E9 | B800 | 0007 | 8CE9 | FF00 | 1076 |
| 0000641220 | 76FF | C40E | 1C5E | 8B26 | 2607 | 578B | 0502 | 0004 |
| 0000641240 | 5052 | 509A | A127 | 83B2 | 08C4 | 006A | 006A | 089A |
| 0000641260 | FE39 | 83B2 | 04C4 | 5EC4 | 261C | 1FC4 | 8926 | 2447 |
| 0000641300 | 8926 | 2657 | 868B | FEFA | 5EC4 | 261C | 1FC4 | 8926 |
| 0000641320 | 2C47 | 5EC4 | 261C | 1FC4 | C02B | 8926 | 2A47 | 8926 |
| 0000641340 | 2847 | 468B | C41A | 1C5E | C426 | 261F | 4789 | 8D2E |
| 0000641360 | FC86 | 16FE | C450 | 1C5E | C426 | 261F | 478B | C42E |
| 0000641400 | 1C5E | 0326 | 2607 | 578B | 5202 | 9A50 | 2750 | B0F5 |
| 0000641420 | C483 | B808 | 0000 | 00E9 | 5E00 | 835F | 02ED | E58B |
| 0000641440 | 5D1F | CB4D | 581E | 4590 | 8B55 | 1EEC | D88E | EC81 |
| 0000641460 | 0008 | 5657 | 468D | 16FA | 6850 | 00B0 | 681E | 3774 |
| 0000641500 | 76FF | FF0C | 0A76 | 681E | 3775 | 006A | 006A | 76FF |
| 0000641520 | FF08 | 0676 | EC9A | 6DB1 | 83B3 | 1AC4 | 4689 | 83F8 |
| 0000641540 | F87E | 7500 | E903 | 0006 | 468B | E9F8 | 0126 | 76FF |
| 0000641560 | FFFC | FA76 | 76FF | FF08 | 0676 | B09A | B6AE | 83B3 |
| 0000641600 | 08C4 | 4689 | 83F8 | F87E | 7500 | E903 | 0006 | 468B |
| 0000641620 | E9F8 | 0100 | 5EC4 | 2606 | 8783 | 018A | 2601 | 9783 |
| 0000641640 | 018C | 6A00 | FF00 | FC76 | 76FF | C4FA | FA5E | FF26 |
| 0000641660 | 2C77 | 76FF | FFFC | FA76 | 468B | 8B06 | 0856 | 0405 |
| 0000641700 | 5201 | 9A50 | D049 | B3D0 | C483 | 8910 | F846 | 7E83 |
| 0000641720 | 00F8 | 0375 | 14E9 | FF00 | FC76 | 76FF | 9AFA | 2448 |
| 0000641740 | B42D | C483 | 8B04 | F846 | A9E9 | 6A00 | C400 | FA5E |
| 0000641760 | 8B26 | 2E47 | 4603 | 8BFA | FC56 | 5052 | DE9A | A12A |
| 0000642000 | 83AF | 06C4 | 4689 | 83F8 | F87E | 7400 | E903 | 0035 |
| 0000642020 | 006A | 006A | 5EC4 | 26FA | 77FF | 2602 | 37FF | 468B |
| 0000642040 | 8BFA | FC56 | 0405 | 5200 | 6A50 | C428 | FA5E | 8B26 |
| 0000642060 | 2E47 | 4603 | 8BFA | FC56 | 5052 | D69A | 51B0 | 83B4 |
| 0000642100 | 12C4 | 4689 | 83F8 | F87E | 7500 | E903 | 001E | 5EC4 |
| 0000642120 | 26FA | 77FF | 2602 | 37FF | 76FF | FF08 | 0676 | 8E9A |
| 0000642140 | 79C7 | 83B4 | 08C4 | 468B | E9F8 | 0028 | 5EC4 | 26FA |
| 0000642160 | 078B | 8B26 | 0257 | 5EC4 | 260E | 0789 | 8926 | 0257 |
| 0000642200 | 76FF | FFFC | FA76 | 489A | 2324 | 83B2 | 04C4 | 00B8 |
| 0000642220 | E900 | 0000 | 5F5E | ED83 | 8B02 | 1FE5 | 4D5D | 1ECB |
| 0000642240 | 9058 | 5545 | EC8B | 8E1E | 81D8 | 08EC | 5700 | 8A56 |
| 0000642260 | 0D46 | E42A | 283D | 7500 | E903 | 0006 | ADB8 | E901 |
| 0000642300 | 014D | 016A | 76FF | FF0C | 0A76 | 76FF | FF08 | 0676 |
| 0000642320 | B79A | 01CD | 83B5 | 0AC4 | 4689 | 83F8 | F87E | 7500 |
| 0000642340 | E903 | 0006 | 468B | E9F8 | 0125 | 468D | 16FA | 6850 |
| 0000642360 | 00B0 | 681E | 377E | 76FF | FF14 | 1276 | 76FF | FF10 |
| 0000642400 | 0E76 | 76FF | FF0C | 0A76 | 76FF | FF08 | 0676 | EC9A |

THU MAR 14 17:31:54 1991 DB_PI.DLL PAGE 228, LINE 13394

| | | | | | | | | |
|---|---|---|---|---|---|---|---|---|
| 0000642420 | 2FB1 | 83B5 | 1AC4 | 4689 | 83F8 | F87E | 7500 | E903 |
| 0000642440 | 0006 | 468B | E9F8 | 00E7 | 76FF | FFFC | FA76 | 286A |
| 0000642460 | 76FF | FF0C | 0A76 | 76FF | FF08 | 0676 | 549A | 49C6 |
| 0000642500 | 83B5 | 0EC4 | 4689 | 83F8 | F87E | 7500 | E903 | 0014 |
| 0000642520 | 76FF | FFFC | FA76 | 489A | A824 | 83B5 | 04C4 | 468B |
| 0000642540 | E9F8 | 00AB | 006A | 5EC4 | 26FA | 478B | 032E | FA46 |
| 0000642560 | 568B | 52FC | 9A50 | 2ADE | B3EF | C483 | 8906 | F846 |
| 0000642600 | 7E83 | 00F8 | 0374 | 37E9 | FF00 | 0C76 | 76FF | C40A |
| 0000642620 | FA5E | FF26 | 0277 | FF26 | 8B37 | FA46 | 568B | 05FC |
| 0000642640 | 0004 | 5052 | 286A | 5EC4 | 26FA | 478B | 032E | FA46 |
| 0000642660 | 568B | 52FC | 9A50 | B0D6 | B5CC | C483 | 8912 | F846 |
| 0000642700 | 7E83 | 00F8 | 0375 | 1EE9 | C400 | FA5E | FF26 | 0277 |
| 0000642720 | FF26 | FF37 | 0876 | 76FF | 9A06 | C78E | B5F4 | C483 |
| 0000642740 | 8B08 | F846 | 28E9 | C400 | FA5E | 8B26 | 2607 | 578B |
| 0000642760 | C402 | 165E | 8926 | 2607 | 5789 | FF02 | FC76 | 76FF |
| 0000643000 | 9AFA | 2448 | B347 | C483 | B804 | 0000 | 00E9 | 5E00 |
| 0000643020 | 835F | 02ED | E58B | 5D1F | CB4D | 581E | 4590 | 8B55 |
| 0000643040 | 1EEC | D88E | EC81 | 010C | 5657 | 468A | 2A0D | 3DE4 |
| 0000643060 | 0028 | 0375 | 06E9 | B800 | 01AD | DCE9 | 8D01 | F686 |
| 0000643100 | 16FE | 6850 | 00F0 | 681E | 377F | 76FF | FF14 | 1276 |
| 0000643120 | 76FF | FF10 | 0E76 | 76FF | FF0C | 0A76 | 76FF | FF08 |
| 0000643140 | 0676 | EC9A | 88B1 | 83B6 | 1AC4 | 8689 | FEF4 | BE83 |
| 0000643160 | FEF4 | 7500 | E903 | 0007 | 868B | FEF4 | 9AE9 | FF01 |
| 0000643200 | F8B6 | FFFE | F6B6 | 6AFE | FF29 | 0C76 | 76FF | FF0A |
| 0000643220 | 0876 | 76FF | 9A06 | C654 | B6A6 | C483 | 890E | F486 |
| 0000643240 | 83FE | F4BE | 00FE | 0375 | 17E9 | FF00 | F8B6 | FFFE |
| 0000643260 | F6B6 | 9AFE | 2448 | B711 | C483 | 8B04 | F486 | E9FE |
| 0000643300 | 0157 | 006A | 9EC4 | FEF6 | 8B26 | 2E47 | 8603 | FEF6 |
| 0000643320 | 968B | FEF8 | 5052 | DE9A | 682A | 83B5 | 06C4 | 8689 |
| 0000643340 | FEF4 | BE83 | FEF4 | 7400 | E903 | 003E | 76FF | FF0C |
| 0000643360 | 0A76 | 9EC4 | FEF6 | FF26 | 0277 | FF26 | 8B37 | F686 |
| 0000643400 | 8BFE | F896 | 05FE | 0004 | 5052 | 296A | 9EC4 | FEF6 |
| 0000643420 | 8B26 | 2E47 | 8603 | FEF6 | 968B | FEF8 | 5052 | D69A |
| 0000643440 | C3B0 | 83B4 | 12C4 | 8689 | FEF4 | BE83 | FEF4 | 7500 |
| 0000643460 | E903 | 0020 | 9EC4 | FEF6 | FF26 | 0277 | FF26 | FF37 |
| 0000643500 | 0876 | 76FF | 9A06 | C78E | B75F | C483 | 8B08 | F486 |
| 0000643520 | E9FE | 00C5 | 9EC4 | FEF6 | 8B26 | 2E47 | 8603 | FEF6 |
| 0000643540 | 968B | FEF8 | 5052 | 868D | FEFA | 5016 | 509A | 7127 |
| 0000643560 | 83B7 | 08C4 | 681E | 3780 | 868D | FEFA | 5016 | 0A9A |
| 0000643600 | 8327 | 83B7 | 08C4 | 681E | 3782 | 868D | FEFA | 5016 |
| 0000643620 | 0A9A | AB27 | 83B7 | 08C4 | 468D | 16FA | 8D50 | FA86 |
| 0000643640 | 16FE | 1E50 | 8568 | C437 | F69E | 26FE | 77FF | 2602 |
| 0000643660 | 37FF | 76FF | FF08 | 0676 | 679A | D2B9 | 83B7 | 14C4 |
| 0000643700 | 8689 | FEF4 | BE83 | FEF4 | 7500 | E903 | 0020 | 9EC4 |
| 0000643720 | FEF6 | FF26 | 0277 | FF26 | FF37 | 0876 | 76FF | 9A06 |
| 0000643740 | BE2A | B7FE | C483 | 8B08 | F486 | E9FE | 002B | 9EC4 |
| 0000643760 | FEF6 | 8B26 | 2607 | 578B | C402 | 165E | 8926 | 2607 |
| 0000644000 | 5789 | FF02 | F8B6 | FFFE | F6B6 | 9AFE | 2448 | B655 |
| 0000644020 | C483 | B804 | 0000 | 00E9 | 5E00 | 835F | 02ED | E58B |
| 0000644040 | 5D1F | CB4D | 581E | 4590 | 8B55 | 1EEC | D88E | EC81 |
| 0000644060 | 0008 | 5657 | 468A | 2A0D | 3DE4 | 0028 | 0375 | 06E9 |
| 0000644100 | B800 | 01AD | 25E9 | 8D01 | FA46 | 5016 | F068 | 1E00 |
| 0000644120 | 8868 | FF37 | 1476 | 76FF | FF12 | 1076 | 76FF | FF0E |
| 0000644140 | 0C76 | 76FF | FF0A | 0876 | 76FF | 9A06 | B1EC | B88C |
| 0000644160 | C483 | 891A | F846 | 7E83 | 00F8 | 0375 | 06E9 | 8B00 |
| 0000644200 | F846 | E7E9 | FF00 | FC76 | 76FF | 6AFA | FF2B | 0C76 |
| 0000644220 | 76FF | FF0A | 0876 | 76FF | 9A06 | C654 | B8A6 | C483 |
| 0000644240 | 890E | F846 | 7E83 | 00F8 | 0375 | 14E9 | FF00 | FC76 |
| 0000644260 | 76FF | 9AFA | 2448 | B905 | C483 | 8B04 | F846 | ABE9 |

THU MAR 14 17:31:54 1991 DB_PI.DLL PAGE 229, LINE 13453

| | | | | | | | | |
|---|---|---|---|---|---|---|---|---|
| 0000644300 | 6A00 | C400 | FA5E | 8B26 | 2E47 | 4603 | 8BFA | FC56 |
| 0000644320 | 5052 | DE9A | C92A | 83B6 | 06C4 | 4689 | 83F8 | F87E |
| 0000644340 | 7400 | E903 | 0037 | 76FF | FF0C | 0A76 | 5EC4 | 26FA |
| 0000644360 | 77FF | 2602 | 37FF | 468B | 8BFA | FC56 | 0405 | 5200 |
| 0000644400 | 6A50 | C42B | FA5E | 8B26 | 2E47 | 4603 | 8BFA | FC56 |
| 0000644420 | 5052 | D69A | 29B0 | 83B9 | 12C4 | 4689 | 83F8 | F87E |
| 0000644440 | 7500 | E903 | 001E | 5EC4 | 26FA | 77FF | 2602 | 37FF |
| 0000644460 | 76FF | FF08 | 0676 | 8E9A | 51C7 | 83B9 | 08C4 | 468B |
| 0000644500 | E9F8 | 0028 | 5EC4 | 26FA | 078B | 8B26 | 0257 | 5EC4 |
| 0000644520 | 2616 | 0789 | 8926 | 0257 | 76FF | FFFC | FA76 | 489A |
| 0000644540 | 3824 | 83B7 | 04C4 | 00B8 | E900 | 0000 | 5F5E | ED83 |
| 0000644560 | 8B02 | 1FE5 | 4D5D | 1ECB | 9058 | 5545 | EC8B | 8E1E |
| 0000644600 | 81D8 | 08EC | 5700 | 8A56 | 0D46 | E42A | 293D | 7500 |
| 0000644620 | E903 | 0006 | ADB8 | E901 | 0125 | 468D | 16FA | 6850 |
| 0000644640 | 00B0 | 681E | 3789 | 76FF | FF14 | 1276 | 76FF | FF10 |
| 0000644660 | 0E76 | 76FF | FF0C | 0A76 | 76FF | FF08 | 0676 | EC9A |
| 0000644700 | DFB1 | 83B9 | 1AC4 | 4689 | 83F8 | F87E | 7500 | E903 |
| 0000644720 | 0006 | 468B | E9F8 | 00E7 | 76FF | FFFC | FA76 | 2A6A |
| 0000644740 | 76FF | FF0C | 0A76 | 76FF | FF08 | 0676 | 549A | F9C6 |
| 0000644760 | 83B9 | 0EC4 | 4689 | 83F8 | F87E | 7500 | E903 | 0014 |
| 0000645000 | 76FF | FFFC | FA76 | 489A | 5824 | 83BA | 04C4 | 468B |
| 0000645020 | E9F8 | 00AB | 006A | 5EC4 | 26FA | 478B | 032E | FA46 |
| 0000645040 | 568B | 52FC | 9A50 | 2ADE | B8C5 | C483 | 8906 | F846 |
| 0000645060 | 7E83 | 00F8 | 0374 | 37E9 | FF00 | 0C76 | 76FF | C40A |
| 0000645100 | FA5E | FF26 | 0277 | FF26 | 8B37 | FA46 | 568B | 05FC |
| 0000645120 | 0004 | 5052 | 2A6A | 5EC4 | 26FA | 478B | 032E | FA46 |
| 0000645140 | 568B | 52FC | 9A50 | B0D6 | BA7C | C483 | 8912 | F846 |
| 0000645160 | 7E83 | 00F8 | 0375 | 1EE9 | C400 | FA5E | FF26 | 0277 |
| 0000645200 | FF26 | FF37 | 0876 | 76FF | 9A06 | C78E | BAA4 | C483 |
| 0000645220 | 8B08 | F846 | 28E9 | C400 | FA5E | 8B26 | 2607 | 578B |
| 0000645240 | C402 | 165E | 8926 | 2607 | 5789 | FF02 | FC76 | 76FF |
| 0000645260 | 9AFA | 2448 | B85E | C483 | B804 | 0000 | 00E9 | 5E00 |
| 0000645300 | 835F | 02ED | E58B | 5D1F | CB4D | 581E | 4590 | 8B55 |
| 0000645320 | 1EEC | D88E | EC81 | 0008 | 5657 | 468A | 2A0D | 3DE4 |
| 0000645340 | 0029 | 0375 | 06E9 | B800 | 01AD | 25E9 | 8D01 | FA46 |
| 0000645360 | 5016 | B068 | 1E00 | 8A68 | FF37 | 1476 | 76FF | FF12 |
| 0000645400 | 1076 | 76FF | FF0E | 0C76 | 76FF | FF0A | 0876 | 76FF |
| 0000645420 | 9A06 | B1EC | BB32 | C483 | 891A | F846 | 7E83 | 00F8 |
| 0000645440 | 0375 | 06E9 | 8B00 | F846 | E7E9 | FF00 | FC76 | 76FF |
| 0000645460 | 6AFA | FF2C | 0C76 | 76FF | FF0A | 0876 | 76FF | 9A06 |
| 0000645500 | C654 | BB4C | C483 | 890E | F846 | 7E83 | 00F8 | 0375 |
| 0000645520 | 14E9 | FF00 | FC76 | 76FF | 9AFA | 2448 | BBAB | C483 |
| 0000645540 | 8B04 | F846 | ABE9 | 6A00 | C400 | FA5E | 8B26 | 2E47 |
| 0000645560 | 4603 | 8BFA | FC56 | 5052 | DE9A | 182A | 83BA | 06C4 |
| 0000645600 | 4689 | 83F8 | F87E | 7400 | E903 | 0037 | 76FF | FF0C |
| 0000645620 | 0A76 | 5EC4 | 26FA | 77FF | 2602 | 37FF | 468B | 8BFA |
| 0000645640 | FC56 | 0405 | 5200 | 6A50 | C42C | FA5E | 8B26 | 2E47 |
| 0000645660 | 4603 | 8BFA | FC56 | 5052 | D69A | CFB0 | 83BB | 12C4 |
| 0000645700 | 4689 | 83F8 | F87E | 7500 | E903 | 001E | 5EC4 | 26FA |
| 0000645720 | 77FF | 2602 | 37FF | 76FF | FF08 | 0676 | 8E9A | F7C7 |
| 0000645740 | 83BB | 08C4 | 468B | E9F8 | 0028 | 5EC4 | 26FA | 078B |
| 0000645760 | 8B26 | 0257 | 5EC4 | 2616 | 0789 | 8926 | 0257 | 76FF |
| 0000646000 | FFFC | FA76 | 489A | B124 | 83B9 | 04C4 | 00B8 | E900 |
| 0000646020 | 0000 | 5F5E | ED83 | 8B02 | 1FE5 | 4D5D | 1ECB | 9058 |
| 0000646040 | 5545 | EC8B | 8E1E | 81D8 | 04EC | 5700 | 8B56 | 1246 |
| 0000646060 | BBE9 | FF00 | 1A76 | 76FF | FF18 | 1676 | 76FF | FF14 |
| 0000646100 | 1076 | 76FF | FF0E | 0C76 | 76FF | FF0A | 0876 | 76FF |
| 0000646120 | 9A06 | B48F | BC70 | C483 | 8914 | FC46 | ADE9 | FF00 |
| 0000646140 | 1A76 | 76FF | FF18 | 1676 | 76FF | FF14 | 1076 | 76FF |

THU MAR 14 17:31:54 1991 DB_PI.DLL PAGE 230, LINE 13512

| | | | | | | | | |
|---|---|---|---|---|---|---|---|---|
| 0000646160 | FF0E | 0C76 | 76FF | FF0A | 0876 | 76FF | 9A06 | B60A |
| 0000646200 | BC9C | C483 | 8914 | FC46 | 81E9 | FF00 | 1A76 | 76FF |
| 0000646220 | FF18 | 1676 | 76FF | FF14 | 1076 | 76FF | FF0E | 0C76 |
| 0000646240 | 76FF | FF0A | 0876 | 76FF | 9A06 | B814 | BCC8 | C483 |
| 0000646260 | 8914 | FC46 | 55E9 | FF00 | 1A76 | 76FF | FF18 | 1676 |
| 0000646300 | 76FF | FF14 | 1076 | 76FF | FF0E | 0C76 | 76FF | FF0A |
| 0000646320 | 0876 | 76FF | 9A06 | BABA | BB04 | C483 | 8914 | FC46 |
| 0000646340 | 29E9 | C700 | FC46 | 01AD | 21E9 | E900 | 001E | 282D |
| 0000646360 | 7500 | E903 | FF3D | 7548 | E903 | FF63 | 4848 | 0375 |
| 0000646400 | 88E9 | 48FF | 0375 | AEE9 | E9FF | FFD7 | 468B | E9FC |
| 0000646420 | 0000 | 5F5E | ED83 | 8B02 | 1FE5 | 4D5D | 1ECB | 9058 |
| 0000646440 | 5545 | EC8B | 8E1E | 81D8 | 30EC | 5700 | C756 | D046 |
| 0000646460 | 0000 | 46C7 | 28D2 | 8D00 | D646 | 5016 | 468D | 16D2 |
| 0000646500 | 8D50 | 0A46 | 5016 | 016A | 056A | 468B | 8B06 | 0856 |
| 0000646520 | AE05 | 5201 | 9A50 | D81B | BD6E | C483 | 8914 | D446 |
| 0000646540 | 7E83 | 00D4 | 0374 | 70E9 | FF00 | 1076 | 76FF | FF0E |
| 0000646560 | DC76 | 76FF | FFDA | 0876 | 76FF | 9A06 | BD0D | BDAB |
| 0000646600 | C483 | 890C | D446 | 7E83 | 00D4 | 0375 | D6E9 | 8B00 |
| 0000646620 | D446 | 9AE9 | C700 | D246 | 0028 | 468D | 16D6 | 8D50 |
| 0000646640 | D246 | 5016 | 468D | 160A | 6A50 | 6A01 | 8B05 | 0646 |
| 0000646660 | 568B | 0508 | 01AE | 5052 | 1B9A | F2D8 | 83BD | 14C4 |
| 0000646700 | 4689 | FFD4 | D046 | 7E81 | 8CD0 | 7D0A | E903 | 0006 |
| 0000646720 | F8B8 | E901 | 0059 | 87E9 | 81FF | D47E | 01AB | 0375 |
| 0000646740 | 10E9 | 8100 | D47E | 01BC | 0375 | 06E9 | 8B00 | D446 |
| 0000646760 | 3CE9 | FF00 | 0C76 | 76FF | FF0A | 0876 | 76FF | 9A06 |
| 0000647000 | BE2A | BC44 | C483 | 8908 | D446 | 7E83 | 00D4 | 0375 |
| 0000647020 | 16E9 | 8B00 | 0A46 | 568B | C40C | 0E5E | 8926 | 2607 |
| 0000647040 | 5789 | 8B02 | D446 | 06E9 | B800 | 0000 | 00E9 | 5E00 |
| 0000647060 | 835F | 02ED | E58B | 5D1F | CB4D | 581E | 4590 | 8B55 |
| 0000647100 | 1EEC | D88E | EC81 | 01FA | 5657 | 868D | FE0A | 4689 |
| 0000647120 | 8CFA | FC56 | 86C7 | FE06 | 01F0 | 76FF | FFFC | FA76 |
| 0000647140 | 868D | FE06 | 5016 | 468D | 160A | 8B50 | 0646 | 568B |
| 0000647160 | 0508 | 0104 | 5052 | BE9A | 9BD6 | 83BE | 1DC4 | 8689 |
| 0000647200 | FE08 | BE83 | FE08 | 7500 | E903 | 0007 | 868B | FE08 |
| 0000647220 | 9AE9 | C400 | FA5E | 8B26 | 2E47 | 4603 | 8BFA | FC56 |
| 0000647240 | 5052 | 76FF | FF0C | 0A76 | 829A | FDC5 | 83BE | 08C4 |
| 0000647260 | 8689 | FE08 | BE83 | FE08 | 7500 | E903 | 0007 | 868B |
| 0000647300 | FE08 | 68E9 | 6A00 | C4D1 | FA5E | 8B26 | 2E47 | 4603 |
| 0000647320 | 8BFA | FC56 | 5052 | 439A | 6B30 | 83BB | 06C4 | 8689 |
| 0000647340 | FE08 | BE83 | FE08 | 7500 | E903 | 0012 | BE81 | FE08 |
| 0000647360 | 01B7 | 0375 | 07E9 | 8B00 | 0886 | E9FE | 002F | 76FF |
| 0000647400 | FF0C | 0A76 | 76FF | FF08 | 0676 | 8E9A | 48C7 | 83BD |
| 0000647420 | 08C4 | 8689 | FE08 | BE83 | FE08 | 7500 | E903 | 0007 |
| 0000647440 | 868B | FE08 | 06E9 | B800 | 0000 | 00E9 | 5E00 | 835F |
| 0000647460 | 02ED | E58B | 5D1F | CB4D | 581E | 4590 | 8B55 | 1EEC |
| 0000647500 | D88E | EC81 | 020A | 5657 | 868D | FE0A | 4689 | 8CFA |
| 0000647520 | FC56 | 86C7 | FE00 | 01F0 | 76FF | FFFC | FA76 | 868D |
| 0000647540 | FE00 | 5016 | 468D | 160A | 8B50 | 0646 | 568B | 0508 |
| 0000647560 | 0104 | 5052 | BE9A | A6D6 | 83BF | 10C4 | 8689 | FE02 |
| 0000647600 | BE83 | FE02 | 7500 | E903 | 0007 | 868B | FE02 | F7E9 |
| 0000647620 | C402 | FA5E | 8A26 | 0347 | E42A | 8689 | FDFE | 5EC4 |
| 0000647640 | 26FA | 478B | 032E | FA46 | 568B | 52FC | FF50 | 2076 |
| 0000647660 | 76FF | 9A1E | 2750 | BFD6 | C483 | C408 | FA5E | C02B |
| 0000647700 | 8926 | 0247 | 8926 | 8B07 | 1C46 | 460B | 751A | E903 |
| 0000647720 | 0019 | 76FF | FF1C | 1A76 | 468B | 8BFA | FC56 | 0405 |
| 0000647740 | 5200 | 9A50 | 2750 | C06A | C483 | C408 | FA5E | 8B26 |
| 0000647760 | 2E47 | 4603 | 8BFA | FC56 | 5052 | BE83 | FDFE | 7428 |
| 0000650000 | E903 | 0008 | 8BB8 | 8C37 | E9DA | 004E | BE83 | FDFE |
| 0000650020 | 7429 | E903 | 0008 | 8CB8 | 8C37 | E9DA | 003C | BE83 |

THU MAR 14 17:31:54 1991 DB_PI.DLL PAGE 231, LINE 13571

| | | | | | | | | |
|---|---|---|---|---|---|---|---|---|
| 0000650040 | FDFE | 742A | E903 | 0008 | 8DB8 | 8C37 | E9DA | 002A |
| 0000650060 | BE83 | FDFE | 742B | E903 | 0008 | 8EB8 | 8C37 | E9DA |
| 0000650100 | 0018 | BE83 | FDFE | 742C | E903 | 0008 | 8FB8 | 8C37 |
| 0000650120 | E9DA | 0006 | 00B8 | BA00 | 0000 | 5052 | 006A | 006A |
| 0000650140 | 468B | 8BFA | FC56 | 0405 | 5200 | FF50 | 1876 | 76FF |
| 0000650160 | FF16 | 1476 | 76FF | 9A12 | AF2B | C098 | C483 | 8918 |
| 0000650200 | 0286 | 83FE | 02BE | 00FE | 0375 | 07E9 | 8B00 | 0286 |
| 0000650220 | E9FE | 01F4 | 468B | 0B10 | 0E46 | 0375 | 2BE9 | FF00 |
| 0000650240 | 1076 | 76FF | 9A0E | 27B0 | CDAD | C483 | 5004 | 76FF |
| 0000650260 | FF20 | 1E76 | 76FF | FF10 | 0E76 | 2E9A | D428 | 83C0 |
| 0000650300 | 0AC4 | 003D | 7500 | E903 | 0009 | 86C7 | FE08 | 0001 |
| 0000650320 | 7DE9 | C700 | 0886 | 00FE | 6A00 | FF5C | 2076 | 76FF |
| 0000650340 | 9A1E | 3C3E | C108 | C483 | 8906 | 0486 | 89FE | 0696 |
| 0000650360 | 8BFE | 0686 | 0BFE | 0486 | 74FE | E903 | 0006 | B1B8 |
| 0000650400 | E901 | 0184 | 5C6A | 5EC4 | 26FA | 478B | 032E | FA46 |
| 0000650420 | 568B | 52FC | 9A50 | 3C3E | C13B | C483 | 8906 | FA86 |
| 0000650440 | 89FD | FC96 | 8BFD | FC86 | 0BFD | FA86 | 74FD | E903 |
| 0000650460 | 0006 | B1B8 | E901 | 0150 | B6FF | FE06 | B6FF | FE04 |
| 0000650500 | B6FF | FDFC | B6FF | FDFA | 509A | 4927 | 83C1 | 08C4 |
| 0000650520 | 76FF | FF20 | 1E76 | B09A | 6227 | 83C1 | 04C4 | 5EC4 |
| 0000650540 | 26FA | 4F8B | 032E | FA4E | 568B | 52FC | 8B51 | 9AF0 |
| 0000650560 | 27B0 | C189 | C483 | 2B04 | C4C6 | FA5E | 0126 | 2C47 |
| 0000650600 | 76FF | FFFC | FA76 | B6FF | FDFE | 76FF | FF18 | 1676 |
| 0000650620 | 76FF | FF14 | 1276 | 549A | 13C6 | 83C2 | 0EC4 | 8689 |
| 0000650640 | FE02 | BE83 | FE02 | 7500 | E903 | 0007 | 868B | FE02 |
| 0000650660 | D5E9 | 8300 | 08BE | 00FE | 0375 | 25E9 | 6A00 | 6A00 |
| 0000650700 | C401 | FA5E | 8B26 | 2E47 | 4603 | 8BFA | FC56 | 5052 |
| 0000650720 | 76FF | FF20 | 1E76 | 7C9A | 3A36 | 83C2 | 0CC4 | 8689 |
| 0000650740 | FE02 | BE83 | FE02 | 7400 | E903 | 0040 | 76FF | FF18 |
| 0000650760 | 1676 | 5EC4 | 26FA | 77FF | 2602 | 37FF | 468B | 8BFA |
| 0000651000 | FC56 | 0405 | 5200 | C450 | FA5E | 8A26 | 0347 | E42A |
| 0000651020 | C450 | FA5E | 8B26 | 2E47 | 4603 | 8BFA | FC56 | 5052 |
| 0000651040 | D69A | 52B0 | 83C2 | 12C4 | 8689 | FE02 | BE83 | FE02 |
| 0000651060 | 7500 | E903 | 0038 | 016A | 5EC4 | 26FA | 478B | 032E |
| 0000651100 | FA46 | 568B | 52FC | 9A50 | 3043 | BEC9 | C483 | C406 |
| 0000651120 | FA5E | FF26 | 0277 | FF26 | FF37 | 1476 | 76FF | 9A12 |
| 0000651140 | C78E | BE69 | C483 | 8B08 | 0286 | E9FE | 001A | 5EC4 |
| 0000651160 | 26FA | 078B | 8B26 | 0257 | 5EC4 | 2622 | 0789 | 8926 |
| 0000651200 | 0257 | 00B8 | E900 | 0000 | 5F5E | ED83 | 8B02 | 1FE5 |
| 0000651220 | 4D5D | 1ECB | 9058 | 5545 | EC8B | 8E1E | 81D8 | 10EC |
| 0000651240 | 5701 | 8356 | 1E7E | 7500 | E903 | 003F | 76FF | FF22 |
| 0000651260 | 2076 | 868D | FEFE | 5016 | 76FF | FF1C | 1A76 | 76FF |
| 0000651300 | FF18 | 1676 | 76FF | FF14 | 1276 | 76FF | FF10 | 0E76 |
| 0000651320 | 76FF | FF0C | 0A76 | 76FF | FF08 | 0676 | 289A | 67BF |
| 0000651340 | 83BF | 20C4 | 8689 | FEFC | 3CE9 | FF00 | 2276 | 76FF |
| 0000651360 | 8D20 | FE86 | 16FE | FF50 | 1C76 | 76FF | FF1A | 1876 |
| 0000651400 | 76FF | FF16 | 1476 | 76FF | FF12 | 1076 | 76FF | FF0E |
| 0000651420 | 0C76 | 76FF | FF0A | 0876 | 76FF | 9A06 | BF28 | C343 |
| 0000651440 | C483 | 8920 | FC86 | 83FE | FCBE | 00FE | 0375 | 07E9 |
| 0000651460 | 8B00 | FC86 | E9FE | 00D4 | 868D | FEF0 | 5016 | 868D |
| 0000651500 | FEFA | 5016 | 76FF | FF0C | 0A76 | 76FF | FF08 | 0676 |
| 0000651520 | A69A | C9CB | 83C3 | 10C4 | 8689 | FEFC | BE83 | FEFC |
| 0000651540 | 7500 | E903 | 001B | BE81 | FEFC | 01BC | 0374 | 09E9 |
| 0000651560 | B800 | 0000 | 95E9 | E900 | 0007 | 868B | FEFC | 8BE9 |
| 0000651600 | C700 | F886 | 00FE | E900 | 0004 | 86FF | FEF8 | 868B |
| 0000651620 | FEFA | 8639 | FEF8 | 0372 | 5BE9 | 8D00 | F486 | 16FE |
| 0000651640 | FF50 | 1E76 | 006A | 006A | 5EC4 | 2620 | 77FF | 2602 |
| 0000651660 | 37FF | 76FF | FF14 | 1276 | 868D | FEFE | 5016 | 9E8B |
| 0000651700 | FEF8 | E3C1 | C402 | F0B6 | 26FE | 70FF | 2602 | 30FF |

THU MAR 14 17:31:54 19,1 DB_PI.DLL PAGE 232, LINE 13630

| | | | | | | | | |
|---|---|---|---|---|---|---|---|---|
| 0000651720 | 76FF | FF08 | 0676 | 839A | F1C2 | 83C3 | 1EC4 | 8689 |
| 0000651740 | FEFC | BE83 | FEFC | 7500 | E903 | 0007 | 868B | FEFC |
| 0000651760 | 19E9 | E900 | FF94 | B6FF | FEF2 | B6FF | FEF0 | 489A |
| 0000652000 | CF24 | 83C2 | 04C4 | 00B8 | E900 | 0000 | 5F5E | ED83 |
| 0000652020 | 8B02 | 1FE5 | 4D5D | 00CB | 581E | 4590 | 8B55 | 1EEC |
| 0000652040 | D88E | EC81 | 0106 | 5657 | 468A | 2A0D | 3DE4 | 002A |
| 0000652060 | 0375 | 20E9 | 8A00 | 0D46 | E42A | 2B3D | 7500 | E903 |
| 0000652100 | 0013 | 468A | 2A0D | 3DE4 | 002C | 0375 | 06E9 | B800 |
| 0000652120 | 01AD | 7FE9 | FF00 | 1076 | 76FF | 8D0E | FE86 | 16FE |
| 0000652140 | 9A50 | 2750 | C466 | C483 | 1E08 | 9068 | 8D37 | FE86 |
| 0000652160 | 16FE | 9A50 | 270A | C478 | C483 | 1E08 | 9268 | 8D37 |
| 0000652200 | FE86 | 16FE | 9A50 | 270A | C30E | C483 | 8D08 | FE86 |
| 0000652220 | 16FE | FF50 | 1476 | 76FF | 8D12 | FA86 | 16FE | 6A50 |
| 0000652240 | 6A00 | 6A0A | 6A00 | 6A11 | 6A41 | 6A00 | 9A00 | 1F80 |
| 0000652260 | 0000 | 8689 | FEFC | BE83 | FEFC | 7500 | E903 | 000E |
| 0000652300 | 5EC4 | 2612 | 07C7 | 0000 | A5B8 | E901 | 0006 | 00B8 |
| 0000652320 | E900 | 0000 | 5F5E | ED83 | 8B02 | 1FE5 | 4D5D | 1ECB |
| 0000652340 | 9058 | 5545 | EC8B | 8E1E | 81D8 | 02EC | 5701 | 8A56 |
| 0000652360 | 0D46 | E42A | 2A3D | 7500 | E903 | 0020 | 468A | 2A0D |
| 0000652400 | 3DE4 | 002B | 0375 | 13E9 | 8A00 | 0D46 | E42A | 2C3D |
| 0000652420 | 7500 | E903 | 0006 | ADB8 | E901 | 006B | 7E83 | 0012 |
| 0000652440 | 0375 | 16E9 | FF00 | 1276 | A99A | 001F | 3D00 | 0000 |
| 0000652460 | 0375 | 06E9 | B800 | 01A5 | 4CE9 | FF00 | 1076 | 76FF |
| 0000652500 | 8D0E | FE86 | 16FE | 9A50 | 2750 | C54C | C483 | 1E08 |
| 0000652520 | 9968 | 8D37 | FE86 | 16FE | 9A50 | 270A | C55E | C483 |
| 0000652540 | 1E08 | 9B68 | 8D37 | FE86 | 16FE | 9A50 | 270A | C56C |
| 0000652560 | C483 | 8D08 | FE86 | 16FE | 9A50 | 42!C | C454 | C483 |
| 0000652600 | B804 | 0000 | 00E9 | 5E00 | 835F | 02ED | E58B | 5D1F |
| 0000652620 | CB4D | 581E | 4590 | 8B55 | 1EEC | D88E | EC81 | 0102 |
| 0000652640 | 5657 | 468A | 2A09 | 3DE4 | 002A | 0375 | 20E9 | 8A00 |
| 0000652660 | 0946 | E42A | 2B3D | 7500 | E903 | 0013 | 468A | 2A09 |
| 0000652700 | 3DE4 | 002C | 0375 | 06E9 | B800 | 0000 | 8AE9 | FF00 |
| 0000652720 | 0C76 | 76FF | 8D0A | FE86 | 16FE | 9A50 | 2750 | C5E0 |
| 0000652740 | C483 | 1E08 | A268 | 8D37 | FE86 | 16FE | 9A50 | 270A |
| 0000652760 | C5F2 | C483 | 1E08 | A468 | 8D37 | FE86 | 16FE | 9A50 |
| 0000653000 | 270A | C600 | C483 | 8D08 | FE86 | 16FE | 9A50 | 421C |
| 0000653020 | C610 | C483 | 3D04 | 0000 | 0375 | 36E9 | 9A00 | 04F6 |
| 0000653040 | C53A | C28E | D88B | 8B26 | E907 | 0015 | A4B8 | E901 |
| 0000653060 | 0027 | 00B8 | E900 | 0021 | 0AB8 | E900 | 001B | 12E9 |
| 0000653100 | 4800 | 7548 | E903 | FFEA | 0B2D | 7500 | E903 | FFDC |
| 0000653120 | E5E9 | B8FF | 0000 | 00E9 | 5E00 | 835F | 02ED | E58B |
| 0000653140 | 5D1F | CB4D | 581E | 4590 | 8B55 | 1EEC | D88E | EC81 |
| 0000653160 | 002C | 5657 | 5EC4 | 2606 | 8783 | 018A | 2601 | 9783 |
| 0000653200 | 018C | 2600 | 878B | 018A | 8B26 | 8C97 | C401 | 105E |
| 0000653220 | 8926 | 2607 | 5789 | C402 | 105E | 8B26 | 2607 | 578B |
| 0000653240 | 2502 | FFFF | E281 | 00FF | 6E8A | 2A0E | 2BC9 | 0BDB |
| 0000653260 | 0BC3 | C4D1 | 105E | 8926 | 2607 | 5789 | C402 | 065E |
| 0000653300 | 8B26 | C107 | 02E0 | C92B | 5EC4 | 2610 | 178B | 8B26 |
| 0000653320 | 0277 | E283 | 81FF | 03E6 | 0BFF | 0BCA | C4C6 | 105E |
| 0000653340 | 8926 | 260F | 4789 | 6A02 | FF00 | 1276 | 76FF | C410 |
| 0000653360 | 105E | FF26 | 2C77 | 76FF | FF12 | 1076 | 468B | 8B06 |
| 0000653400 | 0856 | 0405 | 5201 | 9A50 | D049 | C749 | C483 | 8910 |
| 0000653420 | D446 | 7E83 | 00D4 | 0375 | 06E9 | 8B00 | D446 | 72E9 |
| 0000653440 | 8B00 | 0A46 | 568B | 890C | D646 | 5689 | C4D8 | 105E |
| 0000653460 | 8B26 | 2607 | 578B | 8902 | DA46 | 5689 | 6ADC | 8D00 |
| 0000653500 | DA46 | 5016 | 286A | 468D | 16D6 | 8B50 | 0646 | 568B |
| 0000653520 | 0508 | 01AE | 5052 | 499A | 72D0 | 83C7 | 10C4 | 4689 |
| 0000653540 | 83D4 | D47E | 7500 | E903 | 0023 | 5EC4 | 2610 | 77FF |
| 0000653560 | 2602 | 37FF | 468B | 8B06 | 0856 | 0405 | 5201 | 9A50 |

THU MAR 14 17:31:54 1991 DB_PI.DLL PAGE 233, LINE 13689

| | | | | | | | | |
|---|---|---|---|---|---|---|---|---|
| 0000653600 | D3E1 | C5CE | C483 | 8B08 | D446 | 06E9 | B800 | 0000 |
| 0000653620 | 00E9 | 5E00 | 835F | 02ED | E58B | 5D1F | CB4D | 581E |
| 0000653640 | 4590 | 8B55 | 1EEC | D88E | EC81 | 0004 | 5657 | 468D |
| 0000653660 | 160A | 8B50 | 0646 | 568B | 0508 | 0104 | 5052 | E19A |
| 0000653700 | DBD3 | 83C7 | 08C4 | 4689 | 83FC | FC7E | 7500 | E903 |
| 0000653720 | 0006 | 468B | E9FC | 0030 | 468D | 160A | 8B50 | 0646 |
| 0000653740 | 568B | 0508 | 01AE | 5052 | E19A | FAD3 | 83C6 | 08C4 |
| 0000653760 | 4689 | 83FC | FC7E | 7500 | E903 | 0006 | 468B | E9FC |
| 0000654000 | 0006 | 00B8 | E900 | 0000 | 5F5E | ED83 | 8B02 | 1FE5 |
| 0000654020 | 4D5D | 1ECB | 9058 | 5545 | EC8B | 8E1E | 81D8 | 78EC |
| 0000654040 | 5700 | C756 | 6346 | 0000 | 5EC4 | 2B14 | 26C0 | 4789 |
| 0000654060 | 2602 | 0789 | 46C7 | 708A | 8D00 | 8C46 | 5016 | 468D |
| 0000654100 | 168A | 6A50 | FF00 | 0C76 | 76FF | FF0A | 0876 | 76FF |
| 0000654120 | 9A06 | CAE2 | C8B4 | C483 | 8912 | FC46 | 7E83 | 00FC |
| 0000654140 | 0375 | 10E9 | 8100 | FC7E | 01FA | 0375 | 06E9 | 8B00 |
| 0000654160 | FC46 | 39E9 | 8B01 | 1046 | 460B | 750E | E903 | 0009 |
| 0000654200 | 7E83 | 0012 | 0374 | 16E9 | 8B00 | 8C46 | 568B | C48E |
| 0000654220 | 145E | 8926 | 2607 | 5789 | B802 | 0000 | 0FE9 | C701 |
| 0000654240 | FC46 | 0000 | 7E83 | 00FC | 0374 | FBE9 | 8300 | 127E |
| 0000654260 | 74FF | E903 | 0034 | 468D | 1690 | FF50 | 1076 | 76FF |
| 0000654300 | 9A0E | 2786 | C8E2 | C483 | 3D08 | 0000 | 0374 | 16E9 |
| 0000654320 | 8B00 | 8C46 | 568B | C48E | 145E | 8926 | 2607 | 5789 |
| 0000654340 | B802 | 0000 | C7E9 | E900 | 0049 | 468D | 1690 | 9A50 |
| 0000654360 | 27B0 | C900 | C483 | 3B04 | 1246 | 0374 | 34E9 | FF00 |
| 0000654400 | 1276 | 468D | 1690 | FF50 | 1076 | 76FF | 9A0E | 282E |
| 0000654420 | C943 | C483 | 3D0A | 0000 | 0374 | 16E9 | 8B00 | 8C46 |
| 0000654440 | 568B | C48E | 145E | 8926 | 2607 | 5789 | B802 | 0000 |
| 0000654460 | 7BE9 | C700 | 8A46 | 0070 | 468D | 168C | 8D50 | 8A46 |
| 0000654500 | 5016 | 016A | 76FF | FF0C | 0A76 | 76FF | FF08 | 0676 |
| 0000654520 | E29A | B1CA | 83C7 | 12C4 | 4689 | 8BFC | FC46 | 17E9 |
| 0000654540 | C700 | FC46 | 0000 | 29E9 | B800 | 01AB | 3FE9 | 8B00 |
| 0000654560 | FC46 | 39E9 | E900 | 001A | C00B | 0375 | E2E9 | 2DFF |
| 0000654600 | 01BC | 0375 | E2E9 | 2DFF | 003E | 0375 | D2E9 | E9FF |
| 0000654620 | FFDD | 46FF | 8188 | 887E | 0A8C | 037D | 06E9 | B800 |
| 0000654640 | 01F8 | 09E9 | E900 | FEFC | 468B | E9FC | 0000 | 5F5E |
| 0000654660 | ED83 | 8B02 | 1FE5 | 4D5D | 1ECB | 9058 | 5545 | EC8B |
| 0000654700 | 8E1E | 81D8 | 2EEC | 5700 | C456 | 0E5E | C02B | 8926 |
| 0000654720 | 0247 | 8926 | C707 | D246 | 0028 | 468D | 16D6 | 8D50 |
| 0000654740 | D246 | 5016 | 468D | 160A | 8B50 | 0646 | 568B | 0508 |
| 0000654760 | 01AE | 5052 | BE9A | 44D6 | 83C8 | 10C4 | 4689 | 83D4 |
| 0000655000 | D47E | 7500 | E903 | 0006 | 468B | E9D4 | 0016 | 468B |
| 0000655020 | 8BD6 | D856 | 5EC4 | 260E | 0789 | 8926 | 0257 | 00B8 |
| 0000655040 | E900 | 0000 | 5F5E | ED83 | 8B02 | 1FE5 | 4D5D | 1ECB |
| 0000655060 | 9058 | 5545 | EC8B | 8E1E | 81D8 | 0AEC | 5700 | C756 |
| 0000655100 | F646 | 0000 | 46C7 | 00FC | 8B00 | 0A46 | 568B | 390C |
| 0000655120 | 0E46 | 0374 | 0EE9 | 3900 | 1056 | 0374 | 06E9 | B800 |
| 0000655140 | 0000 | 82E9 | 8B00 | 0E46 | 568B | 8910 | F846 | 5689 |
| 0000655160 | 83FA | FC7E | 7400 | E903 | 0048 | 468B | 8B0A | 0C56 |
| 0000655200 | 4639 | 74F8 | E903 | 0008 | 5639 | 75FA | E903 | 0032 |
| 0000655220 | 468D | 16F8 | FF50 | FA76 | 76FF | FFF8 | 0876 | 76FF |
| 0000655240 | 9A06 | C9A9 | C9E7 | C483 | 890C | FC46 | 46FF | 81F6 |
| 0000655260 | F67E | 0A8C | 037D | 06E9 | B800 | 01F8 | 28E9 | E900 |
| 0000655300 | FFAF | 468B | 8B0A | 0C56 | 4639 | 74F8 | E903 | 0011 |
| 0000655320 | 5639 | 74FA | E903 | 0009 | 01B8 | E900 | 0009 | 06E9 |
| 0000655340 | B800 | 0000 | 00E9 | 5E00 | 835F | 02ED | E58B | 5D1F |
| 0000655360 | CB4D | 581E | 4590 | 8B55 | 1EEC | D88E | EC81 | 0034 |
| 0000655400 | 5657 | 7E83 | 000E | 0375 | 08E9 | C700 | CC46 | 0006 |
| 0000655420 | 05E9 | C700 | CC46 | 0005 | 468B | 8B0A | 0C56 | 4689 |
| 0000655440 | 89D0 | D256 | 46C7 | 28CE | 8D00 | D646 | 5016 | 468D |

THU MAR 14 17:31:54 1991 DB_PI.DLL PAGE 234, LINE 13748

| | | | | | | | | |
|---|---|---|---|---|---|---|---|---|
| 0000655460 | 16CE | 8D50 | D046 | 5016 | 016A | 76FF | 8BCC | 0646 |
| 0000655500 | 568B | 0508 | 01AE | 5052 | 1B9A | 8DD8 | 83CB | 14C4 |
| 0000655520 | 4689 | 83D4 | D47E | 7500 | E903 | 0006 | 468B | E9D4 |
| 0000655540 | 0049 | 468B | 8B0A | 0C56 | 4639 | 74D0 | E903 | 0008 |
| 0000655560 | 5639 | 75D2 | E903 | 0006 | BCB8 | E901 | 002D | 76FF |
| 0000655600 | FF16 | 1476 | 76FF | FF12 | 1076 | 468D | 16DA | 8B50 |
| 0000655620 | 0646 | 568B | 0508 | 0104 | 5052 | BE9A | 94D6 | 83CA |
| 0000655640 | 10C4 | 4689 | 8BD4 | D446 | 00E9 | 5E00 | 835F | 02ED |
| 0000655660 | E58B | 5D1F | CB4D | 581E | 4590 | 8B55 | 1EEC | D88E |
| 0000655700 | EC81 | 0036 | 5657 | 46C7 | 00CA | 8B00 | 0A46 | 568B |
| 0000655720 | 890C | CE46 | 5689 | C7D0 | CC46 | 0028 | 468D | 16D6 |
| 0000655740 | 8D50 | CC46 | 5016 | 468D | 16CE | 6A50 | 6A01 | 8B05 |
| 0000655760 | 0646 | 568B | 0508 | 01AE | 5052 | 1B9A | 3BD8 | 83CB |
| 0000656000 | 14C4 | 4689 | 83D2 | D27E | 7500 | E903 | 0019 | 7E81 |
| 0000656020 | ABD2 | 7401 | E903 | 0009 | BCB8 | E901 | 019E | 06E9 |
| 0000656040 | 8B00 | D246 | 95E9 | 8B01 | CE46 | 568B | 39D0 | 0A46 |
| 0000656060 | 0374 | 0BE9 | 3900 | 0C56 | 0375 | 06E9 | B800 | 01BC |
| 0000656100 | 79E9 | C401 | 0E5E | C726 | 0007 | C400 | 125E | C02B |
| 0000656120 | 8926 | 0247 | 8926 | C707 | D446 | 0000 | 7E83 | 00D2 |
| 0000656140 | 0374 | D5E9 | C400 | 0E5E | 468B | 26D4 | 0739 | 0374 |
| 0000656160 | 42E9 | C400 | 0E5E | 8326 | 0507 | 5EC4 | 260E | 078B |
| 0000656200 | E0C1 | 5002 | 5EC4 | 2612 | 77FF | 2602 | 37FF | A49A |
| 0000656220 | E832 | 83CC | 06C4 | 5EC4 | 2612 | 0789 | 8926 | 0257 |
| 0000656240 | 5EC4 | 2612 | 478B | 2602 | 070B | 0374 | 06E9 | B800 |
| 0000656260 | 0007 | 07E9 | 8B01 | D45E | E3C1 | C402 | 1276 | C426 |
| 0000656300 | 8B34 | DA46 | 568B | 26DC | 0089 | 8926 | 0250 | 46FF |
| 0000656320 | C7D4 | CC46 | 0028 | 468D | 16D6 | 8D50 | CC46 | 5016 |
| 0000656340 | 468D | 16CE | 6A50 | 6A01 | 8B06 | 064E | 568B | 8108 |
| 0000656360 | AEC1 | 5201 | 9A51 | D81B | CD41 | C483 | 8914 | D246 |
| 0000656400 | 7E83 | 00D2 | 0374 | 1BE9 | 8B00 | CE46 | 568B | 39D0 |
| 0000656420 | 0A46 | 0374 | 08E9 | 3900 | 0C56 | 0375 | 05E9 | C700 |
| 0000656440 | D246 | 01BC | 46FF | 81CA | CA7E | 0A8C | 037D | 06E9 |
| 0000656460 | B800 | 01F8 | 85E9 | E900 | FF22 | 7E81 | BCD2 | 7501 |
| 0000656500 | E903 | 0020 | 5EC4 | 2612 | 77FF | 2602 | 37FF | 489A |
| 0000656520 | 8224 | 83CD | 04C4 | 5EC4 | 260E | 07C7 | 0000 | 468B |
| 0000656540 | E9D2 | 0058 | 5EC4 | 8B0E | D446 | 3926 | 7507 | E903 |
| 0000656560 | 0044 | 468B | C4D4 | 0E5E | 8926 | C407 | 0E5E | 8B26 |
| 0000656600 | C107 | 02E0 | C450 | 125E | FF26 | 0277 | FF26 | 9A37 |
| 0000656620 | 32A4 | CBED | C483 | C406 | 125E | 8926 | 2607 | 5789 |
| 0000656640 | C402 | 125E | 8B26 | 0247 | 0B26 | 7407 | E903 | 0006 |
| 0000656660 | 07B8 | E900 | 0006 | 00B8 | E900 | 0000 | 5F5E | ED83 |
| 0000656700 | 8B02 | 1FE5 | 4D5D | 1ECB | 9058 | 5545 | EC8B | 8E1E |
| 0000656720 | 81D8 | 10EC | 5700 | C756 | F846 | 0000 | 46C7 | 00F0 |
| 0000656740 | 8D00 | FA46 | 5016 | 76FF | FF08 | 0676 | B09A | 31AE |
| 0000656760 | 83CE | 08C4 | 4689 | 83F6 | F67E | 7500 | E903 | 0006 |
| 0000657000 | 468B | E9F6 | 0085 | 468B | 8B0A | 0C56 | 4689 | 89F2 |
| 0000657020 | F456 | 46C7 | 00F6 | 8B00 | F246 | 568B | 39F4 | FA46 |
| 0000657040 | 0374 | 08E9 | 3900 | FC56 | 0375 | 44E9 | 8D00 | F246 |
| 0000657060 | 5016 | 76FF | FFF4 | F276 | 76FF | FF08 | 0676 | A99A |
| 0000657100 | 81C9 | 83CC | 0CC4 | 4689 | 83F6 | F67E | 7500 | E903 |
| 0000657120 | 0006 | 468B | E9F6 | 0033 | 46FF | FFF8 | F046 | 7E81 |
| 0000657140 | 8CF0 | 7D0A | E903 | 0006 | F8B8 | E901 | 001D | A6E9 |
| 0000657160 | 8BFF | F846 | 4603 | 3D0E | 0003 | 0377 | 06E9 | B800 |
| 0000657200 | 0198 | 06E9 | B800 | 0000 | 00E9 | 5E00 | 835F | 02ED |
| 0000657220 | E58B | 5D1F | CB4D | 581E | 4590 | 8B55 | 1EEC | D88E |
| 0000657240 | EC81 | 000E | 5657 | 46C7 | 00F8 | C400 | 0E5E | C726 |
| 0000657260 | 0007 | 8D00 | FA46 | 5016 | 468D | 16F4 | FF50 | 0C76 |
| 0000657300 | 76FF | FF0A | 0876 | 76FF | 9A06 | CBA6 | CDDF | C483 |
| 0000657320 | 8910 | F846 | 7E83 | 00F8 | 0374 | 9BE9 | C700 | F246 |

THU MAR 14 17:31:54 1991 DB_PI.DLL PAGE 235, LINE 13807

| | | | | | | | | |
|---|---|---|---|---|---|---|---|---|
| 0000657340 | 0000 | 03E9 | FF00 | F246 | 468B | 39F4 | F246 | 0372 |
| 0000657360 | 74E9 | 8B00 | F25E | E3C1 | C402 | FA76 | 8A26 | 0340 |
| 0000657400 | E42A | 283D | 7400 | E903 | 005A | 468D | 16F6 | 8B50 |
| 0000657420 | F25E | E3C1 | C402 | FA76 | FF26 | 0270 | FF26 | FF30 |
| 0000657440 | 0876 | 76FF | 9A06 | CE86 | CF32 | C483 | 890C | F846 |
| 0000657460 | 7E83 | 00F8 | 0375 | 14E9 | FF00 | FC76 | 76FF | 9AFA |
| 0000657500 | 2448 | CF60 | C483 | 8B04 | F846 | 47E9 | C400 | 0E5E |
| 0000657520 | 468B | 26F6 | 0739 | 0372 | 09E9 | 8B00 | F646 | 5EC4 |
| 0000657540 | 260E | 0789 | 7EE9 | FFFF | FC76 | 76FF | 9AFA | 2448 |
| 0000657560 | CEBC | C483 | E904 | 0010 | 7E81 | BCF8 | 7501 | E903 |
| 0000657600 | 0006 | 468B | E9F8 | 000C | 5EC4 | 260E | 07FF | 00B8 |
| 0000657620 | E900 | 0000 | 5F5E | ED83 | 8B02 | 1FE5 | 4D5D | 00CB |
| 0000657640 | 581E | 4590 | 8B55 | 1EEC | D88E | EC81 | 0006 | 5657 |
| 0000657660 | 46C6 | FFFC | 468A | 8818 | FA46 | 76FF | FF06 | 0A76 |
| 0000657700 | 76FF | FF08 | 0E76 | 76FF | FF0C | 1276 | 76FF | FF10 |
| 0000657720 | 1676 | 76FF | 8A14 | FC46 | E42A | 8A50 | FA46 | 5098 |
| 0000657740 | FF9A | 00FF | E900 | 0000 | 5F5E | ED83 | 8B02 | 1FE5 |
| 0000657760 | 4D5D | 00CB | 581E | 4590 | 8B55 | 1EEC | D88E | EC81 |
| 0000660000 | 0000 | 5657 | 681E | 38D6 | 046A | E068 | 9A93 | 2B35 |
| 0000660020 | 0000 | 013D | F500 | C01B | FC25 | E901 | 0000 | 5F5E |
| 0000660040 | ED83 | 8B02 | 1FE5 | 4D5D | 1ECB | 9058 | 5545 | EC8B |
| 0000660060 | 8E1E | 81D8 | 00EC | 5700 | 1E56 | D668 | 9A38 | 2B57 |
| 0000660100 | 0000 | 013D | F500 | C01B | FC25 | E901 | 0000 | 5F5E |
| 0000660120 | ED83 | 8B02 | 1FE5 | 4D5D | 1ECB | 9058 | 5545 | EC8R |
| 0000660140 | 8E1E | 81D8 | D8EC | 5700 | 9A56 | CFE4 | D0FF | 4689 |
| 0000660160 | 3DFC | 0000 | 0375 | 06E9 | 8B00 | FC46 | 67E9 | C403 |
| 0000660200 | 065E | 8326 | 84BF | 0000 | 0375 | 35E9 | C400 | 105E |
| 0000660220 | 8B26 | 0247 | 0B26 | 7407 | E903 | 0026 | 5EC4 | 2606 |
| 0000660240 | 8783 | 0086 | 2601 | 9783 | 0088 | 2600 | 878B | 0086 |
| 0000660260 | 8B26 | 8897 | C400 | 105E | 8926 | 2607 | 5789 | E902 |
| 0000660300 | 01FF | 7E83 | 0014 | 0375 | F6E9 | C401 | 065E | 8326 |
| 0000660320 | 84BF | 0000 | 0375 | 0FE9 | C400 | 105E | 8B26 | 0247 |
| 0000660340 | 0B26 | 7507 | E903 | 01D9 | 5EC4 | 2606 | 878B | 0082 |
| 0000660360 | 4689 | 6AFA | FF00 | 1276 | 76FF | 8D10 | FA46 | 5016 |
| 0000660400 | 681E | 5762 | 76FF | FF08 | 0676 | 376A | 909A | 2ECF |
| 0000660420 | 83D1 | 14C4 | 4689 | 83FC | FC7E | 7400 | E903 | 01A1 |
| 0000660440 | 006A | 76FF | FF12 | 1076 | 468D | 160E | FF50 | 0C76 |
| 0000660460 | 76FF | FF0A | ü876 | 76FF | 6A06 | 9A03 | CF90 | D166 |
| 0000660500 | C483 | 8914 | FC46 | 7E83 | 50FC | 0374 | D6E9 | C400 |
| 0000660520 | 065E | 8B26 | 8287 | 8900 | FA46 | 006A | 76FF | FF12 |
| 0000660540 | 1076 | 468D | 16FA | 1E50 | 6268 | FF57 | 0876 | 76FF |
| 0000660560 | 6A06 | 9A05 | CF90 | D183 | C483 | 8914 | FC46 | 7E83 |
| 0000660600 | 00FC | 0375 | 78E9 | 8300 | FC7E | 7516 | E903 | 006F |
| 0000660620 | 199A | 0DD0 | 3DD2 | 0000 | 0374 | 1EE9 | 8300 | FC7E |
| 0000660640 | 7D64 | E903 | 0009 | 468B | 2DFC | 012C | 06E9 | 8B00 |
| 0000660660 | FC46 | 5805 | E902 | 022E | 44E9 | 8300 | FC7E | 7D64 |
| 0000660700 | E903 | 0009 | 468B | 2DFC | 012C | 06E9 | 8B00 | FC46 |
| 0000660720 | 5805 | 3D02 | 0000 | 0374 | 09E9 | B800 | 01FC | 05E9 |
| 0000660740 | E902 | 001B | 7E83 | 64FC | 037D | 09E9 | 8B00 | FC46 |
| 0000660760 | 2C2D | E901 | 0006 | 468B | 05FC | 0258 | E7E9 | 6A01 |
| 0000661000 | FF00 | 1276 | 76FF | 8D10 | 0E46 | 5016 | 76FF | FF0C |
| 0000661020 | 0A76 | 76FF | FF08 | 0676 | 036A | 909A | 18CF | 83D2 |
| 0000661040 | 14C4 | 4689 | 9AFC | D019 | D2CF | 003D | 7400 | E903 |
| 0000661060 | 002D | 7E83 | 00FC | 0374 | 06E9 | B800 | 0000 | 18E9 |
| 0000661100 | 8300 | FC7E | 7D64 | E903 | 0009 | 468B | 2DFC | 012C |
| 0000661120 | 06E9 | 8B00 | FC46 | 5805 | E902 | 018A | 62E9 | 8300 |
| 0000661140 | FC7E | 7400 | E903 | 0006 | 00B8 | E900 | 0018 | 7E83 |
| 0000661160 | 64FC | 037D | 09E9 | 8B00 | FC46 | 2C2D | E901 | 0006 |
| 0000661200 | 468B | 05FC | 0258 | 003D | 7400 | E903 | 0009 | FCB8 |

THU MAR 14 17:31:54 1991 DB_PI.DLL PAGE 236, LINE 13866

| | | | | | | | | |
|---|---|---|---|---|---|---|---|---|
| 0000661220 | E901 | 0152 | 2AE9 | 8300 | FC7E | 7400 | E903 | 0006 |
| 0000661240 | 00B8 | E900 | 0018 | 7E83 | 64FC | 037D | 09E9 | 8B00 |
| 0000661260 | FC46 | 2C2D | E901 | 0006 | 468B | 05FC | 0258 | 25E9 |
| 0000661300 | 6A01 | FF00 | 1276 | 76FF | 8D10 | 0E46 | 5016 | 76FF |
| 0000661320 | FF0C | 0A76 | 76FF | FF08 | 0676 | 026A | 909A | ECCF |
| 0000661340 | 83D2 | 14C4 | 4689 | 83FC | FC7E | 7500 | E903 | 00D1 |
| 0000661360 | 7E83 | 05FC | 0374 | 28E9 | 9A00 | D019 | D31D | 003D |
| 0000661400 | 7400 | E903 | 0009 | AAB8 | E901 | 00DA | 12E9 | E900 |
| 0000661420 | 0009 | FCB8 | E901 | 00CE | 06E9 | B800 | 01AA | C5E9 |
| 0000661440 | 8300 | FC7E | 7412 | E903 | 0028 | 199A | 45D0 | 3DD3 |
| 0000661460 | 0000 | 0374 | 09E9 | B800 | 000E | A9E9 | E900 | 0012 |
| 0000661500 | 09E9 | B800 | 01FC | 9DE9 | E900 | 0006 | 0EB8 | E900 |
| 0000661520 | 0094 | 199A | B4D0 | 3DD3 | 0000 | 0374 | 1EE9 | 8300 |
| 0000661540 | FC7E | 7D64 | E903 | 0009 | 468B | 2DFC | 012C | 06E9 |
| 0000661560 | 8B00 | FC46 | 5805 | E902 | 006C | 44E9 | 8300 | FC7E |
| 0000661600 | 7D64 | E903 | 0009 | 468B | 2DFC | 012C | 06E9 | 8B00 |
| 0000661620 | FC46 | 5805 | 3D02 | 0000 | 0374 | 09E9 | B800 | 01FC |
| 0000661640 | 43E9 | E900 | 001B | 7E83 | 64FC | 037D | 09E9 | 8B00 |
| 0000661660 | FC46 | 2C2D | E901 | 0006 | 468B | 05FC | 0258 | 25E9 |
| 0000661700 | 9A00 | D019 | CF18 | 003D | 7400 | E903 | 0009 | 00B8 |
| 0000661720 | E900 | 0012 | 0FE9 | B800 | 01FC | 09E9 | E900 | 0006 |
| 0000661740 | 00B8 | E900 | 0000 | 5F5E | ED83 | 8B02 | 1FE5 | 4D5D |
| 0000661760 | 1ECB | 9058 | 5545 | EC8B | 8E1E | 81D8 | 08EC | 5700 |
| 0000662000 | 9A56 | CFE4 | D42E | 4689 | 3DFC | 0000 | 0375 | D6E9 |
| 0000662020 | 8B00 | FC46 | ACE9 | C402 | 065E | 8B26 | 8287 | 8900 |
| 0000662040 | FA46 | 006A | 76FF | FF0C | 0A76 | 468D | 16FA | 1E50 |
| 0000662060 | 6268 | FF57 | 0876 | 76FF | 6A06 | 9A37 | CF90 | D44B |
| 0000662100 | C483 | 8914 | FC46 | 7E83 | 00FC | 0375 | A3E9 | 8300 |
| 0000662120 | FC7E | 7404 | E903 | 002B | 199A | 76D0 | 3DD4 | 0000 |
| 0000662140 | 0374 | 09E9 | B800 | 01AB | 58E9 | E902 | 0012 | 09E9 |
| 0000662160 | B800 | 01FC | 4CE9 | E902 | 0006 | ABB8 | E901 | 0243 |
| 0000662200 | 6FE9 | 9A00 | D019 | D4FE | 003D | 7400 | E903 | 001E |
| 0000662220 | 7E83 | 64FC | 037D | 09E9 | 8B00 | FC46 | 2C2D | E901 |
| 0000662240 | 0006 | 468B | 05FC | 0258 | 18E9 | E902 | 0044 | 7E83 |
| 0000662260 | 64FC | 037D | 09E9 | 8B00 | FC46 | 2C2D | E901 | 0006 |
| 0000662300 | 468B | 05FC | 0258 | 003D | 7400 | E903 | 0009 | FCB8 |
| 0000662320 | E901 | 01EF | 1BE9 | 8300 | FC7E | 7D64 | E903 | 0009 |
| 0000662340 | 468B | 2DFC | 012C | 06E9 | 8B00 | FC46 | 5805 | E902 |
| 0000662360 | 01D1 | 006A | 76FF | FF0C | 0A76 | 468D | 16FA | 1E50 |
| 0000662400 | 6268 | FF57 | 0876 | 76FF | 6A06 | 9A04 | CF90 | D536 |
| 0000662420 | C483 | 8914 | FC46 | 7E83 | 50FC | 0374 | 08E9 | C401 |
| 0000662440 | 065E | 8B26 | 8287 | 8900 | FA46 | 006A | 76FF | FF0C |
| 0000662460 | 0A76 | 468D | 16FA | 1E50 | 6268 | FF57 | 0876 | 76FF |
| 0000662500 | 6A06 | 9A05 | CF90 | D55C | C483 | 8914 | FC46 | 7E83 |
| 0000662520 | 00FC | 0375 | ACE9 | 8300 | FC7E | 7516 | E903 | 00A3 |
| 0000662540 | 7E83 | 04FC | 0374 | 2BE9 | 9A00 | D019 | D587 | 003D |
| 0000662560 | 7400 | E903 | 0009 | ABB8 | E901 | 0147 | 12E9 | E900 |
| 0000662600 | 0009 | FCB8 | E901 | 013B | 06E9 | B800 | 01AB | 32E9 |
| 0000662620 | E901 | 006F | 199A | 0FD0 | 3DD6 | 0000 | 0374 | 1EE9 |
| 0000662640 | 8300 | FC7E | 7D64 | E903 | 0009 | 466B | 2DFC | 012C |
| 0000662660 | 06E9 | 8B00 | FC46 | 5805 | E902 | 0107 | 44E9 | 8300 |
| 0000662700 | FC7E | 7D64 | E903 | 0009 | 468B | 2DFC | 012C | 06E9 |
| 0000662720 | 8B00 | FC46 | 5805 | 3D02 | 0000 | 0374 | 09E9 | B800 |
| 0000662740 | 01FC | DEE9 | E900 | 001B | 7E83 | 64FC | 037D | 09E9 |
| 0000662760 | 8B00 | FC46 | 2C2D | E901 | 0006 | 468B | 05FC | 0258 |
| 0000663000 | C0E9 | 6A00 | FF00 | 0C76 | 76FF | 8D0A | FA46 | 5016 |
| 0000663020 | 681E | 5762 | 76FF | FF08 | 0676 | 046A | 909A | 5CCF |
| 0000663040 | 83D0 | 14C4 | 4689 | 9AFC | D019 | D3F4 | 003D | 7400 |
| 0000663060 | E903 | 002D | 7E83 | 00FC | 0374 | 06E9 | B800 | 0000 |

THU MAR 14 17:31:54 1991 DB_PI.DLL PAGE 237, LINE 13925

| | | | | | | | | |
|---|---|---|---|---|---|---|---|---|
| 0000663100 | 18E9 | 8300 | FC7E | 7D64 | E903 | 0009 | 468B | 2DFC |
| 0000663120 | 012C | 06E9 | 8B00 | FC46 | 5805 | E902 | 0065 | 62E9 |
| 0000663140 | 8300 | FC7E | 7400 | E903 | 0006 | 00B8 | E900 | 0018 |
| 0000663160 | 7E83 | 64FC | 037D | 09E9 | 8B00 | FC46 | 2C2D | E901 |
| 0000663200 | 0006 | 468B | 05FC | 0258 | 003D | 7400 | E903 | 0009 |
| 0000663220 | FCB8 | E901 | 002D | 2AE9 | 8300 | FC7E | 7400 | E903 |
| 0000663240 | 0006 | 00B8 | E900 | 0018 | 7E83 | 64FC | 037D | 09E9 |
| 0000663260 | 8B00 | FC46 | 2C2D | E901 | 0006 | 468B | 05FC | 0258 |
| 0000663300 | 00E9 | 5E00 | 835F | 02ED | E58B | 5D1F | CB4D | 581E |
| 0000663320 | 4590 | 8B55 | 1EEC | D88E | EC81 | 0006 | 5657 | E49A |
| 0000663340 | 03CF | 89D7 | FC46 | 003D | 7500 | E903 | 0006 | 468B |
| 0000663360 | E9FC | 012C | 006A | 76FF | FF0C | 0A76 | 76FF | FF10 |
| 0000663400 | 0E76 | 76FF | FF14 | 1276 | 76FF | FF08 | 0676 | 056A |
| 0000663420 | 909A | 20CF | 83D7 | 14C4 | 4689 | 83FC | FC7E | 7500 |
| 0000663440 | E903 | 00D7 | 7E83 | 04FC | 0374 | 2BE9 | 9A00 | D019 |
| 0000663460 | D754 | 003D | 7400 | E903 | 0009 | ABB8 | E901 | 00E0 |
| 0000663500 | 12E9 | E900 | 0009 | FCB8 | E901 | 00D4 | 06E9 | B800 |
| 0000663520 | 01AB | CBE9 | E900 | 00A3 | 7E83 | 16FC | 0374 | 2BE9 |
| 0000663540 | 9A00 | D019 | D77F | 003D | 7400 | E903 | 0009 | FAB8 |
| 0000663560 | E901 | 00AC | 12E9 | E900 | 0009 | FCB8 | E901 | 00A0 |
| 0000663600 | 06E9 | B800 | 01FA | 97E9 | E900 | 006F | 199A | EED0 |
| 0000663620 | 3DD7 | 0000 | 0374 | 1EE9 | 8300 | FC7E | 7D64 | E903 |
| 0000663640 | 0009 | 468B | 2DFC | 012C | 06E9 | 8B00 | FC46 | 5805 |
| 0000663660 | E902 | 006C | 44E9 | 8300 | FC7E | 7D64 | E903 | 0009 |
| 0000663700 | 468B | 2DFC | 012C | 06E9 | 8B00 | FC46 | 5805 | 3D02 |
| 0000663720 | 0000 | 0374 | 09E9 | B800 | 01FC | 43E9 | E900 | 001B |
| 0000663740 | 7E83 | 64FC | 037D | 09E9 | 8B00 | FC46 | 2C2D | E901 |
| 0000663760 | 0006 | 468B | 05FC | 0258 | 25E9 | 9A00 | D019 | D61A |
| 0000664000 | 003D | 7400 | E903 | 0009 | 00B8 | E900 | 0012 | 0FE9 |
| 0000664020 | B800 | 01FC | 09E9 | E900 | 0006 | 00B8 | E900 | 0000 |
| 0000664040 | 5F5E | ED83 | 8B02 | 1FE5 | 4D5D | 1ECB | 9058 | 5545 |
| 0000664060 | EC8B | 8E1E | 81D8 | 08EC | 5700 | 8B56 | 0A46 | 32E9 |
| 0000664100 | 8B00 | 0A46 | 4689 | E9FC | 0080 | 46C7 | 06FC | E900 |
| 0000664120 | 0078 | 46C7 | 38FC | E900 | 0070 | 46C7 | 07FC | E900 |
| 0000664140 | 0068 | 46C7 | 39FC | E900 | 0060 | 13B8 | E900 | 03EC |
| 0000664160 | 57E9 | 3D00 | 000D | 0375 | DFE9 | 7EFF | E903 | 0025 |
| 0000664200 | 052D | 7500 | E903 | FFB9 | 7548 | E903 | FFBC | 7548 |
| 0000664220 | E903 | FFC6 | 042D | 7500 | E903 | FFBE | 7548 | E903 |
| 0000664240 | FFA8 | C5E9 | 2DFF | 0037 | 083D | 7600 | E903 | FFBA |
| 0000664260 | E0D1 | 2E93 | A7FF | D8A8 | D831 | D842 | D852 | D85A |
| 0000664300 | D85A | D85A | D852 | D842 | D852 | E49A | F1CF | 89D8 |
| 0000664320 | FA46 | 003D | 7500 | E903 | 0006 | 468B | E9FA | 037C |
| 0000664340 | 76FF | FF0C | 1076 | 76FF | FF0E | 1476 | 76FF | FF12 |
| 0000664360 | 1876 | 76FF | FF16 | 0876 | 76FF | FF06 | 0A76 | 909A |
| 0000664400 | 0BCF | 83D9 | 14C4 | 4689 | 83FA | FA7E | 7500 | E903 |
| 0000664420 | 0149 | 468B | E9FA | 0112 | 199A | 33D0 | 3DD9 | 0000 |
| 0000664440 | 0374 | 09E9 | B800 | 01AB | 31E9 | E903 | 0012 | 09E9 |
| 0000664460 | B800 | 01FC | 25E9 | E903 | 0006 | ABB8 | E901 | 031C |
| 0000664500 | 199A | 5BD0 | 3DD9 | 0000 | 0374 | 09E9 | B800 | 01FA |
| 0000664520 | 09E9 | E903 | 0012 | 09E9 | B800 | 01FC | FDE9 | E902 |
| 0000664540 | 0006 | FAB8 | E901 | 02F4 | 199A | 83D0 | 3DD9 | 000C |
| 0000664560 | 0374 | 09E9 | B800 | 01BC | E1E9 | E902 | 0012 | 09E9 |
| 0000664600 | B800 | 01FC | D5E9 | E902 | 0006 | BCB8 | E901 | 02CC |
| 0000664620 | 199A | ABD0 | 3DD9 | 0000 | 0374 | 09E9 | B800 | 01AF |
| 0000664640 | B9E9 | E902 | 0012 | 09E9 | B800 | 01FC | ADE9 | E902 |
| 0000664660 | 0006 | AFB8 | E901 | 02A4 | 199A | CDD0 | 3DDA | 0000 |
| 0000664700 | 0374 | 1EE9 | 8300 | FA7E | 7D64 | E903 | 0009 | 468B |
| 0000664720 | 2DFA | 012C | 06E9 | 8B00 | FA46 | 5805 | E902 | 027C |
| 0000664740 | 44E9 | 8300 | FA7E | 7D64 | E903 | 0009 | 468B | 2DFA |

THU MAR 14 17:31:54 1991 DB_PI.DLL PAGE 238, LINE 13984

| | | | | | | | | |
|---|---|---|---|---|---|---|---|---|
| 0000664760 | 012C | 06E9 | 8B00 | FA46 | 5805 | 3D02 | 0000 | 0374 |
| 0000665000 | 09E9 | B800 | 01FC | 53E9 | E902 | 001B | 7E83 | 64FA |
| 0000665020 | 037D | 09E9 | 8B00 | FA46 | 2C2D | E901 | 0006 | 468B |
| 0000665040 | 05FA | 0258 | 35E9 | E902 | 0031 | 093D | 7500 | E903 |
| 0000665060 | FF36 | 037E | 0BE9 | 2D00 | 0004 | 0375 | D9E9 | E9FE |
| 0000665100 | FF76 | 162D | 7500 | E903 | FEF6 | 3E2D | 7D00 | E903 |
| 0000665120 | FF66 | 7F48 | E903 | FF38 | 5DE9 | 83FF | 0C7E | 7400 |
| 0000665140 | E903 | 01D3 | 7E83 | 050A | 0375 | CAE9 | 8301 | 0A7E |
| 0000665160 | 7537 | E903 | 01C1 | 5EC4 | 2606 | BF83 | 0084 | 7500 |
| 0000665200 | E903 | 001B | 5EC4 | 260E | 478A | 2A03 | 48E4 | 0374 |
| 0000665220 | 06E9 | B800 | 0001 | 03E9 | B800 | 0000 | 15E9 | C400 |
| 0000665240 | 0E5E | 8026 | 013F | 0374 | 06E9 | B800 | 0001 | 03E9 |
| 0000665260 | B800 | 0000 | 003D | 7500 | E903 | 017B | 76FF | FF0C |
| 0000665300 | 1076 | 76FF | FF0E | 1476 | 76FF | FF12 | 1876 | 76FF |
| 0000665320 | FF16 | 0876 | 76FF | FF06 | FC76 | 909A | E7CF | 83DA |
| 0000665340 | 14C4 | 4689 | 83FA | FA7E | 7500 | E903 | 0149 | 468B |
| 0000665360 | E9FA | 0112 | 199A | 0FD0 | 3DDB | 0000 | 0374 | 09E9 |
| 0000665400 | B800 | 01AB | 55E9 | E901 | 0012 | 09E9 | B800 | 01FC |
| 0000665420 | 49E9 | E901 | 0006 | ABB8 | E901 | 0140 | 199A | 37D0 |
| 0000665440 | 3DDB | 0000 | 0374 | 09E9 | B800 | 01FA | 2DE9 | E901 |
| 0000665460 | 0012 | 09E9 | B800 | 01FC | 21E9 | E901 | 0006 | FAB8 |
| 0000665500 | E901 | 0118 | 199A | 5FD0 | 3DDB | 0000 | 0374 | 09E9 |
| 0000665520 | B800 | 01BC | 05E9 | E901 | 0012 | 09E9 | B800 | 01FC |
| 0000665540 | F9E9 | E900 | 0006 | BCB8 | E901 | 00F0 | 199A | 87D0 |
| 0000665560 | 3DDB | 0000 | 0374 | 09E9 | B800 | 01AF | DDE9 | E900 |
| 0000665600 | 0012 | 09E9 | B800 | 01FC | D1E9 | E900 | 0006 | AFB8 |
| 0000665620 | E901 | 00C8 | 199A | D1D0 | 3DD6 | 0000 | 0374 | 1EE9 |
| 0000665640 | 8300 | FA7E | 7D64 | E903 | 0009 | 468B | 2DFA | 012C |
| 0000665660 | 06E9 | 8B00 | FA46 | 5805 | E902 | 00A0 | 44E9 | 8300 |
| 0000665700 | FA7E | 7D64 | E903 | 0009 | 468B | 2DFA | 012C | 06E9 |
| 0000665720 | 8B00 | FA46 | 5805 | 3D02 | 0000 | 0374 | 09E9 | B800 |
| 0000665740 | 01FC | 77E9 | E900 | 001B | 7E83 | 64FA | 037D | 09E9 |
| 0000665760 | 8B00 | FA46 | 2C2D | E901 | 0006 | 468B | 05FA | 0258 |
| 0000666000 | 59E9 | E900 | 0031 | 093D | 7500 | E903 | FF36 | 037E |
| 0000666020 | 0BE9 | 2D00 | 0004 | 0375 | D9E9 | E9FE | FF76 | 162D |
| 0000666040 | 7500 | E903 | FEF6 | 3E2D | 7D00 | E903 | FF66 | 7F48 |
| 0000666060 | E903 | FF38 | 5DE9 | 9AFF | D019 | D8BD | 003D | 7400 |
| 0000666100 | E903 | 0009 | 00B8 | E900 | 0012 | 0FE9 | B800 | 01FC |
| 0000666120 | 09E9 | E900 | 0006 | 00B8 | E900 | 0000 | 5F5E | ED83 |
| 0000666140 | 8B02 | 1FE5 | 4D5D | 1ECB | 9058 | 5545 | EC8B | 8E1E |
| 0000666160 | 81D8 | 06EC | 5700 | 9A56 | CFE4 | DCA9 | 4689 | 3DFC |
| 0000666200 | 0000 | 0375 | 06E9 | 8B00 | FC46 | D4E9 | C400 | 065E |
| 0000666220 | 8B26 | 8287 | 8900 | FA46 | 006A | 76FF | FF0C | 0A76 |
| 0000666240 | 468D | 16FA | 1E50 | 6268 | FF57 | 0876 | 76FF | 8B06 |
| 0000666260 | 0E46 | 0505 | 5000 | 909A | 26CF | 83DD | 14C4 | 4689 |
| 0000666300 | 8BFC | FC46 | 3CE9 | C700 | FC46 | 0000 | 64E9 | C700 |
| 0000666320 | FC46 | 01AB | 5CE9 | C700 | FC46 | 0000 | 54E9 | C700 |
| 0000666340 | FC46 | 01AF | 4CE9 | 8300 | FC7E | 7D64 | E903 | 0008 |
| 0000666360 | 6E81 | 2CFC | E901 | 0005 | 4681 | 58FC | E902 | 0033 |
| 0000666400 | 30E9 | 3D00 | 0004 | 0375 | C4E9 | 7EFF | E903 | 000A |
| 0000666420 | C00B | 0375 | B0E9 | E9FF | FFCD | 162D | 7500 | E903 |
| 0000666440 | FFB5 | 3E2D | 7D00 | E903 | FFBD | 7F48 | E903 | FFAF |
| 0000666460 | B4E9 | 9AFF | D019 | DC2A | 003D | 7400 | E903 | 0009 |
| 0000666500 | 468B | E9FC | 001B | 18E9 | 8300 | FC7E | 7400 | E903 |
| 0000666520 | 0009 | FCB8 | E901 | 0009 | 06E9 | 8B00 | FC46 | 00E9 |
| 0000666540 | 5E00 | 835F | 02ED | E58B | 5D1F | CB4D | 581E | 4590 |
| 0000666560 | 8B55 | 1EEC | D88E | EC81 | 000C | 5657 | 46C7 | D4FC |
| 0000666600 | 9A00 | CFE4 | DDAE | 4689 | 3DFA | 0000 | 0375 | 06E9 |
| 0000666620 | 8B00 | FA46 | 34E9 | C401 | 065E | 8B26 | 8287 | 8900 |

THU MAR 14 17:31:54 1991 DB_PI.DLL PAGE 239, LINE 14043

| | | | | | | | | |
|---|---|---|---|---|---|---|---|---|
| 0000666640 | F846 | 006A | 76FF | FF0C | 0A76 | 468D | 16F8 | 1E50 |
| 0000666660 | 6268 | FF57 | 0876 | 76FF | 6A06 | 9A05 | CF90 | DDE5 |
| 0000666700 | C483 | 8914 | FA46 | 7E83 | 00FA | 0375 | 09E9 | 8300 |
| 0000666720 | FA7E | 7416 | E903 | 0025 | 006A | 76FF | FF0C | 0A76 |
| 0000666740 | 468D | 16FC | 8D50 | F446 | 5016 | 76FF | FF08 | 0676 |
| 0000666760 | 166A | 909A | 13CF | 83DE | 14C4 | 4689 | 83FA | FA7E |
| 0000667000 | 7400 | E903 | 0025 | FF6A | 76FF | FF0C | 0A76 | 468D |
| 0000667020 | 16FC | 8D50 | F446 | 5016 | 76FF | FF08 | 0676 | 1B6A |
| 0000667040 | 909A | 90CF | 83DE | 14C4 | 4689 | 8BFA | FA46 | 3CE9 |
| 0000667060 | C700 | FA46 | 0000 | 64E9 | C700 | FA46 | 01AB | 5CE9 |
| 0000667100 | C700 | FA46 | 01AF | 54E9 | C700 | FA46 | 01F7 | 4CE9 |
| 0000667120 | 8300 | FA7E | 7D64 | E903 | 0008 | 6E81 | 2CFA | E901 |
| 0000667140 | 00G5 | 4681 | 58FA | E902 | 0033 | 30E9 | 3D00 | 0004 |
| 0000667160 | 0375 | C4E9 | 7EFF | E903 | 000A | C00B | 0375 | B0E9 |
| 0000667200 | E9FF | FFCD | 512D | 7500 | E903 | FFBD | 032D | 7D00 |
| 0000667220 | E903 | FFBD | 7F48 | E903 | FFA7 | B4E9 | 9AFF | D019 |
| 0000667240 | DC6A | 003D | 7400 | E903 | 0009 | 468B | E9FA | 001B |
| 0000667260 | 18E9 | 8300 | FA7E | 7400 | E903 | 0009 | FCB8 | E901 |
| 0000667300 | 0009 | 06E9 | 8B00 | FA46 | 00E9 | 5E00 | 835F | 02ED |
| 0000667320 | E58B | 5D1F | CB4D | 581E | 4590 | 8B55 | 1EEC | D88E |
| 0000667340 | EC81 | 000E | 5657 | 46C7 | 04FC | 9A00 | CFE4 | DF0D |
| 0000667360 | 4689 | 3DF6 | 0000 | 0375 | 06E9 | 8B00 | F646 | ACE9 |
| 0000667400 | 6A00 | 8DFE | F846 | 5016 | 468D | 16FC | 8D50 | F246 |
| 0000667420 | 5016 | 76FF | FF08 | 0676 | 1B6A | 909A | 74CF | 83DD |
| 0000667440 | 14C4 | 4689 | 8BF6 | F646 | 34E9 | C700 | F646 | 0000 |
| 0000667460 | 4CE9 | C700 | F646 | 01AF | 44E9 | C700 | F646 | 01F7 |
| 0000667500 | 3CE9 | 8300 | F67E | 7D64 | E903 | 0008 | 6E81 | 2CF6 |
| 0000667520 | E901 | 0005 | 4681 | 58F6 | E902 | 0023 | 20E9 | 0B00 |
| 0000667540 | 75C0 | E903 | FFC5 | 512D | 7500 | E903 | FFCD | 032D |
| 0000667560 | 7D00 | E903 | FFCD | 7F48 | E903 | FFB7 | C4E9 | 9AFF |
| 0000667600 | D019 | DEDE | 003D | 7400 | E903 | 0009 | 468B | E9F6 |
| 0000667620 | 001B | 18E9 | 8300 | F67E | 7400 | E903 | 0009 | FCB8 |
| 0000667640 | E901 | 0009 | 06E9 | 8B00 | F646 | 00E9 | 5E00 | 835F |
| 0000667660 | 02ED | E58B | 5D1F | CB4D | 0028 | 0103 | 2C92 | 0001 |
| 0000667700 | 0005 | 0103 | 0190 | 0001 | 0007 | 0103 | 001C | 0001 |
| 0000667720 | 0008 | 0002 | 75F1 | 0004 | 0000 | 0103 | 21EF | 0001 |
| 0000667740 | 0089 | 0103 | 41B8 | 0001 | 008A | 0103 | CFFE | 0001 |
| 0000667760 | 008C | 0002 | C1C9 | 0005 | 0000 | 0103 | D02E | 0001 |
| 0000670000 | 008D | 0103 | 2B11 | 0001 | 008E | 0002 | 2CCB | 0006 |
| 0000670020 | 0000 | 0103 | 75B2 | 0001 | 0090 | 0103 | 2BEA | 0001 |
| 0000670040 | 0091 | 0002 | 2B53 | 0007 | 0000 | 0002 | 5956 | 0008 |
| 0000670060 | 0000 | 0105 | 3FA4 | 0001 | 0087 | 0105 | 40D6 | 0001 |
| 0000670100 | 0088 | 0103 | A7A3 | 0001 | 0020 | 0103 | 3914 | 0001 |
| 0000670120 | 0021 | 0103 | 593F | 0001 | 0022 | 0002 | 60EB | 000B |
| 0000670140 | 0000 | 0103 | 2CD0 | 0001 | 0026 | 0103 | 33D1 | 0001 |
| 0000670160 | 0027 | 0103 | 3430 | 0001 | 0028 | 0203 | CFD1 | 0003 |
| 0000670200 | 009A | 0103 | 2289 | 0001 | 003A | 0103 | C519 | 0001 |
| 0000670220 | 003B | 0103 | 422A | 0001 | 003C | 0103 | 695C | 0001 |
| 0000670240 | 0042 | 0103 | 420C | 0001 | 0043 | 0103 | 206D | 0001 |
| 0000670260 | 0044 | 0103 | C49E | 0001 | 0046 | 0103 | 761F | 0001 |
| 0000670300 | 0047 | 0103 | 41CA | 0001 | 0048 | 0103 | 6F02 | 0001 |
| 0000670320 | 004B | 0103 | 1FC9 | 0001 | 004D | 0103 | 697A | 0001 |
| 0000670340 | 0050 | 0103 | 41DA | 0001 | 0051 | 0103 | 006D | 0001 |
| 0000670360 | 005B | 0103 | 41F0 | 0001 | 005E | 0000 | 0000 | 0000 |
| 0000670400 | 581E | 4590 | 8B55 | 1EEC | D88E | EC81 | 0004 | 5657 |
| 0000670420 | 46C7 | 00FC | 9A00 | CFE4 | 0105 | 4689 | 83FC | FC7E |
| 0000670440 | 7500 | E903 | 0006 | 468B | E9FC | 0104 | 468B | E906 |
| 0000670460 | 00B3 | 76FF | FF1A | 1876 | 76FF | FF16 | 1476 | 76FF |
| 0000670500 | FF0E | 0C76 | 76FF | FF0A | 0876 | 0D9A | 9103 | 8300 |

THU MAR 14 17:31:54 1991 DB_PI.DLL PAGE 240, LINE 14102

| | | | | | | | | |
|---|---|---|---|---|---|---|---|---|
| 0000670520 | 10C4 | 4689 | 83FC | 067E | 7500 | E903 | 0006 | A1E9 |
| 0000670540 | E900 | 000C | 7E83 | 00FC | 0374 | 03E9 | E900 | 0092 |
| 0000670560 | 76FF | FF1A | 1876 | 76FF | FF16 | 1476 | 76FF | FF12 |
| 0000670600 | 1076 | 76FF | FF0E | 0C76 | 76FF | FF0A | 0876 | 8C9A |
| 0000670620 | CF08 | 8300 | 14C4 | 4689 | 83FC | 067E | 7500 | E903 |
| 0000670640 | 0006 | 5DE9 | E900 | 000C | 7E83 | 00FC | 0374 | 03E9 |
| 0000670660 | E900 | 004E | 76FF | FF1A | 1876 | 76FF | FF16 | 1476 |
| 0000670700 | 76FF | FF0E | 0C76 | 76FF | FF0A | 0876 | 429A | FF0D |
| 0000670720 | 83FF | 10C4 | 4689 | E9FC | 0028 | 46C7 | 13FC | E900 |
| 0000670740 | 0020 | 1DE9 | 0B00 | 7DC0 | E903 | FFEE | 7F48 | E903 |
| 0000670760 | FF40 | 7548 | E903 | FF78 | 4848 | 0375 | B5E9 | E9FF |
| 0000671000 | FFD8 | 199A | FFD0 | 3DFF | 0000 | 0374 | 09E9 | 8B00 |
| 0000671020 | FC46 | 1BE9 | E900 | 0018 | 7E83 | 00FC | 0374 | 09E9 |
| 0000671040 | B800 | 01FC | 09E9 | E900 | 0006 | 468B | E9FC | 0000 |
| 0000671060 | 5F5E | ED83 | 8B02 | 1FE5 | 4D5D | 1ECB | 9058 | 5545 |
| 0000671100 | EC8B | 8E1E | 81D8 | 2AEC | 5700 | C756 | D646 | 001F |
| 0000671120 | 46C7 | 64FA | C700 | FC46 | 0100 | 46C6 | 01DA | 46C6 |
| 0000671140 | 31DB | 30B0 | 4688 | 88DC | DD46 | 46C6 | 00DE | 00B8 |
| 0000671160 | B900 | 001B | 7E8D | 16DF | F307 | C7AA | D846 | 0000 |
| 0000671200 | 7E83 | 000A | 0375 | BBE9 | 6A00 | 8D00 | FA46 | 5016 |
| 0000671220 | 468D | 16D6 | 1E50 | 6268 | FF59 | 0876 | 76FF | 6A06 |
| 0000671240 | 9A09 | CF90 | 01C6 | C483 | 8914 | D846 | 7E83 | 16D8 |
| 0000671260 | 0374 | 05E9 | C700 | D846 | 0000 | 7E83 | 00D8 | 0375 |
| 0000671300 | 25E9 | 9A00 | D019 | 0203 | 003D | 7400 | E903 | 0009 |
| 0000671320 | 00B8 | E900 | 012C | DFE9 | B800 | 01FC | 23E9 | E901 |
| 0000671340 | 0006 | 00B8 | E900 | 011A | 006A | 468D | 16FA | 8D50 |
| 0000671360 | D646 | 5016 | 681E | 5962 | 76FF | FF08 | 0676 | 046A |
| 0000671400 | 909A | 5FCF | 8302 | 14C4 | 4689 | 83D8 | D87E | 7500 |
| 0000671420 | E903 | 002D | 7E83 | 04D8 | 0374 | 09E9 | B800 | 0000 |
| 0000671440 | DFE9 | E900 | 001B | 7E83 | 64D8 | 037D | 09E9 | 8B00 |
| 0000671460 | D846 | 2C2D | E901 | 0006 | 468B | 05D8 | 0258 | C1E9 |
| 0000671500 | E900 | 00B8 | D06A | 468D | 16DA | 8D50 | D646 | 5016 |
| 0000671520 | 681E | 5962 | 76FF | FF08 | 0676 | 096A | 909A | 81CF |
| 0000671540 | 8302 | 14C4 | 4689 | 83D8 | D87E | 7416 | E903 | 0005 |
| 0000671560 | 46C7 | 00D8 | 8300 | D87E | 7500 | E903 | 0025 | 199A |
| 0000671600 | BED0 | 3D02 | 0000 | 0374 | 09E9 | B800 | 0000 | 71E9 |
| 0000671620 | E900 | 000F | FCB8 | E901 | 0068 | 06E9 | B800 | 0000 |
| 0000671640 | 5FE9 | 6A00 | 8D00 | DA46 | 5016 | 468D | 16D6 | 1E50 |
| 0000671660 | 6268 | FF59 | 0876 | 76FF | 6A06 | 9A04 | CF90 | 0018 |
| 0000671700 | C483 | 8914 | D846 | 7E83 | 00D8 | 0375 | 2DE9 | 8300 |
| 0000671720 | D87E | 7404 | E903 | 0009 | 00B8 | E900 | 0024 | 1BE9 |
| 0000671740 | 8300 | D87E | 7D64 | E903 | 0009 | 468B | 2DD8 | 012C |
| 0000671760 | 06E9 | 8B00 | D846 | 5805 | E902 | 0006 | 00B8 | E900 |
| 0000672000 | 0000 | 5F5E | ED83 | 8B02 | 1FE5 | 4D5D | 1ECB | 9058 |
| 0000672020 | 5545 | EC8B | 8E1E | 81D8 | B4EC | 5701 | C756 | D446 |
| 0000672040 | 0000 | 86C7 | FF4C | 0000 | 86C7 | FF4E | 0001 | 46C7 |
| 0000672060 | 01D6 | 2B00 | 89C0 | DA46 | 4689 | FFD8 | 0C76 | 76FF |
| 0000672100 | 8D0A | 4C86 | 16FE | 9A50 | 2750 | 035C | C483 | 1E08 |
| 0000672120 | 0A68 | 8D39 | 4C86 | 16FE | 9A50 | 270A | 0375 | C483 |
| 0000672140 | 8B08 | 0646 | 568B | 0508 | 008A | 5052 | 868D | FE4C |
| 0000672160 | 5016 | 0A9A | 8927 | 8303 | 08C4 | 681E | 390C | 2E6A |
| 0000672200 | 868D | FE4C | 5016 | 3E9A | 933C | 8303 | 06C4 | 5052 |
| 0000672220 | 509A | D327 | 8303 | 08C4 | 5EC4 | 260E | 07C7 | 0000 |
| 0000672240 | 5EC4 | 2612 | 07C7 | 0000 | BE83 | FF4E | 7602 | E903 |
| 0000672260 | 012B | 86FF | FF4E | FE6A | 868D | FE4C | 5016 | 868D |
| 0000672300 | FF4C | 5016 | 006A | 006A | 76FF | FF08 | 0676 | 006A |
| 0000672320 | 909A | 98CF | 8304 | 14C4 | 4689 | 8BD4 | D446 | 85E9 |
| 0000672340 | C700 | 4E86 | 03FF | E900 | 0095 | 468D | 16D0 | 6A50 |
| 0000672360 | 8D00 | 4C86 | 16FE | 9A50 | 30EA | 0589 | C483 | 890A |

THU MAR 14 17:31:54 1991 DB_PI.DLL PAGE 241, LINE 14161

| | | | | | | | | |
|---|---|---|---|---|---|---|---|---|
| 0000672400 | D446 | 7E83 | 00D4 | 0375 | 06E9 | 8B00 | D446 | 70E9 |
| 0000672420 | 8B04 | D246 | 460B | 74D0 | E903 | 0006 | 00B8 | E900 |
| 0000672440 | 045F | BE83 | FF4E | 7702 | E903 | 0006 | 0DB8 | E900 |
| 0000672460 | 044F | 4AE9 | B800 | 0000 | 46E9 | 8304 | 4EBE | 02FF |
| 0000672500 | 0377 | 1BE9 | 8300 | D47E | 7D64 | E903 | 0009 | 468B |
| 0000672520 | 2DD4 | 012C | 06E9 | 8B00 | D446 | 5805 | E902 | 0421 |
| 0000672540 | 1CE9 | E900 | 0019 | C00B | 0375 | 74E9 | 48FF | 7548 |
| 0000672560 | E903 | FF76 | 0A2D | 7500 | E903 | FFB9 | BCE9 | 83FF |
| 0000672600 | 4EBE | 02FF | 0374 | 51E9 | 1E00 | 1168 | 6A39 | 8D2E |
| 0000672620 | 4C86 | 16FE | 9A50 | 3C3E | 04A2 | C483 | 5206 | 9A50 |
| 0000672640 | 2750 | 04B0 | C483 | 8D08 | 4C86 | 16FE | 9A50 | 421C |
| 0000672660 | 04C0 | C483 | 3D04 | 0000 | 0375 | 1DE9 | 9A00 | 04F6 |
| 0000672700 | 04EC | C28E | D88B | 8326 | 023F | 0375 | 05E9 | C700 |
| 0000672720 | D446 | 000D | 468B | E9D4 | 03A7 | CBE9 | 1EFE | 1668 |
| 0000672740 | 6A39 | 8D2E | 4C86 | 16FE | 9A50 | 3C3E | 04F6 | C483 |
| 0000672760 | 5206 | 9A50 | 2750 | 051E | C483 | C708 | 4C86 | 00FF |
| 0000673000 | 6A00 | 8D01 | 4C86 | 16FE | 8D50 | 4C86 | 16FF | 6A50 |
| 0000673020 | 6A00 | 8D00 | 5086 | 16FF | 6A50 | 9A00 | CF90 | 05A6 |
| 0000673040 | C483 | 8914 | D446 | 468B | E9D4 | 0033 | 49E9 | B800 |
| 0000673060 | 000D | 4CE9 | E903 | 0040 | B7B8 | E901 | 0343 | 7E83 |
| 0000673100 | 64D4 | 037D | 09E9 | 8B00 | D446 | 2C2D | E901 | 0006 |
| 0000673120 | 468B | 05D4 | 0258 | 28E9 | E903 | 001C | 19E9 | 0B00 |
| 0000673140 | 75C0 | E903 | FFC6 | 4848 | 0375 | C2E9 | 2DFF | 000A |
| 0000673160 | 0375 | C3E9 | E9FF | FFC6 | 5EC4 | 2606 | B7FF | 0084 |
| 0000673200 | 868D | FF50 | 5016 | 3B9A | 4D01 | 8300 | 06C4 | 4689 |
| 0000673220 | 83D4 | D47E | 7500 | E903 | 0006 | 468B | E9D4 | 02E1 |
| 0000673240 | FD68 | 9A7F | 243E | 05E5 | C483 | 8902 | D846 | 5689 |
| 0000673260 | 8BDA | DA46 | 460B | 74D8 | E903 | 0006 | 07B8 | E900 |
| 0000673300 | 02BF | 86C7 | FF4C | 7FFD | 006A | 006A | 006A | 868D |
| 0000673320 | FF4C | 5016 | 76FF | FFDA | D876 | 76FF | FF08 | 0676 |
| 0000673340 | 216A | 909A | A4CF | 8301 | 14C4 | 4689 | 83D4 | D47E |
| 0000673360 | 7500 | E903 | 0061 | 468B | E9D4 | 0040 | 46C7 | FAD4 |
| 0000673400 | C701 | D646 | 0000 | 4EE9 | C700 | D446 | 0000 | 46C7 |
| 0000673420 | 00D6 | E900 | 0041 | 46C7 | AFD4 | C701 | D646 | 0000 |
| 0000673440 | 34E9 | 8300 | D47E | 7D64 | E903 | 0008 | 6E81 | 2CD4 |
| 0000673460 | E901 | 0005 | 4681 | 58D4 | E902 | 001B | 092D | 7500 |
| 0000673500 | E903 | FFC5 | 0D2D | 7500 | E903 | FFB0 | 3E2D | 7500 |
| 0000673520 | E903 | FFC2 | CCE9 | 83FF | D67E | 7500 | E903 | 015D |
| 0000673540 | 006A | 468D | 16DC | 8D50 | 4C86 | 16FF | FF50 | DA76 |
| 0000673560 | 76FF | 8DD8 | 5086 | 16FF | 6A50 | 9A02 | CF90 | 073C |
| 0000673600 | C483 | 8914 | D446 | 7E83 | 00D4 | 0374 | 09E9 | C400 |
| 0000673620 | 0E5E | FF26 | E907 | 0081 | 5EC4 | 2612 | 07FF | 468B |
| 0000673640 | E9D4 | 003F | 46C7 | 00D6 | C700 | D446 | 0000 | 68E9 |
| 0000673660 | C700 | D646 | 0000 | 46C7 | 0ED4 | E900 | 005B | 46C7 |
| 0000673700 | 00D6 | C700 | D446 | 01A8 | 4EE9 | C700 | D646 | 0000 |
| 0000673720 | 46C7 | F7D4 | E901 | 0041 | 46C7 | 00D4 | E900 | 0039 |
| 0000673740 | 36E9 | 3D00 | 0012 | 0375 | C6E9 | 7EFF | E903 | 0018 |
| 0000673760 | 4848 | 037D | E1E9 | 48FF | 037F | A7E9 | 2DFF | 0009 |
| 0000674000 | 0375 | 9FE9 | E9FF | FFD0 | 502D | 7500 | E903 | FFAE |
| 0000674020 | 7548 | E903 | FFB5 | BFE9 | C7FF | 4C86 | FDFF | 6A7F |
| 0000674040 | 6A00 | 6A00 | 8D00 | 4C86 | 16FF | FF50 | DA76 | 76FF |
| 0000674060 | FFD8 | 0876 | 76FF | 6A06 | 9A18 | CF90 | 034A | C483 |
| 0000674100 | 8914 | D446 | 7E83 | 00D4 | 0375 | 6DE9 | 8B00 | D446 |
| 0000674120 | 4CE9 | C700 | D446 | 01FA | 46C7 | 00D6 | 8300 | 1246 |
| 0000674140 | E902 | 0056 | 46C7 | 00D4 | C700 | D646 | 0000 | 49E9 |
| 0000674160 | C700 | D446 | 01AF | 46C7 | 00D6 | 8300 | 1246 | E902 |
| 0000674200 | 0038 | 7E83 | 64D4 | 037D | 08E9 | 8100 | D46E | 012C |
| 0000674220 | 05E9 | 8100 | D446 | 0258 | 4683 | 0212 | 1BE9 | 2D00 |
| 0000674240 | 0009 | 0375 | BDE9 | 2DFF | 000D | 0375 | A4E9 | 2DFF |

THU MAR 14 17:31:54 1991 DB_PI.DLL PAGE 242, LINE 14220

| | | | | | | | | |
|---|---|---|---|---|---|---|---|---|
| 0000674260 | 003E | 0375 | BAE9 | E9FF | FFC8 | 9AE9 | C4FE | 0E5E |
| 0000674300 | FF26 | 8B0F | D446 | 4689 | 6AFC | 6A00 | 6A00 | 8D00 |
| 0000674320 | 4C86 | 16FF | FF50 | DA76 | 76FF | 8DD8 | 5086 | 16FF |
| 0000674340 | 6A50 | 9A01 | CF90 | 0838 | C483 | 8914 | D446 | 7E83 |
| 0000674360 | 00FC | 0374 | 24E9 | 8300 | D47E | 7500 | E903 | 001B |
| 0000674400 | 7E83 | 64D4 | 037D | 09E9 | 8B00 | D446 | 2C2D | E901 |
| 0000674420 | 0006 | 468B | 05D4 | 0258 | 4689 | 6AFC | 6A00 | 6A00 |
| 0000674440 | 8D00 | 4C86 | 16FF | FF50 | DA76 | 76FF | FFD8 | 0876 |
| 0000674460 | 76FF | 6A06 | 9A01 | CF90 | 0876 | C483 | 8914 | D446 |
| 0000674500 | 7E83 | 00FC | 0374 | 24E9 | 8300 | D47E | 7500 | E903 |
| 0000674520 | 001B | 7E83 | 64D4 | 037D | 09E9 | 8B00 | D446 | 2C2D |
| 0000674540 | E901 | 0006 | 468B | 05D4 | 0258 | 4689 | FFFC | DA76 |
| 0000674560 | 76FF | 9AD8 | 2448 | 067E | C483 | 8B04 | FC46 | 00E9 |
| 0000674600 | 5E00 | 835F | 02ED | E58B | 5D1F | CB4D | 581E | 4590 |
| 0000674620 | 8B55 | 1EEC | D88E | EC81 | 0210 | 5657 | 86C7 | FEF8 |
| 0000674640 | 0000 | 76FF | FF0C | DA76 | 868D | FEFE | 5016 | 509A |
| 0000674660 | C327 | 8308 | 08C4 | 681E | 391A | 868D | FEFE | 5016 |
| 0000674700 | 0A9A | DC27 | 8308 | 08C4 | 468B | 8B06 | 0856 | 8A05 |
| 0000674720 | 5200 | 8D50 | FE86 | 16FE | 9A50 | 270A | 08E4 | C483 |
| 0000674740 | 9A08 | D019 | 0929 | 8689 | FEF8 | BE83 | FEF8 | 7500 |
| 0000674760 | E903 | 0007 | 868B | FEF8 | 3CE9 | 6A04 | FF01 | 0C76 |
| 0000675000 | 76FF | FFDA | 0876 | 76FF | 9A06 | 21DF | 03FA | C483 |
| 0000675020 | 890A | F886 | 83FE | F8BE | 00FE | 0375 | 07E9 | 8B00 |
| 0000675040 | F886 | E9FE | 0411 | E49A | 4FCF | 8909 | F886 | 83FE |
| 0000675060 | F8BE | 00FE | 0375 | 07E9 | 8B00 | F886 | E9FE | 03F7 |
| 0000675100 | 868D | FEFE | 5016 | 8E8D | FDF6 | 5116 | 509A | 6327 |
| 0000675120 | 8309 | 08C4 | 681E | 391C | 2E6A | 868D | FEFE | 5016 |
| 0000675140 | 3E9A | 6D3C | 8309 | 06C4 | 5052 | 509A | 8127 | 8309 |
| 0000675160 | 08C4 | 681E | 3921 | 2E6A | 868D | FDF6 | 5016 | 3E9A |
| 0000675200 | 8B3C | 8309 | 05C4 | 5052 | 509A | 9927 | 8309 | 08C4 |
| 0000675220 | 76FF | FF10 | 0E76 | B09A | AA27 | 8309 | 04C4 | 8940 |
| 0000675240 | F286 | 1EFD | FA68 | 9A38 | 27B0 | 09BD | C483 | 4004 |
| 0000675260 | 8601 | FDF2 | 868D | FEFE | 5016 | B09A | D027 | 8309 |
| 0000675300 | 04C4 | 0140 | F286 | 8DFD | F686 | 16FD | 9A50 | 27B0 |
| 0000675320 | 09E4 | C483 | 0104 | F286 | 6AFD | 8B01 | F286 | 40FD |
| 0000675340 | 9A50 | 3376 | 0A1D | C483 | 8904 | FA86 | 89FE | FC96 |
| 0000675360 | 8BFE | FC86 | 0BFE | FA86 | 74FE | E903 | 0006 | 07B8 |
| 0000675400 | E900 | D333 | 681E | 38FA | 76FF | FF10 | 0E76 | 681E |
| 0000675420 | 3926 | B6FF | FEFC | B6FF | FEFA | 269A | 3331 | 830A |
| 0000675440 | 10C4 | 868D | FEFE | 5016 | B6FF | FEFC | B6FF | FEFA |
| 0000675460 | 0A9A | 4727 | 830A | 08C4 | 681E | 392D | B6FF | FEFC |
| 0000675500 | B6FF | FEFA | 0A9A | 5D27 | 830A | 08C4 | 868D | FDF6 |
| 0000675520 | 5016 | B6FF | FEFC | B6FF | FEFA | 0A9A | 6D27 | 830A |
| 0000675540 | 08C4 | B6FF | FEFC | B6FF | FEFA | 689A | 8168 | 830A |
| 0000675560 | 04C4 | 8689 | FEF8 | B6FF | FEFC | B6FF | FEFA | 489A |
| 0000675600 | 9324 | 830A | 04C4 | BE83 | FEF8 | 7500 | E903 | 004A |
| 0000675620 | F69A | E604 | 8E07 | 8BC2 | 26D8 | 078B | 1BE9 | B800 |
| 0000675640 | 01C1 | 92E9 | B802 | 01B7 | 8CE9 | B802 | 0007 | 86E9 |
| 0000675660 | B802 | 01C1 | 80E9 | E902 | 0020 | 4848 | 0375 | E4E9 |
| 0000675700 | 2DFF | 0005 | 0375 | D6E9 | 48FF | 0375 | D6E9 | 2DFF |
| 0000675720 | 0004 | 0375 | D4E9 | E9FF | FFD7 | 868D | FDF6 | 5016 |
| 0000675740 | 868D | FDF4 | 5016 | 006A | 006A | FF9A | 00FF | 8900 |
| 0000675760 | F686 | 83FE | F6BE | 00FE | 0375 | 06E9 | B800 | 01B1 |
| 0000676000 | 34E9 | 8302 | F4A6 | F8FD | 868D | FDF6 | 5016 | B6FF |
| 0000676020 | FDF4 | 006A | 006A | FF9A | 00FF | 8900 | F686 | 83FE |
| 0000676040 | F6BE | 00FE | 0375 | 4FE9 | 8B00 | F686 | E9FE | 0015 |
| 0000676060 | A4B8 | E901 | 0201 | B1B8 | E901 | 01FB | F4B8 | E901 |
| 0000676100 | 01F5 | 33E9 | 3D00 | 0005 | 0375 | E3E9 | 76FF | E903 |
| 0000676120 | 0013 | 022D | 7300 | E903 | FFE2 | 012D | 7700 | E903 |

THU MAR 14 17:31:54 1991 DB_PI.DLL PAGE 243, LINE 14279

| | | | | | | | | |
|---|---|---|---|---|---|---|---|---|
| 0000676140 | FFD4 | D7E9 | 2DFF | 0020 | 0375 | C3E9 | 2DFF | 004C |
| 0000676160 | 0375 | BBE9 | E9FF | FFC4 | 681E | 392F | 2E6A | 868D |
| 0000676200 | FEFE | 5016 | 3E9A | 913C | 830B | 06C4 | 5052 | 509A |
| 0000676220 | A527 | 830B | 08C4 | 76FF | FF0C | 0A76 | 868D | FDF6 |
| 0000676240 | 5016 | 509A | B727 | 830B | 08C4 | 681E | 3934 | 868D |
| 0000676260 | FDF6 | 5016 | 0A9A | D027 | 830B | 08C4 | 468B | 8B06 |
| 0000676300 | 0856 | 8A05 | 5200 | 8D50 | F686 | 16FD | 9A50 | 270A |
| 0000676320 | 0BDE | C483 | FF08 | 1076 | 76FF | 9A0E | 27B0 | 0BEC |
| 0000676340 | C483 | 1E04 | 0468 | 8B39 | 9AF0 | 27B0 | 0BFC | C483 |
| 0000676360 | 8D04 | FE8E | 16FE | 8B51 | 9AF8 | 27B0 | 0C0E | C483 |
| 0000676400 | 8D04 | F68E | 16FD | 8951 | F086 | 9AFD | 27B0 | 0C2D |
| 0000676420 | C483 | 0304 | F086 | 03FD | 03F8 | 83F7 | 03C6 | B689 |
| 0000676440 | FDF2 | 016A | 868B | FDF2 | 5040 | 769A | 6633 | 830C |
| 0000676460 | 04C4 | 8689 | FEFA | 9689 | FEFC | 868B | FEFC | 860B |
| 0000676500 | FEFA | 0374 | 06E9 | B800 | 0007 | EAE9 | 1E00 | 0468 |
| 0000676520 | FF39 | 1076 | 76FF | 1E0E | 3668 | FF39 | FCB6 | FFFE |
| 0000676540 | FAB6 | 9AFE | 3126 | 0C7C | C483 | 8D10 | FE86 | 16FE |
| 0000676560 | FF50 | FCB6 | FFFE | FAB6 | 9AFE | 270A | 0C90 | C483 |
| 0000676600 | 1E08 | 3D68 | FF39 | FCB6 | FFFE | FAB6 | 9AFE | 270A |
| 0000676620 | 0CA6 | C483 | 8D08 | F686 | 16FD | FF50 | FCB6 | FFFE |
| 0000676640 | FAB6 | 9AFE | 270A | 0CB6 | C483 | FF08 | FCB6 | FFFE |
| 0000676660 | FAB6 | 9AFE | 6868 | 0CCA | C483 | 8904 | F886 | FFFE |
| 0000676700 | FCB6 | FFFE | FAB6 | 9AFE | 2448 | 0CDC | C483 | 8304 |
| 0000676720 | F8BE | 00FE | 0375 | 4AE9 | 9A00 | 04F6 | 0D2C | C28E |
| 0000676740 | D88B | 8B26 | E907 | 001B | C1B8 | E901 | 0049 | B7B8 |
| 0000676760 | E901 | 0043 | 07B8 | E900 | 003D | C1B8 | E901 | 0037 |
| 0000677000 | 20E9 | 4800 | 7548 | E903 | FFE4 | 052D | 7500 | E903 |
| 0000677020 | FFD6 | 7548 | E903 | FFD6 | 042D | 7500 | E903 | FFD4 |
| 0000677040 | D7E9 | 8DFF | FE86 | 16FE | 9A50 | 421C | 08B1 | C483 |
| 0000677060 | B804 | 0000 | 00E9 | 5E00 | 835F | 02ED | E58B | 5D1F |
| 0000677100 | CB4D | 581E | 4590 | 8B55 | 1EEC | D88E | EC81 | 0000 |
| 0000677120 | 5657 | 00B8 | E900 | 0000 | 5F5E | ED83 | 8B02 | 1FE5 |
| 0000677140 | 4D5D | 1ECB | 9058 | 5545 | EC8B | 8E1E | 81D8 | 50EC |
| 0000677160 | 5702 | C756 | B286 | 00FE | 2B00 | 89C0 | FC46 | 4689 |
| 0000677200 | C7FA | F646 | 0064 | 46C7 | 00F8 | C601 | D686 | 01FE |
| 0000677220 | 86C6 | FED7 | B031 | 8830 | D886 | 88FE | D986 | C6FE |
| 0000677240 | DA86 | 00FE | 00B8 | B900 | 001B | BE8D | FEDB | 0716 |
| 0000677260 | AAF3 | E49A | D9CF | 890D | B486 | 3DFE | 0000 | 0375 |
| 0000677300 | 07E9 | 8B00 | B486 | E9FE | 0689 | 76FF | FF0C | 0A76 |
| 0000677320 | 868D | FDB2 | 5016 | 509A | EB27 | 830D | 08C4 | 681E |
| 0000677340 | 393F | 868D | FDB2 | 5016 | 0A9A | 0427 | 830E | 08C4 |
| 0000677360 | 468B | 8B06 | 0856 | 8A05 | 5200 | 8D50 | B286 | 16FD |
| 0000677400 | 9A50 | 270A | 0E27 | C483 | FF08 | 0E76 | 868D | FDB2 |
| 0000677420 | 5016 | 868D | FEB2 | 5016 | 006A | 006A | 76FF | FF08 |
| 0000677440 | 0676 | 006A | 909A | 47CF | 830E | 14C4 | 8689 | FEB4 |
| 0000677460 | BE83 | FEB4 | 7500 | E903 | 014E | 868B | FEB4 | 1EE9 |
| 0000677500 | E901 | 0144 | 199A | 6FD0 | 3D0E | 0000 | 0374 | 09E9 |
| 0000677520 | B800 | 000D | FCE9 | E905 | 0012 | 09E9 | B800 | 01FC |
| 0000677540 | F0E9 | E905 | 0006 | 0DB8 | E900 | 05E7 | 199A | 97D0 |
| 0000677560 | 3D0E | 0000 | 0374 | 09E9 | B800 | 019D | D4E9 | E905 |
| 0000677600 | 0012 | 09E9 | B800 | 01FC | C8E9 | E905 | 0006 | 9DB8 |
| 0000677620 | E901 | 05BF | 199A | BFD0 | 3D0E | 0000 | 0374 | 09E9 |
| 0000677640 | B800 | 01A9 | ACE9 | E905 | 0012 | 09E9 | B800 | 01FC |
| 0000677660 | A0E9 | E905 | 0006 | A9B8 | E901 | 0597 | 199A | E7D0 |
| 0000677700 | 3D0E | 0000 | 0374 | 09E9 | B800 | 01A4 | 84E9 | E905 |
| 0000677720 | 0012 | 09E9 | B800 | 01FC | 78E9 | E905 | 0006 | A4B8 |
| 0000677740 | E901 | 056F | 199A | CFD0 | 3D0F | 0000 | 0374 | 21E9 |
| 0000677760 | 8300 | B4BE | 64FE | 037D | 0AE9 | 8B00 | B486 | 2DFE |
| 0000700000 | 012C | 07E9 | 8B00 | B486 | 05FE | 0258 | 44E9 | E905 |

THU MAR 14 17:31:54 1991 DB_PI.DLL PAGE 244, LINE 14338

| | | | | | | | | |
|---|---|---|---|---|---|---|---|---|
| 0000700020 | 004A | BE83 | FEB4 | 7D64 | E903 | 000A | 868B | FEB4 |
| 0000700040 | 2C2D | E901 | 0007 | 868B | FEB4 | 5805 | 3D02 | 0000 |
| 0000700060 | 0374 | 09E9 | B800 | 01FC | 18E9 | E905 | 001E | BE83 |
| 0000700100 | FEB4 | 7D64 | E903 | 000A | 868B | FEB4 | 2C2D | E901 |
| 0000700120 | 0007 | 868B | FEB4 | 5805 | E902 | 04F7 | 29E9 | 0B00 |
| 0000700140 | 75C0 | E903 | FEDB | 4848 | 0375 | D7E9 | 2DFE | 000A |
| 0000700160 | 0375 | F7E9 | 2DFE | 001E | 0375 | 17E9 | 2DFF | 0034 |
| 0000700200 | 0375 | 37E9 | E9FF | FF5C | 468B | C40E | 065E | 8926 |
| 0000700220 | 8087 | 8B00 | 1046 | 5EC4 | 2606 | 8789 | 0084 | 5EC4 |
| 0000700240 | 2606 | 878B | 0082 | 8689 | FEB2 | 7E83 | 0010 | 0375 |
| 0000700260 | 0AE9 | 6A02 | 8D00 | F646 | 5016 | 868D | FEB2 | 5016 |
| 0000700300 | 681E | 5962 | 76FF | FF08 | 0676 | 096A | 909A | 87CF |
| 0000700320 | 830B | 14C4 | 8689 | FEB4 | BE83 | FEB4 | 7416 | E903 |
| 0000700340 | 0006 | 86C7 | FEB4 | 0000 | BE83 | FEB4 | 7500 | E903 |
| 0000700360 | 0028 | 199A | 30D0 | 3D10 | 0000 | 0374 | 09E9 | B800 |
| 0000700400 | 01B9 | 4EE9 | E904 | 0012 | 09E9 | B800 | 01FC | 42E9 |
| 0000700420 | E904 | 0006 | B9B8 | E901 | 0439 | 7E83 | 64F6 | 0374 |
| 0000700440 | 0AE9 | 8100 | F87E | 0100 | 0375 | 28E9 | 9A00 | D019 |
| 0000700460 | 1071 | 003D | 7400 | E903 | 0009 | B9B8 | E901 | 0413 |
| 0000700500 | 12E9 | E900 | 0009 | FCB8 | E901 | 0407 | 06E9 | B800 |
| 0000700520 | 01B9 | FEE9 | 6A03 | 8D00 | FA46 | 5016 | 868D | FEB2 |
| 0000700540 | 5016 | 681E | 5962 | 76FF | FF08 | 0676 | 0D6A | 909A |
| 0000700560 | BBCF | 8310 | 14C4 | 8689 | FEB4 | BE83 | FEB4 | 7416 |
| 0000700600 | E903 | 0006 | 86C7 | FEB4 | 0000 | BE83 | FEB4 | 7400 |
| 0000700620 | E903 | 0030 | 468A | 2AFD | 48E4 | 0374 | 25E9 | 6A00 |
| 0000700640 | 8D00 | FA46 | 5016 | 868D | FEB2 | 5016 | 681E | 5962 |
| 0000700660 | 76FF | FF08 | 0676 | 076A | 909A | EBCF | 8310 | 14C4 |
| 0000700700 | 8689 | FEB4 | BE83 | FEB4 | 7416 | E903 | 0006 | 86C7 |
| 0000700720 | FEB4 | 0000 | BE83 | FEB4 | 7500 | E903 | 009D | BE83 |
| 0000700740 | FEB4 | 7509 | E903 | 007B | 199A | DAD0 | 3D11 | 0000 |
| 0000700760 | 0374 | 21E9 | 8300 | B4BE | 64FE | 037D | 0AE9 | 8B00 |
| 0000701000 | B486 | 2DFE | 012C | 07E9 | 8B00 | B486 | 05FE | 0258 |
| 0000701020 | 40E9 | E903 | 004A | BE83 | FEB4 | 7D64 | E903 | 000A |
| 0000701040 | 868B | FEB4 | 2C2D | E901 | 0007 | 868B | FEB4 | 5805 |
| 0000701060 | 3D02 | 0000 | 0374 | 09E9 | B800 | 01FC | 14E9 | E903 |
| 0000701100 | 001E | BE83 | FEB4 | 7D64 | E903 | 000A | 868B | FEB4 |
| 0000701120 | 2C2D | E901 | 0007 | 868B | FEB4 | 5805 | E902 | 02F3 |
| 0000701140 | 15E9 | C400 | 065E | C02B | 8926 | 8887 | 2600 | 8789 |
| 0000701160 | 0086 | 86C7 | FEB4 | 0000 | 13E9 | 8B00 | FA46 | 568B |
| 0000701200 | C4FC | 065E | 8926 | 8687 | 2600 | 9789 | 0088 | 5EC4 |
| 0000701220 | 2606 | 878B | 0086 | 8B26 | 8897 | 2500 | FFFF | E281 |
| 0000701240 | 00FF | 6E8A | 2A12 | 2BC9 | 0BDB | 0BC3 | C4D1 | 065E |
| 0000701260 | 8926 | 8687 | 2600 | 9789 | 0088 | 6CE9 | 6A01 | 8D00 |
| 0000701300 | D686 | 16FE | 8D50 | B286 | 16FE | 1E50 | 6268 | FF59 |
| 0000701320 | 0876 | 76FF | 6A06 | 9A09 | CF90 | 1200 | C483 | 8914 |
| 0000701340 | B486 | 83FE | B4BE | 16FE | 0374 | 06E9 | C700 | B486 |
| 0000701360 | 00FE | 8300 | B4BE | 00FE | 0375 | 28E9 | 9A00 | D019 |
| 0000701400 | 1232 | 003D | 7400 | E903 | 0009 | B9B8 | E901 | 0243 |
| 0000701420 | 12E9 | E900 | 0009 | FCB8 | E901 | 0237 | 06E9 | B800 |
| 0000701440 | 01B9 | 2EE9 | 1E02 | DA68 | 8D38 | D686 | 16FE | 9A50 |
| 0000701460 | 2786 | 1242 | C483 | 3D08 | 0000 | 0375 | 28E9 | 9A00 |
| 0000701500 | D019 | 1284 | 003D | 7400 | E903 | 0009 | B9B8 | E901 |
| 0000701520 | 0201 | 12E9 | E900 | 0009 | FCB8 | E901 | 01F5 | 06E9 |
| 0000701540 | B800 | 01B9 | ECE9 | 6A01 | 8D00 | B686 | 16FE | 8D50 |
| 0000701560 | B286 | 16FE | 1E50 | 6268 | FF59 | 0876 | 76FF | 6A06 |
| 0000701600 | 9A0C | CF90 | 12B4 | C483 | 8914 | B486 | 83FE | B4BE |
| 0000701620 | 16FE | 0374 | C3E9 | C700 | B486 | 00FE | 8300 | B4BE |
| 0000701640 | 00FE | 0375 | 82E9 | 8300 | B4BE | 09FE | 0375 | 78E9 |
| 0000701660 | 9A00 | D019 | 1341 | 003D | 7400 | E903 | 0021 | BE83 |

THU MAR 14 17:31:54 1991 DB_PI.DLL PAGE 245, LINE 14397

| | | | | | | | | |
|---|---|---|---|---|---|---|---|---|
| 0000701700 | FEB4 | 7D64 | E903 | 000A | 868B | FEB4 | 2C2D | E901 |
| 0000701720 | 0007 | 868B | FEB4 | 5805 | E902 | 0177 | 4AE9 | 8300 |
| 0000701740 | B4BE | 64FE | 037D | 0AE9 | 8B00 | B486 | 2DFE | 012C |
| 0000701760 | 07E9 | 8B00 | B486 | 05FE | 0258 | 003D | 7400 | E903 |
| 0000702000 | 0009 | FCB8 | E901 | 014B | 1EE9 | 8300 | B4BE | 64FE |
| 0000702020 | 037D | 0AE9 | 8B00 | B486 | 2DFE | 012C | 07E9 | 8B00 |
| 0000702040 | B486 | 05FE | 0258 | 2AE9 | 8301 | 0E7E | 75FE | E903 |
| 0000702060 | 00FC | 868D | FDB2 | 5016 | 868D | FEF6 | 5016 | 509A |
| 0000702100 | 5527 | 8313 | 08C4 | 681E | 3941 | 2E6A | 868D | FEF6 |
| 0000702120 | 5016 | 3E9A | 5F3C | 8313 | 06C4 | 5052 | 509A | 7127 |
| 0000702140 | 8313 | 08C4 | BE83 | FEB4 | 7500 | E903 | 0031 | 199A |
| 0000702160 | B5D0 | 3D0D | 0000 | 0374 | 0AE9 | 8B00 | B486 | E9FE |
| 0000702200 | 00D1 | 1AE9 | 8300 | B4BE | 00FE | 0374 | 09E9 | B800 |
| 0000702220 | 01FC | BEE9 | E900 | 0007 | 868B | FEB4 | B4E9 | 1E00 |
| 0000702240 | 4668 | 6A39 | 8D2E | B286 | 16FD | 9A50 | 3C3E | 13B8 |
| 0000702260 | C483 | 5206 | 9A50 | 2750 | 13E4 | C483 | 6A08 | 8D01 |
| 0000702300 | B286 | 16FD | 9A50 | 29CF | 090C | C483 | 3D06 | 0000 |
| 0000702320 | 0375 | 59E9 | 1E00 | 4B68 | 6A39 | 8D2E | F686 | 16FE |
| 0000702340 | 9A50 | 3C3E | 13EE | C483 | 5206 | 9A50 | 2750 | 1400 |
| 0000702360 | C483 | 8308 | B4BE | 00FE | 0375 | 31E9 | 9A00 | D019 |
| 0000702400 | 1431 | 003D | 7400 | E903 | 000A | 868B | FEB4 | 42E9 |
| 0000702420 | E900 | 001A | BE83 | FEB4 | 7400 | E903 | 0009 | FCB8 |
| 0000702440 | E901 | 002F | 07E9 | 8B00 | B486 | E9FE | 0025 | 199A |
| 0000702460 | F5D0 | 3D0F | 0000 | 0374 | 09E9 | B800 | 0000 | 12E9 |
| 0000702500 | E900 | 000F | FCB8 | E901 | 0009 | 06E9 | B800 | 0000 |
| 0000702520 | 00E9 | 5E00 | 835F | 02ED | E58B | 5D1F | CB4D | 581E |
| 0000702540 | 4590 | 8B55 | 1EEC | D88E | EC81 | 0008 | 5657 | 46C7 |
| 0000702560 | 00FA | 9A00 | CFE4 | 14A3 | 4689 | 3DFC | 0000 | 0375 |
| 0000702600 | 06E9 | 8B00 | FC46 | FDE9 | 6A00 | 6A00 | 6A00 | 8D00 |
| 0000702620 | FA46 | 5016 | 006A | 006A | 76FF | FF08 | 0676 | 016A |
| 0000702640 | 909A | C0CF | 8314 | 14C4 | 4689 | 83FC | FC7E | 7500 |
| 0000702660 | E903 | 00A3 | 7E83 | 03FC | 0374 | 2BE9 | 9A00 | D019 |
| 0000702700 | 14EB | 003D | 7400 | E903 | 0009 | 9FB8 | E901 | 00B6 |
| 0000702720 | 12E9 | E900 | 0009 | FCB8 | E901 | 00AA | 06E9 | B800 |
| 0000702740 | 019F | A1E9 | E900 | 006F | 199A | 64D0 | 3D15 | 0000 |
| 0000702760 | 0374 | 1EE9 | 8300 | FC7E | 7D64 | E903 | 0009 | 468B |
| 0000703000 | 2DFC | 012C | 06E9 | 8B00 | FC46 | 5805 | E902 | 0076 |
| 0000703020 | 44E9 | 8300 | FC7E | 7D64 | E903 | 0009 | 468B | 2DFC |
| 0000703040 | 012C | 06E9 | 8B00 | FC46 | 5805 | 3D02 | 0000 | 0374 |
| 0000703060 | 09E9 | B800 | 01FC | 4DE9 | E900 | 001B | 7E83 | 64FC |
| 0000703100 | 037D | 09E9 | 8B00 | FC46 | 2C2D | E901 | 0006 | 468B |
| 0000703120 | 05FC | 0258 | 2FE9 | C400 | 065E | C726 | 8087 | 0000 |
| 0000703140 | 9A00 | D019 | 13AE | 003D | 7400 | E903 | 0009 | 00B8 |
| 0000703160 | E900 | 0012 | 0FE9 | B800 | 01FC | 09E9 | E900 | 0006 |
| 0000703200 | 00B8 | E900 | 0000 | 5F5E | ED83 | 8B02 | 1FE5 | 4D5D |
| 0000703220 | 1ECB | 9058 | 5545 | EC8B | 8E1E | 81D8 | 06EC | 5700 |
| 0000703240 | C756 | FA46 | 0000 | E49A | D4CF | 8915 | FC46 | 003D |
| 0000703260 | 7500 | E903 | 0006 | 468B | E9FC | 0042 | 006A | 681E |
| 0000703300 | 5962 | 468D | 16FA | 1E50 | 6268 | 1E59 | 6268 | 6A59 |
| 0000703320 | 9A19 | CF90 | 15DC | C483 | 9A14 | D019 | 1476 | 003D |
| 0000703340 | 7400 | E903 | 0009 | 00B8 | E900 | 0012 | 0FE9 | B800 |
| 0000703360 | 01FC | 09E9 | E900 | 0006 | 00B8 | E900 | 0000 | 5F5E |
| 0000703400 | ED83 | 8B02 | 1FE5 | 4D5D | 1ECB | 9058 | 5545 | EC8B |
| 0000703420 | 8E1E | 81D8 | 36EC | 5701 | C756 | FC46 | 0020 | 46C7 |
| 0000703440 | 62F8 | 8C59 | FA5E | 46C7 | 62F4 | 8C59 | F65E | E49A |
| 0000703460 | 53CF | 8916 | F246 | 003D | 7500 | E903 | 0006 | 468B |
| 0000703500 | E9F2 | 051B | 76FF | FF0E | 0C76 | 868D | FECC | 5016 |
| 0000703520 | 509A | 6527 | 8316 | 08C4 | 681E | 3950 | 868D | FECC |
| 0000703540 | 5016 | 0A9A | 7E27 | 8316 | 08C4 | 468B | 8B06 | 0856 |

THU MAR 14 17:31:54 1991 DB_PI.DLL PAGE 246, LINE 14456

| | | | | | | | | |
|---|---|---|---|---|---|---|---|---|
| 0000703560 | 8A05 | 5200 | 8D50 | CC86 | 16FE | 9A50 | 270A | 16AD |
| 0000703600 | C483 | C408 | 065E | 8B26 | 8287 | 8900 | EC46 | 468B |
| 0000703620 | 0516 | 5961 | 4689 | 8CF4 | F65E | 468B | 8BF4 | F656 |
| 0000703640 | 4689 | 89F8 | FA56 | 206A | 016A | 769A | C633 | 8316 |
| 0000703660 | 04C4 | 4689 | 89EE | F056 | 468B | 0BF0 | EE46 | 0374 |
| 0000703700 | 28E9 | 9A00 | D019 | 1796 | 003D | 7400 | E903 | 0009 |
| 0000703720 | 07B8 | E900 | 0489 | 12E9 | E900 | 0009 | FCB8 | E901 |
| 0000703740 | 047D | 06E9 | B800 | 0007 | 74E9 | C404 | 065E | 8B26 |
| 0000703760 | 8287 | C400 | EE5E | 8926 | 8B07 | 1046 | 5EC4 | 26EE |
| 0000704000 | 4789 | C402 | EE5E | C726 | 0447 | 0001 | 468B | C412 |
| 0000704020 | EE5E | 8926 | 0E47 | 7E83 | 0012 | 0375 | 09E9 | 8B00 |
| 0000704040 | 1446 | 0405 | E900 | 0003 | 468B | C414 | EE5E | 8926 |
| 0000704060 | 0A47 | 468B | C416 | EE5E | 8926 | 1047 | 5EC4 | 2606 |
| 0000704100 | BF83 | 0084 | 1A01 | 24C0 | 04FD | C40E | EE5E | 8826 |
| 0000704120 | 1A47 | 5EC4 | 26EE | 478A | 2A1A | E9E4 | 006B | 5EC4 |
| 0000704140 | 26EE | 47C7 | 0412 | 8300 | F846 | C404 | F45E | C726 |
| 0000704160 | 6407 | 2600 | 47C7 | 0002 | E901 | 0060 | 5EC4 | 26EE |
| 0000704200 | 47C7 | 2012 | 8300 | F846 | 1E20 | DA68 | FF38 | F676 |
| 0000704220 | 76FF | 9AF4 | 2750 | 17A1 | C483 | E908 | 003E | 199A |
| 0000704240 | 10D0 | 3D18 | 0000 | 0374 | 09E9 | B800 | 01FD | AEE9 |
| 0000704260 | E903 | 0012 | 09E9 | B800 | 01FC | A2E9 | E903 | 0006 |
| 0000704300 | FDB8 | E901 | 0399 | 13E9 | 2D00 | 000B | 0375 | ABE9 |
| 0000704320 | 2DFF | 0003 | 0375 | 85E9 | E9FF | FFC2 | 5EC4 | 26EE |
| 0000704340 | 47C7 | 0014 | C401 | EE5E | 8026 | 1A7F | 740B | E903 |
| 0000704360 | 0008 | 5EC4 | 26EE | 4783 | 0214 | 5EC4 | 8B06 | F846 |
| 0000704400 | 562D | 2659 | 8739 | 0082 | 0372 | 28E9 | 9A00 | D019 |
| 0000704420 | 1858 | 003D | 7400 | E903 | 0009 | FAB8 | E901 | 033F |
| 0000704440 | 12E9 | E900 | 0009 | FCB8 | E901 | 0333 | 06E9 | B800 |
| 0000704460 | 01FA | 2AE9 | 8303 | 187E | 1B01 | 5DC0 | 868D | FECC |
| 0000704500 | 5016 | 468D | 16FC | FF50 | F076 | 76FF | FFEE | 0876 |
| 0000704520 | 76FF | 6A06 | 9A0E | CF90 | 1869 | C483 | 8914 | F246 |
| 0000704540 | 468B | E9F2 | 00B7 | 199A | 94D0 | 3D18 | 0000 | 0374 |
| 0000704560 | 09E9 | B800 | 01F6 | E6E9 | E902 | 0012 | 09E9 | B800 |
| 0000704600 | 01FC | DAE9 | E902 | 0006 | F6B8 | E901 | 02D1 | 9FE9 |
| 0000704620 | 9A00 | D019 | 18EF | 003D | 7400 | E903 | 0009 | B8B8 |
| 0000704640 | E901 | 02BB | 12E9 | E900 | 0009 | FCB8 | E901 | 02AF |
| 0000704660 | 06E9 | B800 | 01B8 | A6E9 | E902 | 0074 | 7E83 | 00F2 |
| 0000704700 | 0374 | 08E9 | C700 | F246 | 0000 | 16E9 | 8300 | F27E |
| 0000704720 | 7D64 | E903 | 0008 | 6E81 | 2CF2 | E901 | 0005 | 4681 |
| 0000704740 | 58F2 | 8302 | F27E | 7500 | E903 | 002E | 199A | 3DD0 |
| 0000704760 | 3D19 | 0000 | 0374 | 09E9 | 8B00 | F246 | 60E9 | E902 |
| 0000705000 | 0018 | 7E83 | 00F2 | 0374 | 09E9 | B800 | 01FC | 4EE9 |
| 0000705020 | E902 | 0006 | 468B | E9F2 | 0245 | 13E9 | 2D00 | 0018 |
| 0000705040 | 0375 | 41E9 | 2DFF | 0023 | 0375 | 64E9 | E9FF | FF8C |
| 0000705060 | 046A | 026A | 76FF | FFFA | F876 | 8E9A | A93E | 8315 |
| 0000705100 | 08C4 | 5EC4 | 26F8 | 47C7 | 6404 | C400 | F85E | C726 |
| 0000705120 | 0647 | 0064 | 468B | C40A | F85E | 8926 | 0847 | 5EC4 |
| 0000705140 | 2606 | 878B | 0082 | 4689 | 6AEC | 8DFF | CC86 | 16FE |
| 0000705160 | 8D50 | EC46 | 5016 | 006A | 006A | 76FF | FF08 | 0676 |
| 0000705200 | 006A | 909A | 99CF | 8319 | 14C4 | 4689 | 83F2 | F27E |
| 0000705220 | 7500 | E903 | 006F | 199A | 21D0 | 3D1A | 0000 | 0374 |
| 0000705240 | 1EE9 | 8300 | F27E | 7D64 | E903 | 0009 | 468B | 2DF2 |
| 0000705260 | 012C | 06E9 | 8B00 | F246 | 5805 | E902 | 01A1 | 44E9 |
| 0000705300 | 8300 | F27E | 7D64 | E903 | 0009 | 468B | 2DF2 | 012C |
| 0000705320 | 06E9 | 8B00 | F246 | 5805 | 3D02 | 0000 | 0374 | 09E9 |
| 0000705340 | B800 | 01FC | 78E9 | E901 | 001B | 7E83 | 64F2 | 037D |
| 0000705360 | 09E9 | 8B00 | F246 | 2C2D | E901 | 0006 | 468B | 05F2 |
| 0000705400 | 0258 | 5AE9 | 6A01 | FF00 | F676 | 76FF | 8DF4 | EC46 |
| 0000705420 | 5016 | 681E | 5962 | 76FF | FF08 | 0676 | 026A | 909A |

THU MAR 14 17:31:54 1991 DB_PI.DLL PAGE 247, LINE 14515

| | | | | | | | | |
|---|---|---|---|---|---|---|---|---|
| 0000705440 | 35CF | 831A | 14C4 | 4689 | 83F2 | F27E | 7500 | E903 |
| 0000705460 | 006F | 199A | BBD0 | 3D1A | 0000 | 0374 | 1EE9 | 8300 |
| 0000705500 | F27E | 7D64 | E903 | 0009 | 468B | 2DF2 | 012C | 06E9 |
| 0000705520 | 8B00 | F246 | 5805 | E902 | 0105 | 44E9 | 8300 | F27E |
| 0000705540 | 7D64 | E903 | 0009 | 468B | 2DF2 | 012C | 06E9 | 8B00 |
| 0000705560 | F246 | 5805 | 3D02 | 0000 | 0374 | 09E9 | B800 | 01FC |
| 0000705600 | DCE9 | E900 | 001B | 7E83 | 64F2 | 037D | 09E9 | 8B00 |
| 0000705620 | F246 | 2C2D | E901 | 0006 | 468B | 05F2 | 0258 | BEE9 |
| 0000705640 | 6A00 | 6A00 | 6A00 | 8D00 | EC46 | 5016 | 006A | 006A |
| 0000705660 | 76FF | FF08 | 0676 | 016A | 909A | C6CF | 831A | 14C4 |
| 0000705700 | 4689 | 9AF2 | D019 | 1631 | 003D | 7400 | E903 | 002D |
| 0000705720 | 7E83 | 00F2 | 0374 | 06E9 | B800 | 0000 | 18E9 | 8300 |
| 0000705740 | F27E | 7D64 | E903 | 0009 | 468B | 2DF2 | 012C | 06E9 |
| 0000705760 | 8B00 | F246 | 5805 | E902 | 0065 | 62E9 | 8300 | F27E |
| 0000706000 | 7400 | E903 | 0006 | 00B8 | E900 | 0018 | 7E83 | 64F2 |
| 0000706020 | 037D | 09E9 | 8B00 | F246 | 2C2D | E901 | 0006 | 468B |
| 0000706040 | 05F2 | 0258 | 003D | 7400 | E903 | 0009 | FCB8 | E901 |
| 0000706060 | 002D | 2AE9 | 8300 | F27E | 7400 | E903 | 0006 | 00B8 |
| 0000706100 | E900 | 0018 | 7E83 | 64F2 | 037D | 09E9 | 8B00 | F246 |
| 0000706120 | 2C2D | E901 | 0006 | 468B | 05F2 | 0258 | 00E9 | 5E00 |
| 0000706140 | 835F | 02ED | E58B | 5D1F | CB4D | 581E | 4590 | 8B55 |
| 0000706160 | 1EEC | D88E | EC81 | 0140 | 5657 | 46C7 | 30FC | C700 |
| 0000706200 | F846 | 5962 | 5E8C | C7FA | F446 | 5962 | 5E8C | C7F6 |
| 0000706220 | E646 | 0000 | 46C7 | 62EA | 8C59 | EC5E | 86C7 | FEC2 |
| 0000706240 | 5962 | 9E8C | FEC4 | E49A | B9CF | 891B | F246 | 003D |
| 0000706260 | 7500 | E903 | 002E | 199A | F3D0 | 3D1B | 0000 | 0374 |
| 0000706300 | 09E9 | 8B00 | F246 | 0BE9 | E906 | 0018 | 7E83 | 00F2 |
| 0000706320 | 0374 | 09E9 | B800 | 01FC | F9E9 | E905 | 0006 | 468B |
| 0000706340 | E9F2 | 05F0 | 76FF | FF0E | 0C76 | 868D | FEC6 | 5016 |
| 0000706360 | 509A | 0527 | 831C | 08C4 | 681E | 3952 | 868D | FEC6 |
| 0000706400 | 5016 | 0A9A | 1E27 | 831C | 08C4 | 468B | 8B06 | 0856 |
| 0000706420 | 8A05 | 5200 | 8D50 | C686 | 16FE | 9A50 | 270A | 1C4F |
| 0000706440 | C483 | C408 | 065E | 8B26 | 8287 | 8900 | E846 | 468B |
| 0000706460 | 051A | 5961 | 4689 | 8CEA | EC5E | 468B | 0520 | 5961 |
| 0000706500 | 8689 | FEC2 | 9E8C | FEC4 | 306A | 016A | 769A | 6833 |
| 0000706520 | 831C | 04C4 | 4689 | 89EE | F056 | 468B | 0BF0 | EE46 |
| 0000706540 | 0374 | 28E9 | 9A00 | D019 | 1D4A | 003D | 7400 | E903 |
| 0000706560 | 0009 | 07B8 | E900 | 055C | 12E9 | E900 | 0009 | FCB8 |
| 0000706600 | E901 | 0550 | 06E9 | B800 | 0007 | 47E9 | C405 | 065E |
| 0000706620 | 8B26 | 8287 | C400 | EE5E | 8926 | 8B07 | 1046 | 5EC4 |
| 0000706640 | 26EE | 4789 | C402 | EE5E | C726 | 0447 | 0002 | 468B |
| 0000706660 | C412 | EE5E | 8926 | 0E47 | 7E83 | 0012 | 0375 | 09E9 |
| 0000706700 | 8B00 | 1446 | 0405 | E900 | 0003 | 468B | C414 | EE5E |
| 0000706720 | 8926 | 0A47 | 468B | C41A | EE5E | 8926 | 1047 | 468B |
| 0000706740 | C420 | EE5E | 8926 | 2047 | 468A | C416 | EE5E | 8826 |
| 0000706760 | 1A47 | 468A | C41C | EE5E | 8826 | 2A47 | 5EC4 | 26EE |
| 0000707000 | 478A | 2A1A | E9E4 | 0075 | 5EC4 | 26EE | 47C7 | 0412 |
| 0000707020 | 8B00 | 1A46 | 0305 | 8900 | E646 | 5EC4 | 26EA | 07C7 |
| 0000707040 | 0064 | C726 | 0247 | 0100 | 65E9 | C400 | EE5E | C726 |
| 0000707060 | 1247 | 0020 | 468B | 051A | 001F | 4689 | 1EE6 | DA68 |
| 0000707100 | FF38 | EC76 | 76FF | 9AEA | 2750 | 1D55 | C483 | E908 |
| 0000707120 | 003E | 199A | CAD0 | 3D1D | 0000 | 0374 | 09E9 | B800 |
| 0000707140 | 01FD | 6FE9 | E904 | 0012 | 09E9 | B800 | 01FC | 63E9 |
| 0000707160 | E904 | 0006 | FDB8 | E901 | 045A | 13E9 | 2D00 | 000B |
| 0000707200 | 0375 | A6E9 | 2DFF | 0003 | 0375 | 7BE9 | E9FF | FFC2 |
| 0000707220 | 5EC4 | 26EE | 478A | 2A2A | E9E4 | 0097 | 5EC4 | 26EE |
| 0000707240 | 47C7 | 0422 | 8B00 | 2046 | 0405 | 2B00 | E646 | C91B |
| 0000707260 | D1F7 | C123 | 4603 | 89E6 | E646 | 046A | FF68 | FF00 |
| 0000707300 | C4B6 | FFFE | C2B6 | 9AFE | 3E8E | 1985 | C483 | E908 |

THU MAR 14 17:31:54 1991 DB_PI.DLL PAGE 248, LINE 14574

| | | | | | | | | |
|---|---|---|---|---|---|---|---|---|
| 0000707320 | 0074 | 5EC4 | 26EE | 47C7 | 2022 | 8B00 | 2046 | 2005 |
| 0000707340 | 2B00 | E646 | C91B | D1F7 | C123 | 4603 | 89E6 | E646 |
| 0000707360 | 206A | FF68 | FF00 | C4B6 | FFFE | C2B6 | 9AFE | 3E8E |
| 0000707400 | 1E0B | C483 | E908 | 003E | 199A | 7ED0 | 3D1E | 0000 |
| 0000707420 | 0374 | 09E9 | B800 | 01FD | B9E9 | E903 | 0012 | 09E9 |
| 0000707440 | B800 | 01FC | ADE9 | E903 | 0006 | FDB8 | E901 | 03A4 |
| 0000707460 | 13E9 | 2D00 | 000B | 0375 | 97E9 | 2DFF | 0003 | 0375 |
| 0000707500 | 59E9 | E9FF | FFC2 | 468B | 0518 | 0100 | 5EC4 | 26EE |
| 0000707520 | 4789 | 8B14 | [illegible] | 0805 | C4D1 | EE5E | 8926 | 2447 |
| 0000707540 | 5EC4 | 26EE | 47C6 | FF2B | 5EC4 | 8B06 | E646 | 0C05 |
| 0000707560 | 2600 | 8739 | 0082 | 0372 | 28E9 | 9A00 | D019 | 1ECD |
| 0000707600 | 003D | 7400 | E903 | 0009 | FAB8 | E901 | 0346 | 12E9 |
| 0000707620 | E900 | 0009 | FCB8 | E901 | 033A | 06E9 | B800 | 01FA |
| 0000707640 | 31E9 | 8B03 | E646 | 6205 | 8959 | F846 | 5E8C | 6AFA |
| 0000707660 | 8D00 | C686 | 16FE | 8D50 | FC46 | 5016 | 76FF | FFF0 |
| 0000707700 | EE76 | 76FF | FF08 | 0676 | 0E6A | 909A | DECF | 831E |
| 0000707720 | 14C4 | 4689 | 8BF2 | F246 | B7E9 | 9A00 | D019 | 1F09 |
| 0000707740 | 003D | 7400 | E903 | 0009 | F6B8 | E901 | 02E6 | 12E9 |
| 0000707760 | E900 | 0009 | FCB8 | E901 | 02DA | 06E9 | B800 | 01F6 |
| 0000710000 | D1E9 | E902 | 009F | 199A | 64D0 | 3D1F | 0000 | 0374 |
| 0000710020 | 09E9 | B800 | 01B8 | BBE9 | E902 | 0012 | 09E9 | B800 |
| 0000710040 | 01FC | AFE9 | E902 | 0006 | B8B8 | E901 | 02A6 | 74E9 |
| 0000710060 | 8300 | F27E | 7400 | E903 | 0008 | 46C7 | 00F2 | E900 |
| 0000710100 | 0016 | 7E83 | 64F2 | 037D | 08E9 | 8100 | F26E | 012C |
| 0000710120 | 05E9 | 8100 | F246 | 0258 | 7E83 | 00F2 | 0375 | 2EE9 |
| 0000710140 | 9A00 | D019 | 1FB2 | 003D | 7400 | E903 | 0009 | 468B |
| 0000710160 | E9F2 | 0260 | 18E9 | 8300 | F27E | 7400 | E903 | 0009 |
| 0000710200 | FCB8 | E901 | 024E | 06E9 | 8B00 | F246 | 45E9 | E902 |
| 0000710220 | 0013 | 182D | 7500 | E903 | FF41 | 232D | 7500 | E903 |
| 0000710240 | FF64 | 8CE9 | 6AFF | 6A04 | FF02 | FA76 | 76FF | 9AF8 |
| 0000710260 | 3E8E | 1FFA | C483 | C408 | F85E | C726 | 0447 | 0064 |
| 0000710300 | 5EC4 | 26F8 | 47C7 | 6406 | 8B00 | 0A46 | 5EC4 | 26F8 |
| 0000710320 | 4789 | C408 | 065E | 8B26 | 8287 | 8900 | E846 | FF6A |
| 0000710340 | 868D | FEC6 | 5016 | 468D | 16E8 | 6A50 | 6A00 | FF00 |
| 0000710360 | 0876 | 76FF | 6A06 | 9A00 | CF90 | 200E | C483 | 8914 |
| 0000710400 | F246 | 7E83 | 00F2 | 0375 | 6FE9 | 9A00 | D019 | 2096 |
| 0000710420 | 003D | 7400 | E903 | 001E | 7E83 | 64F2 | 037D | 09E9 |
| 0000710440 | 8B00 | F246 | 2C2D | E901 | 0006 | 468B | 05F2 | 0258 |
| 0000710460 | A1E9 | E901 | 0044 | 7E83 | 64F2 | 037D | 09E9 | 8B00 |
| 0000710500 | F246 | 2C2D | E901 | 0006 | 468B | 05F2 | 0258 | 003D |
| 0000710520 | 7400 | E903 | 0009 | FCB8 | E901 | 0178 | 1BE9 | 8300 |
| 0000710540 | F27E | 7D64 | E903 | 0009 | 468B | 2DF2 | 012C | 06E9 |
| 0000710560 | 8B00 | F246 | 5805 | E902 | 015A | 006A | 76FF | FFEC |
| 0000710600 | EA76 | 468D | 16E8 | 1E50 | 6268 | FF59 | 0876 | 76FF |
| 0000710620 | 6A06 | 9A02 | CF90 | 20AA | C483 | 8914 | F246 | 7E83 |
| 0000710640 | 00F2 | 0375 | 6FE9 | 9A00 | D019 | 2130 | 003D | 7400 |
| 0000710660 | E903 | 001E | 7E83 | 64F2 | 037D | 09E9 | 8B00 | F246 |
| 0000710700 | 2C2D | E901 | 0006 | 468B | 05F2 | 0258 | 05E9 | E901 |
| 0000710720 | 0044 | 7E83 | 64F2 | 037D | 09E9 | 8B00 | F246 | 2C2D |
| 0000710740 | E901 | 0006 | 468B | 05F2 | 0258 | 003D | 7400 | E903 |
| 0000710760 | 0009 | FCB8 | E901 | 00DC | 1BE9 | 8300 | F27E | 7D64 |
| 0000711000 | E903 | 0009 | 468B | 2DF2 | 012C | 06E9 | 8B00 | F246 |
| 0000711020 | 5805 | E902 | 00BE | 006A | 006A | 006A | 468D | 16E8 |
| 0000711040 | 6A50 | 6A00 | FF00 | 0876 | 76FF | 6A06 | 9A01 | CF90 |
| 0000711060 | 213B | C483 | 8914 | F246 | 199A | A9D0 | 3D1B | 0000 |
| 0000711100 | 0374 | 2DE9 | 8300 | F27E | 7400 | E903 | 0006 | 00B8 |
| 0000711120 | E900 | 0018 | 7E83 | 64F2 | 037D | 09E9 | 8B00 | F246 |
| 0000711140 | 2C2D | E901 | 0006 | 468B | 05F2 | 0258 | 65E9 | E900 |
| 0000711160 | 0062 | 7E83 | 00F2 | 0374 | 06E9 | B800 | 0000 | 18E9 |

THU MAR 14 17:31:54 1991 DB_PI.DLL PAGE 249, LINE 14633

| | | | | | | | | |
|---|---|---|---|---|---|---|---|---|
| 0000711200 | 8300 | F27E | 7D64 | E903 | 0009 | 468B | 2DF2 | 012C |
| 0000711220 | 06E9 | 8B00 | F246 | 5805 | 3D02 | 0000 | 0374 | 09E9 |
| 0000711240 | B800 | 01FC | 2DE9 | E900 | 002A | 7E83 | 00F2 | 0374 |
| 0000711260 | 06E9 | B800 | 0000 | 18E9 | 8300 | F27E | 7D64 | E903 |
| 0000711300 | 0009 | 468B | 2DF2 | 012C | 06E9 | 8B00 | F246 | 5805 |
| 0000711320 | E902 | 0000 | 5F5E | ED83 | 8B02 | 1FE5 | 4D5D | 1ECB |
| 0000711340 | 9058 | 5545 | EC8B | 8E1E | 81D8 | 2CEC | 5701 | C756 |
| 0000711360 | D646 | 0000 | 46C7 | 0CD8 | C700 | DC46 | 0001 | E49A |
| 0000711400 | 23CF | 8922 | DA46 | 003D | 7500 | E903 | 0006 | 468B |
| 0000711420 | E9DA | 037D | 76FF | FF0C | 0A76 | 868D | FED6 | 5016 |
| 0000711440 | 509A | 3527 | 8322 | 08C4 | 681E | 3954 | 868D | FED6 |
| 0000711460 | 5016 | 0A9A | 4E27 | 8322 | 08C4 | 468B | 8B06 | 0856 |
| 0000711500 | 8A05 | 5200 | 8D50 | D686 | 16FE | 9A50 | 270A | 227A |
| 0000711520 | C483 | C408 | 065E | 8B26 | 8287 | 8900 | D646 | 016A |
| 0000711540 | 868D | FED6 | 5016 | 468D | 16D6 | 6A50 | 6A00 | FF00 |
| 0000711560 | 0876 | 76FF | 6A06 | 9A00 | CF90 | 2294 | C483 | 8914 |
| 0000711600 | DA46 | 7E83 | 00DA | 0375 | ABE9 | 8B00 | DA46 | 9AE9 |
| 0000711620 | 9A00 | D019 | 22BC | 003D | 7400 | E903 | 0009 | 9DB8 |
| 0000711640 | E901 | 02ED | 12E9 | E900 | 0009 | FCB8 | E901 | 02E1 |
| 0000711660 | 06E9 | B800 | 019D | D8E9 | 9A02 | D019 | 235B | 003D |
| 0000711700 | 7400 | E903 | 001E | 7E83 | 64DA | 037D | 09E9 | 8B00 |
| 0000711720 | DA46 | 2C2D | E901 | 0006 | 468B | 05DA | 0258 | B0E9 |
| 0000711740 | E902 | 0044 | 7E83 | 64DA | 037D | 09E9 | 8B00 | DA46 |
| 0000711760 | 2C2D | E901 | 0006 | 468B | 05DA | 0258 | 003D | 7400 |
| 0000712000 | E903 | 0009 | FCB8 | E901 | 0287 | 1BE9 | 8300 | DA7E |
| 0000712020 | 7D64 | E903 | 0009 | 468B | 2DDA | 012C | 06E9 | 8B00 |
| 0000712040 | DA46 | 5805 | E902 | 0269 | 0BE9 | 2D00 | 000C | 0375 |
| 0000712060 | 5EE9 | E9FF | FF83 | 7E83 | 00DC | 0375 | CCE9 | 6A00 |
| 0000712100 | 8D00 | DE46 | 5016 | 468D | 16D6 | 1E50 | 6268 | FF59 |
| 0000712120 | 0876 | 76FF | FF06 | D876 | 909A | 00CF | 831E | 14C4 |
| 0000712140 | 4689 | 83DA | DA7E | 7416 | E903 | 0005 | 46C7 | 00DA |
| 0000712160 | 8300 | DA7E | 7500 | E903 | 0003 | 8EE9 | 8300 | 0E7E |
| 0000712200 | 7400 | E903 | 0056 | 5EC4 | 2606 | BF83 | 0084 | 7500 |
| 0000712220 | E903 | 0017 | 468A | 2AE1 | 48E4 | 0374 | 06E9 | B800 |
| 0000712240 | 0001 | 03E9 | B800 | 0000 | 12E9 | 8000 | DE7E | 7401 |
| 0000712260 | E903 | 0006 | 01B8 | E900 | 0003 | 00B8 | 3D00 | 0000 |
| 0000712300 | 0375 | 17E9 | 8300 | D87E | 740C | E903 | 000B | 46C7 |
| 0000712320 | 06D8 | E900 | FF60 | 03E9 | E900 | 002F | 7E83 | 00DA |
| 0000712340 | 0374 | 23E9 | 6A00 | 8D00 | DE46 | 5016 | 468D | 16D6 |
| 0000712360 | 1E50 | 6268 | FF59 | 0876 | 76FF | 6A06 | 9A04 | CF90 |
| 0000712400 | 2428 | C483 | 8914 | DA46 | 2BE9 | 83FF | DA7E | 7509 |
| 0000712420 | E903 | 0009 | 7E83 | 00DA | 0374 | 08E9 | C700 | DA46 |
| 0000712440 | 0000 | 6FE9 | 9A00 | D019 | 24AE | 003D | 7400 | E903 |
| 0000712460 | 001E | 7E83 | 64DA | 037D | 09E9 | 8B00 | DA46 | 2C2D |
| 0000712500 | E901 | 0006 | 468B | 05DA | 0258 | 44E9 | E901 | 0044 |
| 0000712520 | 7E83 | 64DA | 037D | 09E9 | 8B00 | DA46 | 2C2D | E901 |
| 0000712540 | 0006 | 468B | 05DA | 0258 | 003D | 7400 | E903 | 0009 |
| 0000712560 | FCB8 | E901 | 011B | 1BE9 | 8300 | DA7E | 7D64 | E903 |
| 0000712600 | 0009 | 468B | 2DDA | 012C | 06E9 | 8B00 | DA46 | 5805 |
| 0000712620 | E902 | 00FD | 006A | 006A | 006A | 468D | 16D6 | 6A50 |
| 0000712640 | 6A00 | FF00 | 0876 | 76FF | 6A06 | 9A01 | CF90 | 24CB |
| 0000712660 | C483 | 8914 | DA46 | 7E83 | 00DA | 0375 | A3E9 | 8300 |
| 0000712700 | DA7E | 7403 | E903 | 002B | 199A | F6D0 | 3D24 | 0000 |
| 0000712720 | 0374 | 09E9 | B800 | 019F | B6E9 | E900 | 0012 | 09E9 |
| 0000712740 | B800 | 01FC | AAE9 | E900 | 0006 | 9FB8 | E901 | 00A1 |
| 0000712760 | 6FE9 | 9A00 | D019 | 256F | 003D | 7400 | E903 | 001E |
| 0000713000 | 7E83 | 64DA | 037D | 09E9 | 8B00 | DA46 | 2C2D | E901 |
| 0000713020 | 0006 | 468B | 05DA | 0258 | 76E9 | E900 | 0044 | 7E83 |
| 0000713040 | 64DA | 037D | 09E9 | 8B00 | DA46 | 2C2D | E901 | 0006 |

THU MAR 14 17:31:54 1991 DB_PI.DLL PAGE 250, LINE 14692

| | | | | | | | | |
|---|---|---|---|---|---|---|---|---|
| 0000713060 | 468B | 05DA | 0258 | 003D | 7400 | E903 | 0009 | FCB8 |
| 0000713100 | E901 | 004D | 1BE9 | 8300 | DA7E | 7D64 | E903 | 0009 |
| 0000713120 | 468B | 2DDA | 012C | 06E9 | 8B00 | DA46 | 5805 | E902 |
| 0000713140 | 002F | 5EC4 | 2606 | 87C7 | 0080 | 0000 | 199A | 01D0 |
| 0000713160 | 3D22 | 0000 | 0374 | 09E9 | B800 | 0000 | 12E9 | E900 |
| 0000713200 | 000F | FCB8 | E901 | 0009 | 06E9 | B800 | 0000 | 00E9 |
| 0000713220 | 5E00 | 835F | 02ED | E58B | 5D1F | CB4D | 581E | 4590 |
| 0000713240 | 8B55 | 1EEC | D88E | EC81 | 0106 | 5657 | 46C7 | 00FA |
| 0000713260 | 9A00 | CFE4 | 25D6 | 4689 | 3DFC | 0000 | 0375 | 06E9 |
| 0000713300 | 8B00 | FC46 | 66E9 | FF02 | 0C76 | 76FF | 8D0A | FA86 |
| 0000713320 | 16FE | 9A50 | 2750 | 25E8 | C483 | 1E08 | 5668 | 8D39 |
| 0000713340 | FA86 | 16FE | 9A50 | 270A | 2601 | C483 | 8B08 | 0646 |
| 0000713360 | 568B | 0508 | 008A | 5052 | 868D | FEFA | 5016 | 0A9A |
| 0000713400 | 2027 | 8326 | 08C4 | 006A | 006A | 006A | 468D | 16FA |
| 0000713420 | 6A50 | 6A00 | FF00 | 0876 | 76FF | 6A06 | 9A01 | CF90 |
| 0000713440 | 263B | C483 | 8914 | FC46 | 5EC4 | 2606 | 87C7 | 0080 |
| 0000713460 | 0000 | 868D | FEFA | 5016 | 1C9A | 6342 | 8326 | 04C4 |
| 0000713500 | 003D | 7500 | E903 | 0040 | 0F6A | 868D | FEFA | 5016 |
| 0000713520 | CF9A | C829 | 8313 | 06C4 | 003D | 7500 | E903 | 0028 |
| 0000713540 | 199A | 97D0 | 3D26 | 0000 | 0374 | 09E9 | B800 | 000A |
| 0000713560 | BAE9 | E901 | 0012 | 09E9 | B800 | 01FC | AEE9 | E901 |
| 0000713600 | 0006 | 0AB8 | E900 | 01A5 | 681E | 3958 | 2E6A | 868D |
| 0000713620 | FEFA | 5016 | 3E9A | A13C | 8326 | 06C4 | 5052 | 509A |
| 0000713640 | AF27 | 8326 | 08C4 | 868D | FEFA | 5016 | 1C9A | BF42 |
| 0000713660 | 8326 | 04C4 | 003D | 7500 | E903 | 0017 | F69A | E204 |
| 0000713700 | 8E26 | 8BC2 | 26D8 | 3F83 | 7502 | E903 | 0005 | 46C7 |
| 0000713720 | 0AFC | 1E00 | 5D68 | 6A39 | 8D2E | FA86 | 16FE | 9A50 |
| 0000713740 | 3C3E | 26EC | C483 | 5206 | 9A50 | 2750 | 26FA | C483 |
| 0000713760 | 8D08 | FA86 | 16FE | 9A50 | 421C | 270A | C483 | 3D04 |
| 0000714000 | 0000 | 0375 | 17E9 | 9A00 | 04F6 | 272D | C28E | D88B |
| 0000714020 | 8326 | 023F | 0375 | 05E9 | C700 | FC46 | 000A | 681E |
| 0000714040 | 3962 | 2E6A | 868D | FEFA | 5016 | 3E9A | 373C | 8327 |
| 0000714060 | 06C4 | 5052 | 509A | 4527 | 8327 | 08C4 | 868D | FEFA |
| 0000714100 | 5016 | 1C9A | 5542 | 8327 | 04C4 | 003D | 7500 | E903 |
| 0000714120 | 0017 | F69A | 7804 | 8E27 | 8BC2 | 26D8 | 3F83 | 7502 |
| 0000714140 | E903 | 0005 | 46C7 | 0AFC | 1E00 | 6768 | 6A39 | 8D2E |
| 0000714160 | FA86 | 16FE | 9A50 | 3C3E | 2782 | C483 | 5206 | 9A50 |
| 0000714200 | 2750 | 2790 | C483 | 8D08 | FA86 | 16FE | 9A50 | 421C |
| 0000714220 | 27A0 | C483 | 3D04 | 0000 | 0375 | 17E9 | 9A00 | 04F6 |
| 0000714240 | 27C3 | C28E | D88B | 8326 | 023F | 0375 | 05E9 | C700 |
| 0000714260 | FC46 | 000A | 681E | 396C | 2E6A | 868D | FEFA | 5016 |
| 0000714300 | 3E9A | CD3C | 8327 | 06C4 | 5052 | 509A | DB27 | 8327 |
| 0000714320 | 08C4 | 868D | FEFA | 5016 | 1C9A | EB42 | 8327 | 04C4 |
| 0000714340 | 003D | 7500 | E903 | 0017 | F69A | D204 | 8E28 | 8BC2 |
| 0000714360 | 26D8 | 3F83 | 7502 | E903 | 0005 | 46C7 | 0AFC | 9A00 |
| 0000714400 | D019 | 2400 | 003D | 7400 | E903 | 0009 | 468B | E9FC |
| 0000714420 | 001B | 18E9 | 8300 | FC7E | 7400 | E903 | 0009 | FCB8 |
| 0000714440 | E901 | 0009 | 06E9 | 8B00 | FC46 | 00E9 | 5E00 | 835F |
| 0000714460 | 02ED | E58B | 5D1F | CB4D | 581E | 4590 | 8B55 | 1EEC |
| 0000714500 | D88E | EC81 | 0006 | 5657 | 46C7 | 00FA | FF00 | 0C76 |
| 0000714520 | 76FF | FF0A | 0876 | 76FF | 9A06 | 259C | 287E | C483 |
| 0000714540 | 8908 | FA46 | 7E83 | 00FA | 0375 | 19E9 | 6A00 | FF00 |
| 0000714560 | 0C76 | 76FF | FF0A | 0876 | 76FF | 9A06 | 21DF | 2653 |
| 0000714600 | C483 | 890A | FC46 | 7E83 | 00FA | 0375 | 20E9 | 8100 |
| 0000714620 | FC7E | 019D | 0374 | 08E9 | C700 | FA46 | 0000 | 0EE9 |
| 0000714640 | 8B00 | FA46 | 4639 | 74FC | E903 | 0003 | 00E9 | 8B00 |
| 0000714660 | FA46 | 00E9 | 5E00 | 835F | 02ED | E58B | 5D1F | CB4D |
| 0000714700 | 581E | 4590 | 8B55 | 1EEC | D88E | EC81 | 000E | 5657 |
| 0000714720 | 5C6A | 76FF | FF0C | 0A76 | 3E9A | B43C | 8325 | 06C4 |

THU MAR 14 17:31:54 1991 DB_PI.DLL PAGE 251, LINE 14751

| | | | | | | | | |
|---|---|---|---|---|---|---|---|---|
| 0000714740 | 4689 | 89F6 | F856 | 468B | 0BF8 | F646 | 0374 | 0DE9 |
| 0000714760 | C400 | 065E | C626 | 0007 | 00B8 | E900 | 0053 | 468B |
| 0000715000 | 8B0A | 0C56 | 4689 | 89FA | FC56 | 468B | 8B06 | 0856 |
| 0000715020 | 4689 | 89F2 | F456 | 06E9 | FF00 | F246 | 46FF | 8BFA |
| 0000715040 | F646 | 568B | 39F8 | FA46 | 0374 | 08E9 | 3900 | FC56 |
| 0000715060 | 0375 | 0FE9 | C400 | FA5E | 8A26 | C407 | F25E | 8826 |
| 0000715100 | E907 | FFD5 | 5EC4 | 26F2 | 07C6 | B800 | 0000 | 00E9 |
| 0000715120 | 5E00 | 835F | 02ED | E58B | 5D1F | CB4D | 581E | 4590 |
| 0000715140 | 8B55 | 1EEC | D88E | EC81 | 0006 | 5657 | 5C6A | 76FF |
| 0000715160 | FF0C | 0A76 | 3E9A | 9C3C | 8329 | 06C4 | 4689 | 89FA |
| 0000715200 | FC56 | 468B | 0BFC | FA46 | 0374 | 1AE9 | FF00 | 0C76 |
| 0000715220 | 76FF | FF0A | 0876 | 76FF | 9A06 | 2750 | 29B9 | C483 |
| 0000715240 | B808 | 0000 | 1DE9 | FF00 | FA46 | 76FF | FFFC | FA76 |
| 0000715260 | 76FF | FF08 | 0676 | 509A | DB27 | 8328 | 08C4 | 00B8 |
| 0000715300 | E900 | 0000 | 5F5E | ED83 | 8B02 | 1FE5 | 4D5D | 1ECB |
| 0000715320 | 9058 | 5545 | EC8B | 8E1E | 81D8 | 08EC | 5700 | C756 |
| 0000715340 | FC46 | 0000 | 468A | 250A | 0002 | 013D | 1B00 | 40C0 |
| 0000715360 | 4E8A | 830A | 04E1 | F983 | F501 | C91B | E183 | 0302 |
| 0000715400 | 8AC1 | 0A4E | E183 | 8308 | 01F9 | 1BF5 | 83C9 | 04E1 |
| 0000715420 | C103 | 4E8A | 830A | 20E1 | F983 | F501 | C91B | E183 |
| 0000715440 | 0320 | 8AC1 | 0A4E | E183 | 8301 | 01F9 | C91B | E183 |
| 0000715460 | 0300 | 8AC1 | 0A4E | E183 | 8310 | 01F9 | 1BF5 | 83C9 |
| 0000715500 | 10E1 | C103 | 4689 | FFFC | 0876 | 76FF | 8D06 | FA46 |
| 0000715520 | 5016 | 006A | 006A | EB9A | 000A | 8900 | F846 | 003D |
| 0000715540 | 7500 | E903 | 0006 | 00B8 | E900 | 0028 | 7E83 | 01FA |
| 0000715560 | C01B | D8F7 | 4685 | 75FC | E903 | 000F | 46F6 | 010A |
| 0000715600 | 0375 | 06E9 | B800 | 0001 | 09E9 | 8B00 | FA46 | 4623 |
| 0000715620 | E9FC | 0000 | 5F5E | ED83 | 8B02 | 1FE5 | 4D5D | 1ECB |
| 0000715640 | 9058 | 5545 | EC8B | 8E1E | 81D8 | 00EC | 5700 | 6A56 |
| 0000715660 | FF10 | 0876 | 76FF | 9A06 | 29CF | 285C | C483 | 3D06 |
| 0000715700 | 0000 | 0374 | 06E9 | B800 | 0000 | 06E9 | B800 | 0001 |
| 0000715720 | 00E9 | 5E00 | 835F | 02ED | E58B | 5D1F | CB4D | 581E |
| 0000715740 | 4590 | 8B55 | 1EEC | D88E | EC81 | 0104 | 5657 | 7E83 |
| 0000715760 | 010A | 0374 | 65E9 | FF00 | 0876 | 76FF | 8D06 | FC86 |
| 0000716000 | 16FE | 9A50 | 28C0 | 2B2C | C483 | 8D08 | FC86 | 16FE |
| 0000716020 | 9A50 | 27B0 | 2B65 | C483 | 3D04 | 0000 | 0377 | 3BE9 |
| 0000716040 | 6A00 | 8D10 | FC86 | 16FE | 9A50 | 29CF | 2B45 | C483 |
| 0000716060 | 3D06 | 0000 | 0374 | 23E9 | FF00 | 0A76 | 868D | FEFC |
| 0000716100 | 5016 | DE9A | AF2A | 832B | 06C4 | 4689 | 83FC | FC7E |
| 0000716120 | 7500 | E903 | 0006 | 468B | E9FC | 0096 | 76FF | FF08 |
| 0000716140 | 0676 | B09A | 8827 | 832B | 04C4 | F08B | 5EC4 | 2606 |
| 0000716160 | 7880 | 3AFF | 0374 | 06E9 | B800 | 0000 | 73E9 | FF00 |
| 0000716200 | 0876 | 76FF | 9A06 | 694E | 2B98 | C483 | 3D04 | 0000 |
| 0000716220 | 0375 | 57E9 | 9A00 | 04F6 | 2977 | C28E | D88B | 8B26 |
| 0000716240 | E907 | 0036 | 3F6A | 76FF | FF08 | 0676 | CF9A | BA29 |
| 0000716260 | 832A | 06C4 | 003D | 7500 | E903 | 0009 | BAB8 | E901 |
| 0000716300 | 0030 | 06E9 | B800 | 01A4 | 27E9 | B800 | 01B7 | 21E9 |
| 0000716320 | B800 | 000D | 1BE9 | E900 | 0012 | 4848 | 0375 | EAE9 |
| 0000716340 | 2DFF | 000B | 0375 | BBE9 | E9FF | FFE5 | 00B8 | E900 |
| 0000716360 | 0000 | 5F5E | ED83 | 8B02 | 1FE5 | 4D5D | 1ECB | 9058 |
| 0000716400 | 5545 | EC8B | 8E1E | 81D8 | 2EEC | 5701 | C756 | F846 |
| 0000716420 | FFFF | 46C7 | 01F6 | C700 | FC46 | 0000 | 46C7 | FFF8 |
| 0000716440 | FFFF | 0876 | 76FF | 8D06 | F846 | 5016 | 106A | 468D |
| 0000716460 | 16D2 | 6A50 | 8D24 | F646 | 5016 | 006A | 006A | 0E9A |
| 0000716500 | 002D | 8900 | FA46 | 7E83 | 00FA | 0375 | 3BE9 | 8B00 |
| 0000716520 | FA46 | 15E9 | B800 | 01B7 | 43E9 | B802 | 01A5 | 3DE9 |
| 0000716540 | B802 | 000A | 37E9 | E902 | 0020 | 4848 | 037D | F0E9 |
| 0000716560 | 48FF | 037F | DEE9 | 2DFF | 000F | 0375 | D6E9 | 2DFF |
| 0000716600 | 005A | 0375 | D4E9 | E9FF | FFD7 | 76FF | 9AF8 | 2D6B |

THU MAR 14 17:31:54 1991 DB_PI.DLL PAGE 252, LINE 14810

| | | | | | | | | |
|---|---|---|---|---|---|---|---|---|
| 0000716620 | 0000 | 4689 | 83FA | F67E | 7500 | E903 | 000F | 7E83 |
| 0000716640 | 01E6 | C01B | D8F7 | 10A8 | 0375 | 06E9 | B800 | 01B7 |
| 0000716660 | EBE9 | FF01 | 0876 | 76FF | 8D06 | D286 | 16FE | 9A50 |
| 0000716700 | 2750 | 2CD4 | C483 | 1E08 | 7268 | 8D39 | D286 | 16FE |
| 0000716720 | 9A50 | 270A | 2CE6 | C483 | 1E08 | 7468 | 8D39 | D286 |
| 0000716740 | 16FE | 9A50 | 270A | 2D1E | C483 | C708 | F846 | FFFF |
| 0000716760 | 868D | FED2 | 5016 | 468D | 16F8 | 6A50 | 8D30 | D246 |
| 0000717000 | 5016 | 246A | 468D | 16F6 | 6A50 | 6A00 | 9A00 | FFFF |
| 0000717020 | 0000 | 681E | 3978 | 468D | 16E9 | 9A50 | 2786 | 2D37 |
| 0000717040 | C483 | 3D08 | 0000 | 0375 | 19E9 | 1E00 | 7A68 | 8D39 |
| 0000717060 | E946 | 5016 | 869A | 8A27 | 832D | 08C4 | 003D | 7400 |
| 0000717100 | E903 | 0023 | 7E83 | 00FC | 0374 | 1AE9 | FF00 | F876 |
| 0000717120 | 468D | 16D2 | 6A50 | 8D24 | F646 | 5016 | FF9A | 00FF |
| 0000717140 | 8900 | FC46 | ABE9 | FFFF | F876 | FF9A | 00FF | 8300 |
| 0000717160 | FC7E | 7500 | E903 | 0003 | B1E9 | FF00 | 0876 | 76FF |
| 0000717200 | 8D06 | D286 | 16FE | 9A50 | 2750 | 2D9C | C483 | 1E08 |
| 0000717220 | 7D68 | 8D39 | D286 | 16FE | 9A50 | 270A | 2DAF | C483 |
| 0000717240 | 8D08 | E946 | 5016 | 868D | FED2 | 5016 | 0A9A | E927 |
| 0000717260 | 832D | 08C4 | 46F6 | 10E6 | 0375 | 23E9 | 8D00 | D286 |
| 0000717300 | 16FE | 9A50 | 2BFD | 2B06 | C483 | 8904 | FA46 | 7E83 |
| 0000717320 | 00FA | 0375 | 06E9 | 8B00 | FA46 | C1E9 | E900 | 004C |
| 0000717340 | 868D | FED2 | 5016 | 1C9A | F942 | 832D | 04C4 | 003D |
| 0000717360 | 7500 | E903 | 0036 | F69A | 4704 | 8E2E | 8BC2 | 26D8 |
| 0000717400 | 078B | 15E9 | B800 | 01A4 | 93E9 | B800 | 01B7 | 8DE9 |
| 0000717420 | B800 | 000A | 87E9 | E900 | 0012 | 4848 | 0375 | EAE9 |
| 0000717440 | 2DFF | 000B | 0375 | DCE9 | E9FF | FFE5 | 7E83 | 00F6 |
| 0000717460 | 0377 | 09E9 | 8300 | FC7E | 7500 | E903 | FE75 | 76FF |
| 0000717500 | FF08 | 0676 | 6C9A | 5769 | 832E | 04C4 | 003D | 7500 |
| 0000717520 | E903 | 0044 | F69A | 1404 | 8E2B | 8BC2 | 26D8 | 078B |
| 0000717540 | 1BE9 | B800 | 01A4 | 35E9 | B800 | 01B7 | 2FE9 | B800 |
| 0000717560 | 01F4 | 29E9 | B800 | 000A | 23E9 | E900 | 001A | 4848 |
| 0000717600 | 0375 | E4E9 | 2DFF | 0006 | 0375 | E2E9 | 2DFF | 0005 |
| 0000717620 | 0375 | CEE9 | E9FF | FFDD | 00B8 | E900 | 0000 | 5F5E |
| 0000717640 | ED83 | 8B02 | 1FE5 | 4D5D | 1ECB | 9058 | 5545 | EC8B |
| 0000717660 | 8E1E | 81D8 | 2EEC | 5701 | C756 | FA46 | FFFF | 46C7 |
| 0000717700 | 01F6 | C700 | FC46 | 0000 | 46C7 | 20F8 | FF00 | 0876 |
| 0000717720 | 76FF | 8D06 | D286 | 16FE | 9A50 | 2750 | 2EEE | C483 |
| 0000717740 | 1E08 | 7F68 | 8D39 | D286 | 16FE | 9A50 | 270A | 2F02 |
| 0000717760 | C483 | FF08 | 0C76 | 76FF | 8D0A | D286 | 16FE | 9A50 |
| 0000720000 | 270A | 2F36 | C483 | 8D08 | D286 | 16FE | 8D50 | FA46 |
| 0000720020 | 5016 | 76FF | 8DF8 | D246 | 5016 | 246A | 468D | 16F6 |
| 0000720040 | 6A50 | 6A00 | 9A00 | 2C3F | 0000 | 681E | 3981 | 468D |
| 0000720060 | 16E9 | 9A50 | 2786 | 2F4F | C483 | 3D08 | 0000 | 0375 |
| 0000720100 | 19E9 | 1E00 | 8368 | 8D39 | E946 | 5016 | 869A | C227 |
| 0000720120 | 832C | 08C4 | 003D | 7400 | E903 | 0023 | 7E83 | 00FC |
| 0000720140 | 0374 | 1AE9 | FF00 | FA76 | 468D | 16D2 | 6A50 | 8D24 |
| 0000720160 | F646 | 5016 | 5D9A | 002D | 8900 | FC46 | ABE9 | 83FF |
| 0000720200 | FC7E | 7500 | E903 | 0003 | 8DE9 | FF00 | 0876 | 76FF |
| 0000720220 | 8D06 | D286 | 16FE | 9A50 | 2750 | 2FAC | C483 | 1E08 |
| 0000720240 | 8668 | 8D39 | D286 | 16FE | 9A50 | 270A | 2FBF | C483 |
| 0000720260 | 8D08 | E946 | 5016 | 868D | FED2 | 5016 | 0A9A | CD27 |
| 0000720300 | 832F | 08C4 | 868D | FED2 | 5016 | 1C9A | E542 | 832F |
| 0000720320 | 04C4 | 003D | 7500 | E903 | 003E | 76FF | 9AFA | 302E |
| 0000720340 | 000D | F69A | DC04 | 8E2E | 8BC2 | 26D8 | 078B | 15E9 |
| 0000720360 | B800 | 01A4 | 41E9 | B800 | 01B7 | 3BE9 | B800 | 000A |
| 0000720400 | 35E9 | E900 | 0012 | 4848 | 0375 | EAE9 | 2DFF | 000B |
| 0000720420 | 0375 | DCE9 | E9FF | FFE5 | 7E83 | 00F6 | 0377 | 09E9 |
| 0000720440 | 8300 | FC7E | 7500 | E903 | FEA3 | 76FF | 9AFA | 2C8E |
| 0000720460 | 0000 | 00B8 | E900 | 0000 | 5F5E | ED83 | 8B02 | 1FE5 |

THU MAR 14 17:31:54 1991 DB_PI.DLL PAGE 253, LINE 14869

| | | | | | | | | |
|---|---|---|---|---|---|---|---|---|
| 0000720500 | 4D5D | 1ECB | 9058 | 5545 | EC8B | 8E1E | 81D8 | 04EC |
| 0000720520 | 5700 | 8356 | 0A7E | 7401 | E903 | 0023 | 76FF | FF08 |
| 0000720540 | 0676 | FD9A | C62B | 832D | 04C4 | 4689 | 83FC | FC7E |
| 0000720560 | 7500 | E903 | 0006 | 468B | E9FC | 0063 | 5AE9 | FF00 |
| 0000720600 | 0876 | 76FF | 9A06 | 696C | 3098 | C483 | 3D04 | 0000 |
| 0000720620 | 0375 | 44E9 | 9A00 | 04F6 | 2F9A | C28E | D88B | 8B26 |
| 0000720640 | E907 | 001B | A4B8 | E901 | 0035 | B7B8 | E901 | 002F |
| 0000720660 | F4B8 | E901 | 0029 | 0AB8 | E900 | 0023 | 1AE9 | 4800 |
| 0000720700 | 7548 | E903 | FFE4 | 062D | 7500 | E903 | FFE2 | 052D |
| 0000720720 | 7500 | E903 | FFCE | DDE9 | B8FF | 0000 | 00E9 | 5E00 |
| 0000720740 | 835F | 02ED | E58B | 5D1F | CB4D | 581E | 4590 | 8B55 |
| 0000720760 | 1EEC | D88E | EC81 | 0132 | 5657 | 46C7 | FFF8 | C7FF |
| 0000721000 | F286 | 01FE | C700 | FC46 | 0000 | 46C7 | 00FA | C400 |
| 0000721020 | 0C5E | C02B | 8926 | 0247 | 8926 | 6A07 | FF2F | 0876 |
| 0000721040 | 76FF | 9A06 | 29CF | 31E1 | C483 | 3D06 | 0000 | 0375 |
| 0000721060 | A3E9 | C700 | F846 | FFFF | 76FF | FF08 | 0676 | 468D |
| 0000721100 | 16F8 | 6A50 | 8D27 | CE86 | 16FE | 6A50 | 8D24 | F286 |
| 0000721120 | 16FE | 6A50 | 6A00 | 9A00 | 324B | 0000 | 4689 | 83FA |
| 0000721140 | FA7E | 7500 | E903 | 003B | 468B | E9FA | 0015 | B7B8 |
| 0000721160 | E901 | 025F | A5B8 | E901 | 0259 | B7B8 | E901 | 0253 |
| 0000721200 | 20E9 | 4800 | 7D48 | E903 | FFF0 | 7F48 | E903 | FFDE |
| 0000721220 | 0F2D | 7500 | E903 | FFD6 | 5A2D | 7500 | E903 | FFD4 |
| 0000721240 | D7E9 | FFFF | F876 | DE9A | 002F | 8300 | F2BE | 00FE |
| 0000721260 | 0374 | 06E9 | B800 | 01B7 | 18E9 | 8B02 | DA86 | 8BFE |
| 0000721300 | DC96 | C4FE | 0C5E | 8926 | 2607 | 5789 | B802 | 0000 |
| 0000721320 | 00E9 | E902 | 01FD | 106A | 76FF | FF08 | 0676 | CF9A |
| 0000721340 | 6529 | 8330 | 06C4 | 003D | 7500 | E903 | 01DF | 76FF |
| 0000721360 | FF08 | 0676 | 868D | FEF4 | 5016 | 509A | 0F27 | 8332 |
| 0000721400 | 08C4 | 681E | 3988 | 868D | FEF4 | 5016 | 0A9A | 2127 |
| 0000721420 | 8332 | 08C4 | 681E | 398A | 868D | FEF4 | 5016 | 0A9A |
| 0000721440 | 8827 | 8330 | 08C4 | 46C7 | FFF8 | 8DFF | F486 | 16FE |
| 0000721460 | 8D50 | F846 | 5016 | 376A | 868D | FECE | 5016 | 246A |
| 0000721500 | 868D | FEF2 | 5016 | 006A | 006A | 269A | 002F | 1E00 |
| 0000721520 | 8E68 | 8D39 | E586 | 16FE | 9A50 | 2786 | 3276 | C483 |
| 0000721540 | 3D08 | 0000 | 0375 | 1AE9 | 1E00 | 9068 | 8D39 | E586 |
| 0000721560 | 16FE | 9A50 | 2786 | 32C3 | C483 | 3D08 | 0000 | 0374 |
| 0000721600 | 25E9 | 8300 | FC7E | 7400 | E903 | 001C | 76FF | 8DF8 |
| 0000721620 | CE86 | 16FE | 6A50 | 8D24 | F286 | 16FE | 9A50 | 3365 |
| 0000721640 | 0000 | 4689 | E9FC | FFA7 | 7E83 | 00FC | 0375 | 03E9 |
| 0000721660 | E900 | 00F5 | 76FF | FF08 | 0676 | 868D | FEF4 | 5016 |
| 0000721700 | 509A | D527 | 8332 | 08C4 | 681E | 3993 | 868D | FEF4 |
| 0000721720 | 5016 | 0A9A | E927 | 8332 | 08C4 | 868D | FEE5 | 5016 |
| 0000721740 | 868D | FEF4 | 5016 | 0A9A | 7927 | 8333 | 08C4 | 868B |
| 0000721760 | FEDA | 968B | FEDC | 5EC4 | 260C | 0701 | 1126 | 0257 |
| 0000722000 | 86F6 | FEE2 | 7510 | E903 | 0049 | 7E83 | 010A | 0374 |
| 0000722020 | 40E9 | 8D00 | F446 | 5016 | 76FF | 8D0A | F48E | 16FE |
| 0000722040 | 9A51 | 30EA | 3126 | C483 | 890A | FA46 | 468B | 8BF4 |
| 0000722060 | F656 | 5EC4 | 260C | 0701 | 1126 | 0257 | 7E83 | 00FA |
| 0000722100 | 0375 | 0EE9 | FF00 | F876 | C09A | 0033 | 8B00 | FA46 |
| 0000722120 | 80E9 | FF00 | F876 | 868D | FECE | 5016 | 246A | 868D |
| 0000722140 | FEF2 | 5016 | 759A | 002F | 8900 | FC46 | 681E | 3995 |
| 0000722160 | 868D | FEE5 | 5016 | 869A | 9327 | 8333 | 08C4 | 003D |
| 0000722200 | 7500 | E903 | 001A | 681E | 3997 | 868D | FEE5 | 5016 |
| 0000722220 | 869A | FD27 | 8331 | 08C4 | 003D | 7400 | E903 | 0009 |
| 0000722240 | 7E83 | 00FC | 0375 | AAE9 | 83FF | F2BE | 00FE | 0377 |
| 0000722260 | 09E9 | 8300 | FC7E | 750D | E903 | FEEC | 76FF | 9AF8 |
| 0000722300 | 31A7 | 0000 | 00B8 | E900 | 0009 | 06E9 | B800 | 01B7 |
| 0000722320 | 00E9 | 5E00 | 835F | 02ED | E58B | 5D1F | CB4D | 581E |
| 0000722340 | 4590 | 8B55 | 1EEC | D88E | EC81 | 000C | 5657 | 76FF |

THU MAR 14 17:31:54 1991 DB_PI.DLL PAGE 254, LINE 14928

| | | | | | | | | |
|---|---|---|---|---|---|---|---|---|
| 0000722360 | FF08 | 0676 | B09A | 5E27 | 8334 | 04C4 | 4603 | 8B06 |
| 0000722400 | 0856 | 8948 | FA46 | 5689 | C4FC | FA5E | 8026 | 2F3F |
| 0000722420 | 0375 | 18E9 | C400 | FA5E | 8026 | 5C3F | 0375 | 0CE9 |
| 0000722440 | C400 | FA5E | 8026 | 3A3F | 0374 | 08E9 | C700 | F446 |
| 0000722460 | 399A | 05E9 | C700 | F446 | 399F | 468B | 89F4 | F646 |
| 0000722500 | 5E8C | FFF8 | 0C76 | 76FF | FF0A | 0876 | 76FF | FF06 |
| 0000722520 | F876 | 76FF | FFF6 | 1076 | 76FF | 9A0E | 3126 | 325C |
| 0000722540 | C483 | 8B10 | 0E46 | 568B | E910 | 0000 | 5F5E | ED83 |
| 0000722560 | 8B02 | 1FE5 | 4D5D | 1ECB | 9058 | 5545 | EC8B | 8E1E |
| 0000722600 | 81D8 | 2EEC | 5703 | C756 | F846 | FFFF | 86C7 | FEF6 |
| 0000722620 | 0001 | 46C7 | 00FC | 6A00 | FF10 | 0C76 | 76FF | 9A0A |
| 0000722640 | 29CF | 350F | C483 | 3D06 | 0000 | 0374 | 55E9 | FF00 |
| 0000722660 | 0C76 | 76FF | 6A0A | 6A00 | 9A00 | FFFF | 0000 | 4689 |
| 0000722700 | 3DFA | 0000 | 0375 | 3BE9 | 8B00 | FA46 | 1BE9 | B800 |
| 0000722720 | 01A5 | 9CE9 | B801 | 01A4 | 96E9 | B801 | 01B7 | 90E9 |
| 0000722740 | B801 | 000D | 8AE9 | E901 | 001A | 032D | 7500 | E903 |
| 0000722760 | FFE9 | 4848 | 0375 | DCE9 | 2DFF | 0067 | 0375 | CEE9 |
| 0000723000 | E9FF | FFDD | 106A | 76FF | FF08 | 0676 | CF9A | 2429 |
| 0000723020 | 8333 | 06C4 | 003D | 7500 | E903 | 0155 | 76FF | FF08 |
| 0000723040 | 0676 | 868D | FEF8 | 5016 | 509A | 3D27 | 8335 | 08C4 |
| 0000723060 | 681E | 39A5 | 868D | FEF8 | 5016 | 0A9A | 4F27 | 8335 |
| 0000723100 | 08C4 | 681E | 39A7 | 868D | FEF8 | 5016 | 0A9A | F727 |
| 0000723120 | 8333 | 08C4 | 46C7 | FFF8 | 8DFF | F886 | 16FE | 8D50 |
| 0000723140 | F846 | 5016 | 376A | 868D | FED2 | 5016 | 246A | 868D |
| 0000723160 | FEF6 | 5016 | 006A | 006A | 589A | 0031 | 1E00 | AB68 |
| 0000723200 | 8D39 | E986 | 16FE | 9A50 | 2786 | 35A4 | C483 | 3D08 |
| 0000723220 | 0000 | 0375 | A0E9 | 1E00 | AD68 | 8D39 | E986 | 16FE |
| 0000723240 | 9A50 | 2786 | 352B | C483 | 3D08 | 0000 | 0375 | 86E9 |
| 0000723260 | 8D00 | D286 | 16FD | 8D50 | E98E | 16FE | FF51 | 0876 |
| 0000723300 | 76FF | 9A06 | 33DE | 35E0 | C483 | 8D0C | D286 | 16FC |
| 0000723320 | 8D50 | E98E | 16FE | FF51 | 0C76 | 76FF | 9A0A | 33DE |
| 0000723340 | 35FE | C483 | F60C | E686 | 10FE | 0375 | 1AE9 | 8D00 |
| 0000723360 | D286 | 16FC | 8D50 | D286 | 16FD | 9A50 | 3477 | 3618 |
| 0000723400 | C483 | 8908 | FA46 | 17E9 | 8D00 | D286 | 16FC | 8D50 |
| 0000723420 | D286 | 16FD | 9A50 | 3904 | 34A2 | C483 | 8908 | FA46 |
| 0000723440 | 7E83 | 00FA | 0375 | 0EE9 | FF00 | F876 | 499A | 0033 |
| 0000723460 | 8B00 | FA46 | 3AE9 | FF00 | F876 | 868D | FED2 | 5016 |
| 0000723500 | 246A | 868D | FEF6 | 5016 | 9E9A | 0032 | 8900 | FC46 |
| 0000723520 | BE83 | FEF6 | 7700 | E903 | 0009 | 7E83 | 00FC | 0375 |
| 0000723540 | 1AE9 | FFFF | F876 | 2D9A | 0036 | B800 | 0000 | 00E9 |
| 0000723560 | 5E00 | 835F | 02ED | E58B | 5D1F | CB4D | 581E | 4590 |
| 0000723600 | 8B55 | 1EEC | D88E | EC81 | 040E | 5657 | 86C7 | FDF8 |
| 0000723620 | 0000 | 76FF | FF08 | 0676 | 868D | FBF4 | 5016 | 006A |
| 0000723640 | 006A | BA9A | 0036 | 8900 | FC46 | 76FF | FF0C | 0A76 |
| 0000723660 | 468D | 16FA | 6A50 | 6A00 | 9A00 | 2A57 | 0000 | 8689 |
| 0000723700 | FBF2 | 7E83 | 00FC | 0375 | 06E9 | B800 | 01B7 | 28E9 |
| 0000723720 | 8B02 | F286 | E9FB | 0027 | 86C7 | FCF6 | 0001 | 3DE9 |
| 0000723740 | B800 | 01A5 | 12E9 | B802 | 01B7 | 0CE9 | C702 | F686 |
| 0000723760 | 00FC | E900 | 0028 | 0DB8 | E900 | 01FD | 1FE9 | 0B00 |
| 0000724000 | 75C0 | E903 | FFD2 | 4848 | 0375 | E0E9 | 48FF | 0375 |
| 0000724020 | D4E9 | 2DFF | 0069 | 0375 | C6E9 | E9FF | FFD8 | 86F6 |
| 0000724040 | FBF4 | 7410 | E903 | 0098 | BE83 | FCF6 | 7500 | E903 |
| 0000724060 | 0077 | 46F6 | 10FA | 0375 | 4EE9 | FF00 | 0876 | 76FF |
| 0000724100 | 8D06 | FA86 | 16FE | 9A50 | 295C | 376E | C483 | 8908 |
| 0000724120 | F886 | FFFD | 1076 | 76FF | 8D0E | F686 | 16FB | 8D50 |
| 0000724140 | FA86 | 16FE | FF50 | 0C76 | 76FF | 9A0A | 33DE | 377E |
| 0000724160 | C483 | 520C | FF50 | 0876 | 76FF | 9A06 | 367C | 37B8 |
| 0000724200 | C483 | E90C | 0173 | 20E9 | 8300 | 0E7E | 7500 | E903 |
| 0000724220 | 0011 | 76FF | FF0C | 0A76 | 1C9A | A442 | 8338 | 04C4 |

THU MAR 14 17:31:54 1991 DB_PI.DLL PAGE 255, LINE 14987

| | | | | | | | | |
|---|---|---|---|---|---|---|---|---|
| 0000724240 | 06E9 | B800 | 01B8 | 50E9 | FF01 | 0C76 | 76FF | FF0A |
| 0000724260 | 0876 | 76FF | 9A06 | 3904 | 37F4 | C483 | E908 | 0132 |
| 0000724300 | BE83 | FCF6 | 7500 | E903 | 00B9 | 46F6 | 10FA | 0374 |
| 0000724320 | 09E9 | B800 | 01B1 | 20E9 | E901 | 00A4 | 7E83 | 0010 |
| 0000724340 | 0375 | 74E9 | FF00 | 0876 | 76FF | 8D06 | FA86 | 16FE |
| 0000724360 | 9A50 | 295C | 3812 | C483 | 8908 | F886 | 8DFD | F886 |
| 0000724400 | 16FC | 8D50 | FA8E | 16FE | FF51 | 0C76 | 76FF | 9A0A |
| 0000724420 | 33DE | 3822 | C483 | 6A0C | 8D10 | F886 | 16FC | 9A50 |
| 0000724440 | 29CF | 384D | C483 | 3D06 | 0000 | 0375 | 0FE9 | 8300 |
| 0000724460 | 0E7E | 7400 | E903 | 0006 | BAB8 | E901 | 00BB | 868D |
| 0000724500 | FCF8 | 5016 | 76FF | FF08 | 0676 | 779A | 7734 | 8338 |
| 0000724520 | 08C4 | 8689 | FDF8 | 27E9 | 8300 | 0E7E | 7400 | E903 |
| 0000724540 | 0006 | BAB8 | E901 | 0091 | 76FF | FF0C | 0A76 | 76FF |
| 0000724560 | FF08 | 0676 | 779A | 9234 | 8338 | 08C4 | 8689 | FDF8 |
| 0000724600 | 6FE9 | FF00 | 0C76 | 76FF | 8D0A | FA86 | 16FD | 9A50 |
| 0000724620 | 28C0 | 38C7 | C483 | 8908 | F886 | 8DFD | FA86 | 16FD |
| 0000724640 | 9A50 | 27B0 | 358A | C483 | 8B04 | 80F0 | F9BA | 01FD |
| 0000724660 | C01B | D8F7 | 3A3D | 7400 | E903 | 001E | 106A | 868D |
| 0000724700 | FDFA | 5016 | CF9A | E929 | 8338 | 06C4 | 003D | 7400 |
| 0000724720 | E903 | 0006 | B1B8 | E901 | 001F | 76FF | FF0C | 0A76 |
| 0000724740 | 76FF | FF08 | 0676 | 779A | C634 | 8335 | 08C4 | 8689 |
| 0000724760 | FDF8 | 868B | FDF8 | 00E9 | 5E00 | 835F | 02ED | E58B |
| 0000725000 | 5D1F | CB4D | 581E | 4590 | 8B55 | 1EEC | D88E | EC81 |
| 0000725020 | 0028 | 5657 | 76FF | FF08 | 0676 | 468D | 16DA | 6A50 |
| 0000725040 | 6A00 | 9A00 | 36A3 | 0000 | 4689 | 83F4 | F47E | 7500 |
| 0000725060 | E903 | 0033 | 468B | E9F4 | 0015 | B7B8 | E901 | 019F |
| 0000725100 | A5B8 | E901 | 0199 | 0DB8 | E900 | 0193 | 18E9 | 4800 |
| 0000725120 | 7D48 | E903 | FFF0 | 7F48 | E903 | FFDE | 692D | 7500 |
| 0000725140 | E903 | FFDC | DFE9 | F6FF | DA46 | 7510 | E903 | 0006 |
| 0000725160 | B7B8 | E901 | 0169 | 76FF | FF08 | 0676 | 468D | 16F6 |
| 0000725200 | 8D50 | D846 | 5016 | 006A | 006A | 006A | 016A | 406A |
| 0000725220 | 006A | 006A | FE9A | 0039 | 8900 | F446 | 7E83 | 00F4 |
| 0000725240 | 0375 | 15E9 | 8300 | F47E | 7405 | E903 | 0006 | A4B8 |
| 0000725260 | E901 | 0003 | 08B8 | E900 | 0125 | 76FF | 6AF6 | 8D01 |
| 0000725300 | DC46 | 5016 | 166A | FF9A | 00FF | 8900 | F446 | 7E83 |
| 0000725320 | 00F4 | 0375 | 06E9 | B800 | 000D | 02E9 | FF01 | 0C76 |
| 0000725340 | 76FF | 8D0A | F246 | 5016 | 468D | 16FA | FF50 | EA76 |
| 0000725360 | 76FF | 6AE8 | 6A00 | 6A11 | 6A21 | 6A00 | 9A00 | FFFF |
| 0000725400 | 0000 | 4689 | 83F4 | F47E | 7500 | E903 | 002E | 468B |
| 0000725420 | E9F4 | 0015 | A4B8 | E901 | 00C5 | 0EB8 | E900 | 00BF |
| 0000725440 | 08B8 | E900 | 00B9 | 13E9 | 2D00 | 0005 | 0375 | E3E9 |
| 0000725460 | 2DFF | 006B | 0375 | E1E9 | E9FF | FFE4 | 76FF | 68F6 |
| 0000725500 | 3A70 | 0063 | 6800 | 8000 | 468D | 16FC | 9A50 | FFFF |
| 0000725520 | 0000 | 4689 | 83F4 | F47E | 7500 | E903 | 000E | 76FF |
| 0000725540 | 9AF6 | 3A92 | 0000 | 0CB8 | E900 | 0073 | 76FF | 68F2 |
| 0000725560 | FFFF | 0068 | FF00 | FC76 | 468D | 16F8 | 9A50 | FFFF |
| 0000725600 | 0000 | 4689 | 83F4 | F47E | 7500 | E903 | 000E | 76FF |
| 0000725620 | 9AF2 | 3AA9 | 0000 | 0BB8 | E900 | 0043 | 7E83 | 00FC |
| 0000725640 | 0374 | 97E9 | FFFF | F676 | C39A | 003A | 8900 | F446 |
| 0000725660 | 7E83 | 00F4 | 0375 | 06E9 | B800 | 0009 | 20E9 | FF00 |
| 0000725700 | F276 | FF9A | 00FF | 8900 | F446 | 7E83 | 00F4 | 0375 |
| 0000725720 | 06E9 | B800 | 0009 | 06E9 | B800 | 0000 | 00E9 | 5E00 |
| 0000725740 | 835F | 02ED | E58B | 5D1F | CB4D | 581E | 4590 | 8B55 |
| 0000725760 | 1EEC | D88E | EC81 | 0000 | 5657 | 7E83 | 0012 | 0375 |
| 0000726000 | 26E9 | FF00 | 1676 | 76FF | FF14 | 1076 | 76FF | FF0E |
| 0000726020 | 0C76 | 76FF | FF0A | 0876 | 76FF | 9A06 | 3B57 | 3B44 |
| 0000726040 | C483 | E910 | 0026 | 23E9 | FF00 | 1676 | 76FF | FF14 |
| 0000726060 | 1076 | 76FF | FF0E | 0C76 | 76FF | FF0A | 0876 | 76FF |
| 0000726100 | 9A06 | 3E5B | 374A | C483 | E910 | 0000 | 5F5E | ED83 |

THU MAR 14 17:31:54 1991 DB_PI.DLL PAGE 256, LINE 15046

| | | | | | | | | |
|---|---|---|---|---|---|---|---|---|
| 0000726120 | 8B02 | 1FE5 | 4D5D | 1ECB | 9058 | 5545 | EC8B | 8E1E |
| 0000726140 | 81D8 | 40EC | 5700 | C756 | F046 | 0000 | 46C7 | 00F6 |
| 0000726160 | C700 | EE46 | FFFF | 46C7 | 01E4 | FF00 | 1076 | 76FF |
| 0000726200 | 9A0E | 27B0 | 3B90 | C483 | 0504 | 0010 | 9A50 | 243E |
| 0000726220 | 3BB1 | C483 | 8902 | F246 | 5689 | 8BF4 | F446 | 460B |
| 0000726240 | 74F2 | E903 | 0006 | 07B8 | E900 | 02A4 | 0D6A | 3E9A |
| 0000726260 | 9B24 | 8337 | 02C4 | 4689 | 89EA | EC56 | 468B | 0BEC |
| 0000726300 | EA46 | 0374 | 14E9 | FF00 | F476 | 76FF | 9AF2 | 2448 |
| 0000726320 | 3BEC | C483 | B804 | 0007 | 75E9 | 6A02 | FF08 | 0876 |
| 0000726340 | 76FF | FF06 | 1476 | 76FF | 9A12 | 2804 | 3C08 | C483 |
| 0000726360 | C40A | 125E | C626 | 0847 | FF00 | 0C76 | 76FF | FF0A |
| 0000726400 | 1476 | 76FF | 9A12 | 270A | 3C1C | C483 | FF08 | 1076 |
| 0000726420 | 76FF | FF0E | F476 | 76FF | 9AF2 | 2750 | 3C2E | C483 |
| 0000726440 | 1E08 | B068 | FF39 | F476 | 76FF | 9AF2 | 270A | 3C42 |
| 0000726460 | C483 | FFD8 | 1476 | 76FF | FF12 | F476 | 76FF | 9AF2 |
| 0000726500 | 270A | 3C76 | C483 | 6A08 | FF3F | F476 | 76FF | 9AF2 |
| 0000726520 | 29CF | 3B1E | C483 | 3D06 | 0000 | 0374 | 06E9 | B800 |
| 0000726540 | 0000 | EBE9 | 6A01 | FF08 | 0876 | 76FF | FF06 | 1476 |
| 0000726560 | 76FF | 9A12 | 2804 | 3C92 | C483 | C40A | 125E | C626 |
| 0000726600 | 0847 | FF00 | 1076 | 76FF | FF0E | F476 | 76FF | 9AF2 |
| 0000726620 | 2750 | 3CA4 | C483 | 1E08 | B268 | FF39 | F476 | 76FF |
| 0000726640 | 9AF2 | 270A | 3CB8 | C483 | FF08 | 1476 | 76FF | FF12 |
| 0000726660 | F476 | 76FF | 9AF2 | 270A | 3CCA | C483 | 1E08 | B468 |
| 0000726700 | FF39 | F476 | 76FF | 9AF2 | 270A | 3D0B | C483 | FF08 |
| 0000726720 | F476 | 76FF | 8DF2 | EE46 | 5016 | 306A | 468D | 16C0 |
| 0000726740 | 6A50 | 8D24 | E446 | 5016 | 006A | 006A | 799A | 0035 |
| 0000726760 | 8900 | F646 | 7E83 | 00F6 | 0375 | 06E9 | B800 | 01F5 |
| 0000727000 | 4DE9 | 8D01 | D746 | 5016 | B09A | 6427 | 833D | 04C4 |
| 0000727020 | F08B | 428D | 89D7 | FA46 | 568C | 8DFC | D746 | 4689 |
| 0000727040 | 8CE6 | E856 | 5EC4 | 26FA | 3F80 | 752E | E903 | 001C |
| 0000727060 | 468B | 8BE6 | E856 | 4639 | 74FA | E903 | 0008 | 5639 |
| 0000727100 | 75FC | E903 | 0006 | 4EFF | E9FA | FFD8 | 5EC4 | 26FA |
| 0000727120 | 3F80 | 742E | E903 | 0025 | 46FF | FFFA | FC76 | 76FF |
| 0000727140 | 9AFA | 286A | 3DBA | C483 | 8904 | F846 | 468B | 39F0 |
| 0000727160 | F846 | 037F | 06E9 | 8B00 | F846 | 4689 | FFF0 | EE76 |
| 0000727200 | 468D | 16C0 | 6A50 | 8D24 | E446 | 5016 | 499A | 0036 |
| 0000727220 | 8900 | F646 | 7E83 | 00F6 | 0375 | 66E9 | FFFF | F046 |
| 0000727240 | 7E83 | 63F0 | 037F | 2AE9 | FF00 | EE76 | 469A | 003E |
| 0000727260 | FF00 | F476 | 76FF | 9AF2 | 2448 | 3DC8 | C483 | FF04 |
| 0000727300 | EC76 | 76FF | 9AEA | 2448 | 3DE4 | C483 | B804 | 01F5 |
| 0000727320 | 7DE9 | 6A00 | FF08 | 0876 | 76FF | FF06 | 1476 | 76FF |
| 0000727340 | 9A12 | 2804 | 3DFE | C483 | C40A | 125E | C626 | 0847 |
| 0000727360 | 1E00 | B768 | FF39 | 1476 | 76FF | 9A12 | 270A | 3E11 |
| 0000727400 | C483 | 6A08 | FF0A | EC76 | 76FF | FFEA | F076 | 289A |
| 0000727420 | 2129 | 833E | 08C4 | 5052 | 76FF | FF14 | 1276 | 0A9A |
| 0000727440 | 2F27 | 833E | 08C4 | 76FF | FFF4 | F276 | 489A | 3D24 |
| 0000727460 | 833E | 04C4 | 76FF | FFEC | EA76 | 489A | 8424 | 833B |
| 0000727500 | 04C4 | 76FF | 9AEE | 3667 | 0000 | 00B8 | E900 | 0000 |
| 0000727520 | 5F5E | ED83 | 8B02 | 1FE5 | 4D5D | 1ECB | 9058 | 5545 |
| 0000727540 | EC8B | 8E1E | 81D8 | 3AEC | 5701 | C756 | D046 | 0000 |
| 0000727560 | 086A | 76FF | FF08 | 0676 | 468D | 16D4 | 9A50 | 2804 |
| 0000727600 | 3E98 | C483 | C60A | DC46 | FF00 | 1076 | 76FF | 8D0E |
| 0000727620 | CA86 | 16FE | 9A50 | 2750 | 3EAA | C483 | 1E08 | B968 |
| 0000727640 | 8D39 | CA86 | 16FE | 9A50 | 270A | 3EB8 | C483 | 8D08 |
| 0000727660 | CA86 | 16FE | 9A50 | 27B0 | 3ED9 | C483 | 8B04 | 8DF0 |
| 0000727700 | CA82 | 89FE | C686 | 8CFE | C896 | 8DFE | D446 | 5016 |
| 0000727720 | 8E8D | FECA | 5116 | 0A9A | ED27 | 833E | 08C4 | 76FF |
| 0000727740 | FF0C | 0A76 | 868D | FECA | 5016 | 0A9A | FA27 | 833E |
| 0000727760 | 08C4 | 468D | 16D4 | 9A50 | 27B0 | 3F2B | C483 | 8904 |

THU MAR 14 17:31:54 1991 DB_PI.DLL PAGE 257, LINE 15105

| | | | | | | | | |
|---|---|---|---|---|---|---|---|---|
| 0000730000 | D246 | 3F6A | 868D | FECA | 5016 | CF9A | 5229 | 833C |
| 0000730020 | 06C4 | 003D | 7400 | E903 | 001F | B6FF | FEC8 | B6FF |
| 0000730040 | FEC6 | 76FF | FF14 | 1276 | 509A | D027 | 833B | 08C4 |
| 0000730060 | 00B8 | E900 | 009E | 92E9 | 8100 | D07E | 03E7 | 037F |
| 0000730100 | 06E9 | B800 | 01F5 | 8BE9 | 6A00 | 8D0A | F446 | 5016 |
| 0000730120 | 76FF | 9AD0 | 2928 | 3F63 | C483 | 8D08 | F446 | 5016 |
| 0000730140 | B09A | AF27 | 833F | 04C4 | 4689 | 8BCE | CE46 | 4603 |
| 0000730160 | 3DD2 | 0008 | 037F | 17E9 | 8B00 | C686 | 8BFE | C896 |
| 0000730200 | 2BFE | CE46 | 0805 | 8900 | CA46 | 5689 | E9CC | 0011 |
| 0000730220 | 868B | FEC6 | 968B | FEC8 | 4603 | 89D2 | CA46 | 5689 |
| 0000730240 | 8DCC | F446 | 5016 | 76FF | FFCC | CA76 | 509A | C327 |
| 0000730260 | 833F | 08C4 | 76FF | FF0C | 0A76 | 868D | FECA | 5016 |
| 0000730300 | 0A9A | 8027 | 833E | 08C4 | 46FF | E9D0 | FF34 | F4B8 |
| 0000730320 | E901 | 0000 | 5F5E | ED83 | 8B02 | 1FE5 | 4D5D | 1ECB |
| 0000730340 | 9058 | 5545 | EC8B | 8E1E | 81D8 | 06EC | 5700 | 1E56 |
| 0000730360 | BB68 | 9A39 | 2A08 | 4015 | C483 | 8904 | FA46 | 5689 |
| 0000730400 | 8BFC | FC46 | 460B | 75FA | E903 | 0039 | 76FF | FFFC |
| 0000730420 | FA76 | B09A | 2B27 | 8340 | 04C4 | 023D | 7600 | E903 |
| 0000730440 | 0023 | 76FF | FFFC | FA76 | B09A | 5227 | 8340 | 04C4 |
| 0000730460 | 023D | 7400 | E903 | 0025 | 5EC4 | 26FA | 7F80 | 3A01 |
| 0000730500 | 0375 | 18E9 | 1E00 | CA68 | FF39 | 0876 | 76FF | 9A06 |
| 0000730520 | 2750 | 406C | C483 | B808 | 0000 | 40E9 | FF00 | FC76 |
| 0000730540 | 76FF | FFFA | 0876 | 76FF | 9A06 | 2750 | 407A | C483 |
| 0000730560 | FF08 | 0876 | 76FF | 9A06 | 27B0 | 4092 | C483 | 4804 |
| 0000730600 | 0374 | 12E9 | 1E00 | CD68 | FF39 | 0876 | 76FF | 9A06 |
| 0000730620 | 270A | 3F56 | C483 | B808 | 0000 | 00E9 | 5E00 | 835F |
| 0000730640 | 02ED | E58B | 5D1F | CB4D | 581E | 4590 | 8B55 | 1EEC |
| 0000730660 | D88E | EC81 | 0004 | 5657 | 468B | 0B08 | 0646 | 0374 |
| 0000730700 | 06E9 | B800 | 0017 | 69E9 | C701 | FC46 | 0000 | 06E9 |
| 0000730720 | FF00 | FC46 | 46FF | C406 | 065E | 8026 | 003F | 0375 |
| 0000730740 | 96E9 | 8300 | FC7E | 7C08 | E903 | 008D | 5EC4 | 2606 |
| 0000730760 | 3F80 | 752E | E903 | 0081 | 5EC4 | 2606 | 3F80 | 755C |
| 0000731000 | E903 | 006C | 5EC4 | 2606 | 3F80 | 753A | E903 | 0060 |
| 0000731020 | 5EC4 | 2606 | 3F80 | 752A | E903 | 0054 | 5EC4 | 2606 |
| 0000731040 | 3F80 | 753F | E903 | 0048 | 5EC4 | 2606 | 3F80 | 752B |
| 0000731060 | E903 | 003C | 5EC4 | 2606 | 3F80 | 757C | E903 | 0030 |
| 0000731100 | 5EC4 | 2606 | 3F80 | 753E | E903 | 0024 | 5EC4 | 2606 |
| 0000731120 | 3F80 | 753C | E903 | 0018 | 5EC4 | 2606 | 3F80 | 7527 |
| 0000731140 | E903 | 000C | 5EC4 | 2606 | 3F80 | 7422 | E903 | 0006 |
| 0000731160 | B2B8 | E901 | 00BC | 58E9 | C4FF | 065E | 8026 | 2E3F |
| 0000731200 | 0374 | A7E9 | FF00 | 0646 | 46C7 | 00FC | E900 | 0006 |
| 0000731220 | 46FF | FFFC | 0646 | 5EC4 | 2606 | 3F80 | 7500 | E903 |
| 0000731240 | 008A | 7E83 | 03FC | 037C | 81E9 | C400 | 065E | 8026 |
| 0000731260 | 5C3F | 0375 | 6CE9 | C400 | 065E | 8026 | 3A3F | 0375 |
| 0000731300 | 60E9 | C400 | 065E | 8026 | 2A3F | 0375 | 54E9 | C400 |
| 0000731320 | 065E | 8026 | 3F3F | 0375 | 48E9 | C400 | 065E | 8026 |
| 0000731340 | 2B3F | 0375 | 3CE9 | C400 | 065E | 8026 | 7C3F | 0375 |
| 0000731360 | 30E9 | C400 | 065E | 8026 | 3E3F | 0375 | 24E9 | C400 |
| 0000731400 | 065E | 8026 | 3C3F | 0375 | 18E9 | C400 | 065E | 8026 |
| 0000731420 | 273F | 0375 | 0CE9 | C400 | 065E | 8026 | 223F | 0374 |
| 0000731440 | 06E9 | B800 | 01B2 | 09E9 | E900 | FF64 | 00B8 | E900 |
| 0000731460 | 0000 | 5F5E | ED83 | 8B02 | 1FE5 | 4D5D | 1ECB | 9058 |
| 0000731500 | 5545 | EC8B | 8E1E | 81D8 | 00EC | 5700 | 8B56 | 0846 |
| 0000731520 | 460B | 7406 | E903 | 0006 | 17B8 | E900 | 00D3 | 76FF |
| 0000731540 | FF08 | 0676 | B09A | 7D27 | 8342 | 04C4 | 003D | 7500 |
| 0000731560 | E903 | 0016 | 76FF | FF08 | 0676 | B09A | A127 | 8342 |
| 0000731600 | 04C4 | 1F3D | 7700 | E903 | 0006 | B2B8 | E901 | 00A1 |
| 0000731620 | 1F6A | 76FF | FF08 | 0676 | 76FF | FF0C | 0A76 | 049A |
| 0000731640 | B728 | 8342 | 0AC4 | 5EC4 | 260A | 47C6 | 001F | 76FF |

THU MAR 14 17:31:54 1991 DB_PI.DLL PAGE 258, LINE 15164

| | | | | | | | | |
|---|---|---|---|---|---|---|---|---|
| 0000731660 | FF08 | 0676 | B09A | F627 | 833F | 04C4 | 1F3D | 7700 |
| 0000731700 | E903 | 0008 | 5EC4 | 260A | 47C6 | 001F | 5EC4 | 260A |
| 0000731720 | 078A | 8B98 | F6D8 | 5D87 | 0335 | 0374 | 12E9 | C400 |
| 0000731740 | 0A5E | 8026 | 5F3F | 0375 | 06E9 | B800 | 01B2 | 40E9 |
| 0000731760 | FF00 | 0A46 | 5EC4 | 260A | 3F80 | 7500 | E903 | 002B |
| 0000732000 | 5EC4 | 260A | 078A | 8B98 | F6D8 | 5D87 | 0735 | 0374 |
| 0000732020 | 12E9 | C400 | 0A5E | 8026 | 5F3F | 0375 | 06E9 | B800 |
| 0000732040 | 01B2 | 0CE9 | FF00 | 0A46 | C9E9 | B8FF | 0000 | 00E9 |
| 0000732060 | 5E00 | 835F | 02ED | E58B | 5D1F | CB4D | 581E | 4590 |
| 0000732100 | 8B55 | 1EEC | D88E | EC81 | 0004 | 5657 | 468B | 0B08 |
| 0000732120 | 0646 | 0374 | 06E9 | B800 | 0017 | 33E9 | 8D00 | FC46 |
| 0000732140 | 5016 | 76FF | FF08 | 0676 | FF9A | 00FF | 3D00 | 0000 |
| 0000732160 | 0375 | 15E9 | C400 | 065E | C02B | 8926 | 0247 | 8926 |
| 0000732200 | B807 | 000D | 09E9 | E900 | 0006 | 00B8 | E900 | 0000 |
| 0000732220 | 5F5E | ED83 | 8B02 | 1FE5 | 4D5D | 00CB | 581E | 4590 |
| 0000732240 | 8B55 | 1EEC | D88E | EC81 | 0004 | 5657 | 086A | 016A |
| 0000732260 | 769A | EE33 | 8343 | 04C4 | 5EC4 | 260A | 0789 | 8926 |
| 0000732300 | 0257 | 5EC4 | 260A | 478B | 2602 | 070B | 0374 | 06E9 |
| 0000732320 | B800 | 0007 | DEE9 | 8300 | 087E | 7201 | E903 | 0006 |
| 0000732340 | 13B8 | E900 | 00CF | 086A | 76FF | 9A06 | 3376 | 4421 |
| 0000732360 | C483 | C404 | 0A5E | C426 | 261F | 4789 | 2602 | 5789 |
| 0000732400 | C404 | 0A5E | C426 | 261F | 478B | 2604 | 470B | 7402 |
| 0000732420 | E903 | 0024 | 5EC4 | 260A | 77FF | 2602 | 37FF | 489A |
| 0000732440 | 6724 | 8342 | 04C4 | 5EC4 | 2B0A | 26C0 | 4789 | 2602 |
| 0000732460 | 0789 | 07B8 | E900 | 007D | 468B | C406 | 0A5E | C426 |
| 0000732500 | 261F | 0789 | 468B | C408 | 0A5E | C426 | 261F | 4789 |
| 0000732520 | C706 | FC46 | 0000 | 03E9 | FF00 | FC46 | 468B | 39FC |
| 0000732540 | 0646 | 0377 | 48E9 | C400 | 0A5E | C426 | 261F | 5FC4 |
| 0000732560 | 8B02 | FC76 | E6C1 | 2603 | 00C7 | 0000 | 5E8B | C1FC |
| 0000732600 | 03E3 | 76C4 | 260A | 34C4 | C426 | 0274 | C726 | 0240 |
| 0000732620 | 0000 | 5E8B | C1FC | 03E3 | 76C4 | 260A | 34C4 | C426 |
| 0000732640 | 0274 | C02B | 8926 | 0640 | 8926 | 0440 | AAE9 | B8FF |
| 0000732660 | 0000 | 00E9 | 5E00 | 835F | 02ED | E58B | 5D1F | CB4D |
| 0000732700 | 581E | 4590 | 8B55 | 1EEC | D88E | EC81 | 0006 | 5657 |
| 0000732720 | 468B | 0B08 | 0646 | 0374 | 06E9 | B800 | 0017 | FBE9 |
| 0000732740 | C700 | FA46 | 0000 | 03E9 | FF00 | FA46 | 5EC4 | 8B06 |
| 0000732760 | FA46 | 3926 | 7707 | E903 | 00CE | 5EC4 | 2606 | 5FC4 |
| 0000733000 | 8B02 | FA76 | E6C1 | 2603 | 3883 | 7500 | E903 | 00B5 |
| 0000733020 | 46C7 | 00FC | E900 | 0003 | 46FF | 8BFC | FA5E | E3C1 |
| 0000733040 | C403 | 0676 | C426 | 0274 | 468B | 26FC | 4039 | 7702 |
| 0000733060 | E903 | 0074 | 5E6B | 26FC | C38B | 5E8B | C1FA | 03E3 |
| 0000733100 | 76C4 | 2606 | 74C4 | 2602 | 70C4 | 8B04 | 26D8 | 7883 |
| 0000733120 | 0024 | 0377 | 4EE9 | 8B00 | FA5E | E3C1 | C403 | 0676 |
| 0000733140 | C426 | 0274 | 8B26 | 0440 | 8B26 | 0650 | 4E6B | 26FC |
| 0000733160 | C103 | 5052 | 489A | A024 | 8345 | 04C4 | 5E6B | 26FC |
| 0000733200 | C38B | 5E8B | C1FA | 03E3 | 76C4 | 2606 | 74C4 | 2602 |
| 0000733220 | 70C4 | 8B04 | 26D8 | 70FF | 2622 | 70FF | 9A20 | 2448 |
| 0000733240 | 45C0 | C483 | E904 | FF70 | 5E8B | C1FA | 03E3 | 76C4 |
| 0000733260 | 2606 | 74C4 | 2602 | 70FF | 2606 | 70FF | 9A04 | 2448 |
| 0000733300 | 45D1 | C483 | E904 | FF21 | 76FF | FF08 | 0676 | 489A |
| 0000733320 | B324 | 8343 | 04C4 | 00B8 | E900 | 0000 | 5F5E | ED83 |
| 0000733340 | 8B02 | 1FE5 | 4D5D | 1ECB | 9058 | 5545 | EC8B | 8E1E |
| 0000733360 | 81D8 | 08EC | 5700 | C756 | F846 | 0000 | 468B | 8B06 |
| 0000733400 | 0856 | 4689 | 89FA | FC56 | 5EC4 | 26FA | 3F80 | 7500 |
| 0000733420 | E903 | 001C | 5EC4 | FFFA | FA46 | 8A26 | 9807 | 4E8B |
| 0000733440 | D1F8 | 03E1 | 2BC1 | F7D2 | 0A76 | 5689 | E9F8 | FFD8 |
| 0000733460 | 468B | E9F8 | 0000 | 5F5E | ED83 | 8B02 | 1FE5 | 4D5D |
| 0000733500 | 1ECB | 9058 | 5545 | EC8B | 8E1E | 81D8 | 04EC | 5700 |
| 0000733520 | C756 | FC46 | 0000 | 5EC4 | 260E | 07C7 | 0000 | 5EC4 |

THU MAR 14 17:31:54 1991 DB_PI.DLL PAGE 259, LINE 15223

| | | | | | | | | |
|---|---|---|---|---|---|---|---|---|
| 0000733540 | 8B06 | FC46 | 3926 | 0247 | 0377 | 49E9 | C400 | 0E5E |
| 0000733560 | 8326 | 003F | 0374 | 3DE9 | C400 | 065E | 8B26 | 0447 |
| 0000733600 | 8B26 | 0657 | 4E6B | 26FC | C103 | 5052 | 76FF | FF0C |
| 0000733620 | 0A76 | 869A | 7727 | 8345 | 08C4 | 003D | 7400 | E903 |
| 0000733640 | 000E | 5EC4 | 260E | 07C7 | 0001 | 468B | E9FC | 000C |
| 0000733660 | 46FF | E9FC | FFA8 | 468B | E9FC | 0000 | 5F5E | ED83 |
| 0000733700 | 8B02 | 1FE5 | 4D5D | 1ECB | 9058 | 5545 | EC8B | 8E1E |
| 0000733720 | 81D8 | 0EEC | 5700 | C756 | F646 | 0000 | 468B | 0B08 |
| 0000733740 | 0646 | 0374 | 06E9 | B800 | 0017 | 26E9 | C403 | 065E |
| 0000733760 | FF26 | FF37 | 0C76 | 76FF | 9A0A | 45E7 | 4727 | C483 |
| 0000734000 | 8906 | F246 | 468D | 16F6 | FF50 | 0C76 | 76FF | C40A |
| 0000734020 | 065E | 8B26 | 024F | 8B26 | 0457 | 5E8B | C1F2 | 03E3 |
| 0000734040 | CB03 | 5152 | 419A | 0D46 | 833F | 0CC4 | 4689 | C4F4 |
| 0000734060 | 065E | C426 | 025F | 768B | C1F2 | 03E6 | 8B26 | 8B00 |
| 0000734100 | F25E | E3C1 | C403 | 0676 | C426 | 0274 | 3926 | 0240 |
| 0000734120 | 0374 | 78E9 | 8301 | F67E | 7400 | E903 | 016F | 5EC4 |
| 0000734140 | 2606 | 5FC4 | 8B02 | F276 | E6C1 | 2603 | 3883 | 7500 |
| 0000734160 | E903 | 0041 | 5EC4 | 2606 | 5FC4 | 8B02 | F276 | E6C1 |
| 0000734200 | 2603 | 008B | 5EC4 | 2606 | 4703 | 6B06 | 26C0 | 8B50 |
| 0000734220 | F25E | E3C1 | C403 | 0676 | C426 | 0274 | FF26 | 0670 |
| 0000734240 | FF26 | 0470 | A49A | C132 | 8347 | 06C4 | 4689 | 89F8 |
| 0000734260 | FA56 | 17E9 | C400 | 065E | 6B26 | 0647 | 5026 | 3E9A |
| 0000734300 | 1E24 | 8349 | 02C4 | 4689 | 89F8 | FA56 | 468B | 0BFA |
| 0000734320 | F846 | 0374 | 06E9 | B800 | 0007 | 36E9 | 8B02 | F846 |
| 0000734340 | 568B | 8BFA | F25E | E3C1 | C403 | 0676 | C426 | 0274 |
| 0000734360 | 8926 | 0440 | 8926 | 0650 | 5EC4 | 2606 | 5FC4 | 8B02 |
| 0000734400 | F276 | E6C1 | 2603 | 008B | 4689 | E9FC | 0003 | 46FF |
| 0000734420 | C4FC | 065E | C426 | 025F | 768B | C1F2 | 03E6 | 8B26 |
| 0000734440 | C400 | 065E | 0326 | 0647 | 463B | 77FC | E903 | 005E |
| 0000734460 | 5E8B | C1F2 | 03E3 | 76C4 | 2606 | 74C4 | 2602 | 58C4 |
| 0000734500 | 6B04 | FC76 | 2626 | 00C6 | 6B00 | FC5E | 8B26 | 8BC3 |
| 0000734520 | F25E | E3C1 | C403 | 0676 | C426 | 0274 | C426 | 0470 |
| 0000734540 | D88B | C02B | 8926 | 2240 | 8926 | 2040 | 5E6B | 26FC |
| 0000734560 | C38B | 5E8B | C1F2 | 03E3 | 76C4 | 2606 | 74C4 | 2602 |
| 0000734600 | 70C4 | 8B04 | 26D8 | 40C7 | 0024 | E900 | FF80 | 5EC4 |
| 0000734620 | 2606 | 478B | C406 | 065E | C426 | 025F | 768B | C1F2 |
| 0000734640 | 03E6 | 0126 | 8B00 | F25E | E3C1 | C403 | 0676 | C426 |
| 0000734660 | 0274 | 8B26 | 0240 | 4689 | 8BFC | F25E | E3C1 | C403 |
| 0000734700 | 0676 | C426 | 0274 | FF26 | 0240 | 49E9 | 8300 | F67E |
| 0000734720 | 7500 | E903 | 001B | 7E83 | 0014 | 0375 | 09E9 | 8B00 |
| 0000734740 | F446 | 4689 | E9FC | 0006 | AAB8 | E901 | 0125 | 25E9 |
| 0000734760 | 8B00 | F25E | E3C1 | C403 | 0676 | C426 | 0274 | 8B26 |
| 0000735000 | 0240 | 4689 | 8BFC | F25E | E3C1 | C403 | 0676 | C426 |
| 0000735020 | 0274 | FF26 | 0240 | 016A | 76FF | 9A12 | 3376 | 49BD |
| 0000735040 | C483 | 6B04 | FC5E | 8B26 | 8BCB | F25E | E3C1 | C403 |
| 0000735060 | 0676 | C426 | 0274 | C426 | 0470 | D98B | 8926 | 2040 |
| 0000735100 | 8926 | 2250 | 5E6B | 26FC | C38B | 5E8B | C1F2 | 03E3 |
| 0000735120 | 76C4 | 2606 | 74C4 | 2602 | 70C4 | 8B04 | 26D8 | 408B |
| 0000735140 | 2622 | 400B | 7420 | E903 | 0006 | 07B8 | E900 | 00A3 |
| 0000735160 | 468B | 6B12 | FC5E | 8B26 | 8BCB | F25E | E3C1 | C403 |
| 0000735200 | 0676 | C426 | 0274 | C426 | 0470 | D98B | 8926 | 2440 |
| 0000735220 | 76FF | FF12 | 1076 | 76FF | 6B0E | FC5E | 8B26 | 8BC3 |
| 0000735240 | F25E | E3C1 | C403 | 0676 | C426 | 0274 | C426 | 0470 |
| 0000735260 | D88B | FF26 | 2270 | FF26 | 2070 | 309A | EA3E | 8349 |
| 0000735300 | 0AC4 | 1F6A | 75FF | FF0C | 0A76 | 5E8B | C1F2 | 03E3 |
| 0000735320 | 76C4 | 2606 | 74C4 | 2602 | 408B | 2604 | 508B | 6B06 |
| 0000735340 | FC4E | 0326 | 52C1 | 9A50 | 2804 | 4695 | C483 | 6B0A |
| 0000735360 | FC5E | 8B26 | 8BC3 | F25E | E3C1 | C403 | 0676 | C426 |
| 0000735400 | 0274 | C426 | 0470 | D88B | C626 | 1F40 | B800 | 0000 |

```
THU MAR 14 17:31:54 1991  DB_PI.DLL  PAGE 260, LINE 15282

0000735420  00E9  5E00  835F  02ED  E58B  5D1F  CB4D  581E
0000735440  4590  8B55  1EEC  D88E  EC81  0008  5657  46C7
0000735460  00FC  8B00  0846  460B  7406  E903  0006  17B8
0000735500  E900  00EC  5EC4  2606  37FF  76FF  FF0C  0A76
0000735520  E79A  7E45  834A  06C4  4689  8DF8  FC46  5016
0000735540  76FF  FF0C  0A76  5EC4  2606  4F8B  2602  578B
0000735560  8B04  F85E  E3C1  0303  52CB  9A51  4641  46FC
0000735600  C483  890C  FA46  7E83  00FC  0374  12E9  C400
0000735620  0E5E  C02B  8926  0247  8926  B807  01AB  8FE9
0000735640  6B00  FA5E  8B26  8BC3  F85E  E3C1  C403  0676
0000735660  C426  0274  C426  0470  D88B  8B26  2440  5EC4
0000735700  2612  0789  5EC4  2612  37FF  3E9A  2524  834B
0000735720  02C4  5EC4  260E  0789  8926  0257  5EC4  260E
0000735740  478B  2602  070B  0374  06E9  B800  0007  3FE9
0000735760  C400  125E  FF26  6B37  FA5E  8B26  8BC3  F85E
0000736000  E3C1  C403  0676  C426  0274  C426  0470  D88B
0000736020  FF26  2270  FF26  2070  5EC4  260E  77FF  2602
0000736040  37FF  309A  A73E  8347  0AC4  00B8  E900  0000
0000736060  5F5E  ED83  8B02  1FE5  4D5D  0FCB  0200  CD00
0000736100  044A  0000  0300  4E01  013A  8900  0300  7E01
0000736120  013A  8A00  0200  5300  054A  0000  0200  4000
0000736140  093A  0000  0300  6201  013A  3B00  0300  AD01
0000736160  013D  3F00  0300  ED01  013C  4000  0300  8D01
0000736200  013D  4100  0300  BA01  0134  4200  0300  9501
0000736220  0139  4600  0300  6901  0143  4800  0300  C701
0000736240  0139  4A00  0300  2401  0139  4B00  0300  1701
0000736260  010B  5400  0000  0000  0000  0000  0000  0000
0000736300  0000  0000  0200  0000  0000  0000  0000  0000
0000736320  0000  0000  0000  0000  0000  0000  0000  0000
*
0000736400  0000  0000  0200  0000  0000  0000  0000  0000
0000736420  0000  0000  0000  0000  0000  0000  0000  0000
*
0000736500  0000  0000  0200  0000  0000  0000  0000  0000
0000736520  0000  0000  0000  0000  0000  0000  0000  0000
*
0000736600  0000  0000  0200  0000  0000  0000  0000  0000
0000736620  0000  0000  0000  0000  0000  0000  0000  0000
*
0000737420  0000  0000  0000  0016  FEFF  F8FC  E0F0  80C0
0000737440  0000  0000  0000  0000  0000  0000  0000  0000
*
0000737640  4A1C  4D31  4A14  4D0E  4A12  4D0C  4B7E  4F37
0000737660  4C04  4F9A  4C02  4F98  496D  49C0  0000  0000
0000737700  0000  0000  0000  0000  534D  5220  6E75  542D
0000737720  6D69  2065  694C  7262  7261  2079  202D  6F43
0000737740  7970  6972  6867  2074  6328  2029  3931  3039
0000737760  202C  694D  7263  736F  666F  2074  6F43  7072
0000740000  0018  6264  695F  696E  2E74  0063  6264  702E
0000740020  4700  455F  5F57  0054  5F47  5745  545F  0000
0000740040  0042  0066  004C  FFFF  6264  695F  696E  0074
0000740060  5F47  5745  545F  4700  455F  5F57  0054  6264
0000740100  745F  7265  696D  616E  6574  7600  696F  2064
0000740120  002A  6F76  6469  2A20  0000  6264  615F  6C6C
0000740140  636F  7600  696F  2064  002A  6F76  6469  2A20
0000740160  0000  6264  725F  6165  6C6C  636F  6900  746E
0000740200  6900  746E  0000  6264  665F  6572  0065  3A63
0000740220  005C  7263  2E76  6970  0064  6D74  702E  6469
0000740240  7700  2500  0A64  6C25  0075  0072  6425  6C25
```

THU MAR 14 17:31:54 1991 DB_PI.DLL PAGE 261, LINE 15341

| | | | | | | | | |
|---|---|---|---|---|---|---|---|---|
| 0000740260 | 0075 | 6264 | 745F | 6572 | 2E65 | 0063 | 6264 | 702E |
| 0000740300 | 4700 | 455F | 5F57 | 0054 | 5F47 | 5745 | 545F | 0000 |
| 0000740320 | 005C | 4454 | 0000 | 00F2 | 011C | 00FC | 0062 | 6264 |
| 0000740340 | 635F | 6572 | 7461 | 5F65 | 7766 | 745F | 6572 | 0065 |
| 0000740360 | 5F47 | 5745 | 545F | 4700 | 455F | 5F57 | 0054 | 6264 |
| 0000740400 | 725F | 6D65 | 766F | 5F65 | 7766 | 745F | 6572 | 0065 |
| 0000740420 | 5F47 | 5745 | 545F | 4700 | 455F | 5F57 | 0054 | 6264 |
| 0000740440 | 6C5F | 616F | 5F64 | 7766 | 745F | 6572 | 0065 | 5F47 |
| 0000740460 | 5745 | 545F | 4700 | 455F | 5F57 | 0054 | 6264 | 755F |
| 0000740500 | 6C6E | 616F | 5F64 | 7766 | 745F | 6572 | 0065 | 5F47 |
| 0000740520 | 5745 | 545F | 4700 | 455F | 5F57 | 0054 | 6264 | 735F |
| 0000740540 | 7465 | 635F | 7275 | 6572 | 746E | 665F | 6C6F | 6564 |
| 0000740560 | 0072 | 545C | 3231 | 5C33 | 4144 | 5C54 | 4244 | 5C00 |
| 0000740600 | 4F00 | 4A42 | 4D5F | 5041 | 542E | 0042 | 5254 | 4545 |
| 0000740620 | 4D5F | 5041 | 542E | 0042 | 5F47 | 5745 | 545F | 4700 |
| 0000740640 | 455F | 5F57 | 0054 | 6264 | 6C5F | 7369 | 5F74 | 7264 |
| 0000740660 | 7669 | 7365 | 0000 | 6264 | 665F | 6172 | 656D | 632E |
| 0000740700 | 6400 | 2E62 | 0070 | 5F47 | 5745 | 545F | 4700 | 455F |
| 0000740720 | 5F57 | 0054 | 01F6 | 021A | 0201 | 0118 | 6264 | 635F |
| 0000740740 | 6572 | 7461 | 5F65 | 7766 | 6F5F | 6A62 | 635F | 6968 |
| 0000740760 | 646C | 4700 | 455F | 5F57 | 0054 | 5F47 | 5745 | 545F |
| 0000741000 | 0000 | 6264 | 635F | 6572 | 7461 | 5F65 | 7766 | 6F5F |
| 0000741020 | 6A62 | 4700 | 455F | 5F57 | 0054 | 5F47 | 5745 | 545F |
| 0000741040 | 0000 | 6264 | 645F | 6C65 | 7465 | 5F65 | 7766 | 6F5F |
| 0000741060 | 6A62 | 4700 | 455F | 5F57 | 0054 | 5F47 | 5745 | 545F |
| 0000741100 | 0000 | 6264 | 675F | 7465 | 665F | 5F77 | 626F | 5F6A |
| 0000741120 | 6164 | 6174 | 6900 | 746E | 6900 | 746E | 0000 | 6264 |
| 0000741140 | 665F | 6572 | 5F65 | 7766 | 6F5F | 6A62 | 695F | 666E |
| 0000741160 | 006F | 5F47 | 5745 | 545F | 4700 | 455F | 5F57 | 0054 |
| 0000741200 | 6264 | 665F | 5F77 | 6469 | 665F | 6F72 | 5F6D | 6F6C |
| 0000741220 | 7067 | 7461 | 0068 | 5F47 | 5745 | 545F | 4700 | 455F |
| 0000741240 | 5F57 | 0054 | 6264 | 665F | 5F77 | 6F6C | 7067 | 7461 |
| 0000741260 | 5F68 | 7266 | 6D6F | 695F | 0064 | 5F47 | 5745 | 545F |
| 0000741300 | 4700 | 455F | 5F57 | 0054 | 6264 | 675F | 7465 | 665F |
| 0000741320 | 5F77 | 6F6C | 7067 | 7461 | 0068 | 5F47 | 5745 | 545F |
| 0000741340 | 4700 | 455F | 5F57 | 0054 | 6264 | 6C5F | 7369 | 5F74 |
| 0000741360 | 7766 | 6F5F | 6A62 | 635F | 6968 | 646C | 0073 | 5F47 |
| 0000741400 | 5745 | 545F | 4700 | 455F | 5F57 | 0054 | 6264 | 675F |
| 0000741420 | 7465 | 665F | 5F77 | 6170 | 6572 | 746E | 4700 | 455F |
| 0000741440 | 5F57 | 0054 | 5F47 | 5745 | 545F | 0000 | 6264 | 635F |
| 0000741460 | 706F | 5F79 | 7766 | 6F5F | 6A62 | 4700 | 455F | 5F57 |
| 0000741500 | 0054 | 5F47 | 5745 | 545F | 0000 | 6264 | 6D5F | 766F |
| 0000741520 | 5F65 | 7766 | 6F5F | 6A62 | 4700 | 455F | 5F57 | 0054 |
| 0000741540 | 5F47 | 5745 | 545F | 0000 | 6264 | 675F | 7465 | 665F |
| 0000741560 | 5F77 | 626F | 5F6A | 6164 | 6174 | 0000 | 6264 | 615F |
| 0000741600 | 6363 | 7365 | 632E | 6400 | 2E62 | 0070 | 5F47 | 5745 |
| 0000741620 | 545F | 4700 | 455F | 5F57 | 0054 | 5054 | 5300 | 5243 |
| 0000741640 | 5049 | 0054 | 4548 | 4441 | 5245 | 4900 | 474D | 542E |
| 0000741660 | 0042 | 4449 | 2E46 | 4254 | 4900 | 5953 | 542E | 0042 |
| 0000741700 | 005C | 4D49 | 4700 | 544D | 542E | 0042 | 5347 | 2E45 |
| 0000741720 | 4254 | 4700 | 4C54 | 542E | 0042 | 4F41 | 2E49 | 4254 |
| 0000741740 | 4600 | 5254 | 542E | 0042 | 03BC | 042E | 03C7 | 0216 |
| 0000741760 | 6264 | 6F5F | 6570 | 5F6E | 6574 | 7473 | 4700 | 455F |
| 0000742000 | 5F57 | 0054 | 5F47 | 5745 | 545F | 0000 | 6264 | 635F |
| 0000742020 | 6F6C | 6573 | 745F | 7365 | 0074 | 5F47 | 5745 | 545F |
| 0000742040 | 4700 | 455F | 5F57 | 0054 | 6264 | 735F | 6168 | 6572 |
| 0000742060 | 745F | 7365 | 0074 | 5F47 | 5745 | 545F | 4700 | 455F |
| 0000742100 | 5F57 | 0054 | 6264 | 6C5F | 616F | 5F64 | 6473 | 0062 |
| 0000742120 | 5F47 | 5745 | 545F | 4700 | 455F | 5F57 | 0054 | 6264 |

THU MAR 14 17:31:54 1991 DB_PI.DLL PAGE 262, LINE 15400

| | | | | | | | | |
|---|---|---|---|---|---|---|---|---|
| 0000742140 | 755F | 6C6E | 616F | 5F64 | 6473 | 0062 | 5F47 | 5745 |
| 0000742160 | 545F | 4700 | 455F | 5F57 | 0054 | 6264 | 635F | 656C |
| 0000742200 | 6E61 | 735F | 6264 | 4700 | 455F | 5F57 | 0054 | 5F47 |
| 0000742220 | 5745 | 545F | 0000 | 6264 | 635F | 656C | 6E61 | 745F |
| 0000742240 | 7473 | 0000 | 6264 | 735F | 7263 | 7470 | 632E | 6400 |
| 0000742260 | 2E62 | 0070 | 5F47 | 5745 | 545F | 4700 | 455F | 5F57 |
| 0000742300 | 0054 | 5054 | 5C00 | 7700 | 0074 | 04E4 | 0510 | 04EF |
| 0000742320 | 042A | 6264 | 615F | 6363 | 7365 | 5F73 | 7374 | 5F74 |
| 0000742340 | 6373 | 6972 | 7470 | 4700 | 455F | 5F57 | 0054 | 5F47 |
| 0000742360 | 5745 | 545F | 0000 | 6264 | 725F | 6C65 | 6165 | 6573 |
| 0000742400 | 745F | 7473 | 735F | 7263 | 7069 | 0074 | 7325 | 2000 |
| 0000742420 | 0A09 | 2500 | 3133 | 2073 | 203A | 3325 | 7331 | 4E00 |
| 0000742440 | 4D55 | 5300 | 5254 | 5000 | 5241 | 4D41 | 5445 | 5245 |
| 0000742460 | 2053 | 203D | 4E00 | 4D55 | 5300 | 5254 | 5600 | 494F |
| 0000742500 | 0044 | 5C20 | 0A20 | 2020 | 7325 | 2020 | 203A | 2520 |
| 0000742520 | 2073 | 0020 | 000A | 6554 | 7473 | 4820 | 6165 | 6564 |
| 0000742540 | 0072 | 7361 | 6963 | 2300 | 2021 | 7325 | 202C | 7525 |
| 0000742560 | 2C20 | 2520 | 2075 | 202C | 7325 | 2C20 | 2520 | 0A73 |
| 0000742600 | 4E00 | 4D41 | 2045 | 203D | 5400 | 5059 | 2045 | 203D |
| 0000742620 | 4600 | 004C | 5354 | 5400 | 0050 | 4354 | 5400 | 0052 |
| 0000742640 | 4E55 | 4E4B | 574F | 004E | 5541 | 4854 | 524F | 3D20 |
| 0000742660 | 0020 | 4144 | 4554 | 3D20 | 2520 | 646C | 0A20 | 4600 |
| 0000742700 | 4E55 | 5443 | 4F49 | 204E | 203D | 5300 | 4550 | 2043 |
| 0000742720 | 203D | 4600 | 4553 | 5241 | 4843 | 3D20 | 0020 | 5400 |
| 0000742740 | 4553 | 5241 | 4843 | 3D20 | 0020 | 4400 | 5345 | 5243 |
| 0000742760 | 5049 | 4954 | 4E4F | 3D20 | 0020 | 4300 | 4D4F | 454D |
| 0000743000 | 544E | 2053 | 203D | 0000 | 5F47 | 5745 | 545F | 4700 |
| 0000743020 | 455F | 5F57 | 0054 | 005C | 0000 | 6264 | 675F | 7465 |
| 0000743040 | 745F | 7473 | 685F | 6165 | 6564 | 0072 | 414E | 454D |
| 0000743060 | 5400 | 5059 | 0045 | 5054 | 5400 | 0043 | 5541 | 4854 |
| 0000743100 | 524F | 4400 | 5441 | 0045 | 6C25 | 0064 | 5546 | 434E |
| 0000743120 | 4954 | 4E4F | 5300 | 4550 | 0043 | 5346 | 4145 | 4352 |
| 0000743140 | 0048 | 5354 | 4145 | 4352 | 0048 | 4544 | 4353 | 4952 |
| 0000743160 | 5450 | 4F49 | 004E | 4F43 | 4D4D | 4E45 | 5354 | 5000 |
| 0000743200 | 5241 | 4D41 | 5445 | 5245 | 0053 | 6E69 | 0074 | 6E69 |
| 0000743220 | 0074 | 6264 | 665F | 6572 | 5F65 | 7374 | 5F74 | 6468 |
| 0000743240 | 0072 | 5F47 | 5745 | 545F | 4700 | 455F | 5F57 | 0054 |
| 0000743260 | 005C | 7477 | 0000 | 6264 | 735F | 7465 | 745F | 7473 |
| 0000743300 | 685F | 6165 | 6564 | 0072 | 5F47 | 5745 | 545F | 4700 |
| 0000743320 | 455F | 5F57 | 0054 | 6264 | 735F | 5F70 | 6573 | 0074 |
| 0000743340 | 5F47 | 5745 | 545F | 4700 | 455F | 5F57 | 0054 | 6264 |
| 0000743360 | 735F | 5F70 | 6573 | 7261 | 6863 | 0000 | 6264 | 675F |
| 0000743400 | 6E65 | 632E | 6400 | 2E62 | 0070 | 5F47 | 5745 | 545F |
| 0000743420 | 4700 | 455F | 5F57 | 0054 | 073C | 075E | 0745 | 050C |
| 0000743440 | 6264 | 635F | 6572 | 7461 | 5F65 | 6F67 | 6A62 | 4700 |
| 0000743460 | 455F | 5F57 | 0054 | 5F47 | 5745 | 545F | 0000 | 6264 |
| 0000743500 | 6E5F | 7865 | 5F74 | 6F67 | 6A62 | 695F | 0064 | 5F47 |
| 0000743520 | 5745 | 545F | 4700 | 455F | 5F57 | 0054 | 6264 | 645F |
| 0000743540 | 6C65 | 7465 | 5F65 | 6F67 | 6A62 | 4700 | 455F | 5F57 |
| 0000743560 | 0054 | 5F47 | 5745 | 545F | 0000 | 6264 | 6D5F | 646F |
| 0000743600 | 6669 | 5F79 | 6F67 | 6A62 | 4700 | 455F | 5F57 | 0054 |
| 0000743620 | 5F47 | 5745 | 545F | 0000 | 6264 | 675F | 7465 | 675F |
| 0000743640 | 626F | 006A | 5F47 | 5745 | 545F | 4700 | 455F | 5F57 |
| 0000743660 | 0054 | 6264 | 6C5F | 7369 | 5F74 | 6F67 | 6A62 | 0000 |
| 0000743700 | 6264 | 695F | 676D | 632E | 6400 | 2E62 | 0070 | 5F47 |
| 0000743720 | 5745 | 545F | 4700 | 455F | 5F57 | 0054 | 0800 | 0822 |
| 0000743740 | 0809 | 075A | 6264 | 615F | 6C6C | 636F | 695F | 676D |
| 0000743760 | 4700 | 455F | 5F57 | 0054 | 5F47 | 5745 | 545F | 0000 |
| 0000744000 | 6264 | 725F | 6165 | 6C6C | 636F | 695F | 676D | 4700 |

THU MAR 14 17:31:54 1991 DB_PI.DLL PAGE 263, LINE 15459

| | | | | | | | | |
|---|---|---|---|---|---|---|---|---|
| 0000744020 | 455F | 5F57 | 0054 | 5F47 | 5745 | 545F | 0000 | 6264 |
| 0000744040 | 665F | 6572 | 5F65 | 6D69 | 0067 | 5F47 | 5745 | 545F |
| 0000744060 | 4700 | 455F | 5F57 | 0054 | 6264 | 615F | 6464 | 695F |
| 0000744100 | 676D | 4700 | 455F | 5F57 | 0054 | 5F47 | 5745 | 545F |
| 0000744120 | 5C00 | 0000 | 6264 | 615F | 6363 | 7365 | 5F73 | 6D69 |
| 0000744140 | 0067 | 5F47 | 5745 | 545F | 4700 | 455F | 5F57 | 0054 |
| 0000744160 | 6264 | 725F | 6C65 | 6165 | 6573 | 695F | 676D | 4700 |
| 0000744200 | 455F | 5F57 | 0054 | 5F47 | 5745 | 545F | 0000 | 6264 |
| 0000744220 | 645F | 6C65 | 7465 | 5F65 | 6D69 | 0067 | 5F47 | 5745 |
| 0000744240 | 545F | 4700 | 455F | 5F57 | 0054 | 6264 | 6C5F | 7369 |
| 0000744260 | 5F74 | 6D69 | 7367 | 4700 | 455F | 5F57 | 0054 | 5F47 |
| 0000744300 | 5745 | 545F | 7300 | 7263 | 5F6E | 6400 | 6669 | 5F66 |
| 0000744320 | 7300 | 6E79 | 5F63 | 2500 | 2573 | 0064 | 7325 | 3025 |
| 0000744340 | 642A | 0000 | 6264 | 675F | 6E65 | 7265 | 7461 | 5F65 |
| 0000744360 | 6D69 | 5F67 | 616E | 656D | 4700 | 455F | 5F57 | 0054 |
| 0000744400 | 5F47 | 5745 | 545F | 0000 | 6264 | 675F | 7465 | 695F |
| 0000744420 | 676D | 685F | 7264 | 4700 | 455F | 5F57 | 0054 | 5F47 |
| 0000744440 | 5745 | 545F | 0000 | 6264 | 735F | 7465 | 695F | 676D |
| 0000744460 | 685F | 7264 | 4700 | 455F | 5F57 | 0054 | 5F47 | 5745 |
| 0000744500 | 545F | 0000 | 6264 | 735F | 7465 | 695F | 676D | 725F |
| 0000744520 | 6665 | 4700 | 455F | 5F57 | 0054 | 5F47 | 5745 | 545F |
| 0000744540 | 0000 | 6264 | 635F | 6572 | 7461 | 5F65 | 7973 | 636E |
| 0000744560 | 695F | 676D | 0000 | 6264 | 695F | 6F63 | 2E6E | 0063 |
| 0000744600 | 6264 | 702E | 4700 | 455F | 5F57 | 0054 | 5F47 | 5745 |
| 0000744620 | 545F | 0000 | 09B6 | 09DA | 09C0 | 081E | 6264 | 615F |
| 0000744640 | 6C6C | 636F | 695F | 6F63 | 006E | 5F47 | 5745 | 545F |
| 0000744660 | 4700 | 455F | 5F57 | 0054 | 6264 | 665F | 6572 | 5F65 |
| 0000744700 | 6369 | 6E6F | 4700 | 455F | 5F57 | 0054 | 5F47 | 5745 |
| 0000744720 | 545F | 0000 | 6264 | 615F | 6464 | 695F | 6F63 | 006E |
| 0000744740 | 5F47 | 5745 | 545F | 4700 | 455F | 5F57 | 0054 | 6264 |
| 0000744760 | 645F | 6C65 | 7465 | 5F65 | 6369 | 6E6F | 4700 | 455F |
| 0000745000 | 5F57 | 0054 | 5F47 | 5745 | 545F | 0000 | 6264 | 675F |
| 0000745020 | 7465 | 695F | 6F63 | 006E | 5F47 | 5745 | 545F | 4700 |
| 0000745040 | 455F | 5F57 | 0054 | 6264 | 675F | 7465 | 695F | 6F63 |
| 0000745060 | 5F6E | 6468 | 0072 | 5F47 | 5745 | 545F | 4700 | 455F |
| 0000745100 | 5F57 | 0054 | 6264 | 735F | 7465 | 695F | 6F63 | 5F6E |
| 0000745120 | 6468 | 0072 | 5F47 | 5745 | 545F | 4700 | 455F | 5F57 |
| 0000745140 | 0054 | 6264 | 6C5F | 7369 | 5F74 | 6369 | 6E6F | 0073 |
| 0000745160 | 6264 | 6C5F | 6D69 | 2E67 | 0063 | 6264 | 702E | 4700 |
| 0000745200 | 455F | 5F57 | 0054 | 5F47 | 5745 | 545F | 3000 | 7430 |
| 0000745220 | 706D | 3030 | 5C00 | 0000 | 0AB0 | 0ADE | 0ABA | 09D6 |
| 0000745240 | 6264 | 695F | 676D | 735F | 6174 | 7472 | 775F | 6972 |
| 0000745260 | 6574 | 4700 | 455F | 5F57 | 0054 | 5F47 | 5745 | 545F |
| 0000745300 | 0000 | 6264 | 695F | 676D | 775F | 6972 | 6574 | 6C5F |
| 0000745320 | 7961 | 7265 | 4700 | 455F | 5F57 | 0054 | 5F47 | 5745 |
| 0000745340 | 545F | 0000 | 6264 | 695F | 676D | 775F | 6972 | 6574 |
| 0000745360 | 735F | 6769 | 4700 | 455F | 5F57 | 0054 | 5F47 | 5745 |
| 0000745400 | 545F | 0000 | 6264 | 695F | 676D | 655F | 646E | 775F |
| 0000745420 | 6972 | 6574 | 4700 | 455F | 5F57 | 0054 | 5F47 | 5745 |
| 0000745440 | 545F | 5C00 | 0000 | 6264 | 695F | 676D | 635F | 6E61 |
| 0000745460 | 6563 | 5F6C | 706F | 4700 | 455F | 5F57 | 0054 | 5F47 |
| 0000745500 | 5745 | 545F | 5C00 | 0000 | 6264 | 695F | 676D | 735F |
| 0000745520 | 6174 | 7472 | 615F | 6363 | 7365 | 0073 | 5F47 | 5745 |
| 0000745540 | 545F | 4700 | 455F | 5F57 | 0054 | 6264 | 695F | 676D |
| 0000745560 | 615F | 6363 | 7365 | 5F73 | 616C | 6579 | 0072 | 5F47 |
| 0000745600 | 5745 | 545F | 4700 | 455F | 5F57 | 0054 | 6264 | 695F |
| 0000745620 | 676D | 615F | 6363 | 7365 | 5F73 | 6973 | 0067 | 3030 |
| 0000745640 | 6D74 | 3070 | 0030 | 005C | 005C | 5F47 | 5745 | 545F |
| 0000745660 | 4700 | 455F | 5F57 | 0054 | 6264 | 695F | 676D | 725F |

THU MAR 14 17:31:54 1991 DB_PI.DLL PAGE 264, LINE 15518

| | | | | | | | | |
|---|---|---|---|---|---|---|---|---|
| 0000745700 | 6C65 | 6165 | 6573 | 6C5F | 7961 | 7265 | 4700 | 455F |
| 0000745720 | 5F57 | 0054 | 5F47 | 5745 | 545F | 0000 | 6264 | 695F |
| 0000745740 | 676D | 725F | 6C65 | 6165 | 6573 | 735F | 6769 | 4700 |
| 0000745760 | 455F | 5F57 | 0054 | 5F47 | 5745 | 545F | 0000 | 6264 |
| 0000746000 | 695F | 676D | 655F | 646E | 615F | 6363 | 7365 | 0073 |
| 0000746020 | 5F47 | 5745 | 545F | 4700 | 455F | 5F57 | 0054 | 6264 |
| 0000746040 | 695F | 676D | 715F | 6575 | 7972 | 625F | 5F67 | 7473 |
| 0000746060 | 7461 | 7375 | 5C00 | 5C00 | 5C00 | 5C00 | 0000 | 6264 |
| 0000746100 | 665F | 746C | 2E72 | 0063 | 6264 | 702E | 5C00 | 0000 |
| 0000746120 | 0C7E | 0C96 | 0C88 | 0ADA | 5F47 | 5745 | 545F | 4700 |
| 0000746140 | 455F | 5F57 | 0054 | 6264 | 615F | 6464 | 665F | 746C |
| 0000746160 | 0072 | 5F47 | 5745 | 545F | 4700 | 455F | 5F57 | 0054 |
| 0000746200 | 6264 | 645F | 6C65 | 7465 | 5F65 | 6C66 | 7274 | 4700 |
| 0000746220 | 455F | 5F57 | 0054 | 5F47 | 5745 | 545F | 0000 | 6264 |
| 0000746240 | 675F | 7465 | 665F | 6C69 | 6574 | 0072 | 5F47 | 5745 |
| 0000746260 | 545F | 4700 | 455F | 5F57 | 0054 | 6264 | 735F | 6165 |
| 0000746300 | 6372 | 5F68 | 6966 | 746C | 7265 | 6C5F | 7369 | 0074 |
| 0000746320 | 5F47 | 5745 | 545F | 4700 | 455F | 5F57 | 0054 | 6264 |
| 0000746340 | 6C5F | 7369 | 5F74 | 6C66 | 7274 | 0073 | 6264 | 615F |
| 0000746360 | 696F | 632E | 6400 | 2E62 | 0070 | 4244 | 415F | 494F |
| 0000746400 | 545F | 2A20 | 4400 | 5F42 | 4F41 | 5F49 | 2054 | 002A |
| 0000746420 | 0D2C | 0D56 | 0D35 | 0C92 | 6264 | 615F | 6C6C | 636F |
| 0000746440 | 615F | 696F | 4700 | 455F | 5F57 | 0054 | 5F47 | 5745 |
| 0000746460 | 545F | 0000 | 6264 | 615F | 6464 | 615F | 696F | 4700 |
| 0000746500 | 455F | 5F57 | 0054 | 5F47 | 5745 | 545F | 0000 | 6264 |
| 0000746520 | 645F | 6C65 | 7465 | 5F65 | 6F61 | 0069 | 5F47 | 5745 |
| 0000746540 | 545F | 4700 | 455F | 5F57 | 0054 | 6264 | 675F | 7465 |
| 0000746560 | 615F | 696F | 4700 | 455F | 5F57 | 0054 | 5F47 | 5745 |
| 0000746600 | 545F | 0000 | 6264 | 615F | 696F | 615F | 6464 | 665F |
| 0000746620 | 746C | 0072 | 5F47 | 5745 | 545F | 4700 | 455F | 5F57 |
| 0000746640 | 0054 | 6264 | 615F | 696F | 645F | 6C65 | 665F | 746C |
| 0000746660 | 0072 | 5F47 | 5745 | 545F | 4700 | 455F | 5F57 | 0054 |
| 0000746700 | 6264 | 615F | 696F | 675F | 7465 | 665F | 746C | 0072 |
| 0000746720 | 5F47 | 5745 | 545F | 4700 | 455F | 5F57 | 0054 | 6264 |
| 0000746740 | 615F | 696F | 675F | 7465 | 665F | 746C | 5F72 | 736C |
| 0000746760 | 0074 | 5F47 | 5745 | 545F | 4700 | 455F | 5F57 | 0054 |
| 0000747000 | 6264 | 6C5F | 7369 | 5F74 | 6F61 | 0069 | 6264 | 6D5F |
| 0000747020 | 6D65 | 632E | 6400 | 2E62 | 0070 | 5942 | 4554 | 5F20 |
| 0000747040 | 7568 | 6567 | 2A20 | 4200 | 5459 | 2045 | 685F | 6775 |
| 0000747060 | 2065 | 002A | 0E4C | 0E7A | 0E55 | 0D52 | 6264 | 6D5F |
| 0000747100 | 6D65 | 7063 | 0079 | 6E69 | 0074 | 6E69 | 0074 | 6264 |
| 0000747120 | 6D5F | 6D65 | 635F | 706D | 4200 | 5459 | 2045 | 685F |
| 0000747140 | 6775 | 2065 | 002A | 5942 | 4554 | 5F20 | 7568 | 6567 |
| 0000747160 | 2A20 | 0000 | 6264 | 6D5F | 6D65 | 6573 | 0074 | 5942 |
| 0000747200 | 4554 | 5F20 | 7568 | 6567 | 2A20 | 4200 | 5459 | 2045 |
| 0000747220 | 685F | 6775 | 2065 | 002A | 6264 | 6D5F | 6D65 | 6863 |
| 0000747240 | 0072 | 5942 | 4554 | 5F20 | 7568 | 6567 | 2A20 | 4200 |
| 0000747260 | 5459 | 2045 | 685F | 6775 | 2065 | 002A | 6264 | 6D5F |
| 0000747300 | 6D65 | 6E5F | 746F | 635F | 7268 | 4400 | 5F42 | 4953 |
| 0000747320 | 455A | 545F | 4400 | 5F42 | 4953 | 455A | 545F | 6200 |
| 0000747340 | 665F | 7277 | 7469 | 5F65 | 7270 | 666F | 6C69 | 0065 |
| 0000747360 | 5F62 | 7766 | 6972 | 6574 | 705F | 6F72 | 6966 | 656C |
| 0000747400 | 0A00 | 540A | 746F | 6C61 | 7420 | 6D69 | 2065 | 7375 |
| 0000747420 | 6465 | 6220 | 2079 | 6264 | 665F | 7277 | 7469 | 3A65 |
| 0000747440 | 2520 | 2E31 | 6632 | 6620 | 726F | 2520 | 646C | 6220 |
| 0000747460 | 7479 | 7365 | 202E | 0909 | 2009 | 5420 | 7268 | 756F |
| 0000747500 | 6867 | 7570 | 2074 | 203D | 3125 | 322E | 2066 | 624B |
| 0000747520 | 732F | 6365 | 000A | 5F62 | 7766 | 6972 | 6574 | 705F |
| 0000747540 | 6F72 | 6966 | 656C | 0A00 | 540A | 6968 | 2073 | 706F |

THU MAR 14 17:31:54 1991 DB_PI.DLL PAGE 265, LINE 15577

| | | | | | | | | |
|---|---|---|---|---|---|---|---|---|
| 0000747560 | 7265 | 7461 | 6F69 | 206E | 6F74 | 6B6F | 2520 | 2E31 |
| 0000747600 | 6632 | 7320 | 6365 | 6E6F | 7364 | 6620 | 726F | 2520 |
| 0000747620 | 646C | 6220 | 7479 | 7365 | 0A2E | 000A | 5F62 | 7766 |
| 0000747640 | 6972 | 6574 | 705F | 6F72 | 6966 | 656C | 0000 | 6264 |
| 0000747660 | 665F | 7277 | 7469 | 0065 | 0000 | 0000 | 0000 | 0000 |
| 0000747700 | 4244 | 535F | 5A49 | 5F45 | 0054 | 4244 | 535F | 5A49 |
| 0000747720 | 5F45 | 0054 | 6F44 | 4373 | 6768 | 6946 | 656C | 6F50 |
| 0000747740 | 2073 | 6166 | 6C69 | 6465 | 202E | 7265 | 2072 | 6F63 |
| 0000747760 | 6564 | 3D20 | 2520 | 2E75 | 000A | 6F44 | 5773 | 6972 |
| 0000750000 | 6574 | 6620 | 6961 | 656C | 2C64 | 6520 | 7272 | 6320 |
| 0000750020 | 646F | 2065 | 203D | 7525 | 0A2E | 4400 | 736F | 7257 |
| 0000750040 | 7469 | 2065 | 6166 | 6C69 | 6465 | 202C | 7265 | 2072 |
| 0000750060 | 6F63 | 6564 | 3D20 | 2520 | 2E75 | 000A | 6F44 | 5773 |
| 0000750100 | 6972 | 6574 | 6620 | 6961 | 656C | 2C64 | 6520 | 7272 |
| 0000750120 | 6320 | 646F | 2065 | 203D | 7525 | 0A2E | 5400 | 746F |
| 0000750140 | 6C61 | 7420 | 6D69 | 2065 | 7375 | 6465 | 6220 | 2079 |
| 0000750160 | 6F44 | 5F73 | 7257 | 7469 | 3A65 | 2520 | 2E31 | 6632 |
| 0000750200 | 6620 | 726F | 2520 | 646C | 6220 | 7479 | 7365 | 202E |
| 0000750220 | 6854 | 6F72 | 6775 | 7068 | 7475 | 3D20 | 2520 | 2E31 |
| 0000750240 | 6632 | 4B20 | 2F62 | 6573 | 0A63 | 0000 | 0000 | 0000 |
| 0000750260 | 0000 | 0000 | 6264 | 665F | 7277 | 7469 | 0065 | 4244 |
| 0000750300 | 535F | 5A49 | 5F45 | 0054 | 4244 | 535F | 5A49 | 5F45 |
| 0000750320 | 0054 | 6264 | 665F | 6572 | 6461 | 0000 | 5446 | 2E52 |
| 0000750340 | 4254 | 4900 | 4F43 | 542E | 0042 | 6264 | 705F | 0069 |
| 0000750360 | 0000 | 0000 | 0000 | 0000 | 0000 | 0000 | 0000 | 0000 |
| 0000750400 | 3A54 | 005C | 3A54 | 005C | 545C | 3231 | 5C33 | 4144 |
| 0000750420 | 5C54 | 4244 | 4F00 | 4A42 | 4D5F | 5041 | 542E | 0042 |
| 0000750440 | 5254 | 4545 | 4D5F | 5041 | 542E | 0042 | 0920 | 000A |
| 0000750460 | 3154 | 3332 | 545F | 4552 | 5F45 | 5244 | 5649 | 0045 |
| 0000750500 | 3154 | 3332 | 475F | 4F4C | 5F42 | 4946 | 544C | 5245 |
| 0000750520 | 4C5F | 4249 | 5400 | 3231 | 5F33 | 4C47 | 424F | 505F |
| 0000750540 | 494F | 544E | 5245 | 4C5F | 4249 | 5400 | 3231 | 5F33 |
| 0000750560 | 5953 | 434E | 495F | 474D | 415F | 4343 | 5400 | 3231 |
| 0000750600 | 5F33 | 544D | 475F | 5F4E | 4341 | 0043 | 3154 | 3332 |
| 0000750620 | 535F | 5F45 | 4E47 | 415F | 4343 | 5400 | 3231 | 5F33 |
| 0000750640 | 4C54 | 475F | 5F4E | 4341 | 0043 | 3030 | 6D74 | 3070 |
| 0000750660 | 0030 | 002E | 002A | 005C | 3030 | 6D74 | 3070 | 0030 |
| 0000750700 | 002E | 002A | 005C | 005C | 005C | 0000 | 0000 | 0000 |
| 0000750720 | 0000 | 0000 | 0000 | 0000 | 0000 | 0000 | 0000 | 6277 |
| 0000750740 | 7200 | 0062 | 200A | 4244 | 4520 | 5252 | 524F | 2121 |
| 0000750760 | 2021 | 7257 | 7469 | 2065 | 6D49 | 6761 | 2065 | 6F74 |
| 0000751000 | 4620 | 6C69 | 2065 | 6146 | 6C69 | 6465 | 2120 | 2121 |
| 0000751020 | 0A20 | 2000 | 6142 | 6B63 | 7267 | 756F | 646E | 7720 |
| 0000751040 | 6972 | 6574 | 6520 | 7272 | 2D20 | 2520 | 646C | 0A20 |
| 0000751060 | 0000 | 7200 | 2B62 | 7200 | 0062 | 200A | 4244 | 4520 |
| 0000751100 | 5252 | 524F | 2121 | 2021 | 7257 | 7469 | 2065 | 614C |
| 0000751120 | 6579 | 2072 | 6F74 | 4620 | 6C69 | 2065 | 6146 | 6C69 |
| 0000751140 | 6465 | 2120 | 2121 | 0A20 | 2000 | 6142 | 6B63 | 7267 |
| 0000751160 | 756F | 646E | 7720 | 6972 | 6574 | 6520 | 7272 | 2D20 |
| 0000751200 | 2520 | 646C | 0A20 | 0000 | 005C | 4349 | 2E4F | 4254 |
| 0000751220 | 0000 | 6264 | 635F | 6766 | 632E | 6400 | 2E62 | 0070 |
| 0000751240 | 002F | 6F63 | 666E | 6769 | 742E | 6663 | 0000 | 12D2 |
| 0000751260 | 12F4 | 12DB | 0E76 | 3A43 | 005C | 3154 | 3332 | 435F |
| 0000751300 | 4746 | 505F | 5441 | 0048 | 005C | 7973 | 7473 | 6D65 |
| 0000751320 | 742E | 6663 | 2E00 | 5C2E | 6164 | 5C74 | 6D00 | 7361 |
| 0000751340 | 6574 | 2E72 | 6374 | 0066 | 5F47 | 5745 | 545F | 4700 |
| 0000751360 | 455F | 5F57 | 0054 | 6264 | 6C5F | 616F | 5F64 | 6663 |
| 0000751400 | 0067 | 5F47 | 5745 | 545F | 4700 | 455F | 5F57 | 0054 |
| 0000751420 | 6264 | 755F | 6C6E | 616F | 5F64 | 6663 | 0067 | 6C25 |

```
THU MAR 14 17:31:54 1991  DB_PI.DLL  PAGE 266, LINE 15636

0000751440   0069  6C25  0075  7525  2500  7335  5400  5552
0000751460   0045  4E4F  4600  4C41  4553  4F00  4646  2500
0000751500   0066  5F47  5745  545F  4700  455F  5F57  0054
0000751520   6264  675F  7465  635F  6766  6E5F  6D75  695F
0000751540   6574  006D  5F47  5745  545F  4700  455F  5F57
0000751560   0054  6264  675F  7465  635F  6766  6E5F  6D75
0000751600   695F  6574  5F6D  696C  7473  4700  455F  5F57
0000751620   0054  5F47  5745  545F  0000  6264  675F  7465
0000751640   635F  6766  735F  7274  695F  6574  006D  5F47
0000751660   5745  545F  4700  455F  5F57  0054  6264  675F
0000751700   7465  635F  6766  735F  7274  6C5F  7369  5F74
0000751720   7469  6D65  0000  7464  5F63  656C  2E78  006C
0000751740   6264  702E  0000  1416  142C  1420  12F0  0000
0000751760   0001  0000  0000  0000  0000  0000  0000  0001
0000752000   2400  2425  2725  2428  2827  2826  2827  2827
0000752020   2709  0B28  2827  0C03  2827  2725  2028  2827
0000752040   270A  1328  2725  0828  2827  2827  2623  0A28
0000752060   2827  1312  2725  2428  0321  2620  060D  0211
0000752100   2025  130F  0125  191D  1516  1B1A  181C  1417
0000752120   1E1F  2322  0726  120F  2513  0421  050D  0206
0000752140   100E  010F  0F07  0E04  FE00  05FE  0A07  0E0C
0000752160   1310  1A16  201D  2723  2C2A  322F  3837  3939
0000752200   3B3A  3C3C  3E3D  3E3E  403F  4241  4543  4645
0000752220   4847  4A49  4C4B  4E4D  504F  5251  5352  5755
0000752240   5B5A  5D5B  5F5F  6160  6362  6463  6766  6868
0000752260   0068  0000  0000  0076  0543  0078  007A  007A
0000752300   00A3  007E  0543  0543  0000  007D  0000  0000
0000752320   00E8  007E  0080  0000  0000  00F2  0082  0095
0000752340   0543  0083  0084  00EB  0543  0543  00F4  008D
0000752360   0543  0085  0000  0087  0000  0000  0088  008A
0000752400   008C  0543  0543  0543  0543  0543  0543  0543
0000752420   0543  0543  0543  0543  00EE  0543  0090  0000
0000752440   0000  00F7  00F8  00FC  0543  0080  00FD  0100
0000752460   0543  0000  008A  010A  0000  0110  0115  007B
0000752500   0543  015C  01DB  022B  0265  02B0  02EA  0335
0000752520   03AF  03FF  044A  04C4  0000  0047  0001  0047
0000752540   0047  0047  0048  0049  0047  0047  0047  004A
0000752560   0047  004B  004C  0047  0047  0047  004D  004E
0000752600   0047  0047  0049  0047  0047  0047  0048  0047
0000752620   0047  0048  0049  0047  004F  004A  0047  0050
0000752640   004C  0047  0047  0047  0047  0047  0047  0047
0000752660   0047  0047  0047  0047  0047  0047  0047  0047
0000752700   0047  0047  0051  004E  0047  0048  0047  0047
0000752720   004F  004F  0047  0047  0050  0052  0047  0051
0000752740   0047  0047  0052  8001  0047  0047  0047  0047
0000752760   0047  0047  0047  0047  0047  0047  0047  0000
0000753000   0003  0003  0003  0003  0003  0003  0003  0003
0000753020   0004  0005  0003  0003  0003  0003  0003  0003
0000753040   0003  0003  0003  0003  0003  0003  0003  0003
0000753060   0003  0003  0003  0003  0003  0003  0003  0004
0000753100   0003  0006  0007  0008  0003  0003  0003  0009
0000753120   000A  0003  0003  0003  0003  0003  0003  000B
0000753140   000B  000B  000B  000B  000B  000B  000B  000B
0000753160   000B  0003  0003  0003  000C  0003  0003  000D
0000753200   000E  000E  000E  000E  000E  000E  000E  000E
*
0000753260   000E  000E  0003  000F  0003  0010  000E  0003
0000753300   000E  000E  000E  000E  000E  000E  000E  000E
*
```

```
THU MAR 14 17:31:54 1991  DB_PI.DLL  PAGE 267, LINE 15695

0000753360  000E  000E  0003  0003  0003  0003  0003  0011
0000753400  0014  0015  0019  001B  0026  0022  0033  0034
0000753420  0035  003E  0038  0022  0019  003D  003E  0022
0000753440  0025  0026  0042  0026  0025  0026  001F  0014
0000753460  0035  0019  0016  001C  0022  0033  001F  0035
0000753500  0017  0038  0022  0019  003D  0020  0022  0025
0000753520  0047  0042  0041  0025  001F  003F  0041  0035
0000753540  0047  0047  0047  0047  0018  0012  0013  0013
0000753560  0013  0013  0013  0013  0013  0013  0013  0013
*
0000753640  0047  0047  0047  0047  0013  001D  0013  0013
0000753660  0013  0013  0013  0013  0013  0013  0013  0013
*
0000753740  0025  0026  0047  0047  001B  0047  0033  0034
0000753760  0047  0047  0014  0015  0039  003A  0047  0038
0000754000  0039  003A  0047  0047  0044  003D  003E  0027
0000754020  0045  0028  0029  002A  001C  0033  002B  002C
0000754040  002D  0014  0042  0039  0016  003B  0038  0039
0000754060  0044  001C  0017  0044  003D  0045  0047  0045
0000754100  0047  0047  0047  0047  002E  003F  0047  002F
0000754120  0047  0042  0047  0047  0047  0047  0018  0044
0000754140  0047  0047  0047  0047  0045  0047  0047  0047
0000754160  0047  0047  0047  0047  0047  0047  0047  0047
0000754200  0047  0047  0047  0030  0047  0047  001D  0047
0000754220  0047  0047  0047  0047  0047  0047  0047  001D
0000754240  0047  0047  0047  001D  0047  0031  0047  0047
0000754260  0047  0047  0047  0032  001A  001A  001A  001A
0000754300  001A  001A  001A  001A  001A  001A  001A  001A
*
0000754660  001A  001A  001A  001E  001E  001E  001E  001E
0000754700  001E  001E  001E  001E  001E  001E  001E  001E
*
0000755260  001E  001E  0021  0021  0021  0021  0021  0021
0000755300  0021  0021  0021  0021  0047  0047  0047  0047
0000755320  0047  0047  0047  0021  0021  0021  0021  0021
0000755340  0021  0021  0021  0021  0021  0021  0021  0021
*
0000755400  0021  0021  0021  0021  0021  0047  0047  0047
0000755420  0047  0021  0047  0021  0021  0021  0021  0021
0000755440  0021  0021  0021  0021  0021  0021  0021  0021
*
0000755500  0021  0021  0021  0021  0021  0023  0023  0023
0000755520  0023  0023  0023  0023  0023  0023  0023  0023
*
0000755560  0023  0023  0023  0023  0023  0023  0023  0047
0000755600  0047  0047  0047  0023  0047  0023  0023  0023
0000755620  0023  0023  0023  0023  0023  0023  0023  0023
*
0000755660  0023  0023  0023  0023  0023  0023  0023  0024
0000755700  0024  0024  0024  0024  0024  0024  0024  0024
0000755720  0024  0047  0047  0047  0047  0047  0047  0047
0000755740  0024  0024  0024  0024  0024  0024  0024  0024
*
0000756020  0024  0024  0047  0047  0047  0047  0024  0047
0000756040  0024  0024  0024  0024  0024  0024  0024  0024
*
0000756120  0024  0024  0036  0036  0036  0036  0036  0036
0000756140  0036  0036  0036  0036  0036  0036  0036  0036
*
```

```
THU MAR 14 17:31:54 1991  DB_PI.DLL  PAGE 268, LINE 15754

0000756200  0036  0036  0036  0036  0047  0047  0047  0047
0000756220  0036  0047  0036  0036  0036  0036  0036  0036
0000756240  0036  0036  0036  0036  0036  0036  0036  0036
*
0000756300  0036  0036  0036  0036  0037  0037  0037  0037
0000756320  0037  0037  0037  0037  0037  0037  0047  0047
0000756340  0047  0047  0047  0047  0047  0037  0037  0037
0000756360  0037  0037  0037  0037  0037  0037  0037  0037
*
0000756420  0037  0037  0037  0037  0037  0037  0037  0047
0000756440  0047  0047  0047  0037  0047  0037  0037  0037
0000756460  0037  0037  0037  0037  0037  0037  0037  0037
*
0000756520  0037  0037  0037  0037  0037  0037  0037  003C
0000756540  003C  003C  003C  003C  003C  003C  003C  003C
*
0000757120  003C  003C  003C  003C  003C  003C  0040  0040
0000757140  0040  0040  0040  0040  0040  0040  0040  0040
0000757160  0047  0047  0047  0047  0047  0047  0047  0040
0000757200  0040  0040  0040  0040  0040  0040  0040  0040
*
0000757260  0040  0047  0047  0047  0047  0040  0047  0040
0000757300  0040  0040  0040  0040  0040  0040  0040  0040
*
0000757360  0040  0043  0043  0043  0043  0043  0043  0043
0000757400  0043  0043  0043  0047  0047  0047  0047  0047
0000757420  0047  0047  0043  0043  0043  0043  0043  0043
0000757440  0043  0043  0043  0043  0043  0043  0043  0043
*
0000757500  0043  0043  0043  0043  0047  0047  0047  0047
0000757520  0043  0047  0043  0043  0043  0043  0043  0043
0000757540  0043  0043  0043  0043  0043  0043  0043  0043
*
0000757600  0043  0043  0043  0043  0046  0046  0046  0046
0000757620  0046  0046  0046  0046  0046  0046  0046  0046
*
0000760200  0046  0046  0046  0047  0047  0047  0047  0047
0000760220  0047  0047  0047  0047  0047  0047  0047  0047
*
0000760600  0047  0047  0000  0001  0001  0001  0001  0001
0000760620  0001  0001  0001  0001  0001  0001  0001  0001
*
0000761200  0001  0001  0002  0004  0004  0005  0006  0046
0000761220  000C  0010  0010  0011  003C  0015  0018  0019
0000761240  0020  0020  0022  0025  0025  0026  0041  0027
0000761260  0027  001E  0004  0035  0005  0004  0006  000C
0000761300  0010  0016  0011  0004  0015  0018  0019  0020
0000761320  0008  0022  0025  003C  0026  0025  0027  0007
0000761340  0020  0027  0035  0000  0000  0000  0000  0004
0000761360  0002  0002  0002  0002  0002  0002  0002  0002
*
0000761440  0002  0002  0002  0000  0000  0000  0000  0002
0000761460  0006  0002  0002  0002  0002  0002  0002  0002
0000761500  0002  0002  0002  0002  0002  0002  0002  0002
*
0000761540  0002  0002  0002  000F  000F  0000  0000  001A
0000761560  0000  0033  0033  0000  0000  0014  0014  001D
0000761600  001D  0000  0038  0039  0039  0000  0000  003A
0000761620  003D  003D  000F  003E  000F  000F  000F  001A
```

THU MAR 14 17:31:54 1991 DB_PI.DLL PAGE 269, LINE 15813

| | | | | | | | | |
|---|---|---|---|---|---|---|---|---|
| 0000761640 | 0033 | 000F | 000F | 000F | 0014 | 0042 | 001D | 0014 |
| 0000761660 | 001D | 0038 | 0039 | 0044 | 0039 | 0014 | 003A | 003D |
| 0000761700 | 0045 | 0000 | 003E | 0000 | 0000 | 0000 | 0000 | 000F |
| 0000761720 | 003D | 0000 | 000F | 0000 | 0042 | 0000 | 0000 | 0000 |
| 0000761740 | 0000 | 0014 | 0044 | 0000 | 0000 | 0000 | 0000 | 0045 |
| 0000761760 | 0000 | 0000 | 0000 | 0000 | 0000 | 0000 | 0000 | 0000 |
| 0000762000 | 0000 | 0000 | 0000 | 0000 | 0000 | 0000 | 000F | 0000 |
| 0000762020 | 0000 | 001A | 0000 | 0000 | 0000 | 0000 | 0000 | 0000 |
| 0000762040 | 0000 | 0000 | 001D | 0000 | 0000 | 0000 | 0039 | 0000 |
| 0000762060 | 000F | 0000 | 0000 | 0000 | 0000 | 0000 | 000F | 0048 |
| 0000762100 | 0048 | 0048 | 0048 | 0048 | 0048 | 0048 | 0048 | 0048 |
| * | | | | | | | | |
| 0000762460 | 0048 | 0048 | 0048 | 0048 | 0048 | 0048 | 0049 | 0049 |
| 0000762500 | 0049 | 0049 | 0049 | 0049 | 0049 | 0049 | 0049 | 0049 |
| * | | | | | | | | |
| 0000763060 | 0049 | 0049 | 0049 | 0049 | 0049 | 004A | 004A | 004A |
| 0000763100 | 004A | 004A | 004A | 004A | 004A | 004A | 004A | 0000 |
| 0000763120 | 0000 | 0000 | 0000 | 0000 | 0000 | 0000 | 004A | 004A |
| 0000763140 | 004A | 004A | 004A | 004A | 004A | 004A | 004A | 004A |
| * | | | | | | | | |
| 0000763220 | 0000 | 0000 | 0000 | 0000 | 004A | 0000 | 004A | 004A |
| 0000763240 | 004A | 004A | 004A | 004A | 004A | 004A | 004A | 004A |
| * | | | | | | | | |
| 0000763320 | 004B | 004B | 004B | 004B | 004B | 004B | 004B | 004B |
| * | | | | | | | | |
| 0000763400 | 004B | 004B | 0000 | 0000 | 0000 | 0000 | 004B | 0000 |
| 0000763420 | 004B | 004B | 004B | 004B | 004B | 004B | 004B | 004B |
| * | | | | | | | | |
| 0000763500 | 004B | 004B | 004C | 004C | 004C | 004C | 004C | 004C |
| 0000763520 | 004C | 004C | 004C | 004C | 0000 | 0000 | 0000 | 0000 |
| 0000763540 | 0000 | 0000 | 0000 | 004C | 004C | 004C | 004C | 004C |
| 0000763560 | 004C | 004C | 004C | 004C | 004C | 004C | 004C | 004C |
| * | | | | | | | | |
| 0000763620 | 004C | 004C | 004C | 004C | 004C | 0000 | 0000 | 0000 |
| 0000763640 | 0000 | 004C | 0000 | 004C | 004C | 004C | 004C | 004C |
| 0000763660 | 004C | 004C | 004C | 004C | 004C | 004C | 004C | 004C |
| * | | | | | | | | |
| 0000763720 | 004C | 004C | 004C | 004C | 004C | 004D | 004D | 004D |
| 0000763740 | 004D | 004D | 004D | 004D | 004D | 004D | 004D | 004D |
| * | | | | | | | | |
| 0000764000 | 004D | 004D | 004D | 004D | 004D | 004D | 004D | 0000 |
| 0000764020 | 0000 | 0000 | 0000 | 004D | 0000 | 004D | 004D | 004D |
| 0000764040 | 004D | 004D | 004D | 004D | 004D | 004D | 004D | 004D |
| * | | | | | | | | |
| 0000764100 | 004D | 004D | 004D | 004D | 004D | 004D | 004D | 004E |
| 0000764120 | 004E | 004E | 004E | 004E | 004E | 004E | 004E | 004E |
| 0000764140 | 004E | 0000 | 0000 | 0000 | 0000 | 0000 | 0000 | 0000 |
| 0000764160 | 004E | 004E | 004E | 004E | 004E | 004E | 004E | 004E |
| * | | | | | | | | |
| 0000764240 | 004E | 004E | 0000 | 0000 | 0000 | 0000 | 004E | 0000 |
| 0000764260 | 004E | 004E | 004E | 004E | 004E | 004E | 004E | 004E |
| * | | | | | | | | |
| 0000764340 | 004E | 004E | 004F | 004F | 004F | 004F | 004F | 004F |
| 0000764360 | 004F | 004F | 004F | 004F | 004F | 004F | 004F | 004F |
| * | | | | | | | | |
| 0000764740 | 004F | 0050 | 0050 | 0050 | 0050 | 0050 | 0050 | 0050 |
| 0000764760 | 0050 | 0050 | 0050 | 0000 | 0000 | 0000 | 0000 | 0000 |
| 0000765000 | 0000 | 0000 | 0050 | 0050 | 0050 | 0050 | 0050 | 0050 |
| 0000765020 | 0050 | 0050 | 0050 | 0050 | 0050 | 0050 | 0050 | 0050 |

```
THU MAR 14 17:31:54 1991  DB_PI.DLL   PAGE 270, LINE 15872

*
0000765060   0050   0050   0050   0050   0000   0000   0000   0000
0000765100   0050   0000   0050   0050   0050   0050   0050   0050
0000765120   0050   0050   0050   0050   0050   0050   0050   0050
*
0000765160   0050   0050   0050   0050   0051   0051   0051   0051
0000765200   0051   0051   0051   0051   0051   0051   0000   0000
0000765220   0000   0000   0000   0000   0000   0051   0051   0051
0000765240   0051   0051   0051   0051   0051   0051   0051   0051
*
0000765300   0051   0051   0051   0051   0051   0051   0051   0000
0000765320   0000   0000   0000   0051   0000   0051   0051   0051
0000765340   0051   0051   0051   0051   0051   0051   0051   0051
*
0000765400   0051   0051   0051   0051   0051   0051   0051   0052
0000765420   0052   0052   0052   0052   0052   0052   0052   0052
*
0000766000   0052   0052   0052   0052   0052   0052   0047   0047
0000766020   0047   0047   0047   0047   0047   0047   0047   0047
*
0000766400   0047   0047   0047   0047   0047   30F6   2D50   3102
0000766420   1428   0001   0001   005C   0072   0020   0072   6940
0000766440   636E   756C   6564   0A00   0000   0020   0000   0000
0000766460   0000   0A5C   0009   745C   5C00   006E   225C   5C00
0000766500   005C   6264   725F   6365   7276   632E   6400   2E62
0000766520   0070   5F47   5745   545F   4700   455F   5F57   0054
0000766540   2D82   2DA6   2D8D   2D4C   5542   4954   004C   6264
0000766560   725F   6365   766F   7265   735F   6275   7274   6565
0000766600   4700   455F   5F57   0054   5F47   5745   545F   0000
0000766620   6264   725F   6365   766F   7265   735F   6264   5C00
0000766640   2E00   4254   0054   502E   4552   2E00   5054   0054
0000766660   005C   542E   5442   2E00   5054   0054   502E   4552
0000766700   5400   3231   5F33   5845   4554   4E52   4C41   445F
0000766720   5441   5F41   4552   4F43   4556   5952   555F   4954
0000766740   004C   005C   4F41   2E49   4254   4600   5254   542E
0000766760   0042   4D47   2E54   4254   4700   4553   542E   0042
0000767000   5447   2E4C   4254   4900   5953   542E   0042   4D49
0000767020   2E47   4254   4900   4644   542E   0042   0020   6264
0000767040   665F   6C69   2E65   0063   6264   702E   4700   455F
0000767060   5F57   0054   5F47   5745   545F   0000   2E5E   2E82
0000767100   2E68   2DA2   6264   645F   0075   0000   0000   0000
0000767120   0006   0000   5B70   5B6F   0000   0005   0000   0000
0000767140   0000   0000   0000   0000   0000   0000   435F   465F
0000767160   4C49   5F45   4E49   4F46   003D   0001   FFFF   0000
0000767200   0000   0000   0000   0000   0000   0000   0000   0000
0000767220   0001   8101   8181   0000   0000   0000   0000   0000
0000767240   0000   0000   0000   0000   0000   0000   0000   0000
*
0000767620   0000   0A00   0A0A   0A0A   0A0A   0A0A   0A0A   0A0A
0000767640   0A0A   0A0A   0A0A   0A0A   0A0A   0A0A   0A0A   0A0A
*
0000770220   0A0A   000A   0000   0000   0000   0000   0000   0000
0000770240   0000   0000   FF00   00FF   0000   0000   FFFF   FFFF
0000770260   005C   005C   0000   0004   30FE   0000   0004   3A9E
0000770300   0001   0000   0000   0000   0000   0000   0102   0000
0000770320   0000   0000   0000   0000   0202   0000   0000   0000
0000770340   0000   0000   0000   0000   0000   0000   0000   0000
*
0000771220   0000   0000   0000   0001   0200   0000   0000   0000
```

```
THU MAR 14 17:31:54 1991  DB_PI.DLL  PAGE 271, LINE 15931

0000771240  0000  0000  0000  0000  0000  0000  0000  0000
*
0000772160  0000  0000  0000  32CA  2E7E  0000  0000  0000
0000772200  0000  0920  0D2D  005D  005D  0006  0600  0100
0000772220  0000  0010  0603  0600  1002  4504  4545  0505
0000772240  0505  3505  0030  0050  0000  2000  3020  5850
0000772260  0807  3000  3030  5057  0007  2000  0020  0000
0000772300  0000  6008  6060  6060  0060  7000  7870  7878
0000772320  0878  0807  0000  0007  0808  0008  0800  0800
0000772340  0000  2808  756E  6C6C  0629  0000  0000  0000
0000772360  0000  0000  0000  0000  0000  0003  2000  02B4
0000772400  3A54  02B4  3540  02B4  3544  02B4  3548  02B4
0000772420  354C  02B4  3550  0000  0000  0101  2000  2020
0000772440  2020  2020  2020  2828  2828  2028  2020  2020
0000772460  2020  2020  2020  2020  2020  2020  4820  1010
0000772500  1010  1010  1010  1010  1010  1010  8410  8484
0000772520  8484  8484  8484  1084  1010  1010  1010  8181
0000772540  8181  8181  0101  0101  0101  0101  0101  0101
0000772560  0101  0101  0101  0101  1010  1010  1010  8282
0000772600  8282  8282  0202  0202  0202  0202  0202  0202
0000772620  0202  0202  0202  0202  1010  1010  0020  0000
0000772640  0000  0000  0000  0000  0000  0000  0000  0000
*
0000773040  0003  FFFF  001E  003B  005A  0078  0097  00B5
0000773060  00D4  00F3  0111  0130  014E  016D  FFFF  001E
0000773100  003A  0059  0077  0096  00B4  00D3  00F2  0110
0000773120  012F  014D  016C  0000  0000  0000  0000  0000
0000773140  0000  0000  0000  0000  5A54  0000  5350  0054
0000773160  4450  0054  7080  0000  0001  36AC  36C0  36B0
0000773200  3AA8  7553  4D6E  6E6F  7554  5765  6465  6854
0000773220  4675  6972  6153  0074  614A  466E  6265  614D
0000773240  4172  7270  614D  4A79  6E75  754A  416C  6775
0000773260  6553  4F70  7463  6F4E  4476  6365  0000  0000
0000773300  0000  67D2  3A4C  629A  3704  6340  3708  622A
0000773320  370C  6318  3710  4D05  3136  7878  2B65  3030
0000773340  0030  005C  005C  5054  5400  0050  005C  5054
0000773360  0000  2E2E  2E00  0000  005C  005C  7430  6E69
0000773400  6F66  7700  0074  4C46  5400  0053  5054  5400
0000773420  0043  5254  5500  4B4E  4F4E  4E57  2000  7325
0000773440  0A20  2520  2073  200A  6C25  2078  200A  6C25
0000773460  2078  000A  5F00  5230  4F4F  3054  005F  0000
0000773500  005C  5054  5400  0050  0000  0000  0000  0000
0000773520  005C  3030  6F6C  6B63  5C00  3000  6C30  636F
0000773540  006B  005C  3030  6F6C  6B63  0000  54AC  3231
0000773560  2033  2020  0020  0201  0403  0605  0807  0A09
0000773600  0C0B  0E0D  100F  1211  1413  1615  1817  1A19
0000773620  1C1B  1E1D  201F  2221  2423  2625  2827  2A29
0000773640  2C2B  2E2D  302F  3231  3433  3635  3837  3A39
0000773660  3C3B  3E3D  403F  4241  4443  4645  4847  4A49
0000773700  4C4B  4E4D  504F  5251  5453  5655  5857  5A59
0000773720  5C5B  5E5D  605F  6261  6463  6665  6867  6A69
0000773740  6C6B  6E6D  706F  7271  7473  7675  7877  7A79
0000773760  7C7B  7E7D  807F  8281  8483  8685  8887  8A89
0000774000  8C8B  8E8D  908F  9291  9493  9695  9897  9A99
0000774020  9C9B  9E9D  A09F  A2A1  A4A3  A6A5  A8A7  AAA9
0000774040  ACAB  AEAD  B0AF  B2B1  B4B3  B6B5  B8B7  BAB9
0000774060  BCBB  BEBD  C0BF  C2C1  C4C3  C6C5  C8C7  CAC9
0000774100  CCCB  CECD  D0CF  D2D1  D4D3  D6D5  D8D7  DAD9
0000774120  DCDB  DEDD  E0DF  E2E1  E4E3  E6E5  E8E7  EAE9
```

THU MAR 14 17:31:54 1991 DB_PI.DLL PAGE 272, LINE 15990

| | | | | | | | | |
|---|---|---|---|---|---|---|---|---|
| 0000774140 | ECEB | EEED | F0EF | F2F1 | F4F3 | F6F5 | F8F7 | FAF9 |
| 0000774160 | FCFB | FEFD | 00FF | 3101 | 3030 | 0000 | 0000 | 0000 |
| 0000774200 | 0000 | 0000 | 0000 | 0000 | 0000 | 0000 | 0000 | 0000 |
| 0000774220 | 0000 | 0000 | 0000 | 0000 | 0000 | 3101 | 3030 | 0000 |
| 0000774240 | 0000 | 0000 | 0000 | 0000 | 0000 | 0000 | 0000 | 0000 |
| 0000774260 | 0000 | 0000 | 0000 | 0000 | 0000 | 522D | 4345 | 564F |
| 0000774300 | 5245 | 0000 | 4C2D | 414F | 0044 | 005C | 542E | 5442 |
| 0000774320 | 2E00 | 5250 | 0045 | 542E | 0042 | 005C | 542E | 5442 |
| 0000774340 | 2E00 | 4254 | 0053 | 7325 | 2520 | 2073 | 2000 | 2E00 |
| 0000774360 | 4254 | 0053 | 005C | 7325 | 2520 | 2073 | 2000 | 5C00 |
| 0000774400 | 2E00 | 4254 | 004B | 502E | 4552 | 2E00 | 5054 | 0052 |
| 0000774420 | 005C | 005C | 005C | 005C | 502E | 4552 | 2E00 | 4254 |
| 0000774440 | 004B | 542E | 5250 | 2E00 | 4254 | 0054 | 542E | 5450 |
| 0000774460 | 0000 | 005C | 2E2A | 002A | 002E | 2E2E | 5C00 | 5C00 |
| 0000774500 | 2E00 | 2E00 | 002E | 005C | 005C | 2E2A | 002A | 002E |
| 0000774520 | 2E2E | 5C00 | 2E00 | 2E00 | 002E | 7325 | 7325 | 2500 |
| 0000774540 | 5C73 | 7325 | 5C00 | 2A00 | 2A2E | 2E00 | 2E00 | 002E |
| 0000774560 | 005C | 005C | 2A2E | 2E00 | 5C00 | 5400 | 3231 | 5F33 |
| 0000774600 | 5953 | 5F53 | 5244 | 5649 | 0045 | 3A44 | 3A00 | 0000 |
| 0000774620 | 4F43 | 534D | 4550 | 0D43 | 632F | 6300 | 646D | 652E |
| 0000774640 | 6578 | 6300 | 6D6F | 616D | 646E | 632E | 6D6F | 0000 |
| 0000774660 | 4F43 | 534D | 4550 | 0043 | 6D63 | 2E64 | 7865 | 0065 |
| 0000774700 | 6F63 | 6D6D | 6E61 | 2E64 | 6F63 | 006D | 4150 | 4854 |
| 0000774720 | 2E00 | 7865 | 0065 | 632E | 6D6F | 2E00 | 6D63 | 0064 |
| 0000774740 | 622E | 7461 | 2E00 | 005C | 0000 | 3A11 | 3A16 | 4150 |
| 0000774760 | 4854 | 5C00 | 0000 | 005C | 632F | 0020 | 0002 | 0000 |
| 0000775000 | 0000 | 44EC | 5554 | 0000 | 0000 | 60E3 | 3A44 | 5972 |
| 0000775020 | 3714 | 0F40 | FFFF | FFFF | FFFF | 3A56 | 3A58 | 3A5A |
| 0000775040 | 3A5C | 3A5E | 3A60 | 3A62 | 3A64 | FFFF | 3A66 | 3A68 |
| 0000775060 | 3A6C | 3A6E | 3A70 | 3A72 | 3A74 | 3A76 | 3A78 | 3A7A |
| 0000775100 | 3A7C | 3A7E | 3A80 | 3A82 | D70A | 3C23 | A9FC | D2F1 |
| 0000775120 | 624D | 3F50 | 3A84 | 3A86 | 0000 | 40AD | 3A6A | 3A9C |
| 0000775140 | 3A94 | 3A96 | 3AA0 | 3AA2 | 34B8 | 0000 | 0000 | 0000 |
| 0000775160 | 0000 | 3C3C | 4D4E | 4753 | 3E3E | 0000 | 3652 | 3030 |
| 0000775200 | 0D30 | 2D0A | 7320 | 6174 | 6B63 | 6F20 | 6576 | 6672 |
| 0000775220 | 6F6C | 0D77 | 000A | 0003 | 3652 | 3D30 | 0D33 | 2D0A |
| 0000775240 | 6920 | 746E | 6765 | 7265 | 6420 | 7669 | 6469 | 2065 |
| 0000775260 | 7962 | 3020 | 0A0D | 0800 | 5200 | 3036 | 3830 | 0A0D |
| 0000775300 | 202D | 6F6E | 2074 | 6E65 | 756F | 6867 | 7320 | 6170 |
| 0000775320 | 6563 | 6620 | 726F | 6120 | 6772 | 6D75 | 6E65 | 7374 |
| 0000775340 | 0A0D | 0900 | 5200 | 3036 | 3930 | 0A0D | 202D | 6F6E |
| 0000775360 | 2074 | 6E65 | 756F | 6867 | 7320 | 6170 | 6563 | 6620 |
| 0000775400 | 726F | 6520 | 766E | 7269 | 6E6F | 656D | 746E | 0A0D |
| 0000775420 | FC00 | 0D00 | 000A | 00FF | 7572 | 2D6E | 6974 | 656D |
| 0000775440 | 6520 | 7272 | 726F | 0020 | 0002 | 3652 | 3030 | 0D32 |
| 0000775460 | 2D0A | 6620 | 6F6C | 7461 | 6E69 | 2D67 | 6F70 | 6E69 |
| 0000775500 | 2074 | 7573 | 7070 | 726F | 2074 | 6F6E | 2074 | 6F6C |
| 0000775520 | 6461 | 6465 | 0A0D | 1100 | 5200 | 3036 | 3731 | 0A0D |
| 0000775540 | 202D | 6E75 | 7865 | 6570 | 7463 | 6465 | 6D20 | 6C75 |
| 0000775560 | 6974 | 6874 | 6572 | 6461 | 6C20 | 636F | 206B | 7265 |
| 0000775600 | 6F72 | 0D72 | 000A | 0010 | 3652 | 3130 | 0D36 | 2D0A |
| 0000775620 | 6E20 | 746F | 6520 | 6F6E | 6775 | 2068 | 7073 | 6361 |
| 0000775640 | 2065 | 6F66 | 2072 | 6874 | 6572 | 6461 | 6420 | 7461 |
| 0000775660 | 0D61 | 000A | 00FD | 203A | 414D | 4854 | 0A0D | 202D |
| 0000775700 | 6C66 | 616F | 6974 | 676E | 702D | 696F | 746E | 6520 |
| 0000775720 | 7272 | 726F | 203A | 6500 | 6900 | 766E | 6C61 | 6469 |
| 0000775740 | 0A0D | 6700 | 6400 | 7669 | 6469 | 2065 | 7962 | 3020 |
| 0000775760 | 0A0D | 6800 | 6F00 | 6576 | 6672 | 6F6C | 0D77 | 000A |
| 0000776000 | 006E | 7473 | 6361 | 206B | 766F | 7265 | 6C66 | 776F |

THU MAR 14 17:31:54 1991 DB_PI.DLL PAGE 273, LINE 16049

| | | | | | | | | |
|---|---|---|---|---|---|---|---|---|
| 0000776020 | 0A0D | 7000 | 6500 | 7078 | 696C | 6963 | 6C74 | 2079 |
| 0000776040 | 6567 | 656E | 6172 | 6574 | 0D64 | 000A | FFFF | 05FF |
| 0000776060 | 0200 | 5000 | 043A | 0000 | 0200 | A402 | 023A | 1100 |
| 0000776100 | 0200 | A602 | 023A | 1F00 | 0200 | F800 | 0A30 | 0000 |
| 0000776120 | 0200 | BC00 | 0B36 | 0000 | 4E00 | 3042 | 5932 | 0423 |
| 0000776140 | 0100 | 0000 | 2700 | 000D | 0000 | 0100 | 1200 | 2E2E |
| 0000776160 | 6F5C | 6A62 | 645C | 5F62 | 6E69 | 7469 | 6F2E | 6A62 |
| 0000776200 | 0001 | 0D28 | 1870 | 0000 | 0000 | 0001 | 2E12 | 5C2E |
| 000077622. | 626F | 5C6A | 6264 | 745F | 6572 | 2E65 | 626F | 016A |
| 0000776240 | 9800 | 9425 | 002B | 0000 | 0100 | 1300 | 2E2E | 6F5C |
| 0000776260 | 6A62 | 645C | 5F62 | 7266 | 6D61 | 2E65 | 626F | 016A |
| 0000776300 | 2C00 | DD51 | 001D | 0000 | 0100 | 1300 | 2E2E | 6F5C |
| 0000776320 | 6A62 | 645C | 5F62 | 6361 | 6563 | 2E73 | 626F | 016A |
| 0000776340 | 0A00 | D16F | 0024 | 0000 | 0100 | 1300 | 2E2E | 6F5C |
| 0000776360 | 6A62 | 645C | 5F62 | 6373 | 7072 | 2E74 | 626F | 016A |
| 0000776400 | DC00 | D093 | 0019 | 0000 | 0100 | 1100 | 2E2E | 6F5C |
| 0000776420 | 6A62 | 645C | 5F62 | 6567 | 2E6E | 626F | 016A | AC00 |
| 0000776440 | 40AD | 0045 | 0000 | 0100 | 1100 | 2E2E | 6F5C | 6A62 |
| 0000776460 | 645C | 5F62 | 6D69 | 2E67 | 626F | 026A | 0000 | BE00 |
| 0000776500 | 0018 | 0000 | 0100 | 1200 | 2E2E | 6F5C | 6A62 | 645C |
| 0000776520 | 5F62 | 6369 | 6E6F | 6F2E | 6A62 | 0002 | 18BE | 5B9F |
| 0000776540 | 0000 | 0000 | 0001 | 2E12 | 5C2E | 626F | 5C6A | 6264 |
| 0000776560 | 6C5F | 6D69 | 2E67 | 626F | 026A | 5E00 | 7C74 | 0015 |
| 0000776600 | 0000 | 0100 | 1200 | 2E2E | 6F5C | 6A62 | 645C | 5F62 |
| 0000776620 | 6C66 | 7274 | 6F2E | 6A62 | 0002 | 89DA | 1FAC | 0000 |
| 0000776640 | 0000 | 0001 | 2E11 | 5C2E | 626F | 5C6A | 6264 | 615F |
| 0000776660 | 696F | 6F2E | 6A62 | 0002 | A986 | 22A3 | 0000 | 000u |
| 0000776700 | 0001 | 2E11 | 5C2E | 626F | 5C6A | 6264 | 6D5F | 6D65 |
| 0000776720 | 6F2E | 6A62 | 0002 | CC2A | 20BB | 0000 | 0000 | 0001 |
| 0000776740 | 2E12 | 5C2E | 626F | 5C6A | 6264 | 695F | 746E | 2E72 |
| 0000776760 | 626F | 036A | 0000 | 6100 | 0017 | 0000 | 0100 | 1200 |
| 0000777000 | 2E2E | 6F5C | 6A62 | 645C | 7374 | 745F | 6C62 | 6F2E |
| 0000777020 | 6A62 | 0003 | 1762 | 1290 | 0000 | 0000 | 0001 | 2E13 |
| 0000777040 | 5C2E | 626F | 5C6A | 7464 | 5F73 | 6966 | 656C | 6F2E |
| 0000777060 | 6A62 | 0003 | 29F2 | 04A3 | 0000 | 0000 | 0001 | 2E12 |
| 0000777100 | 5C2E | 626F | 5C6A | 7464 | 5F69 | 6274 | 2E6C | 626F |
| 0000777120 | 036A | 9600 | A22E | 0004 | 0000 | 0100 | 1200 | 2E2E |
| 0000777140 | 6F5C | 6A62 | 645C | 6674 | 745F | 6C62 | 6F2E | 6A62 |
| 0000777160 | 0003 | 3338 | 0427 | 0000 | 0000 | 0001 | 2E12 | 5C2E |
| 0000777200 | 626F | 5C6A | 7464 | 5F61 | 6274 | 2E6C | 626F | 036A |
| 0000777220 | 6000 | 8F37 | 0005 | 0000 | 0100 | 1200 | 2E2E | 6F5C |
| 0000777240 | 6A62 | 645C | 6774 | 615F | 6363 | 6F2E | 6A62 | 0003 |
| 0000777260 | 3CF0 | 0061 | 0000 | 0000 | 0001 | 2E13 | 5C2E | 626F |
| 0000777300 | 5C6A | 7464 | 5F6D | 6863 | 7261 | 6F2E | 6A62 | 0003 |
| 0000777320 | 3D52 | 2597 | 0000 | 0000 | 0001 | 2E11 | 5C2E | 626F |
| 0000777340 | 5C6A | 6264 | 635F | 6766 | 6F2E | 6A62 | 0003 | 62EA |
| 0000777360 | 17D9 | 0000 | 0000 | 0001 | 2E12 | 5C2E | 626F | 5C6A |
| 0000777400 | 7464 | 5F63 | 656C | 2E78 | 626F | 036A | C400 | 277A |
| 0000777420 | 000D | 0000 | 0100 | 1200 | 2E2E | 6F5C | 6A62 | 645C |
| 0000777440 | 6374 | 705F | 7372 | 6F2E | 6A62 | 0003 | 87EC | 1962 |
| 0000777460 | 0000 | 0000 | 0001 | 2E13 | 5C2E | 626F | 5C6A | 6264 |
| 0000777500 | 725F | 6365 | 7276 | 6F2E | 6A62 | 0003 | A14E | 015B |
| 0000777520 | 0000 | 0000 | 0001 | 2E12 | 5C2E | 626F | 5C6A | 6264 |
| 0000777540 | 665F | 6C69 | 2E65 | 626F | 046A | 1000 | D100 | 0000 |
| 0000777560 | 0100 | 0100 | 0B00 | 6C64 | 5C6C | 7363 | 2E75 | 7361 |
| 0000777600 | 046D | E200 | AF00 | 0001 | 0100 | 0100 | 0E00 | 6C64 |
| 0000777620 | 5C6C | 7363 | 6475 | 7461 | 612E | 6D73 | 0004 | 0292 |
| 0000777640 | 0022 | 0000 | 0001 | 0001 | 6F0F | 3273 | 635C | 7472 |
| 0000777660 | 6D30 | 6773 | 612E | 6D73 | 0004 | 02B4 | 0006 | 0000 |

THU MAR 14 17:31:54 1991 DB_PI.DLL PAGE 274, LINE 16108

| | | | | | | | | |
|---|---|---|---|---|---|---|---|---|
| 0000777700 | 0001 | 0001 | 630A | 7472 | 6630 | 2E70 | 7361 | 046D |
| 0000777720 | BA00 | 1A02 | 0000 | 0100 | 0100 | 0A00 | 6863 | 736B |
| 0000777740 | 6B74 | 612E | 6D73 | 0004 | 02D4 | 0108 | 0000 | 0001 |
| 0000777760 | 0001 | 640D | 6C6C | 735C | 7465 | 6E65 | 7076 | 632E |
| 0001000000 | 0004 | 03DC | 0065 | 0000 | 0001 | 0001 | 6F0F | 3273 |
| 0001000020 | 6E5C | 736D | 6867 | 7264 | 612E | 6D73 | 0004 | 0442 |
| 0001000040 | 00C0 | 0000 | 0001 | 0001 | 6F0E | 3273 | 645C | 736F |
| 0001000060 | 6572 | 2E74 | 7361 | 046D | 0200 | 0205 | 0001 | 0100 |
| 0001000100 | 0100 | 0800 | 6366 | 6F6C | 6573 | 632E | 0004 | 0604 |
| 0001000120 | 006A | 0000 | 0001 | 0001 | 6607 | 706F | 6E65 | 632E |
| 0001000140 | 0004 | 066E | 005A | 0000 | 0001 | 0001 | 6609 | 7270 |
| 0001000160 | 6E69 | 6674 | 632E | 0004 | 06C8 | 01AB | 0000 | 0001 |
| 0001000200 | 0001 | 6609 | 6572 | 6461 | 612E | 6D73 | 0004 | 0B74 |
| 0001000220 | 0042 | 0000 | 0001 | 0001 | 6608 | 6373 | 6E61 | 2E66 |
| 0001000240 | 0463 | B600 | D108 | 0001 | 0100 | 0100 | 0A00 | 7766 |
| 0001000260 | 6972 | 6574 | 612E | 6D73 | 0004 | 0A88 | 004E | 0000 |
| 0001000300 | 0001 | 0001 | 7008 | 6972 | 746E | 2E66 | 0063 | 0000 |
| 0001000320 | 0000 | 0000 | 0100 | 0000 | 0B00 | 635F | 6C66 | 7375 |
| 0001000340 | 2E68 | 7361 | 006D | 0000 | 0000 | 0000 | 0100 | 0000 |
| 0001000360 | 0700 | 665F | 6C69 | 2E65 | 0463 | D600 | 9C0A | 0000 |
| 0001000400 | 0100 | 0100 | 0B00 | 665F | 6C69 | 7562 | 2E66 | 7361 |
| 0001000420 | 046D | 7200 | E50B | 0000 | 0100 | 0100 | 0B00 | 665F |
| 0001000440 | 736C | 7562 | 2E66 | 7361 | 046D | 5800 | 370C | 0000 |
| 0001000460 | 0100 | 0100 | 0C00 | 665F | 6572 | 6265 | 6675 | 612E |
| 0001000500 | 6D73 | 0004 | 0C90 | 004B | 0000 | 0001 | 0001 | 5F0B |
| 0001000520 | 6567 | 6274 | 6675 | 612E | 6D73 | 0004 | 0CDC | 00F2 |
| 0001000540 | 0000 | 0001 | 0001 | 5F07 | 706F | 6E65 | 632E | 0004 |
| 0001000560 | 0DCE | 00C0 | 0000 | 0001 | 0001 | 5F0B | 6673 | 6274 |
| 0001000600 | 6675 | 612E | 6D73 | 0004 | 0E8E | 012E | 0000 | 0001 |
| 0001000620 | 0001 | 6608 | 6C66 | 7375 | 2E68 | 0463 | BC00 | 2A0F |
| 0001000640 | 0008 | 0100 | 0100 | 0700 | 6E69 | 7570 | 2E74 | 0463 |
| 0001000660 | E600 | FA17 | 0004 | 0100 | 0100 | 0A00 | 756F | 7074 |
| 0001000700 | 7475 | 612E | 6D73 | 0004 | 1CE0 | 0078 | 0000 | 0001 |
| 0001000720 | 0001 | 7308 | 7274 | 6165 | 2E6D | 0463 | 5800 | 4B1D |
| 0001000740 | 0000 | 0100 | 0100 | 0800 | 7570 | 6374 | 612E | 6D73 |
| 0001000760 | 0004 | 1DA4 | 00AA | 0000 | 0001 | 0001 | 7508 | 676E |
| 0001001000 | 7465 | 2E63 | 0463 | 4E00 | 3F1E | 0000 | 0100 | 0100 |
| 0001001020 | 0D00 | 736F | 5C32 | 6C63 | 736F | 2E65 | 7361 | 046D |
| 0001001040 | 8E00 | 771E | 0000 | 0100 | 0100 | 0D00 | 736F | 5C32 |
| 0001001060 | 736C | 6565 | 2E6B | 7361 | 046D | 0600 | DD1F | 0001 |
| 0001001100 | 0100 | 0100 | 0C00 | 736F | 5C32 | 706F | 6E65 | 612E |
| 0001001120 | 6D73 | 0004 | 20E4 | 015D | 0000 | 0001 | 0001 | 6F0C |
| 0001001140 | 3273 | 725C | 6165 | 2E64 | 7361 | 046D | 4200 | DD22 |
| 0001001160 | 0001 | 0100 | 0100 | 0900 | 7277 | 7469 | 2E65 | 7361 |
| 0001001200 | 046D | 2000 | 1E24 | 0000 | 0100 | 0100 | 0C00 | 7473 |
| 0001001220 | 6361 | 616B | 6176 | 612E | 6D73 | 0000 | 0000 | 0000 |
| 0001001240 | 0000 | 0001 | 0000 | 740B | 7478 | 6F6D | 6564 | 612E |
| 0001001260 | 6D73 | 0004 | 243E | 000A | 0000 | 0001 | 0001 | 6D0A |
| 0001001300 | 6C61 | 6F6C | 2E63 | 7361 | 046D | 4800 | 0A24 | 0000 |
| 0001001320 | 0100 | 0100 | 0800 | 7266 | 6565 | 612E | 6D73 | 0004 |
| 0001001340 | 2452 | 00AF | 0000 | 0001 | 0001 | 660B | 616D | 6C6C |
| 0001001360 | 636F | 612E | 6D73 | 0000 | 0000 | 00C0 | 0000 | 0001 |
| 0001001400 | 0000 | 6609 | 6164 | 6174 | 612E | 6D73 | 0004 | 2502 |
| 0001001420 | 0034 | 0000 | 0001 | 0001 | 690B | 696E | 7374 | 6765 |
| 0001001440 | 612E | 6D73 | 0004 | 2536 | 0036 | 0000 | 0001 | 0001 |
| 0001001460 | 6C0B | 6E69 | 736B | 6765 | 612E | 6D73 | 0004 | 256C |
| 0001001500 | 007C | 0000 | 0001 | 0001 | 730C | 6165 | 6372 | 7368 |
| 0001001520 | 2E67 | 7361 | 046D | E800 | E225 | 0000 | 0100 | 0100 |
| 0001001540 | 0B00 | 7267 | 776F | 6573 | 2E67 | 7361 | 046D | CA00 |

THU MAR 14 17:31:54 1991 DB_PI.DLL PAGE 275, LINE 16167

| | | | | | | | | |
|---|---|---|---|---|---|---|---|---|
| 0001001560 | 3126 | 0000 | 0100 | 0100 | 0A00 | 656E | 7377 | 6765 |
| 0001001600 | 612E | 6D73 | 0004 | 26FC | 000E | 0000 | 0001 | 0001 |
| 0001001620 | 660A | 736D | 7A69 | 2E65 | 7361 | 046D | 0A00 | 4627 |
| 0001001640 | 0000 | 0100 | 0100 | 0A00 | 7473 | 6372 | 7461 | 612E |
| 0001001660 | 6D73 | 0004 | 2750 | 0036 | 0000 | 0001 | 0001 | 730A |
| 0001001700 | 7274 | 7063 | 2E79 | 7361 | 046D | 8600 | 2927 | 0000 |
| 0001001720 | 0100 | 0100 | 0A00 | 7473 | 6372 | 706D | 612E | 6D73 |
| 0001001740 | 0004 | 27B0 | 0017 | 0000 | 0001 | 0001 | 730A | 7274 |
| 0001001760 | 656C | 2E6E | 7361 | 046D | C800 | 3B27 | 0000 | 0100 |
| 0001002000 | 0100 | 0B00 | 7473 | 6E72 | 6163 | 2E74 | 7361 | 046D |
| 0001002020 | 0400 | 2A28 | 0000 | 0100 | 0100 | 0B00 | 7473 | 6E72 |
| 0001002040 | 7063 | 2E79 | 7361 | 046D | 2E00 | 3B28 | 0000 | 0100 |
| 0001002060 | 0100 | 0B00 | 7473 | 6E72 | 6D63 | 2E70 | 7361 | 046D |
| 0001002100 | 6A00 | 0328 | 0000 | 0100 | 0100 | 0800 | 7461 | 696F |
| 0001002120 | 612E | 6D73 | 0004 | 286E | 0003 | 0000 | 0001 | 0001 |
| 0001002140 | 6108 | 6F74 | 2E6C | 7361 | 046D | 7200 | 6028 | 0000 |
| 0001002160 | 0100 | 0100 | 0600 | 7461 | 666F | 632E | 0004 | 28D2 |
| 0001002200 | 0056 | 0000 | 0001 | 0001 | 6108 | 6F74 | 2E78 | 7361 |
| 0001002220 | 046D | 2800 | 1C29 | 0000 | 0100 | 0100 | 0800 | 7469 |
| 0001002240 | 616F | 612E | 6D73 | 0004 | 2944 | 00A2 | 0000 | 0001 |
| 0001002260 | 0001 | 5F0A | 7066 | 6F74 | 7473 | 2E72 | 0463 | E600 |
| 0001002300 | 2229 | 0000 | 0100 | 0100 | 0900 | 6F74 | 7075 | 6570 |
| 0001002320 | 2E72 | 0063 | 0000 | 0000 | 0000 | 0100 | 0000 | 0C00 |
| 0001002340 | 6D63 | 7369 | 6463 | 7461 | 612E | 6D73 | 0000 | 0000 |
| 0001002360 | 0000 | 0000 | 0001 | 0000 | 6309 | 7974 | 6570 | 612E |
| 0001002400 | 6D73 | 0004 | 2A08 | 00A6 | 0000 | 0001 | 0001 | 6708 |
| 0001002420 | 7465 | 6E65 | 2E76 | 0463 | AE00 | 202A | 0000 | 0100 |
| 0001002440 | 0100 | 0D00 | 736F | 5C32 | 6468 | 6669 | 2E66 | 7361 |
| 0001002460 | 046D | CE00 | BA2A | 0000 | 0100 | 0100 | 0D00 | 736F |
| 0001002500 | 5C32 | 6C6D | 636F | 2E6B | 7361 | 046D | 8800 | 0E2B |
| 0001002520 | 0001 | 0100 | 0100 | 0E00 | 6C64 | 5C6C | 6874 | 6572 |
| 0001002540 | 6461 | 612E | 6D73 | 0004 | 2C96 | 007A | 0000 | 0001 |
| 0001002560 | 0001 | 6410 | 6C6C | 745C | 6469 | 6174 | 6C62 | 2E65 |
| 0001002600 | 7361 | 046D | 1000 | 952D | 0000 | 0100 | 0100 | 0900 |
| 0001002620 | 6766 | 7465 | 2E73 | 7361 | 046D | A600 | 7C2D | 0000 |
| 0001002640 | 0100 | 0100 | 0700 | 7066 | 7475 | 2E73 | 0463 | 2200 |
| 0001002660 | CE2E | 0000 | 0100 | 0100 | 0700 | 7366 | 6565 | 2E6B |
| 0001002700 | 0463 | F000 | D42E | 0001 | 0100 | 0100 | 0700 | 7466 |
| 0001002720 | 6C65 | 2E6C | 0463 | C400 | 6230 | 0000 | 0100 | 0100 |
| 0001002740 | 0800 | 6572 | 6977 | 646E | 632E | 0004 | 3126 | 0074 |
| 0001002760 | 0000 | 0001 | 0001 | 7309 | 7270 | 6E69 | 6674 | 632E |
| 0001003000 | 0004 | 319A | 005C | 0000 | 0001 | 0001 | 7308 | 6373 |
| 0001003020 | 6E61 | 2E66 | 0463 | F600 | AD31 | 0000 | 0100 | 0100 |
| 0001003040 | 0C00 | 7266 | 6165 | 6C6C | 636F | 612E | 6D73 | 0004 |
| 0001003060 | 32A4 | 000A | 0000 | 0001 | 0001 | 720B | 6165 | 6C6C |
| 0001003100 | 636F | 612E | 6D73 | 0004 | 32AE | 00C8 | 0000 | 0001 |
| 0001003120 | 0001 | 720A | 7365 | 7A69 | 2E65 | 7361 | 046D | 7600 |
| 0001003140 | 2E33 | 0000 | 0100 | 0100 | 0A00 | 6163 | 6C6C | 636F |
| 0001003160 | 612E | 6D73 | 0004 | 33A4 | 0025 | 0000 | 0001 | 0001 |
| 0001003200 | 660B | 6E69 | 7364 | 6765 | 612E | 6D73 | 0004 | 33CA |
| 0001003220 | 00A9 | 0000 | 0001 | 0001 | 6F0E | 3273 | 685C | 6C61 |
| 0001003240 | 6F6C | 2E63 | 7361 | 046D | 7400 | 9C34 | 0001 | 0100 |
| 0001003260 | 0100 | 0900 | 7361 | 7463 | 6D69 | 2E65 | 0463 | 1000 |
| 0001003300 | 2E36 | 0000 | 0100 | 0100 | 0700 | 7463 | 6D69 | 2E65 |
| 0001003320 | 0063 | 0000 | 0000 | 0000 | 0100 | 0000 | 0600 | 6164 |
| 0001003340 | 7379 | 632E | 0004 | 363E | 0246 | 0000 | 0001 | 0001 |
| 0001003360 | 6708 | 746D | 6D69 | 2E65 | 0463 | 8400 | 8438 | 0000 |
| 0001003400 | 0100 | 0100 | 0A00 | 6F6C | 6163 | 746C | 6D69 | 632E |
| 0001003420 | 0004 | 3908 | 0049 | 0000 | 0001 | 0001 | 6F0C | 3273 |

THU MAR 14 17:31:54 1991 DB_PI.DLL PAGE 276, LINE 16226

| | | | | | | | | |
|---|---|---|---|---|---|---|---|---|
| 0001003440 | 745C | 6D69 | 2E65 | 7361 | 046D | 5200 | C839 | 0001 |
| 0001003460 | 0100 | 0100 | 0700 | 7A74 | 6573 | 2E74 | 0063 | 0000 |
| 0001003500 | 0000 | 0000 | 0100 | 0000 | 0900 | 6974 | 656D | 6573 |
| 0001003520 | 2E74 | 0463 | 1A00 | F63B | 0000 | 0100 | 0100 | 0A00 |
| 0001003540 | 7464 | 786F | 6974 | 656D | 632E | 0004 | 3C10 | 002D |
| 0001003560 | 0000 | 0001 | 0001 | 730A | 7274 | 6863 | 2E72 | 7361 |
| 0001003600 | 046D | 3E00 | 2E3C | 0000 | 0100 | 0100 | 0B00 | 7473 |
| 0001003620 | 7272 | 6863 | 2E72 | 7361 | 046D | 6C00 | 5C3C | 0000 |
| 0001003640 | 0100 | 0100 | DA00 | 7473 | 7372 | 6E70 | 612E | 6D73 |
| 0001003660 | 0004 | 3CC8 | 0042 | 0000 | 0001 | 0001 | 680B | 656D |
| 0001003700 | 636D | 7268 | 612E | 6D73 | 0004 | 3D0A | 00CA | 0000 |
| 0001003720 | 0001 | 0001 | 680B | 656D | 636D | 7970 | 612E | 6D73 |
| 0001003740 | 0004 | 3DD4 | 005B | 0000 | 0001 | 0001 | 680B | 656D |
| 0001003760 | 636D | 706D | 612E | 6D73 | 0004 | 3E3D | 005E | 0000 |
| 0001004000 | 0001 | 0001 | 680B | 656D | 636D | 7970 | 612E | 6D73 |
| 0001004020 | 0004 | 3E8E | 0048 | 0000 | 0001 | 0001 | 680B | 656D |
| 0001004040 | 736D | 7465 | 612E | 6D73 | 0004 | 3ED6 | 0063 | 0000 |
| 0001004060 | 0001 | 0001 | 7808 | 6F74 | 2E61 | 7361 | 046D | 3A00 |
| 0001004100 | 163F | 0002 | 0100 | 0100 | 0900 | 7371 | 726F | 2E74 |
| 0001004120 | 7361 | 046D | 5000 | 5441 | 0000 | 0100 | 0100 | 0A00 |
| 0001004140 | 6573 | 6A74 | 706D | 612E | 6D73 | 0004 | 41A4 | 001A |
| 0001004160 | 0000 | 0001 | 0001 | 6F0F | 3273 | 775C | 7472 | 6532 |
| 0001004200 | 7272 | 612E | 6D73 | 0004 | 41BE | 002A | 0000 | 0001 |
| 0001004220 | 0001 | 6F0D | 3273 | 645C | 6972 | 6576 | 612E | 6D73 |
| 0001004240 | 0004 | 41E8 | 0010 | 0000 | 0001 | 0001 | 6F0E | 3273 |
| 0001004260 | 675C | 7465 | 6970 | 2E64 | 7361 | 046D | F800 | 2341 |
| 0001004300 | 0000 | 0100 | 0100 | 0E00 | 736F | 5C32 | 6572 | 616E |
| 0001004320 | 656D | 612E | 6D73 | 0004 | 421C | 001D | 0000 | 0001 |
| 0001004340 | 0001 | 6F0E | 3273 | 755C | 6C6E | 6E69 | 2E6B | 7361 |
| 0001004360 | 046D | 3A00 | 2242 | 0000 | 0100 | 0100 | 0900 | 6C61 |
| 0001004400 | 756D | 2E6C | 7361 | 046D | 5C00 | 2242 | 0000 | 0100 |
| 0001004420 | 0100 | 0900 | 6C61 | 6572 | 2E6D | 7361 | 046D | 7E00 |
| 0001004440 | 1F42 | 0000 | 0100 | 0100 | 0900 | 6C61 | 6873 | 2E6C |
| 0001004460 | 7361 | 046D | 9E00 | 9A42 | 0000 | 0100 | 0100 | 0800 |
| 0001004500 | 646C | 7669 | 612E | 6D73 | 0004 | 4338 | 0032 | 0000 |
| 0001004520 | 0001 | 0001 | 6C08 | 756D | 2E6C | 7361 | 046D | 6A00 |
| 0001004540 | A043 | 0000 | 0100 | 0100 | 0800 | 726C | 6D65 | 612E |
| 0001004560 | 6D73 | 0004 | 440A | 000B | 0000 | 0001 | 0001 | 6C08 |
| 0001004600 | 6873 | 2E6C | 7361 | 046D | 1600 | 5F44 | 0000 | 0100 |
| 0001004620 | 0100 | 0900 | 6C75 | 6964 | 2E76 | 7361 | 046D | 7600 |
| 0001004640 | 6A44 | 0000 | 0100 | 0100 | 0900 | 6C75 | 6572 | 2E6D |
| 0001004660 | 7361 | 046D | E000 | A644 | 0000 | 0100 | 0100 | 1600 |
| 0001004700 | 6D5C | 7472 | 635C | 6D6F | 6F6D | 5C6E | 666D | 6163 |
| 0001004720 | 6C6C | 612E | 6D73 | 0004 | 4586 | 03D3 | 0000 | 0001 |
| 0001004740 | 0001 | 5C16 | 726D | 5C74 | 6F63 | 6D6D | 6E6F | 695C |
| 0001004760 | 6378 | 6E6F | 2E76 | 5341 | 044D | 5A00 | B849 | 0000 |
| 0001005000 | 0100 | 0100 | 1600 | 6D5C | 7472 | 635C | 6D6F | 6F6D |
| 0001005020 | 5C6E | 7869 | 6F63 | 706D | 412E | 4D53 | 0004 | 4A12 |
| 0001005040 | 02FA | 0000 | 0001 | 0001 | 5C16 | 726D | 5C74 | 6F63 |
| 0001005060 | 6D6D | 6E6F | 625C | 6D34 | 7461 | 2E68 | 5341 | 044D |
| 0001005100 | 0C00 | C04D | 0005 | 0100 | 0100 | 1600 | 6D5C | 7472 |
| 0001005120 | 635C | 6D6F | 6F6D | 5C6E | 3862 | 616D | 6874 | 412E |
| 0001005140 | 4D53 | 0004 | 52CC | 018B | 0000 | 0001 | 0001 | 5C17 |
| 0001005160 | 726D | 5C74 | 6F63 | 6D6D | 6E6F | 6D5C | 3869 | 6F66 |
| 0001005200 | 7475 | 612E | 6D73 | 0004 | 5457 | 0338 | 0000 | 0001 |
| 0001005220 | 0001 | 5C16 | 726D | 5C74 | 6F63 | 6D6D | 6E6F | 6D5C |
| 0001005240 | 3869 | 6966 | 2E6E | 7361 | 046D | 8F00 | 8A57 | 0001 |
| 0001005260 | 0100 | 0100 | 1700 | 6D5C | 7472 | 635C | 6D6F | 6F6D |
| 0001005300 | 5C6E | 696D | 7438 | 756D | 2E6C | 7361 | 046D | 1A00 |

THU MAR 14 17:31:54 1991 DB_PI.DLL PAGE 277, LINE 16285

| | | | | | | | | |
|---|---|---|---|---|---|---|---|---|
| 0001005320 | 5759 | 0000 | 0100 | 0100 | 1100 | 6D5C | 7472 | 635C |
| 0001005340 | 6D5C | 6D61 | 7470 | 2E64 | 7361 | 046D | 7200 | 1459 |
| 0001005360 | 0000 | 0100 | 0100 | 1200 | 6D5C | 7472 | 635C | 665C |
| 0001005400 | 746C | 7375 | 6465 | 412E | 4D53 | 0004 | 5986 | 0729 |
| 0001005420 | 0000 | 0001 | 0001 | 5C11 | 726D | 5C74 | 5C63 | 636D |
| 0001005440 | 6163 | 6C6C | 612E | 6D73 | 0004 | 60B0 | 0084 | 0000 |
| 0001005460 | 0001 | 0001 | 5C12 | 726D | 5C74 | 5C63 | 636D | 6163 |
| 0001005500 | 6C6C | 2E65 | 7361 | 046D | 3400 | B561 | 0000 | 0100 |
| 0001005520 | 0100 | 1000 | 6D5C | 7472 | 635C | 6D5C | 6663 | 6E69 |
| 0001005540 | 612E | 6D73 | 0004 | 61EA | 0040 | 0000 | 0001 | 0001 |
| 0001005560 | 5C11 | 726D | 5C74 | 5C63 | 636D | 6F66 | 7475 | 612E |
| 0001005600 | 6D73 | 0004 | 622A | 063E | 0000 | 0001 | 0001 | 5C0C |
| 0001005620 | 726D | 5C74 | 5C63 | 7663 | 2E74 | 0463 | 1A00 | 5377 |
| 0001005640 | 0009 | 0500 | 0100 | 0900 | 6664 | 745F | 6572 | 2E65 |
| 0001005660 | 0463 | 6E00 | 8180 | 0024 | 0500 | 0100 | 0800 | 6664 |
| 0001005700 | 6F5F | 6A62 | 632E | 0004 | A4F0 | 0251 | 0000 | 0005 |
| 0001005720 | 0001 | 6409 | 5F66 | 6574 | 7473 | 632E | 0004 | A742 |
| 0001005740 | 0140 | 0000 | 0005 | 0001 | 6409 | 5F66 | 6E69 | 7274 |
| 0001005760 | 632E | 0004 | A882 | 062E | 0000 | 0005 | 0001 | 640A |
| 0001006000 | 746F | 705F | 7261 | 2E73 | 0463 | B000 | 57AE | 0015 |
| 0001006020 | 0500 | 0100 | 0900 | 6F64 | 5F74 | 626F | 2E6A | 0463 |
| 0001006040 | 0800 | 4CC4 | 0002 | 0500 | 0100 | 0A00 | 6F64 | 5F74 |
| 0001006060 | 6F6C | 6B63 | 632E | 0004 | C654 | 093B | 0000 | 0005 |
| 0001006100 | 0001 | 6409 | 746F | 745F | 6C62 | 632E | 0004 | CF90 |
| 0001006120 | 0053 | 0000 | 0006 | 0001 | 6309 | 7832 | 7462 | 7672 |
| 0001006140 | 632E | 0004 | CFE4 | 0FC4 | 0000 | 0006 | 0001 | 6409 |
| 0001006160 | 6F73 | 6F5F | 6A62 | 632E | 0005 | 0000 | 28C0 | 0000 |
| 0001006200 | 0006 | 0001 | 6409 | 6F73 | 745F | 6C62 | 632E | 0005 |
| 0001006220 | 28C0 | 1ADB | 0000 | 0006 | 0001 | 640A | 6F73 | 665F |
| 0001006240 | 6C69 | 2E65 | 0563 | 9C00 | 9F43 | 0007 | 0600 | 0100 |
| 0001006260 | 0A00 | 7364 | 5F6F | 6168 | 6873 | 632E | 0004 | 6868 |
| 0001006300 | 00E6 | 0000 | 0001 | 0001 | 7308 | 7379 | 6574 | 2E6D |
| 0001006320 | 0463 | 4E00 | 1D69 | 0000 | 0100 | 0100 | 0D00 | 736F |
| 0001006340 | 5C32 | 6B6D | 6964 | 2E72 | 7361 | 046D | 6C00 | 1D69 |
| 0001006360 | 0000 | 0100 | 0100 | 0D00 | 736F | 5C32 | 6D72 | 6964 |
| 0001006400 | 2E72 | 7361 | 046D | 8A00 | 9469 | 0003 | 0100 | 0100 |
| 0001006420 | 0D00 | 736F | 5C32 | 7073 | 7761 | 766E | 2E65 | 0463 |
| 0001006440 | 1E00 | CE6D | 0001 | 0100 | 0100 | 0A00 | 7073 | 7761 |
| 0001006460 | 766E | 6570 | 632E | 0004 | 6EEC | 003B | 0000 | 0001 |
| 0001006500 | 0001 | 6F0E | 3273 | 615C | 6363 | 7365 | 2E73 | 7361 |
| 0001006520 | 046D | 2800 | 456F | 0000 | 0100 | 0100 | 0B00 | 7473 |
| 0001006540 | 6972 | 6D63 | 2E70 | 7361 | 046D | 6E00 | AA6F | 0000 |
| 0001006560 | 0100 | 0100 | 0900 | 6567 | 7074 | 7461 | 2E68 | 0463 |
| 0001006600 | 1800 | 0C70 | 0001 | 0100 | 0100 | 0A00 | 6573 | 7261 |
| 0001006620 | 6863 | 6E65 | 632E | 0004 | 7124 | 043A | 0000 | 0001 |
| 0001006640 | 0001 | 6F0D | 3273 | 635C | 6E65 | 6176 | 6772 | 632E |
| 0001006660 | 0004 | 755E | 0082 | 0000 | 0001 | 0001 | 6F0F | 3273 |
| 0001006700 | 645C | 736F | 6170 | 6E77 | 612E | 6D73 | 0000 | 0000 |
| 0001006720 | 0000 | 0000 | 0001 | 0000 | 630A | 6966 | 666E | 2E6F |
| 0001006740 | 7361 | 046D | E000 | 3A75 | 0001 | 0100 | 0100 | 0C00 |
| 0001006760 | 736F | 5C32 | 6567 | 6374 | 6477 | 632E | 0000 | 0001 |
| 0001007000 | 05E7 | 4407 | 5F42 | 4E49 | 5449 | 030B | 0001 | 05EE |
| 0001007020 | 440C | 5F42 | 4554 | 4D52 | 4E49 | 5441 | CF45 | 0106 |
| 0001007040 | F300 | 0805 | 4244 | 415F | 4C4C | 434F | 081E | 0001 |
| 0001007060 | 05F7 | 440A | 5F42 | 4552 | 4C41 | 4F4C | 7543 | 0109 |
| 0001007100 | FB00 | 0705 | 4244 | 465F | 4552 | 9D45 | 010A | FE00 |
| 0001007120 | 1005 | 4244 | 525F | 4745 | 5349 | 4554 | 5F52 | 5748 |
| 0001007140 | 444E | 0C85 | 0001 | 0606 | 440E | 5F42 | 4547 | 5F54 |
| 0001007160 | 5041 | 5F50 | 4950 | 2844 | 010D | 3200 | 1105 | 4244 |

THU MAR 14 17:31:54 1991 DB_PI.DLL PAGE 278, LINE 16344

| | | | | | | | | |
|---|---|---|---|---|---|---|---|---|
| 0001007200 | 435F | 4552 | 5441 | 5F45 | 5746 | 545F | 4552 | A045 |
| 0001007220 | 0113 | 3E00 | 1105 | 4244 | 525F | 4D45 | 564F | 5F45 |
| 0001007240 | 5746 | 545F | 4552 | 9D45 | 0117 | 4000 | 0F05 | 4244 |
| 0001007260 | 4C5F | 414F | 5F44 | 5746 | 545F | 4552 | 0B45 | 011A |
| 0001007300 | 4400 | 1105 | 4244 | 555F | 4C4E | 414F | 5F44 | 5746 |
| 0001007320 | 545F | 4552 | 7445 | 011C | 4600 | 1505 | 4244 | 535F |
| 0001007340 | 5445 | 435F | 5255 | 4552 | 544E | 465F | 4C4F | 4544 |
| 0001007360 | 4F52 | 0121 | 4F00 | 0E05 | 4244 | 4C5F | 5349 | 5F54 |
| 0001007400 | 5244 | 5649 | 5345 | 4F01 | 0001 | 055E | 440E | 5F42 |
| 0001007420 | 5746 | 4F5F | 4A42 | 535F | 5A49 | 9845 | 0125 | 3100 |
| 0001007440 | 1605 | 4244 | 435F | 4552 | 5441 | 5F45 | 5746 | 4F5F |
| 0001007460 | 4A42 | 435F | 4948 | 444C | 29C9 | 0001 | 053A | 4410 |
| 0001007500 | 5F42 | 5243 | 4145 | 4554 | 465F | 5F57 | 424F | EE4A |
| 0001007520 | 012D | 3E00 | 1005 | 4244 | 445F | 4C45 | 5445 | 5F45 |
| 0001007540 | 5746 | 4F5F | 4A42 | 310B | 0001 | 0540 | 4412 | 5F42 |
| 0001007560 | 4547 | 5F54 | 5746 | 4F5F | 4A42 | 445F | 5441 | 2541 |
| 0001007600 | 0134 | 4400 | 1305 | 4244 | 465F | 4552 | 5F45 | 5746 |
| 0001007620 | 4F5F | 4A42 | 495F | 464E | 604F | 0135 | 4900 | 1505 |
| 0001007640 | 4244 | 465F | 5F57 | 4449 | 465F | 4F52 | 5F4D | 4F4C |
| 0001007660 | 5047 | 5441 | 0648 | 0139 | 4D00 | 1505 | 4244 | 465F |
| 0001007700 | 5F57 | 4F4C | 5047 | 5441 | 5F48 | 5246 | 4D4F | 495F |
| 0001007720 | C244 | 013C | 5000 | 1105 | 4244 | 475F | 5445 | 465F |
| 0001007740 | 5F57 | 4F4C | 5047 | 5441 | 8248 | 0140 | 5400 | 1505 |
| 0001007760 | 4244 | 4C5F | 5349 | 5F54 | 5746 | 4F5F | 4A42 | 435F |
| 0001010000 | 4948 | 444C | B553 | 0143 | 5600 | 1005 | 4244 | 475F |
| 0001010020 | 5445 | 465F | 5F57 | 4150 | 4552 | 544E | 46E7 | 0001 |
| 0001010040 | 0558 | 440E | 5F42 | 4F43 | 5950 | 465F | 5F57 | 424F |
| 0001010060 | EC4A | 014A | 5C00 | 0E05 | 4244 | 4D5F | 564F | 5F45 |
| 0001010100 | 5746 | 4F5F | 4A42 | 60F7 | 0001 | 056B | 5F13 | 6264 |
| 0001010120 | 635F | 6F6C | 6573 | 615F | 6C6C | 745F | 7365 | 7374 |
| 0001010140 | 512C | 0001 | 055E | 440C | 5F42 | 504F | 4E45 | 545F |
| 0001010160 | 5345 | F754 | 015B | 6800 | 0D05 | 4244 | 435F | 4F4C |
| 0001010200 | 4553 | 545F | 5345 | 9E54 | 0161 | 6D00 | 0D05 | 4244 |
| 0001010220 | 535F | 4148 | 4552 | 545F | 5345 | D254 | 0162 | 6F00 |
| 0001010240 | 0B05 | 4244 | 4C5F | 414F | 5F44 | 4453 | 0042 | 0166 |
| 0001010260 | 7200 | 0D05 | 4244 | 555F | 4C4E | 414F | 5F44 | 4453 |
| 0001010300 | C742 | 0169 | 7600 | 0C05 | 4244 | 435F | 454C | 4E41 |
| 0001010320 | 535F | 4244 | 6DBE | 0001 | 0578 | 440C | 5F42 | 4C43 |
| 0001010340 | 4145 | 5F4E | 5354 | 0454 | 0A02 | B000 | 0904 | 6C5F |
| 0001010360 | 6E69 | 5F65 | 7562 | 0A66 | 016F | EB00 | 1405 | 4244 |
| 0001010400 | 415F | 4343 | 5345 | 5F53 | 5354 | 5F54 | 4353 | 4952 |
| 0001010420 | 5450 | 7395 | 0001 | 05F4 | 4415 | 5F42 | 4552 | 454C |
| 0001010440 | 5341 | 5F45 | 5354 | 5F54 | 4353 | 4952 | 5450 | 7DCB |
| 0001010460 | 0001 | 060C | 4411 | 5F42 | 4547 | 5F54 | 5354 | 5F54 |
| 0001010500 | 4548 | 4441 | 5245 | 8939 | 0001 | 0614 | 440F | 5F42 |
| 0001010520 | 5246 | 4545 | 545F | 5453 | 485F | 5244 | 8AD5 | 0001 |
| 0001010540 | 0618 | 4411 | 5F42 | 4553 | 5F54 | 5354 | 5F54 | 4548 |
| 0001010560 | 4441 | 5245 | 8E3F | 0001 | 061A | 4409 | 5F42 | 5053 |
| 0001010600 | 535F | 5445 | 8F90 | 0001 | 061D | 440C | 5F42 | 5053 |
| 0001010620 | 535F | 4145 | 4352 | 4C48 | 0199 | 8A00 | 0F05 | 4244 |
| 0001010640 | 4E5F | 5845 | 5F54 | 4F47 | 4A42 | 495F | D744 | 019C |
| 0001010660 | 8E00 | 0E05 | 4244 | 445F | 4C45 | 5445 | 5F45 | 4F47 |
| 0001010700 | 4A42 | A04A | 0001 | 0590 | 440E | 5F42 | 4F4D | 4944 |
| 0001010720 | 5946 | 475F | 424F | 744A | 01A4 | 9200 | 0B05 | 4244 |
| 0001010740 | 475F | 5445 | 475F | 424F | 2D4A | 01AA | 9500 | 0C05 |
| 0001010760 | 4244 | 4C5F | 5349 | 5F54 | 4F47 | 4A42 | 93DC | 0001 |
| 0001011000 | 0583 | 440E | 5F42 | 5243 | 4145 | 4554 | 475F | 424F |
| 0001011020 | 524A | 01D6 | C600 | 1405 | 4244 | 475F | 4E45 | 5245 |
| 0001011040 | 5441 | 5F45 | 4D49 | 5F47 | 414E | 454D | DBFD | 0001 |

THU MAR 14 17:31:54 1991 DB_PI.DLL PAGE 279, LINE 16403

| | | | | | | | | |
|---|---|---|---|---|---|---|---|---|
| 0001011060 | 05CB | 440E | 5F42 | 4547 | 5F54 | 4D49 | 5F47 | 4448 |
| 0001011100 | 7A52 | 01E0 | CD00 | 0E05 | 4244 | 535F | 5445 | 495F |
| 0001011120 | 474D | 485F | 5244 | EA13 | 0001 | 05CF | 440E | 5F42 |
| 0001011140 | 4553 | 5F54 | 4D49 | 5F47 | 4552 | AC46 | 01AD | AA00 |
| 0001011160 | 0C05 | 4244 | 415F | 4C4C | 434F | 495F | 474D | ECDE |
| 0001011200 | 0001 | 05D1 | 4412 | 5F42 | 5243 | 4145 | 4554 | 535F |
| 0001011220 | 4E59 | 5F43 | 4D49 | 9447 | 01B3 | B000 | 0E05 | 4244 |
| 0001011240 | 525F | 4145 | 4C4C | 434F | 495F | 474D | BB24 | 0001 |
| 0001011260 | 05B4 | 440B | 5F42 | 5246 | 4545 | 495F | 474D | BD8D |
| 0001011300 | 0001 | 05B7 | 440A | 5F42 | 4441 | 5F44 | 4D49 | B447 |
| 0001011320 | 01C5 | BB00 | 0D05 | 4244 | 415F | 4343 | 5345 | 5F53 |
| 0001011340 | 4D49 | 0447 | 01CB | C000 | 0E05 | 4244 | 525F | 4C45 |
| 0001011360 | 4145 | 4553 | 495F | 474D | D025 | 0001 | 05C2 | 440D |
| 0001011400 | 5F42 | 4544 | 454C | 4554 | 495F | 474D | D3A2 | 0001 |
| 0001011420 | 05C4 | 440C | 5F42 | 494C | 5453 | 495F | 474D | 0053 |
| 0001011440 | 0200 | A000 | 0D05 | 4244 | 415F | 4C4C | 434F | 495F |
| 0001011460 | 4F43 | 984E | 0203 | A700 | 0C05 | 4244 | 465F | 4552 |
| 0001011500 | 5F45 | 4349 | 4E4F | 04E5 | 0002 | 05AA | 440B | 5F42 |
| 0001011520 | 4441 | 5F44 | 4349 | 4E4F | 0983 | 0002 | 05AD | 440E |
| 0001011540 | 5F42 | 4544 | 454C | 4554 | 495F | 4F43 | 124E | 020E |
| 0001011560 | B300 | 0B05 | 4244 | 475F | 5445 | 495F | 4F43 | 994E |
| 0001011600 | 0212 | B500 | 0F05 | 4244 | 475F | 5445 | 495F | 4F43 |
| 0001011620 | 5F4E | 4448 | FE52 | 0214 | B900 | 0F05 | 4244 | 535F |
| 0001011640 | 5445 | 495F | 4F43 | 5F4E | 4448 | 3252 | 0216 | BB00 |
| 0001011660 | 0D05 | 4244 | 4C5F | 5349 | 5F54 | 4349 | 4E4F | 3F53 |
| 0001011700 | 0251 | CF00 | 1105 | 4244 | 495F | 474D | 415F | 4343 |
| 0001011720 | 5345 | 5F53 | 4953 | F547 | 0258 | D700 | 1405 | 4244 |
| 0001011740 | 495F | 474D | 525F | 4C45 | 4145 | 4553 | 4C5F | 5941 |
| 0001011760 | 5245 | 5F86 | 0002 | 05DB | 4412 | 5F42 | 4D49 | 5F47 |
| 0001012000 | 4552 | 454C | 5341 | 5F45 | 4953 | C447 | 0264 | DD00 |
| 0001012020 | 1105 | 4244 | 495F | 474D | 455F | 444E | 415F | 4343 |
| 0001012040 | 5345 | 5453 | 026D | DF00 | 1705 | 645F | 5F62 | 6D69 |
| 0001012060 | 5F67 | 7571 | 7265 | 5F79 | 6762 | 735F | 6174 | 7574 |
| 0001012100 | BE73 | 0218 | B400 | 1205 | 4244 | 495F | 474D | 535F |
| 0001012120 | 4154 | 5452 | 575F | 4952 | 4554 | 2328 | 0002 | 05BD |
| 0001012140 | 4412 | 5F42 | 4D49 | 5F47 | 5257 | 5449 | 5F45 | 414C |
| 0001012160 | 4559 | C052 | 022A | BF00 | 1005 | 4244 | 495F | 474D |
| 0001012200 | 575F | 4952 | 4554 | 535F | 4749 | 2FD9 | 0002 | 05C3 |
| 0001012220 | 4410 | 5F42 | 4D49 | 5F47 | 4E45 | 5F44 | 5257 | 5449 |
| 0001012240 | 7B45 | 023A | C500 | 1005 | 4244 | 495F | 474D | 435F |
| 0001012260 | 4E41 | 4543 | 5F4C | 504F | 4032 | 0002 | 05C7 | 4413 |
| 0001012300 | 5F42 | 4D49 | 5F47 | 5453 | 5241 | 5F54 | 4341 | 4543 |
| 0001012320 | 5353 | 4A36 | 0002 | 05CB | 4413 | 5F42 | 4D49 | 5F47 |
| 0001012340 | 4341 | 4543 | 5353 | 4C5F | 5941 | 5245 | 76FA | 0002 |
| 0001012360 | 05AA | 440D | 5F42 | 4441 | 5F44 | 4946 | 544C | 5245 |
| 0001012400 | 7A60 | 0002 | 05B0 | 4410 | 5F42 | 4544 | 454C | 4554 |
| 0001012420 | 465F | 4C49 | 4554 | FF52 | 027C | B400 | 0D05 | 4244 |
| 0001012440 | 475F | 5445 | 465F | 4C49 | 4554 | 4552 | 0280 | B800 |
| 0001012460 | 1505 | 4244 | 535F | 4145 | 4352 | 5F48 | 4946 | 544C |
| 0001012500 | 5245 | 4C5F | 5349 | B954 | 0287 | BC00 | 0D05 | 4244 |
| 0001012520 | 4C5F | 5349 | 5F54 | 4C46 | 5254 | DA53 | 0289 | 9800 |
| 0001012540 | 0C05 | 4244 | 415F | 4C4C | 434F | 415F | 494F | 8B3C |
| 0001012560 | 0002 | 059E | 440A | 5F42 | 4441 | 5F44 | 4F41 | AB49 |
| 0001012600 | 028F | A200 | 0D05 | 4244 | 445F | 4C45 | 5445 | 5F45 |
| 0001012620 | 4F41 | D749 | 0292 | A600 | 0A05 | 4244 | 475F | 5445 |
| 0001012640 | 415F | 494F | 988C | 0002 | 05A8 | 440F | 5F42 | 4F41 |
| 0001012660 | 5F49 | 4441 | 5F44 | 4C46 | 5254 | 9C56 | 0002 | 05AC |
| 0001012700 | 440F | 5F42 | 4F41 | 5F49 | 4544 | 5F4C | 4C46 | 5254 |
| 0001012720 | A209 | 0002 | 05AE | 440F | 5F42 | 4F41 | 5F49 | 4547 |

THU MAR 14 17:31:54 1991 DB_PI.DLL PAGE 280, LINE 16462

| | | | | | | | | |
|---|---|---|---|---|---|---|---|---|
| 0001012740 | 5F54 | 4C46 | 5254 | A424 | 0002 | 05B0 | 4413 | 5F42 |
| 0001012760 | 4F41 | 5F49 | 4547 | 5F54 | 4C46 | 5254 | 4C5F | 5453 |
| 0001013000 | A6CE | 0002 | 05B4 | 440B | 5F42 | 494C | 5453 | 415F |
| 0001013020 | 494F | A986 | 0002 | 05A7 | 4409 | 5F42 | 454D | 434D |
| 0001013040 | 5950 | AC1E | 0002 | 05AE | 4409 | 5F42 | 454D | 434D |
| 0001013060 | 504D | AF67 | 0002 | 05B3 | 4409 | 5F42 | 454D | 534D |
| 0001013100 | 5445 | B1DC | 0002 | 05B5 | 4409 | 5F42 | 454D | 434D |
| 0001013120 | 5248 | B509 | 0002 | 05B7 | 440E | 5F42 | 454D | 5F4D |
| 0001013140 | 4F4E | 5F54 | 4843 | 0552 | 02BA | BB00 | 0905 | 4244 |
| 0001013160 | 465F | 5257 | 5449 | B345 | 02C7 | C500 | 0805 | 4244 |
| 0001013200 | 465F | 4552 | 4441 | CBCC | 0002 | 05C8 | 4405 | 5F42 |
| 0001013220 | 5043 | C0E0 | 0002 | 05C0 | 4413 | 534F | 575F | 4952 |
| 0001013240 | 4554 | 445F | 5F42 | 5746 | 4952 | 4554 | E3A6 | 0002 |
| 0001013260 | 05A9 | 5F19 | 6264 | 725F | 6F6F | 5F74 | 7263 | 6165 |
| 0001013300 | 6574 | 745F | 6261 | 656C | 665F | 726F | CEC7 | 0002 |
| 0001013320 | 0574 | 5F0F | 6264 | 675F | 7465 | 725F | 6F6F | 5F74 |
| 0001013340 | 6264 | CF24 | 0002 | 0575 | 5F0F | 6264 | 735F | 7365 |
| 0001013360 | 6973 | 6E6F | 6F5F | 6666 | E6D3 | 0002 | 05AB | 5F19 |
| 0001013400 | 6264 | 725F | 6F6F | 5F74 | 6572 | 6F6D | 6576 | 745F |
| 0001013420 | 6261 | 656C | 665F | 726F | CF64 | 0002 | 0577 | 5F0F |
| 0001013440 | 6264 | 745F | 6C62 | 675F | 7465 | 745F | 7473 | E82C |
| 0001013460 | 0002 | 05AD | 5F16 | 6264 | 725F | 6F6F | 5F74 | 6567 |
| 0001013500 | 5F74 | 6174 | 6C62 | 5F65 | 6F66 | FA72 | 02E8 | AF00 |
| 0001013520 | 1705 | 645F | 5F62 | 6F72 | 746F | 675F | 7465 | 665F |
| 0001013540 | 6C69 | 6574 | 5F72 | 696C | 4D62 | 02D0 | 7900 | 0F05 |
| 0001013560 | 645F | 5F62 | 6274 | 5F6C | 6461 | 5F64 | 7374 | 4E74 |
| 0001013600 | 02E9 | B100 | 1505 | 645F | 5F62 | 6F72 | 746F | 675F |
| 0001013620 | 7465 | 695F | 6F63 | 5F6E | 696C | 3162 | 02D2 | 7B00 |
| 0001013640 | 0F05 | 645F | 5F62 | 6274 | 5F6C | 6564 | 5F6C | 7374 |
| 0001013660 | A274 | 02E9 | B300 | 1305 | 645F | 5F62 | 6F72 | 746F |
| 0001013700 | 675F | 7465 | 735F | 5F70 | 6468 | 0B72 | 02D3 | 7D00 |
| 0001013720 | 1405 | 645F | 5F62 | 7274 | 6565 | 695F | 696E | 5F74 |
| 0001013740 | 7473 | 7572 | 7463 | EA09 | 0002 | 05B5 | 5F0F | 6264 |
| 0001013760 | 725F | 6F6F | 5F74 | 6573 | 5F74 | 7073 | D3E5 | 0002 |
| 0001014000 | 0582 | 5F11 | 6264 | 725F | 6F6F | 5F74 | 6567 | 5F74 |
| 0001014020 | 7274 | 6565 | EAA9 | 0002 | 05B6 | 5F10 | 6264 | 725F |
| 0001014040 | 6F6F | 5F74 | 6163 | 636C | 735F | 5470 | 02EC | B800 |
| 0001014060 | 1405 | 645F | 5F62 | 7369 | 745F | 7079 | 5F65 | 6361 |
| 0001014100 | 5F63 | 6F6D | 6564 | D4A7 | 0002 | 0584 | 5F11 | 6264 |
| 0001014120 | 725F | 6F6F | 5F74 | 6461 | 5F64 | 7274 | 6565 | D661 |
| 0001014140 | 0002 | 0586 | 5F11 | 6264 | 725F | 6F6F | 5F74 | 6564 |
| 0001014160 | 5F6C | 7274 | 6565 | D794 | 0002 | 0588 | 5F12 | 6264 |
| 0001014200 | 675F | 7465 | 645F | 6972 | 6576 | 745F | 6572 | 3465 |
| 0001014220 | 02D8 | 8A00 | 1405 | 645F | 5F62 | 6567 | 5F74 | 6F6C |
| 0001014240 | 7067 | 7461 | 5F68 | 7274 | 6565 | D9B2 | 0002 | 058C |
| 0001014260 | 5F0F | 6264 | 755F | 6C6E | 616F | 5F64 | 7274 | 6565 |
| 0001014300 | DAB0 | 0002 | 058D | 5F14 | 6264 | 755F | 6C6E | 616F |
| 0001014320 | 5F64 | 6C61 | 5F6C | 7274 | 6565 | 6373 | 02DB | 8F00 |
| 0001014340 | 1405 | 645F | 5F62 | 7274 | 6E61 | 5F73 | 7264 | 7669 |
| 0001014360 | 5F65 | 616E | 656D | DBEC | 0002 | 0591 | 5F11 | 6264 |
| 0001014400 | 675F | 7465 | 645F | 6972 | 6576 | 735F | 7274 | DC28 |
| 0001014420 | 0002 | 0593 | 5F0F | 6264 | 725F | 6F6F | 5F74 | 6573 |
| 0001014440 | 5F74 | 6477 | DC5B | 0002 | 0594 | 5F16 | 6264 | 735F |
| 0001014460 | 7465 | 645F | 6665 | 7561 | 746C | 705F | 7261 | 6D61 |
| 0001014500 | 6573 | 02DE | 9B00 | 1605 | 645F | 5F62 | 6176 | 696C |
| 0001014520 | 6164 | 6574 | 665F | 6C75 | 5F6C | 6170 | 6874 | DF76 |
| 0001014540 | 0002 | 059E | 5F15 | 6264 | 725F | 6F6F | 5F74 | 6461 |
| 0001014560 | 5F64 | 706F | 6E65 | 695F | 676D | E12D | 0002 | 05A0 |
| 0001014600 | 5F15 | 6264 | 725F | 6F6F | 5F74 | 6567 | 5F74 | 706F |

THU MAR 14 17:31:54 1991 DB_PI.DLL PAGE 281, LINE 16521

| | | | | | | | | |
|---|---|---|---|---|---|---|---|---|
| 0001014620 | 6E65 | 695F | 676D | E21A | 0002 | 05A2 | 5F15 | 6264 |
| 0001014640 | 725F | 6F6F | 5F74 | 6564 | 5F6C | 706F | 6E65 | 695F |
| 0001014660 | 676D | E286 | 0002 | 05A4 | 5F1B | 6264 | 725F | 6F6F |
| 0001014700 | 5F74 | 6163 | 636E | 6C65 | 615F | 6C6C | 695F | 676D |
| 0001014720 | 6F5F | 7370 | E332 | 0002 | 05A6 | 5F15 | 6264 | 725F |
| 0001014740 | 6F6F | 5F74 | 6567 | 5F74 | 6C64 | 5F6C | 6170 | 6874 |
| 0001014760 | CC2A | 0002 | 056F | 5F10 | 6264 | 695F | 696E | 5F74 |
| 0001015000 | 6F72 | 746F | 645F | 1862 | 02CE | 7200 | 1505 | 645F |
| 0001015020 | 5F62 | 6574 | 6D72 | 6E69 | 7461 | 5F65 | 6F72 | 746F |
| 0001015040 | 645F | FF62 | 0310 | CE00 | 1805 | 645F | 7374 | 725F |
| 0001015060 | 6365 | 6E6F | 7473 | 7572 | 7463 | 695F | 676D | 745F |
| 0001015100 | 6C62 | 1120 | 0003 | 05D0 | 5F0D | 7464 | 5F73 | 6173 |
| 0001015120 | 6576 | 695F | 676D | 13AD | 0003 | 05D2 | 5F12 | 7464 |
| 0001015140 | 5F73 | 6D69 | 5F67 | 6E69 | 6574 | 7267 | 7469 | 0079 |
| 0001015160 | 0300 | A700 | 1005 | 645F | 7374 | 745F | 6C62 | 615F |
| 0001015200 | 6464 | 695F | 676D | 0166 | 0003 | 05A9 | 5F10 | 7464 |
| 0001015220 | 5F73 | 6274 | 5F6C | 6567 | 5F74 | 6D69 | FE67 | 0302 |
| 0001015240 | AB00 | 1005 | 645F | 7374 | 745F | 6C62 | 645F | 6C65 |
| 0001015260 | 695F | 676D | 06E2 | 0003 | 05B7 | 5F12 | 7464 | 5F73 |
| 0001015300 | 6274 | 5F6C | 696C | 7473 | 695F | 676D | E773 | 0309 |
| 0001015320 | BC00 | 1805 | 645F | 7374 | 635F | 6572 | 7461 | 5F65 |
| 0001015340 | 7462 | 7672 | 695F | 676D | 735F | 6264 | 0A90 | 0003 |
| 0001015360 | 05BE | 5F11 | 7464 | 5F73 | 6F6C | 6461 | 695F | 676D |
| 0001015400 | 745F | 6C62 | 0C32 | 0003 | 05C0 | 5F13 | 7464 | 5F73 |
| 0001015420 | 6E75 | 6F6C | 6461 | 695F | 676D | 745F | 6C62 | 0C8B |
| 0001015440 | 0003 | 05C2 | 5F18 | 7464 | 5F73 | 6E75 | 6F6C | 6461 |
| 0001015460 | 615F | 6C6C | 695F | 676D | 745F | 6C62 | 7C73 | 030D |
| 0001015500 | C600 | 0F05 | 645F | 7374 | 645F | 6C65 | 7465 | 5F65 |
| 0001015520 | 6D69 | 2967 | 030E | C800 | 1205 | 645F | 7374 | 635F |
| 0001015540 | 656C | 6E61 | 695F | 676D | 745F | 6C62 | 0FD4 | 0003 |
| 0001015560 | 05CA | 5F17 | 7464 | 5F73 | 6C63 | 6165 | 5F6E | 6C61 |
| 0001015600 | 5F6C | 6D69 | 5F67 | 6274 | 736C | 1034 | 0003 | 05CC |
| 0001015620 | 5F14 | 7464 | 5F73 | 6567 | 5F74 | 616C | 7473 | 695F |
| 0001015640 | 676D | 695F | CD64 | 031D | E300 | 1505 | 645F | 7374 |
| 0001015660 | 755F | 6C6E | 616F | 5F64 | 6D69 | 5F67 | 6966 | 656C |
| 0001015700 | 0D73 | 031E | E500 | 1605 | 645F | 7374 | 6D5F | 6B61 |
| 0001015720 | 5F65 | 6D69 | 5F67 | 6966 | 656C | 616E | 656D | 1E58 |
| 0001015740 | 0003 | 05E8 | 5F16 | 7464 | 5F73 | 616D | 656B | 695F |
| 0001015760 | 676D | 705F | 7461 | 6E68 | 6D61 | CD65 | 031E | EA00 |
| 0001016000 | 1405 | 645F | 7374 | 615F | 6C6C | 636F | 6F5F | 6570 |
| 0001016020 | 5F6E | 6966 | 656C | 2176 | 0003 | 05ED | 5F0F | 7464 |
| 0001016040 | 5F73 | 6C63 | 736F | 5F65 | 6966 | 656C | 2239 | 0003 |
| 0001016060 | 05EF | 5F11 | 7464 | 5F73 | 6572 | 6461 | 695F | 676D |
| 0001016100 | 735F | 6769 | 22F8 | 0003 | 05F1 | 5F12 | 7464 | 5F73 |
| 0001016120 | 7277 | 7469 | 5F65 | 6D69 | 5F67 | 6973 | B767 | 0323 |
| 0001016140 | F300 | 1305 | 645F | 7374 | 725F | 6165 | 5F64 | 6D69 |
| 0001016160 | 5F67 | 616C | 6579 | F172 | 0324 | F500 | 1405 | 645F |
| 0001016200 | 7374 | 775F | 6972 | 6574 | 695F | 676D | 6C5F | 7961 |
| 0001016220 | 7265 | 26D1 | 0003 | 05F9 | 5F1A | 7464 | 5F73 | 7361 |
| 0001016240 | 6E79 | 5F63 | 7277 | 7469 | 5F65 | 6D69 | 5F67 | 616C |
| 0001016260 | 6579 | 0972 | 0328 | FB00 | 1B05 | 645F | 7374 | 775F |
| 0001016300 | 6961 | 5F74 | 6F66 | 5F72 | 616C | 6579 | 5F72 | 7277 |
| 0001016320 | 745F | 7268 | 6264 | 0317 | D600 | 1005 | 645F | 7374 |
| 0001016340 | 645F | 6165 | 6C6C | 636F | 695F | 676D | 17FC | 0003 |
| 0001016360 | 05D8 | 5F13 | 7464 | 5F73 | 7277 | 7469 | 5F65 | 6D69 |
| 0001016400 | 5F67 | 6966 | 656C | 1A2F | 0003 | 05DB | 5F12 | 7464 |
| 0001016420 | 5F73 | 6572 | 6461 | 695F | 676D | 665F | 6C69 | 0665 |
| 0001016440 | 031D | E100 | 1405 | 645F | 7374 | 615F | 7973 | 636E |
| 0001016460 | 775F | 6972 | 6574 | 695F | 676D | 2B4E | 0003 | 0553 |

THU MAR 14 17:31:54 1991 DB_PI.DLL PAGE 282, LINE 16580

| | | | | | | | | |
|---|---|---|---|---|---|---|---|---|
| 0001016500 | 5F11 | 7464 | 5F69 | 6567 | 5F74 | 6369 | 6E6F | 745F |
| 0001016520 | 6C62 | 2C19 | 0003 | 0554 | 5F14 | 7464 | 5F69 | 6E75 |
| 0001016540 | 6F6C | 6461 | 695F | 6F63 | 5F6E | 6274 | 916C | 032C |
| 0001016560 | 5600 | 0F05 | 645F | 6974 | 6C5F | 7369 | 5F74 | 6369 |
| 0001016600 | 6E6F | E873 | 0330 | 3000 | 1305 | 645F | 6674 | 635F |
| 0001016620 | 656C | 6E61 | 665F | 746C | 5F72 | 6274 | 426C | 0331 |
| 0001016640 | 3200 | 1305 | 645F | 6674 | 745F | 6C62 | 6C5F | 7369 |
| 0001016660 | 5F74 | 6C66 | 7274 | 9673 | 032E | 2900 | 1905 | 645F |
| 0001016700 | 6674 | 635F | 6572 | 7461 | 5F65 | 7462 | 7672 | 665F |
| 0001016720 | 746C | 5F72 | 6473 | DF62 | 032E | 2B00 | 1205 | 645F |
| 0001016740 | 6674 | 6C5F | 616F | 5F64 | 6C66 | 7274 | 745F | 6C62 |
| 0001016760 | 3028 | 0003 | 052D | 5F14 | 7464 | 5F66 | 6E75 | 6F6C |
| 0001017000 | 6461 | 665F | 746C | 5F72 | 6274 | 706C | 0330 | 2E00 |
| 0001017020 | 1905 | 645F | 6674 | 755F | 6C6E | 616F | 5F64 | 6C67 |
| 0001017040 | 626F | 665F | 746C | 5F72 | 6274 | 386C | 0333 | 0500 |
| 0001017060 | 1805 | 645F | 6174 | 635F | 6572 | 7461 | 5F65 | 7462 |
| 0001017100 | 7672 | 615F | 696F | 735F | 6264 | 3381 | 0003 | 0507 |
| 0001017120 | 5F11 | 7464 | 5F61 | 6F6C | 6461 | 615F | 696F | 745F |
| 0001017140 | 6C62 | 34D9 | 0003 | 0509 | 5F13 | 7464 | 5F61 | 6E75 |
| 0001017160 | 6F6C | 6461 | 615F | 696F | 745F | 6C62 | 3521 | 0003 |
| 0001017200 | 050B | 5F12 | 7464 | 5F61 | 6C63 | 6165 | 5F6E | 6F61 |
| 0001017220 | 5F69 | 6274 | 7B6C | 0335 | 0D00 | 1205 | 645F | 6174 |
| 0001017240 | 745F | 6C62 | 6C5F | 7369 | 5F74 | 6F61 | 7369 | 3760 |
| 0001017260 | 0003 | 0505 | 5F17 | 7464 | 5F67 | 7263 | 6165 | 6574 |
| 0001017300 | 625F | 7274 | 5F76 | 6E67 | 735F | 6264 | 37DA | 0003 |
| 0001017320 | 0507 | 5F11 | 7464 | 5F67 | 6F6C | 6461 | 675F | 6E65 |
| 0001017340 | 745F | 6C62 | 396C | 0003 | 0509 | 5F13 | 7464 | 5F67 |
| 0001017360 | 6E75 | 6F6C | 6461 | 675F | 6E65 | 745F | 6C62 | 39A2 |
| 0001017400 | 0003 | 050B | 5F18 | 7464 | 5F67 | 6E75 | 6F6C | 6461 |
| 0001017420 | 615F | 6C6C | 675F | 6E65 | 745F | 6C62 | 1873 | 033A |
| 0001017440 | 0D00 | 1205 | 645F | 6774 | 635F | 656C | 6E61 | 675F |
| 0001017460 | 6E65 | 745F | 6C62 | 3A7C | 0003 | 050F | 5F17 | 7464 |
| 0001017500 | 5F67 | 6C63 | 6165 | 5F6E | 6C61 | 5F6C | 6567 | 5F6E |
| 0001017520 | 6274 | 736C | 3B01 | 0003 | 0511 | 5F12 | 7464 | 5F67 |
| 0001017540 | 6274 | 5F6C | 696C | 7473 | 675F | 6E65 | F073 | 033C |
| 0001017560 | 6200 | 1002 | 645F | 6D74 | 6D5F | 6D65 | 6E5F | 746F |
| 0001017600 | 635F | 7268 | 3EC3 | 0003 | 05C8 | 440B | 5F42 | 4F4C |
| 0001017620 | 4441 | 435F | 4746 | 4965 | 0003 | 05CD | 440D | 5F42 |
| 0001017640 | 4E55 | 4F4C | 4441 | 435F | 4746 | 4C91 | 0003 | 05D5 |
| 0001017660 | 4413 | 5F42 | 4547 | 5F54 | 4643 | 5F47 | 554E | 5F4D |
| 0001017700 | 5449 | 4D45 | 5014 | 0003 | 05D9 | 4418 | 5F42 | 4547 |
| 0001017720 | 5F54 | 4643 | 5F47 | 554E | 5F4D | 5449 | 4D45 | 4C5F |
| 0001017740 | 5349 | EC54 | 0356 | DD00 | 1305 | 4244 | 475F | 5445 |
| 0001017760 | 435F | 4746 | 535F | 5254 | 495F | 4554 | 1C4D | 035B |
| 0001020000 | DF00 | 1305 | 4244 | 465F | 4552 | 5F45 | 5453 | 4952 |
| 0001020020 | 474E | 4C5F | 5349 | 7554 | 035B | E100 | 1805 | 4244 |
| 0001020040 | 475F | 5445 | 435F | 4746 | 535F | 5254 | 4C5F | 5349 |
| 0001020060 | 5F54 | 5449 | 4D45 | 0000 | 000A | 00C0 | 5F0B | 7464 |
| 0001020100 | 5F6C | 7979 | 6574 | 7478 | 0304 | 000A | 0081 | 5F07 |
| 0001020120 | 7979 | 656C | 676E | 7166 | 0003 | 05CD | 5F19 | 7464 |
| 0001020140 | 5F6C | 6573 | 5F74 | 6E69 | 7469 | 6169 | 5F6C | 6170 |
| 0001020160 | 6874 | 616E | 656D | 2D4E | 000B | 0206 | 5F06 | 7979 |
| 0001020200 | 756F | 2C74 | 0373 | CF00 | 1205 | 645F | 6C74 | 735F |
| 0001020220 | 7274 | 615F | 6C6C | 636F | 635F | 7970 | 751C | 0003 |
| 0001020240 | 05D5 | 5F0E | 7464 | 5F6C | 6567 | 5F74 | 6F74 | 656B |
| 0001020260 | 4A6E | 0B2D | 0600 | 0902 | 645F | 6C74 | 795F | 6979 |
| 0001020300 | D56E | 0366 | C400 | DA05 | 645F | 6C74 | 795F | 6C79 |
| 0001020320 | 7865 | 7B98 | 0003 | 0595 | 5F0E | 7464 | 5F70 | 6F6C |
| 0001020340 | 6461 | 665F | 6C69 | EB65 | 0385 | 9800 | 1205 | 645F |

THU MAR 14 17:31:54 1991 DB_PI.DLL PAGE 283, LINE 16639

| | | | | | | | | |
|---|---|---|---|---|---|---|---|---|
| 0001020360 | 7074 | 6E5F | 726F | 616D | 696C | 657A | 735F | 7274 |
| 0001020400 | 8672 | 0003 | 059A | 5F0D | 6264 | 635F | 6766 | 665F |
| 0001020420 | 7570 | 7374 | 878C | 0003 | 059E | 5F18 | 6264 | 635F |
| 0001020440 | 6766 | 665F | 6C6F | 5F64 | 7473 | 5F72 | 6F74 | 7075 |
| 0001020460 | 6570 | C472 | 039F | E500 | 0C05 | 4244 | 495F | 544E |
| 0001020500 | 4745 | 4952 | 5954 | A0EC | 0003 | 05E7 | 4414 | 5F42 |
| 0001020520 | 5246 | 4545 | 495F | 544E | 4745 | 4952 | 5954 | 455F |
| 0001020540 | EC52 | 0387 | BF00 | 1205 | 4244 | 525F | 4345 | 564F |
| 0001020560 | 5245 | 535F | 4255 | 5254 | 4545 | 891E | 0003 | 05C5 |
| 0001020600 | 440E | 5F42 | 4552 | 4F43 | 4556 | 5F52 | 4453 | 4E42 |
| 0001020620 | 03A1 | 5500 | 0505 | 4244 | 445F | 7055 | 0B3C | 0000 |
| 0001020640 | 0600 | 655F | 6164 | 6174 | 5B70 | 000B | 0000 | 5F04 |
| 0001020660 | 6E65 | 1064 | 0400 | 0000 | 0600 | 5F43 | 4E49 | 5449 |
| 0001020700 | 2E98 | 000B | 0000 | 5F0C | 6E5F | 6568 | 7061 | 645F |
| 0001020720 | 7365 | 7063 | 0B5B | 0000 | 0C00 | 735F | 6174 | 6B63 |
| 0001020740 | 6F62 | 7474 | 6D6F | 2EBE | 000B | 0000 | 5F0C | 5F5F |
| 0001020760 | 4461 | 7342 | 7077 | 6C66 | 8A67 | 0B2E | 0000 | 0800 |
| 0001021000 | 5F5F | 6361 | 646D | 6E6C | 2EBC | 000B | 0000 | 5F08 |
| 0001021020 | 615F | 6573 | 6867 | BA69 | 0B2E | 0000 | 0800 | 5F5F |
| 0001021040 | 7361 | 6765 | 6F6C | 2E96 | 000B | 0000 | 5F08 | 615F |
| 0001021060 | 6973 | 647A | 9473 | 0B2E | 0000 | 0800 | 5F5F | 7461 |
| 0001021100 | 706F | 7073 | 2EAC | 000B | 0000 | 5F09 | 615F | 6663 |
| 0001021120 | 6E69 | 6F66 | D6D6 | 0000 | 0001 | 5F09 | 615F | 4244 |
| 0001021140 | 7375 | 6465 | 2E8C | 000B | 0000 | 5F09 | 615F | 6E65 |
| 0001021160 | 7376 | 6765 | 2E90 | 000B | 0000 | 5F0A | 745F | 7268 |
| 0001021200 | 6165 | 6964 | 8E64 | 0B2E | 0000 | 0A00 | 5F5F | 6967 |
| 0001021220 | 666E | 736F | 6765 | D6D6 | 0000 | 0001 | 5F0A | 615F |
| 0001021240 | 4244 | 6F64 | 7773 | 9270 | 0B2E | 0000 | 0A00 | 5F5F |
| 0001021260 | 696C | 666E | 736F | 6765 | 9876 | 0000 | 0001 | 5F0A |
| 0001021300 | 615F | 7263 | 7574 | 6573 | C064 | 0B2E | 0000 | 0B00 |
| 0001021320 | 5F5F | 615F | 4244 | 7472 | 7265 | 8172 | 0400 | 0000 |
| 0001021340 | 0B00 | 5F5F | 6D61 | 6773 | 655F | 6978 | CE74 | 0B2E |
| 0001021360 | 0000 | 0B00 | 5F5F | 736F | 6576 | 7372 | 6F69 | 9B6E |
| 0001021400 | 0401 | 0000 | 0600 | 5F5F | 7865 | 7469 | 024D | 0004 |
| 0001021420 | 0000 | 5F0C | 755F | 6C6E | 636F | 656B | 6978 | E174 |
| 0001021440 | 0B30 | 0000 | 0700 | 5F5F | 6863 | 6C69 | D164 | 0B2E |
| 0001021460 | 0000 | 0700 | 5F5F | 666E | 6C69 | E265 | 0400 | 0000 |
| 0001021500 | 0700 | 5F5F | 6963 | 696E | D374 | 0B30 | 0000 | 0700 |
| 0001021520 | 5F5F | 615F | 6772 | A363 | 0401 | 0000 | 0700 | 5F5F |
| 0001021540 | 6563 | 6978 | CE74 | 0B2E | 0000 | 0D00 | 5F5F | 6F64 |
| 0001021560 | 7673 | 7265 | 616D | 6F6A | D572 | 0B30 | 0000 | 0700 |
| 0001021600 | 5F5F | 615F | 6772 | CF76 | 0B2E | 0000 | 0D00 | 5F5F |
| 0001021620 | 6F64 | 7673 | 7265 | 696D | 6F6E | D372 | 0B2F | 0000 |
| 0001021640 | 0800 | 5F5F | 6970 | 6570 | 6863 | 30D9 | 000B | 0000 |
| 0001021660 | 5F08 | 6E65 | 6976 | 6F72 | D36E | 0B2E | 0000 | 0800 |
| 0001021700 | 5F5F | 736F | 6966 | 656C | 2ED0 | 000B | 0000 | 5F08 |
| 0001021720 | 6F5F | 6D73 | 646F | 3C65 | 0401 | 0000 | 0800 | 5F5F |
| 0001021740 | 6E69 | 7469 | 7066 | 3A42 | 000B | 0000 | 5F08 | 665F |
| 0001021760 | 6970 | 696E | 7074 | 0402 | 0000 | 0800 | 5F5F | 6574 |
| 0001022000 | 6D72 | 7066 | 30DD | 000B | 0000 | 5F08 | 705F | 6D67 |
| 0001022020 | 7470 | AD72 | 0401 | 0000 | 0800 | 5F5F | 5F63 | 7865 |
| 0001022040 | 7469 | 2ED0 | 000B | 0000 | 5F09 | 645F | 736F | 6F6D |
| 0001022060 | 6564 | 2ECE | 000B | 0000 | 5F09 | 6F5F | 6D73 | 6A61 |
| 0001022100 | 726F | 2ECF | 000B | 0000 | 5F09 | 6F5F | 6D73 | 6E69 |
| 0001022120 | 726F | 30E3 | 000B | 0000 | 5F0A | 655F | 6978 | 6474 |
| 0001022140 | 6E6F | 0365 | 0402 | 0000 | 0A00 | 5F5F | 6F6C | 6B63 |
| 0001022160 | 7865 | 7469 | 2ECC | 000B | 0000 | 5F0A | 755F | 616D |
| 0001022200 | 6B73 | 6176 | 706C | 0402 | 0000 | 0A00 | 5F5F | 7463 |
| 0001022220 | 7265 | 736D | 6275 | 30E5 | 000B | 0000 | 5F0A | 655F |

THU MAR 14 17:31:54 1991 DB_PI.DLL PAGE 284, LINE 16698

| | | | | | | | | |
|---|---|---|---|---|---|---|---|---|
| 0001022240 | 6978 | 5F74 | 6974 | C264 | 0B2E | 0000 | 0500 | 5F5F |
| 0001022260 | 6166 | 9463 | 0401 | 0000 | 0500 | 655F | 6978 | 9274 |
| 0001022300 | 0402 | 0000 | 0E00 | 5F5F | 4646 | 4D5F | 4753 | 4142 |
| 0001022320 | 4E4E | 5245 | 30E8 | 000B | 0000 | 5F09 | 615F | 6264 |
| 0001022340 | 6D67 | 6773 | 9876 | 0000 | 0001 | 5F09 | 615F | 7263 |
| 0001022360 | 6D74 | 6773 | 02B4 | 0004 | 0000 | 5F08 | 665F | 7470 |
| 0001022400 | 6172 | EC70 | 0B30 | 0000 | 0C00 | 5F5F | 6161 | 746C |
| 0001022420 | 7473 | 6F6B | 7276 | 02BA | 0004 | 0000 | 5F08 | 635F |
| 0001022440 | 6B68 | 7473 | BA6B | 0402 | 0000 | 0A00 | 5F5F | 4661 |
| 0001022460 | 6863 | 736B | 6B74 | 02D4 | 0004 | 0000 | 5F09 | 735F |
| 0001022500 | 7465 | 6E65 | 7076 | 03DC | 0004 | 0000 | 5F0B | 4E5F |
| 0001022520 | 534D | 5F47 | 4554 | 5458 | 040C | 0004 | 0000 | 5F0C |
| 0001022540 | 4E5F | 534D | 5F47 | 5257 | 5449 | EE45 | 0404 | 0000 |
| 0001022560 | 0B00 | 5F5F | 645F | 736F | 7265 | 6E72 | F66F | 0404 |
| 0001022600 | 0000 | 0700 | 5F5F | 7265 | 6E72 | A76F | 0404 | 0000 |
| 0001022620 | 0800 | 5F5F | 6F64 | 7273 | 7465 | 048E | 0004 | 0000 |
| 0001022640 | 5F09 | 645F | 736F | 6572 | 6674 | 054E | 0004 | 0000 |
| 0001022660 | 5F0B | 665F | 6C63 | 736F | 5F65 | 6B6C | 0502 | 0004 |
| 0001022700 | 0000 | 5F07 | 6366 | 6F6C | 6573 | 0604 | 0004 | 0000 |
| 0001022720 | 5F08 | 665F | 6F73 | 6570 | 566E | 0406 | 0000 | 0600 |
| 0001022740 | 665F | 706F | 6E65 | 066E | 0004 | 0000 | 5F08 | 7066 |
| 0001022760 | 6972 | 746E | 0266 | 0407 | 0000 | 0A00 | 5F5F | 7266 |
| 0001023000 | 6165 | 5F64 | 6B6C | 06C8 | 0004 | 0000 | 5F06 | 7266 |
| 0001023020 | 6165 | 7464 | 0408 | 0000 | 0700 | 665F | 6373 | 6E61 |
| 0001023040 | B666 | 0408 | 0000 | 0700 | 665F | 7277 | 7469 | F065 |
| 0001023060 | 0408 | 0000 | 0B00 | 5F5F | 7766 | 6972 | 6574 | 6C5F |
| 0001023100 | 886B | 040A | 0000 | 0700 | 705F | 6972 | 746E | F466 |
| 0001023120 | 0B30 | 0000 | 0800 | 5F5F | 6663 | 756C | 6873 | 0004 |
| 0001023140 | 000A | 0000 | 5F07 | 625F | 6675 | 6E69 | 30F6 | 000B |
| 0001023160 | 0000 | 5F05 | 695F | 626F | 32D6 | 000B | 0000 | 5F06 |
| 0001023200 | 695F | 626F | B632 | 0B34 | 0000 | 0900 | 5F5F | 616C |
| 0001023220 | 7473 | 6F69 | D662 | 040A | 0000 | 0800 | 5F5F | 6966 |
| 0001023240 | 626C | 6675 | 0B72 | 0004 | 0000 | 5F08 | 665F | 736C |
| 0001023260 | 7562 | 5866 | 040C | 0000 | 0900 | 5F5F | 7266 | 6565 |
| 0001023300 | 7562 | 9066 | 040C | 0000 | 0800 | 5F5F | 6567 | 6274 |
| 0001023320 | 6675 | 0CDC | 0004 | 0000 | 5F0A | 6F5F | 6570 | 666E |
| 0001023340 | 6C69 | 4665 | 040E | 0000 | 0700 | 5F5F | 7466 | 7562 |
| 0001023360 | CE66 | 040D | 0000 | 0700 | 5F5F | 7473 | 7562 | D466 |
| 0001023400 | 040E | 0000 | 0B00 | 5F5F | 6666 | 756C | 6873 | 6C5F |
| 0001023420 | 8E6B | 040E | 0000 | 0700 | 665F | 6C66 | 7375 | 4068 |
| 0001023440 | 040F | 0000 | 0900 | 665F | 756C | 6873 | 6C61 | BC6C |
| 0001023460 | 040F | 0000 | 0700 | 5F5F | 6E69 | 7570 | F674 | 0417 |
| 0001023500 | 0000 | 0800 | 5F5F | 756F | 7074 | 7475 | 1CE0 | 0004 |
| 0001023520 | 0000 | 5F0B | 675F | 7465 | 7473 | 6572 | 6D61 | 1D60 |
| 0001023540 | 0004 | 0000 | 5F06 | 7066 | 7475 | 5863 | 041D | 0000 |
| 0001023560 | 0800 | 705F | 7475 | 6863 | 7261 | 1D58 | 0004 | 0000 |
| 0001023600 | 5F09 | 7066 | 7475 | 6863 | 7261 | 1D60 | 0004 | 0000 |
| 0001023620 | 5F05 | 7570 | 6374 | 1DA4 | 0004 | 0000 | 5F07 | 6E75 |
| 0001023640 | 6567 | 6374 | 1DE4 | 0004 | 0000 | 5F0B | 755F | 676E |
| 0001023660 | 7465 | 5F63 | 6B6C | 1E4E | 0004 | 0000 | 5F06 | 6C63 |
| 0001023700 | 736F | 9865 | 041E | 0000 | 0600 | 6C5F | 6573 | 6B65 |
| 0001023720 | 1E8E | 0004 | 0000 | 5F0A | 6C5F | 6573 | 6B65 | 6C5F |
| 0001023740 | 066B | 041F | 0000 | 0600 | 735F | 706F | 6E65 | 1F17 |
| 0001023760 | 0004 | 0000 | 5F05 | 706F | 6E65 | 20D2 | 0004 | 0000 |
| 0001024000 | 5F11 | 635F | 4558 | 494E | 7458 | 446F | 534F | 6F6D |
| 0001024020 | 6564 | 20E4 | 0004 | 0000 | 5F05 | 6572 | 6461 | 224C |
| 0001024040 | 0004 | 0000 | 5F06 | 7277 | 7469 | 4265 | 0422 | 0000 |
| 0001024060 | 0A00 | 5F5F | 7277 | 7469 | 5F65 | 6B6C | 2420 | 0004 |
| 0001024100 | 0000 | 5F0B | 7473 | 6361 | 616B | 6176 | 6C69 | 352C |

THU MAR 14 17:31:54 19?1 DB_PI.DLL PAGE 285, LINE 16757

| | | | | | | | | |
|---|---|---|---|---|---|---|---|---|
| 0001024120 | 000B | 0000 | 5F07 | 665F | 6F6D | 6564 | 352C | 000B |
| 0001024140 | 0000 | 5F08 | 695F | 6D6F | 646F | 3E65 | 0424 | 0000 |
| 0001024160 | 0700 | 6D5F | 6C61 | 6F6C | 4363 | 0424 | 0000 | 0A00 |
| 0001024200 | 6D5F | 6C61 | 6F6C | 5F63 | 6B6C | 244D | 0004 | 0000 |
| 0001024220 | 5F08 | 7266 | 6565 | 6C5F | 486B | 0424 | 0000 | 0500 |
| 0001024240 | 665F | 6572 | 8465 | 0424 | 0000 | 0C00 | 5F5F | 6D66 |
| 0001024260 | 6C61 | 6F6C | 5F63 | 6B6C | 2452 | 0004 | 0000 | 5F07 |
| 0001024300 | 665F | 7266 | 6565 | 2465 | 0004 | 0000 | 5F09 | 665F |
| 0001024320 | 616D | 6C6C | 636F | 2452 | 0004 | 0000 | 5F0A | 665F |
| 0001024340 | 7266 | 6565 | 6C5F | 2E6B | 0B35 | 0000 | 0700 | 5F5F |
| 0001024360 | 6866 | 6165 | 0270 | 0425 | 0000 | 0900 | 5F5F | 6E69 |
| 0001024400 | 7469 | 6573 | 3667 | 0425 | 0000 | 0900 | 5F5F | 696C |
| 0001024420 | 6B6E | 6573 | 6C67 | 0425 | 0000 | 0B00 | 5F5F | 6573 |
| 0001024440 | 7261 | 6863 | 6573 | 7767 | 0426 | 0000 | 0800 | 5F5F |
| 0001024460 | 6E69 | 7363 | 6765 | 25E8 | 0004 | 0000 | 5F09 | 675F |
| 0001024500 | 6F72 | 7377 | 6765 | 26AA | 0004 | 0000 | 5F0A | 665F |
| 0001024520 | 6E69 | 6C64 | 7361 | 3C74 | 0B35 | 0000 | 0A00 | 5F5F |
| 0001024540 | 6D61 | 6C62 | 736B | 7A69 | 26CA | 0004 | 0000 | 5F08 |
| 0001024560 | 6E5F | 7765 | 6573 | FC67 | 0426 | 0000 | 0700 | 5F5F |
| 0001024600 | 736D | 7A69 | FC65 | 0426 | 0000 | 0800 | 5F5F | 6D66 |
| 0001024620 | 6973 | 657A | 270A | 0004 | 0000 | 5F07 | 7473 | 6372 |
| 0001024640 | 7461 | 2750 | 0004 | 0000 | 5F07 | 7473 | 6372 | 7970 |
| 0001024660 | 2786 | 0004 | 0000 | 5F07 | 7473 | 6372 | 706D | 27B0 |
| 0001024700 | 0004 | 0000 | 5F07 | 7473 | 6C72 | 6E65 | 27C8 | 0004 |
| 0001024720 | 0000 | 5F08 | 7473 | 6E72 | 6163 | 0474 | 0428 | 0000 |
| 0001024740 | 0800 | 735F | 7274 | 636E | 7970 | 282E | 0004 | 0000 |
| 0001024760 | 5F08 | 7473 | 6E72 | 6D63 | 6A70 | 0428 | 0000 | 0500 |
| 0001025000 | 615F | 6F74 | 6E69 | 0428 | 0000 | 0500 | 615F | 6F74 |
| 0001025020 | 726C | 0428 | 0000 | 0400 | 5441 | 464F | 28D2 | 0004 |
| 0001025040 | 0000 | 5F07 | 635F | 7461 | 786F | 2928 | 0004 | 0000 |
| 0001025060 | 5F05 | 7469 | 616F | 2944 | 0004 | 0000 | 5F09 | 665F |
| 0001025100 | 7470 | 736F | 7274 | 29F2 | 0004 | 0000 | 5F08 | 6F74 |
| 0001025120 | 7075 | 6570 | E672 | 0429 | 0000 | 0900 | 5F5F | 6F74 |
| 0001025140 | 7075 | 6570 | 3E72 | 0B35 | 0000 | 0D00 | 5F5F | 6663 |
| 0001025160 | 746C | 7663 | 5F74 | 6174 | 5A62 | 0B35 | 0000 | 0800 |
| 0001025200 | 5F5F | 7361 | 7A69 | 4365 | 355B | 000B | 0000 | 5F08 |
| 0001025220 | 615F | 6973 | 657A | 5844 | 0B35 | 0000 | 0B00 | 5F5F |
| 0001025240 | 6973 | 6967 | 746E | 666F | 5666 | 0B35 | 0000 | 0B00 |
| 0001025260 | 5F5F | 6973 | 6967 | 746E | 6573 | 5C67 | 0B35 | 0000 |
| 0001025300 | 0700 | 5F5F | 7463 | 7079 | 5C65 | 0B35 | 0000 | 0800 |
| 0001025320 | 5F5F | 7463 | 7079 | 5F65 | 2A08 | 0004 | 0000 | 5F07 |
| 0001025340 | 6567 | 6574 | 766E | 2AAE | 0004 | 0000 | 5F0A | 615F |
| 0001025360 | 6146 | 6468 | 6669 | 1E66 | 042B | 0000 | 0600 | 5F5F |
| 0001025400 | 6F6C | 6B63 | 2B68 | 0004 | 0000 | 5F07 | 6C5F | 636F |
| 0001025420 | 666B | 2AF2 | 0004 | 0000 | 5F0D | 755F | 6C6E | 636F |
| 0001025440 | 5F6B | 6966 | 656C | 2ACE | 0004 | 0000 | 5F0D | 6C5F |
| 0001025460 | 636F | 5F6B | 7473 | 6572 | 6D61 | 2B48 | 0004 | 0000 |
| 0001025500 | 5F08 | 755F | 6C6E | 636F | 5E6B | DB36 | 0000 | 0900 |
| 0001025520 | 5F5F | 6F6C | 6B63 | 6E63 | 7874 | 042B | 0000 | 0900 |
| 0001025540 | 5F5F | 6E75 | 6F6C | 6B63 | DA66 | 042A | 0000 | 0F00 |
| 0001025560 | 5F5F | 6E75 | 6F6C | 6B63 | 735F | 7274 | 6165 | FE6D |
| 0001025600 | 042A | 0000 | 0A00 | 5F5F | 6177 | 7469 | 6F6C | 6B63 |
| 0001025620 | 2AE6 | 0004 | 0000 | 5F0B | 6C5F | 636F | 5F6B | 6966 |
| 0001025640 | 656C | 2B88 | 0004 | 0000 | 5F0D | 625F | 6765 | 6E69 |
| 0001025660 | 6874 | 6572 | 6461 | 2C69 | 0004 | 0000 | 5F0B | 655F |
| 0001025700 | 646E | 6874 | 6572 | 6461 | 2C96 | 0004 | 0000 | 5F0B |
| 0001025720 | 675F | 7465 | 6974 | 7464 | 6261 | 3660 | 000B | 0000 |
| 0001025740 | 5F0B | 745F | 6469 | 6174 | 6D62 | 7861 | 2D10 | 0004 |
| 0001025760 | 0000 | 5F06 | 6766 | 7465 | A673 | 042D | 0000 | 0600 |

THU MAR 14 17:31:54 1991 DB_PI.DLL PAGE 286, LINE 16816

| | | | | | | | | |
|---|---|---|---|---|---|---|---|---|
| 0001026000 | 665F | 7570 | 7374 | 2E22 | 0004 | 0000 | 5F06 | 7366 |
| 0001026020 | 6565 | 626B | 042E | 0000 | 0A00 | 5F5F | 7366 | 6565 |
| 0001026040 | 5F6B | 6B6C | 2EF0 | 0004 | 0000 | 5F06 | 7466 | 6C65 |
| 0001026060 | 2C6C | 042F | 0000 | 0A00 | 5F5F | 7466 | 6C65 | 5F6C |
| 0001026100 | 6B6C | 30C4 | 0004 | 0000 | 5F07 | 6572 | 6977 | 646E |
| 0001026120 | 3126 | 0004 | 0000 | 5F08 | 7073 | 6972 | 746E | 9A66 |
| 0001026140 | 0431 | 0000 | 0700 | 735F | 6373 | 6E61 | 1D66 | 0432 |
| 0001026160 | 0000 | 0D00 | 5F5F | 7266 | 6165 | 6C6C | 636F | 6C5F |
| 0001026200 | F66B | 0431 | 0000 | 0A00 | 5F5F | 7266 | 6165 | 6C6C |
| 0001026220 | 636F | 32A4 | 0004 | 0000 | 5F08 | 6572 | 6C61 | 6F6C |
| 0001026240 | A963 | 0432 | 0000 | 0B00 | 725F | 6165 | 6C6C | 636F |
| 0001026260 | 6C5F | AE6B | 0432 | 0000 | 0800 | 5F5F | 6572 | 6973 |
| 0001026300 | 657A | 3376 | 0004 | 0000 | 5F07 | 6163 | 6C6C | 636F |
| 0001026320 | 33A4 | 0004 | 0000 | 5F09 | 665F | 6E69 | 7364 | 6765 |
| 0001026340 | 33CA | 0004 | 0000 | 5F06 | 6668 | 6572 | D965 | 0433 |
| 0001026360 | 0000 | 0700 | 685F | 6C61 | 6F6C | AA63 | 0434 | 0000 |
| 0001026400 | 0800 | 615F | 6373 | 6974 | 656D | 3610 | 0004 | 0000 |
| 0001026420 | 5F06 | 7463 | 6D69 | 7C65 | 0D36 | 0000 | 0600 | 5F5F |
| 0001026440 | 6164 | 7379 | 3662 | 000B | 0000 | 5F08 | 6C5F | 6470 |
| 0001026460 | 7961 | 3E73 | 0436 | 0000 | 0700 | 675F | 746D | 6D69 |
| 0001026500 | 8465 | 0438 | 0000 | 0A00 | 6C5F | 636F | 6C61 | 6974 |
| 0001026520 | 656D | 3908 | 0004 | 0000 | 5F05 | 6974 | 656D | 3972 |
| 0001026540 | 0004 | 0000 | 5F06 | 7A74 | 6573 | 4C74 | 043A | 0000 |
| 0001026560 | 0900 | 5F5F | 7369 | 6E69 | 7364 | 5274 | 0439 | 0000 |
| 0001026600 | 0800 | 5F5F | 745F | 737A | 7465 | 36B8 | 000B | 0000 |
| 0001026620 | 5F09 | 6164 | 6C79 | 6769 | 7468 | 36B4 | 000B | 0000 |
| 0001026640 | 5F09 | 6974 | 656D | 6F7A | 656E | 36BA | 000B | 0000 |
| 0001026660 | 5F07 | 7A74 | 616E | 656D | 36C2 | 000B | 0000 | 5F09 |
| 0001026700 | 5F5F | 6E64 | 6D61 | 7365 | 36D8 | 000B | 0000 | 5F09 |
| 0001026720 | 5F5F | 6E6D | 6D61 | 7365 | 3B1A | 0004 | 0000 | 5F0A |
| 0001026740 | 645F | 6F74 | 7478 | 6D69 | 1065 | 043C | 0000 | 0700 |
| 0001026760 | 735F | 7274 | 6863 | 3E72 | 043C | 0000 | 0800 | 735F |
| 0001027000 | 7274 | 6372 | 7268 | 3C6C | 0004 | 0000 | 5F07 | 7473 |
| 0001027020 | 7372 | 6E70 | 3CC8 | 0004 | 0000 | 5F07 | 656D | 636D |
| 0001027040 | 7268 | 3D0A | 0004 | 0000 | 5F08 | 656D | 6D6D | 766F |
| 0001027060 | D465 | 043D | 0000 | 0700 | 6D5F | 6D65 | 6D63 | 3070 |
| 0001027100 | 043E | 0000 | 0700 | 6D5F | 6D65 | 7063 | 8E79 | 043E |
| 0001027120 | 0000 | 0700 | 6D5F | 6D65 | 6573 | E374 | 043E | 0000 |
| 0001027140 | 0700 | 5F5F | 7863 | 6F74 | D661 | 043E | 0000 | 0A00 |
| 0001027160 | 5F5F | 6C63 | 6F74 | 7361 | 6275 | 3F3A | 0004 | 0000 |
| 0001027200 | 5F06 | 7371 | 726F | 5074 | 0441 | 0000 | 0700 | 735F |
| 0001027220 | 7465 | 6D6A | 7A70 | 0441 | 0000 | 0800 | 6C5F | 6E6F |
| 0001027240 | 6A67 | 706D | 41A4 | 0004 | 0000 | 5F09 | 775F | 7472 |
| 0001027260 | 6532 | 7272 | 41D3 | 0004 | 0000 | 5F09 | 635F | 6468 |
| 0001027300 | 6972 | 6576 | 41BE | 0004 | 0000 | 5F0A | 675F | 7465 |
| 0001027320 | 7264 | 7669 | E865 | 0441 | 0000 | 0700 | 675F | 7465 |
| 0001027340 | 6970 | F864 | 0441 | 0000 | 0700 | 725F | 6E65 | 6D61 |
| 0001027360 | 1C65 | 0442 | 0000 | 0700 | 725F | 6D65 | 766F | 1C65 |
| 0001027400 | 0442 | 0000 | 0700 | 755F | 6C6E | 6E69 | 3A6B | 0442 |
| 0001027420 | 0000 | 0A00 | 5F5F | 4661 | 6146 | 6D6C | 6C75 | 423A |
| 0001027440 | 0004 | 0000 | 5F0B | 615F | 4646 | 7561 | 6D6C | 6C75 |
| 0001027460 | 425C | 0004 | 0000 | 5F0A | 615F | 4646 | 6C61 | 6572 |
| 0001027500 | 7E6D | 0442 | 0000 | 0A00 | 5F5F | 4661 | 6146 | 736C |
| 0001027520 | 6C68 | 429E | 0004 | 0000 | 5F08 | 615F | 6C46 | 6964 |
| 0001027540 | 3876 | 0443 | 0000 | 0800 | 5F5F | 4661 | 6D6C | 6C75 |
| 0001027560 | 4338 | 0004 | 0000 | 5F09 | 615F | 7546 | 6D6C | 6C75 |
| 0001027600 | 436A | 0004 | 0000 | 5F08 | 615F | 6C46 | 6572 | 0A6D |
| 0001027620 | 0444 | 0000 | 0800 | 5F5F | 4661 | 736C | 6C68 | 4416 |
| 0001027640 | 0004 | 0000 | 5F09 | 615F | 7546 | 646C | 7669 | 4476 |

THU MAR 14 17:31:54 1991 DB_PI.DLL PAGE 287, LINE 16875

| | | | | | | | | |
|---|---|---|---|---|---|---|---|---|
| 0001027660 | 0004 | 0000 | 5F09 | 615F | 7546 | 726C | 6D65 | 44FF |
| 0001027700 | 0004 | 0000 | 5F0C | 465F | 4E50 | 6D75 | 7453 | 6361 |
| 0001027720 | 006B | 0800 | 0000 | 0700 | 5F5F | 5450 | 6166 | 0863 |
| 0001027740 | 0800 | 0000 | 0700 | 5F5F | 6366 | 6D74 | 2070 | 0445 |
| 0001027760 | 0000 | 0D00 | 5F5F | 6D64 | 766F | 6D74 | 6570 | 6273 |
| 0001030000 | 2278 | 0445 | 0000 | 0D00 | 5F5F | 6D64 | 766F | 6D74 |
| 0001030020 | 6570 | 7373 | 0A69 | 0445 | 0000 | 0D00 | 5F5F | 6D73 |
| 0001030040 | 766F | 6D74 | 6570 | 6273 | 0C78 | 0445 | 0000 | 0D00 |
| 0001030060 | 5F5F | 6D73 | 766F | 6D74 | 6570 | 7373 | E069 | 0444 |
| 0001030100 | 0000 | 0800 | 5F5F | 7066 | 616D | 6874 | 4538 | 0004 |
| 0001030120 | 0000 | 5F09 | 645F | 7663 | 7374 | 3074 | 0186 | 0008 |
| 0001030140 | 0000 | 240A | 3469 | 725F | 7365 | 6C75 | 7274 | 0801 |
| 0001030160 | 0000 | 0900 | 5F5F | 6366 | 6F74 | 7370 | 8674 | 0801 |
| 0001030200 | 0000 | 0A00 | 6924 | 5F38 | 6572 | 7573 | 746C | 4544 |
| 0001030220 | 0004 | 0000 | 5F0A | 645F | 7663 | 7374 | 3074 | FE61 |
| 0001030240 | 0B36 | 0000 | 0A00 | 5F5F | 7066 | 6973 | 6167 | 7264 |
| 0001030260 | 4547 | 0004 | 0000 | 5F0A | 645F | 7663 | 6474 | 7369 |
| 0001030300 | CF69 | 0446 | 0000 | 0C00 | 6924 | 5F34 | 6F74 | 775F |
| 0001030320 | 7269 | 646E | 46BD | 0004 | 0000 | 240C | 3869 | 745F |
| 0001030340 | 5F6F | 6973 | 6E72 | D964 | 0446 | 0000 | 0C00 | 6924 |
| 0001030360 | 5F38 | 6F74 | 775F | 7269 | 646E | 483F | 0004 | 0000 |
| 0001030400 | 2407 | 3469 | 665F | 7869 | 482F | 0004 | 0000 | 2407 |
| 0001030420 | 3869 | 665F | 7869 | 46EB | 0004 | 0000 | 2408 | 3469 |
| 0001030440 | 745F | 5F6F | F06C | 0446 | 0000 | 0800 | 6924 | 5F38 |
| 0001030460 | 6F74 | 6C5F | 4769 | 0004 | 0000 | 2408 | 3469 | 745F |
| 0001030500 | 5F6F | AE71 | 0446 | 0000 | 0800 | 6924 | 5F34 | 6F74 |
| 0001030520 | 735F | 4734 | 0004 | 0000 | 2408 | 3869 | 745F | 5F6F |
| 0001030540 | CA71 | 0446 | 0000 | 0800 | 6924 | 5F34 | 6F74 | 775F |
| 0001030560 | 46B8 | 0004 | 0000 | 2408 | 3869 | 745F | 5F6F | D473 |
| 0001030600 | 0446 | 0000 | 0800 | 6924 | 5F38 | 6F74 | 775F | 480B |
| 0001030620 | 0004 | 0000 | 240A | 3469 | 665F | 7869 | 6E72 | E564 |
| 0001030640 | 0447 | 0000 | 0A00 | 6924 | 5F38 | 6966 | 7278 | 646E |
| 0001030660 | 45C7 | 0004 | 0000 | 2405 | 3469 | 385F | 4586 | 0004 |
| 0001030700 | 0000 | 2405 | 3869 | 345F | 465F | 0004 | 0000 | 2405 |
| 0001030720 | 3469 | 6C5F | 468F | 0004 | 0000 | 2405 | 3869 | 6C5F |
| 0001030740 | 480B | 0004 | 0000 | 240B | 3469 | 665F | 7869 | 7269 |
| 0001030760 | 646E | 464B | 0004 | 0000 | 2405 | 3469 | 715F | 4653 |
| 0001031000 | 0004 | 0000 | 2405 | 3469 | 735F | 47E5 | 0004 | 0000 |
| 0001031020 | 240B | 3869 | 665F | 7869 | 7269 | 646E | 467B | 0004 |
| 0001031040 | 0000 | 2405 | 3869 | 715F | 4683 | 0004 | 0000 | 2405 |
| 0001031060 | 3869 | 735F | 4649 | 0004 | 0000 | 2405 | 3469 | 775F |
| 0001031100 | 4679 | 0004 | 0000 | 2405 | 3869 | 775F | 46E1 | 0004 |
| 0001031120 | 0000 | 240B | 3469 | 745F | 5F6F | 726C | 646E | 46E6 |
| 0001031140 | 0004 | 0000 | 240B | 3869 | 745F | 5F6F | 726C | 646E |
| 0001031160 | 4710 | 0004 | 0000 | 240B | 3469 | 745F | 5F6F | 7271 |
| 0001031200 | 646E | 46B3 | 0004 | 0000 | 240B | 3469 | 745F | 5F6F |
| 0001031220 | 7273 | 646E | 4715 | 0004 | 0000 | 240B | 3869 | 745F |
| 0001031240 | 5F6F | 7271 | 646E | 46CF | 0004 | 0000 | 240B | 3469 |
| 0001031260 | 745F | 5F6F | 7277 | 646E | 46BD | 0004 | 0000 | 240B |
| 0001031300 | 3869 | 745F | 5F6F | 7273 | 646E | 46D9 | 0004 | 0000 |
| 0001031320 | 240B | 3869 | 745F | 5F6F | 7277 | 646E | 46E1 | 0004 |
| 0001031340 | 0000 | 240C | 3469 | 745F | 5F6F | 696C | 6E72 | E664 |
| 0001031360 | 0446 | 0000 | 0C00 | 6924 | 5F38 | 6F74 | 6C5F | 7269 |
| 0001031400 | 646E | 4710 | 0004 | 0000 | 240C | 3469 | 745F | 5F6F |
| 0001031420 | 6971 | 6E72 | B364 | 0446 | 0000 | 0C00 | 6924 | 5F34 |
| 0001031440 | 6F74 | 735F | 7269 | 646E | 4715 | 0004 | 0000 | 240C |
| 0001031460 | 3869 | 745F | 5F6F | 6971 | 6E72 | 6D64 | 0449 | 0000 |
| 0001031500 | 0700 | 6924 | 5F34 | 6D63 | C070 | 0449 | 0000 | 0700 |
| 0001031520 | 6924 | 5F38 | 6D63 | 1C70 | 044A | 0000 | 0700 | 6924 |

THU MAR 14 17:31:54 1991 DB_PI.DLL PAGE 288, LINE 16934

| | | | | | | | | |
|---|---|---|---|---|---|---|---|---|
| 0001031540 | 5F34 | 6461 | 0464 | 044C | 0000 | 0700 | 6924 | 5F34 |
| 0001031560 | 6964 | 1476 | 044A | 0000 | 0700 | 6924 | 5F34 | 7573 |
| 0001031600 | 7E62 | 044B | 0000 | 0700 | 6924 | 5F34 | 756D | 916C |
| 0001031620 | 0801 | 0000 | 0D00 | 6924 | 5F34 | 6F72 | 6E75 | 5F64 |
| 0001031640 | 7865 | EE70 | 044A | 0000 | 0800 | 6924 | 5F34 | 6F6E |
| 0001031660 | 6D72 | 0190 | 0008 | 0000 | 240E | 3469 | 725F | 756F |
| 0001031700 | 646E | 665F | 616C | 9367 | 0801 | 0000 | 0900 | 6924 |
| 0001031720 | 5F34 | 6361 | 685F | 9769 | 0801 | 0000 | 0900 | 6924 |
| 0001031740 | 5F34 | 6361 | 6C5F | 1C6F | 044B | 0000 | 0900 | 6924 |
| 0001031760 | 5F34 | 6F72 | 6E75 | 0264 | 044C | 0000 | 0A00 | 6924 |
| 0001032000 | 5F34 | 6964 | 7276 | 7665 | 4A12 | 0004 | 0000 | 240A |
| 0001032020 | 3469 | 735F | 6275 | 6572 | 3176 | 044D | 0000 | 0700 |
| 0001032040 | 6924 | 5F38 | 6461 | 9A64 | 044F | 0000 | 0700 | 6924 |
| 0001032060 | 5F38 | 6964 | 0E76 | 044D | 0000 | 0700 | 6924 | 5F38 |
| 0001032100 | 7573 | 3762 | 044F | 0000 | 0700 | 6924 | 5F38 | 756D |
| 0001032120 | A96C | 0801 | 0000 | 0D00 | 6924 | 5F38 | 6F72 | 6E75 |
| 0001032140 | 5F64 | 7865 | 6470 | 044E | 0000 | 0800 | 6924 | 5F38 |
| 0001032160 | 6F6E | 6D72 | 01A8 | 0008 | 0000 | 240E | 3869 | 725F |
| 0001032200 | 756F | 646E | 665F | 616C | AB67 | 0801 | 0000 | 0900 |
| 0001032220 | 6924 | 5F38 | 6361 | 685F | B369 | 0801 | 0000 | 0900 |
| 0001032240 | 6924 | 5F38 | 6361 | 6C5F | B96F | 044E | 0000 | 0900 |
| 0001032260 | 6924 | 5F38 | 6F72 | 6E75 | 9864 | 044F | 0000 | 0A00 |
| 0001032300 | 6924 | 5F38 | 6964 | 7276 | 7665 | 4D0C | 0004 | 0000 |
| 0001032320 | 240A | 3869 | 735F | 6275 | 6572 | 5276 | 0453 | 0000 |
| 0001032340 | 0A00 | 6924 | 5F38 | 756F | 7074 | 7475 | 01DA | 0006 |
| 0001032360 | 0000 | 240C | 3869 | 695F | 706E | 7475 | 775F | A373 |
| 0001032400 | 0454 | 0000 | 0900 | 6924 | 5F38 | 6E69 | 7570 | DB74 |
| 0001032420 | 0801 | 0000 | 1000 | 6924 | 5F38 | 6D69 | 6C70 | 6369 |
| 0001032440 | 7469 | 655F | 7078 | 578F | 0004 | 0000 | 2408 | 3869 |
| 0001032460 | 745F | 756D | F56C | 0458 | 0000 | 0A00 | 6924 | 5F38 |
| 0001032500 | 7074 | 7277 | 3031 | 591A | 0004 | 0000 | 5F0F | 475F |
| 0001032520 | 7465 | 6C41 | 6D74 | 7461 | 5068 | 4454 | 9876 | 0000 |
| 0001032540 | 0001 | 5F09 | 665F | 746C | 7375 | 6465 | 5FB6 | 0004 |
| 0001032560 | 0000 | 5F06 | 665F | 6461 | D364 | 0459 | 0000 | 0600 |
| 0001032600 | 5F5F | 6C65 | 6464 | 59CF | 0004 | 0000 | 5F06 | 665F |
| 0001032620 | 646C | 1864 | 045D | 0000 | 0600 | 5F5F | 6166 | 7362 |
| 0001032640 | 5A62 | 0004 | 0000 | 5F06 | 655F | 646C | 756C | 045A |
| 0001032660 | 0000 | 0600 | 5F5F | 6C66 | 6C64 | 5D30 | 0004 | 0000 |
| 0001032700 | 5F06 | 665F | 6863 | C073 | 045F | 0000 | 0600 | 5F5F |
| 0001032720 | 6366 | 706D | 59C9 | 0004 | 0000 | 5F06 | 735F | 646C |
| 0001032740 | 9064 | 0459 | 0000 | 0600 | 5F5F | 6C65 | 7364 | 6067 |
| 0001032760 | 0004 | 0000 | 5F06 | 665F | 6378 | AC68 | 045F | 0000 |
| 0001033000 | 0600 | 5F5F | 6466 | 7669 | 598C | 0004 | 0000 | 5F06 |
| 0001033020 | 665F | 646C | 1F73 | 045A | 0000 | 0600 | 5F5F | 6C66 |
| 0001033040 | 7464 | 5A6F | 0004 | 0000 | 5F06 | 655F | 646C | 7C77 |
| 0001033060 | 045A | 0000 | 0600 | 5F5F | 6C66 | 7764 | 5AE1 | 0004 |
| 0001033100 | 0000 | 5F06 | 665F | 7564 | 5E70 | 045A | 0000 | 0600 |
| 0001033120 | 5F5F | 6C73 | 6C64 | 5F9D | 0004 | 0000 | 5F06 | 665F |
| 0001033140 | 7573 | AF62 | 045B | 0000 | 0600 | 5F5F | 7365 | 6474 |
| 0001033160 | 5B19 | 0004 | 0000 | 5F06 | 665F | 646C | 967A | 0460 |
| 0001033200 | 0000 | 0600 | 5F5F | 6364 | 7476 | 5BAB | 0004 | 0000 |
| 0001033220 | 5F06 | 665F | 7473 | A764 | 045F | 0000 | 0600 | 5F5F |
| 0001033240 | 6D66 | 6C75 | 5C95 | 0004 | 0000 | 5F06 | 665F | 6F74 |
| 0001033260 | 866C | 0459 | 0000 | 0600 | 5F5F | 6C73 | 7364 | 5A11 |
| 0001033300 | 0004 | 0000 | 5F06 | 735F | 646C | 6B74 | 045A | 0000 |
| 0001033320 | 0600 | 5F5F | 6C73 | 7764 | 5BA7 | 0004 | 0000 | 5F06 |
| 0001033340 | 735F | 7473 | 5064 | 045B | 0000 | 0600 | 5F5F | 7365 |
| 0001033360 | 7374 | 5B4C | 0004 | 0000 | 5F06 | 665F | 7473 | E173 |
| 0001033400 | 045C | 0000 | 0600 | 5F5F | 7466 | 7473 | 5C05 | 0004 |

THU MAR 14 17:31:54 1991 DB_PI.DLL PAGE 289, LINE 16993

| | | | | | | | | |
|---|---|---|---|---|---|---|---|---|
| 0001033420 | 0000 | 5F06 | 665F | 7473 | 4874 | 045B | 0000 | 0600 |
| 0001033440 | 5F5F | 7373 | 7374 | 5C01 | 0004 | 0000 | 5F06 | 735F |
| 0001033460 | 7473 | 6F74 | 045F | 0000 | 0700 | 5F5F | 6165 | 6464 |
| 0001033500 | 7E64 | 045F | 0000 | 0700 | 5F5F | 6166 | 6464 | 5F64 |
| 0001033520 | 045F | 0000 | 0700 | 5F5F | 6173 | 6464 | 4D64 | 045E |
| 0001033540 | 0000 | 0700 | 5F5F | 6165 | 6464 | 5C73 | 045E | 0000 |
| 0001033560 | 0700 | 5F5F | 6166 | 6464 | 1F73 | 045F | 0000 | 0700 |
| 0001033600 | 5F5F | 6465 | 7669 | 2E64 | 045F | 0000 | 0700 | 5F5F |
| 0001033620 | 6466 | 7669 | 3D64 | 045E | 0000 | 0700 | 5F5F | 6173 |
| 0001033640 | 6464 | A573 | 045E | 0000 | 0700 | 5F5F | 7365 | 6275 |
| 0001033660 | B464 | 045E | 0000 | 0700 | 5F5F | 7366 | 6275 | F764 |
| 0001033700 | 045E | 0000 | 0700 | 5F5F | 6D65 | 6C75 | 0664 | 045F |
| 0001033720 | 0000 | 0700 | 5F5F | 6D66 | 6C75 | 5964 | 0460 | 0000 |
| 0001033740 | 0700 | 5F5F | 7866 | 6863 | 0F71 | 045F | 0000 | 0700 |
| 0001033760 | 5F5F | 6473 | 7669 | B164 | 045F | 0000 | 0700 | 5F5F |
| 0001034000 | 6466 | 7669 | FD72 | 045D | 0000 | 0700 | 5F5F | 6465 |
| 0001034020 | 7669 | 0C73 | 045E | 0000 | 0700 | 5F5F | 6466 | 7669 |
| 0001034040 | CF73 | 045B | 0000 | 0700 | 5F5F | 7365 | 6474 | 9570 |
| 0001034060 | 045E | 0000 | 0700 | 5F5F | 7373 | 6275 | CB64 | 045B |
| 0001034100 | 0000 | 0700 | 5F5F | 7366 | 6474 | A270 | 045F | 0000 |
| 0001034120 | 0700 | 5F5F | 7366 | 6275 | 8372 | 045D | 0000 | 0700 |
| 0001034140 | 5F5F | 7365 | 6275 | 9273 | 045D | 0000 | 0700 | 5F5F |
| 0001034160 | 7366 | 6275 | E773 | 045E | 0000 | 0700 | 5F5F | 6D73 |
| 0001034200 | 6C75 | D564 | 045D | 0000 | 0700 | 5F5F | 6D65 | 6C75 |
| 0001034220 | E473 | 045D | 0000 | 0700 | 5F5F | 6D66 | 6C75 | ED73 |
| 0001034240 | 045D | 0000 | 0700 | 5F5F | 6473 | 7669 | C773 | 045B |
| 0001034260 | 0000 | 0700 | 5F5F | 7373 | 6474 | 7070 | 045B | 0000 |
| 0001034300 | 0700 | 5F5F | 7365 | 7374 | 7370 | 045D | 0000 | 0700 |
| 0001034320 | 5F5F | 7373 | 6275 | 6C73 | 045B | 0000 | 0700 | 5F5F |
| 0001034340 | 7366 | 7374 | 2470 | 045C | 0000 | 0700 | 5F5F | 7366 |
| 0001034360 | 7474 | C570 | 045D | 0000 | 0700 | 5F5F | 6D73 | 6C75 |
| 0001034400 | B673 | 045F | 0000 | 0800 | 5F5F | 4661 | 6166 | 6464 |
| 0001034420 | 5B68 | 0004 | 0000 | 5F07 | 735F | 7473 | 7073 | 5C20 |
| 0001034440 | 0004 | 0000 | 5F07 | 735F | 7473 | 7074 | 59D3 | 0004 |
| 0001034460 | 0000 | 5F08 | 615F | 6546 | 646C | CF64 | 0459 | 0000 |
| 0001034500 | 0800 | 5F5F | 4661 | 6C66 | 6464 | 5D18 | 0004 | 0000 |
| 0001034520 | 5F08 | 615F | 6646 | 6261 | 6273 | 045A | 0000 | 0800 |
| 0001034540 | 5F5F | 4661 | 6C65 | 6C64 | 5A75 | 0004 | 0000 | 5F08 |
| 0001034560 | 615F | 6646 | 646C | 306C | 045D | 0000 | 0800 | 5F5F |
| 0001034600 | 4661 | 6366 | 7368 | 5FC0 | 0004 | 0000 | 5F08 | 615F |
| 0001034620 | 6646 | 6D63 | C970 | 0459 | 0000 | 0800 | 5F5F | 4661 |
| 0001034640 | 6C73 | 6464 | 5990 | 0004 | 0000 | 5F08 | 615F | 6546 |
| 0001034660 | 646C | 6773 | 0460 | 0000 | 0800 | 5F5F | 4661 | 7866 |
| 0001034700 | 6863 | 5FAC | 0004 | 0000 | 5F08 | 615F | 6646 | 6964 |
| 0001034720 | 8C76 | 0459 | 0000 | 0800 | 5F5F | 4661 | 6C66 | 7364 |
| 0001034740 | 5A1F | 0004 | 0000 | 5F08 | 615F | 6646 | 646C | 6F74 |
| 0001034760 | 045A | 0000 | 0800 | 5F5F | 4661 | 6C65 | 7764 | 5A7C |
| 0001035000 | 0004 | 0000 | 5F08 | 615F | 6646 | 646C | E177 | 045A |
| 0001035020 | 0000 | 0800 | 5F5F | 4661 | 6466 | 7075 | 5A5E | 0004 |
| 0001035040 | 0000 | 5F08 | 615F | 7346 | 646C | 9D6C | 045F | 0000 |
| 0001035060 | 0800 | 5F5F | 4661 | 7366 | 6275 | 5BAF | 0004 | 0000 |
| 0001035100 | 5F08 | 615F | 6546 | 7473 | 1964 | 045B | 0000 | 0800 |
| 0001035120 | 5F5F | 4661 | 6C66 | 7A64 | 6096 | 0004 | 0000 | 5F08 |
| 0001035140 | 615F | 6446 | 7663 | AB74 | 045B | 0000 | 0800 | 5F5F |
| 0001035160 | 4661 | 7366 | 6474 | 5FA7 | 0004 | 0000 | 5F08 | 615F |
| 0001035200 | 6646 | 756D | 956C | 045C | 0000 | 0800 | 5F5F | 4661 |
| 0001035220 | 7466 | 6C6F | 5986 | 0004 | 0000 | 5F08 | 615F | 7346 |
| 0001035240 | 646C | 4773 | 045F | 0000 | 0800 | 5F5F | 6465 | 7669 |
| 0001035260 | 7264 | 5A11 | 0004 | 0000 | 5F08 | 615F | 7346 | 646C |

THU MAR 14 17:31:54 1991 DB_PI.DLL PAGE 290, LINE 17052

| | | | | | | | | |
|---|---|---|---|---|---|---|---|---|
| 0001035300 | 5674 | 045F | 0000 | 0800 | 5F5F | 6466 | 7669 | 7264 |
| 0001035320 | 5A6B | 0004 | 0000 | 5F08 | 615F | 7346 | 646C | BB77 |
| 0001035340 | 045F | 0000 | 0800 | 5F5F | 6366 | 6D6F | 7070 | 5ECE |
| 0001035360 | 0004 | 0000 | 5F08 | 655F | 7573 | 6462 | A772 | 045B |
| 0001035400 | 0000 | 0800 | 5F5F | 4661 | 7373 | 6474 | 5EDD | 0004 |
| 0001035420 | 0000 | 5F08 | 665F | 7573 | 6462 | 5072 | 045B | 0000 |
| 0001035440 | 0800 | 5F5F | 4661 | 7365 | 7374 | 5B4C | 0004 | 0000 |
| 0001035460 | 5F08 | 615F | 6646 | 7473 | E173 | 045C | 0000 | 0800 |
| 0001035500 | 5F5F | 4661 | 7466 | 7473 | 5C05 | 0004 | 0000 | 5F08 |
| 0001035520 | 615F | 6646 | 7473 | 3774 | 045F | 0000 | 0800 | 5F5F |
| 0001035540 | 6473 | 7669 | 7264 | 5E25 | 0004 | 0000 | 5F08 | 655F |
| 0001035560 | 6964 | 7376 | 3472 | 045E | 0000 | 0800 | 5F5F | 6466 |
| 0001035600 | 7669 | 7273 | 5EBE | 0004 | 0000 | 5F08 | 735F | 7573 |
| 0001035620 | 6462 | AC72 | 045D | 0000 | 0800 | 5F5F | 7365 | 6275 |
| 0001035640 | 7273 | 5B48 | 0004 | 0000 | 5F08 | 615F | 7346 | 7473 |
| 0001035660 | BB73 | 045D | 0000 | 0800 | 5F5F | 7366 | 6275 | 7273 |
| 0001035700 | 5C01 | 0004 | 0000 | 5F08 | 615F | 7346 | 7473 | 6F74 |
| 0001035720 | 045F | 0000 | 0900 | 5F5F | 4661 | 6165 | 6464 | 7E64 |
| 0001035740 | 045F | 0000 | 0900 | 5F5F | 4661 | 6166 | 6464 | 1564 |
| 0001035760 | 045E | 0000 | 0800 | 5F5F | 6473 | 7669 | 7273 | 5D9C |
| 0001036000 | 0004 | 0000 | 5F08 | 735F | 7573 | 7362 | 5F72 | 045F |
| 0001036020 | 0000 | 0900 | 5F5F | 4661 | 6173 | 6464 | 4D64 | 045E |
| 0001036040 | 0000 | 0900 | 5F5F | 4661 | 6165 | 6464 | 5C73 | 045E |
| 0001036060 | 0000 | 0900 | 5F5F | 4661 | 6166 | 6464 | 1F73 | 045F |
| 0001036100 | 0000 | 0900 | 5F5F | 4661 | 6465 | 7669 | 2E64 | 045F |
| 0001036120 | 0000 | 0900 | 5F5F | 4661 | 6466 | 7669 | 3D64 | 045E |
| 0001036140 | 0000 | 0900 | 5F5F | 4661 | 6173 | 6464 | A573 | 045E |
| 0001036160 | 0000 | 0900 | 5F5F | 4661 | 7365 | 6275 | B464 | 045E |
| 0001036200 | 0000 | 0900 | 5F5F | 4661 | 7366 | 6275 | F764 | 045E |
| 0001036220 | 0000 | 0900 | 5F5F | 4661 | 6D65 | 6C75 | 0664 | 045F |
| 0001036240 | 0000 | 0900 | 5F5F | 4661 | 6D66 | 6C75 | 5964 | 0460 |
| 0001036260 | 0000 | 0900 | 5F5F | 4661 | 7866 | 6863 | DF71 | 045F |
| 0001036300 | 0000 | 0900 | 5F5F | 4661 | 6473 | 7669 | B164 | 045F |
| 0001036320 | 0000 | 0900 | 5F5F | 4661 | 6466 | 7669 | FD72 | 045D |
| 0001036340 | 0000 | 0900 | 5F5F | 4661 | 6465 | 7669 | 0C73 | 045E |
| 0001036360 | 0000 | 0900 | 5F5F | 4661 | 6466 | 7669 | CF73 | 045B |
| 0001036400 | 0000 | 0900 | 5F5F | 4661 | 7365 | 6474 | 9570 | 045E |
| 0001036420 | 0000 | 0900 | 5F5F | 4661 | 7373 | 6275 | CB64 | 045B |
| 0001036440 | 0000 | 0900 | 5F5F | 4661 | 7366 | 6474 | A270 | 045F |
| 0001036460 | 0000 | 0900 | 5F5F | 4661 | 7366 | 6275 | 8372 | 045D |
| 0001036500 | 0000 | 0900 | 5F5F | 4661 | 7365 | 6275 | 9273 | 045D |
| 0001036520 | 0000 | 0900 | 5F5F | 4661 | 7366 | 6275 | E773 | 045E |
| 0001036540 | 0000 | 0900 | 5F5F | 4661 | 6D73 | 6C75 | D564 | 045D |
| 0001036560 | 0000 | 0900 | 5F5F | 4661 | 6D65 | 6C75 | E473 | 045D |
| 0001036600 | 0000 | 0900 | 5F5F | 4661 | 6D66 | 6C75 | ED73 | 045D |
| 0001036620 | 0000 | 0900 | 5F5F | 4661 | 6473 | 7669 | C773 | 045B |
| 0001036640 | 0000 | 0900 | 5F5F | 4661 | 7373 | 6474 | 7070 | 045B |
| 0001036660 | 0000 | 0900 | 5F5F | 4661 | 7365 | 7374 | 7370 | 045D |
| 0001036700 | 0000 | 0900 | 5F5F | 4661 | 7373 | 6275 | 6C73 | 045B |
| 0001036720 | 0000 | 0900 | 5F5F | 4661 | 7366 | 7374 | 2470 | 045C |
| 0001036740 | 0000 | 0900 | 5F5F | 4661 | 7366 | 7474 | C570 | 045D |
| 0001036760 | 0000 | 0900 | 5F5F | 4661 | 6D73 | 6C75 | 6873 | 045B |
| 0001037000 | 0000 | 0900 | 5F5F | 4661 | 7373 | 7374 | 2070 | 045C |
| 0001037020 | 0000 | 0900 | 5F5F | 4661 | 7373 | 7474 | 4770 | 045F |
| 0001037040 | 0000 | 0A00 | 5F5F | 4661 | 6465 | 7669 | 7264 | 5F56 |
| 0001037060 | 0004 | 0000 | 5F0A | 615F | 6646 | 6964 | 6476 | BB72 |
| 0001037100 | 045F | 0000 | 0A00 | 5F5F | 4661 | 6366 | 6D6F | 7070 |
| 0001037120 | 5ECE | 0004 | 0000 | 5F0A | 615F | 6546 | 7573 | 6462 |
| 0001037140 | DD72 | 045E | 0000 | 0A00 | 5F5F | 4661 | 7366 | 6275 |

THU MAR 14 17:31:54 1991 DB_PI.DLL PAGE 291, LINE 17111

| | | | | | | | | |
|---|---|---|---|---|---|---|---|---|
| 0001037160 | 7264 | 5F37 | 0004 | 0000 | 5F0A | 615F | 7346 | 6964 |
| 0001037200 | 6476 | 2572 | 045E | 0000 | 0A00 | 5F5F | 4661 | 6465 |
| 0001037220 | 7669 | 7273 | 5E34 | 0004 | 0000 | 5F0A | 615F | 6646 |
| 0001037240 | 6964 | 7376 | BE72 | 045E | 0000 | 0A00 | 5F5F | 4661 |
| 0001037260 | 7373 | 6275 | 7264 | 5DAC | 0004 | 0000 | 5F0A | 615F |
| 0001037300 | 6546 | 7573 | 7362 | BB72 | 045D | 0000 | 0A00 | 5F5F |
| 0001037320 | 4661 | 7366 | 6275 | 7273 | 5E15 | 0004 | 0000 | 5F0A |
| 0001037340 | 615F | 7346 | 6964 | 7376 | 9C72 | 045D | 0000 | 0A00 |
| 0001037360 | 5F5F | 4661 | 7373 | 6275 | 7273 | 5A7E | 0004 | 0000 |
| 0001037400 | 4206 | 4624 | 4C49 | 1032 | 0802 | 0000 | 0500 | 704F |
| 0001037420 | 6154 | 5062 | 045C | 0000 | 0600 | 2442 | 4946 | 3253 |
| 0001037440 | 5A7F | 0004 | 0000 | 4206 | 4624 | 4C49 | 8B44 | 045F |
| 0001037460 | 0000 | 0600 | 2442 | 4346 | 504D | 5C58 | 0004 | 0000 |
| 0001037500 | 4206 | 4624 | 5349 | 6054 | 045C | 0000 | 0600 | 2442 |
| 0001037520 | 5546 | 5453 | 022E | 0008 | 0000 | 5F06 | 665F | 7363 |
| 0001037540 | 8070 | 0460 | 0000 | 0A00 | 6924 | 5F34 | 7265 | 6972 |
| 0001037560 | 666E | 60B0 | 0004 | 0000 | 240A | 3869 | 655F | 7272 |
| 0001037600 | 6E69 | B766 | 0460 | 0000 | 0B00 | 6924 | 5F34 | 7265 |
| 0001037620 | 6472 | 7669 | B730 | 0460 | 0000 | 0B00 | 6924 | 5F38 |
| 0001037640 | 7265 | 6472 | 7669 | E330 | 0460 | 0000 | 0A00 | 5F5F |
| 0001037660 | 7066 | 6973 | 6E67 | 6C61 | 60B0 | 0004 | 0000 | 240B |
| 0001037700 | 3469 | 655F | 7272 | 696D | 666E | 60B0 | 0004 | 0000 |
| 0001037720 | 240B | 3469 | 655F | 7272 | 6970 | 666E | 60B0 | 0004 |
| 0001037740 | 0000 | 240B | 3869 | 655F | 7272 | 696D | 666E | 60B0 |
| 0001037760 | 0004 | 000D | 240B | 3869 | 655F | 7272 | 6970 | 666E |
| 0001040000 | 60C5 | 0004 | 0000 | 240C | 3869 | 655F | 7272 | 7473 |
| 0001040020 | 6361 | BE6B | 0460 | 0000 | 0C00 | 6924 | 5F34 | 7265 |
| 0001040040 | 6972 | 766E | 646C | 60BE | 0004 | 0000 | 240C | 3869 |
| 0001040060 | 655F | 7272 | 6E69 | 6C76 | 5964 | 0461 | 0000 | 0800 |
| 0001040100 | 5F5F | 6C66 | 6974 | 326E | 6134 | 0004 | 0000 | 5F09 |
| 0001040120 | 665F | 746C | 6E69 | 3266 | 61EA | 0004 | 0000 | 5F09 |
| 0001040140 | 665F | 746C | 756F | 3274 | 622A | 0004 | 0000 | 5F0B |
| 0001040160 | 665F | 726F | 6463 | 6365 | 7470 | 629A | 0004 | 0000 |
| 0001040200 | 5F0B | 635F | 6F72 | 7A70 | 7265 | 736F | 6318 | 0004 |
| 0001040220 | 0000 | 5F0A | 705F | 736F | 7469 | 7669 | 4065 | 0463 |
| 0001040240 | 0000 | 0900 | 5F5F | 6166 | 7373 | 6769 | BC6E | 0464 |
| 0001040260 | 0000 | 0700 | 5F5F | 6663 | 6F74 | 6265 | 0466 | 0000 |
| 0001040300 | 0700 | 5F5F | 6663 | 6F74 | EA66 | 0466 | 0000 | 0700 |
| 0001040320 | 5F5F | 6663 | 6F74 | D267 | 0467 | 0000 | 0900 | 5F5F |
| 0001040340 | 6663 | 746C | 7663 | 1A74 | 0477 | 3800 | 0F04 | 645F |
| 0001040360 | 5F66 | 7263 | 6165 | 6574 | 745F | 6572 | F965 | 0478 |
| 0001040400 | 3A00 | 0F04 | 645F | 5F66 | 6572 | 6F6D | 6576 | 745F |
| 0001040420 | 6572 | DF65 | 047B | 3E00 | 0D04 | 645F | 5F66 | 6F6C |
| 0001040440 | 6461 | 745F | 6572 | 9D65 | 047D | 4100 | 0F04 | 645F |
| 0001040460 | 5F66 | 6E75 | 6F6C | 6461 | 745F | 6572 | 0865 | 047E |
| 0001040500 | 4300 | 1104 | 645F | 5F66 | 6576 | 6972 | 7966 | 6F5F |
| 0001040520 | 6A62 | 6365 | 7874 | 0490 | 8700 | 1204 | 645F | 5F66 |
| 0001040540 | 6567 | 5F74 | 626F | 5F6A | 6170 | 6572 | 746E | 95C0 |
| 0001040560 | 0004 | 048F | 5F11 | 6664 | 635F | 706F | 5F79 | 6F6D |
| 0001040600 | 6576 | 6F5F | 6A62 | A36A | 0004 | 0491 | 5F12 | 6664 |
| 0001040620 | 735F | 6165 | 6372 | 5F68 | 6574 | 7473 | 695F | 6E64 |
| 0001040640 | 0480 | 7300 | 1404 | 645F | 5F66 | 7263 | 6165 | 6574 |
| 0001040660 | 6F5F | 6A62 | 635F | 6968 | 646C | 82A0 | 0004 | 0475 |
| 0001040700 | 5F0E | 6664 | 635F | 6572 | 7461 | 5F65 | 626F | 3D6A |
| 0001040720 | 0483 | 7700 | 0E04 | 645F | 5F66 | 6564 | 656C | 6574 |
| 0001040740 | 6F5F | 6A62 | 8642 | 0004 | 0479 | 5F10 | 6664 | 675F |
| 0001040760 | 7465 | 6F5F | 6A62 | 645F | 7461 | 3B61 | 0489 | 7B00 |
| 0001041000 | 1704 | 645F | 5F66 | 626F | 5F6A | 6469 | 665F | 6F72 |
| 0001041020 | 5F6D | 6F6C | 7067 | 7461 | C968 | 0489 | 7D00 | 1304 |

THU MAR 14 17:31:54 1991 DB_PI.DLL PAGE 292, LINE 17170

| | | | | | | | | |
|---|---|---|---|---|---|---|---|---|
| 0001041040 | 645F | 5F66 | 6567 | 5F74 | 626F | 5F6A | 6F6C | 7067 |
| 0001041060 | 7461 | C468 | 048A | 7F00 | 1004 | 645F | 5F66 | 6567 |
| 0001041100 | 5F74 | 6863 | 6C69 | 5F64 | 6469 | 8D3E | 0004 | 0485 |
| 0001041120 | 5F13 | 6664 | 6C5F | 7369 | 5F74 | 626F | 5F6A | 6863 |
| 0001041140 | 6C69 | 7364 | A4F0 | 0004 | 0438 | 5F0F | 6664 | 615F |
| 0001041160 | 6363 | 7365 | 5F73 | 6574 | 7473 | A6AD | 0004 | 043A |
| 0001041200 | 5F10 | 6664 | 725F | 6C65 | 6165 | 6573 | 745F | 7365 |
| 0001041220 | EE74 | 04A6 | 3C00 | 1604 | 645F | 5F66 | 6863 | 6E61 |
| 0001041240 | 6567 | 745F | 7365 | 5F74 | 6361 | 6563 | 7373 | A70F |
| 0001041260 | 0004 | 043E | 5F12 | 6664 | 635F | 6B68 | 745F | 7473 |
| 0001041300 | 6C5F | 636F | 656B | 4264 | 04A7 | 5B00 | 0D04 | 645F |
| 0001041320 | 5F66 | 6F6C | 6B63 | 745F | 6572 | EF65 | 04A7 | 5D00 |
| 0001041340 | 0F04 | 645F | 5F66 | 6E75 | 6F6C | 6B63 | 745F | 6572 |
| 0001041360 | 2F65 | 04A9 | 7700 | 1804 | 645F | 746F | 6F5F | 6A62 |
| 0001041400 | 695F | 5F64 | 7266 | 6D6F | 6C5F | 676F | 6170 | 6874 |
| 0001041420 | ABB7 | 0004 | 047F | 5F18 | 6F64 | 5F74 | 626F | 5F6A |
| 0001041440 | 6F6C | 7067 | 7461 | 5F68 | 7266 | 6D6F | 695F | F164 |
| 0001041460 | 04AD | 8100 | 1904 | 645F | 746F | 705F | 7261 | 6E65 |
| 0001041500 | 5F74 | 6863 | 6C69 | 5F64 | 6F6C | 7067 | 7461 | 6768 |
| 0001041520 | 04B9 | A800 | 0E04 | 645F | 746F | 635F | 6572 | 7461 |
| 0001041540 | 5F65 | 7074 | BABA | 0004 | 04AB | 5F0E | 6F64 | 5F74 |
| 0001041560 | 7263 | 6165 | 6574 | 745F | 0D72 | 04BC | AE00 | 1204 |
| 0001041600 | 645F | 746F | 635F | 6572 | 7461 | 5F65 | 7766 | 6F5F |
| 0001041620 | 6A62 | BD0D | 0004 | 04B0 | 5F10 | 6F64 | 5F74 | 6564 |
| 0001041640 | 5F6C | 7573 | 7462 | 6572 | 2A65 | 04BE | B200 | 0C04 |
| 0001041660 | 645F | 746F | 645F | 6C65 | 6F5F | 6A62 | AEB0 | 0004 |
| 0001041700 | 048A | 5F10 | 6F64 | 5F74 | 6567 | 5F74 | 6F72 | 746F |
| 0001041720 | 695F | 2864 | 04BF | B400 | 0D04 | 645F | 746F | 635F |
| 0001041740 | 706F | 5F79 | 626F | EC6A | 04B1 | 9900 | 1504 | 645F |
| 0001041760 | 746F | 635F | 6572 | 7461 | 5F65 | 626F | 5F6A | 7473 |
| 0001042000 | 6372 | 8374 | 04C2 | B600 | 1604 | 645F | 746F | 635F |
| 0001042020 | 706F | 5F79 | 6F6D | 6576 | 735F | 6275 | 7274 | 6565 |
| 0001042040 | B314 | 0004 | 049B | 5F10 | 6F64 | 5F74 | 7263 | 6165 |
| 0001042060 | 6574 | 725F | 6F6F | 8F74 | 04B4 | A000 | 1204 | 645F |
| 0001042100 | 746F | 635F | 6572 | 7461 | 5F65 | 6F66 | 646C | 7265 |
| 0001042120 | B60A | 0004 | 04A2 | 5F10 | 6F64 | 5F74 | 7263 | 6165 |
| 0001042140 | 6574 | 745F | 7365 | 1474 | 04B8 | A500 | 0E04 | 645F |
| 0001042160 | 746F | 635F | 6572 | 7461 | 5F65 | 6374 | C408 | 0004 |
| 0001042200 | 044F | 5F0E | 6F64 | 5F74 | 6F6C | 6B63 | 745F | 7365 |
| 0001042220 | CF74 | 04C4 | 5300 | 1004 | 645F | 746F | 755F | 6C6E |
| 0001042240 | 636F | 5F6B | 6574 | 7473 | C5B2 | 0004 | 0455 | 5F14 |
| 0001042260 | 6F64 | 5F74 | 6863 | 6365 | 5F6B | 6574 | 7473 | 6C5F |
| 0001042300 | 636F | E26B | 04CA | 9400 | 1204 | 645F | 746F | 675F |
| 0001042320 | 7465 | 635F | 6968 | 646C | 6F5F | 6A62 | CBA6 | 0004 |
| 0001042340 | 0496 | 5F12 | 6F64 | 5F74 | 6863 | 6C69 | 5F64 | 6469 |
| 0001042360 | 6C5F | 7369 | B774 | 04CD | 9800 | 1704 | 645F | 746F |
| 0001042400 | 635F | 6568 | 6B63 | 665F | 6C6F | 6564 | 5F72 | 6564 |
| 0001042420 | 7470 | 8668 | 04CE | 9A00 | 1404 | 645F | 746F | 735F |
| 0001042440 | 6275 | 7274 | 6565 | 665F | 645F | 7065 | 6874 | C654 |
| 0001042460 | 0004 | 048A | 5F10 | 6F64 | 5F74 | 6274 | 5F6C | 6461 |
| 0001042500 | 5F64 | 626F | 8E6A | 04C7 | 8C00 | 1004 | 645F | 746F |
| 0001042520 | 745F | 6C62 | 645F | 6C65 | 6F5F | 6A62 | C803 | 0004 |
| 0001042540 | 048E | 5F11 | 6F64 | 5F74 | 6567 | 5F74 | 6863 | 6C69 |
| 0001042560 | 5F64 | 6469 | C9A9 | 0004 | 0490 | 5F12 | 6F64 | 5F74 |
| 0001042600 | 6567 | 5F74 | 6170 | 6572 | 746E | 695F | 1F64 | 04CA |
| 0001042620 | 9200 | 0F04 | 645F | 746F | 695F | 5F73 | 7267 | 6E61 |
| 0001042640 | 7064 | 9061 | 04CF | 0600 | 0502 | 425F | 5254 | 5756 |
| 0001042660 | 04DC | 2F00 | 0D04 | 645F | 6F73 | 6C5F | 636F | 5F6B |
| 0001042700 | 626F | 5C6A | 04DD | 3100 | 0F04 | 645F | 6F73 | 755F |

THU MAR 14 17:31:54 1991 DB_PI.DLL PAGE 293, LINE 17229

| | | | | | | | | |
|---|---|---|---|---|---|---|---|---|
| 0001042720 | 6C6E | 636F | 5F6B | 626F | C66A | 04DE | 3400 | 0F04 |
| 0001042740 | 645F | 6F73 | 755F | 6C6E | 636F | 5F6B | 6C61 | E46C |
| 0001042760 | 04CF | 2400 | 0E04 | 645F | 6F73 | 6C5F | 636F | 5F6B |
| 0001043000 | 7462 | 7672 | 0019 | 0004 | 0425 | 5F11 | 7364 | 5F6F |
| 0001043020 | 6572 | 656C | 7361 | 5F65 | 7462 | 7672 | D049 | 0004 |
| 0001043040 | 0427 | 5F0C | 7364 | 5F6F | 6461 | 5F64 | 626F | E16A |
| 0001043060 | 04D3 | 2900 | 0C04 | 645F | 6F73 | 645F | 6C65 | 6F5F |
| 0001043100 | 6A62 | D6BE | 0004 | 042B | 5F0C | 7364 | 5F6F | 6567 |
| 0001043120 | 5F74 | 626F | 1B6A | 04D8 | 2D00 | 1104 | 645F | 6F73 |
| 0001043140 | 705F | 7461 | 5F68 | 6567 | 5F74 | 626F | AC6A | 0B37 |
| 0001043160 | 2200 | 1F04 | 445F | 4F53 | 445F | 4645 | 5541 | 544C |
| 0001043200 | 435F | 4C4F | 414C | 4954 | 474E | 535F | 5145 | 4555 |
| 0001043220 | 434E | 6A45 | 051B | 5E00 | 1604 | 645F | 6F73 | 635F |
| 0001043240 | 6572 | 7461 | 3265 | 625F | 7274 | 5F76 | 6966 | 656C |
| 0001043260 | 21DF | 0005 | 046A | 5F0E | 7364 | 5F6F | 6C63 | 6165 |
| 0001043300 | 5F72 | 6274 | 9C6C | 0525 | 6C00 | 0F04 | 645F | 6F73 |
| 0001043320 | 725F | 6D65 | 766F | 5F65 | 6274 | 386C | 0528 | 6E00 |
| 0001043340 | 1504 | 645F | 6F73 | 725F | 6D65 | 766F | 5F65 | 6C63 |
| 0001043360 | 6165 | 5F72 | 6274 | 006C | 0500 | 3C00 | 0E04 | 645F |
| 0001043400 | 6F73 | 725F | 6365 | 7276 | 745F | 6C62 | 0D63 | 0005 |
| 0001043420 | 044A | 5F0D | 7364 | 5F6F | 6F6C | 6461 | 745F | 6C62 |
| 0001043440 | 145E | 0005 | 044C | 5F0F | 7364 | 5F6F | 6E75 | 6F6C |
| 0001043460 | 6461 | 745F | 6C62 | 1591 | 0005 | 044D | 5F09 | 7364 |
| 0001043500 | 5F6F | 7473 | 706F | 1609 | 0005 | 044F | 5F15 | 7364 |
| 0001043520 | 5F6F | 7263 | 6165 | 6574 | 625F | 7274 | 5F76 | 6966 |
| 0001043540 | 656C | 28C0 | 0005 | 0422 | 5F11 | 7364 | 5F6F | 7865 |
| 0001043560 | 7274 | 6361 | 5F74 | 6170 | 6874 | 295C | 0005 | 0424 |
| 0001043600 | 5F15 | 7364 | 5F6F | 7865 | 7274 | 6361 | 5F74 | 6966 |
| 0001043620 | 656C | 616E | 656D | 29CF | 0005 | 0426 | 5F10 | 7364 |
| 0001043640 | 5F6F | 6170 | 6874 | 655F | 6978 | 7473 | 9F73 | 052A |
| 0001043660 | 2800 | 1004 | 645F | 6F73 | 745F | 7365 | 5F74 | 7865 |
| 0001043700 | 7369 | 7374 | 2ADE | 0005 | 042A | 5F0A | 7364 | 5F6F |
| 0001043720 | 6B6D | 6964 | A972 | 052E | 3100 | 0D04 | 645F | 6F73 |
| 0001043740 | 725F | 5F6D | 6966 | 656C | 4373 | 0530 | 3300 | 0A04 |
| 0001043760 | 645F | 6F73 | 725F | 646D | 7269 | 30EA | 0005 | 0435 |
| 0001044000 | 5F07 | 7364 | 5F6F | 7564 | 367C | 0005 | 043F | 5F07 |
| 0001044020 | 7364 | 5F6F | 7063 | 3904 | 0005 | 0441 | 5F12 | 7364 |
| 0001044040 | 5F6F | 6F63 | 7970 | 6F5F | 656E | 665F | 6C69 | EA65 |
| 0001044060 | 053A | 4400 | 1004 | 645F | 6F73 | 6D5F | 5F6B | 6966 |
| 0001044100 | 656C | 616E | 656D | 3FDF | 0005 | 044B | 5F15 | 7364 |
| 0001044120 | 5F6F | 6567 | 5F74 | 7973 | 7473 | 6D65 | 645F | 6972 |
| 0001044140 | 6576 | 40A8 | 0005 | 044E | 5F13 | 7364 | 5F6F | 6576 |
| 0001044160 | 6972 | 7966 | 665F | 5F73 | 616E | 656D | 423D | 0005 |
| 0001044200 | 0450 | 5F10 | 7364 | 5F6F | 6576 | 6972 | 7966 | 6E5F |
| 0001044220 | 6D61 | 3C65 | 0543 | 5200 | 0E04 | 645F | 6F73 | 645F |
| 0001044240 | 6972 | 6576 | 6D5F | 7061 | 439C | 0005 | 03DA | 5F11 |
| 0001044260 | 7364 | 5F6F | 7263 | 6165 | 6574 | 6F5F | 6168 | 6873 |
| 0001044300 | 44C0 | 0005 | 03DC | 5F10 | 7364 | 5F6F | 6C63 | 6165 |
| 0001044320 | 5F72 | 686F | 7361 | C768 | 0546 | E200 | 1403 | 645F |
| 0001044340 | 6F73 | 615F | 6464 | 6F5F | 6168 | 6873 | 655F | 746E |
| 0001044360 | 7972 | 4A1E | 0005 | 03E4 | 5F14 | 7364 | 5F6F | 6567 |
| 0001044400 | 5F74 | 686F | 7361 | 5F68 | 6E65 | 7274 | 6879 | 0468 |
| 0001044420 | 0000 | 0700 | 735F | 7379 | 6574 | 4E6D | 0469 | 0000 |
| 0001044440 | 0600 | 6D5F | 646B | 7269 | 696C | 0004 | 0000 | 5F06 |
| 0001044460 | 6D72 | 6964 | EC72 | 046A | 0000 | 0800 | 735F | 6170 |
| 0001044500 | 6E77 | 6576 | 6D1E | 0004 | 0000 | 5F09 | 7073 | 7761 |
| 0001044520 | 766E | 6570 | 6EEC | 0004 | 0000 | 5F07 | 6361 | 6563 |
| 0001044540 | 7373 | 6F28 | 0004 | 0000 | 5F08 | 7473 | 6972 | 6D63 |
| 0001044560 | 2870 | 046F | 0000 | 0800 | 735F | 7274 | 6D63 | 6970 |

```
THU MAR 14 17:31:54 1991  DB_PI.DLL  PAGE 294, LINE 17288

0001044600   6F6E   0004   0000   5F09   675F   7465   6170   6874
0001044620   7018   0004   0000   5F0B   735F   6165   6372   6568
0001044640   766E   7124   0004   0000   5F09   635F   6E65   6176
0001044660   6772   3A3C   000B   0000   5F0B   705F   6F5F   6576
0001044700   6C72   7961   755E   0004   0000   5F09   645F   736F
0001044720   6170   6E77   3A3E   000B   0000   5F0A   665F   6C69
0001044740   6965   666E   F66F   0475   0000   0900   5F5F   6567
0001044760   6474   7763   E064   0475   0000   0700   675F   7465
0001045000   7763   0164   000A   8075   8183   6400   8300   0201
0001045020   0101   8000   1601   7900   0330   0383   8302   0204
0001045040   0A82   7528   746E   6761   6567   2964   0169   000A
0001045060   837F   0081   8183   8300   0081   1C01   7F00   0682
0001045100   6170   6B63   685F   8200   6606   6C69   5F65   0268
0001045120   0682   7566   636E   685F   0104   0007   737A   C083
0001045140   8200   0100   0001   0180   0001   0180   0001   0180
0001045160   0001   0180   0001   0180   0001   0180   0001   0180
*
0001045340   0001   0180   0001   0180   0001   0180   0005   5078
0001045360   8083   0100   0005   2878   8083   0100   0001   0180
0001045400   0001   0180   0001   0180   0001   0180   0001   0180
*
0001045740   0001   0180   0001   0180   0001   0180   0012   6079
0001045760   8305   0267   6883   8202   5F06   6F69   7562   6966
0001046000   1001   7F00   C083   8300   0081   C083   8300   0080
0001046020   8083   0100   0027   827F   5F04   7470   0072   0482
0001046040   635F   746E   8204   5F05   6162   6573   8206   5F05
0001046060   6C66   6761   820A   5F05   6966   656C   010B   0001
0001046100   0180   0007   737A   6683   8202   0100   0001   0180
0001046120   0001   0180   0001   0180   0001   0180   0001   0180
*
0001046500   0001   0180   0007   737A   AA83   8202   0100   000A
0001046520   8075   8183   6400   8300   0201   0101   8000   0101
0001046540   8000   0101   8000   0101   8000   0101   8000   0101
*
0001046620   8000   0101   8000   0101   8000   0A01   7500   8380
0001046640   0200   0064   0183   0102   0001   0180   0001   0180
0001046660   0001   0180   0001   0180   0001   0180   0001   0180
*
0001047440   0001   0180   0005   6878   8083   0100   0001   0180
0001047460   0001   0180   0001   0180   0001   0180   0007   8578
0001047500   0100   8083   0100   0001   0180   0001   0180   0001
0001047520   0180   0001   0180   0001   0180   0001   0180   0001
*
0001047700   0180   0014   3079   8303   0341   4283   8203   5F08
0001047720   4950   4944   464E   694F   0A01   7F00   8583   8300
0001047740   0085   8583   0100   0019   827F   7003   6469   8200
0001047760   7403   6469   8202   7009   6469   6150   6572   746E
0001050000   0104   0001   0180   0001   0180   0001   0180   0001
0001050020   0180   0001   0180   0001   0180   0001   0180   0001
*
0001051240   0180   0001   0180   0016   2079   8302   03ED   EE83
0001051260   8203   280A   6E75   6174   6767   6465   6929   0701
0001051300   7F00   8183   8300   0081   0901   7F00   0182   0078
0001051320   0182   0279   0101   8000   0101   8000   0101   8000
0001051340   0101   8000   0101   8000   0101   8000   0101   8000
*
0001051460   0101   8000   0101   8000   1601   7900   0120   0983
0001051500   8304   040A   0A82   7528   746E   6761   6567   2964
0001051520   0169   0004   837F   0086   0901   7F00   0582   7564
```

```
THU MAR 14 17:31:54 1991  DB_PI.DLL  PAGE 295, LINE 17347

0001051540  6D6D  0079  0101  8000  0101  8000  0101  8000
0001051560  0101  8000  0101  8000  0101  8000  0101  8000
*
0001051700  0101  8000  0101  8000  0101  8000  0701  7A00
0001051720  8373  00C0  0082  0101  8000  0101  8000  0101
0001051740  8000  0101  8000  0101  8000  0101  8000  0101
*
0001052160  8000  0101  8000  0101  8000  0101  8000  1601
0001052200  7900  0330  5183  8304  0452  0A82  7528  746E
0001052220  6761  6567  2964  0169  000A  837F  0085  8583
0001052240  8300  0085  1A01  7F00  0582  6977  7464  0068
0001052260  0682  6568  6769  7468  8202  6405  7065  6874
0001052300  0104  0018  8579  0140  8308  0455  5683  8204
0001052320  280A  6E75  6174  6767  6465  6929  0701  7800
0001052340  8085  8300  0084  1901  7F00  8183  8300  0450
0001052360  8583  8300  0085  C483  8300  0082  E483  8300
0001052400  0454  5A01  7F00  0682  6572  7270  7365  8200
0001052420  6406  6D69  6E65  0273  1082  6164  6174  6C5F
0001052440  7961  7265  645F  7065  6874  8208  7308  6769
0001052460  735F  7A69  0A65  0782  6973  5F67  7470  0C72
0001052500  0982  7462  706D  735F  7A69  1065  0882  7462
0001052520  706D  705F  7274  8214  7305  6170  6572  0118
0001052540  0001  0180  0018  8579  05A0  830C  045A  5B83
0001052560  8204  280A  6E75  6174  6767  6465  6929  0701
0001052600  7800  8085  8301  0084  2501  7F00  8683  8300
0001052620  0320  2083  8303  0086  8183  8300  0085  8683
0001052640  8300  0082  8683  8300  03EC  5383  8304  0459
0001052660  7E01  7F00  0282  6469  8200  6E04  6D61  0465
0001052700  0982  6966  656C  6E5F  6D61  2465  0982  7865
0001052720  5F70  6374  695F  4464  0482  7974  6570  8248
0001052740  720C  6665  6C5F  6E69  5F65  756E  4A6D  0982
0001052760  6572  5F66  6374  695F  4C64  0A82  6974  656D
0001053000  735F  6174  706D  8250  6106  696F  695F  5464
0001053020  0882  6F6C  6163  6974  6E6F  8258  6209  6D74
0001053040  5F70  6E69  6F66  825C  7305  6170  6572  8485
0001053060  0100  0001  0180  0001  0180  0001  0180  0001
0001053100  0180  0001  0180  0001  0180  0001  0180  0001
0001053120  0180  0001  0180  0001  0180  0007  737A  5883
0001053140  8204  0100  0001  0180  0001  0180  0001  0180
0001053160  0001  0180  0001  0180  0001  0180  0001  0180
*
0001054000  0001  0180  0001  0180  0001  0180  0018  8579
0001054020  0550  8306  04D3  D483  8204  280A  6E75  6174
0001054040  6767  6465  6929  0701  7800  0085  8304  0080
0001054060  1301  7F00  D283  8304  0081  8583  8300  0085
0001054100  8683  8300  0320  5301  7F00  0782  6F70  5F73
0001054120  6C62  006B  0E82  7462  7672  6F5F  6570  5F6E
0001054140  6F6D  6564  8085  8200  6608  7869  735F  7A69
0001054160  8565  0082  0982  656B  5F79  7369  695F  8564
0001054200  0084  0782  616C  7473  695F  8564  0086  0982
0001054220  6966  656C  6E5F  6D61  8565  008A  0101  8000
0001054240  1801  7900  0085  0713  D883  8304  04D9  0A82
0001054260  7528  746E  6761  6567  2964  0169  0007  8578
0001054300  0800  8083  0100  0016  837F  0086  D783  8304
0001054320  04D1  D183  8304  0086  8583  8300  0081  5201
0001054340  7F00  0582  7264  7669  0065  0782  616D  5F70
0001054360  6964  0472  0B82  626F  5F6A  6274  5F6C  6468
0001054400  856C  0104  0B82  6572  5F6C  6274  5F6C  6468
0001054420  856C  01AE  0582  6677  695F  8564  0258  0682
```

```
THU MAR 14 17:31:54 1991  DB_PI.DLL  PAGE 296, LINE 17406

0001054440   6F6C   6B63   6465   5C85   8202   6405   6D75   796D
0001054460   5E85   0102   0018   8579   0130   8303   04DB   DC83
0001054500   8204   280A   6E75   6174   6767   6465   6929   0A01
0001054520   7F00   2083   8303   00C0   8583   0100   0015   827F
0001054540   6B03   7965   8200   6904   6574   206D   0482   6973
0001054560   657A   0124   0016   4079   8303   04DF   E083   8204
0001054600   280A   6E75   6174   6767   6465   6929   0701   7A00
0001054620   8373   04DA   0082   0A01   7F00   8583   8300   0085
0001054640   DE83   0104   001C   827F   6109   6C6C   636F   7461
0001054660   6465   8200   7504   6573   0264   0582   6E65   7274
0001054700   0479   1601   7900   0340   E383   8304   04E4   0A82
0001054720   7528   746E   6761   6567   2964   0169   0007   737A
0001054740   DD83   8204   0100   000A   837F   0085   E283   8304
0001054760   0085   2301   7F00   0482   6973   657A   8200   6206
0001055000   6375   656B   0274   0F82   7562   6B63   7465   695F
0001055020   636E   735F   7A69   0665   0101   8000   0101   8000
0001055040   0101   8000   0101   8000   0101   8000   0101   8000
*
0001055300   0701   7A00   8373   04E1   0082   0101   8000   0101
0001055320   8000   0101   8000   0101   8000   0101   8000   0101
*
0001055420   8000   1801   7900   2085   0402   2383   8305   0524
0001055440   0A82   7528   746E   6761   6567   2964   0169   000D
0001055460   837F   0320   2083   8303   0081   8183   0100   0031
0001055500   827F   7509   6573   5F72   616E   656D   8200   610B
0001055520   7070   696C   5F63   616E   656D   8220   610B   7070
0001055540   696C   5F63   7974   6570   8240   6405   6D75   796D
0001055560   0142   0001   0180   0016   6079   8304   0528   2983
0001055600   8205   280A   6E75   6174   6767   6465   6929   0701
0001055620   7A00   8373   04D6   0082   0D01   7F00   8683   8300
0001055640   0085   8583   8300   0527   3501   7F00   0D82   6F77
0001055660   6B72   6E69   5F67   7264   7669   0065   0982   616D
0001055700   5F78   6F63   6E75   0474   0A82   7274   6565   635F
0001055720   756F   746E   8206   7408   6572   5F65   736C   0874
0001055740   1601   7900   0460   2B83   8305   052C   0A82   7528
0001055760   746E   6761   6567   2964   0169   000D   837F   0085
0001056000   0583   8302   0085   C683   0100   0026   827F   7008
0001056020   7461   5F68   6E63   0074   0882   6170   6874   6C5F
0001056040   7473   8202   6303   746E   8206   6906   5F64   736C
0001056060   0874   0101   8000   1801   7900   7085   0205   2F83
0001056100   8305   0530   0A82   7528   746E   6761   6567   2964
0001056120   0169   0007   837F   04D1   C083   0100   0022   827F
0001056140   6C07   6269   745F   6C62   8200   6C12   6269   665F
0001056160   6C6F   6564   5F72   6F6C   6E67   6D61   8565   00AA
0001056200   0101   8000   1801   7900   2085   0301   3383   8305
0001056220   0534   0A82   7528   746E   6761   6567   2964   0169
0001056240   000A   837F   0085   8183   8300   0320   2001   7F00
0001056260   0882   6361   6563   7373   6465   8200   6405   6D75
0001056300   796D   8202   6609   6C69   5F65   616E   656D   0104
0001056320   0018   8579   0800   8301   0536   3783   8205   280A
0001056340   6E75   6174   6767   6465   6929   0401   7F00   D783
0001056360   0104   000C   827F   6408   7269   6E5F   6D61   0065
0001056400   1801   7900   1085   084A   3B83   8305   053C   0A82
0001056420   7528   746E   6761   6567   2964   0169   0007   8578
0001056440   0FF0   D183   0104   0007   8578   1800   3583   0105
0001056460   0019   837F   0532   3283   8305   0539   3A83   8305
0001056500   04D1   D183   8304   04D1   3983   0105   0053   827F
0001056520   740A   7473   735F   7263   7069   0074   0A82   7374
0001056540   5F74   6568   6461   7265   8224   6903   676D   8248
```

THU MAR 14 17:31:54 1991 DB_PI.DLL PAGE 297, LINE 17465

| | | | | | | | | |
|---|---|---|---|---|---|---|---|---|
| 0001056560 | 6907 | 676D | 645F | 7269 | 4685 | 8202 | 6604 | 746C |
| 0001056600 | 8572 | 0546 | 0382 | 6F61 | 8569 | 05F0 | 0482 | 7865 |
| 0001056620 | 6365 | 9A85 | 8206 | 6707 | 6E65 | 7265 | 6369 | 4485 |
| 0001056640 | 0107 | 0001 | 0180 | 0018 | 8579 | 53B0 | 830B | 053F |
| 0001056660 | 4083 | 8205 | 280A | 6E75 | 6174 | 6767 | 6465 | 6929 |
| 0001056700 | 2201 | 7F00 | 8683 | 8300 | 0320 | 8183 | 8300 | 0081 |
| 0001056720 | 0883 | 8304 | 0085 | 8183 | 8300 | 0085 | 8183 | 8300 |
| 0001056740 | 04D7 | 3883 | 0105 | 006F | 827F | 6902 | 0064 | 0482 |
| 0001056760 | 616E | 656D | 8204 | 610B | 6363 | 7365 | 5F73 | 6F6D |
| 0001057000 | 6564 | 8224 | 6C0A | 636F | 5F6B | 6373 | 706F | 2665 |
| 0001057020 | 0A82 | 6873 | 7261 | 5F65 | 6E69 | 6F66 | 8228 | 6F08 |
| 0001057040 | 6570 | 5F6E | 6E63 | 2C74 | 0582 | 7073 | 7261 | 2E65 |
| 0001057060 | 0882 | 6F6C | 6B63 | 685F | 6C64 | 8230 | 7306 | 6170 |
| 0001057100 | 6572 | 3231 | 0882 | 6964 | 5F72 | 6170 | 6874 | 8234 |
| 0001057120 | 7303 | 6264 | 3485 | 0101 | 0001 | 0180 | 0018 | 8579 |
| 0001057140 | 07F0 | 8310 | 0544 | 4583 | 8205 | 280A | 6E75 | 6174 |
| 0001057160 | 6767 | 6465 | 6929 | 0701 | 7A00 | 8373 | 053E | 0082 |
| 0001057200 | 3101 | 7F00 | 8583 | 8300 | 0085 | 8683 | 8300 | 0543 |
| 0001057220 | 5883 | 8304 | 0466 | 8183 | 8300 | 0081 | 8583 | 8300 |
| 0001057240 | 0081 | 6A83 | 8302 | 026A | 2083 | 8303 | 0081 | E483 |
| 0001057260 | 8300 | 00E4 | D801 | 7F00 | 0482 | 7375 | 6465 | 8200 |
| 0001057300 | 6109 | 6363 | 7365 | 5F73 | 706F | 8202 | 7406 | 7473 |
| 0001057320 | 695F | 0464 | 0782 | 7374 | 5F74 | 7470 | 0872 | 0782 |
| 0001057340 | 6D69 | 5F67 | 6468 | 0C72 | 0B82 | 6D69 | 5F67 | 7562 |
| 0001057360 | 5F66 | 7470 | 8572 | 00C0 | 0B82 | 6361 | 6563 | 7373 |
| 0001057400 | 6D5F | 646F | 8565 | 00C4 | 0B82 | 7263 | 6165 | 6574 |
| 0001057420 | 6D5F | 646F | 8565 | 00C6 | 0A82 | 6162 | 6B63 | 7267 |
| 0001057440 | 756F | 646E | C885 | 8200 | 6308 | 6D6F | 7270 | 7365 |
| 0001057460 | 8573 | 00CA | 0782 | 706F | 6E65 | 665F | 8570 | 00CC |
| 0001057500 | 0782 | 6574 | 706D | 665F | 8570 | 00D0 | 0E82 | 6574 |
| 0001057520 | 706D | 665F | 6C69 | 5F65 | 616E | 656D | D485 | 8200 |
| 0001057540 | 620D | 6361 | 676B | 6F72 | 6E75 | 5F64 | 7473 | F485 |
| 0001057560 | 8200 | 6C09 | 7961 | 7265 | 705F | 7274 | F685 | 8200 |
| 0001057600 | 730B | 6177 | 5F70 | 7562 | 6666 | 7265 | FA85 | 0100 |
| 0001057620 | 0001 | 0180 | 0016 | 4079 | 8303 | 0549 | 4A83 | 8205 |
| 0001057640 | 280A | 6E75 | 6174 | 6767 | 6465 | 6929 | 0701 | 7A00 |
| 0001057660 | 8373 | 0542 | 0082 | 0A01 | 7F00 | 8583 | 8300 | 0085 |
| 0001057700 | 4883 | 0105 | 001F | 827F | 6907 | 676D | 635F | 746E |
| 0001057720 | 8200 | 6D07 | 7861 | 635F | 746E | 8202 | 6907 | 676D |
| 0001057740 | 6C5F | 7473 | 0104 | 0001 | 0180 | 0016 | 5079 | 8303 |
| 0001057760 | 054D | 4E83 | 8205 | 280A | 6E75 | 6174 | 6767 | 6465 |
| 0001060000 | 6929 | 0A01 | 7F00 | 8683 | 8300 | 0085 | 0F83 | 0105 |
| 0001060020 | 0023 | 827F | 6F06 | 6A62 | 695F | 0064 | 0A82 | 6F6C |
| 0001060040 | 6461 | 635F | 756F | 746E | 8204 | 7409 | 6261 | 656C |
| 0001060060 | 705F | 7274 | 0106 | 0016 | 3079 | 8302 | 0551 | 5283 |
| 0001060100 | 8205 | 280A | 6E75 | 6174 | 6767 | 6465 | 6929 | 0701 |
| 0001060120 | 7A00 | 8373 | 054C | 0082 | 0701 | 7F00 | 5083 | 8305 |
| 0001060140 | 0085 | 2501 | 7F00 | 0E82 | 7973 | 626D | 6C6F | 745F |
| 0001060160 | 6C62 | 6C5F | 7473 | 8200 | 7410 | 6261 | 656C | 5F73 |
| 0001060200 | 6C61 | 6F6C | 6163 | 6574 | 0464 | 1601 | 7900 | 0240 |
| 0001060220 | 5483 | 8305 | 0555 | 0A82 | 7528 | 746E | 6761 | 6567 |
| 0001060240 | 2964 | 0169 | 0007 | 837F | 0086 | 4383 | 0105 | 0014 |
| 0001060260 | 827F | 7406 | 7473 | 695F | 0064 | 0782 | 7374 | 5F74 |
| 0001060300 | 7470 | 0472 | 0101 | 8000 | 1801 | 7900 | B085 | 0D16 |
| 0001060320 | 5983 | 8305 | 055A | 0A82 | 7528 | 746E | 6761 | 6567 |
| 0001060340 | 2964 | 0169 | 0005 | 4078 | 5383 | 0105 | 0028 | 837F |
| 0001060360 | 0085 | 8183 | 8300 | 0522 | 2683 | 8305 | 0547 | 2E83 |
| 0001060400 | 8305 | 052E | 2A83 | 8305 | 054F | D783 | 8304 | 0085 |
| 0001060420 | 8583 | 8300 | 0558 | A301 | 7F00 | 0A82 | 6573 | 7373 |

THU MAR 14 17:31:54 1991 DB_PI.DLL PAGE 298, LINE 17524

```
0001060440  6F69  5F6E  6E6F  8200  6405  6D75  796D  8202
0001060460  6306  696C  6E65  0474  0582  7274  6565  4873
0001060500  0882  706F  6E65  695F  676D  8254  6608  746C
0001060520  5F72  696C  5C62  0882  6369  6E6F  6C5F  6269
0001060540  0A85  8201  7306  5F70  6468  8572  01B8  0A82
0001060560  6F63  666E  6769  6C5F  7473  C485  8201  640A
0001060600  5F62  6970  705F  7461  8568  01CA  0E82  616D
0001060620  5F78  6574  7473  635F  756F  746E  CA85  8202
0001060640  740A  7365  5F74  6F63  6E75  8574  02CC  0982
0001060660  6574  7473  6C5F  7369  8574  02CE  0101  8000
0001060700  0101  8000  0101  8000  0101  8000  0101  8000
0001060720  0701  7A00  8373  0557  0082  0101  8000  0101
0001060740  8000  0101  8000  0101  8000  0101  8000  0101
*
0001061720  8000  0101  8000  0A01  7500  8380  0200  0173
0001061740  E183  0105  0004  837F  0085  0101  8000  0101
0001061760  8000  0A01  7500  8380  0200  0264  E583  0105
0001062000  0007  837F  0081  C083  0100  000D  837F  00C0
0001062020  C083  8300  0081  8583  0100  000A  8075  8183
0001062040  7300  8304  05E6  0101  8000  0501  7800  8340
0001062060  0080  0501  7800  8340  0080  0501  7800  8338
0001062100  0080  0501  7800  8360  0082  0401  7F00  8583
0001062120  0100  000A  8075  8183  7300  8301  05ED  0101
0001062140  8000  0401  7F00  8583  0100  000A  8075  0083
0001062160  7302  8301  05F0  0401  7F00  8583  0100  000A
0001062200  8075  C083  7300  8301  05F2  0101  8000  0501
0001062220  7800  8348  0080  0701  7F00  C083  8300  0085
0001062240  0A01  7500  8380  00C0  0273  F683  0105  0001
0001062260  0180  0005  5878  8083  0100  0004  837F  00C0
0001062300  0A01  7500  8380  0200  0173  FA83  0105  0005
0001062320  2078  8083  0100  0004  837F  00C0  0A01  7500
0001062340  8380  0081  0173  FD83  0105  0007  837F  0081
0001062360  C083  0100  000A  8075  8183  6400  8302  05FF
0001062400  0701  7F00  8183  8300  00C0  0A01  7500  8380
0001062420  0200  0264  0183  0106  0005  1078  8083  0100
0001062440  000A  8075  0083  6402  8300  0201  0A01  7F00
0001062460  8183  8300  00C5  2583  0104  000A  8075  8183
0001062500  7300  8303  0605  0501  7800  8330  0080  0101
0001062520  8000  0101  8000  1601  7900  0330  0383  8302
0001062540  0204  0A82  7528  746E  6761  6567  2964  0169
0001062560  000A  837F  0081  8183  8300  0081  1C01  7F00
0001062600  0682  6170  6B63  685F  8200  6606  6C69  5F65
0001062620  0268  0682  7566  636E  685F  0104  0001  0180
0001062640  0001  0180  0001  0180  0001  0180  0001  0180
*
0001063040  0001  0180  0001  0180  0005  5078  8083  0100
0001063060  0005  2878  8083  0100  0001  0180  0001  0180
0001063100  0001  0180  0001  0180  0001  0180  0001  0180
*
0001063340  0007  8578  0100  8083  0100  0001  0180  0001
0001063360  0180  0001  0180  0001  0180  0001  0180  0001
*
0001066140  0180  0001  0180  0001  0180  0007  737A  B683
0001066160  8203  0100  0007  737A  5483  8202  0100  0001
0001066200  0180  0001  0180  0001  0180  0001  0180  0001
*
0001067360  0180  0018  8579  0550  8306  0456  5783  8204
0001067400  280A  6E75  6174  6767  6465  6929  0701  7800
0001067420  0085  8304  0080  1301  7F00  5583  8304  0081
```

```
THU MAR 14 17:31:54 1991  DB_PI.DLL  PAGE 299, LINE 17583

0001067440  8583  8300  0085  8683  8300  0254  5301  7F00
0001067460  0782  6F70  5F73  6C62  006B  0E82  7462  7672
0001067500  6F5F  6570  5F6E  6F6D  6564  8085  8200  6608
0001067520  7869  735F  7A69  8565  0082  0982  656B  5F79
0001067540  7369  695F  8564  0084  0782  616C  7473  695F
0001067560  8564  0086  0982  6966  656C  6E5F  6D61  8565
0001067600  008A  0101  8000  1801  7900  0085  0713  5B83
0001067620  8304  045C  0A82  7528  746E  6761  6567  2964
0001067640  0169  0007  8578  0800  8083  0100  0016  837F
0001067660  0086  5A83  8304  0454  5483  8304  0086  8583
0001067700  8300  0081  5201  7F00  0582  7264  7669  0065
0001067720  0782  616D  5F70  6964  0472  0B82  626F  5F6A
0001067740  6274  5F6C  6468  856C  0104  0B82  6572  5F6C
0001067760  6274  5F6C  6468  856C  01AE  0582  6677  695F
0001070000  8564  0258  0682  6F6C  6B63  6465  5C85  8202
0001070020  6405  6D75  796D  5E85  0102  0001  0180  0001
0001070040  0180  0001  0180  0001  0180  0001  0180  0001
*
0001070460  0180  0001  0180  0001  0180  0007  737A  5983
0001070500  8204  0100  0001  0180  0001  0180  0001  0180
0001070520  0001  0180  0001  0180  0001  0180  0001  0180
*
0001071560  0007  837F  00C0  C083  0100  000A  8075  8183
0001071600  7300  8302  0531  0101  8000  0101  8000  0701
0001071620  7800  9085  8300  0080  0501  7800  8338  0080
0001071640  0701  7A00  8373  0538  0082  0A01  7500  8380
0001071660  0081  0064  0183  0102  0005  6078  8283  0100
0001071700  0005  0878  8083  0100  0005  1078  8083  0100
0001071720  0005  1878  8083  0100  0004  837F  00C0  0A01
0001071740  7500  8380  0081  0173  3D83  0105  0004  837F
0001071760  00C0  0A01  7500  8380  0081  0173  3F83  0105
0001072000  0001  0180  0007  8578  0080  8083  0100  0004
0001072020  837F  00C0  0A01  7500  8380  0081  0173  4383
0001072040  0105  0007  837F  00C0  8683  0100  000A  8075
0001072060  8183  7300  8302  0545  0101  8000  0701  7800
0001072100  B085  8300  0080  0401  7F00  C083  0100  000A
0001072120  8075  8583  6400  8301  0549  0501  7800  8368
0001072140  0080  0501  7800  8358  0080  0501  7800  8360
0001072160  0080  0A01  7F00  8183  8300  00C5  B583  0103
0001072200  000A  8075  8183  7300  8303  054E  0101  8000
0001072220  0501  7800  8378  0080  0A01  7500  8380  0081
0001072240  0064  0183  0102  0001  0180  0016  3079  8303
0001072260  0203  0483  8202  280A  6E75  6174  6767  6465
0001072300  6929  0A01  7F00  8183  8300  0081  8183  0100
0001072320  001C  827F  7006  6361  5F6B  0068  0682  6966
0001072340  656C  685F  8202  6606  6E75  5F63  0468  0701
0001072360  7A00  8373  00C0  0082  0101  8000  0101  8000
0001072400  0101  8000  0101  8000  0101  8000  0101  8000
*
0001072600  0501  7800  8358  0080  0501  7800  8328  0080
0001072620  0101  8000  0101  8000  0101  8000  0101  8000
*
0001073060  0101  8000  0101  8000  0701  7800  0085  8301
0001073100  0080  0101  8000  0101  8000  0101  8000  0101
0001073120  8000  0101  8000  0101  8000  0101  8000  0101
*
0001075400  8000  0101  8000  1801  7900  2085  0201  8783
0001075420  8303  0388  0A82  7528  746E  6761  6567  2964
0001075440  0169  0007  837F  0086  5483  0102  0015  827F
```

```
THU MAR 14 17:31:54 1991  DB_PI.DLL  PAGE 300, LINE 17642

0001075460  6F06  6A62  695F  0064  0882  626F  5F6A  616E
0001075500  656D  0104  0001  0180  0001  0180  0001  0180
0001075520  0001  0180  0001  0180  0001  0180  0001  0180
*
0001075700  0001  0180  0001  0180  0018  8579  0260  8305
0001075720  03AB  AC83  8203  280A  6E75  6174  6767  6465
0001075740  6929  1001  7F00  8683  8300  0254  8283  8300
0001075760  0254  C083  0100  002E  827F  6902  0064  0482
0001076000  616E  656D  8204  740A  6D69  5F65  7473  6D61
0001076020  2470  0582  776F  656E  2872  0982  6870  7379
0001076040  705F  7461  4868  0101  8000  0101  8000  0101
0001076060  8000  0101  8000  0101  8000  0101  8000  0101
*
0001076140  8000  0101  8000  0101  8000  0701  7A00  8373
0001076160  03BF  0082  0701  7A00  8373  03AA  0082  0101
0001076200  8000  0101  8000  0101  8000  0101  8000  0101
*
0001076240  8000  0101  8000  0701  7A00  8373  03CB  0082
0001076260  0701  7A00  8373  0386  0082  0101  8000  0101
0001076300  8000  0101  8000  0101  8000  0101  8000  0101
*
0001077320  8000  0101  8000  1801  7900  5085  0605  5583
0001077340  8304  0456  0A82  7528  746E  6761  6567  2964
0001077360  0169  0007  8578  0400  8083  0100  0013  837F
0001077400  0454  8183  8300  0085  8583  8300  0086  5483
0001077420  0102  0053  827F  7007  736F  625F  6B6C  8200
0001077440  620E  7274  5F76  706F  6E65  6D5F  646F  8565
0001077460  0080  0882  6966  5F78  6973  657A  8285  8200
0001077500  6B09  7965  695F  5F73  6469  8485  8200  6C07
0001077520  7361  5F74  6469  8685  8200  6609  6C69  5F65
0001077540  616E  656D  8A85  0100  0001  0180  0018  8579
0001077560  1300  8307  045A  5B83  8204  280A  6E75  6174
0001077600  6767  6465  6929  0701  7800  0085  8308  0080
0001077620  1601  7F00  8683  8300  0459  5383  8304  0453
0001077640  8683  8300  0085  8183  0100  0052  827F  6405
0001077660  6972  6576  8200  6D07  7061  645F  7269  8204
0001077700  6F0B  6A62  745F  6C62  685F  6C64  0485  8201
0001077720  720B  6C65  745F  6C62  685F  6C64  AE85  8201
0001077740  7705  5F66  6469  5885  8202  6C06  636F  656B
0001077760  8564  025C  0582  7564  6D6D  8579  025E  0101
0001100000  8000  0101  8000  0101  8000  0101  8000  0101
*
0001100420  8000  0101  8000  0101  8000  0101  8000  0701
0001100440  7A00  8373  0458  0082  0101  8000  0101  8000
0001100460  0101  8000  0101  8000  0101  8000  0101  8000
*
0001101520  0101  8000  1301  7F00  C083  8300  0086  C083
0001101540  8300  0081  C083  8300  00C6  0A01  7500  8380
0001101560  0081  0673  3083  0105  0001  0180  0001  0180
0001101600  0007  8578  00B8  8083  0100  0005  3878  8083
0001101620  0100  0007  737A  3783  8205  0100  000A  8075
0001101640  8183  6400  8300  0201  0501  7800  8360  0082
0001101660  0D01  7F00  C083  8300  0081  C083  8300  00C6
0001101700  0A01  7500  8380  0081  0473  3983  0105  0001
0001101720  0180  0007  8578  0088  8083  0100  000D  837F
0001101740  00C0  8683  8300  0081  C683  0100  000A  8075
0001101760  8183  7300  8304  053D  0A01  7F00  C083  8300
0001102000  0086  BE83  0103  000A  8075  8183  7300  8303
0001102020  053F  0101  8000  0701  7800  9885  8300  0080
```

```
THU MAR 14 17:31:54 1991  DB_PI.DLL  PAGE 301, LINE 17701

0001102040  0401  7F00  BF83  0103  000A  8075  0083  7302
0001102060  8301  0543  0101  8000  0701  7800  A085  8300
0001102100  0080  0501  7800  8320  0080  0701  7F00  C083
0001102120  8300  00C6  0A01  7500  8380  0081  0273  4883
0001102140  0105  0001  0180  0007  8578  00B0  8083  0100
0001102160  0007  837F  0086  0583  0102  000A  8075  8183
0001102200  7300  8302  054C  0501  7800  8350  0080  0A01
0001102220  7F00  C083  8300  0086  0583  0102  000A  8075
0001102240  8183  7300  8303  054F  0101  8000  0701  7800
0001102260  9085  830C  0080  0D01  7F00  C083  8300  0086
0001102300  C583  8300  03CA  0A01  7500  8380  0081  0473
0001102320  5383  0105  000D  837F  00C0  8683  8300  00C6
0001102340  C083  0100  000A  8075  8183  7300  8304  0555
0001102360  1301  7F00  C083  8300  0086  C083  8300  0086
0001102400  8583  8300  00C6  0A01  7500  8380  0081  0673
0001102420  5783  0105  0001  0180  0005  7878  8083  0100
0001102440  0013  837F  00C0  8683  8300  00C0  8683  8300
0001102460  0085  C683  0100  000A  8075  8183  7300  8306
0001102500  055B  0D01  7F00  C083  8300  0086  8183  8300
0001102520  00C6  0A01  7500  8380  0081  0473  5D83  0105
0001102540  0001  0180  0001  0180  0016  3079  8303  0203
0001102560  0483  8202  280A  6E75  6174  6767  6465  6929
0001102600  0A01  7F00  8183  8300  0081  8183  0100  001C
0001102620  827F  7006  6361  5F6B  0068  0682  6966  656C
0001102640  685F  8202  6606  6E75  5F63  0468  0701  7A00
0001102660  8373  00C0  0082  0101  8000  0101  8000  0101
0001102700  8000  0101  8000  0101  8000  0101  8000  0101
*
0001103060  8000  0101  8000  0101  8000  0101  8000  0501
0001103100  7800  8358  0080  0501  7800  8328  0080  1201
0001103120  7900  0560  2B83  8302  022C  0682  695F  626F
0001103140  6675  0169  0010  837F  00C0  8183  8300  00C0
0001103160  8083  8300  0080  2701  7F00  0482  705F  7274
0001103200  8200  5F04  6E63  0474  0582  625F  7361  0665
0001103220  0582  665F  616C  0A67  0582  665F  6C69  0B65
0001103240  0101  8000  0701  7A00  8373  022A  0082  0101
0001103260  8000  0101  8000  0101  8000  0101  8000  0101
*
0001104320  8000  0101  8000  0501  7800  8368  0080  0101
0001104340  8000  0101  8000  0101  8000  0101  8000  0701
0001104360  7800  0085  8301  0080  0101  8000  0101  8000
0001104400  0101  8000  0101  8000  0101  8000  0101  8000
*
0001104660  0501  7800  8360  0080  0101  8000  0101  8000
0001104700  0101  8000  0101  8000  0101  8000  0101  8000
*
0001105300  0101  8000  0101  8000  0101  8000  1601  7900
0001105320  0220  3483  8303  0335  0A82  7528  746E  6761
0001105340  6567  2964  0169  0007  837F  0081  8183  0100
0001105360  0009  827F  7801  8200  7901  0102  0001  0180
0001105400  0001  0180  0001  0180  0001  0180  0001  0180
*
0001105540  0016  2079  8301  0350  5183  8203  280A  6E75
0001105560  6174  6767  6465  6929  0401  7F00  8683  0100
0001105600  0009  827F  6405  6D75  796D  0100  0001  0180
0001105620  0007  737A  4F83  8203  0100  0001  0180  0001
0001105640  0180  0001  0180  0001  0180  0001  0180  0001
*
0001106240  0180  0001  0180  0016  3079  8303  0398  9983
```

```
THU MAR 14 17:31:54 1991  DB_PI.DLL  PAGE 302, LINE 17760

0001106260  8203  280A  6E75  6174  6767  6465  6929  0A01
0001106300  7F00  8583  8300  0085  8583  0100  001A  827F
0001106320  7705  6469  6874  8200  6806  6965  6867  0274
0001106340  0582  6564  7470  0468  1801  7900  4085  0801
0001106360  9C83  8303  039D  0A82  7528  746E  6761  6567
0001106400  2964  0169  0007  8578  0080  8483  0100  0019
0001106420  837F  0081  9783  8303  0085  8583  8300  00C4
0001106440  8283  8300  00E4  9B83  0103  005A  827F  7206
0001106460  7065  6572  0073  0682  6964  656D  736E  8202
0001106500  6410  7461  5F61  616C  6579  5F72  6564  7470
0001106520  0868  0882  6973  5F67  6973  657A  820A  7307
0001106540  6769  705F  7274  820C  6209  6D74  5F70  6973
0001106560  657A  8210  6208  6D74  5F70  7470  1472  0582
0001106600  7073  7261  1865  0101  8000  1801  7900  A085
0001106620  0C05  A183  8303  03A2  0A82  7528  746E  6761
0001106640  6567  2964  0169  0007  8578  0180  8483  0100
0001106660  0025  837F  0086  BE83  8302  02BE  8683  8300
0001106700  0081  8583  8300  0086  8283  8300  0086  3383
0001106720  8303  039A  A083  0103  007E  827F  6902  0064
0001106740  0482  616E  656D  8204  6609  6C69  5F65  616E
0001106760  656D  8224  6509  7078  745F  5F63  6469  8244
0001107000  7404  7079  4865  0C82  6572  5F66  696C  656E
0001107020  6E5F  6D75  824A  7209  6665  745F  5F63  6469
0001107040  824C  740A  6D69  5F65  7473  6D61  5070  0682
0001107060  6F61  5F69  6469  8254  6C08  636F  7461  6F69
0001107100  586E  0982  7462  706D  695F  666E  5C6F  0582
0001107120  7073  7261  8565  0084  0101  8000  0101  8000
0001107140  0101  8000  0101  8000  0101  8000  0101  8000
*
0001107200  0701  7A00  8373  039F  0082  0101  8000  0101
0001107220  8000  0101  8000  0101  8000  0101  8000  0101
*
0001110160  8000  0101  8000  1801  7900  5085  0605  2B83
0001110200  8304  042C  0A82  7528  746E  6761  6567  2964
0001110220  0169  0007  8578  0400  8083  0100  0013  837F
0001110240  042A  8183  8300  0085  8583  8300  0086  BE83
0001110260  0102  0053  827F  7007  736F  625F  6B6C  8200
0001110300  620E  7274  5F76  706F  6E65  6D5F  646F  8565
0001110320  0080  0882  6966  5F78  6973  657A  8285  8200
0001110340  6B09  7965  695F  5F73  6469  8485  8200  6C07
0001110360  7361  5F74  6469  8685  8200  6609  6C69  5F65
0001110400  616E  656D  8A85  0100  0001  0180  0018  8579
0001110420  1300  8307  0430  3183  8204  280A  6E75  6174
0001110440  6767  6465  6929  0701  7800  0085  8308  0080
0001110460  1601  7F00  8683  8300  042F  2983  8304  0429
0001110500  8683  8300  0085  8183  0100  0052  827F  6405
0001110520  6972  6576  8200  6D07  7061  645F  7269  8204
0001110540  6F0B  6A62  745F  6C62  685F  6C64  0485  8201
0001110560  720B  6C65  745F  6C62  685F  6C64  AE85  8201
0001110600  7705  5F66  6469  5885  8202  6C06  636F  656B
0001110620  8564  025C  0582  7564  6D6D  8579  025E  1801
0001110640  7900  3085  0301  3383  8304  0434  0A82  7528
0001110660  746E  6761  6567  2964  0169  000A  837F  02BE
0001110700  C083  8300  0085  1501  7F00  0382  656B  0079
0001110720  0482  7469  6D65  8220  7304  7A69  2465  1601
0001110740  7900  0340  3783  8304  0438  0A82  7528  746E
0001110760  6761  6567  2964  0169  0007  737A  3283  8204
0001111000  0100  000A  837F  0085  8583  8300  0436  1C01
0001111020  7F00  0982  6C61  6F6C  6163  6574  0064  0482
```

THU MAR 14 17:31:54 1991 DB_PI.DLL PAGE 303, LINE 17819

```
0001111040  7375  6465  8202  6505  746E  7972  0104  0016
0001111060  4079  8303  043B  3C83  8204  280A  6E75  6174
0001111100  6767  6465  6929  0701  7A00  8373  0435  0082
0001111120  0A01  7F00  8583  8300  043A  8583  0100  0023
0001111140  827F  7304  7A69  0065  0682  7562  6B63  7465
0001111160  8202  620F  6375  656B  5F74  6E69  5F63  6973
0001111200  657A  0106  0001  0180  0001  0180  0001  0180
0001111220  0001  0180  0001  0180  0001  0180  0001  0180
*
0001111440  0001  0180  0001  0180  0001  0180  0007  737A
0001111460  3983  8204  0100  0001  0180  0001  0180  0001
0001111500  0180  0001  0180  0001  0180  0001  0180  0001
*
0001111560  0180  0001  0180  0001  0180  0001  0180  0007
0001111600  737A  2E83  8204  0100  0001  0180  0001  0180
0001111620  0001  0180  0001  0180  0001  0180  0001  0180
*
0001112020  0001  0180  0001  0180  0018  8579  0220  8304
0001112040  04A0  A183  8204  280A  6E75  6174  6767  6465
0001112060  6929  0D01  7F00  BE83  8302  02BE  8183  8300
0001112100  0081  3101  7F00  0982  7375  7265  6E5F  6D61
0001112120  0065  0B82  7061  6C70  6369  6E5F  6D61  2065
0001112140  0B82  7061  6C70  6369  745F  7079  4065  0582
0001112160  7564  6D6D  4279  0101  8000  1601  7900  0460
0001112200  A483  8304  04A5  0A82  7528  746E  6761  6567
0001112220  2964  0169  000D  837F  0086  8583  8300  0085
0001112240  7A83  0104  0035  827F  770D  726F  696B  676E
0001112260  645F  6972  6576  8200  6D09  7861  635F  756F
0001112300  746E  8204  740A  6572  5F65  6F63  6E75  0674
0001112320  0882  7274  6565  6C5F  7473  0108  0016  6079
0001112340  8304  04A7  A883  8204  280A  6E75  6174  6767
0001112360  6465  6929  0D01  7F00  8583  8300  0205  8583
0001112400  8300  00C6  2601  7F00  0882  6170  6874  635F
0001112420  746E  8200  7008  7461  5F68  736C  0274  0382
0001112440  6E63  0674  0682  6469  6C5F  7473  0108  0001
0001112460  0180  0018  8579  0570  8302  04AB  AC83  8204
0001112500  280A  6E75  6174  6767  6465  6929  0701  7F00
0001112520  2983  8304  00C0  2201  7F00  0782  696C  5F62
0001112540  6274  006C  1282  696C  5F62  6F66  646C  7265
0001112560  6C5F  676F  616E  656D  AA85  0100  0001  0180
0001112600  0018  8579  0120  8303  04AF  B083  8204  280A
0001112620  6E75  6174  6767  6465  6929  0A01  7F00  8583
0001112640  8300  0081  BE83  0102  0020  827F  6108  6363
0001112660  7365  6573  0064  0582  7564  6D6D  0279  0982
0001112700  6966  656C  6E5F  6D61  0465  1801  7900  0085
0001112720  0108  B283  8304  04B3  0A82  7528  746E  6761
0001112740  6567  2964  0169  0004  837F  042F  0C01  7F00
0001112760  0882  6964  5F72  616E  656D  0100  0018  8579
0001113000  4A10  8308  04B7  B883  8204  280A  6E75  6174
0001113020  6767  6465  6929  0701  7800  F085  830F  0429
0001113040  0701  7800  0085  8318  04B1  1901  7F00  AE83
0001113060  8304  04AE  B583  8304  04B6  2983  8304  0429
0001113100  2983  8304  04B5  5301  7F00  0A82  7374  5F74
0001113120  6373  6972  7470  8200  740A  7473  685F  6165
0001113140  6564  2472  0382  6D69  4867  0782  6D69  5F67
0001113160  6964  8572  0246  0482  6C66  7274  4685  8205
0001113200  6103  696F  F085  8205  6504  6578  8563  069A
0001113220  0782  6567  656E  6972  8563  0744  0101  8000
0001113240  1801  7900  B085  0B53  BB83  8304  04BC  0A82
```

THU MAR 14 17:31:54 1991 DB_PI.DLL PAGE 304, LINE 17878

| | | | | | | | | |
|---|---|---|---|---|---|---|---|---|
| 0001113260 | 7528 | 746E | 6761 | 6567 | 2964 | 0169 | 0022 | 837F |
| 0001113300 | 0086 | BE83 | 8302 | 0081 | 8183 | 8300 | 034F | 8583 |
| 0001113320 | 8300 | 0081 | 8583 | 8300 | 0081 | 2F83 | 8304 | 04B4 |
| 0001113340 | 6F01 | 7F00 | 0282 | 6469 | 8200 | 6E04 | 6D61 | 0465 |
| 0001113360 | 0B82 | 6361 | 6563 | 7373 | 6D5F | 646F | 2465 | 0A82 |
| 0001113400 | 6F6C | 6B63 | 735F | 6F63 | 6570 | 8226 | 730A | 6168 |
| 0001113420 | 6572 | 695F | 666E | 286F | 0882 | 706F | 6E65 | 635F |
| 0001113440 | 746E | 822C | 7305 | 6170 | 6572 | 822E | 6C08 | 636F |
| 0001113460 | 5F6B | 6468 | 306C | 0682 | 7073 | 7261 | 3165 | 8232 |
| 0001113500 | 6408 | 7269 | 705F | 7461 | 3468 | 0382 | 6473 | 8562 |
| 0001113520 | 0134 | 0101 | 8000 | 1801 | 7900 | F085 | 1007 | C083 |
| 0001113540 | 8304 | 04C1 | 0A82 | 7528 | 746E | 6761 | 6567 | 2964 |
| 0001113560 | 0169 | 0007 | 737A | BA83 | 8204 | 0100 | 0031 | 837F |
| 0001113600 | 0085 | 8583 | 8300 | 0086 | BF83 | 8304 | 039F | AD83 |
| 0001113620 | 8303 | 0081 | 8183 | 8300 | 0085 | 8183 | 8300 | 022E |
| 0001113640 | 2E83 | 8302 | 02BE | 8183 | 8300 | 00E4 | E483 | 0100 |
| 0001113660 | 00D8 | 827F | 7504 | 6573 | 0064 | 0982 | 6361 | 6563 |
| 0001113700 | 7373 | 6F5F | 0270 | 0682 | 7374 | 5F74 | 6469 | 8204 |
| 0001113720 | 7407 | 7473 | 705F | 7274 | 8208 | 6907 | 676D | 685F |
| 0001113740 | 7264 | 820C | 690B | 676D | 625F | 6675 | 705F | 7274 |
| 0001113760 | C085 | 8200 | 610B | 6363 | 7365 | 5F73 | 6F6D | 6564 |
| 0001114000 | C485 | 8200 | 630B | 6572 | 7461 | 5F65 | 6F6D | 6564 |
| 0001114020 | C685 | 8200 | 620A | 6361 | 676B | 6F72 | 6E75 | 8564 |
| 0001114040 | 00C8 | 0882 | 6F63 | 706D | 6572 | 7373 | CA85 | 8200 |
| 0001114060 | 6F07 | 6570 | 5F6E | 7066 | CC85 | 8200 | 7407 | 6D65 |
| 0001114100 | 5F70 | 7066 | D085 | 8200 | 740E | 6D65 | 5F70 | 6966 |
| 0001114120 | 656C | 6E5F | 6D61 | 8565 | 00D4 | 0D82 | 6162 | 6B63 |
| 0001114140 | 7267 | 756F | 646E | 735F | 8574 | 00F4 | 0982 | 616C |
| 0001114160 | 6579 | 5F72 | 7470 | 8572 | 00F6 | 0B82 | 7773 | 7061 |
| 0001114200 | 625F | 6675 | 6566 | 8572 | 00FA | 0101 | 8000 | 1601 |
| 0001114220 | 7900 | 0340 | C583 | 8304 | 04C6 | 0A82 | 7528 | 746E |
| 0001114240 | 6761 | 6567 | 2964 | 0169 | 0007 | 737A | BE83 | 8204 |
| 0001114260 | 0100 | 000A | 837F | 0085 | 8583 | 8300 | 04C4 | 1F01 |
| 0001114300 | 7F00 | 0782 | 6D69 | 5F67 | 6E63 | 0074 | 0782 | 616D |
| 0001114320 | 5F78 | 6E63 | 0274 | 0782 | 6D69 | 5F67 | 736C | 0474 |
| 0001114340 | 0101 | 8000 | 1601 | 7900 | 0350 | C983 | 8304 | 04CA |
| 0001114360 | 0A82 | 7528 | 746E | 6761 | 6567 | 2964 | 0169 | 000A |
| 0001114400 | 837F | 0086 | 8583 | 8300 | 0467 | 2301 | 7F00 | 0682 |
| 0001114420 | 626F | 5F6A | 6469 | 8200 | 6C0A | 616F | 5F64 | 6F63 |
| 0001114440 | 6E75 | 0474 | 0982 | 6174 | 6C62 | 5F65 | 7470 | 0672 |
| 0001114460 | 1601 | 7900 | 0230 | CD83 | 8304 | 04CE | 0A82 | 7528 |
| 0001114500 | 746E | 6761 | 6567 | 2964 | 0169 | 0007 | 737A | C883 |
| 0001114520 | 8204 | 0100 | 0007 | 837F | 04CC | 8583 | 0100 | 0025 |
| 0001114540 | 827F | 730E | 6D79 | 6F62 | 5F6C | 6274 | 5F6C | 736C |
| 0001114560 | 0074 | 1082 | 6174 | 6C62 | 7365 | 615F | 6C6C | 636F |
| 0001114600 | 7461 | 6465 | 0104 | 0016 | 4079 | 8302 | 04D0 | D183 |
| 0001114620 | 8204 | 280A | 6E75 | 6174 | 6767 | 6465 | 6929 | 0701 |
| 0001114640 | 7F00 | 8683 | 8300 | 04BF | 1401 | 7F00 | 0682 | 7374 |
| 0001114660 | 5F74 | 6469 | 8200 | 7407 | 7473 | 705F | 7274 | 0104 |
| 0001114700 | 0001 | 0180 | C018 | 8579 | 16B0 | 830D | 04D5 | D683 |
| 0001114720 | 8204 | 280A | 6E75 | 6174 | 6767 | 6465 | 6929 | 0501 |
| 0001114740 | 7800 | 8340 | 04CF | 2801 | 7F00 | 8583 | 8300 | 0081 |
| 0001114760 | 9F83 | 8304 | 04A3 | C383 | 8304 | 04AA | AA83 | 8304 |
| 0001115000 | 04A6 | CB83 | 8304 | 042F | 8583 | 8300 | 0085 | D483 |
| 0001115020 | 0104 | 00A3 | 827F | 730A | 7365 | 6973 | 6E6F | 6F5F |
| 0001115040 | 006E | 0582 | 7564 | 6D6D | 0279 | 0682 | 6C63 | 6569 |
| 0001115060 | 746E | 8204 | 7405 | 6572 | 7365 | 8248 | 6F08 | 6570 |
| 0001115100 | 5F6E | 6D69 | 5467 | 0882 | 6C66 | 7274 | 6C5F | 6269 |
| 0001115120 | 825C | 6908 | 6F63 | 5F6E | 696C | 8562 | 010A | 0682 |

```
THU MAR 14 17:31:54 1991  DB_PI.DLL  PAGE 305, LINE 17937

0001115140  7073  685F  7264  B885  8201  630A  6E6F  6966
0001115160  5F67  736C  8574  01C4  0A82  6264  705F  5F69
0001115200  6170  6874  CA85  8201  6D0E  7861  745F  7365
0001115220  5F74  6F63  6E75  8574  02CA  0A82  6574  7473
0001115240  635F  756F  746E  CC85  8202  7409  7365  5F74
0001115260  696C  7473  CE85  0102  0001  0180  0001  0180
0001115300  0001  0180  0001  0180  0001  0180  0007  737A
0001115320  D383  8204  0100  0001  0180  0001  0180  0001
0001115340  0180  0001  0180  0001  0180  0001  0180  0001
*
0001115700  0180  0001  0180  0001  0180  0001  0180  000A
0001115720  8075  8183  6400  8301  051C  0401  7F00  BF83
0001115740  0104  0001  0180  0001  0180  0001  0180  0001
0001115760  0180  0001  0180  0001  0180  0001  0180  0001
*
0001116340  0180  0010  837F  00C0  C683  8300  0353  8183
0001116360  8300  0081  0A01  7500  8380  0081  0573  5D83
0001116400  0105  0001  0180  0001  0180  0005  3878  8083
0001116420  0100  0007  737A  6383  8205  0100  000A  8075
0001116440  8183  6400  8300  0201  0501  7800  8360  0082
0001116460  0501  7800  8318  0080  0501  7800  8310  0080
0001116500  0701  7F00  8683  8300  0085  0A01  7500  8380
0001116520  0081  0273  6783  0105  0001  0180  0005  7078
0001116540  8083  0100  000A  8075  8183  6400  8300  0201
0001116560  0701  7F00  8683  8300  0353  0A01  7500  8380
0001116600  0081  0273  6C83  0105  000A  837F  0086  8183
0001116620  8300  0081  0A01  7500  8380  0081  0373  6E83
0001116640  0105  0001  0180  0007  837F  0086  8183  0100
0001116660  000A  8075  8183  7300  8302  0571  0401  7F00
0001116700  BF83  0104  000A  8075  8183  6400  8301  0573
0001116720  0701  7F00  8683  8300  0081  0A01  7500  8380
0001116740  0081  0273  7583  0105  0004  837F  0086  0A01
0001116760  7500  8380  0081  0173  7783  0105  000A  8075
0001117000  8183  6400  8300  0201  0101  8000  1601  7900
0001117020  0330  0383  8302  0204  0A82  7528  746E  6761
0001117040  6567  2964  0169  000A  837F  0081  8183  8300
0001117060  0081  1C01  7F00  0682  6170  6B63  685F  8200
0001117100  6606  6C69  5F65  0268  0682  7566  636E  685F
0001117120  0104  0007  737A  C083  8200  0100  0001  0180
0001117140  0001  0180  0001  0180  0001  0180  0001  0180
*
0001117340  0001  0180  0005  5878  8083  0100  0005  2878
0001117360  8083  0100  0007  737A  2B83  8202  0100  000A
0001117400  8075  8183  6400  8300  0201  0101  8000  0101
0001117420  8000  0101  8000  0101  8000  0101  8000  0101
*
0001120160  8000  1201  7900  0560  8783  8302  0288  0682
0001120200  695F  626F  6675  0169  0010  837F  00C0  8183
0001120220  8300  00C0  8083  8300  0080  2701  7F00  0482
0001120240  705F  7274  8200  5F04  6E63  0474  0582  625F
0001120260  7361  0665  0582  665F  616C  0A67  0582  665F
0001120300  6C69  0B65  0101  8000  0701  7A00  8373  0286
0001120320  0082  0101  8000  0101  8000  0101  8000  0101
0001120340  8000  0101  8000  0101  8000  0101  8000  0101
*
0001121440  8000  0101  8000  0501  7800  8368  0080  0101
0001121460  8000  0101  8000  0101  8000  0101  8000  0701
0001121500  7800  0085  8301  0080  0101  8000  0101  8000
0001121520  0101  8000  0101  8000  0101  8000  0101  8000
```

THU MAR 14 17:31:54 1991 DB_PI.DLL PAGE 306, LINE 17996

```
*
0001122420  0101  8000  0101  8000  1601  7900  0220  9B83
0001122440  8303  039C  0A82  7528  746E  6761  6567  2964
0001122460  0169  0007  837F  0081  8183  0100  0009  827F
0001122500  7801  8200  7901  0102  0001  0180  0001  0180
0001122520  0001  0180  0001  0180  0001  0180  0001  0180
*
0001122640  0001  0180  0001  0180  0001  0180  0016  2079
0001122660  8301  03B7  B883  8203  280A  6E75  6174  6767
0001122700  6465  6929  0401  7F00  8683  0100  0009  827F
0001122720  6405  6D75  796D  0100  0001  0180  0001  0180
0001122740  0001  0180  0001  0180  0001  0180  0001  0180
*
0001123100  0007  737A  C083  8200  0100  0001  0180  0001
0001123120  0180  0001  0180  0001  0180  0001  0180  0001
*
0001123420  0180  0001  0180  0018  8579  0110  8302  0408
0001123440  0983  8204  280A  6E75  6174  6767  6465  6929
0001123460  0701  7F00  2583  8303  0081  0F01  7F00  0482
0001123500  616E  656D  8200  7404  7079  2065  1801  7900
0001123520  3085  0D09  0D83  8304  040E  0A82  7528  746E
0001123540  6761  6567  2964  0169  0007  8578  0320  8083
0001123560  0100  0007  737A  0783  8204  0100  0028  837F
0001123600  0325  8183  8300  0325  8283  8300  040B  0B83
0001123620  8304  00C0  C083  8300  00C0  C083  8300  0081
0001123640  8583  8300  040C  A101  7F00  0482  616E  656D
0001123660  8200  7404  7079  2065  0682  7561  6874  726F
0001123700  8222  6404  7461  4265  0882  7566  636E  6974
0001123720  6E6F  8246  7308  6570  5F63  6572  8566  00AA
0001123740  0B82  6564  6373  6972  7470  6F69  856E  010E
0001123760  0782  6F63  6D6D  6E65  8574  0112  1082  6C66
0001124000  7274  735F  6165  6372  5F68  6170  6874  1685
0001124020  8201  740E  5F63  6573  7261  6863  705F  7461
0001124040  8568  011A  0582  7564  6D6D  8579  011E  0982
0001124060  6170  6172  5F6D  6E63  8574  0120  0982  6170
0001124100  6172  5F6D  736C  8574  0122  0101  8000  0101
0001124120  8000  0101  8000  0101  8000  0101  8000  0701
0001124140  7A00  8373  0415  0082  0701  7A00  8373  040A
0001124160  0082  0101  8000  0101  8000  0101  8000  0101
0001124200  8000  0101  8000  0101  8000  0101  8000  0101
0001124220  8000  1601  7900  0330  1F83  8304  0420  0A82
0001124240  7528  746E  6761  6567  2964  0169  000A  837F
0001124260  0085  8583  8300  0085  1A01  7F00  0582  6977
0001124300  7464  0068  0682  6568  6769  7468  8202  6405
0001124320  7065  6874  0104  0018  8579  0140  8308  0423
0001124340  2483  8204  280A  6E75  6174  6767  6465  6929
0001124360  0701  7800  8085  8300  0084  1901  7F00  8183
0001124400  8300  041E  8583  8300  0085  C483  8300  0082
0001124420  E483  8300  0422  5A01  7F00  0682  6572  7270
0001124440  7365  8200  6406  6D69  6E65  0273  1082  6164
0001124460  6174  6C5F  7961  7265  645F  7065  6874  8208
0001124500  7308  6769  735F  7A69  0A65  0782  6973  5F67
0001124520  7470  0C72  0982  7462  706D  735F  7A69  1065
0001124540  0882  7462  706D  705F  7274  8214  7305  6170
0001124560  6572  0118  0001  0180  0018  8579  05A0  830C
0001124600  0428  2983  8204  280A  6E75  6174  6767  6465
0001124620  6929  0701  7800  8085  8301  0084  2501  7F00
0001124640  8683  8300  0325  2583  8303  0086  8183  8300
0001124660  0085  8683  8300  0082  8683  8300  039A  2183
```

THU MAR 14 17:31:54 1991 DB_PI.DLL PAGE 307, LINE 18055

```
0001124700  8304  0427  7E01  7F00  0282  6469  8200  6E04
0001124720  6D61  0465  0982  6966  656C  6E5F  6D61  2465
0001124740  0982  7865  5F70  6374  695F  4464  0482  7974
0001124760  6570  8248  720C  6665  6C5F  6E69  5F65  756E
0001125000  4A6D  0982  6572  5F66  6374  695F  4C64  0A82
0001125020  6974  656D  735F  6174  706D  8250  6106  696F
0001125040  695F  5464  0882  6F6C  6163  6974  6E6F  8258
0001125060  6209  6D74  5F70  6E69  6F66  825C  7305  6170
0001125100  6572  8485  0100  0001  0180  0001  0180  0001
0001125120  0180  0001  0180  0001  0180  0001  0180  0001
0001125140  0180  0001  0180  0001  0180  0001  0180  0001
0001125160  737A  2683  8204  0100  0001  0180  0180  0007
0001125200  0001  0180  0001  0180  0001  0180  0001  0180
*
0001126100  0001  0180  0001  0180  0001  0180  0018  8579
0001126120  0550  8306  04AC  AD83  8204  280A  6E75  6174
0001126140  6767  6465  6929  0701  7800  0085  8304  0080
0001126160  1301  7F00  AB83  8304  0081  8583  8300  0085
0001126200  8683  8300  0325  5301  7F00  0782  6F70  5F73
0001126220  6C62  006B  0E82  7462  7672  6F5F  6570  5F6E
0001126240  6F6D  6564  8085  8200  6608  7869  735F  7A69
0001126260  8565  0082  0982  656B  5F79  7369  695F  8564
0001126300  0084  0782  616C  7473  695F  8564  0086  0982
0001126320  6966  656C  6E5F  6D61  8565  008A  0101  8000
0001126340  1801  7900  0085  0713  B183  8304  04B2  0A82
0001126360  7528  746E  6761  6567  2964  0169  0007  8578
0001126400  0800  8083  0100  0016  837F  0086  B083  8304
0001126420  04AA  AA83  8304  0086  8583  8300  0081  5201
0001126440  7F00  0582  7264  7669  0065  0782  616D  5F70
0001126460  6964  0472  0B82  626F  5F6A  6274  5F6C  6468
0001126500  856C  0104  0B82  6572  5F6C  6274  5F6C  6468
0001126520  856C  01AE  0582  6677  695F  8564  0258  0682
0001126540  6F6C  6B63  6465  5C85  8202  6405  6D75  796D
0001126560  5E85  0102  0018  8579  0130  8303  04B4  B583
0001126600  8204  280A  6E75  6174  6767  6465  6929  0A01
0001126620  7F00  2583  8303  00C0  8583  0100  0015  827F
0001126640  6B03  7965  8200  6904  6574  206D  0482  6973
0001126660  657A  0124  0016  4079  8303  04B8  B983  8204
0001126700  280A  6E75  6174  6767  6465  6929  0701  7A00
0001126720  8373  04B3  0082  0A01  7F00  8583  8300  0085
0001126740  B783  0104  001C  827F  6109  6C6C  636F  7461
0001126760  6465  8200  7504  6573  0264  0582  6E65  7274
0001127000  0479  1601  7900  0340  BC83  8304  04BD  0A82
0001127020  7528  746E  6761  6567  2964  0169  0007  737A
0001127040  B683  8204  0100  000A  837F  0085  BB83  8304
0001127060  0085  2301  7F00  0482  6973  657A  8200  6206
0001127100  6375  656B  0274  0F82  7562  6B63  7465  695F
0001127120  636E  735F  7A69  0665  0101  8000  0101  8000
0001127140  0101  8000  0101  8000  0101  8000  0101  8000
*
0001127400  0701  7A00  8373  04BA  0082  0101  8000  0101
0001127420  8000  0101  8000  0101  8000  0101  8000  0101
*
0001127520  8000  0701  7A00  8373  04AF  0082  0101  8000
0001127540  0101  8000  0101  8000  0101  8000  0101  8000
*
0001127740  0101  8000  0101  8000  0101  8000  1801  7900
0001127760  2085  0402  2183  8305  0522  0A82  7528  746E
0001130000  6761  6567  2964  0169  000D  837F  0325  2583
```

THU MAR 14 17:31:54 1991 DB_PI.DLL PAGE 308, LINE 18114

| | | | | | | | | |
|---|---|---|---|---|---|---|---|---|
| 0001130020 | 8303 | 0081 | 8183 | 0100 | 0031 | 827F | 7509 | 6573 |
| 0001130040 | 5F72 | 616E | 656D | 8200 | 610B | 7070 | 696C | 5F63 |
| 0001130060 | 616E | 656D | 8220 | 610B | 7070 | 696C | 5F63 | 7974 |
| 0001130100 | 6570 | 8240 | 6405 | 6D75 | 796D | 0142 | 0001 | 0180 |
| 0001130120 | 0016 | 6079 | 8304 | 0525 | 2683 | 8205 | 280A | 6E75 |
| 0001130140 | 6174 | 6767 | 6465 | 6929 | 0D01 | 7F00 | 8683 | 8300 |
| 0001130160 | 0085 | 8583 | 8300 | 04FB | 3501 | 7F00 | 0D82 | 6F77 |
| 0001130200 | 6B72 | 6E69 | 5F67 | 7264 | 7669 | 0065 | 0982 | 616D |
| 0001130220 | 5F78 | 6F63 | 6E75 | 0474 | 0A82 | 7274 | 6565 | 635F |
| 0001130240 | 756F | 746E | 8206 | 7408 | 6572 | 5F65 | 736C | 0874 |
| 0001130260 | 1601 | 7900 | 0460 | 2883 | 8305 | 0529 | 0A82 | 7528 |
| 0001130300 | 746E | 6761 | 6567 | 2964 | 0169 | 000D | 837F | 0085 |
| 0001130320 | 0583 | 8302 | 0085 | C683 | 0100 | 0026 | 827F | 7008 |
| 0001130340 | 7461 | 5F68 | 6E63 | 0074 | 0882 | 6170 | 6874 | 6C5F |
| 0001130360 | 7473 | 8202 | 6303 | 746E | 8206 | 6906 | 5F64 | 736C |
| 0001130400 | 0874 | 0101 | 8000 | 1801 | 7900 | 7085 | 0205 | 2C83 |
| 0001130420 | 8305 | 052D | 0A82 | 7528 | 746E | 6761 | 6567 | 2964 |
| 0001130440 | 0169 | 0007 | 837F | 04AA | C083 | 0100 | 0022 | 827F |
| 0001130460 | 6C07 | 6269 | 745F | 6C62 | 8200 | 6C12 | 6269 | 665F |
| 0001130500 | 6C6F | 6564 | 5F72 | 6F6C | 6E67 | 6D61 | 8565 | 00AA |
| 0001130520 | 0101 | 8000 | 1801 | 7900 | 2085 | 0301 | 3083 | 8305 |
| 0001130540 | 0531 | 0A82 | 7528 | 746E | 6761 | 6567 | 2964 | 0169 |
| 0001130560 | 000A | 837F | 0085 | 8183 | 8300 | 0325 | 2001 | 7F00 |
| 0001130600 | 0882 | 6361 | 6563 | 7373 | 6465 | 8200 | 6405 | 6D75 |
| 0001130620 | 796D | 8202 | 6609 | 6C69 | 5F65 | 616E | 656D | 0104 |
| 0001130640 | 0018 | 8579 | 0800 | 8301 | 0533 | 3483 | 8205 | 280A |
| 0001130660 | 6E75 | 6174 | 6767 | 6465 | 6929 | 0401 | 7F00 | B083 |
| 0001130700 | 0104 | 000C | 827F | 6408 | 7269 | 6E5F | 6D61 | 0065 |
| 0001130720 | 1801 | 7900 | 1085 | 084A | 3883 | 8305 | 0539 | 0A82 |
| 0001130740 | 7528 | 746E | 6761 | 6567 | 2964 | 0169 | 0007 | 8578 |
| 0001130760 | 0FF0 | AA83 | 0104 | 0007 | 8578 | 1800 | 3283 | 0105 |
| 0001131000 | 0019 | 837F | 052F | 2F83 | 8305 | 0536 | 3783 | 8305 |
| 0001131020 | 04AA | AA83 | 8304 | 04AA | 3683 | 0105 | 0053 | 827F |
| 0001131040 | 740A | 7473 | 735F | 7263 | 7069 | 0074 | 0A82 | 7374 |
| 0001131060 | 5F74 | 6568 | 6461 | 7265 | 8224 | 6903 | 676D | 8248 |
| 0001131100 | 6907 | 676D | 645F | 7269 | 4685 | 8202 | 6604 | 746C |
| 0001131120 | 8572 | 0546 | 0382 | 6F61 | 8569 | 05F0 | 0482 | 7865 |
| 0001131140 | 6365 | 9A85 | 8206 | 6707 | 6E65 | 7265 | 6369 | 4485 |
| 0001131160 | 0107 | 0001 | 0180 | 0018 | 8579 | 53B0 | 830B | 053C |
| 0001131200 | 3D83 | 8205 | 280A | 6E75 | 6174 | 6767 | 6465 | 6929 |
| 0001131220 | 2201 | 7F00 | 8683 | 8300 | 0325 | 8183 | 8300 | 0081 |
| 0001131240 | B683 | 8303 | 0085 | 8183 | 8300 | 0085 | 8183 | 8300 |
| 0001131260 | 04B0 | 3583 | 0105 | 006F | 827F | 6902 | 0064 | 0482 |
| 0001131300 | 616E | 656D | 8204 | 610B | 6363 | 7365 | 5F73 | 6F6D |
| 0001131320 | 6564 | 8224 | 6C0A | 636F | 5F6B | 6373 | 706F | 2665 |
| 0001131340 | 0A82 | 6873 | 7261 | 5F65 | 6E69 | 6F66 | 8228 | 6F08 |
| 0001131360 | 6570 | 5F6E | 6E63 | 2C74 | 0582 | 7073 | 7261 | 2E65 |
| 0001131400 | 0882 | 6F6C | 6B63 | 685F | 6C64 | 8230 | 7306 | 6170 |
| 0001131420 | 6572 | 3231 | 0882 | 6964 | 5F72 | 6170 | 6874 | 8234 |
| 0001131440 | 7303 | 6264 | 3485 | 0101 | 0001 | 0180 | 0018 | 8579 |
| 0001131460 | 07F0 | 8310 | 0541 | 4283 | 8205 | 280A | 6E75 | 6174 |
| 0001131500 | 6767 | 6465 | 6929 | 0701 | 7A00 | 8373 | 053B | 0082 |
| 0001131520 | 3101 | 7F00 | 8583 | 8300 | 0085 | 8683 | 8300 | 0540 |
| 0001131540 | 2683 | 8304 | 0434 | 8183 | 8300 | 0081 | 8583 | 8300 |
| 0001131560 | 0081 | 8A83 | 8302 | 028A | 2583 | 8303 | 0081 | E483 |
| 0001131600 | 8300 | 00E4 | D801 | 7F00 | 0482 | 7375 | 6465 | 8200 |
| 0001131620 | 6109 | 6363 | 7365 | 5F73 | 706F | 8202 | 7406 | 7473 |
| 0001131640 | 695F | 0464 | 0782 | 7374 | 5F74 | 7470 | 0872 | 0782 |
| 0001131660 | 6D69 | 5F67 | 6468 | 0C72 | 0B82 | 6D69 | 5F67 | 7562 |

THU MAR 14 17:31:54 1991 DB_PI.DLL PAGE 309, LINE 18173

```
0001131700  5F66  7470  8572  00C0  0B82  6361  6563  7373
0001131720  6D5F  646F  8565  00C4  0B82  7263  6165  6574
0001131740  6D5F  646F  8565  00C6  0A82  6162  6B63  7267
0001131760  756F  646E  C885  8200  6308  6D6F  7270  7365
0001132000  8573  00CA  0782  706F  6E65  665F  8570  00CC
0001132020  0782  6574  706D  665F  8570  00D0  0E82  6574
0001132040  706D  665F  6C69  5F65  616E  656D  D485  8200
0001132060  620D  6361  676B  6F72  6E75  5F64  7473  F485
0001132100  8200  6C09  7961  7265  705F  7274  F685  8200
0001132120  730B  6177  5F70  7562  6666  7265  FA85  0100
0001132140  0001  0180  0016  4079  8303  0546  4783  8205
0001132160  280A  6E75  6174  6767  6465  6929  0701  7A00
0001132200  8373  053F  0082  0A01  7F00  8583  8300  0085
0001132220  4583  0105  001F  827F  6907  676D  635F  746E
0001132240  8200  6D07  7861  635F  746E  8202  6907  676D
0001132260  6C5F  7473  0104  0001  0180  0016  5079  8303
0001132300  054A  4B83  8205  280A  6E75  6174  6767  6465
0001132320  6929  0A01  7F00  8683  8300  0085  E883  0104
0001132340  0023  827F  6F06  6A62  695F  0064  0A82  6F6C
0001132360  6461  635F  756F  746E  8204  7409  6261  656C
0001132400  705F  7274  0106  0016  3079  8302  054E  4F83
0001132420  8205  280A  6E75  6174  6767  6465  6929  0701
0001132440  7A00  8373  0549  0082  0701  7F00  4D83  8305
0001132460  0085  2501  7F00  0E82  7973  626D  6C6F  745F
0001132500  6C62  6C5F  7473  8200  7410  6261  656C  5F73
0001132520  6C61  6F6C  6163  6574  0464  1601  7900  0240
0001132540  5183  8305  0552  0A82  7528  746E  6761  6567
0001132560  2964  0169  0007  837F  0086  4083  0105  0014
0001132600  827F  7406  7473  695F  0064  0782  7374  5F74
0001132620  7470  0472  0101  8000  1801  7900  B085  0D16
0001132640  5683  8305  0557  0A82  7528  746E  6761  6567
0001132660  2964  0169  0005  4078  5083  0105  0028  837F
0001132700  0085  8183  8300  0520  2483  8305  0544  2B83
0001132720  8305  052B  2783  8305  054C  B083  8304  0085
0001132740  8583  8300  0555  A301  7F00  0A82  6573  7373
0001132760  6F69  5F6E  6E6F  8200  6405  6D75  796D  8202
0001133000  6306  696C  6E65  0474  0582  7274  6565  4873
0001133020  0882  706F  6E65  695F  676D  8254  6608  746C
0001133040  5F72  696C  5C62  0882  6369  6E6F  6C5F  6269
0001133060  0A85  8201  7306  5F70  6468  8572  01B8  0A82
0001133100  6F63  666E  6769  6C5F  7473  C485  8201  640A
0001133120  5F62  6970  705F  7461  8568  01CA  0E82  616D
0001133140  5F78  6574  7473  635F  756F  746E  CA85  8202
0001133160  740A  7365  5F74  6F63  6E75  8574  02CC  0982
0001133200  6574  7473  6C5F  7369  8574  02CE  0101  8000
0001133220  0101  8000  0101  8000  0101  8000  0101  8000
0001133240  0701  7A00  8373  0554  0082  0101  8000  0101
0001133260  8000  0101  8000  0101  8000  0101  8000  0101
*
0001134300  8000  0101  8000  0101  8000  0A01  7500  8380
0001134320  0081  0564  E783  0105  0010  837F  0415  C083
0001134340  8300  00C0  8583  8300  0085  0A01  7500  8380
0001134360  0081  0464  E983  0105  000D  837F  0415  C083
0001134400  8300  03D3  C583  0100  000A  837F  0086  8183
0001134420  8300  0205  0A01  7500  8380  0081  0373  EA83
0001134440  0105  0001  0180  0001  0180  0007  8578  00A8
0001134460  8083  0100  0005  3878  8083  0100  0005  6078
0001134500  8283  0100  0005  1878  8083  0100  0005  1078
0001134520  8083  0100  0007  837F  0086  C083  0100  000A
```

THU MAR 14 17:31:54 1991 DB_PI.DLL PAGE 310, LINE 18232

```
0001134540  8075  8183  7300  8302  05F3  0101  8000  0701
0001134560  7800  B085  8300  0080  0A01  7F00  8A83  8302
0001134600  00C0  C083  0100  000A  8075  8183  6400  8303
0001134620  05F7  0501  7800  8320  0080  0A01  7F00  8A83
0001134640  8302  00C0  0583  0102  000A  8075  8183  6400
0001134660  8303  05FA  0701  7F00  C083  8300  0415  0A01
0001134700  7500  8380  0081  0264  FC83  0105  0005  6078
0001134720  8083  0100  0007  837F  028A  1583  0104  000A
0001134740  8075  8183  6400  8302  05FF  0501  7800  8370
0001134760  0080  0701  7800  9085  8300  0080  0701  7F00
0001135000  8A83  8302  0415  0A01  7500  8380  0081  0264
0001135020  0383  0106  0007  8578  00D0  8083  0100  0005
0001135040  4078  8083  0100  0005  5078  8083  0100  0005
0001135060  6878  8083  0100  0005  0878  8083  0100  0005
0001135100  7878  8083  0100  0007  837F  0086  1483  0104
0001135120  000A  8075  8183  7300  8302  060B  0701  7800
0001135140  9085  8300  0080  1001  7F00  1583  8304  00C0
0001135160  C083  8300  0085  8583  0100  000A  8075  8183
0001135200  6400  8305  060E  0501  7800  8348  0080  0D01
0001135220  7F00  1583  8304  00C0  D383  8303  00C5  0A01
0001135240  7500  8380  0081  0464  1183  0106  0004  837F
0001135260  0415  0A01  7500  8380  0200  0173  1383  0106
0001135300  0001  0180  0007  8578  0080  8083  0100  0007
0001135320  837F  0086  1583  0104  000A  8075  8183  7300
0001135340  8302  0617  0701  7F00  8583  8300  0205  0A01
0001135360  7500  8380  0081  0273  1983  0106  0005  5078
0001135400  8083  0100  0007  837F  00C0  C683  0100  000A
0001135420  8075  8183  7300  8302  061C  0101  8000  0101
0001135440  8000  1601  7900  0330  0383  8302  0204  0A82
0001135460  7528  746E  6761  6567  2964  0169  000A  837F
0001135500  0081  8183  8300  0081  1C01  7F00  0682  6170
0001135520  6B63  685F  8200  6606  6C69  5F65  0268  0682
0001135540  7566  636E  685F  0104  0001  0180  0001  0180
0001135560  0001  0180  0001  0180  0001  0180  0001  0180
*
0001135760  0001  0180  0005  4878  8083  0100  0005  2878
0001136000  8083  0100  0001  0180  0001  0180  0001  0180
0001136020  0001  0180  0001  0180  0001  0180  0001  0180
*
0001136360  0001  0180  0007  737A  6783  8202  0100  000A
0001136400  8075  8183  6400  8300  0201  0101  8000  0101
0001136420  8000  0101  8000  0101  8000  0101  8000  0101
*
0001140000  8000  0101  8000  0501  7800  8368  0080  0101
0001140020  8000  0101  8000  0101  8000  0101  8000  0701
0001140040  7800  0085  8301  0080  0101  8000  0101  8000
0001140060  0101  8000  0101  8000  0101  8000  0101  8000
*
0001140340  0501  7800  8360  0080  0101  8000  0101  8000
0001140360  0101  8000  0101  8000  0101  8000  0101  8000
*
0001141140  0101  8000  0101  8000  0101  8000  1601  7900
0001141160  0120  BE83  8303  03BF  0A82  7528  746E  6761
0001141200  6567  2964  0169  0004  837F  0086  0901  7F00
0001141220  0582  7564  6D6D  0079  0101  8000  0101  8000
0001141240  0101  8000  0101  8000  0101  8000  0101  8000
*
0001142420  0701  7A00  8373  00C6  0082  0101  8000  0101
0001142440  8000  1801  7900  4085  0301  6383  8304  0464
```

```
THU MAR 14 17:31:54 1991  DB_PI.DLL  PAGE 311, LINE 18291

0001142460   0A82   7528   746E   6761   6567   2964   0169   0007
0001142500   8578   0110   8483   0100   000A   837F   0086   8583
0001142520   8300   0462   1501   7F00   0282   6469   8200   7304
0001142540   7A69   0465   0582   7073   7261   0665   0101   8000
0001142560   0701   7A00   8373   0461   0082   0101   8000   0101
0001142600   8000   0101   8000   0101   8000   0101   8000   0101
0001142620   8000   0701   7A00   8373   0466   0082   0101   8000
0001142640   0101   8000   0101   8000   0101   8000   0101   8000
0001142660   1801   7900   5085   0605   7583   8304   0476   0A82
0001142700   7528   746E   6761   6567   2964   0169   0007   8578
0001142720   0400   8083   0100   0013   837F   0474   8183   8300
0001142740   0085   8583   8300   0086   2C83   0103   0053   827F
0001142760   7007   736F   625F   6B6C   8200   620E   7274   5F76
0001143000   706F   6E65   6D5F   646F   8565   0080   0882   6966
0001143020   5F78   6973   657A   8285   8200   6B09   7965   695F
0001143040   5F73   6469   8485   8200   6C07   7361   5F74   6469
0001143060   8685   8200   6609   6C69   5F65   616E   656D   8A85
0001143100   0100   0001   0180   0001   0180   0007   8578   0800
0001143120   8083   0100   0001   0180   0001   0180   0001   0180
0001143140   0001   0180   0001   0180   0001   0180   0001   0180
*
0001143660   0001   0180   0001   0180   0001   0180   0018   8579
0001143700   0120   8303   04D5   D683   8204   280A   6E75   6174
0001143720   6767   6465   6929   0A01   7F00   8583   8300   0081
0001143740   2C83   0103   0020   827F   6108   6363   7365   6573
0001143760   0064   0582   7564   6D6D   0279   0982   6966   656C
0001144000   6E5F   6D61   0465   1801   7900   0085   0108   D883
0001144020   8304   04D9   0A82   7528   746E   6761   6567   2964
0001144040   0169   0004   837F   0479   0C01   7F00   0882   6964
0001144060   5F72   616E   656D   0100   0018   8579   4A10   8308
0001144100   04DD   DE83   8204   280A   6E75   6174   6767   6465
0001144120   6929   0701   7800   F085   830F   0473   0701   7800
0001144140   0085   8318   04D7   1901   7F00   D483   8304   04D4
0001144160   DB83   8304   04DC   7383   8304   0473   7383   8304
0001144200   04DB   5301   7F00   0A82   7374   5F74   6373   6972
0001144220   7470   8200   740A   7473   685F   6165   6564   2472
0001144240   0382   6D69   4867   0782   6D69   5F67   6964   8572
0001144260   0246   0482   6C66   7274   4685   8205   6103   696F
0001144300   F085   8205   6504   6578   8563   069A   0782   6567
0001144320   656E   6972   8563   0744   0101   8000   1801   7900
0001144340   B085   0B53   E183   8304   04E2   0A82   7528   746E
0001144360   6761   6567   2964   0169   0022   837F   0086   2C83
0001144400   8303   0081   8183   8300   03BD   8583   8300   0081
0001144420   8583   8300   0081   7983   8304   04DA   6F01   7F00
0001144440   0282   6469   8200   6E04   6D61   0465   0B82   6361
0001144460   6563   7373   6D5F   646F   2465   0A82   6F6C   6B63
0001144500   735F   6F63   6570   8226   730A   6168   6572   695F
0001144520   666E   286F   0882   706F   6E65   635F   746E   822C
0001144540   7305   6170   6572   822E   6C08   636F   5F6B   6468
0001144560   306C   0682   7073   7261   3165   8232   6408   7269
0001144600   705F   7461   3468   0382   6473   8562   0134   0101
0001144620   8000   0101   8000   0701   7A00   8373   04E0   0082
0001144640   0101   8000   0101   8000   0101   8000   0101   8000
*
0001146020   0A01   7F00   8683   8300   0081   6683   0104   000A
0001146040   8075   8183   7300   8303   0582   0101   8000   0101
0001146060   8000   0501   7800   8378   0080   0501   7800   8338
0001146100   0080   0501   7800   8360   0082   0A01   7F00   8683
0001146120   8300   0081   C683   0100   000A   8075   8183   7300
```

```
THU MAR 14 17:31:54 1991  DB_PI.DLL  PAGE 312, LINE 18350

0001146140  8303  0589  0101  8000  0701  7800  8085  8300
0001146160  0080  0701  7F00  8683  8300  0086  0A01  7500
0001146200  8380  0081  0273  8D83  0105  0007  837F  0086
0001146220  6683  0104  000A  8075  8183  7300  8302  058F
0001146240  0A01  7F00  8683  8300  0086  6D83  0104  000A
0001146260  8075  8183  7300  8303  0591  0101  8000  0D01
0001146300  7F00  8683  8300  0081  C583  8300  045E  0A01
0001146320  7500  8380  0081  0473  9483  0105  0001  0180
0001146340  0001  0180  0016  3079  8303  0203  0483  8202
0001146360  280A  6E75  6174  6767  6465  6929  0A01  7F00
0001146400  8183  8300  0081  8183  0100  001C  827F  7006
0001146420  6361  5F6B  0068  0682  6966  656C  685F  8202
0001146440  6606  6E75  5F63  0468  0101  8000  0101  8000
0001146460  0101  8000  0101  8000  0101  8000  0101  8000
*
0001146660  0101  8000  0501  7800  8348  0080  0501  7800
0001146700  8328  0080  0101  8000  0101  8000  0101  8000
0001146720  0101  8000  0101  8000  0101  8000  0101  8000
*
0001147260  0101  8000  0701  7A00  8373  0267  0082  0A01
0001147300  7500  8380  0081  0064  0183  0102  0001  0180
0001147320  0001  0180  0001  0180  0001  0180  0001  0180
*
0001151160  0001  0180  0001  0180  0005  6878  8083  0100
0001151200  0001  0180  0001  0180  0001  0180  0001  0180
0001151220  0007  8578  0100  8083  0100  0001  0180  0001
0001151240  0180  0001  0180  0001  0180  0001  0180  0001
*
0001151520  0180  0005  6078  8083  0100  0001  0180  0001
0001151540  0180  0001  0180  0001  0180  0001  0180  0001
*
0001152140  0180  0001  0180  0001  0180  0001  0180  0016
0001152160  2079  8302  03CE  CF83  8203  280A  6E75  6174
0001152200  6767  6465  6929  0701  7F00  8183  8300  0081
0001152220  0901  7F00  0182  0078  0182  0279  0101  8000
0001152240  0101  8000  0101  8000  0101  8000  0101  8000
*
0001152360  1801  7900  2085  0201  E683  8303  03E7  0A82
0001152400  7528  746E  6761  6567  2964  0169  0007  837F
0001152420  0086  5883  0103  0015  827F  6F06  6A62  695F
0001152440  0064  0882  626F  5F6A  616E  656D  0104  0001
0001152460  0180  0016  2079  8301  03EA  EB83  8203  280A
0001152500  6E75  6174  6767  6465  6929  0401  7F00  8683
0001152520  0100  0009  827F  6405  6D75  796D  0100  0001
0001152540  0180  0001  0180  0001  0180  0001  0180  0001
*
0001152720  0180  0016  3079  8303  040A  0B83  8204  280A
0001152740  6E75  6174  6767  6465  6929  0A01  7F00  8583
0001152760  8300  0085  8583  0100  001A  827F  7705  6469
0001153000  6874  8200  6806  6965  6867  0274  0582  6564
0001153020  7470  0468  1801  7900  4085  0801  0E83  8304
0001153040  040F  0A82  7528  746E  6761  6567  2964  0169
0001153060  0007  8578  0080  8483  0100  0019  837F  0081
0001153100  0983  8304  0085  8583  8300  00C4  8283  8300
0001153120  00E4  0D83  0104  005A  827F  7206  7065  6572
0001153140  0073  0682  6364  656D  736E  8202  6410  7461
0001153160  5F61  616C  6579  5F72  6564  7470  0868  0882
0001153200  6973  5F67  6973  657A  820A  7307  6769  705F
0001153220  7274  820C  6209  6D74  5F70  6973  657A  8210
```

THU MAR 14 17:31:54 1991 DB_PI.DLL PAGE 313, LINE 18409

```
0001153240  6208  6D74  5F70  7470  1472  0582  7073  7261
0001153260  1865  0101  8000  1801  7900  A085  0C05  1383
0001153300  8304  0414  0A82  7528  746E  6761  6567  2964
0001153320  0169  0007  8578  0180  8483  0100  0025  837F
0001153340  0086  5883  8303  0358  8683  8300  0081  8583
0001153360  8300  0086  8283  8300  0086  CD83  8303  040C
0001153400  1283  0104  007E  827F  6902  0064  0482  616E
0001153420  656D  8204  6609  6C69  5F65  616E  656D  8224
0001153440  6509  7078  745F  5F63  6469  8244  7404  7079
0001153460  4865  0C82  6572  5F66  696C  656E  6E5F  6D75
0001153500  824A  7209  6665  745F  5F63  6469  824C  740A
0001153520  6D69  5F65  7473  6D61  5070  0682  6F61  5F69
0001153540  6469  8254  6C08  636F  7461  6F69  586E  0982
0001153560  7462  706D  695F  666E  5C6F  0582  7073  7261
0001153600  8565  0084  0101  8000  0101  8000  0101  8000
0001153620  0101  8000  0101  8000  0101  8000  0101  8000
0001153640  0101  8000  0101  8000  0701  7A00  8373  041F
0001153660  0082  0701  7A00  8373  0411  0082  0101  8000
0001153700  0101  8000  0101  8000  0101  8000  0101  8000
*
0001153760  0101  8000  0701  7A00  8373  042F  0082  0701
0001154000  7A00  8373  03E5  0082  0101  8000  0101  8000
0001154020  0101  8000  0101  8000  0101  8000  0101  8000
*
0001154660  1801  7900  5085  0605  9C83  8304  049D  0A82
0001154700  7528  746E  6761  6567  2964  0169  0007  8578
0001154720  0400  8083  0100  0013  837F  049B  8183  8300
0001154740  0085  8583  8300  0086  5883  0103  0053  827F
0001154760  7007  736F  625F  6B6C  8200  620E  7274  5F76
0001155000  706F  6E65  6D5F  646F  8565  0080  0882  6966
0001155020  5F78  6973  657A  8285  8200  6B09  7965  695F
0001155040  5F73  6469  8485  8200  6C07  7361  5F74  6469
0001155060  8685  8200  6609  6C69  5F65  616E  656D  8A85
0001155100  0100  0001  0180  0001  0180  0007  8578  0800
0001155120  8083  0100  0001  0180  0001  0180  0001  0180
0001155140  0001  0180  0001  0180  0001  0180  0001  0180
*
0001155660  0001  0180  0001  0180  0001  0180  0018  8579
0001155700  0120  8303  04FC  FD83  8204  280A  6E75  6174
0001155720  6767  6465  6929  0A01  7F00  8583  8300  0081
0001155740  5883  0103  0020  827F  6108  6363  7365  6573
0001155760  0064  0582  7564  6D6D  0279  0982  6966  656C
0001156000  6E5F  6D61  0465  1801  7900  0085  0108  FF83
0001156020  8304  0500  0A82  7528  746E  6761  6567  2964
0001156040  0169  0004  837F  04A0  0C01  7F00  0882  6964
0001156060  5F72  616E  656D  0100  0018  8579  4A10  8308
0001156100  0504  0583  8205  280A  6E75  6174  6767  6465
0001156120  6929  0701  7800  F085  830F  049A  0701  7800
0001156140  0085  8318  04FE  1901  7F00  FB83  8304  04FB
0001156160  0283  8305  0503  9A83  8304  049A  9A83  8304
0001156200  0502  5301  7F00  0A82  7374  5F74  6373  6972
0001156220  7470  8200  740A  7473  685F  6165  6564  2472
0001156240  0382  6D69  4867  0782  6D69  5F67  6964  8572
0001156260  0246  0482  6C66  7274  4685  8205  6103  696F
0001156300  F085  8205  6504  6578  8563  069A  0782  6567
0001156320  656E  6972  8563  0744  0101  8000  1801  7900
0001156340  B085  0B53  0883  8305  0509  0A82  7528  746E
0001156360  6761  6567  2964  0169  0022  837F  0086  5883
0001156400  8303  0081  8183  8300  03E9  8583  8300  0081
```

```
THU MAR 14 17:31:54 1991  DB_PI.DLL  PAGE 314, LINE 18468

0001156420  8583  8300  0081  A083  8304  0501  6F01  7F00
0001156440  0282  6469  8200  6E04  6D61  0465  0B82  6361
0001156460  6563  7373  6D5F  646F  2465  0A82  6F6C  6B63
0001156500  735F  6F63  6570  8226  730A  6168  6572  695F
0001156520  666E  286F  0882  706F  6E65  635F  746E  822C
0001156540  7305  6170  6572  822E  6C08  636F  5F6B  6468
0001156560  306C  0682  7073  7261  3165  8232  6408  7269
0001156600  705F  7461  3468  0382  6473  8562  0134  0101
0001156620  8000  0101  8000  0701  7A00  8373  0507  0082
0001156640  0101  8000  0101  8000  0101  8000  0101  8000
*
0001160020  0D01  7F00  8683  8300  0085  8283  8300  041E
0001160040  0A01  7500  8380  0081  0473  A983  0105  0001
0001160060  0180  0001  0180  0005  3878  8083  0100  0005
0001160100  6078  8283  0100  0010  837F  0086  1F83  8304
0001160120  0085  8283  8300  041E  0A01  7500  8380  0081
0001160140  0573  AF83  0105  0001  0180  0005  7878  8083
0001160160  0100  0007  837F  0086  1F83  0104  000A  8075
0001160200  8183  7300  8302  05B3  0101  8000  1301  7F00
0001160220  8683  8300  041F  8183  8300  0085  8183  8300
0001160240  00C6  0A01  7500  8380  0081  0673  B683  0105
0001160260  0001  0180  0005  5878  8083  0100  0013  837F
0001160300  0086  C083  8300  0081  8683  8300  0081  1E83
0001160320  0104  000A  8075  8183  7300  8306  05BA  0101
0001160340  8000  0501  7800  8370  0080  0501  7800  8310
0001160360  0080  1001  7F00  8683  8300  041F  8583  8300
0001160400  0085  8183  0100  000A  8075  8183  7300  8305
0001160420  05BF  0D01  7F00  8683  8300  00C0  8183  8300
0001160440  0086  0A01  7500  8380  0081  0473  C183  0105
0001160460  0010  837F  0086  8183  8300  0081  C583  8300
0001160500  042E  0A01  7500  8380  0081  0573  C383  0105
0001160520  000D  837F  0086  8183  8300  00C0  C083  0100
0001160540  000A  8075  8183  7300  8304  05C5  0101  8000
0001160560  0701  7800  A885  8300  0080  0501  7800  8330
0001160600  0080  1001  7F00  8683  8300  00C0  8183  8300
0001160620  0086  1F83  0104  000A  8075  8183  7300  8305
0001160640  05CA  0701  7F00  8683  8300  041F  0A01  7500
0001160660  8380  0081  0273  CC83  0105  0013  837F  0086
0001160700  C083  8300  0081  8683  8300  0086  8583  0100
0001160720  000A  8075  8183  7300  8306  05CE  0A01  7F00
0001160740  8683  8300  041F  C683  0100  000A  8075  8183
0001160760  7300  8303  05D0  0101  8000  0701  7800  9885
0001161000  8300  0080  0101  8000  0101  8000  1601  7900
0001161020  0330  0383  8302  0204  0A82  7528  746E  6761
0001161040  6567  2964  0169  000A  837F  0081  8183  8300
0001161060  0081  1C01  7F00  0682  6170  6B63  685F  8200
0001161100  6606  6C69  5F65  0268  0682  7566  636E  685F
0001161120  0104  0001  0180  0001  0180  0001  0180  0001
0001161140  0180  0001  0180  0001  0180  0001  0180  0001
*
0001161320  0180  0001  0180  0001  0180  0001  0180  0005
0001161340  5078  8083  0100  0005  2878  8083  0100  0001
0001161360  0180  0001  0180  0001  0180  0001  0180  0001
*
0001161720  0180  0001  0180  0001  0180  0001  0180  0007
0001161740  737A  6783  8202  0100  000A  8075  8183  6400
0001161760  8300  0201  0101  8000  0101  8000  0101  8000
0001162000  0101  8000  0101  8000  0101  8000  0101  8000
*
```

```
THU MAR 14 17:31:54 1991  DB_PI.DLL  PAGE 315, LINE 18527

0001163640  0501  7800  8368  0080  0101  8000  0101  8000
0001163660  0101  8000  0101  8000  0701  7800  0085  8301
0001163700  0080  0101  8000  0101  8000  0101  8000  0101
0001163720  8000  0101  8000  0101  8000  0101  8000  0101
*
0001164160  8000  0101  8000  0101  8000  0501  7800  8360
0001164200  0080  0101  8000  0101  8000  0101  8000  0101
0001164220  8000  0101  8000  0101  8000  0101  8000  0101
*
0001164620  8000  0101  8000  1601  7900  0220  CE83  8303
0001164640  03CF  0A82  7528  746E  6761  6567  2964  0169
0001164660  0007  837F  0081  8183  0100  0009  827F  7801
0001164700  8200  7901  0102  0001  0180  0001  0180  0001
0001164720  0180  0001  0180  0001  0180  0001  0180  0001
*
0001165240  0180  0001  0180  0001  0180  0016  3079  8303
0001165260  040A  0B83  8204  280A  6E75  6174  6767  6465
0001165300  6929  0A01  7F00  8583  8300  0085  8583  0100
0001165320  001A  827F  7705  6469  6874  8200  6806  6965
0001165340  6867  0274  0582  6564  7470  0468  1801  7900
0001165360  4085  0801  0E83  8304  040F  0A82  7528  746E
0001165400  6761  6567  2964  0169  0007  8578  0080  8483
0001165420  0100  0019  837F  0081  0983  8304  0085  8583
0001165440  8300  00C4  8283  8300  00E4  0D83  0104  005A
0001165460  827F  7206  7065  6572  0073  0682  6964  656D
0001165500  736E  8202  6410  7461  5F61  616C  6579  5F72
0001165520  6564  7470  0868  0882  6973  5F67  6973  657A
0001165540  820A  7307  6769  705F  7274  820C  6209  6D74
0001165560  5F70  6973  657A  8210  6208  6D74  5F70  7470
0001165600  1472  0582  7073  7261  1865  0101  8000  0101
0001165620  8000  0101  8000  0101  8000  0101  8000  0101
*
0001166160  8000  0101  8000  0101  8000  0101  8000  1801
0001166200  7900  6085  0F05  4F83  8304  0450  0A82  7528
0001166220  746E  6761  6567  2964  0169  0007  8578  0200
0001166240  8483  0100  002E  837F  0086  5883  8303  0082
0001166260  8183  8300  0081  CD83  8303  0085  8583  8300
0001166300  040C  C483  8300  00C4  8183  8300  0085  C483
0001166320  8300  044E  A801  7F00  0282  6469  8200  6E04
0001166340  6D61  0465  0A82  6974  656D  735F  6174  706D
0001166360  8224  6305  616C  7373  8228  7305  7974  656C
0001166400  822A  6809  746F  705F  696F  746E  822C  680B
0001166420  5F70  5F78  6564  6966  656E  8230  680B  5F70
0001166440  5F79  6564  6966  656E  8232  6209  6D74  5F70
0001166460  6E69  6F66  8234  6907  676D  705F  7274  825C
0001166500  6D08  7361  5F6B  7470  6072  0782  7571  6C61
0001166520  7469  6479  0F82  6564  6373  6972  7470  726F
0001166540  735F  7A69  6665  0E82  6564  6373  6972  7470
0001166560  726F  705F  7274  8268  7305  6170  6572  016C
0001166600  0001  0180  0007  737A  5383  8204  0100  0007
0001166620  737A  4D83  8204  0100  0001  0180  0001  0180
0001166640  0001  0180  0001  0180  0001  0180  0001  0180
*
0001166720  0007  737A  6383  8204  0100  0007  737A  5883
0001166740  8203  0100  0001  0180  0001  0180  0001  0180
0001166760  0001  0180  0001  0180  0001  0180  0001  0180
*
0001167200  0001  0180  0001  0180  0001  0180  0018  8579
0001167220  0550  8306  0490  9183  8204  280A  6E75  6174
```

```
THU MAR 14 17:31:54 1991  DB_PI.DLL  PAGE 316, LINE 18586

0001167240   6767  6465  6929  0701  7800  0085  8304  0080
0001167260   1301  7F00  8F83  8304  0081  8583  8300  0085
0001167300   8683  8300  0358  5301  7F00  0782  6F70  5F73
0001167320   6C62  006B  0E82  7462  7672  6F5F  6570  5F6E
0001167340   6F6D  6564  8085  8200  6608  7869  735F  7A69
0001167360   8565  0082  0982  656B  5F79  7369  695F  8564
0001167400   0084  0782  616C  7473  695F  8564  0086  0982
0001167420   6966  656C  6E5F  6D61  8565  008A  0101  8000
0001167440   0101  8000  0101  8000  0101  8000  0101  8000
*
0001167600   0101  8000  0701  7A00  8373  048E  0082  0101
0001167620   8000  0101  8000  0101  8000  0101  8000  0101
*
0001171340   8000  0101  8000  0101  8000  0701  7A00  8373
0001171360   04AC  0082  0101  8000  0101  8000  0101  8000
0001171400   0101  8000  0101  8000  0101  8000  0101  8000
*
0001171520   0101  8000  0101  8000  0101  8000  0A01  7F00
0001171540   8583  8300  0085  5283  0104  000A  8075  8183
0001171560   7300  8303  059F  0101  8000  0101  8000  0501
0001171600   7800  8370  0080  0501  7800  8338  0080  0501
0001171620   7800  8360  0082  0401  7F00  5383  0104  000A
0001171640   8075  8183  7300  8301  05A6  0101  8000  0A01
0001171660   7F00  8683  8300  0453  8583  0100  000A  8075
0001171700   8183  7300  8303  05A9  0101  8000  0701  7F00
0001171720   8683  8300  00C0  0A01  7500  8380  0081  0273
0001171740   AC83  0105  0001  0180  0005  7878  8083  0100
0001171760   000D  837F  0086  C083  8300  0584  5383  0104
0001172000   000A  8075  8183  6400  8304  05B0  0A01  7F00
0001172020   8683  8300  00C0  5283  0104  000A  8075  8183
0001172040   7300  8303  05B2  0A01  7F00  8683  8300  00C0
0001172060   5383  0104  000A  8075  8183  7300  8303  05B4
0001172100   0101  8000  0701  7800  8085  8300  0080  0701
0001172120   7F00  8683  8300  0453  0A01  7500  8380  0081
0001172140   0273  B883  0105  000D  837F  0086  8183  8300
0001172160   00C5  6283  0104  000A  8075  8183  7300  8304
0001172200   05BA  0101  8000  0101  8000  1601  7900  0330
0001172220   0383  8302  0204  0A82  7528  746E  6761  6567
0001172240   2964  0169  000A  837F  0081  8183  8300  0081
0001172260   1C01  7F00  0682  6170  6B63  685F  8200  6606
0001172300   6C69  5F65  0268  0682  7566  636E  685F  0104
0001172320   0001  0180  0001  0180  0001  0180  0001  0180
*
0001172520   0001  0180  0001  0180  0001  0180  0005  5078
0001172540   8083  0100  0005  2878  8083  0100  0001  0180
0001172560   0001  0180  0001  0180  0001  0180  0001  0180
*
0001173120   0001  0180  0001  0180  0001  0180  0007  737A
0001173140   6783  8202  0100  000A  8075  8183  6400  8300
0001173160   0201  0101  8000  0101  8000  0101  8000  0101
0001173200   8000  0101  8000  0101  8000  0101  8000  0101
*
0001174100   8000  0101  8000  0101  8000  0101  8000  1201
0001174120   7900  0560  E083  8302  02E1  0682  695F  626F
0001174140   6675  0169  0010  837F  00C0  8183  8300  00C0
0001174160   8083  8300  0080  2701  7F00  0482  705F  7274
0001174200   8200  5F04  6E63  0474  0582  625F  7361  0665
0001174220   0582  665F  616C  0A67  0582  665F  6C69  0B65
0001174240   0101  8000  0701  7A00  8373  02DF  0082  0101
```

```
THU MAR 14 17:31:54 1991  DB_PI.DLL  PAGE 317, LINE 18645

0001174260  8000  0101  8000  0101  8000  0101  8000  0101
*
0001175160  8000  0101  8000  0101  8000  0101  8000  0701
0001175200  7800  0085  8301  0080  0101  8000  0101  8000
0001175220  0101  8000  0101  8000  0101  8000  0101  8000
*
0001176120  0101  8000  0101  8000  1601  7900  0220  CE83
0001176140  8303  03CF  0A82  7528  746E  6761  6567  2964
0001176160  0169  0007  837F  0081  8183  0100  0009  827F
0001176200  7801  8200  7901  0102  0001  0180  0001  0180
0001176220  0001  0180  0001  0180  0001  0180  0001  0180
*
0001176340  0001  0180  0001  0180  0001  0180  0016  2079
0001176360  8301  03EA  EB83  8203  280A  6E75  6174  6767
0001176400  6465  6929  0401  7F00  8683  0100  0009  827F
0001176420  6405  6D75  796D  0100  0001  0180  0001  0180
0001176440  0001  0180  0001  0180  0001  0180  0001  0180
*
0001176600  0001  0180  0001  0180  0001  0180  0016  3079
0001176620  8303  040A  0B83  8204  280A  6E75  6174  6767
0001176640  6465  6929  0A01  7F00  8583  8300  0085  8583
0001176660  0100  001A  827F  7705  6469  6874  8200  6806
0001176700  6965  6867  0274  0582  6564  7470  0468  1801
0001176720  7900  4085  0801  0E83  8304  040F  0A82  7528
0001176740  746E  6761  6567  2964  0169  0007  8578  0080
0001176760  8483  0100  0019  837F  0081  0983  8304  0085
0001177000  8583  8300  00C4  8283  8300  00E4  0D83  0104
0001177020  005A  827F  7206  7065  6572  0073  0682  6964
0001177040  656D  736E  8202  6410  7461  5F61  616C  6579
0001177060  5F72  6564  7470  0868  0882  6973  5F67  6973
0001177100  657A  820A  7307  6769  705F  7274  820C  6209
0001177120  6D74  5F70  6973  657A  8210  6208  6D74  5F70
0001177140  7470  1472  0582  7073  7261  1865  0101  8000
0001177160  1801  7900  A085  0C05  1383  8304  0414  0A82
0001177200  7528  746E  6761  6567  2964  0169  0007  8578
0001177220  0180  8483  0100  0025  837F  0086  5883  8303
0001177240  0358  8683  8300  0081  8583  8300  0086  8283
0001177260  8300  0086  CD83  8303  040C  1283  0104  007E
0001177300  827F  6902  0064  0482  616E  656D  8204  6609
0001177320  6C69  5F65  616E  656D  8224  6509  7078  745F
0001177340  5F63  6469  8244  7404  7079  4865  0C82  6572
0001177360  5F66  696C  656E  6E5F  6D75  824A  7209  6665
0001177400  745F  5F63  6469  824C  740A  6D69  5F65  7473
0001177420  6D61  5070  0682  6F61  5F69  6469  8254  6C08
0001177440  636F  7461  6F69  586E  0982  7462  706D  695F
0001177460  666E  5C6F  0582  7073  7261  8565  0084  0101
0001177500  8000  0101  8000  0101  8000  0101  8000  0101
*
0001177540  8000  0101  8000  0701  7A00  8373  0411  0082
0001177560  0101  8000  0101  8000  0101  8000  0101  8000
*
0001177720  0101  8000  0101  8000  0701  7A00  8373  00E4
0001177740  0082  0101  8000  0101  8000  0101  8000  0101
0001177760  8000  0101  8000  0101  8000  0101  8000  0101
*
0001200520  8000  0101  8000  0101  8000  0101  8000  1801
0001200540  7900  5085  0605  9C83  8304  049D  0A82  7528
0001200560  746E  6761  6567  2964  0169  0007  8578  0400
0001200600  8083  0100  0013  837F  049B  8183  8300  0085
```

THU MAR 14 17:31:54 1991 DB_PI.DLL PAGE 318, LINE 18704

| | | | | | | | | |
|---|---|---|---|---|---|---|---|---|
| 0001200620 | 8583 | 8300 | 0086 | 5883 | 0103 | 0053 | 827F | 7007 |
| 0001200640 | 736F | 625F | 6B6C | 8200 | 620E | 7274 | 5F76 | 706F |
| 0001200660 | 6E65 | 6D5F | 646F | 8565 | 0080 | 0882 | 6966 | 5F78 |
| 0001200700 | 6973 | 657A | 8285 | 8200 | 6B09 | 7965 | 695F | 5F73 |
| 0001200720 | 6469 | 8485 | 8200 | 6C07 | 7361 | 5F74 | 6469 | 8685 |
| 0001200740 | 8200 | 6609 | 6C69 | 5F65 | 616E | 656D | 8A85 | 0100 |
| 0001200760 | 0001 | 0180 | 0001 | 0180 | 0007 | 8578 | 0800 | 8083 |
| 0001201000 | 0100 | 0001 | 0180 | 0001 | 0180 | 0001 | 0180 | 0001 |
| 0001201020 | 0180 | 0001 | 0180 | 0001 | 0180 | 0001 | 0180 | 0001 |
| * | | | | | | | | |
| 0001201540 | 0180 | 0001 | 0180 | 0001 | 0180 | 0018 | 8579 | 0120 |
| 0001201560 | 8303 | 04FC | FD83 | 8204 | 280A | 6E75 | 6174 | 6767 |
| 0001201600 | 6465 | 6929 | 0A01 | 7F00 | 8583 | 8300 | 0081 | 5883 |
| 0001201620 | 0103 | 0020 | 827F | 6108 | 6363 | 7365 | 6573 | 0064 |
| 0001201640 | 0582 | 7564 | 6D6D | 0279 | 0982 | 6966 | 656C | 6E5F |
| 0001201660 | 6D61 | 0465 | 1801 | 7900 | 0085 | 0108 | FF83 | 8304 |
| 0001201700 | 0500 | 0A82 | 7528 | 746E | 6761 | 6567 | 2964 | 0169 |
| 0001201720 | 0004 | 837F | 04A0 | 0C01 | 7F00 | 0882 | 6964 | 5F72 |
| 0001201740 | 616E | 656D | 0100 | 0018 | 8579 | 4A10 | 8308 | 0504 |
| 0001201760 | 0583 | 8205 | 280A | 6E75 | 6174 | 6767 | 6465 | 6929 |
| 0001202000 | 0701 | 7800 | F085 | 830F | 049A | 0701 | 7800 | 0085 |
| 0001202020 | 8318 | 04FE | 1901 | 7F00 | FB83 | 8304 | 04FB | 0283 |
| 0001202040 | 8305 | 0503 | 9A83 | 8304 | 049A | 9A83 | 8304 | 0502 |
| 0001202060 | 5301 | 7F00 | 0A82 | 7374 | 5F74 | 6373 | 6972 | 7470 |
| 0001202100 | 8200 | 740A | 7473 | 685F | 6165 | 6564 | 2472 | 0382 |
| 0001202120 | 6D69 | 4867 | 0782 | 6D69 | 5F67 | 6964 | 8572 | 0246 |
| 0001202140 | 0482 | 6C66 | 7274 | 4685 | 8205 | 6103 | 696F | F085 |
| 0001202160 | 8205 | 6504 | 6578 | 8563 | 069A | 0782 | 6567 | 656E |
| 0001202200 | 6972 | 8563 | 0744 | 0101 | 8000 | 1801 | 7900 | B085 |
| 0001202220 | 0B53 | 0883 | 8305 | 0509 | 0A82 | 7528 | 746E | 6761 |
| 0001202240 | 6567 | 2964 | 0169 | 0022 | 837F | 0086 | 5883 | 8303 |
| 0001202260 | 0081 | 8183 | 8300 | 03E9 | 8583 | 8300 | 0081 | 8583 |
| 0001202300 | 8300 | 0081 | A083 | 8304 | 0501 | 6F01 | 7F00 | 0282 |
| 0001202320 | 6469 | 8200 | 6E04 | 6D61 | 0465 | 0B82 | 6361 | 6563 |
| 0001202340 | 7373 | 6D5F | 646F | 2465 | 0A82 | 6F6C | 6B63 | 735F |
| 0001202360 | 6F63 | 6570 | 8226 | 730A | 6168 | 6572 | 695F | 666E |
| 0001202400 | 286F | 0882 | 706F | 6E65 | 635F | 746E | 822C | 7305 |
| 0001202420 | 6170 | 6572 | 822E | 6C08 | 636F | 5F6B | 6468 | 306C |
| 0001202440 | 0682 | 7073 | 7261 | 3165 | 8232 | 6408 | 7269 | 705F |
| 0001202460 | 7461 | 3468 | 0382 | 6473 | 8562 | 0134 | 0101 | 8000 |
| 0001202500 | 1801 | 7900 | F085 | 1007 | 0D83 | 8305 | 050E | 0A82 |
| 0001202520 | 7528 | 746E | 6761 | 6567 | 2964 | 0169 | 0007 | 737A |
| 0001202540 | 0783 | 8205 | 0100 | 0031 | 837F | 0085 | 8583 | 8300 |
| 0001202560 | 0086 | 0C83 | 8305 | 0411 | 1F83 | 8304 | 0081 | 8183 |
| 0001202600 | 8300 | 0085 | 8183 | 8300 | 02E3 | E383 | 8302 | 0358 |
| 0001202620 | 8183 | 8300 | 00E4 | E483 | 0100 | 00D8 | 827F | 7504 |
| 0001202640 | 6573 | 0064 | 0982 | 6361 | 6563 | 7373 | 6F5F | 0270 |
| 0001202660 | 0682 | 7374 | 5F74 | 6469 | 8204 | 7407 | 7473 | 705F |
| 0001202700 | 7274 | 8208 | 6907 | 676D | 685F | 7264 | 820C | 690B |
| 0001202720 | 676D | 625F | 6675 | 705F | 7274 | C085 | 8200 | 610B |
| 0001202740 | 6363 | 7365 | 5F73 | 6F6D | 6564 | C485 | 8200 | 630B |
| 0001202760 | 6572 | 7461 | 5F65 | 6F6D | 6564 | C685 | 8200 | 620A |
| 0001203000 | 6361 | 676B | 6F72 | 6E75 | 8564 | 00C8 | 0882 | 6F63 |
| 0001203020 | 706D | 6572 | 7373 | CA85 | 8200 | 6F07 | 6570 | 5F6E |
| 0001203040 | 7066 | CC85 | 8200 | 7407 | 6D65 | 5F70 | 7066 | D085 |
| 0001203060 | 8200 | 740E | 6D65 | 5F70 | 6966 | 656C | 6E5F | 6D61 |
| 0001203100 | 8565 | 00D4 | 0D82 | 6162 | 6B63 | 7267 | 756F | 646E |
| 0001203120 | 735F | 8574 | 00F4 | 0982 | 616C | 6579 | 5F72 | 7470 |
| 0001203140 | 8572 | 00F6 | 0B82 | 7773 | 7061 | 625F | 6675 | 6566 |

```
THU MAR 14 17:31:54 1991  DB_PI.DLL  PAGE 319, LINE 18763

0001203160  8572  00FA  0101  8000  0101  8000  0701  7A00
0001203200  8373  050B  0082  0101  8000  0101  8000  0101
0001203220  8000  0101  8000  0101  8000  0101  8000  0101
*
0001204340  8000  0A01  7500  8380  0081  0364  AA83  0105
0001204360  000A  837F  0511  8583  8300  00E4  0A01  7500
0001204400  8380  0081  0264  AC83  0105  0007  837F  0511
0001204420  E483  0100  0001  0180  0001  0180  000A  8075
0001204440  8183  6400  8305  05B0  1001  7F00  0C83  8305
0001204460  00C0  C083  8300  0081  1F83  0104  000A  8075
0001204500  8183  6400  8304  05B2  0D01  7F00  0C83  8305
0001204520  00C0  8183  8300  041F  1601  7F00  8683  8300
0001204540  041F  8183  8300  0085  8183  8300  00C5  3A83
0001204560  0104  000A  8075  8183  7300  8307  05B3  0101
0001204600  8000  0101  8000  0701  7800  9885  8300  0080
0001204620  0501  7800  8338  0080  0501  7800  8360  0082
0001204640  0501  7800  8340  0080  0501  7800  8310  0080
0001204660  0D01  7F00  8683  8300  0085  8583  8300  043A
0001204700  0A01  7500  8380  0081  0473  BC83  0105  000A
0001204720  837F  0086  8583  8300  00C4  0A01  7500  8380
0001204740  0081  0373  BE83  0105  0001  0180  0007  8578
0001204760  0088  8083  0100  000D  837F  0086  8583  8300
0001205000  043A  C683  0100  000A  8075  8183  7300  8304
0001205020  05C2  0A01  7F00  8683  8300  0085  3A83  0104
0001205040  000A  8075  8183  7300  8303  05C4  1F01  7F00
0001205060  8683  8300  00C0  8183  8300  0086  8183  8300
0001205100  0085  8183  8300  00C5  1F83  8304  043A  0A01
0001205120  7500  8380  0081  0A73  C683  0105  0001  0180
0001205140  0007  8578  00A0  8083  0100  000D  837F  0086
0001205160  8583  8300  0085  E483  0100  000A  8075  8183
0001205200  7300  8304  05CA  0A01  7F00  1183  8305  0085
0001205220  E483  0100  000A  8075  8183  6400  8303  05CC
0001205240  0A01  7F00  8683  8300  0085  C483  0100  000A
0001205260  8075  8183  7300  8303  05CE  0101  8000  0701
0001205300  7800  9085  8300  0080  0701  7F00  1183  8305
0001205320  00E4  0A01  7500  8380  0081  0264  D283  0105
0001205340  0004  837F  0511  0A01  7500  8380  0081  0164
0001205360  D483  0105  0010  837F  0086  8583  8300  0085
0001205400  8583  8300  043A  0A01  7500  8380  0081  0573
0001205420  D683  0105  0001  0180  0007  8578  00A8  8083
0001205440  0100  000D  837F  0086  8583  8300  0085  E483
0001205460  0100  000A  8075  8183  7300  8304  05DA  0D01
0001205500  7F00  8683  8300  0085  8583  8300  043A  0A01
0001205520  7500  8380  0081  0473  DC83  0105  0007  837F
0001205540  0086  8583  0100  000A  8075  8183  6400  8302
0001205560  05DE  0101  8000  0701  7800  B885  8300  0080
0001205600  1001  7F00  0C83  8305  00C0  C083  8300  0081
0001205620  1F83  0104  000A  8075  8183  6400  8305  05E2
0001205640  0D01  7F00  0C83  8305  00C0  8183  8300  041F
0001205660  0A01  7500  8380  0081  0464  E483  0105  0001
0001205700  0180  0001  0180  0016  3079  8303  0203  0483
0001205720  8202  280A  6E75  6174  6767  6465  6929  0A01
0001205740  7F00  8183  8300  0081  8183  0100  001C  827F
0001205760  7006  6361  5F6B  0068  0682  6966  656C  685F
0001206000  8202  6606  6E75  5F63  0468  0701  7A00  8373
0001206020  00C0  0082  0101  8000  0101  8000  0101  8000
0001206040  0101  8000  0101  8000  0101  8000  0101  8000
*
0001206220  0101  8000  0101  8000  0101  8000  0501  7800
```

```
THU MAR 14 17:31:54 1991  DB_PI.DLL  PAGE 320, LINE 18822

0001206240   8350  0080  0501  7800  8328  0080  0701  7A00
0001206260   8373  022B  0082  0A01  7500  8380  0081  0064
0001206300   0183  0102  0001  0180  0001  0180  0001  0180
0001206320   0001  0180  0001  0180  0001  0180  0001  0180
*
0001207300   0001  0180  0012  6079  8305  02AD  AE83  8202
0001207320   5F06  6F69  7562  6966  1001  7F00  C083  8300
0001207340   0081  C083  8300  0080  8083  0100  0027  827F
0001207360   5F04  7470  0072  0482  635F  746E  8204  5F05
0001207400   6162  6573  8206  5F05  6C66  6761  820A  5F05
0001207420   6966  656C  010B  0001  0180  0007  737A  AC83
0001207440   8202  0100  0001  0180  0001  0180  0001  0180
0001207460   0001  0180  0001  0180  0001  0180  0001  0180
*
0001210360   0001  0180  0007  8578  0100  8083  0100  0001
0001210400   0180  0001  0180  0001  0180  0001  0180  0001
*
0001210660   0180  0001  0180  0005  6078  8083  0100  0001
0001210700   0180  0001  0180  0001  0180  0001  0180  0001
*
0001211320   0180  0016  2079  8302  039B  9C83  8203  280A
0001211340   6E75  6174  6767  6465  6929  0701  7F00  8183
0001211360   8300  0081  0901  7F00  0182  0078  0182  0279
0001211400   1601  7900  0240  9E83  8303  039F  0A82  7528
0001211420   746E  6761  6567  2964  0169  0007  837F  039A
0001211440   9A83  0103  000D  827F  6D03  6E69  8200  6D03
0001211460   7861  0104  0001  0180  0001  0180  0001  0180
0001211500   0001  0180  0001  0180  0001  0180  0001  0180
*
0001211600   0001  0180  0001  0180  0001  0180  0016  2079
0001211620   8301  03B7  B883  8203  280A  6E75  6174  6767
0001211640   6465  6929  0401  7F00  8683  0100  0009  827F
0001211660   6405  6D75  796D  0100  0001  0180  0001  0180
0001211700   0001  0180  0001  0180  0001  0180  0001  0180
*
0001212040   0001  0180  0001  0180  0001  0180  0018  8579
0001212060   0260  8305  03D7  D883  8203  280A  6E75  6174
0001212100   6767  6465  6929  1001  7F00  8683  8300  0325
C001212120   8283  8300  0325  C083  0100  002E  827F  6902
0001212140   0064  0482  616E  656D  8204  740A  6D69  5F65
0001212160   7473  6D61  2470  0582  776F  656E  2872  0982
0001212200   6870  7379  705F  7461  4868  0101  8000  0101
0001212220   8000  0101  8000  0101  8000  0101  8000  0101
0001212240   8000  0101  8000  0701  7A00  8373  03E1  0082
0001212260   0701  7A00  8373  0325  0082  0101  8000  0101
0001212300   8000  0101  8000  0101  8000  0101  8000  0101
0001212320   8000  0101  8000  0101  8000  0101  8000  0701
0001212340   7A00  8373  03D6  0082  0101  8000  0101  8000
0001212360   0101  8000  0101  8000  0101  8000  0101  8000
*
0001212460   1601  7900  0330  FF83  8303  0400  0A82  7528
0001212500   746E  6761  6567  2964  0169  000A  837F  0085
0001212520   8583  8300  0085  1A01  7F00  0582  6977  7464
0001212540   0068  0682  6568  6769  7468  8202  6405  7065
0001212560   6874  0104  0018  8579  0140  8308  0403  0483
0001212600   8204  280A  6E75  6174  6767  6465  6929  0701
0001212620   7800  8085  8300  0084  1901  7F00  8183  8300
0001212640   03FE  8583  8300  0085  C483  8300  0082  E483
0001212660   8300  0402  5A01  7F00  0682  6572  7270  7365
```

```
THU MAR 14 17:31:54 1991  DB_PI.DLL  PAGE 321, LINE 18881

0001212700  8200  6406  6D69  6E65  0273  1082  6164  6174
0001212720  6C5F  7961  7265  645F  7065  6874  8208  7308
0001212740  6769  735F  7A69  0A65  0782  6973  5F67  7470
0001212760  0C72  0982  7462  706D  735F  7A69  1065  0882
0001213000  7462  706D  705F  7274  8214  7305  6170  6572
0001213020  0118  0001  0180  0018  8579  05A0  830C  0408
0001213040  0983  8204  280A  6E75  6174  6767  6465  6929
0001213060  0701  7800  8085  8301  0084  2501  7F00  8683
0001213100  8300  0325  2583  8303  0086  8183  8300  0085
0001213120  8683  8300  0082  8683  8300  039A  0183  8304
0001213140  0407  7E01  7F00  0282  6469  8200  6E04  6D61
0001213160  0465  0982  6966  656C  6E5F  6D61  2465  0982
0001213200  7865  5F70  6374  695F  4464  0482  7974  6570
0001213220  8248  720C  6665  6C5F  6E69  5F65  756E  4A6D
0001213240  0982  6572  5F66  6374  695F  4C64  0A82  6974
0001213260  656D  735F  6174  706D  8250  6106  696F  695F
0001213300  5464  0882  6F6C  6163  6974  6E6F  8258  6209
0001213320  6D74  5F70  6E69  6F66  825C  7305  6170  6572
0001213340  8485  0100  0001  0180  0001  0180  0001  0180
0001213360  0001  0180  0001  0180  0001  0180  0001  0180
0001213400  0001  0180  0001  0180  0001  0180  0007  737A
0001213420  0683  8204  0100  0001  0180  0001  0180  0001
0001213440  0180  0001  0180  0001  0180  0001  0180  0001
*
0001214020  0180  0001  0180  0001  0180  0001  0180  0018
0001214040  8579  02C0  8307  0459  5A83  8204  280A  6E75
0001214060  6174  6767  6465  6929  0701  7800  2085  8301
0001214100  0084  1601  7F00  8683  8300  0325  9D83  8303
0001214120  0081  8183  8300  0082  5883  0104  0038  827F
0001214140  6902  0064  0482  616E  656D  8204  7204  6365
0001214160  2474  0482  7461  7274  822C  6405  6D75  796D
0001214200  822E  740A  6D69  5F65  7473  6D61  3070  0582
0001214220  7073  7261  3465  0101  8000  0101  8000  0101
0001214240  8000  0101  8000  0101  8000  0101  8000  0701
0001214260  7A00  8373  0457  0082  0101  8000  0101  8000
0001214300  0101  8000  0101  8000  0101  8000  0101  8000
0001214320  0701  7A00  8373  0461  0082  0101  8000  0101
0001214340  8000  0101  8000  0101  8000  0101  8000  0101
*
0001214560  8000  0101  8000  1801  7900  5085  0605  9283
0001214600  8304  0493  0A82  7528  746E  6761  6567  2964
0001214620  0169  0007  8578  0400  8083  0100  0013  837F
0001214640  0491  8183  8300  0085  8583  8300  0086  2583
0001214660  0103  0053  827F  7007  736F  625F  6B6C  8200
0001214700  620E  7274  5F76  706F  6E65  6D5F  646F  8565
0001214720  0080  0882  6966  5F78  6973  657A  8285  8200
0001214740  6B09  7965  695F  5F73  6469  8485  8200  6C07
0001214760  7361  5F74  6469  8685  8200  6609  6C69  5F65
0001215000  616E  656D  8A85  0100  0001  0180  0018  8579
0001215020  1300  8307  0497  9883  8204  280A  6E75  6174
0001215040  6767  6465  6929  0701  7800  0085  8308  0080
0001215060  1601  7F00  8683  8300  0496  9083  8304  0490
0001215100  8683  8300  0085  8183  0100  0052  827F  6405
0001215120  6972  6576  8200  6D07  7061  645F  7269  8204
0001215140  6F0B  6A62  745F  6C62  685F  6C64  0485  8201
0001215160  720B  6C65  745F  6C62  685F  6C64  AE85  8201
0001215200  7705  5F66  6469  5885  8202  6C06  636F  656B
0001215220  8564  025C  0582  7564  6D6D  8579  025E  1801
0001215240  7900  3085  0301  9A83  8304  049B  0A82  7528
```

THU MAR 14 17:31:54 1991 DB_PI.DLL PAGE 322, LINE 18940

```
0001215260  746E  6761  6567  2964  0169  000A  837F  0325
0001215300  C083  8300  0085  1501  7F00  0382  656B  0079
0001215320  0482  7469  6D65  8220  7304  7A69  2465  1601
0001215340  7900  0340  9E83  8304  049F  0A82  7528  746E
0001215360  6761  6567  2964  0169  0007  737A  9983  8204
0001215400  0100  000A  837F  0085  8583  8300  049D  1C01
0001215420  7F00  0982  6C61  6F6C  6163  6574  0064  0482
0001215440  7375  6465  8202  6505  746E  7972  0104  0016
0001215460  4079  8303  04A2  A383  8204  280A  6E75  6174
0001215500  6767  6465  6929  0701  7A00  8373  049C  0082
0001215520  0A01  7F00  8583  8300  04A1  8583  0100  0023
0001215540  827F  7304  7A69  0065  0682  7562  6B63  7465
0001215560  8202  620F  6375  656B  5F74  6E69  5F63  6973
0001215600  657A  0106  0001  0180  0001  0180  0001  0180
0001215620  0001  0180  0001  0180  0001  0180  0001  0180
0001215640  0001  0180  0001  0180  0001  0180  0007  737A
0001215660  9083  8204  0100  0001  0180  0001  0180  0001
0001215700  0180  0001  0180  0001  0180  0001  0180  0001
*
0001216060  0180  0007  737A  A083  8204  0100  0001  0180
0001216100  0001  0180  0001  0180  0001  0180  0001  0180
*
0001216200  0001  0180  0018  8579  0220  8304  04E2  E383
0001216220  8204  280A  6E75  6174  6767  6465  6929  0D01
0001216240  7F00  2583  8303  0325  8183  8300  0081  3101
0001216260  7F00  0982  7375  7265  6E5F  6D61  0065  0B82
0001216300  7061  6C70  6369  6E5F  6D61  2065  0B82  7061
0001216320  6C70  6369  745F  7079  4065  0582  7564  6D6D
0001216340  4279  0101  8000  1601  7900  0460  E783  8304
0001216360  04E8  0A82  7528  746E  6761  6567  2964  0169
0001216400  0007  737A  9583  8204  0100  000D  837F  0086
0001216420  8583  8300  0085  E683  0104  0035  827F  770D
0001216440  726F  696B  676E  645F  6972  6576  8200  6D09
0001216460  7861  635F  756F  746E  8204  740A  6572  5F65
0001216500  6F63  6E75  0674  0882  7274  6565  6C5F  7473
0001216520  0108  0016  6079  8304  04EA  EB83  8204  280A
0001216540  6E75  6174  6767  6465  6929  0D01  7F00  8583
0001216560  8300  0205  8583  8300  00C6  2601  7F00  0882
0001216600  6170  6874  635F  746E  8200  7008  7461  5F68
0001216620  736C  0274  0382  6E63  0674  0682  6469  6C5F
0001216640  7473  0108  0001  0180  0018  8579  0570  8302
0001216660  04EE  EF83  8204  280A  6E75  6174  6767  6465
0001216700  6929  0701  7F00  9083  8304  00C0  2201  7F00
0001216720  0782  696C  5F62  6274  006C  1282  696C  5F62
0001216740  6F66  646C  7265  6C5F  676F  616E  656D  AA85
0001216760  0100  0001  0180  0018  8579  0120  8303  04F2
0001217000  F383  8204  280A  6E75  6174  6767  6465  6929
0001217020  0A01  7F00  8583  8300  0081  2583  0103  0020
0001217040  827F  6108  6363  7365  6573  0064  0582  7564
0001217060  6D6D  0279  0982  6966  656C  6E5F  6D61  0465
0001217100  1801  7900  0085  0108  F583  8304  04F6  0A82
0001217120  7528  746E  6761  6567  2964  0169  0004  837F
0001217140  0496  0C01  7F00  0882  6964  5F72  616E  656D
0001217160  0100  0018  8579  4A10  8308  04FA  FB83  8204
0001217200  280A  6E75  6174  6767  6465  6929  0701  7800
0001217220  F085  830F  0490  0701  7800  0085  8318  04F4
0001217240  1901  7F00  F183  8304  04F1  F883  8304  04F9
0001217260  9083  8304  0490  9083  8304  04F8  5301  7F00
0001217300  0A82  7374  5F74  6373  6972  7470  8200  740A
```

THU MAR 14 17:31:54 1991 DB_PI.DLL PAGE 323, LINE 18999

| | | | | | | | | |
|---|---|---|---|---|---|---|---|---|
| 0001217320 | 7473 | 685F | 6165 | 6564 | 2472 | 0382 | 6D69 | 4867 |
| 0001217340 | 0782 | 6D69 | 5F67 | 6964 | 8572 | 0246 | 0482 | 6C66 |
| 0001217360 | 7274 | 4685 | 8205 | 6103 | 696F | F085 | 8205 | 6504 |
| 0001217400 | 6578 | 8563 | 069A | 0782 | 6567 | 656E | 6972 | 8563 |
| 0001217420 | 0744 | 0101 | 8000 | 1801 | 7900 | B085 | 0B53 | FE83 |
| 0001217440 | 8304 | 04FF | 0A82 | 7528 | 746E | 6761 | 6567 | 2964 |
| 0001217460 | 0169 | 0022 | 837F | 0086 | 2583 | 8303 | 0081 | 8183 |
| 0001217500 | 8300 | 03B6 | 8583 | 8300 | 0081 | 8583 | 8300 | 0081 |
| 0001217520 | 9683 | 8304 | 04F7 | 6F01 | 7F00 | 0282 | 6469 | 8200 |
| 0001217540 | 6E04 | 6D61 | 0465 | 0B82 | 6361 | 6563 | 7373 | 6D5F |
| 0001217560 | 646F | 2465 | 0A82 | 6F6C | 6B63 | 735F | 6F63 | 6570 |
| 0001217600 | 8226 | 730A | 6168 | 6572 | 695F | 666E | 286F | 0882 |
| 0001217620 | 706F | 6E65 | 635F | 746E | 822C | 7305 | 6170 | 6572 |
| 0001217640 | 822E | 6C08 | 636F | 5F6B | 6468 | 306C | 0682 | 7073 |
| 0001217660 | 7261 | 3165 | 8232 | 6408 | 7269 | 705F | 7461 | 3468 |
| 0001217700 | 0382 | 6473 | 8562 | 0134 | 0101 | 8000 | 1801 | 7900 |
| 0001217720 | F085 | 1007 | 0383 | 8305 | 0504 | 0A82 | 7528 | 746E |
| 0001217740 | 6761 | 6567 | 2964 | 0169 | 0007 | 737A | FD83 | 8204 |
| 0001217760 | 0100 | 0031 | 837F | 0085 | 8583 | 8300 | 0086 | 0283 |
| 0001220000 | 8305 | 0406 | 1483 | 8304 | 0081 | 8183 | 8300 | 0085 |
| 0001220020 | 8183 | 8300 | 02B0 | B083 | 8302 | 0325 | 8183 | 8300 |
| 0001220040 | 00E4 | E483 | 0100 | 00D8 | 827F | 7504 | 6573 | 0064 |
| 0001220060 | 0982 | 6361 | 6563 | 7373 | 6F5F | 0270 | 0682 | 7374 |
| 0001220100 | 5F74 | 6469 | 8204 | 7407 | 7473 | 705F | 7274 | 8208 |
| 0001220120 | 6907 | 676D | 685F | 7264 | 820C | 690B | 676D | 625F |
| 0001220140 | 6675 | 705F | 7274 | C085 | 8200 | 610B | 6363 | 7365 |
| 0001220160 | 5F73 | 6F6D | 6564 | C485 | 8200 | 630B | 6572 | 7461 |
| 0001220200 | 5F65 | 6F6D | 6564 | C685 | 8200 | 620A | 6361 | 676B |
| 0001220220 | 6F72 | 6E75 | 8564 | 00C8 | 0882 | 6F63 | 706D | 6572 |
| 0001220240 | 7373 | CA85 | 8200 | 6F07 | 6570 | 5F6E | 7066 | CC85 |
| 0001220260 | 8200 | 7407 | 6D65 | 5F70 | 7066 | D085 | 8200 | 740E |
| 0001220300 | 6D65 | 5F70 | 6966 | 656C | 6E5F | 6D61 | 8565 | 00D4 |
| 0001220320 | 0D82 | 6162 | 6B63 | 7267 | 756F | 646E | 735F | 8574 |
| 0001220340 | 00F4 | 0982 | 616C | 6579 | 5F72 | 7470 | 8572 | 00F6 |
| 0001220360 | 0B82 | 7773 | 7061 | 625F | 6675 | 6566 | 8572 | 00FA |
| 0001220400 | 0101 | 8000 | 1601 | 7900 | 0340 | 0883 | 8305 | 0509 |
| 0001220420 | 0A82 | 7528 | 746E | 6761 | 6567 | 2964 | 0169 | 0007 |
| 0001220440 | 737A | 0183 | 8205 | 0100 | 000A | 837F | 0085 | 8583 |
| 0001220460 | 8300 | 0507 | 1F01 | 7F00 | 0782 | 6D69 | 5F67 | 6E63 |
| 0001220500 | 0074 | 0782 | 616D | 5F78 | 6E63 | 0274 | 0782 | 6D69 |
| 0001220520 | 5F67 | 736C | 0474 | 0101 | 8000 | 1601 | 7900 | 0350 |
| 0001220540 | 0C83 | 8305 | 050D | 0A82 | 7528 | 746E | 6761 | 6567 |
| 0001220560 | 2964 | 0169 | 000A | 837F | 0086 | 8583 | 8300 | 04CE |
| 0001220600 | 2301 | 7F00 | 0682 | 626F | 5F6A | 6469 | 8200 | 6C0A |
| 0001220620 | 616F | 5F64 | 6F63 | 6E75 | 0474 | 0982 | 6174 | 6C62 |
| 0001220640 | 5F65 | 7470 | 0672 | 1601 | 7900 | 0230 | 1083 | 8305 |
| 0001220660 | 0511 | 0A82 | 7528 | 746E | 6761 | 6567 | 2964 | 0169 |
| 0001220700 | 0007 | 737A | 0B83 | 8205 | 0100 | 0007 | 837F | 050F |
| 0001220720 | 8583 | 0100 | 0025 | 827F | 730E | 6D79 | 6F62 | 5F6C |
| 0001220740 | 6274 | 5F6C | 736C | 0074 | 1082 | 6174 | 6C62 | 7365 |
| 0001220760 | 615F | 6C6C | 636F | 7461 | 6465 | 0104 | 0016 | 4079 |
| 0001221000 | 8302 | 0513 | 1483 | 8205 | 280A | 6E75 | 6174 | 6767 |
| 0001221020 | 6465 | 6929 | 0701 | 7F00 | 8683 | 8300 | 0502 | 1401 |
| 0001221040 | 7F00 | 0682 | 7374 | 5F74 | 6469 | 8200 | 7407 | 7473 |
| 0001221060 | 705F | 7274 | 0104 | 0001 | 0180 | 0018 | 8579 | 16B0 |
| 0001221100 | 830D | 0518 | 1983 | 8205 | 280A | 6E75 | 6174 | 6767 |
| 0001221120 | 6465 | 6929 | 0501 | 7800 | 8340 | 0512 | 2801 | 7F00 |
| 0001221140 | 8583 | 8300 | 0081 | E183 | 8304 | 04E5 | 0683 | 8305 |
| 0001221160 | 04ED | ED83 | 8304 | 04E9 | 0E83 | 8305 | 0496 | 8583 |

```
THU MAR 14 17:31:54 1991  DB_PI.DLL  PAGE 324, LINE 19058

0001221200   8300   0085   1783   0105   00A3   827F   730A   7365
0001221220   6973   6E6F   6F5F   006E   0582   7564   6D6D   0279
0001221240   0682   6C63   6569   746E   8204   7405   6572   7365
0001221260   8248   6F08   6570   5F6E   6D69   5467   0882   6C66
0001221300   7274   6C5F   6269   825C   6908   6F63   5F6E   696C
0001221320   8562   010A   0682   7073   685F   7264   B885   8201
0001221340   630A   6E6F   6966   5F67   736C   8574   01C4   0A82
0001221360   6264   705F   5F69   6170   6874   CA85   8201   6D0E
0001221400   7861   745F   7365   5F74   6F63   6E75   8574   02CA
0001221420   0A82   6574   7473   635F   756F   746E   CC85   8202
0001221440   7409   7365   5F74   696C   7473   CE85   0102   0001
0001221460   0180   0001   0180   0001   0180   0001   0180   0001
0001221500   0180   0007   737A   1683   8205   0100   0001   0180
0001221520   0001   018C   0J01   0180   0001   0180   0001   0180
*
0001222360   0007   737A   AE83   8204   0100   0001   0180   0001
0001222400   0180   0001   0180   0001   0180   0001   0180   0001
*
0001222520   0180   0001   0180   0001   0180   0007   837F   0081
0001222540   8983   0105   000A   8075   8183   6400   8302   05A2
0001222560   0501   7800   8310   0080   0101   8000   0101   8000
0001222600   0A01   7F00   8683   8300   0081   8983   0105   000A
0001222620   8075   8183   6400   8303   05A7   0D01   7F00   C083
0001222640   8300   0086   6183   8304   0085   0A01   7500   8380
0001222660   0081   0473   A983   0105   0001   0180   0001   0180
0001222700   0005   3878   8083   0100   0005   6078   8283   0100
0001222720   000A   837F   00C0   8683   8300   00C0   0A01   7500
0001222740   8380   0081   0373   AF83   0105   0001   0180   0005
0001222760   7878   8083   0100   000D   837F   00C0   8683   8300
0001223000   00C0   6183   0104   000A   8075   8183   7300   8304
0001223020   05B3   0101   8000   0501   7800   8370   0080   1001
0001223040   7F00   8683   8300   0085   E183   8303   00C5   6883
0001223060   0104   000A   8075   8183   7300   8305   05B7   0101
0001223100   8000   0701   7800   B085   8300   0080   0D01   7F00
0001223120   8683   8300   0081   C583   8300   03E0   0A01   7500
0001223140   8380   0081   0473   BB83   0105   0001   0180   0001
0001223160   0180   0016   3079   8303   0203   0483   8202   280A
0001223200   6E75   6174   6767   6465   6929   0A01   7F00   8183
0001223220   8300   0081   8183   0100   001C   827F   7006   6361
0001223240   5F6B   0068   0682   6966   656C   685F   8202   6606
0001223260   6E75   5F63   0468   0101   8000   0101   8000   0101
0001223300   8000   0101   8000   0101   8000   0101   8000   0101
*
0001223500   8000   0501   7800   8348   0080   0501   7800   8328
0001223520   0080   0101   8000   0101   8000   0101   8000   0101
0001223540   8000   0101   8000   0101   8000   0101   8000   0101
*
0001224100   8000   0701   7A00   8373   0267   0082   0A01   7500
0001224120   8380   0081   0064   0183   0102   0001   0180   0001
0001224140   0180   0001   0180   0001   0180   0001   0180   0001
*
0001225640   0180   0001   0180   0001   0180   0001   0180   0005
0001225660   6878   8083   0100   0001   0180   0001   0180   0001
0001225700   0180   0001   0180   0007   8578   0100   8083   0100
0001225720   0001   0180   0001   0180   0001   0180   0001   0180
*
0001226200   0001   0180   0001   0180   0005   6078   8083   0100
0001226220   0001   0180   0001   0180   0001   0180   0001   0180
*
```

THU MAR 14 17:31:54 1991 DB_PI.DLL PAGE 325, LINE 19117

```
0001226640  0001  0180  0016  2079  8302  03B8  B983  8203
0001226660  280A  6E75  6174  6767  6465  6929  0701  7F00
0001226700  8183  8300  0081  0901  7F00  0182  0078  0182
0001226720  0279  1601  7900  0240  BB83  8303  03BC  0A82
0001226740  7528  746E  6761  6567  2964  0169  0007  837F
0001226760  03B7  B783  0103  000D  827F  6D03  6E69  8200
0001227000  6D03  7861  0104  0001  0180  0001  0180  0001
0001227020  0180  0001  0180  0001  0180  0001  0180  0001
*
0001227120  0180  0001  0180  0001  0180  0001  0180  0016
0001227140  2079  8301  03D4  D583  8203  280A  6E75  6174
0001227160  6767  6465  6929  0401  7F00  8683  0100  0009
0001227200  827F  6405  6D75  796D  0100  0001  0180  0001
0001227220  0180  0001  0180  0001  0180  0001  0180  0001
*
0001230160  0180  0018  8579  02C0  8307  0452  5383  8204
0001230200  280A  6E75  6174  6767  6465  6929  0701  7800
0001230220  2085  8301  0084  1601  7F00  8683  8300  0342
0001230240  BA83  8303  0081  8183  8300  0082  5183  0104
0001230260  0038  827F  6902  0064  0482  616E  656D  8204
0001230300  7204  6365  2474  0482  7461  7274  822C  6405
0001230320  6D75  796D  822E  740A  6D69  5F65  7473  6D61
0001230340  3070  0582  7073  7261  3465  0101  8000  1801
0001230360  7900  6085  0603  5783  8304  0458  0A82  7528
0001230400  746E  6761  6567  2964  0169  0007  8578  0100
0001230420  4283  0103  0013  837F  0086  4283  8303  0085
0001230440  8583  8300  0451  5683  0104  0040  827F  6902
0001230460  0064  0482  616E  656D  8204  660C  746C  5F72
0001230500  616D  5F78  6E63  2474  0882  6C66  7274  635F
0001230520  746E  8226  7305  6170  6572  8228  660E  746C
0001230540  5F72  616E  656D  6C5F  7369  4C74  0101  8000
0001230560  0701  7A00  8373  0450  0082  0101  8000  0101
0001230600  8000  0101  8000  0101  8000  0101  8000  0101
0001230620  8000  0701  7A00  8373  045A  0082  0101  8000
0001230640  0101  8000  0101  8000  0701  7A00  8373  0455
0001230660  0082  0701  7A00  8373  0455  0082  0101  8000
0001230700  0101  8000  0101  8000  0101  8000  0701  7A00
0001230720  8373  0466  0082  0101  8000  0101  8000  0101
0001230740  8000  0101  8000  0101  8000  0101  8000  0101
0001230760  8000  0101  8000  0701  7A00  8373  00C6  0082
0001231000  0101  8000  0101  8000  0101  8000  0101  8000
*
0001231120  1801  7900  5085  0605  8B83  8304  048C  0A82
0001231140  7528  746E  6761  6567  2964  0169  0007  8578
0001231160  0400  8083  0100  0013  837F  048A  8183  8300
0001231200  0085  8583  8300  0086  4283  0103  0053  827F
0001231220  7007  736F  625F  6B6C  8200  620E  7274  5F76
0001231240  706F  6E65  6D5F  646F  8565  0080  0882  6966
0001231260  5F78  6973  657A  8285  8200  6B09  7965  695F
0001231300  5F73  6469  8485  8200  6C07  7361  5F74  6469
0001231320  8685  8200  6609  6C69  5F65  616E  656D  8A85
0001231340  0100  0001  0180  0001  0180  0007  8578  0800
0001231360  8083  0100  0001  0180  0001  0180  0001  0180
0001231400  0001  0180  0001  0180  0001  0180  0001  0180
*
0001232120  0001  0180  0001  0180  0001  0180  0018  8579
0001232140  0120  8303  04EB  EC83  8204  280A  6E75  6174
0001232160  6767  6465  6929  0A01  7F00  8583  8300  0081
0001232200  4283  0103  0020  827F  6108  6363  7365  6573
```

```
THU MAR 14 17:31:54 1991  DB_PI.DLL  PAGE 326, LINE 19176

0001232220  0064  0582  7564  6D6D  0279  0982  6966  656C
0001232240  6E5F  6D61  0465  1801  7900  0085  0108  EE83
0001232260  8304  04EF  0A82  7528  746E  6761  6567  2964
0001232300  0169  0004  837F  048F  0C01  7F00  0882  6964
0001232320  5F72  616E  656D  0100  0018  8579  4A10  8308
0001232340  04F3  F483  8204  280A  6E75  6174  6767  6465
0001232360  6929  0701  7800  F085  830F  0489  0701  7800
0001232400  0085  8318  04ED  1901  7F00  EA83  8304  04EA
0001232420  F183  8304  04F2  8983  8304  0489  8983  8304
0001232440  04F1  5301  7F00  0A82  7374  5F74  6373  6972
0001232460  7470  8200  740A  7473  685F  6165  6564  2472
0001232500  0382  6D69  4867  0782  6D69  5F67  6964  8572
0001232520  0246  0482  6C66  7274  4685  8205  6103  696F
0001232540  F085  8205  6504  6578  8563  069A  0782  6567
0001232560  656E  6972  8563  0744  0101  8000  1801  7900
0001232600  B085  0B53  F783  8304  04F8  0A82  7528  746E
0001232620  6761  6567  2964  0169  0022  837F  0086  4283
0001232640  8303  0081  8183  8300  03D3  8583  8300  0081
0001232660  8583  8300  0081  8F83  8304  04F0  6F01  7F00
0001232700  0282  6469  8200  6E04  6D61  0465  0B82  6361
0001232720  6563  7373  6D5F  646F  2465  0A82  6F6C  6B63
0001232740  735F  6F63  6570  8226  730A  6168  6572  695F
0001232760  666E  286F  0882  706F  6E65  635F  746E  822C
0001233000  7305  6170  6572  822E  6C08  636F  5F6B  6468
0001233020  306C  0682  7073  7261  3165  8232  6408  7269
0001233040  705F  7461  3468  0382  6473  8562  0134  0101
0001233060  8000  0101  8000  0701  7A00  8373  04F6  0082
0001233100  0101  8000  0101  8000  0101  8000  0101  8000
*
0001234260  0A01  7500  8380  0465  0073  0183  0102  0001
0001234300  0180  0001  0180  0005  5878  8083  0100  0005
0001234320  6078  8283  0100  000A  837F  0086  6683  8304
0001234340  0085  0A01  7500  8380  0081  0373  9D83  0105
0001234360  0005  5878  8083  0100  0005  3878  8083  0100
0001234400  0007  837F  0086  8683  0100  000A  8075  8183
0001234420  7300  8302  05A1  0101  8000  0501  7800  8370
0001234440  0080  0A01  7F00  8683  8300  0086  6B83  0104
0001234460  000A  8075  8183  7300  8303  05A5  0A01  7F00
0001234500  6B83  8304  0081  C083  0100  000A  8075  8183
0001234520  7300  8303  05A7  0101  8000  0701  7800  8085
0001234540  8300  0080  0A01  7F00  6B83  8304  0081  C083
0001234560  0100  000A  8075  8183  7300  8303  05AB  0D01
0001234600  7F00  8683  8300  0466  8183  8300  045A  0A01
0001234620  7500  8380  0081  0473  AD83  0105  000D  837F
0001234640  0086  6683  8304  00C5  6183  0104  000A  8075
0001234660  8183  7300  8304  05AF  0101  8000  0701  7800
0001234700  A085  8300  0080  0A01  7F00  8683  8300  00C5
0001234720  7483  0104  000A  8075  8183  7300  8303  05B3
0001234740  0101  8000  0101  8000  1601  7900  0330  0383
0001234760  8302  0204  0A82  7528  746E  6761  6567  2964
0001235000  0169  000A  837F  0081  8183  8300  0081  1C01
0001235020  7F00  0682  6170  6B63  685F  8200  6606  6C69
0001235040  5F65  0268  0682  7566  636E  685F  0104  0001
0001235060  0180  0001  0180  0001  0180  0001  0180  0001
*
0001235260  0180  0001  0180  0001  0180  0005  4878  8083
0001235300  0100  0005  2878  8083  0100  0001  0180  0001
0001235320  0180  0001  0180  0001  0180  0001  0180  0001
*
```

```
THU MAR 14 17:31:54 1991  DB_PI.DLL  PAGE 327, LINE 19235

0001235660  0180  0001  0180  0001  0180  0007  737A  6783
0001235700  8202  0100  000A  8075  8183  6400  8300  0201
0001235720  0101  8000  0101  8000  0101  8000  0101  8000
*
0001236640  0101  8000  0101  8000  0101  8000  1201  7900
0001236660  0560  E083  8302  02E1  0682  695F  626F  6675
0001236700  0169  0010  837F  00C0  8183  8300  00C0  8083
0001236720  8300  0080  2701  7F00  0482  705F  7274  8200
0001236740  5F04  6E63  0474  0582  625F  7361  0665  0582
0001236760  665F  616C  0A67  0582  665F  6C69  0B65  0501
0001237000  7800  8300  02DF  0701  7A00  8373  02DF  0082
0001237020  0101  8000  0101  8000  0101  8000  0101  8000
*
0001240460  0101  8000  0101  8000  1501  7900  0960  AF83
0001240500  8303  03B0  0982  445F  5441  5445  4D49  6945
0001240520  1C01  7F00  8483  8300  0084  8483  8300  0084
0001240540  8483  8300  0084  8583  8300  0081  8483  0100
0001240560  0054  827F  6805  756F  7372  8200  6D07  6E69
0001240600  7475  7365  8201  7307  6365  6E6F  7364  8202
0001240620  680A  6E75  7264  6465  6874  0373  0382  6164
0001240640  0479  0582  6F6D  746E  0568  0482  6579  7261
0001240660  8206  7408  6D69  7A65  6E6F  0865  0782  6577
0001240700  6B65  6164  0A79  0101  8000  0101  8000  0101
0001240720  8000  0101  8000  0101  8000  0101  8000  0101
*
0001244620  8000  0101  8000  0101  8000  0A01  7F00  E483
0001244640  8300  00E4  8283  0100  000A  8075  E483  7300
0001244660  8303  05A6  0101  8000  0501  7800  8350  0080
0001244700  0501  7800  8350  0080  0501  7800  8368  0080
0001244720  0501  7800  8360  0082  0A01  7F00  E483  8300
0001244740  00E4  8283  0100  000A  8075  8183  7300  8303
0001244760  05AD  0101  8000  0501  7800  8358  0080  0501
0001245000  7800  8320  0080  0A01  7F00  E483  8300  0081
0001245020  8283  0100  000A  8075  E483  7300  8303  05B2
0001245040  0A01  7F00  E483  8300  0081  8283  0100  000A
0001245060  8075  E483  7300  8303  05B4  0A01  7F00  E483
0001245100  8300  0081  8283  0100  000A  8075  E483  7300
0001245120  8303  05B6  0101  8000  0501  7800  8378  0080
0001245140  0D01  7F00  E483  8300  0082  8283  8300  02E3
0001245160  0A01  7500  8380  0082  0473  BA83  0105  0007
0001245200  8578  0088  8083  0100  0007  8578  02A8  8083
0001245220  0100  0007  8578  01A8  8083  0100  000D  837F
0001245240  00E4  8283  8300  0082  E383  0102  000A  8075
0001245260  8283  7300  8304  05BF  0701  7800  3085  8301
0001245300  0080  0701  7800  0885  8301  0080  0701  7800
0001245320  7085  8302  0080  0D01  7F00  E483  8300  0082
0001245340  8283  8300  02E3  0A01  7500  8380  0082  0473
0001245360  C483  0105  0005  4878  8083  0100  000D  837F
0001245400  00C0  C083  8300  0085  8583  0100  000A  8075
0001245420  8183  7300  8304  05C7  0A01  7500  8380  0081
0001245440  0064  0183  0102  0001  0180  0001  0180  0001
0001245460  0180  0001  0180  0001  0180  0001  0180  0001
*
0001245540  0180  0007  737A  C083  8200  0100  0001  0180
0001245560  0001  0180  0001  0180  0001  0180  0001  0180
*
0001246120  0001  0180  0001  0180  000A  8075  8183  6400
0001246140  8300  0201  0101  8000  0101  8000  0101  8000
0001246160  0101  8000  0101  8000  0101  8000  0101  8000
```

```
THU MAR 14 17:31:54 1991  DB_PI.DLL  PAGE 328, LINE 19294

*
0001246240  0101  8000  0101  8000  0101  8000  1201  7900
0001246260  0560  6083  8302  0261  0682  695F  626F  6675
0001246300  0169  0010  837F  00C0  8183  8300  00CD  8083
0001246320  8300  0080  2701  7F00  0482  705F  7274  8200
0001246340  5F04  6E63  0474  0582  625F  7361  0665  0582
0001246360  665F  616C  0A67  0582  665F  6C69  0B65  0101
0001246400  8000  0701  7A00  8373  025F  0082  0101  8000
0001246420  0101  8000  0101  8000  0101  8000  0101  8000
*
0001247740  0101  8000  0101  8000  0701  7800  0085  8301
0001247760  0080  0101  8000  0101  8000  0101  8000  0101
0001250000  8000  0101  8000  0101  8000  0101  8000  0101
*
0001250740  8000  0101  8000  0101  8000  0101  8000  1601
0001250760  7900  0220  9C83  8303  039D  0A82  7528  746E
0001251000  6761  6567  2964  0169  0007  837F  0081  8183
0001251020  0100  0009  827F  7801  8200  7901  0102  0001
0001251040  0180  0001  0180  0001  0180  0001  0180  0001
*
0001251200  0180  0016  2079  8301  03B8  B983  8203  280A
0001251220  6E75  6174  6767  6465  6929  0401  7F00  8683
0001251240  0100  0009  827F  6405  6D75  796D  0100  0001
0001251260  0180  0001  0180  0001  0180  0001  0180  0001
*
0001251700  0180  0016  3079  8303  0400  0183  8204  280A
0001251720  6E75  6174  6767  6465  6929  0A01  7F00  8583
0001251740  8300  0085  8583  0100  001A  827F  7705  6469
0001251760  6874  8200  6806  6965  6867  0274  0582  6564
0001252000  7470  0468  1801  7900  4085  0801  0483  8304
0001252020  0405  0A82  7528  746E  6761  6567  2964  0169
0001252040  0007  8578  0080  8483  0100  0019  837F  0081
0001252060  FF83  8303  0085  8583  8300  00C4  8283  8300
0001252100  00E4  0383  0104  005A  827F  7206  7065  6572
0001252120  0073  0682  6964  656D  736E  8202  6410  7461
0001252140  5F61  616C  6579  5F72  6564  7470  0868  0882
0001252160  6973  5F67  6973  657A  820A  7307  6769  705F
0001252200  7274  820C  6209  6D74  5F70  6973  657A  8210
0001252220  6208  6D74  5F70  7470  1472  0582  7073  7261
0001252240  1865  0101  8000  1801  7900  A085  0C05  0983
0001252260  8304  040A  0A82  7528  746E  6761  6567  2964
0001252300  0169  0007  8578  0180  8483  0100  0025  837F
0001252320  0086  1B83  8303  031B  8683  8300  0081  8583
0001252340  8300  0086  8283  8300  0086  9B83  8303  0402
0001252360  0883  0104  007E  827F  6902  0064  0482  616E
0001252400  656D  8204  6609  6C69  5F65  616E  656D  8224
0001252420  6509  7078  745F  5F63  6469  8244  7404  7079
0001252440  4865  0C82  6572  5F66  696C  656E  6E5F  6D75
0001252460  824A  7209  6665  745F  5F63  6469  824C  740A
0001252500  6D69  5F65  7473  6D61  5070  0682  6F61  5F69
0001252520  6469  8254  6C08  636F  7461  6F69  586E  0982
0001252540  7462  706D  695F  666E  5C6F  0582  7073  7261
0001252560  8565  0084  0101  8000  0101  8000  0101  8000
0001252600  0101  8000  0101  8000  0101  8000  0101  8000
0001252620  0101  8000  0101  8000  0101  8000  0701  7A00
0001252640  8373  0407  0082  0101  8000  0101  8000  0101
0001252660  8000  0101  8000  0101  8000  0101  8000  0101
*
0001253460  8000  0101  8000  0101  8000  0101  8000  0701
```

THU MAR 14 17:31:54 1991 DB_PI.DLL PAGE 329, LINE 19353

```
0001253500  7A00  8373  00C6  0082  0101  8000  0101  8000
0001253520  0101  8000  0101  8000  0101  8000  0101  8000
*
0001253600  0101  8000  0101  8000  1801  7900  5085  0605
0001253620  8F83  8304  0490  0A82  7528  746E  6761  6567
0001253640  2964  0169  0007  8578  0400  8083  0100  0013
0001253660  837F  048E  8183  8300  0085  8583  8300  0086
0001253700  1B83  0103  0053  827F  7007  736F  625F  6B6C
0001253720  8200  620E  7274  5F76  706F  6E65  6D5F  646F
0001253740  8565  0080  0882  6966  5F78  6973  657A  8285
0001253760  8200  6B09  7965  695F  5F73  6469  8485  8200
0001254000  6C07  7361  5F74  6469  8685  8200  6609  6C69
0001254020  5F65  616E  656D  8A85  0100  0001  0180  0018
0001254040  8579  1300  8307  0494  9583  8204  280A  6E75
0001254060  6174  6767  6465  6929  0701  7800  0085  8308
0001254100  0080  1601  7F00  8683  8300  0493  8D83  8304
0001254120  048D  8683  8300  0085  8183  0100  0052  827F
0001254140  6405  6972  6576  8200  6D07  7061  645F  7269
0001254160  8204  6F0B  6A62  745F  6C62  685F  6C64  0485
0001254200  8201  720B  6C65  745F  6C62  685F  6C64  AE85
0001254220  8201  7705  5F66  6469  5885  8202  6C06  636F
0001254240  656B  8564  025C  0582  7564  6D6D  8579  025E
0001254260  1801  7900  3085  0301  9783  8304  0498  0A82
0001254300  7528  746E  6761  6567  2964  0169  000A  837F
0001254320  031B  C083  8300  0085  1501  7F00  0382  656B
0001254340  0079  0482  7469  6D65  8220  7304  7A69  2465
0001254360  1601  7900  0340  9B83  8304  049C  0A82  7528
0001254400  746E  6761  6567  2964  0169  0007  737A  9683
0001254420  8204  0100  000A  837F  0085  8583  8300  049A
0001254440  1C01  7F00  0982  6C61  6F6C  6163  6574  0064
0001254460  0482  7375  6465  8202  6505  746E  7972  0104
0001254500  0016  4079  8303  049F  A083  8204  280A  6E75
0001254520  6174  6767  6465  6929  0701  7A00  8373  0499
0001254540  0082  0A01  7F00  8583  8300  049E  8583  0100
0001254560  0023  827F  7304  7A69  0065  0682  7562  6B63
0001254600  7465  8202  620F  6375  656B  5F74  6E69  5F63
0001254620  6973  657A  0106  0001  0180  0001  0180  0001
0001254640  0180  0001  0180  0001  0180  0001  0180  0001
*
0001255060  0180  0001  0180  0001  0180  0007  737A  CB83
0001255100  8204  0100  0007  737A  9D83  8204  0100  0001
0001255120  0180  0001  0180  0001  0180  0001  0180  0001
*
0001255220  0180  0001  0180  0007  737A  9283  8204  0100
0001255240  0001  0180  0001  0180  0001  0180  0001  0180
*
0001255460  0018  8579  0220  8304  0504  0583  8205  280A
0001255500  6E75  6174  6767  6465  6929  0D01  7F00  1B83
0001255520  8303  031B  8183  8300  0081  3101  7F00  0982
0001255540  7375  7265  6E5F  6D61  0065  0B82  7061  6C70
0001255560  6369  6E5F  6D61  2065  0B82  7061  6C70  6369
0001255600  745F  7079  4065  0582  7564  6D6D  4279  0101
0001255620  8000  1601  7900  0460  0883  8305  0509  0A82
0001255640  7528  746E  6761  6567  2964  0169  000D  837F
0001255660  0086  8583  8300  0085  DE83  0104  0035  827F
0001255700  770D  726F  696B  676E  645F  6972  6576  8200
0001255720  6D09  7861  635F  756F  746E  8204  740A  6572
0001255740  5F65  6F63  6E75  0674  0882  7274  6565  6C5F
0001255760  7473  0108  0016  6079  8304  050B  0C83  8205
```

THU MAR 14 17:31:54 1991 DB_PI.DLL PAGE 330, LINE 19412

| | | | | | | | | |
|---|---|---|---|---|---|---|---|---|
| 0001256000 | 280A | 6E75 | 6174 | 6767 | 6465 | 6929 | 0D01 | 7F00 |
| 0001256020 | 8583 | 8300 | 0210 | 8583 | 8300 | 00C6 | 2601 | 7F00 |
| 0001256040 | 0882 | 6170 | 6874 | 635F | 746E | 8200 | 7008 | 7461 |
| 0001256060 | 5F68 | 736C | 0274 | 0382 | 6E63 | 0674 | 0682 | 6469 |
| 0001256100 | 6C5F | 7473 | 0108 | 0001 | 0180 | 0018 | 8579 | 0570 |
| 0001256120 | 8302 | 050F | 1083 | 8205 | 280A | 6E75 | 6174 | 6767 |
| 0001256140 | 6465 | 6929 | 0701 | 7F00 | 8D83 | 8304 | 00C0 | 2201 |
| 0001256160 | 7F00 | 0782 | 696C | 5F62 | 6274 | 006C | 1282 | 696C |
| 0001256200 | 5F62 | 6F66 | 646C | 7265 | 6C5F | 676F | 616E | 656D |
| 0001256220 | AA85 | 0100 | 0001 | 0180 | 0018 | 8579 | 0120 | 8303 |
| 0001256240 | 0513 | 1483 | 8205 | 280A | 6E75 | 6174 | 6767 | 6465 |
| 0001256260 | 6929 | 0A01 | 7F00 | 8583 | 8300 | 0081 | 1B83 | 0103 |
| 0001256300 | 0020 | 827F | 6108 | 6363 | 7365 | 6573 | 0064 | 0582 |
| 0001256320 | 7564 | 6D6D | 0279 | 0982 | 6966 | 656C | 6E5F | 6D61 |
| 0001256340 | 0465 | 1801 | 7900 | 0085 | 0108 | 1683 | 8305 | 0517 |
| 0001256360 | 0A82 | 7528 | 746E | 6761 | 6567 | 2964 | 0169 | 0004 |
| 0001256400 | 837F | 0493 | 0C01 | 7F00 | 0882 | 6964 | 5F72 | 616E |
| 0001256420 | 656D | 0100 | 0018 | 8579 | 4A10 | 8308 | 051B | 1C83 |
| 0001256440 | 8205 | 280A | 6E75 | 6174 | 6767 | 6465 | 6929 | 0701 |
| 0001256460 | 7800 | F085 | 830F | 048D | 0701 | 7800 | 0085 | 8318 |
| 0001256500 | 0515 | 1901 | 7F00 | 1283 | 8305 | 0512 | 1983 | 8305 |
| 0001256520 | 051A | 8D83 | 8304 | 048D | 8D83 | 8304 | 0519 | 5301 |
| 0001256540 | 7F00 | 0A82 | 7374 | 5F74 | 6373 | 6972 | 7470 | 8200 |
| 0001256560 | 740A | 7473 | 685F | 6165 | 6564 | 2472 | 0382 | 6D69 |
| 0001256600 | 4867 | 0782 | 6D69 | 5F67 | 6964 | 8572 | 0246 | 0482 |
| 0001256620 | 6C66 | 7274 | 4685 | 8205 | 6103 | 696F | F085 | 8205 |
| 0001256640 | 6504 | 6578 | 8563 | 069A | 0782 | 6567 | 656E | 6972 |
| 0001256660 | 8563 | 0744 | 0101 | 8000 | 1801 | 7900 | B085 | 0B53 |
| 0001256700 | 1F83 | 8305 | 0520 | 0A82 | 7528 | 746E | 6761 | 6567 |
| 0001256720 | 2964 | 0169 | 0022 | 837F | 0086 | 1B83 | 8303 | 0081 |
| 0001256740 | 8183 | 8300 | 03B7 | 8583 | 8300 | 0081 | 8583 | 8300 |
| 0001256760 | 0081 | 9383 | 8304 | 0518 | 6F01 | 7F00 | 0282 | 6469 |
| 0001257000 | 8200 | 6E04 | 6D61 | 0465 | 0B82 | 6361 | 6563 | 7373 |
| 0001257020 | 6D5F | 646F | 2465 | 0A82 | 6F6C | 6B63 | 735F | 6F63 |
| 0001257040 | 6570 | 8226 | 730A | 6168 | 6572 | 695F | 666E | 286F |
| 0001257060 | 0882 | 706F | 6E65 | 635F | 746E | 822C | 7305 | 6170 |
| 0001257100 | 6572 | 822E | 6C08 | 636F | 5F6B | 6468 | 306C | 0682 |
| 0001257120 | 7073 | 7261 | 3165 | 8232 | 6408 | 7269 | 705F | 7461 |
| 0001257140 | 3468 | 0382 | 6473 | 8562 | 0134 | 0101 | 8000 | 1801 |
| 0001257160 | 7900 | F085 | 1007 | 2483 | 8305 | 0525 | 0A82 | 7528 |
| 0001257200 | 746E | 6761 | 6567 | 2964 | 0169 | 0007 | 737A | 1E83 |
| 0001257220 | 8205 | 0100 | 0031 | 837F | 0085 | 8583 | 8300 | 0086 |
| 0001257240 | 2383 | 8305 | 0407 | 1583 | 8304 | 0081 | 8183 | 8300 |
| 0001257260 | 0085 | 8183 | 8300 | 0263 | 6383 | 8302 | 031B | 8183 |
| 0001257300 | 8300 | 00E4 | E483 | 0100 | 00D8 | 827F | 7504 | 6573 |
| 0001257320 | 0064 | 0982 | 6361 | 6563 | 7373 | 6F5F | 0270 | 0682 |
| 0001257340 | 7374 | 5F74 | 6469 | 8204 | 7407 | 7473 | 705F | 7274 |
| 0001257360 | 8208 | 6907 | 676D | 685F | 7264 | 820C | 690B | 676D |
| 0001257400 | 625F | 6675 | 705F | 7274 | C085 | 8200 | 610B | 6363 |
| 0001257420 | 7365 | 5F73 | 6F6D | 6564 | C485 | 8200 | 630B | 6572 |
| 0001257440 | 7461 | 5F65 | 6F6D | 6564 | C685 | 8200 | 620A | 6361 |
| 0001257460 | 676B | 6F72 | 6E75 | 8564 | 00C8 | 0882 | 6F63 | 706D |
| 0001257500 | 6572 | 7373 | CA85 | 8200 | 6F07 | 6570 | 5F6E | 7066 |
| 0001257520 | CC85 | 8200 | 7407 | 6D65 | 5F70 | 7066 | D085 | 8200 |
| 0001257540 | 740E | 6D65 | 5F70 | 6966 | 656C | 6E5F | 6D61 | 8565 |
| 0001257560 | 00D4 | 0D82 | 6162 | 6B63 | 7267 | 756F | 646E | 735F |
| 0001257600 | 8574 | 00F4 | 0982 | 616C | 6579 | 5F72 | 7470 | 8572 |
| 0001257620 | 00F6 | 0B82 | 7773 | 7061 | 625F | 6675 | 6566 | 8572 |
| 0001257640 | 00FA | 0101 | 8000 | 1601 | 7900 | 0340 | 2983 | 8305 |

THU MAR 14 17:31:54 1991  DB_PI.DLL  PAGE 331, LINE 19471

| | | | | | | | | |
|---|---|---|---|---|---|---|---|---|
| 0001257660 | 052A | 0A82 | 7528 | 746E | 6761 | 6567 | 2964 | 0169 |
| 0001257700 | 0007 | 737A | 2283 | 8205 | 0100 | 000A | 837F | 0085 |
| 0001257720 | 8583 | 8300 | 0528 | 1F01 | 7F00 | 0782 | 6D69 | 5F67 |
| 0001257740 | 6E63 | 0074 | 0782 | 616D | 5F78 | 6E63 | 0274 | 0782 |
| 0001257760 | 6D69 | 5F67 | 736C | 0474 | 0101 | 8000 | 1601 | 7900 |
| 0001260000 | 0350 | 2D83 | 8305 | 052E | 0A82 | 7528 | 746E | 6761 |
| 0001260020 | 6567 | 2964 | 0169 | 000A | 837F | 0086 | 8583 | 8300 |
| 0001260040 | 04CB | 2301 | 7F00 | 0682 | 626F | 5F6A | 6469 | 8200 |
| 0001260060 | 6C0A | 616F | 5F64 | 6F63 | 6E75 | 0474 | 0982 | 6174 |
| 0001260100 | 6C62 | 5F65 | 7470 | 0672 | 1601 | 7900 | 0230 | 3183 |
| 0001260120 | 8305 | 0532 | 0A82 | 7528 | 746E | 6761 | 6567 | 2964 |
| 0001260140 | 0169 | 0007 | 737A | 2C83 | 8205 | 0100 | 0007 | 837F |
| 0001260160 | 0530 | 8583 | 0100 | 0025 | 827F | 730E | 6D79 | 6F62 |
| 0001260200 | 5F6C | 6274 | 5F6C | 736C | 0074 | 1082 | 6174 | 6C62 |
| 0001260220 | 7365 | 615F | 6C6C | 636F | 7461 | 6465 | 0104 | 0016 |
| 0001260240 | 4079 | 8302 | 0534 | 3583 | 8205 | 280A | 6E75 | 6174 |
| 0001260260 | 6767 | 6465 | 6929 | 0701 | 7F00 | 8683 | 8300 | 0523 |
| 0001260300 | 1401 | 7F00 | 0682 | 7374 | 5F74 | 6469 | 8200 | 7407 |
| 0001260320 | 7473 | 705F | 7274 | 0104 | 0001 | 0180 | 0018 | 8579 |
| 0001260340 | 16B0 | 830D | 0539 | 3A83 | 8205 | 280A | 6E75 | 6174 |
| 0001260360 | 6767 | 6465 | 6929 | 0501 | 7800 | 8340 | 0533 | 2801 |
| 0001260400 | 7F00 | 8583 | 8300 | 0081 | 0383 | 8305 | 0507 | 2783 |
| 0001260420 | 8305 | 050E | 0E83 | 8305 | 050A | 2F83 | 8305 | 0493 |
| 0001260440 | 8583 | 8300 | 0085 | 3883 | 0105 | 00A3 | 827F | 730A |
| 0001260460 | 7365 | 6973 | 6E6F | 6F5F | 006E | 0582 | 7564 | 6D6D |
| 0001260500 | 0279 | 0682 | 6C63 | 6569 | 746E | 8204 | 7405 | 6572 |
| 0001260520 | 7365 | 8248 | 6F08 | 6570 | 5F6E | 6D69 | 5467 | 0882 |
| 0001260540 | 6C66 | 7274 | 6C5F | 6269 | 825C | 6908 | 6F63 | 5F6E |
| 0001260560 | 696C | 8562 | 010A | 0682 | 7073 | 685F | 7264 | B885 |
| 0001260600 | 8201 | 630A | 6E6F | 6966 | 5F67 | 736C | 8574 | 01C4 |
| 0001260620 | 0A82 | 6264 | 705F | 5F69 | 6170 | 6874 | CA85 | 8201 |
| 0001260640 | 6D0E | 7861 | 745F | 7365 | 5F74 | 6F63 | 6E75 | 8574 |
| 0001260660 | 02CA | 0A82 | 6574 | 7473 | 635F | 756F | 746E | CC85 |
| 0001260700 | 8202 | 7409 | 7365 | 5F74 | 696C | 7473 | CE85 | 0102 |
| 0001260720 | 0001 | 0180 | 0001 | 0180 | 0001 | 0180 | 0001 | 0180 |
| 0001260740 | 0007 | 737A | 4083 | 8205 | 0100 | 0007 | 737A | 3783 |
| 0001260760 | 8205 | 0100 | 0001 | 0180 | 0001 | 0180 | 0007 | 737A |
| 0001261000 | 2383 | 8205 | 0100 | 0001 | 0180 | 0001 | 0180 | 0001 |
| 0001261020 | 0180 | 0001 | 0180 | 0001 | 0180 | 0001 | 0180 | 0001 |
| 0001261040 | 0180 | 0001 | 0180 | 0007 | 737A | DE83 | 6204 | 0100 |
| 0001261060 | 0001 | 0180 | 0001 | 0180 | 0001 | 0180 | 0001 | 0180 |
| * | | | | | | | | |
| 0001261120 | 0007 | 737A | 2883 | 8205 | 0100 | 0001 | 0180 | 0001 |
| 0001261140 | 0180 | 0001 | 0180 | 0001 | 0180 | 0001 | 0180 | 0001 |
| * | | | | | | | | |
| 0001261200 | 0180 | 0007 | 737A | 6183 | 8205 | 0100 | 0007 | 737A |
| 0001261220 | 0E83 | 8205 | 0100 | 0001 | 0180 | 0001 | 0180 | 0001 |
| 0001261240 | 0180 | 0001 | 0180 | 0001 | 0180 | 0001 | 0180 | 0001 |
| 0001261260 | 0180 | 0001 | 0180 | 0005 | 3078 | 8583 | 0100 | 0001 |
| 0001261300 | 0180 | 0005 | 2078 | 8083 | 0100 | 0005 | 2078 | 8083 |
| 0001261320 | 0100 | 0004 | 837F | 053F | 0A01 | 7500 | 8380 | 0081 |
| 0001261340 | 0164 | 6E83 | 0105 | 0005 | 3878 | 8083 | 0100 | 0005 |
| 0001261360 | 3078 | 8083 | 0100 | 000A | 8075 | 8183 | 6400 | 8300 |
| 0001261400 | 0201 | 0401 | 7F00 | 3F83 | 0105 | 000A | 8075 | 8183 |
| 0001261420 | 6400 | 8301 | 0573 | 0A01 | 7500 | 8380 | 0085 | 0064 |
| 0001261440 | 0183 | 0102 | 000A | 837F | 0086 | 8183 | 8300 | 0543 |
| 0001261460 | 0A01 | 7500 | 8380 | 0081 | 0364 | 7683 | 0105 | 0007 |
| 0001261500 | 837F | 0086 | 4383 | 0105 | 000A | 8075 | 8183 | 6400 |
| 0001261520 | 8302 | 0578 | 0401 | 7F00 | 8683 | 0100 | 000A | 8075 |

THU MAR 14 17:31:54 1991 DB_PI.DLL PAGE 332, LINE 19530

```
0001261540  8183  6400  8301  057A  0701  7F00  8683  8300
0001261560  04DE  0A01  7500  8380  0081  0264  7C83  0105
0001261600  0005  6878  8083  0100  0005  5878  8083  0100
0001261620  0005  6078  8083  0100  0007  837F  0086  4C83
0001261640  0105  000A  8075  8183  6400  8302  0581  0701
0001261660  7F00  8683  8300  054C  0A01  7500  8380  0081
0001261700  0264  8383  0105  0004  837F  0086  0A01  7500
0001261720  8380  0081  0164  8583  0105  0007  837F  0086
0001261740  4C83  0105  000A  8075  8183  6400  8302  0587
0001261760  0D01  7F00  C083  8300  0086  4C83  8305  0210
0001262000  0A01  7500  8380  0081  0464  8983  0105  0004
0001262020  837F  0086  0A01  7500  8380  0081  0164  8B83
0001262040  0105  000A  8075  8183  6400  8300  0201  0701
0001262060  7F00  C083  8300  00C6  0A01  7500  8380  0081
0001262100  0264  8E83  0105  0007  837F  0086  C083  0100
0001262120  000A  8075  8183  6400  8302  0590  0401  7F00
0001262140  8683  0100  000A  8075  8183  6400  8301  0592
0001262160  0A01  7500  8380  0081  0064  0183  0102  0007
0001262200  8578  0080  8083  0100  0007  8578  00A8  8083
0001262220  0100  0007  8578  00B0  8083  0100  0007  8578
0001262240  0090  8083  0100  0005  7878  8083  0100  000A
0001262260  837F  04DE  C083  8300  00C0  0A01  7500  8380
0001262300  0081  0364  9A83  0105  000A  8075  8183  6400
0001262320  8300  0201  0A01  7F00  8683  8300  00C5  5583
0001262340  0105  000A  8075  8183  6400  8303  059D  0A01
0001262360  7F00  8683  8300  0085  5583  0105  000A  8075
0001262400  8183  6400  8303  059F  0701  7F00  8683  8300
0001262420  0085  0A01  7500  8380  0081  0264  A183  0105
0001262440  0004  837F  0086  0A01  7500  8380  0081  0164
0001262460  A383  0105  0004  837F  00C0  0A01  7500  8380
0001262500  0200  0164  A583  0105  000A  8075  8183  6400
0001262520  8300  0201  0A01  7F00  8683  8300  0085  CA83
0001262540  0104  000A  8075  8183  6400  8303  05A8  0701
0001262560  7F00  8683  8300  0085  0A01  7500  8380  0081
0001262600  0264  AA83  0105  0007  837F  0086  CA83  0104
0001262620  000A  8075  8183  6400  8302  05AC  0401  7F00
0001262640  6083  0105  000A  8075  8183  6400  8301  05AE
0001262660  0401  7F00  6083  0105  000A  8075  8183  6400
0001262700  8301  05B0  0701  7F00  C583  8300  047C  0A01
0001262720  7500  8380  0081  0264  B283  0105  0007  837F
0001262740  0085  1083  0102  000A  8075  8183  6400  8302
0001262760  05B4  0A01  7500  8380  0081  0064  0183  0102
0001263000  0004  837F  0081  0A01  7500  8380  0085  0164
0001263020  B783  0105  0001  0180  0001  0180  0001  0180
0001263040  0001  0180  0001  0180  0001  0180  0001  0180
*
0001265000  0001  0180  0001  0180  0001  0180  0007  8578
0001265020  0100  8083  0100  0001  0180  0001  0180  0001
0001265040  0180  0001  0180  0001  0180  0001  0180  0001
*
0001265740  0180  0001  0180  0016  2079  8302  0374  7583
0001265760  8203  280A  6E75  6174  6767  6465  6929  0701
0001266000  7F00  8183  8300  0081  0901  7F00  0182  0078
0001266020  0182  0279  0101  8000  0101  8000  0101  8000
0001266040  0101  8000  0101  8000  0101  8000  0101  8000
*
0001266140  0101  8000  0101  8000  1801  7900  2085  0201
0001266160  8C83  8303  038D  0A82  7528  746E  6761  6567
0001266200  2964  0169  0007  837F  0086  FE83  0102  0015
```

THU MAR 14 17:31:54 1991 DB_PI.DLL PAGE 333, LINE 19589

```
0001266220  827F  6F06  6A62  695F  0064  0882  626F  5F6A
0001266240  616E  656D  0104  0001  0180  0016  2079  8301
0001266260  0390  9183  8203  280A  6E75  6174  6767  6465
0001266300  6929  0401  7F00  8683  0100  0009  827F  6405
0001266320  6D75  796D  0100  0001  0180  0001  0180  0001
0001266340  0180  0001  0180  0001  0180  0001  0180  0001
*
0001266700  0180  0001  0180  0001  0180  0007  737A  D083
0001266720  8203  0100  0007  737A  8B83  8203  0100  0001
0001266740  0180  0001  0180  0001  0180  0001  0180  0001
0001266760  0180  0001  0180  0016  3079  8303  03D8  D983
0001267000  8203  280A  6E75  6174  6767  6465  6929  0A01
0001267020  7F00  8583  8300  0085  8583  0100  001A  827F
0001267040  7705  6469  6874  8200  6806  6965  6867  0274
0001267060  0582  6564  7470  0468  1801  7900  4085  0801
0001267100  DC83  8303  03DD  0A82  7528  746E  6761  6567
0001267120  2964  0169  0007  8578  0080  8483  0100  0019
0001267140  837F  0081  D783  8303  0085  8583  8300  00C4
0001267160  8283  8300  00E4  DB83  0103  005A  827F  7206
0001267200  7065  6572  0073  0682  6964  656D  736E  8202
0001267220  6410  7461  5F61  616C  6579  5F72  6564  7470
0001267240  0868  0882  6973  5F67  6973  657A  820A  7307
0001267260  6769  705F  7274  820C  6209  6D74  5F70  6973
0001267300  657A  8210  6208  6D74  5F70  7470  1472  0582
0001267320  7073  7261  1865  0101  8000  1801  7900  A085
0001267340  0C05  E183  8303  03E2  0A82  7528  746E  6761
0001267360  6567  2964  0169  0007  8578  0180  8483  0100
0001267400  0025  837F  0086  FE83  8302  02FE  8683  8300
0001267420  0081  8583  8300  0086  8283  8300  0086  7383
0001267440  8303  03DA  E083  0103  007E  827F  6902  0064
0001267460  0482  616E  656D  8204  6609  6C69  5F65  616E
0001267500  656D  8224  6509  7078  745F  5F63  6469  8244
0001267520  7404  7079  6365  0C82  6572  5F66  696C  656E
0001267540  6E5F  6D75  824A  7209  6665  745F  5F63  6469
0001267560  824C  740A  6D69  5F65  7473  6D61  5070  0682
0001267600  6F61  5F69  6469  8254  6C08  636F  7461  6F69
0001267620  586E  0982  7462  706D  695F  666E  5C6F  0582
0001267640  7073  7261  8565  0084  0101  8000  0101  8000
0001267660  0101  8000  0101  8000  0101  8000  0101  8000
*
0001267720  0701  7A00  8373  03DF  0082  0101  8000  0101
0001267740  8000  0101  8000  0101  8000  0101  8000  0101
*
0001270660  8000  1801  7900  5085  0605  6683  8304  0467
0001270700  0A82  7528  746E  6761  6567  2964  0169  0007
0001270720  8578  0400  8083  0100  0013  837F  0465  8183
0001270740  8300  0085  8583  8300  0086  FE83  0102  0053
0001270760  827F  7007  736F  625F  6B6C  8200  620E  7274
0001271000  5F76  706F  6E65  6D5F  646F  8565  0080  0882
0001271020  6966  5F78  6973  657A  8285  8200  6B09  7965
0001271040  695F  5F73  6469  8485  8200  6C07  7361  5F74
0001271060  6469  8685  8200  6609  6C69  5F65  616E  656D
0001271100  8A85  0100  0001  0180  0001  0180  0007  8578
0001271120  0800  8083  0100  0001  0180  0001  0180  0001
0001271140  0180  0001  0180  0001  0180  0001  0180  0001
*
0001271260  0180  0007  737A  6483  8204  0100  0001  0180
0001271300  0001  0180  0001  0180  0001  0180  0001  0180
*
```

THU MAR 14 17:31:54 1991 DB_PI.DLL PAGE 334, LINE 19648

```
0001271700  0001  0180  0018  8579  0120  8303  04C6  C783
0001271720  8204  280A  6E75  6174  6767  6465  6929  0A01
0001271740  7F00  8583  8300  0081  FE83  0102  0020  827F
0001271760  6108  6363  7365  6573  0064  0582  7564  6D6D
0001272000  0279  0982  6966  656C  6E5F  6D61  0465  1801
0001272020  7900  0085  0108  C983  8304  04CA  0A82  7528
0001272040  746E  6761  6567  2964  0169  0004  837F  046A
0001272060  0C01  7F00  0882  6964  5F72  616E  656D  0100
0001272100  0018  8579  4A10  8308  04CE  CF83  8204  280A
0001272120  6E75  6174  6767  6465  6929  0701  7800  F085
0001272140  830F  0464  0701  7800  0085  8318  04C8  1901
0001272160  7F00  C583  8304  04C5  CC83  8304  04CD  6483
0001272200  8304  0464  6483  8304  04CC  5301  7F00  0A82
0001272220  7374  5F74  6373  6972  7470  8200  740A  7473
0001272240  685F  6165  6564  2472  0382  6D69  4867  0782
0001272260  6D69  5F67  6964  8572  0246  0482  6C66  7274
0001272300  4685  8205  6103  696F  F085  8205  6504  6578
0001272320  8563  069A  0782  6567  656E  6972  8563  0744
0001272340  0101  8000  1801  7900  B085  0B53  D283  8304
0001272360  04D3  0A82  7528  746E  6761  6567  2964  0169
0001272400  0022  837F  0086  FE83  8302  0081  8183  8300
0001272420  038F  8583  8300  0081  8583  8300  0081  6A83
0001272440  8304  04CB  6F01  7F00  0282  6469  8200  6E04
0001272460  6D61  0465  0B82  6361  6563  7373  6D5F  646F
0001272500  2465  0A82  6F6C  6B63  735F  6F63  6570  8226
0001272520  730A  6168  6572  695F  666E  286F  0882  706F
0001272540  6E65  635F  746E  822C  7305  6170  6572  822E
0001272560  6C08  636F  5F6B  6468  306C  0682  7073  7261
0001272600  3165  8232  6408  7269  705F  7461  3468  0382
0001272620  6473  8562  0134  0101  8000  0101  8000  0701
0001272640  7A00  8373  04D1  0082  0101  8000  0101  8000
0001272660  0101  8000  0101  8000  0101  8000  0101  8000
*
0001273000  0101  8000  0101  8000  1801  7900  3085  0301
0001273020  F083  8304  04F1  0A82  7528  746E  6761  6567
0001273040  2964  0169  000A  837F  02FE  8683  8300  0081
0001273060  1801  7F00  0482  616E  656D  8200  6F06  6A62
0001273100  695F  2064  0482  7473  7461  0124  0001  0180
0001273120  0001  0180  0001  0180  0001  0180  0001  0180
*
0001273560  0001  0180  0001  0180  0001  0180  0007  737A
0001273600  3F83  8205  0100  0007  737A  EF83  8204  0100
0001273620  0001  0180  0001  0180  0001  0180  0001  0180
*
0001274360  0018  8579  0140  8303  0599  9A83  8205  280A
0001274400  6E75  6174  6767  6465  6929  0A01  7F00  FE83
0001274420  8302  0086  8283  0100  001A  827F  6E04  6D61
0001274440  0065  0282  6469  8220  740A  6D69  5F65  7473
0001274460  6D61  2470  0701  7A00  8373  059C  0082  0701
0001274500  7A00  8373  0598  0082  0101  8000  0101  8000
0001274520  0701  7A00  8373  00C4  0082  0101  8000  0101
0001274540  8000  0101  8000  0101  8000  0101  8000  0101
0001274560  8000  0D01  7F00  D683  8304  03ED  8583  8300
0001274600  0081  0A01  7500  8380  0081  0464  A683  0105
0001274620  0013  837F  04D6  C083  8300  0081  8683  8300
0001274640  0081  ED83  0103  000A  8075  8183  6400  8306
0001274660  05A8  0701  7F00  D683  8304  03ED  0A01  7500
0001274700  8380  0081  0264  AA83  0105  0013  837F  00C0
0001274720  8683  8300  0082  C583  8300  00C5  9B83  0105
```

THU MAR 14 17:31:54 1991 DB_PI.DLL PAGE 335, LINE 19707

```
0001274740  000A  8075  8183  6400  8306  05AC  0A01  7F00
0001274760  8583  8300  0085  9F83  0105  000A  8075  8183
0001275000  6400  8303  05AE  0701  7F00  9C83  8305  059C
0001275020  0A01  7500  8380  0081  0264  B083  0105  0007
0001275040  837F  059C  9C83  0105  000A  8075  8183  6400
0001275060  8302  05B2  0A01  7F00  9B83  8305  0085  CF83
0001275100  0103  000A  8075  8183  6400  8303  05B4  1001
0001275120  7F00  D683  8304  0081  8183  8300  00C5  CF83
0001275140  0103  000A  8075  8183  6400  8305  05B6  0701
0001275160  7A00  8373  05B9  0082  0A01  7500  8380  0081
0001275200  0264  BA83  0105  0007  837F  059C  9C83  0105
0001275220  000D  837F  0482  C083  8300  0081  C083  0100
0001275240  000A  8075  8183  6400  8304  05BB  0A01  7F00
0001275260  D683  8304  0081  8183  0100  000A  8075  8183
0001275300  6400  8303  05BD  0701  7F00  D683  8304  0081
0001275320  0A01  7500  8380  0081  0264  BF83  0105  0004
0001275340  837F  04D6  0A01  7500  8380  0081  0164  C183
0001275360  0105  0005  4078  8083  0100  0005  1078  8083
0001275400  0100  0007  837F  04D6  ED83  0103  000A  8075
0001275420  8183  6400  8302  05C5  0701  7F00  D683  8304
0001275440  0081  0A01  7500  8380  0081  0264  C783  0105
0001275460  0007  837F  04D6  0083  0100  000A  8075  8183
0001275500  6400  8302  05C9  0A01  7F00  D683  8304  0081
0001275520  C683  0100  000A  8075  8183  6400  8303  05CB
0001275540  0701  7F00  D683  8304  0086  0A01  7500  8380
0001275560  0081  0264  CD83  0105  0019  837F  04D6  C083
0001275600  8300  0081  8583  8300  0081  8583  8300  03ED
0001275620  C683  0100  000A  8075  8183  6400  8308  05CF
0001275640  1001  7F00  D683  8304  0081  8583  8300  00C5
0001275660  3E83  0105  000A  8075  8183  6400  8305  05D1
0001275700  0A01  7500  8380  0081  0064  0183  0102  0001
0001275720  0180  0001  0180  0001  0180  0001  0180  0001
*
0001277240  0180  0001  0180  0001  0180  0012  6079  8305
0001277260  02B9  BA83  8202  5F06  6F69  7562  6966  1001
0001277300  7F00  C083  8300  0081  C083  8300  0080  8083
0001277320  0100  0027  827F  5F04  7470  0072  0482  635F
0001277340  746E  8204  5F05  6162  6573  8206  5F05  6C66
0001277360  6761  820A  5F05  6966  656C  010B  0001  0180
0001277400  0007  737A  B883  8202  0100  0001  0180  0001
0001277420  0180  0001  0180  0001  0180  0001  0180  0001
*
0001300440  0180  0001  0180  0001  0180  0007  8578  0100
0001300460  8083  0100  0001  0180  0001  0180  0001  0180
0001300500  0001  0180  0001  0180  0001  0180  0001  0180
*
0001301740  0001  0180  0001  0180  0001  0180  0016  2079
0001301760  8302  03F5  F683  8203  280A  6E75  6174  6767
0001302000  6465  6929  0701  7F00  8183  8300  0081  0901
0001302020  7F00  0182  0078  0182  0279  0101  8000  0101
0001302040  8000  0101  8000  0101  8000  0101  8000  0101
*
0001302160  8000  0101  8000  0101  8000  0101  8000  1601
0001302200  7900  0120  1183  8304  0412  0A82  7528  746E
0001302220  6761  6567  2964  0169  0004  837F  0086  0901
0001302240  7F00  0582  7564  6D6D  0079  0101  8000  0101
0001302260  8000  0101  8000  0101  8000  0101  8000  0101
*
0001302420  8000  0101  8000  0101  8000  1601  7900  0330
```

THU MAR 14 17:31:54 1991 DB_PI.DLL PAGE 336, LINE 19766

```
0001302440   3083  8304  0431  0A82  7528  746E  6761  6567
0001302460   2964  0169  000A  837F  0085  8583  8300  0085
0001302500   1A01  7F00  0582  6977  7464  0068  0682  6568
0001302520   6769  7468  8202  6405  7065  6874  0104  0018
0001302540   8579  0140  8308  0434  3583  8204  280A  6E75
0001302560   6174  6767  6465  6929  0701  7800  8085  8300
0001302600   0084  1901  7F00  8183  8300  042F  8583  8300
0001302620   0085  C483  8300  0082  E483  8300  0433  5A01
0001302640   7F00  0682  6572  7270  7365  8200  6406  6D69
0001302660   6E65  0273  1082  6164  6174  6C5F  7961  7265
0001302700   645F  7065  6874  8208  7308  6769  735F  7A69
0001302720   0A65  0782  6973  5F67  7470  0C72  0982  7462
0001302740   706D  735F  7A69  1065  0882  7462  706D  705F
0001302760   7274  8214  7305  6170  6572  0118  0001  0180
0001303000   0018  8579  05A0  830C  0439  3A83  8204  280A
0001303020   6E75  6174  6767  6465  6929  0701  7800  8085
0001303040   8301  0084  2501  7F00  8683  8300  0345  4583
0001303060   8303  0086  8183  8300  0085  8683  8300  0082
0001303100   8683  8300  03F4  3283  8304  0438  7E01  7F00
0001303120   0282  6469  8200  6E04  6D61  0465  0982  6966
0001303140   656C  6E5F  6D61  2465  0982  7865  5F70  6374
0001303160   695F  4464  0482  7974  6570  8248  720C  6665
0001303200   6C5F  6E69  5F65  756E  4A6D  0982  6572  5F66
0001303220   6374  695F  4C64  0A82  6974  656D  735F  6174
0001303240   706D  8250  6106  696F  695F  5464  0882  6F6C
0001303260   6163  6974  6E6F  8258  6209  6D74  5F70  6E69
0001303300   6F66  825C  7305  6170  6572  8485  0100  0001
0001303320   0180  0001  0180  0001  0180  0001  0180  0001
*
0001303360   0180  0001  0180  0007  737A  3783  8204  0100
0001303400   0001  0180  0001  0180  0001  0180  0001  0180
*
0001303540   0001  0180  0001  0180  0007  737A  E483  8200
0001303560   0100  0001  0180  0001  0180  0001  0180  0001
0001303600   0180  0001  0180  0001  0180  0001  0180  0001
*
0001304340   0180  0001  0180  0001  0180  0001  0180  0018
0001304360   8579  0550  8306  04C2  C383  8204  280A  6E75
0001304400   6174  6767  6465  6929  0701  7800  0085  8304
0001304420   0080  1301  7F00  C183  8304  0081  8583  8300
0001304440   0085  8683  8300  0345  5301  7F00  0782  6F70
0001304460   5F73  6C62  006B  0E82  7462  7672  6F5F  6570
0001304500   5F6E  6F6D  6564  8085  8200  6608  7869  735F
0001304520   7A69  8565  0082  0982  656B  5F79  7369  695F
0001304540   8564  0084  0782  616C  7473  695F  8564  0086
0001304560   0982  6966  656C  6E5F  6D61  8565  008A  0101
0001304600   8000  0101  8000  0701  7800  0085  8308  0080
0001304620   0101  8000  0101  8000  0101  8000  0101  8000
*
0001304700   0101  8000  1601  7900  0560  D683  8304  04D7
0001304720   0A82  7528  746E  6761  6567  2964  0169  0005
0001304740   2078  8483  0100  0010  837F  04D5  8583  8300
0001304760   0085  8183  8300  0081  3001  7F00  0682  6F66
0001305000   6D72  7461  8200  6406  5F62  6576  0472  0682
0001305020   7773  765F  7265  8206  6409  7461  5F61  7974
0001305040   6570  8208  6405  6D75  796D  010A  0001  0180
0001305060   0018  8579  02C0  8305  04DB  DC83  8204  280A
0001305100   6E75  6174  6767  6465  6929  0701  7800  0085
0001305120   8302  0080  1001  7F00  D483  8304  0086  8283
```

```
THU MAR 14 17:31:54 1991  DB_PI.DLL  PAGE 337, LINE 19825

0001305140   8300   0082   DA83   0104   0030   827F   7607   7265
0001305160   6F5F   6A62   8200   660C   6C69   5F65   6576   7372
0001305200   6F69   0C6E   0482   6974   656D   8210   7304   7A69
0001305220   1465   0582   7073   7261   1865   0101   8000   0101
0001305240   8000   0101   8000   0101   8000   0101   8000   0101
*
0001305640   8000   0101   8000   0101   8000   1801   7900   2085
0001305660   0301   2283   8305   0523   0A82   7528   746E   6761
0001305700   6567   2964   0169   000A   837F   0085   8183   8300
0001305720   0345   2001   7F00   0882   6361   6563   7373   6465
0001305740   8200   6405   6D75   796D   8202   6609   6C69   5F65
0001305760   616E   656D   0104   0018   8579   0800   8301   0525
0001306000   2683   8205   280A   6E75   6174   6767   6465   6929
0001306020   0401   7F00   C683   0104   000C   827F   6408   7269
0001306040   6E5F   6D61   0065   1801   7900   1085   084A   2A83
0001306060   8305   052B   0A82   7528   746E   6761   6567   2964
0001306100   0169   0007   8578   0FF0   C083   0104   0007   8578
0001306120   1800   2483   0105   0019   837F   0521   2183   8305
0001306140   0528   2983   8305   04C0   C083   8304   04C0   2883
0001306160   0105   0053   827F   740A   7473   735F   7263   7069
0001306200   0074   0A82   7374   5F74   6568   6461   7265   8224
0001306220   6903   676D   8248   6907   676D   645F   7269   4685
0001306240   8202   6604   746C   8572   0546   0382   6F61   8569
0001306260   05F0   0482   7865   6365   9A85   8206   6707   6E65
0001306300   7265   6369   4485   0107   0001   0180   0018   8579
0001306320   53B0   830B   052E   2F83   8205   280A   6E75   6174
0001306340   6767   6465   6929   2201   7F00   8683   8300   0345
0001306360   8183   8300   0081   1083   8304   0085   8183   8300
0001306400   0085   8183   8300   04C6   2783   0105   006F   827F
0001306420   6902   0064   0482   616E   656D   8204   610B   6363
0001306440   7365   5F73   6F6D   6564   8224   6C0A   636F   5F6B
0001306460   6373   706F   2665   0A82   6873   7261   5F65   6E69
0001306500   6F66   8228   6F08   6570   5F6E   6E63   2C74   0582
0001306520   7073   7261   2E65   0882   6F6C   6B63   685F   6C64
0001306540   8230   7306   6170   6572   3231   0882   6964   5F72
0001306560   6170   6874   8234   7303   6264   3485   0101   0001
0001306600   0180   0018   8579   07F0   8310   0533   3483   8205
0001306620   280A   6E75   6174   6767   6465   6929   0701   7A00
0001306640   8373   052D   0082   3101   7F00   8583   8300   0085
0001306660   8683   8300   0532   3783   8304   0445   8183   8300
0001306700   0081   8583   8300   0081   BC83   8302   02BC   4583
0001306720   8303   0081   E483   8300   00E4   D801   7F00   0482
0001306740   7375   6465   8200   6109   6363   7365   5F73   706F
0001306760   8202   7406   7473   695F   0464   0782   7374   5F74
0001307000   7470   0872   0782   6D69   5F67   6468   0C72   0B82
0001307020   6D69   5F67   7562   5F66   7470   8572   00C0   0B82
0001307040   6361   6563   7373   6D5F   646F   8565   00C4   0B82
0001307060   7263   6165   6574   6D5F   646F   8565   00C6   0A82
0001307100   6162   6B63   7267   756F   646E   C885   8200   6308
0001307120   6D6F   7270   7365   8573   00CA   0782   706F   6E65
0001307140   665F   8570   00CC   0782   6574   706D   665F   8570
0001307160   00D0   0E82   6574   706D   665F   6C69   5F65   616E
0001307200   656D   D485   8200   620D   6361   676B   6F72   6E75
0001307220   5F64   7473   F485   8200   6C09   7961   7265   705F
0001307240   7274   F685   8200   730B   6177   5F70   7562   6666
0001307260   7265   FA85   0100   0001   0180   0001   0180   0007
0001307300   737A   3183   8205   0100   0001   0180   0001   0180
0001307320   0001   0180   0001   0180   0001   0180   0001   0180
*
```

```
THU MAR 14 17:31:54 1991  DB_PI.DLL  PAGE 338, LINE 19884

0001310200  0001  0180  0001  0180  0001  0180  0007  737A
0001310220  BC83  8202  0100  0001  0180  0001  0180  0001
0001310240  0180  0001  0180  0001  0180  0001  0180  0001
*
0001310440  0180  0001  0180  0001  0180  0018  8579  0850
0001310460  8304  05D0  D183  8205  280A  6E75  6174  6767
0001310500  6465  6929  0D01  7F00  3283  8305  0445  C683
0001310520  8304  0085  3801  7F00  0782  7374  5F74  7470
0001310540  0072  0B82  6D69  5F67  6468  5F72  7470  0472
0001310560  0D82  6966  656C  705F  7461  6E68  6D61  0865
0001310600  0A82  6564  6C61  6F6C  6163  6574  0885  0101
0001310620  0018  8579  00A0  8306  05D3  D483  8205  280A
0001310640  6E75  6174  6767  6465  6929  1301  7F00  4583
0001310660  8304  0537  8583  8300  02BC  8583  8300  00E4
0001310700  4A01  7F00  0B82  6D69  5F67  6468  5F72  7470
0001310720  0072  0C82  706F  6E65  695F  676D  705F  7274
0001310740  8204  6907  676D  685F  6C64  8208  6602  0A70
0001310760  0B82  616C  6579  5F72  6E69  6564  0E78  0C82
0001311000  616C  6579  5F72  7562  6666  7265  0110  0004
0001311020  837F  0445  0A01  7500  8380  0200  0164  D583
0001311040  0105  000A  837F  0445  C083  8300  0085  0A01
0001311060  7500  8380  0081  0364  D783  0105  0005  1878
0001311100  8083  0100  0007  837F  00C0  4583  0104  000A
0001311120  8075  8183  6400  8302  05DA  0401  7F00  C083
0001311140  0100  000A  8075  0083  6402  8301  05DC  0701
0001311160  7800  7885  8301  0080  0701  7800  F085  8300
0001311200  0080  0D01  7F00  3283  8305  0445  C083  8300
0001311220  0085  0A01  7500  8380  0081  0464  E083  0105
0001311240  0007  837F  0532  8183  0100  000A  8075  8183
0001311260  6400  8302  05E2  0A01  7F00  C083  8300  0081
0001311300  C083  0100  000A  8075  0083  6402  8303  05E4
0001311320  0501  7800  8308  0080  0D01  7F00  3283  8305
0001311340  0081  C083  8300  00C0  0A01  7500  8380  0081
0001311360  0464  E783  0105  000D  837F  0445  C083  8300
0001311400  0085  A983  0105  000A  8075  8183  6400  8304
0001311420  05E9  0501  7800  8320  0080  0701  7F00  4583
0001311440  8304  02BC  0A01  7500  8380  0081  0264  EC83
0001311460  0105  000A  837F  0445  C483  8300  02BC  0A01
0001311500  7500  8380  0081  0364  EE83  0105  000A  837F
0001311520  0445  C483  8300  02BC  0A01  7500  8380  0081
0001311540  0364  F083  0105  000D  837F  0445  BC83  8302
0001311560  0085  E483  0100  000A  8075  8183  6400  8304
0001311600  05F2  0D01  7F00  4583  8304  02BC  8583  8300
0001311620  00E4  0A01  7500  8380  0081  0464  F483  0105
0001311640  0004  837F  00C0  0A01  7500  8380  0200  0164
0001311660  F683  0105  0016  837F  0445  8583  8300  0537
0001311700  8583  8300  0460  6083  8304  02BC  0A01  7500
0001311720  8380  0081  0764  F883  0105  0004  837F  0085
0001311740  0A01  7500  8380  0081  0164  FA83  0105  000A
0001311760  837F  0445  C083  8300  0085  0A01  7500  8380
0001312000  0081  0364  FC83  0105  0001  0180  0001  0180
0001312020  0001  0180  0001  0180  0001  0180  0001  0180
*
0001313500  0001  0180  0001  0180  0001  0180  0007  8578
0001313520  0100  8083  0100  0001  0180  0001  0180  0001
0001313540  0180  0001  0180  0001  0180  0001  0180  0001
*
0001314440  0180  0001  0180  0016  2079  8302  0347  4883
0001314460  8203  280A  6E75  6174  6767  6465  6929  0701
```

```
THU MAR 14 17:31:54 1991  DB_PI.DLL  PAGE 339, LINE 19943

0001314500  7F00  8183  8300  0081  0901  7F00  0182  0078
0001314520  0182  0279  0101  8000  0101  8000  0101  8000
0001314540  0101  8000  0101  8000  0101  8000  0101  8000
*
0001315060  0101  8000  0101  8000  1801  7900  6085  0502
0001315100  8383  8303  0384  0A82  7528  746E  6761  6567
0001315120  2964  0169  0010  837F  0086  D183  8302  0082
0001315140  D183  8302  00C0  2E01  7F00  0282  6469  8200
0001315160  6E04  6D61  0465  0A82  6974  656D  735F  6174
0001315200  706D  8224  6F05  6E77  7265  8228  7009  7968
0001315220  5F73  6170  6874  0148  0001  0180  0001  0180
0001315240  0001  0180  0001  0180  0001  0180  0001  0180
0001315260  0001  0180  0007  737A  8D83  8203  0100  0007
0001315300  737A  D183  8202  0100  0001  0180  0001  0180
0001315320  0001  0180  0001  0180  0001  0180  0001  0180
0001315340  0001  0180  0001  0180  0001  0180  0007  737A
0001315360  8283  8203  0100  0001  0180  0001  0180  0001
0001315400  0180  0001  0180  0001  0180  0001  0180  0001
*
0001315500  0180  0016  3079  8303  03AC  AD83  8203  280A
0001315520  6E75  6174  6767  6465  6929  0A01  7F00  8583
0001315540  8300  0085  8583  0100  001A  827F  7705  6469
0001315560  6874  8200  6806  6965  6867  0274  0582  6564
0001315600  7470  0468  1801  7900  4085  0801  B083  8303
0001315620  03B1  0A82  7528  746E  6761  6567  2964  0169
0001315640  0007  8578  0080  8483  0100  0019  837F  0081
0001315660  AB83  8303  0085  8583  8300  00C4  8283  8300
0001315700  00E4  AF83  0103  005A  827F  7206  7065  6572
0001315720  0073  0682  6964  656D  736E  8202  6410  7461
0001315740  5F61  616C  6579  5F72  6564  7470  0868  0882
0001315760  6973  5F67  6973  657A  820A  7307  6769  705F
0001316000  7274  820C  6209  6D74  5F70  6973  657A  8210
0001316020  6208  6D74  5F70  7470  1472  0582  7073  7261
0001316040  1865  0101  8000  0101  8000  0101  8000  0101
0001316060  8000  0101  8000  0101  8000  0101  8000  0101
*
0001316400  8000  0101  8000  0101  8000  0101  8000  1801
0001316420  7900  6085  0F05  EF83  8303  03F0  0A82  7528
0001316440  746E  6761  6567  2964  0169  0007  8578  0200
0001316460  8483  0100  002E  837F  0086  D183  8302  0082
0001316500  8183  8300  0081  4683  8303  0085  8583  8300
0001316520  03AE  C483  8300  00C4  8183  8300  0085  C483
0001316540  8300  03EE  A801  7F00  0282  6469  8200  6E04
0001316560  6D61  0465  0A82  6974  656D  735F  6174  706D
0001316600  8224  6305  616C  7373  8228  7305  7974  656C
0001316620  822A  6809  746F  705F  696F  746E  822C  680B
0001316640  5F70  5F78  6564  6966  656E  8230  680B  5F70
0001316660  5F79  6564  6966  656E  8232  6209  6D74  5F70
0001316700  6E69  6F66  8234  6907  676D  705F  7274  825C
0001316720  6D08  7361  5F6B  7470  6072  0782  7571  6C61
0001316740  7469  6479  0F82  6564  6373  6972  7470  726F
0001316760  735F  7A69  6665  0E82  6564  6373  6972  7470
0001317000  726F  705F  7274  8268  7305  6170  6572  016C
0001317020  0001  0180  0001  0180  0001  0180  0001  0180
*
0001317500  0018  8579  0550  8306  043F  4083  8204  280A
0001317520  6E75  6174  6767  6465  6929  0701  7800  0085
0001317540  8304  0080  1301  7F00  3E83  8304  0081  8583
0001317560  8300  0085  8683  8300  02D1  5301  7F00  0782
```

```
THU MAR 14 17:31:54 1991  DB_PI.DLL  PAGE 340, LINE 20002

0001317600  6F70  5F73  6C62  006B  0E82  7462  7672  6F5F
0001317620  6570  5F6E  6F6D  6564  8085  8200  6608  7869
0001317640  735F  7A69  8565  0082  0982  656B  5F79  7369
0001317660  695F  8564  0084  0782  616C  7473  695F  8564
0001317700  0086  0982  6966  656C  6E5F  6D61  8565  008A
0001317720  0101  8000  0101  8000  0701  7800  0085  8308
0001317740  0080  0101  8000  0101  8000  0101  8000  0101
0001317760  8000  0101  8000  0101  8000  0101  8000  0101
*
0001320060  8000  0101  8000  0101  8000  0101  8000  0701
0001320100  7A00  8373  043D  0082  0101  8000  0101  8000
0001320120  0101  8000  0101  8000  0101  8000  0101  8000
*
0001320500  1801  7900  7085  0205  9B83  8304  049C  0A82
0001320520  7528  746E  6761  6567  2964  0169  0007  837F
0001320540  043D  C083  0100  0022  827F  6C07  6269  745F
0001320560  6C62  8200  6C12  6269  665F  6C6F  6564  5F72
0001320600  6F6C  6E67  6D61  8565  00AA  0101  8000  0101
0001320620  8000  0101  8000  0101  8000  0101  8000  0101
*
0001321320  8000  0701  7A00  8373  049A  0082  0101  8000
0001321340  0101  8000  0101  8000  0101  8000  0101  8000
*
0001321740  0101  8000  0101  8000  0701  7A00  8373  045B
0001321760  0082  0101  8000  0101  8000  0101  8000  0101
0001322000  8000  0101  8000  0101  8000  0101  8000  0101
*
0001322120  8000  0101  8000  0101  8000  0A01  7F00  EF83
0001322140  8304  0081  C083  0100  000A  8075  8183  6400
0001322160  8303  054E  0501  7800  8310  0080  0501  7800
0001322200  8338  0080  0701  7F00  8183  8300  0533  0A01
0001322220  7500  8380  0081  0264  5283  0105  000A  8075
0001322240  8183  6400  8300  0201  0D01  7F00  5B83  8304
0001322260  0081  C583  8300  038C  0A01  7500  8380  0081
0001322300  0464  5583  0105  0001  0180  0001  0180  0001
0001322320  0180  0001  0180  0001  0180  0001  0180  0001
*
0001324000  0180  0001  0180  0001  0180  0007  8578  0100
0001324020  8083  0100  0001  0180  0001  0180  0001  0180
0001324040  0001  0180  0001  0180  0001  0180  0001  0180
*
0001324740  0001  0180  0016  2079  8302  0347  4883  8203
0001324760  280A  6E75  6174  6767  6465  6929  0701  7F00
0001325000  8183  8300  0081  0901  7F00  0182  0078  0182
0001325020  0279  1601  7900  0240  4A83  8303  034B  0A82
0001325040  7528  746E  6761  6567  2964  0169  0007  837F
0001325060  0346  4683  0103  000D  827F  6D03  6E69  8200
0001325100  6D03  7861  0104  0001  0180  0001  0180  0001
0001325120  0180  0001  0180  0001  0180  0001  0180  0001
*
0001325220  0180  0001  0180  0001  0180  0001  0180  0016
0001325240  2079  8301  0363  6483  8203  280A  6E75  6174
0001325260  6767  6465  6929  0401  7F00  8683  0100  0009
0001325300  827F  6405  6D75  796D  0100  0001  0180  0001
0001325320  0180  0001  0180  0001  0180  0001  0180  0001
*
0001326240  0180  0007  737A  DC83  8203  0100  0007  737A
0001326260  D183  8202  0100  0001  0180  0001  0180  0018
0001326300  8579  02C0  8307  03E1  E283  8203  280A  6E75
```

THU MAR 14 17:31:54 1991 DB_PI.DLL PAGE 341, LINE 20061

```
0001326320  6174  6767  6465  6929  0701  7800  2085  8301
0001326340  0084  1601  7F00  8683  8300  02D1  4983  8303
0001326360  0081  8183  8300  0082  E083  0103  0038  827F
0001326400  6902  0064  0482  616E  656D  8204  7204  6365
0001326420  2474  0482  7461  7274  822C  6405  6D75  796D
0001326440  822E  740A  6D69  5F65  7473  6D61  3070  0582
0001326460  7073  7261  3465  0101  8000  0101  8000  0101
0001326500  8000  0101  8000  0101  8000  0101  8000  0101
*
0001327000  8000  0101  8000  0101  8000  1801  7900  5085
0001327020  0605  1A83  8304  041B  0A82  7528  746E  6761
0001327040  6567  2964  0169  0007  8578  0400  8083  0100
0001327060  0013  837F  0419  8183  8300  0085  8583  8300
0001327100  0086  D183  0102  0053  827F  7007  736F  625F
0001327120  6B6C  8200  620E  7274  5F76  706F  6E65  6D5F
0001327140  646F  8565  0080  0882  6966  5F78  6973  657A
0001327160  8285  8200  6B09  7965  695F  5F73  6469  8485
0001327200  8200  6C07  7361  5F74  6469  8685  8200  6609
0001327220  6C69  5F65  616E  656D  8A85  0100  0001  0180
0001327240  0001  0180  0007  8578  0800  8083  0100  0001
0001327260  0180  0001  0180  0001  0180  0001  0180  0001
*
0001327400  0180  0001  0180  0001  0180  0007  737A  1883
0001327420  8204  0100  0001  0180  0001  0180  0001  0180
0001327440  0001  0180  0001  0180  0001  0180  0001  0180
*
0001330020  0018  8579  0570  8302  0477  7883  8204  280A
0001330040  6E75  6174  6767  6465  6929  0701  7F00  1883
0001330060  8304  00C0  2201  7F00  0782  696C  5F62  6274
0001330100  006C  1282  696C  5F62  6F66  646C  7265  6C5F
0001330120  676F  616E  656D  AA85  0100  0001  0180  0018
0001330140  8579  0120  8303  047B  7C83  8204  280A  6E75
0001330160  6174  6767  6465  6929  0A01  7F00  8583  8300
0001330200  0081  D183  0102  0020  827F  6108  6363  7365
0001330220  6573  0064  0582  7564  6D6D  0279  0982  6966
0001330240  656C  6E5F  6D61  0465  1801  7900  0085  0108
0001330260  7E83  8304  047F  0A82  7528  746E  6761  6567
0001330300  2964  0169  0004  837F  041E  0C01  7F00  0882
0001330320  6964  5F72  616E  656D  0100  0018  8579  4A10
0001330340  8308  0483  8483  8204  280A  6E75  6174  6767
0001330360  6465  6929  0701  7800  F085  830F  0418  0701
0001330400  7800  0085  8318  047D  1901  7F00  7A83  8304
0001330420  047A  8183  8304  0482  1883  8304  0418  1883
0001330440  8304  0481  5301  7F00  0A82  7374  5F74  6373
0001330460  6972  7470  8200  740A  7473  685F  6165  6564
0001330500  2472  0382  6D69  4867  0782  6D69  5F67  6964
0001330520  8572  0246  0482  6C66  7274  4685  8205  6103
0001330540  696F  F085  8205  6504  6578  8563  069A  0782
0001330560  6567  656E  6972  8563  0744  0101  8000  1801
0001330600  7900  B085  0B53  8783  8304  0488  0A82  7528
0001330620  746E  6761  6567  2964  0169  0022  837F  0086
0001330640  D183  8302  0081  8183  8300  0362  8583  8300
0001330660  0081  8583  8300  0081  1E83  8304  0480  6F01
0001330700  7F00  0282  6469  8200  6E04  6D61  0465  0B82
0001330720  6361  6563  7373  6D5F  646F  2465  0A82  6F6C
0001330740  6B63  735F  6F63  6570  8226  730A  6168  6572
0001330760  695F  666E  286F  0882  706F  6E65  635F  746E
0001331000  822C  7305  6170  6572  822E  6C08  636F  5F6B
0001331020  6468  306C  0682  7073  7261  3165  8232  6408
```

```
THU MAR 14 17:31:54 1991  DB_PI.DLL  PAGE 342, LINE 20120

0001331040  7269  705F  7461  3468  0382  6473  8562  0134
0001331060  0101  8000  0101  8000  0701  7A00  8373  0486
0001331100  0082  0101  8000  0101  8000  0101  8000  0101
0001331120  8000  0101  8000  0101  8000  0101  8000  0101
*
0001331460  8000  0101  8000  0101  8000  0101  8000  0701
0001331500  7A00  8373  0476  0082  0101  8000  0101  8000
0001331520  0101  8000  0101  8000  0101  8000  0101  8000
*
0001332260  0101  8000  0101  8000  0701  7F00  3683  8304
0001332300  00C0  0A01  7500  8380  0081  0264  2883  0105
0001332320  0007  837F  048B  8183  0100  000A  8075  8183
0001332340  6400  8302  052A  0401  7F00  8B83  0104  000A
0001332360  8075  8183  6400  8301  052C  0A01  7500  8380
0001332400  0081  0064  0183  0102  0004  837F  048B  0A01
0001332420  7500  8380  0081  0164  2F83  0105  000D  837F
0001332440  0436  8183  8300  00C5  DB83  0103  000A  8075
0001332460  8183  6400  8304  0531  0101  8000  0101  8000
0001332500  0101  8000  0101  8000  0101  8000  0101  8000
*
0001333740  0101  8000  0701  7800  0085  8301  0080  0101
0001333760  8000  0101  8000  0101  8000  0101  8000  0101
*
0001335040  8000  0101  8000  0101  8000  0101  8000  1601
0001335060  7900  0120  3D83  8303  033E  0A82  7528  746E
0001335100  6761  6567  2964  0169  0004  837F  0086  0901
0001335120  7F00  0582  7564  6D6D  0079  0101  8000  0101
0001335140  8000  0101  8000  0101  8000  0101  8000  0101
*
0001336100  8000  0101  8000  0701  7800  2085  8301  0084
0001336120  0101  8000  0101  8000  0101  8000  1801  7900
0001336140  6085  0603  C083  8303  03C1  0A82  7528  746E
0001336160  6761  6567  2964  0169  0007  8578  0100  AB83
0001336200  0102  0013  837F  0086  AB83  8302  0085  8583
0001336220  8300  03BA  BF83  0103  0040  827F  6902  0064
0001336240  0482  616E  656D  8204  660C  746C  5F72  616D
0001336260  5F78  6E63  2474  0882  6C66  7274  635F  746E
0001336300  8226  7305  6170  6572  8228  660E  746C  5F72
0001336320  616E  656D  6C5F  7369  4C74  0101  8000  0101
0001336340  8000  0101  8000  0101  8000  0101  8000  0101
*
0001336500  8000  0101  8000  0701  7A00  8373  00C6  0082
0001336520  0101  8000  0101  8000  0101  8000  0101  8000
*
0001336640  1801  7900  5085  0605  F483  8303  03F5  0A82
0001336660  7528  746E  6761  6567  2964  0169  0007  8578
0001336700  0400  8083  0100  0013  837F  03F3  8183  8300
0001336720  0085  8583  8300  0086  AB83  0102  0053  827F
0001336740  7007  736F  625F  6B6C  8200  620E  7274  5F76
0001336760  706F  6E65  6D5F  646F  8565  0080  0882  6966
0001337000  5F78  6973  657A  8285  8200  6B09  7965  695F
0001337020  5F73  6469  8485  8200  6C07  7361  5F74  6469
0001337040  8685  8200  6609  6C69  5F65  616E  656D  8A85
0001337060  0100  0001  0180  0001  0180  0007  8578  0800
0001337100  8083  0100  0001  0180  0001  0180  0001  0180
0001337120  0001  0180  0001  0180  0001  0180  0001  0180
*
0001337240  0007  737A  F283  8203  0100  0001  0180  0001
0001337260  0180  0001  0180  0001  0180  0001  0180  0001
```

THU MAR 14 17:31:54 1991 DB_PI.DLL PAGE 343, LINE 20179

```
*
0001337660  0180  0001  0180  0018  8579  0120  8303  0455
0001337700  5683  8204  280A  6E75  6174  6767  6465  6929
0001337720  0A01  7F00  8583  8300  0081  AB83  0102  0020
0001337740  827F  6108  6363  7365  6573  0064  0582  7564
0001337760  6D6D  0279  0982  6966  656C  6E5F  6D61  0465
0001340000  1801  7900  0085  0108  5883  8304  0459  0A82
0001340020  7528  746E  6761  6567  2964  0169  0004  837F
0001340040  03F8  0C01  7F00  0882  6964  5F72  616E  656D
0001340060  0100  0018  8579  4A10  8308  045D  5E83  8204
0001340100  280A  6E75  6174  6767  6465  6929  0701  7800
0001340120  F085  830F  03F2  0701  7800  0085  8318  0457
0001340140  1901  7F00  5483  8304  0454  5B83  8304  045C
0001340160  F283  8303  03F2  F283  8303  045B  5301  7F00
0001340200  0A82  7374  5F74  6373  6972  7470  8200  740A
0001340220  7473  685F  6165  6564  2472  0382  6D69  4867
0001340240  0782  6D69  5F67  6964  8572  0246  0482  6C66
0001340260  7274  4685  8205  6103  696F  F085  8205  6504
0001340300  6578  8563  069A  0782  6567  656E  6972  8563
0001340320  0744  0101  8000  1801  7900  B085  0B53  6183
0001340340  8304  0462  0A82  7528  746E  6761  6567  2964
0001340360  0169  0022  837F  0086  AB83  8302  0081  8183
0001340400  8300  033C  8583  8300  0081  8583  8300  0081
0001340420  F883  8303  045A  6F01  7F00  0282  6469  8200
0001340440  6E04  6D61  0465  0B82  6361  6563  7373  6D5F
0001340460  646F  2465  0A82  6F6C  6B63  735F  6F63  657D
0001340500  8226  730A  6168  6572  695F  666E  286F  0882
0001340520  706F  6E65  635F  746E  822C  7305  6170  6572
0001340540  822E  6C08  636F  5F6B  6468  306C  0682  7073
0001340560  7261  3165  8232  6408  7269  705F  7461  3468
0001340600  0382  6473  8562  0134  0101  8000  0101  8000
0001340620  0701  7A00  8373  0460  0082  0101  8000  0101
0001340640  8000  0101  8000  0101  8000  0101  8000  0101
*
0001342020  8000  0701  7F00  1083  8304  00C0  0A01  7500
0001342040  8380  0081  0264  0483  0105  0007  837F  0465
0001342060  8183  0100  000A  8075  8183  6400  8302  0506
0001342100  0401  7F00  6583  0104  000A  8075  8183  6400
0001342120  8301  0508  0401  7F00  6583  0104  000A  8075
0001342140  8183  6400  8301  050A  0A01  7F00  6583  8304
0001342160  00C5  DD83  0103  000A  8075  8183  6400  8303
0001342200  050C  0101  8000  0101  8000  0101  8000  0101
0001342220  8000  0101  8000  0101  8000  0101  8000  0101
*
0001343440  8000  0101  8000  0101  8000  0101  8000  0701
0001343460  7800  0085  8301  0080  0101  8000  0101  8000
0001343500  0101  8000  0101  8000  0101  8000  0101  8000
*
0001344560  0101  8000  0101  8000  1601  7900  0120  3D83
0001344600  8303  033E  0A82  7528  746E  6761  6567  2964
0001344620  0169  0004  837F  0086  0901  7F00  0582  7564
0001344640  6D6D  0079  0101  8000  0101  8000  0101  8000
0001344660  0101  8000  0101  8000  0101  8000  0101  8000
*
0001346020  0101  8000  0101  8000  0101  8000  0701  7A00
0001346040  8373  00C6  0082  0101  8000  0101  8000  1801
0001346060  7900  4085  0301  E283  8303  03E3  0A82  7528
0001346100  746E  6761  6567  2964  0169  0007  8578  0110
0001346120  8483  0100  000A  837F  0086  8583  8300  03E1
```

```
THU MAR 14 17:31:54 1991  DB_PI.DLL  PAGE 344, LINE 20238

0001346140  1501  7F00  0282  6469  8200  7304  7A69  0465
0001346160  0582  7073  7261  0665  0101  8000  0101  8000
0001346200  0101  8000  0101  8000  0101  8000  0101  8000
*
0001346260  1801  7900  5085  0605  F483  8303  03F5  0A82
0001346300  7528  746E  6761  6567  2964  0169  0007  8578
0001346320  0400  8083  0100  0013  837F  03F3  8183  8300
0001346340  0085  8583  8300  0086  AB83  0102  0053  827F
0001346360  7007  736F  625F  6B6C  8200  620E  7274  5F76
0001346400  706F  6E65  6D5F  646F  8565  0080  0882  6966
0001346420  5F78  6973  657A  8285  8200  6B09  7965  695F
0001346440  5F73  6469  8485  8200  6C07  7361  5F74  6469
0001346460  8685  8200  6609  6C69  5F65  616E  656D  8A85
0001346500  0100  0001  0180  0001  0180  0007  8578  0800
0001346520  8083  0100  0001  0180  0001  0180  0001  0180
0001346540  0001  0180  0001  0180  0001  0180  0001  0180
*
0001346660  0007  737A  F283  8203  0100  0001  0180  0001
0001346700  0180  0001  0180  0001  0180  0001  0180  0001
*
0001347300  0180  0001  0180  0018  8579  0120  8303  0455
0001347320  5683  8204  280A  6E75  6174  6767  6465  6929
0001347340  0A01  7F00  8583  8300  0081  AB83  0102  0020
0001347360  827F  6108  6363  7365  6573  0064  0582  7564
0001347400  6D6D  0279  0982  6966  656C  6E5F  6D61  0465
0001347420  1801  7900  0085  0108  5883  8304  0459  0A82
0001347440  7528  746E  6761  6567  2964  0169  0004  837F
0001347460  03F8  0C01  7F00  0882  6964  5F72  616E  656D
0001347500  0100  0018  8579  4A10  8308  045D  5E83  8204
0001347520  280A  6E75  6174  6767  6465  6929  0701  7800
0001347540  F085  830F  03F2  0701  7800  0085  8318  0457
0001347560  1901  7F00  5483  8304  0454  5B83  8304  045C
0001347600  F283  8303  03F2  F283  8303  045B  5301  7F00
0001347620  0A82  7374  5F74  6373  6972  7470  8200  740A
0001347640  7473  685F  6165  6564  2472  0382  6D69  4867
0001347660  0782  6D69  5F67  6964  8572  0246  0482  6C66
0001347700  7274  4685  8205  6103  696F  F085  8205  6504
0001347720  6578  8563  069A  0782  6567  656E  6972  8563
0001347740  0744  0101  8000  1801  7900  B085  0B53  6183
0001347760  8304  0462  0A82  7528  746E  6761  6567  2964
0001350000  0169  0022  837F  D086  AB83  8302  0081  8183
0001350020  8300  033C  8583  8300  0081  8583  8300  0081
0001350040  F883  8303  045A  6F01  7F00  0282  6469  8200
0001350060  6E04  6D61  0465  0B82  6361  6563  7373  6D5F
0001350100  646F  2465  0A82  6F6C  6B63  735F  6F63  6570
0001350120  8226  730A  6168  6572  695F  666E  286F  0882
0001350140  706F  6E65  635F  746E  822C  7305  6170  6572
0001350160  822E  6C08  636F  5F6B  6468  306C  0682  7073
0001350200  7261  3165  8232  6408  7269  705F  7461  3468
0001350220  0382  6473  8562  0134  0101  8000  0101  8000
0001350240  0701  7A00  8373  0460  0082  0101  8000  0101
0001350260  8000  0101  8000  0101  8000  0101  8000  0101
*
0001351440  8000  0A01  7F00  1083  8304  00C0  8183  0100
0001351460  000A  8075  8183  6400  8303  0504  0A01  7F00
0001351500  6583  8304  0081  8183  0100  000A  8075  8183
0001351520  6400  8303  0506  0701  7F00  6583  8304  0081
0001351540  0A01  7500  8380  0081  0264  0883  0105  0004
0001351560  837F  0465  0A01  7500  8380  0081  0164  0A83
```

```
THU MAR 14 17:31:54 1991  DB_PI.DLL  PAGE 345, LINE 20297

0001351600  0105  0007  837F  0465  8183  0100  000A  8075
0001351620  8183  6400  8302  050C  0701  7F00  6583  8304
0001351640  0000  0A01  7500  8380  0081  0264  0E83  0105
0001351660  000D  837F  0465  8183  8300  00C5  DD83  0103
0001351700  000A  8075  8183  6400  8304  0510  0101  8000
0001351720  0101  8000  0101  8000  0101  8000  0101  8000
*
0001352520  0A01  7F00  C083  8300  0081  8583  0100  000A
0001352540  8075  C083  6400  8303  0261  0A01  7500  8380
0001352560  0081  0064  0183  0102  0001  0180  0016  3079
0001352600  8303  0203  0483  8202  280A  6E75  6174  6767
0001352620  6465  6929  0A01  7F00  8183  8300  0081  8183
0001352640  0100  001C  827F  7006  6361  5F6B  0068  0682
0001352660  6966  656C  685F  8202  6606  6E75  5F63  0468
0001352700  0701  7A00  8373  00C0  0082  0101  8000  0101
0001352720  8000  0101  8000  0101  8000  0101  8000  0101
*
0001353120  8000  0501  7800  8348  0080  0501  7800  8328
0001353140  0080  0101  8000  0101  8000  0101  8000  0101
0001353160  8000  0101  8000  0101  8000  0101  8000  0101
*
0001353520  8000  0701  7A00  8373  0267  0082  0A01  7500
0001353540  8380  0081  0064  0183  0102  0001  0180  0001
0001353560  0180  0001  0180  0001  0180  0001  0180  0001
*
0001355320  0180  0007  8578  0100  8083  0100  0001  0180
0001355340  0001  0180  0001  0180  0001  0180  0001  0180
*
0001355620  0001  0180  0005  6078  8083  0100  0001  0180
0001355640  0001  0180  0001  0180  0001  0180  0001  0180
*
0001356620  0001  0180  0007  737A  C083  8200  0100  0001
0001356640  0180  0001  0180  0001  0180  0001  0180  0001
*
0001360140  0180  0001  0180  0001  0180  0001  0180  0007
0001360160  737A  0583  8202  0100  0001  0180  0001  0180
0001360200  0001  0180  0001  0180  0001  0180  0001  0180
0001360220  0001  0180  0001  0180  0001  0180  0007  8578
0001360240  0800  8083  0100  0001  0180  0001  0180  0018
0001360260  8579  0130  8303  04B3  B483  8204  280A  6E75
0001360300  6174  6767  6465  6929  0A01  7F00  4283  8303
0001360320  00C0  8583  0100  0015  827F  6B03  7965  8200
0001360340  6904  6574  206D  0482  6973  657A  0124  0016
0001360360  4079  8303  04B7  B883  8204  280A  6E75  6174
0001360400  6767  6465  6929  0701  7A00  8373  04B2  0082
0001360420  0A01  7F00  8583  8300  0085  B683  0104  001C
0001360440  827F  6109  6C6C  636F  7461  6465  8200  7504
0001360460  6573  0264  0582  6E65  7274  0479  1601  7900
0001360500  0340  BB83  8304  04BC  0A82  7528  746E  6761
0001360520  6567  2964  0169  0007  737A  B583  8204  0100
0001360540  000A  837F  0085  BA83  8304  0085  2301  7F00
0001360560  0482  6973  657A  8200  6206  6375  656B  0274
0001360600  0F82  7562  6B63  7465  695F  636E  735F  7A69
0001360620  0665  0101  8000  0101  8000  0101  8000  0101
0001360640  8000  0101  8000  0101  8000  0101  8000  0101
*
0001361060  8000  0101  8000  0101  8000  0701  7A00  8373
0001361100  04B9  0082  0101  8000  0101  8000  0101  8000
0001361120  0101  8000  0101  8000  0101  8000  0101  8000
```

```
THU MAR 14 17:31:54 1991  DB_PI.DLL  PAGE 346, LINE 20356

*
0001362600  0101  8000  0101  8000  0501  7800  8320  0080
0001362620  0501  7800  8320  0080  0101  8000  0101  8000
0001362640  0701  7F00  C083  8300  00C0  0A01  7500  8380
0001362660  0081  0264  BD83  0105  0005  1078  8083  0100
0001362700  0005  5878  8083  0100  0004  837F  00C0  0A01
0001362720  7500  8380  0081  0164  C183  0105  0005  7078
0001362740  8083  0100  0004  837F  00C0  0A01  7500  8380
0001362760  0081  0164  C483  0105  0005  4078  8083  0100
0001363000  0010  837F  00C0  C683  8300  0085  C083  8300
0001363020  00C5  0A01  7500  8380  0081  0573  C783  0105
0001363040  0001  0180  0005  3878  8083  0100  0005  6078
0001363060  8283  0100  0007  837F  0086  8583  0100  000A
0001363100  8075  8183  7300  8302  05CC  0501  7800  8370
0001363120  0080  0A01  7F00  C083  8300  0081  C083  0100
0001363140  000A  8075  8183  6400  8303  05CF  0501  7800
0001363160  8330  0080  0501  7800  8318  0080  0501  7800
0001363200  8330  0080  0D01  7F00  8683  8300  0081  C083
0001363220  8300  00C0  0A01  7500  8380  0081  0473  D483
0001363240  0105  0001  0180  0007  8578  00A0  8083  0100
0001363260  0010  837F  0086  8183  8300  00C0  C583  8300
0001363300  03F0  0A01  7500  8380  0081  0573  D883  0105
0001363320  0001  0180  0007  8578  00C8  8083  0100  000D
0001363340  837F  0086  8183  8300  00C0  0583  0102  000A
0001363360  8075  8183  7300  8304  05DC  0701  7F00  8583
0001363400  8300  0205  0A01  7500  8380  0200  0273  DE83
0001363420  0105  000D  837F  0086  C083  8300  00C5  A583
0001363440  0104  000A  8075  8183  7300  8304  05E0  0A01
0001363460  7500  8380  0081  0064  0183  0102  0001  0180
0001363500  0012  6079  8305  0203  0483  8202  5F06  6F69
0001363520  7562  6966  1001  7F00  C083  8300  0081  C083
0001363540  8300  0080  8083  0100  0027  827F  5F04  7470
0001363560  0072  0482  635F  746E  8204  5F05  6162  6573
0001363600  8206  5F05  6C66  6761  820A  5F05  6966  656C
0001363620  010B  0005  0078  0283  0102  0007  737A  0283
0001363640  8202  0100  0001  0180  0001  0180  0001  0180
0001363660  0001  0180  0001  0180  0001  0180  0001  0180
*
0001364260  0001  0180  0007  737A  C083  8200  0100  0001
0001364300  0180  0001  0180  0001  0180  0001  0180  0001
*
0001364500  0180  0001  0180  0005  5078  8083  0100  0005
0001364520  2878  8083  0100  0001  0180  0001  0180  0001
0001364540  0180  0001  0180  0001  0180  0001  0180  0001
*
0001366260  0180  0001  0180  0001  0180  0007  8578  0100
0001366300  8083  0100  0001  0180  0001  0180  0001  0180
0001366320  0001  0180  0001  0180  0001  0180  0001  0180
*
0001367600  0001  0180  0018  8579  0260  8305  03FB  FC83
0001367620  8203  280A  6E75  6174  6767  6465  6929  1001
0001367640  7F00  8683  8300  0349  8283  8300  0349  C083
0001367660  0100  002E  827F  6902  0064  0482  616E  656D
0001367700  8204  740A  6D69  5F65  7473  6D61  2470  0582
0001367720  776F  656E  2872  0982  6870  7379  705F  7461
0001367740  4868  0101  8000  0101  8000  0101  8000  0101
0001367760  8000  0101  8000  0101  8000  0101  8000  0101
*
0001370040  8000  0101  8000  0101  8000  0701  7A00  8373
```

THU MAR 14 17:31:54 1991 DB_PI.DLL PAGE 347, LINE 20415

```
0001370060   03FA   0082   0101   8000   0101   8000   0101   8000
0001370100   0101   8000   0101   8000   0101   8000   0101   8000
*
0001371220   0101   8000   0101   8000   0701   7800   0085   8308
0001371240   0080   0101   8000   0101   8000   0101   8000   0101
0001371260   8000   0101   8000   0101   8000   0101   8000   0101
*
0001373300   8000   0701   7800   6085   8301   0206   0701   7800
0001373320   0085   8358   04A9   0701   7800   B085   8300   0085
0001373340   0701   7800   9085   8300   0081   0A01   7500   8380
0001373360   0081   0064   0183   0102   0001   0180   0001   0180
0001373400   000A   837F   00C0   C183   8300   024B   0A01   7500
0001373420   8380   0200   0364   B983   0105   0007   8578   0340
0001373440   8083   0100   0007   8578   0248   8083   0100   0007
0001373460   8578   0530   8183   0100   0007   8578   5C30   8183
0001373500   0100   0007   8578   0808   8083   0100   0007   8578
0001373520   1000   8183   0100   000A   8075   8183   6400   8300
0001373540   0201   0401   7F00   8083   0100   000A   8075   0083
0001373560   6402   8301   05C2   0A01   7500   8380   0081   0064
0001373600   0183   0102   0001   0180   0001   0180   0007   837F
0001373620   00C0   4B83   0102   000A   8075   8183   6400   8302
0001373640   05C7   0501   7800   8310   0080   0701   7F00   C083
0001373660   8300   024B   0A01   7500   8380   0081   0264   CA83
0001373700   0105   0007   837F   00C0   8583   0100   000A   8075
0001373720   8183   6400   8302   05CC   0A01   7F00   C083   8300
0001373740   00C1   4B83   0102   000A   8075   8183   6400   8303
0001373760   05CE   0401   7F00   C083   0100   000A   8075   8183
0001374000   6400   8301   05D0   0101   8000   0A01   7500   8380
0001374020   0200   0064   0183   0102   000D   837F   00C1   4B83
0001374040   8302   00C5   C083   0100   000A   8075   8183   6400
0001374060   8304   05D4   0501   7800   8348   0080   0101   8000
0001374100   0101   8000   0101   8000   0101   8000   0101   8000
*
0001374540   0101   8000   0101   8000   0101   8000   0701   7A00
0001374560   8373   00C0   0082   0101   8000   0101   8000   0101
0001374600   8000   0101   8000   0101   8000   0101   8000   0101
*
0001375440   8000   0501   7800   8300   0084   0101   8000   0101
0001375460   8000   0101   8000   0101   8000   0101   8000   0101
*
0001375720   8000   0701   7800   0085   8301   0080   0101   8000
0001375740   0101   8000   0101   8000   0101   8000   0101   8000
*
0001376640   0101   8000   1201   7900   0560   5783   8303   0358
0001376660   0682   695F   626F   6675   0169   0010   837F   00C0
0001376700   8183   8300   00C0   8083   8300   0080   2701   7F00
0001376720   0482   705F   7274   8200   5F04   6E63   0474   0582
0001376740   625F   7361   0665   0582   665F   616C   0A67   0582
0001376760   665F   6C69   0B65   0101   8000   0701   7A00   8373
0001377000   0356   0082   0101   8000   0101   8000   0101   8000
0001377020   0101   8000   0101   8000   0101   8000   0101   8000
*
0001377700   0701   7A00   8373   00C0   0082   0101   8000   0101
0001377720   8000   0101   8000   0101   8000   0101   8000   0101
*
0001403260   8000   0101   8000   0701   7A00   8373   0587   0082
0001403300   0A01   7500   8380   0081   0564   8883   0105   0010
0001403320   837F   00C0   C083   8300   00C0   8583   8300   0085
0001403340   0701   7A00   8373   058A   0082   0A01   7500   8380
```

```
THU MAR 14 17:31:54 1991  DB_PI.DLL  PAGE 348, LINE 20474

0001403360  0081  0464  8B83  0105  000D  837F  00C0  C083
0001403400  8300  03CA  C583  0100  0001  0180  0001  0180
0001403420  0001  0180  0001  0180  0001  0180  0001  0180
0001403440  000A  837F  00C0  C183  8300  024C  0A01  7500
0001403460  8380  0081  0364  9283  0105  0019  837F  00C0
0001403500  8583  8300  00C0  8683  8305  0589  C083  8300
0001403520  00C5  C583  0100  000A  8075  8183  6400  8308
0001403540  0594  0501  7800  8310  0080  0701  7F00  8583
0001403560  8300  00C0  0A01  7500  8380  0081  0264  9783
0001403600  0105  0007  837F  00C0  5A83  0103  000A  8075
0001403620  8183  6400  8302  0599  0501  7800  8320  0080
0001403640  0501  7800  8318  0080  0401  7F00  C083  0100
0001403660  000A  8075  C083  6400  8301  059D  0A01  7500
0001403700  8380  0081  0064  0183  0102  0001  0180  0016
0001403720  3079  8303  0203  0483  8202  280A  6E75  6174
0001403740  6767  6465  6929  0A01  7F00  8183  8300  0081
0001403760  8183  0100  001C  827F  7006  6361  5F6B  0068
0001404000  0682  6966  656C  685F  8202  6606  6E75  5F63
0001404020  0468  0101  8000  0101  8000  0101  8000  0101
0001404040  8000  0101  8000  0101  8000  0101  8000  0101
*
0001404220  8000  0101  8000  0101  8000  0101  8000  0501
0001404240  7800  8358  0080  0501  7800  8328  0080  0101
0001404260  8000  0101  8000  0101  8000  0101  8000  0101
*
0001404520  8000  0101  8000  0701  7800  0085  8301  0080
0001404540  0101  8000  0101  8000  0101  8000  0101  8000
*
0001405720  0701  7A00  8373  02F2  0082  0A01  7500  8380
0001405740  0081  0064  0183  0102  0001  0180  0001  0180
0001405760  0001  0180  0001  0180  0001  0180  0001  0180
*
0001407200  0001  0180  0001  0180  0001  0180  0018  8579
0001407220  0120  8302  039D  9E83  8203  280A  6E75  6174
0001407240  6767  6465  6929  0701  7F00  8683  8300  0254
0001407260  1501  7F00  0682  626F  5F6A  6469  8200  6F08
0001407300  6A62  6E5F  6D61  0465  0101  8000  1601  7900
0001407320  0120  A183  8303  03A2  0A82  7528  746E  6761
0001407340  6567  2964  0169  0004  837F  0086  0901  7F00
0001407360  0582  7564  6D6D  0079  0101  8000  0101  8000
0001407400  0101  8000  0101  8000  0101  8000  0101  8000
*
0001407760  0701  7A00  8373  039C  0082  0101  8000  0101
0001410000  8000  0101  8000  0101  8000  0101  8000  0101
*
0001411100  8000  0101  8000  1801  7900  8085  0601  7683
0001411120  8304  0477  0A82  7528  746E  6761  6567  2964
0001411140  0169  0013  837F  0086  5483  8302  0081  8683
0001411160  8300  0081  C083  0100  0030  827F  6902  0064
0001411200  0482  616E  656D  8204  7404  7079  2465  0782
0001411220  6574  7473  695F  2664  0482  7473  7461  822A
0001411240  7008  7461  5F68  7470  2C72  0101  8000  0101
0001411260  8000  0101  8000  0101  8000  0701  7A00  8373
0001411300  047D  0082  0701  7A00  8373  0475  0082  0101
0001411320  8000  0101  8000  0101  8000  0101  8000  0101
0001411340  8000  1801  7900  5085  0605  8583  8304  0486
0001411360  0A82  7528  746E  6761  6567  2964  0169  0007
0001411400  8578  0400  8083  0100  0013  837F  0484  8183
0001411420  8300  0085  8583  8300  0086  5483  0102  0053
```

```
THU MAR 14 17:31:54 1991  DB_PI.DLL  PAGE 349, LINE 20533

0001411440  827F  7007  736F  625F  6B6C  8200  620E  7274
0001411460  5F76  706F  6E65  6D5F  646F  8565  0080  0882
0001411500  6966  5F78  6973  657A  8285  8200  6B09  7965
0001411520  695F  5F73  6469  8485  8200  6C07  7361  5F74
0001411540  6469  8685  8200  6609  6C69  5F65  616E  656D
0001411560  8A85  0100  0001  0180  0018  8579  1300  8307
0001411600  048A  8B83  8204  280A  6E75  6174  6767  6465
0001411620  6929  0701  7800  0085  8308  0080  1601  7F00
0001411640  8683  8300  0489  8383  8304  0483  8683  8300
0001411660  0085  8183  0100  0052  827F  6405  6972  6576
0001411700  8200  6D07  7061  645F  7269  8204  6F0B  6A62
0001411720  745F  6C62  685F  6C64  0485  8201  720B  6C65
0001411740  745F  6C62  685F  6C64  AE85  8201  7705  5F66
0001411760  6469  5885  8202  6C06  636F  656B  8564  025C
0001412000  0582  7564  6D6D  8579  025E  0101  8000  0101
0001412020  8000  0101  8000  0101  8000  0101  8000  0101
*
0001412120  8000  0101  8000  0101  8000  0101  8000  0701
0001412140  7A00  8373  0483  0082  0101  8000  0101  8000
0001412160  0101  8000  0101  8000  0101  8000  0101  8000
*
0001412500  0101  8000  0701  7A00  8373  0488  0082  0101
0001412520  8000  0101  8000  0101  8000  0101  8000  0101
*
0001412560  8000  0101  8000  1801  7900  2085  0301  E583
0001412600  8304  04E6  0A82  7528  746E  6761  6567  2964
0001412620  0169  000A  837F  0085  8183  8300  0254  2001
0001412640  7F00  0882  6361  6563  7373  6465  8200  6405
0001412660  6D75  796D  8202  6609  6C69  5F65  616E  656D
0001412700  0104  0018  8579  0800  8301  04E8  E983  8204
0001412720  280A  6E75  6174  6767  6465  6929  0401  7F00
0001412740  8983  0104  000C  827F  6408  7269  6E5F  6D61
0001412760  0065  1801  7900  1085  084A  ED83  8304  04EE
0001413000  0A82  7528  746E  6761  6567  2964  0169  0007
0001413020  8578  0FF0  8383  0104  0007  8578  1800  E783
0001413040  0104  0019  837F  04E4  E483  8304  04EB  EC83
0001413060  8304  0483  8383  8304  0483  EB83  0104  0053
0001413100  827F  740A  7473  735F  7263  7069  0074  0A82
0001413120  7374  5F74  6568  6461  7265  8224  6903  676D
0001413140  8248  6907  676D  645F  7269  4685  8202  6604
0001413160  746C  8572  0546  0382  6F61  8569  05F0  0482
0001413200  7865  6365  9A85  8206  6707  6E65  7265  6369
0001413220  4485  0107  0001  0180  0018  8579  53B0  830B
0001413240  04F1  F283  8204  280A  6E75  6174  6767  6465
0001413260  6929  2201  7F00  8683  8300  0254  8183  8300
0001413300  0081  A083  8303  0085  8183  8300  0085  8183
0001413320  8300  0489  EA83  0104  006F  827F  6902  0064
0001413340  0482  616E  656D  8204  610B  6363  7365  5F73
0001413360  6F6D  6564  8224  6C0A  636F  5F6B  6373  706F
0001413400  2665  0A82  6873  7261  5F65  6E69  6F66  8228
0001413420  6F08  6570  5F6E  6E63  2C74  0582  7073  7261
0001413440  2E65  0882  6F6C  6B63  685F  6C64  8230  7306
0001413460  6170  6572  3231  0882  6964  5F72  6170  6874
0001413500  8234  7303  6264  3485  0101  0001  0180  0001
0001413520  0180  0007  737A  F083  8204  0100  0001  0180
0001413540  0001  0180  0001  0180  0001  0180  0001  0180
*
0001413660  0001  0180  0001  0180  0001  0180  0018  8579
0001413700  0130  8303  050F  1083  8205  280A  6E75  6174
```

THU MAR 14 17:31:54 1991 DB_PI.DLL PAGE 350, LINE 20592

```
0001413720  6767  6465  6929  0A01  7F00  5483  8302  0086
0001413740  8183  0100  0018  827F  6E04  6D61  0065  0682
0001413760  626F  5F6A  6469  8220  7304  6174  2474  0101
0001414000  8000  0101  8000  0101  8000  0101  8000  0101
*
0001414460  8000  0701  7A00  8373  050E  0082  0101  8000
0001414500  0101  8000  0101  8000  0101  8000  0101  8000
*
0001415240  0101  8000  0501  7800  8330  0080  0A01  7500
0001415260  8380  0081  0264  BB83  0105  0007  837F  04F5
0001415300  C083  0100  000A  8075  8183  6400  8305  05BD
0001415320  1001  7F00  F583  8304  0081  8183  8300  00C5
0001415340  C583  0100  0010  837F  00C0  8183  8300  00C1
0001415360  C583  8300  00C5  0A01  7500  8380  0081  0573
0001415400  BE83  0105  0001  0180  0007  8578  0098  8083
0001415420  0100  0005  3878  8083  0100  0005  6078  8283
0001415440  0100  0013  837F  0086  8183  8300  0081  C183
0001415460  8300  00C5  C583  0100  000A  8075  8183  7300
0001415500  8306  05C4  0101  8000  0501  7800  8378  0080
0001415520  0701  7F00  F583  8304  00C0  0A01  7500  8380
0001415540  0081  0264  C883  0105  0005  1078  8083  0100
0001415560  0007  837F  04F5  C083  0100  000A  8075  8183
0001415600  6400  8302  05CB  1001  7F00  F583  8304  0081
0001415620  8183  8300  00C5  C583  0100  000A  8075  8183
0001415640  6400  8305  05CD  0701  7800  0885  8301  0080
0001415660  0101  8000  0101  8000  1001  7F00  8683  8300
0001415700  0081  8583  8300  00C1  0083  0100  000A  8075
0001415720  8183  6400  8305  05D2  0101  8000  0101  8000
0001415740  1C01  7F00  C083  8300  0086  8183  8300  0081
0001415760  C083  8300  0086  7C83  8304  00C5  C583  0100
0001416000  000A  8075  8183  6400  8309  05D6  0101  8000
0001416020  0101  8000  1C01  7F00  F583  8304  0086  8183
0001416040  8300  00C0  8583  8300  0081  7C83  8304  00C5
0001416060  C583  0100  000A  8075  8183  6400  8309  05DA
0001416100  0101  8000  0101  8000  1301  7F00  8683  8300
0001416120  0085  8183  8300  047C  C583  8300  00C5  0A01
0001416140  7500  8380  0081  0664  DE83  0105  0001  0180
0001416160  0001  0180  0019  837F  04D9  C083  8300  0086
0001416200  8183  8300  0085  7C83  8304  00C5  C583  0100
0001416220  000A  8075  8183  6400  8308  05E2  1301  7F00
0001416240  C083  8300  0086  8183  8300  0085  C583  8300
0001416260  047C  0A01  7500  8380  0081  0673  E483  0105
0001416300  0007  837F  047D  8583  0100  000A  8075  0083
0001416320  7302  8302  05E6  0101  8000  0101  8000  1601
0001416340  7900  0330  0383  8302  0204  0A82  7528  746E
0001416360  6761  6567  2964  0169  000A  837F  0081  8183
0001416400  8300  0081  1C01  7F00  0682  6170  6B63  685F
0001416420  8200  6606  6C69  5F65  0268  0682  7566  636E
0001416440  685F  0104  0001  0180  0001  0180  0001  0180
0001416460  0001  0180  0001  0180  0001  0180  0001  0180
*
0001416660  0005  5078  8083  0100  0005  2878  8083  0100
0001416700  0007  737A  2B83  8202  0100  000A  8075  8183
0001416720  6400  8300  0201  0101  8000  0101  8000  0101
0001416740  8000  0101  8000  0101  8000  0101  8000  0101
*
0001425160  8000  0101  8000  0A01  7F00  C083  8300  0081
0001425200  C683  0100  000A  8075  8183  7300  8303  0554
0001425220  0101  8000  0101  8000  0501  7800  8330  0080
```

THU MAR 14 17:31:54 1991 DB_PI.DLL PAGE 351, LINE 20651

```
0001425240  0501  7800  8338  0080  0501  7800  8360  0082
0001425260  0101  8000  0101  8000  0101  8000  0101  8000
*
0001425540  0701  7800  0085  8301  0080  0101  8000  0101
0001425560  8000  0101  8000  0101  8000  0101  8000  0101
*
0001430160  8000  0101  8000  0101  8000  1801  7900  5085
0001430200  0605  7383  8303  0374  0A82  7528  746E  6761
0001430220  6567  2964  0169  0007  8578  0400  8083  0100
0001430240  0013  837F  0372  8183  8300  0085  8583  8300
0001430260  0086  2C83  0102  0053  827F  7007  736F  625F
0001430300  6B6C  8200  620E  7274  5F76  706F  6E65  6D5F
0001430320  646F  8565  0080  0882  6966  5F78  6973  657A
0001430340  8285  8200  6B09  7965  695F  5F73  6469  8485
0001430360  8200  6C07  7361  5F74  6469  8685  8200  6609
0001430400  6C69  5F65  616E  656D  8A85  0100  0001  0180
0001430420  0018  8579  1300  8307  0378  7983  8203  280A
0001430440  6E75  6174  6767  6465  6929  0701  7800  0085
0001430460  8308  0080  1601  7F00  8683  8300  0377  7183
0001430500  8303  0371  8683  8300  0085  8183  0100  0052
0001430520  827F  6405  6972  6576  8200  6D07  7061  645F
0001430540  7269  8204  6F0B  6A62  745F  6C62  685F  6C64
0001430560  0485  8201  720B  6C65  745F  6C62  685F  6C64
0001430600  AE85  8201  7705  5F66  6469  5885  8202  6C06
0001430620  636F  656B  8564  025C  0582  7564  6D6D  8579
0001430640  025E  0101  8000  0101  8000  0101  8000  0101
0001430660  8000  0101  8000  0101  8000  0101  8000  0101
*
0001430740  8000  0101  8000  0701  7800  0085  8302  0080
0001430760  0101  8000  0101  8000  0101  8000  0101  8000
*
0001431300  0101  8000  0101  8000  0701  7A00  8373  0376
0001431320  0082  0101  8000  0101  8000  0101  8000  0101
0001431340  8000  0101  8000  0101  8000  0101  8000  0101
*
0001431540  8000  1801  7900  8085  0703  E883  8303  03E9
0001431560  0A82  7528  746E  6761  6567  2964  0169  0016
0001431600  837F  0086  2C83  8302  0082  8683  8300  0085
0001431620  8583  8300  03BB  4601  7F00  0282  6469  8200
0001431640  6E04  6D61  0465  0A82  6974  656D  735F  6174
0001431660  706D  8224  7506  7273  695F  2864  0A82  6F74
0001431700  6174  5F6C  6973  657A  822C  700B  7461  5F68
0001431720  666F  7366  7465  822E  7305  6170  6572  0130
0001431740  0001  0180  0018  8579  0580  8302  03EC  ED83
0001431760  8203  280A  6E75  6174  6767  6465  6929  0701
0001432000  7F00  E783  8303  038B  0F01  7F00  0382  6468
0001432020  0072  0582  7073  7261  7065  0101  8000  1801
0001432040  7900  8085  0207  F083  8303  03F1  0A82  7528
0001432060  746E  6761  6567  2964  0169  0007  837F  03E7
0001432100  7283  0103  000F  827F  6803  7264  8200  7305
0001432120  6170  6572  0170  0001  0180  0018  8579  0780
0001432140  8302  03F4  F583  8203  280A  6E75  6174  6767
0001432160  6465  6929  0701  7F00  E783  8303  0372  0F01
0001432200  7F00  0382  6468  0072  0582  7073  7261  7065
0001432220  0101  8000  1801  7900  8085  0205  F883  8303
0001432240  03F9  0A82  7528  746E  6761  6567  2964  0169
0001432260  0007  837F  03E7  8B83  0103  000F  827F  6803
0001432300  7264  8200  7305  6170  6572  0170  0001  0180
0001432320  0018  8579  0580  8302  03FC  FD83  8203  280A
```

THU MAR 14 17:31:54 1991 DB_PI.DLL PAGE 352, LINE 20710

```
0001432340  6E75  6174  6767  6465  6929  0701  7F00  E783
0001432360  8303  038B  0F01  7F00  0382  6468  0072  0582
0001432400  7073  7261  7065  0101  8000  1801  7900  8085
0001432420  0205  0083  8304  0401  0A82  7528  746E  6761
0001432440  6567  2964  0169  0007  837F  03E7  8B83  0103
0001432460  000F  827F  6803  7264  8200  7305  6170  6572
0001432500  0170  0001  0180  0018  8579  0F80  8302  0407
0001432520  0883  8204  280A  6E75  6174  6767  6465  6929
0001432540  1801  7900  8085  0707  0583  8304  0406  0A82
0001432560  7528  746E  6761  6567  2964  0169  0016  837F
0001432600  03E7  EB83  8303  03EF  F383  8303  03F7  FB83
0001432620  8303  03FF  4201  7F00  0682  7766  6F5F  6A62
0001432640  8200  6606  6C6F  6564  0072  0782  7374  5F74
0001432660  626F  006A  0682  6374  6F5F  6A62  8200  7406
0001432700  5F70  626F  006A  0682  7274  6F5F  6A62  8200
0001432720  7407  706D  6F5F  6A62  0100  0007  837F  0404
0001432740  7783  0103  0014  827F  6602  0077  0982  6870
0001432760  7379  705F  7461  8568  00F0  1801  7900  4085
0001433000  0301  0B83  8304  040C  0A82  7528  746E  6761
0001433020  6567  2964  0169  0007  8578  0100  8483  0100
0001433040  000A  837F  0086  8683  8300  040A  2001  7F00
0001433060  0982  6170  6572  746E  695F  0064  0882  6863
0001433100  6C69  5F64  6469  8204  7305  6170  6572  0108
0001433120  0001  0180  0001  0180  0001  0180  0001  0180
0001433140  0007  737A  E783  8203  0100  0001  0180  0001
0001433160  0180  0001  0180  0001  0180  0001  0180  0001
*
0001433360  0180  0001  0180  0001  0180  0001  0180  0007
0001433400  837F  03C2  C083  0100  000A  8075  8183  6400
0001433420  8302  0437  0401  7F00  C283  0103  000A  8075
0001433440  8183  6400  8301  0439  0401  7F00  C283  0103
0001433460  000A  8075  8183  6400  8301  043B  0401  7F00
0001433500  C283  0103  000A  8075  8183  6400  8301  043D
0001433520  0501  7800  8310  0080  0401  7F00  C283  0103
0001433540  000A  8075  8183  6400  8301  0440  1301  7F00
0001433560  C283  8303  0086  C083  8300  0085  C183  8300
0001433600  00C0  0A01  7500  8380  0081  0664  4283  0104
0001433620  0005  1878  8083  0100  0001  0180  0001  0180
0001433640  0001  0180  0001  0180  0001  0180  0001  0180
*
0001434100  0001  0180  0001  0180  0007  8578  0100  8083
0001434120  0100  0001  0180  0001  0180  0001  0180  0001
0001434140  0180  0001  0180  0001  0180  0001  0180  0001
*
0001436420  0180  0001  0180  0018  8579  0120  8302  035F
0001436440  6083  8203  280A  6E75  6174  6767  6465  6929
0001436460  0701  7F00  8683  8300  022C  1501  7F00  0682
0001436500  626F  5F6A  6469  8200  6F08  6A62  6E5F  6D61
0001436520  0465  0101  8000  0101  8000  0101  8000  0101
0001436540  8000  0101  8000  0101  8000  0101  8000  0101
*
0001436720  8000  0101  8000  1801  7900  6085  0502  8383
0001436740  8303  0384  0A82  7528  746E  6761  6567  2964
0001436760  0169  0010  837F  0086  2C83  8302  0082  2C83
0001437000  8302  00C0  2E01  7F00  0282  6469  8200  6E04
0001437020  6D61  0465  0A82  6974  656D  735F  6174  706D
0001437040  8224  6F05  6E77  7265  8228  7009  7968  5F73
0001437060  6170  6874  0148  0001  0180  0001  0180  0001
0001437100  0180  0001  0180  0001  0180  0001  0180  0001
```

THU MAR 14 17:31:54 1991 DB_PI.DLL PAGE 353, LINE 20769

```
*
0001437160  0180  0001  0180  0001  0180  0007  737A  9783
0001437200  8203  0100  0007  737A  8283  8203  0100  0001
0001437220  0180  0001  0180  0001  0180  0001  0180  0001
0001437240  0180  0001  0180  0007  737A  C083  8200  0100
0001437260  0001  0180  0001  0180  0001  0180  0001  0180
0001437300  0007  737A  A483  8203  0100  0007  737A  5E83
0001437320  8203  0100  0001  0180  0001  0180  0001  0180
0001437340  0001  0180  0001  0180  0001  0180  0001  0180
0001437360  0018  8579  0550  8306  03AE  AF83  8203  280A
0001437400  6E75  6174  6767  6465  6929  0701  7800  0085
0001437420  8304  0080  1301  7F00  AD83  8303  0081  8583
0001437440  8300  0085  8683  8300  022C  5301  7F00  0782
0001437460  6F70  5F73  6C62  006B  0E82  7462  7672  6F5F
0001437500  6570  5F6E  6F6D  6564  8085  8200  6608  7869
0001437520  735F  7A69  8565  0082  0982  656B  5F79  7369
0001437540  695F  8564  0084  0782  616C  7473  695F  8564
0001437560  0086  0982  6966  656C  6E5F  6D61  8565  008A
0001437600  0101  8000  1801  7900  0085  0713  B383  8303
0001437620  03B4  0A82  7528  746E  6761  6567  2964  0169
0001437640  0007  8578  0800  8083  0100  0016  837F  0086
0001437660  B283  8303  03AC  AC83  8303  0086  8583  8300
0001437700  0081  5201  7F00  0582  7264  7669  0065  0782
0001437720  616D  5F70  6964  0472  0B82  626F  5F6A  6274
0001437740  5F6C  6468  856C  0104  0B82  6572  5F6C  6274
0001437760  5F6C  6468  856C  01AE  0582  6677  695F  8564
0001440000  0258  0682  6F6C  6B63  6465  5C85  8202  6405
0001440020  6D75  796D  5E85  0102  0001  0180  0001  0180
0001440040  0001  0180  0001  0180  0001  0180  0001  0180
*
0001440120  0001  0180  0001  0180  0001  0180  0007  8578
0001440140  0200  8083  0100  0001  0180  0001  0180  0001
0001440160  0180  0001  0180  0001  0180  0001  0180  0001
*
0001440460  0180  0001  0180  0001  0180  0001  0180  0007
0001440500  737A  B183  8203  0100  0001  0180  0001  0180
0001440520  0001  0180  0001  0180  0001  0180  0001  0180
*
0001440720  0001  0180  0001  0180  0018  8579  0380  8307
0001440740  0423  2483  8204  280A  6E75  6174  6767  6465
0001440760  6929  1601  7F00  8683  8300  022C  8283  8300
0001441000  0086  8583  8300  0085  C683  0103  0046  827F
0001441020  6902  0064  0482  616E  656D  8204  740A  6D69
0001441040  5F65  7473  6D61  2470  0682  7375  5F72  6469
0001441060  8228  740A  746F  6C61  735F  7A69  2C65  0B82
0001441100  6170  6874  6F5F  6666  6573  2E74  0582  7073
0001441120  7261  3065  0101  8000  0101  8000  0101  8000
0001441140  0101  8000  0101  8000  0101  8000  0101  8000
*
0001441320  1801  7900  4085  0301  4683  8304  0447  0A82
0001441340  7528  746E  6761  6567  2964  0169  0007  8578
0001441360  0100  8483  0100  000A  837F  0086  8683  8300
0001441400  0445  2001  7F00  0982  6170  6572  746E  695F
0001441420  0064  0882  6863  6C69  5F64  6469  8204  7305
0001441440  6170  6572  0108  0001  0180  0001  0180  0001
0001441460  0180  0001  0180  0007  737A  2283  8204  0100
0001441500  0001  0180  0001  0180  0001  0180  0001  0180
*
0001441720  0001  0180  0016  837F  03FD  C083  8300  0086
```

THU MAR 14 17:31:54 1991 DB_PI.DLL PAGE 354, LINE 20828

```
0001441740  C083  8300  0081  C083  8300  00C6  0A01  7500
0001441760  8380  0081  0764  7283  0104  0010  837F  03FD
0001442000  C083  8300  0081  C083  8300  00C6  0A01  7500
0001442020  8380  0081  0564  7483  0104  0010  837F  03FD
0001442040  C083  8300  0086  8183  8300  00C6  0A01  7500
0001442060  8380  0081  0564  7683  0104  000D  837F  03FD
0001442100  C083  8300  0086  9683  0103  000A  8075  8183
0001442120  6400  8304  0478  0A01  7F00  FD83  8303  00C0
0001442140  C683  0100  000A  8075  8183  6400  8303  047A
0001442160  1001  7F00  FD83  8303  00C0  8683  8300  00C0
0001442200  9E83  0103  000A  8075  8183  6400  8305  047C
0001442220  1001  7F00  FD83  8303  00C0  8683  8300  00C0
0001442240  C683  0100  000A  8075  8183  6400  8305  047E
0001442260  0101  8000  0101  8000  1001  7F00  8683  8300
0001442300  00C0  C583  8300  00C5  A383  0103  000A  8075
0001442320  8183  6400  8305  0482  1001  7F00  FD83  8303
0001442340  00C0  8683  8300  00C5  A383  0103  000A  8075
0001442360  8183  6400  8305  0484  1001  7F00  FD83  8303
0001442400  00C0  8683  8300  00C6  C083  0100  000A  8075
0001442420  8183  6400  8305  0486  0501  7800  8310  0080
0001442440  0101  8000  0101  8000  1601  7F00  FD83  8303
0001442460  0086  FD83  8303  0086  8683  8300  00C0  8583
0001442500  0100  000A  8075  8183  6400  8307  048B  0501
0001442520  7800  8318  0080  1C01  7F00  FD83  8303  00C0
0001442540  8683  8300  03FD  C083  8300  0086  8583  8300
0001442560  0085  C683  0100  000A  8075  8183  6400  8309
0001442600  048E  0D01  7F00  FD83  8303  0086  C083  8300
0001442620  00C6  0A01  7500  8380  0081  0464  9083  0104
0001442640  0001  0180  0001  0180  0001  0180  0001  0180
*
0001443120  0007  8578  0100  8083  0100  0001  0180  0001
0001443140  0180  0001  0180  0001  0180  0001  0180  0001
*
0001445100  0180  0016  2079  8301  0328  2983  8203  280A
0001445120  6E75  6174  6767  6465  6929  0401  7F00  8683
0001445140  0100  0009  827F  6405  6D75  796D  0100  0001
0001445160  0180  0007  737A  2783  8203  0100  0001  0180
0001445200  0001  0180  0001  0180  0001  0180  0001  0180
*
0001445620  0018  8579  0550  8306  0373  7463  8203  280A
0001445640  6E75  6174  6767  6465  6929  0701  7800  0085
0001445660  8304  0080  1301  7F00  7283  8303  0081  8583
0001445700  8300  0085  8683  8300  022C  5301  7F00  0782
0001445720  6F70  5F73  6C62  006B  0E82  7462  7672  6F5F
0001445740  6570  5F6E  6F6D  6564  8085  8200  6608  7869
0001445760  735F  7A69  8565  0082  0982  656B  5F79  7369
0001446000  695F  8564  0084  0782  616C  7473  695F  8564
0001446020  0086  0982  6966  656C  6E5F  6D61  8565  008A
0001446040  0101  8000  1801  7900  0085  0713  7883  8303
0001446060  0379  0A82  7528  746E  6761  6567  2964  0169
0001446100  0007  8578  0800  8083  0100  0016  837F  0086
0001446120  7783  8303  0371  7183  8303  0086  8583  8300
0001446140  0081  5201  7F00  0582  7264  7669  0065  0782
0001446160  616D  5F70  6964  0472  0B82  626F  5F6A  6274
0001446200  5F6C  6468  856C  0104  0B82  6572  5F6C  6274
0001446220  5F6C  6468  856C  01AE  0582  6677  695F  8564
0001446240  0258  0682  6F6C  6B63  6465  5C85  8202  6405
0001446260  6D75  796D  5E85  0102  0001  0180  0001  0180
0001446300  0001  0180  0001  0180  0001  0180  0001  0180
```

```
THU MAR 14 17:31:54 1991  DB_PI.DLL  PAGE 355, LINE 20887

*
0001446360  0001  0180  0001  0180  0001  0180  0007  8578
0001446400  0200  8083  0100  0001  0180  0001  0180  0001
0001446420  0180  0001  0180  0001  0180  0001  0180  0001
*
0001446720  0180  0001  0180  0001  0180  0001  0180  0007
0001446740  737A  7683  8203  0100  0001  0180  0001  0180
0001446760  0001  0180  0001  0180  0001  0180  0001  0180
*
0001447160  0001  0180  0001  0180  0018  8579  0380  8307
0001447200  03E8  E983  8203  280A  6E75  6174  6767  6465
0001447220  6929  1601  7F00  8683  8300  022C  8283  8300
0001447240  0086  8583  8300  0085  8B83  0103  0046  827F
0001447260  6902  0064  0482  616E  656D  8204  740A  6D69
0001447300  5F65  7473  6D61  2470  0682  7375  5F72  6469
0001447320  8228  740A  746F  6C61  735F  7A69  2C65  0B82
0001447340  6170  6874  6F5F  6666  6573  2E74  0582  7073
0001447360  7261  3065  0101  8000  1801  7900  8085  0205
0001447400  EC83  8303  03ED  0A82  7528  746E  6761  6567
0001447420  2964  0169  0007  837F  03E7  8B83  0103  000F
0001447440  827F  6803  7264  8200  7305  6170  6572  0170
0001447460  0001  0180  0018  8579  0780  8302  03F0  F183
0001447500  8203  280A  6E75  6174  6767  6465  6929  0701
0001447520  7F00  E783  6303  0372  0F01  7F00  0382  6468
0001447540  0072  0582  7073  7261  7065  0101  8000  1801
0001447560  7900  8085  0207  F483  8303  03F5  0A82  7528
0001447600  746E  6761  6567  2964  0169  0007  837F  03E7
0001447620  7283  0103  000F  827F  6803  7264  8200  7305
0001447640  6170  6572  0170  0001  0180  0018  8579  0580
0001447660  8302  03F8  F983  8203  280A  6E75  6174  6767
0001447700  6465  6929  0701  7F00  E783  8303  038B  0F01
0001447720  7F00  0382  6468  0072  0582  7073  7261  7065
0001447740  0101  8000  1801  7900  8085  0205  FC83  8303
0001447760  03FD  0A82  7528  746E  6761  6567  2964  0169
0001450000  0007  837F  03E7  8B83  0103  000F  827F  6803
0001450020  7264  8200  7305  6170  6572  0170  0001  0180
0001450040  0018  8579  0580  8302  0400  0183  8204  280A
0001450060  6E75  6174  6767  6465  6929  0701  7F00  E783
0001450100  8303  038B  0F01  7F00  0382  6468  0072  0582
0001450120  7073  7261  7065  0101  8000  1801  7900  8085
0001450140  020F  0783  8304  0408  0A82  7528  746E  6761
0001450160  6567  2964  0169  0018  8579  0780  8307  0405
0001450200  0683  8204  280A  6E75  6174  6767  6465  6929
0001450220  1601  7F00  E783  8303  03EB  EF83  8303  03F3
0001450240  F783  8303  03FB  FF83  0103  0042  827F  6606
0001450260  5F77  626F  006A  0682  6F66  646C  7265  8200
0001450300  7407  7473  6F5F  6A62  8200  7406  5F63  626F
0001450320  006A  0682  7074  6F5F  6A62  8200  7406  5F72
0001450340  626F  006A  0782  6D74  5F70  626F  006A  0701
0001450360  7F00  0483  8304  0377  1401  7F00  0282  7766
0001450400  8200  7009  7968  5F73  6170  6874  F085  0100
0001450420  0001  0180  0001  0180  0001  0180  0001  0180
*
0001450460  0007  737A  E783  8203  0100  0001  0180  0001
0001450500  0180  0001  0180  0001  0180  0001  0180  0001
*
0001450700  0180  0001  0180  0001  0180  0001  0180  0019
0001450720  837F  03C2  8683  8300  032B  8183  8300  0081
0001450740  C083  8300  00C0  C583  0100  000A  8075  8183
```

```
THU MAR 14 17:31:54 1991  DB_PI.DLL  PAGE 356, LINE 20946

0001450760  6400  8308  0437  0D01  7F00  C283  8303  0086
0001451000  C083  8300  0085  0A01  7500  8380  0081  0464
0001451020  3983  0104  0010  837F  03C2  8683  8300  0081
0001451040  C083  8300  0085  0A01  7500  8380  0081  0564
0001451060  3B83  0104  0007  837F  0086  C083  0100  000A
0001451100  8075  8183  6400  8302  043D  0101  8000  0101
0001451120  8000  0101  8000  0101  8000  0101  8000  0101
*
0001451360  8000  0101  8000  0101  8000  0701  7800  0085
0001451400  8301  0080  0101  8000  0101  8000  0101  8000
0001451420  0101  8000  0101  8000  0101  8000  0101  8000
*
0001454240  1801  7900  5085  0605  9683  8303  0397  0A82
0001454260  7528  746E  6761  6567  2964  0169  0007  8578
0001454300  0400  8083  0100  0013  837F  0395  8183  8300
0001454320  0085  8583  8300  0086  2C83  0102  0053  827F
0001454340  7007  736F  625F  6B6C  8200  620E  7274  5F76
0001454360  706F  6E65  6D5F  646F  8565  0080  0882  6966
0001454400  5F78  6973  657A  8285  8200  6B09  7965  695F
0001454420  5F73  6469  8485  8200  6C07  7361  5F74  6469
0001454440  8685  8200  6609  6C69  5F65  616E  656D  8A85
0001454460  0100  0001  0180  0018  8579  1300  8307  039B
0001454500  9C83  8203  2B0A  6E75  6174  6767  6465  6929
0001454520  0701  7800  0085  8308  0080  1601  7F00  8683
0001454540  8300  039A  9483  8303  0394  8683  8300  0085
0001454560  8183  0100  0052  827F  6405  6972  6576  8200
0001454600  6D07  7061  645F  7269  8204  6F0B  6A62  745F
0001454620  6C62  685F  6C64  0485  8201  720B  6C65  745F
0001454640  6C62  685F  6C64  AE85  8201  7705  5F66  6469
0001454660  5885  8202  6C06  636F  656B  8564  025C  0582
0001454700  7564  6D6D  8579  025E  0101  8000  0101  8000
0001454720  0101  8000  0101  8000  0101  8000  0101  8000
*
0001455340  0101  8000  0101  8000  0701  7A00  8373  0399
0001455360  0082  0101  8000  0101  8000  0101  8000  0101
0001455400  8000  0101  8000  0101  8000  0101  8000  0101
*
0001456300  8000  0401  7F00  E583  0103  000A  8075  8183
0001456320  6400  8301  045A  0401  7F00  E583  0103  000A
0001456340  8075  8183  6400  8301  045C  0101  8000  0101
0001456360  8000  0101  8000  0101  8000  0101  8000  0101
*
0001456620  8000  0101  8000  0101  8000  0701  7800  0085
0001456640  8301  0080  0101  8000  0101  8000  0101  8000
0001456660  0101  8000  0101  8000  0101  8000  0101  8000
*
0001461540  0101  8000  0101  8000  0701  7A00  8373  00C0
0001461560  0082  0101  8000  0101  8000  0101  8000  0101
0001461600  8000  0101  8000  0101  8000  0101  8000  0101
*
0001461640  8000  0101  8000  1801  7900  5085  0605  AE83
0001461660  8303  03AF  0A82  7528  746E  6761  6567  2964
0001461700  0169  0007  8578  0400  8083  0100  0013  837F
0001461720  03AD  8183  8300  0085  8583  8300  0086  2C83
0001461740  0102  0053  827F  7007  736F  625F  6B6C  8200
0001461760  620E  7274  5F76  706F  6E65  6D5F  646F  8565
0001462000  0080  0882  6966  5F78  6973  657A  8285  8200
0001462020  6B09  7965  695F  5F73  6469  8485  8200  6C07
0001462040  7361  5F74  6469  8685  8200  6609  6C69  5F65
```

```
THU MAR 14 17:31:54 1991  DB_PI.DLL  PAGE 357, LINE 21005

0001462060  616E  656D  8A85  0100  0001  0180  0018  8579
0001462100  1300  8307  03B3  B483  8203  280A  6E75  6174
0001462120  6767  6465  6929  0701  7800  0085  8308  0080
0001462140  1601  7F00  8683  8300  03B2  AC83  8303  03AC
0001462160  8683  8300  0085  8183  0100  0052  827F  6405
0001462200  6972  6576  8200  6D07  7061  645F  7269  8204
0001462220  6F0B  6A62  745F  6C62  685F  6C64  0485  8201
0001462240  720B  6C65  745F  6C62  685F  6C64  AE85  8201
0001462260  7705  5F66  6469  5885  8202  6C06  636F  656B
0001462300  8564  025C  0582  7564  6D6D  8579  025E  0101
0001462320  8000  0101  8000  0101  8000  0101  8000  0101
*
0001462420  8000  0701  7800  0085  8302  0080  0101  8000
0001462440  0101  8000  0101  8000  0101  8000  0101  8000
*
0001462760  0101  8000  0701  7A00  8373  03B1  0082  0101
0001463000  8000  0101  8000  0101  8000  0101  8000  0101
*
0001463200  8000  0101  8000  0101  8000  0101  8000  1801
0001463220  7900  8085  0703  2383  8304  0424  0A82  7528
0001463240  746E  6761  6567  2964  0169  0016  837F  0086
0001463260  2C83  8302  0082  8683  8300  0085  8583  8300
0001463300  03C6  4601  7F00  0282  6469  8200  6E04  6D61
0001463320  0465  0A82  6974  656D  735F  6174  706D  8224
0001463340  7506  7273  695F  2864  0A82  6F74  6174  5F6C
0001463360  6973  657A  822C  700B  7461  5F68  666F  7366
0001463400  7465  822E  7305  6170  6572  0130  0001  0180
0001463420  0001  0180  0001  0180  0001  0180  0001  0180
*
0001464100  0001  0180  0001  0180  0007  837F  039E  C183
0001464120  0100  000A  8075  8183  6400  8302  0474  0A01
0001464140  7F00  FD83  8303  00C0  C683  0100  000A  8075
0001464160  8183  6400  8303  0476  0501  7800  8318  0080
0001464200  0501  7800  8310  0080  0101  8000  0101  8000
0001464220  0A01  7F00  FD83  8303  0086  9E83  0103  000A
0001464240  8075  8183  6400  8303  047C  0D01  7F00  FD83
0001464260  8303  0086  C083  8300  039E  0A01  7500  8380
0001464300  0081  0464  7E83  0104  000A  837F  00C0  C083
0001464320  8300  00C0  0A01  7500  8380  0081  0364  8083
0001464340  0104  0001  0180  0001  0180  0001  0180  0001
0001464360  0180  0001  0180  0001  0180  0001  0180  0001
*
0001464620  0180  0007  8578  0100  8083  0100  0001  0180
0001464640  0001  0180  0001  0180  0001  0180  0001  0180
*
0001465540  0001  0180  0012  6079  8305  02A0  A183  8202
0001465560  5F06  6F69  7562  6966  1001  7F00  C083  8300
0001465600  0081  C083  8300  0080  8083  0100  0027  827F
0001465620  5F04  7470  0072  0482  635F  746E  8204  5F05
0001465640  6162  6573  8206  5F05  6C66  6761  820A  5F05
0001465660  6966  656C  010B  0001  0180  0007  737A  9F83
0001465700  8202  0100  0001  0180  0001  0180  0001  0180
0001465720  0001  0180  0001  0180  0001  0180  0001  0180
*
0001470100  0018  8579  0550  8306  03C5  C683  8203  280A
0001470120  6E75  6174  6767  6465  6929  0701  7800  0085
0001470140  8304  0080  1301  7F00  C483  8303  0081  8583
0001470160  8300  0085  8683  8300  022C  5301  7F00  0782
0001470200  6F70  5F73  6C62  006B  0E82  7462  7672  6F5F
```

```
THU MAR 14 17:31:54 1991  DB_PI.DLL  PAGE 358, LINE 21064

0001470220   6570  5F6E  6F6D  6564  8085  8200  6608  7869
0001470240   735F  7A69  8565  0082  0982  656B  5F79  7369
0001470260   695F  8564  0084  0782  616C  7473  695F  8564
0001470300   0086  0982  6966  656C  6E5F  6D61  8565  008A
0001470320   0101  8000  1801  7900  0085  0713  CA83  8303
0001470340   03CB  0A82  7528  746E  6761  6567  2964  0169
0001470360   0007  8578  0800  8083  0100  0016  837F  0086
0001470400   C983  8303  03C3  C383  8303  0086  8583  8300
0001470420   0081  5201  7F00  0582  7264  7669  0065  0782
0001470440   616D  5F70  6964  0472  0B82  626F  5F6A  6274
0001470460   5F6C  6468  856C  0104  0B82  6572  5F6C  6274
0001470500   5F6C  6468  856C  01AE  0582  6677  695F  8564
0001470520   0258  0682  6F6C  6B63  6465  5C85  8202  6405
0001470540   6D75  796D  5E85  0102  0001  0180  0001  0180
0001470560   0001  0180  0001  0180  0001  0180  0001  0180
*
0001470640   0001  0180  0001  0180  0001  0180  0007  8578
0001470660   0200  8083  0100  0001  0180  0001  0180  0001
0001470700   0180  0001  0180  0001  0180  0001  0180  0001
*
0001471200   0180  0001  0180  0001  0180  0001  0180  0007
0001471220   737A  C883  8203  0100  0001  0180  0001  0180
0001471240   0001  0180  0001  0180  0001  0180  0001  0180
*
0001471440   0001  0180  0001  0180  0018  8579  0380  8307
0001471460   043A  3B83  8204  280A  6E75  6174  6767  6465
0001471500   6929  1601  7F00  8683  8300  022C  8283  8300
0001471520   0086  8583  8300  0085  DD83  0103  0046  827F
0001471540   6902  0064  0482  616E  656D  8204  740A  6D69
0001471560   5F65  7473  6D61  2470  0682  7375  5F72  6469
0001471600   8228  740A  746F  6C61  735F  7A69  2C65  0B82
0001471620   6170  6874  6F5F  6666  6573  2E74  0582  7073
0001471640   7261  3065  0101  8000  1801  7900  8085  0205
0001471660   3E83  8304  043F  0A82  7528  746E  6761  6567
0001471700   2964  0169  0007  837F  0439  DD83  0103  000F
0001471720   827F  6803  7264  8200  7305  6170  6572  0170
0001471740   0001  0180  0018  8579  0780  8302  0442  4383
0001471760   8204  280A  6E75  6174  6767  6465  6929  0701
0001472000   7F00  3983  8304  03C4  0F01  7F00  0382  6468
0001472020   0072  0582  7073  7261  7065  0101  8000  1801
0001472040   7900  8085  0207  4683  8304  0447  0A82  7528
0001472060   746E  6761  6567  2964  0169  0007  837F  0439
0001472100   C483  0103  000F  827F  6803  7264  8200  7305
0001472120   6170  6572  0170  0001  0180  0018  8579  0580
0001472140   8302  044A  4B83  8204  280A  6E75  6174  6767
0001472160   6465  6929  0701  7F00  3983  8304  03DD  0F01
0001472200   7F00  0382  6468  0072  0582  7073  7261  7065
0001472220   0101  8000  1801  7900  8085  0205  4E83  8304
0001472240   044F  0A82  7528  746E  6761  6567  2964  0169
0001472260   0007  837F  0439  DD83  0103  000F  827F  6803
0001472300   7264  8200  7305  6170  6572  0170  0001  0180
0001472320   0018  8579  0580  8302  0452  5383  8204  280A
0001472340   6E75  6174  6767  6465  6929  0701  7F00  3983
0001472360   8304  03DD  0F01  7F00  0382  6468  0072  0582
0001472400   7073  7261  7065  0101  8000  1801  7900  8085
0001472420   020F  5983  8304  045A  0A82  7528  746E  6761
0001472440   6567  2964  0169  0018  8579  0780  8307  0457
0001472460   5883  8204  280A  6E75  6174  6767  6465  6929
0001472500   1601  7F00  3983  8304  043D  4183  8304  0445
```

THU MAR 14 17:31:54 1991 DB_PI.DLL PAGE 359, LINE 21123

```
0001472520  4983  8304  044D  5183  0104  0042  827F  6606
0001472540  5F77  626F  006A  0682  6F66  646C  7265  8200
0001472560  7407  7473  6F5F  6A62  8200  7406  5F63  626F
0001472600  006A  0682  7074  6F5F  6A62  8200  7406  5F72
0001472620  626F  006A  0782  6D74  5F70  626F  006A  0701
0001472640  7F00  5683  8304  03C9  1401  7F00  0282  7766
0001472660  8200  7009  7968  5F73  6170  6874  F085  0100
0001472700  0018  8579  0140  8303  045D  5E83  8204  280A
0001472720  6E75  6174  6767  6465  6929  0701  7800  0085
0001472740  8301  0084  0A01  7F00  8683  8300  0086  5C83
0001472760  0104  0020  827F  7009  7261  6E65  5F74  6469
0001473000  8200  6308  6968  646C  695F  0464  0582  7073
0001473020  7261  0865  0101  8000  0101  8000  0101  8000
0001473040  0701  7A00  8373  0463  0082  0701  7A00  8373
0001473060  0439  0082  0101  8000  0101  8000  0101  8000
0001473100  0101  8000  0101  8000  0101  8000  0101  8000
*
0001473300  0101  8000  0101  8000  0701  7F00  1483  8304
0001473320  00C6  0A01  7500  8380  0081  0264  8983  0104
0001473340  0001  0180  0001  0180  0013  837F  0414  8683
0001473360  8300  00C0  C083  8300  00C0  C083  0100  000A
0001473400  8075  8183  6400  8306  048D  0501  7800  8310
0001473420  0080  0101  8000  0101  8000  1001  7F00  C083
0001473440  8300  0081  C083  8300  0086  8683  0100  000A
0001473460  8075  8183  6400  8305  0492  0501  7800  8338
0001473500  0080  0501  7800  8318  0080  0701  7800  B885
0001473520  8300  0080  0501  7800  8340  0080  1601  7F00
0001473540  1483  8304  0086  C083  8300  00C0  C083  8300
0001473560  0085  6283  0104  000A  8075  8183  6400  8307
0001473600  0498  0A01  7F00  1483  8304  00C0  C683  0100
0001473620  000A  8075  8183  6400  8303  049A  0701  7A00
0001473640  8373  043D  0082  0501  7800  8348  0080  0501
0001473660  7800  8308  0080  1001  7F00  1483  8304  0086
0001473700  C083  8300  00C0  C683  0100  000A  8075  8183
0001473720  6400  8305  049F  1001  7F00  1483  8304  0086
0001473740  C083  8300  00C0  C683  0100  000A  8075  8183
0001473760  6400  8305  04A1  0701  7A00  8373  0441  0082
0001474000  1001  7F00  1483  8304  0086  C083  8300  00C0
0001474020  C683  0100  000A  8075  8183  6400  8305  04A4
0001474040  0701  7A00  8373  0445  0082  1001  7F00  1483
0001474060  8304  0086  C083  8300  00C0  C683  0100  000A
0001474100  8075  8183  6400  8305  04A7  0701  7A00  8373
0001474120  0449  0082  1001  7F00  1483  8304  0086  C083
0001474140  8300  00C0  C683  0100  000A  8075  8183  6400
0001474160  8305  04AA  0701  7A00  8373  044D  0082  1301
0001474200  7F00  1483  8304  0086  C083  8300  0081  C083
0001474220  8300  00C6  0A01  7500  8380  0081  0664  AD83
0001474240  0104  000A  837F  0414  8683  8300  00C6  0A01
0001474260  7500  8380  0081  0364  AF83  0104  000A  837F
0001474300  0414  8683  8300  0000  0A01  7500  8380  0081
0001474320  0364  B183  0104  0019  837F  0414  8683  8300
0001474340  00C0  1483  8304  0086  C083  8300  00C0  C683
0001474360  0100  000A  8075  8183  6400  8308  04B3  1901
0001474400  7F00  1483  8304  0086  C083  8300  0414  8683
0001474420  8300  00C0  8583  8300  00C6  0A01  7500  8380
0001474440  0081  0864  B583  0104  0001  0180  0001  0180
0001474460  0001  0180  0001  0180  0001  0180  0001  0180
*
0001474720  0001  0180  0001  0180  0007  8578  0100  8083
```

```
THU MAR 14 17:31:54 1991  DB_PI.DLL  PAGE 360, LINE 21182

0001474740  0100  0001  0180  0001  0180  0001  0180  0001
0001474760  0180  0001  0180  0001  0180  0001  0180  0001
*
0001477500  0180  0001  0180  0001  0180  0001  0180  0018
0001477520  8579  0550  8306  038A  8B83  8203  280A  6E75
0001477540  6174  6767  6465  6929  0701  7800  0085  8304
0001477560  0080  1301  7F00  8983  8303  0081  8583  8300
0001477600  0085  8683  8300  022C  5301  7F00  0782  6F70
0001477620  5F73  6C62  006B  0E82  7462  7672  6F5F  6570
0001477640  5F6E  6F6D  6564  8085  8200  6608  7869  735F
0001477660  7A69  8565  0082  0982  656B  5F79  7369  695F
0001477700  8564  0084  0782  616C  7473  695F  8564  0086
0001477720  0982  6966  656C  6E5F  6D61  8565  008A  0101
0001477740  8000  1801  7900  0085  0713  8F83  8303  0390
0001477760  0A82  7528  746E  6761  6567  2964  0169  0007
0001500000  8578  0800  8083  0100  0016  837F  0086  8E83
0001500020  8303  0388  8883  8303  0086  8583  8300  0081
0001500040  5201  7F00  0582  7264  7669  0065  0782  616D
0001500060  5F70  6964  0472  0B82  626F  5F6A  6274  5F6C
0001500100  6468  856C  0104  0B82  6572  5F6C  6274  5F6C
0001500120  6468  856C  01AE  0582  6677  695F  8564  0258
0001500140  0682  6F6C  6B63  6465  5C85  8202  6405  6D75
0001500160  796D  5E85  0102  0001  0180  0001  0180  0001
0001500200  0180  0001  0180  0001  0180  0001  0180  0001
*
0001500620  0180  0001  0180  0007  737A  8D83  8203  0100
0001500640  0001  0180  0001  0180  0001  0180  0001  0180
*
0001501560  000D  837F  03D9  8683  8300  00C0  C583  0100
0001501600  000A  8075  8183  6400  8304  044E  0501  7800
0001501620  8310  0080  0501  7800  8338  0080  0D01  7F00
0001501640  D983  8303  0086  C083  8300  0085  0A01  7500
0001501660  8380  0081  0464  5283  0104  0007  837F  0086
0001501700  C083  0100  000A  8075  8183  6400  8302  0454
0001501720  0101  8000  0101  8000  0101  8000  0101  8000
*
0001502200  0701  7800  0085  8301  0080  0101  8000  0101
0001502220  8000  0101  8000  0101  8000  0101  8000  0101
*
0001505340  8000  1801  7900  5085  0605  C583  8303  03C6
0001505360  0A82  7528  746E  6761  6567  2964  0169  0007
0001505400  8578  0400  8083  0100  0013  837F  03C4  8183
0001505420  8300  0085  8583  8300  0086  2C83  0102  0053
0001505440  827F  7007  736F  625F  6B6C  8200  620E  7274
0001505460  5F76  706F  6E65  6D5F  646F  8565  0080  0882
0001505500  6966  5F78  6973  657A  8285  8200  6B09  7965
0001505520  695F  5F73  6469  8485  8200  6C07  7361  5F74
0001505540  6469  8685  8200  6609  6C69  5F65  616E  656D
0001505560  8A85  0100  0001  0180  0018  8579  1300  8307
0001505600  03CA  CB83  8203  280A  6E75  6174  6767  6465
0001505620  6929  0701  7800  0085  8308  0080  1601  7F00
0001505640  8683  8300  03C9  C383  8303  03C3  8683  8300
0001505660  0085  8183  0100  0052  827F  6405  6972  6576
0001505700  8200  6D07  7061  645F  7269  8204  6F0B  6A62
0001505720  745F  6C62  685F  6C64  0485  8201  720B  6C65
0001505740  745F  6C62  685F  6C64  AE85  8201  7705  5F66
0001505760  6469  5885  8202  6C06  636F  656B  8564  025C
0001506000  0582  7564  6D6D  8579  025E  0101  8000  0101
0001506020  8000  0101  8000  0101  8000  0101  8000  0101
```

```
THU MAR 14 17:31:54 1991  DB_PI.DLL  PAGE 361, LINE 21241

*
0001506100  8000  0101  8000  0101  8000  0101  8000  0701
0001506120  7800  0085  0302  0080  0101  8000  0101  8000
0001506140  0101  8000  0101  8000  0101  8000  0101  8000
*
0001506460  0701  7A00  8373  03C8  0082  0101  8000  0101
0001506500  8000  0101  8000  0101  8000  0101  8000  0101
*
0001506700  8000  0101  8000  0101  8000  1801  7900  8085
0001506720  0703  3A83  8304  043B  0A82  7528  746E  6761
0001506740  6567  2964  0169  0016  837F  0086  2C83  8302
0001506760  0082  8683  8300  0085  8583  8300  03DD  4601
0001507000  7F00  0282  6469  8200  6E04  6D61  0465  0A82
0001507020  6974  656D  735F  6174  706D  8224  7506  7273
0001507040  695F  2864  0A82  6F74  6174  5F6C  6973  657A
0001507060  822C  700B  7461  5F68  666F  7366  7465  822E
0001507100  7305  6170  6572  0130  0001  0180  0001  0180
0001507120  0001  0180  0001  0180  0001  0180  0001  0180
*
0001507300  0001  0180  0018  8579  0140  8303  045D  5E83
0001507320  8204  280A  6E75  6174  6767  6465  6929  0701
0001507340  7800  0085  8301  0084  0A01  7F00  8683  8300
0001507360  0086  5C83  0104  0020  827F  7009  7261  6E65
0001507400  5F74  6469  8200  6308  6968  646C  695F  0464
0001507420  0582  7073  7261  0865  0101  8000  0101  8000
0001507440  0101  8000  0101  8000  0701  7A00  8373  0439
0001507460  0082  0101  8000  0101  8000  0101  8000  0101
0001507500  8000  0101  8000  0101  8000  0101  8000  0101
*
0001507620  8000  0701  7A00  8373  00C6  0082  0101  8000
0001507640  0101  8000  0101  8000  0101  8000  0101  8000
*
0001507700  0101  8000  0101  8000  0101  8000  0D01  7F00
0001507720  1483  8304  0086  8183  8300  0463  0A01  7500
0001507740  8380  0081  0464  8983  0104  0007  837F  0414
0001507760  8683  0100  000A  8075  8183  6400  8302  048B
0001510000  1001  7F00  1483  8304  0086  C083  8300  0081
0001510020  C683  0100  000A  8075  8183  6400  8305  048D
0001510040  0A01  7F00  1483  8304  0086  C683  0100  000A
0001510060  8075  8183  6400  8303  048F  0D01  7F00  1483
0001510100  8304  0086  8683  8300  0000  0A01  7500  8380
0001510120  0085  0464  9183  0104  0010  837F  0414  8683
0001510140  8300  0085  C183  8300  0463  0A01  7500  8380
0001510160  0081  0564  9383  0104  000D  837F  0414  8683
0001510200  8300  00C5  7C83  0104  000A  8075  8183  6400
0001510220  8304  0495  0A01  7F00  1483  8304  0086  8583
0001510240  0100  000A  8075  8183  6400  8303  0497  0A01
0001510260  7F00  1483  8304  0086  C583  0100  000A  8075
0001510300  8183  6400  8303  0499  0101  8000  0101  8000
0001510320  0101  8000  0101  8000  0101  8000  1301  7F00
0001510340  8183  8300  00C0  C083  8300  00C1  C083  8300
0001510360  0081  0A01  7500  8380  0081  0664  0583  0102
0001510400  0001  0180  0001  0180  0001  0180  0001  0180
*
0001512560  0007  8578  0100  8083  0100  0001  0180  0001
0001512600  0180  0001  0180  0001  0180  0001  0180  0001
*
0001514060  0180  0001  0180  0001  0180  0001  0180  0018
0001514100  8579  0550  8306  03D0  D183  8203  280A  6E75
```

```
THU MAR 14 17:31:54 1991  DB_PI.DLL  PAGE 362, LINE 21300

0001514120  6174  6767  6465  6929  0701  7800  0085  8304
0001514140  0080  1301  7F00  CF83  8303  0081  8583  8300
0001514160  0085  8683  8300  031C  5301  7F00  0782  6F70
0001514200  5F73  6C62  006B  0E82  7462  7672  6F5F  6570
0001514220  5F6E  6F6D  6564  8085  8200  6608  7869  735F
0001514240  7A69  8565  0082  0982  656B  5F79  7369  695F
0001514260  8564  0084  0782  616C  7473  695F  8564  0086
0001514300  0982  6966  656C  6E5F  6D61  8565  008A  0101
0001514320  8000  0101  8000  0101  8000  0101  8000  0101
*
0001514460  8000  0101  8000  0701  7A00  8373  03CE  0082
0001514500  0101  8000  0101  8000  0101  8000  0101  8000
*
0001515020  0101  8000  0701  7800  4885  8308  0084  0701
0001515040  7800  0085  8310  0084  0A01  7500  8380  0081
0001515060  0064  0183  0102  000A  8075  8183  6400  8300
0001515100  0201  1001  7F00  EC83  8303  00C0  8183  8300
0001515120  00C0  8583  0100  000A  8075  8183  6400  8305
0001515140  0426  0701  7F00  EC83  8303  00C0  0A01  7500
0001515160  8380  0081  0264  2883  0104  000D  837F  03EC
0001515200  C083  8300  00C1  C083  0100  000A  8075  8183
0001515220  6400  8304  042A  1301  7F00  EC83  8303  0081
0001515240  8183  8300  00C0  C183  8300  00C0  0A01  7500
0001515260  8380  0081  0664  2C83  0104  000A  837F  03EC
0001515300  C083  8300  0081  0A01  7500  8380  0081  0364
0001515320  2E83  0104  0007  837F  03EC  C083  0100  000A
0001515340  8075  8183  6400  8302  0430  0501  7800  8320
0001515360  0080  0401  7F00  EC83  0103  000A  8075  8183
0001515400  6400  8301  0433  0101  8000  0101  8000  0101
0001515420  8000  0101  8000  0101  8000  0101  8000  0101
*
0001517560  8000  0101  8000  0701  7800  0085  8301  0080
0001517600  0101  8000  0101  8000  0101  8000  0101  8000
*
0001521160  0101  8000  0101  8000  1801  7900  5085  0605
0001521200  DD83  8303  03DE  0A82  7528  746E  6761  6567
0001521220  2964  0169  0007  8578  0400  8083  0100  0013
0001521240  837F  03DC  8183  8300  0085  8583  8300  0086
0001521260  1C83  0103  0053  827F  7007  736F  625F  6B6C
0001521300  8200  620E  7274  5F76  706F  6E65  6D5F  646F
0001521320  8565  0080  0882  6966  5F78  6973  657A  8285
0001521340  8200  6B09  7965  695F  5F73  6469  8485  8200
0001521360  6C07  7361  5F74  6469  8685  8200  6609  6C69
0001521400  5F65  616E  656D  8A85  0100  0001  0180  0001
0001521420  0180  0007  8578  0800  8083  0100  0001  0180
0001521440  0001  0180  0001  0180  0001  0180  0001  0180
*
0001521520  0001  0180  0005  2078  8483  0100  0001  0180
0001521540  0001  0180  0001  0180  0001  0180  0001  0180
0001521560  0001  0180  0001  0180  0001  0180  0007  737A
0001521600  DB83  8203  0100  0001  0180  0001  0180  0001
0001521620  0180  0001  0180  0001  0180  0001  0180  0001
*
0001522120  0180  0001  0180  0001  0180  0007  8578  1000
0001522140  8483  0100  0001  0180  0001  0180  0005  4878
0001522160  8083  0100  0001  0180  0005  3078  8083  0100
0001522200  0001  0180  0001  0180  000A  8075  8183  6400
0001522220  8304  0438  0D01  7F00  F983  8303  00C0  C583
0001522240  8300  00C5  0A01  7500  8380  0081  0564  3A83
```

THU MAR 14 17:31:54 1991 DB_PI.DLL PAGE 363, LINE 21359

| | | | | | | | | |
|---|---|---|---|---|---|---|---|---|
| 0001522260 | 0104 | 0010 | 837F | 03F9 | C083 | 8300 | 00C0 | C583 |
| 0001522300 | 8300 | 00C5 | 1301 | 7F00 | 8183 | 8300 | 03F9 | C083 |
| 0001522320 | 8300 | 00C0 | C583 | 8300 | 00C5 | 0A01 | 7500 | 8380 |
| 0001522340 | 0081 | 0664 | 3B83 | 0104 | 0007 | 837F | 00C0 | 8583 |
| 0001522360 | 0100 | 000A | 8075 | 8183 | 6400 | 8302 | 043D | 0D01 |
| 0001522400 | 7F00 | F983 | 8303 | 00C0 | C583 | 8300 | 00C5 | 0A01 |
| 0001522420 | 7500 | 8380 | 0081 | 0464 | 3F83 | 0104 | 0005 | 1078 |
| 0001522440 | 8083 | 0100 | 0005 | 2878 | 8083 | 0100 | 0005 | 2078 |
| 0001522460 | 8083 | 0100 | 0010 | 837F | 03F9 | C083 | 8300 | 00C0 |
| 0001522500 | C583 | 8300 | 00C5 | 0A01 | 7500 | 8380 | 0081 | 0564 |
| 0001522520 | 4483 | 0104 | 0005 | 3878 | 8083 | 0100 | 000D | 837F |
| 0001522540 | 03F9 | C083 | 8300 | 00C5 | C583 | 0100 | 000A | 8075 |
| 0001522560 | 8183 | 6400 | 8304 | 0447 | 1001 | 7F00 | F983 | 8303 |
| 0001522600 | 00C0 | 8183 | 8300 | 0085 | 8183 | 0100 | 000A | 8075 |
| 0001522620 | 8183 | 6400 | 8305 | 0449 | 0401 | 7F00 | F983 | 0103 |
| 0001522640 | 000A | 8075 | 8183 | 6400 | 8301 | 044B | 0A01 | 7500 |
| 0001522660 | 838D | 0081 | 0064 | 0183 | 0102 | 0019 | 837F | 03F9 |
| 0001522700 | 8183 | 8300 | 00C0 | 8583 | 8300 | 0085 | 8583 | 8300 |
| 0001522720 | 0085 | 8583 | 0100 | 000A | 8075 | 8183 | 6400 | 8308 |
| 0001522740 | 044E | 1801 | 7900 | 8085 | 0700 | 5183 | 8304 | 0452 |
| 0001522760 | 0A82 | 7528 | 746E | 6761 | 6567 | 2964 | 0169 | 0016 |
| 0001523000 | 837F | 0081 | 8183 | 8300 | 0085 | F083 | 8303 | 0084 |
| 0001523020 | 8483 | 8300 | 03F0 | 4501 | 7F00 | 0682 | 666F | 7366 |
| 0001523040 | 7465 | 8200 | 6C06 | 6E65 | 7467 | 0268 | 0582 | 6C66 |
| 0001523060 | 6761 | 0473 | 0882 | 6F6E | 5F74 | 7375 | 6465 | 8206 |
| 0001523100 | 7404 | 7079 | 0A65 | 0A82 | 756E | 6C6C | 765F | 6C61 |
| 0001523120 | 6575 | 820B | 7208 | 7365 | 7265 | 6576 | 0C64 | 1801 |
| 0001523140 | 7900 | 8085 | 0700 | 5583 | 8304 | 0456 | 0A82 | 7528 |
| 0001523160 | 746E | 6761 | 6567 | 2964 | 0169 | 0005 | 1078 | 8483 |
| 0001523200 | 0100 | 0016 | 837F | 0081 | 8183 | 8300 | 0081 | F083 |
| 0001523220 | 8303 | 0085 | 5483 | 8304 | 0081 | 5701 | 7F00 | 0A82 |
| 0001523240 | 6572 | 5F63 | 656C | 676E | 6874 | 8200 | 7009 | 6761 |
| 0001523260 | 5F65 | 6973 | 657A | 8202 | 6E0C | 6F5F | 5F66 | 6E69 |
| 0001523300 | 6564 | 6578 | 0473 | 0882 | 6F6E | 5F74 | 7375 | 6465 |
| 0001523320 | 8206 | 6605 | 616C | 7367 | 820A | 7208 | 7365 | 7265 |
| 0001523340 | 6576 | 0C64 | 0D82 | 7270 | 6165 | 6C6C | 636F | 7461 |
| 0001523360 | 6F69 | 0E6E | 1E01 | 7900 | 0085 | 0201 | 5883 | 8304 |
| 0001523400 | 0459 | 1082 | 796D | 645F | 7461 | 5F61 | 7562 | 6666 |
| 0001523420 | 7265 | 745F | 0169 | 0007 | 837F | 0453 | 5083 | 0104 |
| 0001523440 | 0018 | 827F | 6609 | 6C69 | 5F65 | 7073 | 6365 | 8200 |
| 0001523460 | 6B08 | 7965 | 735F | 6570 | 1063 | 0701 | 7A00 | 8373 |
| 0001523500 | 0457 | 0082 | 0701 | 7800 | 0085 | 8309 | 0080 | 0101 |
| 0001523520 | 8000 | 2801 | 7F00 | F983 | 8303 | 0081 | C083 | 8300 |
| 0001523540 | 0085 | 8583 | 8300 | 0085 | 8483 | 8300 | 0085 | 8583 |
| 0001523560 | 8300 | 0084 | 8583 | 8300 | 0085 | 8583 | 0100 | 000A |
| 0001523600 | 8075 | 8183 | 6400 | 830D | 045D | 1801 | 7900 | 8085 |
| 0001523620 | 0700 | 6083 | 8304 | 0461 | 0A82 | 7528 | 746E | 6761 |
| 0001523640 | 6567 | 2964 | 0169 | 0016 | 837F | 0081 | 8183 | 8300 |
| 0001523660 | 0085 | F083 | 8303 | 0084 | 8483 | 8300 | 03F0 | 4501 |
| 0001523700 | 7F00 | 0682 | 666F | 7366 | 7465 | 8200 | 6C06 | 6E65 |
| 0001523720 | 7467 | 0268 | 0582 | 6C66 | 6761 | 0473 | 0882 | 6F6E |
| 0001523740 | 5F74 | 7375 | 6465 | 8206 | 7404 | 7079 | 0A65 | 0A82 |
| 0001523760 | 756E | 6C6C | 765F | 6C61 | 6575 | 820B | 7208 | 7365 |
| 0001524000 | 7265 | 6576 | 0C64 | 1801 | 7900 | 8085 | 0700 | 6383 |
| 0001524020 | 8304 | 0464 | 0A82 | 7528 | 746E | 6761 | 6567 | 2964 |
| 0001524040 | 0169 | 0016 | 837F | 0081 | 8183 | 8300 | 0081 | F083 |
| 0001524060 | 8303 | 0085 | 5483 | 8304 | 0081 | 5701 | 7F00 | 0A82 |
| 0001524100 | 6572 | 5F63 | 656C | 676E | 6874 | 8200 | 7009 | 6761 |
| 0001524120 | 5F65 | 6973 | 657A | 8202 | 6E0C | 6F5F | 5F66 | 6E69 |

```
THU MAR 14 17:31:54 1991  DB_PI.DLL  PAGE 364, LINE 21418

0001524140   6564   6578   0473   0882   6F6E   5F74   7375   6465
0001524160   8206   6605   616C   7367   820A   7208   7365   7265
0001524200   6576   0C64   0D82   7270   6165   6C6C   636F   7461
0001524220   6F69   0E6E   1E01   7900   8085   0301   6683   8304
0001524240   0467   1082   796D   645F   7461   5F61   7562   6666
0001524260   7265   745F   0169   000A   837F   0462   5F83   8304
0001524300   045F   3501   7F00   0982   6966   656C   735F   6570
0001524320   0063   1082   7270   6D69   7261   5F79   656B   5F79
0001524340   7073   6365   8210   7312   6365   6E6F   6164   7972
0001524360   6B5F   7965   735F   6570   2063   0701   7A00   8373
0001524400   0465   0082   0A01   7F00   F983   8303   00C0   8583
0001524420   0100   000A   8075   8183   6400   8303   0469   0701
0001524440   7F00   F983   8303   00C0   0A01   7500   8380   0081
0001524460   0264   6B83   0104   0007   837F   03F9   C083   0100
0001524500   000A   8075   8183   6400   8302   046D   0101   8000
0001524520   0101   8000   0101   8000   0101   8000   0101   8000
*
0001525740   0101   8000   0101   8000   0501   7800   8300   0084
0001525760   0101   8000   0101   8000   0101   8000   0101   8000
*
0001526560   1201   7900   0310   0C83   8303   030D   0682   465F
0001526600   4954   454D   0169   0004   055C   007C   0401   5C00
0001526620   7C06   0105   0004   055C   0B7C   0A01   7F00   0983
0001526640   8303   030A   0B83   0103   001D   827F   7407   6F77
0001526660   6573   7363   8200   6D07   6E69   7475   7365   8200
0001526700   6805   756F   7372   0100   0001   0180   0012   1079
0001526720   8303   0313   1483   8203   5F06   4446   5441   6945
0001526740   0401   5C00   7C05   0100   0004   045C   057C   0401
0001526760   5C00   7C07   0109   000A   837F   0310   1183   8303
0001527000   0312   1601   7F00   0382   6164   0079   0582   6F6D
0001527020   746E   0068   0482   6579   7261   0100   0001   0180
0001527040   001A   8579   0120   830B   0318   1983   8203   5F0C
0001527060   4946   454C   4946   444E   5542   6946   0501   7800
0001527100   8368   0080   2201   7F00   0F83   8303   0308   0F83
0001527120   8303   0308   0F83   8303   0308   8683   8300   0086
0001527140   8583   8300   0084   1783   0103   009D   827F   660D
0001527160   6164   6574   7243   6165   6974   6E6F   8200   660D
0001527200   6974   656D   7243   6165   6974   6E6F   8202   660F
0001527220   6164   6574   614C   7473   6341   6563   7373   8204
0001527240   660F   6974   656D   614C   7473   6341   6563   7373
0001527260   8206   660E   6164   6574   614C   7473   7257   7469
0001527300   0865   0E82   7466   6D69   4C65   7361   5774   6972
0001527320   6574   820A   6306   4662   6C69   0C65   0B82   6263
0001527340   6946   656C   6C41   6F6C   1063   0882   7461   7274
0001527360   6946   656C   8214   6307   6863   614E   656D   8216
0001527400   6107   6863   614E   656D   0117   0001   0180   0001
0001527420   0180   0007   8578   0100   8083   0100   0001   0180
0001527440   0001   0180   0001   0180   0001   0180   0001   0180
*
0001527660   0019   8579   00B0   8309   0343   4483   8203   5F0B
0001527700   4946   454C   5453   5441   5355   0169   001C   837F
0001527720   030F   0883   8303   030F   0883   8303   030F   0883
0001527740   8303   0086   8683   8300   0085   8901   7F00   0D82
0001527760   6466   7461   4365   6572   7461   6F69   006E   0D82
0001530000   7466   6D69   4365   6572   7461   6F69   026E   0F82
0001530020   6466   7461   4C65   7361   4174   6363   7365   0473
0001530040   0F82   7466   6D69   4C65   7361   4174   6363   7365
0001530060   0673   0E82   6466   7461   4C65   7361   5774   6972
0001530100   6574   8208   660E   6974   656D   614C   7473   7257
```

THU MAR 14 17:31:54 1991 DB_PI.DLL PAGE 365, LINE 21477

```
0001530120   7469  0A65  0682  6263  6946  656C  820C  630B
0001530140   4662  6C69  4165  6C6C  636F  8210  6108  7474
0001530160   4672  6C69  1465  0101  8000  0101  8000  0101
0001530200   8000  0101  8000  0101  8000  0101  8000  0101
*
0001531260   8000  0701  7800  0085  8308  0080  0101  8000
0001531300   0101  8000  0101  8000  0101  8000  0101  8000
*
0001531740   0101  8000  0A01  7500  8380  0081  0464  2083
0001531760   0104  000D  837F  00C0  C083  8300  00C0  C083
0001532000   0100  0007  837F  00C0  C083  0100  000A  8075
0001532020   8183  6400  8302  0421  0701  7F00  C083  8300
0001532040   00C0  0A01  7500  8380  0081  0264  2383  0104
0001532060   0007  837F  00C0  8583  0100  000A  8075  8583
0001532100   6400  8302  0425  0401  7F00  C083  0100  000A
0001532120   8075  8583  6400  8301  0427  0701  7F00  C083
0001532140   8300  0081  0A01  7500  8380  0081  0264  2983
0001532160   0104  0004  837F  00C0  0A01  7500  8380  0081
0001532200   0164  2B83  0104  0005  1078  8083  0100  0005
0001532220   2078  8083  0100  0005  1878  8083  0100  0007
0001532240   837F  00C0  C083  0100  000A  8075  8183  6400
0001532260   8302  0430  0701  7F00  C083  8300  0081  0A01
0001532300   7500  8380  0081  0264  3283  0104  000A  837F
0001532320   00C0  8183  8300  00C6  0A01  7500  8380  0081
0001532340   0364  3483  0104  0001  0180  0001  0180  000A
0001532360   837F  00C0  C083  8300  00C0  0A01  7500  8380
0001532400   00C0  0364  3883  0104  0005  2878  8083  0100
0001532420   0005  3078  8083  0100  0007  837F  00C0  C083
0001532440   0100  000A  8075  8183  6400  8302  043C  0D01
0001532460   7F00  C083  8300  00C0  8583  8300  0085  0A01
0001532500   7500  8380  0081  0464  3E83  0104  0007  837F
0001532520   00C0  C083  0100  000A  8075  8183  6400  8302
0001532540   0440  0901  7800  0086  0400  8300  0084  1001
0001532560   7F00  C083  8300  00C0  C083  8300  0085  C083
0001532600   0100  000A  8075  8183  6400  8305  0443  0D01
0001532620   7F00  C083  8300  00C0  C083  8300  00C0  0A01
0001532640   7500  8380  0081  0464  4583  0104  000D  837F
0001532660   00C0  C083  8300  00C0  C083  0100  000A  8075
0001532700   8183  6400  8304  0447  0501  7800  8348  0080
0001532720   0401  7F00  C083  0100  000A  8075  8183  6400
0001532740   8301  044A  0501  7800  8378  0080  0401  7F00
0001532760   C083  0100  000A  8075  8183  6400  8301  044D
0001533000   0701  7F00  C083  8300  00C0  0A01  7500  8380
0001533020   0081  0264  4F83  0104  0004  837F  00C6  0A01
0001533040   7500  8380  0081  0164  5183  0104  0001  0180
0001533060   0001  0180  0001  0180  0001  0180  0001  0180
*
0001534560   0007  8578  0100  8083  0100  0001  0180  0001
0001534600   0180  0001  0180  0001  0180  0001  0180  0001
*
0001536040   0180  0001  0180  0001  0180  0001  0180  0007
0001536060   737A  C083  8200  0100  0001  0180  0001  0180
0001536100   0001  0180  0001  0180  0001  0180  0001  0180
*
0001536140   0001  0180  0001  0180  0018  8579  0130  8303
0001536160   038D  8E83  8203  280A  6E75  6174  6767  6465
0001536200   6929  0A01  7F00  D183  8302  00C0  8583  0100
0001536220   0015  827F  6B03  7965  8200  6904  6574  206D
0001536240   0482  6973  657A  0124  0016  4079  8303  0391
```

THU MAR 14 17:31:54 1991 DB_PI.DLL PAGE 366, LINE 21536

```
0001536260  9283  8203  280A  6E75  6174  6767  6465  6929
0001536300  0701  7A00  8373  038C  0082  0A01  7F00  8583
0001536320  8300  0085  9083  0103  001C  827F  6109  6C6C
0001536340  636F  7461  6465  8200  7504  6573  0264  0582
0001536360  6E65  7274  0479  1601  7900  0340  9583  8303
0001536400  0396  0A82  7528  746E  6761  6567  2964  0169
0001536420  0007  737A  8F83  8203  0100  000A  837F  0085
0001536440  9483  8303  0085  2301  7F00  0482  6973  657A
0001536460  8200  6206  6375  656B  0274  0F82  7562  6B63
0001536500  7465  695F  636E  735F  7A69  0665  0101  8000
0001536520  0101  8000  0101  8000  0101  8000  0101  8000
*
0001536760  0701  7A00  8373  03C1  0082  0701  7A00  8373
0001537000  0393  0082  0101  8000  0101  8000  0101  8000
0001537020  0101  8000  0101  8000  0101  8000  0101  8000
*
0001537140  0A01  7F00  8583  8300  0085  C083  0103  000A
0001537160  8075  8183  6400  8303  03D9  0701  7F00  C183
0001537200  8303  0000  0A01  7500  8380  0081  0264  DB83
0001537220  0103  0007  837F  00C0  8583  0100  000A  8075
0001537240  8583  6400  8302  03DD  0A01  7F00  9483  8303
0001537260  00C0  C583  0100  000A  8075  8583  6400  8303
0001537300  03DF  1001  7F00  C183  8303  00C0  C083  8300
0001537320  0085  8583  0100  000A  8075  8183  6400  8305
0001537340  03E1  0D01  7F00  C183  8303  00C0  7F83  8303
0001537360  00C5  0A01  7500  8380  0081  0464  E383  0503
0001537400  0111  0000  1600  0001  E700  0B05  1603  FD00
0001537420  0002  0400  6407  5F62  6E69  7469  040F  000E
0001537440  00C0  7509  6573  5F72  616E  656D  0411  000A
0001537460  00C0  610B  7070  696C  5F63  616E  656D  0411
0001537500  0008  0081  610B  7070  696C  5F63  7974  6570
0001537520  0412  0006  0085  730C  6174  7472  735F  7265
0001537540  6576  0C72  FA04  C0FF  0600  5F5F  7974  6570
0001537560  040F  FFF2  0085  5F09  625F  5F78  7974  6570
0001537600  040D  FFE2  02A9  5F07  705F  6972  746E  040B
0001537620  FFDA  0202  5F05  6C5F  6C76  040D  FFE6  05EC
0001537640  5F07  635F  6F6C  6B63  040D  FFF6  00C0  5F07
0001537660  735F  6174  6B63  040E  FFE0  0081  5F08  725F
0001537700  7465  6176  116C  D204  60FF  0B05  6264  725F
0001537720  6F6F  5F74  7470  0A72  D604  E4FF  0400  7068
0001537740  7274  0408  FFF4  0081  7302  0E74  6805  0B00
0001537760  EA00  0605  5F5F  7566  636E  0201  011B  030B
0001540000  05EE  0392  0016  0384  0000  0C04  6264  745F
0001540020  7265  696D  616E  6574  0416  0006  0085  7410
0001540040  7265  696D  616E  6574  735F  7265  6576  0C72
0001540060  FA04  C0FF  0600  5F5F  7974  6570  040F  FFF2
0001540100  0085  5F09  625F  5F78  7974  6570  040D  FFE2
0001540120  02A9  5F07  705F  6972  746E  040B  FFDA  0202
0001540140  5F05  6C5F  6C76  040D  FFE6  05EC  5F07  635F
0001540160  6F6C  6B63  040D  FFF6  00C0  5F07  735F  6174
0001540200  6B63  040E  FFE0  0081  5F08  725F  7465  6176
0001540220  086C  F404  81FF  0200  7473  050E  007E  000B
0001540240  031B  5F06  665F  6E75  0163  2102  9D01  F106
0001540260  3205  1000  2500  0000  0400  6412  5F62  6170
0001540300  696E  5F63  6574  6D72  6E69  7461  1865  0604
0001540320  8500  1200  6574  6D72  6E69  7461  6F69  5F6F
0001540340  6572  7361  6E6F  0201  0117  06CF  05F3  014F
0001540360  0016  0141  0000  0804  6264  615F  6C6C  636F
0001540400  040A  0006  0085  7304  7A69  0D65  F604  C0FF
```

THU MAR 14 17:31:54 1991 DB_PI.DLL PAGE 367, LINE 21595

| | | | | | | | | |
|---|---|---|---|---|---|---|---|---|
| 0001540420 | 0700 | 5F5F | 7473 | 6361 | 0E6B | E004 | C0FF | 0800 |
| 0001540440 | 5F5F | 6572 | 7674 | 6C61 | 040C | FFFA | 00C0 | 5F06 |
| 0001540460 | 745F | 7079 | 0F65 | F404 | 85FF | 0900 | 5F5F | 7862 |
| 0001540500 | 745F | 7079 | 0D65 | E404 | A9FF | 0702 | 5F5F | 7270 |
| 0001540520 | 6E69 | 0B74 | DA04 | 02FF | 0502 | 5F5F | 766C | 0D6C |
| 0001540540 | E804 | ECFF | 0705 | 5F5F | 6C63 | 636F | 0E6B | 9A05 |
| 0001540560 | 0B00 | F500 | 0605 | 5F5F | 7566 | 636E | 0201 | 0119 |
| 0001540600 | 081E | 05F7 | 0157 | 0016 | 0149 | 0000 | 0A04 | 6264 |
| 0001540620 | 725F | 6165 | 6C6C | 636F | 0409 | 0008 | 00C0 | 7003 |
| 0001540640 | 7274 | 040A | 0006 | 0085 | 7304 | 7A69 | 0C65 | FA04 |
| 0001540660 | C0FF | 0600 | 5F5F | 7974 | 6570 | 040F | FFF4 | 0085 |
| 0001540700 | 5F09 | 625F | 5F78 | 7974 | 6570 | 040D | FFE4 | 02A9 |
| 0001540720 | 5F07 | 705F | 6972 | 746E | 040B | FFDA | 0202 | 5F05 |
| 0001540740 | 6C5F | 6C76 | 040D | FFE8 | 05EC | 5F07 | 635F | 6F6C |
| 0001540760 | 6B63 | 040D | FFF6 | 00C0 | 5F07 | 735F | 6174 | 6B63 |
| 0001541000 | 040E | FFE0 | 00C0 | 5F08 | 725F | 7465 | 6176 | 0E6C |
| 0001541020 | B205 | 0B00 | F900 | 0605 | 5F5F | 7566 | 636E | 0201 |
| 0001541040 | 0116 | 0975 | 05FB | 0128 | 0016 | 011A | 0000 | 0704 |
| 0001541060 | 6264 | 665F | 6572 | 0965 | 0604 | C000 | 0300 | 7470 |
| 0001541100 | 0C72 | FA04 | C0FF | 0600 | 5F5F | 7974 | 6570 | 040F |
| 0001541120 | FFF4 | 0085 | 5F09 | 625F | 5F78 | 7974 | 6570 | 040D |
| 0001541140 | FFE4 | 02A9 | 5F07 | 705F | 6972 | 746E | 040B | FFDC |
| 0001541160 | 0202 | 5F05 | 6C5F | 6C76 | 040D | FFE8 | 05EC | 5F07 |
| 0001541200 | 635F | 6F6C | 6B63 | 040D | FFF6 | 00C0 | 5F07 | 735F |
| 0001541220 | 6174 | 6B63 | 040E | FFE2 | 0081 | 5F08 | 725F | 7465 |
| 0001541240 | 6176 | 0E6C | C605 | 0B00 | EA00 | 0605 | 5F5F | 7566 |
| 0001541260 | 636E | 0201 | 011F | 0A9D | 05FE | 005E | 0016 | 0050 |
| 0001541300 | 0000 | 1004 | 6264 | 725F | 6765 | 7369 | 6574 | 5F72 |
| 0001541320 | 7768 | 646E | 040D | 0006 | 00C0 | 7707 | 6E69 | 685F |
| 0001541340 | 6C64 | 0411 | FFF8 | 0560 | 640B | 5F62 | 6F72 | 746F |
| 0001541360 | 705F | 7274 | 0408 | FFFC | 0081 | 7302 | 0174 | 2202 |
| 0001541400 | FB01 | 000A | 7C06 | 1000 | 7100 | 0000 | 0400 | 6413 |
| 0001541420 | 5F62 | 6567 | 5F74 | 6970 | 5F64 | 6966 | 656C | 6170 |
| 0001541440 | 6874 | 0411 | 0006 | 0081 | 610B | 7070 | 696C | 5F63 |
| 0001541460 | 7974 | 6570 | 040F | 0008 | 00C0 | 6609 | 6C69 | 5F65 |
| 0001541500 | 6170 | 6874 | 0201 | 011E | 0B77 | 0602 | 00B1 | 0010 |
| 0001541520 | 00A6 | 0000 | 0F04 | 6264 | 725F | 6765 | 7369 | 6574 |
| 0001541540 | 5F72 | 6970 | 1164 | 0604 | 8100 | 0B00 | 7061 | 6C70 |
| 0001541560 | 6369 | 745F | 7079 | 0D65 | 0804 | C000 | 0700 | 6977 |
| 0001541600 | 5F6E | 6468 | 096C | F004 | 85FE | 0300 | 6970 | 0E64 |
| 0001541620 | F204 | 40FF | 0803 | 6970 | 5F64 | 6E69 | 6F66 | 040F |
| 0001541640 | FEF2 | 04D7 | 6609 | 6C69 | 5F65 | 6170 | 6874 | 0408 |
| 0001541660 | FFFA | 026A | 6602 | 0870 | F804 | 81FF | 0200 | 7473 |
| 0001541700 | 0201 | 011C | 0C28 | 0604 | 005D | 0010 | 0052 | 0000 |
| 0001541720 | 0D04 | 6264 | 635F | 6E61 | 6563 | 5F6C | 6970 | 0E64 |
| 0001541740 | F804 | 60FF | 0805 | 6F72 | 746F | 705F | 7274 | 040F |
| 0001541760 | FEF8 | 04D7 | 6609 | 6C69 | 5F65 | 6170 | 6874 | 0408 |
| 0001542000 | FFFC | 0081 | 7302 | 0174 | 1D02 | 8501 | 060C | A206 |
| 0001542020 | 1600 | 9400 | 0000 | 0400 | 640E | 5F62 | 6567 | 5F74 |
| 0001542040 | 7061 | 5F70 | 6970 | 1164 | 0E04 | 8100 | 0B00 | 7061 |
| 0001542060 | 6C70 | 6369 | 745F | 7079 | 0D65 | 0A04 | C500 | 0700 |
| 0001542100 | 6970 | 5F64 | 6461 | 0E72 | 0604 | 2500 | 0804 | 7768 |
| 0001542120 | 646E | 615F | 7264 | 040F | FEF8 | 04D7 | 6609 | 6C69 |
| 0001542140 | 5F65 | 6170 | 6874 | 0408 | FFFA | 026A | 6602 | 0870 |
| 0001542160 | F804 | 81FF | 0200 | 7473 | 0201 | 0D05 | 0000 | 001A |
| 0001542200 | 050F | 0060 | 000B | 00C0 | 4207 | 785F | 6946 | 656C |
| 0001542220 | 050F | 0064 | 000B | 00C0 | 4207 | 785F | 6150 | 6B63 |
| 0001542240 | 0514 | 0000 | 0000 | 0081 | 420C | 5F78 | 6544 | 7562 |
| 0001542260 | 4D67 | 646F | 1465 | 0005 | 0000 | 8100 | 0C00 | 7842 |

THU MAR 14 17:31:54 1991 DB_PI.DLL PAGE 368, LINE 21654

| | | | | | | | | |
|---|---|---|---|---|---|---|---|---|
| 0001542300 | 545F | 6D69 | 7365 | 6F4D | 6564 | 1105 | 0001 | 0000 |
| 0001542320 | 0120 | 0D28 | 0532 | 0678 | 0016 | 066A | 0000 | 1104 |
| 0001542340 | 6264 | 635F | 6572 | 7461 | 5F65 | 7766 | 745F | 6572 |
| 0001542360 | 1065 | 0A04 | C000 | 0A00 | 7264 | 7669 | 5F65 | 616E |
| 0001542400 | 656D | 0413 | 0006 | 00C0 | 700D | 7968 | 6973 | 6163 |
| 0001542420 | 5F6C | 6170 | 6874 | 040C | FEFA | 00C0 | 5F06 | 745F |
| 0001542440 | 7079 | 0F65 | EE04 | 85FE | 0900 | 5F5F | 7862 | 745F |
| 0001542460 | 7079 | 0D65 | DA04 | 37FE | 0705 | 5F5F | 7270 | 6E69 |
| 0001542500 | 0B74 | D204 | 02FE | 0502 | 5F5F | 766C | 0D6C | DE04 |
| 0001542520 | 39FE | 0705 | 5F5F | 6C63 | 636F | 0D6B | F604 | C0FE |
| 0001542540 | 0700 | 5F5F | 7473 | 6361 | 0E6B | D804 | 81FE | 0800 |
| 0001542560 | 5F5F | 6572 | 7674 | 6C61 | 040B | FEEA | 0086 | 6405 |
| 0001542600 | 6972 | 6576 | 040E | FEF2 | 04A5 | 7408 | 6572 | 5F65 |
| 0001542620 | 7470 | 0F72 | FE04 | 5AFE | 0904 | 6F72 | 746F | 705F |
| 0001542640 | 7461 | 0868 | F004 | 81FE | 0200 | 7473 | 050E | 011E |
| 0001542660 | 000B | 0535 | 5F06 | 665F | 6E75 | 0163 | 2002 | A001 |
| 0001542700 | 3E13 | FD05 | 1603 | EF00 | 0003 | 0400 | 6411 | 5F62 |
| 0001542720 | 6572 | 6F6D | 6576 | 665F | 5F77 | 7274 | 6565 | 0410 |
| 0001542740 | 0006 | 00C0 | 640A | 6972 | 6576 | 6E5F | 6D61 | 0C65 |
| 0001542760 | 9A04 | C0FD | 0600 | 5F5F | 7974 | 6570 | 040F | FD92 |
| 0001543000 | 0085 | 5F09 | 625F | 5F78 | 7974 | 6570 | 040D | FD7E |
| 0001543020 | 0537 | 5F07 | 705F | 6972 | 746E | 040B | FD76 | 0202 |
| 0001543040 | 5F05 | 6C5F | 6C76 | 040D | FD82 | 0539 | 5F07 | 635F |
| 0001543060 | 6F6C | 6B63 | 040D | FD96 | 00C0 | 5F07 | 735F | 6174 |
| 0001543100 | 6B63 | 040E | FD7C | 0081 | 5F08 | 725F | 7465 | 6176 |
| 0001543120 | 0B6C | 8E04 | 86FD | 0500 | 7264 | 7669 | 0E65 | 9E04 |
| 0001543140 | 59FD | 08D4 | 6D74 | 5F70 | 7274 | 6565 | 0408 | FD94 |
| 0001543160 | 0081 | 7302 | 0E74 | 3E05 | 0B01 | 3500 | 0605 | 5F5F |
| 0001543200 | 7566 | 636E | 0201 | 011E | 179D | 0540 | 026E | 0016 |
| 0001543220 | 0260 | 0000 | 0F04 | 6264 | 6C5F | 616F | 5F64 | 7766 |
| 0001543240 | 745F | 6572 | 1065 | 0604 | C000 | 0A00 | 7264 | 7669 |
| 0001543260 | 5F65 | 616E | 656D | 040C | FFFA | 00C0 | 5F06 | 745F |
| 0001543300 | 7079 | 0F65 | EE04 | 85FF | 0900 | 5F5F | 7862 | 745F |
| 0001543320 | 7079 | 0D65 | DA04 | 37FF | 0705 | 5F5F | 7270 | 6E69 |
| 0001543340 | 0B74 | D204 | 02FF | 0502 | 5F5F | 766C | 0D6C | DE04 |
| 0001543360 | 39FF | 0705 | 5F5F | 6C63 | 636F | 0D6B | F604 | C0FF |
| 0001543400 | 0700 | 5F5F | 7473 | 6361 | 0E6B | D804 | 81FF | 0800 |
| 0001543420 | 5F5F | 6572 | 7674 | 6C61 | 040B | FFEA | 0086 | 6405 |
| 0001543440 | 6972 | 6576 | 040E | FFF2 | 04A5 | 7408 | 6572 | 5F65 |
| 0001543460 | 7470 | 0872 | F004 | 81FF | 0200 | 7473 | 050E | 015E |
| 0001543500 | 000B | 0542 | 5F06 | 665F | 6E75 | 0163 | 2002 | 0B01 |
| 0001543520 | 441A | 6905 | 1602 | 5B00 | 0002 | 0400 | 6411 | 5F62 |
| 0001543540 | 6E75 | 6F6C | 6461 | 665F | 5F77 | 7274 | 6565 | 0410 |
| 0001543560 | 0006 | 00C0 | 640A | 6972 | 6576 | 6E5F | 6D61 | 0C65 |
| 0001543600 | FA04 | C0FF | 0600 | 5F5F | 7974 | 6570 | 040F | FFF2 |
| 0001543620 | 0085 | 5F09 | 625F | 5F78 | 7974 | 6570 | 040D | FFDE |
| 0001543640 | 0537 | 5F07 | 705F | 6972 | 746E | 040B | FFD6 | 0202 |
| 0001543660 | 5F05 | 6C5F | 6C76 | 040D | FFE2 | 0539 | 5F07 | 635F |
| 0001543700 | 6F6C | 6B63 | 040D | FFF6 | 00C0 | 5F07 | 735F | 6174 |
| 0001543720 | 6B63 | 040E | FFDC | 0081 | 5F08 | 725F | 7465 | 6176 |
| 0001543740 | 0B6C | EE04 | 86FF | 0500 | 7264 | 7669 | 0865 | F404 |
| 0001543760 | 81FF | 0200 | 7473 | 050E | 017C | 000B | 0535 | 5F06 |
| 0001544000 | 665F | 6E75 | 0163 | 2402 | 7401 | 461C | EA05 | 1603 |
| 0001544020 | DC00 | 0003 | 0400 | 6415 | 5F62 | 6573 | 5F74 | 7563 |
| 0001544040 | 7272 | 6E65 | 5F74 | 6F66 | 646C | 7265 | 0414 | 000A |
| 0001544060 | 00C0 | 660E | 6C6F | 6564 | 5F72 | 6F6C | 7067 | 7461 |
| 0001544100 | 0F68 | 0604 | 8600 | 0900 | 6F66 | 646C | 7265 | 695F |
| 0001544120 | 0C64 | FA04 | C0FF | 0600 | 5F5F | 7974 | 6570 | 040F |
| 0001544140 | FFEA | 0085 | 5F09 | 625F | 5F78 | 7974 | 6570 | 040D |

THU MAR 14 17:31:54 1991 DB_PI.DLL PAGE 369, LINE 21713

| | | | | | | | | |
|---|---|---|---|---|---|---|---|---|
| 0001544160 | FFDA | 0537 | 5F07 | 705F | 6972 | 746E | 040B | FFD2 |
| 0001544200 | 0202 | 5F05 | 6C5F | 6C76 | 040D | FFDE | 0539 | 5F07 |
| 0001544220 | 635F | 6F6C | 6B63 | 040D | FFF6 | 00C0 | 5F07 | 735F |
| 0001544240 | 6174 | 6B63 | 040E | FFD8 | 0081 | 5F08 | 725F | 7465 |
| 0001544260 | 6176 | 0E6C | F204 | A5FF | 0804 | 7274 | 6565 | 705F |
| 0001544300 | 7274 | 040D | FFEC | 00C0 | 6C07 | 676F | 705F | 7274 |
| 0001544320 | 0408 | FFF0 | 0081 | 7302 | 0E74 | 9C05 | 0B01 | 4800 |
| 0001544340 | 0605 | 5F5F | 7566 | 636E | 0201 | 011F | 205E | 054A |
| 0001544360 | 00F1 | 001C | 00E6 | 0000 | 1004 | 6264 | 695F | 5F73 |
| 0001544400 | 3174 | 3332 | 645F | 6972 | 6576 | 040B | 0006 | 00C0 |
| 0001544420 | 6405 | 6972 | 6576 | 0409 | FFFA | 00C0 | 6303 | 7068 |
| 0001544440 | 040E | FEFA | 045A | 7008 | 7461 | 6E68 | 6D61 | 0165 |
| 0001544460 | 1D02 | 4F01 | 4F21 | 4905 | 1604 | 3B00 | 0004 | 0400 |
| 0001544500 | 640E | 5F62 | 696C | 7473 | 645F | 6972 | 6576 | 0E73 |
| 0001544520 | 0E04 | 8100 | 0800 | 6573 | 5F74 | 7974 | 6570 | 0414 |
| 0001544540 | 000A | 00C5 | 6C0E | 7473 | 6C5F | 6E65 | 7467 | 5F68 |
| 0001544560 | 7470 | 1572 | 0604 | B500 | 0F03 | 7264 | 5F76 | 736C |
| 0001544600 | 5F74 | 7470 | 5F72 | 6461 | 0872 | F204 | 81FF | 0200 |
| 0001544620 | 7473 | 040C | FFD2 | 0086 | 6406 | 6972 | 6576 | 1173 |
| 0001544640 | F804 | 81FF | 0B00 | 7264 | 7669 | 5F65 | 6E69 | 6564 |
| 0001544660 | 0F78 | EE04 | 85FF | 0900 | 6C61 | 6F6C | 6163 | 6574 |
| 0001544700 | 1364 | D004 | 85FE | 0D00 | 7369 | 745F | 3231 | 5F33 |
| 0001544720 | 7264 | 7669 | 0E65 | D204 | 5AFE | 0804 | 6170 | 6874 |
| 0001544740 | 616E | 656D | 040C | FFFA | 00C0 | 5F06 | 745F | 7079 |
| 0001544760 | 0F65 | F004 | 85FF | 0900 | 5F5F | 7862 | 745F | 7079 |
| 0001545000 | 0D65 | DE04 | 37FF | 0705 | 5F5F | 7270 | 6E69 | 0B74 |
| 0001545020 | D604 | 02FF | 0502 | 5F5F | 766C | 0D6C | E204 | 39FF |
| 0001545040 | 0705 | 5F5F | 6C63 | 636F | 0D6B | F404 | C0FF | 0700 |
| 0001545060 | 5F5F | 7473 | 6361 | 0E6B | DC04 | 81FF | 0800 | 5F5F |
| 0001545100 | 6572 | 7674 | 6C61 | 050E | 01E6 | 000B | 0551 | 5F06 |
| 0001545120 | 665F | 6E75 | 0163 | 0502 | 000D | 1A00 | 0F00 | 1605 |
| 0001545140 | 0B01 | C000 | 0700 | 5F42 | 4678 | 6C69 | 0F65 | 1A05 |
| 0001545160 | 0B01 | C000 | 0700 | 5F42 | 5078 | 6361 | 146B | 0005 |
| 0001545200 | 0000 | 8100 | 0C00 | 7842 | 445F | 6265 | 6775 | 6F4D |
| 0001545220 | 6564 | 0514 | 0000 | 0000 | 0081 | 420C | 5F78 | 6954 |
| 0001545240 | 656D | 4D73 | 646F | 0565 | 0111 | 0000 | 2500 | 9801 |
| 0001545260 | 3125 | 3105 | 1604 | 2300 | 0004 | 0400 | 6416 | 5F62 |
| 0001545300 | 7263 | 6165 | 6574 | 665F | 5F77 | 626F | 5F6A | 6863 |
| 0001545320 | 6C69 | 1464 | 1804 | C000 | 0E00 | 6170 | 6572 | 746E |
| 0001545340 | 6C5F | 676F | 6170 | 6874 | 040F | 0014 | 0086 | 7009 |
| 0001545360 | 7261 | 6E65 | 5F74 | 6469 | 040E | 0010 | 00C0 | 6F08 |
| 0001545400 | 6A62 | 6E5F | 6D61 | 0E65 | 0E04 | 8100 | 0800 | 626F |
| 0001545420 | 5F6A | 7974 | 6570 | 0413 | 000A | 00C0 | 700D | 7968 |
| 0001545440 | 6973 | 6163 | 5F6C | 6170 | 6874 | 0410 | 0006 | 00C6 |
| 0001545460 | 6F0A | 6A62 | 695F | 5F64 | 6461 | 0C72 | FA04 | C0FF |
| 0001545500 | 0600 | 5F5F | 7974 | 6570 | 040F | FEEA | 0085 | 5F09 |
| 0001545520 | 625F | 5F78 | 7974 | 6570 | 040D | FEDA | 0536 | 5F07 |
| 0001545540 | 705F | 6972 | 746E | 040B | FED2 | 0202 | 5F05 | 6C5F |
| 0001545560 | 6C76 | 040D | FEDE | 0538 | 5F07 | 635F | 6F6C | 6B63 |
| 0001545600 | 040D | FEF6 | 00C0 | 5F07 | 735F | 6174 | 6B63 | 040E |
| 0001545620 | FED8 | 0081 | 5F08 | 725F | 7465 | 6176 | 0E6C | F204 |
| 0001545640 | A4FE | 0804 | 7274 | 6565 | 705F | 7274 | 040D | FEEC |
| 0001545660 | 00C0 | 6C07 | 676F | 705F | 7274 | 0414 | FEFA | 0459 |
| 0001545700 | 660E | 6C75 | 5F6C | 6870 | 7379 | 705F | 7461 | 0868 |
| 0001545720 | F004 | 81FE | 0200 | 7473 | 050E | 021C | 000B | 0534 |
| 0001545740 | 5F06 | 665F | 6E75 | 0163 | 1F02 | C901 | 3A29 | 2505 |
| 0001545760 | 1604 | 1700 | 0004 | 0400 | 6410 | 5F62 | 7263 | 6165 |
| 0001546000 | 6574 | 665F | 5F77 | 626F | 116A | 1004 | C000 | 0B00 |
| 0001546020 | 626F | 5F6A | 6F6C | 7067 | 7461 | 0E68 | 0E04 | 8100 |

THU MAR 14 17:31:54 1991 DB_PI.DLL PAGE 370, LINE 21772

| | | | | | | | | |
|---|---|---|---|---|---|---|---|---|
| 0001546040 | 0800 | 626F | 5F6A | 7974 | 6570 | 0413 | 000A | 00C0 |
| 0001546060 | 700D | 7968 | 6973 | 6163 | 5F6C | 6170 | 6874 | 0410 |
| 0001546100 | 0006 | 00C6 | 6F0A | 6A62 | 695F | 5F64 | 6461 | 0C72 |
| 0001546120 | FA04 | C0FF | 0600 | 5F5F | 7974 | 6570 | 040F | FEEA |
| 0001546140 | 0085 | 5F09 | 625F | 5F78 | 7974 | 6570 | 040D | FEDA |
| 0001546160 | 0536 | 5F07 | 705F | 6972 | 746E | 040B | FED2 | 0202 |
| 0001546200 | 5F05 | 6C5F | 6C76 | 040D | FEDE | 0538 | 5F07 | 635F |
| 0001546220 | 6F6C | 6B63 | 040D | FEF6 | 00C0 | 5F07 | 735F | 6174 |
| 0001546240 | 6B63 | 040E | FED8 | 0081 | 5F08 | 725F | 7465 | 6176 |
| 0001546260 | 0E6C | F204 | A4FE | 0804 | 7274 | 6565 | 705F | 7274 |
| 0001546300 | 040D | FEEC | 00C0 | 6C07 | 676F | 705F | 7274 | 0414 |
| 0001546320 | FEFA | 0459 | 660E | 6C75 | 5F6C | 6870 | 7379 | 705F |
| 0001546340 | 7461 | 0868 | F004 | 81FE | 0200 | 7473 | 050E | 0242 |
| 0001546360 | 000B | 053C | 5F06 | 665F | 6E75 | 0163 | 1F02 | EE01 |
| 0001546400 | 3E2D | 1D05 | 1603 | 0F00 | 0003 | 0400 | 6410 | 5F62 |
| 0001546420 | 6564 | 656C | 6574 | 665F | 5F77 | 626F | 116A | 1004 |
| 0001546440 | C000 | 0B00 | 626F | 5F6A | 6F6C | 7067 | 7461 | 0C68 |
| 0001546460 | 0C04 | 8600 | 0600 | 626F | 5F6A | 6469 | 040B | 000A |
| 0001546500 | 0081 | 7305 | 6F63 | 6570 | 0413 | 0006 | 00C6 | 660D |
| 0001546520 | 6961 | 656C | 5F64 | 6469 | 615F | 7264 | 040C | FFFA |
| 0001546540 | 00C0 | 5F06 | 745F | 7079 | 0F65 | EA04 | 85FF | 0900 |
| 0001546560 | 5F5F | 7862 | 745F | 7079 | 0D65 | DA04 | 36FF | 0705 |
| 0001546600 | 5F5F | 7270 | 6E69 | 0B74 | D204 | 02FF | 0502 | 5F5F |
| 0001546620 | 766C | 0D6C | DE04 | 38FF | 0705 | 5F5F | 6C63 | 636F |
| 0001546640 | 0D6B | F604 | C0FF | 0700 | 5F5F | 7473 | 6361 | 0E6B |
| 0001546660 | D804 | 81FF | 0800 | 5F5F | 6572 | 7674 | 6C61 | 040E |
| 0001546700 | FFF2 | 04A4 | 7408 | 6572 | 5F65 | 7470 | 0D72 | EC04 |
| 0001546720 | C0FF | 0700 | 6F6C | 5F67 | 7470 | 0872 | F004 | 81FF |
| 0001546740 | 0200 | 7473 | 050E | 0262 | 000B | 053C | 5F06 | 665F |
| 0001546760 | 6E75 | 0163 | 2102 | 0B01 | 4031 | 1A05 | 1603 | 0C00 |
| 0001547000 | 0003 | 0400 | 6412 | 5F62 | 6567 | 5F74 | 7766 | 6F5F |
| 0001547020 | 6A62 | 645F | 7461 | 1161 | 0E04 | C000 | 0B00 | 626F |
| 0001547040 | 5F6A | 6F6C | 7067 | 7461 | 0C68 | 0A04 | 8600 | 0600 |
| 0001547060 | 626F | 5F6A | 6469 | 0412 | 0006 | 03BE | 6F0C | 6A62 |
| 0001547100 | 695F | 666E | 705F | 6461 | 0C72 | FA04 | C0FF | 0600 |
| 0001547120 | 5F5F | 7974 | 6570 | 040F | FFEA | 0085 | 5F09 | 625F |
| 0001547140 | 5F78 | 7974 | 6570 | 040D | FFDA | 0536 | 5F07 | 705F |
| 0001547160 | 6972 | 746E | 040B | FFD2 | 0202 | 5F05 | 6C5F | 6C76 |
| 0001547200 | 040D | FFDE | 0538 | 5F07 | 635F | 6F6C | 6B63 | 040D |
| 0001547220 | FFF6 | 00C0 | 5F07 | 735F | 6174 | 6B63 | 040E | FFD8 |
| 0001547240 | 0081 | 5F08 | 725F | 7465 | 6176 | 0E6C | F204 | A4FF |
| 0001547260 | 0804 | 7274 | 6565 | 705F | 7274 | 040D | FFEC | 00C0 |
| 0001547300 | 6C07 | 676F | 705F | 7274 | 0408 | FFF0 | 0081 | 7302 |
| 0001547320 | 0E74 | 8205 | 0B02 | 4200 | 0605 | 5F5F | 7566 | 636E |
| 0001547340 | 0201 | 0122 | 3425 | 0544 | 013B | 0016 | 012D | 0000 |
| 0001547360 | 1304 | 6264 | 665F | 6572 | 5F65 | 7766 | 6F5F | 6A62 |
| 0001547400 | 695F | 666E | 0C6F | 0604 | BF00 | 0603 | 7766 | 705F |
| 0001547420 | 7274 | 040C | FFFA | 00C0 | 5F06 | 745F | 7079 | 0F65 |
| 0001547440 | F404 | 85FF | 0900 | 5F5F | 7862 | 745F | 7079 | 0D65 |
| 0001547460 | E404 | 36FF | 0705 | 5F5F | 7270 | 6E69 | 0B74 | DC04 |
| 0001547500 | 02FF | 0502 | 5F5F | 766C | 0D6C | E804 | 38FF | 0705 |
| 0001547520 | 5F5F | 6C63 | 636F | 0D6B | F604 | C0FF | 0700 | 5F5F |
| 0001547540 | 7473 | 6361 | 0E6B | E204 | 81FF | 0800 | 5F5F | 6572 |
| 0001547560 | 7674 | 6C61 | 050E | 029E | 000B | 0546 | 5F06 | 665F |
| 0001547600 | 6E75 | 0163 | 2402 | 6001 | 4935 | A605 | 1603 | 9800 |
| 0001547620 | 0003 | 0400 | 6415 | 5F62 | 7766 | 695F | 5F64 | 7266 |
| 0001547640 | 6D6F | 6C5F | 676F | 6170 | 6874 | 040D | 000A | 00C0 |
| 0001547660 | 6C07 | 676F | 6170 | 6874 | 0410 | 0006 | 00C6 | 6F0A |
| 0001547700 | 6A62 | 695F | 5F64 | 6461 | 0C72 | FA04 | C0FF | 0600 |

THU MAR 14 17:31:54 1991 DB_PI.DLL PAGE 371, LINE 21831

| | | | | | | | | |
|---|---|---|---|---|---|---|---|---|
| 0001547720 | 5F5F | 7974 | 6570 | 040F | FFEA | 0085 | 5F09 | 625F |
| 0001547740 | 5F78 | 7974 | 6570 | 040D | FFDA | 0536 | 5F07 | 705F |
| 0001547760 | 6972 | 746E | 040B | FFD2 | 0202 | 5F05 | 6C5F | 6C76 |
| 0001550000 | 040D | FFDE | 0538 | 5F07 | 635F | 6F6C | 6B63 | 040D |
| 0001550020 | FFF6 | 00C0 | 5F07 | 735F | 6174 | 6B63 | 040E | FFD8 |
| 0001550040 | 0081 | 5F08 | 725F | 7465 | 6176 | 0E6C | F204 | A4FF |
| 0001550060 | 0804 | 7274 | 6565 | 705F | 7274 | 040D | FFEC | 00C0 |
| 0001550100 | 6C07 | 676F | 705F | 7274 | 0408 | FFF0 | 0081 | 7302 |
| 0001550120 | 0E74 | C005 | 0B02 | 4B00 | 0605 | 5F5F | 7566 | 636E |
| 0001550140 | 0201 | 0124 | 3906 | 054D | 03BC | 0016 | 03AE | 0000 |
| 0001550160 | 1504 | 6264 | 665F | 5F77 | 6F6C | 7067 | 7461 | 5F68 |
| 0001550200 | 7266 | 6D6F | 695F | 0C64 | 0A04 | 8600 | 0600 | 626F |
| 0001550220 | 5F6A | 6469 | 0411 | 0006 | 0205 | 6C0B | 676F | 6170 |
| 0001550240 | 6874 | 615F | 7264 | 040C | FFFA | 00C0 | 5F06 | 745F |
| 0001550260 | 7079 | 0F65 | E004 | 85FF | 0900 | 5F5F | 7862 | 745F |
| 0001550300 | 7079 | 0D65 | D004 | 36FF | 0705 | 5F5F | 7270 | 6E69 |
| 0001550320 | 0B74 | C804 | 02FF | 0502 | 5F5F | 766C | 0D6C | D404 |
| 0001550340 | 38FF | 0705 | 5F5F | 6C63 | 636F | 0D6B | EC04 | C0FF |
| 0001550360 | 0700 | 5F5F | 7473 | 6361 | 0E6B | CE04 | 81FF | 0800 |
| 0001550400 | 5F5F | 6572 | 7674 | 6C61 | 040E | FFE8 | 04A4 | 7408 |
| 0001550420 | 6572 | 5F65 | 7470 | 0D72 | E204 | C0FF | 0700 | 6F6C |
| 0001550440 | 5F67 | 7470 | 0F72 | F004 | 4EFF | 0905 | 7264 | 7669 |
| 0001550460 | 5F65 | 7473 | 0872 | E604 | 81FF | 0200 | 7473 | 050E |
| 0001550500 | 02E4 | 000B | 054B | 5F06 | 665F | 6E75 | 0163 | 2002 |
| 0001550520 | C201 | 503C | C005 | 1603 | B200 | 0003 | 0400 | 6411 |
| 0001550540 | 5F62 | 6567 | 5F74 | 7766 | 6C5F | 676F | 6170 | 6874 |
| 0001550560 | 0411 | 000E | 00C0 | 6F0B | 6A62 | 6C5F | 676F | 6170 |
| 0001550600 | 6874 | 040C | 000A | 0086 | 6F06 | 6A62 | 695F | 1164 |
| 0001550620 | 0604 | 0500 | 0B02 | 6F6C | 7067 | 7461 | 5F68 | 6461 |
| 0001550640 | 0C72 | FA04 | C0FF | 0600 | 5F5F | 7974 | 6570 | 040F |
| 0001550660 | FFE0 | 0085 | 5F09 | 625F | 5F78 | 7974 | 6570 | 040D |
| 0001550700 | FFD0 | 0536 | 5F07 | 705F | 6972 | 746E | 040B | FFC8 |
| 0001550720 | 0202 | 5F05 | 6C5F | 6C76 | 040D | FFD4 | 0538 | 5F07 |
| 0001550740 | 635F | 6F6C | 6B63 | 040D | FFEC | 00C0 | 5F07 | 735F |
| 0001550760 | 6174 | 6B63 | 040E | FFCE | 0081 | 5F08 | 725F | 7465 |
| 0001551000 | 6176 | 0E6C | E804 | A4FF | 0804 | 7274 | 6565 | 705F |
| 0001551020 | 7274 | 040D | FFE2 | 00C0 | 6C07 | 676F | 705F | 7274 |
| 0001551040 | 040F | FFF0 | 054E | 6409 | 6972 | 6576 | 735F | 7274 |
| 0001551060 | 0408 | FFE6 | 0081 | 7302 | 0E74 | 0805 | 0B03 | 5200 |
| 0001551100 | 0605 | 5F5F | 7566 | 636E | 0201 | 0124 | 4082 | 0554 |
| 0001551120 | 0333 | 0016 | 0325 | 0000 | 1504 | 6264 | 6C5F | 7369 |
| 0001551140 | 5F74 | 7766 | 6F5F | 6A62 | 635F | 6968 | 646C | 1173 |
| 0001551160 | 1204 | C000 | 0B00 | 626F | 5F6A | 6F6C | 7067 | 7461 |
| 0001551200 | 0C68 | 0E04 | 8600 | 0600 | 626F | 5F6A | 6469 | 0413 |
| 0001551220 | 000A | 00C5 | 630D | 6968 | 646C | 635F | 746E | 615F |
| 0001551240 | 7264 | 0413 | 0006 | 03CA | 630D | 6968 | 646C | 6C5F |
| 0001551260 | 7473 | 615F | 7264 | 040C | FFFA | 00C0 | 5F06 | 745F |
| 0001551300 | 7079 | 0F65 | EA04 | 85FF | 0900 | 5F5F | 7862 | 745F |
| 0001551320 | 7079 | 0D65 | DA04 | 36FF | 0705 | 5F5F | 7270 | 6E69 |
| 0001551340 | 0B74 | D204 | 02FF | 0502 | 5F5F | 766C | 0D6C | DE04 |
| 0001551360 | 38FF | 0705 | 5F5F | 6C63 | 636F | 0D6B | F604 | C0FF |
| 0001551400 | 0700 | 5F5F | 7473 | 6361 | 0E6B | D804 | 81FF | 0800 |
| 0001551420 | 5F5F | 6572 | 7674 | 6C61 | 040E | FFF2 | 04A4 | 7408 |
| 0001551440 | 6572 | 5F65 | 7470 | 0D72 | EC04 | C0FF | 0700 | 6F6C |
| 0001551460 | 5F67 | 7470 | 0872 | F004 | 81FF | 0200 | 7473 | 050E |
| 0001551500 | 0328 | 000B | 054B | 5F06 | 665F | 6E75 | 0163 | 1F02 |
| 0001551520 | B501 | 5643 | 3205 | 1603 | 2400 | 0003 | 0400 | 6410 |
| 0001551540 | 5F62 | 6567 | 5F74 | 7766 | 705F | 7261 | 6E65 | 1174 |
| 0001551560 | 1204 | C000 | 0B00 | 626F | 5F6A | 6F6C | 7067 | 7461 |

THU MAR 14 17:31:54 1991 DB_PI.DLL PAGE 372, LINE 21890

| | | | | | | | | |
|---|---|---|---|---|---|---|---|---|
| 0001551600 | 0C68 | 0E04 | 8600 | 0600 | 626F | 5F6A | 6469 | 0413 |
| 0001551620 | 000A | 00C6 | 700D | 7261 | 6E65 | 5F74 | 6469 | 615F |
| 0001551640 | 7264 | 0415 | 0006 | 00C0 | 700F | 7261 | 6E65 | 5F74 |
| 0001551660 | 616E | 656D | 705F | 7274 | 0408 | FFF0 | 0081 | 7302 |
| 0001551700 | 0C74 | FA04 | C0FF | 0600 | 5F5F | 7974 | 6570 | 040F |
| 0001551720 | FFEA | 0085 | 5F09 | 625F | 5F78 | 7974 | 6570 | 040D |
| 0001551740 | FFDA | 0536 | 5F07 | 705F | 6972 | 746E | 040B | FFD2 |
| 0001551760 | 0202 | 5F05 | 6C5F | 6C76 | 040D | FFDE | 0538 | 5F07 |
| 0001552000 | 635F | 6F6C | 6B63 | 040D | FFF6 | 00C0 | 5F07 | 735F |
| 0001552020 | 6174 | 6B63 | 040E | FFD8 | 0081 | 5F08 | 725F | 7465 |
| 0001552040 | 6176 | 0E6C | F204 | A4FF | 0804 | 7274 | 6565 | 705F |
| 0001552060 | 7274 | 040D | FFEC | 00C0 | 6C07 | 676F | 705F | 7274 |
| 0001552100 | 050E | 034C | 000B | 053C | 5F06 | 665F | 6E75 | 0163 |
| 0001552120 | 1D02 | E701 | 5846 | 0505 | 1604 | F700 | 0003 | 0400 |
| 0001552140 | 640E | 5F62 | 6F63 | 7970 | 665F | 5F77 | 626F | 116A |
| 0001552160 | 1804 | C000 | 0B00 | 7273 | 5F63 | 6F6C | 7067 | 7461 |
| 0001552200 | 0C68 | 1404 | 8600 | 0600 | 7273 | 5F63 | 6469 | 0411 |
| 0001552220 | 0010 | 00C0 | 640B | 7473 | 6C5F | 676F | 6170 | 6874 |
| 0001552240 | 040C | 000C | 0086 | 6406 | 7473 | 695F | 0F64 | 0A04 |
| 0001552260 | 8500 | 0900 | 766F | 7265 | 7277 | 7469 | 1065 | 0604 |
| 0001552300 | C600 | 0A00 | 626F | 5F6A | 6469 | 615F | 7264 | 040C |
| 0001552320 | FFFA | 00C0 | 5F06 | 745F | 7079 | 0F65 | EE04 | 85FF |
| 0001552340 | 0900 | 5F5F | 7862 | 745F | 7079 | 0D65 | DE04 | 36FF |
| 0001552360 | 0705 | 5F5F | 7270 | 6E69 | 0B74 | D204 | 02FF | 0502 |
| 0001552400 | 5F5F | 766C | 0D6C | E204 | 38FF | 0705 | 5F5F | 6C63 |
| 0001552420 | 636F | 0D6B | F204 | C0FF | 0700 | 5F5F | 7473 | 6361 |
| 0001552440 | 0E6B | D804 | 81FF | 0800 | 5F5F | 6572 | 7674 | 6C61 |
| 0001552460 | 0412 | FFDA | 04A4 | 730C | 6372 | 745F | 6572 | 5F65 |
| 0001552500 | 7470 | 1172 | CE04 | C0FF | 0B00 | 7273 | 5F63 | 6F6C |
| 0001552520 | 5F67 | 7470 | 1272 | CA04 | A4FF | 0CD4 | 7364 | 5F74 |
| 0001552540 | 7274 | 6565 | 705F | 7274 | 0411 | FFF6 | 00C0 | 640B |
| 0001552560 | 7473 | 6C5F | 676F | 705F | 7274 | 0408 | FFF0 | 0081 |
| 0001552600 | 7302 | 0E74 | 6C05 | 0B03 | 5A00 | 0605 | 5F5F | 7566 |
| 0001552620 | 636E | 0201 | 011D | 4AEC | 055C | 0415 | 0016 | 0407 |
| 0001552640 | 0000 | 0E04 | 6264 | 6D5F | 766F | 5F65 | 7766 | 6F5F |
| 0001552660 | 6A62 | 0411 | 0018 | 00C0 | 730B | 6372 | 6C5F | 676F |
| 0001552700 | 6170 | 6874 | 040C | 0014 | 0086 | 7306 | 6372 | 695F |
| 0001552720 | 1164 | 1004 | C000 | 0B00 | 7364 | 5F74 | 6F6C | 7067 |
| 0001552740 | 7461 | 0C68 | 0C04 | 8600 | 0600 | 7364 | 5F74 | 6469 |
| 0001552760 | 040F | 000A | 0085 | 6F09 | 6576 | 7772 | 6972 | 6574 |
| 0001553000 | 0410 | 0006 | 00C6 | 6F0A | 6A62 | 695F | 5F64 | 6461 |
| 0001553020 | 0C72 | FA04 | C0FF | 0600 | 5F5F | 7974 | 6570 | 040F |
| 0001553040 | FFEE | 0085 | 5FD9 | 625F | 5F78 | 7974 | 6570 | 040D |
| 0001553060 | FFDE | 0536 | 5F07 | 705F | 6972 | 746E | 040B | FFD2 |
| 0001553100 | 0202 | 5F05 | 6C5F | 6C76 | 040D | FFE2 | 0538 | 5F07 |
| 0001553120 | 635F | 6F6C | 6B63 | 040D | FFF2 | 00C0 | 5F07 | 735F |
| 0001553140 | 6174 | 6B63 | 040E | FFD8 | 0081 | 5F08 | 725F | 7465 |
| 0001553160 | 6176 | 126C | DA04 | A4FF | 0C04 | 7273 | 5F63 | 7274 |
| 0001553200 | 6565 | 705F | ,274 | 0411 | FFCE | 00C0 | 730B | 6372 |
| 0001553220 | 6C5F | 676F | 705F | 7274 | 0412 | FFCA | 04A4 | 640C |
| 0001553240 | 7473 | 745F | 6572 | 5F65 | 7470 | 1172 | F604 | C0FF |
| 0001553260 | 0B00 | 7364 | 5F74 | 6F6C | 5F67 | 7470 | 0872 | F004 |
| 0001553300 | 81FF | 0200 | 7473 | 050E | 038A | 000B | 055A | 5F06 |
| 0001553320 | 665F | 6E75 | 0163 | 1D02 | 0101 | 5E4F | 2B05 | 1602 |
| 0001553340 | 1D00 | 0002 | 0400 | 640E | 5F62 | 7766 | 6F5F | 6A62 |
| 0001553360 | 735F | 7A69 | 1165 | 1004 | C000 | 0B00 | 626F | 5F6A |
| 0001553400 | 6F6C | 7067 | 7461 | 0C68 | 0C04 | 8600 | 0600 | 626F |
| 0001553420 | 5F6A | 6469 | 040B | 000A | 0081 | 7305 | 6F63 | 6570 |
| 0001553440 | 040A | 0006 | 00C6 | 7304 | 7A69 | 0865 | F404 | 81FF |

THU MAR 14 17:31:54 1991 DB_PI.DLL PAGE 373, LINE 21949

| | | | | | | | | |
|---|---|---|---|---|---|---|---|---|
| 0001553460 | 0200 | 7473 | 0412 | FFDE | 03BF | 6F0C | 6A62 | 695F |
| 0001553500 | 666E | 5F6F | 7470 | 0C72 | FA04 | C0FF | 0600 | 5F5F |
| 0001553520 | 7974 | 6570 | 040F | FFF2 | 0085 | 5F09 | 625F | 5F78 |
| 0001553540 | 7974 | 6570 | 040D | FFE2 | 0536 | 5F07 | 705F | 6972 |
| 0001553560 | 746E | 040B | FFD6 | 0202 | 5F05 | 6C5F | 6C76 | 040D |
| 0001553600 | FFE6 | 0538 | 5F07 | 635F | 6F6C | 6B63 | 040D | FFF6 |
| 0001553620 | 00C0 | 5F07 | 735F | 6174 | 6B63 | 040E | FFDC | 0081 |
| 0001553640 | 5F08 | 725F | 7465 | 6176 | 0E6C | A805 | 0B03 | 4200 |
| 0001553660 | 0605 | 5F5F | 7566 | 636E | 0201 | 0D05 | 0000 | 001A |
| 0001553700 | 050F | 0214 | 000B | 00C0 | 4207 | 785F | 6946 | 656C |
| 0001553720 | 050F | 0218 | 000B | 00C0 | 4207 | 785F | 6150 | 6B63 |
| 0001553740 | 0514 | 0000 | 0000 | 0081 | 420C | 5F78 | 6544 | 7562 |
| 0001553760 | 4D67 | 646F | 1465 | 0005 | 0000 | 8100 | 0C00 | 7842 |
| 0001554000 | 545F | 6D69 | 7365 | 6F4D | 6564 | 1105 | 0001 | 0000 |
| 0001554020 | 011B | 512C | 055E | 0ACB | 0016 | 0ABD | 0000 | 0C04 |
| 0001554040 | 6264 | 6F5F | 6570 | 5F6E | 6574 | 7473 | 0411 | 0012 |
| 0001554060 | 00C0 | 740B | 7473 | 6C5F | 676F | 6170 | 6874 | 0410 |
| 0001554100 | 000E | 00C6 | 740A | 7473 | 695F | 5F64 | 6461 | 1372 |
| 0001554120 | 0A04 | 5300 | 0D03 | 6873 | 7261 | 5F65 | 6468 | 5F6C |
| 0001554140 | 7470 | 1172 | 0804 | 8100 | 0B00 | 6361 | 6563 | 7373 |
| 0001554160 | 6D5F | 646F | 1065 | 0604 | 8100 | DA00 | 6F6C | 6B63 |
| 0001554200 | 735F | 6F63 | 6570 | 040C | FFF6 | 00C0 | 5F06 | 745F |
| 0001554220 | 7079 | 0F65 | E604 | 85FF | 0900 | 5F5F | 7862 | 745F |
| 0001554240 | 7079 | 0D65 | D604 | 62FF | 0705 | 5F5F | 7270 | 6E69 |
| 0001554260 | 0B74 | CE04 | 02FF | 0502 | 5F5F | 766C | 0D6C | DA04 |
| 0001554300 | 64FF | 0705 | 5F5F | 6C63 | 636F | 0D6B | F204 | C0FF |
| 0001554320 | 0700 | 5F5F | 7473 | 6361 | 0E6B | D404 | 81FF | 0800 |
| 0001554340 | 5F5F | 6572 | 7674 | 6C61 | 040D | FFFA | 04BF | 7407 |
| 0001554360 | 7473 | 705F | 7274 | 0409 | FFCC | 0081 | 7403 | 7079 |
| 0001554400 | 0411 | FFC8 | 04DC | 640B | 5F62 | 6F72 | 746F | 705F |
| 0001554420 | 7274 | 040E | FFEE | 047A | 7408 | 6572 | 5F65 | 7470 |
| 0001554440 | 0D72 | E804 | C0FF | 0700 | 6F6C | 5F67 | 7470 | 0872 |
| 0001554460 | EC04 | 81FF | 0200 | 7473 | 050E | 0430 | 000B | 02B9 |
| 0001554500 | 5F06 | 665F | 6E75 | 0163 | 1C02 | F701 | 685B | 0005 |
| 0001554520 | 1605 | F200 | 0004 | 0400 | 640D | 5F62 | 6C63 | 736F |
| 0001554540 | 5F65 | 6574 | 7473 | 040C | 0008 | 0086 | 7406 | 7473 |
| 0001554560 | 695F | 1064 | 0604 | 8500 | 0A00 | 6F66 | 6372 | 5F65 |
| 0001554600 | 6C66 | 6761 | 040C | FFF6 | 00C0 | 5F06 | 745F | 7079 |
| 0001554620 | 0F65 | E604 | 85FF | 0900 | 5F5F | 7862 | 745F | 7079 |
| 0001554640 | 0D65 | D604 | 62FF | 0705 | 5F5F | 7270 | 6E69 | 0B74 |
| 0001554660 | CE04 | 02FF | 0502 | 5F5F | 766C | 0D6C | DA04 | 64FF |
| 0001554700 | 0705 | 5F5F | 6C63 | 636F | 0D6B | F204 | C0FF | 0700 |
| 0001554720 | 5F5F | 7473 | 6361 | 0E6B | D404 | 81FF | 0800 | 5F5F |
| 0001554740 | 6572 | 7674 | 6C61 | 040D | FFFA | 04BF | 7407 | 7473 |
| 0001554760 | 705F | 7274 | 040E | FFEE | 047A | 7408 | 6572 | 5F65 |
| 0001555000 | 7470 | 0D72 | E804 | C0FF | 0700 | 6F6C | 5F67 | 7470 |
| 0001555020 | 0872 | EC04 | 81FF | 0200 | 7473 | 050E | 044C | 000B |
| 0001555040 | 056A | 5F06 | 665F | 6E75 | 0163 | 2102 | F701 | 6B60 |
| 0001555060 | A705 | 1000 | 9C00 | 0000 | 0400 | 6412 | 5F62 | 6C63 |
| 0001555100 | 736F | 5F65 | 6C61 | 5F6C | 6574 | 7473 | 1173 | F404 |
| 0001555120 | DCFF | 0B04 | 6264 | 725F | 6F6F | 5F74 | 7470 | 0772 |
| 0001555140 | F804 | 85FF | 0100 | 0C69 | FA04 | 81FF | 0600 | 6D74 |
| 0001555160 | 5F70 | 7473 | 0408 | FFFC | 0081 | 7302 | 0174 | 1C02 |
| 0001555200 | 9E01 | 6D61 | 3405 | 1601 | 2600 | 0001 | 0400 | 640D |
| 0001555220 | 5F62 | 6873 | 7261 | 5F65 | 6574 | 7473 | 040D | 000A |
| 0001555240 | 0086 | 7407 | 7365 | 5F74 | 6469 | 0413 | 0006 | 0353 |
| 0001555260 | 730D | 6168 | 6572 | 685F | 6C64 | 615F | 7264 | 040C |
| 0001555300 | FFFA | 00C0 | 5F06 | 745F | 7079 | 0F65 | F404 | 85FF |
| 0001555320 | 0900 | 5F5F | 7862 | 745F | 7079 | 0D65 | E404 | 62FF |

THU MAR 14 17:31:54 1991 DB_PI.DLL PAGE 374, LINE 22008

| | | | | | | | | |
|---|---|---|---|---|---|---|---|---|
| 0001555340 | 0705 | 5F5F | 7270 | 6E69 | 0B74 | DC04 | 02FF | 0502 |
| 0001555360 | 5F5F | 766C | 0D6C | E804 | 64FF | 0705 | 5F5F | 6C63 |
| 0001555400 | 636F | 0D6B | F604 | C0FF | 0700 | 5F5F | 7473 | 6361 |
| 0001555420 | 0E6B | E204 | 81FF | 0800 | 5F5F | 6572 | 7674 | 6C61 |
| 0001555440 | 050E | 0468 | 000B | 056A | 5F06 | 665F | 6E75 | 0163 |
| 0001555460 | 1A02 | D201 | 6F62 | 2E05 | 1603 | 2000 | 0003 | 0400 |
| 0001555500 | 640B | 5F62 | 6F6C | 6461 | 735F | 6264 | 040C | 000A |
| 0001555520 | 0086 | 7406 | 7473 | 695F | 0E64 | 0804 | 8100 | 0800 |
| 0001555540 | 6473 | 5F62 | 7974 | 6570 | 0411 | 0006 | 0081 | 610B |
| 0001555560 | 6363 | 7365 | 5F73 | 6F6D | 6564 | 040C | FFF6 | 00C0 |
| 0001555600 | 5F06 | 745F | 7079 | 0F65 | EE04 | 85FF | 0900 | 5F5F |
| 0001555620 | 7862 | 745F | 7079 | 0D65 | DE04 | 62FF | 0705 | 5F5F |
| 0001555640 | 7270 | 6E69 | 0B74 | D604 | 02FF | 0502 | 5F5F | 766C |
| 0001555660 | 0D6C | E204 | 64FF | 0705 | 5F5F | 6C63 | 636F | 0D6B |
| 0001555700 | F204 | C0FF | 0700 | 5F5F | 7473 | 6361 | 0E6B | DC04 |
| 0001555720 | 81FF | 0800 | 5F5F | 6572 | 7674 | 6C61 | 040D | FFFA |
| 0001555740 | 04BF | 7407 | 7473 | 705F | 7274 | 0408 | FFF0 | 0081 |
| 0001555760 | 7302 | 0E74 | 8405 | 0B04 | ED00 | 0602 | 5F5F | 7566 |
| 0001556000 | 636E | 0201 | 011C | 6600 | 0572 | 0321 | 0016 | 0313 |
| 0001556020 | 0000 | 0D04 | 6264 | 755F | 6C6E | 616F | 5F64 | 6473 |
| 0001556040 | 0C62 | 0804 | 8600 | 0600 | 7374 | 5F74 | 6469 | 040E |
| 0001556060 | 0006 | 0081 | 7308 | 6264 | 745F | 7079 | 0C65 | F604 |
| 0001556100 | C0FF | 0600 | 5F5F | 7974 | 6570 | 040F | FFEE | 0085 |
| 0001556120 | 5F09 | 625F | 5F78 | 7974 | 6570 | 040D | FFDE | 0562 |
| 0001556140 | 5F07 | 705F | 6972 | 746E | 040B | FFD6 | 0202 | 5F05 |
| 0001556160 | 6C5F | 6C76 | 040D | FFE2 | 0564 | 5F07 | 635F | 6F6C |
| 0001556200 | 6B63 | 040D | FFF2 | 00C0 | 5F07 | 735F | 6174 | 6B63 |
| 0001556220 | D40E | FFDC | 0081 | 5F08 | 725F | 7465 | 6176 | 0D6C |
| 0001556240 | FA04 | BFFF | 0704 | 7374 | 5F74 | 7470 | 0872 | F004 |
| 0001556260 | 81FF | 0200 | 7473 | 050E | 049E | 000B | 056A | 5F06 |
| 0001556300 | 665F | 6E75 | 0163 | 2102 | 2101 | 7469 | A605 | 1000 |
| 0001556320 | 9B00 | 0000 | 0400 | 6412 | 5F62 | 6E75 | 6F6C | 6461 |
| 0001556340 | 615F | 6C6C | 735F | 6264 | 0D73 | 0604 | BF00 | 0704 |
| 0001556360 | 7374 | 5F74 | 7470 | 0872 | FA04 | 81FF | 0200 | 7473 |
| 0001556400 | 040C | FFFC | 0081 | 7206 | 7465 | 735F | 0174 | 1B02 |
| 0001556420 | C701 | 7669 | F705 | 1603 | E900 | 0003 | 0400 | 640C |
| 0001556440 | 5F62 | 6C63 | 6165 | 5F6E | 6473 | 0C62 | 0804 | 8600 |
| 0001556460 | 0600 | 7374 | 5F74 | 6469 | 040E | 0006 | 0081 | 7308 |
| 0001556500 | 6264 | 745F | 7079 | 0C65 | F604 | C0FF | 0600 | 5F5F |
| 0001556520 | 7974 | 6570 | 040F | FFEC | 0085 | 5F09 | 625F | 5F78 |
| 0001556540 | 7974 | 6570 | 040D | FFDC | 0562 | 5F07 | 705F | 6972 |
| 0001556560 | 746E | 040B | FFD4 | 0202 | 5F05 | 6C5F | 6C76 | 040D |
| 0001556600 | FFE0 | 0564 | 5F07 | 635F | 6F6C | 6B63 | 040D | FFF0 |
| 0001556620 | 00C0 | 5F07 | 735F | 6174 | 6B63 | 040E | FFDA | 0081 |
| 0001556640 | 5F08 | 725F | 7465 | 6176 | 0D6C | FA04 | BFFF | 0704 |
| 0001556660 | 7374 | 5F74 | 7470 | 0872 | EE04 | 81FF | 0200 | 7473 |
| 0001556700 | 040C | FFF4 | 0081 | 7206 | 7465 | 735F | 0E74 | BA05 |
| 0001556720 | 0B04 | B900 | 0602 | 5F5F | 7566 | 636E | 0201 | 011B |
| 0001556740 | 6DBE | 0578 | 014B | 0016 | 013D | 0000 | 0C04 | 6264 |
| 0001556760 | 635F | 656C | 6E61 | 745F | 7473 | 040C | 0006 | 0086 |
| 0001557000 | 7406 | 7473 | 695F | 0C64 | FA04 | C0FF | 0600 | 5F5F |
| 0001557020 | 7974 | 6570 | 040F | FFF4 | 0085 | 5F09 | 625F | 5F78 |
| 0001557040 | 7974 | 6570 | 040D | FFE4 | 0562 | 5F07 | 705F | 6972 |
| 0001557060 | 746E | 040B | FFDC | 0202 | 5F05 | 6C5F | 6C76 | 040D |
| 0001557100 | FFE8 | 0564 | 5F07 | 635F | 6F6C | 6B63 | 040D | FFF6 |
| 0001557120 | 00C0 | 5F07 | 735F | 6174 | 6B63 | 040E | FFE2 | 0081 |
| 0001557140 | 5F08 | 725F | 7465 | 6176 | 0E6C | D605 | 0B04 | B900 |
| 0001557160 | 0602 | 5F5F | 7566 | 636E | 0201 | 0D05 | 0000 | 001A |
| 0001557200 | 050F | 0428 | 000B | 00C0 | 4207 | 785F | 6946 | 656C |

THU MAR 14 17:31:54 1991 DB_PI.DLL PAGE 375, LINE 22067

| | | | | | | | | |
|---|---|---|---|---|---|---|---|---|
| 0001557220 | 050F | 042C | 000B | 00C0 | 4207 | 785F | 6150 | 6B63 |
| 0001557240 | 0514 | 0000 | 0000 | 0081 | 420C | 5F78 | 6544 | 7562 |
| 0001557260 | 4D67 | 646F | 1465 | 0005 | 0000 | 8100 | 0C00 | 7842 |
| 0001557300 | 545F | 6D69 | 7365 | 6F4D | 6564 | 1105 | 0001 | 0000 |
| 0001557320 | 0123 | 6F0A | 05EB | 048B | 0016 | 047D | 0000 | 1404 |
| 0001557340 | 6264 | 615F | 6363 | 7365 | 5F73 | 7374 | 5F74 | 6373 |
| 0001557360 | 6972 | 7470 | 040C | 000C | 0086 | 7406 | 7473 | 695F |
| 0001557400 | 1164 | 0A04 | 8100 | 0B00 | 6361 | 6563 | 7373 | 6D5F |
| 0001557420 | 646F | 1265 | 0604 | 0500 | 0C02 | 6170 | 6874 | 616E |
| 0001557440 | 656D | 615F | 7264 | 040C | FFF6 | 00C0 | 5F06 | 745F |
| 0001557460 | 7079 | 0F65 | E204 | 85FF | 0900 | 5F5F | 7862 | 745F |
| 0001557500 | 7079 | 0D65 | D204 | 2AFF | 0702 | 5F5F | 7270 | 6E69 |
| 0001557520 | 0B74 | CA04 | 02FF | 0502 | 5F5F | 766C | 0D6C | D604 |
| 0001557540 | F0FF | 0705 | 5F5F | 6C63 | 636F | 0D6B | F204 | C0FF |
| 0001557560 | 0700 | 5F5F | 7473 | 6361 | 0E6B | D004 | 81FF | 0800 |
| 0001557600 | 5F5F | 6572 | 7674 | 6C61 | 040D | FFFA | 0540 | 7407 |
| 0001557620 | 7473 | 705F | 7274 | 0408 | FFEA | 028A | 6602 | 0E70 |
| 0001557640 | EE04 | FBFF | 0804 | 7274 | 6565 | 705F | 7274 | 040D |
| 0001557660 | FFE4 | 00C0 | 6C07 | 676F | 705F | 7274 | 0408 | FFE8 |
| 0001557700 | 0081 | 7302 | 0E74 | 1205 | 0B05 | EE00 | 0605 | 5F5F |
| 0001557720 | 7566 | 636E | 0201 | 0124 | 7395 | 05F4 | 0134 | 0016 |
| 0001557740 | 0126 | 0000 | 1504 | 6264 | 725F | 6C65 | 6165 | 6573 |
| 0001557760 | 745F | 7473 | 735F | 7263 | 7069 | 0C74 | 0A04 | 8600 |
| 0001560000 | 0600 | 7374 | 5F74 | 6469 | 0412 | 0006 | 00C0 | 700C |
| 0001560020 | 7461 | 6E68 | 6D61 | 5F65 | 7470 | 0C72 | FA04 | C0FF |
| 0001560040 | 0600 | 5F5F | 7974 | 6570 | 040F | FFF4 | 0085 | 5F09 |
| 0001560060 | 625F | 5F78 | 7974 | 6570 | 040D | FFE4 | 022A | 5F07 |
| 0001560100 | 705F | 6972 | 746E | 040B | FFDC | 0202 | 5F05 | 6C5F |
| 0001560120 | 6C76 | 040D | FFE8 | 05F0 | 5F07 | 635F | 6F6C | 6B63 |
| 0001560140 | 040D | FFF6 | 00C0 | 5F07 | 735F | 6174 | 6B63 | 040E |
| 0001560160 | FFE2 | 0081 | 5F08 | 725F | 7465 | 6176 | 0E6C | 3605 |
| 0001560200 | 0B05 | F600 | 0605 | 5F5F | 7566 | 636E | 0201 | 011A |
| 0001560220 | 74C9 | 05F8 | 0138 | 0010 | 012D | 0000 | 0B04 | 6264 |
| 0001560240 | 675F | 7465 | 6E5F | 6D61 | 0865 | 0604 | 8A00 | 0202 |
| 0001560260 | 7066 | 0409 | 000A | 00C0 | 6B03 | 7965 | 0409 | 000E |
| 0001560300 | 00C0 | 7303 | 7274 | 0409 | FFF8 | 0085 | 6903 | 7864 |
| 0001560320 | 0409 | FFF6 | 0085 | 6C03 | 6E65 | 040B | FFFA | 00C0 |
| 0001560340 | 6E05 | 705F | 7274 | 0201 | 0119 | 7601 | 05FB | 01A1 |
| 0001560360 | 0010 | 0196 | 0000 | 0A04 | 6264 | 675F | 7465 | 735F |
| 0001560400 | 7274 | 0408 | 0006 | 028A | 6602 | 0970 | 0A04 | C000 |
| 0001560420 | 0300 | 656B | 0D79 | 0E04 | 0500 | 0702 | 7473 | 5F72 |
| 0001560440 | 6461 | 0772 | F604 | 81FF | 0100 | 0969 | F404 | 81FF |
| 0001560460 | 0300 | 656C | 0B6E | FA04 | C0FF | 0500 | 5F6E | 7470 |
| 0001560500 | 0872 | F804 | 81FF | 0200 | 7473 | 0201 | 0120 | 77A2 |
| 0001560520 | 05FD | 0195 | 0010 | 018A | 0000 | 1104 | 6264 | 725F |
| 0001560540 | 6165 | 5F64 | 6468 | 5F72 | 6170 | 6172 | 096D | 0604 |
| 0001560560 | C000 | 0300 | 7473 | 0D72 | 0A04 | 1500 | 0704 | 6468 |
| 0001560600 | 5F72 | 7470 | 0E72 | DE04 | 25FF | 0803 | 6D74 | 5F70 |
| 0001560620 | 616E | 656D | 040E | FFBE | 0325 | 7408 | 706D | 745F |
| 0001560640 | 7079 | 0965 | BC04 | 85FF | 0300 | 6469 | 0878 | BA04 |
| 0001560660 | 81FF | 0200 | 7473 | 0201 | 0121 | 7937 | 0600 | 00E1 |
| 0001560700 | 0010 | 00D6 | 0000 | 1204 | 6264 | 775F | 6972 | 6574 |
| 0001560720 | 685F | 7264 | 705F | 7261 | 6D61 | 0408 | 0006 | 028A |
| 0001560740 | 6602 | 0D70 | 0A04 | 1500 | 0704 | 6468 | 5F72 | 7470 |
| 0001560760 | 0772 | FC04 | 85FF | 0100 | 0169 | 1F02 | 1801 | 047A |
| 0001561000 | B306 | 1003 | A800 | 0003 | 0400 | 6410 | 5F62 | 7277 |
| 0001561020 | 7469 | 5F65 | 7374 | 5F74 | 6468 | 0872 | 0604 | 8A00 |
| 0001561040 | 0202 | 7066 | 040D | 000A | 0415 | 6807 | 7264 | 705F |
| 0001561060 | 7274 | 040E | FFFA | 0082 | 7408 | 6D69 | 5F65 | 6176 |

THU MAR 14 17:31:54 1991 DB_PI.DLL PAGE 376, LINE 22126

| | | | | | | | | |
|---|---|---|---|---|---|---|---|---|
| 0001561100 | 086C | F804 | 01FF | 0200 | 7473 | 0201 | 0120 | 7DCB |
| 0001561120 | 060C | 05F4 | 0016 | 05E6 | 0000 | 1104 | 6264 | 675F |
| 0001561140 | 7465 | 745F | 7473 | 685F | 6165 | 6564 | 0C72 | 0A04 |
| 0001561160 | 8600 | 0600 | 7374 | 5F74 | 6469 | 0411 | 0006 | 0414 |
| 0001561200 | 680B | 7264 | 705F | 7274 | 615F | 7264 | 040C | FFF6 |
| 0001561220 | 00C0 | 5F06 | 745F | 7079 | 0F65 | E204 | 85FD | 0900 |
| 0001561240 | 5F5F | 7862 | 745F | 7079 | 0D65 | D204 | 2AFD | 0702 |
| 0001561260 | 5F5F | 7270 | 6E69 | 0B74 | CA04 | 02FD | 0502 | 5F5F |
| 0001561300 | 766C | 0D6C | D604 | F0FD | 0705 | 5F5F | 6C63 | 636F |
| 0001561320 | 0D6B | F004 | C0FE | 0700 | 5F5F | 7473 | 6361 | 0E6B |
| 0001561340 | D004 | 81FD | 0800 | 5F5F | 6572 | 7674 | 6C61 | 040D |
| 0001561360 | FFFA | 0540 | 7407 | 7473 | 705F | 7274 | 040E | FDE4 |
| 0001561400 | 055D | 7208 | 6F6F | 5F74 | 7470 | 0D72 | C604 | C0FD |
| 0001561420 | 0700 | 6F6C | 7067 | 7461 | 1368 | F604 | B0FE | 0D04 |
| 0001561440 | 6870 | 7379 | 705F | 7461 | 6E68 | 6D61 | 0E65 | F004 |
| 0001561460 | B0FD | 0804 | 7265 | 5F72 | 6170 | 6874 | 040D | FEF4 |
| 0001561500 | 0085 | 6C07 | 6E69 | 5F65 | 6F6E | 0411 | FDE8 | 0085 |
| 0001561520 | 650B | 7272 | 6F5F | 5F6E | 6E69 | 7469 | 040F | FDEC |
| 0001561540 | 0086 | 7009 | 7261 | 6E65 | 5F74 | 6469 | 0408 | FDEA |
| 0001561560 | 0081 | 7302 | 0E74 | 5A05 | 0B06 | 0D00 | 0606 | 5F5F |
| 0001561600 | 7566 | 636E | 0201 | 0122 | 83BF | 060F | 0545 | 0010 |
| 0001561620 | 053A | 0000 | 1304 | 6264 | 615F | 6464 | 655F | 746E |
| 0001561640 | 7972 | 745F | 5F6F | 6468 | 0D72 | 0604 | 1500 | 0704 |
| 0001561660 | 6468 | 5F72 | 7470 | 0A72 | 0A04 | C000 | 0400 | 616E |
| 0001561700 | 656D | 040B | 000E | 00C0 | 7605 | 6C61 | 6575 | 040C |
| 0001561720 | 0012 | 0085 | 6C06 | 6E65 | 7467 | 0F68 | 1404 | 8500 |
| 0001561740 | 0900 | 766F | 7265 | 7277 | 7469 | 0E65 | FA04 | 82FF |
| 0001561760 | 0800 | 6F6C | 676E | 6164 | 6574 | 0201 | 0127 | 8904 |
| 0001562000 | 0612 | 0035 | 0010 | 002A | 0000 | 1804 | 6264 | 665F |
| 0001562020 | 6369 | 6974 | 6576 | 675F | 7465 | 685F | 7264 | 655F |
| 0001562040 | 746E | 7972 | 040D | 0006 | 0415 | 6807 | 7264 | 705F |
| 0001562060 | 7274 | 040A | 000A | 00C0 | 6E04 | 6D61 | 0B65 | 0E04 |
| 0001562100 | D300 | 0503 | 6176 | 756C | 0A65 | 1204 | C500 | 0400 |
| 0001562120 | 6973 | 657A | 0201 | 011E | 8939 | 0614 | 019C | 0016 |
| 0001562140 | 018E | 0000 | 0F04 | 6264 | 665F | 6572 | 5F65 | 7374 |
| 0001562160 | 5F74 | 6468 | 0D72 | 0604 | 1500 | 0704 | 6468 | 5F72 |
| 0001562200 | 7470 | 0C72 | FA04 | C0FF | 0600 | 5F5F | 7974 | 6570 |
| 0001562220 | 040F | FFF4 | 0085 | 5F09 | 625F | 5F78 | 7974 | 6570 |
| 0001562240 | 040D | FFE4 | 022A | 5F07 | 705F | 6972 | 746E | 040B |
| 0001562260 | FFDC | 0202 | 5F05 | 6C5F | 6C76 | 040D | FFE8 | 05F0 |
| 0001562300 | 5F07 | 635F | 6F6C | 6B63 | 040D | FFF6 | 00C0 | 5F07 |
| 0001562320 | 735F | 6174 | 6B63 | 040E | FFE2 | 0081 | 5F08 | 725F |
| 0001562340 | 7465 | 6176 | 0E6C | D205 | 0B06 | 1600 | 0606 | 5F5F |
| 0001562360 | 7566 | 636E | 0201 | 0120 | 8AD5 | 0618 | 036A | 0016 |
| 0001562400 | 035C | 0000 | 1104 | 6264 | 735F | 7465 | 745F | 7473 |
| 0001562420 | 685F | 6165 | 6564 | 0C72 | 0A04 | 8600 | 0600 | 7374 |
| 0001562440 | 5F74 | 6469 | 040D | 0006 | 0415 | 6807 | 7264 | 705F |
| 0001562460 | 7274 | 040C | FFF6 | 00C0 | 5F06 | 745F | 7079 | 0F65 |
| 0001562500 | EA04 | 85FF | 0900 | 5F5F | 7862 | 745F | 7079 | 0D65 |
| 0001562520 | DA04 | 2AFF | 0702 | 5F5F | 7270 | 6E69 | 0B74 | D204 |
| 0001562540 | 02FF | 0502 | 5F5F | 766C | 0D6C | DE04 | F0FF | 0705 |
| 0001562560 | 5F5F | 6C63 | 636F | 0D6B | F204 | C0FF | 0700 | 5F5F |
| 0001562600 | 7473 | 6361 | 0E6B | D804 | 81FF | 0800 | 5F5F | 6572 |
| 0001562620 | 7674 | 6C61 | 040D | FFFA | 0540 | 7407 | 7473 | 705F |
| 0001562640 | 7274 | 0413 | FED2 | 04B0 | 660D | 6C69 | 5F65 | 6170 |
| 0001562660 | 6874 | 616E | 656D | 0408 | FFEE | 028A | 6602 | 0870 |
| 0001562700 | EC04 | 81FF | 0200 | 7473 | 050E | 06F6 | 000B | 060D |
| 0001562720 | 5F06 | 665F | 6E75 | 0163 | 1802 | 3F01 | 1A8E | 5106 |
| 0001562740 | 1601 | 4300 | 0001 | 0400 | 6409 | 5F62 | 7073 | 735F |

THU MAR 14 17:31:54 1991 DB_PI.DLL PAGE 377, LINE 22185

| | | | | | | | | |
|---|---|---|---|---|---|---|---|---|
| 0001562760 | 7465 | 040E | 000A | 0085 | 7308 | 5F70 | 6F63 | 6E75 |
| 0001563000 | 1274 | 0604 | 0500 | 0C02 | 7073 | 705F | 7461 | 5F68 |
| 0001563020 | 696C | 7473 | 040C | FFFA | 00C0 | 5F06 | 745F | 7079 |
| 0001563040 | 0F65 | F404 | 85FF | 0900 | 5F5F | 7862 | 745F | 7079 |
| 0001563060 | 0D65 | E404 | 2AFF | 0702 | 5F5F | 7270 | 6E69 | 0B74 |
| 0001563100 | DC04 | 02FF | 0502 | 5F5F | 766C | 0D6C | E804 | F0FF |
| 0001563120 | 0705 | 5F5F | 6C63 | 636F | 0D6B | F604 | C0FF | 0700 |
| 0001563140 | 5F5F | 7473 | 6361 | 0E6B | E204 | 81FF | 0800 | 5F5F |
| 0001563160 | 6572 | 7674 | 6C61 | 050E | 0716 | 000B | 061B | 5F06 |
| 0001563200 | 665F | 6E75 | 0163 | 1B02 | 9001 | 1D8F | 4B06 | 1604 |
| 0001563220 | 3D00 | 0004 | 0400 | 640C | 5F62 | 7073 | 735F | 6165 |
| 0001563240 | 6372 | 0E68 | 0A04 | C000 | 0800 | 7374 | 5F74 | 616E |
| 0001563260 | 656D | 0410 | 0006 | 00C6 | 740A | 7473 | 695F | 5F64 |
| 0001563300 | 6461 | 0C72 | DA04 | C0FF | 0600 | 5F5F | 7974 | 6570 |
| 0001563320 | 040F | FFC6 | 0085 | 5F09 | 625F | 5F78 | 7974 | 6570 |
| 0001563340 | 040D | FFB6 | 022A | 5F07 | 705F | 6972 | 746E | 040B |
| 0001563360 | FFAE | 0202 | 5F05 | 6C5F | 6C76 | 040D | FFBA | 05F0 |
| 0001563400 | 5F07 | 635F | 6F6C | 6B63 | 040D | FFD4 | 00C0 | 5F07 |
| 0001563420 | 735F | 6174 | 6B63 | 040E | FFB4 | 0081 | 5F08 | 725F |
| 0001563440 | 7465 | 6176 | 0E6C | D004 | FBFF | 0804 | 7274 | 6565 |
| 0001563460 | 705F | 7274 | 040C | FFD8 | 0085 | 6906 | 5F64 | 6E63 |
| 0001563500 | 0C74 | AA04 | C6FF | 0600 | 6469 | 6C5F | 7473 | 0410 |
| 0001563520 | FFDE | 0325 | 760A | 6C61 | 6469 | 6E5F | 6D61 | 0765 |
| 0001563540 | C804 | 85FF | 0100 | 0D69 | CC04 | C0FF | 0700 | 6D74 |
| 0001563560 | 5F70 | 7470 | 0872 | CA04 | 81FF | 0200 | 7473 | 050E |
| 0001563600 | 072E | 000B | 0320 | 5F06 | 665F | 6E75 | 0163 | 0502 |
| 0001563620 | 000D | 1A00 | 0F00 | 0A05 | 0B05 | C000 | 0700 | 5F42 |
| 0001563640 | 4678 | 6C69 | 0F65 | 0E05 | 0B05 | C000 | 0700 | 5F42 |
| 0001563660 | 5078 | 6361 | 146B | 0005 | 0000 | 8100 | 0C00 | 7842 |
| 0001563700 | 445F | 6265 | 6775 | 6F4D | 6564 | 0514 | 0000 | 0000 |
| 0001563720 | 0081 | 420C | 5F78 | 6954 | 656D | 4D73 | 646F | 1065 |
| 0001563740 | 0405 | 0A02 | B000 | 0804 | 696C | 656E | 625F | 6675 |
| 0001563760 | 1105 | 0001 | 0000 | 011D | 93DC | 0583 | 0570 | 0016 |
| 0001564000 | 0562 | 0000 | 0E04 | 6264 | 635F | 6572 | 7461 | 5F65 |
| 0001564020 | 6F67 | 6A62 | 040C | 000C | 0086 | 7406 | 7473 | 695F |
| 0001564040 | 0E64 | 0A04 | 8100 | 0800 | 626F | 5F6A | 7974 | 6570 |
| 0001564060 | 040D | 0006 | 0466 | 6F07 | 6A62 | 705F | 7274 | 040E |
| 0001564100 | FFDC | 0081 | 5F08 | 725F | 7465 | 6176 | 0D6C | FA04 |
| 0001564120 | E5FF | 0704 | 7374 | 5F74 | 7470 | 0872 | F004 | 81FF |
| 0001564140 | 0200 | 7473 | 040C | FFF6 | 00C0 | 5F06 | 745F | 7079 |
| 0001564160 | 0F65 | EE04 | 85FF | 0900 | 5F5F | 7862 | 745F | 7079 |
| 0001564200 | 0D65 | DE04 | 66FF | 0702 | 5F5F | 7270 | 6E69 | 0B74 |
| 0001564220 | D604 | 02FF | 0502 | 5F5F | 766C | 0D6C | E204 | 88FF |
| 0001564240 | 0705 | 5F5F | 6C63 | 636F | 0D6B | F204 | C0FF | 0700 |
| 0001564260 | 5F5F | 7473 | 6361 | 0E6B | 6005 | 0B07 | 8600 | 0605 |
| 0001564300 | 5F5F | 7566 | 636E | 0201 | 011E | 994C | 058A | 038B |
| 0001564320 | 0016 | 037D | 0000 | 0F04 | 6264 | 6E5F | 7865 | 5F74 |
| 0001564340 | 6F67 | 6A62 | 695F | 0C64 | 0C04 | 8600 | 0600 | 7374 |
| 0001564360 | 5F74 | 6469 | 040E | 000A | 0081 | 6F08 | 6A62 | 745F |
| 0001564400 | 7079 | 1065 | 0604 | C600 | 0A00 | 626F | 5F6A | 6469 |
| 0001564420 | 615F | 7264 | 040D | FFF2 | 00C0 | 5F07 | 735F | 6174 |
| 0001564440 | 6B63 | 040E | FFDC | 0081 | 5F08 | 725F | 7465 | 6176 |
| 0001564460 | 0D6C | FA04 | E5FF | 0704 | 7374 | 5F74 | 7470 | 0872 |
| 0001564500 | F004 | 81FF | 0200 | 7473 | 040C | FFF6 | 00C0 | 5F06 |
| 0001564520 | 745F | 7079 | 0F65 | EE04 | 85FF | 0900 | 5F5F | 7862 |
| 0001564540 | 745F | 7079 | 0D65 | DE04 | 66FF | 0702 | 5F5F | 7270 |
| 0001564560 | 6E69 | 0B74 | D604 | 02FF | 0502 | 5F5F | 766C | 0D6C |
| 0001564600 | E204 | 88FF | 0705 | 5F5F | 6C63 | 636F | 0E6B | 7E05 |
| 0001564620 | 0B07 | 8C00 | 0605 | 5F5F | 7566 | 636E | 0201 | 011D |

THU MAR 14 17:31:54 1991 DB_PI.DLL PAGE 378, LINE 22244

| | | | | | | | | |
|---|---|---|---|---|---|---|---|---|
| 0001564640 | 9CD7 | 058E | 0373 | 0016 | 0365 | 0000 | 0E04 | 6264 |
| 0001564660 | 645F | 6C65 | 7465 | 5F65 | 6F67 | 6A62 | 040C | 000A |
| 0001564700 | 0086 | 7406 | 7473 | 695F | 0C64 | 0604 | 8600 | 0600 |
| 0001564720 | 626F | 5F6A | 6469 | 040C | FFF6 | 00C0 | 5F06 | 745F |
| 0001564740 | 7079 | 0F65 | EE04 | 85FF | 0900 | 5F5F | 7862 | 745F |
| 0001564760 | 7079 | 0D65 | DE04 | 66FF | 0702 | 5F5F | 7270 | 6E69 |
| 0001565000 | 0B74 | D404 | 02FF | 0502 | 5F5F | 766C | 0D6C | E204 |
| 0001565020 | 88FF | 0705 | 5F5F | 6C63 | 636F | 0D6B | F204 | C0FF |
| 0001565040 | 0700 | 5F5F | 7473 | 6361 | 0E6B | DA04 | 81FF | 0800 |
| 0001565060 | 5F5F | 6572 | 7674 | 6C61 | 040D | FFFA | 04E5 | 7407 |
| 0001565100 | 7473 | 705F | 7274 | 040E | FFDC | 0081 | 6F08 | 6A62 |
| 0001565120 | 745F | 7079 | 0865 | F004 | 81FF | 0200 | 7473 | 050E |
| 0001565140 | 079C | 000B | 0586 | 5F06 | 665F | 6E75 | 0163 | 1D02 |
| 0001565160 | 4A01 | 90A0 | 2A05 | 1604 | 1C00 | 0004 | 0400 | 640F |
| 0001565200 | 5F62 | 6F6D | 6964 | 7966 | 675F | 626F | 0C6A | 0A04 |
| 0001565220 | 8600 | 0600 | 7374 | 5F74 | 6469 | 040D | 0006 | 0466 |
| 0001565240 | 6F07 | 6A62 | 705F | 7274 | 040C | FFF6 | 00C0 | 5F06 |
| 0001565260 | 745F | 7079 | 0F65 | EE04 | 85FF | 0900 | 5F5F | 7862 |
| 0001565300 | 745F | 7079 | 0D65 | DE04 | 66FF | 0702 | 5F5F | 7270 |
| 0001565320 | 6E69 | 0B74 | D404 | 02FF | 0502 | 5F5F | 766C | 0D6C |
| 0001565340 | E204 | 88FF | 0705 | 5F5F | 6C63 | 636F | 0D6B | F204 |
| 0001565360 | C0FF | 0700 | 5F5F | 7473 | 6361 | 0E6B | DA04 | 81FF |
| 0001565400 | 0800 | 5F5F | 6572 | 7674 | 6C61 | 040D | FFFA | 04E5 |
| 0001565420 | 7407 | 7473 | 705F | 7274 | 040E | FFDC | 0081 | 6F08 |
| 0001565440 | 6A62 | 745F | 7079 | 0865 | F004 | 81FF | 0200 | 7473 |
| 0001565460 | 050E | 07BA | 000B | 0586 | 5F06 | 665F | 6E75 | 0163 |
| 0001565500 | 1A02 | 7401 | 92A4 | B905 | 1605 | AB00 | 0005 | 0400 |
| 0001565520 | 640B | 5F62 | 6567 | 5F74 | 6F67 | 6A62 | 040C | 000E |
| 0001565540 | 0086 | 7406 | 7473 | 695F | 0C64 | 0A04 | 8600 | 0600 |
| 0001565560 | 626F | 5F6A | 6469 | 0411 | 0006 | 046D | 6F0B | 6A62 |
| 0001565600 | 705F | 7274 | 615F | 7264 | 040C | FFF6 | 00C0 | 5F06 |
| 0001565620 | 745F | 7079 | 0F65 | C604 | 85FF | 0900 | 5F5F | 7862 |
| 0001565640 | 745F | 7079 | 0D65 | B404 | 66FF | 0702 | 5F5F | 7270 |
| 0001565660 | 6E69 | 0B74 | AA04 | 02FF | 0502 | 5F5F | 766C | 0D6C |
| 0001565700 | BA04 | 88FF | 0705 | 5F5F | 6C63 | 636F | 0D6B | F204 |
| 0001565720 | C0FF | 0700 | 5F5F | 7473 | 6361 | 0E6B | B004 | 81FF |
| 0001565740 | 0800 | 5F5F | 6572 | 7674 | 6C61 | 040D | FFFA | 04E5 |
| 0001565760 | 7407 | 7473 | 705F | 7274 | 040E | FFB8 | 0081 | 7408 |
| 0001566000 | 706D | 735F | 7A69 | 0E65 | B204 | 81FF | 0800 | 626F |
| 0001566020 | 5F6A | 7974 | 6570 | 040D | FFC8 | 0461 | 6707 | 6E65 |
| 0001566040 | 685F | 7264 | 0408 | FFF0 | 0081 | 7302 | 0E74 | D805 |
| 0001566060 | 0B07 | 5B00 | 0603 | 5F5F | 7566 | 636E | 0201 | 011B |
| 0001566100 | AA2D | 0595 | 037F | 0016 | 0371 | 0000 | 0C04 | 6264 |
| 0001566120 | 6C5F | 7369 | 5F74 | 6F67 | 6A62 | 040C | 0010 | 0086 |
| 0001566140 | 7406 | 7473 | 695F | 0E64 | 0E04 | 8100 | 0800 | 626F |
| 0001566160 | 5F6A | 7974 | 6570 | 0413 | 000A | 00C5 | 6F0D | 6A62 |
| 0001566200 | 635F | 756F | 746E | 615F | 7264 | 0414 | 0006 | 045E |
| 0001566220 | 6F0E | 6A62 | 695F | 5F64 | 736C | 5F74 | 6461 | 0C72 |
| 0001566240 | F604 | C0FF | 0600 | 5F5F | 7974 | 6570 | 040F | FFEE |
| 0001566260 | 0085 | 5F09 | 625F | 5F78 | 7974 | 6570 | 040D | FFDE |
| 0001566300 | 0266 | 5F07 | 705F | 6972 | 746E | 040B | FFD6 | 0202 |
| 0001566320 | 5F05 | 6C5F | 6C76 | 040D | FFE2 | 0588 | 5F07 | 635F |
| 0001566340 | 6F6C | 6B63 | 040D | FFF2 | 00C0 | 5F07 | 735F | 6174 |
| 0001566360 | 6B63 | 040E | FFDC | 0081 | 5F08 | 725F | 7465 | 6176 |
| 0001566400 | 0D6C | FA04 | E5FF | 0704 | 7374 | 5F74 | 7470 | 0872 |
| 0001566420 | F004 | 81FF | 0200 | 7473 | 050E | 07F2 | 000B | 0327 |
| 0001566440 | 5F06 | 665F | 6E75 | 0163 | 0502 | 000D | 1A00 | 0F00 |
| 0001566460 | 5805 | 0B07 | C000 | 0700 | 5F42 | 4678 | 6C69 | 0F65 |
| 0001566500 | 5C05 | 0B07 | C000 | 0700 | 5F42 | 5078 | 6361 | 146B |

THU MAR 14 17:31:54 1991 DB_PI.DLL PAGE 379, LINE 22303

| | | | | | | | | |
|---|---|---|---|---|---|---|---|---|
| 0001566520 | 0005 | 0000 | 8100 | 0C00 | 7842 | 445F | 6265 | 6775 |
| 0001566540 | 6F4D | 6564 | 0514 | 0000 | 0000 | 0081 | 420C | 5F78 |
| 0001566560 | 6954 | 656D | 4D73 | 646F | 0565 | 0111 | 0000 | 1B00 |
| 0001566600 | AC01 | AAAD | E805 | 1605 | DA00 | 0005 | 0400 | 640C |
| 0001566620 | 5F62 | 6C61 | 6F6C | 5F63 | 6D69 | 0C67 | 1004 | 8600 |
| 0001566640 | 0600 | 7374 | 5F74 | 6469 | 040E | 000E | 0085 | 7308 |
| 0001566660 | 6769 | 735F | 7A69 | 0F65 | 0A04 | 8200 | 0900 | 7462 |
| 0001566700 | 706D | 735F | 7A69 | 1265 | 0604 | 1E00 | 0C04 | 6D69 |
| 0001566720 | 5F67 | 6468 | 5F72 | 6170 | 7264 | 040C | FFF6 | 00C0 |
| 0001566740 | 5F06 | 745F | 7079 | 0F65 | EA04 | 85FF | 0900 | 5F5F |
| 0001566760 | 7862 | 745F | 7079 | 0D65 | DA04 | 66FF | 0702 | 5F5F |
| 0001567000 | 7270 | 6E69 | 0B74 | D204 | 02FF | 0502 | 5F5F | 766C |
| 0001567020 | 0D6C | DE04 | AEFF | 0705 | 5F5F | 6C63 | 636F | 0D6B |
| 0001567040 | F204 | C0FF | 0700 | 5F5F | 7473 | 6361 | 0E6B | D804 |
| 0001567060 | 81FF | 0800 | 5F5F | 6572 | 7674 | 6C61 | 0410 | FFCE |
| 0001567100 | 0082 | 740A | 746F | 6C61 | 735F | 7A69 | 0D65 | FA04 |
| 0001567120 | 0CFF | 0705 | 7374 | 5F74 | 7470 | 1072 | EE04 | 82FF |
| 0001567140 | 0A00 | 6C61 | 6F6C | 5F63 | 6973 | 657A | 0408 | FFEC |
| 0001567160 | 0081 | 7302 | 0E74 | 2405 | 0B08 | 5300 | 0603 | 5F5F |
| 0001567200 | 7566 | 636E | 0201 | 011D | B394 | 05B0 | 0790 | 0016 |
| 0001567220 | 0782 | 0000 | 0E04 | 6264 | 725F | 6165 | 6C6C | 636F |
| 0001567240 | 695F | 676D | 040C | 0014 | 0086 | 7406 | 7473 | 695F |
| 0001567260 | 1164 | 1004 | 1F00 | 0B04 | 6C6F | 5F64 | 6D69 | 5F67 |
| 0001567300 | 7470 | 1272 | 0E04 | 8500 | 0C00 | 656E | 5F77 | 6973 |
| 0001567320 | 5F67 | 6973 | 657A | 0413 | 000A | 0082 | 6E0D | 7765 |
| 0001567340 | 625F | 6D74 | 5F70 | 6973 | 657A | 0412 | 0006 | 041E |
| 0001567360 | 6E0C | 7765 | 695F | 676D | 705F | 6461 | 0C72 | F604 |
| 0001567400 | C0FF | 0600 | 5F5F | 7974 | 6570 | 040F | FFE6 | 0085 |
| 0001567420 | 5F09 | 625F | 5F78 | 7974 | 6570 | 040D | FFD6 | 0266 |
| 0001567440 | 5F07 | 705F | 6972 | 746E | 040B | FFCA | 0202 | 5F05 |
| 0001567460 | 6C5F | 6C76 | 040D | FFDA | 05AE | 5F07 | 635F | 6F6C |
| 0001567500 | 6B63 | 040D | FFF2 | 00C0 | 5F07 | 735F | 6174 | 6B63 |
| 0001567520 | 040E | FFD0 | 0081 | 5F08 | 725F | 7465 | 6176 | 146C |
| 0001567540 | D204 | 82FF | 0E00 | 6C6F | 5F64 | 6F74 | 6174 | 5F6C |
| 0001567560 | 6973 | 657A | 0414 | FFE8 | 0082 | 6E0E | 7765 | 745F |
| 0001567600 | 746F | 6C61 | 735F | 7A69 | 0D65 | FA04 | 0CFF | 0705 |
| 0001567620 | 7374 | 5F74 | 7470 | 1072 | EE04 | 82FF | 0A00 | 6C61 |
| 0001567640 | 6F6C | 5F63 | 6973 | 657A | 0408 | FFEC | 0081 | 7302 |
| 0001567660 | 0E74 | 4005 | 0B08 | B200 | 0605 | 5F5F | 7566 | 636E |
| 0001567700 | 0201 | 011A | BB24 | 05B4 | 0269 | 0016 | 025B | 0000 |
| 0001567720 | 0B04 | 6264 | [illegible]5F | 6572 | 5F65 | 6D69 | 0C67 | 0A04 |
| 0001567740 | 8600 | 0600 | 7374 | 5F74 | 6469 | 0411 | 0006 | 041F |
| 0001567760 | 690B | 676D | 685F | 7264 | 705F | 7274 | 040C | FFF6 |
| 0001570000 | 00C0 | 5F06 | 745F | 7079 | 0F65 | EE04 | 85FF | 0900 |
| 0001570020 | 5F5F | 7862 | 745F | 7079 | 0D65 | DE04 | 66FF | 0702 |
| 0001570040 | 5F5F | 7270 | 6E69 | 0B74 | D604 | 02FF | 0502 | 5F5F |
| 0001570060 | 766C | 0D6C | E204 | AEFF | 0705 | 5F5F | 6C63 | 636F |
| 0001570100 | 0D6B | F204 | C0FF | 0700 | 5F5F | 7473 | 6361 | 0E6B |
| 0001570120 | DC04 | 81FF | 0800 | 5F5F | 6572 | 7674 | 6C61 | 040D |
| 0001570140 | FFFA | 050C | 7407 | 7473 | 705F | 7274 | 0408 | FFF0 |
| 0001570160 | 0081 | 7302 | 0E74 | 5E05 | 0B08 | 8700 | 0603 | 5F5F |
| 0001570200 | 7566 | 636E | 0201 | 0119 | BD8D | 05B7 | 0827 | 0016 |
| 0001570220 | 0819 | 0000 | 0A04 | 6264 | 615F | 6464 | 695F | 676D |
| 0001570240 | 040C | 0014 | 0086 | 7406 | 7473 | 695F | 1164 | 1004 |
| 0001570260 | 1F00 | 0B04 | 6D69 | 5F67 | 6468 | 5F72 | 7470 | 1172 |
| 0001570300 | 0E04 | 8100 | 0B00 | 7263 | 6165 | 6574 | 6D5F | 646F |
| 0001570320 | 1065 | 0C04 | 8500 | 0A00 | 6162 | 6B63 | 7267 | 756F |
| 0001570340 | 646E | 040E | 000A | 0081 | 6308 | 6D6F | 7270 | 7365 |
| 0001570360 | 1073 | 0604 | C600 | 0A00 | 6D69 | 5F67 | 6469 | 615F |

THU MAR 14 17:31:54 1991 DB_PI.DLL PAGE 380, LINE 22362

| | | | | | | | | |
|---|---|---|---|---|---|---|---|---|
| 0001570400 | 7264 | 040C | FFF6 | 00C0 | 5F06 | 745F | 7079 | 0F65 |
| 0001570420 | 3804 | 85FF | 0900 | 5F5F | 7862 | 745F | 7079 | 0D65 |
| 0001570440 | 2804 | 66FF | 0702 | 5F5F | 7270 | 6E69 | 0B74 | 2004 |
| 0001570460 | 02FF | 0502 | 5F5F | 766C | 0D6C | 2C04 | AEFF | 0705 |
| 0001570500 | 5F5F | 6C63 | 636F | 0D6B | F204 | C0FF | 0700 | 5F5F |
| 0001570520 | 7473 | 6361 | 0E6B | 2604 | 81FF | 0800 | 5F5F | 6572 |
| 0001570540 | 7674 | 6C61 | 040F | FF3A | 0081 | 6909 | 676D | 655F |
| 0001570560 | 6978 | 7473 | 0411 | FF3C | 0411 | 6F0B | 646C | 695F |
| 0001570600 | 676D | 685F | 7264 | 040D | FFFA | 050C | 7407 | 7473 |
| 0001570620 | 705F | 7274 | 0408 | FFF0 | 0081 | 7302 | 0E74 | 7805 |
| 0001570640 | 0B08 | B900 | 0605 | 5F5F | 7566 | 636E | 0201 | 011C |
| 0001570660 | C5B4 | 05BB | 0550 | 0016 | 0542 | 0000 | 0D04 | 6264 |
| 0001570700 | 615F | 6363 | 7365 | 5F73 | 6D69 | 0C67 | 1604 | 8600 |
| 0001570720 | 0600 | 7374 | 5F74 | 6469 | 040E | 0012 | 00C0 | 6908 |
| 0001570740 | 676D | 6E5F | 6D61 | 0E65 | 1004 | 8100 | 0800 | 6D69 |
| 0001570760 | 5F67 | 7974 | 6570 | 040C | 000C | 0086 | 6906 | 676D |
| 0001571000 | 695F | 1164 | 0A04 | 8100 | 0B00 | 6361 | 6563 | 7373 |
| 0001571020 | 6D5F | 646F | 1265 | 0604 | 1E00 | 0C04 | 6D69 | 5F67 |
| 0001571040 | 6468 | 5F72 | 6170 | 7264 | 040C | FFF6 | 00C0 | 5F06 |
| 0001571060 | 745F | 7079 | 0F65 | E604 | 85FF | 0900 | 5F5F | 7862 |
| 0001571100 | 745F | 7079 | 0D65 | 0204 | 66FF | 0702 | 5F5F | 7270 |
| 0001571120 | 6E69 | 0B74 | FA04 | 02FE | 0502 | 5F5F | 766C | 0D6C |
| 0001571140 | 2604 | AEFF | 0705 | 5F5F | 6C63 | 636F | 0D6B | F204 |
| 0001571160 | C0FF | 0700 | 5F5F | 7473 | 6361 | 0E6B | 0004 | 81FF |
| 0001571200 | 0800 | 5F5F | 6572 | 7674 | 6C61 | 0411 | FF32 | 0411 |
| 0001571220 | 740B | 706D | 695F | 676D | 685F | 7264 | 0413 | FDFA |
| 0001571240 | 04A0 | 660D | 6C69 | 5F65 | 6170 | 6874 | 616E | 656D |
| 0001571260 | 040D | FFFA | 050C | 7407 | 7473 | 705F | 7274 | 0410 |
| 0001571300 | FF06 | 0358 | 6C0A | 7261 | 6567 | 6E5F | 6D61 | 1165 |
| 0001571320 | E804 | C4FF | 0B00 | 6D74 | 5F70 | 6973 | 5F67 | 7470 |
| 0001571340 | 1272 | EC04 | E4FF | 0C00 | 6D74 | 5F70 | 7462 | 706D |
| 0001571360 | 705F | 7274 | 0408 | FFF0 | 0081 | 7302 | 0E74 | 9405 |
| 0001571400 | 0B08 | BD00 | 0605 | 5F5F | 7566 | 636E | 0201 | 011D |
| 0001571420 | CB04 | 05C0 | 0521 | 0016 | 0513 | 0000 | 0E04 | 6264 |
| 0001571440 | 725F | 6C65 | 6165 | 6573 | 695F | 676D | 040C | 0010 |
| 0001571460 | 0086 | 7406 | 7473 | 695F | 1164 | 0C04 | 1F00 | 0B04 |
| 0001571500 | 6D69 | 5F67 | 6468 | 5F72 | 7470 | 0F72 | 0A04 | 8500 |
| 0001571520 | 0900 | 6173 | 6576 | 665F | 616C | 1067 | 0804 | 8500 |
| 0001571540 | 0A00 | 6162 | 6B63 | 7267 | 756F | 646E | 040E | 0006 |
| 0001571560 | 0081 | 6308 | 6D6F | 7270 | 7365 | 0C73 | F604 | C0FF |
| 0001571600 | 0600 | 5F5F | 7974 | 6570 | 040F | FFEA | 0085 | 5F09 |
| 0001571620 | 625F | 5F78 | 7974 | 6570 | 040D | FFDA | 0266 | 5F07 |
| 0001571640 | 705F | 6972 | 746E | 040B | FFD2 | 0202 | 5F05 | 6C5F |
| 0001571660 | 6C76 | 040D | FFDE | 05AE | 5F07 | 635F | 6F6C | 6B63 |
| 0001571700 | 040D | FFF2 | 00C0 | 5F07 | 735F | 6174 | 6B63 | 040E |
| 0001571720 | FFD8 | 0081 | 5F08 | 725F | 7465 | 6176 | 0D6C | FA04 |
| 0001571740 | 0CFF | 0705 | 7374 | 5F74 | 7470 | 0872 | F004 | 81FF |
| 0001571760 | 0200 | 7473 | 040E | FFEC | 0086 | 6408 | 6D75 | 796D |
| 0001572000 | 695F | 0E64 | B005 | 0B08 | B200 | 0605 | 5F5F | 7566 |
| 0001572020 | 636E | 0201 | 011C | D025 | 05C2 | 037D | 0016 | 036F |
| 0001572040 | 0000 | 0D04 | 6264 | 645F | 6C65 | 7465 | 5F65 | 6D69 |
| 0001572060 | 0C67 | 1004 | 8600 | 0600 | 7374 | 5F74 | 6469 | 040E |
| 0001572100 | 000C | 00C0 | 6908 | 676D | 6E5F | 6D61 | 0E65 | 0A04 |
| 0001572120 | 8100 | 0800 | 6D69 | 5F67 | 7974 | 6570 | 040C | 0006 |
| 0001572140 | 0086 | 6906 | 676D | 695F | 0C64 | F604 | C0FF | 0600 |
| 0001572160 | 5F5F | 7974 | 6570 | 040F | FFEE | 0085 | 5F09 | 625F |
| 0001572200 | 5F78 | 7974 | 6570 | 040D | FF0A | 0266 | 5F07 | 705F |
| 0001572220 | 6972 | 746E | 040B | FF02 | 0202 | 5F05 | 6C5F | 6C76 |
| 0001572240 | 040D | FF2E | 05AE | 5F07 | 635F | 6F6C | 6B63 | 040D |

THU MAR 14 17:31:54 1991 DB_PI.DLL PAGE 381, LINE 22421

| | | | | | | | | |
|---|---|---|---|---|---|---|---|---|
| 0001572260 | FFF2 | 00C0 | 5F07 | 735F | 6174 | 6B63 | 040E | FF08 |
| 0001572300 | 0081 | 5F08 | 725F | 7465 | 6176 | 116C | 3A04 | 11FF |
| 0001572320 | 0B04 | 6D74 | 5F70 | 6D69 | 5F67 | 6468 | 0D72 | FA04 |
| 0001572340 | 0CFF | 0705 | 7374 | 5F74 | 7470 | 1072 | 0E04 | 58FF |
| 0001572360 | 0A03 | 616C | 6772 | 5F65 | 616E | 656D | 0408 | FFF0 |
| 0001572400 | 0081 | 7302 | 0E74 | CE05 | 0B08 | BD00 | 0605 | 5F5F |
| 0001572420 | 7566 | 636E | 0201 | 011B | D3A2 | 05C4 | 02B0 | 0016 |
| 0001572440 | 02A2 | 0000 | 0C04 | 6264 | 6C5F | 7369 | 5F74 | 6D69 |
| 0001572460 | 7367 | 040C | 0012 | 0086 | 7406 | 7473 | 695F | 0E64 |
| 0001572500 | 1004 | 8100 | 0800 | 6D69 | 5F67 | 7974 | 6570 | 0410 |
| 0001572520 | 000E | 0081 | 6C0A | 7369 | 5F74 | 726F | 6564 | 1172 |
| 0001572540 | 0A04 | C500 | 0B00 | 736C | 5F74 | 6E63 | 5F74 | 6461 |
| 0001572560 | 1272 | 0604 | 2E00 | 0C04 | 6264 | 6B6C | 6C5F | 7473 |
| 0001572600 | 615F | 7264 | 040C | FFF6 | 00C0 | 5F06 | 745F | 7079 |
| 0001572620 | 0F65 | EE04 | 85FF | 0900 | 5F5F | 7862 | 745F | 7079 |
| 0001572640 | 0D65 | DE04 | 66FF | 0702 | 5F5F | 7270 | 6E69 | 0B74 |
| 0001572660 | D604 | 02FF | 0502 | 5F5F | 766C | 0D6C | E204 | AEFF |
| 0001572700 | 0705 | 5F5F | 6C63 | 636F | 0D6B | F204 | C0FF | 0700 |
| 0001572720 | 5F5F | 7473 | 6361 | 0E6B | DC04 | 81FF | 0800 | 5F5F |
| 0001572740 | 6572 | 7674 | 6C61 | 040D | FFFA | 050C | 7407 | 7473 |
| 0001572760 | 705F | 7274 | 0408 | FFF0 | 0081 | 7302 | 0E74 | EA05 |
| 0001573000 | 0B08 | 5300 | 0603 | 5F5F | 7566 | 636E | 0201 | 0123 |
| 0001573020 | D652 | 05C6 | 05AB | 0016 | 059D | 0000 | 1404 | 6264 |
| 0001573040 | 675F | 6E65 | 7265 | 7461 | 5F65 | 6D69 | 5F67 | 616E |
| 0001573060 | 656D | 040C | 0010 | 0086 | 7406 | 7473 | 695F | 0E64 |
| 0001573100 | 0E04 | 8100 | 0800 | 6D69 | 5F67 | 7974 | 6570 | 0410 |
| 0001573120 | 000A | 00C0 | 700A | 6572 | 6966 | 5F78 | 7470 | 0E72 |
| 0001573140 | 0604 | C000 | 0800 | 616E | 656D | 705F | 7274 | 0410 |
| 0001573160 | FEE0 | 0085 | 700A | 6572 | 6966 | 5F78 | 656C | 0E6E |
| 0001573200 | F804 | 81FE | 0800 | 6468 | 5F72 | 6973 | 657A | 040E |
| 0001573220 | FF1C | 0081 | 7008 | 736F | 5F74 | 756E | 076D | F604 |
| 0001573240 | 81FE | 0100 | 0A69 | F204 | 81FE | 0400 | 6574 | 736E |
| 0001573260 | 0408 | FF1A | 0081 | 7302 | 0C74 | F604 | C0FF | 0600 |
| 0001573300 | 5F5F | 7974 | 6570 | 040F | FEF4 | 0085 | 5F09 | 625F |
| 0001573320 | 5F78 | 7974 | 6570 | 040D | FEE2 | 0266 | 5F07 | 705F |
| 0001573340 | 6972 | 746E | 040B | FED8 | 0202 | 5F05 | 6C5F | 6C76 |
| 0001573360 | 040D | FEE6 | 05AE | 5F07 | 635F | 6F6C | 6B63 | 040D |
| 0001573400 | FF1E | 00C0 | 5F07 | 735F | 6174 | 6B63 | 040E | FEDE |
| 0001573420 | 0081 | 5F08 | 725F | 7465 | 6176 | 0D6C | FA04 | 0CFF |
| 0001573440 | 0705 | 7374 | 5F74 | 7470 | 0E72 | D604 | 58FF | 0803 |
| 0001573460 | 6D74 | 5F70 | 616E | 656D | 040E | FEFA | 0358 | 7008 |
| 0001573500 | 6572 | 6E5F | 6D61 | 0D65 | 2204 | 11FF | 0704 | 6D69 |
| 0001573520 | 5F67 | 7470 | 0E72 | 2405 | 0B09 | C800 | 0605 | 5F5F |
| 0001573540 | 7566 | 636E | 0201 | 011D | DBFD | 05CB | 047D | 0016 |
| 0001573560 | 046F | 0000 | 0E04 | 6264 | 675F | 7465 | 695F | 676D |
| 0001573600 | 685F | 7264 | 040C | 0014 | 0086 | 7406 | 7473 | 695F |
| 0001573620 | 0E64 | 1004 | C000 | 0800 | 6D69 | 5F67 | 616E | 656D |
| 0001573640 | 040E | 000E | 0081 | 6908 | 676D | 745F | 7079 | 0C65 |
| 0001573660 | 0A04 | 8600 | 0600 | 6D69 | 5F67 | 6469 | 0411 | 0006 |
| 0001573700 | 041F | 690B | 676D | 685F | 7264 | 705F | 7274 | 040C |
| 0001573720 | FFF6 | 00C0 | 5F06 | 745F | 7079 | 0F65 | CE04 | 85FF |
| 0001573740 | 0900 | 5F5F | 7862 | 745F | 7079 | 0D65 | BE04 | 66FF |
| 0001573760 | 0702 | 5F5F | 7270 | 6E69 | 0B74 | B604 | 02FF | 0502 |
| 0001574000 | 5F5F | 766C | 0D6C | C204 | AEFF | 0705 | 5F5F | 6C63 |
| 0001574020 | 636F | 0D6B | D204 | C0FF | 0700 | 5F5F | 7473 | 6361 |
| 0001574040 | 0E6B | BC04 | 81FF | 0800 | 5F5F | 6572 | 7674 | 6C61 |
| 0001574060 | 0408 | FFD0 | 0081 | 7302 | 1374 | D604 | 58FF | 0D03 |
| 0001574100 | 7274 | 6E75 | 5F63 | 6D69 | 5F67 | 616E | 0D6D | FA04 |
| 0001574120 | 0CFF | 0705 | 7374 | 5F74 | 7470 | 0E72 | 4805 | 0B09 |

THU MAR 14 17:31:54 1991 DB_PI.DLL PAGE 382, LINE 22480

| | | | | | | | | |
|---|---|---|---|---|---|---|---|---|
| 0001574140 | B200 | 0605 | 5F5F | 7566 | 636E | 0201 | 011D | E07A |
| 0001574160 | 05CD | 0999 | 0016 | 098B | 0000 | 0E04 | 6264 | 735F |
| 0001574200 | 7465 | 695F | 676D | 685F | 7264 | 040C | 000A | 0086 |
| 0001574220 | 7406 | 7473 | 695F | 1164 | 0604 | 1F00 | 0B04 | 6D69 |
| 0001574240 | 5F67 | 6468 | 5F72 | 7470 | 0C72 | F604 | C0FF | 0600 |
| 0001574260 | 5F5F | 7974 | 6570 | 040F | FFEE | 0085 | 5F09 | 625F |
| 0001574300 | 5F78 | 7974 | 6570 | 040D | FFDA | 0266 | 5F07 | 705F |
| 0001574320 | 6972 | 746E | 040B | FFD2 | 0202 | 5F05 | 6C5F | 6C76 |
| 0001574340 | 040D | FFDE | 05AE | 5F07 | 635F | 6F6C | 6B63 | 040D |
| 0001574360 | FFF2 | 00C0 | 5F07 | 735F | 6174 | 6B63 | 040E | FFD8 |
| 0001574400 | 0081 | 5F08 | 725F | 7465 | 6176 | 0D6C | FA04 | 0CFF |
| 0001574420 | 0705 | 7374 | 5F74 | 7470 | 1172 | EA04 | 1FFF | 0B04 |
| 0001574440 | 6D74 | 5F70 | 6D69 | 5F67 | 6468 | 0E72 | D004 | 85FF |
| 0001574460 | 0800 | 6468 | 5F72 | 6E6F | 796C | 0408 | FFF0 | 0081 |
| 0001574500 | 7302 | 0E74 | 6605 | 0B09 | B200 | 0605 | 5F5F | 7566 |
| 0001574520 | 636E | 0201 | 011D | EA13 | 05CF | 02CB | 0016 | 02BD |
| 0001574540 | 0000 | 0E04 | 6264 | 735F | 7465 | 695F | 676D | 725F |
| 0001574560 | 6665 | 040C | 0016 | 0086 | 7406 | 7473 | 695F | 0E64 |
| 0001574600 | 1204 | C000 | 0800 | 6D69 | 5F67 | 616E | 656D | 040E |
| 0001574620 | 0010 | 0081 | 6908 | 676D | 745F | 7079 | 0C65 | 0C04 |
| 0001574640 | 8600 | 0600 | 6D69 | 5F67 | 6469 | 040F | 0008 | 0086 |
| 0001574660 | 7209 | 6665 | 745F | 5F63 | 6469 | 0412 | 0006 | 0085 |
| 0001574700 | 720C | 6665 | 6C5F | 6E69 | 5F65 | 756E | 0F6D | F204 |
| 0001574720 | 85FF | 0900 | 5F5F | 7862 | 745F | 7079 | 0D65 | 2E04 |
| 0001574740 | 66FF | 0702 | 5F5F | 7270 | 6E69 | 0B74 | 2604 | 02FF |
| 0001574760 | 0502 | 5F5F | 766C | 0D6C | 3204 | AEFF | 0705 | 5F5F |
| 0001575000 | 6C63 | 636F | 0D6B | F604 | C0FF | 0700 | 5F5F | 7473 |
| 0001575020 | 6361 | 0E6B | 2C04 | 81FF | 0800 | 5F5F | 6572 | 7674 |
| 0001575040 | 6C61 | 0408 | FFF4 | 0081 | 7302 | 0D74 | 3E04 | 11FF |
| 0001575060 | 0704 | 6D69 | 5F67 | 6468 | 0C72 | FA04 | C0FF | 0600 |
| 0001575100 | 5F5F | 7974 | 6570 | 050E | 0984 | 000B | 05B2 | 5F06 |
| 0001575120 | 665F | 6E75 | 0163 | 2102 | DE01 | D1EC | 0E05 | 1606 |
| 0001575140 | 000D | 0006 | 0400 | 6412 | 5F62 | 7263 | 6165 | 6574 |
| 0001575160 | 735F | 6E79 | 5F63 | 6D69 | 0C67 | 0E04 | 8600 | 0600 |
| 0001575200 | 7374 | 5F74 | 6469 | 0411 | 000A | 041F | 690B | 676D |
| 0001575220 | 685F | 7264 | 705F | 7274 | 0410 | 0006 | 00C6 | 690A |
| 0001575240 | 676D | 695F | 5F64 | 6461 | 0C72 | F604 | C0FF | 0600 |
| 0001575260 | 5F5F | 7974 | 6570 | 040F | FFEE | 0085 | 5F09 | 625F |
| 0001575300 | 5F78 | 7974 | 6570 | 040D | FFDE | 0266 | 5F07 | 705F |
| 0001575320 | 6972 | 746E | 040B | FFD6 | 0202 | 5F05 | 6C5F | 6C76 |
| 0001575340 | 040D | FFE2 | 05AE | 5F07 | 635F | 6F6C | 6B63 | 040D |
| 0001575360 | FFF2 | 00C0 | 5F07 | 735F | 6174 | 6B63 | 040E | FFDC |
| 0001575400 | 0081 | 5F08 | 725F | 7465 | 6176 | 0D6C | FA04 | 0CFF |
| 0001575420 | 0705 | 7374 | 5F74 | 7470 | 0872 | F004 | 81FF | 0200 |
| 0001575440 | 7473 | 050E | 09A2 | 000B | 05D3 | 5F06 | 665F | 6E75 |
| 0001575460 | 0163 | 0502 | 000D | 1A00 | 0F00 | 1C05 | 0B08 | C000 |
| 0001575500 | 0700 | 5F42 | 4678 | 6C69 | 0F65 | 2005 | 0B08 | C000 |
| 0001575520 | 0700 | 5F42 | 5078 | 6361 | 146B | 0005 | 0000 | 8100 |
| 0001575540 | 0C00 | 7842 | 445F | 6265 | 6775 | 6F4D | 6564 | 0514 |
| 0001575560 | 0000 | 0000 | 0081 | 420C | 5F78 | 6954 | 656D | 4D73 |
| 0001575600 | 646F | 0565 | 0211 | 0000 | 1C00 | 0001 | A000 | 9805 |
| 0001575620 | 1603 | 8A00 | 0003 | 0400 | 640D | 5F62 | 6C61 | 6F6C |
| 0001575640 | 5F63 | 6369 | 6E6F | 040F | 000C | 0085 | 6209 | 6D74 |
| 0001575660 | 5F70 | 6973 | 657A | 0415 | 000A | 0085 | 640F | 7365 |
| 0001575700 | 7263 | 7069 | 6F74 | 5F72 | 6973 | 657A | 0413 | 0006 |
| 0001575720 | 0452 | 690D | 6F63 | 5F6E | 6468 | 5F72 | 6170 | 7264 |
| 0001575740 | 040C | FFFA | 00C0 | 5F06 | 745F | 7079 | 0F65 | F404 |
| 0001575760 | 85FF | 0900 | 5F5F | 7862 | 745F | 7079 | 0D65 | E404 |
| 0001576000 | 66FF | 0702 | 5F5F | 7270 | 6E69 | 0B74 | DC04 | 02FF |

THU MAR 14 17:31:54 1991 DB_PI.DLL PAGE 383, LINE 22539

| | | | | | | | | |
|---|---|---|---|---|---|---|---|---|
| 0001576020 | 0502 | 5F5F | 766C | 0D6C | E804 | A5FF | 0705 | 5F5F |
| 0001576040 | 6C63 | 636F | 0D6B | F604 | C0FF | 0700 | 5F5F | 7473 |
| 0001576060 | 6361 | 0E6B | E204 | 81FF | 0800 | 5F5F | 6572 | 7674 |
| 0001576100 | 6C61 | 0410 | FFD8 | 0086 | 740A | 746F | 6C61 | 735F |
| 0001576120 | 7A69 | 0E65 | DC05 | 0B09 | A300 | 0605 | 5F5F | 7566 |
| 0001576140 | 636E | 0201 | 011B | 0398 | 05A7 | 014D | 0016 | 013F |
| 0001576160 | 0000 | 0C04 | 6264 | 665F | 6572 | 5F65 | 6369 | 6E6F |
| 0001576200 | 0412 | 0006 | 0453 | 690C | 6F63 | 5F6E | 6468 | 5F72 |
| 0001576220 | 7470 | 0C72 | FA04 | C0FF | 0600 | 5F5F | 7974 | 6570 |
| 0001576240 | 040F | FFF4 | 0085 | 5F09 | 625F | 5F78 | 7974 | 6570 |
| 0001576260 | 040D | FFE4 | 0266 | 5F07 | 705F | 6972 | 746E | 040B |
| 0001576300 | FFDC | 0202 | 5F05 | 6C5F | 6C76 | 040D | FFE8 | 05A5 |
| 0001576320 | 5F07 | 635F | 6F6C | 6B63 | 040D | FFF6 | 00C0 | 5F07 |
| 0001576340 | 735F | 6174 | 6B63 | 040E | FFE2 | 0081 | 5F08 | 725F |
| 0001576360 | 7465 | 6176 | 0E6C | F805 | 0B09 | 5300 | 0603 | 5F5F |
| 0001576400 | 7566 | 636E | 0201 | 011A | 04E5 | 05AA | 049E | 0016 |
| 0001576420 | 0490 | 0000 | 0B04 | 6264 | 615F | 6464 | 695F | 6F63 |
| 0001576440 | 0C6E | 0C04 | 8600 | 0600 | 696C | 5F62 | 6469 | 0412 |
| 0001576460 | 0008 | 0453 | 690C | 6F63 | 5F6E | 6468 | 5F72 | 7470 |
| 0001576500 | 0F72 | 0604 | 8500 | 0900 | 766F | 7265 | 7277 | 7469 |
| 0001576520 | 0C65 | FA04 | C0FF | 0600 | 5F5F | 7974 | 6570 | 040F |
| 0001576540 | FFEE | 0085 | 5F09 | 625F | 5F78 | 7974 | 6570 | 040D |
| 0001576560 | FFDE | 0266 | 5F07 | 705F | 6972 | 746E | 040B | FFD6 |
| 0001576600 | 0202 | 5F05 | 6C5F | 6C76 | 040D | FFE2 | 05A5 | 5F07 |
| 0001576620 | 635F | 6F6C | 6B63 | 040D | FFF6 | 00C0 | 5F07 | 735F |
| 0001576640 | 6174 | 6B63 | 040E | FFDC | 0081 | 5F08 | 725F | 7465 |
| 0001576660 | 6176 | 0D6C | F004 | ACFF | 0704 | 6274 | 5F6C | 7470 |
| 0001576700 | 0872 | F404 | 81FF | 0200 | 7473 | 050E | 0A14 | 000B |
| 0001576720 | 0387 | 5F06 | 665F | 6E75 | 0163 | 1D02 | 8301 | AD09 |
| 0001576740 | A705 | 1603 | 9900 | 0003 | 0400 | 640E | 5F62 | 6564 |
| 0001576760 | 656C | 6574 | 695F | 6F63 | 0C6E | 0A04 | 8600 | 0600 |
| 0001577000 | 696C | 5F62 | 6469 | 040F | 0006 | 00C0 | 6909 | 6F63 |
| 0001577020 | 5F6E | 616E | 656D | 040C | FFDA | 00C0 | 5F06 | 745F |
| 0001577040 | 7079 | 0F65 | CE04 | 85FF | 0900 | 5F5F | 7862 | 745F |
| 0001577060 | 7079 | 0D65 | BE04 | 66FF | 0702 | 5F5F | 7270 | 6E69 |
| 0001577100 | 0B74 | B604 | 02FF | 0502 | 5F5F | 766C | 0D6C | C204 |
| 0001577120 | A5FF | 0705 | 5F5F | 6C63 | 636F | 0D6B | D604 | C0FF |
| 0001577140 | 0700 | 5F5F | 7473 | 6361 | 0E6B | BC04 | 81FF | 0800 |
| 0001577160 | 5F5F | 6572 | 7674 | 6C61 | 040D | FFD0 | 04AC | 7407 |
| 0001577200 | 6C62 | 705F | 7274 | 0410 | FFDE | 0358 | 760A | 6C61 |
| 0001577220 | 6469 | 6E5F | 6D61 | 0865 | D404 | 81FF | 0200 | 7473 |
| 0001577240 | 050E | 0A2E | 000B | 05AF | 5F06 | 665F | 6E75 | 0163 |
| 0001577260 | 2402 | 2A01 | B10D | E805 | 1000 | DD00 | 0000 | 0400 |
| 0001577300 | 6415 | 5F62 | 6567 | 5F74 | 6369 | 6E6F | 745F | 6C62 |
| 0001577320 | 6E5F | 685F | 7264 | 040C | 0006 | 0086 | 6C06 | 6269 |
| 0001577340 | 695F | 0F64 | 0A04 | C000 | 0900 | 6369 | 6E6F | 6E5F |
| 0001577360 | 6D61 | 1165 | 0E04 | 8400 | 0B05 | 6274 | 5F6C | 7470 |
| 0001577400 | 5F72 | 6461 | 1272 | 1204 | 5300 | 0C04 | 6369 | 6E6F |
| 0001577420 | 685F | 7264 | 705F | 7274 | 0410 | FFDE | 0358 | 760A |
| 0001577440 | 6C61 | 6469 | 6E5F | 6D61 | 0A65 | DA04 | 85FF | 0400 |
| 0001577460 | 6973 | 657A | 0408 | FFDC | 0081 | 7302 | 0174 | 1A02 |
| 0001577500 | 1201 | B30E | 8705 | 1604 | 7900 | 0004 | 0400 | 640B |
| 0001577520 | 5F62 | 6567 | 5F74 | 6369 | 6E6F | 040C | 000E | 0086 |
| 0001577540 | 6C06 | 6269 | 695F | 0F64 | 0A04 | C000 | 0900 | 6369 |
| 0001577560 | 6E6F | 6E5F | 6D61 | 1365 | 0604 | 5200 | 0D04 | 6369 |
| 0001577600 | 6E6F | 685F | 7264 | 705F | 6461 | 0C72 | FA04 | C0FF |
| 0001577620 | 0600 | 5F5F | 7974 | 6570 | 040F | FF42 | 0085 | 5F09 |
| 0001577640 | 625F | 5F78 | 7974 | 6570 | 040D | FF30 | 0266 | 5F07 |
| 0001577660 | 705F | 6972 | 746E | 040B | FF28 | 0202 | 5F05 | 6C5F |

THU MAR 14 17:31:54 1991 DB_PI.DLL PAGE 384, LINE 22598

| | | | | | | | | |
|---|---|---|---|---|---|---|---|---|
| 0001577700 | 6C76 | 040D | FF36 | 05A5 | 5F07 | 635F | 6F6C | 6B63 |
| 0001577720 | 040D | FFF6 | 00C0 | 5F07 | 735F | 6174 | 6B63 | 040E |
| 0001577740 | FF2E | 0081 | 5F08 | 725F | 7465 | 6176 | 0D6C | 4404 |
| 0001577760 | ACFF | 0704 | 6274 | 5F6C | 7470 | 0E72 | 4A04 | 4DFF |
| 0001600000 | 0804 | 6369 | 6E6F | 685F | 7264 | 040A | FF34 | 0085 |
| 0001600020 | 7304 | 7A69 | 0865 | 4804 | 81FF | 0200 | 7473 | 050E |
| 0001600040 | 0A4C | 000E | υ387 | 5F06 | 665F | 6E75 | 0163 | 1E02 |
| 0001600060 | 9901 | B512 | 6505 | 1602 | 5700 | 0002 | 0400 | 640F |
| 0001600100 | 5F62 | 6567 | 5F74 | 6369 | 6E6F | 685F | 7264 | 040C |
| 0001600120 | 000E | 0086 | 6C06 | 6269 | 695F | 0F64 | 0A04 | C000 |
| 0001600140 | 0900 | 6369 | 6E6F | 6E5F | 6D61 | 1265 | 0604 | 5300 |
| 0001600160 | 0C04 | 6369 | 6E6F | 685F | 7264 | 705F | 7274 | 040C |
| 0001600200 | FFFA | 00C0 | 5F06 | 745F | 7079 | 0F65 | EE04 | 85FF |
| 0001600220 | 0900 | 5F5F | 7862 | 745F | 7079 | 0D65 | DE04 | 66FF |
| 0001600240 | 0702 | 5F5F | 7270 | 6E69 | 0B74 | D604 | 02FF | 0502 |
| 0001600260 | 5F5F | 766C | 0D6C | E204 | A5FF | 0705 | 5F5F | 6C63 |
| 0001600300 | 636F | 0D6B | F604 | C0FF | 0700 | 5F5F | 7473 | 6361 |
| 0001600320 | 0E6B | DC04 | 81FF | 0800 | 5F5F | 6572 | 7674 | 6C61 |
| 0001600340 | 040D | FFF0 | 04AC | 7407 | 6C62 | 705F | 7274 | 0408 |
| 0001600360 | FFF4 | 0081 | 7302 | 0E74 | 6605 | 0B0A | B700 | 0605 |
| 0001600400 | 5F5F | 7566 | 636E | 0201 | 011E | 14FE | 05B9 | 0134 |
| 0001600420 | 0016 | 0126 | 0000 | 0F04 | 6264 | 735F | 7465 | 695F |
| 0001600440 | 6F63 | 5F6E | 6468 | 0C72 | 0A04 | 8600 | 0600 | 696C |
| 0001600460 | 5F62 | 6469 | 0412 | 0006 | 0453 | 690C | 6F63 | 5F6E |
| 0001600500 | 6468 | 5F72 | 7470 | 0C72 | FA04 | C0FF | 0600 | 5F5F |
| 0001600520 | 7974 | 6570 | 040F | FFF4 | 0085 | 5F09 | 625F | 5F78 |
| 0001600540 | 7974 | 6570 | 040D | FFE4 | 0266 | 5F07 | 705F | 6972 |
| 0001600560 | 746E | 040B | FFDC | 0202 | 5F05 | 6C5F | 6C76 | 040D |
| 0001600600 | FFE8 | 05A5 | 5F07 | 635F | 6F6C | 6B63 | 040D | FFF6 |
| 0001600620 | 00C0 | 5F07 | 735F | 6174 | 6B63 | 040E | FFE2 | 0081 |
| 0001600640 | 5F08 | 725F | 7465 | 6176 | 0E6C | 8405 | 0B0A | B700 |
| 0001600660 | 0605 | 5F5F | 7566 | 636E | 0201 | 011C | 1632 | 05BB |
| 0001600700 | 028C | 0016 | 027E | 0000 | 0D04 | 6264 | 6C5F | 7369 |
| 0001600720 | 5F74 | 6369 | 6E6F | 0C73 | 1004 | 8600 | 0600 | 696C |
| 0001600740 | 5F62 | 6469 | 040F | 000E | 0081 | 6C09 | 7473 | 6F5F |
| 0001600760 | 6472 | 7265 | 0411 | 000A | 00C5 | 6C0B | 7473 | 635F |
| 0001601000 | 746E | 615F | 7264 | 0412 | 0006 | 0462 | 6E0C | 6D61 |
| 0001601020 | 5F65 | 736C | 5F74 | 6461 | 0C72 | FA04 | C0FF | 0600 |
| 0001601040 | 5F5F | 7974 | 6570 | 040F | FFEE | 0085 | 5F09 | 625F |
| 0001601060 | 5F78 | 7974 | 6570 | 040D | FFDE | 0266 | 5F07 | 705F |
| 0001601100 | 6972 | 746E | 040B | FFD6 | 0202 | 5F05 | 6C5F | 6C76 |
| 0001601120 | 040D | FFE2 | 05A5 | 5F07 | 635F | 6F6C | 6B63 | 040D |
| 0001601140 | FFF6 | 00C0 | 5F07 | 735F | 6174 | 6B63 | 040E | FFDC |
| 0001601160 | 0081 | 5F08 | 725F | 7465 | 6176 | 0D6C | F004 | ACFF |
| 0001601200 | 0704 | 6274 | 5F6C | 7470 | 0872 | F404 | 81FF | 0200 |
| 0001601220 | 7473 | 050E | 0AA2 | 000B | 05A3 | 5F06 | 665F | 6E75 |
| 0001601240 | 0163 | 0502 | 000D | 1A00 | 0F00 | D405 | 0B09 | C000 |
| 0001601260 | 0700 | 5F42 | 4678 | 6C69 | 0F65 | D805 | 0B09 | C000 |
| 0001601300 | 0700 | 5F42 | 5078 | 6361 | 146B | 0005 | 0000 | 8100 |
| 0001601320 | 0C00 | 7842 | 445F | 6265 | 6775 | 6F4D | 6564 | 0514 |
| 0001601340 | 0000 | 0000 | 0081 | 420C | 5F78 | 6954 | 656D | 4D73 |
| 0001601360 | 646F | 0565 | 0211 | 0000 | 2100 | BE01 | B418 | 6A05 |
| 0001601400 | 160A | 5C00 | 000A | 0400 | 6412 | 5F62 | 6D69 | 5F67 |
| 0001601420 | 7473 | 7261 | 5F74 | 7277 | 7469 | 0C65 | 1804 | 8600 |
| 0001601440 | 0600 | 7374 | 5F74 | 6469 | 0411 | 0014 | 041F | 690B |
| 0001601460 | 676D | 685F | 7264 | 705F | 7274 | 0411 | 0012 | 0081 |
| 0001601500 | 630B | 6572 | 7461 | 5F65 | 6F6D | 6564 | 0410 | 0010 |
| 0001601520 | 0085 | 620A | 6361 | 676B | 6F72 | 6E75 | 0E64 | 0E04 |
| 0001601540 | 8100 | 0800 | 6F63 | 706D | 6572 | 7373 | 0411 | 000A |

THU MAR 14 17:31:54 1991 DB_PI.DLL PAGE 385, LINE 22657

| | | | | | | | | |
|---|---|---|---|---|---|---|---|---|
| 0001601560 | 00C5 | 690B | 676D | 685F | 6C64 | 615F | 7264 | 0417 |
| 0001601600 | 0006 | 043A | 6C11 | 7961 | 7265 | 625F | 6675 | 6566 |
| 0001601620 | 5F72 | 6170 | 7264 | 040C | FFF6 | 00C0 | 5F06 | 745F |
| 0001601640 | 7079 | 0F65 | E604 | 85FF | 0900 | 5F5F | 7862 | 745F |
| 0001601660 | 7079 | 0D65 | D604 | 66FF | 0702 | 5F5F | 7270 | 6E69 |
| 0001601700 | 0B74 | CE04 | 02FE | 0502 | 5F5F | 766C | 0D6C | DA04 |
| 0001601720 | B9FF | 0705 | 5F5F | 6C63 | 636F | 0D6B | EE04 | C0FF |
| 0001601740 | 0700 | 5F5F | 7473 | 6361 | 0E6B | D404 | 81FE | 0800 |
| 0001601760 | 5F5F | 6572 | 7674 | 6C61 | 040D | FFFA | 050C | 7407 |
| 0001602000 | 7473 | 705F | 7274 | 0412 | FFF2 | 0511 | 6F0C | 6570 |
| 0001602020 | 5F6E | 6D69 | 5F67 | 7470 | 0F72 | D604 | A0FE | 0904 |
| 0001602040 | 6966 | 656C | 705F | 7461 | 1068 | E804 | 82FF | 0A00 |
| 0001602060 | 616C | 6579 | 5F72 | 6973 | 657A | 0413 | FEC6 | 00E4 |
| 0001602100 | 740D | 6D65 | 5F70 | 7462 | 706D | 705F | 7274 | 0412 |
| 0001602120 | FECA | 00E4 | 740C | 6D65 | 5F70 | 6973 | 5F67 | 7470 |
| 0001602140 | 0872 | EC04 | 81FF | 0200 | 7473 | 050E | 0AE0 | 000B |
| 0001602160 | 05B7 | 5F06 | 665F | 6E75 | 0163 | 2102 | 2801 | BD23 |
| 0001602200 | 9805 | 1607 | 8A00 | 0007 | 0400 | 6412 | 5F62 | 6D69 |
| 0001602220 | 5F67 | 7277 | 7469 | 5F65 | 616C | 6579 | 0C72 | 0E04 |
| 0001602240 | 8600 | 0600 | 7374 | 5F74 | 6469 | 040D | 000C | 0085 |
| 0001602260 | 6907 | 676D | 685F | 6C64 | 040F | 000A | 0085 | 6C09 |
| 0001602300 | 7961 | 7265 | 695F | 7864 | 0410 | 0006 | 043A | 6C0A |
| 0001602320 | 7961 | 7265 | 705F | 6461 | 0C72 | F604 | C0FF | 0600 |
| 0001602340 | 5F5F | 7974 | 6570 | 040F | FFE6 | 0085 | 5F09 | 625F |
| 0001602360 | 5F78 | 7974 | 6570 | 040D | FFD6 | 0266 | 5F07 | 705F |
| 0001602400 | 6972 | 746E | 040B | FFCE | 0202 | 5F05 | 6C5F | 6C76 |
| 0001602420 | 040D | FFDA | 05B9 | 5F07 | 635F | 6F6C | 6B63 | 040D |
| 0001602440 | FFEA | 00C0 | 5F07 | 735F | 6174 | 6B63 | 040E | FFD4 |
| 0001602460 | 0081 | 5F08 | 725F | 7465 | 6176 | 0D6C | FA04 | 0CFF |
| 0001602500 | 0705 | 7374 | 5F74 | 7470 | 1272 | EE04 | 11FF | 0C05 |
| 0001602520 | 706F | 6E65 | 695F | 676D | 705F | 7274 | 0412 | FFF2 |
| 0001602540 | 0082 | 6C0C | 7961 | 7265 | 6F5F | 6666 | 6573 | 0874 |
| 0001602560 | E804 | 81FF | 0200 | 7473 | 050E | 0B02 | 000B | 05B7 |
| 0001602600 | 5F06 | 665F | 6E75 | 0163 | 1F02 | C001 | BF2A | 1905 |
| 0001602620 | 1605 | 0B00 | 0005 | 0400 | 6410 | 5F62 | 6D69 | 5F67 |
| 0001602640 | 7277 | 7469 | 5F65 | 6973 | 0C67 | 0C04 | 8600 | 0600 |
| 0001602660 | 7374 | 5F74 | 6469 | 040D | 000A | 0085 | 6907 | 676D |
| 0001602700 | 685F | 6C64 | 040D | 0006 | 00C4 | 7307 | 6769 | 705F |
| 0001602720 | 7274 | 0412 | FFF2 | 0511 | 6F0C | 6570 | 5F6E | 6D69 |
| 0001602740 | 5F67 | 7470 | 0872 | EC04 | 81FF | 0200 | 7473 | 040C |
| 0001602760 | FFF6 | 00C0 | 5F06 | 745F | 7079 | 0F65 | EA04 | 85FF |
| 0001603000 | 0900 | 5F5F | 7862 | 745F | 7079 | 0D65 | DA04 | 66FF |
| 0001603020 | 0702 | 5F5F | 7270 | 6E69 | 0B74 | D204 | 02FF | 0502 |
| 0001603040 | 5F5F | 766C | 0D6C | DE04 | B9FF | 0705 | 5F5F | 6C63 |
| 0001603060 | 636F | 0D6B | EE04 | C0FF | 0700 | 5F5F | 7473 | 6361 |
| 0001603100 | 0E6B | D804 | 81FF | 0800 | 5F5F | 6572 | 7674 | 6C61 |
| 0001603120 | 040D | FFFA | 050C | 7407 | 7473 | 705F | 7274 | 050E |
| 0001603140 | 0B24 | 000B | 05C1 | 5F06 | 665F | 6E75 | 0163 | 1F02 |
| 0001603160 | D901 | C32F | A205 | 160A | 9400 | 000A | 0400 | 6410 |
| 0001603200 | 5F62 | 6D69 | 5F67 | 6E65 | 5F64 | 7277 | 7469 | 0C65 |
| 0001603220 | 1004 | 8600 | 0600 | 7374 | 5F74 | 6469 | 040D | 000E |
| 0001603240 | 0085 | 6907 | 676D | 685F | 6C64 | 0410 | 000A | 043A |
| 0001603260 | 6C0A | 7961 | 7265 | 705F | 6461 | 1072 | 0604 | C600 |
| 0001603300 | 0A00 | 6D69 | 5F67 | 6469 | 615F | 7264 | 040C | FFF6 |
| 0001603320 | 00C0 | 5F06 | 745F | 7079 | 0F65 | 3604 | 85FF | 0900 |
| 0001603340 | 5F5F | 7862 | 745F | 7079 | 0D65 | 2604 | 66FF | 0702 |
| 0001603360 | 5F5F | 7270 | 6E69 | 0B74 | 1E04 | 02FF | 0502 | 5F5F |
| 0001603400 | 766C | 0D6C | 2A04 | B9FF | 0705 | 5F5F | 6C63 | 636F |
| 0001603420 | 0D6B | EE04 | C0FF | 0700 | 5F5F | 7473 | 6361 | 0E6B |

THU MAR 14 17:31:54 1991 DB_PI.DLL PAGE 386, LINE 22716

| | | | | | | | | |
|---|---|---|---|---|---|---|---|---|
| 0001603440 | 2404 | 81FF | 0800 | 5F5F | 6572 | 7674 | 6C61 | 040D |
| 0001603460 | FFFA | 050C | 7407 | 7473 | 705F | 7274 | 0412 | FFF2 |
| 0001603500 | 0511 | 6F0C | 6570 | 5F6E | 6D69 | 5F67 | 7470 | 1172 |
| 0001603520 | 3804 | 11FF | 0B04 | 6C6F | 5F64 | 6D69 | 5F67 | 6468 |
| 0001603540 | 1172 | 1404 | 1FFF | 0B04 | 6D69 | 5F67 | 6468 | 5F72 |
| 0001603560 | 7470 | 1272 | 1804 | C0FF | 0C00 | 6C6F | 5F64 | 6966 |
| 0001603600 | 656C | 616E | 656D | 0408 | FFEC | 0081 | 7302 | 0B74 |
| 0001603620 | 1C04 | 81FF | 0500 | 6762 | 735F | 0E74 | 4405 | 0B0B |
| 0001603640 | C100 | 0605 | 5F5F | 7566 | 636E | 0201 | 011F | 3A7B |
| 0001603660 | 05C5 | 05B7 | 0016 | 05A9 | 0000 | 1004 | 6264 | 695F |
| 0001603700 | 676D | 635F | 6E61 | 6563 | 5F6C | 706F | 040C | 000C |
| 0001603720 | 0086 | 7406 | 7473 | 695F | 0D64 | 0A04 | 8500 | 0700 |
| 0001603740 | 6D69 | 5F67 | 6468 | 106C | 0604 | 3A00 | 0A04 | 616C |
| 0001603760 | 6579 | 5F72 | 6170 | 7264 | 040C | FFFA | 00C0 | 5F06 |
| 0001604000 | 745F | 7079 | 0F65 | EE04 | 85FF | 0900 | 5F5F | 7862 |
| 0001604020 | 745F | 7079 | 0D65 | DE04 | 66FF | 0702 | 5F5F | 7270 |
| 0001604040 | 6E69 | 0B74 | D604 | 02FE | 0502 | 5F5F | 766C | 0D6C |
| 0001604060 | E204 | B9FF | 0705 | 5F5F | 6C63 | 636F | 0D6B | F204 |
| 0001604100 | C0FF | 0700 | 5F5F | 7473 | 6361 | 0E6B | DC04 | 81FE |
| 0001604120 | 0800 | 5F5F | 6572 | 7674 | 6C61 | 0408 | FFF0 | 0081 |
| 0001604140 | 7302 | 1274 | F604 | 11FF | 0C05 | 706F | 6E65 | 695F |
| 0001604160 | 676D | 705F | 7274 | 040F | FEDE | 04A0 | 6609 | 6C69 |
| 0001604200 | 5F65 | 6170 | 6874 | 050E | 0B66 | 000B | 05C1 | 5F06 |
| 0001604220 | 665F | 6E75 | 0163 | 2202 | 3201 | C740 | 0405 | 160A |
| 0001604240 | F600 | 0009 | 0400 | 6413 | 5F62 | 6D69 | 5F67 | 7473 |
| 0001604260 | 7261 | 5F74 | 6361 | 6563 | 7373 | 040C | 0022 | 0086 |
| 0001604300 | 7406 | 7473 | 695F | 0E64 | 1E04 | C000 | 0800 | 6D69 |
| 0001604320 | 5F67 | 616E | 656D | 040E | 001C | 0081 | 6908 | 676D |
| 0001604340 | 745F | 7079 | 0C65 | 1804 | 8600 | 0600 | 6D69 | 5F67 |
| 0001604360 | 6469 | 0411 | 0016 | 0081 | 610B | 6363 | 7365 | 5F73 |
| 0001604400 | 6F6D | 6564 | 0410 | 0014 | 0085 | 620A | 6361 | 676B |
| 0001604420 | 6F72 | 6E75 | 0E64 | 1204 | 8100 | 0800 | 6F63 | 706D |
| 0001604440 | 6572 | 7373 | 0411 | 000E | 00C5 | 690B | 676D | 685F |
| 0001604460 | 6C64 | 615F | /264 | 0411 | 000A | 041F | 690B | 676D |
| 0001604500 | 685F | 7264 | 705F | 7274 | 0417 | 0006 | 043A | 6C11 |
| 0001604520 | 7961 | 7265 | 625F | 6675 | 6566 | 5F72 | 6170 | 7264 |
| 0001604540 | 040C | FFF6 | 00C0 | 5F06 | 745F | 7079 | 0F65 | E604 |
| 0001604560 | 85FF | 0900 | 5F5F | 7862 | 745F | 7079 | 0D65 | B604 |
| 0001604600 | 66FF | 0702 | 5F5F | 7270 | 6E69 | 0B74 | AE04 | 02FE |
| 0001604620 | 0502 | 5F5F | 766C | 0D6C | DA04 | B9FF | 0705 | 5F5F |
| 0001604640 | 6C63 | 636F | 0D6B | EE04 | C0FF | 0700 | 5F5F | 7473 |
| 0001604660 | 6361 | 0E6B | B404 | 81FE | 0800 | 5F5F | 6572 | 7674 |
| 0001604700 | 6C61 | 040D | FFFA | 050C | 7407 | 7473 | 705F | 7274 |
| 0001604720 | 040F | FEB6 | 04A0 | 6609 | 6C69 | 5F65 | 6170 | 6874 |
| 0001604740 | 0410 | FFBA | 0358 | 6C0A | 7261 | 6567 | 6E5F | 6D61 |
| 0001604760 | 1065 | E804 | 82FF | 0A00 | 616C | 6579 | 5F72 | 6973 |
| 0001605000 | 657A | 0412 | FFF2 | 0511 | 6F0C | 6570 | 5F6E | 6D69 |
| 0001605020 | 5F67 | 7470 | 0872 | EC04 | 81FF | 0200 | 7473 | 050E |
| 0001605040 | 0B88 | 000B | 05C9 | 5F06 | 665F | 6E75 | 0163 | 2202 |
| 0001605060 | 3601 | CB4A | 8F05 | 1605 | 8100 | 0005 | 0400 | 6413 |
| 0001605100 | 5F62 | 6D69 | 5F67 | 6361 | 6563 | 7373 | 6C5F | 7961 |
| 0001605120 | 7265 | 040C | 000E | 0086 | 7406 | 7473 | 695F | 0D64 |
| 0001605140 | 0C04 | 8500 | 0700 | 6D69 | 5F67 | 6468 | 0F6C | 0A04 |
| 0001605160 | 8500 | 0900 | 616C | 6579 | 5F72 | 6469 | 0F78 | 0604 |
| 0001605200 | E400 | 0900 | 616C | 6579 | 5F72 | 7470 | 0C72 | F604 |
| 0001605220 | C0FF | 0600 | 5F5F | 7974 | 6570 | 040F | FFEA | 0085 |
| 0001605240 | 5F09 | 625F | 5F78 | 7974 | 6570 | 040D | FFDA | 0266 |
| 0001605260 | 5F07 | 705F | 6972 | 746E | 040B | FFD2 | 0202 | 5F05 |
| 0001605300 | 6C5F | 6C76 | 040D | FFDE | 05B9 | 5F07 | 635F | 6F6C |

THU MAR 14 17:31:54 1991 DB_PI.DLL PAGE 387, LINE 22775

| | | | | | | | | |
|---|---|---|---|---|---|---|---|---|
| 0001605320 | 6B63 | 040D | FFEE | 00C0 | 5F07 | 735F | 6174 | 6B63 |
| 0001605340 | 040E | FFD8 | 0081 | 5F08 | 725F | 7465 | 6176 | 0D6C |
| 0001605360 | FA04 | 0CFF | 0705 | 7374 | 5F74 | 7470 | 1272 | F204 |
| 0001605400 | 11FF | 0C05 | 706F | 6E65 | 695F | 676D | 705F | 7274 |
| 0001605420 | 0408 | FFEC | 0081 | 7302 | 0E74 | AA05 | 0B0B | C900 |
| 0001605440 | 0605 | 5F5F | 7566 | 636E | 0201 | 0125 | 4FC5 | 05CD |
| 0001605460 | 017A | 0010 | 016F | 0000 | 1604 | 6264 | 675F | 7465 |
| 0001605500 | 735F | 616D | 6C6C | 695F | 676D | 6C5F | 7961 | 7265 |
| 0001605520 | 0412 | 0006 | 0511 | 6F0C | 6570 | 5F6E | 6D69 | 5F67 |
| 0001605540 | 7470 | 0F72 | 0A04 | 8500 | 0900 | 616C | 6579 | 5F72 |
| 0001605560 | 6469 | 0F78 | 0C04 | E400 | 0900 | 616C | 6579 | 5F72 |
| 0001605600 | 7470 | 0D72 | FA04 | 1FFF | 0704 | 6D69 | 5F67 | 7470 |
| 0001605620 | 1272 | F604 | 82FF | 0C00 | 616C | 6579 | 5F72 | 666F |
| 0001605640 | 7366 | 7465 | 0408 | FFF4 | 0081 | 7302 | 0174 | 2002 |
| 0001605660 | 3F01 | CF51 | 8C05 | 1605 | 7E00 | 0005 | 0400 | 6411 |
| 0001605700 | 5F62 | 6D69 | 5F67 | 6361 | 6563 | 7373 | 735F | 6769 |
| 0001605720 | 040C | 000C | 0086 | 7406 | 7473 | 695F | 0D64 | 0A04 |
| 0001605740 | 8500 | 0700 | 6D69 | 5F67 | 6468 | 0D6C | 0604 | C400 |
| 0001605760 | 0700 | 6973 | 5F67 | 7470 | 0C72 | F604 | C0FF | 0600 |
| 0001606000 | 5F5F | 7974 | 6570 | 040F | FFEA | 0085 | 5F09 | 625F |
| 0001606020 | 5F78 | 7974 | 6570 | 040D | FFDA | 0266 | 5F07 | 705F |
| 0001606040 | 6972 | 746E | 040B | FFD2 | 0202 | 5F05 | 6C5F | 6C76 |
| 0001606060 | 040D | FFDE | 05B9 | 5F07 | 635F | 6F6C | 6B63 | 040D |
| 0001606100 | FFEE | 00C0 | 5F07 | 735F | 6174 | 6B63 | 040E | FFD8 |
| 0001606120 | 0081 | 5F08 | 725F | 7465 | 6176 | 0D6C | FA04 | 0CFF |
| 0001606140 | 0705 | 7374 | 5F74 | 7470 | 1272 | F204 | 11FF | 0C05 |
| 0001606160 | 706F | 6E65 | 695F | 676D | 705F | 7274 | 0408 | FFEC |
| 0001606200 | 0081 | 7302 | 0E74 | CC05 | 0B0B | D100 | 0605 | 5F5F |
| 0001606220 | 7566 | 636E | 0201 | 0123 | 56CB | 05D3 | 00EC | 0010 |
| 0001606240 | 00E1 | 0000 | 1404 | 6264 | 675F | 7465 | 735F | 616D |
| 0001606260 | 6C6C | 695F | 676D | 735F | 6769 | 0412 | 0006 | 0511 |
| 0001606300 | 6F0C | 6570 | 5F6E | 6D69 | 5F67 | 7470 | 0D72 | 0A04 |
| 0001606320 | E400 | 0700 | 6973 | 5F67 | 7470 | 0D72 | FA04 | 1FFF |
| 0001606340 | 0704 | 6D69 | 5F67 | 7470 | 0872 | F804 | 81FF | 0200 |
| 0001606360 | 7473 | 0201 | 012A | 57B7 | 05D5 | 013E | 0010 | 0133 |
| 0001606400 | 0000 | 1B04 | 6264 | 635F | 6572 | 7461 | 5F65 | 706F |
| 0001606420 | 6E65 | 745F | 706D | 695F | 676D | 665F | 6C69 | 1265 |
| 0001606440 | 0604 | 1100 | 0C05 | 706F | 6E65 | 695F | 676D | 705F |
| 0001606460 | 7274 | 0408 | FEFC | 0081 | 7302 | 0F74 | FC04 | A0FD |
| 0001606500 | 0904 | 6966 | 656C | 705F | 7461 | 1368 | FE04 | A0FE |
| 0001606520 | 0D04 | 7273 | 5F63 | 6966 | 656C | 705F | 7461 | 0168 |
| 0001606540 | 2302 | F501 | D758 | 9105 | 1606 | 8300 | 0006 | 0400 |
| 0001606560 | 6414 | 5F62 | 6D69 | 5F67 | 6572 | 656C | 7361 | 5F65 |
| 0001606600 | 616C | 6579 | 0C72 | 1004 | 8600 | 0600 | 7374 | 5F74 |
| 0001606620 | 6469 | 040D | 000E | 0085 | 6907 | 676D | 685F | 6C64 |
| 0001606640 | 040F | 000C | 0085 | 7309 | 7661 | 5F65 | 6C66 | 6761 |
| 0001606660 | 040F | 000A | 0085 | 6C09 | 7961 | 7265 | 695F | 7864 |
| 0001606700 | 0410 | 0006 | 043A | 6C0A | 7961 | 7265 | 705F | 6461 |
| 0001606720 | 0872 | EC04 | 81FF | 0200 | 7473 | 040B | FFD0 | 0081 |
| 0001606740 | 6205 | 5F67 | 7473 | 0412 | FFF2 | 0082 | 6C0C | 7961 |
| 0001606760 | 7265 | 6F5F | 6666 | 6573 | 1274 | F604 | 11FF | 0C05 |
| 0001607000 | 706F | 6E65 | 695F | 676D | 705F | 7274 | 040C | FFFA |
| 0001607020 | 00C0 | 5F06 | 745F | 7079 | 0F65 | EA04 | 85FF | 0900 |
| 0001607040 | 5F5F | 7862 | 745F | 7079 | 0D65 | DA04 | 66FF | 0702 |
| 0001607060 | 5F5F | 7270 | 6E69 | 0B74 | D204 | 02FF | 0502 | 5F5F |
| 0001607100 | 766C | 0D6C | DE04 | B9FF | 0705 | 5F5F | 6C63 | 636F |
| 0001607120 | 0D6B | EE04 | C0FF | 0700 | 5F5F | 7473 | 6361 | 0E6B |
| 0001607140 | D804 | 81FF | 0800 | 5F5F | 6572 | 7674 | 6C61 | 050E |
| 0001607160 | 0BF8 | 000B | 05D9 | 5F06 | 665F | 6E75 | 0163 | 2102 |

THU MAR 14 17:31:54 1991 DB_PI.DLL PAGE 388, LINE 22834

| | | | | | | | | |
|---|---|---|---|---|---|---|---|---|
| 0001607200 | 8601 | DB5F | 3E05 | 1605 | 3000 | 0005 | 0400 | 6412 |
| 0001607220 | 5F62 | 6D69 | 5F67 | 6572 | 656C | 7361 | 5F65 | 6973 |
| 0001607240 | 0C67 | DE04 | 8600 | 0600 | 7374 | 5F74 | 6469 | 040D |
| 0001607260 | 000C | 0085 | 6907 | 676D | 685F | 6C64 | 040F | 000A |
| 0001607300 | 0085 | 7309 | 7661 | 5F65 | 6C66 | 6761 | 040D | 0006 |
| 0001607320 | 00E4 | 7307 | 6769 | 705F | 7274 | 040C | FFFA | 00C0 |
| 0001607340 | 5F06 | 745F | 7079 | 0F65 | EE04 | 85FF | 0900 | 5F5F |
| 0001607360 | 7862 | 745F | 7079 | 0D65 | DE04 | 66FF | 0702 | 5F5F |
| 0001607400 | 7270 | 6E69 | 0B74 | D604 | 02FF | 0502 | 5F5F | 766C |
| 0001607420 | 0D6C | E204 | B9FF | 0705 | 5F5F | 6C63 | 636F | 0D6B |
| 0001607440 | F204 | C0FF | 0700 | 5F5F | 7473 | 6361 | 0E6B | DC04 |
| 0001607460 | 81FF | 0800 | 5F5F | 6572 | 7674 | 6C61 | 0408 | FFF0 |
| 0001607500 | 0081 | 7302 | 0B74 | D404 | 81FF | 0500 | 6762 | 735F |
| 0001607520 | 1274 | F604 | 11FF | 0C05 | 706F | 6E65 | 695F | 676D |
| 0001607540 | 705F | 7274 | 050E | 0C1C | 000B | 05B7 | 5F06 | 665F |
| 0001607560 | 6E75 | 0163 | 2002 | C401 | DD64 | 9005 | 1608 | 8200 |
| 0001607600 | 0008 | 0400 | 6411 | 5F62 | 6D69 | 5F67 | 6E65 | 5F64 |
| 0001607620 | 6361 | 6563 | 7373 | 040C | 000E | 0086 | 7406 | 7473 |
| 0001607640 | 695F | 0D64 | 0C04 | 8500 | 0700 | 6D69 | 5F67 | 6468 |
| 0001607660 | 0F6C | 0A04 | 8500 | 0900 | 6173 | 6576 | 665F | 616C |
| 0001607700 | 1067 | 0604 | 3A00 | 0A04 | 616C | 6579 | 5F72 | 6170 |
| 0001607720 | 7264 | 040C | FFF6 | 00C0 | 5F06 | 745F | 7079 | 0F65 |
| 0001607740 | E604 | 85FF | 0900 | 5F5F | 7862 | 745F | 7079 | 0D65 |
| 0001607760 | D604 | 66FF | 0702 | 5F5F | 7270 | 6E69 | 0B74 | CE04 |
| 0001610000 | 02FF | 0502 | 5F5F | 766C | 0D6C | DA04 | B9FF | 0705 |
| 0001610020 | 5F5F | 6C63 | 636F | 0D6B | EE04 | C0FF | 0700 | 5F5F |
| 0001610040 | 7473 | 6361 | 0E6B | D404 | 81FF | 0800 | 5F5F | 6572 |
| 0001610060 | 7674 | 6C61 | 040D | FFFA | 050C | 7407 | 7473 | 705F |
| 0001610100 | 7274 | 0412 | FFF2 | 0511 | 6F0C | 6570 | 5F6E | 6D69 |
| 0001610120 | 5F67 | 7470 | 0E72 | E804 | 86FF | 0800 | 7564 | 6D6D |
| 0001610140 | 5F79 | 6469 | 0408 | FFEC | 0081 | 7302 | 0B74 | CC04 |
| 0001610160 | 81FF | 0500 | 6762 | 735F | 0E74 | 3E05 | 0B0C | D100 |
| 0001610200 | 0605 | 5F5F | 7566 | 636E | 0201 | 0125 | 6D54 | 05DF |
| 0001610220 | 0395 | 0010 | 038A | 0000 | 1604 | 6264 | 695F | 676D |
| 0001610240 | 715F | 6575 | 7972 | 625F | 5F67 | 7473 | 7461 | 7375 |
| 0001610260 | 040C | 0006 | 0086 | 7406 | 7473 | 695F | 0D64 | 0A04 |
| 0001610300 | 8500 | 0700 | 6D69 | 5F67 | 6468 | 0D6C | F604 | 0CFF |
| 0001610320 | 0705 | 7374 | 5F74 | 7470 | 1272 | F204 | 11FF | 0C05 |
| 0001610340 | 706F | 6E65 | 695F | 676D | 705F | 7274 | 0408 | FFEC |
| 0001610360 | 0081 | 7302 | 0C74 | FA04 | C0FF | 0600 | 5F5F | 7974 |
| 0001610400 | 6570 | 040F | FFEA | 0085 | 5F09 | 625F | 5F78 | 7974 |
| 0001610420 | 6570 | 040D | FFDA | 0266 | 5F07 | 705F | 6972 | 746E |
| 0001610440 | 040B | FFD2 | 0202 | 5F05 | 6C5F | 6C76 | 040D | FFDE |
| 0001610460 | 05B9 | 5F07 | 635F | 6F6C | 6B63 | 040D | FFEE | 00C0 |
| 0001610500 | 5F07 | 735F | 6174 | 6B63 | 040E | FFD8 | 0081 | 5F08 |
| 0001610520 | 725F | 7465 | 6176 | 0E6C | 5E05 | 0B0C | E100 | 0605 |
| 0001610540 | 5F5F | 7566 | 636E | 0201 | 011B | 70E9 | 05E3 | 024E |
| 0001610560 | 0010 | 0243 | 0000 | 0C04 | 6264 | 735F | 7661 | 5F65 |
| 0001610600 | 696C | 676D | 040D | 0006 | 050C | 7407 | 7473 | 705F |
| 0001610620 | 7274 | 0412 | 000A | 00C0 | 6F0C | 646C | 665F | 6C69 |
| 0001610640 | 6E65 | 6D61 | 1265 | 0E04 | C000 | 0C00 | 6D74 | 5F70 |
| 0001610660 | 6966 | 656C | 616E | 656D | 0411 | 0012 | 0081 | 630B |
| 0001610700 | 6572 | 7461 | 5F65 | 6F6D | 6564 | 0411 | 0014 | 041F |
| 0001610720 | 690B | 676D | 685F | 7264 | 705F | 7274 | 040E | FEFC |
| 0001610740 | 04A0 | 6908 | 676D | 705F | 7461 | 0E68 | FC04 | A0FD |
| 0001610760 | 0804 | 6D74 | 5F70 | 6170 | 6874 | 0408 | FFFC | 0081 |
| 0001611000 | 7302 | 0174 | 1B02 | 3701 | E573 | 2605 | 1001 | 1B00 |
| 0001611020 | 0001 | 0400 | 640C | 5F62 | 6173 | 6576 | 735F | 6D69 |
| 0001611040 | 0D67 | 0604 | 0C00 | 0705 | 7374 | 5F74 | 7470 | 1272 |

THU MAR 14 17:31:54 1991 DB_PI.DLL PAGE 389, LINE 22893

| | | | | | | | | |
|---|---|---|---|---|---|---|---|---|
| 0001611060 | 0A04 | C000 | 0C00 | 6C6F | 5F64 | 6966 | 656C | 616E |
| 0001611100 | 656D | 0411 | 000E | 0081 | 630B | 65̄2 | 7461 | 5F65 |
| 0001611120 | 6F6D | 6564 | 0411 | 0010 | 041F | 690B | 676D | 685F |
| 0001611140 | 7264 | 705F | 7274 | 0413 | FEFE | 04A0 | 660D | 6C75 |
| 0001611160 | 5F6C | 6170 | 6874 | 616E | 656D | 0408 | FEFC | 0081 |
| 0001611200 | 7302 | 0174 | 0502 | 000D | 1A00 | 0F00 | D805 | 0B0A |
| 0001611220 | C000 | 0700 | 5F42 | 4678 | 6C69 | 0F65 | DC05 | 0B0A |
| 0001611240 | C000 | 0700 | 5F42 | 5078 | 6361 | 146B | 0005 | 0000 |
| 0001611260 | 8100 | 0C00 | 7842 | 445F | 6265 | 6775 | 6F4D | 6564 |
| 0001611300 | 0514 | 0000 | 0000 | 0081 | 420C | 5F78 | 6954 | 656D |
| 0001611320 | 4D73 | 646F | 0565 | 0211 | 0000 | 2500 | 5E01 | A374 |
| 0001611340 | D405 | 1001 | C900 | 0001 | 0400 | 6416 | 5F62 | 6567 |
| 0001611360 | 5F74 | 6C67 | 626F | 665F | 6C69 | 6574 | 5F72 | 696C |
| 0001611400 | 0E62 | 0604 | 8100 | 0800 | 6361 | 5F63 | 6F6D | 6564 |
| 0001611420 | 0411 | 0008 | 0589 | 740B | 6C62 | 705F | 7274 | 615F |
| 0001611440 | 7264 | 040E | FFF8 | 051F | 7208 | 6F6F | 5F74 | 7470 |
| 0001611460 | 0F72 | 9804 | 57FE | 0904 | 6574 | 706D | 665F | 746C |
| 0001611500 | 0E72 | F404 | C0FF | 0800 | 6964 | 5F72 | 6170 | 6874 |
| 0001611520 | 040F | FEF0 | 0496 | 6609 | 6C69 | 5F65 | 6170 | 6874 |
| 0001611540 | 0410 | FFF0 | 03EB | 660A | 5F77 | 626F | 5F6A | 7470 |
| 0001611560 | 0872 | FC04 | 81FF | 0200 | 7473 | 0201 | 011E | 7632 |
| 0001611600 | 05A8 | 00C8 | 0010 | 00BD | 0000 | 0F04 | 6264 | 675F |
| 0001611620 | 7465 | 665F | 746C | 5F72 | 6274 | 0C6C | 0604 | 8600 |
| 0001611640 | 0600 | 696C | 5F62 | 6469 | 040E | 000A | 0081 | 6108 |
| 0001611660 | 6363 | 6D5F | 646F | 1165 | 0C04 | 8900 | 0B05 | 6274 |
| 0001611700 | 5F6C | 7470 | 5F72 | 6461 | 0D72 | FA04 | 02FF | 0705 |
| 0001611720 | 7374 | 5F74 | 7470 | 0872 | F804 | 81FF | 0200 | 7473 |
| 0001611740 | 0201 | 011C | 76FA | 05AA | 0366 | 0016 | 0358 | 0000 |
| 0001611760 | 0D04 | 6264 | 615F | 6464 | 665F | 6C69 | 6574 | 1172 |
| 0001612000 | 1004 | C000 | 0B00 | 696C | 5F62 | 6F6C | 7067 | 7461 |
| 0001612020 | 0C68 | 0C04 | 8600 | 0600 | 696C | 5F62 | 6469 | 040E |
| 0001612040 | 0008 | 0461 | 6608 | 746C | 5F72 | 7470 | 0F72 | 0604 |
| 0001612060 | 8500 | 0900 | 766F | 7265 | 7277 | 7469 | 0C65 | FA04 |
| 0001612100 | C0FF | 0600 | 5F5F | 7974 | 6570 | 040F | FFEE | 0085 |
| 0001612120 | 5F09 | 625F | 5F78 | 7974 | 6570 | 040D | FFDE | 022A |
| 0001612140 | 5F07 | 705F | 6972 | 746E | 040B | FFD6 | 0202 | 5F05 |
| 0001612160 | 6C5F | 6C76 | 040D | FFE2 | 05AE | 5F07 | 635F | 6F6C |
| 0001612200 | 6B63 | 040D | FFF6 | 00C0 | 5F07 | 735F | 6174 | 6B63 |
| 0001612220 | 040E | FFDC | 0081 | 5F08 | 725F | 7465 | 6176 | 0D6C |
| 0001612240 | F004 | AEFF | 0704 | 6274 | 5F6C | 7470 | 0872 | F404 |
| 0001612260 | 81FF | 0200 | 7473 | 050E | 0CA6 | 000B | 0354 | 5F06 |
| 0001612300 | 665F | 6E75 | 0163 | 1F02 | 6001 | B07A | 9F05 | 1602 |
| 0001612320 | 9100 | 0002 | 0400 | 6410 | 5F62 | 6564 | 656C | 6574 |
| 0001612340 | 665F | 6C69 | 6574 | 1172 | 0E04 | C000 | 0B00 | 696C |
| 0001612360 | 5F62 | 6F6C | 7067 | 7461 | 0C68 | 0A04 | 8600 | 0600 |
| 0001612400 | 696C | 5F62 | 6469 | 040F | 0006 | 00C0 | 6609 | 746C |
| 0001612420 | 5F72 | 616E | 656D | 040C | FFFA | 00C0 | 5F06 | 745F |
| 0001612440 | 7079 | 0F65 | CE04 | 85FF | 0900 | 5F5F | 7862 | 745F |
| 0001612460 | 7079 | 0D65 | BE04 | 2AFF | 0702 | 5F5F | 7270 | 6E69 |
| 0001612500 | 0B74 | B604 | 02FF | 0502 | 5F5F | 766C | 0D6C | C204 |
| 0001612520 | AEFF | 0705 | 5F5F | 6C63 | 636F | 0D6B | D604 | C0FF |
| 0001612540 | 0700 | 5F5F | 7473 | 6361 | 0E6B | BC04 | 81FF | 0800 |
| 0001612560 | 5F5F | 6572 | 7674 | 6C61 | 040D | FFD0 | 04AE | 7407 |
| 0001612600 | 6C62 | 705F | 7274 | 040F | FFDA | 0325 | 6609 | 6C75 |
| 0001612620 | 5F6C | 616E | 656D | 0414 | FF96 | 0325 | 740E | 7572 |
| 0001612640 | 636E | 665F | 746C | 5F72 | 616E | 086D | D404 | 81FF |
| 0001612660 | 0200 | 7473 | 050E | 0CC0 | 000B | 05B2 | 5F06 | 665F |
| 0001612700 | 6E75 | 0163 | 1C02 | FF01 | B47C | 4605 | 1603 | 3800 |
| 0001612720 | 0003 | 0400 | 640D | 5F62 | 6567 | 5F74 | 6966 | 746C |

THU MAR 14 17:31:54 1991 DB_PI.DLL PAGE 390, LINE 22952

| | | | | | | | | |
|---|---|---|---|---|---|---|---|---|
| 0001612740 | 7265 | 0411 | 0012 | 00C0 | 6C0B | 6269 | 6C5F | 676F |
| 0001612760 | 6170 | 6874 | 040C | 000E | 0086 | 6C06 | 6269 | 695F |
| 0001613000 | 0F64 | 0A04 | C000 | 0900 | 6C66 | 7274 | 6E5F | 6D61 |
| 0001613020 | 0E65 | 0604 | 6100 | 0804 | 6C66 | 7274 | 705F | 7274 |
| 0001613040 | 040C | FFFA | 00C0 | 5F06 | 745F | 7079 | 0F65 | CE04 |
| 0001613060 | 85FF | 0900 | 5F5F | 7862 | 745F | 7079 | 0D65 | BC04 |
| 0001613100 | 2AFF | 0702 | 5F5F | 7270 | 6E69 | 0B74 | B404 | 02FF |
| 0001613120 | 0502 | 5F5F | 766C | 0D6C | C204 | AEFF | 0705 | 5F5F |
| 0001613140 | 6C63 | 636F | 0D6B | D604 | C0FF | 0700 | 5F5F | 7473 |
| 0001613160 | 6361 | 0E6B | BA04 | 81FF | 0800 | 5F5F | 6572 | 7674 |
| 0001613200 | 6C61 | 040D | FFD0 | 04AE | 7407 | 6C62 | 705F | 7274 |
| 0001613220 | 040E | FFC0 | 0081 | 7408 | 706D | 735F | 7A69 | 0F65 |
| 0001613240 | DA04 | 25FF | 0903 | 7566 | 6C6C | 6E5F | 6D61 | 1465 |
| 0001613260 | 9404 | 25FF | 0E03 | 7274 | 6E75 | 5F63 | 6C66 | 7274 |
| 0001613300 | 6E5F | 6D61 | 0408 | FFD4 | 0081 | 7302 | 0E74 | DE05 |
| 0001613320 | 0B0C | B600 | 0605 | 5F5F | 7566 | 636E | 0201 | 0124 |
| 0001613340 | 8045 | 05B8 | 0774 | 0016 | 0766 | 0000 | 1504 | 6264 |
| 0001613360 | 735F | 6165 | 6372 | 5F68 | 6966 | 746C | 7265 | 6C5F |
| 0001613400 | 7369 | 0C74 | 1404 | 8600 | 0600 | 7374 | 5F74 | 6469 |
| 0001613420 | 040E | 0012 | 0085 | 6E08 | 6D61 | 5F65 | 6E63 | 0E74 |
| 0001613440 | 0E04 | E100 | 0803 | 616E | 656D | 6C5F | 7473 | 0412 |
| 0001613460 | 000A | 00C5 | 660C | 746C | 5F72 | 6E63 | 5F74 | 6461 |
| 0001613500 | 1272 | 0604 | 6800 | 0C04 | 6C66 | 7274 | 6C5F | 7473 |
| 0001613520 | 615F | 7264 | 040C | FFF8 | 00C0 | 5F06 | 745F | 7079 |
| 0001613540 | 0F65 | E004 | 85FF | 0900 | 5F5F | 7862 | 745F | 7079 |
| 0001613560 | 0D65 | CE04 | 2AFF | 0702 | 5F5F | 7270 | 6E69 | 0B74 |
| 0001613600 | C604 | 02FF | 0502 | 5F5F | 766C | 0D6C | D404 | AEFF |
| 0001613620 | 0705 | 5F5F | 6C63 | 636F | 0D6B | F404 | C0FF | 0700 |
| 0001613640 | 5F5F | 7473 | 6361 | 0E6B | CC04 | 81FF | 0800 | 5F5F |
| 0001613660 | 6572 | 7674 | 6C61 | 040F | FFEC | 04AE | 7409 | 6C62 |
| 0001613700 | 315F | 705F | 7274 | 040F | FFE8 | 04AE | 7409 | 6C62 |
| 0001613720 | 325F | 705F | 7274 | 0407 | FFE2 | 0085 | 6901 | 0409 |
| 0001613740 | FFF2 | 0085 | 6903 | 7864 | 040E | FFD2 | 0081 | 7408 |
| 0001613760 | 706D | 735F | 7A69 | 1365 | E404 | E1FF | 0D03 | 7274 |
| 0001614000 | 6E75 | 5F63 | 616E | 5F6D | 736C | 0874 | F004 | 81FF |
| 0001614020 | 0200 | 7473 | 040E | FFFC | 0081 | 6608 | 6E69 | 6C61 |
| 0001614040 | 735F | 0E74 | FA05 | 0B0C | BA00 | 0605 | 5F5F | 7566 |
| 0001614060 | 636E | 0201 | 011C | 87B9 | 05BC | 0221 | 0016 | 0213 |
| 0001614100 | 0000 | 0D04 | 6264 | 6C5F | 7369 | 5F74 | 6C66 | 7274 |
| 0001614120 | 0C73 | 1004 | 8600 | 0600 | 696C | 5F62 | 6469 | 0410 |
| 0001614140 | 000E | 0081 | 6C0A | 7369 | 5F74 | 726F | 6564 | 1172 |
| 0001614160 | 0A04 | C500 | 0B00 | 736C | 5F74 | 6E63 | 5F74 | 6461 |
| 0001614200 | 1272 | 0604 | E000 | 0C03 | 616E | 656D | 6C5F | 7473 |
| 0001614220 | 615F | 7264 | 040D | FFF6 | 00C0 | 5F07 | 735F | 6174 |
| 0001614240 | 6B63 | 040E | FFDC | 0081 | 5F08 | 725F | 7465 | 6176 |
| 0001614260 | 0D6C | F004 | AEFF | 0704 | 6274 | 5F6C | 7470 | 0872 |
| 0001614300 | F404 | 81FF | 0200 | 7473 | 040C | FFFA | 00C0 | 5F06 |
| 0001614320 | 745F | 7079 | 0F65 | EE04 | 85FF | 0900 | 5F5F | 7862 |
| 0001614340 | 745F | 7079 | 0D65 | DE04 | 2AFF | 0702 | 5F5F | 7270 |
| 0001614360 | 6E69 | 0B74 | D604 | 02FF | 0502 | 5F5F | 766C | 0D6C |
| 0001614400 | E204 | AEFF | 0705 | 5F5F | 6C63 | 636F | 0E6B | 1E05 |
| 0001614420 | 0B0D | B600 | 0605 | 5F5F | 7566 | 636E | 0201 | 0D05 |
| 0001614440 | 0000 | 001A | 050F | 0C90 | 000B | 00C0 | 4207 | 785F |
| 0001614460 | 6946 | 656C | 050F | 0C94 | 000B | 00C0 | 4207 | 785F |
| 0001614500 | 6150 | 6B63 | 0514 | 0000 | 0000 | 0081 | 420C | 5F78 |
| 0001614520 | 6544 | 7562 | 4D67 | 646F | 1465 | 0005 | 0000 | 8100 |
| 0001614540 | 0C00 | 7842 | 545F | 6D69 | 7365 | 6F4D | 6564 | 1105 |
| 0001614560 | 0002 | 0000 | 011B | 89DA | 0598 | 0162 | 0016 | 0156 |
| 0001614600 | 0000 | 0C04 | 6264 | 615F | 6C6C | 636F | 615F | 696F |

THU MAR 14 17:31:54 1991 DB_PI.DLL PAGE 391, LINE 23011

| | | | | | | | | |
|---|---|---|---|---|---|---|---|---|
| 0001614620 | 040C | FFFA | 00C0 | 5F06 | 745F | 7079 | 0F65 | F404 |
| 0001614640 | 85FF | 0900 | 5F5F | 7862 | 745F | 7079 | 0D65 | E404 |
| 0001614660 | 66FF | 0702 | 5F5F | 7270 | 6E69 | 0B74 | DA04 | 02FF |
| 0001614700 | 0502 | 5F5F | 766C | 0D6C | E804 | 9CFF | 0705 | 5F5F |
| 0001614720 | 6C63 | 636F | 0D6B | F604 | C0FF | 0700 | 5F5F | 7473 |
| 0001614740 | 6361 | 0E6B | E004 | 66FF | 0804 | 5F5F | 6572 | 7674 |
| 0001614760 | 6C61 | 040D | FFD6 | 0466 | 6107 | 696F | 705F | 7274 |
| 0001615000 | 050E | 0D58 | 000B | 033D | 5F06 | 665F | 6E75 | 0163 |
| 0001615020 | 1902 | 3C01 | 9E8B | 6F05 | 1604 | 6100 | 0004 | 0400 |
| 0001615040 | 640A | 5F62 | 6461 | 5F64 | 6F61 | 0C69 | 0C04 | 8600 |
| 0001615060 | 0600 | 7374 | 5F74 | 6469 | 040D | 0008 | 0466 | 6107 |
| 0001615100 | 696F | 615F | 7264 | 040F | 0006 | 0085 | 6F09 | 6576 |
| 0001615120 | 7772 | 6972 | 6574 | 040C | FFF6 | 00C0 | 5F06 | 745F |
| 0001615140 | 7079 | 0F65 | EE04 | 85FF | 0900 | 5F5F | 7862 | 745F |
| 0001615160 | 7079 | 0D65 | DE04 | 66FF | 0702 | 5F5F | 7270 | 6E69 |
| 0001615200 | 0B74 | D604 | 02FF | 0502 | 5F5F | 766C | 0D6C | E204 |
| 0001615220 | 9CFF | 0705 | 5F5F | 6C63 | 636F | 0D6B | F204 | C0FF |
| 0001615240 | 0700 | 5F5F | 7473 | 6361 | 0E6B | DC04 | 81FF | 0800 |
| 0001615260 | 5F5F | 6572 | 7674 | 6C61 | 040D | FFFA | 04FB | 7407 |
| 0001615300 | 7473 | 705F | 7274 | 0409 | FFD4 | 0081 | 7403 | 7079 |
| 0001615320 | 0408 | FFF0 | 0081 | 7302 | 0E74 | 7405 | 0B0D | 9F00 |
| 0001615340 | 0605 | 5F5F | 7566 | 636E | 0201 | 011C | 8FAB | 05A2 |
| 0001615360 | 032C | 0016 | 031E | 0000 | 0D04 | 6264 | 645F | 6C65 |
| 0001615400 | 7465 | 5F65 | 6F61 | 0C69 | 0A04 | 8600 | 0600 | 7374 |
| 0001615420 | 5F74 | 6469 | 040C | 0006 | 0086 | 6106 | 696F | 695F |
| 0001615440 | 0D64 | E204 | 9CFF | 0705 | 5F5F | 6C63 | 636F | 0D6B |
| 0001615460 | F204 | C0FF | 0700 | 5F5F | 7473 | 6361 | 0E6B | DC04 |
| 0001615500 | 81FF | 0800 | 5F5F | 6572 | 7674 | 6C61 | 040D | FFFA |
| 0001615520 | 04FB | 7407 | 7473 | 705F | 7274 | 0408 | FFF0 | 0081 |
| 0001615540 | 7302 | 0C74 | F604 | C0FF | 0600 | 5F5F | 7974 | 6570 |
| 0001615560 | 040F | FFEE | 0085 | 5F09 | 625F | 5F78 | 7974 | 6570 |
| 0001615600 | 040D | FFDE | 0266 | 5F07 | 705F | 6972 | 746E | 040B |
| 0001615620 | FFD6 | 0202 | 5F05 | 6C5F | 6C76 | 050E | 0D8E | 000B |
| 0001615640 | 05A4 | 5F06 | 665F | 6E75 | 0163 | 1902 | D701 | A692 |
| 0001615660 | B505 | 1605 | A700 | 0005 | 0400 | 640A | 5F62 | 6567 |
| 0001615700 | 5F74 | 6F61 | 0C69 | 0E04 | 8600 | 0600 | 7374 | 5F74 |
| 0001615720 | 6469 | 040C | 000A | 0086 | 6106 | 696F | 695F | 1164 |
| 0001615740 | 0604 | 6B00 | 0B04 | 6F61 | 5F69 | 7470 | 5F72 | 6461 |
| 0001615760 | 0C72 | F604 | C0FF | 0600 | 5F5F | 7974 | 6570 | 040F |
| 0001616000 | FF82 | 0085 | 5F09 | 625F | 5F78 | 7974 | 6570 | 040D |
| 0001616020 | FF70 | 0266 | 5F07 | 705F | 6972 | 746E | 040B | FF68 |
| 0001616040 | 0202 | 5F05 | 6C5F | 6C76 | 040D | FF76 | 059C | 5F07 |
| 0001616060 | 635F | 6F6C | 6B63 | 040D | FFF2 | 00C0 | 5F07 | 735F |
| 0001616100 | 6174 | 6B63 | 040E | FF6E | 0081 | 5F08 | 725F | 7465 |
| 0001616120 | 6176 | 0D6C | FA04 | FBFF | 0704 | 7374 | 5F74 | 7470 |
| 0001616140 | 0E72 | 7404 | 81FF | 0800 | 6D74 | 5F70 | 6973 | 657A |
| 0001616160 | 040D | FF84 | 0455 | 7407 | 706D | 615F | 696F | 0408 |
| 0001616200 | FFF0 | 0081 | 7302 | 0E74 | AA05 | 0B0D | 9F00 | 0605 |
| 0001616220 | 5F5F | 7566 | 636E | 0201 | 011E | 988C | 05A8 | 03CA |
| 0001616240 | 0016 | 03BC | 0000 | 0F04 | 6264 | 615F | 696F | 615F |
| 0001616260 | 6464 | 665F | 746C | 1172 | 0C04 | 6B00 | 0B04 | 6F61 |
| 0001616300 | 5F69 | 7470 | 5F72 | 6461 | 0B72 | 0A04 | 8100 | 0500 |
| 0001616320 | 6E69 | 6564 | 1178 | 0604 | C000 | 0B00 | 6966 | 746C |
| 0001616340 | 7265 | 6E5F | 6D61 | 0C65 | FA04 | C0FF | 0600 | 5F5F |
| 0001616360 | 7974 | 6570 | 040F | FFF2 | 0085 | 5F09 | 625F | 5F78 |
| 0001616400 | 7974 | 6570 | 040D | FFE2 | 0266 | 5F07 | 705F | 6972 |
| 0001616420 | 746E | 040B | FFDA | 0202 | 5F05 | 6C5F | 6C76 | 040D |
| 0001616440 | FFE6 | 059C | 5F07 | 635F | 6F6C | 6B63 | 040D | FFF6 |
| 0001616460 | 00C0 | 5F07 | 735F | 6174 | 6B63 | 040E | FFE0 | 0081 |

THU MAR 14 17:31:54 1991 DB_PI.DLL PAGE 392, LINE 23070

| | | | | | | | | |
|---|---|---|---|---|---|---|---|---|
| 0001616500 | 5F08 | 725F | 7465 | 6176 | 0D6C | D604 | 66FF | 0704 |
| 0001616520 | 6F61 | 5F69 | 7470 | 0872 | F404 | 81FF | 0200 | 7473 |
| 0001616540 | 050E | 0DC4 | 000B | 05AA | 5F06 | 665F | 6E75 | 0163 |
| 0001616560 | 1E02 | 5601 | AC9C | B305 | 1605 | A500 | 0005 | 0400 |
| 0001616600 | 640F | 5F62 | 6F61 | 5F69 | 6564 | 5F6C | 6C66 | 7274 |
| 0001616620 | 0411 | 000C | 046B | 610B | 696F | 705F | 7274 | 615F |
| 0001616640 | 7264 | 040B | 000A | 0081 | 6905 | 646E | 7865 | 0411 |
| 0001616660 | 0006 | 00C0 | 660B | 6C69 | 6574 | 5F72 | 616E | 656D |
| 0001616700 | 040C | FFFA | 00C0 | 5F06 | 745F | 7079 | 0F65 | F004 |
| 0001616720 | 85FF | 0900 | 5F5F | 7862 | 745F | 7079 | 0D65 | E004 |
| 0001616740 | 66FF | 0702 | 5F5F | 7270 | 6E69 | 0B74 | D804 | 02FF |
| 0001616760 | 0502 | 5F5F | 766C | 0D6C | E404 | 9CFF | 0705 | 5F5F |
| 0001617000 | 6C63 | 636F | 0D6B | F604 | C0FF | 0700 | 5F5F | 7473 |
| 0001617020 | 6361 | 0E6B | DE04 | 81FF | 0800 | 5F5F | 6572 | 7674 |
| 0001617040 | 6C61 | 0407 | FFF2 | 0081 | 6901 | 0414 | FFB8 | 0342 |
| 0001617060 | 740E | 7572 | 636E | 665F | 746C | 5F72 | 616E | 086D |
| 0001617100 | F404 | 81FF | 0200 | 7473 | 050E | 0DE2 | 000B | 05AA |
| 0001617120 | 5F06 | 665F | 6E75 | 0163 | 1E02 | 0901 | AEA2 | 1B05 |
| 0001617140 | 1602 | 0D00 | 0002 | 0400 | 640F | 5F62 | 6F61 | 5F69 |
| 0001617160 | 6567 | 5F74 | 6C66 | 7274 | 040C | 0010 | 0086 | 7406 |
| 0001617200 | 7473 | 695F | 0D64 | DC04 | 6600 | 0704 | 6F61 | 5F69 |
| 0001617220 | 7470 | 0B72 | DA04 | 8100 | 0500 | 6E69 | 6564 | 0E78 |
| 0001617240 | 0604 | 5A00 | 0804 | 6C66 | 7274 | 705F | 7274 | 040C |
| 0001617260 | FFFA | 00C0 | 5F06 | 745F | 7079 | 0F65 | F404 | 85FF |
| 0001617300 | 0900 | 5F5F | 7862 | 745F | 7079 | 0D65 | E404 | 66FF |
| 0001617320 | 0702 | 5F5F | 7270 | 6E69 | 0B74 | DC04 | 02FF | 0502 |
| 0001617340 | 5F5F | 766C | 0D6C | E804 | 9CFF | 0705 | 5F5F | 6C63 |
| 0001617360 | 636F | 0D6B | F604 | C0FF | 0700 | 5F5F | 7473 | 6361 |
| 0001617400 | 0E6B | E204 | 81FF | 0800 | 5F5F | 6572 | 7674 | 6C61 |
| 0001617420 | 050E | 0E00 | 000B | 05AA | 5F06 | 665F | 6E75 | 0163 |
| 0001617440 | 2202 | 2401 | B0A4 | AA05 | 1602 | 9C00 | 0002 | 0400 |
| 0001617460 | 6413 | 5F62 | 6F61 | 5F69 | 6567 | 5F74 | 6C66 | 7274 |
| 0001617500 | 6C5F | 7473 | 040C | 0012 | 0086 | 7406 | 7473 | 695F |
| 0001617520 | 0D64 | 0E04 | 6600 | 0704 | 6F61 | 5F69 | 7470 | 1272 |
| 0001617540 | 0A04 | C500 | 0C00 | 6C66 | 7274 | 635F | 746E | 615F |
| 0001617560 | 7264 | 0412 | 0006 | 0461 | 660C | 746C | 5F72 | 736C |
| 0001617600 | 5F74 | 6461 | 0C72 | FA04 | C0FF | 0600 | 5F5F | 7974 |
| 0001617620 | 6570 | 040F | FFF4 | 0085 | 5F09 | 625F | 5F78 | 7974 |
| 0001617640 | 6570 | 040D | FFE4 | 0266 | 5F07 | 705F | 6972 | 746E |
| 0001617660 | 040B | FFDC | 0202 | 5F05 | 6C5F | 6C76 | 040D | FFE8 |
| 0001617700 | 059C | 5F07 | 635F | 6F6C | 6B63 | 040D | FFF6 | 00C0 |
| 0001617720 | 5F07 | 735F | 6174 | 6B63 | 040E | FFE2 | 0081 | 5F08 |
| 0001617740 | 725F | 7465 | 6176 | 0E6C | 1E05 | 0B0E | B200 | 0605 |
| 0001617760 | 5F5F | 7566 | 636E | 0201 | 011A | A6CE | 05B4 | 02B8 |
| 0001620000 | 0016 | 02AA | 0000 | 0B04 | 6264 | 6C5F | 7369 | 5F74 |
| 0001620020 | 6F61 | 0C69 | 0E04 | 8600 | 0600 | 7374 | 5F74 | 6469 |
| 0001620040 | 0413 | 000A | 00C5 | 6F0D | 6A62 | 635F | 756F | 746E |
| 0001620060 | 615F | 7264 | 0414 | 0006 | 0474 | 6F0E | 6A62 | 695F |
| 0001620100 | 5F64 | 736C | 5F74 | 6461 | 0B72 | D604 | 02FF | 0502 |
| 0001620120 | 5F5F | 766C | 0D6C | E204 | 9CFF | 0705 | 5F5F | 6C63 |
| 0001620140 | 636F | 0D6B | F204 | C0FF | 0700 | 5F5F | 7473 | 6361 |
| 0001620160 | 0E6B | DC04 | 81FF | 0800 | 5F5F | 6572 | 7674 | 6C61 |
| 0001620200 | 040D | FFFA | 04FB | 7407 | 7473 | 705F | 7274 | 0408 |
| 0001620220 | FFF0 | 0081 | 7302 | 0C74 | F604 | C0FF | 0600 | 5F5F |
| 0001620240 | 7974 | 6570 | 040F | FFEE | 0085 | 5F09 | 625F | 5F78 |
| 0001620260 | 7974 | 6570 | 040D | FFDE | 0266 | 5F07 | 705F | 6972 |
| 0001620300 | 746E | 050E | 0E40 | 000B | 0371 | 5F06 | 665F | 6E75 |
| 0001620320 | 0163 | 0502 | 000D | 1A00 | 0F00 | 5005 | 0B0D | C000 |
| 0001620340 | 0700 | 5F42 | 4678 | 6C69 | 0F65 | 5405 | 0B0D | C000 |

THU MAR 14 17:31:54 1991 DB_PI.DLL PAGE 393, LINE 23129

| | | | | | | | | |
|---|---|---|---|---|---|---|---|---|
| 0001620360 | 0700 | 5F42 | 5078 | 6361 | 146B | 0005 | 0000 | 8100 |
| 0001620400 | 0C00 | 7842 | 445F | 6265 | 6775 | 6F4D | 6564 | 0514 |
| 0001620420 | 0000 | 0000 | 0081 | 420C | 5F78 | 6954 | 656D | 4D73 |
| 0001620440 | 646F | 0565 | 0211 | 0000 | 1800 | 8601 | A7A9 | 9805 |
| 0001620460 | 1602 | 8A00 | 0002 | 0400 | 6409 | 5F62 | 656D | 636D |
| 0001620500 | 7970 | 040A | 000E | 00E4 | 6404 | 7365 | 0974 | 0A04 |
| 0001620520 | E400 | 0300 | 7273 | 0B63 | 0604 | 8200 | 0500 | 6F63 |
| 0001620540 | 6E75 | 0C74 | FA04 | C0FF | 0600 | 5F5F | 7974 | 6570 |
| 0001620560 | 040F | FFF0 | 0085 | 5F09 | 625F | 5F78 | 7974 | 6570 |
| 0001620600 | 040D | FFE0 | 0266 | 5F07 | 705F | 6972 | 746E | 040B |
| 0001620620 | FFD6 | 0202 | 5F05 | 6C5F | 6C76 | 040D | FFE4 | 05AC |
| 0001620640 | 5F07 | 635F | 6F6C | 6B63 | 040D | FFF6 | 00C0 | 5F07 |
| 0001620660 | 735F | 6174 | 6B63 | 040E | FFDC | 00E4 | 5F08 | 725F |
| 0001620700 | 7465 | 6176 | 076C | F204 | 82FF | 0100 | 0E69 | 7C05 |
| 0001620720 | 0B0E | AA00 | 0605 | 5F5F | 7566 | 636E | 0201 | 0118 |
| 0001620740 | AC1E | 05AE | 0349 | 0016 | 033B | 0000 | 0904 | 6264 |
| 0001620760 | 6D5F | 6D65 | 6D63 | 0A70 | 0E04 | E400 | 0400 | 7562 |
| 0001621000 | 3166 | 040A | 000A | 00E4 | 6204 | 6675 | 0B32 | 0604 |
| 0001621020 | 8200 | 0500 | 6F63 | 6E75 | 0D74 | F604 | C0FF | 0700 |
| 0001621040 | 5F5F | 7473 | 6361 | 0E6B | DC04 | 81FF | 0800 | 5F5F |
| 0001621060 | 6572 | 7674 | 6C61 | 0407 | FFF0 | 0082 | 6901 | 040A |
| 0001621100 | FFF4 | 0081 | 7204 | 6C73 | 0C74 | FA04 | C0FF | 0600 |
| 0001621120 | 5F5F | 7974 | 6570 | 040F | FFEE | 0085 | 5F09 | 625F |
| 0001621140 | 5F78 | 7974 | 6570 | 040D | FFDE | 0266 | 5F07 | 705F |
| 0001621160 | 6972 | 746E | 040B | FFD6 | 0202 | 5F05 | 6C5F | 6C76 |
| 0001621200 | 040D | FFE2 | 05AC | 5F07 | 635F | 6F6C | 6B63 | 050E |
| 0001621220 | 0E8E | 000B | 05B0 | 5F06 | 665F | 6E75 | 0163 | 1802 |
| 0001621240 | 6701 | B3AF | 7505 | 1602 | 6700 | 0002 | 0400 | 6409 |
| 0001621260 | 5F62 | 656D | 736D | 7465 | 040A | 000C | 00E4 | 6404 |
| 0001621300 | 7365 | 0774 | 0A04 | 8100 | 0100 | 0B63 | 0604 | 8200 |
| 0001621320 | 0500 | 6F63 | 6E75 | 0C74 | FA04 | C0FF | 0600 | 5F5F |
| 0001621340 | 7974 | 6570 | 040F | FFF0 | 0085 | 5F09 | 625F | 5F78 |
| 0001621360 | 7974 | 6570 | 040D | FFE0 | 0266 | 5F07 | 705F | 6972 |
| 0001621400 | 746E | 040B | FFD6 | 0202 | 5F05 | 6C5F | 6C76 | 040D |
| 0001621420 | FFE4 | 05AC | 5F07 | 635F | 6F6C | 6B63 | 040D | FFF6 |
| 0001621440 | 00C0 | 5F07 | 735F | 6174 | 6B63 | 040E | FFDC | 00E4 |
| 0001621460 | 5F08 | 725F | 7465 | 6176 | 076C | F204 | 82FF | 0100 |
| 0001621500 | 0E69 | B405 | 0B0E | AA00 | 0605 | 5F5F | 7566 | 636E |
| 0001621520 | 0201 | 0118 | B1DC | 05B5 | 032D | 0016 | 031F | 0000 |
| 0001621540 | 0904 | 6264 | 6D5F | 6D65 | 6863 | 0972 | 0C04 | E400 |
| 0001621560 | 0300 | 7562 | 0766 | 0A04 | 8100 | 0100 | 0B63 | 0604 |
| 0001621600 | 8200 | 0500 | 6F63 | 6E75 | 0C74 | FA04 | C0FF | 0600 |
| 0001621620 | 5F5F | 7974 | 6570 | 040F | FFEC | 0085 | 5F09 | 625F |
| 0001621640 | 5F78 | 7974 | 6570 | 040D | FFDC | 0266 | 5F07 | 705F |
| 0001621660 | 6972 | 746E | 040B | FFD2 | 0202 | 5F05 | 6C5F | 6C76 |
| 0001621700 | 040D | FFE0 | 05AC | 5F07 | 635F | 6F6C | 6B63 | 040D |
| 0001621720 | FFF6 | 00C0 | 5F07 | 735F | 6174 | 6B63 | 040E | FFD8 |
| 0001621740 | 00E4 | 5F08 | 725F | 7465 | 6176 | 076C | EE04 | 82FF |
| 0001621760 | 0100 | 0B69 | F204 | E4FF | 0500 | 5F63 | 7470 | 0E72 |
| 0001622000 | D805 | 0B0E | AA00 | 0605 | 5F5F | 7566 | 636E | 0201 |
| 0001622020 | 011D | B509 | 05B7 | 04FC | 0016 | 04EE | 0000 | 0E04 |
| 0001622040 | 6264 | 6D5F | 6D65 | 6E5F | 746F | 635F | 7268 | 0409 |
| 0001622060 | 000C | 00E4 | 6203 | 6675 | 0407 | 000A | 0081 | 6301 |
| 0001622100 | 040B | 0006 | 00B2 | 6305 | 756F | 746E | 040C | FFFA |
| 0001622120 | 00C0 | 5F06 | 745F | 7079 | 0F65 | F004 | 85FF | 0900 |
| 0001622140 | 5F5F | 7862 | 745F | 7079 | 0D65 | DC04 | 66FF | 0702 |
| 0001622160 | 5F5F | 7270 | 6E69 | 0B74 | D204 | 02FF | 0502 | 5F5F |
| 0001622200 | 766C | 0D6C | E004 | ACFF | 0705 | 5F5F | 6C63 | 636F |
| 0001622220 | 0D6B | F604 | C0FF | 0700 | 5F5F | 7473 | 6361 | 0E6B |

THU MAR 14 17:31:54 1991 DB_PI.DLL PAGE 394, LINE 23188

| | | | | | | | | |
|---|---|---|---|---|---|---|---|---|
| 0001622240 | D804 | E4FF | 0800 | 5F5F | 6572 | 7674 | 6C61 | 0412 |
| 0001622260 | FFD0 | 0085 | 720C | 7065 | 7465 | 5F65 | 6F63 | 6E75 |
| 0001622300 | 0774 | F204 | 82FF | 0100 | 0B69 | EC04 | E4FF | 0500 |
| 0001622320 | 6F70 | 6E69 | 0E74 | FC05 | 0B0E | B900 | 0605 | 5F5F |
| 0001622340 | 7566 | 636E | 0201 | 0118 | BA05 | 05BB | 06DB | 0016 |
| 0001622360 | 06CD | 0000 | 0904 | 6264 | 665F | 7277 | 7469 | 0C65 |
| 0001622400 | 1204 | E400 | 0600 | 7562 | 6666 | 7265 | 040A | 000E |
| 0001622420 | 0082 | 7304 | 7A69 | 0B65 | 0A04 | 8200 | 0500 | 6F63 |
| 0001622440 | 6E75 | 0C74 | 0604 | E300 | 0602 | 7473 | 6572 | 6D61 |
| 0001622460 | 040C | FFFA | 00C0 | 5F06 | 745F | 7079 | 0F65 | EE04 |
| 0001622500 | 85FF | 0900 | 5F5F | 7862 | 745F | 7079 | 0D65 | DE04 |
| 0001622520 | 66FF | 0702 | 5F5F | 7270 | 6E69 | 0B74 | D404 | 02FF |
| 0001622540 | 0502 | 5F5F | 766C | 0D6C | E204 | ACFF | 0705 | 5F5F |
| 0001622560 | 6C63 | 636F | 0D6B | F204 | C0FF | 0700 | 5F5F | 7473 |
| 0001622600 | 6361 | 0E6B | DA04 | 82FF | 0800 | 5F5F | 6572 | 7674 |
| 0001622620 | 6C61 | 040D | FFF0 | 0085 | 7407 | 706D | 635F | 746E |
| 0001622640 | 0411 | FFF8 | 0085 | 620B | 6769 | 625F | 6675 | 635F |
| 0001622660 | 746E | 0410 | FFF6 | 0085 | 730A | 6C6D | 625F | 6675 |
| 0001622700 | 735F | 0E7A | EE05 | 0B0F | AA00 | 0605 | 5F5F | 7566 |
| 0001622720 | 636E | 050D | 3C7C | 000B | 03AE | 6405 | 7461 | 3165 |
| 0001622740 | 050D | 3C70 | 000B | 03AE | 6405 | 7461 | 3265 | 0509 |
| 0001622760 | 0FF8 | 000B | 0088 | 7401 | 0512 | 0FFC | 000B | 0082 |
| 0001623000 | 74[illegible] | 746F | 6C61 | 735F | 7A69 | 0165 | 2202 | E001 |
| 0001623020 | C0C0 | D305 | 1606 | C500 | 0006 | 0400 | 4413 | 534F |
| 0001623040 | 575F | 4952 | 4554 | 645F | 5F62 | 7766 | 6972 | 6574 |
| 0001623060 | 0409 | 0012 | 00E4 | 6203 | 6675 | 040A | 000E | 0082 |
| 0001623100 | 7304 | 7A69 | 0E65 | 0A04 | 8200 | 0800 | 6E69 | 635F |
| 0001623120 | 756F | 746E | 040C | 0006 | 02E3 | 7306 | 7274 | 6165 |
| 0001623140 | 0D6D | D804 | ACFF | 0705 | 5F5F | 6C63 | 636F | 0D6B |
| 0001623160 | F204 | C0FF | 0700 | 5F5F | 7473 | 6361 | 0E6B | CA04 |
| 0001623200 | 82FF | 0800 | 5F5F | 6572 | 7674 | 6C61 | 040F | FFE4 |
| 0001623220 | 0085 | 7409 | 706D | 635F | 756F | 746E | 0407 | FFE6 |
| 0001623240 | 0082 | 6901 | 040B | FFEA | 0082 | 6305 | 756F | 746E |
| 0001623260 | 0408 | FFF0 | 0085 | 7302 | 0F74 | D204 | 85FF | 0900 |
| 0001623300 | 5F6E | 7277 | 7469 | 6574 | 0C6E | C204 | 85FF | 0600 |
| 0001623320 | 6168 | 646E | 656C | 040E | FFF6 | 0082 | 6608 | 6C69 |
| 0001623340 | 5F65 | 6F70 | 0B73 | D404 | E4FF | 0500 | 6F70 | 6E69 |
| 0001623360 | 0C74 | FA04 | C0FF | 0600 | 5F5F | 7974 | 6570 | 040F |
| 0001623400 | FFEE | 0085 | 5F09 | 625F | 5F78 | 7974 | 6570 | 040D |
| 0001623420 | FFCE | 0266 | 5F07 | 705F | 6972 | 746E | 040B | FFC4 |
| 0001623440 | 0202 | 5F05 | 6C5F | 6C76 | 050D | 3C94 | 000B | 03AE |
| 0001623460 | 6405 | 7461 | 3165 | 050D | 3C88 | 000B | 03AE | 6405 |
| 0001623500 | 7461 | 3265 | 0509 | 10EC | 000B | 0088 | 7401 | 0512 |
| 0001623520 | 10F0 | 000B | 0082 | 740A | 746F | 6C61 | 735F | 7A69 |
| 0001623540 | 0E65 | F405 | 0B10 | AA00 | 0605 | 5F5F | 7566 | 636E |
| 0001623560 | 0201 | 0117 | C7B3 | 05C5 | 0419 | 0016 | 040B | 0000 |
| 0001623600 | 0804 | 6264 | 665F | 6572 | 6461 | 040C | 0012 | 00E4 |
| 0001623620 | 6206 | 6675 | 6566 | 0A72 | 0E04 | 8200 | 0400 | 6973 |
| 0001623640 | 657A | 040B | 000A | 0082 | 6305 | 756F | 746E | 040C |
| 0001623660 | 0006 | 02E3 | 7306 | 7274 | 6165 | 0C6D | FA04 | C0FF |
| 0001623700 | 0600 | 5F5F | 7974 | 6570 | 040F | FFEE | 0085 | 5F09 |
| 0001623720 | 625F | 5F78 | 7974 | 6570 | 040D | FFDE | 0266 | 5F07 |
| 0001623740 | 705F | 6972 | 746E | 040B | FFD4 | 0202 | 5F05 | 6C5F |
| 0001623760 | 6C76 | 040D | FFE2 | 05AC | 5F07 | 635F | 6F6C | 6B63 |
| 0001624000 | 040D | FFF2 | 00C0 | 5F07 | 735F | 6174 | 6B63 | 040E |
| 0001624020 | FFDA | 0082 | 5F08 | 725F | 7465 | 6176 | 0D6C | F004 |
| 0001624040 | 85FF | 0700 | 6D74 | 5F70 | 6E63 | 1174 | F804 | 85FF |
| 0001624060 | 0B00 | 6962 | 5F67 | 7562 | 5F66 | 6E63 | 1074 | F604 |
| 0001624100 | 85FF | 0A00 | 6D73 | 5F6C | 7562 | 5F66 | 7A73 | 050E |

THU MAR 14 17:31:54 1991 DB_PI.DLL PAGE 395, LINE 23247

| | | | | | | | | |
|---|---|---|---|---|---|---|---|---|
| 0001624120 | 1112 | 000B | 05C6 | 5F06 | 665F | 6E75 | 0163 | 1402 |
| 0001624140 | CC01 | C8CB | 5D05 | 1600 | 4F00 | 0000 | 0400 | 6405 |
| 0001624160 | 5F62 | 7063 | 040C | 000E | 00C0 | 7306 | 756F | 6372 |
| 0001624200 | 0A65 | 0A04 | C000 | 0400 | 6564 | 7473 | 040F | 0008 |
| 0001624220 | 0085 | 6F09 | 6576 | 7772 | 6972 | 6574 | 0410 | 0006 |
| 0001624240 | 0085 | 6D0A | 6B61 | 5F65 | 6863 | 6C69 | 0164 | 0502 |
| 0001624260 | 000D | 1A00 | 0C00 | F605 | 0B30 | E200 | 0402 | 695F |
| 0001624300 | 626F | 050F | 0E74 | 000B | 00C0 | 4207 | 785F | 6946 |
| 0001624320 | 656C | 050F | 0E78 | 000B | 00C0 | 4207 | 785F | 6150 |
| 0001624340 | 6B63 | 0514 | 0000 | 0000 | 0081 | 420C | 5F78 | 6544 |
| 0001624360 | 7562 | 4D67 | 646F | 1465 | 0005 | 0000 | 8100 | 0C00 |
| 0001624400 | 7842 | 545F | 6D69 | 7365 | 6F4D | 6564 | 0510 | 0000 |
| 0001624420 | 0000 | 0081 | 4208 | 5F78 | 5F42 | 6973 | 0567 | 0211 |
| 0001624440 | 0000 | 1E00 | 2A01 | 6FCC | EE05 | 1001 | E300 | 0001 |
| 0001624460 | 0400 | 640F | 5F62 | 6E69 | 7469 | 725F | 6F6F | 5F74 |
| 0001624500 | 6264 | 0415 | 0006 | 053F | 640F | 5F62 | 6F72 | 746F |
| 0001624520 | 705F | 7274 | 615F | 7264 | 0408 | FFFC | 0081 | 7302 |
| 0001624540 | 0C74 | F804 | 85FF | 0600 | 6168 | 646E | 656C | 0409 |
| 0001624560 | FFFA | 0085 | 6503 | 7272 | 0201 | 0123 | CE18 | 0572 |
| 0001624600 | 00AF | 0010 | 00A4 | 0000 | 1404 | 6264 | 745F | 7265 |
| 0001624620 | 696D | 616E | 6574 | 725F | 6F6F | 5F74 | 6264 | 0201 |
| 0001624640 | 011D | CEC7 | 0574 | 005D | 0010 | 0052 | 0000 | 0E04 |
| 0001624660 | 6264 | 675F | 7465 | 725F | 6F6F | 5F74 | 6264 | 0415 |
| 0001624700 | 0006 | 053F | 640F | 5F62 | 6F72 | 746F | 705F | 7274 |
| 0001624720 | 615F | 7264 | 0201 | 011D | CF24 | 0575 | 0040 | 0010 |
| 0001624740 | 0035 | 0000 | 0E04 | 6264 | 735F | 7365 | 6973 | 6E6F |
| 0001624760 | 6F5F | 6666 | 0201 | 011D | CF64 | 0577 | 00E9 | 0010 |
| 0001625000 | 00DE | 0000 | 0E04 | 6264 | 745F | 6C62 | 675F | 7465 |
| 0001625020 | 745F | 7473 | 040C | 0006 | 0086 | 7406 | 7473 | 695F |
| 0001625040 | 0E64 | 0A04 | 8100 | 0800 | 6361 | 5F63 | 6F6D | 6564 |
| 0001625060 | 0411 | 000C | 0543 | 740B | 7473 | 705F | 7274 | 615F |
| 0001625100 | 7264 | 0407 | FFFC | 0085 | 6901 | 0201 | 011D | D04D |
| 0001625120 | 0579 | 01E4 | 0010 | 01D9 | 0000 | 0E04 | 6264 | 745F |
| 0001625140 | 6C62 | 615F | 6464 | 745F | 7473 | 040C | 0006 | 0086 |
| 0001625160 | 7406 | 7473 | 695F | 1164 | 0A04 | 4300 | 0B05 | 7374 |
| 0001625200 | 5F74 | 7470 | 5F72 | 6461 | 0D72 | FC04 | 85FF | 0700 |
| 0001625220 | 6D74 | 5F70 | 6E63 | 0D74 | F804 | C0FF | 0700 | 6D74 |
| 0001625240 | 5F70 | 7470 | 0772 | F604 | 85FF | 0100 | 0169 | 1D02 |
| 0001625260 | 3101 | 7BD2 | DA05 | 1000 | CF00 | 0000 | 0400 | 640E |
| 0001625300 | 5F62 | 6274 | 5F6C | 6564 | 5F6C | 7374 | 0C74 | 0604 |
| 0001625320 | 8600 | 0600 | 7374 | 5F74 | 6469 | 0407 | FFFC | 0085 |
| 0001625340 | 6901 | 0201 | 0122 | D30B | 057D | 00DA | 0010 | 00CF |
| 0001625360 | 0000 | 1304 | 6264 | 745F | 6572 | 5F65 | 6E69 | 7469 |
| 0001625400 | 735F | 7274 | 6375 | 0B74 | 0604 | 8600 | 0500 | 7264 |
| 0001625420 | 7669 | 0E65 | 0A04 | DE00 | 0804 | 7274 | 6565 | 615F |
| 0001625440 | 7264 | 040F | FFDE | 031B | 6409 | 6972 | 6576 | 735F |
| 0001625460 | 7274 | 0408 | FFDC | 0081 | 7302 | 0174 | 1F02 | E501 |
| 0001625500 | 82D3 | C205 | 1000 | B700 | 0000 | 0400 | 6410 | 5F62 |
| 0001625520 | 6F72 | 746F | 675F | 7465 | 745F | 6572 | 0B65 | 0604 |
| 0001625540 | 8600 | 0500 | 7264 | 7669 | 1265 | 0A04 | 4C00 | 0C05 |
| 0001625560 | 7274 | 6565 | 705F | 7274 | 615F | 7264 | 0407 | FFFC |
| 0001625600 | 0085 | 6901 | 0201 | 011F | D4A7 | 0584 | 01BA | 0010 |
| 0001625620 | 01AF | 000C | 1304 | 6264 | 725F | 6F6F | 5F74 | 6461 |
| 0001625640 | 5F64 | 7274 | 6565 | 040B | 0006 | 0086 | 6405 | 6972 |
| 0001625660 | 6576 | 0412 | 000A | 054C | 740C | 6572 | 5F65 | 7470 |
| 0001625700 | 5F72 | 6461 | 0D72 | FC04 | 85FF | 0700 | 6D74 | 5F70 |
| 0001625720 | 6E63 | 0D74 | F804 | C0FF | 0700 | 6D74 | 5F70 | 7470 |
| 0001625740 | 0772 | F404 | 85FF | 0100 | 0869 | F604 | 81FF | 0200 |
| 0001625760 | 7473 | 0201 | 011F | D661 | 0586 | 0133 | 0010 | 0128 |

THU MAR 14 17:31:54 1991 DB_PI.DLL PAGE 396, LINE 23306

| | | | | | | | | |
|---|---|---|---|---|---|---|---|---|
| 0001626000 | 0000 | 1004 | 6264 | 725F | 6F6F | 5F74 | 6564 | 5F6C |
| 0001626020 | 7274 | 6565 | 040B | 0006 | 0086 | 6405 | 6972 | 6576 |
| 0001626040 | 0407 | FFFC | 0085 | 6901 | 0201 | 0120 | D794 | 0588 |
| 0001626060 | 00A0 | 0010 | 0095 | 0000 | 1104 | 6264 | 675F | 7465 |
| 0001626100 | 645F | 6972 | 6576 | 745F | 6572 | 0B65 | 0604 | 8600 |
| 0001626120 | 0500 | 7264 | 7669 | 1265 | 0A04 | 4C00 | 0C05 | 7274 |
| 0001626140 | 6565 | 705F | 7274 | 615F | 7264 | 0408 | FFFC | 0081 |
| 0001626160 | 7302 | 0174 | 2202 | 3401 | 8AD8 | 7E05 | 1001 | 7300 |
| 0001626200 | 0001 | 0400 | 6413 | 5F62 | 6567 | 5F74 | 6F6C | 7067 |
| 0001626220 | 7461 | 5F68 | 7274 | 6565 | 040D | 0006 | 00C0 | 6C07 |
| 0001626240 | 676F | 617D | 6874 | 040C | 000A | 0086 | 6F06 | 6A62 |
| 0001626260 | 695F | 1264 | 0E04 | 4C00 | 0C05 | 7274 | 6565 | 705F |
| 0001626300 | 7274 | 615F | 7264 | 0411 | 0012 | 0210 | 6C0B | 676F |
| 0001626320 | 705F | 7274 | 615F | 7264 | 040B | FFF6 | 0086 | 6405 |
| 0001626340 | 6972 | 6576 | 0409 | FFFC | 0085 | 6903 | 7864 | 0408 |
| 0001626360 | FFFA | 0081 | 7302 | 0174 | 1D02 | B201 | 8CD9 | FE05 |
| 0001626400 | 1000 | F300 | 0000 | 0400 | 640E | 5F62 | 6E75 | 6F6C |
| 0001626420 | 6461 | 745F | 6572 | 0B65 | 0604 | 8600 | 0500 | 7264 |
| 0001626440 | 7669 | 0E65 | FA04 | DEFF | 0804 | 7274 | 6565 | 705F |
| 0001626460 | 7274 | 0407 | FFF6 | 0085 | 6901 | 0408 | FFF8 | 0081 |
| 0001626500 | 7302 | 0174 | 2202 | B001 | 8DDA | B305 | 1000 | A800 |
| 0001626520 | 0000 | 0400 | 6413 | 5F62 | 6E75 | 6F6C | 6461 | 615F |
| 0001626540 | 6C6C | 745F | 6572 | 7365 | 0407 | FFF8 | 0085 | 6901 |
| 0001626560 | 0408 | FFFA | 0081 | 7302 | 0C74 | FC04 | 81FF | 0600 |
| 0001626600 | 6D74 | 5F70 | 7473 | 0201 | 0122 | DB63 | 058F | 0089 |
| 0001626620 | 0010 | 007E | 0000 | 1304 | 6264 | 745F | 6172 | 736E |
| 0001626640 | 645F | 6972 | 6576 | 6E5F | 6D61 | 1065 | 0604 | C000 |
| 0001626660 | 0A00 | 7264 | 7669 | 5F65 | 616E | 656D | 040F | 000A |
| 0001626700 | 00C6 | 6409 | 6972 | 6576 | 615F | 7264 | 040F | FFFC |
| 0001626720 | 0080 | 6409 | 6972 | 6576 | 635F | 7268 | 0201 | 011F |
| 0001626740 | DBEC | 0591 | 003C | 0010 | 0031 | 0000 | 1004 | 6264 |
| 0001626760 | 675F | 7465 | 645F | 6972 | 6576 | 735F | 7274 | 040B |
| 0001627000 | 0006 | 0086 | 6405 | 6972 | 6576 | 040F | 000A | 00C0 |
| 0001627020 | 6409 | 6972 | 6576 | 735F | 7274 | 0201 | 011D | DC28 |
| 0001627040 | 0593 | 0033 | 0010 | 0028 | 0000 | 0E04 | 6264 | 725F |
| 0001627060 | 6F6F | 5F74 | 6573 | 5F74 | 6477 | 040B | 0006 | 0086 |
| 0001627100 | 6405 | 6972 | 6576 | 0201 | 0124 | DC5B | 0594 | 020A |
| 0001627120 | 0010 | 01FF | 0000 | 1504 | 6264 | 735F | 7465 | 645F |
| 0001627140 | 6665 | 7561 | 746C | 705F | 7261 | 6D61 | 0C73 | EE04 |
| 0001627160 | 86FF | 0600 | 6663 | 5F67 | 6469 | 040E | FEEE | 0493 |
| 0001627200 | 6C08 | 676F | 705F | 7461 | 0E68 | FA04 | 85FF | 0800 |
| 0001627220 | 696C | 656E | 6E5F | 6D75 | 0410 | FFF2 | 00C0 | 640A |
| 0001627240 | 6972 | 6576 | 6E5F | 6D61 | 0B65 | F604 | 86FF | 0500 |
| 0001627260 | 7264 | 7669 | 0865 | FC04 | 81FF | 0200 | 7473 | 0201 |
| 0001627300 | 0124 | DE65 | 059B | 00AC | 0010 | 00A1 | 0000 | 1504 |
| 0001627320 | 6264 | 765F | 6C61 | 6469 | 7461 | 5F65 | 7566 | 6C6C |
| 0001627340 | 705F | 7461 | 0E68 | 0604 | DE00 | 0804 | 7274 | 6565 |
| 0001627360 | 705F | 7274 | 040A | 000A | 00C0 | 7004 | 7461 | 0F68 |
| 0001627400 | 0E04 | C000 | 0900 | 7566 | 6C6C | 705F | 7461 | 0868 |
| 0001627420 | FC04 | 81FF | 0200 | 7473 | 0201 | 0124 | DF11 | 059C |
| 0001627440 | 0065 | 0010 | 005A | 0000 | 1504 | 6264 | 725F | 6F6F |
| 0001627460 | 5F74 | 6E69 | 7469 | 695F | 676D | 6C5F | 7369 | 0174 |
| 0001627500 | 2302 | 7601 | 9EDF | B705 | 1001 | AC00 | 0001 | 040G |
| 0001627520 | 6414 | 5F62 | 6F72 | 746F | 615F | 6464 | 6F5F | 6570 |
| 0001627540 | 5F6E | 6D69 | 0C67 | 0604 | 8600 | 0600 | 7374 | 5F74 |
| 0001627560 | 6469 | 0411 | 000A | 00C5 | 690B | 676D | 685F | 6C64 |
| 0001627600 | 705F | 7274 | 0413 | 000E | 0555 | 6F0D | 6570 | 5F6E |
| 0001627620 | 6D69 | 5F67 | 6170 | 7264 | 040D | FFFA | 0528 | 7407 |
| 0001627640 | 706D | 705F | 7274 | 0407 | FFF8 | 0085 | 6901 | 0201 |

THU MAR 14 17:31:54 1991 DB_PI.DLL PAGE 397, LINE 23365

| | | | | | | | | |
|---|---|---|---|---|---|---|---|---|
| 0001627660 | 0123 | E12D | 05A0 | 00ED | 0010 | 00E2 | 0000 | 1404 |
| 0001627700 | 6264 | 725F | 6F6F | 5F74 | 6567 | 5F74 | 706F | 6E65 |
| 0001627720 | 695F | 676D | 040C | 0006 | 0086 | 7406 | 7473 | 695F |
| 0001627740 | 0D64 | 0A04 | 8500 | 0700 | 6D69 | 5F67 | 6468 | 136C |
| 0001627760 | 0C04 | 5500 | 0D05 | 706F | 6E65 | 695F | 676D | 705F |
| 0001630000 | 6461 | 0172 | 2302 | 1A01 | A2E2 | 6C05 | 1000 | 6100 |
| 0001630020 | 0000 | 0400 | 6414 | 5F62 | 6F72 | 746F | 645F | 6C65 |
| 0001630040 | 6F5F | 6570 | 5F6E | 6D69 | 0C67 | 0604 | 8600 | 0600 |
| 0001630060 | 7374 | 5F74 | 6469 | 040D | 000A | 0085 | 6907 | 676D |
| 0001630100 | 685F | 6C64 | 0408 | FFF8 | 0081 | 7302 | 1274 | FA04 |
| 0001630120 | 28FF | 0C05 | 706F | 6E65 | 695F | 676D | 705F | 7274 |
| 0001630140 | 0201 | 0129 | E286 | 05A4 | 00AC | 0010 | 00A1 | 0000 |
| 0001630160 | 1A04 | 6264 | 725F | 6F6F | 5F74 | 6163 | 636E | 6C65 |
| 0001630200 | 615F | 6C6C | 695F | 676D | 6F5F | 7370 | 040C | 0006 |
| 0001630220 | 0086 | 7406 | 7473 | 695F | 0D64 | F804 | 85FF | 0700 |
| 0001630240 | 6D69 | 5F67 | 6468 | 126C | FA04 | 28FF | 0C05 | 706F |
| 0001630260 | 6E65 | 695F | 676D | 705F | 7274 | 0408 | FFF6 | 0081 |
| 0001630300 | 7302 | 0174 | 2302 | 3201 | A6E3 | 3805 | 1000 | 2D00 |
| 0001630320 | 0000 | 0400 | 6414 | 5F62 | 6F72 | 746F | 675F | 7465 |
| 0001630340 | 645F | 6C6C | 705F | 7461 | 0E68 | 0604 | C000 | 0800 |
| 0001630360 | 6170 | 6874 | 616E | 656D | 0201 | 0127 | E36A | 05A7 |
| 0001630400 | 003C | 0010 | 0031 | 0000 | 1804 | 6264 | 725F | 6F6F |
| 0001630420 | 5F74 | 6E69 | 7469 | 635F | 6766 | 745F | 6C62 | 6C5F |
| 0001630440 | 7473 | 0201 | 0127 | E3A6 | 05A9 | 032D | 0010 | 0322 |
| 0001630460 | 0000 | 1804 | 6264 | 725F | 6F6F | 5F74 | 7263 | 6165 |
| 0001630500 | 6574 | 745F | 6261 | 656C | 665F | 726F | 040C | 0006 |
| 0001630520 | 0086 | 6F06 | 6A62 | 695F | 1464 | 0A04 | 8500 | 0E00 |
| 0001630540 | 6C63 | 6165 | 5F72 | 7865 | 7369 | 6974 | 676E | 0411 |
| 0001630560 | 000C | 04CA | 6F0B | 6A62 | 735F | 6D79 | 745F | 6261 |
| 0001630600 | 0408 | FFFA | 0081 | 7302 | 0774 | EE04 | 85FF | 0100 |
| 0001630620 | 0C69 | EA04 | 85FF | 0600 | 6176 | 6163 | 746E | 0412 |
| 0001630640 | FFF8 | 0085 | 760C | 6361 | 6E61 | 5F74 | 6F66 | 6E75 |
| 0001630660 | 1064 | EC04 | 85FF | 0A00 | 656B | 7065 | 635F | 756F |
| 0001630700 | 746E | 040F | FFFC | 0085 | 6F09 | 646C | 635F | 756F |
| 0001630720 | 746E | 0418 | FFF0 | 0530 | 7412 | 706D | 735F | 6D79 |
| 0001630740 | 6F62 | 5F6C | 6274 | 5F6C | 736C | 1474 | F404 | 30FF |
| 0001630760 | 0E05 | 7973 | 626D | 6C6F | 745F | 6C62 | 6C5F | 7473 |
| 0001631000 | 0201 | 0127 | E6D3 | 05AB | 0159 | 0010 | 014E | 0000 |
| 0001631020 | 1804 | 6264 | 725F | 6F6F | 5F74 | 6572 | 6F6D | 6576 |
| 0001631040 | 745F | 6261 | 656C | 665F | 726F | 040C | 0006 | 0086 |
| 0001631060 | 6F06 | 6A62 | 695F | 0B64 | 0A04 | 8500 | 0500 | 6F66 |
| 0001631100 | 6372 | 0765 | F604 | 85FF | 0100 | 0869 | FC04 | 81FF |
| 0001631120 | 0200 | 7473 | 0414 | FFF8 | 0530 | 730E | 6D79 | 6F62 |
| 0001631140 | 5F6C | 6274 | 5F6C | 736C | 0174 | 2402 | 2C01 | ADE8 |
| 0001631160 | CE05 | 1000 | C300 | 0000 | 0400 | 6415 | 5F62 | 6F72 |
| 0001631200 | 746F | 675F | 7465 | 745F | 6261 | 656C | 665F | 726F |
| 0001631220 | 040C | 0006 | 0086 | 6F06 | 6A62 | 695F | 1564 | 0A04 |
| 0001631240 | CA00 | 0F04 | 626F | 5F6A | 7973 | 5F6D | 6174 | 5F62 |
| 0001631260 | 6461 | 0772 | F604 | 85FF | 0100 | 0869 | FC04 | 81FF |
| 0001631300 | 0200 | 7473 | 0414 | FFF8 | 0530 | 730E | 6D79 | 6F62 |
| 0001631320 | 5F6C | 6274 | 5F6C | 736C | 0174 | 2502 | FA01 | AFE8 |
| 0001631340 | 5405 | 1000 | 4900 | 0000 | 0400 | 6416 | 5F62 | 6F72 |
| 0001631360 | 746F | 675F | 7465 | 665F | 6C69 | 6574 | 5F72 | 696C |
| 0001631400 | 1862 | 0604 | 6000 | 1205 | 6966 | 746C | 7265 | 6C5F |
| 0001631420 | 6269 | 705F | 7274 | 615F | 7264 | 0201 | 0123 | E94E |
| 0001631440 | 05B1 | 0054 | 0010 | 0049 | 0000 | 1404 | 6264 | 725F |
| 0001631460 | 6F6F | 5F74 | 6567 | 5F74 | 6369 | 6E6F | 6C5F | 6269 |
| 0001631500 | 0416 | 0006 | 0560 | 6910 | 6F63 | 5F6E | 696C | 5F62 |
| 0001631520 | 7470 | 5F72 | 6461 | 0172 | 2102 | A201 | B3E9 | 6705 |

THU MAR 14 17:31:54 1991 DB_PI.DLL PAGE 398, LINE 23424

| | | | | | | | | |
|---|---|---|---|---|---|---|---|---|
| 0001631540 | 1000 | 5C00 | 0000 | 0400 | 6412 | 5F62 | 6F72 | 746F |
| 0001631560 | 675F | 7465 | 735F | 5F70 | 6468 | 0F72 | 0604 | C500 |
| 0001631600 | 0900 | 6F63 | 6E75 | 5F74 | 6461 | 1072 | 0A04 | 7C00 |
| 0001631620 | 0A04 | 6469 | 6C5F | 7473 | 615F | 7264 | 0201 | 011D |
| 0001631640 | EA09 | 05B5 | 00A0 | 0010 | 0095 | 0000 | 0E04 | 6264 |
| 0001631660 | 725F | 6F6F | 5F74 | 6573 | 5F74 | 7073 | 040E | 0006 |
| 0001631700 | 0085 | 7008 | 7461 | 5F68 | 6E63 | 0E74 | 0804 | 1000 |
| 0001631720 | 0802 | 6170 | 6874 | 6C5F | 7473 | 0201 | 011E | EAA9 |
| 0001631740 | 05B6 | 01AB | 0010 | 01A0 | 0000 | 0F04 | 6264 | 725F |
| 0001631760 | 6F6F | 5F74 | 6163 | 636C | 735F | 0770 | F804 | 85FF |
| 0001632000 | 0100 | 0C69 | FC04 | 85FF | 0600 | 6469 | 635F | 746E |
| 0001632020 | 040C | FFF4 | 00C6 | 6906 | 5F64 | 736C | 0874 | FA04 |
| 0001632040 | 81FF | 0200 | 7473 | 0201 | 0122 | EC54 | 05B8 | 0091 |
| 0001632060 | 0010 | 0086 | 0000 | 1304 | 6264 | 695F | 5F73 | 7974 |
| 0001632100 | 6570 | 615F | 6363 | 6D5F | 646F | 0E65 | 0604 | 8100 |
| 0001632120 | 0800 | 626F | 5F6A | 7974 | 6570 | 0201 | 0D05 | 0000 |
| 0001632140 | 001A | 0514 | 1130 | 000B | 0540 | 640C | 3062 | 725F |
| 0001632160 | 6F6F | 5F74 | 7470 | 1372 | 3405 | 0B11 | 6A00 | 0B05 |
| 0001632200 | 6264 | 5F30 | 6D69 | 5F67 | 6361 | 1363 | 3A05 | 0B11 |
| 0001632220 | 6A00 | 0B05 | 6264 | 5F30 | 6567 | 5F6E | 6361 | 2363 |
| 0001632240 | 4005 | 0B11 | 6D00 | 1B05 | 6264 | 5F30 | 6564 | 6166 |
| 0001632260 | 6C75 | 5F74 | 6966 | 746C | 7265 | 6C5F | 6269 | 705F |
| 0001632300 | 7461 | 2168 | 4405 | 0B11 | 6D00 | 1905 | 6264 | 5F30 |
| 0001632320 | 6564 | 6166 | 6C75 | 5F74 | 6369 | 6E6F | 6C5F | 6269 |
| 0001632340 | 705F | 7461 | 0568 | 0311 | 0000 | 1E00 | 0001 | A700 |
| 0001632360 | 6605 | 1001 | 5B00 | 0001 | 0400 | 640F | 7374 | 745F |
| 0001632400 | 6C62 | 615F | 6464 | 695F | 676D | 040D | 0006 | 04D6 |
| 0001632420 | 7407 | 7473 | 705F | 7274 | 0411 | 000A | 03ED | 690B |
| 0001632440 | 676D | 685F | 7264 | 705F | 7274 | 040E | 000E | 0085 |
| 0001632460 | 6808 | 7264 | 6F5F | 6C6E | 1179 | 1004 | 8100 | 0B00 |
| 0001632500 | 7263 | 6165 | 6574 | 6D5F | 646F | 0A65 | 4404 | 81FF |
| 0001632520 | 0400 | 6973 | 657A | 0414 | FFFC | 0085 | 6F0E | 6576 |
| 0001632540 | 7772 | 6972 | 6574 | 665F | 616C | 1167 | 4604 | DFFF |
| 0001632560 | 0B03 | 6D74 | 5F70 | 6D69 | 5F67 | 6468 | 0872 | FA04 |
| 0001632600 | 81FF | 0200 | 7473 | 0201 | 011E | 0166 | 05A9 | 0198 |
| 0001632620 | 0010 | 018D | 0000 | 0F04 | 7464 | 5F73 | 6274 | 5F6C |
| 0001632640 | 6567 | 5F74 | 6D69 | 0D67 | 0604 | D600 | 0704 | 7374 |
| 0001632660 | 5F74 | 7470 | 0E72 | 0A04 | C000 | 0800 | 6D69 | 5F67 |
| 0001632700 | 616E | 656D | 040E | 000E | 0081 | 6908 | 676D | 745F |
| 0001632720 | 7079 | 0C65 | 1004 | 8600 | 0600 | 6D69 | 5F67 | 6469 |
| 0001632740 | 040F | 0014 | 0081 | 6409 | 7461 | 5F61 | 6973 | 657A |
| 0001632760 | 0411 | 0016 | 03ED | 690B | 676D | 685F | 7264 | 615F |
| 0001633000 | 7264 | 0410 | FFF2 | 0081 | 740A | 746F | 6C61 | 735F |
| 0001633020 | 7A69 | 1165 | F404 | C4FF | 0B00 | 6D74 | 5F70 | 6973 |
| 0001633040 | 5F67 | 7470 | 1272 | F804 | E4FF | 0C00 | 6D74 | 5F70 |
| 0001633060 | 7462 | 706D | 705F | 7274 | 0408 | FFFC | 0081 | 7302 |
| 0001633100 | 0174 | 1E02 | FE01 | AB02 | 9105 | 1000 | 8600 | 0000 |
| 0001633120 | 0400 | 640F | 7374 | 745F | 6C62 | 645F | 6C65 | 695F |
| 0001633140 | 676D | 040D | 0006 | 04D6 | 7407 | 7473 | 705F | 7274 |
| 0001633160 | 0411 | 000A | 03ED | 690B | 676D | 685F | 7264 | 705F |
| 0001633200 | 7274 | 0408 | FFFC | 0081 | 7302 | 0174 | 2302 | 8F01 |
| 0001633220 | AD03 | ED05 | 1000 | E200 | 0000 | 0400 | 6414 | 7374 |
| 0001633240 | 615F | 6464 | 645F | 6C62 | 5F6B | 6F74 | 6C5F | 7369 |
| 0001633260 | 0A74 | 0604 | C000 | 0400 | 616E | 656D | 0408 | 000A |
| 0001633300 | 0086 | 6902 | 1064 | 0E04 | 8200 | 0A00 | 6974 | 656D |
| 0001633320 | 735F | 6174 | 706D | 040F | 0012 | 00C5 | 6109 | 6C6C |
| 0001633340 | 636F | 7461 | 6465 | 040A | 0016 | 00C5 | 7504 | 6573 |
| 0001633360 | 0D64 | 1A04 | 9B00 | 0705 | 736C | 5F74 | 6461 | 0172 |
| 0001633400 | 2002 | 7C01 | AF04 | 5905 | 1000 | 4E00 | 0000 | 0400 |

THU MAR 14 17:31:54 1991 DB_PI.DLL PAGE 399, LINE 23483

| | | | | | | | | |
|---|---|---|---|---|---|---|---|---|
| 0001633420 | 6411 | 7374 | 745F | 7572 | 636E | 7461 | 5F65 | 696C |
| 0001633440 | 7473 | 040C | 0006 | 0085 | 6C06 | 6E65 | 7467 | 0A68 |
| 0001633460 | 0804 | 8500 | 0400 | 6973 | 657A | 040D | 000A | 059F |
| 0001633500 | 6C07 | 7473 | 615F | 7264 | 0201 | 0124 | 04D5 | 05B1 |
| 0001633520 | 00DD | 0010 | 00D2 | 0000 | 1504 | 7464 | 5F73 | 6F63 |
| 0001633540 | 706D | 645F | 6C62 | 5F6B | 7962 | 745F | 6D69 | 0B65 |
| 0001633560 | 0604 | 9C00 | 0505 | 6966 | 7372 | 0C74 | 0A04 | 9C00 |
| 0001633600 | 0605 | 6573 | 6F63 | 646E | 0201 | 0124 | 05B2 | 05B3 |
| 0001633620 | 0078 | 0010 | 006D | 0000 | 1504 | 7464 | 5F73 | 6F63 |
| 0001633640 | 706D | 645F | 6C62 | 5F6B | 7962 | 6E5F | 6D61 | 0B65 |
| 0001633660 | 0604 | 9C00 | 0505 | 6966 | 7372 | 0C74 | 0A04 | 9C00 |
| 0001633700 | 0605 | 6573 | 6F63 | 646E | 0409 | FFFC | 0081 | 6303 |
| 0001633720 | 706D | 0201 | 0126 | 062A | 05B5 | 00B8 | 0010 | 00AD |
| 0001633740 | 0000 | 1704 | 7464 | 5F73 | 7063 | 645F | 6C62 | 736B |
| 0001633760 | 745F | 5F6F | 626F | 5F6A | 736C | 1274 | 0604 | 9B00 |
| 0001634000 | 0C05 | 6164 | 6174 | 625F | 6B6C | 6C5F | 7473 | 040C |
| 0001634020 | 000A | 0085 | 6C06 | 6E65 | 7467 | 1168 | 0C04 | CFU0 |
| 0001634040 | 0B03 | 626F | 5F6A | 736C | 5F74 | 6461 | 0172 | 2002 |
| 0001634060 | E201 | B706 | 0505 | 1003 | FA00 | 0002 | 0400 | 6411 |
| 0001634100 | 7374 | 745F | 6C62 | 6C5F | 7369 | 5F74 | 6D69 | 7367 |
| 0001634120 | 040D | 0006 | 04D6 | 7407 | 7473 | 705F | 7274 | 040E |
| 0001634140 | 000A | 0081 | 6908 | 676D | 745F | 7079 | 1065 | 0C04 |
| 0001634160 | 8100 | 0A00 | 696C | 7473 | 6F5F | 6472 | 7265 | 0411 |
| 0001634200 | 000E | 00C5 | 6C0B | 7473 | 635F | 746E | 615F | 7264 |
| 0001634220 | 0411 | 0012 | 03CF | 620B | 6B6C | 6C5F | 7473 | 615F |
| 0001634240 | 7264 | 0411 | FF36 | 03DF | 740B | 706D | 695F | 676D |
| 0001634260 | 685F | 7264 | 040D | FFEE | 0081 | 6B07 | 7965 | 6E5F |
| 0001634300 | 6D75 | 040D | FF12 | 00C0 | 6B07 | 7965 | 705F | 7274 |
| 0001634320 | 040E | FF16 | 02FE | 6F08 | 6A62 | 6E5F | 6D61 | 0C65 |
| 0001634340 | F204 | 86FF | 0600 | 626F | 5F6A | 6469 | 040E | FFF0 |
| 0001634360 | 0081 | 6808 | 7264 | 735F | 7A69 | 0D65 | F804 | 85FF |
| 0001634400 | 0700 | 6D74 | 5F70 | 6E63 | 1274 | FA04 | 9CFF | 0C05 |
| 0001634420 | 6164 | 6174 | 625F | 6B6C | 6C5F | 7473 | 040F | FFEA |
| 0001634440 | 05B8 | 6309 | 6D6F | 5F70 | 7566 | 636E | 0408 | FFF6 |
| 0001634460 | 0081 | 7302 | 0174 | 2602 | E701 | BC09 | A905 | 1000 |
| 0001634500 | 9E00 | 0000 | 0400 | 6417 | 7374 | 635F | 6572 | 7461 |
| 0001634520 | 5F65 | 7462 | 7672 | 695F | 676D | 735F | 6264 | 0411 |
| 0001634540 | 0006 | 0482 | 740B | 6C62 | 685F | 6C64 | 705F | 7274 |
| 0001634560 | 040E | 000A | 00C0 | 7008 | 7461 | 6E68 | 6D61 | 0E65 |
| 0001634600 | 0E04 | 8100 | 0800 | 6D69 | 5F67 | 7974 | 6570 | 0412 |
| 0001634620 | 0010 | 00C0 | 690C | 676D | 645F | 7269 | 6E5F | 6D61 |
| 0001634640 | 0E65 | 4A04 | DFFF | 0803 | 6574 | 706D | 695F | 676D |
| 0001634660 | 0408 | FF48 | 0081 | 7302 | 0174 | 1F02 | 9001 | BE0A |
| 0001634700 | A205 | 1001 | 9700 | 0001 | 0400 | 6410 | 7374 | 6C5F |
| 0001634720 | 616F | 5F64 | 6D69 | 5F67 | 6274 | 0D6C | 0604 | D600 |
| 0001634740 | 0704 | 7374 | 5F74 | 7470 | 0E72 | 0A04 | 8100 | 0800 |
| 0001634760 | 6D69 | 5F67 | 7974 | 6570 | 0411 | 000C | 0081 | 610B |
| 0001635000 | 6363 | 7365 | 5F73 | 6F6D | 6564 | 040F | FFFC | 0081 |
| 0001635020 | 6209 | 7274 | 5F76 | 6F6D | 6564 | 0408 | FFFA | 0081 |
| 0001635040 | 7302 | 0174 | 2102 | 3201 | C00C | 5905 | 1000 | 4E00 |
| 0001635060 | 0000 | 0400 | 6412 | 7374 | 755F | 6C6E | 616F | 5F64 |
| 0001635100 | 6D69 | 5F67 | 6274 | 0D6C | 0604 | D600 | 0704 | 7374 |
| 0001635120 | 5F74 | 7470 | 0E72 | 0A04 | 8100 | 0800 | 6D69 | 5F67 |
| 0001635140 | 7974 | 6570 | 0408 | FFFC | 0081 | 7302 | 0174 | 2602 |
| 0001635160 | 8B01 | C20C | F105 | 1000 | E600 | 0000 | 0400 | 6417 |
| 0001635200 | 7374 | 755F | 6C6E | 616F | 5F64 | 6C61 | 5F6C | 6D69 |
| 0001635220 | 5F67 | 6274 | 736C | 040D | 0006 | 04D6 | 7407 | 7473 |
| 0001635240 | 705F | 7274 | 0409 | FEFA | 0081 | 7403 | 7079 | 0412 |
| 0001635260 | FEFC | 046A | 740C | 706D | 665F | 6C69 | 7365 | 6570 |

THU MAR 14 17:31:54 1991 DB_PI.DLL PAGE 400, LINE 23542

| | | | | | | | | |
|---|---|---|---|---|---|---|---|---|
| 0001635300 | 0863 | FC04 | 81FF | 0200 | 7473 | 0201 | 011D | 0D7C |
| 0001635320 | 05C6 | 00AD | 0010 | 00A2 | 0000 | 0E04 | 7464 | 5F73 |
| 0001635340 | 6564 | 656C | 6574 | 695F | 676D | 040D | 0006 | 04D6 |
| 0001635360 | 7407 | 7473 | 705F | 7274 | 040D | 000A | 03ED | 6907 |
| 0001635400 | 676D | 685F | 7264 | 0413 | FEFC | 046A | 660D | 6C69 |
| 0001635420 | 5F65 | 6170 | 6874 | 616E | 656D | 0408 | FFFC | 0081 |
| 0001635440 | 7302 | 0174 | 2002 | 2901 | C80E | AB05 | 1001 | A000 |
| 0001635460 | 0001 | 0400 | 6411 | 7374 | 635F | 656C | 6E61 | 695F |
| 0001635500 | 676D | 745F | 6C62 | 040D | 0006 | 04D6 | 7407 | 7473 |
| 0001635520 | 705F | 7274 | 040E | 000A | 0081 | 6908 | 676D | 745F |
| 0001635540 | 7079 | 0865 | FA04 | 81FF | 0200 | 7473 | 040C | FFFC |
| 0001635560 | 0081 | 7206 | 7465 | 735F | 0E74 | F804 | 81FF | 0800 |
| 0001635600 | 6468 | 5F72 | 6973 | 657A | 0409 | FFF4 | 0086 | 6B03 |
| 0001635620 | 7965 | 040D | FF40 | 03DF | 6907 | 676D | 685F | 7264 |
| 0001635640 | 0412 | FE40 | 046A | 740C | 706D | 665F | 6C69 | 7365 |
| 0001635660 | 6570 | 0163 | 2502 | D401 | CA0F | 6005 | 1000 | 5500 |
| 0001635700 | 0000 | 0400 | 6416 | 7374 | 635F | 656C | 6E61 | 615F |
| 0001635720 | 6C6C | 695F | 676D | 745F | 6C62 | 0D73 | 0604 | D600 |
| 0001635740 | 0704 | 7374 | 5F74 | 7470 | 0E72 | F804 | 81FF | 0800 |
| 0001635760 | 6D69 | 5F67 | 7974 | 6570 | 0408 | FFFA | 0081 | 7302 |
| 0001636000 | 0C74 | FC04 | 81FF | 0600 | 6572 | 5F74 | 7473 | 0201 |
| 0001636020 | 0122 | 1034 | 05CC | 00CB | 0010 | 00C0 | 0000 | 1304 |
| 0001636040 | 7464 | 5F73 | 6567 | 5F74 | 616C | 7473 | 695F | 676D |
| 0001636060 | 695F | 0D64 | 0604 | D600 | 0704 | 7374 | 5F74 | 7470 |
| 0001636100 | 0E72 | 0A04 | 8100 | 0800 | 6D69 | 5F67 | 7974 | 6570 |
| 0001636120 | 040C | 000C | 00C6 | 6906 | 5F64 | 7470 | 0872 | FC04 |
| 0001636140 | 81FF | 0200 | 7473 | 040A | FF46 | 0081 | 7304 | 7A69 |
| 0001636160 | 0D65 | 4804 | DFFF | 0703 | 6D69 | 5F67 | 6468 | 0172 |
| 0001636200 | 2602 | FF01 | CE10 | 2105 | 1000 | 1600 | 0000 | 0400 |
| 0001636220 | 6417 | 7374 | 725F | 6365 | 6E6F | 7473 | 7572 | 7463 |
| 0001636240 | 695F | 676D | 745F | 6C62 | 040D | 0006 | 04D6 | 7407 |
| 0001636260 | 7473 | 705F | 7274 | 040D | 000A | 0086 | 6907 | 676D |
| 0001636300 | 745F | 7079 | 0201 | 011B | 1120 | 05D0 | 028D | 0010 |
| 0001636320 | 0282 | 0000 | 0C04 | 7464 | 5F73 | 6173 | 6576 | 695F |
| 0001636340 | 676D | 040D | 0006 | 04D6 | 7407 | 7473 | 705F | 7274 |
| 0001636360 | 0412 | 000A | 00C0 | 6F0C | 646C | 665F | 6C69 | 6E65 |
| 0001636400 | 6D61 | 1165 | 0E04 | 8100 | 0B00 | 7263 | 6165 | 6574 |
| 0001636420 | 6D5F | 646F | 1065 | 1004 | 8500 | 0A00 | 6162 | 6B63 |
| 0001636440 | 7267 | 756F | 646E | 040E | 0012 | 0081 | 6308 | 6D6F |
| 0001636460 | 7270 | 7365 | 1073 | 1404 | 8500 | 0A00 | 6564 | 6C61 |
| 0001636500 | 6F6C | 6163 | 6574 | 0411 | 0016 | 03ED | 690B | 676D |
| 0001636520 | 685F | 7264 | 705F | 7274 | 0410 | 001A | 00C6 | 690A |
| 0001636540 | 676D | 695F | 5F64 | 6461 | 1372 | FC04 | 6AFE | 0D04 |
| 0001636560 | 6966 | 656C | 705F | 7461 | 6E68 | 6D61 | 0E65 | FA04 |
| 0001636600 | 85FE | 0800 | 6468 | 5F72 | 6E6F | 796C | 0408 | FFFC |
| 0001636620 | 0081 | 7302 | 0174 | 2002 | AD01 | D213 | B405 | 1003 |
| 0001636640 | A900 | 0003 | 0400 | 6411 | 7374 | 695F | 676D | 695F |
| 0001636660 | 746E | 6765 | 6972 | 7974 | 040D | 0006 | 04D6 | 7407 |
| 0001636700 | 7473 | 705F | 7274 | 040E | 000A | 0081 | 6908 | 676D |
| 0001636720 | 745F | 7079 | 0E65 | 0C04 | 8500 | 0800 | 6966 | 5F78 |
| 0001636740 | 6C66 | 6761 | 040A | 000E | 00C5 | 7504 | 6573 | 1464 |
| 0001636760 | 1204 | 3E00 | 0E05 | 6D69 | 6761 | 5F65 | 696C | 7473 |
| 0001637000 | 615F | 7264 | 0408 | FFF8 | 0081 | 7302 | 0E74 | F604 |
| 0001637020 | 81FF | 0800 | 6468 | 5F72 | 6973 | 657A | 040C | FFFA |
| 0001637040 | 0086 | 6F06 | 6A62 | 695F | 1164 | 3E04 | DFFF | 0B03 |
| 0001637060 | 6D74 | 5F70 | 6D69 | 5F67 | 6468 | 0F72 | F204 | 85FF |
| 0001637100 | 0900 | 6C61 | 6F6C | 6163 | 6574 | 1364 | 3A04 | 6AFE |
| 0001637120 | 0D04 | 6966 | 656C | 705F | 7461 | 6E68 | 6D61 | 1665 |
| 0001637140 | 3A04 | EDFF | 1003 | 6162 | 5F64 | 6D69 | 5F67 | 6468 |

THU MAR 14 17:31:54 1991 DB_PI.DLL PAGE 401, LINE 23601

| | | | | | | | | |
|---|---|---|---|---|---|---|---|---|
| 0001637160 | 5F72 | 696C | 7473 | 040E | FE38 | 0081 | 6C08 | 6F6F |
| 0001637200 | 5F70 | 6E63 | 0774 | F404 | 85FF | 0100 | 0169 | 0502 |
| 0001637220 | 000D | 1A00 | 0500 | 0311 | 0000 | 1E00 | 6201 | D617 |
| 0001637240 | 9A05 | 1000 | 8F00 | 0000 | 0400 | 640F | 7374 | 645F |
| 0001637260 | 6165 | 6C6C | 636F | 695F | 676D | 0411 | 0006 | 0445 |
| 0001637300 | 690B | 676D | 685F | 7264 | 705F | 7274 | 0201 | 0121 |
| 0001637320 | 17FC | 05D8 | 0233 | 0010 | 0228 | 0000 | 1204 | 7464 |
| 0001637340 | 5F73 | 7277 | 7469 | 5F65 | 6D69 | 5F67 | 6966 | 656C |
| 0001637360 | 0411 | 0006 | 0445 | 690B | 676D | 685F | 7264 | 705F |
| 0001637400 | 7274 | 0413 | 000A | 00C0 | 660D | 6C69 | 5F65 | 6170 |
| 0001637420 | 6874 | 616E | 656D | 0410 | 000E | 0085 | 640A | 6165 |
| 0001637440 | 6C6C | 636F | 7461 | 0865 | FA04 | BCFF | 0202 | 7066 |
| 0001637460 | 0408 | FFF8 | 0081 | 7302 | 0E74 | A004 | D9FF | 0804 |
| 0001637500 | 6966 | 656C | 685F | 7264 | 0B12 | 19F7 | 0D00 | 7277 |
| 0001637520 | 7469 | 5F65 | 6D69 | 5F67 | 7265 | 0172 | 2002 | 2F01 |
| 0001637540 | DB1A | 4305 | 1002 | 3800 | 0002 | 0400 | 6411 | 7374 |
| 0001637560 | 725F | 6165 | 5F64 | 6D69 | 5F67 | 6966 | 656C | 0413 |
| 0001637600 | 0006 | 00C0 | 660D | 6C69 | 5F65 | 6170 | 6874 | 616E |
| 0001637620 | 656D | 0411 | 000A | 0445 | 690B | 676D | 685F | 7264 |
| 0001637640 | 705F | 7274 | 040E | FF92 | 04D9 | 6608 | 6C69 | 5F65 |
| 0001637660 | 6468 | 0E72 | EA04 | 85FF | 0800 | 6973 | 5F67 | 6973 |
| 0001637700 | 657A | 040F | FFEC | 0082 | 6209 | 6D74 | 5F70 | 6973 |
| 0001637720 | 657A | 0411 | FFF0 | 00C4 | 740B | 706D | 735F | 6769 |
| 0001637740 | 705F | 7274 | 0412 | FFF4 | 00E4 | 740C | 706D | 625F |
| 0001637760 | 6D74 | 5F70 | 7470 | 0872 | FA04 | BCFF | 0202 | 7066 |
| 0001640000 | 0408 | FFF8 | 0081 | 7302 | 1174 | 3F0B | 001C | 720C |
| 0001640020 | 6165 | 5F64 | 6D69 | 5F67 | 7265 | 0172 | 2102 | 7201 |
| 0001640040 | DD1C | 9405 | 1000 | 8900 | 0000 | 0400 | 6412 | 7374 |
| 0001640060 | 775F | 6972 | 6574 | 695F | 676D | 745F | 7268 | 0B64 |
| 0001640100 | 0604 | C000 | 0500 | 7564 | 6D6D | 0879 | FC04 | 81FF |
| 0001640120 | 0200 | 7473 | 0201 | 0122 | 1D06 | 05E1 | 00C7 | 0010 |
| 0001640140 | 00BC | 000C | 1304 | 7464 | 5F73 | 7361 | 6E79 | 5F63 |
| 0001640160 | 7277 | 7469 | 5F65 | 6D69 | 0D67 | 0604 | 3200 | 0705 |
| 0001640200 | 7374 | 5F74 | 7470 | 1172 | 0A04 | 4500 | 0B04 | 6D69 |
| 0001640220 | 5F67 | 6468 | 5F72 | 7470 | 1372 | 0E04 | C000 | 0D00 |
| 0001640240 | 6966 | 656C | 705F | 7461 | 6E68 | 6D61 | 1065 | 1204 |
| 0001640260 | 8500 | 0A00 | 6564 | 6C61 | 6F6C | 6163 | 6574 | 0201 |
| 0001640300 | 0123 | 1DCD | 05E3 | 0040 | 0010 | 0035 | 0000 | 1404 |
| 0001640320 | 7464 | 5F73 | 6E75 | 6F6C | 6461 | 695F | 676D | 665F |
| 0001640340 | 6C69 | 7365 | 040D | 0006 | 0532 | 7407 | 7473 | 705F |
| 0001640360 | 7274 | 040E | 000A | 0081 | 6908 | 676D | 745F | 7079 |
| 0001640400 | 0165 | 2402 | 0D01 | E51E | 4B05 | 1000 | 4000 | 0000 |
| 0001640420 | 0400 | 6415 | 7374 | 6D5F | 6B61 | 5F65 | 6D69 | 5F67 |
| 0001640440 | 6966 | 656C | 616E | 656D | 040E | 0006 | 00C0 | 6908 |
| 0001640460 | 676D | 6E5F | 6D61 | 0D65 | 0A04 | 8100 | 0700 | 6D69 |
| 0001640500 | 5F67 | 7974 | 0E70 | 0C04 | C000 | 0800 | 6966 | 656C |
| 0001640520 | 616E | 656D | 0201 | 0124 | 1E58 | 05E8 | 0075 | 0010 |
| 0001640540 | 006A | 0000 | 1504 | 7464 | 5F73 | 616D | 656B | 695F |
| 0001640560 | 676D | 705F | 7461 | 6E68 | 6D61 | 0D65 | 0604 | 3200 |
| 0001640600 | 0705 | 7374 | 5F74 | 7470 | 0D72 | 0A04 | 8100 | 0700 |
| 0001640620 | 6D69 | 5F67 | 7974 | 0D70 | 0C04 | C000 | 0700 | 616E |
| 0001640640 | 656D | 695F | 0E6E | 1004 | C000 | 0800 | 616E | 656D |
| 0001640660 | 6F5F | 7475 | 0408 | FFDC | 0081 | 7302 | 0E74 | DE04 |
| 0001640700 | 45FF | 0803 | 6D74 | 5F70 | 616E | 656D | 0412 | FFD8 |
| 0001640720 | 00C0 | 690C | 676D | 645F | 7269 | 705F | 7461 | 0168 |
| 0001640740 | 2202 | CD01 | EA1E | A905 | 1002 | 9E00 | 0002 | 0400 |
| 0001640760 | 6413 | 7374 | 615F | 6C6C | 636F | 6F5F | 6570 | 5F6E |
| 0001641000 | 6966 | 656C | 0411 | 0006 | 0445 | 690B | 676D | 685F |
| 0001641020 | 7264 | 705F | 7274 | 0413 | 000A | 00C0 | 660D | 6C69 |

THU MAR 14 17:31:54 1991 DB_PI.DLL PAGE 402, LINE 23660

| | | | | | | | | |
|---|---|---|---|---|---|---|---|---|
| 0001641040 | 5F65 | 6170 | 6874 | 616E | 656D | 040F | 000E | 0085 |
| 0001641060 | 7709 | 6972 | 6574 | 685F | 7264 | 040C | 0010 | 05A9 |
| 0001641100 | 6606 | 5F70 | 6461 | 0872 | FA04 | 81FF | 0200 | 7473 |
| 0001641120 | 0411 | FFF8 | 0085 | 660B | 6C69 | 5F65 | 6168 | 646E |
| 0001641140 | 656C | 0412 | FFFC | 0085 | 610C | 7463 | 6F69 | 5F6E |
| 0001641160 | 6174 | 656B | 0E6E | A004 | D9FF | 0804 | 6966 | 656C |
| 0001641200 | 685F | 7264 | 0B12 | 2136 | 0D00 | 7277 | 7469 | 5F65 |
| 0001641220 | 6D69 | 5F67 | 7265 | 0172 | 1D02 | 7601 | ED21 | C305 |
| 0001641240 | 1000 | B800 | 0000 | 0400 | 640E | 7374 | 635F | 6F6C |
| 0001641260 | 6573 | 665F | 6C69 | 1165 | 0604 | 4500 | 0B04 | 6D69 |
| 0001641300 | 5F67 | 6468 | 5F72 | 7470 | 0872 | 0A04 | BC00 | 0202 |
| 0001641320 | 7066 | 0408 | FFF8 | 0084 | 6202 | 0779 | F604 | 81FF |
| 0001641340 | 0100 | 096E | FA04 | 82FF | 0300 | 6F70 | 0173 | 1F02 |
| 0001641360 | 3901 | EF22 | BF05 | 1000 | B400 | 0000 | 0400 | 6410 |
| 0001641400 | 7374 | 725F | 6165 | 5F64 | 6D69 | 5F67 | 6973 | 1167 |
| 0001641420 | 0604 | 4500 | 0B04 | 6D69 | 5F67 | 6468 | 5F72 | 7470 |
| 0001641440 | 1172 | 0A04 | C400 | 0B00 | 6973 | 5F67 | 7562 | 5F66 |
| 0001641460 | 7470 | 0872 | 0E04 | BC00 | 0202 | 7066 | 040C | FFF6 |
| 0001641500 | 0085 | 6F06 | 6666 | 6573 | 0E74 | FA04 | 82FF | 0800 |
| 0001641520 | 6966 | 656C | 705F | 736F | 0410 | FFF8 | 0085 | 620A |
| 0001641540 | 7479 | 7365 | 725F | 6165 | 0164 | 2002 | F801 | F122 |
| 0001641560 | BF05 | 1000 | B400 | 0000 | 0400 | 6411 | 7374 | 775F |
| 0001641600 | 6972 | 6574 | 695F | 676D | 735F | 6769 | 0411 | 0006 |
| 0001641620 | 0445 | 690B | 676D | 685F | 7264 | 705F | 7274 | 0411 |
| 0001641640 | 000A | 00C4 | 730B | 6769 | 625F | 6675 | 705F | 7274 |
| 0001641660 | 0408 | 000E | 02BC | 6602 | 0C70 | F604 | 85FF | 0600 |
| 0001641700 | 666F | 7366 | 7465 | 040E | FFFA | 0082 | 6608 | 6C69 |
| 0001641720 | 5F65 | 6F70 | 1373 | F804 | 85FF | 0D00 | 7962 | 6574 |
| 0001641740 | 5F73 | 7277 | 7469 | 6574 | 016E | 2102 | B701 | F323 |
| 0001641760 | 3A05 | 1001 | 2F00 | 0001 | 0400 | 6412 | 7374 | 725F |
| 0001642000 | 6165 | 5F64 | 6D69 | 5F67 | 616C | 6579 | 1172 | 0604 |
| 0001642020 | 4500 | 0B04 | 6D69 | 5F67 | 6468 | 5F72 | 7470 | 0872 |
| 0001642040 | 0A04 | BC00 | 0202 | 7066 | 0411 | 000E | 0085 | 6C0B |
| 0001642060 | 7961 | 7265 | 695F | 646E | 7865 | 0412 | 0010 | 00E4 |
| 0001642100 | 6C0C | 7961 | 7265 | 625F | 6675 | 6566 | 1272 | F404 |
| 0001642120 | 82FF | 0C00 | 616C | 6579 | 5F72 | 666F | 7366 | 7465 |
| 0001642140 | 040E | FFF0 | 0082 | 7008 | 736F | 7469 | 6F69 | 1B6E |
| 0001642160 | E604 | 82FF | 1500 | 616C | 6579 | 5F72 | 6572 | 616C |
| 0001642200 | 6974 | 6576 | 6F5F | 6666 | 6573 | 1074 | EA04 | 82FF |
| 0001642220 | 0A00 | 616C | 6579 | 5F72 | 6973 | 657A | 0410 | FFF8 |
| 0001642240 | 0082 | 620A | 7479 | 7365 | 725F | 6165 | 1164 | FC04 |
| 0001642260 | 85FF | 0B00 | 5F6E | 666F | 6C5F | 7961 | 7265 | 0873 |
| 0001642300 | EE04 | 81FF | 0200 | 7473 | 0201 | 0122 | 24F1 | 05F5 |
| 0001642320 | 014C | 0010 | 0141 | 0000 | 1304 | 7464 | 5F73 | 7277 |
| 0001642340 | 7469 | 5F65 | 6D69 | 5F67 | 616C | 6579 | 1172 | 0604 |
| 0001642360 | 4500 | 0B04 | 6D69 | 5F67 | 6468 | 5F72 | 7470 | 0872 |
| 0001642400 | 0A04 | BC00 | 0202 | 7066 | 0411 | 000E | 0085 | 6C0B |
| 0001642420 | 7961 | 7265 | 695F | 646E | 7865 | 0412 | 0010 | 00E4 |
| 0001642440 | 6C0C | 7961 | 7265 | 625F | 6675 | 6566 | 1272 | F404 |
| 0001642460 | 82FF | 0C00 | 616C | 6579 | 5F72 | 666F | 7366 | 7465 |
| 0001642500 | 040E | FFF0 | 0082 | 7008 | 736F | 7469 | 6F69 | 1B6E |
| 0001642520 | E604 | 82FF | 1500 | 616C | 6579 | 5F72 | 6572 | 616C |
| 0001642540 | 6974 | 6576 | 6F5F | 6666 | 6573 | 1074 | EA04 | 82FF |
| 0001642560 | 0A00 | 616C | 6579 | 5F72 | 6973 | 657A | 0413 | FFF8 |
| 0001642600 | 0082 | 620D | 7479 | 7365 | 775F | 6972 | 7474 | 6E65 |
| 0001642620 | 0411 | FFFC | 0085 | 6E0B | 6F5F | 5F66 | 616C | 6579 |
| 0001642640 | 7372 | 0408 | FFEE | 0081 | 7302 | 0174 | 2702 | 3D01 |
| 0001642660 | F726 | 9405 | 1000 | 8900 | 0000 | 0400 | 6418 | 7374 |
| 0001642700 | 775F | 6972 | 6574 | 695F | 676D | 6C5F | 7961 | 7265 |

THU MAR 14 17:31:54 1991 DB_PI.DLL PAGE 403, LINE 23719

| | | | | | | | | |
|---|---|---|---|---|---|---|---|---|
| 0001642720 | 745F | 7268 | 0B64 | 0604 | C000 | 0500 | 7564 | 6D6D |
| 0001642740 | 0879 | FC04 | 81FF | 0200 | 7473 | 0201 | 0128 | 26D1 |
| 0001642760 | 05F9 | 0138 | 0010 | 012D | 0000 | 1904 | 7464 | 5F73 |
| 0001643000 | 7361 | 6E79 | 5F63 | 7277 | 7469 | 5F65 | 6D69 | 5F67 |
| 0001643020 | 616C | 6579 | 1172 | 0604 | 4500 | 0B04 | 6D69 | 5F67 |
| 0001643040 | 6468 | 5F72 | 7470 | 0D72 | 0A04 | 8500 | 0700 | 6D69 |
| 0001643060 | 5F67 | 6468 | 126C | 0C04 | 3700 | 0C05 | 706F | 6E65 |
| 0001643100 | 695F | 676D | 705F | 7274 | 040F | 0010 | 0085 | 6C09 |
| 0001643120 | 7961 | 7265 | 695F | 7864 | 0410 | 0012 | 0460 | 6C0A |
| 0001643140 | 7961 | 7265 | 705F | 6461 | 1372 | 1604 | 6000 | 0D04 |
| 0001643160 | 7773 | 7061 | 625F | 6675 | 705F | 6461 | 0872 | 1A04 |
| 0001643200 | BC00 | 0202 | 7066 | 0408 | FFFC | 0081 | 7302 | 0174 |
| 0001643220 | 2902 | 0901 | FB28 | 5105 | 1000 | 4600 | 0000 | 0400 |
| 0001643240 | 641A | 7374 | 775F | 6961 | 5F74 | 6F66 | 5F72 | 616C |
| 0001643260 | 6579 | 5F72 | 7277 | 745F | 7268 | 0D64 | 0604 | 8500 |
| 0001643300 | 0700 | 6D69 | 5F67 | 6468 | 016C | 2B02 | 5A01 | FD28 |
| 0001643320 | 9805 | 1001 | 8D00 | 0001 | 0400 | 541C | 4D45 | 4F50 |
| 0001643340 | 4152 | 5952 | 645F | 7374 | 775F | 6972 | 6574 | 695F |
| 0001643360 | 676D | 665F | 6C69 | 1165 | 0604 | 4500 | 0B04 | 6D69 |
| 0001643400 | 5F67 | 6468 | 5F72 | 7470 | 1372 | 0A04 | C000 | 0D00 |
| 0001643420 | 6966 | 656C | 705F | 7461 | 6E68 | 6D61 | 1065 | 0E04 |
| 0001643440 | 8500 | 0A00 | 6564 | 6C61 | 6F6C | 6163 | 6574 | 0408 |
| 0001643460 | FFF2 | 0081 | 7302 | 0874 | F804 | BCFF | 0202 | 7066 |
| 0001643500 | 0411 | FFFC | 0085 | 6C0B | 7961 | 7265 | 695F | 646E |
| 0001643520 | 7865 | 040C | FFF4 | 0086 | 6F06 | 6666 | 6573 | 0174 |
| 0001643540 | 0502 | 000D | 1A00 | 1700 | 0A05 | 0B12 | 8600 | 0F00 |
| 0001643560 | 6264 | 5F30 | 6874 | 6472 | 615F | 7463 | 7669 | 1465 |
| 0001643600 | 0E05 | 0B12 | 8600 | 0C00 | 6264 | 5F30 | 656E | 7478 |
| 0001643620 | 695F | 676D | 0518 | 1212 | 000B | 0085 | 6410 | 3062 |
| 0001643640 | 745F | 7268 | 5F64 | 7572 | 6E6E | 6E69 | 1767 | A005 |
| 0001643660 | 0B3C | CF00 | 0F05 | 6264 | 5F30 | 7277 | 7469 | 5F65 |
| 0001643700 | 7473 | 6372 | 1D74 | 1405 | 0B12 | 8600 | 1500 | 6264 |
| 0001643720 | 5F30 | 616C | 6579 | 5F72 | 6874 | 6472 | 615F | 7463 |
| 0001643740 | 7669 | 1665 | 1805 | 0B12 | 8600 | 0E00 | 6264 | 5F30 |
| 0001643760 | 656E | 7478 | 6C5F | 7961 | 7265 | 051E | 121C | 000B |
| 0001644000 | 0085 | 6416 | 3062 | 6C5F | 7961 | 7265 | 745F | 7268 |
| 0001644020 | 5F64 | 7572 | 6E6E | 6E69 | 1E67 | AA05 | 0B3D | D200 |
| 0001644040 | 1605 | 6264 | 5F30 | 616C | 6579 | 5F72 | 7277 | 7469 |
| 0001644060 | 5F65 | 7473 | 7572 | 7463 | 1105 | 0003 | 0000 | 0123 |
| 0001644100 | 29F2 | 054F | 015C | 0010 | 0151 | 0000 | 1404 | 7464 |
| 0001644120 | 5F69 | 6863 | 6365 | 5F6B | 7263 | 6165 | 6574 | 745F |
| 0001644140 | 6C62 | 0412 | 0006 | 04EF | 690C | 6F63 | 5F6E | 696C |
| 0001644160 | 5F62 | 7470 | 0E72 | 0A04 | 8100 | 0800 | 6361 | 5F63 |
| 0001644200 | 6F6D | 6564 | 040E | 000C | 00C0 | 6408 | 7269 | 705F |
| 0001644220 | 7461 | 1068 | 4C04 | 97FE | 0A03 | 7766 | 6F5F | 6A6? |
| 0001644240 | 705F | 7274 | 040E | FF50 | 03ED | 7408 | 706D | 695F |
| 0001644260 | 6F63 | 0F6E | 5004 | 43FE | 0904 | 6966 | 656C | 705F |
| 0001644300 | 7461 | 0868 | FC04 | 81FF | 0200 | 7473 | 0201 | 011F |
| 0001644320 | 2B4E | 0553 | 00CB | 0010 | 00C0 | 0000 | 1004 | 7464 |
| 0001644340 | 5F69 | 6567 | 5F74 | 6369 | 6E6F | 745F | 6C62 | 040E |
| 0001644360 | 0006 | 0081 | 6108 | 6363 | 6D5F | 646F | 1165 | 0804 |
| 0001644400 | 3300 | 0B05 | 6274 | 5F6C | 7470 | 5F72 | 6461 | 0E72 |
| 0001644420 | F804 | 43FE | 0804 | 6964 | 5F72 | 6170 | 6874 | 0412 |
| 0001644440 | FFFA | 04EF | 690C | 6F63 | 5F6E | 696C | 5F62 | 7470 |
| 0001644460 | 0872 | F804 | 81FF | 0200 | 7473 | 0201 | 0122 | 2C19 |
| 0001644500 | 0554 | 0078 | 0010 | 006D | 0000 | 1304 | 7464 | 5F69 |
| 0001644520 | 6E75 | 6F6C | 6461 | 695F | 6F63 | 5F6E | 6274 | 126C |
| 0001644540 | FA04 | EFFF | 0C04 | 6369 | 6E6F | 6C5F | 6269 | 705F |
| 0001644560 | 7274 | 0408 | FFF8 | 0081 | 7302 | 0174 | 1D02 | 9101 |

THU MAR 14 17:31:54 1991 DB_PI.DLL PAGE 404, LINE 23778

| | | | | | | | | |
|---|---|---|---|---|---|---|---|---|
| 0001644600 | 562C | 0405 | 1D02 | F900 | 0001 | 0400 | 640E | 6974 |
| 0001644620 | 6C5F | 7369 | 5F74 | 6369 | 6E6F | 1273 | 0604 | 5B00 |
| 0001644640 | 0C04 | 6369 | 6E6F | 745F | 6C62 | 705F | 7274 | 0410 |
| 0001644660 | 000A | 0081 | 6C0A | 7369 | 5F74 | 726F | 6564 | 1172 |
| 0001644700 | 0C04 | C500 | 0B00 | 736C | 5F74 | 6E63 | 5F74 | 6461 |
| 0001644720 | 1272 | 1004 | 8C00 | 0C03 | 616E | 656D | 6C5F | 7473 |
| 0001644740 | 615F | 7264 | 040E | FF4C | 03ED | 740B | 706D | 695F |
| 0001644760 | 6F63 | 0D6E | F804 | 81FF | 0700 | 656B | 5F79 | 756E |
| 0001645000 | 0D6D | 2604 | C0FF | 0700 | 656B | 5F79 | 7470 | 0E72 |
| 0001645020 | 2A04 | D1FF | 0802 | 626F | 5F6A | 616E | 656D | 040A |
| 0001645040 | FF4A | 0081 | 7304 | 7A69 | 0D65 | FC04 | 85FF | 0700 |
| 0001645060 | 6D74 | 5F70 | 6E63 | 0874 | FA04 | 81FF | 0200 | 7473 |
| 0001645100 | 0201 | 0D05 | 0000 | 001A | 1105 | 0003 | 0000 | 0127 |
| 0001645120 | 2E96 | 0529 | 0049 | 0010 | 003E | 0000 | 1804 | 7464 |
| 0001645140 | 5F66 | 7263 | 6165 | 6574 | 625F | 7274 | 5F76 | 6C66 |
| 0001645160 | 7274 | 735F | 6264 | 0411 | 0006 | 0436 | 740B | 6C62 |
| 0001645200 | 685F | 6C64 | 705F | 7274 | 040E | 000A | 00C0 | 7008 |
| 0001645220 | 7461 | 6E68 | 6D61 | 0F65 | A604 | DFFF | 0903 | 6574 |
| 0001645240 | 706D | 665F | 746C | 0172 | 2002 | DF01 | 2B2E | 4905 |
| 0001645260 | 1001 | 3E00 | 0001 | 0400 | 6411 | 6674 | 6C5F | 616F |
| 0001645300 | 5F64 | 6C66 | 7274 | 745F | 6C62 | 040D | 0006 | 048B |
| 0001645320 | 7407 | 7473 | 705F | 7274 | 0411 | 000A | 0081 | 610B |
| 0001645340 | 6363 | 7365 | 5F73 | 6F6D | 6564 | 040F | FFFC | 0081 |
| 0001645360 | 6209 | 7274 | 5F76 | 6F6D | 6564 | 0408 | FFFA | 0081 |
| 0001645400 | 7302 | 0174 | 2202 | 2801 | 2D30 | 4805 | 1000 | 3D00 |
| 0001645420 | 0000 | 0400 | 6413 | 6674 | 755F | 6C6E | 616F | 5F64 |
| 0001645440 | 6C66 | 7274 | 745F | 6C62 | 040D | 0006 | 048B | 7407 |
| 0001645460 | 7473 | 705F | 7274 | 0201 | 0127 | 3070 | 052E | 0078 |
| 0001645500 | 0010 | 006D | 0000 | 1804 | 7464 | 5F66 | 6E75 | 6F6C |
| 0001645520 | 6461 | 675F | 6F6C | 5F62 | 6C66 | 7274 | 745F | 6C62 |
| 0001645540 | 0412 | FFF8 | 04CB | 670C | 6F6C | 5F62 | 696C | 5F62 |
| 0001645560 | 7470 | 0872 | FC04 | 81FF | 0200 | 7473 | 0201 | 0121 |
| 0001645600 | 30E8 | 0530 | 005A | 0010 | 004F | 0000 | 1204 | 7464 |
| 0001645620 | 5F66 | 6C63 | 6165 | 5F6E | 6C66 | 7274 | 745F | 6C62 |
| 0001645640 | 040D | 0006 | 048B | 7407 | 7473 | 705F | 7274 | 0408 |
| 0001645660 | FFFC | 0081 | 7302 | 0174 | 2102 | 4201 | 3231 | F605 |
| 0001645700 | 1001 | EB00 | 0001 | 0400 | 6412 | 6674 | 745F | 6C62 |
| 0001645720 | 6C5F | 7369 | 5F74 | 6C66 | 7274 | 1273 | 0604 | 3600 |
| 0001645740 | 0C04 | 6C66 | 7274 | 745F | 6C62 | 705F | 7274 | 0410 |
| 0001645760 | 000A | 0081 | 6C0A | 7369 | 5F74 | 726F | 6564 | 1172 |
| 0001646000 | 0C04 | C500 | 0B00 | 736C | 5F74 | 6E63 | 5F74 | 6461 |
| 0001646020 | 1272 | 1004 | DB00 | 0C03 | 616E | 656D | 6C5F | 7473 |
| 0001646040 | 615F | 7264 | 0410 | FFA4 | 03DF | 740A | 706D | 665F |
| 0001646060 | 6C69 | 6574 | 0D72 | A004 | 81FF | 0700 | 656B | 5F79 |
| 0001646100 | 756E | 0D6D | 7A04 | C0FF | 0700 | 656B | 5F79 | 7470 |
| 0001646120 | 0E72 | 7E04 | D1FF | 0802 | 626F | 5F6A | 616E | 656D |
| 0001646140 | 040A | FF9E | 0081 | 7304 | 7A69 | 0D65 | FC04 | 85FF |
| 0001646160 | 0700 | 6D74 | 5F70 | 6E63 | 0874 | A204 | 81FF | 0200 |
| 0001646200 | 7473 | 0201 | 0D05 | 0000 | 001A | 1105 | 0003 | 0000 |
| 0001646220 | 0126 | 3338 | 0505 | 0049 | 0010 | 003E | 0000 | 1704 |
| 0001646240 | 7464 | 5F61 | 7263 | 6165 | 6574 | 625F | 7274 | 5F76 |
| 0001646260 | 6F61 | 5F69 | 6473 | 1162 | 0604 | 1000 | 0B04 | 6274 |
| 0001646300 | 5F6C | 6468 | 5F6C | 7470 | 0E72 | 0A04 | C000 | 0800 |
| 0001646320 | 6170 | 6874 | 616E | 656D | 040E | FF92 | 03BE | 7408 |
| 0001646340 | 6D65 | 5F70 | 6F61 | 0169 | 1F02 | 8101 | 0733 | 5805 |
| 0001646360 | 1001 | 4D00 | 0001 | 0400 | 6410 | 6174 | 6C5F | 616F |
| 0001646400 | 5F64 | 6F61 | 5F69 | 6274 | 0D6C | 0604 | 6500 | 0704 |
| 0001646420 | 7374 | 5F74 | 7470 | 1172 | 0A04 | 8100 | 0B00 | 6361 |
| 0001646440 | 6563 | 7373 | 6D5F | 646F | 0F65 | FC04 | 81FF | 0900 |

THU MAR 14 17:31:54 1991 DB_PI.DLL PAGE 405, LINE 23837

| | | | | | | | | |
|---|---|---|---|---|---|---|---|---|
| 0001646460 | 7462 | 7672 | 6D5F | 646F | 0865 | FA04 | 81FF | 0200 |
| 0001646500 | 7473 | 0201 | 0121 | 34D9 | 0509 | 0048 | 0010 | 003D |
| 0001646520 | 0000 | 1204 | 7464 | 5F61 | 6E75 | 6F6C | 6461 | 615F |
| 0001646540 | 696F | 745F | 6C62 | 040D | 0006 | 0465 | 7407 | 7473 |
| 0001646560 | 705F | 7274 | 0201 | 0120 | 3521 | 050B | 005A | 0010 |
| 0001646600 | 004F | 0000 | 1104 | 7464 | 5F61 | 6C63 | 6165 | 5F6E |
| 0001646620 | 6F61 | 5F69 | 6274 | 0D6C | 0604 | 6500 | 0704 | 7374 |
| 0001646640 | 5F74 | 7470 | 0872 | FC04 | 81FF | 0200 | 7473 | 0201 |
| 0001646660 | 0120 | 357B | 050D | 01E4 | 0010 | 01D9 | 0000 | 1104 |
| 0001646700 | 7464 | 5F61 | 6274 | 5F6C | 696C | 7473 | 615F | 696F |
| 0001646720 | 0D73 | 0604 | 6500 | 0704 | 7374 | 5F74 | 7470 | 1172 |
| 0001646740 | 0A04 | C500 | 0B00 | 736C | 5F74 | 6E63 | 5F74 | 6461 |
| 0001646760 | 1072 | 0E04 | DD00 | 0A03 | 6469 | 6C5F | 7473 | 615F |
| 0001647000 | 7264 | 0411 | FF90 | 03BE | 740B | 706D | 615F | 696F |
| 0001647020 | 685F | 7264 | 040D | FF86 | 0081 | 6B07 | 7965 | 6E5F |
| 0001647040 | 6D75 | 040C | FF8A | 0086 | 6F06 | 6A62 | 695F | 0D64 |
| 0001647060 | 8204 | C6FF | 0700 | 656B | 5F79 | 7470 | 0E72 | 8804 |
| 0001647100 | 81FF | 0800 | 6468 | 5F72 | 6973 | 657A | 040D | FFFC |
| 0001647120 | 0085 | 7407 | 706D | 635F | 746E | 0408 | FF8E | 0081 |
| 0001647140 | 7302 | 0174 | 0502 | 000D | 1A00 | 0500 | 0311 | 0000 |
| 0001647160 | 2500 | 6001 | 0537 | 7A05 | 1000 | 6F00 | 0000 | 0400 |
| 0001647200 | 6416 | 6774 | 635F | 6572 | 7461 | 5F65 | 7462 | 7672 |
| 0001647220 | 675F | 5F6E | 6473 | 1162 | 0604 | 1000 | 0B04 | 6274 |
| 0001647240 | 5F6C | 6468 | 5F6C | 7470 | 0E72 | 0A04 | C000 | 0800 |
| 0001647260 | 6170 | 6874 | 616E | 656D | 040E | 000E | 0081 | 6708 |
| 0001647300 | 6E65 | 745F | 7079 | 0D65 | D604 | E0FF | 0703 | 6574 |
| 0001647320 | 706D | 675F | 016E | 1F02 | DA01 | 0737 | 9205 | 1001 |
| 0001647340 | 8700 | 0001 | 0400 | 6410 | 6774 | 6C5F | 616F | 5F64 |
| 0001647360 | 6567 | 5F6E | 6274 | 0D6C | 0604 | 6500 | 0704 | 7374 |
| 0001647400 | 5F74 | 7470 | 0E72 | 0A04 | 8100 | 0800 | 6567 | 5F6E |
| 0001647420 | 7974 | 6570 | 0411 | 000C | 0081 | 610B | 6363 | 7365 |
| 0001647440 | 5F73 | 6F6D | 6564 | 040F | FFFC | 0081 | 6209 | 7274 |
| 0001647460 | 5F76 | 6F6D | 6564 | 0408 | FFFA | 0081 | 7302 | 0174 |
| 0001647500 | 2102 | 6C01 | 0939 | 3605 | 1000 | 2B00 | 0000 | 0400 |
| 0001647520 | 6412 | 6774 | 755F | 6C6E | 616F | 5F64 | 6567 | 5F6E |
| 0001647540 | 6274 | 0D6C | 0604 | 6500 | 0704 | 7374 | 5F74 | 7470 |
| 0001647560 | 0E72 | 0A04 | 8100 | 0800 | 6567 | 5F6E | 7974 | 6570 |
| 0001647600 | 0201 | 0126 | 39A2 | 050B | 0076 | 0010 | 006B | 0000 |
| 0001647620 | 1704 | 7464 | 5F67 | 6E75 | 6F6C | 6461 | 615F | 6C6C |
| 0001647640 | 675F | 6E65 | 745F | 6C62 | 0D73 | 0604 | 6500 | 0704 |
| 0001647660 | 7374 | 5F74 | 7470 | 0972 | FA04 | 81FF | 0300 | 7974 |
| 0001647700 | 0870 | FC04 | 81FF | 0200 | 7473 | 0201 | 0120 | 3A18 |
| 0001647720 | 050D | 0064 | 0010 | 0059 | 0000 | 1104 | 7464 | 5F67 |
| 0001647740 | 6C63 | 6165 | 5F6E | 6567 | 5F6E | 6274 | 0D6C | 0604 |
| 0001647760 | 6500 | 0704 | 7374 | 5F74 | 7470 | 0E72 | 0A04 | 8100 |
| 0001650000 | 0800 | 6567 | 5F6E | 7974 | 6570 | 0408 | FFFC | 0081 |
| 0001650020 | 7302 | 0174 | 2502 | 7C01 | 0F3A | 8505 | 1000 | 7A00 |
| 0001650040 | 0000 | 0400 | 6416 | 6774 | 635F | 656C | 6E61 | 615F |
| 0001650060 | 6C6C | 675F | 6E65 | 745F | 6C62 | 0D73 | 0604 | 6500 |
| 0001650100 | 0704 | 7374 | 5F74 | 7470 | 0E72 | F804 | 81FF | 0800 |
| 0001650120 | 6567 | 5F6E | 7974 | 6570 | 0408 | FFFA | 0081 | 7302 |
| 0001650140 | 0C74 | FC04 | 81FF | 0600 | 6572 | 5F74 | 7473 | 0201 |
| 0001650160 | 0120 | 3B01 | 0511 | 01EE | 0010 | 01E3 | 0000 | 1104 |
| 0001650200 | 7464 | 5F67 | 6274 | 5F6C | 696C | 7473 | 675F | 6E65 |
| 0001650220 | 0D73 | 0604 | 6500 | 0704 | 7374 | 5F74 | 7470 | 0E72 |
| 0001650240 | 0A04 | 8100 | 0800 | 6567 | 5F6E | 7974 | 6570 | 0411 |
| 0001650260 | 000C | 00C5 | 6C0B | 7473 | 635F | 746E | 615F | 7264 |
| 0001650300 | 0410 | 0010 | 03DD | 690A | 5F64 | 736C | 5F74 | 6461 |
| 0001650320 | 1172 | CE04 | E0FF | 0B03 | 6D74 | 5F70 | 6567 | 5F6E |

THU MAR 14 17:31:54 15›ı DB_PI.DLL PAGE 406, LINE 23896

| | | | | | | | | |
|---|---|---|---|---|---|---|---|---|
| 0001650340 | 6468 | 0D72 | CA04 | 81FF | 0700 | 656B | 5F79 | 756E |
| 0001650360 | 0C6D | F604 | 86FF | 0600 | 626F | 5F6A | 6469 | 040D |
| 0001650400 | FFC6 | 00C6 | 6B07 | 7965 | 705F | 7274 | 040E | FFCC |
| 0001650420 | 0081 | 6808 | 7264 | 735F | 7A69 | 0D65 | FC04 | 85FF |
| 0001650440 | 0700 | 6D74 | 5F70 | 6E63 | 0874 | FA04 | 81FF | 0200 |
| 0001650460 | 7473 | 0201 | 0D05 | 0000 | 001A | 1105 | 0003 | 0000 |
| 0001650500 | 011E | 3CF0 | 0262 | 0061 | 0010 | 0056 | 0000 | 0F04 |
| 0001650520 | 7464 | 5F6D | 656D | 5F6D | 6F6E | 5F74 | 6863 | 0972 |
| 0001650540 | 0604 | C000 | 0300 | 7562 | 0766 | 0A04 | 8100 | 0100 |
| 0001650560 | 0B63 | 0C04 | 8500 | 0500 | 6F63 | 6E75 | 0D74 | FC04 |
| 0001650600 | 84FF | 0700 | 6F6E | 6D72 | 635F | 0B68 | F604 | 84FF |
| 0001650620 | 0500 | 6F66 | 6E75 | 0C64 | F804 | C0FF | 0600 | 7562 |
| 0001650640 | 6666 | 7265 | 0B0E | 3D28 | 0900 | 6177 | 5F73 | 6F66 |
| 0001650660 | 6E75 | 0F64 | 2C0B | 003D | 650A | 646E | 6F5F | 5F66 |
| 0001650700 | 7361 | 016D | 0502 | 000D | 1A00 | 0500 | 0311 | 0000 |
| 0001650720 | 2300 | 5201 | BE3D | 5905 | 1000 | 4E00 | 0000 | 0400 |
| 0001650740 | 6414 | 5F62 | 6567 | 5F74 | 6663 | 5F67 | 6966 | 656C |
| 0001650760 | 705F | 7461 | 1268 | 0604 | C000 | 0C00 | 626F | 5F6A |
| 0001651000 | 6170 | 6874 | 616E | 656D | 040E | 000A | 00C0 | 7008 |
| 0001651020 | 7461 | 6E68 | 6D61 | 0165 | 2502 | AB01 | C23D | 9B05 |
| 0001651040 | 1000 | 9000 | 0000 | 0400 | 6416 | 5F62 | 6567 | 5F74 |
| 0001651060 | 7973 | 7473 | 6D65 | 635F | 6766 | 705F | 7461 | 0D68 |
| 0001651100 | 0604 | C000 | 0700 | 6F6C | 7067 | 7461 | 0E68 | FA04 |
| 0001651120 | C0FF | 0800 | 6E65 | 5F76 | 6170 | 6874 | 0201 | 0125 |
| 0001651140 | 3E46 | 05C5 | 007D | 0010 | 0072 | 0000 | 1604 | 6264 |
| 0001651160 | 675F | 7465 | 6D5F | 7361 | 6574 | 5F72 | 6663 | 5F67 |
| 0001651200 | 6170 | 6874 | 040F | 0006 | 00C0 | 7009 | 7968 | 5F73 |
| 0001651220 | 6170 | 6874 | 0409 | FFFA | 00C0 | 6303 | 7068 | 0201 |
| 0001651240 | 011A | 3EC3 | 05C8 | 0AA2 | 0016 | 0A94 | 0000 | 0B04 |
| 0001651260 | 6264 | 6C5F | 616F | 5F64 | 6663 | 1167 | 1404 | C000 |
| 0001651300 | 0B00 | 626F | 5F6A | 6F6C | 7067 | 7461 | 1068 | 1004 |
| 0001651320 | C600 | 0A00 | 626F | 5F6A | 6469 | 615F | 7264 | 0417 |
| 0001651340 | 000E | 0085 | 7211 | 6665 | 6572 | 6873 | 695F | 5F66 |
| 0001651360 | 6F6C | 6461 | 6465 | 040E | 000A | 00C0 | 6C08 | 676F |
| 0001651400 | 705F | 7461 | 0D68 | 0604 | C500 | 0700 | 696C | 656E |
| 0001651420 | 6E5F | 0C6F | FA04 | C0FF | 0600 | 5F5F | 7974 | 6570 |
| 0001651440 | 040F | FFE8 | 0085 | 5F09 | 625F | 5F78 | 7974 | 6570 |
| 0001651460 | 040D | FED8 | 0266 | 5F07 | 705F | 6972 | 746E | 040B |
| 0001651500 | FED0 | 0202 | 5F05 | 6C5F | 6C76 | 040D | FFDC | 05CB |
| 0001651520 | 5F07 | 635F | 6F6C | 6B63 | 040D | FFF4 | 00C0 | 5F07 |
| 0001651540 | 735F | 6174 | 6B63 | 040E | FED6 | 0081 | 5F08 | 725F |
| 0001651560 | 7465 | 6176 | 136C | DC04 | AFFE | 0D04 | 6663 | 5F67 |
| 0001651600 | 6966 | 656C | 705F | 7461 | 1A68 | D004 | AFFD | 1404 |
| 0001651620 | 6572 | 6C70 | 6361 | 6D65 | 6E65 | 5F74 | 6F6C | 5F67 |
| 0001651640 | 6170 | 6874 | 0419 | FFF8 | 0085 | 7213 | 7065 | 616C |
| 0001651660 | 6563 | 656D | 746E | 6C5F | 6E69 | 5F65 | 6F6E | 0418 |
| 0001651700 | FFEA | 00C0 | 6912 | 746E | 7265 | 5F6E | 626F | 5F6A |
| 0001651720 | 6F6C | 7067 | 7461 | 1168 | EE04 | 85FF | 0B00 | 7265 |
| 0001651740 | 5F72 | 6E6F | 695F | 696E | 1174 | F204 | 85FF | 0B00 |
| 0001651760 | 7973 | 7473 | 6D65 | 6F5F | 6C6E | 0D79 | CC04 | E7FD |
| 0001652000 | 0704 | 7973 | 5F6D | 6174 | 0862 | F004 | 81FF | 0200 |
| 0001652020 | 7473 | 050E | 1336 | 000B | 0371 | 5F06 | 665F | 6E75 |
| 0001652040 | 0163 | 1C02 | 6501 | CD49 | 5105 | 1601 | 4300 | 0001 |
| 0001652060 | 0400 | 640D | 5F62 | 6E75 | 6F6C | 6461 | 635F | 6766 |
| 0001652100 | 040C | 0008 | 0086 | 6F06 | 6A62 | 695F | 0B64 | 0604 |
| 0001652120 | 8500 | 0500 | 6F66 | 6372 | 0C65 | FA04 | C0FF | 0600 |
| 0001652140 | 5F5F | 7974 | 6570 | 040F | FFF4 | 0085 | 5F09 | 625F |
| 0001652160 | 5F78 | 7974 | 6570 | 040D | FFE4 | 0266 | 5F07 | 705F |
| 0001652200 | 6972 | 746E | 040B | FFDC | 0202 | 5F05 | 6C5F | 6C76 |

THU MAR 14 17:31:54 1991 DB_PI.DLL PAGE 407, LINE 23955

| | | | | | | | | |
|---|---|---|---|---|---|---|---|---|
| 0001652220 | 040D | FFE8 | 05CB | 5F07 | 635F | 6F6C | 6B63 | 040D |
| 0001652240 | FFF6 | 00C0 | 5F07 | 735F | 6174 | 6B63 | 040E | FFE2 |
| 0001652260 | 0081 | 5F08 | 725F | 7465 | 6176 | 0E6C | 5005 | 0B13 |
| 0001652300 | CE00 | 0605 | 5F5F | 7566 | 636E | 0201 | 011C | 4AB6 |
| 0001652320 | 05D0 | 01DB | 0010 | 01D0 | 0000 | 0D04 | 6264 | 735F |
| 0001652340 | 7274 | 745F | 5F6F | 756E | 106D | 0604 | C000 | 0A00 |
| 0001652360 | 7469 | 6D65 | 765F | 6C61 | 6575 | 0411 | 000A | 0081 |
| 0001652400 | 740B | 7079 | 5F65 | 6573 | 656C | 7463 | 040A | 000C |
| 0001652420 | 00C0 | 6904 | 6574 | 106D | F804 | DIFF | 0A05 | 6F62 |
| 0001652440 | 6C6F | 765F | 6C61 | 6575 | 0409 | FFF4 | 00C0 | 6303 |
| 0001652460 | 7068 | 0201 | 0122 | 4C91 | 05D5 | 0383 | 0016 | 0375 |
| 0001652500 | 0000 | 1304 | 6264 | 675F | 7465 | 635F | 6766 | 6E5F |
| 0001652520 | 6D75 | 695F | 6574 | 0C6D | 1004 | 8600 | 0600 | 626F |
| 0001652540 | 5F6A | 6469 | 0411 | 000E | 0081 | 740B | 7079 | 5F65 |
| 0001652560 | 6573 | 656C | 7463 | 0412 | 000A | 00C0 | 690C | 6574 |
| 0001652600 | 5F6D | 6E69 | 6E5F | 6D61 | 0A65 | 0604 | C000 | 0400 |
| 0001652620 | 7469 | 6D65 | 040C | FFFA | 00C0 | 5F06 | 745F | 7079 |
| 0001652640 | 0F65 | F004 | 85FF | 0900 | 5F5F | 7862 | 745F | 7079 |
| 0001652660 | 0D65 | DC04 | 66FF | 0702 | 5F5F | 7270 | 6E69 | 0B74 |
| 0001652700 | D404 | 02FF | 0502 | 5F5F | 766C | 0D6C | E404 | CBFF |
| 0001652720 | 0705 | 5F5F | 6C63 | 636F | 0D6B | F604 | C0FF | 0700 |
| 0001652740 | 5F5F | 7473 | 6361 | 0E6B | DA04 | 81FF | 0800 | 5F5F |
| 0001652760 | 6572 | 7674 | 6C61 | 0408 | FFF2 | 0081 | 7302 | 1074 |
| 0001653000 | E004 | C0FF | 0A00 | 7469 | 6D65 | 765F | 6C61 | 6575 |
| 0001653020 | 0410 | FFF4 | 0085 | 760A | 6C61 | 6575 | 735F | 7A69 |
| 0001653040 | 0F65 | AC04 | 42FF | 0903 | 7469 | 6D65 | 6E5F | 6D61 |
| 0001653060 | 0D65 | CC04 | E7FF | 0704 | 7973 | 5F6D | 6174 | 1962 |
| 0001653100 | D004 | 88FF | 1300 | 6966 | 7463 | 7669 | 5F65 | 6564 |
| 0001653120 | 6C63 | 7261 | 7461 | 6F69 | 0E6E | 9005 | 0B13 | D700 |
| 0001653140 | 0605 | 5F5F | 7566 | 636E | 0201 | 0127 | 5014 | 05D9 |
| 0001653160 | 06D8 | 0016 | 06CA | 0000 | 1804 | 6264 | 675F | 7465 |
| 0001653200 | 635F | 6766 | 6E5F | 6D75 | 695F | 6574 | 5F6D | 696C |
| 0001653220 | 7473 | 040C | 0014 | 0086 | 6F06 | 6A62 | 695F | 1164 |
| 0001653240 | 1204 | 8100 | 0B00 | 7974 | 6570 | 735F | 6C65 | 6365 |
| 0001653260 | 1274 | 0E04 | C000 | 0C00 | 7469 | 6D65 | 695F | 5F6E |
| 0001653300 | 616E | 656D | 0413 | 000A | 00C5 | 6C0D | 7473 | 6C5F |
| 0001653320 | 676E | 6874 | 705F | 7274 | 040D | 0006 | 03F0 | 6C07 |
| 0001653340 | 7473 | 615F | 7264 | 040C | FFFA | 00C0 | 5F06 | 745F |
| 0001653360 | 7079 | 0F65 | E804 | 85FF | 0900 | 5F5F | 7862 | 745F |
| 0001653400 | 7079 | 0D65 | D004 | 66FF | 0702 | 5F5F | 7270 | 6E69 |
| 0001653420 | 0B74 | C804 | 02FF | 0502 | 5F5F | 766C | 0D6C | DC04 |
| 0001653440 | CBFF | 0705 | 5F5F | 6C63 | 636F | 0D6B | F204 | C0FF |
| 0001653460 | 0700 | 5F5F | 7473 | 6361 | 0E6B | CE04 | 81FF | 0800 |
| 0001653500 | 5F5F | 6572 | 7674 | 6C61 | 0408 | FFEE | 0081 | 7302 |
| 0001653520 | 1074 | D404 | C0FF | 0A00 | 7469 | 6D65 | 765F | 6C61 |
| 0001653540 | 6575 | 0410 | FFF0 | 0085 | 760A | 6C61 | 6575 | 735F |
| 0001653560 | 7A69 | 0F65 | EA04 | 85FF | 0900 | 6C61 | 6F6C | 6163 |
| 0001653600 | 6574 | 0964 | D804 | C0FF | 0300 | 6863 | 0F70 | EC04 |
| 0001653620 | 85FF | 0900 | 7469 | 6D65 | 735F | 7A69 | 0F65 | A204 |
| 0001653640 | 85FF | 0900 | 736C | 5F74 | 6E6C | 7467 | 0968 | F604 |
| 0001653660 | C0FF | 0300 | 736C | 0D74 | A404 | E7FF | 0704 | 7973 |
| 0001653700 | 5F6D | 6174 | 0F62 | A804 | 42FF | 0903 | 7469 | 6D65 |
| 0001653720 | 6E5F | 6D61 | 0E65 | B205 | 0B13 | DB00 | 0605 | 5F5F |
| 0001653740 | 7566 | 636E | 0201 | 0122 | 56EC | 05DD | 0430 | 0016 |
| 0001653760 | 0422 | 0000 | 1304 | 6264 | 675F | 7465 | 635F | 6766 |
| 0001654000 | 735F | 7274 | 695F | 6574 | 0C6D | 1004 | 8600 | 0600 |
| 0001654020 | 626F | 5F6A | 6469 | 0411 | 000E | 0081 | 740B | 7079 |
| 0001654040 | 5F65 | 6573 | 656C | 7463 | 0412 | 000A | 00C0 | 690C |
| 0001654060 | 6574 | 5F6D | 6E69 | 6E5F | 6D61 | 0A65 | 0604 | 0500 |

THU MAR 14 17:31:54 1991 DB_PI.DLL PAGE 408, LINE 24014

| | | | | | | | | |
|---|---|---|---|---|---|---|---|---|
| 0001654100 | 0402 | 7469 | 6D65 | 040C | FFFA | 00C0 | 5F06 | 745F |
| 0001654120 | 7079 | 0F65 | E604 | 85FF | 0900 | 5F5F | 7862 | 745F |
| 0001654140 | 7079 | 0D65 | D204 | 66FF | 0702 | 5F5F | 7270 | 6E69 |
| 0001654160 | 0B74 | CA04 | 02FF | 0502 | 5F5F | 766C | 0D6C | DA04 |
| 0001654200 | CBFF | 0705 | 5F5F | 6C63 | 636F | 0D6B | F404 | C0FF |
| 0001654220 | 0700 | 5F5F | 7473 | 6361 | 0E6B | D004 | 81FF | 0800 |
| 0001654240 | 5F5F | 6572 | 7674 | 6C61 | 0408 | FFF0 | 0081 | 7302 |
| 0001654260 | 1074 | D604 | C0FF | 0A00 | 7469 | 6D65 | 765F | 6C61 |
| 0001654300 | 6575 | 0410 | FFE8 | 00C0 | 630A | 6C6F | 656C | 7463 |
| 0001654320 | 705F | 0F74 | EC04 | C0FF | 0900 | 6E69 | 6573 | 7472 |
| 0001654340 | 705F | 1074 | F204 | 85FF | 0A00 | 6176 | 756C | 5F65 |
| 0001654360 | 6973 | 657A | 040A | FFF8 | 0085 | 6304 | 6E6F | 0F74 |
| 0001654400 | C804 | 85FF | 0900 | 6E69 | 735F | 7274 | 6E69 | 0D67 |
| 0001654420 | A404 | E7FF | 0704 | 7973 | 5F6D | 6174 | 0F62 | A804 |
| 0001654440 | 42FF | 0903 | 7469 | 6D65 | 6E5F | 6D61 | 0E65 | DA05 |
| 0001654460 | 0B13 | D700 | 0605 | 5F5F | 7566 | 636E | 0201 | 0122 |
| 0001654500 | 5B1C | 05DF | 0059 | 0016 | 004B | 0000 | 1304 | 6264 |
| 0001654520 | 665F | 6572 | 5F65 | 7473 | 6972 | 676E | 6C5F | 7369 |
| 0001654540 | 0A74 | 0A04 | 8500 | 0400 | 7261 | 6367 | 040A | 0006 |
| 0001654560 | 0205 | 6104 | 6772 | 0176 | 2702 | 7501 | E15B | 7405 |
| 0001654600 | 1607 | 6600 | 0007 | 0400 | 6418 | 5F62 | 6567 | 5F74 |
| 0001654620 | 6663 | 5F67 | 7473 | 5F72 | 696C | 7473 | 695F | 6574 |
| 0001654640 | 0C6D | 1204 | 8600 | 0600 | 626F | 5F6A | 6469 | 0412 |
| 0001654660 | 000E | 00C0 | 690C | 6574 | 5F6D | 6E69 | 6E5F | 6D61 |
| 0001654700 | 0E65 | 0A04 | C500 | 0800 | 7261 | 6367 | 705F | 7274 |
| 0001654720 | 040E | 0006 | 04A5 | 6108 | 6772 | 5F76 | 7470 | 0872 |
| 0001654740 | EC04 | 81FF | 0200 | 7473 | 040D | FFC8 | 00C0 | 7207 |
| 0001654760 | 7761 | 765F | 6C61 | 040B | FFC2 | 00C0 | 7305 | 6174 |
| 0001655000 | 7472 | 0409 | FFEE | 00C0 | 6503 | 646E | 0410 | FFE4 |
| 0001655020 | 00C0 | 630A | 6C6F | 656C | 7463 | 705F | 0F74 | C604 |
| 0001655040 | 85FF | 0900 | 6E69 | 735F | 7274 | 6E69 | 0A67 | F404 |
| 0001655060 | 85FF | 0400 | 6F63 | 746E | 040F | FFE8 | 0085 | 6109 |
| 0001655100 | 6C6C | 636F | 7461 | 6465 | 0410 | FFF2 | 0085 | 760A |
| 0001655120 | 6C61 | 6575 | 735F | 7A69 | 0D65 | 9E04 | E7FF | 0704 |
| 0001655140 | 7973 | 5F6D | 6174 | 0F62 | A204 | 42FF | 0903 | 7469 |
| 0001655160 | 6D65 | 6E5F | 6D61 | 0C65 | FA04 | C0FF | 0600 | 5F5F |
| 0001655200 | 7974 | 6570 | 040F | FFEA | 0085 | 5F09 | 625F | 5F78 |
| 0001655220 | 7974 | 6570 | 040D | FFD4 | 0266 | 5F07 | 705F | 6972 |
| 0001655240 | 746E | 040B | FFCC | 0202 | 5F05 | 6C5F | 6C76 | 040D |
| 0001655260 | FFD8 | 05CB | 5F07 | 635F | 6F6C | 6B63 | 040D | FFF6 |
| 0001655300 | 00C0 | 5F07 | 735F | 6174 | 6B63 | 040E | FFD2 | 0081 |
| 0001655320 | 5F08 | 725F | 7465 | 6176 | 0E6C | FC05 | 0B13 | DB00 |
| 0001655340 | 0605 | 5F5F | 7566 | 636E | 0201 | 0521 | 12F6 | 000B |
| 0001655360 | 05BA | 6419 | 3062 | 745F | 6D65 | 5F70 | 6564 | 6166 |
| 0001655400 | 6C75 | 5F74 | 7973 | 5F73 | 6170 | 6874 | 0D05 | 0000 |
| 0001655420 | 001A | 050F | 12EE | 000B | 00C0 | 4207 | 785F | 6946 |
| 0001655440 | 656C | 050F | 12F2 | 000B | 00C0 | 4207 | 785F | 6150 |
| 0001655460 | 6B63 | 0514 | 0000 | 0000 | 0081 | 420C | 5F78 | 6544 |
| 0001655500 | 7562 | 4D67 | 646F | 1465 | 0005 | 0000 | 8100 | 0C00 |
| 0001655520 | 7842 | 545F | 6D69 | 7365 | 6F4D | 6564 | 1105 | 0003 |
| 0001655540 | 0000 | 0119 | 62EA | 05B6 | 0037 | 0010 | 002C | 0000 |
| 0001655560 | 0A04 | 7464 | 5F6C | 7979 | 7277 | 7061 | 0513 | 143E |
| 0001655600 | 000B | 0081 | 6C0B | 7361 | 5F74 | 6572 | 7574 | 6E72 |
| 0001655620 | 0201 | 0120 | 6321 | 05BA | 00ED | 0010 | 00E2 | 0000 |
| 0001655640 | 1104 | 7464 | 5F6C | 7473 | 5F72 | 6C61 | 6F6C | 5F63 |
| 0001655660 | 6163 | 0974 | 0604 | C000 | 0300 | 7273 | 0F63 | 0A04 |
| 0001655700 | C100 | 0900 | 6C61 | 6F6C | 6163 | 6574 | 0A64 | 0E04 |
| 0001655720 | 4B00 | 0402 | 6574 | 7478 | 0412 | FFFC | 0085 | 740C |
| 0001655740 | 746F | 6C61 | 6C5F | 6E65 | 7467 | 0168 | 1802 | 0E01 |

THU MAR 14 17:31:54 1991 DB_PI.DLL PAGE 409, LINE 24073

| | | | | | | | | |
|---|---|---|---|---|---|---|---|---|
| 0001655760 | C164 | B905 | 1001 | AE00 | 0001 | 0400 | 6409 | 6C74 |
| 0001656000 | 695F | 706E | 7475 | 0407 | FFFC | 0081 | 6301 | 0005 |
| 0001656020 | 6442 | 011A | 0410 | FFFA | 0081 | 790A | 5F79 | 5F6E |
| 0001656040 | 6863 | 7261 | 0173 | 0102 | 1802 | C701 | C365 | 0E05 |
| 0001656060 | 1001 | 0300 | 0001 | 0400 | 6409 | 6C74 | 755F | 706E |
| 0001656100 | 7475 | 0407 | 0006 | 0080 | 6301 | 0005 | 65FA | 003C |
| 0001656120 | 0D06 | 0081 | 010E | 0F69 | 810D | 0F00 | 790A | 5F79 |
| 0001656140 | 7562 | 5F66 | 6F70 | 0173 | 0102 | 1802 | D501 | C466 |
| 0001656160 | 4405 | 1006 | 3900 | 0006 | 0400 | 6409 | 6C74 | 795F |
| 0001656200 | 6C79 | 7865 | 0D0D | 0081 | 080E | 7979 | 635F | 7275 |
| 0001656220 | 7473 | 040C | FFF0 | 0080 | 7906 | 5F79 | 7973 | 106D |
| 0001656240 | F204 | 81FF | 0A00 | 7979 | 6E5F | 635F | 6168 | 7372 |
| 0001656260 | 040B | FFF6 | 0081 | 7905 | 5F79 | 706C | 040C | FFF8 |
| 0001656300 | 0081 | 7906 | 5F79 | 6969 | 1069 | F404 | 81FF | 0A00 |
| 0001656320 | 7979 | 625F | 6675 | 705F | 736F | 040C | FFFA | 0081 |
| 0001656340 | 7906 | 5F79 | 6361 | 1374 | FC04 | 81FF | 0D00 | 7979 |
| 0001656360 | 665F | 6C75 | 5F6C | 616D | 6374 | 0E68 | 340B | 0067 |
| 0001656400 | 6409 | 5F6F | 6361 | 6974 | 6E6F | 0B13 | 6A74 | 0E00 |
| 0001656420 | 6567 | 5F74 | 656E | 7478 | 745F | 6B6F | 6E65 | 0B0B |
| 0001656440 | 6B49 | 0600 | 6173 | 6577 | 666F | 0B0E | 6CB6 | 0900 |
| 0001656460 | 6966 | 646E | 725F | 6C75 | 0165 | 2802 | 1901 | C86D |
| 0001656500 | BA05 | 1002 | AF00 | 0002 | 0400 | 6419 | 6C74 | 655F |
| 0001656520 | 7478 | 6172 | 7463 | 705F | 7968 | 5F73 | 7266 | 6D6F |
| 0001656540 | 6C5F | 676F | 0411 | 0006 | 00C0 | 6F0B | 6A62 | 6C5F |
| 0001656560 | 676F | 6170 | 6874 | 0412 | 000A | 024B | 700C | 7968 |
| 0001656600 | 7073 | 7461 | 5F68 | 6461 | 1072 | F404 | 0FFE | 0A04 |
| 0001656620 | 7766 | 6F5F | 6A62 | 705F | 7274 | 040D | FDF4 | 04A9 |
| 0001656640 | 6C07 | 676F | 6170 | 6874 | 0418 | FEFC | 04A9 | 6912 |
| 0001656660 | 746E | 7265 | 5F6E | 626F | 5F6A | 6F6C | 7067 | 7461 |
| 0001656700 | 0968 | F804 | C0FE | 0300 | 6863 | 0870 | FC04 | 81FF |
| 0001656720 | 0200 | 7473 | 0201 | 0129 | 6FD3 | 05CB | 0193 | 0010 |
| 0001656740 | 0188 | 0000 | 1A04 | 7464 | 5F6C | 7865 | 7274 | 6361 |
| 0001656760 | 5F74 | 6870 | 7379 | 665F | 6F72 | 5F6D | 6870 | 7379 |
| 0001657000 | 0413 | 0006 | 00C0 | 720D | 6C65 | 7461 | 7669 | 5F65 |
| 0001657020 | 616E | 656D | 0412 | 000A | 024B | 6F0C | 7475 | 705F |
| 0001657040 | 7461 | 5F68 | 6461 | 1272 | FA04 | A9FE | 0C04 | 7563 |
| 0001657060 | 7272 | 6E65 | 5F74 | 6170 | 6874 | 0409 | FFFA | 00C0 |
| 0001657100 | 6303 | 7068 | 0201 | 0127 | 7166 | 05CD | 01C6 | 0010 |
| 0001657120 | 01BB | 0000 | 1804 | 7464 | 5F6C | 6573 | 5F74 | 6E69 |
| 0001657140 | 7469 | 6169 | 5F6C | 6170 | 6874 | 616E | 656D | 040D |
| 0001657160 | 0006 | 00C0 | 6C07 | 676F | 6170 | 6874 | 040E | 000A |
| 0001657200 | 0085 | 7008 | 7968 | 6973 | 6163 | 086C | FC04 | 81FF |
| 0001657220 | 0200 | 7473 | 0514 | 5726 | 000B | 00C0 | 700C | 7968 |
| 0001657240 | 7073 | 7461 | 5F68 | 7470 | 0172 | 2002 | 2C01 | CF73 |
| 0001657260 | C805 | 1000 | BD00 | 0000 | 0400 | 6411 | 6C74 | 735F |
| 0001657300 | 7274 | 615F | 6C6C | 636F | 635F | 7970 | 0409 | 0006 |
| 0001657320 | 00C0 | 7303 | 6372 | 040F | 000A | 00C1 | 6109 | 6C6C |
| 0001657340 | 636F | 7461 | 6465 | 040A | 000E | 024B | 7404 | 7865 |
| 0001657360 | 0174 | 2302 | F401 | D173 | E805 | 1000 | DD00 | 0000 |
| 0001657400 | 0400 | 6414 | 6C74 | 6E5F | 726F | 616D | 696C | 657A |
| 0001657420 | 735F | 7274 | 6E69 | 0967 | 0604 | C000 | 0300 | 7473 |
| 0001657440 | 1272 | FA04 | C0FF | 0C00 | 6E69 | 6573 | 7472 | 6F69 |
| 0001657460 | 5F6E | 7470 | 0413 | FFF6 | 00C0 | 630D | 6C6F | 656C |
| 0001657500 | 7463 | 6F69 | 5F6E | 7470 | 0201 | 011C | 74DC | 05D3 |
| 0001657520 | 0040 | 0010 | 0035 | 0000 | 0D04 | 7464 | 5F6C | 6C63 |
| 0001657540 | 736F | 5F65 | 6C61 | 016C | 1C02 | 1C01 | D575 | A705 |
| 0001657560 | 1005 | 9C00 | 0005 | 0400 | 640D | 6C74 | 675F | 7465 |
| 0001657600 | 745F | 6B6F | 6E65 | 040B | 0006 | 00C1 | 7405 | 6B6F |
| 0001657620 | 6E65 | 040A | 000A | 024B | 7404 | 7865 | 0A74 | 0E04 |

THU MAR 14 17:31:54 1991 DB_PI.DLL PAGE 410, LINE 24132

| | | | | | | | | |
|---|---|---|---|---|---|---|---|---|
| 0001657640 | C500 | 0400 | 696C | 656E | 0412 | 0012 | 00C0 | 6C0C |
| 0001657660 | 676F | 705F | 7461 | 6E68 | 6D61 | 0F65 | FE04 | A9FE |
| 0001657700 | 0904 | 6574 | 706D | 6E5F | 6D61 | 0865 | FC04 | 81FE |
| 0001657720 | 0200 | 7473 | 0514 | 572A | 000B | 00C0 | 700C | 7968 |
| 0001657740 | 7073 | 7461 | 5F68 | 7470 | 0172 | 0902 | 4005 | 0B14 |
| 0001657760 | BB00 | 0105 | 0961 | A805 | 0B14 | BC00 | 0105 | 056C |
| 0001660000 | 000D | 1A00 | 0900 | F205 | 0B14 | BD00 | 0105 | 0962 |
| 0001660020 | 9805 | 0B15 | BD00 | 0105 | 0964 | 3E05 | 0B16 | BE00 |
| 0001660040 | 0105 | 096E | C405 | 0B21 | BE00 | 0105 | 0D63 | 4E05 |
| 0001660060 | 0B2D | 0600 | 0502 | 7979 | 756F | 1074 | 2005 | 0B54 |
| 0001660100 | 8100 | 0800 | 7979 | 735F | 6174 | 7472 | 0512 | 541A |
| 0001660120 | 000B | 0081 | 790A | 5F79 | 5F62 | 7562 | 5F66 | 1270 |
| 0001660140 | 1C05 | 0B54 | 8100 | 0A00 | 7979 | 635F | 625F | 6675 |
| 0001660160 | 705F | 0512 | 541E | 000B | 0081 | 790A | 5F79 | 5F65 |
| 0001660200 | 7562 | 5F66 | 1270 | 5205 | 0B2D | 8100 | 0A00 | 7979 |
| 0001660220 | 735F | 7761 | 655F | 666F | 050F | 2D54 | 000B | 0081 |
| 0001660240 | 7907 | 5F79 | 6E69 | 7469 | 0511 | 5424 | 000B | 05BF |
| 0001660260 | 7909 | 5F79 | 6863 | 625F | 6675 | 0511 | 5526 | 000B |
| 0001660300 | 05C0 | 7909 | 5F79 | 7473 | 625F | 6675 | 0514 | 5422 |
| 0001660320 | 000B | 0080 | 790C | 5F79 | 6F68 | 646C | 635F | 6168 |
| 0001660340 | 1272 | 0005 | 0A00 | C000 | 0A00 | 7464 | 5F6C | 7979 |
| 0001660360 | 6574 | 7478 | 050E | 0304 | 000A | 0081 | 7906 | 6C79 |
| 0001660400 | 6E65 | 0F67 | 2605 | 0B14 | C000 | 0700 | 5F42 | 4678 |
| 0001660420 | 6C69 | 0F65 | 2A05 | 0B14 | C000 | 0700 | 5F42 | 5078 |
| 0001660440 | 6361 | 106B | 4A05 | 0B2D | 0600 | 0802 | 7464 | 5F6C |
| 0001660460 | 7979 | 6E69 | 0513 | 142E | 000B | 0085 | 690B | 696E |
| 0001660500 | 6974 | 6C61 | 7A69 | 6465 | 050C | 30F6 | 000B | 0205 |
| 0001660520 | 5F04 | 6F69 | 1462 | E605 | 0B48 | 8100 | 0C00 | 7563 |
| 0001660540 | 7272 | 6E65 | 5F74 | 6966 | 656C | 0512 | 53EE | 000B |
| 0001660560 | 05B2 | 660A | 6C69 | 5F65 | 7473 | 6361 | 156B | EC05 |
| 0001660600 | 0B48 | B300 | 0D05 | 6F6C | 7067 | 7461 | 5F68 | 7473 |
| 0001660620 | 6361 | 166B | D005 | 0B3D | B300 | 0E05 | 6870 | 7379 |
| 0001660640 | 6170 | 6874 | 735F | 6174 | 6B63 | 0516 | 48D0 | 000B |
| 0001660660 | 05B4 | 790E | 6C79 | 6E69 | 6E65 | 5F6F | 7473 | 6361 |
| 0001660700 | 1B6B | 3005 | 0B14 | 8100 | 1300 | 7473 | 706F | 725F |
| 0001660720 | 6165 | 6964 | 676E | 6F5F | 5F6E | 6F65 | 0B66 | E805 |
| 0001660740 | 0B48 | C000 | 0300 | 6863 | 0B70 | EC05 | 0B53 | 8100 |
| 0001660760 | 0300 | 6D74 | 1270 | 3205 | 0B14 | 8500 | 0A00 | 6E69 |
| 0001661000 | 695F | 636E | 756C | 6564 | 0516 | 1434 | 000B | 0081 |
| 0001661020 | 740E | 7865 | 5F74 | 6C61 | 6F6C | 6163 | 6574 | 1664 |
| 0001661040 | BE05 | 0B3D | B500 | 0E05 | 6F6C | 676E | 6D6A | 5F70 |
| 0001661060 | 7562 | 6666 | 7265 | 0515 | 1436 | 000B | 0085 | 640D |
| 0001661100 | 6C74 | 695F | 5F6E | 7473 | 6972 | 676E | 0516 | 1438 |
| 0001661120 | 000B | 00C0 | 640E | 6C74 | 735F | 7274 | 625F | 6675 |
| 0001661140 | 6566 | 1972 | 3C05 | 0B14 | 8100 | 1100 | 7464 | 5F6C |
| 0001661160 | 7473 | 5F72 | 6C61 | 6F6C | 6163 | 6574 | 0564 | 0311 |
| 0001661200 | 0000 | 1F00 | C401 | 937A | D405 | 1000 | C900 | 0000 |
| 0001661220 | 0400 | 6410 | 5F62 | 7473 | 5F72 | 6C61 | 6F6C | 5F63 |
| 0001661240 | 6163 | 0974 | 0604 | C000 | 0300 | 7273 | 0F63 | 0A04 |
| 0001661260 | C100 | 0900 | 6C61 | 6F6C | 6163 | 6574 | 0A64 | 0E04 |
| 0001661300 | 4C00 | 0402 | 6574 | 7478 | 0412 | FFFC | 0085 | 740C |
| 0001661320 | 746F | 6C61 | 6C5F | 6E65 | 7467 | 0168 | 1C02 | 9801 |
| 0001661340 | 957B | 5305 | 100A | 4800 | 000A | 0400 | 640D | 7074 |
| 0001661360 | 6C5F | 616F | 5F64 | 6966 | 656C | 040D | 0006 | 00C0 |
| 0001661400 | 6C07 | 676F | 6170 | 6874 | 040E | 000A | 0085 | 7008 |
| 0001661420 | 7968 | 6973 | 6163 | 0D6C | 0C04 | C000 | 0700 | 7973 |
| 0001661440 | 5F6D | 6174 | 0F62 | 1004 | 8600 | 0905 | 6461 | 5F64 |
| 0001661460 | 6E65 | 7274 | 0F79 | 1404 | 8900 | 0905 | 6567 | 5F74 |
| 0001661500 | 6E65 | 7274 | 0E79 | 1804 | C000 | 0800 | 7265 | 5F72 |

THU MAR 14 17:31:54 1991 DB_PI.DLL PAGE 411, LINE 24191

| | | | | | | | | |
|---|---|---|---|---|---|---|---|---|
| 0001661520 | 6170 | 6874 | 040D | 001C | 00C5 | 6C07 | 6E69 | 5F65 |
| 0001661540 | 6F6E | 0411 | 0020 | 00C5 | 650B | 7272 | 6F5F | 5F6E |
| 0001661560 | 6E69 | 7469 | 0412 | FFDC | 02E3 | 630C | 7275 | 6572 |
| 0001661600 | 746E | 695F | 6574 | 0D6D | D804 | C0FF | 0700 | 6D74 |
| 0001661620 | 5F70 | 6176 | 0E6C | C804 | 85FF | 0800 | 6176 | 5F6C |
| 0001661640 | 6973 | 657A | 0408 | FFD0 | 0081 | 7302 | 0B74 | FC04 |
| 0001661660 | 81FF | 0500 | 6F74 | 656B | 106E | D604 | 81FF | 0A00 |
| 0001661700 | 616C | 7473 | 745F | 6B6F | 6E65 | 0410 | FFC6 | 0081 |
| 0001661720 | 6E0A | 7865 | 5F74 | 6F74 | 656B | 106E | D204 | C0FF |
| 0001661740 | 0A00 | 6F74 | 656B | 5F6E | 6574 | 7478 | 040E | FFCC |
| 0001661760 | 0085 | 6908 | 5F6E | 616D | 7263 | 146F | CA04 | 85FF |
| 0001662000 | 0E00 | 616D | 7263 | 5F6F | 7865 | 6170 | 646E | 6465 |
| 0001662020 | 040D | FFCE | 0085 | 7307 | 7761 | 695F | 3164 | 050F |
| 0001662040 | 2D6C | 000B | 00C0 | 7407 | 706D | 625F | 6675 | 0511 |
| 0001662060 | 2D70 | 000B | 0081 | 6109 | 6C6C | 636F | 7461 | 6465 |
| 0001662100 | 0201 | 0120 | 85EB | 0598 | 0087 | 0010 | 007C | 0000 |
| 0001662120 | 1104 | 7464 | 5F70 | 6F6E | 6D72 | 6C61 | 7A69 | 5F65 |
| 0001662140 | 7473 | 1572 | 0604 | 8500 | 0F00 | 6966 | 7372 | 5F74 |
| 0001662160 | 7469 | 6D65 | 6F5F | 6C6E | 0979 | 0804 | C000 | 0300 |
| 0001662200 | 7473 | 1072 | F604 | C0FF | 0A00 | 6F63 | 6C6C | 6365 |
| 0001662220 | 5F74 | 7470 | 040F | FFFA | 00C0 | 6909 | 736E | 7265 |
| 0001662240 | 5F74 | 7470 | 040F | FFF4 | 0085 | 6909 | 5F6E | 7473 |
| 0001662260 | 6972 | 676E | 0201 | 011B | 8672 | 059A | 011A | 0010 |
| 0001662300 | 010F | 0000 | 0C04 | 6264 | 635F | 6766 | 665F | 7570 |
| 0001662320 | 7374 | 0409 | 0006 | 00C0 | 7303 | 7274 | 0408 | 000A |
| 0001662340 | 035A | 6602 | 1070 | FC04 | 81FF | 0A00 | 6863 | 7261 |
| 0001662360 | 635F | 756F | 746E | 0201 | 0126 | 878C | 059E | 005F |
| 0001662400 | 0010 | 0054 | 0000 | 1704 | 6264 | 635F | 6766 | 665F |
| 0001662420 | 6C6F | 5F64 | 7473 | 5F72 | 6F74 | 7075 | 6570 | 0972 |
| 0001662440 | 0604 | C000 | 0300 | 7473 | 0972 | FA04 | C0FF | 0300 |
| 0001662460 | 6863 | 0170 | 0502 | 000D | 1A00 | 0E00 | 5C05 | 0B35 |
| 0001662500 | B800 | 0602 | 635F | 7974 | 6570 | 1105 | 0003 | 0000 |
| 0001662520 | 0121 | 87EC | 05BF | 0132 | 0016 | 0124 | 0000 | 1204 |
| 0001662540 | 6264 | 725F | 6365 | 766F | 7265 | 735F | 6275 | 7274 |
| 0001662560 | 6565 | 040D | 0014 | 00C0 | 6C07 | 676F | 6170 | 6874 |
| 0001662600 | 040C | 0012 | 0081 | 6D06 | 7465 | 6F68 | 1164 | 0E04 |
| 0001662620 | C100 | 0B00 | 656D | 6874 | 646F | 755F | 6573 | 0B64 |
| 0001662640 | 0A04 | C500 | 0500 | 6F6E | 6564 | 0A73 | 0604 | C500 |
| 0001662660 | 0400 | 6F6C | 7473 | 040C | FFFA | 00C0 | 5F06 | 745F |
| 0001662700 | 7079 | 0F65 | F404 | 85FF | 0900 | 5F5F | 7862 | 745F |
| 0001662720 | 7079 | 0D65 | E404 | F1FF | 0702 | 5F5F | 7270 | 6E69 |
| 0001662740 | 0B74 | DC04 | 02FF | 0502 | 5F5F | 766C | 0D6C | E804 |
| 0001662760 | C3FF | 0705 | 5F5F | 6C63 | 636F | 0D6B | F604 | C0FF |
| 0001663000 | 0700 | 5F5F | 7473 | 6361 | 0E6B | E204 | 81FF | 0800 |
| 0001663020 | 5F5F | 6572 | 7674 | 6C61 | 050E | 2DAE | 000B | 05C1 |
| 0001663040 | 5F06 | 665F | 6E75 | 0163 | 1D02 | 1E01 | C589 | 5C05 |
| 0001663060 | 1606 | 4E00 | 0006 | 0400 | 640E | 5F62 | 6572 | 6F63 |
| 0001663100 | 6576 | 5F72 | 6473 | 0C62 | 1604 | 8600 | 0600 | 7374 |
| 0001663120 | 5F74 | 6469 | 040E | 0014 | 0081 | 7308 | 6264 | 745F |
| 0001663140 | 7079 | 0C65 | 1204 | 8100 | 0600 | 656D | 6874 | 646F |
| 0001663160 | 0411 | 000E | 00C1 | 6D0B | 7465 | 6F68 | 5F64 | 7375 |
| 0001663200 | 6465 | 040D | 000A | 00C5 | 6F07 | 6A62 | 6365 | 7374 |
| 0001663220 | 040A | 0006 | 00C5 | 6C04 | 736F | 0C74 | F604 | C0FF |
| 0001663240 | 0600 | 5F5F | 7974 | 6570 | 040F | FFEE | 0085 | 5F09 |
| 0001663260 | 625F | 5F78 | 7974 | 6570 | 040D | FFDE | 02F1 | 5F07 |
| 0001663300 | 705F | 6972 | 746E | 040B | FFD6 | 0202 | 5F05 | 6C5F |
| 0001663320 | 6C76 | 040D | FFE2 | 05C3 | 5F07 | 635F | 6F6C | 6B63 |
| 0001663340 | 040D | FFF2 | 00C0 | 5F07 | 735F | 6174 | 6B63 | 040E |
| 0001663360 | FFDC | 0081 | 5F08 | 725F | 7465 | 6176 | 0D6C | FA04 |

THU MAR 14 17:31:54 1991 DB_PI.DLL PAGE 412, LINE 24250

| | | | | | | | | |
|---|---|---|---|---|---|---|---|---|
| 0001663400 | F5FF | 0704 | 7374 | 5F74 | 7470 | 0872 | F004 | 81FF |
| 0001663420 | 0200 | 7473 | 050E | 2DD0 | 000B | 05C7 | 5F06 | 665F |
| 0001663440 | 6E75 | 0163 | 1F02 | 7A01 | C98F | 6105 | 1002 | 5600 |
| 0001663460 | 0002 | 0400 | 6410 | 5F62 | 616D | 656B | 745F | 706D |
| 0001663500 | 635F | 706F | 0D79 | 0604 | F500 | 0704 | 7374 | 5F74 |
| 0001663520 | 7470 | 0E72 | 0A04 | C000 | 0800 | 6966 | 656C | 616E |
| 0001663540 | 656D | 040F | FDFE | 0489 | 6609 | 6C75 | 5F6C | 616E |
| 0001663560 | 656D | 040F | FEFE | 0489 | 6F09 | 6972 | 5F67 | 616E |
| 0001663600 | 656D | 0409 | FDF8 | 00C0 | 6303 | 7068 | 0408 | FDFC |
| 0001663620 | 0081 | 7302 | 0174 | 2202 | DB01 | CC91 | D005 | 1001 |
| 0001663640 | C500 | 0001 | 0400 | 6413 | 5F62 | 6572 | 7473 | 726F |
| 0001663660 | 5F65 | 6D74 | 5F70 | 6F63 | 7970 | 040D | 0006 | 04F5 |
| 0001663700 | 7407 | 7473 | 705F | 7274 | 040E | 000A | 00C0 | 6608 |
| 0001663720 | 6C69 | 6E65 | 6D61 | 0F65 | FE04 | 89FD | 0904 | 7566 |
| 0001663740 | 6C6C | 6E5F | 6D61 | 0F65 | FE04 | 89FE | 0904 | 726F |
| 0001663760 | 6769 | 6E5F | 6D61 | 0965 | F804 | C0FD | 0300 | 6863 |
| 0001664000 | 0870 | FC04 | 81FD | 0200 | 7473 | 0201 | 0120 | 93AB |
| 0001664020 | 05CE | 030D | 0010 | 0302 | 0000 | 1104 | 6264 | 725F |
| 0001664040 | 6365 | 766F | 7265 | 735F | 6264 | 625F | 0D79 | 0604 |
| 0001664060 | F500 | 0704 | 7374 | 5F74 | 7470 | 0D72 | 0A04 | 8100 |
| 0001664100 | 0700 | 6473 | 5F62 | 7974 | 0C70 | 0C04 | 8100 | 0600 |
| 0001664120 | 656D | 6874 | 646F | 040D | 000E | 00C5 | 6F07 | 6A62 |
| 0001664140 | 6365 | 7374 | 040A | 0012 | 00C5 | 6C04 | 736F | 1174 |
| 0001664160 | EE04 | A1FE | 0B04 | 6274 | 5F6C | 6468 | 5F6C | 7470 |
| 0001664200 | 0872 | F404 | 81FF | 0200 | 7473 | 0416 | FFFA | 00C0 |
| 0001664220 | 6510 | 7478 | 7265 | 5F6E | 7475 | 6C69 | 6E5F | 6D61 |
| 0001664240 | 1265 | F204 | 89FE | 0C04 | 7270 | 626F | 656C | 5F6D |
| 0001664260 | 6170 | 6874 | 0412 | FFF2 | 0085 | 700C | 6F72 | 6C62 |
| 0001664300 | 6D65 | 6C5F | 6E69 | 1065 | F604 | 86FF | 0A00 | 6966 |
| 0001664320 | 7463 | 7669 | 5F65 | 6469 | 0201 | 0122 | 96B8 | 05D3 |
| 0001664340 | 00E5 | 0010 | 00DA | 0000 | 1304 | 6264 | 635F | 6B68 |
| 0001664360 | 615F | 646E | 725F | 7663 | 5F72 | 6473 | 0C62 | 0604 |
| 0001664400 | 8600 | 0600 | 7374 | 5F74 | 6469 | 040E | 000A | 0081 |
| 0001664420 | 7308 | 6264 | 745F | 7079 | 0E65 | 0C04 | 8500 | 0800 |
| 0001664440 | 6966 | 5F78 | 6C66 | 6761 | 040E | 000E | 00C1 | 6F08 |
| 0001664460 | 6A62 | 735F | 6174 | 0874 | F804 | 81FF | 0200 | 7473 |
| 0001664500 | 0411 | FFFC | 0081 | 6D0B | 7465 | 6F68 | 5F64 | 7375 |
| 0001664520 | 6465 | 040F | FFF6 | 0081 | 7209 | 6365 | 766F | 7265 |
| 0001664540 | 6465 | 040A | FFFA | 0081 | 6C04 | 736F | 0174 | 2602 |
| 0001664560 | 9D01 | D797 | 1405 | 1001 | 0900 | 0001 | 0400 | 6417 |
| 0001664600 | 5F62 | 6461 | 5F64 | 6576 | 6972 | 6966 | 6163 | 6974 |
| 0001664620 | 6E6F | 655F | 7272 | 040E | 0006 | 00C0 | 6F08 | 6A62 |
| 0001664640 | 6E5F | 6D61 | 0C65 | 0A04 | 8600 | 0600 | 626F | 5F6A |
| 0001664660 | 6469 | 040E | 000E | 0081 | 6F08 | 6A62 | 745F | 7079 |
| 0001664700 | 0A65 | 1004 | 8100 | 0400 | 7473 | 7461 | 040E | 0012 |
| 0001664720 | 00C0 | 7008 | 7461 | 5F68 | 7470 | 0D72 | 1604 | 8600 |
| 0001664740 | 0700 | 6574 | 7473 | 695F | 1264 | 1A04 | 7C00 | 0C04 |
| 0001664760 | 7265 | 5F72 | 696C | 7473 | 615F | 7264 | 0410 | 001E |
| 0001665000 | 00C5 | 650A | 7272 | 6E5F | 5F6F | 6461 | 0D72 | 2204 |
| 0001665020 | C500 | 0700 | 6D74 | 5F70 | 6E63 | 0174 | 2002 | B101 |
| 0001665040 | DB98 | 8A05 | 1002 | 7F00 | 0002 | 0400 | 6411 | 5F62 |
| 0001665060 | 6576 | 6972 | 7966 | 6F5F | 656E | 735F | 6264 | 040E |
| 0001665100 | 0006 | 04F5 | 7408 | 7365 | 5F74 | 7470 | 0D72 | 0A04 |
| 0001665120 | 8600 | 0700 | 6574 | 7473 | 695F | 0E64 | 0E04 | 8100 |
| 0001665140 | 0800 | 6473 | 5F62 | 7974 | 6570 | 0412 | 0010 | 00C0 |
| 0001665160 | 730C | 6264 | 665F | 6C69 | 6E65 | 6D61 | 0E65 | 1404 |
| 0001665200 | 8500 | 0800 | 6966 | 5F78 | 6C66 | 6761 | 0411 | 0016 |
| 0001665220 | 0081 | 630B | 6568 | 6B63 | 6C5F | 7665 | 6C65 | 0412 |
| 0001665240 | 0018 | 047C | 650C | 7272 | 6C5F | 7369 | 5F74 | 6461 |

THU MAR 14 17:31:54 1991 DB_PI.DLL PAGE 413, LINE 24309

| | | | | | | | | |
|---|---|---|---|---|---|---|---|---|
| 0001665260 | 1072 | 1C04 | C500 | 0A00 | 7265 | 5F72 | 6F6E | 615F |
| 0001665300 | 7264 | 040D | 0020 | 00C5 | 7407 | 706D | 635F | 746E |
| 0001665320 | 040A | FEEE | 0489 | 7004 | 7461 | 0868 | F004 | 81FF |
| 0001665340 | 0200 | 7473 | 040A | FFFA | 0085 | 7504 | 6573 | 1164 |
| 0001665360 | F404 | 5EFF | 0B05 | 6162 | 5F64 | 6D69 | 5F67 | 736C |
| 0001665400 | 0774 | EE04 | 85FF | 0100 | 0F69 | EC04 | 81FE | 0900 |
| 0001665420 | 6572 | 6F63 | 6576 | 6572 | 0A64 | F804 | 81FF | 0400 |
| 0001665440 | 6F6C | 7473 | 0411 | FFFC | 0081 | 6D0B | 7465 | 6F68 |
| 0001665460 | 5F64 | 7375 | 6465 | 040E | FFF2 | 0081 | 6F08 | 6A62 |
| 0001665500 | 735F | 6174 | 0174 | 2102 | 3B01 | DF9B | 5C05 | 1002 |
| 0001665520 | 5100 | 0002 | 0400 | 6412 | 5F62 | 6576 | 6972 | 7966 |
| 0001665540 | 615F | 6C6C | 735F | 6264 | 0D73 | 0604 | 8600 | 0700 |
| 0001665560 | 6574 | 7473 | 695F | 0E64 | 0A04 | 8500 | 0800 | 6966 |
| 0001665600 | 5F78 | 6C66 | 6761 | 0411 | 000C | 0081 | 630B | 6568 |
| 0001665620 | 6B63 | 6C5F | 7665 | 6C65 | 0412 | 000E | 047C | 650C |
| 0001665640 | 7272 | 6C5F | 7369 | 5F74 | 6461 | 1072 | 1204 | C500 |
| 0001665660 | 0A00 | 7265 | 5F72 | 6F6E | 615F | 7264 | 040D | 0016 |
| 0001665700 | 00C5 | 7407 | 706D | 635F | 746E | 040E | FFFA | 04F5 |
| 0001665720 | 7408 | 7365 | 5F74 | 7470 | 0872 | F804 | 81FF | 0200 |
| 0001665740 | 7473 | 0201 | 0124 | 9D97 | 05E3 | 022D | 0010 | 0222 |
| 0001665760 | 0000 | 1504 | 6264 | 635F | 6568 | 6B63 | 6C5F | 676F |
| 0001666000 | 6369 | 6C61 | 745F | 6572 | 0E65 | 0604 | D900 | 0804 |
| 0001666020 | 7274 | 6565 | 705F | 7274 | 040E | 000A | 00C0 | 6F08 |
| 0001666040 | 6A62 | 6E5F | 6D61 | 0C65 | 0E04 | 8600 | 0600 | 626F |
| 0001666060 | 5F6A | 6469 | 040F | 0012 | 0081 | 6309 | 6B68 | 6C5F |
| 0001666100 | 7665 | 6C65 | 0409 | 0014 | 0085 | 6603 | 7869 | 0412 |
| 0001666120 | 0016 | 047C | 650C | 7272 | 6C5F | 7369 | 5F74 | 6461 |
| 0001666140 | 1072 | 1A04 | C500 | 0A00 | 7265 | 5F72 | 6F6E | 615F |
| 0001666160 | 7264 | 040D | 001E | 00C5 | 7407 | 706D | 635F | 746E |
| 0001666200 | 0408 | FFF6 | 0081 | 7302 | 0774 | F404 | 85FF | 0100 |
| 0001666220 | 0E69 | F804 | 81FF | 0800 | 626F | 5F6A | 7473 | 7461 |
| 0001666240 | 040C | FEF0 | 0085 | 6306 | 5F68 | 6E63 | 0D74 | FA04 |
| 0001666260 | E1FF | 0703 | 6863 | 6C5F | 7369 | 0E74 | F204 | 81FF |
| 0001666300 | 0800 | 626F | 5F6A | 7974 | 6570 | 040E | FEF2 | 0489 |
| 0001666320 | 7008 | 7461 | 6E68 | 6D61 | 0165 | 1B02 | C401 | E59F |
| 0001666340 | 2805 | 1601 | 1A00 | 0001 | 0400 | 640C | 5F62 | 6E69 |
| 0001666360 | 6574 | 7267 | 7469 | 1279 | 1604 | C000 | 0C00 | 6F6C |
| 0001666400 | 5F67 | 6170 | 6874 | 616E | 656D | 040C | 0012 | 0086 |
| 0001666420 | 6F06 | 6A62 | 695F | 0F64 | 1004 | 8100 | 0900 | 6E69 |
| 0001666440 | 5F74 | 656C | 6576 | 0E6C | 0E04 | 8500 | 0800 | 6966 |
| 0001666460 | 5F78 | 6C66 | 6761 | 040D | 000A | 00C5 | 6307 | 746E |
| 0001666500 | 615F | 7264 | 0412 | 0006 | 047C | 6F0C | 7475 | 6C5F |
| 0001666520 | 7369 | 5F74 | 6461 | 0E72 | F804 | D9FF | 0804 | 7274 |
| 0001666540 | 6565 | 705F | 7274 | 040D | FFF2 | 00C0 | 6C07 | 676F |
| 0001666560 | 705F | 7274 | 040D | FFFC | 0085 | 7407 | 706D | 635F |
| 0001666600 | 746E | 0408 | FFF6 | 0081 | 7302 | 0174 | 2302 | EC01 |
| 0001666620 | E7A0 | 6205 | 1600 | 5400 | 0000 | 0400 | 6414 | 5F62 |
| 0001666640 | 7266 | 6565 | 695F | 746E | 6765 | 6972 | 7974 | 655F |
| 0001666660 | 0F72 | 0804 | 7D00 | 0904 | 6E69 | 6574 | 5F67 | 7470 |
| 0001666700 | 0B72 | 0604 | 8500 | 0500 | 6F63 | 6E75 | 0774 | FC04 |
| 0001666720 | 85FF | 0100 | 0169 | 0502 | 000D | 1A00 | 2400 | A805 |
| 0001666740 | 0B2D | B900 | 1C05 | 6264 | 5F30 | 6564 | 6166 | 6C75 |
| 0001666760 | 5F74 | 7865 | 6574 | 6E72 | 725F | 6365 | 7276 | 635F |
| 0001667000 | 646D | 050F | 2DA0 | 000B | 00C0 | 4207 | 785F | 6946 |
| 0001667020 | 656C | 050F | 2DA4 | 000B | 00C0 | 4207 | 785F | 6150 |
| 0001667040 | 6B63 | 0514 | 0000 | 0000 | 0081 | 420C | 5F78 | 6544 |
| 0001667060 | 7562 | 4D67 | 646F | 1465 | 0005 | 0000 | 8100 | 0C00 |
| 0001667100 | 7842 | 545F | 6D69 | 7365 | 6F4D | 6564 | 1105 | 0003 |
| 0001667120 | 0000 | 0114 | A14E | 0555 | 015B | 0016 | 014D | 0000 |

THU MAR 14 17:31:54 1991 DB_PI.DLL PAGE 414, LINE 24368

| | | | | | | | | |
|---|---|---|---|---|---|---|---|---|
| 0001667140 | 0504 | 6264 | 645F | 0E75 | 0C04 | C000 | 0800 | 6964 |
| 0001667160 | 5F72 | 6170 | 6874 | 040B | 000A | 0081 | 7305 | 6F63 |
| 0001667200 | 6570 | 040A | 0006 | 00C6 | 7304 | 7A69 | 0C65 | FA04 |
| 0001667220 | C0FF | 0600 | 5F5F | 7974 | 6570 | 040F | FFF4 | 0085 |
| 0001667240 | 5F09 | 625F | 5F78 | 7974 | 6570 | 040D | FFE4 | 022A |
| 0001667260 | 5F07 | 705F | 6972 | 746E | 040B | FFDC | 0202 | 5F05 |
| 0001667300 | 6C5F | 6C76 | 040D | FFE8 | 055A | 5F07 | 635F | 6F6C |
| 0001667320 | 6B63 | 040D | FFF6 | 00C0 | 5F07 | 735F | 6174 | 6B63 |
| 0001667340 | 040E | FFE2 | 0081 | 5F08 | 725F | 7465 | 6176 | 0E6C |
| 0001667360 | 8405 | 0B2E | 5800 | 0605 | 5F5F | 7566 | 636E | 0201 |
| 0001667400 | 0D05 | 0000 | 001A | 050F | 2E7C | 000B | 00C0 | 4207 |
| 0001667420 | 785F | 6946 | 656C | 050F | 2E80 | 000B | 00C0 | 4207 |
| 0001667440 | 785F | 6150 | 6B63 | 0514 | 0000 | 0000 | 0081 | 420C |
| 0001667460 | 5F78 | 6544 | 7562 | 4D67 | 646F | 1465 | 0005 | 0000 |
| 0001667500 | 8100 | 0C00 | 7842 | 545F | 6D69 | 7365 | 6F4D | 6564 |
| 0001667520 | 1105 | 0004 | 0000 | 011D | 771A | 0438 | 01DF | 0010 |
| 0001667540 | 01D4 | 0000 | 0E04 | 6664 | 635F | 6572 | 7461 | 5F65 |
| 0001667560 | 7274 | 6565 | 040E | 0006 | 03C2 | 7408 | 6572 | 5F65 |
| 0001667600 | 7470 | 1372 | 0A04 | C000 | 0D00 | 6870 | 7379 | 6369 |
| 0001667620 | 6C61 | 705F | 7461 | 0C68 | 8804 | E7FF | 0603 | 7766 |
| 0001667640 | 6F5F | 6A62 | 040D | FF60 | 0409 | 7207 | 6C65 | 6F5F |
| 0001667660 | 6A62 | 040D | FFFA | 0086 | 7207 | 6F6F | 5F74 | 6469 |
| 0001667700 | 0408 | FFF8 | 0081 | 7302 | 0174 | 1D02 | F901 | 3A78 |
| 0001667720 | F304 | 1001 | E800 | 0001 | 0400 | 640E | 5F66 | 6572 |
| 0001667740 | 6F6D | 6576 | 745F | 6572 | 0E65 | 0604 | C200 | 0803 |
| 0001667760 | 7274 | 6565 | 705F | 7274 | 040D | FFFA | 0086 | 7207 |
| 0001670000 | 6F6F | 5F74 | 6469 | 040F | FFF6 | 0086 | 6609 | 6961 |
| 0001670020 | 656C | 5F64 | 6469 | 0408 | FFF4 | 0081 | 7302 | 0174 |
| 0001670040 | 1D02 | EC01 | 3C7A | F304 | 1000 | E800 | 0000 | 0400 |
| 0001670060 | 640E | 5F66 | 6573 | 5F74 | 616C | 7473 | 695F | 0E64 |
| 0001670100 | 0604 | C200 | 0803 | 7274 | 6565 | 705F | 7274 | 040D |
| 0001670120 | FFF8 | 0086 | 6207 | 7361 | 5F65 | 6469 | 0408 | FFF0 |
| 0001670140 | 0086 | 6902 | 0A64 | F604 | 81FF | 0400 | 6973 | 657A |
| 0001670160 | 0409 | FFF4 | 0081 | 7403 | 7079 | 0408 | FFFC | 0081 |
| 0001670200 | 7302 | 0174 | 1B02 | DF01 | 3E7B | BE04 | 1001 | B300 |
| 0001670220 | 0001 | 0400 | 640C | 5F66 | 6F6C | 6461 | 745F | 6572 |
| 0001670240 | 0E65 | 0604 | C200 | 0803 | 7274 | 6565 | 705F | 7274 |
| 0001670260 | 040E | FEFC | 0377 | 6D08 | 7061 | 705F | 7461 | 0868 |
| 0001670300 | FC04 | 81FF | 0200 | 7473 | 0201 | 011D | 7D9D | 0441 |
| 0001670320 | 006B | 0010 | 0060 | 0000 | 0E04 | 6664 | 755F | 6C6E |
| 0001670340 | 616F | 5F64 | 7274 | 6565 | 040E | 0006 | 03C2 | 7408 |
| 0001670360 | 6572 | 5F65 | 7470 | 0872 | FC04 | 81FF | 0200 | 7473 |
| 0001670400 | 0201 | 011F | 7E08 | 0443 | 0265 | 0010 | 025A | 0000 |
| 0001670420 | 1004 | 6664 | 765F | 7265 | 6669 | 5F79 | 626F | 656A |
| 0001670440 | 7463 | 040E | 0006 | 03C2 | 7408 | 6572 | 5F65 | 7470 |
| 0001670460 | 0C72 | 0A04 | 8600 | 0600 | 626F | 5F6A | 6469 | 040E |
| 0001670500 | 000E | 00C0 | 6F08 | 6A62 | 6E5F | 6D61 | 0E65 | 1204 |
| 0001670520 | 8500 | 0800 | 6966 | 5F78 | 6C66 | 6761 | 040C | 0014 |
| 0001670540 | 00C1 | 7306 | 6174 | 7574 | 0E73 | 1804 | C000 | 0800 |
| 0001670560 | 6170 | 6874 | 616E | 656D | 0411 | FE06 | 0403 | 660B |
| 0001670600 | 5F77 | 6973 | 657A | 6F5F | 6A62 | 040D | FFF6 | 0411 |
| 0001670620 | 6F07 | 6A62 | 705F | 7274 | 040A | FCFE | 0081 | 7304 |
| 0001670640 | 7A69 | 0865 | 0404 | 81FE | 0200 | 7473 | 040D | FD00 |
| 0001670660 | 0086 | 6607 | 6961 | 5F6C | 6469 | 040E | FFFA | 0086 |
| 0001670700 | 6308 | 6968 | 646C | 695F | 1064 | 0404 | 77FD | 0A03 |
| 0001670720 | 7564 | 6D6D | 5F79 | 6170 | 6874 | 0201 | 0D05 | 0000 |
| 0001670740 | 001A | 1105 | 0004 | 0000 | 0122 | 806E | 0473 | 0232 |
| 0001670760 | 0010 | 0227 | 0000 | 1304 | 6664 | 635F | 6572 | 7461 |
| 0001671000 | 5F65 | 626F | 5F6A | 6863 | 6C69 | 0E64 | 0604 | FD00 |

THU MAR 14 17:31:54 1991 DB_PI.DLL PAGE 415, LINE 24427

| | | | | | | | | |
|---|---|---|---|---|---|---|---|---|
| 0001671020 | 0803 | 7274 | 6565 | 705F | 7274 | 0414 | 000A | 00C0 |
| 0001671040 | 700E | 7261 | 6E65 | 5F74 | 6F6C | 7067 | 7461 | 0F68 |
| 0001671060 | 0E04 | 8600 | 0900 | 6170 | 6572 | 746E | 695F | 0E64 |
| 0001671100 | 1204 | C000 | 0800 | 626F | 5F6A | 616E | 656D | 040E |
| 0001671120 | 0016 | 0081 | 6F08 | 6A62 | 745F | 7079 | 1365 | 1804 |
| 0001671140 | C000 | 0D00 | 6870 | 7379 | 6369 | 6C61 | 705F | 7461 |
| 0001671160 | 1068 | 1C04 | C600 | 0A00 | 626F | 5F6A | 6469 | 615F |
| 0001671200 | 7264 | 0410 | FFDE | 022C | 760A | 6C61 | 6469 | 6E5F |
| 0001671220 | 6D61 | 0865 | DC04 | 81FF | 0200 | 7473 | 0201 | 011C |
| 0001671240 | 82A0 | 0475 | 009D | 0010 | 0092 | 0000 | 0D04 | 6664 |
| 0001671260 | 635F | 6572 | 7461 | 5F65 | 626F | 0E6A | 0604 | FD00 |
| 0001671300 | 0803 | 7274 | 6565 | 705F | 7274 | 0411 | 000A | 00C0 |
| 0001671320 | 6F0B | 6A62 | 6C5F | 676F | 6170 | 6874 | 040E | 000E |
| 0001671340 | 0081 | 6F08 | 6A62 | 745F | 7079 | 1365 | 1004 | C000 |
| 0001671360 | 0D00 | 6870 | 7379 | 6369 | 6C61 | 705F | 7461 | 1068 |
| 0001671400 | 1404 | C600 | 0A00 | 626F | 5F6A | 6469 | 615F | 7264 |
| 0001671420 | 040E | FDFC | ü3B2 | 6F08 | 6A62 | 6E5F | 6D61 | 1465 |
| 0001671440 | FC04 | B2FE | 0E03 | 6170 | 6572 | 746E | 6C5F | 676F |
| 0001671460 | 6170 | 6874 | 0408 | FFFC | 0081 | 7302 | 0174 | 1C02 |
| 0001671500 | 3D01 | 7783 | 0504 | 1003 | FA00 | 0002 | 0400 | 640D |
| 0001671520 | 5F66 | 6564 | 656C | 6574 | 6F5F | 6A62 | 040E | 0006 |
| 0001671540 | 03FD | 7408 | 6572 | 5F65 | 7470 | 1172 | 0A04 | C000 |
| 0001671560 | 0B00 | 626F | 5F6A | 6F6C | 7067 | 7461 | 0C68 | 0E04 |
| 0001671600 | 8600 | 0600 | 626F | 5F6A | 6469 | 040B | 0012 | 0081 |
| 0001671620 | 7305 | 6F63 | 6570 | 0413 | 0014 | 00C6 | 660D | 6961 |
| 0001671640 | 656C | 5F64 | 6469 | 615F | 7264 | 040E | FFF6 | 0086 |
| 0001671660 | 6308 | 6968 | 646C | 695F | 0D64 | FA04 | 86FF | 0700 |
| 0001671700 | 6F72 | 746F | 695F | 0864 | F404 | 81FF | 0200 | 7473 |
| 0001671720 | 0201 | 011E | 8642 | 0479 | 02F9 | 0010 | 02EE | 0000 |
| 0001671740 | 0F04 | 6664 | 675F | 7465 | 6F5F | 6A62 | 645F | 7461 |
| 0001671760 | 0E61 | 0604 | FD00 | 0803 | 7274 | 6565 | 705F | 7274 |
| 0001672000 | 0411 | 000A | 00C0 | 6F0B | 6A62 | 6C5F | 676F | 6170 |
| 0001672020 | 6874 | 040C | 000E | 0086 | 6F06 | 6A62 | 695F | 1264 |
| 0001672040 | 1204 | 9600 | 0C03 | 626F | 5F6A | 6E69 | 5F66 | 6170 |
| 0001672060 | 7264 | 040C | FF88 | 0422 | 6606 | 5F77 | 626F | 126A |
| 0001672100 | FA04 | 4CFF | 0C04 | 7566 | 6C6C | 6F5F | 6A62 | 705F |
| 0001672120 | 7274 | 040A | FF86 | 0081 | 7304 | 7A69 | 0865 | F804 |
| 0001672140 | 81FF | 0200 | 7473 | 0201 | 0125 | 893B | 047B | 008E |
| 0001672160 | 0010 | 0083 | 0000 | 1604 | 6664 | 6F5F | 6A62 | 695F |
| 0001672200 | 5F64 | 7266 | 6D6F | 6C5F | 676F | 6170 | 6874 | 040E |
| 0001672220 | 0006 | 03FD | 7408 | 6572 | 5F65 | 7470 | 0D72 | 0A04 |
| 0001672240 | C000 | 0700 | 6F6C | 7067 | 7461 | 1068 | 0E04 | C600 |
| 0001672260 | 0A00 | 626F | 5F6A | 6469 | 615F | 7264 | 0408 | FFFC |
| 0001672300 | 0081 | 7302 | 0174 | 2102 | C901 | 7D89 | FB04 | 1000 |
| 0001672320 | F000 | 0000 | 0400 | 6412 | 5F66 | 6567 | 5F74 | 626F |
| 0001672340 | 5F6A | 6F6C | 7067 | 7461 | 0E68 | 06C4 | FD00 | 0803 |
| 0001672360 | 7274 | 6565 | 705F | 7274 | 0411 | 000A | 00C0 | 6F0B |
| 0001672400 | 6A62 | 6C5F | 676F | 6170 | 6874 | 040C | 000E | 0086 |
| 0001672420 | 6F06 | 6A62 | 695F | 0F64 | 1204 | C000 | 0900 | 7264 |
| 0001672440 | 7669 | 5F65 | 7473 | 1172 | 1604 | 9E00 | 0B03 | 6F6C |
| 0001672460 | 7067 | 7461 | 5F68 | 6461 | 0872 | FC04 | 81FF | 0200 |
| 0001672500 | 7473 | 0201 | 011E | 8AC4 | 047F | 00FD | 0010 | 00F2 |
| 0001672520 | 0000 | 0F04 | 6664 | 675F | 7465 | 635F | 6968 | 646C |
| 0001672540 | 695F | 0E64 | 0604 | FD00 | 0803 | 7274 | 6565 | 705F |
| 0001672560 | 7274 | 0411 | 000A | 00C0 | 6F0B | 6A62 | 6C5F | 676F |
| 0001672600 | 6170 | 6874 | 040C | 000E | 0086 | 6F06 | 6A62 | 695F |
| 0001672620 | 1064 | 1204 | C000 | 0A00 | 6863 | 6C69 | 5F64 | 616E |
| 0001672640 | 656D | 0412 | 0016 | 00C6 | 630C | 6968 | 646C | 695F |
| 0001672660 | 5F64 | 6461 | 0872 | FC04 | 81FF | 0200 | 7473 | 0201 |

THU MAR 14 17:31:54 1991 DB_PI.DLL PAGE 416, LINE 24486

| | | | | | | | | |
|---|---|---|---|---|---|---|---|---|
| 0001672700 | 011F | 8BC1 | 0483 | 017D | 0010 | 0172 | 0000 | 1004 |
| 0001672720 | 6664 | 615F | 6464 | 735F | 726F | 5F74 | 696C | 7473 |
| 0001672740 | 040C | 0006 | 0086 | 6F06 | 6A62 | 695F | 0E64 | 0A04 |
| 0001672760 | C000 | 0800 | 626F | 5F6A | 616E | 656D | 040F | 000E |
| 0001673000 | 00C5 | 6309 | 756F | 746E | 615F | 7264 | 0413 | 0012 |
| 0001673020 | 00C5 | 630D | 6968 | 646C | 635F | 746E | 615F | 7264 |
| 0001673040 | 0413 | 0016 | 03A3 | 630D | 6968 | 646C | 6C5F | 7473 |
| 0001673060 | 615F | 7264 | 0409 | FFFC | 0085 | 6903 | 7864 | 0201 |
| 0001673100 | 0121 | 8D3E | 0485 | 033A | 0010 | 032F | 0000 | 1204 |
| 0001673120 | 6664 | 6C5F | 7369 | 5F74 | 626F | 5F6A | 6863 | 6C69 |
| 0001673140 | 7364 | 040E | 0006 | 03FD | 7408 | 6572 | 5F65 | 7470 |
| 0001673160 | 1172 | 0A04 | C000 | 0B00 | 626F | 5F6A | 6F6C | 7067 |
| 0001673200 | 7461 | 0C68 | 0E04 | 8600 | 0600 | 626F | 5F6A | 6469 |
| 0001673220 | 0413 | 0012 | 00C5 | 630D | 6968 | 646C | 635F | 746E |
| 0001673240 | 615F | 7264 | 0413 | 0016 | 03A3 | 630D | 6968 | 646C |
| 0001673260 | 6C5F | 7473 | 615F | 7264 | 040C | FF8A | 0422 | 6606 |
| 0001673300 | 5F77 | 626F | 0A6A | 8804 | 81FF | 0400 | 6973 | 657A |
| 0001673320 | 0409 | FFFC | 0085 | 6303 | 746E | 040E | FF86 | 0081 |
| 0001673340 | 6C08 | 6F6F | 5F70 | 6E63 | 0874 | FA04 | 81FF | 0200 |
| 0001673360 | 7473 | 0201 | 0120 | 9078 | 0487 | 0239 | 0010 | 022E |
| 0001673400 | 0000 | 1104 | 6664 | 675F | 7465 | 6F5F | 6A62 | 705F |
| 0001673420 | 7261 | 6E65 | 0E74 | 0604 | FD00 | 0803 | 7274 | 6565 |
| 0001673440 | 705F | 7274 | 0411 | 000A | 00C0 | 6F0B | 6A62 | 6C5F |
| 0001673460 | 676F | 6170 | 6874 | 040C | 000E | 0086 | 6F06 | 6A62 |
| 0001673500 | 695F | 1364 | 1204 | C600 | 0D00 | 6170 | 6572 | 746E |
| 0001673520 | 695F | 5F64 | 6461 | 1572 | 1604 | C000 | 0F00 | 6170 |
| 0001673540 | 6572 | 746E | 6E5F | 6D61 | 5F65 | 7470 | 0C72 | 8804 |
| 0001673560 | 22FF | 0604 | 7766 | 6F5F | 6A62 | 040A | FF86 | 0081 |
| 0001673600 | 7304 | 7A69 | 0D65 | FA04 | 86FF | 0700 | 6F72 | 746F |
| 0001673620 | 695F | 0864 | F304 | 81FF | 0200 | 7473 | 0201 | 0124 |
| 0001673640 | 92B1 | 048C | 030F | 0010 | 0304 | 0000 | 1504 | 6664 |
| 0001673660 | 765F | 6C61 | 6469 | 7461 | 5F65 | 6F63 | 7970 | 6D5F |
| 0001673700 | 766F | 1265 | 0604 | FD00 | 0C03 | 7273 | 5F63 | 7274 |
| 0001673720 | 6565 | 705F | 7274 | 040C | 000A | 0086 | 7306 | 6372 |
| 0001673740 | 695F | 1264 | 0E04 | FD00 | 0C03 | 7364 | 5F74 | 7274 |
| 0001673760 | 6565 | 705F | 7274 | 040F | 0012 | 0086 | 7009 | 7261 |
| 0001674000 | 6E65 | 5F74 | 6469 | 040C | 0016 | 0086 | 6406 | 7473 |
| 0001674020 | 695F | 0E64 | 1A04 | C000 | 0800 | 7364 | 5F74 | 616E |
| 0001674040 | 656D | 040F | 001E | 0085 | 6309 | 706F | 5F79 | 6C66 |
| 0001674060 | 6761 | 040D | FFFA | 0086 | 7207 | 6F6F | 5F74 | 6469 |
| 0001674100 | 040C | FFF4 | 0086 | 6F06 | 6A62 | 695F | 0F64 | F204 |
| 0001674120 | 85FF | 0900 | 7273 | 5F63 | 6564 | 7470 | 0868 | F804 |
| 0001674140 | 81FF | 0200 | 7473 | 0201 | 011F | 95C0 | 048F | 0DAA |
| 0001674160 | 0010 | 0D9F | 0000 | 1004 | 6664 | 635F | 706F | 5F79 |
| 0001674200 | 6F6D | 6576 | 6F5F | 6A62 | 0412 | 0006 | 03FD | 730C |
| 0001674220 | 6372 | 745F | 6572 | 5F65 | 7470 | 1172 | 0A04 | C000 |
| 0001674240 | 0B00 | 7273 | 5F63 | 6F6C | 7067 | 7461 | 0C68 | 0E04 |
| 0001674260 | 8600 | 0600 | 7273 | 5F63 | 6469 | 0412 | 0012 | 03FD |
| 0001674300 | 640C | 7473 | 745F | 6572 | 5F65 | 7470 | 1172 | 1604 |
| 0001674320 | C000 | 0B00 | 7364 | 5F74 | 6F6C | 7067 | 7461 | 0C68 |
| 0001674340 | 1A04 | 8600 | 0600 | 7364 | 5F74 | 6469 | 040F | 001E |
| 0001674360 | 0085 | 6F09 | 6576 | 7772 | 6972 | 6574 | 040F | 0020 |
| 0001674400 | 0085 | 6309 | 706F | 5F79 | 6C66 | 6761 | 0410 | 0022 |
| 0001674420 | 00C6 | 6F0A | 6A62 | 695F | 5F64 | 6461 | 0F72 | FA04 |
| 0001674440 | 86FF | 0900 | 6170 | 6572 | 746E | 695F | 1464 | 6804 |
| 0001674460 | B2FE | 0E03 | 6170 | 6572 | 746E | 6C5F | 676F | 6170 |
| 0001674500 | 6874 | 040C | FF88 | 0422 | 6606 | 5F77 | 626F | 0E6A |
| 0001674520 | 6804 | 2CFF | 0802 | 6572 | 5F71 | 616E | 656D | 040E |
| 0001674540 | FE46 | 022C | 6408 | 7473 | 6E5F | 6D61 | 0C65 | 4204 |

THU MAR 14 17:31:54 1991 DB_PI.DLL PAGE 417, LINE 24545

| | | | | | | | | |
|---|---|---|---|---|---|---|---|---|
| 0001674560 | 86FE | 0600 | 6D74 | 5F70 | 6469 | 040A | FE66 | 0081 |
| 0001674600 | 7304 | 7A69 | 0865 | F804 | 81FF | 0200 | 7473 | 0201 |
| 0001674620 | 0120 | A36A | 0491 | 0185 | 0010 | 017A | 0000 | 1104 |
| 0001674640 | 6664 | 735F | 6165 | 6372 | 5F68 | 6574 | 7473 | 695F |
| 0001674660 | 0E64 | 0604 | FD00 | 0803 | 7274 | 6565 | 705F | 7274 |
| 0001674700 | 040F | 000A | 0086 | 7009 | 7261 | 6E65 | 5F74 | 6469 |
| 0001674720 | 040E | 000E | 00C0 | 7408 | 7473 | 6E5F | 6D61 | 1065 |
| 0001674740 | 1204 | C600 | 0A00 | 7374 | 5F74 | 6469 | 615F | 7264 |
| 0001674760 | 0409 | FFD6 | 0444 | 7203 | 6C65 | 040C | FF60 | 0086 |
| 0001675000 | 6F06 | 6A62 | 695F | 0E64 | 5C04 | 81FF | 0800 | 6572 |
| 0001675020 | 5F6C | 6973 | 657A | 040A | FF5E | 0081 | 7304 | 7A69 |
| 0001675040 | 0C65 | 6404 | 22FF | 0604 | 7766 | 6F5F | 6A62 | 0408 |
| 0001675060 | FFD4 | 0081 | 7302 | 0174 | 0502 | 000D | 1A00 | 0500 |
| 0001675100 | 0411 | 0000 | 1D00 | F001 | 38A4 | BD04 | 1001 | B200 |
| 0001675120 | 0001 | 0400 | 640E | 5F66 | 6361 | 6563 | 7373 | 745F |
| 0001675140 | 7365 | 0E74 | 0604 | C200 | 0803 | 7274 | 6565 | 705F |
| 0001675160 | 7274 | 040C | 000A | 0086 | 7406 | 7473 | 695F | 1364 |
| 0001675200 | 0E04 | 2B00 | 0D03 | 6873 | 7261 | 5F65 | 6468 | 5F6C |
| 0001675220 | 7470 | 1172 | 1204 | 8100 | 0B00 | 6361 | 6563 | 7373 |
| 0001675240 | 6D5F | 646F | 1065 | 1404 | 8100 | 0A00 | 6F6C | 6B63 |
| C001675260 | 735F | 6F63 | 6570 | 040A | 0016 | 00CD | 6E04 | 6D61 |
| 0001675300 | 0E65 | 1A04 | C000 | 0800 | 6170 | 6874 | 616E | 656D |
| 0001675320 | 0412 | 001E | 00C5 | 6C0C | 636F | 5F6B | 6468 | 5F6C |
| 0001675340 | 6461 | 1072 | 0404 | 85FE | 0A00 | 6F74 | 6174 | 5F6C |
| 0001675360 | 6973 | 657A | 0411 | FE0E | 0403 | 660B | 5F77 | 6973 |
| 0001675400 | 657A | 6F5F | 6A62 | 0410 | FE06 | 0411 | 660A | 5F77 |
| 0001675420 | 626F | 5F6A | 7470 | 0E72 | 0A04 | 81FE | 0800 | 626F |
| 0001675440 | 5F6A | 7974 | 6570 | 0408 | FE0C | 0081 | 7302 | 0174 |
| 0001675460 | 1E02 | AD01 | 3AA6 | 4104 | 1000 | 3600 | 0000 | 0400 |
| 0001675500 | 640F | 5F66 | 6572 | 656C | 7361 | 5F65 | 6574 | 7473 |
| 0001675520 | 040E | 0006 | 03C2 | 7408 | 6572 | 5F65 | 7470 | 0C72 |
| 0001675540 | 0A04 | 8600 | 0600 | 7374 | 5F74 | 6469 | 040E | 000E |
| 0001675560 | 00C0 | 7008 | 7461 | 6E68 | 6D61 | 0E65 | 1204 | 8500 |
| 0001675600 | 0800 | 6F6C | 6B63 | 685F | 6C64 | 0408 | FFFC | 0081 |
| 0001675620 | 7302 | 0174 | 2402 | EE01 | 3CA6 | 2104 | 1000 | 1600 |
| 0001675640 | 0000 | 0400 | 6415 | 5F66 | 6863 | 6E61 | 6567 | 745F |
| 0001675660 | 7365 | 5F74 | 6361 | 6563 | 7373 | 040E | 0006 | 03C2 |
| 0001675700 | 7408 | 6572 | 5F65 | 7470 | 0C72 | 0A04 | 8600 | 0600 |
| 0001675720 | 7374 | 5F74 | 6469 | 0411 | 000E | 0081 | 610B | 6363 |
| 0001675740 | 7365 | 5F73 | 6F6D | 6564 | 040E | 0010 | 00C0 | 7008 |
| 0001675760 | 7461 | 6E68 | 6D61 | 0E65 | 1404 | 8500 | 0800 | 6F6C |
| 0001676000 | 6B63 | 685F | 6C64 | 0201 | 0120 | A70F | 043E | 0032 |
| 0001676020 | 0010 | 0027 | 0000 | 1104 | 6664 | 635F | 6B68 | 745F |
| 0001676040 | 7473 | 6C5F | o36F | 656B | 0D64 | 0604 | 8600 | 0700 |
| 0001676060 | 6574 | 7473 | 695F | 0E64 | 0A04 | C000 | 0800 | 6170 |
| 0001676100 | 6874 | 616E | 656D | 0201 | 0D05 | 0000 | 001A | 1105 |
| 0001676120 | 0004 | 0000 | 011B | A742 | 045B | 00AD | 0010 | 00A2 |
| 0001676140 | 0000 | 0C04 | 6664 | 6C5F | 636F | 5F6B | 7274 | 6565 |
| 0001676160 | 040E | 0006 | 03E5 | 7408 | 6572 | 5F65 | 7470 | 0D72 |
| 0001676200 | FA04 | 86FF | 0700 | 6F72 | 746F | 695F | 0F64 | F604 |
| 0001676220 | 81FF | 0900 | 6C73 | 6565 | 5F70 | 6E63 | 0874 | F804 |
| 0001676240 | 81FF | 0200 | 7473 | 0201 | 011D | A7EF | 045D | 0093 |
| 0001676260 | 0010 | 0088 | 0000 | 0E04 | 6664 | 755F | 6C6E | 636F |
| 0001676300 | 5F6B | 7274 | 6565 | 040E | 0006 | 03E5 | 7408 | 6572 |
| 0001676320 | 5F65 | 7470 | 0D72 | FA04 | 86FF | 0700 | 6F72 | 746F |
| 0001676340 | 695F | 0864 | F804 | 81FF | 0200 | 7473 | 0201 | 0D05 |
| 0001676360 | 0000 | 001A | 1105 | 0004 | 0000 | 0120 | A882 | 0475 |
| 0001676400 | 00AD | 0010 | 00A2 | 0000 | 1104 | 6F64 | 5F74 | 6567 |
| 0001676420 | 5F74 | 656E | 7478 | 6E5F | 6D61 | 0E65 | 0604 | 9E00 |

THU MAR 14 17:31:54 1991 DB_PI.DLL PAGE 418, LINE 24604

| | | | | | | | | |
|---|---|---|---|---|---|---|---|---|
| 0001676440 | 0803 | 6170 | 6874 | 615F | 7264 | 0412 | 000A | 00C1 |
| 0001676460 | 6E0C | 6D61 | 5F65 | 656C | 5F6E | 6461 | 0172 | 2602 |
| 0001676500 | 2F01 | 77A9 | C904 | 1001 | BE00 | 0001 | 0400 | 6417 |
| 0001676520 | 746F | 6F5F | 6A62 | 695F | 5F64 | 7266 | 6D6F | 6C5F |
| 0001676540 | 676F | 6170 | 6874 | 040E | 0006 | 03FD | 7408 | 6572 |
| 0001676560 | 5F65 | 7470 | 0D72 | 0A04 | C000 | 0700 | 6F6C | 7067 |
| 0001676600 | 7461 | 1068 | 0E04 | C600 | 0A00 | 626F | 5F6A | 6469 |
| 0001676620 | 615F | 7264 | 040C | FFF4 | 0086 | 6F06 | 6A62 | 695F |
| 0001676640 | 0E64 | FA04 | 86FF | 0800 | 6863 | 6C69 | 5F64 | 6469 |
| 0001676660 | 040E | FFEE | 0081 | 6E08 | 6D61 | 5F65 | 656C | 0A6E |
| 0001676700 | F004 | C0FF | 0400 | 6170 | 6874 | 0408 | FFF8 | 0081 |
| 0001676720 | 7302 | 0174 | 2502 | F801 | 7DAA | BF04 | 1000 | B400 |
| 0001676740 | 0000 | 0400 | 6416 | 746F | 615F | 6464 | 6F5F | 6A62 |
| 0001676760 | 745F | 5F6F | 6F6C | 7067 | 7461 | 0E68 | 0604 | FD00 |
| 0001677000 | 0803 | 7274 | 6565 | 705F | 7274 | 040C | 000A | 0086 |
| 0001677020 | 6F06 | 6A62 | 695F | 0E64 | 0E04 | 9E00 | 0803 | 6170 |
| 0001677040 | 6874 | 615F | 7264 | 040C | FF8C | 0422 | 6606 | 5F77 |
| 0001677060 | 626F | 0A6A | 8A04 | 81FF | 0400 | 6973 | 657A | 040D |
| 0001677100 | FF88 | 0080 | 7407 | 706D | 635F | 7268 | 040E | FF86 |
| 0001677120 | 0085 | 6E08 | 6D61 | 5F65 | 656C | 086E | FC04 | 81FF |
| 0001677140 | 0200 | 7473 | 0201 | 0126 | ABB7 | 047F | 023A | 0010 |
| 0001677160 | 022F | 0000 | 1704 | 6F64 | 5F74 | 626F | 5F6A | 6F6C |
| 0001677200 | 7067 | 7461 | 5F68 | 7266 | 6D6F | 695F | 0E64 | 0604 |
| 0001677220 | FD00 | 0803 | 7274 | 6565 | 705F | 7274 | 040C | 000A |
| 0001677240 | 0086 | 6F06 | 6A62 | 695F | 0F64 | 0E04 | C000 | 0900 |
| 0001677260 | 7264 | 7669 | 5F65 | 7473 | 1172 | 1204 | 9E00 | 0B03 |
| 0001677300 | 6F6C | 7067 | 7461 | 5F68 | 6461 | 1072 | EA04 | 86FE |
| 0001677320 | 0A00 | 7563 | 7272 | 6E65 | 5F74 | 6469 | 040F | FFF2 |
| 0001677340 | 0086 | 7009 | 7261 | 6E65 | 5F74 | 6469 | 040D | FFFA |
| 0001677360 | 0086 | 7207 | 6F6F | 5F74 | 6469 | 040D | FEEE | 03B2 |
| 0001677400 | 6C07 | 676F | 6170 | 6874 | 040E | FFF6 | 00C0 | 7008 |
| 0001677420 | 7461 | 5F68 | 7470 | 0E72 | EE04 | 81FF | 0800 | 6F6C |
| 0001677440 | 706F | 635F | 746E | 0408 | FFF0 | 0081 | 7302 | 0174 |
| 0001677460 | 2702 | F101 | 81AD | BF04 | 1000 | B400 | 0000 | 0400 |
| 0001677500 | 6418 | 746F | 705F | 7261 | 6E65 | 5F74 | 6863 | 6C69 |
| 0001677520 | 5F64 | 6F6C | 7067 | 7461 | 0D68 | 0604 | C000 | 0700 |
| 0001677540 | 6F6C | 7067 | 7461 | 1468 | 0A04 | C000 | 0E00 | 6170 |
| 0001677560 | 6572 | 746E | 6C5F | 676F | 6170 | 6874 | 040E | 000E |
| 0001677600 | 00C0 | 6F08 | 6A62 | 6E5F | 6D61 | 0A65 | FA04 | C0FF |
| 0001677620 | 0400 | 7470 | 3172 | 040A | FFF6 | 00C0 | 7004 | 7274 |
| 0001677640 | 0132 | 0502 | 000D | 1A00 | 0500 | 0411 | 0000 | 1E00 |
| 0001677660 | B001 | 8AAE | 7B04 | 1000 | 7000 | 0000 | 0400 | 640F |
| 0001677700 | 746F | 675F | 7465 | 725F | 6F6F | 5F74 | 6469 | 040E |
| 0001677720 | 0006 | 0414 | 7408 | 6572 | 5F65 | 7470 | 1172 | 0A04 |
| 0001677740 | C600 | 0B00 | 6F72 | 746F | 695F | 5F64 | 6461 | 0172 |
| 0001677760 | 2702 | 2B01 | 8EAF | AB04 | 1001 | A000 | 0001 | 0400 |
| 0001700000 | 6418 | 746F | 635F | 6572 | 7461 | 5F65 | 626F | 5F6A |
| 0001700020 | 6870 | 7379 | 705F | 7461 | 0E68 | 0604 | 1400 | 0804 |
| 0001700040 | 7274 | 6565 | 705F | 7274 | 040F | 000A | 0086 | 7009 |
| 0001700060 | 7261 | 6E65 | 5F74 | 6469 | 040E | 000E | 00C0 | 6F08 |
| 0001700100 | 6A62 | 6E5F | 6D61 | 1365 | 1204 | C000 | 0D00 | 6870 |
| 0001700120 | 7379 | 6369 | 6C61 | 705F | 7461 | 0E68 | 1604 | C000 |
| 0001700140 | 0800 | 6170 | 6874 | 655F | 7478 | 040E | 001A | 00C0 |
| 0001700160 | 7008 | 7461 | 5F68 | 6461 | 1072 | BE04 | 85FD | 0A00 |
| 0001700200 | 6F74 | 6174 | 5F6C | 6973 | 657A | 0411 | FDEE | 0455 |
| 0001700220 | 660B | 5F77 | 6973 | 657A | 6F5F | 6A62 | 0410 | FDC0 |
| 0001700240 | 0463 | 660A | 5F77 | 626F | 5F6A | 7470 | 1372 | DE04 |
| 0001700260 | 2CFF | 0D02 | 7274 | 6E75 | 5F63 | 626F | 5F6A | 616E |
| 0001700300 | 0E6D | C404 | 2CFD | 0802 | 656E | 5F77 | 616E | 656D |

THU MAR 14 17:31:54 1991 DB_PI.DLL PAGE 419, LINE 24663

| | | | | | | | | |
|---|---|---|---|---|---|---|---|---|
| 0001700320 | 040D | FDE6 | 00C0 | 6507 | 7478 | 705F | 7274 | 040D |
| 0001700340 | FDEA | 00C0 | 6407 | 7269 | 705F | 7274 | 0408 | FDE4 |
| 0001700360 | 0081 | 7302 | 0174 | 2002 | D601 | 93B0 | 1604 | 1001 |
| 0001700400 | 0B00 | 0001 | 0400 | 6411 | 746F | 735F | 7465 | 695F |
| 0001700420 | 666E | 5F6F | 6966 | 656C | 0412 | 0006 | 00C0 | 640C |
| 0001700440 | 7269 | 705F | 7461 | 6E68 | 6D61 | 0E65 | 0A04 | 8100 |
| 0001700460 | 0800 | 626F | 5F6A | 7974 | 6570 | 040E | 000C | 00C0 |
| 0001700500 | 6F08 | 6A62 | 6E5F | 6D61 | 0C65 | 1004 | 8600 | 0600 |
| 0001700520 | 626F | 5F6A | 6469 | 040F | 0014 | 0086 | 7009 | 7261 |
| 0001700540 | 6E65 | 5F74 | 6469 | 040F | FEF8 | 03C9 | 6609 | 6C69 |
| 0001700560 | 5F65 | 6170 | 6874 | 0408 | FFFA | 02A3 | 6602 | 0870 |
| 0001700600 | F804 | 81FF | 0200 | 7473 | 0201 | 0123 | B1EC | 0499 |
| 0001700620 | 0128 | 0010 | 011D | 0000 | 1404 | 6F64 | 5F74 | 7263 |
| 0001700640 | 6165 | 6574 | 6F5F | 6A62 | 735F | 7274 | 7463 | 040E |
| 0001700660 | 0006 | 0414 | 7408 | 6572 | 5F65 | 7470 | 0F72 | 0A04 |
| 0001700700 | 8600 | 0900 | 6170 | 6572 | 746E | 695F | 0E64 | 0E04 |
| 0001700720 | C000 | 0800 | 626F | 5F6A | 616E | 656D | 0413 | 0012 |
| 0001700740 | 00C0 | 700D | 7968 | 6973 | 6163 | 5F6C | 6170 | 6874 |
| 0001700760 | 040E | 0016 | 00C0 | 7008 | 7461 | 5F68 | 7865 | 0F74 |
| 0001701000 | 1A04 | 8500 | 0900 | 6162 | 6573 | 735F | 7A69 | 1165 |
| 0001701020 | 1C04 | 6200 | 0B04 | 626F | 5F6A | 7470 | 5F72 | 6461 |
| 0001701040 | 1072 | FA04 | 85FE | 0A00 | 6F74 | 6174 | 5F6C | 6973 |
| 0001701060 | 657A | 040A | FEFC | 03C9 | 7004 | 7461 | 0868 | FC04 |
| 0001701100 | 81FF | 0200 | 7473 | 0201 | 011E | B314 | 049B | 017B |
| 0001701120 | 0010 | 0170 | 0000 | 0F04 | 6F64 | 5F74 | 7263 | 6165 |
| 0001701140 | 6574 | 725F | 6F6F | 0E74 | 0604 | 1400 | 0804 | 7274 |
| 0001701160 | 6565 | 705F | 7274 | 0413 | 000A | 00C0 | 700D | 7968 |
| 0001701200 | 6973 | 6163 | 5F6C | 6170 | 6874 | 0410 | 000E | 00C6 |
| 0001701220 | 6F0A | 6A62 | 695F | 5F64 | 6461 | 0D72 | FA04 | 9CFF |
| 0001701240 | 0704 | 626F | 5F6A | 7470 | 0872 | F804 | 81FF | 0200 |
| 0001701260 | 7473 | 0201 | 0120 | 848F | 04A0 | 017B | 0010 | 0170 |
| 0001701300 | 0000 | 1104 | 6F64 | 5F74 | 7263 | 6165 | 6574 | 665F |
| 0001701320 | 6C6F | 6564 | 0E72 | 0604 | 1400 | 0804 | 7274 | 6565 |
| 0001701340 | 705F | 7274 | 040F | 000A | 0086 | 7009 | 7261 | 6E65 |
| 0001701360 | 5F74 | 6469 | 040E | 000E | 00C0 | 6F08 | 6A62 | 6E5F |
| 0001701400 | 6D61 | 1365 | 1204 | C000 | 0D00 | 6870 | 7379 | 6369 |
| 0001701420 | 6C61 | 705F | 7461 | 1068 | 1604 | C600 | 0A00 | 626F |
| 0001701440 | 5F6A | 6469 | 615F | 7264 | 040D | FFFA | 049C | 6F07 |
| 0001701460 | 6A62 | 705F | 7274 | 0408 | FFF8 | 0081 | 7302 | 0174 |
| 0001701500 | 1E02 | 0A01 | A2B6 | 0A04 | 1002 | FF00 | 0001 | 0400 |
| 0001701520 | 640F | 746F | 635F | 6572 | 7461 | 5F65 | 6574 | 7473 |
| 0001701540 | 040E | 0006 | 0414 | 7408 | 6572 | 5F65 | 7470 | 0F72 |
| 0001701560 | 0A04 | 8600 | 0900 | 6170 | 6572 | 746E | 695F | 0E64 |
| 0001701600 | 0E04 | C000 | 0800 | 626F | 5F6A | 616E | 656D | 0413 |
| 0001701620 | 0012 | 00C0 | 700D | 7968 | 6973 | 6163 | 5F6C | 6170 |
| 0001701640 | 6874 | 0410 | 0016 | 00C6 | 6F0A | 6A62 | 695F | 5F64 |
| 0001701660 | 6461 | 0D72 | F604 | A3FE | 0704 | 626F | 5F6A | 7470 |
| 0001701700 | 0D72 | FA04 | C9FE | 0703 | 7074 | 705F | 7461 | 0B68 |
| 0001701720 | FA04 | 86FF | 0500 | 7074 | 695F | 0864 | F404 | 81FE |
| 0001701740 | 0200 | 7473 | 0201 | 011C | B814 | 04A5 | 0153 | 0010 |
| 0001701760 | 0148 | 0000 | 0D04 | 6F64 | 5F74 | 7263 | 6165 | 6574 |
| 0001702000 | 745F | 0E63 | 0604 | 1400 | 0804 | 7274 | 6565 | 705F |
| 0001702020 | 7274 | 040F | 000A | 0086 | 7009 | 7261 | 6E65 | 5F74 |
| 0001702040 | 6469 | 040E | 000E | 00C0 | 6F08 | 6A62 | 6E5F | 6D61 |
| 0001702060 | 1365 | 1204 | C000 | 0D00 | 6870 | 7379 | 6369 | 6C61 |
| 0001702100 | 705F | 7461 | 1068 | 1604 | C600 | 0A00 | 626F | 5F6A |
| 0001702120 | 6469 | 615F | 7264 | 040D | FFFA | 04A6 | 6F07 | 6A62 |
| 0001702140 | 705F | 7274 | 0408 | FFF8 | 0081 | 7302 | 0174 | 1C02 |
| 0001702160 | 6701 | A8B9 | 5304 | 1001 | 4800 | 0001 | 0400 | 640D |

THU MAR 14 17:31:54 1991 DB_PI.DLL PAGE 420, LINE 24722

| | | | | | | | | |
|---|---|---|---|---|---|---|---|---|
| 0001702200 | 746F | 635F | 6572 | 7461 | 5F65 | 7074 | 040E | 0006 |
| 0001702220 | 0414 | 7408 | 6572 | 5F65 | 7470 | 0F72 | 0A04 | 8600 |
| 0001702240 | 0900 | 6170 | 6572 | 746E | 695F | 0E64 | 0E04 | C000 |
| 0001702260 | 0800 | 626F | 5F6A | 616E | 656D | 0413 | 0012 | 00C0 |
| 0001702300 | 700D | 7968 | 6973 | 6163 | 5F6C | 6170 | 6874 | 0410 |
| 0001702320 | 0016 | 00C6 | 6F0A | 6A62 | 695F | 5F64 | 6461 | 0D72 |
| 0001702340 | FA04 | A9FF | 0704 | 626F | 5F6A | 7470 | 0872 | F804 |
| 0001702360 | 81FF | 0200 | 7473 | 0201 | 011C | BABA | 04AB | 0153 |
| 0001702400 | 0010 | 0148 | 0000 | 0D04 | 6F64 | 5F74 | 7263 | 6165 |
| 0001702420 | 6574 | 745F | 0E72 | 0604 | 1400 | 0804 | 7274 | 6565 |
| 0001702440 | 705F | 7274 | 040F | 000A | 0086 | 7009 | 7261 | 6E65 |
| 0001702460 | 5F74 | 6469 | 040E | 000E | 00C0 | 6F08 | 6A62 | 6E5F |
| 0001702500 | 6D61 | 1365 | 1204 | C000 | 0D00 | 6870 | 7379 | 6369 |
| 0001702520 | 6C61 | 705F | 7461 | 1068 | 1604 | C600 | 0A00 | 626F |
| 0001702540 | 5F6A | 6469 | 615F | 7264 | 040D | FFFA | 04AC | 6F07 |
| 0001702560 | 6A62 | 705F | 7274 | 0408 | FFF8 | 0081 | 7302 | 0174 |
| 0001702600 | 2002 | 0D01 | AEBC | 0004 | 1001 | F500 | 0000 | 0400 |
| 0001702620 | 6411 | 746F | 635F | 6572 | 7461 | 5F65 | 7766 | 6F5F |
| 0001702640 | 6A62 | 040E | 0006 | 0414 | 7408 | 6572 | 5F65 | 7470 |
| 0001702660 | 0F72 | 0A04 | 8600 | 0900 | 6170 | 6572 | 746E | 695F |
| 0001702700 | 0E64 | 0E04 | C000 | 0800 | 626F | 5F6A | 616E | 656D |
| 0001702720 | 040E | 0012 | 0081 | 6F08 | 6A62 | 745F | 7079 | 1365 |
| 0001702740 | 1404 | C000 | 0D00 | 6870 | 7379 | 6369 | 6C61 | 705F |
| 0001702760 | 7461 | 1068 | 1804 | C600 | 0A00 | 626F | 5F6A | 6469 |
| 0001703000 | 615F | 7264 | 0408 | FFFC | 0081 | 7302 | 0174 | 1E02 |
| 0001703020 | 0D01 | B0BD | 1D04 | 1001 | 1200 | 0001 | 0400 | 640F |
| 0001703040 | 746F | 645F | 6C65 | 735F | 6275 | 7274 | 6565 | 040E |
| 0001703060 | 0006 | 0414 | 7408 | 6572 | 5F65 | 7470 | 0C72 | 0A04 |
| 0001703100 | 8600 | 0600 | 626F | 5F6A | 6469 | 0413 | 000E | 00C6 |
| 0001703120 | 660D | 6961 | 656C | 5F64 | 6469 | 615F | 7264 | 0409 |
| 0001703140 | FFD6 | 045B | 7203 | 6C65 | 040A | FFD2 | 0081 | 7304 |
| 0001703160 | 7A69 | 0E65 | D004 | 81FF | 0800 | 6F6C | 706F | 635F |
| 0001703200 | 746E | 0408 | FFD4 | 0081 | 7302 | 0174 | 1A02 | 2A01 |
| 0001703220 | B2BE | FE04 | 1000 | F300 | 0000 | 0400 | 640B | 746F |
| 0001703240 | 645F | 6C65 | 6F5F | 6A62 | 040E | 0006 | 0414 | 7408 |
| 0001703260 | 6572 | 5F65 | 7470 | 0C72 | 0A04 | 8600 | 0600 | 626F |
| 0001703300 | 5F6A | 6469 | 0411 | FE0A | 0455 | 660B | 5F77 | 6973 |
| 0001703320 | 657A | 6F5F | 6A62 | 040D | FFFA | 0463 | 6F07 | 6A62 |
| 0001703340 | 705F | 7274 | 040A | FE06 | 0081 | 7304 | 7A69 | 0865 |
| 0001703360 | 0804 | 81FE | 0200 | 7473 | 0201 | 011B | BF28 | 04B4 |
| 0001703400 | 035B | 0010 | 0350 | 0000 | 0C04 | 6F64 | 5F74 | 6F63 |
| 0001703420 | 7970 | 6F5F | 6A62 | 0412 | 0006 | 0414 | 730C | 6372 |
| 0001703440 | 745F | 6572 | 5F65 | 7470 | 0C72 | 0A04 | 8600 | 0600 |
| 0001703460 | 7273 | 5F63 | 6469 | 0419 | 000E | 00C0 | 6313 | 706F |
| 0001703500 | 6569 | 5F64 | 7573 | 7462 | 6572 | 5F65 | 6170 | 6874 |
| 0001703520 | 0412 | 0012 | 0414 | 640C | 7473 | 745F | 6572 | 5F65 |
| 0001703540 | 7470 | 1372 | 1604 | 8600 | 0D00 | 7364 | 5F74 | 6170 |
| 0001703560 | 6572 | 746E | 695F | 1264 | 1A04 | C000 | 0C00 | 7364 |
| 0001703600 | 5F74 | 616E | 656D | 705F | 7274 | 0412 | 001E | 00C0 |
| 0001703620 | 6F0C | 646C | 735F | 6372 | 705F | 7461 | 1068 | 2204 |
| 0001703640 | C600 | 0A00 | 7364 | 5F74 | 6469 | 615F | 7264 | 0411 |
| 0001703660 | FE0A | 0455 | 660B | 5F77 | 6973 | 657A | 6F5F | 6A62 |
| 0001703700 | 040D | FFFA | 0463 | 6F07 | 6A62 | 705F | 7274 | 040E |
| 0001703720 | FDFE | 0081 | 6F08 | 6A62 | 745F | 7079 | 1365 | 0404 |
| 0001703740 | C0FE | 0D00 | 6966 | 656C | 6E5F | 6D61 | 5F65 | 7470 |
| 0001703760 | 1272 | FA04 | C0FD | 0C00 | 656E | 5F77 | 616E | 656D |
| 0001704000 | 705F | 7274 | 040A | FE00 | 0081 | 7304 | 7A69 | 0F65 |
| 0001704020 | 0804 | 85FE | 0900 | 6F63 | 7970 | 665F | 616C | 0867 |
| 0001704040 | 0204 | 81FE | 0200 | 7473 | 0201 | 0124 | C283 | 04B6 |

THU MAR 14 17:31:54 1991 DB_PI.DLL PAGE 421, LINE 24781

| | | | | | | | | |
|---|---|---|---|---|---|---|---|---|
| 0001704060 | 0184 | 0010 | 0179 | 0000 | 1504 | 6F64 | 5F74 | 6F63 |
| 0001704100 | 7970 | 6D5F | 766F | 5F65 | 7573 | 7462 | 6572 | 1265 |
| 0001704120 | 0604 | 1400 | 0C04 | 7273 | 5F63 | 7274 | 6565 | 705F |
| 0001704140 | 7274 | 040C | 000A | 0086 | 7306 | 6372 | 695F | 1964 |
| 0001704160 | 0E04 | C000 | 1300 | 6F63 | 6970 | 6465 | 735F | 6275 |
| 0001704200 | 7274 | 6565 | 705F | 7461 | 1268 | 1204 | 1400 | 0C04 |
| 0001704220 | 7364 | 5F74 | 7274 | 6565 | 705F | 7274 | 0413 | 0016 |
| 0001704240 | 0086 | 640D | 7473 | 705F | 7261 | 6E65 | 5F74 | 6469 |
| 0001704260 | 0412 | 001A | 00C0 | 640C | 7473 | 6E5F | 6D61 | 5F65 |
| 0001704300 | 7470 | 0F72 | 1E04 | 8500 | 0900 | 6F63 | 7970 | 665F |
| 0001704320 | 616C | 1067 | 2004 | C600 | 0A00 | 7364 | 5F74 | 6469 |
| 0001704340 | 615F | 7264 | 040C | FEF0 | 00C6 | 6906 | 5F64 | 736C |
| 0001704360 | 0D74 | FA04 | 85FE | 0700 | 736C | 5F74 | 6E63 | 0C74 |
| 0001704400 | F404 | 86FE | 0600 | 6D74 | 5F70 | 6469 | 0412 | FEFE |
| 0001704420 | 03C9 | 6F0C | 646C | 735F | 6372 | 705F | 7461 | 0768 |
| 0001704440 | F804 | 85FE | 0100 | 0869 | FC04 | 81FE | 0200 | 7473 |
| 0001704460 | 0201 | 0D05 | 0000 | 001A | 1105 | 0004 | 0000 | 011C |
| 0001704500 | C408 | 044F | 00C7 | 0010 | 00BC | 0000 | 0D04 | 6F64 |
| 0001704520 | 5F74 | 6F6C | 6B63 | 745F | 7365 | 0E74 | 0604 | D900 |
| 0001704540 | 0803 | 7274 | 6565 | 705F | 7274 | 040C | 000A | 0086 |
| 0001704560 | 7406 | 7473 | 695F | 0E64 | 0E04 | C000 | 0800 | 6170 |
| 0001704600 | 6874 | 616E | 656D | 0412 | 0012 | 00C5 | 6C0C | 636F |
| 0001704620 | 5F6B | 6468 | 5F6C | 6461 | 0872 | FC04 | 81FE | 0200 |
| 0001704640 | 7473 | 040F | FEFE | 038E | 6C09 | 636F | 5F6B | 6170 |
| 0001704660 | 6874 | 040C | FEFA | 0085 | 6106 | 7463 | 6F69 | 016E |
| 0001704700 | 1E02 | CF01 | 53C4 | B304 | 1000 | A800 | 0000 | 0400 |
| 0001704720 | 640F | 746F | 755F | 6C6E | 636F | 5F6B | 6574 | 7473 |
| 0001704740 | 040E | 0006 | 03D9 | 7408 | 6572 | 5F65 | 7470 | 0C72 |
| 0001704760 | 0A04 | 8600 | 0600 | 7374 | 5F74 | 6469 | 040E | 000E |
| 0001705000 | 00C0 | 7008 | 7461 | 6E68 | 6D61 | 0E65 | 1204 | 8500 |
| 0001705020 | 0800 | 6F6C | 6B63 | 685F | 6C64 | 040F | FEFE | 038E |
| 0001705040 | 6C09 | 636F | 5F6B | 6170 | 6874 | 0201 | 0122 | C582 |
| 0001705060 | 0455 | 00D2 | 0010 | 00C7 | 0000 | 1304 | 6F64 | 5F74 |
| 0001705100 | 6863 | 6365 | 5F6B | 6574 | 7473 | 6C5F | 636F | 0C6B |
| 0001705120 | 0604 | 8600 | 0600 | 7374 | 5F74 | 6469 | 040E | 000A |
| 0001705140 | 00C0 | 7008 | 7461 | 6E68 | 6D61 | 0F65 | FE04 | 8EFE |
| 0001705160 | 0903 | 6F6C | 6B63 | 705F | 7461 | 0168 | 0502 | 000D |
| 0001705200 | 1A00 | 0500 | 0411 | 0000 | 1E00 | 5401 | 8AC6 | 3A04 |
| 0001705220 | 1001 | 2F00 | 0001 | 0400 | 640F | 746F | 745F | 6C62 |
| 0001705240 | 615F | 6464 | 6F5F | 6A62 | 040E | 0006 | 0414 | 7408 |
| 0001705260 | 6572 | 5F65 | 7470 | 0F72 | 0A04 | 8600 | 0900 | 6170 |
| 0001705300 | 6572 | 746E | 695F | 0E64 | 0E04 | 8100 | 0800 | 626F |
| 0001705320 | 5F6A | 7974 | 6570 | 040D | 0010 | 0463 | 6F07 | 6A62 |
| 0001705340 | 705F | 7274 | 0409 | FFD6 | 045B | 7203 | 6C65 | 0408 |
| 0001705360 | FFD4 | 0081 | 7302 | 0174 | 1E02 | 8E01 | 8CC7 | 7504 |
| 0001705400 | 1000 | 6A00 | 0000 | 0400 | 640F | 746F | 745F | 6C62 |
| 0001705420 | 645F | 6C65 | 6F5F | 6A62 | 040E | 0006 | 0414 | 7408 |
| 0001705440 | 6572 | 5F65 | 7470 | 0C72 | 0A04 | 8600 | 0600 | 626F |
| 0001705460 | 5F6A | 6469 | 0408 | FFFC | 0081 | 7302 | 0174 | 1F02 |
| 0001705500 | 0301 | 8EC8 | A604 | 1001 | 9B00 | 0001 | 0400 | 6410 |
| 0001705520 | 746F | 675F | 7465 | 635F | 6968 | 646C | 695F | 0E64 |
| 0001705540 | 0604 | 1400 | 0804 | 7274 | 6565 | 705F | 7274 | 040F |
| 0001705560 | 000A | 0086 | 7009 | 7261 | 6E65 | 5F74 | 6469 | 0410 |
| 0001705600 | 000E | 00C0 | 630A | 6968 | 646C | 6E5F | 6D61 | 1465 |
| 0001705620 | 1204 | 8100 | 0E00 | 6863 | 6C69 | 5F64 | 616E | 656D |
| 0001705640 | 6C5F | 6E65 | 0412 | 0014 | 00C6 | 630C | 6968 | 646C |
| 0001705660 | 695F | 5F64 | 6461 | 0C72 | 8C04 | 39FF | 0604 | 7766 |
| 0001705700 | 6F5F | 6A62 | 040A | FF8A | 0081 | 7304 | 7A69 | 0E65 |
| 0001705720 | 8804 | 81FF | 0800 | 6F6C | 706F | 635F | 746E | 0408 |

THU MAR 14 17:31:54 1991 DB_PI.DLL PAGE 422, LINE 24840

| | | | | | | | | |
|---|---|---|---|---|---|---|---|---|
| 0001705740 | FFFC | 0081 | 7302 | 0174 | 2002 | A901 | 90C9 | 7604 |
| 0001705760 | 1000 | 6B00 | 0000 | 0400 | 6411 | 746F | 675F | 7465 |
| 0001706000 | 705F | 7261 | 6E65 | 5F74 | 6469 | 040E | 0006 | 0414 |
| 0001706020 | 7408 | 6572 | 5F65 | 7470 | 0C72 | 0A04 | 8600 | 0600 |
| 0001706040 | 626F | 5F6A | 6469 | 0413 | 000E | 00C6 | 700D | 7261 |
| 0001706060 | 6E65 | 5F74 | 6469 | 615F | 7264 | 0409 | FFD6 | 045B |
| 0001706100 | 7203 | 6C65 | 040A | FFD2 | 0081 | 7304 | 7A69 | 0865 |
| 0001706120 | D404 | 81FF | 0200 | 7473 | 0201 | 011D | CA1F | 0492 |
| 0001706140 | 00C3 | 0010 | 00B8 | 0000 | 0E04 | 6F64 | 5F74 | 7369 |
| 0001706160 | 675F | 6172 | 646E | 6170 | 040E | 0006 | 0414 | 7408 |
| 0001706200 | 6572 | 5F65 | 7470 | 0F72 | 0A04 | 8600 | 0900 | 6170 |
| 0001706220 | 6572 | 746E | 695F | 0E64 | 0E04 | 8600 | 0800 | 6863 |
| 0001706240 | 6C69 | 5F64 | 6469 | 040A | FFF8 | 0086 | 7004 | 695F |
| 0001706260 | 0E64 | F604 | 81FF | 0800 | 6F6C | 706F | 635F | 746E |
| 0001706300 | 0408 | FFFC | 0081 | 7302 | 0174 | 2002 | E201 | 94CA |
| 0001706320 | C404 | 1000 | B900 | 0000 | 0400 | 6411 | 746F | 675F |
| 0001706340 | 7465 | 635F | 6968 | 646C | 6F5F | 6A62 | 040E | 0006 |
| 0001706360 | 0414 | 7408 | 6572 | 5F65 | 7470 | 0F72 | 0A04 | 8600 |
| 0001706400 | 0900 | 6170 | 6572 | 746E | 695F | 0A64 | 0E04 | 8500 |
| 0001706420 | 0400 | 656E | 7478 | 040E | 0010 | 00C1 | 7308 | 7A69 |
| 0001706440 | 5F65 | 6461 | 1072 | 1404 | 6300 | 0A04 | 7766 | 6F5F |
| 0001706460 | 6A62 | 705F | 7274 | 0409 | FFD6 | 045B | 7203 | 6C65 |
| 0001706500 | 040C | FFCC | 0081 | 6706 | 7465 | 6F5F | 0C70 | D004 |
| 0001706520 | 86FF | 0600 | 626F | 5F6A | 6469 | 040E | FFCE | 0081 |
| 0001706540 | 7208 | 6C65 | 735F | 7A69 | 0865 | D404 | 81FF | 0200 |
| 0001706560 | 7473 | 0201 | 0120 | CBA6 | 0496 | 0211 | 0010 | 0206 |
| 0001706600 | 0000 | 1104 | 6F64 | 5F74 | 6863 | 6C69 | 5F64 | 6469 |
| 0001706620 | 6C5F | 7369 | 0E74 | 0604 | 1400 | 0804 | 7274 | 6565 |
| 0001706640 | 705F | 7274 | 040F | 000A | 0086 | 7009 | 7261 | 6E65 |
| 0001706660 | 5F74 | 6469 | 0411 | 000E | 00C5 | 6C0B | 7473 | 635F |
| 0001706700 | 746E | 615F | 7264 | 0410 | 0012 | 047C | 690A | 5F64 |
| 0001706720 | 736C | 5F74 | 6461 | 0972 | D604 | 5BFF | 0304 | 6572 |
| 0001706740 | 0C6C | CE04 | 86FF | 0600 | 626F | 5F6A | 6469 | 040A |
| 0001706760 | FFCC | 0081 | 7304 | 7A69 | 0965 | D404 | 85FF | 0300 |
| 0001707000 | 6469 | 0E78 | CA04 | 81FF | 0800 | 6F6C | 706F | 635F |
| 0001707020 | 746E | 0408 | FFD2 | 0081 | 7302 | 0174 | 2502 | B701 |
| 0001707040 | 98CD | CF04 | 1000 | C400 | 0000 | 0400 | 6416 | 746F |
| 0001707060 | 635F | 6568 | 6B63 | 665F | 6C6F | 6564 | 5F72 | 6564 |
| 0001707100 | 7470 | 0E68 | 0604 | 1400 | 0804 | 7274 | 6565 | 705F |
| 0001707120 | 7274 | 040F | 000A | 0086 | 7009 | 7261 | 6E65 | 5F74 |
| 0001707140 | 6469 | 0413 | 000E | 0085 | 730D | 6275 | 7274 | 6565 |
| 0001707160 | 645F | 7065 | 6874 | 040A | FFF2 | 0086 | 7004 | 695F |
| 0001707200 | 0D64 | FA04 | 86FF | 0700 | 6F72 | 746F | 695F | 0B64 |
| 0001707220 | F804 | 85FF | 0500 | 6564 | 7470 | 0E68 | F004 | 81FF |
| 0001707240 | 0800 | 6F6C | 706F | 635F | 746E | 0408 | FFF6 | 0081 |
| 0001707260 | 7302 | 0174 | 2202 | 8601 | 9ACE | 0904 | 1001 | FE00 |
| 0001707300 | 0000 | 0400 | 6413 | 746F | 735F | 6275 | 7274 | 6565 |
| 0001707320 | 665F | 645F | 7065 | 6874 | 040E | 0006 | 0414 | 7408 |
| 0001707340 | 6572 | 5F65 | 7470 | 1072 | 0A04 | 8600 | 0A00 | 7573 |
| 0001707360 | 7462 | 6572 | 5F65 | 6469 | 040F | 000E | 00C5 | 6409 |
| 0001707400 | 7065 | 6874 | 615F | 7264 | 0413 | FFF6 | 0085 | 630D |
| 0001707420 | 7275 | 6572 | 746E | 645F | 7065 | 6874 | 040F | FFFA |
| 0001707440 | 00C6 | 6309 | 6968 | 646C | 6C5F | 7473 | 040F | FFF4 |
| 0001707460 | 0085 | 6309 | 6968 | 646C | 635F | 746E | 0407 | FFF2 |
| 0001707500 | 0085 | 6901 | 0408 | FFF8 | 0081 | 7302 | 0174 | 0502 |
| 0001707520 | 000D | 1A00 | 0500 | 0411 | 0000 | 1300 | 9001 | 06CF |
| 0001707540 | 5302 | 1000 | 4800 | 0000 | 0400 | 4204 | 5254 | 0F56 |
| 0001707560 | 0604 | 8100 | 0900 | 706F | 7265 | 7461 | 6F69 | 0E6E |
| 0001707600 | 0804 | C000 | 0800 | 6F70 | 6273 | 6F6C | 6B63 | 040D |

THU MAR 14 17:31:54 1991 DB_PI.DLL PAGE 423, LINE 24899

| | | | | | | | | |
|---|---|---|---|---|---|---|---|---|
| 0001707620 | 000C | 00CD | 6407 | 7461 | 6261 | 6675 | 040D | 0010 |
| 0001707640 | 00C1 | 6407 | 7461 | 6C61 | 6E65 | 040C | 0014 | 00C0 |
| 0001707660 | 6B06 | 7965 | 7562 | 0C66 | 1804 | 8100 | 0600 | 656B |
| 0001707700 | 6E79 | 6D75 | 040C | FFFC | 0084 | 6B06 | 7965 | 656C |
| 0001707720 | 0D6E | FA04 | 80FF | 0700 | 6B63 | 7965 | 756E | 016D |
| 0001707740 | 0502 | 000D | 1A00 | 0500 | 0411 | 0000 | 1C00 | E401 |
| 0001707760 | 24CF | 3504 | 1000 | 2A00 | 0000 | 0400 | 640D | 6F73 |
| 0001710000 | 6C5F | 636F | 5F6B | 7462 | 7672 | 0201 | 011F | D019 |
| 0001710020 | 0425 | 0030 | 0010 | 0025 | 0000 | 1004 | 7364 | 5F6F |
| 0001710040 | 6572 | 656C | 7361 | 5F65 | 7462 | 7672 | 0201 | 011A |
| 0001710060 | D049 | 0427 | 0398 | 0010 | 038D | 0000 | 0B04 | 7364 |
| 0001710100 | 5F6F | 6461 | 5F64 | 626F | 116A | 0604 | EC00 | 0B03 |
| 0001710120 | 6274 | 5F6C | 6468 | 5F6C | 7470 | 0D72 | 0A04 | C000 |
| 0001710140 | 0700 | 626F | 5F6A | 7470 | 0E72 | 0E04 | 8100 | 0800 |
| 0001710160 | 626F | 5F6A | 6973 | 657A | 040D | 0010 | 00C0 | 6B07 |
| 0001710200 | 7965 | 705F | 7274 | 0414 | 0014 | 0085 | 6F0E | 6576 |
| 0001710220 | 7772 | 6972 | 6574 | 665F | 616C | 0E67 | FA04 | 81FF |
| 0001710240 | 0800 | 6D74 | 5F70 | 6973 | 657A | 0408 | FFFC | 0081 |
| 0001710260 | 7302 | 0174 | 1A02 | E101 | 29D3 | DD04 | 1002 | D200 |
| 0001710300 | 0002 | 0400 | 640B | 6F73 | 645F | 6C65 | 6F5F | 6A62 |
| 0001710320 | 0411 | 0006 | 03EC | 740B | 6C62 | 685F | 6C64 | 705F |
| 0001710340 | 7274 | 040D | 000A | 00C0 | 6B07 | 7965 | 705F | 7274 |
| 0001710360 | 040A | FFFA | 0081 | 7304 | 7A69 | 0865 | FC04 | 81FF |
| 0001710400 | 0200 | 7473 | 0201 | 011A | D6BE | 042B | 015D | 0010 |
| 0001710420 | 0152 | 0000 | 0B04 | 7364 | 5F6F | 6567 | 5F74 | 626F |
| 0001710440 | 116A | 0604 | EC00 | 0B03 | 6274 | 5F6C | 6468 | 5F6C |
| 0001710460 | 7470 | 0D72 | 0A04 | C000 | 0700 | 656B | 5F79 | 7470 |
| 0001710500 | 1272 | 0E04 | C100 | 0C00 | 626F | 5F6A | 6973 | 657A |
| 0001710520 | 615F | 7264 | 040D | 0012 | 00C0 | 6F07 | 6A62 | 705F |
| 0001710540 | 7274 | 0408 | FFFC | 0081 | 7302 | 0174 | 1F02 | 1B01 |
| 0001710560 | 2DD8 | 3C04 | 1004 | 3100 | 0004 | 0400 | 6410 | 6F73 |
| 0001710600 | 705F | 7461 | 5F68 | 6567 | 5F74 | 626F | 116A | 0604 |
| 0001710620 | EC00 | 0B03 | 6274 | 5F6C | 6468 | 5F6C | 7470 | 0C72 |
| 0001710640 | 0A04 | 8100 | 0600 | 6567 | 5F74 | 706F | 040D | 000C |
| 0001710660 | 0081 | 6B07 | 7965 | 6E5F | 6D75 | 040D | 000E | 00C0 |
| 0001710700 | 6B07 | 7965 | 705F | 7274 | 0412 | 0012 | 00C1 | 6F0C |
| 0001710720 | 6A62 | 735F | 7A69 | 5F65 | 6461 | 0D72 | 1604 | C000 |
| 0001710740 | 0700 | 626F | 5F6A | 7470 | 0872 | FA04 | 81FF | 0200 |
| 0001710760 | 7473 | 040E | FFFC | 0081 | 7208 | 7465 | 7972 | 6F5F |
| 0001711000 | 0170 | 1B02 | 5701 | 2FDC | 0504 | 1001 | FA00 | 0000 |
| 0001711020 | 0400 | 640C | 6F73 | 6C5F | 636F | 5F6B | 626F | 116A |
| 0001711040 | 0604 | EC00 | 0B03 | 6274 | 5F6C | 6468 | 5F6C | 7470 |
| 0001711060 | 0D72 | 0A04 | C000 | 0700 | 656B | 5F79 | 7470 | 0D72 |
| 0001711100 | 0E04 | 8100 | 0700 | 6F6C | 6B63 | 6F5F | 0A70 | FA04 |
| 0001711120 | 81FF | 0400 | 6973 | 657A | 0408 | FFFC | 0081 | 7302 |
| 0001711140 | 0174 | 1D02 | 5C01 | 31DD | 6A04 | 1001 | 5F00 | 0001 |
| 0001711160 | 0400 | 640E | 6F73 | 755F | 6C6E | 636F | 5F6B | 626F |
| 0001711200 | 116A | 0604 | EC00 | 0B03 | 6274 | 5F6C | 6468 | 5F6C |
| 0001711220 | 7470 | 0D72 | 0A04 | C000 | 0700 | 656B | 5F79 | 7470 |
| 0001711240 | 0D72 | F404 | 32FF | 0704 | 6F70 | 5F73 | 7562 | 0D66 |
| 0001711260 | FC04 | 81FF | 0700 | 6F70 | 5F73 | 656C | 0A6E | F804 |
| 0001711300 | 81FF | 0400 | 6973 | 657A | 0408 | FFFA | 0081 | 7302 |
| 0001711320 | 0174 | 1D02 | C601 | 34DE | E204 | 1000 | D700 | 0000 |
| 0001711340 | 0400 | 640E | 6F73 | 755F | 6C6E | 636F | 5F6B | 6C61 |
| 0001711360 | 116C | 0604 | EC00 | 0B03 | 6274 | 5F6C | 6468 | 5F6C |
| 0001711400 | 7470 | 0D72 | F204 | 32FF | 0704 | 6F70 | 5F73 | 7562 |
| 0001711420 | 0D66 | FC04 | 81FF | 0700 | 6F70 | 5F73 | 656C | 0F6E |
| 0001711440 | F804 | 82FF | 0900 | 7564 | 6D6D | 5F79 | 656B | 0879 |
| 0001711460 | F604 | 81FF | 0200 | 7473 | 0201 | 0510 | 5762 | 000B |

THU MAR 14 17:31:54 1991 DB_PI.DLL PAGE 424, LINE 24958

| | | | | | | | | |
|---|---|---|---|---|---|---|---|---|
| 0001711500 | 0423 | 6208 | 6675 | 5F30 | 7470 | 2072 | B605 | 0B38 |
| 0001711520 | 1C00 | 1803 | 6264 | 5F30 | 7563 | 7272 | 6E65 | 5F74 |
| 0001711540 | 6576 | 7372 | 6F69 | 5F6E | 616E | 656D | 0515 | 38D6 |
| 0001711560 | 000B | 0086 | 640D | 3062 | 625F | 7274 | 5F76 | 7375 |
| 0001711600 | 6465 | 0D05 | 0000 | 001A | 0526 | 37AC | 000B | 0422 |
| 0001711620 | 441E | 4F53 | 445F | 4645 | 5541 | 544C | 435F | 4C4F |
| 0001711640 | 414C | 4954 | 474E | 535F | 5145 | 4555 | 434E | 0545 |
| 0001711660 | 0511 | 0000 | 1C00 | 0001 | 3C00 | 3B04 | 1001 | 3000 |
| 0001711700 | 0001 | 0400 | 640D | 6F73 | 725F | 6365 | 7276 | 745F |
| 0001711720 | 6C62 | 040C | 0006 | 0081 | 6D06 | 7465 | 6F68 | 1164 |
| 0001711740 | 0804 | F900 | 0B03 | 6274 | 5F6C | 6468 | 5F6C | 7470 |
| 0001711760 | 0E72 | 0C04 | C000 | 0800 | 6964 | 5F72 | 6170 | 6874 |
| 0001712000 | 0416 | 0010 | 00C0 | 6510 | 7478 | 7265 | 5F6E | 7475 |
| 0001712020 | 6C69 | 6E5F | 6D61 | 0D65 | 1404 | C500 | 0700 | 626F |
| 0001712040 | 656A | 7463 | 0A73 | 1804 | C500 | 0400 | 6F6C | 7473 |
| 0001712060 | 0408 | FFFC | 0081 | 7302 | 0174 | 2102 | 3B01 | 3E01 |
| 0001712100 | D204 | 1001 | C700 | 0001 | 0400 | 6412 | 6F73 | 725F |
| 0001712120 | 6D65 | 766F | 5F65 | 6576 | 5F72 | 626F | 0D6A | 0604 |
| 0001712140 | C000 | 0700 | 6F70 | 5F73 | 6C62 | 0F6B | 0A04 | 8500 |
| 0001712160 | 0900 | 656B | 5F79 | 7369 | 695F | 0A64 | D604 | 81FF |
| 0001712200 | 0400 | 6973 | 657A | 0412 | FFFA | 0086 | 760C | 7265 |
| 0001712220 | 6973 | 6E6F | 315F | 695F | 1464 | DA04 | 1CFF | 0E03 |
| 0001712240 | 6576 | 7372 | 6F69 | 5F6E | 5F31 | 616E | 656D | 0408 |
| 0001712260 | FFD8 | 0081 | 7302 | 0174 | 2002 | 0D01 | 4003 | 7F04 |
| 0001712300 | 1005 | 7400 | 0005 | 0400 | 6411 | 6F73 | 725F | 6365 |
| 0001712320 | 7276 | 655F | 7478 | 6172 | 7463 | 0411 | 0006 | 03F9 |
| 0001712340 | 740B | 6C62 | 685F | 6C64 | 705F | 7274 | 040E | 000A |
| 0001712360 | 00C0 | 6408 | 7269 | 705F | 7461 | 0D68 | 0E04 | C500 |
| 0001712400 | 0700 | 626F | 656A | 7463 | 0A73 | 1204 | C500 | 0400 |
| 0001712420 | 6F6C | 7473 | 0408 | FFD4 | 0081 | 7302 | 0E74 | FC04 |
| 0001712440 | 81FF | 0800 | 6966 | 616E | 5F6C | 7473 | 040E | FE4C |
| 0001712460 | 03E1 | 7008 | 7461 | 6E68 | 6D61 | 0A65 | 4C04 | 81FF |
| 0001712500 | 0400 | 6973 | 657A | 0410 | FF4E | 0085 | 610A | 7474 |
| 0001712520 | 6D65 | 7470 | 6E5F | 116F | 5004 | DCFF | 0B03 | 6D74 |
| 0001712540 | 5F70 | 6F70 | 5F73 | 6C62 | 0A6B | D604 | 85FF | 0400 |
| 0001712560 | 6F63 | 746E | 040D | FFD8 | 00C4 | 6207 | 6675 | 705F |
| 0001712600 | 7274 | 0411 | FFDC | 031C | 660B | 6369 | 6974 | 6576 |
| 0001712620 | 6B5F | 7965 | 040F | FFD0 | 0086 | 6609 | 6C69 | 5F65 |
| 0001712640 | 6973 | 657A | 0201 | 011F | 088C | 0445 | 04B6 | 0010 |
| 0001712660 | 04AB | 0000 | 1004 | 7364 | 5F6F | 6572 | 7663 | 5F72 |
| 0001712700 | 7865 | 6574 | 6E72 | 0411 | 0006 | 03F9 | 740B | 6C62 |
| 0001712720 | 685F | 6C64 | 705F | 7274 | 040E | 000A | 00C0 | 6408 |
| 0001712740 | 7269 | 705F | 7461 | 1068 | 0E04 | C000 | 0A00 | 7562 |
| 0001712760 | 6974 | 5F6C | 616E | 656D | 040D | 0012 | 00C5 | 6F07 |
| 0001713000 | 6A62 | 6365 | 7374 | 040A | 0016 | 00C5 | 6C04 | 736F |
| 0001713020 | 1274 | FE04 | E1FE | 0C03 | 7273 | 5F63 | 6170 | 6874 |
| 0001713040 | 616E | 656D | 0412 | FDF6 | 03E1 | 740C | 6772 | 705F |
| 0001713060 | 7461 | 6E68 | 6D61 | 0A65 | F404 | 85FD | 0400 | 7461 |
| 0001713100 | 7274 | 0409 | FEF6 | 0085 | 6503 | 7272 | 0412 | FEFA |
| 0001713120 | 00C0 | 630C | 6D6F | 616D | 646E | 6C5F | 6E69 | 1565 |
| 0001713140 | F204 | 81FD | 0F00 | 6D63 | 5F64 | 696C | 656E | 6C5F |
| 0001713160 | 6E65 | 7467 | 0868 | F804 | 81FE | 0200 | 7473 | 0201 |
| 0001713200 | 0124 | 0D42 | 0448 | 0021 | 0010 | 0016 | 0000 | 1504 |
| 0001713220 | 7364 | 5F6F | 6572 | 7663 | 5F72 | 7266 | 6D6F | 625F |
| 0001713240 | 6361 | 756B | 1170 | 0604 | F900 | 0B03 | 6274 | 5F6C |
| 0001713260 | 6468 | 5F6C | 7470 | 0E72 | 0A04 | C000 | 0800 | 6964 |
| 0001713300 | 5F72 | 6170 | 6874 | 040D | 000E | 00C5 | 6F07 | 6A62 |
| 0001713320 | 6365 | 7374 | 040A | 0012 | 00C5 | 6C04 | 736F | 0174 |
| 0001713340 | 1B02 | 6301 | 4A0D | FB04 | 1006 | F000 | 0006 | 0400 |

THU MAR 14 17:31:54 1991 DB_PI.DLL PAGE 425, LINE 25017

| | | | | | | | | |
|---|---|---|---|---|---|---|---|---|
| 0001713360 | 640C | 6F73 | 6C5F | 616F | 5F64 | 6274 | 116C | 0604 |
| 0001713400 | F900 | 0B03 | 6274 | 5F6C | 6468 | 5F6C | 7470 | 0E72 |
| 0001713420 | 0A04 | C000 | 0800 | 6964 | 5F72 | 6170 | 6874 | 040F |
| 0001713440 | 000E | 0081 | 6F09 | 6570 | 5F6E | 6F6D | 6564 | 040F |
| 0001713460 | 0010 | 0085 | 6B09 | 7965 | 695F | 5F73 | 6469 | 040D |
| 0001713500 | 0012 | 0081 | 6F07 | 6A62 | 745F | 7079 | 0414 | FEB6 |
| 0001713520 | 031C | 690E | 5F64 | 616E | 656D | 625F | 6675 | 6566 |
| 0001713540 | 1272 | F604 | 86FF | 0C00 | 6576 | 7372 | 6F69 | 5F6E |
| 0001713560 | 5F31 | 6469 | 0414 | FED6 | 031C | 760E | 7265 | 6973 |
| 0001713600 | 6E6F | 315F | 6E5F | 6D61 | 0E65 | B204 | E1FD | 0803 |
| 0001713620 | 6170 | 6874 | 616E | 656D | 0415 | FEF6 | 03E1 | 620F |
| 0001713640 | 6361 | 756B | 5F70 | 6170 | 6874 | 616E | 656D | 040A |
| 0001713660 | FEB2 | 0081 | 7304 | 7A69 | 0D65 | FA04 | 86FF | 0700 |
| 0001713700 | 616C | 7473 | 695F | 0864 | B404 | 81FE | 0200 | 7473 |
| 0001713720 | 0201 | 011D | 145E | 044C | 0133 | 0010 | 0128 | 0000 |
| 0001713740 | 0E04 | 7364 | 5F6F | 6E75 | 6F6C | 6461 | 745F | 6C62 |
| 0001713760 | 0411 | 0006 | 03F9 | 740B | 6C62 | 685F | 6C64 | 705F |
| 0001714000 | 7274 | 040A | FFFA | 0081 | 7304 | 7A69 | 0865 | FC04 |
| 0001714020 | 81FF | 0200 | 7473 | 0201 | 0117 | 1591 | 044D | 0078 |
| 0001714040 | 0010 | 006D | 0000 | 0804 | 7364 | 5F6F | 7473 | 706F |
| 0001714060 | 040A | FFFA | 0081 | 7304 | 7A69 | 0865 | FC04 | 81FF |
| 0001714100 | 0200 | 7473 | 0201 | 0123 | 1609 | 044F | 0561 | 0010 |
| 0001714120 | 0556 | 0000 | 1404 | 7364 | 5F6F | 7263 | 6165 | 6574 |
| 0001714140 | 625F | 7274 | 5F76 | 6966 | 656C | 040D | 0006 | 03F9 |
| 0001714160 | 7407 | 6C62 | 685F | 6C64 | 0416 | 000A | 0081 | 7310 |
| 0001714200 | 6F74 | 6572 | 5F64 | 6164 | 6174 | 745F | 7079 | 0F65 |
| 0001714220 | 0C04 | C000 | 0900 | 6170 | 6874 | 6E5F | 6D61 | 0F65 |
| 0001714240 | 1004 | 8500 | 0900 | 6170 | 6567 | 735F | 7A69 | 1365 |
| 0001714260 | 1204 | 8500 | 0D00 | 7270 | 6165 | 6C6C | 636F | 7461 |
| 0001714300 | 6F69 | 106E | 1404 | 8500 | 0A00 | 6966 | 656C | 665F |
| 0001714320 | 616C | 7367 | 0410 | 0016 | 0085 | 6B0A | 7965 | 6F5F |
| 0001714340 | 6666 | 6573 | 0F74 | 1804 | 8500 | 0900 | 766F | 7265 |
| 0001714360 | 7277 | 7469 | 1465 | EE04 | 5AFF | 0E04 | 796D | 645F |
| 0001714400 | 7461 | 5F61 | 7562 | 6666 | 7265 | 0408 | FFF2 | 0081 |
| 0001714420 | 7302 | 1674 | FC04 | 81FF | 1000 | 796D | 625F | 6675 |
| 0001714440 | 6566 | 5F72 | 656C | 676E | 6874 | 040E | FECC | 045B |
| 0001714460 | 6608 | 6C69 | 7365 | 6570 | 1563 | F804 | C4FF | 0F00 |
| 0001714500 | 6576 | 7372 | 6F69 | 5F6E | 626F | 5F6A | 7470 | 1472 |
| 0001714520 | F404 | C4FF | 0E00 | 6576 | 7372 | 6F69 | 5F6E | 6469 |
| 0001714540 | 705F | 7274 | 040E | FFEC | 0081 | 7408 | 706D | 735F |
| 0001714560 | 7A69 | 0165 | 2402 | 6A01 | 5E1B | 7504 | 1006 | 6A00 |
| 0001714600 | 0006 | 0400 | 6415 | 6F73 | 635F | 6572 | 7461 | 3265 |
| 0001714620 | 625F | 7274. | 5F76 | 6966 | 656C | 040D | 0006 | 03F9 |
| 0001714640 | 7407 | 6C62 | 685F | 6C64 | 0416 | 000A | 0081 | 7310 |
| 0001714660 | 6F74 | 6572 | 5F64 | 6164 | 6174 | 745F | 7079 | 0F65 |
| 0001714700 | 0C04 | C000 | 0900 | 6170 | 6874 | 6E5F | 6D61 | 0F65 |
| 0001714720 | 1004 | 8500 | 0900 | 6170 | 6567 | 735F | 7A69 | 1365 |
| 0001714740 | 1204 | 8500 | 0D00 | 7270 | 6165 | 6C6C | 636F | 7461 |
| 0001714760 | 6F69 | 106E | 1404 | 8500 | 0A00 | 6966 | 656C | 665F |
| 0001715000 | 616C | 7367 | 0416 | 0016 | 0084 | 7010 | 6972 | 616D |
| 0001715020 | 7972 | 6B5F | 7965 | 745F | 7079 | 1765 | 1804 | 8500 |
| 0001715040 | 1100 | 7270 | 6D69 | 7261 | 5F79 | 656B | 5F79 | 6C66 |
| 0001715060 | 6761 | 1873 | 1A04 | 8500 | 1200 | 7270 | 6D69 | 7261 |
| 0001715100 | 5F79 | 656B | 5F79 | 666F | 7366 | 7465 | 0418 | 001C |
| 0001715120 | 0084 | 7312 | 6365 | 6E6F | 6164 | 7972 | 6B5F | 7965 |
| 0001715140 | 745F | 7079 | 1965 | 1E04 | 8500 | 1300 | 6573 | 6F63 |
| 0001715160 | 646E | 7261 | 5F79 | 656B | 5F79 | 6C66 | 6761 | 1A73 |
| 0001715200 | 2004 | 8500 | 1400 | 6573 | 6F63 | 646E | 7261 | 5F79 |
| 0001715220 | 656B | 5F79 | 666F | 7366 | 7465 | 040F | 0022 | 0085 |

THU MAR 14 17:31:54 1991 DB_PI.DLL PAGE 426, LINE 25076

| | | | | | | | | |
|---|---|---|---|---|---|---|---|---|
| 0001715240 | 6F09 | 6576 | 7772 | 6972 | 6574 | 0414 | FFEE | 0468 |
| 0001715260 | 6D0E | 5F79 | 6164 | 6174 | 625F | 6675 | 6566 | 0872 |
| 0001715300 | F204 | 81FF | 0200 | 7473 | 0416 | FFFC | 0081 | 6D10 |
| 0001715320 | 5F79 | 7562 | 6666 | 7265 | 6C5F | 6E65 | 7467 | 0E68 |
| 0001715340 | C604 | 5BFE | 0804 | 6966 | 656C | 7073 | 6365 | 0415 |
| 0001715360 | FFF8 | 00C4 | 760F | 7265 | 6973 | 6E6F | 6F5F | 6A62 |
| 0001715400 | 705F | 7274 | 0414 | FFF4 | 00C4 | 760E | 7265 | 6973 |
| 0001715420 | 6E6F | 695F | 5F64 | 7470 | 1C72 | E604 | 85FF | 1600 |
| 0001715440 | 6576 | 7372 | 6F69 | 5F6E | 626F | 5F6A | 7470 | 5F72 |
| 0001715460 | 666F | 7366 | 7465 | 040E | FFE8 | 0081 | 7408 | 706D |
| 0001715500 | 735F | 7A69 | 1C65 | EA04 | C4FF | 1600 | 7270 | 6D69 |
| 0001715520 | 7261 | 5F79 | 6576 | 7372 | 6F69 | 5F6E | 6469 | 705F |
| 0001715540 | 7274 | 041E | FEC2 | 00C4 | 7318 | 6365 | 6E6F | 6164 |
| 0001715560 | 7972 | 765F | 7265 | 6973 | 6E6F | 695F | 5F64 | 7470 |
| 0001715600 | 0172 | 1C02 | DF01 | 6A21 | BD04 | 1003 | B200 | 0003 |
| 0001715620 | 0400 | 640D | 6F73 | 635F | 656C | 7261 | 745F | 6C62 |
| 0001715640 | 0411 | 0006 | 03F9 | 740B | 6C62 | 685F | 6C64 | 705F |
| 0001715660 | 7274 | 040E | 000A | 00C0 | 6408 | 7269 | 705F | 7461 |
| 0001715700 | 1368 | 0E04 | 8500 | 0D00 | 6C63 | 6165 | 5F72 | 6576 |
| 0001715720 | 7372 | 6F69 | 086E | DA04 | 81FF | 0200 | 7473 | 040A |
| 0001715740 | FFD6 | 0081 | 7304 | 7A69 | 0E65 | D604 | E1FE | 0803 |
| 0001715760 | 6170 | 6874 | 616E | 656D | 040D | FFD8 | 0081 | 7307 |
| 0001716000 | 6574 | 5F70 | 706F | 040A | FFDC | 0085 | 6304 | 6E6F |
| 0001716020 | 1074 | DE04 | 1CFF | 0A03 | 656B | 5F79 | 7562 | 6666 |
| 0001716040 | 7265 | 0201 | 011D | 259C | 046C | 029C | 0010 | 0291 |
| 0001716060 | 0000 | 0E04 | 7364 | 5F6F | 6572 | 6F6D | 6576 | 745F |
| 0001716100 | 6C62 | 0411 | 0006 | 03F9 | 740B | 6C62 | 685F | 6C64 |
| 0001716120 | 705F | 7274 | 040E | 000A | 00C0 | 6408 | 7269 | 705F |
| 0001716140 | 7461 | 0868 | FC04 | 81FF | 0200 | 7473 | 040E | FEFA |
| 0001716160 | 03E1 | 7008 | 7461 | 6E68 | 6D61 | 0A65 | FA04 | 81FF |
| 0001716200 | 0400 | 6973 | 657A | 0201 | 0123 | 2838 | 046E | 0088 |
| 0001716220 | 0010 | 007D | 0000 | 1404 | 7364 | 5F6F | 6572 | 6F6D |
| 0001716240 | 6576 | 635F | 656C | 7261 | 745F | 6C62 | 0411 | 0006 |
| 0001716260 | 03F9 | 740B | 6C62 | 685F | 6C64 | 705F | 7274 | 040E |
| 0001716300 | 000A | 00C0 | 6408 | 7269 | 705F | 7461 | 0868 | FA04 |
| 0001716320 | 81FF | 0200 | 7473 | 040C | FFFC | 0081 | 7206 | 7465 |
| 0001716340 | 735F | 0174 | 0502 | 000D | 1A00 | 1000 | 6205 | 0B59 |
| 0001716360 | 2F00 | 0804 | 7562 | 3066 | 705F | 7274 | 0520 | 38DA |
| 0001716400 | 000B | 031C | 6418 | 3062 | 635F | 7275 | 6572 | 746E |
| 0001716420 | 765F | 7265 | 6973 | 6E6F | 6E5F | 6D61 | 1C65 | FA05 |
| 0001716440 | 0B38 | 3200 | 1404 | 6264 | 5F30 | 7865 | 6574 | 6E72 |
| 0001716460 | 725F | 6365 | 7276 | 615F | 6772 | 051B | 3904 | 000B |
| 0001716500 | 0434 | 6413 | 3062 | 655F | 7478 | 7265 | 5F6E | 6F6C |
| 0001716520 | 6461 | 615F | 6772 | 1105 | 0005 | 0000 | 011F | 28C0 |
| 0001716540 | 0422 | 009C | 0010 | 0091 | 0000 | 1004 | 7364 | 5F6F |
| 0001716560 | 7865 | 7274 | 6361 | 5F74 | 6170 | 6874 | 040E | 0006 |
| 0001716600 | 00C0 | 7008 | 7461 | 6E68 | 6D61 | 0E65 | 0A04 | C000 |
| 0001716620 | 0800 | 7566 | 6C6C | 616E | 656D | 040E | FFF6 | 00C0 |
| 0001716640 | 6C08 | 636F | 7461 | 6F69 | 0B6E | F204 | C0FF | 0500 |
| 0001716660 | 6863 | 5F72 | 0B70 | FA04 | C0FF | 0500 | 6863 | 5F72 |
| 0001716700 | 0166 | 2302 | 5C01 | 2429 | 7304 | 1000 | 6800 | 0000 |
| 0001716720 | 0400 | 6414 | 6F73 | 655F | 7478 | 6172 | 7463 | 665F |
| 0001716740 | 6C69 | 6E65 | 6D61 | 0E65 | 0604 | C000 | 0800 | 6966 |
| 0001716760 | 656C | 616E | 656D | 040E | 000A | 00C0 | 6608 | 6C75 |
| 0001717000 | 6E6C | 6D61 | 0E65 | FA04 | C0FF | 0800 | 6F6C | 6163 |
| 0001717020 | 6974 | 6E6F | 0201 | 011E | 29CF | 0426 | 00D0 | 0010 |
| 0001717040 | 00C5 | 0000 | 0F04 | 7364 | 5F6F | 6170 | 6874 | 655F |
| 0001717060 | 6978 | 7473 | 0E73 | 0604 | C000 | 0800 | 6170 | 6874 |
| 0001717100 | 616E | 656D | 040A | 000A | 0085 | 6104 | 7474 | 1072 |

THU MAR 14 17:31:54 1991 DB_PI.DLL PAGE 427, LINE 25135

| | | | | | | | | |
|---|---|---|---|---|---|---|---|---|
| 0001717120 | FC04 | 85FF | 0A00 | 7461 | 7274 | 6269 | 7475 | 7365 |
| 0001717140 | 040E | FFF8 | 0085 | 7208 | 7365 | 6F70 | 736E | 0F65 |
| 0001717160 | FA04 | 85FF | 0900 | 6966 | 656C | 615F | 7474 | 0172 |
| 0001717200 | 1E02 | 9F01 | 282A | 3F04 | 1000 | 3400 | 0000 | 0400 |
| 0001717220 | 640F | 6F73 | 745F | 7365 | 5F74 | 7865 | 7369 | 7374 |
| 0001717240 | 040E | 0006 | 00C0 | 7008 | 7461 | 6E68 | 6D61 | 0165 |
| 0001717260 | 1802 | DE01 | 2A2A | 1F04 | 1001 | 1400 | 0001 | 0400 |
| 0001717300 | 6409 | 6F73 | 6D5F | 646B | 7269 | 040E | 0006 | 00C0 |
| 0001717320 | 6408 | 7269 | 705F | 7461 | 0B68 | 0A04 | 8100 | 0500 |
| 0001717340 | 6373 | 706F | 1065 | FC04 | D4FE | 0A03 | 6170 | 6572 |
| 0001717360 | 746E | 645F | 7269 | 0408 | FFFC | 0081 | 7302 | 0174 |
| 0001717400 | 2202 | FD01 | 2C2B | AC04 | 1002 | A100 | 0002 | 0400 |
| 0001717420 | 6413 | 6F73 | 725F | 6365 | 7275 | 6973 | 6576 | 725F |
| 0001717440 | 646D | 7269 | 040E | 0006 | 00C0 | 6408 | 7269 | 705F |
| 0001717460 | 7461 | 0E68 | D204 | D4FE | 0803 | 6170 | 6874 | 616E |
| 0001717500 | 656D | 040A | FFF8 | 0085 | 6804 | 6964 | 0D72 | D204 |
| 0001717520 | 16FF | 0703 | 6966 | 646E | 7562 | 1266 | F604 | 85FF |
| 0001717540 | 0C00 | 6573 | 7261 | 6863 | 635F | 756F | 746E | 0408 |
| 0001717560 | FFFA | 0081 | 7302 | 1174 | FC04 | 81FF | 0B00 | 6966 |
| 0001717600 | 646E | 735F | 6174 | 7574 | 0173 | 1B02 | A901 | 312E |
| 0001717620 | 9A04 | 1001 | 8F00 | 0001 | 0400 | 640C | 6F73 | 725F |
| 0001717640 | 5F6D | 6966 | 656C | 0973 | 0604 | C000 | 0300 | 6964 |
| 0001717660 | 0E72 | 0A04 | C000 | 0800 | 6966 | 656C | 7073 | 6365 |
| 0001717700 | 040E | FED2 | 03D4 | 7008 | 7461 | 6E68 | 6D61 | 0A65 |
| 0001717720 | FA04 | 85FF | 0400 | 6468 | 7269 | 040D | FFD2 | 0316 |
| 0001717740 | 6607 | 6E69 | 6264 | 6675 | 0412 | FFF6 | 0085 | 730C |
| 0001717760 | 6165 | 6372 | 5F68 | 6F63 | 6E75 | 1174 | FC04 | 81FF |
| 0001720000 | 0B00 | 6966 | 646E | 735F | 6174 | 7574 | 0F73 | F804 |
| 0001720020 | 85FF | 0900 | 7974 | 6570 | 735F | 6570 | 0163 | 1802 |
| 0001720040 | 4301 | 3330 | A704 | 1000 | 9C00 | 0000 | 0400 | 6409 |
| 0001720060 | 6F73 | 725F | 646D | 7269 | 040E | 0006 | 00C0 | 6408 |
| 0001720100 | 7269 | 705F | 7461 | 0B68 | 0A04 | 8100 | 0500 | 6373 |
| 0001720120 | 706F | 0865 | FC04 | 81FF | 0200 | 7473 | 0201 | 0115 |
| 0001720140 | 30EA | 0435 | 02F4 | 0010 | 02E9 | 0000 | 0604 | 7364 |
| 0001720160 | 5F6F | 7564 | 040E | 0006 | 00C0 | 6408 | 7269 | 705F |
| 0001720200 | 7461 | 0B68 | 0A04 | 8100 | 0500 | 6373 | 706F | 0A65 |
| 0001720220 | 0C04 | C600 | 0400 | 6973 | 657A | 040A | FFF8 | 0085 |
| 0001720240 | 6804 | 6964 | 0D72 | CE04 | 16FE | 0703 | 6966 | 646E |
| 0001720260 | 7562 | 1266 | F204 | 85FE | 0C00 | 6573 | 7261 | 6863 |
| 0001720300 | 635F | 756F | 746E | 040E | FEF4 | 03D4 | 7008 | 7461 |
| 0001720320 | 6E68 | 6D61 | 1165 | FC04 | 81FF | 0B00 | 6966 | 646E |
| 0001720340 | 735F | 6174 | 7574 | 0E73 | F404 | 86FF | 0800 | 6D74 |
| 0001720360 | 5F70 | 6973 | 657A | 0408 | FFFA | 0081 | 7302 | 0174 |
| 0001720400 | 1802 | DE01 | 3933 | 9904 | 1000 | 8E00 | 0000 | 0400 |
| 0001720420 | 6409 | 6F73 | 6D5F | 6B6B | 6469 | 040A | 0006 | 00C0 |
| 0001720440 | 6804 | 6165 | 0A64 | 0A04 | C000 | 0400 | 6174 | 6C69 |
| 0001720460 | 0409 | 000E | 00C0 | 6203 | 6675 | 0407 | FFFA | 00C0 |
| 0001720500 | 7001 | 040C | FFF6 | 00C0 | 6606 | 726F | 616D | 0174 |
| 0001720520 | 1B02 | 7701 | 3D34 | 0504 | 1002 | FA00 | 0001 | 0400 |
| 0001720540 | 640C | 6F73 | 635F | 706F | 5F79 | 6964 | 0A72 | 0604 |
| 0001720560 | C000 | 0400 | 7266 | 6D6F | 0408 | 000A | 00C0 | 7402 |
| 0001720600 | 0A6F | F804 | 85FF | 0400 | 6468 | 7269 | 040D | FED2 |
| 0001720620 | 0316 | 6607 | 6E69 | 6264 | 6675 | 0412 | FEF6 | 0085 |
| 0001720640 | 730C | 6165 | 6372 | 5F68 | 6F63 | 6E75 | 0E74 | F804 |
| 0001720660 | D4FE | 0803 | 6170 | 6874 | 616E | 656D | 0411 | FFFC |
| 0001720700 | 0081 | 660B | 6E69 | 5F64 | 7473 | 7461 | 7375 | 0408 |
| 0001720720 | FFFA | 0081 | 7302 | 0574 | 7D00 | D335 | 0A00 | D204 |
| 0001720740 | D4FD | 0403 | 7562 | 3166 | 040A | FCD2 | 03D4 | 6204 |
| 0001720760 | 6675 | 0132 | 0102 | 1502 | 7C01 | 3F36 | 8804 | 1002 |

THU MAR 14 17:31:54 1991 DB_PI.DLL PAGE 428, LINE 25194

| | | | | | | | | |
|---|---|---|---|---|---|---|---|---|
| 0001721000 | 7D00 | 0002 | 0400 | 6406 | 6F73 | 635F | 0D70 | 0604 |
| 0001721020 | C000 | 0700 | 7273 | 5F63 | 7473 | 0D72 | 0A04 | C000 |
| 0001721040 | 0700 | 7364 | 5F74 | 7473 | 0F72 | 0E04 | 8500 | 0900 |
| 0001721060 | 766F | 7265 | 7277 | 7469 | 1065 | 1004 | 8500 | 0A00 |
| 0001721100 | 616D | 656B | 635F | 6968 | 646C | 0409 | FBF6 | 03D4 |
| 0001721120 | 6203 | 6675 | 0409 | FCF8 | 03D4 | 6B03 | 6469 | 0410 |
| 0001721140 | FCF6 | 0085 | 640A | 7473 | 655F | 6978 | 7473 | 1173 |
| 0001721160 | FA04 | D4FD | 0B03 | 6170 | 6572 | 746E | 705F | 7461 |
| 0001721200 | 0868 | F804 | 81FD | 0200 | 7473 | 0412 | FEFA | 03D4 |
| 0001721220 | 730C | 6372 | 645F | 7269 | 6E5F | 6D61 | 0D65 | F404 |
| 0001721240 | 85FB | 0700 | 7273 | 5F63 | 7461 | 0D72 | FA04 | 85FF |
| 0001721260 | 0700 | 7364 | 5F74 | 7461 | 0E72 | FC04 | 85FF | 0800 |
| 0001721300 | 7266 | 6D6F | 7473 | 7461 | 040C | FBF2 | 0085 | 7406 |
| 0001721320 | 736F | 6174 | 0174 | 2002 | 0401 | 4139 | E604 | 1001 |
| 0001721340 | DB00 | 0001 | 0400 | 6411 | 6F73 | 635F | 706F | 5F79 |
| 0001721360 | 6E6F | 5F65 | 6966 | 656C | 040C | 0006 | 00C0 | 7306 |
| 0001721400 | 756F | 6372 | 0A65 | 0A04 | C000 | 0400 | 6564 | 7473 |
| 0001721420 | 0408 | FFF4 | 0081 | 7302 | 0C74 | F6U4 | 85FF | 0600 |
| 0001721440 | 6668 | 735F | 6372 | 040C | FFF2 | 0085 | 6806 | 5F66 |
| 0001721460 | 7364 | 0D74 | D804 | 85FF | 0700 | 6361 | 5F74 | 7273 |
| 0001721500 | 0D63 | FA04 | 85FF | 0700 | 6361 | 5F74 | 7364 | 0D74 |
| 0001721520 | DA04 | 85FF | 0700 | 7461 | 5F72 | 7273 | 1063 | FC04 |
| 0001721540 | 85FF | 0A00 | 7962 | 6574 | 5F73 | 6572 | 6461 | 0413 |
| 0001721560 | FFF8 | 0085 | 620D | 7479 | 7365 | 775F | 6972 | 7474 |
| 0001721600 | 6E65 | 040F | FFDC | 0342 | 6609 | 6C69 | 5F65 | 6E69 |
| 0001721620 | 6F66 | 050E | 0000 | 0009 | 0442 | 6206 | 6675 | 6566 |
| 0001721640 | 0172 | 1E02 | EA01 | 443A | 6D04 | 1000 | 6200 | 0000 |
| 0001721660 | 0400 | 640F | 6F73 | 6D5F | 5F6B | 6966 | 656C | 616E |
| 0001721700 | 656D | 040E | 0006 | 00C0 | 6608 | 6C69 | 6E65 | 6D61 |
| 0001721720 | 0F65 | 0A04 | C000 | 0900 | 7865 | 6574 | 746E | 6F69 |
| 0001721740 | 0E6E | 0E04 | C000 | 0800 | 6170 | 6874 | 616E | 656D |
| 0001721760 | 0412 | 0012 | 0085 | 6F0C | 5F6E | 7865 | 6574 | 746E |
| 0001722000 | 6F69 | 0E6E | 1404 | C000 | 0800 | 656E | 5F77 | 6966 |
| 0001722020 | 656C | 0201 | 0125 | 3B57 | 0446 | 0304 | 0010 | 02F9 |
| 0001722040 | 0000 | 1604 | 7364 | 5F6F | 6B6D | 665F | 6C69 | 6E65 |
| 0001722060 | 6D61 | 5F65 | 6E6F | 655F | 7478 | 040E | 0006 | 00C0 |
| 0001722100 | 6608 | 6C69 | 6E65 | 6D61 | 0F65 | 0A04 | C000 | 0900 |
| 0001722120 | 7865 | 6574 | 746E | 6F69 | 0E6E | 0E04 | C000 | 0800 |
| 0001722140 | 6170 | 6874 | 616E | 656D | 040E | 0012 | 00C0 | 6E08 |
| 0001722160 | 7765 | 665F | 6C69 | 0E65 | F204 | C0FF | 0800 | 7566 |
| 0001722200 | 6C6C | 616E | 656D | 040E | FFEA | 00C0 | 7408 | 6D65 |
| 0001722220 | 6E70 | 6D61 | 0D65 | FA04 | C0FF | 0700 | 6574 | 706D |
| 0001722240 | 6863 | 0D70 | F004 | 81FF | 0700 | 616D | 5F78 | 7865 |
| 0001722260 | 0D74 | F804 | 81FF | 0700 | 7865 | 5F74 | 6176 | 116C |
| 0001722300 | F604 | 81FF | 0B00 | 6966 | 646E | 735F | 6174 | 7574 |
| 0001722320 | 0A73 | EE04 | 85FF | 0400 | 6468 | 7269 | 040D | FFC0 |
| 0001722340 | 0316 | 6607 | 6E69 | 6264 | 6675 | 040F | FFE6 | 00C0 |
| 0001722360 | 7309 | 7274 | 625F | 6765 | 6E69 | 0412 | FFE4 | 0085 |
| 0001722400 | 730C | 6165 | 6372 | 5F68 | 6F63 | 6E75 | 0174 | 2602 |
| 0001722420 | 5B01 | 483E | 8404 | 1001 | 7900 | 0001 | 0400 | 6417 |
| 0001722440 | 6F73 | 6D5F | 5F6B | 6966 | 656C | 616E | 656D | 6F5F |
| 0001722460 | 5F6E | 616E | 656D | 0412 | 0006 | 00C0 | 660C | 6C69 |
| 0001722500 | 6E65 | 6D61 | 5F65 | 6170 | 0F72 | 0A04 | C000 | 0900 |
| 0001722520 | 7865 | 6574 | 746E | 6F69 | 0E6E | 0E04 | C000 | 0800 |
| 0001722540 | 6170 | 6874 | 616E | 656D | 040E | 0012 | 00C0 | 6E08 |
| 0001722560 | 7765 | 6E5F | 6D61 | 0E65 | CA04 | D4FE | 0803 | 656E |
| 0001722600 | 5F77 | 6966 | 656C | 040E | FFD4 | 031C | 6608 | 6C69 |
| 0001722620 | 6E65 | 6D61 | 1365 | D004 | 81FF | 0D00 | 7461 | 6574 |
| 0001722640 | 706D | 5F74 | 6E69 | 6564 | 0F78 | F404 | 49FF | 0904 |

THU MAR 14 17:31:54 1991 DB_PI.DLL PAGE 429, LINE 25253

| | | | | | | | | |
|---|---|---|---|---|---|---|---|---|
| 0001722660 | 6E69 | 6564 | 5F78 | 7473 | 1072 | C604 | C0FE | 0A00 |
| 0001722700 | 616E | 656C | 735F | 6174 | 7472 | 0415 | FFCA | 00C0 |
| 0001722720 | 690F | 736E | 7265 | 5F74 | 6F70 | 6973 | 6974 | 6E6F |
| 0001722740 | 0411 | FFD2 | 0081 | 6E0B | 6D61 | 5F65 | 656C | 676E |
| 0001722760 | 6874 | 0412 | FFCE | 0081 | 690C | 646E | 7865 | 6C5F |
| 0001723000 | 6E65 | 7467 | 0168 | 2302 | DF01 | 4B3F | C904 | 1000 |
| 0001723020 | BE00 | 0000 | 0400 | 6414 | 6F73 | 675F | 7465 | 735F |
| 0001723040 | 7379 | 6574 | 5F6D | 7264 | 7669 | 0F65 | 0604 | C000 |
| 0001723060 | 0900 | 7264 | 7669 | 5F65 | 7473 | 0F72 | FA04 | C0FF |
| 0001723100 | 0900 | 6E65 | 5F76 | 7264 | 7669 | 0165 | 2102 | A801 |
| 0001723120 | 4E40 | 9504 | 1001 | 8A00 | 0001 | 0400 | 6412 | 6F73 |
| 0001723140 | 765F | 7265 | 6669 | 5F79 | 7366 | 6E5F | 6D61 | 0A65 |
| 0001723160 | 0604 | C000 | 0400 | 616E | 656D | 0407 | FFFC | 0081 |
| 0001723200 | 6901 | 0201 | 011E | 423D | 0450 | 00FF | 0010 | 00F4 |
| 0001723220 | 0000 | 0F04 | 7364 | 5F6F | 6576 | 6972 | 7966 | 6E5F |
| 0001723240 | 6D61 | 0D65 | 0604 | C000 | 0700 | 6E69 | 6E5F | 6D61 |
| 0001723260 | 0E65 | 0A04 | C000 | 0800 | 756F | 5F74 | 616E | 656D |
| 0001723300 | 0201 | 011C | 433C | 0452 | 005F | 0010 | 0054 | 0000 |
| 0001723320 | 0D04 | 7364 | 5F6F | 7264 | 7669 | 5F65 | 616D | 0970 |
| 0001723340 | 0604 | C600 | 0300 | 616D | 0D70 | FC04 | 85FF | 0700 |
| 0001723360 | 6966 | 7463 | 7669 | 0165 | 0502 | 000D | 1A00 | 0E00 |
| 0001723400 | 5C05 | 0B35 | A700 | 0602 | 635F | 7974 | 6570 | 1105 |
| 0001723420 | 0005 | 0000 | 011F | 439C | 03DA | 0124 | 0010 | 0119 |
| 0001723440 | 0000 | 1004 | 7364 | 5F6F | 7263 | 6165 | 6574 | 6F5F |
| 0001723460 | 6168 | 6873 | 040A | 0006 | 0085 | 7304 | 7A69 | 0E65 |
| 0001723500 | 0804 | 8500 | 0800 | 6E69 | 5F63 | 6973 | 657A | 040A |
| 0001723520 | 000A | 03C0 | 6804 | 7361 | 0768 | FC04 | 85FF | 0100 |
| 0001723540 | 0169 | 1E02 | C001 | DC44 | 2703 | 1001 | 1C00 | 0001 |
| 0001723560 | 0400 | 640F | 6F73 | 635F | 656C | 7261 | 6F5F | 6168 |
| 0001723600 | 6873 | 040A | 0006 | 03C1 | 6804 | 7361 | 0C68 | FA04 |
| 0001723620 | 85FF | 0600 | 7562 | 6B63 | 7465 | 040B | FFFC | 0085 |
| 0001723640 | 6505 | 746E | 7972 | 0201 | 0110 | 45E7 | 03DE | 005A |
| 0001723660 | 0010 | 004F | 0000 | 0104 | 0948 | 0604 | C000 | 0300 |
| 0001723700 | 7473 | 0A72 | 0A04 | 8500 | 0400 | 6973 | 657A | 040C |
| 0001723720 | FFF8 | 0085 | 6206 | 6375 | 656B | 0974 | FA04 | C0FF |
| 0001723740 | 0300 | 6863 | 0170 | 1D02 | 4101 | E046 | 8603 | 1000 |
| 0001723760 | 7B00 | 0000 | 0400 | 640E | 6F73 | 665F | 6E69 | 5F64 |
| 0001724000 | 6E65 | 7274 | 1079 | 0604 | 9400 | 0A03 | 7562 | 6B63 |
| 0001724020 | 7465 | 705F | 7274 | 0409 | 000A | 00C0 | 6B03 | 7965 |
| 0001724040 | 040F | 000E | 00C5 | 6609 | 756F | 646E | 705F | 7274 |
| 0001724060 | 040B | FFFC | 0085 | 6505 | 746E | 7972 | 0201 | 0122 |
| 0001724100 | 46C7 | 03E2 | 0357 | 0010 | 034C | 0000 | 1304 | 7364 |
| 0001724120 | 5F6F | 6461 | 5F64 | 686F | 7361 | 5F68 | 6E65 | 7274 |
| 0001724140 | 0A79 | 0604 | C100 | 0403 | 6168 | 6873 | 0409 | 000A |
| 0001724160 | 00C0 | 6B03 | 7965 | 040A | 000E | 00C0 | 6904 | 6574 |
| 0001724200 | 0A6D | 1204 | 8500 | 0400 | 6973 | 657A | 040F | 0014 |
| 0001724220 | 0085 | 6F09 | 6576 | 7772 | 6972 | 6574 | 040C | FFF2 |
| 0001724240 | 0085 | 6206 | 6375 | 656B | 0B74 | FC04 | 85FF | 0500 |
| 0001724260 | 6E65 | 7274 | 1379 | F804 | 90FF | 0D03 | 6D74 | 5F70 |
| 0001724300 | 6E65 | 7274 | 5F79 | 7470 | 1172 | F404 | 85FF | 0B00 |
| 0001724320 | 6F66 | 6E75 | 5F64 | 6E65 | 7274 | 0B79 | F604 | 85FF |
| 0001724340 | 0500 | 6F66 | 6E75 | 0164 | 2202 | 1E01 | E44A | 1D03 |
| 0001724360 | 1001 | 1200 | 0001 | 0400 | 6413 | 6F73 | 675F | 7465 |
| 0001724400 | 6F5F | 6168 | 6873 | 655F | 746E | 7972 | 040A | 0006 |
| 0001724420 | 03C1 | 6804 | 7361 | 0968 | 0A04 | C000 | 0300 | 656B |
| 0001724440 | 0A79 | 0E04 | 7F00 | 0403 | 7469 | 6D65 | 040A | 0012 |
| 0001724460 | 00C5 | 7304 | 7A69 | 0C65 | F804 | 85FF | 0600 | 7562 |
| 0001724500 | 6B63 | 7465 | 0411 | FFFA | 0085 | 660B | 756F | 646E |
| 0001724520 | 655F | 746E | 7972 | 040B | FFFC | 0085 | 6605 | 756F |

THU MAR 14 17:31:54 1991 DB_PI.DLL PAGE 430, LINE 25312

| | | | | | | | | |
|---|---|---|---|---|---|---|---|---|
| 0001724540 | 646E | 0201 | 0D05 | 0000 | 001A | 6409 | 5F62 | 6E69 |
| 0001724560 | 7469 | 632E | 0001 | 0063 | 0075 | 0000 | 0076 | 0016 |
| 0001724600 | 0080 | 00A8 | 0082 | 00B2 | 0083 | 00C2 | 008C | 0149 |
| 0001724620 | 008D | 016C | 008E | 018F | 0096 | 0199 | 0097 | 01A6 |
| 0001724640 | 009A | 01B6 | 009B | 01BE | 009E | 0245 | 00A3 | 024E |
| 0001724660 | 00A4 | 0263 | 00A7 | 0271 | 00A9 | 0280 | 00AB | 02FD |
| 0001724700 | 00C6 | 030B | 00C7 | 0321 | 00CD | 03B4 | 00CE | 03BC |
| 0001724720 | 00D1 | 0443 | 00D4 | 044B | 00D7 | 0453 | 00D8 | 045B |
| 0001724740 | 00DC | 04E2 | 00DD | 04EA | 00E1 | 0571 | 00E8 | 0576 |
| 0001724760 | 00E9 | 057E | 00EC | 0605 | 00EE | 0612 | 00F0 | 068F |
| 0001725000 | 0108 | 069D | 0109 | 06AD | 010A | 06B2 | 010B | 06B7 |
| 0001725020 | 010C | 06C2 | 0126 | 06CF | 0127 | 06E5 | 0128 | 0778 |
| 0001725040 | 012A | 0810 | 0145 | 081E | 0146 | 0834 | 0147 | 08C7 |
| 0001725060 | 0149 | 0967 | 0163 | 0975 | 0164 | 098B | 0165 | 0A1E |
| 0001725100 | 0166 | 0A2C | 0168 | 0A8F | 017E | 0A9D | 0182 | 0AB3 |
| 0001725120 | 0183 | 0AC3 | 0185 | 0AD2 | 0187 | 0AE7 | 0189 | 0AED |
| 0001725140 | 0197 | 0AFB | 0198 | 0B0B | 019A | 0B1D | 019C | 0B23 |
| 0001725160 | 019D | 0B35 | 01A0 | 0B38 | 01A1 | 0B4A | 01A4 | 0B4D |
| 0001725200 | 01A6 | 0B53 | 01A8 | 0B66 | 01AA | 0B6C | 01B7 | 0B77 |
| 0001725220 | 01BE | 0B87 | 01BF | 0B9B | 01C0 | 0BA4 | 01C2 | 0BA7 |
| 0001725240 | 01C3 | 0BB0 | 01C4 | 0BBD | 01C5 | 0BC6 | 01C8 | 0BCD |
| 0001725260 | 01C9 | 0BE5 | 01CB | 0BF3 | 01CD | 0C0F | 01CF | 0C1D |
| 0001725300 | 01DB | 0C28 | 01E0 | 0C38 | 01E2 | 0C48 | 01E3 | 0C60 |
| 0001725320 | 01E4 | 0C69 | 01E6 | 0C6C | 01E8 | 0C7A | 0205 | 0C85 |
| 0001725340 | 020A | 0C9B | 020B | 0CAF | 020D | 0CBE | 020E | 0CD6 |
| 0001725360 | 020F | 0CE1 | 0211 | 0CE7 | 0213 | 0D05 | 0215 | 0D13 |
| 0001725400 | 0217 | 0D19 | 6409 | 5F62 | 7274 | 6565 | 632E | 0001 |
| 0001725420 | 007E | 0D6C | 0D28 | 006D | 0D3E | 0075 | 0DDD | 0076 |
| 0001725440 | 0DF5 | 0079 | 0E8A | 007A | 0EA4 | 007B | 0EAF | 007C |
| 0001725460 | 0EB9 | 007D | 0F41 | 007E | 0F44 | 0083 | 0FCF | 0084 |
| 0001725500 | 0FE9 | 0089 | 107F | 008B | 108A | 008C | 10A4 | 008D |
| 0001725520 | 10AE | 008E | 10BE | 0091 | 114A | 0092 | 115C | 0093 |
| 0001725540 | 116E | 0095 | 1180 | 0097 | 1183 | 0098 | 11A3 | 0099 |
| 0001725560 | 11AD | 009A | 11BD | 009F | 1249 | 00A0 | 1263 | 00A1 |
| 0001725600 | 126D | 00A2 | 127D | 00A5 | 1309 | 00A7 | 1392 | 00C5 |
| 0001725620 | 13A0 | 00C6 | 13B6 | 00CD | 1456 | 00CE | 146E | 00D4 |
| 0001725640 | 1504 | 00D5 | 1518 | 00D9 | 15AE | 00DA | 15C8 | 00DE |
| 0001725660 | 165E | 00DF | 1670 | 00E1 | 1706 | 00E3 | 178F | 0106 |
| 0001725700 | 179D | 0107 | 17B3 | 010E | 1846 | 010F | 185C | 0111 |
| 0001725720 | 18E3 | 0112 | 18F9 | 0114 | 1980 | 0116 | 19FD | 013D |
| 0001725740 | 1A0B | 013E | 1A21 | 0144 | 1AB4 | 0145 | 1ACA | 0147 |
| 0001725760 | 1B51 | 0148 | 1B62 | 014A | 1BE9 | 014C | 1C66 | 016B |
| 0001726000 | 1C74 | 016C | 1C8A | 0173 | 1D1D | 0174 | 1D3E | 0177 |
| 0001726020 | 1DC5 | 017A | 1DE7 | 017B | 1E03 | 0180 | 1E8A | 0181 |
| 0001726040 | 1E9F | 0185 | 1F26 | 0186 | 1F31 | 0189 | 1F44 | 018A |
| 0001726060 | 1F4C | 018C | 1FD3 | 018E | 2050 | 0199 | 205E | 019E |
| 0001726100 | 206E | 019F | 2082 | 01A1 | 2094 | 01A2 | 20AC | 01A3 |
| 0001726120 | 20B2 | 01A4 | 20C4 | 01A6 | 20DE | 01A7 | 20F0 | 01A8 |
| 0001726140 | 2108 | 01AA | 210E | 01AB | 2120 | 01AC | 2138 | 01AE |
| 0001726160 | 213E | 01B0 | 2144 | 01CF | 214F | 01D0 | 2165 | 01D1 |
| 0001726200 | 216A | 01D2 | 2172 | 01D3 | 2177 | 01D8 | 217C | 01DA |
| 0001726220 | 220F | 01DB | 221F | 01DC | 2228 | 01DE | 22A6 | 01E0 |
| 0001726240 | 22AE | 01E1 | 22B6 | 01E5 | 22C2 | 01E9 | 22D6 | 01EA |
| 0001726260 | 2305 | 01ED | 2308 | 01EE | 2311 | 01EF | 2316 | 01F1 |
| 0001726300 | 231B | 01F4 | 2324 | 01F7 | 2336 | 01F8 | 235C | 01FC |
| 0001726320 | 235F | 0200 | 236D | 0201 | 2393 | 0202 | 239E | 0203 |
| 0001726340 | 23A6 | 0205 | 2423 | 0208 | 2427 | 0209 | 244A | 020B |
| 0001726360 | 2450 | 020F | 2453 | 0210 | 2479 | 0211 | 2488 | 0212 |
| 0001726400 | 2490 | 0215 | 250D | 0217 | 258A | 640A | 5F62 | 7266 |

THU MAR 14 17:31:54 1991 DB_PI.DLL PAGE 431, LINE 25371

| | | | | | | | | |
|---|---|---|---|---|---|---|---|---|
| 0001726420 | 6D61 | 2E65 | 0163 | 9A00 | 7600 | 9800 | 7725 | AE00 |
| 0001726440 | 7F25 | 4B00 | 8026 | DC00 | 8326 | E800 | 8426 | 0C00 |
| 0001726460 | 8727 | A000 | 8827 | AB00 | 8927 | CB00 | 8A27 | 5F00 |
| 0001726500 | 8E28 | 6900 | 8F28 | A000 | 9128 | 3400 | 9329 | BB00 |
| 0001726520 | C629 | C900 | C729 | DF00 | D029 | 7D00 | D12A | 0F00 |
| 0001726540 | D52B | 1B00 | D62B | 3D00 | DA2B | D100 | DB2B | DC00 |
| 0001726560 | DC2B | FC00 | DD2B | 9000 | E22C | 9A00 | E32C | C500 |
| 0001726600 | E52C | 5900 | E72D | E000 | 1C2D | EE01 | 1D2D | 0401 |
| 0001726620 | 252E | 9701 | 262E | 1F01 | 292F | 2B01 | 2A2F | 4C01 |
| 0001726640 | 2D2F | D301 | 2E2F | F901 | 302F | 8001 | 3230 | FD01 |
| 0001726660 | 5F30 | 0B01 | 6031 | 2101 | 6831 | B401 | 6931 | 3C01 |
| 0001726700 | 6C32 | 4801 | 6D32 | 6901 | 7032 | F001 | 7132 | 1301 |
| 0001726720 | 7333 | 9A01 | 7533 | 1701 | 8E34 | 2501 | 8F34 | 3B01 |
| 0001726740 | 9234 | CE01 | 9334 | E101 | 9434 | EF01 | 9634 | 5201 |
| 0001726760 | B135 | 6001 | B235 | 7601 | B935 | 0901 | BA36 | 1F01 |
| 0001727000 | BB36 | 9C01 | BE36 | A801 | BF36 | C701 | C236 | 4E01 |
| 0001727020 | C337 | 5A01 | C737 | D701 | C837 | F401 | CA37 | 7B01 |
| 0001727040 | CC38 | F801 | EA38 | 0601 | EB39 | 1C01 | F339 | AF01 |
| 0001727060 | F439 | 3701 | F73A | 4301 | F83A | 6201 | FB3A | E901 |
| 0001727100 | FC3A | 0301 | FF3B | 8A01 | 003B | B002 | 023B | 3702 |
| 0001727120 | 043C | B402 | 2B3C | C202 | 2C3C | D802 | 343C | 6B02 |
| 0001727140 | 353D | F302 | 383D | FF02 | 393D | 2002 | 3C3E | A702 |
| 0001727160 | 3D3E | C102 | 413E | 4802 | 423F | 7002 | 443F | F702 |
| 0001727200 | 463F | 7402 | 6B40 | 8202 | 6C40 | 9802 | 7440 | 2B02 |
| 0001727220 | 7541 | 4102 | 7741 | BE02 | 7841 | C602 | 7B41 | D202 |
| 0001727240 | 7C41 | F302 | 8041 | 7A02 | 8142 | A302 | 8342 | 2A02 |
| 0001727260 | 8543 | A702 | AB43 | B502 | AC43 | CBC2 | B443 | 5E02 |
| 0001727300 | B544 | 7402 | B744 | F102 | B844 | FD02 | BB44 | 0402 |
| 0001727320 | BC45 | 2502 | C045 | AC02 | C145 | D502 | C345 | 5C02 |
| 0001727340 | C546 | D902 | 0346 | E703 | 0446 | FD03 | 0F46 | 9003 |
| 0001727360 | 1047 | C703 | 1247 | 4403 | 1948 | 5003 | 1A48 | 7103 |
| 0001727400 | 1E48 | F803 | 1F48 | 1903 | 2549 | A003 | 2649 | DA03 |
| 0001727420 | 2949 | 6103 | 2C4A | DE03 | 6A4A | EC03 | 6B4A | 0203 |
| 0001727440 | 774B | 9503 | 784B | CC03 | 7A4B | 4903 | 814C | 5503 |
| 0001727460 | 824C | 7603 | 864C | FD03 | 874C | 1E03 | 8A4D | A503 |
| 0001727500 | 8F4D | B503 | 904D | EF03 | 934D | 7603 | 964E | F303 |
| 0001727520 | BA4E | 0103 | BB4F | 1703 | BE4F | 1C03 | C04F | AF03 |
| 0001727540 | C14F | C803 | C24F | D103 | C34F | E403 | C44F | F003 |
| 0001727560 | C74F | 6E03 | C850 | 8D03 | CA50 | A003 | CC50 | 1E03 |
| 0001727600 | 0A51 | 6264 | 615F | 6363 | 7365 | 632E | 0001 | 00C4 |
| 0001727620 | 0088 | 512C | 0089 | 5142 | 0094 | 51D5 | 0095 | 51E0 |
| 0001727640 | 0098 | 525D | 0099 | 526C | 009A | 5277 | 009B | 52F4 |
| 0001727660 | 009C | 5308 | 00A0 | 538F | 00A1 | 53B2 | 00A4 | 5439 |
| 0001727700 | 00A6 | 544A | 00AB | 5470 | 00AC | 548C | 00AE | 5495 |
| 0001727720 | 00B2 | 54A4 | 00B3 | 54D4 | 00B6 | 555B | 00BB | 5565 |
| 0001727740 | 00BC | 5576 | 00C2 | 55FD | 00C4 | 5604 | 00CC | 5681 |
| 0001727760 | 00CD | 569B | 00D3 | 5722 | 00D4 | 576A | 00D5 | 5773 |
| 0001730000 | 00D6 | 5785 | 00DB | 5803 | 00DC | 580D | 00DD | 5817 |
| 0001730020 | 00DF | 5820 | 00E1 | 582B | 00E5 | 5846 | 00E6 | 585D |
| 0001730040 | 00EB | 5874 | 00ED | 588B | 00EF | 58A2 | 00F1 | 58B9 |
| 0001730060 | 00F4 | 58CD | 00F5 | 58F0 | 00F6 | 590C | 00F9 | 5928 |
| 0001730100 | 00FD | 5937 | 0100 | 5946 | 0102 | 5949 | 0103 | 5960 |
| 0001730120 | 0104 | 5977 | 0105 | 598E | 0106 | 5998 | 0107 | 59A2 |
| 0001730140 | 0109 | 59AC | 010C | 59B6 | 010F | 59C0 | 0113 | 59CA |
| 0001730160 | 0114 | 59E1 | 0116 | 59EB | 011A | 59F5 | 011B | 5A0C |
| 0001730200 | 011D | 5A16 | 0126 | 5A20 | 0127 | 5A30 | 0129 | 5AB7 |
| 0001730220 | 012A | 5AC4 | 012B | 5ADB | 012C | 5AEE | 0130 | 5B6C |
| 0001730240 | 0132 | 5BE9 | 0156 | 5BF7 | 0157 | 5CCD | 0160 | 5CA0 |
| 0001730260 | 0161 | 5CB8 | 0164 | 5D3F | 0165 | 5D4C | 0168 | 5D53 |

THU MAR 14 17:31:54 1991 DB_PI.DLL PAGE 432, LINE 25430

| | | | | | | | | |
|---|---|---|---|---|---|---|---|---|
| 0001730300 | 0169 | 5D69 | 016D | 5DE6 | 016E | 5DF7 | 0171 | 5E7E |
| 0001730320 | 0172 | 5E9D | 0176 | 5F24 | 0177 | 5F4D | 017A | 5FD4 |
| 0001730340 | 017B | 5FE5 | 017D | 606C | 017F | 60E9 | 0194 | 60F7 |
| 0001730360 | 0197 | 6107 | 019A | 610C | 019B | 611C | 019D | 612B |
| 0001730400 | 019E | 6146 | 01A0 | 615E | 01A1 | 617B | 01A2 | 6184 |
| 0001730420 | 01A5 | 618A | 01A7 | 6193 | 01C2 | 619E | 01C3 | 61B4 |
| 0001730440 | 01C6 | 6247 | 01C7 | 62C4 | 01E8 | 62D2 | 01E9 | 62E8 |
| 0001730460 | 01F1 | 637B | 01F2 | 6394 | 01F5 | 641B | 01F8 | 6421 |
| 0001730500 | 01F9 | 6435 | 01FC | 6438 | 01FD | 644C | 0201 | 644F |
| 0001730520 | 0204 | 6452 | 0205 | 647A | 0206 | 6491 | 0207 | 6494 |
| 0001730540 | 0208 | 64BE | 0209 | 64D5 | 020A | 64D8 | 020B | 6555 |
| 0001730560 | 020D | 6558 | 020F | 6574 | 0211 | 65F2 | 022D | 6600 |
| 0001730600 | 022E | 6616 | 0236 | 66A9 | 0237 | 66C1 | 0239 | 6748 |
| 0001730620 | 023C | 674E | 023D | 675F | 0240 | 6762 | 0241 | 6773 |
| 0001730640 | 0245 | 6776 | 0248 | 6779 | 0249 | 67A1 | 024A | 67B5 |
| 0001730660 | 024B | 67B8 | 024C | 67E2 | 024D | 67F6 | 024E | 67F9 |
| 0001730700 | 024F | 6876 | 0251 | 6879 | 0253 | 6895 | 0255 | 6913 |
| 0001730720 | 0263 | 6921 | 0264 | 6931 | 0267 | 6936 | 0268 | 6947 |
| 0001730740 | 026C | 6956 | 026D | 6967 | 0271 | 6976 | 0272 | 6987 |
| 0001730760 | 0276 | 6996 | 0277 | 69A7 | 027D | 69B6 | 027F | 69BC |
| 0001731000 | 02A1 | 69C7 | 02A2 | 69DD | 02A7 | 6A70 | 02AB | 6A75 |
| 0001731020 | 02AC | 6A8D | 02AF | 6B14 | 02B2 | 6B1A | 02B3 | 6B2B |
| 0001731040 | 02B6 | 6B2E | 02B7 | 6B3F | 02BA | 6B42 | 02BB | 6B53 |
| 0001731060 | 02BE | 6B56 | 02BF | 6B67 | 02C3 | 6B6A | 02C6 | 6B6D |
| 0001731100 | 02C7 | 6B7E | 02C8 | 6B8D | 02C9 | 6B9E | 02CA | 6BAD |
| 0001731120 | 02CB | 6BBE | 02CC | 6BCD | 02CD | 6BDE | 02CE | 6BED |
| 0001731140 | 02CF | 6BF3 | 02D2 | 6BF6 | 02D3 | 6C1E | 02D4 | 6C32 |
| 0001731160 | 02D5 | 6C35 | 02D6 | 6C5F | 02D7 | 6C73 | 02D8 | 6C76 |
| 0001731200 | 02D9 | 6CF3 | 02DB | 6CF6 | 02DD | 6D32 | 02DF | 6DB0 |
| 0001731220 | 02F6 | 6DBE | 02F7 | 6DD4 | 02FA | 6E67 | 02FB | 6EFB |
| 0001731240 | 640A | 5F62 | 6373 | 7072 | 2E74 | 0163 | 2A00 | A901 |
| 0001731260 | DA00 | AA6F | 2000 | B46F | B300 | B76F | C000 | B86F |
| 0001731300 | DF00 | BC6F | 6600 | C170 | 8700 | C270 | A000 | C870 |
| 0001731320 | 2700 | CB71 | 6700 | D071 | B700 | D571 | D300 | D671 |
| 0001731340 | EF00 | D771 | FA00 | D871 | 7700 | D972 | 8D00 | DC72 |
| 0001731360 | 0A00 | DE73 | 8700 | F673 | 9500 | F773 | AB00 | FD73 |
| 0001731400 | 3E00 | FF74 | BB00 | 0F74 | C901 | 1474 | D901 | 1574 |
| 0001731420 | F101 | 1674 | 0D01 | 1875 | 1301 | 1975 | 3101 | 1C75 |
| 0001731440 | 3701 | 1D75 | 4D01 | 1E75 | 5801 | 1F75 | 5E01 | 2275 |
| 0001731460 | 6501 | 2375 | 7A01 | 2575 | 8801 | 2875 | 9901 | 2975 |
| 0001731500 | C201 | 2B75 | C801 | 2D75 | D201 | 2F75 | F001 | 3175 |
| 0001731520 | F601 | 4175 | C101 | 4776 | 1101 | 4B76 | 1D01 | 4E76 |
| 0001731540 | 3401 | 4F76 | 5201 | 5276 | 5801 | 5376 | 6E01 | 5476 |
| 0001731560 | 7901 | 5576 | 7F01 | 5676 | 8701 | 5976 | 9801 | 5A76 |
| 0001731600 | AE01 | 5B76 | D101 | 5E76 | E101 | 5F76 | F601 | 6276 |
| 0001731620 | 1901 | 6377 | 3101 | 6477 | 3A01 | 6577 | 4601 | 6677 |
| 0001731640 | 4901 | 6777 | 6001 | 6977 | 7501 | 6C77 | 9101 | 6E77 |
| 0001731660 | 9701 | 8077 | A201 | 8777 | B201 | 8877 | BC01 | 8A77 |
| 0001731700 | CB01 | 9077 | F201 | 9177 | 0401 | 9278 | 0701 | 9378 |
| 0001731720 | 1901 | 9478 | 1D01 | 9678 | 2F01 | 9778 | 4D01 | 9E78 |
| 0001731740 | 6B01 | A178 | 7B01 | A378 | A701 | A578 | C901 | A778 |
| 0001731760 | 1101 | A979 | 1401 | AA79 | 1D01 | AB79 | 2301 | AC79 |
| 0001732000 | 2601 | AE79 | 2C01 | BE79 | 3701 | C179 | 4701 | C379 |
| 0001732020 | 5901 | C479 | 7401 | C779 | 8901 | C979 | F201 | CA79 |
| 0001732040 | 0701 | CC7A | 0D01 | DC7A | 1801 | E27A | 2801 | E77A |
| 0001732060 | 3A01 | EA7A | 6701 | EB7A | 7901 | EC7A | 9D01 | ED7A |
| 0001732100 | AF01 | EE7A | 2101 | EF7B | 3101 | F07B | 4301 | F17B |
| 0001732120 | 6C01 | F47B | 7C01 | F57B | 9901 | F67B | AB01 | F77B |
| 0001732140 | D401 | F87B | E601 | F97B | 0F01 | FB7C | 1F01 | FC7C |

THU MAR 14 17:31:54 1991 DB_PI.DLL PAGE 433, LINE 25489

| | | | | | | | | |
|---|---|---|---|---|---|---|---|---|
| 0001732160 | 3101 | FD7C | 6801 | FE7C | 7801 | FF7C | 8A01 | 007C |
| 0001732200 | C102 | 017C | D102 | 037C | E102 | 047C | F302 | 057C |
| 0001732220 | 3A02 | 067D | 4C02 | 077D | 8302 | 087D | 9302 | 0C7D |
| 0001732240 | A302 | 0E7D | BA02 | 107D | C002 | 2A7D | CB02 | 2B7D |
| 0001732260 | E102 | 347D | 7F02 | 3B7E | 8902 | 3C7E | A202 | 3F7E |
| 0001732300 | 3602 | 407F | 4F02 | 427F | E302 | 457F | 2702 | 4680 |
| 0001732320 | 3E02 | 4780 | 4D02 | 4B80 | D402 | 4C80 | E502 | 4D80 |
| 0001732340 | 0202 | 5081 | 0502 | 5181 | 2C02 | 5481 | 3D02 | 5581 |
| 0001732360 | 4C02 | 5681 | 5A02 | 5781 | 7E02 | 5881 | 9802 | 5981 |
| 0001732400 | A302 | 5A81 | AF02 | 5B81 | C102 | 5C81 | D302 | 5D81 |
| 0001732420 | E502 | 5E81 | F702 | 5F81 | 0402 | 6282 | 1602 | 6382 |
| 0001732440 | 2E02 | 6A82 | B502 | 6D82 | F102 | 6E82 | 0202 | 6F83 |
| 0001732460 | 0C02 | 7183 | 2702 | 7383 | B102 | 8583 | BF02 | 8983 |
| 0001732500 | CF02 | 8A83 | E902 | 8B83 | F902 | 8C83 | 0502 | 8D84 |
| 0001732520 | 1B02 | 8F84 | 2302 | 9284 | 2902 | 9384 | 4302 | 9484 |
| 0001732540 | 5502 | 9584 | 6502 | 9684 | 7F02 | 9784 | 8802 | 9984 |
| 0001732560 | 8E02 | 9A84 | A802 | 9B84 | B102 | 9D84 | B702 | A084 |
| 0001732600 | BD02 | A184 | D702 | A284 | E702 | A384 | F902 | A484 |
| 0001732620 | 1402 | A585 | 1C02 | A885 | 2202 | A985 | 3C02 | AA85 |
| 0001732640 | 4E02 | AB85 | 6B02 | AC85 | 7102 | AD85 | 8202 | B085 |
| 0001732660 | 8802 | B185 | A202 | B285 | B202 | B385 | CD02 | B485 |
| 0001732700 | D602 | B785 | DC02 | B885 | F602 | B985 | 0602 | BA86 |
| 0001732720 | 2102 | BB86 | 2A02 | BE86 | 3002 | BF86 | 4A02 | C086 |
| 0001732740 | 5A02 | C286 | 6C02 | C386 | 9302 | C486 | A502 | C586 |
| 0001732760 | AB02 | C686 | C602 | C986 | CC02 | CA86 | E602 | CB86 |
| 0001733000 | F602 | CC86 | 0802 | CD87 | 2F02 | CE87 | 4102 | CF87 |
| 0001733020 | 4702 | D087 | 6202 | D387 | 6802 | D487 | 8202 | D587 |
| 0001733040 | 9202 | D687 | A402 | D787 | CB02 | D887 | DD02 | D987 |
| 0001733060 | E302 | DA87 | FE02 | DD87 | 0402 | DE88 | 1E02 | DF88 |
| 0001733100 | 2E02 | E088 | 4002 | E188 | 6702 | E288 | 7902 | E388 |
| 0001733120 | 7F02 | E488 | 9A02 | E788 | A002 | E888 | BA02 | E988 |
| 0001733140 | CA02 | EA88 | DC02 | ED88 | F302 | EE88 | F902 | FD88 |
| 0001733160 | 0402 | FE89 | 1402 | FF89 | 2002 | 0089 | 2803 | 0189 |
| 0001733200 | 2E03 | 1989 | 3903 | 1A89 | 4F03 | 1C89 | E203 | 1D89 |
| 0001733220 | ED03 | 1E89 | 0203 | 1F8A | 1703 | 208A | 2C03 | 218A |
| 0001733240 | 4103 | 228A | 5603 | 258A | 6403 | 278A | C703 | 3D8A |
| 0001733260 | D503 | 3E8A | EB03 | 428A | 7E03 | 4A8B | 8603 | 4B8B |
| 0001733300 | 9E03 | 4E8B | 2503 | 538C | 6903 | 548C | 8103 | 558C |
| 0001733320 | 8C03 | 578C | 0903 | 5A8D | 2003 | 5B8D | 3603 | 5D8D |
| 0001733340 | B303 | 5F8D | 3103 | 8B8E | 3F03 | 8C8E | 5503 | 8F8E |
| 0001733360 | E803 | 918E | 6E03 | 938F | 8203 | B08F | 9003 | B18F |
| 0001733400 | A603 | B48F | 3903 | B590 | 3E03 | B790 | 4603 | BC90 |
| 0001733420 | 4B03 | BD90 | 6003 | C090 | E703 | C190 | FB03 | C390 |
| 0001733440 | 8103 | C791 | 9503 | C891 | AB03 | C991 | B403 | CB91 |
| 0001733460 | 3A03 | CF92 | 4E03 | D292 | 6403 | D392 | 8D03 | D692 |
| 0001733500 | 1403 | D793 | 4003 | D893 | 4903 | DA93 | 4C03 | DC93 |
| 0001733520 | 4F03 | DE93 | CD03 | 0893 | 6264 | 675F | 6E65 | 632E |
| 0001733540 | 0001 | 005E | 0065 | 93DC | 0066 | 93F2 | 0070 | 9484 |
| 0001733560 | 0071 | 94AA | 0073 | 9526 | 0074 | 9550 | 0077 | 95CC |
| 0001733600 | 0078 | 9615 | 007F | 9691 | 0080 | 96A9 | 0084 | 9730 |
| 0001733620 | 0085 | 9779 | 0089 | 9800 | 008A | 980F | 008D | 9835 |
| 0001733640 | 0091 | 9879 | 0096 | 9890 | 0098 | 98C0 | 009A | 993E |
| 0001733660 | 00BB | 994C | 00BC | 9962 | 00C3 | 99F5 | 00C4 | 9A00 |
| 0001733700 | 00C6 | 9A7D | 00C7 | 9AA7 | 00CA | 9B24 | 00CB | 9B3C |
| 0001733720 | 00CE | 9BC3 | 00CF | 9C0C | 00D3 | 9C93 | 00D6 | 9CC3 |
| 0001733740 | 00D8 | 9CC9 | 00F3 | 9CD7 | 00F4 | 9CED | 00FD | 9D80 |
| 0001733760 | 00FE | 9D98 | 0100 | 9E1F | 0102 | 9E27 | 0103 | 9E51 |
| 0001734000 | 0106 | 9ECE | 0107 | 9F17 | 0109 | 9F9E | 010B | 9FBE |
| 0001734020 | 010D | A03C | 012D | A04A | 012E | A060 | 0139 | A0F3 |

THU MAR 14 17:31:54 1991 DB_PI.DLL PAGE 434, LINE 25548

| | | | | | | | | |
|---|---|---|---|---|---|---|---|---|
| 0001734040 | 013A | A119 | 013E | A196 | 013F | A1AE | 0142 | A235 |
| 0001734060 | 0144 | A241 | 0145 | A26B | 0148 | A2E8 | 0149 | A331 |
| 0001734100 | 014E | A3B8 | 0150 | A3E8 | 0152 | A466 | 0172 | A474 |
| 0001734120 | 0173 | A48A | 017D | A51D | 0180 | A529 | 0181 | A541 |
| 0001734140 | 0183 | A5C8 | 0185 | A5D0 | 0186 | A5FA | 0189 | A677 |
| 0001734160 | 018A | A6C0 | 018B | A751 | 018E | A767 | 0192 | A76C |
| 0001734200 | 0194 | A796 | 0195 | A7A9 | 0197 | A827 | 0198 | A83C |
| 0001734220 | 019A | A8C8 | 019D | A8CE | 019F | A8FD | 01A0 | A906 |
| 0001734240 | 01A1 | A924 | 01A4 | A9A2 | 01A6 | AA1F | 01C6 | AA2D |
| 0001734260 | 01C7 | AA43 | 01CE | AAD6 | 01CF | AADE | 01D1 | AAEA |
| 0001734300 | 01D4 | AB91 | 01D5 | ABA9 | 01D7 | AC30 | 01D8 | AC79 |
| 0001734320 | 01DB | AD00 | 01DD | AD20 | 01DF | AD9E | 6408 | 5F62 |
| 0001734340 | 6D69 | 2E67 | 0163 | 5E00 | 5E01 | AC00 | 5FAD | C200 |
| 0001734360 | 66AD | 5400 | 69AE | 6000 | 6AAE | 8000 | 6DAE | FC00 |
| 0001734400 | 6EAE | 1400 | 71AF | 9A00 | 75AF | B200 | 78AF | C900 |
| 0001734420 | 79AF | E000 | 7BAF | 6B00 | 7DB0 | 7400 | 7EB0 | 8F00 |
| 0001734440 | 7FB0 | 9200 | 81B0 | A200 | 84B0 | AD00 | 85B0 | CB00 |
| 0001734460 | 86B0 | CE00 | 89B0 | DE00 | 8DB0 | E100 | 8EB0 | FC00 |
| 0001734500 | 90B0 | 8800 | 92B1 | 9100 | 93B1 | AC00 | 94B1 | AF00 |
| 0001734520 | 9DB1 | BF00 | 9EB1 | D500 | 9FB1 | E700 | A0B1 | EA00 |
| 0001734540 | A4B1 | F600 | A5B1 | 1400 | A6B2 | 2700 | A7B2 | 4500 |
| 0001734560 | ACB2 | C200 | ADB2 | CE00 | AEB2 | DB00 | B0B2 | EF00 |
| 0001734600 | B1B2 | 0900 | B3B3 | 8600 | D7B3 | 9400 | D8B3 | AA00 |
| 0001734620 | E1B3 | 3D00 | E4B4 | 4900 | E5B4 | D100 | E8B4 | 6200 |
| 0001734640 | E9B5 | 7A00 | EDB5 | 0100 | EEB6 | 2200 | F1B6 | 3A00 |
| 0001734660 | F3B6 | 5100 | F4B6 | 6800 | F8B6 | F400 | FCB6 | 0F00 |
| 0001734700 | FEB7 | 1A00 | FFB7 | 3900 | 03B7 | 4901 | 06B7 | 9101 |
| 0001734720 | 07B7 | 9401 | 0AB7 | A401 | 0DB7 | B801 | 11B7 | BB01 |
| 0001734740 | 13B7 | D601 | 17B7 | 6201 | 20B8 | 7D01 | 21B8 | 9301 |
| 0001734760 | 22B8 | A501 | 23B8 | A801 | 27B8 | B401 | 28B8 | D201 |
| 0001735000 | 29B8 | E501 | 2AB8 | 0301 | 2EB9 | 8001 | 31B9 | 9401 |
| 0001735020 | 34B9 | A401 | 3AB9 | EA01 | 3CB9 | F301 | 3EB9 | 0E01 |
| 0001735040 | 42BA | 1E01 | 44BA | 5101 | 45BA | 5401 | 48BA | 6401 |
| 0001735060 | 4CBA | 7101 | 4EBA | 7F01 | 4FBA | 9901 | 51BA | 1601 |
| 0001735100 | 6FBB | 2401 | 70BB | 3A01 | 77BB | CD01 | 7ABB | 5501 |
| 0001735120 | 7BBC | 6D01 | 7EBC | F401 | 80BC | 0201 | 82BD | 7F01 |
| 0001735140 | C0BD | 8D01 | C1BD | A301 | C3BD | 3C01 | CABE | 4201 |
| 0001735160 | CDBE | 4E01 | CEBE | DF01 | CFBE | 1201 | D3BF | 9801 |
| 0001735200 | D4BF | B001 | D6BF | 4001 | D7C0 | 6101 | DAC0 | F101 |
| 0001735220 | DCC0 | 0801 | DFC1 | 1F01 | E3C1 | 2E01 | E5C1 | 5D01 |
| 0001735240 | E6C1 | 6601 | E7C1 | 7001 | E8C1 | 7601 | E9C1 | 7901 |
| 0001735260 | EAC1 | 0001 | ECC2 | 0301 | EDC2 | 0C01 | EEC2 | 9201 |
| 0001735300 | EFC2 | 9501 | F2C2 | 9C01 | F7C2 | 9F01 | F9C2 | D401 |
| 0001735320 | FAC2 | DD01 | FBC2 | E701 | FCC2 | ED01 | FDC2 | F001 |
| 0001735340 | FEC2 | 7701 | 01C3 | 7A02 | 02C3 | 8C02 | 03C3 | 1202 |
| 0001735360 | 04C4 | 1502 | 0EC4 | 1C02 | 0FC4 | 6E02 | 10C4 | 7702 |
| 0001735400 | 11C4 | 8302 | 14C4 | 0A02 | 15C5 | 1F02 | 17C5 | A602 |
| 0001735420 | 40C5 | B402 | 41C5 | CA02 | 49C5 | 6202 | 4CC6 | 6702 |
| 0001735440 | 51C6 | 7302 | 52C6 | 7802 | 53C6 | 8302 | 54C6 | 9A02 |
| 0001735460 | 57C6 | 2902 | 58C7 | 4202 | 5DC7 | D102 | 5EC7 | F902 |
| 0001735500 | 66C7 | 8802 | 67C8 | A502 | 6BC8 | 3402 | 6EC9 | 3E02 |
| 0001735520 | 74C9 | 8302 | 77C9 | 9E02 | 79C9 | A702 | 7AC9 | BB02 |
| 0001735540 | 7DC9 | CF02 | 80C9 | EA02 | 81C9 | FE02 | 85C9 | 1202 |
| 0001735560 | 89CA | 1502 | 8CCA | 4602 | 8DCA | 4F02 | 8ECA | 6402 |
| 0001735600 | 91CA | 7002 | 93CA | F6D2 | C4CA | 0402 | C5CB | 1A02 |
| 0001735620 | CDCB | AD02 | CECB | 3502 | CFCC | 6502 | D1CC | E202 |
| 0001735640 | D2CC | 0302 | D4CD | 8A02 | D6CD | 9302 | D7CD | AB02 |
| 0001735660 | DCCD | 3202 | DDCE | 6302 | DFCE | EA02 | E1CE | ED02 |
| 0001735700 | E2CE | 0502 | E5CF | 8C02 | E8CF | 9A02 | EACF | 1702 |

THU MAR 14 17:31:54 1991 DB_PI.DLL PAGE 435, LINE 25607

| | | | | | | | | |
|---|---|---|---|---|---|---|---|---|
| 0001735720 | 0DD0 | 2503 | 0ED0 | 3B03 | 13D0 | D303 | 16D0 | D803 |
| 0001735740 | 17D0 | F003 | 1CD0 | 7F03 | 1DD1 | 8403 | 1ED1 | 8F03 |
| 0001735760 | 1FD1 | A603 | 24D1 | 3503 | 25D2 | 5D03 | 28D2 | EC03 |
| 0001736000 | 2BD2 | 9403 | 53D3 | A203 | 54D3 | B803 | 5AD3 | 4B03 |
| 0001736020 | 5BD4 | 5303 | 5ED4 | 5F03 | 5FD4 | 8703 | 62D4 | 0403 |
| 0001736040 | 63D5 | 1C03 | 66D5 | A303 | 68D5 | C603 | 6AD5 | 4403 |
| 0001736060 | 98D6 | 5203 | 99D6 | 6803 | A7D6 | 0603 | A8D7 | 3103 |
| 0001736100 | ABD7 | B803 | ACD7 | D103 | AED7 | 6503 | AFD8 | 7003 |
| 0001736120 | B1D8 | 7603 | B2D8 | 8803 | B5D8 | 8803 | B6D8 | 9D03 |
| 0001736140 | B9D8 | A003 | BAD8 | B203 | BCD8 | B5C3 | BED8 | CF03 |
| 0001736160 | C0D8 | D503 | C1D8 | D803 | C2D8 | EA03 | C6D8 | 0503 |
| 0001736200 | CAD9 | 1F03 | CBD9 | 3203 | CCD9 | 4E03 | D0D9 | E203 |
| 0001736220 | D4D9 | E803 | D6D9 | 1A03 | D9DA | 4403 | DADA | 4A03 |
| 0001736240 | DBDA | 4D03 | DCDA | EC03 | DDDA | EF03 | DFDA | 0403 |
| 0001736260 | E0DB | 1E03 | E1DB | 3803 | E4DB | 4603 | E9DB | 4A03 |
| 0001736300 | EBDB | 6803 | EDDB | EF03 | 18DB | FD04 | 19DB | 1304 |
| 0001736320 | 1BDC | A604 | 20DC | AB04 | 22DC | 3304 | 23DD | 4B04 |
| 0001736340 | 24DD | C804 | 25DD | F004 | 28DD | 6D04 | 29DE | 8504 |
| 0001736360 | 2BDE | 0C04 | 2CDF | 1004 | 2DDF | 1B04 | 2EDF | 3104 |
| 0001736400 | 33DF | B804 | 34DF | DF04 | 35DF | E904 | 38DF | EE04 |
| 0001736420 | 39DF | 6C04 | 65E0 | 7A04 | 66E0 | 9004 | 6BE0 | 2304 |
| 0001736440 | 70E1 | 2804 | 71E1 | 3D04 | 72E1 | BA04 | 73E1 | EA04 |
| 0001736460 | 75E1 | 6704 | 76E2 | 7F04 | 7EE2 | 0604 | 7FE3 | 1904 |
| 0001736500 | 84E3 | A104 | 85E3 | D604 | 88E3 | 5D04 | 8CE4 | 6A04 |
| 0001736520 | 8DE4 | 9004 | 94E4 | 1804 | 95E5 | 5A04 | 96E5 | 6304 |
| 0001736540 | 97E5 | 7904 | 9AE5 | F704 | 9CE5 | FC04 | 9FE5 | FF04 |
| 0001736560 | A5E5 | 0404 | A6E6 | 2404 | A7E6 | 3A04 | ABE6 | B704 |
| 0001736600 | ACE6 | DD04 | AFE6 | E204 | B0E6 | 0804 | B8E7 | 0D04 |
| 0001736620 | B9E7 | 5904 | C3E7 | 5E04 | C5E7 | C004 | C6E7 | D604 |
| 0001736640 | D1E7 | 5304 | D2E8 | 6904 | D3E8 | 7704 | D4E8 | 8D04 |
| 0001736660 | D5E8 | A304 | D9E8 | B904 | DAE8 | D504 | DBE8 | DE04 |
| 0001736700 | DCE8 | F404 | DFE8 | 7204 | E0E9 | 8804 | E3E9 | 0504 |
| 0001736720 | 08EA | 1305 | 09EA | 2905 | 0BEA | C105 | 0EEA | C605 |
| 0001736740 | 0FEA | E905 | 15EA | 7805 | 16EB | 9F05 | 18EB | 2405 |
| 0001736760 | 19EC | 3005 | 1BEC | 3605 | 1DEC | 4A05 | 1EEC | D005 |
| 0001737000 | 3AEC | DE05 | 3BEC | F405 | 41EC | 8705 | 44ED | 9305 |
| 0001737020 | 45ED | 1B05 | 46EE | 2805 | 4AEE | A505 | 4BEE | CF05 |
| 0001737040 | 4EEE | 6105 | 52EF | 8105 | 53EF | 9905 | 56EF | 2005 |
| 0001737060 | 58F0 | 2D05 | 59F0 | 4E05 | 5BF0 | D505 | 60F0 | D805 |
| 0001737100 | 61F0 | FC05 | 65F0 | 8305 | 67F1 | 9A05 | 6CF1 | B105 |
| 0001737120 | 6DF1 | DA05 | 6EF1 | E305 | 70F1 | 6105 | 72F2 | DE05 |
| 0001737140 | 09F2 | 6264 | 695F | 6F63 | 2E6E | 0263 | 7000 | 6A00 |
| 0001737160 | 0000 | 6B00 | 1600 | 6F00 | A800 | 7000 | BA00 | 7500 |
| 0001737200 | 3600 | 7701 | 5100 | 7801 | 6800 | 7B01 | E400 | 7C01 |
| 0001737220 | FB00 | 7D01 | 0A00 | 8002 | 8600 | 8102 | 9900 | 8402 |
| 0001737240 | A600 | 8602 | 0D00 | 8803 | 8A00 | A103 | 9800 | A203 |
| 0001737260 | AE00 | A403 | 4100 | A504 | 4C00 | A704 | 5A00 | A904 |
| 0001737300 | D700 | D104 | E500 | D204 | FB00 | D804 | 8E00 | D905 |
| 0001737320 | 9900 | DB05 | 1600 | DC06 | 2900 | DF06 | A600 | E006 |
| 0001737340 | B800 | E406 | 3F00 | E507 | 6000 | E807 | E700 | EB07 |
| 0001737360 | FE00 | EC07 | 0A00 | EE08 | 2100 | F508 | 3800 | F608 |
| 0001737400 | 7100 | F808 | F800 | FA08 | 7500 | 1909 | 8301 | 1A09 |
| 0001737420 | 9901 | 2109 | 2C01 | 220A | 4301 | 240A | C001 | 250A |
| 0001737440 | D301 | 280A | 5001 | 290B | 6201 | 2C0B | E901 | 2F0B |
| 0001737460 | 0201 | 300C | 1801 | 320C | 9F01 | 340C | 1C01 | 450D |
| 0001737500 | 2A01 | 4C0D | 3A01 | 4D0D | 5101 | 4F0D | 5701 | 500D |
| 0001737520 | 6A01 | 540D | 7001 | 550D | 8301 | 560D | 8C01 | 570D |
| 0001737540 | 9601 | 580D | 9C01 | 590D | 9F01 | 5C0D | A501 | 5F0D |
| 0001737560 | BE01 | 600D | C301 | 610D | E801 | 620D | FB01 | 640D |

THU MAR 14 17:31:54 1991 DB_PI.DLL PAGE 436, LINE 25666

| | | | | | | | | |
|---|---|---|---|---|---|---|---|---|
| 0001737600 | 0101 | 660E | 0701 | 890E | 1201 | 8A0E | 2801 | 930E |
| 0001737620 | C101 | 940E | CC01 | 960E | 5201 | 9A0F | 5E01 | 9B0F |
| 0001737640 | 8201 | 9F0F | 1501 | A210 | 2401 | A310 | 3A01 | A810 |
| 0001737660 | CF01 | A910 | F901 | AA10 | 0301 | AB11 | 1501 | AF11 |
| 0001737700 | 9E01 | B111 | 0501 | B312 | 8B01 | D612 | 9901 | D712 |
| 0001737720 | AF01 | DD12 | 4201 | DE13 | 4D01 | E113 | CA01 | E213 |
| 0001737740 | EC01 | E413 | 7301 | E614 | F001 | 0914 | FE02 | 0A14 |
| 0001737760 | 1402 | 0E15 | A702 | 1015 | 2402 | 3116 | 3202 | 3216 |
| 0001740000 | 4802 | 3816 | DB02 | 3916 | E302 | 3C16 | EF02 | 3D16 |
| 0001740020 | 0102 | 3E17 | 0A02 | 3F17 | 1402 | 4017 | 9102 | 4117 |
| 0001740040 | 9402 | 4417 | 1202 | 4618 | 3202 | 4818 | B002 | 0918 |
| 0001740060 | 6264 | 6C5F | 6D69 | 2E67 | 0263 | DF00 | B401 | BE00 |
| 0001740100 | B518 | D400 | C018 | 6900 | C119 | 7F00 | C219 | 0100 |
| 0001740120 | C31A | 3400 | C51A | B600 | C91A | C200 | CA1A | DA00 |
| 0001740140 | CC1A | 6600 | CD1B | 8700 | D01B | 1300 | D21C | 2A00 |
| 0001740160 | D61C | 4100 | D71C | 5D00 | DA1C | E900 | DC1C | F200 |
| 0001740200 | DD1C | 0E00 | DE1D | 1900 | DF1D | 2400 | E01D | 2F00 |
| 0001740220 | E11D | 4000 | E41D | 4A00 | E81D | 7400 | E91D | 9B00 |
| 0001740240 | EC1D | 2700 | F21E | 7400 | F31E | 9800 | F41E | A100 |
| 0001740260 | F51E | 2400 | F71F | 3300 | FB1F | 3600 | FE1F | 5F00 |
| 0001740300 | FF1F | 8A00 | 001F | 9301 | 021F | 1601 | 0320 | 2E01 |
| 0001740320 | 0720 | 4601 | 0A20 | 6401 | 0B20 | 7C01 | 0E20 | 9401 |
| 0001740340 | 1320 | 9E01 | 1B20 | C901 | 1C20 | DF01 | 1E20 | E701 |
| 0001740360 | 1F20 | 0101 | 2021 | 1001 | 2321 | 9201 | 2521 | A901 |
| 0001740400 | 2721 | B701 | 2821 | D401 | 2921 | E601 | 2A21 | 0401 |
| 0001740420 | 2D22 | 8601 | 2E22 | 8901 | 3022 | 9801 | 3222 | 1A01 |
| 0001740440 | 5823 | 2801 | 5923 | 3E01 | 6123 | D101 | 6223 | EB01 |
| 0001740460 | 6523 | 6801 | 6624 | 8001 | 6924 | 0701 | 6A25 | 2001 |
| 0001740500 | 6C25 | A701 | 6E25 | 4D01 | 6F26 | 5A01 | 7126 | D701 |
| 0001740520 | 7326 | E901 | 7826 | F701 | 7A26 | 3701 | 7D27 | 3A01 |
| 0001740540 | 7E27 | 6A01 | 7F27 | 7301 | 8127 | F101 | 8427 | F401 |
| 0001740560 | 8527 | 1701 | 8728 | 9401 | 8B28 | DA01 | 8D28 | B801 |
| 0001740600 | 9129 | 3501 | 932A | B201 | B32A | C001 | B42A | D601 |
| 0001740620 | BB2A | 6901 | BE2B | F101 | BF2B | 0901 | C22C | 9001 |
| 0001740640 | C32C | A901 | C52C | 3001 | C72D | D601 | C82D | E301 |
| 0001740660 | CA2D | 6001 | CD2E | 7201 | CE2E | 9B01 | CF2E | A401 |
| 0001740700 | D12E | 2201 | D62F | 2501 | D92F | 4E01 | DB2F | CB01 |
| 0001740720 | FB2F | D901 | FC2F | EF01 | 042F | 8802 | 0730 | 8E02 |
| 0001740740 | 0830 | 9902 | 0C30 | 1F02 | 0D31 | 3702 | 1031 | C702 |
| 0001740760 | 1131 | E002 | 1231 | E902 | 1431 | 7002 | 1532 | 7D02 |
| 0001741000 | 1732 | 0302 | 1833 | B202 | 1933 | C002 | 1A33 | CE02 |
| 0001741020 | 1B33 | D702 | 1E33 | 5E02 | 1F34 | 7C02 | 2234 | A002 |
| 0001741040 | 2434 | B102 | 2734 | C302 | 2834 | E302 | 2934 | EC02 |
| 0001741060 | 2A34 | FE02 | 3334 | 8502 | 3435 | BE02 | 3535 | C702 |
| 0001741100 | 3635 | D102 | 3735 | DB02 | 3935 | E502 | 3A35 | E802 |
| 0001741120 | 3B35 | FA02 | 3E35 | 8102 | 3F36 | 8402 | 4036 | 9202 |
| 0001741140 | 4136 | A402 | 4436 | 2A02 | 4837 | 3602 | 4D37 | 4802 |
| 0001741160 | 4F37 | 7C02 | 5437 | 7F02 | 5537 | AD02 | 5637 | B602 |
| 0001741200 | 5737 | 3D02 | 5938 | 5702 | 5C38 | 6F02 | 5D38 | 7802 |
| 0001741220 | 5E38 | 8A02 | 6138 | 1102 | 6239 | 1F02 | 6639 | 2B02 |
| 0001741240 | 6A39 | 4002 | 6B39 | 5402 | 6C39 | 5D02 | 6F39 | E402 |
| 0001741260 | 7139 | 6D02 | 8F3A | 7B02 | 903A | 9102 | 983A | 2602 |
| 0001741300 | 993B | 3F02 | 9A3B | 4802 | 9D3B | CB02 | 9E3B | D902 |
| 0001741320 | 9F3B | E702 | A03B | F002 | A33B | 7302 | A93C | C502 |
| 0001741340 | AB3C | DF02 | AD3C | 0202 | B03D | 1402 | B13D | 3702 |
| 0001741360 | B23D | 4D02 | B43D | 5C02 | B63D | DE02 | B83D | 6002 |
| 0001741400 | B93E | E202 | BF3E | F702 | C33E | 2302 | C93F | 4002 |
| 0001741420 | CA3F | 4B02 | CB3F | 6902 | CE3F | 8D02 | D03F | A102 |
| 0001741440 | D23F | 2402 | 1D40 | 3203 | 1E40 | 4803 | 2540 | DD03 |

THU MAR 14 17:31:54 1991 DB_PI.DLL PAGE 437, LINE 25725

| | | | | | | | | |
|---|---|---|---|---|---|---|---|---|
| 0001741460 | 2940 | E203 | 2A40 | F803 | 2C40 | 7A03 | 3041 | 8603 |
| 0001741500 | 3141 | 8A03 | 3241 | 9503 | 3341 | AB03 | 3441 | B403 |
| 0001741520 | 3941 | 3703 | 3A42 | 5003 | 3F42 | DC03 | 4042 | 0303 |
| 0001741540 | 4143 | 0C03 | 4543 | 8F03 | 4643 | AB03 | 4943 | 3703 |
| 0001741560 | 4B44 | 4003 | 4C44 | 5C03 | 4D44 | 6703 | 4E44 | 7203 |
| 0001741600 | 4F44 | 7D03 | 5044 | 8E03 | 5344 | 9803 | 5544 | A503 |
| 0001741620 | 5A44 | F203 | 5B44 | 1603 | 5C45 | 1F03 | 5D45 | A203 |
| 0001741640 | 6045 | B103 | 6445 | B403 | 6545 | DF03 | 6645 | E803 |
| 0001741660 | 6C45 | 6B03 | 6D46 | B403 | 6E46 | BD03 | 6F46 | D503 |
| 0001741700 | 7346 | 5803 | 7747 | 6703 | 7F47 | 9203 | 8047 | A803 |
| 0001741720 | 8247 | B003 | 8347 | CA03 | 8447 | D903 | 8547 | E603 |
| 0001741740 | 8647 | FE03 | 8947 | 8003 | 8B48 | 9703 | 8D48 | A003 |
| 0001741760 | 8E48 | BD03 | 8F48 | CF03 | 9048 | ED03 | 9148 | FA03 |
| 0001742000 | 9348 | 1203 | 9649 | 9403 | 9749 | 9703 | 9949 | A603 |
| 0001742020 | 9B49 | 2803 | B64A | 3603 | B74A | 4C03 | BE4A | DF03 |
| 0001742040 | BF4A | EA03 | C24A | 6703 | C34B | 7F03 | C64B | 0603 |
| 0001742060 | C74C | 1F03 | C94C | A603 | CA4C | B303 | CC4C | 3003 |
| 0001742100 | CE4D | D603 | D24D | E303 | D34D | 0F03 | D44E | 1803 |
| 0001742120 | D64E | 9603 | D84E | 9903 | D94E | B303 | DA4E | BC03 |
| 0001742140 | DD4E | 3A03 | DF4F | B703 | ED4F | C503 | F04F | D503 |
| 0001742160 | F44F | DA03 | F54F | FD03 | FD4F | 0303 | FE50 | 3A03 |
| 0001742200 | FF50 | 4303 | 0350 | 4904 | 0550 | 6904 | 0650 | 8504 |
| 0001742220 | 0B50 | 8B04 | 0D50 | C204 | 1050 | 0F04 | 1251 | 2E04 |
| 0001742240 | 1451 | 3404 | 3251 | 3F04 | 3351 | 5504 | 3951 | E804 |
| 0001742260 | 3A51 | F304 | 3D51 | 7004 | 3E52 | 8804 | 4152 | 0F04 |
| 0001742300 | 4253 | 2804 | 4353 | 3104 | 4553 | AF04 | 4653 | BC04 |
| 0001742320 | 4853 | 3904 | 4A54 | DF04 | 4B54 | EC04 | 4D54 | 6904 |
| 0001742340 | 5155 | 7604 | 5355 | 9F04 | 5455 | A204 | 5755 | B904 |
| 0001742360 | 5855 | C204 | 5A55 | 4004 | 5C56 | BD04 | 6956 | CB04 |
| 0001742400 | 6B56 | DB04 | 7556 | E004 | 7656 | 1704 | 7757 | 2004 |
| 0001742420 | 7B57 | 2604 | 7D57 | 4604 | 7E57 | 6204 | 8357 | 6804 |
| 0001742440 | 8657 | 8704 | 8857 | A604 | 8957 | AC04 | 9657 | B704 |
| 0001742460 | 9D57 | C704 | 9E57 | F404 | 9F57 | FE04 | A257 | 0504 |
| 0001742500 | A758 | 5704 | BB58 | A904 | BC58 | D304 | C058 | E404 |
| 0001742520 | C358 | EA04 | E558 | F504 | E658 | 0B04 | EA59 | 1004 |
| 0001742540 | EC59 | A304 | ED59 | BC04 | EE59 | C504 | F059 | 4304 |
| 0001742560 | F45A | E904 | F65A | 0004 | FC5B | 7EC4 | FE5B | 8B04 |
| 0001742600 | 035B | D105 | 055B | AF05 | 085C | 2C05 | 095D | 3A05 |
| 0001742620 | 0A5D | 4805 | 0B5D | 5105 | 0F5D | CF05 | 105D | E105 |
| 0001742640 | 115D | F205 | 125D | FB05 | 165D | 7905 | 1B5E | 8705 |
| 0001742660 | 1C5E | C705 | 1F5E | CA05 | 215E | FA05 | 235E | 7805 |
| 0001742700 | 425F | 8605 | 435F | 9C05 | 465F | 2F05 | 4960 | 3405 |
| 0001742720 | 4A60 | 4D05 | 4B60 | 5605 | 4D60 | D405 | 5160 | 7A05 |
| 0001742740 | 5361 | 9105 | 5861 | 0F05 | 5B62 | 1C05 | 5C62 | 4505 |
| 0001742760 | 5F62 | C205 | 6062 | D005 | 6162 | DE05 | 6262 | E705 |
| 0001743000 | 6662 | 6505 | 6763 | 7705 | 6863 | 8805 | 6963 | 9105 |
| 0001743020 | 6F63 | 0F05 | 7164 | 3805 | 7364 | B605 | 9064 | C405 |
| 0001743040 | 9164 | DA05 | 9664 | 6D05 | 9765 | 7505 | 9A65 | 7A05 |
| 0001743060 | 9B65 | 8505 | 9D65 | 0205 | A066 | 2005 | A166 | 3805 |
| 0001743100 | A466 | BF05 | A566 | D805 | A766 | 5F05 | A867 | 6C05 |
| 0001743120 | AA67 | E905 | AC67 | 8F05 | AD68 | 9C05 | AE68 | AA05 |
| 0001743140 | AF68 | B805 | B068 | C105 | B168 | 3F05 | B769 | 6305 |
| 0001743160 | BA69 | 8605 | BC69 | 9805 | BD69 | BB05 | BE69 | C405 |
| 0001743200 | BF69 | 4205 | C46A | 4B05 | C66A | 7F05 | C86A | 8205 |
| 0001743220 | C96A | 9705 | CD6A | 1505 | CE6B | 1E05 | D06B | 9C05 |
| 0001743240 | D16B | AA05 | D56B | B505 | D76B | B805 | E16B | C105 |
| 0001743260 | E36B | 0A05 | E66C | 0D05 | EC6C | 2D05 | ED6C | 4105 |
| 0001743300 | EE6C | 4A05 | F06C | C805 | F26C | 4605 | 1D6D | 5406 |
| 0001743320 | 236D | 6406 | 266D | F706 | 276D | 0F06 | 286E | 1806 |

THU MAR 14 17:31:54 1991 DB_PI.DLL PAGE 438, LINE 25784

| | | | | | | | | |
|---|---|---|---|---|---|---|---|---|
| 0001743340 | 2B6E | 9606 | 2C6E | AF06 | 2D6E | B806 | 2F6E | 3606 |
| 0001743360 | 306F | 4406 | 326F | C106 | 336F | CF06 | 346F | D806 |
| 0001743400 | 366F | 5606 | 3870 | DE06 | 4F70 | E906 | 5670 | F906 |
| 0001743420 | 5A70 | 1006 | 5F71 | 2D06 | 6071 | 5B06 | 6271 | 6A06 |
| 0001743440 | 6371 | 6D06 | 6871 | 8606 | 6971 | A206 | 6D71 | B106 |
| 0001743460 | 6E71 | C506 | 7171 | 0D06 | 7772 | 1E06 | 7B72 | 6B06 |
| 0001743500 | 7E72 | B306 | 8072 | CA06 | 8272 | D306 | 8372 | E706 |
| 0001743520 | 8472 | F606 | 8572 | FB06 | 8672 | FE06 | 8772 | 0306 |
| 0001743540 | 8873 | 0606 | 8973 | 0B06 | 8B73 | 2006 | 8E73 | 2606 |
| 0001743560 | 9073 | 2C06 | 9F73 | 3706 | A173 | 4706 | A473 | 4D06 |
| 0001743600 | A773 | 6406 | A973 | 8106 | AA73 | 8B06 | AE73 | 9206 |
| 0001743620 | AF73 | B206 | B273 | B806 | B573 | 0006 | B674 | 1606 |
| 0001743640 | B874 | 2506 | BA74 | 2B06 | BC74 | 3106 | BD74 | 3706 |
| 0001743660 | C074 | 4C06 | C274 | 5206 | 0974 | 6264 | 665F | 746C |
| 0001743700 | 2E72 | 0263 | 9700 | 5200 | 5E00 | 5B74 | 6E00 | 5C74 |
| 0001743720 | 7E00 | 5F74 | 8D00 | 6274 | A000 | 6674 | B100 | 6774 |
| 0001743740 | C300 | 6C74 | C900 | 6D74 | E700 | 6E74 | F000 | 7174 |
| 0001743760 | F600 | 7274 | 0700 | 7775 | 1500 | 7A75 | 5800 | 7B75 |
| 0001744000 | 7000 | 8875 | 7900 | 8975 | A100 | 8A75 | AA00 | 8B75 |
| 0001744020 | B800 | 8E75 | BE00 | 8F75 | C100 | 9075 | CF00 | 9975 |
| 0001744040 | D500 | 9A75 | F500 | 9B75 | FF00 | 9C75 | 0D00 | 9F76 |
| 0001744060 | 1300 | A476 | 2100 | A676 | 2700 | BA76 | 3200 | BE76 |
| 0001744100 | 4200 | C176 | 4D00 | C276 | 6600 | C576 | 7500 | C676 |
| 0001744120 | A100 | C876 | B000 | CA76 | C300 | CC76 | C600 | CD76 |
| 0001744140 | DA00 | D076 | E900 | D276 | EF00 | FB76 | FA00 | FC76 |
| 0001744160 | 1000 | 0377 | A301 | 0477 | BB01 | D677 | 3801 | 0778 |
| 0001744200 | 5901 | 0E78 | E001 | 0F78 | F801 | 1278 | 7F01 | 1579 |
| 0001744220 | 9601 | 1A79 | AD01 | 1C79 | D401 | 1E79 | 5201 | 447A |
| 0001744240 | 6001 | 457A | 7601 | 4E7A | 0901 | 4F7B | 1F01 | 567B |
| 0001744260 | A601 | 577B | BE01 | 5B7B | 4501 | 5E7C | 5D01 | 607C |
| 0001744300 | 7301 | 627C | F101 | 8D7C | FF01 | 8E7C | 1501 | 9A7D |
| 0001744320 | A801 | 9B7D | B301 | 9C7D | 3001 | 9D7E | 4601 | A47E |
| 0001744340 | CD01 | A57E | E501 | A67E | EE01 | A77E | F801 | A87E |
| 0001744360 | FD01 | AC7E | 7B01 | AF7F | 8001 | B27F | 9801 | B47F |
| 0001744400 | B901 | B67F | 3701 | EA80 | 4501 | EB80 | 5B01 | F180 |
| 0001744420 | EE01 | F580 | F301 | FA80 | F801 | FB80 | 2201 | FD81 |
| 0001744440 | 9F01 | FE81 | B201 | 0081 | 3A02 | 0182 | 5002 | 0282 |
| 0001744460 | 7702 | 0382 | 8002 | 0482 | 8E02 | 0682 | 0C02 | 0C83 |
| 0001744500 | 0F02 | 0D83 | 2702 | 0E83 | 3002 | 0F83 | 3A02 | 1083 |
| 0001744520 | 3F02 | 1183 | 4D02 | 1583 | CB02 | 1683 | D602 | 1783 |
| 0001744540 | EC02 | 1883 | 0002 | 1984 | 0802 | 1A84 | 0B02 | 1B84 |
| 0001744560 | 1402 | 1C84 | 2202 | 1F84 | A002 | 2184 | A302 | 2484 |
| 0001744600 | AB02 | 2684 | B402 | 2784 | CE02 | 2884 | DD02 | 2984 |
| 0001744620 | EB02 | 2C84 | 6802 | 2E85 | 6D02 | 3085 | 8302 | 3385 |
| 0001744640 | B902 | 3585 | CE02 | 3885 | 0402 | 3986 | 0D02 | 3A86 |
| 0001744660 | 1702 | 3B86 | 1D02 | 3D86 | 2302 | 3E86 | 2602 | 3F86 |
| 0001744700 | 3402 | 4186 | B202 | 4286 | B502 | 4386 | B802 | 4586 |
| 0001744720 | BB02 | 4686 | C902 | 4786 | D502 | 4886 | F302 | 4A86 |
| 0001744740 | F802 | 4C86 | FB02 | 4E86 | 1F02 | 4F87 | 2D02 | 5187 |
| 0001744760 | AB02 | 7E87 | B902 | 7F87 | CF02 | 8687 | 6202 | 8788 |
| 0001745000 | 6A02 | 8D88 | 7602 | 8E88 | 8E02 | 8F88 | 9702 | 9088 |
| 0001745020 | AB02 | 9188 | B002 | 9488 | 2E02 | 9689 | 4E02 | 9889 |
| 0001745040 | CC02 | 0889 | 6264 | 615F | 696F | 632E | 0002 | 008B |
| 0001745060 | 0058 | 89DA | 0059 | 89F0 | 005F | 8A82 | 0061 | 8A95 |
| 0001745100 | 0062 | 8A9E | 0064 | 8AA7 | 0066 | 8B30 | 0086 | 8B3C |
| 0001745120 | 0087 | 8B52 | 008F | 8BE5 | 0090 | 8BFD | 0093 | 8C7A |
| 0001745140 | 0094 | 8C92 | 0097 | 8D19 | 0098 | 8D45 | 009B | 8DCC |
| 0001745160 | 009D | 8DDB | 009F | 8DE7 | 00A0 | 8DF0 | 00A1 | 8E12 |
| 0001745200 | 00A2 | 8E15 | 00A3 | 8E1E | 00A6 | 8E9B | 00AA | 8ED5 |

THU MAR 14 17:31:54 1991 DB_PI.DLL PAGE 439, LINE 25843

| | | | | | | | | |
|---|---|---|---|---|---|---|---|---|
| 0001745220 | 00AF | 8EEC | 00B1 | 8F1F | 00B3 | 8F9D | 00D1 | 8FAB |
| 0001745240 | 00D2 | 8FC1 | 00DA | 9054 | 00DB | 906C | 00DD | 90F3 |
| 0001745260 | 00DE | 9100 | 00E1 | 917D | 00E2 | 91A9 | 00E4 | 9230 |
| 0001745300 | 00E6 | 924B | 00E8 | 92C9 | 0107 | 92D7 | 0108 | 92ED |
| 0001745320 | 0111 | 9385 | 0114 | 9391 | 0115 | 93A9 | 0117 | 9438 |
| 0001745340 | 0118 | 9445 | 011B | 94CA | 011C | 94F6 | 011D | 958F |
| 0001745360 | 0120 | 95A5 | 0124 | 95AB | 0126 | 95D1 | 0127 | 95E4 |
| 0001745400 | 0129 | 966A | 012B | 9677 | 012C | 968D | 0130 | 9721 |
| 0001745420 | 0132 | 974C | 0133 | 9755 | 0134 | 9773 | 0137 | 97F9 |
| 0001745440 | 0139 | 987E | 0162 | 988C | 0163 | 98A2 | 0167 | 9935 |
| 0001745460 | 0169 | 993A | 016A | 9954 | 016C | 99D1 | 016E | 99E1 |
| 0001745500 | 016F | 99F9 | 0171 | 9A03 | 0173 | 9A16 | 0175 | 9A1E |
| 0001745520 | 0176 | 9A40 | 0177 | 9A4B | 0178 | 9A56 | 017B | 9AD3 |
| 0001745540 | 0181 | 9AE3 | 0184 | 9B1B | 0185 | 9B3D | 0186 | 9B46 |
| 0001745560 | 018A | 9BC4 | 018C | 9BCB | 018E | 9C48 | 01B7 | 9C56 |
| 0001745600 | 01B8 | 9C6C | 01BD | 9CFF | 01BF | 9D04 | 01C0 | 9D1E |
| 0001745620 | 01C2 | 9D9B | 01C4 | 9D9F | 01C5 | 9DA8 | 01C6 | 9DBE |
| 0001745640 | 01C7 | 9DC7 | 01C9 | 9E45 | 01CC | 9ECE | 01CE | 9EEB |
| 0001745660 | 01D0 | 9F17 | 01D1 | 9F1D | 01D3 | 9F20 | 01D5 | 9FA9 |
| 0001745700 | 01D6 | 9FAC | 01D7 | 9FBE | 01DD | A03B | 01E1 | A07F |
| 0001745720 | 01E5 | A089 | 01E7 | A0A5 | 01EA | A0C5 | 01EB | A0F2 |
| 0001745740 | 01EE | A17E | 01F0 | A1FB | 0217 | A209 | 0218 | A21F |
| 0001745760 | 021D | A2B2 | 021E | A2D5 | 0221 | A352 | 0223 | A3ED |
| 0001746000 | 0225 | A416 | 0249 | A424 | 024A | A43A | 024D | A4CD |
| 0001746020 | 024F | A555 | 0250 | A562 | 0251 | A56A | 0252 | A576 |
| 0001746040 | 0254 | A5F3 | 0255 | A5F6 | 0257 | A694 | 0259 | A6C0 |
| 0001746060 | 0276 | A6CE | 0277 | A6E4 | 027E | A777 | 027F | A77F |
| 0001746100 | 0283 | A78B | 0284 | A7A3 | 0286 | A82A | 0287 | A856 |
| 0001746120 | 0289 | A8DD | 028B | A8FA | 028D | A978 | 6408 | 5F62 |
| 0001746140 | 656D | 2E6D | 0263 | 8D00 | 6D00 | 8600 | 6EA9 | 9C00 |
| 0001746160 | 71A9 | 2E00 | 73AA | 3600 | 75AA | D600 | 76AA | 0A00 |
| 0001746200 | 78AB | 4300 | 7AAB | 8700 | 7CAB | 1000 | 9DAC | 1E00 |
| 0001746220 | 9EAC | 3400 | A2AC | C700 | A5AC | CFC0 | A7AC | 6300 |
| 0001746240 | A9AD | 9700 | A4AD | D800 | ACAD | 5600 | AEAE | 5900 |
| 0001746260 | CDAF | 6700 | CEAF | 7D00 | D0AF | 1000 | D2B0 | 1800 |
| 0001746300 | D4B0 | B900 | D5B0 | ED00 | D7B0 | 1300 | D9B1 | 4400 |
| 0001746320 | DBB1 | CE00 | FBB1 | DC00 | FCB1 | F200 | FFB1 | 8500 |
| 0001746340 | 02B2 | 8D01 | 04B2 | 2A01 | 06B3 | 5E01 | 07B3 | 8E01 |
| 0001746360 | 09B3 | 1801 | 0BB4 | FB01 | 29B4 | 0901 | 2AB5 | 1F01 |
| 0001746400 | 2DB5 | B201 | 37B5 | B701 | 38B5 | C301 | 3BB5 | CC01 |
| 0001746420 | 3CB5 | D501 | 3FB5 | D801 | 41B5 | F201 | 44B5 | 9801 |
| 0001746440 | 45B6 | B901 | 49B6 | 4301 | 52B7 | 5C01 | 54B7 | 6701 |
| 0001746460 | 57B7 | 9301 | 58B7 | C301 | 5AB7 | 4D01 | 5CB8 | 5501 |
| 0001746500 | 5DB8 | 1E01 | 5FB9 | 2601 | 61B9 | 2901 | 62B9 | CC01 |
| 0001746520 | 64B9 | F701 | 87B9 | 0501 | 88BA | 1B01 | 95BA | AE01 |
| 0001746540 | 9BBA | 2801 | 9DBB | E001 | 9EBB | 0001 | A0BC | 2001 |
| 0001746560 | A2BC | 2901 | A3BC | 4601 | A4BC | 5101 | A7BC | FB01 |
| 0001746600 | A9BC | 0401 | AABD | 5301 | ABBD | 5C01 | ACBD | EA01 |
| 0001746620 | B2BD | 0001 | C0BE | 4801 | C2C0 | D201 | D0C0 | E001 |
| 0001746640 | D5C0 | F601 | D6C0 | FB01 | DEC0 | 0301 | E0C1 | 9601 |
| 0001746660 | E1C1 | A201 | E2C1 | C401 | E3C1 | CD01 | E4C1 | DC01 |
| 0001746700 | E6C1 | 6201 | E9C2 | 7901 | EAC2 | 8701 | EDC2 | 9001 |
| 0001746720 | EEC2 | 9C01 | F1C2 | A501 | F2C2 | AE01 | F5C2 | B101 |
| 0001746740 | F6C2 | CA01 | F7C2 | DE01 | F8C2 | ED01 | F9C2 | F901 |
| 0001746760 | FCC2 | 8101 | FEC3 | 9B01 | 01C3 | 2102 | 08C4 | 3A02 |
| 0001747000 | 0AC4 | 4502 | 0CC4 | 7102 | 0DC4 | 8B02 | 0EC4 | A402 |
| 0001747020 | 0FC4 | B702 | 10C4 | C602 | 11C4 | D202 | 15C4 | 5A02 |
| 0001747040 | 16C5 | 6302 | 18C5 | 6602 | 19C5 | 9302 | 1AC5 | AA02 |
| 0001747060 | 1BC5 | B902 | 1CC5 | C502 | 23C5 | 4D02 | 24C6 | 5602 |

THU MAR 14 17:31:54 1991 DB_PI.DLL PAGE 440, LINE 25902

| | | | | | | | | |
|---|---|---|---|---|---|---|---|---|
| 0001747100 | 26C6 | CA02 | 29C6 | 1B02 | 2BC7 | A502 | 4EC7 | B302 |
| 0001747120 | 4FC7 | C902 | 56C7 | 5C02 | 58C8 | 1402 | 59C9 | 3402 |
| 0001747140 | 5BC9 | 5402 | 5DC9 | 5D02 | 5EC9 | 7A02 | 5FC9 | 8502 |
| 0001747160 | 62C9 | 2F02 | 64CA | 3802 | 65CA | 8702 | 66CA | 9002 |
| 0001747200 | 67CA | 1E02 | 6ACB | 3402 | 6CCB | BE02 | 91CB | CC02 |
| 0001747220 | 92CB | E202 | 94CB | FE02 | 95CB | 1B02 | 09CC | 6264 |
| 0001747240 | 695F | 746E | 2E72 | 0263 | 1800 | 8902 | 2A00 | 8ECC |
| 0001747260 | 3A00 | 90CC | 4600 | 91CC | 5F00 | 96CC | 6500 | 97CC |
| 0001747300 | 7900 | 99CC | 8B00 | 9ACC | 9600 | 9DCC | A100 | A2CC |
| 0001747320 | AA00 | A3CC | C300 | A4CC | CD00 | A7CC | D700 | A8CC |
| 0001747340 | EF00 | A9CC | FA00 | ACCC | 0500 | AFCD | 1000 | B0CD |
| 0001747360 | 2800 | B1CD | 3300 | B4CD | 3E00 | B8CD | 4900 | B9CD |
| 0001747400 | 5400 | BACD | 6400 | BBCD | 6F00 | BFCD | 7F00 | C1CD |
| 0001747420 | 9000 | C3CD | 9800 | C4CD | A100 | C6CD | A700 | C7CD |
| 0001747440 | AF00 | C8CD | B800 | CBCD | BE00 | CCCD | CF00 | CDCD |
| 0001747460 | D800 | CFCD | DE00 | D0CD | F800 | D1CD | 0100 | D3CE |
| 0001747500 | 0700 | D5CE | 0D00 | ECCE | 1800 | EECE | 2800 | EFCE |
| 0001747520 | 4100 | F2CE | 4700 | F5CE | 6900 | F6CE | 7800 | F9CE |
| 0001747540 | 9E00 | FBCE | B600 | FDCE | BC00 | 14CE | C701 | 15CE |
| 0001747560 | D701 | 17CE | E301 | 18CE | FC01 | 1BCE | 0201 | 1CCF |
| 0001747600 | 1301 | 1ECF | 1901 | 32CF | 2401 | 33CF | 3401 | 34CF |
| 0001747620 | 5901 | 53CF | 6401 | 56CF | 7401 | 58CF | 8001 | 5ACF |
| 0001747640 | 9F01 | 5BCF | BB01 | 5DCF | DF01 | 5ECF | FD01 | 61CF |
| 0001747660 | 0001 | 62D0 | 1201 | 68D0 | 1801 | 69D0 | 2A01 | 6AD0 |
| 0001747700 | 3601 | 6DD0 | 3C01 | 6FD0 | 4201 | 89D0 | 4D01 | 90D0 |
| 0001747720 | 5D01 | 92D0 | 6901 | 93D0 | 8201 | 96D0 | 8801 | 98D0 |
| 0001747740 | 9F01 | 9AD0 | AE01 | 9BD0 | CE01 | 9ED0 | D901 | 9FD0 |
| 0001747760 | 0101 | A3D1 | 0701 | A4D1 | 1401 | A8D1 | 2001 | AED1 |
| 0001750000 | 4501 | AFD1 | 6101 | B3D1 | 7A01 | B4D1 | 9B01 | B5D1 |
| 0001750020 | B401 | B7D1 | BA01 | B8D1 | D601 | B9D1 | F001 | BBD1 |
| 0001750040 | F901 | BCD1 | 1701 | C0D2 | 1D01 | C2D2 | 2601 | DAD2 |
| 0001750060 | 3101 | DED2 | 4101 | DFD2 | 5A01 | E1D2 | 6001 | E2D2 |
| 0001750100 | 7C01 | E4D2 | A001 | E5D2 | D201 | E6D2 | E801 | E7D2 |
| 0001750120 | F101 | EAD2 | F701 | ECD2 | 0001 | 03D3 | 0B02 | 08D3 |
| 0001750140 | 1B02 | 0AD3 | 2E02 | 0DD3 | 3E02 | 0ED3 | 5402 | 11D3 |
| 0001750160 | 6302 | 12D3 | 7B02 | 15D3 | 9202 | 16D3 | A902 | 18D3 |
| 0001750200 | C002 | 19D3 | CA02 | 1BD3 | D402 | 1DD3 | DA02 | 37D3 |
| 0001750220 | E502 | 3AD3 | F502 | 3DD3 | 0102 | 3FD4 | 2002 | 41D4 |
| 0001750240 | 3102 | 42D4 | 4C02 | 44D4 | 7002 | 45D4 | 8D02 | 48D4 |
| 0001750260 | 9302 | 4AD4 | 9C02 | 64D4 | A702 | 6CD4 | B702 | 6ED4 |
| 0001750300 | C302 | 6FD4 | DC02 | 72D4 | E202 | 73D4 | 0602 | 78D5 |
| 0001750320 | 0C02 | 7AD5 | 2102 | 7CD5 | 2F02 | 7DD5 | 4F02 | 7ED5 |
| 0001750340 | 5A02 | 80D5 | 6002 | 81D5 | 7202 | 86D5 | 7D02 | 8BD5 |
| 0001750360 | A202 | 8CD5 | BD02 | 8ED5 | D602 | 91D5 | F302 | 92D5 |
| 0001750400 | 0E02 | 93D6 | 1702 | 94D6 | 2D02 | 95D6 | 3902 | 98D6 |
| 0001750420 | 3F02 | 9AD6 | 4702 | 9ED6 | 4D02 | A0D6 | 5602 | B6D6 |
| 0001750440 | 6102 | BAD6 | 7102 | BBD6 | 8A02 | BDD6 | 9002 | BED6 |
| 0001750460 | AB02 | C0D6 | CF02 | C1D6 | E502 | C4D6 | ED02 | C5D6 |
| 0001750500 | 0902 | C9D7 | 1702 | CBD7 | 2F02 | CFD7 | 3802 | D1D7 |
| 0001750520 | 6302 | D2D7 | 7402 | D5D7 | 7A02 | D8D7 | 8002 | DAD7 |
| 0001750540 | 8902 | F2D7 | 9402 | F7D7 | A402 | F8D7 | BB02 | FDD7 |
| 0001750560 | CB02 | FED7 | E202 | 01D7 | F103 | 02D7 | 0603 | 03D8 |
| 0001750600 | 0F03 | 04D8 | 1D03 | 07D8 | 2303 | 09D8 | 2903 | 24D8 |
| 0001750620 | 3403 | 2AD8 | 4403 | 2BD8 | 5D03 | 2DD8 | 6303 | 30D8 |
| 0001750640 | 6F03 | 32D8 | 7A03 | 35D8 | 8B03 | 38D8 | 8E03 | 39D8 |
| 0001750660 | 9903 | 3AD8 | A503 | 3FD8 | AB03 | 40D8 | C003 | 42D8 |
| 0001750700 | D303 | 43D8 | E203 | 44D8 | EE03 | 49D8 | F403 | 4AD8 |
| 0001750720 | 1A03 | 4BD9 | 3003 | 4CD9 | 3F03 | 4ED9 | 5503 | 50D9 |
| 0001750740 | 5803 | 51D9 | 6A03 | 52D9 | 7503 | 59D9 | 7B03 | 5AD9 |

THU MAR 14 17:31:54 1991 DB_PI.DLL PAGE 441, LINE 25961

| | | | | | | | | |
|---|---|---|---|---|---|---|---|---|
| 0001750760 | 9203 | 5CD9 | A103 | 5ED9 | A703 | 74D9 | B203 | 7BD9 |
| 0001751000 | C203 | 7CD9 | D803 | 7DD9 | E103 | 7ED9 | F103 | 83D9 |
| 0001751020 | FA03 | 86D9 | 1603 | 87DA | 5603 | 8BDA | 5C03 | 8CDA |
| 0001751040 | 7003 | 8FDA | 7F03 | 90DA | 9003 | 92DA | 9F03 | 94DA |
| 0001751060 | A503 | A9DA | B003 | ABDA | C003 | AFDA | C503 | B0DA |
| 0001751100 | DE03 | B2DA | E403 | B3DA | FF03 | B5DA | 1803 | B6DB |
| 0001751120 | 3703 | B7DB | 4903 | BADB | 4F03 | BCDB | 5803 | D3DB |
| 0001751140 | 6303 | D6DB | 7303 | D7DB | 8C03 | DADB | 9203 | DDDB |
| 0001751160 | A503 | DEDB | B703 | DFDB | C303 | E2DB | C903 | E4DB |
| 0001751200 | DB03 | E6DB | E103 | FEDB | EC03 | 00DB | FC04 | 01DB |
| 0001751220 | 0704 | 02DC | 0F04 | 04DC | 1704 | 06DC | 1D04 | 1BDC |
| 0001751240 | 2804 | 1DDC | 3804 | 1EDC | 4A04 | 20DC | 5004 | 38DC |
| 0001751260 | 5B04 | 39DC | 6B04 | 3CDC | 7304 | 3DDC | 7B04 | 44DC |
| 0001751300 | 8304 | 45DC | A104 | 48DC | AA04 | 4ADC | C304 | 4BDC |
| 0001751320 | CC04 | 4CDC | E204 | 4DDC | EB04 | 4EDC | F304 | 54DC |
| 0001751340 | 0104 | 55DD | 2104 | 56DD | 2A04 | 5BDD | 3A04 | 5CDD |
| 0001751360 | 5A04 | 5DDD | 6304 | 62DD | 7304 | 63DD | 7904 | 67DD |
| 0001751400 | 7F04 | 68DD | 9704 | 69DD | A004 | 6FDD | A604 | 70DD |
| 0001751420 | BE04 | 71DD | C704 | 75DD | CD04 | 76DD | E504 | 77DD |
| 0001751440 | EE04 | 7BDD | F404 | 7CDD | 0C04 | 7DDE | 1504 | 81DE |
| 0001751460 | 1B04 | 87DE | 2B04 | 88DE | 3604 | 8BDE | 4204 | 8DDE |
| 0001751500 | 5404 | 8FDE | 5A04 | A8DE | 6504 | ADDE | 7504 | AFDE |
| 0001751520 | 9804 | B1DE | AC04 | B3DE | AF04 | B4DE | CA04 | B6DE |
| 0001751540 | D904 | B9DE | ED04 | BADE | FA04 | BCDE | 0004 | BEDF |
| 0001751560 | 0604 | D7DF | 1104 | D9DF | 2104 | DADF | 3A04 | DBDF |
| 0001751600 | 4B04 | DCDF | 5104 | DDDF | 5B04 | DFDF | 6504 | E0DF |
| 0001751620 | 6B04 | F5DF | 7604 | F9DF | 8604 | FADF | 9104 | FCDF |
| 0001751640 | 9704 | FEDF | A304 | FFDF | BC04 | 02DF | C205 | 08DF |
| 0001751660 | D705 | 09DF | 0105 | 0FE0 | 0C05 | 11E0 | 4105 | 14E0 |
| 0001751700 | 4705 | 15E0 | 5905 | 1CE0 | 6205 | 23E0 | 8705 | 24E0 |
| 0001751720 | A205 | 25E0 | B805 | 26E0 | C105 | 29E0 | DE05 | 2BE0 |
| 0001751740 | F005 | 2CE0 | 0B05 | 2EE1 | 1305 | 30E1 | 1905 | 32E1 |
| 0001751760 | 1C05 | 34E1 | 2205 | 4AE1 | 2D05 | 4BE1 | 3D05 | 4CE1 |
| 0001752000 | 4805 | 4EE1 | 4E05 | 50E1 | 5A05 | 51E1 | 7305 | 54E1 |
| 0001752020 | 7905 | 56E1 | 9F05 | 58E1 | A505 | 5AE1 | CA05 | 5CE1 |
| 0001752040 | D005 | 5DE1 | E605 | 5EE1 | EC05 | 60E1 | 0905 | 62E2 |
| 0001752060 | 0F05 | 77E2 | 1A05 | 7BE2 | 2A05 | 7CE2 | 4305 | 7DE2 |
| 0001752100 | 4C05 | 80E2 | 5205 | 81E2 | 6505 | 83E2 | 6D05 | 85E2 |
| 0001752120 | 7505 | 86E2 | 7B05 | 9BE2 | 8605 | 9EE2 | 9605 | A1E2 |
| 0001752140 | 9B05 | A2E2 | B605 | A4E2 | CF05 | ADE2 | F605 | AEE2 |
| 0001752160 | 1205 | AFE3 | 1B05 | B1E3 | 1E05 | B2E3 | 2105 | B3E3 |
| 0001752200 | 2705 | C9E3 | 3205 | CAE3 | 4205 | CBE3 | 5C05 | CCE3 |
| 0001752220 | 5F05 | DFE3 | 6A05 | E0E3 | 7A05 | E1E3 | 8A05 | E2E3 |
| 0001752240 | 9505 | E3E3 | 9B05 | FBE3 | A605 | FCE3 | B605 | FDE3 |
| 0001752260 | BB05 | FEE3 | C005 | FFE3 | C505 | 00E3 | CE06 | 03E3 |
| 0001752300 | D306 | 05E3 | E706 | 07E3 | 0306 | 08E4 | 1F06 | 09E4 |
| 0001752320 | 2806 | 0AE4 | 2E06 | 0DE4 | 3306 | 0EE4 | 3606 | 10E4 |
| 0001752340 | 5C06 | 11E4 | 6506 | 13E4 | 8706 | 14E4 | 9006 | 15E4 |
| 0001752360 | 9606 | 16E4 | 9F06 | 17E4 | A506 | 1AE4 | AA06 | 1BE4 |
| 0001752400 | AF06 | 1DE4 | C506 | 1EE4 | C806 | 1FE4 | DB06 | 23E4 |
| 0001752420 | E106 | 25E4 | E406 | 29E4 | ED06 | 2EE4 | 0106 | 2FE5 |
| 0001752440 | 4F06 | 34E5 | 5A06 | 35E5 | A506 | 38E5 | AB06 | 39E5 |
| 0001752460 | BF06 | 3CE5 | DD06 | 3FE5 | FF06 | 41E5 | 0206 | 42E6 |
| 0001752500 | 0706 | 43E6 | 1306 | 47E6 | 1D06 | 4AE6 | 2606 | 4BE6 |
| 0001752520 | 3B06 | 4CE6 | 4406 | 4DE6 | 6506 | 4FE6 | 6E06 | 50E6 |
| 0001752540 | 8506 | 51E6 | 8806 | 52E6 | 9D06 | 54E6 | B906 | 58E6 |
| 0001752560 | BF06 | 59E6 | C206 | 5BE6 | C806 | 70E6 | D306 | 72E6 |
| 0001752600 | E306 | 75E6 | E806 | 77E6 | FC06 | 79E6 | 1806 | 7AE7 |
| 0001752620 | 3E06 | 7CE7 | 4106 | 7DE7 | 5D06 | 80E7 | 6306 | 81E7 |

THU MAR 14 17:31:54 1991 DB_PI.DLL PAGE 442, LINE 26020

| | | | | | | | | |
|---|---|---|---|---|---|---|---|---|
| 0001752640 | 6C06 | 82E7 | 8106 | 83E7 | 8406 | 86E7 | 9706 | 87E7 |
| 0001752660 | B006 | 8BE7 | B606 | 8CE7 | D806 | 8DE7 | E106 | 8EE7 |
| 0001752700 | E706 | 8FE7 | FC06 | 90E7 | 1506 | 91E8 | 1806 | 93E8 |
| 0001752720 | 1B06 | 94E8 | 2106 | ACE8 | 2C06 | AEE8 | 3C06 | B1E8 |
| 0001752740 | 4106 | B3E8 | 5506 | B5E8 | 7106 | B6E8 | 9706 | B8E8 |
| 0001752760 | 9A06 | B9E8 | B606 | BAE8 | BC06 | BBE8 | BF06 | BCE8 |
| 0001753000 | E006 | BFE8 | E606 | C1E8 | E906 | C2E8 | EF06 | D7E8 |
| 0001753020 | FA06 | D8E8 | 0A06 | D9E9 | 2306 | DBE9 | 2906 | DDE9 |
| 0001753040 | 3D06 | DFE9 | 4306 | F4E9 | 4E06 | F5E9 | 5E06 | F6E9 |
| 0001753060 | 7706 | F8E9 | 7D06 | FAE9 | 9106 | FCE9 | 9706 | 13E9 |
| 0001753100 | A207 | 15E9 | B207 | 16E9 | CB07 | 18E9 | D107 | 19E9 |
| 0001753120 | E007 | 1BE9 | F807 | 1DE9 | FE07 | 34E9 | 0907 | 36EA |
| 0001753140 | 1907 | 37EA | 3207 | 3AEA | 3807 | 3CEA | 5A07 | 3EEA |
| 0001753160 | 7607 | 3FEA | 8207 | 44EA | 9607 | 46EA | 9E07 | 5CEA |
| 0001753200 | A907 | 5EEA | B907 | 5FEA | BE07 | 65EA | C607 | 66EA |
| 0001753220 | E807 | 68EA | FE07 | 69EA | 0907 | 6EEB | 1907 | 6FEB |
| 0001753240 | 3B07 | 74EB | 4107 | 75EB | 5C07 | 79EB | 6D07 | 7BEB |
| 0001753260 | 8907 | 7CEB | B507 | 7DEB | BE07 | 7EEB | C107 | 80EB |
| 0001753300 | C407 | 81EB | D507 | 82EB | DE07 | 83EB | F407 | 85EB |
| 0001753320 | F707 | 86EB | 1207 | 8AEC | 2307 | 8BEC | 2F07 | 8DEC |
| 0001753340 | 4307 | 8FEC | 4907 | A5EC | 5407 | A7EC | 6407 | A8EC |
| 0001753360 | 8C07 | A9EC | 9807 | AAEC | 9B07 | ABEC | C507 | ACEC |
| 0001753400 | D107 | ADEC | D407 | AFEC | DA07 | 09EC | 7464 | 5F73 |
| 0001753420 | 6274 | 2E6C | 0363 | 5D00 | 8801 | 0000 | 9000 | 1000 |
| 0001753440 | 9100 | 4C00 | 9300 | 5B00 | 9400 | 6100 | 9500 | 6A00 |
| 0001753460 | 9800 | 7C00 | 9900 | 8500 | 9B00 | 8A00 | A100 | 9600 |
| 0001753500 | A400 | 9900 | A500 | 9E00 | A900 | AD00 | AA00 | DC00 |
| 0001753520 | AC00 | E600 | AD00 | F200 | AE00 | 0800 | AF01 | 0E00 |
| 0001753540 | B101 | 1100 | B901 | 2300 | BB01 | 5500 | BD01 | 5B00 |
| 0001753560 | D701 | 6600 | DF01 | 7600 | E001 | 8E00 | E101 | 9400 |
| 0001753600 | E201 | BC00 | E501 | C200 | E601 | F600 | E701 | FF00 |
| 0001753620 | EA01 | 1500 | EB02 | 2600 | ED02 | 3700 | EF02 | 4000 |
| 0001753640 | F602 | 4B00 | F802 | 7B00 | FC02 | 7E00 | 0002 | A901 |
| 0001753660 | 0102 | BC01 | 0402 | C201 | 0602 | CB01 | 0702 | DC01 |
| 0001753700 | 0A02 | ED01 | 0C02 | F301 | 2202 | FE01 | 2602 | 0E01 |
| 0001753720 | 2703 | 4A01 | 2B03 | 5901 | 2D03 | 7E01 | 2F03 | 8401 |
| 0001753740 | 4003 | 8F01 | 4103 | 9F01 | 4203 | AE01 | 4503 | BD01 |
| 0001753760 | 4703 | CE01 | 4A03 | D501 | 4B03 | F901 | 5003 | 0E01 |
| 0001754000 | 5104 | 2F01 | 5204 | 4A01 | 5404 | 6501 | 5604 | 6B01 |
| 0001754020 | 5804 | 7101 | 6704 | 7C01 | 6804 | 8C01 | 6904 | AF01 |
| 0001754040 | 6A04 | C401 | 6B04 | CA01 | 7704 | D501 | 7804 | E501 |
| 0001754060 | 7904 | 0501 | 7B05 | 2501 | 7D05 | 3C01 | 7E05 | 3F01 |
| 0001754100 | 7F05 | 6401 | 8005 | 6A01 | 8105 | 6D01 | 8505 | 7301 |
| 0001754120 | 8605 | 9801 | 8705 | 9E01 | 8805 | A101 | 8905 | A701 |
| 0001754140 | 9705 | B201 | 9A05 | C201 | 9B05 | D901 | 9C05 | E201 |
| 0001754160 | 9D05 | E801 | 9E05 | EB01 | 9F05 | 1001 | A006 | 1601 |
| 0001754200 | A106 | 1901 | A306 | 1F01 | B206 | 2A01 | B306 | 3A01 |
| 0001754220 | B506 | 4901 | B606 | 6001 | B906 | 7501 | BC06 | 7801 |
| 0001754240 | BF06 | A501 | C106 | C801 | C306 | D101 | C406 | D701 |
| 0001754260 | E806 | E201 | F706 | F201 | FA06 | 2301 | FB07 | 3E01 |
| 0001754300 | FF07 | 4401 | 0007 | 7802 | 0107 | 8102 | 0507 | 9702 |
| 0001754320 | 0707 | 9D02 | 0807 | A202 | 0907 | AD02 | 0A07 | B702 |
| 0001754340 | 0C07 | BA02 | 0D07 | BF02 | 0E07 | CA02 | 1007 | CD02 |
| 0001754360 | 1107 | D202 | 1207 | DE02 | 1307 | E802 | 1507 | EB02 |
| 0001754400 | 1607 | F102 | 1807 | 0902 | 1D08 | 0E02 | 1E08 | 4102 |
| 0001754420 | 1F08 | 5402 | 2108 | 5A02 | 2208 | 5F02 | 2308 | 6B02 |
| 0001754440 | 2608 | 7302 | 2C08 | 7C02 | 2E08 | AB02 | 3308 | B702 |
| 0001754460 | 3608 | EA02 | 3708 | F402 | 3808 | F902 | 3B08 | FC02 |
| 0001754500 | 3D08 | 0602 | 4009 | 0B02 | 4309 | 1902 | 4409 | 3102 |

THU MAR 14 17:31:54 1991 DB_PI.DLL PAGE 443, LINE 26079

| | | | | | | | | |
|---|---|---|---|---|---|---|---|---|
| 0001754520 | 4809 | 4002 | 4A09 | 4902 | 4B09 | 6502 | 4E09 | 6B02 |
| 0001754540 | 5409 | 6E02 | 5709 | 8A02 | 5809 | A602 | 5C09 | AC02 |
| 0001754560 | 5E09 | AF02 | 5F09 | B802 | 6009 | CE02 | 6109 | D602 |
| 0001754600 | 6409 | DC02 | 8309 | E702 | 8809 | F702 | A109 | 0102 |
| 0001754620 | A20A | 3102 | A60A | 4202 | A70A | 5A02 | A80A | 6E02 |
| 0001754640 | AB0A | 7F02 | AD0A | 8502 | CC0A | 9002 | D10A | A002 |
| 0001754660 | D40A | A602 | D50A | AB02 | E10A | AE02 | E20A | C102 |
| 0001754700 | E30A | C602 | E40A | C902 | E50A | CE02 | E80A | D102 |
| 0001754720 | E90A | D602 | EC0A | D902 | ED0A | DF02 | EF0A | 0402 |
| 0001754740 | F20B | 1702 | F30B | 4502 | F80B | 5802 | F90B | 9102 |
| 0001754760 | FA0B | A002 | FE0B | B902 | 000B | E703 | 010B | EA03 |
| 0001755000 | 020B | F003 | 050B | F303 | 060B | 2103 | 080C | 2703 |
| 0001755020 | 200C | 3203 | 230C | 4203 | 240C | 5603 | 270C | 6503 |
| 0001755040 | 290C | 8003 | 400C | 8B03 | 450C | 9B03 | 460C | B203 |
| 0001755060 | 480C | C603 | 490C | E203 | 4A0C | F503 | 4D0C | FB03 |
| 0001755100 | 4E0C | 0D03 | 4F0D | 1F03 | 500D | 31D3 | 550D | 5303 |
| 0001755120 | 570D | 5603 | 5A0D | 6B03 | 5C0D | 71D3 | 780D | 7C03 |
| 0001755140 | 7A0D | 8C03 | 7E0D | 9103 | 810D | 9E03 | 860D | EB03 |
| 0001755160 | 870D | 0103 | 8B0E | 0703 | 8D0E | 1E03 | A70E | 2903 |
| 0001755200 | A80E | 3903 | A90E | 3E03 | AA0E | 4303 | B00E | 4803 |
| 0001755220 | B10E | 5B03 | B30E | 7603 | B70E | 8503 | BD0E | 9903 |
| 0001755240 | BF0E | C803 | C00E | D703 | C10E | EA03 | C20E | EF03 |
| 0001755260 | C30E | F203 | C40E | FC03 | C50E | 1303 | C60F | 2603 |
| 0001755300 | C70F | 2B03 | CA0F | 2E03 | CB0F | 5403 | CC0F | 5D03 |
| 0001755320 | D10F | 6C03 | D20F | 7E03 | D30F | 9003 | D40F | A203 |
| 0001755340 | D60F | C303 | D80F | C903 | F00F | D403 | F20F | E403 |
| 0001755360 | F40F | E903 | F50F | FD03 | F60F | 1103 | F710 | 1A03 |
| 0001755400 | F810 | 2003 | FA10 | 2303 | FB10 | 2903 | 1310 | 3404 |
| 0001755420 | 1910 | 4404 | 1A10 | 7804 | 1C10 | 8704 | 2310 | 8D04 |
| 0001755440 | 2510 | BE04 | 2610 | CD04 | 2810 | DC04 | 2910 | EE04 |
| 0001755460 | 2B10 | F404 | 4110 | FF04 | 4410 | 0F04 | 4511 | 1504 |
| 0001755500 | 6711 | 2004 | 6911 | 3004 | 6A11 | 3604 | 6E11 | 3B04 |
| 0001755520 | 7111 | 5204 | 7611 | 7C04 | 7811 | 9C04 | 7911 | B504 |
| 0001755540 | 7D11 | CE04 | 8011 | D104 | 8111 | FF04 | 8511 | 0E04 |
| 0001755560 | 8A12 | 5B04 | 8C12 | 6104 | 8E12 | 6404 | 9212 | 7904 |
| 0001755600 | 9712 | C104 | 9A12 | DD04 | 9F12 | E504 | A012 | 0304 |
| 0001755620 | A213 | 1204 | A513 | 2604 | A613 | 3304 | A813 | 3C04 |
| 0001755640 | A913 | 5C04 | AA13 | 5F04 | AC13 | 7904 | AE13 | 8204 |
| 0001755660 | AF13 | 9604 | B313 | 9C04 | B513 | A204 | DE13 | AD04 |
| 0001755700 | E613 | BD04 | EA13 | C304 | EC13 | F404 | ED13 | 2804 |
| 0001755720 | EE14 | 3104 | F014 | 4704 | F514 | 4C04 | F614 | 7B04 |
| 0001755740 | F714 | 8E04 | F914 | A404 | FA14 | B004 | FC14 | BA04 |
| 0001755760 | FD14 | BF04 | FF14 | C804 | 0114 | D205 | 0414 | 1605 |
| 0001756000 | 0615 | 2E05 | 0715 | 3D05 | 0A15 | 4905 | 0B15 | 5705 |
| 0001756020 | 0E15 | 5B05 | 0F15 | 7C05 | 1215 | 9105 | 1315 | AF05 |
| 0001756040 | 1915 | C205 | 1A15 | E305 | 1B15 | 0005 | 1C16 | 1305 |
| 0001756060 | 1D16 | 3005 | 2516 | 3605 | 2816 | 6505 | 2916 | 6F05 |
| 0001756100 | 2C16 | 7405 | 2D16 | 8305 | 2E16 | 8905 | 3116 | 8C05 |
| 0001756120 | 3216 | 9605 | 3416 | 9B05 | 3516 | A405 | 3716 | BD05 |
| 0001756140 | 3816 | DD05 | 3916 | E605 | 3A16 | F605 | 3B16 | F905 |
| 0001756160 | 3C16 | 0905 | 3E17 | 0F05 | 4017 | 1205 | 4317 | 2005 |
| 0001756200 | 4517 | 3905 | 4817 | 5005 | 4B17 | 5605 | 0A17 | 7464 |
| 0001756220 | 5F73 | 6966 | 656C | 632E | 0003 | 0129 | 0095 | 1762 |
| 0001756240 | 0098 | 1772 | 0099 | 17A2 | 009B | 17B8 | 009C | 17BB |
| 0001756260 | 009D | 17DB | 00A0 | 17F1 | 00C4 | 17FC | 00C5 | 180C |
| 0001756300 | 00C6 | 1814 | 00CA | 1819 | 00CB | 182F | 00CF | 1835 |
| 0001756320 | 00D0 | 184D | 00D1 | 1858 | 00D5 | 186F | 00D6 | 1880 |
| 0001756340 | 00D7 | 1891 | 00D8 | 1896 | 00DA | 189B | 00DB | 18A7 |
| 0001756360 | 00DC | 18B1 | 00DF | 18C3 | 00E3 | 18E4 | 00E4 | 1901 |

THU MAR 14 17:31:54 1991 DB_PI.DLL PAGE 444, LINE 26138

| | | | | | | | | |
|---|---|---|---|---|---|---|---|---|
| 0001756400 | 00EB | 1918 | 00EC | 193F | 00EF | 1956 | 00F3 | 1972 |
| 0001756420 | 00F4 | 19A7 | 00F8 | 19BE | 00F9 | 19D4 | 00FC | 19DA |
| 0001756440 | 00FD | 19E3 | 0100 | 19F1 | 0104 | 19F7 | 0105 | 1A02 |
| 0001756460 | 0106 | 1A10 | 0108 | 1A1E | 010A | 1A24 | 012B | 1A2F |
| 0001756500 | 0131 | 1A3F | 0132 | 1A47 | 0135 | 1A4C | 0137 | 1A5D |
| 0001756520 | 0138 | 1A67 | 013B | 1A7B | 013C | 1A90 | 013D | 1A9B |
| 0001756540 | 0140 | 1AB2 | 0141 | 1ACF | 014B | 1AE6 | 014C | 1AF7 |
| 0001756560 | 0151 | 1B08 | 0152 | 1B2B | 0155 | 1B42 | 0156 | 1B53 |
| 0001756600 | 015A | 1B64 | 015C | 1B8E | 015D | 1B9F | 015E | 1BA9 |
| 0001756620 | 0165 | 1BC0 | 0166 | 1BF5 | 0169 | 1C0C | 016A | 1C22 |
| 0001756640 | 016C | 1C39 | 0170 | 1C3F | 0171 | 1C48 | 0172 | 1C53 |
| 0001756660 | 0175 | 1C61 | 0177 | 1C67 | 0183 | 1C72 | 0187 | 1C82 |
| 0001756700 | 018A | 1C8F | 018B | 1CAA | 018F | 1CB3 | 0192 | 1CCB |
| 0001756720 | 0193 | 1CD7 | 0196 | 1CE6 | 0197 | 1CEF | 0198 | 1CF8 |
| 0001756740 | 019A | 1CFB | 01B4 | 1D06 | 01B8 | 1D16 | 01B9 | 1D20 |
| 0001756760 | 01BA | 1D29 | 01BB | 1D42 | 01BE | 1D48 | 01C1 | 1D5E |
| 0001757000 | 01C5 | 1D78 | 01C6 | 1D85 | 01C7 | 1D92 | 01C8 | 1DA4 |
| 0001757020 | 01C9 | 1DAA | 01CA | 1DB3 | 01CC | 1DBC | 01CE | 1DC2 |
| 0001757040 | 01E8 | 1DCD | 01EB | 1DDD | 01EC | 1DF3 | 01ED | 1DF9 |
| 0001757060 | 01EE | 1DFC | 01F0 | 1E02 | 0209 | 1E0D | 020D | 1E1D |
| 0001757100 | 020E | 1E3B | 0210 | 1E4D | 0228 | 1E58 | 022A | 1E68 |
| 0001757120 | 022E | 1E6D | 0231 | 1E81 | 0234 | 1E9A | 0236 | 1EBC |
| 0001757140 | 0238 | 1EC2 | 025A | 1ECD | 025B | 1EDD | 0261 | 1EE2 |
| 0001757160 | 0262 | 1EF8 | 026C | 1EFE | 026E | 1F44 | 0270 | 1F4A |
| 0001757200 | 0274 | 1F50 | 0276 | 1F56 | 0278 | 1F5C | 027C | 1F62 |
| 0001757220 | 027E | 1F68 | 0280 | 1F6E | 0285 | 1FC0 | 0286 | 1FD0 |
| 0001757240 | 0289 | 1FD6 | 028A | 1FDF | 028B | 1FFB | 028C | 1FFE |
| 0001757260 | 028E | 201A | 028F | 2029 | 0294 | 2040 | 0295 | 2051 |
| 0001757300 | 0296 | 2062 | 0297 | 2067 | 0299 | 206C | 029A | 2078 |
| 0001757320 | 029B | 2082 | 029E | 2094 | 02A1 | 20B5 | 02A4 | 20BE |
| 0001757340 | 02A5 | 20DF | 02A8 | 20F6 | 02A9 | 2119 | 02AC | 2130 |
| 0001757360 | 02B0 | 2136 | 02B1 | 2145 | 02B2 | 2157 | 02B4 | 2165 |
| 0001757400 | 02B6 | 216B | 02CE | 2176 | 02D3 | 2186 | 02D4 | 219C |
| 0001757420 | 02D5 | 21A2 | 02D6 | 21BE | 02D7 | 21C4 | 02DA | 21DB |
| 0001757440 | 02DB | 21F2 | 02DC | 220C | 02DD | 2222 | 02DE | 2228 |
| 0001757460 | 02DF | 222E | 02F7 | 2239 | 02FD | 2249 | 02FF | 224E |
| 0001757500 | 0300 | 2262 | 0301 | 2274 | 0303 | 227A | 0304 | 228F |
| 0001757520 | 0305 | 22AC | 0308 | 22B2 | 0309 | 22D2 | 030A | 22E1 |
| 0001757540 | 030C | 22E7 | 030D | 22ED | 0325 | 22F8 | 032B | 2308 |
| 0001757560 | 032D | 230D | 032E | 2321 | 032F | 2333 | 0331 | 2339 |
| 0001757600 | 0332 | 234E | 0333 | 236B | 0336 | 2371 | 0337 | 2391 |
| 0001757620 | 0338 | 23A0 | 033A | 23A6 | 033B | 23AC | 0358 | 23B7 |
| 0001757640 | 035D | 23C7 | 035F | 23CC | 0360 | 23DF | 0361 | 23EA |
| 0001757660 | 0362 | 23F0 | 0367 | 240B | 0369 | 2431 | 036A | 2445 |
| 0001757700 | 036B | 2457 | 036C | 245D | 036E | 246F | 036F | 247A |
| 0001757720 | 0370 | 2498 | 0373 | 249E | 0374 | 24BF | 0375 | 24DA |
| 0001757740 | 0376 | 24E0 | 0378 | 24E6 | 0394 | 24F1 | 0399 | 2501 |
| 0001757760 | 039B | 2506 | 039C | 251B | 039D | 2526 | 039E | 252C |
| 0001760000 | 03A3 | 2557 | 03A5 | 257D | 03A6 | 2591 | 03A7 | 25A3 |
| 0001760020 | 03A8 | 25A9 | 03AA | 25BB | 03AB | 25C6 | 03AC | 25E4 |
| 0001760040 | 03AF | 25EA | 03B0 | 260B | 03B1 | 2626 | 03B2 | 262C |
| 0001760060 | 03B4 | 2632 | 03C4 | 263D | 03C8 | 264D | 03CC | 265A |
| 0001760100 | 03CD | 2681 | 03D0 | 268A | 03D3 | 2696 | 03D4 | 26A2 |
| 0001760120 | 03D7 | 26B1 | 03D8 | 26BA | 03D9 | 26C3 | 03DB | 26C6 |
| 0001760140 | 03F8 | 26D1 | 03F9 | 26E1 | 03FC | 26E6 | 03FD | 26F0 |
| 0001760160 | 03FE | 26F9 | 03FF | 2712 | 0403 | 2718 | 0406 | 272E |
| 0001760200 | 0409 | 2739 | 040B | 275D | 040D | 2760 | 040E | 276E |
| 0001760220 | 040F | 2777 | 0413 | 277D | 0414 | 278A | 0415 | 2797 |
| 0001760240 | 0416 | 279D | 0417 | 27AA | 0418 | 27B0 | 041B | 27C1 |

THU MAR 14 17:31:54 1991 DB_PI.DLL PAGE 445, LINE 26197

| | | | | | | | | |
|---|---|---|---|---|---|---|---|---|
| 0001760260 | 041C | 27D5 | 041F | 27E6 | 0420 | 27EF | 0422 | 27F8 |
| 0001760300 | 0424 | 27FE | 043A | 2809 | 043C | 2819 | 043D | 2824 |
| 0001760320 | 043F | 282A | 0440 | 2840 | 0441 | 2846 | 0442 | 2849 |
| 0001760340 | 0444 | 284F | 045F | 285A | 0465 | 286A | 0467 | 287A |
| 0001760360 | 0469 | 2894 | 046A | 28B2 | 046B | 28BB | 046D | 28C1 |
| 0001760400 | 046E | 28CE | 046F | 28F0 | 0470 | 28F9 | 0475 | 28FF |
| 0001760420 | 0478 | 2922 | 047B | 295D | 047C | 2992 | 047D | 299B |
| 0001760440 | 047E | 29A1 | 0480 | 29A4 | 0481 | 29BB | 0482 | 29C4 |
| 0001760460 | 0484 | 29CA | 0485 | 29D3 | 0488 | 29E1 | 0489 | 29E7 |
| 0001760500 | 6409 | 6974 | 745F | 6C62 | 632E | 0003 | 004B | 0040 |
| 0001760520 | 29F2 | 0047 | 2A02 | 0048 | 2A14 | 004C | 2A1A | 004D |
| 0001760540 | 2A39 | 0050 | 2A48 | 0052 | 2A62 | 0057 | 2A79 | 005C |
| 0001760560 | 2AB8 | 005E | 2AD0 | 005F | 2AD9 | 0062 | 2ADF | 0064 |
| 0001760600 | 2AE9 | 0066 | 2AF3 | 0073 | 2B0A | 0074 | 2B2E | 0075 |
| 0001760620 | 2B37 | 007A | 2B3D | 007C | 2B43 | 0097 | 2B4E | 009E |
| 0001760640 | 2B5E | 009F | 2B6E | 00A1 | 2B7D | 00A4 | 2B8D | 00A9 |
| 0001760660 | 2BAF | 00AA | 2BC9 | 00B0 | 2BD8 | 00B1 | 2BF9 | 00B5 |
| 0001760700 | 2C08 | 00B7 | 2C0E | 00CE | 2C19 | 00D3 | 2C29 | 00D4 |
| 0001760720 | 2C39 | 00D7 | 2C48 | 00D9 | 2C56 | 00DA | 2C67 | 00DB |
| 0001760740 | 2C7A | 00DE | 2C80 | 00E0 | 2C86 | 0104 | 2C91 | 010F |
| 0001760760 | 2CA1 | 0110 | 2CAA | 0112 | 2CB0 | 0113 | 2CB5 | 0114 |
| 0001761000 | 2CC1 | 0119 | 2CC7 | 011A | 2CF1 | 011B | 2D04 | 011D |
| 0001761020 | 2D0A | 011E | 2D0F | 011F | 2D14 | 0120 | 2D2D | 0121 |
| 0001761040 | 2D42 | 0123 | 2D4A | 0125 | 2D53 | 0126 | 2D61 | 0128 |
| 0001761060 | 2D65 | 0129 | 2D88 | 012D | 2D9D | 012E | 2DCD | 0133 |
| 0001761100 | 2DC6 | 0136 | 2DF0 | 0137 | 2DFA | 0139 | 2DFF | 013D |
| 0001761120 | 2E02 | 013E | 2E0C | 0141 | 2E1A | 0142 | 2E40 | 0143 |
| 0001761140 | 2E4F | 0145 | 2E55 | 0147 | 2E5B | 0148 | 2E5E | 0149 |
| 0001761160 | 2E7C | 014A | 2E84 | 014D | 2E8A | 2E0B | 2F2E | 6E69 |
| 0001761200 | 5C63 | 7464 | 682E | 0003 | 0001 | 004B | 2E96 | 6409 |
| 0001761220 | 6674 | 745F | 6C62 | 632E | 0003 | 0050 | 004E | 2EA6 |
| 0001761240 | 0059 | 2EB0 | 005A | 2ED4 | 0071 | 2EDF | 0075 | 2EEF |
| 0001761260 | 0078 | 2EF5 | 0079 | 2EFA | 007D | 2EFD | 007E | 2F02 |
| 0001761300 | 0081 | 2F05 | 0082 | 2F0A | 0085 | 2F0D | 0086 | 2F13 |
| 0001761320 | 0088 | 2F38 | 008B | 2F46 | 008C | 2F6E | 008F | 2F81 |
| 0001761340 | 0090 | 2FA2 | 0094 | 2FBB | 0096 | 2FE3 | 0097 | 2FE6 |
| 0001761360 | 0099 | 2FEC | 009C | 2FEF | 009D | 3017 | 009F | 301D |
| 0001761400 | 00B6 | 3028 | 00B8 | 3038 | 00BA | 3046 | 00BB | 305C |
| 0001761420 | 00BC | 305F | 00BE | 3065 | 00D6 | 3070 | 00DA | 3080 |
| 0001761440 | 00DB | 3090 | 00DE | 309F | 00E0 | 30AD | 00E1 | 30BE |
| 0001761460 | 00E2 | 30D1 | 00E5 | 30D7 | 00E7 | 30DD | 0100 | 30E8 |
| 0001761500 | 0101 | 30F8 | 0105 | 30FD | 0106 | 311E | 0107 | 3131 |
| 0001761520 | 0108 | 3137 | 012E | 3142 | 0139 | 3152 | 013B | 3161 |
| 0001761540 | 013C | 3166 | 013D | 3172 | 0142 | 3177 | 0143 | 319F |
| 0001761560 | 0144 | 31B2 | 0146 | 31B8 | 0147 | 31BD | 0148 | 31C2 |
| 0001761600 | 0149 | 31DB | 014B | 31F0 | 014D | 31F9 | 014E | 3207 |
| 0001761620 | 0150 | 320B | 0151 | 322E | 0155 | 3243 | 0156 | 3265 |
| 0001761640 | 015B | 326B | 015E | 3293 | 015F | 329D | 0160 | 32A2 |
| 0001761660 | 0163 | 32A5 | 0164 | 32AF | 0167 | 32BD | 0168 | 32E3 |
| 0001761700 | 0169 | 32F2 | 016B | 32F8 | 016D | 32FE | 016E | 3301 |
| 0001761720 | 016F | 331F | 0170 | 3327 | 0173 | 332D | 6409 | 6174 |
| 0001761740 | 745F | 6C62 | 632E | 0003 | 0048 | 0045 | 3338 | 0048 |
| 0001761760 | 3348 | 0053 | 3352 | 0054 | 3376 | 0070 | 3381 | 0074 |
| 0001762000 | 3391 | 0077 | 3397 | 0078 | 339C | 007C | 339F | 007D |
| 0001762020 | 33A4 | 0080 | 33A7 | 0081 | 33AC | 0084 | 33AF | 0085 |
| 0001762040 | 33B5 | 0088 | 33DA | 008B | 33E8 | 008C | 3410 | 008F |
| 0001762060 | 3423 | 0090 | 3444 | 0091 | 3453 | 0095 | 346C | 0097 |
| 0001762100 | 3494 | 0098 | 3497 | 0099 | 349D | 009C | 34A0 | 009D |
| 0001762120 | 34C8 | 009F | 34CE | 00B6 | 34D9 | 00B8 | 34E9 | 00BA |

THU MAR 14 17:31:54 1991 DB_PI.DLL PAGE 446, LINE 26256

| | | | | | | | | |
|---|---|---|---|---|---|---|---|---|
| 0001762140 | 34F7 | 00BB | 350D | 00BC | 3510 | 00BE | 3516 | 00D6 |
| 0001762160 | 3521 | 00D7 | 3531 | 00DA | 3536 | 00DB | 3557 | 00DC |
| 0001762200 | 356A | 00DD | 3570 | 00F9 | 357B | 0104 | 358B | 0105 |
| 0001762220 | 3590 | 0106 | 3599 | 010B | 359E | 010C | 35C9 | 010D |
| 0001762240 | 35DC | 010F | 35E2 | 0110 | 35E7 | 0111 | 35EC | 0112 |
| 0001762260 | 3605 | 0114 | 361A | 0116 | 3623 | 0117 | 3631 | 0119 |
| 0001762300 | 3635 | 011A | 3658 | 011E | 366D | 011F | 3689 | 0124 |
| 0001762320 | 368F | 0127 | 36BA | 0128 | 36C4 | 0129 | 36C9 | 012C |
| 0001762340 | 36CC | 012D | 36D6 | 0130 | 36E4 | 0131 | 370A | 0132 |
| 0001762360 | 3719 | 0134 | 371F | 0136 | 3725 | 0137 | 3728 | 0138 |
| 0001762400 | 3746 | 0139 | 374E | 013C | 3754 | 6409 | 6774 | 615F |
| 0001762420 | 6363 | 632E | 0003 | 005C | 0047 | 3760 | 004A | 3770 |
| 0001762440 | 004C | 37A0 | 0057 | 37AA | 0058 | 37CF | 0073 | 37DA |
| 0001762460 | 0077 | 37EA | 007A | 37F0 | 007B | 37F5 | 0088 | 37F8 |
| 0001762500 | 0089 | 380B | 008A | 3810 | 008B | 3813 | 008C | 3818 |
| 0001762520 | 008F | 381B | 0090 | 3820 | 0093 | 3823 | 0094 | 3829 |
| 0001762540 | 0096 | 384E | 0099 | 3861 | 009A | 388F | 009E | 38A2 |
| 0001762560 | 009F | 38CB | 00A0 | 38DA | 00A4 | 38F3 | 00A6 | 3921 |
| 0001762600 | 00A7 | 3924 | 00A8 | 392A | 00AB | 392D | 00AC | 395B |
| 0001762620 | 00AE | 3961 | 00C6 | 396C | 00C9 | 397C | 00CB | 3997 |
| 0001762640 | 00E3 | 39A2 | 00E7 | 39B2 | 00E8 | 39C7 | 00EA | 39DA |
| 0001762660 | 00EB | 39F5 | 00EE | 3A04 | 00F0 | 3A0D | 010B | 3A18 |
| 0001762700 | 010C | 3A28 | 010F | 3A2D | 0110 | 3A53 | 0111 | 3A5C |
| 0001762720 | 0112 | 3A6B | 0114 | 3A71 | 012D | 3A7C | 012F | 3A8C |
| 0001762740 | 0131 | 3A91 | 0133 | 3AA6 | 0134 | 3ACC | 0135 | 3AD5 |
| 0001762760 | 0136 | 3ADB | 0137 | 3ADE | 0138 | 3AED | 013A | 3AF0 |
| 0001763000 | 013B | 3AF6 | 0159 | 3B01 | 0164 | 3B11 | 0165 | 3B16 |
| 0001763020 | 0166 | 3B1F | 016B | 3B24 | 016C | 3B54 | 016D | 3B67 |
| 0001763040 | 016F | 3B6D | 0170 | 3B72 | 0171 | 3B77 | 0172 | 3B90 |
| 0001763060 | 0174 | 3BA5 | 0176 | 3BAE | 0177 | 3BBC | 0179 | 3BC0 |
| 0001763100 | 017A | 3BE3 | 017E | 3BF8 | 017F | 3C14 | 0184 | 3C1A |
| 0001763120 | 0187 | 3C4A | 0188 | 3C54 | 0189 | 3C59 | 018C | 3C5C |
| 0001763140 | 018D | 3C66 | 0190 | 3C74 | 0191 | 3C9A | 0192 | 3CA9 |
| 0001763160 | 0194 | 3CAF | 0196 | 3CB5 | 0197 | 3CB8 | 0198 | 3CD6 |
| 0001763200 | 0199 | 3CDE | 019C | 3CE4 | 640A | 6D74 | 635F | 6168 |
| 0001763220 | 2E72 | 0363 | 1100 | 3E00 | F000 | 433C | 0000 | 443D |
| 0001763240 | 0600 | 4A3D | 1200 | 4C3D | 1500 | 4D3D | 1800 | 4E3D |
| 0001763260 | 1A00 | 4F3D | 1D00 | 503D | 1F00 | 513D | 2100 | 523D |
| 0001763300 | 2500 | 533D | 2800 | 543D | 2C00 | 553D | 2E00 | 593D |
| 0001763320 | 3100 | 5A3D | 3D00 | 5D3D | 4600 | 083D | 6264 | 635F |
| 0001763340 | 6766 | 632E | 0003 | 013F | 0082 | 3D52 | 0084 | 3D62 |
| 0001763360 | 008D | 3D76 | 008E | 3D88 | 0090 | 3D9A | 0091 | 3DA0 |
| 0001763400 | 009D | 3DAB | 00A0 | 3DBB | 00A1 | 3DCD | 00A3 | 3DD8 |
| 0001763420 | 00A6 | 3DE0 | 00A7 | 3DF4 | 00A8 | 3E11 | 00AA | 3E23 |
| 0001763440 | 00AB | 3E35 | 00AC | 3E3B | 00BA | 3E46 | 00BE | 3E56 |
| 0001763460 | 00C1 | 3E64 | 00C2 | 3E7A | 00C5 | 3E85 | 00C8 | 3E8B |
| 0001763500 | 00C9 | 3E8E | 00CA | 3EA0 | 00CC | 3EB2 | 00CD | 3EB8 |
| 0001763520 | 0119 | 3EC3 | 011A | 3ED9 | 0121 | 3F70 | 0122 | 3F75 |
| 0001763540 | 0123 | 3F7F | 0125 | 3F84 | 0126 | 3F8F | 0128 | 4013 |
| 0001763560 | 0129 | 4028 | 012B | 403C | 012C | 404B | 012D | 4056 |
| 0001763600 | 012E | 405B | 012F | 405E | 0130 | 406A | 0131 | 407E |
| 0001763620 | 0132 | 4087 | 0136 | 410C | 0137 | 412C | 0138 | 4143 |
| 0001763640 | 0139 | 414C | 013E | 41D1 | 013F | 41EC | 0141 | 41FE |
| 0001763660 | 0142 | 421B | 0147 | 42AD | 0148 | 42BD | 0149 | 42C6 |
| 0001763700 | 014E | 434B | 014F | 435C | 0150 | 4365 | 0151 | 4379 |
| 0001763720 | 0155 | 43FE | 0158 | 4436 | 0159 | 4448 | 015A | 444D |
| 0001763740 | 015B | 4456 | 015C | 446A | 0160 | 44EF | 0161 | 4506 |
| 0001763760 | 0167 | 458A | 0168 | 459B | 0169 | 45A4 | 016A | 45B8 |
| 0001764000 | 016D | 463D | 0171 | 4675 | 0172 | 4687 | 0173 | 468C |

THU MAR 14 17:31:54 1991 DB_PI.DLL PAGE 447, LINE 26315

| | | | | | | | | |
|---|---|---|---|---|---|---|---|---|
| 0001764020 | 0174 | 4695 | 0175 | 46A9 | 017C | 472E | 017D | 4737 |
| 0001764040 | 017E | 474E | 017F | 4757 | 0180 | 476B | 0184 | 47F0 |
| 0001764060 | 018A | 4828 | 018B | 483A | 018C | 484E | 0191 | 48D2 |
| 0001764100 | 0193 | 4957 | 01B7 | 4965 | 01B8 | 497B | 01BA | 4A0E |
| 0001764120 | 01BC | 4AA8 | 01CA | 4AB6 | 01CD | 4AC6 | 01CF | 4ACC |
| 0001764140 | 01D0 | 4AEA | 01D1 | 4AF0 | 01D2 | 4AF6 | 01D4 | 4AF9 |
| 0001764160 | 01D5 | 4B17 | 01D6 | 4B1D | 01D7 | 4B23 | 01D9 | 4B26 |
| 0001764200 | 01DA | 4B44 | 01DB | 4B4A | 01DC | 4B4D | 01DD | 4B6A |
| 0001764220 | 01E6 | 4B70 | 01E7 | 4B74 | 01E8 | 4B7D | 01E9 | 4B89 |
| 0001764240 | 01EA | 4B9F | 01EB | 4BA2 | 01ED | 4BA5 | 01EF | 4BD7 |
| 0001764260 | 01F0 | 4C09 | 01F2 | 4C0F | 01F3 | 4C12 | 01F6 | 4C1A |
| 0001764300 | 01F7 | 4C1D | 01F9 | 4C25 | 01FA | 4C2B | 01FC | 4C2E |
| 0001764320 | 01FD | 4C4C | 01FE | 4C52 | 01FF | 4C58 | 0201 | 4C5B |
| 0001764340 | 0202 | 4C61 | 0204 | 4C80 | 0205 | 4C86 | 0233 | 4C91 |
| 0001764360 | 0234 | 4CA7 | 0237 | 4D3A | 023B | 4D3F | 0241 | 4D47 |
| 0001764400 | 0244 | 4D5F | 0245 | 4D74 | 0246 | 4D78 | 0248 | 4D85 |
| 0001764420 | 0249 | 4D9B | 024A | 4DA4 | 024C | 4E22 | 024D | 4E42 |
| 0001764440 | 024E | 4E4B | 0250 | 4EC9 | 0251 | 4ED5 | 0252 | 4EE3 |
| 0001764460 | 0255 | 4F60 | 0256 | 4F7A | 0257 | 4F88 | 0259 | 5006 |
| 0001764500 | 028F | 5014 | 0290 | 502A | 0293 | 50BD | 0296 | 50C2 |
| 0001764520 | 0299 | 50C7 | 029A | 50CC | 029B | 50D4 | 02A0 | 50DC |
| 0001764540 | 02A1 | 50F1 | 02A2 | 50F5 | 02A4 | 5102 | 02A5 | 5118 |
| 0001764560 | 02A6 | 5121 | 02A8 | 519F | 02AA | 51A5 | 02AB | 51AA |
| 0001764600 | 02AD | 51AD | 02AE | 51B2 | 02B0 | 51B5 | 02B1 | 51BA |
| 0001764620 | 02B3 | 51BD | 02B4 | 51C2 | 02B6 | 51C5 | 02B7 | 5242 |
| 0001764640 | 02B9 | 5261 | 02BA | 5281 | 02BC | 5308 | 02BD | 5314 |
| 0001764660 | 02C0 | 5319 | 02C1 | 532C | 02C2 | 53B4 | 02C4 | 53B9 |
| 0001764700 | 02C7 | 53D0 | 02C9 | 53DB | 02CA | 53F9 | 02CB | 5404 |
| 0001764720 | 02CC | 5412 | 02CE | 548F | 02D3 | 5493 | 02D4 | 54B5 |
| 0001764740 | 02D5 | 54BE | 02D6 | 54CC | 02D8 | 54CF | 02DA | 54D2 |
| 0001764760 | 02DB | 54E8 | 02DC | 54F6 | 02DE | 54F9 | 02E1 | 5507 |
| 0001765000 | 02E2 | 5529 | 02E6 | 55A6 | 02E7 | 55BD | 02E8 | 55CB |
| 0001765020 | 02EB | 5648 | 02EC | 5658 | 02ED | 5661 | 02EE | 56DE |
| 0001765040 | 031C | 56EC | 031D | 5702 | 0320 | 5795 | 0324 | 579A |
| 0001765060 | 0325 | 57A4 | 032B | 57AC | 032C | 57BE | 032F | 583B |
| 0001765100 | 0330 | 5850 | 0331 | 5854 | 0334 | 5861 | 0335 | 5877 |
| 0001765120 | 0336 | 5880 | 0338 | 58FE | 0339 | 591E | 0343 | 59A5 |
| 0001765140 | 0345 | 59AE | 0346 | 59BA | 0348 | 59C4 | 0349 | 59CD |
| 0001765160 | 034A | 59D9 | 034B | 59E4 | 034C | 5A12 | 034D | 5A1B |
| 0001765200 | 034E | 5A1E | 034F | 5A21 | 0352 | 5A28 | 0353 | 5A3A |
| 0001765220 | 0356 | 5A47 | 0357 | 5A53 | 0358 | 5A5F | 0359 | 5A62 |
| 0001765240 | 035B | 5A65 | 035C | 5A71 | 035D | 5A74 | 035E | 5A77 |
| 0001765260 | 0360 | 5A7A | 0361 | 5A81 | 0362 | 5A91 | 0364 | 5B0E |
| 0001765300 | 0379 | 5B1C | 037A | 5B32 | 037B | 5B3B | 037C | 5B3E |
| 0001765320 | 037D | 5B56 | 037E | 5B59 | 037F | 5B67 | 03A5 | 5B75 |
| 0001765340 | 03A9 | 5B8B | 03AA | 5B90 | 03AC | 5B95 | 03B0 | 5B9D |
| 0001765360 | 03B2 | 5C30 | 03B3 | 5C45 | 03B4 | 5C49 | 03B7 | 5C56 |
| 0001765400 | 03B8 | 5C6C | 03B9 | 5C75 | 03BB | 5CF3 | 03BC | 5D13 |
| 0001765420 | 03BD | 5D1C | 03C0 | 5D9A | 03C1 | 5DB0 | 03C2 | 5DBF |
| 0001765440 | 03C3 | 5DCD | 03C5 | 5E4A | 03C6 | 5E52 | 03C7 | 5E57 |
| 0001765460 | 03C9 | 5E6F | 03CB | 5E7B | 03CD | 5E8D | 03CE | 5E97 |
| 0001765500 | 03CF | 5EA0 | 03D0 | 5EAC | 03D1 | 5EB7 | 03D2 | 5EBA |
| 0001765520 | 03D3 | 5EDB | 03D5 | 5EDE | 03D6 | 5EEA | 03D7 | 5EED |
| 0001765540 | 03D8 | 5EF0 | 03D9 | 5F1E | 03DB | 5F21 | 03DC | 5F2D |
| 0001765560 | 03DE | 5F30 | 03DF | 5F3C | 03E4 | 5F43 | 03E7 | 5F51 |
| 0001765600 | 03E8 | 5F7A | 03EA | 5F89 | 03EB | 5F97 | 03EC | 5FA6 |
| 0001765620 | 03EE | 6023 | 03F1 | 6027 | 03F2 | 6057 | 03F3 | 6072 |
| 0001765640 | 03F5 | 6080 | 03F6 | 6086 | 03F7 | 60A4 | 03F8 | 60B0 |
| 0001765660 | 03F9 | 60CE | 03FA | 60E0 | 03FB | 60EC | 03FE | 6169 |

THU MAR 14 17:31:54 1991 DB_PI.DLL PAGE 448, LINE 26374

| | | | | | | | | |
|---|---|---|---|---|---|---|---|---|
| 0001765700 | 03FF | 618D | 0401 | 6193 | 0404 | 6196 | 0405 | 61A4 |
| 0001765720 | 0406 | 61CA | 0407 | 61D9 | 0408 | 61E1 | 040B | 625E |
| 0001765740 | 040D | 62DB | 6409 | 6374 | 6C5F | 7865 | 6C2E | 0003 |
| 0001765760 | 01C1 | 008A | 62EA | 0094 | 62FA | 0095 | 630A | 0098 |
| 0001766000 | 6310 | 0099 | 6316 | 00A6 | 6321 | 00A9 | 6331 | 00AA |
| 0001766020 | 6358 | 00AC | 6366 | 00AD | 637E | 00AF | 639F | 00B0 |
| 0001766040 | 63AE | 00B1 | 63B6 | 00B3 | 63C4 | 00B7 | 63CE | 00B8 |
| 0001766060 | 63D8 | 00B9 | 63DB | 00BA | 63DE | 00BB | 63E8 | 00BC |
| 0001766100 | 6400 | 00BD | 6403 | 027F | 640E | 0282 | 641E | 0283 |
| 0001766120 | 6436 | 0286 | 6442 | 0287 | 644C | 0288 | 6459 | 028A |
| 0001766140 | 645F | 028D | 6495 | 028E | 649B | 0290 | 64EF | 0291 |
| 0001766160 | 64F8 | 0293 | 64FE | 0294 | 650B | 0296 | 6511 | 0297 |
| 0001766200 | 6547 | 029A | 654F | 029B | 6555 | 029E | 655C | 02A0 |
| 0001766220 | 656C | 02A2 | 65B6 | 02A3 | 65BC | 02A7 | 65C7 | 02A8 |
| 0001766240 | 65D7 | 02AA | 65F0 | 02AC | 65FA | 02AE | 65FD | 02AF |
| 0001766260 | 660E | 02B0 | 6616 | 02B1 | 6622 | 02B2 | 6623 | 02B4 |
| 0001766300 | 6626 | 02B5 | 6630 | 02B8 | 6636 | 02B9 | 6640 | 02BB |
| 0001766320 | 664E | 02BC | 6668 | 02BE | 6671 | 02C0 | 6680 | 02C1 |
| 0001766340 | 66CA | 02C5 | 66D5 | 02CE | 66E5 | 02CF | 66EF | 02D0 |
| 0001766360 | 6725 | 02D1 | 672B | 02D3 | 6731 | 02D6 | 6734 | 02D9 |
| 0001766400 | 673A | 02DB | 6784 | 00F4 | 678A | 00F5 | 6794 | 00F7 |
| 0001766420 | 679A | 00F8 | 679D | 00FA | 67A3 | 00FB | 67A6 | 00FD |
| 0001766440 | 67AC | 00FE | 67AF | 00FF | 67B9 | 0100 | 67D6 | 0102 |
| 0001766460 | 67EA | 0103 | 67F2 | 0104 | 67FC | 0105 | 680E | 0107 |
| 0001766500 | 682C | 0108 | 6832 | 010A | 6838 | 010B | 683B | 010D |
| 0001766520 | 6858 | 010E | 686A | 010F | 6888 | 0111 | 6892 | 0112 |
| 0001766540 | 6898 | 0114 | 689E | 0115 | 68A1 | 0116 | 68BF | 0117 |
| 0001766560 | 68C5 | 0119 | 68CB | 011A | 68CE | 011B | 68D8 | 011D |
| 0001766600 | 68DE | 0123 | 68E1 | 0125 | 68E7 | 0127 | 68EA | 0128 |
| 0001766620 | 68F4 | 012A | 68FA | 012C | 68FD | 012E | 6903 | 012F |
| 0001766640 | 6906 | 0130 | 6910 | 0132 | 6916 | 0133 | 6919 | 0135 |
| 0001766660 | 691F | 0136 | 6922 | 0138 | 6928 | 0142 | 692B | 0144 |
| 0001766700 | 6931 | 0145 | 6934 | 0147 | 693A | 0148 | 693D | 0149 |
| 0001766720 | 6947 | 014B | 694D | 014C | 6950 | 014E | 6956 | 014F |
| 0001766740 | 6959 | 0150 | 6963 | 0152 | 6969 | 0154 | 696C | 0155 |
| 0001766760 | 6976 | 0157 | 697C | 0158 | 697F | 015A | 6985 | 015B |
| 0001767000 | 6988 | 015D | 698E | 015E | 6991 | 015F | 699B | 0161 |
| 0001767020 | 69A1 | 0162 | 69A4 | 0163 | 69AA | 0168 | 69D1 | 0169 |
| 0001767040 | 69D4 | 016A | 69F2 | 016D | 69F5 | 016F | 69F8 | 0171 |
| 0001767060 | 69FE | 0172 | 6A0C | 0175 | 6A74 | 0177 | 6A8C | 0179 |
| 0001767100 | 6A90 | 017A | 6A9E | 017C | 6A9F | 017F | 6AA6 | 0180 |
| 0001767120 | 6AB2 | 0181 | 6ABC | 0183 | 6AC6 | 0184 | 6ACF | 0185 |
| 0001767140 | 6AE5 | 0186 | 6AEF | 0187 | 6AFD | 0188 | 6B0F | 018B |
| 0001767160 | 6B12 | 018C | 6B18 | 018E | 6B1E | 018F | 6B28 | 0191 |
| 0001767200 | 6B36 | 0192 | 6B3C | 0194 | 6B49 | 0195 | 6B55 | 0196 |
| 0001767220 | 6B58 | 0197 | 6B65 | 0198 | 6B6A | 0199 | 6B6D | 019A |
| 0001767240 | 6BA3 | 019C | 6BA8 | 019F | 6BAB | 01A1 | 6C07 | 01A2 |
| 0001767260 | 6C10 | 01A3 | 6C1A | 01A4 | 6C28 | 01A5 | 6C2E | 01A8 |
| 0001767300 | 6C31 | 01AB | 6C38 | 01AC | 6C3C | 01AE | 6C47 | 01AF |
| 0001767320 | 6C62 | 01B1 | 6C6B | 01B2 | 6C81 | 01B4 | 6C8B | 01B6 |
| 0001767340 | 6C98 | 01B7 | 6CA4 | 01B8 | 6CAE | 01BC | 6CB6 | 01BD |
| 0001767360 | 6CCC | 01BE | 6CD7 | 01C1 | 6CDA | 01C2 | 6CEA | 01C4 |
| 0001767400 | 6CED | 01C5 | 6CF7 | 01C6 | 6CFF | 01C8 | 6D02 | 01CA |
| 0001767420 | 6D06 | 01CB | 6D0B | 01CC | 6D0E | 0181 | 6D19 | 0185 |
| 0001767440 | 6D29 | 0187 | 6D2E | 0188 | 6D44 | 018B | 6D4A | 0190 |
| 0001767460 | 6D62 | 0196 | 6D9F | 0198 | 6DB8 | 019A | 6DD4 | 019B |
| 0001767500 | 6DF5 | 019C | 6DF9 | 019E | 6E01 | 019F | 6E29 | 01A5 |
| 0001767520 | 6E2D | 01A6 | 6E47 | 01B3 | 6E51 | 01B4 | 6E65 | 01B6 |
| 0001767540 | 6E81 | 01B8 | 6EA2 | 01BA | 6EAA | 01BB | 6EC2 | 01BD |

THU MAR 14 17:31:54 1991 DB_PI.DLL PAGE 449, LINE 26433

| | | | | | | | | |
|---|---|---|---|---|---|---|---|---|
| 0001767560 | 6ED1 | 01BF | 6EED | 01C0 | 6F0E | 01C5 | 6F12 | 01C6 |
| 0001767600 | 6F52 | 01C7 | 6F67 | 01C8 | 6F85 | 01C9 | 6F9B | 01CB |
| 0001767620 | 6FB5 | 01CD | 6FC2 | 01CF | 6FC8 | 01DE | 6FD3 | 01EB |
| 0001767640 | 6FE3 | 01EC | 6FF9 | 01EE | 6FFF | 01EF | 700B | 01F2 |
| 0001767660 | 7011 | 01F7 | 7014 | 01F9 | 7037 | 01FA | 7044 | 01FC |
| 0001767700 | 704A | 01FD | 706E | 01FE | 707D | 01FF | 7083 | 0200 |
| 0001767720 | 709B | 0205 | 70A1 | 0206 | 70BA | 0207 | 70D0 | 0208 |
| 0001767740 | 70D3 | 020B | 70DA | 020C | 7110 | 020D | 711F | 020F |
| 0001767760 | 7125 | 0210 | 713D | 0212 | 7155 | 0213 | 715B | 0230 |
| 0001770000 | 7166 | 0234 | 7176 | 0235 | 717C | 0236 | 7195 | 0237 |
| 0001770020 | 719E | 0238 | 71BF | 0239 | 71CB | 023A | 71D1 | 023C |
| 0001770040 | 71E7 | 023E | 71EA | 023F | 7204 | 0240 | 720D | 0243 |
| 0001770060 | 7213 | 0244 | 722E | 0245 | 7267 | 0246 | 7273 | 0247 |
| 0001770100 | 7288 | 0248 | 728E | 024B | 7294 | 024C | 72AB | 0251 |
| 0001770120 | 72B1 | 0252 | 72BD | 0253 | 72C3 | 0254 | 72C9 | 0255 |
| 0001770140 | 72E2 | 0256 | 72F4 | 0257 | 72FA | 0259 | 7300 | 025B |
| 0001770160 | 7306 | 025D | 731B | 025F | 7321 | 027A | 732C | 027B |
| 0001770200 | 733C | 027C | 7355 | 027D | 736D | 027E | 7399 | 027F |
| 0001770220 | 73A8 | 0280 | 73B0 | 0282 | 73B6 | 0284 | 73CB | 0285 |
| 0001770240 | 73E3 | 0286 | 73E9 | 0291 | 73F4 | 0294 | 7404 | 0295 |
| 0001770260 | 7416 | 0297 | 7429 | 0298 | 742C | 029A | 742F | 029B |
| 0001770300 | 7447 | 029D | 7453 | 029E | 7456 | 029F | 7460 | 02A0 |
| 0001770320 | 7467 | 02A1 | 746A | 02A2 | 7471 | 02A3 | 7474 | 02A4 |
| 0001770340 | 7480 | 02A7 | 7496 | 02A8 | 7499 | 02AB | 74A5 | 02AC |
| 0001770360 | 74A8 | 02AD | 74AB | 02AF | 74AE | 02B0 | 74BA | 02B1 |
| 0001770400 | 74C1 | 02B3 | 74C4 | 02B4 | 74CB | 02B5 | 74D1 | 02BF |
| 0001770420 | 74DC | 02C1 | 74EC | 02C2 | 7503 | 02C3 | 7507 | 02C4 |
| 0001770440 | 7511 | 02EA | 751C | 02F3 | 752C | 02F4 | 7536 | 02F6 |
| 0001770460 | 753C | 02F7 | 7555 | 02FB | 7565 | 02FE | 7577 | 0300 |
| 0001770500 | 7583 | 0302 | 758E | 0304 | 7591 | 0307 | 7599 | 030F |
| 0001770520 | 75A9 | 0314 | 75B2 | 0315 | 75BA | 0316 | 75C4 | 0317 |
| 0001770540 | 75DE | 0318 | 75EE | 031A | 75F5 | 031C | 75F8 | 031E |
| 0001770560 | 75FE | 031F | 7624 | 0320 | 7634 | 0321 | 763B | 0327 |
| 0001770600 | 763E | 0328 | 7644 | 0329 | 7668 | 032A | 7678 | 032B |
| 0001770620 | 767F | 032D | 7682 | 032F | 7685 | 0330 | 768F | 0331 |
| 0001770640 | 7695 | 0332 | 769F | 0333 | 76A7 | 0334 | 76AC | 0336 |
| 0001770660 | 76B2 | 0337 | 76B6 | 0338 | 76CE | 0339 | 76E3 | 033B |
| 0001770700 | 76FD | 033D | 7707 | 033F | 771D | 0341 | 7720 | 0343 |
| 0001770720 | 7736 | 0344 | 7740 | 0347 | 7747 | 034A | 7762 | 034B |
| 0001770740 | 779B | 034C | 77A7 | 034D | 77BC | 034E | 77C2 | 034F |
| 0001770760 | 77CA | 0350 | 77CE | 0351 | 77D3 | 0354 | 77D9 | 0355 |
| 0001771000 | 77F0 | 0356 | 77FC | 0359 | 7802 | 035B | 7805 | 035D |
| 0001771020 | 780B | 035F | 7815 | 0360 | 7833 | 0361 | 783D | 0362 |
| 0001771040 | 7843 | 0364 | 784A | 0365 | 7860 | 0366 | 786A | 0367 |
| 0001771060 | 7870 | 0368 | 7877 | 036A | 787A | 036C | 787D | 036D |
| 0001771100 | 789D | 036E | 78BF | 036F | 78C5 | 0370 | 78CD | 0371 |
| 0001771120 | 78D3 | 0372 | 78D8 | 0374 | 78DE | 0375 | 78E1 | 0376 |
| 0001771140 | 78E7 | 0378 | 78EA | 0379 | 78F0 | 037A | 7914 | 037B |
| 0001771160 | 7924 | 037C | 792B | 037E | 792E | 037F | 7934 | 0380 |
| 0001771200 | 7958 | 0381 | 7968 | 0382 | 796F | 0386 | 7972 | 0387 |
| 0001771220 | 7978 | 0388 | 7980 | 0389 | 799A | 038A | 79AA | 038B |
| 0001771240 | 79B1 | 0390 | 79B4 | 0391 | 79D4 | 0392 | 79DA | 0393 |
| 0001771260 | 79E0 | 0394 | 79F0 | 0395 | 79F5 | 0397 | 79FB | 0398 |
| 0001771300 | 7A12 | 039A | 7A1C | 039B | 7A20 | 039C | 7A36 | 039F |
| 0001771320 | 7A3C | 03A0 | 7A3F | 03A1 | 7A45 | 03A3 | 7A48 | 03A5 |
| 0001771340 | 7A4B | 03A6 | 7A50 | 03A7 | 7A56 | 03A9 | 7AAF | 03AC |
| 0001771360 | 7AB2 | 03AE | 7AB8 | 6409 | 6374 | 705F | 7372 | 632E |
| 0001771400 | 0003 | 00B6 | 004E | 7AC4 | 0051 | 7AD4 | 0052 | 7AFB |
| 0001771420 | 0054 | 7B09 | 0055 | 7B27 | 0057 | 7B48 | 0058 | 7B57 |

THU MAR 14 17:31:54 1991 DB_PI.DLL PAGE 450, LINE 26492

| | | | | | | | | |
|---|---|---|---|---|---|---|---|---|
| 0001771440 | 0059 | 7B5F | 005B | 7B65 | 005D | 7B6F | 005E | 7B87 |
| 0001771460 | 005F | 7B8D | 0087 | 7B98 | 008C | 7BA8 | 008E | 7BB0 |
| 0001771500 | 008F | 7BB5 | 0090 | 7BBE | 0092 | 7BC3 | 0093 | 7BCB |
| 0001771520 | 0094 | 7BD4 | 0099 | 7BD9 | 009A | 7BE0 | 009B | 7BE8 |
| 0001771540 | 00A1 | 7BF0 | 00A2 | 7C01 | 00A3 | 7C13 | 00A7 | 7C19 |
| 0001771560 | 00A8 | 7C2B | 00A9 | 7C36 | 00AA | 7C46 | 00AC | 7C4C |
| 0001771600 | 00AF | 7C54 | 00B0 | 7C68 | 00B1 | 7C71 | 00B2 | 7C79 |
| 0001771620 | 00B3 | 7C89 | 00B9 | 7C8F | 00BA | 7CB3 | 00BB | 7CB9 |
| 0001771640 | 00BC | 7CDA | 00BD | 7CE3 | 00BE | 7D16 | 00BF | 7D45 |
| 0001771660 | 00C2 | 7D4B | 00C3 | 7D5D | 00C4 | 7D90 | 00C5 | 7DBF |
| 0001771700 | 00C8 | 7DC5 | 00CA | 7DCB | 00CB | 7DE2 | 00CC | 7DEB |
| 0001771720 | 00CD | 7E1E | 00CE | 7E4D | 00D0 | 7E53 | 00D8 | 7E56 |
| 0001771740 | 00D9 | 7E6F | 00DA | 7E78 | 00DB | 7EAB | 00DC | 7EDA |
| 0001771760 | 00DE | 7EE0 | 00E0 | 7EE3 | 00E1 | 7EEC | 00E2 | 7F1F |
| 0001772000 | 00E3 | 7F4E | 00E5 | 7F54 | 00E6 | 7F59 | 00E9 | 7F5C |
| 0001772020 | 00EA | 7F71 | 00EB | 7F75 | 00EC | 7F7D | 00ED | 7F82 |
| 0001772040 | 00EE | 7F87 | 00F1 | 7F8A | 00F2 | 7F93 | 00F4 | 7F9C |
| 0001772060 | 00F5 | 7FB1 | 00F6 | 7FB5 | 00F7 | 7FBD | 00F8 | 7FC2 |
| 0001772100 | 00FA | 7FC7 | 00FD | 7FCA | 00FE | 7FE3 | 00FF | 7FEC |
| 0001772120 | 0100 | 801F | 0101 | 804E | 0102 | 807D | 0107 | 8083 |
| 0001772140 | 0109 | 8086 | 010D | 808F | 010E | 80C2 | 010F | 80F1 |
| 0001772160 | 0110 | 8120 | 0113 | 8126 | 0115 | 8129 | 0119 | 812E |
| 0001772200 | 011A | 8157 | 011B | 8160 | 011C | 8193 | 011D | 81C2 |
| 0001772220 | 011E | 81F1 | 0123 | 81F7 | 0124 | 8210 | 0125 | 8219 |
| 0001772240 | 0126 | 8248 | 0127 | 8277 | 0128 | 82AA | 012C | 82B0 |
| 0001772260 | 012E | 82B3 | 012F | 82B8 | 0130 | 82BD | 0132 | 82C0 |
| 0001772300 | 0133 | 82C5 | 0134 | 82CA | 0138 | 82CD | 013B | 82D6 |
| 0001772320 | 013C | 8310 | 013D | 8322 | 013E | 8355 | 013F | 8384 |
| 0001772340 | 0140 | 83B3 | 0142 | 83B9 | 0143 | 83BE | 0147 | 83C1 |
| 0001772360 | 0148 | 83F4 | 0149 | 8423 | 014A | 8452 | 014C | 8458 |
| 0001772400 | 014D | 848B | 014E | 84BA | 014F | 84E9 | 0150 | 84EF |
| 0001772420 | 0151 | 8546 | 0153 | 8549 | 0154 | 857C | 0155 | 85AB |
| 0001772440 | 0156 | 85DA | 0157 | 85E0 | 0172 | 85EB | 0174 | 85FB |
| 0001772460 | 0176 | 8600 | 0178 | 8612 | 0179 | 8633 | 017A | 863F |
| 0001772500 | 017B | 8642 | 017D | 8645 | 017E | 8651 | 017F | 8654 |
| 0001772520 | 0180 | 8657 | 0181 | 865A | 0183 | 8661 | 0184 | 8667 |
| 0001772540 | 0199 | 8672 | 019A | 8682 | 019D | 8687 | 019F | 8697 |
| 0001772560 | 01A0 | 86A3 | 01A1 | 86A6 | 01A2 | 86B2 | 01A4 | 86CD |
| 0001772600 | 01A6 | 86D7 | 01A7 | 86E9 | 01A9 | 86EC | 01AA | 86FE |
| 0001772620 | 01AC | 8701 | 01AD | 8713 | 01AF | 8716 | 01B0 | 8728 |
| 0001772640 | 01B2 | 872B | 01B3 | 8741 | 01B4 | 8765 | 01B5 | 8768 |
| 0001772660 | 01B8 | 876B | 01B9 | 877B | 01BB | 8781 | 01D1 | 878C |
| 0001772700 | 01D4 | 879C | 01D5 | 87A8 | 01D6 | 87B4 | 01D7 | 87D1 |
| 0001772720 | 01D8 | 87D4 | 01D9 | 87D7 | 01DA | 87E0 | 640A | 5F62 |
| 0001772740 | 6572 | 7663 | 2E72 | 0363 | 3700 | 7601 | EC00 | 7787 |
| 0001772760 | 0200 | 7A88 | 9400 | 7B88 | 1000 | A389 | 1E00 | A489 |
| 0001773000 | 3400 | AC89 | C700 | AD89 | DF00 | B089 | 6600 | B48A |
| 0001773020 | 6F00 | B88A | 7500 | B98A | 9100 | BD8A | 9400 | BE8A |
| 0001773040 | B000 | C18A | B300 | C38A | B900 | C68A | BC00 | C88A |
| 0001773060 | E400 | C98A | 0500 | CA8B | 0800 | CC8B | 3200 | CD8B |
| 0001773100 | 5300 | CE8B | 5600 | CF8B | D300 | D18B | D600 | D38B |
| 0001773120 | F200 | D78B | 7900 | D88C | 8200 | DA8C | 8700 | DC8C |
| 0001773140 | 9000 | DD8C | B300 | DE8C | B600 | E08C | C800 | E18C |
| 0001773160 | CB00 | E28C | D400 | E88C | F700 | EB8C | 0000 | EF8D |
| 0001773200 | 0600 | F08D | 1F00 | F48D | 2200 | F58D | 3B00 | F88D |
| 0001773220 | 3E00 | FA8D | BB00 | FD8D | BE00 | FF8D | E600 | 008D |
| 0001773240 | 0401 | 018E | 0701 | 038E | 3101 | 048E | 4F01 | 058E |
| 0001773260 | 5201 | 068E | CF01 | 088E | D201 | 0C8E | EE01 | 0D8E |
| 0001773300 | 6C01 | 1C8F | 7A01 | 208F | 8A01 | 228F | 9001 | 238F |

THU MAR 14 17:31:54 1991 DB_PI.DLL PAGE 451, LINE 26551

| | | | | | | | | |
|---|---|---|---|---|---|---|---|---|
| 0001773320 | CF01 | 248F | E701 | 268F | ED01 | 2A8F | 0101 | 2B90 |
| 0001773340 | 2001 | 2D90 | 3801 | 2E90 | 3B01 | 3190 | 5701 | 3390 |
| 0001773360 | 5F01 | 3590 | 7101 | 3690 | 8901 | 3790 | 9701 | 3890 |
| 0001773400 | AF01 | 3990 | B901 | 3A90 | BF01 | 3D90 | D101 | 3F90 |
| 0001773420 | D701 | 4190 | DD01 | 4290 | E301 | 4990 | F801 | 4A90 |
| 0001773440 | 0001 | 4B91 | 1201 | 4C91 | 2A01 | 4E91 | 3001 | 4F91 |
| 0001773460 | 4401 | 5091 | 5C01 | 5291 | 6401 | 5491 | 7601 | 5591 |
| 0001773500 | 8E01 | 5691 | 9C01 | 5791 | B801 | 5991 | C901 | 5A91 |
| 0001773520 | D001 | 6991 | DB01 | 6C91 | EB01 | 6E91 | F101 | 7091 |
| 0001773540 | 3001 | 7492 | 4401 | 7592 | 6301 | 7792 | 7B01 | 7892 |
| 0001773560 | 7E01 | 7B92 | 9A01 | 7D92 | A201 | 7F92 | B401 | 8092 |
| 0001773600 | CC01 | 8292 | D201 | 8392 | EE01 | 8992 | FF01 | 8A92 |
| 0001773620 | 0701 | 8B93 | 1901 | 8C93 | 3101 | 8E93 | 3701 | 8F93 |
| 0001773640 | 4B01 | 9093 | 6301 | 9293 | 6B01 | 9493 | 7D01 | 9693 |
| 0001773660 | 9901 | 9893 | A001 | A993 | AB01 | AA93 | BB01 | AB93 |
| 0001773700 | C501 | AC93 | CA01 | AF93 | D201 | B393 | DA01 | B793 |
| 0001773720 | E901 | B993 | EF01 | BB93 | 0001 | BC94 | 1E01 | BF94 |
| 0001773740 | 2101 | C194 | 3201 | C294 | 5001 | C694 | 5301 | C794 |
| 0001773760 | 5901 | CA94 | 5C01 | CB94 | 8701 | CF94 | 9D01 | D194 |
| 0001774000 | CE01 | D294 | D101 | D394 | FE01 | D694 | 1401 | D895 |
| 0001774020 | 3501 | D995 | 3801 | DA95 | 3E01 | DB95 | 4101 | DD95 |
| 0001774040 | 5D01 | E095 | 6C01 | E395 | 7501 | E595 | 9301 | E695 |
| 0001774060 | 9C01 | E995 | A201 | EC95 | B901 | ED95 | C301 | EE95 |
| 0001774100 | C801 | F095 | D001 | F195 | D901 | F395 | DF01 | F995 |
| 0001774120 | ED01 | 0395 | F302 | 0495 | 2602 | 0596 | 3502 | 0896 |
| 0001774140 | 3802 | 0996 | 6302 | 0A96 | 7702 | 0B96 | 7A02 | 0C96 |
| 0001774160 | 8002 | 0E96 | 8302 | 0F96 | 8902 | 1196 | A702 | 1296 |
| 0001774200 | AD02 | 2196 | B802 | 2896 | C802 | 2996 | DB02 | 2B96 |
| 0001774220 | E102 | 2C96 | F202 | 2D96 | FB02 | 2E96 | 0302 | 3197 |
| 0001774240 | 0902 | 3297 | 1102 | 3497 | 1702 | 3697 | 2002 | 3797 |
| 0001774260 | 4202 | 3897 | 4B02 | 3997 | 5302 | 3A97 | 5602 | 3B97 |
| 0001774300 | 5E02 | 3C97 | 6402 | 3D97 | 6702 | 3E97 | 6F02 | 4097 |
| 0001774320 | 8C02 | 4197 | 9202 | 5397 | 9D02 | 5597 | AD02 | 5697 |
| 0001774340 | BE02 | 5897 | C502 | 5997 | E902 | 5A97 | F802 | 5D97 |
| 0001774360 | FE02 | 5E97 | 2202 | 5F98 | 3C02 | 6098 | 5002 | 6198 |
| 0001774400 | 6B02 | 6298 | 7F02 | 6398 | 9A02 | 6598 | A002 | 6698 |
| 0001774420 | A602 | 7A98 | B102 | 7C98 | C102 | 7D98 | C602 | 7E98 |
| 0001774440 | CB02 | 8398 | D302 | 8598 | D802 | 8698 | 1702 | 8799 |
| 0001774460 | 2F02 | 8899 | 4B02 | 8999 | 5A02 | 8C99 | 6302 | 8D99 |
| 0001774500 | 9A02 | 9199 | A902 | 9399 | C402 | 9499 | E502 | 9599 |
| 0001774520 | EE02 | 9699 | F802 | 9799 | 0902 | 989A | 1802 | 9A9A |
| 0001774540 | 2102 | 9B9A | 4402 | 9C9A | 4D02 | 9D9A | 5202 | 9E9A |
| 0001774560 | 5502 | 9F9A | 5A02 | A19A | 6002 | A29A | 6302 | A39A |
| 0001774600 | 6802 | A89A | 6D02 | AB9A | A402 | AC9A | A702 | AD9A |
| 0001774620 | AD02 | AE9A | B602 | B79A | CC02 | BB9A | 2A02 | BD9B |
| 0001774640 | 3002 | CC9B | 3B02 | D19B | 4B02 | D29B | 6302 | D79B |
| 0001774660 | 7202 | D89B | A702 | DD9B | B602 | DE9B | EB02 | E39B |
| 0001774700 | FA02 | E49B | 3002 | E99C | 3F02 | EA9C | 7502 | EF9C |
| 0001774720 | 8402 | F09C | BA02 | F59C | C902 | F69C | FE02 | FB9C |
| 0001774740 | 0D02 | FC9D | 4202 | 019D | 5103 | 049D | 8603 | 059D |
| 0001774760 | 8C03 | 199D | 9703 | 249D | A703 | 259D | AF03 | 269D |
| 0001775000 | DA03 | 279D | E903 | 309D | F203 | 369D | 2903 | 389E |
| 0001775020 | 2F03 | 3B9E | 3803 | 3C9E | 4A03 | 3D9E | 6103 | 3E9E |
| 0001775040 | 6A03 | 3F9E | 8303 | 419E | 9203 | 429E | BB03 | 439E |
| 0001775060 | CA03 | 449E | DA03 | 4D9E | E903 | 4E9E | 0F03 | 4F9F |
| 0001775100 | 1803 | 509F | 2203 | 519F | 2803 | 529F | 2B03 | 559F |
| 0001775120 | 3103 | 599F | 4803 | 5A9F | 8E03 | 5C9F | 9703 | 5E9F |
| 0001775140 | 9D03 | 609F | A003 | 629F | B303 | 649F | B903 | 879F |
| 0001775160 | C403 | 8D9F | DA03 | 8E9F | E203 | 8F9F | EE03 | 919F |

THU MAR 14 17:31:54 1991 DB_PI.DLL PAGE 452, LINE 26610

| | | | | | | | | |
|---|---|---|---|---|---|---|---|---|
| 0001775200 | F303 | 929F | 1403 | 94A0 | 2303 | 95A0 | 2E03 | 96A0 |
| 0001775220 | 4103 | 98A0 | 5003 | 99A0 | 8203 | 9BA0 | 9103 | 9EA0 |
| 0001775240 | 9F03 | 9FA0 | C303 | A0A0 | D203 | A2A0 | D803 | A4A0 |
| 0001775260 | DE03 | BBA0 | EC03 | BEA0 | 0203 | BFA1 | 1803 | C0A1 |
| 0001775300 | 3203 | C2A1 | 4003 | 09A1 | 6264 | 665F | 6C69 | 2E65 |
| 0001775320 | 0363 | 040C | 4000 | 4E00 | 4EA1 | 6400 | 4FA1 | F600 |
| 0001775340 | 50A1 | 9B00 | 09A2 | 6664 | 745F | 6572 | 2E65 | 0463 |
| 0001775360 | 9600 | 5400 | 1A00 | 5D77 | 2A00 | 5E77 | 4700 | 5F77 |
| 0001775400 | 5F00 | 6577 | 6E00 | 6677 | 7800 | 7077 | 8200 | 7277 |
| 0001775420 | B000 | 7377 | B900 | 7477 | C300 | 7577 | C900 | 7677 |
| 0001775440 | CC00 | 7877 | D200 | 7F77 | DC00 | 8077 | E600 | 9477 |
| 0001775460 | F000 | 9677 | 2800 | 9778 | 3100 | 9B78 | 4000 | 9C78 |
| 0001775500 | 5E00 | A078 | 6400 | A478 | 6E00 | A578 | 7F00 | A778 |
| 0001775520 | 8800 | A878 | 9600 | AD78 | 9C00 | AE78 | B800 | AF78 |
| 0001775540 | C100 | B078 | CF00 | B478 | D500 | B778 | E800 | B978 |
| 0001775560 | EE00 | CE78 | F900 | D078 | 0900 | D579 | 1100 | D679 |
| 0001775600 | 2E00 | DE79 | 3400 | DF79 | 5000 | E079 | 6100 | E479 |
| 0001775620 | 7000 | E579 | 8100 | E979 | 9000 | EA79 | A600 | ED79 |
| 0001775640 | E600 | EE79 | 0200 | F07A | 0B00 | F17A | 2800 | F27A |
| 0001775660 | 2D00 | F37A | 3000 | FB7A | 6700 | FD7A | 8800 | FF7A |
| 0001775700 | 9700 | 037A | A101 | 057A | C201 | 077A | D101 | 097A |
| 0001775720 | DB01 | 0B7A | E101 | 217A | EC01 | 247A | FC01 | 297A |
| 0001775740 | 0101 | 2B7B | 1001 | 2D7B | 2401 | 347B | 3701 | 357B |
| 0001775760 | 5E01 | 377B | 6701 | 397B | 7901 | 3A7B | 9B01 | 3C7B |
| 0001776000 | AE01 | 3D7B | B101 | 3E7B | C501 | 3F7B | CB01 | 417B |
| 0001776020 | CE01 | 437B | D401 | 597B | DF01 | 617B | EF01 | 647B |
| 0001776040 | 3301 | 657C | 4B01 | 687C | 5101 | 6E7C | 5B01 | 6F7C |
| 0001776060 | 8201 | 727C | 9101 | 737C | A201 | 787C | B101 | 7B7C |
| 0001776100 | F501 | 7C7C | 0D01 | 7F7D | 1301 | 857D | 1D01 | 877D |
| 0001776120 | 4401 | 887D | 4D01 | 897D | 5B01 | 8D7D | 6101 | 8E7D |
| 0001776140 | 7D01 | 927D | 8C01 | 947D | 9201 | AA7D | 9D01 | AD7D |
| 0001776160 | AD01 | AE7D | C301 | B07D | D201 | B17D | E801 | B37D |
| 0001776200 | F701 | B57D | FD01 | D57D | 0801 | DF7E | 1801 | E07E |
| 0001776220 | 2001 | E37E | 2A01 | E57E | 3001 | E67E | 5801 | E77E |
| 0001776240 | 6901 | E87E | 8601 | E97E | 9E01 | EB7E | A701 | EC7E |
| 0001776260 | CD01 | ED7E | D701 | EE7E | DF01 | EF7E | E201 | F07E |
| 0001776300 | EA01 | F17E | ED01 | F47E | F501 | F67E | FC01 | F77E |
| 0001776320 | FF01 | F97E | 0C01 | FA7F | 2F01 | FB7F | 3901 | FC7F |
| 0001776340 | 4401 | FE7F | 4D01 | FF7F | 7301 | 007F | 7D02 | 017F |
| 0001776360 | 8502 | 027F | 8802 | 037F | 9002 | 047F | 9302 | 067F |
| 0001776400 | 9B02 | 077F | 9E02 | 0A7F | A502 | 0D7F | A802 | 0E7F |
| 0001776420 | D302 | 0F7F | DD02 | 117F | F102 | 127F | 1702 | 1380 |
| 0001776440 | 2102 | 1480 | 2902 | 1580 | 3002 | 1680 | 3302 | 1780 |
| 0001776460 | 3B02 | 1880 | 3E02 | 1980 | 4502 | 1A80 | 4802 | 1B80 |
| 0001776500 | 5402 | 2080 | 5C02 | 2180 | 6202 | 0880 | 6664 | 6F5F |
| 0001776520 | 6A62 | 632E | 0004 | 0126 | 0074 | 806E | 0079 | 807E |
| 0001776540 | 007C | 809D | 007D | 80B3 | 0080 | 80F3 | 0083 | 80FE |
| 0001776560 | 0084 | 811A | 0089 | 815A | 008A | 817E | 008B | 8188 |
| 0001776600 | 008C | 8191 | 008D | 81C2 | 008E | 81C5 | 0093 | 81FC |
| 0001776620 | 0094 | 8227 | 0096 | 8267 | 0098 | 8295 | 00BF | 82A0 |
| 0001776640 | 00C5 | 82B0 | 00CA | 82C1 | 00CB | 82DE | 00D0 | 82ED |
| 0001776660 | 00D1 | 831D | 00D4 | 832C | 00D6 | 8332 | 00FE | 833D |
| 0001776700 | 0103 | 834D | 0106 | 8359 | 0108 | 8378 | 0109 | 8383 |
| 0001776720 | 010B | 83BF | 010C | 83DB | 0110 | 841B | 0111 | 8431 |
| 0001776740 | 0112 | 8471 | 0113 | 8487 | 0116 | 84B8 | 0117 | 84C5 |
| 0001776760 | 011A | 84F6 | 011D | 850C | 011E | 852E | 011F | 8538 |
| 0001777000 | 0120 | 8541 | 0121 | 8572 | 0122 | 8575 | 0126 | 85AC |
| 0001777020 | 0127 | 85C9 | 0129 | 8609 | 012B | 8637 | 014D | 8642 |
| 0001777040 | 0154 | 8652 | 0157 | 865E | 0159 | 867D | 015C | 8688 |

THU MAR 14 17:31:54 1991 DB_PI.DLL PAGE 453, LINE 26669

| | | | | | | | | |
|---|---|---|---|---|---|---|---|---|
| 0001777060 | 015D | 86A4 | 0160 | 86E4 | 0163 | 86E9 | 0164 | 870E |
| 0001777100 | 0165 | 8721 | 0167 | 8758 | 0168 | 876C | 016B | 87AC |
| 0001777120 | 016C | 87BF | 016D | 87DB | 0170 | 87EF | 0174 | 87FA |
| 0001777140 | 0176 | 8800 | 0177 | 8811 | 017A | 884D | 017B | 8873 |
| 0001777160 | 017D | 887C | 017E | 88AB | 0180 | 88BE | 0181 | 88E3 |
| 0001777200 | 0182 | 88E6 | 0185 | 88EB | 0187 | 88F9 | 0189 | 8930 |
| 0001777220 | 01A5 | 893B | 01AB | 894B | 01AD | 896A | 01AF | 8987 |
| 0001777240 | 01B1 | 89BE | 01D4 | 89C9 | 01D9 | 89D9 | 01DB | 89F8 |
| 0001777260 | 01DC | 8A03 | 01DD | 8A1F | 01E0 | 8A5F | 01E2 | 8A82 |
| 0001777300 | 01E4 | 8AB9 | 0208 | 8AC4 | 020D | 8AD4 | 020F | 8AF3 |
| 0001777320 | 0210 | 8AFE | 0211 | 8B1A | 0215 | 8B5A | 0217 | 8B7F |
| 0001777340 | 0219 | 8BB6 | 022B | 8BC1 | 022F | 8BD1 | 0230 | 8BE2 |
| 0001777360 | 0232 | 8BE9 | 0233 | 8C0D | 0234 | 8C1C | 0238 | 8C22 |
| 0001777400 | 023A | 8C27 | 023B | 8C60 | 023E | 8C66 | 023F | 8C74 |
| 0001777420 | 0240 | 8C8B | 0242 | 8CAE | 0245 | 8CB1 | 0247 | 8CED |
| 0001777440 | 0248 | 8D04 | 024B | 8D27 | 024C | 8D2D | 024E | 8D33 |
| 0001777460 | 0272 | 8D3E | 0276 | 8D4E | 027B | 8D53 | 027D | 8D72 |
| 0001777500 | 027E | 8D7D | 027F | 8D99 | 0282 | 8DD9 | 0284 | 8DDE |
| 0001777520 | 0285 | 8E01 | 0287 | 8E07 | 0288 | 8E0C | 0289 | 8E0F |
| 0001777540 | 028A | 8E40 | 028B | 8E77 | 028E | 8E94 | 028F | 8E9C |
| 0001777560 | 0290 | 8EA8 | 0293 | 8EAD | 0297 | 8EB6 | 0298 | 8EDD |
| 0001777600 | 029A | 8F1D | 029C | 8F22 | 029D | 8F45 | 029E | 8F4F |
| 0001777620 | 02A1 | 8F54 | 02A2 | 8F61 | 02A4 | 8F66 | 02A7 | 8F69 |
| 0001777640 | 02A8 | 8F73 | 02A9 | 8F85 | 02AA | 8F8D | 02AE | 8FC4 |
| 0001777660 | 02AF | 8FD2 | 02B1 | 8FDB | 02B2 | 8FFF | 02B5 | 903F |
| 0001777700 | 02B7 | 906D | 02DC | 9078 | 02E4 | 9088 | 02E6 | 90A7 |
| 0001777720 | 02E7 | 90B2 | 02E8 | 90CE | 02EC | 910E | 02ED | 912B |
| 0001777740 | 02F0 | 916B | 02F1 | 9181 | 02F3 | 91C1 | 02F4 | 91DB |
| 0001777760 | 02F6 | 91ED | 02F8 | 91F0 | 02FC | 91F5 | 02FD | 921B |
| 0002000000 | 02FE | 922E | 0301 | 9265 | 0304 | 9278 | 0306 | 92A6 |
| 0002000020 | 031F | 92B1 | 0326 | 92C1 | 0327 | 92D7 | 0328 | 92E6 |
| 0002000040 | 032A | 9302 | 032B | 9318 | 032C | 932E | 032D | 933D |
| 0002000060 | 032F | 9359 | 0337 | 9375 | 0338 | 9399 | 0339 | 93A2 |
| 0002000100 | 033A | 93D7 | 033C | 93DD | 033D | 93E0 | 033E | 93EA |
| 0002000120 | 0345 | 93F0 | 0346 | 9406 | 0349 | 9411 | 034A | 946B |
| 0002000140 | 034C | 9471 | 034E | 9474 | 034F | 94AC | 0354 | 94B2 |
| 0002000160 | 0357 | 94BF | 0358 | 94CC | 035B | 94D2 | 035C | 94EC |
| 0002000200 | 035F | 94F2 | 0360 | 94FD | 0361 | 950A | 0365 | 9510 |
| 0002000220 | 0367 | 951D | 0368 | 952A | 036B | 9530 | 036C | 953B |
| 0002000240 | 036D | 9548 | 0374 | 954E | 0375 | 955B | 0376 | 9577 |
| 0002000260 | 0378 | 9586 | 0379 | 95A0 | 037F | 95AF | 0381 | 95B5 |
| 0002000300 | 03BF | 95C0 | 03CB | 95D0 | 03CC | 95EF | 03CE | 9605 |
| 0002000320 | 03CF | 961E | 03D0 | 962C | 03D5 | 9632 | 03D6 | 963D |
| 0002000340 | 03D7 | 9659 | 03D8 | 9662 | 03DC | 973C | 03DD | 9747 |
| 0002000360 | 03DE | 9763 | 03DF | 976C | 03E0 | 9776 | 03E1 | 977E |
| 0002000400 | 03E2 | 9781 | 03E7 | 985B | 03E9 | 9866 | 03EA | 986F |
| 0002000420 | 03ED | 9934 | 03EE | 9950 | 03F2 | 9A33 | 03F4 | 9A39 |
| 0002000440 | 03F5 | 9A5F | 03F6 | 9A72 | 03F7 | 9B4C | 03FA | 9B5F |
| 0002000460 | 03FE | 9B62 | 03FF | 9B7F | 0400 | 9B68 | 0403 | 9C62 |
| 0002000500 | 0404 | 9C79 | 0405 | 9C82 | 0409 | 9D5C | 040A | 9D78 |
| 0002000520 | 040B | 9D81 | 0411 | 9E5B | 0412 | 9E8D | 0413 | 9E96 |
| 0002000540 | 0417 | 9F70 | 0418 | 9F7B | 0419 | 9F98 | 041A | 9FA1 |
| 0002000560 | 0421 | A07B | 0422 | A0B1 | 0423 | A0BA | 0428 | A194 |
| 0002000600 | 0429 | A19D | 042A | A1BA | 042B | A1C3 | 042E | A29D |
| 0002000620 | 0430 | A35F | 0455 | A36A | 0458 | A37A | 045E | A380 |
| 0002000640 | 0466 | A38E | 0467 | A3B9 | 0469 | A3C8 | 046A | A3E0 |
| 0002000660 | 046D | A3E6 | 0473 | A3EF | 0476 | A409 | 047A | A40F |
| 0002000700 | 047B | A436 | 047C | A449 | 047F | A44F | 0480 | A46B |
| 0002000720 | 0481 | A47D | 048D | A483 | 048E | A4AE | 0490 | A4BD |

THU MAR 14 17:31:54 1991 DB_PI.DLL PAGE 454, LINE 26728

| | | | | | | | | |
|---|---|---|---|---|---|---|---|---|
| 0002000740 | 0491 | A4D5 | 0493 | A4DB | 0495 | A4DE | 0497 | A4E4 |
| 0002000760 | 6409 | 5F66 | 6574 | 7473 | 632E | 0004 | 001A | 005A |
| 0002001000 | A4F0 | 0062 | A500 | 0065 | A509 | 0066 | A527 | 0069 |
| 0002001020 | A52D | 006C | A54E | 006D | A554 | 0071 | A560 | 0072 |
| 0002001040 | A58A | 0076 | A5CE | 0077 | A5E9 | 007B | A609 | 007C |
| 0002001060 | A61F | 007F | A650 | 0083 | A674 | 0085 | A6A2 | 009D |
| 0002001100 | A6AD | 00A1 | A6BD | 00A4 | A6DD | 00A6 | A6E3 | 00C0 |
| 0002001120 | A6EE | 00C3 | A6FE | 00C5 | A704 | 00DB | A70F | 00DC |
| 0002001140 | A71F | 00DD | A736 | 6409 | 5F66 | 6E69 | 7274 | 632E |
| 0002001160 | 0004 | 0019 | 0052 | A742 | 0054 | A752 | 0057 | A757 |
| 0002001200 | 0058 | A76D | 005A | A77C | 005C | A781 | 005D | A794 |
| 0002001220 | 005E | A79D | 0060 | A7A7 | 0064 | A7AA | 0065 | A7C8 |
| 0002001240 | 0067 | A7CB | 0068 | A7D4 | 006A | A7DE | 006C | A7E4 |
| 0002001260 | 008C | A7EF | 0090 | A7FF | 0091 | A815 | 0094 | A824 |
| 0002001300 | 0096 | A83F | 0097 | A848 | 0099 | A85E | 009A | A867 |
| 0002001320 | 009C | A871 | 009E | A877 | 640A | 746F | 705F | 7261 |
| 0002001340 | 2E73 | 0463 | 6600 | 5A00 | 8200 | 5CA8 | 9200 | 5FA8 |
| 0002001360 | 9A00 | 60A8 | B800 | 63A8 | C100 | 64A8 | D000 | 67A8 |
| 0002001400 | D600 | 68A8 | 1500 | 6AA9 | 1E00 | 6CA9 | 2400 | 89A9 |
| 0002001420 | 2F00 | 91A9 | 3F00 | 93A9 | 4B00 | 96A9 | 5700 | 99A9 |
| 0002001440 | 7A00 | 9AA9 | 9000 | 9DA9 | 9F00 | 9FA9 | A200 | A1A9 |
| 0002001460 | B500 | A2A9 | C000 | A6A9 | C600 | A9A9 | E300 | ABA9 |
| 0002001500 | EF00 | ACA9 | 1500 | ADAA | 3100 | AEAA | 4000 | B0AA |
| 0002001520 | 4C00 | B3AA | 4F00 | B4AA | 7500 | B7AA | 7B00 | BAAA |
| 0002001540 | 7E00 | BBAA | A300 | BCAA | AC00 | BEAA | B200 | C1AA |
| 0002001560 | BE00 | C3AA | C400 | C5AA | C700 | C6AA | D100 | C8AA |
| 0002001600 | D700 | CAAA | E700 | CCAA | ED00 | DEAA | F800 | E5AA |
| 0002001620 | 0800 | E7AB | 0D00 | E8AB | 3200 | E9AB | 4500 | ECAB |
| 0002001640 | 4B00 | EDAB | 5B00 | EFAB | 6700 | F0AB | 7000 | F1AB |
| 0002001660 | 8700 | F3AB | 9600 | F4AB | 9C00 | F6AB | A600 | F8AB |
| 0002001700 | AC00 | 16AB | B701 | 1CAB | C701 | 20AB | CC01 | 22AB |
| 0002001720 | D801 | 23AB | 0B01 | 25AC | 1101 | 26AC | 2701 | 28AC |
| 0002001740 | 3601 | 29AC | 3F01 | 2BAC | 4601 | 2DAC | 5C01 | 2EAC |
| 0002001760 | 5F01 | 32AC | 6601 | 34AC | 7401 | 36AC | 8C01 | 37AC |
| 0002002000 | AA01 | 39AC | B901 | 3AAC | D701 | 3CAC | E601 | 3FAC |
| 0002002020 | F401 | 40AC | 0101 | 42AD | 0701 | 45AD | 0A01 | 47AD |
| 0002002040 | 1501 | 48AD | 4901 | 4AAD | 5E01 | 4BAD | 7601 | 4DAD |
| 0002002060 | 8E01 | 4FAD | 9101 | 50AD | B301 | 52AD | C801 | 55AD |
| 0002002100 | E001 | 57AD | E601 | 75AD | F101 | 79AD | 0101 | 7AAE |
| 0002002120 | 1501 | 7BAE | 2B01 | 7DAE | 4101 | 80AE | 5801 | 81AE |
| 0002002140 | 6301 | 82AE | 7701 | 84AE | 7E01 | 86AE | 8101 | 87AE |
| 0002002160 | 8401 | 88AE | 9801 | 8BAE | 9F01 | 8DAE | A501 | 09AE |
| 0002002200 | 6F64 | 5F74 | 626F | 2E6A | 0463 | 1400 | 4501 | B000 |
| 0002002220 | 48AE | C000 | 4BAE | CE00 | 4EAE | F000 | 50AE | 1A00 |
| 0002002240 | 52AF | 2000 | 64AF | 2B00 | 6FAF | 3B00 | 72AF | 4600 |
| 0002002260 | 73AF | 4C00 | 77AF | 5800 | 78AF | 8200 | 7AAF | 9300 |
| 0002002300 | 7BAF | AA00 | 7DAF | BB00 | 7FAF | D300 | 80AF | FA00 |
| 0002002320 | 81AF | 3600 | 89B0 | 3D00 | 8AB0 | 4000 | 8BB0 | 5800 |
| 0002002340 | 8CB0 | 7000 | 8DB0 | 8A00 | 8EB0 | 9200 | 92B0 | A600 |
| 0002002360 | 93B0 | B100 | 98B0 | C500 | 9AB0 | CB00 | AAB0 | D600 |
| 0002002400 | B0B0 | E600 | B3B0 | 1E00 | B4B1 | 3600 | BBB1 | 4700 |
| 0002002420 | BDB1 | BB00 | BEB1 | CC00 | C0B1 | DB00 | C2B1 | E100 |
| 0002002440 | E1B1 | EC00 | E9B1 | FC00 | EAB1 | 2B00 | EDB2 | 3A00 |
| 0002002460 | EFB2 | 5000 | F0B2 | 6800 | F3B2 | 7D00 | F4B2 | 9A00 |
| 0002002500 | F5B2 | B400 | F8B2 | C200 | FAB2 | D200 | FBB2 | DF00 |
| 0002002520 | FDB2 | 0300 | FFB3 | 0900 | 18B3 | 1401 | 22B3 | 2401 |
| 0002002540 | 23B3 | 4F01 | 28B3 | 5E01 | 29B3 | 7501 | 2CB3 | 8401 |
| 0002002560 | 36B3 | 9301 | 37B3 | BE01 | 38B3 | C701 | 39B3 | D501 |
| 0002002600 | 3EB3 | DB01 | 3FB3 | F701 | 43B3 | 0001 | 46B4 | 3501 |

THU MAR 14 17:31:54 1991 DB_PI.DLL PAGE 455, LINE 26787

| | | | | | | | | |
|---|---|---|---|---|---|---|---|---|
| 0002002620 | 47B4 | 3E01 | 48B4 | 5601 | 4BB4 | 5C01 | 4DB4 | 7001 |
| 0002002640 | 4FB4 | 7E01 | 51B4 | 8401 | 6BB4 | 8F01 | 70B4 | 9F01 |
| 0002002660 | 71B4 | AC01 | 76B4 | B201 | 77B4 | CB01 | 7DB4 | DA01 |
| 0002002700 | 7EB4 | 0901 | 83B5 | 1801 | 84B5 | 3701 | 85B5 | 4001 |
| 0002002720 | 86B5 | 4E01 | 8AB5 | 5401 | 8BB5 | 7001 | 8FB5 | 7901 |
| 0002002740 | 92B5 | B001 | 93B5 | B901 | 94B5 | D101 | 97B5 | D701 |
| 0002002760 | 99B5 | EB01 | 9BB5 | F901 | 9DB5 | FF01 | B7B5 | 0A01 |
| 0002003000 | BEB6 | 1A01 | BFB6 | 2701 | C4B6 | 2D01 | C5B6 | 5E01 |
| 0002003020 | CAB6 | 6F01 | CBB6 | 9101 | CCB6 | 9B01 | CDB6 | AB01 |
| 0002003040 | D1B6 | B201 | D2B6 | D201 | D6B6 | DC01 | D9B6 | 1A01 |
| 0002003060 | DAB7 | 2401 | DBB7 | 3D01 | E0B7 | 4401 | E2B7 | 8801 |
| 0002003100 | E3B7 | B401 | E4B7 | BE01 | E5B7 | D701 | E9B7 | DE01 |
| 0002003120 | EBB7 | F301 | EDB7 | 0301 | EFB8 | 0901 | 09B8 | 1402 |
| 0002003140 | 0EB8 | 2402 | 0FB8 | 3102 | 14B8 | 3702 | 15B8 | 6602 |
| 0002003160 | 1AB8 | 7502 | 1BB8 | 9402 | 1CB8 | 9D02 | 1DB8 | AB02 |
| 0002003200 | 21B8 | B102 | 22B8 | CD02 | 26B8 | D602 | 29B8 | 0D02 |
| 0002003220 | 2AB9 | 1602 | 2BB9 | 2E02 | 2EB9 | 3402 | 30B9 | 4802 |
| 0002003240 | 32B9 | 5602 | 34B9 | 5C02 | 4EB9 | 6702 | 53B9 | 7702 |
| 0002003260 | 54B9 | 8402 | 59B9 | 8A02 | 5AB9 | B902 | 5FB9 | C802 |
| 0002003300 | 60B9 | E702 | 61B9 | F002 | 62B9 | FE02 | 66B9 | 0402 |
| 0002003320 | 67BA | 2002 | 6BBA | 2902 | 6EBA | 6002 | 6FBA | 6902 |
| 0002003340 | 70BA | 8102 | 73BA | 8702 | 75BA | 9B02 | 77BA | A902 |
| 0002003360 | 79BA | AF02 | 93BA | BA02 | 98BA | CA02 | 99BA | D702 |
| 0002003400 | 9EBA | DD02 | 9FBA | 0C02 | A4BB | 1B02 | A5BB | 3A02 |
| 0002003420 | A6BB | 4302 | A7BB | 5102 | ABBB | 5702 | ACBB | 7302 |
| 0002003440 | B0BB | 7C02 | B3BB | B302 | B4BB | BC02 | B5BB | D402 |
| 0002003460 | B8BB | DA02 | BABB | EE02 | BCBB | FC02 | BEBB | 0202 |
| 0002003500 | D8BC | 0D02 | DBBC | 1D02 | DEBC | 2302 | DFBC | 4C02 |
| 0002003520 | E3BC | 4F02 | E4BC | 7802 | E8BC | 7B02 | E9BC | A402 |
| 0002003540 | F4BC | A702 | F5BC | D002 | F7BC | D302 | F8BC | D802 |
| 0002003560 | FABC | DB02 | FCBC | FC02 | FEBC | 0202 | 1ABD | 0D03 |
| 0002003600 | 1DBD | 1D03 | 22BD | 2203 | 28BD | 2703 | 2ABD | 5003 |
| 0002003620 | 2EBD | 5903 | 2FBD | 7603 | 35BD | 8503 | 3BBD | 8A03 |
| 0002003640 | 3EBD | B303 | 3FBD | C003 | 41BD | C603 | 44BD | C903 |
| 0002003660 | 45BD | DD03 | 47BD | E303 | 48BD | FA03 | 49BD | 0303 |
| 0002003700 | 4ABE | 1303 | 4EBE | 1903 | 50BE | 1F03 | 6DBE | 2A03 |
| 0002003720 | 74BE | 3A03 | 77BE | 4403 | 79BE | 4A03 | 7ABE | 7203 |
| 0002003740 | 7DBE | 8303 | 7EBE | A403 | 82BE | B503 | 84BE | D203 |
| 0002003760 | 85BE | E703 | 88BE | EE03 | 89BE | 0603 | 8BBF | 1703 |
| 0002004000 | 8DBF | 1D03 | BEBF | 2803 | C9BF | 3803 | CCBF | 4203 |
| 0002004020 | CEBF | 4803 | CFBF | 7003 | D1BF | 8103 | D4BF | 8E03 |
| 0002004040 | D7BF | AB03 | D9BF | B703 | DABF | C203 | E8BF | DB03 |
| 0002004060 | E9BF | 7303 | F3C0 | 8403 | F5C0 | BA03 | FAC0 | C003 |
| 0002004100 | FBC0 | C303 | FEC0 | C903 | FFC0 | E103 | 03C0 | F404 |
| 0002004120 | 04C0 | 1504 | 08C1 | 2804 | 0EC1 | 4004 | 13C1 | 7004 |
| 0002004140 | 14C1 | 9204 | [illegible] | A304 | 21C1 | AD04 | 23C1 | D204 |
| 0002004160 | 28C1 | DC04 | 2BC1 | 1C04 | 2CC2 | 2604 | 2DC2 | 3F04 |
| 0002004200 | 2EC2 | 5704 | 31C2 | 5E04 | 33C2 | 7204 | 35C2 | 7804 |
| 0002004220 | 61C2 | 8304 | 6CC2 | 9304 | 70C2 | 9C04 | 71C2 | D804 |
| 0002004240 | 75C2 | DB04 | 77C2 | 1704 | 7BC3 | 2804 | 7CC3 | 4C04 |
| 0002004260 | 7DC3 | 5604 | 7EC3 | 6104 | 7FC3 | 6704 | 80C3 | 6A04 |
| 0002004300 | 82C3 | 7104 | 87C3 | 8B04 | 89C3 | D204 | 8BC3 | E304 |
| 0002004320 | 8DC3 | E604 | 8FC3 | F604 | 91C3 | FC04 | 0AC3 | 6F64 |
| 0002004340 | 5F74 | 6F6C | 6B63 | 632E | 0004 | 0020 | 0046 | C408 |
| 0002004360 | 004E | C418 | 004F | C43F | 0051 | C445 | 0055 | C47D |
| 0002004400 | 0056 | C4A6 | 0057 | C4B0 | 0058 | C4B8 | 0061 | C4BE |
| 0002004420 | 0063 | C4C4 | 007C | C4CF | 0081 | C4DF | 0082 | C506 |
| 0002004440 | 0084 | C50C | 0085 | C515 | 0086 | C525 | 008F | C52B |
| 0002004460 | 0092 | C563 | 0094 | C571 | 0096 | C577 | 00AD | C582 |

THU MAR 14 17:31:54 1991 DB_PI.DLL PAGE 456, LINE 26846

| | | | | | | | | |
|---|---|---|---|---|---|---|---|---|
| 0002004500 | 00B2 | C592 | 00B3 | C5B9 | 00B5 | C5BF | 00B7 | C5F7 |
| 0002004520 | 00B8 | C60D | 00B9 | C61C | 00BA | C622 | 00BB | C628 |
| 0002004540 | 00BC | C62E | 00BE | C643 | 00C0 | C649 | 6409 | 746F |
| 0002004560 | 745F | 6C62 | 632E | 0004 | 00A9 | 0054 | C654 | 005D |
| 0002004600 | C664 | 0060 | C687 | 0064 | C6AD | 006D | C6D7 | 006E |
| 0002004620 | C702 | 0073 | C711 | 0074 | C71D | 007A | C72D | 007B |
| 0002004640 | C751 | 007D | C75A | 007E | C777 | 0082 | C77D | 0084 |
| 0002004660 | C783 | 009F | C78E | 00A4 | C79E | 00A5 | C7B9 | 00AA |
| 0002004700 | C7C8 | 00AB | C7E3 | 00AE | C7F2 | 00B0 | C7F8 | 00D4 |
| 0002004720 | C803 | 00D7 | C813 | 00DB | C818 | 00DE | C824 | 00E0 |
| 0002004740 | C829 | 00E1 | C84C | 00E2 | C85F | 00E5 | C865 | 00E6 |
| 0002004760 | C879 | 00E7 | C889 | 00EA | C88F | 00ED | C894 | 00F1 |
| 0002005000 | C89D | 00F2 | C8A6 | 00F3 | C8C1 | 00F4 | C8D1 | 00F7 |
| 0002005020 | C8D7 | 00FB | C8DA | 00FC | C90D | 00FD | C91D | 0102 |
| 0002005040 | C923 | 0104 | C928 | 0106 | C94B | 0108 | C951 | 0109 |
| 0002005060 | C956 | 010A | C959 | 010B | C95F | 010C | C965 | 010F |
| 0002005100 | C982 | 0110 | C98F | 0112 | C995 | 0114 | C998 | 0116 |
| 0002005120 | C99E | 0132 | C9A9 | 0138 | C9B9 | 013B | C9C5 | 013D |
| 0002005140 | C9CA | 013E | C9EF | 0140 | C9FE | 0142 | CA0E | 0144 |
| 0002005160 | CA14 | 015E | CA1F | 0160 | CA2F | 0161 | CA34 | 0164 |
| 0002005200 | CA39 | 0165 | CA4F | 0167 | CA55 | 0169 | CA61 | 016A |
| 0002005220 | CA80 | 016D | CA9C | 016E | CAA9 | 016F | CAAF | 0171 |
| 0002005240 | CAB2 | 0172 | CAC8 | 0173 | CACE | 0174 | CAD1 | 0176 |
| 0002005260 | CAD7 | 0194 | CAE2 | 019C | CAF2 | 019D | CAFB | 019E |
| 0002005300 | CB00 | 019F | CB03 | 01A1 | CB08 | 01A2 | CB14 | 01A8 |
| 0002005320 | CB19 | 01A9 | CB43 | 01AB | CB52 | 01AC | CB68 | 01B1 |
| 0002005340 | CB6E | 01B3 | CB95 | 01B5 | CB9B | 01CD | CBA6 | 01D2 |
| 0002005360 | CBB6 | 01D6 | CBBB | 01D7 | CBC7 | 01DD | CBCC | 01DE |
| 0002005400 | CBF5 | 01DF | CBFE | 01E0 | CC08 | 01E1 | CC0E | 01E2 |
| 0002005420 | CC11 | 01E4 | CC17 | 01E5 | CC2D | 01E8 | CC33 | 01E9 |
| 0002005440 | CC3B | 01EA | CC47 | 01ED | CC4C | 01F0 | CC55 | 01F1 |
| 0002005460 | CC63 | 01F3 | CC6A | 01F4 | CC90 | 01F7 | CCA5 | 01F9 |
| 0002005500 | CCBE | 01FB | CCC1 | 0201 | CCC6 | 0203 | CCF0 | 0204 |
| 0002005520 | CD0F | 0207 | CD14 | 0208 | CD21 | 020A | CD27 | 020C |
| 0002005540 | CD2A | 020D | CD34 | 020E | CD46 | 020F | CD4E | 0212 |
| 0002005560 | CD54 | 0213 | CD62 | 0215 | CD6B | 0216 | CD91 | 0219 |
| 0002005600 | CDA6 | 021B | CDAC | 0237 | CDB7 | 023A | CDC7 | 023B |
| 0002005620 | CDCC | 023F | CDD1 | 0240 | CDE7 | 0242 | CDF6 | 0243 |
| 0002005640 | CE02 | 0245 | CED7 | 0246 | CE1D | 0247 | CE39 | 0249 |
| 0002005660 | CE48 | 024C | CE4B | 024D | CE58 | 024E | CE5E | 0250 |
| 0002005700 | CE61 | 0251 | CE6F | 0254 | CE75 | 0256 | CE7B | 026D |
| 0002005720 | CE86 | 0272 | CE96 | 0274 | CE9B | 0276 | CEA3 | 0278 |
| 0002005740 | CEC4 | 027A | CECD | 027B | CEE3 | 027D | CEFA | 027E |
| 0002005760 | CF20 | 027F | CF29 | 0280 | CF37 | 0283 | CF3D | 0284 |
| 0002006000 | CF4B | 0288 | CF54 | 028B | CF65 | 028C | CF68 | 028D |
| 0002006020 | CF72 | 028F | CF78 | 0291 | CF7E | 0293 | CF84 | 6307 |
| 0002006040 | 7832 | 7462 | 7672 | 632E | 0004 | 0005 | 0008 | CF90 |
| 0002006060 | 0011 | CFA0 | 0012 | CFA4 | 001E | CFAA | 0020 | CFD8 |
| 0002006100 | 6409 | 6F73 | 6F5F | 6A62 | 632E | 0004 | 009F | 0090 |
| 0002006120 | CFE4 | 0092 | CFF4 | 0093 | D00E | 009D | D019 | 009E |
| 0002006140 | D029 | 009F | D03E | 00C4 | D049 | 00CA | D059 | 00CF |
| 0002006160 | D06F | 00D1 | D08C | 00D4 | D0AF | 00D7 | D0B2 | 00D9 |
| 0002006200 | D0D8 | 00E2 | D0E3 | 00E5 | D107 | 00EC | D110 | 00EE |
| 0002006220 | D136 | 00F4 | D13F | 00FB | D14A | 00FD | D16E | 00FE |
| 0002006240 | D180 | 0105 | D1EF | 0109 | D215 | 0117 | D2B1 | 011A |
| 0002006260 | D2D7 | 011B | D2E0 | 011C | D2E9 | 011E | D311 | 011F |
| 0002006300 | D31A | 0121 | D342 | 0124 | D3B1 | 0126 | D3D6 | 0140 |
| 0002006320 | D3E1 | 0146 | D3F1 | 0149 | D407 | 0152 | D412 | 0154 |
| 0002006340 | D436 | 0155 | D43F | 0156 | D448 | 0157 | D470 | 0158 |

THU MAR 14 17:31:54 1991  DB_PI.DLL  PAGE 457, LINE 26905

| | | | | | | | | |
|---|---|---|---|---|---|---|---|---|
| 0002006360 | D473 | 0168 | D4E2 | 016B | D506 | 0175 | D50F | 017C |
| 0002006400 | D51A | 017E | D53E | 017F | D550 | 0180 | D559 | 0181 |
| 0002006420 | D581 | 0182 | D584 | 018A | D5F3 | 018F | D617 | 0191 |
| 0002006440 | D6B3 | 01AE | D6BE | 01B3 | D6CE | 01BB | D6E4 | 01BD |
| 0002006460 | D70B | 01BE | D714 | 01BF | D71D | 01C0 | D745 | 01C1 |
| 0002006500 | D748 | 01C2 | D751 | 01C3 | D779 | 01C4 | D77C | 01C7 |
| 0002006520 | D7EB | 01C9 | D810 | 01F4 | D81B | 01FA | D82B | 01FD |
| 0002006540 | D831 | 01FE | D837 | 0201 | D83A | 0202 | D83F | 0205 |
| 0002006560 | D842 | 0206 | D847 | 020A | D84A | 020B | D84F | 020F |
| 0002006600 | D852 | 0210 | D857 | 0212 | D85A | 0213 | D860 | 0217 |
| 0002006620 | D8BA | 021F | D8D0 | 0221 | D8F9 | 0222 | D902 | 0224 |
| 0002006640 | D908 | 0227 | D930 | 022A | D958 | 022E | D980 | 0231 |
| 0002006660 | D9A8 | 0233 | DA17 | 023F | DA4B | 0247 | DAAC | 0249 |
| 0002006700 | DAD5 | 024A | DADE | 024C | DAE4 | 024F | DB0C | 0252 |
| 0002006720 | DB34 | 0256 | DB5C | 0259 | DB84 | 025B | DBF3 | 025E |
| 0002006740 | DC27 | 0260 | DC4C | 0281 | DC57 | 0287 | DC67 | 028A |
| 0002006760 | DC7D | 0293 | DC88 | 0296 | DCB1 | 0298 | DCB7 | 0299 |
| 0002007000 | DCBC | 029C | DCBF | 029D | DCC4 | 02A0 | DCC7 | 02A1 |
| 0002007020 | DCCC | 02A5 | DCCF | 02A6 | DCD4 | 02A9 | DCD7 | 02AA |
| 0002007040 | DCED | 02AC | DCF0 | 02AE | DD23 | 02B0 | DD51 | 02CC |
| 0002007060 | DD5C | 02CE | DD6C | 02D4 | DD71 | 02D6 | DD87 | 02DD |
| 0002007100 | DD92 | 02E0 | DDB6 | 02E7 | DDC8 | 02EB | DDED | 02F2 |
| 0002007120 | DDF6 | 02F6 | DE1B | 02F8 | DE21 | 02F9 | DE26 | 02FC |
| 0002007140 | DE29 | 02FD | DE2E | 0301 | DE31 | 0302 | DE36 | 0305 |
| 0002007160 | DE39 | 0306 | DE3E | 0309 | DE41 | 030A | DE57 | 030C |
| 0002007200 | DE5A | 030E | DE8D | 0310 | DEBB | 0329 | DEC6 | 032B |
| 0002007220 | DED6 | 0331 | DEDB | 0339 | DEF1 | 033C | DF15 | 033E |
| 0002007240 | DF1B | 033F | DF20 | 0343 | DF23 | 0344 | DF28 | 0347 |
| 0002007260 | DF2B | 0348 | DF30 | 034B | DF33 | 034C | DF49 | 034E |
| 0002007300 | DF4C | 0350 | DF6F | 0352 | DF9D | 6409 | 6F73 | 745F |
| 0002007320 | 6C62 | 632E | 0005 | 020E | 00B9 | 0000 | 00BA | 0010 |
| 0002007340 | 00BD | 0015 | 00BE | 001D | 00C1 | 002C | 00C5 | 0032 |
| 0002007360 | 00C6 | 0055 | 00C7 | 005E | 00C8 | 0061 | 00C9 | 006D |
| 0002007400 | 00CD | 0070 | 00CE | 0099 | 00CF | 00A2 | 00D0 | 00A5 |
| 0002007420 | 00D1 | 00B1 | 00D4 | 00B4 | 00D5 | 00D7 | 00D7 | 00DA |
| 0002007440 | 00D8 | 00DF | 00D9 | 00E2 | 00DC | 0102 | 00DE | 0130 |
| 0002007460 | 00EB | 013B | 00EC | 014B | 00ED | 0150 | 00EE | 015A |
| 0002007500 | 00EF | 017B | 00F1 | 0180 | 00F8 | 0189 | 00FA | 01AC |
| 0002007520 | 00FC | 01BA | 00FD | 01C3 | 0105 | 01E8 | 0107 | 020B |
| 0002007540 | 0108 | 0214 | 0109 | 021D | 010A | 0223 | 010B | 0226 |
| 0002007560 | 0110 | 0241 | 0117 | 0244 | 0119 | 0267 | 011B | 0275 |
| 0002007600 | 011C | 027E | 0124 | 02A3 | 0126 | 02C6 | 0127 | 02CF |
| 0002007620 | 0128 | 02D8 | 0129 | 02DE | 012A | 02E1 | 012D | 02FC |
| 0002007640 | 012E | 0302 | 0145 | 030D | 0146 | 031D | 0148 | 0322 |
| 0002007660 | 0149 | 0328 | 014B | 032E | 014C | 0333 | 0152 | 033B |
| 0002007700 | 0153 | 034F | 0154 | 0361 | 0156 | 037A | 0158 | 0398 |
| 0002007720 | 0159 | 03A0 | 0161 | 03A8 | 0163 | 03B2 | 016A | 03B6 |
| 0002007740 | 016C | 03DB | 016E | 03E1 | 016F | 03E7 | 0172 | 03EA |
| 0002007760 | 0173 | 0402 | 0175 | 0411 | 0176 | 0422 | 0177 | 0432 |
| 0002010000 | 0179 | 0435 | 017B | 043B | 017C | 0460 | 017D | 0463 |
| 0002010020 | 017F | 047F | 0186 | 0489 | 0187 | 04A7 | 0188 | 04BD |
| 0002010040 | 0189 | 04CF | 018A | 04D4 | 0191 | 04DA | 01A0 | 04DD |
| 0002010060 | 01A2 | 04FB | 01A8 | 0501 | 01AA | 0526 | 01AC | 052C |
| 0002010100 | 01AE | 052F | 01AF | 0535 | 01B1 | 0538 | 01B3 | 053E |
| 0002010120 | 01B4 | 0559 | 01B5 | 055C | 01B7 | 0578 | 01B8 | 0591 |
| 0002010140 | 01C6 | 05A0 | 01C7 | 05B1 | 01CA | 05C2 | 01D0 | 05C8 |
| 0002010160 | 01D2 | 05ED | 01D3 | 05F6 | 01D5 | 05FC | 01D6 | 0601 |
| 0002010200 | 01D7 | 0606 | 01D9 | 0609 | 01DA | 060E | 01DB | 0613 |
| 0002010220 | 01DD | 0616 | 01DE | 061B | 01DF | 0620 | 01E1 | 0623 |

THU MAR 14 17:31:54 1991 DB_PI.DLL PAGE 458, LINE 26964

| | | | | | | | | |
|---|---|---|---|---|---|---|---|---|
| 0002010240 | 01E3 | 0639 | 01E9 | 0657 | 01F0 | 0660 | 01F2 | 0686 |
| 0002010260 | 01F3 | 068F | 01F4 | 0695 | 01F5 | 0698 | 01F6 | 069E |
| 0002010300 | 01FB | 06A4 | 01FC | 06A9 | 0202 | 06AE | 0204 | 06B1 |
| 0002010320 | 0205 | 06B6 | 0206 | 06BB | 0208 | 06BE | 0209 | 06C3 |
| 0002010340 | 020A | 06C8 | 020C | 06CB | 020D | 06D0 | 020E | 06D5 |
| 0002010360 | 0212 | 06D8 | 0213 | 06DD | 0214 | 06E0 | 021B | 0719 |
| 0002010400 | 0221 | 071F | 0222 | 0744 | 0223 | 074D | 0225 | 0753 |
| 0002010420 | 0226 | 0758 | 0227 | 075D | 0228 | 0761 | 022A | 0764 |
| 0002010440 | 022B | 0769 | 022C | 076E | 022E | 0771 | 022F | 0776 |
| 0002010460 | 0230 | 077B | 0231 | 077F | 0233 | 0782 | 0234 | 0798 |
| 0002010500 | 0236 | 079C | 0238 | 07BA | 023D | 07BD | 0241 | 07C3 |
| 0002010520 | 0247 | 07C9 | 0248 | 07EE | 0249 | 0800 | 0251 | 081B |
| 0002010540 | 0252 | 0840 | 0253 | 0852 | 0256 | 086D | 0258 | 087B |
| 0002010560 | 025A | 0881 | 026E | 088C | 0273 | 089C | 0277 | 08A2 |
| 0002010600 | 027B | 08E1 | 027C | 08EA | 027D | 08F4 | 027E | 08FB |
| 0002010620 | 027F | 0915 | 0280 | 091F | 0281 | 0926 | 0282 | 092F |
| 0002010640 | 0283 | 0939 | 0287 | 0940 | 0288 | 0954 | 0289 | 0972 |
| 0002010660 | 0290 | 0990 | 0291 | 09A3 | 0292 | 09B4 | 0293 | 09C7 |
| 0002010700 | 0294 | 09D9 | 0295 | 09F1 | 0297 | 0A04 | 0298 | 0A22 |
| 0002010720 | 0299 | 0A38 | 029A | 0A4C | 029C | 0A62 | 029D | 0A76 |
| 0002010740 | 029F | 0A86 | 02A0 | 0A90 | 02A1 | 0A9F | 02A3 | 0AA5 |
| 0002010760 | 02A4 | 0AAB | 02A5 | 0AB1 | 02A6 | 0AB7 | 02AA | 0ADA |
| 0002011000 | 02AB | 0AF3 | 02AC | 0AFD | 02AE | 0B03 | 02B0 | 0B08 |
| 0002011020 | 02B1 | 0B1F | 02B2 | 0B29 | 02B6 | 0B30 | 02B9 | 0B36 |
| 0002011040 | 02BB | 0B3C | 02BC | 0B42 | 02C3 | 0B78 | 02C5 | 0B96 |
| 0002011060 | 02CE | 0BD5 | 02CF | 0C22 | 02D0 | 0C3A | 02D2 | 0C4D |
| 0002011100 | 02D3 | 0C6B | 02D4 | 0C81 | 02D5 | 0C95 | 02D7 | 0CAB |
| 0002011120 | 02D8 | 0CBF | 02D9 | 0CCF | 02DA | 0CD9 | 02DB | 0CE8 |
| 0002011140 | 02DD | 0CEE | 02DE | 0CF4 | 02DF | 0CFA | 02E0 | 0D00 |
| 0002011160 | 02E6 | 0D23 | 02E8 | 0D31 | 02E9 | 0D37 | 02F9 | 0D42 |
| 0002011200 | 02FA | 0D52 | 02FB | 0D58 | 031D | 0D63 | 031F | 0D73 |
| 0002011220 | 0320 | 0D79 | 0323 | 0D81 | 0324 | 0D8B | 0327 | 0DB2 |
| 0002011240 | 032B | 0DCA | 032C | 0DDE | 032D | 0DF0 | 0335 | 0E09 |
| 0002011260 | 0337 | 0E30 | 0338 | 0E3A | 033A | 0E41 | 033C | 0E44 |
| 0002011300 | 033E | 0E6C | 0340 | 0E94 | 0342 | 0EBC | 0344 | 0EE4 |
| 0002011320 | 0345 | 0F5C | 0348 | 0F88 | 0349 | 0F93 | 034C | 0F9E |
| 0002011340 | 0356 | 0FAA | 035D | 0FB3 | 035F | 0FD8 | 0361 | 0FE8 |
| 0002011360 | 0362 | 0FF2 | 0363 | 101A | 0364 | 102D | 036C | 1055 |
| 0002011400 | 036E | 107A | 0370 | 108A | 0377 | 109F | 037A | 10C4 |
| 0002011420 | 037C | 10D4 | 037D | 10DE | 037E | 10E8 | 037F | 1160 |
| 0002011440 | 0380 | 1163 | 0381 | 1172 | 0383 | 1178 | 0384 | 117B |
| 0002011460 | 0387 | 118E | 038C | 11BA | 0393 | 11BD | 0395 | 11E3 |
| 0002011500 | 0397 | 11F3 | 0398 | 11FD | 0399 | 1225 | 039A | 123F |
| 0002011520 | 03A2 | 1267 | 03A4 | 128D | 03A6 | 129D | 03A7 | 12B1 |
| 0002011540 | 03AD | 1329 | 03AE | 1332 | 03AF | 1346 | 03B3 | 1364 |
| 0002011560 | 03B6 | 139F | 03B7 | 13BD | 03B9 | 13D5 | 03BD | 13F3 |
| 0002011600 | 03C1 | 142E | 03C3 | 1453 | 03E0 | 145E | 03E1 | 146E |
| 0002011620 | 03E6 | 1473 | 03EE | 1489 | 03F0 | 14AB | 03F1 | 14B4 |
| 0002011640 | 03F2 | 14BD | 03F3 | 14E5 | 03F4 | 14E8 | 03F6 | 1557 |
| 0002011660 | 03F8 | 1561 | 03FA | 1586 | 0413 | 1591 | 0414 | 15A1 |
| 0002011700 | 0418 | 15A6 | 0420 | 15BC | 0422 | 15D9 | 0424 | 15FE |
| 0002011720 | 0468 | 1609 | 0498 | 1619 | 049B | 161E | 049C | 1626 |
| 0002011740 | 04A2 | 162E | 04A6 | 1644 | 04A8 | 1683 | 04AD | 168E |
| 0002011760 | 04AE | 169A | 04B3 | 16A6 | 04B4 | 16B8 | 04B8 | 16EB |
| 0002012000 | 04B9 | 16F9 | 04BA | 1703 | 04BB | 170C | 04BF | 1716 |
| 0002012020 | 04C4 | 1732 | 04C8 | 173C | 04C9 | 1752 | 04CB | 175E |
| 0002012040 | 04CC | 1767 | 04CD | 176B | 04CE | 1779 | 04D0 | 177C |
| 0002012060 | 04D1 | 1785 | 04D2 | 1789 | 04D3 | 179B | 04D5 | 179E |
| 0002012100 | 04D6 | 17C6 | 04DC | 17DC | 04DD | 17E5 | 04DE | 17F2 |

THU MAR 14 17:31:54 1991 DB_PI.DLL PAGE 459, LINE 27023

| | | | | | | | | |
|---|---|---|---|---|---|---|---|---|
| 0002012120 | 04E7 | 17FA | 04F8 | 1835 | 04FB | 1860 | 04FD | 1866 |
| 0002012140 | 04FE | 188E | 0500 | 1891 | 0501 | 18B9 | 0503 | 18BC |
| 0002012160 | 0504 | 18E3 | 0505 | 18EC | 0506 | 191A | 050C | 1930 |
| 0002012200 | 050D | 1942 | 050E | 194B | 050F | 1954 | 0511 | 195E |
| 0002012220 | 0518 | 1969 | 051A | 198D | 051B | 1996 | 0522 | 1A05 |
| 0002012240 | 0524 | 1A29 | 0525 | 1A32 | 052C | 1AA1 | 052E | 1AC3 |
| 0002012260 | 0530 | 1B5F | 0561 | 1B6A | 0592 | 1B7A | 0594 | 1B7F |
| 0002012300 | 0595 | 1B87 | 0596 | 1B8F | 0598 | 1B94 | 0599 | 1B9C |
| 0002012320 | 059E | 1BA6 | 05A2 | 1BE4 | 05A4 | 1C23 | 05A8 | 1C2E |
| 0002012340 | 05A9 | 1C3A | 05AD | 1C48 | 05AE | 1C5A | 05B2 | 1C8D |
| 0002012360 | 05B3 | 1C9B | 05B4 | 1CA5 | 05B5 | 1CAE | 05B9 | 1CB8 |
| 0002012400 | 05BF | 1CD4 | 05C1 | 1CDE | 05C2 | 1CE8 | 05C3 | 1CF2 |
| 0002012420 | 05C7 | 1CFC | 05CA | 1D08 | 05CB | 1D11 | 05CC | 1D1A |
| 0002012440 | 05CD | 1D28 | 05D0 | 1D2B | 05D1 | 1D34 | 05D2 | 1D3D |
| 0002012460 | 05D3 | 1D4F | 05D5 | 1D52 | 05D6 | 1D7A | 05D8 | 1D90 |
| 0002012500 | 05DB | 1D9C | 05DD | 1DA5 | 05E1 | 1DBA | 05E2 | 1DCF |
| 0002012520 | 05E5 | 1DD2 | 05E7 | 1DDB | 05EB | 1DF0 | 05EC | 1E05 |
| 0002012540 | 05EE | 1E08 | 05EF | 1E30 | 05F6 | 1E46 | 05FC | 1E53 |
| 0002012560 | 05FD | 1E60 | 0607 | 1E68 | 0609 | 1EA3 | 061A | 1EAF |
| 0002012600 | 061D | 1ED5 | 061F | 1EDB | 0620 | 1F03 | 0622 | 1F06 |
| 0002012620 | 0623 | 1F2E | 0625 | 1F31 | 0626 | 1F58 | 0627 | 1F61 |
| 0002012640 | 0628 | 1F8F | 062F | 1FA5 | 0630 | 1FB7 | 0631 | 1FC0 |
| 0002012660 | 0632 | 1FC9 | 0634 | 1FD3 | 063B | 1FDE | 063D | 2002 |
| 0002012700 | 063E | 200B | 0645 | 207A | 0647 | 209E | 0648 | 20A7 |
| 0002012720 | 064F | 2116 | 0651 | 2138 | 0653 | 21D4 | 0686 | 21DF |
| 0002012740 | 0688 | 21EF | 068A | 21F4 | 068B | 21F9 | 068F | 21FE |
| 0002012760 | 0690 | 220E | 0693 | 2214 | 0694 | 2228 | 0695 | 223A |
| 0002013000 | 0698 | 2253 | 06A0 | 225E | 06A2 | 2282 | 06A3 | 228B |
| 0002013020 | 06A5 | 2291 | 06A7 | 22B9 | 06A8 | 2328 | 06AB | 2336 |
| 0002013040 | 06B1 | 233F | 06B3 | 2363 | 06B6 | 2371 | 06BC | 237D |
| 0002013060 | 06BE | 23C5 | 06BF | 23CE | 06C0 | 23D3 | 06C2 | 23D6 |
| 0002013100 | 06C3 | 23D9 | 06C7 | 23DC | 06CE | 23E5 | 06D0 | 2408 |
| 0002013120 | 06D2 | 240B | 06D3 | 241D | 06D4 | 2422 | 06D5 | 2425 |
| 0002013140 | 06DC | 2494 | 06DE | 24B6 | 06DF | 24BF | 06E0 | 24C8 |
| 0002013160 | 06E1 | 24F0 | 06E2 | 24F3 | 06E4 | 2562 | 06E6 | 256C |
| 0002013200 | 06E8 | 2591 | 0707 | 259C | 070A | 25AC | 070D | 25B1 |
| 0002013220 | 0710 | 25C7 | 0711 | 25DB | 0712 | 25ED | 071C | 2606 |
| 0002013240 | 071E | 2628 | 071F | 2632 | 0724 | 2648 | 0725 | 2660 |
| 0002013260 | 0729 | 2688 | 072A | 26A6 | 072B | 26D3 | 072C | 26F1 |
| 0002013300 | 072D | 271E | 072E | 273C | 072F | 2769 | 0730 | 2787 |
| 0002013320 | 0731 | 27B4 | 0732 | 27D2 | 0735 | 27FF | 0737 | 282D |
| 0002013340 | 0750 | 2838 | 0751 | 2848 | 0753 | 284D | 0754 | 2864 |
| 0002013360 | 0755 | 286D | 0756 | 2886 | 0757 | 288F | 075A | 2899 |
| 0002013400 | 075B | 289E | 075C | 28A1 | 075E | 28AF | 075F | 28B5 |
| 0002013420 | 640A | 6F73 | 665F | 6C69 | 2E65 | 0563 | AA00 | 7A01 |
| 0002013440 | C000 | 7D28 | D000 | 7E28 | E600 | 7F28 | F100 | 8028 |
| 0002013460 | F800 | 8528 | FE00 | 8628 | 3500 | 8729 | 4100 | 8829 |
| 0002013500 | 4400 | 8A29 | 4B00 | 8C29 | 5100 | AE29 | 5C00 | B129 |
| 0002013520 | 6C00 | B229 | 8200 | B329 | 8D00 | B429 | A100 | B729 |
| 0002013540 | A700 | B829 | AA00 | B929 | BE00 | BB29 | C400 | D729 |
| 0002013560 | CF00 | D829 | DF00 | E229 | E400 | E429 | 4700 | E52A |
| 0002013600 | 6600 | EB2A | 6C00 | EC2A | 8500 | EE2A | 8B00 | F02A |
| 0002013620 | 9400 | 0B2A | 9F01 | 0C2A | AF01 | 0D2A | CD01 | 0E2A |
| 0002013640 | D301 | 282A | DE01 | 2C2A | EE01 | 2D2A | F701 | 2F2A |
| 0002013660 | 0B01 | 312B | 3901 | 322B | 4D01 | 362B | 5C01 | 372B |
| 0002013700 | 7901 | 3C2B | 7F01 | 3E2B | 9501 | 3F2B | A401 | 402B |
| 0002013720 | BC01 | 412B | C201 | 422B | C501 | 442B | CB01 | 462B |
| 0002013740 | D101 | 472B | D701 | 4A2B | EC01 | 4C2B | F201 | 582B |
| 0002013760 | FD01 | 5A2B | 0D01 | 5C2C | 1201 | 5F2C | 1701 | 612C |

THU MAR 14 17:31:54 1991  DB_PI.DLL  PAGE 460, LINE 27082

| | | | | | | | | |
|---|---|---|---|---|---|---|---|---|
| 0002014000 | 1C01 | 682C | 2101 | 692C | 4601 | 6A2C | 4F01 | 6D2C |
| 0002014020 | 5501 | 6F2C | 5B01 | 712C | 6101 | 722C | 6701 | 742C |
| 0002014040 | 8A01 | 772C | 9501 | 782C | AD01 | 7F2C | B301 | 812C |
| 0002014060 | EB01 | 882C | F001 | 8B2C | 1201 | 8F2D | 4D01 | 902D |
| 0002014100 | 6401 | 922D | 6701 | 942D | 6F01 | 962D | 7B01 | 982D |
| 0002014120 | B401 | 992D | BD01 | 9A2D | CE01 | 9C2D | DD01 | 9D2D |
| 0002014140 | E001 | 9E2D | F601 | 9F2D | 0501 | A02E | DB01 | A12E |
| 0002014160 | 1101 | A22E | 1701 | A42E | 2C01 | A72E | 3E01 | A92E |
| 0002014200 | 5401 | AA2E | 6301 | AB2E | 6901 | AC2E | 6F01 | AD2E |
| 0002014220 | 7501 | AE2E | 7B01 | B12E | 9801 | B32E | 9E01 | CB2E |
| 0002014240 | A901 | CD2E | B901 | CF2E | BE01 | D12E | C301 | D42E |
| 0002014260 | C801 | D72E | C001 | DF2E | 0701 | E22F | 2A01 | E62F |
| 0002014300 | 6501 | E72F | 7C01 | E92F | 7F01 | EB2F | 8B01 | ED2F |
| 0002014320 | C401 | EE2F | DA01 | EF2F | E201 | F02F | F101 | F12F |
| 0002014340 | F701 | F22F | FD01 | F32F | 0301 | F630 | 1801 | F830 |
| 0002014360 | 2A01 | FA30 | 3201 | FC30 | 3801 | 1930 | 4302 | 1D30 |
| 0002014400 | 5302 | 1F30 | 5C02 | 2030 | 6D02 | 2230 | 7C02 | 2430 |
| 0002014420 | 7F02 | 2630 | 9502 | 2730 | A402 | 2830 | AA02 | 2930 |
| 0002014440 | B002 | 2A30 | B602 | 2B30 | BC02 | 2F30 | D902 | 3130 |
| 0002014460 | DF02 | 4B30 | EA02 | 4C30 | FA02 | 4E30 | FF02 | 5030 |
| 0002014500 | 0502 | 5231 | 0A02 | 5431 | 0F02 | 5631 | 1B02 | 5831 |
| 0002014520 | 3302 | 6031 | 3802 | 6131 | 5F02 | 6231 | 6802 | 6531 |
| 0002014540 | 6E02 | 6731 | 7402 | 6931 | 7A02 | 6A31 | 8002 | 6C31 |
| 0002014560 | A302 | 6E31 | AB02 | 7031 | BB02 | 7131 | CD02 | 7431 |
| 0002014600 | D302 | 7731 | EE02 | 7931 | 2602 | 8132 | 2B02 | 8532 |
| 0002014620 | 4F02 | 8932 | 8C02 | 8A32 | A502 | 8D32 | A802 | 8F32 |
| 0002014640 | B402 | 9132 | EE02 | 9432 | 0002 | 9533 | 1302 | 9633 |
| 0002014660 | 2C02 | 9733 | 3C02 | 9833 | 4502 | 9933 | 4D02 | A133 |
| 0002014700 | 5302 | A433 | 6C02 | A733 | A902 | A933 | BC02 | AA33 |
| 0002014720 | C402 | AD33 | CA02 | AE33 | CD02 | AF33 | D302 | BD33 |
| 0002014740 | DE02 | BE33 | EE02 | C133 | 0902 | C234 | 4302 | C334 |
| 0002014760 | 6302 | C434 | 6C02 | D034 | 7702 | D134 | 8702 | D334 |
| 0002015000 | 8C02 | D534 | 9202 | D934 | 9702 | DA34 | AF02 | DB34 |
| 0002015020 | C902 | DC34 | CF02 | DD34 | D502 | DE34 | DB02 | DF34 |
| 0002015040 | E102 | E034 | E702 | E234 | 0402 | E535 | 1C02 | E735 |
| 0002015060 | 5402 | EF35 | 5902 | F835 | 7D02 | FA35 | B102 | FB35 |
| 0002015100 | CB02 | FE35 | E502 | FF35 | EF02 | 0035 | 0603 | 0136 |
| 0002015120 | 0903 | 0336 | 2003 | 0436 | 2903 | 0536 | 3103 | 0B36 |
| 0002015140 | 3703 | 0D36 | 5003 | 0F36 | 6303 | 1036 | 6B03 | 1236 |
| 0002015160 | 7103 | 3636 | 7C03 | 3836 | 8C03 | 4336 | 9203 | 4436 |
| 0002015200 | AA03 | 4536 | C203 | 4636 | D103 | 4736 | D803 | 4836 |
| 0002015220 | DE03 | 4936 | E103 | 4A36 | E703 | 4B36 | ED03 | 4C36 |
| 0002015240 | F303 | 4D36 | F603 | 4E36 | FC03 | 5036 | 1E03 | 5137 |
| 0002015260 | 2803 | 5237 | 3203 | 5337 | 3B03 | 5537 | 5303 | 5737 |
| 0002015300 | 8603 | 5837 | 8903 | 5937 | 9203 | 5A37 | A003 | 5B37 |
| 0002015320 | A303 | 5D37 | A903 | 5F37 | BD03 | 6037 | C003 | 6137 |
| 0002015340 | CA03 | 6237 | D303 | 6337 | D903 | 6437 | DC03 | 6537 |
| 0002015360 | E503 | 6637 | FD03 | 6737 | 1703 | 6838 | 2F03 | 6938 |
| 0002015400 | 3803 | 6A38 | 3E03 | 6C38 | 5603 | 6D38 | 5903 | 6E38 |
| 0002015420 | 6203 | 6F38 | 6803 | 7338 | 8003 | 7438 | 8303 | 7538 |
| 0002015440 | 9B03 | 7638 | BC03 | 7738 | D403 | 7838 | DA03 | 7B38 |
| 0002015460 | F203 | 7C38 | F903 | A038 | 0403 | AD39 | 1403 | AE39 |
| 0002015500 | 2B03 | AF39 | 3403 | B139 | 3A03 | B339 | 4003 | B539 |
| 0002015520 | 4603 | B639 | 4C03 | B739 | 6703 | BA39 | 7603 | BB39 |
| 0002015540 | 9C03 | BC39 | A503 | BD39 | BA03 | BE39 | CE03 | C439 |
| 0002015560 | DD03 | C639 | 0503 | C73A | 0E03 | C83A | 1403 | C93A |
| 0002015600 | 1A03 | CA3A | 2003 | CB3A | 2603 | CE3A | 3C03 | CF3A |
| 0002015620 | 5503 | D03A | 5E03 | D13A | 6603 | D33A | 6C03 | D43A |
| 0002015640 | 8503 | D53A | 8E03 | D63A | 9603 | D93A | 9C03 | DA3A |

THU MAR 14 17:31:54 1991 DB_PI.DLL PAGE 461, LINE 27141

| | | | | | | | | |
|---|---|---|---|---|---|---|---|---|
| 0002015660 | A503 | DB3A | B003 | DC3A | BF03 | DD3A | CA03 | DE3A |
| 0002015700 | D903 | E03A | DF03 | 003A | EA04 | 013A | FA04 | 033A |
| 0002015720 | 0304 | 043B | 2604 | 063B | 2904 | 073B | 4C04 | 163B |
| 0002015740 | 5704 | 183B | 6704 | 193B | 6C04 | 1A3B | 7104 | 1D3B |
| 0002015760 | 7604 | 213B | 7B04 | 223B | 9B04 | 233B | AC04 | 243B |
| 0002016000 | BC04 | 253B | C704 | 263B | D504 | 2B3B | DB04 | 2C3B |
| 0002016020 | F104 | 2E3B | F904 | 2F3B | 0D04 | 313C | 4704 | 333C |
| 0002016040 | 5F04 | 3A3C | 6504 | 3B3C | 7B04 | 3C3C | 8304 | 3D3C |
| 0002016060 | BD04 | 463C | CF04 | 473C | F404 | 4B3C | 0304 | 4C3D |
| 0002016100 | 1B04 | 4E3D | 2404 | 4F3D | 4604 | 513D | 4C04 | 533D |
| 0002016120 | 5804 | 543D | 5B04 | 553D | 6C04 | 5B3D | 7D04 | 5D3D |
| 0002016140 | 9404 | 5F3D | 9D04 | 603D | A004 | 613D | A904 | 623D |
| 0002016160 | B104 | 633D | CD04 | 663D | D304 | 673D | E904 | 683D |
| 0002016200 | F104 | 693D | 0304 | 6B3E | 2604 | 6C3E | 3404 | 6D3E |
| 0002016220 | 4204 | 6F3E | 4A04 | 713E | 5004 | 803E | 5B04 | 833E |
| 0002016240 | 6B04 | 8A3E | 7004 | 8B3E | 8504 | 8E3E | 8904 | 8F3E |
| 0002016260 | 9D04 | 903E | AF04 | 913E | CB04 | 923E | DE04 | 943E |
| 0002016300 | F204 | 983E | 0204 | 993F | 1A04 | 9A3F | 3004 | 9C3F |
| 0002016320 | 3604 | 9D3F | 3904 | 9E3F | 4304 | A33F | 4904 | A43F |
| 0002016340 | 5B04 | A53F | 6B04 | A83F | 7904 | A93F | 8D04 | AA3F |
| 0002016360 | 9004 | AC3F | A104 | AD3F | B404 | AF3F | C804 | B23F |
| 0002016400 | CB04 | B43F | CE04 | B63F | D404 | D33F | DF04 | D63F |
| 0002016420 | EF04 | DB3F | 0104 | DD40 | 4504 | DE40 | 5704 | E140 |
| 0002016440 | 5D04 | E240 | 7104 | E440 | 9704 | E540 | 9D04 | FD40 |
| 0002016460 | A804 | 0240 | D305 | 0540 | C905 | 0F40 | F805 | 1040 |
| 0002016500 | 7005 | 1241 | 7605 | 1341 | 7905 | 1441 | 8505 | 1541 |
| 0002016520 | 8805 | 1F41 | AB05 | 2041 | 2305 | 2142 | 2905 | 2342 |
| 0002016540 | 2C05 | 2442 | 3205 | 4742 | 3D05 | 4842 | 4D05 | 4A42 |
| 0002016560 | 5E05 | 4B42 | 8A05 | 4D42 | 9005 | 4E42 | AE05 | 4F42 |
| 0002016600 | C405 | 5142 | CC05 | 5242 | F105 | 5442 | F405 | 5542 |
| 0002016620 | 0005 | 5643 | 2505 | 5743 | 2805 | 5943 | 2B05 | 5A43 |
| 0002016640 | 3105 | 7443 | 3C05 | 7743 | 4C05 | 7843 | 5705 | 7943 |
| 0002016660 | 5D05 | 7A43 | 7505 | 7B43 | 8105 | 7D43 | 8705 | 7E43 |
| 0002016700 | 8A05 | 7F43 | 9005 | 0A43 | 7364 | 5F6F | 6168 | 6873 |
| 0002016720 | 632E | 0005 | 0068 | 0062 | 439C | 0065 | 43AC | 0066 |
| 0002016740 | 43C2 | 0067 | 43D7 | 0069 | 43E6 | 006A | 4401 | 006B |
| 0002016760 | 4414 | 006C | 4426 | 006D | 4432 | 0070 | 4438 | 0071 |
| 0002017000 | 4444 | 0073 | 4451 | 0074 | 4467 | 0075 | 447C | 0076 |
| 0002017020 | 4492 | 0077 | 44AC | 0079 | 44AF | 007B | 44B5 | 0092 |
| 0002017040 | 44C0 | 0095 | 44D0 | 0097 | 44E1 | 0098 | 44FA | 009B |
| 0002017060 | 4510 | 009D | 4534 | 009F | 4557 | 00A0 | 457C | 00A2 |
| 0002017100 | 45A5 | 00A4 | 45A8 | 00A6 | 45C5 | 00A7 | 45C8 | 00A8 |
| 0002017120 | 45D6 | 00A9 | 45DC | 00B6 | 45E7 | 00B7 | 45F7 | 00BA |
| 0002017140 | 45FC | 00BB | 4608 | 00BC | 4614 | 00BD | 462D | 00BF |
| 0002017160 | 4630 | 00C0 | 4636 | 00CE | 4641 | 00CF | 4651 | 00D3 |
| 0002017200 | 4656 | 00D4 | 465E | 00D5 | 4679 | 00D6 | 46A2 | 00D7 |
| 0002017220 | 46AA | 00D9 | 46B0 | 00DA | 46B3 | 00DC | 46B6 | 00DD |
| 0002017240 | 46BC | 00FE | 46C7 | 0102 | 46D7 | 0104 | 46DC | 0106 |
| 0002017260 | 46ED | 010A | 4704 | 010D | 472F | 0110 | 475E | 0115 |
| 0002017300 | 4774 | 0117 | 47B2 | 011A | 47B5 | 011C | 47CC | 011D |
| 0002017320 | 47D7 | 011F | 47DD | 0126 | 47F8 | 0127 | 4830 | 0128 |
| 0002017340 | 4849 | 0129 | 486C | 012A | 488B | 012C | 488E | 012E |
| 0002017360 | 48A5 | 012F | 48B9 | 0132 | 48CA | 0136 | 48CD | 0137 |
| 0002017400 | 48D6 | 0138 | 48DF | 0139 | 48E5 | 013A | 48E8 | 013C |
| 0002017420 | 48EE | 013D | 48F1 | 013E | 4905 | 0145 | 4916 | 0146 |
| 0002017440 | 4944 | 0147 | 496A | 014A | 4970 | 014B | 4990 | 014E |
| 0002017460 | 49C2 | 014F | 49EF | 0151 | 4A0D | 0153 | 4A13 | 0171 |
| 0002017500 | 4A1E | 0173 | 4A2E | 0175 | 4A33 | 0177 | 4A44 | 017B |
| 0002017520 | 4A5B | 017C | 4A86 | 017D | 4A8F | 017E | 4A9B | 0182 |

THU MAR 14 17:31:54 1991 DB_PI.DLL PAGE 462, LINE 27200

| | | | | | | | | |
|---|---|---|---|---|---|---|---|---|
| 0002017540 | 4AA1 | 0183 | 4AC4 | 0184 | 4ADC | 0186 | 4AF1 | 0187 |
| 0002017560 | 4B2A | 0189 | 4B30 | 0C00 | 6C6C | 6269 | 6463 | 6C6C |
| 0002017600 | 6C2E | 6269 | 6F07 | 3273 | 6C2E | 6269 | 6C0A | 6962 |
| 0002017620 | 6D70 | 2E74 | 696C | 0C62 | 7462 | 6372 | 6C61 | 736C |
| 0002017640 | 6C2E | 6269 | 6406 | 2E66 | 696C | 0662 | 7364 | 6C2E |
| 0002017660 | 6269 | 01DB | 0101 | 0001 | 0008 | 0000 | 001F | 0102 |
| 0002017700 | 0001 | 11A3 | 0000 | 007B | 0103 | 0001 | 4DAA | 0000 |
| 0002017720 | 1B4B | 0104 | 0001 | C2A6 | 0002 | 05CB | 0109 | 0001 |
| 0002017740 | AD11 | 0003 | 019A | 0101 | 0002 | 0027 | 0000 | 001F |
| 0002017760 | 0102 | 0002 | 121E | 0000 | 008F | 0103 | 0002 | 68F5 |
| 0002020000 | 0000 | 0F4A | 0104 | 0002 | C871 | 0002 | 05DD | 0109 |
| 0002020020 | 0002 | AEAB | 0003 | 0206 | 0101 | 0003 | 0046 | 0000 |
| 0002020040 | 0020 | 0102 | 0003 | 12AD | 0000 | 0140 | 0103 | 0003 |
| 0002020060 | 783F | 0000 | 10C7 | 0104 | 0003 | CE4E | 0002 | 0D63 |
| 0002020100 | 0109 | 0003 | B0B1 | 0003 | 0277 | 0101 | 0004 | 0066 |
| 0002020120 | 0000 | 0020 | 0102 | 0004 | 13ED | 0000 | 00A1 | 0103 |
| 0002020140 | 0004 | 8906 | 0000 | 189C | 0104 | 0004 | DBB1 | 0002 |
| 0002020160 | 06C0 | 0109 | 0004 | B328 | 0003 | 031F | 0101 | 0005 |
| 0002020200 | 0086 | 0000 | 0020 | 0102 | 0005 | 148E | 0000 | 00B0 |
| 0002020220 | 0103 | 0005 | A1A2 | 0000 | 1D1F | 0104 | 0005 | E271 |
| 0002020240 | 0002 | 0926 | 0109 | 0005 | B647 | 0003 | 04B7 | 0101 |
| 0002020260 | 0006 | 00A6 | 0000 | 001E | 0102 | 0006 | 153E | 0000 |
| 0002020300 | 007A | 0103 | 0006 | BEC1 | 0000 | 11C1 | 0104 | 0006 |
| 0002020320 | EB97 | 0002 | 0589 | 0109 | 0006 | BAFE | 0003 | 0185 |
| 0002020340 | 0101 | 0007 | 00C4 | 0000 | 001E | 0102 | 0007 | 15B5 |
| 0002020360 | 0000 | 010E | 0103 | 0007 | D082 | 0000 | 1529 | 0104 |
| 0002020400 | 0007 | F120 | 0002 | 0E0A | 0109 | 0007 | BC83 | 0003 |
| 0002020420 | 0585 | 0101 | 0008 | 00E2 | 0000 | 001F | 0102 | 0008 |
| 0002020440 | 16C6 | 0000 | 00AD | 0103 | 0008 | E5AB | 0000 | 127E |
| 0002020460 | 0104 | 0008 | FF2A | 0002 | 0770 | 0109 | 0008 | C208 |
| 0002020500 | 0003 | 01CE | 0101 | 0009 | 0101 | 0000 | 001F | 0102 |
| 0002020520 | 0009 | 1766 | 0000 | 012D | 0103 | 0009 | F829 | 0000 |
| 0002020540 | 173B | 0104 | 0009 | 069A | 0003 | 0FE2 | 0109 | 0009 |
| 0002020560 | C3D6 | 0003 | 078A | 0101 | 000A | 0120 | 0000 | 001F |
| 0002020600 | 0102 | 000A | 1893 | 0000 | 006F | 0103 | 000A | 0F64 |
| 0002020620 | 0001 | 1AAC | 0104 | 000A | 167C | 0003 | 0699 | 0109 |
| 0002020640 | 000A | CB60 | 0003 | 026A | 0101 | 00CB | 013F | 0000 |
| 0002020660 | 001E | 0102 | 000B | 1902 | 0000 | 00B7 | 0103 | 000B |
| 0002020700 | 2A10 | 0001 | 1377 | 0104 | 000B | 1D15 | 0003 | 07B5 |
| 0002020720 | 0109 | 000B | CDCA | 0003 | 0239 | 0101 | 000C | 015D |
| 0002020740 | 0000 | 001E | 0102 | 000C | 19B9 | 0000 | 009A | 0103 |
| 0002020760 | 000C | 3D87 | 0001 | 1138 | 0104 | 000C | 24CA | 0003 |
| 0002021000 | 07FA | 0109 | 000C | D003 | 0003 | 0241 | 0101 | 000D |
| 0002021020 | 017B | 0000 | 001F | 0102 | 000D | 1A53 | 0000 | 0377 |
| 0002021040 | 0103 | 000D | 4EBF | 0001 | 1AFB | 0104 | 000D | 2CC4 |
| 0002021060 | 0003 | 0BC8 | 0109 | 000D | D244 | 0003 | 086E | 0101 |
| 0002021100 | 000E | 019A | 0000 | 001F | 0102 | 000E | 1DCA | 0000 |
| 0002021120 | 0182 | 0103 | 000E | 69BA | 0001 | 15AD | 0104 | 000E |
| 0002021140 | 388C | 0003 | 09B0 | 0109 | 000E | DAB2 | 0003 | 0582 |
| 0002021160 | 0101 | 000F | 01B9 | 0000 | 0020 | 0102 | 000F | 1F4C |
| 0002021200 | 0000 | 0195 | 0103 | 000F | 7F67 | 0001 | 1847 | 0104 |
| 0002021220 | 000F | 423C | 0003 | 09A3 | 0109 | 000F | E034 | 0003 |
| 0002021240 | 04B3 | 0101 | 0010 | 01D9 | 0000 | 001F | 0102 | 0010 |
| 0002021260 | 20E1 | 0000 | 0049 | 0103 | 0010 | 97AE | 0001 | 10BE |
| 0002021300 | 0104 | 0010 | 4BDF | 0003 | 0210 | 0109 | 0010 | E4E7 |
| 0002021320 | 0003 | 013A | 0101 | 0011 | 01F8 | 0000 | 001F | 0102 |
| 0002021340 | 0011 | 212A | 0000 | 00A8 | 0103 | 0011 | A86C | 0001 |
| 0002021360 | 1073 | 0104 | 0011 | 4DEF | 0003 | 0242 | 0109 | 0011 |
| 0002021400 | E621 | 0003 | 0162 | 0101 | 0012 | 0217 | 0000 | 001F |

THU MAR 14 17:31:54 1991 DB_PI.DLL PAGE 463, LINE 27259

| | | | | | | | | |
|---|---|---|---|---|---|---|---|---|
| 0002021420 | 0102 | 0012 | 21D2 | 0000 | 0083 | 0103 | 0012 | B8DF |
| 0002021440 | 0001 | 0F4A | 0104 | 0012 | 5031 | 0003 | 01E1 | 0109 |
| 0002021460 | 0012 | E783 | 0003 | 012E | 0101 | 0013 | 0236 | 0000 |
| 0002021500 | 001F | 0102 | 0013 | 2255 | 0000 | 00BF | 0103 | 0013 |
| 0002021520 | C829 | 0001 | 0F4A | 0104 | 0013 | 5212 | 0003 | 02CF |
| 0002021540 | 0109 | 0013 | E8B1 | 0003 | 017E | 0101 | 0014 | 0255 |
| 0002021560 | 0000 | 0020 | 0102 | 0014 | 2314 | 0000 | 0017 | 0103 |
| 0002021600 | 0014 | D773 | 0001 | 019E | 0104 | 0014 | 54E1 | 0003 |
| 0002021620 | 0091 | 0109 | 0014 | EA2F | 0003 | 0053 | 0101 | 0015 |
| 0002021640 | 0275 | 0000 | 001E | 0102 | 0015 | 232B | 0000 | 00B2 |
| 0002021660 | 0103 | 0015 | D911 | 0001 | 11C4 | 0104 | 0015 | 5572 |
| 0002021700 | 0003 | 0991 | 0109 | 0015 | EA82 | 0003 | 0509 | 0101 |
| 0002021720 | 0016 | 0293 | 0000 | 001F | 0102 | 0016 | 23DD | 0000 |
| 0002021740 | 009C | 0103 | 0016 | EAD5 | 0001 | 110E | 0104 | 0016 |
| 0002021760 | 5F03 | 0003 | 0721 | 0109 | 0016 | EF8B | 0003 | 0712 |
| 0002022000 | 0101 | 0017 | 02B2 | 0000 | 001F | 0102 | 0017 | 2479 |
| 0002022020 | 0000 | 0061 | 0103 | 0017 | FBE3 | 0001 | 0F80 | 0104 |
| 0002022040 | 0017 | 6624 | 0003 | 02CD | 0109 | 0017 | F69D | 0003 |
| 0002022060 | 02E6 | 0101 | 0018 | 02D1 | 0000 | 0020 | 0102 | 0018 |
| 0002022100 | 24DA | 0000 | 005C | 0103 | 0018 | 0B63 | 0002 | 151A |
| 0002022120 | 0104 | 0018 | 68F1 | 0003 | 0902 | 0109 | 0018 | F983 |
| 0002022140 | 0003 | 04EB | 0101 | 0019 | 02F1 | 0000 | 001F | 0102 |
| 0002022160 | 0019 | 2536 | 0000 | 000C | 0103 | 0019 | 207D | 0002 |
| 0002022200 | 0DDA | 0104 | 0019 | 71F3 | 0003 | 0104 | 0109 | 0019 |
| 0002022220 | FE6E | 0003 | 001E | 0101 | 001A | 0310 | 0000 | 0018 |
| 0002022240 | 0102 | 001A | 2542 | 0000 | 0152 | 0101 | 001B | 0328 |
| 0002022260 | 0000 | 001B | 0102 | 001B | 2694 | 0000 | 01D2 | 0101 |
| 0002022300 | 001C | 0343 | 0000 | 001C | 0102 | 001C | 2866 | 0000 |
| 0002022320 | 0035 | 0101 | 001D | 035F | 0000 | 0017 | 0102 | 001D |
| 0002022340 | 289B | 0000 | 000F | 0101 | 001E | 0376 | 0000 | 0017 |
| 0002022360 | 0102 | 001E | 28AA | 0000 | 0033 | 0101 | 001F | 038D |
| 0002022400 | 0000 | 001A | 0102 | 001F | 28DD | 0000 | 0010 | 0101 |
| 0002022420 | 0020 | 03A7 | 0000 | 001C | 0102 | 0020 | 28ED | 0000 |
| 0002022440 | 0025 | 0101 | 0021 | 03C3 | 0000 | 001B | 0102 | 0021 |
| 0002022460 | 2912 | 0000 | 003F | 0101 | 0022 | 03DE | 0000 | 0015 |
| 0002022500 | 0102 | 0022 | 2951 | 0000 | 0020 | 0101 | 0023 | 03F3 |
| 0002022520 | 0000 | 0014 | 0102 | 0023 | 2971 | 0000 | 001C | 0101 |
| 0002022540 | 0024 | 0407 | 0000 | 0016 | 0102 | 0024 | 298D | 0000 |
| 0002022560 | 000F | 0101 | 0025 | 041D | 0000 | 0016 | 0102 | 0025 |
| 0002022600 | 299C | 0000 | 001E | 0101 | 0026 | 0433 | 0000 | 0015 |
| 0002022620 | 0102 | 0026 | 29BA | 0000 | 000E | 0101 | 0027 | 0448 |
| 0002022640 | 0000 | 0017 | 0102 | 0027 | 29C8 | 0000 | 0020 | 0101 |
| 0002022660 | 0028 | 045F | 0000 | 0015 | 0102 | 0028 | 29E8 | 0000 |
| 0002022700 | 000E | 0101 | 0029 | 0474 | 0000 | 0018 | 0102 | 0029 |
| 0002022720 | 29F6 | 0000 | 000F | 0101 | 002A | 048C | 0000 | 0014 |
| 0002022740 | 0102 | 002A | 2A05 | 0000 | 0037 | 0101 | 002B | 04A0 |
| 0002022760 | 0000 | 0018 | 0102 | 002B | 2A3C | 0000 | 000F | 0101 |
| 0002023000 | 002C | 04B8 | 0000 | 0018 | 0102 | 002C | 2A4B | 0000 |
| 0002023020 | 000F | 0101 | 002D | 04D0 | 0000 | 0019 | 0102 | 002D |
| 0002023040 | 2A5A | 0000 | 0010 | 0101 | 002E | 04E9 | 0000 | 0018 |
| 0002023060 | 0102 | 002E | 2A6A | 0000 | 000F | 0101 | 002F | 0501 |
| 0002023100 | 0000 | 0014 | 0102 | 002F | 2A79 | 0000 | 0011 | 0101 |
| 0002023120 | 0030 | 0515 | 0000 | 0018 | 0102 | 0030 | 2A8A | 0000 |
| 0002023140 | 001C | 0101 | 0031 | 052D | 0000 | 0015 | 0102 | 0031 |
| 0002023160 | 2AA6 | 0000 | 0030 | 0101 | 0032 | 0542 | 0000 | 0014 |
| 0002023200 | 0102 | 0032 | 2AD6 | 0000 | 000E | 0101 | 0033 | 0556 |
| 0002023220 | 0000 | 0017 | 0102 | 0033 | 2AE4 | 0000 | 000F | 0101 |
| 0002023240 | 0034 | 056D | 0000 | 0015 | 0102 | 0034 | 2AF3 | 0000 |
| 0002023260 | 0012 | 0101 | 0035 | 0582 | 0000 | 0015 | 0102 | 0035 |

THU MAR 14 17:31:54 1991 DB_PI.DLL PAGE 464, LINE 27318

| | | | | | | | | |
|---|---|---|---|---|---|---|---|---|
| 0002023300 | 2B05 | 0000 | 0038 | 0101 | 0036 | 0597 | 0000 | 0015 |
| 0002023320 | 0102 | 0036 | 2B3D | 0000 | 0020 | 0101 | 0037 | 05AC |
| 0002023340 | 0000 | 001A | 0102 | 0037 | 2B5D | 0000 | 000D | 0101 |
| 0002023360 | 0038 | 05C6 | 0000 | 001A | 0102 | 0038 | 2B6A | 0000 |
| 0002023400 | 001E | 0101 | 0039 | 05E0 | 0000 | 0019 | 0102 | 0039 |
| 0002023420 | 2B88 | 0000 | 0031 | 0101 | 003A | 05F9 | 0000 | 0019 |
| 0002023440 | 0102 | 003A | 2BB9 | 0000 | 000C | 0101 | 003B | 0612 |
| 0002023460 | 0000 | 0016 | 0102 | 003B | 2BC5 | 0000 | 001E | 0101 |
| 0002023500 | 003C | 0628 | 0000 | 0019 | 0102 | 003C | 2BE3 | 0000 |
| 0002023520 | 0012 | 0101 | 003D | 0641 | 0000 | 0018 | 0102 | 003D |
| 0002023540 | 2BF5 | 0000 | 001D | 0101 | 003E | 0659 | 0000 | 0017 |
| 0002023560 | 0102 | 003E | 2C12 | 0000 | 001F | 0101 | 003F | 0670 |
| 0002023600 | 0000 | 0015 | 0102 | 003F | 2C31 | 0000 | 001B | 0101 |
| 0002023620 | 0040 | 0685 | 0000 | 0018 | 0102 | 0040 | 2C4C | 0000 |
| 0002023640 | 0042 | 0101 | 0041 | 069D | 0000 | 0016 | 0102 | 0041 |
| 0002023660 | 2C8E | 0000 | 000E | 0101 | 0042 | 06B3 | 0000 | 0018 |
| 0002023700 | 0102 | 0042 | 2C9C | 0000 | 0010 | 0101 | 0043 | 06CB |
| 0002023720 | 0000 | 0018 | 0102 | 0043 | 2CAC | 0000 | 0010 | 0101 |
| 0002023740 | 0044 | 06E3 | 0000 | 0019 | 0102 | 0044 | 2CBC | 0000 |
| 0002023760 | 0012 | 0101 | 0045 | 06FC | 0000 | 0018 | 0102 | 0045 |
| 0002024000 | 2CCE | 0000 | 0041 | 0101 | 0046 | 0714 | 0000 | 0017 |
| 0002024020 | 0102 | 0046 | 2D0F | 0000 | 000F | 0101 | 0047 | 072B |
| 0002024040 | 0000 | 0017 | 0102 | 0047 | 2D1E | 0000 | 001D | 0101 |
| 0002024060 | 0048 | 0742 | 0000 | 0017 | 0102 | 0048 | 2D3B | 0000 |
| 0002024100 | 000E | 0101 | 0049 | 0759 | 0000 | 0017 | 0102 | 0049 |
| 0002024120 | 2D49 | 0000 | 000E | 0101 | 004A | 0770 | 0000 | 0017 |
| 0002024140 | 0102 | 004A | 2D57 | 0000 | 000E | 0101 | 004B | 0787 |
| 0002024160 | 0000 | 0017 | 0102 | 004B | 2D65 | 0000 | 000E | 0101 |
| 0002024200 | 004C | 079E | 0000 | 0018 | 0102 | 004C | 2D73 | 0000 |
| 0002024220 | 000F | 0101 | 004D | 07B6 | 0000 | 0018 | 0102 | 004D |
| 0002024240 | 2D82 | 0000 | 000F | 0101 | 004E | 07CE | 0000 | 0018 |
| 0002024260 | 0102 | 004E | 2D91 | 0000 | 000F | 0101 | 004F | 07E6 |
| 0002024300 | 0000 | 0015 | 0102 | 004F | 2DA0 | 0000 | 000C | 0101 |
| 0002024320 | 0050 | 07FB | 0000 | 0015 | 0102 | 0050 | 2DAC | 0000 |
| 0002024340 | 000C | 0101 | 0051 | 0810 | 0000 | 0013 | 0102 | 0051 |
| 0002024360 | 2DB8 | 0000 | 000B | 0101 | 0052 | 0823 | 0000 | 0015 |
| 0002024400 | 0102 | 0052 | 2DC3 | 0000 | 000E | 0101 | 0053 | 0838 |
| 0002024420 | 0000 | 0015 | 0102 | 0053 | 2DD1 | 0000 | 000C | 0101 |
| 0002024440 | 0054 | 084D | 0000 | 0017 | 0102 | 0054 | 2DDD | 0000 |
| 0002024460 | 0010 | 0101 | 0055 | 0864 | 0000 | 0016 | 0102 | 0055 |
| 0002024500 | 2DED | 0000 | 001F | 0101 | 0056 | 087A | 0000 | 0019 |
| 0002024520 | 0102 | 0056 | 2E0C | 0000 | 0056 | 0101 | 0057 | 0893 |
| 0002024540 | 0000 | 0016 | 0102 | 0057 | 2E62 | 0000 | 001D | 0101 |
| 0002024560 | 0058 | 08A9 | 0000 | 0015 | 0102 | 0058 | 2E7F | 0000 |
| 0002024600 | 000E | 0101 | 0059 | 08BE | 0000 | 001A | 0102 | 0059 |
| 0002024620 | 2E8D | 0000 | 0011 | 0101 | 005C | 08D8 | 0000 | 001A |
| 0002024640 | 0102 | 005C | 2E9E | 0000 | 00AB | 0101 | 005D | 08F2 |
| 0002024660 | 0000 | 001B | 0102 | 005D | 2F49 | 0000 | 0026 | 0101 |
| 0002024700 | 005E | 090D | 0000 | 001D | 0102 | 005E | 2F6F | 0000 |
| 0002024720 | 0024 | 0101 | 005F | 092A | 0000 | 0016 | 0102 | 005F |
| 0002024740 | 2F93 | 0000 | 000D | 0101 | 0060 | 0940 | 0000 | 0014 |
| 0002024760 | 0102 | 0060 | 2FA0 | 0000 | 000D | 0101 | 0061 | 0954 |
| 0002025000 | 0000 | 0014 | 0102 | 0061 | 2FAD | 0000 | 001E | 0101 |
| 0002025020 | 0062 | 0968 | 0000 | 0014 | 0102 | 0062 | 2FCB | 0000 |
| 0002025040 | 001E | 0101 | 0063 | 097C | 0000 | 0015 | 0102 | 0063 |
| 0002025060 | 2FE9 | 0000 | 000E | 0101 | 0064 | 0991 | 0000 | 0016 |
| 0002025100 | 0102 | 0064 | 2FF7 | 0000 | 000F | 0101 | 0065 | 09A7 |
| 0002025120 | 0000 | 0015 | 0102 | 0065 | 3006 | 0000 | 000E | 0101 |
| 0002025140 | 0066 | 09BC | 0000 | 0019 | 0102 | 0066 | 3014 | 0000 |

THU MAR 14 17:31:54 1991 DB_PI.DLL PAGE 465, LINE 27377

| | | | | | | | | |
|---|---|---|---|---|---|---|---|---|
| 0002025160 | 0025 | 0101 | 0067 | 09D5 | 0000 | 0018 | 0102 | 0067 |
| 0002025200 | 3039 | 0000 | 0021 | 0101 | 0068 | 09ED | 0000 | 0017 |
| 0002025220 | 0102 | 0068 | 305A | 0000 | 000F | 0101 | 0069 | 0A04 |
| 0002025240 | 0000 | 0017 | 0102 | 0069 | 3069 | 0000 | 000E | 0101 |
| 0002025260 | 006A | 0A1B | 0000 | 0018 | 0102 | 006A | 3077 | 0000 |
| 0002025300 | 0010 | 0101 | 006B | 0A33 | 0000 | 001B | 0102 | 006B |
| 0002025320 | 3087 | 0000 | 001B | 0101 | 006C | 0A4E | 0000 | 0016 |
| 0002025340 | 0102 | 006C | 30A2 | 0000 | 000F | 0101 | 006D | 0A64 |
| 0002025360 | 0000 | 0014 | 0102 | 006D | 30B1 | 0000 | 000D | 0101 |
| 0002025400 | 006E | 0A78 | 0000 | 0013 | 0102 | 006E | 30BE | 0000 |
| 0002025420 | 001C | 0101 | 006F | 0A8B | 0000 | 0015 | 0102 | 006F |
| 0002025440 | 30DA | 0000 | 000E | 0101 | 0070 | 0AA0 | 0000 | 0017 |
| 0002025460 | 0102 | 0070 | 30E8 | 0000 | 0011 | 0101 | 0071 | 0AB7 |
| 0002025500 | 0000 | 0019 | 0102 | 0071 | 30F9 | 0000 | 000C | 0101 |
| 0002025520 | 0072 | 0AD0 | 0000 | 0014 | 0102 | 0072 | 3105 | 0000 |
| 0002025540 | 002C | 0101 | 0073 | 0AE4 | 0000 | 0016 | 0102 | 0073 |
| 0002025560 | 3131 | 0000 | 004E | 0101 | 0074 | 0AFA | 0000 | 0017 |
| 0002025600 | 0102 | 0074 | 317F | 0000 | 0011 | 0101 | 0075 | 0B11 |
| 0002025620 | 0000 | 0017 | 0102 | 0075 | 3190 | 0000 | 000E | 0101 |
| 0002025640 | 0076 | 0B28 | 0000 | 0018 | 0102 | 0076 | 319E | 0000 |
| 0002025660 | 000F | 0101 | 0077 | 0B40 | 0000 | 0017 | 0102 | 0077 |
| 0002025700 | 31AD | 0000 | 000E | 0101 | 0078 | 0B57 | 0000 | 0018 |
| 0002025720 | 0102 | 0078 | 31BB | 0000 | 000E | 0101 | 0079 | 0B6F |
| 0002025740 | 0000 | 0018 | 0102 | 0079 | 31C9 | 0000 | 000F | 0101 |
| 0002025760 | 007A | 0B87 | 0000 | 0018 | 0102 | 007A | 31D8 | 0000 |
| 0002026000 | 000E | 0101 | 007B | 0B9F | 0000 | 0018 | 0102 | 007B |
| 0002026020 | 31E6 | 0000 | 000E | 0101 | 007C | 0BB7 | 0000 | 0018 |
| 0002026040 | 0102 | 007C | 31F4 | 0000 | 000E | 0101 | 007D | 0BCF |
| 0002026060 | 0000 | 0015 | 0102 | 007D | 3202 | 0000 | 001F | 0101 |
| 0002026100 | 007E | 0BE4 | 0000 | 0016 | 0102 | 007E | 3221 | 0000 |
| 0002026120 | 000D | 0101 | 007F | 0BFA | 0000 | 0017 | 0102 | 007F |
| 0002026140 | 322E | 0000 | 001D | 0101 | 0080 | 0C11 | 0000 | 001C |
| 0002026160 | 0102 | 0080 | 324B | 0000 | 0010 | 0101 | 0081 | 0C2D |
| 0002026200 | 0000 | 001A | 0102 | 0081 | 325B | 0000 | 0021 | 0101 |
| 0002026220 | 0082 | 0C47 | 0000 | 001B | 0102 | 0082 | 327C | 0000 |
| 0002026240 | 000E | 0101 | 0083 | 0C62 | 0000 | 001B | 0102 | 0083 |
| 0002026260 | 328A | 0000 | 000E | 0101 | 0084 | 0C7D | 0000 | 001B |
| 0002026300 | 0102 | 0084 | 3298 | 0000 | 001C | 0101 | 0085 | 0C98 |
| 0002026320 | 0000 | 0016 | 0102 | 0085 | 32B4 | 0000 | 0023 | 0101 |
| 0002026340 | 0086 | 0CAE | 0000 | 0016 | 0102 | 0086 | 32D7 | 0000 |
| 0002026360 | 0011 | 0101 | 0087 | 0CC4 | 0000 | 0016 | 0102 | 0087 |
| 0002026400 | 32E8 | 0000 | 0011 | 0101 | 0088 | 0CDA | 0000 | 0015 |
| 0002026420 | 0102 | 0088 | 32F9 | 0000 | 000F | 0101 | 0089 | 0CEF |
| 0002026440 | 0000 | 0015 | 0102 | 0089 | 3308 | 0000 | 001F | 0101 |
| 0002026460 | 008A | 0D04 | 0000 | 0015 | 0102 | 008A | 3327 | 0000 |
| 0002026500 | 000F | 0101 | 008B | 0D19 | 0000 | 0015 | 0102 | 008B |
| 0002026520 | 3336 | 0000 | 000F | 0101 | 008C | 0D2E | 0000 | 0016 |
| 0002026540 | 0102 | 008C | 3345 | 0000 | 0010 | 0101 | 008D | 0D44 |
| 0002026560 | 0000 | 0016 | 0102 | 008D | 3355 | 0000 | 0010 | 0101 |
| 0002026600 | 008E | 0D5A | 0000 | 0023 | 0102 | 008E | 3365 | 0000 |
| 0002026620 | 0103 | 0101 | 008F | 0D7D | 0000 | 0023 | 0102 | 008F |
| 0002026640 | 3468 | 0000 | 027A | 0101 | 0090 | 0DA0 | 0000 | 0023 |
| 0002026660 | 0102 | 0090 | 36E2 | 0000 | 001C | 0101 | 0091 | 0DC3 |
| 0002026700 | 0000 | 0023 | 0102 | 0091 | 36FE | 0000 | 00C2 | 0101 |
| 0002026720 | 0092 | 0DE6 | 0000 | 0023 | 0102 | 0092 | 37C0 | 0000 |
| 0002026740 | 00C2 | 0101 | 0093 | 0E09 | 0000 | 0024 | 0102 | 0093 |
| 0002026760 | 3882 | 0000 | 0011 | 0101 | 0094 | 0E2D | 0000 | 0023 |
| 0002027000 | 0102 | 0094 | 3893 | 0000 | 003A | 0101 | 0095 | 0E50 |
| 0002027020 | 0000 | 0024 | 0102 | 0095 | 38CD | 0000 | 0020 | 0101 |

THU MAR 14 17:31:54 1991 DB_PI.DLL PAGE 466, LINE 27436

| | | | | | | | | |
|---|---|---|---|---|---|---|---|---|
| 0002027040 | 0096 | 0E74 | 0000 | 001E | 0102 | 0096 | 38ED | 0000 |
| 0002027060 | 0016 | 0101 | 0097 | 0E92 | 0000 | 001F | 0102 | 0097 |
| 0002027100 | 3903 | 0000 | 0010 | 0101 | 0098 | 0EB1 | 0000 | 001E |
| 0002027120 | 0102 | 0098 | 3913 | 0000 | 09E8 | 0101 | 0099 | 0ECF |
| 0002027140 | 0000 | 001F | 0102 | 0099 | 42FB | 0000 | 00E5 | 0101 |
| 0002027160 | 009A | 0EEE | 0000 | 001D | 0102 | 009A | 43E0 | 0000 |
| 0002027200 | 001F | 0101 | 009B | 0F0B | 0000 | 001E | 0102 | 009B |
| 0002027220 | 43FF | 0000 | 0010 | 0101 | 009C | 0F29 | 0000 | 0019 |
| 0002027240 | 0102 | 009C | 440F | 0000 | 007F | 0101 | 00C7 | 0F42 |
| 0002027260 | 0000 | 0016 | 0102 | 00C7 | 448E | 0000 | 006E | 0103 |
| 0002027300 | 00C7 | 2E57 | 0002 | 0CE7 | 0104 | 00C7 | 72F7 | 0003 |
| 0002027320 | 0292 | 0109 | 00C7 | FE8C | 0003 | 0266 | 0101 | 00C8 |
| 0002027340 | 0F58 | 0000 | 0015 | 0102 | 00C8 | 44FC | 0000 | 010F |
| 0002027360 | 0103 | 00C8 | 3B3E | 0002 | 0E08 | 0104 | 00C8 | 7589 |
| 0002027400 | 0003 | 085D | 0109 | 00C8 | 00F2 | 0004 | 04A5 | 0101 |
| 0002027420 | 00C9 | 0F6D | 0000 | 0016 | 0102 | 00C9 | 460B | 0000 |
| 0002027440 | 0063 | 0103 | 00C9 | 4946 | 0002 | 0CAB | 0104 | 00C9 |
| 0002027460 | 7DE6 | 0003 | 020F | 0109 | 00C9 | 0597 | 0004 | 0076 |
| 0002027500 | 0101 | 00CA | 0F83 | 0000 | 0016 | 0102 | 00CA | 466E |
| 0002027520 | 0000 | 002A | 0103 | 00CA | 55F1 | 00C2 | 0AA0 | 0104 |
| 0002027540 | 00CA | 7FF5 | 0003 | 00A6 | 0109 | 00CA | 060D | 0004 |
| 0002027560 | 0072 | 0101 | 00CB | 0F99 | 0000 | 0017 | 0102 | 00CB |
| 0002027600 | 4698 | 0000 | 005E | 0103 | 00CB | 6091 | 0002 | 0BF7 |
| 0002027620 | 0104 | 00CB | 809B | 0003 | 02B5 | 0109 | 00CB | 067F |
| 0002027640 | 0004 | 01A7 | 0101 | 00CC | 0FB0 | 0000 | 0016 | 0102 |
| 0002027660 | 00CC | 46F6 | 0000 | 012D | 0103 | 00CC | 6C88 | 0002 |
| 0002027700 | 1046 | 0104 | 00CC | 8350 | 0003 | D98F | 0109 | 00CC |
| 0002027720 | 0826 | 0004 | 045E | 0101 | 00CD | 0FC6 | 0000 | 0017 |
| 0002027740 | 0102 | 00CD | 4823 | 0000 | 0047 | 0103 | 00CD | 7CCE |
| 0002027760 | 0002 | 0AA9 | 0104 | 00CD | 8CDF | 0003 | 014B | 0109 |
| 0002030000 | 00CD | 0C84 | 0004 | 008F | 0101 | 00CE | 0FDD | 0000 |
| 0002030020 | 0016 | 0102 | 00CE | 486A | 0000 | 00E0 | 0103 | 00CE |
| 0002030040 | 8777 | 0002 | 0CF8 | 0104 | 00CE | 8E2A | 0003 | 04D2 |
| 0002030060 | 0109 | 00CE | 0D13 | 0004 | 02B2 | 0101 | 00CF | 0FF3 |
| 0002030100 | 0000 | 0016 | 0102 | 00CF | 494A | 0000 | 000C | 0103 |
| 0002030120 | 00CF | 946F | 0002 | 0037 | 0104 | 00CF | 92FC | 0003 |
| 0002030140 | 0092 | 0109 | 00CF | 0FC5 | 0004 | 0022 | 0101 | 00D0 |
| 0002030160 | 1009 | 0000 | 0016 | 0102 | 00D0 | 4956 | 0000 | 00E4 |
| 0002030200 | 0103 | 00D0 | 94A6 | 0002 | 0A07 | 0104 | 00D0 | 938E |
| 0002030220 | 0003 | 03C8 | 0109 | 00D0 | 0FE7 | 0004 | 028A | 0101 |
| 0002030240 | 00D1 | 101F | 0000 | 0016 | 0102 | 00D1 | 4A3A | 0000 |
| 0002030260 | 00CF | 0103 | 00D1 | 9EAD | 0002 | 0E46 | 0104 | 00D1 |
| 0002030300 | 9756 | 0003 | 09A7 | 0109 | 00D1 | 1271 | 0004 | 0846 |
| 0002030320 | 0101 | 00D2 | 1035 | 0000 | 0017 | 0102 | 00D2 | 4B09 |
| 0002030340 | 0000 | 0146 | 0103 | 00D2 | ACF3 | 0002 | 0CDF | 0104 |
| 0002030360 | 00D2 | A0FD | 0003 | 09B8 | 0109 | 00D2 | 1AB7 | 0004 |
| 0002030400 | 06B7 | 0101 | 00D3 | 104C | 0000 | 0017 | 0102 | 00D3 |
| 0002030420 | 4C4F | 0000 | 0065 | 0103 | 00D3 | B9D2 | 0002 | 08D4 |
| 0002030440 | 0104 | 00D3 | AAB5 | 0003 | 025C | 0109 | 00D3 | 216E |
| 0002030460 | 0004 | 01AF | 0101 | 00D4 | 1063 | 0000 | 0015 | 0102 |
| 0002030500 | 00D4 | 4CB4 | 0000 | 000E | 0101 | 00D5 | 1078 | 0000 |
| 0002030520 | 001A | 0102 | 00D5 | 4CC2 | 0000 | 000D | 0101 | 00D6 |
| 0002030540 | 1092 | 0000 | 001A | 0102 | 00D6 | 4CCF | 0000 | 000D |
| 0002030560 | 0101 | 00D7 | 10AC | 0000 | 001A | 0102 | 00D7 | 4CDC |
| 0002030600 | 0000 | 000F | 0101 | 00D8 | 10C6 | 0000 | 0017 | 0102 |
| 0002030620 | 00D8 | 4CEB | 0000 | 0010 | 0101 | 00D9 | 10DD | 0000 |
| 0002030640 | 001B | 0102 | 00D9 | 4CFB | 0000 | 000E | 0101 | 00DA |
| 0002030660 | 10F8 | 0000 | 0018 | 0102 | 00DA | 4D09 | 0000 | 001E |
| 0002030700 | 0101 | 00DB | 1110 | 0000 | 0016 | 0102 | 00DB | 4D27 |

THU MAR 14 17:31:54 1991 DB_PI.DLL PAGE 467, LINE 27495

```
0002030720  0000  0010  0101  00DC  1126  0000  0017  0102
0002030740  00DC  4D37  0000  0012  0101  00DD  113D  0000
0002030760  001A  0102  00DD  4D49  0000  0010  0101  00DE
0002031000  1157  0000  001C  0102  00DE  4D59  0000  0022
0002031020  0101  00DF  1173  0000  0017  0102  00DF  4D7B
0002031040  0000  0011  0101  00E0  118A  0000  0019  0102
0002031060  00E0  4D8C  0000  001E  0106  0000  231D  0004
0002031100  003C  424E  3230  35F1  0004
0002031112
```

THU MAR 14 17:34:20 1991 FL.DLL PAGE 1, LINE 1

| | | | | | | | | |
|---|---|---|---|---|---|---|---|---|
| 0000000000 | 5A4D | 0053 | 0053 | 0000 | 0004 | 0000 | FFFF | 0000 |
| 0000000020 | 00B6 | 0000 | 0000 | 0000 | 0040 | 0000 | 0000 | 0000 |
| 0000000040 | 0000 | 0000 | 0000 | 0000 | 0000 | 0000 | 0000 | 0000 |
| 0000000060 | 0000 | 0000 | 0000 | 0000 | 0000 | 0000 | 0080 | 0003 |
| 0000000100 | 1F0E | 0EBA | B400 | CD09 | B821 | 4C01 | 21CD | 6854 |
| 0000000120 | 7369 | 7020 | 6F72 | 7267 | 6D61 | 6320 | 6E61 | 6F6E |
| 0000000140 | 2074 | 7572 | 206E | 6E69 | 4420 | 534F | 6D20 | 646F |
| 0000000160 | 2E65 | 0D0D | 240A | 0000 | 0000 | 0000 | 0000 | 0000 |
| 0000000200 | 454E | 0A05 | 017D | 0016 | 322F | 2B6E | 8006 | 0005 |
| 0000000220 | 0000 | 0000 | 63CC | 0001 | 0000 | 0000 | 0005 | 0007 |
| 0000000240 | 0031 | 0040 | 0068 | 0068 | 00D3 | 00E1 | 0213 | 0000 |
| 0000000260 | 0000 | 0004 | 0000 | 0001 | 0000 | 0000 | 0000 | 0000 |
| 0000000300 | 0025 | 8DB1 | 0D00 | 8DB2 | 091F | 00C6 | 0C01 | 0100 |
| 0000000320 | 0000 | 0000 | 0C01 | 0850 | 0000 | 0000 | 0C01 | 0200 |
| 0000000340 | 092C | 1169 | 0D01 | 19E0 | 4602 | 004C | 1200 | 5F46 |
| 0000000360 | 4955 | 455F | 4358 | 5F50 | 4544 | 5F46 | 4F46 | 4D52 |
| 0000000400 | 0001 | 4610 | 555F | 5F49 | 4946 | 544C | 5245 | 465F |
| 0000000420 | 524F | 024D | 0800 | 5F46 | 4946 | 544C | 5245 | 0003 |
| 0000000440 | 450D | 5F45 | 5F55 | 4C44 | 5F47 | 5250 | 434F | 0004 |
| 0000000460 | 460F | 5F46 | 5F55 | 4241 | 524F | 5F54 | 5250 | 434F |
| 0000000500 | 0005 | 460D | 5F46 | 5F55 | 4C44 | 5F47 | 5250 | 434F |
| 0000000520 | 0006 | 0100 | 0A00 | 1000 | 8900 | 8F00 | 9200 | 9500 |
| 0000000540 | 0000 | 4408 | 534F | 4143 | 4C4C | 0553 | 4D50 | 4957 |
| 0000000560 | 064E | 626C | 7069 | 746D | 5F0D | 5842 | 445F | 4245 |
| 0000000600 | 4755 | 4F4D | 4544 | 5F0D | 5842 | 545F | 4D49 | 5345 |
| 0000000620 | 4F4D | 4544 | 5F09 | 5842 | 425F | 535F | 4749 | 5F0E |
| 0000000640 | 5842 | 445F | 4245 | 4755 | 4E45 | 4554 | 0F52 | 425F |
| 0000000660 | 5F58 | 4544 | 5542 | 5247 | 5445 | 5255 | 0E4E | 425F |
| 0000000700 | 5F58 | 4F56 | 4449 | 4552 | 5554 | 4E52 | 5F0E | 5842 |
| 0000000720 | 445F | 4245 | 4755 | 5250 | 4E49 | 0E54 | 425F | 5F58 |
| 0000000740 | 4150 | 4B43 | 4946 | 544C | 5245 | 4405 | 5F42 | 4950 |
| 0000000760 | 5502 | 0249 | 4849 | 6306 | 7672 | 695F | 0666 | 0101 |
| 0000001000 | 02AE | 0001 | 0100 | 03E8 | 9101 | 014E | 4B0F | 9F01 |
| 0000001020 | 003E | 2D00 | 6552 | 6F70 | 7472 | 6C20 | 6269 | 6172 |
| 0000001040 | 7972 | 2820 | 2943 | 4D20 | 7265 | 7563 | 7972 | 4920 |
| 0000001060 | 746E | 7265 | 6341 | 6974 | 6576 | 202C | 3931 | 3039 |
| 0000001100 | 0020 | 0000 | 0000 | 0000 | 0000 | 0000 | 0000 | 0000 |
| 0000001120 | 581E | 4590 | 8B55 | 1EEC | D88E | EC81 | 033C | 5657 |
| 0000001140 | B81E | FFFF | D88E | 46C7 | 4EFA | 8C00 | FC5E | 86C7 |
| 0000001160 | FCDC | 0101 | C02B | 8689 | FCCE | 8689 | FCCC | 068E |
| 0000001200 | 100A | 8326 | FF3E | 00FF | 0375 | 1EE9 | FF00 | 6836 |
| 0000001220 | FF00 | 6636 | 8D00 | C486 | 16FC | 9A50 | FFFF | 0000 |
| 0000001240 | C483 | 3D08 | 0000 | 0374 | 0FE9 | 8E00 | 0C06 | 2610 |
| 0000001260 | 3E83 | 0236 | 7500 | E903 | 003F | 681E | 0055 | 868D |
| 0000001300 | FCD0 | 5016 | 868D | FCC4 | 5016 | 868D | FCE4 | 5016 |
| 0000001320 | 546A | 681E | 006A | 36FF | 0064 | 36FF | 0062 | 36FF |
| 0000001340 | 0068 | 36FF | 0066 | FF9A | 00FF | 8300 | 1EC4 | 8689 |
| 0000001360 | FCE4 | 9689 | FCE6 | 0AE9 | 2B00 | 89C0 | E686 | 89FC |
| 0000001400 | E486 | C7FC | E286 | 00FC | 8B00 | 0846 | 460B | 7506 |
| 0000001420 | E903 | 00A2 | 5EC4 | 2606 | 3F80 | 7500 | E903 | 0096 |
| 0000001440 | 76FF | FF08 | 0676 | 868D | FEF6 | 5016 | FF9A | 00FF |
| 0000001460 | 8900 | E286 | 83FC | E2BE | 00FC | 0374 | 29E9 | 8A00 |
| 0000001500 | F986 | 2AFE | 3DE4 | 0029 | 0374 | 1BE9 | FF00 | 0876 |
| 0000001520 | 76FF | 1E06 | 5C68 | 8D00 | FA86 | 16FE | 9A50 | 830C |
| 0000001540 | 0127 | C483 | E90C | 0014 | 76FF | FF08 | 0676 | 868D |
| 0000001560 | FEFA | 5016 | FA9A | 857F | 8301 | 08C4 | C02B | 8689 |
| 0000001600 | FEF8 | 8689 | FEF6 | 868D | FEFA | 5016 | 868D | FEF6 |
| 0000001620 | 5016 | 006A | 006A | 026A | 006A | FF9A | 00FF | 8900 |
| 0000001640 | E286 | 83FC | E2BE | 00FC | 0375 | 06E9 | C700 | E286 |

THU MAR 14 17:34:20 1991 FL.DLL PAGE 2, LINE 60

| | | | | | | | | |
|---|---|---|---|---|---|---|---|---|
| 0000001660 | 50FC | E904 | 000A | C02B | 8689 | FEF8 | 8689 | FEF6 |
| 0000001700 | BE83 | FCE2 | 7400 | E903 | 0056 | B6FF | FEF8 | B6FF |
| 0000001720 | FEF6 | 529A | 9730 | 8301 | 04C4 | 016A | B6FF | FEF8 |
| 0000001740 | B6FF | FEF6 | 7D9A | B931 | 8301 | 06C4 | 8689 | FCE2 |
| 0000001760 | BE83 | FCE2 | 7400 | E903 | 0026 | 76FF | FF08 | 0676 |
| 0000002000 | 868D | FCE8 | 5016 | C69A | C705 | 8301 | 08C4 | 868D |
| 0000002020 | FCE8 | 5016 | E69A | E13C | 8301 | 04C4 | 8689 | FCE2 |
| 0000002040 | BE83 | FCE2 | 7500 | E903 | 003C | B6FF | FCE2 | 189A |
| 0000002060 | FF62 | 83FF | 02C4 | 016A | 646A | 006A | 868D | FCDE |
| 0000002100 | 5016 | FF9A | 00FF | 8900 | E286 | 83FC | E2BE | 00FC |
| 0000002120 | 0374 | 11E9 | FF00 | E0B6 | FFFC | DEB6 | 9AFC | FFFF |
| 0000002140 | 0000 | 8689 | FCE2 | 068E | 100A | 8326 | 353E | 0000 |
| 0000002160 | 0375 | 0AE9 | 8300 | C8BE | FEFC | 0374 | 0FE9 | 8E00 |
| 0000002200 | 0C06 | 2610 | 3E83 | FFFF | 7500 | E903 | 005B | 868B |
| 0000002220 | FCE2 | 8689 | FCCA | B6FF | FCCE | B6FF | FCCC | 868D |
| 0000002240 | FCCA | 5016 | B6FF | FCDC | 76FF | FFFC | FA76 | 8E8D |
| 0000002260 | FCD0 | 5116 | 8E8D | FCE4 | 5116 | 8E8D | FCC4 | 5116 |
| 0000002300 | 681E | 006A | 9368 | FF00 | 6436 | FF00 | 6236 | FF00 |
| 0000002320 | 6836 | FF00 | 6636 | 9A00 | FFFF | 0000 | C483 | 8B28 |
| 0000002340 | CA86 | E9FC | 000A | 07E9 | 8B00 | E286 | E9FC | 0000 |
| 0000002360 | 5E1F | 835F | 02ED | E58B | 5D1F | CA4D | 0004 | 581E |
| 0000002400 | 4590 | 8B55 | 1EEC | D88E | EC81 | 0026 | 5657 | B81E |
| 0000002420 | 0012 | D88E | 46C7 | 7BFA | 8C00 | FC5E | 46C7 | 01F2 |
| 0000002440 | 2B01 | 89C0 | E446 | 4689 | 8EE2 | 0A06 | 2610 | 3E83 |
| 0000002460 | 0363 | 7500 | E903 | 001D | 36FF | 0068 | 36FF | 0066 |
| 0000002500 | 468D | 16DA | 9A50 | 004C | 0000 | C483 | 3D08 | 0000 |
| 0000002520 | 0374 | 0FE9 | 8E00 | 0C06 | 2610 | 3E83 | 037B | 7500 |
| 0000002540 | E903 | 003B | 681E | 0082 | 468D | 16E6 | 8D50 | DA46 |
| 0000002560 | 5016 | 468D | 16F6 | 6850 | 00AE | 681E | 008A | 36FF |
| 0000002600 | 0064 | 36FF | 0062 | 36FF | 0068 | 36FF | 0066 | 979A |
| 0000002620 | 0000 | 830C | 1EC4 | 4689 | 89F6 | F856 | 08E9 | 2B00 |
| 0000002640 | 89C0 | F846 | 4689 | C7F6 | F446 | 0000 | 068E | 100A |
| 0000002660 | 8326 | 1D3E | 0002 | 0375 | 09E9 | 8300 | DE7E | 74FE |
| 0000002700 | E903 | 000F | 068E | 100C | 8326 | 623E | 0000 | 0375 |
| 0000002720 | 51E9 | 8B00 | F446 | 4689 | FFE0 | E476 | 76FF | 8DE2 |
| 0000002740 | E046 | 5016 | 76FF | FFF2 | FC76 | 76FF | 8DFA | E64E |
| 0000002760 | 5116 | 4E8D | 16F6 | 8D51 | DA4E | 5116 | 681E | 008A |
| 0000003000 | F868 | FF00 | 6436 | FF00 | 6236 | FF00 | 6836 | FF00 |
| 0000003020 | 6636 | 9A00 | 0288 | 0000 | C483 | 8B28 | E046 | 09E9 |
| 0000003040 | E900 | 0006 | 468B | E9F4 | 0000 | 5E1F | 835F | 02ED |
| 0000003060 | E58B | 5D1F | CA4D | 0004 | 581E | 4590 | 8B55 | 1EEC |
| 0000003100 | D88E | EC81 | 0030 | 5657 | B81E | 02C0 | D88E | 46C7 |
| 0000003120 | 9DF8 | 8C00 | FA5E | 46C7 | 01E8 | 2B01 | 89C0 | DA46 |
| 0000003140 | 4689 | 8ED8 | 0A06 | 2610 | 3E83 | 02E0 | 7500 | E903 |
| 0000003160 | 001D | 36FF | 0068 | 36FF | 0066 | 468D | 16D0 | 9A50 |
| 0000003200 | 02F6 | 0000 | C483 | 3D08 | 0000 | 0374 | 0FE9 | 8E00 |
| 0000003220 | 0C06 | 2610 | 3E83 | 030C | 7500 | E903 | 003B | 681E |
| 0000003240 | 00A4 | 468D | 16DC | 8D50 | D046 | 5016 | 468D | 16F0 |
| 0000003260 | 6850 | 010F | 681E | 00AC | 36FF | 0064 | 36FF | 0062 |
| 0000003300 | 36FF | 0068 | 36FF | 0066 | 3F9A | 0003 | 8300 | 1EC4 |
| 0000003320 | 4689 | 89F0 | F256 | 08E9 | 2B00 | 89C0 | F246 | 4689 |
| 0000003340 | C7F0 | EE46 | 0000 | 5EC4 | 2606 | 478B | E90C | 008E |
| 0000003360 | 468B | 8B06 | 0856 | 1205 | 8900 | EA46 | 5689 | 9AEC |
| 0000003400 | 279B | 04C6 | 4689 | 8BFC | FC46 | 54E9 | FF00 | EC76 |
| 0000003420 | 76FF | 9AEA | 2D3B | 04D4 | C483 | 8904 | EE46 | 4FE9 |
| 0000003440 | 9A00 | 4BCF | 04D9 | 339A | F051 | 8904 | F446 | 5689 |
| 0000003460 | FFF6 | F676 | 76FF | FFF4 | EC76 | 76FF | 9AEA | 3816 |
| 0000003500 | 04FE | C483 | FF08 | F676 | 76FF | 9AF4 | 5156 | 0110 |
| 0000003520 | C483 | E904 | 001A | 46C7 | 01EE | E900 | 0012 | 0FE9 |

THU MAR 14 17:34:20 1991 FL.DLL PAGE 3, LINE 119

| | | | | | | | | |
|---|---|---|---|---|---|---|---|---|
| 0000003540 | 4800 | 0375 | A6E9 | 48FF | 0375 | B4E9 | E9FF | FFE6 |
| 0000003560 | 16E9 | C700 | EE46 | 0013 | 0EE9 | E900 | 000B | 332D |
| 0000003600 | 7500 | E903 | FF6A | EAE9 | 8EFF | 0A06 | 2610 | 3E83 |
| 0000003620 | 041A | 7500 | E903 | 0009 | 7E83 | FED4 | 0374 | 0FE9 |
| 0000003640 | 8E00 | 0C06 | 2610 | 3E83 | 0446 | 7500 | E903 | 0051 |
| 0000003660 | 468B | 89EE | D646 | 76FF | FFDA | D876 | 468D | 16D6 |
| 0000003700 | FF50 | E876 | 76FF | FFFA | F876 | 4E8D | 16DC | 8D51 |
| 0000003720 | F04E | 5116 | 4E8D | 16D0 | 1E51 | AC68 | 6800 | 0143 |
| 0000003740 | 36FF | 0064 | 36FF | 0062 | 36FF | 0068 | 36FF | 0066 |
| 0000003760 | C49A | 0003 | 8300 | 28C4 | 468B | E9D6 | 0009 | 06E9 |
| 0000004000 | 8B00 | EE46 | 00E9 | 1F00 | 5F5E | ED83 | 8B02 | 1FE5 |
| 0000004020 | 4D5D | 04CA | 0000 | 581E | 4590 | 8B55 | 1EEC | D88E |
| 0000004040 | EC81 | 0024 | 5657 | 46C7 | C5FA | 8C00 | FC5E | 46C7 |
| 0000004060 | 00F4 | 2B00 | 89C0 | E646 | 4689 | 8EE4 | 0E06 | 2610 |
| 0000004100 | 3E83 | 0540 | 7500 | E903 | 001D | 36FF | 010E | 36FF |
| 0000004120 | 010C | 468D | 16DC | 9A50 | 0430 | 0000 | C483 | 3D08 |
| 0000004140 | 0000 | 0374 | 0FE9 | 8E00 | 1006 | 2610 | 3E83 | 072D |
| 0000004160 | 7500 | E903 | 003A | 681E | 00C9 | 468D | 16E8 | 8D50 |
| 0000004200 | DC46 | 5016 | 468D | 16F6 | 6A50 | 1E6A | 3668 | FF01 |
| 0000004220 | 0A36 | FF01 | 0836 | FF01 | 0E36 | FF01 | 0C36 | 9A01 |
| 0000004240 | 0479 | 0000 | C483 | 891E | F646 | 5689 | E9F8 | 0008 |
| 0000004260 | C02B | 4689 | 89F8 | F646 | 38A1 | 0B12 | 3606 | 7412 |
| 0000004300 | E903 | 001E | 681E | 00CD | 681E | 00D9 | 468B | 8B06 |
| 0000004320 | 0856 | 0405 | 5200 | 9A50 | 830C | 06AE | C483 | E90C |
| 0000004340 | 0021 | 76FF | FF0C | 0A76 | 681E | 00ED | 681E | 00F9 |
| 0000004360 | 468B | 8B06 | 0856 | 0405 | 5200 | 9A50 | 830C | 06C5 |
| 0000004400 | C483 | 1E10 | 0168 | 8B01 | 0646 | 568B | 0508 | 0069 |
| 0000004420 | 5052 | FA9A | B27F | 8304 | 08C4 | 38A1 | 0B12 | 3606 |
| 0000004440 | 7412 | E903 | 0006 | 01B8 | E900 | 0003 | 00B8 | C400 |
| 0000004460 | 065E | 8926 | 0247 | 5EC4 | 2606 | 87C7 | 0134 | 0000 |
| 0000004500 | 5EC4 | 2606 | 87C7 | 013E | 0000 | 5EC4 | 2606 | 87C7 |
| 0000004520 | 0140 | 0000 | 5EC4 | 2606 | 87C7 | 0142 | 0000 | 068E |
| 0000004540 | 100E | 8326 | F23E | 0005 | 0375 | 09E9 | 8300 | E07E |
| 0000004560 | 74FE | E903 | 000F | 068E | 1010 | 8326 | 583E | 0005 |
| 0000004600 | 0375 | 38E9 | 8D00 | E846 | 5016 | 468D | 16F6 | 8D50 |
| 0000004620 | DC46 | 5016 | 681E | 0136 | 7E6A | 36FF | 010A | 36FF |
| 0000004640 | 0108 | 36FF | 010E | 36FF | 010C | FF9A | 00FF | 8300 |
| 0000004660 | 1AC4 | 46C7 | 00E2 | E900 | 0006 | 03E9 | E900 | 0000 |
| 0000004700 | 5F5E | ED83 | 8B02 | 1FE5 | 4D5D | 1ECB | 9058 | 5545 |
| 0000004720 | EC8B | 8E1E | 81D8 | B8EC | 570D | C756 | F846 | 0143 |
| 0000004740 | 5E8C | C7FA | C246 | 0101 | C02B | 4689 | 89B2 | B046 |
| 0000004760 | 068E | 100E | 8326 | 2A3E | 0008 | 0375 | 1DE9 | FF00 |
| 0000005000 | 0E36 | FF01 | 0C36 | 8D01 | A846 | 5016 | 089A | 0006 |
| 0000005020 | 8300 | 08C4 | 003D | 7400 | E903 | 000F | 068E | 1010 |
| 0000005040 | 8326 | 1E3E | 0006 | 0375 | 3BE9 | 1E00 | 4A68 | 8D01 |
| 0000005060 | B646 | 5016 | 468D | 16A8 | 8D50 | F046 | 5016 | 9468 |
| 0000005100 | 1E00 | 9068 | FF01 | 0A36 | FF01 | 0836 | FF01 | 0E36 |
| 0000005120 | FF01 | DC36 | 9A01 | 0650 | 0000 | C483 | 891E | F046 |
| 0000005140 | 5689 | E9F2 | 0008 | C02B | 4689 | 89F2 | F046 | 46C7 |
| 0000005160 | 00EE | 8E00 | 0E06 | 2610 | 3E83 | 0715 | 7500 | E903 |
| 0000005200 | 0053 | 7E83 | FEAC | 0375 | 4AE9 | 8B00 | 0846 | 568B |
| 0000005220 | 050A | 00CE | 5052 | 76FF | 1E06 | 5168 | 8D01 | B646 |
| 0000005240 | 5016 | 468D | 16F0 | 8D50 | A846 | 5016 | 681E | 0190 |
| 0000005260 | A568 | FF00 | 0A36 | FF01 | 0836 | FF01 | 0E36 | FF01 |
| 0000005300 | 0C36 | 1E01 | 6768 | 6801 | FFFF | FF68 | 9AFF | FFFF |
| 0000005320 | 0000 | C483 | C72C | EE46 | 0000 | 868D | FF4C | 4689 |
| 0000005340 | 8CC6 | C856 | 7E83 | 0A06 | 0374 | 24E9 | C400 | 085E |
| 0000005360 | 8326 | 40BF | 0001 | 0375 | 16E9 | 8B00 | 0846 | 568B |
| 0000005400 | 1E0A | D0BF | 8B13 | 1EF0 | 8E07 | B9DA | 0107 | A5F3 |

THU MAR 14 17:34:20 1991 FL.DLL PAGE 4, LINE 178

| | | | | | | | | |
|---|---|---|---|---|---|---|---|---|
| 0000005420 | C41F | 085E | 8026 | CEBF | 0000 | 0375 | 4CE9 | 8300 |
| 0000005440 | 067E | 750A | E903 | 0043 | 5EC4 | 2608 | BF83 | 0140 |
| 0000005460 | 7400 | E903 | 0035 | 468D | 16CE | 1E50 | 6E68 | 8B01 |
| 0000005500 | 084E | 568B | 810A | CEC1 | 5200 | 9A51 | 8380 | 0916 |
| 0000005520 | C483 | 8D0C | CE46 | 5016 | 468B | 8B08 | 0A56 | CE05 |
| 0000005540 | 5200 | 9A50 | 7FFA | 093B | C483 | 6A08 | 6A00 | 6A00 |
| 0000005560 | FF01 | 3236 | FF12 | E036 | FF15 | DE36 | 8B15 | 0846 |
| 0000005600 | 568B | 050A | 00CE | 5052 | 179A | 5958 | 8309 | 10C4 |
| 0000005620 | 4689 | 83EE | EE7E | 7410 | E903 | 002F | 76FF | FF0A |
| 0000005640 | 0876 | 006A | 006A | C79A | 7128 | 8309 | 08C4 | 5EC4 |
| 0000005660 | 2608 | 87C7 | 0134 | 0000 | 76FF | FF0A | 0876 | A19A |
| 0000005700 | 9242 | 8309 | 04C4 | 46C7 | 00EE | 8300 | 343E | 0012 |
| 0000005720 | 0375 | 22E9 | 8D00 | 4C86 | 16FF | 6A50 | 6A00 | 9A31 |
| 0000005740 | 5C47 | 099C | C483 | 6A08 | 9A01 | 5DC0 | 09D6 | C483 |
| 0000005760 | C702 | 3406 | 0012 | 8B00 | 0646 | 50E9 | C70E | 1006 |
| 0000006000 | 0001 | C700 | 1406 | 0001 | C700 | 1206 | 0101 | 8300 |
| 0000006020 | 323E | 0012 | 0374 | 1EE9 | FF00 | 0A76 | 76FF | 6A08 |
| 0000006040 | 6A00 | 9A00 | 28C7 | 09F6 | C483 | C408 | 085E | C626 |
| 0000006060 | CE87 | 0000 | 66E9 | 6A00 | 6A00 | FF00 | C876 | 76FF |
| 0000006100 | 6AC6 | 9A00 | 1A69 | 0A16 | C483 | 890A | EE46 | 7E83 |
| 0000006120 | 00EE | 0374 | 14E9 | FF00 | E036 | FF15 | DE36 | 1E15 |
| 0000006140 | 1668 | 9A01 | 7FFA | 0A3E | C483 | FF08 | 0A76 | 76FF |
| 0000006160 | 8308 | EE7E | 7400 | E903 | 0009 | 468B | 8BC6 | C856 |
| 0000006200 | 06E9 | B800 | 0000 | 00BA | 5200 | 9A50 | 28C7 | 0A56 |
| 0000006220 | C483 | C408 | 085E | C726 | 3487 | 0001 | FF00 | 0A76 |
| 0000006240 | 76FF | 9A08 | 42A1 | 0A70 | C483 | C404 | 085E | 8326 |
| 0000006260 | 40BF | 0001 | 0375 | 0CE9 | 6A00 | 6A00 | 9A35 | 5F3D |
| 0000006300 | 068A | C483 | C404 | 085E | 8326 | 42BF | 0001 | 0375 |
| 0000006320 | 0CE9 | 6A00 | 6A01 | 9A36 | 5F3D | 0A94 | C483 | 6A04 |
| 0000006340 | 9A01 | 5DC0 | 0ACB | C483 | 8902 | EE46 | 91E9 | C40D |
| 0000006360 | 085E | 8326 | 027F | 7400 | E903 | 0027 | CEA1 | 0B13 |
| 0000006400 | CC06 | 7413 | E903 | 001B | 46C7 | 53EE | C404 | 085E |
| 0000006420 | C726 | 0247 | 0001 | 016A | 6D9A | D645 | 830A | 02C4 |
| 0000006440 | 46E9 | 9A01 | 2160 | 0B15 | 4689 | 83EE | EE7E | 7400 |
| 0000006460 | E903 | 0135 | 5EC4 | 2608 | 7F83 | 0002 | 0375 | 09E9 |
| 0000006500 | B800 | 0000 | 00BA | E900 | 0007 | CCA1 | 8B13 | CE16 |
| 0000006520 | A313 | 1236 | 1689 | 1238 | 016A | 36FF | 1238 | 36FF |
| 0000006540 | 1236 | 7D9A | 5231 | 830B | 06C4 | 4689 | 83EE | EE7E |
| 0000006560 | 7400 | E903 | 00F3 | 06C6 | 0116 | C700 | C446 | 0000 |
| 0000006600 | 03E9 | FF00 | C446 | CAA1 | 3913 | C446 | 037C | 19E9 |
| 0000006620 | 8B00 | C45E | E3C1 | FF02 | 3CB7 | FF12 | 3AB7 | 9A12 |
| 0000006640 | 7D46 | 0B65 | C483 | E904 | FFD9 | 06C7 | 13CA | 0000 |
| 0000006660 | 3F6A | AB9A | 8B60 | 830B | 02C4 | 5EC4 | 2608 | 87C7 |
| 0000006700 | 0140 | 0000 | 3E83 | 1232 | 7400 | E903 | 001E | 76FF |
| 0000006720 | FF0A | 0876 | 006A | 006A | C79A | AB28 | 830B | 08C4 |
| 0000006740 | 5EC4 | 2608 | 87C6 | 00CE | E900 | 0069 | 006A | 006A |
| 0000006760 | 76FF | FFC8 | C676 | 006A | 699A | CE1A | 830B | 0AC4 |
| 0000007000 | 4689 | 83EE | EE7E | 7400 | E903 | 0017 | 468B | 8BC6 |
| 0000007020 | C856 | 0405 | 5200 | 1E50 | 1668 | 9A01 | 7FFA | 0BF6 |
| 0000007040 | C483 | FF08 | 0A76 | 76FF | 8308 | EE7E | 7400 | E903 |
| 0000007060 | 0009 | 468B | 8BC6 | C856 | 06E9 | B800 | 0000 | 00BA |
| 0000007100 | 5200 | 9A50 | 28C7 | 0C0E | C483 | C408 | 085E | C726 |
| 0000007120 | 3487 | 0001 | FF00 | 0A76 | 76FF | 9A08 | 42A1 | 0C1E |
| 0000007140 | C483 | C704 | 1406 | 0001 | 6A00 | 9A01 | 5DC0 | 0C3E |
| 0000007160 | C483 | C402 | 085E | 8326 | 42BF | 0001 | 0375 | 12E9 |
| 0000007200 | C400 | 085E | FF26 | 42B7 | 6A01 | 9A36 | 5F3D | 0CA2 |
| 0000007220 | C483 | E904 | 0BEA | 14A1 | 8901 | F446 | 3E83 | 1232 |
| 0000007240 | 7400 | E903 | 0008 | 46C7 | 54EE | E904 | 0147 | 468B |
| 0000007260 | E906 | 0124 | 46C7 | 00F4 | E900 | 0139 | 32A1 | 4812 |

THU MAR 14 17:34:20 1991 FL.DLL PAGE 5, LINE 237

| | | | | | | | | |
|---|---|---|---|---|---|---|---|---|
| 0000007300 | 4689 | E9F4 | 012F | 5EC4 | 2608 | BF80 | 00CE | 7500 |
| 0000007320 | E903 | 0053 | 14A1 | C101 | 05E0 | 0603 | 15DE | 168B |
| 0000007340 | 15E0 | 5052 | 468B | 8B08 | 0A56 | CE05 | 5200 | 9A50 |
| 0000007360 | 8030 | 0CCF | C483 | 3D08 | 0000 | 0375 | 28E9 | 1E00 |
| 0000007400 | 1468 | 6A01 | FF01 | 3236 | FF12 | E036 | FF15 | DE36 |
| 0000007420 | 8B15 | 0846 | 568B | 050A | 00CE | 5052 | 179A | FE58 |
| 0000007440 | 8308 | 10C4 | 4689 | 83EE | EE7E | 7400 | E903 | 0019 |
| 0000007460 | 3E83 | 0114 | 7400 | E903 | 0008 | 46C7 | 57EE | E904 |
| 0000007500 | 0007 | 14A1 | 4801 | 4689 | E9F4 | 00A9 | 5EC4 | 2608 |
| 0000007520 | BF80 | 00CE | 7500 | E903 | 0053 | 14A1 | C101 | 05E0 |
| 0000007540 | 0603 | 15DE | 168B | 15E0 | 5052 | 468B | 8B08 | 0A56 |
| 0000007560 | CE05 | 5200 | 9A50 | 8030 | 0D55 | C483 | 3D08 | 0000 |
| 0000007600 | 0375 | 28E9 | 1E00 | 1468 | 6A01 | FF01 | 3236 | FF12 |
| 0000007620 | E036 | FF15 | DE36 | 8B15 | 0846 | 568B | 050A | 00CE |
| 0000007640 | 5052 | 179A | E358 | 830D | 10C4 | 4689 | 83EE | EE7E |
| 0000007660 | 7400 | E903 | 001C | 32A1 | 2B12 | 1406 | 4801 | 0374 |
| 0000007700 | 08E9 | C700 | EE46 | 0458 | 07E9 | A100 | 0114 | 8940 |
| 0000007720 | F446 | 20E9 | E900 | 001D | 052D | 7500 | E903 | FED4 |
| 0000007740 | 7548 | E903 | FED6 | 7548 | E903 | FEDA | 7548 | E903 |
| 0000007760 | FF5A | 00E9 | 8300 | EE7E | 7410 | E903 | 000B | 14A1 |
| 0000010000 | 8901 | F446 | 46C7 | 00EE | 8300 | EE7E | 7400 | E903 |
| 0000010020 | 00A0 | 006A | 006A | 016A | 36FF | 13CA | 681E | 123A |
| 0000010040 | 468B | C1F4 | 05E0 | 0603 | 15DE | 168B | 15E0 | 5052 |
| 0000010060 | 289A | FB5A | 830D | 10C4 | 4689 | 6AA6 | 6A00 | FF00 |
| 0000010100 | C876 | 76FF | FFC6 | F476 | 699A | 2C1A | 830E | 0AC4 |
| 0000010120 | 4689 | 83EE | EE7E | 7400 | E903 | 0025 | 7E83 | 10A6 |
| 0000010140 | 0374 | 1CE9 | 8B00 | F446 | E0C1 | 0305 | DE06 | 8B15 |
| 0000010160 | E016 | 5215 | 1E50 | 1668 | 9A01 | 7FFA | 0E49 | C483 |
| 0000010200 | 8308 | EE7E | 7400 | E903 | 0022 | 76FF | FF0A | 0876 |
| 0000010220 | 76FF | FFC8 | C676 | C79A | 5728 | 830E | 08C4 | 76FF |
| 0000010240 | FF0A | 0876 | A19A | 6742 | 830E | 04C4 | 468B | A3F4 |
| 0000010260 | 0114 | 016A | C09A | 955D | 830E | 02C4 | C1E9 | C609 |
| 0000010300 | 1606 | 0001 | 468D | 16F4 | 6A50 | FF01 | 3236 | FF12 |
| 0000010320 | E036 | FF15 | DE36 | 8B15 | 0846 | 568B | 050A | 00CE |
| 0000010340 | 5052 | 179A | C458 | 830E | 10C4 | 4689 | 83EE | EE7E |
| 0000010360 | 7400 | E903 | 021F | 468D | 16F6 | 6A50 | FF01 | CA36 |
| 0000010400 | 1E13 | 3A68 | 8B12 | 084E | 568B | 810A | CEC1 | 5200 |
| 0000010420 | 9A51 | 5A28 | 0F72 | C483 | 8910 | EE46 | 7E83 | 00EE |
| 0000010440 | 0374 | 02E9 | 8B01 | F65E | E3C1 | C402 | 3A9F | 2612 |
| 0000010460 | 7F83 | 012C | C01B | 8940 | B446 | 5EC4 | 8B08 | B446 |
| 0000010500 | 3926 | 3E87 | 7501 | E903 | 00DA | 5E8B | D1F6 | C7E3 |
| 0000010520 | 6A87 | 0111 | 8B00 | F65E | E3C1 | C402 | 3A9F | 2612 |
| 0000010540 | 7F83 | 012C | C01B | D8F7 | 5E8B | C1F6 | 02E3 | 9FC4 |
| 0000010560 | 123A | 8926 | 2C47 | 468B | 89F6 | C446 | 03E9 | FF00 |
| 0000010600 | C446 | 7E83 | 00EE | 0374 | 42E9 | A100 | 13CA | 4639 |
| 0000010620 | 7CC4 | E903 | 0037 | 5E8B | C1C4 | 02E3 | 878B | 123A |
| 0000010640 | 978B | 123C | 8D1E | 4CBE | 8BFF | 16F0 | 8E07 | B9DA |
| 0000010660 | 002C | A5F3 | 8D1F | 4C86 | 16FF | 6A50 | 6A00 | 9A34 |
| 0000010700 | 5C47 | 0FC9 | C483 | 8908 | EE46 | B2E9 | 8BFF | F646 |
| 0000010720 | 4689 | E9C4 | 0003 | 46FF | 83C4 | EE7E | 7400 | E903 |
| 0000010740 | 0042 | CAA1 | 3913 | C446 | 037C | 37E9 | 8B00 | C45E |
| 0000010760 | E3C1 | 8B02 | 3A87 | 8B12 | 3C97 | 1E12 | BE8D | FF4C |
| 0000011000 | F08B | 0716 | DA8E | 2CB9 | F300 | 1FA5 | 868D | FF4C |
| 0000011020 | 5016 | 016A | 346A | 479A | 075C | 8310 | 08C4 | 4689 |
| 0000011040 | E9EE | FFB2 | B2E9 | 8300 | EE7E | 7410 | E903 | 00A9 |
| 0000011060 | 76FF | FFC8 | C676 | 36FF | 1238 | 36FF | 1236 | 006A |
| 0000011100 | 006A | 006A | 468B | C1F4 | 05E0 | 0603 | 15DE | 168B |
| 0000011120 | 15E0 | 5052 | E69A | 6455 | 8310 | 12C4 | 4689 | 83EE |
| 0000011140 | EE7E | 7400 | E903 | 0071 | 46C7 | 00FC | C400 | C65E |

THU MAR 14 17:34:20 1991 FL.DLL PAGE 6, LINE 296

| | | | | | | | | |
|---|---|---|---|---|---|---|---|---|
| 0000011160 | 8326 | 2C7F | 1B01 | 40C0 | 4689 | C4B4 | 085E | 468B |
| 0000011200 | 26B4 | 8739 | 013E | 0375 | 18E9 | C400 | C65E | 8326 |
| 0000011220 | 2C7F | 1B01 | F7C0 | C4D8 | C65E | 8926 | 2C47 | 46C7 |
| 0000011240 | 01FC | 8D00 | F646 | 5016 | 76FF | FFC8 | C676 | 76FF |
| 0000011260 | 9AF4 | 1A69 | 0A8A | C483 | 890A | EE46 | 7E83 | 00EE |
| 0000011300 | 0374 | 14E9 | 8300 | FC7E | 7500 | E903 | 000B | 5E8B |
| 0000011320 | D1F6 | C7E3 | 6A87 | 0111 | 8300 | EE7E | 7400 | E903 |
| 0000011340 | 0030 | 76FF | FF0A | 0876 | 5E8B | C1F6 | 02E3 | B7FF |
| 0000011360 | 123C | B7FF | 123A | C79A | B728 | 8310 | 08C4 | 76FF |
| 0000011400 | FF0A | 0876 | A19A | CF42 | 8310 | 04C4 | 468B | A3F4 |
| 0000011420 | 0114 | 05E9 | C700 | EE46 | 0000 | 016A | C09A | F95D |
| 0000011440 | 8310 | 02C4 | 59E9 | 8D07 | F446 | 5016 | 016A | 36FF |
| 0000011460 | 1232 | 36FF | 15E0 | 36FF | 15DE | 4E8B | 8B08 | 0A56 |
| 0000011500 | C181 | 00CE | 5152 | 179A | 2D58 | 8311 | 10C4 | 4689 |
| 0000011520 | 83EE | EE7E | 7400 | E903 | 0080 | 06C6 | 0116 | 8D00 |
| 0000011540 | F646 | 5016 | 016A | 36FF | 13CA | 681E | 123A | 4E8B |
| 0000011560 | 8B08 | 0A56 | C181 | 00CE | 5152 | 289A | 4F5A | 8311 |
| 0000011600 | 10C4 | 4689 | 83EE | EE7E | 7410 | E903 | 0019 | 468D |
| 0000011620 | 16F6 | FF50 | C876 | 76FF | FFC6 | F476 | 699A | 771A |
| 0000011640 | 8311 | 0AC4 | 4689 | 83EE | EE7E | 7400 | E903 | 002A |
| 0000011660 | 76FF | FF0A | 0876 | 5E8B | C1F6 | 02E3 | B7FF | 123C |
| 0000011700 | B7FF | 123A | C79A | 8528 | 8311 | 08C4 | 76FF | FF0A |
| 0000011720 | 0876 | A19A | 8F42 | 8311 | 04C4 | 016A | C09A | A75D |
| 0000011740 | 8311 | 02C4 | 99E9 | 6A06 | 8B01 | 0846 | 568B | 050A |
| 0000011760 | 00CE | 5052 | 159A | DA1D | 8311 | 06C4 | 4689 | 83EE |
| 0000012000 | EE7E | 7400 | E903 | 005D | 76FF | FFC8 | C676 | 36FF |
| 0000012020 | 1238 | 36FF | 1236 | 006A | 006A | 006A | 468B | 8B08 |
| 0000012040 | 0A56 | CE05 | 5200 | 9A50 | 55E6 | 11FA | C483 | 8912 |
| 0000012060 | EE46 | 7E83 | 00EE | 0374 | 22E9 | FF00 | 0A76 | 76FF |
| 0000012100 | FF08 | C876 | 76FF | 9AC6 | 28C7 | 1208 | C483 | FF08 |
| 0000012120 | 0A76 | 76FF | 9A08 | 42A1 | 1246 | C483 | C604 | 1606 |
| 0000012140 | 0001 | 13E9 | 8300 | EE7E | 7404 | E903 | 000A | 5EC4 |
| 0000012160 | 2608 | 87C7 | 0134 | 0001 | 05E9 | C406 | 085E | 8326 |
| 0000012200 | 40BF | 0001 | 0375 | 5DE9 | FF00 | 0A76 | 76FF | 6A08 |
| 0000012220 | 6A00 | 9A00 | 28C7 | 125D | C483 | 1E08 | 7168 | 8B01 |
| 0000012240 | 0846 | 568B | 050A | 00CE | 5052 | FA9A | 6B7F | 8312 |
| 0000012260 | 08C4 | 76FF | FF0A | 0876 | A19A | 7542 | 8312 | 04C4 |
| 0000012300 | 3F6A | AB9A | 8160 | 8312 | 02C4 | 006A | 356A | 3D9A |
| 0000012320 | 8E5F | 8312 | 04C4 | 4689 | 6AEE | 9A00 | 469C | 129B |
| 0000012340 | C483 | E902 | 008D | 3F6A | AB9A | E260 | 8312 | 02C4 |
| 0000012360 | 46C7 | 00C4 | E900 | 0003 | 46FF | A1C4 | 13CA | 4639 |
| 0000012400 | 7CC4 | E903 | 0046 | 5E8B | C1C4 | 02E3 | 878B | 123A |
| 0000012420 | 978B | 123C | 8D1E | 4CBE | 8BFF | 16F0 | 8E07 | B9DA |
| 0000012440 | 002C | A5F3 | 8D1F | 4C86 | 16FF | 6A50 | 6A01 | 9A34 |
| 0000012460 | 5C47 | 1301 | C483 | 8908 | A646 | 7E83 | 00A6 | 0375 |
| 0000012500 | 06E9 | 8B00 | A646 | 4689 | E9EE | FFAC | 016A | 9C9A |
| 0000012520 | 1E46 | 8313 | 02C4 | 06C7 | 1510 | 0000 | 5EC4 | 2608 |
| 0000012540 | 878B | 0142 | 12A3 | 1E15 | D068 | 9A13 | 42A1 | 1328 |
| 0000012560 | C483 | 6A04 | 9A01 | 5DC0 | 1348 | C483 | C402 | 085E |
| 0000012600 | 8326 | 42BF | 0001 | 0375 | 12E9 | C400 | 085E | FF26 |
| 0000012620 | 42B7 | 6A01 | 9A36 | 5F3D | 0D28 | C483 | E904 | 04E0 |
| 0000012640 | 006A | C09A | 675D | 8313 | 02C4 | 5EC4 | 2608 | B7FF |
| 0000012660 | 0142 | 366A | 3D9A | 795F | 8313 | 04C4 | 4689 | C6EE |
| 0000012700 | 1606 | 0001 | 016A | C09A | A85D | 8313 | 02C4 | AFE9 |
| 0000012720 | C604 | 1606 | 0001 | 468D | 16F4 | 6A50 | FF01 | 3236 |
| 0000012740 | FF12 | E036 | FF15 | DE36 | 8B15 | 084E | 568B | 810A |
| 0000012760 | CEC1 | 5200 | 9A51 | 5817 | 13C9 | C483 | 8910 | EE46 |
| 0000013000 | 7E83 | 00EE | 0374 | 18E9 | 6A00 | 6A00 | FF00 | C876 |
| 0000013020 | 76FF | FFC6 | F476 | 699A | E91A | 8313 | 0AC4 | 4689 |

THU MAR 14 17:34:20 1991 FL.DLL PAGE 7, LINE 355

| | | | | | | | | |
|---|---|---|---|---|---|---|---|---|
| 0000013040 | 83EE | EE7E | 7400 | E903 | 0028 | 76FF | FF0A | 0876 |
| 0000013060 | 76FF | FFC8 | C676 | C79A | F728 | 8313 | 08C4 | 76FF |
| 0000013100 | FF0A | 0876 | A19A | 0742 | 8314 | 04C4 | 468B | A3F4 |
| 0000013120 | 0114 | 016A | C09A | 305D | 8314 | 02C4 | 21E9 | 8D04 |
| 0000013140 | F446 | 5016 | 016A | 36FF | 1232 | 36FF | 15E0 | 36FF |
| 0000013160 | 15DE | 468B | 8B08 | 0A56 | CE05 | 5200 | 9A50 | 5817 |
| 0000013200 | 146A | C483 | 8910 | EE46 | 7E83 | 00EE | 0374 | 08E9 |
| 0000013220 | C70D | EE46 | 0011 | 98E9 | 8300 | EE7E | 7410 | E903 |
| 0000013240 | 008F | 46C7 | 00EE | 8000 | 163E | 0001 | 0375 | 13E9 |
| 0000013260 | 6A00 | 1E00 | 1668 | 9A01 | 1D15 | 1479 | C483 | C606 |
| 0000013300 | 1606 | 0001 | 006A | C09A | 975D | 8314 | 02C4 | 468B |
| 0000013320 | 8B08 | 0A56 | CE05 | 5200 | 8B50 | C646 | 568B | 05C8 |
| 0000013340 | 0004 | 5052 | FA9A | BC7F | 8314 | 08C4 | 5EC4 | 2608 |
| 0000013360 | BF83 | 013E | 1B01 | 40C0 | 5EC4 | 26C6 | 4789 | 8D2C |
| 0000013400 | 4C86 | 16FF | 6A50 | 6A01 | 9A31 | 5C47 | 150B | C483 |
| 0000013420 | 8908 | EE46 | 7E83 | 00EE | 0375 | 08E9 | C700 | EE46 |
| 0000013440 | 045A | 0CE9 | C700 | 1006 | 0B01 | C700 | 3406 | 0112 |
| 0000013460 | E900 | 034C | 06C6 | 0116 | 8D00 | F446 | 5016 | 016A |
| 0000013500 | 36FF | 1232 | 36FF | 15E0 | 36FF | 15DE | 4E8B | 8B08 |
| 0000013520 | 0A56 | C181 | 00CE | 5152 | 179A | 2D58 | 8315 | 10C4 |
| 0000013540 | 4689 | 83EE | EE7E | 7400 | E903 | 0063 | 468D | 16F6 |
| 0000013560 | FF50 | C876 | 76FF | FFC6 | F476 | 699A | 461A | 8315 |
| 0000013600 | 0AC4 | 4689 | 83EE | EE7E | 7400 | E903 | 0010 | 016A |
| 0000013620 | 76FF | 9AF6 | 1F4D | 1566 | C483 | 8904 | EE46 | 7E83 |
| 0000013640 | 00EE | 0374 | 28E9 | FF00 | 0A76 | 76FF | FF08 | C876 |
| 0000013660 | 76FF | 9AC6 | 28C7 | 1574 | C483 | FF08 | 0A76 | 76FF |
| 0000013700 | 9A08 | 42A1 | 1584 | C483 | 8B04 | F446 | 14A3 | 6A01 |
| 0000013720 | 9A01 | 5DC0 | 159C | C483 | E902 | 02A4 | 006A | 468B |
| 0000013740 | 8B08 | 0A56 | CE05 | 5200 | 9A50 | 1D15 | 10A9 | C483 |
| 0000013760 | 8906 | EE46 | 7E83 | 10EE | 0374 | 05E9 | C700 | EE46 |
| 0000014000 | 0000 | 7E83 | 00EE | 0374 | 79E9 | 8D01 | F446 | 5016 |
| 0000014020 | 016A | 36FF | 1232 | 36FF | 15E0 | 36FF | 15DE | 468B |
| 0000014040 | 8B08 | 0A56 | CE05 | 5200 | 9A50 | 5817 | 162A | C483 |
| 0000014060 | 8910 | EE46 | 7E83 | 00EE | 0374 | 1FE9 | 6A00 | 6A00 |
| 0000014100 | FF00 | 3836 | FF12 | 3636 | 8B12 | 0846 | 568B | 050A |
| 0000014120 | 00CE | 5052 | FF9A | 00FF | 8900 | EE46 | 7E83 | 00EE |
| 0000014140 | 0375 | 08E9 | C700 | EE46 | 0452 | 17E9 | 6A01 | FF01 |
| 0000014160 | 3836 | FF12 | 3636 | 9A12 | 317D | 1683 | C483 | 8906 |
| 0000014200 | EE46 | 7E83 | 00EE | 0374 | BEE9 | 8300 | 323E | 0012 |
| 0000014220 | 037F | B4E9 | A100 | 1232 | 3B48 | F446 | 037C | 0AE9 |
| 0000014240 | A100 | 1232 | A348 | 0114 | 06E9 | 8B00 | F446 | 14A3 |
| 0000014260 | 8D01 | F446 | 5016 | 016A | 36FF | 13CA | 681E | 123A |
| 0000014300 | 14A1 | C101 | 05E0 | 0603 | 15DE | 168B | 15E0 | 5052 |
| 0000014320 | 289A | 9C5A | 8316 | 10C4 | 4689 | 6AA6 | 6A0D | FF00 |
| 0000014340 | C876 | 76FF | FFC6 | 1436 | 9A01 | 1A69 | 16CD | C483 |
| 0000014360 | 890A | EE46 | 7E83 | 00EE | 0374 | 49E9 | 8300 | A67E |
| 0000014400 | 7410 | E903 | 001C | 14A1 | C101 | 05E0 | 0603 | 15DE |
| 0000014420 | 168B | 15E0 | 5052 | 681E | 0116 | FA9A | E17F | 8316 |
| 0000014440 | 08C4 | 76FF | FF0A | 0876 | 76FF | FFC8 | C676 | C79A |
| 0000014460 | 0F28 | 8317 | 08C4 | 7E83 | 01A6 | C01B | D8F7 | 5EC4 |
| 0000014500 | 2608 | 8789 | 0134 | 24E9 | 8300 | EE7E | 7400 | E903 |
| 0000014520 | 001B | 76FF | FF0A | 0876 | 006A | 006A | C79A | 2F28 |
| 0000014540 | 8317 | 08C4 | 5EC4 | 2608 | 87C6 | 00CE | 8300 | EE7E |
| 0000014560 | 7400 | E903 | 000E | 76FF | FF0A | 0876 | A19A | 3A42 |
| 0000014600 | 8317 | 04C4 | F9E9 | 9A00 | 2160 | 174D | 4689 | 83EE |
| 0000014620 | EE7E | 7400 | E903 | 00A7 | 3F6A | AB9A | 9160 | 8317 |
| 0000014640 | 02C4 | 4689 | FFEE | E036 | FF15 | DE36 | 9A15 | FFFF |
| 0000014660 | 0000 | C02B | E0A3 | A315 | 15DE | 46C7 | 00C4 | E900 |
| 0000014700 | 0003 | 46FF | A1C4 | 13CA | 4639 | 7CC4 | E903 | 0019 |

THU MAR 14 17:34:20 1991 FL.DLL PAGE 8, LINE 414

| | | | | | | | | |
|---|---|---|---|---|---|---|---|---|
| 0000014720 | 5E8B | C1C4 | 02E3 | B7FF | 123C | B7FF | 123A | 469A |
| 0000014740 | 487D | 8318 | 04C4 | D9E9 | C7FF | 3206 | 0012 | C700 |
| 0000014760 | CA06 | 0013 | C600 | 1606 | 0001 | 38A1 | 0B12 | 3606 |
| 0000015000 | 7512 | E903 | 000F | 36FF | 1238 | 36FF | 1236 | 006A |
| 0000015020 | FF9A | 00FF | 6A00 | 6A01 | 6A64 | 8D00 | CA46 | 5016 |
| 0000015040 | F39A | 0001 | 8900 | EE46 | 7E83 | 00EE | 0374 | 0EE9 |
| 0000015060 | FF00 | CC76 | 76FF | 9ACA | 020E | 0000 | 4689 | E9EE |
| 0000015100 | 003E | 46C7 | 18EE | E900 | 0036 | 33E9 | 4800 | 103D |
| 0000015120 | 7600 | E903 | FFEC | E0D1 | 2E93 | A7FF | 180E | 09AD |
| 0000015140 | 0A9F | 0E6F | 0E6F | 0C46 | 0C46 | 0C46 | 0C46 | 1350 |
| 0000015160 | 122B | 140F | 10D7 | 1197 | 14E4 | 158C | 1381 | 1737 |
| 0000015200 | 7E83 | 00EE | 0375 | 14E9 | 8300 | EE7E | 7504 | E903 |
| 0000015220 | 000B | 76FF | 9AEE | 6218 | 1355 | C483 | 8E02 | 0ED6 |
| 0000015240 | 2610 | 3E83 | 07A7 | 7500 | E903 | 0009 | 7E83 | FEAC |
| 0000015260 | 0374 | 0FE9 | 8E00 | 1006 | 2610 | 3E83 | 07D3 | 7500 |
| 0000015300 | E903 | 0051 | 468B | 89EE | AE46 | 76FF | FFB2 | B076 |
| 0000015320 | 468D | 16AE | FF50 | C276 | 76FF | FFFA | F876 | 4E8D |
| 0000015340 | 16B6 | 8D51 | F04E | 5116 | 4E8D | 16A8 | 1E51 | 9068 |
| 0000015360 | 6801 | 0324 | 36FF | 010A | 36FF | 0108 | 36FF | 010E |
| 0000015400 | 36FF | 010C | A19A | 0005 | 8300 | 28C4 | 468B | E9AE |
| 0000015420 | 0009 | 06E9 | 8B00 | EE46 | 00E9 | 5E00 | 835F | 02ED |
| 0000015440 | E58B | 5D1F | CB4D | 581E | 4590 | 8B55 | 1EEC | D88E |
| 0000015460 | EC81 | 002A | 5657 | 46C7 | 97F6 | 8C01 | F85E | 46C7 |
| 0000015500 | 01EE | 2B01 | 89C0 | E046 | 4689 | 8EDE | 0E06 | 2610 |
| 0000015520 | 3E83 | 1854 | 7500 | E903 | 001D | 36FF | 010E | 36FF |
| 0000015540 | 010C | 468D | 16D6 | 9A50 | 07BD | 0000 | C483 | 3D08 |
| 0000015560 | 0000 | 0374 | 0FE9 | 8E00 | 1006 | 2610 | 3E83 | 186C |
| 0000015600 | 7500 | E903 | 003B | 681E | 019E | 468D | 16E2 | 8D50 |
| 0000015620 | D646 | 5016 | 468D | 16F2 | 6850 | 033A | 681E | 01A6 |
| 0000015640 | 36FF | 010A | 36FF | 0108 | 36FF | 010E | 36FF | 010C |
| 0000015660 | 069A | 0008 | 8300 | 1EC4 | 4689 | 89F2 | F456 | 08E9 |
| 0000015700 | 2B00 | 89C0 | F446 | 4689 | C7F2 | F046 | 0000 | 3E83 |
| 0000015720 | 13CA | 7D64 | E903 | 0008 | 46C7 | 55F0 | E904 | 0050 |
| 0000015740 | 586A | 3C9A | DC7D | 8315 | 02C4 | 4689 | 89FA | FC56 |
| 0000015760 | 468B | 0BFC | FA46 | 0374 | 08E9 | C700 | F046 | 0007 |
| 0000016000 | 2DE9 | 8B00 | 0646 | 568B | 1E08 | F08B | DA8E | 7EC4 |
| 0000016020 | B9FA | 002C | A5F3 | 8B1F | FA46 | 568B | 8BFC | CA1E |
| 0000016040 | C113 | 02E3 | 8789 | 123A | 9789 | 123C | 06FF | 13CA |
| 0000016060 | 068E | 100E | 8326 | 023E | 0019 | 0375 | 09E9 | 8300 |
| 0000016100 | DA7E | 74FE | E903 | 000F | 068E | 1010 | 8326 | 2E3E |
| 0000016120 | 0019 | 0375 | 51E9 | 8B00 | F046 | 4689 | FFDC | E076 |
| 0000016140 | 76FF | 8DDE | DC46 | 5016 | 76FF | FFEE | F876 | 76FF |
| 0000016160 | 8DF6 | E24E | 5116 | 4E8D | 16F2 | 8D51 | D64E | 5116 |
| 0000016200 | 681E | 01A6 | 5568 | FF03 | 0A36 | FF01 | 0836 | FF01 |
| 0000016220 | 0E36 | FF01 | 0C36 | 9A01 | 18B5 | 0000 | C483 | 8B28 |
| 0000016240 | DC46 | 09E9 | E900 | 0006 | 468B | E9F0 | 0000 | 5F5E |
| 0000016260 | ED83 | 8B02 | 1FE5 | 4D5D | 1ECB | 9058 | 5545 | EC8B |
| 0000016300 | 8E1E | 81D8 | 82EC | 5700 | C756 | FA46 | 01B5 | 5E8C |
| 0000016320 | C7FC | F046 | 0101 | C02B | 4689 | 89E2 | E046 | 068E |
| 0000016340 | 100E | 8326 | 933E | 001C | 0375 | 1DE9 | FF00 | 0E36 |
| 0000016360 | FF01 | 0C36 | 8D01 | D846 | 5016 | 189A | 0019 | 8300 |
| 0000016400 | 08C4 | 003D | 7400 | E903 | 000F | 068E | 1010 | 8326 |
| 0000016420 | AB3E | 001C | 0375 | 3BE9 | 1E00 | BC68 | 8D01 | E446 |
| 0000016440 | 5016 | 468D | 16D8 | 8D50 | F446 | 5016 | 6C68 | 1E03 |
| 0000016460 | C468 | FF01 | 0A36 | FF01 | 0836 | FF01 | 0E36 | FF01 |
| 0000016500 | 0C36 | 9A01 | 1961 | 0000 | C483 | 891E | F446 | 5689 |
| 0000016520 | E9F6 | 0008 | C02B | 4689 | 89F6 | F446 | 46C7 | 00F2 |
| 0000016540 | 8000 | 163E | 0001 | 0375 | 43E9 | 8B00 | 0646 | E0C1 |
| 0000016560 | 0305 | DE06 | 8B15 | E016 | 5215 | 1E50 | 1668 | 9A01 |

THU MAR 14 17:34:20 1991 FL.DLL PAGE 9, LINE 473

| | | | | | | | | |
|---|---|---|---|---|---|---|---|---|
| 0000016600 | 8030 | 1B48 | C483 | 3D08 | 0000 | 0375 | 1FE9 | 6A00 |
| 0000016620 | 1E00 | 1668 | 9A01 | 1D15 | 1B88 | C483 | 8906 | F246 |
| 0000016640 | 7E83 | 00F2 | 0374 | 05E9 | C600 | 1606 | 0001 | 7E83 |
| 0000016660 | 00F2 | 0374 | AEE9 | 6A00 | 6A00 | 6A00 | FF01 | CA36 |
| 0000016700 | 1E13 | 3A68 | 8B12 | 0646 | E0C1 | 0305 | DE06 | 8B15 |
| 0000016720 | E016 | 5215 | 9A50 | 5A28 | 1BC0 | C483 | 8910 | F246 |
| 0000016740 | 7E83 | 10F2 | 0374 | 7CE9 | 8D00 | 7E86 | 16FF | FF50 |
| 0000016760 | 3836 | FF12 | 3636 | 6A12 | 6A00 | 6A00 | 8B00 | 064E |
| 0000017000 | E1C1 | 0305 | DE0E | 8B15 | E016 | 5215 | 9A51 | 55E6 |
| 0000017020 | 1BDE | C483 | 8912 | F246 | 7E83 | 00F2 | 0374 | 44E9 |
| 0000017040 | 8D00 | 7E86 | 16FF | 6A50 | 6A01 | 9A34 | 5C47 | 1BF8 |
| 0000017060 | C483 | 8908 | F246 | 7E83 | 00F2 | 0374 | 26E9 | 8D00 |
| 0000017100 | 7E86 | 16FF | 9A50 | 18D6 | 1C40 | C483 | 8904 | F246 |
| 0000017120 | 7E83 | 00F2 | 0374 | 0CE9 | 8B00 | CA1E | D113 | C7E3 |
| 0000017140 | 6887 | 0011 | 8300 | F27E | 7400 | E903 | 006E | 468D |
| 0000017160 | 16F8 | 6A50 | FF01 | CA36 | 1E13 | 3A68 | 8B12 | 064E |
| 0000017200 | E1C1 | 0305 | DE0E | 8B15 | E016 | 5215 | 9A51 | 5A28 |
| 0000017220 | 1995 | C483 | 8910 | F246 | 7E83 | 00F2 | 0374 | 3BE9 |
| 0000017240 | 8B00 | 0A46 | 460B | 7508 | E903 | 001C | 5E8B | C1F8 |
| 0000017260 | 02E3 | 878B | 123A | 978B | 123C | 8B1E | 8EF0 | C4DA |
| 0000017300 | 087E | 2CB9 | F300 | 1FA5 | 468B | 0B0E | 0C46 | 0375 |
| 0000017320 | 09E9 | 8B00 | F846 | 5EC4 | 260C | 0789 | 068E | 100E |
| 0000017340 | 8326 | E73E | 0919 | 0375 | 09E9 | 8300 | DC7E | 74FE |
| 0000017360 | E903 | 000F | 068E | 1010 | 8326 | FF3E | 0019 | 0375 |
| 0000017400 | 51E9 | 8B00 | F246 | 4689 | FFDE | E276 | 76FF | 8DE0 |
| 0000017420 | DE46 | 5016 | 76FF | FFF0 | FC76 | 76FF | 8DFA | E44E |
| 0000017440 | 5116 | 4E8D | 16F4 | 8D51 | D84E | 5116 | 681E | 01C4 |
| 0000017460 | AB68 | FF03 | 0A36 | FF01 | 0836 | FF01 | 0E36 | FF01 |
| 0000017500 | 0C36 | 9A01 | 1A48 | 0000 | C483 | 8B28 | DE46 | 09E9 |
| 0000017520 | E900 | 0006 | 468B | E9F2 | 0000 | 5F5E | ED83 | 8B02 |
| 0000017540 | 1FE5 | 4D5D | 1ECB | 9058 | 5545 | EC8B | 8E1E | 81D8 |
| 0000017560 | 84EC | 5700 | C756 | FA46 | 01D3 | 5E8C | C7FC | EE46 |
| 0000017600 | 0101 | C02B | 4689 | 89E0 | DE46 | 068E | 100E | 8326 |
| 0000017620 | 953E | 001A | 0375 | 1DE9 | FF00 | 0E36 | FF01 | 0C36 |
| 0000017640 | 8D01 | D646 | 5016 | AB9A | 001A | 8300 | 08C4 | 003D |
| 0000017660 | 7400 | E903 | 000F | 068E | 1010 | 8326 | C13E | 001A |
| 0000017700 | 0375 | 3BE9 | 1E00 | DA68 | 8D01 | E246 | 5016 | 468D |
| 0000017720 | 16D6 | 8D50 | F446 | 5016 | C168 | 1E03 | E268 | FF01 |
| 0000017740 | 0A36 | FF01 | 0836 | FF01 | 0E36 | FF01 | 0C36 | 9A01 |
| 0000017760 | 1AF4 | 0000 | C483 | 891E | F446 | 5689 | E9F6 | 0008 |
| 0000020000 | C02B | 4689 | 89F6 | F446 | 46C7 | 00F2 | 8D00 | F846 |
| 0000020020 | 5016 | 016A | 36FF | 13CA | 681E | 123A | 76FF | FF08 |
| 0000020040 | 0676 | 289A | 065A | 831E | 10C4 | 4689 | 83F2 | F27E |
| 0000020060 | 7400 | E903 | 0028 | 7E83 | 000A | 0375 | 1FE9 | 8B00 |
| 0000020100 | F85E | E3D1 | 8F83 | 116A | 7500 | E903 | 0010 | 006A |
| 0000020120 | 76FF | 9AF8 | 1F4D | 1E1C | C483 | 8904 | F246 | 7E83 |
| 0000020140 | 00F2 | 0374 | ADE9 | 6A00 | 9A00 | 5DC0 | 1E2F | C483 |
| 0000020160 | FF02 | 0876 | 76FF | 8D06 | 8046 | 5016 | FA9A | 417F |
| 0000020200 | 831E | 08C4 | 868D | FF7C | 5016 | 006A | 346A | 479A |
| 0000020220 | 685C | 831E | 08C4 | 4689 | 83F2 | F27E | 7400 | E903 |
| 0000020240 | 0068 | 06C6 | 0116 | 8B00 | F85E | E3C1 | FF02 | 3CB7 |
| 0000020260 | FF12 | 3AB7 | 9A12 | 7D46 | 1B32 | C483 | 8B04 | F846 |
| 0000020300 | 4689 | E9F0 | 0003 | 46FF | A1F0 | 13CA | 3B48 | F046 |
| 0000020320 | 037F | 31E9 | 8B00 | F05E | E3C1 | 8B02 | 3E87 | 8B12 |
| 0000020340 | 4097 | 8B12 | F05E | E3C1 | 8902 | 3A87 | 8912 | 3C97 |
| 0000020360 | 8B12 | F05E | E3D1 | 878B | 116C | 5E8B | D1F0 | 89E3 |
| 0000020400 | 6A87 | E911 | FFC0 | 0EFF | 13CA | 016A | C09A | D55D |
| 0000020420 | 831D | 02C4 | 068E | 100E | 8326 | 413E | 001D | 0375 |
| 0000020440 | 09E9 | 8300 | DA7E | 74FE | E903 | 000F | 068E | 1010 |

THU MAR 14 17:34:20 1991 FL.DLL PAGE 10, LINE 532

| | | | | | | | | |
|---|---|---|---|---|---|---|---|---|
| 0000020460 | 8326 | 6D3E | 001D | 0375 | 51E9 | 8B00 | F246 | 4689 |
| 0000020500 | FFDC | E076 | 76FF | 8DDE | DC46 | 5016 | 76FF | FFEE |
| 0000020520 | FC76 | 76FF | 8DFA | E24E | 5116 | 4E8D | 16F4 | 8D51 |
| 0000020540 | D64E | 5116 | 681E | 01E2 | EC68 | FF03 | 0A36 | FF01 |
| 0000020560 | 0836 | FF01 | 0E36 | FF01 | 0C36 | 9A01 | 1CF4 | 0000 |
| 0000020600 | C483 | 8B28 | DC46 | 09E9 | E900 | 0006 | 468B | E9F2 |
| 0000020620 | 0000 | 5F5E | ED83 | 8B02 | 1FE5 | 4D5D | 1ECB | 9058 |
| 0000020640 | 5545 | EC8B | 8E1E | 81D8 | 28EC | 5700 | C756 | FA46 |
| 0000020660 | 01F2 | 5E8C | C7FC | F246 | 0101 | C02B | 4689 | 89E4 |
| 0000020700 | E246 | 068E | 100E | 8326 | DE3E | 0020 | 0375 | 1DE9 |
| 0000020720 | FF00 | 0E36 | FF01 | 0C36 | 8D01 | DA46 | 5016 | 579A |
| 0000020740 | 001D | 8300 | 08C4 | 003D | 7400 | E903 | 000F | 068E |
| 0000020760 | 1010 | 8326 | F63E | 0020 | 0375 | 3BE9 | 1E00 | F968 |
| 0000021000 | 8D01 | E646 | 5016 | 468D | 16DA | 8D50 | F646 | 5016 |
| 0000021020 | 0268 | 1E04 | 4C68 | FF02 | 0A36 | FF01 | 0836 | FF01 |
| 0000021040 | 0E36 | FF01 | 0C36 | 9A01 | 1DA0 | 0000 | C483 | 891E |
| 0000021060 | F646 | 5689 | E9F8 | 0008 | C02B | 4689 | 89F8 | F646 |
| 0000021100 | 46C7 | 00F4 | 8300 | 087E | 7500 | E903 | 0047 | 5E8B |
| 0000021120 | D106 | 83E3 | 6ABF | 0011 | 0375 | 38E9 | 8B00 | 065E |
| 0000021140 | E3C1 | FF02 | 3CB7 | FF12 | 3AB7 | FF12 | 3836 | FF12 |
| 0000021160 | 3636 | 9A12 | 5783 | 2048 | C483 | 8908 | F446 | 7E83 |
| 0000021200 | 00F4 | 0374 | 0BE9 | 8B00 | 065E | E3D1 | 87C7 | 116A |
| 0000021220 | 0000 | 92E9 | 9A00 | 4954 | 208A | 5052 | 7E83 | 0008 |
| 0000021240 | 0375 | 06E9 | B800 | 0200 | 03E9 | B800 | 0227 | 501E |
| 0000021260 | 1568 | 9A41 | FFFF | 0000 | 4689 | 8BD8 | D846 | 4EE9 |
| 0000021300 | 8B00 | 065E | E3C1 | FF02 | 3CB7 | FF12 | 3AB7 | FF12 |
| 0000021320 | 3836 | FF12 | 3636 | 9A12 | 5783 | 1EBF | C483 | 8908 |
| 0000021340 | F446 | 7E83 | 00F4 | 0374 | 0BE9 | 8B00 | 065E | E3D1 |
| 0000021360 | 87C7 | 116A | 0000 | 2EE9 | E900 | 002B | 46C7 | 04F4 |
| 0000021400 | E900 | 0023 | 46C7 | 01F4 | E900 | 001B | 18E9 | 4800 |
| 0000021420 | 7548 | E903 | FFE6 | 042D | 7500 | E903 | FFA3 | 7548 |
| 0000021440 | E903 | FFD5 | DDE9 | 8EFF | 0E06 | 2610 | 3E83 | 1ECB |
| 0000021460 | 7500 | E903 | 0009 | 7E83 | FEDE | 0374 | 0FE9 | 8E00 |
| 0000021500 | 1006 | 2610 | 3E83 | 1EE3 | 7500 | E903 | 0051 | 468B |
| 0000021520 | 89F4 | E046 | 76FF | FFE4 | E276 | 468D | 16E0 | FF50 |
| 0000021540 | F276 | 76FF | FFFC | FA76 | 4E8D | 16E6 | 8D51 | F64E |
| 0000021560 | 5116 | 4E8C | 16DA | 1E51 | 4C68 | 6802 | 0438 | 36FF |
| 0000021600 | 010A | 36FF | 0108 | 36FF | 010E | 36FF | 010C | 2C9A |
| 0000021620 | 001F | 8300 | 28C4 | 468B | E9E0 | 0009 | 06E9 | 8B00 |
| 0000021640 | F446 | 00E9 | 5E00 | 835F | 02ED | E58B | 5D1F | CB4D |
| 0000021660 | 581E | 4590 | 8B55 | 1EEC | D88E | EC81 | 012C | 5657 |
| 0000021700 | 46C7 | 58FA | 8C02 | FC5E | 86C7 | FEEE | 0101 | C02B |
| 0000021720 | 8689 | FEE0 | 8689 | FEDE | 068E | 100E | 8326 | 793E |
| 0000021740 | 001F | 0375 | 1EE9 | FF00 | 0E36 | FF01 | 0C36 | 8D01 |
| 0000021760 | D686 | 16FE | 9A50 | 1F8F | 0000 | C483 | 3D08 | 0000 |
| 0000022000 | 0374 | 0FE9 | 8E00 | 1006 | 2610 | 3E83 | 1FA5 | 7500 |
| 0000022020 | E903 | 003D | 681E | 025F | 868D | FEE2 | 5016 | 868D |
| 0000022040 | FED6 | 5016 | 468D | 16F6 | 6850 | 044D | 681E | 0296 |
| 0000022060 | 36FF | 010A | 36FF | 0108 | 36FF | 010E | 36FF | 010C |
| 0000022100 | D89A | 001F | 8300 | 1EC4 | 4689 | 89F6 | F856 | 08E9 |
| 0000022120 | 2B00 | 89C0 | F846 | 4689 | C7F6 | F446 | 0000 | 3E83 |
| 0000022140 | 13CA | 7F00 | E903 | 0117 | 86C7 | FEF0 | 0000 | 86C7 |
| 0000022160 | FEF2 | 0000 | 04E9 | FF00 | F286 | A1FE | 13CA | 8639 |
| 0000022200 | FEF2 | 037C | 17E9 | 8B00 | F29E | D1FE | 83E3 | 6ABF |
| 0000022220 | 0011 | 0375 | 04E9 | FF00 | F086 | E9FE | FFD9 | BE83 |
| 0000022240 | FEF0 | 7F00 | E903 | 00D7 | 681E | 0266 | B6FF | FEF0 |
| 0000022260 | 681E | 0290 | 868D | FEF4 | 5016 | 0C9A | 7583 | 8322 |
| 0000022300 | 0EC4 | 549A | DE49 | 5222 | 8D50 | F486 | 16FE | 6850 |
| 0000022320 | 4115 | 649A | 0020 | 8900 | D486 | 8BFE | D486 | E9FE |

THU MAR 14 17:34:20 1991 FL.DLL PAGE 11, LINE 591

| | | | | | | | | |
|---|---|---|---|---|---|---|---|---|
| 0000022340 | 0085 | 86C7 | FEF2 | 0000 | 04E9 | FF00 | F286 | A1FE |
| 0000022360 | 13CA | 8639 | FEF2 | 037C | 53E9 | 8300 | F47E | 7400 |
| 0000022400 | E903 | 004A | 9E8B | FEF2 | E3D1 | BF83 | 116A | 7500 |
| 0000022420 | E903 | 0037 | 9E8B | FEF2 | E3C1 | FF02 | 3CB7 | FF12 |
| 0000022440 | 3AB7 | FF12 | 3836 | FF12 | 3636 | 9A12 | 5783 | 2026 |
| 0000022460 | C483 | 8908 | F446 | 7E83 | 00F4 | 0374 | 0CE9 | 8B00 |
| 0000022500 | F29E | D1FE | C7E3 | 6A87 | 0011 | E900 | FF9D | 2EE9 |
| 0000022520 | E900 | 002B | 46C7 | 04F4 | E900 | 0023 | 46C7 | 01F4 |
| 0000022540 | E900 | 001B | 18E9 | 4800 | 7548 | E903 | FFE6 | 042D |
| 0000022560 | 7500 | E903 | FF6C | 7548 | E903 | FFD5 | DDE9 | 8EFF |
| 0000022600 | 0E06 | 2610 | 3E83 | 218F | 7500 | E903 | 000A | BE83 |
| 0000022620 | FEDA | 74FE | E903 | 000F | 068E | 1010 | 8326 | BC3E |
| 0000022640 | 0021 | 0375 | 59E9 | 8B00 | F446 | 8689 | FEDC | B6FF |
| 0000022660 | FEE0 | B6FF | FEDE | 868D | FEDC | 5016 | B6FF | FEEE |
| 0000022700 | 76FF | FFFC | FA76 | 8E8D | FEE2 | 5116 | 4E8D | 16F6 |
| 0000022720 | 8D51 | D68E | 16FE | 1E51 | 9668 | 6802 | 048B | 36FF |
| 0000022740 | 010A | 36FF | 0108 | 36FF | 010E | 36FF | 010C | 3F9A |
| 0000022760 | 0021 | 8300 | 28C4 | 868B | FEDC | 09E9 | E900 | 0006 |
| 0000023000 | 468B | E9F4 | 0000 | 5F5E | ED83 | 8B02 | 1FE5 | 4D5D |
| 0000023020 | 1ECB | 9058 | 5545 | EC8B | 8E1E | 81D8 | 82EC | 5700 |
| 0000023040 | C756 | FA46 | 02A6 | 5E8C | C7FC | F046 | 0101 | C02B |
| 0000023060 | 4689 | 89E2 | E046 | 068E | 100E | 8326 | CA3E | 0024 |
| 0000023100 | 0375 | 1DE9 | FF00 | 0E36 | FF01 | 0C36 | 8D01 | D846 |
| 0000023120 | 5016 | A69A | 0021 | 8300 | 08C4 | 003D | 7400 | E903 |
| 0000023140 | 000F | 068E | 1010 | 8326 | E23E | 0024 | 0375 | 3BE9 |
| 0000023160 | 1E00 | AD68 | 8D02 | E446 | 5016 | 468D | 16D8 | 8D50 |
| 0000023200 | F646 | 5016 | A068 | 1E04 | B468 | FF02 | 0A36 | FF01 |
| 0000023220 | 0836 | FF01 | 0E36 | FF01 | 0C36 | 9A01 | 21F1 | 0000 |
| 0000023240 | C483 | 891E | F646 | 5689 | E9F8 | 0008 | C02B | 4689 |
| 0000023260 | 89F8 | F646 | 46C7 | 00F4 | A100 | 0110 | 13E9 | C700 |
| 0000023300 | F246 | 0031 | 16E9 | C700 | F446 | 0013 | 0EE9 | E900 |
| 0000023320 | 000B | 0B2D | 7500 | E903 | FFE5 | EAE9 | 83FF | F47E |
| 0000023340 | 7400 | E903 | 002D | 868D | FF7E | 5016 | 006A | 76FF |
| 0000023360 | 9AF2 | 5C47 | 226D | C483 | 8908 | F446 | 7E83 | 00F4 |
| 0000023400 | 0375 | 08E9 | C700 | F446 | 045B | 06E9 | C700 | 1006 |
| 0000023420 | 0001 | 8E00 | 0E06 | 2610 | 3E83 | 2336 | 7500 | E903 |
| 0000023440 | 0009 | 7E83 | FEDC | 0374 | 0FE9 | 8E00 | 1006 | 2610 |
| 0000023460 | 3E83 | 234F | 7500 | E903 | 0051 | 468B | 89F4 | DE46 |
| 0000023500 | 76FF | FFE2 | E076 | 468D | 16DE | FF50 | F076 | 76FF |
| 0000023520 | FFFC | FA76 | 4E8D | 16E4 | 8D51 | F64E | 5116 | 4E8D |
| 0000023540 | 16D8 | 1E51 | B468 | 6802 | 04C1 | 36FF | 010A | 36FF |
| 0000023560 | 0108 | 36FF | 010E | 36FF | 010C | 9F9A | 0023 | 8300 |
| 0000023600 | 28C4 | 468B | E9DE | 0009 | 06E9 | 8B00 | F446 | 00E9 |
| 0000023620 | 5E00 | 835F | 02ED | E58B | 5D1F | CB4D | 581E | 4590 |
| 0000023640 | 8B55 | 1EEC | D88E | EC81 | 0024 | 5657 | 46C7 | C1FA |
| 0000023660 | 8C02 | FC5E | 46C7 | 00F4 | 2B00 | 89C0 | E646 | 4689 |
| 0000023700 | 8EE4 | 0E06 | 2610 | 3E83 | 25FC | 7500 | E903 | 001D |
| 0000023720 | 36FF | 010E | 36FF | 010C | 468D | 16DC | 9A50 | 2403 |
| 0000023740 | 0000 | C483 | 3D08 | 0000 | 0374 | 0FE9 | 8E00 | 1006 |
| 0000023760 | 2610 | 3E83 | 2314 | 7500 | E903 | 003B | 681E | 02C5 |
| 0000024000 | 468D | 16E8 | 8D50 | DC46 | 5016 | 468D | 16F6 | 6850 |
| 0000024020 | 04D6 | 681E | 02CA | 36FF | 010A | 36FF | 0108 | 36FF |
| 0000024040 | 010E | 36FF | 010C | 4C9A | 0024 | 8300 | 1EC4 | 4689 |
| 0000024060 | 89F6 | F856 | 08E9 | 2B00 | 89C0 | F846 | 4689 | 8BF6 |
| 0000024100 | 0646 | 10A3 | 8E01 | 0E06 | 2610 | 3E83 | 23ED | 7500 |
| 0000024120 | E903 | 0009 | 7E83 | FEE0 | 0374 | 0FE9 | 8E00 | 1006 |
| 0000024140 | 2610 | 3E83 | 2419 | 7500 | E903 | 0039 | 468D | 16E8 |
| 0000024160 | 8D50 | F646 | 5016 | 468D | 16DC | 1E50 | CA68 | 6802 |
| 0000024200 | 04DB | 36FF | 010A | 36FF | 0108 | 36FF | 010E | 36FF |

THU MAR 14 17:34:20 1991 FL.DLL PAGE 12, LINE 650

| | | | | | | | | |
|---|---|---|---|---|---|---|---|---|
| 0000024220 | 010C | 5B9A | 0007 | 8300 | 1AC4 | 46C7 | 00E2 | E900 |
| 0000024240 | 0006 | 03E9 | E900 | 0000 | 5F5E | ED83 | 8B02 | 1FE5 |
| 0000024260 | 4D5D | 1ECB | 9058 | 5545 | EC8B | 8E1E | 81D8 | 00EC |
| 0000024300 | 5700 | A156 | 0110 | 00E9 | 5E00 | 835F | 02ED | E58B |
| 0000024320 | 5D1F | CB4D | 581E | 4590 | 8B55 | 1EEC | D88E | EC81 |
| 0000024340 | 0024 | 5657 | 46C7 | DAFA | 8C02 | FC5E | 46C7 | 00F4 |
| 0000024360 | 2B00 | 89C0 | E646 | 4689 | 8EE4 | 0E06 | 2610 | 3E83 |
| 0000024400 | 2734 | 7500 | E903 | 001D | 36FF | 010E | 36FF | 010C |
| 0000024420 | 468D | 16DC | 9A50 | 258E | 0000 | C483 | 3D08 | 0000 |
| 0000024440 | 0374 | 0FE9 | 8E00 | 1006 | 2610 | 3E83 | 274C | 7500 |
| 0000024460 | E903 | 003B | 681E | 02DE | 468D | 16E8 | 8D50 | DC46 |
| 0000024500 | 5016 | 468D | 16F6 | 6850 | 0507 | 681E | 02E2 | 36FF |
| 0000024520 | 010A | 36FF | 0108 | 36FF | 010E | 36FF | 010C | D79A |
| 0000024540 | 0025 | 8300 | 1EC4 | 4689 | 89F6 | F856 | 08E9 | 2B00 |
| 0000024560 | 89C0 | F846 | 4689 | 8BF6 | 0646 | 12A3 | 8E01 | 0E06 |
| 0000024600 | 2610 | 3E83 | 2578 | 7500 | E903 | 0009 | 7E83 | FEE0 |
| 0000024620 | 0374 | 0FE9 | 8E00 | 1006 | 2610 | 3E83 | 25A4 | 7500 |
| 0000024640 | E903 | 0039 | 468D | 16E8 | 8D50 | F646 | 5016 | 468D |
| 0000024660 | 16DC | 1E50 | E268 | 6802 | 050C | 36FF | 010A | 36FF |
| 0000024700 | 0108 | 36FF | 010E | 36FF | 010C | 439A | 0026 | 8300 |
| 0000024720 | 1AC4 | 46C7 | 00E2 | E900 | 0006 | 03E9 | E900 | 0000 |
| 0000024740 | 5F5E | ED83 | 8B02 | 1FE5 | 4D5D | 1ECB | 9058 | 5545 |
| 0000024760 | EC8B | 8E1E | 81D8 | 24EC | 5700 | C756 | FA46 | 02F7 |
| 0000025000 | 5E8C | C7FC | F446 | 0101 | C02B | 4689 | 89E6 | E446 |
| 0000025020 | 068E | 100E | 8326 | 453E | 0028 | 0375 | 1DE9 | FF00 |
| 0000025040 | 0E36 | FF01 | 0C36 | 8D01 | DC46 | 5016 | C69A | 0026 |
| 0000025060 | 8300 | 08C4 | 003D | 7400 | E903 | 000F | 068E | 1010 |
| 0000025100 | 8326 | 5D3E | 0028 | 0375 | 3BE9 | 1E00 | FE68 | 8D02 |
| 0000025120 | E846 | 5016 | 468D | 16DC | 8D50 | F646 | 5016 | 2168 |
| 0000025140 | 1E05 | 0668 | FF03 | 0A36 | FF01 | 0836 | FF01 | 0E36 |
| 0000025160 | FF01 | 0C36 | 9A01 | 270F | 0000 | C483 | 891E | F646 |
| 0000025200 | 5689 | E9F8 | 0008 | C02B | 4689 | 89F8 | F646 | 068E |
| 0000025220 | 100E | 8326 | B03E | 0026 | 0375 | 09E9 | 8300 | E07E |
| 0000025240 | 74FE | E903 | 000F | 068E | 1010 | 8326 | DC3E | 0026 |
| 0000025260 | 0375 | 51E9 | A100 | 0112 | 4689 | FFE2 | E676 | 76FF |
| 0000025300 | 8DE4 | E246 | 5016 | 76FF | FFF4 | FC76 | 76FF | 8DFA |
| 0000025320 | E84E | 5116 | 4E8D | 16F6 | 8D51 | DC4E | 5116 | 681E |
| 0000025340 | 0306 | 2568 | FF05 | 0A36 | FF01 | 0836 | FF01 | 0E36 |
| 0000025360 | FF01 | 0C36 | 9A01 | 252B | 0000 | C483 | 8B28 | E246 |
| 0000025400 | 09E9 | E900 | 0006 | 12A1 | E901 | 0000 | 5F5E | ED83 |
| 0000025420 | 8B02 | 1FE5 | 4D5D | 1ECB | 9058 | 5545 | EC8B | 8E1E |
| 0000025440 | 81D8 | 30EC | 5700 | C756 | FA46 | 0319 | 5E8C | C7FC |
| 0000025460 | EC46 | 0000 | C02B | 4689 | 89DE | DC46 | 068E | 100E |
| 0000025500 | 8326 | C73E | 0027 | 0375 | 1DE9 | FF00 | 0E36 | FF01 |
| 0000025520 | 0C36 | 8D01 | D446 | 5016 | DD9A | 0027 | 8300 | 08C4 |
| 0000025540 | 003D | 7400 | E903 | 000F | 068E | 1010 | 8326 | F33E |
| 0000025560 | 0027 | 0375 | 3BE9 | 1E00 | 1D68 | 8D03 | E046 | 5016 |
| 0000025600 | 468D | 16D4 | 8D50 | F446 | 5016 | 3B68 | 1E05 | 5268 |
| 0000025620 | FF03 | 0A36 | FF01 | 0836 | FF01 | 0E36 | FF01 | 0C36 |
| 0000025640 | 9A01 | 2826 | 0000 | C483 | 891E | F446 | 5689 | E9F6 |
| 0000025660 | 0008 | C02B | 4689 | 89F6 | F446 | 468B | 0B08 | 0646 |
| 0000025700 | 0374 | 3CE9 | C400 | 0A5E | C626 | 4487 | 0001 | 46C7 |
| 0000025720 | 00EE | E900 | 0003 | 46FF | 83EE | EE7E | 7C04 | E903 |
| 0000025740 | 0012 | 768B | D1EE | C4E6 | 0A5E | C726 | 3680 | 0001 |
| 0000025760 | E900 | FFE2 | 5EC4 | 260A | 87C7 | 0134 | 0000 | 9EE9 |
| 0000026000 | 8D01 | F846 | 5016 | 006A | 36FF | 13CA | 681E | 123A |
| 0000026020 | 4E8B | 8B06 | 0856 | C183 | 5204 | 9A51 | 5A28 | 29F1 |
| 0000026040 | C483 | 8910 | D246 | 7E83 | 00D2 | 0374 | 8AE9 | 1E00 |
| 0000026060 | 1668 | 8B01 | 0646 | 568B | 0508 | 0004 | 5052 | 309A |

THU MAR 14 17:34:20 1991 FL.DLL PAGE 13, LINE 709

| | | | | | | | | |
|---|---|---|---|---|---|---|---|---|
| 0000026100 | 3780 | 832A | 08C4 | 003D | 7500 | E903 | 006B | 5EC4 |
| 0000026120 | 260A | 87C7 | 0134 | 0001 | 468B | 40F8 | 063B | 13CA |
| 0000026140 | 037C | 2AE9 | 8B00 | F846 | 5040 | 468B | 8B06 | 0856 |
| 0000026160 | 0405 | 5200 | 1E50 | 2168 | 8B03 | 0A46 | 568B | 050C |
| 0000026200 | 00CE | 5052 | 0C9A | 6183 | 832A | 0EC4 | 27E9 | 8B00 |
| 0000026220 | F846 | 5040 | 468B | 8B06 | 0856 | 0405 | 5200 | 1E50 |
| 0000026240 | 2F68 | 8B03 | 0A46 | 568B | 050C | 00CE | 5052 | 0C9A |
| 0000026260 | A483 | 8324 | 0EC4 | 28E9 | C400 | 0A5E | C726 | 3487 |
| 0000026300 | 0001 | 8B00 | 0646 | 568B | 0508 | 0004 | 5052 | 468B |
| 0000026320 | 8B0A | 0C56 | CE05 | 5200 | 9A50 | 7FFA | 2AEE | C483 |
| 0000026340 | C408 | 065E | 8B26 | 2447 | 5EC4 | 260A | 8789 | 0136 |
| 0000026360 | 5EC4 | 2606 | 478B | C426 | 0A5E | 8926 | 3887 | C401 |
| 0000026400 | 065E | 8B26 | 2847 | 5EC4 | 260A | 8789 | 013A | 5EC4 |
| 0000026420 | 2606 | 478B | C42A | 0A5E | 8926 | 3C87 | C401 | 065E |
| 0000026440 | 8326 | 2C7F | 1B01 | 40C0 | 5EC4 | 260A | 8789 | 013E |
| 0000026460 | 468B | 8B06 | 0856 | 3005 | 5200 | 9A50 | 85A6 | 2B0D |
| 0000026500 | C483 | 8904 | F046 | 5689 | 8BF2 | F246 | 460B | 75F0 |
| 0000026520 | E903 | 0034 | 76FF | FFF2 | F076 | 5A9A | 3080 | 832B |
| 0000026540 | 04C4 | F08B | 5EC4 | 26F0 | 40C6 | 00FF | 76FF | FFF2 |
| 0000026560 | F076 | 468B | 8B0A | 0C56 | 4405 | 5201 | 9A50 | 7FFA |
| 0000026600 | 2B4A | C483 | E908 | 0017 | 681E | 0343 | 468B | 8B0A |
| 0000026620 | 0C56 | 4405 | 5201 | 9A50 | 7FFA | 29CE | C483 | 8E08 |
| 0000026640 | 0E06 | 2610 | 3E83 | 28F3 | 7500 | E903 | 0009 | 7E83 |
| 0000026660 | FED8 | 0374 | 0FE9 | 8E00 | 1006 | 2610 | 3E83 | 291F |
| 0000026700 | 7500 | E903 | 0039 | 468D | 16E0 | 8D50 | F446 | 5016 |
| 0000026720 | 468D | 16D4 | 1E50 | 5268 | 6803 | 057F | 36FF | 010A |
| 0000026740 | 36FF | 0108 | 36FF | 010E | 36FF | 010C | 7B9A | 0027 |
| 0000026760 | 8300 | 1AC4 | 46C7 | 00DA | E900 | 0006 | 03E9 | E900 |
| 0000027000 | 0000 | 5F5E | ED83 | 8B02 | 1FE5 | 4D5D | 1ECB | 9058 |
| 0000027020 | 5545 | EC8B | 8E1E | 81D8 | 24EC | 5700 | C756 | FA46 |
| 0000027040 | 0360 | 5E8C | C7FC | F446 | 0000 | C02B | 4689 | 89E6 |
| 0000027060 | E446 | 068E | 100E | 8326 | D43E | 002C | 0375 | 1DE9 |
| 0000027100 | FF00 | 0E36 | FF01 | 0C36 | 8D01 | DC46 | 5016 | 099A |
| 0000027120 | 0029 | 8300 | 08C4 | 003D | 7400 | E903 | 000F | 068E |
| 0000027140 | 1010 | 8326 | EC3E | 002C | 0375 | 3BE9 | 1E00 | 6468 |
| 0000027160 | 8D03 | E846 | 5016 | 468D | 16DC | 8D50 | F646 | 5016 |
| 0000027200 | 9668 | 1E05 | 6868 | FF03 | 0A36 | FF01 | 0836 | FF01 |
| 0000027220 | 0E36 | FF01 | 0C36 | 9A01 | 2952 | 0000 | C483 | 891E |
| 0000027240 | F646 | 5689 | E9F8 | 0008 | C02B | 4689 | 89F8 | F646 |
| 0000027260 | 468B | 8B06 | 0856 | CE05 | 5200 | 8B50 | 0A46 | 568B |
| 0000027300 | 050C | 0004 | 5052 | FA9A | 8C7F | 832A | 08C4 | 5EC4 |
| 0000027320 | 2606 | 878B | 0136 | 5EC4 | 260A | 4789 | C424 | 065E |
| 0000027340 | 8B26 | 3887 | C401 | 0A5E | 8926 | 2647 | 5EC4 | 2606 |
| 0000027360 | 878B | 013A | 5EC4 | 260A | 4789 | C428 | 065E | 8B26 |
| 0000027400 | 3C87 | C401 | 0A5E | 8926 | 2A47 | 5EC4 | 2606 | BF83 |
| 0000027420 | 013E | 1B01 | 40C0 | 5EC4 | 260A | 4789 | 8E2C | 0E06 |
| 0000027440 | 2610 | 3E83 | 2B56 | 7500 | E903 | 0009 | 7E83 | FEE0 |
| 0000027460 | 0374 | 0FE9 | 8E00 | 1006 | 2610 | 3E83 | 2B6E | 7500 |
| 0000027500 | E903 | 0039 | 468D | 16E8 | 8D50 | F646 | 5016 | 468D |
| 0000027520 | 16DC | 1E50 | 6868 | 6803 | 05A3 | 36FF | 010A | 36FF |
| 0000027540 | 0108 | 36FF | 010E | 36FF | 010C | 9D9A | 002B | 8300 |
| 0000027560 | 1AC4 | 46C7 | 00E2 | E900 | 0006 | 03E9 | E900 | 0000 |
| 0000027600 | 5F5E | ED83 | 8B02 | 1FE5 | 4D5D | 1ECB | 9058 | 5545 |
| 0000027620 | EC8B | 8E1E | 81D8 | 2EEC | 5700 | C756 | FA46 | 0376 |
| 0000027640 | 5E8C | C7FC | EA46 | 0101 | C02B | 4689 | 89DC | DA46 |
| 0000027660 | 068E | 100E | 8326 | E93E | 002B | 0375 | 1DE9 | FF00 |
| 0000027700 | 0E36 | FF01 | 0C36 | 8D01 | D246 | 5016 | FF9A | 002B |
| 0000027720 | 8300 | 08C4 | 003D | 7400 | E903 | 000F | 068E | 1010 |
| 0000027740 | 8326 | 153E | 002C | 0375 | 3BE9 | 1E00 | 7D68 | 8D03 |

THU MAR 14 17:34:20 1991 FL.DLL PAGE 14, LINE 768

| | | | | | | | | |
|---|---|---|---|---|---|---|---|---|
| 0000027760 | DE46 | 5016 | 468D | 16D2 | 8D50 | F046 | 5016 | B768 |
| 0000030000 | 1E05 | 8468 | FF03 | 0A36 | FF01 | 0836 | FF01 | 0E36 |
| 0000030020 | FF01 | 0C36 | 9A01 | 2C48 | 0000 | C483 | 891E | F046 |
| 0000030040 | 5689 | E9F2 | 0008 | C02B | 4689 | 89F2 | F046 | 46C7 |
| 0000030060 | 00EE | C600 | 1606 | 0001 | 468D | 16F4 | 6A50 | FF00 |
| 0000030100 | CA36 | 1E13 | 3A68 | 8B12 | 0646 | 568B | 0508 | 0004 |
| 0000030120 | 5052 | 289A | 365A | 832E | 10C4 | 4689 | 83EE | 343E |
| 0000030140 | 0012 | 0375 | 6CE9 | 8300 | EE7E | 7410 | E903 | 0063 |
| 0000030160 | 46C7 | 00EE | FF00 | 0876 | 76FF | FF06 | 3836 | FF12 |
| 0000030200 | 3636 | 9A12 | 5783 | 2E48 | C483 | 6A08 | FF01 | 3836 |
| 0000030220 | FF12 | 3636 | 9A12 | 317D | 2E56 | C483 | FF06 | 0876 |
| 0000030240 | 76FF | 9A06 | 18D6 | 2E78 | C483 | 8B04 | CA1E | D113 |
| 0000030260 | C7E3 | 6887 | 0011 | C700 | 1006 | 0001 | C700 | 3406 |
| 0000030300 | 0012 | 6A00 | 9A01 | 5DC0 | 2F67 | C483 | 8902 | EE46 |
| 0000030320 | D8E9 | 8300 | EE7E | 7400 | E903 | 00CF | 5EC4 | 2606 |
| 0000030340 | 478B | 8B24 | F45E | E3C1 | C402 | 3A9F | 2612 | 4739 |
| 0000030360 | 7524 | E903 | 0006 | 01B8 | E900 | 0003 | 00B8 | 8900 |
| 0000030400 | EC46 | 5EC4 | 2606 | 478B | 8B26 | F45E | E3C1 | C402 |
| 0000030420 | 3A9F | 2612 | 4739 | 7526 | E903 | 0006 | 01B8 | E900 |
| 0000030440 | 0003 | 00B8 | 0900 | EC46 | 5EC4 | 2606 | 478B | 8B28 |
| 0000030460 | F45E | E3C1 | C402 | 3A9F | 2612 | 4739 | 7528 | E903 |
| 0000030500 | 0006 | 01B8 | E900 | 0003 | 00B8 | 0900 | EC46 | 5EC4 |
| 0000030520 | 2606 | 478B | 8B2A | F45E | E3C1 | C402 | 3A9F | 2612 |
| 0000030540 | 4739 | 752A | E903 | 0006 | 01B8 | E900 | 0003 | 00B8 |
| 0000030560 | 0900 | EC46 | 7E83 | 00EC | 0375 | 2EE9 | 8B00 | F45E |
| 0000030600 | E3C1 | 8B02 | 3A87 | 8B12 | 3C97 | 8B12 | 064E | 5E8B |
| 0000030620 | 1E08 | F88B | F18B | C28E | DB8E | 2CB9 | F300 | 1FA5 |
| 0000030640 | 5E8B | D1F4 | C7E3 | 6A87 | 0111 | 8300 | EE7E | 7400 |
| 0000030660 | E903 | 0065 | 7E9A | 7E42 | 892F | F646 | 5689 | FFF8 |
| 0000030700 | F876 | 76FF | FFF6 | 0876 | 76FF | 9A06 | 28C7 | 2C79 |
| 0000030720 | C483 | FF08 | F876 | 76FF | 9AF6 | 42A1 | 2FB2 | C483 |
| 0000030740 | 8D04 | F446 | 5016 | 016A | 36FF | 1232 | 36FF | 15E0 |
| 0000030760 | 36FF | 15DE | 4E8B | 8B06 | 0856 | C183 | 5204 | 9A51 |
| 0000031000 | 5817 | 2E05 | C483 | 8910 | EE46 | 7E83 | 00EE | 0374 |
| 0000031020 | 06E9 | 8B00 | F446 | 14A3 | 8E01 | 0E06 | 2610 | 3E83 |
| 0000031040 | 2D67 | 7500 | E903 | 0009 | 7E83 | FED6 | 0374 | 0FE9 |
| 0000031060 | 8E00 | 1006 | 2610 | 3E83 | 2D93 | 7500 | E903 | 0051 |
| 0000031100 | 468B | 89EE | D846 | 76FF | FFDC | DA76 | 468D | 16D8 |
| 0000031120 | FF50 | EA76 | 76FF | FFFC | FA76 | 4E8D | 16DE | 8D51 |
| 0000031140 | F04E | 5116 | 4E8D | 16D2 | 1E51 | 8468 | 6803 | 05F8 |
| 0000031160 | 36FF | 010A | 36FF | 0108 | 36FF | 010E | 36FF | 010C |
| 0000031200 | A69A | 0028 | 8300 | 28C4 | 468B | E9D8 | 0009 | 06E9 |
| 0000031220 | 8B00 | EE46 | 00E9 | 5E00 | 835F | 02ED | E58B | 5D1F |
| 0000031240 | CB4D | 581E | 4590 | 8B55 | 1EEC | D88E | EC81 | 0024 |
| 0000031260 | 5657 | 46C7 | 92FA | 8C03 | FC5E | 46C7 | 00F4 | 2B00 |
| 0000031300 | 89C0 | E646 | 4689 | 8EE4 | 0E06 | 2610 | 3E83 | 3116 |
| 0000031320 | 7500 | E903 | 001D | 36FF | 010E | 36FF | 010C | 468D |
| 0000031340 | 16DC | 9A50 | 2D7D | 0000 | C483 | 3D08 | 0000 | 0374 |
| 0000031360 | 0FE9 | 8E00 | 1006 | 2610 | 3E83 | 312E | 7500 | E903 |
| 0000031400 | 003B | 681E | 0396 | 468D | 16E8 | 8D50 | DC46 | 5016 |
| 0000031420 | 468D | 16F6 | 6850 | 060D | 681E | 039A | 36FF | 010A |
| 0000031440 | 36FF | 0108 | 36FF | 010E | 36FF | 010C | C69A | 002D |
| 0000031460 | 8300 | 1EC4 | 4689 | 89F6 | F856 | 08E9 | 2B00 | 89C0 |
| 0000031500 | F846 | 4689 | 8BF6 | 0646 | 568B | A308 | 1236 | 1689 |
| 0000031520 | 1238 | 468B | 8B06 | 0856 | CCA3 | 8913 | CE16 | 8E13 |
| 0000031540 | 0E06 | 2610 | 3E83 | 2FD0 | 7500 | E903 | 0009 | 7E83 |
| 0000031560 | FEE0 | 0374 | 0FE9 | 8E00 | 1006 | 2610 | 3E83 | 2FE8 |
| 0000031600 | 7500 | E903 | 0039 | 468D | 16E8 | 8D50 | F646 | 5016 |
| 0000031620 | 468D | 16DC | 1E50 | 9A68 | 6803 | 0613 | 36FF | 010A |

THU MAR 14 17:34:20 1991 FL.DLL PAGE 15, LINE 827

| | | | | | | | | |
|---|---|---|---|---|---|---|---|---|
| 0000031640 | 36FF | 0108 | 36FF | 010E | 36FF | 010C | 1B9A | 002D |
| 0000031660 | 8300 | 1AC4 | 44C7 | 00E2 | E900 | 0006 | 03E9 | E900 |
| 0000031700 | 0000 | 5F5E | ED83 | 8B02 | 1FE5 | 4D5D | 1ECB | 9058 |
| 0000031720 | 5545 | EC8B | 8E1E | 81D8 | 26EC | 5700 | C756 | FA46 |
| 0000031740 | 03AD | 5E8C | C7FC | F246 | 0101 | C02B | 4689 | 89E4 |
| 0000031760 | E246 | 068E | 100E | 8326 | 883E | 0032 | 0375 | 1DE9 |
| 0000032000 | FF00 | 0E36 | FF01 | 0C36 | 8D01 | DA46 | 5016 | 949A |
| 0000032020 | 0030 | 8300 | 08C4 | 003D | 7400 | E903 | 000F | 068E |
| 0000032040 | 1010 | 8326 | A03E | 0032 | 0375 | 3BE9 | 1E00 | B468 |
| 0000032060 | 8D03 | E646 | 5016 | 468D | 16DA | 8D50 | F646 | 5016 |
| 0000032100 | 2968 | 1E06 | BC68 | FF03 | 0A36 | FF01 | 0836 | FF01 |
| 0000032120 | 0E36 | FF01 | 0C36 | 9A01 | 30DD | 0000 | C483 | 891E |
| 0000032140 | F646 | 5689 | E9F8 | 0008 | C02B | 4689 | 89F8 | F646 |
| 0000032160 | 46C7 | 00F4 | FF00 | 0876 | 76FF | FF06 | 0A76 | 681E |
| 0000032200 | 1232 | 681E | 15DE | FF9A | 00FF | 8900 | F446 | 7E83 |
| 0000032220 | 00F4 | 0375 | 3AE9 | 8100 | F47E | 01BC | 0374 | 0EE9 |
| 0000032240 | C700 | F446 | 0000 | 06C7 | 1232 | 0000 | 22E9 | 8100 |
| 0000032260 | F47E | 0196 | 0374 | 13E9 | 8B00 | 0846 | 460B | 7406 |
| 0000032300 | E903 | 0008 | 46C7 | 4FF4 | E904 | 0005 | 46C7 | 01F4 |
| 0000032320 | 8E00 | 0E06 | 2610 | 3E83 | 307E | 7500 | E903 | 0009 |
| 0000032340 | 7E83 | FEDE | 0374 | 0FE9 | 8E00 | 1006 | 2610 | 3E83 |
| 0000032360 | 30AA | 7500 | E903 | 0051 | 468B | 89F4 | E046 | 76FF |
| 0000032400 | FFE4 | E276 | 468D | 16E0 | FF50 | F276 | 76FF | FFFC |
| 0000032420 | FA76 | 4E8D | 16E6 | 8D51 | F64E | 5116 | 4E8D | 16DA |
| 0000032440 | 1E51 | BC68 | 6803 | 0640 | 36FF | 010A | 36FF | 0108 |
| 0000032460 | 36FF | 010E | 36FF | 010C | 319A | 0030 | 8300 | 28C4 |
| 0000032500 | 468B | E9E0 | 0009 | 06E9 | 8B00 | F446 | 00E9 | 5E00 |
| 0000032520 | 835F | 02ED | E58B | 5D1F | CB4D | 581E | 4590 | 8B55 |
| 0000032540 | 1EEC | D88E | EC81 | 0084 | 5657 | 46C7 | DFFA | 8C03 |
| 0000032560 | FC5E | 46C7 | 01EE | 2B01 | 89C0 | E046 | 4689 | 8EDE |
| 0000032600 | 1206 | 2610 | 3E83 | 31A9 | 7500 | E903 | 001D | 36FF |
| 0000032620 | 042C | 36FF | 042A | 468D | 16D6 | 9A50 | 31BF | 0000 |
| 0000032640 | C483 | 3D08 | 0000 | 0374 | 0FE9 | 8E00 | 1406 | 2610 |
| 0000032660 | 3E83 | 3621 | 7500 | E903 | 003A | 681E | 03E6 | 468D |
| 0000032700 | 16E2 | 8D50 | D646 | 5016 | 468D | 16F6 | 6A50 | 1E4D |
| 0000032720 | 2E68 | FF04 | 2836 | FF04 | 2636 | FF04 | 2C36 | FF04 |
| 0000032740 | 2A36 | 9A04 | 3208 | 0000 | C483 | 891E | F646 | 5689 |
| 0000032760 | E9F8 | 0008 | C02B | 4689 | 89F8 | F646 | 46C7 | 00F4 |
| 0000033000 | 8E00 | 1206 | 2610 | 3E83 | 3609 | 7500 | E903 | 0052 |
| 0000033020 | 7E83 | FEDA | 0375 | 49E9 | 8B00 | 0846 | 568B | 050A |
| 0000033040 | 00CC | 5052 | 76FF | 1E06 | ED68 | 8D03 | E246 | 5016 |
| 0000033060 | 468D | 16F6 | 8D50 | D646 | 5016 | 681E | 042E | 566A |
| 0000033100 | 36FF | 0428 | 36FF | 0426 | 36FF | 042C | 36FF | 042A |
| 0000033120 | 681E | 0403 | 7868 | 6808 | 087B | 7E9A | 0008 | 8300 |
| 0000033140 | 2CC4 | 868D | FF7C | 4689 | 8CF0 | F256 | 468B | E906 |
| 0000033160 | 0199 | C9E9 | C401 | 085E | FF26 | 3CB7 | 6A01 | 9A36 |
| 0000033200 | 5F3D | 344A | C483 | 8904 | F446 | B1E9 | FF01 | 0A76 |
| 0000033220 | 76FF | 6A08 | 6A00 | 9A00 | 3816 | 3462 | C483 | C408 |
| 0000033240 | 085E | C726 | 3C87 | 0001 | FF00 | 0A76 | 76FF | 9A08 |
| 0000033260 | 5156 | 3474 | C483 | 8D04 | 7C86 | 16FF | 6A50 | 6A01 |
| 0000033300 | 9A31 | 5C47 | 3492 | C483 | 8908 | F446 | 7E83 | 00F4 |
| 0000033320 | 0375 | 08E9 | C700 | F446 | 045A | 2CE9 | 6A00 | 9A02 |
| 0000033340 | 2684 | 349E | C483 | 1E02 | 0A68 | 9A04 | 4979 | 34B4 |
| 0000033360 | C483 | 8904 | F446 | 7E83 | 00F4 | 0374 | 0AE9 | 6A00 |
| 0000033400 | 9A0B | 254C | 34CB | C483 | E902 | 0132 | 76FF | FFF2 |
| 0000033420 | F076 | 76FF | FF0A | 0876 | 4A9A | 3A3A | 8335 | 08C4 |
| 0000033440 | 006A | 006A | 36FF | 15E4 | 36FF | 15E2 | 76FF | FFF2 |
| 0000033460 | F076 | 016A | FF9A | 00FF | 8900 | F446 | 7E83 | 00F4 |
| 0000033500 | 0374 | 25E9 | 6A00 | 6A00 | FF00 | E436 | FF15 | E236 |

THU MAR 14 17:34:20 1991 FL.DLL PAGE 16, LINE 886

| | | | | | | | | |
|---|---|---|---|---|---|---|---|---|
| 0000033520 | 8B15 | 0846 | 568B | 050A | 00CC | 5052 | 76FF | FFF2 |
| 0000033540 | F076 | FF9A | 00FF | 8900 | F446 | 7E83 | 00F4 | 0375 |
| 0000033560 | 08E9 | C700 | F446 | 0001 | 22E9 | FF00 | 0A76 | 76FF |
| 0000033600 | FF08 | F276 | 76FF | 9AF0 | 3816 | 3548 | C483 | FF08 |
| 0000033620 | 0A76 | 76FF | 9A08 | 5156 | 3597 | C483 | E904 | 009E |
| 0000033640 | 006A | 006A | 36FF | 15E4 | 36FF | 15E2 | 468B | 8B08 |
| 0000033660 | 0A56 | CC05 | 5200 | 9A50 | 1605 | 0000 | 4689 | 83F4 |
| 0000033700 | F47E | 7500 | E903 | 0017 | 7E81 | ABF4 | 7401 | E903 |
| 0000033720 | 0008 | 46C7 | 0FF4 | E900 | 0005 | 46C7 | 01F4 | E900 |
| 0000033740 | 005C | 3F6A | AB9A | FD60 | 8335 | 02C4 | 4689 | 83F4 |
| 0000033760 | F47E | 7500 | E903 | 0005 | 46C7 | 4EF4 | E904 | 003E |
| 0000034000 | 46C7 | 18F4 | E900 | 0036 | 33E9 | 4800 | 103D | 7600 |
| 0000034020 | E903 | FFEC | E0D1 | 2E93 | A7FF | 35CC | 3422 | 35B0 |
| 0000034040 | 35B0 | 35B0 | 35B0 | 35B0 | 35B0 | 35B0 | 3425 | 35B0 |
| 0000034060 | 343D | 35B0 | 35B0 | 35B0 | 3550 | 34BC | 3592 | 7E83 |
| 0000034100 | 00F4 | 0375 | 0BE9 | FF00 | F476 | 189A | 8C62 | 832F |
| 0000034120 | 02C4 | 068E | 1012 | 8326 | 363E | 0033 | 0375 | 09E9 |
| 0000034140 | 8300 | DA7E | 74FE | E903 | 000F | 068E | 1014 | 8326 |
| 0000034160 | D53E | 0031 | 0375 | 51E9 | 8B00 | F446 | 4689 | FFDC |
| 0000034200 | E076 | 76FF | 8DDE | DC46 | 5016 | 76FF | FFEE | FC76 |
| 0000034220 | 76FF | 8DFA | E24E | 5116 | 4E8D | 16F6 | 8D51 | D64E |
| 0000034240 | 5116 | 681E | 042E | D268 | FF00 | 2836 | FF04 | 2636 |
| 0000034260 | FF04 | 2C36 | FF04 | 2A36 | 9A04 | 32E9 | 0000 | C483 |
| 0000034300 | 8B28 | DC46 | 09E9 | E900 | 0006 | 468B | E9F4 | 0000 |
| 0000034320 | 5F5E | ED83 | 8B02 | 1FE5 | 4D5D | 1ECB | 9058 | 5545 |
| 0000034340 | EC8B | 8E1E | 81D8 | 26EC | 5700 | C756 | FA46 | 0435 |
| 0000034360 | 5E8C | C7FC | F246 | 0000 | C02B | 4689 | 89E4 | E246 |
| 0000034400 | 068E | 1012 | 8326 | B83E | 0033 | 0375 | 1DE9 | FF00 |
| 0000034420 | 2C36 | FF04 | 2A36 | 8D04 | DA46 | 5016 | 4C9A | 0033 |
| 0000034440 | 8300 | 08C4 | 003D | 7400 | E903 | 000F | 068E | 1014 |
| 0000034460 | 8326 | 623E | 0033 | 0375 | 3BE9 | 1E00 | 3968 | 8D04 |
| 0000034500 | E646 | 5016 | 468D | 16DA | 8D50 | F646 | 5016 | E868 |
| 0000034520 | 1E00 | 6068 | FF04 | 2836 | FF04 | 2636 | FF04 | 2C36 |
| 0000034540 | FF04 | 2A36 | 9A04 | 3394 | 0000 | C483 | 891E | F646 |
| 0000034560 | 5689 | E9F8 | 0008 | C02B | 4689 | 89F8 | F646 | 5EC4 |
| 0000034600 | 2606 | 87C6 | 013E | C400 | 065E | C726 | 3A87 | 0001 |
| 0000034620 | C700 | F446 | 0000 | 03E9 | FF00 | F446 | 7E83 | 04F4 |
| 0000034640 | 0372 | 12E9 | 8B00 | F476 | E6D1 | 5EC4 | 2606 | 80C7 |
| 0000034660 | 0132 | 0000 | E2E9 | 1EFF | 3D68 | 8B04 | 0646 | 568B |
| 0000034700 | 0508 | 0002 | 5052 | FA9A | 907F | 8337 | 08C4 | 681E |
| 0000034720 | 0450 | 468B | 8B06 | 0856 | 6705 | 5200 | 9A50 | 7FFA |
| 0000034740 | 3432 | C483 | C408 | 065E | C626 | CC87 | 0000 | 5EC4 |
| 0000034760 | 2606 | 87C7 | 013C | 0000 | 068E | 1012 | 8326 | B73E |
| 0000035000 | 0036 | 0375 | 09E9 | 8300 | DE7E | 74FE | E903 | 000F |
| 0000035020 | 068E | 1014 | 8326 | E33E | 0036 | 0375 | 39E9 | 8D00 |
| 0000035040 | E646 | 5016 | 468D | 16F6 | 8D50 | DA46 | 5016 | 681E |
| 0000035060 | 0460 | F968 | FF00 | 2836 | FF04 | 2636 | FF04 | 2C36 |
| 0000035100 | FF04 | 2A36 | 9A04 | 315D | 0000 | C483 | C71A | E046 |
| 0000035120 | 0000 | 06E9 | E900 | 0003 | 00E9 | 5E00 | 835F | 02ED |
| 0000035140 | E58B | 5D1F | CB4D | 581E | 4590 | 8B55 | 1EEC | D88E |
| 0000035160 | EC81 | 002C | 5657 | 46C7 | 6DFA | 8C04 | FC5E | 46C7 |
| 0000035200 | 00EE | 2B00 | 89C0 | E046 | 4689 | 8EDE | 1206 | 2610 |
| 0000035220 | 3E83 | 39E3 | 7500 | E903 | 001D | 36FF | 042C | 36FF |
| 0000035240 | 042A | 468D | 16D6 | 9A50 | 36CD | 0000 | C483 | 3D08 |
| 0000035260 | 0000 | 0374 | 0FE9 | 8E00 | 1406 | 2610 | 3E83 | 39FB |
| 0000035300 | 7500 | E903 | 003B | 681E | 0471 | 468D | 16E2 | 8D50 |
| 0000035320 | D646 | 5016 | 468D | 16F6 | 6850 | 0111 | 681E | 0484 |
| 0000035340 | 36FF | 0428 | 36FF | 0426 | 36FF | 042C | 36FF | 042A |
| 0000035360 | 169A | 0037 | 8300 | 1EC4 | 4689 | 89F6 | F856 | 08E9 |

THU MAR 14 17:34:20 1991 FL.DLL PAGE 17, LINE 945

| | | | | | | | | |
|---|---|---|---|---|---|---|---|---|
| 0000035400 | 2B00 | 89C0 | F846 | 4689 | 8BF6 | 0846 | 460B | 7406 |
| 0000035420 | E903 | 003C | 5EC4 | 260A | 87C6 | 013E | C400 | 0A5E |
| 0000035440 | C726 | 3A87 | 0001 | C700 | F046 | 0000 | 03E9 | FF00 |
| 0000035460 | F046 | 7E83 | 04F0 | 0372 | 12E9 | 8B00 | F076 | E6D1 |
| 0000035500 | 5EC4 | 260A | 80C7 | 0132 | 0000 | E2E9 | E9FF | 00DC |
| 0000035520 | 468B | 8B06 | 0856 | 0405 | 5200 | 8B50 | 0A46 | 568B |
| 0000035540 | 050C | 00CC | 5052 | FA9A | 7B7F | 8339 | 08C4 | 5EC4 |
| 0000035560 | 2606 | 478B | C424 | 0A5E | 8926 | 3287 | C401 | 065E |
| 0000035600 | 8B26 | 2647 | 5EC4 | 260A | 8789 | 0134 | 5EC4 | 2606 |
| 0000035620 | 478B | C428 | 0A5E | 8926 | 3687 | C401 | 065E | 8B26 |
| 0000035640 | 2A47 | 5EC4 | 260A | 8789 | 0138 | 5EC4 | 2606 | 7F83 |
| 0000035660 | 012C | C01B | C440 | 0A5E | 8926 | 3A87 | 8B01 | 0646 |
| 0000035700 | 568B | 0508 | 0030 | 5052 | A69A | 9A85 | 8339 | 04C4 |
| 0000035720 | 4689 | 89F2 | F456 | 468B | 0BF4 | F246 | 0375 | 34E9 |
| 0000035740 | FF00 | F476 | 76FF | 9AF2 | 805A | 39BD | C483 | 8B04 |
| 0000035760 | C4F0 | F25E | C626 | FF40 | FF00 | F476 | 76FF | 8BF2 |
| 0000036000 | 0A46 | 568B | 050C | 013E | 5052 | FA9A | D77F | 8339 |
| 0000036020 | 08C4 | 17E9 | 1E00 | 7568 | 8B04 | 0A46 | 568B | 050C |
| 0000036040 | 013E | 5052 | FA9A | 797F | 8337 | 08C4 | 068E | 1012 |
| 0000036060 | 8326 | AF3E | 0037 | 0375 | 09E9 | 8300 | DA7E | 74FE |
| 0000036100 | E903 | 000F | 068E | 1014 | 8326 | C73E | 0037 | 0375 |
| 0000036120 | 39E9 | 8D00 | E246 | 5016 | 468D | 16F6 | 8D50 | D646 |
| 0000036140 | 5016 | 681E | 0484 | 3968 | FF01 | 2836 | FF04 | 2636 |
| 0000036160 | FF04 | 2C36 | FF04 | 2A36 | 9A04 | 37F6 | 0000 | C483 |
| 0000036200 | C71A | DC46 | 0000 | 06E9 | E900 | 0003 | 00E9 | 5E00 |
| 0000036220 | 835F | 02ED | E58B | 5D1F | CB4D | 581E | 4590 | 8B55 |
| 0000036240 | 1EEC | D88E | EC81 | 0024 | 5657 | 46C7 | 92FA | 8C04 |
| 0000036260 | FC5E | 46C7 | 00F4 | 2B00 | 89C0 | E646 | 4689 | 8EE4 |
| 0000036300 | 1206 | 2610 | 3E83 | 3B61 | 7500 | E903 | 001D | 36FF |
| 0000036320 | 042C | 36FF | 042A | 468D | 16DC | 9A50 | 3858 | 0000 |
| 0000036340 | C483 | 3D08 | 0000 | 0374 | 0FE9 | 8E00 | 1406 | 2610 |
| 0000036360 | 3E83 | 3B79 | 7500 | E903 | 003B | 681E | 0496 | 468D |
| 0000036400 | 16E8 | 8D50 | DC46 | 5016 | 468D | 16F6 | 6850 | 0150 |
| 0000036420 | 681E | 049A | 36FF | 0428 | 36FF | 0426 | 36FF | 042C |
| 0000036440 | 36FF | 042A | A19A | 0038 | 8300 | 1EC4 | 4689 | 89F6 |
| 0000036460 | F856 | 08E9 | 2B00 | 89C0 | F846 | 4689 | 8BF6 | 0646 |
| 0000036500 | 568B | 0508 | 00CC | 5052 | 468B | 8B0A | 0C56 | 0405 |
| 0000036520 | 5200 | 9A50 | 7FFA | 3919 | C483 | C408 | 065E | 8B26 |
| 0000036540 | 3287 | C401 | 0A5E | 8926 | 2447 | 5EC4 | 2606 | 878B |
| 0000036560 | 0134 | 5EC4 | 260A | 4789 | C426 | 065E | 8B26 | 3687 |
| 0000036600 | C401 | 0A5E | 8926 | 2847 | 5EC4 | 2606 | 878B | 0138 |
| 0000036620 | 5EC4 | 260A | 4789 | C42A | 065E | 8326 | 3ABF | 0101 |
| 0000036640 | C01B | C440 | 0A5E | 8926 | 2C47 | 068E | 1012 | 8326 |
| 0000036660 | 423E | 0038 | 0375 | 09E9 | 8300 | E07E | 74FE | E903 |
| 0000036700 | 000F | 068E | 1014 | 8326 | 6E3E | 0038 | 0375 | 39E9 |
| 0000036720 | 8D00 | E846 | 5016 | 468D | 16F6 | 8D50 | DC46 | 5016 |
| 0000036740 | 681E | 049A | 5D68 | FF01 | 2836 | FF04 | 2636 | FF04 |
| 0000036760 | 2C36 | FF04 | 2A36 | 9A04 | 3A2A | 0000 | C483 | C71A |
| 0000037000 | E246 | 0000 | 06E9 | E900 | 0003 | 00E9 | 5E00 | 835F |
| 0000037020 | 02ED | E58B | 5D1F | CB4D | 581E | 4590 | 8B55 | 1EEC |
| 0000037040 | D88E | EC81 | 0024 | 5657 | 46C7 | A8FA | 8C04 | FC5E |
| 0000037060 | 46C7 | 00F4 | 2B00 | 89C0 | E646 | 4689 | 8EE4 | 1206 |
| 0000037100 | 2610 | 3E83 | 3C7F | 7500 | E903 | 001D | 36FF | 042C |
| 0000037120 | 36FF | 042A | 468D | 16DC | 9A50 | 3A8C | 0000 | C483 |
| 0000037140 | 3D08 | 0000 | 0374 | 0FE9 | 8E00 | 1406 | 2610 | 3E83 |
| 0000037160 | 3C97 | 7500 | E903 | 003B | 681E | 04AC | 468D | 16E8 |
| 0000037200 | 8D50 | DC46 | 5016 | 468D | 16F6 | 6850 | 0172 | 681E |
| 0000037220 | 04B0 | 36FF | 0428 | 36FF | 0426 | 36FF | 042C | 36FF |
| 0000037240 | 042A | D59A | 003A | 8300 | 1EC4 | 4689 | 89F6 | F856 |

THU MAR 14 17:34:20 1991 FL.DLL PAGE 18, LINE 1004

| | | | | | | | | |
|---|---|---|---|---|---|---|---|---|
| 0000037260 | 08E9 | 2B00 | 89C0 | F846 | 4689 | 8BF6 | 0646 | 568B |
| 0000037300 | A308 | 15E2 | 1689 | 15E4 | 068E | 1012 | 8326 | 763E |
| 0000037320 | 003A | 0375 | 09E9 | 8300 | E07E | 74FE | E903 | 000F |
| 0000037340 | 068E | 1014 | 8326 | A23E | 003A | 0375 | 39E9 | 8D00 |
| 0000037360 | E846 | 5016 | 468D | 16F6 | 8D50 | DC46 | 5016 | 681E |
| 0000037400 | 04B0 | 7768 | FF01 | 2836 | FF04 | 2636 | FF04 | 2C36 |
| 0000037420 | FF04 | 2A36 | 9A04 | 3BA8 | 0000 | C483 | C71A | E246 |
| 0000037440 | 0000 | 06E9 | E900 | 0003 | 00E9 | 5E00 | 835F | 02ED |
| 0000037460 | E58B | 5D1F | CB4D | 581E | 4590 | 8B55 | 1EEC | D88E |
| 0000037500 | EC81 | 002C | 5657 | 46C7 | D3FA | 8C04 | FC5E | 46C7 |
| 0000037520 | 01EC | 2B01 | 89C0 | DE46 | 4689 | 8EDC | 1606 | 2610 |
| 0000037540 | 3E83 | 3BF4 | 7500 | E903 | 001D | 36FF | 04E8 | 36FF |
| 0000037560 | 04E6 | 468D | 16D4 | 9A50 | 3C0A | 0000 | C483 | 3D08 |
| 0000037600 | 0000 | 0374 | 0FE9 | 8E00 | 1806 | 2610 | 3E83 | 3E36 |
| 0000037620 | 7500 | E903 | 003A | 681E | 04DA | 468D | 16E0 | 8D50 |
| 0000037640 | D446 | 5016 | 468D | 16F2 | 6A50 | 1E56 | F268 | FF04 |
| 0000037660 | E436 | FF04 | E236 | FF04 | E836 | FF04 | E636 | 9A04 |
| 0000037700 | 3C53 | 0000 | C483 | 891E | F246 | 5689 | E9F4 | 0008 |
| 0000037720 | C02B | 4689 | 89F4 | F246 | 46C7 | 00F0 | 8D00 | EE46 |
| 0000037740 | 5016 | FF9A | 00FF | 8900 | F046 | 7E83 | 00F0 | 0374 |
| 0000037760 | 0DE9 | 8D00 | F646 | 5016 | FF9A | 00FF | 8900 | F046 |
| 0000040000 | 7E83 | 00F0 | 0374 | 5EE9 | C400 | 065E | C726 | 1407 |
| 0000040020 | 6805 | 020E | 76FF | FF08 | 0676 | 681E | 15EA | 669A |
| 0000040040 | EB8A | 833D | 0AC4 | 06C7 | 15E6 | 15EA | 1E8C | 15E8 |
| 0000040060 | 006A | 016A | 76FF | FFF8 | F676 | 0668 | 683B | FFFF |
| 0000040100 | 76FF | 68EE | 0514 | 006A | 006A | FF9A | 00FF | A300 |
| 0000040120 | 04EA | 1689 | 04EC | ECA1 | 0B04 | EA06 | 7404 | E903 |
| 0000040140 | 0005 | 46C7 | 4CF0 | 8E04 | 1606 | 2610 | 3E83 | 3D12 |
| 0000040160 | 7500 | E903 | 0009 | 7E83 | FED8 | 0374 | 0FE9 | 8E0C |
| 0000040200 | 1806 | 2610 | 3E83 | 3C20 | 7500 | E903 | 0050 | 468B |
| 0000040220 | 89F0 | DA46 | 76FF | FFDE | DC76 | 468D | 16DA | FF50 |
| 0000040240 | EC76 | 76FF | FFFC | FA76 | 4E8D | 16E0 | 8D51 | F24E |
| 0000040260 | 5116 | 4E8D | 16D4 | 1E51 | F268 | 6A04 | FF71 | E436 |
| 0000040300 | FF04 | E236 | FF04 | E836 | FF04 | E636 | 9A04 | 366A |
| 0000040320 | 0000 | C483 | 8B28 | DA46 | 09E9 | E900 | 0006 | 468B |
| 0000040340 | E9F0 | 0000 | 5F5E | ED83 | 8B02 | 1FE5 | 4D5D | 1ECB |
| 0000040360 | 9058 | 5545 | EC8B | 8E1E | 81D8 | 08EC | 5700 | 1E56 |
| 0000040400 | FAB8 | 8E03 | 8BD8 | 0E46 | 71E9 | 8B03 | 1046 | 568B |
| 0000040420 | A312 | 04EA | 1689 | 04EC | E6A1 | 8B15 | E816 | 0515 |
| 0000040440 | 0004 | D00B | 0375 | 1AE9 | FF00 | 1276 | 76FF | A110 |
| 0000040460 | 15E6 | 168B | 15E8 | 0405 | 5200 | 9A50 | FFFF | 0000 |
| 0000040500 | 4689 | A1FA | 15E6 | 168B | 15E8 | 6905 | 0B00 | 75D0 |
| 0000040520 | E903 | 001D | 76FF | FF12 | 1076 | 1668 | A105 | 15E6 |
| 0000040540 | 168B | 15E8 | 6905 | 5200 | 9A50 | FFFF | 0000 | 4689 |
| 0000040560 | FFFA | E836 | FF15 | E636 | 6A15 | 9A01 | 077B | 40D1 |
| 0000040600 | C483 | B806 | 0000 | 00BA | E900 | 0334 | 006A | 016A |
| 0000040620 | 76FF | FF12 | 1076 | 681E | 0500 | E6A1 | 8B15 | E816 |
| 0000040640 | 0515 | 0004 | 5052 | 006A | 206A | FF9A | 00FF | B800 |
| 0000040660 | 0000 | 00BA | E900 | 0308 | 468B | E90A | 0129 | 76FF |
| 0000040700 | FF12 | 1076 | 1568 | 6805 | 0124 | 006A | 006A | 006A |
| 0000040720 | 006A | 1A9A | 0040 | 3D00 | 0001 | 0374 | 0EE9 | 8300 |
| 0000040740 | 00FA | 0374 | 06E9 | B800 | 0001 | 03E9 | B800 | 0000 |
| 0000040760 | 1EC4 | 15E6 | 8926 | 0247 | 46C7 | 02FC | E900 | 0116 |
| 0000041000 | 1EC4 | 15E6 | 8326 | 34BF | 0101 | C01B | D8F7 | 1EC4 |
| 0000041020 | 15E6 | 8926 | 3487 | C401 | E61E | 2615 | BF83 | 0134 |
| 0000041040 | 1B01 | 25C0 | 0001 | 0C05 | 8900 | FC46 | E7E9 | C400 |
| 0000041060 | E61E | 2615 | 87C7 | 013E | 0000 | 46C7 | 03FC | E900 |
| 0000041100 | 00D4 | 1EC4 | 15E6 | C726 | 3E87 | 0101 | C700 | FC46 |
| 0000041120 | 0004 | C1E9 | FF00 | 1276 | 76FF | 6810 | 051F | 2468 |

THU MAR 14 17:34:20 1991 FL.DLL PAGE 19, LINE 1063

| | | | | | | | | |
|---|---|---|---|---|---|---|---|---|
| 0000041140 | 6A01 | 6A00 | 6A00 | 6A00 | 9A00 | 405D | 0000 | 013D |
| 0000041160 | 7400 | E903 | 000E | FA83 | 7400 | E903 | 0006 | 01B8 |
| 0000041200 | E900 | 0003 | 00B8 | C400 | E61E | 2615 | 8789 | 0142 |
| 0000041220 | 46C7 | 09FC | E900 | 007E | 76FF | FF12 | 1076 | 2068 |
| 0000041240 | 6805 | 0124 | 006A | 006A | 006A | 006A | FF9A | 00FF |
| 0000041260 | 3D00 | 0001 | 0374 | 0EE9 | 8300 | 00FA | 0374 | 06E9 |
| 0000041300 | B800 | 0001 | 03E9 | B800 | 0000 | 1EC4 | 15E6 | 8926 |
| 0000041320 | 4087 | C701 | FC46 | 000A | 3BE9 | B800 | 0000 | 00BA |
| 0000041340 | E900 | 01DC | 2FE9 | 2D00 | 0515 | 0D3D | 7600 | E903 |
| 0000041360 | FFE9 | E0D1 | 2E93 | A7FF | 40AA | 3F6E | 408B | 408B |
| 0000041400 | 3FB0 | 408B | 408B | 408B | 408B | 408B | 408B | 4005 |
| 0000041420 | 4048 | 3FDF | 3FF2 | 36FF | 15E8 | 36FF | 15E6 | F19A |
| 0000041440 | E447 | 834D | 04C4 | 36FF | 15E8 | 36FF | 15E6 | 76FF |
| 0000041460 | 9AFC | 077B | 3DD1 | C483 | B806 | 0000 | 00BA | E900 |
| 0000041500 | 017E | 468B | E90A | 0091 | 46C7 | 05FC | E900 | 00D2 |
| 0000041520 | 46C7 | 06FC | E900 | 00CA | 46C7 | 07FC | E900 | 00C2 |
| 0000041540 | 46C7 | 08FC | E900 | 00BA | 46C7 | 0BFC | E900 | 00B2 |
| 0000041560 | 46C7 | 0EFC | E900 | 00AA | 46C7 | 0FFC | E900 | 00A2 |
| 0000041600 | 46C7 | 10FC | E900 | 009A | 36FF | 15E8 | 36FF | 15E6 |
| 0000041620 | 116A | 7B9A | E607 | 8341 | 06C4 | 4689 | 83F8 | F87E |
| 0000041640 | 7400 | E903 | 0024 | 76FF | FF12 | 1076 | 006A | FF9A |
| 0000041660 | 00FF | FF00 | 1276 | 76FF | 9A10 | FFFF | 0000 | 00B8 |
| 0000041700 | BA00 | 0000 | F9E9 | E900 | 0009 | 00B8 | BA00 | 0000 |
| 0000041720 | EDE9 | E900 | 004C | 49E9 | 3D00 | 051B | 0375 | 7FE9 |
| 0000041740 | 76FF | E903 | 001D | 7548 | E903 | FF94 | 7548 | E903 |
| 0000041760 | FF96 | 172D | 7505 | E903 | FF4E | 7548 | E903 | FF50 |
| 0000042000 | D0E9 | 2DFF | 051C | 0375 | 4DE9 | 2DFF | 0007 | 0375 |
| 0000042020 | 55E9 | 48FF | 0375 | 57E9 | 48FF | 0375 | 59E9 | E9FF |
| 0000042040 | FFB1 | 7E83 | 11FC | 0375 | 23E9 | FF00 | E836 | FF15 |
| 0000042060 | E636 | 9A15 | 47F1 | 41F9 | C483 | FF04 | E836 | FF15 |
| 0000042100 | E636 | FF15 | FC76 | 7B9A | 1E07 | 8342 | 06C4 | 00B8 |
| 0000042120 | BA00 | 0000 | 69E9 | 8100 | 0A7E | 8004 | 0374 | 12E9 |
| 0000042140 | FF00 | E836 | FF15 | E636 | 6A15 | 9A11 | 077B | 3F2E |
| 0000042160 | C483 | E906 | 002D | 2AE9 | E900 | 0027 | 202D | 7500 |
| 0000042200 | E903 | FEBE | 7548 | E903 | FFCD | 7548 | E903 | FCFC |
| 0000042220 | 0E2D | 7500 | E903 | FD20 | 0B2D | 7500 | E903 | FC6B |
| 0000042240 | D3E9 | FFFF | 1276 | 76FF | FF10 | 0E76 | 76FF | FF0C |
| 0000042260 | 0A76 | 76FF | FF08 | 0676 | FF9A | 00FF | E900 | 0000 |
| 0000042300 | 5E1F | 835F | 02ED | E58B | 5D1F | CA4D | 000E | 581E |
| 0000042320 | 4590 | 8B55 | 1EEC | D88E | EC81 | 0000 | 5657 | EAB8 |
| 0000042340 | 8C15 | E9DA | 0000 | 5F5E | ED83 | 8B02 | 1FE5 | 4D5D |
| 0000042360 | 1ECB | 9058 | 5545 | EC8B | 8E1E | 81D8 | 56EC | 5700 |
| 0000042400 | C756 | FA46 | 0519 | 5E8C | C7FC | C246 | 0000 | C02B |
| 0000042420 | 4689 | 89B4 | B246 | 068E | 1016 | 8326 | 1E3E | 003E |
| 0000042440 | 0375 | 1DE9 | FF00 | E836 | FF04 | E636 | 8D04 | AA46 |
| 0000042460 | 5016 | 289A | 003D | 8300 | 08C4 | 003D | 7400 | E903 |
| 0000042500 | 000F | 068E | 1018 | 8326 | 3E3E | 003D | 0375 | 3BE9 |
| 0000042520 | 1E00 | 1D68 | 8D05 | B646 | 5016 | 468D | 16AA | 8D50 |
| 0000042540 | F646 | 5016 | 6C68 | 1E01 | 5668 | FF05 | E436 | FF04 |
| 0000042560 | E236 | FF04 | E836 | FF04 | E636 | 9A04 | 3D70 | 0000 |
| 0000042600 | C483 | 891E | F646 | 5689 | E9F8 | 0008 | C02B | 4689 |
| 0000042620 | 89F8 | F646 | 468B | 8B06 | 0856 | BF1E | 15EA | F08B |
| 0000042640 | 071E | DA8E | 07B9 | F301 | 1FA5 | 36FF | 04EC | 36FF |
| 0000042660 | 04EA | 1568 | 6805 | 0125 | 5EC4 | 2606 | 478B | 2B02 |
| 0000042700 | 52D2 | 6A50 | 6A00 | 9A00 | 43B6 | 0000 | 36FF | 04EC |
| 0000042720 | 36FF | 04EA | 1768 | 8B05 | 0646 | 568B | 0508 | 00CE |
| 0000042740 | 5052 | 119A | 0044 | FF00 | EC36 | FF04 | EA36 | 6804 |
| 0000042760 | 0518 | 2568 | C401 | 065E | 8B26 | 3487 | 2B01 | 52D2 |
| 0000043000 | 6A50 | 6A00 | 9A00 | 3F83 | 0000 | 5EC4 | 2606 | BF80 |

THU MAR 14 17:34:20 1991 FL.DLL PAGE 20, LINE 1122

| | | | | | | | | |
|---|---|---|---|---|---|---|---|---|
| 0000043020 | 0144 | 7500 | E903 | 0023 | 468B | 8B06 | 0856 | 4405 |
| 0000043040 | 5201 | 1E50 | 2168 | 1E05 | 2768 | 8D05 | C446 | 5016 |
| 0000043060 | 0C9A | FB83 | 8343 | 10C4 | 15E9 | 1E00 | 2D68 | 1E05 |
| 0000043100 | 3368 | 8D05 | C446 | 5016 | 0C9A | 4583 | 8344 | 0CC4 |
| 0000043120 | 36FF | 04EC | 36FF | 04EA | 1D68 | 8D05 | C446 | 5016 |
| 0000043140 | 5B9A | 0044 | C400 | 065E | FF26 | 3CB7 | C401 | 065E |
| 0000043160 | FF26 | 3AB7 | C401 | 065E | FF26 | 38B7 | C401 | 065E |
| 0000043200 | FF26 | 36B7 | 1E01 | 3668 | 1E05 | 4068 | 8D05 | C446 |
| 0000043220 | 5016 | 0C9A | 4583 | 8341 | 14C4 | 36FF | 04EC | 36FF |
| 0000043240 | 04EA | 1E68 | 8D05 | C446 | 5016 | 1A9A | 003F | FF00 |
| 0000043260 | EC36 | FF04 | EA36 | 6804 | 0521 | 2568 | C401 | 065E |
| 0000043300 | 8326 | 3EBF | 0101 | C01B | D8F7 | D22B | 5052 | 006A |
| 0000043320 | 006A | B59A | 0044 | FF00 | EC36 | FF04 | EA36 | 6804 |
| 0000043340 | 0522 | 2568 | C401 | 065E | 8326 | 3EBF | 0101 | 0374 |
| 0000043360 | 06E9 | B800 | 0001 | 03E9 | B800 | 0000 | D22B | 5052 |
| 0000043400 | 006A | 006A | D89A | 0044 | FF00 | EC36 | FF04 | EA36 |
| 0000043420 | 6804 | 0520 | 2568 | C401 | 065E | 8B26 | 4087 | 2B01 |
| 0000043440 | 52D2 | 6A50 | 6A00 | 9A00 | 44FB | 0000 | 36FF | 04EC |
| 0000043460 | 36FF | 04EA | 1F68 | 6805 | 0125 | 5EC4 | 2606 | 878B |
| 0000043500 | 0142 | D22B | 5052 | 006A | 006A | 789A | 0043 | 8E00 |
| 0000043520 | 1606 | 2610 | [illegible]83 | 42CD | 7500 | E903 | 0009 | 7E83 |
| 0000043540 | FEAE | 0374 | 0FE9 | 8E00 | 1806 | 2610 | 3E83 | 42F9 |
| 0000043560 | 7500 | E903 | 0039 | 468D | 16B6 | 8D50 | F646 | 5016 |
| 0000043600 | 468D | 16AA | 1E50 | 5668 | 6805 | 019F | 36FF | 04E4 |
| 0000043620 | 36FF | 04E2 | 36FF | 04E8 | 36FF | 04E6 | C69A | 003C |
| 0000043640 | 8300 | 1AC4 | 46C7 | 00B0 | E900 | 0006 | 03E9 | E900 |
| 0000043660 | 0000 | 5F5E | ED83 | 8B02 | 1FE5 | 4D5D | 1ECB | 9058 |
| 0000043700 | 5545 | EC8B | 8E1E | 81D8 | 24EC | 5700 | C756 | FA46 |
| 0000043720 | 0566 | 5E8C | C7FC | F446 | 0000 | C02B | 4689 | 89E6 |
| 0000043740 | E446 | 068E | 1016 | 8326 | 353E | 0046 | 0375 | 1DE9 |
| 0000043760 | FF00 | E836 | FF04 | E636 | 8D04 | DC46 | 5016 | E39A |
| 0000044000 | 0042 | 8300 | 08C4 | 003D | 7400 | E903 | 000F | 068E |
| 0000044020 | 1018 | 8326 | 4D3E | 0046 | 0375 | 3BE9 | 1E00 | 6A68 |
| 0000044040 | 8D05 | E846 | 5016 | 468D | 16DC | 8D50 | F646 | 5016 |
| 0000044060 | B468 | 1E01 | 6E68 | FF05 | E436 | FF04 | E236 | FF04 |
| 0000044100 | E836 | FF04 | E636 | 9A04 | 432C | 0000 | C483 | 891E |
| 0000044120 | F646 | 5689 | E9F8 | 0008 | C02B | 4689 | 89F8 | F646 |
| 0000044140 | 36FF | 04EC | 36FF | 04EA | 1568 | 6805 | 0125 | 468B |
| 0000044160 | 2B06 | 52D2 | 6A50 | 6A00 | 9A00 | 4483 | 0000 | 068E |
| 0000044200 | 1016 | 8326 | 063E | 0045 | 0375 | 09E9 | 8300 | E07E |
| 0000044220 | 74FE | E903 | 000F | 068E | 1018 | 8326 | 1E3E | 0045 |
| 0000044240 | 0375 | 39E9 | 8D00 | E846 | 5016 | 468D | 16F6 | 8D50 |
| 0000044260 | DC46 | 5016 | 681E | 056E | BC68 | FF01 | E436 | FF04 |
| 0000044300 | E236 | FF04 | E836 | FF04 | E636 | 9A04 | 454D | 0000 |
| 0000044320 | C483 | C71A | E246 | 0000 | 06E9 | E900 | 0003 | 00E9 |
| 0000044340 | 5E00 | 835F | 02ED | E58B | 5D1F | CB4D | 581E | 4590 |
| 0000044360 | 8B55 | 1EEC | D88E | EC81 | 0000 | 5657 | 36FF | 04EC |
| 0000044400 | 36FF | 04EA | 1568 | 9A05 | 46D2 | 0000 | 5052 | 76FF |
| 0000044420 | 9A06 | 46DC | 0000 | 36FF | 04EC | 36FF | 04EA | 1868 |
| 0000044440 | 9A05 | 46EC | 0000 | 5052 | 76FF | 9A06 | 46F6 | 0000 |
| 0000044460 | 36FF | 04EC | 36FF | 04EA | 1968 | 9A05 | 4706 | 0000 |
| 0000044500 | 5052 | 76FF | 9A06 | 4710 | 0000 | 36FF | 04EC | 36FF |
| 0000044520 | 04EA | 1A68 | 9A05 | 4720 | 0000 | 5052 | 76FF | 9A06 |
| 0000044540 | 472A | 0000 | 36FF | 04EC | 36FF | 04EA | 1C68 | 9A05 |
| 0000044560 | 473A | 0000 | 5052 | 76FF | 9A06 | 4744 | 0000 | 36FF |
| 0000044600 | 04EC | 36FF | 04EA | 1B68 | 9A05 | 4754 | 0000 | 5052 |
| 0000044620 | 76FF | 9A06 | 475E | 0000 | 36FF | 04EC | 36FF | 04EA |
| 0000044640 | 2168 | 9A05 | 476E | 0000 | 5052 | 76FF | 9A06 | 4778 |
| 0000044660 | 0000 | 36FF | 04EC | 36FF | 04EA | 2268 | 9A05 | 4788 |

THU MAR 14 17:34:20 1991 FL.DLL PAGE 21, LINE 1181

| | | | | | | | | |
|---|---|---|---|---|---|---|---|---|
| 0000044700 | 0000 | 5052 | 76FF | 9A06 | 4792 | 0000 | 36FF | 04EC |
| 0000044720 | 36FF | 04EA | 2368 | 9A05 | 47A2 | 0000 | 5052 | 76FF |
| 0000044740 | 9A06 | 47AC | 0000 | 36FF | 04EC | 36FF | 04EA | 2468 |
| 0000044760 | 9A05 | 47BC | 0000 | 5052 | 76FF | 9A06 | 47C6 | 0000 |
| 0000045000 | 36FF | 04EC | 36FF | 04EA | 2568 | 9A05 | 47D5 | 0000 |
| 0000045020 | 5052 | 76FF | 9A06 | 47DF | 0000 | 36FF | 04EC | 36FF |
| 0000045040 | 04EA | 016A | FF9A | 00FF | 5200 | FF50 | 0676 | FF9A |
| 0000045060 | 00FF | E900 | 0000 | 5F5E | ED83 | 8B02 | 1FE5 | 4D5D |
| 0000045100 | 1ECB | 9058 | 5545 | EC8B | 8E1E | 81D8 | 28EC | 5700 |
| 0000045120 | C756 | FA46 | 057D | 5E8C | C7FC | F246 | 0101 | C02B |
| 0000045140 | 4689 | 89E2 | E046 | 068E | 1016 | 8326 | D23E | 0048 |
| 0000045160 | 0375 | 1DE9 | FF00 | E836 | FF04 | E636 | 8D04 | D846 |
| 0000045200 | 5016 | AF9A | 0045 | 8300 | 08C4 | 003D | 7400 | E903 |
| 0000045220 | 000F | 068E | 1018 | 8326 | EA3E | 0048 | 0375 | 3BE9 |
| 0000045240 | 1E00 | 8468 | 8D05 | E646 | 5016 | 468D | 16D8 | 8D50 |
| 0000045260 | F646 | 5016 | ED68 | 1E01 | 8C68 | FF05 | E436 | FF04 |
| 0000045300 | E236 | FF04 | E836 | FF04 | E636 | 9A04 | 45F8 | 0000 |
| 0000045320 | C483 | 891E | F646 | 5689 | E9F8 | 0008 | C02B | 4689 |
| 0000045340 | 89F8 | F646 | 46C7 | 00F4 | FF00 | EC36 | FF04 | EA36 |
| 0000045360 | 6804 | 0517 | 1F6A | 468B | 8B06 | 0856 | CE05 | 5200 |
| 0000045400 | 9A50 | FFFF | 0000 | 4689 | 83E4 | E47E | 7400 | E903 |
| 0000045420 | 0009 | 5EC4 | 2606 | 87C6 | 00CE | 8E00 | 1606 | 2610 |
| 0000045440 | 3E83 | 4599 | 7500 | E903 | 0009 | 7E83 | FEDC | 0374 |
| 0000045460 | 0FE9 | 8E00 | 1806 | 2610 | 3E83 | 45C5 | 7500 | E903 |
| 0000045500 | 0051 | 468B | 89F4 | DE46 | 76FF | FFE2 | E076 | 468D |
| 0000045520 | 16DE | FF50 | F276 | 76FF | FFFC | FA76 | 4E8D | 16E6 |
| 0000045540 | 8D51 | F64E | 5116 | 4E8D | 16D8 | 1E51 | 8C68 | 6805 |
| 0000045560 | 01FC | 36FF | 04E4 | 36FF | 04E2 | 36FF | 04E8 | 36FF |
| 0000045600 | 04E6 | 7E9A | 003E | 8300 | 28C4 | 468B | E9DE | 0009 |
| 0000045620 | 06E9 | 8B00 | F446 | 00E9 | 5E00 | 835F | 02ED | E58B |
| 0000045640 | 5D1F | CB4D | 581E | 4590 | 8B55 | 1EEC | D88E | EC81 |
| 0000045660 | 0000 | 5657 | EAA1 | 8B04 | EC16 | E904 | 0000 | 5F5E |
| 0000045700 | ED83 | 8B02 | 1FE5 | 4D5D | 1ECB | 9058 | 5545 | EC8B |
| 0000045720 | 8E1E | 81D8 | 2CEC | 5700 | C756 | FA46 | 059F | 5E8C |
| 0000045740 | C7FC | EC46 | 0101 | C02B | 4689 | 89DE | DC46 | 068E |
| 0000045760 | 1016 | 8326 | 8D3E | 004A | 0375 | 1DE9 | FF00 | E836 |
| 0000046000 | FF04 | E636 | 8D04 | D446 | 5016 | 339A | 0048 | 8300 |
| 0000046020 | 08C4 | 003D | 7400 | E903 | 000F | 068E | 1018 | 8326 |
| 0000046040 | A53E | 004A | 0375 | 3BE9 | 1E00 | A668 | 8D05 | E046 |
| 0000046060 | 5016 | 468D | 16D4 | 8D50 | F246 | 5016 | 2968 | 1E02 |
| 0000046100 | AE68 | FF05 | E436 | FF04 | E236 | FF04 | E836 | FF04 |
| 0000046120 | E636 | 9A04 | 487C | 0000 | C483 | 891E | F246 | 5689 |
| 0000046140 | E9F4 | 0008 | C02B | 4689 | 89F4 | F246 | 46C7 | 00F0 |
| 0000046160 | 8D00 | EE46 | 5016 | 939A | 003D | 8900 | F046 | 7E83 |
| 0000046200 | 00F0 | 0374 | 39E9 | 6A00 | 6A00 | FF01 | EC36 | FF04 |
| 0000046220 | EA36 | 6804 | 43E3 | FF68 | FFFF | EE76 | 4068 | FF06 |
| 0000046240 | 0876 | 76FF | 9A06 | 3DFB | 0000 | 4689 | 89F6 | F856 |
| 0000046260 | 468B | 0BF8 | F646 | 0374 | 05E9 | C700 | F046 | 0005 |
| 0000046300 | 7E83 | 00F0 | 0374 | 0DE9 | 8B00 | F646 | 568B | A3F8 |
| 0000046320 | 04EE | 1689 | 04F0 | 068E | 1016 | 8326 | 1D3E | 0048 |
| 0000046340 | 0375 | 09E9 | 8300 | D87E | 74FE | E903 | 000F | 068E |
| 0000046360 | 1018 | 8326 | 493E | 0048 | 0375 | 51E9 | 8B00 | F046 |
| 0000046400 | 4689 | FFDA | DE76 | 76FF | 8DDC | DA46 | 5016 | 76FF |
| 0000046420 | FFEC | FC76 | 76FF | 8DFA | E04E | 5116 | 4E8D | 16F2 |
| 0000046440 | 8D51 | D44E | 5116 | 681E | 05AE | 3F68 | FF02 | E436 |
| 0000046460 | FF04 | E236 | FF04 | E836 | FF04 | E636 | 9A04 | 4933 |
| 0000046500 | 0000 | C483 | 8B28 | DA46 | 09E9 | E900 | 0006 | 468B |
| 0000046520 | E9F0 | 0000 | 5F5E | ED83 | 8B02 | 1FE5 | 4D5D | 1ECB |
| 0000046540 | 9058 | 5545 | EC8B | 8E1E | 81D8 | 00EC | 5700 | 1E56 |

THU MAR 14 17:34:20 1991 FL.DLL PAGE 22, LINE 1240

| | | | | | | | | |
|---|---|---|---|---|---|---|---|---|
| 0000046560 | B1B8 | 8E3E | 8BD8 | 0E46 | 5FE9 | FF00 | 1276 | 76FF |
| 0000046600 | 6810 | 0641 | 76FF | FF08 | 0676 | 939A | 0043 | B800 |
| 0000046620 | 0000 | 00BA | E900 | 0079 | 006A | 016A | 76FF | FF12 |
| 0000046640 | 1076 | 681E | 05BF | 681E | 05BE | 006A | 206A | 5B9A |
| 0000046660 | 003F | B800 | 0000 | 00BA | E900 | 0055 | C19A | 4423 |
| 0000046700 | FF4A | 1276 | 76FF | 6A10 | 9A00 | 415F | 0000 | 00B8 |
| 0000046720 | BA00 | 0000 | 3AE9 | E900 | 001A | 202D | 7500 | E903 |
| 0000046740 | FFDA | 4848 | 0375 | AFE9 | 2DFF | 0019 | 0375 | 8AE9 |
| 0000046760 | E9FF | 0000 | 76FF | FF12 | 1076 | 76FF | FF0E | 0C76 |
| 0000047000 | 76FF | FF0A | 0876 | 76FF | 9A06 | 4269 | 0000 | 00E9 |
| 0000047020 | 1F00 | 5F5E | ED83 | 8B02 | 1FE5 | 4D5D | 0ECA | 1E00 |
| 0000047040 | 9058 | 5545 | EC8B | 8E1E | 81D8 | 24EC | 5700 | C756 |
| 0000047060 | FA46 | 05D8 | 5E8C | C7FC | F446 | 0000 | C02B | 4689 |
| 0000047100 | 89E6 | E446 | 068E | 1016 | 8326 | 883E | 004C | 0375 |
| 0000047120 | 1DE9 | FF00 | E836 | FF04 | E636 | 8D04 | DC46 | 5016 |
| 0000047140 | BB9A | 0049 | 8300 | 08C4 | 003D | 7400 | E903 | 000F |
| 0000047160 | 068E | 1018 | 8326 | A03E | 004C | 0375 | 3BE9 | 1E00 |
| 0000047200 | DC68 | 8D05 | E846 | 5016 | 468D | 16DC | 8D50 | F646 |
| 0000047220 | 5016 | 8368 | 1E02 | E068 | FF05 | E436 | FF04 | E236 |
| 0000047240 | FF04 | E836 | FF04 | E636 | 9A04 | 4A04 | 0000 | C483 |
| 0000047260 | 891E | F646 | 5689 | E9F8 | 0008 | C02B | 4689 | 89F8 |
| 0000047300 | F646 | 36FF | 04F0 | 36FF | 04EE | 006A | 7A9A | 004B |
| 0000047320 | 8E00 | 1606 | 2610 | 3E83 | 49A5 | 7500 | E903 | 0009 |
| 0000047340 | 7E83 | FEE0 | 0374 | 0FE9 | 8E00 | 1806 | 2610 | 3E83 |
| 0000047360 | 49D1 | 7500 | E903 | 0039 | 468D | 16E8 | 8D50 | F646 |
| 0000047400 | 5016 | 468D | 16DC | 1E50 | E068 | 6805 | 0288 | 36FF |
| 0000047420 | 04E4 | 36FF | 04E2 | 36FF | 04E8 | 36FF | 04E6 | 7C9A |
| 0000047440 | 0046 | 8300 | 1AC4 | 46C7 | 00E2 | E900 | 0006 | 03E9 |
| 0000047460 | E900 | 0000 | 5F5E | ED83 | 8B02 | 1FE5 | 4D5D | 00CB |
| 0000047500 | 581E | 4590 | 8B55 | 1EEC | D88E | EC81 | 0028 | 5657 |
| 0000047520 | 46C7 | 03FA | 8C06 | FC5E | 46C7 | 01F0 | 2B01 | 89C0 |
| 0000047540 | E246 | 4689 | 8EE0 | 1A06 | 2610 | 3E83 | 4BFB | 7500 |
| 0000047560 | E903 | 001D | 36FF | 0618 | 36FF | 0616 | 468D | 16D8 |
| 0000047600 | 9A50 | 4C11 | 0000 | C483 | 3D08 | 0000 | 0374 | 0FE9 |
| 0000047620 | 8E00 | 1C06 | 2610 | 3E83 | 4E28 | 7500 | E903 | 003A |
| 0000047640 | 681E | 060A | 468D | 16E4 | 8D50 | D846 | 5016 | 468D |
| 0000047660 | 16F6 | 6A50 | 1E55 | 1A68 | FF06 | 1436 | FF06 | 1236 |
| 0000047700 | FF06 | 1836 | FF06 | 1636 | 9A06 | 4C5A | 0000 | C483 |
| 0000047720 | 891E | F646 | 5689 | E9F8 | 0008 | C02B | 4689 | 89F8 |
| 0000047740 | F646 | 46C7 | 00F4 | 8D00 | F246 | 5016 | 279A | 004A |
| 0000047760 | 8900 | F446 | 7E83 | 00F4 | 0374 | 5CE9 | C400 | 065E |
| 0000050000 | C726 | A407 | 6806 | 01A4 | 76FF | FF08 | 0676 | 681E |
| 0000050020 | 1800 | 669A | DD8A | 834D | 0AC4 | 06C7 | 17F8 | 1800 |
| 0000050040 | 1E8C | 17FA | 006A | 016A | 006A | 016A | 6F68 | 684B |
| 0000050060 | FFFF | 76FF | 68F2 | 06A4 | 006A | 006A | 569A | 004A |
| 0000050100 | A300 | 17FC | 1689 | 17FE | FEA1 | 0B17 | FC06 | 7417 |
| 0000050120 | E903 | 0005 | 46C7 | 4CF4 | 8E04 | 1A06 | 2610 | 3E83 |
| 0000050140 | 4D1C | 7500 | E903 | 0009 | 7E83 | FEDC | 0374 | 0FE9 |
| 0000050160 | 8E00 | 1C06 | 2610 | 3E83 | 4C27 | 7500 | E903 | 0050 |
| 0000050200 | 468B | 89F4 | DE46 | 76FF | FFE2 | E076 | 468D | 16DE |
| 0000050220 | FF50 | F076 | 76FF | FFFC | FA76 | 4E8D | 16E4 | 8D51 |
| 0000050240 | F64E | 5116 | 4E8D | 16D8 | 1E51 | 1A68 | 6A06 | FF6D |
| 0000050260 | 1436 | FF06 | 1236 | FF06 | 1836 | FF06 | 1636 | 9A06 |
| 0000050300 | 4AEE | 0000 | C483 | 8B28 | DE46 | 09E9 | E900 | 0006 |
| 0000050320 | 468B | E9F4 | 0000 | 5F5E | ED83 | 8B02 | 1FE5 | 4D5D |
| 0000050340 | 1ECB | 9058 | 5545 | EC8B | 8E1E | 81D8 | 08EC | 5700 |
| 0000050360 | 1E56 | 21B8 | 8E4B | 8BD8 | 0E46 | 34E9 | 8B02 | 1046 |
| 0000050400 | 568B | A312 | 17FC | 1689 | 17FE | F8A1 | 8B17 | FA16 |
| 0000050420 | 0517 | 0002 | D00B | 0375 | 1AE9 | FF00 | 1276 | 76FF |

THU MAR 14 17:34:20 1991 FL.DLL PAGE 23, LINE 1299

| | | | | | | | | |
|---|---|---|---|---|---|---|---|---|
| 0000050440 | A110 | 17F8 | 168B | 17FA | 0205 | 5200 | 9A50 | 3EEC |
| 0000050460 | 0000 | 4689 | A1F8 | 17F8 | 168B | 17FA | 6705 | 0B00 |
| 0000050500 | 75D0 | E903 | 001D | 76FF | FF12 | 1076 | A568 | A106 |
| 0000050520 | 17F8 | 168B | 17FA | 6705 | 5200 | 9A50 | 4B3B | 0000 |
| 0000050540 | 4689 | FFF8 | FA36 | FF17 | F836 | 9A17 | 5156 | 4F30 |
| 0000050560 | C483 | FF04 | FA36 | FF17 | F836 | 6A17 | 9A01 | 330A |
| 0000050600 | 4F6D | C483 | B806 | 0000 | 00BA | E900 | 01E7 | 006A |
| 0000050620 | 016A | 76FF | FF12 | 1076 | 681E | 0628 | F8A1 | 8B17 |
| 0000050640 | FA16 | 0517 | 0002 | 5052 | 006A | 206A | 5F9A | 004B |
| 0000050660 | B800 | 0000 | 00BA | E900 | 01BB | 639A | BE26 | 894F |
| 0000050700 | FC46 | 7E83 | 00FC | 0375 | 09E9 | B800 | 0000 | 00BA |
| 0000050720 | E900 | 01A1 | 468B | E90A | 003F | 1EC4 | 17F8 | C726 |
| 0000050740 | 3A87 | 0001 | E900 | 004A | 1EC4 | 17F8 | C726 | 3A87 |
| 0000050760 | 0101 | E900 | 003C | 1EC4 | 17F8 | C726 | 3C87 | 0101 |
| 0000051000 | FF00 | FA36 | FF17 | F836 | 6A17 | 9A09 | 330A | 4FEE |
| 0000051020 | C483 | E906 | 001C | 19E9 | 2D00 | 06A8 | 0375 | B9E9 |
| 0000051040 | 48FF | 0375 | C1E9 | 2DFF | 0008 | 0375 | C7E9 | E9FF |
| 0000051060 | 0000 | 00B8 | BA00 | 0000 | 3AE9 | 9A01 | 2663 | 5038 |
| 0000051100 | 4689 | 83FC | FC7E | 7500 | E903 | 0009 | 00B8 | BA00 |
| 0000051120 | 0000 | 20E9 | 8B01 | 0A46 | 59E9 | C700 | FA46 | 000B |
| 0000051140 | 74E9 | C700 | FA46 | 000E | 6CE9 | C700 | FA46 | 000F |
| 0000051160 | 64E9 | C700 | FA46 | 0010 | 5CE9 | FF00 | FA36 | FF17 |
| 0000051200 | F836 | 6A17 | 9A11 | 330A | 4DC5 | C483 | FF06 | 1276 |
| 0000051220 | 76FF | 6A10 | 9A00 | 4C7D | 0000 | 76FF | FF12 | 1076 |
| 0000051240 | 6A9A | 0041 | B800 | 0000 | 00BA | E900 | 00C7 | 26E9 |
| 0000051260 | E900 | 0023 | 7548 | E903 | FFB9 | 7548 | E903 | FFBB |
| 0000051300 | AC2D | 7506 | E903 | FF93 | 7548 | E903 | FF95 | 7548 |
| 0000051320 | E903 | FF97 | D7E9 | 83FF | FA7E | 7511 | E903 | 0023 |
| 0000051340 | 36FF | 17FA | 36FF | 17F8 | B19A | AE53 | 8350 | 04C4 |
| 0000051360 | 36FF | 17FA | 36FF | 17F8 | 76FF | 9AFA | 330A | 50D3 |
| 0000051400 | C483 | B806 | 0000 | 00BA | E900 | 0069 | 7E81 | 040A |
| 0000051420 | 7480 | E903 | 0012 | 36FF | 17FA | 36FF | 17F8 | 116A |
| 0000051440 | 0A9A | 1E33 | 834F | 06C4 | 2DE9 | E900 | 002A | 27E9 |
| 0000051460 | 2D00 | 0020 | 0375 | 02E9 | 48FF | 0375 | CDE9 | 48FF |
| 0000051500 | 0375 | 49E9 | 2DFE | 000E | 0375 | 6DE9 | 2DFE | 000B |
| 0000051520 | 0375 | A8E9 | E9FD | FFD3 | 76FF | FF12 | 1076 | 76FF |
| 0000051540 | FF0E | 0C76 | 76FF | FF0A | 0876 | 76FF | 9A06 | 4BBA |
| 0000051560 | 0000 | 00E9 | 1F00 | 5F5E | ED83 | 8B02 | 1FE5 | 4D5D |
| 0000051600 | 0ECA | 1E00 | 9058 | 5545 | EC8B | 8E1E | 81D8 | 00EC |
| 0000051620 | 5700 | B856 | 1800 | DA8C | 00E9 | 5E00 | 835F | 02ED |
| 0000051640 | E58B | 5D1F | CB4D | 581E | 4590 | 8B55 | 1EEC | D88E |
| 0000051660 | EC81 | 0056 | 5657 | 46C7 | 41FA | 8C06 | FC5E | 46C7 |
| 0000051700 | 00C2 | 2B00 | 89C0 | B446 | 4689 | 8EB2 | 1A06 | 2610 |
| 0000051720 | 3E83 | 534A | 7500 | E903 | 001D | 36FF | 0618 | 36FF |
| 0000051740 | 0616 | 468D | 16AA | 9A50 | 4D32 | 0000 | C483 | 3D08 |
| 0000051760 | 0000 | 0374 | 0FE9 | 8E00 | 1C06 | 2610 | 3E83 | 5362 |
| 0000052000 | 7500 | E903 | 003B | 681E | 0645 | 468D | 16B6 | 8D50 |
| 0000052020 | AA46 | 5016 | 468D | 16F6 | 6850 | 0142 | 681E | 0656 |
| 0000052040 | 36FF | 0614 | 36FF | 0612 | 36FF | 0618 | 36FF | 0616 |
| 0000052060 | 7A9A | 004D | 8300 | 1EC4 | 4689 | 89F6 | F856 | 08E9 |
| 0000052100 | 2B00 | 89C0 | F846 | 4689 | C4F6 | 065E | 8026 | 3EBF |
| 0000052120 | 0001 | 0375 | 23E9 | 8B00 | 0646 | 568B | 0508 | 013E |
| 0000052140 | 5052 | 681E | 0649 | 681E | 064F | 468D | 16C4 | 9A50 |
| 0000052160 | 830C | 509B | C483 | E910 | 0004 | 46C6 | 00C4 | 36FF |
| 0000052200 | 17FE | 36FF | 17FC | A768 | 8D06 | C446 | 5016 | 3F9A |
| 0000052220 | 0053 | FF00 | FE36 | FF17 | FC36 | 6817 | 06AA | 5EC4 |
| 0000052240 | 2606 | B7FF | 0132 | 016A | 739A | 0052 | FF00 | FE36 |
| 0000052260 | FF17 | FC36 | 6817 | 06AB | 5EC4 | 2606 | B7FF | 0134 |
| 0000052300 | 016A | 8D9A | 0052 | FF00 | FE36 | FF17 | FC36 | 6817 |

THU MAR 14 17:34:20 1991 FL.DLL PAGE 24, LINE 1358

| | | | | | | | | |
|---|---|---|---|---|---|---|---|---|
| 0000052320 | 06AC | 5EC4 | 2606 | B7FF | 0136 | 016A | A79A | 0052 |
| 0000052340 | FF00 | FE36 | FF17 | FC36 | 6817 | 06AD | 5EC4 | 2606 |
| 0000052360 | B7FF | 0138 | 016A | FF9A | 00FF | FF00 | FE36 | FF17 |
| 0000052400 | FC36 | 6817 | 06A8 | 2568 | C401 | 065E | 8326 | 3ABF |
| 0000052420 | 0101 | C01B | D8F7 | D22B | 5052 | 006A | 006A | 019A |
| 0000052440 | 0053 | FF00 | FE36 | FF17 | FC36 | 6817 | 06A9 | 2568 |
| 0000052460 | C401 | 065E | 8326 | 3ABF | 0101 | 0374 | 06E9 | B800 |
| 0000052500 | 0001 | 03E9 | B800 | 0000 | D22B | 5052 | 006A | 006A |
| 0000052520 | 249A | 0053 | FF00 | FE36 | FF17 | FC36 | 6817 | 06B1 |
| 0000052540 | 2568 | C401 | 065E | 8B26 | 3C87 | 2B01 | 52D2 | 6A50 |
| 0000052560 | 6A00 | 9A00 | 462A | 0000 | 36FF | 17FE | 36FF | 17FC |
| 0000052600 | A668 | 8B06 | 0646 | 568B | 0508 | 00CC | 5052 | 0C9A |
| 0000052620 | 004F | 8E00 | 1A06 | 2610 | 3E83 | 4E10 | 7500 | E903 |
| 0000052640 | 0009 | 7E83 | FEAE | 0374 | 0FE9 | 8E00 | 1C06 | 2610 |
| 0000052660 | 3E83 | 4D48 | 7500 | E903 | 0039 | 468D | 16B6 | 8D50 |
| 0000052700 | F646 | 5016 | 468D | 16AA | 1E50 | 5668 | 6806 | 0165 |
| 0000052720 | 36FF | 0614 | 36FF | 0612 | 36FF | 0618 | 36FF | 0616 |
| 0000052740 | CF9A | 004C | 8300 | 1AC4 | 46C7 | 00B0 | E900 | 0006 |
| 0000052760 | 03E9 | E900 | 0000 | 5F5E | ED83 | 8B02 | 1FE5 | 4D5D |
| 0000053000 | 1ECB | 9058 | 5545 | EC8B | 8E1E | 81D8 | 2AEC | 5700 |
| 0000053020 | C756 | FA46 | 0666 | 5E8C | C7FC | F246 | 0101 | C02B |
| 0000053040 | 4689 | 89E2 | E046 | 068E | 101A | 8326 | 823E | 0051 |
| 0000053060 | 0375 | 1DE9 | FF00 | 1836 | FF06 | 1636 | 8D06 | D846 |
| 0000053100 | 5016 | 989A | 0051 | 8300 | 08C4 | 003D | 7400 | E903 |
| 0000053120 | 000F | 068E | 101C | 8326 | AE3E | 0051 | 0375 | 3BE9 |
| 0000053140 | 1E00 | 6D68 | 8D06 | E646 | 5016 | 468D | 16D8 | 8D50 |
| 0000053160 | F646 | 5016 | 7268 | 1E01 | 7468 | FF06 | 1436 | FF06 |
| 0000053200 | 1236 | FF06 | 1836 | FF06 | 1636 | 9A06 | 51E1 | 0000 |
| 0000053220 | C483 | 891E | F646 | 5689 | E9F8 | 0008 | C02B | 4689 |
| 0000053240 | 89F8 | F646 | 46C7 | 00F4 | FF00 | FE36 | FF17 | FC36 |
| 0000053260 | 6817 | 06AA | 468B | 8B06 | 0856 | 3205 | 5201 | 6A50 |
| 0000053300 | 9A01 | 549B | 0000 | 4689 | 83D6 | D67E | 7500 | E903 |
| 0000053320 | 0020 | 36FF | 17FE | 36FF | 17FC | AB68 | 8B06 | 0646 |
| 0000053340 | 568B | 0508 | 0134 | 5052 | 016A | C49A | 0054 | 8900 |
| 0000053360 | D646 | 7E83 | 00D6 | 0375 | 20E9 | FF00 | FE36 | FF17 |
| 0000053400 | FC36 | 6817 | 06AC | 468B | 8B06 | 0856 | 3605 | 5201 |
| 0000053420 | 6A50 | 9A01 | 54ED | 0000 | 4689 | 83D6 | D67E | 7500 |
| 0000053440 | E903 | 0020 | 36FF | 17FE | 36FF | 17FC | AD68 | 8B06 |
| 0000053460 | 0646 | 568B | 0508 | 0138 | 5052 | 016A | FF9A | 00FF |
| 0000053500 | 8900 | D646 | 7E83 | 00D6 | 0374 | 08E9 | C700 | F446 |
| 0000053520 | 0005 | 32E9 | FF00 | FE36 | FF17 | FC36 | 6817 | 06A6 |
| 0000053540 | 326A | 468B | 8B06 | 0856 | CC05 | 5200 | 9A50 | 48B2 |
| 0000053560 | 0000 | 4689 | 83E4 | E47E | 7400 | E903 | 0009 | 5EC4 |
| 0000053600 | 2606 | 87C6 | 00CC | 8E00 | 1A06 | 2610 | 3E83 | 53DD |
| 0000053620 | 7500 | E903 | 0009 | 7E83 | FEDC | 0374 | 0FE9 | 8E00 |
| 0000053640 | 1C06 | 2610 | 3E83 | 5409 | 7500 | E903 | 0051 | 468B |
| 0000053660 | 89F4 | DE46 | 76FF | FFE2 | E076 | 468D | 16DE | FF50 |
| 0000053700 | F276 | 76FF | FFFC | FA76 | 4E8D | 16E6 | 8D51 | F64E |
| 0000053720 | 5116 | 4E8D | 16D8 | 1E51 | 7468 | 6806 | 0196 | 36FF |
| 0000053740 | 0614 | 36FF | 0612 | 36FF | 0618 | 36FF | 0616 | 709A |
| 0000053760 | 004E | 8300 | 28C4 | 468B | E9DE | 0009 | 06E9 | 8B00 |
| 0000054000 | F446 | 00E9 | 5E00 | 835F | 02ED | E58B | 5D1F | CB4D |
| 0000054020 | 581E | 4590 | 8B55 | 1EEC | D88E | EC81 | 0000 | 5657 |
| 0000054040 | FCA1 | 8B17 | FE16 | E917 | 0000 | 5F5E | ED83 | 8B02 |
| 0000054060 | 1FE5 | 4D5D | 00CB | 581E | 4590 | 8B55 | 1EEC | D88E |
| 0000054100 | EC81 | 002E | 5657 | 46C7 | 00DA | C700 | FC46 | 0000 |
| 0000054120 | 46C7 | 00D8 | E900 | 0003 | 46FF | 83D8 | FC7E | 7400 |
| 0000054140 | E903 | 003E | 468B | 39D8 | 0E46 | 037F | 33E9 | 8B00 |
| 0000054160 | D85E | E3C1 | C402 | 0A76 | 8B26 | 2600 | 508B | 0502 |

THU MAR 14 17:34:20 1991 FL.DLL PAGE 25, LINE 1417

| | | | | | | | | |
|---|---|---|---|---|---|---|---|---|
| 0000054200 | 0004 | 5052 | 76FF | FF08 | 0676 | 309A | 8380 | 8356 |
| 0000054220 | 08C4 | 003D | 7400 | E903 | 0005 | 46C7 | 01FC | E900 |
| 0000054240 | FFB6 | 7E83 | 00FC | 0375 | 1AE9 | 8B00 | D876 | E6C1 |
| 0000054260 | C402 | 0A5E | 8B26 | FC40 | 8B26 | FE50 | 4689 | 89D2 |
| 0000054300 | D456 | 51E9 | FF00 | 0876 | 76FF | 8D06 | DC46 | 5016 |
| 0000054320 | FA9A | 227F | 8352 | 08C4 | 76FF | FF12 | 1076 | 016A |
| 0000054340 | 468D | 16DC | 8D50 | D646 | 5016 | 468D | 16D2 | 9A50 |
| 0000054360 | FFFF | 0000 | 4689 | 83DA | DA7E | 7500 | E903 | 0016 |
| 0000054400 | 7E81 | ABDA | 7401 | E903 | 0006 | 10B8 | E900 | 0003 |
| 0000054420 | 01B8 | 8900 | DA46 | 7E83 | 00DA | 0374 | 14E9 | 8B00 |
| 0000054440 | D246 | 568B | 1ED4 | F08B | DA8E | 7EC4 | B914 | 002C |
| 0000054460 | A5F3 | 8B1F | DA46 | 00E9 | 5E00 | 835F | 02ED | E58B |
| 0000054500 | 5D1F | CB4D | 581E | 4590 | 8B55 | 1EEC | D88E | EC81 |
| 0000054520 | 002A | 5657 | 46C7 | 00D8 | FF00 | 0C76 | 76FF | 8D0A |
| 0000054540 | DA46 | 5016 | FA9A | 3D7F | 8356 | 08C4 | 76FF | FF08 |
| 0000054560 | 0676 | 016A | 468D | 16DA | 8D50 | D646 | 5016 | 468D |
| 0000054600 | 16FA | 9A50 | 56A0 | 0000 | 4689 | 83D8 | D87E | 7500 |
| 0000054620 | E903 | 001A | 7E81 | ABD8 | 7401 | E903 | 0008 | 46C7 |
| 0000054640 | 10D8 | E900 | 0005 | 46C7 | 01D8 | E900 | 0014 | 468B |
| 0000054660 | 8BFA | FC56 | 8B1E | 8EF0 | C4DA | 0E7E | 2CB9 | F300 |
| 0000054700 | 1FA5 | 468B | E9DB | 0000 | 5F5E | ED83 | 8B02 | 1FE5 |
| 0000054720 | 4D5D | 1ECB | 9058 | 5545 | EC8B | 8E1E | 81D8 | 24EC |
| 0000054740 | 5700 | C756 | FC46 | 0000 | 006A | 006A | 76FF | FF08 |
| 0000054760 | 0676 | 76FF | FF0C | 0A76 | 016A | E59A | 0034 | 8900 |
| 0000055000 | FC46 | 7E83 | 00FC | 0375 | 08E9 | C700 | FC46 | 0451 |
| 0000055020 | 43E9 | 8B00 | 0A46 | 568B | 050C | 0004 | 5052 | 468D |
| 0000055040 | 16DC | 9A50 | 7FFA | 5717 | C483 | 6A08 | 6A00 | FF00 |
| 0000055060 | 0876 | 76FF | 8D06 | DC46 | 5016 | 76FF | FF0C | 0A76 |
| 0000055100 | 139A | 0035 | 8900 | FC46 | 7E83 | 00FC | 0375 | 05E9 |
| 0000055120 | C700 | FC46 | 0001 | 468B | E9FC | 0000 | 5F5E | ED83 |
| 0000055140 | 8B02 | 1FE5 | 4D5D | 1ECB | 9058 | 5545 | EC8B | 8E1E |
| 0000055160 | 81D8 | 28EC | 5700 | C756 | FA46 | 06A0 | 5E8C | C7FC |
| 0000055200 | F046 | 0101 | C02B | 4689 | 89E2 | E046 | 068E | 101E |
| 0000055220 | 8326 | 3E3E | 0055 | 0375 | 1DE9 | FF00 | 9E36 | FF06 |
| 0000055240 | 9C36 | 8D06 | D346 | 5016 | F39A | 0053 | 8300 | 08C4 |
| 0000055260 | 003D | 7400 | E903 | 000F | 068E | 1020 | 8326 | 563E |
| 0000055300 | 0055 | 0375 | 3BE9 | 1E00 | A768 | 8D06 | E446 | 5016 |
| 0000055320 | 468D | 16D8 | 8D50 | F646 | 5016 | C468 | 1E00 | AE68 |
| 0000055340 | FF06 | 9A36 | FF06 | 9836 | FF06 | 9E36 | FF06 | 9C36 |
| 0000055360 | 9A06 | 543C | 0000 | C483 | 891E | F646 | 5689 | E9F8 |
| 0000055400 | 0008 | C02B | 4689 | 89F8 | F646 | 46C7 | 00F4 | C400 |
| 0000055420 | 065E | 8026 | 003F | 0374 | 08E9 | C700 | F446 | 0456 |
| 0000055440 | AFE9 | 8300 | 0E7E | 7400 | E903 | 0008 | 46C7 | 10F4 |
| 0000055460 | E900 | 009E | 7E83 | 0010 | 0375 | 4DE9 | C700 | F246 |
| 0000055500 | 0000 | 468B | 39F2 | 0E46 | 037F | 2AE9 | 8B00 | F246 |
| 0000055520 | E0C1 | 0305 | 0A46 | 568B | 520C | FF50 | 0876 | 76FF |
| 0000055540 | 9A06 | 8030 | 5961 | C483 | 3D08 | 0000 | 0375 | 06E9 |
| 0000055560 | FF00 | F246 | CBE9 | 8BFF | F246 | 4639 | 7E0E | E903 |
| 0000055600 | 0005 | 46C7 | 10F4 | E900 | 0048 | 468B | 480E | 4689 |
| 0000055620 | 83F2 | F27E | 7D00 | E903 | 002A | 468B | C1F2 | 05E0 |
| 0000055640 | 4603 | 8B0A | 0C56 | 5052 | 76FF | FF08 | 0676 | 309A |
| 0000055660 | D680 | 8357 | 08C4 | 003D | 7500 | E903 | 0006 | 4EFF |
| 0000055700 | E9F2 | FFCD | 7E83 | 00F2 | 037C | 05E9 | C700 | F446 |
| 0000055720 | 0010 | 7E83 | 00F4 | 0374 | 14E9 | 8B00 | 1446 | 460B |
| 0000055740 | 7512 | E903 | 0009 | 468B | C4F2 | 125E | 8926 | 8E07 |
| 0000055760 | 1E06 | 2610 | 3E83 | 5843 | 7500 | E903 | 0009 | 7E83 |
| 0000056000 | FEDC | 0374 | 0FE9 | 8E00 | 2006 | 2610 | 3E83 | 586F |
| 0000056020 | 7500 | E903 | 0051 | 468B | 89F4 | DE46 | 76FF | FFE2 |
| 0000056040 | E076 | 468D | 16DE | FF50 | F076 | 76FF | FFFC | FA76 |

THU MAR 14 17:34:20 1991 FL.DLL PAGE 26, LINE 1476

| | | | | | | | | |
|---|---|---|---|---|---|---|---|---|
| 0000056060 | 4E8D | 16E4 | 8D51 | F64E | 5116 | 4E8D | 16D8 | 1E51 |
| 0000056100 | AE68 | 6806 | 00EB | 36FF | 069A | 36FF | 0698 | 36FF |
| 0000056120 | 069E | 36FF | 069C | 9F9A | 0055 | 8300 | 28C4 | 468B |
| 0000056140 | E9DE | 0009 | 06E9 | 8B00 | F446 | 00E9 | 5E00 | 835F |
| 0000056160 | 02ED | E58B | 5D1F | CB4D | 581E | 4590 | 8B55 | 1EEC |
| 0000056200 | D88E | EC81 | 0028 | 5657 | 46C7 | C0FA | 8C06 | FC5E |
| 0000056220 | 46C7 | 01F0 | 2B01 | 89C0 | E246 | 4689 | 8EF0 | 1E06 |
| 0000056240 | 2610 | 3E83 | 5BC5 | 7500 | E903 | 001D | 36FF | 069E |
| 0000056260 | 36FF | 069C | 468D | 16D8 | 9A50 | 5859 | 0000 | C483 |
| 0000056300 | 3D08 | 0000 | 0374 | 0FE9 | 8E00 | 2006 | 2610 | 3E83 |
| 0000056320 | 5BDD | 7500 | E903 | 003B | 681E | 06C7 | 468D | 16E4 |
| 0000056340 | 8D50 | D846 | 5016 | 468D | 16F6 | 6850 | 00FD | 681E |
| 0000056360 | 06CE | 36FF | 069A | 36FF | 0698 | 36FF | 069E | 36FF |
| 0000056400 | 069C | A29A | 0058 | 8300 | 1EC4 | 4689 | 89F6 | F856 |
| 0000056420 | 08E9 | 2B00 | 89C0 | F846 | 4689 | C7F6 | F446 | 0000 |
| 0000056440 | 5EC4 | 2606 | 3F80 | 7400 | E903 | 0008 | 46C7 | 56F4 |
| 0000056460 | E904 | 00BD | 7E83 | 000E | 0374 | 08E9 | C700 | F446 |
| 0000056500 | 0010 | ACE9 | 8300 | 107E | 7500 | E903 | 0054 | 46C7 |
| 0000056520 | 00F2 | 8B00 | F246 | 4639 | 7F0E | E903 | 0031 | 5E8B |
| 0000056540 | C1F2 | 02E3 | 76C4 | 260A | 008B | 8B26 | 0250 | 0405 |
| 0000056560 | 5200 | FF50 | 0876 | 76FF | 9A06 | 8030 | 5B80 | C483 |
| 0000056600 | 3D08 | 0000 | 0375 | 06E9 | FF00 | F246 | C4E9 | 8BFF |
| 0000056620 | F246 | 4639 | 7E0E | E903 | 0005 | 46C7 | 10F4 | E900 |
| 0000056640 | 004F | 468B | 480E | 4689 | 83F2 | F27E | 7D00 | E903 |
| 0000056660 | 0031 | 5E8B | C1F2 | 02E3 | 76C4 | 260A | 008B | 8B26 |
| 0000056700 | 0250 | 0405 | 5200 | FF50 | 0876 | 76FF | 9A06 | 8030 |
| 0000056720 | 5914 | C483 | 3D08 | 0000 | 0375 | 06E9 | FF00 | F24E |
| 0000056740 | C6E9 | 83FF | F27E | 7C00 | E903 | 0005 | 46C7 | 10F4 |
| 0000056760 | 8300 | F47E | 7400 | E903 | 0014 | 468B | 0B14 | 1246 |
| 0000057000 | 0375 | 09E9 | 8B00 | F246 | 5EC4 | 2612 | 0789 | 068E |
| 0000057020 | 101E | 8326 | A63E | 0059 | 0375 | 09E9 | 8300 | DC7E |
| 0000057040 | 74FE | E903 | 000F | 068E | 1020 | 8326 | BE3E | 0059 |
| 0000057060 | 0375 | 51E9 | 8B00 | F446 | 4689 | FFDE | E276 | 76FF |
| 0000057100 | 8DE0 | DE46 | 5016 | 76FF | FFF0 | FC76 | 76FF | 8DFA |
| 0000057120 | E44E | 5116 | 4E8D | 16F6 | 8D51 | D84E | 5116 | 681C |
| 0000057140 | 06CE | 2668 | FF01 | 9A36 | FF06 | 9836 | FF06 | 9E36 |
| 0000057160 | FF06 | 9C36 | 9A06 | 5A07 | 0000 | C483 | 8828 | DE46 |
| 0000057200 | 09E9 | E900 | 0006 | 468B | E9F4 | 0000 | 5F5E | ED83 |
| 0000057220 | 8B02 | 1FE5 | 4D5D | 1ECB | 9058 | 5545 | EC8B | 8E1E |
| 0000057240 | 81D8 | 2AEC | 5700 | C756 | FA46 | 06E5 | 5E8C | C7FC |
| 0000057260 | F246 | 0101 | C02B | 4689 | 89E4 | E246 | 068E | 101E |
| 0000057300 | 8326 | 3E3E | 005D | 0375 | 1DE9 | FF00 | 9E36 | FF06 |
| 0000057320 | 9C36 | 8D06 | DA46 | 5016 | 6A9A | 005A | 8300 | 08C4 |
| 0000057340 | 003D | 7400 | E903 | 000F | 068E | 1020 | 8326 | 563E |
| 0000057360 | 005D | 0375 | 3BE9 | 1E00 | EC68 | 8D06 | E646 | 5016 |
| 0000057400 | 468D | 16DA | 8D50 | F646 | 5016 | 3E68 | 1E01 | F468 |
| 0000057420 | FF06 | 9A36 | FF06 | 9836 | FF06 | 9E36 | FF06 | 9C36 |
| 0000057440 | 9A06 | 5AB3 | 0000 | C483 | 891E | F646 | 5689 | E9F8 |
| 0000057460 | 0008 | C02B | 4689 | 89F8 | F646 | 46C7 | 00F4 | 8B00 |
| 0000057500 | 0846 | 5EC4 | 260A | 4789 | 2B58 | 89C0 | D846 | 4689 |
| 0000057520 | FFD6 | 0676 | 76FF | FF0C | 0A76 | 5A6A | 468D | 16D6 |
| 0000057540 | 9A50 | FFFF | 0000 | 4689 | 83F4 | F47E | 7400 | E903 |
| 0000057560 | 000A | 5EC4 | 26D6 | 478B | 8914 | F446 | 76FF | FFD8 |
| 0000057600 | D676 | FF9A | 00FF | 8E00 | 1E06 | 2610 | 3E83 | 5A54 |
| 0000057620 | 7500 | E903 | 0009 | 7E83 | FEDE | 0374 | 0FE9 | 8E00 |
| 0000057640 | 2006 | 2610 | 3E83 | 5A80 | 7500 | E903 | 0051 | 468B |
| 0000057660 | 89F4 | E046 | 76FF | FFE4 | E276 | 468D | 16E0 | FF50 |
| 0000057700 | F276 | 76FF | FFFC | FA76 | 4E8D | 16E6 | 8D51 | F64E |
| 0000057720 | 5116 | 4E8D | 16DA | 1E51 | F468 | 6806 | 0152 | 36FF |

THU MAR 14 17:34:20 1991 FL.DLL PAGE 27, LINE 1535

| | | | | | | | | |
|---|---|---|---|---|---|---|---|---|
| 0000057740 | 069A | 36FF | 0698 | 36FF | 069E | 36FF | 069C | 269A |
| 0000057760 | 005C | 8300 | 28C4 | 468B | E9E0 | 0009 | 06E9 | 8B00 |
| 0000060000 | F446 | 00E9 | 5E00 | 835F | 02ED | E58B | 5D1F | CB4D |
| 0000060020 | 581E | 4590 | 8B55 | 1EEC | D88E | EC81 | 0084 | 5657 |
| 0000060040 | 46C7 | 04FA | 8C07 | FC5E | 46C7 | 01F2 | 2B01 | 89C0 |
| 0000060060 | E446 | 4689 | 8EE2 | 1E06 | 2610 | 3E83 | 5EBB | 7500 |
| 0000060100 | E903 | 001D | 36FF | 069E | 36FF | 069C | 468D | 16DA |
| 0000060120 | 9A50 | 5C89 | 0000 | C483 | 3D08 | 0000 | 0374 | 0FE9 |
| 0000060140 | 8E00 | 2006 | 2610 | 3E83 | 5ED3 | 7500 | E903 | 003B |
| 0000060160 | 681E | 070B | 468D | 16E6 | 8D50 | DA46 | 5016 | 468D |
| 0000060200 | 16F6 | 6850 | 0168 | 681E | 0712 | 36FF | 069A | 36FF |
| 0000060220 | 0698 | 36FF | 069E | 36FF | 069C | D29A | 005C | 8300 |
| 0000060240 | 1EC4 | 4689 | 89F6 | F856 | 08E9 | 2B00 | 89C0 | F846 |
| 0000060260 | 4689 | C7F6 | F446 | 0000 | 468B | 8906 | D846 | 46C6 |
| 0000060300 | 0084 | C02B | 8689 | FF7E | 8689 | FF7C | 326A | 468D |
| 0000060320 | 1680 | 6A50 | 8D5A | 7C86 | 16FF | 9A50 | 5D12 | 0000 |
| 0000060340 | 4689 | 83F4 | F47E | 7400 | E903 | 000B | 9EC4 | FF7C |
| 0000060360 | 8B26 | 1447 | 4689 | FFF4 | 7EB6 | FFFF | 7CB6 | 9AFF |
| 0000060400 | 5D33 | 0000 | 068E | 101E | 8326 | 733E | 005C | 0375 |
| 0000060420 | 09E9 | 8300 | DE7E | 74FE | E903 | 000F | 068E | 1020 |
| 0000060440 | 8326 | 9F3E | 005C | 0375 | 51E9 | 8B00 | F446 | 4689 |
| 0000060460 | FFE0 | E476 | 76FF | 8DE2 | E046 | 5016 | 76FF | FFF2 |
| 0000060500 | FC76 | 76FF | 8DFA | E64E | 5116 | 4E8D | 16F6 | 8D51 |
| 0000060520 | DA4E | 5116 | 681E | 0712 | 7E68 | FF01 | 9A36 | FF06 |
| 0000060540 | 9836 | FF06 | 9E36 | FF06 | 9C36 | 9A06 | 5D9F | 0000 |
| 0000060560 | C483 | 8B28 | E046 | 09E9 | E900 | 0006 | 468B | E9F4 |
| 0000060600 | 0000 | 5F5E | ED83 | 8B02 | 1FE5 | 4D5D | 1ECB | 9058 |
| 0000060620 | 5545 | EC8B | 8E1E | 81D8 | 2AEC | 5700 | C756 | FA46 |
| 0000060640 | 0722 | 5E8C | C7FC | F246 | 0101 | C02B | 4689 | 89E4 |
| 0000060660 | E246 | 068E | 101E | 8326 | 293E | 0060 | 0375 | 1DE9 |
| 0000060700 | FF00 | 9E36 | FF06 | 9C36 | 8D06 | DA46 | 5016 | 029A |
| 0000060720 | 005E | 8300 | 08C4 | 003D | 7400 | E903 | 000F | 068E |
| 0000060740 | 1020 | 8326 | 413E | 0060 | 0375 | 3BE9 | 1E00 | 2968 |
| 0000060760 | 8D07 | E646 | 5016 | 468D | 16DA | 8D50 | F646 | 5016 |
| 0000061000 | 9568 | 1E01 | 3068 | FF07 | 9A36 | FF06 | 9836 | FF06 |
| 0000061020 | 9E36 | FF06 | 9C36 | 9A06 | 5E4B | 0000 | C483 | 891E |
| 0000061040 | F646 | 5689 | E9F8 | 0008 | C02B | 4689 | 89F8 | F646 |
| 0000061060 | 46C7 | 00F4 | 2B0D | 89C0 | D846 | 4689 | FFD6 | 0676 |
| 0000061100 | 468D | 1608 | 6A50 | 8D02 | D646 | 5016 | 8C9A | 005E |
| 0000061120 | 8900 | F446 | 7E83 | 00F4 | 0374 | 0AE9 | C400 | D65E |
| 0000061140 | 8B26 | 1447 | 4689 | FFF4 | D876 | 76FF | 9AD6 | 5EB0 |
| 0000061160 | 0000 | 068E | 101E | 8326 | EC3E | 005D | 0375 | 09E9 |
| 0000061200 | 8300 | DE7E | 74FE | E903 | 000F | 068E | 1020 | 8326 |
| 0000061220 | 183E | 005E | 0375 | 51E9 | 8B00 | F446 | 4689 | FFE0 |
| 0000061240 | E476 | 76FF | 8DE2 | E046 | 5016 | 76FF | FFF2 | FC76 |
| 0000061260 | 76FF | 8DFA | E64E | 5116 | 4E8D | 16F6 | 8D51 | DA4E |
| 0000061300 | 5116 | 681E | 0730 | A868 | FF01 | 9A36 | FF06 | 9836 |
| 0000061320 | FF06 | 9E36 | FF06 | 9C36 | 9A06 | 5F1C | 0000 | C483 |
| 0000061340 | 8B28 | ED46 | 09E9 | E900 | 0006 | 468B | E9F4 | 0000 |
| 0000061360 | 5F5E | ED83 | 8B02 | 1FE5 | 4D5D | 1ECB | 9058 | 5545 |
| 0000061400 | EC8B | 8E1E | 81D8 | 2AEC | 5700 | C756 | FA46 | 0741 |
| 0000061420 | 5E8C | C7FC | F246 | 0101 | C02B | 4689 | 89E4 | E246 |
| 0000061440 | 068E | 101E | 8326 | 963E | 0061 | 0375 | 1DE9 | FF00 |
| 0000061460 | 9E36 | FF06 | 9C36 | 8D06 | DA46 | 5016 | 7F9A | 005F |
| 0000061500 | 8300 | 08C4 | 003D | 7400 | E903 | 000F | 068E | 1020 |
| 0000061520 | 8326 | AE3E | 0061 | 0375 | 3BE9 | 1E00 | 4868 | 8D07 |
| 0000061540 | E646 | 5016 | 468D | 16DA | 8D50 | F646 | 5016 | BE68 |
| 0000061560 | 1E01 | 5068 | FF07 | 9A36 | FF06 | 9836 | FF06 | 9E36 |
| 0000061600 | FF06 | 9C36 | 9A06 | 5FC8 | 0000 | C483 | 891E | F646 |

THU MAR 14 17:34:20 1991 FL.DLL PAGE 28, LINE 1594

| | | | | | | | | |
|---|---|---|---|---|---|---|---|---|
| 0000061620 | 5689 | E9F8 | 0008 | C02B | 4689 | 89F8 | F646 | 46C7 |
| 0000061640 | 00F4 | 2B00 | 89C0 | D846 | 4689 | FFD6 | 0676 | 006A |
| 0000061660 | 006A | 006A | 468D | 16D6 | 9A50 | 5FFD | 0000 | 4689 |
| 0000061700 | 83F4 | F47E | 7400 | E903 | 000A | 5EC4 | 26D6 | 478B |
| 0000061720 | 8914 | F446 | 76FF | FFD8 | D676 | 1E9A | 0060 | 8E00 |
| 0000061740 | 1E06 | 2610 | 3E83 | 5F69 | 7500 | E903 | 0009 | 7E83 |
| 0000061760 | FEDE | 0374 | 0FE9 | 8E00 | 2006 | 2610 | 3E83 | 5F95 |
| 0000062000 | 7500 | E903 | 0051 | 468B | 89F4 | E046 | 76FF | FFE4 |
| 0000062020 | E276 | 468D | 16E0 | FF50 | F276 | 76FF | FFFC | FA76 |
| 0000062040 | 4E8D | 16E6 | 8D51 | F64E | 5116 | 4E8D | 16DA | 1E51 |
| 0000062060 | 5068 | 6807 | 01CE | 36FF | 069A | 36FF | 0698 | 36FF |
| 0000062100 | 069E | 36FF | 069C | 8A9A | 0060 | 8300 | 28C4 | 468B |
| 0000062120 | E9E0 | 0009 | 06E9 | 8B00 | F446 | 00E9 | 5E00 | 835F |
| 0000062140 | 02ED | E58B | 5D1F | CB4D | 581E | 4590 | 8B55 | 1EEC |
| 0000062160 | D88E | EC81 | 002A | 5657 | 46C7 | 5FFA | 8C07 | FC5E |
| 0000062200 | 46C7 | 01EE | 2B01 | 89C0 | E046 | 4689 | 8EDE | 1E06 |
| 0000062220 | 2610 | 3E83 | 62C7 | 7500 | E903 | 001D | 36FF | 069E |
| 0000062240 | 36FF | 069C | 468D | 16D6 | 9A50 | 60ED | 0000 | C483 |
| 0000062260 | 3D08 | 0000 | 0374 | 0FE9 | 8E00 | 2006 | 2610 | 3E83 |
| 0000062300 | 6352 | 7500 | E903 | 003B | 681E | 0766 | 468D | 16E2 |
| 0000062320 | 8D50 | D646 | 5016 | 468D | 16F2 | 6850 | 01DB | 681E |
| 0000062340 | 0782 | 36FF | 069A | 36FF | 0698 | 36FF | 069E | 36FF |
| 0000062360 | 069C | 369A | 0061 | 8300 | 1EC4 | 4689 | 89F2 | F456 |
| 0000062400 | 08E9 | 2B00 | 89C0 | F446 | 4689 | C7F2 | F046 | 0000 |
| 0000062420 | 068E | 101E | 8326 | 3A3E | 0063 | 0375 | 48E9 | 8300 |
| 0000062440 | DA7E | 75FE | E903 | 003F | 76FF | 1E06 | 6D68 | 8D07 |
| 0000062460 | E246 | 5016 | 468D | 16F2 | 8D50 | D646 | 5016 | 681E |
| 0000062500 | 0782 | E268 | FF01 | 9A36 | FF06 | 9836 | FF06 | 9E36 |
| 0000062520 | FF06 | 9C36 | 1E06 | 7A68 | 6807 | 3405 | 0868 | 9A34 |
| 0000062540 | 340B | 0000 | C483 | 9A28 | 4954 | 5B2C | 4689 | 89F6 |
| 0000062560 | F856 | 76FF | FFF8 | F676 | 76FF | 9A06 | FFFF | 0000 |
| 0000062600 | 4689 | 8EF0 | 1E06 | 2610 | 3E83 | 60D7 | 7500 | E903 |
| 0000062620 | 0009 | 7E83 | FEDA | 0374 | 0FE9 | 8E00 | 2006 | 2610 |
| 0000062640 | 3E83 | 6103 | 7500 | E903 | 0051 | 468B | 89F0 | DC46 |
| 0000062660 | 76FF | FFE0 | DE76 | 468D | 16DC | FF50 | EE76 | 76FF |
| 0000062700 | FFFC | FA76 | 4E8D | 16E2 | 8D51 | F24E | 5116 | 4E8D |
| 0000062720 | 16D6 | 1E51 | 8268 | 6807 | 01E8 | 36FF | 069A | 36FF |
| 0000062740 | 0698 | 36FF | 069E | 36FF | 069C | F79A | 0061 | 8300 |
| 0000062760 | 28C4 | 468B | E9DC | 0009 | 06E9 | 8B00 | F046 | 00E9 |
| 0000063000 | 5E00 | 835F | 02ED | E58B | 5D1F | CB4D | 0000 | 0000 |
| 0000063020 | 0000 | 0000 | 0000 | 0000 | 0000 | 0000 | 8B55 | 1EEC |
| 0000063040 | 9668 | 1E07 | 9A68 | 9A07 | FFFF | 0000 | 068E | 0796 |
| 0000063060 | A126 | 0015 | D6A3 | BB07 | 07A0 | 1F8C | E5BE | 8319 |
| 0000063100 | FEE6 | 1E56 | FF9A | 00FF | 0B00 | 74C0 | 3304 | EBC0 |
| 0000063120 | 893A | 0477 | 894E | 9E36 | 8307 | 03EE | 04C7 | 0001 |
| 0000063140 | 7789 | 8906 | 0877 | C683 | C702 | FE04 | 89FF | 0A77 |
| 0000063160 | 681E | 0794 | 681E | 0792 | FF9A | 00FF | E800 | 0020 |
| 0000063200 | 909A | 1A66 | E863 | 0066 | 01B8 | 5D00 | 50CB | 4E9A |
| 0000063220 | 3366 | 9A64 | 67C8 | 6441 | FF68 | 9A00 | 6557 | 6446 |
| 0000063240 | BB1E | 000D | FF33 | 068E | 0794 | FFB9 | 267F | 3D80 |
| 0000063260 | 7500 | 4701 | 8026 | 003D | 3174 | B4BE | 8B07 | 8BD1 |
| 0000063300 | F3CB | 8BA6 | 74CA | 3308 | F2C0 | 74AE | EBE7 | 061C |
| 0000063320 | 071E | F78B | BF1F | 07DB | 2CAC | 7241 | C00E | 04E0 |
| 0000063340 | AC92 | 412C | 0572 | C20A | EBAA | 1FED | 00C3 | 02BB |
| 0000063360 | 5200 | D48B | A780 | 07DB | 50B7 | C48B | 1653 | 1650 |
| 0000063400 | 9A52 | FFFF | 0000 | C00B | 7558 | B110 | 3C40 | 7401 |
| 0000063420 | 3C06 | 7502 | B106 | 0808 | DB8F | 4B07 | D679 | E85A |
| 0000063440 | 0026 | 06BE | BF10 | 1006 | 5FE8 | BE01 | 1006 | 06BF |
| 0000063460 | E810 | 0156 | 06B8 | 3D10 | 100A | 0B74 | 016A | 680E |

THU MAR 14 17:34:20 1991 FL.DLL PAGE 29, LINE 1653

| | | | | | | | | |
|---|---|---|---|---|---|---|---|---|
| 0000063500 | 6529 | FF9A | 00FF | C300 | 0E8B | 0FFC | 2AE3 | 06C4 |
| 0000063520 | 0FFE | C28C | DB33 | 1EFF | 0FFA | 0373 | 61E9 | 8E01 |
| 0000063540 | 9A06 | 2607 | 1E8B | 0006 | 754B | C40D | 0206 | 8C10 |
| 0000063560 | BBC2 | 0003 | 1EFF | 0FFA | B8C3 | 4EA3 | D88E | EBA1 |
| 0000063600 | 0B09 | 75C0 | 0E10 | 58A1 | 0B0F | 75C0 | E805 | 001F |
| 0000063620 | 03EB | 24E8 | 6A00 | 6A03 | 6A00 | 9A00 | 64F3 | 0000 |
| 0000063640 | 8B55 | 33EC | EBC9 | 551A | EC8B | 01B9 | EB00 | 5512 |
| 0000063660 | EC8B | 5756 | 00B9 | EB01 | 5508 | EC8B | 5756 | 01B9 |
| 0000063700 | E801 | 004B | 0A51 | 75C9 | BE12 | 19D8 | D8BF | E819 |
| 0000063720 | 00B8 | 06BE | BF10 | 100A | AFE8 | BE00 | 100A | 0ABF |
| 0000063740 | E810 | 00A6 | 0ABE | BF10 | 100A | 9DE8 | E800 | 008C |
| 0000063760 | 0A58 | 75E4 | C713 | EB06 | 0109 | B800 | 0001 | 8A50 |
| 0000064000 | 0646 | 9A50 | FFFF | 0000 | 4EE8 | 5F00 | 5D5E | 55CB |
| 0000064020 | EC8B | 0D6A | 61E8 | 831C | 02C4 | 068E | 079A | 8B26 |
| 0000064040 | 061E | 4B00 | 168B | 09ED | FA83 | 75FF | 8904 | ED1E |
| 0000064060 | 3909 | ED1E | 9F09 | 0D6A | 67E8 | 831C | 02C4 | 749E |
| 0000064100 | 6A0A | E80E | 1C12 | C483 | EB02 | 3BC7 | 74D3 | 6A08 |
| 0000064120 | E80E | 1C24 | C483 | 5D02 | 55C3 | EC8B | 0D6A | 17E8 |
| 0000064140 | 831C | 02C4 | 06C7 | 09ED | FFFF | 0D6A | 33E8 | 831C |
| 0000064160 | 02C4 | 0E6A | 2BE8 | 831C | 02C4 | C35D | 0E8B | 0FFC |
| 0000064200 | 07E3 | 02BB | FF00 | FA1E | C30F | F73B | 0E73 | EF83 |
| 0000064220 | 8B04 | 0B05 | 0245 | F274 | 1DFF | EEEB | 00C3 | 8B55 |
| 0000064240 | B8EC | 00FC | 0E5D | 6FE8 | 8301 | F23E | 0009 | 0474 |
| 0000064260 | 1EFF | 09F0 | FFB8 | 5000 | E80E | 015C | E58B | CB5D |
| 0000064300 | 02B8 | E900 | FDC7 | 5A59 | DC8B | D82B | 0B72 | FB81 |
| 0000064320 | 0200 | 0572 | E38B | 5152 | 52CB | 3351 | E9C0 | FDAD |
| 0000064340 | 14C8 | 0000 | 5657 | FF2B | F78B | 3639 | 0794 | 0375 |
| 0000064360 | F0E9 | A100 | 0794 | C92B | 4E89 | 89F4 | F646 | 4E89 |
| 0000064400 | 89F8 | FA46 | 0C6A | 76FF | FFFA | F876 | 681E | 07B4 |
| 0000064420 | 9C9A | 0480 | 8367 | 0AC4 | C00B | 1A74 | 8146 | FFFE |
| 0000064440 | 767F | E903 | 00BD | 5EC4 | FFF8 | F846 | 8026 | 003F |
| 0000064460 | EA75 | EB47 | 900D | 5EC4 | FFF8 | F846 | 8026 | 003F |
| 0000064500 | F475 | 5E8B | 26F8 | 3F80 | 7500 | 8DB9 | 0145 | 6A50 |
| 0000064520 | 9A04 | 83DC | 6713 | C483 | 8904 | F046 | 5689 | 56F2 |
| 0000064540 | 3C9A | 497D | 8367 | 02C4 | 4689 | 89FC | FE56 | 468B |
| 0000064560 | 0BF2 | F046 | 6D74 | C28B | 460B | 74FC | 8B66 | F046 |
| 0000064600 | 568B | A3F2 | 09E1 | 1689 | 09E3 | 0C6A | 76FF | FFF6 |
| 0000064620 | F476 | 681E | 07B4 | 9C9A | 4E80 | 8364 | 0AC4 | C00B |
| 0000064640 | 2C74 | 468B | 8BFC | FE56 | 5EC4 | 83F0 | F046 | 2604 |
| 0000064660 | 0789 | 8926 | 0257 | 5EC4 | FFF4 | F446 | 8A26 | C407 |
| 0000064700 | FC5E | 46FF | 26FC | 0788 | C00A | 0E74 | E8EB | 5EC4 |
| 0000064720 | FFF4 | F446 | 8026 | 003F | F475 | 5EC4 | 26F4 | 3F80 |
| 0000064740 | 7500 | 5EA7 | C95F | 90CB | 8B55 | 56EC | B857 | 652A |
| 0000064760 | D88E | C08E | 568B | BE06 | 102C | 3BAD | 74C2 | 4010 |
| 0000065000 | 7496 | 970C | C033 | FFB9 | F2FF | 8BAE | EBF7 | 96EB |
| 0000065020 | 5E5F | E58B | CA5D | 0002 | 8B55 | 57EC | 76FF | 0E06 |
| 0000065040 | C5E8 | 0BFF | 74C0 | 921F | FA8B | C033 | FFB9 | F2FF |
| 0000065060 | F7AE | 49D1 | 8B50 | BBC4 | 0002 | 1E53 | 5152 | 5016 |
| 0000065100 | FF9A | 00FF | 5B00 | 8B5F | 5DE5 | 02CA | 0000 | 1601 |
| 0000065120 | 0202 | 0203 | 1804 | 0D05 | 0906 | 0C07 | 0C08 | 0C09 |
| 0000065140 | 070A | 080B | 160C | 160D | 020F | 0D10 | 1211 | 0212 |
| 0000065160 | 0235 | 0D41 | 0243 | 0D52 | 0D53 | 0D57 | 0B59 | 0D6C |
| 0000065200 | 206D | 1C70 | 0972 | 1606 | 0A80 | 0A81 | 0982 | 0D84 |
| 0000065220 | 0BA4 | 02CE | 0BD7 | 0D00 | 1608 | 8B52 | E8D8 | 1A42 |
| 0000065240 | 8E93 | 5AC2 | 8926 | 0247 | 8926 | B817 | FFFF | 8B99 |
| 0000065260 | 5DE5 | E8CB | 0008 | FFB8 | 99FF | E58B | CB5D | D88B |
| 0000065300 | 1FE8 | 931A | C28E | 8926 | 0247 | BB53 | 67FE | 24B9 |
| 0000065320 | 0A00 | 75E4 | 2E1B | 073A | 1674 | 4343 | F7E2 | 133C |
| 0000065340 | 0472 | 243C | 0A76 | 3C43 | 72BC | 3C04 | 76CA | 4301 |

THU MAR 14 17:34:20 1991 FL.DLL PAGE 30, LINE 1712

| | | | | | | | | |
|---|---|---|---|---|---|---|---|---|
| 0000065360 | 8A2E | 0147 | 5B98 | 8926 | C307 | 8B55 | BBEC | 0002 |
| 0000065400 | 05EB | 8B55 | 33EC | E8DB | 19D8 | C303 | CB5D | 8B55 |
| 0000065420 | 56EC | 8B57 | 0676 | 448A | A80A | 7483 | A85F | 7540 |
| 0000065440 | A85B | 7502 | 0C48 | 8801 | 0A44 | FE8B | EF81 | 09FA |
| 0000065460 | C781 | 0BDA | 0CA8 | 0D75 | 05F6 | 7501 | 1E08 | E856 |
| 0000065500 | 014E | C483 | 8B04 | 0644 | 0489 | 75FF | FF02 | 0874 |
| 0000065520 | 3350 | 8ADB | 0B5C | 0E53 | F5E8 | 8310 | 08C4 | C00B |
| 0000065540 | 1174 | FF3D | 75FF | 801A | 0A4C | EB20 | 800A | 0A4C |
| 0000065560 | EB20 | 8009 | 0A4C | C710 | 0444 | 0000 | FFB8 | EBFF |
| 0000065600 | 8A25 | DBBF | 8007 | 82E7 | FF80 | 7582 | 8A0B | 0A7C |
| 0000065620 | C7F6 | 7582 | 8003 | 200D | 8948 | 0444 | 1CC4 | C033 |
| 0000065640 | 8A26 | 4307 | 1C89 | 5E5F | CB5D | 8B55 | 56EC | 8B57 |
| 0000065660 | 0876 | 448A | A80A | 7482 | A864 | 7540 | C760 | 0444 |
| 0000065700 | 0000 | 01A8 | 0B74 | 10A8 | 5374 | 4C8B | 8906 | 240C |
| 0000065720 | 0CFE | 2402 | 88EF | 0A44 | FE8B | EF81 | 09FA | C781 |
| 0000065740 | 0BDA | DB33 | 5C8A | A80B | 7508 | A84B | 7504 | F618 |
| 0000065760 | 0105 | 4275 | FE81 | 0A06 | 0674 | FE81 | 0A12 | 2675 |
| 0000066000 | 87F6 | 07DB | 7440 | B91F | 0001 | 1651 | 7E8D | 5706 |
| 0000066020 | 0E53 | A3E8 | 8311 | 08C4 | 01B9 | EB00 | B846 | FFFF |
| 0000066040 | 4C80 | 200A | 65EB | 1E53 | E856 | 0064 | C483 | 5B04 |
| 0000066060 | 44F6 | 080A | D174 | 0C8B | 548B | 2B06 | 42CA | 1489 |
| 0000066100 | 558B | 4A02 | 5489 | E304 | 5125 | FF51 | 0874 | 74FF |
| 0000066120 | 5306 | E80E | 1162 | C483 | 5908 | 7CC4 | 8B06 | 0656 |
| 0000066140 | 8826 | 3B15 | 75C1 | 33B6 | 8AC0 | 0646 | 1DEB | C033 |
| 0000066160 | 87F6 | 07DB | 7420 | B9E3 | 0002 | 5051 | 5350 | E80E |
| 0000066200 | 0F60 | C483 | 3308 | 8BC0 | EBC8 | 5FCF | 5D5E | 00CB |
| 0000066220 | 8B55 | 56EC | 768B | B804 | 0200 | 9A50 | 7D3C | 66C3 |
| 0000066240 | 8B59 | 81DE | FAEB | 8109 | DAC3 | 0B0B | 74D2 | 800B |
| 0000066260 | 0A4C | C708 | 0247 | 0200 | 0EEB | 4C80 | 040A | 47C7 |
| 0000066300 | 0102 | 8C00 | 8DDA | 0147 | 5489 | 8902 | 8904 | 0854 |
| 0000066320 | 4489 | C706 | 0444 | 0000 | 5D5E | 00C3 | 04C8 | 0000 |
| 0000066340 | 468B | 0B08 | 0646 | 0875 | 006A | A7E8 | EB00 | 9031 |
| 0000066360 | 468B | 2D06 | 09FA | 0CB9 | 9900 | F9F7 | 4689 | 50FC |
| 0000066400 | 25E8 | 8317 | 02C4 | 76FF | FF08 | 0676 | D29A | 166A |
| 0000066420 | 836B | 04C4 | 4689 | FFFE | FC76 | 17E8 | 8B17 | FE46 |
| 0000066440 | CBC9 | 02C8 | 0000 | 5657 | FF2B | 768B | 8A06 | 0A44 |
| 0000066460 | C88B | 0324 | 023C | 3F75 | C1F6 | 7508 | 8B0D | 81DE |
| 0000066500 | FAEB | F609 | DA87 | 010B | 2D74 | 048B | 442B | 8906 |
| 0000066520 | FE46 | C00B | 217E | FF50 | 0874 | 74FF | 8A06 | 0B4C |
| 0000066540 | ED2A | 9A51 | 7B68 | 6B93 | C483 | 3908 | FE46 | 0774 |
| 0000066560 | 4C80 | 200A | FFBF | 8BFF | 0644 | 548B | 8908 | 8904 |
| 0000066600 | 0254 | 44C7 | 0004 | 8B00 | 5EC7 | C95F | 90CB | 016A |
| 0000066620 | 01E8 | CB00 | 04C8 | 0000 | 5657 | FABE | 2B09 | 89FF |
| 0000066640 | FE7E | 026A | D1E8 | 8316 | 02C4 | 11EB | 46C7 | FFFE |
| 0000066660 | FFFF | FC76 | 7DE8 | 8316 | 02C4 | C683 | 390C | BA36 |
| 0000066700 | 720D | 8B2B | 2DC6 | 09FA | 0CB9 | 9900 | F9F7 | 4689 |
| 0000066720 | 50FC | 53E8 | 8316 | 02C4 | 44F6 | 830A | D374 | 561E |
| 0000066740 | D29A | 4E6A | 836A | 04C4 | 7440 | 47C1 | C3EB | 026A |
| 0000066760 | AFE8 | 8316 | 02C4 | 7E83 | 0104 | 0475 | C78B | 03EB |
| 0000067000 | 468B | 5EFE | C95F | 02C2 | 9000 | 8B55 | B8EC | 01B4 |
| 0000067020 | 769A | 7466 | 576D | C656 | B846 | 2B00 | 89C0 | E846 |
| 0000067040 | 4689 | C4C6 | 0A5E | 8026 | 003F | 0375 | 5FE9 | 2607 |
| 0000067060 | 1F8A | FF2A | 87F6 | 0E57 | 7408 | FF2D | E84E | 468D |
| 0000067100 | 16E8 | FF50 | 0876 | 76FF | E806 | 07C6 | FF50 | 0876 |
| 0000067120 | 76FF | E806 | 07A0 | 46FF | C40A | 0A5E | 8A26 | 2A1F |
| 0000067140 | F6FF | 5787 | 080E | EE75 | 5E8B | 260A | 3F80 | 7425 |
| 0000067160 | E903 | 06F2 | 46C6 | 00C0 | C02A | 4688 | 88FC | B646 |
| 0000067200 | 4688 | 88F2 | F646 | 4688 | 88EE | 5286 | 2BFE | 89C0 |
| 0000067220 | EA46 | 4689 | 89BA | FE46 | 4689 | 89C4 | C246 | 68EB |

THU MAR 14 17:34:20 1991 FL.DLL PAGE 31, LINE 1771

| | | | | | | | | |
|---|---|---|---|---|---|---|---|---|
| 0000067240 | 9090 | 46FF | C40A | 0A5E | 8A26 | 2A07 | 8BE4 | F6F8 |
| 0000067260 | 5785 | 040E | 1A74 | 46FF | 8BBA | FE46 | C88B | E0C1 |
| 0000067300 | 0302 | D1C1 | 03E0 | 2DC7 | 0030 | 4689 | EBFE | 9039 |
| 0000067320 | 6C3D | 7400 | 771C | 3C2D | 744C | 7F13 | 2C1F | 742A |
| 0000067340 | 2C15 | 741C | EB23 | 901D | 46FE | EBFC | 901B | 46FE |
| 0000067360 | FEF6 | F646 | 12EB | 46FE | EBEE | 900D | 4E2C | 0874 |
| 0000067400 | 1A2C | E474 | 86FE | FE52 | BE80 | FE52 | 7400 | 8093 |
| 0000067420 | EE7E | 7500 | C414 | 0E5E | 4683 | 040E | 8B26 | 2607 |
| 0000067440 | 578B | 8902 | F846 | 5689 | C6FA | 5286 | 00FE | 5EC4 |
| 0000067460 | 260A | 078A | 200C | E42A | F88B | FF83 | 746E | 8329 |
| 0000067500 | 63FF | 1674 | FF83 | 747B | 8D11 | E846 | 5016 | 76FF |
| 0000067520 | FF08 | 0676 | BBE8 | EB06 | 900D | 46FF | FFE8 | 0876 |
| 0000067540 | 76FF | E806 | 0662 | F08B | 7E83 | 00BA | 0974 | 7E83 |
| 0000067560 | 00FE | 0375 | 03E9 | 8B05 | E9C7 | 05A0 | 7E83 | 00BA |
| 0000067600 | 0675 | 46FF | FFBA | FE46 | 46C7 | C4BC | 8C0D | BE5E |
| 0000067620 | 23EB | 46C7 | BEBC | EB0D | 90F4 | 46FF | C40A | 0A5E |
| 0000067640 | 5E89 | 8CBC | BE46 | 8026 | 5E3F | 0C75 | 478D | 8901 |
| 0000067660 | BC46 | 468C | FEBE | B64E | 206A | 006A | 468D | 16C8 |
| 0000067700 | 9A50 | 8AC4 | 6ABF | C483 | 8308 | 7BFF | 0374 | A9E9 |
| 0000067720 | C400 | BC5E | 8026 | 5D3F | 0374 | 9DE9 | C600 | C046 |
| 0000067740 | FF5D | BC46 | 46C6 | 20D3 | 8FE9 | 9000 | 8A26 | 8807 |
| 0000067760 | F446 | 46FF | 3CBC | 752D | 800F | C07E | 7400 | 8B09 |
| 0000070000 | BC5E | 8026 | 5D3F | 1E75 | 5E8A | 88F4 | C05E | 01B0 |
| 0000070020 | CB8A | E180 | C007 | 03EB | FF2A | 568D | 03C8 | D2DA |
| 0000070040 | 36E0 | 0708 | 54EB | 46FF | 26BC | 078A | 4688 | 3AF4 |
| 0000070060 | C046 | 0676 | 4688 | EBF0 | 900D | 468A | 88C0 | F046 |
| 0000070100 | 468A | 88F4 | C046 | 468A | 88C0 | F446 | 1CEB | 5E8A |
| 0000070120 | B0F4 | 8A01 | 80CB | 07E1 | EBC0 | 2A03 | 8DFF | C856 |
| 0000070140 | DA03 | E0D2 | 0836 | FE07 | F446 | 468A | 98F0 | 4E8A |
| 0000070160 | 2AF4 | 3BED | 7DC1 | 88D7 | C06E | 5EC4 | 26BC | 3F80 |
| 0000070200 | 745D | E903 | FF66 | 8026 | 003F | 0375 | FFE9 | 8304 |
| 0000070220 | 7BFF | 0A75 | C38B | C28C | 4689 | 890A | 0C56 | 468B |
| 0000070240 | 8BF8 | FA56 | 8689 | FE54 | 9689 | FE56 | 7E83 | 00BA |
| 0000070260 | 0A74 | 468B | FFFE | FE4E | C00B | 4E74 | FE83 | 74FF |
| 0000070300 | 8B49 | C1DE | 03FB | 468D | 03C8 | 36D8 | 078A | 4632 |
| 0000070320 | 98B6 | 01BA | 8B00 | 8BCE | 80D9 | 07E1 | E2D3 | C285 |
| 0000070340 | 2874 | 7E80 | 00EE | 0E75 | C68B | 5EC4 | FFF8 | F846 |
| 0000070360 | 8826 | EB07 | 9005 | 86FF | FE54 | 46FF | FFE8 | 0876 |
| 0000070400 | 76FF | E806 | 04C2 | F08B | A2EB | 4EFF | 56E8 | 76FF |
| 0000070420 | FF08 | 0676 | DFE8 | 8B04 | F846 | 568B | 39FA | 5486 |
| 0000070440 | 75FE | 3909 | 5696 | 75FE | E903 | 0462 | 7E80 | 00EE |
| 0000070460 | 0374 | 29E9 | FF04 | C646 | FF83 | 7563 | E903 | 041E |
| 0000070500 | C28E | D88B | C626 | 0007 | 13E9 | 9004 | 64BF | 8300 |
| 0000070520 | 2DFE | 0675 | 46FE | EBF2 | 9006 | FE83 | 752B | FF1F |
| 0000070540 | FE4E | 0C75 | 7E83 | 00BA | 0674 | 86FE | FE52 | 0EEB |
| 0000070560 | 46FF | FFE8 | 0876 | 76FF | E806 | 044C | F08B | FE83 |
| 0000070600 | 7430 | E903 | 0155 | 46FF | FFE8 | 0876 | 76FF | E806 |
| 0000070620 | 0436 | F08D | 783C | 0474 | 583C | 1475 | 46FF | FFE8 |
| 0000070640 | 0876 | 76FF | E806 | 0420 | F08B | 78BF | E900 | 012B |
| 0000070660 | 46FF | 83EA | 78FF | 0674 | 6FBF | E900 | 011D | 4EFF |
| 0000070700 | 56E8 | 76FF | FF08 | 0676 | 2BE8 | BE04 | 0030 | 0AE9 |
| 0000070720 | 9001 | 7E80 | 00FC | 0675 | 46FE | BFF6 | 0046 | FE83 |
| 0000070740 | 752D | FE05 | F246 | 08EB | FE83 | 742B | E903 | 00EB |
| 0000070760 | 4EFF | 74FE | E903 | 0095 | 7E83 | 00BA | 0375 | 8CE9 |
| 0000071000 | FE00 | 5286 | E9FE | 00D3 | FF83 | 7478 | 830D | 70FF |
| 0000071020 | 0874 | FF83 | 7446 | E903 | 0084 | 84F6 | 0E57 | 7480 |
| 0000071040 | 6A15 | 8D04 | C246 | 5016 | 509A | 698B | 5670 | 79E8 |
| 0000071060 | 8B03 | EBF0 | 9036 | FF83 | 7546 | 832C | EA7E | 7400 |
| 0000071100 | 8326 | 3AFE | 1C75 | 468B | 89C2 | EC46 | C02B | 4689 |

THU MAR 14 17:34:20 1991 FL.DLL PAGE 32, LINE 1830

| | | | | | | | | |
|---|---|---|---|---|---|---|---|---|
| 0000071120 | 89C4 | C246 | 46C7 | FFEA | BFFF | 0070 | 30BE | EB00 |
| 0000071140 | 900A | 46C7 | 00EA | FE00 | 5286 | 80FE | 52BE | 00FE |
| 0000071160 | 5C75 | 46FF | 8DEA | D044 | 0199 | C246 | 5611 | 83C4 |
| 0000071200 | BA7E | 7400 | FF08 | FE4E | 0375 | 74E9 | FFFF | E846 |
| 0000071220 | 76FF | FF08 | 0676 | 2FE8 | 8B03 | EBF0 | 903E | 84F6 |
| 0000071240 | 0E57 | 7404 | 83C2 | 6FFF | 1475 | FE83 | 7D38 | 6AB8 |
| 0000071260 | 8D03 | C246 | 5016 | 509A | 7A8B | EB70 | 90AE | 006A |
| 0000071300 | 0A6A | 468D | 16C2 | 9A50 | 8B0C | 6BC3 | 9DEB | 4EFF |
| 0000071320 | 56E8 | 76FF | FF08 | 0676 | 1BE8 | 8003 | 52BE | 00FE |
| 0000071340 | 0375 | 23E9 | 83FF | 70FF | 0F75 | 7E80 | 00F6 | 0974 |
| 0000071360 | 468B | 8BEC | C24E | 4689 | 80C4 | F27E | 7400 | F70A |
| 0000071400 | C25E | 5683 | 00C4 | 5EF7 | 83C4 | 46FF | 0575 | 46C7 |
| 0000071420 | 00EA | 8300 | EA7E | 7500 | E903 | 0272 | 7E80 | 00EE |
| 0000071440 | 0374 | 39E9 | FF02 | C646 | 7E80 | 00F6 | 1474 | 468D |
| 0000071460 | 8BC2 | C456 | 5EC4 | 26F8 | 0789 | 8926 | 0257 | 1DE9 |
| 0000071500 | 9002 | 468B | C4C2 | F85E | 8926 | E907 | 0210 | 468B |
| 0000071520 | 99E8 | 4689 | 89C2 | C456 | CEEB | 868D | FE58 | 4689 |
| 0000071540 | 8CBC | BE56 | FE83 | 752D | 8B13 | 36D8 | 07C6 | 8D2D |
| 0000071560 | 5986 | 89FE | BC46 | 568C | EBBE | 9006 | FE83 | 752B |
| 0000071600 | FF11 | FE4E | 46FF | FFE8 | 0876 | 76FF | E806 | 0238 |
| 0000071620 | F08B | 7E83 | 00BA | 0774 | 7E81 | 5DFE | 7E01 | C72D |
| 0000071640 | FE46 | 015D | 26EB | 468B | FFFE | FE4E | C00B | 2374 |
| 0000071660 | 46FF | 8BEA | C4C6 | BC5E | 46FF | 26BC | 0788 | 46FF |
| 0000071700 | FFE8 | 0876 | 76FF | E806 | 01FE | F08B | 84F6 | 0E57 |
| 0000071720 | 7504 | 83D3 | 2EFE | 4375 | 468B | FFFE | FE4E | C00B |
| 0000071740 | 3974 | 5EC4 | FFBC | BC46 | C626 | 2507 | 18EB | 468B |
| 0000071760 | FFFE | FE4E | C00B | 2374 | 46FF | 8BEA | C4C6 | BC5E |
| 0000072000 | 46FF | 26BC | 0788 | 46FF | FFE8 | 0876 | 76FF | E806 |
| 0000072020 | 01B6 | F08B | 84F6 | 0E57 | 7504 | 83D3 | EA7E | 7500 |
| 0000072040 | E903 | 0081 | C68B | 653C | 0474 | 453C | 7775 | 468B |
| 0000072060 | FFFE | FE4E | C00B | 6D74 | 5EC4 | FFBC | BC46 | C626 |
| 0000072100 | 6507 | 46FF | FFE8 | 0876 | 76FF | E806 | 017A | F08B |
| 0000072120 | FE83 | 752D | C40F | BC5E | 46FF | 26BC | 07C6 | EB2D |
| 0000072140 | 9008 | 9090 | FE83 | 752B | 8B35 | FE46 | 4EFF | 0BFE |
| 0000072160 | 75C0 | FF1D | FE46 | 26EB | 468B | FFFE | FE4E | C00B |
| 0000072200 | 2374 | 46FF | 8BEA | C4C6 | BC5E | 46FF | 26BC | 0788 |
| 0000072220 | 46FF | FFE8 | 0876 | 76FF | E806 | 012C | F08B | 84F6 |
| 0000072240 | 0E57 | 7504 | FFD3 | E84E | FF56 | 0876 | 76FF | E806 |
| 0000072260 | 0144 | 7E83 | 00EA | 0375 | D3E9 | 8000 | EE7E | 7400 |
| 0000072300 | E903 | 009A | 46FF | C4C6 | BC5E | C626 | 0007 | 868D |
| 0000072320 | FE58 | 5016 | 76FF | FFFA | F876 | 468A | 98F6 | 8E50 |
| 0000072340 | 2206 | 2610 | 1EFF | 0E40 | C483 | EB0A | 9071 | 5EC4 |
| 0000072360 | 260A | 078A | E42A | C63B | 1274 | 4EFF | 56E8 | 76FF |
| 0000072400 | FF08 | 0676 | EFE8 | E900 | 0084 | 9090 | 4EFE | 80B8 |
| 0000072420 | EE7E | 7500 | 8349 | 0E6E | EB04 | 9043 | 632D | 3D00 |
| 0000072440 | 0018 | CA77 | E0D1 | 2E93 | A7FF | 72DC | 6D2C | 6F8E |
| 0000072460 | 710A | 710A | 710A | 729E | 6EFC | 729E | 729E | 729E |
| 0000072500 | 729E | 70FE | 6F8E | 6F82 | 729E | 729E | 6D42 | 729E |
| 0000072520 | 6F8E | 729E | 729E | 6EFF | 729E | 729E | 6D4A | 46FE |
| 0000072540 | FFB8 | 0A46 | 20EB | 46FF | FFE8 | 0876 | 76FF | E806 |
| 0000072560 | 0056 | F08B | 5EC4 | FF0A | 0A46 | 8A26 | 2A07 | 3BE4 |
| 0000072600 | 74F0 | E903 | FF74 | FE83 | 74FF | E903 | F895 | FE83 |
| 0000072620 | 75FF | 830C | C67E | 7500 | 8006 | B87E | 7400 | 8B05 |
| 0000072640 | C646 | 02EB | C68B | 5F5E | CBC9 | 8B55 | 8BEC | 045E |
| 0000072660 | 87F6 | 0E57 | 7404 | 8B05 | EBC3 | 9008 | C38B | DF24 |
| 0000072700 | 072D | C900 | 02C2 | 9000 | 04C8 | 0000 | 5EC4 | 2604 |
| 0000072720 | 4FFF | 7804 | 2615 | 078B | 8B26 | 0257 | FF26 | 8B07 |
| 0000072740 | 8ED8 | 26C2 | 078A | E42A | 07EB | 5306 | BE9A | BB68 |
| 0000072760 | C973 | 04C2 | 9000 | 8B55 | 83EC | 087E | 74FF | FF0E |

THU MAR 14 17:34:20 1991 FL.DLL PAGE 33, LINE 1889

| | | | | | | | | |
|---|---|---|---|---|---|---|---|---|
| 0000073000 | 0676 | 76FF | FF04 | 0876 | 1E9A | DB79 | C96F | 06C2 |
| 0000073020 | 9000 | 8B55 | 56EC | 5EC4 | 2608 | 07FF | 76FF | FF06 |
| 0000073040 | 0476 | A3E8 | 8BFF | F6F0 | 5784 | 080E | E875 | C95E |
| 0000073060 | 08C2 | 9000 | 744C | 7457 | 746D | 74A1 | 74CD | 74D5 |
| 0000073100 | 74FE | 7530 | 8B55 | B8EC | 0171 | E80E | F278 | 5756 |
| 0000073120 | C033 | 4689 | 88F8 | FB46 | 76C4 | 260A | 89AC | 0A76 |
| 0000073140 | 4688 | 0AFE | 74C0 | 8306 | F87E | 7D00 | 8B06 | F846 |
| 0000073160 | B5E9 | BB04 | 0DC6 | 202C | 583C | 0577 | 24D7 | EB0F |
| 0000073200 | B002 | B100 | D203 | 02E0 | FB46 | FED7 | D2C1 | 88E8 |
| 0000073220 | FB46 | 8B98 | D1D8 | 2EE3 | A7FF | 73E4 | 568A | B9FE |
| 0000073240 | 0001 | 36E8 | EB04 | 33B1 | 89C0 | F046 | 4689 | 89F6 |
| 0000073260 | EE46 | 46C7 | 20FC | 4800 | 4689 | EBF4 | 8A9B | FE46 |
| 0000073300 | 2D3C | 0675 | 4E80 | 04FC | 8EEB | 2B3C | 0675 | 4E80 |
| 0000073320 | 01FC | 84EB | 203C | 0775 | 4E80 | 02FC | 79E9 | 3CFF |
| 0000073340 | 7523 | 8007 | FC4E | E980 | FF6E | 4E80 | 08FC | 67E9 |
| 0000073360 | 8AFF | FE4E | F980 | 752A | E80F | 035C | C00B | 1779 |
| 0000073400 | D8F7 | 4E80 | 04FC | 0FEB | E980 | 3230 | 8BED | F646 |
| 0000073420 | 0ABB | F700 | 03E3 | 89C1 | F646 | 3BE9 | C7FF | F446 |
| 0000073440 | 0000 | 33E9 | 8AFF | FE4E | F980 | 752A | E80C | 0328 |
| 0000073460 | C00B | 1479 | FFB8 | EBFF | 800F | 30E9 | ED32 | 468B |
| 0000073500 | BBF4 | 000A | E3F7 | C103 | 4689 | E9F4 | FF0A | 468A |
| 0000073520 | 3CFE | 756C | 8006 | FC4E | EB10 | 3C22 | 7546 | 8006 |
| 0000073540 | FC4E | EB20 | 3C18 | 754E | 8006 | FD4E | EB10 | 3C0E |
| 0000073560 | 754C | 8006 | FD4E | EB04 | 8004 | FD4E | E908 | FED8 |
| 0000073600 | 468A | 3CFE | 7564 | E903 | 0194 | 693C | 0375 | 8DE9 |
| 0000073620 | 3C01 | 7575 | E903 | 018A | 583C | 0375 | 89E9 | 3C01 |
| 0000073640 | 7578 | E903 | 0188 | 6F3C | 0375 | A2E9 | 3C01 | 7463 |
| 0000073660 | 3C1A | 7473 | 3C27 | 746E | 3C51 | 7470 | 3C60 | 7445 |
| 0000073700 | 3C07 | 7447 | E903 | 00BB | B5E9 | E800 | 028A | BE8D |
| 0000073720 | FE8F | 0716 | 4FAA | 01B9 | E900 | 01F1 | 90E8 | 0B02 |
| 0000073740 | 75FF | 8C12 | 0BC0 | 75C0 | 1E0C | BF07 | 0E1F | 0E8B |
| 0000073760 | 0E25 | D8E9 | 5701 | 4E8B | E3F4 | 3207 | F2C0 | 75AE |
| 0000074000 | 4F01 | 2B59 | 87F9 | E9CF | 01C3 | 62E8 | 8B02 | F846 |
| 0000074020 | F6AB | FC46 | 7410 | 3303 | ABC0 | 3BE9 | F6FE | FC46 |
| 0000074040 | 7530 | E805 | 0232 | 39EB | 36E8 | F602 | FD46 | 7518 |
| 0000074060 | C630 | FF46 | B907 | 0010 | 0716 | 3352 | 8DD2 | 97BE |
| 0000074100 | BEFE | 0004 | B0E8 | B902 | 0010 | BE8D | FE92 | 3358 |
| 0000074120 | BED2 | 0004 | A0E8 | C602 | 9386 | 3AFE | 09B9 | EB00 |
| 0000074140 | C618 | FF46 | B907 | 0010 | 0716 | D233 | BE8D | FE92 |
| 0000074160 | 04BE | E800 | 0281 | 04B9 | 8D00 | 8FBE | E9FE | 014D |
| 0000074200 | 46FF | 80EE | FC4E | 8A40 | FE46 | 200C | 8B98 | 83F0 |
| 0000074220 | F47E | 7F00 | 7413 | C707 | F446 | 0006 | 0AEB | 673D |
| 0000074240 | 7500 | C705 | F446 | 0001 | BE8D | FE8F | 76FF | FFEE |
| 0000074260 | F476 | 1656 | FF57 | 1076 | 76FF | F60E | FD46 | 7404 |
| 0000074300 | FF0A | 4C1E | 830E | 0E46 | EB0A | FF08 | 381E | 830E |
| 0000074320 | 0E46 | 8308 | 0EC4 | 46F6 | 80FC | 0F74 | 7E83 | 00F4 |
| 0000074340 | 0975 | 5716 | 1EFF | 0E44 | C483 | 8304 | 67FE | 1075 |
| 0000074360 | 46F7 | 80FC | 7500 | 1609 | FF57 | 3C1E | 830E | 04C4 |
| 0000074400 | 0716 | 8026 | 2D3D | 0575 | 8047 | FD4E | B901 | FFFF |
| 0000074420 | B057 | F200 | 4FAE | 2B59 | 87F9 | E9CF | 00AF | 4E80 |
| 0000074440 | 40FC | 46C6 | 0AFA | 35EB | 46C6 | 07FF | 04EB | 46C6 |
| 0000074460 | 27FF | 46F6 | 80FC | 1174 | 46C7 | 02F0 | C600 | F246 |
| 0000074500 | B230 | 0251 | FF56 | 5688 | C6F3 | FA46 | EB10 | F60E |
| 0000074520 | FC46 | 7480 | 8004 | FD4E | C602 | FA46 | F608 | FC46 |
| 0000074540 | 7410 | E805 | 00FB | 0EEB | EDE8 | F600 | FC46 | 7440 |
| 0000074560 | 9903 | 02EB | D233 | 46F6 | 40FC | 0F74 | D20B | 0B7D |
| 0000074600 | 4E80 | 01FD | D8F7 | D283 | F700 | 83DA | F47E | 7D00 |
| 0000074620 | C707 | F446 | 0001 | 04EB | 6680 | F7FC | D88B | DA0B |
| 0000074640 | 0575 | 46C7 | 00F0 | 8D00 | EB7E | 0716 | 4E8A | 32FA |

THU MAR 14 17:34:20 1991 FL.DLL PAGE 34, LINE 1948

| | | | | | | | | |
|---|---|---|---|---|---|---|---|---|
| 0000074660 | 8BED | F476 | 40E8 | F601 | FD46 | 7402 | E30E | 2606 |
| 0000074700 | 3D80 | 7430 | 4F06 | C626 | 3005 | EB41 | F600 | FC46 |
| 0000074720 | 7440 | F631 | FD46 | 7401 | C60B | F246 | C72D | F046 |
| 0000074740 | 0001 | 20EB | 46F6 | 01FC | 0B74 | 46C6 | 2BF2 | 46C7 |
| 0000074760 | 01F0 | EB00 | F60F | FC46 | 7402 | C609 | F246 | C720 |
| 0000075000 | F046 | 0001 | 468B | 2BF6 | 2BC1 | F046 | 027D | C033 |
| 0000075020 | 5706 | F651 | FC46 | 750C | 8B07 | B2C8 | E820 | 00BB |
| 0000075040 | 1650 | 8D07 | F27E | 4E8B | E8F0 | 0091 | F658 | FC46 |
| 0000075060 | 7408 | F60D | FC46 | 7504 | 8B07 | B2C8 | E830 | 009B |
| 0000075100 | 5F59 | 5007 | 76E8 | 5800 | 46F6 | 04FC | 0774 | C88B |
| 0000075120 | 20B2 | 86E8 | E900 | FC00 | 76C4 | 260E | 89AD | 0E76 |
| 0000075140 | C4C3 | 0E76 | AD26 | D08B | AD26 | 8992 | 0E76 | F6C3 |
| 0000075160 | FC46 | 7420 | E808 | FFE9 | C28E | F88B | E8C3 | FFD8 |
| 0000075200 | F88B | C00B | 0375 | C08E | 1EC3 | C307 | 0698 | C457 |
| 0000075220 | 065E | FF26 | 044F | 1078 | 8B26 | 263F | 07FF | 8E26 |
| 0000075240 | 0247 | 33AA | 5FC0 | C307 | 5251 | 5306 | 0E50 | F9E8 |
| 0000075260 | 83F0 | 06C4 | 595A | FF3D | 75FF | EBE8 | E3E8 | 8B1B |
| 0000075300 | 01F7 | F84E | 3357 | 26FF | E8AC | FFC0 | F80B | F7E2 |
| 0000075320 | FF0B | 745F | C705 | F846 | FFFF | E3C3 | 0119 | F84E |
| 0000075340 | 3357 | 8AFF | E8C2 | FFA4 | F80B | F7E2 | FF0B | 745F |
| 0000075360 | C705 | F846 | FFFF | FDC3 | 9357 | F60B | 0A7F | DB0B |
| 0000075400 | 0675 | D20B | 0275 | 1AEB | 3392 | F7D2 | 93F1 | F1F7 |
| 0000075420 | 8792 | 04D3 | 3C30 | 7639 | 0203 | FF46 | 8BAA | 4EC2 |
| 0000075440 | D8EB | 2B59 | 47CF | C3FC | 5E5F | E58B | CB5D | 04C8 |
| 0000075460 | 0000 | 8B56 | 0676 | 468B | 2D08 | 09FA | 0CB9 | 9900 |
| 0000075500 | F9F7 | 4689 | 50FE | DFE8 | 8308 | 02C4 | 76FF | FF0A |
| 0000075520 | 0876 | 9A56 | 791E | 739F | C483 | 8906 | FC46 | 76FF |
| 0000075540 | E8FE | 08D0 | C483 | 8B02 | FC46 | C95E | 90CB | 8B55 |
| 0000075560 | 57EC | 8B56 | 0676 | 7E8B | 8308 | FFFE | 1274 | 45F6 |
| 0000075600 | 010A | 1275 | 45F6 | 800A | 0674 | 45F6 | 020A | 0674 |
| 0000075620 | FFB8 | EBFF | 903E | 458B | 0B08 | 0645 | 0875 | 571E |
| 0000075640 | EDEB | 83F0 | 04C4 | 058B | 558B | 3902 | 0645 | 0D75 |
| 0000075660 | 5539 | 7508 | 8308 | 047D | 7500 | FFD5 | FF05 | 0445 |
| 0000075700 | C68B | 0DFF | 1DC4 | 8826 | 8007 | 0A65 | 80EF | 0A4D |
| 0000075720 | 2A01 | 5EE4 | C95F | 90CB | 8B55 | 83EC | 02EC | C033 |
| 0000075740 | 09EB | 8B55 | 83EC | 02EC | FFB8 | 89FF | FE46 | 5E8B |
| 0000075760 | 3B06 | D91E | 7207 | BA19 | 0009 | C033 | 9BE9 | 8BEE |
| 0000076000 | FE4E | C90B | 0774 | E853 | 0842 | C483 | E902 | EEA3 |
| 0000076020 | C00B | 0774 | E853 | 0828 | C483 | 8302 | 04EC | CC8B |
| 0000076040 | FF53 | 0A76 | 76FF | FF08 | 0C76 | 5116 | FF9A | 00FF |
| 0000076060 | 5900 | 855A | 75C0 | 80C8 | DBA7 | FD07 | 468B | 0BFE |
| 0000076100 | 74C0 | 5307 | 05E8 | 8308 | 02C4 | 8B91 | 5DE5 | 00CB |
| 0000076120 | 8B55 | 83EC | 08EC | C033 | 5E8B | 3B06 | D91E | 7307 |
| 0000076140 | 534D | DBE8 | 8307 | 02C4 | 4E8B | E30C | F647 | DB87 |
| 0000076160 | 0207 | 4075 | 3357 | 8BD2 | 0C4E | 7EC4 | F608 | DB87 |
| 0000076200 | 0807 | 1074 | 878A | 08DB | 0A3C | 0874 | 42AA | C649 |
| 0000076220 | DB87 | 0A08 | 0653 | 5157 | 468D | 16FA | 9A50 | FFFF |
| 0000076240 | 0000 | 0B5F | 74C0 | 530F | A1E8 | 8307 | 02C4 | 09BA |
| 0000076260 | E900 | EDE6 | 4AEB | 468B | 03FA | F6C2 | DB87 | 8007 |
| 0000076300 | 3E74 | A780 | 07DB | 56FB | 1E57 | C507 | 0876 | FE8B |
| 0000076320 | C88B | 28E3 | 0DB4 | 3C80 | 750A | 2606 | 8F80 | 07DB |
| 0000076340 | AC04 | C43A | 2574 | 1A3C | 0875 | 8026 | DB8F | 0207 |
| 0000076360 | 05EB | 0588 | E247 | 8BEA | 2BC7 | 0846 | 1F06 | 5E5F |
| 0000076400 | E853 | 0748 | C483 | 8B02 | 5DE5 | 83CB | 01F9 | 0774 |
| 0000076420 | 3C80 | 740A | EBE0 | 26DB | 87F6 | 07DB | 7440 | 0B2B |
| 0000076440 | 75DB | 5323 | 468D | 16F9 | 5150 | 468D | 16FA | 9A50 |
| 0000076460 | 7A4E | 0000 | C085 | 0E74 | 1F06 | 5E5F | E853 | 070C |
| 0000076500 | C483 | E902 | ED6D | 0AB0 | A8EB | 46C6 | 00F9 | 8D53 |
| 0000076520 | F946 | 5016 | 8D51 | FA46 | 5016 | E09A | 007A | 0B00 |

THU MAR 14 17:34:20 1991 FL.DLL PAGE 35, LINE 2007

| | | | | | | | | |
|---|---|---|---|---|---|---|---|---|
| 0000076540 | 75C0 | F7D5 | FA46 | FFFF | 3674 | 7E83 | 010C | 3574 |
| 0000076560 | F626 | DB87 | 0807 | 1C75 | B853 | FFFF | 5050 | D8F7 |
| 0000076600 | 8D50 | FC46 | 5016 | DD9A | 0079 | 800D | F97E | 750A |
| 0000076620 | E90F | FF61 | 468A | 26F9 | 8788 | 08DB | 0A3C | 0274 |
| 0000076640 | 0DB0 | 4DE9 | 80FF | F97E | 750A | EBC5 | 0099 | 8B55 |
| 0000076660 | 83EC | 0EEC | C033 | 09EB | 8B55 | 83EC | 0EEC | FFB8 |
| 0000076700 | 89FF | F246 | 5E8B | 3B06 | D91E | 7207 | BA08 | 0009 |
| 0000076720 | C033 | C5E9 | 0BEC | 74C0 | 5307 | 63E8 | 8306 | 02C4 |
| 0000076740 | 87F6 | 07DB | 7420 | 5312 | C933 | 5151 | 4141 | 8D51 |
| 0000076760 | F446 | 5016 | 379A | 007B | F600 | DB87 | 8007 | 6674 |
| 0000077000 | 5E8C | 8EFA | 0A46 | 56C5 | 3308 | 89C0 | FE46 | 4689 |
| 0000077020 | FCFC | 5657 | FA8B | F28B | 6689 | 8BF8 | 0C4E | 28E3 |
| 0000077040 | 0AB0 | AEF2 | 3B75 | EC83 | 8B02 | BADC | 0080 | E22B |
| 0000077060 | D48B | FA8B | 0716 | 4E8B | AC0C | 0A3C | 0D74 | FB3B |
| 0000077100 | 1A74 | E2AA | E8F4 | 0038 | AFE9 | B000 | 3B0D | 75FB |
| 0000077120 | E803 | 002C | B0AA | FF0A | FC46 | E2EB | 21E8 | EB0D |
| 0000077140 | 5EE1 | 8E5F | FA5E | C8E9 | 8B00 | F246 | C00B | 0974 |
| 0000077160 | 76FF | E806 | 05D6 | C483 | B802 | FFFC | E80E | EA46 |
| 0000077200 | 5350 | 1E51 | 1F06 | CF8B | CA2B | 21E3 | 8B51 | 065E |
| 0000077220 | 1E53 | 5152 | 468D | 16F4 | 9A50 | 67F1 | 0000 | 0B59 |
| 0000077240 | 75C0 | 8B11 | F45E | 5E01 | 3BFE | 72D9 | 1F07 | 5B59 |
| 0000077260 | 8B58 | C3FA | 831F | 08C4 | 7E83 | 00FE | 3C75 | C00B |
| 0000077300 | 1874 | 6D3D | 7400 | 3D0D | 0001 | 09BA | 7500 | BA08 |
| 0000077320 | 001C | 03EB | 20BA | F900 | 26EB | 5E8E | F6FA | DB87 |
| 0000077340 | 4007 | 0E74 | 5E8E | 8B0A | 085E | 3F80 | 751A | F803 |
| 0000077360 | 0EEB | 1CBA | 3300 | F9C0 | 06EB | 468B | 2BFE | FC46 |
| 0000077400 | 668B | 5EF8 | 8E5F | FA5E | 1472 | 5E8B | 0BF2 | 74DB |
| 0000077420 | FF09 | 0676 | 35E8 | 8305 | 02C4 | E58B | CB5D | 5E8B |
| 0000077440 | 0BF2 | 74DB | FF09 | 0676 | 21E8 | 8305 | 02C4 | 69E9 |
| 0000077460 | 8BEB | 0C4E | C90B | 0475 | C18B | CEEB | C51E | 0856 |
| 0000077500 | 1E53 | 5152 | 468D | 16F4 | 9A50 | 7C4A | 0000 | 071E |
| 0000077520 | 0B1F | 74C0 | 3D17 | 006D | 0D74 | 013D | BA00 | 0009 |
| 0000077540 | BC75 | 1CBA | EB00 | BAB7 | 0020 | B2EB | 468B | 0BF4 |
| 0000077560 | 75C0 | F697 | DB87 | 4007 | 0A74 | DA8B | 8026 | 1A3F |
| 0000077600 | 0275 | 86EB | 1CBA | 3300 | EBC0 | 0093 | 63EA | 067D |
| 0000077620 | EA79 | 7D82 | 7D3F | 50EA | 447D | EA7D | 7D50 | 7D49 |
| 0000077640 | 8B55 | 56EC | 76C4 | 8C06 | E3C1 | 2605 | 4C80 | 01FE |
| 0000077660 | 5D5E | 55CB | EC8B | 096A | BDE8 | 8304 | 02C4 | 76FF |
| 0000077700 | 0E06 | 0DE8 | 5B00 | 096A | D7E8 | 8304 | 02C4 | E58B |
| 0000077720 | CB5D | 8B55 | 56EC | 8B57 | 064E | F983 | 77E8 | 1E69 |
| 0000077740 | 2AA1 | 0B0E | 74C0 | BF48 | 7E6A | 368B | 0E32 | 1EC5 |
| 0000077760 | 0E2C | 561E | FF57 | 5FD7 | 735E | 8C2B | C5DA | 0C5F |
| 0000100000 | D63B | EF75 | 1F58 | C41E | 2C36 | 260E | 748B | C512 |
| 0000100020 | 281E | 8C0E | 3BDA | 75D0 | 1FD9 | 811E | E6FF | 747E |
| C000100040 | BF0E | 7EE6 | C4EB | 815E | 6AFF | 747E | EB0F | 070A |
| 0000100060 | BF06 | 0E28 | E1E8 | 7201 | E80E | 007E | 891F | 2E16 |
| 0000100100 | 890E | 2C1E | EB0E | 1F04 | C033 | 5F99 | 5D5E | 00CB |
| 0000100120 | 5706 | F88B | FB03 | 7F89 | 4F04 | 2D4F | 0016 | 778D |
| 0000100140 | C714 | FE05 | 89FF | 0A7F | 8948 | 8C04 | 8B1F | 8CC6 |
| 0000100160 | 8EDA | 8DC2 | 067F | ABFC | 47AB | 3347 | ABC0 | ABAB |
| 0000100200 | 5FAB | C307 | 8B26 | 0245 | C00B | 0975 | 8C26 | 025D |
| 0000100220 | 8926 | EB1D | 0614 | C426 | 0875 | 8C26 | 0E5C | 8926 |
| 0000100240 | 0C5C | 478C | 8912 | 1077 | 2607 | 5D8C | 260A | 5D89 |
| 0000100260 | 2608 | 5D8C | 2606 | 5D89 | C304 | 8041 | FEE1 | FC53 |
| 0000100300 | 778B | 8B08 | 0A5F | FF33 | 23EB | C38B | A85B | 7501 |
| 0000100320 | 5342 | 778B | 8B06 | 085F | DE3B | 3674 | 334B | EBFF |
| 0000100340 | 900C | 548D | 3BFE | 73D3 | 03E1 | 72F0 | AD23 | 01A8 |
| 0000100360 | F074 | FE8B | 3B48 | 73C1 | 0323 | 72F0 | 8B13 | ADD0 |
| 0000100400 | 01A8 | DE74 | C203 | 0205 | 8B00 | 89F7 | FE44 | E4EB |

THU MAR 14 17:34:20 1991 FL.DLL PAGE 36, LINE 2066

| | | | | | | | | |
|---|---|---|---|---|---|---|---|---|
| 0000100420 | C08B | 8B5B | 0647 | 4789 | F908 | 19EB | 895B | FE4C |
| 0000100440 | 0974 | F903 | C12B | 8948 | 2B05 | 03F9 | 89F9 | 087F |
| 0000100460 | C68B | DA8C | C3F8 | 5751 | 47F6 | 0102 | 6674 | B7E8 |
| 0000100500 | 8B00 | 8BFE | A804 | 7401 | 2B03 | 49C8 | 4141 | 778B |
| 0000100520 | 0B04 | 74F6 | 034F | 73CE | 3309 | BAC0 | FFF0 | 33E3 |
| 0000100540 | 42EB | 9EB8 | 8E67 | 26C0 | 36A1 | 3D0E | 2000 | 1674 |
| 0000100560 | 00BA | 3B80 | 72D0 | D106 | 75EA | EBF8 | 8322 | 08FA |
| 0000100600 | 1D72 | E2D1 | C28B | 8B48 | 03D0 | 73C1 | 3302 | F7C0 |
| 0000100620 | 23D2 | 52C2 | 2EE8 | 5A00 | 0D73 | FA83 | 74F0 | B805 |
| 0000100640 | 0010 | E2EB | EBF9 | 8B1B | 2BD0 | 0457 | 4789 | 8904 |
| 0000100660 | 087F | 778B | 4A0A | 1489 | 0342 | C7F2 | FE04 | 89FF |
| 0000100700 | 0A77 | 595F | 8BC3 | F6D0 | 0247 | 7404 | 4A0F | 778B |
| 0000100720 | 4E04 | D63B | 0572 | 5739 | 73FE | 4218 | 1E50 | F59A |
| 0000100740 | 0063 | 0B00 | 75C0 | 8B0F | F6C2 | 0247 | 7404 | 4A04 |
| 0000100760 | 5789 | F8FE | 01EB | C3F9 | 8B57 | 0877 | 773B | 750A |
| 0000101000 | 8B03 | 0677 | 3DAD | FFFE | 0874 | FE8B | FE24 | F003 |
| 0000101020 | F2EB | 4F4F | F78B | C35F | D18B | C283 | 8027 | F0E2 |
| 0000101040 | 8B50 | 52C4 | 5016 | C033 | 9A50 | FFFF | 0000 | 0B1F |
| 0000101060 | 75C0 | 3314 | 26DB | 458B | 890C | 0247 | C28B | 0FE8 |
| 0000101100 | E8FE | FE40 | EBF8 | F901 | 00C3 | 8B55 | 8BEC | 8BD7 |
| 0000101120 | 1EDE | 76C5 | 8B0A | 8CFE | 8ED8 | 33C0 | B9C0 | FFFF |
| 0000101140 | AEF2 | D1F7 | 7EC4 | 8B06 | A8C7 | 7401 | A402 | D149 |
| 0000101160 | F3E9 | 13A5 | F3C9 | 8BA4 | 8BF3 | 1FFA | C28C | CB5D |
| 0000101200 | 8B55 | 8BEC | 8BD7 | 1EDE | 76C5 | C406 | 0A7E | C033 |
| 0000101220 | FFB9 | F2FF | F7AE | 2BD1 | F3F9 | 74A6 | 1B05 | 1DC0 |
| 0000101240 | FFFF | 8B1F | 8BF3 | 5DFA | 00CB | 8B55 | 8BEC | C4D7 |
| 0000101260 | 067E | C033 | FFB9 | F2FF | F7AE | 49D1 | 8B91 | 5DFA |
| 0000101300 | 00CB | 8B55 | 57EC | 1E56 | 7EC4 | C506 | 0A76 | DF8B |
| 0000101320 | 4E8B | E30E | AC0C | C00A | 0374 | E2AA | 32F8 | F3C0 |
| 0000101340 | 8BAA | 8CC3 | 1FC2 | 5F5E | E58B | CB5D | 8B55 | 57EC |
| 0000101360 | 1E56 | 4E8B | E30E | 8B27 | C4D9 | 067E | F78B | C033 |
| 0000101400 | AEF2 | D9F7 | CB03 | FE8B | 76C5 | F30A | 8AA6 | FF44 |
| 0000101420 | C933 | 3A26 | FF45 | 0477 | 0474 | 4949 | D1F7 | C18B |
| 0000101440 | 5E1F | 8B5F | 5DE5 | 00CB | 01E9 | 0000 | 8B55 | 57EC |
| 0000101460 | 1E56 | 76C5 | 3306 | 99C0 | DB33 | 3CAC | 7420 | 3CFB |
| 0000101500 | 7409 | 50F7 | 2D3C | 0474 | 2B3C | 0175 | 3CAC | 7739 |
| 0000101520 | 2C1F | 7230 | D11B | D1E3 | 8BD2 | 8BCB | D1FA | D1E3 |
| 0000101540 | D1D2 | D1E3 | 03D2 | 13D9 | 03D7 | 83D8 | 00D2 | DCEB |
| 0000101560 | 3C58 | 932D | 0775 | D8F7 | D283 | F700 | 1FDA | 5F5E |
| 0000101600 | CB5D | 04C8 | 0000 | A156 | 09E1 | 168B | 09E3 | 4689 |
| 0000101620 | 89FC | FE56 | 0C6A | DFE8 | 8300 | 02C4 | 468B | 0BFE |
| 0000101640 | FC46 | 7674 | 468B | 0B08 | 0646 | 6E74 | 76FF | FF08 |
| 0000101660 | 0676 | 5A9A | 8280 | 8381 | 04C4 | F08B | 5EC4 | 26FC |
| 0000101700 | 478B | 2602 | 070B | 5274 | FF26 | 0277 | FF26 | 9A37 |
| 0000101720 | 805A | 81A3 | C483 | 3B04 | 7EC6 | C439 | FC5E | C426 |
| 0000101740 | 261F | 3880 | 753D | 562D | 76FF | FF08 | 0676 | 5306 |
| 0000101760 | 9C9A | 4E80 | 837D | 0AC4 | C00B | 1875 | 0C6A | A1E8 |
| 0000102000 | 8300 | 02C4 | 5EC4 | 26FC | 078B | 8B26 | 0257 | C603 |
| 0000102020 | EB40 | 9012 | 4683 | 04FC | A2EB | 0C6A | 83E8 | 8300 |
| 0000102040 | 02C4 | C02B | 5E99 | CBC9 | 8B55 | 50EC | 468B | 0504 |
| 0000102060 | 0014 | 4BEB | 8B55 | 50EC | 468B | 0504 | 0014 | 69EB |
| 0000102100 | 8B55 | 50EC | 468B | 0504 | 0114 | 33EB | 8B55 | 50EC |
| 0000102120 | 468B | 0504 | 0114 | 51EB | 8B55 | 50EC | 468B | C104 |
| 0000102140 | 02E0 | FF68 | 50FF | FF6A | FF6A | FF9A | 00FF | 0B00 |
| 0000102160 | 75C0 | 5829 | E58B | C35D | 8B55 | 50EC | 468B | FF04 |
| 0000102200 | 5806 | C10F | 02E0 | 1368 | 5082 | FF6A | FF6A | FF9A |
| 0000102220 | 00FF | 0B00 | 75C0 | 5805 | E58B | C35D | 11B8 | E900 |
| 0000102240 | E1EB | 8B55 | 50EC | 468B | C104 | 02E0 | 3768 | 5082 |
| 0000102260 | FF9A | 00FF | 0B00 | 75C0 | FFE3 | 580E | 580F | E58B |

THU MAR 14 17:34:20 1991  FL.DLL  PAGE 37, LINE 2125

| | | | | | | | | |
|---|---|---|---|---|---|---|---|---|
| 0000102300 | C35D | 8B55 | FFEC | 0676 | ADE8 | 83FF | 02C4 | E58B |
| 0000102320 | CB5D | 8B55 | FFEC | 0676 | C7E8 | 83FF | 02C4 | E58B |
| 0000102340 | CB5D | 068E | 079A | A126 | 0006 | 3B48 | 5A06 | 770F |
| 0000102360 | C107 | 06E0 | FFBA | C3FF | 5357 | 6A51 | E80F | FF78 |
| 0000102400 | C483 | 3B02 | 5A06 | 760F | 8B40 | 05D8 | 0004 | FC25 |
| 0000102420 | 8BFF | C1C8 | 06E0 | A5BA | 5082 | 9A52 | 7F8F | 0000 |
| 0000102440 | C00B | 3275 | 8B49 | 87F9 | 5A3E | 2B0F | 51CF | C147 |
| 0000102460 | 06E7 | E1C1 | 5705 | C28E | ABF3 | 595F | C726 | 0445 |
| 0000102500 | 0200 | C783 | E240 | 8BF5 | 6AC3 | E80F | FF54 | C483 |
| 0000102520 | 5902 | 5F5B | 9BEB | 10B8 | E900 | E131 | 04C8 | 0000 |
| 0000102540 | 5657 | 126A | 11E8 | 83FF | 02C4 | 06C6 | 19AE | 8B42 |
| 0000102560 | 0646 | 568B | A308 | 19AA | 1689 | 19AC | A4BE | 8919 |
| 0000102600 | 8904 | 0254 | 06C7 | 19A8 | 7FFF | 468D | 160E | FF50 |
| 0000102620 | 0C76 | 76FF | 1E0A | 9A56 | 73F4 | 836D | C483 | 8B0C |
| 0000102640 | FFF8 | A80E | 7819 | C40F | A41E | FF19 | A406 | 2619 |
| 0000102660 | 07C6 | EB00 | 900D | 561E | 006A | 5A9A | 6569 | 8381 |
| 0000102700 | 06C4 | 126A | DBE8 | 83FE | 02C4 | C78B | 5F5E | CBC9 |
| 0000102720 | 04C8 | 0000 | 5657 | 116A | 9DEB | 83FE | 02C4 | D6C6 |
| 0000102740 | 19BA | 8B49 | 0646 | 568B | A308 | 19B6 | 1689 | 19B8 |
| 0000102760 | B0BE | 8919 | 8904 | 0254 | 5052 | 5A9A | C780 | 8383 |
| 0000103000 | 04C4 | B4A3 | 8D19 | 0E46 | 5016 | 76FF | FF0C | 0A76 |
| 0000103020 | 681E | 19B0 | BA9A | 4A6B | 8383 | 0CC4 | F88B | 116A |
| 0000103040 | 7FE8 | 83FE | 02C4 | C78B | 5F5E | CBC9 | 8B55 | 57EC |
| 0000103060 | 468B | F706 | 0866 | 0573 | C033 | EB99 | 501A | 3C9A |
| 0000103100 | AD7D | 5983 | D88B | DA0B | 0D74 | 8B50 | 8EF8 | 33C2 |
| 0000103120 | 41C0 | E9D1 | ABF3 | 5F58 | CB5D | 8B55 | 56EC | 768B |
| 0000103140 | 8B04 | B9C6 | 000A | F799 | 04F9 | C430 | 065E | 46FF |
| 0000103160 | 2606 | 0788 | C68B | F799 | 80F9 | 30C2 | 5E8B | FF06 |
| 0000103200 | 0646 | 8826 | 8B17 | 0646 | C28C | C95E | 06C2 | 9000 |
| 0000103220 | 12C8 | 0000 | E856 | FE4A | C28E | D88B | 5E89 | 8CF2 |
| 0000103240 | F446 | 8B26 | 1A47 | 0B26 | 1847 | 2E75 | 1A6A | 3C9A |
| 0000103260 | F17D | 8383 | 02C4 | 5EC4 | 26F2 | 4789 | 2618 | 5789 |
| 0000103300 | 8B1A | 26C2 | 470B | 7518 | C70B | EE46 | 19BC | 5E8C |
| 0000103320 | EBF0 | 9015 | 8B26 | 1847 | 08EB | 8B26 | 1847 | 8B26 |
| 0000103340 | 1A57 | 4689 | 89EE | F056 | 468B | 8BEE | F056 | 4689 |
| 0000103360 | 89F6 | F856 | 5EC4 | 2606 | 478B | 8B0C | D1C8 | 03E0 |
| 0000103400 | 89C1 | FA46 | 8B26 | 0847 | C88B | E0D1 | C103 | 4689 |
| 0000103420 | C7FC | FE46 | 0000 | 768B | 8BFE | FA5E | 808A | 0FBC |
| 0000103440 | 5EC4 | 26EE | 0788 | 5E8B | 8AFC | D280 | 8B0F | EE5E |
| 0000103460 | 8826 | 0447 | 46FF | FFFE | EE46 | 7E83 | 03FE | D67C |
| 0000103500 | 5E8B | 83EE | EE46 | 2604 | 07C6 | 8B20 | EE5E | 46FF |
| 0000103520 | 26EE | 07C6 | 0620 | 76FF | C4EE | 065E | FF26 | 0677 |
| 0000103540 | F7E8 | 8EFE | 8BC2 | 26D8 | 07C6 | 8D20 | 0147 | 5006 |
| 0000103560 | 5EC4 | 2606 | 77FF | E804 | FEE0 | C28E | D88B | C626 |
| 0000103600 | 3A07 | 478D | 0601 | C450 | 065E | FF26 | 0277 | C9E8 |
| 0000103620 | 8EFE | 8BC2 | 26D8 | 07C6 | 8D3A | 0147 | 5006 | 5EC4 |
| 0000103640 | 2606 | 37FF | B3E8 | 8EFE | 8BC2 | 26D8 | 07C6 | 8D20 |
| 0000103660 | 0147 | 5006 | 5EC4 | 2606 | 478B | B90A | 0064 | D88B |
| 0000103700 | F799 | 05F9 | 0013 | 8B50 | E8F3 | FE8E | 5052 | 64B9 |
| 0000103720 | 8B00 | 99C6 | F9F7 | E852 | FE80 | C28E | D88B | C626 |
| 0000103740 | 0A07 | 8943 | EE5E | 468C | 26F0 | 07C6 | 8B00 | F646 |
| 0000103760 | 568B | 5EF8 | CBC9 | 04C8 | 0000 | 76FF | FF08 | 0676 |
| 0000104000 | 1A9A | C688 | 8385 | 04C4 | 5689 | 0BFE | 74D0 | FF0F |
| 0000104020 | FE76 | 9A50 | 8440 | 8461 | C483 | EB04 | 9004 | C02B |
| 0000104040 | C999 | 90CB | 14C8 | 0000 | 5657 | 5EC4 | 2606 | 7F81 |
| 0000104060 | CE02 | 7712 | 720F | 2607 | 3F81 | A600 | 0673 | C02B |
| 0000104100 | E999 | 0222 | 9BE8 | 8EFC | 8BC2 | 89D8 | F45E | 468C |
| 0000104120 | 26F6 | 478B | 261E | 470B | 751C | 6A2D | 9A12 | 7D3C |
| 0000104140 | 8659 | C483 | C402 | F45E | 8926 | 1C47 | 8926 | 1E57 |

THU MAR 14 17:34:20 1991 FL.DLL PAGE 38, LINE 2184

| | | | | | | | | |
|---|---|---|---|---|---|---|---|---|
| 0000104160 | C28B | 0B26 | 1C47 | 0A75 | 46C7 | 90F8 | 8C0F | FA5E |
| 0000104200 | 14EB | 8B26 | 1C47 | 08EB | 8B26 | 1C47 | 8B26 | 1E57 |
| 0000104220 | 4689 | 89F8 | FA56 | E168 | 6801 | 3380 | 5EC4 | 2606 |
| 0000104240 | 77FF | 2602 | 37FF | 489A | 778D | 6A86 | 68FE | AE80 |
| 0000104260 | E168 | 6801 | 3380 | 5EC4 | 2606 | 77FF | 2602 | 37FF |
| 0000104300 | F08B | FA8B | F89A | 9D8C | C486 | F85E | 8926 | 0A47 |
| 0000104320 | 9940 | C233 | C22B | F8C1 | 3302 | 2BC2 | 8BC2 | 8BCE |
| 0000104340 | 6AF0 | 5600 | 4E89 | 89EC | EE7E | 0A9A | 3D8C | 0387 |
| 0000104360 | EC46 | D713 | 4689 | 89FC | FE56 | 468E | 83FA | FE7E |
| 0000104400 | 7D00 | 812D | FC46 | 3380 | 5681 | E1FE | 8B01 | F85E |
| 0000104420 | 8B26 | 0A47 | B940 | 0004 | F799 | 0BF9 | 75D2 | 810A |
| 0000104440 | FC46 | 5180 | 5683 | 01FE | 264E | 4FFF | EB0A | 90CE |
| 0000104460 | 5EC4 | 26F8 | 4781 | B20A | 2607 | 478B | B90A | 0004 |
| 0000104500 | D88B | F799 | 0BF9 | 75D2 | 8B25 | B9C3 | 0064 | F799 |
| 0000104520 | 0BF9 | 75D2 | 8B11 | F85E | 8B26 | 0A47 | 90B9 | 9901 |
| 0000104540 | F9F7 | D20B | 0875 | 46C7 | 5CF0 | EB0F | 9006 | 46C7 |
| 0000104560 | 76F0 | 8C0F | F25E | 5E8B | 26F8 | 6F81 | 6C0A | 6A07 |
| 0000104600 | 6801 | 5180 | 76FF | FFFE | FC76 | 709A | 538B | C487 |
| 0000104620 | F85E | 8926 | 0E47 | 016A | 8068 | 8D51 | FC46 | 5016 |
| 0000104640 | 2E9A | AF8B | C487 | F85E | C726 | 0847 | 0001 | 07EB |
| 0000104660 | 5EC4 | 26F8 | 47FF | C408 | F85E | 8B26 | 0E47 | 8B26 |
| 0000104700 | 085F | E3D1 | 7EC4 | 26F0 | 0139 | E47C | 5EC4 | 26F8 |
| 0000104720 | 4FFF | 2608 | 5F8B | C408 | F87E | 8B26 | 0E45 | E3D1 |
| 0000104740 | 7EC4 | 8BF0 | 26C8 | 012B | 5EC4 | 26F8 | 4789 | 6A06 |
| 0000104760 | 6800 | 0E10 | 76FF | FFFE | FC76 | F98B | 709A | C98B |
| 0000105000 | C487 | F85E | 8926 | 0447 | 006A | 3C6A | 006A | 1068 |
| 0000105020 | 8D0E | FC46 | 5016 | 2E9A | D68B | 5287 | 8950 | EC46 |
| 0000105040 | 5689 | 9AEE | 8B70 | 87EC | 5EC4 | 26F8 | 4789 | 6A02 |
| 0000105060 | 6A00 | FF3C | EE76 | 76FF | 9AEC | 8C3C | 85B3 | 5EC4 |
| 0000105100 | 26F8 | 0789 | 6926 | 0A47 | 016D | C703 | C603 | CA2D |
| 0000105120 | B963 | 0007 | D22B | F1F7 | 8926 | 0C57 | C726 | 1047 |
| 0000105140 | 0000 | C38B | C28C | 5F5E | CBC9 | 08C8 | 0000 | 9E9A |
| 0000105160 | 4388 | C488 | 065E | 8B26 | 2607 | 578B | 2B02 | AE06 |
| 0000105200 | 1B0F | B016 | 890F | FC46 | 5689 | 8DFE | FC46 | 5016 |
| 0000105220 | D49A | 6685 | 8388 | 04C4 | 4689 | 89F8 | FA56 | D00B |
| 0000105240 | 0675 | C02B | EB99 | 9044 | 3E83 | 0FB2 | 7400 | FF36 |
| 0000105260 | FA76 | 9A50 | 8998 | 8880 | C483 | 0B04 | 74C0 | 8126 |
| 0000105300 | FC46 | 0E10 | 5683 | 00FE | 468D | 16FC | 9A50 | 85D4 |
| 0000105320 | 8610 | C483 | 8E04 | 8BC2 | 89D8 | F85E | 468C | 26FA |
| 0000105340 | 47C7 | 0110 | 8B00 | F846 | 568B | C9FA | 90CB | 0B6A |
| 0000105360 | 85E8 | 83F9 | 02C4 | 3E83 | 19D6 | 7500 | E807 | 0022 |
| 0000105400 | 06FF | 19D6 | 0B6A | 99E8 | 83F9 | 02C4 | 90CB | 0B6A |
| 0000105420 | 65E8 | 83F9 | 02C4 | 09E8 | 6A00 | E80B | F984 | C483 |
| 0000105440 | CB02 | 04C8 | 0000 | 1E56 | A268 | 9A0F | 8132 | 890B |
| 0000105460 | C483 | 8904 | FC46 | 5689 | 0BFE | 75D0 | E903 | 00A4 |
| 0000105500 | 5EC4 | 26FC | 3F80 | 7500 | E903 | 0098 | 036A | 5006 |
| 0000105520 | 36FF | 0FB6 | 36FF | 0FB4 | 729A | 2280 | 8389 | 0AC4 |
| 0000105540 | 006A | 1068 | 830E | FC46 | FF03 | FE76 | 76FF | 9AFC |
| 0000105560 | 80D8 | 892C | C483 | 5204 | 9A50 | 8C0A | 8977 | AEA3 |
| 0000105600 | 890F | B016 | 2B0F | 8EF6 | FE46 | 5E8B | 26FC | 3880 |
| 0000105620 | 7400 | 261A | 008A | C88B | 8B98 | F6D8 | 5787 | 040E |
| 0000105640 | 0575 | F980 | 752D | 4606 | FE83 | 7C03 | 8BDD | FC5E |
| 0000105660 | 8026 | 0038 | 1874 | 036A | DE03 | 5306 | 36FF | 0FBA |
| 0000105700 | 36FF | 0FB8 | 729A | 2180 | 8388 | 0AC4 | 08EB | 1EC4 |
| 0000105720 | 0FB8 | C626 | 0007 | 1EC4 | 0FB8 | 8026 | 013F | C01B |
| 0000105740 | A340 | 0FB2 | C95E | 90C3 | 04C8 | 0000 | C456 | 065E |
| 0000105760 | 8326 | 087F | 7D03 | E903 | 00B6 | 8326 | 087F | 7E09 |
| 0000106000 | E903 | 00AC | 8326 | 087F | 7E03 | 260A | 7F83 | 0908 |
| 0000106020 | 037D | 81E9 | 2600 | 778B | 810A | 6CC6 | 8107 | C2FE |

THU MAR 14 17:34:20 1991 FL.DLL PAGE 39, LINE 2243

| | | | | | | | | |
|---|---|---|---|---|---|---|---|---|
| 0000106040 | 7E07 | 2617 | 7F83 | 0308 | 1075 | 8B26 | 085F | E3D1 |
| 0000106060 | 878B | 0F76 | 0705 | EB00 | 900B | 8B26 | 085F | E3D1 |
| 0000106100 | 878B | 0F78 | 4689 | F7FC | 03C6 | 7500 | FF03 | FC46 |
| 0000106120 | 5E8B | 2606 | 778B | 830A | 46EE | 448D | 9901 | C233 |
| 0000106140 | C22B | F8C1 | 3302 | 2BC2 | 69C2 | 6DCE | 0301 | 03C1 |
| 0000106160 | FC46 | 0405 | B900 | 0007 | F799 | 2BF9 | FC56 | DAF7 |
| 0000106200 | 8326 | 087F | 7503 | 2615 | 573B | 7C0E | 7509 | 2621 |
| 0000106220 | 7F83 | 0204 | 1A7C | 01B8 | EB00 | 9017 | 5EC4 | 8B06 |
| 0000106240 | 26C2 | 4739 | 7C0E | 75EF | 2607 | 7F83 | 0104 | E67C |
| 0000106260 | C02B | C95E | 90CB | 8B55 | 8BEC | 0E4E | 571E | E356 |
| 0000106300 | C548 | 0A76 | 7EC4 | 8B06 | 48C1 | D78B | D2F7 | C22B |
| 0000106320 | DB1B | C323 | C203 | D68B | D2F7 | C22B | DB1B | C323 |
| 0000106340 | C203 | 9140 | C12B | E9D1 | A5F3 | C913 | A4F3 | E391 |
| 0000106360 | 0B18 | 75F6 | 8C07 | 05D8 | FFFF | D88E | FF0B | C775 |
| 0000106400 | C08C | A805 | 8E8A | EBC0 | 8BBE | 0646 | 568B | 5E08 |
| 0000106420 | 1F5F | CB5D | 8B55 | 8BEC | 0C4E | 38E3 | C457 | 067E |
| 0000106440 | D78B | DAF7 | 0C74 | D12B | DB1B | D323 | D103 | D187 |
| 0000106460 | D12B | 468B | 8A0A | D1E0 | F3E9 | 13AB | F3C9 | 87AA |
| 0000106500 | E3D1 | 8C10 | 81C3 | B3C3 | 8E8A | D1C3 | F3E9 | 13AB |
| 0000106520 | F3C9 | 5FAA | 468B | 8B06 | 0856 | CB5D | 8B55 | 1EEC |
| 0000106540 | C553 | 065E | 76FF | FF0C | 0A76 | 77FF | FF02 | 0E37 |
| 0000106560 | E7E8 | 8900 | 8907 | 0257 | 1F5B | CA5D | 0008 | 8B55 |
| 0000106600 | 1EEC | C553 | 065E | 76FF | FF0C | 0A76 | 77FF | FF02 |
| 0000106620 | 0E37 | F7E8 | 8900 | 0257 | 0789 | 1F5B | CA5D | 0008 |
| 0000106640 | 8B55 | 1EEC | C553 | 065E | 078B | 578B | 8B02 | 0A4E |
| 0000106660 | E80E | 0178 | 0789 | 5789 | 5B02 | 5D1F | 06CA | 0000 |
| 0000106700 | 8B55 | 57EC | 5356 | FF33 | 468B | 0B08 | 7DC0 | 4711 |
| 0000106720 | 568B | F706 | F7D8 | 1DDA | 0000 | 4689 | 8908 | 0656 |
| 0000106740 | 468B | 0B0C | 7DC0 | 4711 | 568B | F70A | F7D8 | 1DDA |
| 0000106760 | 0000 | 4689 | 890C | 0A56 | C00B | 1575 | 4E8B | 8B0A |
| 0000107000 | 0846 | D233 | F1F7 | D88B | 468B | F706 | 8BF1 | EBD3 |
| 0000107020 | 8B38 | 8BD8 | 0A4E | 568B | 8B08 | 0646 | EBD1 | D9D1 |
| 0000107040 | EAD1 | D8D1 | DB0B | F475 | F1F7 | F08B | 66F7 | 910C |
| 0000107060 | 468B | F70A | 03E6 | 72D1 | 3B0C | 0856 | 0777 | 0672 |
| 0000107100 | 463B | 7606 | 4E01 | D233 | 4F96 | 0775 | DAF7 | D8F7 |
| 0000107120 | DA83 | 5B00 | 5F5E | CA5D | 0008 | 8B55 | 8BEC | 0846 |
| 0000107140 | 4E8B | 0B0C | 8BC8 | 0A4E | 0975 | 468B | F706 | 5DE1 |
| 0000107160 | 08CA | 5300 | E1F7 | D88B | 468B | F706 | 0C66 | D803 |
| 0000107200 | 468B | F706 | 03E1 | 5BD3 | CA5D | 0008 | 8B55 | 53EC |
| 0000107220 | 3357 | 8BFF | 0846 | C00B | 117D | 8B47 | 0656 | D8F7 |
| 0000107240 | DAF7 | 001D | 8900 | 0846 | 5689 | 8B06 | 0C46 | C00B |
| 0000107260 | 107D | 568B | F70A | F7D8 | 1DDA | 0000 | 4689 | 890C |
| 0000107300 | 0A56 | C00B | 1875 | 4E8B | 8B0A | 0846 | D233 | F1F7 |
| 0000107320 | 468B | F706 | 8BF1 | 33C2 | 4FD2 | 4379 | 48EB | D88B |
| 0000107340 | 4E8B | 8B0A | 0856 | 468B | D106 | D1EB | D1D9 | D1EA |
| 0000107360 | 0BD8 | 75DB | F7F4 | 8BF1 | F7C8 | 0C66 | F791 | 0A66 |
| 0000107400 | D103 | 0C72 | 563B | 7708 | 7207 | 3B0B | 0646 | 0676 |
| 0000107420 | 462B | 1B0A | 0C56 | 462B | 1B06 | 0856 | 794F | F707 |
| 0000107440 | F7DA | 83D8 | 00DA | 5B5F | CA5D | 0008 | ED32 | 06E3 |
| 0000107460 | E0D1 | D2D1 | FAE2 | 00CB | 8B55 | 53EC | 8B56 | 0C46 |
| 0000107500 | C00B | 1575 | 4E8B | 8B0A | 0846 | D233 | F1F7 | D88B |
| 0000107520 | 468B | F706 | 8BF1 | EBD3 | 8B38 | 8BC8 | 0A5E | 568B |
| 0000107540 | 8B08 | 0646 | E9D1 | DBD1 | EAD1 | D8D1 | C90B | F475 |
| 0000107560 | F3F7 | F08B | 66F7 | 910C | 468B | F70A | 03E6 | 72D1 |
| 0000107600 | 3B0C | 0856 | 0777 | 0672 | 463B | 7606 | 4E01 | D233 |
| 0000107620 | 5E96 | 5D5B | 08CA | 0000 | 8B55 | 53EC | 468B | 0B0C |
| 0000107640 | 75C0 | 8B15 | 0A4E | 468B | 3308 | F7D2 | 8BF1 | 0646 |
| 0000107660 | F1F7 | C28B | D233 | 45EB | C88B | 5E8B | 8B0A | 0856 |
| 0000107700 | 468B | D106 | D1E9 | D1DB | D1EA | 0BD8 | 75C9 | F7F4 |

```
THU MAR 14 17:34:20 1991  FL.DLL  PAGE 40, LINE 2302

0000107720  8BF3  F7C8  0C66  F791  0A66  D103  0C72  563B
0000107740  7708  7207  3B0B  0646  0676  462B  1B0A  0C56
0000107760  462B  1B06  0856  DAF7  D8F7  DA83  5B00  CA5D
0000110000  3C08  0300  1002  0363  6B00  0200  DE00  0188
0000110020  0000  0500  7002  0362  2500  0200  C700  0282
0000110040  0000  0300  ED01  024D  7A00  0300  3701  0432
0000110060  6B00  0200  5D00  0382  0000  0300  B401  0165
0000110100  0500  0300  4601  0250  7E00  0300  CF01  0252
0000110120  7F00  0300  4C01  0165  0700  0300  5901  0252
0000110140  8000  0300  D801  0163  0800  0300  7201  0254
0000110160  8100  0300  0B01  017B  8900  0300  5A02  0362
0000110200  7A00  0300  FA01  017C  8A00  0500  0D02  0363
0000110220  3300  0200  1300  057F  0000  0300  3F01  0182
0000110240  8C00  0300  6101  0182  8D00  0300  3F01  0252
0000110260  8600  0300  1B01  0182  8E00  0300  5101  0250
0000110300  0700  0300  1E01  0255  8700  0300  5D01  024F
0000110320  8B00  0300  C201  0246  0B00  0300  DE01  024E
0000110340  1000  0300  B801  0246  1300  0300  3401  0457
0000110360  0400  0500  F701  018A  8800  0300  DA01  017F
0000110400  2200  0300  A901  053D  0400  0300  F101  0457
0000110420  0E00  0300  CC01  0182  2600  0500  4700  014A
0000110440  0F00  034B  2C01  0563  0700  0500  E000  014D
0000110460  9100  034E  E801  0617  0500  0300  6A01  0761
0000110500  0200  0300  8301  0522  1300  0200  0A02  0363
0000110520  3300  0500  EE00  013D  9F00  033E  8B01  0661
0000110540  0F00  0300  A501  017B  3A00  0300  1E01  0251
0000110560  B300  0300  D101  0617  1400  0300  9D01  054D
0000110600  1C00  0300  5E01  0417  2500  0300  DD01  0400
0000110620  2E00  0300  6801  0435  3000  0300  A302  0362
0000110640  3D00  0300  B201  0164  4D00  0300  2901  0164
0000110660  5B00  0300  9B02  0363  4C00  0300  C101  0417
0000110700  4600  0300  9102  0353  5C00  0500  4402  0362
0000110720  1700  0300  6901  0401  5700  0300  AB01  0457
0000110740  5E00  0000  0000  0000  0000  0000  0000  0000
0000110760  0000  0000  0200  0000  0000  0000  0000  0000
0000111000  0000  0000  0000  0000  0000  0000  0000  0000
*
0000111060  0000  0000  0200  0000  0000  0000  0000  0000
0000111100  0000  0000  0000  0000  0000  0000  0000  0000
*
0000111160  0000  0000  0200  0000  0000  0000  0000  0000
0000111200  0000  0000  0000  0000  0000  0000  0000  0000
*
0000111260  0000  0000  0200  0000  0000  0000  0000  0000
0000111300  0000  0000  0000  0000  534D  5220  6E75  542D
0000111320  6D69  2065  694C  7262  7261  2079  202D  6F43
0000111340  7970  6972  6867  2074  6328  2029  3931  3039
0000111360  202C  694D  7263  736F  666F  2074  6F43  7072
0000111400  0018  5F66  6669  632E  6600  2E6C  0070  5F47
0000111420  5745  545F  4700  455F  5F57  0054  7325  545C
0000111440  0050  0042  0068  0049  FFFF  5F66  6975  665F
0000111460  6C69  6574  5F72  6F66  6D72  4700  455F  5F57
0000111500  0054  5F47  5745  545F  0000  5F66  6975  655F
0000111520  6378  5F70  6564  5F66  6F66  6D72  4700  455F
0000111540  5F57  0054  5F47  5745  545F  0000  5F66  6966
0000111560  746C  7265  0000  6666  665F  746C  2E72  0063
0000111600  6C66  702E  6900  746E  6900  746E  4600  6C69
0000111620  6574  7372  203A  2020  2500  2073  2020  6C47
0000111640  626F  6C61  4C20  6269  6172  7972  4600  6C69
```

THU MAR 14 17:34:20 1991 FL.DLL PAGE 41, LINE 2361

```
0000111660  6574  7372  203A  2020  2500  2073  2020  7325
0000111700  4E00  6D61  3A65  0000  00B6  010E  00C0  0064
0000111720  0000  0000  0000  0000  0000  0000  0000  0000
*
0000111760  0000  0000  0000  6666  695F  696E  5F74  6F66
0000112000  6D72  4700  455F  5F57  0054  5F47  5745  545F
0000112020  6F00  5F70  6F63  6564  203D  6425  203B  616E
0000112040  656D  203D  7325  6200  615F  6772  0073  7325
0000112060  2000  2020  2820  4120  494F  2020  7369  6E20
0000112100  776F  6420  7369  6C70  7961  6465  2920  0000
0000112120  6666  645F  676C  4700  455F  5F57  0054  5F47
0000112140  5745  545F  0000  6666  615F  6464  745F  5F6F
0000112160  696C  7473  4700  455F  5F57  0054  5F47  5745
0000112200  545F  0000  6666  645F  7369  5F70  6966  746C
0000112220  7265  4700  455F  5F57  0054  5F47  5745  545F
0000112240  0000  6666  655F  6172  6573  665F  6C69  6574
0000112260  0072  5F47  5745  545F  4700  455F  5F57  0054
0000112300  6946  746C  7265  7720  7361  6E20  746F  6D20
0000112320  646F  6669  6569  2E64  5320  7661  2065  6E61
0000112340  6879  776F  3F20  4600  6C69  6574  2072  6177
0000112360  2073  6F6D  6964  6966  6465  202E  6153  6576
0000112400  6320  6168  676E  7365  3F20  0000  6666  735F
0000112420  7661  5F65  736D  0067  5F47  5745  545F  4700
0000112440  455F  5F57  0054  6946  746C  7265  2073  6577
0000112460  6572  6D20  646F  6669  6569  2E64  5320  7661
0000112500  2065  6C61  206C  6863  6E61  6567  2073  003F
0000112520  6425  2520  0073  6666  735F  7661  5F65  6C61
0000112540  5F6C  736D  0067  5F47  5745  545F  4700  455F
0000112560  5F57  0054  6666  615F  6F62  7472  6D5F  6773
0000112600  6900  746E  6900  746E  0000  6666  735F  7465
0000112620  615F  6F62  7472  6F5F  0070  6E69  0074  6E69
0000112640  0074  6666  735F  7465  665F  746C  5F72  6564
0000112660  5F66  6564  7473  5500  4853  524F  0054  5355
0000112700  4F48  5452  0000  6666  715F  665F  746C  5F72
0000112720  6564  5F66  6564  7473  6900  746E  6900  746E
0000112740  2500  2073  2020  2820  2320  6425  2920  2500
0000112760  2073  2020  2820  2320  6425  202C  616C  7473
0000113000  2920  4900  6C6C  6765  6C61  6420  7461  2065
0000113020  0021  6666  735F  7465  665F  6C69  6574  0072
0000113040  6E69  0074  6E69  0074  6666  675F  7465  665F
0000113060  6C69  6574  0072  5F47  5745  545F  4700  455F
0000113100  5F57  0054  6666  6E5F  7765  665F  6C69  6574
0000113120  0072  6E69  0074  6E69  0074  6666  735F  7465
0000113140  665F  746C  5F72  696C  5F62  6469  4700  455F
0000113160  5F57  0054  5F47  5745  545F  0000  6666  735F
0000113200  7465  665F  6C69  6574  5F72  696C  7473  0000
0000113220  6666  655F  6378  2E70  0063  6C66  702E  4700
0000113240  455F  5F57  0054  5F47  5745  545F  6F00  5F70
0000113260  6F63  6564  203D  6425  203B  616E  656D  203D
0000113300  7325  6200  615F  6772  0073  6F54  6320  6E61
0000113320  6563  206C  6874  2065  706F  7265  7461  6F69
0000113340  206E  2E2E  002E  03D0  042C  03DA  010A  6565
0000113360  645F  676C  6900  746E  6900  746E  4500  6378
0000113400  7065  6974  6E6F  6320  6572  7461  6F69  006E
0000113420  7845  6563  7470  6F69  206E  616E  656D  003A
0000113440  6565  695F  696E  5F74  6F66  6D72  6900  746E
0000113460  6900  746E  4900  6C6C  6765  6C61  6420  7461
0000113500  2065  0021  6565  735F  7465  665F  6C69  6574
0000113520  0072  6E69  0074  6E69  0074  6565  675F  7465
```

```
THU MAR 14 17:34:20 1991  FL.DLL  PAGE 42, LINE 2420

0000113540  665F  6C69  6574  0072  6E69  0074  6E69  0074
0000113560  6666  735F  7465  655F  6378  5F70  696C  5F62
0000113600  6469  0000  7566  665F  746C  2E72  0063  6C66
0000113620  702E  4700  455F  5F57  0054  5F47  5745  545F
0000113640  0000  04C4  04E8  04CE  0428  0000  0000  0000
0000113660  0000  6666  755F  645F  7369  5F70  6C64  0067
0000113700  6548  706C  6E20  746F  7920  7465  6920  706D
0000113720  656C  656D  746E  6465  6900  746E  6900  746E
0000113740  4400  7461  3A65  2500  2073  7325  4400  7461
0000113760  3A65  2500  0073  6F4C  6163  6974  6E6F  003A
0000114000  7325  2820  6425  202C  6425  2029  2528  2C64
0000114020  2520  2964  0000  5F66  5F75  5F77  6C66  7274
0000114040  665F  726F  006D  6E69  0074  6E69  0074  5F66
0000114060  5F75  5F77  6C67  626F  6C61  665F  4700  455F
0000114100  5F57  0054  5F47  5745  545F  0000  6666  755F
0000114120  675F  7465  665F  726F  5F6D  6E69  6F66  4700
0000114140  455F  5F57  0054  5F47  5745  545F  0000  6666
0000114160  755F  645F  7369  5F70  6261  726F  0074  4800
0000114200  6C65  2070  6F6E  2074  6579  2074  6D69  6C70
0000114220  6D65  6E65  6574  0064  6E69  0074  6E69  0074
0000114240  6666  755F  645F  7369  696D  7373  615F  6F62
0000114260  7472  0000  7566  655F  6378  2E70  0063  6C66
0000114300  702E  4700  455F  5F57  0054  5F47  5745  545F
0000114320  0000  05F4  0618  05FE  04E4  6565  755F  645F
0000114340  7369  5F70  6C64  0067  6548  706C  6E20  746F
0000114360  7920  7465  6920  706D  656C  656D  746E  6465
0000114400  6900  746E  6900  746E  4400  7461  3A65  2500
0000114420  2073  7325  0000  5F65  5F75  5F77  7865  7063
0000114440  665F  726F  006D  5F47  5745  545F  4700  455F
0000114460  5F57  0054  6565  755F  675F  7465  665F  726F
0000114500  5F6D  6E69  6F66  0000  6666  6D5F  7369  2E63
0000114520  0063  6C66  702E  0000  0688  069E  0692  0614
0000114540  5F47  5745  545F  4700  455F  5F57  0054  6666
0000114560  715F  6C5F  7369  5F74  7962  6E5F  6D61  0065
0000114600  5F47  5745  545F  4700  455F  5F57  0054  6666
0000114620  715F  645F  7369  5F70  696C  7473  625F  5F79
0000114640  616E  656D  4700  455F  5F57  0054  5F47  5745
0000114660  545F  0000  6666  635F  7672  665F  746C  5F72
0000114700  736D  0067  5F47  5745  545F  4700  455F  5F57
0000114720  0054  6666  635F  7672  655F  6964  5F74  736D
0000114740  0067  5F47  5745  545F  4700  455F  5F57  0054
0000114760  6666  635F  7672  705F  7261  6D61  6D5F  6773
0000115000  4700  455F  5F57  0054  5F47  5745  545F  0000
0000115020  6666  635F  7672  635F  646D  6D5F  6773  4700
0000115040  455F  5F57  0054  5F47  5745  545F  6500  7272
0000115060  635F  646F  3D65  2520  0064  5F62  7261  7367
0000115100  0000  6666  645F  7369  5F70  7265  5F72  736D
0000115120  0067  0000  0000  0000  0006  0000  19E0  19DF
0000115140  0000  0005  0000  0000  0000  0000  0000  0000
0000115160  0000  0000  435F  465F  4C49  5F45  4E49  4F46
0000115200  003D  0001  FFFF  0000  0000  0000  0000  0000
0000115220  0000  0000  0000  0000  0001  8101  8181  0000
0000115240  0000  0000  0000  0000  0000  0000  0000  0000
*
0000115620  0000  0000  0000  0000  0000  0A00  0A0A  0A0A
0000115640  0A0A  0A0A  0A0A  0A0A  0A0A  0A0A  0A0A  0A0A
*
0000116220  0A0A  0A0A  0A0A  0A0A  0A0A  000A  0000  0000
0000116240  0000  0000  0000  0000  0000  0000  FF00  00FF
```

THU MAR 14 17:34:20 1991 FL.DLL PAGE 43, LINE 2479

```
0000116260  0000  0000  FFFF  FFFF  0000  0000  0A02  0000
0000116300  0000  FFFF  0001  0000  0000  0000  0000  0000
0000116320  0102  0000  0000  0000  0000  0000  0202  0000
0000116340  0000  0000  0000  0000  0000  0000  0000  0000
*
0000117220  0000  0000  0000  0000  0000  0001  0200  0000
0000117240  0000  0000  0000  0000  0000  0000  0000  0000
*
0000120160  0000  0000  0000  0000  0000  0BCE  069A  0920
0000120200  0D2D  005D  005D  0006  0600  0100  0000  0010
0000120220  0603  0600  1002  4504  4545  0505  0505  3505
0000120240  0030  0050  0000  2000  3020  5850  0807  3000
0000120260  3030  5057  0007  2000  0020  0000  0000  6008
0000120300  6060  6060  0060  7000  7870  7878  0878  0807
0000120320  0000  0007  0808  0008  0800  0800  0000  2808
0000120340  756E  6C6C  0629  0000  0000  0000  0000  0000
0000120360  0000  0000  0003  2000  6670  1008  6670  0E3A
0000120400  6670  0E3E  6670  0E42  6670  0E46  6670  0E4A
0000120420  0000  0000  0101  2000  2020  2020  2020  2020
0000120440  2828  2828  2028  2020  2020  2020  2020  2020
0000120460  2020  2020  2020  4820  1010  1010  1010  1010
0000120500  1010  1010  1010  8410  8484  8484  8484  8484
0000120520  1084  1010  1010  1010  8181  8181  8181  0101
0000120540  0101  0101  0101  0101  0101  0101  0101  0101
0000120560  0101  1010  1010  1010  8282  8282  8282  0202
0000120600  0202  0202  0202  0202  0202  0202  0202  0202
0000120620  0202  1010  1010  0020  0000  0000  0000  0000
0000120640  0000  0000  0000  0000  0000  0000  0000  0000
*
0000121020  0000  0000  0000  0000  0000  0003  FFFF  001E
0000121040  003B  005A  0078  0097  00B5  00D4  00F3  0111
0000121060  0130  014E  016D  FFFF  001E  003A  0059  0077
0000121100  0096  00B4  00D3  00F2  0110  012F  014D  016C
0000121120  0000  0000  0000  0000  0000  0000  0000  0000
0000121140  0000  5A54  0000  5350  0054  4450  0054  7080
0000121160  0000  0001  0FA6  0FBA  0FAA  1022  7553  4D6E
0000121200  6E6F  7554  5765  6465  6854  4675  6972  6153
0000121220  0074  614A  466E  6265  614D  4172  7270  614D
0000121240  4A79  6E75  754A  416C  6775  6553  4F70  7463
0000121260  6F4E  4476  6365  0000  0000  0000  0000  0000
0000121300  0000  000D  0000  6B3E  FFFF  FFFF  FFFF  100A
0000121320  100C  100E  1010  1012  1014  1016  1018  101A
0000121340  101C  0DBC  3C3C  4D4E  4753  3E3E  0000  3652
0000121360  3030  0D30  2D0A  7320  6174  6B63  6F20  6576
0000121400  6672  6F6C  0D77  000A  0003  3652  3030  0D33
0000121420  2D0A  6920  746E  6765  7265  6420  7669  6469
0000121440  2065  7962  3020  0A0D  0800  5200  3036  3830
0000121460  0A0D  202D  6F6E  2074  6E65  756F  6867  7320
0000121500  6170  6563  6620  726F  6120  6772  6D75  6E65
0000121520  7374  0A0D  0900  5200  3036  3930  0A0D  202D
0000121540  6F6E  2074  6E65  756F  6867  7320  6170  6563
0000121560  6620  726F  6520  766E  7269  6E6F  656D  746E
0000121600  0A0D  FC00  0D00  000A  00FF  7572  2D6E  6974
0000121620  656D  6520  7272  726F  0020  0002  3652  3030
0000121640  0D32  2D0A  6620  6F6C  7461  6E69  2D67  6F70
0000121660  6E69  2074  7573  7070  726F  2074  6F6E  2074
0000121700  6F6C  6461  6465  0A0D  1100  5200  3036  3731
0000121720  0A0D  202D  6E75  7865  6570  7463  6465  6D20
0000121740  6C75  6974  6874  6572  6461  6C20  636F  206B
```

THU MAR 14 17:34:20 1991 FL.DLL PAGE 44, LINE 2538

| | | | | | | | | |
|---|---|---|---|---|---|---|---|---|
| 0000121760 | 7265 | 6F72 | 0D72 | 000A | 0010 | 3652 | 3130 | 0D36 |
| 0000122000 | 2D0A | 6E20 | 746F | 6520 | 6F6E | 6775 | 2068 | 7073 |
| 0000122020 | 6361 | 2065 | 6F66 | 2072 | 6874 | 6572 | 6461 | 6420 |
| 0000122040 | 7461 | 0D61 | 000A | FFFF | 05FF | 0200 | 4E00 | 010E |
| 0000122060 | 0000 | 0200 | FC00 | 0409 | 0000 | 0200 | B600 | 050F |
| 0000122100 | 0000 | 0200 | 1E02 | 0310 | 1700 | 0200 | 2002 | 0310 |
| 0000122120 | 2500 | 4E00 | 3042 | A832 | 00C6 | 0100 | 0000 | C500 |
| 0000122140 | 0005 | 0000 | 0100 | 1900 | 745C | 3231 | 5C33 | 7061 |
| 0000122160 | 5C70 | 6C66 | 6F5C | 6A62 | 665C | 695F | 2E66 | 626F |
| 0000122200 | 016A | C600 | 4405 | 002D | 0000 | 0100 | 1C00 | 745C |
| 0000122220 | 3231 | 5C33 | 7061 | 5C70 | 6C66 | 6F5C | 6A62 | 665C |
| 0000122240 | 5F66 | 6C66 | 7274 | 6F2E | 6A62 | 0001 | 330A | 09DC |
| 0000122260 | 0000 | 0000 | 0001 | 5C1C | 3174 | 3332 | 615C | 7070 |
| 0000122300 | 665C | 5C6C | 626F | 5C6A | 6666 | 655F | 6378 | 2E70 |
| 0000122320 | 626F | 016A | E600 | 093C | 0010 | 0060 | 0100 | 1C00 |
| 0000122340 | 745C | 3231 | 5C33 | 7061 | 5C70 | 6C66 | 6F5C | 6A62 |
| 0000122360 | 665C | 5F75 | 6C66 | 7274 | 6F2E | 6A62 | 0001 | 4CF0 |
| 0000122400 | 08F5 | 0000 | 0000 | 0001 | 5C1C | 3174 | 3332 | 615C |
| 0000122420 | 7070 | 665C | 5C6C | 626F | 5C6A | 7566 | 655F | 6378 |
| 0000122440 | 2E70 | 626F | 016A | E600 | D655 | 000D | 0000 | 0100 |
| 0000122460 | 1C00 | 745C | 3231 | 5C33 | 7061 | 5C70 | 6C66 | 6F5C |
| 0000122500 | 6A62 | 665C | 5F66 | 696D | 6373 | 6F2E | 6A62 | 0001 |
| 0000122520 | 63CC | 00D1 | 0000 | 0001 | 0001 | 640B | 6C6C | 635C |
| 0000122540 | 7573 | 612E | 6D73 | 0001 | 649E | 01AF | 0000 | 0001 |
| 0000122560 | 0001 | 640E | 6C6C | 635C | 7573 | 6164 | 2E74 | 7361 |
| 0000122600 | 016D | 4E00 | 2266 | 0000 | 0100 | 0100 | 0F00 | 736F |
| 0000122620 | 5C32 | 7263 | 3074 | 736D | 2E67 | 7361 | 016D | 7000 |
| 0000122640 | 0666 | 0000 | 0100 | 0100 | 0A00 | 7263 | 3074 | 7066 |
| 0000122660 | 612E | 6D73 | 0001 | 6676 | 001A | 0000 | 0001 | 0001 |
| 0000122700 | 630A | 6B68 | 7473 | 2E6B | 7361 | 016D | 9000 | 0866 |
| 0000122720 | 0001 | 0100 | 0100 | 0D00 | 6C64 | 5C6C | 6573 | 6574 |
| 0000122740 | 766E | 2E70 | 0163 | 9800 | 6567 | 0000 | 0100 | 0100 |
| 0000122760 | 0F00 | 736F | 5C32 | 6D6E | 6773 | 6468 | 2E72 | 7361 |
| 0000123000 | 016D | FE00 | C067 | 0000 | 0100 | 0100 | 0E00 | 736F |
| 0000123020 | 5C32 | 6F64 | 7273 | 7465 | 612E | 6D73 | 0000 | 0000 |
| 0000123040 | 0000 | 0000 | 0001 | 0000 | 5F0B | 6663 | 756C | 6873 |
| 0000123060 | 612E | 6D73 | 0000 | 0000 | 0000 | 0000 | 0001 | 0000 |
| 0000123100 | 5F07 | 6966 | 656C | 632E | 0001 | 68BE | 009C | 0000 |
| 0000123120 | 0001 | 0001 | 5F0B | 6966 | 626C | 6675 | 612E | 6D73 |
| 0000123140 | 0001 | 695A | 00E5 | 0000 | 0001 | 0001 | 5F0B | 6C66 |
| 0000123160 | 6273 | 6675 | 612E | 6D73 | 0001 | 6A40 | 004B | 0000 |
| 0000123200 | 0001 | 0001 | 5F0B | 6567 | 6274 | 6675 | 612E | 6D73 |
| 0000123220 | 0001 | 6A8C | 012E | 0000 | 0001 | 0001 | 6608 | 6C66 |
| 0000123240 | 7375 | 2E68 | 0163 | BA00 | 2A6B | 0008 | 0100 | 0100 |
| 0000123260 | 0700 | 6E69 | 7570 | 2E74 | 0163 | E400 | FA73 | 0004 |
| 0000123300 | 0100 | 0100 | 0A00 | 756F | 7074 | 7475 | 612E | 6D73 |
| 0000123320 | 0001 | 78DE | 00AA | 0000 | 0001 | 0001 | 7508 | 676E |
| 0000123340 | 7465 | 2E63 | 0163 | 8800 | 7779 | 0000 | 0100 | 0100 |
| 0000123360 | 0D00 | 736F | 5C32 | 736C | 6565 | 2E6B | 7361 | 016D |
| 0000123400 | 0000 | 5D7A | 0001 | 0100 | 0100 | 0C00 | 736F | 5C32 |
| 0000123420 | 6572 | 6461 | 612E | 6D73 | 0001 | 7B5E | 01DD | 0000 |
| 0000123440 | 0001 | 0001 | 7709 | 6972 | 6574 | 612E | 6D73 | 0001 |
| 0000123460 | 7D3C | 000A | 0000 | 0001 | 0001 | 6D0A | 6C61 | 6F6C |
| 0000123500 | 2E63 | 7361 | 016D | 4600 | 0A7D | 0000 | 0100 | 0100 |
| 0000123520 | 0800 | 7266 | 6565 | 612E | 6D73 | 0001 | 7D50 | 00AF |
| 0000123540 | 0000 | 0001 | 0001 | 660B | 616D | 6C6C | 636F | 612E |
| 0000123560 | 6D73 | 0000 | 0000 | 0000 | 0000 | 0001 | 0000 | 6609 |
| 0000123600 | 6164 | 6174 | 612E | 6D73 | 0001 | 7E00 | 0034 | 0000 |
| 0000123620 | 0001 | 0001 | 690B | 696E | 7374 | 6765 | 612E | 6D73 |

THU MAR 14 17:34:20 1991 FL.DLL PAGE 45, LINE 2597

| | | | | | | | | |
|---|---|---|---|---|---|---|---|---|
| 0000123640 | 0001 | 7E34 | 0036 | 0000 | 0001 | 0001 | 6C0B | 6E69 |
| 0000123660 | 736B | 6765 | 612E | 6D73 | 0001 | 7E6A | 007C | 0000 |
| 0000123700 | 0001 | 0001 | 730C | 6165 | 6372 | 7368 | 2E67 | 7361 |
| 0000123720 | 016D | E600 | E27E | 0000 | 0100 | 0100 | 0B00 | 7267 |
| 0000123740 | 776F | 6573 | 2E67 | 7361 | 016D | C800 | 317F | 0000 |
| 0000123760 | 0100 | 0100 | 0A00 | 656E | 7377 | 6765 | 612E | 6D73 |
| 0000124000 | 0001 | 7FFA | 0036 | 0000 | 0001 | 0001 | 730A | 7274 |
| 0000124020 | 7063 | 2E79 | 7361 | 016D | 3000 | 2980 | 0000 | 0100 |
| 0000124040 | 0100 | 0A00 | 7473 | 6372 | 706D | 612E | 6D73 | 0001 |
| 0000124060 | 805A | 0017 | 0000 | 0001 | 0001 | 730A | 7274 | 656C |
| 0000124100 | 2E6E | 7361 | 016D | 7200 | 2A80 | 0000 | 0100 | 0100 |
| 0000124120 | 0B00 | 7473 | 6E72 | 7063 | 2E79 | 7361 | 016D | 9C00 |
| 0000124140 | 3B80 | 0000 | 0100 | 0100 | 0B00 | 7473 | 6E72 | 6D63 |
| 0000124160 | 2E70 | 7361 | 016D | D800 | 0380 | 0000 | 0100 | 0100 |
| 0000124200 | 0800 | 7461 | 6C6F | 612E | 6D73 | 0001 | 80DC | 0056 |
| 0000124220 | 0000 | 0001 | 0001 | 6108 | 6F74 | 2E78 | 7361 | 006D |
| 0000124240 | 0000 | 0000 | 0000 | 0100 | 0000 | 0C00 | 6D63 | 7369 |
| 0000124260 | 6463 | 7461 | 612E | 6D73 | 0000 | 0000 | 0000 | 0000 |
| 0000124300 | 0001 | 0000 | 6309 | 7974 | 6570 | 612E | 6D73 | 0001 |
| 0000124320 | 8132 | 00A6 | 0000 | 0001 | 0001 | 6708 | 7465 | 6E65 |
| 0000124340 | 2E76 | 0163 | D800 | BA81 | 0000 | 0100 | 0100 | 0D00 |
| 0000124360 | 736F | 5C32 | 6C6D | 636F | 2E6B | 7361 | 016D | 9200 |
| 0000124400 | 7A82 | 0000 | 0100 | 0100 | 1000 | 6C64 | 5C6C | 6974 |
| 0000124420 | 7464 | 6261 | 656C | 612E | 6D73 | 0001 | 830C | 0074 |
| 0000124440 | 0000 | 0001 | 0001 | 7309 | 7270 | 6E69 | 6674 | 632E |
| 0000124460 | 0001 | 8380 | 005C | 0000 | 0001 | 0001 | 7308 | 6373 |
| 0000124500 | 6E61 | 2E66 | 0163 | DC00 | 2E83 | 0000 | 0100 | 0100 |
| 0000124520 | 0A00 | 6163 | 6C6C | 636F | 612E | 6D73 | 0001 | 840A |
| 0000124540 | 019C | 0000 | 0001 | 0001 | 6109 | 6373 | 6974 | 656D |
| 0000124560 | 632E | 0001 | 85A6 | 002E | 0000 | 0001 | 0001 | 6307 |
| 0000124600 | 6974 | 656D | 632E | 0000 | 0000 | 0000 | 0000 | 0001 |
| 0000124620 | 0000 | 6406 | 7961 | 2E73 | 0163 | D400 | 4685 | 0002 |
| 0000124640 | 0100 | 0100 | 0800 | 6D67 | 6974 | 656D | 632E | 0001 |
| 0000124660 | 881A | 0084 | 0000 | 0001 | 0001 | 6C0A | 636F | 6C61 |
| 0000124700 | 6974 | 2E6D | 0163 | 9E00 | C888 | 0001 | 0100 | 0100 |
| 0000124720 | 0700 | 7A74 | 6573 | 2E74 | 0063 | 0000 | 0000 | 0000 |
| 0000124740 | 0100 | 0000 | 0900 | 6974 | 656D | 6573 | 2E74 | 0163 |
| 0000124760 | 6600 | 5E8A | 0000 | 0100 | 0100 | 0B00 | 6D68 | 6D65 |
| 0000125000 | 7063 | 2E79 | 7361 | 016D | C400 | 488A | 0000 | 0100 |
| 0000125020 | 0100 | 0B00 | 6D68 | 6D65 | 6573 | 2E74 | 7361 | 016D |
| 0000125040 | 0C00 | 228B | 0000 | 0100 | 0100 | 0900 | 6C61 | 756D |
| 0000125060 | 2E6C | 7361 | 016D | 2E00 | 228B | 0000 | 0100 | 0100 |
| 0000125100 | 0900 | 6C61 | 6572 | 2E6D | 7361 | 016D | 5000 | 1F8B |
| 0000125120 | 0000 | 0100 | 0100 | 0900 | 6C61 | 6873 | 2E6C | 7361 |
| 0000125140 | 016D | 7000 | 9A8B | 0000 | 0100 | 0100 | 0800 | 646C |
| 0000125160 | 7669 | 612E | 6D73 | 0001 | 8C0A | 0032 | 0000 | 0001 |
| 0000125200 | 0001 | 6C08 | 756D | 2E6C | 7361 | 016D | 3C00 | A08C |
| 0000125220 | 0000 | 0100 | 0100 | 0800 | 726C | 6D65 | 612E | 6D73 |
| 0000125240 | 0001 | 8CDC | 000B | 0000 | 0001 | 0001 | 6C08 | 6873 |
| 0000125260 | 2E6C | 7361 | 016D | E800 | 5F8C | 0000 | 0100 | 0100 |
| 0000125300 | 0900 | 6C75 | 6964 | 2E76 | 7361 | 016D | 4800 | 6A8D |
| 0000125320 | 0000 | 0100 | 0100 | 0900 | 6C75 | 6572 | 2E6D | 7361 |
| 0000125340 | 006D | 0100 | A600 | 1005 | 5F46 | 4955 | 465F | 4C49 |
| 0000125360 | 4554 | 5F52 | 4F46 | 4D52 | 02AE | 0001 | 05AD | 4612 |
| 0000125400 | 555F | 5F49 | 5845 | 5043 | 445F | 4645 | 465F | 524F |
| 0000125420 | E84D | 0103 | B100 | 0805 | 5F46 | 4946 | 544C | 5245 |
| 0000125440 | 18D6 | 0001 | 06E9 | 5F0F | 6666 | 615F | 6464 | 745F |
| 0000125460 | 5F6F | 696C | 7473 | 1D15 | 0001 | 06EF | 5F10 | 6666 |
| 0000125500 | 655F | 6172 | 6573 | 665F | 6C69 | 6574 | 4D72 | 011F |

THU MAR 14 17:34:20 1991 FL.DLL PAGE 46, LINE 2656

| | | | | | | | | |
|---|---|---|---|---|---|---|---|---|
| 0000125520 | F300 | 0C06 | 665F | 5F66 | 6173 | 6576 | 6D5F | 6773 |
| 0000125540 | 23C1 | 0001 | 06F8 | 5F0D | 6666 | 615F | 6F62 | 7472 |
| 0000125560 | 6D5F | 6773 | 254C | 0001 | 06FA | 5F10 | 6666 | 735F |
| 0000125600 | 7465 | 615F | 6F62 | 7472 | 6F5F | 6370 | 0126 | FB00 |
| 0000125620 | 0E06 | 665F | 5F66 | 5F71 | 6261 | 726F | 5F74 | 706F |
| 0000125640 | 2684 | 0001 | 06FD | 5F15 | 6666 | 735F | 7465 | 665F |
| 0000125660 | 746C | 5F72 | 6564 | 5F66 | 6564 | 7473 | 279B | 0001 |
| 0000125700 | 0700 | 5F13 | 6666 | 715F | 665F | 746C | 5F72 | 6564 |
| 0000125720 | 5F66 | 6564 | 7473 | 28C7 | 0001 | 0704 | 5F0E | 6666 |
| 0000125740 | 735F | 7465 | 665F | 6C69 | 6574 | BD72 | 012B | 0800 |
| 0000125760 | 0E07 | 665F | 5F66 | 6567 | 5F74 | 6966 | 746C | 7265 |
| 0000126000 | 2D3B | 0001 | ^70A | 5F0E | 6666 | 6E5F | 7765 | 665F |
| 0000126020 | 6C69 | 6574 | 5272 | 0130 | 0C00 | 1307 | 665F | 5F66 |
| 0000126040 | 6573 | 5F74 | 6C66 | 7274 | 6C5F | 6269 | 695F | 7D64 |
| 0000126060 | 0131 | 0E00 | 1307 | 665F | 5F66 | 6573 | 5F74 | 6966 |
| 0000126100 | 746C | 7265 | 6C5F | 7369 | C674 | 0105 | D800 | 0D06 |
| 0000126120 | 665F | 5F66 | 6E69 | 7469 | 665F | 726F | 7B6D | 0107 |
| 0000126140 | E200 | 0706 | 665F | 5F66 | 6C64 | 8B67 | 0136 | D700 |
| 0000126160 | 0D05 | 655F | 5F65 | 6E69 | 7469 | 665F | 726F | 166D |
| 0000126200 | 0138 | DD00 | 0E05 | 655F | 5F65 | 6573 | 5F74 | 6966 |
| 0000126220 | 746C | 7265 | 3A4A | 0001 | 05E2 | 5F0E | 6565 | 675F |
| 0000126240 | 7465 | 665F | 6C69 | 6574 | C872 | 013B | E400 | 1305 |
| 0000126260 | 665F | 5F66 | 6573 | 5F74 | 7865 | 7063 | 6C5F | 6269 |
| 0000126300 | 695F | 0A64 | 0133 | CD00 | 0705 | 655F | 5F65 | 6C64 |
| 0000126320 | E667 | 013C | CE00 | 0E06 | 665F | 5F66 | 5F75 | 6964 |
| 0000126340 | 7073 | 645F | 676C | 3E9F | 0001 | 06D5 | 460D | 5F46 |
| 0000126360 | 5F55 | 4C44 | 5F47 | 5250 | 434F | 427E | 0001 | 06D8 |
| 0000126400 | 5F0C | 6666 | 715F | 665F | 726F | 5F6D | A170 | 0142 |
| 0000126420 | DA00 | 1006 | 665F | 755F | 775F | 665F | 746C | 5F72 |
| 0000126440 | 6F66 | 6D72 | 456D | 0001 | 06E3 | 5F0F | 5F66 | 5F75 |
| 0000126460 | 5F77 | 6C67 | 626F | 6C61 | 665F | 469C | 0001 | 06E7 |
| 0000126500 | 5F0C | 6666 | 755F | 655F | 616E | 6C62 | 5465 | 0149 |
| 0000126520 | EC00 | 0D06 | 665F | 755F | 675F | 7465 | 685F | 6E77 |
| 0000126540 | 7964 | 0149 | EE00 | 1006 | 665F | 5F66 | 5F75 | 6964 |
| 0000126560 | 7073 | 615F | 6F62 | 7472 | 4B0F | 0001 | 06F0 | 460F |
| 0000126600 | 5F46 | 5F55 | 4241 | 524F | 5F54 | 5250 | 434F | 4BCF |
| 0000126620 | 0001 | 06F2 | 5F13 | 6666 | 755F | 645F | 7369 | 696D |
| 0000126640 | 7373 | 615F | 6F62 | 7472 | 4CF0 | 0001 | 0712 | 5F0E |
| 0000126660 | 6565 | 755F | 645F | 7369 | 5F70 | 6C64 | 9167 | 014E |
| 0000126700 | 1900 | 0D07 | 4545 | 555F | 445F | 474C | 505F | 4F52 |
| 0000126720 | 3343 | 0151 | 1C00 | 0C07 | 655F | 5F65 | 5F71 | 6F66 |
| 0000126740 | 6D72 | 705F | 5156 | 0001 | 071E | 5F10 | 5F65 | 5F75 |
| 0000126760 | 5F77 | 7865 | 7063 | 665F | 726F | C06D | 0155 | 2800 |
| 0000127000 | 0D07 | 655F | 755F | 675F | 7465 | 685F | 6E77 | 2864 |
| 0000127020 | 015A | 5100 | 1705 | 665F | 5F66 | 5F71 | 6964 | 7073 |
| 0000127040 | 6C5F | 7369 | 5F74 | 7962 | 6E5F | 6D61 | 4765 | 015C |
| 0000127060 | 5500 | 1005 | 665F | 5F66 | 7263 | 5F76 | 6C66 | 7274 |
| 0000127100 | 6D5F | 6773 | 5DC0 | 0001 | 0559 | 5F10 | 6666 | 635F |
| 0000127120 | 7672 | 655F | 6964 | 5F74 | 736D | 3D67 | 015F | 5B00 |
| 0000127140 | 1105 | 665F | 5F66 | 7263 | 5F76 | 6170 | 6172 | 5F6D |
| 0000127160 | 736D | AB67 | 0160 | 5F00 | 0F05 | 665F | 5F66 | 7263 |
| 0000127200 | 5F76 | 6D63 | 5F64 | 736D | 1867 | 0162 | 6300 | 1005 |
| 0000127220 | 665F | 5F66 | 6964 | 7073 | 655F | 7272 | 6D5F | 6773 |
| 0000127240 | 55E6 | 0001 | 0542 | 5F0F | 6666 | 735F | 6165 | 6372 |
| 0000127260 | 5F68 | 6C66 | 7274 | 56F4 | 0001 | 0544 | 5F12 | 6666 |
| 0000127300 | 645F | 5F62 | 6573 | 7261 | 6863 | 665F | 746C | 8372 |
| 0000127320 | 0157 | 4600 | 0D05 | 665F | 5F66 | 6173 | 6576 | 665F |
| 0000127340 | 746C | 1772 | 0158 | 4800 | 1205 | 665F | 5F66 | 5F71 |
| 0000127360 | 696C | 7473 | 625F | 5F79 | 616E | 656D | 116A | 0005 |

THU MAR 14 17:34:20 1991 FL.DLL PAGE 47, LINE 2715

| | | | | | | | | |
|---|---|---|---|---|---|---|---|---|
| 0000127400 | 0000 | 5F06 | 6465 | 7461 | E061 | 0519 | 0000 | 0400 |
| 0000127420 | 655F | 646E | 63CC | 0001 | 0000 | 4306 | 495F | 494E |
| 0000127440 | A054 | 0507 | 0000 | 0C00 | 5F5F | 686E | 6165 | 5F70 |
| 0000127460 | 6564 | 6373 | 19E0 | 0005 | 0000 | 5F0C | 7473 | 6361 |
| 0000127500 | 626B | 746F | 6F74 | C66D | 0507 | 0000 | 0C00 | 5F5F |
| 0000127520 | 615F | 4244 | 7773 | 6670 | 676C | 0792 | 0005 | 0000 |
| 0000127540 | 5F08 | 615F | 6D63 | 6C64 | C46E | 0507 | 0000 | 0800 |
| 0000127560 | 5F5F | 7361 | 6765 | 6968 | 07C2 | 0005 | 0000 | 5F08 |
| 0000127600 | 615F | 6573 | 6C67 | 9E6F | 0507 | 0000 | 0800 | 5F5F |
| 0000127620 | 7361 | 7A69 | 7364 | 079C | 0005 | 0000 | 5F08 | 615F |
| 0000127640 | 6F74 | 7370 | B470 | 0507 | 0000 | 0900 | 5F5F | 6361 |
| 0000127660 | 6966 | 666E | D66F | 00D6 | 0100 | 0900 | 5F5F | 4461 |
| 0000127700 | 7542 | 6573 | 9464 | 0507 | 0000 | 0900 | 5F5F | 6561 |
| 0000127720 | 766E | 6573 | 9867 | 0507 | 0000 | 0A00 | 5F5F | 6874 |
| 0000127740 | 6572 | 6461 | 6469 | 0796 | 0005 | 0000 | 5F0A | 675F |
| 0000127760 | 6E69 | 6F66 | 6573 | D667 | 00D6 | 0100 | 0A00 | 5F5F |
| 0000130000 | 4461 | 6442 | 736F | 7077 | 079A | 0005 | 0000 | 5F0A |
| 0000130020 | 6C5F | 6E69 | 6F66 | 6573 | 7667 | 0098 | 0100 | 0A00 |
| 0000130040 | 5F5F | 6361 | 7472 | 7375 | 6465 | 07C8 | 0005 | 0000 |
| 0000130060 | 5F0B | 5F5F | 4461 | 7242 | 6574 | 7272 | 643D | 0001 |
| 0000130100 | 0000 | 5F0B | 615F | 736D | 5F67 | 7865 | 7469 | 07D6 |
| 0000130120 | 0005 | 0000 | 5F0B | 6F5F | 7673 | 7265 | 6973 | 6E6F |
| 0000130140 | 6557 | 0001 | 0000 | 5F06 | 655F | 6978 | 0974 | 0166 |
| 0000130160 | 0000 | 0C00 | 5F5F | 6E75 | 6F6C | 6B63 | 7865 | 7469 |
| 0000130200 | 09E9 | 0005 | 0000 | 5F07 | 635F | 6968 | 646C | 07D9 |
| 0000130220 | 0005 | 000C | 5F07 | 6E5F | 6966 | 656C | 649E | 0001 |
| 0000130240 | 0000 | 5F07 | 635F | 6E69 | 7469 | 09DB | 0005 | 0000 |
| 0000130260 | 5F07 | 5F5F | 7261 | 6367 | 655F | 0001 | 0000 | 5F07 |
| 0000130300 | 635F | 7865 | 7469 | 07D6 | 0005 | 0000 | 5F0D | 645F |
| 0000130320 | 736F | 6576 | 6D72 | 6A61 | 726F | 09DD | 0005 | 0000 |
| 0000130340 | 5F07 | 5F5F | 7261 | 7667 | 07D7 | 0005 | 0000 | 5F0D |
| 0000130360 | 645F | 736F | 6576 | 6D72 | 6E69 | 726F | 08DB | 0005 |
| 0000130400 | 0000 | 5F08 | 705F | 7069 | 6365 | E168 | 0509 | 0000 |
| 0000130420 | 0800 | 655F | 766E | 7269 | 6E6F | 07DB | 0005 | 0000 |
| 0000130440 | 5F08 | 6F5F | 6673 | 6C69 | D865 | 0507 | 0000 | 0800 |
| 0000130460 | 5F5F | 736F | 6F6D | 6564 | 64F8 | 0001 | 0000 | 5F08 |
| 0000130500 | 695F | 696E | 6674 | FA70 | 050F | 0000 | 0800 | 5F5F |
| 0000130520 | 7066 | 6E69 | 7469 | 662C | 0001 | 0000 | 5F08 | 745F |
| 0000130540 | 7265 | 666D | E570 | 0509 | 0000 | 0800 | 5F5F | 6770 |
| 0000130560 | 706D | 7274 | 6569 | 0001 | 0000 | 5F08 | 635F | 655F |
| 0000130600 | 6978 | D874 | 0507 | 0000 | 0900 | 5F5F | 6F64 | 6D73 |
| 0000130620 | 646F | D665 | 0507 | 0000 | 0900 | 5F5F | 736F | 616D |
| 0000130640 | 6F6A | D772 | 0507 | 0000 | 0900 | 5F5F | 736F | 696D |
| 0000130660 | 6F6E | EB72 | 0509 | 0000 | 0A00 | 5F5F | 7865 | 7469 |
| 0000130700 | 6F64 | 656E | 65BF | 0001 | 0000 | 5F0A | 6C5F | 636F |
| 0000130720 | 656B | 6978 | D474 | 0507 | 0000 | 0A00 | 5F5F | 6D75 |
| 0000130740 | 7361 | 766B | 6C61 | 662C | 0001 | 0000 | 5F0A | 635F |
| 0000130760 | 6574 | 6D72 | 7573 | ED62 | 0509 | 0000 | 0A00 | 5F5F |
| 0000131000 | 7865 | 7469 | 745F | 6469 | 07CA | 0005 | 0000 | 5F05 |
| 0000131020 | 665F | 6361 | 6550 | 0001 | 0000 | 5F05 | 7865 | 7469 |
| 0000131040 | 664E | 0001 | 0000 | 5F0E | 465F | 5F46 | 534D | 4247 |
| 0000131060 | 4E41 | 454E | F052 | 0509 | 0000 | 0900 | 5F5F | 6461 |
| 0000131100 | 6762 | 736D | 7667 | 0098 | 0100 | 0900 | 5F5F | 6361 |
| 0000131120 | 7472 | 736D | 7067 | 0166 | 0000 | 0800 | 5F5F | 7066 |
| 0000131140 | 7274 | 7061 | 09F4 | 0005 | 0000 | 5F0C | 615F | 6C61 |
| 0000131160 | 7374 | 6B74 | 766F | 7672 | 0166 | 0000 | 0800 | 5F5F |
| 0000131200 | 6863 | 736B | 6B74 | 6676 | 0001 | 0000 | 5F0A | 615F |
| 0000131220 | 6346 | 6B68 | 7473 | 906B | 0166 | 0000 | 0900 | 5F5F |
| 0000131240 | 6573 | 6574 | 766E | 9870 | 0167 | 0000 | 0B00 | 5F5F |

THU MAR 14 17:34:20 1991 FL.DLL PAGE 48, LINE 2774

| | | | | | | | | |
|---|---|---|---|---|---|---|---|---|
| 0000131260 | 4D4E | 4753 | 545F | 5845 | C854 | 0167 | 0000 | 0C00 |
| 0000131300 | 5F5F | 4D4E | 4753 | 575F | 4952 | 4554 | 68AA | 0001 |
| 0000131320 | 0000 | 5F0B | 5F5F | 6F64 | 6573 | 7272 | 6F6E | 68B2 |
| 0000131340 | 0001 | 0000 | 5F07 | 655F | 7272 | 6F6E | 6863 | 0001 |
| 0000131360 | 0000 | 5F08 | 645F | 736F | 6572 | 4A74 | 0168 | 0000 |
| 0000131400 | 0900 | 5F5F | 6F64 | 7273 | 7465 | F866 | 0509 | 0000 |
| 0000131420 | 0800 | 5F5F | 6663 | 756C | 6873 | 0000 | 0004 | 0000 |
| 0000131440 | 5F07 | 625F | 6675 | 6E69 | 09FA | 0005 | 0000 | 5F05 |
| 0000131460 | 695F | 626F | 0BDA | 0005 | 0000 | 5F06 | 695F | 626F |
| 0000131500 | BA32 | 050D | 0000 | 0900 | 5F5F | 616C | 7473 | 6F69 |
| 0000131520 | BE62 | 0168 | 0000 | 0800 | 5F5F | 6966 | 626C | 6675 |
| 0000131540 | 695A | 0001 | 0000 | 5F08 | 665F | 736C | 7562 | 4066 |
| 0000131560 | 016A | 0000 | 0800 | 5F5F | 6567 | 6274 | 6675 | 6AD2 |
| 0000131600 | 0001 | 0000 | 5F0B | 665F | 6C66 | 7375 | 5F68 | 6B6C |
| 0000131620 | 6A8C | 0001 | 0000 | 5F07 | 6666 | 756C | 6873 | 6B3E |
| 0000131640 | 0001 | 0000 | 5F09 | 6C66 | 7375 | 6168 | 6C6C | 6BBA |
| 0000131660 | 0001 | 0000 | 5F07 | 695F | 706E | 7475 | 73F4 | 0001 |
| 0000131700 | 0000 | 5F08 | 6F5F | 7475 | 7570 | DE74 | 0178 | 0000 |
| 0000131720 | 0700 | 755F | 676E | 7465 | 1E63 | 0179 | 0000 | 0B00 |
| 0000131740 | 5F5F | 6E75 | 6567 | 6374 | 6C5F | 926B | 0179 | 0000 |
| 0000131760 | 0600 | 6C5F | 6573 | 6B65 | 7988 | 0001 | 0000 | 5F0A |
| 0000132000 | 6C5F | 6573 | 6B65 | 6C5F | 006B | 017A | 0000 | 0500 |
| 0000132020 | 725F | 6165 | 6864 | 017B | 0000 | 0600 | 775F | 6972 |
| 0000132040 | 6574 | 7B5E | 0001 | 0000 | 5F0A | 775F | 6972 | 6574 |
| 0000132060 | 6C5F | 3C6B | 017D | 0000 | 0700 | 6D5F | 6C61 | 6F6C |
| 0000132100 | 4163 | 017D | 0000 | 0A00 | 6D5F | 6C61 | 6F6C | 5F63 |
| 0000132120 | 6B6C | 7D4B | 0001 | 0000 | 5F08 | 7266 | 6565 | 6C5F |
| 0000132140 | 466B | 017D | 0000 | 0500 | 665F | 6572 | 8265 | 017D |
| 0000132160 | 0000 | 0C00 | 5F5F | 6D66 | 6C61 | 6F6C | 5F63 | 6B6C |
| 0000132200 | 7D50 | 0001 | 0000 | 5F07 | 665F | 7266 | 6565 | 7D63 |
| 0000132220 | 0001 | 0000 | 5F09 | 665F | 616D | 6C6C | 636F | 7D50 |
| 0000132240 | 0001 | 0000 | 5F0A | 665F | 7266 | 6565 | 6C5F | 286B |
| 0000132260 | 050E | 0000 | 0700 | 5F5F | 6866 | 6165 | 0070 | 017E |
| 0000132300 | 0000 | 0900 | 5F5F | 6E69 | 7469 | 6573 | 3467 | 017E |
| 0000132320 | 0000 | 0900 | 5F5F | 696C | 6B6E | 6573 | 6A67 | 017E |
| 0000132340 | 0000 | 0B00 | 5F5F | 6573 | 7261 | 6863 | 6573 | 7567 |
| 0000132360 | 017F | 0000 | 0800 | 5F5F | 6E69 | 7363 | 6765 | 7EE6 |
| 0000132400 | 0001 | 0000 | 5F09 | 675F | 6F72 | 7377 | 6765 | 7FA8 |
| 0000132420 | 0001 | 0000 | 5F0A | 665F | 6E69 | 6C64 | 7361 | 3674 |
| 0000132440 | 050E | 0000 | 0A00 | 5F5F | 6D61 | 6C62 | 736B | 7A69 |
| 0000132460 | 7FC8 | 0001 | 0000 | 5F08 | 6E5F | 7765 | 6573 | FA67 |
| 0000132500 | 017F | 0000 | 0700 | 735F | 7274 | 7063 | 3079 | 0180 |
| 0000132520 | 0000 | 0700 | 735F | 7274 | 6D63 | 5A70 | 0180 | 0000 |
| 0000132540 | 0700 | 735F | 7274 | 656C | 726E | 0180 | 0000 | 0800 |
| 0000132560 | 735F | 7274 | 636E | 7970 | 809C | 0001 | 0000 | 5F08 |
| 0000132600 | 7473 | 6E72 | 6D63 | D870 | 0180 | 0000 | 0500 | 615F |
| 0000132620 | 6F74 | DC6C | 0180 | 0000 | 0700 | 5F5F | 6163 | 6F74 |
| 0000132640 | 3878 | 050E | 0000 | 0D00 | 5F5F | 6663 | 746C | 7663 |
| 0000132660 | 5F74 | 6174 | 5462 | 050E | 0000 | 0800 | 5F5F | 7361 |
| 0000132700 | 7A69 | 4365 | 0E55 | 0005 | 0000 | 5F08 | 615F | 6973 |
| 0000132720 | 657A | 5244 | 050E | 0000 | 0B00 | 5F5F | 6973 | 6967 |
| 0000132740 | 746E | 666F | 5066 | 050E | 0000 | 0B00 | 5F5F | 6973 |
| 0000132760 | 6967 | 746E | 6573 | 5667 | 050E | 0000 | 0700 | 5F5F |
| 0000133000 | 7463 | 7079 | 5665 | 050E | 0000 | 0800 | 5F5F | 7463 |
| 0000133020 | 7079 | 5F65 | 8132 | 0001 | 0000 | 5F07 | 6567 | 6574 |
| 0000133040 | 766E | 8228 | 0001 | 0000 | 5F06 | 6C5F | 636F | 726B |
| 0000133060 | 0182 | 0000 | 0700 | 5F5F | 6F6C | 6B63 | FC66 | 0181 |
| 0000133100 | 0000 | 0D00 | 5F5F | 6E75 | 6F6C | 6B63 | 665F | 6C69 |
| 0000133120 | D865 | 0181 | 0000 | 0D00 | 5F5F | 6F6C | 6B63 | 735F |

THU MAR 14 17:34:20 1991 FL.DLL PAGE 49, LINE 2833

```
0000133140  7274  6165  526D  0182  0000  0800  5F5F  6E75
0000133160  6F6C  6B63  0F58  0005  0000  5F09  6C5F  636F
0000133200  636B  746E  8282  0001  0000  5F09  755F  6C6E
0000133220  636F  666B  81E4  0001  0000  5F0F  755F  6C6E
0000133240  636F  5F6B  7473  6572  6D61  8208  0001  0000
0000133260  5F0A  775F  6961  6C74  636F  F06B  0181  0000
0000133300  0B00  5F5F  6F6C  6B63  665F  6C69  9265  0182
0000133320  0000  0B00  5F5F  6567  7474  6469  6174  5A62
0000133340  050F  0000  0B00  5F5F  6974  7464  6261  616D
0000133360  0C78  0183  0000  0800  735F  7270  6E69  6674
0000133400  8380  0001  0000  5F07  7373  6163  666E  83DC
0000133420  0001  0000  5F07  6163  6C6C  636F  8440  0001
0000133440  0000  5F08  7361  7463  6D69  A665  0185  0000
0000133460  0600  635F  6974  656D  0F76  0005  0000  5F06
0000133500  645F  7961  5C73  050F  0000  0800  5F5F  706C
0000133520  6164  7379  85D4  0001  0000  5F07  6D67  6974
0000133540  656D  881A  0001  0000  5F0A  6F6C  6163  746C
0000133560  6D69  BE65  0188  0000  0600  745F  737A  7465
0000133600  8998  0001  0000  5F09  695F  6973  646E  7473
0000133620  889E  0001  0000  5F08  5F5F  7A74  6573  B274
0000133640  050F  0000  0900  645F  7961  696C  6867  AE74
0000133660  050F  0000  0900  745F  6D69  7A65  6E6F  B465
0000133700  050F  0000  0700  745F  6E7A  6D61  BC65  050F
0000133720  0000  0900  5F5F  645F  616E  656D  D273  050F
0000133740  0000  0900  5F5F  6D5F  616E  656D  6673  018A
0000133760  0000  0700  6D5F  6D65  7063  C479  018A  0000
0000134000  0700  6D5F  6D65  6573  0C74  018B  0000  0A00
0000134020  5F5F  4661  6146  6D6C  6C75  8B0C  0001  0000
0000134040  5F0B  615F  4646  7561  6D6C  6C75  8B2E  0001
0000134060  0000  5F0A  615F  4646  6C61  6572  506D  018B
0000134100  0000  0A00  5F5F  4661  6146  736C  6C68  8B70
0000134120  0001  0000  5F08  615F  6C46  6964  0A76  018C
0000134140  0000  0800  5F5F  4661  6D6C  6C75  8C0A  0001
0000134160  0000  5F09  615F  7546  6D6C  6C75  8C3C  0001
0000134200  0000  5F08  615F  6C46  6572  DC6D  018C  0000
0000134220  0800  5F5F  4661  736C  6C68  8CE8  0001  0000
0000134240  5F09  615F  7546  646C  7669  8D48  0001  0000
0000134260  5F09  615F  7546  726C  6D65  0101  8000  0101
0000134300  8000  1601  7900  0330  0383  8302  0204  0A82
0000134320  7528  746E  6761  6567  2964  0169  000A  837F
0000134340  0081  8183  8300  0081  1C01  7F00  0682  6170
0000134360  6B63  685F  8200  6606  6C69  5F65  0268  0682
0000134400  7566  636E  685F  0104  0001  0180  0001  0180
0000134420  0001  0180  0001  0180  0001  0180  0001  0180
*
0000134620  0001  0180  0005  3878  8083  0100  0005  2878
0000134640  8083  0100  0001  0180  0001  0180  0001  0180
0000134660  0001  0180  0001  0180  0001  0180  0001  0180
*
0000135100  0001  0180  0001  0180  0001  0180  0007  8578
0000135120  0100  8083  0100  0001  0180  0001  0180  0001
0000135140  0180  0001  0180  0001  0180  0001  0180  0001
*
0000137300  0180  0001  0180  0007  737A  7283  8203  0100
0000137320  000A  8075  8183  6400  8300  0201  0101  8000
0000137340  0101  8000  0101  8000  0101  8000  0101  8000
*
0000140700  0101  8000  0101  8000  1601  7900  0220  2F83
0000140720  8304  0430  0A82  7528  746E  6761  6567  2964
```

```
THU MAR 14 17:34:20 1991  FL.DLL  PAGE 50, LINE 2892

0000140740  0169  0007  837F  0081  8183  0100  0009  827F
0000140760  7801  8200  7901  0102  0016  4079  8302  0432
0000141000  3383  8204  280A  6E75  6174  6767  6465  6929
0000141020  0701  7F00  2E83  8304  042E  0D01  7F00  0382
0000141040  696D  006E  0382  616D  0478  0101  8000  0101
0000141060  8000  0101  8000  0101  8000  0101  8000  0101
*
0000141620  8000  0101  8000  0101  8000  0101  8000  1801
0000141640  7900  C085  0702  9383  8304  0494  0A82  7528
0000141660  746E  6761  6567  2964  0169  0007  8578  0120
0000141700  8483  0100  0016  837F  0086  5483  8302  0431
0000141720  8183  8300  0081  8283  8300  0492  3801  7F00
0000141740  0282  6469  8200  6E04  6D61  0465  0482  6572
0000141760  7463  8224  6104  7474  2C72  0582  7564  6D6D
0000142000  2E79  0A82  6974  656D  735F  6174  706D  8230
0000142020  7305  6170  6572  0134  0001  0180  0001  0180
0000142040  0001  0180  0001  0180  0001  0180  0001  0180
0000142060  0007  737A  9183  8204  0100  0001  0180  0001
0000142100  0180  0001  0180  0001  0180  0001  0180  0001
*
0000142340  0180  0001  0180  0001  0180  0001  0180  001B
0000142360  2079  8309  04CA  CB83  8204  690F  755F  6D5F
0000142400  6773  705F  7261  6D61  745F  0169  001C  837F
0000142420  0081  8583  8300  0082  8683  8300  0088  8083
0000142440  8300  0084  C083  8300  00C0  6A01  7F00  0982
0000142460  5F69  5F75  6873  726F  0074  0A82  5F69  5F75
0000142500  7375  6F68  7472  8200  6908  755F  6C5F  6E6F
0000142520  0067  0982  5F69  5F75  6C75  6E6F  0067  0982
0000142540  5F69  5F75  6C66  616F  0074  0882  5F69  5F75
0000142560  6863  7261  8200  6909  755F  755F  6863  7261
0000142600  8200  6907  755F  735F  7274  8200  6909  755F
0000142620  625F  6F6C  6B63  0100  0019  3079  8302  04CD
0000142640  CE83  8204  690D  6D5F  6773  705F  7261  6D61
0000142660  745F  0169  0007  837F  0085  C983  0104  0010
0000142700  827F  7404  7079  0065  0582  6176  756C  0265
0000142720  0101  8000  1C01  7900  9085  0900  D183  8304
0000142740  04D2  0E82  5F69  736D  5F67  6568  6461  7265
0000142760  745F  0169  001C  837F  0081  8183  8300  0085
0000143000  8583  8300  0084  8583  8300  0085  8183  8300
0000143020  0085  4701  7F00  0482  5F71  6469  8200  7306
0000143040  756F  6372  0265  0382  6970  0464  0382  6974
0000143060  0664  0482  6572  7073  8208  7208  7365  5F70
0000143100  6974  0A64  0782  706F  635F  646F  0C65  0482
0000143120  7974  6570  820E  7304  7A69  1065  1501  7900
0000143140  C085  0200  D583  8304  04D6  0782  5F69  736D
0000143160  5F67  6974  0501  7800  8330  04CC  0701  7F00
0000143200  D083  8304  04D4  1701  7F00  0682  6568  6461
0000143220  7265  8200  700A  7261  6D61  6C5F  7369  1274
0000143240  0101  8000  0101  8000  0101  8000  0701  7A00
0000143260  6373  04D3  0082  0101  8000  0101  8000  0101
0000143300  8000  0101  8000  0101  8000  0101  8000  0101
*
0000143500  8000  0701  7800  0085  8308  0080  0101  8000
0000143520  0101  8000  0101  8000  0101  8000  0101  8000
*
0000144300  1C01  7900  7085  0C10  5F83  8305  0560  0E82
0000144320  665F  665F  746C  5F72  6F66  6D72  745F  0169
0000144340  0007  8578  0328  8083  0100  0005  4078  8183
0000144360  0100  0025  837F  0085  8583  8300  055D  5D83
```

```
THU MAR 14 17:34:20 1991  FL.DLL  PAGE 51, LINE 2951

0000144400  8305  055D  8583  8300  055E  8183  8300  0085
0000144420  8583  8300  055D  5D83  0105  0079  827F  6902
0000144440  0064  0882  6C67  626F  6C61  665F  8202  7405
0000144460  7469  656C  8204  6E0A  6D61  5F65  6974  6C74
0000144500  6965  0482  616E  656D  CE85  8200  6406  7369
0000144520  5F70  8566  0134  0382  6F6C  8563  0136  0482
0000144540  7461  7274  3E85  8201  6105  696F  665F  4085
0000144560  8201  6D06  7361  5F6B  8566  0142  0882  6164
0000144600  6574  735F  7274  4485  8201  6C07  636F  735F
0000144620  7274  A985  0101  0001  0180  001C  8579  0D20
0000144640  8308  0563  6483  8205  5F0E  5F66  7865  7063
0000144660  665F  726F  5F6D  6974  1901  7F00  8583  8300
0000144700  055D  5D83  8305  055D  5E83  8305  0081  8583
0000144720  8300  055D  4901  7F00  0282  6469  8200  7405
0000144740  7469  656C  8202  6E0A  6D61  5F65  6974  6C74
0000144760  6765  0482  616E  656D  CC85  8200  6C03  636F
0000145000  3285  8201  6104  7474  8572  013A  0682  616D
0000145020  6B73  665F  3C85  8201  6404  7461  8565  013E
0000145040  0101  8000  0101  8000  0101  8000  0101  8000
*
0000145160  0101  8000  0701  7A00  8373  0562  0082  0101
0000145200  8000  0101  8000  0101  8000  0101  8000  0101
*
0000145440  8000  0101  8000  0401  7F00  C083  0100  000A
0000145460  8075  8183  7300  8301  05A5  0101  8000  0101
0000145500  8000  0701  7800  8885  8300  0080  0501  7800
0000145520  8360  0082  0501  7800  8330  0080  0401  7F00
0000145540  C083  0100  000A  8075  8183  7300  8301  05AC
0000145560  0101  8000  0701  7800  9885  8300  0080  0401
0000145600  7F00  DA83  0104  000A  8075  8183  7300  8301
0000145620  05B0  0101  8000  0501  7800  8348  0080  0A01
0000145640  7500  8380  0081  0064  0183  0102  0001  0180
0000145660  0016  3079  8303  0203  0483  8202  280A  6E75
0000145700  6174  6767  6465  6929  0A01  7F00  8183  8300
0000145720  0081  8183  0100  001C  827F  7006  6361  5F68
0000145740  0068  0682  6966  656C  685F  8202  6606  6E75
0000145760  5F63  0468  0101  8000  0101  8000  0101  8000
0000146000  0101  8000  0101  8000  0101  8000  0101  8000
*
0000146200  0501  7800  8350  0080  0501  7800  8328  0080
0000146220  0101  8000  0101  8000  0101  8000  0101  8000
*
0000146440  0101  8000  0501  7800  8368  0080  0101  8000
0000146460  0101  8000  0101  8000  0101  8000  0701  7800
0000146500  0085  8301  0080  0101  8000  0101  8000  0101
0000146520  8000  0101  8000  0101  8000  0101  8000  0101
*
0000146760  8300  0101  8000  0101  8000  0101  8000  0501
0000147000  7800  8360  0080  0101  8000  0101  8000  0101
0000147020  8000  0101  8000  0101  8000  0101  8000  0101
*
0000153540  8000  0101  8000  0101  8000  0101  8000  0701
0000153560  7A00  8373  04DF  0082  0A01  7500  8380  0081
0000153600  0064  0183  0102  0001  0180  0001  0180  0001
0000153620  0180  0001  0180  0001  0180  0001  0180  0001
*
0000154200  0180  0001  0180  0001  0180  0001  0180  000A
0000154220  8075  8183  6400  8300  0201  0101  8000  0101
0000154240  8000  0101  8000  0101  8000  0101  8000  0101
```

```
THU MAR 14 17:34:20 1991  FL.DLL  PAGE 52, LINE 3010

*
0000154700  8000  0101  8000  0101  8000  0101  8000  1601
0000154720  7900  0220  7183  8305  0572  0A82  7528  746E
0000154740  6761  6567  2964  0169  0007  837F  0081  8183
0000154760  0100  0009  827F  7801  8200  7901  0102  0016
0000155000  4079  8302  0574  7583  8205  280A  6E75  6174
0000155020  6767  6465  6929  0701  7F00  7083  8305  0570
0000155040  0D01  7F00  0382  696D  006E  0382  616D  0478
0000155060  0101  8000  0101  8000  0101  8000  0101  8000
*
0000155400  0101  8000  1801  7900  C085  0702  AD83  8305
0000155420  05AE  0A82  7528  746E  6761  6567  2964  0169
0000155440  0007  8578  0120  8483  0100  0016  837F  0086
0000155460  5483  8302  0573  8183  8300  0081  8283  8300
0000155500  05AC  3801  7F00  0282  6469  8200  6E04  6D61
0000155520  0465  0482  6572  7463  8224  6104  7474  2C72
0000155540  0582  7564  6D6D  2E79  0A82  6974  656D  735F
0000155560  6174  706D  8230  7305  6170  6572  0134  0001
0000155600  0180  0001  0180  0001  0180  0001  0180  0001
0000155620  0180  0001  0180  0007  737A  AB83  8205  0100
0000155640  0001  0180  0001  0180  0001  0180  0001  0180
0000155660  0001  0180  0001  0180  0007  737A  5483  8202
0000155700  0100  0001  0180  0001  0180  0001  0180  0001
0000155720  0180  0001  0180  0001  0180  0001  0180  0001
*
0000156040  0180  0001  0180  0018  8579  02D0  8302  05D7
0000156060  D883  8205  280A  6E75  6174  6767  6465  6929
0000156100  0701  7F00  AB83  8305  0081  1101  7F00  0682
0000156120  6966  746C  7265  8200  6D04  646F  5865  0101
0000156140  8000  0101  8000  1B01  7900  0920  DC83  8305
0000156160  05DD  0F82  5F69  5F75  736D  5F67  6170  6172
0000156200  5F6D  6974  1C01  7F00  8183  8300  0085  8283
0000156220  8300  0086  8883  8300  0080  8483  8300  00C0
0000156240  C083  0100  006A  827F  6909  755F  735F  6F68
0000156260  7472  8200  690A  755F  755F  6873  726F  0074
0000156300  0882  5F69  5F75  6F6C  676E  8200  6909  755F
0000156320  755F  6F6C  676E  8200  6909  755F  665F  6F6C
0000156340  7461  8200  6908  755F  635F  6168  0072  0982
0000156360  5F69  5F75  6375  6168  0072  0782  5F69  5F75
0000156400  7473  0072  0982  5F69  5F75  6C62  636F  006B
0000156420  1901  7900  0230  DF83  8305  05E0  0D82  5F69
0000156440  736D  5F67  6170  6172  5F6D  6974  0701  7F00
0000156460  8583  8300  05DB  1001  7F00  0482  7974  6570
0000156500  8200  7605  6C61  6575  0102  0001  0180  001C
0000156520  8579  0090  8309  05E3  E483  8205  690E  6D5F
0000156540  6773  685F  6165  6564  5F72  6974  1C01  7F00
0000156560  8183  8300  0081  8583  8300  0085  8483  8300
0000156600  0085  8583  8300  0081  8583  0100  0047  827F
0000156620  7104  695F  0064  0682  6F73  7275  6563  8202
0000156640  7003  6469  8204  7403  6469  8206  7204  7365
0000156660  0870  0882  6572  7073  745F  6469  820A  6F07
0000156700  5F70  6F63  6564  820C  7404  7079  0E65  0482
0000156720  6973  657A  0110  0015  8579  00C0  8302  05E7
0000156740  E883  8205  6907  6D5F  6773  745F  0169  0005
0000156760  3078  DE83  0105  0007  837F  05E2  E683  0105
0000157000  0017  827F  6806  6165  6564  0072  0A82  6170
0000157020  6172  5F6D  696C  7473  0112  0001  0180  0001
0000157040  0180  0001  0180  0007  737A  E583  8205  0100
0000157060  0001  0180  0001  0180  0001  0180  0001  0180
```

THU MAR 14 17:34:20 1991 FL.DLL PAGE 53, LINE 3069

```
*
0000157560  0001  0180  0001  0180  0007  8578  0800  8083
0000157600  0100  0001  0180  0001  0180  0001  0180  0001
0000157620  0180  0001  0180  0001  0180  0001  0180  0001
*
0000160240  0180  0001  0180  001C  8579  1070  830C  068C
0000160260  8D83  8206  5F0E  5F66  6C66  7274  665F  726F
0000160300  5F6D  6974  0701  7800  2885  8303  0080  0501
0000160320  7800  8340  0081  2501  7F00  8583  8300  0085
0000160340  8A83  8306  068A  8A83  8306  0085  8B83  8306
0000160360  0081  8583  8300  0085  8A83  8306  068A  7901
0000160400  7F00  0282  6469  8200  6708  6F6C  6162  5F6C
0000160420  0266  0582  6974  6C74  0465  0A82  616E  656D
0000160440  745F  7469  656C  8269  6E04  6D61  8565  00CE
0000160460  0682  6964  7073  665F  3485  8201  6C03  636F
0000160500  3685  8201  6104  7474  8572  013E  0582  6F61
0000160520  5F69  8566  0140  0682  616D  6B73  665F  4285
0000160540  8201  6408  7461  5F65  7473  8572  0144  0782
0000160560  6F6C  5F63  7473  8572  01A9  0101  8000  0101
0000160600  8000  0101  8000  0101  8000  0101  8000  0701
0000160620  7A00  8373  0689  0082  0101  8000  0101  8000
0000160640  0101  8000  0101  8000  0101  8000  0101  8000
*
0000161220  0701  7800  8085  830C  05B5  0701  7800  4085
0000161240  8306  0085  0101  8000  0A01  7500  8380  0081
0000161260  0364  D683  0106  000A  837F  0081  B583  8305
0000161300  00C1  0701  7F00  9383  8306  00C0  0A01  7500
0000161320  8380  0200  0264  D783  0106  0001  0180  0001
0000161340  0180  0005  2078  8083  0100  0005  6078  8283
0000161360  0100  0007  8578  00A0  8083  0100  0005  6078
0000161400  8083  0100  0005  4078  8083  0100  0005  3078
0000161420  8083  0100  0007  837F  0085  9383  0106  000A
0000161440  8075  8183  6400  8302  06E1  0501  7800  8338
0000161460  0080  0501  7800  8338  0080  0701  7800  B085
0000161500  8300  0080  0501  7800  8318  0080  0701  7800
0000161520  F085  8300  0080  0401  7F00  B583  0105  000A
0000161540  8075  8183  6400  8301  06E8  0501  7800  8378
0000161560  0080  0501  7800  8378  0080  0A01  7F00  8183
0000161600  8300  05B5  C183  0100  000A  8075  8183  6400
0000161620  8303  06EC  0701  7F00  C083  8300  0085  0A01
0000161640  7500  8380  0081  0264  EE83  0106  0001  0180
0000161660  0007  8578  0080  8083  0100  0007  837F  0081
0000161700  8583  0100  000A  8075  8183  6400  8302  06F2
0000161720  0701  7800  3885  8301  0080  0701  7800  2085
0000161740  8301  0080  0A01  7500  8380  0081  0064  0183
0000161760  0102  0007  8578  0150  8083  0100  000A  8075
0000162000  8183  6400  8300  0201  0401  7F00  8583  0100
0000162020  000A  8075  0083  6402  8301  06F9  0A01  7500
0000162040  8380  0085  0064  0183  0102  0004  837F  0085
0000162060  0A01  7500  8380  0200  0164  FC83  0106  0001
0000162100  0180  0007  8578  00A8  8083  0100  000A  8075
0000162120  8583  6400  8300  0201  0101  8000  0701  7800
0000162140  9885  8300  0080  0701  7F00  B583  8305  0693
0000162160  0A01  7500  8380  0200  0264  0383  0107  0005
0000162200  7078  8083  0100  0005  7078  8083  0100  0007
0000162220  837F  0693  B583  0105  000A  8075  0083  6402
0000162240  8302  0707  0401  7F00  B583  0105  000A  8075
0000162260  8183  6400  8301  0709  0701  7F00  8683  8300
0000162300  0000  0A01  7500  8380  0200  0264  0B83  0107
```

```
THU MAR 14 17:34:20 1991  FL.DLL  PAGE 54, LINE 3128

0000162320  0007  837F  0086  8183  0100  000A  8075  8183
0000162340  6400  8302  070D  0A01  7500  8380  0081  0064
0000162360  0183  0102  0001  0180  0016  3079  8303  0203
0000162400  0483  8202  280A  6E75  6174  6767  6465  6929
0000162420  0A01  7F00  8183  8300  0081  8183  0100  001C
0000162440  827F  7006  6361  5F6B  0068  0682  6966  656C
0000162460  685F  8202  6606  6E75  5F63  0468  0101  8000
0000162500  0101  8000  0101  8000  0101  8000  0101  8000
*
0000162700  0101  8000  0101  8000  0501  7800  8350  0080
0000162720  0501  7800  8328  0080  0101  8000  0101  8000
0000162740  0101  8000  0101  8000  0101  8000  0101  8000
*
0000163140  0101  8000  0101  8000  0101  8000  0501  7800
0000163160  8368  0080  0101  8000  0101  8000  0101  8000
0000163200  0101  8000  0701  7800  0085  8301  0080  0101
0000163220  8000  0101  8000  0101  8000  0101  8000  0101
*
0000166760  8000  0101  8000  1601  7900  0220  3083  8304
0000167000  0431  0A82  7528  746E  6761  6567  2964  0169
0000167020  0007  837F  0081  8183  0100  0009  827F  7801
0000167040  8200  7901  0102  0016  4079  8302  0433  3483
0000167060  8204  280A  6E75  6174  6767  6465  6929  0701
0000167100  7F00  2F83  8304  042F  0D01  7F00  0382  696D
0000167120  006E  0382  616D  0478  0101  8000  0101  8000
0000167140  0101  8000  0101  8000  0101  8000  0101  8000
*
0000170060  0101  8000  0101  8000  0101  8000  1801  7900
0000170100  C085  0702  B083  8304  04B1  0A82  7528  746E
0000170120  6761  6567  2964  0169  0007  8578  0120  8483
0000170140  0100  0016  837F  0086  5483  8302  0432  8183
0000170160  8300  0081  8283  8300  04AF  3801  7F00  0282
0000170200  6469  8200  6E04  6D61  0465  0482  6572  7463
0000170220  8224  6104  7474  2C72  0582  7564  6D6D  2E79
0000170240  0A82  6974  656D  735F  6174  706D  8230  7305
0000170260  6170  6572  0134  0001  0180  0001  0180  0001
0000170300  0180  0001  0180  0001  0180  0001  0180  0007
0000170320  737A  AE83  8204  0100  0001  0180  0001  0180
0000170340  0001  0180  0001  0180  0001  0180  0001  0180
*
0000171740  0001  0180  0001  0180  0018  8579  02D0  8302
0000171760  057E  7F83  8205  280A  6E75  6174  6767  6465
0000172000  6929  0701  7F00  AE83  8304  0081  1101  7F00
0000172020  0682  6966  746C  7265  8200  6D04  646F  5865
0000172040  0101  8000  0101  8000  0701  7800  2885  8303
0000172060  0080  0501  7800  8340  0081  0101  8000  0101
0000172100  8000  0101  8000  1C01  7900  2085  080D  8883
0000172120  8305  05C9  0E82  665F  655F  6378  5F70  6F66
0000172140  6D72  745F  0169  0019  837F  0085  8283  8305
0000172160  0582  8283  8305  0583  8183  8300  0085  8283
0000172200  0105  0049  827F  6902  0064  0582  6974  6C74
0000172220  0265  0A82  616E  656D  745F  7469  656C  8267
0000172240  6E04  6D61  8565  00CC  0382  6F6C  8563  0132
0000172260  0482  7461  7274  3A85  8201  6D06  7361  5F6B
0000172300  8566  013C  0482  6164  6574  3E85  0101  0001
0000172320  0180  0001  0180  0001  0180  0001  0180  0001
*
0000172440  0180  0001  0180  0001  0180  0007  737A  8783
0000172460  8205  0100  0001  0180  0001  0180  0001  0180
```

```
THU MAR 14 17:34:20 1991  FL.DLL  PAGE 55, LINE 3187

0000172500  0001  0180  0001  0180  0001  0180  0001  0180
*
0000172720  0001  0180  0001  0180  0001  0180  0007  837F
0000172740  0085  A183  0105  000A  8075  8183  6400  8302
0000172760  05CC  0101  8000  0501  7800  8338  0080  0501
0000173000  7800  8338  0080  0701  7A00  8373  05D2  0082
0000173020  0A01  7500  8380  0081  0064  0183  0102  0005
0000173040  6078  8283  0100  0007  8578  00B0  8083  0100
0000173060  0007  8578  00E0  8083  0100  0004  837F  05A1
0000173100  0A01  7500  8380  0200  0164  D683  0105  0001
0000173120  0180  0005  2078  8083  0100  0007  8578  0098
0000173140  8083  0100  0007  8578  0080  8083  0100  0007
0000173160  837F  04B8  A183  0105  000A  8075  0083  6402
0000173200  8302  05DC  0101  8000  0501  7800  8370  0080
0000173220  0501  7800  8378  0080  0701  7F00  A183  8305
0000173240  04B8  0A01  7500  8380  0200  0264  E183  0105
0000173260  0004  837F  0086  0A01  7500  8380  0200  0164
0000173300  E383  0105  0007  8578  0098  8083  0100  000A
0000173320  8075  8183  6400  8300  0201  0101  8000  1601
0000173340  7900  0330  0383  8302  0204  0A82  7528  746E
0000173360  6761  6567  2964  0169  000A  837F  0081  8183
0000173400  8300  0081  1C01  7F00  0682  6170  6B63  685F
0000173420  8200  6606  6C69  5F65  0268  0682  7566  636E
0000173440  685F  0104  0001  0180  0001  0180  0001  0180
0000173460  0001  0180  0001  0180  0001  0180  0001  0180
*
0000173660  0005  5078  8083  0100  0005  2878  8083  0100
0000173700  0001  0180  0001  0180  0001  0180  0001  0180
*
0000201340  0001  0180  0001  0180  0001  0180  0007  737A
0000201360  F683  8204  0100  000A  8075  8183  6400  8300
0000201400  0201  0101  8000  0101  8000  0101  8000  0101
0000201420  8000  0101  8000  0101  8000  0101  8000  0101
*
0000204460  8000  0101  8000  1C01  7900  7085  0C10  8783
0000204500  8306  0688  0E82  665F  665F  746C  5F72  6F66
0000204520  6D72  745F  0169  0007  8578  0328  8083  0100
0000204540  0005  4078  8183  0100  0025  837F  0085  8583
0000204560  8300  0685  8583  8306  0685  8583  8300  0686
0000204600  8183  8300  0085  8583  8300  0685  8583  0106
0000204620  0079  827F  6902  0064  0882  6C67  626F  6C61
0000204640  665F  8202  7405  7469  656C  8204  6E0A  6D61
0000204660  5F65  6974  6C74  6965  0482  616E  656D  CE85
0000204700  8200  6406  7369  5F70  8566  0134  0382  6F6C
0000204720  8563  0136  0482  7461  7274  3E85  8201  6105
0000204740  696F  665F  4085  8201  6D06  7361  5F6B  8566
0000204760  0142  0882  6164  6574  735F  7274  4485  8201
0000205000  6C07  636F  735F  7274  A985  0101  0001  0180
0000205020  0001  0180  0001  0180  0001  0180  0001  0180
0000205040  0007  737A  8483  8206  0100  0001  0180  0001
0000205060  0180  0001  0180  0001  0180  0001  0180  0001
*
0000205260  0180  0001  0180  0007  737A  8483  8206  0100
0000205300  0001  0180  0001  0180  0001  0180  0001  0180
*
0000205440  0001  0180  0001  0180  0004  837F  068E  0A01
0000205460  7500  8380  0081  0164  CD83  0106  0001  0180
0000205500  0001  0180  0005  7078  8083  0100  0005  3878
0000205520  8083  0100  0005  6078  8283  0100  000D  837F
```

THU MAR 14 17:34:20 1991 FL.DLL PAGE 56, LINE 3246

```
0000205540  00C0  8583  8300  00C0  C083  0100  000A  8075
0000205560  C083  7300  8304  06D4  0701  7800  C885  8300
0000205600  0080  0101  8000  0A01  7500  8380  06B2  0064
0000205620  0183  0102  0004  837F  068E  0A01  7500  8380
0000205640  0200  0164  D983  0106  0001  0180  0007  8578
0000205660  0080  8083  0100  0005  2078  8083  0100  0007
0000205700  8578  0190  8083  0100  0005  3078  8083  0100
0000205720  0005  1878  8083  0100  0007  8578  00A8  8083
0000205740  0100  0004  837F  0085  0A01  7500  8380  0200
0000205760  0164  E283  0106  0001  0180  0005  7878  8083
0000206000  0100  0004  837F  0085  0A01  7500  8380  0200
0000206020  0164  E683  0106  0004  837F  068E  0A01  7500
0000206040  8380  0081  0164  E883  0106  0001  0180  0007
0000206060  8578  0098  8083  0100  000A  8075  C083  6400
0000206100  8300  0201  0401  7F00  C083  0100  000A  8075
0000206120  8183  6400  8301  06ED  0D01  7F00  C083  8300
0000206140  0085  C083  8300  00C0  0A01  7500  8380  00C0
0000206160  0473  EF83  0106  0005  0878  8083  0100  000A
0000206200  8075  0083  6402  8300  0201  0A01  7500  8380
0000206220  0081  0064  0183  0102  0001  0180  0016  3079
0000206240  8303  0203  0483  8202  280A  6E75  6174  6767
0000206260  6465  6929  0A01  7F00  8183  8300  0081  8183
0000206300  0100  001C  827F  7006  6361  5F6B  0068  0682
0000206320  6966  656C  685F  8202  6606  6E75  5F63  0468
0000206340  0101  8000  0101  8000  0101  8000  0101  8000
*
0000206540  0101  8000  0101  8000  0101  8000  0501  7800
0000206560  8350  0080  0501  7800  8328  0080  0101  8000
0000206600  0101  8000  0101  8000  0101  8000  0101  8000
*
0000214240  0101  8000  0101  8000  0701  7A00  8373  04F6
0000214260  0082  0A01  7500  8380  0081  0064  0183  0102
0000214300  0001  0180  0001  0180  0001  0180  0001  0180
*
0000220000  0001  0180  0001  0180  0007  8578  0328  8083
0000220020  0100  0005  4078  8183  0100  0001  0180  0001
0000220040  0180  0001  0180  001C  8579  0D20  8308  06CF
0000220060  D083  8206  5F0E  5F66  7865  7063  665F  726F
0000220100  5F6D  6974  1901  7F00  8583  8300  06C9  C983
0000220120  8306  06C9  CA83  8306  0081  8583  8300  06C9
0000220140  4901  7F00  0282  6469  8200  7405  7469  656C
0000220160  8202  6E0A  6D61  5F65  6974  6C74  6765  0482
0000220200  616E  656D  CC85  8200  6C03  636F  3285  8201
0000220220  6104  7474  8572  013A  0682  616D  6B73  665F
0000220240  3C85  8201  6404  7461  8565  013E  0101  8000
0000220260  0101  8000  0101  8000  0101  8000  0101  8000
*
0000220400  0701  7A00  8373  06CE  0082  0101  8000  0101
0000220420  8000  0101  8000  0101  8000  0101  8000  0101
*
0000220540  8000  0101  8000  0101  8000  0701  7A00  8373
0000220560  06CE  0082  0101  8000  0101  8000  0101  8000
0000220600  0101  8000  0101  8000  0101  8000  0101  8000
*
0000220660  0101  8000  0101  8000  0401  7F00  E683  0106
0000220700  000A  8075  8183  6400  8301  0711  0101  8000
0000220720  0101  8000  0501  7800  8370  0080  0501  7800
0000220740  8338  0080  0501  7800  8360  0082  0D01  7F00
0000220760  C083  8300  0085  C083  8300  00C0  0A01  7500
```

THU MAR 14 17:34:20 1991 FL.DLL PAGE 57, LINE 3305

```
0000221000  8380  00C0  0473  1883  0107  0007  8578  00C8
0000221020  8083  0100  0001  0180  000A  8075  FF83  6406
0000221040  8300  0201  0401  7F00  E683  0106  000A  8075
0000221060  0083  6402  8301  071D  0101  8000  0701  7800
0000221100  8085  8300  0080  0501  7800  8320  0080  0701
0000221120  7800  9085  8301  0080  0501  7800  8330  0080
0000221140  0401  7F00  E683  0106  000A  8075  8183  6400
0000221160  8301  0724  0101  8000  0701  7800  9885  8300
0000221200  0080  0A01  7500  8380  00C0  0064  0183  0102
0000221220  0001  0180  0001  0180  0016  3079  8303  0203
0000221240  0483  8202  280A  6E75  6174  6767  6465  6929
0000221260  0A01  7F00  8183  8300  0081  8183  0100  001C
0000221300  827F  7006  6361  5F6B  0068  0682  6966  656C
0000221320  685F  8202  6606  6E75  5F63  0468  0101  8000
0000221340  0101  8000  0101  8000  0101  8000  0101  8000
*
0000221540  0101  8000  0101  8000  0501  7800  8350  0080
0000221560  0501  7800  8328  0080  0101  8000  0101  8000
0000221600  0101  8000  0101  8000  0101  8000  0101  8000
*
0000222040  0701  7800  0085  8301  0080  0101  8000  0101
0000222060  8000  0101  8000  0101  8000  0101  8000  0101
*
0000225100  8000  0101  8000  0101  8000  1601  7900  0220
0000225120  DE83  8303  03DF  0A82  7528  746E  6761  6567
0000225140  2964  0169  0007  837F  0081  8183  0100  0009
0000225160  827F  7801  8200  7901  0102  0016  4079  8302
0000225200  03E1  E283  8203  280A  6E75  6174  6767  6465
0000225220  6929  0701  7F00  DD83  8303  03DD  0D01  7F00
0000225240  0382  696D  006E  0382  616D  0478  0101  8000
0000225260  0101  8000  0101  8000  0101  8000  0101  8000
*
0000225600  1801  7900  C085  0702  1A83  8304  041B  0A82
0000225620  7528  746E  6761  6567  2964  0169  0007  8578
0000225640  0120  8483  0100  0016  837F  0086  5483  8302
0000225660  03E0  8183  8300  0081  8283  8300  0419  3801
0000225700  7F00  0282  6469  8200  6E04  6D61  0465  0482
0000225720  6572  7463  8224  6104  7474  2C72  0582  7564
0000225740  6D6D  2E79  0A82  6974  656D  735F  6174  706D
0000225760  8230  7305  6170  6572  0134  0001  0180  0001
0000226000  0180  0007  8578  0100  5483  0102  0001  0180
0000226020  0001  0180  0001  0180  0007  737A  1883  8204
0000226040  0100  0001  0180  0001  0180  0001  0180  0001
0000226060  0180  0001  0180  0001  0180  0007  737A  5483
0000226100  8202  0100  0007  737A  2283  8204  0100  0001
0000226120  0180  0001  0180  0001  0180  0001  0180  0001
*
0000226260  0180  0001  0180  001B  2079  8309  0446  4783
0000226300  8204  690F  755F  6D5F  6773  705F  7261  6D61
0000226320  745F  0169  001C  837F  0081  8583  8300  0082
0000226340  8683  8300  0088  8083  8300  0084  C083  8300
0000226360  00C0  6A01  7F00  0982  5F69  5F75  6873  726F
0000226400  0074  0A82  5F69  5F75  7375  6F68  7472  8200
0000226420  6908  755F  6C5F  6E6F  0067  0982  5F69  5F75
0000226440  6C75  6E6F  0067  0982  5F69  5F75  6C66  616F
0000226460  0074  0882  5F69  5F75  6863  7261  8200  6909
0000226500  755F  755F  6863  7261  8200  6907  755F  735F
0000226520  7274  8200  6909  755F  625F  6F6C  6B63  0100
0000226540  0019  3079  8302  0449  4A83  8204  690D  6D5F
```

THU MAR 14 17:34:20 1991 FL.DLL PAGE 58, LINE 3364

```
0000226560  6773  705F  7261  6D61  745F  0169  0007  837F
0000226600  0085  4583  0104  0010  827F  7404  7079  0065
0000226620  0582  6176  756C  0265  0101  8000  1C01  7900
0000226640  9085  0900  4D83  8304  044E  0E82  5F69  736D
0000226660  5F67  6568  6461  7265  745F  0169  001C  837F
0000226700  0081  8183  8300  0085  8583  8300  0084  8583
0000226720  8300  0085  8183  8300  0085  4701  7F00  0482
0000226740  5F71  6469  8200  7306  756F  6372  0265  0382
0000226760  6970  0464  0382  6974  0664  0482  6572  7073
0000227000  8208  7208  7365  5F70  6974  0A64  0782  706F
0000227020  635F  646F  0C65  0482  7974  6570  820E  7304
0000227040  7A69  1065  1501  7900  C085  0200  5183  8304
0000227060  0452  0782  5F69  736D  5F67  6974  0501  7800
0000227100  8330  0448  0701  7F00  4C83  8304  0450  1701
0000227120  7F00  0682  6568  6461  7265  8200  700A  7261
0000227140  6D61  6C5F  7369  1274  0101  8000  0101  8000
0000227160  0101  8000  0701  7A00  8373  044F  0082  0101
0000227200  8000  0101  8000  0101  8000  0101  8000  0101
*
0000230340  8000  0101  8000  1801  7900  D085  0202  F283
0000230360  8304  04F3  0A82  7528  746E  6761  6567  2964
0000230400  0169  0007  837F  0418  8183  0100  0011  827F
0000230420  6606  6C69  6574  0072  0482  6F6D  6564  0158
0000230440  0001  0180  0001  0180  0001  0180  0001  0180
*
0000231060  0001  0180  0001  0180  0007  737A  F183  8204
0000231100  0100  0001  0180  0001  0180  0001  0180  0001
0000231120  0180  0001  0180  0001  0180  0010  837F  00C0
0000231140  2A83  8304  0081  8683  8300  0422  0A01  7500
0000231160  8380  0081  0564  4183  0105  000A  837F  0086
0000231200  C083  8300  0422  0A01  7500  8380  0081  0364
0000231220  4383  0105  0007  837F  0086  2283  0104  000A
0000231240  8075  8183  6400  8302  0545  1001  7F00  C083
0000231260  8300  0429  8183  8300  0085  C183  0100  000A
0000231300  8075  8183  6400  8305  0547  0101  8000  0101
0000231320  8000  0701  7800  9085  8300  0080  0501  7800
0000231340  8338  0080  0701  7A00  8373  054E  0082  0A01
0000231360  7500  8380  0081  0064  0183  0102  0005  6078
0000231400  8283  0100  0010  837F  00C0  2A83  8304  0081
0000231420  8583  8300  00C1  0A01  7500  8380  0081  0564
0000231440  5083  0105  0001  0180  0007  8578  00B8  8083
0000231460  0100  000A  837F  0081  8583  8300  053A  0A01
0000231500  7500  8380  0081  0364  5483  0105  0001  0180
0000231520  0007  8578  0080  8083  0100  0004  837F  0085
0000231540  0A01  7500  8380  0081  0164  5883  0105  0007
0000231560  837F  0081  8183  0100  000A  8075  8183  6400
0000231600  8302  055A  0101  8000  0701  7800  8885  8300
0000231620  0080  0401  7F00  8183  0100  000A  8075  8183
0000231640  6400  8301  055E  0101  8000  0501  7800  8378
0000231660  0080  0401  7F00  8183  0100  000A  8075  8183
0000231700  6400  8301  0562  0501  7800  8368  0080  1105
0000231720  0001  0000  011F  0000  05A6  02AE  0016  02A0
0000231740  0000  1004  5F66  6975  665F  6C69  6574  5F72
0000231760  6F66  6D72  0411  0006  00C0  740B  7365  5F74
0000232000  616E  656D  705F  040D  FCE4  00C0  5F07  735F
0000232020  6174  6B63  040E  FCCA  0081  5F08  725F  7465
0000232040  6176  0C6C  F604  86FE  0600  696C  5F62  6469
0000232060  040F  FEFA  04FE  6609  6C75  5F6C  616E  656D
0000232100  040A  FCE8  055C  6604  726F  0B6D  DE04  DAFC
```

THU MAR 14 17:34:20 1991 FL.DLL PAGE 59, LINE 3423

| | | | | | | | | |
|---|---|---|---|---|---|---|---|---|
| 0000232120 | 0504 | 736D | 5F67 | 0870 | E204 | 81FC | 0200 | 6372 |
| 0000232140 | 040C | FFFA | 00C0 | 5F06 | 745F | 7079 | 0F65 | DC04 |
| 0000232160 | 85FC | 0900 | 5F5F | 7862 | 745F | 7079 | 0D65 | CC04 |
| 0000232200 | 71FC | 0703 | 5F5F | 7270 | 6E69 | 0B74 | C404 | 02FC |
| 0000232220 | 0502 | 5F5F | 766C | 0D6C | D004 | AAFC | 0705 | 5F5F |
| 0000232240 | 6C63 | 636F | 0E6B | 6A05 | 0500 | A900 | 0605 | 5F5F |
| 0000232260 | 7566 | 636E | 0201 | 0121 | 02AE | 05AD | 013A | 0016 |
| 0000232300 | 012C | 0000 | 1204 | 5F66 | 6975 | 655F | 6378 | 5F70 |
| 0000232320 | 6564 | 5F66 | 6F66 | 6D72 | 0411 | 0006 | 00C0 | 650B |
| 0000232340 | 6378 | 5F70 | 616E | 656D | 705F | 040C | FFFA | 00C0 |
| 0000232360 | 5F06 | 745F | 7079 | 0F65 | F204 | 85FF | 0900 | 5F5F |
| 0000232400 | 7862 | 745F | 7079 | 0D65 | E204 | 71FF | 0703 | 5F5F |
| 0000232420 | 7270 | 6E69 | 0B74 | DA04 | 02FF | 0502 | 5F5F | 766C |
| 0000232440 | 0D6C | E604 | AAFF | 0705 | 5F5F | 6C63 | 636F | 0D6B |
| 0000232460 | F604 | C0FF | 0700 | 5F5F | 7473 | 6361 | 0E6B | E004 |
| 0000232500 | 81FF | 0800 | 5F5F | 6572 | 7674 | 6C61 | 0408 | FFF4 |
| 0000232520 | 0081 | 7202 | 0E63 | 8A05 | 0500 | AF00 | 0605 | 5F5F |
| 0000232540 | 7566 | 636E | 0201 | 0117 | 03E8 | 05B1 | 01DD | 0016 |
| 0000232560 | 01CF | 0000 | 0804 | 5F66 | 6966 | 746C | 7265 | 040B |
| 0000232600 | 0006 | 04DA | 6D05 | 6773 | 705F | 040C | FFF8 | 00C0 |
| 0000232620 | 5F06 | 745F | 7079 | 0F65 | E804 | 85FF | 0900 | 5F5F |
| 0000232640 | 7862 | 745F | 7079 | 0D65 | D804 | 71FF | 0703 | 5F5F |
| 0000232660 | 7270 | 6E69 | 0B74 | D004 | 02FF | 0502 | 5F5F | 766C |
| 0000232700 | 0D6C | DC04 | AAFF | 0705 | 5F5F | 6C63 | 636F | 0D6B |
| 0000232720 | F004 | C0FF | 0700 | 5F5F | 7473 | 6361 | 0E6B | D604 |
| 0000232740 | 81FF | 0800 | 5F5F | 6572 | 7674 | 6C61 | 040C | FFEA |
| 0000232760 | 049B | 6606 | 746C | 5F72 | 1170 | F404 | 7AFF | 0B05 |
| 0000233000 | 7865 | 7063 | 665F | 726F | 5F6D | 0A70 | FC04 | 85FF |
| 0000233020 | 0400 | 6564 | 7473 | 0408 | FFEE | 0081 | 7202 | 0E63 |
| 0000233040 | AC05 | 0500 | B300 | 0605 | 5F5F | 7566 | 636E | 0201 |
| 0000233060 | 0D05 | 0000 | 001A | 050F | 0062 | 0005 | 00C0 | 4207 |
| 0000233100 | 785F | 6946 | 656C | 050F | 0066 | 0005 | 00C0 | 4207 |
| 0000233120 | 785F | 6150 | 6B63 | 0514 | 0000 | 0000 | 0081 | 420C |
| 0000233140 | 5F78 | 6544 | 7562 | 4D67 | 646F | 1465 | 0005 | 0000 |
| 0000233160 | 8100 | 0C00 | 7842 | 545F | 6D69 | 7365 | 6F4D | 6564 |
| 0000233200 | 1105 | 0001 | 0000 | 011B | 05C6 | 06D8 | 01B5 | 0010 |
| 0000233220 | 01AA | 0000 | 0C04 | 6666 | 695F | 696E | 5F74 | 6F66 |
| 0000233240 | 6D72 | 040C | 0006 | 0693 | 6606 | 726F | 5F6D | 1170 |
| 0000233260 | 0A04 | C000 | 0B00 | 6574 | 7473 | 6E5F | 6D61 | 5F65 |
| 0000233300 | 0C70 | FA04 | C0FF | 0600 | 5F5F | 7974 | 6570 | 040F |
| 0000233320 | FFF4 | 0085 | 5F09 | 625F | 5F78 | 7974 | 6570 | 040D |
| 0000233340 | FFE4 | 04DE | 5F07 | 705F | 6972 | 746E | 040B | FFDC |
| 0000233360 | 0202 | 5F05 | 6C5F | 6C76 | 040D | FFE8 | 06DC | 5F07 |
| 0000233400 | 635F | 6F6C | 6B63 | 040D | FFF6 | 00C0 | 5F07 | 735F |
| 0000233420 | 6174 | 6B63 | 040E | FFE2 | 0081 | 5F08 | 725F | 7465 |
| 0000233440 | 6176 | 0E6C | 3605 | 0501 | 4F00 | 0602 | 5F5F | 7566 |
| 0000233460 | 636E | 0201 | 0115 | 077B | 06E2 | 115B | 0010 | 1150 |
| 0000233500 | 0000 | 0604 | 6666 | 645F | 676C | 040D | 0006 | 0085 |
| 0000233520 | 6F07 | 5F70 | 6F63 | 6564 | 040C | 0008 | 0693 | 6606 |
| 0000233540 | 726F | 5F6D | 0C70 | F804 | C0FF | 0600 | 5F5F | 7974 |
| 0000233560 | 6570 | 040F | FFC2 | 0085 | 5F09 | 625F | 5F78 | 7974 |
| 0000233600 | 6570 | 040D | FFB0 | 04DE | 5F07 | 705F | 6972 | 746E |
| 0000233620 | 040B | FFA8 | 0202 | 5F05 | 6C5F | 6C76 | 040D | FFB6 |
| 0000233640 | 06DC | 5F07 | 635F | 6F6C | 6B63 | 040D | FFF0 | 00C0 |
| 0000233660 | 5F07 | 735F | 6174 | 6B63 | 040E | FFAE | 0081 | 5F08 |
| 0000233700 | 725F | 7465 | 6176 | 0E6C | 4C04 | D6FF | 0805 | 6C66 |
| 0000233720 | 7274 | 6D5F | 6773 | 040C | FFC6 | 05B5 | 6606 | 746C |
| 0000233740 | 5F72 | 0D70 | F404 | 81FF | 0700 | 6C66 | 7274 | 6E5F |
| 0000233760 | 126F | F604 | 81FF | 0C00 | 6964 | 7073 | 665F | 746C |

THU MAR 14 17:34:20 1991 FL.DLL PAGE 60, LINE 3482

| | | | | | | | | |
|---|---|---|---|---|---|---|---|---|
| 0000234000 | 5F72 | 6F6E | 040A | FFB4 | 0081 | 6104 | 7474 | 0C72 |
| 0000234020 | FC04 | 85FF | 0600 | 7461 | 7274 | 665F | 040B | FFCA |
| 0000234040 | 05EC | 6D05 | 6773 | 705F | 040A | FFCE | 0254 | 7404 |
| 0000234060 | 6D65 | 0970 | A604 | 81FF | 0300 | 7269 | 0763 | C404 |
| 0000234100 | 81FF | 0100 | 0869 | EE04 | 81FF | 0200 | 6372 | 050E |
| 0000234120 | 0190 | 0005 | 06E4 | 5F06 | 665F | 6E75 | 0163 | 1D02 |
| 0000234140 | D601 | E918 | 9306 | 1001 | 8800 | 0001 | 0400 | 660E |
| 0000234160 | 5F66 | 6461 | 5F64 | 6F74 | 6C5F | 7369 | 0C74 | 0604 |
| 0000234200 | B500 | 0605 | 6C66 | 7274 | 705F | 040F | FFEE | 0085 |
| 0000234220 | 5F09 | 625F | 5F78 | 7974 | 6570 | 040D | FFDE | 04DE |
| 0000234240 | 5F07 | 705F | 6972 | 746E | 040B | FFD6 | 0202 | 5F05 |
| 0000234260 | 6C5F | 6C76 | 040D | FFE2 | 06DC | 5F07 | 635F | 6F6C |
| 0000234300 | 6B63 | 040D | FFF2 | 00C0 | 5F07 | 735F | 6174 | 6B63 |
| 0000234320 | 040E | FFDC | 0081 | 5F08 | 725F | 7465 | 6176 | 106C |
| 0000234340 | FA04 | B5FF | 0A05 | 656E | 5F77 | 6C66 | 7274 | 705F |
| 0000234360 | 0408 | FFF0 | 0081 | 7202 | 0C63 | F604 | C0FF | 0600 |
| 0000234400 | 5F5F | 7974 | 6570 | 050E | 01A6 | 0005 | 06EB | 5F06 |
| 0000234420 | 665F | 6E75 | 0163 | 1D02 | 6901 | ED1A | AC06 | 1002 |
| 0000234440 | A100 | 0002 | 0400 | 660E | 5F66 | 6964 | 7073 | 665F |
| 0000234460 | 6C69 | 6574 | 0D72 | 0604 | 8100 | 0700 | 6C66 | 7274 |
| 0000234500 | 6E5F | 0C6F | 0804 | B500 | 0605 | 6C66 | 7274 | 705F |
| 0000234520 | 0414 | 000C | 00C1 | 640E | 7369 | 5F70 | 6C66 | 7274 |
| 0000234540 | 6E5F | 5F6F | 0C70 | FA04 | C0FF | 0600 | 5F5F | 7974 |
| 0000234560 | 6570 | 040F | FFF0 | 0085 | 5F09 | 625F | 5F78 | 7974 |
| 0000234600 | 6570 | 040D | FFE0 | 04DE | 5F07 | 705F | 6972 | 746E |
| 0000234620 | 040B | FFD8 | 0202 | 5F05 | 6C5F | 6C76 | 040D | FFE4 |
| 0000234640 | 06DC | 5F07 | 635F | 6F6C | 6B63 | 040D | FFF4 | 00C0 |
| 0000234660 | 5F07 | 735F | 6174 | 6B63 | 040E | FFDE | 0081 | 5F08 |
| 0000234700 | 725F | 7465 | 6176 | 0E6C | 7E04 | D6FF | 0805 | 6C66 |
| 0000234720 | 7274 | 6D5F | 6773 | 0412 | FFF8 | 0081 | 640C | 7369 |
| 0000234740 | 5F70 | 6C66 | 7274 | 6E5F | 086F | F204 | 81FF | 0200 |
| 0000234760 | 6372 | 050E | 01C4 | 0005 | 06EB | 5F06 | 665F | 6E75 |
| 0000235000 | 0163 | 1E02 | 1501 | EF1D | 3806 | 1002 | 2D00 | 0002 |
| 0000235020 | 0400 | 660F | 5F66 | 7265 | 7361 | 5F65 | 6966 | 746C |
| 0000235040 | 7265 | 0411 | 0006 | 00C0 | 660B | 746C | 5F72 | 616E |
| 0000235060 | 656D | 705F | 0410 | 000A | 0085 | 730A | 7661 | 5F65 |
| 0000235100 | 736D | 5F67 | 0D66 | E204 | DCFF | 0706 | 5F5F | 6C63 |
| 0000235120 | 636F | 0D6B | F404 | C0FF | 0700 | 5F5F | 7473 | 6361 |
| 0000235140 | 0E6B | DC04 | 81FF | 0800 | 5F5F | 6572 | 7674 | 6C61 |
| 0000235160 | 040E | FF7C | 05D6 | 6608 | 746C | 5F72 | 736D | 0D67 |
| 0000235200 | F804 | 81FF | 0700 | 6C66 | 7274 | 6E5F | 076F | F004 |
| 0000235220 | 81FF | 0100 | 0869 | F204 | 81FF | 0200 | 6372 | 040C |
| 0000235240 | FFFA | 00C0 | 5F06 | 745F | 7079 | 0F65 | EE04 | 85FF |
| 0000235260 | 0900 | 5F5F | 7862 | 745F | 7079 | 0D65 | DE04 | DEFF |
| 0000235300 | 0704 | 5F5F | 7270 | 6E69 | 0B74 | D604 | 02FF | 0502 |
| 0000235320 | 5F5F | 766C | 0E6C | E205 | 0501 | F100 | 0606 | 5F5F |
| 0000235340 | 7566 | 636E | 0201 | 011A | 1F4D | 06F3 | 0213 | 0010 |
| 0000235360 | 0208 | 0000 | 0B04 | 6666 | 735F | 7661 | 5F65 | 736D |
| 0000235400 | 0D67 | 0604 | 8100 | 0700 | 6C66 | 7274 | 6E5F | 146F |
| 0000235420 | 0804 | 8500 | 0E00 | 6173 | 6576 | 725F | 7165 | 6575 |
| 0000235440 | 7473 | 665F | 040C | FFFA | 00C0 | 5F06 | 745F | 7079 |
| 0000235460 | 0F65 | F204 | 85FF | 0900 | 5F5F | 7862 | 745F | 7079 |
| 0000235500 | 0D65 | E204 | DEFF | 0704 | 5F5F | 7270 | 6E69 | 0B74 |
| 0000235520 | DA04 | 02FF | 0502 | 5F5F | 766C | 0D6C | E604 | DCFF |
| 0000235540 | 0706 | 5F5F | 6C63 | 636F | 0D6B | F604 | C0FF | 0700 |
| 0000235560 | 5F5F | 7473 | 6361 | 0E6B | E004 | 81FF | 0800 | 5F5F |
| 0000235600 | 6572 | 7674 | 6C61 | 0409 | FFD8 | 0081 | 6903 | 6372 |
| 0000235620 | 0408 | FFF4 | 0081 | 7202 | 0E63 | 4C05 | 0502 | 8300 |
| 0000235640 | 0602 | 5F5F | 7566 | 636E | 0201 | 011E | 2160 | 06F6 |

THU MAR 14 17:34:20 1991 FL.DLL PAGE 61, LINE 3541

| | | | | | | | | |
|---|---|---|---|---|---|---|---|---|
| 0000235660 | 0261 | 0010 | 0256 | 0000 | 0F04 | 6666 | 735F | 7661 |
| 0000235700 | 5F65 | 6C61 | 5F6C | 736D | 0D67 | E204 | DCFE | 0706 |
| 0000235720 | 5F5F | 6C63 | 636F | 0D6B | F604 | C0FF | 0700 | 5F5F |
| 0000235740 | 7473 | 6361 | 0E6B | DC04 | 81FE | 0800 | 5F5F | 6572 |
| 0000235760 | 7674 | 6C61 | 0414 | FEF0 | 0081 | 6D0E | 646F | 6669 |
| 0000236000 | 6569 | 5F64 | 6F63 | 6E75 | 0974 | D404 | 81FE | 0300 |
| 0000236020 | 7269 | 0D63 | F404 | 3FFE | 0706 | 736D | 5F67 | 7874 |
| 0000236040 | 0774 | F204 | 81FE | 0100 | 0869 | F404 | 81FF | 0200 |
| 0000236060 | 6372 | 040C | FFFA | 00C0 | 5F06 | 745F | 7079 | 0F65 |
| 0000236100 | EE04 | 85FE | 0900 | 5F5F | 7862 | 745F | 7079 | 0D65 |
| 0000236120 | DE04 | DEFE | u704 | 5F5F | 7270 | 6E69 | 0B74 | D604 |
| 0000236140 | 02FE | 0502 | 5F5F | 766C | 0E6C | 9605 | 0502 | F100 |
| 0000236160 | 0606 | 5F5F | 7566 | 636E | 0201 | 011B | 23C1 | 06F8 |
| 0000236200 | 018B | 0010 | 0180 | 0000 | 0C04 | 6666 | 615F | 6F62 |
| 0000236220 | 7472 | 6D5F | 6773 | 040C | FFFA | 00C0 | 5F06 | 745F |
| 0000236240 | 7079 | 0F65 | F004 | 85FF | 0900 | 5F5F | 7862 | 745F |
| 0000236260 | 7079 | 0D65 | E004 | DEFF | 0704 | 5F5F | 7270 | 6E69 |
| 0000236300 | 0B74 | D804 | 02FF | 0502 | 5F5F | 766C | 0D6C | E404 |
| 0000236320 | DCFF | 0706 | 5F5F | 6C63 | 636F | 0D6B | F604 | C0FF |
| 0000236340 | 0700 | 5F5F | 7473 | 6361 | 0E6B | DE04 | 81FF | 0800 |
| 0000236360 | 5F5F | 6572 | 7674 | 6C61 | 040D | FFF2 | 0085 | 6F07 |
| 0000236400 | 5F70 | 6F63 | 6564 | 040E | FF7E | 05D6 | 6608 | 746C |
| 0000236420 | 5F72 | 736D | 0867 | F404 | 81FF | 0200 | 6372 | 050E |
| 0000236440 | 02B4 | 0005 | 024F | 5F06 | 665F | 6E75 | 0163 | 1E02 |
| 0000236460 | 4C01 | FA25 | 1706 | 1001 | 0C00 | 0001 | 0400 | 660F |
| 0000236500 | 5F66 | 6573 | 5F74 | 6261 | 726F | 5F74 | 706F | 040E |
| 0000236520 | 0006 | 0085 | 6108 | 6F62 | 7472 | 6F5F | 0C70 | FA04 |
| 0000236540 | C0FF | 0600 | 5F5F | 7974 | 6570 | 040F | FFF4 | 0085 |
| 0000236560 | 5F09 | 625F | 5F78 | 7974 | 6570 | 040D | FFE4 | 04DE |
| 0000236600 | 5F07 | 705F | 6972 | 746E | 040B | FFDC | 0202 | 5F05 |
| 0000236620 | 6C5F | 6C76 | 040D | FFE8 | 06DC | 5F07 | 635F | 6F6C |
| 0000236640 | 6B63 | 040D | FFF6 | 00C0 | 5F07 | 735F | 6174 | 6B63 |
| 0000236660 | 040E | FFE2 | 0081 | 5F08 | 725F | 7465 | 6176 | 0E6C |
| 0000236700 | CA05 | 0502 | F100 | 0606 | 5F5F | 7566 | 636E | 0201 |
| 0000236720 | 011C | 2663 | 06FB | 0021 | 0010 | 0016 | 0000 | 0D04 |
| 0000236740 | 6666 | 715F | 615F | 6F62 | 7472 | 6F5F | 0170 | 2302 |
| 0000236760 | 8401 | FD26 | 1706 | 1001 | 0C00 | 0001 | 0400 | 6614 |
| 0000237000 | 5F66 | 6573 | 5F74 | 6C66 | 7274 | 645F | 6665 | 645F |
| 0000237020 | 7365 | 1374 | 0604 | 8500 | 0D00 | 6C66 | 7274 | 645F |
| 0000237040 | 6665 | 645F | 7365 | 0C74 | FA04 | C0FF | 0600 | 5F5F |
| 0000237060 | 7974 | 6570 | 040F | FFF4 | 0085 | 5FD9 | 625F | 5F78 |
| 0000237100 | 7974 | 6570 | 040D | FFE4 | 04DE | 5F07 | 705F | 6972 |
| 0000237120 | 746E | 040B | FFDC | 0202 | 5F05 | 6C5F | 6C76 | 040D |
| 0000237140 | FFE8 | 06DC | 5F07 | 635F | 6F6C | 6B63 | 040D | FFF6 |
| 0000237160 | 00C0 | 5F07 | 735F | 6174 | 6B63 | 040E | FFE2 | 0081 |
| 0000237200 | 5F08 | 725F | 7465 | 6176 | 0E6C | E205 | 0502 | FF00 |
| 0000237220 | 0606 | 5F5F | 7566 | 636E | 0201 | 0121 | 279B | 0700 |
| 0000237240 | 012C | 0010 | 0121 | 0000 | 1204 | 6666 | 715F | 665F |
| 0000237260 | 746C | 5F72 | 6564 | 5F66 | 6564 | 7473 | 040C | FFFA |
| 0000237300 | 00C0 | 5F06 | 745F | 7079 | 0F65 | F404 | 85FF | 0900 |
| 0000237320 | 5F5F | 7862 | 745F | 7079 | 0D65 | E404 | DEFF | 0704 |
| 0000237340 | 5F5F | 7270 | 6E69 | 0B74 | DC04 | 02FF | 0502 | 5F5F |
| 0000237360 | 766C | 0D6C | E804 | DCFF | 0706 | 5F5F | 6C63 | 636F |
| 0000237400 | 0D6B | F604 | C0FF | 0700 | 5F5F | 7473 | 6361 | 0E6B |
| 0000237420 | E204 | 85FF | 0800 | 5F5F | 6572 | 7674 | 6C61 | 050E |
| 0000237440 | 0306 | 0005 | 0702 | 5F06 | 665F | 6E75 | 0163 | 1C02 |
| 0000237460 | C701 | 0428 | F607 | 1002 | EB00 | 0002 | 0400 | 660D |
| 0000237500 | 5F66 | 6573 | 5F74 | 6966 | 746C | 7265 | 040C | 0006 |
| 0000237520 | 05B5 | 6606 | 746C | 5F72 | 0C70 | 0A04 | 9300 | 0606 |

THU MAR 14 17:34:20 1991 FL.DLL PAGE 62, LINE 3600

| | | | | | | | | |
|---|---|---|---|---|---|---|---|---|
| 0000237540 | 6F66 | 6D72 | 705F | 040C | FFFA | 00C0 | 5F06 | 745F |
| 0000237560 | 7079 | 0F65 | EC04 | 85FF | 0900 | 5F5F | 7862 | 745F |
| 0000237600 | 7079 | 0D65 | DC04 | DEFF | 0704 | 5F5F | 7270 | 6E69 |
| 0000237620 | 0B74 | D404 | 02FF | 0502 | 5F5F | 766C | 0D6C | E004 |
| 0000237640 | DCFF | 0706 | 5F5F | 6C63 | 636F | 0D6B | F404 | C0FF |
| 0000237660 | 0700 | 5F5F | 7473 | 6361 | 0E6B | DA04 | 81FF | 0800 |
| 0000237700 | 5F5F | 6572 | 7674 | 6C61 | 0410 | FFF0 | 00C0 | 740A |
| 0000237720 | 6D69 | 5F65 | 7473 | 5F72 | 0D70 | F804 | 81FF | 0700 |
| 0000237740 | 6C66 | 7274 | 6E5F | 076F | EE04 | 81FF | 0100 | 0969 |
| 0000237760 | D204 | 81FF | 0300 | 7269 | 0E63 | 5205 | 0503 | 0600 |
| 0000240000 | 0607 | 5F5F | 7566 | 636E | 0201 | 011C | 2BBD | 0708 |
| 0000240020 | 017E | 0010 | 0173 | 0000 | 0D04 | 6666 | 675F | 7465 |
| 0000240040 | 665F | 6C69 | 6574 | 0C72 | 0604 | 9300 | 0606 | 6F66 |
| 0000240060 | 6D72 | 705F | 040C | 000A | 05B5 | 6606 | 746C | 5F72 |
| 0000240100 | 0C70 | FA04 | C0FF | 0600 | 5F5F | 7974 | 6570 | 040F |
| 0000240120 | FFF4 | 0085 | 5F09 | 625F | 5F78 | 7974 | 6570 | 040D |
| 0000240140 | FFE4 | 04DE | 5F07 | 705F | 6972 | 746E | 040B | FFDC |
| 0000240160 | 0202 | 5F05 | 6C5F | 6C76 | 040D | FFE8 | 06DC | 5F07 |
| 0000240200 | 635F | 6F6C | 6B63 | 040D | FFF6 | 00C0 | 5F07 | 735F |
| 0000240220 | 6174 | 6B63 | 040E | FFE2 | 0081 | 5F08 | 725F | 7465 |
| 0000240240 | 6176 | 0E6C | 6805 | 0503 | 0600 | 0607 | 5F5F | 7566 |
| 0000240260 | 636E | 0201 | 011C | 2D3B | 070A | 0317 | 0010 | 030C |
| 0000240300 | 0000 | 0D04 | 6666 | 6E5F | 7765 | 665F | 6C69 | 6574 |
| 0000240320 | 0C72 | 0604 | D300 | 0605 | 6C66 | 7274 | 705F | 040E |
| 0000240340 | FFD8 | 0081 | 5F08 | 725F | 7465 | 6176 | 0D6C | F404 |
| 0000240360 | 81FF | 0700 | 6C66 | 7274 | 6E5F | 0C6F | F604 | 93FF |
| 0000240400 | 0606 | 6F66 | 6D72 | 705F | 0410 | FFEC | 0085 | 6D0A |
| 0000240420 | 646F | 6669 | 6569 | 5F64 | 0866 | EE04 | 81FF | 0200 |
| 0000240440 | 6372 | 040C | FFFA | 00C0 | 5F06 | 745F | 7079 | 0F65 |
| 0000240460 | EA04 | 85FF | 0900 | 5F5F | 7862 | 745F | 7079 | 0D65 |
| 0000240500 | DA04 | DEFF | 0704 | 5F5F | 7270 | 6E69 | 0B74 | D204 |
| 0000240520 | 02FF | 0502 | 5F5F | 766C | 0D6C | DE04 | DCFF | 0706 |
| 0000240540 | 5F5F | 6C63 | 636F | 0D6B | F004 | C0FF | 0700 | 5F5F |
| 0000240560 | 7473 | 6361 | 0E6B | 8405 | 0503 | 0600 | 0607 | 5F5F |
| 0000240600 | 7566 | 636E | 0201 | 0121 | 3052 | 070C | 012B | 0010 |
| 0000240620 | 0120 | 0000 | 1204 | 6666 | 735F | 7465 | 665F | 746C |
| 0000240640 | 5F72 | 696C | 5F62 | 6469 | 040C | 0006 | 0086 | 6C06 |
| 0000240660 | 6269 | 695F | 0C64 | FA04 | C0FF | 0600 | 5F5F | 7974 |
| 0000240700 | 6570 | 040F | FFF4 | 0085 | 5F09 | 625F | 5F78 | 7974 |
| 0000240720 | 6570 | 040D | FFE4 | 04DE | 5F07 | 705F | 6972 | 746E |
| 0000240740 | 040B | FFDC | 0202 | 5F05 | 6C5F | 6C76 | 040D | FFE8 |
| 0000240760 | 06DC | 5F07 | 635F | 6F6C | 6B63 | 040D | FFF6 | 00C0 |
| 0000241000 | 5F07 | 735F | 6174 | 6B63 | 040E | FFE2 | 0081 | 5F08 |
| 0000241020 | 725F | 7465 | 6176 | 0E6C | 9A05 | 0503 | 0200 | 0607 |
| 0000241040 | 5F5F | 7566 | 636E | 0201 | 0121 | 317D | 070E | 018D |
| 0000241060 | 0010 | 0182 | 0000 | 1204 | 6666 | 735F | 7465 | 665F |
| 0000241100 | 6C69 | 6574 | 5F72 | 696C | 7473 | 040C | 0006 | 0086 |
| 0000241120 | 6C06 | 6269 | 695F | 0F64 | 0A04 | 8100 | 0900 | 6F73 |
| 0000241140 | 7472 | 745F | 7079 | 0C65 | FA04 | C0FF | 0600 | 5F5F |
| 0000241160 | 7974 | 6570 | 040F | FFF2 | 0085 | 5F09 | 625F | 5F78 |
| 0000241200 | 7974 | 6570 | 040D | FFE2 | 04DE | 5F07 | 705F | 6972 |
| 0000241220 | 746E | 040B | FFDA | 0202 | 5F05 | 6C5F | 6C76 | 040D |
| 0000241240 | FFE6 | 06DC | 5F07 | 635F | 6F6C | 6B63 | 040D | FFF6 |
| 0000241260 | 00C0 | 5F07 | 735F | 6174 | 6B63 | 040E | FFE0 | 0081 |
| 0000241300 | 5F08 | 725F | 7465 | 6176 | 086C | F404 | 81FF | 0200 |
| 0000241320 | 6372 | 050E | 03BC | 0005 | 0702 | 5F06 | 665F | 6E75 |
| 0000241340 | 0163 | 0502 | 000D | 1A00 | 0F00 | 0805 | 0501 | C000 |
| 0000241360 | 0700 | 5F42 | 4678 | 6C69 | 0F65 | 0C05 | 0501 | C000 |
| 0000241400 | 0700 | 5F42 | 5078 | 6361 | 146B | 0005 | 0000 | 8100 |

THU MAR 14 17:34:20 1991 FL.DLL PAGE 63, LINE 3659

| | | | | | | | | |
|---|---|---|---|---|---|---|---|---|
| 0000241420 | 0C00 | 7842 | 445F | 6265 | 6775 | 6F4D | 6564 | 0514 |
| 0000241440 | 0000 | 0000 | 0081 | 420C | 5F78 | 6954 | 656D | 4D73 |
| 0000241460 | 646F | 1065 | 0005 | 0000 | 8100 | 0800 | 7842 | 425F |
| 0000241500 | 735F | 6769 | 0510 | 1236 | 0005 | 0086 | 6C08 | 6269 |
| 0000241520 | 695F | 5F64 | 1173 | CC05 | 0513 | 8600 | 0900 | 6574 |
| 0000241540 | 7473 | 695F | 5F64 | 0E73 | DE05 | 0515 | BC00 | 0605 |
| 0000241560 | 696C | 7473 | 735F | 050F | 1232 | 0005 | 0081 | 6307 |
| 0000241600 | 756F | 746E | 735F | 0513 | 123A | 0005 | 06D2 | 640B |
| 0000241620 | 7369 | 5F70 | 696C | 7473 | 735F | 0519 | 116A | 0005 |
| 0000241640 | 06D3 | 6411 | 7369 | 5F70 | 6F6D | 6964 | 6966 | 6465 |
| 0000241660 | 665F | 735F | 0514 | 13CA | 0005 | 0081 | 640C | 7369 |
| 0000241700 | 5F70 | 6F63 | 6E75 | 5F74 | 0E73 | D005 | 0513 | 8900 |
| 0000241720 | 0606 | 6F66 | 6D72 | 735F | 050F | 1234 | 0005 | 0085 |
| 0000241740 | 6E07 | 7765 | 665F | 735F | 0512 | 0110 | 0005 | 0085 |
| 0000241760 | 610A | 6F62 | 7472 | 6F5F | 5F70 | 1773 | 1205 | 0501 |
| 0000242000 | 8500 | 0F00 | 6C66 | 7274 | 645F | 6665 | 645F | 7365 |
| 0000242020 | 5F74 | 1173 | 1405 | 0501 | 8100 | 0900 | 616C | 7473 |
| 0000242040 | 6E5F | 5F6F | 1373 | 1605 | 0501 | 5400 | 0B02 | 6469 |
| 0000242060 | 656C | 6E5F | 6D61 | 5F65 | 0573 | 0111 | 0000 | 1500 |
| 0000242100 | 0A01 | CD33 | 8105 | 1003 | 7600 | 0003 | 0400 | 6506 |
| 0000242120 | 5F65 | 6C64 | 0D67 | 0604 | 8500 | 0700 | 706F | 635F |
| 0000242140 | 646F | 0C65 | 0804 | A100 | 0605 | 6F66 | 6D72 | 705F |
| 0000242160 | 040C | FFFA | 00C0 | 5F06 | 745F | 7079 | 0F65 | EE04 |
| 0000242200 | 85FF | 0900 | 5F5F | 7862 | 745F | 7079 | 0D65 | DE04 |
| 0000242220 | D1FF | 0705 | 5F5F | 7270 | 6E69 | 0B74 | D604 | 02FF |
| 0000242240 | 0502 | 5F5F | 766C | 0D6C | E204 | D3FF | 0705 | 5F5F |
| 0000242260 | 6C63 | 636F | 0D6B | F604 | C0FF | 0700 | 5F5F | 7473 |
| 0000242300 | 6361 | 0E6B | DC04 | 81FF | 0800 | 5F5F | 6572 | 7674 |
| 0000242320 | 6C61 | 040E | FF7C | 057D | 6608 | 746C | 5F72 | 736D |
| 0000242340 | 0C67 | F004 | B8FF | 0604 | 6C66 | 7274 | 705F | 0408 |
| 0000242360 | FFF4 | 0081 | 7202 | 0E63 | 2E05 | 0504 | D000 | 0605 |
| 0000242400 | 5F5F | 7566 | 636E | 0201 | 011B | 368B | 05D7 | 018B |
| 0000242420 | 0010 | 0180 | 0000 | 0C04 | 6565 | 695F | 696E | 5F74 |
| 0000242440 | 6F66 | 6D72 | 040C | 0006 | 05A1 | 6606 | 726F | 5F6D |
| 0000242460 | 0C70 | FA04 | C0FF | 0600 | 5F5F | 7974 | 6570 | 040F |
| 0000242500 | FFF2 | 0085 | 5F09 | 625F | 5F78 | 7974 | 6570 | 040D |
| 0000242520 | FFE2 | 05D1 | 5F07 | 705F | 6972 | 746E | 040B | FFDA |
| 0000242540 | 0202 | 5F05 | 6C5F | 6C76 | 040D | FFE6 | 05D3 | 5F07 |
| 0000242560 | 635F | 6F6C | 6B63 | 040D | FFF6 | 00C0 | 5F07 | 735F |
| 0000242600 | 6174 | 6B63 | 040E | FFE0 | 0081 | 5F08 | 725F | 7465 |
| 0000242620 | 6176 | 076C | F404 | 85FF | 0100 | 0E69 | 6005 | 0504 |
| 0000242640 | 4F00 | 0602 | 5F5F | 7566 | 636E | 0201 | 011C | 3816 |
| 0000242660 | 05DD | 0234 | 0010 | 0229 | 0000 | 0D04 | 6565 | 735F |
| 0000242700 | 7465 | 665F | 6C69 | 6574 | 0E72 | 0604 | B800 | 0804 |
| 0000242720 | 6966 | 746C | 7265 | 705F | 040C | 000A | 05A1 | 6606 |
| 0000242740 | 726F | 5F6D | 0C70 | FA04 | C0FF | 0600 | 5F5F | 7974 |
| 0000242760 | 6570 | 040F | FFEE | 0085 | 5F09 | 625F | 5F78 | 7974 |
| 0000243000 | 6570 | 040D | FFDE | 05D1 | 5F07 | 705F | 6972 | 746E |
| 0000243020 | 040B | FFD6 | 0202 | 5F05 | 6C5F | 6C76 | 040D | FFE2 |
| 0000243040 | 05D3 | 5F07 | 635F | 6F6C | 6B63 | 040D | FFF6 | 00C0 |
| 0000243060 | 5F07 | 735F | 6174 | 6B63 | 040E | FFDC | 0081 | 5F08 |
| 0000243100 | 725F | 7465 | 6176 | 106C | F204 | C0FF | 0A00 | 6974 |
| 0000243120 | 656D | 735F | 7274 | 705F | 0407 | FFF0 | 0085 | 6901 |
| 0000243140 | 050E | 0484 | 0005 | 05DF | 5F06 | 665F | 6E75 | 0163 |
| 0000243160 | 1C02 | 4A01 | E23A | 7E05 | 1001 | 7300 | 0001 | 0400 |
| 0000243200 | 650D | 5F65 | 6567 | 5F74 | 6966 | 746C | 7265 | 040C |
| 0000243220 | 0006 | 05A1 | 6606 | 726F | 5F6D | 0E70 | 0A04 | B800 |
| 0000243240 | 0804 | 6966 | 746C | 7265 | 705F | 040F | FFF4 | 0085 |
| 0000243260 | 5F09 | 625F | 5F78 | 7974 | 6570 | 040D | FFE4 | 05D1 |

THU MAR 14 17:34:20 1991 FL.DLL PAGE 64, LINE 3718

| | | | | | | | | |
|---|---|---|---|---|---|---|---|---|
| 0000243300 | 5F07 | 705F | 6972 | 746E | 040B | FFDC | 0202 | 5F05 |
| 0000243320 | 6C5F | 6C76 | 040D | FFE8 | 05D3 | 5F07 | 635F | 6F6C |
| 0000243340 | 6B63 | 040D | FFF6 | 00C0 | 5F07 | 735F | 6174 | 6B63 |
| 0000243360 | 040E | FFE2 | 0081 | 5F08 | 725F | 7465 | 6176 | 0C6C |
| 0000243400 | FA04 | C0FF | 0600 | 5F5F | 7974 | 6570 | 050E | 049A |
| 0000243420 | 0005 | 05DF | 5F06 | 665F | 6E75 | 0163 | 2102 | C801 |
| 0000243440 | E43B | 1E05 | 1001 | 1300 | 0001 | 0400 | 6612 | 5F66 |
| 0000243460 | 6573 | 5F74 | 7865 | 7063 | 6C5F | 6269 | 695F | 0C64 |
| 0000243500 | 0604 | 8600 | 0600 | 696C | 5F62 | 6469 | 040C | FFFA |
| 0000243520 | 00C0 | 5F06 | 745F | 7079 | 0F65 | F404 | 85FF | 0900 |
| 0000243540 | 5F5F | 7862 | 745F | 7079 | 0D65 | E404 | D1FF | 0705 |
| 0000243560 | 5F5F | 7270 | 6E69 | 0B74 | DC04 | 02FF | 0502 | 5F5F |
| 0000243600 | 766C | 0D6C | E804 | D3FF | 0705 | 5F5F | 6C63 | 636F |
| 0000243620 | 0D6B | F604 | C0FF | 0700 | 5F5F | 7473 | 6361 | 0E6B |
| 0000243640 | E204 | 81FF | 0800 | 5F5F | 6572 | 7674 | 6C61 | 050E |
| 0000243660 | 04B0 | 0005 | 05E5 | 5F06 | 665F | 6E75 | 0163 | 0502 |
| 0000243700 | 000D | 1A00 | 1000 | E205 | 0515 | 8600 | 0800 | 696C |
| 0000243720 | 5F62 | 6469 | 735F | 050F | 0426 | 0005 | 00C0 | 4207 |
| 0000243740 | 785F | 6946 | 656C | 050F | 042A | 0005 | 00C0 | 4207 |
| 0000243760 | 785F | 6150 | 6B63 | 0514 | 0000 | 0000 | 0081 | 420C |
| 0000244000 | 5F78 | 6544 | 7562 | 4D67 | 646F | 1465 | 0005 | 0000 |
| 0000244020 | 8100 | 0C00 | 7842 | 545F | 6D69 | 7365 | 6F4D | 6564 |
| 0000244040 | 0510 | 0000 | 0000 | 0081 | 4208 | 5F78 | 5F42 | 6973 |
| 0000244060 | 0567 | 0111 | 0000 | 1C00 | E601 | CE3C | B906 | 1001 |
| 0000244100 | AE00 | 0001 | 0400 | 660D | 5F66 | 5F75 | 6964 | 7073 |
| 0000244120 | 645F | 676C | 040C | 0006 | 068E | 6606 | 726F | 5F6D |
| 0000244140 | 0C70 | FA04 | C0FF | 0600 | 5F5F | 7974 | 6570 | 040F |
| 0000244160 | FFEC | 0085 | 5F09 | 625F | 5F78 | 7974 | 6570 | 040D |
| 0000244200 | FFDC | 04F5 | 5F07 | 705F | 6972 | 746E | 040B | FFD4 |
| 0000244220 | 0202 | 5F05 | 6C5F | 6C76 | 040D | FFE0 | 06D3 | 5F07 |
| 0000244240 | 635F | 6F6C | 6B63 | 040D | FFF2 | 00C0 | 5F07 | 735F |
| 0000244260 | 6174 | 6B63 | 040E | FFDA | 0081 | 5F08 | 725F | 7465 |
| 0000244300 | 6176 | 0A6C | EE04 | 85FF | 0400 | 6D68 | 646F | 040A |
| 0000244320 | FFF6 | 00C0 | 6804 | 6E77 | 0864 | F004 | 81FF | 0200 |
| 0000244340 | 6372 | 050E | 04F2 | 0005 | 06D1 | 5F06 | 665F | 6E75 |
| 0000244360 | 0163 | 1C02 | 9F01 | D53E | DF06 | 1603 | D100 | 0003 |
| 0000244400 | 0400 | 660D | 5F66 | 5F75 | 6C64 | 5F67 | 7270 | 636F |
| 0000244420 | 040A | 0010 | 00C0 | 6804 | 6E77 | 0964 | 0E04 | 8500 |
| 0000244440 | 0300 | 736D | 0967 | 0A04 | C000 | 0300 | 706D | 0931 |
| 0000244460 | 06D4 | C000 | 0300 | 706D | 0D32 | FC04 | 85FF | 0700 |
| 0000244500 | 706F | 635F | 646F | 0B65 | FA04 | 81FF | 0500 | 7265 |
| 0000244520 | 6F72 | 0972 | F804 | 81FF | 0300 | 7269 | 0163 | 1A02 |
| 0000244540 | 7E01 | D842 | 2306 | 1000 | 1800 | 0000 | 0400 | 660B |
| 0000244560 | 5F66 | 5F71 | 6F66 | 6D72 | 705F | 0201 | 011E | 42A1 |
| 0000244600 | 06DA | 02CC | 0010 | 02C1 | 0000 | 0F04 | 5F66 | 5F75 |
| 0000244620 | 5F77 | 6C66 | 7274 | 665F | 726F | 0C6D | 0604 | 8E00 |
| 0000244640 | 0606 | 6F66 | 6D72 | 705F | 040F | FFC2 | 0085 | 5F09 |
| 0000244660 | 625F | 5F78 | 7974 | 6570 | 040D | FFB2 | 04F5 | 5F07 |
| 0000244700 | 705F | 6972 | 746E | 040B | FFAA | 0202 | 5F05 | 6C5F |
| 0000244720 | 6C76 | 040D | FFB6 | 06D3 | 5F07 | 635F | 6F6C | 6B63 |
| 0000244740 | 040D | FFF6 | 00C0 | 5F07 | 735F | 6174 | 6B63 | 040E |
| 0000244760 | FFB0 | 0081 | 5F08 | 725F | 7465 | 6176 | 096C | C404 |
| 0000245000 | DEFF | 0306 | 7473 | 0C72 | FA04 | C0FF | 0600 | 5F5F |
| 0000245020 | 7974 | 6570 | 050E | 0556 | 0005 | 06DC | 5F06 | 665F |
| 0000245040 | 6E75 | 0163 | 1D02 | 6D01 | E345 | 2F06 | 1001 | 2400 |
| 0000245060 | 0001 | 0400 | 660E | 755F | 775F | 675F | 6F6C | 6162 |
| 0000245100 | 5F6C | 0E66 | 0604 | 8500 | 0800 | 6C67 | 626F | 6C61 |
| 0000245120 | 665F | 040C | FFFA | 00C0 | 5F06 | 745F | 7079 | 0F65 |
| 0000245140 | F404 | 85FF | 0900 | 5F5F | 7862 | 745F | 7079 | 0D65 |

THU MAR 14 17:34:20 1991 FL.DLL PAGE 65, LINE 3777

| | | | | | | | | |
|---|---|---|---|---|---|---|---|---|
| 0000245160 | E404 | F5FF | 0704 | 5F5F | 7270 | 6E69 | 0B74 | DC04 |
| 0000245200 | 02FF | 0502 | 5F5F | 766C | 0D6C | E804 | D3FF | 0706 |
| 0000245220 | 5F5F | 6C63 | 636F | 0D6B | F604 | C0FF | 0700 | 5F5F |
| 0000245240 | 7473 | 6361 | 0E6B | E204 | 81FF | 0800 | 5F5F | 6572 |
| 0000245260 | 7674 | 6C61 | 050E | 056E | 0005 | 06E5 | 5F06 | 665F |
| 0000245300 | 6E75 | 0163 | 1A02 | 9C01 | E746 | 5506 | 1001 | 4A00 |
| 0000245320 | 0001 | 0400 | 660B | 5F66 | 5F75 | 6E65 | 6261 | 656C |
| 0000245340 | 040A | 0006 | 0085 | 6604 | 616C | 0167 | 2102 | F101 |
| 0000245360 | E947 | 6306 | 1001 | 5800 | 0001 | 0400 | 6612 | 5F66 |
| 0000245400 | 5F75 | 6567 | 5F74 | 6F66 | 6D72 | 695F | 666E | 0C6F |
| 0000245420 | 0604 | 8E00 | 0606 | 6F66 | 6D72 | 705F | 040C | FFFA |
| 0000245440 | 00C0 | 5F06 | 745F | 7079 | 0F65 | F204 | 85FF | 0900 |
| 0000245460 | 5F5F | 7862 | 745F | 7079 | 0D65 | E004 | F5FF | 0704 |
| 0000245500 | 5F5F | 7270 | 6E69 | 0B74 | D804 | 02FF | 0502 | 5F5F |
| 0000245520 | 766C | 0D6C | E604 | D3FF | 0706 | 5F5F | 6C63 | 636F |
| 0000245540 | 0D6B | F604 | C0FF | 0700 | 5F5F | 7473 | 6361 | 0E6B |
| 0000245560 | DE04 | 81FF | 0800 | 5F5F | 6572 | 7674 | 6C61 | 0409 |
| 0000245600 | FFE4 | 0085 | 6603 | 6372 | 0408 | FFF4 | 0081 | 7202 |
| 0000245620 | 0E63 | 8C05 | 0505 | EB00 | 0606 | 5F5F | 7566 | 636E |
| 0000245640 | 0201 | 011B | 4954 | 06EC | 0025 | 0010 | 001A | 0000 |
| 0000245660 | 0C04 | 5F66 | 5F75 | 6567 | 5F74 | 7768 | 646E | 0201 |
| 0000245700 | 011E | 4979 | 06EE | 0196 | 0010 | 018B | 0000 | 0F04 |
| 0000245720 | 6666 | 755F | 645F | 7369 | 5F70 | 6261 | 726F | 0C74 |
| 0000245740 | 0604 | C000 | 0600 | 6574 | 7478 | 705F | 040C | FFFA |
| 0000245760 | 00C0 | 5F06 | 745F | 7079 | 0F65 | EC04 | 85FF | 0900 |
| 0000246000 | 5F5F | 7862 | 745F | 7079 | 0D65 | DC04 | F5FF | 0704 |
| 0000246020 | 5F5F | 7270 | 6E69 | 0B74 | D404 | 02FF | 0502 | 5F5F |
| 0000246040 | 766C | 0D6C | E004 | D3FF | 0706 | 5F5F | 6C63 | 636F |
| 0000246060 | 0D6B | F204 | C0FF | 0700 | 5F5F | 7473 | 6361 | 0E6B |
| 0000246100 | DA04 | 81FF | 0800 | 5F5F | 6572 | 7674 | 6C61 | 040A |
| 0000246120 | FFEE | 0085 | 6804 | 6F6D | 0A64 | F604 | C0FF | 0400 |
| 0000246140 | 7768 | 646E | 0408 | FFF0 | 0081 | 7202 | 0E63 | AE05 |
| 0000246160 | 0505 | DC00 | 0606 | 5F5F | 7566 | 636E | 0201 | 011E |
| 0000246200 | 4B0F | 06F0 | 00C0 | 0016 | 00B2 | 0000 | 0F04 | 6666 |
| 0000246220 | 755F | 615F | 6F62 | 7472 | 705F | 6F72 | 0A63 | 1004 |
| 0000246240 | C000 | 0400 | 7768 | 646E | 0409 | 000E | 0085 | 6D03 |
| 0000246260 | 6773 | 0409 | 000A | 00C0 | 6D03 | 3170 | 0409 | 0006 |
| 0000246300 | 00C0 | 6D03 | 3270 | 0201 | 0121 | 4BCF | 06F2 | 0120 |
| 0000246320 | 0010 | 0115 | 0000 | 1204 | 6666 | 755F | 645F | 7369 |
| 0000246340 | 696D | 7373 | 615F | 6F62 | 7472 | 040C | FFFA | 00C0 |
| 0000246360 | 5F06 | 745F | 7079 | 0F65 | F404 | 85FF | 0900 | 5F5F |
| 0000246400 | 7862 | 745F | 7079 | 0D65 | E404 | F5FF | 0704 | 5F5F |
| 0000246420 | 7270 | 6E69 | 0B74 | DC04 | 02FF | 0502 | 5F5F | 766C |
| 0000246440 | 0D6C | E804 | D3FF | 0706 | 5F5F | 6C63 | 636F | 0D6B |
| 0000246460 | F604 | C0FF | 0700 | 5F5F | 7473 | 6361 | 0E6B | E204 |
| 0000246500 | 81FF | 0800 | 5F5F | 6572 | 7674 | 6C61 | 050E | 05E0 |
| 0000246520 | 0005 | 06EB | 5F06 | 665F | 6E75 | 0163 | 0502 | 000D |
| 0000246540 | 1A00 | 0F00 | E205 | 0504 | C000 | 0700 | 5F42 | 4678 |
| 0000246560 | 6C69 | 0F65 | E605 | 0504 | C000 | 0700 | 5F42 | 5078 |
| 0000246600 | 6361 | 0E6B | EA05 | 0515 | 8400 | 0606 | 6F66 | 6D72 |
| 0000246620 | 735F | 0514 | 0000 | 0000 | 0081 | 420C | 5F78 | 6544 |
| 0000246640 | 7562 | 4D67 | 646F | 1065 | E605 | 0515 | 8E00 | 0806 |
| 0000246660 | 6F66 | 6D72 | 705F | 735F | 0514 | 0000 | 0000 | 0081 |
| 0000246700 | 420C | 5F78 | 6954 | 656D | 4D73 | 646F | 0E65 | EA05 |
| 0000246720 | 0504 | C000 | 0600 | 7768 | 646E | 735F | 0514 | 04EE |
| 0000246740 | 0005 | 00C0 | 610C | 6F62 | 7472 | 685F | 6E77 | 5F64 |
| 0000246760 | 0573 | 0111 | 0000 | 1C00 | F001 | 124C | A107 | 1001 |
| 0000247000 | 9600 | 0001 | 0400 | 650D | 5F65 | 5F75 | 6964 | 7073 |
| 0000247020 | 645F | 676C | 040C | 0006 | 06E6 | 6606 | 726F | 5F6D |

THU MAR 14 17:34:20 1991 FL.DLL PAGE 66, LINE 3836

| | | | | | | | | |
|---|---|---|---|---|---|---|---|---|
| 0000247040 | 0C70 | FA04 | C0FF | 0600 | 5F5F | 7974 | 6570 | 040F |
| 0000247060 | FFF0 | 0085 | 5F09 | 625F | 5F78 | 7974 | 6570 | 040D |
| 0000247100 | FFE0 | 04F5 | 5F07 | 705F | 6972 | 746E | 040B | FFD8 |
| 0000247120 | 0202 | 5F05 | 6C5F | 6C76 | 040D | FFE4 | 0717 | 5F07 |
| 0000247140 | 635F | 6F6C | 6B63 | 040D | FFF6 | 00C0 | 5F07 | 735F |
| 0000247160 | 6174 | 6B63 | 040E | FFDE | 0081 | 5F08 | 725F | 7465 |
| 0000247200 | 6176 | 0A6C | F204 | 85FF | 0400 | 6D68 | 646F | 0408 |
| 0000247220 | FFF4 | 0081 | 7202 | 0E63 | 1A05 | 0506 | 1500 | 0607 |
| 0000247240 | 5F5F | 7566 | 636E | 0201 | 011C | 4E91 | 0719 | 02A2 |
| 0000247260 | 0016 | 0294 | 0000 | 0D04 | 6565 | 755F | 645F | 676C |
| 0000247300 | 705F | 6F72 | 0A63 | 1004 | C000 | 0400 | 7768 | 646E |
| 0000247320 | 04Q9 | 000E | 0085 | 6D03 | 6773 | 0409 | 000A | 00C0 |
| 0000247340 | 6D03 | 3170 | 0409 | 0006 | 00C0 | 6D03 | 3270 | 040E |
| 0000247360 | FFFC | 0085 | 6108 | 6F62 | 7472 | 6F5F | 0D70 | FA04 |
| 0000247400 | 85FF | 0700 | 706F | 635F | 646F | 0B65 | F804 | 81FF |
| 0000247420 | 0500 | 7265 | 6F72 | 0172 | 1A02 | 3301 | 1C51 | 2307 |
| 0000247440 | 1000 | 1800 | 0000 | 0400 | 650B | 5F65 | 5F71 | 6F66 |
| 0000247460 | 6D72 | 705F | 0201 | 011E | 5156 | 071E | 025B | 0010 |
| 0000247500 | 0250 | 0000 | 0F04 | 5F65 | 5F75 | 5F77 | 7865 | 7063 |
| 0000247520 | 665F | 726F | 0C6D | 0604 | E600 | 0606 | 6F66 | 6D72 |
| 0000247540 | 705F | 040C | FFFA | 00C0 | 5F06 | 745F | 7079 | 0F65 |
| 0000247560 | C204 | 85FF | 0900 | 5F5F | 7862 | 745F | 7079 | 0D65 |
| 0000247600 | B204 | F5FF | 0704 | 5F5F | 7270 | 6E69 | 0B74 | AA04 |
| 0000247620 | 02FF | 0502 | 5F5F | 766C | 0D6C | B604 | 17FF | 0707 |
| 0000247640 | 5F5F | 6C63 | 636F | 0D6B | F604 | C0FF | 0700 | 5F5F |
| 0000247660 | 7473 | 6361 | 0E6B | B004 | 81FF | 0800 | 5F5F | 6572 |
| 0000247700 | 7674 | 6C61 | 0409 | FFC4 | 0722 | 7303 | 7274 | 050E |
| 0000247720 | 0656 | 0005 | 0720 | 5F06 | 665F | 6E75 | 0163 | 2102 |
| 0000247740 | B101 | 2553 | 0F07 | 1002 | 0400 | 0002 | 0400 | 6512 |
| 0000247760 | 5F65 | 5F75 | 6567 | 5F74 | 6F66 | 6D72 | 695F | 666E |
| 0000250000 | 0C6F | 0604 | E600 | 0606 | 6F66 | 6D72 | 705F | 040C |
| 0000250020 | FFFA | 00C0 | 5F06 | 745F | 7079 | 0F65 | F204 | 85FF |
| 0000250040 | 0900 | 5F5F | 7862 | 745F | 7079 | 0D65 | E004 | F5FF |
| 0000250060 | 0704 | 5F5F | 7270 | 6E69 | 0B74 | D804 | 02FF | 0502 |
| 0000250100 | 5F5F | 766C | 0D6C | E604 | 17FF | 0707 | 5F5F | 6C63 |
| 0000250120 | 636F | 0D6B | F604 | C0FF | 0700 | 5F5F | 7473 | 6361 |
| 0000250140 | 0E6B | DE04 | 81FF | 0800 | 5F5F | 6572 | 7674 | 6C61 |
| 0000250160 | 040A | FFD6 | 0085 | 6F04 | 5F6B | 0966 | E404 | 85FF |
| 0000250200 | 0300 | 7266 | 0863 | F404 | 81FF | 0200 | 6372 | 050E |
| 0000250220 | 0674 | 0005 | 0727 | 5F06 | 665F | 6E75 | 0163 | 1B02 |
| 0000250240 | C001 | 2855 | 2507 | 1000 | 1A00 | 0000 | 0400 | 650C |
| 0000250260 | 755F | 675F | 7465 | 685F | 6E77 | 0164 | 0E02 | 0005 |
| 0000250300 | 0518 | CE00 | 0606 | 6F66 | 6D72 | 735F | 0510 | 17F8 |
| 0000250320 | 0005 | 06E6 | 6608 | 726F | 5F6D | 5F70 | 0E73 | FC05 |
| 0000250340 | 0517 | C000 | 0600 | 7768 | 646E | 735F | 0D05 | 0000 |
| 0000250360 | 001A | 050F | 0612 | 0005 | 00C0 | 4207 | 785F | 6946 |
| 0000250400 | 656C | 050F | 0616 | 0005 | 00C0 | 4207 | 785F | 6150 |
| 0000250420 | 6B63 | 0514 | 0000 | 0000 | 0081 | 420C | 5F78 | 6544 |
| 0000250440 | 7562 | 4D67 | 646F | 1465 | 0005 | 0000 | 8100 | 0C00 |
| 0000250460 | 7842 | 545F | 6D69 | 7365 | 6F4D | 6564 | 1105 | 0001 |
| 0000250500 | 0000 | 011D | 55E6 | 0542 | 010E | 0010 | 0103 | 0000 |
| 0000250520 | 0E04 | 6666 | 735F | 6165 | 6372 | 5F68 | 6C66 | 7274 |
| 0000250540 | 0411 | 0006 | 00C0 | 660B | 746C | 5F72 | 616E | 656D |
| 0000250560 | 705F | 0411 | 000A | 042A | 640B | 7369 | 5F70 | 696C |
| 0000250600 | 7473 | 705F | 0410 | 000E | 0081 | 640A | 7369 | 5F70 |
| 0000250620 | 6F63 | 6E75 | 0C74 | 1004 | 8600 | 0600 | 696C | 5F62 |
| 0000250640 | 6469 | 040C | 0014 | 0422 | 6606 | 746C | 5F72 | 1470 |
| 0000250660 | DC04 | 1EFF | 0E04 | 6C66 | 7274 | 6E5F | 6D61 | 5F65 |
| 0000250700 | 696C | 7473 | 040E | FFD6 | 0085 | 6E08 | 666F | 665F |

THU MAR 14 17:34:20 1991 FL.DLL PAGE 67, LINE 3895

| | | | | | | | | |
|---|---|---|---|---|---|---|---|---|
| 0000250720 | 746C | 0F72 | D204 | 22FF | 0904 | 6E69 | 665F | 746C |
| 0000250740 | 5F72 | 0D70 | FC04 | 85FF | 0700 | 6F66 | 6E75 | 5F64 |
| 0000250760 | 0766 | D804 | 81FF | 0100 | 0869 | DA04 | 81FF | 0200 |
| 0000251000 | 6372 | 0201 | 0120 | 56F4 | 0544 | D08F | 0010 | 0084 |
| 0000251020 | 0000 | 1104 | 6666 | 645F | 5F62 | 6573 | 7261 | 6863 |
| 0000251040 | 665F | 746C | 0C72 | 0604 | 8600 | 0600 | 696C | 5F62 |
| 0000251060 | 6469 | 0411 | 000A | 00C0 | 660B | 746C | 5F72 | 616E |
| 0000251100 | 656D | 705F | 040C | 000E | 0422 | 6606 | 746C | 5F72 |
| 0000251120 | 1470 | DA04 | 1EFF | 0E04 | 6C66 | 7274 | 6E5F | 6D61 |
| 0000251140 | 5F65 | 696C | 7473 | 040E | FFD6 | 0085 | 6E08 | 666F |
| 0000251160 | 665F | 746C | 0F72 | FA04 | 22FF | 0904 | 6C66 | 7274 |
| 0000251200 | 6C5F | 7369 | 0874 | D804 | 81FF | 0200 | 6372 | 0201 |
| 0000251220 | 011B | 5783 | 0546 | 0094 | 0010 | 0089 | 0000 | 0C04 |
| 0000251240 | 6666 | 735F | 7661 | 5F65 | 6C66 | 7274 | 040C | 0006 |
| 0000251260 | 0086 | 6C06 | 6269 | 695F | 0C64 | 0A04 | 2200 | 0604 |
| 0000251300 | 6C66 | 7274 | 705F | 040F | FFDC | 0254 | 6609 | 746C |
| 0000251320 | 5F72 | 616E | 656D | 0408 | FFFC | 0081 | 7202 | 0163 |
| 0000251340 | 2002 | 1701 | 4858 | 1105 | 1002 | 0600 | 0002 | 0400 |
| 0000251360 | 6611 | 5F66 | 5F71 | 696C | 7473 | 625F | 5F79 | 616E |
| 0000251400 | 656D | 040C | 0006 | 00C0 | 6E06 | 6D61 | 5F65 | 0C70 |
| 0000251420 | 0A04 | 2900 | 0604 | 696C | 7473 | 705F | 040B | 000E |
| 0000251440 | 0081 | 6305 | 756F | 746E | 040F | 0010 | 0085 | 6609 |
| 0000251460 | 726F | 6177 | 6472 | 665F | 040D | 0012 | 00C1 | 6907 |
| 0000251500 | 646E | 7865 | 705F | 040C | FFFA | 00C0 | 5F06 | 745F |
| 0000251520 | 7079 | 0F65 | F004 | 85FF | 0900 | 5F5F | 7862 | 745F |
| 0000251540 | 7079 | 0D65 | E004 | 4DFF | 0705 | 5F5F | 7270 | 6E69 |
| 0000251560 | 0B74 | D804 | 02FF | 0502 | 5F5F | 766C | 0D6C | E404 |
| 0000251600 | 4FFF | 0705 | 5F5F | 6C63 | 636F | 0D6B | F604 | C0FF |
| 0000251620 | 0700 | 5F5F | 7473 | 6361 | 0E6B | DE04 | 81FF | 0800 |
| 0000251640 | 5F5F | 6572 | 7674 | 6C61 | 0407 | FFF2 | 0081 | 6901 |
| 0000251660 | 0408 | FFF4 | 0081 | 7202 | 0E63 | AE05 | 0506 | 4B00 |
| 0000251700 | 0605 | 5F5F | 7566 | 636E | 0201 | 0125 | 5A28 | 0551 |
| 0000251720 | 021F | 0010 | 0214 | 0000 | 1604 | 6666 | 715F | 645F |
| 0000251740 | 7369 | 5F70 | 696C | 7473 | 625F | 5F79 | 616E | 656D |
| 0000251760 | 040C | 0006 | 00C0 | 6E06 | 6D61 | 5F65 | 0C70 | 0A04 |
| 0000252000 | 2A00 | 0604 | 696C | 7473 | 705F | 040B | 000E | 0081 |
| 0000252020 | 6305 | 756F | 746E | 040F | 0010 | 0085 | 6609 | 726F |
| 0000252040 | 6177 | 6472 | 665F | 040D | 0012 | 00C1 | 6907 | 646E |
| 0000252060 | 7865 | 705F | 040C | FFFA | 00C0 | 5F06 | 745F | 7079 |
| 0000252100 | 0F65 | F004 | 85FF | 0900 | 5F5F | 7862 | 745F | 7079 |
| 0000252120 | 0D65 | E004 | 4DFF | 0705 | 5F5F | 7270 | 6E69 | 0B74 |
| 0000252140 | D804 | 02FF | 0502 | 5F5F | 766C | 0D6C | E404 | 4FFF |
| 0000252160 | 0705 | 5F5F | 6C63 | 636F | 0D6B | F604 | C0FF | 0700 |
| 0000252200 | 5F5F | 7473 | 6361 | 0E6B | DE04 | 81FF | 0800 | 5F5F |
| 0000252220 | 6572 | 7674 | 6C61 | 0407 | FFF2 | 0081 | 6901 | 0408 |
| 0000252240 | FFF4 | 0081 | 7202 | 0E63 | CE05 | 0506 | 5300 | 0605 |
| 0000252260 | 5F5F | 7566 | 636E | 0201 | 011E | 5C47 | 0555 | 0179 |
| 0000252300 | 0010 | 016E | 0000 | 0F04 | 6666 | 635F | 7672 | 665F |
| 0000252320 | 746C | 5F72 | 736D | 0D67 | 0604 | 8100 | 0700 | 6F63 |
| 0000252340 | 6D6D | 6E61 | 0C64 | 0804 | 8500 | 0600 | 6C66 | 6761 |
| 0000252360 | 665F | 0410 | 000A | 053A | 660A | 746C | 5F72 | 736D |
| 0000252400 | 5F67 | 0C70 | FA04 | C0FF | 0600 | 5F5F | 7974 | 6570 |
| 0000252420 | 040F | FFF2 | 0085 | 5F09 | 625F | 5F78 | 7974 | 6570 |
| 0000252440 | 040D | FFE2 | 054D | 5F07 | 705F | 6972 | 746E | 040B |
| 0000252460 | FFDA | 0202 | 5F05 | 6C5F | 6C76 | 040D | FFE6 | 054F |
| 0000252500 | 5F07 | 635F | 6F6C | 6B63 | 040D | FFF6 | 00C0 | 5F07 |
| 0000252520 | 735F | 6174 | 6B63 | 040E | FFE0 | 0081 | 5F08 | 725F |
| 0000252540 | 7465 | 6176 | 106C | D604 | 56FF | 0A04 | 6572 | 7073 |
| 0000252560 | 6D5F | 6773 | 705F | 0408 | FFF4 | 0081 | 7202 | 0E63 |

THU MAR 14 17:34:20 1991 FL.DLL PAGE 68, LINE 3954

| | | | | | | | | |
|---|---|---|---|---|---|---|---|---|
| 0000252600 | F405 | 0506 | 5700 | 0605 | 5F5F | 7566 | 636E | 0201 |
| 0000252620 | 011E | 5DC0 | 0559 | 017D | 0010 | 0172 | 0000 | 0F04 |
| 0000252640 | 6666 | 635F | 7672 | 655F | 6964 | 5F74 | 736D | 0C67 |
| 0000252660 | 0604 | 8500 | 0600 | 6C66 | 6761 | 665F | 040C | FFFA |
| 0000252700 | 00C0 | 5F06 | 745F | 7079 | 0F65 | F204 | 85FF | 0900 |
| 0000252720 | 5F5F | 7862 | 745F | 7079 | 0D65 | E204 | 4DFF | 0705 |
| 0000252740 | 5F5F | 7270 | 6E69 | 0B74 | DA04 | 02FF | 0502 | 5F5F |
| 0000252760 | 766C | 0D6C | E604 | 4FFF | 0705 | 5F5F | 6C63 | 636F |
| 0000253000 | 0D6B | F604 | C0FF | 0700 | 5F5F | 7473 | 6361 | 0E6B |
| 0000253020 | E004 | 81FF | 0800 | 5F5F | 6572 | 7674 | 6C61 | 040E |
| 0000253040 | FF80 | 04F1 | 6608 | 746C | 5F72 | 736D | 1067 | 7C04 |
| 0000253060 | 56FF | 0A04 | 6572 | 7073 | 6D5F | 6773 | 705F | 0408 |
| 0000253100 | FFF4 | 0081 | 7202 | 0E63 | 1205 | 0507 | 5700 | 0605 |
| 0000253120 | 5F5F | 7566 | 636E | 0201 | 011F | 5F3D | 055B | 016E |
| 0000253140 | 0010 | 0163 | 0000 | 1004 | 6666 | 635F | 7672 | 705F |
| 0000253160 | 7261 | 6D61 | 6D5F | 6773 | 040D | 0006 | 0081 | 6307 |
| 0000253200 | 6D6F | 616D | 646E | 040B | 0008 | 0081 | 7005 | 7261 |
| 0000253220 | 6D61 | 040B | FFDA | 0202 | 5F05 | 6C5F | 6C76 | 040D |
| 0000253240 | FFE6 | 054F | 5F07 | 635F | 6F6C | 6B63 | 040D | FFF6 |
| 0000253260 | 00C0 | 5F07 | 735F | 6174 | 6B63 | 040E | FFE0 | 0081 |
| 0000253300 | 5F08 | 725F | 7465 | 6176 | 106C | D604 | 56FF | 0A04 |
| 0000253320 | 6572 | 7073 | 6D5F | 6773 | 705F | 0408 | FFF4 | 0081 |
| 0000253340 | 7202 | 0C63 | FA04 | C0FF | 0600 | 5F5F | 7974 | 6570 |
| 0000253360 | 040F | FFF2 | 0085 | 5F09 | 625F | 5F78 | 7974 | 6570 |
| 0000253400 | 040D | FFE2 | 054D | 5F07 | 705F | 6972 | 746E | 050E |
| 0000253420 | 0730 | 0005 | 055D | 5F06 | 665F | 6E75 | 0163 | 1D02 |
| 0000253440 | AB01 | 5F60 | 6D05 | 1001 | 6200 | 0001 | 0400 | 660E |
| 0000253460 | 5F66 | 7263 | 5F76 | 6D63 | 5F64 | 736D | 0D67 | 0604 |
| 0000253500 | 8100 | 0700 | 6F63 | 6D6D | 6E61 | 0C64 | FA04 | C0FF |
| 0000253520 | 0600 | 5F5F | 7974 | 6570 | 040F | FFF2 | 0085 | 5F09 |
| 0000253540 | 625F | 5F78 | 7974 | 6570 | 040D | FFE2 | 054D | 5F07 |
| 0000253560 | 705F | 6972 | 746E | 040B | FFDA | 0202 | 5F05 | 6C5F |
| 0000253600 | 6C76 | 040D | FFE6 | 054F | 5F07 | 635F | 6F6C | 6B63 |
| 0000253620 | 040D | FFF6 | 00C0 | 5F07 | 735F | 6174 | 6B63 | 040E |
| 0000253640 | FFE0 | 0081 | 5F08 | 725F | 7465 | 6176 | 106C | D604 |
| 0000253660 | 56FF | 0A04 | 6572 | 7073 | 6D5F | 6773 | 705F | 0408 |
| 0000253700 | FFF4 | 0081 | 7202 | 0E63 | 5005 | 0507 | 6100 | 0605 |
| 0000253720 | 5F5F | 7566 | 636E | 0201 | 011E | 6218 | 0563 | 01A4 |
| 0000253740 | 0010 | 0199 | 0000 | 0F04 | 6666 | 645F | 7369 | 5F70 |
| 0000253760 | 7265 | 5F72 | 736D | 0E67 | 0604 | 8100 | 0800 | 7265 |
| 0000254000 | 5F72 | 6F63 | 6564 | 040C | FFFA | 00C0 | 5F06 | 745F |
| 0000254020 | 7079 | 0F65 | EE04 | 85FF | 0900 | 5F5F | 7862 | 745F |
| 0000254040 | 7079 | 0D65 | DE04 | 4DFF | 0705 | 5F5F | 7270 | 6E69 |
| 0000254060 | 0B74 | D604 | 02FF | 0502 | 5F5F | 766C | 0D6C | E204 |
| 0000254100 | 4FFF | 0705 | 5F5F | 6C63 | 636F | 0D6B | F204 | C0FF |
| 0000254120 | 0700 | 5F5F | 7473 | 6361 | 0E6B | DC04 | 81FF | 0800 |
| 0000254140 | 5F5F | 6572 | 7674 | 6C61 | 040A | FFF6 | 00C0 | 6804 |
| 0000254160 | 6E77 | 0864 | F004 | 81FF | 0200 | 6372 | 050E | 0782 |
| 0000254200 | 0005 | 0557 | 5F06 | 665F | 6E75 | 0163 | 0502 | 000D |
| 0000254220 | 1A00 | 0F00 | 9805 | 0506 | C000 | 0700 | 5F42 | 4678 |
| 0000254240 | 6C69 | 0F65 | 9C05 | 0506 | C000 | 0700 | 5F42 | 5078 |
| 0000254260 | 6361 | 146B | 0005 | 0000 | 8100 | 0C00 | 7842 | 445F |
| 0000254300 | 6265 | 6775 | 6F4D | 6564 | 0514 | 0000 | 0000 | 0081 |
| 0000254320 | 420C | 5F78 | 6954 | 656D | 4D73 | 646F | 1065 | 0005 |
| 0000254340 | 0000 | 8100 | 0800 | 7842 | 425F | 735F | 6769 | 6606 |
| 0000254360 | 695F | 2E66 | 0163 | 3800 | 5300 | 0000 | 5400 | 1600 |
| 0000254400 | 5B00 | B300 | 6100 | B900 | 6400 | D000 | 6600 | E500 |
| 0000254420 | 6700 | FD00 | 6900 | 1500 | 6A01 | 1800 | 6D01 | 2C00 |
| 0000254440 | 7001 | 3600 | 7201 | 5300 | 7301 | 5D00 | 7501 | 6300 |

THU MAR 14 17:34:20 1991 FL.DLL PAGE 69, LINE 4013

| | | | | | | | | |
|---|---|---|---|---|---|---|---|---|
| 0000254460 | 7601 | 6600 | 7801 | 7000 | 7A01 | 7A00 | 7D01 | 8A00 |
| 0000254500 | 7F01 | A000 | 8101 | AA00 | 8401 | BE00 | 8801 | D000 |
| 0000254520 | 8A01 | DA00 | 8D01 | E600 | 8F01 | FB00 | 9001 | 0503 |
| 0000254540 | 9302 | 1600 | 9402 | A000 | AD02 | AE00 | AE02 | C400 |
| 0000254560 | B902 | 5700 | F803 | 5C00 | F903 | DA00 | 0E03 | E801 |
| 0000254600 | 0F03 | FE01 | 1503 | 9101 | 1904 | 9601 | 1D04 | A001 |
| 0000254620 | 2004 | AF01 | 2204 | B701 | 2604 | BD01 | 2804 | CE01 |
| 0000254640 | 2C04 | D101 | 2D04 | D601 | 2E04 | E101 | 2F04 | F501 |
| 0000254660 | 3104 | 0301 | 3505 | 0601 | 3705 | 0B01 | 3805 | 0E01 |
| 0000254700 | 3A05 | 2001 | 3E05 | 2301 | 4005 | 2801 | 4105 | 2B01 |
| 0000254720 | 4305 | 3901 | 4405 | B701 | 0905 | 6666 | 665F | 746C |
| 0000254740 | 2E72 | 0163 | 2000 | 6902 | C600 | 6A05 | D600 | 6F05 |
| 0000254760 | 6800 | 7106 | 7400 | 7206 | 8F00 | 7406 | 9200 | 7606 |
| 0000255000 | B300 | 7706 | CA00 | 7806 | E600 | 7906 | F000 | 7A06 |
| 0000255020 | FA00 | 7B06 | 0400 | 7E07 | 0E00 | 7FC7 | 7000 | 9307 |
| 0000255040 | 7B00 | 9407 | 8B00 | A107 | 1E00 | A508 | 2300 | A708 |
| 0000255060 | 8500 | A908 | 8A00 | AC08 | 9400 | AD08 | AB00 | B108 |
| 0000255100 | C100 | B308 | E600 | B408 | 0300 | B709 | 1B00 | B909 |
| 0000255120 | 4300 | BB09 | 4C00 | BC09 | 5E00 | BD09 | 6800 | BF09 |
| 0000255140 | 7600 | C409 | 7B00 | C609 | 8500 | C709 | 9700 | C909 |
| 0000255160 | A100 | CC09 | A700 | D109 | AD00 | D309 | B300 | D409 |
| 0000255200 | B900 | D609 | BF00 | D809 | C900 | D909 | DB00 | DB09 |
| 0000255220 | E400 | DD09 | E700 | DF09 | FE00 | E009 | 0700 | E20A |
| 0000255240 | 1B00 | E30A | 4300 | E60A | 4D00 | E80A | 5B00 | EA0A |
| 0000255260 | 6900 | EC0A | 7500 | ED0A | 8300 | F00A | 8F00 | F30A |
| 0000255300 | 9C00 | F80A | 9F00 | FA0A | B800 | FC0A | BD00 | FD0A |
| 0000255320 | C600 | 000A | D001 | 030A | D301 | 050A | DB01 | 090A |
| 0000255340 | E401 | 0B0A | 0801 | 0D0B | 1D01 | 0F0B | 2601 | 110B |
| 0000255360 | 2B01 | 120B | 4101 | 140B | 5A01 | 150B | 6001 | 170B |
| 0000255400 | 6A01 | 190B | 7401 | 1B0B | 7E01 | 1C0B | 9001 | 1E0B |
| 0000255420 | 9901 | 200B | 9C01 | 220B | B301 | 230B | BC01 | 260B |
| 0000255440 | D301 | 270B | FB01 | 290B | 0501 | 2A0C | 1301 | 2E0C |
| 0000255460 | 1901 | 300C | 2301 | 320C | 3101 | 340C | 4301 | 3C0C |
| 0000255500 | 4601 | 3E0C | 4C01 | 3F0C | 5601 | 410C | 5B01 | 420C |
| 0000255520 | 5E01 | 460C | 6401 | 480C | 6901 | 4D0C | 6C01 | 4F0C |
| 0000255540 | 7301 | 560C | 7601 | 580C | AF01 | 5A0C | D701 | 5C0C |
| 0000255560 | E001 | 5D0C | EA01 | 5F0C | EF01 | 600C | F201 | 630C |
| 0000255600 | F901 | 6A0C | FC01 | 6C0C | 3501 | 6E0D | 5D01 | 700D |
| 0000255620 | 6601 | 710D | 7301 | 730D | 7801 | 740D | 7B01 | 770D |
| 0000255640 | 8201 | 780D | 8501 | 790D | A501 | 7B0D | AE01 | 7C0D |
| 0000255660 | B401 | 7F0D | B901 | 830D | C201 | 850D | EB01 | 870D |
| 0000255700 | 0301 | 880E | 1501 | 8A0E | 3101 | 8C0E | 3A01 | 8D0E |
| 0000255720 | 4E01 | 8F0E | 5C01 | 910E | 6201 | 930E | 6C01 | 990E |
| 0000255740 | 6F01 | 9C0E | 7401 | 9E0E | 9D01 | A30E | A601 | A50E |
| 0000255760 | CC01 | A90E | D501 | AA0E | EA01 | AC0E | FA01 | AE0E |
| 0000256000 | 0501 | B20F | 2601 | B50F | 4601 | B70F | 6501 | B80F |
| 0000256020 | 7A01 | BA0F | 7D01 | BD0F | 9D01 | BF0F | BC01 | C00F |
| 0000256040 | D101 | C30F | D401 | C40F | D701 | C70F | E001 | C90F |
| 0000256060 | 0F01 | CB10 | 1801 | CD10 | 1D01 | CF10 | 2B01 | D110 |
| 0000256100 | 3B01 | D210 | 4E01 | D510 | 5301 | D710 | 6C01 | D810 |
| 0000256120 | 7E01 | DB10 | 8901 | DD10 | 9201 | DE10 | AE01 | E010 |
| 0000256140 | BC01 | E310 | C201 | E410 | C501 | E610 | CA01 | E810 |
| 0000256160 | D401 | EE10 | D701 | F010 | 0101 | F211 | 0A01 | F611 |
| 0000256200 | 0F01 | F811 | 3501 | F911 | 3E01 | FB11 | 5701 | FD11 |
| 0000256220 | 6001 | FE11 | 7C01 | 0211 | 8A02 | 0411 | 9402 | 0911 |
| 0000256240 | 9702 | 0B11 | AF02 | 0F11 | B802 | 1111 | E202 | 1311 |
| 0000256260 | EB02 | 1411 | FF02 | 1611 | 0D02 | 1812 | 1202 | 1912 |
| 0000256300 | 1502 | 1A12 | 1E02 | 1C12 | 2802 | 2112 | 2B02 | 2912 |
| 0000256320 | 3902 | 2B12 | 4B02 | 2C12 | 6202 | 2D12 | 7002 | 2F12 |

THU MAR 14 17:34:20 1991 FL.DLL PAGE 70, LINE 4072

| | | | | | | | | |
|---|---|---|---|---|---|---|---|---|
| 0000256340 | 7A02 | 3112 | 8902 | 3312 | 9302 | 3612 | 9602 | 3812 |
| 0000256360 | A002 | 3B12 | B602 | 3C12 | D502 | 3E12 | EA02 | 3F12 |
| 0000256400 | F302 | 4012 | F902 | 4212 | FC02 | 4512 | 0602 | 4613 |
| 0000256420 | 0C02 | 4713 | 1702 | 4913 | 2302 | 4B13 | 2D02 | 4D13 |
| 0000256440 | 3B02 | 4F13 | 4D02 | 5413 | 5002 | 5713 | 5A02 | 5913 |
| 0000256460 | 6F02 | 5A13 | 7402 | 5C13 | 7E02 | 6113 | 8102 | 6413 |
| 0000256500 | 8602 | 6613 | B002 | 6713 | B902 | 6913 | D102 | 6B13 |
| 0000256520 | DA02 | 6C13 | EE02 | 6E13 | FC02 | 7113 | 0202 | 7314 |
| 0000256540 | DC02 | 7914 | 0F02 | 7B14 | 3802 | 7C14 | 4102 | 7E14 |
| 0000256560 | 4602 | 7F14 | 4902 | 8114 | 5202 | 8314 | 5702 | 8514 |
| 0000256600 | 6102 | 8614 | 6F02 | 8914 | 7402 | 8C14 | 7E02 | 8F14 |
| 0000256620 | 9C02 | 9014 | AF02 | 9214 | C402 | 9314 | CD02 | 9514 |
| 0000256640 | D202 | 9714 | D502 | 9814 | DB02 | 9C14 | E102 | A114 |
| 0000256660 | E402 | A414 | E902 | A614 | 1302 | A815 | 1C02 | AA15 |
| 0000256700 | 3502 | AB15 | 3E02 | AD15 | 4E02 | AF15 | 5702 | B015 |
| 0000256720 | 6B02 | B215 | 7902 | B615 | 7F02 | B815 | 8902 | BE15 |
| 0000256740 | 8C02 | C015 | A402 | C115 | AD02 | C315 | B202 | C715 |
| 0000256760 | BB02 | C915 | E402 | CB15 | ED02 | CD15 | 0C02 | CE16 |
| 0000257000 | 1502 | D016 | 1A02 | D316 | 1D02 | D516 | 3202 | D816 |
| 0000257020 | 4502 | D916 | 5102 | DA16 | 5802 | DB16 | 5B02 | E016 |
| 0000257040 | 6102 | E216 | 8B02 | E416 | A402 | E616 | AD02 | E716 |
| 0000257060 | B602 | E916 | D202 | EB16 | E602 | EE16 | F602 | EF16 |
| 0000257100 | F902 | F116 | 0202 | F217 | 1402 | F417 | 1D02 | F517 |
| 0000257120 | 2602 | F917 | 3402 | FE17 | 3702 | 0017 | 3F03 | 0217 |
| 0000257140 | 4803 | 0417 | 5503 | 0617 | 6A03 | 0717 | 8003 | 0917 |
| 0000257160 | 9903 | 0A17 | 9F03 | 0B17 | A503 | 0D17 | AA03 | 0E17 |
| 0000257200 | B603 | 1217 | C503 | 1417 | D803 | 1517 | E103 | 1817 |
| 0000257220 | EF03 | 1D17 | F203 | 1F17 | F703 | 2017 | FA03 | 2117 |
| 0000257240 | 3003 | 2218 | 4203 | 2418 | 4D03 | 2518 | CB03 | 3918 |
| 0000257260 | D603 | 3A18 | E603 | 3E18 | 7903 | 4219 | 7E03 | 4319 |
| 0000257300 | 8803 | 4519 | 8D03 | 4719 | 9003 | 4919 | A003 | 4A19 |
| 0000257320 | AB03 | 4C19 | B003 | 4E19 | B303 | 5019 | C703 | 5119 |
| 0000257340 | DC03 | 5519 | E003 | 5619 | 5E03 | 6B1A | 6903 | 6C1A |
| 0000257360 | 7903 | 711A | 0C03 | 771B | 1103 | 791B | 3F03 | 7B1B |
| 0000257400 | 5003 | 7C1B | 5903 | 7F1B | 5E03 | 831B | 6703 | 851B |
| 0000257420 | 9003 | 891B | 9903 | 8B1B | C803 | 8E1B | D103 | 901B |
| 0000257440 | E603 | 931B | EF03 | 951B | 0003 | 961C | 0903 | 9B1C |
| 0000257460 | 1503 | 9F1C | 1E03 | A11C | 4803 | A31C | 5103 | A41C |
| 0000257500 | 5C03 | A61C | 7803 | A71C | 8303 | AB1C | 8C03 | AC1C |
| 0000257520 | 0A03 | C01D | 1503 | C11D | 2503 | C71D | B803 | CE1D |
| 0000257540 | BD03 | D01D | DD03 | D11D | FE03 | D31D | 0E03 | D61E |
| 0000257560 | 1703 | D81E | 2103 | D91E | 3403 | DB1E | 4903 | DD1E |
| 0000257600 | 5203 | E01E | 5703 | E21E | 6D03 | E41E | 8503 | E51E |
| 0000257620 | A103 | E61E | B303 | E71E | B603 | E91E | BA03 | EC1E |
| 0000257640 | C403 | ED1E | 4203 | 011F | 4D04 | 021F | 5D04 | 061F |
| 0000257660 | F004 | 0A1F | F504 | 0C1F | 0D04 | 0E20 | 2E04 | 0F20 |
| 0000257700 | 3704 | 1220 | 4204 | 1A20 | 4504 | 1C20 | 6B04 | 2020 |
| 0000257720 | 7104 | 2220 | 9204 | 2320 | 9B04 | 2520 | A604 | 2920 |
| 0000257740 | A904 | 2D20 | AC04 | 2F20 | B104 | 3320 | B404 | 3520 |
| 0000257760 | B904 | 3620 | BC04 | 3820 | D704 | 3920 | 5504 | 4C21 |
| 0000260000 | 6004 | 4D21 | 7004 | 5421 | 0904 | 5822 | 0E04 | 5A22 |
| 0000260020 | 1804 | 5C22 | 1E04 | 5D22 | 3704 | 5E22 | 4704 | 6022 |
| 0000260040 | 4B04 | 6322 | 5804 | 6822 | 7204 | 6A22 | 8B04 | 6E22 |
| 0000260060 | 9204 | 6F22 | B404 | 7122 | C404 | 7322 | E604 | 7422 |
| 0000260100 | EF04 | 7722 | FB04 | 7B22 | 0104 | 7F23 | 0404 | 8123 |
| 0000260120 | 0904 | 8523 | 0C04 | 8723 | 1104 | 8823 | 1404 | 8B23 |
| 0000260140 | 2F04 | 8C23 | B604 | 9F23 | C104 | A023 | D104 | A523 |
| 0000260160 | 6404 | A924 | 6904 | AC24 | 6F04 | AD24 | 7404 | B124 |
| 0000260200 | 7704 | B224 | 7C04 | B324 | 7F04 | B524 | 8D04 | B824 |

THU MAR 14 17:34:20 1991 FL.DLL PAGE 71, LINE 4131

| | | | | | | | | |
|---|---|---|---|---|---|---|---|---|
| 0000260220 | 9604 | BB24 | AC04 | BC24 | B504 | BE24 | BA04 | BF24 |
| 0000260240 | BD04 | C124 | C304 | C224 | 4104 | D525 | 4C04 | D625 |
| 0000260260 | 5C04 | D925 | EF04 | DB25 | F504 | DC25 | 5804 | EF26 |
| 0000260300 | 6304 | F226 | 7304 | F326 | 7904 | 0626 | 8405 | 0726 |
| 0000260320 | 9405 | 0A26 | 2705 | 0C27 | 2D05 | 0D27 | 9005 | 2027 |
| 0000260340 | 9B05 | 2127 | AB05 | 2527 | 3E05 | 2628 | BC05 | 3A28 |
| 0000260360 | C705 | 3B28 | D705 | 4528 | 6A05 | 4729 | 7505 | 4929 |
| 0000260400 | 7E05 | 4A29 | 9205 | 4C29 | A405 | 4E29 | AE05 | 5329 |
| 0000260420 | B105 | 5629 | D605 | 5829 | FE05 | 5A29 | 0805 | 5C2A |
| 0000260440 | 1505 | 5E2A | 3C05 | 602A | 3F05 | 622A | 6605 | 642A |
| 0000260460 | 6905 | 662A | 7305 | 692A | 9105 | 6A2A | A005 | 6B2A |
| 0000260500 | AF05 | 6C2A | BE05 | 702A | CD05 | 722A | E005 | 742A |
| 0000260520 | F905 | 772A | 0405 | 792B | 1C05 | 7C2B | 3505 | 7D2B |
| 0000260540 | 3805 | 7F2B | 4F05 | 802B | B205 | 952B | BD05 | 962B |
| 0000260560 | CD05 | 9A2B | 6005 | 9B2C | 7E05 | 9C2C | 8D05 | 9D2C |
| 0000260600 | 9C05 | 9E2C | AB05 | A12C | BA05 | A32C | CD05 | A42C |
| 0000260620 | 3005 | B62D | 3B05 | B72D | 4B05 | BD2D | DE05 | C22D |
| 0000260640 | E305 | C62D | E805 | C82D | 0D05 | CA2E | 2005 | CC2E |
| 0000260660 | 2505 | CD2E | 3B05 | CE2E | 4D05 | CF2E | 5B05 | D02E |
| 0000260700 | 6705 | D12E | 6D05 | D42E | 7305 | D62E | 8005 | D72E |
| 0000260720 | 8305 | DB2E | 8C05 | DD2E | B205 | DF2E | D805 | E12E |
| 0000260740 | FE05 | E32E | 2405 | E52F | 2D05 | E62F | 5005 | EA2F |
| 0000260760 | 5B05 | EC2F | 6405 | ED2F | 6F05 | EE2F | 8305 | F22F |
| 0000261000 | 9105 | F42F | BA05 | F52F | C305 | F82F | C905 | F92F |
| 0000261020 | 4705 | 0C30 | 5206 | 0D30 | 6206 | 1030 | F506 | 1130 |
| 0000261040 | 0206 | 1331 | 0F06 | 1431 | 7206 | 2831 | 7D06 | 2931 |
| 0000261060 | 8D06 | 2B31 | 2006 | 2F32 | 2506 | 3132 | 3E06 | 3332 |
| 0000261100 | 4706 | 3532 | 5106 | 3632 | 5606 | 3832 | 5C06 | 3932 |
| 0000261120 | 5F06 | 3A32 | 7406 | 3C32 | 7906 | 3D32 | 7C06 | 4032 |
| 0000261140 | 8106 | 4132 | FF06 | 0932 | 6666 | 655F | 6378 | 2E70 |
| 0000261160 | 0163 | 6200 | 4C00 | 0A00 | 4D33 | 1A00 | 5233 | AC00 |
| 0000261200 | 5633 | B100 | 5833 | 1200 | 5A34 | 1C00 | 5E34 | 2200 |
| 0000261220 | 6434 | 2500 | 6634 | 3A00 | 6C34 | 3D00 | 6E34 | 4F00 |
| 0000261240 | 6F34 | 5900 | 7234 | 6700 | 7534 | 7C00 | 7634 | 8500 |
| 0000261260 | 7834 | 8A00 | 7B34 | 8D00 | 7D34 | 9700 | 7F34 | A600 |
| 0000261300 | 8034 | AF00 | 8334 | B900 | 9634 | BC00 | 9834 | D000 |
| 0000261320 | 9B34 | EC00 | 9D34 | F500 | 9F34 | 1A00 | A035 | 2300 |
| 0000261340 | A235 | 2800 | A435 | 2B00 | A535 | 3F00 | A835 | 4D00 |
| 0000261360 | B035 | 5000 | B235 | 6F00 | B435 | 7800 | B535 | 8200 |
| 0000261400 | B735 | 8700 | B835 | 8A00 | BB35 | 8F00 | C035 | 9200 |
| 0000261420 | C335 | 9F00 | C435 | A800 | C635 | AD00 | CA35 | B000 |
| 0000261440 | CC35 | B500 | CD35 | B800 | CF35 | EEC0 | D035 | F700 |
| 0000261460 | D235 | 0200 | D336 | 8000 | E736 | 8B00 | E836 | 9B00 |
| 0000261500 | EE36 | 2E00 | EF37 | 3700 | F137 | 4100 | F237 | 5500 |
| 0000261520 | F437 | 6700 | F537 | 7E00 | F637 | 9500 | F737 | 9E00 |
| 0000261540 | F937 | A800 | FA37 | 0B00 | 1038 | 1601 | 1138 | 2601 |
| 0000261560 | 1838 | B901 | 1A38 | C401 | 1B38 | CD01 | 1D38 | D701 |
| 0000261600 | 1E38 | EB01 | 2038 | FD01 | 2238 | 0001 | 2339 | 1E01 |
| 0000261620 | 2439 | 2D01 | 2539 | 3C01 | 2639 | 4B01 | 2A39 | 5A01 |
| 0000261640 | 2C39 | 6D01 | 2E39 | 8601 | 3139 | 9101 | 3339 | A901 |
| 0000261660 | 3639 | C201 | 3739 | C501 | 3939 | DC01 | 3A39 | 3F01 |
| 0000261700 | 4F3A | 4A01 | 503A | 5A01 | 543A | ED01 | 553A | 0B01 |
| 0000261720 | 563B | 1A01 | 573B | 2901 | 583B | 3801 | 5B3B | 4701 |
| 0000261740 | 5D3B | 5A01 | 5E3B | BD01 | 713B | C801 | 723B | D801 |
| 0000261760 | 753B | 6B01 | 773C | 7801 | 783C | DB01 | 093C | 7566 |
| 0000262000 | 665F | 746C | 2E72 | 0163 | A900 | 5500 | E600 | 563C |
| 0000262020 | F600 | 5B3C | 8800 | 5F3D | 8D00 | 613D | 9A00 | 623D |
| 0000262040 | A300 | 643D | B000 | 663D | B900 | 683D | C100 | 693D |
| 0000262060 | D600 | 6C3D | E000 | 6E3D | 0600 | 6F3E | 1200 | 713E |

THU MAR 14 17:34:20 1991 FL.DLL PAGE 72, LINE 4190

| | | | | | | | | |
|---|---|---|---|---|---|---|---|---|
| 0000262100 | 1700 | 723E | 9400 | 873E | 9F00 | 8E3E | B500 | 913E |
| 0000262120 | BB00 | 933E | C800 | 943E | D900 | 963E | F300 | 983E |
| 0000262140 | 0400 | 9A3F | 2100 | 9C3F | 3300 | A13F | 3C00 | A33F |
| 0000262160 | 5F00 | A73F | 6800 | AC3F | 6E00 | AE3F | A800 | B03F |
| 0000262200 | AD00 | B43F | B000 | B73F | C700 | B93F | DC00 | BD3F |
| 0000262220 | DF00 | BF3F | EA00 | C13F | EF00 | C53F | F200 | C73F |
| 0000262240 | FD00 | C93F | 0200 | CE40 | 0500 | D040 | 4000 | D240 |
| 0000262260 | 4500 | D740 | 4800 | D940 | 8300 | DB40 | 8800 | DF40 |
| 0000262300 | 8B00 | E040 | 9400 | E140 | C600 | E340 | D600 | E540 |
| 0000262320 | E900 | EA40 | F200 | EE40 | F800 | F040 | FD00 | F440 |
| 0000262340 | 0000 | F641 | 0500 | FA41 | 0800 | FC41 | 0D00 | 0041 |
| 0000262360 | 1001 | 0241 | 1501 | 0641 | 1801 | 0841 | 1D01 | 0C41 |
| 0000262400 | 2001 | 0E41 | 2501 | 1241 | 2801 | 1441 | 2D01 | 1841 |
| 0000262420 | 3001 | 1A41 | 3501 | 1D41 | 3801 | 1F41 | 4D01 | 2141 |
| 0000262440 | 5601 | 2241 | 6301 | 2441 | 6E01 | 2641 | 7701 | 2741 |
| 0000262460 | 7A01 | 2A41 | 8301 | 2B41 | 8601 | 2C41 | D201 | 2E41 |
| 0000262500 | DB01 | 3041 | EB01 | 3341 | FE01 | 3741 | 0701 | 3842 |
| 0000262520 | 1101 | 3A42 | 2301 | 3D42 | 2601 | 3E42 | 2901 | 3F42 |
| 0000262540 | 5301 | 4042 | 7001 | 5442 | 7E01 | 5742 | 8E01 | 5842 |
| 0000262560 | 9601 | 6B42 | A101 | 6C42 | B101 | 7242 | 4401 | 7643 |
| 0000262600 | 5A01 | 7843 | 7C01 | 7C43 | 9701 | 7E43 | BA01 | 7F43 |
| 0000262620 | C801 | 8143 | E801 | 8243 | EB01 | 8443 | 0001 | 8A44 |
| 0000262640 | 1501 | 8C44 | 4A01 | 9144 | 5F01 | 9544 | 8701 | 9944 |
| 0000262660 | B901 | 9D44 | DC01 | 9F44 | FF01 | A044 | 6201 | B345 |
| 0000262700 | 6D01 | B445 | 7D01 | BA45 | 1001 | BC46 | 2E01 | BD46 |
| 0000262720 | 9101 | D046 | 9C01 | D346 | AC01 | D446 | C601 | D546 |
| 0000262740 | E001 | D646 | FA01 | D746 | 1401 | D847 | 2E01 | D947 |
| 0000262760 | 4801 | DA47 | 6201 | DB47 | 7C01 | DC47 | 9601 | DD47 |
| 0000263000 | B001 | DE47 | CA01 | E047 | E301 | E147 | E601 | EC47 |
| 0000263020 | F101 | ED47 | 0101 | F148 | 9401 | F748 | 9901 | F948 |
| 0000263040 | B901 | FA48 | C201 | FC48 | CB01 | FD48 | 4901 | 1149 |
| 0000263060 | 5402 | 1349 | 6402 | 1449 | 6E02 | 2849 | 7902 | 2949 |
| 0000263100 | 8902 | 2E49 | 1C02 | 324A | 2102 | 344A | 2E02 | 374A |
| 0000263120 | 3702 | 394A | 6002 | 3A4A | 6B02 | 3C4A | 7002 | 3D4A |
| 0000263140 | 7902 | 3F4A | 8602 | 404A | 0402 | 554B | 0F02 | 584B |
| 0000263160 | 2502 | 5B4B | 2B02 | 5D4B | 3F02 | 614B | 4802 | 634B |
| 0000263200 | 6302 | 674B | 6C02 | 694B | 7102 | 6B4B | 7E02 | 6C4B |
| 0000263220 | 8702 | 6D4B | A402 | 6E4B | C102 | 824B | CF02 | 834B |
| 0000263240 | DF02 | 864B | 7202 | 884C | 8102 | 894C | E402 | 094C |
| 0000263260 | 7566 | 655F | 6378 | 2E70 | 0163 | 6C00 | 5400 | F000 |
| 0000263300 | 554C | 0000 | 594D | 9200 | 5D4D | 9700 | 5F4D | A400 |
| 0000263320 | 614D | AD00 | 634D | B500 | 644D | CA00 | 684D | D400 |
| 0000263340 | 6A4D | F800 | 6B4D | 0400 | 6D4E | 0900 | 6E4E | 8600 |
| 0000263360 | 834E | 9100 | 8A4E | A700 | 8D4E | AD00 | 8F4E | BA00 |
| 0000263400 | 904E | CB00 | 924E | E500 | 944E | F600 | 964E | 1300 |
| 0000263420 | 984F | 2300 | 9A4F | 3500 | 9F4F | 3E00 | A14F | 6100 |
| 0000263440 | A54F | 6A00 | A74F | 7200 | AD4F | 7B00 | AF4F | 8400 |
| 0000263460 | B24F | 8A00 | B44F | 9500 | B74F | 9800 | B94F | A300 |
| 0000263500 | BC4F | A600 | BD4F | B100 | BF4F | C300 | C04F | C600 |
| 0000263520 | C14F | E200 | C64F | EB00 | C84F | F300 | CE4F | FC00 |
| 0000263540 | D04F | 0500 | D450 | 0B00 | D650 | 1000 | E750 | 1300 |
| 0000263560 | E950 | 1800 | ED50 | 1B00 | EF50 | 2000 | F350 | 2300 |
| 0000263600 | F550 | 2800 | F850 | 2B00 | F950 | 3D00 | FA50 | 4A00 |
| 0000263620 | FC50 | 5500 | 0050 | 5E01 | 0150 | 6101 | 0250 | 8701 |
| 0000263640 | 0450 | 9001 | 0650 | A001 | 0950 | B301 | 0D50 | BC01 |
| 0000263660 | 0E50 | C601 | 1050 | D801 | 1350 | DB01 | 1450 | DE01 |
| 0000263700 | 1550 | 0801 | 1651 | 2501 | 2A51 | 3301 | 2D51 | 4301 |
| 0000263720 | 2E51 | 4B01 | 4151 | 5601 | 4251 | 6601 | 4851 | F901 |
| 0000263740 | 4951 | 0701 | 4B52 | 2701 | 4C52 | 2A01 | 4E52 | 2E01 |

THU MAR 14 17:34:20 1991 FL.DLL PAGE 73, LINE 4249

| | | | | | | | | |
|---|---|---|---|---|---|---|---|---|
| 0000263760 | 5052 | 4301 | 5152 | 5D01 | 5252 | 7701 | 5352 | 9101 |
| 0000264000 | 5852 | AB01 | 5C52 | D301 | 6052 | 0501 | 6353 | 2801 |
| 0000264020 | 6553 | 4301 | 6653 | A601 | 7153 | B101 | 7253 | C101 |
| 0000264040 | 7753 | 5401 | 7C54 | 5901 | 7E54 | 7901 | 8054 | 8201 |
| 0000264060 | 8254 | A201 | 8454 | AB01 | 8654 | CB01 | 8854 | D401 |
| 0000264100 | 8A54 | F401 | 8B54 | FD01 | 8D54 | 0201 | 9055 | 0501 |
| 0000264120 | 9255 | 2501 | 9355 | 2E01 | 9655 | 3701 | 9755 | B501 |
| 0000264140 | AB55 | C001 | AD55 | D001 | AE55 | DA01 | 0955 | 6666 |
| 0000264160 | 6D5F | 7369 | 2E63 | 0163 | 8F00 | 4200 | E600 | 4955 |
| 0000264200 | F600 | 4F55 | FB00 | 5155 | 0000 | 5256 | 1F00 | 5356 |
| 0000264220 | 4A00 | 5556 | 4F00 | 5656 | 5B00 | 5856 | 7200 | 5B56 |
| 0000264240 | 7500 | 5E56 | 8800 | 6056 | A700 | 6256 | B000 | 6456 |
| 0000264260 | C600 | 6556 | CF00 | 6756 | E300 | 6856 | E900 | 7556 |
| 0000264300 | F400 | 7A56 | 0400 | 7F57 | 0900 | 8257 | 1C00 | 8457 |
| 0000264320 | 3B00 | 8657 | 4400 | 8757 | 4E00 | 8957 | 5300 | 8A57 |
| 0000264340 | 5600 | 8D57 | 5B00 | 8E57 | 5E00 | 9057 | 7200 | 9157 |
| 0000264360 | 7800 | 9D57 | 8300 | A057 | 9300 | A457 | 9800 | A657 |
| 0000264400 | B200 | A757 | BB00 | A957 | C000 | AC57 | C300 | AD57 |
| 0000264420 | DB00 | AF57 | F800 | B057 | 0100 | B358 | 0600 | B458 |
| 0000264440 | 0C00 | C358 | 1700 | C458 | 2700 | C858 | BA00 | CC58 |
| 0000264460 | BF00 | CD58 | CB00 | CF58 | D000 | D058 | D300 | D158 |
| 0000264500 | DC00 | D358 | E100 | D458 | E400 | D658 | ED00 | D858 |
| 0000264520 | F200 | D958 | 2100 | DB59 | 2700 | DC59 | 3200 | DE59 |
| 0000264540 | 3700 | E059 | 3A00 | E259 | 4100 | E359 | 6E00 | E559 |
| 0000264560 | 7400 | E659 | 7D00 | E859 | 8200 | E959 | 9600 | EB59 |
| 0000264600 | 9F00 | EC59 | 1D00 | FC5A | 2800 | FD5A | 3800 | 015A |
| 0000264620 | CB01 | 055A | D001 | 065A | DC01 | 085A | E101 | 095A |
| 0000264640 | E401 | 0A5A | ED01 | 0C5A | F201 | 0D5A | F501 | 0F5A |
| 0000264660 | FE01 | 125A | 0301 | 135B | 3901 | 155B | 3F01 | 165B |
| 0000264700 | 4A01 | 185B | 4F01 | 1A5B | 5201 | 1D5B | 5901 | 1E5B |
| 0000264720 | 8D01 | 205B | 9301 | 215B | 9C01 | 235B | A101 | 245B |
| 0000264740 | B501 | 265B | BE01 | 275B | 3C01 | 3D5C | 4701 | 3E5C |
| 0000264760 | 5701 | 425C | EA01 | 475C | EF01 | 495C | F901 | 4B5C |
| 0000265000 | 0101 | 4D5D | 1901 | 4E5D | 2201 | 505D | 2C01 | 525D |
| 0000265020 | 3701 | 535D | B501 | 675D | C001 | 685D | D001 | 6D5D |
| 0000265040 | 6301 | 725E | 6801 | 735E | 6E01 | 755E | 7201 | 775E |
| 0000265060 | 7C01 | 795E | 9301 | 7A5E | 9C01 | 7C5E | A701 | 7E5E |
| 0000265100 | B401 | 7F5E | 3201 | 945F | 3D01 | 955F | 4D01 | 995F |
| 0000265120 | E001 | 9E5F | E501 | A05F | ED01 | A35F | 0401 | A460 |
| 0000265140 | 0D01 | A660 | 1701 | A860 | 2201 | A960 | A001 | BD60 |
| 0000265160 | AB01 | BE60 | BB01 | C260 | 4E01 | C661 | 5301 | C761 |
| 0000265200 | 5B01 | C961 | 7101 | CA61 | 7A01 | CC61 | 8401 | CE61 |
| 0000265220 | 8F01 | CF61 | 0D01 | DA62 | 1801 | DB62 | 2801 | DF62 |
| 0000265240 | BB01 | E262 | C001 | E462 | 1701 | E663 | 2201 | E863 |
| 0000265260 | 3301 | E963 | B101 | 0063 | 6C0C | 696C | 6362 | 6C64 |
| 0000265300 | 2E6C | 696C | 0762 | 736F | 2E32 | 696C | 0A62 | 626C |
| 0000265320 | 7069 | 746D | 6C2E | 6269 | 6409 | 5F62 | 6970 | 6C2E |
| 0000265340 | 6269 | 7506 | 2E69 | 696C | 0662 | 6869 | 6C2E | 6269 |
| 0000265360 | 630A | 7672 | 695F | 2E66 | 696C | 9B62 | 0100 | 0101 |
| 0000265400 | 0800 | 0000 | 2600 | 0200 | 0101 | 8E00 | 0006 | 3F00 |
| 0000265420 | 0300 | 0101 | 6700 | 0014 | E400 | 0412 | 0101 | 7B00 |
| 0000265440 | 008F | B200 | 0902 | 0101 | 9B00 | 00B4 | EB00 | 0100 |
| 0000265460 | 0201 | 2E00 | 0000 | 2900 | 0200 | 0201 | CD00 | 0006 |
| 0000265500 | 4B00 | 0301 | 0201 | 4B00 | 0027 | 4800 | 0419 | 0201 |
| 0000265520 | 2D00 | 0092 | B900 | 090D | 0201 | 8600 | 00B5 | 8E00 |
| 0000265540 | 0108 | 0301 | 5700 | 0000 | 2900 | 0200 | 0301 | 1800 |
| 0000265560 | 0008 | 6600 | 0300 | 0301 | 9300 | 0040 | E700 | 0411 |
| 0000265600 | 0301 | E600 | 009F | F800 | 0903 | 0301 | 1400 | 00BE |
| 0000265620 | 9600 | 0101 | 0401 | 8000 | 0000 | 2900 | 0200 | 0401 |

THU MAR 14 17:34:20 1991 FL.DLL PAGE 74, LINE 4308

| | | | | | | | | |
|---|---|---|---|---|---|---|---|---|
| 0000265640 | 7E00 | 0008 | D700 | 0300 | 0401 | 7A00 | 0052 | BD00 |
| 0000265660 | 0415 | 0401 | DE00 | 00A3 | C000 | 0905 | 0401 | AA00 |
| 0000265700 | 00BF | B200 | 0102 | 0501 | A900 | 0000 | 2900 | 0200 |
| 0000265720 | 0501 | 5500 | 0009 | 6700 | 0300 | 0501 | 3700 | 0068 |
| 0000265740 | 0500 | 0416 | 0501 | 9E00 | 00A9 | 4B00 | 0903 | 0501 |
| 0000265760 | 5C00 | 00C2 | BE00 | 0101 | 0601 | D200 | 0000 | 2900 |
| 0000266000 | 0200 | 0601 | BC00 | 0009 | ED00 | 0300 | 0601 | 3C00 |
| 0000266020 | 007E | 3F00 | 0411 | 0601 | E900 | 00AC | B200 | 0907 |
| 0000266040 | 0601 | 1A00 | 00C4 | 4A00 | 0102 | 0701 | FB00 | 0000 |
| 0000266060 | 1800 | 0200 | 0701 | A900 | 000A | 5200 | 0101 | 0801 |
| 0000266100 | 1300 | 0001 | 1B00 | 0200 | 0801 | FB00 | 000B | D200 |
| 0000266120 | 0101 | 0901 | 2E00 | 0001 | 1C00 | 0200 | 0901 | CD00 |
| 0000266140 | 000D | 3500 | 0100 | 0A01 | 4A00 | 0001 | 1700 | 0200 |
| 0000266160 | 0A01 | 0200 | 000E | 0F00 | 0100 | 0B01 | 6100 | 0001 |
| 0000266200 | 1700 | 0200 | 0B01 | 1100 | 000E | 3300 | 0100 | 0C01 |
| 0000266220 | 7800 | 0001 | 1A00 | 0200 | 0C01 | 4400 | 000E | 1000 |
| 0000266240 | 0100 | 0D01 | 9200 | 0001 | 1C00 | 0200 | 0D01 | 5400 |
| 0000266260 | 000E | 2500 | 0100 | 0E01 | AE00 | 0001 | 1B00 | 0200 |
| 0000266300 | 0E01 | 7900 | 000E | 3F00 | 0100 | 0F01 | C900 | 0001 |
| 0000266320 | 1800 | 0200 | 0F01 | B800 | 000E | 0F00 | 0100 | 1001 |
| 0000266340 | E100 | 0001 | 1400 | 0200 | 1001 | C700 | 000E | 3700 |
| 0000266360 | 0100 | 1101 | F500 | 0001 | 1800 | 0200 | 1101 | FE00 |
| 0000266400 | 000E | 0F00 | 0100 | 1201 | 0D00 | 0002 | 1800 | 0200 |
| 0000266420 | 1201 | 0D00 | 000F | 0F00 | 0100 | 1301 | 2500 | 0002 |
| 0000266440 | 1800 | 0200 | 1301 | 1C00 | 000F | 0F00 | 0100 | 1401 |
| 0000266460 | 3D00 | 0002 | 1500 | 0200 | 1401 | 2B00 | 000F | 3000 |
| 0000266500 | 0100 | 1501 | 5200 | 0002 | 1400 | 0200 | 1501 | 5B00 |
| 0000266520 | 000F | 0E00 | 0100 | 1601 | 6600 | 0002 | 1700 | 0200 |
| 0000266540 | 1601 | 6900 | 000F | 0F00 | 0100 | 1701 | 7D00 | 0002 |
| 0000266560 | 1500 | 0200 | 1701 | 7800 | 000F | 2000 | 0100 | 1801 |
| 0000266600 | 9200 | 0002 | 1A00 | 0200 | 1801 | 9800 | 000F | 1E00 |
| 0000266620 | 0100 | 1901 | AC00 | 0002 | 1900 | 0200 | 1901 | B600 |
| 0000266640 | 000F | 0C00 | 0100 | 1A01 | C500 | 0002 | 1600 | 0200 |
| 0000266660 | 1A01 | C200 | 000F | 1E00 | 0100 | 1B01 | DB00 | 0002 |
| 0000266700 | 1700 | 0200 | 1B01 | E000 | 000F | 1F00 | 0100 | 1C01 |
| 0000266720 | F200 | 0002 | 1500 | 0200 | 1C01 | FF00 | 000F | 1B00 |
| 0000266740 | 0100 | 1D01 | 0700 | 0003 | 1800 | 0200 | 1D01 | 1A00 |
| 0000266760 | 0010 | 4200 | 0100 | 1E01 | 1F00 | 0003 | 1600 | 0200 |
| 0000267000 | 1E01 | 5C00 | 0010 | 0E00 | 0100 | 1F01 | 3500 | 0003 |
| 0000267020 | 1800 | 0200 | 1F01 | 6A00 | 0010 | 1000 | 0100 | 2001 |
| 0000267040 | 4D00 | 0003 | 1800 | 0200 | 2001 | 7A00 | 0010 | 1000 |
| 0000267060 | 0100 | 2101 | 6500 | 0003 | 1900 | 0200 | 2101 | 8A00 |
| 0000267100 | 0010 | 1200 | 0100 | 2201 | 7E00 | 0003 | 1800 | 0200 |
| 0000267120 | 2201 | 9C00 | 0010 | 4100 | 0100 | 2301 | 9600 | 0003 |
| 0000267140 | 1700 | 0200 | 2301 | DD00 | 0010 | 0F00 | 0100 | 2401 |
| 0000267160 | AD00 | 0003 | 1700 | 0200 | 2401 | EC00 | 0010 | 0E00 |
| 0000267200 | 0100 | 2501 | C400 | 0003 | 1700 | 0200 | 2501 | FA00 |
| 0000267220 | 0010 | 0E00 | 0100 | 2601 | DB00 | 0003 | 1700 | 0200 |
| 0000267240 | 2601 | 0800 | 0011 | 0E00 | 0100 | 2701 | F200 | 0003 |
| 0000267260 | 1800 | 0200 | 2701 | 1600 | 0011 | 0F00 | 0100 | 2801 |
| 0000267300 | 0A00 | 0004 | 1800 | 0200 | 2801 | 2500 | 0011 | 0F00 |
| 0000267320 | 0100 | 2901 | 2200 | 0004 | 1500 | 0200 | 2901 | 3400 |
| 0000267340 | 0011 | 0C00 | 0100 | 2A01 | 3700 | 0004 | 1500 | 0200 |
| 0000267360 | 2A01 | 4000 | 0011 | 0E00 | 0100 | 2B01 | 4C00 | 0004 |
| 0000267400 | 1900 | 0200 | 2B01 | 4E00 | 0011 | 5600 | 0100 | 2C01 |
| 0000267420 | 6500 | 0004 | 1600 | 0200 | 2C01 | A400 | 0011 | 1D00 |
| 0000267440 | 0100 | 2D01 | 7B00 | 0004 | 1500 | 0200 | 2D01 | C100 |
| 0000267460 | 0011 | 0E00 | 0100 | 2F01 | 9000 | 0004 | 1A00 | 0200 |
| 0000267500 | 2F01 | CF00 | 0011 | AB00 | 0100 | 3001 | AA00 | 0004 |

THU MAR 14 17:34:20 1991 FL.DLL PAGE 75, LINE 4367

```
0000267520  1D00  0200  3001  7A00  0012  2400  0100  3101
0000267540  C700  0004  1600  0200  3101  9E00  0012  0F00
0000267560  0100  3201  DD00  0004  1500  0200  3201  AD00
0000267600  0012  0E00  0100  3301  F200  0004  1700  0200
0000267620  3301  BB00  0012  0E00  0100  3401  0900  0005
0000267640  1600  0200  3401  C900  0012  0F00  0100  3501
0000267660  1F00  0005  1400  0200  3501  D800  0012  0D00
0000267700  0100  3601  3300  0005  1300  0200  3601  E500
0000267720  0012  1C00  0100  3701  4600  0005  1500  0200
0000267740  3701  0100  0013  0E00  0100  3801  5B00  0005
0000267760  1700  0200  3801  0F00  0013  1100  0100  3901
0000270000  7200  0005  1400  0200  3901  2000  0013  2C00
0000270020  0100  3A01  8600  0005  1600  0200  3A01  4C00
0000270040  0013  4E00  0100  3B01  9C00  0005  1800  0200
0000270060  3B01  9A00  0013  0E00  0100  3C01  B400  0005
0000270100  1800  0200  3C01  A800  0013  0E00  0100  3D01
0000270120  CC00  0005  1600  0200  3D01  B600  0013  2300
0000270140  0100  3E01  E200  0005  1600  0200  3E01  D900
0000270160  0013  1100  0100  3F01  F800  0005  1600  0200
0000270200  3F01  EA00  0013  1100  0100  4001  0E00  0006
0000270220  1500  0200  4001  FB00  0013  0F00  0100  4101
0000270240  2300  0006  1500  0200  4101  0A00  0014  1F00
0000270260  0100  4201  3800  0006  1500  0200  4201  2900
0000270300  0014  0F00  0100  4301  4D00  0006  1500  0200
0000270320  4301  3800  0014  0F00  0100  4401  6200  0006
0000270340  1600  0200  4401  4700  0014  1000  0100  4501
0000270360  7800  0006  1600  0200  4501  5700  0014  1000
0000270400  0600  0001  6400  00C6  4400  4E00  3042  C032
0000270420  00CC  0000
0000270423
```

```
THU MAR 14 17:35:10 1991  FRAME.EXE  PAGE 1, LINE 1

0000000000  5A4D  01CC  0049  0000  0004  0000  FFFF  0000
0000000020  00B6  0000  0000  0000  0040  0000  0000  0000
0000000040  0000  0000  0000  0000  0000  0000  0000  0000
0000000060  0000  0000  0000  0000  0000  0000  0080  0000
0000000100  1F0E  0EBA  B400  CD09  B821  4C01  21CD  6854
0000000120  7369  7020  6F72  7267  6D61  6320  6E61  6F6E
0000000140  2074  7572  206E  6E69  4420  534F  6D20  646F
0000000160  2E65  0D0D  240A  0000  0000  0000  0000  0000
0000000200  454E  0A05  0141  0013  1C09  0F8D  0302  0005
0000000220  0000  6000  0010  0001  0000  0005  000A  0005
0000000240  002E  0040  0090  00A4  010B  0115  01D4  0000
0000000260  0000  0004  0005  0001  0000  0000  0000  0000
0000000300  0021  79EA  0D00  79EA  07F5  00C6  0C01  0100
0000000320  0000  0000  0C01  0850  0000  0000  0C01  0200
0000000340  0802  11D2  0D01  1300  0921  0120  1CF1  0120
0000000360  0933  0202  1CB1  0202  0954  00C0  1CB1  00C0
0000000400  0960  00D8  1CB1  00D8  096E  0120  1CB1  0120
0000000420  0001  0003  0003  0002  0004  0001  0004  03E8
0000000440  0004  044C  4605  4152  454D  0000  460F  5F57
0000000460  4D43  5F44  4944  5053  5441  4843  0001  460C
0000000500  4152  454D  575F  4E49  4F44  0257  1300  5746
0000000520  475F  4E45  5245  4349  445F  474C  505F  4F52
0000000540  0343  0E00  5746  435F  5F4D  4C44  5F47  5250
0000000560  434F  0004  4613  5F57  4F43  544E  4F52  5F4C
0000000600  4944  5053  5441  4843  0005  0100  0A00  1000
0000000620  1600  1900  0000  4408  534F  4143  4C4C  0553
0000000640  4D50  4957  054E  4244  505F  0249  4955  6C06
0000000660  6962  6D70  0B74  425F  5F58  5250  434F  5345
0000000700  0553  0101  3056  7F01  0134  4D29  3801  014F
0000000720  340C  0000  542A  5345  3154  3332  4620  4152
0000000740  454D  4F57  4B52  4D20  646F  6C75  2065  4328
0000000760  2029  654D  6372  7275  2C79  3120  3939  0030
0000001000  0000  0000  0000  0000  0000  0000  0000  0000
*
0000001040  A3FC  0044  1E89  0042  8949  4E0E  BB00  0050
0000001060  1F8C  E483  89FE  0467  FEB8  50FF  6789  F70A
0000001100  50D0  6789  8906  0867  2689  0046  681E  0048
0000001120  681E  004C  FF9A  00FF  8E00  4806  2600  15A1
0000001140  A300  0086  46E8  9A00  02E0  FFFF  689A  5A04
0000001160  9A00  00EA  005F  36FF  0294  36FF  0292  36FF
0000001200  0290  36FF  028E  36FF  028C  2F9A  6436  5000
0000001220  E80E  00FE  FFB8  8EFF  B8D8  0003  0E50  03E8
0000001240  0E02  A7E8  B804  00FF  0E50  ECE8  BB00  000D
0000001260  FF33  068E  0044  FFB9  267F  3D80  7500  4701
0000001300  8026  003D  3174  64BE  8B00  8BD1  F3CB  8BA6
0000001320  74CA  3308  F2C0  74AE  EBE7  061C  071E  F78B
0000001340  BF1F  008C  2CAC  7241  C00E  04E0  AC92  412C
0000001360  0572  C20A  EBAA  16ED  C31F  286A  FF9A  00FF
0000001400  BB00  0002  8B52  80D4  8CA7  B700  8B50  53C4
0000001420  5016  5216  FF9A  00FF  0B00  58C0  1075  40B1
0000001440  013C  0674  023C  0675  08B1  8F08  008C  794B
0000001460  5AD6  C033  5050  DC8B  BA50  0084  520E  5316
0000001500  FF9A  00FF  5800  E858  0013  64BE  BF10  1064
0000001520  3DE8  BE01  1064  64BF  E810  0134  8BCB  5A0E
0000001540  E310  8B2E  4436  C400  5C06  8C10  33C2  FFDB
0000001560  581E  7310  E903  014E  068E  004C  8B26  061E
0000001600  4B00  0D75  06C4  1060  C28C  03BB  FF00  581E
0000001620  C310  8B55  33EC  EBC9  551A  EC8B  01B9  EB00
0000001640  5512  EC8B  5756  00B9  EB01  5508  EC8B  5756
```

THU MAR 14 17:35:10 1991 FRAME.EXE PAGE 2, LINE 60

| | | | | | | | | |
|---|---|---|---|---|---|---|---|---|
| 0000001660 | 01B9 | E801 | 005F | 0A51 | 75C9 | BE12 | 12FE | FEBF |
| 0000001700 | E812 | 00CC | 64BE | BF10 | 1068 | C3E8 | BE00 | 1068 |
| 0000001720 | 68BF | E810 | 00BA | 68BE | BF10 | 1068 | B1E8 | 9A00 |
| 0000001740 | 02BC | 007D | C00B | 1174 | 0A58 | 50E4 | 0B75 | 7E83 |
| 0000001760 | 0006 | 0575 | 46C7 | FF06 | E800 | 0086 | 0A58 | 75E4 |
| 0000002000 | B80D | 0001 | 8A50 | 0646 | 9A50 | FFFF | 0000 | 4EE8 |
| 0000002020 | 5F00 | 5D5E | 55CB | EC8B | 0D6A | 8BE8 | 8306 | 02C4 |
| 0000002040 | 068E | 004C | 8B26 | 061E | 4B00 | 168B | 029C | FA83 |
| 0000002060 | 75FF | 8904 | 9C1E | 3902 | 9C1E | 9F02 | 0D6A | 8DEG |
| 0000002100 | 8306 | 02C4 | 749E | 6A0A | E80E | 063C | C483 | EB02 |
| 0000002120 | 3BC7 | 74D3 | 6A08 | E80E | 064E | C483 | 5D02 | 55C3 |
| 0000002140 | EC8B | 0D6A | 41E8 | 8306 | 02C4 | 06C7 | 029C | FFFF |
| 0000002160 | 0D6A | 59E8 | 8306 | 02C4 | 0E6A | 51E8 | 8306 | 02C4 |
| 0000002200 | C35D | 0E8B | 105A | 07E3 | 02BB | FF00 | 581E | C310 |
| 0000002220 | F73B | 0E73 | EF83 | 8B04 | 0B05 | 0245 | F274 | 1DFF |
| 0000002240 | EEEB | 00C3 | 8B55 | B8EC | 00FC | 0E50 | 9DE8 | 8302 |
| 0000002260 | A03E | 0002 | 0474 | 1EFF | 029E | FFB8 | 5000 | E80E |
| 0000002300 | 028A | E58B | CB5D | 02B8 | E900 | FDD0 | 3356 | B9F6 |
| 0000002320 | 0042 | E432 | ACFC | E032 | FBE2 | F480 | 7455 | 0E0F |
| 0000002340 | C1E8 | B8FF | 0001 | 0E50 | 61E8 | B802 | 0001 | CB5E |
| 0000002360 | 068F | 02A4 | 068F | 02A6 | 42A1 | 8EC0 | 441E | 8B00 |
| 0000002400 | 4EF0 | 0674 | 7C80 | 00FF | F775 | 8936 | 9636 | 3602 |
| 0000002420 | 1E8C | 0298 | F696 | FF04 | 0175 | 3696 | 3689 | 02A2 |
| 0000002440 | D233 | 01BF | AC00 | 0A42 | 75C0 | ACFA | 203C | FB74 |
| 0000002460 | 093C | F774 | C00A | 6374 | 4E47 | 3CAC | 7420 | 3CEC |
| 0000002500 | 7409 | 0AE8 | 74C0 | 3C54 | 7422 | 3C24 | 745C | 4203 |
| 0000002520 | E8EB | C933 | AC41 | 5C3C | FA74 | 223C | 0474 | D103 |
| 0000002540 | D7EB | C18B | E9D1 | D113 | 01A8 | CE75 | 01EB | AC4E |
| 0000002560 | C00A | 2774 | 223C | C274 | 5C3C | 0374 | EB42 | 33F0 |
| 0000002600 | 41C9 | 3CAC | 745C | 3CFA | 7422 | 0304 | EBD1 | 8BDF |
| 0000002620 | D1C1 | 13E9 | A8D1 | 7501 | EBD6 | 169F | 891F | 8C3E |
| 0000002640 | 0302 | 47D7 | E7D1 | E7D1 | C78B | C203 | 2440 | E8FE |
| 0000002660 | 01D0 | 0673 | 08B8 | E900 | FCE2 | 8EA3 | 8902 | 9016 |
| 0000002700 | 8B02 | 03D8 | 8EF8 | 26C2 | 3F89 | 8C26 | 0247 | C383 |
| 0000002720 | 8B04 | A236 | 8E02 | 441E | AC00 | 0AAA | 75C0 | EBFA |
| 0000002740 | 3303 | AAC0 | 3CAC | 7420 | 3CFB | 7409 | 0AF7 | 74C0 |
| 0000002760 | 2675 | 3F89 | 8C26 | 0247 | C383 | 4E04 | 3CAC | 7420 |
| 0000003000 | 3CE0 | 7409 | 0ADC | 74C0 | 3C5A | 7422 | 3C27 | 745C |
| 0000003020 | AA03 | E8EB | C933 | AC41 | 5C3C | FA74 | 223C | 0674 |
| 0000003040 | 5CB0 | AAF3 | D5EB | 5CB0 | E9D1 | AAF3 | 0673 | 22B0 |
| 0000003060 | EBAA | 4EC9 | 0AAC | 74C0 | 3C2A | 7422 | 3CBF | 745C |
| 0000003100 | AA03 | F0EB | C933 | AC41 | 5C3C | FA74 | 223C | 0674 |
| 0000003120 | 5CB0 | AAF3 | DDEB | 5CB0 | E9D1 | AAF3 | 9E73 | 22B0 |
| 0000003140 | EBAA | 33D1 | AAC0 | C726 | 0007 | 2600 | 47C7 | 0002 |
| 0000003160 | 1600 | FF1F | A42E | 0002 | 8B55 | 83EC | 08EC | 8E1E |
| 0000003200 | 4406 | 8C00 | FC46 | 5E8C | 33FE | 33C0 | 33F6 | B9FF |
| 0000003220 | FFFF | 3A26 | 7405 | F206 | 46AE | 75AE | 8BFA | 40C7 |
| 0000003240 | FE24 | 8B46 | D1FE | D1E6 | E8E6 | 00D6 | 1772 | 5689 |
| 0000003260 | 50F8 | C68B | CBE8 | 7200 | A30C | 0292 | 1689 | 0294 |
| 0000003300 | 5689 | EBFA | B806 | 0009 | D1E9 | 8BFB | 8BCF | 33D8 |
| 0000003320 | 5FF6 | 1E06 | 1F07 | E349 | 8B35 | 8E04 | FE46 | 3B26 |
| 0000003340 | 6406 | 7500 | 510E | 5756 | 64BF | B9G0 | 0006 | A7F3 |
| 0000003360 | 5E5F | 8E59 | F846 | 0B74 | 5E8E | 89FA | 8C3F | 0247 |
| 0000003400 | C383 | 8E04 | FC5E | AAAC | C00A | FA75 | CBE2 | 5E8E |
| 0000003420 | 89FA | 890F | 024F | 8B1F | 5DE5 | 00CB | 8B55 | 56EC |
| 0000003440 | B857 | 0085 | D88E | C08E | 568B | BE06 | 1070 | 3BAD |
| 0000003460 | 74C2 | 4010 | 7496 | 970C | C033 | FFB9 | F2FF | 8BAE |
| 0000003500 | EBF7 | 96EB | 5E5F | E58B | CA5D | 0002 | 8B55 | 57EC |
| 0000003520 | 76FF | 0E06 | C5E8 | 0BFF | 74C0 | 921F | FA8B | C033 |

THU MAR 14 17:35:10 1991 FRAME.EXE PAGE 3, LINE 119

| | | | | | | | | |
|---|---|---|---|---|---|---|---|---|
| 0000003540 | FFB9 | F2FF | F7AE | 49D1 | 8B50 | BBC4 | 0002 | 1E53 |
| 0000003560 | 5152 | 5016 | FF9A | 00FF | 5B00 | 8B5F | 5DE5 | 02CA |
| 0000003600 | 0000 | 8B55 | 06EC | 00B9 | 8704 | B60E | 5102 | 9A50 |
| 0000003620 | 0594 | 01D2 | 8F5B | B606 | 8B02 | 0BCA | 75C8 | F901 |
| 0000003640 | 5D07 | 00C3 | B1EA | 8205 | EA05 | 05D0 | 0597 | 8B55 |
| 0000003660 | 56EC | 76C4 | 8C06 | E3C1 | 2605 | 4C80 | 01FE | 5D5E |
| 0000003700 | 55CB | EC8B | 096A | DFE8 | 8302 | 02C4 | 76FF | 0E06 |
| 0000003720 | 0DE8 | 5B00 | 096A | F5E8 | 8302 | 02C4 | E58B | CB5D |
| 0000003740 | 8B55 | 56EC | 8B57 | 064E | F983 | 77E8 | 1E69 | AAA1 |
| 0000003760 | 0B02 | 74C0 | BF48 | 06B8 | 368B | 02B2 | IEC5 | 02AC |
| 0000004000 | 561E | FF57 | 5FD7 | 735E | 8C2B | C5DA | 0C5F | D63B |
| 0000004020 | EF75 | 1F58 | C41E | AC36 | 2602 | 748B | C512 | A81E |
| 0000004040 | 8C02 | 3BDA | 75D0 | 1FD9 | 811E | 34FF | 7407 | BF0E |
| 0000004060 | 0734 | C4EB | 815E | B8FF | 7406 | EB0F | 070A | BF06 |
| 0000004100 | 02A8 | E1E8 | 7201 | E80E | 007E | 891F | AE16 | 8902 |
| 0000004120 | AC1E | EB02 | 1F04 | C033 | 5F99 | 5D5E | 00CB | 5706 |
| 0000004140 | F88B | FB03 | 7F89 | 4F04 | 2D4F | 0016 | 778D | C714 |
| 0000004160 | FE05 | 89FF | 0A7F | 8948 | 8C04 | 8B1F | 8CC6 | 8EDA |
| 0000004200 | 8DC2 | 067F | ABFC | 47AB | 3347 | ABC0 | ABAB | 5FAB |
| 0000004220 | C307 | 8B26 | 0245 | C00B | 0975 | 8C26 | 025D | 8926 |
| 0000004240 | EB1D | 0614 | C426 | 0875 | 8C26 | 0E5C | 8926 | 0C5C |
| 0000004260 | 478C | 8912 | 1077 | 2607 | 5D8C | 260A | 5D89 | 260R |
| 0000004300 | 5D8C | 2606 | 5D89 | C304 | 8041 | FEE1 | FC53 | 778B |
| 0000004320 | 8B08 | 0A5F | FF33 | 23EB | C38B | A85B | 7501 | 5342 |
| 0000004340 | 778B | 8B06 | 085F | DE3B | 3674 | 334B | EBFF | 900C |
| 0000004360 | 548D | 3BFE | 73D3 | 03E1 | 72F0 | AD23 | 01A8 | F074 |
| 0000004400 | FE8B | 3B48 | 73C1 | 0323 | 72F0 | 8B13 | ADD0 | 01A8 |
| 0000004420 | DE74 | C203 | 0205 | 8B00 | 89F7 | FE44 | E4EB | C08B |
| 0000004440 | 8B5B | 0647 | 4789 | F908 | 19EB | 895B | FE4C | 0974 |
| 0000004460 | F903 | C12B | 8948 | 2B05 | 03F9 | 89F9 | 087F | C68B |
| 0000004500 | DA8C | C3F8 | 5751 | 47F6 | 0102 | 6674 | B7E8 | 8B00 |
| 0000004520 | 8BFE | A804 | 7401 | 2B03 | 49C8 | 4141 | 778B | 0B04 |
| 0000004540 | 74F6 | 034F | 73CE | 3309 | BAC0 | FFF0 | 33E3 | 42EB |
| 0000004560 | 12B8 | 8E05 | 26C0 | B6A1 | 3D02 | 2000 | 1674 | 00BA |
| 0000004600 | 3B80 | 72D0 | D106 | 75EA | EBF8 | 8322 | 08FA | 1D72 |
| 0000004620 | E2D1 | C28E | 8B48 | 03D0 | 73C1 | 3302 | F7C0 | 23D2 |
| 0000004640 | 52C2 | 2EE8 | 5A00 | 0D73 | FA83 | 74F0 | B805 | 0010 |
| 0000004660 | E2EB | EBF9 | 8B1B | 2BD0 | 0457 | 4789 | 8904 | 087F |
| 0000004700 | 778B | 4A0A | 1489 | 0342 | C7F2 | FE04 | 89FF | 0A77 |
| 0000004720 | 595F | 8BC3 | F6D0 | 0247 | 7404 | 4A0F | 778B | 4E04 |
| 0000004740 | D63B | 0572 | 5739 | 73FE | 4218 | 1E50 | FF9A | 00FF |
| 0000004760 | 0B00 | 75C0 | 8B0F | F6C2 | 0247 | 7404 | 4A04 | 5789 |
| 0000005000 | F8FE | 01EB | C3F9 | 8B57 | 0877 | 773B | 750A | 8B03 |
| 0000005020 | 0677 | 3DAD | FFFE | 0874 | FE8B | FE24 | F003 | F2EB |
| 0000005040 | 4F4F | F78B | C35F | D18B | C283 | 8027 | F0E2 | 8B50 |
| 0000005060 | 52C4 | 5016 | C033 | 9A50 | FFFF | 0000 | 0B1F | 75C0 |
| 0000005100 | 3314 | 26DB | 458B | 890C | 0247 | C28B | 0FE8 | E8FE |
| 0000005120 | FE40 | EBF8 | F901 | 00C3 | 8B55 | 50EC | 468B | 0504 |
| 0000005140 | 0014 | 4BEB | 8B55 | 50EC | 468B | 0504 | 0014 | 65EB |
| 0000005160 | 8B55 | 50EC | 468B | 0504 | 0114 | 33EB | 8B55 | 50EC |
| 0000005200 | 468B | 0504 | 0114 | 4DEB | 8B55 | 50EC | 468B | C104 |
| 0000005220 | 02E0 | FF68 | 50FF | FF6A | FF6A | FF9A | 00FF | 0B00 |
| 0000005240 | 75C0 | 5825 | E58B | C35D | 8B55 | 50EC | 468B | C104 |
| 0000005260 | 02E0 | 8368 | 5008 | FF6A | FF6A | FF9A | 00FF | 0B00 |
| 0000005300 | 75C0 | 5805 | E58B | C35D | 11B8 | E900 | F7CE | 8B55 |
| 0000005320 | 50EC | 468B | C104 | 02E0 | A368 | 5008 | FF9A | 00FF |
| 0000005340 | 0B00 | 75C0 | 58E3 | E58B | C35D | 8B55 | FFEC | 0676 |
| 0000005360 | B5E8 | 83FF | 02C4 | E58B | CB5D | 8B55 | FFEC | 0676 |
| 0000005400 | CBE8 | 83FF | 02C4 | E58B | CB5D | 9EEA | 5305 | EA78 |

THU MAR 14 17:35:10 1991 FRAME.EXE PAGE 4, LINE 178

| | | | | | | | | |
|---|---|---|---|---|---|---|---|---|
| 0000005420 | 059E | 08FD | 8B55 | 8BEC | 8BD7 | 1EDE | 7EC4 | 3306 |
| 0000005440 | B9C0 | FFFF | AEF2 | 758D | C4FF | 0A7E | FFB9 | F2FF |
| 0000005460 | F7AE | 2BD1 | 8CF9 | 8EC0 | 8ED8 | 0846 | FE87 | 468B |
| 0000005500 | F706 | 01C6 | 7400 | A402 | D149 | F3E9 | 13A5 | F3C9 |
| 0000005520 | 8BA4 | 8BF3 | 1FFA | C28C | CB5D | 8B55 | 8BEC | 8BD7 |
| 0000005540 | 1EDE | 76C5 | 8B0A | 8CFE | 8ED8 | 33C0 | B9C0 | FFFF |
| 0000005560 | AEF2 | D1F7 | 7EC4 | 8B06 | A8C7 | 7401 | A402 | D149 |
| 0000005600 | F3E9 | 13A5 | F3C9 | 8BA4 | 8BF3 | 1FFA | C28C | CB5D |
| 0000005620 | 8B55 | 8BEC | 8BD7 | 1EDE | 76C5 | C406 | 0A7E | C033 |
| 0000005640 | FFB9 | F2FF | F7AE | 2BD1 | F3F9 | 74A6 | 1B05 | 1DC0 |
| 0000005660 | FFFF | 8B1F | 8BF3 | 5DFA | 00CB | 8B55 | 8BEC | C4D7 |
| 0000005700 | 067E | C033 | FFB9 | F2FF | F7AE | 49D1 | 8B91 | 5DFA |
| 0000005720 | 00CB | 8B55 | 57EC | 1E56 | 7EC4 | 8B06 | 33D7 | B9C0 |
| 0000005740 | FFFF | AEF2 | 8B4F | 06F7 | 7EC4 | 8B0A | 8BDF | 0E4E |
| 0000005760 | AEF2 | 0175 | 2B41 | 0E4E | D9F7 | FE8B | F38B | 1F06 |
| 0000006000 | F307 | AAA4 | C28B | C28C | 5E1F | 5D5F | 00CB | 8B55 |
| 0000006020 | 56EC | B357 | E901 | 0E4A | 04C8 | 0000 | 5657 | 126A |
| 0000006040 | 85E8 | 83FE | 02C4 | 06C6 | 12FA | 8B42 | 0646 | 568B |
| 0000006060 | A308 | 12F6 | 1689 | 12F8 | F0BE | 8912 | 8904 | 0254 |
| 0000006100 | 06C7 | 12F4 | 7FFF | 468D | 160E | FF50 | 0C76 | 76FF |
| 0000006120 | 1E0A | 9A56 | 0F3A | 0A69 | C483 | 8B0C | FFF8 | F40E |
| 0000006140 | 7812 | C40F | F01E | FF12 | F006 | 2612 | 07C6 | EB00 |
| 0000006160 | 900D | 561E | 006A | 449A | 020E | 8309 | 06C4 | 126A |
| 0000006200 | 4BE8 | 83FE | 02C4 | C78B | 5F5E | CBC9 | 08C8 | 0000 |
| 0000006220 | 8A9A | A516 | C40A | 065E | 8B26 | 2607 | 578B | 2B02 |
| 0000006240 | 9C06 | 1B0A | 9E16 | 890A | FC46 | 5689 | 8DFE | FC46 |
| 0000006260 | 5016 | 449A | C814 | 830A | 04C4 | 4689 | 89F8 | FA56 |
| 0000006300 | D00B | 0675 | C02B | EB99 | 9044 | 3E83 | 0AA0 | 7400 |
| 0000006320 | FF36 | FA76 | 9A50 | 1784 | 0AE2 | C483 | 0B04 | 74C0 |
| 0000006340 | 8126 | FC46 | 0E10 | 5683 | 00FE | 468D | 16FC | 9A50 |
| 0000006360 | 1444 | 0A46 | C483 | 8E04 | 8BC2 | 89D8 | F85E | 468C |
| 0000006400 | 26FA | 47C7 | 0110 | 8B00 | F846 | 568B | C9FA | 90CB |
| 0000006420 | 8B55 | 57EC | 7EC4 | 8B06 | 33DF | B9C0 | FFFF | AEF2 |
| 0000006440 | F741 | 8AD9 | 0A46 | FB8B | AEF2 | 264F | 0538 | 0474 |
| 0000006460 | FF33 | C78E | C78B | C28C | 8B5F | 5DE5 | 00CB | 8B55 |
| 0000006500 | 8BEC | 1ED6 | 76C5 | C40A | 065E | FFB0 | C00A | 2D74 |
| 0000006520 | 26AC | 278A | 3A43 | 74E0 | 2CF3 | 3C41 | 1A1A | 80C9 |
| 0000006540 | 20E1 | C102 | 4104 | E086 | 412C | 1A3C | C91A | E180 |
| 0000006560 | 0220 | 04C1 | 3A41 | 74C4 | 1AD3 | 1CC0 | 98FF | 8B1F |
| 0000006600 | 5DF2 | 00CB | 8B55 | 57EC | 7EC4 | 3306 | B9C0 | FFFF |
| 0000006620 | AEF2 | F741 | 4FD9 | 468A | FD0A | AEF2 | 2647 | 0538 |
| 0000006640 | 0674 | C033 | D08B | 04EB | C78B | C28C | 5FFC | E58B |
| 0000006660 | CB5D | 8B55 | 83EC | 20EC | 5756 | C51E | 0A76 | D08C |
| 0000006700 | C08E | 10B9 | 3300 | 8DC0 | E07E | ABF3 | 0AAC | 74C0 |
| 0000006720 | 8B14 | 8BF8 | B0C8 | 8001 | 07E1 | E0D2 | 03B1 | EFD3 |
| 0000006740 | 4308 | EBE0 | C5E7 | 0676 | FFBB | 43FF | 25AC | 00FF |
| 0000006760 | 1474 | F88B | C88B | 01B0 | E180 | D207 | B1E0 | D303 |
| 0000007000 | 22EF | E043 | E574 | 1F93 | 5E5F | E56B | CB5D | 8B55 |
| 0000007020 | 83EC | 20EC | F756 | C51E | 0A76 | D08C | C08E | 10B9 |
| 0000007040 | 3300 | 8DC0 | E07E | ABF3 | 0AAC | 74C0 | 8B14 | 8BF8 |
| 0000007060 | B0C8 | 8001 | 07E1 | E0D2 | 03B1 | EFD3 | 4308 | EBE0 |
| 0000007100 | C5E7 | 0676 | FFBB | 43FF | 25AC | 00FF | 1474 | F88B |
| 0000007120 | C88B | 01B0 | E180 | D207 | B1E0 | D303 | 22EF | E043 |
| 0000007140 | E575 | 1F93 | 5E5F | E58B | CB5D | 8B55 | 8BEC | 0E4E |
| 0000007160 | 571E | 0B56 | 75C9 | E903 | 00AF | 76C5 | C40A | 067E |
| 0000007200 | 561E | 5706 | 249A | 8314 | 8B0A | 0E4E | D20B | 5778 |
| 0000007220 | C12B | DA83 | 7300 | 4950 | F103 | 0773 | D88C | FF05 |
| 0000007240 | 8EFF | 03D8 | 73F9 | 8C07 | 05C0 | 0C8F | C08E | 8B41 |
| 0000007260 | 48C1 | C72B | DB1B | C323 | C703 | C62B | DB1B | C323 |

THU MAR 14 17:35:10 1991 FRAME.EXE PAGE 5, LINE 237

| | | | | | | | | |
|---|---|---|---|---|---|---|---|---|
| 0000007300 | C603 | 9140 | C12B | F3FD | FCA4 | E391 | 835C | FFFE |
| 0000007320 | 0775 | D88C | 9A2D | 8E0C | 83D8 | FFFF | D175 | C08C |
| 0000007340 | C52D | 8E0C | EBC0 | 8BC8 | 48C1 | D78B | D2F7 | C22B |
| 0000007360 | DB1B | C323 | C203 | D68B | D2F7 | C22B | DB1B | C323 |
| 0000007400 | C203 | 9140 | C12B | E9D1 | A5F3 | C913 | A4F3 | E391 |
| 0000007420 | 0B18 | 75F6 | 8C07 | 05D8 | 0CD1 | D88E | FF0B | C775 |
| 0000007440 | C08C | 0805 | 8E0D | EBC0 | 8BBE | 0646 | 568B | 5E08 |
| 0000007460 | 1F5F | CB5D | 8B55 | 8BEC | 0E4E | 571E | E356 | C548 |
| 0000007500 | 0A76 | 7EC4 | 8B06 | 48C1 | D78B | D2F7 | C22B | DB1B |
| 0000007520 | C323 | C203 | D68B | D2F7 | C22B | DB1B | C323 | C203 |
| 0000007540 | 9140 | C12B | E9D1 | A5F3 | C913 | A4F3 | E391 | 0B18 |
| 0000007560 | 75F6 | 8C07 | 05D8 | 0D13 | D88E | FF0B | C775 | C08C |
| 0000007600 | 6605 | 8E0D | EBC0 | 8BBE | 0646 | 568B | 5E08 | 1F5F |
| 0000007620 | CB5D | 8B55 | 8BEC | 0C4E | 38E3 | C457 | 067E | D78B |
| 0000007640 | DAF7 | 0C74 | D12B | DB1B | D323 | D103 | D187 | D12B |
| 0000007660 | 468B | 8A0A | D1E0 | F3E9 | 13AB | F3C9 | 87AA | E3D1 |
| 0000007700 | 8C10 | 81C3 | 71C3 | 8E0D | D1C3 | F3E9 | 13AB | F3C9 |
| 0000007720 | 5FAA | 468B | 8B06 | 0856 | CB5D | 581E | 4590 | 8B55 |
| 0000007740 | 1EEC | D88E | 468D | 160C | FF50 | 0A76 | 76FF | FF08 |
| 0000007760 | 0676 | B69A | 7718 | 4D0C | 8B4D | 1FE5 | 4D5D | 90CB |
| 0000010000 | 8B55 | 1EEC | C553 | 065E | 76FF | FF0C | 0A76 | 77FF |
| 0000010020 | FF02 | 0E37 | E5E8 | 890A | 0257 | 0789 | 1F5B | CA5D |
| 0000010040 | 0008 | 8B55 | 8BEC | 0846 | 4E8B | 0B0C | 8BC8 | 0A4E |
| 0000010060 | 0975 | 468B | F706 | 5DE1 | 08CA | 5300 | E1F7 | D88B |
| 0000010100 | 468B | F706 | 0C66 | D803 | 468B | F706 | 03E1 | 5BD3 |
| 0000010120 | CA5D | 0008 | 8B55 | 56EC | 8B57 | 0876 | 448A | A80A |
| 0000010140 | 7482 | A864 | 7540 | C760 | 0444 | 0000 | 01A8 | 0B74 |
| 0000010160 | 10A8 | 5374 | 4C8B | 8906 | 240C | 0CFE | 2402 | 88EF |
| 0000010200 | 0A44 | FE8B | EF81 | 0AEA | C781 | 0CCA | DB33 | 5C8A |
| 0000010220 | A80B | 7508 | A84B | 7504 | F618 | 0105 | 4275 | FE81 |
| 0000010240 | 0AF6 | 0674 | FE81 | 0B02 | 2675 | 87F6 | 008C | 7440 |
| 0000010260 | B91F | 0001 | 1651 | 7E8D | 5706 | 0E53 | 9DE8 | 830B |
| 0000010300 | 08C4 | 01B9 | EB00 | B846 | FFFF | 4C80 | 200A | 65EB |
| 0000010320 | 1E53 | E856 | 0AB8 | C483 | 5B04 | 44F6 | 080A | D174 |
| 0000010340 | 0C8B | 548B | 2B06 | 42CA | 1489 | 558B | 4A02 | 5489 |
| 0000010360 | E304 | 5125 | FF51 | 0874 | 74FF | 5306 | E80E | 0B5C |
| 0000010400 | C483 | 5908 | 7CC4 | 8B06 | 0656 | 8826 | 3B15 | 75C1 |
| 0000010420 | 33B6 | 8AC0 | 0646 | 1DEB | C033 | B7F6 | 008C | 7420 |
| 0000010440 | B9E3 | 0002 | 5051 | 5350 | E80E | 0AB8 | C483 | 3308 |
| 0000010460 | 8BC0 | EBC8 | 5FCF | 5D5E | 00CB | 0F92 | 0F9D | 0FB3 |
| 0000010500 | 0FE7 | 1013 | 101B | 1044 | 1076 | 8B55 | B8EC | 0171 |
| 0000010520 | E80E | 0A08 | 5756 | C033 | 4689 | 88F8 | FB46 | 76C4 |
| 0000010540 | 260A | 89AC | 0A76 | 4688 | 0AFE | 74C0 | 8306 | F87E |
| 0000010560 | 7D00 | 8B06 | F846 | B5E9 | BB04 | 0A1C | 202C | 583C |
| 0000010600 | 0577 | 24D7 | EB0F | B002 | B100 | D203 | 02E0 | FB46 |
| 0000010620 | FED7 | D2C1 | 88E8 | FB46 | 8B98 | D1D8 | 2EE3 | A7FF |
| 0000010640 | 0F2A | 568A | B9FE | 0001 | 36E8 | EB04 | 33B1 | 89C0 |
| 0000010660 | F046 | 4689 | 89F6 | EE46 | 46C7 | 20FC | 4800 | 4689 |
| 0000010700 | EBF4 | 8A9B | FE46 | 2D3C | 0675 | 4E80 | 04FC | 8EEB |
| 0000010720 | 2B3C | 0675 | 4E80 | 01FC | 84EB | 203C | 0775 | 4E80 |
| 0000010740 | 02FC | 79E9 | 3CFF | 7523 | 8007 | FC4E | E980 | FF6E |
| 0000010760 | 4E80 | 08FC | 67E9 | 8AFF | FE4E | F980 | 752A | E80F |
| 0000011000 | 035C | C00B | 1779 | D8F7 | 4E80 | 04FC | 0FEB | E980 |
| 0000011020 | 3230 | 8BED | F646 | 0ABB | F700 | 03E3 | 89C1 | F646 |
| 0000011040 | 3BE9 | C7FF | F446 | 0000 | 33E9 | 8AFF | FE4E | F980 |
| 0000011060 | 752A | E80C | 0328 | C00B | 1479 | FFB8 | EBFF | 800F |
| 0000011100 | 30E9 | ED32 | 468B | BBF4 | 000A | E3F7 | C103 | 4689 |
| 0000011120 | E9F4 | FF0A | 468A | 3CFE | 756C | 8006 | FC4E | EB10 |
| 0000011140 | 3C22 | 7546 | 8006 | FC4E | EB20 | 3C18 | 754E | 8006 |

THU MAR 14 17:35:10 1991 FRAME.EXE PAGE 6, LINE 296

| | | | | | | | | |
|---|---|---|---|---|---|---|---|---|
| 0000011160 | FD4E | EB10 | 3C0E | 754C | 8006 | FD4E | EB04 | 8004 |
| 0000011200 | FD4E | E908 | FED8 | 468A | 3CFE | 7564 | E903 | 0194 |
| 0000011220 | 693C | 0375 | 8DE9 | 3C01 | 7575 | E903 | 018A | 583C |
| 0000011240 | 0375 | 89E9 | 3C01 | 7578 | E903 | 0188 | 6F3C | 0375 |
| 0000011260 | A2E9 | 3C01 | 7463 | 3C1A | 7473 | 3C27 | 746E | 3C51 |
| 0000011300 | 7470 | 3C60 | 7445 | 3C07 | 7447 | E903 | 00BB | B5E9 |
| 0000011320 | E800 | 028A | BE8D | FE8F | 0716 | 4FAA | 01B9 | E900 |
| 0000011340 | 01F1 | 90E8 | 0B02 | 75FF | 8C12 | 0BC0 | 75C0 | 1E0C |
| 0000011360 | BF07 | 0A75 | 0E8B | 0A7B | D8E9 | 5701 | 4E8B | E3F4 |
| 0000011400 | 3207 | F2C0 | 75AE | 4F01 | 2B59 | 87F9 | E9CF | 01C3 |
| 0000011420 | 62E8 | 8B02 | F846 | F6AB | FC46 | 7410 | 3303 | ABC0 |
| 0000011440 | 3BE9 | F6FE | FC46 | 7530 | E805 | 0232 | 39EB | 36E8 |
| 0000011460 | F602 | FD46 | 7518 | C630 | FF46 | B907 | 0010 | 0716 |
| 0000011500 | 3352 | 8DD2 | 97BE | BEFE | 0004 | B0E8 | B902 | 0010 |
| 0000011520 | BE8D | FE92 | 3358 | BED2 | 0004 | A0E8 | C602 | 9386 |
| 0000011540 | 3AFE | 09B9 | EB00 | C618 | FF46 | B907 | 0010 | 0716 |
| 0000011560 | D233 | BE8D | FE92 | 04BE | E800 | 0281 | 04B9 | 8D00 |
| 0000011600 | 8FBE | E9FE | 014D | 46FF | 80EE | FC4E | 8A40 | FE46 |
| 0000011620 | 200C | 8B98 | 83F0 | F47E | 7F00 | 7413 | C707 | F446 |
| 0000011640 | 0006 | 0AEB | 673D | 7500 | C705 | F446 | 0001 | BE8D |
| 0000011660 | FE8F | 76FF | FFEE | F476 | 1656 | FF57 | 1076 | 76FF |
| 0000011700 | F60E | FD46 | 7404 | FF0A | C21E | 830E | 0E46 | EB0A |
| 0000011720 | FF08 | AE1E | 830E | 0E46 | 8308 | 0EC4 | 46F6 | 80FC |
| 0000011740 | 0F74 | 7E83 | 00F4 | 0975 | 5716 | 1EFF | 0EBA | C483 |
| 0000011760 | 8304 | 67FE | 1075 | 46F7 | 80FC | 7500 | 1609 | FF57 |
| 0000012000 | B21E | 830E | 04C4 | 0716 | 8026 | 2D3D | 0575 | 8047 |
| 0000012020 | FD4E | B901 | FFFF | B057 | F200 | 4FAE | 2B59 | 87F9 |
| 0000012040 | E9CF | 00AF | 4E80 | 40FC | 46C6 | 0AFA | 35EB | 46C6 |
| 0000012060 | 07FF | 04EB | 46C6 | 27FF | 46F6 | 80FC | 1174 | 46C7 |
| 0000012100 | 02F0 | C600 | F246 | B230 | 0251 | FF56 | 5688 | C6F3 |
| 0000012120 | FA46 | EB10 | F60E | FC46 | 7480 | 8004 | FD4E | C602 |
| 0000012140 | FA46 | F608 | FC46 | 7410 | E805 | 00FB | 0EEB | EDE8 |
| 0000012160 | F600 | FC46 | 7440 | 9903 | 02EB | D233 | 46F6 | 40FC |
| 0000012200 | 0F74 | D20B | 0B7D | 4E80 | 01FD | D8F7 | D283 | F700 |
| 0000012220 | 83DA | F47E | 7D00 | C707 | F446 | 0001 | 04EB | 6680 |
| 0000012240 | F7FC | D88B | DA0B | 0575 | 46C7 | 00F0 | 8D00 | EB7E |
| 0000012260 | 0716 | 4E8A | 32FA | 8BED | F476 | 40E8 | F601 | FD46 |
| 0000012300 | 7402 | E30E | 2606 | 3D80 | 7430 | 4F06 | C626 | 3005 |
| 0000012320 | EB41 | F600 | FC46 | 7440 | F631 | FD46 | 7401 | C60B |
| 0000012340 | F246 | C72D | F046 | 0001 | 20EB | 46F6 | 01FC | 0B74 |
| 0000012360 | 46C6 | 2BF2 | 46C7 | 01F0 | EB00 | F60F | FC46 | 7402 |
| 0000012400 | C609 | F246 | C720 | F046 | 0001 | 468B | 2BF6 | 2BC1 |
| 0000012420 | F046 | 027D | C033 | 5706 | F651 | FC46 | 750C | 8B07 |
| 0000012440 | B2C8 | E820 | 00BB | 1650 | 8D07 | F27E | 4E8B | E8F0 |
| 0000012460 | 0091 | F658 | FC46 | 7408 | F60D | FC46 | 7504 | 8B07 |
| 0000012500 | B2C8 | E830 | 009B | 5F59 | 5007 | 76E8 | 5800 | 46F6 |
| 0000012520 | 04FC | 0774 | C88B | 20B2 | 86E8 | E900 | FC00 | 76C4 |
| 0000012540 | 260E | 89AD | 0E76 | C4C3 | 0E76 | AD26 | D08B | AD26 |
| 0000012560 | 8992 | 0E76 | F6C3 | FC46 | 7420 | E808 | FFE9 | C28E |
| 0000012600 | F88B | E8C3 | FFD8 | F88B | C00B | 0375 | C08E | 1EC3 |
| 0000012620 | C307 | 0698 | C457 | 065E | FF26 | 044F | 1078 | 8B26 |
| 0000012640 | 263F | 07FF | 8E26 | 0247 | 33AA | 5FC0 | C307 | 5251 |
| 0000012660 | 5306 | 0E50 | 9DE8 | 83FA | 06C4 | 595A | FF3D | 75FF |
| 0000012700 | EBE8 | E3E8 | 8B1B | 01F7 | F84E | 3357 | 26FF | E8AC |
| 0000012720 | FFC0 | F80B | F7E2 | FF0B | 745F | C705 | F846 | FFFF |
| 0000012740 | E3C3 | 0119 | F84E | 3357 | 8AFF | E8C2 | FFA4 | F80B |
| 0000012760 | F7E2 | FF0B | 745F | C705 | F846 | FFFF | FDC3 | 9357 |
| 0000013000 | F60B | 0A7F | DB0B | 0675 | D20B | 0275 | 1AEB | 3392 |
| 0000013020 | F7D2 | 93F1 | F1F7 | 8792 | 04D3 | 3C30 | 7639 | 0203 |

THU MAR 14 17:35:10 1991 FRAME.EXE PAGE 7, LINE 355

| | | | | | | | | |
|---|---|---|---|---|---|---|---|---|
| 0000013040 | FF46 | 8BAA | 4EC2 | D8EB | 2B59 | 47CF | C3FC | 5E5F |
| 0000013060 | E58B | CB5D | 8B55 | 53EC | 8B51 | 0646 | 568B | 8B08 |
| 0000013100 | 0C5E | FFB9 | D3FF | D3EA | 2BEB | 0A46 | D31B | 5B59 |
| 0000013120 | CA5D | 0008 | 14C8 | 0000 | 5657 | 5EC4 | 2606 | 7F81 |
| 0000013140 | CE02 | 7712 | 720F | 2607 | 3F81 | A600 | 0673 | C02B |
| 0000013160 | E999 | 0222 | A3E8 | 8E08 | 8BC2 | 89D8 | F45E | 468C |
| 0000013200 | 26F6 | 478B | 261E | 470B | 751C | 6A2D | 9A12 | 0594 |
| 0000013220 | 14C9 | C483 | C402 | F45E | 8926 | 1C47 | 8926 | 1E57 |
| 0000013240 | C28B | 0B26 | 1C47 | 0A75 | 46C7 | 7EF8 | 8C0A | FA5E |
| 0000013260 | 14EB | 8B26 | 1C47 | 08EB | 8B26 | 1C47 | 8B26 | 1E57 |
| 0000013300 | 4689 | 89F8 | FA56 | E168 | 6801 | 3380 | 5EC4 | 2606 |
| 0000013320 | 77FF | 2602 | 37FF | AE9A | E720 | 6A14 | 68FE | AE80 |
| 0000013340 | E168 | 6801 | 3380 | 5EC4 | 2606 | 77FF | 2602 | 37FF |
| 0000013360 | F08B | FA8B | EC9A | 0D18 | C415 | F85E | 8926 | 0A47 |
| 0000013400 | 9940 | C233 | C22B | F8C1 | 3302 | 2BC2 | 8BC2 | 8BCE |
| 0000013420 | 6AF0 | 5600 | 4E89 | 89EC | EE7E | 129A | AD0E | 0315 |
| 0000013440 | EC46 | D713 | 4689 | 89FC | FE56 | 468E | 83FA | FE7E |
| 0000013460 | 7D00 | 812D | FC46 | 3380 | 5681 | E1FE | 8B01 | F85E |
| 0000013500 | 8B26 | 0A47 | B940 | 0004 | F799 | 0BF9 | 75D2 | 810A |
| 0000013520 | FC46 | 5180 | 5683 | 01FE | 264E | 4FFF | EB0A | 90CE |
| 0000013540 | 5EC4 | 26F8 | 4781 | B20A | 2607 | 478B | B90A | 0004 |
| 0000013560 | D88B | F799 | 0BF9 | 75D2 | 8B25 | B9C3 | 0064 | F799 |
| 0000013600 | 0BF9 | 75D2 | 8B11 | F85E | 8B26 | 0A47 | 90B9 | 9901 |
| 0000013620 | F9F7 | D20B | 0875 | 46C7 | D0F0 | EB0F | 9006 | 46C7 |
| 0000013640 | EAF0 | 8C0F | F25E | 5E8B | 26F8 | 6F81 | 6C0A | 6A07 |
| 0000013660 | 6801 | 5180 | 76FF | FFFE | FC76 | 749A | C31F | C415 |
| 0000013700 | F85E | 8926 | 0E47 | 016A | 8068 | 8D51 | FC46 | 5016 |
| 0000013720 | 529A | 1F1F | C416 | F85E | C726 | 0847 | 0001 | 07EB |
| 0000013740 | 5EC4 | 26F8 | 47FF | C408 | F85E | 8B26 | 0E47 | 8B26 |
| 0000013760 | 085F | E3D1 | 7EC4 | 26F0 | 0139 | E47C | 5EC4 | 26F8 |
| 0000014000 | 4FFF | 2608 | 5F8B | C408 | F87E | 8B26 | 0E45 | E3D1 |
| 0000014020 | 7EC4 | 8BF0 | 26C8 | 012B | 5EC4 | 26F8 | 4789 | 6A06 |
| 0000014040 | 6800 | 0E10 | 76FF | FFFE | FC76 | F98B | 749A | 391F |
| 0000014060 | C416 | F85E | 8926 | 0447 | 006A | 3C6A | 006A | 1068 |
| 0000014100 | 8D0E | FC46 | 5016 | 529A | 461F | 5216 | 8950 | EC46 |
| 0000014120 | 5689 | 9AEE | 1F74 | 165C | 5EC4 | 26F8 | 4789 | 6A02 |
| 0000014140 | 6A00 | FF3C | EE76 | 76FF | 9AEC | 200E | 0DE5 | 5EC4 |
| 0000014160 | 26F8 | 0789 | 6926 | 0A47 | 016D | C703 | C603 | CA2D |
| 0000014200 | B963 | 0007 | D22B | F1F7 | 8926 | 0C57 | C726 | 1047 |
| 0000014220 | 0000 | C38B | C28C | 5F5E | CBC9 | 0B6A | 09E8 | 83F2 |
| 0000014240 | 02C4 | 3E83 | 12FC | 7500 | E807 | 0022 | 06FF | 12FC |
| 0000014260 | 0B6A | 19E8 | 83F2 | 02C4 | 90CB | 0B6A | E9E8 | 83F1 |
| 0000014300 | 02C4 | 09E8 | 6A00 | E80B | F204 | C483 | CB02 | 04C8 |
| 0000014320 | 0000 | 1E56 | 9068 | 9A0A | 1C64 | 16F7 | C483 | 8904 |
| 0000014340 | FC46 | 5689 | 0BFE | 75D0 | E903 | 00A4 | 5EC4 | 26FC |
| 0000014360 | 3F80 | 7500 | E903 | 0098 | 036A | 5006 | 36FF | 0AA4 |
| 0000014400 | 36FF | 0AA2 | 369A | 0E1C | 8317 | 0AC4 | 006A | 1068 |
| 0000014420 | 830E | FC46 | FF03 | FE76 | 76FF | 9AFC | 1C60 | 1718 |
| 0000014440 | C483 | 5204 | 9A50 | 0E12 | 1763 | 9CA3 | 890A | 9E16 |
| 0000014460 | 2B0A | 8EF6 | FE46 | 5E8B | 26FC | 3880 | 7400 | 261A |
| 0000014500 | 008A | C88B | 8B98 | F6D8 | CD87 | 040E | 0575 | F980 |
| 0000014520 | 752D | 4606 | FE83 | 7C03 | 8BDD | FC5E | 8026 | 0038 |
| 0000014540 | 1874 | 036A | DE03 | 5306 | 36FF | 0AA8 | 36FF | 0AA6 |
| 0000014560 | 369A | 801C | 8314 | 0AC4 | 08EB | 1EC4 | 0AA6 | C626 |
| 0000014600 | 0007 | 1EC4 | 0AA6 | 8026 | 013F | C01B | A340 | 0AA0 |
| 0000014620 | C95E | 90C3 | 04C8 | 0000 | C456 | 065E | 8326 | 087F |
| 0000014640 | 7D03 | E903 | 00B6 | 8326 | 087F | 7E09 | E903 | 00AC |
| 0000014660 | 8326 | 087F | 7E03 | 260A | 7F83 | 0908 | 037D | 81E9 |
| 0000014700 | 2600 | 778B | 810A | 6CC6 | 8107 | C2FE | 7E07 | 2617 |

THU MAR 14 17:35:10 1991 FRAME.EXE PAGE 8, LINE 414

| | | | | | | | | |
|---|---|---|---|---|---|---|---|---|
| 0000014720 | 7F83 | 0308 | 1075 | 8B26 | 085F | E3D1 | 878B | 0FEA |
| 0000014740 | 0705 | EB00 | 900B | 8B26 | 085F | E3D1 | 878B | 0FEC |
| 0000014760 | 4689 | F7FC | 03C6 | 7500 | FF03 | FC46 | 5E8B | 2606 |
| 0000015000 | 778B | 830A | 46EE | 448D | 9901 | C233 | C22B | F8C1 |
| 0000015020 | 3302 | 2BC2 | 69C2 | 6DCE | 0301 | 03C1 | FC46 | 0405 |
| 0000015040 | B900 | 0007 | F799 | 2BF9 | FC56 | DAF7 | 8326 | 087F |
| 0000015060 | 7503 | 2615 | 573B | 7C0E | 7509 | 2621 | 7F83 | 0204 |
| 0000015100 | 1A7C | 01B8 | EB00 | 9017 | 5EC4 | 8B06 | 26C2 | 4739 |
| 0000015120 | 7C0E | 75EF | 2607 | 7F83 | 0104 | E67C | C02B | C95E |
| 0000015140 | 90CB | 4E8B | 8B0E | 0646 | 568B | 1E08 | 7EC5 | 570A |
| 0000015160 | 071E | 93FC | C00A | 1374 | F983 | 750A | 0B0E | 79D2 |
| 0000015200 | B00A | AA2D | DBF7 | D283 | F700 | 8BDA | 92F7 | D233 |
| 0000015220 | C00B | 0274 | F1F7 | F793 | 92F1 | D387 | 3004 | 393C |
| 0000015240 | 0276 | 2704 | 8BAA | 0BC2 | 75C3 | 88E2 | 4F05 | 86AC |
| 0000015260 | 8805 | FF44 | 448D | 3B01 | 72C7 | 8CF2 | 58DA | 5F1F |
| 0000015300 | 8B5E | 5DE5 | 00CB | 581E | 4590 | 8B55 | 1EEC | D88E |
| 0000015320 | C033 | 4C9A | E119 | FF18 | 9436 | FF02 | 9236 | FF02 |
| 0000015340 | 0E76 | 76FF | FF0C | 0A76 | 76FF | FF08 | 0676 | 849A |
| 0000015360 | CA1D | 4D16 | [illegible] | 1FE5 | 4D5D | 90CB | 8B55 | 53EC |
| 0000015400 | 8B56 | 0C46 | C00B | 1575 | 4E8B | 8B0A | 0846 | D233 |
| 0000015420 | F1F7 | D88B | 468B | F706 | 8BF1 | EBD3 | 8B38 | 8BC8 |
| 0000015440 | 0A5E | 568B | 8B08 | 0646 | E9D1 | DBD1 | EAD1 | D8D1 |
| 0000015460 | C90B | F475 | F3F7 | F08B | 66F7 | 910C | 468B | F70A |
| 0000015500 | 03E6 | 72D1 | 3B0C | 0856 | 0777 | 0672 | 463B | 7606 |
| 0000015520 | 4E01 | D233 | 5E96 | 5D5B | 08CA | 0000 | 5A59 | DC8B |
| 0000015540 | D82B | 1972 | FB81 | 0200 | 1372 | E852 | 03AC | 8E93 |
| 0000015560 | 5AC2 | 3B26 | 0447 | 0572 | E08B | 5152 | 52CB | A151 |
| 0000015600 | 0AE6 | 7540 | 3305 | E9C0 | E712 | 2EFF | 0AE6 | 8B55 |
| 0000015620 | 56EC | 768B | B804 | 0200 | 9A50 | 0594 | 18C5 | 8B59 |
| 0000015640 | 81DE | EAEB | 810A | CAC3 | 0B0C | 74D2 | 800B | 0A4C |
| 0000015660 | C708 | 0247 | 0200 | 0EEB | 4C80 | 040A | 47C7 | 0102 |
| 0000015700 | 8C00 | 8DDA | 0147 | 5489 | 8902 | 8904 | 0854 | 4489 |
| 0000015720 | C706 | 0444 | 0000 | 5D5E | 00C3 | 8B55 | 83EC | 02EC |
| 0000015740 | C033 | 09EB | 8B55 | 83EC | 02EC | FFB8 | 89FF | FE46 |
| 0000015760 | 5E8B | 3B06 | 8A1E | 7200 | BA19 | 0009 | C033 | 73E9 |
| 0000016000 | 8B07 | FE4E | C90B | 0774 | E853 | EE70 | C483 | E902 |
| 0000016020 | 077B | C00B | 0774 | E853 | EE56 | C483 | 8302 | 04EC |
| 0000016040 | CC8B | FF53 | 0A76 | 76FF | FF08 | 0C76 | 5116 | FF9A |
| 0000016060 | 00FF | 5900 | 855A | 75C0 | 80C8 | 8CA7 | FD00 | 468B |
| 0000016100 | 0BFE | 74C0 | 5307 | 33E8 | 83EE | 02C4 | 8B91 | 5DE5 |
| 0000016120 | 00CB | 8B55 | 83EC | 0EEC | C033 | 09EB | 8B55 | 83EC |
| 0000016140 | 0EEC | FFB8 | 89FF | F246 | 5E8B | 3B06 | 8A1E | 7200 |
| 0000016160 | BA08 | 0009 | C033 | FBE9 | 0B06 | 74C0 | 5307 | EFE8 |
| 0000016200 | 83ED | 02C4 | 87F6 | 008C | 7420 | 5312 | C933 | 5151 |
| 0000016220 | 4141 | 8D51 | F446 | 5016 | 1F9A | 001A | F600 | 8C87 |
| 0000016240 | 8000 | 7D74 | 5E8C | 8EFA | 0A46 | 56C5 | 3308 | 89C0 |
| 0000016260 | FE46 | 4689 | FCFC | 5657 | FA8B | F28B | 6689 | 8BF8 |
| 0000016300 | 0C4E | 3FE3 | 0AB0 | AEF2 | 5275 | 8E1E | FA5E | D89A |
| 0000016320 | 8C21 | 3D19 | 00A8 | 4C76 | 831F | 02EC | DC8B | 00BA |
| 0000016340 | 3D02 | 0228 | 0373 | 80BA | 2B00 | 8BE2 | 8BD4 | 16FA |
| 0000016360 | 8B07 | 0C4E | 3CAC | 740A | 3B0D | 74FB | AA1A | F4E2 |
| 0000016400 | 38E8 | E900 | 00AF | 0DB0 | FB3B | 0375 | 2CE8 | AA00 |
| 0000016420 | 0AB0 | 46FF | EBFC | E8E2 | 0021 | E1EB | 5F5E | 5E8E |
| 0000016440 | E9FA | 00C8 | 468B | 0BF2 | 74C0 | FF09 | 0676 | 4BE8 |
| 0000016460 | 83ED | 02C4 | FCB8 | 0EFF | 21E8 | 50FE | 5153 | 061E |
| 0000016500 | 8B1F | 2BCF | E3CA | 5121 | 5E8B | 5306 | 521E | 8D51 |
| 0000016520 | F446 | 5016 | 659A | 0005 | 5900 | C00B | 1175 | 5E8B |
| 0000016540 | 01F4 | FE5E | D93B | 0772 | 591F | 585B | FA8B | 1FC3 |
| 0000016560 | C483 | 8308 | FE7E | 7500 | 0B3C | 74C0 | 3D18 | 006D |

THU MAR 14 17:35:10 1991 FRAME.EXE PAGE 9, LINE 473

| | | | | | | | | |
|---|---|---|---|---|---|---|---|---|
| 0000016600 | 0D74 | 013D | BA00 | 0009 | 0875 | 1CBA | EB00 | BA03 |
| 0000016620 | 0020 | EBF9 | 8E26 | FA5E | 87F6 | 008C | 7440 | 8E0E |
| 0000016640 | 0A5E | 5E8B | 8008 | 1A3F | 0375 | EBF8 | BA0E | 001C |
| 0000016660 | C033 | EBF9 | 8B06 | FE46 | 462B | 8BFC | F866 | 5F5E |
| 0000016700 | 5E8E | 72FA | 8B14 | F25E | DB0B | 0974 | 76FF | E806 |
| 0000016720 | ECAA | C483 | 8B02 | 5DE5 | 8BCB | F25E | DB0B | 0974 |
| 0000016740 | 76FF | E806 | EC96 | C483 | E902 | 0588 | 4E8B | 0B0C |
| 0000016760 | 75C9 | 8B04 | EBC1 | 1ECE | 56C5 | 5308 | 521E | 8D51 |
| 0000017000 | F446 | 5016 | 459A | 001B | 1E00 | 1F07 | C00B | 1774 |
| 0000017020 | 6D3D | 7400 | 3D0D | 0001 | 09BA | 7500 | BABC | 001C |
| 0000017040 | B7EB | 20BA | EB00 | 8BB2 | F446 | C00B | 9775 | 87F6 |
| 0000017060 | 008C | 7440 | 8B0A | 26DA | 3F80 | 751A | EB02 | BA86 |
| 0000017100 | 001C | C033 | 93EB | 8B55 | 57EC | 1E56 | 7EC4 | C506 |
| 0000017120 | 0A76 | DF8B | 4E8B | E30E | AC0C | C00A | 0374 | E2AA |
| 0000017140 | 32F8 | F3C0 | 8BAA | 8CC3 | 1FC2 | 5F5E | E58B | CB5D |
| 0000017160 | CFE9 | 0005 | 04C8 | 0000 | A156 | 0292 | 168B | 0294 |
| 0000017200 | 4689 | 89FC | FE56 | 0C6A | 1DE8 | 83EC | 02C4 | 468B |
| 0000017220 | 0BFE | FC46 | 7674 | 468B | 0B08 | 0646 | 6E74 | 76FF |
| 0000017240 | FF08 | 0676 | AA9A | B409 | 831C | 04C4 | F08B | 5EC4 |
| 0000017260 | 26FC | 478B | 2602 | 070B | 5274 | FF26 | 0277 | FF26 |
| 0000017300 | 9A37 | 09AA | 1CD5 | C483 | 3B04 | 7EC6 | C439 | FC5E |
| 0000017320 | C426 | 261F | 3880 | 753D | 562D | 76FF | FF08 | 0676 |
| 0000017340 | 5306 | F69A | C121 | 831A | 0AC4 | C00B | 1875 | 0C6A |
| 0000017360 | DBE8 | 83EB | 02C4 | 5EC4 | 26FC | 078B | 8B26 | 0257 |
| 0000017400 | C603 | EB40 | 9012 | 4683 | 04FC | A2EB | 0C6A | BDE8 |
| 0000017420 | 83EB | 02C4 | C02B | 5E99 | CBC9 | 068E | 004C | A126 |
| 0000017440 | 0006 | 3B48 | CE06 | 770F | C107 | 06E0 | FFBA | C3FF |
| 0000017460 | 5357 | 6A51 | E80F | EB70 | C483 | 3B02 | CE06 | 760F |
| 0000017500 | 8B40 | 05D8 | 0004 | FC25 | 8BFF | C1C8 | 06E0 | 1DBA |
| 0000017520 | 501D | 9A52 | 07DD | 0000 | C00B | 3275 | 8B49 | 87F9 |
| 0000017540 | CE3E | 2B0F | 51CF | C147 | 06E7 | E1C1 | 5705 | C28E |
| 0000017560 | ABF3 | 595F | C726 | 0445 | 0200 | C783 | E240 | 8BF5 |
| 0000017600 | 6AC3 | E80F | EB48 | C483 | 5902 | 5F5B | 9BEB | 10B8 |
| 0000017620 | E900 | E308 | 581E | 4590 | 8B55 | 1EEC | D88E | EC83 |
| 0000017640 | 5610 | C02B | 4689 | 89F2 | F046 | 76FF | FF12 | 1076 |
| 0000017660 | 76FF | FF0E | 0C76 | 76FF | FF0A | 0876 | 76FF | 9A06 |
| 0000017700 | 2494 | 1DC3 | C483 | 890E | FC46 | 7440 | E903 | 0170 |
| 0000017720 | CC9A | DD21 | 8E1D | 8BC2 | 26D8 | 3F83 | 7402 | E903 |
| 0000017740 | 015E | 2F6A | 76FF | FF0A | 0876 | 009A | F40B | 831D |
| 0000017760 | 06C4 | D00B | 0374 | 47E9 | 6A01 | FF5C | 0A76 | 76FF |
| 0000020000 | 9A08 | 0B00 | 1E1A | C483 | 0B06 | 74D0 | E903 | 0130 |
| 0000020020 | 5EC4 | 2608 | 3F80 | 7400 | 260A | 7F80 | 3A01 | 0375 |
| 0000020040 | 1DE9 | 1E01 | 0468 | 9A10 | 1C64 | 1E32 | C483 | 8904 |
| 0000020060 | F446 | 5689 | 0BF6 | 75D0 | E903 | 0104 | 0468 | 9A01 |
| 0000020100 | 0594 | 1E77 | C483 | 8902 | F046 | 5689 | 0BF2 | 75D0 |
| 0000020120 | E903 | 00EC | 0368 | FF01 | F276 | 76FF | FFF0 | F676 |
| 0000020140 | 76FF | E8F4 | 0432 | C483 | 890A | F446 | 5689 | 0BF6 |
| 0000020160 | 75D0 | E903 | 00CA | 5EC4 | 26F0 | 3F80 | 7500 | E903 |
| 0000020200 | 00BE | 5306 | AA9A | 9909 | 831E | 04C4 | 5EC4 | 03F0 |
| 0000020220 | 4BD8 | 8026 | 5C3F | 1674 | 8026 | 2F3F | 1074 | 681E |
| 0000020240 | 1009 | FF06 | F076 | 049A | A709 | 831E | 08C4 | 76FF |
| 0000020260 | FF0A | 0876 | AA9A | B709 | 831E | 04C4 | 76FF | FFF2 |
| 0000020300 | F076 | F08B | AA9A | D309 | 831E | 04C4 | F0D3 | FE81 |
| 0000020320 | 0104 | 6C73 | 76FF | FF0A | 0876 | 76FF | FFF2 | F076 |
| 0000020340 | 049A | F009 | 831E | 08C4 | 76FF | FF12 | 1076 | 76FF |
| 0000020360 | FF0E | 0C76 | 76FF | FFF2 | F076 | 76FF | 9A06 | 2494 |
| 0000020400 | 1EFE | C483 | 890E | FC46 | 7540 | 9A35 | 21CC | 1F41 |
| 0000020420 | C28E | D88B | 8326 | 023F | 0375 | 37E9 | C4FF | F05E |
| 0000020440 | 8026 | 5C3F | 0674 | 8026 | 2F3F | 1475 | 8026 | 017F |

THU MAR 14 17:35:10 1991 FRAME.EXE PAGE 10, LINE 532

| | | | | | | | | |
|---|---|---|---|---|---|---|---|---|
| 0000020460 | 755C | E9D3 | FF1E | 8026 | 017F | 752F | E903 | FF14 |
| 0000020500 | 468B | 0BF2 | F046 | 0E74 | 76FF | FFF2 | F076 | FA9A |
| 0000020520 | 9708 | 831C | 04C4 | 468B | 5EFC | 4D4D | E58B | 5D1F |
| 0000020540 | CB4D | 8B55 | 1EEC | C553 | 065E | 76FF | FF0C | 0A76 |
| 0000020560 | 77FF | FF02 | 0E37 | A5E8 | 8900 | 0257 | 0789 | 1F5B |
| 0000020600 | CA5D | 0008 | 8B55 | 57EC | 5356 | FF33 | 468B | 0B08 |
| 0000020620 | 7DC0 | 4711 | 568B | F706 | F7D8 | 1DDA | 0000 | 4689 |
| 0000020640 | 8908 | 065[illegible] | 468B | 0B0C | 7DC0 | 4711 | 568B | F70A |
| 0000020660 | F7D8 | 1DDA | 0000 | 4689 | 890C | 0A56 | C00B | 1575 |
| 0000020700 | 4E8B | 8B0A | 0846 | D233 | F1F7 | D88B | 468B | F706 |
| 0000020720 | 8BF1 | EBD3 | 8B38 | 8BD8 | 0A4E | 568B | 8B08 | 0646 |
| 0000020740 | EBD1 | D9D1 | EAD1 | D8D1 | DB0B | F475 | F1F7 | F08B |
| 0000020760 | 66F7 | 910C | 468B | F70A | 03E6 | 72D1 | 3B0C | 0856 |
| 0000021000 | 0777 | 0672 | 463B | 7606 | 4E01 | D233 | 4F96 | 0775 |
| 0000021020 | DAF7 | D8F7 | DA83 | 5B00 | 5F5E | CA5D | 0008 | 8B55 |
| 0000021040 | 53EC | 3357 | 8BFF | 0846 | C00B | 117D | 8B47 | 0656 |
| 0000021060 | D8F7 | DAF7 | 001D | 8900 | 0846 | 5689 | 8B06 | 0C46 |
| 0000021100 | C00B | 107D | 568B | F70A | F7D8 | 1DDA | 0000 | 4689 |
| 0000021120 | 89GC | 0A56 | C00B | 1875 | 4E8B | 8B0A | 0846 | D233 |
| 0000021140 | F1F7 | 468B | F706 | 8BF1 | 33C2 | 4FD2 | 4379 | 48EB |
| 0000021160 | D88B | 4E8B | 8B0A | 0856 | 468B | D106 | D1EB | D1D9 |
| 0000021200 | D1EA | 0BD8 | 75DB | F7F4 | 8BF1 | F7C8 | 0C66 | F791 |
| 0000021220 | 0A66 | D103 | 0C72 | 563B | 7708 | 7207 | 3B0B | 0646 |
| 0000021240 | 0676 | 462B | 1B0A | 0C56 | 462B | 1B06 | 0856 | 794F |
| 0000021260 | F707 | F7DA | 83D8 | 00DA | 5B5F | CA5D | 0008 | 8B55 |
| 0000021300 | 53EC | 468B | 0B0C | 75C0 | 8B15 | 0A4E | 468B | 3308 |
| 0000021320 | F7D2 | 8BF1 | 0646 | F1F7 | C28B | D233 | 45EB | C88B |
| 0000021340 | 5E8B | 8B0A | 0856 | 468B | D106 | D1E9 | D1DB | D1EA |
| 0000021360 | 0BD8 | 75C9 | F7F4 | 8BF3 | F7C8 | 0C66 | F791 | 0A66 |
| 0000021400 | D103 | 0C72 | 563B | 7708 | 7207 | 3B0B | 0646 | 0676 |
| 0000021420 | 462B | 1B0A | 0C56 | 462B | 1B06 | 0856 | DAF7 | D8F7 |
| 0000021440 | DA83 | 5B00 | CA5D | 0008 | 1601 | 0202 | 0203 | 1804 |
| 0000021460 | 0D05 | 0906 | 0C07 | 0C08 | 0C09 | 070A | 080B | 160C |
| 0000021500 | 160D | 020F | 0D10 | 1211 | 0212 | 0235 | 0D41 | 0243 |
| 0000021520 | 0D52 | 0D53 | 0D57 | 0B59 | 0D6C | 206D | 1C70 | 0972 |
| 0000021540 | 1606 | 0A80 | 0A81 | 0982 | 0D84 | 0BA4 | 02CE | 0BD7 |
| 0000021560 | 0D00 | 1608 | 8B52 | E8D8 | FBA0 | 8F93 | 5AC2 | 8926 |
| 0000021600 | 0247 | 8926 | B817 | FFFF | 8B99 | 5DE5 | E8CB | 0008 |
| 0000021620 | FFB8 | 99FF | E58B | CB5D | D88B | 7DE8 | 93FB | C28E |
| 0000021640 | 8926 | 0247 | BB53 | 2118 | 24B9 | 0A00 | 75E4 | 2E1B |
| 0000021660 | 073A | 1674 | 4343 | F7E2 | 133C | 0472 | 243C | 0A76 |
| 0000021700 | 3C43 | 72BC | 3C04 | 76CA | 4301 | 8A2E | 0147 | 5B98 |
| 0000021720 | 8926 | C307 | 8B55 | BBEC | 0002 | 05EB | 8B55 | 33EC |
| 0000021740 | E8DB | FB36 | C303 | CB5D | 5A59 | E852 | FB2C | D88B |
| 0000021760 | C28E | 265A | 478B | 3B04 | 73C4 | 2B07 | F7C4 | 52D8 |
| 0000022000 | CB51 | C033 | F9EB | 8B55 | 57EC | 1E56 | 4E8B | E30E |
| 0000022020 | 8B27 | C4D9 | 067E | F78B | C033 | AEF2 | D9F7 | CB03 |
| 0000022040 | FE8B | 76C5 | F30A | 8AA6 | FF44 | C933 | 3A26 | FF45 |
| 0000022060 | 0477 | 0474 | 4949 | D1F7 | C18B | 5E1F | 8B5F | 5DE5 |
| 0000022100 | 00CB | 8B55 | 57EC | 1E56 | 76C5 | 3306 | 99C0 | DB33 |
| 0000022120 | 3CAC | 7420 | 3CFB | 7409 | 50F7 | 2D3C | 0474 | 2B3C |
| 0000022140 | 0175 | 3CAC | 7739 | 2C1F | 7230 | D11B | D1E3 | 8BD2 |
| 0000022160 | 8BCB | D1FA | D1E3 | D1D2 | D1E3 | 03D2 | 13D9 | 03D7 |
| 0000022200 | 83D8 | 00D2 | DCEB | 3C58 | 932D | 0775 | D8F7 | D283 |
| 0000022220 | F700 | 1FDA | 5F5E | CB5D | 04C8 | 0000 | 468B | 8B04 |
| 0000022240 | 0656 | 4689 | 89FC | FE56 | 4EFF | 740C | EB79 | 9044 |
| 0000022260 | 8026 | 3B3F | 6774 | 8026 | 223F | 2274 | 8A26 | C407 |
| 0000022300 | 085E | 8826 | FF07 | 0446 | 46FF | FF08 | 0C4E | 2375 |
| 0000022320 | 468B | 8B04 | 0656 | 4689 | 89FC | FE56 | 48EB | 46FF |

THU MAR 14 17:35:10 1991 FRAME.EXE PAGE 11, LINE 591

| | | | | | | | | |
|---|---|---|---|---|---|---|---|---|
| 0000022340 | C404 | 045E | 8026 | 003F | 1475 | 8026 | 003F | 0374 |
| 0000022360 | 46FF | C404 | 045E | 8026 | 003F | B475 | 1FEB | 8026 |
| 0000022400 | 223F | E674 | 8A26 | C407 | 085E | 8826 | FF07 | 0446 |
| 0000022420 | 46FF | FF08 | 0C4E | C975 | B6EB | 46FF | 8B04 | 045E |
| 0000022440 | 8026 | 3B3F | F474 | 5EC4 | 2608 | 07C6 | 8B00 | 0446 |
| 0000022460 | 568B | 3906 | FC46 | 0875 | 5639 | 75FE | 2B03 | 99C0 |
| 0000022500 | C3C9 | 581E | 4590 | 8B55 | 1EEC | D88E | 1AB8 | 9A00 |
| 0000022520 | 194C | 2365 | 46C7 | 00F8 | 8300 | 147E | 7400 | E903 |
| 0000022540 | 00AC | 468B | 8B08 | 0A56 | 4689 | 89EC | EE56 | 681E |
| 0000022560 | 100E | 649A | 9A1C | 8323 | 04C4 | 4689 | 8908 | 0A56 |
| 0000022600 | 4689 | 89FA | FC56 | D00B | 0374 | 89E9 | 8000 | 883E |
| 0000022620 | 0000 | 0874 | 46C7 | 1608 | EB10 | 9006 | 46C7 | 1E08 |
| 0000022640 | 8C10 | 0A5E | 0468 | 9A01 | 0594 | 23C4 | C483 | 8902 |
| 0000022660 | FA46 | 5689 | 0BFC | 75D0 | B807 | FFFF | DDE9 | 9000 |
| 0000022700 | 46FF | FFF8 | FC76 | 1E50 | 2A68 | FF10 | 0A76 | 76FF |
| 0000022720 | 9A08 | 27F4 | 23D7 | C483 | C40C | FA5E | 8026 | 003F |
| 0000022740 | 2075 | 5306 | FA9A | DF08 | 8323 | 04C4 | CC9A | 3121 |
| 0000022760 | 8924 | E646 | 5689 | C4E8 | E65E | C726 | 0807 | EB00 |
| 0000023000 | 90B8 | C38B | C28C | 4689 | 8908 | 0A56 | 08EB | C02B |
| 0000023020 | 4689 | 89FC | FA46 | 76FF | FFEE | EC76 | 76FF | FFFC |
| 0000023040 | FA76 | 76FF | FF0A | 0876 | 468D | 16F4 | 8D50 | F046 |
| 0000023060 | 5016 | 76Fr | FF12 | 1076 | 76FF | FF0E | 0C76 | 009A |
| 0000023100 | 5429 | 8324 | 1CC4 | 7540 | E903 | FF6D | 76FF | FFF6 |
| 0000023120 | F476 | 76FF | FFF2 | F076 | 76FF | FF0A | 0876 | 76FF |
| 0000023140 | 9A06 | 2D3A | 246B | C483 | 890E | EA46 | 7E83 | 00F8 |
| 0000023160 | 0E74 | 76FF | FFFC | FA76 | FA9A | 7908 | 8324 | 04C4 |
| 0000023200 | 76FF | FFF2 | F076 | FA9A | 8708 | 8324 | 04C4 | 76FF |
| 0000023220 | FFF6 | F476 | FA9A | A408 | 8B24 | EA46 | 4D4D | E58B |
| 0000023240 | 5D1F | CB4D | 581E | 4590 | 8B55 | 1EEC | D88E | 16B8 |
| 0000023260 | 9A00 | 194C | 24CB | 3E80 | 0088 | 7400 | B805 | 1039 |
| 0000023300 | 03EB | 3EB8 | A310 | 1046 | 5C6A | 468B | 8B08 | 0A56 |
| 0000023320 | 4689 | 89EA | EC56 | 5052 | 749A | E10B | 8324 | 06C4 |
| 0000023340 | 4689 | 89EE | F056 | 2F6A | 76FF | FFEC | EA76 | 749A |
| 0000023360 | 060B | 8325 | 06C4 | 4689 | 89FA | FC56 | D00B | 7E75 |
| 0000023400 | 468B | 0BF0 | EE46 | 0374 | 8FE9 | 6A00 | FF3A | EC76 |
| 0000023420 | 76FF | 9AEA | 0B00 | 251E | C483 | 8906 | EE46 | 5689 |
| 0000023440 | 0BF0 | 75D0 | FF75 | EC76 | 76FF | 9AEA | 09AA | 252A |
| 0000023460 | C483 | 0504 | 0003 | 9A50 | 0594 | 254B | C483 | 8902 |
| 0000023500 | EA46 | 5689 | 0BEC | 75D0 | B807 | FFFF | 7EE9 | 9001 |
| 0000023520 | 681E | 1043 | 76FF | 50EC | 4A9A | 5F09 | 8325 | 08C4 |
| 0000023540 | 76FF | FF0A | 0876 | 76FF | FFEC | EA76 | 049A | 9509 |
| 0000023560 | 8325 | 08C4 | 468B | 8BEA | EC56 | 4040 | 16EB | 468B |
| 0000023600 | 0BF0 | EE46 | 0874 | 468B | 39EE | FA46 | 0C76 | 468B |
| 0000023620 | 8BFA | FC56 | 4689 | 89EE | F056 | 2E6A | 76FF | FFF0 |
| 0000023640 | EE76 | 749A | B00B | 8325 | 06C4 | 4689 | 89F6 | F856 |
| 0000023660 | D00B | 3674 | FF1E | 4636 | FF10 | F876 | 9A50 | 0B2E |
| 0000023700 | 25CE | C483 | 5008 | 76FF | FF12 | 1076 | 76FF | FF0E |
| 0000023720 | 0C76 | 76FF | FFEC | EA76 | 76FF | 9A06 | 2332 | 25E3 |
| 0000023740 | C483 | 8910 | F446 | C6E9 | 9000 | 76FF | FFEC | EA76 |
| 0000023760 | AA9A | EF09 | 8325 | 04C4 | 0505 | 5000 | 949A | 0E05 |
| 0000024000 | 8326 | 02C4 | 4689 | 89EE | F056 | DC0B | 0375 | 38E9 |
| 0000024020 | FFFF | EC76 | 76FF | FFEA | F076 | 9A50 | 094A | 261C |
| 0000024040 | C483 | FF08 | EC76 | 76FF | 9AEA | 09AA | 2656 | C483 |
| 0000024060 | 0304 | EE46 | 568B | 89F0 | F646 | 5689 | C7F8 | F446 |
| 0000024100 | FFFF | 46C7 | 02F2 | EB00 | 9004 | 4EFF | 83F2 | F27E |
| 0000024120 | 7C00 | 8B4E | F25E | E3D1 | FF1E | 46B7 | FF10 | F876 |
| 0000024140 | 76FF | 9AF6 | 094A | 2666 | C483 | 6A08 | FF00 | F076 |
| 0000024160 | 76FF | 9AEE | 2DBC | 2689 | C483 | 4006 | CC74 | 76FF |
| 0000024200 | FFF2 | 1276 | 76FF | FF10 | 0E76 | 76FF | FF0C | F076 |

THU MAR 14 17:35:10 1991 FRAME.EXE PAGE 12, LINE 650

| | | | | | | | | |
|---|---|---|---|---|---|---|---|---|
| 0000024220 | 76FF | FFEE | 0676 | 329A | 9A23 | 8326 | 10C4 | 4689 |
| 0000024240 | FFF4 | F076 | 76FF | 9AEE | 08FA | 26B8 | C483 | 8B04 |
| 0000024260 | 0846 | 568B | 390A | EA46 | 0575 | 5639 | 74EC | FF0B |
| 0000024300 | EC76 | 76FF | 9AEA | 08FA | 1DB2 | 468B | 4DF4 | 8B4D |
| 0000024320 | 1FE5 | 4D5D | 90CB | 04C8 | 0000 | 468B | 0B08 | 0646 |
| 0000024340 | 0875 | 006A | A7E8 | EB00 | 9031 | 468B | 2D06 | 0AEA |
| 0000024360 | 0CB9 | 9900 | F9F7 | 4689 | 50FC | 5BE8 | 83E1 | 02C4 |
| 0000024400 | 76FF | FF08 | 0676 | 0C9A | 5027 | 8327 | 04C4 | 4689 |
| 0000024420 | FFFE | FC76 | 4DE8 | 8BE1 | FE46 | CBC9 | 02C8 | 0000 |
| 0000024440 | 5657 | FF2B | 768B | 8A06 | 0A44 | C88B | 0324 | 023C |
| 0000024460 | 3F75 | C1F6 | 7508 | 8B0D | 81DE | EAEB | F60A | CA87 |
| 0000024500 | 010C | 2D74 | 048B | 442B | 8906 | FE46 | C00B | 217E |
| 0000024520 | FF50 | 0874 | 74FF | 8A06 | 0B4C | ED2A | 9A51 | 1A4C |
| 0000024540 | 27CD | C483 | 3908 | FE46 | 0774 | 4C80 | 200A | FFBF |
| 0000024560 | 8BFF | 0644 | 548B | 8908 | 8904 | 0254 | 44C7 | 0004 |
| 0000024600 | 8B00 | 5EC7 | C95F | 90CB | 016A | 01E8 | CB00 | 04C8 |
| 0000024620 | 0000 | 5657 | EABE | 2B0A | 89FF | FE7E | 026A | 07EB |
| 0000024640 | 83E1 | 02C4 | 11EB | 46C7 | FFFE | FFFF | FC76 | B3E8 |
| 0000024660 | 83E0 | 02C4 | C683 | 390C | AA36 | 720E | 8B2B | 2DC6 |
| 0000024700 | 0AEA | 0CB9 | 9900 | F9F7 | 4689 | 50FC | 89E8 | 83E0 |
| 0000024720 | 02C4 | 44F6 | 830A | D374 | 561E | 0C9A | 4227 | 832³ |
| 0000024740 | 04C4 | 7440 | 47C1 | C3EB | 026A | E1E8 | 83E0 | 02C4 |
| 0000024760 | 7E83 | 0104 | 0475 | C78B | 03EB | 468B | 5EFE | C95F |
| 0000025000 | 02C2 | 9000 | 08C8 | 0000 | 6A56 | FF00 | 0876 | 76FF |
| 0000025020 | 9A06 | 2DBC | 2819 | C483 | 0B06 | 75C0 | 6841 | 0104 |
| 0000025040 | 76FF | FF10 | 0E76 | F89A | 312D | 8328 | 06C4 | 5EC4 |
| 0000025060 | 260E | 7F80 | 0003 | 0E74 | 681E | 104C | 5306 | 049A |
| 0000025100 | 4509 | 8328 | 08C4 | 76FF | FF08 | 0676 | 76FF | FF10 |
| 0000025120 | 0E76 | 049A | 5709 | 8328 | 08C4 | B0E9 | 9000 | 76FF |
| 0000025140 | FF0C | 0A76 | 649A | 951C | 8328 | 04C4 | 4689 | 89FC |
| 0000025160 | FE56 | D00B | 0375 | 8DE9 | 6A00 | FF00 | 1076 | 76FF |
| 0000025200 | FF0E | FE76 | 76FF | E8FC | FA0E | C483 | 890A | FC46 |
| 0000025220 | 5689 | 0BFE | 74D0 | C46F | 0E5E | 8026 | 003F | 6674 |
| 0000025240 | 5306 | AA9A | D709 | 8328 | 04C4 | 5EC4 | 030E | 89D8 |
| 0000025260 | F85E | 468C | 26FA | 478A | 98FF | F08B | FE83 | 742F |
| 0000025300 | 8317 | 5CFE | 1274 | FE83 | 743A | 260D | 07C6 | 8D5C |
| 0000025320 | 0147 | 4689 | 8CF8 | FA46 | 76FF | FF08 | 0676 | 76FF |
| 0000025340 | FFFA | F876 | 4A9A | E709 | 8328 | 08C4 | 006A | 76FF |
| 0000025360 | FF10 | 0E76 | BC9A | F92D | 8326 | 06C4 | C00B | 0374 |
| 0000025400 | 76E9 | EBFF | 9008 | 5EC4 | 260E | 07C6 | 5E00 | CBC9 |
| 0000025420 | 14C8 | 0000 | 5657 | 468B | 0B0C | 0A46 | 0D75 | 92A1 |
| 0000025440 | 8B02 | 9416 | 8902 | 0A46 | 5689 | 8B0C | 0646 | 568B |
| 0000025460 | 8908 | F446 | 5689 | BEF6 | 0002 | 16EB | 4683 | 04F4 |
| 0000025500 | FF26 | 0277 | FF26 | 9A37 | 09AA | 2965 | C483 | 4004 |
| 0000025520 | F003 | 5EC4 | 26F4 | 478B | 2602 | 070B | 0674 | FE81 |
| 0000025540 | 7FFF | D876 | 468B | 0B1C | 1A46 | 2274 | 76FF | FF1C |
| 0000025560 | 1A76 | AA9A | 7509 | 8329 | 04C4 | 76FF | FF20 | 1E76 |
| 0000025600 | F88B | AA9A | 9609 | 8329 | 04C4 | F803 | F703 | 7689 |
| 0000025620 | 81FC | FFFE | 727F | C41D | 125E | C02B | 8926 | 0247 |
| 0000025640 | 8926 | 9A07 | 21CC | 29A8 | 4689 | 89F0 | F256 | 5EC4 |
| 0000025660 | E9F0 | 0110 | 9A56 | 0594 | 29CA | C483 | C402 | 0E5E |
| 0000025700 | 8926 | 2607 | 5789 | 0B02 | 75D0 | C433 | 125E | C02B |
| 0000025720 | 8926 | 0247 | 8926 | 9A07 | 21CC | 29DD | 4689 | 89EC |
| 0000025740 | EE56 | 5EC4 | 26EC | 07C7 | 000C | C49A | 0E21 | 8E2A |
| 0000025760 | 8BC2 | 26D8 | 07C7 | 0008 | FFB8 | E9FF | 0347 | 468B |
| 0000026000 | 8B0A | 0C56 | 4689 | 89F4 | F656 | 02BE | EB00 | 9017 |
| 0000026020 | 4683 | 04F4 | FF26 | 0277 | FF26 | 9A37 | 09AA | 2A6C |
| 0000026040 | C483 | 4004 | F003 | 5EC4 | 26F4 | 478B | 2602 | 070B |
| 0000026060 | 0674 | FE81 | 7FFF | D876 | 3E83 | 1054 | 7400 | A11F |

THU MAR 14 17:35:10 1991 FRAME.EXE PAGE 13, LINE 709

| | | | | | | | | |
|---|---|---|---|---|---|---|---|---|
| 0000026100 | 008A | 4689 | EBFE | 9004 | 4EFF | 83FE | FE7E | 7400 |
| 0000026120 | 8B12 | FE5E | BF80 | 008B | 7500 | EB08 | 90EB | 46C7 |
| 0000026140 | 00FE | 8300 | FE7E | 7400 | 8B0A | FE46 | 0705 | D100 |
| 0000026160 | 03E0 | FFF0 | 1876 | 76FF | 9A16 | 09AA | 2A95 | C483 |
| 0000026200 | 2B04 | 03D2 | FC46 | D213 | C603 | D283 | 0B00 | 7CD2 |
| 0000026220 | 7F49 | 3D05 | 7FFE | 4276 | 5EC4 | 260E | 77FF | 2602 |
| 0000026240 | 37FF | FA9A | A908 | 832A | 04C4 | 5EC4 | 2B0E | 26C0 |
| 0000026260 | 4789 | 2602 | 0789 | CC9A | BC21 | 892A | EC46 | 5689 |
| 0000026300 | C4EE | EC5E | C726 | 0707 | 9A00 | 21C4 | 2ACE | C28E |
| 0000026320 | D88B | C726 | 0A07 | E900 | FF1E | 9A56 | 0594 | 2AEE |
| 0000026340 | C483 | C402 | 125E | 8926 | 2607 | 5789 | 0B02 | 75D0 |
| 0000026360 | C419 | 0E5E | FF26 | 0277 | FF26 | 9A37 | 08FA | 2B29 |
| 0000026400 | C483 | C404 | 0E5E | C5E9 | 90FE | 5EC4 | 260E | 078B |
| 0000026420 | 8B26 | 0257 | 4689 | 89F8 | FA56 | 4E8B | 8B06 | 085E |
| 0000026440 | 4E89 | 89F4 | F65E | 7E8B | 0B1C | 1A7E | 7874 | 76FF |
| 0000026460 | FF1C | 1A76 | 5052 | 4A9A | 3B09 | 832B | 08C4 | 681E |
| 0000026500 | 104E | 76FF | FF1C | 1A76 | AA9A | 5109 | 832B | 04C4 |
| 0000026520 | 4E8B | 8BF8 | FA56 | C803 | 8941 | F84E | 5152 | 4A9A |
| 0000026540 | 6509 | 832B | 08C4 | 76FF | FF20 | 1E76 | 76FF | FFFA |
| 0000026560 | F876 | 049A | 7309 | 832B | 08C4 | 76FF | FF20 | 1E76 |
| 0000026600 | AA9A | B609 | 832B | 04C4 | D88B | 5E03 | 8EF8 | FA46 |
| 0000026620 | 5E89 | 26F8 | 47C6 | 20FF | 468B | 8BF4 | F656 | 0405 |
| 0000026640 | 8900 | F446 | 4BEB | 5EC4 | 26F4 | 478B | 2602 | 070B |
| 0000026660 | 0675 | 46FF | EBF8 | 903A | FF26 | 0277 | FF26 | 5237 |
| 0000026700 | 76FF | 9AF8 | [illegible] | [illegible] | [illegible] | 8B08 | F446 | 568B |
| 0000026720 | 89F6 | [illegible] | [illegible] | [illegible] | [illegible] | [illegible] | EC5E | FF26 |
| 0000026740 | 0277 | [illegible] | [illegible] | [illegible] | [illegible] | [illegible] | 4004 | 4601 |
| 0000026760 | [illegible] | [illegible] | [illegible] | [illegible] | [illegible] | 7407 | 264D | 77FF |
| 0000027000 | 2602 | [illegible] | [illegible] | [illegible] | [illegible] | 4A9A | 1F09 | 832C |
| 0000027020 | 08C4 | 4683 | [illegible] | [illegible] | 4689 | 89EC | EE56 | 4683 |
| 0000027040 | 04F4 | 5EC4 | [illegible] | [illegible] | 2602 | 37FF | AA9A | 9909 |
| 0000027060 | 832C | 04C4 | 4601 | [illegible] | F85E | C626 | 2007 | 478D |
| 0000027100 | 8901 | F846 | 468C | EBFA | 90A8 | C02A | 5EC4 | 26F8 |
| 0000027120 | 4788 | 26FF | 0788 | 5EC4 | 2612 | 078B | 8B26 | 0257 |
| 0000027140 | 4689 | 89F8 | FA56 | 5EC4 | 890A | F45E | 468C | 26F6 |
| 0000027160 | 4F8B | 2602 | 0F0B | 1575 | 7E83 | 00FE | 0F75 | C28E |
| 0000027200 | D88B | C626 | 0007 | 8940 | F846 | 5689 | C4FA | F45E |
| 0000027220 | 8B26 | 0247 | 0B26 | 7407 | 263D | 77FF | 2602 | 37FF |
| 0000027240 | 76FF | FFFA | F876 | 4A9A | 0409 | 8328 | 08C4 | 468B |
| 0000027260 | 8BF4 | F656 | 4689 | 89EC | EE56 | 4683 | 04F4 | 5EC4 |
| 0000027300 | 26EC | 77FF | 2602 | 37FF | AA9A | D909 | 832C | 04C4 |
| 0000027320 | 0140 | F846 | B7EB | 7E83 | 00FE | 6074 | 681E | 0064 |
| 0000027340 | 76FF | FFFA | F876 | 4A9A | E509 | 832C | 08C4 | 681E |
| 0000027360 | 0064 | AA9A | 3A09 | 8329 | 04C4 | 4601 | 2BF8 | EBF6 |
| 0000027400 | 9027 | 848A | 008C | C88B | F8C0 | 2404 | 040F | C441 |
| 0000027420 | F85E | 46FF | 26F8 | 0788 | E180 | 800F | 41C1 | 5EC4 |
| 0000027440 | FFF8 | F846 | 8826 | 460F | 468B | FFFE | FE4E | C00B |
| 0000027460 | D075 | 5EC4 | FFF8 | F846 | C626 | 0007 | 5EC4 | 26F8 |
| 0000027500 | 07C6 | 2B00 | 5EC0 | C95F | 90CB | 8B55 | 83EC | 04EC |
| 0000027520 | 468B | 3306 | 3DD2 | 0000 | 2074 | 3D42 | 0002 | 1A74 |
| 0000027540 | 033D | 7400 | 4215 | 013D | 7400 | 8B0F | 3DD0 | 0004 |
| 0000027560 | 0874 | 16BA | 3300 | E9C0 | F3FA | C033 | 5050 | 5250 |
| 0000027600 | 76FF | FF0E | 0C76 | 76FF | FF12 | 1076 | 468D | 16FC |
| 0000027620 | FF50 | 0A76 | 76FF | C708 | 9A06 | 0102 | 9A00 | FFFF |
| 0000027640 | 0000 | 06C7 | 029A | 0000 | C00B | 0374 | DEE9 | 83F3 |
| 0000027660 | 067E | 7502 | 5005 | E80E | D3DF | 468B | 83FC | 067E |
| 0000027700 | 7500 | 8A05 | 8AE0 | FE46 | E58B | CB5D | 8B55 | 83EC |
| 0000027720 | 02EC | 76FF | FF08 | 0676 | 8D16 | FE46 | 3350 | 50C0 |
| 0000027740 | 9A50 | FFFF | 0000 | C00B | 1675 | 46F6 | 020A | 1374 |

THU MAR 14 17:35:10 1991 FRAME.EXE PAGE 14, LINE 768

| | | | | | | | | |
|---|---|---|---|---|---|---|---|---|
| 0000027760 | 46F7 | 01FE | 7400 | BA0C | 000D | 05B8 | E900 | F374 |
| 0000030000 | 8AE9 | 8BF3 | 5DE5 | 00CB | 8B55 | FFEC | 0A76 | 76FF |
| 0000030020 | FF08 | 0676 | 006A | 0E9A | 242E | C92E | 90CB | 12C8 |
| 0000030040 | 0000 | 8B56 | 0C76 | 46C7 | 01FA | 8300 | 067E | 7500 |
| 0000030060 | 9A08 | 2F32 | 2E5B | 4689 | FF06 | 0676 | 468D | 16FC |
| 0000030100 | 8D50 | FA46 | 5016 | F19A | 002E | 8B00 | 0846 | 568B |
| 0000030120 | 890A | F646 | 5689 | 0BF8 | 75D0 | 8B52 | FA46 | 0305 |
| 0000030140 | 3B00 | 7EC6 | 8B02 | 56F0 | 949A | 6D05 | 832E | 02C4 |
| 0000030160 | 4689 | 89F6 | F856 | D00B | 2A75 | CC9A | 8021 | 892E |
| 0000030200 | F246 | 5689 | C4F4 | F25E | C726 | 0C07 | 9A00 | 21C4 |
| 0000030220 | 2ECC | C28E | D88B | C726 | 0807 | 8B00 | F646 | 568B |
| 0000030240 | E9F8 | 009B | 568B | 89F8 | 0846 | 5689 | 8A0A | 0646 |
| 0000030260 | 4004 | 5EC4 | FFF6 | F646 | 8826 | C407 | F65E | 46FF |
| 0000030300 | 26F6 | 07C6 | C43A | F65E | 46FF | 26F6 | 07C6 | 8B5C |
| 0000030320 | FA46 | 0305 | 3B00 | 76C6 | 9A19 | 21CC | 2EFF | 4689 |
| 0000030340 | 89EE | F056 | 5EC4 | 26EE | 07C7 | 0022 | C02B | EB99 |
| 0000030360 | 904E | 76FF | FF06 | F876 | 76FF | 8DF6 | FA46 | 5016 |
| 0000030400 | FF9A | 00FF | 8900 | FE46 | C00B | 2A74 | CC9A | 1221 |
| 0000030420 | 892F | EE46 | 5689 | C4F0 | EE5E | C726 | 0D07 | 9A00 |
| 0000030440 | 21C4 | 2CBB | 4689 | 89F2 | F456 | 468B | C4FE | F25E |
| 0000030460 | 8926 | EB07 | 90B7 | 468B | 8BF6 | F856 | 032D | 5E00 |
| 0000030500 | CBC9 | EC83 | 8B06 | 16C4 | 4050 | 1640 | 9A50 | FFFF |
| 0000030520 | 0000 | 8358 | 04C4 | 55CB | EC8B | 76FF | 9A06 | FFFF |
| 0000030540 | 0000 | C00B | FFB8 | 75FF | 4001 | CB5D | 581E | 4590 |
| 0000030560 | 8B55 | 1EEC | D88E | EC81 | 0008 | 5657 | 468D | 16F8 |
| 0000030600 | FF50 | 1076 | 76FF | FF0E | 0C76 | 76FF | FFDA | 0876 |
| 0000030620 | 76FF | 9A06 | 48F0 | 2FE2 | C483 | 8910 | FC46 | 7E83 |
| 0000030640 | 00FC | 0375 | 06E9 | 8B00 | FC46 | 5FE9 | 9A00 | FFFF |
| 0000030660 | 0000 | 76FF | FFFA | F876 | FF9A | 00FF | 6A00 | 9A01 |
| 0000030700 | FFFF | 0000 | 681E | 02C3 | 681E | 02B8 | 016A | 016A |
| 0000030720 | FF9A | 00FF | 8900 | FC46 | 7E83 | 00FC | 0375 | 0EE9 |
| 0000030740 | FF00 | FC76 | FF9A | 00FF | B800 | 0000 | 1DE9 | 9A00 |
| 0000030760 | 7830 | 059C | 4689 | 83FC | FC7E | 7500 | E903 | 0006 |
| 0000031000 | 468B | E9FC | 0006 | 00B8 | E900 | 0000 | 5F5E | ED83 |
| 0000031020 | 8B02 | 1FE5 | 4D5D | 1ECB | 9058 | 5545 | EC8B | 8E1E |
| 0000031040 | 81D8 | 04EC | 5700 | 6A56 | 9A00 | FFFF | 0000 | 4689 |
| 0000031060 | 83FC | FC7E | 7500 | E903 | 0008 | 76FF | 9AFC | 2FD5 |
| 0000031100 | 0000 | FF9A | 00FF | FF00 | 0C76 | 76FF | FF0A | 0876 |
| 0000031120 | 76FF | 9A06 | 4A67 | 2F86 | C483 | 5E08 | 835F | 02ED |
| 0000031140 | E58B | 5D1F | CB4D | 581E | 4590 | 8B55 | 1EEC | D88E |
| 0000031160 | EC81 | 010C | 5657 | B81E | 0761 | D88E | 46C7 | 00F6 |
| 0000031200 | 8B00 | 0A46 | 4689 | 8BFC | 0A46 | D0E9 | 8D02 | F646 |
| 0000031220 | 5016 | 286A | 7C9A | 9D3A | 8330 | 06C4 | 8689 | FEF4 |
| 0000031240 | 47E9 | 8D03 | F646 | 5016 | 296A | 7C9A | B33A | 8330 |
| 0000031260 | 06C4 | 8689 | FEF4 | 31E9 | 8D03 | F646 | 5016 | 2B6A |
| 0000031300 | 7C9A | C93A | 8330 | 06C4 | 8689 | FEF4 | 1BE9 | 8D03 |
| 0000031320 | F646 | 5016 | 2C6A | 7C9A | DD3A | 8330 | 06C4 | 8689 |
| 0000031340 | FEF4 | 05E9 | 8D03 | F646 | 5016 | 789A | F33E | 8330 |
| 0000031360 | 04C4 | 8689 | FEF4 | F1E9 | 8D02 | F646 | 5016 | 016A |
| 0000031400 | 2C9A | 0944 | 8331 | 06C4 | 8689 | FEF4 | DBE9 | 8D02 |
| 0000031420 | F646 | 5016 | 006A | 2C9A | 1844 | 8331 | 06C4 | 8689 |
| 0000031440 | FEF4 | C5E9 | 9A02 | 3978 | 3134 | 8689 | FEF4 | 46C7 |
| 0000031460 | 00F6 | E900 | 02B4 | 016A | B09A | 002F | 6A00 | 6A00 |
| 0000031500 | 9A00 | 5651 | 3152 | C483 | 8904 | F486 | 8BFE | F486 |
| 0000031520 | E9FE | 0038 | 4FE9 | 1E00 | C868 | 1E02 | 0468 | 9A03 |
| 0000031540 | 4BDF | 3165 | C483 | E908 | 003C | 681E | 030E | 681E |
| 0000031560 | 0326 | DF9A | 464B | 8330 | 08C4 | 29E9 | FF00 | F4B6 |
| 0000031600 | 9AFE | 302E | 0000 | 1DE9 | E900 | 001A | C00B | 0375 |
| 0000031620 | C1E9 | 2DFF | 0067 | 0375 | CFE9 | 2DFF | 0030 | 0375 |

THU MAR 14 17:35:10 1991 FRAME.EXE PAGE 15, LINE 827

| | | | | | | | | |
|---|---|---|---|---|---|---|---|---|
| 0000031640 | B4E9 | E9FF | FFD7 | 46C7 | 00F6 | E900 | 023C | 419A |
| 0000031660 | C557 | 8931 | F486 | 83FE | F4BE | 00FE | 0375 | 09E9 |
| 0000031700 | FF00 | F4B6 | 9AFE | 31E5 | 0000 | 46C7 | 00F6 | E900 |
| 0000031720 | 0218 | 9F9A | FB57 | 8931 | F486 | 83FE | F4BE | 00FE |
| 0000031740 | 0375 | 14E9 | 8100 | F4BE | 98FE | 7500 | E903 | 0009 |
| 0000031760 | B6FF | FEF4 | 729A | 0031 | C700 | F646 | 0000 | E9E9 |
| 0000032000 | 6A01 | 9A01 | 320C | 0000 | 5E9A | 165A | 8932 | F486 |
| 0000032020 | C7FE | F646 | 0001 | D1E9 | 6A01 | 9A01 | 33F4 | 0000 |
| 0000032040 | 76FF | 9A0A | 5AD2 | 322F | C483 | 8902 | F486 | C7FE |
| 0000032060 | F646 | 0001 | B3E9 | 8D01 | F646 | 5016 | 979A | 4346 |
| 0000032100 | 8332 | 04C4 | 8689 | FEF4 | 9FE9 | 8D01 | F646 | 5016 |
| 0000032120 | A09A | CA47 | 8332 | 04C4 | 8689 | FEF4 | 8BE9 | C701 |
| 0000032140 | F646 | 0000 | 83E9 | FF01 | 1276 | 76FF | 6A10 | 6A29 |
| 0000032160 | 6A00 | 6A00 | 6A00 | 9A00 | FFFF | 0000 | 6BE9 | FF01 |
| 0000032200 | 1276 | 76FF | 6810 | 04B2 | 0068 | 8D01 | F686 | 16FE |
| 0000032220 | 9A50 | FFFF | 0000 | 8689 | FEF4 | 868D | FEF6 | 4689 |
| 0000032240 | 8CF8 | FA56 | 5EC4 | 26F8 | 3F80 | 7420 | E903 | 0006 |
| 0000032260 | 46FF | E9F8 | FFEE | 5EC4 | 26F8 | 3F80 | 7400 | E903 |
| 0000032300 | 000B | C02B | 4689 | 89FA | F846 | 6FE9 | 1E00 | 3068 |
| 0000032320 | 8D03 | F686 | 16FE | 9A50 | 0B2E | 32E2 | C483 | 3D08 |
| 0000032340 | 0000 | 0374 | 1FE9 | 6A00 | 6A00 | 6A06 | 6A00 | 9A00 |
| 0000032360 | 7512 | 3303 | C483 | 8908 | F486 | C7FE | F646 | 0000 |
| 0000032400 | E7E9 | E900 | 0036 | 681E | 033F | 868D | FEF6 | 5016 |
| 0000032420 | 2E9A | 1B0B | 8333 | 08C4 | 003D | 7400 | E903 | 001C |
| 0000032440 | 006A | 076A | 006A | 006A | 129A | 3975 | 8333 | 08C4 |
| 0000032460 | 8689 | FEF4 | 46C7 | 00F6 | E900 | 00AE | 006A | 006A |
| 0000032500 | 76FF | FFFA | F876 | 129A | E875 | 8333 | 08C4 | 8689 |
| 0000032520 | FEF4 | 46C7 | 00F6 | E900 | 0090 | 8DE9 | 3D00 | 0014 |
| 0000032540 | 0375 | 9CE9 | 76FE | E903 | 0023 | 092D | 3D00 | 0007 |
| 0000032560 | 0376 | 75E9 | D100 | 93E0 | FF2E | 6DA7 | 1533 | 7D31 |
| 0000032600 | 9330 | A930 | BF30 | D530 | E930 | FF30 | 3D30 | 0028 |
| 0000032620 | 0375 | A1E9 | 76FD | E903 | 002F | 152D | 3D00 | 000D |
| 0000032640 | 0376 | 45E9 | D100 | 93E0 | FF2E | 9DA7 | 0933 | 0932 |
| 0000032660 | 0932 | 0932 | DA32 | DA33 | DA33 | DA33 | DA33 | 2733 |
| 0000032700 | 3B32 | 4F32 | 4F32 | 4F32 | 2D32 | 0029 | 0375 | DDE9 |
| 0000032720 | 48FD | 0375 | FBE9 | 2DFD | 0030 | 0375 | 88E9 | 2DFE |
| 0000032740 | 045A | 0375 | 98E9 | E9FE | 0000 | 7E83 | 00F6 | 0375 |
| 0000032760 | 0EE9 | 6A00 | 9A01 | 72DB | 3087 | C483 | 8902 | F486 |
| 0000033000 | 6AFE | 9A00 | 3129 | 0000 | 00B8 | E900 | 0000 | 5E1F |
| 0000033020 | 835F | 02ED | E58B | 5D1F | CA4D | 000E | 581E | 4590 |
| 0000033040 | 8B55 | 1EEC | D88E | EC81 | 0006 | 5657 | B81E | 3068 |
| 0000033060 | D88E | 468B | 890C | FA46 | 468B | E9FA | 002B | 789A |
| 0000033100 | A139 | 8931 | FC46 | 2BE9 | FF00 | 1276 | 76FF | FF10 |
| 0000033120 | 0E76 | 76FF | FF0C | 0A76 | 76FF | FF08 | 0676 | FF9A |
| 0000033140 | 00FF | E900 | 001B | 0BE9 | 2D00 | 0005 | 0375 | CDE9 |
| 0000033160 | E9FF | FFD5 | 006A | F49A | 0031 | B800 | 0000 | 00E9 |
| 0000033200 | 1F00 | 5F5E | ED83 | 8B02 | 1FE5 | 4D5D | 0ECA | 1E00 |
| 0000033220 | 9058 | 5545 | EC8B | 8E1E | 81D8 | 1AEC | 5701 | 1E56 |
| 0000033240 | 1EB8 | 8E34 | 8BD8 | 0E46 | 2EE9 | FF01 | 1276 | 76FF |
| 0000033260 | FF10 | 0E76 | 76FF | FF0C | 0A76 | 76FF | FF08 | 0676 |
| 0000033300 | 569A | D930 | 8934 | EC46 | 00B8 | BA00 | 0000 | 60E9 |
| 0000033320 | FF01 | 1276 | 76FF | FF10 | 0E76 | 76FF | FF0C | 0A76 |
| 0000033340 | 76FF | FF08 | 0676 | 0C9A | 2934 | 8935 | EC46 | 00B8 |
| 0000033360 | BA00 | 0000 | 3AE9 | F601 | 0A46 | 7502 | E903 | 004A |
| 0000033400 | 7E83 | 0808 | 0375 | 09E9 | 8300 | 087E | 741E | E903 |
| 0000033420 | 0038 | 76FF | FF12 | 1076 | B268 | 6804 | 0100 | 868D |
| 0000033440 | FEEC | 5016 | 829A | 0032 | 8900 | EC46 | 006A | 006A |
| 0000033460 | 868D | FEEC | 5016 | 129A | 4875 | 8335 | 08C4 | 4689 |
| 0000033500 | B8EC | 0000 | 00BA | E900 | 00E7 | C7E9 | 1E00 | 4F68 |

THU MAR 14 17:35:10 1991 FRAME.EXE PAGE 16, LINE 886

| | | | | | | | | |
|---|---|---|---|---|---|---|---|---|
| 0000033520 | 1E03 | 6868 | 9A03 | 4BDF | 355F | C483 | B808 | 0000 |
| 0000033540 | 00BA | E900 | 00CB | 76FF | FF08 | 0676 | A59A | 314A |
| 0000033560 | 8334 | 04C4 | 9DE9 | FF00 | 1276 | 76FF | 6A10 | 6A00 |
| 0000033600 | 6A00 | 6A00 | 9A00 | FFFF | 0000 | 8689 | FEE8 | 9689 |
| 0000033620 | FEEA | 76FF | FF12 | 1076 | 468D | 16EE | 9A50 | FFFF |
| 0000033640 | 0000 | B6FF | FEEA | B6FF | FEE8 | 468D | 16EE | FF50 |
| 0000033660 | 7636 | FF03 | 7436 | 9A03 | FFFF | 0000 | 8689 | FEE6 |
| 0000033700 | B6FF | FEEA | B6FF | FEE8 | FF9A | 00FF | B800 | 0000 |
| 0000033720 | 00BA | E900 | 005B | 3BE9 | 3D00 | 0022 | 0375 | 6CE9 |
| 0000033740 | 76FF | E903 | 0013 | 072D | 7500 | E903 | FF78 | 192D |
| 0000033760 | 75G0 | E903 | FEB5 | 1BE9 | 2D00 | 0023 | 0375 | 76E9 |
| 0000034000 | 2DFF | 000D | 0375 | C8E9 | 2DFE | 004A | 0375 | E6E9 |
| 0000034020 | E9FE | 0000 | 76FF | FF12 | 1076 | 76FF | FF0E | 0C76 |
| 0000034040 | 76FF | FF0A | 0876 | 76FF | 9A06 | 344F | 0000 | 00E9 |
| 0000034060 | 1F00 | 5F5E | ED83 | 8B02 | 1FE5 | 4D5D | 0ECA | 1E00 |
| 0000034100 | 9058 | 5545 | EC8B | 8E1E | 81D8 | 2AEC | 5700 | 1E56 |
| 0000034120 | 7868 | 9A03 | FFFF | 0000 | C483 | 8904 | FA46 | 5689 |
| 0000034140 | 8DFC | F646 | 5016 | 468D | 16D6 | 6850 | 3664 | FF68 |
| 0000034160 | 9AFF | 2F5C | 36B9 | C483 | 890C | F446 | 7E83 | 00F4 |
| 0000034200 | 0375 | 06E9 | B800 | 0000 | 8AE9 | FF00 | D876 | 76FF |
| 0000034220 | 8DD6 | DA46 | 5016 | 006A | 006A | 006A | 006A | FF9A |
| 0000034240 | 00FF | 3D00 | 0000 | 0375 | 13E9 | FF00 | D876 | 76FF |
| 0000034260 | 8DD6 | DA46 | 5016 | FF9A | 00FF | E900 | FFCD | 681E |
| 0000034300 | 037B | 681E | 03A2 | 1B9A | C94C | 8336 | 08C4 | 003D |
| 0000034320 | 7500 | E903 | 0015 | 9F9A | FA57 | 8936 | F446 | 7E81 |
| 0000034340 | 98F4 | 7500 | E903 | 0003 | 10E9 | FF00 | F876 | 76FF |
| 0000034360 | 6AF6 | 9A00 | FFFF | 0000 | 90E9 | FFFF | F876 | 76FF |
| 0000034400 | FFF6 | D876 | 76FF | 9AD6 | 3007 | 34B3 | C483 | B808 |
| 0000034420 | 0000 | 00E9 | 5E00 | 835F | 02ED | E58B | 5D1F | CB4D |
| 0000034440 | 581E | 4590 | 8B55 | 1EEC | D88E | EC81 | 0108 | 5657 |
| 0000034460 | 468B | 0B08 | 0646 | 0375 | 0CE9 | C400 | 065E | 8026 |
| 0000034500 | 003F | 0374 | 06E9 | B800 | 0099 | 30E9 | 1E02 | AE68 |
| 0000034520 | FF03 | 0876 | 76FF | 9A06 | 0BFE | 376C | C483 | 8908 |
| 0000034540 | FC86 | 83FE | FCBE | 00FE | 0377 | 30E9 | 8B00 | 0646 |
| 0000034560 | 568B | 0308 | FC86 | 52FE | 9A50 | 09AA | 3788 | C483 |
| 0000034600 | 4004 | 8B50 | 0646 | 568B | 0308 | FC86 | 52FE | FF50 |
| 0000034620 | 0876 | 76FF | 9A06 | 0C5A | 379A | C483 | 1E0A | B268 |
| 0000034640 | FF03 | 0876 | 76FF | 9A06 | 0BA2 | 37D6 | C483 | 8908 |
| 0000034660 | FC86 | 83FE | FCBE | 00FE | 0374 | 06E9 | B800 | 0099 |
| 0000034700 | BAE9 | C401 | 065E | B68B | FEFC | 8026 | 0038 | 0375 |
| 0000034720 | 3BE9 | 1E00 | B668 | 8B03 | 0646 | 568B | 0308 | FC86 |
| 0000034740 | 52FE | 9A50 | 0BFE | 380D | C483 | 8908 | FA86 | C4FE |
| 0000034760 | 065E | 9E03 | FEFA | B68B | FEFC | 8026 | 0038 | 0374 |
| 0000035000 | 0BE9 | C400 | 065E | B68B | FEFC | C626 | 0000 | 868D |
| 0000035020 | FEFE | 5016 | 76FF | FF0C | 0A76 | E79A | 4477 | 8338 |
| 0000035040 | 08C4 | 5EC4 | 260A | 478A | 2A03 | 3DE4 | 0028 | 0375 |
| 0000035060 | 5BE9 | C400 | 0A5E | 8326 | 013F | 0374 | 0AE9 | 2600 |
| 0000035100 | 7F83 | 0002 | 0375 | 45E9 | 6A00 | FF3A | 0876 | 76FF |
| 0000035120 | 9A06 | 0800 | 385B | C483 | 0B06 | 74D0 | E903 | 002E |
| 0000035140 | 5C6A | 76FF | FF08 | 0676 | 009A | 720B | 8338 | 06C4 |
| 0000035160 | D00B | 0374 | 17E9 | 6A00 | FF2F | 0876 | 76FF | 9A06 |
| 0000035200 | 0B00 | 3899 | C483 | 0B06 | 75D0 | E903 | 0006 | 00B8 |
| 0000035220 | E900 | 00E9 | 5EC4 | 260A | 478A | 2A03 | E9E4 | 00BF |
| 0000035240 | 76FF | FF08 | 0676 | AA9A | AF09 | 8338 | 04C4 | 5040 |
| 0000035260 | 76FF | FF08 | 0676 | 868D | FEFE | 5016 | AA9A | C009 |
| 0000035300 | 8338 | 04C4 | 4603 | 8B06 | 0856 | 5240 | 9A50 | 0C5A |
| 0000035320 | 38CE | C483 | 8D0A | FE86 | 16FE | 9A50 | 09AA | 38E3 |
| 0000035340 | C483 | 5004 | 868D | FEFE | 5016 | 76FF | FF08 | 0676 |
| 0000035360 | 249A | F10D | 8338 | 0AC4 | 868D | FEFE | 5016 | AA9A |

THU MAR 14 17:35:10 1991 FRAME.EXE PAGE 17, LINE 945

| | | | | | | | | |
|---|---|---|---|---|---|---|---|---|
| 0000035400 | 5C09 | 8336 | 04C4 | 8689 | FEF8 | 5EC4 | 8B06 | F8B6 |
| 0000035420 | 26FE | 00C6 | E95C | 005F | 9AB8 | E900 | 005F | 5EC4 |
| 0000035440 | 260A | 3F83 | 7406 | E903 | 0013 | 8326 | 027F | 7400 |
| 0000035460 | E903 | 0009 | 9BB8 | E900 | 0043 | 1CE9 | C400 | 0A5E |
| 0000035500 | 8326 | 073F | 0374 | 10E9 | 2600 | 7F83 | 0002 | 0374 |
| 0000035520 | 06E9 | B800 | 009C | 24E9 | E900 | 001B | 18E9 | 2D00 |
| 0000035540 | 0029 | 0375 | 39E9 | 48FF | 037D | B1E9 | 48FF | 7F48 |
| 0000035560 | E903 | FFA4 | A7E9 | B8FF | 0000 | 00E9 | 5E00 | 835F |
| 0000035600 | 02ED | E58B | 5D1F | CB4D | 581E | 4590 | 8B55 | 1EEC |
| 0000035620 | D88E | EC81 | 000A | 5657 | 468D | 16F8 | 9A50 | 52D6 |
| 0000035640 | 3A2C | C483 | 8904 | FC46 | 7E83 | 00FC | 0375 | 06E9 |
| 0000035660 | 8B00 | FC46 | CAE9 | 8A00 | FB46 | E42A | 283D | 7D00 |
| 0000035700 | E903 | 0015 | 468A | 2AFB | 3DE4 | 002D | 037C | 08E9 |
| 0000035720 | C700 | F646 | 0001 | 05E9 | C700 | F646 | 0000 | 7E83 |
| 0000035740 | 00F6 | 0374 | 48E9 | 8300 | F87E | 7402 | E903 | 0009 |
| 0000035760 | 7E83 | 00FA | 0375 | 36E9 | 8300 | F87E | 7401 | E903 |
| 0000036000 | 0009 | 7E83 | 00FA | 0375 | 24E9 | 8300 | F87E | 7407 |
| 0000036020 | E903 | 0009 | 7E83 | 00FA | 0375 | 12E9 | 8300 | F87E |
| 0000036040 | 7406 | E903 | 0021 | 7E83 | 00FA | 0374 | 18E9 | FF00 |
| 0000036060 | FA76 | 76FF | 6AF8 | 6A00 | 9A00 | 7512 | 3A55 | C483 |
| 0000036100 | 8908 | FC46 | 34E9 | 8300 | F87E | 7405 | E903 | 002B |
| 0000036120 | 7E83 | 00FA | 0374 | 22E9 | 6A00 | 6A00 | 8D00 | F846 |
| 0000036140 | 5016 | E79A | 6377 | 833A | 08C4 | 76FF | FFFA | F876 |
| 0000036160 | 059A | 4A59 | 8337 | 04C4 | 4689 | 8BFC | FC46 | 00E9 |
| 0000036200 | 5E00 | 835F | 02ED | E58B | 5D1F | CB4D | 581E | 4590 |
| 0000036220 | 8B55 | 1EEC | D88E | EC81 | 01D8 | 5657 | 5EC4 | 2608 |
| 0000036240 | 07C7 | 0000 | 86C7 | FE28 | 03E8 | 681E | 03BA | 868D |
| 0000036260 | FE2A | 5016 | 4A9A | B909 | 833A | 08C4 | 681E | 03C1 |
| 0000036300 | 868D | FE2A | 5016 | 049A | CB09 | 833A | 08C4 | 681E |
| 0000036320 | 03C3 | 868D | FE8E | 5016 | 4A9A | E309 | 833A | 08C4 |
| 0000036340 | 468B | E906 | 00A2 | 681E | 03C8 | 868D | FE2A | 5016 |
| 0000036360 | 049A | F509 | 833A | 08C4 | 681E | 03CF | 868D | FE8E |
| 0000036400 | 5016 | 049A | 9009 | 8339 | 08C4 | 99E9 | 1E00 | D668 |
| 0000036420 | 8D03 | 2A86 | 16FE | 9A50 | 0904 | 3B1C | C483 | 1E08 |
| 0000036440 | DB68 | 8D03 | 8E86 | 16FE | 9A50 | 0904 | 3B31 | C483 |
| 0000036460 | E908 | 0072 | 681E | 03E0 | 868D | FE2A | 5016 | 049A |
| 0000036500 | 4309 | 833B | 08C4 | 681E | 03EA | 868D | FE8E | 5016 |
| 0000036520 | 049A | 5809 | 833B | 08C4 | 4BE9 | 1E00 | F468 | 8D03 |
| 0000036540 | 2A86 | 16FE | 9A50 | 0904 | 3B6A | C483 | 1E08 | 0168 |
| 0000036560 | 8D04 | 8E86 | 16FE | 9A50 | 0904 | 3BA3 | C483 | E908 |
| 0000036600 | 0024 | 21E9 | E900 | 001E | 282D | 7500 | E903 | FF56 |
| 0000036620 | 7548 | E903 | FF77 | 4848 | 0375 | 97E9 | 48FF | 0375 |
| 0000036640 | B8E9 | E9FF | FFDC | 681E | 040E | 868D | FE8E | 5016 |
| 0000036660 | 049A | B509 | 833B | 08C4 | 681E | 0416 | 868D | FEF2 |
| 0000036700 | 5016 | 4A9A | C309 | 833B | 08C4 | 868D | FE28 | 5016 |
| 0000036720 | F59A | E94E | 833B | 04C4 | 4689 | 83F8 | F87E | 7500 |
| 0000036740 | E903 | 0081 | 016A | 389A | 003C | 8D00 | FA46 | 5016 |
| 0000036760 | 868D | FEF2 | 5016 | 109A | A737 | 833A | 08C4 | 4689 |
| 0000037000 | 83F6 | F67E | 7500 | E903 | 0018 | 7E81 | 99F6 | 7500 |
| 0000037020 | E903 | 0008 | 76FF | 9AF6 | 3C40 | 0000 | 468B | E9F6 |
| 0000037040 | 0049 | 868D | F[illegible]2 | 5016 | 76FF | 6A06 | 6A00 | 8D00 |
| 0000037060 | F246 | 5016 | FF9A | 00FF | 8900 | F646 | 7E83 | 00F6 |
| 0000037100 | 0375 | 18E9 | 6A00 | 9A00 | 3467 | 0000 | 76FF | 9AF6 |
| 0000037120 | 31B6 | 0000 | 468B | E9F6 | 0011 | 08E9 | C400 | 085E |
| 0000037140 | C726 | 0107 | B800 | 0000 | 00E9 | 5E00 | 835F | 02ED |
| 0000037160 | E58B | 5D1F | CB4D | 581E | 4590 | 8B55 | 1EEC | D88E |
| 0000037200 | EC81 | 0114 | 5657 | 46C7 | 00FC | C400 | 165E | C726 |
| 0000037220 | 0007 | 6A00 | 6A00 | 8D00 | 0646 | 5016 | 006A | 006A |
| 0000037240 | 026A | 006A | FF9A | 00FF | 8900 | FA46 | 7E83 | 00FA |

THU MAR 14 17:35:10 1991 FRAME.EXE PAGE 18, LINE 1004

| | | | | | | | | |
|---|---|---|---|---|---|---|---|---|
| 0000037260 | 0375 | 0EE9 | FF00 | FA76 | 089A | 003C | 8B00 | FA46 |
| 0000037300 | BAE9 | FF01 | 1476 | 76FF | FF12 | 1076 | 76FF | 9A0E |
| 0000037320 | 0980 | 3D48 | C483 | 3D08 | 0000 | 0374 | 37E9 | 8A00 |
| 0000037340 | 0D46 | E42A | 783D | 7400 | E903 | 0008 | 46C7 | 78FC |
| 0000037360 | E900 | 001F | 7E83 | 030A | 0374 | 11E9 | 8300 | 0C7E |
| 0000037400 | 7400 | E903 | 0008 | 46C7 | 16FC | E900 | 0005 | 46C7 |
| 0000037420 | 96FA | E900 | 00C1 | C02B | 4689 | 890C | 0A46 | 006A |
| 0000037440 | 006A | 76FF | FF08 | 0676 | 76FF | FF14 | 1276 | 468D |
| 0000037460 | 16A0 | 9A50 | FFFF | 0000 | 4689 | 83FA | FA7E | 7400 |
| 0000037500 | E903 | 001C | 46C7 | 16FC | FF00 | 1476 | 76FF | FF12 |
| 0000037520 | 1076 | 76FF | 9A0E | 094A | 3B0A | C483 | E908 | 0014 |
| 0000037540 | 7E81 | ABFA | 7401 | E903 | 000A | 46C7 | 00FC | C700 |
| 0000037560 | FA46 | 0000 | 7E83 | 00FA | 0374 | 5AE9 | FF00 | 0876 |
| 0000037600 | 76FF | FF06 | 1476 | 76FF | 6A12 | 6A78 | 6A00 | 8D00 |
| 0000037620 | EC86 | 16FE | 9A50 | FFFF | 0000 | 4689 | 83FA | FA7E |
| 0000037640 | 7400 | E903 | 0019 | 7E83 | 00FC | 0374 | 08E9 | C700 |
| 0000037660 | FC46 | 0078 | 05E9 | C700 | FA46 | 0066 | 18E9 | 8100 |
| 0000037700 | FA7E | 01AB | 0374 | 0EE9 | 8300 | FC7E | 7416 | E903 |
| 0000037720 | 0005 | 46C7 | 00FA | 8300 | FA7E | 7400 | E903 | 0051 |
| 0000037740 | 7E83 | 78FC | 0374 | 1FE9 | FF00 | 0876 | 76FF | FF06 |
| 0000037760 | 1476 | 76FF | 6A12 | FF78 | 0C76 | 76FF | 9A0A | FFFF |
| 0000040000 | 0000 | 4689 | E9FA | 0029 | 7E83 | 16FC | 0374 | 1BE9 |
| 0000040020 | 6A00 | 6A00 | FF00 | 0876 | 76FF | FF06 | 1476 | 76FF |
| 0000040040 | 9A12 | FFFF | 0000 | 4689 | E9FA | 0005 | 46C7 | 00FA |
| 0000040060 | FF00 | 0876 | 76FF | 6A06 | 9A00 | FFFF | 0000 | 4689 |
| 0000040100 | 83F8 | FA7E | 7500 | E903 | 000E | 76FF | 9AFA | 3E5D |
| 0000040120 | 0000 | 468B | E9FA | 0025 | 5EC4 | 2616 | 07C7 | 0001 |
| 0000040140 | 7E83 | 00F8 | 0375 | 0EE9 | FF00 | F876 | A99A | 003C |
| 0000040160 | 8B00 | F846 | 06E9 | B800 | 0000 | 00E9 | 5E00 | 835F |
| 0000040200 | 02ED | E58B | 5D1F | CB4D | 581E | 4590 | 8B55 | 1EEC |
| 0000040220 | D88E | EC81 | 0302 | 5657 | C02B | 8689 | FEF0 | 8689 |
| 0000040240 | FEEE | 5EC4 | 2606 | 07C7 | 0000 | 86C7 | FD20 | 03E8 |
| 0000040260 | 681E | 0417 | 868D | FD22 | 5016 | 4A9A | BF09 | 833E |
| 0000040300 | 08C4 | 681E | 041E | 868D | FD86 | 5016 | 4A9A | D109 |
| 0000040320 | 833E | 08C4 | 681E | 042E | 868D | FDEA | 5016 | 4A9A |
| 0000040340 | E509 | 833E | 08C4 | 868D | FEF6 | 5016 | 868D | FEF2 |
| 0000040360 | 5016 | 739A | 7353 | 833F | 08C4 | 4689 | 83F6 | F67E |
| 0000040400 | 7400 | E903 | 0140 | 868B | FEF4 | 860B | FEF2 | 0375 |
| 0000040420 | 33E9 | 8A01 | F586 | 2AFE | 3DE4 | 0028 | 037D | 17E9 |
| 0000040440 | 8A00 | F586 | 2AFE | 3DE4 | 002D | 037C | 09E9 | C700 |
| 0000040460 | FE86 | 01FC | E900 | 0006 | 86C7 | FCFE | 0000 | BE83 |
| 0000040500 | FCFE | 7500 | E903 | 0056 | 868A | FEF5 | E42A | 2A3D |
| 0000040520 | 7500 | E903 | 0048 | B6FF | FEF4 | B6FF | FEF2 | 468D |
| 0000040540 | 16FA | 9A50 | FFFF | 0000 | 4689 | 83F6 | F67E | 7400 |
| 0000040560 | E903 | 0027 | 76FF | FFFC | FA76 | 868D | FDEA | 5016 |
| 0000040600 | 4A9A | DF09 | 833F | 08C4 | 76FF | FFFC | FA76 | FF9A |
| 0000040620 | 00FF | 2B00 | 89C0 | FC46 | 4689 | E9FA | 00A8 | 868A |
| 0000040640 | FEF5 | E42A | 783D | 7500 | E903 | 0028 | BE83 | FEF2 |
| 0000040660 | 7403 | E903 | 000A | BE83 | FEF4 | 7500 | E903 | 0014 |
| 0000040700 | BE83 | FEF2 | 7404 | E903 | 007C | BE83 | FEF4 | 7400 |
| 0000040720 | E903 | 0072 | 868B | FEF2 | 968B | FEF4 | 8689 | FEEE |
| 0000040740 | 9689 | FEF0 | 206A | 868D | FEF6 | 5016 | 749A | C20B |
| 0000040760 | 833C | 06C4 | 4689 | 89FA | FC56 | 468B | 0BFC | FA46 |
| 0000041000 | 0375 | 41E9 | 8D00 | F686 | 8CFE | 3BD1 | FA46 | 0374 |
| 0000041020 | 08E9 | 3B00 | FC4E | 0375 | 03E9 | FF00 | FA46 | 76FF |
| 0000041040 | FFFC | FA76 | 868D | FD00 | 5016 | 4A9A | 3109 | 8340 |
| 0000041060 | 08C4 | 76FF | FFFC | FA76 | 868D | FDEA | 5016 | 4A9A |
| 0000041100 | 3F09 | 8340 | 08C4 | 868D | FD20 | 5016 | F59A | 664E |
| 0000041120 | 8340 | 04C4 | 4689 | 83F8 | F87E | 7500 | E903 | 01B5 |

THU MAR 14 17:35:10 1991 FRAME.EXE PAGE 19, LINE 1063

| | | | | | | | | |
|---|---|---|---|---|---|---|---|---|
| 0000041140 | 016A | A69A | 0041 | 8D00 | EA86 | 16FE | 8D50 | EA86 |
| 0000041160 | 16FD | 9A50 | 3710 | 40A2 | C483 | 8908 | F646 | 7E83 |
| 0000041200 | 00F6 | 0375 | D6E9 | 8B00 | F646 | ADE9 | FF00 | 0876 |
| 0000041220 | 76FF | 8D06 | EA86 | 16FD | 8D50 | 0086 | 16FD | FF50 |
| 0000041240 | F0B6 | FFFE | EEB6 | FFFE | ECB6 | FFFE | EAB6 | 9AFE |
| 0000041260 | 3C66 | 4184 | C483 | 8914 | F646 | 9AE9 | 6A00 | 6A00 |
| 0000041300 | 6A00 | 6A00 | 8D00 | EA86 | 16FD | 9A50 | 3E12 | 0000 |
| 0000041320 | 4689 | 83F6 | F67E | 7500 | E903 | 000B | 76FF | 9AF6 |
| 0000041340 | 4102 | 0000 | 08E9 | C400 | 065E | C726 | 0107 | E900 |
| 0000041360 | 0065 | 006A | D268 | 8D00 | EA86 | 16FD | 9A50 | FFFF |
| 0000041400 | 0000 | 4689 | 83F6 | F67E | 7500 | E903 | 000B | 76FF |
| 0000041420 | 9AF6 | 4120 | 0000 | 08E9 | C400 | 065E | C726 | 0107 |
| 0000041440 | E900 | 0033 | 46C7 | 00F6 | E900 | 002B | 76FF | 9AF6 |
| 0000041460 | 41F3 | 0000 | 20E9 | E900 | 001D | 992D | 7500 | E903 |
| 0000041500 | FFE2 | 7548 | E903 | FF45 | 7548 | E903 | FF6F | 7548 |
| 0000041520 | E903 | FF9E | D5E9 | 8BFF | F646 | BEE9 | 8D00 | EA86 |
| 0000041540 | 16FD | 6A50 | 6A00 | 6A00 | 8D00 | F28E | 16FE | 9A51 |
| 0000041560 | 41BD | 0000 | 4689 | 81F6 | F67E | 01AA | 0374 | 66E9 |
| 0000041600 | 8D00 | EA86 | 16FD | 1E50 | 2F68 | 8D04 | F68E | 16FE |
| 0000041620 | 9A51 | 0A08 | 4196 | C483 | 8D0C | F686 | 16FE | 1E50 |
| 0000041640 | 5768 | 9A04 | 4C1B | 3EAD | C483 | 3D08 | 0000 | 0375 |
| 0000041660 | 2CE9 | 6A00 | 9A01 | 41EB | 0000 | 868D | FDEA | 5016 |
| 0000041700 | 006A | 006A | 016A | 868D | FEF2 | 5016 | FF9A | 00FF |
| 0000041720 | 8900 | F646 | 5EC4 | 2606 | 07C7 | 0001 | 05E9 | C700 |
| 0000041740 | F646 | 0000 | 08E9 | C400 | 065E | C726 | 0107 | 8300 |
| 0000041760 | F67E | 7500 | E903 | 001D | 006A | D79A | 003B | FF00 |
| 0000042000 | F676 | 3E9A | 003E | C400 | 065E | C726 | 0007 | 8B00 |
| 0000042020 | F646 | 06E9 | 8800 | 0000 | 00E9 | 5E00 | 835F | 02ED |
| 0000042040 | E58B | 5D1F | CB4D | 581E | 4590 | 8B55 | 1EEC | D88E |
| 0000042060 | EC81 | 0114 | 5657 | 468D | 16FA | FF50 | 0876 | 76FF |
| 0000042100 | 9A06 | 3710 | 401D | C483 | 8908 | F046 | 7E83 | 00F0 |
| 0000042120 | 0375 | 18E9 | 8100 | F07E | 0099 | 0375 | 08E9 | FF00 |
| 0000042140 | F076 | D09A | 0040 | 8B00 | F046 | C4E9 | 8D01 | FA46 |
| 0000042160 | 5016 | 76FF | FF08 | 0676 | 109A | E937 | 8342 | 08C4 |
| 0000042200 | 4689 | 83F0 | F07E | 7500 | E903 | 0018 | 7E81 | 99F0 |
| 0000042220 | 7500 | E903 | 0008 | 76FF | 9AF0 | 42C7 | 0000 | 468B |
| 0000042240 | E9F0 | 018D | 76FF | FF0C | 0A76 | 468D | 16EC | 9A50 |
| 0000042260 | 43AF | 0000 | 4689 | 83F0 | F07E | 7500 | E903 | 0021 |
| 0000042300 | 7E81 | ABF0 | 7401 | E903 | 0009 | 00B8 | E900 | 0161 |
| 0000042320 | 0EE9 | FF00 | F076 | D69A | 0043 | 8B00 | F046 | 50E9 |
| 0000042340 | 8A01 | EF46 | E42A | 283D | 7400 | E903 | 0102 | 5C6A |
| 0000042360 | 76FF | FF08 | 0676 | 749A | FF0B | 8342 | 06C4 | 4689 |
| 0000042400 | 89F2 | F456 | 2F6A | 76FF | FF08 | 0676 | 749A | 2C0B |
| 0000042420 | 8343 | 06C4 | 4689 | 89F6 | F856 | 468B | 39F2 | F646 |
| 0000042440 | 0377 | 0CE9 | 8B00 | F646 | 568B | 89F8 | F246 | 5689 |
| 0000042460 | 6AF4 | FF3A | 0876 | 76FF | 9A06 | 0B74 | 438A | C483 |
| 0000042500 | 8906 | F646 | 5689 | 8BF8 | F246 | 4639 | 77F6 | E903 |
| 0000042520 | 000C | 468B | 8BF6 | F856 | 4689 | 89F2 | F456 | 468B |
| 0000042540 | 0BF4 | F246 | 0374 | 21E9 | 8B00 | 0646 | 568B | 8908 |
| 0000042560 | F246 | 5689 | C4F4 | F25E | 8026 | 203F | 0374 | 06E9 |
| 0000042600 | FF00 | F246 | EEE9 | E9FF | 0003 | 46FF | 1EF2 | 6268 |
| 0000042620 | FF04 | 0C76 | 76FF | 9A0A | 0904 | 439E | C483 | FF08 |
| 0000042640 | F476 | 76FF | FFF2 | 0C76 | 76FF | 9A0A | 0904 | 43F3 |
| 0000042660 | C483 | FF08 | 0C76 | 76FF | 8D0A | EC46 | 5016 | FF9A |
| 0000042700 | 00FF | 8900 | F046 | 7E83 | 00F0 | 0375 | 21E9 | 8100 |
| 0000042720 | F07E | 01AB | 0374 | 09E9 | B800 | 0000 | 52E9 | E900 |
| 0000042740 | 000E | 76FF | 9AF0 | 4253 | 0000 | 468B | E9F0 | 0041 |
| 0000042760 | 76FF | FF0C | 0A76 | 681E | 0464 | 868D | FEEC | 5016 |
| 0000043000 | 089A | 050A | 8344 | 0CC4 | 868D | FEEC | 5016 | 681E |

THU MAR 14 17:35:10 1991 FRAME.EXE PAGE 20, LINE 1122

| | | | | | | | | |
|---|---|---|---|---|---|---|---|---|
| 0000043020 | 0477 | 1B9A | 344C | 8342 | 08C4 | 003D | 7500 | E903 |
| 0000043040 | 0009 | 00B8 | E900 | 0009 | 06E9 | B800 | 009D | 00E9 |
| 0000043060 | 5E00 | 835F | 02ED | E58B | 5D1F | CB4D | 581E | 4590 |
| 0000043100 | 8B55 | 1EEC | D88E | EC81 | 0212 | 5657 | 5EC4 | 2608 |
| 0000043120 | 07C7 | 0000 | 468B | 8906 | F886 | C6FD | FA86 | 00FD |
| 0000043140 | 86C6 | FEFA | 8D00 | F086 | 16FD | 9A50 | 52D6 | 44F0 |
| 0000043160 | C483 | 8904 | F486 | 83FD | F4BE | 00FD | 0374 | 97E9 |
| 0000043200 | 8B00 | F286 | 0BFD | F086 | 75FD | E903 | 008A | 868A |
| 0000043220 | FDF3 | E42A | 283D | 7D00 | E903 | 0017 | 868A | FDF3 |
| 0000043240 | E42A | 2D3D | 7C00 | E903 | 0009 | 86C7 | FDEE | 0001 |
| 0000043260 | 06E9 | C700 | EE86 | 00FD | 8300 | EEBE | 00FD | 0375 |
| 0000043300 | 55E9 | 8A00 | F386 | 2AFD | 3DE4 | 002A | 0375 | 47E9 |
| 0000043320 | FF00 | F2B6 | FFFD | F0B6 | 8DFD | FA46 | 5016 | 549A |
| 0000043340 | 003F | 8900 | F486 | 83FD | F4BE | 00FD | 0374 | 27E9 |
| 0000043360 | FF00 | FC76 | 76FF | 8DFA | FA86 | 16FD | 9A50 | 094A |
| 0000043400 | 426B | C483 | FF08 | FC76 | 76FF | 9AFA | 3F7F | 0000 |
| 0000043420 | C02B | 4689 | 89FC | FA46 | 868D | FDF8 | 5016 | 0D9A |
| 0000043440 | 3351 | 8345 | 04C4 | 8689 | FDF6 | BE83 | FDF6 | 7500 |
| 0000043460 | E903 | 00C1 | 868D | FEFA | 5016 | 868D | FDFA | 5016 |
| 0000043500 | 169A | 5E42 | 8344 | 08C4 | 8689 | FDF4 | BE83 | FDF4 |
| 0000043520 | 7500 | E903 | 000E | 006A | 579A | 0045 | 8B00 | F486 |
| 0000043540 | E9FD | 0097 | 016A | BE9A | 0045 | 8300 | 067E | 7500 |
| 0000043560 | E903 | 0028 | 868D | FDFA | 5016 | 006A | 006A | 868D |
| 0000043600 | FEFA | 5016 | 006A | 006A | 016A | 868D | FDF0 | 5016 |
| 0000043620 | FF9A | 00FF | 8900 | F486 | E9FD | 0025 | 868D | FDFA |
| 0000043640 | 5016 | 006A | 006A | 868D | FEFA | 5016 | 006A | 006A |
| 0000043660 | 016A | 868D | FDF0 | 5016 | FF9A | 00FF | 8900 | F486 |
| 0000043700 | 83FD | F4BE | 00FD | 0375 | 22E9 | 6A00 | 9A00 | 4053 |
| 0000043720 | 0000 | 5EC4 | 2608 | 07C7 | 0001 | B6FF | FDF4 | 8A9A |
| 0000043740 | 0042 | 8B00 | F486 | E9FD | 0011 | 08E9 | C400 | 085E |
| 0000043760 | C726 | 0107 | B800 | 0000 | 00E9 | 5E00 | 835F | 02ED |
| 0000044000 | E58B | 5D1F | CB4D | 581E | 4590 | 8B55 | 1EEC | D88E |
| 0000044020 | EC81 | 0024 | 5657 | 46C7 | 00DC | C400 | 065E | 768B |
| 0000044040 | 26DC | 3880 | 7420 | E903 | 000F | 7E83 | 1FDC | 0372 |
| 0000044060 | 06E9 | FF00 | DC46 | E2E9 | 8BFF | 0646 | 568B | 0308 |
| 0000044100 | DC46 | 5052 | 468D | 16DE | 9A50 | 094A | 4681 | C483 |
| 0000044120 | 8008 | DE7E | 7500 | E903 | 001B | 7E80 | 3ADF | 0375 |
| 0000044140 | 20E9 | 8000 | DF7E | 7520 | E903 | 0017 | 7E80 | 00DF |
| 0000044160 | 0375 | 0EE9 | 6800 | 0196 | CF9A | 0045 | B800 | 0196 |
| 0000044200 | 19E9 | 8D00 | DE46 | 5016 | 76FF | FF08 | 0676 | 4A9A |
| 0000044220 | 1109 | 8345 | 08C4 | 00B8 | E900 | 0000 | 5F5E | ED83 |
| 0000044240 | 8B02 | 1FE5 | 4D5D | 1ECB | 9058 | 5545 | EC8B | 8E1E |
| 0000044260 | 81D8 | D0EC | 5701 | C456 | 065E | C726 | 0007 | C700 |
| 0000044300 | 3086 | E8FE | 1E03 | 8268 | 8D04 | 3286 | 16FE | 9A50 |
| 0000044320 | 094A | 46D4 | C483 | 1E08 | 8E68 | 8D04 | 9686 | 16FE |
| 0000044340 | 9A50 | 094A | 46E6 | C483 | 1E08 | A568 | 8D04 | FA86 |
| 0000044360 | 16FE | 9A50 | 094A | 46F4 | C483 | 8D08 | 3086 | 16FE |
| 0000044400 | 9A50 | 4EF5 | 470E | C483 | 8904 | FC46 | 7E83 | 00FC |
| 0000044420 | 0375 | 8AE9 | 8D00 | FA86 | 16FE | 9A50 | 45F6 | 4778 |
| 0000044440 | C483 | 8904 | FA46 | 7E83 | 00FA | 0375 | 06E9 | 8B00 |
| 0000044460 | FA46 | 70E9 | 6A00 | 9A01 | 474A | 0000 | 868D | FEFA |
| 0000044500 | 5016 | 006A | 006A | FF9A | 00FF | 8900 | FA46 | 7E83 |
| 0000044520 | 00FA | 0375 | 15E9 | 6A00 | 9A00 | 4549 | 0000 | 76FF |
| 0000044540 | 9AFA | 4669 | 0000 | 468B | E9FA | 0039 | 86C6 | FEFB |
| 0000044560 | C63A | FC86 | 5CFE | 86C6 | FEFD | 6A00 | 6A00 | 8D00 |
| 0000044600 | FA86 | 16FE | 9A50 | 7512 | 463C | C483 | 8908 | FA46 |
| 0000044620 | 7E83 | 00FA | 0375 | 06E9 | 8B00 | FA46 | 06E9 | B800 |
| 0000044640 | 0000 | 00E9 | 5E00 | 835F | 02ED | E58B | 5D1F | CB4D |
| 0000044660 | 581E | 4590 | 8B55 | 1EEC | D88E | EC81 | 02D4 | 5657 |

THU MAR 14 17:35:10 1991 FRAME.EXE PAGE 21, LINE 1181

| | | | | | | | | |
|---|---|---|---|---|---|---|---|---|
| 0000044700 | 5EC4 | 2606 | 07C7 | 0000 | 86C7 | FD2C | 03E8 | 681E |
| 0000044720 | 04A6 | 868D | FD2E | 5016 | 4A9A | DD09 | 8347 | 08C4 |
| 0000044740 | 681E | 04B2 | 868D | FD92 | 5016 | 4A9A | EF09 | 8347 |
| 0000044760 | 08C4 | 681E | 04CB | 868D | FDF6 | 5016 | 4A9A | FD09 |
| 0000045000 | 8347 | 08C4 | 868D | FD2C | 5016 | F59A | 174E | 8348 |
| 0000045020 | 04C4 | 4689 | 83F8 | F87E | 7500 | E903 | 00D0 | 868D |
| 0000045040 | FDF6 | 5016 | F69A | 4145 | 8348 | 04C4 | 4689 | 83F6 |
| 0000045060 | F67E | 7500 | E903 | 0006 | 468B | E9F6 | 00B6 | 868D |
| 0000045100 | FDF6 | 5016 | 681E | 04CC | 868D | FEF6 | 5016 | 089A |
| 0000045120 | 530A | 8348 | 0CC4 | 868D | FEF6 | 5016 | 681E | 04F1 |
| 0000045140 | 1B9A | BE4C | 8348 | 08C4 | 003D | 7400 | E903 | 0006 |
| 0000045160 | 00B8 | E900 | 007E | 016A | 879A | 0048 | 8D00 | F686 |
| 0000045200 | 16FD | 9A50 | FFFF | 0000 | 4689 | 83F6 | F67E | 7500 |
| 0000045220 | E903 | 0015 | 006A | 289A | 0047 | FF00 | F676 | 529A |
| 0000045240 | 0047 | 8B00 | F646 | 4BE9 | 1E00 | FC68 | 8D04 | FA46 |
| 0000045260 | 5016 | A09A | 0042 | 8900 | F646 | 7E83 | 00F6 | 0375 |
| 0000045300 | 16E9 | 6A00 | 6A00 | 6A01 | 6A00 | 9A00 | 7512 | 48D6 |
| 0000045320 | C483 | 8908 | F646 | 15E9 | FF00 | FC76 | 76FF | 6AFA |
| 0000045340 | 6A00 | 9A00 | 7512 | 46C2 | C483 | 8908 | F646 | 00B8 |
| 0000045360 | E900 | 0000 | 5F5E | ED83 | 8B02 | 1FE5 | 4D5D | 00CB |
| 0000045400 | 581E | 4590 | 8B55 | 1EEC | D88E | EC81 | 0000 | 5657 |
| 0000045420 | 006A | FF9A | 00FF | C400 | 0A5E | 8926 | 2607 | 5789 |
| 0000045440 | C402 | 0A5E | FF26 | 0277 | FF26 | 6A37 | 9A00 | FFFF |
| 0000045460 | 0000 | 5EC4 | 260E | 0789 | 8926 | 0257 | 5EC4 | 260A |
| 0000045500 | 77FF | 2602 | 37FF | 681E | 04FE | 76FF | FF08 | 0676 |
| 0000045520 | 006A | 006A | 006A | FF9A | 00FF | 6A00 | 6A00 | 6A01 |
| 0000045540 | 6A00 | 6A01 | 6A00 | 6A00 | 6A00 | 6A01 | 6A00 | 9A00 |
| 0000045560 | FFFF | 0000 | DAA3 | 8911 | DC16 | FF11 | DC36 | FF11 |
| 0000045600 | DA36 | 6A11 | 6A47 | 6A00 | 6A01 | 6A00 | 9A03 | FFFF |
| 0000045620 | 0000 | 5052 | 006A | 006A | C99A | 0049 | FF00 | DC36 |
| 0000045640 | FF11 | DA36 | 1E11 | 0968 | 9A05 | FFFF | 0000 | 36FF |
| 0000045660 | 11DC | 36FF | 11DA | 006A | 026A | FF9A | 00FF | A300 |
| 0000045700 | 11D6 | 1689 | 11D8 | 36FF | 11DC | 36FF | 11DA | 426A |
| 0000045720 | 006A | 046A | 006A | 006A | 689A | 0032 | FF00 | DC36 |
| 0000045740 | FF11 | DA36 | 6811 | 8008 | F09A | 0049 | A300 | 11D2 |
| 0000045760 | 1689 | 11D4 | 36FF | 11D4 | 36FF | 11D2 | B368 | 9A04 |
| 0000046000 | 4A07 | 0000 | 14A3 | 8905 | 1616 | FF05 | D436 | FF11 |
| 0000046020 | D236 | 6811 | 04B2 | 1E9A | 004A | A300 | 0518 | 1689 |
| 0000046040 | 051A | 36FF | 11D4 | 36FF | 11D2 | B468 | 9A04 | FFFF |
| 0000046060 | 0000 | 1CA3 | 8905 | 1E16 | FF05 | D436 | FF11 | D236 |
| 0000046100 | 6811 | 04B2 | 4368 | 6A01 | 6800 | 00FF | 006A | 006A |
| 0000046120 | FF9A | 00FF | A100 | 11DA | 168B | 11DC | 5EC4 | 2612 |
| 0000046140 | 0789 | 8926 | 0257 | 00B8 | E900 | 0000 | 5F5E | ED83 |
| 0000046160 | 8B02 | 1FE5 | 4D5D | 1ECB | 9058 | 5545 | EC8B | 8E1E |
| 0000046200 | 81D8 | 00EC | 5700 | FF56 | DC36 | FF11 | DA36 | 9A11 |
| 0000046220 | FFFF | 0000 | 76FF | FF0C | 0A76 | FF9A | 00FF | FF00 |
| 0000046240 | 0876 | 76FF | 9A06 | FFFF | 0000 | 5F5E | ED83 | 8B02 |
| 0000046260 | 1FE5 | 4D5D | 1ECB | 9058 | 5545 | EC8B | 8E1E | 81D8 |
| 0000046300 | 1CEC | 5700 | A156 | 0516 | 060B | 0514 | 0374 | 03E9 |
| 0000046320 | E900 | 00BD | 468B | 2D06 | 002A | 4689 | 8BFC | 0846 |
| 0000046340 | 502D | 8900 | E446 | 36FF | 0516 | 36FF | 0514 | 006A |
| 0000046360 | 006A | 156A | 146A | 76FF | FFFC | E476 | 036A | 489A |
| 0000046400 | 004B | 8900 | EA46 | 36FF | 0516 | 36FF | 0514 | 468D |
| 0000046420 | 16EC | 9A50 | 358E | 0000 | 6E83 | 12F4 | 5E83 | 00F6 |
| 0000046440 | 36FF | 0516 | 36FF | 0514 | 468D | 16EC | 6A50 | 9A00 |
| 0000046460 | FFFF | 0000 | 4689 | 8BEA | 0646 | 562D | 8900 | FC46 |
| 0000046500 | 36FF | 051A | 36FF | 0518 | 006A | 006A | 006A | 006A |
| 0000046520 | 76FF | 6AFC | 6A10 | 9A01 | 4B7A | 0000 | 4689 | 8BEA |
| 0000046540 | 0646 | 352D | 8900 | E846 | 468B | 2D08 | 0032 | 4689 |

THU MAR 14 17:35:10 1991 FRAME.EXE PAGE 22, LINE 1240

| | | | | | | | | |
|---|---|---|---|---|---|---|---|---|
| 0000046560 | FFE6 | 1E36 | FF05 | 1C36 | 6A05 | 6A00 | FF00 | E876 |
| 0000046600 | 76FF | 6AE6 | 6A00 | 6A00 | 9A02 | FFFF | 0000 | 4689 |
| 0000046620 | 5EEA | 835F | 02ED | E58B | 5D1F | CB4D | 581E | 4590 |
| 0000046640 | 8B55 | 1EEC | D88E | EC81 | 000D | 5657 | 7E83 | 0106 |
| 0000046660 | C01B | D8F7 | 9A50 | 4869 | 0000 | 7E83 | 0006 | 0374 |
| 0000046700 | 12E9 | FF00 | D436 | FF11 | D236 | 6A11 | 9A00 | FFFF |
| 0000046720 | 0000 | 0FE9 | FF00 | D436 | FF11 | D236 | 6A11 | 9A01 |
| 0000046740 | FFFF | 0000 | 5F5E | ED83 | 8B02 | 1FE5 | 4D5D | 1ECB |
| 0000046760 | 9058 | 5545 | EC8B | 8E1E | 81D8 | 00EC | 5700 | 6A56 |
| 0000047000 | 6A00 | FF01 | DC36 | FF11 | DA36 | FF11 | 0C76 | 76FF |
| 0000047020 | FF0A | 0876 | 76FF | 6A06 | 6A00 | 9A20 | FFFF | 0000 |
| 0000047040 | 5F5E | ED83 | 8B02 | 1FE5 | 4D5D | 1ECB | 9058 | 5545 |
| 0000047060 | EC8B | 8E1E | 81D8 | 00EC | 5700 | 6A56 | 6A00 | FF01 |
| 0000047100 | DC36 | FF11 | DA36 | FF11 | 0C76 | 76FF | FF0A | 0876 |
| 0000047120 | 76FF | 6A06 | 6800 | 0114 | 0C9A | 004C | 3D00 | 0006 |
| 0000047140 | 0374 | 06E9 | B800 | 0001 | 03E9 | B800 | 0000 | 00E9 |
| 0000047160 | 5E00 | 835F | 02ED | E58B | 5D1F | CB4D | 581E | 4590 |
| 0000047200 | 8B55 | 1EEC | D88E | EC81 | 0000 | 5657 | 36FF | 11D8 |
| 0000047220 | 36FF | 11D6 | 9268 | 8B01 | 0646 | 01BA | 5200 | 6850 |
| 0000047240 | 2000 | 0068 | 9A20 | 4989 | 0000 | 5F5E | ED83 | 8B02 |
| 0000047260 | 1FE5 | 4D5D | 1ECB | 9058 | 5545 | EC8B | 8E1E | 81D8 |
| 0000047300 | 00EC | 5700 | FF56 | D836 | FF11 | D636 | 6811 | 0192 |
| 0000047320 | 468B | BA06 | 0001 | 5052 | 006A | 0068 | 9A20 | 4C96 |
| 0000047340 | 0000 | 5F5E | ED83 | 8B02 | 1FE5 | 4D5D | 1ECB | 9058 |
| 0000047360 | 5545 | EC8B | 8E1E | 81D8 | 00EC | 5700 | FF56 | D836 |
| 0000047400 | FF11 | D636 | 6811 | 0191 | 468B | BA06 | 0001 | 5052 |
| 0000047420 | 006A | 0068 | 9A20 | 4CCE | 0000 | 003D | 7420 | E903 |
| 0000047440 | 0006 | 01B8 | E900 | 0003 | 00B8 | E900 | 0000 | 5F5E |
| 0000047460 | ED83 | 8B02 | 1FE5 | 4D5D | 1ECB | 9058 | 5545 | EC8B |
| 0000047500 | 8E1E | 81D8 | 04EC | 5700 | 1E56 | 91B8 | 8E34 | 8BD8 |
| 0000047520 | 0E46 | 7FE9 | 8B01 | 0646 | 568B | A308 | 11DE | 1689 |
| 0000047540 | 11E0 | 76FF | FF12 | 1076 | EA68 | 6803 | 0143 | 006A |
| 0000047560 | FF68 | 6A00 | 6A00 | 9A00 | 4A41 | 0000 | 1EC4 | 11DE |
| 0000047600 | 8026 | 027F | 7500 | E903 | 001A | 76FF | FF12 | 1076 |
| 0000047620 | DEA1 | 8B11 | E016 | 0511 | 0002 | 5052 | 9A9A | 0049 |
| 0000047640 | 8900 | FC46 | 1EC4 | 11DE | 8026 | CABF | 0000 | 0375 |
| 0000047660 | 1DE9 | FF00 | 1276 | 76FF | 6810 | 03EA | DEA1 | 8B11 |
| 0000047700 | E016 | 0511 | 00CA | 5052 | E49A | 004D | 8900 | FC46 |
| 0000047720 | 1EC4 | 11DE | 8026 | 667F | 7500 | E903 | 001D | 76FF |
| 0000047740 | FF12 | 1076 | E968 | A103 | 11DE | 168B | 11E0 | 6605 |
| 0000047760 | 5200 | 9A50 | FFFF | 0000 | 4689 | B8FC | 0000 | 00BA |
| 0000050000 | E900 | 00F3 | 681E | 0520 | DEA1 | 8B11 | E016 | 0511 |
| 0000050020 | 0002 | 5052 | DF9A | 794B | 834E | 08C4 | 00B8 | BA00 |
| 0000050040 | 0000 | D2E9 | 8B00 | 0A46 | 72E9 | FF00 | 1276 | 76FF |
| 0000050060 | 6810 | 03EA | 636A | DEA1 | 8B11 | E016 | 0511 | 00CA |
| 0000050100 | 5052 | 159A | 0035 | 8900 | FC46 | 76FF | FF12 | 1076 |
| 0000050120 | 016A | 599A | 004E | B800 | 0000 | 00BA | E900 | 0097 |
| 0000050140 | 76FF | FF12 | 1076 | 006A | FF9A | 00FF | B800 | 0000 |
| 0000050160 | 00BA | E900 | 0081 | 681E | 0539 | DEA1 | 8B11 | E016 |
| 0000050200 | 0511 | 0002 | 5052 | DF9A | CB4B | 8347 | 08C4 | 00B8 |
| 0000050220 | BA00 | 0000 | 60E9 | E900 | 001A | 17E9 | 4800 | 0375 |
| 0000050240 | 88E9 | 48FF | 0375 | B7E9 | 2DFF | 03E9 | 0375 | C5E9 |
| 0000050260 | E9FF | FFE3 | 76FF | FF12 | 1076 | 76FF | FF0E | 0C76 |
| 0000050300 | 76FF | FF0A | 0876 | 76FF | 9A06 | FFFF | 0000 | 26E9 |
| 0000050320 | E900 | 001A | 202D | 7500 | E903 | FF49 | 4848 | 0375 |
| 0000050340 | 21E9 | 2DFF | 0019 | 0375 | 6AE9 | E9FE | FFC6 | 00B8 |
| 0000050360 | BA00 | 0000 | 00E9 | 1F00 | 5F5E | ED83 | 8B02 | 1FE5 |
| 0000050400 | 4D5D | 0ECA | 1E00 | 9058 | 5545 | EC8B | 8E1E | 81D8 |
| 0000050420 | 00EC | 5700 | 6A56 | 6A00 | FF01 | DC36 | FF11 | DA36 |

THU MAR 14 17:35:10 1991 FRAME.EXE PAGE 23, LINE 1299

| | | | | | | | | |
|---|---|---|---|---|---|---|---|---|
| 0000050440 | 6811 | 4E07 | FF68 | 6AFF | C400 | 065E | FF26 | FF37 |
| 0000050460 | 0876 | 76FF | 9A06 | FFFF | 0000 | 00E9 | 5E00 | 835F |
| 0000050500 | 02ED | E58B | 5D1F | CB4D | 581E | 4590 | 8B55 | 1EEC |
| 0000050520 | D88E | EC81 | 0004 | 5657 | B81E | 4D3B | D88E | 468B |
| 0000050540 | E90E | 0188 | 468B | 8B06 | 0856 | E2A3 | 8911 | E416 |
| 0000050560 | FF11 | 1276 | 76FF | 6810 | 044E | 4368 | 6A01 | 6800 |
| 0000050600 | 00FF | 006A | 006A | 919A | 004F | FF00 | 1276 | 76FF |
| 0000050620 | 6810 | 0450 | 4368 | 6A01 | 6800 | 00FF | 006A | 006A |
| 0000050640 | 689A | 004D | C400 | E21E | 2611 | 3F83 | 7500 | E903 |
| 0000050660 | 0015 | 76FF | FF12 | 1076 | 681E | 0532 | C29A | 004F |
| 0000050700 | 8900 | FC46 | 12E9 | FF00 | 1276 | 76FF | 1E10 | 5768 |
| 0000050720 | 9A05 | 4D8D | 0000 | 4689 | C4FC | E21E | 2611 | 7F80 |
| 0000050740 | 0002 | 0375 | 1DE9 | FF00 | 1276 | 76FF | 6810 | 044E |
| 0000050760 | E2A1 | 8B11 | E416 | 0511 | 0002 | 5052 | B99A | 004D |
| 0000051000 | 8900 | FC46 | 00B8 | BA00 | 0000 | 02E9 | 1E01 | 5C68 |
| 0000051020 | 1E05 | 7568 | 9A05 | 4BDF | 4F12 | C483 | B808 | 0000 |
| 0000051040 | 00BA | E900 | 00E9 | 468B | E90A | 0089 | 76FF | FF12 |
| 0000051060 | 1076 | 4E68 | 6A04 | A163 | 11E2 | 168B | 11E4 | 0205 |
| 0000051100 | 5200 | 9A50 | 5053 | 0000 | 4689 | FFFC | 1276 | 76FF |
| 0000051120 | 6810 | 0450 | 636A | E2A1 | 8B11 | E416 | 0511 | 0102 |
| 0000051140 | 5052 | 339A | 004E | 8900 | FC46 | 76FF | FF12 | 1076 |
| 0000051160 | 016A | 799A | 0050 | B800 | 0000 | 00BA | E900 | 008F |
| 0000051200 | 76FF | FF12 | 1076 | 006A | 439A | 004E | B800 | 0000 |
| 0000051220 | 00BA | E900 | 0079 | 681E | 0581 | 681E | 059A | DF9A |
| 0000051240 | 084B | 8350 | 08C4 | 00B8 | BA00 | 0000 | 60E9 | E900 |
| 0000051260 | 001A | 17E9 | 4800 | 0375 | 71E9 | 48FF | 0375 | BFE9 |
| 0000051300 | 2DFF | 044F | 0375 | CDE9 | E9FF | FFE3 | 76FF | FF12 |
| 0000051320 | 1076 | 76FF | FF0E | 0C76 | 76FF | FF0A | 0876 | 76FF |
| 0000051340 | 9A06 | 4EBA | 0000 | 26E9 | E900 | 001A | 202D | 7500 |
| 0000051360 | E903 | FF32 | 4848 | 0375 | 12E9 | 2DFF | 0019 | 0375 |
| 0000051400 | 61E9 | E9FE | FFC6 | 00B8 | BA00 | 0000 | 00E9 | 1F00 |
| 0000051420 | 5F5E | ED83 | 8B02 | 1FE5 | 4D5D | 0ECA | 1E00 | 9058 |
| 0000051440 | 5545 | EC8B | 8E1E | 81D8 | 00EC | 5700 | 6A56 | 6A00 |
| 0000051460 | FF01 | DC36 | FF11 | DA36 | 6811 | 5091 | FF68 | 6AFF |
| 0000051500 | 6800 | 044C | 76FF | FF08 | 0676 | 269A | 004F | E900 |
| 0000051520 | 0000 | 5F5E | ED83 | 8B02 | 1FE5 | 4D5D | 1ECB | 9058 |
| 0000051540 | 5545 | EC8B | 8E1E | 81D8 | 00EC | 5700 | FF56 | D436 |
| 0000051560 | FF11 | D236 | 6811 | 04B2 | 76FF | FF08 | 0676 | ED9A |
| 0000051600 | 004F | 5E00 | 835F | 02ED | E58B | 5D1F | CB4D | 581E |
| 0000051620 | 4590 | 8B55 | 1EEC | D88E | EC81 | 0004 | 5657 | 36FF |
| 0000051640 | 11D4 | 36FF | 11D2 | B368 | 6804 | 0161 | 468B | 2B0E |
| 0000051660 | 52D2 | FF50 | 0876 | 76FF | 9A06 | 51ED | 0000 | 4689 |
| 0000051700 | 83FC | FC7E | 75FE | E903 | 0009 | 7E83 | FDFC | 0374 |
| 0000051720 | 0EE9 | FF00 | FC76 | 8F9A | 0048 | 8B00 | FC46 | 29E9 |
| 0000051740 | FF00 | D436 | FF11 | D236 | 6811 | 04B3 | 6968 | 8B01 |
| 0000051760 | 0E46 | D22B | 5052 | 76FF | FF0C | 0A76 | 779A | 004F |
| 0000052000 | 8900 | FC46 | 00B8 | E900 | 0000 | 5F5E | ED83 | 8B02 |
| 0000052020 | 1FE5 | 4D5D | 1ECB | 9058 | 5545 | EC8B | 8E1E | 81D8 |
| 0000052040 | 00EC | 5700 | FF56 | D436 | FF11 | D236 | 6811 | 04B3 |
| 0000052060 | 6E68 | 6A01 | 6A00 | 6A00 | 6A00 | 9A00 | 51AA | 0000 |
| 0000052100 | 00E9 | 5E00 | 835F | 02ED | E58B | 5D1F | CB4D | 581E |
| 0000052120 | 4590 | 8B55 | 1EEC | D88E | EC81 | 0006 | 5657 | 36FF |
| 0000052140 | 11D4 | 36FF | 11D2 | B368 | 6804 | 016D | 006A | 006A |
| 0000052160 | 006A | 006A | 2C9A | 0052 | 8900 | FA46 | 5689 | 83FC |
| 0000052200 | FA7E | 74FF | E903 | 0011 | 7E83 | FFFC | 0374 | 08E9 |
| 0000052220 | 2B00 | 89C0 | FC46 | 4689 | 8BFA | FA46 | 568B | E9FC |
| 0000052240 | 0000 | 5F5E | ED83 | 8B02 | 1FE5 | 4D5D | 1ECB | 9058 |
| 0000052260 | 5545 | EC8B | 8E1E | 81D8 | 00EC | 5700 | FF56 | D436 |
| 0000052300 | FF11 | D236 | 6811 | 04B3 | 6268 | 8B01 | 0646 | D22B |

THU MAR 14 17:35:10 1991 FRAME.EXE PAGE 24, LINE 1358

| | | | | | | | | |
|---|---|---|---|---|---|---|---|---|
| 0000052320 | 5052 | 006A | 006A | 659A | 0052 | 5E00 | 835F | 02ED |
| 0000052340 | E58B | 5D1F | CB4D | 581E | 4590 | 8B55 | 1EEC | D88E |
| 0000052360 | EC81 | 0004 | 5657 | 36FF | 11D4 | 36FF | 11D2 | B368 |
| 0000052400 | 6804 | 0165 | 006A | FF6A | 006A | 006A | 399A | 0053 |
| 0000052420 | 8900 | FC46 | 7E83 | FFFC | 0374 | 12E9 | C400 | 065E |
| 0000052440 | C02B | 8926 | 0247 | 8926 | B807 | 0000 | 49E9 | FF00 |
| 0000052460 | D436 | FF11 | D236 | 6811 | 04B3 | 6A68 | 8B01 | FC46 |
| 0000052500 | D22B | 5052 | 006A | 006A | C79A | 0052 | C400 | 065E |
| 0000052520 | 8926 | 2607 | 5789 | C402 | 065E | 8B26 | 0247 | 0B26 |
| 0000052540 | 7407 | E903 | 000C | 5EC4 | 2B06 | 26C0 | 4789 | 2602 |
| 0000052560 | 0789 | 00B8 | E900 | 0000 | 5F5E | ED83 | 8B02 | 1FE5 |
| 0000052600 | 4D5D | 1ECB | 9058 | 5545 | EC8B | 8E1E | 81D8 | 04EC |
| 0000052620 | 5700 | FF56 | D436 | FF11 | D236 | 6811 | 04B3 | 6568 |
| 0000052640 | 6A01 | 6A00 | 6AFF | 6A00 | 9A00 | 53D6 | 0000 | 4689 |
| 0000052660 | 83FC | FC7E | 74FF | E903 | 0012 | 5EC4 | 2B06 | 26C0 |
| 0000052700 | 4789 | 2602 | 0789 | 00B8 | E900 | 006A | 36FF | 11D4 |
| 0000052720 | 36FF | 11D2 | B368 | 6804 | 016A | 468B | 2BFC | 52D2 |
| 0000052740 | 6A50 | 6A00 | 9A00 | 541C | 0000 | 5EC4 | 2606 | 0789 |
| 0000052760 | 8926 | 0257 | 5EC4 | 2606 | 478B | 2602 | 070B | 0374 |
| 0000053000 | 0CE9 | C400 | 065E | C02B | 8926 | 0247 | 8926 | FF07 |
| 0000053020 | D436 | FF11 | D236 | 6811 | 04B3 | 6868 | 8B01 | FC46 |
| 0000053040 | 63BA | 5200 | FF50 | 0C76 | 76FF | 9A0A | 52FD | 0000 |
| 0000053060 | 00B8 | E900 | 0000 | 5F5E | ED83 | 8B02 | 1FE5 | 4D5D |
| 0000053100 | 1ECB | 9058 | 5545 | EC8B | 8E1E | 81D8 | 04EC | 5700 |
| 0000053120 | FF56 | D436 | FF11 | D236 | 6811 | 04B3 | 6568 | 6A01 |
| 0000053140 | 6A00 | 6AFF | 6A00 | 9A00 | 5492 | 0000 | 4689 | 83FC |
| 0000053160 | FC7E | 74FF | E903 | 000D | 5EC4 | 2606 | 07C6 | B800 |
| 0000053200 | 0000 | 79E9 | FF00 | D436 | FF11 | D236 | 6811 | 04B3 |
| 0000053220 | 6868 | 8B01 | FC46 | 1FBA | 5200 | FF50 | 0876 | 76FF |
| 0000053240 | 9A06 | 539A | 0000 | 681E | 05A6 | AA9A | B109 | 8354 |
| 0000053260 | 04C4 | 003D | 7700 | E903 | 0036 | 681E | 05AA | AA9A |
| 0000053300 | CB09 | 8354 | 04C4 | D88B | 76C4 | 2606 | 008A | 5EC4 |
| 0000053320 | 2606 | 0788 | 681E | 05AE | AA9A | 2A09 | 8351 | 04C4 |
| 0000053340 | F08B | 5EC4 | 2606 | 408A | C401 | 065E | 8826 | 0147 |
| 0000053360 | 5EC4 | 2606 | 47C6 | 0002 | 00B8 | E900 | 0000 | 5F5E |
| 0000053400 | ED83 | 8B02 | 1FE5 | 4D5D | 1ECB | 9058 | 5545 | EC8B |
| 0000053420 | 8E1E | 81D8 | 2CEC | 5700 | FF56 | DC36 | FF11 | DA36 |
| 0000053440 | 8D11 | D446 | 5016 | 709A | 0055 | 8900 | F846 | 468B |
| 0000053460 | 2D06 | 000A | 463B | 7CDC | E903 | 007B | 468B | 2D08 |
| 0000053500 | 000A | 463B | 7CDA | E903 | 006D | 468B | 030A | 0646 |
| 0000053520 | 0A05 | 8B00 | D84E | 4E03 | 3BDC | 7FC1 | E903 | 0057 |
| 0000053540 | 468B | 030C | 0846 | 0A05 | 8B00 | D64E | 4E03 | 3BDA |
| 0000053560 | 7FC1 | E903 | 0041 | 006A | 016A | 468D | 16E6 | 9A50 |
| 0000053600 | FFFF | 0000 | 4689 | 8BF8 | EA46 | 462B | 2DD8 | 000A |
| 0000053620 | 4689 | C7FC | FA46 | 000A | 36FF | 11DC | 36FF | 11DA |
| 0000053640 | 006A | 006A | 76FF | FFFC | FA76 | 76FF | FFD8 | D676 |
| 0000053660 | 026A | EF9A | 004A | B800 | 0000 | 00E9 | 5E00 | 835F |
| 0000053700 | 02ED | E58B | 5D1F | CB4D | 581E | 4590 | 8B55 | 1EEC |
| 0000053720 | D88E | EC81 | 0026 | 5657 | 76FF | FF08 | 0676 | 681E |
| 0000053740 | 05B2 | 468D | 16DA | 9A50 | 0A08 | 549D | C483 | 8D0C |
| 0000053760 | DA46 | 5016 | 468D | 16F8 | 8D50 | FA46 | 5016 | 006A |
| 0000054000 | 006A | 006A | 016A | 426A | 006A | 006A | FF9A | 00FF |
| 0000054020 | 8900 | FC46 | 468B | E9FC | 001D | 76FF | 9AF8 | FFFF |
| 0000054040 | 0000 | 00B8 | E900 | 002E | ABB8 | E901 | 0028 | 05B8 |
| 0000054060 | E900 | 0022 | 1FE9 | 0B00 | 75C0 | E903 | FFDC | 4848 |
| 0000054100 | 037D | E9E9 | 48FF | 037F | DDE9 | 2DFF | 00E4 | 0375 |
| 0000054120 | CFE9 | E9FF | FFD8 | 5F5E | ED83 | 8B02 | 1FE5 | 4D5D |
| 0000054140 | 1ECB | 9058 | 5545 | EC8B | 8E1E | 81D8 | 04EC | 5700 |
| 0000054160 | 1E56 | BE68 | 9A05 | 55B8 | 5681 | C483 | 8904 | FC46 |

THU MAR 14 17:35:10 1991 FRAME.EXE PAGE 25, LINE 1417

| | | | | | | | | |
|---|---|---|---|---|---|---|---|---|
| 0000054200 | 468B | E9FC | 00A8 | 46C7 | 97FC | E900 | 00B2 | 9F9A |
| 0000054220 | 8A57 | 1E56 | C168 | 9A05 | 55B8 | 56B9 | C483 | 8904 |
| 0000054240 | FC46 | 7E83 | 00FC | 0374 | 08E9 | C700 | FC46 | 0067 |
| 0000054260 | 2EE9 | C700 | FC46 | 0000 | 006A | 006A | 681E | 05C5 |
| 0000054300 | 681E | 05C9 | 016A | CA9A | E80D | 8356 | 0EC4 | E8A3 |
| 0000054320 | 8311 | E83E | FF11 | 0374 | 06E9 | B300 | 0005 | 65E9 |
| 0000054340 | 6A00 | 6A00 | FF00 | 0876 | 76FF | 1E06 | CD68 | 1E05 |
| 0000054360 | D068 | 6A05 | 9A01 | 0DCA | 570D | C483 | A312 | 11E6 |
| 0000054400 | 3E83 | 11E6 | 74FF | E903 | 0006 | 05B8 | E900 | 0036 |
| 0000054420 | 9A68 | 6801 | 01F1 | 3C6A | 1C6A | F99A | DA54 | 8355 |
| 0000054440 | 08C4 | 4689 | E9FC | 0018 | 15E9 | E900 | 0012 | C00B |
| 0000054460 | 0375 | 51E9 | 2DFF | 01AB | 0375 | 51E9 | E9FF | FFE8 |
| 0000054500 | 468B | E9FC | 0000 | 5F5E | ED83 | 8B02 | 1FE5 | 4D5D |
| 0000054520 | 1ECB | 9058 | 5545 | EC8B | 8E1E | 81D8 | 0AEC | 5700 |
| 0000054540 | 6A56 | 8D03 | F646 | 5016 | 468D | 16FA | 9A50 | FFFF |
| 0000054560 | 0000 | 4689 | 83F8 | F87E | 7400 | E903 | 0020 | 468B |
| 0000054600 | 0BFC | FA46 | 0375 | 15E9 | FF00 | FC76 | 76FF | 6AFA |
| 0000054620 | 6A29 | 6A00 | 6A00 | 6A00 | 9A00 | FFFF | 0000 | 00B8 |
| 0000054640 | E900 | 0000 | 5F5E | ED83 | 8B02 | 1FE5 | 4D5D | 1ECB |
| 0000054660 | 9058 | 5545 | EC8B | 8E1E | 81D8 | 0AEC | 5700 | 1E56 |
| 0000054700 | D368 | 9A05 | 55B8 | 57D2 | C483 | 8904 | FC46 | 7E83 |
| 0000054720 | 00FC | 0374 | 1EE9 | 1E00 | D668 | 1E05 | 1868 | 9A06 |
| 0000054740 | 4C1B | 5668 | C483 | 3D08 | 0000 | 0374 | 06E9 | B800 |
| 0000054760 | 0098 | A8E9 | 6A00 | 9A01 | 4BA6 | 0000 | 006A | 36FF |
| 0000055000 | 11E6 | 019A | 0058 | 8900 | FC46 | 006A | 36FF | 11E8 |
| 0000055020 | 2B9A | 0058 | 8900 | FC46 | 026A | 468D | 16F6 | 8D50 |
| 0000055040 | F84E | 5116 | 3F9A | 0058 | 8900 | FC46 | 7E83 | 00FC |
| 0000055060 | 0374 | 0DE9 | 6A00 | FF00 | F676 | FF9A | 00FF | 8900 |
| 0000055100 | FC46 | 036A | 468D | 16F6 | 8D50 | F84E | 5116 | 5E9A |
| 0000055120 | 0057 | 8900 | FC46 | 7E83 | 00FC | 0374 | 0DE9 | 6A00 |
| 0000055140 | FF00 | F676 | F39A | 0057 | 8900 | FC46 | 006A | D068 |
| 0000055160 | 9A07 | FFFF | 0000 | 4689 | 1EFC | 2068 | 9A06 | 55B8 |
| 0000055200 | 57B6 | C483 | 8904 | FC46 | 7E83 | 00FC | 0374 | 06E9 |
| 0000055220 | B800 | 0067 | 06E9 | B800 | 0000 | 00E9 | 5E00 | 835F |
| 0000055240 | 02ED | E58B | 5D1F | CB4D | 581E | 4590 | 8B55 | 1EEC |
| 0000055260 | D88E | EC81 | 0004 | 5657 | 006A | 36FF | 11E6 | BD9A |
| 0000055300 | 0058 | 8900 | FC46 | 006A | 36FF | 11E8 | 559A | 0058 |
| 0000055320 | 8900 | FC46 | 006A | A068 | 9A0F | 5862 | 0000 | 4689 |
| 0000055340 | 6AFC | 6A00 | 9A00 | 5651 | 5870 | C483 | 8904 | FC46 |
| 0000055360 | 013D | 1B00 | 40C0 | 003D | 7500 | E903 | 0006 | 468B |
| 0000055400 | E9FC | 0006 | 00B8 | E900 | 0000 | 5F5E | ED83 | 8B02 |
| 0000055420 | 1FE5 | 4D5D | 1ECB | 9058 | 5545 | EC8B | 8E1E | 81D8 |
| 0000055440 | 12EC | 5700 | FF56 | 0876 | 76FF | 8D06 | F646 | 5016 |
| 0000055460 | CF9A | 0044 | 8900 | F446 | 7E83 | 00F4 | 0375 | 0EE9 |
| 0000055500 | FF00 | F476 | 309A | 005A | 8B00 | F446 | 14E9 | 6A01 |
| 0000055520 | 9A01 | 57E8 | 0000 | 468A | 2A09 | 3DE4 | 002A | 0374 |
| 0000055540 | 2EE9 | FF00 | F876 | 76FF | 9AF6 | 09AA | 596B | C483 |
| 0000055560 | 8904 | F046 | 681E | 0624 | AA9A | 8A09 | 8359 | 04C4 |
| 0000055600 | 4689 | 8BEE | F05E | 76C4 | 2BF6 | EE76 | C626 | FF40 |
| 0000055620 | FF00 | F876 | 76FF | 9AF6 | 5651 | 5A08 | C483 | 8904 |
| 0000055640 | F446 | 76FF | FFF8 | F676 | FC9A | 0044 | 2B00 | 89C0 |
| 0000055660 | F846 | 4689 | 8BF6 | F446 | 8FE9 | 6A00 | 8D03 | F246 |
| 0000055700 | 5016 | 468D | 16FA | 9A50 | 5815 | 0000 | 4689 | 83F4 |
| 0000055720 | F47E | 7400 | E903 | 0035 | 468B | 0BFC | FA46 | 0375 |
| 0000055740 | 2AE9 | 6A00 | 6A00 | FF01 | FC76 | 76FF | 9AFA | FFFF |
| 0000055760 | 0000 | 76FF | FFFC | FA76 | 0668 | FF10 | 0876 | 76FF |
| 0000056000 | 6A06 | 6A00 | 9A00 | 578A | 0000 | 10E9 | 1E00 | 2768 |
| 0000056020 | 1E06 | 5D68 | 9A06 | 4BDF | 5A1B | C483 | E908 | 003D |
| 0000056040 | 681E | 0667 | 681E | 067F | DF9A | D84B | 8358 | 08C4 |

THU MAR 14 17:35:10 1991 FRAME.EXE PAGE 26, LINE 1476

| | | | | | | | | |
|---|---|---|---|---|---|---|---|---|
| 0000056060 | 2AE9 | 8300 | F47E | 7500 | E903 | 0008 | 76FF | 9AF4 |
| 0000056100 | 51C7 | 0000 | 16E9 | E900 | 0013 | 672D | 7500 | E903 |
| 0000056120 | FFCE | 302D | 7500 | E903 | FF61 | D6E9 | 8BFF | F446 |
| 0000056140 | 00E9 | 5E00 | 835F | 02ED | E58B | 5D1F | CB4D | 581E |
| 0000056160 | 4590 | 8B55 | 1EEC | D88E | EC81 | 0000 | 5657 | 146A |
| 0000056200 | DD9A | 914C | 835A | 02C4 | 013D | 1B00 | F7C0 | A3D8 |
| 0000056220 | 068A | 3E83 | 068A | 7500 | E903 | 000D | 146A | 6C9A |
| 0000056240 | 9E4C | 835A | 02C4 | 28E9 | 6A00 | 9A14 | 4CA5 | 5ABC |
| 0000056260 | C483 | 8302 | EE3E | 1712 | 0375 | 0AE9 | 8300 | EE3E |
| 0000056300 | 1812 | 0374 | 0AE9 | 6A00 | 9A15 | 5AD2 | 595C | C483 |
| 0000056320 | B802 | 0000 | 00E9 | 5E00 | 835F | 02ED | E58B | 5D1F |
| 0000056340 | CB4D | 581E | 4590 | 8B55 | 1EEC | D88E | EC81 | 0000 |
| 0000056360 | 5657 | 36FF | 12EE | A59A | FB4C | 835A | 02C4 | 468B |
| 0000056400 | A306 | 12EE | 36FF | 12EE | 6C9A | 214C | 835B | 02C4 |
| 0000056420 | 3E83 | 068A | 7400 | E903 | 0019 | 3E83 | 12EE | 7517 |
| 0000056440 | E903 | 000A | 3E83 | 12EE | 7418 | E903 | 0005 | 5E9A |
| 0000056460 | 735A | B85A | 0000 | 00E9 | 5E00 | 835F | 02ED | E58B |
| 0000056500 | 5D1F | CB4D | 581E | 4590 | 8B55 | 1EEC | D88E | EC81 |
| 0000056520 | 0004 | 5657 | 46C7 | 00FC | 8B00 | 0A46 | 4639 | 72FC |
| 0000056540 | E903 | 0047 | 5E8B | C1FC | 02E3 | 76C4 | 260C | 3883 |
| 0000056560 | 74FF | E903 | U00A | 8326 | 0278 | 75FF | E903 | 002B |
| 0000056600 | 5E8B | C1FC | 02E3 | 76C4 | 8B0C | 0646 | 568B | 2608 |
| 0000056620 | 5039 | 7302 | E903 | 0013 | 0376 | 08E9 | 2600 | 0039 |
| 0000056640 | 0373 | 06E9 | FF00 | FC46 | AEE9 | 8BFF | 0A46 | 4639 |
| 0000056660 | 73FC | E903 | 0006 | 00B8 | E900 | 005A | 468B | 480A |
| 0000056700 | 463B | 77FC | E903 | 0032 | 468B | 2B0A | FC46 | C148 |
| 0000056720 | 02E0 | 8B50 | FC46 | E0C1 | 0302 | 0C46 | 568B | 520E |
| 0000056740 | 8B50 | FC46 | E0C1 | 0302 | 0C46 | 568B | 050E | 0004 |
| 0000056760 | 5052 | 5A9A | E90C | 835A | 0AC4 | 5E8B | C1FC | 02E3 |
| 0000057000 | 76C4 | 8B0C | 0646 | 568B | 2608 | 0089 | 8926 | 0250 |
| 0000057020 | 468B | E9FC | 0000 | 5F5E | ED83 | 8B02 | 1FE5 | 4D5D |
| 0000057040 | 1ECB | 9058 | 5545 | EC8B | 8E1E | 81D8 | 28EC | 5700 |
| 0000057060 | 8356 | EA3E | 0611 | 0374 | 0AE9 | 8300 | EC3E | 0011 |
| 0000057100 | 0375 | 14E9 | 8300 | EA3E | 0711 | 0374 | 17E9 | 8300 |
| 0000057120 | EC3E | 0011 | 0374 | 0DE9 | C700 | FA46 | 0001 | 46C7 |
| 0000057140 | 00FC | E900 | 0051 | 006A | 006A | 36FF | 11EC | 36FF |
| 0000057160 | 11EA | 468D | 16FA | 8D50 | D84E | 5116 | FF9A | 00FF |
| 0000057200 | 8900 | F846 | 7E83 | 00F8 | 0375 | 2AE9 | 8100 | F87E |
| 0000057220 | 01AB | 0374 | 12E9 | C700 | FA46 | 0001 | 46C7 | 00FC |
| 0000057240 | C700 | F846 | 0000 | 0EE9 | FF00 | F876 | 359A | 0059 |
| 0000057260 | 8B00 | F846 | 36E9 | C400 | 065E | FF26 | FF37 | FC76 |
| 0000057300 | 76FF | 1EFA | 8E68 | 9A06 | 517E | 5BE5 | C483 | 890A |
| 0000057320 | F846 | 7E83 | 00F8 | 0375 | 06E9 | 8B00 | F846 | 0CE9 |
| 0000057340 | C400 | 065E | FF26 | B807 | 0000 | 00E9 | 5E00 | 835F |
| 0000057360 | 02ED | E58B | 5D1F | CB4D | 581E | 4590 | 8B55 | 1EEC |
| 0000057400 | D88E | EC81 | 002A | 5657 | 7E83 | 780A | 037D | 11E9 |
| 0000057420 | 8300 | 0A7E | 7C7B | E903 | 0008 | 46C7 | 01D6 | E900 |
| 0000057440 | 0005 | 46C7 | 00D6 | 8300 | D67E | 7400 | E903 | 0009 |
| 0000057460 | 7E83 | 160A | 0374 | CCE9 | C400 | 0C5E | FF26 | C437 |
| 0000057500 | 0C5E | FF26 | 0277 | 5EC4 | 260C | 77FF | C404 | 0C5E |
| 0000057520 | FF26 | 0A77 | 5EC4 | 260C | 77FF | C406 | 0C5E | 8B26 |
| 0000057540 | 0847 | 5040 | 7E83 | 280A | 0374 | 06E9 | B800 | 069A |
| 0000057560 | 7BE9 | 8300 | 0A7E | 7429 | E903 | 0006 | A2B8 | E906 |
| 0000057600 | 006C | 7E83 | 2A0A | 0374 | 06E9 | B800 | 06AA | 5DE9 |
| 0000057620 | 8300 | 0A7E | 742B | E903 | 0006 | B2B8 | E906 | 004E |
| 0000057640 | 7E83 | 2C0A | 0374 | 06E9 | B800 | 06BB | 3FE9 | 8300 |
| 0000057660 | 0A7E | 7478 | E903 | 0006 | C3B8 | E906 | 0030 | 7E83 |
| 0000057700 | 7A0A | 0374 | 06E9 | B800 | 06CB | 21E9 | 8300 | 0A7E |
| 0000057720 | 7416 | E903 | 0006 | D3B8 | E906 | 0012 | 7E83 | 190A |

THU MAR 14 17:35:10 1991 FRAME.EXE PAGE 27, LINE 1535

| | | | | | | | | |
|---|---|---|---|---|---|---|---|---|
| 0000057740 | 0374 | 06E9 | B800 | 06DB | 03E9 | B800 | 06E3 | 501E |
| 0000057760 | 681E | 06EC | 76FF | FF16 | 1476 | 089A | B30A | 835E |
| 0000060000 | 18C4 | C3E9 | C400 | 0C5E | FF26 | 0277 | 5EC4 | 260C |
| 0000060020 | 77FF | C404 | 0C5E | FF26 | 0A77 | 5EC4 | 260C | 77FF |
| 0000060040 | C406 | 0C5E | 8B26 | 0847 | 5040 | 7E83 | 280A | 0374 |
| 0000060060 | 06E9 | B800 | 070F | 7BE9 | 8300 | 0A7E | 7429 | E903 |
| 0000060100 | 0006 | 17B8 | E907 | 006C | 7E83 | 2A0A | 0374 | 06E9 |
| 0000060120 | B800 | 071F | 5DE9 | 8300 | 0A7E | 742B | E903 | 0006 |
| 0000060140 | 27B8 | E907 | 004E | 7E83 | 2C0A | 0374 | 06E9 | B800 |
| 0000060160 | 0730 | 3FE9 | 8300 | 0A7E | 7478 | E903 | 0006 | 38B8 |
| 0000060200 | E907 | 0030 | 7E83 | 7A0A | 0374 | 06E9 | B800 | 0740 |
| 0000060220 | 21E9 | 8300 | 0A7E | 7416 | E903 | 0006 | 48B8 | E907 |
| 0000060240 | 0012 | 7E83 | 190A | 0374 | 06E9 | B800 | 0750 | 03E9 |
| 0000060260 | B800 | 0758 | 501E | 681E | 0761 | 76FF | FF16 | 1476 |
| 0000060300 | 089A | F00A | 835E | 16C4 | 468B | 0B12 | 1046 | 0374 |
| 0000060320 | 09E9 | 8300 | 0A7E | 7528 | E903 | 0074 | 7E81 | 7110 |
| 0000060340 | 74BC | E903 | 000A | 7E81 | F612 | 7569 | E903 | 0060 |
| 0000060360 | 0A6A | 468D | 16DA | FF50 | 1276 | 76FF | 9A10 | 09FE |
| 0000060400 | 5CBA | C483 | 8D0A | DA46 | 5016 | AA9A | 2509 | 835F |
| 0000060420 | 04C4 | 082D | F700 | D1D8 | 89E0 | D846 | 7E83 | 00D8 |
| 0000060440 | 037F | 15E9 | FF00 | D876 | 681E | 077F | 76FF | FF16 |
| 0000060460 | 1476 | C29A | 3809 | 835F | 0AC4 | 468D | 16DA | FF50 |
| 0000060500 | 1676 | 76FF | 9A14 | 0904 | 5F61 | C483 | E908 | 003B |
| 0000060520 | 7E81 | 7110 | 74BC | E903 | 001F | 7E81 | F612 | 7469 |
| 0000060540 | E903 | 0015 | 681E | 07A0 | 76FF | FF16 | 1476 | 049A |
| 0000060560 | 7609 | 835F | 08C4 | 12E9 | 1E00 | AF68 | FF07 | 1676 |
| 0000060600 | 76FF | 9A14 | 0904 | 5F8A | C483 | 6A08 | 1E05 | C068 |
| 0000060620 | FF07 | 1676 | 76FF | 9A14 | 09C2 | 5F9E | C483 | FF0A |
| 0000060640 | 0876 | 76FF | FF06 | 1676 | 76FF | 9A14 | 0904 | 5DED |
| 0000060660 | C483 | 5E08 | 835F | 02ED | E58B | 5D1F | CB4D | 581E |
| 0000060700 | 4590 | 8B55 | 1EEC | D88E | EC81 | 0064 | 5657 | 006A |
| 0000060720 | 006A | 76FF | FF08 | 0676 | 76FF | FF0C | 0A76 | 468D |
| 0000060740 | 169E | 9A50 | 3D24 | 0000 | 4689 | 839C | 9C7E | 7500 |
| 0000060760 | E903 | 000F | 76FF | 9A9C | 5C9D | 0000 | 468B | E99C |
| 0000061000 | 0094 | 468D | 16CE | 9A50 | 0A7C | 602C | C483 | 8904 |
| 0000061020 | F646 | 5689 | C7F8 | FA46 | 0058 | 46C7 | 00FC | FF00 |
| 0000061040 | 1076 | 76FF | FF0E | FC76 | 76FF | FFFA | F876 | 76FF |
| 0000061060 | 6AF6 | FF16 | 0C76 | 76FF | 9A0A | 5CE8 | 5EFD | C483 |
| 0000061100 | A112 | 12EE | 38E9 | 8B00 | CE46 | 568B | C4D0 | 125E |
| 0000061120 | 8926 | 2607 | 5789 | E902 | 0036 | 468B | 8BFA | FC56 |
| 0000061140 | 5EC4 | 2612 | 0789 | 8926 | 0257 | 23E9 | C400 | 125E |
| 0000061160 | C02B | 8926 | 0247 | 8926 | E907 | 0014 | 11E9 | 2D00 |
| 0000061200 | 0017 | 0375 | C0E9 | 48FF | 0375 | CDE9 | E9FF | FFDD |
| 0000061220 | 00B8 | E900 | 0000 | 5F5E | ED83 | 8B02 | 1FE5 | 4D5D |
| 0000061240 | 1ECB | 9058 | 5545 | EC8B | 8E1E | 81D8 | B8EC | 5700 |
| 0000061260 | FF56 | 0876 | 76FF | FF06 | 0C76 | 76FF | 8D0A | 4A86 |
| 0000061300 | 16FF | 9A50 | FFFF | 0000 | 8689 | FF48 | BE83 | FF48 |
| 0000061320 | 7500 | E903 | 0010 | B6FF | FF48 | E89A | 005F | 8B00 |
| 0000061340 | 4886 | E9FF | 00A0 | 868D | FF6E | 5016 | 7C9A | 1A0A |
| 0000061360 | 8361 | 04C4 | 4689 | 89F6 | F856 | 468B | 058E | 0056 |
| 0000061400 | E0D1 | 4603 | 89B0 | FA46 | 46C7 | 00FC | FF00 | 1076 |
| 0000061420 | 76FF | FF0E | FC76 | 76FF | FFFA | F876 | 76FF | 6AF6 |
| 0000061440 | FF19 | 0C76 | 76FF | 9A0A | 5CE8 | 5FFA | C483 | A112 |
| 0000061460 | 12EE | 3AE9 | 8B00 | 6E86 | 8BFF | 7096 | C4FF | 125E |
| 0000061500 | 8926 | 2607 | 5789 | E902 | 0036 | 468B | 8BFA | FC56 |
| 0000061520 | 5EC4 | 2612 | 0789 | 8926 | 0257 | 23E9 | C400 | 125E |
| 0000061540 | C02B | 8926 | 0247 | 8926 | E907 | 0014 | 11E9 | 2D00 |
| 0000061560 | 0017 | 0375 | BEE9 | 48FF | 0375 | CDE9 | E9FF | FFDD |
| 0000061600 | 00B8 | E900 | 0000 | 5F5E | ED83 | 8B02 | 1FE5 | 4D5D |

THU MAR 14 17:35:10 1991 FRAME.EXE PAGE 28, LINE 1594

| | | | | | | | | |
|---|---|---|---|---|---|---|---|---|
| 0000061620 | 1ECB | 9058 | 5545 | EC8B | 8E1E | 81D8 | C0EC | 5700 |
| 0000061640 | FF56 | 0876 | 76FF | FF06 | 0C76 | 76FF | 6A0A | FF78 |
| 0000061660 | 1076 | 76FF | 8D0E | 4086 | 16FF | 9A50 | 3D86 | 0000 |
| 0000061700 | 4689 | 83F8 | F87E | 7500 | E903 | 000E | 76FF | 9AF8 |
| 0000061720 | 60CB | 0000 | 468B | E9F8 | 009F | 468D | 1690 | 9A50 |
| 0000061740 | 0A7C | 620F | C483 | 8904 | FA46 | 5689 | 8BFC | A646 |
| 0000061760 | D22B | 4603 | 13AC | AE56 | 4689 | 89F4 | F656 | 76FF |
| 0000062000 | FF14 | 1276 | 76FF | FFF6 | F476 | 76FF | FFFC | FA76 |
| 0000062020 | 468A | 2A11 | 50E4 | 76FF | FF0C | 0A76 | E89A | DF5C |
| 0000062040 | 8360 | 12C4 | EEA1 | E912 | 0038 | 468B | 8B90 | 9256 |
| 0000062060 | 5EC4 | 2616 | 0789 | 8926 | 0257 | 36E9 | 8B00 | F446 |
| 0000062100 | 568B | C4F6 | 165E | 8926 | 2607 | 5789 | E902 | 0023 |
| 0000062120 | 5EC4 | 2B16 | 26C0 | 4789 | 2602 | 0789 | 14E9 | E900 |
| 0000062140 | 0011 | 172D | 7500 | E903 | FFC0 | 7548 | E903 | FFCD |
| 0000062160 | DDE9 | B8FF | 0000 | 00E9 | 5E00 | 835F | 02ED | E58B |
| 0000062200 | 5D1F | CB4D | 581E | 4590 | 8B55 | 1EEC | D88E | EC81 |
| 0000062220 | 0010 | 5657 | 006A | 006A | 76FF | FF0C | 0A76 | 468D |
| 0000062240 | 16FA | 9A50 | FFFF | 0000 | 4689 | 83F0 | F07E | 7500 |
| 0000062260 | E903 | 000E | 76FF | 9AF0 | 61C0 | 0000 | 468B | E9F0 |
| 0000062300 | 01D5 | 468B | 8BFA | FC56 | 2405 | 5200 | 9A50 | 0A7C |
| 0000062320 | 6330 | C483 | 8904 | F646 | 5689 | 8AF8 | 0D46 | E42A |
| 0000062340 | 283D | 7400 | E903 | 000B | C02B | 4689 | 89F4 | F246 |
| 0000062360 | 2CE9 | 6A00 | 6A00 | FF00 | 0C76 | 76FF | 6A0A | 8D01 |
| 0000062400 | F246 | 5016 | FF9A | 00FF | 8900 | F046 | 7E83 | 00F0 |
| 0000062420 | 0375 | 0AE9 | C700 | F246 | BC71 | 46C7 | F6F4 | FF69 |
| 0000062440 | 1076 | 76FF | FF0E | F476 | 76FF | FFF2 | F876 | 76FF |
| 0000062460 | 8AF6 | 0D46 | E42A | FF50 | 0876 | 76FF | 9A06 | 5CE8 |
| 0000062500 | 61D2 | C483 | A112 | 12EE | 16E9 | C401 | 125E | C02B |
| 0000062520 | 8926 | 0247 | 8926 | E907 | 0124 | 468A | 2A0D | 3DE4 |
| 0000062540 | 0028 | 0374 | 09E9 | B800 | 000A | 00BA | E900 | 00B6 |
| 0000062560 | 468A | 2A0D | 3DE4 | 0029 | 0374 | 09E9 | B800 | 0009 |
| 0000062600 | 00BA | E900 | 00A0 | 468A | 2A0D | 3DE4 | 002A | 0374 |
| 0000062620 | 09E9 | B800 | 0008 | 00BA | E900 | 008A | 468A | 2A0D |
| 0000062640 | 3DE4 | 002B | 0374 | 09E9 | B800 | 0007 | 00BA | E900 |
| 0000062660 | 0074 | 468A | 2A0D | 3DE4 | 002C | 0374 | 09E9 | B800 |
| 0000062700 | 0006 | 00BA | E900 | 005E | 468A | 2A0D | 3DE4 | 0078 |
| 0000062720 | 0374 | 09E9 | B800 | 0005 | 00BA | E900 | 0048 | 468A |
| 0000062740 | 2A0D | 3DE4 | 007A | 0374 | 09E9 | B800 | 0004 | 00BA |
| 0000062760 | E900 | 0032 | 468A | 2A0D | 3DE4 | 0016 | 0374 | 09E9 |
| 0000063000 | B800 | 0003 | 00BA | E900 | 001C | 468A | 2A0D | 3DE4 |
| 0000063020 | 0019 | 0374 | 09E9 | B800 | 0002 | 00BA | E900 | 0006 |
| 0000063040 | 01B8 | BA00 | 0000 | 5EC4 | 2612 | 0789 | 8926 | 0257 |
| 0000063060 | 4BE9 | C400 | FA5E | 8B26 | 2447 | 8B26 | 2657 | 5EC4 |
| 0000063100 | 2612 | 0789 | 8926 | 0257 | 33E9 | 8B00 | F246 | 568B |
| 0000063120 | C4F4 | 125E | 8926 | 2607 | 5789 | E902 | 0020 | 1DE9 |
| 0000063140 | 2D00 | 0015 | 0375 | E2E9 | 48FE | 0375 | EBE9 | 48FE |
| 0000063160 | 0375 | BEE9 | 48FF | 0375 | D0E9 | E9FF | 0000 | 76FF |
| 0000063200 | FFFC | FA76 | FF9A | 00FF | 2B00 | 89C0 | FC46 | 4689 |
| 0000063220 | B8FA | 0000 | 00E9 | 5E00 | 835F | 02ED | E58B | 5D1F |
| 0000063240 | CB4D | 581E | 4590 | 8B55 | 1EEC | D88E | EC81 | 0004 |
| 0000063260 | 5657 | 7E83 | 280A | 0374 | 06E9 | B800 | 07E1 | 7BE9 |
| 0000063300 | 8300 | 0A7E | 7429 | E903 | 0006 | E9B8 | E907 | 006C |
| 0000063320 | 7E83 | 2A0A | 0374 | 06E9 | B800 | 07F1 | 5DE9 | 8300 |
| 0000063340 | 0A7E | 742B | E903 | 0006 | F9B8 | E907 | 004E | 7E83 |
| 0000063360 | 2C0A | 0374 | 06E9 | B800 | 0802 | 3FE9 | 8300 | 0A7E |
| 0000063400 | 7478 | E903 | 0006 | 0AB8 | E908 | 0030 | 7E83 | 7A0A |
| 0000063420 | 0374 | 06E9 | B800 | 0812 | 21E9 | 8300 | 0A7E | 7416 |
| 0000063440 | E903 | 0006 | 1AB8 | E908 | 0012 | 7E83 | 190A | 0374 |
| 0000063460 | 06E9 | B800 | 0822 | 03E9 | B800 | 082A | 501E | 76FF |

THU MAR 14 17:35:10 1991 FRAME.EXE PAGE 29, LINE 1653

| | | | | | | | | |
|---|---|---|---|---|---|---|---|---|
| 0000063500 | FF0E | 0C76 | 4A9A | 4B09 | 8365 | 08C4 | 76FF | FF08 |
| 0000063520 | 0676 | 76FF | FF0E | 0C76 | 049A | C009 | 8362 | 08C4 |
| 0000063540 | 3E83 | 12EE | 7415 | E903 | 000F | 5EC4 | 2B10 | 26C0 |
| 0000063560 | 4789 | 2602 | 0789 | B2E9 | 8300 | 0A7E | 7428 | E903 |
| 0000063600 | 0009 | 0AB8 | BA00 | 0000 | 96E9 | 8300 | 0A7E | 7429 |
| 0000063620 | E903 | 0009 | 09B8 | BA00 | 0000 | 84E9 | 8300 | 0A7E |
| 0000063640 | 742A | E903 | 0009 | 08B8 | BA00 | 0000 | 72E9 | 8300 |
| 0000063660 | 0A7E | 742B | E903 | 0009 | 07B8 | BA00 | 0000 | 60E9 |
| 0000063700 | 8300 | 0A7E | 742C | E903 | 0009 | 06B8 | BA00 | 0000 |
| 0000063720 | 4EE9 | 8300 | 0A7E | 7478 | E903 | 0009 | 05B8 | BA00 |
| 0000063740 | 0000 | 3CE9 | 8300 | 0A7E | 747A | E903 | 0009 | 04B8 |
| 0000063760 | BAG0 | 0000 | 2AE9 | 8300 | 0A7E | 7416 | E903 | 0009 |
| 0000064000 | 03B8 | BA00 | 0000 | 18E9 | 8300 | 0A7E | 7419 | E903 |
| 0000064020 | 0009 | 02B8 | BA00 | 0000 | 06E9 | B800 | 0001 | 00BA |
| 0000064040 | C400 | 105E | 8926 | 2607 | 5789 | B802 | 0000 | 00E9 |
| 0000064060 | 5E00 | 835F | 02ED | E58B | 5D1F | CB4D | 581E | 4590 |
| 0000064100 | 8B55 | 1EEC | D88E | EC81 | 007C | 5657 | C02B | 4689 |
| 0000064120 | 8988 | 8646 | 76FF | FF08 | 0676 | 016A | 468D | 1692 |
| 0000064140 | 8D50 | 9446 | 5016 | FF9A | 00FF | 8900 | 9046 | 7E83 |
| 0000064160 | 0090 | 0375 | 21E9 | 8100 | 907E | 01BC | 0374 | 09E9 |
| 0000064200 | B800 | 0000 | 75E9 | E901 | 000E | 76FF | 9A90 | 62A8 |
| 0000064220 | 0000 | 468B | E990 | 0164 | 3E83 | 12EE | 7518 | E903 |
| 0000064240 | 000A | 3E83 | 12EE | 7417 | E903 | 0045 | 46C7 | 00FC |
| 0000064260 | 8B00 | 9246 | E0C1 | 5002 | 949A | D905 | 8366 | 02C4 |
| 0000064300 | 4689 | 8986 | 8856 | 468B | 0B88 | 8646 | 0374 | 05E9 |
| 0000064320 | C700 | FC46 | 0001 | 468B | C192 | 02E0 | 6850 | 00FF |
| 0000064340 | 76FF | FF88 | 8676 | 829A | 270D | 8367 | 08C4 | 05E9 |
| 0000064360 | C700 | FC46 | 0001 | 46C7 | 008E | E900 | 0003 | 46FF |
| 0000064400 | 8B8E | 8E46 | 4639 | 7792 | E903 | 00C0 | 3E83 | 068A |
| 0000064420 | 7500 | E903 | 002C | 468D | 168A | 8D50 | 9846 | 5016 |
| 0000064440 | 468B | C18E | 05E0 | 4603 | 8B94 | 9656 | 5052 | 76FF |
| 0000064460 | FF08 | 0676 | AE9A | 4F5F | 8367 | 10C4 | 4689 | E990 |
| 0000064500 | 0025 | 468D | 168A | 8D50 | 9846 | 5016 | 166A | 468B |
| 0000064520 | C18E | 05E0 | 4603 | 8B94 | 9656 | 5052 | 929A | 8764 |
| 0000064540 | 8367 | 0EC4 | 4689 | 8390 | 907E | 7500 | E903 | 0003 |
| 0000064560 | 59E9 | 8300 | FC7E | 7500 | E903 | 0009 | 468B | 898E |
| 0000064600 | 8446 | 1AE9 | FF00 | 8876 | 76FF | FF86 | 9276 | 76FF |
| 0000064620 | FF8C | 8A76 | 349A | A55B | 8367 | 0AC4 | 4689 | C484 |
| 0000064640 | 0A5E | 8B26 | 0307 | 8446 | 6A50 | 6A00 | 8D03 | 9846 |
| 0000064660 | 5016 | 7E9A | D851 | 8367 | 0AC4 | 4689 | 8390 | 907E |
| 0000064700 | 7500 | E903 | 0003 | 03E9 | E900 | FF32 | 76FF | FF96 |
| 0000064720 | 9476 | 999A | 0059 | 2B00 | 89C0 | 9646 | 4689 | FF94 |
| 0000064740 | 8876 | 76FF | 9A86 | 08FA | 6537 | C483 | 8B04 | 8E46 |
| 0000064760 | 5EC4 | 260A | 0701 | 468B | E990 | 0000 | 5F5E | ED83 |
| 0000065000 | 8B02 | 1FE5 | 4D5D | 1ECB | 9058 | 5545 | EC8B | 8E1E |
| 0000065020 | 81D8 | 7CEC | 5700 | 2B56 | 89C0 | 8846 | 4689 | FF86 |
| 0000065040 | 0876 | 76FF | 6A06 | 8D01 | 9246 | 5016 | 468D | 1694 |
| 0000065060 | 9A50 | FFFF | 0000 | 4689 | 8390 | 907E | 7500 | E903 |
| 0000065100 | 0021 | 7E81 | BC90 | 7401 | E903 | 0009 | 00B8 | E900 |
| 0000065120 | 0178 | 0EE9 | FF00 | 9076 | 7E9A | 0066 | 8B00 | 9046 |
| 0000065140 | 67E9 | 8301 | EE3E | 1812 | 0375 | 0AE9 | 8300 | EE3E |
| 0000065160 | 1712 | 0374 | 48E9 | C700 | FC46 | 0000 | 468B | C192 |
| 0000065200 | 02E0 | 9A50 | 0594 | 68A7 | C483 | 8902 | 8646 | 5689 |
| 0000065220 | 8B88 | 8846 | 460B | 7486 | E903 | 0008 | 46C7 | 01FC |
| 0000065240 | E900 | 0018 | 468B | C192 | 02E0 | 6850 | 00FF | 76FF |
| 0000065260 | FF88 | 8676 | 829A | AB0D | 8366 | 08C4 | 05E9 | C700 |
| 0000065300 | FC46 | 0001 | 46C7 | 008E | E900 | 0003 | 46FF | 8B8E |
| 0000065320 | 8E46 | 4639 | 7792 | E903 | 00C0 | 3E83 | 068A | 7500 |
| 0000065340 | E903 | 002C | 468D | 168A | 8D50 | 9846 | 5016 | 468B |

THU MAR 14 17:35:10 1991 FRAME.EXE PAGE 30, LINE 1712

| | | | | | | | | |
|---|---|---|---|---|---|---|---|---|
| 0000065360 | C18E | 05E0 | 4603 | 8B94 | 9656 | 5052 | 76FF | FF08 |
| 0000065400 | 0676 | 919A | 1D60 | 8369 | 10C4 | 4689 | E990 | 0025 |
| 0000065420 | 468D | 168A | 8D50 | 9846 | 5016 | 196A | 468B | C18E |
| 0000065440 | 05E0 | 4603 | 8B94 | 9656 | 5052 | 929A | 5564 | 8369 |
| 0000065460 | 0EC4 | 4689 | 8390 | 907E | 7500 | E903 | 0003 | 59E9 |
| 0000065500 | 8300 | FC7E | 7500 | E903 | 0009 | 468B | 898E | 8446 |
| 0000065520 | 1AE9 | FF00 | 8876 | 76FF | FF86 | 9276 | 76FF | FF8C |
| 0000065540 | 8A76 | 349A | 735B | 8369 | 0AC4 | 4689 | C484 | 0A5E |
| 0000065560 | 8B26 | 0307 | 8446 | 6A50 | 6A00 | 8D04 | 9846 | 5016 |
| 0000065600 | 7E9A | A651 | 8369 | 0AC4 | 4689 | 8390 | 907E | 7500 |
| 0000065620 | E903 | 0003 | 03E9 | E900 | FF32 | 76FF | FF96 | 9476 |
| 0000065640 | C39A | 0067 | 2B00 | 89C0 | 9646 | 4689 | FF94 | 8876 |
| 0000065660 | 76FF | 9A86 | 08FA | 6876 | C483 | 8B04 | 8E46 | 5EC4 |
| 0000065700 | 260A | 0701 | 468B | E990 | 0000 | 5F5E | ED83 | 8B02 |
| 0000065720 | 1FE5 | 4D5D | 1ECB | 9058 | 5545 | EC8B | 8E1E | 81D8 |
| 0000065740 | 7EEC | 5700 | 2B56 | 89C0 | 8646 | 4689 | C784 | 9446 |
| 0000065760 | 0000 | 3E83 | 12EE | 7417 | E903 | 0008 | 46C7 | 03FA |
| 0000066000 | E900 | 0005 | 46C7 | 01FA | FF00 | 0876 | 76FF | 6A06 |
| 0000066020 | FF78 | FA76 | 468D | 1692 | 8D50 | 8E46 | 5016 | FF9A |
| 0000066040 | 0DFF | 8900 | 9446 | 7E83 | 0094 | 0375 | 21E9 | 8100 |
| 0000066060 | 947E | 01BC | 0374 | 09E9 | B800 | 0000 | 91E9 | E901 |
| 0000066100 | 000E | 76FF | 9A94 | 6849 | 0000 | 468B | E994 | 0180 |
| 0000066120 | 3E83 | 12EE | 7418 | E903 | 0045 | 46C7 | 00FC | 8B00 |
| 0000066140 | 9246 | E0C1 | 5002 | 949A | 8705 | 836A | 02C4 | 4689 |
| 0000066160 | 8984 | 8656 | 468B | 0B86 | 8446 | 0374 | 05E9 | C700 |
| 0000066200 | FC46 | 0001 | 468B | C192 | 02E0 | 6850 | 00FF | 76FF |
| 0000066220 | FF86 | 8476 | 829A | E40D | 836A | 08C4 | 05E9 | C700 |
| 0000066240 | FC46 | 0001 | 46C7 | 008C | E900 | 0003 | 46FF | 8B8C |
| 0000066260 | 8C46 | 4639 | 7792 | E903 | 00E6 | 3E83 | 068A | 7500 |
| 0000066300 | E903 | 003B | 468D | 1688 | 8D50 | 9646 | 5016 | 5E6B |
| 0000066320 | 248C | 76C4 | 268E | 70FF | 2602 | 30FF | 466B | 248C |
| 0000066340 | 4603 | 8B8E | 9056 | 0405 | 5200 | FF50 | 0876 | 76FF |
| 0000066360 | 9A06 | 6181 | 6B19 | C483 | 8914 | 9446 | 32E9 | 8D00 |
| 0000066400 | 8846 | 5016 | 468D | 1696 | 6B50 | 8C5E | C424 | 8E76 |
| 0000066420 | 8A26 | 0340 | E42A | 6B50 | 8C46 | 0324 | 8E46 | 568B |
| 0000066440 | 0590 | 0004 | 5052 | 929A | 5164 | 836B | 0EC4 | 4689 |
| 0000066460 | 8394 | 947E | 7500 | E903 | 0003 | 63E9 | 8300 | FC7E |
| 0000066500 | 7500 | E903 | 0009 | 468B | 898C | 8246 | 1AE9 | FF00 |
| 0000066520 | 8676 | 76FF | FF84 | 9276 | 76FF | FF8A | 8876 | 349A |
| 0000066540 | 795B | 836B | 0AC4 | 4689 | C482 | 0A5E | 8B26 | 0307 |
| 0000066560 | 8246 | 6B50 | 8C5E | C424 | 8E76 | FF26 | 0270 | FF26 |
| 0000066600 | 8D30 | 9646 | 5016 | 7E9A | F551 | 8368 | 0AC4 | 4689 |
| 0000066620 | 8394 | 947E | 7500 | E903 | 0003 | 03E9 | E900 | FF0C |
| 0000066640 | 76FF | FF90 | 8E76 | 919A | 0069 | 2B00 | 89C0 | 9046 |
| 0000066660 | 4689 | FF8E | 8676 | 76FF | 9A84 | 08FA | 6A59 | C483 |
| 0000066700 | 8B04 | 8C46 | 5EC4 | 260A | 0701 | 468B | E994 | 0000 |
| 0000066720 | 5F5E | ED83 | 8B02 | 1FE5 | 4D5D | 1ECB | 9058 | 5545 |
| 0000066740 | EC8B | 8E1E | 81D8 | 7EEC | 5700 | 2B56 | 89C0 | 8846 |
| 0000066760 | 4689 | C786 | 8246 | 0000 | 006A | 006A | 76FF | FF08 |
| 0000067000 | 0676 | 468D | 1694 | 8D50 | 9046 | 5016 | FF9A | 00FF |
| 0000067020 | 8900 | 9646 | 7E83 | 0096 | 0375 | 21E9 | 8100 | 967E |
| 0000067040 | 01BC | 0374 | 09E9 | B800 | 0000 | F9E9 | E901 | 000E |
| 0000067060 | 76FF | 9A96 | 6A36 | 0000 | 468B | E996 | 01E8 | 3E83 |
| 0000067100 | 12EE | 7415 | E903 | 0008 | 46C7 | 01FC | E900 | 0042 |
| 0000067120 | 46C7 | 00FC | 8B00 | 9446 | E0C1 | 5002 | 949A | 7D05 |
| 0000067140 | 836C | 02C4 | 4689 | 8986 | 8856 | 468B | 0B88 | 8646 |
| 0000067160 | 0374 | 05E9 | C700 | FC46 | 0001 | 468B | C194 | 02E0 |
| 0000067200 | 6850 | 00FF | 76FF | FF88 | 8676 | 829A | A30D | 836C |
| 0000067220 | 08C4 | 7E83 | 1E94 | 0376 | 13E9 | 8300 | 947E | 7705 |

THU MAR 14 17:35:10 1991 FRAME.EXE PAGE 31, LINE 1771

| | | | | | | | | |
|---|---|---|---|---|---|---|---|---|
| 0000067240 | E903 | 0019 | 3E83 | 068A | 7500 | E903 | 000F | 006A |
| 0000067260 | 8C9A | EE4B | 836C | 02C4 | 46C7 | 0182 | C700 | 8E46 |
| 0000067300 | 0000 | 03E9 | FF00 | 8E46 | 468B | 3994 | 8E46 | 0372 |
| 0000067320 | 10E9 | 6B01 | 8E5E | C424 | 9076 | 8A26 | 0340 | E42A |
| 0000067340 | 2A3D | 7400 | E903 | 001B | 681E | 0833 | 466B | 248E |
| 0000067360 | 4603 | 8B90 | 9256 | 0405 | 5200 | 9A50 | 094A | 6D27 |
| 0000067400 | C483 | 8308 | 8A3E | 0006 | 0375 | 35E9 | 8D00 | 8A46 |
| 0000067420 | 5016 | 468D | 1698 | 6B50 | 8E5E | C424 | 9076 | FF26 |
| 0000067440 | 0270 | FF26 | 6B30 | 8E46 | 0324 | 9046 | 568B | 0592 |
| 0000067460 | 0004 | 5052 | 749A | 5C62 | 836D | 10C4 | 4689 | E996 |
| 0000067500 | 0032 | 468D | 168A | 8D50 | 9846 | 5016 | 5E6B | 248E |
| 0000067520 | 76C4 | 2690 | 408A | 2A03 | 50E4 | 466B | 248E | 4603 |
| 0000067540 | 8B90 | 9256 | 0405 | 5200 | 9A50 | 6492 | 6D94 | C483 |
| 0000067560 | 890E | 9646 | 7E83 | 0096 | 0375 | 03E9 | E900 | 0063 |
| 0000067600 | 7E83 | 00FC | 0375 | 09E9 | 8B00 | 8E46 | 4689 | E984 |
| 0000067620 | 001A | 76FF | FF88 | 8676 | 76FF | FF94 | 8C76 | 76FF |
| 0000067640 | 9A8A | 5B34 | 6DBC | C483 | 890A | 8446 | 5EC4 | 260A |
| 0000067660 | 078B | 4603 | 5084 | 5E6B | 248E | 76C4 | 2690 | 70FF |
| 0000067700 | 2602 | 30FF | 468D | 1698 | 9A50 | 517E | 6DF8 | C483 |
| 000 67720 | 890A | 9646 | 7E83 | 0096 | 0375 | 03E9 | E900 | 0003 |
| 0000067740 | E2E9 | 8BFE | 8E46 | 5EC4 | 260A | 0701 | 76FF | FF92 |
| 0000067760 | 9076 | 979A | 006B | 2B00 | 89C0 | 9246 | 4689 | FF90 |
| 0000070000 | 8876 | 76FF | 9A86 | 08FA | 6E0B | C483 | 8304 | 827E |
| 0000070020 | 7500 | E903 | 000A | 016A | 8C9A | AC4B | 836B | 02C4 |
| 0000070040 | 468B | E996 | 0000 | 5F5E | ED83 | 8B02 | 1FE5 | 4D5D |
| 0000070060 | 1ECB | 9058 | 5545 | EC8B | 8E1E | 81D8 | 06EC | 5700 |
| 0000070100 | 6A56 | 6A00 | 8D00 | 0646 | 5016 | 006A | 006A | 006A |
| 0000070120 | 006A | 959A | 003C | 8900 | FC46 | 7E83 | 00FC | 0375 |
| 0000070140 | 06E9 | 8B00 | FC46 | B9E9 | 8A00 | 0946 | E42A | 2B3D |
| 0000070160 | 7400 | E903 | 002E | 5EC4 | 260A | 37FF | 006A | 056A |
| 0000070200 | 681E | 0841 | 7E9A | 4F51 | 836C | 0AC4 | 4689 | 83FC |
| 0000070220 | FC7E | 7500 | E903 | 0006 | 468B | E9FC | 0084 | 5EC4 |
| 0000070240 | 260A | 07FF | 76FF | FF0C | 0A76 | 76FF | FF08 | 0676 |
| 0000070260 | C59A | C369 | 836E | 08C4 | 4689 | 83FC | FC7E | 7400 |
| 0000070300 | E903 | 001F | 76FF | FF0C | 0A76 | 76FF | FF08 | 0676 |
| 0000070320 | 2C9A | 7766 | 836E | 08C4 | 463B | 74FC | E903 | 0003 |
| 0000070340 | 00E9 | FF00 | 0876 | 76FF | 6A06 | 9A00 | 3E2A | 0000 |
| 0000070360 | 4689 | 83FA | FC7E | 7500 | E903 | 0009 | 468B | E9FC |
| 0000070400 | 0020 | 17E9 | 8300 | FA7E | 7500 | E903 | 000E | 76FF |
| 0000070420 | 9AFA | 6C24 | 0000 | 468B | E9FA | 0006 | 00B8 | E900 |
| 0000070440 | 0000 | 5F5E | ED83 | 8B02 | 1FE5 | 4D5D | 1ECB | 9058 |
| 0000070460 | 5545 | EC8B | 8E1E | 81D8 | 86EC | 5700 | 1E56 | 4F68 |
| 0000070500 | FF08 | 0C76 | 76FF | 9A0A | 094A | 6F4E | C483 | FF08 |
| 0000070520 | 0876 | 76FF | FF06 | 0C76 | 76FF | 9A0A | 0904 | 6F60 |
| 0000070540 | C483 | 1E08 | 5368 | FF08 | 0C76 | 76FF | 9A0A | 0904 |
| 0000070560 | 6FA6 | C483 | C408 | 065E | 8A26 | 9807 | 402D | 8900 |
| 0000070600 | 8446 | 76FF | 6A84 | 8D01 | EC46 | 5016 | 126A | FF9A |
| 0000070620 | 00FF | 8900 | EA46 | 7E83 | 00EA | 0375 | 03E9 | E900 |
| 0000070640 | 0145 | 76FF | FFF6 | F476 | 76FF | FFF2 | F076 | 006A |
| 0000070660 | 76FF | 9AFC | 0E12 | 6FAD | 5052 | 129A | CB0E | 896F |
| 0000070700 | 7A86 | 89FF | 7C96 | FFFF | FA76 | 76FF | FFF8 | F276 |
| 0000070720 | 76FF | 6AF0 | FF00 | FC76 | 129A | D20E | 526F | 9A50 |
| 0000070740 | 0E12 | 6FE9 | 8689 | FF7E | 5689 | 6A80 | 6800 | 03E8 |
| 0000070760 | 868D | FF7A | 5016 | F09A | F90D | 6A6F | 6800 | 03E8 |
| 0000071000 | 868D | FF7E | 5016 | F09A | 0C0D | 6A70 | 8D0A | 8646 |
| 0000071020 | 5016 | 76FF | FF80 | 7EB6 | 9AFF | 09FE | 7019 | C483 |
| 0000071040 | 8D0A | 8646 | 5016 | AA9A | 4109 | 8370 | 04C4 | 072D |
| 0000071060 | F700 | D1D8 | 89E0 | 8246 | 7E83 | 0082 | 037F | 15E9 |
| 0000071100 | FF00 | 8276 | 681E | 0856 | 76FF | FF0C | 0A76 | C29A |

THU MAR 14 17:35:10 1991 FRAME.EXE PAGE 32, LINE 1830

```
0000071120  6109  8370  0AC4  B6FF  FF7C  B6FF  FF7A  76FF
0000071140  FF80  7EB6  1EFF  7768  8D08  8646  5016  089A
0000071160  740A  8370  10C4  468D  1686  FF50  0C76  76FF
0000071200  9A0A  0904  708B  C483  6A08  8D0A  8646  5016
0000071220  B6FF  FF7C  B6FF  FF7A  FE9A  9809  8370  0AC4
0000071240  468D  1686  9A50  09AA  70C0  C483  2D04  0007
0000071260  D8F7  E0D1  4689  8382  827E  7F00  E903  0015
0000071300  76FF  1E82  9968  FF08  0C76  76FF  9A0A  09C2
0000071320  70D2  C483  1E0A  BA68  FF08  0C76  76FF  9A0A
0000071340  0904  6EA3  C483  5E08  835F  02ED  E58B  5D1F
0000071360  CB4D  581E  4590  8B55  1EEC  D88E  EC81  0070
0000071400  5657  016A  468D  1690  8D50  9246  5016  FF9A
0000071420  00FF  8900  9846  7E83  0098  0375  21E9  8100
0000071440  987E  01BC  0374  09E9  B800  0000  B1E9  E901
0000071460  000E  76FF  9A98  6F02  0000  468B  E998  01A0
0000071500  46C7  0096  E900  0009  46FF  C496  065E  FF26
0000071520  8B07  9646  4639  7790  E903  008E  3E83  068A
0000071540  7500  E903  001E  468D  169A  8B50  9646  E0C1
0000071560  0305  9246  568B  5294  9A50  6F1D  7180  C483
0000071600  E908  003D  681E  08BE  468D  169A  9A50  094A
0000071620  719B  C483  8B08  9646  E0C1  0305  9246  568B
0000071640  5294  8D50  9A46  5016  049A  AC09  8371  08C4
0000071660  681E  08C2  468D  169A  9A50  0904  71C3  C483
0000071700  C408  065E  FF26  6A37  6A00  8D02  9A46  5016
0000071720  7E9A  3A51  836F  0AC4  4689  8398  987E  7500
0000071740  E903  0003  03E9  E900  FF5E  76FF  FF94  9276
0000071760  E39A  006D  2B00  89C0  9446  4689  8392  987E
0000072000  7500  E903  0006  468B  E998  00D4  681E  08C5
0000072020  468D  169A  9A50  094A  7219  C483  1E08  C968
0000072040  8D08  9A46  5016  049A  2A09  8372  08C4  681E
0000072060  08D8  468D  169A  9A50  0904  7241  C483  C408
0000072100  065E  FF26  6A37  6A00  8D06  9A46  5016  7E9A
0000072120  7451  8372  0AC4  4689  C498  065E  FF26  8307
0000072140  987E  7500  E903  0006  468B  E998  0072  3E83
0000072160  068C  7500  E903  0062  681E  08DB  468D  169A
0000072200  9A50  094A  7285  C483  1E08  DF68  8D08  9A46
0000072220  5016  049A  9609  8372  08C4  681E  08EF  468D
0000072240  169A  9A50  0904  72AD  C483  C408  065E  FF26
0000072260  6A37  6A00  8D07  9A46  5016  7E9A  6C51  8371
0000072300  0AC4  4689  C498  065E  FF26  8307  987E  7500
0000072320  E903  0006  468B  E998  0006  00B8  E900  0000
0000072340  5F5E  ED83  8B02  1FE5  4D5D  1ECB  9058  5545
0000072360  EC8B  8E1E  81D8  0AEC  5700  C756  FC46  0000
0000072400  681E  11EE  4D9A  0851  8373  04C4  7E83  0006
0000072420  0375  0EE9  9A00  523E  731E  4689  89F6  F856
0000072440  08E9  2B00  89C0  F846  4689  9AF6  5205  7344
0000072460  4689  C7FA  FC46  0000  3E83  11EA  7401  E903
0000072500  0020  3E83  11EC  7400  E903  0016  468D  16FC
0000072520  9A50  70E2  735A  C483  8904  FA46  468B  E9FA
0000072540  0153  468D  16FC  9A50  5C11  7389  C483  8904
0000072560  FA46  7E83  00FA  0375  06E9  8B00  FA46  34E9
0000072600  A001  11ED  E42A  E0E9  8D00  FC46  5016  36FF
0000072620  11EC  36FF  11EA  CB9A  A26B  8373  08C4  4689
0000072640  E9FA  00E3  76FF  6AFC  6A00  1E05  F268  9A08
0000072660  517E  73C9  C483  890A  FA46  7E83  00FA  0375
0000072700  03E9  E900  00C1  46FF  8DFC  FC46  5016  36FF
0000072720  11EC  36FF  11EA  CB9A  E46B  8373  08C4  4689
0000072740  E9FA  00A3  468D  16FC  FF50  EC36  FF11  EA36
0000072760  9A11  6E21  7405  C483  8908  FA46  88E9  A100
```

THU MAR 14 17:35:10 1991 FRAME.EXE PAGE 33, LINE 1889

| | | | | | | | | |
|---|---|---|---|---|---|---|---|---|
| 0000073000 | 11EA | 168B | 11EC | 42E9 | 8D00 | FC46 | 5016 | 006A |
| 0000073020 | 006A | 2C9A | 1D66 | 8374 | 08C4 | 4689 | E9FA | 0043 |
| 0000073040 | 468D | 16FC | 6A50 | 6800 | 00D2 | F79A | 9A67 | 8374 |
| 0000073060 | 08C4 | 4689 | E9FA | 002B | 46C7 | ADFA | FF01 | FA76 |
| 0000073100 | 269A | 0071 | E900 | 001B | 18E9 | 0B00 | 74D2 | E903 |
| 0000073120 | FFE6 | 062D | 7500 | E903 | FFAF | 7548 | E903 | FFC0 |
| 0000073140 | D5E9 | E9FF | 0021 | 1EE9 | 2D00 | 0028 | 0375 | 18E9 |
| 0000073160 | 48FF | 0375 | 2DE9 | 48FF | 037D | 82E9 | 48FF | 7F48 |
| 0000073200 | E903 | FF60 | 78E9 | 83FF | FA7E | 7500 | E903 | 0006 |
| 0000073220 | 468B | E9FA | 001F | 468B | 0BF8 | F646 | 0375 | 0EE9 |
| 0000073240 | FF00 | F876 | 76FF | 9AF6 | 529D | 7208 | C483 | B804 |
| 0000073260 | 0000 | 00E9 | 5E00 | 835F | 02ED | E58B | 5D1F | CB4D |
| 0000073300 | 581E | 4590 | 8B55 | 1EEC | D88E | EC81 | 0004 | 5657 |
| 0000073320 | 3E80 | 11EF | 743A | E903 | 000E | 06C6 | 11F0 | 1E00 |
| 0000073340 | EE68 | 9A11 | FFFF | 0000 | 681E | 0900 | 681E | 11EE |
| 0000073360 | 4A9A | F909 | 8374 | 08C4 | 06C7 | 11EA | 0001 | 06C7 |
| 0000073400 | 11EC | 0000 | 006A | DB9A | F772 | 8372 | 02C4 | 4689 |
| 0000073420 | 8BFC | FC46 | 00E9 | 5E00 | 835F | 02ED | E58B | 5D1F |
| 0000073440 | CB4D | 581E | 4590 | 8B55 | 1EEC | D88E | EC81 | 002E |
| 0000073460 | 5657 | 016A | 429A | 0059 | 8300 | 0A7E | 7401 | E903 |
| 0000073500 | 0009 | 7E83 | 000C | 0375 | 16E9 | 8B00 | 0846 | 460B |
| 0000073520 | 7406 | E903 | 0019 | 468B | 0B0C | 0A46 | 0374 | 0EE9 |
| 0000073540 | 9A00 | 74B0 | 75A0 | 4689 | 8BF4 | F446 | 7DE9 | 8302 |
| 0000073560 | 0A7E | 7406 | E903 | 0009 | 7E83 | 000C | 0375 | 12E9 |
| 0000073600 | 8300 | 0A7E | 7407 | E903 | 005E | 7E83 | 000C | 0374 |
| 0000073620 | 55E9 | 8300 | 0A7E | 7406 | E903 | 001C | 7E83 | 000C |
| 0000073640 | 0374 | 13E9 | 1E00 | 0168 | 1E09 | EE68 | 9A11 | 094A |
| 0000073660 | 75B3 | C483 | E908 | 0010 | 681E | 0910 | 681E | 11EE |
| 0000073700 | 4A9A | CA09 | 8375 | 08C4 | 468B | 8B0A | 0C56 | EAA3 |
| 0000073720 | 8911 | EC16 | 6A11 | 9A00 | 72DB | 75F2 | C483 | 8902 |
| 0000073740 | F446 | 468B | E9F4 | 0204 | 7E83 | 020A | 0374 | 39E9 |
| 0000073760 | 8300 | 0C7E | 7400 | E903 | 0030 | 468D | 16D4 | 9A50 |
| 0000074000 | 5431 | 762E | C483 | 8904 | F446 | 7E83 | 00F4 | 0375 |
| 0000074020 | 06E9 | 8B00 | F446 | D3E9 | 8D01 | D446 | 4689 | 8C06 |
| 0000074040 | 0856 | C02B | 4689 | 890C | 0A46 | 468B | 0B08 | 0646 |
| 0000074060 | 0375 | 35E9 | FF00 | 0876 | 76FF | 9A06 | 09AA | 7655 |
| 0000074100 | C483 | 3D04 | 0002 | 0374 | 1FE9 | C400 | 065E | 8026 |
| 0000074120 | 017F | 743A | E903 | 0012 | 681E | 0920 | 76FF | FF08 |
| 0000074140 | 0676 | 049A | 3409 | 8377 | 08C4 | 468B | 0B0C | 0A46 |
| 0000074160 | 0374 | 2AE9 | FF00 | 0876 | 76FF | 8D06 | 0A46 | 5016 |
| 0000074200 | A39A | 0048 | 8900 | F446 | 7E83 | 00F4 | 0375 | 0EE9 |
| 0000074220 | FF00 | F476 | AF9A | 0076 | 8B00 | F446 | 4DE9 | FF01 |
| 0000074240 | 0C76 | 76FF | 8D0A | F846 | 5016 | 219A | 0059 | 8900 |
| 0000074260 | F446 | 7E83 | 00F4 | 0375 | 0EE9 | FF00 | F476 | ED9A |
| 0000074300 | 0076 | 8B00 | F446 | 23E9 | 8A01 | 0D46 | E42A | 4689 |
| 0000074320 | 83F6 | F67E | 7D28 | E903 | 0011 | 7E83 | 2DF6 | 037C |
| 0000074340 | 08E9 | C700 | D246 | 0001 | 05E9 | C700 | D246 | 0000 |
| 0000074360 | 7E83 | 00D2 | 0374 | 0EE9 | 6800 | 01AD | 219A | 0077 |
| 0000074400 | B800 | 01AD | E5E9 | 8300 | F67E | 7428 | E903 | 002B |
| 0000074420 | 76FF | FF08 | 0676 | 76FF | FF0C | 0A76 | FF9A | 00FF |
| 0000074440 | 8900 | F446 | 7E83 | 00F4 | 0375 | 0EE9 | FF00 | F476 |
| 0000074460 | 319A | 0074 | 8B00 | F446 | B1E9 | FF00 | FA76 | 76FF |
| 0000074500 | 9AF8 | 09AA | 7748 | C483 | 3D04 | 0002 | 0373 | 30E9 |
| 0000074520 | 1E00 | EE68 | 9A11 | 09AA | 74E3 | C483 | 3D04 | 0002 |
| 0000074540 | 0373 | 1CE9 | C400 | F85E | EEA0 | 2611 | 0738 | 0375 |
| 0000074560 | 0EE9 | C600 | F006 | 0011 | 681E | 11EE | D49A | 0074 |
| 0000074600 | 8B00 | 0A46 | 568B | 390C | EA06 | 7411 | E903 | 0011 |
| 0000074620 | 1639 | 11EC | 0374 | 08E9 | C700 | FC46 | 0001 | 05E9 |
| 0000074640 | C700 | FC46 | 0000 | 76FF | FFFA | F876 | 681E | 11EE |

THU MAR 14 17:35:10 1991 FRAME.EXE PAGE 34, LINE 1948

| | | | | | | | | |
|---|---|---|---|---|---|---|---|---|
| 0000074660 | 4A9A | BB09 | 8377 | 08C4 | 468B | 8B0A | 0C56 | EAA3 |
| 0000074700 | 8911 | EC16 | FF11 | FC76 | DB9A | 5472 | 8375 | 02C4 |
| 0000074720 | 4689 | FFF4 | FA76 | 76FF | 9AF8 | 71E1 | 0000 | C02B |
| 0000074740 | 4689 | 89FA | F846 | 00B8 | E900 | 0000 | 5F5E | ED83 |
| 0000074760 | 8B02 | 1FE5 | 4D5D | 1ECB | 9058 | 5545 | EC8B | 8E1E |
| 0000075000 | 81D8 | 00EC | 5700 | A156 | 11EA | 168B | 11EC | 5EC4 |
| 0000075020 | 2606 | 0789 | 8926 | 0257 | 468B | 0B0C | 0A46 | 0375 |
| 0000075040 | 12E9 | 1E00 | EE68 | FF11 | 0C76 | 76FF | 9A0A | 094A |
| 0000075060 | 77A3 | C483 | 5E08 | 835F | 02ED | E58B | 5D1F | CB4D |
| 0000075100 | 581E | 4590 | 8B55 | 1EEC | D88E | EC81 | 020E | 5657 |
| 0000075120 | C02B | 4689 | 89F4 | F246 | 06C7 | 068A | 0000 | 146A |
| 0000075140 | A59A | 634C | 8378 | 02C4 | 06C7 | 12EE | 0015 | 156A |
| 0000075160 | 6C9A | 6D4C | 8378 | 02C4 | 166A | A59A | 774C | 8378 |
| 0000075200 | 02C4 | 176A | A59A | 814C | 8378 | 02C4 | 186A | A59A |
| 0000075220 | 034C | 8379 | 02C4 | 006A | 006A | 468D | 16F2 | 6A50 |
| 0000075240 | 8D00 | F28E | 16FD | 8D51 | F64E | 5116 | FF9A | 00FF |
| 0000075260 | 8900 | F846 | 7E83 | 00F8 | 0374 | 3AE9 | FF00 | F476 |
| 0000075300 | 76FF | 6AF2 | 1E03 | 2268 | 1E09 | 8C68 | 9A06 | FFFF |
| 0000075320 | 0000 | 4689 | 83F8 | F87E | 7500 | E903 | 0006 | 06C7 |
| 0000075340 | 068C | 0001 | 76FF | FFF4 | F276 | 006A | FF9A | 00FF |
| 0000075360 | 8900 | F846 | A6E9 | 8B00 | F846 | 8DE9 | FF00 | F676 |
| 0000075400 | 868D | FDF2 | 5016 | 681E | 0935 | 868D | FEF2 | 5016 |
| 0000075420 | 089A | 150A | 8379 | 0EC4 | 868D | FEF2 | 5016 | 681E |
| 0000075440 | 098B | DF9A | 334B | 8379 | 08C4 | 70E9 | FF00 | F676 |
| 0000075460 | 868D | FDF2 | 5016 | 681E | 0996 | 868D | FEF2 | 5016 |
| 0000075500 | 089A | 450A | 8379 | 0EC4 | 868D | FEF2 | 5016 | 681E |
| 0000075520 | 09E2 | DF9A | 5D4B | 8379 | 08C4 | 40E9 | FF00 | F876 |
| 0000075540 | 681E | 09ED | 868D | FEF2 | 5016 | 089A | 6F0A | 8379 |
| 0000075560 | 0AC4 | 868D | FEF2 | 5016 | 681E | 0A0E | DF9A | B24B |
| 0000075600 | 8379 | 08C4 | 16E9 | E900 | 0013 | 082D | 7500 | E903 |
| 0000075620 | FF9B | B72D | 7501 | E903 | FF63 | C0E9 | 1EFF | 1968 |
| 0000075640 | 8D0A | FA46 | 5016 | 719A | 0076 | 8900 | F846 | 7E83 |
| 0000075660 | 00F8 | 0375 | 16E9 | 6A00 | 6A00 | 6A00 | 6A00 | 9A00 |
| 0000075700 | 7512 | 79CA | C483 | 8908 | F846 | 15E9 | FF00 | FC76 |
| 0000075720 | 76FF | 6AFA | 6A00 | 9A00 | 7512 | 7820 | C483 | 8908 |
| 0000075740 | F846 | 006A | 259A | 0075 | B800 | 0000 | 00E9 | 5E00 |
| 0000075760 | 835F | 02ED | E58B | 5D1F | CB4D | 0069 | 0103 | 6657 |
| 0000076000 | 0003 | 006B | 0002 | 2E09 | 0001 | 0000 | 0103 | 4903 |
| 0000076020 | 0002 | 00F6 | 0103 | 4A96 | 0002 | 00F7 | 0002 | 1D3F |
| 0000076040 | 0002 | 0000 | 0103 | 4960 | 0002 | 007A | 0002 | 08C9 |
| 0000076060 | 0003 | 0000 | 0103 | 01FA | 0001 | 0005 | 0103 | 513B |
| 0000076100 | 0002 | 007D | 0103 | 5063 | 0002 | 007E | 0103 | 5458 |
| 0000076120 | 0002 | 007F | 0103 | 0045 | 0001 | 0008 | 0103 | 1BF5 |
| 0000076140 | 0001 | 008A | 0103 | 58AF | 0001 | 000A | 0103 | 4947 |
| 0000076160 | 0002 | 0003 | 0002 | 4F4A | 0005 | 0000 | 0103 | 08AB |
| 0000076200 | 0001 | 008C | 0103 | 08CD | 0001 | 008D | 0103 | 088B |
| 0000076220 | 0001 | 008E | 0103 | 516F | 0002 | 0086 | 0103 | 5034 |
| 0000076240 | 0002 | 0087 | 0103 | 4A80 | 0002 | 0007 | 0103 | 49AB |
| 0000076260 | 0002 | 0088 | 0103 | 55A3 | 0002 | 0008 | 0103 | 2D8E |
| 0000076300 | 0001 | 0090 | 0103 | 5517 | 0002 | 000A | 0103 | 4C49 |
| 0000076320 | 0002 | 008B | 0103 | 4BD0 | 0002 | 000D | 0103 | 3DEE |
| 0000076340 | 0003 | 0006 | 0103 | 4BBE | 0002 | 000E | 0005 | 365F |
| 0000076360 | 0001 | 347F | 0103 | 4581 | 0003 | 0007 | 0103 | 4FAD |
| 0000076400 | 0002 | 0010 | 0103 | 60B4 | 0003 | 0008 | 0103 | 3033 |
| 0000076420 | 0004 | 0001 | 0103 | 59B8 | 0003 | 0009 | 0103 | 49D9 |
| 0000076440 | 0002 | 0013 | 0103 | 36E4 | 0002 | 0115 | 0103 | 61AC |
| 0000076460 | 0003 | 000D | 0103 | 5FD4 | 0003 | 000E | 0105 | 1433 |
| 0000076500 | 0001 | 0087 | 0103 | 7685 | 0004 | 0008 | 0103 | 58CA |
| 0000076520 | 0001 | 0020 | 0105 | 0DB5 | 0001 | 0088 | 0103 | 0828 |

THU MAR 14 17:35:10 1991 FRAME.EXE PAGE 35, LINE 2007

| | | | | | | | | |
|---|---|---|---|---|---|---|---|---|
| 0000076540 | 0001 | 0022 | 0103 | 4B04 | 0002 | 001A | 0103 | 2F9E |
| 0000076560 | 0004 | 000B | 0103 | 776D | 0003 | 0013 | 0103 | 1D44 |
| 0000076600 | 0001 | 0026 | 0103 | 4874 | 0003 | 0017 | 0103 | 6294 |
| 0000076620 | 0003 | 0019 | 0103 | 78DD | 0003 | 001A | 0103 | 3C25 |
| 0000076640 | 0003 | 0023 | 0103 | 35A8 | 0002 | 00AD | 0103 | 3576 |
| 0000076660 | 0002 | 002D | 0103 | 77CA | 0003 | 0025 | 0103 | 35B9 |
| 0000076700 | 0002 | 002E | 0103 | 789D | 0003 | 0026 | 0103 | 79D5 |
| 0000076720 | 0004 | 001F | 0103 | 4B20 | 0002 | 002F | 0103 | 361A |
| 0000076740 | 0002 | 00B2 | 0103 | 1A89 | 0001 | 003A | 0103 | 2FA9 |
| 0000076760 | 0004 | 0023 | 0103 | 50D2 | 0002 | 00B3 | 0103 | 560E |
| 0000077000 | 0001 | 003B | 0103 | 70FF | 0003 | 002B | 0103 | 78BE |
| 0000077020 | 0003 | 002C | 0103 | 7997 | 0003 | 002E | 0103 | 770D |
| 0000077040 | 0003 | 002F | 0203 | 3644 | 0005 | 0020 | 0103 | 40BC |
| 0000077060 | 0003 | 0030 | 0005 | 4F15 | 0001 | 4D29 | 0103 | 416D |
| 0000077100 | 0003 | 0032 | 0103 | 491E | 0002 | 003A | 0103 | 4A8B |
| 0000077120 | 0002 | 003B | 0103 | 4D06 | 0002 | 003D | 0103 | 6BFD |
| 0000077140 | 0003 | 0035 | 0103 | 55FD | 0001 | 0046 | 0103 | 2E37 |
| 0000077160 | 0001 | 0047 | 0103 | 2F3E | 0001 | 0048 | 0103 | 368F |
| 0000077200 | 0002 | 0041 | 0103 | 2DD2 | 0001 | 004B | 0103 | 36A7 |
| 0000077220 | 0002 | 0044 | 0103 | 6F7F | 0001 | 004C | 0103 | 0105 |
| 0000077240 | 0001 | 004D | 0103 | 59F6 | 0002 | 0045 | 0103 | 301A |
| 0000077260 | 0003 | 0040 | 0005 | 512D | 0001 | 4F38 | 0103 | 2F4E |
| 0000077300 | 0001 | 0051 | 0103 | 00ED | 0001 | 0055 | 0103 | 59DE |
| 0000077320 | 0002 | 004D | 0103 | 6EDC | 0003 | 0046 | 0103 | 45A9 |
| 0000077340 | 0003 | 0048 | 0103 | 0131 | 0001 | 0059 | 0103 | 497E |
| 0000077360 | 0002 | 0057 | 0103 | 6822 | 0003 | 004F | 0103 | 6475 |
| 0000077400 | 0003 | 0050 | 0103 | 4737 | 0003 | 0054 | 0103 | 6A0F |
| 0000077420 | 0003 | 0056 | 0103 | 6E43 | 0003 | 0057 | 0103 | 769B |
| 0000077440 | 0003 | 0058 | 0103 | 40EE | 0003 | 005F | 0103 | 2FC1 |
| 0000077460 | 0003 | 0060 | 0103 | 62F5 | 0003 | 0061 | 0103 | 5C6D |
| 0000077500 | 0003 | 0063 | 0000 | 0000 | 0000 | 0000 | 0000 | 0000 |
| 0000077520 | 0000 | 0000 | 1500 | 0000 | 0000 | 0000 | 0000 | 0000 |
| 0000077540 | 0000 | 0000 | 0000 | 0000 | 0000 | 0000 | 0000 | 0000 |
| * | | | | | | | | |
| 0000077620 | 0000 | 0000 | 0200 | 0000 | 0000 | 0000 | 0000 | 0000 |
| 0000077640 | 0000 | 0000 | 0000 | 0000 | 0000 | 0000 | 0000 | 0000 |
| * | | | | | | | | |
| 0000077720 | 0000 | 0000 | 0200 | 0000 | 0000 | 0000 | 0000 | 0000 |
| 0000077740 | 0000 | 0000 | 0000 | 0000 | 0000 | 0000 | 0000 | 0000 |
| * | | | | | | | | |
| 0000100020 | 0000 | 0000 | 0200 | 0000 | 0000 | 0000 | 0000 | 0000 |
| 0000100040 | 0000 | 0000 | 0000 | 0000 | 534D | 5220 | 6E75 | 542D |
| 0000100060 | 6D69 | 2065 | 694C | 7262 | 7261 | 2079 | 202D | 6F43 |
| 0000100100 | 7970 | 6972 | 6867 | 2074 | 6328 | 2029 | 3931 | 3039 |
| 0000100120 | 202C | 694D | 7263 | 736F | 666F | 2074 | 6F43 | 7072 |
| 0000100140 | 0018 | 0000 | 0000 | 0000 | 0000 | 0006 | 0000 | 0000 |
| 0000100160 | 0000 | 0005 | 0000 | 0000 | 0000 | 0000 | 0000 | 0000 |
| 0000100200 | 0000 | 0000 | 435F | 465F | 4C49 | 5F45 | 4E49 | 4F46 |
| 0000100220 | 003D | 0001 | FFFF | 0000 | 0000 | 0000 | 0000 | 0000 |
| 0000100240 | 0000 | 0000 | 0000 | 0000 | 0001 | 0100 | 8181 | 0081 |
| 0000100260 | 0000 | 0000 | 0000 | 0000 | 0000 | 0000 | 0000 | 0000 |
| * | | | | | | | | |
| 0000100640 | 0000 | 0000 | 0000 | 0000 | 0000 | 0000 | 0A0A | 0A0A |
| 0000100660 | 0A0A | 0A0A | 0A0A | 0A0A | 0A0A | 0A0A | 0A0A | 0A0A |
| * | | | | | | | | |
| 0000101240 | 0A0A | 0A0A | 0A0A | 0A0A | 0A0A | 0A0A | 0000 | 0000 |
| 0000101260 | 0000 | 0000 | 0000 | 0000 | 0000 | 0000 | FFFF | 0000 |
| 0000101300 | 0000 | 0000 | 0000 | 0000 | 0000 | 0000 | 0000 | 0000 |
| 0000101320 | 0000 | 0000 | 0003 | 2000 | 6554 | 7473 | 7552 | 6E6E |

THU MAR 14 17:35:10 1991 FRAME.EXE PAGE 36, LINE 2066

| | | | | | | | | |
|---|---|---|---|---|---|---|---|---|
| 0000101340 | 7265 | 4100 | 656C | 0078 | 4D54 | 6920 | 2073 | 6C61 |
| 0000101360 | 6572 | 6461 | 2079 | 7572 | 6E6E | 6E69 | 2067 | 7528 |
| 0000101400 | 6573 | 5420 | 2D4D | 4C43 | 534F | 2045 | 6F74 | 4320 |
| 0000101420 | 6F6C | 6573 | 5420 | 7365 | 2074 | 614D | 616E | 6567 |
| 0000101440 | 2972 | 002E | 6E49 | 6F76 | 656B | 5420 | 004D | 6C4F |
| 0000101460 | 2064 | 5243 | 2056 | 7250 | 636F | 7365 | 2073 | 7369 |
| 0000101500 | 5520 | 6573 | 0064 | 6E49 | 6F76 | 656B | 5420 | 004D |
| 0000101520 | 6C47 | 626F | 6C61 | 4620 | 6C69 | 6574 | 7372 | 4700 |
| 0000101540 | 6F6C | 6162 | 206C | 6F50 | 6E69 | 6574 | 7372 | 4800 |
| 0000101560 | 6C65 | 2070 | 6F6E | 2074 | 6579 | 2074 | 6D69 | 6C70 |
| 0000101600 | 6D65 | 6E65 | 6574 | 0064 | 6554 | 7473 | 7552 | 6E6E |
| 0000101620 | 7265 | 0000 | FFFE | FFFF | 7766 | 4400 | 206F | 6F79 |
| 0000101640 | 2075 | 6572 | 6C61 | 796C | 7720 | 6E61 | 2074 | 6F74 |
| 0000101660 | 6520 | 6978 | 2074 | 6554 | 7473 | 7552 | 6E6E | 7265 |
| 0000101700 | 003F | 6554 | 7473 | 7552 | 6E6E | 7265 | 0000 | 0920 |
| 0000101720 | 000A | 0920 | 000A | 0920 | 000A | 7243 | 6165 | 6574 |
| 0000101740 | 2000 | 4E00 | 7765 | 0020 | 6F46 | 646C | 7265 | 4600 |
| 0000101760 | 6C6F | 6564 | 0072 | 6554 | 7473 | 5400 | 7365 | 0074 |
| 0000102000 | 6554 | 7473 | 4320 | 7361 | 0065 | 6554 | 7473 | 4320 |
| 0000102020 | 7361 | 0065 | 6554 | 7473 | 5220 | 7365 | 6C75 | 7374 |
| 0000102040 | 5400 | 7365 | 2074 | 6552 | 7573 | 746C | 0073 | 6E20 |
| 0000102060 | 6D61 | 2065 | 003A | 4400 | 6C65 | 7465 | 0065 | 6544 |
| 0000102100 | 656C | 6574 | 6F20 | 6A62 | 6365 | 2074 | 003A | 4400 |
| 0000102120 | 6C65 | 7465 | 2065 | 6C61 | 206C | 626F | 656A | 7463 |
| 0000102140 | 2073 | 6E75 | 6564 | 2072 | 7553 | 7462 | 6572 | 2065 |
| 0000102160 | 2522 | 2273 | 3F20 | 5400 | 7365 | 5274 | 6E75 | 656E |
| 0000102200 | 0072 | 005C | 764F | 7265 | 7277 | 7469 | 2065 | 2220 |
| 0000102220 | 7325 | 2022 | 203F | 5400 | 7365 | 5274 | 6E75 | 656E |
| 0000102240 | 0072 | 7243 | 6165 | 6574 | 5420 | 6572 | 0065 | 7243 |
| 0000102260 | 6165 | 6574 | 5420 | 6572 | 2065 | 6E6F | 6420 | 6972 |
| 0000102300 | 6576 | 3A20 | 0000 | 6552 | 6F6D | 6576 | 5420 | 6572 |
| 0000102320 | 0065 | 6552 | 6F6D | 6576 | 5420 | 6572 | 2065 | 7266 |
| 0000102340 | 6D6F | 6420 | 6972 | 6576 | 3A20 | 0000 | 6544 | 656C |
| 0000102360 | 6574 | 6120 | 6C6C | 6F20 | 6A62 | 6365 | 7374 | 7520 |
| 0000102400 | 646E | 7265 | 5420 | 6572 | 2065 | 2522 | 2273 | 3F20 |
| 0000102420 | 5400 | 7365 | 5274 | 6E75 | 656E | 0072 | 002E | 6554 |
| 0000102440 | 7473 | 7552 | 6E6E | 7265 | 5400 | 7365 | 5274 | 6E75 |
| 0000102460 | 656E | 0072 | 0000 | 0000 | 0000 | 0000 | 0000 | 0000 |
| 0000102500 | 6548 | 706C | 6E20 | 746F | 7920 | 7465 | 6920 | 706D |
| 0000102520 | 656C | 656D | 746E | 6465 | 4800 | 6C65 | 2070 | 6F6E |
| 0000102540 | 2074 | 6579 | 2074 | 6D69 | 6C70 | 6D65 | 6E65 | 6574 |
| 0000102560 | 0064 | 6F43 | 7970 | 4D00 | 766F | 0065 | 6548 | 706C |
| 0000102600 | 6E20 | 746F | 7920 | 7465 | 6920 | 706D | 656C | 656D |
| 0000102620 | 746E | 6465 | 4300 | 706F | 2079 | 202F | 6F4D | 6576 |
| 0000102640 | 4800 | 6C65 | 2070 | 6F6E | 2074 | 6579 | 2074 | 6D69 |
| 0000102660 | 6C70 | 6D65 | 6E65 | 6574 | 0064 | 6F43 | 7970 | 2F20 |
| 0000102700 | 4D20 | 766F | 0065 | 5B20 | 0020 | 5B20 | 0020 | 5B20 |
| 0000102720 | 0020 | 705C | 7069 | 5C65 | 7325 | 755F | 0070 | 4D54 |
| 0000102740 | 4300 | 5652 | 6300 | 7672 | 6300 | 7672 | 7400 | 006D |
| 0000102760 | 6D74 | 5400 | 004D | 694B | 6C6C | 6E69 | 2067 | 4D54 |
| 0000103000 | 7720 | 6C69 | 206C | 6964 | 6373 | 7261 | 2064 | 6E61 |
| 0000103020 | 2079 | 6E75 | 6173 | 6576 | 2064 | 6164 | 6174 | 202E |
| 0000103040 | 6F44 | 7920 | 756F | 7720 | 6E61 | 2074 | 6F74 | 6520 |
| 0000103060 | 646E | 6920 | 2074 | 003F | 694B | 6C6C | 5420 | 004D |
| 0000103100 | 5243 | 0056 | 5054 | 4300 | 6D6F | 756D | 696E | 6163 |
| 0000103120 | 6974 | 6E6F | 5020 | 6F72 | 6C62 | 6D65 | 202E | 6C50 |
| 0000103140 | 6165 | 6573 | 7520 | 6573 | 7420 | 6568 | 5420 | 204D |
| 0000103160 | 704F | 6E65 | 4320 | 6D6F | 616D | 646E | 4F00 | 6570 |
| 0000103200 | 206E | 6554 | 7473 | 4F00 | 646C | 4320 | 5652 | 5020 |

THU MAR 14 17:35:10 1991 FRAME.EXE PAGE 37, LINE 2125

```
0000103220  6F72  6563  7373  6920  2073  7355  6465  4F00
0000103240  6570  206E  6554  7473  0000  0000  0001  2020
0000103260  2020  2020  2020  2E20  002E  4C46  2044  2020
0000103300  0020  5354  2054  2020  0020  5845  2050  2020
0000103320  0020  4354  2020  2020  2020  5200  5345  2020
0000103340  2020  4900  474D  2020  2020  5300  434E  2020
0000103360  2020  4600  5254  2020  2020  5000  5254  2020
0000103400  2020  3F00  203F  2020  2020  0020  7325  3025
0000103420  6432  252D  3230  2D64  3025  6432  2020  3025
0000103440  6432  253A  3230  3A64  3025  6432  2020  4600
0000103460  444C  2020  2020  5400  5453  2020  2020  4500
0000103500  5058  2020  2020  5400  2043  2020  2020  0020
0000103520  4552  2053  2020  0020  4D49  2047  2020  0020
0000103540  4E53  2043  2020  0020  5446  2052  2020  0020
0000103560  5450  2052  2020  0020  3F3F  2020  2020  2020
0000103600  2500  2573  3230  2D64  3025  6432  252D  3230
0000103620  2064  2520  3230  3A64  3025  6432  2020  2000
0000103640  2020  2020  2020  2020  2020  2020  2020  2020
0000103660  2020  2020  2020  2020  2020  2020  2020  0020
0000103700  2020  2D2D  452D  7272  726F  2D2D  202D  2000
0000103720  2020  2020  2020  2020  2020  2020  2D2D  002D
0000103740  2020  2020  2020  2020  2020  2020  2020  2020
*
0000104000  4600  444C  2020  2020  5400  5453  2020  2020
0000104020  4500  5058  2020  2020  5400  2043  2020  2020
0000104040  0020  4552  2053  2020  0020  4D49  2047  2020
0000104060  0020  4E53  2043  2020  0020  5446  2052  2020
0000104100  0020  5450  2052  2020  0020  3F3F  2020  2020
0000104120  2020  4500  7078  6365  6574  2064  6144  6174
0000104140  5400  4C53  2020  2020  6353  6972  7470  2000
0000104160  205B  2000  005D  2020  2020  2020  2020  2020
0000104200  2020  2020  2020  2020  2020  2020  2020  2020
0000104220  2020  2020  2020  2000  2020  2020  2020  2020
0000104240  2020  2020  2020  2020  2020  2020  2020  2520
0000104260  756C  2F20  2520  756C  2000  2020  2020  2020
0000104300  2020  2020  2020  2020  2020  2020  2020  2020
0000104320  2020  2020  2020  2020  0020  4B20  0042  5B20
0000104340  0020  5D20  2000  205B  4700  6F6C  6162  206C
0000104360  6946  746C  7265  0073  5D20  2000  205B  4700
0000104400  6F6C  6162  206C  6F50  6E69  6574  7372  2000
0000104420  005D  5354  204C  2020  5320  7263  7069  0074
0000104440  4700  6F6C  6162  206C  6946  746C  7265  0073
0000104460  6C47  626F  6C61  5020  696F  746E  7265  0073
0000104500  005C  3154  3332  555F  4643  5F47  4F50  4E49
0000104520  4554  5352  4300  6E6F  6966  7567  6172  6974
0000104540  6E6F  6620  6C69  3A65  5320  6E79  6174  2078
0000104560  7265  6F72  2072  6F66  6E75  2064  6E69  6320
0000104600  6E6F  6966  7567  6172  6974  6E6F  6620  6C69
0000104620  2065  2220  7325  2022  6C20  6E69  2065  756E
0000104640  626D  7265  203A  7525  0A20  5400  7365  5274
0000104660  6E75  656E  0072  6F43  666E  6769  7275  7461
0000104700  6F69  206E  6966  656C  203A  6146  6C69  6465
0000104720  7420  206F  706F  6E65  6920  636E  756C  6564
0000104740  6620  6C69  2065  6E69  2020  2522  2273  2020
0000104760  696C  656E  6E20  6D75  6562  3A72  2520  2075
0000105000  000A  6554  7473  7552  6E6E  7265  4300  6E6F
0000105020  6966  7567  6172  6974  6E6F  6620  6C69  2065
0000105040  7245  6F72  2072  203A  2520  2075  000A  6554
0000105060  7473  7552  6E6E  7265  2E00  0000  0006  0600
```

```
THU MAR 14 17:35:10 1991  FRAME.EXE  PAGE 38, LINE 2184

0000105100  0100  0000  0010  0603  0600  1002  4504  4545
0000105120  0505  0505  3505  0030  0050  0000  2000  3020
0000105140  5850  0807  3000  3030  5057  0007  2000  0020
0000105160  0000  0000  6008  6060  6060  0060  7000  7870
0000105200  7878  0878  0807  0000  0007  0808  0008  0800
0000105220  0800  0000  2808  756E  6C6C  0629  0000  0000
0000105240  0000  0000  0000  0000  0000  0000  0000  0000
0000105260  5A54  0000  5350  0054  4450  0054  7080  0000
0000105300  0001  0A94  0AA8  0A98  FFFF  7553  4D6E  6E6F
0000105320  7554  5765  6465  6854  4675  6972  6153  0074
0000105340  614A  466E  6265  614D  4172  7270  614D  4A79
0000105360  6E75  754A  416C  6775  6553  4F70  7463  6F4E
0000105400  4476  6365  0000  FFFF  FFFF  0000  0AF2  0000
0000105420  0000  FFFF  0001  0000  0000  0000  0000  0000
0000105440  0102  0000  0000  0000  0000  0000  0202  0000
0000105460  0000  0000  0000  0000  0000  0000  0000  0000
*
0000106340  0000  0000  0000  0000  0000  0001  0200  0000
0000106360  0000  0000  0000  0000  0000  0000  0000  0000
*
0000107300  0000  0000  0000  0000  0000  0CBE  0AA4  02B6
0000107320  FFFF  02B6  0EB0  02B6  0EB4  02B6  0EB8  02B6
0000107340  0EBC  02B6  0EC0  0000  0000  0101  2000  2020
0000107360  2020  2020  2020  2828  2828  2028  2020  2020
0000107400  2020  2020  2020  2020  2020  2020  4820  1010
0000107420  1010  1010  1010  1010  1010  1010  8410  8484
0000107440  8484  8484  8484  1084  1010  1010  1010  8181
0000107460  8181  8181  0101  0101  0101  0101  0101  0101
0000107500  0101  0101  0101  0101  1010  1010  1010  8282
0000107520  8282  8282  0202  0202  0202  0202  0202  0202
0000107540  0202  0202  0202  0202  1010  1010  0020  0000
0000107560  0000  0000  0000  0000  0000  0000  0000  0000
*
0000107740  0000  0000  0000  0000  0000  0000  0000  0003
0000107760  FFFF  001E  003B  005A  0078  0097  00B5  00D4
0000110000  00F3  0111  0130  014E  016D  FFFF  001E  003A
0000110020  0059  0077  0096  00B4  00D3  00F2  0110  012F
0000110040  014D  016C  4150  4854  5C00  0000  0000  4F43
0000110060  534D  4550  0043  6D63  2E64  7865  0065  6F63
0000110100  6D6D  6E61  2E64  6F63  006D  4150  4854  2E00
0000110120  7865  0065  632E  6D6F  2E00  6D63  0064  622E
0000110140  7461  2E00  005C  0000  102F  1034  005C  632F
0000110160  0020  0002  0000  0000  0000  0000  0000  0000
0000110200  0000  0000  2778  0EC4  3C3C  4D4E  4753  3E3E
0000110220  0000  3652  3030  0D30  2D0A  7320  6174  6B63
0000110240  6F20  6576  6672  6F6C  0D77  000A  0003  3652
0000110260  3030  0D33  2D0A  6920  746E  6765  7265  6420
0000110300  7669  6469  2065  7962  3020  0A0D  0800  5200
0000110320  3036  3830  0A0D  202D  6F6E  2074  6E65  756F
0000110340  6867  7320  6170  6563  6620  726F  6120  6772
0000110360  6D75  6E65  7374  0A0D  0900  5200  3036  3930
0000110400  0A0D  202D  6F6E  2074  6E65  756F  6867  7320
0000110420  6170  6563  6620  726F  6520  766E  7269  6E6F
0000110440  656D  746E  0A0D  FC00  0D00  000A  00FF  7572
0000110460  2D6E  6974  656D  6520  7272  726F  0020  0002
0000110500  3652  3030  0D32  2D0A  6620  6F6C  7461  6E69
0000110520  2D67  6F70  6E69  2074  7573  7070  726F  2074
0000110540  6F6E  2074  6F6C  6461  6465  0A0D  0100  5200
0000110560  3036  3130  0A0D  202D  756E  6C6C  7020  696F
```

```
THU MAR 14 17:35:10 1991  FRAME.EXE  PAGE 39, LINE 2243

0000110600  746E  7265  6120  7373  6769  6D6E  6E65  0D74
0000110620  000A  0011  3652  3130  0D37  2D0A  7520  656E
0000110640  7078  6365  6574  2064  756D  746C  7469  7268
0000110660  6165  2064  6F6C  6B63  6520  7272  726F  0A0D
0000110700  1000  5200  3036  3631  0A0D  202D  6F6E  2074
0000110720  6E65  756F  6867  7320  6170  6563  6620  726F
0000110740  7420  7268  6165  2064  6164  6174  0A0D  FF00
0000110760  FFFF  0003  0002  1066  0001  0000  0002  0AEC
0000111000  0004  0000  0002  0EAC  0005  0000  0000  0000
0000111020  4349  0120  0000  0010  0010  0020  0000  000C
0000111040  0000  0020  0040  0001  0001  0000  FF00  FFFF
0000111060  FFFF  FFFF  C93C  2093  C93C  2793  C93C  2793
0000111100  C93C  2793  180C  2113  C93C  2790  C93C  2790
0000111120  C93C  2793  1C04  A037  FFFF  FFFF  0000  0000
0000111140  0000  0000  FF3F  00FE  FF3F  00FE  D03B  C08E
0000111160  D73B  C0F6  D73B  D8F6  D93B  D8CE  DE3B  D8F6
0000111200  963B  D8F6  D920  D88E  FF3F  D8FE  FF3F  D8FE
0000111220  FF3F  D8FE  E01F  D800  DF0F  D8FF  3800  1800
0000111240  F703  F8FF  0E00  0000  FC00  0000  0000  0000
0000111260  0000  0000  0000  0000  0000  0000  0000  0000
*
0000111320  0000  0000  0000  0000  0000  0000  FFFF  FFFF
0000111340  0080  FF00  0080  FF00  0080  1F00  0080  1F00
0000111360  0080  0300  0080  0300  0080  0300  0080  0300
*
0000111420  0080  0300  0080  0300  00E0  0300  00F0  0300
0000111440  00F8  0300  00FC  0300  01FE  FFFF  03FF  FFFF
0000111460  0202  0000  0352  0004  0005  0011  0000  FFFF
0000111500  437E  6E6F  7274  6C6F  5200  0000  5200  0403
0000111520  0600  0100  0000  2800  5400  204D  497E  766E
0000111540  6B6F  0065  0001  0000  0029  4D54  7E20  6C43
0000111560  736F  0065  0004  4000  FFFF  0001  0000  002A
0000111600  4D54  7E20  694B  6C6C  0400  0000  FF40  01FF
0000111620  0000  5A00  4500  787E  7469  1100  0000  FF00
0000111640  7EFF  624F  656A  7463  9100  0000  5200  0403
0000111660  0500  1100  0000  FF00  7EFF  654E  0077  0041
0000111700  0000  0352  0004  0003  0001  0000  000A  467E
0000111720  6C6F  6564  2E72  2E2E  0100  0000  0B00  7E00
0000111740  6554  7473  2E2E  002E  0001  0000  000D  6554
0000111760  7473  7E20  6552  7573  746C  2E73  2E2E  0100
0000112000  0000  0900  7E00  704F  6E65  0100  0000  0E00
0000112020  7E00  6544  656C  6574  2E2E  002E  0001  0000
0000112040  000F  437E  706F  2E79  2E2E  0100  0000  1000
0000112060  7E00  6F4D  6576  2E2E  002E  0011  0000  FFFF
0000112100  567E  6569  0077  0063  0000  0352  0004  0002
0000112120  0001  2000  0014  447E  7465  6961  656C  0064
0000112140  0011  0000  FFFF  537E  726F  2074  7942  3A00
0000112160  0000  5200  0403  0400  0100  0000  1520  7E00
0000112200  614E  656D  0100  0000  1620  7E00  7954  6570
0000112220  0100  0000  1720  7E00  6144  6574  0100  0000
0000112240  1820  7E00  6953  657A  1100  0000  FF00  7EFF
0000112260  7455  6C69  7469  6569  0073  0069  0000  0352
0000112300  0004  0005  0001  0000  001E  437E  6572  7461
0000112320  2065  7254  6565  2E2E  002E  0001  0000  001F
0000112340  527E  6D65  766F  2065  7254  6565  2E2E  002E
0000112360  0001  4000  0020  427E  6361  756B  2E70  2E2E
0000112400  0100  0000  2140  7E00  6C43  6165  2E6E  2E2E
0000112420  0100  0000  2240  7E00  6552  6F63  6576  2E72
0000112440  2E2E  8000  0002  6300  4600  3D31  487E  6C65
```

THU MAR 14 17:35:10 1991 FRAME.EXE PAGE 40, LINE 2302

| | | | | | | | | |
|---|---|---|---|---|---|---|---|---|
| 0000112460 | 0070 | 0000 | 0000 | 0000 | 0000 | 0000 | 0000 | 0000 |
| 0000112500 | 00C0 | 0000 | 0352 | 000E | 0001 | FFFF | 0000 | 0000 |
| 0000112520 | 0001 | 0000 | 0001 | 0003 | 00A4 | 0000 | 8000 | 003C |
| 0000112540 | 0023 | 010E | 00A0 | 0000 | FFFF | 00A7 | 0000 | 0003 |
| 0000112560 | 000A | 00AB | 0000 | 00B6 | 0000 | 8000 | 0000 | 0000 |
| 0000112600 | 010E | 00AC | 0008 | FFFF | 00B7 | 0000 | 0000 | 0000 |
| 0000112620 | 0006 | 0000 | 00BB | 000C | 8002 | 000F | 0089 | 00D7 |
| 0000112640 | 0008 | 04B2 | FFFF | FFFF | 0000 | 0000 | 0000 | 0003 |
| 0000112660 | 0002 | 00BC | 0400 | 8002 | 00EB | 0087 | 0016 | 000C |
| 0000112700 | 04B4 | FFFF | FFFF | 0000 | 0000 | 0000 | 0007 | 0000 |
| 0000112720 | 00BF | 0000 | 8000 | 000F | 0014 | 00F0 | 006E | 04B3 |
| 0000112740 | FFFF | FFFF | 00FF | 3F00 | 0048 | 5400 | 7365 | 5274 |
| 0000112760 | 6E75 | 656E | 0072 | 0000 | 0000 | 0000 | 4B4F | 0000 |
| 0000113000 | 00D8 | 0000 | 0352 | 000E | 0001 | FFFF | 0000 | 0000 |
| 0000113020 | 0005 | 0000 | 0001 | 0000 | 00C2 | 0090 | 9400 | 000F |
| 0000113040 | 002D | 00B4 | 003C | 03E8 | FFFF | 00C3 | 0000 | 0000 |
| 0000113060 | 0000 | 0005 | 0000 | 00C7 | 0001 | 8001 | 000A | 002D |
| 0000113100 | 00A0 | 0008 | 03E9 | FFFF | FFFF | 0000 | 0000 | 0000 |
| 0000113120 | 0006 | 0000 | 00C8 | 000C | 8002 | 000A | 0019 | 00A0 |
| 0000113140 | 0008 | 03EA | FFFF | FFFF | 0000 | 0000 | 0000 | 0003 |
| 0000113160 | 0002 | 00C9 | 0400 | 8002 | 0014 | 0002 | 0026 | 000C |
| 0000113200 | 0001 | FFFF | FFFF | 0000 | 0000 | 0000 | 0003 | 0006 |
| 0000113220 | 00CC | 0000 | 8002 | 0046 | 0002 | 0026 | 000C | 0002 |
| 0000113240 | FFFF | FFFF | 0000 | 0000 | 0000 | 0003 | 0004 | 00D3 |
| 0000113260 | 0000 | 8002 | 0078 | 0002 | 0026 | 000C | 03EB | FFFF |
| 0000113300 | FFFF | 0100 | 0000 | 0000 | 4F00 | 004B | 6143 | 636E |
| 0000113320 | 6C65 | 4800 | 6C65 | 0070 | 0000 | 0000 | 0000 | 0000 |
| 0000113340 | 0120 | 0000 | 0352 | 000E | 0001 | FFFF | 0000 | 0000 |
| 0000113360 | 0007 | 0000 | 0001 | 0000 | 00FE | 0090 | 9400 | 000F |
| 0000113400 | 002D | 00B4 | 0041 | 044C | FFFF | 00FF | 0000 | 0000 |
| 0000113420 | 0000 | 0005 | 0006 | 0103 | 0101 | 8001 | 0005 | 002D |
| 0000113440 | 0023 | 0008 | 044D | FFFF | FFFF | 0000 | 0000 | 0000 |
| 0000113460 | 0006 | 0000 | 010A | 000C | 8002 | 002D | 002D | 007D |
| 0000113500 | 0008 | 044E | FFFF | FFFF | 0000 | 0000 | 0000 | 0005 |
| 0000113520 | 0004 | 010B | 0101 | 8001 | 0005 | 0019 | 0023 | 0008 |
| 0000113540 | 044F | FFFF | FFFF | 0000 | 0000 | 0000 | 0006 | 0000 |
| 0000113560 | 0110 | 000C | 8002 | 002D | 0019 | 007D | 0008 | 0450 |
| 0000113600 | FFFF | FFFF | 0000 | 0000 | 0000 | 0003 | 0002 | 0111 |
| 0000113620 | 0400 | 8002 | 0014 | 0002 | 0026 | 000C | 0001 | FFFF |
| 0000113640 | FFFF | 0000 | 0000 | 0000 | 0003 | 0006 | 0114 | 0000 |
| 0000113660 | 8002 | 0046 | 0002 | 0026 | 000C | 0002 | FFFF | FFFF |
| 0000113700 | 0000 | 0000 | 0000 | 0003 | 0004 | 011B | 0000 | 8002 |
| 0000113720 | 0078 | 0002 | 0026 | 000C | 0451 | FFFF | FFFF | 0100 |
| 0000113740 | 0000 | 4600 | 6F72 | 206D | 003A | 5400 | 206F | 003A |
| 0000113760 | 4F00 | 004B | 6143 | 636E | 6C65 | 4800 | 6C65 | 0070 |
| 0000114000 | 424E | 3230 | C3AB | 0000 | 0001 | 0010 | 00DA | 0000 |
| 0000114020 | 0001 | 0001 | 6F0C | 3273 | 635C | 7472 | 2E30 | 7361 |
| 0000114040 | 016D | EA00 | A900 | 0001 | 0100 | 0100 | 0F00 | 736F |
| 0000114060 | 5C32 | 7263 | 3074 | 6164 | 2E74 | 7361 | 016D | 9400 |
| 0000114100 | 2202 | 0000 | 0100 | 0100 | 0F00 | 736F | 5C32 | 7263 |
| 0000114120 | 3074 | 736D | 2E67 | 7361 | 016D | B600 | 0602 | 0000 |
| 0000114140 | 0100 | 0100 | 0A00 | 7263 | 3074 | 7066 | 612E | 6D73 |
| 0000114160 | 0001 | 02BC | 0024 | 0000 | 0001 | 0001 | 630A | 6B68 |
| 0000114200 | 7573 | 2E6D | 7361 | 016D | E000 | 8702 | 0001 | 0100 |
| 0000114220 | 0100 | 0F00 | 736F | 5C32 | 7473 | 6164 | 6772 | 2E76 |
| 0000114240 | 7361 | 016D | 6800 | A304 | 0000 | 0100 | 0100 | 0F00 |
| 0000114260 | 736F | 5C32 | 7473 | 6564 | 766E | 2E70 | 7361 | 016D |
| 0000114300 | 0C00 | 6505 | 0000 | 0100 | 0100 | 0F00 | 736F | 5C32 |
| 0000114320 | 6D6E | 6773 | 6468 | 2E72 | 7361 | 016D | 7200 | 2105 |

THU MAR 14 17:35:10 1991 FRAME.EXE PAGE 41, LINE 2361

| | | | | | | | | |
|---|---|---|---|---|---|---|---|---|
| 0000114340 | 0000 | 0100 | 0100 | 1000 | 736F | 5C32 | 7473 | 6164 |
| 0000114360 | 6C6C | 636F | 612E | 6D73 | 0001 | 0594 | 000A | 0000 |
| 0000114400 | 0001 | 0001 | 6D0A | 6C61 | 6F6C | 2E63 | 7361 | 016D |
| 0000114420 | 9E00 | AF05 | 0000 | 0100 | 0100 | 0B00 | 6D66 | 6C61 |
| 0000114440 | 6F6C | 2E63 | 7361 | 006D | 0000 | 0000 | 0000 | 0100 |
| 0000114460 | 0000 | 0900 | 6466 | 7461 | 2E61 | 7361 | 016D | 4E00 |
| 0000114500 | 3406 | 0000 | 0100 | 0100 | 0B00 | 6E69 | 7469 | 6573 |
| 0000114520 | 2E67 | 7361 | 016D | 8200 | 3606 | 0000 | 0100 | 0100 |
| 0000114540 | 0B00 | 696C | 6B6E | 6573 | 2E67 | 7361 | 016D | B800 |
| 0000114560 | 7C06 | 0000 | 0100 | 0100 | 0C00 | 6573 | 7261 | 6863 |
| 0000114600 | 6773 | 612E | 6D73 | 0001 | 0734 | 00E2 | 0000 | 0001 |
| 0000114620 | 0001 | 670B | 6F72 | 7377 | 6765 | 612E | 6D73 | 0001 |
| 0000114640 | 0816 | 0031 | 0000 | 0001 | 0001 | 6E0A | 7765 | 6573 |
| 0000114660 | 2E67 | 7361 | 016D | 4800 | B208 | 0000 | 0100 | 0100 |
| 0000114700 | 0D00 | 736F | 5C32 | 6C6D | 636F | 2E6B | 7361 | 016D |
| 0000114720 | 5C00 | B42F | 0007 | 0200 | 0100 | 0700 | 7266 | 6D61 |
| 0000114740 | 2E65 | 0163 | 1000 | DF37 | 0011 | 0200 | 0100 | 0700 |
| 0000114760 | 7766 | 6F5F | 2E70 | 0163 | F000 | C348 | 000C | 0200 |
| 0000115000 | 0100 | 0800 | 7766 | 775F | 6E69 | 632E | 0001 | 55B8 |
| 0000115020 | 04A6 | 0000 | 0002 | 0001 | 6608 | 5F77 | 7061 | 2E70 |
| 0000115040 | 0163 | 5E00 | 8C5A | 001F | 0200 | 0100 | 0900 | 7766 |
| 0000115060 | 645F | 7369 | 2E70 | 0163 | FA00 | 0A08 | 0000 | 0100 |
| 0000115100 | 0100 | 0800 | 7266 | 6565 | 612E | 6D73 | 0001 | 0904 |
| 0000115120 | 0046 | 0000 | 0001 | 0001 | 730A | 7274 | 6163 | 2E74 |
| 0000115140 | 7361 | 016D | 4A00 | 3609 | 0000 | 0100 | 0100 | 0A00 |
| 0000115160 | 7473 | 6372 | 7970 | 612E | 6D73 | 0001 | 0980 | 0029 |
| 0000115200 | 0000 | 0001 | 0001 | 730A | 7274 | 6D63 | 2E70 | 7361 |
| 0000115220 | 016D | AA00 | 1709 | 0000 | 0100 | 0100 | 0A00 | 7473 |
| 0000115240 | 6C72 | 6E65 | 612E | 6D73 | 0001 | 09C2 | 003B | 0000 |
| 0000115260 | 0001 | 0001 | 730B | 7274 | 636E | 7461 | 612E | 6D73 |
| 0000115300 | 0001 | 09FE | 000A | 0000 | 0001 | 0001 | 6C08 | 6F74 |
| 0000115320 | 2E61 | 7361 | 016D | 0800 | 740A | 0000 | 0100 | 0100 |
| 0000115340 | 0900 | 7073 | 6972 | 746E | 2E66 | 0163 | 7C00 | 840A |
| 0000115360 | 0000 | 0100 | 0100 | 0A00 | 6F6C | 6163 | 746C | 6D69 |
| 0000115400 | 632E | 0001 | 0B00 | 002D | 0000 | 0001 | 0001 | 730A |
| 0000115420 | 7274 | 6863 | 2E72 | 7361 | 016D | 2E00 | 450B | 0000 |
| 0000115440 | 0100 | 0100 | 0B00 | 7473 | 6972 | 6D63 | 2E70 | 7361 |
| 0000115460 | 016D | 7400 | 2E0B | 0000 | 0100 | 0100 | 0B00 | 7473 |
| 0000115500 | 7272 | 6863 | 2E72 | 7361 | 016D | A200 | 5C0B | 0000 |
| 0000115520 | 0100 | 0100 | 0B00 | 7473 | 6372 | 7073 | 2E6E | 7361 |
| 0000115540 | 016D | FE00 | 5C0B | 0000 | 0100 | 0100 | 0A00 | 7473 |
| 0000115560 | 7372 | 6E70 | 612E | 6D73 | 0001 | 0C5A | 00CA | 0000 |
| 0000115600 | 0001 | 0001 | 680B | 656D | 636D | 7970 | 612E | 6D73 |
| 0000115620 | 0001 | 0D24 | 005E | 0000 | 0001 | 0001 | 680B | 656D |
| 0000115640 | 636D | 7970 | 612E | 6D73 | 0001 | 0D82 | 0048 | 0000 |
| 0000115660 | 0001 | 0001 | 680B | 656D | 736D | 7465 | 612E | 6D73 |
| 0000115700 | 0001 | 0DCA | 0026 | 0000 | 0001 | 0001 | 7309 | 6170 |
| 0000115720 | 6E77 | 706C | 632E | 0001 | 0DF0 | 0022 | 0000 | 0001 |
| 0000115740 | 0001 | 610A | 6C75 | 6964 | 2E76 | 7361 | 016D | 1200 |
| 0000115760 | 320E | 0000 | 0100 | 0100 | 0800 | 6D6C | 6C75 | 612E |
| 0000116000 | 6D73 | 0001 | 0E44 | 00E5 | 0000 | 0001 | 0001 | 5F0B |
| 0000116020 | 6C66 | 6273 | 6675 | 612E | 6D73 | 0001 | 0F2A | 04FA |
| 0000116040 | 0000 | 0001 | 0001 | 6F0A | 7475 | 7570 | 2E74 | 7361 |
| 0000116060 | 016D | 2400 | 2014 | 0000 | 0100 | 0100 | 0D00 | 736F |
| 0000116100 | 5C32 | 6468 | 6669 | 2E66 | 7361 | 016D | 4400 | 4614 |
| 0000116120 | 0002 | 0100 | 0100 | 0800 | 6D67 | 6974 | 656D | 632E |
| 0000116140 | 0001 | 168A | 01C8 | 0000 | 0001 | 0001 | 7407 | 737A |
| 0000116160 | 7465 | 632E | 0000 | 0000 | 0000 | 0000 | 0001 | 0000 |
| 0000116200 | 7409 | 6D69 | 7365 | 7465 | 632E | 0001 | 1852 | 0063 |

THU MAR 14 17:35:10 1991 FRAME.EXE PAGE 42, LINE 2420

| | | | | | | | | |
|---|---|---|---|---|---|---|---|---|
| 0000116220 | 0000 | 0001 | 0001 | 7808 | 6F74 | 2E61 | 7361 | 016D |
| 0000116240 | B600 | 3618 | 0000 | 0100 | 0100 | 0900 | 7073 | 7761 |
| 0000116260 | 766E | 2E70 | 0163 | EC00 | 5F18 | 0000 | 0100 | 0100 |
| 0000116300 | 0900 | 6C75 | 6964 | 2E76 | 7361 | 016D | 4C00 | 3219 |
| 0000116320 | 0000 | 0100 | 0100 | 0A00 | 6863 | 736B | 6B74 | 612E |
| 0000116340 | 6D73 | 0000 | 0000 | 0000 | 0000 | 0001 | 0000 | 5F07 |
| 0000116360 | 6966 | 656C | 632E | 0001 | 197E | 004B | 0000 | 0001 |
| 0000116400 | 0001 | 5F0B | 6567 | 6274 | 6675 | 612E | 6D73 | 0001 |
| 0000116420 | 19CA | 0077 | 0000 | 0001 | 0001 | 6F0D | 3273 | 6C5C |
| 0000116440 | 6573 | 6B65 | 612E | 6D73 | 0001 | 1A42 | 01F4 | 0000 |
| 0000116460 | 0001 | 0001 | 7709 | 6972 | 6574 | 612E | 6D73 | 0001 |
| 0000116500 | 1C36 | 002A | 0000 | 0001 | 0001 | 730B | 7274 | 636E |
| 0000116520 | 7970 | 612E | 6D73 | 0001 | 1C60 | 0003 | 0000 | 0001 |
| 0000116540 | 0001 | 6108 | 6F74 | 2E6C | 7361 | 006D | 0000 | 0000 |
| 0000116560 | 0000 | 0100 | 0000 | 0C00 | 6D63 | 7369 | 6463 | 7461 |
| 0000116600 | 612E | 6D73 | 0000 | 0000 | 0000 | 0000 | 0001 | 0000 |
| 0000116620 | 6309 | 7974 | 6570 | 612E | 6D73 | 0001 | 1C64 | 00A6 |
| 0000116640 | 0000 | 0001 | 0001 | 6708 | 7465 | 6E65 | 2E76 | 0163 |
| 0000116660 | 0A00 | 7A1D | 0000 | 0100 | 0100 | 1000 | 6C64 | 5C6C |
| 0000116700 | 6974 | 7464 | 6261 | 656C | 612E | 6D73 | 0000 | 0000 |
| 0000116720 | 0000 | 0000 | 0001 | 0000 | 6406 | 7961 | 2E73 | 0163 |
| 0000116740 | 8400 | CE1D | 0001 | 0100 | 0100 | 0A00 | 7073 | 7761 |
| 0000116760 | 766E | 6570 | 632E | 0001 | 1F52 | 0022 | 0000 | 0001 |
| 0000117000 | 0001 | 6109 | 726C | 6D65 | 612E | 6D73 | 0001 | 1F74 |
| 0000117020 | 009A | 0000 | 0001 | 0001 | 6C08 | 6964 | 2E76 | 7361 |
| 0000117040 | 016D | 0E00 | A020 | 0000 | 0100 | 0100 | 0800 | 726C |
| 0000117060 | 6D65 | 612E | 6D73 | 0001 | 20AE | 006A | 0000 | 0001 |
| 0000117100 | 0001 | 7509 | 726C | 6D65 | 612E | 6D73 | 0001 | 2118 |
| 0000117120 | 00C0 | 0000 | 0001 | 0001 | 6F0E | 3273 | 645C | 736F |
| 0000117140 | 6572 | 2E74 | 7361 | 006D | 0000 | 0000 | 0000 | 0100 |
| 0000117160 | 0000 | 0B00 | 635F | 6C66 | 7375 | 2E68 | 7361 | 016D |
| 0000117200 | D800 | 1E21 | 0000 | 0100 | 0100 | 0C00 | 7473 | 6361 |
| 0000117220 | 616B | 6176 | 612E | 6D73 | 0001 | 21F6 | 003B | 0000 |
| 0000117240 | 0001 | 0001 | 730B | 7274 | 636E | 706D | 612E | 6D73 |
| 0000117260 | 0001 | 2232 | 0056 | 0000 | 0001 | 0001 | 6108 | 6F74 |
| 0000117300 | 2E78 | 7361 | 016D | 8800 | AA22 | 0000 | 0100 | 0100 |
| 0000117320 | 0900 | 6567 | 7074 | 7461 | 2E68 | 0163 | 3200 | 9423 |
| 0000117340 | 0003 | 0100 | 0100 | 0D00 | 736F | 5C32 | 7073 | 7761 |
| 0000117360 | 766E | 2E65 | 0163 | C600 | 2E26 | 0001 | 0100 | 0100 |
| 0000117400 | 0800 | 6666 | 756C | 6873 | 632E | 0001 | 27F4 | 010C |
| 0000117420 | 0000 | 0001 | 0001 | 730A | 6165 | 6372 | 6568 | 2E6E |
| 0000117440 | 0163 | 0000 | 3A29 | 0004 | 0100 | 0100 | 0D00 | 736F |
| 0000117460 | 5C32 | 6563 | 766E | 7261 | 2E67 | 0163 | 3A00 | 822D |
| 0000117500 | 0000 | 0100 | 0100 | 0F00 | 736F | 5C32 | 6F64 | 7073 |
| 0000117520 | 7761 | 2E6E | 7361 | 016D | BC00 | 3B2D | 0000 | 0100 |
| 0000117540 | 0100 | 0E00 | 736F | 5C32 | 6361 | 6563 | 7373 | 612E |
| 0000117560 | 6D73 | 0000 | 0000 | 0000 | 0000 | 0001 | 0000 | 630A |
| 0000117600 | 6966 | 666E | 2E6F | 7361 | 016D | F800 | 3A2D | 0001 |
| 0000117620 | 0100 | 0100 | 0C00 | 736F | 5C32 | 6567 | 6374 | 6477 |
| 0000117640 | 632E | 0001 | 2F32 | 002A | 0000 | 0001 | 0001 | 6F0D |
| 0000117660 | 3273 | 645C | 6972 | 6576 | 612E | 6D73 | 11D2 | 0005 |
| 0000117700 | 0000 | 5F06 | 6465 | 7461 | 0061 | 0513 | 0000 | 0400 |
| 0000117720 | 655F | 646E | 0050 | 0005 | 0000 | 5F0C | 6E5F | 6568 |
| 0000117740 | 7061 | 645F | 7365 | 7663 | 0500 | 0000 | 0C00 | 5F5F |
| 0000117760 | 615F | 4244 | 7773 | 6670 | 676C | 0042 | 0005 | 0000 |
| 0000120000 | 5F08 | 615F | 6D63 | 6C64 | 746E | 0500 | 0000 | 0800 |
| 0000120020 | 5F5F | 7361 | 6765 | 6968 | 0072 | 0005 | 0000 | 5F08 |
| 0000120040 | 615F | 6573 | 6C67 | 4E6F | 0500 | 0000 | 0800 | 5F5F |
| 0000120060 | 7361 | 7A69 | 7364 | 0010 | 0001 | 0000 | 5F08 | 615F |

THU MAR 14 17:35:10 1991 FRAME.EXE PAGE 43, LINE 2479

| | | | | | | | | |
|---|---|---|---|---|---|---|---|---|
| 0000120100 | 7473 | 7261 | 4674 | 0500 | 0000 | 0800 | 5F5F | 7461 |
| 0000120120 | 706F | 7073 | 0064 | 0005 | 0000 | 5F09 | 615F | 6663 |
| 0000120140 | 6E69 | 6F66 | D6D6 | 0000 | 0001 | 5F09 | 615F | 4244 |
| 0000120160 | 7375 | 6465 | 0044 | 0005 | 0000 | 5F09 | 615F | 6E65 |
| 0000120200 | 7376 | 6765 | 0084 | 0001 | 0000 | 5F09 | 635F | 6E69 |
| 0000120220 | 4474 | 5649 | 004A | 0005 | 0000 | 5F0A | 745F | 7268 |
| 0000120240 | 6165 | 6964 | 4864 | 0500 | 0000 | 0A00 | 5F5F | 6967 |
| 0000120260 | 666E | 736F | 6765 | D6D6 | 0000 | 0001 | 5F0A | 615F |
| 0000120300 | 4244 | 6F64 | 7773 | 4C70 | 0500 | 0000 | 0A00 | 5F5F |
| 0000120320 | 696C | 666E | 736F | 6765 | 9876 | 0000 | 0001 | 5F0A |
| 0000120340 | 615F | 7263 | 7574 | 6573 | 7864 | 0500 | 0000 | 0B00 |
| 0000120360 | 5F5F | 615F | 4244 | 7472 | 7265 | 8C72 | 0100 | 0000 |
| 0000120400 | 0B00 | 5F5F | 6D61 | 6773 | 655F | 6978 | 8674 | 0500 |
| 0000120420 | 0000 | 0B00 | 5F5F | 736F | 6576 | 7372 | 6F69 | 896E |
| 0000120440 | 0101 | 0000 | 0600 | 5F5F | 7865 | 7469 | 024F | 0001 |
| 0000120460 | 0000 | 5F0C | 755F | 6C6E | 636F | 656B | 6978 | 9A74 |
| 0000120500 | 0502 | 0000 | 0700 | 5F5F | 6863 | 6C69 | 8A64 | 0500 |
| 0000120520 | 0000 | 0700 | 5F5F | 666E | 6C69 | EA65 | 0100 | 0000 |
| 0000120540 | 0700 | 5F5F | 6963 | 696E | 8C74 | 0502 | 0000 | 0700 |
| 0000120560 | 5F5F | 615F | 6772 | 9163 | 0101 | 0000 | 0700 | 5F5F |
| 0000120600 | 6563 | 6978 | 8674 | 0500 | 0000 | 0D00 | 5F5F | 6F64 |
| 0000120620 | 7673 | 7265 | 616D | 6F6A | 8E72 | 0502 | 0000 | 0700 |
| 0000120640 | 5F5F | 615F | 6772 | 8776 | 0500 | 0000 | 0D00 | 5F5F |
| 0000120660 | 6F64 | 7673 | 7265 | 696D | 6F6E | 8C72 | 0501 | 0000 |
| 0000120700 | 0800 | 5F5F | 6970 | 6570 | 6863 | 0292 | 0005 | 0000 |
| 0000120720 | 5F08 | 6E65 | 6976 | 6F72 | 8C6E | 0500 | 0000 | 0800 |
| 0000120740 | 5F5F | 736F | 6966 | 656C | 0088 | 0005 | 0000 | 5F08 |
| 0000120760 | 6F5F | 6D73 | 646F | 4D65 | 0101 | 0000 | 0800 | 5F5F |
| 0000121000 | 6E69 | 7469 | 7066 | 1058 | 0005 | 0000 | 5F08 | 665F |
| 0000121020 | 6970 | 696E | 7274 | 0102 | 0000 | 0800 | 5F5F | 6574 |
| 0000121040 | 6D72 | 7066 | 0296 | 0005 | 0000 | 5F08 | 705F | 6D67 |
| 0000121060 | 7470 | 9B72 | 0101 | 0000 | 0800 | 5F5F | 5F63 | 7865 |
| 0000121100 | 7469 | 0088 | 0005 | 0000 | 5F09 | 645F | 736F | 6F6U |
| 0000121120 | 6564 | 0086 | 0005 | 0000 | 5F09 | 6F5F | 6D73 | 6A61 |
| 0000121140 | 726F | 0087 | 0005 | 0000 | 5F09 | 6F5F | 6D73 | 6E69 |
| 0000121160 | 726F | 0205 | 0001 | 0000 | 5F0A | 6C5F | 636F | 656B |
| 0000121200 | 6978 | 8474 | 0500 | 0000 | 0A00 | 5F5F | 6D75 | 7361 |
| 0000121220 | 766B | 6C61 | 0272 | 0001 | 0000 | 5F0A | 635F | 6574 |
| 0000121240 | 6D72 | 7573 | 9C62 | 0502 | 0000 | 0A00 | 5F5F | 7865 |
| 0000121260 | 7469 | 745F | 6469 | 007A | 0005 | 0000 | 5F05 | 665F |
| 0000121300 | 6361 | 0182 | 0001 | 0000 | 5F05 | 7865 | 7469 | 0294 |
| 0000121320 | 0001 | 0000 | 5F0E | 465F | 5F46 | 534D | 4247 | 4E41 |
| 0000121340 | 454E | 9E52 | 0502 | 0000 | 0900 | 5F5F | 6461 | 6762 |
| 0000121360 | 736D | 7667 | 0098 | 0100 | 0900 | 5F5F | 6361 | 7472 |
| 0000121400 | 736D | B667 | 0102 | 0000 | 0800 | 5F5F | 7066 | 7274 |
| 0000121420 | 7061 | 02BC | 0001 | 0000 | 5F0B | 6E5F | 6C75 | 636C |
| 0000121440 | 6568 | 6B63 | 0042 | 0005 | 0000 | 5F0B | 615F | 756E |
| 0000121460 | 6C6C | 6973 | 657A | 02E0 | 0001 | 0000 | 5F09 | 735F |
| 0000121500 | 7465 | 7261 | 7667 | 0468 | 0001 | 0000 | 5F09 | 735F |
| 0000121520 | 7465 | 6E65 | 7076 | 050C | 0001 | 0000 | 5F0B | 4E5F |
| 0000121540 | 534D | 5F47 | 4554 | 5458 | 053C | 0001 | 0000 | 5F0C |
| 0000121560 | 4E5F | 534D | 5F47 | 5257 | 5449 | 7245 | 0105 | 0000 |
| 0000121600 | 0A00 | 5F5F | 7473 | 6164 | 6C6C | 636F | 0594 | 0001 |
| 0000121620 | 0000 | 5F07 | 616D | 6C6C | 636F | 0599 | 0001 | 0000 |
| 0000121640 | 5F0A | 616D | 6C6C | 636F | 6C5F | D06B | 0105 | 0000 |
| 0000121660 | 0C00 | 5F5F | 6D66 | 6C61 | 6F6C | 5F63 | 6B6C | 059E |
| 0000121700 | 0001 | 0000 | 5F07 | 665F | 7266 | 6565 | 05B1 | 0001 |
| 0000121720 | 0000 | 5F09 | 665F | 616D | 6C6C | 636F | 059E | 0001 |
| 0000121740 | 0000 | 5F0A | 665F | 7266 | 6565 | 6C5F | A86B | 0502 |

THU MAR 14 17:35:10 1991 FRAME.EXE PAGE 44, LINE 2538

| | | | | | | | | |
|---|---|---|---|---|---|---|---|---|
| 0000121760 | 0000 | 0700 | 5F5F | 6866 | 6165 | 4E70 | 0106 | 0000 |
| 0000122000 | 0900 | 5F5F | 6E69 | 7469 | 6573 | 8267 | 0106 | 0000 |
| 0000122020 | 0900 | 5F5F | 696C | 6B6E | 6573 | B867 | 0106 | 0000 |
| 0000122040 | 0B00 | 5F5F | 6573 | 7261 | 6863 | 6573 | C367 | 0107 |
| 0000122060 | 0000 | 0800 | 5F5F | 6E69 | 7363 | 6765 | 0734 | 0001 |
| 0000122100 | 0000 | 5F09 | 675F | 6F72 | 7377 | 6765 | 07F6 | 0001 |
| 0000122120 | 0000 | 5F0A | 665F | 6E69 | 6C64 | 7361 | B674 | 0502 |
| 0000122140 | 0000 | 0A00 | 5F5F | 6D61 | 6C62 | 736B | 7A69 | 0816 |
| 0000122160 | 0001 | 0000 | 5F08 | 6E5F | 7765 | 6573 | 9867 | 0108 |
| 0000122200 | 0000 | 0600 | 5F5F | 6F6C | 6B63 | 08DA | 0001 | 0000 |
| 0000122220 | 5F07 | 6C5F | 636F | 666B | 086C | 0001 | 0000 | 5F0D |
| 0000122240 | 755F | 6C6E | 636F | 5F6B | 6966 | 656C | 0848 | 0001 |
| 0000122260 | 0000 | 5F0D | 6C5F | 636F | 5F6B | 7473 | 6572 | 6D61 |
| 0000122300 | 08BE | 0001 | 0000 | 5F08 | 755F | 6C6E | 636F | EA6B |
| 0000122320 | 0108 | 0000 | 0900 | 5F5F | 6E75 | 6F6C | 6B63 | 5466 |
| 0000122340 | 0108 | 0000 | 0F00 | 5F5F | 6E75 | 6F6C | 6B63 | 735F |
| 0000122360 | 7274 | 6165 | 786D | 0108 | 0000 | 0A00 | 5F5F | 6177 |
| 0000122400 | 7469 | 6F6C | 6B63 | 0860 | 0001 | 0000 | 5F0B | 6C5F |
| 0000122420 | 636F | 5F6B | 6966 | 656C | 347F | 0001 | 07DE | 460C |
| 0000122440 | 4152 | 454D | 575F | 4E49 | 4F44 | 2F57 | 0136 | E100 |
| 0000122460 | 0507 | 6D5F | 6961 | 0C6E | 0134 | DA00 | 1307 | 5746 |
| 0000122500 | 435F | 4E4F | 5254 | 4C4F | 445F | 5349 | 4150 | 4354 |
| 0000122520 | 5648 | 0130 | D200 | 0F07 | 5746 | 435F | 444D | 445F |
| 0000122540 | 5349 | 4150 | 4354 | 7848 | 0139 | DF00 | 0C05 | 665F |
| 0000122560 | 5F77 | 706F | 6E65 | 6F5F | 6A62 | 3A7C | 0001 | 05E1 |
| 0000122600 | 5F0E | 7766 | 635F | 6572 | 7461 | 5F65 | 626F | 786A |
| 0000122620 | 013E | EC00 | 0E05 | 665F | 5F77 | 6564 | 656C | 6574 |
| 0000122640 | 6F5F | 6A62 | 442C | 0001 | 05F4 | 5F11 | 7766 | 635F |
| 0000122660 | 706F | 5F79 | 6F6D | 6576 | 6F5F | 6A62 | 4697 | 0001 |
| 0000122700 | 05F8 | 5F0F | 7766 | 635F | 6572 | 7461 | 5F65 | 7274 |
| 0000122720 | 6565 | 47A0 | 0001 | 05FC | 5F0F | 7766 | 725F | 6D65 |
| 0000122740 | 766F | 5F65 | 7274 | 6565 | 4C1B | 0001 | 08BB | 5F0D |
| 0000122760 | 7766 | 715F | 6575 | 7972 | 6D5F | 6773 | 4C6C | 0001 |
| 0000123000 | 08BD | 5F13 | 7766 | 635F | 6568 | 6B63 | 6D5F | 6E65 |
| 0000123020 | 5F75 | 7469 | 6D65 | 4CA5 | 0001 | 08BF | 5F15 | 7766 |
| 0000123040 | 755F | 636E | 6568 | 6B63 | 6D5F | 6E65 | 5F75 | 7469 |
| 0000123060 | 6D65 | 4CDD | 0001 | 08C1 | 5F18 | 7766 | 695F | 5F73 |
| 0000123100 | 656D | 756E | 695F | 6574 | 5F6D | 6863 | 6365 | 656B |
| 0000123120 | F564 | 014E | C900 | 0B08 | 665F | 5F77 | 6567 | 5F6E |
| 0000123140 | 6C64 | 0D67 | 0151 | CF00 | 0A08 | 665F | 5F77 | 6D63 |
| 0000123160 | 645F | 676C | 514D | 0001 | 08D1 | 5F15 | 7766 | 735F |
| 0000123200 | 7465 | 635F | 6E6F | 6574 | 7478 | 655F | 746E | 7972 |
| 0000123220 | 517E | 0001 | 08D3 | 5F11 | 7766 | 6C5F | 7473 | 735F |
| 0000123240 | 7465 | 655F | 746E | 7972 | 5205 | 0001 | 08D4 | 5F0D |
| 0000123260 | 7766 | 6C5F | 7473 | 635F | 656C | 7261 | 523E | 0001 |
| 0000123300 | 08D5 | 5F13 | 7766 | 6C5F | 7473 | 675F | 7465 | 745F |
| 0000123320 | 706F | 695F | 7864 | 529D | 0001 | 08D7 | 5F13 | 7766 |
| 0000123340 | 6C5F | 7473 | 735F | 7465 | 745F | 706F | 695F | 7864 |
| 0000123360 | 52D6 | 0001 | 08D9 | 5F12 | 7766 | 6C5F | 7473 | 675F |
| 0000123400 | 7465 | 735F | 6C65 | 695F | 2964 | 014D | C500 | 1308 |
| 0000123420 | 5746 | 475F | 4E45 | 5245 | 4349 | 445F | 474C | 505F |
| 0000123440 | 4F52 | 7343 | 0153 | DB00 | 1308 | 665F | 5F77 | 736C |
| 0000123460 | 5F74 | 6567 | 5F74 | 6573 | 5F6C | 626F | 316A | 0154 |
| 0000123500 | DD00 | 1108 | 665F | 5F77 | 6567 | 5F74 | 6573 | 5F6C |
| 0000123520 | 7264 | 7669 | F965 | 0154 | E000 | 0F08 | 665F | 5F77 |
| 0000123540 | 6977 | 5F6E | 766F | 7265 | 616C | F070 | 0148 | B000 |
| 0000123560 | 0E08 | 665F | 5F77 | 7263 | 6165 | 6574 | 775F | 6E69 |
| 0000123600 | 4A67 | 0001 | 08B3 | 5F0F | 7766 | 645F | 7365 | 7274 |
| 0000123620 | 796F | 775F | 6E69 | 4F38 | 0001 | 08CB | 460E | 5F57 |

THU MAR 14 17:35:10 1991 FRAME.EXE PAGE 45, LINE 2597

| | | | | | | | | |
|---|---|---|---|---|---|---|---|---|
| 0000123640 | 4D43 | 445F | 474C | 505F | 4F52 | A543 | 014A | B500 |
| 0000123660 | 1108 | 665F | 5F77 | 6572 | 6973 | 657A | 775F | 6E69 |
| 0000123700 | 6F64 | 8C77 | 014B | B700 | 1208 | 665F | 5F77 | 6E65 |
| 0000123720 | 6261 | 656C | 645F | 7369 | 6C70 | 7961 | 4BDF | 0001 |
| 0000123740 | 08B9 | 5F0E | 7766 | 6E5F | 746F | 6369 | 5F65 | 736D |
| 0000123760 | 5167 | 0156 | F000 | 0C05 | 665F | 5F77 | 7473 | 7261 |
| 0000124000 | 5F74 | 6D74 | 5741 | 0001 | 05F3 | 5F0C | 7766 | 635F |
| 0000124020 | 6F6C | 6573 | 745F | 9F6D | 0157 | F400 | 0B05 | 665F |
| 0000124040 | 5F77 | 696B | 6C6C | 745F | 986D | 0158 | F700 | 0F05 |
| 0000124060 | 665F | 5F77 | 6572 | 7473 | 7261 | 5F74 | 6770 | 056D |
| 0000124100 | 0159 | F900 | 1005 | 665F | 5F77 | 6D74 | 6F5F | 6570 |
| 0000124120 | 5F6E | 6574 | 7473 | 5A5E | 0001 | 08BF | 5F1A | 7766 |
| 0000124140 | 745F | 676F | 6C67 | 5F65 | 6564 | 6174 | 6C69 | 6465 |
| 0000124160 | 665F | 726F | 616D | D274 | 015A | C100 | 1108 | 665F |
| 0000124200 | 5F77 | 6573 | 5F74 | 6F73 | 7472 | 615F | 7474 | DB72 |
| 0000124220 | 0172 | EF00 | 0F08 | 665F | 5F77 | 6964 | 7073 | 616C |
| 0000124240 | 5F79 | 6977 | 126E | 0175 | F300 | 0F08 | 665F | 5F77 |
| 0000124260 | 6573 | 5F74 | 6F63 | 746E | 7865 | E774 | 0177 | F600 |
| 0000124300 | 0F08 | 665F | 5F77 | 6567 | 5F74 | 6F63 | 746E | 7865 |
| 0000124320 | 3074 | 0178 | F700 | 0D08 | 665F | 5F77 | 6E69 | 7469 |
| 0000124340 | 645F | 7369 | FF70 | 0108 | 0000 | 0800 | 665F | 6572 |
| 0000124360 | 5F65 | 6B6C | 08FA | 0001 | 0000 | 5F05 | 7266 | 6565 |
| 0000124400 | 0904 | 0001 | 0000 | 5F07 | 7473 | 6372 | 7461 | 094A |
| 0000124420 | 0001 | 0000 | 5F07 | 7473 | 6372 | 7970 | 0980 | 0001 |
| 0000124440 | 0000 | 5F07 | 7473 | 6372 | 706D | 09AA | 0001 | 0000 |
| 0000124460 | 5F07 | 7473 | 6C72 | 6E65 | 09C2 | 0001 | 0000 | 5F08 |
| 0000124500 | 7473 | 6E72 | 6163 | FE74 | 0109 | 0000 | 0500 | 6C5F |
| 0000124520 | 6F74 | 0861 | 010A | 0000 | 0800 | 735F | 7270 | 6E69 |
| 0000124540 | 6674 | 0A7C | 0001 | 0000 | 5F0A | 6F6C | 6163 | 746C |
| 0000124560 | 6D69 | 0065 | 010B | 0000 | 0700 | 735F | 7274 | 6863 |
| 0000124600 | 2E72 | 010B | 0000 | 0800 | 735F | 7274 | 6369 | 706D |
| 0000124620 | 0B2E | 0001 | 0000 | 5F08 | 7473 | 6372 | 706D | 7469 |
| 0000124640 | 010B | 0000 | 0800 | 735F | 7274 | 6372 | 7268 | 0BA2 |
| 0000124660 | 0001 | 0000 | 5F08 | 7473 | 6372 | 7073 | FE6E | 010B |
| 0000124700 | 0000 | 0700 | 735F | 7274 | 7073 | 5A6E | 010C | 0000 |
| 0000124720 | 0800 | 6D5F | 6D65 | 6F6D | 6576 | 0D24 | 0001 | 0000 |
| 0000124740 | 5F07 | 656D | 636D | 7970 | 0D82 | 0001 | 0000 | 5F07 |
| 0000124760 | 656D | 736D | 7465 | 0DCA | 0001 | 0000 | 5F08 | 7073 |
| 0000125000 | 7761 | 6C6E | F070 | 010D | 0000 | 0B00 | 5F5F | 4661 |
| 0000125020 | 6146 | 6C75 | 6964 | 1276 | 010E | 0000 | 0800 | 5F5F |
| 0000125040 | 4661 | 6D6C | 6C75 | 0E12 | 0001 | 0000 | 5F09 | 615F |
| 0000125060 | 7546 | 6D6C | 6C75 | 0E44 | 0001 | 0000 | 5F08 | 665F |
| 0000125100 | 736C | 7562 | 3A66 | 010F | 0000 | 0800 | 5F5F | 756F |
| 0000125120 | 7074 | 7475 | 1424 | 0001 | 0000 | 5F0A | 615F | 6146 |
| 0000125140 | 6468 | 6669 | 4466 | 0114 | 0000 | 0700 | 675F | 746D |
| 0000125160 | 6D69 | AA65 | 0116 | 0000 | 0600 | 745F | 737A | 7465 |
| 0000125200 | 1784 | 0001 | 0000 | 5F09 | 695F | 6973 | 646E | 7473 |
| 0000125220 | 168A | 0001 | 0000 | 5F08 | 5F5F | 7A74 | 6573 | A074 |
| 0000125240 | 050A | 0000 | 0900 | 645F | 7961 | 696C | 6867 | 9C74 |
| 0000125260 | 050A | 0000 | 0900 | 745F | 6D69 | 7A65 | 6E6F | A265 |
| 0000125300 | 050A | 0000 | 0700 | 745F | 6E7A | 6D61 | AA65 | 050A |
| 0000125320 | 0000 | 0900 | 5F5F | 645F | 616E | 656D | C073 | 050A |
| 0000125340 | 0000 | 0900 | 5F5F | 6D5F | 616E | 656D | 5F73 | 0118 |
| 0000125360 | 0000 | 0700 | 5F5F | 7863 | 6F74 | 5261 | 0118 | 0000 |
| 0000125400 | 0A00 | 5F5F | 6C63 | 6F74 | 7361 | 6275 | 18B6 | 0001 |
| 0000125420 | 0000 | 5F08 | 7073 | 7761 | 766E | EC70 | 0118 | 0000 |
| 0000125440 | 0900 | 5F5F | 4661 | 6C75 | 6964 | E676 | 050A | 0000 |
| 0000125460 | 0C00 | 5F5F | 6161 | 746C | 7473 | 6F6B | 7276 | 194C |
| 0000125500 | 0001 | 0000 | 5F08 | 635F | 6B68 | 7473 | 4C6B | 0119 |

THU MAR 14 17:35:10 1991 FRAME.EXE PAGE 46, LINE 2656

```
0000125520  0000  0A00  5F5F  4661  6863  736B  6B74  0000
0000125540  0004  0000  5F07  625F  6675  6E69  0AEA  0005
0000125560  0000  5F05  695F  626F  0CCA  0005  0000  5F06
0000125600  695F  626F  AA32  050E  0000  0900  5F5F  616C
0000125620  7473  6F69  7E62  0119  0000  0800  5F5F  6567
0000125640  6274  6675  19D4  0001  0000  5F06  736C  6565
0000125660  CA6B  0119  0000  0A00  5F5F  736C  6565  5F6B
0000125700  6B6C  1A4C  0001  0000  5F06  7277  7469  4265
0000125720  011A  0000  0A00  5F5F  7277  7469  5F65  6B6C
0000125740  1C36  0001  0000  5F08  7473  6E72  7063  6079
0000125760  011C  0000  0500  615F  6F74  AE6C  050E  0000
0000126000  0D00  5F5F  6663  746C  7663  5F74  6174  CA62
0000126020  050E  0000  0800  5F5F  7361  7A69  4365  0ECB
0000126040  0005  0000  5F08  615F  6973  657A  C844  050E
0000126060  0000  0B00  5F5F  6973  6967  746E  666F  C666
0000126100  050E  0000  0B00  5F5F  6973  6967  746E  6573
0000126120  CC67  050E  0000  0700  5F5F  7463  7079  CC65
0000126140  050E  0000  0800  5F5F  7463  7079  5F65  1C64
0000126160  0001  0000  5F07  6567  6574  766E  1D0A  0001
0000126200  0000  5F0B  675F  7465  6974  7464  6261  0FCE
0000126220  0005  0000  5F0B  745F  6469  6174  6D62  7861
0000126240  0FEA  0005  0000  5F06  645F  7961  D073  050F
0000126260  0000  0800  5F5F  706C  6164  7379  1D84  0001
0000126300  0000  5F09  7073  7761  766E  6570  1F52  0001
0000126320  0000  5F0A  615F  4646  6C61  6572  746D  011F
0000126340  0000  0800  5F5F  4661  646C  7669  200E  0001
0000126360  0000  5F08  615F  6C46  6572  AE6D  0120  0000
0000126400  0900  5F5F  4661  6C75  6572  C46D  0121  0000
0000126420  0B00  5F5F  645F  736F  7265  6E72  CC6F  0121
0000126440  0000  0700  5F5F  7265  6E72  7D6F  0121  0000
0000126460  0800  5F5F  6F64  7273  7465  2164  0001  0000
0000126500  5F09  645F  736F  6572  6674  100C  0005  0000
0000126520  5F08  635F  6C66  7375  D868  0121  0000  0B00
0000126540  735F  6174  6B63  7661  6961  F66C  0121  0000
0000126560  0800  735F  7274  636E  706D  2232  0001  0000
0000126600  5F07  635F  7461  786F  2288  0001  0000  5F09
0000126620  675F  7465  6170  6874  2494  0001  0000  5F08
0000126640  7073  7761  766E  0C65  0127  0000  0B00  5F5F
0000126660  6666  756C  6873  6C5F  C66B  0126  0000  0700
0000126700  665F  6C66  7375  7868  0127  0000  0900  665F
0000126720  756C  6873  6C61  F46C  0127  0000  0B00  5F5F
0000126740  6573  7261  6863  6E65  0076  0129  0000  0900
0000126760  5F5F  6563  766E  7261  5267  0510  0000  0B00
0000127000  5F5F  5F70  766F  7265  616C  3A79  012D  0000
0000127020  0900  5F5F  6F64  7073  7761  BC6E  012D  0000
0000127040  0700  615F  6363  7365  5473  0510  0000  0A00
0000127060  5F5F  6966  656C  6E69  6F66  2E0E  0001  0000
0000127100  5F09  675F  7465  6364  6477  2DF8  0001  0000
0000127120  5F07  6567  6374  6477  2F47  0001  0000  5F09
0000127140  635F  6468  6972  6576  2F32  0001  0000  5F0A
0000127160  675F  7465  7264  7669  0165  000A  8075  8183
0000127200  6400  8300  0201  0101  8000  0101  8000  0101
0000127220  8000  0101  8000  0101  8000  0101  8000  0101
*
0000131040  8000  0101  8000  1301  7900  0240  EA83  8302
0000131060  02EB  0782  505F  494F  544E  694C  0701  7F00
0000131100  8283  8300  0082  0901  7F00  0182  0078  0182
0000131120  0479  0101  8000  0101  8000  0101  8000  0101
0000131140  8000  0101  8000  0101  8000  1401  7900  8085
```

```
THU MAR 14 17:35:10 1991  FRAME.EXE  PAGE 47, LINE 2715

0000131160  0400  F383  8302  02F4  0682  525F  4345  4C54
0000131200  0169  000D  837F  0082  8283  8300  0082  8283
0000131220  0100  0023  827F  7805  654C  7466  8200  7907
0000131240  6F42  7474  6D6F  8204  7806  6952  6867  0874
0000131260  0482  5479  706F  010C  0001  0180  0001  0180
0000131300  0001  0180  0001  0180  0001  0180  0001  0180
*
0000132640  0007  737A  C083  8200  0100  0001  0180  0001
0000132660  0180  0001  0180  0001  0180  0001  0180  0001
*
0000134100  0180  0001  0180  0001  0180  0001  0180  0007
0000134120  737A  5A83  8204  0100  000A  8075  C083  7300
0000134140  8304  045B  0D01  7F00  C083  8300  0085  C083
0000134160  8300  00C0  0101  8000  0101  8000  0101  8000
0000134200  0101  8000  0101  8000  0101  8000  0101  8000
*
0000135020  0101  8000  1301  7900  D085  0600  C583  8304
0000135040  04C6  0582  515F  534D  6947  1301  7F00  C083
0000135060  8300  0085  C083  8300  00C0  8683  8300  02E9
0000135100  2701  7F00  0482  7768  646E  8200  6D03  6773
0000135120  8204  6D03  3170  8206  6D03  3270  820A  7404
0000135140  6D69  0E65  0382  7470  126C  0101  8000  0101
0000135160  8000  0101  8000  0101  8000  0101  8000  0101
*
0000142620  8000  0701  7800  0085  8308  0080  0101  8000
0000142640  0101  8000  0101  8000  0101  8000  0101  8000
*
0000143160  0101  8000  0101  8000  0A01  7F00  5983  8304
0000143200  03AF  AF83  0103  000A  8075  8183  6400  8303
0000143220  07C9  0501  7800  8328  0080  0501  7800  8358
0000143240  0080  0701  7F00  C083  8300  00C0  0A01  7500
0000143260  8380  0200  0264  CD83  0107  0001  0180  0001
0000143300  0180  000D  837F  00C0  8583  8300  00C0  C083
0000143320  0100  000A  8075  8183  7300  8304  07D1  0101
0000143340  8000  0501  7800  8350  0080  0701  7800  E085
0000143360  8301  0080  0701  7800  C085  8300  0080  0501
0000143400  7800  8378  0080  0701  7800  8085  8300  0080
0000143420  0D01  7F00  C083  8300  0085  C083  8300  00C0
0000143440  0A01  7500  8380  0081  0473  D983  0107  0001
0000143460  0180  0001  0180  000D  837F  00C0  8583  8300
0000143500  00C0  C083  0100  000A  8075  C083  7300  8304
0000143520  07DD  0101  8000  0701  7800  C885  8300  0080
0000143540  0A01  7500  8380  0081  0064  0183  0102  0005
0000143560  1878  8083  0100  0007  8578  0138  8083  0100
0000143600  0001  0180  0001  0180  0001  0180  0001  0180
*
0000145440  0007  8578  0100  8083  0100  0001  0180  0001
0000145460  0180  0001  0180  0001  0180  0001  0180  0001
*
0000147640  0180  0016  2079  8302  0408  0983  8204  280A
0000147660  6E75  6174  6767  6465  6929  0701  7F00  8183
0000147700  8300  0081  0901  7F00  0182  0078  0182  0279
0000147720  1601  7900  0240  0B83  8304  040C  0A82  7528
0000147740  746E  6761  6567  2964  0169  0007  837F  0407
0000147760  0783  0104  000D  827F  6D03  6E69  8200  6D03
0000150000  7861  0104  0001  0180  0001  0180  0001  0180
0000150020  0001  0180  0001  0180  0001  0180  0001  0180
*
0000150640  0001  0180  0001  0180  0001  0180  0007  8578
```

```
THU MAR 14 17:35:10 1991  FRAME.EXE  PAGE 48, LINE 2774

0000150660  0320  8083  0100  0001  0180  0001  0180  0001
0000150700  0180  0001  0180  0001  0180  0001  0180  0001
*
0000150760  0180  0001  0180  0001  0180  0001  0180  0016
0000151000  3079  8303  048B  8C83  8204  280A  6E75  6174
0000151020  6767  6465  6929  0A01  7F00  8583  8300  0085
0000151040  8583  0100  001A  827F  7705  6469  6874  8200
0000151060  6806  6965  6867  0274  0582  6564  7470  0468
0000151100  1801  7900  4085  0801  8F83  8304  0490  0A82
0000151120  7528  746E  6761  6567  2964  0169  0007  8578
0000151140  0080  8483  0100  0019  837F  0081  8A83  8304
0000151160  0085  8583  8300  00C4  8283  8300  00E4  8E83
0000151200  0104  005A  827F  7206  7065  6572  0073  0682
0000151220  6964  656D  736E  8202  6410  7461  5F61  616C
0000151240  6579  5F72  6564  7470  0868  0882  6973  5F67
0000151260  6973  657A  820A  7307  6769  705F  7274  820C
0000151300  6209  6D74  5F70  6973  657A  8210  6208  6D74
0000151320  5F70  7470  1472  0582  7073  7261  1865  0101
0000151340  8000  1801  7900  A085  0C05  9483  8304  0495
0000151360  0A82  7528  746E  6761  6567  2964  0169  0007
0000151400  8578  0180  8483  0100  0025  837F  0086  E883
0000151420  8302  02E8  8683  8300  0081  8583  8300  0086
0000151440  8283  8300  0086  0783  8304  048D  9383  0104
0000151460  007E  827F  6902  0064  0482  616E  656D  8204
0000151500  6609  6C69  5F65  616E  656D  8224  6509  7078
0000151520  745F  5F63  6469  8244  7404  7079  4865  0C82
0000151540  6572  5F66  696C  656E  6E5F  6D75  824A  7209
0000151560  6665  745F  5F63  6469  824C  740A  6D69  5F65
0000151600  7473  6D61  5070  0682  6F61  5F69  6469  8254
0000151620  6C08  636F  7461  6F69  586E  0982  7462  706D
0000151640  695F  666E  5C6F  0582  7073  7261  8565  0084
0000151660  0101  8000  0101  8000  0101  8000  0101  8000
*
0000152320  0101  8000  0101  8000  0101  8000  1801  7900
0000152340  C085  0702  E383  8304  04E4  0A82  7528  746E
0000152360  6761  6567  2964  0169  0007  8578  0120  8483
0000152400  0100  0016  837F  0086  E883  8302  040A  8183
0000152420  8300  0081  8283  8300  04E2  3801  7F00  0282
0000152440  6469  8200  6E04  6D61  0465  0482  6572  7463
0000152460  8224  6104  7474  2C72  0582  7564  6D6D  2E79
0000152500  0A82  6974  656D  735F  6174  706D  8230  7305
0000152520  6170  6572  0134  0001  0180  0001  0180  0001
0000152540  0180  0001  0180  0001  0180  0001  0180  0001
*
0000154060  0180  0001  0180  0001  0180  0001  0180  0018
0000154100  8579  0E50  8304  05A1  A283  8205  280A  6E75
0000154120  6174  6767  6465  6929  0701  7800  0085  8308
0000154140  0080  0D01  7F00  8583  8300  0477  7783  8304
0000154160  05A0  2001  7F00  0282  6469  8200  7405  7469
0000154200  656C  8202  7006  6F72  706D  6674  0482  6164
0000154220  6174  CA85  0100  0001  0180  0018  8579  1010
0000154240  8303  05A5  A683  8205  280A  6E75  6174  6767
0000154260  6465  6929  0A01  7F00  8583  8300  05A0  A083
0000154300  0105  0025  827F  6309  706F  5F79  6C66  6761
0000154320  8200  6609  6F72  5F6D  6164  6174  8202  7407
0000154340  5F6F  6164  6174  0285  0101  0001  0180  0001
0000154360  0180  0001  0180  0001  0180  0001  0180  0001
*
0000154660  0180  0001  0180  0001  0180  0001  0180  0007
```

```
THU MAR 14 17:35:10 1991  FRAME.EXE  PAGE 49, LINE 2833

0000154700  837F  00C0  C683  0100  000A  8075  8183  6400
0000154720  8302  05DC  0501  7800  8320  0080  0A01  7500
0000154740  8380  0081  0064  0183  0102  0007  837F  0081
0000154760  C583  0100  000A  8075  8183  6400  8302  05E0
0000155000  0501  7800  8338  0080  0501  7800  8310  0080
0000155020  0501  7800  8328  0080  0501  7800  8350  0080
0000155040  0501  7800  8368  0080  0501  7800  8340  0080
0000155060  0501  7800  8308  0080  1001  7F00  8683  8300
0000155100  0086  C083  8300  00C0  C583  0100  000A  8075
0000155120  8183  6400  8305  05E9  0401  7F00  C583  0100
0000155140  000A  8075  8183  6400  8301  05EB  0701  7800
0000155160  8085  8300  0080  0701  7800  4085  8301  0085
0000155200  0501  7800  8358  0080  0A01  7F00  C083  8300
0000155220  00C0  0083  0100  000A  8075  8183  6400  8303
0000155240  05F0  0701  7800  9885  8300  0080  0701  7F00
0000155260  8583  8300  00C5  0A01  7500  8380  0081  0264
0000155300  F383  0105  0004  837F  00C0  0A01  7500  8380
0000155320  0081  0164  F583  0105  0004  837F  00C5  0A01
0000155340  7500  8380  0081  0164  F783  0105  0005  6078
0000155360  8083  0100  0007  8578  00B8  8083  0100  0004
0000155400  837F  00C5  0A01  7500  8380  0081  0164  FB83
0000155420  0105  0007  8578  00C8  8083  0100  0007  8578
0000155440  0128  8083  0100  000A  8075  8183  6400  8300
0000155460  0201  0101  8000  0101  8000  0101  8000  0101
0000155500  8000  0101  8000  0101  8000  0101  8000  0101
*
0000157260  8000  0101  8000  0101  8000  1401  7900  8085
0000157300  0400  E483  8302  02E5  0682  525F  4345  4C54
0000157320  0169  000D  837F  0082  8283  8300  0082  8283
0000157340  0100  0023  827F  7805  654C  7466  8200  7907
0000157360  6F42  7474  6D6F  8204  7806  6952  6867  0874
0000157400  0482  5479  706F  010C  0001  0180  0001  0180
0000157420  0001  0180  0001  0180  0001  0180  0001  0180
*
0000160760  0007  737A  C083  8200  0100  0001  0180  0001
0000161000  0180  0001  0180  0001  0180  0001  0180  0001
*
0000162220  0180  0001  0180  0001  0180  0001  0180  0007
0000162240  737A  4B83  8204  0100  000A  8075  C083  7300
0000162260  8304  044C  0D01  7F00  C083  8300  0085  C083
0000162300  8300  00C0  0101  8000  0101  8000  0101  8000
0000162320  0101  8000  0101  8000  0101  8000  0101  8000
*
0000162600  0101  8000  1201  7900  9085  0700  7E83  8304
0000162620  047F  0482  535F  5057  0169  0016  837F  0085
0000162640  8183  8300  0081  8183  8300  0081  C083  8300
0000162660  00C0  3201  7F00  0282  7366  8200  6302  0279
0000162700  0282  7863  8204  7901  8206  7801  8208  6810
0000162720  6E77  4964  736E  7265  4274  6865  6E69  0A64
0000162740  0482  7768  646E  010E  0001  0180  0001  0180
0000162760  0001  0180  0001  0180  0001  0180  0001  0180
*
0000170460  0001  0180  0007  8578  0320  8083  0100  0001
0000170500  0180  0001  0180  0001  0180  0001  0180  0001
*
0000172720  0180  0018  8579  0E50  8304  087B  7C83  8208
0000172740  280A  6E75  6174  6767  6465  6929  0701  7800
0000172760  0085  8308  0080  0D01  7F00  8583  8300  0753
0000173000  5383  8307  087A  2001  7F00  0282  6469  8200
```

THU MAR 14 17:35:10 1991 FRAME.EXE PAGE 50, LINE 2892

```
0000173020  7405  7469  656C  8202  7006  6F72  706D  6674
0000173040  0482  6164  6174  CA85  0100  0001  0180  0018
0000173060  8579  1010  8303  087F  8083  8208  280A  6E75
0000173100  6174  6767  6465  6929  0A01  7F00  8583  8300
0000173120  087A  7A83  0108  0025  827F  6309  706F  5F79
0000173140  6C66  6761  8200  6609  6F72  5F6D  6164  6174
0000173160  8202  7407  5F6F  6164  6174  0285  0101  0001
0000173200  0180  0001  0180  0001  0180  0001  0180  0001
*
0000173320  0180  0001  0180  0001  0180  0001  0180  0007
0000173340  737A  7983  8208  0100  0001  0180  0001  0180
0000173360  0007  737A  7E83  8208  0100  0001  0180  0001
0000173400  0180  0001  0180  0001  0180  0001  0180  0001
*
0000173500  0180  000D  837F  044A  A083  8303  03A0  A083
0000173520  0103  000A  8075  8183  6400  8304  08AF  0501
0000173540  7800  8358  0080  0701  7F00  C083  8300  00C0
0000173560  0A01  7500  8380  0200  0264  B283  0108  0007
0000173600  837F  0081  8183  0100  000A  8075  0083  6402
0000173620  8302  08B4  0401  7F00  8583  0100  000A  8075
0000173640  0083  6402  8301  08B6  0701  7F00  C083  8300
0000173660  00C0  0A01  7500  8380  0200  0264  B883  0108
0000173700  0007  837F  00C0  C083  0100  000A  8075  8583
0000173720  6400  8302  08BA  0401  7F00  8183  0100  000A
0000173740  8075  0083  6402  8301  08BC  0401  7F00  8183
0000173760  0100  000A  8075  0083  6402  8301  08BE  0401
0000174000  7F00  8183  0100  000A  8075  8583  6400  8301
0000174020  08C0  0101  8000  0101  8000  0D01  7F00  C083
0000174040  8300  0085  C083  8300  00C0  0A01  7500  8380
0000174060  00C0  0473  C483  0108  0007  8578  00C8  8083
0000174100  0100  0001  0180  0004  837F  0899  0A01  7500
0000174120  8380  0085  0164  C883  0108  000D  837F  00C0
0000174140  8583  8300  00C0  C083  0100  000A  8075  C083
0000174160  7300  8304  08CA  0501  7800  8328  0080  0501
0000174200  7800  8360  0080  0401  7F00  9C83  0108  000A
0000174220  8075  8583  6400  8301  08CE  0401  7F00  C083
0000174240  0100  000A  8075  0083  6402  8301  08D0  0A01
0000174260  7F00  C083  8300  0086  8583  0100  000A  8075
0000174300  8183  640C  8303  08D2  0A01  7500  8380  0081
0000174320  0064  0183  0102  000A  8075  8283  6400  8300
0000174340  0201  0401  7F00  8283  0100  000A  8075  0083
0000174360  6402  8301  08D6  0401  7F00  C683  0100  000A
0000174400  8075  8183  6400  8301  08D8  0701  7F00  C683
0000174420  8300  00C0  0A01  7500  8380  0081  0264  DA83
0000174440  0108  0004  837F  00C0  0A01  7500  8380  0081
0000174460  0164  DC83  0108  0005  2078  8083  0100  000D
0000174500  837F  0081  8183  8300  0081  8183  0100  000A
0000174520  8075  8183  6400  8304  08DF  0101  8000  0101
0000174540  8000  0101  8000  0101  8000  0101  8000  0101
*
0000204400  8000  0101  8000  0401  7F00  C083  0100  000A
0000204420  8075  8183  6400  8301  05EB  0701  7800  F085
0000204440  8300  0080  0501  7800  8360  0080  0401  7F00
0000204460  C083  0100  000A  8075  8183  6400  8301  05EF
0000204500  0501  7800  8318  0080  0501  7800  8320  0080
0000204520  0A01  7500  8380  0081  0064  0183  0102  000A
0000204540  8075  8183  6400  8300  0201  0501  7800  8340
0000204560  0080  0701  7800  1085  8302  0080  0A01  7500
0000204600  8380  0081  0064  0183  0102  0004  837F  0086
```

```
THU MAR 14 17:35:10 1991  FRAME.EXE  PAGE 51, LINE 2951

0000204620  0A01  7500  8380  0081  0164  F883  0105  0005
0000204640  5078  8083  0100  0007  8578  01B0  8083  0100
0000204660  0007  8578  00C0  8083  0100  000A  8075  8183
0000204700  6400  8300  0201  0101  8000  0101  8000  0101
0000204720  8000  0101  8000  0101  8000  0101  8000  0101
*
0000206260  8000  0101  8000  0101  8000  1001  7900  9085
0000206300  0900  BF83  8302  02C0  0282  6D74  0169  001C
0000206320  837F  0081  8183  8300  0081  8183  8300  0081
0000206340  8183  8300  0081  8183  8300  0081  5901  7F00
0000206360  0682  6D74  735F  6365  8200  7406  5F6D  696D
0000206400  026E  0782  6D74  685F  756F  0472  0782  6D74
0000206420  6D5F  6164  0679  0682  6D74  6D5F  6E6F  8208
0000206440  7407  5F6D  6579  7261  820A  7407  5F6D  6477
0000206460  7961  820C  7407  5F6D  6479  7961  820E  7408
0000206500  5F6D  7369  7364  1074  0101  8000  0101  8000
0000206520  0101  8000  0101  8000  0101  8000  0101  8000
*
0000206560  0101  8000  0101  8000  0701  7A00  8373  02BE
0000206600  0082  0101  8000  0101  8000  0101  8000  0101
0000206620  8000  0101  8000  0101  8000  0101  8000  0101
*
0000207100  8000  0701  7800  0085  8301  0080  0101  8000
0000207120  0101  8000  0101  8000  0101  8000  0101  8000
*
0000207660  1901  7900  9085  0500  5983  8303  035A  0B82
0000207700  465F  4153  4C4C  434F  5441  6945  1001  7F00
0000207720  8683  8300  0086  8683  8300  0086  8583  0100
0000207740  003E  827F  690C  4664  6C69  5365  7379  6574
0000207760  006D  0B82  5363  6365  6F74  5572  696E  0474
0000210000  0582  5563  696E  0874  0A82  5563  696E  4174
0000210020  6176  6C69  820C  6308  5362  6365  6F74  1072
0000210040  0101  8000  0101  8000  0101  8000  0101  8000
*
0000217100  0101  8000  1601  7900  0220  E583  8306  06E6
0000217120  0A82  7528  746E  6761  6567  2964  0169  0007
0000217140  837F  0081  8183  0100  0009  827F  7801  8200
0000217160  7901  0102  0016  4079  8302  06E8  E983  8206
0000217200  280A  6E75  6174  6767  6465  6929  0701  7F00
0000217220  E483  8306  06E4  0D01  7F00  0382  696D  006E
0000217240  0382  616D  0478  0101  8000  0101  8000  0101
0000217260  8000  0101  8000  0101  8000  0101  8000  0101
*
0000217340  8000  0101  8000  0101  8000  1801  7900  2085
0000217360  0201  FC83  8306  06FD  0A82  7528  746E  6761
0000217400  6567  2964  0169  0007  837F  0086  FE83  0102
0000217420  0015  827F  6F06  6A62  695F  0064  0882  626F
0000217440  5F6A  616E  656D  0104  0001  0180  0001  0180
0000217460  0001  0180  0001  0180  0001  0180  0001  0180
*
0000217640  0001  0180  0001  0180  0018  8579  0260  8305
0000217660  071F  2083  8207  280A  6E75  6174  6767  6465
0000217700  6929  1001  7F00  8683  8300  02FE  8283  8300
0000217720  02FE  C083  0100  002E  827F  6902  0064  0482
0000217740  616E  656D  8204  740A  6D69  5F65  7473  6D61
0000217760  2470  0582  776F  656E  2872  0982  6870  7379
0000220000  705F  7461  4868  0101  8000  0101  8000  0101
0000220020  8000  0101  8000  0101  8000  0101  8000  0101
0000220040  8000  0101  8000  0701  7A00  8373  02FE  0082
```

```
THU MAR 14 17:35:10 1991  FRAME.EXE  PAGE 52, LINE 3010

0000220060  0101  8000  0101  8000  0101  8000  0101  8000
*
0000220120  0101  8000  0701  7A00  8373  071E  0082  0101
0000220140  8000  0101  8000  0101  8000  0101  8000  0101
*
0000220200  8000  0101  8000  0101  8000  0701  7A00  8373
0000220220  06FB  0082  0101  8000  0101  8000  0101  8000
0000220240  0101  8000  0101  8000  0101  8000  0101  8000
*
0000220340  0701  7800  2085  8303  0080  0101  8000  0101
0000220360  8000  0101  8000  0101  8000  0101  8000  0101
*
0000220460  8000  1601  7900  0330  6783  8307  0768  0A82
0000220500  7528  746E  6761  6567  2964  0169  000A  837F
0000220520  0085  8583  8300  0085  1AD1  7F00  0582  6977
0000220540  7464  0068  0682  6568  6769  7468  8202  6405
0000220560  7065  6874  0104  0018  8579  0140  8308  076B
0000220600  6C83  8207  280A  6E75  6174  6767  6465  6929
0000220620  0701  7800  8085  8300  0084  1901  7F00  8183
0000220640  8300  0766  8583  8300  0085  C483  8300  0082
0000220660  E483  8300  076A  5A01  7F00  0682  6572  7270
0000220700  7365  8200  6406  6D69  6E65  0273  1082  6164
0000220720  6174  6C5F  7961  7265  645F  7065  6874  8208
0000220740  7308  6769  735F  7A69  0A65  0782  6973  5F67
0000220760  7470  0C72  0982  7462  706D  735F  7A69  1065
0000221000  0882  7462  706D  705F  7274  8214  7305  6170
0000221020  6572  0118  0001  0180  0018  8579  05A0  830C
0000221040  0770  7183  8207  280A  6E75  6174  6767  6465
0000221060  6929  0701  7800  8085  8301  0084  2501  7F00
0000221100  8683  8300  02FE  FE83  8302  0086  8183  8300
0000221120  0085  8683  8300  0082  8683  8300  06E4  6983
0000221140  8307  076F  7E01  7F00  0282  6469  8200  6E04
0000221160  6D61  0465  0982  6966  656C  6E5F  6D61  2465
0000221200  0982  7865  5F70  6374  695F  4464  0482  7974
0000221220  6570  8248  720C  6665  6C5F  6E69  5F65  756E
0000221240  4A6D  0982  6572  5F66  6374  695F  4C64  0A82
0000221260  6974  656D  735F  6174  706D  8250  6106  696F
0000221300  695F  5464  0882  6F6C  6163  6974  6E6F  8258
0000221320  6209  6D74  5F70  6E69  6F66  825C  7305  6170
0000221340  6572  8485  0100  0001  0180  0001  0180  0001
0000221360  0180  0001  0180  0001  0180  0001  0180  0001
*
0000221660  0180  0001  0180  0001  0180  0001  0180  0018
0000221700  8579  0560  830F  07AA  AB83  8207  280A  6E75
0000221720  6174  6767  6465  6929  0701  7800  0085  8302
0000221740  0084  2E01  7F00  8683  8300  02FE  8283  8300
0000221760  0081  8183  8300  06E4  8583  8300  0085  6983
0000222000  8307  00C4  C483  8300  0081  8583  8300  00C4
0000222020  A983  0107  00A8  827F  6902  0064  0482  616E
0000222040  656D  8204  740A  6D69  5F65  7473  6D61  2470
0000222060  0582  6C63  7361  2873  0582  7473  6C79  2A65
0000222100  0982  6F68  5F74  6F70  6E69  2C74  0B82  7068
0000222120  785F  645F  6665  6E69  3065  0B82  7068  795F
0000222140  645F  6665  6E69  3265  0982  7462  706D  695F
0000222160  666E  346F  0782  6D69  5F67  7470  5C72  0882
0000222200  616D  6B73  705F  7274  8260  7107  6175  696C
0000222220  7974  8264  640F  7365  7263  7069  6F74  5F72
0000222240  6973  657A  8266  640E  7365  7263  7069  6F74
0000222260  5F72  7470  6872  0582  7073  7261  6C65  0101
```

```
THU MAR 14 17:35:10 1991  FRAME.EXE  PAGE 53, LINE 3069

0000222300  8000  0101  8000  0101  8000  0101  8000  0101
*
0000222400  8000  1801  7900  C085  0702  BF83  8307  07C0
0000222420  0A82  7528  746E  6761  6567  2964  0169  0007
0000222440  8578  0120  8483  0100  0016  837F  0086  FE83
0000222460  8302  06E7  8183  8300  0081  8283  8300  07BE
0000222500  3801  7F00  0282  6469  8200  6E04  6D61  0465
0000222520  0482  6572  7463  8224  6104  7474  2C72  0582
0000222540  7564  6D6D  2E79  0A82  6974  656D  735F  6174
0000222560  706D  8230  7305  6170  6572  0134  0001  0180
0000222600  0001  0180  0001  0180  0001  0180  0001  0180
*
0000224140  0001  0180  0001  0180  0007  8578  0800  8083
0000224160  0100  0001  0180  0001  0180  0001  0180  0001
0000224200  0180  0001  0180  0001  0180  0001  0180  0001
*
0000224560  0180  0001  0180  0001  0180  000A  8075  8183
0000224600  6400  8300  0201  0401  7F00  8583  0100  000A
0000224620  8075  8183  6400  8301  08C0  0A01  7F00  8683
0000224640  8300  0085  C683  0100  000A  8075  8583  6400
0000224660  8303  08C2  0401  7F00  C583  0100  000A  8075
0000224700  8183  6400  8301  08C4  0501  7800  8360  0080
0000224720  1001  7F00  C083  8300  0081  CD83  8302  0086
0000224740  C083  0100  000A  8075  0083  6402  8305  08C7
0000224760  0701  7800  2085  8301  0080  0701  7800  1885
0000225000  8301  0080  0501  7800  8340  0080  0501  7800
0000225020  8348  0080  0701  7800  F085  8300  0080  0701
0000225040  7800  0885  8301  0080  0501  7800  8378  0080
0000225060  0701  7800  8885  8300  0080  0D01  7F00  8683
0000225100  8300  00C0  CD83  8300  00C6  0A01  7500  8380
0000225120  0081  0464  D183  0108  000D  837F  0086  C083
0000225140  8300  00C0  C683  0100  000A  8075  8183  6400
0000225160  8304  08D3  1001  7F00  8683  8300  00C0  8683
0000225200  8300  00C0  C683  0100  000A  8075  8183  6400
0000225220  8305  08D5  0D01  7F00  C083  8300  0086  C083
0000225240  8300  00C6  0A01  7500  8380  0081  0464  D783
0000225260  0108  000D  837F  00C0  8183  8300  00C0  C683
0000225300  0100  000A  8075  8183  6400  8304  08D9  0701
0000225320  7F00  8683  8300  00C5  0A01  7500  8380  0081
0000225340  0264  DB83  0108  0007  837F  0086  C583  0100
0000225360  000A  8075  8183  6400  8302  08DD  0701  7F00
0000225400  8683  8300  00C5  0A01  7500  8380  0081  0264
0000225420  DF83  0108  0007  837F  0086  C583  0100  000A
0000225440  8075  8183  6400  8302  08E1  0501  7800  8370
0000225460  0080  0701  7F00  8683  8300  00C5  0A01  7500
0000225500  8380  0081  0264  E483  0108  0007  837F  00C0
0000225520  C083  0100  000A  8075  0083  6402  8302  08E6
0000225540  0501  7800  8320  0080  0501  7800  8318  0080
0000225560  0701  7800  1085  8301  0080  0401  7F00  C583
0000225600  0100  000A  8075  8183  6400  8301  08EB  0701
0000225620  7800  8085  8300  0080  0401  7F00  8583  0100
0000225640  000A  8075  8183  6400  8301  08EE  0A01  7500
0000225660  8380  0081  0064  0183  0102  0005  0878  8083
0000225700  0100  0007  837F  00C0  8683  0100  000A  8075
0000225720  8183  6400  8302  08F2  0501  7800  8310  0080
0000225740  0701  7F00  C683  8300  00C0  0A01  7500  8380
0000225760  0200  0264  F583  0108  000A  8075  8183  6400
0000226000  8300  0201  0701  7800  9885  8300  0080  0701
0000226020  7800  B085  8302  0080  0501  7800  8358  0080
```

THU MAR 14 17:35:10 1991 FRAME.EXE PAGE 54, LINE 3128

| | | | | | | | | |
|---|---|---|---|---|---|---|---|---|
| 0000226040 | 0701 | 7800 | 6085 | 8302 | 0080 | 1105 | 0001 | 0000 |
| 0000226060 | 0116 | 2F5C | 07CA | 00AB | 0010 | 00A0 | 0000 | 0704 |
| 0000226100 | 7766 | 695F | 696E | 1774 | 0604 | 5900 | 1104 | 7266 |
| 0000226120 | 6D61 | 5F65 | 6977 | 646E | 776F | 705F | 6F72 | 0D63 |
| 0000226140 | 0A04 | AF00 | 0703 | 6168 | 5F62 | 6461 | 0D72 | 0E04 |
| 0000226160 | AF00 | 0703 | 6D68 | 5F71 | 6461 | 0F72 | F804 | C0FF |
| 0000226200 | 0900 | 6162 | 6573 | 685F | 6E77 | 0864 | FC04 | 81FF |
| 0000226220 | 0200 | 7473 | 0201 | 011B | 3007 | 07CE | 004F | 0010 |
| 0000226240 | 0044 | 0000 | 0C04 | 7766 | 745F | 7265 | 696D | 616E |
| 0000226260 | 6574 | 0409 | 0006 | 00C0 | 6803 | 6261 | 0409 | 000A |
| 0000226300 | 00C0 | 6803 | 716D | 0408 | FFFC | 0081 | 7302 | 0174 |
| 0000226320 | 1E02 | 5601 | D230 | B607 | 1603 | A800 | 0003 | 0400 |
| 0000226340 | 660F | 5F77 | 6D63 | 5F64 | 6964 | 7073 | 7461 | 6863 |
| 0000226360 | 040A | 0010 | 00C0 | 6804 | 6E77 | 0964 | 0E04 | 8500 |
| 0000226400 | 0300 | 736D | 0967 | 0A04 | C000 | 0300 | 706D | 0931 |
| 0000226420 | 0604 | C000 | 0300 | 706D | 0932 | FC04 | 85FF | 0300 |
| 0000226440 | 6D74 | 0870 | F404 | 81FE | 0200 | 7473 | 040C | FFF6 |
| 0000226460 | 0085 | 7206 | 6465 | 6172 | 0E77 | F604 | 91FE | 0807 |
| 0000226500 | 626F | 5F6A | 6170 | 6874 | 040E | FFF8 | 00C0 | 7008 |
| 0000226520 | 7461 | 5F68 | 7470 | 0172 | 2202 | 0C01 | DA34 | 7307 |
| 0000226540 | 1600 | 6500 | 0000 | 0400 | 6613 | 5F77 | 6F63 | 746E |
| 0000226560 | 6F72 | 5F6C | 6964 | 7073 | 7461 | 6863 | 040A | 0010 |
| 0000226600 | 00C0 | 6804 | 6E77 | 0964 | 0E04 | 8500 | 0300 | 736D |
| 0000226620 | 0967 | 0A04 | C000 | 0300 | 706D | 0931 | 0604 | C000 |
| 0000226640 | 0300 | 706D | 1032 | FA04 | 85FF | 0A00 | 6F63 | 746E |
| 0000226660 | 6F72 | 5F6C | 706F | 0408 | FFFC | 0081 | 7302 | 0174 |
| 0000226700 | 1B02 | 7F01 | DE34 | B007 | 1601 | A200 | 0001 | 0400 |
| 0000226720 | 660C | 6172 | 656D | 775F | 6E69 | 6F64 | 0A77 | 1004 |
| 0000226740 | C000 | 0400 | 7768 | 646E | 0409 | 000E | 0085 | 6D03 |
| 0000226760 | 6773 | 0409 | 000A | 00C0 | 6D03 | 3170 | 0409 | 0006 |
| 0000227000 | 00C0 | 6D03 | 3270 | 040A | FEE6 | 0085 | 6204 | 6572 |
| 0000227020 | 0973 | EE04 | F2FF | 0302 | 6372 | 096C | E804 | C0FE |
| 0000227040 | 0300 | 7068 | 0E73 | EC04 | 91FE | 0807 | 626F | 5F6A |
| 0000227060 | 6170 | 6874 | 0408 | FFEC | 0081 | 7302 | 1074 | 7405 |
| 0000227100 | 0503 | 8200 | 0800 | 6762 | 635F | 6C6F | 726F | 0201 |
| 0000227120 | 0113 | 362F | 07E1 | 00E1 | 0010 | 00D6 | 0000 | 0404 |
| 0000227140 | 616D | 6E69 | 040C | FFFA | 00C0 | 5F06 | 705F | 6F72 |
| 0000227160 | 0963 | D604 | C0FF | 0300 | 6168 | 0962 | F604 | C0FF |
| 0000227200 | 0300 | 6D68 | 0A71 | DA04 | C4FF | 0404 | 6D71 | 6773 |
| 0000227220 | 0408 | FFF4 | 0081 | 7302 | 0174 | 0502 | 000D | 1A00 |
| 0000227240 | 0500 | 0111 | 0000 | 2200 | 1001 | DD37 | 6805 | 1002 |
| 0000227260 | 5D00 | 0002 | 0400 | 6613 | 5F77 | 6176 | 696C | 6164 |
| 0000227300 | 6574 | 6C5F | 676F | 616E | 656D | 040D | 0006 | 00C0 |
| 0000227320 | 6C07 | 676F | 616E | 656D | 0414 | 000A | 00C6 | 630E |
| 0000227340 | 6E6F | 6574 | 7478 | 695F | 5F64 | 6461 | 0972 | FC04 |
| 0000227360 | 85FE | 0300 | 6469 | 0B78 | FA04 | 85FE | 0500 | 6469 |
| 0000227400 | 5F78 | 1232 | FE04 | A0FE | 0C05 | 6F63 | 746E | 7865 |
| 0000227420 | 5F74 | 6170 | 6874 | 0201 | 011A | 3978 | 05DF | 0104 |
| 0000227440 | 0010 | 00F9 | 0000 | 0B04 | 7766 | 6F5F | 6570 | 5F6E |
| 0000227460 | 626F | DC6A | F804 | 86FF | 0600 | 626F | 5F6A | 6469 |
| 0000227500 | 0408 | FFFC | 0081 | 7302 | 0174 | 1C02 | 7C01 | E13A |
| 0000227520 | EA05 | 1001 | DF00 | 0001 | 0400 | 660D | 5F77 | 7263 |
| 0000227540 | 6165 | 6574 | 6F5F | 6A62 | 040E | 0006 | 0081 | 6F08 |
| 0000227560 | 6A62 | 745F | 7079 | 1065 | 0804 | C500 | 0A00 | 6572 |
| 0000227600 | 7264 | 7761 | 615F | 7264 | 040C | FFF2 | 0086 | 6F06 |
| 0000227620 | 6A62 | 695F | 1064 | FA04 | 86FF | 0A00 | 6F63 | 746E |
| 0000227640 | 7865 | 5F74 | 6469 | 040E | FE28 | 059F | 6708 | 6E65 |
| 0000227660 | 665F | 726F | 0A6D | F804 | 85FF | 0400 | 726C | 7365 |
| 0000227700 | 0408 | FFF6 | 0081 | 7302 | 0174 | 2102 | 6601 | EA3C |

THU MAR 14 17:35:10 1991 FRAME.EXE PAGE 55, LINE 3187

| | | | | | | | | |
|---|---|---|---|---|---|---|---|---|
| 0000227720 | 1205 | 1002 | 0700 | 0002 | 0400 | 6612 | 5F77 | 6564 |
| 0000227740 | 656C | 6574 | 695F | 676D | 665F | 746C | 0C72 | 0604 |
| 0000227760 | 8600 | 0600 | 7374 | 5F74 | 6469 | 040C | 000A | 0086 |
| 0000230000 | 7306 | 6C65 | 695F | 0E64 | 0E04 | C000 | 0800 | 6573 |
| 0000230020 | 5F6C | 616E | 656D | 040E | 0012 | 00C0 | 6F08 | 6A62 |
| 0000230040 | 6E5F | 6D61 | 1065 | 1604 | C500 | 0A00 | 6572 | 7264 |
| 0000230060 | 7761 | 615F | 7264 | 040A | FFA0 | 04E1 | 6604 | 746C |
| 0000230100 | 0D72 | EC04 | 92FE | 0704 | 6D69 | 5F67 | 6468 | 0E72 |
| 0000230120 | FC04 | 81FF | 0800 | 6564 | 5F6C | 7974 | 6570 | 0408 |
| 0000230140 | FFFA | 0081 | 7302 | 0974 | F804 | 81FF | 0300 | 7473 |
| 0000230160 | 0131 | 1C02 | 7801 | EC3E | 9E05 | 1003 | 9300 | 0003 |
| 0000230200 | 0400 | 660D | 5F77 | 6564 | 656C | 6574 | 6F5F | 6A62 |
| 0000230220 | 0410 | 0006 | 00C5 | 720A | 6465 | 6172 | 5F77 | 6461 |
| 0000230240 | 0C72 | F204 | 86FE | 0600 | 626F | 5F6A | 6469 | 040D |
| 0000230260 | FEEA | 0086 | 7407 | 7365 | 5F74 | 6469 | 040E | FD20 |
| 0000230300 | 059F | 6708 | 6E65 | 665F | 726F | 0A6D | F804 | 85FF |
| 0000230320 | 0400 | 726C | 7365 | 040E | FEF6 | 05A0 | 7408 | 7478 |
| 0000230340 | 6C5F | 6E69 | 0B65 | EE04 | 86FE | 0500 | 6669 | 695F |
| 0000230360 | 0D64 | 0004 | E8FD | 0702 | 6669 | 6E5F | 6D61 | 0E65 |
| 0000230400 | FA04 | C0FF | 0800 | 6170 | 6874 | 705F | 7274 | 0408 |
| 0000230420 | FFF6 | 0081 | 7302 | 0174 | 2102 | 1601 | F142 | 1605 |
| 0000230440 | 1002 | 0B00 | 0002 | 0400 | 6612 | 5F77 | 6176 | 696C |
| 0000230460 | 6164 | 6574 | 635F | 5F6D | 7364 | 1174 | 0604 | C000 |
| 0000230500 | 0B00 | 7273 | 5F63 | 6F6C | 6E67 | 6D61 | 1165 | 0A04 |
| 0000230520 | C000 | 0B00 | 7364 | 5F74 | 6F6C | 6E67 | 6D61 | 0C65 |
| 0000230540 | EC04 | 86FF | 0600 | 7364 | 5F74 | 6469 | 0410 | FFFA |
| 0000230560 | 0086 | 630A | 6E6F | 6574 | 7478 | 695F | 0E64 | F204 |
| 0000230600 | C0FF | 0800 | 616E | 656D | 705F | 7274 | 040D | FFF6 |
| 0000230620 | 00C0 | 7407 | 706D | 705F | 7274 | 0412 | FEEC | 05A0 |
| 0000230640 | 770C | 7261 | 696E | 676E | 6C5F | 6E69 | 0865 | F004 |
| 0000230660 | 81FF | 0200 | 7473 | 0201 | 011F | 442C | 05F4 | 01CA |
| 0000230700 | 0010 | 01BF | 0000 | 1004 | 7766 | 635F | 706F | 5F79 |
| 0000230720 | 6F6D | 6576 | 6F5F | 6A62 | 040F | 0006 | 0085 | 6309 |
| 0000230740 | 706F | 5F79 | 6C66 | 6761 | 0410 | 0008 | 00C5 | 720A |
| 0000230760 | 6465 | 6172 | 5F77 | 6461 | 0E72 | FA04 | C0FF | 0800 |
| 0000231000 | 6170 | 6874 | 705F | 7274 | 0408 | FDF4 | 0081 | 7302 |
| 0000231020 | 0C74 | F004 | 86FD | 0600 | 626F | 5F6A | 6469 | 040A |
| 0000231040 | FDF6 | 0085 | 6C04 | 6572 | 0D73 | F804 | A4FD | 0705 |
| 0000231060 | 6D63 | 665F | 726F | 016D | 2102 | F601 | F645 | A105 |
| 0000231100 | 1000 | 9600 | 0000 | 0400 | 7612 | 6C61 | 6469 | 7461 |
| 0000231120 | 5F65 | 7274 | 6565 | 6E5F | 6D61 | 0A65 | 0604 | C000 |
| 0000231140 | 0400 | 616E | 656D | 0407 | FFDC | 0085 | 6901 | 040F |
| 0000231160 | FFDE | 02E8 | 7409 | 6572 | 5F65 | 616E | 656D | 0201 |
| 0000231200 | 011D | 4697 | 05F8 | 0109 | 0010 | 00FE | 0000 | 0E04 |
| 0000231220 | 7766 | 635F | 6572 | 7461 | 5F65 | 7274 | 6565 | 0410 |
| 0000231240 | 0006 | 00C5 | 720A | 6465 | 6172 | 5F77 | 6461 | 0E72 |
| 0000231260 | 3004 | 9FFE | 0805 | 6567 | 5F6E | 6F66 | 6D72 | 040A |
| 0000231300 | FFFC | 0085 | 6C04 | 6572 | 0873 | FA04 | 81FF | 0200 |
| 0000231320 | 7473 | 0201 | 011D | 47A0 | 05FC | 014F | 0010 | 0144 |
| 0000231340 | 0000 | 0E04 | 7766 | 725F | 6D65 | 766F | 5F65 | 7274 |
| 0000231360 | 6565 | 0410 | 0006 | 00C5 | 720A | 6465 | 6172 | 5F77 |
| 0000231400 | 6461 | 0E72 | 2C04 | 9FFD | 0805 | 6567 | 5F6E | 6F66 |
| 0000231420 | 6D72 | 040A | FFF8 | 0085 | 6C04 | 6572 | 1073 | FA04 |
| 0000231440 | 86FF | 0A00 | 6F63 | 746E | 7865 | 5F74 | 6469 | 040E |
| 0000231460 | FEF6 | 05A0 | 7408 | 7478 | 6C5F | 6E69 | 0865 | F604 |
| 0000231500 | 81FF | 0200 | 7473 | 0201 | 0D05 | 0000 | 001A | 1105 |
| 0000231520 | 0001 | 0000 | 011C | 48F0 | 08B0 | 0177 | 0010 | 016C |
| 0000231540 | 0000 | 0D04 | 7766 | 635F | 6572 | 7461 | 5F65 | 6977 |
| 0000231560 | 176E | 0604 | 4A00 | 1104 | 7266 | 6D61 | 5F65 | 6977 |

THU MAR 14 17:35:10 1991 FRAME.EXE PAGE 56, LINE 3246

| | | | | | | | | |
|---|---|---|---|---|---|---|---|---|
| 0000231600 | 646E | 776F | 705F | 6F72 | 0D63 | 0A04 | A000 | 0703 |
| 0000231620 | 6168 | 5F62 | 6461 | 0D72 | 0E04 | A000 | 0703 | 6D68 |
| 0000231640 | 5F71 | 6461 | 1472 | 1204 | A000 | 0E03 | 7266 | 6D61 |
| 0000231660 | 5F65 | 7768 | 646E | 615F | 7264 | 0201 | 011D | 4A67 |
| 0000231700 | 08B3 | 003E | 0010 | 0033 | 0000 | 0E04 | 7766 | 645F |
| 0000231720 | 7365 | 7274 | 796F | 775F | 6E69 | 0409 | 0006 | 00C0 |
| 0000231740 | 6803 | 6261 | 0409 | 000A | 00C0 | 6803 | 716D | 0201 |
| 0000231760 | 011F | 4AA5 | 08B5 | 00E7 | 0010 | 00DC | 0000 | 1004 |
| 0000232000 | 7766 | 725F | 7365 | 7A69 | 5F65 | 6977 | 646E | 776F |
| 0000232020 | 040F | 0006 | 0081 | 7709 | 6E69 | 775F | 6469 | 6874 |
| 0000232040 | 0410 | 0008 | 0081 | 770A | 6E69 | 685F | 6965 | 6867 |
| 0000232060 | 0774 | E804 | 81FF | 0100 | 0778 | E604 | 81FF | 0100 |
| 0000232100 | 0979 | EC04 | E3FF | 0302 | 6372 | 086C | EA04 | 81FF |
| 0000232120 | 0200 | 7473 | 040B | FFFC | 0081 | 7705 | 6469 | 6874 |
| 0000232140 | 040C | FFE4 | 0081 | 6806 | 6965 | 6867 | 0174 | 2002 |
| 0000232160 | 8C01 | B74B | 5308 | 1000 | 4800 | 0000 | 0400 | 6611 |
| 0000232200 | 5F77 | 6E65 | 6261 | 656C | 645F | 7369 | 6C70 | 7961 |
| 0000232220 | 040C | 0006 | 0085 | 6506 | 616E | 6C62 | 0165 | 1C02 |
| 0000232240 | DF01 | B94B | 3C08 | 1000 | 3100 | 0000 | 0400 | 660D |
| 0000232260 | 5F77 | 6F6E | 6974 | 6563 | 6D5F | 6773 | 040F | 0006 |
| 0000232300 | 00C0 | 7409 | 7469 | 656C | 735F | 7274 | 040F | 000A |
| 0000232320 | 00C0 | 7109 | 6575 | 7972 | 735F | 7274 | 0201 | 011B |
| 0000232340 | 4C1B | 08BB | 0051 | 0010 | 0046 | 0000 | 0C04 | 7766 |
| 0000232360 | 715F | 6575 | 7972 | 6D5F | 6773 | 040F | 0006 | 00C0 |
| 0000232400 | 7409 | 7469 | 656C | 735F | 7274 | 040F | 000A | 00C0 |
| 0000232420 | 7109 | 6575 | 7972 | 735F | 7274 | 0201 | 0121 | 4C6C |
| 0000232440 | 08BD | 0039 | 0010 | 002E | 0000 | 1204 | 7766 | 635F |
| 0000232460 | 6568 | 6B63 | 6D5F | 6E65 | 5F75 | 7469 | 6D65 | 040E |
| 0000232500 | 0006 | 0081 | 6D08 | 6E65 | 6975 | 6574 | 016D | 2302 |
| 0000232520 | A501 | BF4C | 3808 | 1000 | 2D00 | 0000 | 0400 | 6614 |
| 0000232540 | 5F77 | 6E75 | 6863 | 6365 | 5F6B | 656D | 756E | 695F |
| 0000232560 | 6574 | 0E6D | 0604 | 8100 | 0800 | 656D | 756E | 7469 |
| 0000232600 | 6D65 | 0201 | 0126 | 4CDD | 08C1 | 004C | 0010 | 0041 |
| 0000232620 | 0000 | 1704 | 7766 | 695F | 5F73 | 656D | 756E | 695F |
| 0000232640 | 6574 | 5F6D | 6863 | 6365 | 656B | 0E64 | 0604 | 8100 |
| 0000232660 | 0800 | 656D | 756E | 7469 | 6D65 | 0201 | 0122 | 4D29 |
| 0000232700 | 08C5 | 01CC | 0016 | 01BE | 0000 | 1304 | 7766 | 675F |
| 0000232720 | 6E65 | 7265 | 6369 | 645F | 676C | 705F | 6F72 | 0A63 |
| 0000232740 | 1004 | C000 | 0400 | 7768 | 646E | 0409 | 000E | 0085 |
| 0000232760 | 6D03 | 6773 | 0409 | 000A | 00C0 | 6D03 | 3170 | 0409 |
| 0000233000 | 0006 | 00C0 | 6D03 | 3270 | 040B | FFFC | 0081 | 6505 |
| 0000233020 | 7272 | 726F | 0514 | 11DE | 0005 | 0899 | 630C | 7275 |
| 0000233040 | 665F | 726F | 5F6D | 7470 | 0172 | 1902 | F501 | C94E |
| 0000233060 | 4308 | 1000 | 3800 | 0000 | 0400 | 660A | 5F77 | 6567 |
| 0000233100 | 5F6E | 6C64 | 0E67 | 0604 | 9900 | 0808 | 6F66 | 6D72 |
| 0000233120 | 705F | 7274 | 0201 | 011D | 4F38 | 08CB | 01D5 | 0016 |
| 0000233140 | 01C7 | 0000 | 0E04 | 7766 | 635F | 5F6D | 6C64 | 5F67 |
| 0000233160 | 7270 | 636F | 040A | 0010 | 00C0 | 6804 | 6E77 | 0964 |
| 0000233200 | 0E04 | 8500 | 0300 | 736D | 0967 | 0A04 | C000 | 0300 |
| 0000233220 | 706D | 0931 | 0604 | C000 | 0300 | 706D | 0832 | FC04 |
| 0000233240 | 81FF | 0200 | 7473 | 0510 | 11E2 | 0005 | 089C | 6608 |
| 0000233260 | 726F | 5F6D | 7470 | 0172 | 1802 | 0D01 | CF51 | 4008 |
| 0000233300 | 1000 | 3500 | 0000 | 0400 | 6609 | 5F77 | 6D63 | 645F |
| 0000233320 | 676C | 0411 | 0006 | 089C | 630B | 5F6D | 6F66 | 6D72 |
| 0000233340 | 705F | 7274 | 0201 | 0123 | 514D | 08D1 | 0031 | 0010 |
| 0000233360 | 0026 | 0000 | 1404 | 7766 | 735F | 7465 | 635F | 6E6F |
| 0000233400 | 6574 | 7478 | 655F | 746E | 7972 | 0411 | 0006 | 00C0 |
| 0000233420 | 630B | 6E6F | 6574 | 7478 | 735F | 7274 | 0201 | 011F |
| 0000233440 | 517E | 08D3 | 0087 | 0010 | 007C | 0000 | 1004 | 7766 |

THU MAR 14 17:35:10 1991 FRAME.EXE PAGE 57, LINE 3305

| | | | | | | | | |
|---|---|---|---|---|---|---|---|---|
| 0000233460 | 6C5F | 7473 | 735F | 7465 | 655F | 746E | 7972 | 040F |
| 0000233500 | 0006 | 00C0 | 6509 | 746E | 7972 | 735F | 7274 | 040E |
| 0000233520 | 000A | 0086 | 6508 | 746E | 7972 | 695F | 0F64 | 0E04 |
| 0000233540 | 8500 | 0900 | 6E65 | 7274 | 5F79 | 6469 | 0878 | FC04 |
| 0000233560 | 81FF | 0200 | 7473 | 0201 | 011B | 5205 | 08D4 | 0039 |
| 0000233600 | 0010 | 002E | 0000 | 0C04 | 7766 | 6C5F | 7473 | 635F |
| 0000233620 | 656C | 7261 | 0201 | 0121 | 523E | 08D5 | 005F | 0010 |
| 0000233640 | 0054 | 0000 | 1204 | 7766 | 6C5F | 7473 | 675F | 7465 |
| 0000233660 | 745F | 706F | 695F | 7864 | 040D | FFFA | 0082 | 7407 |
| 0000233700 | 706F | 695F | 7864 | 0201 | 0121 | 529D | 08D7 | 0039 |
| 0000233720 | 0010 | 002E | 0000 | 1204 | 7766 | 6C5F | 7473 | 735F |
| 0000233740 | 7465 | 745F | 706F | 695F | 7864 | 040D | 0006 | 0082 |
| 0000233760 | 7407 | 706F | 695F | 7864 | 0201 | 0120 | 52D6 | 08D9 |
| 0000234000 | 009D | 0010 | 0092 | 0000 | 1104 | 7766 | 6C5F | 7473 |
| 0000234020 | 675F | 7465 | 735F | 6C65 | 695F | 1064 | 0604 | C600 |
| 0000234040 | 0A00 | 6573 | 5F6C | 6469 | 615F | 7264 | 040F | FFFC |
| 0000234060 | 0085 | 7309 | 6C65 | 695F | 646E | 7865 | 0201 | 0121 |
| 0000234100 | 5373 | 08DB | 00BE | 0010 | 00B3 | 0000 | 1204 | 7766 |
| 0000234120 | 6C5F | 7473 | 675F | 7465 | 735F | 6C65 | 6F5F | 6A62 |
| 0000234140 | 0410 | 0006 | 00C6 | 730A | 6C65 | 695F | 5F64 | 6461 |
| 0000234160 | 0D72 | 0A04 | C000 | 0700 | 7874 | 5F74 | 7470 | 0F72 |
| 0000234200 | FC04 | 85FF | 0900 | 6573 | 5F6C | 6E69 | 6564 | 0178 |
| 0000234220 | 1F02 | 3101 | DD54 | C808 | 1000 | BD00 | 0000 | 0400 |
| 0000234240 | 6610 | 5F77 | 6567 | 5F74 | 6573 | 5F6C | 7264 | 7669 |
| 0000234260 | 1065 | 0604 | C000 | 0A00 | 7264 | 7669 | 5F65 | 616E |
| 0000234300 | 656D | 040F | FFFC | 0085 | 7309 | 6C65 | 695F | 646E |
| 0000234320 | 7865 | 0201 | 011D | 54F9 | 08E0 | 00BF | 0010 | 00B4 |
| 0000234340 | 0000 | 0E04 | 7766 | 775F | 6E69 | 6F5F | 6576 | 6C72 |
| 0000234360 | 7061 | 040C | 0006 | 0081 | 6F06 | 6576 | 5F72 | 0C78 |
| 0000234400 | 0804 | 8100 | 0600 | 766F | 7265 | 795F | 0410 | 000A |
| 0000234420 | 0081 | 6F0A | 6576 | 5F72 | 6977 | 7464 | 1168 | 0C04 |
| 0000234440 | 8100 | 0B00 | 766F | 7265 | 685F | 6569 | 6867 | 0B74 |
| 0000234460 | FC04 | 81FF | 0500 | 656E | 5F77 | 0B78 | FA04 | 81FF |
| 0000234500 | 0500 | 656E | 5F77 | 0879 | F804 | 81FF | 0200 | 7473 |
| 0000234520 | 040F | FFD4 | 047D | 6609 | 6172 | 656D | 705F | 736F |
| 0000234540 | 040D | FFE6 | 047D | 7307 | 7263 | 705F | 736F | 0201 |
| 0000234560 | 0D05 | 0000 | 001A | 0512 | 11DA | 0005 | 00C0 | 680A |
| 0000234600 | 6E77 | 5F64 | 7266 | 6D61 | 1365 | D205 | 0511 | C000 |
| 0000234620 | 0B00 | 7768 | 646E | 775F | 6E69 | 6F64 | 1177 | D605 |
| 0000234640 | 0511 | C000 | 0900 | 7768 | 646E | 6D5F | 6E65 | 1175 |
| 0000234660 | 1405 | 0505 | C000 | 0900 | 7768 | 646E | 6C5F | 7369 |
| 0000234700 | 1474 | 1805 | 0505 | C000 | 0C00 | 7768 | 646E | 635F |
| 0000234720 | 6E6F | 6574 | 7478 | 0514 | 051C | 0005 | 00C0 | 680C |
| 0000234740 | 6E77 | 5F64 | 6572 | 7266 | 7365 | 0568 | 0111 | 0000 |
| 0000234760 | 1C00 | B801 | EC55 | 9905 | 1000 | 8E00 | 0000 | 0400 |
| 0000235000 | 660D | 5F77 | 7061 | 5F70 | 7865 | 7369 | 7374 | 040C |
| 0000235020 | 0006 | 00C0 | 6D06 | 646F | 6C75 | 0F65 | DA04 | EDFF |
| 0000235040 | 0905 | 6970 | 6570 | 6E5F | 6D61 | 0865 | F804 | 85FF |
| 0000235060 | 0200 | 7068 | 0409 | FFFA | 0085 | 6103 | 7463 | 0408 |
| 0000235100 | FFFC | 0081 | 7302 | 0174 | 1A02 | 5101 | F056 | F005 |
| 0000235120 | 1000 | E500 | 0000 | 0400 | 660B | 5F77 | 7473 | 7261 |
| 0000235140 | 5F74 | 6D74 | 040F | 0006 | 00C0 | 7409 | 7365 | 5F74 |
| 0000235160 | 696C | 7473 | 0408 | FFFC | 0081 | 7302 | 0174 | 1A02 |
| 0000235200 | 4101 | F357 | 5E05 | 1000 | 5300 | 0000 | 0400 | 660B |
| 0000235220 | 5F77 | 6C63 | 736F | 5F65 | 6D74 | 0409 | FFF6 | 0085 |
| 0000235240 | 7003 | 6469 | 040D | FFFA | 00C0 | 7407 | 5F6D | 7768 |
| 0000235260 | 646E | 0408 | FFF8 | 0081 | 7302 | 0174 | 1902 | 9F01 |
| 0000235300 | F457 | F905 | 1000 | EE00 | 0000 | 0400 | 660A | 5F77 |
| 0000235320 | 696B | 6C6C | 745F | 096D | F604 | 85FF | 0300 | 6970 |

THU MAR 14 17:35:10 1991 FRAME.EXE PAGE 58, LINE 3364

| | | | | | | | | |
|---|---|---|---|---|---|---|---|---|
| 0000235340 | 0F64 | F804 | C0FF | 0900 | 696B | 6C6C | 685F | 6E77 |
| 0000235360 | 0864 | FC04 | 81FF | 0200 | 7473 | 0201 | 011D | 5898 |
| 0000235400 | 05F7 | 006D | 0010 | 0062 | 0000 | 0E04 | 7766 | 725F |
| 0000235420 | 7365 | 6174 | 7472 | 705F | 6D67 | 0408 | FFFC | 0081 |
| 0000235440 | 7302 | 0174 | 1E02 | 0501 | F959 | 5905 | 1001 | 4E00 |
| 0000235460 | 0001 | 0400 | 660F | 5F77 | 6D74 | 6F5F | 6570 | 5F6E |
| 0000235500 | 6574 | 7473 | 040D | 0006 | 0086 | 7407 | 7365 | 5F74 |
| 0000235520 | 6469 | 0409 | FFF2 | 0085 | 7003 | 6469 | 040D | FFFA |
| 0000235540 | 00C0 | 7407 | 5F6D | 7768 | 646E | 040E | FFF6 | 00C0 |
| 0000235560 | 7008 | 7461 | 5F68 | 7470 | 0872 | F404 | 81FF | 0200 |
| 0000235600 | 7473 | 0201 | 0D05 | 0000 | 001A | 050E | 11E8 | 0005 |
| 0000235620 | 0085 | 6306 | 7672 | 695F | 0D64 | E605 | 0511 | 8500 |
| 0000235640 | 0500 | 6D74 | 695F | 0564 | 0111 | 0000 | 2800 | 5E01 |
| 0000235660 | BF5A | 7408 | 1000 | 6900 | 0000 | 0400 | 6619 | 5F77 |
| 0000235700 | 6F74 | 6767 | 656C | 645F | 7465 | 6961 | 656C | 5F64 |
| 0000235720 | 6F66 | 6D72 | 7461 | 0201 | 011F | 5AD2 | 08C1 | 0062 |
| 0000235740 | 0010 | 0057 | 0000 | 1004 | 7766 | 735F | 7465 | 735F |
| 0000235760 | 726F | 5F74 | 7461 | 7274 | 040F | 0006 | 0085 | 7309 |
| 0000236000 | 726F | 5F74 | 7461 | 7274 | 0201 | 011D | 5B34 | 08C3 |
| 0000236020 | 00DD | 0010 | 00D2 | 0000 | 0E04 | 7766 | 695F | 736E |
| 0000236040 | 7265 | 5F74 | 6F73 | 7472 | 0409 | 0006 | 0086 | 7603 |
| 0000236060 | 6C61 | 040D | 000A | 0085 | 7607 | 6C61 | 635F | 746E |
| 0000236100 | 040D | 000C | 00C6 | 7607 | 6C61 | 615F | 7272 | 0409 |
| 0000236120 | FFFC | 0085 | 6903 | 7864 | 0201 | 0126 | 5C11 | 08C5 |
| 0000236140 | 00D7 | 0010 | 00CC | 0000 | 1704 | 7766 | 645F | 7369 |
| 0000236160 | 6C70 | 7961 | 705F | 7261 | 6E65 | 5F74 | 6E65 | 7274 |
| 0000236200 | 0D79 | 0604 | C500 | 0700 | 6469 | 5F78 | 6461 | 1172 |
| 0000236220 | D804 | FEFF | 0B02 | 6170 | 6572 | 746E | 6E5F | 6D61 |
| 0000236240 | 0F65 | FA04 | 86FF | 0900 | 6170 | 6572 | 746E | 695F |
| 0000236260 | 0864 | F804 | 81FF | 0200 | 7473 | 0201 | 0120 | 5CE8 |
| 0000236300 | 08C8 | 02C6 | 0010 | 02BB | 0000 | 1104 | 7766 | 645F |
| 0000236320 | 7465 | 6961 | 656C | 5F64 | 6E65 | 7274 | 0A79 | 0604 |
| 0000236340 | C000 | 0400 | 616E | 656D | 040A | 000A | 0081 | 7404 |
| 0000236360 | 7079 | 0E65 | 0C04 | CD00 | 0802 | 6974 | 656D | 705F |
| 0000236400 | 7274 | 040A | 0010 | 0086 | 7304 | 7A69 | 0F65 | 1404 |
| 0000236420 | C000 | 0900 | 7874 | 5F74 | 6E65 | 7274 | 0E79 | DA04 |
| 0000236440 | C9FF | 0808 | 6973 | 657A | 735F | 7274 | 040F | FFD8 |
| 0000236460 | 0081 | 6209 | 616C | 6B6E | 635F | 746E | 0201 | 0127 |
| 0000236500 | 5FAE | 08D2 | 00E3 | 0010 | 00D8 | 0000 | 1804 | 7766 |
| 0000236520 | 645F | 7465 | 6961 | 656C | 5F64 | 6966 | 746C | 7265 |
| 0000236540 | 655F | 746E | 7972 | 040C | 0006 | 0086 | 7406 | 7473 |
| 0000236560 | 695F | 0E64 | 0A04 | C000 | 0800 | 626F | 5F6A | 616E |
| 0000236600 | 656D | 040F | 000E | 00C0 | 7409 | 7478 | 655F | 746E |
| 0000236620 | 7972 | 0412 | 0012 | 00C6 | 730C | 726F | 5F74 | 6176 |
| 0000236640 | 5F6C | 6461 | 0872 | 9C04 | 81FF | 0200 | 7473 | 040C |
| 0000236660 | FF9E | 07BD | 6606 | 6C69 | 6574 | 0E72 | F604 | CDFF |
| 0000236700 | 0802 | 6974 | 656D | 705F | 7274 | 0411 | FFFA | 0086 |
| 0000236720 | 660B | 6C69 | 6574 | 5F72 | 6973 | 657A | 0201 | 0125 |
| 0000236740 | 6091 | 08D4 | 00F0 | 0010 | 00E5 | 0000 | 1604 | 7766 |
| 0000236760 | 645F | 7465 | 6961 | 656C | 5F64 | 6369 | 6E6F | 655F |
| 0000237000 | 746E | 7972 | 040C | 0006 | 0086 | 6C06 | 6269 | 695F |
| 0000237020 | 0E64 | 0A04 | C000 | 0800 | 626F | 5F6A | 616E | 656D |
| 0000237040 | 040F | 000E | 00C0 | 7409 | 7478 | 655F | 746E | 7972 |
| 0000237060 | 0412 | 0012 | 00C6 | 730C | 726F | 5F74 | 6176 | 5F6C |
| 0000237100 | 6461 | 0E72 | 4A04 | A8FF | 0807 | 6369 | 6E6F | 685F |
| 0000237120 | 7264 | 040E | FFF6 | 02CD | 7408 | 6D69 | 5F65 | 7470 |
| 0000237140 | 0F72 | FA04 | 86FF | 0900 | 6369 | 6E6F | 735F | 7A69 |
| 0000237160 | 0865 | 4804 | 81FF | 0200 | 7473 | 0201 | 0124 | 6181 |
| 0000237200 | 08D6 | 00F3 | 0010 | 00E8 | 0000 | 1504 | 7766 | 645F |

THU MAR 14 17:35:10 1991 FRAME.EXE PAGE 59, LINE 3423

| | | | | | | | | |
|---|---|---|---|---|---|---|---|---|
| 0000237220 | 7465 | 6961 | 656C | 5F64 | 6D69 | 5F67 | 6E65 | 7274 |
| 0000237240 | 0C79 | 0604 | 8600 | 0600 | 7374 | 5F74 | 6469 | 040E |
| 0000237260 | 000A | 00C0 | 6F08 | 6A62 | 6E5F | 6D61 | 0C65 | 0E04 |
| 0000237300 | 8600 | 0600 | 626F | 5F6A | 6469 | 040F | 0012 | 00C0 |
| 0000237320 | 7409 | 7478 | 655F | 746E | 7972 | 0412 | 0016 | 00C6 |
| 0000237340 | 730C | 726F | 5F74 | 6176 | 5F6C | 6461 | 0D72 | 4004 |
| 0000237360 | 6EFF | 0707 | 6D69 | 5F67 | 6468 | 0E72 | FA04 | CDFF |
| 0000237400 | 0802 | 6974 | 656D | 705F | 7274 | 0414 | FFF4 | 0086 |
| 0000237420 | 690E | 676D | 745F | 746F | 6C61 | 735F | 7A69 | 0865 |
| 0000237440 | F804 | 81FF | 0200 | 7473 | 0201 | 0124 | 6274 | 08D8 |
| 0000237460 | 021E | 0010 | 0213 | 0000 | 1504 | 7766 | 645F | 7465 |
| 0000237500 | 6961 | 656C | 5F64 | 626F | 5F6A | 6E65 | 7274 | 0E79 |
| 0000237520 | 0604 | C000 | 0800 | 626F | 5F6A | 616E | 656D | 040C |
| 0000237540 | 000A | 0086 | 6F06 | 6A62 | 695F | 0F64 | 0E04 | C000 |
| 0000237560 | 0900 | 7874 | 5F74 | 6E65 | 7274 | 1279 | 1204 | C600 |
| 0000237600 | 0C00 | 6F73 | 7472 | 765F | 6C61 | 615F | 7264 | 040D |
| 0000237620 | FFFA | 0733 | 6F07 | 6A62 | 705F | 7274 | 040E | FFF2 |
| 0000237640 | 0086 | 6F08 | 6A62 | 735F | 7A69 | 0E65 | F604 | CDFF |
| 0000237660 | 0802 | 6974 | 656D | 705F | 7274 | 0408 | FFF0 | 0081 |
| 0000237700 | 7302 | 0174 | 2102 | 9201 | DA64 | 9A08 | 1001 | 8F00 |
| 0000237720 | 0001 | 0400 | 6612 | 5F77 | 616E | 656D | 745F | 7079 |
| 0000237740 | 5F65 | 6E65 | 7274 | 0E79 | 0604 | C000 | 0800 | 626F |
| 0000237760 | 5F6A | 616E | 656D | 040E | 000A | 0081 | 6F08 | 6A62 |
| 0000240000 | 745F | 7079 | 0F65 | 0C04 | C000 | 0900 | 7874 | 5F74 |
| 0000240020 | 6E65 | 7274 | 1279 | 1004 | C600 | 0C00 | 6F73 | 7472 |
| 0000240040 | 765F | 6C61 | 615F | 7264 | 0201 | 0125 | 662C | 08DC |
| 0000240060 | 01CB | 0010 | 01C0 | 0000 | 1604 | 7766 | 645F | 7369 |
| 0000240100 | 6C70 | 7961 | 665F | 6C69 | 6574 | 5F72 | 696C | 7473 |
| 0000240120 | 040C | 0006 | 0086 | 7406 | 7473 | 695F | 0D64 | 0A04 |
| 0000240140 | C500 | 0700 | 6469 | 5F78 | 6461 | 0772 | 8E04 | 85FF |
| 0000240160 | 0100 | 0E69 | 9204 | 85FF | 0800 | 616E | 656D | 635F |
| 0000240200 | 746E | 040E | FF94 | 0729 | 6E08 | 6D61 | 5F65 | 736C |
| 0000240220 | 0F74 | 9804 | 53FF | 0907 | 7874 | 5F74 | 6E65 | 7274 |
| 0000240240 | 0C79 | FC04 | 85FF | 0600 | 6F73 | 7472 | 6465 | 040E |
| 0000240260 | FF84 | 0085 | 7308 | 726F | 5F74 | 6469 | 0E78 | 8604 |
| 0000240300 | C6FF | 0800 | 6F73 | 7472 | 6C5F | 7473 | 040E | FF8A |
| 0000240320 | 0086 | 7308 | 726F | 5F74 | 6176 | 086C | 9004 | 81FF |
| 0000240340 | 0200 | 7473 | 0201 | 0123 | 67F7 | 08DE | 01CE | 0010 |
| 0000240360 | 01C3 | 0000 | 1404 | 7766 | 645F | 7369 | 6C70 | 7961 |
| 0000240400 | 695F | 6F63 | 5F6E | 696C | 7473 | 040C | 0006 | 0086 |
| 0000240420 | 6C06 | 6269 | 695F | 0D64 | 0A04 | C500 | 0700 | 6469 |
| 0000240440 | 5F78 | 6461 | 0772 | 8E04 | 85FF | 0100 | 0E69 | 9204 |
| 0000240460 | 85FF | 0800 | 616E | 656D | 635F | 746E | 040E | FF94 |
| 0000240500 | 0729 | 6E08 | 6D61 | 5F65 | 736C | 0F74 | 9804 | 53FF |
| 0000240520 | 0907 | 7874 | 5F74 | 6E65 | 7274 | 0C79 | FC04 | 85FF |
| 0000240540 | 0600 | 6F73 | 7472 | 6465 | 040E | FF84 | 0085 | 7308 |
| 0000240560 | 726F | 5F74 | 6469 | 0E78 | 8604 | C6FF | 0800 | 6F73 |
| 0000240600 | 7472 | 6C5F | 7473 | 040E | FF8A | 0086 | 7308 | 726F |
| 0000240620 | 5F74 | 6176 | 086C | 9004 | 81FF | 0200 | 7473 | 0201 |
| 0000240640 | 0122 | 69C5 | 08E0 | 0206 | 0010 | 01FB | 0000 | 1304 |
| 0000240660 | 7766 | 645F | 7369 | 6C70 | 7961 | 695F | 676D | 6C5F |
| 0000240700 | 7369 | 0C74 | 0604 | 8600 | 0600 | 7374 | 5F74 | 6469 |
| 0000240720 | 040D | 000A | 00C5 | 6907 | 7864 | 615F | 7264 | 0407 |
| 0000240740 | FF8C | 0085 | 6901 | 040D | FF92 | 0085 | 6C07 | 7473 |
| 0000240760 | 635F | 746E | 040D | FF8E | 073F | 6C07 | 7473 | 705F |
| 0000241000 | 7274 | 040F | FF96 | 0753 | 7409 | 7478 | 655F | 746E |
| 0000241020 | 7972 | 040E | FFFA | 0081 | 6408 | 5F62 | 726F | 6564 |
| 0000241040 | 0C72 | FC04 | 85FF | 0600 | 6F73 | 7472 | 6465 | 040E |
| 0000241060 | FF82 | 0085 | 7308 | 726F | 5F74 | 6469 | 0E78 | 8404 |

THU MAR 14 17:35:10 1991 FRAME.EXE PAGE 60, LINE 3482

| | | | | | | | | |
|---|---|---|---|---|---|---|---|---|
| 0000241100 | C6FF | 0800 | 6F73 | 7472 | 6C5F | 7473 | 040E | FF88 |
| 0000241120 | 0086 | 7308 | 726F | 5F74 | 6176 | 086C | 9404 | 81FF |
| 0000241140 | 0200 | 7473 | 0201 | 0122 | 6BCB | 08E2 | 0256 | 0010 |
| 0000241160 | 024B | 0000 | 1304 | 7766 | 645F | 7369 | 6C70 | 7961 |
| 0000241200 | 6F5F | 6A62 | 6C5F | 7369 | 0F74 | 0604 | 8600 | 0900 |
| 0000241220 | 6170 | 6572 | 746E | 695F | 0D64 | 0A04 | C500 | 0700 |
| 0000241240 | 6469 | 5F78 | 6461 | 0D72 | 9404 | 85FF | 0700 | 736C |
| 0000241260 | 5F74 | 6E63 | 0D74 | 9004 | 3FFF | 0707 | 736C | 5F74 |
| 0000241300 | 7470 | 0772 | 8E04 | 85FF | 0100 | 0F69 | 9804 | 53FF |
| 0000241320 | 0907 | 7874 | 5F74 | 6E65 | 7274 | 0C79 | FC04 | 85FF |
| 0000241340 | 0600 | 6F73 | 7472 | 6465 | 040E | FF84 | 0085 | 7308 |
| 0000241360 | 726F | 5F74 | 6469 | 0E78 | 8604 | C6FF | 0800 | 6F73 |
| 0000241400 | 7472 | 6C5F | 7473 | 040E | FF8A | 0086 | 7308 | 726F |
| 0000241420 | 5F74 | 6176 | 166C | 8204 | 85FF | 1000 | 6964 | 7073 |
| 0000241440 | 616C | 5F79 | 6964 | 6173 | 6C62 | 6465 | 0408 | FF96 |
| 0000241460 | 0081 | 7302 | 0174 | 2202 | 2101 | E56E | FC08 | 1000 |
| 0000241500 | F100 | 0000 | 0400 | 6613 | 5F77 | 6964 | 7073 | 616C |
| 0000241520 | 5F79 | 7374 | 5F74 | 696C | 7473 | 040C | 0006 | 0086 |
| 0000241540 | 7406 | 7473 | 695F | 0D64 | 0A04 | C500 | 0700 | 6469 |
| 0000241560 | 5F78 | 6461 | 0872 | FC04 | 81FF | 0200 | 7473 | 0409 |
| 0000241600 | FFFA | 0081 | 7303 | 3174 | 0201 | 0125 | 6F1D | 08E7 |
| 0000241620 | 01C5 | 0010 | 01BA | 0000 | 1604 | 7766 | 645F | 7465 |
| 0000241640 | 6961 | 656C | 5F64 | 7274 | 6565 | 655F | 746E | 7972 |
| 0000241660 | 0410 | 0006 | 00C0 | 640A | 6972 | 6576 | 6E5F | 6D61 |
| 0000241700 | 0F65 | 0A04 | C000 | 0900 | 7874 | 5F74 | 6E65 | 7274 |
| 0000241720 | 0F79 | 8404 | 85FF | 0900 | 7264 | 7669 | 5F65 | 756E |
| 0000241740 | 096D | EC04 | 58FF | 0303 | 7366 | 0969 | 8604 | 53FF |
| 0000241760 | 0307 | 7473 | 1072 | 7A04 | 86FF | 0A00 | 6F74 | 6174 |
| 0000242000 | 5F6C | 6973 | 657A | 040F | FF7E | 0086 | 6609 | 6572 |
| 0000242020 | 5F65 | 6973 | 657A | 040F | FF82 | 0081 | 6209 | 616C |
| 0000242040 | 6B6E | 635F | 746E | 0408 | FFEA | 0081 | 7302 | 0174 |
| 0000242060 | 2302 | E201 | EC70 | F908 | 1001 | EE00 | 0001 | 0400 |
| 0000242100 | 6614 | 5F77 | 6964 | 7073 | 616C | 5F79 | 7274 | 6565 |
| 0000242120 | 6C5F | 7369 | 0D74 | 0604 | C500 | 0700 | 6469 | 5F78 |
| 0000242140 | 6461 | 0772 | 9604 | 85FF | 0100 | 0F69 | 9004 | 85FF |
| 0000242160 | 0900 | 7264 | 7669 | 5F65 | 6E63 | 0F74 | 9204 | 29FF |
| 0000242200 | 0907 | 7264 | 7669 | 5F65 | 736C | 0F74 | 9A04 | 53FF |
| 0000242220 | 0907 | 7874 | 5F74 | 6E65 | 7274 | 0879 | 9804 | 81FF |
| 0000242240 | 0200 | 7473 | 0201 | 011D | 72DB | 08EF | 01D5 | 0010 |
| 0000242260 | 01CA | 0000 | 0E04 | 7766 | 645F | 7369 | 6C70 | 7961 |
| 0000242300 | 775F | 6E69 | 0417 | 0006 | 0085 | 7211 | 7365 | 6F74 |
| 0000242320 | 6572 | 735F | 7263 | 6C6F | 696C | 676E | 0409 | FFFC |
| 0000242340 | 0085 | 6903 | 7864 | 040D | FFF6 | 0082 | 7407 | 706F |
| 0000242360 | 695F | 7864 | 0408 | FFFA | 0081 | 7302 | 0174 | 2402 |
| 0000242400 | B001 | F074 | 6208 | 1000 | 5700 | 0000 | 0400 | 6615 |
| 0000242420 | 5F77 | 6573 | 5F74 | 7264 | 7669 | 7365 | 635F | 6E6F |
| 0000242440 | 6574 | 7478 | 0408 | FFFC | 0081 | 7302 | 0174 | 1D02 |
| 0000242460 | 1201 | F375 | D508 | 1002 | CA00 | 0002 | 0400 | 660E |
| 0000242500 | 5F77 | 6573 | 5F74 | 6F63 | 746E | 7865 | 1274 | 0604 |
| 0000242520 | C000 | 0C00 | 6F63 | 746E | 7865 | 5F74 | 6170 | 6874 |
| 0000242540 | 0410 | 000A | 0086 | 630A | 6E6F | 6574 | 7478 | 695F |
| 0000242560 | 0E64 | F804 | C0FF | 0800 | 6170 | 6874 | 705F | 7274 |
| 0000242600 | 0410 | FFD4 | 02FE | 640A | 6972 | 6576 | 6E5F | 6D61 |
| 0000242620 | 1265 | F604 | 81FF | 0C00 | 6F63 | 746E | 7865 | 5F74 |
| 0000242640 | 7974 | 6570 | 0417 | FFFC | 0085 | 7211 | 7365 | 6F74 |
| 0000242660 | 6572 | 735F | 7263 | 6C6F | 696C | 676E | 0408 | FFF4 |
| 0000242700 | 0081 | 7302 | 0174 | 1D02 | E701 | F677 | 4908 | 1000 |
| 0000242720 | 3E00 | 0000 | 0400 | 660E | 5F77 | 6567 | 5F74 | 6F63 |
| 0000242740 | 746E | 7865 | 1474 | 0604 | C600 | 0E00 | 6F63 | 746E |

THU MAR 14 17:35:10 1991 FRAME.EXE PAGE 61, LINE 3541

| | | | | | | | | |
|---|---|---|---|---|---|---|---|---|
| 0000242760 | 7865 | 5F74 | 6469 | 615F | 7264 | 0416 | 000A | 00C0 |
| 0000243000 | 6310 | 6E6F | 6574 | 7478 | 705F | 7461 | 5F68 | 7470 |
| 0000243020 | 0172 | 1B02 | 3001 | F778 | BA08 | 1001 | AF00 | 0001 |
| 0000243040 | 0400 | 660C | 5F77 | 6E69 | 7469 | 645F | 7369 | 1070 |
| 0000243060 | FA04 | 86FF | 0A00 | 6F63 | 746E | 7865 | 5F74 | 6469 |
| 0000243100 | 040C | FFF2 | 0086 | 6306 | 6766 | 695F | 0E64 | F204 |
| 0000243120 | 7CFD | 0808 | 6F6C | 5F67 | 6170 | 6874 | 040E | FFF6 |
| 0000243140 | 0085 | 6C08 | 6E69 | 5F65 | 756E | 126D | F204 | 7CFE |
| 0000243160 | 0C08 | 6177 | 6E72 | 6E69 | 5F67 | 696C | 656E | 0408 |
| 0000243200 | FFF8 | 0081 | 7302 | 0174 | 0502 | 000D | 1A00 | 1600 |
| 0000243220 | EA05 | 0511 | 8600 | 0E00 | 7766 | 5F30 | 6F63 | 746E |
| 0000243240 | 7865 | 5F74 | 6469 | 0518 | 11EE | 0005 | 087C | 6610 |
| 0000243260 | 3077 | 635F | 6E6F | 6574 | 7478 | 705F | 7461 | 1968 |
| 0000243300 | 8A05 | 0506 | 8500 | 1100 | 7766 | 5F30 | 6564 | 6174 |
| 0000243320 | 6C69 | 6465 | 665F | 616C | 1567 | EE05 | 0512 | 8500 |
| 0000243340 | 0D00 | 7766 | 5F30 | 6F73 | 7472 | 615F | 7474 | 1872 |
| 0000243360 | 8C05 | 0506 | 8500 | 1000 | 7766 | 5F30 | 7375 | 5F65 |
| 0000243400 | 6F70 | 6E69 | 6574 | 7372 | 6607 | 6172 | 656D | 632E |
| 0000243420 | 0001 | 009A | 0054 | 2F5C | 0059 | 2F6C | 005A | 2F8E |
| 0000243440 | 005D | 2F9D | 005E | 2FA2 | 0061 | 2FAD | 0064 | 2FB4 |
| 0000243460 | 0065 | 2FC8 | 0066 | 2FD1 | 0067 | 2FD9 | 006B | 2FDF |
| 0000243500 | 006C | 2FE7 | 006E | 2FF6 | 0070 | 2FFC | 007E | 3007 |
| 0000243520 | 0082 | 3017 | 0083 | 3021 | 0084 | 302A | 0087 | 3032 |
| 0000243540 | 008A | 3037 | 008C | 304B | 009C | 3056 | 009E | 306C |
| 0000243560 | 00A3 | 3071 | 00A5 | 3077 | 00A8 | 307D | 00A9 | 3090 |
| 0000243600 | 00AC | 3093 | 00AD | 30A6 | 00B0 | 30A9 | 00B1 | 30BC |
| 0000243620 | 00B4 | 30BF | 00B5 | 30D2 | 00BB | 30D5 | 00B9 | 30E6 |
| 0000243640 | 00BC | 30E9 | 00BD | 30FC | 00C0 | 30FF | 00C1 | 3112 |
| 0000243660 | 00C4 | 3115 | 00C5 | 311E | 00C6 | 3123 | 00CA | 3126 |
| 0000243700 | 00CB | 312D | 00CD | 313D | 00CF | 3144 | 00D1 | 3147 |
| 0000243720 | 00D2 | 3157 | 00D4 | 315A | 00D5 | 316A | 00D7 | 316D |
| 0000243740 | 00D8 | 3176 | 00D9 | 3179 | 00DB | 3196 | 00DC | 319B |
| 0000243760 | 00E0 | 319E | 00E1 | 31A7 | 00E2 | 31B1 | 00E4 | 31BA |
| 0000244000 | 00E5 | 31BF | 00EA | 31C2 | 00EB | 31CB | 00EC | 31E0 |
| 0000244020 | 00EE | 31E9 | 00EF | 31EE | 00F3 | 31F1 | 00F4 | 31F8 |
| 0000244040 | 00F5 | 3201 | 00F6 | 3206 | 00FC | 3209 | 00FD | 3210 |
| 0000244060 | 00FE | 321F | 00FF | 3224 | 0103 | 3227 | 0104 | 3238 |
| 0000244100 | 0107 | 323B | 0108 | 324C | 010D | 324F | 010E | 3254 |
| 0000244120 | 0111 | 3257 | 0112 | 326C | 0117 | 326F | 011A | 328A |
| 0000244140 | 011B | 3294 | 011C | 32A0 | 011E | 32A6 | 011F | 32B2 |
| 0000244160 | 0120 | 32BA | 0122 | 32BD | 0123 | 32D7 | 0124 | 32EB |
| 0000244200 | 0125 | 32F0 | 0127 | 32F3 | 0129 | 32F6 | 012A | 3310 |
| 0000244220 | 012B | 3324 | 012C | 3329 | 0132 | 332C | 0133 | 3342 |
| 0000244240 | 0134 | 3347 | 0136 | 334A | 0138 | 33DA | 0139 | 33E3 |
| 0000244260 | 013C | 33F1 | 013E | 33F8 | 0140 | 33FE | 0150 | 340C |
| 0000244300 | 0155 | 3422 | 0157 | 3428 | 015A | 342E | 015B | 3436 |
| 0000244320 | 015E | 3439 | 0160 | 3456 | 0162 | 3464 | 0164 | 346B |
| 0000244340 | 0166 | 3471 | 017E | 347F | 0187 | 3495 | 0197 | 349B |
| 0000244360 | 0198 | 34B8 | 019B | 34C1 | 019C | 34DE | 01A2 | 34E7 |
| 0000244400 | 01A5 | 3502 | 01A7 | 351C | 01A8 | 3531 | 01AA | 353A |
| 0000244420 | 01AE | 353D | 01AF | 354D | 01B4 | 3556 | 01B5 | 3564 |
| 0000244440 | 01BA | 3567 | 01BC | 3582 | 01BE | 3592 | 01C0 | 35B0 |
| 0000244460 | 01C1 | 35BD | 01C3 | 35C6 | 01C5 | 3604 | 01C7 | 3621 |
| 0000244500 | 01CD | 362F | 01D0 | 363F | 01D8 | 3651 | 01D9 | 366C |
| 0000244520 | 01DE | 367B | 01DF | 369B | 01E2 | 36AE | 01E5 | 36C6 |
| 0000244540 | 01E8 | 36CE | 01E9 | 36D8 | 01EC | 36DB | 01ED | 36E8 |
| 0000244560 | 01F1 | 36EB | 01F4 | 36FF | 01F6 | 3705 | 6607 | 5F77 |
| 0000244600 | 706F | 632E | 0001 | 0154 | 0056 | 3710 | 005C | 3720 |
| 0000244620 | 005D | 3737 | 0061 | 373D | 0062 | 3753 | 0063 | 375D |

THU MAR 14 17:35:10 1991 FRAME.EXE PAGE 62, LINE 3600

| | | | | | | | | |
|---|---|---|---|---|---|---|---|---|
| 0000244640 | 0066 | 378D | 0067 | 37A3 | 0068 | 37AD | 006A | 37B3 |
| 0000244660 | 006B | 37C3 | 006C | 37DF | 006D | 37F3 | 0072 | 37FE |
| 0000244700 | 007A | 3812 | 007B | 387E | 007E | 3884 | 0083 | 3890 |
| 0000244720 | 0084 | 38C5 | 0085 | 38E8 | 0086 | 3905 | 008B | 3908 |
| 0000244740 | 008E | 390E | 008F | 3924 | 0090 | 392A | 0091 | 392D |
| 0000244760 | 0092 | 3943 | 0093 | 3949 | 0095 | 394C | 0097 | 3967 |
| 0000245000 | 0099 | 396D | 00B0 | 3978 | 00B4 | 3988 | 00B5 | 3998 |
| 0000245020 | 00BB | 39A7 | 00BD | 3A1F | 00BF | 3A34 | 00C0 | 3A37 |
| 0000245040 | 00C1 | 3A49 | 00C2 | 3A5A | 00C5 | 3A6B | 00C7 | 3A71 |
| 0000245060 | 00DE | 3A7C | 00E5 | 3A8C | 00E8 | 3A94 | 00EA | 3A9A |
| 0000245100 | 00EB | 3AAC | 00EC | 3ABE | 00EE | 3AD0 | 00EF | 3AD6 |
| 0000245120 | 00F0 | 3AE8 | 00F1 | 3AFA | 00F3 | 3AFD | 00F4 | 3B0F |
| 0000245140 | 00F5 | 3B21 | 00F7 | 3B24 | 00F8 | 3B36 | 00F9 | 3B48 |
| 0000245160 | 00FB | 3B4B | 00FC | 3B5D | 00FD | 3B6F | 00FF | 3B72 |
| 0000245200 | 0101 | 3B75 | 0103 | 3B96 | 0106 | 3BA8 | 0109 | 3BBA |
| 0000245220 | 010A | 3BCB | 010D | 3BD4 | 0110 | 3BDB | 0111 | 3BF1 |
| 0000245240 | 0112 | 3BFA | 0113 | 3C04 | 0114 | 3C0C | 0117 | 3C12 |
| 0000245260 | 0118 | 3C2C | 0119 | 3C35 | 011A | 3C3C | 011B | 3C44 |
| 0000245300 | 011D | 3C4A | 011E | 3C4D | 0121 | 3C55 | 0123 | 3C5B |
| 0000245320 | 0134 | 3C66 | 0137 | 3C76 | 013A | 3C7B | 013D | 3C83 |
| 0000245340 | 013E | 3C9C | 013F | 3CA5 | 0140 | 3CAD | 0143 | 3CB3 |
| 0000245360 | 0144 | 3CCF | 0145 | 3CDC | 0146 | 3CE1 | 0147 | 3CE4 |
| 0000245400 | 0148 | 3CF6 | 0149 | 3CFB | 014A | 3CFE | 014C | 3D03 |
| 0000245420 | 014E | 3D06 | 0153 | 3D0E | 0154 | 3D2B | 0155 | 3D34 |
| 0000245440 | 0156 | 3D39 | 0158 | 3D4D | 0159 | 3D50 | 015A | 3D5A |
| 0000245460 | 015B | 3D5F | 0160 | 3D64 | 0162 | 3D6D | 0163 | 3D8D |
| 0000245500 | 0164 | 3D96 | 0165 | 3D9F | 0166 | 3DA4 | 0167 | 3DA7 |
| 0000245520 | 0169 | 3DAC | 016B | 3DAF | 016C | 3DC2 | 0174 | 3DC7 |
| 0000245540 | 0175 | 3DD0 | 0176 | 3DD9 | 0177 | 3DF5 | 0178 | 3DF8 |
| 0000245560 | 0179 | 3E01 | 017A | 3E19 | 017B | 3E1C | 0180 | 3E21 |
| 0000245600 | 0182 | 3E31 | 0183 | 3E3A | 0184 | 3E42 | 0187 | 3E48 |
| 0000245620 | 0189 | 3E50 | 018A | 3E59 | 018B | 3E61 | 018E | 3E67 |
| 0000245640 | 0190 | 3E6D | 01A6 | 3E78 | 01AC | 3E88 | 01B1 | 3E92 |
| 0000245660 | 01B4 | 3E9A | 01B6 | 3EA0 | 01B7 | 3EB2 | 01BB | 3EC4 |
| 0000245700 | 01BC | 3ED6 | 01BD | 3EED | 01BF | 3F03 | 01C1 | 3F46 |
| 0000245720 | 01C2 | 3F5B | 01C3 | 3F64 | 01C4 | 3F78 | 01C7 | 3F8B |
| 0000245740 | 01CA | 3F8E | 01CD | 3FC4 | 01CE | 3FD4 | 01CF | 3FEA |
| 0000245760 | 01D0 | 3FF5 | 01D1 | 400B | 01D2 | 400E | 01D3 | 4022 |
| 0000246000 | 01D8 | 4036 | 01D9 | 4047 | 01DC | 4050 | 01DF | 4057 |
| 0000246020 | 01E0 | 406E | 01E1 | 4077 | 01E4 | 407D | 01E5 | 40AA |
| 0000246040 | 01EA | 40AD | 01EB | 40C3 | 01EC | 40CC | 01ED | 40D4 |
| 0000246060 | 01EE | 40D7 | 01EF | 40DF | 01F4 | 40E2 | 01F5 | 40F5 |
| 0000246100 | 01F6 | 40FE | 01F7 | 4106 | 01F8 | 4109 | 01F9 | 4111 |
| 0000246120 | 01FC | 4114 | 01FD | 4119 | 0200 | 411C | 0201 | 4124 |
| 0000246140 | 0203 | 4127 | 0205 | 4147 | 0209 | 414D | 020C | 4167 |
| 0000246160 | 020D | 4171 | 020F | 4189 | 0211 | 41A3 | 0213 | 41AA |
| 0000246200 | 0214 | 41C4 | 0216 | 41CC | 0217 | 41CF | 0219 | 41D4 |
| 0000246220 | 021A | 41D7 | 021C | 41DF | 021D | 41E8 | 021E | 41EF |
| 0000246240 | 021F | 41F7 | 0220 | 41FF | 0224 | 4205 | 0227 | 420B |
| 0000246260 | 0238 | 4216 | 0242 | 4226 | 0243 | 423C | 0244 | 4245 |
| 0000246300 | 0245 | 424F | 0246 | 4257 | 0248 | 425D | 0249 | 4273 |
| 0000246320 | 024A | 427C | 024B | 4286 | 024C | 428E | 0250 | 4294 |
| 0000246340 | 0251 | 42A7 | 0252 | 42B0 | 0253 | 42BA | 0254 | 42C0 |
| 0000246360 | 0255 | 42C3 | 0256 | 42CB | 0259 | 42D1 | 025C | 42DE |
| 0000246400 | 025D | 42F4 | 025E | 430A | 025F | 4315 | 0261 | 4321 |
| 0000246420 | 0262 | 4337 | 0263 | 4342 | 0265 | 434E | 0266 | 4359 |
| 0000246440 | 0268 | 4365 | 0269 | 4371 | 026B | 4377 | 026C | 437A |
| 0000246460 | 0270 | 437D | 0271 | 438F | 0274 | 43A3 | 0275 | 43B6 |
| 0000246500 | 0276 | 43BF | 0277 | 43C9 | 0278 | 43CF | 0279 | 43D2 |

THU MAR 14 17:35:10 1991 FRAME.EXE PAGE 63, LINE 3659

| | | | | | | | | |
|---|---|---|---|---|---|---|---|---|
| 0000246520 | 027A | 43DA | 027F | 43E0 | 0281 | 43F8 | 0282 | 4412 |
| 0000246540 | 0283 | 4418 | 0284 | 441B | 0287 | 4421 | 029D | 442C |
| 0000246560 | 02A5 | 443C | 02A8 | 4444 | 02A9 | 444B | 02AA | 4450 |
| 0000246600 | 02AD | 4455 | 02B0 | 4467 | 02B2 | 44C1 | 02B3 | 44D7 |
| 0000246620 | 02B4 | 44E1 | 02B5 | 44F5 | 02BA | 4508 | 02BC | 451A |
| 0000246640 | 02BF | 4524 | 02C0 | 453C | 02C1 | 4546 | 02C2 | 454D |
| 0000246660 | 02C6 | 4554 | 02C8 | 455B | 02CB | 4564 | 02CC | 4589 |
| 0000246700 | 02CF | 458C | 02D1 | 45B1 | 02D2 | 45BB | 02D3 | 45C2 |
| 0000246720 | 02D4 | 45CA | 02D5 | 45D3 | 02D7 | 45DA | 02D8 | 45DD |
| 0000246740 | 02DD | 45E5 | 02DF | 45EB | 02EC | 45F6 | 02F1 | 4606 |
| 0000246760 | 02F2 | 460E | 02F3 | 4623 | 02F5 | 4629 | 02FA | 4641 |
| 0000247000 | 02FB | 4665 | 02FC | 466D | 02FF | 4673 | 0300 | 4686 |
| 0000247020 | 0302 | 468C | 0316 | 4697 | 031C | 46A7 | 031F | 46AF |
| 0000247040 | 0321 | 46B5 | 0322 | 46C7 | 0323 | 46D9 | 0326 | 46EB |
| 0000247060 | 0327 | 46FC | 032A | 4705 | 032B | 4716 | 032E | 4725 |
| 0000247100 | 0330 | 472C | 0331 | 473E | 0332 | 4747 | 0333 | 474E |
| 0000247120 | 0334 | 4756 | 0337 | 475C | 0338 | 4761 | 0339 | 4766 |
| 0000247140 | 033C | 476B | 033D | 4780 | 0340 | 478F | 0342 | 4795 |
| 0000247160 | 0357 | 47A0 | 035F | 47B0 | 0362 | 47B8 | 0364 | 47BE |
| 0000247200 | 0365 | 47D0 | 0366 | 47E2 | 0369 | 47F4 | 036A | 4805 |
| 0000247220 | 036C | 480E | 036D | 481F | 0370 | 482E | 0371 | 4846 |
| 0000247240 | 0372 | 4860 | 0375 | 4866 | 0378 | 486D | 0379 | 487B |
| 0000247260 | 037A | 4884 | 037B | 488B | 037C | 4893 | 0380 | 4899 |
| 0000247300 | 0381 | 48AA | 0382 | 48B3 | 0383 | 48C6 | 0384 | 48C9 |
| 0000247320 | 0387 | 48DE | 0389 | 48E4 | 6608 | 5F77 | 6977 | 2E6E |
| 0000247340 | 0163 | BA00 | 5700 | F000 | 5948 | 0000 | 5A49 | 1100 |
| 0000247360 | 5C49 | 2C00 | 5F49 | 4B00 | 6449 | 6B00 | 6749 | 8D00 |
| 0000247400 | 6A49 | 9E00 | 6C49 | B600 | 6F49 | CD00 | 7249 | E400 |
| 0000247420 | 7349 | FB00 | 7449 | 1200 | 774A | 2900 | 7A4A | 4500 |
| 0000247440 | 7C4A | 5600 | 7E4A | 5C00 | 944A | 6700 | 964A | 7700 |
| 0000247460 | 974A | 8400 | 984A | 8F00 | 9A4A | 9A00 | B04A | A500 |
| 0000247500 | BA4A | B500 | BB4A | C100 | BF4A | C400 | C04A | CD00 |
| 0000247520 | C24A | D600 | C74A | F600 | C84A | 0800 | C94B | 1000 |
| 0000247540 | CD4B | 2700 | CF4B | 3000 | D34B | 4F00 | D44B | 5800 |
| 0000247560 | D54B | 6100 | D84B | 8100 | ED4B | 8C00 | EF4B | 9C00 |
| 0000247600 | F14B | AA00 | F24B | B300 | F34B | C200 | F44B | C500 |
| 0000247620 | F64B | D400 | 0C4B | DF01 | 104B | EF01 | 124B | 1001 |
| 0000247640 | 284C | 1B01 | 2E4C | 2B01 | 304C | 6101 | 454C | 6C01 |
| 0000247660 | 494C | 7C01 | 4B4C | 9A01 | 604C | A501 | 644C | B501 |
| 0000247700 | 664C | D201 | 7B4C | DD01 | 804C | ED01 | 824C | 1E01 |
| 0000247720 | 994D | 2901 | 9D4D | 3F01 | A04D | 4501 | A24D | 5201 |
| 0000247740 | A44D | 6C01 | A54D | 7A01 | A74D | 9401 | A84D | A301 |
| 0000247760 | AA4D | C001 | AC4D | CE01 | AE4D | EB01 | B14D | F401 |
| 0000250000 | B24D | 0C01 | B54E | 1501 | BA4E | 1B01 | BB4E | 3A01 |
| 0000250020 | BC4E | 4701 | BF4E | 5001 | C04E | 5D01 | C34E | 6601 |
| 0000250040 | C44E | 7E01 | C64E | 8701 | C74E | 8A01 | C94E | A401 |
| 0000250060 | CA4E | C101 | CC4E | DE01 | CE4E | E701 | E34E | F501 |
| 0000250100 | E74E | 0501 | E94F | 2D01 | 024F | 3802 | 064F | 4E02 |
| 0000250120 | 094F | 5402 | 0E4F | 6102 | 124F | 7B02 | 154F | 9502 |
| 0000250140 | 164F | A202 | 174F | B402 | 184F | B702 | 1B4F | C902 |
| 0000250160 | 1D4F | D702 | 1F4F | F402 | 224F | FD02 | 234F | 0D02 |
| 0000250200 | 2750 | 1602 | 2C50 | 1C02 | 3050 | 3B02 | 3150 | 5A02 |
| 0000250220 | 3250 | 6702 | 3550 | 7002 | 3650 | 7D02 | 3950 | 8602 |
| 0000250240 | 3A50 | 9602 | 3C50 | 9F02 | 3D50 | A202 | 3F50 | BC02 |
| 0000250260 | 4050 | D902 | 4250 | F602 | 4450 | FF02 | 5A50 | 0D02 |
| 0000250300 | 5E51 | 1D02 | 6051 | 4202 | 7751 | 4D02 | 7851 | 5D02 |
| 0000250320 | 7A51 | 7302 | 9251 | 7E02 | 9A51 | 8E02 | 9C51 | B102 |
| 0000250340 | 9D51 | C302 | 9E51 | CB02 | A651 | D102 | A851 | F402 |
| 0000250360 | AA51 | FA02 | BF51 | 0502 | C352 | 1502 | C552 | 3302 |

THU MAR 14 17:35:10 1991 FRAME.EXE PAGE 64, LINE 3718

| | | | | | | | | |
|---|---|---|---|---|---|---|---|---|
| 0000250400 | DA52 | 3E02 | E052 | 4E02 | E152 | 6F02 | E252 | 8102 |
| 0000250420 | E452 | 8902 | E652 | 9202 | FB52 | 9D02 | 0052 | AD03 |
| 0000250440 | 0252 | CB03 | 1852 | D603 | 2052 | E603 | 2152 | 0403 |
| 0000250460 | 2253 | 0D03 | 2353 | 1903 | 2A53 | 1F03 | 2B53 | 4703 |
| 0000250500 | 2C53 | 5603 | 2E53 | 6203 | 3053 | 6803 | 4953 | 7303 |
| 0000250520 | 5153 | 8303 | 5253 | A103 | 5353 | AA03 | 5453 | B603 |
| 0000250540 | 5C53 | BC03 | 5D53 | E403 | 5E53 | F303 | 6753 | FF03 |
| 0000250560 | 6953 | 2003 | 6B54 | 2603 | 8154 | 3103 | 8954 | 4103 |
| 0000250600 | 8A54 | 5F03 | 8B54 | 6803 | 8C54 | 6F03 | 9554 | 7503 |
| 0000250620 | 9754 | 9603 | 9854 | AA03 | 9954 | C403 | 9C54 | E003 |
| 0000250640 | 9E54 | E803 | A054 | EE03 | BA54 | F903 | C154 | 0903 |
| 0000250660 | C955 | 1E03 | CC55 | 6603 | CE55 | 7703 | CF55 | 8303 |
| 0000250700 | D255 | 8803 | D555 | A703 | D755 | AD03 | 0855 | 7766 |
| 0000250720 | 615F | 7070 | 632E | 0001 | 005D | 0044 | 55B8 | 004A |
| 0000250740 | 55C8 | 004E | 55DF | 0050 | 5604 | 0052 | 560A | 0055 |
| 0000250760 | 5612 | 0059 | 5618 | 005C | 561E | 005D | 5624 | 005E |
| 0000251000 | 5646 | 0079 | 5651 | 007D | 5661 | 007E | 5670 | 0080 |
| 0000251020 | 5676 | 0081 | 567B | 0086 | 567E | 0089 | 5683 | 008A |
| 0000251040 | 5692 | 008B | 569B | 008C | 56A0 | 008D | 56A3 | 0090 |
| 0000251060 | 56A8 | 0091 | 56C1 | 0092 | 56CB | 009B | 56D1 | 009C |
| 0000251100 | 56F0 | 009D | 56FA | 00A1 | 5700 | 00A2 | 5715 | 00A5 |
| 0000251120 | 5718 | 00A7 | 571B | 00A9 | 5730 | 00AB | 5736 | 00C1 |
| 0000251140 | 5741 | 00C8 | 5751 | 00C9 | 5765 | 00CA | 5779 | 00CC |
| 0000251160 | 578E | 00CF | 5794 | 00E5 | 579F | 00EB | 57AF | 00EC |
| 0000251200 | 57BE | 00ED | 57C7 | 00EE | 57DF | 00F1 | 57E5 | 00F4 |
| 0000251220 | 57EC | 00F5 | 57FA | 00F8 | 5808 | 00F9 | 581C | 00FA |
| 0000251240 | 5825 | 00FC | 5832 | 00FD | 5846 | 00FE | 584F | 0101 |
| 0000251260 | 585C | 0109 | 5869 | 010A | 5878 | 010B | 5881 | 010D |
| 0000251300 | 5887 | 010F | 588D | 0129 | 5898 | 012D | 58A8 | 012E |
| 0000251320 | 58B6 | 0131 | 58C4 | 0133 | 58D1 | 0134 | 58EE | 0136 |
| 0000251340 | 58F4 | 0137 | 58FA | 014C | 5905 | 0153 | 5915 | 0154 |
| 0000251360 | 5928 | 0155 | 5931 | 0156 | 5939 | 0159 | 593F | 015B |
| 0000251400 | 5946 | 015D | 5953 | 015F | 5981 | 0160 | 5992 | 0162 |
| 0000251420 | 59A5 | 0166 | 59AB | 0167 | 59BF | 016A | 59D3 | 016E |
| 0000251440 | 59E2 | 0170 | 59FA | 0172 | 59FD | 0173 | 5A0D | 0176 |
| 0000251460 | 5A10 | 0177 | 5A20 | 017A | 5A23 | 017B | 5A2C | 017C |
| 0000251500 | 5A34 | 017E | 5A37 | 0180 | 5A4D | 0182 | 5A53 | 6609 |
| 0000251520 | 5F77 | 6964 | 7073 | 632E | 0001 | 0205 | 00D5 | 5A5E |
| 0000251540 | 00D7 | 5A6E | 00D9 | 5A82 | 00DA | 5A8C | 00DB | 5A96 |
| 0000251560 | 00DC | 5A99 | 00DE | 5AA3 | 00DF | 5AB7 | 00E2 | 5AC1 |
| 0000251600 | 00E4 | 5AC7 | 00F9 | 5AD2 | 00FB | 5AE2 | 00FD | 5AEE |
| 0000251620 | 00FF | 5AF4 | 0103 | 5B00 | 0104 | 5B1E | 0106 | 5B23 |
| 0000251640 | 0108 | 5B29 | 0117 | 5B34 | 011B | 5B44 | 011E | 5B49 |
| 0000251660 | 011F | 5B95 | 0121 | 5B9B | 0124 | 5BAC | 0126 | 5BB8 |
| 0000251700 | 0129 | 5BEA | 012B | 5C00 | 012D | 5C06 | 0139 | 5C11 |
| 0000251720 | 0140 | 5C21 | 0142 | 5C49 | 0144 | 5C53 | 0147 | 5C56 |
| 0000251740 | 0148 | 5C74 | 014A | 5C7D | 014C | 5C87 | 014D | 5C91 |
| 0000251760 | 014F | 5C96 | 0150 | 5C99 | 0151 | 5CA1 | 0157 | 5CA7 |
| 0000252000 | 0158 | 5CC2 | 015A | 5CD1 | 015C | 5CD7 | 015E | 5CDD |
| 0000252020 | 016F | 5CE8 | 0185 | 5CF8 | 0189 | 5D29 | 018A | 5DF2 |
| 0000252040 | 018E | 5DF5 | 0191 | 5EB8 | 0193 | 5EE0 | 0194 | 5EF5 |
| 0000252060 | 0195 | 5F0C | 0196 | 5F15 | 0198 | 5F2A | 019A | 5F3D |
| 0000252100 | 019B | 5F40 | 019C | 5F54 | 019D | 5F66 | 019E | 5F69 |
| 0000252120 | 01A1 | 5F7B | 01A2 | 5F8F | 01AB | 5FA3 | 01BA | 5FAE |
| 0000252140 | 01C2 | 5FBE | 01C3 | 5FDB | 01C4 | 5FE4 | 01C5 | 5FEC |
| 0000252160 | 01CA | 5FF2 | 01CD | 6005 | 01D2 | 600F | 01D6 | 6031 |
| 0000252200 | 01D8 | 6037 | 01D9 | 6047 | 01DC | 604A | 01DD | 605A |
| 0000252220 | 01E0 | 605D | 01E1 | 6069 | 01E3 | 606C | 01E5 | 6080 |
| 0000252240 | 01E7 | 6086 | 01F6 | 6091 | 01FE | 60A1 | 01FF | 60BC |

THU MAR 14 17:35:10 1991 FRAME.EXE PAGE 65, LINE 3777

| | | | | | | | | |
|---|---|---|---|---|---|---|---|---|
| 0000252260 | 0200 | 60C6 | 0201 | 60CF | 0206 | 60D6 | 0209 | 60EA |
| 0000252300 | 020E | 60FD | 0212 | 611F | 0214 | 6125 | 0215 | 6137 |
| 0000252320 | 0218 | 613A | 0219 | 614A | 021C | 614D | 021D | 6159 |
| 0000252340 | 021F | 615C | 0221 | 6170 | 0223 | 6176 | 0233 | 6181 |
| 0000252360 | 023B | 6191 | 023C | 61B3 | 023D | 61BC | 023E | 61C4 |
| 0000252400 | 0243 | 61CA | 0246 | 61DD | 024B | 61EE | 024F | 6214 |
| 0000252420 | 0251 | 621A | 0252 | 622A | 0255 | 622D | 0256 | 623D |
| 0000252440 | 0259 | 6240 | 025A | 624C | 025C | 624F | 025E | 6263 |
| 0000252460 | 0260 | 6269 | 026F | 6274 | 0277 | 6284 | 0278 | 629B |
| 0000252500 | 0279 | 62A4 | 027A | 62AC | 027F | 62B2 | 0283 | 62CB |
| 0000252520 | 0285 | 62D8 | 0286 | 62E0 | 0287 | 62E3 | 0288 | 62FC |
| 0000252540 | 0289 | 6305 | 0295 | 630F | 0299 | 6335 | 029B | 633B |
| 0000252560 | 029C | 6347 | 029F | 634A | 02A1 | 6420 | 02A4 | 6423 |
| 0000252600 | 02A5 | 6438 | 02A8 | 643B | 02A9 | 644B | 02AB | 644E |
| 0000252620 | 02AD | 646E | 02AF | 6481 | 02B1 | 6487 | 02C1 | 6492 |
| 0000252640 | 02C4 | 64A2 | 02C7 | 653C | 02CA | 6550 | 02CB | 655A |
| 0000252660 | 02CC | 6566 | 02CD | 6569 | 02CF | 661B | 02D1 | 6621 |
| 0000252700 | 02DE | 662C | 02E5 | 663C | 02EC | 6644 | 02ED | 665E |
| 0000252720 | 02EE | 6667 | 02EF | 6671 | 02F0 | 6677 | 02F1 | 667A |
| 0000252740 | 02F2 | 6682 | 02F8 | 6688 | 02F9 | 669C | 02FA | 66A1 |
| 0000252760 | 02FB | 66B6 | 02FC | 66C1 | 02FD | 66C6 | 02FF | 66DE |
| 0000253000 | 0300 | 66E1 | 0304 | 66E6 | 0306 | 66FC | 0308 | 6706 |
| 0000253020 | 0309 | 672F | 030B | 6732 | 030D | 6757 | 0310 | 6763 |
| 0000253040 | 0311 | 676C | 0312 | 6772 | 0313 | 6775 | 0317 | 678F |
| 0000253060 | 0318 | 67AD | 031A | 67B9 | 031C | 67BC | 031D | 67CF |
| 0000253100 | 031F | 67DD | 0321 | 67E6 | 0323 | 67EC | 0330 | 67F7 |
| 0000253120 | 0337 | 6807 | 033E | 680F | 033F | 6829 | 0340 | 6832 |
| 0000253140 | 0341 | 683C | 0342 | 6842 | 0343 | 6845 | 0344 | 684D |
| 0000253160 | 034A | 6853 | 034B | 6867 | 034C | 686C | 034D | 6881 |
| 0000253200 | 034E | 688C | 034F | 6891 | 0350 | 6894 | 0352 | 68AC |
| 0000253220 | 0353 | 68AF | 0357 | 68B4 | 0359 | 68CA | 035B | 68D4 |
| 0000253240 | 035C | 68FD | 035E | 6900 | 0360 | 6925 | 0363 | 6931 |
| 0000253260 | 0364 | 693A | 0365 | 6940 | 0366 | 6943 | 036A | 695D |
| 0000253300 | 036B | 697B | 036D | 6987 | 036F | 698A | 0370 | 699D |
| 0000253320 | 0372 | 69AB | 0374 | 69B4 | 0376 | 69BA | 0383 | 69C5 |
| 0000253340 | 038B | 69D5 | 038D | 69DD | 0390 | 69E2 | 0391 | 69EC |
| 0000253360 | 0392 | 69F1 | 0393 | 69F4 | 0397 | 69F9 | 0398 | 6A16 |
| 0000253400 | 0399 | 6A1F | 039A | 6A29 | 039B | 6A2F | 039C | 6A32 |
| 0000253420 | 039D | 6A3A | 03A1 | 6A40 | 03A2 | 6A4A | 03A3 | 6A4F |
| 0000253440 | 03A4 | 6A64 | 03A5 | 6A6F | 03A6 | 6A74 | 03A8 | 6A8C |
| 0000253460 | 03A9 | 6A8F | 03AD | 6A94 | 03AF | 6AAA | 03B2 | 6AB4 |
| 0000253500 | 03B3 | 6AEC | 03B6 | 6AEF | 03B8 | 6B21 | 03BA | 6B2D |
| 0000253520 | 03BB | 6B36 | 03BC | 6B3C | 03BD | 6B3F | 03C1 | 6B59 |
| 0000253540 | 03C3 | 6B81 | 03C5 | 6B8D | 03C7 | 6B90 | 03C8 | 6BA3 |
| 0000253560 | 03CA | 6BB1 | 03CC | 6BBA | 03CE | 6BC0 | 03DB | 6BCB |
| 0000253600 | 03E2 | 6BDB | 03E4 | 6BE3 | 03E9 | 6BE8 | 03EA | 6C04 |
| 0000253620 | 03EB | 6C0D | 03EC | 6C17 | 03ED | 6C1D | 03EE | 6C20 |
| 0000253640 | 03EF | 6C28 | 03F3 | 6C2E | 03F4 | 6C38 | 03F5 | 6C3D |
| 0000253660 | 03F6 | 6C40 | 03F7 | 6C45 | 03F8 | 6C5A | 03F9 | 6C65 |
| 0000253700 | 03FA | 6C6A | 0400 | 6C82 | 0403 | 6C9E | 0404 | 6CA8 |
| 0000253720 | 0409 | 6CAD | 040B | 6CC3 | 040C | 6CD8 | 040F | 6CF3 |
| 0000253740 | 0412 | 6CFD | 0413 | 6D2F | 0416 | 6D32 | 0417 | 6D64 |
| 0000253760 | 0419 | 6D70 | 041A | 6D79 | 041B | 6D7F | 041C | 6D82 |
| 0000254000 | 041F | 6D9C | 0420 | 6DC4 | 0422 | 6DD0 | 0425 | 6DD3 |
| 0000254020 | 0427 | 6DDC | 0428 | 6DEF | 042A | 6DFD | 042C | 6E06 |
| 0000254040 | 042F | 6E10 | 0431 | 6E16 | 0440 | 6E21 | 0444 | 6E31 |
| 0000254060 | 0445 | 6E4A | 0448 | 6E59 | 0449 | 6E66 | 044A | 6E7F |
| 0000254100 | 044B | 6E8E | 0450 | 6E94 | 0451 | 6EAB | 0454 | 6EB4 |
| 0000254120 | 0458 | 6ED3 | 045A | 6EE3 | 045B | 6EEC | 045C | 6EF2 |

THU MAR 14 17:35:10 1991 FRAME.EXE PAGE 66, LINE 3836

| | | | | | | | | |
|---|---|---|---|---|---|---|---|---|
| 0000254140 | 045D | 6EF5 | 045E | 6EFE | 045F | 6F06 | 0462 | 6F0C |
| 0000254160 | 0464 | 6F12 | 0472 | 6F1D | 047C | 6F2D | 047E | 6F65 |
| 0000254200 | 0480 | 6F72 | 0481 | 6F86 | 0483 | 6F92 | 0484 | 6FB7 |
| 0000254220 | 0487 | 6FDB | 0488 | 6FEB | 048B | 6FFB | 048C | 7011 |
| 0000254240 | 048D | 7028 | 048E | 7031 | 0491 | 7046 | 0494 | 7066 |
| 0000254260 | 0497 | 7079 | 0498 | 7090 | 0499 | 70A7 | 049A | 70B0 |
| 0000254300 | 049C | 70C5 | 049E | 70D7 | 04AB | 70E2 | 04B2 | 70F2 |
| 0000254320 | 04B3 | 7106 | 04B4 | 710F | 04B5 | 7119 | 04B6 | 711F |
| 0000254340 | 04B7 | 7122 | 04B8 | 712A | 04BC | 7130 | 04BF | 714C |
| 0000254360 | 04C0 | 7156 | 04C1 | 7171 | 04C2 | 7174 | 04C6 | 71B1 |
| 0000254400 | 04C7 | 71CB | 04C9 | 71D7 | 04CB | 71DA | 04CC | 71ED |
| 0000254420 | 04D0 | 71FC | 04D2 | 722F | 04D3 | 7249 | 04D4 | 724F |
| 0000254440 | 04D8 | 725E | 04D9 | 7268 | 04DB | 729B | 04DC | 72B5 |
| 0000254460 | 04DD | 72BB | 04E1 | 72CA | 04E3 | 72D0 | 04F8 | 72DB |
| 0000254500 | 04F9 | 72EB | 04FF | 72F0 | 0503 | 72FC | 0504 | 7305 |
| 0000254520 | 0505 | 7310 | 0506 | 7313 | 050A | 731B | 050C | 7323 |
| 0000254540 | 050F | 7328 | 0510 | 733C | 0511 | 734C | 0516 | 7352 |
| 0000254560 | 0517 | 7362 | 051B | 7371 | 051E | 7379 | 051F | 7391 |
| 0000254600 | 0522 | 7394 | 0523 | 73AA | 0524 | 73B6 | 0525 | 73B9 |
| 0000254620 | 0526 | 73D1 | 052B | 73D4 | 052C | 73EC | 052F | 73EF |
| 0000254640 | 0532 | 73F9 | 0533 | 740D | 0536 | 7410 | 0537 | 7425 |
| 0000254660 | 053A | 7428 | 053B | 742D | 053C | 7435 | 053E | 7438 |
| 0000254700 | 053F | 7453 | 0541 | 7456 | 0543 | 7477 | 0544 | 7480 |
| 0000254720 | 0547 | 7486 | 0548 | 7491 | 054A | 749F | 054C | 74A5 |
| 0000254740 | 0559 | 74B0 | 055D | 74C0 | 055E | 74CA | 055F | 74CF |
| 0000254760 | 0563 | 74D8 | 0564 | 74E8 | 0567 | 74F4 | 0569 | 7501 |
| 0000255000 | 056B | 7507 | 0581 | 7512 | 058A | 7522 | 058F | 7529 |
| 0000255020 | 0591 | 7551 | 0592 | 7559 | 0598 | 755F | 059A | 7583 |
| 0000255040 | 059B | 7595 | 059C | 75A5 | 059D | 75A8 | 059F | 75B8 |
| 0000255060 | 05A1 | 75C5 | 05A2 | 75D2 | 05A7 | 75D8 | 05A8 | 75EA |
| 0000255100 | 05A9 | 75FA | 05AB | 7609 | 05AC | 7612 | 05B2 | 761A |
| 0000255120 | 05B3 | 7648 | 05B5 | 765A | 05B6 | 7665 | 05B7 | 7678 |
| 0000255140 | 05B8 | 7681 | 05B9 | 7689 | 05BD | 768F | 05BE | 76A2 |
| 0000255160 | 05BF | 76AB | 05C0 | 76B3 | 05C3 | 76B9 | 05C5 | 76C1 |
| 0000255200 | 05C6 | 76E9 | 05C7 | 76F1 | 05CB | 76F7 | 05CC | 7700 |
| 0000255220 | 05CD | 7714 | 05CE | 771D | 05CF | 7725 | 05D7 | 772B |
| 0000255240 | 05D9 | 7763 | 05DA | 7768 | 05DF | 7771 | 05E0 | 7789 |
| 0000255260 | 05E1 | 778E | 05E2 | 7791 | 05E6 | 7796 | 05E7 | 77A8 |
| 0000255300 | 05EA | 77B5 | 05EC | 77C3 | 05EE | 77D6 | 05F0 | 77DC |
| 0000255320 | 0609 | 77E7 | 060A | 77F7 | 060B | 7808 | 060C | 7813 |
| 0000255340 | 060E | 7825 | 0625 | 7830 | 0627 | 7840 | 062F | 7848 |
| 0000255360 | 0630 | 784E | 0633 | 7858 | 0634 | 785E | 0635 | 7868 |
| 0000255400 | 0636 | 7872 | 0637 | 787C | 063B | 7886 | 063C | 78A4 |
| 0000255420 | 0640 | 78AD | 0641 | 78C5 | 0642 | 78CE | 0645 | 78D4 |
| 0000255440 | 0648 | 78E4 | 064A | 78E7 | 064C | 78ED | 064D | 7908 |
| 0000255460 | 064E | 791A | 0651 | 791D | 0652 | 7938 | 0653 | 794A |
| 0000255500 | 0656 | 794D | 0657 | 7962 | 0658 | 7974 | 065A | 7977 |
| 0000255520 | 065E | 798D | 065F | 799E | 0660 | 79A7 | 0661 | 79BA |
| 0000255540 | 0662 | 79BD | 0666 | 79D2 | 0668 | 79D9 | 066A | 79DF |
| 0000255560 | 0B00 | 6C6C | 6269 | 6D63 | 2E74 | 696C | 0962 | 7266 |
| 0000255600 | 6D61 | 2E65 | 696C | 0762 | 736F | 2E32 | 696C | 0962 |
| 0000255620 | 6264 | 705F | 2E69 | 696C | 0662 | 6975 | 6C2E | 6269 |
| 0000255640 | 6C0A | 6962 | 6D70 | 2E74 | 696C | B862 | 0100 | 0201 |
| 0000255660 | 0800 | 0000 | 1900 | 0200 | 0201 | BC00 | 0007 | 5100 |
| 0000255700 | 0101 | 0301 | 2100 | 0000 | 1C00 | 0200 | 0301 | 0D00 |
| 0000255720 | 0009 | C100 | 0101 | 0401 | 3D00 | 0000 | 1C00 | 0200 |
| 0000255740 | 0401 | CE00 | 000A | 3500 | 0100 | 0501 | 5900 | 0000 |
| 0000255760 | 1700 | 0200 | 0501 | 0300 | 000B | 0F00 | 0100 | 0601 |
| 0000256000 | 7000 | 0000 | 1700 | 0200 | 0601 | 1200 | 000B | 2400 |

THU MAR 14 17:35:10 1991 FRAME.EXE PAGE 67, LINE 3895

| | | | | | | | | |
|---|---|---|---|---|---|---|---|---|
| 0000256020 | 0100 | 0701 | 8700 | 0000 | 1C00 | 0200 | 0701 | 3600 |
| 0000256040 | 000B | 1000 | 0100 | 0801 | A300 | 0000 | 1C00 | 0200 |
| 0000256060 | 0801 | 4600 | 000B | 1000 | 0100 | 0901 | BF00 | 0000 |
| 0000256100 | 1C00 | 0200 | 0901 | 5600 | 000B | 2500 | 0100 | 0A01 |
| 0000256120 | DB00 | 0000 | 1D00 | 0200 | 0A01 | 7B00 | 000B | 1100 |
| 0000256140 | 0100 | 0B01 | F800 | 0000 | 1700 | 0200 | 0B01 | 8C00 |
| 0000256160 | 000B | 1F00 | 0100 | 0C01 | 0F00 | 0001 | 1800 | 0200 |
| 0000256200 | 0C01 | AB00 | 000B | 4200 | 0100 | 0D01 | 2700 | 0001 |
| 0000256220 | 1600 | 0200 | 0D01 | ED00 | 000B | 0E00 | 0100 | 0E01 |
| 0000256240 | 3D00 | 0001 | 1800 | 0200 | 0E01 | FB00 | 000B | 1000 |
| 0000256260 | 0100 | 0F01 | 5500 | 0001 | 1800 | 0200 | 0F01 | 0B00 |
| 0000256300 | 000C | 1000 | 0100 | 1001 | 6D00 | 0001 | 1900 | 0200 |
| 0000256320 | 1001 | 1B00 | 000C | 1200 | 0100 | 1101 | 8600 | 0001 |
| 0000256340 | 1800 | 0200 | 1101 | 2D00 | 000C | 4100 | 0100 | 1201 |
| 0000256360 | 9E00 | 0001 | 1700 | 0200 | 1201 | 6E00 | 000C | 0F00 |
| 0000256400 | 0100 | 1301 | B500 | 0001 | 1A00 | 0200 | 1301 | 7D00 |
| 0000256420 | 000C | 9B00 | 0100 | 1401 | CF00 | 0001 | 1400 | 0200 |
| 0000256440 | 1401 | 1800 | 000D | 4F00 | 0300 | 1401 | 7900 | 0016 |
| 0000256460 | 0600 | 0419 | 1401 | 2A00 | 0094 | 7700 | 0902 | 1401 |
| 0000256500 | 0800 | 00AF | 7400 | 0102 | 1501 | E300 | 0001 | 1400 |
| 0000256520 | 0200 | 1501 | 6700 | 000D | 8100 | 0300 | 1501 | 7F00 |
| 0000256540 | 002F | A600 | 0413 | 1501 | A100 | 0096 | AD00 | 0904 |
| 0000256560 | 1501 | 7C00 | 00B1 | 5C00 | 0105 | 1601 | F700 | 0001 |
| 0000256600 | 1500 | 0200 | 1601 | E800 | 000D | 0900 | 0302 | 1601 |
| 0000256620 | 2500 | 0043 | 3500 | 041E | 1601 | 4E00 | 009B | 9D00 |
| 0000256640 | 0906 | 1601 | D800 | 00B6 | F500 | 0102 | 1701 | 0C00 |
| 0000256660 | 0002 | 1500 | 0200 | 1701 | F100 | 000F | 6500 | 0300 |
| 0000256700 | 1701 | 5A00 | 0061 | 5F00 | 0410 | 1701 | EB00 | 00A1 |
| 0000256720 | BC00 | 0901 | 1701 | CD00 | 00B9 | 8100 | 0101 | 1801 |
| 0000256740 | 2100 | 0002 | 1600 | 0200 | 1801 | 5600 | 0010 | 8F00 |
| 0000256760 | 0300 | 1801 | B900 | 0071 | 7100 | 0422 | 1801 | A700 |
| 0000257000 | 00A3 | 6100 | 090B | 1801 | 4E00 | 00BB | 2200 | 0108 |
| 0000257020 | 7601 | 3700 | 0002 | 1500 | 0200 | 7601 | E500 | 0010 |
| 0000257040 | 1B00 | 0100 | 7701 | 4C00 | 0002 | 1700 | 0200 | 7701 |
| 0000257060 | 0000 | 0011 | 0E00 | 0100 | 7801 | 6300 | 0002 | 1700 |
| 0000257100 | 0200 | 7801 | 0E00 | 0011 | 0E00 | 0100 | 7901 | 7A00 |
| 0000257120 | 0002 | 1700 | 0200 | 7901 | 1C00 | 0011 | 0E00 | 0100 |
| 0000257140 | 7A01 | 9100 | 0002 | 1700 | 0200 | 7A01 | 2A00 | 0011 |
| 0000257160 | 0E00 | 0100 | 7B01 | A800 | 0002 | 1800 | 0200 | 7B01 |
| 0000257200 | 3800 | 0011 | 0F00 | 0100 | 7C01 | C000 | 0002 | 1500 |
| 0000257220 | 0200 | 7C01 | 4700 | 0011 | 0C00 | 0100 | 7D01 | D500 |
| 0000257240 | 0002 | 1600 | 0200 | 7D01 | 5300 | 0011 | 0F00 | 0100 |
| 0000257260 | 7E01 | EB00 | 0002 | 1700 | 0200 | 7E01 | 6200 | 0011 |
| 0000257300 | 1100 | 0100 | 7F01 | 0200 | 0003 | 1700 | 0200 | 7F01 |
| 0000257320 | 7300 | 0011 | 0E00 | 0100 | 8001 | 1900 | 0003 | 1800 |
| 0000257340 | 0200 | 8001 | 8100 | 0011 | 1E00 | 0100 | 8101 | 3100 |
| 0000257360 | 0003 | 1800 | 0200 | 8101 | 9F00 | 0011 | 0F00 | 0100 |
| 0000257400 | 8201 | 4900 | 0003 | 1800 | 0200 | 8201 | AE00 | 0011 |
| 0000257420 | 0F00 | 0100 | 8301 | 6100 | 0003 | 1700 | 0200 | 8301 |
| 0000257440 | BD00 | 0011 | 0E00 | 0100 | 8401 | 7800 | 0003 | 1800 |
| 0000257460 | 0200 | 8401 | CB00 | 0011 | 0F00 | 0100 | 8501 | 9000 |
| 0000257500 | 0003 | 1800 | 0200 | 8501 | DA00 | 0011 | 0E00 | 0100 |
| 0000257520 | 8601 | A800 | 0003 | 1800 | 0200 | 8601 | E800 | 0011 |
| 0000257540 | 0E00 | 0100 | 8701 | C000 | 0003 | 1600 | 0200 | 8701 |
| 0000257560 | F600 | 0011 | 0F00 | 0100 | 8801 | D600 | 0003 | 1700 |
| 0000257600 | 0200 | 8801 | 0500 | 0012 | 1200 | 0100 | 8901 | ED00 |
| 0000257620 | 0003 | 1500 | 0200 | 8901 | 1700 | 0012 | 1F00 | 0100 |
| 0000257640 | 8A01 | 0200 | 0004 | 1800 | 0200 | 8A01 | 3600 | 0012 |
| 0000257660 | 0F00 | 0100 | 8B01 | 1A00 | 0004 | 1700 | 0200 | 8B01 |

THU MAR 14 17:35:10 1991 FRAME.EXE PAGE 68, LINE 3954

| | | | | | | | | |
|---|---|---|---|---|---|---|---|---|
| 0000257700 | 4500 | 0012 | 0F00 | 0100 | 8C01 | 3100 | 0004 | 1A00 |
| 0000257720 | 0200 | 8C01 | 5400 | 0012 | 1100 | 0100 | 8E01 | 4B00 |
| 0000257740 | 0004 | 1500 | 0200 | 8E01 | 6500 | 0012 | 0E00 | 0100 |
| 0000257760 | 8F01 | 6000 | 0004 | 1400 | 0200 | 8F01 | 7300 | 0012 |
| 0000260000 | 2C00 | 0100 | 9001 | 7400 | 0004 | 1600 | 0200 | 9001 |
| 0000260020 | 9F00 | 0012 | 4E00 | 0100 | 9101 | 8A00 | 0004 | 1500 |
| 0000260040 | 0200 | 9101 | ED00 | 0012 | 1F00 | 0100 | 9201 | 9F00 |
| 0000260060 | 0004 | 1600 | 0200 | 9201 | 0C00 | 0013 | 0F00 | 0100 |
| 0000260100 | 9301 | B500 | 0004 | 1600 | 0200 | 9301 | 1B00 | 0013 |
| 0000260120 | 1000 | 0100 | 9401 | CB00 | 0004 | 1700 | 0200 | 9401 |
| 0000260140 | 2B00 | 0013 | 3300 | 0100 | 9501 | E200 | 0004 | 1400 |
| 0000260160 | 0200 | 9501 | 5E00 | 0013 | 3700 | 0100 | 9601 | F600 |
| 0000260200 | 0004 | 1800 | 0200 | 9601 | 9500 | 0013 | 0F00 | 0100 |
| 0000260220 | 9701 | 0E00 | 0005 | 1A00 | 0200 | 9701 | A400 | 0013 |
| 0000260240 | 1E00 | 0100 | 9801 | 2800 | 0005 | 1600 | 0200 | 9801 |
| 0000260260 | C200 | 0013 | 1E00 | 0100 | 9901 | 3E00 | 0005 | 1800 |
| 0000260300 | 0200 | 9901 | E000 | 0013 | 0F00 | 0100 | 9A01 | 5600 |
| 0000260320 | 0005 | 1500 | 0200 | 9A01 | EF00 | 0013 | 0C00 | 0100 |
| 0000260340 | 9B01 | 6B00 | 0005 | 1900 | 0200 | 9B01 | FB00 | 0013 |
| 0000260360 | 5600 | 0100 | 9C01 | 8400 | 0005 | 1600 | 0200 | 9C01 |
| 0000260400 | 5100 | 0014 | 1D00 | 0100 | 9D01 | 9A00 | 0005 | 1500 |
| 0000260420 | 0200 | 9D01 | 6E00 | 0014 | 0E00 | 0100 | 9F01 | AF00 |
| 0000260440 | 0005 | 1D00 | 0200 | 9F01 | 7C00 | 0014 | 2400 | 0100 |
| 0000260460 | A001 | CC00 | 0005 | 1300 | 0200 | A001 | A000 | 0014 |
| 0000260500 | 1C00 | 0100 | A101 | DF00 | 0005 | 1700 | 0200 | A101 |
| 0000260520 | BC00 | 0014 | 1000 | 0100 | A201 | F600 | 0005 | 1600 |
| 0000260540 | 0200 | A201 | CC00 | 0014 | 1100 | 0100 | A301 | 0C00 |
| 0000260560 | 0006 | 1500 | 0200 | A301 | DD00 | 0014 | 0F00 | 0100 |
| 0000260600 | A401 | 2100 | 0006 | 1500 | 0200 | A401 | EC00 | 0014 |
| 0000260620 | 0F00 | 0100 | A501 | 3600 | 0006 | 1600 | 0200 | A501 |
| 0000260640 | FB00 | 0014 | 1000 | 0100 | A601 | 4C00 | 0006 | 1B00 |
| 0000260660 | 0200 | A601 | 0B00 | 0015 | 3F00 | 0100 | A701 | 6700 |
| 0000260700 | 0006 | 1800 | 0200 | A701 | 4A00 | 0015 | 0F00 | 0100 |
| 0000260720 | A801 | 7F00 | 0006 | 1900 | 0200 | A801 | 5900 | 0015 |
| 0000260740 | 1200 | 0100 | A901 | 9800 | 0006 | 1800 | 0200 | A901 |
| 0000260760 | 6B00 | 0015 | 0F00 | 0100 | AA01 | B000 | 0006 | 1500 |
| 0000261000 | 0200 | AA01 | 7A00 | 0015 | 0E00 | 0100 | AB01 | C500 |
| 0000261020 | 0006 | 1600 | 0200 | AB01 | 8800 | 0015 | 1000 | 0100 |
| 0000261040 | AC01 | DB00 | 0006 | 1A00 | 0200 | AC01 | 9800 | 0015 |
| 0000261060 | 0F00 | 0100 | AD01 | F500 | 0006 | 1500 | 0200 | AD01 |
| 0000261100 | A700 | 0015 | 3000 | 0100 | AE01 | 0A00 | 0007 | 1700 |
| 0000261120 | 0200 | AE01 | D700 | 0015 | 1200 | 0100 | AF01 | 2100 |
| 0000261140 | 0007 | 1A00 | 0200 | AF01 | E900 | 0015 | 1000 | 0100 |
| 0000261160 | B001 | 3B00 | 0007 | 1C00 | 0200 | B001 | F900 | 0015 |
| 0000261200 | 2200 | 0100 | B101 | 5700 | 0007 | 1B00 | 0200 | B101 |
| 0000261220 | 1B00 | 0016 | 0E00 | 0100 | B201 | 7200 | 0007 | 1700 |
| 0000261240 | 0200 | B201 | 2900 | 0016 | 1100 | 0100 | B301 | 8900 |
| 0000261260 | 0007 | 1900 | 0200 | B301 | 3A00 | 0016 | 1E00 | 0100 |
| 0000261300 | B401 | A200 | 0007 | 1A00 | 0200 | B401 | 5800 | 0016 |
| 0000261320 | 2100 | 0600 | 0001 | 7000 | D0C3 | 3B00 | 4E00 | 3042 |
| 0000261340 | E532 | 00CA | 0000 | | | | | |
| 0000261345 | | | | | | | | |

THU MAR 14 17:37:32 1991 GSPMON.4 PAGE 1, LINE 1

| | | | | | | | | |
|---|---|---|---|---|---|---|---|---|
| 0000000000 | 0090 | 0004 | C93E | 27C9 | 370C | 0001 | 2872 | 0000 |
| 0000000020 | 001C | 0123 | 0108 | 0140 | 9950 | 0006 | 0000 | 0000 |
| 0000000040 | 98F0 | 002C | 6E20 | FFC6 | 2000 | FFC0 | 0000 | 0000 |
| 0000000060 | 742E | 7865 | 0074 | 0000 | 2000 | FFC0 | 2000 | FFC0 |
| 0000000100 | 9950 | 0006 | 00D0 | 0000 | 0000 | 0000 | D742 | 0000 |
| 0000000120 | 0000 | 0FF7 | 0020 | 0000 | 632E | 6E69 | 7469 | 0000 |
| 0000000140 | B960 | FFC6 | B960 | FFC6 | 1A40 | 0000 | D3FA | 0000 |
| 0000000160 | 0000 | 0000 | 0000 | 0000 | 0000 | 0000 | 0040 | 0000 |
| 0000000200 | 622E | 7373 | 0000 | 0000 | D3A0 | FFC6 | D3A0 | FFC6 |
| 0000000220 | 98F0 | 002C | 0000 | 0000 | 0000 | 0000 | 0000 | 0000 |
| 0000000240 | 0000 | 0000 | 0080 | 0000 | 642E | 7461 | 0061 | 0000 |
| 0000000260 | 0000 | 0000 | 0000 | 0000 | 0000 | 0000 | 0000 | 0000 |
| 0000000300 | 0000 | 0000 | 0000 | 0000 | 0000 | 0000 | 0040 | 0000 |
| 0000000320 | 098F | 0054 | 4DCD | 120E | 09EB | 1D00 | FFC0 | 078B |
| 0000000340 | D5B0 | FFC6 | 09EB | 00F0 | C000 | 078B | D5D0 | FFC6 |
| 0000000360 | 09EB | 0000 | FFC0 | 078B | D5F0 | FFC6 | 120B | 078B |
| 0000000400 | D610 | FFC6 | 120B | 078B | D630 | FFC6 | 09EB | 0420 |
| 0000000420 | FFC0 | 078B | D650 | FFC6 | 09EB | 0820 | FFC0 | 078B |
| 0000000440 | D670 | FFC6 | 120B | 078B | D690 | FFC6 | 120B | 078B |
| 0000000460 | D6B0 | FFC6 | 09EB | 0C40 | FFC0 | 078B | D6D0 | FFC6 |
| 0000000500 | 09EB | 1040 | FFC0 | 078B | D6F0 | FFC6 | 09EB | 1440 |
| 0000000520 | FFC0 | 078B | D710 | FFC6 | 120B | 078B | D730 | FFC6 |
| 0000000540 | 09EB | 1850 | FFC0 | 078B | D750 | FFC6 | 0D5F | 2C30 |
| 0000000560 | FFC0 | 456B | 0542 | 058B | D5A0 | FFC6 | 0D5F | 6FA0 |
| 0000000600 | FFC0 | 0D5F | 4890 | FFC0 | A3CF | 09EB | D3A0 | FFC6 |
| 0000000620 | 936E | 0D5F | A880 | FFC6 | 0D60 | 0D5F | 80B0 | FFC6 |
| 0000000640 | 456B | 0541 | 058B | D770 | FFC6 | 07AB | D5F0 | FFC6 |
| 0000000660 | 0550 | 896D | A3CF | 192B | 936E | 0D5F | 3E10 | FFC0 |
| 0000000700 | 0542 | 05AB | D5A0 | FFC6 | CB04 | 05AB | D5A0 | FFC6 |
| 0000000720 | CAFC | 054E | 85AB | 0B4B | FEFF | C806 | A3CF | 188B |
| 0000000740 | 936E | 0D5F | 01ED | FFC1 | 0541 | B5AB | 000E | CA10 |
| 0000000760 | A3CF | D60E | D630 | FFC6 | 054E | 85A9 | 932E | 0D5F |
| 0000001000 | 2E60 | FFC0 | 07AB | D610 | FFC6 | 0570 | 810B | C014 |
| 0000001020 | A3CF | D60E | D650 | FFC6 | D60E | D630 | FFC6 | 054E |
| 0000001040 | 85A9 | 24A9 | 0B29 | D780 | FFC6 | 8729 | 0929 | 07A9 |
| 0000001060 | D610 | FFC6 | 0570 | 8109 | A3CF | 192B | 936E | 0D5F |
| 0000001100 | 3FE0 | FFC0 | 0D5F | 2EC0 | FFC0 | 4529 | 0542 | 0589 |
| 0000001120 | D5A0 | FFC6 | C0AA | 098F | 0050 | A3CF | 09EB | 3150 |
| 0000001140 | FFC0 | 936E | 1849 | 932E | 0D5F | 3CE0 | FFC0 | A3CF |
| 0000001160 | 09E9 | 3160 | FFC0 | 932E | 1929 | 932E | 0D5F | 3CE0 |
| 0000001200 | FFC0 | A3CF | 09E9 | 0430 | FFC1 | 932E | 1BC9 | 932E |
| 0000001220 | 0D5F | 3CE0 | FFC0 | 09AF | 0A00 | 0960 | A3AF | 4DCD |
| 0000001240 | B7EE | 0040 | 97ED | 0962 | 098F | 0050 | 07AB | D5B0 |
| 0000001260 | FFC6 | 1889 | 0543 | B12B | 0004 | 1829 | 0541 | B12B |
| 0000001300 | 0007 | 07A9 | D5D0 | FFC6 | 182B | B169 | 0007 | 07AB |
| 0000001320 | D5B0 | FFC6 | 0543 | 8569 | 1489 | CA0C | 8569 | 14C9 |
| 0000001340 | CA09 | 07AB | D5B0 | FFC6 | 8569 | 1489 | CA03 | 8569 |
| 0000001360 | 14C9 | CBF7 | 09AF | 0A00 | 0960 | 0940 | 098F | 00D4 |
| 0000001400 | 4DCD | 100E | A3CF | 192B | 936E | 0D5F | 3FE0 | FFC0 |
| 0000001420 | 182B | 0541 | 058B | D770 | FFC6 | 0D60 | 07A9 | D5B0 |
| 0000001440 | FFC6 | 0543 | 8529 | 8D2D | 07A9 | D5B0 | FFC6 | B9A9 |
| 0000001460 | 0000 | 0004 | 456B | 0541 | B169 | 0003 | 07AB | D5D0 |
| 0000001500 | FFC6 | 4529 | B12B | 0003 | C07A | A3CF | 182B | 936E |
| 0000001520 | 0D5F | 01E0 | FFC1 | C07B | 184B | 0542 | 058B | D5A0 |
| 0000001540 | FFC6 | A3CF | 4529 | 932E | 09E9 | D3A0 | FFC6 | 932E |
| 0000001560 | 0D5F | A940 | FFC6 | C06B | 07AB | D5F0 | FFC6 | 0550 |
| 0000001600 | B96D | 0000 | 0010 | 054E | B5A9 | 0010 | 0B49 | FEFF |
| 0000001620 | C806 | A3CF | 1889 | 932E | 0D5F | 01E0 | FFC1 | 0541 |
| 0000001640 | B5AB | 001E | CA11 | A3CF | D60E | D730 | FFC6 | 054E |

THU MAR 14 17:37:32 1991 GSPMON.4 PAGE 2, LINE 60

| | | | | | | | | |
|---|---|---|---|---|---|---|---|---|
| 0000001660 | B5A9 | 0010 | 932E | 0D5F | 2E60 | FFC0 | 07AB | D710 |
| 0000001700 | FFC6 | 0570 | 810B | C015 | A3CF | D60E | D750 | FFC6 |
| 0000001720 | D60E | D730 | FFC6 | 054E | B5A9 | 0010 | 24A9 | 0B29 |
| 0000001740 | D780 | FFC6 | 8729 | 0929 | 07A9 | D710 | FFC6 | 0570 |
| 0000001760 | 8109 | 07AB | D5B0 | FFC6 | 18E9 | 0543 | B12B | 0004 |
| 0000002000 | 1829 | 0541 | B12B | 0007 | 07A9 | D5D0 | FFC6 | 182B |
| 0000002020 | B169 | 0007 | 07AB | D5B0 | FFC6 | 0543 | 8569 | 14E9 |
| 0000002040 | CA16 | 07AB | D5B0 | FFC6 | 8569 | 14E9 | CBFA | C00F |
| 0000002060 | A3CF | 184B | 936E | 0D5F | 01E0 | FFC1 | C008 | 0548 |
| 0000002100 | 85A8 | CA83 | 1468 | CA88 | 1468 | CA96 | CDF1 | A3CF |
| 0000002120 | 192B | 936E | 0D5F | 3E10 | FFC0 | 4529 | 0541 | 0589 |
| 0000002140 | D770 | FFC6 | 140E | 09AF | 2B00 | 0940 | 098F | 0014 |
| 0000002160 | 4DCD | 100E | 0570 | B5AB | FFE0 | 24AB | 03AB | 140B |
| 0000002200 | 836D | BBAB | FFC0 | 0000 | B7EE | 0060 | 09AF | 2800 |
| 0000002220 | 0962 | 098F | 0154 | 4DCD | 100E | 0570 | B5AB | FFE0 |
| 0000002240 | 0B4B | FF00 | CB02 | 0D60 | C00C | 09EB | 0110 | C000 |
| 0000002260 | 836D | 1829 | B5AB | FFE0 | 6369 | 87AB | 8567 | 5527 |
| 0000002300 | 80EB | B7EE | 00A0 | 09AF | 2A80 | 0962 | 098F | 0154 |
| 0000002320 | 4DCD | 100E | 0570 | B5AB | FFE0 | 0B4B | FF00 | CB02 |
| 0000002340 | 036D | C00C | 09EB | 0110 | C000 | 836D | 1829 | B5AB |
| 0000002360 | FFE0 | 6369 | 87AB | 8567 | 5327 | 80EB | B7EE | 00A0 |
| 0000002400 | 09AF | 2A80 | 0962 | D98F | 0054 | 4DCD | 07AB | D610 |
| 0000002420 | FFC6 | 0570 | B9AB | FFE0 | 0000 | 07A9 | D5B0 | FFC6 |
| 0000002440 | 456B | 0543 | B169 | 0004 | 182B | 0541 | B169 | 0007 |
| 0000002460 | 07AB | D5D0 | FFC6 | 1829 | B12B | 0007 | 4529 | 0542 |
| 0000002500 | 0589 | D5A0 | FFC6 | A3CF | 932E | 09E9 | D3A0 | FFC6 |
| 0000002520 | 932E | 0D5F | A940 | FFC6 | B7EE | 0080 | 09AF | 2A00 |
| 0000002540 | 0962 | 098F | 0054 | 4DCD | 07AB | D5B0 | FFC6 | 1869 |
| 0000002560 | 0543 | 812B | 07A9 | D610 | FFC6 | 0570 | B9A9 | FFE0 |
| 0000002600 | 0000 | A3CF | 0550 | B5A9 | FFA0 | 932E | D3AE | FFC0 |
| 0000002620 | D60E | D650 | FFC6 | 0D5F | 7760 | FFC6 | 07AB | D5B0 |
| 0000002640 | FFC6 | 18A9 | 0543 | B12B | 0004 | 1829 | 0541 | B12B |
| 0000002660 | 0007 | 07A9 | D5D0 | FFC6 | 182B | B169 | 0007 | 07AB |
| 0000002700 | D5B0 | FFC6 | 0543 | 8569 | 14A9 | CA06 | 07AB | D5B0 |
| 0000002720 | FFC6 | 8569 | 14A9 | CBFA | B7EE | 0080 | 09AF | 2A00 |
| 0000002740 | 0962 | 098F | 0050 | 09EB | 3050 | FFC6 | 078B | D780 |
| 0000002760 | FFC6 | 09E9 | 47C0 | FFC6 | 0789 | D7A0 | FFC6 | 09EB |
| 0000003000 | 4970 | FFC6 | 078B | D7C0 | FFC6 | 09E9 | 4F90 | FFC6 |
| 0000003020 | 0789 | D7E0 | FFC6 | 09E9 | 5080 | FFC6 | 0789 | D800 |
| 0000003040 | FFC6 | 09E9 | 54B0 | FFC6 | 0789 | D820 | FFC6 | 09E9 |
| 0000003060 | 5640 | FFC6 | 0789 | D840 | FFC6 | 09E9 | 5870 | FFC6 |
| 0000003100 | 0789 | D860 | FFC6 | 09E9 | 5750 | FFC6 | 0789 | D880 |
| 0000003120 | FFC6 | 09E9 | 6130 | FFC6 | 0789 | D8A0 | FFC6 | 09E9 |
| 0000003140 | 6A20 | FFC6 | 0789 | D8C0 | FFC6 | 09E9 | 4670 | FFC6 |
| 0000003160 | 0789 | D8E0 | FFC6 | 09E9 | F680 | FFC5 | 0789 | DA00 |
| 0000003200 | FFC6 | 09E9 | F7A0 | FFC5 | 0789 | DA20 | FFC6 | 09E9 |
| 0000003220 | FA30 | FFC5 | 0789 | DA40 | FFC6 | 09E9 | FBC0 | FFC5 |
| 0000003240 | 0789 | DA60 | FFC6 | 09E9 | 0050 | FFC6 | 0789 | DA80 |
| 0000003260 | FFC6 | 09E9 | 0470 | FFC6 | 0789 | DAA0 | FFC6 | 09E9 |
| 0000003300 | 01F0 | FFC6 | 0789 | DAC0 | FFC6 | 09E9 | 0330 | FFC6 |
| 0000003320 | 0789 | DAE0 | FFC6 | 09E9 | 0610 | FFC6 | 0789 | DB00 |
| 0000003340 | FFC6 | 09E9 | 0700 | FFC6 | 0789 | DB20 | FFC6 | 09E9 |
| 0000003360 | 07F0 | FFC6 | 0789 | DB40 | FFC6 | 09E9 | 08E0 | FFC6 |
| 0000003400 | 0789 | DB60 | FFC6 | 09E9 | 09A0 | FFC4 | 0789 | DC80 |
| 0000003420 | FFC6 | 09E9 | 08C0 | FFC4 | 0789 | DCA0 | FFC6 | 09E9 |
| 0000003440 | EEC0 | FFC3 | 0789 | DCC0 | FFC6 | 09E9 | F1A0 | FFC3 |
| 0000003460 | 0789 | DCE0 | FFC6 | 09E9 | 1050 | FFC4 | 0789 | DD00 |
| 0000003500 | FFC6 | 09E9 | 1610 | FFC4 | 0789 | DD20 | FFC6 | 09E9 |
| 0000003520 | F490 | FFC3 | 0789 | DD40 | FFC6 | 09E9 | FB00 | FFC3 |

THU MAR 14 17:37:32 1991 GSPMON.4 PAGE 3, LINE 119

| | | | | | | | | |
|---|---|---|---|---|---|---|---|---|
| 0000003540 | 0789 | DD60 | FFC6 | 09E9 | 0240 | FFC4 | 0789 | DD80 |
| 0000003560 | FFC6 | 09E9 | 14F0 | FFC4 | 0789 | DDC0 | FFC6 | 09E9 |
| 0000003600 | D830 | FFC1 | 0789 | DDE0 | FFC6 | 09E9 | FE40 | FFC1 |
| 0000003620 | 0789 | DE00 | FFC6 | 09E9 | EC40 | FFC1 | 0789 | DE20 |
| 0000003640 | FFC6 | 09E9 | F090 | FFC1 | 0789 | DE40 | FFC6 | 09E9 |
| 0000003660 | 0100 | FFC2 | 0789 | DE60 | FFC6 | 09E9 | 2B80 | FFC6 |
| 0000003700 | 0789 | E2C0 | FFC6 | 09E9 | 7D70 | FFC4 | 0789 | DF00 |
| 0000003720 | FFC6 | 09E9 | 4640 | FFC4 | 0789 | DF20 | FFC6 | 09E9 |
| 0000003740 | 8490 | FFC4 | 0789 | E040 | FFC6 | 09E9 | 86F0 | FFC4 |
| 0000003760 | 0789 | E060 | FFC6 | 09E9 | 8A20 | FFC4 | 0789 | E080 |
| 0000004000 | FFC6 | 09E9 | 8B10 | FFC4 | 0789 | E0A0 | FFC6 | 09E9 |
| 0000004020 | 9180 | FFC4 | 0789 | E0C0 | FFC6 | 09E9 | 9810 | FFC4 |
| 0000004040 | 0789 | E0E0 | FFC6 | 09E9 | A180 | FFC4 | 0789 | E100 |
| 0000004060 | FFC6 | 09E9 | A620 | FFC4 | 0789 | E120 | FFC6 | 09E9 |
| 0000004100 | A9C0 | FFC4 | 0789 | E140 | FFC6 | 09E9 | B590 | FFC2 |
| 0000004120 | 0789 | E160 | FFC6 | 09E9 | AED0 | FFC2 | 0789 | E180 |
| 0000004140 | FFC6 | 09E9 | B280 | FFC2 | 0789 | E1A0 | FFC6 | 09E9 |
| 0000004160 | 0990 | FFC2 | 0789 | E1C0 | FFC6 | 09AF | 0A00 | 0960 |
| 0000004200 | 098F | 0050 | 18AB | 0544 | 058B | F788 | FFC6 | 4529 |
| 0000004220 | 0541 | 0589 | F78C | FFC6 | 0589 | F783 | FFC6 | 0542 |
| 0000004240 | 0589 | F786 | FFC6 | 0550 | 05C0 | F780 | FFC6 | 0000 |
| 0000004260 | 01C0 | 182B | 0541 | 058B | F790 | FFC6 | 058B | F791 |
| 0000004300 | FFC6 | 058B | F792 | FFC6 | 058B | F793 | FFC6 | 1889 |
| 0000004320 | 0543 | 0589 | F794 | FFC6 | 1869 | 0542 | 0589 | F798 |
| 0000004340 | FFC6 | 0589 | F79A | FFC6 | 4529 | 0589 | F79C | FFC6 |
| 0000004360 | 0589 | F79E | FFC6 | 0550 | 05C0 | F790 | FFC6 | 0010 |
| 0000004400 | 01C0 | 0541 | 058B | F7A0 | FFC6 | 0542 | 0589 | F7A2 |
| 0000004420 | FFC6 | 0589 | F7A4 | FFC6 | 1869 | 0589 | F7A6 | FFC6 |
| 0000004440 | 0589 | F7A8 | FFC6 | 0589 | F7AA | FFC6 | 0589 | F7AC |
| 0000004460 | FFC6 | 4529 | 0541 | 0589 | F7AE | FFC6 | 058B | F7AE |
| 0000004500 | FFC6 | 0550 | 05C0 | F7A0 | FFC6 | 0020 | 01C0 | 05C0 |
| 0000004520 | F7B0 | FFC6 | 0030 | 01C0 | 09AF | 0A00 | 0960 | 0960 |
| 0000004540 | 098F | 0014 | 4DCD | 0543 | B5AB | FFE0 | 148B | CB06 |
| 0000004560 | 456B | 0541 | 058B | F7C0 | FFC6 | C00B | B5AB | FFE0 |
| 0000004600 | 0542 | 058B | F7D6 | FFC6 | 182B | 0541 | 058B | F7C0 |
| 0000004620 | FFC6 | B7EE | 0060 | 09AF | 2800 | 0962 | A3AF | 4DCD |
| 0000004640 | B7EE | 0040 | 97ED | 0962 | 098F | 0054 | 4DCD | 0550 |
| 0000004660 | B5AB | FFE0 | 24CB | 0B2B | F7F0 | FFC6 | 856B | 058B |
| 0000004700 | F780 | FFC6 | B5AB | FFE0 | 24CB | 0B2B | F7F0 | FFC6 |
| 0000004720 | B56B | 0010 | 058B | F790 | FFC6 | B5AB | FFE0 | 24CB |
| 0000004740 | 0B2B | F7F0 | FFC6 | B56B | 0020 | 058B | F7A0 | FFC6 |
| 0000004760 | B5AB | FFE0 | 24CB | 0B2B | F7F0 | FFC6 | B56B | 0030 |
| 0000005000 | 058B | F7B0 | FFC6 | 0541 | 05AB | F7C0 | FFC6 | CB0A |
| 0000005020 | 1829 | 0589 | F790 | FFC6 | 0589 | F791 | FFC6 | 0589 |
| 0000005040 | F7A0 | FFC6 | 0542 | 05C0 | F7D6 | FFC6 | F786 | FFC6 |
| 0000005060 | 0550 | 05C0 | F780 | FFC6 | 0000 | 01C0 | 05C0 | F790 |
| 0000005100 | FFC6 | 0010 | 01C0 | 05C0 | F7A0 | FFC6 | 0020 | 01C0 |
| 0000005120 | 05C0 | F7B0 | FFC6 | 0030 | 01C0 | B7EE | 0080 | 09AF |
| 0000005140 | 2A00 | 0962 | A36F | 182B | 0541 | 058B | F782 | FFC6 |
| 0000005160 | 0550 | 05C0 | F7B0 | FFC6 | 0030 | 01C0 | 97EB | 0960 |
| 0000005200 | A36F | 456B | 0541 | 058B | F782 | FFC6 | 0550 | 05C0 |
| 0000005220 | F7B0 | FFC6 | 0030 | 01C0 | 97EB | 0960 | 098F | 0014 |
| 0000005240 | 4DCD | 0541 | B5AB | FFE0 | 058B | F783 | FFC6 | 0550 |
| 0000005260 | 05C0 | F7B0 | FFC6 | 0030 | 01C0 | B7EE | 0060 | 09AF |
| 0000005300 | 2800 | 0962 | A36F | A3CF | 456B | 936E | 09EB | 0000 |
| 0000005320 | 01C0 | 936E | 0D5F | 7B70 | FFC0 | A3CF | 09CB | 0300 |
| 0000005340 | 936E | 09EB | 0010 | 01C0 | 936E | 0D5F | 7B70 | FFC0 |
| 0000005360 | A3CF | 09EB | AFFC | 0000 | 936E | 09EB | 0020 | 01C0 |
| 0000005400 | 936E | 0D5F | 7B70 | FFC0 | A3CF | 456B | 936E | 09EB |

THU MAR 14 17:37:32 1991 GSPMON.4 PAGE 4, LINE 178

| | | | | | | | | |
|---|---|---|---|---|---|---|---|---|
| 0000005420 | 0030 | 01C0 | 936E | 0D5F | 7B70 | FFC0 | A3CF | 09EB |
| 0000005440 | D010 | 0000 | 936E | 09EB | 0080 | C000 | 936E | 0D5F |
| 0000005460 | 7B70 | FFC0 | A3CF | 188B | 936E | 09EB | 0150 | C000 |
| 0000005500 | 936E | 0D5F | 7B70 | FFC0 | A3CF | 1A6B | 936E | 09EB |
| 0000005520 | 0140 | C000 | 936E | 0D5F | 7B70 | FFC0 | A3CF | 09EB |
| 0000005540 | FFFC | 0000 | 936E | 09EB | 0090 | C000 | 936E | 0D5F |
| 0000005560 | 7B70 | FFC0 | A3CF | 09CB | 00CC | 936E | 09EB | 00B0 |
| 0000005600 | C000 | 936E | 0D5F | 7B70 | FFC0 | A3CF | 456B | 936E |
| 0000005620 | 09EB | 0110 | C000 | 936E | 0D5F | 7B70 | FFC0 | A3CF |
| 0000005640 | 456B | 936E | 09EB | 0160 | C000 | 936E | 0D5F | 7B70 |
| 0000005660 | FFC0 | A3CF | 456B | 936E | 09EB | 01B0 | C000 | 936E |
| 0000005700 | 0D5F | 7B70 | FFC0 | A3CF | 456B | 936E | 09EB | 01E0 |
| 0000005720 | C000 | 936E | 0D5F | 7B70 | FFC0 | A3CF | 1B8B | 936E |
| 0000005740 | 09EB | 0130 | C000 | 936E | 0D5F | 7B70 | FFC0 | A3CF |
| 0000005760 | 09EB | FFFF | 0000 | 936E | 09EB | 00A0 | C000 | 936E |
| 0000006000 | 0D5F | 7B70 | FFC0 | A3CF | 456B | 936E | 09EB | 0120 |
| 0000006020 | C000 | 936E | 0D5F | 7B70 | FFC0 | 09F9 | 7777 | 7777 |
| 0000006040 | 09D8 | 0000 | 09F6 | 0400 | 17FF | 09D5 | 0000 | 09D4 |
| 0000006060 | 0000 | 09D1 | 0008 | 09D3 | 1000 | 97EB | 0960 | 098F |
| 0000006100 | 0014 | 4DCD | B7AB | FFE0 | 0550 | B9AB | FFC0 | 0000 |
| 0000006120 | B7EE | 0060 | 09AF | 2800 | 0962 | 098F | 0054 | 4DCD |
| 0000006140 | 0550 | B5AB | FFE0 | 0544 | 058B | F8B8 | FFC6 | 4529 |
| 0000006160 | 0541 | 0589 | F8BC | FFC6 | 0589 | F8BD | FFC6 | 182B |
| 0000006200 | 058B | F8BF | FFC6 | 058B | F8BE | FFC6 | 0543 | 0589 |
| 0000006220 | F8E0 | FFC6 | 0541 | 0589 | F8C0 | FFC6 | 058B | F8C1 |
| 0000006240 | FFC6 | 058B | F8C2 | FFC6 | 058B | F8C3 | FFC6 | 1889 |
| 0000006260 | 0543 | 0589 | F8C4 | FFC6 | 4529 | 0541 | 0589 | F8C7 |
| 0000006300 | FFC6 | 1869 | 0542 | 0589 | F8C8 | FFC6 | 0589 | F8CA |
| 0000006320 | FFC6 | 4529 | 0589 | F8CC | FFC6 | 0589 | F8CE | FFC6 |
| 0000006340 | 0541 | 058B | F3D0 | FFC6 | 0589 | F8D1 | FFC6 | 1869 |
| 0000006360 | 0542 | 0589 | F8D2 | FFC6 | 058B | F8D4 | FFC6 | 1849 |
| 0000006400 | 0589 | F8D6 | FFC6 | 1869 | 0589 | F8D8 | FFC6 | 0589 |
| 0000006420 | F8DA | FFC6 | 1849 | 0589 | F8DC | FFC6 | 0541 | 058B |
| 0000006440 | F8DE | FFC6 | 4529 | 0589 | F8DF | FFC6 | 0542 | 0589 |
| 0000006460 | F8B0 | FFC6 | 0541 | 0589 | F8B2 | FFC6 | 0589 | F8B3 |
| 0000006500 | FFC6 | 0542 | 0589 | F8B6 | FFC6 | 0589 | F8B4 | FFC6 |
| 0000006520 | 0550 | B5A9 | FFE0 | 0544 | 0589 | F978 | FFC6 | 4529 |
| 0000006540 | 0541 | 0589 | F97C | FFC6 | 0589 | F97D | FFC6 | 058B |
| 0000006560 | F97F | FFC6 | 058B | F97E | FFC6 | 0543 | 0589 | F9A0 |
| 0000006600 | FFC6 | 0541 | 0589 | F980 | FFC6 | 058B | F981 | FFC6 |
| 0000006620 | 058B | F982 | FFC6 | 058B | F983 | FFC6 | 1889 | 0543 |
| 0000006640 | 0589 | F984 | FFC6 | 4529 | 0541 | 0589 | F987 | FFC6 |
| 0000006660 | 0542 | 058B | F988 | FFC6 | 058B | F98A | FFC6 | 0589 |
| 0000006700 | F98C | FFC6 | 0589 | F98E | FFC6 | 0541 | 058B | F990 |
| 0000006720 | FFC6 | 0589 | F991 | FFC6 | 1869 | 0542 | 0589 | F992 |
| 0000006740 | FFC6 | 058B | F994 | FFC6 | 1849 | 0589 | F996 | FFC6 |
| 0000006760 | 0589 | F998 | FFC6 | 1869 | 0589 | F99A | FFC6 | 0589 |
| 0000007000 | F99C | FFC6 | 0541 | 058B | F99E | FFC6 | 4529 | 0589 |
| 0000007020 | F99F | FFC6 | 0542 | 0589 | F970 | FFC6 | 0541 | 0589 |
| 0000007040 | F972 | FFC6 | 0589 | F973 | FFC6 | 0542 | 0589 | F976 |
| 0000007060 | FFC6 | 0589 | F974 | FFC6 | 0550 | B5A9 | FFE0 | 0544 |
| 0000007100 | 0589 | F9B8 | FFC6 | 4529 | 0541 | 0589 | F9BC | FFC6 |
| 0000007120 | 0589 | F9BD | FFC6 | 058B | F9BF | FFC6 | 058B | F9BE |
| 0000007140 | FFC6 | 0543 | 0589 | F9E0 | FFC6 | 0541 | 058B | F9C0 |
| 0000007160 | FFC6 | 058B | F9C1 | FFC6 | 058B | F9C2 | FFC6 | 058B |
| 0000007200 | F9C3 | FFC6 | 1889 | 0543 | 0589 | F9C4 | FFC6 | 4529 |
| 0000007220 | 0541 | 0589 | F9C7 | FFC6 | 1869 | 0542 | 0589 | F9C8 |
| 0000007240 | FFC6 | 0589 | F9CA | FFC6 | 4529 | 0589 | F9CC | FFC6 |
| 0000007260 | 0589 | F9CE | FFC6 | 0541 | 058B | F9D0 | FFC6 | 0589 |

THU MAR 14 17:37:32 1991 GSPMON.4 PAGE 5, LINE 237

| | | | | | | | | |
|---|---|---|---|---|---|---|---|---|
| 0000007300 | F9D1 | FFC6 | 1869 | 0542 | 0589 | F9D2 | FFC6 | 0589 |
| 0000007320 | F9D4 | FFC6 | 0589 | F9D6 | FFC6 | 0589 | F9D8 | FFC6 |
| 0000007340 | 0589 | F9DA | FFC6 | 0589 | F9DC | FFC6 | 0541 | 058B |
| 0000007360 | F9DE | FFC6 | 4529 | 0589 | F9DF | FFC6 | 0542 | 0589 |
| 0000007400 | F9B0 | FFC6 | 0541 | 0589 | F9B2 | FFC6 | 0589 | F9B3 |
| 0000007420 | FFC6 | 0542 | 0589 | F9B6 | FFC6 | 0589 | F9B4 | FFC6 |
| 0000007440 | 0550 | B5A9 | FFE0 | 0544 | 0589 | FB78 | FFC6 | 4529 |
| 0000007460 | 0541 | 0589 | FB7C | FFC6 | 0589 | FB7D | FFC6 | 058B |
| 0000007500 | FB7F | FFC6 | 058B | FB7E | FFC6 | 0543 | 0589 | FBA0 |
| 0000007520 | FFC6 | 0541 | 0589 | FB80 | FFC6 | 0589 | FB81 | FFC6 |
| 0000007540 | 058B | FB82 | FFC6 | 058B | FB83 | FFC6 | 1889 | 0543 |
| 0000007560 | 0589 | FB84 | FFC6 | 4529 | 0541 | 0589 | FB87 | FFC6 |
| 0000007600 | 1869 | 0542 | 0589 | FB88 | FFC6 | 0589 | FB8A | FFC6 |
| 0000007620 | 4529 | 0589 | FB8C | FFC6 | 0589 | FB8E | FFC6 | 0541 |
| 0000007640 | 058B | FB90 | FFC6 | 0589 | FB91 | FFC6 | 0542 | 0589 |
| 0000007660 | FB92 | FFC6 | 058B | FB94 | FFC6 | 1849 | 0589 | FB96 |
| 0000007700 | FFC6 | 1869 | 0589 | FB98 | FFC6 | 0589 | FB9A | FFC6 |
| 0000007720 | 1849 | 0589 | FB9C | FFC6 | 0541 | 058B | FB9E | FFC6 |
| 0000007740 | 4529 | 0589 | FB9F | FFC6 | 0542 | 0589 | FB70 | FFC6 |
| 0000007760 | 0541 | 0589 | FB72 | FFC6 | 0589 | FB73 | FFC6 | 0542 |
| 0000010000 | 0589 | FB76 | FFC6 | 0589 | FB74 | FFC6 | 0550 | B5A9 |
| 0000010020 | FFE0 | 0544 | 0589 | FBF8 | FFC6 | 4529 | 0541 | 0589 |
| 0000010040 | FBFC | FFC6 | 0589 | FBFD | FFC6 | 058B | FBFF | FFC6 |
| 0000010060 | 058B | FBFE | FFC6 | 0543 | 0589 | FC20 | FFC6 | 0541 |
| 0000010100 | 0589 | FC00 | FFC6 | 058B | FC01 | FFC6 | 058B | FC02 |
| 0000010120 | FFC6 | 058B | FC03 | FFC6 | 1889 | 0543 | 0589 | FC04 |
| 0000010140 | FFC6 | 4529 | 0541 | 0589 | FC07 | FFC6 | 1869 | 0542 |
| 0000010160 | 0589 | FC08 | FFC6 | 0589 | FC0A | FFC6 | 4529 | 0589 |
| 0000010200 | FC0C | FFC6 | 0589 | FC0E | FFC6 | 0541 | 058B | FC10 |
| 0000010220 | FFC6 | 0589 | FC11 | FFC6 | 0542 | 0589 | FC12 | FFC6 |
| 0000010240 | 058B | FC14 | FFC6 | 1849 | 0589 | FC16 | FFC6 | 1869 |
| 0000010260 | 0589 | FC18 | FFC6 | 0589 | FC1A | FFC6 | 1849 | 0589 |
| 0000010300 | FC1C | FFC6 | 0541 | 058B | FC1E | FFC6 | 4529 | 0589 |
| 0000010320 | FC1F | FFC6 | 0542 | 0589 | FBF0 | FFC6 | 0541 | 0589 |
| 0000010340 | FBF2 | FFC6 | 0589 | FBF3 | FFC6 | 0542 | 0589 | FBF6 |
| 0000010360 | FFC6 | 0589 | FBF4 | FFC6 | 0550 | B5A9 | FFE0 | 0544 |
| 0000010400 | 0589 | FE38 | FFC6 | 4529 | 0541 | 0589 | FE3C | FFC6 |
| 0000010420 | 0589 | FE3D | FFC6 | 0589 | FE3F | FFC6 | 058B | FE3E |
| 0000010440 | FFC6 | 0543 | 0589 | FE60 | FFC6 | 0541 | 058B | FE40 |
| 0000010460 | FFC6 | 058B | FE41 | FFC6 | 058B | FE42 | FFC6 | 058B |
| 0000010500 | FE43 | FFC6 | 1889 | 0543 | 0589 | FE44 | FFC6 | 4529 |
| 0000010520 | 0541 | 0589 | FE47 | FFC6 | 1869 | 0542 | 0589 | FE48 |
| 0000010540 | FFC6 | 0589 | FE4A | FFC6 | 4529 | 0589 | FE4C | FFC6 |
| 0000010560 | 0589 | FE4E | FFC6 | 0541 | 058B | FE50 | FFC6 | 0589 |
| 0000010600 | FE51 | FFC6 | 0542 | 0589 | FE52 | FFC6 | 1869 | 0589 |
| 0000010620 | FE54 | FFC6 | 0589 | FE56 | FFC6 | 0589 | FE58 | FFC6 |
| 0000010640 | 0589 | FE5A | FFC6 | 1849 | 0589 | FE5C | FFC6 | 0541 |
| 0000010660 | 058B | FE5E | FFC6 | 4529 | 0589 | FE5F | FFC6 | 0542 |
| 0000010700 | 0589 | FE30 | FFC6 | 0541 | 0589 | FE32 | FFC6 | 0589 |
| 0000010720 | FE33 | FFC6 | 0542 | 0589 | FE36 | FFC6 | 0589 | FE34 |
| 0000010740 | FFC6 | 0550 | B5A9 | FFE0 | 0544 | 0589 | FC78 | FFC6 |
| 0000010760 | 4529 | 0541 | 0589 | FC7C | FFC6 | 058B | FC7D | FFC6 |
| 0000011000 | 058B | FC7F | FFC6 | 0589 | FC7E | FFC6 | 0543 | 0589 |
| 0000011020 | FCA0 | FFC6 | 0541 | 058B | FC80 | FFC6 | 058B | FC81 |
| 0000011040 | FFC6 | 058B | FC82 | FFC6 | 058B | FC83 | FFC6 | 1869 |
| 0000011060 | 0543 | 0589 | FC84 | FFC6 | 4529 | 0541 | 0589 | FC87 |
| 0000011100 | FFC6 | 1869 | 0542 | 0589 | FC88 | FFC6 | 0589 | FC8A |
| 0000011120 | FFC6 | 4529 | 0589 | FC8C | FFC6 | 0589 | FC8E | FFC6 |
| 0000011140 | 0541 | 0589 | FC90 | FFC6 | 0589 | FC91 | FFC6 | 1869 |

THU MAR 14 17:37:32 1991 GSPMON.4 PAGE 6, LINE 296

| | | | | | | | | |
|---|---|---|---|---|---|---|---|---|
| 0000011160 | 0542 | 0589 | FC92 | FFC6 | 4529 | 0589 | FC94 | FFC6 |
| 0000011200 | 1849 | 0589 | FC96 | FFC6 | 1869 | 0589 | FC98 | FFC6 |
| 0000011220 | 0589 | FC9A | FFC6 | 1849 | 0589 | FC9C | FFC6 | 0541 |
| 0000011240 | 058B | FC9E | FFC6 | 058B | FC9F | FFC6 | 4529 | 0542 |
| 0000011260 | 0589 | FC70 | FFC6 | 0541 | 0589 | FC72 | FFC6 | 0589 |
| 0000011300 | FC73 | FFC6 | 0542 | 0589 | FC76 | FFC6 | 0589 | FC74 |
| 0000011320 | FFC6 | 0550 | B5A9 | FFE0 | 0544 | 0589 | FCB8 | FFC6 |
| 0000011340 | 4529 | 0541 | 0589 | FCBC | FFC6 | 058B | FCBD | FFC6 |
| 0000011360 | 058B | FCBF | FFC6 | 0589 | FCBE | FFC6 | 0543 | 0589 |
| 0000011400 | FCE0 | FFC6 | 0541 | 058B | FCC0 | FFC6 | 058B | FCC1 |
| 0000011420 | FFC6 | 058B | FCC2 | FFC6 | 058B | FCC3 | FFC6 | 1869 |
| 0000011440 | 0543 | 0589 | FCC4 | FFC6 | 4529 | 0541 | 0589 | FCC7 |
| 0000011460 | FFC6 | 1869 | 0542 | 0589 | FCC8 | FFC6 | 0589 | FCCA |
| 0000011500 | FFC6 | 4529 | 0589 | FCCC | FFC6 | 0589 | FCCE | FFC6 |
| 0000011520 | 0541 | 058B | FCD0 | FFC6 | 0589 | FCD1 | FFC6 | 1869 |
| 0000011540 | 0542 | 0589 | FCD2 | FFC6 | 4529 | 0589 | FCD4 | FFC6 |
| 0000011560 | 1849 | 0589 | FCD6 | FFC6 | 1869 | 0589 | FCD8 | FFC6 |
| 0000011600 | 0589 | FCDA | FFC6 | 058B | FCDC | FFC6 | 0541 | 058B |
| 0000011620 | FCDE | FFC6 | 4529 | 0589 | FCDF | FFC6 | 0542 | 0589 |
| 0000011640 | FCB0 | FFC6 | 0541 | 0589 | FCB2 | FFC6 | 0589 | FCB3 |
| 0000011660 | FFC6 | 0542 | 0589 | FCB6 | FFC6 | 0589 | FCB4 | FFC6 |
| 0000011700 | 0550 | B5A9 | FFE0 | 0544 | 0589 | FE78 | FFC6 | 4529 |
| 0000011720 | 0541 | 0589 | FE7C | FFC6 | 058B | FE7D | FFC6 | 058B |
| 0000011740 | FE7F | FFC6 | 0589 | FE7E | FFC6 | 0543 | 0589 | FEA0 |
| 0000011760 | FFC6 | 0541 | 058B | FE80 | FFC6 | 058B | FE81 | FFC6 |
| 0000012000 | 058B | FE82 | FFC6 | 058B | FE83 | FFC6 | 1869 | 0543 |
| 0000012020 | 0589 | FE84 | FFC6 | 4529 | 0541 | 0589 | FE87 | FFC6 |
| 0000012040 | 1869 | 0542 | 0589 | FE88 | FFC6 | 0589 | FE8A | FFC6 |
| 0000012060 | 4529 | 0589 | FE8C | FFC6 | 0589 | FE8E | FFC6 | 0541 |
| 0000012100 | 058B | FE90 | FFC6 | 0589 | FE91 | FFC6 | 0542 | 0589 |
| 0000012120 | FE92 | FFC6 | 1869 | 0589 | FE94 | FFC6 | 1849 | 0589 |
| 0000012140 | FE96 | FFC6 | 1869 | 0589 | FE98 | FFC6 | 0589 | FE9A |
| 0000012160 | FFC6 | 058B | FE9C | FFC6 | 0541 | 058B | FE9E | FFC6 |
| 0000012200 | 4529 | 0589 | FE9F | FFC6 | 0542 | 0589 | FE70 | FFC6 |
| 0000012220 | 0541 | 0589 | FE72 | FFC6 | 0589 | FE73 | FFC6 | 0542 |
| 0000012240 | 0589 | FE76 | FFC6 | 0589 | FE74 | FFC6 | 0550 | B5A9 |
| 0000012260 | FFE0 | 0544 | 0589 | F7F8 | FFC6 | 4529 | 0541 | 0589 |
| 0000012300 | F7FC | FFC6 | 0589 | F7FD | FFC6 | 058B | F7FF | FFC6 |
| 0000012320 | 058B | F7FE | FFC6 | 0543 | 0589 | F820 | FFC6 | 0541 |
| 0000012340 | 058B | F800 | FFC6 | 058B | F801 | FFC6 | 058B | F802 |
| 0000012360 | FFC6 | 058B | F803 | FFC6 | 1889 | 0543 | 0589 | F804 |
| 0000012400 | FFC6 | 4529 | 0541 | 0589 | F807 | FFC6 | 1869 | 0542 |
| 0000012420 | 0589 | F808 | FFC6 | 0589 | F80A | FFC6 | 4529 | 0589 |
| 0000012440 | F80C | FFC6 | 0589 | F80E | FFC6 | 0541 | 058B | F810 |
| 0000012460 | FFC6 | 0589 | F811 | FFC6 | 1869 | 0542 | 0589 | F812 |
| 0000012500 | FFC6 | 0589 | F814 | FFC6 | 0589 | F816 | FFC6 | 0589 |
| 0000012520 | F818 | FFC6 | 0589 | F81A | FFC6 | 058B | F81C | FFC6 |
| 0000012540 | 0541 | 058B | F81E | FFC6 | 4529 | 0589 | F81F | FFC6 |
| 0000012560 | 0542 | 0589 | F7F0 | FFC6 | 0541 | 0589 | F7F2 | FFC6 |
| 0000012600 | 0589 | F7F3 | FFC6 | 0542 | 0589 | F7F6 | FFC6 | 0589 |
| 0000012620 | F7F4 | FFC6 | 0550 | B5A9 | FFE0 | 0544 | 0589 | FA38 |
| 0000012640 | FFC6 | 4529 | 0541 | 0589 | FA3C | FFC6 | 0589 | FA3D |
| 0000012660 | FFC6 | 058B | FA3F | FFC6 | 058B | FA3E | FFC6 | 0543 |
| 0000012700 | 0589 | FA60 | FFC6 | 0541 | 058B | FA40 | FFC6 | 058B |
| 0000012720 | FA41 | FFC6 | 058B | FA42 | FFC6 | 058B | FA43 | FFC6 |
| 0000012740 | 1889 | 0543 | 0589 | FA44 | FFC6 | 4529 | 0541 | 0589 |
| 0000012760 | FA47 | FFC6 | 1849 | 0542 | 0589 | FA48 | FFC6 | 1869 |
| 0000013000 | 0589 | FA4A | FFC6 | 4529 | 0589 | FA4C | FFC6 | 0589 |
| 0000013020 | FA4E | FFC6 | 0541 | 058B | FA50 | FFC6 | 0589 | FA51 |

THU MAR 14 17:37:32 1991 GSPMON.4 PAGE 7, LINE 355

| | | | | | | | | |
|---|---|---|---|---|---|---|---|---|
| 0000013040 | FFC6 | 1869 | 0542 | 0589 | FA52 | FFC6 | 0589 | FA54 |
| 0000013060 | FFC6 | 0589 | FA56 | FFC6 | 0589 | FA58 | FFC6 | 1849 |
| 0000013100 | 0589 | FA5A | FFC6 | 1869 | 0589 | FA5C | FFC6 | 4529 |
| 0000013120 | 0541 | 0589 | FA5E | FFC6 | 058B | FA5F | FFC6 | 0542 |
| 0000013140 | 0589 | FA30 | FFC6 | 0541 | 0589 | FA32 | FFC6 | 0589 |
| 0000013160 | FA33 | FFC6 | 0542 | 0589 | FA36 | FFC6 | 0589 | FA34 |
| 0000013200 | FFC6 | 0550 | B5A9 | FFE0 | 0544 | 0589 | F9F8 | FFC6 |
| 0000013220 | 4529 | 0541 | 0589 | F9FC | FFC6 | 0589 | F9FD | FFC6 |
| 0000013240 | 058B | F9FF | FFC6 | 058B | F9FE | FFC6 | 0543 | 0589 |
| 0000013260 | FA20 | FFC6 | 0541 | 058B | FA00 | FFC6 | 058B | FA01 |
| 0000013300 | FFC6 | 058B | FA02 | FFC6 | 058B | FA03 | FFC6 | 1889 |
| 0000013320 | 0543 | 0589 | FA04 | FFC6 | 4529 | 0541 | 0589 | FA07 |
| 0000013340 | FFC6 | 1869 | 0542 | 0589 | FA08 | FFC6 | 0589 | FA0A |
| 0000013360 | FFC6 | 4529 | 0589 | FA0C | FFC6 | 0589 | FA0E | FFC6 |
| 0000013400 | 0541 | 058B | FA10 | FFC6 | 0589 | FA11 | FFC6 | 1869 |
| 0000013420 | 0542 | 0589 | FA12 | FFC6 | 0589 | FA14 | FFC6 | 0589 |
| 0000013440 | FA16 | FFC6 | 0589 | FA18 | FFC6 | 0589 | FA1A | FFC6 |
| 0000013460 | 1849 | 0589 | FA1C | FFC6 | 4529 | 0541 | 0589 | FA1E |
| 0000013500 | FFC6 | 058B | FA1F | FFC6 | 0542 | 0589 | F9F0 | FFC6 |
| 0000013520 | 0541 | 0589 | F9F2 | FFC6 | 0589 | F9F3 | FFC6 | 0542 |
| 0000013540 | 0589 | F9F6 | FFC6 | 0589 | F9F4 | FFC6 | 0550 | B5A9 |
| 0000013560 | FFE0 | 0544 | 0589 | FA78 | FFC6 | 4529 | 0541 | 0589 |
| 0000013600 | FA7C | FFC6 | 0589 | FA7D | FFC6 | 058B | FA7F | FFC6 |
| 0000013620 | 058B | FA7E | FFC6 | 0543 | 0589 | FAA0 | FFC6 | 0541 |
| 0000013640 | 058B | FA80 | FFC6 | 058B | FA81 | FFC6 | 058B | FA82 |
| 0000013660 | FFC6 | 058B | FA83 | FFC6 | 1889 | 0543 | 0589 | FA84 |
| 0000013700 | FFC6 | 4529 | 0541 | 0589 | FA87 | FFC6 | 0542 | 058B |
| 0000013720 | FA88 | FFC6 | 1869 | 0589 | FA8A | FFC6 | 4529 | 0589 |
| 0000013740 | FA8C | FFC6 | 0589 | FA8E | FFC6 | 0541 | 058B | FA90 |
| 0000013760 | FFC6 | 0589 | FA91 | FFC6 | 1869 | 0542 | 0589 | FA92 |
| 0000014000 | FFC6 | 0589 | FA94 | FFC6 | 0589 | FA96 | FFC6 | 1849 |
| 0000014020 | 0589 | FA98 | FFC6 | 1869 | 0589 | FA9A | FFC6 | 0589 |
| 0000014040 | FA9C | FFC6 | 4529 | 0541 | 0589 | FA9E | FFC6 | 058B |
| 0000014060 | FA9F | FFC6 | 0542 | 0589 | FA70 | FFC6 | 0541 | 0589 |
| 0000014100 | FA72 | FFC6 | 0589 | FA73 | FFC6 | 0542 | 0589 | FA76 |
| 0000014120 | FFC6 | 0589 | FA74 | FFC6 | 0550 | B5A9 | FFE0 | 0544 |
| 0000014140 | 0589 | FD38 | FFC6 | 4529 | 0541 | 0589 | FD3C | FFC6 |
| 0000014160 | 0589 | FD3D | FFC6 | 058B | FD3F | FFC6 | 058B | FD3E |
| 0000014200 | FFC6 | 0543 | 0589 | FD60 | FFC6 | 0541 | 058B | FD40 |
| 0000014220 | FFC6 | 058B | FD41 | FFC6 | 058B | FD42 | FFC6 | 058B |
| 0000014240 | FD43 | FFC6 | 1889 | 0543 | 0589 | FD44 | FFC6 | 4529 |
| 0000014260 | 0541 | 0589 | FD47 | FFC6 | 1869 | 0542 | 0589 | FD48 |
| 0000014300 | FFC6 | 0589 | FD4A | FFC6 | 0589 | FD4C | FFC6 | 4529 |
| 0000014320 | 0589 | FD4E | FFC6 | 0541 | 058B | FD50 | FFC6 | 0589 |
| 0000014340 | FD51 | FFC6 | 1869 | 0542 | 0589 | FD52 | FFC6 | 0589 |
| 0000014360 | FD54 | FFC6 | 0589 | FD56 | FFC6 | 0589 | FD58 | FFC6 |
| 0000014400 | 4529 | 0589 | FD5A | FFC6 | 1849 | 0589 | FD5C | FFC6 |
| 0000014420 | 0541 | 058B | FD5E | FFC6 | 4529 | 0589 | FD5F | FFC6 |
| 0000014440 | 0542 | 0589 | FD30 | FFC6 | 0541 | 0589 | FD32 | FFC6 |
| 0000014460 | 0589 | FD33 | FFC6 | 0542 | 0589 | FD36 | FFC6 | 0589 |
| 0000014500 | FD34 | FFC6 | 0550 | B5A9 | FFE0 | 0544 | 0589 | FD78 |
| 0000014520 | FFC6 | 4529 | 0541 | 0589 | FD7C | FFC6 | 0589 | FD7D |
| 0000014540 | FFC6 | 058B | FD7F | FFC6 | 058B | FD7E | FFC6 | 0543 |
| 0000014560 | 0589 | FDA0 | FFC6 | 0541 | 058B | FD80 | FFC6 | 058B |
| 0000014600 | FD81 | FFC6 | 058B | FD82 | FFC6 | 058B | FD83 | FFC6 |
| 0000014620 | 1889 | 0543 | 0589 | FD84 | FFC6 | 4529 | 0541 | 0589 |
| 0000014640 | FD87 | FFC6 | 1869 | 0542 | 0589 | FD88 | FFC6 | 0589 |
| 0000014660 | FD8A | FFC6 | 0589 | FD8C | FFC6 | 4529 | 0589 | FD8E |
| 0000014700 | FFC6 | 0541 | 058B | FD90 | FFC6 | 0589 | FD91 | FFC6 |

THU MAR 14 17:37:32 1991 GSPMON.4 PAGE 8, LINE 414

| | | | | | | | | |
|---|---|---|---|---|---|---|---|---|
| 0000014720 | 1869 | 0542 | 0589 | FD92 | FFC6 | 0589 | FD94 | FFC6 |
| 0000014740 | 0589 | FD96 | FFC6 | 4529 | 0589 | FD98 | FFC6 | 1869 |
| 0000014760 | 0589 | FD9A | FFC6 | 1849 | 0589 | FD9C | FFC6 | 0541 |
| 0000015000 | 058B | FD9E | FFC6 | 058B | FD9F | FFC6 | 4529 | 0542 |
| 0000015020 | 0589 | FD70 | FFC6 | 0541 | 0589 | FD72 | FFC6 | 0589 |
| 0000015040 | FD73 | FFC6 | 0542 | 0589 | FD76 | FFC6 | 0589 | FD74 |
| 0000015060 | FFC6 | 0550 | B5A9 | FFE0 | 0544 | 0589 | FCF8 | FFC6 |
| 0000015100 | 4529 | 0541 | 0589 | FCFC | FFC6 | 058B | FCFD | FFC6 |
| 0000015120 | 058B | FCFF | FFC6 | 0589 | FCFE | FFC6 | 0543 | 0589 |
| 0000015140 | FD20 | FFC6 | 0541 | 058B | FD00 | FFC6 | 058B | FD01 |
| 0000015160 | FFC6 | 058B | FD02 | FFC6 | 058B | FD03 | FFC6 | 1869 |
| 0000015200 | 0543 | 0589 | FD04 | FFC6 | 4529 | 0541 | 0589 | FD07 |
| 0000015220 | FFC6 | 1869 | 0542 | 0589 | FD08 | FFC6 | 0589 | FD0A |
| 0000015240 | FFC6 | 0589 | FD0C | FFC6 | 4529 | 0589 | FD0E | FFC6 |
| 0000015260 | 0541 | 0589 | FD10 | FFC6 | 0589 | FD11 | FFC6 | 1869 |
| 0000015300 | 0542 | 0589 | FD12 | FFC6 | 4529 | 0589 | FD14 | FFC6 |
| 0000015320 | 1849 | 0589 | FD16 | FFC6 | 1869 | 0589 | FD18 | FFC6 |
| 0000015340 | 4529 | 0589 | FD1A | FFC6 | 1849 | 0589 | FD1C | FFC6 |
| 0000015360 | 0541 | 058B | FD1E | FFC6 | 058B | FD1F | FFC6 | 4529 |
| 0000015400 | 0542 | 0589 | FCF0 | FFC6 | 0541 | 0589 | FCF2 | FFC6 |
| 0000015420 | 0589 | FCF3 | FFC6 | 0542 | 0589 | FCF6 | FFC6 | 0589 |
| 0000015440 | FCF4 | FFC6 | 0550 | B5A9 | FFE0 | 0544 | 0589 | FDB8 |
| 0000015460 | FFC6 | 4529 | 0541 | 0589 | FDBC | FFC6 | 0589 | FDBD |
| 0000015500 | FFC6 | 058B | FDBF | FFC6 | 058B | FDBE | FFC6 | 0543 |
| 0000015520 | 0589 | FDE0 | FFC6 | 0541 | 0589 | FDC0 | FFC6 | 058B |
| 0000015540 | FDC1 | FFC6 | 058B | FDC2 | FFC6 | 058B | FDC3 | FFC6 |
| 0000015560 | 1889 | 0543 | 0589 | FDC4 | FFC6 | 4529 | 0541 | 0589 |
| 0000015600 | FDC7 | FFC6 | 1869 | 0542 | 0589 | FDC8 | FFC6 | 0589 |
| 0000015620 | FDCA | FFC6 | 4529 | 0589 | FDCC | FFC6 | 0589 | FDCE |
| 0000015640 | FFC6 | 0541 | 058B | FDD0 | FFC6 | 0589 | FDD1 | FFC6 |
| 0000015660 | 1869 | 0542 | 0589 | FDD2 | FFC6 | 058B | FDD4 | FFC6 |
| 0000015700 | 1849 | 0589 | FDD6 | FFC6 | 1869 | 0589 | FDD8 | FFC6 |
| 0000015720 | 058B | FDDA | FFC6 | 1849 | 0589 | FDDC | FFC6 | 0541 |
| 0000015740 | 058B | FDDE | FFC6 | 4529 | 0589 | FDDF | FFC6 | 0542 |
| 0000015760 | 0589 | FDB0 | FFC6 | 0541 | 0589 | FDB2 | FFC6 | 0589 |
| 0000016000 | FDB3 | FFC6 | 0542 | 0589 | FDB6 | FFC6 | 0589 | FDB4 |
| 0000016020 | FFC6 | 0550 | B5A9 | FFE0 | 0544 | 0589 | FDF8 | FFC6 |
| 0000016040 | 4529 | 0541 | 0589 | FDFC | FFC6 | 0589 | FDFD | FFC6 |
| 0000016060 | 058B | FDFF | FFC6 | 058B | FDFE | FFC6 | 0543 | 0589 |
| 0000016100 | FE20 | FFC6 | 0541 | 0589 | FE00 | FFC6 | 058B | FE01 |
| 0000016120 | FFC6 | 058B | FE02 | FFC6 | 058B | FE03 | FFC6 | 1889 |
| 0000016140 | 0543 | 0589 | FE04 | FFC6 | 4529 | 0541 | 0589 | FE07 |
| 0000016160 | FFC6 | 1869 | 0542 | 0589 | FE08 | FFC6 | 1849 | 0589 |
| 0000016200 | FE0A | FFC6 | 4529 | 0589 | FE0C | FFC6 | 0589 | FE0E |
| 0000016220 | FFC6 | 0541 | 058B | FE10 | FFC6 | 0589 | FE11 | FFC6 |
| 0000016240 | 1869 | 0542 | 0589 | FE12 | FFC6 | 058B | FE14 | FFC6 |
| 0000016260 | 1849 | 0589 | FE16 | FFC6 | 1869 | 0589 | FE18 | FFC6 |
| 0000016300 | 1849 | 0589 | FE1A | FFC6 | 058B | FE1C | FFC6 | 0541 |
| 0000016320 | 058B | FE1E | FFC6 | 4529 | 0589 | FE1F | FFC6 | 0542 |
| 0000016340 | 0589 | FDF0 | FFC6 | 0541 | 0589 | FDF2 | FFC6 | 0589 |
| 0000016360 | FDF3 | FFC6 | 0542 | 0589 | FDF6 | FFC6 | 0589 | FDF4 |
| 0000016400 | FFC6 | B7EE | 0080 | 09AF | 2A00 | 0962 | 0D3F | 000F |
| 0000016420 | 07A8 | D6F0 | FFC6 | 8BE8 | 0D5F | 41B0 | FFC0 | 0962 |
| 0000016440 | 0D3F | 0005 | 07A8 | D6F0 | FFC6 | 8BE8 | 0960 | 07A8 |
| 0000016460 | D6F0 | FFC6 | 8BE8 | 0B08 | 0100 | 0988 | 007F | 0B08 |
| 0000016500 | 0200 | 0988 | FF00 | 07BE | D6F0 | FFC6 | 0B1E | 0400 |
| 0000016520 | 099E | FFFC | 0960 | 0D3F | FFEA | 07A8 | D6F0 | FFC6 |
| 0000016540 | D3E8 | 0020 | 186B | 936E | 0D5F | 41B0 | FFC0 | 0962 |
| 0000016560 | 098F | 0054 | 4DCD | 0B0E | 00A0 | 0550 | 05AB | 6D60 |

THU MAR 14 17:37:32 1991 GSPMON.4 PAGE 9, LINE 473

| | | | | | | | | |
|---|---|---|---|---|---|---|---|---|
| 0000016600 | FFD2 | 2F6B | 140B | C302 | 180B | C004 | 05AB | 6D60 |
| 0000016620 | FFD2 | 2F6B | 058B | 89B0 | FFC7 | 180B | 058B | 89C0 |
| 0000016640 | FFC7 | 05A9 | 6D60 | FFD2 | 05AB | 89B0 | FFC7 | 5B69 |
| 0000016660 | 0589 | 89A0 | FFC7 | 05A9 | 6D70 | FFD2 | 05AB | 89C0 |
| 0000016700 | FFC7 | 5B69 | 0589 | 8990 | FFC7 | 07A9 | 6C00 | FFD2 |
| 0000016720 | 5F69 | 0789 | 8810 | FFC7 | 05A9 | 89B0 | FFC7 | 05AB |
| 0000016740 | 6D80 | FFD2 | 5F69 | 0789 | 8830 | FFC7 | 4529 | 0589 |
| 0000016760 | 88F0 | FFC7 | 18AB | 058B | 88D0 | FFC7 | 0589 | 8980 |
| 0000017000 | FFC7 | 0789 | 07F0 | FFC7 | 0789 | 54B0 | FFC9 | 0541 |
| 0000017020 | 0589 | 6B50 | FFD2 | 186B | 0550 | 058B | 8970 | FFC7 |
| 0000017040 | 18EB | 058B | 9960 | FFD1 | 0D5F | 1E10 | FFC6 | 0543 |
| 0000017060 | 0589 | 88B0 | FFC7 | 0550 | 05AB | 6D80 | FFD2 | 24AB |
| 0000017100 | B36D | 0020 | 07AB | 6C00 | FFD2 | 24AB | B36D | 0040 |
| 0000017120 | B32D | 0060 | 812D | 05AB | 8990 | FFC7 | 4969 | C900 |
| 0000017140 | 00C6 | BBAD | 0060 | 0080 | 456B | B16D | 0010 | 05A9 |
| 0000017160 | 89A0 | FFC7 | 492B | C900 | 00AA | 85AB | CB0D | B5A9 |
| 0000017200 | 0010 | CB0A | 254B | 0B2B | AB80 | FFC7 | 24A9 | 412B |
| 0000017220 | 4529 | 812B | C000 | 0087 | 4D68 | CB13 | 05A9 | 89A0 |
| 0000017240 | FFC7 | B5AB | 0010 | 102B | 492B | CB0B | 2548 | 0B28 |
| 0000017260 | AB80 | FFC7 | B5AB | 0010 | 24AB | 4168 | 182B | 8168 |
| 0000017300 | C072 | 4D09 | CB0B | 2548 | 0B28 | AB80 | FFC7 | B5AB |
| 0000017320 | 0010 | 24AB | 4168 | 184B | 8168 | C065 | 05AB | 8990 |
| 0000017340 | FFC7 | 4D09 | 1029 | 4969 | CB0C | B5A9 | 0010 | CB09 |
| 0000017360 | 2548 | 0B28 | AB80 | FFC7 | 24A9 | 4128 | 1869 | 8128 |
| 0000017400 | C052 | 4D09 | 1029 | 4969 | CB13 | 05A9 | 89A0 | FFC7 |
| 0000017420 | B5AB | 0010 | 102B | 492B | CB0B | 2548 | 0B28 | AB80 |
| 0000017440 | FFC7 | B5AB | 0010 | 24AB | 4168 | 188B | 8168 | C03B |
| 0000017460 | 05AB | 8990 | FFC7 | 4D09 | 1029 | 4969 | CB0B | 2548 |
| 0000017500 | 0B28 | AB80 | FFC7 | B5A9 | 0010 | 24A9 | 4128 | 18A9 |
| 0000017520 | 8128 | C029 | B5A9 | 0010 | CB09 | 2548 | 0B28 | AB80 |
| 0000017540 | FFC7 | 24A9 | 4128 | 18C9 | 8128 | C01D | 05A9 | 89A0 |
| 0000017560 | FFC7 | B5AB | 0010 | 102B | 492B | CB0B | 2548 | 0B28 |
| 0000017600 | AB80 | FFC7 | B5AB | 0010 | 24AB | 4168 | 18EB | 8168 |
| 0000017620 | C00A | 2548 | 0B28 | AB80 | FFC7 | B5AB | 0010 | 24AB |
| 0000017640 | 4168 | 190B | 8168 | B5AB | 0010 | 102B | B16D | 0010 |
| 0000017660 | B7A9 | 0060 | B7AB | 0020 | 4169 | B32D | 0060 | B5A9 |
| 0000017700 | 0010 | 05AB | 89A0 | FFC7 | 4969 | C800 | FF56 | B7AB |
| 0000017720 | 0080 | B7A9 | 0040 | 412B | B36D | 0060 | 85A9 | 1029 |
| 0000017740 | 812D | 05AB | 8990 | FFC7 | 4969 | C800 | FF3A | 4529 |
| 0000017760 | 812D | 4969 | C90F | 85AB | 24AB | 0B2B | 8AE0 | FFC7 |
| 0000020000 | 4529 | 832B | 85AB | 102B | 816D | 05A9 | 8990 | FFC7 |
| 0000020020 | 492B | C8F1 | 09EB | 1B30 | FFC1 | 078B | 6B60 | FFD2 |
| 0000020040 | 09E9 | 3F50 | FFC1 | 0789 | 6B80 | FFD2 | 0BEE | FF5F |
| 0000020060 | 09AF | 2A00 | 0960 | 098F | 0050 | C000 | 0229 | 456B |
| 0000020100 | 0550 | 058B | 8980 | FFC7 | 078B | 07F0 | FFC7 | 078B |
| 0000020120 | 54B0 | FFC9 | A3CF | 936E | 0D5F | 66C0 | FFC0 | 182B |
| 0000020140 | 0543 | 058B | 88B0 | FFC7 | 184B | 0542 | 058B | 88C0 |
| 0000020160 | FFC7 | 456B | 078B | 6B20 | FFD2 | 0550 | 058B | AB00 |
| 0000020200 | FFC7 | 058B | AB60 | FFC7 | 09EB | FFFF | 0000 | 058B |
| 0000020220 | AB70 | FFC7 | C000 | 020E | 0550 | 05AB | 8980 | FFC7 |
| 0000020240 | CB07 | A3CF | 1AEB | 936E | 0D5F | 66C0 | FFC0 | C006 |
| 0000020260 | A3CF | 1B0B | 936E | 0D5F | 66C0 | FFC0 | 0550 | 05AB |
| 0000020300 | 8970 | FFC7 | 07A9 | 6AA0 | FFD2 | 4969 | C205 | 4529 |
| 0000020320 | 0789 | 6B20 | FFD2 | C007 | 07A9 | 6B20 | FFD2 | 1029 |
| 0000020340 | 0789 | 6B20 | FFD2 | 1849 | 0543 | 0589 | 88B0 | FFC7 |
| 0000020360 | C000 | 01E0 | 0550 | 05AB | 8980 | FFC7 | CB07 | A3CF |
| 0000020400 | 1AE9 | 932E | 0D5F | 66C0 | FFC0 | C006 | A3CF | 1B09 |
| 0000020420 | 932E | 0D5F | 66C0 | FFC0 | 0550 | 05AB | 8970 | FFC7 |
| 0000020440 | 07A9 | 6AA0 | FFD2 | 4969 | C206 | 4529 | 0789 | 6B20 |

THU MAR 14 17:37:32 1991 GSPMON.4 PAGE 10, LINE 532

| | | | | | | | | |
|---|---|---|---|---|---|---|---|---|
| 0000020460 | FFD2 | C000 | 0123 | 07A9 | 6B20 | FFD2 | 1029 | 0789 |
| 0000020500 | 6B20 | FFD2 | C000 | 011A | 05AB | 8970 | FFC7 | 07A9 |
| 0000020520 | 6AA0 | FFD2 | 4969 | C228 | 0B49 | EC77 | C925 | 05A9 |
| 0000020540 | 88F0 | FFC7 | 0D89 | 0020 | A3CF | 18E9 | 932E | 0D5F |
| 0000020560 | 66C0 | FFC0 | 186B | 0543 | 058B | 88B0 | FFC7 | 09E9 |
| 0000020600 | 8AE0 | FFC7 | 0789 | AAE0 | FFC7 | 182B | 0542 | 058B |
| 0000020620 | 88C0 | FFC7 | 456B | 0550 | 058B | 54F0 | FFC9 | 058B |
| 0000020640 | 88F0 | FFC7 | C000 | 0186 | 07A9 | 6AA0 | FFD2 | 4969 |
| 0000020660 | C31B | 05A9 | 54F0 | FFC9 | 1029 | 0589 | 54F0 | FFC9 |
| 0000020700 | 0529 | 1469 | C200 | 0176 | 4529 | 0589 | 54F0 | FFC9 |
| 0000020720 | 0589 | 88F0 | FFC7 | 18AB | 058B | 88E0 | FFC7 | 058B |
| 0000020740 | 88D0 | FFC7 | C000 | 0166 | 05A9 | 8980 | FFC7 | 03A9 |
| 0000020760 | 1029 | 0589 | 8980 | FFC7 | 05A9 | 8980 | FFC7 | CA04 |
| 0000021000 | 07A9 | 6D30 | FFD2 | C001 | 4529 | 0789 | 54D0 | FFC9 |
| 0000021020 | 05A9 | 8980 | FFC7 | CA02 | 4529 | C003 | 07A9 | 6D30 |
| 0000021040 | FFD2 | 0789 | 54B0 | FFC9 | 4529 | 0589 | 88F0 | FFC7 |
| 0000021060 | 09EB | FFF6 | 0000 | 058B | 88E0 | FFC7 | 18A9 | 0589 |
| 0000021100 | 88D0 | FFC7 | C000 | 0136 | 182B | 0541 | 058B | 5530 |
| 0000021120 | FFC9 | 0541 | 05AB | 5530 | FFC9 | CA0A | 1949 | 0550 |
| 0000021140 | 0589 | 5510 | FFC9 | 186B | 058B | 5520 | FFC9 | C009 |
| 0000021160 | 1889 | 0550 | 0589 | 5510 | FFC9 | 184B | 058B | 5520 |
| 0000021200 | FFC9 | 07A9 | 6B20 | FFD2 | CB07 | 1889 | 0543 | 0589 |
| 0000021220 | 88B0 | FFC7 | C000 | 010E | 05A9 | 5500 | FFC9 | 1029 |
| 0000021240 | 0589 | 5500 | FFC9 | 0529 | 05AB | 5510 | FFC9 | 4969 |
| 0000021260 | C200 | 0100 | A3CF | 18E9 | 932E | 0D5F | 66C0 | FFC0 |
| 0000021300 | 0541 | 05AB | 5530 | FFC9 | CB07 | 09E9 | 8EE0 | FFC7 |
| 0000021320 | 0789 | AAE0 | FFC7 | C010 | 0550 | 05A9 | AB00 | FFC7 |
| 0000021340 | 1029 | 0589 | AB00 | FFC7 | 1429 | 2549 | 0B29 | 92E0 |
| 0000021360 | FFC7 | 0789 | AAE0 | FFC7 | 456B | 0542 | 058B | 88C0 |
| 0000021400 | FFC7 | 1869 | 0543 | 0589 | 88B0 | FFC7 | 0541 | 058B |
| 0000021420 | 5530 | FFC9 | 0550 | 058B | 5500 | FFC9 | C000 | 00CA |
| 0000021440 | 05AB | 8970 | FFC7 | 07A9 | 6AA0 | FFD2 | 4969 | C220 |
| 0000021460 | 05A9 | 8980 | FFC7 | 03A9 | 1029 | 0589 | 8980 | FFC7 |
| 0000021500 | 05A9 | 8980 | FFC7 | CA04 | 07A9 | 6D30 | FFD2 | C001 |
| 0000021520 | 4529 | 0789 | 54D0 | FFC9 | 05A9 | 8980 | FFC7 | CA02 |
| 0000021540 | 4529 | C003 | 07A9 | 6D30 | FFD2 | 0789 | 54B0 | FFC9 |
| 0000021560 | 182B | 078B | AB30 | FFC7 | C000 | 009C | 05A8 | 88D0 |
| 0000021600 | FFC7 | CA00 | FEE1 | 1428 | CA00 | FF63 | 1428 | CA00 |
| 0000021620 | FF5B | 1468 | CAC5 | C0EC | 0550 | 05AB | 8980 | FFC7 |
| 0000021640 | CB07 | A3CF | 1AE9 | 932E | 0D5F | 66C0 | FFC0 | C006 |
| 0000021660 | A3CF | 1B09 | 932E | 0D5F | 66C0 | FFC0 | 0550 | 05AB |
| 0000021700 | 8970 | FFC7 | 07A9 | 6AA0 | FFD2 | 4969 | C205 | 4529 |
| 0000021720 | 0789 | 6B20 | FFD2 | C007 | 07A9 | 6B20 | FFD2 | 1029 |
| 0000021740 | 0789 | 6B20 | FFD2 | 05A9 | 5520 | FFC9 | 07AB | 6B20 |
| 0000021760 | FFD2 | 492B | C30D | 05A9 | 5500 | FFC9 | 1029 | 0589 |
| 0000022000 | 5500 | FFC9 | 0529 | 05AB | 5510 | FFC9 | 4969 | C252 |
| 0000022020 | A3CF | 18EB | 936E | 0D5F | 66C0 | FFC0 | 0541 | 05A9 |
| 0000022040 | 5530 | FFC9 | CB07 | 09EB | 8EE0 | FFC7 | 078B | AAE0 |
| 0000022060 | FFC7 | C010 | 0550 | 05AB | AB00 | FFC7 | 102B | 058B |
| 0000022100 | AB00 | FFC7 | 142B | 254B | 0B2B | 92E0 | FFC7 | 078B |
| 0000022120 | AAE0 | FFC7 | 4529 | 0542 | 0589 | 88C0 | FFC7 | 1869 |
| 0000022140 | 0543 | 0589 | 88B0 | FFC7 | 4529 | 0550 | 0589 | 5500 |
| 0000022160 | FFC9 | 0541 | 0589 | 5530 | FFC9 | C01C | 456B | 078B |
| 0000022200 | 6B20 | FFD2 | C017 | 182B | 078B | AB30 | FFC7 | C012 |
| 0000022220 | 0543 | 05A8 | 88B0 | FFC7 | CA00 | FDD1 | 1428 | CA00 |
| 0000022240 | FDFB | 1428 | CA00 | FE26 | 1428 | CAE8 | 1428 | CA00 |
| 0000022260 | FF73 | C0E9 | 09AF | 0A00 | 0960 | 098F | 0054 | 4DCD |
| 0000022300 | 120E | C000 | 0131 | 07C0 | 54B0 | FFC9 | 07F0 | FFC7 |
| 0000022320 | 09EB | FFFF | 0000 | 0550 | 058B | 88E0 | FFC7 | 05AB |

THU MAR 14 17:37:32 1991 GSPMON.4 PAGE 11, LINE 591

| | | | | | | | | |
|---|---|---|---|---|---|---|---|---|
| 0000022340 | AB00 | FFC7 | CB0C | A3CF | 09E9 | 8900 | FFC7 | 932E |
| 0000022360 | 0D5F | 1B80 | FFC2 | 0550 | 0588 | 88E0 | FFC7 | 05AB |
| 0000022400 | 88E0 | FFC7 | CA5B | 0D5F | D9F0 | FFC1 | 0D5F | 53F0 |
| 0000022420 | FFC1 | 0D5F | 9C20 | FFC1 | A3CF | 09EB | 3B80 | FFC9 |
| 0000022440 | 936E | 0550 | 05A9 | 8910 | FFC7 | 932E | 05AB | 8900 |
| 0000022460 | FFC7 | 936E | 0D5F | B470 | FFC1 | 4D09 | CB35 | 0550 |
| 0000022500 | 05AB | AB00 | FFC7 | CA12 | 05A9 | AB50 | FFC7 | 05AB |
| 0000022520 | AB70 | FFC7 | 4969 | C90A | 4D28 | CA08 | 05C0 | AB00 |
| 0000022540 | FFC7 | AB60 | FFC7 | 0588 | AB70 | FFC7 | A3CF | 09EB |
| 0000022560 | 8900 | FFC7 | 936E | 09E9 | 3B80 | FFC9 | 932E | 0D5F |
| 0000022600 | 25D0 | FFC2 | 0550 | 0588 | 88E0 | FFC7 | 05A9 | 88E0 |
| 0000022620 | FFC7 | CA14 | 05AB | AB50 | FFC7 | 03AB | 0BEB | D9B7 |
| 0000022640 | 058B | 88E0 | FFC7 | C00A | 0550 | 05AB | AB50 | FFC7 |
| 0000022660 | 03AB | 0BEB | DA1B | 058B | 88E0 | FFC7 | 05AB | 88E0 |
| 0000022700 | FFC7 | CB05 | 4529 | 0589 | AB00 | FFC7 | C012 | 05A9 |
| 0000022720 | AB00 | FFC7 | 1489 | C80D | 05A9 | AB50 | FFC7 | 03A9 |
| 0000022740 | 0BE9 | DD3B | 0589 | 88E0 | FFC7 | 456B | 058B | AB00 |
| 0000022760 | FFC7 | 05AB | 8980 | FFC7 | 03AB | 102B | 058B | 8980 |
| 0000023000 | FFC7 | 05AB | 8980 | FFC7 | CA04 | 07A9 | 6D30 | FFD2 |
| 0000023020 | C001 | 4529 | 0789 | 54D0 | FFC9 | 4D68 | CA02 | 4529 |
| 0000023040 | C003 | 07A9 | 6D30 | FFD2 | 0789 | 54B0 | FFC9 | 4529 |
| 0000023060 | 0589 | 88F0 | FFC7 | 18AB | 058B | 88D0 | FFC7 | 1829 |
| 0000023100 | 0543 | 0589 | 88B0 | FFC7 | 4529 | 0550 | 812D | 05AB |
| 0000023120 | 8990 | FFC7 | 4969 | C972 | 85AB | 24AB | 0B2B | 8AE0 |
| 0000023140 | FFC7 | 4529 | 832B | 85AB | 102B | 816D | 05A9 | 8990 |
| 0000023160 | FFC7 | 492B | C8F1 | C062 | 07C0 | 54D0 | FFC9 | 07F0 |
| 0000023200 | FFC7 | 0D5F | D9F0 | FFC1 | 0D5F | 53F0 | FFC1 | A3CF |
| 0000023220 | 09EB | 3B80 | FFC9 | 936E | 0550 | 05A9 | 8910 | FFC7 |
| 0000023240 | 932E | 05AB | 8900 | FFC7 | 936E | 0D5F | B470 | FFC1 |
| 0000023260 | A3CF | 456B | 936E | 0D5F | 6C20 | FFC1 | 0550 | 05A9 |
| 0000023300 | 8980 | FFC7 | 03A9 | 1029 | 0589 | 8980 | FFC7 | 05A9 |
| 0000023320 | 8980 | FFC7 | CA03 | 07AB | 6D30 | FFD2 | 078B | 54D0 |
| 0000023340 | FFC9 | 4D28 | CA02 | 4529 | C003 | 07A9 | 6D30 | FFD2 |
| 0000023360 | 0789 | 54B0 | FFC9 | 1829 | 0543 | 0589 | 88B0 | FFC7 |
| 0000023400 | 0550 | 05C0 | AB50 | FFC7 | 88E0 | FFC7 | 4529 | 0589 |
| 0000023420 | 88F0 | FFC7 | 18AB | 058B | 88D0 | FFC7 | C00F | 182B |
| 0000023440 | 078B | AB30 | FFC7 | C00A | 0542 | 05A8 | 88C0 | FFC7 |
| 0000023460 | CA00 | FEC9 | 1428 | CAA0 | 1428 | CAF1 | 184B | 0542 |
| 0000023500 | 058B | 88C0 | FFC7 | 160E | 09AF | 2A00 | 0960 | 098F |
| 0000023520 | 0054 | 4DCD | 0B0E | 0030 | 456B | 0570 | 816D | 0550 |
| 0000023540 | 05A9 | 8990 | FFC7 | 1429 | B12D | 0010 | B16D | 0020 |
| 0000023560 | 0570 | B5A9 | 0010 | 492B | C712 | B5AB | 0020 | 24AB |
| 0000023600 | 07A9 | AAE0 | FFC7 | 412B | 4529 | 832B | B5AB | 0020 |
| 0000023620 | 102B | B16D | 0020 | B5A9 | 0010 | 492B | C6EE | 4529 |
| 0000023640 | 0589 | AB50 | FFC7 | 0589 | 3B80 | FFC9 | A3CF | B5AB |
| 0000023660 | 0010 | 936E | 85AB | 936E | 0D5F | 57D0 | FFC1 | 4D28 |
| 0000023700 | 0BEE | FFCF | 09AF | 2A00 | 0960 | 098F | 0054 | 4DCD |
| 0000023720 | 0B0E | 00C0 | 0570 | B5AB | FFE0 | 07A9 | 6C00 | FFD2 |
| 0000023740 | 5D2B | 24AB | 07A9 | 6D30 | FFD2 | 2449 | 4169 | B32D |
| 0000023760 | 0030 | B5AB | FFC0 | B5A9 | FFE0 | 452B | 102B | 24AB |
| 0000024000 | 142B | 07A9 | 6C00 | FFD2 | 5D2B | B7A9 | 0030 | 412B |
| 0000024020 | 07A9 | 6BE0 | FFD2 | 412B | 160B | B36D | 0010 | A3CF |
| 0000024040 | 936E | 0D5F | 0260 | FFC2 | A3CF | D3AE | 0030 | 4D09 |
| 0000024060 | 0D5F | 0260 | FFC2 | 4909 | CA7B | 0570 | B5A9 | FFE0 |
| 0000024100 | B5AB | FFC0 | 4969 | CB5A | 4529 | B12D | 0070 | B12D |
| 0000024120 | 0060 | B7AB | 0030 | 078B | AB10 | FFC7 | B36D | 0080 |
| 0000024140 | 07A9 | 6BE0 | FFD2 | 4169 | 1609 | B32D | 00A0 | 4529 |
| 0000024160 | B12D | 0050 | A3CF | D3AE | 0080 | 0D5F | 0260 | FFC2 |
| 0000024200 | 0570 | B5AB | 0060 | 4168 | B10D | 0060 | B7AB | 0080 |

THU MAR 14 17:37:32 1991 GSPMON.4 PAGE 12, LINE 650

| | | | | | | | | |
|---|---|---|---|---|---|---|---|---|
| 0000024220 | 07A9 | 6C00 | FFD2 | 412B | B36D | 0080 | A3CF | D3AE |
| 0000024240 | 00A0 | 0D5F | 0260 | FFC2 | 0570 | B5A9 | 0070 | 4128 |
| 0000024260 | B10D | 0070 | B7A9 | 00A0 | 07AB | 6C00 | FFD2 | 4169 |
| 0000024300 | B32D | 00A0 | B5A9 | 0050 | 1029 | B12D | 0050 | 14D9 |
| 0000024320 | C4D1 | A3CF | 930E | B5A9 | 0060 | 932E | 0550 | 05A9 |
| 0000024340 | 89A0 | FFC7 | 1429 | 932E | 4529 | 932E | 0570 | B5A9 |
| 0000024360 | FFE0 | 932E | 0D5F | 6350 | FFC1 | C01A | 4169 | 2BE9 |
| 0000024400 | 812D | 85A9 | B5AB | FFE0 | 4969 | C406 | A3CF | 932E |
| 0000024420 | 936E | 0D5F | 57D0 | FFC1 | 0570 | B5AB | FFC0 | 492B |
| 0000024440 | C607 | A3CF | 936E | 1029 | 932E | 0D5F | 57D0 | FFC1 |
| 0000024460 | B7EE | 0080 | 09AF | 2A00 | 0962 | 098F | 0154 | 4DCD |
| 0000024500 | 0B0E | 0050 | 456B | 0570 | B16D | 0040 | B5AB | FF60 |
| 0000024520 | B5A9 | FF80 | 492B | CA79 | B5A9 | FFA0 | B5AB | FFC0 |
| 0000024540 | 4969 | C659 | 412B | 2BEB | 816D | 85AB | 102B | 24AB |
| 0000024560 | 0550 | 05A9 | 6D80 | FFD2 | 5F2B | 07A9 | AB10 | FFC7 |
| 0000024600 | 412B | 160B | B36D | 0010 | 456B | B16D | 0030 | A3CF |
| 0000024620 | D3AE | 0010 | 0D5F | 0260 | FFC2 | 0570 | B5AB | 0040 |
| 0000024640 | 4168 | B10D | 0040 | B7AB | 0010 | 07A9 | 6C00 | FFD2 |
| 0000024660 | 412B | B36D | 0010 | B5AB | 0030 | 102B | B16D | 0030 |
| 0000024700 | 140B | C4E5 | A3CF | 930E | B5AB | FF80 | 936E | 85AB |
| 0000024720 | 936E | B5AB | FFC0 | 936E | B5AB | FFE0 | 936E | 0D5F |
| 0000024740 | 6350 | FFC1 | 0570 | B5A9 | FFA0 | 85AB | 4969 | C62D |
| 0000024760 | A3CF | B5A9 | FF60 | 932E | B5A9 | 0040 | 932E | B5A9 |
| 0000025000 | FFA0 | 932E | 102B | 936E | B5AB | FFE0 | 936E | 0D5F |
| 0000025020 | 6350 | FFC1 | C01A | 0550 | 05A9 | AB50 | FFC7 | 1029 |
| 0000025040 | 0589 | AB50 | FFC7 | 0570 | B5A7 | FFE0 | 24A7 | 07AB |
| 0000025060 | AAE0 | FFC7 | 4167 | B5A9 | FFC0 | C603 | 182B | 632B |
| 0000025100 | C001 | 182B | 86E9 | 5569 | 8327 | B7EE | 00AD | 09AF |
| 0000025120 | 2A80 | 0962 | 098F | 0054 | 4DCD | 120E | 456B | 0550 |
| 0000025140 | 816D | 05A9 | 3B80 | FFC9 | 492B | C913 | A3CF | 0541 |
| 0000025160 | B5AB | FFE0 | 936E | 0550 | 85A9 | 932E | 0D5F | 6E60 |
| 0000025200 | FFC1 | 1029 | 0550 | 812D | 05AB | 3B80 | FFC9 | 4969 |
| 0000025220 | C8ED | B7EE | 0080 | 09AF | 2A00 | 0962 | 098F | 0154 |
| 0000025240 | 4DCD | 0B0E | 01D0 | 0550 | B5AB | FFE0 | 24AB | 0B2B |
| 0000025260 | 3BB0 | FFC9 | 0548 | B56B | 0010 | 07A9 | 8810 | FFC7 |
| 0000025300 | 5F2B | 0550 | B5A7 | FFE0 | 24A7 | 0B27 | 3BB0 | FFC9 |
| 0000025320 | 0548 | B4E7 | 0018 | 07A9 | 8830 | FFC7 | 5F27 | 40EB |
| 0000025340 | 836D | 0550 | B5A7 | FFE0 | 24A7 | 0B27 | 3BB0 | FFC9 |
| 0000025360 | 0548 | B4E7 | 0010 | 0550 | B0ED | 00A0 | B5A7 | FFE0 |
| 0000025400 | 24A7 | 0B27 | 3BB0 | FFC9 | 0548 | B4E7 | 0018 | 0550 |
| 0000025420 | B0ED | 00B0 | B36D | 0020 | 07A7 | 6D30 | FFD2 | 2447 |
| 0000025440 | 4167 | 82ED | 07AB | 6C00 | FFD2 | 6F67 | CA03 | 87A7 |
| 0000025460 | 1607 | 82ED | BBAD | 0000 | 0080 | 4D67 | 24A7 | 4567 |
| 0000025500 | 87A9 | 4127 | B2ED | 0040 | 05A7 | 6D80 | FFD2 | 24A7 |
| 0000025520 | 4127 | B2ED | 0060 | B5A7 | 00A0 | CA0D | 1427 | 24A7 |
| 0000025540 | 07A9 | AAE0 | FFC7 | 4127 | 1829 | B5AB | 00B0 | 6369 |
| 0000025560 | 86E7 | 5127 | CB2E | 456B | B16D | 00C0 | A3CF | D3AE |
| 0000025600 | 0000 | 0D5F | 0260 | FFC2 | A3CF | D3AE | 0060 | 4D0B |
| 0000025620 | 0D5F | 0260 | FFC2 | 490B | CB18 | 87AB | 07A9 | 6C00 |
| 0000025640 | FFD2 | 412B | 836D | B7A7 | 0080 | 4127 | B2ED | 0080 |
| 0000025660 | B7A7 | 0060 | 4127 | B2ED | 0060 | 0550 | B5A7 | 00C0 |
| 0000025700 | 1027 | B0ED | 00C0 | 1407 | C8D9 | BDAD | 00C0 | 00E0 |
| 0000025720 | C003 | 4529 | AD2D | 00E0 | BBAD | 0040 | 0000 | 0550 |
| 0000025740 | 05AB | 6D80 | FFD2 | 24AB | 87A9 | 412B | B36D | 0060 |
| 0000025760 | B5A7 | 00A0 | 17E7 | CA0F | B5A7 | 00A0 | 1027 | 24A7 |
| 0000026000 | 07A9 | AAE0 | FFC7 | 4127 | 182B | B5A9 | 00B0 | 632B |
| 0000026020 | 86E7 | 5167 | CB31 | 180B | B16D | 00C0 | 0548 | B5A9 |
| 0000026040 | 00E0 | 492B | C225 | A3CF | D3AE | 0000 | 0D5F | 0260 |
| 0000026060 | FFC2 | A3CF | D3AE | 0060 | 4D0B | 0D5F | 0260 | FFC2 |

THU MAR 14 17:37:32 1991 GSPMON.4 PAGE 13, LINE 709

| | | | | | | | | |
|---|---|---|---|---|---|---|---|---|
| 0000026100 | 490B | CB16 | 87AB | 07A9 | 6C00 | FFD2 | 452B | 836D |
| 0000026120 | B7A7 | 0060 | 4527 | B2ED | 0060 | 0550 | B5A7 | 00C0 |
| 0000026140 | 1427 | B0ED | 00C0 | 0548 | B5AB | 00E0 | 4967 | C3DB |
| 0000026160 | BDAD | 00C0 | 00F0 | C003 | 180B | AD6D | 00F0 | 0550 |
| 0000026200 | 05AB | 6D80 | FFD2 | 24AB | 2F4B | B16D | 01C0 | 190B |
| 0000026220 | B16D | 01B0 | B5A9 | 01C0 | 2489 | B12D | 01A0 | 4529 |
| 0000026240 | B12D | 00D0 | B12D | 0120 | B5AB | 00D0 | 248B | 41AB |
| 0000026260 | 4529 | B12B | 0130 | BBAD | 0080 | 0180 | 0548 | B5AB |
| 0000026300 | 00E0 | 0550 | B16D | 00C0 | 0548 | B5A7 | 00F0 | 48EB |
| 0000026320 | C323 | 0550 | B5AB | 00D0 | 248B | 41AB | A3CF | D3AE |
| 0000026340 | 0180 | 0D5F | 0260 | FFC2 | 0550 | B569 | 0130 | 4109 |
| 0000026360 | B12B | 0130 | B7AB | 0180 | 07A9 | 6C00 | FFD2 | 412B |
| 0000026400 | B36D | 0180 | B5A7 | 00C0 | 1027 | B0ED | 00C0 | 0548 |
| 0000026420 | B5AB | 00F0 | 4967 | C2DD | B7AB | 0080 | 0550 | B5A9 |
| 0000026440 | 01A0 | 412B | B36D | 0080 | B5A7 | 00D0 | CA16 | 2487 |
| 0000026460 | 41A7 | B5A9 | 00D0 | 1429 | 2489 | 41A9 | B4E7 | 0130 |
| 0000026500 | B529 | 0130 | 4927 | CB02 | 4529 | C001 | 1829 | B5A7 |
| 0000026520 | 0120 | 2427 | 4127 | B0ED | 0120 | B5A9 | 00D0 | 1029 |
| 0000026540 | B12D | 00D0 | 1489 | C2A0 | B5A9 | 0120 | 2469 | 0B29 |
| 0000026560 | 5540 | FFC9 | 0548 | 8529 | CA13 | 0550 | B5A9 | 00B0 |
| 0000026600 | CA13 | B5A7 | 00A0 | 24A7 | 07A9 | AAE0 | FFC7 | 4127 |
| 0000026620 | B5AB | 00B0 | 1829 | 142B | 6369 | 86EB | 512B | CA04 |
| 0000026640 | 456B | AD6D | 0100 | C00E | B5AB | 0120 | 246B | 0B2B |
| 0000026660 | 5540 | FFC9 | 0548 | 856B | 0550 | B5A9 | 01B0 | 5F2B |
| 0000026700 | AD6D | 0100 | 0550 | B5AB | 0120 | 246B | 0B2B | 55C0 |
| 0000026720 | FFC9 | 0548 | 856B | CB18 | 0550 | B5AB | 00B0 | 17EB |
| 0000026740 | CA13 | B5AB | 00A0 | 24AB | 07A9 | AAE0 | FFC7 | 412B |
| 0000026760 | B5A7 | 00B0 | 1829 | 1027 | 62E9 | 876B | 512B | CB04 |
| 0000027000 | 188B | AD6D | 0110 | C026 | 0550 | B5AB | 00B0 | 17EB |
| 0000027020 | CA0F | B5AB | 00A0 | 24AB | 07A9 | AAE0 | FFC7 | 412B |
| 0000027040 | B5A7 | 00B0 | 1829 | 1027 | 62E9 | 876B | 512B | CB0F |
| 0000027060 | B5AB | 0120 | 246B | 0B2B | 55C0 | FFC9 | 0548 | 856B |
| 0000027100 | 0550 | B5A9 | 01B0 | 5F2B | AD6D | 0110 | C003 | 180B |
| 0000027120 | AD6D | 0110 | 0541 | B5AB | FFC0 | CA0E | 0550 | B5A9 |
| 0000027140 | 00A0 | 24A9 | 0B29 | 8AE0 | FFC7 | 1827 | B5AB | 00B0 |
| 0000027160 | 6367 | 8729 | 50E9 | CB37 | 0550 | B5AB | 00A0 | 254B |
| 0000027200 | 0B2B | 0810 | FFC7 | B5A9 | 00B0 | 24A9 | 412B | BDAB |
| 0000027220 | 00E0 | 0000 | B5AB | 00A0 | 254B | 0B2B | 0810 | FFC7 |
| 0000027240 | B5A9 | 00B0 | 24A9 | 412B | BDAB | 00F0 | 0008 | B5AB |
| 0000027260 | 00A0 | 254B | 0B2B | 0810 | FFC7 | B5A9 | 00B0 | 24A9 |
| 0000027300 | 412B | BDAB | 0100 | 0010 | B5AB | 00A0 | 254B | 0B2B |
| 0000027320 | 0810 | FFC7 | B5A9 | 00B0 | 24A9 | 412B | BDAB | 0110 |
| 0000027340 | 0018 | C000 | 00B2 | B5A9 | 00A0 | 2549 | 0B29 | 0810 |
| 0000027360 | FFC7 | 24AB | 4169 | B5AB | 00A0 | 254B | 0B2B | 0810 |
| 0000027400 | FFC7 | B5A7 | 00B0 | 24A7 | 40EB | 0548 | 856B | B5A7 |
| 0000027420 | 00E0 | 48EB | C30E | 0550 | B5AB | 00A0 | 254B | 0B2B |
| 0000027440 | 0810 | FFC7 | B5A7 | 00B0 | 24A7 | 40EB | 0548 | 856B |
| 0000027460 | C001 | 4CEB | 8D69 | 0550 | B5AB | 00A0 | 254B | 0B2B |
| 0000027500 | 0810 | FFC7 | B5A9 | 00B0 | 24A9 | 412B | B5A9 | 00A0 |
| 0000027520 | 2549 | 0B29 | 0810 | FFC7 | B5A7 | 00B0 | 24A7 | 40E9 |
| 0000027540 | 0548 | B529 | 0008 | B5A7 | 00F0 | 48E9 | C80F | 0550 |
| 0000027560 | B5A9 | 00A0 | 2549 | 0B29 | 0810 | FFC7 | B5A7 | 00B0 |
| 0000027600 | 24A7 | 40E9 | 0548 | B529 | 0008 | C001 | 4CE9 | AD2B |
| 0000027620 | 0008 | 0550 | B5AB | 00A0 | 254B | 0B2B | 0810 | FFC7 |
| 0000027640 | B5A9 | 00B0 | 24A9 | 412B | B5A9 | 00A0 | 2549 | 0B29 |
| 0000027660 | 0810 | FFC7 | B5A7 | 00B0 | 24A7 | 40E9 | 0548 | B529 |
| 0000027700 | 0010 | B5A7 | 0100 | 48E9 | C30F | 0550 | B5A9 | 00A0 |
| 0000027720 | 2549 | 0B29 | 0810 | FFC7 | B5A7 | 00B0 | 24A7 | 40E9 |
| 0000027740 | 0548 | B529 | 0010 | C001 | 4CE9 | AD2B | 0010 | 0550 |

THU MAR 14 17:37:32 1991 GSPMON.4 PAGE 14, LINE 768

| | | | | | | | | |
|---|---|---|---|---|---|---|---|---|
| 0000027760 | B5AB | 00A0 | 254B | 0B2B | 0810 | FFC7 | B5A9 | 00B0 |
| 0000030000 | 24A9 | 412B | B5A9 | 00A0 | 2549 | 0B29 | 0810 | FFC7 |
| 0000030020 | B5A7 | 00B0 | 24A7 | 40E9 | 0548 | B529 | 0018 | B5A7 |
| 0000030040 | 0110 | 48E9 | C80F | 0550 | B5A9 | 00A0 | 2549 | 0B29 |
| 0000030060 | 0810 | FFC7 | B5A7 | 00B0 | 24A7 | 40E9 | 0548 | B529 |
| 0000030100 | 0018 | C001 | 4CE9 | AD2B | 0018 | B7EE | 00A0 | 09AF |
| 0000030120 | 2A80 | 0962 | 098F | 0154 | 4DCD | 100E | 0550 | 05AB |
| 0000030140 | 8990 | FFC7 | 142B | 816D | 456B | B16D | 0010 | 0570 |
| 0000030160 | 85A9 | 492B | C719 | B5AB | 0010 | 24AB | 07A9 | AAE0 |
| 0000030200 | FFC7 | 412B | B5A7 | 0010 | 24A7 | 0B27 | 8AE0 | FFC7 |
| 0000030220 | 8769 | 86E7 | 54E9 | 832B | B5AB | 0010 | 102B | B16D |
| 0000030240 | 0010 | 85A9 | 492B | C6E7 | 140E | 09AF | 2A80 | 0960 |
| 0000030260 | 098F | 0154 | 4DCD | 0B0E | 0840 | 456B | 0550 | 816D |
| 0000030300 | 05A9 | 8990 | FFC7 | 492B | C91A | 85AB | 24AB | 0B2B |
| 0000030320 | 92E0 | FFC7 | 85A9 | 24A9 | 0B29 | 96E0 | FFC7 | 876B |
| 0000030340 | 8729 | 512B | 85A9 | 24A9 | 41A9 | B369 | 0040 | 85AB |
| 0000030360 | 102B | 816D | 05A9 | 8990 | FFC7 | 492B | C8E6 | 05AB |
| 0000030400 | AB00 | FFC7 | 146B | C21A | 456B | 816D | 492B | C916 |
| 0000030420 | 85AB | 24AB | 41AB | 85A9 | 24A9 | 0B29 | 9EE0 | FFC7 |
| 0000030440 | B767 | 0040 | 8729 | 5127 | B2EB | 0040 | 85AB | 102B |
| 0000030460 | 816D | 05A9 | 8990 | FFC7 | 492B | C8EA | 05AB | AB00 |
| 0000030500 | FFC7 | 144B | C21E | 456B | 816D | 492B | C91A | 85AB |
| 0000030520 | 24AB | 0B2B | 9AE0 | FFC7 | 85A9 | 24A9 | 0B29 | 96E0 |
| 0000030540 | FFC7 | 876B | 8729 | 512B | 85A9 | 24A9 | 41A9 | B369 |
| 0000030560 | 0440 | 85AB | 102B | 816D | 05A9 | 8990 | FFC7 | 492B |
| 0000030600 | C8E6 | 05AB | AB00 | FFC7 | 146B | C21A | 456B | 816D |
| 0000030620 | 492B | C916 | 85AB | 24AB | 41AB | 85A9 | 24A9 | 0B29 |
| 0000030640 | 9EE0 | FFC7 | B767 | 0440 | 8729 | 5127 | B2EB | 0440 |
| 0000030660 | 85AB | 102B | 816D | 05A9 | 8990 | FFC7 | 492B | C8EA |
| 0000030700 | 05AB | AB00 | FFC7 | 144B | C21E | 456B | 816D | 492B |
| 0000030720 | C931 | 85AB | 24AB | 41AB | 85A9 | 24A9 | 41A9 | B76B |
| 0000030740 | 0040 | B729 | 0440 | 552B | 85A9 | 24A9 | B7A7 | FFC0 |
| 0000030760 | 40E9 | 8369 | 85AB | 102B | 816D | 05A9 | 8990 | FFC7 |
| 0000031000 | 492B | C8E7 | C017 | 456B | 816D | 492B | C913 | 85AB |
| 0000031020 | 24AB | B7A9 | FFC0 | 412B | 85A7 | 24A7 | 41A7 | BAEB |
| 0000031040 | 0040 | 0000 | 85AB | 102B | 816D | 05A7 | 8990 | FFC7 |
| 0000031060 | 48EB | C8ED | 4529 | 812D | B7AB | FFA0 | 812B | 05A7 |
| 0000031100 | 8990 | FFC7 | 48E9 | C930 | 85AB | 24AB | B7A9 | FFC0 |
| 0000031120 | 412B | 876B | B36D | 0020 | CA1F | 44E7 | B0ED | 0010 |
| 0000031140 | 05A9 | 89A0 | FFC7 | 4927 | C917 | B7AB | 0020 | 1FEB |
| 0000031160 | CA05 | B7A9 | FFA0 | 1209 | B32D | FFA0 | 2FEB | B36D |
| 0000031200 | 0020 | 0550 | B5A9 | 0010 | 1029 | B12D | 0010 | 05A7 |
| 0000031220 | 89A0 | FFC7 | 48E9 | C8E9 | 85A9 | 1029 | 812D | 05A7 |
| 0000031240 | 8990 | FFC7 | 48E9 | C8D0 | BBAD | FFC0 | FFE0 | B7AB |
| 0000031260 | FFA0 | 8569 | CA02 | 4508 | C04D | 05A9 | AB60 | FFC7 |
| 0000031300 | CB04 | 09E8 | FFFF | 0000 | C045 | 456B | 816D | 48EB |
| 0000031320 | C936 | 05AB | AB60 | FFC7 | 142B | 254B | 0B2B | 92E0 |
| 0000031340 | FFC7 | 85A9 | 24A9 | 412B | 876B | B36D | 0020 | CA1F |
| 0000031360 | 4529 | B12D | 0010 | 05A7 | 89A0 | FFC7 | 48E9 | C917 |
| 0000031400 | B7AB | 0020 | 1FEB | CA05 | B7A9 | FFA0 | 1209 | B32D |
| 0000031420 | FFA0 | 2FEB | B36D | 0020 | 0550 | B5A9 | 0010 | 1029 |
| 0000031440 | B12D | 0010 | 05A7 | 89A0 | FFC7 | 48E9 | C8E9 | 85A9 |
| 0000031460 | 1029 | 812D | 05A7 | 8990 | FFC7 | 48E9 | C8CA | 05AB |
| 0000031500 | AB60 | FFC7 | 142B | 254B | 0B2B | 92E0 | FFC7 | B36D |
| 0000031520 | FFE0 | 4508 | B7EE | 00A0 | 09AF | 2A80 | 0962 | 098F |
| 0000031540 | 0554 | 4DCD | 0B0E | 0080 | 456B | 0550 | 816D | 058B |
| 0000031560 | 5650 | FFC9 | 058B | 5640 | FFC9 | 05A9 | 8990 | FFC7 |
| 0000031600 | 492B | C900 | 0110 | 85AB | 24AB | 07A9 | AAE0 | FFC7 |
| 0000031620 | 412B | BB6D | 0000 | 0040 | 85AB | 24AB | 0B2B | A2E0 |

THU MAR 14 17:37:32 1991 GSPMON.4 PAGE 15, LINE 827

| | | | | | | | | |
|---|---|---|---|---|---|---|---|---|
| 0000031640 | FFC7 | BB6D | 0000 | 0060 | B7AB | 0040 | CA00 | 00E6 |
| 0000031660 | 456B | B16D | 0010 | B7A9 | 0040 | CA00 | 00DF | 05A9 |
| 0000031700 | 5640 | FFC9 | 0B49 | FF9B | C900 | 00D8 | 05A9 | 5650 |
| 0000031720 | FFC9 | 0B49 | FF9B | C900 | 00D1 | B7AB | 0040 | 1FEB |
| 0000031740 | CA00 | 00AB | B7A9 | 0060 | 1FE9 | CA54 | 0550 | 85A9 |
| 0000031760 | 24A9 | 1209 | B12D | 0020 | B5A9 | 0010 | 24A9 | 1209 |
| 0000032000 | B12D | 0030 | A3CF | 0570 | B5A9 | FFE0 | 0550 | B5A7 |
| 0000032020 | 0030 | 44E9 | 932E | 0D5F | 6C40 | FFC6 | A3CF | 0570 |
| 0000032040 | B5A9 | FFC0 | 0550 | B5A7 | 0020 | 44E9 | 932E | 4D09 |
| 0000032060 | 0D5F | 6C40 | FFC6 | 4109 | 0550 | 05A7 | 5640 | FFC9 |
| 0000032100 | 4CEB | 24A7 | 248B | 4167 | 0B27 | 5660 | FFC9 | 8127 |
| 0000032120 | 05AB | 5640 | FFC9 | 4D69 | 24AB | 2489 | 412B | 0B2B |
| 0000032140 | 5660 | FFC9 | B9AB | 0000 | 0010 | 05AB | 5640 | FFC9 |
| 0000032160 | 4D69 | 24AB | 2489 | 412B | 0B2B | 5660 | FFC9 | B9AB |
| 0000032200 | 0010 | 0020 | 05AB | 5640 | FFC9 | 102B | 058B | 5640 |
| 0000032220 | FFC9 | C053 | 0550 | 85A7 | 24A7 | 1207 | B0ED | 0020 |
| 0000032240 | B5A7 | 0010 | 24A7 | 1207 | B0ED | 0030 | A3CF | 0570 |
| 0000032260 | B5A7 | FFE0 | 0550 | B5A9 | 0030 | 4527 | 92EE | 0D5F |
| 0000032300 | 6C40 | FFC6 | A3CF | 0570 | B5A7 | FFC0 | 0550 | B5A9 |
| 0000032320 | 0020 | 4527 | 92EE | 4D07 | 0D5F | 6C40 | FFC6 | 4107 |
| 0000032340 | 0550 | 05A9 | 5650 | FFC9 | 4D2B | 24A9 | 248B | 4169 |
| 0000032360 | 0B29 | 6920 | FFC9 | 80E9 | 05AB | 5650 | FFC9 | 4D69 |
| 0000032400 | 24AB | 2489 | 412B | 0B2B | 6920 | FFC9 | B9AB | 0000 |
| 0000032420 | 0010 | 05AB | 5650 | FFC9 | 4D69 | 24AB | 2489 | 412B |
| 0000032440 | 0B2B | 6920 | FFC9 | B9AB | 0010 | 0020 | 05AB | 5650 |
| 0000032460 | FFC9 | 102B | 058B | 5650 | FFC9 | B7AB | 0040 | 2FEB |
| 0000032500 | B36D | 0040 | B7A9 | 0060 | 2FE9 | B32D | 0060 | 0550 |
| 0000032520 | B5A7 | 0010 | 1027 | B0ED | 0010 | 1407 | C90F | 4D67 |
| 0000032540 | CA0D | 05A7 | 5640 | FFC9 | 0B47 | FF9B | C907 | 05A9 |
| 0000032560 | 5650 | FFC9 | 0B49 | FF9B | C800 | FF2F | 85AB | 102B |
| 0000032600 | 816D | 05A9 | 8990 | FFC7 | 492B | C90D | 05A7 | 5640 |
| 0000032620 | FFC9 | 0B47 | FF9B | C907 | 05AB | 5650 | FFC9 | 0B4B |
| 0000032640 | FF9B | C800 | FEF0 | 05AB | 5640 | FFC9 | CA61 | A3CF |
| 0000032660 | 09E7 | D640 | FFC1 | 92EE | 18C7 | 92EE | 936E | 09E7 |
| 0000032700 | 5660 | FFC9 | 92EE | 0D5F | 9CC0 | FFC6 | 456B | 0550 |
| 0000032720 | 816D | 05A9 | 5640 | FFC9 | 492B | C94A | B7AB | FFA0 |
| 0000032740 | 85A9 | 24A9 | 4169 | 85A7 | 4CEB | 24A7 | 248B | 4167 |
| 0000032760 | 0B27 | 5660 | FFC9 | BCE9 | 0010 | 0040 | B7AB | FFA0 |
| 0000033000 | 85A9 | 24A9 | 4169 | 85A7 | 4CEB | 24A7 | 248B | 4167 |
| 0000033020 | 0B27 | 5660 | FFC9 | BCE9 | 0020 | 0048 | 85AB | 4D69 |
| 0000033040 | 24AB | 2489 | 412B | 0B2B | 5660 | FFC9 | B56B | 0010 |
| 0000033060 | 254B | 0B2B | AB80 | FFC7 | 85A9 | 4D27 | 24A9 | 2487 |
| 0000033100 | 40E9 | 0B29 | 5660 | FFC9 | B529 | 0020 | 24A9 | 412B |
| 0000033120 | B7A9 | FFA0 | 85A7 | 24A7 | 4127 | B967 | 0000 | 0030 |
| 0000033140 | 85AB | 102B | 816D | 05A7 | 5640 | FFC9 | 48EB | C8B6 |
| 0000033160 | 05AB | 5650 | FFC9 | CA6D | A3CF | 09E9 | D640 | FFC1 |
| 0000033200 | 932E | 18C7 | 92EE | 936E | 09E7 | 6920 | FFC9 | 92EE |
| 0000033220 | 0D5F | 9CC0 | FFC6 | 456B | 0550 | 816D | 05A7 | 5650 |
| 0000033240 | FFC9 | 48EB | C956 | B7AB | FFA0 | 85A9 | 05A7 | 5640 |
| 0000033260 | FFC9 | 40E9 | 24A9 | 4169 | 85AB | 4D67 | 24AB | 2487 |
| 0000033300 | 40EB | 0B2B | 6920 | FFC9 | BD69 | 0010 | 0040 | B7AB |
| 0000033320 | FFA0 | 85A9 | 05A7 | 5640 | FFC9 | 40E9 | 24A9 | 4169 |
| 0000033340 | 85AB | 4D67 | 24AB | 2487 | 40EB | 0B2B | 6920 | FFC9 |
| 0000033360 | BD69 | 0020 | 0048 | B7AB | FFA0 | 85A9 | 05A7 | 5640 |
| 0000033400 | FFC9 | 40E9 | 24A9 | 4169 | 85A5 | 4CAB | 24A5 | 248B |
| 0000033420 | 4165 | 0B25 | 6920 | FFC9 | B4AB | 0010 | 254B | 0B2B |
| 0000033440 | AB80 | FFC7 | 85A5 | 4CA7 | 24A5 | 2487 | 40E5 | 0B25 |
| 0000033460 | 6920 | FFC9 | B4A7 | 0020 | 24A7 | 40EB | B969 | 0000 |
| 0000033500 | 0030 | 85AB | 102B | 816D | 05A9 | 5650 | FFC9 | 492B |

THU MAR 14 17:37:32 1991 GSPMON.4 PAGE 16, LINE 886

| | | | | | | | | |
|---|---|---|---|---|---|---|---|---|
| 0000033520 | C8AA | B7AB | FFA0 | 05A9 | 5640 | FFC9 | 05A7 | 5650 |
| 0000033540 | FFC9 | 40E9 | 812B | 0529 | 0589 | AB50 | FFC7 | B9AB |
| 0000033560 | FFE0 | 0010 | B9AB | FFC0 | 0020 | 05A5 | 5640 | FFC9 |
| 0000033600 | 40E5 | CB04 | 09E8 | FFFF | 0000 | C001 | 4508 | B7EE |
| 0000033620 | 00C0 | 09AF | 2AA0 | 0962 | 098F | 0054 | 4DCD | B7AB |
| 0000033640 | FFE0 | B7A9 | FFC0 | 0550 | 856B | 8529 | 492B | C202 |
| 0000033660 | 1828 | C0DC | B7AB | FFE0 | B7A9 | FFC0 | 856B | 8529 |
| 0000033700 | 492B | C903 | 09C8 | FFFF | C001 | 4508 | B7EE | 0080 |
| 0000033720 | 09AF | 2A00 | 0962 | 098F | 0054 | 4DCD | 0D5F | 0500 |
| 0000033740 | FFC1 | B7AB | FFC0 | 09E9 | 88F0 | FFC7 | B32B | 0020 |
| 0000033760 | 09E9 | 88D0 | FFC7 | 832B | 09E9 | 8900 | FFC7 | B32B |
| 0000034000 | 0040 | 4508 | B7EE | 0080 | 09AF | 2A00 | 0962 | 098F |
| 0000034020 | 0154 | 4DCD | 0B0E | 0080 | 09CB | FFFF | B36D | 0060 |
| 0000034040 | 0550 | 05A9 | 8930 | FFC7 | 05A7 | 8AA0 | FFC7 | 44E9 |
| 0000034060 | 09C7 | 0032 | 5EE9 | 09C7 | 0064 | 5AE9 | 0589 | 8A30 |
| 0000034100 | FFC7 | 05A9 | 8940 | FFC7 | 05A7 | 8AB0 | FFC7 | 44E9 |
| 0000034120 | 09C7 | 0032 | 5EE9 | 09C7 | 0064 | 5AE9 | 0589 | 8A40 |
| 0000034140 | FFC7 | 05A9 | 8950 | FFC7 | 05A7 | 8AC0 | FFC7 | 44E9 |
| 0000034160 | 09C7 | 0032 | 5EE9 | 09C7 | 0064 | 5AE9 | 0589 | 8A50 |
| 0000034200 | FFC7 | 05A9 | 8960 | FFC7 | 05A7 | 8AD0 | FFC7 | 44E9 |
| 0000034220 | 09C7 | 0032 | 5EE9 | 09C7 | 0064 | 5AE9 | 0589 | 8A60 |
| 0000034240 | FFC7 | 05A9 | 8900 | FFC7 | 05A7 | 8A30 | FFC7 | 44E9 |
| 0000034260 | 0509 | CE06 | 05A9 | 8900 | FFC7 | 44E9 | 0509 | C001 |
| 0000034300 | 4529 | B12D | 0010 | 05A9 | 8900 | FFC7 | 05A7 | 8A40 |
| 0000034320 | FFC7 | 40E9 | 05A7 | 6D60 | FFD2 | 4927 | C207 | 05A7 |
| 0000034340 | 8900 | FFC7 | 05A9 | 8A40 | FFC7 | 4127 | B0ED | 0020 |
| 0000034360 | 05A9 | 8910 | FFC7 | 05A7 | 8A50 | FFC7 | 44E9 | 0509 |
| 0000034400 | 4D29 | C702 | 4529 | C005 | 05A9 | 8910 | FFC7 | 44E9 |
| 0000034420 | 0509 | B12D | 0030 | 05A9 | 8910 | FFC7 | 05A7 | 8A60 |
| 0000034440 | FFC7 | 40E9 | 05A7 | 6D70 | FFD2 | 4927 | C207 | 05A7 |
| 0000034460 | 8910 | FFC7 | 05A9 | 8A60 | FFC7 | 4127 | B0ED | 0040 |
| 0000034500 | B5A9 | 0010 | 2F69 | B12D | 0010 | B5A7 | 0020 | 2F67 |
| 0000034520 | B0ED | 0020 | B5A7 | 0030 | 2F67 | B0ED | 0030 | B5A7 |
| 0000034540 | 0040 | 2F67 | B0ED | 0040 | B36D | 0060 | B5A7 | 0020 |
| 0000034560 | 44E9 | 13E9 | B12D | 0050 | B5A9 | 0050 | CA01 | 632B |
| 0000034600 | B36D | 0060 | 17E7 | CA04 | B5A7 | 0020 | 17E7 | 66EB |
| 0000034620 | B36D | 0060 | 44E7 | 80ED | B5A9 | 0030 | 4927 | C90E |
| 0000034640 | 85AB | 24AB | 0B2B | A2E0 | FFC7 | 4529 | 832B | 85AB |
| 0000034660 | 102B | 816D | B5A7 | 0030 | 48EB | C8F2 | B9AD | 0030 |
| 0000034700 | 0000 | 85AB | B5A9 | 0040 | 492B | C30F | 85AB | 24AB |
| 0000034720 | 0B2B | A2E0 | FFC7 | BBAB | 0060 | 0000 | 85AB | 102B |
| 0000034740 | 816D | B5A9 | 0040 | 492B | C2F1 | 05A7 | 8990 | FFC7 |
| 0000034760 | 1029 | 48E9 | C916 | B5A9 | 0040 | 1029 | 812D | 85AB |
| 0000035000 | 48EB | C90F | 85AB | 24AB | 0B2B | A2E0 | FFC7 | 4529 |
| 0000035020 | 832B | 85AB | 102B | 816D | 05A7 | 8990 | FFC7 | 48EB |
| 0000035040 | C8F1 | 0BEE | FF7F | 09AF | 2A80 | 0960 | 0550 | 05C0 |
| 0000035060 | 8930 | FFC7 | 8AA0 | FFC7 | 05C0 | 8940 | FFC7 | 8AB0 |
| 0000035100 | FFC7 | 05C0 | 8950 | FFC7 | 8AC0 | FFC7 | 05C0 | 8960 |
| 0000035120 | FFC7 | 8AD0 | FFC7 | 0960 | 098F | 0054 | 4DCD | 120E |
| 0000035140 | A3CF | 09EB | 00B0 | C000 | 936E | 0D5F | B070 | FFC6 |
| 0000035160 | 0550 | 810D | A3CF | 456B | 936E | 0D5F | B500 | FFC6 |
| 0000035200 | A3CF | B7A9 | FFE0 | 0550 | 852B | 05A9 | 6D90 | FFD2 |
| 0000035220 | 5F2B | 936E | B7AB | FFE0 | D36E | 0080 | 0570 | B56B |
| 0000035240 | 0030 | 936E | B7AB | FFE0 | B56B | 0020 | 936E | B7AB |
| 0000035260 | FFE0 | 0550 | B56B | 0010 | 936E | B7AB | FFE0 | 856B |
| 0000035300 | 936E | 0D5F | AA50 | FFC6 | A3CF | 0550 | 85AB | 936E |
| 0000035320 | 0D5F | B500 | FFC6 | 4508 | B7EE | 0080 | 09AF | 2A00 |
| 0000035340 | 0962 | 098F | 0154 | 4DCD | 0B0E | 0070 | A3CF | 09EB |
| 0000035360 | 00B0 | C000 | 936E | 0D5F | B070 | FFC6 | 0550 | B10D |

THU MAR 14 17:37:32 1991 GSPMON.4 PAGE 17, LINE 945

| | | | | | | | | |
|---|---|---|---|---|---|---|---|---|
| 0000035400 | 0020 | A3CF | 456B | 936E | 0D5F | B500 | FFC6 | B7A9 |
| 0000035420 | FFE0 | 055C | B52B | 00A0 | 0B8B | FF00 | FFFF | B36D |
| 0000035440 | 0030 | 250B | B7A9 | 0030 | 552B | B36D | 003D | 260B |
| 0000035460 | B7A9 | 0030 | 552B | B36D | 0030 | A3CF | 936E | 0D5F |
| 0000035500 | AA20 | FFC6 | A3CF | 09C9 | 0400 | 932E | 4529 | 932E |
| 0000035520 | 0550 | 05A9 | 6D70 | FFD2 | 932E | 05AB | 6D60 | FFD2 |
| 0000035540 | 936E | 0D5F | B830 | FFC6 | A3CF | B7AB | FFE0 | 0570 |
| 0000035560 | B569 | 0030 | 0B09 | 0400 | 932E | B569 | 0020 | 932E |
| 0000035600 | 0550 | B569 | 0010 | 932E | 8569 | 932E | 8569 | 05AB |
| 0000035620 | 6D90 | FFD2 | 5F69 | 932E | B7A9 | FFE0 | D32E | 0080 |
| 0000035640 | 0D5F | B370 | FFC6 | A3CF | 0570 | B52B | 0050 | 0B0B |
| 0000035660 | 0400 | 936E | B52B | 0040 | 936E | 0550 | B52B | 0010 |
| 0000035700 | 936E | 852B | 936E | 852B | 05A9 | 6D90 | FFD2 | 5F2B |
| 0000035720 | 936E | B7AB | FFE0 | D36E | 0080 | 0D5F | B370 | FFC6 |
| 0000035740 | 0570 | B96D | 0060 | 0050 | B96D | 0070 | 0060 | A3CF |
| 0000035760 | 4529 | 932E | 0D5F | B500 | FFC6 | A3CF | 09C9 | FFFF |
| 0000036000 | 932E | 0D5F | AA20 | FFC6 | A3CF | 0570 | B567 | 0050 |
| 0000036020 | B5A9 | 0060 | 4127 | 0B07 | 0400 | 92EE | B567 | 0040 |
| 0000036040 | B5A9 | 0050 | 4127 | 0550 | 8569 | 2FE9 | 4527 | 92EE |
| 0000036060 | 1829 | 932E | 8567 | 92EE | 0D5F | B830 | FFC6 | A3CF |
| 0000036100 | 0570 | B567 | 0050 | B5A9 | 0060 | 4127 | 0550 | B569 |
| 0000036120 | 0010 | 2FE9 | 4527 | 0B07 | 0400 | 92EE | 0570 | B569 |
| 0000036140 | 0040 | B5A7 | 0050 | 40E9 | 932E | 0550 | B569 | 0010 |
| 0000036160 | 932E | 1829 | 932E | 0D5F | B830 | FFC6 | A3CF | 0550 |
| 0000036200 | B5A9 | 0020 | 932E | 0D5F | B500 | FFC6 | 4508 | B7EE |
| 0000036220 | 00A0 | 09AF | 2A80 | 0962 | 098F | 0154 | 4DCD | 07AB |
| 0000036240 | 7BE0 | FFC9 | CB19 | A3CF | B7A9 | FFE0 | 0550 | 8527 |
| 0000036260 | B529 | 0010 | 5F27 | 05A9 | 6D90 | FFD2 | 5F27 | 2FA7 |
| 0000036300 | 92EE | 0D5F | 81D0 | FFC6 | 0788 | 7BE0 | FFC9 | 4D07 |
| 0000036320 | CB03 | 09C8 | FFFF | C007 | B7AB | FFC0 | 07A9 | 7BE0 |
| 0000036340 | FFC9 | 832B | 4508 | B7EE | 00A0 | 09AF | 2A80 | 0962 |
| 0000036360 | 098F | 0014 | 4DCD | 07AB | 7BE0 | FFC9 | CA09 | A3CF |
| 0000036400 | 936E | 0D5F | 9370 | FFC6 | 456B | 078B | 7BE0 | FFC9 |
| 0000036420 | 4508 | B7EE | 0060 | 09AF | 2800 | 0962 | 098F | 0014 |
| 0000036440 | 4DCD | B7AB | FFE0 | 0550 | 856B | 4D68 | B7EE | 0060 |
| 0000036460 | 09AF | 2800 | 0962 | 098F | BF7C | 4DCD | 0B0E | 0050 |
| 0000036500 | B7A7 | FFE0 | 0550 | 84E9 | B4EA | 0010 | B5A6 | FFC0 |
| 0000036520 | 4CC7 | 5F27 | 4CE6 | B5A7 | FFC0 | 5F47 | 80ED | 4400 |
| 0000036540 | 4940 | C94A | B5A7 | FFC0 | 5E07 | B0ED | 0020 | 458C |
| 0000036560 | 492C | C93F | B7A7 | FFE0 | 4C05 | 5F25 | 2465 | B6E3 |
| 0000036600 | 0080 | 40A3 | 4D85 | 2465 | 40A3 | 0548 | 846B | 0550 |
| 0000036620 | B5A5 | FFC0 | 5F85 | B0AD | 0010 | B5A5 | 0020 | 5EC5 |
| 0000036640 | 2465 | B7A3 | FFA0 | 4065 | B5A3 | 0010 | 2463 | 4065 |
| 0000036660 | B2AD | 0030 | 4442 | B5A3 | FFC0 | 4862 | C917 | 4484 |
| 0000036700 | B5A7 | FFC0 | 48E4 | C90F | 4C47 | 5EC7 | 2467 | B7A5 |
| 0000036720 | 0030 | 40A7 | 4C83 | 2463 | 4067 | 8D67 | 1024 | B5A7 |
| 0000036740 | FFC0 | 48E4 | C8F1 | 1022 | 48E2 | C8E9 | 102C | 492C |
| 0000036760 | C8C1 | 1020 | 4940 | C8B6 | B7EE | 01A0 | 09AF | 3EFD |
| 0000037000 | 0962 | 098F | 0054 | 4DCD | 0B0E | 0440 | 456B | 0550 |
| 0000037020 | B16D | 0430 | A3CF | D60E | 7C00 | FFC9 | 0D5F | 0D80 |
| 0000037040 | FFC2 | 0550 | B10D | 0420 | B9AD | 0420 | 0020 | 07A9 |
| 0000037060 | 7C00 | FFC9 | 832D | CA10 | B5AB | 0430 | 102B | B16D |
| 0000037100 | 0430 | 248B | 41AB | 87A9 | B92B | 0000 | 0020 | BB2D |
| 0000037120 | 3A20 | 0000 | 87AB | CBF0 | A3CF | B5AB | 0420 | 102B |
| 0000037140 | 242B | 936E | 4DAB | 100B | 936E | D3AE | FFC0 | 0D5F |
| 0000037160 | 7760 | FFC6 | 4508 | B7EE | 0080 | 09AF | 2A00 | 0962 |
| 0000037200 | 098F | 0054 | 4DCD | 120E | 456B | 0550 | 816D | B7AB |
| 0000037220 | FFE0 | CA0B | 85AB | 102B | 816D | B7A9 | FFE0 | BB2D |
| 0000037240 | 3A20 | FFE0 | B7A9 | FFE0 | CBF5 | 85A8 | B7EE | 0080 |

THU MAR 14 17:37:32 1991 GSPMON.4 PAGE 18, LINE 1004

| | | | | | | | | |
|---|---|---|---|---|---|---|---|---|
| 0000037260 | 09AF | 2A00 | 0962 | 098F | 0054 | 4DCD | 0B0E | 0050 |
| 0000037300 | A3CF | D3AE | FFC0 | 0D5F | 0D80 | FFC2 | B7AB | FFEU |
| 0000037320 | 4968 | C302 | 4508 | C024 | BBAD | FFC0 | 0010 | 456B |
| 0000037340 | 0550 | 816D | B7AB | FFE0 | CA0F | BBAD | 0010 | 0030 |
| 0000037360 | B7AB | 0010 | BB6D | 3A20 | 0010 | 85AB | 102B | 816D |
| 0000037400 | B7A9 | FFE0 | 492B | C8F1 | B7AB | 0010 | 4529 | B32B |
| 0000037420 | 3A00 | B7A9 | 0030 | 456B | B369 | 3A20 | B7A8 | 0010 |
| 0000037440 | B7EE | 0080 | 09AF | 2A00 | 0962 | 098F | 0054 | 4DCD |
| 0000037460 | 100E | BBAD | FFE0 | 0000 | 87AB | B76B | 3A20 | CA08 |
| 0000037500 | 87AB | BB6D | 3A20 | 0000 | 87AB | B76B | 3A20 | CBF8 |
| 0000037520 | 87AB | BBAB | FFCD | 3A20 | B7A9 | FFC0 | B369 | 3A00 |
| 0000037540 | B7EE | 0080 | 09AF | 2A00 | 0962 | 098F | 0154 | 4DCD |
| 0000037560 | B7AB | FFE0 | 07A9 | 7C00 | FFC9 | 492B | CB02 | 4D68 |
| 0000037600 | C015 | B767 | 3A00 | BB67 | 3A20 | 3A20 | B767 | 3A20 |
| 0000037620 | CA05 | B767 | 3A20 | BB67 | 3A00 | 3A00 | 44E7 | B2EB |
| 0000037640 | 3A00 | B32B | 3A20 | B369 | 3A00 | 4D68 | B7EE | 00AD |
| 0000037660 | 09AF | 2A80 | 0962 | 098F | 0054 | 4DCD | 100E | 07AB |
| 0000037700 | 7C00 | FFC9 | 836D | CA0F | 0550 | 87AB | 856B | B5A9 |
| 0000037720 | FFE0 | 492B | CB02 | 87A8 | C007 | 87AB | BB6D | 3A20 |
| 0000037740 | 0000 | 87AB | CBF2 | 4508 | B7EE | 0080 | 09AF | 2A00 |
| 0000037760 | 0962 | 098F | 0014 | 4DCD | B7AB | FFE0 | 100B | 078B |
| 0000040000 | 8CB0 | FFC9 | 0B0B | 0050 | 078B | 8C70 | FFC9 | 07AB |
| 0000040020 | 8CB0 | FFC9 | 0550 | 856B | 146B | CB07 | 09EB | 8C10 |
| 0000040040 | FFC2 | 078B | 8CD0 | FFC9 | C006 | 09EB | 9FD0 | FFC2 |
| 0000040060 | 078B | 8CD0 | FFC9 | B7EE | 0060 | 09AF | 2800 | 0962 |
| 0000040100 | 098F | 0154 | 4DCD | 0B0E | 00A0 | 07AB | 7C00 | FFC9 |
| 0000040120 | B36D | 0020 | CA00 | 0091 | A3CF | D3AE | 0020 | 0D5F |
| 0000040140 | 1910 | FFC2 | 09EB | 8CF0 | FFC9 | B36D | 0080 | 456B |
| 0000040160 | 836D | B7AB | FFE0 | B7A9 | 0080 | 0550 | 8567 | 0570 |
| 0000040200 | 8529 | 4127 | B0ED | 0060 | B7A9 | 0080 | 0550 | B567 |
| 0000040220 | 0010 | 0570 | B529 | 0010 | 4127 | B0ED | 0070 | B5A9 |
| 0000040240 | 0060 | C458 | 0550 | 05A7 | 6D60 | FFD2 | 1427 | 48E9 |
| 0000040260 | C351 | 0570 | B5A7 | 0070 | C44D | 0550 | 05A7 | 6D70 |
| 0000040300 | FFD2 | 0570 | B5A9 | 0070 | 1427 | 48E9 | C343 | 07A7 |
| 0000040320 | 6C00 | FFD2 | 5CE9 | 07AB | 07F0 | FFC7 | 4169 | B5A7 |
| 0000040340 | 0060 | 2447 | 40E9 | B32D | 0040 | A3CF | 1827 | 92EE |
| 0000040360 | 932E | 07A7 | 8CD0 | FFC9 | 0927 | 4D07 | CA2B | B7AB |
| 0000040400 | FFE0 | B7A7 | 0020 | 0550 | B8EB | 0000 | 0020 | 87A7 |
| 0000040420 | CA16 | 24A7 | 0B27 | 8CF0 | FFC9 | 8569 | 0570 | 84E7 |
| 0000040440 | 40E9 | 812B | 87A9 | 24A9 | 0B29 | 8CF0 | FFC9 | 120B |
| 0000040460 | 0550 | 8567 | 0570 | B529 | 0010 | 4127 | 80EB | A3CF |
| 0000040500 | D3AE | 0020 | 0D5F | 14D0 | FFC2 | 0788 | 7C00 | FFC9 |
| 0000040520 | 4508 | C016 | 87AB | 102B | 836D | B7A9 | 0080 | 1009 |
| 0000040540 | B32D | 0080 | 152B | C485 | B7AB | 0020 | BB6D | 3A20 |
| 0000040560 | 0020 | B7AB | 0020 | CB00 | FF6F | 09E8 | FFFF | 0000 |
| 0000040600 | B7EE | 00A0 | 09AF | 2A80 | 0962 | 098F | BF7C | 4DCD |
| 0000040620 | 0B0E | 0170 | B7A7 | FFE0 | 0550 | 84E5 | 1685 | C302 |
| 0000040640 | 84E5 | C001 | 1A85 | B0AD | 0060 | 07A5 | 7C00 | FFC9 |
| 0000040660 | B2AD | 00B0 | A3CF | 92AE | 1867 | 92EE | 0D5F | 0F30 |
| 0000040700 | FFC2 | B30D | 00D0 | 44E7 | 0570 | B0ED | 0050 | 44E7 |
| 0000040720 | B0ED | 0040 | B5A5 | 0060 | 48A7 | C500 | 0622 | B5A7 |
| 0000040740 | 0050 | CB04 | BBAD | 00B0 | 0090 | C003 | BBAD | 00D0 |
| 0000040760 | 0090 | CB09 | A3CF | 1825 | 92AE | B5A5 | 0040 | 92AE |
| 0000041000 | 0D5F | 6E60 | FFC1 | B7A5 | FFE0 | 0570 | B5A7 | 0040 |
| 0000041020 | 24A7 | 40A7 | 0548 | B4E7 | 0040 | 0570 | B0ED | 0070 |
| 0000041040 | B5A7 | 0040 | 24A7 | 40A7 | 0548 | B4E7 | 0048 | 0570 |
| 0000041060 | B0ED | 0080 | B5A5 | 0070 | 2545 | 0B25 | 0810 | FFC7 |
| 0000041100 | 24A7 | 40E5 | 0548 | 84A7 | 0570 | 80ED | B5A5 | 0070 |
| 0000041120 | 2545 | 0B25 | 0810 | FFC7 | B5A7 | 0080 | 24A7 | 40E5 |

THU MAR 14 17:37:32 1991 GSPMON.4 PAGE 19, LINE 1063

| | | | | | | | | |
|---|---|---|---|---|---|---|---|---|
| 0000041140 | 0548 | B4A4 | 0008 | 0570 | B5A7 | 0070 | 2547 | 0B27 |
| 0000041160 | 0810 | FFC7 | B5A5 | 0080 | 24A5 | 40A7 | 0548 | B4E7 |
| 0000041200 | 0010 | 0570 | B0ED | 0010 | B5A5 | 0070 | 2545 | 0B25 |
| 0000041220 | 0810 | FFC7 | B5A7 | 0080 | 24A7 | 40E5 | 0548 | B4A6 |
| 0000041240 | 0018 | 0570 | B5A7 | 0070 | 07A5 | 8810 | FFC7 | 5EA7 |
| 0000041260 | 07A3 | 07F0 | FFC7 | 4067 | B5A3 | 0080 | 07A5 | 8830 |
| 0000041300 | FFC7 | 5EA3 | 4067 | 85A3 | 07A5 | 6C00 | FFD2 | 5CA3 |
| 0000041320 | 4067 | B5A3 | 0010 | 0550 | 05A5 | 6D80 | FFD2 | 5EA3 |
| 0000041340 | 4067 | B2ED | 0020 | C000 | 056C | B7A7 | 0090 | CA00 |
| 0000041360 | 058D | A3CF | D3AE | 0090 | 0D5F | 1910 | FFC2 | B7A0 |
| 0000041400 | 0020 | 0570 | 85A9 | 4889 | C54C | 4C02 | 0570 | B5AA |
| 0000041420 | 0010 | 48CA | C53F | A3CF | 1827 | 92EE | 924E | 07A5 |
| 0000041440 | 8CD0 | FFC9 | 0925 | 4D03 | CA31 | A3CF | D3AE | 00D0 |
| 0000041460 | D3AE | 00B0 | 0D5F | 12D0 | FFC2 | A3CF | D3AE | 0090 |
| 0000041500 | 0D5F | 14D0 | FFC2 | 0788 | 7C00 | FFC9 | B7A5 | FFC0 |
| 0000041520 | B7A3 | 0090 | 0550 | B865 | 0000 | 0020 | 0B62 | FFFF |
| 0000041540 | FFBF | C803 | 0D02 | FFFF | FFBF | 07A7 | 6C00 | FFD2 |
| 0000041560 | 4C43 | 5AE3 | B065 | 0010 | B4A3 | 0010 | 5EE3 | 4C47 |
| 0000041600 | 4467 | 2FC7 | 80E5 | 4508 | C000 | 055E | 1082 | 102A |
| 0000041620 | 48CA | C4C1 | 07A7 | 6C00 | FFD2 | 40E0 | 1029 | 4889 |
| 0000041640 | C4B4 | B7A7 | 0090 | BAED | 3A20 | 0090 | B7A7 | 0090 |
| 0000041660 | CBA0 | C000 | 052B | B7A7 | 0090 | CA00 | 0527 | A3CF |
| 0000041700 | D3AE | 0090 | 0D5F | 1910 | FFC2 | 07A7 | 8CB0 | FFC9 |
| 0000041720 | 0B07 | 1080 | B2ED | 0120 | B7AC | 0020 | 07A5 | 8CB0 |
| 0000041740 | FFC9 | 0570 | B8AD | 0010 | 00F0 | B9AD | 00F0 | 0100 |
| 0000041760 | B5A9 | 0010 | 48C9 | C56D | 0570 | B5A7 | 0100 | 48E9 |
| 0000042000 | C517 | 4527 | 4CEB | 142B | B7A7 | 0120 | 4D65 | 2465 |
| 0000042020 | 40E5 | 8EA5 | 09C3 | 0230 | 5C65 | 40E5 | 0B05 | 0100 |
| 0000042040 | 0785 | 8C96 | FFC9 | 4463 | 0541 | B06D | 0140 | C004 |
| 0000042060 | 1825 | 0541 | B0AD | 0140 | 4D82 | 0570 | 85AA | 488A |
| 0000042100 | C544 | A3CF | 0541 | B5A7 | 0140 | 92EE | 924E | 07A5 |
| 0000042120 | 8CD0 | FFC9 | 0925 | 4D03 | CA31 | A3CF | D3AE | 00D0 |
| 0000042140 | D3AE | 00B0 | 0D5F | 12D0 | FFC2 | A3CF | D3AE | 0090 |
| 0000042160 | 0D5F | 14D0 | FFC2 | 0788 | 7C00 | FFC9 | B7A5 | FFC0 |
| 0000042200 | B7A3 | 0090 | 0550 | B865 | 0000 | 0020 | 0B62 | FFFF |
| 0000042220 | FFBF | C803 | 0D02 | FFFF | FFBF | 07A7 | 6C00 | FFD2 |
| 0000042240 | 4C43 | 5AE3 | B065 | 0010 | B4A3 | 0010 | 5EE3 | 4C47 |
| 0000042260 | 4467 | 2FC7 | 80E5 | 4508 | C000 | 04C6 | 07A5 | 6C00 |
| 0000042300 | FFD2 | 40A2 | 102A | 488A | C4BC | 108C | 1029 | 48C9 |
| 0000042320 | C493 | B7A7 | 0090 | BAED | 3A20 | 0090 | B7A7 | 0090 |
| 0000042340 | CB00 | FF6D | C000 | 0492 | B7A7 | 0090 | CA00 | 048E |
| 0000042360 | A3CF | D3AE | 0090 | 0D5F | 1910 | FFC2 | 07A7 | 8CB0 |
| 0000042400 | FFC9 | 0B07 | 1080 | B2ED | 0120 | B7AC | 0020 | 07A5 |
| 0000042420 | 8CB0 | FFC9 | 0570 | B8AD | 0020 | 00F0 | B5A3 | 00F0 |
| 0000042440 | 03A3 | 13E3 | B06D | 0100 | B4A3 | 0010 | B5A7 | 0100 |
| 0000042460 | 44E3 | B06D | 0110 | B5A9 | 0010 | 48C9 | C56D | 0570 |
| 0000042500 | B5A7 | 0100 | 48E9 | C705 | 1825 | 0541 | B0AD | 0140 |
| 0000042520 | C016 | B5AB | 0110 | 412B | B7A5 | 0120 | 4D63 | 2463 |
| 0000042540 | 40A3 | 8E63 | 09C7 | 0230 | 5CE3 | 40A3 | 0B03 | 0100 |
| 0000042560 | 0783 | 8C90 | FFC9 | 44E7 | 0541 | B0ED | 0140 | 4D82 |
| 0000042600 | 0570 | 85AA | 488A | C544 | A3CF | 0541 | B5A7 | 0140 |
| 0000042620 | 92EE | 924E | 07A5 | 8CD0 | FFC9 | 0925 | 4D03 | CA31 |
| 0000042640 | A3CF | D3AE | 00D0 | D3AE | 00B0 | 0D5F | 12D0 | FFC2 |
| 0000042660 | A3CF | D3AE | 0090 | 0D5F | 14D0 | FFC2 | 0788 | 7C00 |
| 0000042700 | FFC9 | B7A5 | FFC0 | B7A3 | 0090 | 0550 | B865 | 0000 |
| 0000042720 | 0020 | 0B62 | FFFF | FFBF | C803 | 0D02 | FFFF | FFBF |
| 0000042740 | 07A7 | 6C00 | FFD2 | 4C43 | 5AE3 | B065 | 0010 | B4A3 |
| 0000042760 | 0010 | 5EE3 | 4C47 | 4467 | 2FC7 | 80E5 | 4508 | C000 |
| 0000043000 | 0423 | 07A5 | 6C00 | FFD2 | 40A2 | 102A | 488A | C4BC |

THU MAR 14 17:37:32 1991  GSPMON.4  PAGE 20, LINE 1122

| | | | | | | | | |
|---|---|---|---|---|---|---|---|---|
| 0000043020 | 108C | 1029 | 48C9 | C493 | B7A7 | 0090 | BAED | 3A20 |
| 0000043040 | 0090 | B7A7 | 0090 | CB00 | FF63 | C000 | 03EF | B7A7 |
| 0000043060 | 0090 | CA00 | 03EB | A3CF | D3AE | 0090 | 0D5F | 1910 |
| 0000043100 | FFC2 | 07A7 | 8CB0 | FFC9 | 0B07 | 2530 | B2ED | 0120 |
| 0000043120 | B7A0 | 0020 | 07A5 | 8CB0 | FFC9 | 0570 | B8AD | 0030 |
| 0000043140 | 00F0 | B9AD | 00F0 | 0100 | 85A9 | 4889 | C56E | 0570 |
| 0000043160 | B5A7 | 0100 | 48E9 | C517 | 4527 | 4CEB | 142B | B7A7 |
| 0000043200 | 0120 | 4D65 | 2465 | 40E5 | 8EA5 | 09C3 | 0230 | 5C65 |
| 0000043220 | 40E5 | 0B05 | 0100 | 0785 | 8C90 | FFC9 | 4463 | 0541 |
| 0000043240 | B06D | 0140 | C004 | 1825 | 0541 | B0AD | 0140 | 4C02 |
| 0000043260 | 0570 | B5AA | 0010 | 48CA | C541 | A3CF | 0541 | B5A7 |
| 0000043300 | 0140 | 92EE | 924E | 07A5 | 8CD0 | FFC9 | 0925 | 4D03 |
| 0000043320 | CA31 | A3CF | D3AE | 00D0 | D3AE | 00B0 | 0D5F | 12D0 |
| 0000043340 | FFC2 | A3CF | D3AE | 0090 | 0D5F | 14D0 | FFC2 | 0788 |
| 0000043360 | 7C00 | FFC9 | B7A5 | FFC0 | B7A3 | 0090 | 0550 | B865 |
| 0000043400 | 0000 | 0020 | 0B62 | FFFF | FFBF | C803 | 0D02 | FFFF |
| 0000043420 | FFBF | 07A7 | 6C00 | FFD2 | 4C43 | 5AE3 | B065 | 0010 |
| 0000043440 | B4A3 | 0010 | 5EE3 | 4C47 | 4467 | 2FC7 | 80E5 | 4508 |
| 0000043460 | C000 | 038A | 1082 | 102A | 48CA | C4BF | 07A7 | 6C00 |
| 0000043500 | FFD2 | 40E0 | 1029 | 4889 | C492 | B7A7 | 0090 | BAED |
| 0000043520 | 3A20 | 0090 | B7A7 | 0090 | CB00 | FF6D | C000 | 0356 |
| 0000043540 | B7A7 | 0090 | CA00 | 0352 | A3CF | D3AE | 0090 | 0D5F |
| 0000043560 | 1910 | FFC2 | 07A7 | 8CB0 | FFC9 | 0B07 | 2530 | B2ED |
| 0000043600 | 0120 | B7A0 | 0020 | 07A5 | 8CB0 | FFC9 | 0570 | B8AD |
| 0000043620 | 0040 | 00F0 | B5A3 | 00F0 | 03A3 | 13E3 | B06D | 0100 |
| 0000043640 | B4A3 | 0030 | B5A7 | 0100 | 44E3 | B06D | 0110 | 85A9 |
| 0000043660 | 4889 | C56E | 0570 | B5A7 | 0100 | 48E9 | C705 | 1825 |
| 0000043700 | 0541 | B0AD | 0140 | C016 | B5AB | 0110 | 412B | B7A5 |
| 0000043720 | 0120 | 4D63 | 2463 | 40A3 | 8E63 | 09C7 | 0230 | 5CE3 |
| 0000043740 | 40A3 | 0B03 | 0100 | 0783 | 8C90 | FFC9 | 44E7 | 0541 |
| 0000043760 | B0ED | 0140 | 4C02 | 0570 | B5AA | 0010 | 48CA | C541 |
| 0000044000 | A3CF | 0541 | B5A7 | 0140 | 92EE | 924E | 07A5 | 8CD0 |
| 0000044020 | FFC9 | 0925 | 4D03 | CA31 | A3CF | D3AE | 00D0 | D3AE |
| 0000044040 | 00B0 | 0D5F | 12D0 | FFC2 | A3CF | D3AE | 0090 | 0D5F |
| 0000044060 | 14D0 | FFC2 | 0788 | 7C00 | FFC9 | B7A5 | FFC0 | B7A3 |
| 0000044100 | 0090 | 0550 | B865 | 0000 | 0020 | 0B62 | FFFF | FFBF |
| 0000044120 | C803 | 0D02 | FFFF | FFBF | 07A7 | 6C00 | FFD2 | 4C43 |
| 0000044140 | 5AE3 | B065 | 0010 | B4A3 | 0010 | 5EE3 | 4C47 | 4467 |
| 0000044160 | 2FC7 | 80E5 | 4508 | C000 | 02E7 | 1082 | 102A | 48CA |
| 0000044200 | C4BF | 07A7 | 6C00 | FFD2 | 40E0 | 1029 | 4889 | C492 |
| 0000044220 | B7A7 | 0090 | BAED | 3A20 | 0090 | B7A7 | 0090 | CB00 |
| 0000044240 | FF63 | C000 | 02B3 | B7A7 | 0090 | CA00 | 02AF | A3CF |
| 0000044260 | D3AE | 0090 | 0D5F | 1910 | FFC2 | B7A0 | 0020 | 0570 |
| 0000044300 | 85A9 | 4889 | C500 | 0086 | 4C02 | 07A7 | 8CB0 | FFC9 |
| 0000044320 | 0570 | B4E5 | 0030 | 48A9 | 1825 | C401 | 44A5 | 0541 |
| 0000044340 | B0AD | 0150 | 0570 | B5AA | 0010 | 48CA | C56B | 07A7 |
| 0000044360 | 8CB0 | FFC9 | 0B07 | 0050 | 0787 | 8C70 | FFC9 | 07A5 |
| 0000044400 | 8CB0 | FFC9 | 0570 | B4A3 | 0010 | 486A | 1823 | C401 |
| 0000044420 | 4463 | 0541 | B06D | 0160 | B5A3 | 0150 | CB03 | B5A3 |
| 0000044440 | 0160 | CA11 | A3CF | 09E3 | 7C40 | FFC9 | 926E | 92EE |
| 0000044460 | 924E | 0D5F | A780 | FFC2 | 0783 | 8C70 | FFC9 | 0550 |
| 0000044500 | 8467 | 1547 | C83F | A3CF | 1827 | 92EE | 924E | 07A5 |
| 0000044520 | 8CD0 | FFC9 | 0925 | 4D03 | CA31 | A3CF | D3AE | 00D0 |
| 0000044540 | D3AE | 00B0 | 0D5F | 12D0 | FFC2 | A3CF | D3AE | 0090 |
| 0000044560 | 0D5F | 14D0 | FFC2 | 0788 | 7C00 | FFC9 | B7A5 | FFC0 |
| 0000044600 | B7A3 | 0090 | 0550 | B865 | 0000 | 0020 | 0B62 | FFFF |
| 0000044620 | FFBF | C803 | 0D02 | FFFF | FFBF | 07A7 | 6C00 | FFD2 |
| 0000044640 | 4C43 | 5AE3 | B065 | 0010 | B4A3 | 0010 | 5EE3 | 4C47 |
| 0000044660 | 4467 | 2FC7 | 80E5 | 4508 | C000 | 0246 | 1082 | 102A |

THU MAR 14 17:37:32 1991 GSPMON.4 PAGE 21, LINE 1181

| | | | | | | | | |
|---|---|---|---|---|---|---|---|---|
| 0000044700 | 48CA | C495 | 07A7 | 6C00 | FFD2 | 40E0 | 1029 | 4889 |
| 0000044720 | C400 | FF7A | B7A7 | 0090 | BAED | 3A20 | 0090 | B7A7 |
| 0000044740 | 0090 | CB00 | FF64 | C000 | 0211 | B7A7 | 0090 | CA00 |
| 0000044760 | 020D | A3CF | D3AE | 0090 | 0D5F | 1910 | FFC2 | B7A0 |
| 0000045000 | 0020 | 0570 | 85A9 | 4889 | C500 | 0088 | 4C02 | 07A7 |
| 0000045020 | 8CB0 | FFC9 | 0570 | B4E5 | 0030 | 48A9 | 1825 | C401 |
| 0000045040 | 44A5 | 0541 | B0AD | 0150 | 0570 | B5AA | 0010 | 48CA |
| 0000045060 | C56D | 07A7 | 8CB0 | FFC9 | 0B07 | 0050 | 0787 | 8C70 |
| 0000045100 | FFC9 | 07A5 | 8CB0 | FFC9 | 0570 | B4A3 | 0020 | 03A3 |
| 0000045120 | 1003 | 486A | 1823 | C501 | 4463 | 0541 | B06D | 0160 |
| 0000045140 | B5A3 | 0150 | CB03 | B5A3 | 0160 | CA11 | A3CF | 09E3 |
| 0000045160 | 7C40 | FFC9 | 926E | 92EE | 924E | 0D5F | A780 | FFC2 |
| 0000045200 | 0783 | 8C70 | FFC9 | 0550 | 8467 | 1547 | C83F | A3CF |
| 0000045220 | 1827 | 92EE | 924E | 07A5 | 8CD0 | FFC9 | 0925 | 4D03 |
| 0000045240 | CA31 | A3CF | D3AE | 00D0 | D3AE | 00B0 | 0D5F | 12D0 |
| 0000045260 | FFC2 | A3CF | D3AE | 0090 | 0D5F | 14D0 | FFC2 | 0788 |
| 0000045300 | 7C00 | FFC9 | B7A5 | FFC0 | B7A3 | 0090 | 0550 | B865 |
| 0000045320 | 0000 | 0020 | 0B62 | FFFF | FFBF | C803 | 0D02 | FFFF |
| 0000045340 | FFBF | 07A7 | 6C00 | FFD2 | 4C43 | 5AE3 | B065 | 0010 |
| 0000045360 | B4A3 | 0010 | 5EE3 | 4C47 | 4467 | 2FC7 | 80E5 | 4508 |
| 0000045400 | C000 | 01A2 | 1082 | 102A | 48CA | C493 | 07A7 | 6C00 |
| 0000045420 | FFD2 | 40E0 | 1029 | 4889 | C400 | FF78 | B7A7 | 0090 |
| 0000045440 | BAED | 3A20 | 0090 | B7A7 | 0090 | CB00 | FF62 | C000 |
| 0000045460 | 016D | B7A7 | 0090 | CA00 | 0169 | A3CF | D3AE | 0090 |
| 0000045500 | 0D5F | 1910 | FFC2 | B7A0 | 0020 | 0570 | 85A9 | 4889 |
| 0000045520 | C500 | 0088 | 4C02 | 07A7 | 8CB0 | FFC9 | 0570 | B4E5 |
| 0000045540 | 0040 | 03A5 | 1005 | 48A9 | 1825 | C501 | 44A5 | 0541 |
| 0000045560 | B0AD | 0150 | 0570 | B5AA | 0010 | 48CA | C56B | 07A7 |
| 0000045600 | 8CB0 | FFC9 | 0B07 | 0050 | 0787 | 8C70 | FFC9 | 07A5 |
| 0000045620 | 8CB0 | FFC9 | 0570 | B4A3 | 0010 | 486A | 1823 | C401 |
| 0000045640 | 4463 | 0541 | B06D | 0160 | B5A3 | 0150 | CB03 | B5A3 |
| 0000045660 | 0160 | CA11 | A3CF | 09E3 | 7C40 | FFC9 | 926E | 92EE |
| 0000045700 | 924E | 0D5F | A780 | FFC2 | 0783 | 8C70 | FFC9 | 0550 |
| 0000045720 | 8467 | 1547 | C83F | A3CF | 1827 | 92EE | 924E | 07A5 |
| 0000045740 | 8CD0 | FFC9 | 0925 | 4D03 | CA31 | A3CF | D3AE | 00D0 |
| 0000045760 | D3AE | 00B0 | 0D5F | 12D0 | FFC2 | A3CF | D3AE | 0090 |
| 0000046000 | 0D5F | 14D0 | FFC2 | 0788 | 7C00 | FFC9 | B7A5 | FFC0 |
| 0000046020 | B7A3 | 0090 | 0550 | B865 | 0000 | 0020 | 0B62 | FFFF |
| 0000046040 | FFBF | C803 | 0D02 | FFFF | FFBF | 07A7 | 6C00 | FFD2 |
| 0000046060 | 4C43 | 5AE3 | B065 | 0010 | B4A3 | 0010 | 5EE3 | 4C47 |
| 0000046100 | 4467 | 2FC7 | 80E5 | 4508 | C000 | 00FE | 1082 | 102A |
| 0000046120 | 48CA | C495 | 07A7 | 6C00 | FFD2 | 40E0 | 1029 | 4889 |
| 0000046140 | C400 | FF78 | B7A7 | 0090 | BAED | 3A20 | 0090 | B7A7 |
| 0000046160 | 0090 | CB00 | FF62 | C000 | 00C9 | B7A7 | 0090 | CA00 |
| 0000046200 | 00C5 | A3CF | D3AE | 0090 | 0D5F | 1910 | FFC2 | B7A0 |
| 0000046220 | 0020 | 0570 | 85A9 | 4889 | C500 | 0089 | 4C02 | 07A7 |
| 0000046240 | 8CB0 | FFC9 | 0570 | B4E5 | 0040 | 03A5 | 1005 | 48A9 |
| 0000046260 | 1825 | C501 | 44A5 | 0541 | B0AD | 0150 | 0570 | B5AA |
| 0000046300 | 0010 | 48CA | C56C | 07A7 | 8CB0 | FFC9 | 0B07 | 0050 |
| 0000046320 | 0787 | 8C70 | FFC9 | 07A5 | 8CB0 | FFC9 | 0570 | B4A3 |
| 0000046340 | 0020 | 03A3 | 1003 | 486A | 1823 | C501 | 4463 | 0541 |
| 0000046360 | B06D | 0160 | B5A3 | 0150 | CB03 | B5A3 | 0160 | CA11 |
| 0000046400 | A3CF | 09E3 | 7C40 | FFC9 | 926E | 92EE | 924E | 0D5F |
| 0000046420 | A780 | FFC2 | 0783 | 8C70 | FFC9 | 0550 | 8467 | 1547 |
| 0000046440 | C83E | A3CF | 1827 | 92EE | 924E | 07A5 | 8CD0 | FFC9 |
| 0000046460 | 0925 | 4D03 | CA30 | A3CF | D3AE | 00D0 | D3AE | 00B0 |
| 0000046500 | 0D5F | 12D0 | FFC2 | A3CF | D3AE | 0090 | 0D5F | 14D0 |
| 0000046520 | FFC2 | 0788 | 7C00 | FFC9 | B7A5 | FFC0 | B7A3 | 0090 |
| 0000046540 | 0550 | B865 | 0000 | 0020 | 0B62 | FFFF | FFBF | C803 |

THU MAR 14 17:37:32 1991 GSPMON.4 PAGE 22, LINE 1240

| | | | | | | | | |
|---|---|---|---|---|---|---|---|---|
| 0000046560 | 0D02 | FFFF | FFBF | 07A7 | 6C00 | FFD2 | 4C43 | 5AE3 |
| 0000046600 | B065 | 0010 | B4A3 | 0010 | 5EE3 | 4C47 | 4467 | 2FC7 |
| 0000046620 | 80E5 | 4508 | C059 | 1082 | 102A | 48CA | C494 | 07A7 |
| 0000046640 | 6C00 | FFD2 | 40E0 | 1029 | 4889 | C400 | FF77 | B7A7 |
| 0000046660 | 0090 | BAED | 3A20 | 0090 | B7A7 | 0090 | CB00 | FF61 |
| 0000046700 | C025 | B7A3 | FFE0 | 0570 | B5A7 | 0040 | 24A7 | 4067 |
| 0000046720 | 0550 | B4E8 | 0030 | 0B48 | FFF7 | C318 | 24A8 | 0B28 |
| 0000046740 | 88C0 | FFC2 | 8708 | 0168 | 5EB0 | FFC2 | 68D0 | FFC2 |
| 0000046760 | 4AF0 | FFC2 | 7310 | FFC2 | 7D50 | FFC2 | 5480 | FFC2 |
| 0000047000 | 3730 | FFC2 | 40C0 | FFC2 | 30D0 | FFC2 | 0570 | B5A7 |
| 0000047020 | 0040 | 1027 | B0ED | 0040 | B5A5 | 0060 | 48A7 | C400 |
| 0000047040 | F9DE | B5A3 | 0050 | 1023 | B06D | 0050 | 1443 | C400 |
| 0000047060 | F9CE | A3CF | D3AE | 00D0 | D3AE | 00B0 | 0D5F | 12D0 |
| 0000047100 | FFC2 | 09E8 | FFFF | 0000 | B7EE | 01A0 | 09AF | 3EFD |
| 0000047120 | 0962 | 098F | AF7C | 4DCD | 0B0E | 0040 | 07AC | 8C70 |
| 0000047140 | FFC9 | B7AB | FFE0 | 0541 | B5A7 | FFC0 | 0D87 | 008D |
| 0000047160 | 0550 | B58A | 0010 | 4529 | 4949 | C920 | 4D27 | 24C7 |
| 0000047200 | 4187 | 4CE2 | 0B02 | 0030 | B446 | 0020 | 8647 | 4167 |
| 0000047220 | 84E4 | 19E7 | 50C7 | 4CC5 | 0B85 | F0FF | FFFF | 2F85 |
| 0000047240 | 54A7 | 4CE6 | 4C87 | 0B87 | FF00 | FFFF | 48C7 | CA03 |
| 0000047260 | 4508 | C000 | 0105 | 1029 | 4949 | C8E0 | 0B49 | FFE7 |
| 0000047300 | C803 | 1828 | C000 | 00FC | 858A | 4D47 | 2FE7 | 4147 |
| 0000047320 | 2FE7 | B0ED | 0020 | B5A7 | 0020 | 4527 | 80ED | 0527 |
| 0000047340 | CB03 | 1828 | C000 | 00EC | B5A5 | 0020 | 4D47 | 44A7 |
| 0000047360 | 1027 | B0ED | 0010 | 4949 | C900 | 00E2 | 4D27 | 24C7 |
| 0000047400 | 4187 | 4CE2 | 0B02 | 0030 | 8647 | 4167 | 84E4 | 4C87 |
| 0000047420 | 2F87 | 5687 | 2587 | CA2A | B446 | 0030 | 19E7 | 50C7 |
| 0000047440 | 4CC5 | 0B85 | F0FF | FFFF | 2F85 | 54A7 | 4CE6 | B84D |
| 0000047460 | 0020 | 0030 | B5A7 | 0030 | 19E5 | 50E5 | 0B87 | F0FF |
| 0000047500 | FFFF | 2F87 | 54E5 | B0AD | 0030 | 4C87 | 56C7 | B5A5 |
| 0000047520 | 0030 | 50A7 | CB08 | 85A7 | 1427 | 80ED | 0527 | CB10 |
| 0000047540 | 1828 | C000 | 00AD | 4508 | C000 | 00AA | B5A7 | 0010 |
| 0000047560 | 1427 | B0ED | 0010 | 0527 | CB03 | 4508 | C000 | 00A0 |
| 0000047600 | 1029 | 4949 | C8BB | C000 | 009B | 07A0 | 8C90 | FFC9 |
| 0000047620 | 0550 | 840A | 0B4A | FFF5 | C903 | 4508 | C000 | 0090 |
| 0000047640 | B40A | 0010 | 4529 | 4949 | C925 | 4D27 | 2467 | 4007 |
| 0000047660 | 0548 | B4E7 | 0030 | 24C7 | 4187 | 4CE2 | 0B02 | 0030 |
| 0000047700 | 0550 | B446 | 0020 | 8647 | 4167 | 84E4 | 19E7 | 50C7 |
| 0000047720 | 4CC5 | 0B85 | F0FF | FFFF | 2F85 | 54A7 | 4CE6 | 4C87 |
| 0000047740 | 0B87 | FF00 | FFFF | 48C7 | CA02 | 4508 | C069 | 1029 |
| 0000047760 | 4949 | C8DB | 0B49 | FFE7 | C802 | 1828 | C061 | 840A |
| 0000050000 | 4D47 | 2FE7 | 4147 | 2FE7 | B0ED | 0020 | B5A7 | 0020 |
| 0000050020 | 4527 | 80ED | 0527 | CB02 | 1828 | C052 | B5A5 | 0020 |
| 0000050040 | 4D47 | 44A7 | 1027 | B0ED | 0010 | 4949 | C948 | 4D27 |
| 0000050060 | 2467 | 4007 | 0548 | B4E7 | 0030 | 24C7 | 4187 | 4CE2 |
| 0000050100 | 0B02 | 0030 | 8647 | 4167 | 0550 | 84E4 | 4C87 | 2F87 |
| 0000050120 | 5687 | 2587 | CA28 | B446 | 0030 | 19E7 | 50C7 | 4CC5 |
| 0000050140 | 0B85 | F0FF | FFFF | 2F85 | 54A7 | 4CE6 | B84D | 0020 |
| 0000050160 | 0030 | B5A7 | 0030 | 19E5 | 50E5 | 0B87 | F0FF | FFFF |
| 0000050200 | 2F87 | 54E5 | B0AD | 0030 | 4C87 | 56C7 | B5A5 | 0030 |
| 0000050220 | 50A7 | CB07 | 85A7 | 1427 | 80ED | 0527 | CB0D | 1828 |
| 0000050240 | C00F | 4508 | C00D | B5A7 | 0010 | 1427 | B0ED | 0010 |
| 0000050260 | 0527 | CB02 | 4508 | C004 | 1029 | 4949 | C8B8 | 4508 |
| 0000050300 | B7EE | 0180 | 09AF | 3EF5 | 0962 | 098F | AF7C | 4DCD |
| 0000050320 | 120E | 07AC | 8C70 | FFC9 | B7AB | FFE0 | 0541 | B5A7 |
| 0000050340 | FFC0 | 0D87 | 002D | 0550 | 858A | 4D47 | 2FE7 | 4147 |
| 0000050360 | 2FE7 | 80ED | 85A7 | 4D45 | 44E5 | 4CA6 | 1026 | 4529 |
| 0000050400 | 4949 | C91C | 4D27 | 24C7 | 4187 | 4CE2 | 0B02 | 0030 |
| 0000050420 | 8647 | 4167 | 84E4 | 4C87 | 2F87 | 5687 | 19E5 | 50A7 |

THU MAR 14 17:37:32 1991 GSPMON.4 PAGE 23, LINE 1299

| | | | | | | | | |
|---|---|---|---|---|---|---|---|---|
| 0000050440 | CA07 | 85A7 | 1427 | 80ED | 0527 | CB05 | 1828 | C043 |
| 0000050460 | 3846 | 4508 | C040 | 1029 | 4949 | C8E4 | 4508 | C03B |
| 0000050500 | 07A0 | 8C90 | FFC9 | 0550 | 840A | 0B4A | FFF5 | C902 |
| 0000050520 | 4508 | C031 | 840A | 4D47 | 2FE7 | 4147 | 2FE7 | 80ED |
| 0000050540 | 85A7 | 4D45 | 44E5 | 4CA6 | 1026 | 4529 | 4949 | C922 |
| 0000050560 | 4D27 | 2467 | 4007 | 0548 | B4E7 | 0030 | 24C7 | 4187 |
| 0000050600 | 4CE2 | 0B02 | 0030 | 8647 | 4167 | 0550 | 84E4 | 4C87 |
| 0000050620 | 2F87 | 5687 | 19E5 | 50A7 | CA07 | 85A7 | 1427 | 80ED |
| 0000050640 | 0527 | CB05 | 1828 | C007 | 3846 | 4508 | C004 | 1029 |
| 0000050660 | 4949 | C8DE | 4508 | B7EE | 0180 | 09AF | 3EF5 | 0962 |
| 0000050700 | 098F | AF7C | 4DCD | 0B0E | 0080 | 1887 | B2ED | 0040 |
| 0000050720 | 07A5 | 6C00 | FFD2 | 82AD | 0550 | 05A7 | 6D60 | FFD2 |
| 0000050740 | 2447 | B2ED | 0060 | 05A7 | 6D70 | FFD2 | 1427 | 5EA7 |
| 0000050760 | B2ED | 0020 | B7A7 | FFC0 | B4E0 | D010 | 4529 | 4D2A |
| 0000051000 | 4D2B | 84E7 | 48E9 | C943 | B7A7 | FFC0 | 4D25 | 24C5 |
| 0000051020 | 40E5 | B7A2 | FFE0 | B6A5 | 0030 | 40A2 | 07A5 | 6C00 |
| 0000051040 | FFD2 | 4C44 | 6CA4 | B7A7 | 0040 | 48E4 | C429 | B7A7 |
| 0000051060 | 0060 | 48E4 | C525 | 4C46 | 0B86 | 0000 | FFC0 | 87A7 |
| 0000051100 | 48E6 | C41E | B7A7 | 0020 | 48E6 | C51A | A3CF | 1907 |
| 0000051120 | 92EE | B7A7 | FFC0 | 4D25 | 24C5 | 40E5 | 0B05 | 0030 |
| 0000051140 | 92AE | B7A5 | FFA0 | 4D47 | 24C7 | 40A7 | 0B07 | 0030 |
| 0000051160 | 92EE | 0D5F | 7760 | FFC6 | 102A | 4809 | C901 | 102B |
| 0000051200 | 1029 | B7A7 | FFC0 | 0550 | 84E5 | 48A9 | C8BD | B7A7 |
| 0000051220 | FFA0 | B167 | 0010 | 4D45 | 4565 | B0A7 | 0020 | 8147 |
| 0000051240 | B7EE | 0180 | 09AF | 3EF5 | 0962 | 098F | 0014 | 4DCD |
| 0000051260 | 100E | A3CF | 09CB | 0748 | 936E | 0D5F | 81D0 | FFC6 |
| 0000051300 | 830D | 4D08 | CB03 | 09C8 | FFFF | C025 | 07AB | 7C20 |
| 0000051320 | FFC9 | CA03 | B30B | 3A20 | C003 | 0788 | 7C00 | FFC9 |
| 0000051340 | A3CF | 188B | 936E | 93AE | D3AE | FFC0 | 0D5F | 7760 |
| 0000051360 | FFC6 | A3CF | 936E | 09EB | 7C20 | FFC9 | 936E | B7AB |
| 0000051400 | FFC0 | 100B | 936E | 0D5F | 7760 | FFC6 | 87AB | 078B |
| 0000051420 | 7C20 | FFC9 | 4508 | B7EE | 0060 | 09AF | 2800 | 0962 |
| 0000051440 | 098F | 0054 | 4DCD | B7AB | FFE0 | 8769 | 456B | B369 |
| 0000051460 | 3A20 | 07A9 | 7C00 | FFC9 | CB0D | B7AB | FFE0 | 876B |
| 0000051500 | 078B | 7C00 | FFC9 | 078B | 7C20 | FFC9 | 4529 | B32B |
| 0000051520 | 3A00 | C011 | B7AB | FFE0 | 876B | 07A9 | 7C20 | FFC9 |
| 0000051540 | B32B | 3A00 | B7AB | FFE0 | BB69 | 0000 | 3A20 | 876B |
| 0000051560 | 078B | 7C20 | FFC9 | 4508 | B7EE | 0080 | 09AF | 2A00 |
| 0000051600 | 0962 | 098F | 0054 | 4DCD | 100E | 07AB | 7C00 | FFC9 |
| 0000051620 | CB06 | 456B | 078B | 7C20 | FFC9 | 4D68 | C026 | 07A9 |
| 0000051640 | 7C20 | FFC9 | 492B | CA14 | 07AB | 7C00 | FFC9 | BB6D |
| 0000051660 | 3A20 | 0000 | A3CF | 936E | 0D5F | 9370 | FFC6 | 87AB |
| 0000051700 | 078B | 7C00 | FFC9 | 07A9 | 7C20 | FFC9 | 492B | CBEC |
| 0000051720 | A3CF | 936E | 0D5F | 9370 | FFC6 | 456B | 078B | 7C20 |
| 0000051740 | FFC9 | 078B | 7C00 | FFC9 | 4D68 | B7EE | 0080 | 09AF |
| 0000051760 | 2A00 | 0962 | 098F | 0150 | 456B | 0550 | 058B | 8E20 |
| 0000052000 | FFC9 | 058B | 8E30 | FFC9 | 058B | 8E40 | FFC9 | 182B |
| 0000052020 | 0541 | 058B | 8E60 | FFC9 | 186B | 0550 | 058B | 8E80 |
| 0000052040 | FFC9 | 182B | 058B | 8E90 | FFC9 | 18EB | 058B | 9960 |
| 0000052060 | FFD1 | 05AB | 6D80 | FFD2 | 150B | C208 | A3CF | 186B |
| 0000052100 | 936E | 456B | 936E | 0D5F | 6660 | FFC0 | 0550 | 05AB |
| 0000052120 | 8FF0 | FFC9 | 05A9 | 9010 | FFC9 | 412B | 142B | 058B |
| 0000052140 | 8EC0 | FFC9 | 05C0 | 8FF0 | FFC9 | 8ED0 | FFC9 | 05C0 |
| 0000052160 | 8FE0 | FFC9 | 8EE0 | FFC9 | 05AB | 8FE0 | FFC9 | 05A7 |
| 0000052200 | 9000 | FFC9 | 40EB | 142B | 058B | 8F00 | FFC9 | 05AB |
| 0000052220 | 8F00 | FFC9 | 2FCB | 058B | 8F10 | FFC9 | 05AB | 8ED0 |
| 0000052240 | FFC9 | 07A7 | 6C60 | FFD2 | 5EEB | 248B | 07A7 | 6D30 |
| 0000052260 | FFD2 | 2447 | 4167 | 1A0B | 05A9 | 6D90 | FFD2 | 5B2B |
| 0000052300 | 05A9 | 8EE0 | FFC9 | 5B69 | 2489 | 4127 | 0787 | 8F20 |

THU MAR 14 17:37:32 1991 GSPMON.4 PAGE 24, LINE 1358

| | | | | | | | | |
|---|---|---|---|---|---|---|---|---|
| 0000052320 | FFC9 | 05AB | 8EC0 | FFC9 | 2FEB | 058B | 90B0 | FFC9 |
| 0000052340 | 05AB | 8F00 | FFC9 | 2FEB | 058B | 90A0 | FFC9 | 456B |
| 0000052360 | 058B | 9080 | FFC9 | 058B | 9090 | FFC9 | 0D5F | 1E10 |
| 0000052400 | FFC6 | 0542 | 058B | 8E50 | FFC9 | 09E9 | C2C0 | FFC2 |
| 0000052420 | 0789 | 6B60 | FFD2 | 09E7 | D140 | FFC2 | 0787 | 6B80 |
| 0000052440 | FFD2 | 09AF | 0A80 | 0960 | 098F | 0150 | 0550 | 05AB |
| 0000052460 | 8E30 | FFC9 | 102B | 058B | 8E30 | FFC9 | 07AB | 8F80 |
| 0000052500 | FFC9 | 102B | 078B | 8F80 | FFC9 | C000 | 00C5 | 456B |
| 0000052520 | 0550 | 058B | 8E10 | FFC9 | A3CF | 936E | 0D5F | 66C0 |
| 0000052540 | FFC0 | 182B | 0542 | 058B | 8E50 | FFC9 | 07C0 | 6AA0 |
| 0000052560 | FFD2 | 8EA0 | FFC9 | 456B | 0550 | 058B | 8F50 | FFC9 |
| 0000052600 | 078B | 6B20 | FFD2 | 058B | 8E40 | FFC9 | 0541 | 058B |
| 0000052620 | 8E70 | FFC9 | 0550 | 058B | 8E20 | FFC9 | 058B | 8F70 |
| 0000052640 | FFC9 | 0541 | 058B | 8F40 | FFC9 | C000 | 00A2 | 182B |
| 0000052660 | 0550 | 058B | 8E10 | FFC9 | A3CF | 1A0B | 936E | 0D5F |
| 0000052700 | 66C0 | FFC0 | A3CF | 07AB | 6AA0 | FFD2 | 07A9 | 8EA0 |
| 0000052720 | FFC9 | 452B | 936E | 0D5F | 6C40 | FFC6 | 0550 | 05AB |
| 0000052740 | 8E90 | FFC9 | 4968 | C323 | 07A9 | 6B20 | FFD2 | 1029 |
| 0000052760 | 0789 | 6B20 | FFD2 | 0589 | 8E40 | FFC9 | 0541 | 05A9 |
| 0000053000 | 8E70 | FFC9 | CB36 | 0550 | 05A9 | 8E80 | FFC9 | 07AB |
| 0000053020 | 6B20 | FFD2 | 492B | C82D | 1829 | 0541 | 0589 | 8E70 |
| 0000053040 | FFC9 | 07C0 | 6AA0 | FFD2 | 8EA0 | FFC9 | C022 | 05A9 |
| 0000053060 | 8E20 | FFC9 | CB05 | 05C0 | 6B20 | FFD2 | 8E20 | FFC9 |
| 0000053100 | 0541 | 05A9 | 8E70 | FFC9 | CA14 | 44E7 | 0787 | 6B20 |
| 0000053120 | FFD2 | 0550 | 0587 | 8E40 | FFC9 | 0570 | 05A9 | 8F70 |
| 0000053140 | FFC9 | 1029 | 0589 | 8F70 | FFC9 | 0541 | 0587 | 8E70 |
| 0000053160 | FFC9 | 0541 | 05AB | 8E70 | FFC9 | CA0A | 0550 | 05A9 |
| 0000053200 | 8F50 | FFC9 | CA05 | 1847 | 0542 | 0587 | 8E50 | FFC9 |
| 0000053220 | 07C0 | 6AA0 | FFD2 | 8EA0 | FFC9 | C02B | 456B | 0550 |
| 0000053240 | 058B | 8E10 | FFC9 | 1829 | 0541 | 0589 | 8F40 | FFC9 |
| 0000053260 | C020 | 456B | 0550 | 058B | 8E10 | FFC9 | A3CF | 936E |
| 0000053300 | 0D5F | 66C0 | FFC0 | 1869 | 0542 | 0589 | 8E50 | FFC9 |
| 0000053320 | 0D5F | AD60 | FFC4 | C00D | 0542 | 05A8 | 8E50 | FFC9 |
| 0000053340 | CA00 | FF35 | 1428 | CA00 | FF62 | 1428 | CAD7 | 1428 |
| 0000053360 | CAE0 | 09AF | 0A80 | 0960 | 098F | 0154 | 4DCD | 0B0E |
| 0000053400 | 0090 | 0541 | 05AB | 8F40 | FFC9 | CA00 | 0205 | C000 |
| 0000053420 | 01D7 | 0D5F | F470 | FFC2 | 4D0B | CA4C | A3CF | 09EB |
| 0000053440 | 9070 | FFC9 | 936E | 09E9 | 9060 | FFC9 | 932E | 4DA9 |
| 0000053460 | 1209 | 932E | 0550 | 05A9 | 9020 | FFC9 | 932E | 0D5F |
| 0000053500 | 2730 | FFC3 | 0570 | 810D | 85A9 | 0589 | 96B0 | FFC9 |
| 0000053520 | C61F | 0550 | B5A7 | 0010 | 0587 | 96C0 | FFC9 | B5AB |
| 0000053540 | 0020 | 058B | 96D0 | FFC9 | B5A7 | 0030 | 0587 | 96E0 |
| 0000053560 | FFC9 | B5A7 | 0040 | 0587 | 96F0 | FFC9 | 05C0 | 9060 |
| 0000053600 | FFC9 | 9720 | FFC9 | 05C0 | 9070 | FFC9 | 9730 | FFC9 |
| 0000053620 | A3CF | 1A8B | 936E | 09E7 | 96B0 | FFC9 | 92EE | 182B |
| 0000053640 | 936E | 0D5F | 4490 | FFC0 | 456B | 0550 | 058B | 8F50 |
| 0000053660 | FFC9 | C00D | 0D5F | 1F10 | FFC6 | 4D07 | CA08 | A3CF |
| 0000053700 | 09EB | 96B0 | FFC9 | 936E | 0D5F | F290 | FFC2 | 182B |
| 0000053720 | 0542 | 058B | 8E50 | FFC9 | C000 | 018A | 0D5F | F470 |
| 0000053740 | FFC2 | 4D07 | CA4D | A3CF | 4DAB | 0B0B | 0060 | 936E |
| 0000053760 | 4DA9 | 0B09 | 0050 | 932E | 0550 | 05A7 | 9020 | FFC9 |
| 0000054000 | 92EE | 0570 | 05A9 | 9070 | FFC9 | 932E | 05AB | 9060 |
| 0000054020 | FFC9 | 936E | 0550 | 05A7 | 8FD0 | FFC9 | 92EE | 05A7 |
| 0000054040 | 8FC0 | FFC9 | 92EE | 05A7 | 8FB0 | FFC9 | 92EE | 05A7 |
| 0000054060 | 8FA0 | FFC9 | 92EE | 0D5F | FA70 | FFC2 | 0570 | 810D |
| 0000054100 | 85AB | 058B | 96B0 | FFC9 | B5A9 | 0050 | 0589 | 970D |
| 0000054120 | FFC9 | B5A7 | 0060 | 0587 | 9710 | FFC9 | A3CF | 1A87 |
| 0000054140 | 92EE | 09E7 | 96B0 | FFC9 | 92EE | 1827 | 92EE | 0D5F |
| 0000054160 | 4490 | FFC0 | 44E7 | 0550 | 0587 | 8F50 | FFC9 | C00D |

THU MAR 14 17:37:32 1991 GSPMON.4 PAGE 25, LINE 1417

| | | | | | | | | |
|---|---|---|---|---|---|---|---|---|
| 0000054200 | 0D5F | 1F10 | FFC6 | 4D07 | CA08 | A3CF | 09EB | 96B0 |
| 0000054220 | FFC9 | 936E | 0D5F | F290 | FFC2 | 182B | 0542 | 058B |
| 0000054240 | 8E50 | FFC9 | C000 | 0124 | 0D5F | F470 | FFC2 | 4D07 |
| 0000054260 | CA16 | 182B | 0570 | 058B | 96B0 | FFC9 | A3CF | 1A89 |
| 0000054300 | 932E | 09E7 | 96B0 | FFC9 | 92EE | 936E | 0D5F | 4490 |
| 0000054320 | FFC0 | 4529 | 0550 | 0589 | 8F50 | FFC9 | C00D | 0D5F |
| 0000054340 | 1F10 | FFC6 | 4D07 | CA08 | A3CF | 09EB | 96B0 | FFC9 |
| 0000054360 | 936E | 0D5F | F290 | FFC2 | 182B | 0542 | 058B | 8E50 |
| 0000054400 | FFC9 | C000 | 00F5 | 0D5F | F470 | FFC2 | 4D07 | CA48 |
| 0000054420 | A3CF | 93AE | 0570 | 05AB | 9050 | FFC9 | 936E | 05A9 |
| 0000054440 | 9040 | FFC9 | 932E | 05A7 | 9070 | FFC9 | 92EE | 05A7 |
| 0000054460 | 9060 | FFC9 | 92EE | 4DA7 | 1207 | 92EE | 09E7 | 8FA0 |
| 0000054500 | FFC9 | 92EE | 05A7 | 9030 | FFC9 | 92EE | 0D5F | A1B0 |
| 0000054520 | FFC3 | B30D | 0070 | 0570 | 0588 | 96B0 | FFC9 | 85AB |
| 0000054540 | 058B | 9740 | FFC9 | 0550 | B5A9 | 0010 | 0589 | 96C0 |
| 0000054560 | FFC9 | B5A7 | 0020 | 0587 | 96D0 | FFC9 | A3CF | 1A87 |
| 0000054600 | 92EE | 09E7 | 96B0 | FFC9 | 92EE | 1827 | 92EE | 0D5F |
| 0000054620 | 4490 | FFC0 | 44E7 | 0550 | 0587 | 8F50 | FFC9 | C00D |
| 0000054640 | 0D5F | 1F10 | FFC6 | 4D07 | CA08 | A3CF | 09EB | 96B0 |
| 0000054660 | FFC9 | 936E | 0D5F | F290 | FFC2 | 182B | 0542 | 058B |
| 0000054700 | 8E50 | FFC9 | C000 | 0094 | 0D5F | F470 | FFC2 | 4D07 |
| 0000054720 | CA4E | A3CF | 93AE | 0570 | 05AB | 9050 | FFC9 | 936E |
| 0000054740 | 05A9 | 9040 | FFC9 | 932E | 05A7 | 9070 | FFC9 | 92EE |
| 0000054760 | 05A7 | 9060 | FFC9 | 92EE | 4DA7 | 1207 | 92EE | 09E7 |
| 0000055000 | 8FA0 | FFC9 | 92EE | 0D5F | 5BE0 | FFC3 | B30D | 0070 |
| 0000055020 | 0570 | 0588 | 96B0 | FFC9 | 85AB | 058B | 9740 | FFC9 |
| 0000055040 | 0550 | B5A9 | 0010 | 0589 | 96C0 | FFC9 | B5A7 | 0020 |
| 0000055060 | 0587 | 96D0 | FFC9 | B5A7 | 0030 | 0587 | 96E0 | FFC9 |
| 0000055100 | B5A7 | 0040 | 0587 | 96F0 | FFC9 | A3CF | 1A87 | 92EE |
| 0000055120 | 09E7 | 96B0 | FFC9 | 92EE | 1827 | 92EE | 0D5F | 4490 |
| 0000055140 | FFC0 | 44E7 | 0550 | 0587 | 8F50 | FFC9 | C00D | 0D5F |
| 0000055160 | 1F10 | FFC6 | 4D07 | CA08 | A3CF | 09EB | 96B0 | FFC9 |
| 0000055200 | 936E | 0D5F | F290 | FFC2 | 182B | 0542 | 058B | 8E50 |
| 0000055220 | FFC9 | C02E | 186B | 0542 | 058B | 8E50 | FFC9 | 4529 |
| 0000055240 | 0550 | 0589 | 8F50 | FFC9 | 0D5F | 1E10 | FFC6 | A3CF |
| 0000055260 | 932E | 932E | 1827 | 92EE | 0D5F | 4490 | FFC0 | C018 |
| 0000055300 | 0550 | 05A8 | 8F50 | FFC9 | 0B88 | FF00 | FFFF | 1428 |
| 0000055320 | CAE1 | 1428 | CA00 | FE82 | 1448 | CA00 | FE1A | 1488 |
| 0000055340 | CA00 | FEE2 | 1508 | CA00 | FF0E | 1608 | CA00 | FF6C |
| 0000055360 | 456B | 078B | 6B20 | FFD2 | 0550 | 058B | 8E40 | FFC9 |
| 0000055400 | 0541 | 058B | 8E70 | FFC9 | 0550 | 058B | 8E20 | FFC9 |
| 0000055420 | 0541 | 058B | 8F40 | FFC9 | 0BEE | FF6F | 09AF | 2A80 |
| 0000055440 | 0960 | 098F | 0054 | 4DCD | B7AB | FFE0 | 4529 | 0570 |
| 0000055460 | 812B | A3CF | 1A89 | 932E | 936E | 1829 | 932E | 0D5F |
| 0000055500 | 4490 | FFC0 | 4529 | 0550 | 0589 | 8F50 | FFC9 | 0D5F |
| 0000055520 | 1E10 | FFC6 | B7EE | 0080 | 09AF | 2A00 | 0962 | 098F |
| 0000055540 | 0054 | 4DCD | 0B0E | 0070 | A3CF | 0550 | 05AB | 90A0 |
| 0000055560 | FFC9 | 936E | 05A9 | 90B0 | FFC9 | 932E | 0D5F | 2F10 |
| 0000055600 | FFC4 | 830D | 07AB | 8F20 | FFC9 | 8769 | 0B89 | 0000 |
| 0000055620 | FFC0 | 4528 | B30D | 0020 | A3CF | 0550 | 05A9 | 8EC0 |
| 0000055640 | FFC9 | 932E | 0D5F | 2D50 | FFC4 | 87AB | 4568 | B30D |
| 0000055660 | 0040 | 0550 | 05A9 | 8F60 | FFC9 | CB0A | 07AB | 6AA0 |
| 0000055700 | FFD2 | 1829 | CB01 | 4529 | 0541 | B12D | 0060 | C016 |
| 0000055720 | 0570 | 05AB | 9080 | FFC9 | B7A9 | 0020 | 4969 | CB0A |
| 0000055740 | 05A9 | 9090 | FFC9 | 4928 | CB05 | 4529 | 0541 | B12D |
| 0000055760 | 0060 | C004 | 1829 | 0541 | B12D | 0060 | B7AB | 0020 |
| 0000056000 | 0570 | 058B | 9080 | FFC9 | 0588 | 9090 | FFC9 | 0541 |
| 0000056020 | B5A8 | 0060 | 0BEE | FF8F | 09AF | 2A00 | 0960 | 098F |
| 0000056040 | 0154 | 4DCD | 0B0E | 0160 | 456B | 0541 | 816D | C000 |

THU MAR 14 17:37:32 1991 GSPMON.4 PAGE 26, LINE 1476

| | | | | | | | | |
|---|---|---|---|---|---|---|---|---|
| 0000056060 | 0119 | A3CF | B5AB | FFC0 | B5A9 | FF80 | 412B | 936E |
| 0000056100 | 0D5F | 2D50 | FFC4 | A3CF | 0550 | 05AB | 8EC0 | FFC9 |
| 0000056120 | 936E | 4D09 | 0D5F | 2D50 | FFC4 | 4909 | CA04 | 09C8 |
| 0000056140 | FFFF | C000 | 02A3 | 0550 | 05AB | 8ED0 | FFC9 | B5A9 |
| 0000056160 | FF80 | 4169 | B5AB | FFC0 | 1029 | 492B | C304 | 09C8 |
| 0000056200 | FFF3 | C000 | 0293 | 07A9 | 8F20 | FFC9 | 872B | 0B8B |
| 0000056220 | 0000 | FFC0 | B36D | 0010 | A3CF | 456B | 936E | D3AE |
| 0000056240 | 0010 | B5AB | FFC0 | 936E | 05AB | 8ED0 | FFC9 | 936E |
| 0000056260 | 0D5F | 1760 | FFC4 | 0550 | B10D | 0100 | B5AB | FFC0 |
| 0000056300 | B5A9 | 0100 | 452B | B5A9 | FF80 | 1089 | 492B | C204 |
| 0000056320 | 184B | B16D | 0050 | C003 | 182B | B16D | 0050 | 144B |
| 0000056340 | CB1C | A3CF | B5AB | FFC0 | 142B | 936E | 0D5F | 2D50 |
| 0000056360 | FFC4 | B30D | 0010 | A3CF | 182B | 936E | 930E | 0550 |
| 0000056400 | B5A9 | FFC0 | 932E | B5AB | 0100 | 936E | 0D5F | 1760 |
| 0000056420 | FFC4 | 0550 | B10D | 0110 | C008 | B5AB | 0100 | B5A9 |
| 0000056440 | FF80 | 412B | 142B | B16D | 0110 | B5AB | 0100 | B5A9 |
| 0000056460 | FFC0 | 452B | B7A9 | FEE0 | 8169 | C000 | 01ED | A3CF |
| 0000056500 | B5AB | FFC0 | 142B | 936E | 0D5F | 2D50 | FFC4 | 07AB |
| 0000056520 | 8F20 | FFC9 | 8769 | 0B89 | 0000 | FFC0 | 4928 | CA04 |
| 0000056540 | 09C8 | FFFF | C000 | 0222 | 0550 | 05A9 | 8EC0 | FFC9 |
| 0000056560 | B5AB | FF80 | 4569 | B5AB | FFC0 | 1429 | 492B | C804 |
| 0000056600 | 09C8 | FFF3 | C000 | 0212 | B5A9 | FF80 | 412B | 142B |
| 0000056620 | B16D | 00B0 | A3CF | 05AB | 8EC0 | FFC9 | 936E | 0D5F |
| 0000056640 | 2D50 | FFC4 | B30D | 0010 | A3CF | 182B | 936E | 930E |
| 0000056660 | 0550 | 05AB | 8EC0 | FFC9 | 936E | B5A9 | 00B0 | 932E |
| 0000056700 | 0D5F | 1760 | FFC4 | 0550 | B10D | 0110 | B5AB | 0110 |
| 0000056720 | 452B | B5A9 | FF80 | 1089 | 492B | C204 | 184B | B16D |
| 0000056740 | 0050 | C003 | 182B | B16D | 0050 | 144B | CB19 | A3CF |
| 0000056760 | B5AB | 00B0 | 936E | 0D5F | 2D50 | FFC4 | B30D | 0010 |
| 0000057000 | A3CF | 4529 | 932E | 930E | 0550 | B5A9 | 0110 | 932E |
| 0000057020 | 936E | 0D5F | 1760 | FFC4 | 0550 | B10D | 0100 | C008 |
| 0000057040 | B5AB | 0110 | B5A9 | FF80 | 452B | 102B | B16D | 0100 |
| 0000057060 | B5AB | 0110 | B5A9 | 00B0 | 452B | B7A9 | FEE0 | 8169 |
| 0000057100 | C000 | 016A | B9AD | FFC0 | 0100 | B5AB | FFC0 | B5A9 |
| 0000057120 | FF80 | 412B | B16D | 0110 | C000 | 015E | 09C8 | FFFF |
| 0000057140 | C000 | 01A4 | 0550 | B5A8 | FF20 | 0B48 | FFF8 | C3F6 |
| 0000057160 | 24A8 | 0B28 | 0D60 | FFC3 | 8708 | 0168 | FB10 | FFC2 |
| 0000057200 | 0370 | FFC3 | 0BA0 | FFC3 | 0BA0 | FFC3 | FB10 | FFC2 |
| 0000057220 | 0370 | FFC3 | FB10 | FFC2 | 0370 | FFC3 | B5AB | FFA0 |
| 0000057240 | B5A9 | FFE0 | 1429 | 4969 | C304 | 09C8 | FFF4 | C000 |
| 0000057260 | 017D | B9AD | FFE0 | 00C0 | B5A9 | FFC0 | 0570 | B5AB |
| 0000057300 | FF40 | 4169 | B12D | 00F0 | 0550 | B5A9 | 0100 | 4169 |
| 0000057320 | B12D | 0150 | B5A9 | 0100 | 0570 | B5AB | FF60 | 4169 |
| 0000057340 | B12D | 0140 | A3CF | 0550 | 05A9 | 8EE0 | FFC9 | 932E |
| 0000057360 | B5AB | 0150 | 936E | 0D5F | 2F10 | FFC4 | B30D | 0010 |
| 0000057400 | A3CF | 936E | 4529 | 932E | 930E | 0550 | B5A9 | 00C0 |
| 0000057420 | 932E | 05A9 | 8EE0 | FFC9 | 932E | 0D5F | 2150 | FFC4 |
| 0000057440 | 0550 | B10D | 0120 | A3CF | 4DA9 | 0B09 | 0120 | 932E |
| 0000057460 | 1849 | 932E | B5A9 | 0120 | 932E | 936E | 0D5F | E690 |
| 0000057500 | FFC3 | 0570 | B10D | 0090 | B5A9 | 0090 | 1029 | CB04 |
| 0000057520 | 09C8 | FFF2 | C000 | 012A | 0550 | B5A9 | 00C0 | B5AB |
| 0000057540 | 0120 | 4569 | 1A0B | 05A7 | 6D90 | FFD2 | 5AEB | B5A7 |
| 0000057560 | FFA0 | 40EB | 4969 | C204 | 184B | B16D | 0060 | C003 |
| 0000057600 | 182B | B16D | 0060 | 144B | CB1D | A3CF | 4DAB | 0B0B |
| 0000057620 | 0130 | 936E | 1869 | 932E | B5A9 | 0120 | 40E9 | 1429 |
| 0000057640 | 932E | B5A9 | 0140 | 932E | 0D5F | E690 | FFC3 | 0570 |
| 0000057660 | B10D | 0090 | B5AB | 0090 | 102B | CB04 | 09C8 | FFF2 |
| 0000057700 | C000 | 00F4 | 0550 | B5AB | 0120 | B5A9 | 00C0 | 452B |
| 0000057720 | B7A7 | FF00 | 8167 | C000 | 00BA | 05AB | 8F00 | FFC9 |

THU MAR 14 17:37:32 1991 GSPMON.4 PAGE 27, LINE 1535

| | | | | | | | | |
|---|---|---|---|---|---|---|---|---|
| 0000057740 | B5A9 | FFA0 | 452B | B5A7 | FFE0 | 142B | 4967 | C804 |
| 0000057760 | 09C8 | FFF4 | C000 | 00DA | 4127 | 1427 | B0ED | 00D0 |
| 0000060000 | B5AB | FFC0 | 0570 | B5A7 | FF60 | 40EB | B16D | 00E0 |
| 0000060020 | 0550 | B5AB | 0100 | 40EB | B16D | 0140 | B5AB | 0100 |
| 0000060040 | 0570 | B5A7 | FF40 | 40EB | B16D | 0150 | A3CF | 0550 |
| 0000060060 | B5AB | 0140 | 936E | 0D5F | 2D50 | FFC4 | B30D | 0010 |
| 0000060100 | A3CF | 936E | 1827 | 92EE | 930E | 0550 | 05A7 | 8F00 |
| 0000060120 | FFC9 | 92EE | B5A9 | 00D0 | 932E | 0D5F | 2150 | FFC4 |
| 0000060140 | 0550 | B10D | 0130 | A3CF | 4DA7 | 0B07 | 0130 | 92EE |
| 0000060160 | 1867 | 92EE | B5A7 | 0130 | 92EE | 936E | 0D5F | E690 |
| 0000060200 | FFC3 | 0570 | B10D | 0090 | B5A7 | 0090 | 1027 | CB04 |
| 0000060220 | 09C8 | FFF2 | C000 | 008A | 0550 | B5A7 | 0130 | 4527 |
| 0000060240 | 1A09 | 05AB | 6D90 | FFD2 | 5B69 | B5AB | FFA0 | 4169 |
| 0000060260 | 4927 | C204 | 1849 | B12D | 0060 | C003 | 1829 | B12D |
| 0000060300 | 0060 | 1449 | CB1C | A3CF | 4DA9 | 0B09 | 0120 | 932E |
| 0000060320 | 1847 | 92EE | B5A7 | 0130 | 4567 | 1027 | 92EE | B5A7 |
| 0000060340 | 0150 | 92EE | 0D5F | E690 | FFC3 | 0570 | B10D | 0090 |
| 0000060360 | B5A9 | 0090 | 1029 | CB03 | 09C8 | FFF2 | C057 | 0550 |
| 0000060400 | B5A9 | 0130 | B5A7 | 00D0 | 44E9 | B7A7 | FF00 | 8127 |
| 0000060420 | C01E | 09C8 | FFFF | C04A | B5A8 | FF20 | 0B48 | FFF8 |
| 0000060440 | C3F8 | 24A8 | 0B28 | 22F0 | FFC3 | 8708 | 0168 | 23FC |
| 0000060460 | FFC3 | 23F0 | FFC3 | 1850 | FFC3 | 0E60 | FFC3 | 0E60 |
| 0000060500 | FFC3 | 0E60 | FFC3 | 1850 | FFC3 | 1850 | FFC3 | 0550 |
| 0000060520 | B5AB | 0110 | B5A9 | 0100 | 452B | B5A7 | FF80 | 102B |
| 0000060540 | 48EB | CA05 | 0570 | B5AB | 0050 | 144B | CA10 | 0550 |
| 0000060560 | B5AB | 0130 | B5A7 | 0120 | 44EB | B5A7 | FFA0 | 102B |
| 0000060600 | 48EB | CA08 | 0570 | B5AB | 0060 | 144B | CB03 | 09C8 |
| 0000060620 | FFEF | C00C | 0570 | B5AB | 0060 | B5A7 | 0050 | 48EB |
| 0000060640 | C701 | 4CEB | B16D | 0040 | B5A8 | 0040 | B7EE | 00A0 |
| 0000060660 | 09AF | 2A8D | 0962 | 098F | 0154 | 4DCD | 0B0E | 01A0 |
| 0000060700 | A3CF | 0550 | 05AB | 8EC0 | FFC9 | 154B | 936E | 0D5F |
| 0000060720 | 2D50 | FFC4 | A3CF | 0550 | 05AB | 8EC0 | FFC9 | 936E |
| 0000060740 | 4D0B | 0D5F | 2D50 | FFC4 | 490B | CA08 | 0550 | B5AB |
| 0000060760 | FFE0 | 388B | 09C8 | FFF3 | C000 | 0323 | A3CF | 0550 |
| 0000061000 | 05AB | 8ED6 | FFC9 | 114B | 936E | 0D5F | 2D50 | FFC4 |
| 0000061020 | 07AB | 8F20 | FFC9 | 876B | 0B8B | 0000 | FFC0 | 4968 |
| 0000061040 | CA08 | 0550 | B5AB | FFE0 | CB04 | 09C8 | FFF3 | C000 |
| 0000061060 | 0308 | 07AB | 8F20 | FFC9 | 8769 | 0B89 | 0000 | FFC0 |
| 0000061100 | B32D | 0030 | A3CF | 4529 | 932E | D3AE | 0030 | 0550 |
| 0000061120 | 05A9 | 8EC0 | FFC9 | 932E | 05A9 | 8ED0 | FFC9 | 932E |
| 0000061140 | 0D5F | 1760 | FFC4 | 0570 | B10D | 0070 | A3CF | 0550 |
| 0000061160 | 05AB | 8EC0 | FFC9 | 936E | 0D5F | 2D50 | FFC4 | B30D |
| 0000061200 | 0030 | A3CF | 182B | 936E | 930E | 0550 | 05A9 | 8EC0 |
| 0000061220 | FFC9 | 932E | 0570 | B5AB | 0070 | 936E | 0D5F | 1760 |
| 0000061240 | FFC4 | 0570 | B10D | 0080 | 4529 | 0541 | B12D | 0140 |
| 0000061260 | 0570 | B5A9 | 0080 | 412B | 2BEB | B5A9 | 0070 | 17EB |
| 0000061300 | 492B | C706 | B5AB | 0080 | 4169 | 2BE9 | 1029 | C001 |
| 0000061320 | 1009 | B12D | 0090 | B9AD | 0070 | 0000 | 85AB | B5A9 |
| 0000061340 | 0090 | 492B | C521 | A3CF | 85AB | 936E | 0D5F | 2D50 |
| 0000061360 | FFC4 | A3CF | 102B | 936E | 4D0B | 0D5F | 2D50 | FFC4 |
| 0000061400 | 490B | CB0A | 0570 | 85AB | 102B | B16D | 0050 | 182B |
| 0000061420 | 0541 | B16D | 0140 | C008 | 0570 | 85AB | 102B | 816D |
| 0000061440 | B5A9 | 0090 | 492B | C4DF | 0541 | B5AB | 0140 | CB03 |
| 0000061460 | 1828 | C000 | 0286 | 0570 | B5A9 | 0050 | B5AB | 0070 |
| 0000061500 | 4569 | B12D | 0020 | B5A9 | 0080 | B5AB | 0020 | 4569 |
| 0000061520 | B12D | 0060 | A3CF | B5A9 | 0060 | 932E | 0D5F | 2D50 |
| 0000061540 | FFC4 | A3CF | 0570 | B5A9 | 0050 | 932E | 4D09 | 0D5F |
| 0000061560 | 2D50 | FFC4 | 4909 | CB15 | A3CF | 0570 | B5A9 | 0060 |
| 0000061600 | 1029 | 932E | 0D5F | 2D50 | FFC4 | A3CF | 0570 | B5A9 |

THU MAR 14 17:37:32 1991 GSPMON.4 PAGE 28, LINE 1594

| | | | | | | | | |
|---|---|---|---|---|---|---|---|---|
| 0000061620 | 0050 | 932E | 4D09 | 0D5F | 2D50 | FFC4 | 4909 | CB00 |
| 0000061640 | 0090 | A3CF | 0550 | 05A9 | 8EE0 | FFC9 | 932E | 0570 |
| 0000061660 | B5AB | 0070 | 936E | 0D5F | 2F10 | FFC4 | B30D | 0030 |
| 0000061700 | A3CF | 936E | 4529 | 932E | 930E | 0550 | 05A9 | 8F00 |
| 0000061720 | FFC9 | 932E | 05AB | 8EE0 | FFC9 | 936E | 0D5F | 2150 |
| 0000061740 | FFC4 | 0570 | B10D | 00F0 | A3CF | 4DAB | 0B0B | 00F0 |
| 0000061760 | 936E | 1849 | 932E | B5A9 | 00F0 | 932E | B5AB | 0070 |
| 0000062000 | 936E | 0D5F | E690 | FFC3 | 0570 | B10D | 0150 | B5A9 |
| 0000062020 | 0150 | 1029 | CB04 | 09C8 | FFF2 | C000 | 0212 | B7A9 |
| 0000062040 | FFC0 | B9A9 | 00F0 | 0000 | B169 | 0010 | A3CF | B5A9 |
| 0000062060 | 0080 | 932E | 0D5F | 2D50 | FFC4 | B30D | 0030 | A3CF |
| 0000062100 | 932E | 1829 | 932E | 930E | 0550 | 05A9 | 8F00 | FFC9 |
| 0000062120 | 932E | 05AB | 8EE0 | FFC9 | 936E | 0D5F | 2150 | FFC4 |
| 0000062140 | 0570 | B10D | 00F0 | A3CF | 4DAB | 0B0B | 00F0 | 936E |
| 0000062160 | 1869 | 932E | B5A9 | 00F0 | 932E | B5AB | 0080 | 936E |
| 0000062200 | 0D5F | E690 | FFC3 | 0570 | B10D | 0150 | B5A9 | 0150 |
| 0000062220 | 1029 | CB04 | 09C8 | FFF2 | C000 | 01D3 | B7A9 | FFC0 |
| 0000062240 | B5A7 | 0070 | 44EB | 102B | B169 | 0030 | B5AB | 00F0 |
| 0000062260 | 0550 | 8527 | 44EB | 102B | B169 | 0020 | 1868 | C000 |
| 0000062300 | 01C0 | 0550 | B5A9 | FFE0 | CB0A | 0570 | B5A7 | 0060 |
| 0000062320 | 1027 | B0ED | 00A0 | B9AD | 0080 | 00B0 | C006 | B9AD |
| 0000062340 | 0070 | 00A0 | B9AD | 0050 | 00B0 | A3CF | 0550 | 05A7 |
| 0000062360 | 8EE0 | FFC9 | 92EE | 0570 | B5A9 | 00A0 | 1029 | 932E |
| 0000062400 | 0D5F | 2F10 | FFC4 | B30D | 0030 | A3CF | 0570 | B5A9 |
| 0000062420 | 00A0 | 1029 | 932E | 4529 | 932E | 930E | 0550 | 05A7 |
| 0000062440 | 8F00 | FFC9 | 92EE | 05A9 | 8EE0 | FFC9 | 932E | 0D5F |
| 0000062460 | 2150 | FFC4 | 0570 | B10D | 00C0 | A3CF | 4DA9 | 0B09 |
| 0000062500 | 0100 | 932E | 1847 | 92EE | B5A7 | 00C0 | 92EE | B5A9 |
| 0000062520 | 00A0 | 1029 | 932E | 0D5F | E690 | FFC3 | 0570 | B10D |
| 0000062540 | 0150 | B5A9 | 0150 | 1029 | CB04 | 09C8 | FFF2 | C000 |
| 0000062560 | 0168 | B5A9 | 00A0 | 1029 | B12D | 0120 | B5A9 | 00A0 |
| 0000062600 | 1049 | 812D | 85A9 | B5A7 | 00B0 | 48E9 | C571 | B5AB |
| 0000062620 | 0100 | 0550 | 05A9 | 8EE0 | FFC9 | 492B | CA69 | A3CF |
| 0000062640 | 932E | 0570 | 85A7 | 92EE | 0D5F | 2F10 | FFC4 | B30D |
| 0000062660 | 0030 | A3CF | 936E | 92EE | 0D5F | 2F10 | FFC4 | B7A9 |
| 0000062700 | 0030 | 4928 | CA4D | 148B | 0570 | B16D | 0010 | B5AB |
| 0000062720 | 0010 | 0550 | 05A7 | 8EE0 | FFC9 | 48EB | C218 | A3CF |
| 0000062740 | 0570 | B5AB | 0010 | 936E | 85A9 | 932E | 0D5F | 2F10 |
| 0000062760 | FFC4 | B7A7 | 0030 | 48E8 | CA0A | 148B | 0570 | B16D |
| 0000063000 | 0010 | 0550 | 05A7 | 8EE0 | FFC9 | 48EB | C3E8 | 0570 |
| 0000063020 | B5A9 | 0100 | 1029 | B12D | 00E0 | A3CF | 4DA9 | 0B09 |
| 0000063040 | 00E0 | 932E | 1847 | 92EE | 108B | 936E | 85AB | 936E |
| 0000063060 | 0D5F | E690 | FFC3 | 0570 | B10D | 0150 | B5A7 | 0150 |
| 0000063100 | 1027 | CB04 | 09C8 | FFF2 | C000 | 00FB | B5A7 | 00E0 |
| 0000063120 | B5A9 | 0100 | 4927 | C504 | B0ED | 0100 | B16D | 0120 |
| 0000063140 | 0570 | 85AB | 102B | 816D | B5A9 | 00B0 | 492B | C48F |
| 0000063160 | A3CF | 0570 | B5AB | 00A0 | 102B | 936E | 0D5F | 2D50 |
| 0000063200 | FFC4 | B30D | 0030 | A3CF | 0570 | B5AB | 00A0 | 102B |
| 0000063220 | 936E | 182B | 936E | 930E | 0550 | 05A9 | 8F00 | FFC9 |
| 0000063240 | 932E | 0570 | B5A7 | 0100 | 92EE | 0D5F | 2150 | FFC4 |
| 0000063260 | 0570 | B10D | 00D0 | A3CF | 4DA9 | 0B09 | 0110 | 932E |
| 0000063300 | 186B | 936E | B5AB | 00D0 | 936E | B5A9 | 00A0 | 1029 |
| 0000063320 | 932E | 0D5F | E690 | FFC3 | 0570 | B10D | 0150 | B5A9 |
| 0000063340 | 0150 | 1029 | CB04 | 09C8 | FFF2 | C000 | 00AA | B5A9 |
| 0000063360 | 00A0 | 1029 | B12D | 0130 | B5A9 | 00A0 | 1049 | 812D |
| 0000063400 | 85A9 | B5A7 | 00B0 | 48E9 | C576 | A3CF | 85AB | 936E |
| 0000063420 | 0D5F | 2D50 | FFC4 | B30D | 0030 | A3CF | 0570 | B5A9 |
| 0000063440 | 0110 | 932E | 936E | 0D5F | 2F10 | FFC4 | B7A7 | 0030 |
| 0000063460 | 48E8 | CA25 | 1089 | 0570 | B12D | 0010 | B5A9 | 0010 |

THU MAR 14 17:37:32 1991 GSPMON.4 PAGE 29, LINE 1653

| | | | | | | | | |
|---|---|---|---|---|---|---|---|---|
| 0000063500 | 0550 | 05A7 | 8F00 | FFC9 | 48E9 | C91C | A3CF | 0570 |
| 0000063520 | B5AB | 0010 | 936E | 85A9 | 932E | 0D5F | 2F10 | FFC4 |
| 0000063540 | B7A7 | 0030 | 48E8 | CA0E | 108B | 0570 | B16D | 0010 |
| 0000063560 | 0550 | 05A7 | 8F00 | FFC9 | 48EB | C8E8 | C003 | 0570 |
| 0000063600 | B12D | 0010 | 0570 | B5AB | 0010 | 0550 | 05A9 | 8F00 |
| 0000063620 | FFC9 | 492B | C803 | B12D | 0110 | C02D | 44E7 | B0ED |
| 0000063640 | 00E0 | A3CF | 4DA7 | 0B07 | 00E0 | 92EE | 1867 | 92EE |
| 0000063660 | 936E | 0570 | 85A7 | 92EE | 0D5F | E690 | FFC3 | 0570 |
| 0000063700 | B10D | 0150 | B5A9 | 0150 | 1029 | CB03 | 09C8 | FFF2 |
| 0000063720 | C038 | B5A9 | 00E0 | B5A7 | 0110 | 48E9 | C605 | B12D |
| 0000063740 | 0110 | B9AD | 0000 | 0130 | 85A7 | 1027 | 80ED | B5A9 |
| 0000063760 | 00B0 | 4927 | C48A | B7AB | FFC0 | 0550 | B9AB | 0100 |
| 0000064000 | 0000 | B9AB | 00A0 | 0010 | 0570 | B5A9 | 0110 | B5A7 |
| 0000064020 | 0100 | 44E9 | 1029 | B12B | 0020 | B9AB | 0020 | 0030 |
| 0000064040 | B5A9 | 0130 | B5A7 | 00A0 | 44E9 | B7A7 | FFA0 | 8127 |
| 0000064060 | B5A9 | 0120 | B5A7 | 00A0 | 44E9 | B7A7 | FF80 | 8127 |
| 0000064100 | 1848 | B7EE | 00A0 | 09AF | 2A80 | 0962 | 098F | 0554 |
| 0000064120 | 4DCD | 0B0E | 01D0 | A3CF | B7AB | FFE0 | 0550 | B569 |
| 0000064140 | 0020 | 1429 | 2429 | 8567 | 4127 | 92EE | B569 | 0010 |
| 0000064160 | B567 | 0030 | 40E9 | 0570 | B5A7 | FF40 | 40E9 | 932E |
| 0000064200 | 0D5F | 2F10 | FFC4 | A3CF | 0550 | 8569 | B565 | 0020 |
| 0000064220 | 44A9 | 932E | B569 | 0010 | B565 | 0030 | 40A9 | 40E9 |
| 0000064240 | 932E | 4D09 | 0D5F | 2F10 | FFC4 | 4909 | 1829 | CB01 |
| 0000064260 | 4529 | 0541 | B12D | 0140 | A3CF | 0550 | B569 | 0020 |
| 0000064300 | 1429 | 2429 | 8565 | 4125 | 92AE | B569 | 0010 | B565 |
| 0000064320 | 0030 | 40A9 | 40E9 | 1429 | 932E | 0D5F | 2F10 | FFC4 |
| 0000064340 | A3CF | 0550 | 8569 | B565 | 0020 | 44A9 | 932E | B569 |
| 0000064360 | 0010 | B565 | 0030 | 40A9 | 40E9 | 1429 | 932E | 4D09 |
| 0000064400 | 0D5F | 2F10 | FFC4 | 4909 | 1829 | CB01 | 4529 | 0541 |
| 0000064420 | B12D | 0130 | A3CF | 0550 | B569 | 0020 | 1429 | 2429 |
| 0000064440 | 8565 | 4125 | 92AE | B569 | 0010 | B565 | 0030 | 40A9 |
| 0000064460 | 40E9 | 1449 | 932E | 0D5F | 2F10 | FFC4 | A3CF | 0550 |
| 0000064500 | 8569 | B565 | 0020 | 44A9 | 932E | B569 | 0010 | B565 |
| 0000064520 | 0030 | 40A9 | 40E9 | 1449 | 932E | 4D09 | 0D5F | 2F10 |
| 0000064540 | FFC4 | 4909 | 1829 | CB01 | 4529 | 0541 | B12D | 0160 |
| 0000064560 | A3CF | 0550 | B569 | 0020 | 1429 | 2429 | 8565 | 4125 |
| 0000064600 | 92AE | B569 | 0010 | B565 | 0030 | 40A9 | 40E9 | 1469 |
| 0000064620 | 932E | 0D5F | 2F10 | FFC4 | A3CF | 0550 | 8569 | B565 |
| 0000064640 | 0020 | 44A9 | 932E | B569 | 0010 | B565 | 0030 | 40A9 |
| 0000064660 | 40E9 | 1469 | 932E | 4D09 | 0D5F | 2F10 | FFC4 | 4909 |
| 0000064700 | 1829 | CB01 | 4529 | 0541 | B12D | 0180 | A3CF | 0550 |
| 0000064720 | B569 | 0020 | 1429 | 2429 | 8565 | 4125 | 92AE | B569 |
| 0000064740 | 0010 | B565 | 0030 | 40A9 | 40E9 | B565 | 0030 | 44A9 |
| 0000064760 | 932E | 0D5F | 2F10 | FFC4 | A3CF | 0550 | 8569 | B565 |
| 0000065000 | 0020 | 44A9 | 932E | B569 | 0010 | B565 | 0030 | 40A9 |
| 0000065020 | 40E9 | B565 | 0030 | 44A9 | 932E | 4D09 | 0D5F | 2F10 |
| 0000065040 | FFC4 | 4909 | 1829 | CB01 | 4529 | 0541 | B12D | 0110 |
| 0000065060 | A3CF | 0550 | B569 | 0020 | 1429 | 2429 | 8565 | 4125 |
| 0000065100 | 92AE | B569 | 0010 | B565 | 0030 | 40A9 | 40E9 | B565 |
| 0000065120 | 0030 | 44A9 | 1029 | 932E | 0D5F | 2F10 | FFC4 | A3CF |
| 0000065140 | 0550 | 8569 | B565 | 0020 | 44A9 | 932E | B569 | 0010 |
| 0000065160 | B565 | 0030 | 40A9 | 40E9 | B565 | 0030 | 44A9 | 1029 |
| 0000065200 | 932E | 4D09 | 0D5F | 2F10 | FFC4 | 4909 | 1829 | CB01 |
| 0000065220 | 4529 | 0541 | B12D | 0120 | A3CF | 0550 | B569 | 0020 |
| 0000065240 | 1429 | 2429 | 8565 | 4125 | 92AE | B569 | 0010 | B565 |
| 0000065260 | 0030 | 40A9 | 40E9 | B565 | 0030 | 44A9 | 1429 | 932E |
| 0000065300 | 0D5F | 2F10 | FFC4 | A3CF | 0550 | 8569 | B565 | 0020 |
| 0000065320 | 44A9 | 932E | B569 | 0010 | B565 | 0030 | 40A9 | 40E9 |
| 0000065340 | B565 | 0030 | 44A9 | 1429 | 932E | 4D09 | 0D5F | 2F10 |

THU MAR 14 17:37:32 1991 GSPMON.4 PAGE 30, LINE 1712

| | | | | | | | | |
|---|---|---|---|---|---|---|---|---|
| 0000065360 | FFC4 | 4909 | 1829 | CB01 | 4529 | 0541 | B12D | 0150 |
| 0000065400 | A3CF | 0550 | B569 | 0020 | 1429 | 2429 | 8565 | 4125 |
| 0000065420 | 92AE | B569 | 0010 | B565 | 0030 | 40A9 | 40E9 | B565 |
| 0000065440 | 0030 | 44A9 | 1449 | 932E | 0D5F | 2F10 | FFC4 | A3CF |
| 0000065460 | 0550 | 8569 | B565 | 0020 | 44A9 | 932E | B569 | 0010 |
| 0000065500 | B565 | 0030 | 40A9 | 40E9 | B565 | 0030 | 44A9 | 1449 |
| 0000065520 | 932E | 4D09 | 0D5F | 2F10 | FFC4 | 4909 | 1829 | CB01 |
| 0000065540 | 4529 | 0541 | B12D | 0170 | A3CF | 0550 | B569 | 0020 |
| 0000065560 | 1429 | 2429 | 8565 | 4125 | 92AE | B569 | 0010 | B565 |
| 0000065600 | 0030 | 40A9 | 932E | 0D5F | 2F10 | FFC4 | A3CF | 0550 |
| 0000065620 | 8569 | B565 | 0020 | 44A9 | 932E | B569 | 0010 | B565 |
| 0000065640 | 0030 | 40A9 | 932E | 4D09 | 0D5F | 2F10 | FFC4 | 4909 |
| 0000065660 | 1829 | CB01 | 4529 | 0541 | B12D | 01C0 | A3CF | 0550 |
| 0000065700 | B569 | 0020 | 1429 | 2429 | 8565 | 4125 | 92AE | B569 |
| 0000065720 | 0010 | B565 | 0030 | 40A9 | 1429 | 932E | 0D5F | 2F10 |
| 0000065740 | FFC4 | A3CF | 0550 | 8569 | B565 | 0020 | 44A9 | 932E |
| 0000065760 | B569 | 0010 | B565 | 0030 | 40A9 | 1429 | 932E | 4D09 |
| 0000066000 | 0D5F | 2F10 | FFC4 | 4909 | 1829 | CB01 | 4529 | 0541 |
| 0000066020 | B12D | 01B0 | A3CF | 0550 | B569 | 0020 | 1429 | 2429 |
| 0000066040 | 8565 | 4125 | 92AE | B569 | 0010 | B565 | 0030 | 40A9 |
| 0000066060 | 1449 | 932E | 0D5F | 2F10 | FFC4 | A3CF | 0550 | 8569 |
| 0000066100 | B565 | 0020 | 44A9 | 932E | B569 | 0010 | B565 | 0030 |
| 0000066120 | 40A9 | 1449 | 932E | 4D09 | 0D5F | 2F10 | FFC4 | 4909 |
| 0000066140 | 1829 | CB01 | 4529 | 0541 | B12D | 01A0 | A3CF | 0550 |
| 0000066160 | B569 | 0020 | 1429 | 2429 | 8565 | 4125 | 92AE | B569 |
| 0000066200 | 0010 | B565 | 0030 | 40A9 | 1469 | 932E | 0D5F | 2F10 |
| 0000066220 | FFC4 | A3CF | 0550 | 8569 | B565 | 0020 | 44A9 | 932E |
| 0000066240 | B569 | 0010 | B565 | 0030 | 40A9 | 1469 | 932E | 4D09 |
| 0000066260 | 0D5F | 2F10 | FFC4 | 4909 | 1829 | CB01 | 4529 | 0541 |
| 0000066300 | B12D | 0190 | B7A9 | FF20 | 44A5 | 0570 | 80A9 | 0541 |
| 0000066320 | B5A5 | 01C0 | CA04 | 44A5 | B0AD | 00F0 | C003 | 1825 |
| 0000066340 | B0AD | 00F0 | 4CA8 | CA00 | 00D4 | B5A5 | 01B0 | CA08 |
| 0000066360 | 1845 | 0570 | B0AD | 0060 | B96D | 0030 | 0080 | C01B |
| 0000066400 | B5A5 | 01A0 | CA0B | 1825 | 0570 | B0AD | 0060 | 0550 |
| 0000066420 | B567 | 0030 | 1427 | B0ED | 0080 | C00D | B5A5 | 0190 |
| 0000066440 | CA0A | 44A5 | 0570 | B0AD | 0060 | 0550 | B567 | 0030 |
| 0000066460 | 1447 | B0ED | 0080 | 0541 | B5A7 | 0140 | CA34 | A3CF |
| 0000066500 | 0550 | B565 | 0020 | 1425 | 2425 | 8567 | 40A7 | 92EE |
| 0000066520 | B567 | 0010 | 0570 | B5A5 | 0080 | 40A7 | B5A5 | FF40 |
| 0000066540 | 40A7 | 1427 | 92EE | 0D5F | 2F10 | FFC4 | A3CF | 0550 |
| 0000066560 | 8567 | B565 | 0020 | 44A7 | 92EE | B567 | 0010 | 0570 |
| 0000066600 | B5A5 | 0080 | 40A7 | B5A5 | FF40 | 40A7 | 1427 | 92EE |
| 0000066620 | 4D07 | 0D5F | 2F10 | FFC4 | 4907 | CA05 | 44E7 | 0541 |
| 0000066640 | B0ED | 0100 | C051 | 1827 | 0541 | B0ED | 0100 | B5A5 |
| 0000066660 | 0130 | CA05 | 1845 | 0570 | B0AD | 0050 | C045 | B5A5 |
| 0000066700 | 0160 | CA3B | 0570 | B0ED | 0050 | A3CF | 0550 | B565 |
| 0000066720 | 0020 | 1425 | 2425 | 8569 | 40A9 | 932E | B569 | 0010 |
| 0000066740 | 0570 | B5A5 | 0080 | 40A9 | B5A5 | FF40 | 40A9 | 932E |
| 0000066760 | 0D5F | 2F10 | FFC4 | A3CF | 0550 | 8569 | B565 | 0020 |
| 0000067000 | 44A9 | 932E | B569 | 0010 | 0570 | B5A5 | 0080 | 40A9 |
| 0000067020 | B5A5 | FF40 | 40A9 | 932E | 4D09 | 0D5F | 2F10 | FFC4 |
| 0000067040 | 4909 | CA05 | 0570 | 0587 | 9790 | FFC9 | C00D | 4529 |
| 0000067060 | 0570 | 0589 | 9790 | FFC9 | C007 | B5A5 | 0170 | CA04 |
| 0000067100 | 44A5 | 0570 | B0AD | 0050 | 4CE5 | CB06 | 1849 | 0570 |
| 0000067120 | B12D | 0060 | B12D | 0050 | 0570 | B5A9 | 0050 | 4D25 |
| 0000067140 | 24A9 | 2485 | 40A9 | 0B29 | 9750 | FFC9 | B5A5 | 0060 |
| 0000067160 | 2485 | 40A9 | 0550 | B565 | 0010 | 0570 | 8529 | 4525 |
| 0000067200 | B7A9 | FFC0 | B0A9 | 0010 | B7A5 | FF20 | 1827 | 80E5 |
| 0000067220 | C079 | B5A5 | 0140 | CA04 | 44A5 | B0AD | 0100 | C017 |

THU MAR 14 17:37:32 1991 GSPMON.4 PAGE 31, LINE 1771

| | | | | | | | | |
|---|---|---|---|---|---|---|---|---|
| 0000067240 | B5A5 | 0130 | CA05 | 1825 | 0570 | B0AD | 00A0 | C00F |
| 0000067260 | B5A5 | 0160 | CA05 | 1845 | 0570 | B0AD | 00A0 | C007 |
| 0000067300 | B5A5 | 0180 | CA04 | 1865 | 0570 | B0AD | 00A0 | 0541 |
| 0000067320 | B5A5 | 0170 | CA04 | 44A5 | B0AD | 0100 | C013 | B5A5 |
| 0000067340 | 0150 | CA05 | 1825 | 0570 | B0AD | 0090 | C00B | B5A5 |
| 0000067360 | 0110 | CA05 | 1845 | 0570 | B0AD | 0090 | C003 | 44A5 |
| 0000067400 | B0AD | 0100 | 0541 | B5A5 | 0100 | CA3C | 0570 | B5A5 |
| 0000067420 | 00A0 | 3885 | B5A5 | 0090 | 1425 | CA08 | B5A5 | 00A0 |
| 0000067440 | 1465 | CB09 | B5A5 | 0090 | 1445 | CB05 | 44A5 | 0541 |
| 0000067460 | B0AD | 0100 | C027 | 1825 | 0541 | B0AD | 0100 | 0570 |
| 0000067500 | B5A5 | 0090 | 3885 | 1825 | B0AD | 0070 | C003 | 44A5 |
| 0000067520 | B0AD | 0070 | 0550 | B565 | 0010 | B567 | 0030 | 40E5 |
| 0000067540 | 0570 | B5A7 | FF40 | 40E5 | 0550 | B567 | 0030 | 44E5 |
| 0000067560 | 0570 | B5A7 | 0070 | 44E5 | B7A7 | FFC0 | B0A7 | 0010 |
| 0000067600 | 1845 | 80A9 | B7A9 | FF20 | 0570 | 8527 | 1487 | CA00 |
| 0000067620 | 00B4 | B7A7 | FFC0 | 0550 | B4E5 | 0010 | 0570 | B5A7 |
| 0000067640 | FF80 | 40E5 | B0AD | 00D0 | 0550 | 8565 | B567 | 0020 |
| 0000067660 | 44E5 | 80AD | B567 | 0020 | 1427 | 2427 | 8565 | 40E5 |
| 0000067700 | 0570 | 85A7 | 48A7 | C91A | A3CF | 0570 | 85AB | 936E |
| 0000067720 | B5A9 | 00D0 | 932E | 0D5F | 30D0 | FFC4 | 4D05 | CB0E |
| 0000067740 | 108B | 0570 | 816D | B7A7 | FFE0 | 0550 | B4E5 | 0020 |
| 0000067760 | 1425 | 2425 | 84E7 | 40A7 | 48EB | C8E6 | A3CF | 4DAB |
| 0000070000 | 0B0B | 00B0 | 936E | 1849 | 932E | 0570 | 85A7 | 92EE |
| 0000070020 | B5A5 | 00D0 | 92AE | 0D5F | E690 | FFC3 | 0570 | B10D |
| 0000070040 | 0040 | B5A9 | 0040 | 1029 | CB03 | 09C8 | FFF2 | C066 |
| 0000070060 | B7A9 | FFC0 | 0550 | B52B | 0010 | 0570 | B5A5 | FFA0 |
| 0000070100 | 40AB | B16D | 00E0 | B7AB | FFE0 | 0550 | B565 | 0020 |
| 0000070120 | 1425 | 2425 | 8567 | 40A7 | 80ED | 8567 | B565 | 0020 |
| 0000070140 | 44A7 | 0570 | 85A5 | 48E5 | C218 | A3CF | 0570 | 85AB |
| 0000070160 | 936E | B5A9 | 00E0 | 932E | 0D5F | 30D0 | FFC4 | 4D05 |
| 0000070200 | CB0C | 148B | 0570 | 816D | B7A7 | FFE0 | 0550 | 84E5 |
| 0000070220 | B4E7 | 0020 | 44E5 | 48AB | C3E8 | A3CF | 4DAB | 0B0B |
| 0000070240 | 00C0 | 936E | 1869 | 932E | 0570 | 85A7 | 92EE | B5A5 |
| 0000070260 | 00E0 | 92AE | 0D5F | E690 | FFC3 | 0570 | B10D | 0040 |
| 0000070300 | B5A9 | 0040 | 1029 | CB03 | 09C8 | FFF2 | C017 | B5A9 |
| 0000070320 | 00C0 | B5AB | 00B0 | 4569 | B7A5 | FFE0 | 0550 | B4A5 |
| 0000070340 | 0020 | 1029 | 1045 | 48A9 | C205 | B7A9 | FF20 | 1885 |
| 0000070360 | 80A9 | C003 | B7A9 | FFC0 | 8169 | 4508 | B7EE | 00C0 |
| 0000070400 | 09AF | 2AA0 | 0962 | 098F | 0154 | 4DCD | 0B0E | 0180 |
| 0000070420 | 456B | 0570 | B16D | 0010 | B16D | 00D0 | 0550 | 05A9 |
| 0000070440 | 8F00 | FFC9 | B12D | 00C0 | A3CF | 05A9 | 8EC0 | FFC9 |
| 0000070460 | 932E | 0D5F | 2D50 | FFC4 | B30D | 0050 | A3CF | 1829 |
| 0000070500 | 932E | 930E | 0550 | 05A9 | 8EC0 | FFC9 | 932E | 05A9 |
| 0000070520 | 8ED0 | FFC9 | 932E | 0D5F | 1760 | FFC4 | 0570 | B10D |
| 0000070540 | 0080 | 0508 | B10D | 00B0 | 07A9 | 8F20 | FFC9 | 8729 |
| 0000070560 | 0B89 | 0000 | FFC0 | B32D | 0050 | A3CF | 936E | 932E |
| 0000070600 | 930E | 0550 | 05A9 | 8ED0 | FFC9 | 932E | 0D5F | 1760 |
| 0000070620 | FFC4 | 0570 | B10D | 0070 | 0508 | B10D | 00A0 | B7AB |
| 0000070640 | FFC0 | B5A9 | C070 | 0550 | B567 | 0030 | 4127 | A3CF |
| 0000070660 | 0570 | B5A9 | FF20 | 932E | 0D5F | 6C40 | FFC6 | 4107 |
| 0000070700 | 0550 | 05A9 | 8EC0 | FFC9 | 4927 | C311 | 0570 | B5A7 |
| 0000070720 | 0070 | 0550 | B56B | 0030 | 40EB | A3CF | 0570 | B5A7 |
| 0000070740 | FF20 | 92EE | 0D5F | 6C40 | FFC6 | 410B | C001 | 4D2B |
| 0000070760 | 0570 | B16D | 0090 | B9AD | 0070 | 0000 | 456B | B16D |
| 0000071000 | 0040 | B16D | 0030 | 85A9 | B5A7 | 0090 | 48E9 | C522 |
| 0000071020 | A3CF | 85AB | 936E | 0D5F | 2D50 | FFC4 | A3CF | 102B |
| 0000071040 | 936E | 4D0B | 0D5F | 2D50 | FFC4 | 490B | CA06 | 0570 |
| 0000071060 | B5AB | 0030 | 102B | B16D | 0030 | 0570 | B5AB | 0040 |
| 0000071100 | 102B | B16D | 0040 | 85A9 | 1029 | 812D | B5A7 | 0090 |

THU MAR 14 17:37:32 1991 GSPMON.4 PAGE 32, LINE 1830

| | | | | | | | | |
|---|---|---|---|---|---|---|---|---|
| 0000071120 | 48E9 | C4DE | A3CF | 932E | 0D5F | 2D50 | FFC4 | B7A7 |
| 0000071140 | 0050 | 48E8 | CB12 | A3CF | 1429 | 932E | 0D5F | 2D50 |
| 0000071160 | FFC4 | 48E8 | CB0A | A3CF | 0570 | 85A9 | 1449 | 932E |
| 0000071200 | 0D5F | 2D50 | FFC4 | 48E8 | CA15 | 2BEB | 0570 | B5A9 |
| 0000071220 | 0030 | 4969 | C60F | B5AB | 0010 | 24CB | 0B2B | 90C0 |
| 0000071240 | FFC9 | B9AB | 0070 | 0010 | B5AB | 0010 | 102B | B16D |
| 0000071260 | 0010 | C07E | A3CF | 0570 | B5AB | 0070 | 936E | 0D5F |
| 0000071300 | 2D50 | FFC4 | B30D | 0050 | A3CF | 936E | 1829 | 932E |
| 0000071320 | 930E | 0550 | 05A7 | 8F00 | FFC9 | 92EE | 05A9 | 8EE0 |
| 0000071340 | FFC9 | 932E | 0D5F | 2150 | FFC4 | 0570 | B10D | 0150 |
| 0000071360 | A3CF | 4DA9 | 0B09 | 0150 | 932E | 1867 | 92EE | B5A7 |
| 0000071400 | 0150 | 92EE | 936E | 0D5F | E690 | FFC3 | 0570 | B10D |
| 0000071420 | 0140 | B5A9 | 0140 | 1029 | CB04 | 09C8 | FFF2 | C000 |
| 0000071440 | 033B | B5A9 | 00D0 | 4927 | C701 | 4D27 | B0ED | 00D0 |
| 0000071460 | A3CF | 0550 | 05A9 | 8EE0 | FFC9 | 932E | 936E | 0D5F |
| 0000071500 | 2F10 | FFC4 | B30D | 0050 | A3CF | 936E | 4529 | 932E |
| 0000071520 | 930E | 0550 | 05A7 | 8F00 | FFC9 | 92EE | 05A9 | 8EE0 |
| 0000071540 | FFC9 | 932E | 0D5F | 2150 | FFC4 | 0570 | B10D | 0150 |
| 0000071560 | A3CF | 4DA9 | 0B09 | 0150 | 932E | 1847 | 92EE | B5A7 |
| 0000071600 | 0150 | 92EE | 936E | 0D5F | E690 | FFC3 | 0570 | B10D |
| 0000071620 | 0140 | B5A9 | 0140 | 1029 | CB04 | 09C8 | FFF2 | C000 |
| 0000071640 | 02FB | B5A9 | 00C0 | 4927 | C601 | 4D27 | B0ED | 00C0 |
| 0000071660 | B5AB | 0010 | 154B | C404 | 09C8 | 0040 | C000 | 02EC |
| 0000071700 | 85AB | 104B | B16D | 0070 | A3CF | B5AB | 0070 | 142B |
| 0000071720 | 936E | 0D5F | 2D50 | FFC4 | B30D | 0050 | A3CF | 456B |
| 0000071740 | 936E | 930E | 0570 | B5A9 | 0080 | 932E | B5A7 | 0070 |
| 0000071760 | 92EE | 0D5F | 1760 | FFC4 | 0570 | B10D | 0070 | B5A7 |
| 0000072000 | 0070 | 44E9 | B7AB | FFC0 | B567 | 0030 | B5AB | FF20 |
| 0000072020 | 4167 | 1029 | 48E9 | C500 | FEC2 | B9AD | 0010 | 0160 |
| 0000072040 | 456B | B16D | 0020 | B5A9 | 0160 | 492B | C500 | 0103 |
| 0000072060 | B5AB | 0020 | 24CB | 0B2B | 90C0 | FFC9 | 0550 | B56B |
| 0000072100 | 0010 | 0570 | B5A9 | FF60 | 412B | 0550 | 05A7 | 8EC0 |
| 0000072120 | FFC9 | 48EB | C30C | 0570 | B5AB | 0020 | 24CB | 0B2B |
| 0000072140 | 90C0 | FFC9 | 0550 | B56B | 0010 | 412B | C001 | 4CEB |
| 0000072160 | B16D | 0120 | 0570 | B5AB | 0020 | 24CB | 0B2B | 90C0 |
| 0000072200 | FFC9 | 0550 | B56B | 0010 | 0570 | B5A9 | FF80 | 412B |
| 0000072220 | 48EB | C30B | B5AB | 0020 | 24CB | 0B2B | 90C0 | FFC9 |
| 0000072240 | 0550 | B56B | 0010 | 412B | C001 | 4CEB | 0570 | B16D |
| 0000072260 | 0130 | B5AB | 0020 | 0B2B | 9350 | FFC9 | 4529 | 0541 |
| 0000072300 | 812B | 0550 | 05AB | 8F00 | FFC9 | B16D | 0110 | A3CF |
| 0000072320 | 0570 | B5A9 | 0110 | 932E | B5A9 | 0130 | 932E | 0D5F |
| 0000072340 | 2F10 | FFC4 | B30D | 0050 | A3CF | 932E | 182B | 936E |
| 0000072360 | 930E | 0550 | 05A7 | 8F00 | FFC9 | 92EE | 05AB | 8EE0 |
| 0000072400 | FFC9 | 936E | 0D5F | 2150 | FFC4 | 0570 | B10D | 00F0 |
| 0000072420 | A3CF | 4DAB | 0B0B | 0110 | 936E | 1867 | 92EE | B5A7 |
| 0000072440 | 00F0 | 92EE | 932E | 0D5F | E690 | FFC3 | 0570 | B10D |
| 0000072460 | 0140 | B5AB | 0140 | 102B | CB04 | 09C8 | FFF2 | C000 |
| 0000072500 | 022B | B5AB | 0110 | B5A7 | 00D0 | 48EB | C701 | 4CEB |
| 0000072520 | B16D | 00D0 | A3CF | B5AB | 0120 | 142B | 936E | 0D5F |
| 0000072540 | 2D50 | FFC4 | B30D | 0050 | A3CF | 0570 | B5AB | 0120 |
| 0000072560 | 936E | 44E7 | 92EE | 930E | B5A7 | 0110 | 92EE | 0550 |
| 0000072600 | 05A7 | 8EE0 | FFC9 | 92EE | 0D5F | 2150 | FFC4 | 0570 |
| 0000072620 | B10D | 00E0 | A3CF | 4DA7 | 0B07 | 0100 | 92EE | 1847 |
| 0000072640 | 92EE | B5A7 | 00E0 | 92EE | 936E | 0D5F | E690 | FFC3 |
| 0000072660 | 0570 | B10D | 0140 | B5A7 | 0140 | 1027 | CB04 | 09C8 |
| 0000072700 | FFF2 | C000 | 01E9 | B5A7 | 0100 | B5A9 | 00C0 | 4927 |
| 0000072720 | C601 | 4D27 | B0ED | 00C0 | B7A9 | FFC0 | A3CF | B5A7 |
| 0000072740 | FF40 | 92EE | 0D5F | 6C40 | FFC6 | 0550 | B527 | 0020 |
| 0000072760 | 4107 | 0570 | B5A9 | 0110 | B5AB | 0100 | 4569 | 48E9 |

THU MAR 14 17:37:32 1991 GSPMON.4 PAGE 33, LINE 1889

| | | | | | | | | |
|---|---|---|---|---|---|---|---|---|
| 0000073000 | C310 | B5A9 | 0020 | 0B29 | 9350 | FFC9 | 1827 | 0541 |
| 0000073020 | 80E9 | 0570 | B5A9 | 0020 | 24C9 | 0B29 | 90C0 | FFC9 |
| 0000073040 | 8169 | B5A9 | 0020 | 1029 | B12D | 0020 | B5A7 | 0160 |
| 0000073060 | 48E9 | C400 | FEFD | 456B | 058B | 9340 | FFC9 | 816D |
| 0000073100 | B5A9 | 0160 | 492B | C577 | 85AB | 0B2B | 9350 | FFC9 |
| 0000073120 | 0541 | 856B | 0D8B | 0023 | 0570 | B5AB | FF20 | C517 |
| 0000073140 | 85A9 | 24C9 | 0B29 | 90C0 | FFC9 | 1209 | 0550 | 8527 |
| 0000073160 | 4567 | 80E9 | 0570 | 85A9 | 24C9 | 0B29 | 90C0 | FFC9 |
| 0000073200 | 0550 | 8527 | 0570 | B5AB | FF40 | 4567 | 80E9 | 05AB |
| 0000073220 | 9340 | FFC9 | 102B | 058B | 9340 | FFC9 | C045 | 0570 |
| 0000073240 | B9AD | 0000 | 0010 | B5AB | 0160 | B5A9 | 0010 | 1029 |
| 0000073260 | 4969 | C535 | B5AB | 0010 | 0B2B | 9350 | FFC9 | B5A9 |
| 0000073300 | 0010 | 0B29 | 9351 | FFC9 | 0541 | 892B | 0570 | B5AB |
| 0000073320 | 0010 | 24CB | 0B2B | 90C0 | FFC9 | B5A9 | 0010 | 1029 |
| 0000073340 | 24C9 | 0B29 | 90C0 | FFC9 | 892B | B5AB | 0010 | 24CB |
| 0000073360 | 0B2B | 90C0 | FFC9 | B5A9 | 0010 | 1029 | 24C9 | 0B29 |
| 0000073400 | 90C0 | FFC9 | B92B | 0010 | 0010 | B5AB | 0010 | 102B |
| 0000073420 | B16D | 0010 | B5A9 | 0160 | 102B | 492B | C4CB | B5AB |
| 0000073440 | 0160 | 142B | B16D | 0160 | 85AB | 102B | 816D | B5A9 |
| 0000073460 | 0160 | 492B | C489 | 44E7 | 0541 | B0ED | 0170 | 0570 |
| 0000073500 | B5A7 | FFE0 | C66A | 44E7 | 80ED | 05AB | 9340 | FFC9 |
| 0000073520 | 4967 | C563 | 0541 | B5A9 | 0170 | CB5F | 456B | 0570 |
| 0000073540 | B16D | 0010 | 05A9 | 95E0 | FFC9 | 492B | C549 | A3CF |
| 0000073560 | B5AB | 0010 | 24CB | 0B2B | 9360 | FFC9 | 0550 | 856B |
| 0000073600 | 0570 | B5A9 | FF40 | 412B | 85A7 | 24C7 | 0B27 | 90C0 |
| 0000073620 | FFC9 | 0550 | 84E7 | 44EB | 936E | 0D5F | 6C40 | FFC6 |
| 0000073640 | 1448 | C723 | A3CF | 0570 | B5AB | 0010 | 24CB | 0B2B |
| 0000073660 | 9360 | FFC9 | 0550 | B56B | 0010 | 0570 | B5A7 | FF20 |
| 0000073700 | 40EB | 85A7 | 24C7 | 0B27 | 90C0 | FFC9 | 0550 | B4E7 |
| 0000073720 | 0010 | 44EB | 936E | 0D5F | 6C40 | FFC6 | 1448 | C705 |
| 0000073740 | 182B | 0541 | B16D | 0170 | C00B | 0570 | B5AB | 0010 |
| 0000073760 | 102B | B16D | 0010 | 05A7 | 95E0 | FFC9 | 48EB | C4B7 |
| 0000074000 | 0570 | 85AB | 102B | 816D | 05A9 | 9340 | FFC9 | 492B |
| 0000074020 | C504 | 0541 | B5A7 | 0170 | CAA1 | 0570 | 05C0 | 9340 |
| 0000074040 | FFC9 | 95E0 | FFC9 | 456B | B16D | 0010 | 05A9 | 95E0 |
| 0000074060 | FFC9 | 492B | C533 | B5AB | 0010 | 0B2B | 95F0 | FFC9 |
| 0000074100 | B5A9 | 0010 | 0B29 | 9350 | FFC9 | 0541 | 892B | 0570 |
| 0000074120 | B5AB | 0010 | 24CB | 0B2B | 9360 | FFC9 | B5A9 | 0010 |
| 0000074140 | 24C9 | 0B29 | 90C0 | FFC9 | 892B | B5AB | 0010 | 24CB |
| 0000074160 | 0B2B | 9360 | FFC9 | B5A9 | 0010 | 24C9 | 0B29 | 90C0 |
| 0000074200 | FFC9 | B92B | 0010 | 0010 | B5AB | 0010 | 102B | B16D |
| 0000074220 | 0010 | 05A9 | 95E0 | FFC9 | 492B | C4CD | 44E7 | B0ED |
| 0000074240 | 0140 | 05AB | 9340 | FFC9 | CB1C | B7A7 | FFA0 | B9A7 |
| 0000074260 | 00C0 | 0000 | B9A7 | 00A0 | 0010 | B5A9 | 00D0 | B5AB |
| 0000074300 | 00C0 | 4569 | 1029 | B127 | 0020 | B5A9 | 00B0 | B5AB |
| 0000074320 | 00A0 | 4569 | 1029 | B127 | 0030 | 1889 | B12D | 0140 |
| 0000074340 | C02C | 3A0B | B7AB | FFA0 | 0550 | 05A7 | 90C0 | FFC9 |
| 0000074360 | 80EB | 05A7 | 90D0 | FFC9 | B0EB | 0010 | 182B | B16D |
| 0000074400 | 0140 | C01B | B7AB | FFA0 | B9AB | 00C0 | 0000 | B9AB |
| 0000074420 | 00A0 | 0010 | B5A7 | 00D0 | B5A9 | 00C0 | 4527 | 1027 |
| 0000074440 | B0EB | 0020 | B5A7 | 00B0 | B5A9 | 00A0 | 4527 | 1027 |
| 0000074460 | B0EB | 0030 | 1847 | B0ED | 0140 | B7AB | FFC0 | 0550 |
| 0000074500 | B569 | 0030 | 2429 | 0570 | B5A7 | 00A0 | 4927 | C905 |
| 0000074520 | B5A9 | 0140 | 1109 | B12D | 0140 | 0550 | B569 | 0030 |
| 0000074540 | 2449 | 05A7 | 8EC0 | FFC9 | 4527 | 0570 | B5A9 | 00A0 |
| 0000074560 | 48E9 | C205 | B5A7 | 0140 | 1207 | B0ED | 0140 | 0541 |
| 0000074600 | B5A7 | 0170 | CA06 | 0570 | B5A7 | 0140 | 1007 | B0ED |
| 0000074620 | 0140 | 0570 | B5A8 | 0140 | B7EE | 00A0 | 09AF | 2A80 |
| 0000074640 | 0962 | 098F | 0054 | 4DCD | 0B0E | 0040 | 0550 | B5AB |

THU MAR 14 17:37:32 1991 GSPMON.4 PAGE 34, LINE 1948

| | | | | | | | | |
|---|---|---|---|---|---|---|---|---|
| 0000074660 | FFA0 | 146B | CA07 | B5AB | FFA0 | 144B | CA03 | 09C8 |
| 0000074700 | FFFF | C06D | B5AB | FFE0 | 05A9 | 8EC0 | FFC9 | 492B |
| 0000074720 | C307 | B5AB | FFC0 | 05A9 | 6D60 | FFD2 | 492B | C203 |
| 0000074740 | 09C8 | FFFF | C05C | 2FCB | 244B | 816D | A3CF | B5AB |
| 0000074760 | FFC0 | 936E | B5AB | FFE0 | 936E | 0D5F | 30D0 | FFC4 |
| 0000075000 | 0550 | B10D | 0010 | B5A9 | 0010 | CB02 | 1828 | C047 |
| 0000075020 | B5A9 | FFA0 | 1449 | CB1E | B5A9 | 0010 | 19EB | 512B |
| 0000075040 | CA03 | 85AB | 816D | C037 | 0B89 | FF0F | FFFF | CA04 |
| 0000075060 | 85AB | 102B | 816D | C02F | B5AB | 0010 | 0B8B | F0FF |
| 0000075100 | FFFF | CA04 | 85AB | 104B | 816D | C025 | 85AB | 106B |
| 0000075120 | 816D | C021 | B5A9 | FFA0 | 1469 | CB1D | B5A9 | 0010 |
| 0000075140 | 0B89 | 0FFF | FFFF | CA04 | 85A9 | 1069 | 812D | C013 |
| 0000075160 | B5A9 | 0010 | 0B89 | F0FF | FFFF | CA04 | 85A9 | 1049 |
| 0000075200 | 812D | C009 | B5A9 | 0010 | 0B89 | FF0F | FFFF | CA03 |
| 0000075220 | 85A9 | 1029 | 812D | B7AB | FF80 | 89AB | 4508 | B7EE |
| 0000075240 | 0080 | 09AF | 2A00 | 0962 | 098F | 0054 | 4DCD | 100E |
| 0000075260 | 456B | 078B | 8F80 | FFC9 | B7A9 | FFE0 | BB2D | 0010 |
| 0000075300 | 0000 | 0550 | 8529 | 0589 | 8F60 | FFC9 | CA04 | 1829 |
| 0000075320 | 0589 | 8F60 | FFC9 | A3CF | D3AE | 0000 | 0D5F | 2190 |
| 0000075340 | FFC6 | A3CF | 1829 | 932E | 0D5F | 1D30 | FFC6 | 1909 |
| 0000075360 | 0550 | 0589 | 8F50 | FFC9 | 4D68 | B7EE | 0080 | 09AF |
| 0000075400 | 2A00 | 0962 | 098F | 0054 | 4DCD | 100E | 456B | 078B |
| 0000075420 | 8F80 | FFC9 | B7A9 | FFE0 | 0550 | B529 | 0040 | 0589 |
| 0000075440 | 9020 | FFC9 | B7A9 | FFE0 | BB2D | 0090 | 0000 | 058B |
| 0000075460 | 8F60 | FFC9 | A3CF | D3AE | 0000 | 0D5F | 2190 | FFC6 |
| 0000075500 | A3CF | 182B | 936E | 0D5F | 1D30 | FFC6 | 188B | 0550 |
| 0000075520 | 058B | 8F5C | rFC9 | 4508 | B7EE | 0080 | 09AF | 2A00 |
| 0000075540 | 0962 | 098F | 0154 | 4DCD | 100E | 456B | 078B | 8F80 |
| 0000075560 | FFC9 | B7A9 | FFE0 | 0550 | 8527 | 0587 | 8FA0 | FFC9 |
| 0000075600 | B529 | 0010 | 0589 | 8FB0 | FFC9 | B7A7 | FFE0 | B4E7 |
| 0000075620 | 0020 | 0587 | 8FC0 | FFC9 | B7A7 | FFE0 | B4E7 | 0030 |
| 0000075640 | 0587 | 8FD0 | FFC9 | 058B | 8F60 | FFC9 | B7A7 | FFE0 |
| 0000075660 | 0570 | B4E7 | 0050 | 0587 | 9060 | FFC9 | B7A7 | FFE0 |
| 0000075700 | B4E7 | 0060 | 0587 | 9070 | FFC9 | B7A7 | FFE0 | 0550 |
| 0000075720 | B4E7 | 0040 | 0587 | 9030 | FFC9 | B7A7 | FFE0 | 0570 |
| 0000075740 | B4E7 | 0070 | 0587 | 9040 | FFC9 | B7A7 | FFE0 | B4E7 |
| 0000075760 | 0080 | 0587 | 9050 | FFC9 | B7A7 | FFE0 | BAED | 0090 |
| 0000076000 | 0000 | A3CF | D3AE | 0000 | 0D5F | 2190 | FFC6 | A3CF |
| 0000076020 | 1829 | 932E | 0D5F | 1D30 | FFC6 | 1A09 | 0550 | 0589 |
| 0000076040 | 8F50 | FFC9 | 4D68 | B7EE | 00A0 | 09AF | 2A80 | 0962 |
| 0000076060 | 098F | 0154 | 4DCD | 100E | 456B | 078B | 8F80 | FFC9 |
| 0000076100 | B7A9 | FFE0 | 0550 | 8527 | 0587 | 8FA0 | FFC9 | B529 |
| 0000076120 | 0010 | 0589 | 8FB0 | FFC9 | B7A7 | FFE0 | B4E7 | 0020 |
| 0000076140 | 0587 | 8FC0 | FFC9 | B7A7 | FFE0 | B4E7 | 0030 | 0587 |
| 0000076160 | 8FD0 | FFC9 | 05A7 | 8FCD | FFC9 | 2FE7 | 05A9 | 8FA0 |
| 0000076200 | FFC9 | 4127 | 0587 | 90A0 | FFC9 | 05A7 | 8FD0 | FFC9 |
| 0000076220 | 2FE7 | 05A9 | 8FB0 | FFC9 | 4127 | 0587 | 90B0 | FFC9 |
| 0000076240 | 1827 | 0587 | 8F60 | FFC9 | B7A9 | FFE0 | 0570 | B529 |
| 0000076260 | 0050 | 0589 | 9060 | FFC9 | B7A9 | FFE0 | B529 | 0060 |
| 0000076300 | 0589 | 9070 | FFC9 | B7A9 | FFE0 | B529 | 0070 | 0589 |
| 0000076320 | 9040 | FFC9 | B7A9 | FFE0 | B529 | 0080 | 0589 | 9050 |
| 0000076340 | FFC9 | B7A9 | FFE0 | BB2D | 0090 | 0000 | A3CF | D3AE |
| 0000076360 | 0000 | 0D5F | 2190 | FFC6 | A3CF | 92EE | 0D5F | 1D30 |
| 0000076400 | FFC6 | 1807 | 0550 | 0587 | 8F50 | FFC9 | 4D68 | B7EE |
| 0000076420 | 00A0 | 09AF | 2A80 | 0962 | 098F | 0154 | 4DCD | 100E |
| 0000076440 | 456B | 078B | 8F80 | FFC9 | B7A9 | FFE0 | 0550 | 8527 |
| 0000076460 | 0587 | 8FA0 | FFC9 | B529 | 0010 | 0589 | 8FB0 | FFC9 |
| 0000076500 | B7A7 | FFE0 | B4E7 | 0020 | 0587 | 8FC0 | FFC9 | B7A7 |
| 0000076520 | FFE0 | B4E7 | 0030 | 0587 | 8FD0 | FFC9 | 1827 | 0587 |

THU MAR 14 17:37:32 1991 GSPMON.4 PAGE 35, LINE 2007

| | | | | | | | | |
|---|---|---|---|---|---|---|---|---|
| 0000076540 | 8F60 | FFC9 | B7A9 | FFE0 | 0570 | B529 | 0050 | 0589 |
| 0000076560 | 9060 | FFC9 | B7A9 | FFE0 | B529 | 0060 | 0589 | 9070 |
| 0000076600 | FFC9 | B7A9 | FFE0 | 0550 | B529 | 0040 | 0589 | 9020 |
| 0000076620 | FFC9 | B7A9 | FFE0 | 0570 | B529 | 0070 | 0589 | 9040 |
| 0000076640 | FFC9 | B7A9 | FFE0 | B529 | 0080 | 0589 | 9050 | FFC9 |
| 0000076660 | B7A9 | FFE0 | BB2D | 0090 | 0000 | A3CF | D3AE | 0000 |
| 0000076700 | 0D5F | 2190 | FFC6 | A3CF | 92EE | 0D5F | 1D30 | FFC6 |
| 0000076720 | 09C7 | 0040 | 0550 | 0587 | 8F50 | FFC9 | 4D68 | B7EE |
| 0000076740 | 00A0 | 09AF | 2A80 | 0962 | 098F | 0014 | 4DCD | 182B |
| 0000076760 | 0550 | 058B | 8F50 | FFC9 | 4508 | B7EE | 0060 | 09AF |
| 0000077000 | 2800 | 0962 | 098F | 0154 | 4DCD | 100E | 456B | 078B |
| 0000077020 | 8F80 | FFC9 | B7A9 | FFE0 | 0550 | 8527 | 0587 | 8FA0 |
| 0000077040 | FFC9 | B529 | 0010 | 0589 | 8FB0 | FFC9 | B7A7 | FFE0 |
| 0000077060 | B4E7 | 0020 | 0587 | 8FC0 | FFC9 | B7A7 | FFE0 | B4E7 |
| 0000077100 | 0030 | 0587 | 8FD0 | FFC9 | 05A7 | 8FC0 | FFC9 | 2FE7 |
| 0000077120 | 05A9 | 8FA0 | FFC9 | 4127 | 0587 | 90A0 | FFC9 | 05A7 |
| 0000077140 | 8FD0 | FFC9 | 2FE7 | 05A9 | 8FB0 | FFC9 | 4127 | 0587 |
| 0000077160 | 90B0 | FFC9 | B7A7 | FFE0 | 0570 | B4E7 | 0050 | 0587 |
| 0000077200 | 9060 | FFC9 | B7A7 | FFE0 | B4E7 | 0060 | 0587 | 9070 |
| 0000077220 | FFC9 | B7A7 | FFE0 | 0550 | B4E7 | 0040 | 0587 | 9020 |
| 0000077240 | FFC9 | B7A7 | FFE0 | BAED | 0090 | 0000 | A3CF | D3AE |
| 0000077260 | 0000 | 0D5F | 2190 | FFC6 | A3CF | 1829 | 932E | 0D5F |
| 0000077300 | 1D30 | FFC6 | 1849 | 0550 | 0589 | 8F50 | FFC9 | 4D68 |
| 0000077320 | B7EE | 00A0 | 09AF | 2A80 | 0962 | 098F | 0154 | 4DCD |
| 0000077340 | B7AB | FFE0 | 0550 | 8569 | 0589 | 8FE0 | FFC9 | B567 |
| 0000077360 | 0010 | 0587 | 8FF0 | FFC9 | B56B | 0020 | 058B | 9000 |
| 0000077400 | FFC9 | B7A7 | FFE0 | B4E7 | 0030 | 0587 | 9010 | FFC9 |
| 0000077420 | 4169 | 05A7 | 6D60 | FFD2 | 1429 | 1427 | 48E9 | C203 |
| 0000077440 | 09C8 | FFFF | C01F | 05A9 | 8FF0 | FFC9 | 05A7 | 9010 |
| 0000077460 | FFC9 | 40E9 | 05A7 | 6D70 | FFD2 | 1429 | 1427 | 48E9 |
| 0000077500 | C203 | 09C8 | FFFF | C00E | 4529 | 0589 | 8E10 | FFC9 |
| 0000077520 | 0D5F | B920 | FFC2 | B7AB | FFC0 | 09E7 | 8E10 | FFC9 |
| 0000077540 | 82EB | 4D28 | B7EE | 00A0 | 09AF | 2A80 | 0962 | 098F |
| 0000077560 | 0054 | 4DCD | 0D5F | AD60 | FFC4 | B7AB | FFC0 | 09E9 |
| 0000077600 | 8E10 | FFC9 | 832B | 4508 | B7EE | 0080 | 09AF | 2A00 |
| 0000077620 | 0962 | 098F | 0014 | 4DCD | 456B | 078B | 8F80 | FFC9 |
| 0000077640 | 0550 | 058B | 8E10 | FFC9 | 0542 | 058B | 8E50 | FFC9 |
| 0000077660 | 4D68 | B7EE | 0060 | 09AF | 2800 | 0962 | 098F | 0054 |
| 0000077700 | 4DCD | 100E | 0541 | B5AB | FF80 | CA4B | 0570 | B5AB |
| 0000077720 | FFC0 | B5A9 | FFE0 | 452B | 150B | C41F | B5AB | FFE0 |
| 0000077740 | B5A9 | FFC0 | 412B | 2BEB | 816D | A3CF | 85AB | 936E |
| 0000077760 | 0D5F | 2D50 | FFC4 | 0550 | B5A9 | FFA0 | 492B | CB03 |
| 0000100000 | B16D | FFC0 | C002 | B16D | FFE0 | 0570 | B5A9 | FFC0 |
| 0000100020 | B5AB | FFE0 | 4569 | 1509 | C5E1 | B9AD | FFC0 | 0010 |
| 0000100040 | B5AB | 0010 | B5A9 | FFE0 | 492B | C418 | A3CF | B5AB |
| 0000100060 | 0010 | 936E | 0D5F | 2D50 | FFC4 | 0550 | B5A9 | FFA0 |
| 0000100100 | 4928 | CA04 | 102B | 4D68 | 0528 | C052 | 142B | B16D |
| 0000100120 | 0010 | 0570 | B5A9 | FFE0 | 492B | C5E8 | 4D28 | 0528 |
| 0000100140 | C047 | 0570 | B5A9 | FFC0 | B5AB | FFE0 | 4569 | 1509 |
| 0000100160 | C41F | B5AB | FFE0 | B5A9 | FFC0 | 412B | 2BEB | 816D |
| 0000100200 | A3CF | 85AB | 936E | 0D5F | 2D50 | FFC4 | 0550 | B5A9 |
| 0000100220 | FFA0 | 4928 | CB03 | B16D | FFE0 | C002 | B16D | FFC0 |
| 0000100240 | 0570 | B5A9 | FFC0 | B5AB | FFE0 | 4569 | 1509 | C5E1 |
| 0000100260 | B16D | 0010 | B5A9 | FFC0 | 492B | C717 | A3CF | B5AB |
| 0000100300 | 0010 | 936E | 0D5F | 2D50 | FFC4 | 0550 | B5A9 | FFA0 |
| 0000100320 | 4928 | CA03 | 4D68 | 0528 | C00B | 102B | B16D | 0010 |
| 0000100340 | 0570 | B5A9 | FFC0 | 492B | C6E9 | 1029 | 4D28 | 0528 |
| 0000100360 | B7EE | 0080 | 09AF | 2A00 | 0962 | 098F | 0054 | 4DCD |
| 0000100400 | 100E | 0541 | B5AB | FF80 | CA67 | A3CF | 0570 | B5AB |

THU MAR 14 17:37:32 1991 GSPMON.4 PAGE 36, LINE 2066

| | | | | | | | | |
|---|---|---|---|---|---|---|---|---|
| 0000100420 | FFE0 | 936E | B5AB | FF60 | 936E | 0D5F | 2F10 | FFC4 |
| 0000100440 | 0550 | B5AB | FFA0 | 4968 | CB05 | B5AB | FFE0 | 4D68 |
| 0000100460 | C000 | 009E | 0570 | B5AB | FFC0 | B5A9 | FFE0 | 452B |
| 0000100500 | 150B | C622 | B5AB | FFE0 | B5A9 | FFC0 | 412B | 2BEB |
| 0000100520 | 816D | A3CF | 85AB | 936E | B5A9 | FF60 | 932E | 0D5F |
| 0000100540 | 2F10 | FFC4 | 0550 | B5A9 | FFA0 | 4928 | CB03 | B16D |
| 0000100560 | FFC0 | C002 | B16D | FFE0 | 0570 | B5A9 | FFC0 | B5AB |
| 0000100600 | FFE0 | 4569 | 1509 | C7DE | B9AD | FFC0 | 0010 | B5AB |
| 0000100620 | 0010 | B5A9 | FFE0 | 492B | C41B | A3CF | B5AB | 0010 |
| 0000100640 | 936E | B5A9 | FF60 | 932E | 0D5F | 2F10 | FFC4 | 0550 |
| 0000100660 | B5A9 | FFA0 | 4928 | CA04 | 108B | 4D68 | 0528 | C058 |
| 0000100700 | 148B | B16D | 0010 | 0570 | B5A9 | FFE0 | 492B | C5E5 |
| 0000100720 | 108B | 4D68 | 0528 | C04C | 0570 | B5A9 | FFC0 | B5AB |
| 0000100740 | FFE0 | 4569 | 1509 | C622 | B5AB | FFE0 | B5A9 | FFC0 |
| 0000100760 | 412B | 2BEB | 816D | A3CF | 85AB | 936E | B5A9 | FF60 |
| 0000101000 | 932E | 0D5F | 2F10 | FFC4 | 0550 | B5A9 | FFA0 | 4928 |
| 0000101020 | CB03 | B16D | FFE0 | C002 | B16D | FFC0 | 0570 | B5A9 |
| 0000101040 | FFC0 | B5AB | FFE0 | 4569 | 1509 | C7DE | B16D | 0010 |
| 0000101060 | B5A9 | FFC0 | 492B | C71A | A3CF | B5AB | 0010 | 936E |
| 0000101100 | B5A9 | FF60 | 932E | 0D5F | 2F10 | FFC4 | 0550 | B5A9 |
| 0000101120 | FFA0 | 4928 | CA03 | 4D68 | 0528 | C00A | 108B | B16D |
| 0000101140 | 0010 | 0570 | B5A9 | FFC0 | 492B | C6E6 | 4D28 | 0528 |
| 0000101160 | B7EE | 0080 | 09AF | 2A00 | 0962 | 098F | 0054 | 4DCD |
| 0000101200 | 0550 | B5AB | FFE0 | 07A9 | 6C60 | FFD2 | 5F2B | 248B |
| 0000101220 | 07A9 | 6D30 | FFD2 | 2449 | 4169 | 05AB | 8F10 | FFC9 |
| 0000101240 | 248B | 4169 | 852B | 4D68 | B7EE | 0080 | 09AF | 2A00 |
| 0000101260 | 0962 | 098F | 0054 | 4DCD | 0550 | B5AB | FFC0 | 07A9 |
| 0000101300 | 6C60 | FFD2 | 5F2B | 248B | 07A9 | 6D30 | FFD2 | 2449 |
| 0000101320 | 4169 | B5AB | FFE0 | 2FCB | 248B | 4169 | 852B | 4D68 |
| 0000101340 | B7EE | 0080 | 09AF | 2A00 | 0962 | 098F | 0154 | 4DCD |
| 0000101360 | 07AB | 6D30 | FFD2 | 4D69 | 2449 | 4169 | 0550 | B5AB |
| 0000101400 | FFC0 | 07A7 | 6C60 | FFD2 | 5EEB | 248B | 4169 | B5AB |
| 0000101420 | FFE0 | 2FCB | 248B | 4169 | 8528 | B7EE | 00A0 | 09AF |
| 0000101440 | 2A80 | 0962 | 098F | 0050 | 456B | 0541 | 058B | 6B50 |
| 0000101460 | FFD2 | 0550 | 05AB | 6DB0 | FFD2 | 142B | C233 | C00F |
| 0000101500 | 1AEB | 0550 | 058B | 97E0 | FFC9 | C035 | 19AB | 058B |
| 0000101520 | 9960 | FFD1 | 19EB | 058B | 97E0 | FFC9 | C02C | 0570 |
| 0000101540 | 05AB | 9960 | FFD1 | 15A8 | CAEB | C0F0 | 1AEB | 0550 |
| 0000101560 | 058B | 97E0 | FFC9 | C01F | 0D5F | 7E80 | FFC4 | 190B |
| 0000101600 | 0570 | 058B | 9960 | FFD1 | 1AEB | 058B | 97E0 | FFC9 |
| 0000101620 | C012 | 190B | 058B | 9960 | FFD1 | 19EB | 058B | 97E0 |
| 0000101640 | FFC9 | C009 | 0570 | 05A8 | 9960 | FFD1 | 1508 | CADE |
| 0000101660 | 1428 | CAE2 | C0EE | 1829 | 0589 | 9880 | FFD1 | 456B |
| 0000101700 | 058B | 9890 | FFD1 | 0550 | 05A9 | 6D60 | FFD2 | 2FA9 |
| 0000101720 | 0B89 | 003F | FFFF | 0589 | 98B0 | FFD1 | 05C0 | 98B0 |
| 0000101740 | FFD1 | 98C0 | FFD1 | 05A9 | 98B0 | FFD1 | 2FE9 | 0589 |
| 0000101760 | 98D0 | FFD1 | 05A9 | 98B0 | FFD1 | 2FE9 | 0589 | 98E0 |
| 0000102000 | FFD1 | 09E9 | 3A80 | FFC4 | 0789 | 6B60 | FFD2 | 09EB |
| 0000102020 | 4110 | FFC4 | 078B | 6B80 | FFD2 | 09AF | 0A00 | 0960 |
| 0000102040 | A36F | C057 | A3CF | 456B | 936E | 936E | 0D5F | 6660 |
| 0000102060 | FFC0 | A3CF | 936E | 0D5F | 66C0 | FFC0 | 0550 | 05AB |
| 0000102100 | 6DB0 | FFD2 | 38AB | 1AAB | 058B | 97E0 | FFC9 | C04F |
| 0000102120 | 1A2B | 058B | 97E0 | FFC9 | C04A | A3CF | 182B | 936E |
| 0000102140 | 456B | 936E | 0D5F | 6660 | FFC0 | A3CF | 182B | 936E |
| 0000102160 | 0D5F | 66C0 | FFC0 | 0550 | 05AB | 6DB0 | FFD2 | 144B |
| 0000102200 | CB05 | 1AAB | 058B | 97E0 | FFC9 | C031 | 1A6B | 058B |
| 0000102220 | 97E0 | FFC9 | C02C | A3CF | 184B | 936E | 456B | 936E |
| 0000102240 | 0D5F | 6660 | FFCD | A3CF | 184B | 936E | 0D5F | 66C0 |
| 0000102260 | FFC0 | 1AAB | 0550 | 058B | 97E0 | FFC9 | C018 | 1AEB |

THU MAR 14 17:37:32 1991 GSPMON.4 PAGE 37, LINE 2125

| | | | | | | | | |
|---|---|---|---|---|---|---|---|---|
| 0000102300 | 058B | 97E0 | FFC9 | C013 | 1AEB | 058B | 97E0 | FFC9 |
| 0000102320 | C00E | 0550 | 05A8 | 97E0 | FFC9 | 15E8 | CAA3 | 1448 |
| 0000102340 | CABC | 1448 | CAD8 | 1448 | CAEA | 1448 | CAED | 97EB |
| 0000102360 | 0960 | 098F | 0054 | 4DCD | 100E | C036 | A3CF | 194B |
| 0000102400 | 936E | 0D5F | 3FE0 | FFC0 | A3CF | 192B | 936E | 0D5F |
| 0000102420 | 3E10 | FFC0 | 456B | 836D | 0550 | 05AB | 9870 | FFD1 |
| 0000102440 | 14AB | CA30 | 05AB | 9890 | FFD1 | 3A0B | 456B | 058B |
| 0000102460 | 9880 | FFD1 | 0D5F | 4760 | FFC4 | 0550 | 058B | 9890 |
| 0000102500 | FFD1 | 1829 | 0589 | 9880 | FFD1 | 836D | 87AB | 102B |
| 0000102520 | 836D | 142B | 0B6B | 0000 | 8000 | C314 | 05AB | 9870 |
| 0000102540 | FFD1 | 14AB | CBDF | C00E | 0550 | 05A8 | 97E0 | FFC9 |
| 0000102560 | 15E8 | CA08 | 1448 | CA06 | 1448 | CA04 | 1448 | CA02 |
| 0000102600 | 1448 | CABC | A3CF | 194B | 936E | 0D5F | 3E10 | FFC0 |
| 0000102620 | 140E | 09AF | 2A00 | 0960 | 098F | 0054 | 4DCD | 0D5F |
| 0000102640 | 32A0 | FFC4 | B7AB | FFC0 | 09E9 | 97F0 | FFD1 | 832B |
| 0000102660 | 4508 | B7EE | 0080 | 09AF | 2A00 | 0962 | 098F | 0054 |
| 0000102700 | 4DCD | 0B0E | 0040 | A3CF | 192B | 936E | 0D5F | B0B0 |
| 0000102720 | FFC6 | 830D | A3CF | 09EB | 00B0 | C000 | 936E | 0D5F |
| 0000102740 | B070 | FFC6 | 0550 | B10D | 0020 | A3CF | 194B | 936E |
| 0000102760 | 0D5F | B500 | FFC6 | A3CF | 09CB | FFFF | 936E | 0D5F |
| 0000103000 | AA20 | FFC6 | C000 | 01AF | 456B | B16D | 0030 | 05A9 |
| 0000103020 | 6DB0 | FFD2 | 492B | C900 | 01C3 | A3CF | B5AB | 0030 |
| 0000103040 | 254B | 0570 | 05A9 | 9820 | FFD1 | 412B | 936E | 05AB |
| 0000103060 | 9810 | FFD1 | 936E | 05A9 | 9800 | FFD1 | 932E | 05A9 |
| 0000103100 | 97F0 | FFD1 | 932E | 0D5F | B560 | FFC6 | A3CF | 0550 |
| 0000103120 | B5AB | 0030 | 254B | 0570 | 05A9 | 9860 | FFD1 | 412B |
| 0000103140 | 936E | 05AB | 9850 | FFD1 | 936E | 05A9 | 9840 | FFD1 |
| 0000103160 | 932E | 05A9 | 9830 | FFD1 | 932E | 0D5F | B560 | FFC6 |
| 0000103200 | 0550 | B5AB | 0030 | 102B | B16D | 0030 | 05A9 | 6DB0 |
| 0000103220 | FFD2 | 492B | C8C2 | C000 | 0183 | 456B | B16D | 0030 |
| 0000103240 | 05A9 | 6DB0 | FFD2 | 492B | C900 | 017A | A3CF | B5AB |
| 0000103260 | 0030 | 254B | 0570 | 05A9 | 9820 | FFD1 | 412B | 936E |
| 0000103300 | 05AB | 9810 | FFD1 | 936E | 05A9 | 9800 | FFD1 | 932E |
| 0000103320 | 05A9 | 97F0 | FFD1 | 932E | 0D5F | B560 | FFC6 | A3CF |
| 0000103340 | 0570 | 05AB | 9820 | FFD1 | 0550 | B5A9 | 0030 | 2549 |
| 0000103360 | 4169 | 1029 | 932E | 0570 | 05A9 | 9810 | FFD1 | 1029 |
| 0000103400 | 932E | 05A9 | 9800 | FFD1 | 1449 | 932E | 05A9 | 97F0 |
| 0000103420 | FFD1 | 1449 | 932E | 0D5F | B560 | FFC6 | 0550 | B5AB |
| 0000103440 | 0030 | 102B | B16D | 0030 | 05A9 | 6DB0 | FFD2 | 492B |
| 0000103460 | C8BD | C000 | 0135 | 456B | B16D | 0030 | 05A9 | 6DB0 |
| 0000103500 | FFD2 | 492B | C900 | 012C | A3CF | 0570 | 05AB | 9820 |
| 0000103520 | FFD1 | 0550 | B5A9 | 0030 | 2549 | 4169 | 1029 | 932E |
| 0000103540 | 0570 | 05A9 | 9810 | FFD1 | 1029 | 932E | 05A9 | 9800 |
| 0000103560 | FFD1 | 1449 | 932E | 05A9 | 97F0 | FFD1 | 1449 | 932E |
| 0000103600 | 0D5F | B560 | FFC6 | 0550 | B5AB | 0030 | 102B | B16D |
| 0000103620 | 0030 | 05A9 | 6DB0 | FFD2 | 492B | C8D6 | C000 | 0100 |
| 0000103640 | 456B | B16D | 0030 | 05A9 | 6DB0 | FFD2 | 492B | C900 |
| 0000103660 | 00F7 | A3CF | B5AB | 0030 | 254B | 0570 | 05A9 | 9800 |
| 0000103700 | FFD1 | 412B | 936E | 05AB | 97F0 | FFD1 | 0550 | 05A9 |
| 0000103720 | 98D0 | FFD1 | 452B | 936E | 182B | 936E | 05AB | 98B0 |
| 0000103740 | FFD1 | 936E | 0D5F | B830 | FFC6 | A3CF | 0570 | 05AB |
| 0000103760 | 9800 | FFD1 | 0550 | 05A9 | 98D0 | FFD1 | 452B | B5A9 |
| 0000104000 | 0030 | 2549 | 412B | 936E | 0570 | 05AB | 97F0 | FFD1 |
| 0000104020 | 936E | 0550 | 05A9 | 98C0 | FFD1 | 932E | 1829 | 932E |
| 0000104040 | 0D5F | B830 | FFC6 | 0550 | B5AB | 0030 | 102B | B16D |
| 0000104060 | 0030 | 05A9 | 6DB0 | FFD2 | 492B | C8BB | C000 | 00B0 |
| 0000104100 | 456B | B16D | 0030 | 05A9 | 6DB0 | FFD2 | 492B | C900 |
| 0000104120 | 00A7 | A3CF | B5AB | 0030 | 254B | 0570 | 05A9 | 9820 |
| 0000104140 | FFD1 | 412B | 936E | 05AB | 9810 | FFD1 | 0550 | 05A9 |

THU MAR 14 17:37:32 1991 GSPMON.4 PAGE 38, LINE 2184

| | | | | | | | | |
|---|---|---|---|---|---|---|---|---|
| 0000104160 | 98D0 | FFD1 | 452B | 936E | 182B | 936E | 05AB | 98B0 |
| 0000104200 | FFD1 | 936E | 0D5F | B830 | FFC6 | A3CF | 0570 | 05AB |
| 0000104220 | 9820 | FFD1 | 0550 | 05A9 | 98D0 | FFD1 | 452B | B5A9 |
| 0000104240 | 0030 | 2549 | 412B | 936E | 0570 | 05AB | 9810 | FFD1 |
| 0000104260 | 936E | 0550 | 05A9 | 98C0 | FFD1 | 932E | 1829 | 932E |
| 0000104300 | 0D5F | B830 | FFC6 | A3CF | 0550 | B5AB | 0030 | 254B |
| 0000104320 | 0570 | 05A9 | 9800 | FFD1 | 412B | 936E | 05AB | 97F0 |
| 0000104340 | FFD1 | 0550 | 05A9 | 98D0 | FFD1 | 452B | 936E | 182B |
| 0000104360 | 936E | 05AB | 98B0 | FFD1 | 936E | 0D5F | B830 | FFC6 |
| 0000104400 | A3CF | 0570 | 05AB | 9800 | FFD1 | 0550 | 05A9 | 98D0 |
| 0000104420 | FFD1 | 452B | B5A9 | 0030 | 2549 | 412B | 936E | 0570 |
| 0000104440 | 05AB | 97F0 | FFD1 | 936E | 0550 | 05A9 | 98C0 | FFD1 |
| 0000104460 | 932E | 1829 | 932E | 0D5F | B830 | FFC6 | 0550 | B5AB |
| 0000104500 | 0030 | 102B | B16D | 0030 | 05A9 | 6DB0 | FFD2 | 492B |
| 0000104520 | C800 | FF7F | C025 | 0D5F | 67B0 | FFC4 | C021 | 0D5F |
| 0000104540 | 77B0 | FFC4 | C01D | 0550 | 05A8 | 9870 | FFD1 | 0B48 |
| 0000104560 | FFF8 | C316 | 24A8 | 0B28 | 6580 | FFC4 | 8708 | 0168 |
| 0000104600 | 5680 | FFC4 | 5B80 | FFC4 | 4E50 | FFC4 | 49C0 | FFC4 |
| 0000104620 | 5330 | FFC4 | 6680 | FFC4 | 6430 | FFC4 | 6470 | FFC4 |
| 0000104640 | A3CF | D3AE | 0000 | 0D5F | AA20 | FFC6 | A3CF | 0550 |
| 0000104660 | B5AB | 0020 | 936E | 0D5F | B500 | FFC6 | 0BEE | FFBF |
| 0000104700 | 09AF | 2A00 | 0960 | 098F | 0054 | 4DCD | 0B0E | 0060 |
| 0000104720 | 0541 | 05AB | 98A0 | FFD1 | CB13 | A3CF | 09E9 | 0000 |
| 0000104740 | 0001 | 932E | 1829 | 932E | 09E9 | 97F0 | FFC9 | 932E |
| 0000104760 | 0D5F | 9B60 | FFC6 | 182B | 0541 | 058B | 98A0 | FFD1 |
| 0000105000 | 0550 | 05A9 | 6D60 | FFD2 | 2FA9 | B12D | 0050 | 0570 |
| 0000105020 | 05A9 | 97F0 | FFD1 | B12D | 0010 | 05AB | 9800 | FFD1 |
| 0000105040 | B16D | 0020 | 05A9 | 9810 | FFD1 | B12D | 0030 | 05A9 |
| 0000105060 | 9820 | FFD1 | B12D | 0040 | 05A9 | 9830 | FFD1 | 0D89 |
| 0000105100 | 0079 | B5A9 | 0010 | 1489 | C607 | B5A9 | 0010 | 1489 |
| 0000105120 | 2BA9 | B12D | 0010 | C005 | B5A9 | 0010 | 2BA9 | B12D |
| 0000105140 | 0010 | 148B | C607 | B5AB | 0020 | 148B | 2BAB | B16D |
| 0000105160 | 0020 | C005 | B5AB | 0020 | 2BAB | B16D | 0020 | 0550 |
| 0000105200 | 05AB | 6D60 | FFD2 | 0570 | B5A9 | 0030 | 1089 | 4969 |
| 0000105220 | C907 | B5A9 | 0030 | 1089 | 2BA9 | B12D | 0030 | C005 |
| 0000105240 | B5A9 | 0030 | 2BA9 | B12D | 0030 | 0550 | 05A9 | 6D70 |
| 0000105260 | FFD2 | 0570 | B5AB | 0040 | 108B | 492B | C907 | B5AB |
| 0000105300 | 0040 | 108B | 2BAB | B16D | 0040 | C005 | B5AB | 0040 |
| 0000105320 | 2BAB | B16D | 0040 | B9AD | 0020 | 0000 | 0550 | 85AB |
| 0000105340 | 0570 | B5A9 | 0040 | 492B | C969 | A3CF | B5AB | 0030 |
| 0000105360 | B5A9 | 0010 | 452B | 936E | 182B | 936E | 0550 | 85AB |
| 0000105400 | 0570 | B5A9 | 0050 | 5F2B | 246B | 0B2B | 97F0 | FFC9 |
| 0000105420 | B5A9 | 0010 | 2469 | 412B | 936E | 0D5F | 9B60 | FFC6 |
| 0000105440 | 0550 | 85AB | 102B | 816D | 0570 | B5A9 | 0040 | 492B |
| 0000105460 | C8DC | C044 | B5A9 | 0010 | 1089 | 2BA9 | B12D | 0010 |
| 0000105500 | 108B | 2BAB | B16D | 0020 | B5AB | 0030 | 148B | 2BAB |
| 0000105520 | B16D | 0030 | B5AB | 0040 | 148B | 2BAB | B16D | 0040 |
| 0000105540 | B9AD | 0020 | 0000 | 0550 | 85AB | 0570 | B5A9 | 0040 |
| 0000105560 | 492B | C924 | A3CF | B5AB | 0030 | B5A9 | 0010 | 452B |
| 0000105600 | 936E | 456B | 936E | 0550 | 85AB | 0570 | B5A9 | 0050 |
| 0000105620 | 5F2B | 246B | 0B2B | 97F0 | FFC9 | B5A9 | 0010 | 2469 |
| 0000105640 | 412B | 936E | 0D5F | 9B60 | FFC6 | 0550 | 85AB | 102B |
| 0000105660 | 816D | 0570 | B5A9 | 0040 | 492B | C8DC | 0BEE | FF9F |
| 0000105700 | 09AF | 2A00 | 0960 | 098F | 0054 | 4DCD | 0B0E | 0060 |
| 0000105720 | 0550 | 05AB | 6D60 | FFD2 | 2FAB | B16D | 0040 | 456B |
| 0000105740 | 836D | 87AB | 246B | 0B2B | 97F0 | FFC9 | 0548 | 856B |
| 0000105760 | CB35 | 0570 | B5AB | 0040 | 87A9 | 5B69 | 2469 | 1109 |
| 0000106000 | B12D | 0030 | 87A9 | 6F69 | 2469 | 1049 | B12D | 0020 |
| 0000106020 | 4529 | B12D | 0050 | 0550 | 05AB | 6DB0 | FFD2 | 4969 |

THU MAR 14 17:37:32 1991 GSPMON.4 PAGE 39, LINE 2243

| | | | | | | | | |
|---|---|---|---|---|---|---|---|---|
| 0000106040 | C91D | A3CF | B5AB | 0050 | 254B | 0570 | B5A9 | 0030 |
| 0000106060 | 412B | 936E | B5AB | 0020 | 936E | 1869 | 932E | 932E |
| 0000106100 | 0D5F | B560 | FFC6 | 0550 | B5A9 | 0050 | 1029 | B12D |
| 0000106120 | 0050 | 05AB | 6DB0 | FFD2 | 4969 | C8E3 | 87AB | 102B |
| 0000106140 | 836D | 0B6B | FFFF | FFFE | C8BC | 4529 | 0541 | 0589 |
| 0000106160 | 98A0 | FFD1 | 0BEE | FF9F | 09AF | 2A00 | 0960 | 098F |
| 0000106200 | 0054 | 4DCD | 100E | 09EB | 97F0 | FFD1 | 836D | B7A9 |
| 0000106220 | FFCD | 8369 | 4508 | B7EE | 0080 | 09AF | 2A00 | 0962 |
| 0000106240 | 098F | 0054 | 4DCD | 0B0E | 0080 | 07AB | 6C60 | FFD2 |
| 0000106260 | 07A9 | 6C40 | FFD2 | 452B | B36D | 0020 | 456B | B36D |
| 0000106300 | 0040 | 07A9 | 6D30 | FFD2 | B32D | 0060 | 0550 | 816D |
| 0000106320 | 05A9 | 6D70 | FFD2 | 492B | C932 | 456B | B16D | 0010 |
| 0000106340 | 07A9 | 6C40 | FFD2 | CA13 | B7AB | 0040 | B7A9 | 0060 |
| 0000106360 | 992B | B32D | 0060 | B36D | 0040 | B5A9 | 0010 | 1029 |
| 0000106400 | B12D | 0010 | 07AB | 6C40 | FFD2 | 4969 | C8ED | B7AB |
| 0000106420 | 0020 | 248B | B7A9 | 0040 | 412B | B36D | 0040 | B7A9 |
| 0000106440 | 0020 | 2489 | B7AB | 0060 | 4169 | B32D | 0060 | 85AB |
| 0000106460 | 102B | 816D | 05A9 | 6D70 | FFD2 | 492B | C8CE | 0BEE |
| 0000106500 | FF7F | 09AF | 2A00 | 0960 | 098F | 0014 | 4DCD | B7AB |
| 0000106520 | FFE0 | 078B | 98F0 | FFD1 | B7EE | 0060 | 09AF | 2800 |
| 0000106540 | 0962 | 098F | 0054 | 4DCD | 120E | B7AB | FFE0 | 0550 |
| 0000106560 | 896D | A3CF | 192B | 936E | 0D5F | BA70 | FFC4 | 0550 |
| 0000106600 | 85AB | 142B | CA0E | A3CF | D60E | 6CC0 | FFD2 | 85AB |
| 0000106620 | 07A9 | 6D30 | FFD2 | 5F2B | 936E | 932E | 0D5F | 7760 |
| 0000106640 | FFC6 | 4508 | B7EE | 0080 | 09AF | 2A00 | 0962 | 098F |
| 0000106660 | 0014 | 4DCD | 120E | B7AB | FFE0 | 0550 | 896D | C01C |
| 0000106700 | A3CF | 190B | 936E | 0D5F | BA70 | FFC4 | C01D | A3CF |
| 0000106720 | 192B | 936E | 0D5F | BA70 | FFC4 | C016 | A3CF | 194B |
| 0000106740 | 936E | 0D5F | BA70 | FFC4 | C00F | A3CF | 18EB | 936E |
| 0000106760 | 0D5F | BA70 | FFC4 | C008 | 85AB | CAE2 | 1428 | CAE7 |
| 0000107000 | 1428 | CAEC | 1448 | CAF1 | 4508 | B7EE | 0060 | 09AF |
| 0000107020 | 2800 | 0962 | 098F | 0014 | 4DCD | A3CF | 19AB | 936E |
| 0000107040 | 0D5F | BA70 | FFC4 | 4508 | B7EE | 0060 | 09AF | 2800 |
| 0000107060 | 0962 | 098F | 0154 | 4DCD | 0B0E | 00A0 | 07AB | 6C60 |
| 0000107100 | FFD2 | 07A9 | 6C40 | FFD2 | 452B | B36D | 0020 | 456B |
| 0000107120 | B36D | 0040 | 07A9 | 6D30 | FFD2 | B32D | 0060 | 2429 |
| 0000107140 | B32D | 0080 | 0550 | 816D | 05A9 | 6D70 | FFD2 | 492B |
| 0000107160 | C941 | 456B | B16D | 0010 | 07A9 | 6C40 | FFD2 | CA1A |
| 0000107200 | B7AB | 0040 | B7A9 | 0080 | 9567 | B36D | 0040 | 952B |
| 0000107220 | B32D | 0080 | 5767 | B7AB | 0060 | 90EB | B36D | 0060 |
| 0000107240 | B5A7 | 0010 | 1027 | B0ED | 0010 | 07A9 | 6C40 | FFD2 |
| 0000107260 | 4927 | C8E6 | B7AB | 0020 | 248B | B7A7 | 0040 | 40EB |
| 0000107300 | B36D | 0040 | B7A7 | 0020 | 2487 | B7AB | 0060 | 4167 |
| 0000107320 | B2ED | 0060 | B7AB | 0020 | 248B | B7A7 | 0080 | 40EB |
| 0000107340 | B36D | 0080 | 85A7 | 1027 | 80ED | 05AB | 6D70 | FFD2 |
| 0000107360 | 4967 | C8BF | 4508 | B7EE | 00A0 | 09AF | 2A80 | 0962 |
| 0000107400 | 098F | 0154 | 4DCD | 0B0E | 0040 | A3CF | 192B | 936E |
| 0000107420 | 0D5F | B0B0 | FFC6 | 830D | A3CF | 09EB | 00B0 | C000 |
| 0000107440 | 936E | 0D5F | B070 | FFC6 | 0550 | B10D | 0020 | A3CF |
| 0000107460 | 194B | 936E | 0D5F | B500 | FFC6 | A3CF | 09CB | FFFF |
| 0000107500 | 936E | 0D5F | AA20 | FFC6 | 456B | 0550 | B16D | 0030 |
| 0000107520 | 05A9 | 9970 | FFD1 | 492B | C928 | B5AB | 0030 | 248B |
| 0000107540 | 0B2B | 99B0 | FFD1 | 856B | CA15 | A3CF | 05AB | 9980 |
| 0000107560 | FFD1 | B5A9 | 0030 | 5F69 | 05A7 | 9990 | FFD1 | 40E9 |
| 0000107600 | 932E | 1829 | 932E | 936E | 09C9 | 0280 | 932E | 0D5F |
| 0000107620 | B560 | FFC6 | 0550 | B5AB | 0030 | 102B | B16D | 0030 |
| 0000107640 | 05A9 | 9970 | FFD1 | 492B | C8D8 | A3CF | D3AE | 0000 |
| 0000107660 | 0D5F | AA20 | FFC6 | A3CF | 0550 | B5A9 | 0020 | 932E |
| 0000107700 | 0D5F | B500 | FFC6 | 4508 | B7EE | 00A0 | 09AF | 2A80 |

THU MAR 14 17:37:32 1991 GSPMON.4 PAGE 40, LINE 2302

| | | | | | | | | |
|---|---|---|---|---|---|---|---|---|
| 0000107720 | 0962 | 098F | 0154 | 4DCD | 0B0E | 0060 | A3CF | 192B |
| 0000107740 | 936E | 0D5F | B0B0 | FFC6 | 830D | A3CF | 09EB | 00B0 |
| 0000107760 | C000 | 936E | 0D5F | B070 | FFC6 | 0550 | B10D | 0020 |
| 0000110000 | A3CF | 456B | 936E | 0D5F | B500 | FFC6 | A3CF | 09CB |
| 0000110020 | FFFF | 936E | 0D5F | AA20 | FFC6 | 456B | 0550 | B16D |
| 0000110040 | 0030 | 05A9 | 9CE0 | FFD1 | 492B | C956 | 456B | B16D |
| 0000110060 | 0040 | 05A9 | 9CE0 | FFD1 | 492B | C947 | B5AB | 0030 |
| 0000110100 | 252B | 0B2B | 9D60 | FFD1 | B5A9 | 0040 | 2489 | 412B |
| 0000110120 | 856B | CA30 | A3CF | 194B | 936E | 0D5F | B500 | FFC6 |
| 0000110140 | A3CF | 09E9 | 7777 | 7777 | 932E | 0D5F | AA20 | FFC6 |
| 0000110160 | A3CF | 0550 | 05A7 | 9D00 | FFD1 | 05AB | 9CF0 | FFD1 |
| 0000110200 | B5A9 | 0030 | 5F69 | 40E9 | 0B09 | 0400 | 932E | 05A9 |
| 0000110220 | 9D30 | FFD1 | B5A7 | 0040 | 5F27 | 05A9 | 9D40 | FFD1 |
| 0000110240 | 4127 | 92EE | 936E | 05A7 | 9D30 | FFD1 | 92EE | 0D5F |
| 0000110260 | B560 | FFC6 | 0550 | B5AB | 0040 | 102B | B16D | 0040 |
| 0000110300 | 05A9 | 9CE0 | FFD1 | 492B | C8B9 | B5A7 | 0030 | 1027 |
| 0000110320 | B0ED | 0030 | 4927 | C8AA | A3CF | D3AE | 0000 | 0D5F |
| 0000110340 | AA20 | FFC6 | A3CF | 0550 | B5AB | 0020 | 936E | 0D5F |
| 0000110360 | B500 | FFC6 | 4508 | B7EE | 00A0 | 09AF | 2A80 | 0962 |
| 0000110400 | 098F | 0054 | 4DCD | 0B0E | 0050 | A3CF | 192B | 936E |
| 0000110420 | 0D5F | B0B0 | FFC6 | 830D | A3CF | 09EB | 00B0 | C000 |
| 0000110440 | 936E | 0D5F | B070 | FFC6 | 0550 | B10D | 0020 | A3CF |
| 0000110460 | 456B | 936E | 0D5F | B500 | FFC6 | A3CF | 936E | 0D5F |
| 0000110500 | AA20 | FFC6 | A3CF | B7A9 | FFE0 | 0550 | 852B | 254B |
| 0000110520 | 936E | 456B | 936E | 05AB | 6D70 | FFD2 | 936E | 05A9 |
| 0000110540 | 6D60 | FFD2 | 932E | 0D5F | B830 | FFC6 | A3CF | D3AE |
| 0000110560 | 0000 | 0D5F | AA20 | FFC6 | A3CF | 0550 | B5AB | 0020 |
| 0000110600 | 936E | 0D5F | B500 | FFC6 | 4508 | B7EE | 0080 | 09AF |
| 0000110620 | 2A00 | 0962 | 098F | 0054 | 4DCD | 120E | A3CF | 09EB |
| 0000110640 | 00B0 | C000 | 936E | 0D5F | B070 | FFC6 | 0550 | 810D |
| 0000110660 | A3CF | 194B | 936E | 0D5F | B500 | FFC6 | A3CF | B7A9 |
| 0000110700 | FFE0 | 0550 | 852B | 254B | 936E | 456B | 936E | 09CB |
| 0000110720 | 1000 | 936E | 456B | 936E | 05AB | 6D70 | FFD2 | 936E |
| 0000110740 | 05A9 | 6D60 | FFD2 | 932E | 0D5F | ACA0 | FFC6 | A3CF |
| 0000110760 | 0550 | 85AB | 936E | 0D5F | B500 | FFC6 | 4508 | B7EE |
| 0000111000 | 0080 | 09AF | 2A00 | 0962 | A3AF | 4DCD | 0D5F | AA60 |
| 0000111020 | FFC4 | 4508 | B7EE | 0040 | 97ED | 0962 | 098F | 0050 |
| 0000111040 | 09EB | AB70 | FFC4 | 078B | 6B60 | FFD2 | 09E9 | AC00 |
| 0000111060 | FFC4 | 0789 | 6B80 | FFD2 | 09AF | 0A00 | 0960 | A36F |
| 0000111100 | A3CF | 198B | 936E | 0D5F | 66C0 | FFC0 | 97EB | 0960 |
| 0000111120 | A36F | 0550 | 05AB | 6DB0 | FFD2 | 142B | C207 | A3CF |
| 0000111140 | 19AB | 936E | 0D5F | BA70 | FFC4 | C006 | A3CF | 196B |
| 0000111160 | 936E | 0D5F | BA70 | FFC4 | 97EB | 0960 | 098F | 0050 |
| 0000111200 | A3CF | 0570 | 05AB | 9950 | FFD1 | 936E | 0D5F | 6480 |
| 0000111220 | FFC0 | A3CF | 0550 | 05AB | 6DB0 | FFD2 | 142B | 936E |
| 0000111240 | 182B | 936E | 0D5F | 6660 | FFC0 | 4529 | 0550 | 0589 |
| 0000111260 | 8E20 | FFC9 | 0589 | 8E30 | FFC9 | 0589 | 8E40 | FFC9 |
| 0000111300 | 0541 | 05AB | 6B50 | FFD2 | CA06 | 182B | 0543 | 058B |
| 0000111320 | DD80 | FFD1 | C009 | 0543 | 0589 | DD80 | FFD1 | 182B |
| 0000111340 | 0541 | 058B | 6B50 | FFD2 | 09EB | B1B0 | FFC4 | 078B |
| 0000111360 | 6B60 | FFD2 | 09EB | BA60 | FFC4 | 078B | 6B80 | FFD2 |
| 0000111400 | 09AF | 0A00 | 0960 | 098F | 0050 | 0550 | 05AB | 8E30 |
| 0000111420 | FFC9 | 102B | 058B | 8E30 | FFC9 | C072 | A3CF | 456B |
| 0000111440 | 936E | 0D5F | 66C0 | FFC0 | 078B | 6B20 | FFD2 | 0550 |
| 0000111460 | 058B | 8E40 | FFC9 | 184B | 0543 | 058B | DD80 | FFD1 |
| 0000111500 | C06A | A3CF | 456B | 936E | 0D5F | 66C0 | FFC0 | 184B |
| 0000111520 | 0543 | 058B | DD80 | FFD1 | C05E | A3CF | 186B | 936E |
| 0000111540 | 0D5F | 66C0 | FFC0 | 0543 | 058B | DD80 | FFD1 | C053 |
| 0000111560 | A3CF | 186B | 936E | 0D5F | 66C0 | FFC0 | 0550 | 05AB |

THU MAR 14 17:37:32 1991 GSPMON.4 PAGE 41, LINE 2361

| | | | | | | | | |
|---|---|---|---|---|---|---|---|---|
| 0000111600 | 6CE0 | FFD2 | 07A9 | 6AA0 | FFD2 | 4969 | C211 | 05A9 |
| 0000111620 | 6CF0 | FFD2 | 07AB | 6AA0 | FFD2 | 492B | C819 | 05AB |
| 0000111640 | 6CE0 | FFD2 | 412B | 07A9 | 6AA0 | FFD2 | 4969 | C310 |
| 0000111660 | 07AB | 6B20 | FFD2 | 102B | 078B | 6B20 | FFD2 | 058B |
| 0000111700 | 8E40 | FFC9 | 1869 | 0543 | 0589 | DD80 | FFD1 | C023 |
| 0000111720 | A3CF | 456B | 936E | 0D5F | 66C0 | FFC0 | 078B | 6B20 |
| 0000111740 | FFD2 | 0550 | 058B | 8E40 | FFC9 | 1849 | 0543 | 0589 |
| 0000111760 | DD80 | FFD1 | 1829 | 0550 | 0589 | 8E20 | FFC9 | C00B |
| 0000112000 | 0543 | 05A8 | DD80 | FFD1 | CA89 | 1428 | CA9A | 1428 |
| 0000112020 | CAA4 | 1428 | CAAD | 09AF | 0A00 | 0960 | 0960 | 098F |
| 0000112040 | 0054 | 4DCD | 456B | 0541 | 058B | 6B50 | FFD2 | 0570 |
| 0000112060 | B5A9 | FFE0 | 0589 | 9960 | FFD1 | 09EB | BC60 | FFC4 |
| 0000112100 | 078B | 6B60 | FFD2 | 09EB | BC70 | FFC4 | 078B | 6B80 |
| 0000112120 | FFD2 | B7EE | 0080 | 09AF | 2A00 | 0962 | 0960 | 0960 |
| 0000112140 | 098F | 0054 | 4DCD | 18EB | 0570 | 058B | 9960 | FFD1 |
| 0000112160 | A3CF | 0550 | B5A9 | FFE0 | 932E | 4529 | 932E | 0D5F |
| 0000112200 | 6660 | FFC0 | 09E9 | BEB0 | FFC4 | 0789 | 6B60 | FFD2 |
| 0000112220 | 09EB | BF40 | FFC4 | 078B | 6B80 | FFD2 | B7EE | 0080 |
| 0000112240 | 09AF | 2A00 | 0962 | A36F | A3CF | 456B | 936E | 0D5F |
| 0000112260 | 66C0 | FFC0 | 97EB | 0960 | 0960 | 098F | 0050 | A3CF |
| 0000112300 | 0570 | 05AB | 9920 | FFD1 | 936E | 0D5F | 6480 | FFC0 |
| 0000112320 | A3CF | 0550 | 05AB | 6DB0 | FFD2 | 142B | 936E | 182B |
| 0000112340 | 936E | 0D5F | 6660 | FFC0 | 456B | 0541 | 058B | DFF0 |
| 0000112360 | FFD1 | 058B | E000 | FFD1 | 0550 | 058B | E030 | FFD1 |
| 0000112400 | 0541 | 058B | E010 | FFD1 | 0D5F | 1E10 | FFC6 | A3CF |
| 0000112420 | 182B | 936E | 0D5F | 1D30 | FFC6 | 0541 | 05AB | 6B50 |
| 0000112440 | FFD2 | CA06 | 182B | 0543 | 058B | DDB0 | FFD1 | C00A |
| 0000112460 | 456B | 0543 | 058B | DDB0 | FFD1 | 182B | 0541 | 058B |
| 0000112500 | 6B50 | FFD2 | 09E9 | C490 | FFC4 | 0789 | 6B60 | FFD2 |
| 0000112520 | 09EB | D940 | FFC4 | 078B | 6B80 | FFD2 | 09AF | 0A00 |
| 0000112540 | 0960 | 098F | 0050 | C000 | 0127 | A3CF | 456B | 936E |
| 0000112560 | 0D5F | 66C0 | FFC0 | 078B | 6B20 | FFD2 | 184B | 0543 |
| 0000112600 | 058B | DDB0 | FFD1 | C000 | 0134 | A3CF | 456B | 936E |
| 0000112620 | 0D5F | 66C0 | FFC0 | 184B | 0543 | 058B | DDB0 | FFD1 |
| 0000112640 | C000 | 0127 | A3CF | 186B | 936E | 0D5F | 66C0 | FFC0 |
| 0000112660 | 0543 | 058B | DDB0 | FFD1 | C000 | 011B | A3CF | 186B |
| 0000112700 | 936E | 0D5F | 66C0 | FFC0 | 0550 | 05AB | 6CE0 | FFD2 |
| 0000112720 | 07A9 | 6AA0 | FFD2 | 4969 | C33C | 07A9 | 6B20 | FFD2 |
| 0000112740 | 1029 | 0789 | 6B20 | FFD2 | 07AB | 6BA0 | FFD2 | 4969 |
| 0000112760 | C829 | 05A9 | 6DB0 | FFD2 | 1429 | C217 | 4529 | 0589 |
| 0000113000 | E020 | FFD1 | A3CF | 932E | 932E | 0D5F | 6660 | FFC0 |
| 0000113020 | A3CF | 182B | 936E | 0D5F | 66C0 | FFC0 | 1889 | 0543 |
| 0000113040 | 0589 | DDB0 | FFD1 | C000 | 00E4 | A3CF | 1AA9 | 932E |
| 0000113060 | 0D5F | 66C0 | FFC0 | 18EB | 0543 | 058B | DDB0 | FFD1 |
| 0000113100 | C000 | 00D7 | 1869 | 0543 | 0589 | DDB0 | FFD1 | C000 |
| 0000113120 | 00D0 | A3CF | 4529 | 932E | 0D5F | 66C0 | FFC0 | 0789 |
| 0000113140 | 6B20 | FFD2 | 184B | 0543 | 058B | DDB0 | FFD1 | C000 |
| 0000113160 | 00C0 | A3CF | 0550 | 05AB | 6DB0 | FFD2 | 142B | 936E |
| 0000113200 | 182B | 936E | 0D5F | 6660 | FFC0 | A3CF | 1869 | 932E |
| 0000113220 | 0D5F | 66C0 | FFC0 | 18A9 | 0543 | 0589 | DDB0 | FFD1 |
| 0000113240 | A3CF | 456B | 936E | 0D5F | 1D30 | FFC6 | 0541 | 05A9 |
| 0000113260 | E010 | FFD1 | CA06 | 0550 | 05AB | E030 | FFD1 | CB00 |
| 0000113300 | 0098 | 182B | 0541 | 058B | E000 | FFD1 | C000 | 0091 |
| 0000113320 | A3CF | 186B | 936E | 0D5F | 66C0 | FFC0 | 0550 | 05A9 |
| 0000113340 | 6CE0 | FFD2 | 07AB | 6AA0 | FFD2 | 492B | C33A | 07A9 |
| 0000113360 | 6B20 | FFD2 | 1029 | 0789 | 6B20 | FFD2 | 05A9 | E030 |
| 0000113400 | FFD1 | CB77 | A3CF | 1829 | 932E | 0D5F | 1D30 | FFC6 |
| 0000113420 | 0541 | 05AB | E010 | FFD1 | CA09 | 4529 | 0589 | E010 |
| 0000113440 | FFD1 | 182B | 058B | E000 | FFD1 | C063 | 0550 | 05A9 |

THU MAR 14 17:37:32 1991 GSPMON.4 PAGE 42, LINE 2420

| | | | | | | | | |
|---|---|---|---|---|---|---|---|---|
| 0000113460 | E020 | FFD1 | 1029 | 0589 | E020 | FFD1 | A3CF | 932E |
| 0000113500 | 456B | 936E | 0D5F | 6660 | FFC0 | A3CF | 1829 | 932E |
| 0000113520 | 0D5F | 66C0 | FFC0 | 1889 | 0543 | 0589 | DDB0 | FFD1 |
| 0000113540 | C048 | A3CF | 1829 | 932E | 0D5F | 1D30 | FFC6 | A3CF |
| 0000113560 | 456B | 936E | 0D5F | 66C0 | FFC0 | 078B | 6B20 | FFD2 |
| 0000113600 | 1849 | 0543 | 0589 | DDB0 | FFD1 | 1829 | 0541 | 0589 |
| 0000113620 | E010 | FFD1 | C02E | A3CF | 456B | 936E | 0D5F | 66C0 |
| 0000113640 | FFC0 | 18E9 | 0543 | 0589 | DDB0 | FFD1 | 182B | 0541 |
| 0000113660 | 058B | DFF0 | FFD1 | C01D | 0543 | 05A8 | DDB0 | FFD1 |
| 0000113700 | 0B48 | FFF8 | C316 | 24A8 | 0B28 | D810 | FFC4 | 8708 |
| 0000113720 | 0168 | C4D0 | FFC4 | C5D0 | FFC4 | C6A0 | FFC4 | C760 |
| 0000113740 | FFC4 | CD10 | FFC4 | D000 | FFC4 | D910 | FFC4 | D630 |
| 0000113760 | FFC4 | 09AF | 0A00 | 0960 | 098F | 0050 | 0541 | 05AB |
| 0000114000 | DFF0 | FFD1 | CA28 | A3CF | 456B | 936E | 0D5F | 1D30 |
| 0000114020 | FFC6 | 0541 | 058B | DFF0 | FFD1 | 07C0 | 6D30 | FFD2 |
| 0000114040 | DE20 | FFD1 | D7C0 | 6CA0 | FFD2 | DE40 | FFD1 | 0550 |
| 0000114060 | 058B | DE60 | FFD1 | A3CF | 1949 | 932E | 09E9 | DE20 |
| 0000114100 | FFD1 | 932E | 1829 | 932E | 0D5F | 4490 | FFC0 | 0D5F |
| 0000114120 | AD60 | FFC4 | C053 | 05A9 | E000 | FFD1 | CA3E | 452? |
| 0000114140 | 0589 | E000 | FFD1 | 07C0 | 6D30 | FFD2 | DE20 | FFD1 |
| 0000114160 | 07C0 | 6CA0 | FFD2 | DE40 | FFD1 | 0550 | 05C0 | E020 |
| 0000114200 | FFD1 | DE60 | FFD1 | 182B | 058B | E030 | FFD1 | 05A9 |
| 0000114220 | 6DB0 | FFD2 | 05AB | E020 | FFD1 | 102B | 492B | CB10 |
| 0000114240 | A3CF | 194B | 936E | 09EB | DE20 | FFD1 | 936E | 182B |
| 0000114260 | 936E | 0D5F | 4490 | FFC0 | 0D5F | AD60 | FFC4 | C01E |
| 0000114300 | A3CF | 194B | 936E | 09EB | DE20 | FFD1 | 936E | 18AB |
| 0000114320 | 936E | 0D5F | 4490 | FFC0 | C011 | 0D5F | 1F10 | FFC6 |
| 0000114340 | 4D09 | CA0C | A3CF | 456B | 936E | 936E | 1869 | 932E |
| 0000114360 | 0D5F | 4490 | FFC0 | 0D5F | AD60 | FFC4 | 09AF | 0A00 |
| 0000114400 | 0960 | 098F | 0054 | 4DCD | A3CF | 0570 | 05AB | 9920 |
| 0000114420 | FFD1 | 936E | 0D5F | 6480 | FFC0 | A3CF | 0550 | 05AB |
| 0000114440 | 6DB0 | FFD2 | 142B | 936E | 182B | 936E | 0D5F | 6660 |
| 0000114460 | FFC0 | 456E | 0541 | 058B | DFF0 | FFD1 | 0D5F | 1E10 |
| 0000114500 | FFC6 | A3CF | 182B | 936E | 0D5F | 1D30 | FFC6 | 0541 |
| 0000114520 | 05AB | 6B50 | FFD2 | CA14 | 07AB | 6B20 | FFD2 | 07A9 |
| 0000114540 | 6BA0 | FFD2 | 492B | C806 | 1869 | 0543 | 0589 | DDC0 |
| 0000114560 | FFD1 | C010 | 1829 | 0543 | 0589 | DDC0 | FFD1 | C00A |
| 0000114600 | 4529 | 0543 | 0589 | DDC0 | FFD1 | 182B | 0541 | 058B |
| 0000114620 | 6B50 | FFD2 | B7AB | FFE0 | 078B | DE70 | FFD1 | 09E9 |
| 0000114640 | E780 | FFC4 | 0789 | 6B60 | FFD2 | 09E9 | EF50 | FFC4 |
| 0000114660 | 0789 | 6B80 | FFD2 | B7EE | 0080 | 09AF | 2A00 | 0962 |
| 0000114700 | 098F | 0050 | C06A | A3CF | 456B | 936E | 0D5F | 66C0 |
| 0000114720 | FFC0 | 078B | 6B20 | FFD2 | 184B | 0543 | 058B | DDC0 |
| 0000114740 | FFD1 | C068 | A3CF | 456B | 936E | 0D5F | 66C0 | FFC0 |
| 0000114760 | 184B | 0543 | 058B | DDC0 | FFD1 | C05C | A3CF | 186B |
| 0000115000 | 936E | 0D5F | 66C0 | FFC0 | 0543 | 058B | DDC0 | FFD1 |
| 0000115020 | C051 | A3CF | 186B | 936E | 0D5F | 66C0 | FFC0 | 0550 |
| 0000115040 | 05AB | 6CE0 | FFD2 | 07A9 | 6AA0 | FFD2 | 4969 | C31E |
| 0000115060 | 07A9 | 6B20 | FFD2 | 1029 | 0789 | 6B20 | FFD2 | 07AB |
| 0000115100 | 6BA0 | FFD2 | 4969 | C80C | A3CF | 1A49 | 932E | 0D5F |
| 0000115120 | 66C0 | FFC0 | 18EB | 0543 | 058B | DDC0 | FFD1 | C02A |
| 0000115140 | 1869 | 0543 | 0589 | DDC0 | FFD1 | C024 | 4529 | 0543 |
| 0000115160 | 0589 | DDC0 | FFD1 | C01E | A3CF | 456B | 936E | 0D5F |
| 0000115200 | 66C0 | FFC0 | 18E9 | 0543 | 0589 | DDC0 | FFD1 | 182B |
| 0000115220 | 0541 | 058B | DFF0 | FFD1 | C00D | 0543 | 05A8 | DDC0 |
| 0000115240 | FFD1 | CA91 | 1428 | CA9E | 1428 | CAA8 | 1428 | CAB1 |
| 0000115260 | 1488 | CAE2 | 09AF | 0A00 | 0960 | 098F | 0150 | 0541 |
| 0000115300 | 05AB | DFF0 | FFD1 | CA41 | A3CF | 456B | 936E | 0D5F |
| 0000115320 | 1D30 | FFC6 | 0541 | 058B | DFF0 | FFD1 | 07A9 | DE70 |

THU MAR 14 17:37:32 1991 GSPMON.4 PAGE 43, LINE 2479

| | | | | | | | | |
|---|---|---|---|---|---|---|---|---|
| 0000115340 | FFD1 | 0550 | 8527 | 0587 | E2B0 | FFD1 | B527 | 0010 |
| 0000115360 | 0587 | E2C0 | FFD1 | B527 | 0020 | 0587 | E2D0 | FFD1 |
| 0000115400 | B527 | 0030 | 0587 | E2E0 | FFD1 | A3CF | 09E7 | E2B0 |
| 0000115420 | FFD1 | 92EE | 0D5F | A510 | FFC5 | 0787 | DE20 | FFD1 |
| 0000115440 | 09C9 | 0048 | 0789 | DE40 | FFD1 | A3CF | 194B | 936E |
| 0000115460 | 09EB | DE20 | FFD1 | 936E | 1827 | 92EE | 0D5F | 4490 |
| 0000115500 | FFC0 | 0D5F | AD60 | FFC4 | C011 | 0D5F | 1F10 | FFC6 |
| 0000115520 | 4D07 | CA0C | A3CF | 456B | 936E | 936E | 1869 | 932E |
| 0000115540 | 0D5F | 4490 | FFC0 | 0D5F | AD60 | FFC4 | 09AF | 0A80 |
| 0000115560 | 0960 | 098F | 0050 | A3CF | 0570 | 05AB | 9920 | FFD1 |
| 0000115600 | 936E | 0D5F | 6480 | FFC0 | A3CF | 0550 | 05AB | 6DB0 |
| 0000115620 | FFD2 | 142B | 936E | 182B | 936E | 0D5F | 6660 | FFC0 |
| 0000115640 | 456B | 0541 | 058B | DFF0 | FFD1 | 0D5F | 1E10 | FFC6 |
| 0000115660 | A3CF | 182B | 936E | 0D5F | 1D30 | FFC6 | 0541 | 05AB |
| 0000115700 | 6B50 | FFD2 | CA14 | 07AB | 6B20 | FFD2 | 07A9 | 6BA0 |
| 0000115720 | FFD2 | 492B | C806 | 1869 | 0543 | 0589 | DDC0 | FFD1 |
| 0000115740 | C010 | 1829 | 0543 | 0589 | DDC0 | FFD1 | C00A | 4529 |
| 0000115760 | 0543 | 0589 | DDC0 | FFD1 | 182B | 0541 | 058B | 6B50 |
| 0000116000 | FFD2 | 09EB | E780 | FFC4 | 078B | 6B60 | FFD2 | 09E9 |
| 0000116020 | FA80 | FFC4 | 0789 | 6B80 | FFD2 | 09AF | 0A00 | 0960 |
| 0000116040 | 098F | 0050 | 0541 | 05AB | DFF0 | FFD1 | CA2A | A3CF |
| 0000116060 | 456B | 936E | 0D5F | 1D30 | FFC6 | 0541 | 058B | DFF0 |
| 0000116100 | FFD1 | A3CF | 09E9 | DEB0 | FFD1 | 932E | 0D5F | B550 |
| 0000116120 | FFC5 | 0789 | DE20 | FFD1 | 09CB | 0026 | 078B | DE40 |
| 0000116140 | FFD1 | A3CF | 1949 | 932E | 09E9 | DE20 | FFD1 | 932E |
| 0000116160 | 1829 | 932E | 0D5F | 4490 | FFC0 | 0D5F | AD60 | FFC4 |
| 0000116200 | C011 | 0D5F | 1F10 | FFC6 | 4D09 | CA0C | A3CF | 456B |
| 0000116220 | 936E | 936E | 1869 | 932E | 0D5F | 4490 | FFC0 | 0D5F |
| 0000116240 | AD60 | FFC4 | 09AF | 0A00 | 0960 | 098F | 0054 | 4DCD |
| 0000116260 | A3CF | 0570 | 05AB | 9920 | FFD1 | 936E | 0D5F | 6480 |
| 0000116300 | FFC0 | A3CF | 0550 | 05AB | 6DB0 | FFD2 | 142B | 936E |
| 0000116320 | 182B | 936E | 0D5F | 6660 | FFC0 | 456B | 0541 | 058B |
| 0000116340 | DFF0 | FFD1 | 0D5F | 1E10 | FFC6 | A3CF | 182B | 936E |
| 0000116360 | 0D5F | 1D30 | FFC6 | 0541 | 05AB | 6B50 | FFD2 | CA06 |
| 0000116400 | 182B | 0543 | 058B | DDD0 | FFD1 | C00A | 456B | 0543 |
| 0000116420 | 058B | DDD0 | FFD1 | 182B | 0541 | 058B | 6B50 | FFD2 |
| 0000116440 | B7A9 | FFE0 | 0789 | DE70 | FFD1 | B7AB | FFC0 | 078B |
| 0000116460 | DE90 | FFD1 | 09E9 | 0430 | FFC5 | 0789 | 6B60 | FFD2 |
| 0000116500 | 09E9 | 0C00 | FFC5 | 0789 | 6B80 | FFD2 | B7EE | 0080 |
| 0000116520 | 09AF | 2A00 | 0962 | 098F | 0050 | C06A | A3CF | 456B |
| 0000116540 | 936E | 0D5F | 66C0 | FFC0 | 078B | 6B20 | FFD2 | 184B |
| 0000116560 | 0543 | 058B | DDD0 | FFD1 | C068 | A3CF | 456B | 936E |
| 0000116600 | 0D5F | 66C0 | FFC0 | 184B | 0543 | 058B | DDD0 | FFD1 |
| 0000116620 | C05C | A3CF | 186B | 936E | 0D5F | 66C0 | FFC0 | 0543 |
| 0000116640 | 058B | DDD0 | FFD1 | C051 | A3CF | 186B | 936E | 0D5F |
| 0000116660 | 66C0 | FFC0 | 0550 | 05AB | 6CE0 | FFD2 | 07A9 | 6AA0 |
| 0000116700 | FFD2 | 4969 | C31E | 07A9 | 6B20 | FFD2 | 1029 | 0789 |
| 0000116720 | 6B20 | FFD2 | 07AB | 6BA0 | FFD2 | 4969 | C80C | A3CF |
| 0000116740 | 1A49 | 932E | 0D5F | 66C0 | FFC0 | 18EB | 0543 | 058B |
| 0000116760 | DDD0 | FFD1 | C02A | 1869 | 0543 | 0589 | DDD0 | FFD1 |
| 0000117000 | C024 | 4529 | 0543 | 0589 | DDD0 | FFD1 | C01E | A3CF |
| 0000117020 | 456B | 936E | 0D5F | 66C0 | FFC0 | 18E9 | 0543 | 0589 |
| 0000117040 | DDD0 | FFD1 | 182B | 0541 | 058B | DFF0 | FFD1 | C00D |
| 0000117060 | 0543 | 05A8 | DDD0 | FFD1 | CA91 | 1428 | CA9E | 1428 |
| 0000117100 | CAA8 | 1428 | CAB1 | 1488 | CAE2 | 09AF | 0A00 | 0960 |
| 0000117120 | 098F | 0150 | 0541 | 05AB | DFF0 | FFD1 | CA60 | A3CF |
| 0000117140 | 456B | 936E | 0D5F | 1D30 | FFC6 | 0541 | 058B | DFF0 |
| 0000117160 | FFD1 | 07A9 | DE70 | FFD1 | 0550 | 8527 | 0587 | E4F0 |
| 0000117200 | FFD1 | B527 | 0010 | 0587 | E500 | FFD1 | B527 | 0020 |

THU MAR 14 17:37:32 1991 GSPMON.4 PAGE 44, LINE 2538

| | | | | | | | | |
|---|---|---|---|---|---|---|---|---|
| 0000117220 | 0587 | E510 | FFD1 | B527 | 0030 | 0587 | E520 | FFD1 |
| 0000117240 | 07A7 | DE90 | FFD1 | 84E7 | 0587 | E530 | FFD1 | 07A7 |
| 0000117260 | DE90 | FFD1 | B4E7 | 0010 | 0587 | E540 | FFD1 | 07A7 |
| 0000117300 | DE90 | FFD1 | B4E7 | 0020 | 0587 | E550 | FFD1 | 07A7 |
| 0000117320 | DE90 | FFD1 | B4E7 | 0030 | 0587 | E560 | FFD1 | A3CF |
| 0000117340 | 09E7 | E4F0 | FFD1 | 92EE | 0D5F | C680 | FFC5 | 0787 |
| 0000117360 | DE20 | FFD1 | 09C9 | 0810 | 0789 | DE40 | FFD1 | A3CF |
| 0000117400 | 194B | 936E | 09EB | DE20 | FFD1 | 936E | 1827 | 92EE |
| 0000117420 | 0D5F | 4490 | FFC0 | 0D5F | AD60 | FFC4 | C011 | 0D5F |
| 0000117440 | 1F10 | FFC6 | 4D07 | CA0C | A3CF | 456B | 936E | 936E |
| 0000117460 | 1869 | 932E | 0D5F | 4490 | FFC0 | 0D5F | AD60 | FFC4 |
| 0000117500 | 09AF | 0A80 | 0960 | 098F | 0050 | A3CF | 0570 | 05AB |
| 0000117520 | 9920 | FFD1 | 936E | 0D5F | 6480 | FFC0 | A3CF | 456B |
| 0000117540 | 936E | 936E | 0D5F | 6660 | FFC0 | 0550 | 058B | E020 |
| 0000117560 | FFD1 | 058B | E0E0 | FFD1 | 078B | 07F0 | FFC7 | 182B |
| 0000117600 | 0541 | 058B | 6B50 | FFD2 | 456B | 058B | E000 | FFD1 |
| 0000117620 | 058B | E050 | FFD1 | 058B | E060 | FFD1 | 184B | 0550 |
| 0000117640 | 058B | E030 | FFD1 | 182B | 0541 | 058B | E0C0 | FFD1 |
| 0000117660 | 456B | 0550 | 058B | E0D0 | FFD1 | 0541 | 058B | E0B0 |
| 0000117700 | FFD1 | 058B | E040 | FFD1 | 058B | E080 | FFD1 | 078B |
| 0000117720 | E0F0 | FFD1 | 058B | E090 | FFD1 | 058B | EDA0 | FFD1 |
| 0000117740 | A3CF | D60E | DD60 | FFD1 | 0D5F | 2190 | FFC6 | A3CF |
| 0000117760 | 182B | 936E | 0D5F | 1D30 | FFC6 | 184B | 0543 | 058B |
| 0000120000 | DDE0 | FFD1 | 09E9 | 1A90 | FFC5 | 0789 | 6B60 | FFD2 |
| 0000120020 | 09EB | 3970 | FFC5 | 078B | 6B80 | FFD2 | 09AF | 0A00 |
| 0000120040 | 0960 | 098F | 0050 | C000 | 01D7 | A3CF | 186B | 936E |
| 0000120060 | 0D5F | 66C0 | FFC0 | 456B | 078B | 6B20 | FFD2 | 186B |
| 0000120100 | 0543 | 058B | DDE0 | FFD1 | C000 | 01D6 | 186B | 058B |
| 0000120120 | DDE0 | FFD1 | 0550 | 05AB | 6CE0 | FFD2 | 07A9 | 6AA0 |
| 0000120140 | FFD2 | 4969 | C300 | 0085 | 07A9 | E0F0 | FFD1 | CA0C |
| 0000120160 | 4529 | 0789 | E0F0 | FFD1 | 0789 | 6B20 | FFD2 | 05C0 |
| 0000120200 | E020 | FFD1 | E0E0 | FFD1 | 1829 | 0541 | 0589 | E080 |
| 0000120220 | FFD1 | 07A9 | 6B20 | FFD2 | 1029 | 0789 | 6B20 | FFD2 |
| 0000120240 | 07AB | 6BC0 | FFD2 | 4969 | C850 | 0550 | 05A9 | E020 |
| 0000120260 | FFD1 | 1029 | 05AB | 6DB0 | FFD2 | 6F69 | 05AB | E0E0 |
| 0000120300 | FFD1 | 4969 | CB0B | 1829 | 0541 | 0589 | E040 | FFD1 |
| 0000120320 | 18E9 | 0543 | 0589 | DDE0 | FFD1 | C037 | 05A9 | E030 |
| 0000120340 | FFD1 | 1449 | CB06 | 1829 | 0541 | 0589 | E000 | FFD1 |
| 0000120360 | C02C | 05A9 | E030 | FFD1 | CB28 | A3CF | 1829 | 932E |
| 0000120400 | 0D5F | 1D30 | FFC6 | 184B | 0550 | 058B | E030 | FFD1 |
| 0000120420 | 05A9 | E020 | FFD1 | 1029 | 05AB | 6DB0 | FFD2 | 6F69 |
| 0000120440 | 0589 | E020 | FFD1 | 07A9 | 07F0 | FFC7 | 03A9 | 1029 |
| 0000120460 | 0789 | 07F0 | FFC7 | A3CF | 05A9 | E020 | FFD1 | 932E |
| 0000120500 | 4529 | 932E | 0D5F | 6660 | FFC0 | 07AB | 07F0 | FFC7 |
| 0000120520 | CB08 | A3CF | 1869 | 932E | 0D5F | 66C0 | FFC0 | C000 |
| 0000120540 | 014B | A3CF | 18A9 | 932E | 0D5F | 66C0 | FFC0 | C00C |
| 0000120560 | 0143 | 07A9 | 07F0 | FFC7 | CB07 | A3CF | 1869 | 932E |
| 0000120600 | 0D5F | 66C0 | FFC0 | C006 | A3CF | 18A9 | 932E | 0D5F |
| 0000120620 | 66C0 | FFC0 | 0541 | 05AB | E0B0 | FFD1 | CA09 | 4529 |
| 0000120640 | 0589 | E0B0 | FFD1 | 07C0 | 6AA0 | FFD2 | E0F0 | FFD1 |
| 0000120660 | 07AB | E0F0 | FFD1 | CB0B | 4529 | 0789 | 6B20 | FFD2 |
| 0000120700 | 07C0 | 6AA0 | FFD2 | E0F0 | FFD1 | C000 | 0115 | A3CF |
| 0000120720 | 07A9 | 6AA0 | FFD2 | 4569 | 932E | 0D5F | 6C40 | FFC6 |
| 0000120740 | 0550 | 05AB | 6CE0 | FFD2 | 4968 | C300 | 0081 | 07A9 |
| 0000120760 | 6B20 | FFD2 | 1029 | 0789 | 6B20 | FFD2 | 07AB | 6BC0 |
| 0000121000 | FFD2 | 4969 | C800 | 00F8 | 0541 | 05A9 | E090 | FFD1 |
| 0000121020 | CB56 | 0550 | 05A9 | E030 | FFD1 | CA02 | 1449 | CB4F |
| 0000121040 | A3CF | 1829 | 932E | 0D5F | 1D30 | FFC6 | 0541 | 05AB |
| 0000121060 | E0C0 | FFD1 | C929 | 0550 | 05A9 | 6DB0 | FFD2 | 1429 |

THU MAR 14 17:37:32 1991 GSPMON.4 PAGE 45, LINE 2597

| | | | | | | | | |
|---|---|---|---|---|---|---|---|---|
| 0000121100 | C223 | 1829 | 0541 | 0589 | E0B0 | FFD1 | 0550 | 05AB |
| 0000121120 | E020 | FFD1 | 102B | 05A9 | 6DB0 | FFD2 | 6F2B | 058B |
| 0000121140 | E020 | FFD1 | 07AB | 07F0 | FFC7 | 03AB | 102B | 078B |
| 0000121160 | 07F0 | FFC7 | A3CF | 05A9 | E020 | FFD1 | 932E | 4529 |
| 0000121200 | 932E | 0D5F | 6660 | FFC0 | 07AB | 07F0 | FFC7 | CB07 |
| 0000121220 | A3CF | 19C9 | 932E | 0D5F | 66C0 | FFC0 | C006 | A3CF |
| 0000121240 | 19E9 | 932E | 0D5F | 66C0 | FFC0 | 18CB | 0543 | 058B |
| 0000121260 | DDE0 | FFD1 | 4529 | 0541 | 0589 | E0C0 | FFD1 | 0550 |
| 0000121300 | 05AB | E020 | FFD1 | 102B | 05A9 | 6DB0 | FFD2 | 6F2B |
| 0000121320 | 05A9 | E0E0 | FFD1 | 492B | CB00 | 008E | 182B | 0541 |
| 0000121340 | 058B | E090 | FFD1 | 058B | E0A0 | FFD1 | C000 | 0084 |
| 0000121360 | 4529 | 0789 | 6B20 | FFD2 | 07C0 | 6AA0 | FFD2 | E0F0 |
| 0000121400 | FFD1 | 05C0 | E020 | FFD1 | E0E0 | FFD1 | 0541 | 0589 |
| 0000121420 | E090 | FFD1 | C071 | A3CF | 18EB | 936E | 0D5F | 66C0 |
| 0000121440 | FFC0 | 07A9 | 07F0 | FFC7 | CB06 | 182B | 0541 | 058B |
| 0000121460 | E2A0 | FFD1 | C005 | 182B | 0541 | 058B | E290 | FFD1 |
| 0000121500 | 18CB | 0543 | 058B | DDE0 | FFD1 | C056 | 07AB | 07F0 |
| 0000121520 | FFC7 | CB07 | A3CF | 1869 | 932E | 0D5F | 66C0 | FFC0 |
| 0000121540 | C006 | A3CF | 18A9 | 932E | 0D5F | 66C0 | FFC0 | 0550 |
| 0000121560 | 05AB | 6DB0 | FFD2 | 142B | CA18 | 05AB | E020 | FFD1 |
| 0000121600 | 102B | 05A9 | 6DB0 | FFD2 | 6F2B | 05A9 | E0E0 | FFD1 |
| 0000121620 | 492B | CB06 | 182B | 0541 | 058B | E060 | FFD1 | C005 |
| 0000121640 | 182B | 0541 | 058B | E050 | FFD1 | 186B | 0543 | 058B |
| 0000121660 | DDE0 | FFD1 | C021 | A3CF | 456B | 936E | 0D5F | 66C0 |
| 0000121700 | FFC0 | 18E9 | 0543 | 0589 | DDE0 | FFD1 | 182B | 0541 |
| 0000121720 | 058B | DFF0 | FFD1 | C010 | 0543 | 05A8 | DDE0 | FFD1 |
| 0000121740 | 1448 | CA00 | FE22 | 1428 | CA00 | FE30 | 1448 | CA93 |
| 0000121760 | 1428 | CAAC | 1428 | CADF | 09AF | 0A00 | 0960 | 098F |
| 0000122000 | 0154 | 4DCD | 120E | 0D5F | 1F10 | FFC6 | 4D08 | CA4F |
| 0000122020 | 0541 | 05AB | E080 | FFD1 | CA03 | 09C9 | 0033 | C002 |
| 0000122040 | 09C9 | 0034 | 0550 | 0589 | E110 | FFD1 | 0541 | 05A9 |
| 0000122060 | E0A0 | FFD1 | CA03 | 09C9 | 0035 | C002 | 09C9 | 0036 |
| 0000122100 | 0550 | 0589 | E120 | FFD1 | 07A9 | 6D30 | FFD2 | 4D27 |
| 0000122120 | 2447 | 4127 | 0787 | E140 | FFD1 | 456B | 058B | E130 |
| 0000122140 | FFD1 | 0541 | 05A7 | E090 | FFD1 | CA10 | 0550 | 05A7 |
| 0000122160 | E030 | FFD1 | 3967 | 0541 | 05AB | E090 | FFD1 | CA06 |
| 0000122200 | 0550 | 05A9 | E030 | FFD1 | 1429 | CAF5 | A3CF | 194B |
| 0000122220 | 936E | 09E9 | E110 | FFD1 | 932E | 1867 | 92EE | 0D5F |
| 0000122240 | 4490 | FFC0 | 0D5F | AD60 | FFC4 | C000 | 0150 | 0541 |
| 0000122260 | 05AB | E040 | FFD1 | CA11 | 0D5F | 1E10 | FFC6 | A3CF |
| 0000122300 | 456B | 936E | 936E | 1829 | 932E | 0D5F | 4490 | FFC0 |
| 0000122320 | 0D5F | AD60 | FFC4 | C000 | 013A | 05A9 | E000 | FFD1 |
| 0000122340 | CA35 | A3CF | 44E7 | 92EE | 0D5F | 1D30 | FFC6 | 0541 |
| 0000122360 | 0587 | E000 | FFD1 | 07AB | 07F0 | FFC7 | CB06 | 07C0 |
| 0000122400 | 6D30 | FFD2 | E140 | FFD1 | C003 | 0787 | E140 | FFD1 |
| 0000122420 | 0550 | 05A9 | E020 | FFD1 | 1029 | 05A7 | 6DB0 | FFD2 |
| 0000122440 | 6EE9 | 0589 | E130 | FFD1 | 1829 | 0589 | E030 | FFD1 |
| 0000122460 | A3CF | 1947 | 92EE | 09E7 | E110 | FFD1 | 92EE | 18A7 |
| 0000122500 | 92EE | 0D5F | 4490 | FFC0 | C000 | 0101 | 05A7 | E050 |
| 0000122520 | FFD1 | CA67 | 0550 | 05A7 | E0D0 | FFD1 | 1027 | 0587 |
| 0000122540 | E0D0 | FFD1 | 0527 | 14A7 | CB2D | 0541 | 05A7 | E080 |
| 0000122560 | FFD1 | CA03 | 09C7 | 0033 | C002 | 09C7 | 0034 | 0550 |
| 0000122600 | 0587 | E110 | FFD1 | 0541 | 05A7 | E090 | FFD1 | CA03 |
| 0000122620 | 09C7 | 0035 | C002 | 09C7 | 0036 | 0550 | 0587 | E120 |
| 0000122640 | FFD1 | A3CF | 1947 | 92EE | 09E7 | E110 | FFD1 | 92EE |
| 0000122660 | 1867 | 92EE | 0D5F | 4490 | FFC0 | 0D5F | AD60 | FFC4 |
| 0000122700 | C000 | 00C5 | A3CF | 44E7 | 92EE | 0D5F | 1D30 | FFC6 |
| 0000122720 | 0541 | 0587 | E050 | FFD1 | 07AB | 07F0 | FFC7 | CB06 |
| 0000122740 | 07C0 | 6D30 | FFD2 | E140 | FFD1 | C003 | 0787 | E140 |

THU MAR 14 17:37:32 1991 GSPMON.4 PAGE 46, LINE 2656

| | | | | | | | | |
|---|---|---|---|---|---|---|---|---|
| 0000122760 | FFD1 | 0550 | 05C0 | E020 | FFD1 | E130 | FFD1 | 1829 |
| 0000123000 | 0589 | E030 | FFD1 | A3CF | 1947 | 92EE | 09E7 | E110 |
| 0000123020 | FFD1 | 92EE | 18C7 | 92EE | 0D5F | 4490 | FFC0 | C000 |
| 0000123040 | 0096 | 05A7 | E060 | FFD1 | CA28 | 44E7 | 0587 | E060 |
| 0000123060 | FFD1 | 07A9 | 07F0 | FFC7 | CB06 | 07C0 | 6D30 | FFD2 |
| 0000123100 | E140 | FFD1 | C003 | 0787 | E140 | FFD1 | 0550 | 05C0 |
| 0000123120 | E020 | FFD1 | E130 | FFD1 | 182B | 058B | E030 | FFD1 |
| 0000123140 | A3CF | 1947 | 92EE | 09E7 | E110 | FFD1 | 92EE | 18E7 |
| 0000123160 | 92EE | 0D5F | 4490 | FFC0 | C06A | 05A7 | E290 | FFD1 |
| 0000123200 | CA30 | A3CF | 09E7 | 00B0 | C000 | 92EE | 0D5F | B070 |
| 0000123220 | FFC6 | 0550 | 810D | A3CF | 456B | 936E | 0D5F | B500 |
| 0000123240 | FFC6 | A3CF | 936E | 936E | 09C9 | 1000 | 932E | 936E |
| 0000123260 | 0550 | 05AB | 6D70 | FFD2 | 936E | 05A7 | 6D60 | FFD2 |
| 0000123300 | 92EE | 0D5F | ACA0 | FFC6 | A3CF | 0550 | 85AB | 936E |
| 0000123320 | 0D5F | B500 | FFC6 | 44E7 | 0541 | 0587 | E290 | FFD1 |
| 0000123340 | C036 | 05A7 | E2A0 | FFD1 | CA32 | A3CF | 09E7 | 00B0 |
| 0000123360 | C000 | 92EE | 0D5F | B070 | FFC6 | 0550 | 810D | A3CF |
| 0000123400 | 456B | 936E | 0D5F | B500 | FFC6 | A3CF | 09C9 | 0400 |
| 0000123420 | 932E | 936E | 09CB | 1000 | 936E | 44E7 | 92EE | 0550 |
| 0000123440 | 05A7 | 6D70 | FFD2 | 92EE | 05A9 | 6D60 | FFD2 | 932E |
| 0000123460 | 0D5F | ACA0 | FFC6 | A3CF | 0550 | 85A9 | 932E | 0D5F |
| 0000123500 | B500 | FFC6 | 44E7 | 0541 | 0587 | E2A0 | FFD1 | 160E |
| 0000123520 | 09AF | 2A80 | 0960 | 098F | 0050 | A3CF | 0570 | 05AB |
| 0000123540 | 9910 | FFD1 | 936E | 0D5F | 6480 | FFC0 | A3CF | 0550 |
| 0000123560 | 05AB | 6DB0 | FFD2 | 142B | 936E | 182B | 936E | 0D5F |
| 0000123600 | 6660 | FFC0 | 0541 | 058B | 6B50 | FFD2 | 456B | 058B |
| 0000123620 | E070 | FFD1 | 058B | E080 | FFD1 | 058B | E0A0 | FFD1 |
| 0000123640 | 058B | E090 | FFD1 | A3CF | D60E | DD60 | FFD1 | 0D5F |
| 0000123660 | 2190 | FFC6 | A3CF | 182B | 936E | 0D5F | 1D30 | FFC6 |
| 0000123700 | 456B | 0543 | 058B | DE00 | FFD1 | 09E9 | 58C0 | FFC5 |
| 0000123720 | 0789 | 6B60 | FFD2 | 09EB | 5FF0 | FFC5 | 078B | 6B80 |
| 0000123740 | FFD2 | 09AF | 0A00 | 0960 | 098F | 0050 | C062 | A3CF |
| 0000123760 | 456B | 936E | 0D5F | 66C0 | FFC0 | 184B | 0543 | 058B |
| 0000124000 | DE00 | FFD1 | C061 | A3CF | 186B | 936E | 0D5F | 66C0 |
| 0000124020 | FFC0 | 456B | 078B | 6B20 | FFD2 | 186B | 0543 | 058B |
| 0000124040 | DE00 | FFD1 | C051 | A3CF | 186B | 936E | 0D5F | 66C0 |
| 0000124060 | FFC0 | 0550 | 05AB | 6CE0 | FFD2 | 07A9 | 6AA0 | FFD2 |
| 0000124100 | 4969 | C323 | 07A9 | 6B20 | FFD2 | 1029 | 0789 | 6B20 |
| 0000124120 | FFD2 | 07AB | 6BA0 | FFD2 | 4969 | C811 | 0541 | 05A9 |
| 0000124140 | E090 | FFD1 | CB31 | A3CF | 1A49 | 932E | 0D5F | 66C0 |
| 0000124160 | FFC0 | 18EB | 0543 | 058B | DE00 | FFD1 | C025 | 1869 |
| 0000124200 | 0543 | 0589 | DE00 | FFD1 | C01F | 4529 | 0541 | 0589 |
| 0000124220 | E090 | FFD1 | 0543 | 0589 | DE00 | FFD1 | C015 | 184B |
| 0000124240 | 058B | DE00 | FFD1 | 1829 | 0541 | 0589 | E070 | FFD1 |
| 0000124260 | C00B | 0543 | 05A8 | DE00 | FFD1 | CA99 | 1448 | CAA3 |
| 0000124300 | 1428 | CAB1 | 1488 | CAEB | 09AF | 0A00 | 0960 | 098F |
| 0000124320 | 0050 | 0541 | 05AB | E070 | FFD1 | CA44 | 0550 | 05C0 |
| 0000124340 | 9970 | FFD1 | 2570 | FFD2 | 05C0 | 9980 | FFD1 | 2580 |
| 0000124360 | FFD2 | 05C0 | 9990 | FFD1 | 2590 | FFD2 | 05C0 | 99A0 |
| 0000124400 | FFD1 | 25A0 | FFD2 | A3CF | 09E9 | 2570 | FFD2 | 932E |
| 0000124420 | 0D5F | A510 | FFC5 | A3CF | 09EB | 9970 | FFD1 | 936E |
| 0000124440 | 932E | 0D5F | EA50 | FFC5 | 3A08 | 0D5F | 1E10 | FFC6 |
| 0000124460 | A3CF | 4529 | 932E | 932E | 1829 | 932E | 0D5F | 4490 |
| 0000124500 | FFC0 | 0D5F | AD60 | FFC4 | C043 | 4529 | 0541 | 0589 |
| 0000124520 | E070 | FFD1 | 182B | 058B | E090 | FFD1 | 058B | E0A0 |
| 0000124540 | FFD1 | C036 | 0D5F | 1F10 | FFC6 | 4D09 | CA31 | 0541 |
| 0000124560 | 05AB | E080 | FFD1 | CA03 | 09C9 | 0033 | C002 | 09C9 |
| 0000124600 | 0034 | 0550 | 0589 | E1B0 | FFD1 | 0541 | 05A9 | E0A0 |
| 0000124620 | FFD1 | CA03 | 09C9 | 0035 | C002 | 09C9 | 0036 | 0550 |

THU MAR 14 17:37:32 1991 GSPMON.4 PAGE 47, LINE 2715

| | | | | | | | | |
|---|---|---|---|---|---|---|---|---|
| 0000124640 | 0589 | E1C0 | FFD1 | 09E9 | 2570 | FFD2 | 0789 | E1E0 |
| 0000124660 | FFD1 | A3CF | 194B | 936E | 09EB | E1B0 | FFD1 | 936E |
| 0000124700 | 1869 | 932E | 0D5F | 4490 | FFC0 | 0D5F | AD60 | FFC4 |
| 0000124720 | 09AF | 0A00 | 0960 | 098F | 0050 | A3CF | 0570 | 05AB |
| 0000124740 | 9910 | FFD1 | 936E | 0D5F | 6480 | FFC0 | A3CF | 0550 |
| 0000124760 | 05AB | 6DB0 | FFD2 | 142B | 936E | 182B | 936E | 0D5F |
| 0000125000 | 6660 | FFC0 | 0541 | 058B | 6B50 | FFD2 | 456B | 058B |
| 0000125020 | E070 | FFD1 | 058B | E080 | FFD1 | 058B | E0A0 | FFD1 |
| 0000125040 | 058B | E090 | FFD1 | A3CF | D60E | DD60 | FFD1 | 0D5F |
| 0000125060 | 2190 | FFC6 | A3CF | 182B | 936E | 0D5F | 1D30 | FFC6 |
| 0000125100 | 456B | 0543 | 058B | DE00 | FFD1 | 09E9 | 58C0 | FFC5 |
| 0000125120 | 0789 | 6B60 | FFD2 | 09EB | 6CC0 | FFC5 | 078B | 6B80 |
| 0000125140 | FFD2 | 09AF | 0A00 | 0960 | 098F | 0054 | 4DCD | 120E |
| 0000125160 | 0541 | 05AB | E070 | FFD1 | CA3E | A3CF | 09CB | 0026 |
| 0000125200 | 936E | 09EB | 9BB0 | FFD1 | 936E | 09EB | 27B0 | FFD2 |
| 0000125220 | 936E | 0D5F | 776D | FFC6 | A3CF | 936E | 0D5F | B550 |
| 0000125240 | FFC5 | A3CF | 09EB | 9BB0 | FFD1 | 936E | 09EB | 27B0 |
| 0000125260 | FFD2 | 936E | 0D5F | ED20 | FFC5 | 3A08 | 0D5F | 1E10 |
| 0000125300 | FFC6 | A3CF | 456B | 936E | 936E | 182B | 936E | 0D5F |
| 0000125320 | 4490 | FFC0 | 0D5F | AD60 | FFC4 | C043 | 456B | 0541 |
| 0000125340 | 058B | E070 | FFD1 | 182B | 058B | E090 | FFD1 | 058B |
| 0000125360 | E0A0 | FFD1 | C036 | 0D5F | 1F10 | FFC6 | 4D0B | CA31 |
| 0000125400 | 0541 | 05AB | E080 | FFD1 | CA03 | 09C9 | 0033 | C002 |
| 0000125420 | 09C9 | 0034 | 0550 | 0589 | E1B0 | FFD1 | 0541 | 05A9 |
| 0000125440 | E0A0 | FFD1 | CA03 | 09C9 | 0035 | C002 | 09C9 | 0036 |
| 0000125460 | 0550 | 0589 | E1C0 | FFD1 | 09E9 | 27B0 | FFD2 | 0789 |
| 0000125500 | E1E0 | FFD1 | A3CF | 194B | 936E | 09EB | E1B0 | FFD1 |
| 0000125520 | 936E | 1869 | 932E | 0D5F | 4490 | FFC0 | 0D5F | AD60 |
| 0000125540 | FFC4 | 160E | 09AF | 2A00 | 0960 | 098F | 0050 | A3CF |
| 0000125560 | 0570 | 05AB | 9920 | FFD1 | 936E | 0D5F | 6480 | FFC0 |
| 0000125600 | A3CF | 0550 | 05AB | 6DB0 | FFD2 | 142B | 936E | 182B |
| 0000125620 | 936E | 0D5F | 6660 | FFC0 | 456B | 0550 | 058B | E020 |
| 0000125640 | FFD1 | 182B | 0541 | 058B | 6B50 | FFD2 | 456B | 058B |
| 0000125660 | E070 | FFD1 | 058B | E050 | FFD1 | 058B | E080 | FFD1 |
| 0000125700 | 058B | E0A0 | FFD1 | 0550 | 058B | E0D0 | FFD1 | 058B |
| 0000125720 | E030 | FFD1 | 0541 | 058B | E090 | FFD1 | A3CF | D60E |
| 0000125740 | DD60 | FFD1 | 0D5F | 2190 | FFC6 | A3CF | 182B | 936E |
| 0000125760 | 0D5F | 1D30 | FFC6 | 456B | 0543 | 058B | DDF0 | FFD1 |
| 0000126000 | 09E9 | 7A70 | FFC5 | 0789 | 6B60 | FFD2 | 09EB | 8D80 |
| 0000126020 | FFC5 | 078B | 6B80 | FFD2 | 09AF | 0A00 | 0960 | 098F |
| 0000126040 | 0050 | C000 | 010D | A3CF | 456B | 936E | 0D5F | 66C0 |
| 0000126060 | FFC0 | 184B | 0543 | 058B | DDF0 | FFD1 | C000 | 011D |
| 0000126100 | A3CF | 186B | 936E | 0D5F | 66C0 | FFC0 | 456B | 078B |
| 0000126120 | 6B20 | FFD2 | 186B | 0543 | 058B | DDF0 | FFD1 | C000 |
| 0000126140 | 010C | A3CF | 186B | 936E | 0D5F | 66C0 | FFC0 | 0550 |
| 0000126160 | 05AB | 6CE0 | FFD2 | 07A9 | 6AA0 | FFD2 | 4969 | C32A |
| 0000126200 | 1829 | 0541 | 0589 | E080 | FFD1 | 07A9 | 6B20 | FFD2 |
| 0000126220 | 1029 | 0789 | 6B20 | FFD2 | 07AB | 6BA0 | FFD2 | 4969 |
| 0000126240 | C812 | 05A9 | E090 | FFD1 | CB00 | 00E7 | A3CF | 1A49 |
| 0000126260 | 932E | 0D5F | 66C0 | FFC0 | 18EB | 0543 | 058B | DDF0 |
| 0000126300 | FFD1 | C000 | 00DA | 1869 | 0543 | 0589 | DDF0 | FFD1 |
| 0000126320 | C000 | 00D3 | 4529 | 0541 | 0589 | E090 | FFD1 | 0543 |
| 0000126340 | 0589 | DDF0 | FFD1 | C000 | 00C8 | A3CF | 0550 | 05AB |
| 0000126360 | 6DB0 | FFD2 | 142B | 936E | 182B | 936E | 0D5F | 6660 |
| 0000126400 | FFC0 | A3CF | 1869 | 932E | 0D5F | 66C0 | FFC0 | 0550 |
| 0000126420 | 05A9 | E030 | FFD1 | CA07 | 188B | 0543 | 058B | DDF0 |
| 0000126440 | FFD1 | C000 | 00AA | 18AB | 0543 | 058B | DDF0 | FFD1 |
| 0000126460 | 1829 | 0541 | 0589 | E050 | FFD1 | C000 | 009E | A3CF |
| 0000126500 | 186B | 936E | 0D5F | 66C0 | FFC0 | 0550 | 05A9 | 6CE0 |

THU MAR 14 17:37:32 1991 GSPMON.4 PAGE 48, LINE 2774

| | | | | | | | | |
|---|---|---|---|---|---|---|---|---|
| 0000126520 | FFD2 | 07AB | 6AA0 | FFD2 | 492B | C333 | 07A9 | 6B20 |
| 0000126540 | FFD2 | 1029 | 0789 | 6B20 | FFD2 | 0541 | 05A9 | E0A0 |
| 0000126560 | FFD1 | CB00 | 0082 | 0550 | 05A9 | E030 | FFD1 | CB7D |
| 0000126600 | A3CF | 1829 | 932E | 0D5F | 1D30 | FFC6 | 0550 | 05AB |
| 0000126620 | E020 | FFD1 | 102B | 058B | E020 | FFD1 | A3CF | 936E |
| 0000126640 | 4529 | 932E | 0D5F | 6660 | FFC0 | A3CF | 182B | 936E |
| 0000126660 | 0D5F | 66C0 | FFC0 | 1889 | 0543 | 0589 | DDF0 | FFD1 |
| 0000126700 | C05C | A3CF | 4529 | 932E | 0D5F | 66C0 | FFC0 | 0789 |
| 0000126720 | 6B20 | FFD2 | 184B | 0543 | 058B | DDF0 | FFD1 | 0541 |
| 0000126740 | 0589 | E090 | FFD1 | C049 | 0550 | 05AB | 6DB0 | FFD2 |
| 0000126760 | 398B | A3CF | 1AAB | 936E | 0D5F | 66C0 | FFC0 | 1849 |
| 0000127000 | 0543 | 0585 | DDF0 | FFD1 | C015 | 456B | 058B | E020 |
| 0000127020 | FFD1 | A3CF | 936E | 936E | 0D5F | 6660 | FFC0 | A3CF |
| 0000127040 | 1829 | 932E | 0D5F | 66C0 | FFC0 | 1889 | 0543 | 0589 |
| 0000127060 | DDF0 | FFD1 | 182B | 0541 | 058B | E070 | FFD1 | C01D |
| 0000127100 | 0543 | 05A8 | DDF0 | FFD1 | 0B48 | FFF8 | C316 | 24A8 |
| 0000127120 | 0B28 | 8C50 | FFC5 | 8708 | 0168 | 7AB0 | FFC5 | 8D50 |
| 0000127140 | FFC5 | 7B80 | FFC5 | 7C90 | FFC5 | 80D0 | FFC5 | 8370 |
| 0000127160 | FFC5 | 8D50 | FFC5 | 88C0 | FFC5 | 09AF | 0A00 | 0960 |
| 0000127200 | 098F | 0050 | 0541 | 05AB | E070 | FFD1 | CA7E | 0550 |
| 0000127220 | 05C0 | 9CE0 | FFD1 | 28E0 | FFD2 | 05C0 | 9CF0 | FFD1 |
| 0000127240 | 28F0 | FFD2 | 05C0 | 9D00 | FFD1 | 2900 | FFD2 | 05C0 |
| 0000127260 | 9D10 | FFD1 | 2910 | FFD2 | 05C0 | 9D20 | FFD1 | 2920 |
| 0000127300 | FFD2 | 05C0 | 9D30 | FFD1 | 2930 | FFD2 | 05C0 | 9D40 |
| 0000127320 | FFD1 | 2940 | FFD2 | 05C0 | 9D50 | FFD1 | 2950 | FFD2 |
| 0000127340 | A3CF | 09E9 | 28E0 | FFD2 | 932E | 0D5F | C680 | FFC5 |
| 0000127360 | A3CF | 09EB | 9CE0 | FFD1 | 936E | 932E | 0D5F | F0E0 |
| 0000127400 | FFC5 | 3A28 | 0D5F | 1E10 | FFC6 | A3CF | 4529 | 932E |
| 0000127420 | 932E | 1829 | 932E | 0D5F | 4490 | FFC0 | 0D5F | AD60 |
| 0000127440 | FFC4 | C000 | 0123 | 4529 | 0541 | 0589 | E070 | FFD1 |
| 0000127460 | 0550 | 05AB | 6DB0 | FFD2 | 394B | 182B | 0541 | 058B |
| 0000127500 | E090 | FFD1 | 058B | E0A0 | FFD1 | C000 | 010F | A3CF |
| 0000127520 | 932E | 0D5F | 1D30 | FFC6 | 09EB | 28E0 | FFD2 | 078B |
| 0000127540 | E190 | FFD1 | 1829 | 0550 | 0589 | E030 | FFD1 | A3CF |
| 0000127560 | 1949 | 932E | 09E9 | E160 | FFD1 | 932E | 1909 | 932E |
| 0000127600 | 0D5F | 4490 | FFC0 | C000 | 00F1 | 05A9 | E050 | FFD1 |
| 0000127620 | CA73 | 0550 | 05A9 | E0D0 | FFD1 | 1029 | 0589 | E0D0 |
| 0000127640 | FFD1 | 0529 | 14A9 | CB2D | 0541 | 05A9 | E080 | FFD1 |
| 0000127660 | CA03 | 09C9 | 0033 | C002 | 09C9 | 0034 | 0550 | 0589 |
| 0000127700 | E160 | FFD1 | 0541 | 05A9 | E0A0 | FFD1 | CA03 | 09C9 |
| 0000127720 | 0035 | C002 | 09C9 | 0036 | 0550 | 0589 | E170 | FFD1 |
| 0000127740 | A3CF | 1949 | 932E | 09E9 | E160 | FFD1 | 932E | 1869 |
| 0000127760 | 932E | 0D5F | 4490 | FFC0 | 0D5F | AD60 | FFC4 | C000 |
| 0000130000 | 00B5 | 4529 | 0541 | 0589 | E050 | FFD1 | 07C0 | 6D30 |
| 0000130020 | FFD2 | E190 | FFD1 | 0550 | 05C0 | E020 | FFD1 | E180 |
| 0000130040 | FFD1 | 182B | 058B | E030 | FFD1 | A3CF | 1949 | 932E |
| 0000130060 | 09E9 | E160 | FFD1 | 932E | 18C9 | 932E | 0D5F | 4490 |
| 0000130100 | FFC0 | 0550 | 05A9 | 6DB0 | FFD2 | 05AB | E020 | FFD1 |
| 0000130120 | 102B | 492B | CB0A | 182B | 0541 | 058B | E090 | FFD1 |
| 0000130140 | 058B | E0A0 | FFD1 | C000 | 0081 | A3CF | 456B | 936E |
| 0000130160 | 0D5F | 1D30 | FFC6 | C07A | 0D5F | 1F10 | FFC6 | 4D09 |
| 0000130200 | CA75 | 0541 | 05AB | E080 | FFD1 | CA03 | 09C9 | 0033 |
| 0000130220 | C002 | 09C9 | 0034 | 0550 | 0589 | E160 | FFD1 | 0541 |
| 0000130240 | 05A9 | E0A0 | FFD1 | CA03 | 09C9 | 0035 | C002 | 09C9 |
| 0000130260 | 0036 | 0550 | 0589 | E170 | FFD1 | 05A9 | 6DB0 | FFD2 |
| 0000130300 | 0D89 | 0030 | 0541 | 05A9 | E0A0 | FFD1 | CA2B | 1829 |
| 0000130320 | 0550 | 0589 | E030 | FFD1 | 09EB | 28E0 | FFD2 | 078B |
| 0000130340 | E190 | FFD1 | A3CF | 1949 | 932E | 09E9 | E160 | FFD1 |
| 0000130360 | 932E | 1909 | 932E | 0D5F | 4490 | FFC0 | 0550 | 05A9 |

THU MAR 14 17:37:32 1991 GSPMON.4 PAGE 49, LINE 2833

| | | | | | | | | | |
|---|---|---|---|---|---|---|---|---|---|
| 0000130400 | E030 | FFD1 | 38A9 | 05AB | E030 | FFD1 | 142B | CAFB |
| 0000130420 | 07C0 | 6D30 | FFD2 | E190 | FFD1 | 05C0 | E020 | FFD1 |
| 0000130440 | E180 | FFD1 | 0541 | 05AB | E0A0 | FFD1 | CA10 | 0550 |
| 0000130460 | 05A9 | E030 | FFD1 | 3969 | 0541 | 05AB | E0A0 | FFD1 |
| 0000130500 | CA06 | 0550 | 05A9 | E030 | FFD1 | 1429 | CAF5 | A3CF |
| 0000130520 | 1949 | 932E | 09E9 | E160 | FFD1 | 932E | 1869 | 932E |
| 0000130540 | 0D5F | 4490 | FFC0 | 0D5F | AD60 | FFC4 | 09AF | 0A00 |
| 0000130560 | 0960 | 098F | 0154 | 4DCD | 0B0E | 00E0 | B7AB | FFE0 |
| 0000130600 | 0550 | B96D | 0010 | 0000 | B96D | 0020 | 0010 | B96D |
| 0000130620 | 0030 | 0020 | B96D | 0000 | 0030 | 85A9 | 07AB | 6C60 |
| 0000130640 | FFD2 | 5F69 | B32D | 0040 | B5A9 | 0010 | 1429 | 5F69 |
| 0000130660 | 2489 | 07AB | 6D30 | FFD2 | 244B | 412B | B7A9 | 0040 |
| 0000130700 | 2489 | 412B | 07A9 | 6C40 | FFD2 | 2489 | 412B | 05A9 |
| 0000130720 | 6DA0 | FFD2 | 2489 | 452B | B36D | 0060 | B5A9 | 0010 |
| 0000130740 | 07AB | 6C60 | FFD2 | 5F69 | 2489 | 07AB | 6D30 | FFD2 |
| 0000130760 | 244B | 412B | B36D | 0080 | 0541 | 05A9 | 6DC0 | FFD2 |
| 0000131000 | CB0D | B7A7 | FFE0 | A3CF | 936E | D3AE | 0060 | 0D5F |
| 0000131020 | E2A0 | FFC5 | 0550 | B107 | 0040 | C045 | 0550 | 85A7 |
| 0000131040 | 1FE7 | CA21 | A3CF | 936E | D3AE | 0060 | 0D5F | E2A0 |
| 0000131060 | FFC5 | A3CF | 07A9 | 6C60 | FFD2 | 2489 | 4169 | 932E |
| 0000131100 | 07A9 | 6C60 | FFD2 | 2489 | B7A7 | 0060 | 4527 | 92EE |
| 0000131120 | 4D09 | 0D5F | E2A0 | FFC5 | 4109 | B7A7 | FFE0 | 0550 |
| 0000131140 | B127 | 0040 | C020 | A3CF | 07A7 | 6C60 | FFD2 | 2487 |
| 0000131160 | 4167 | 92EE | D3AE | 0060 | 0D5F | E2A0 | FFC5 | A3CF |
| 0000131200 | 936E | 07A9 | 6C60 | FFD2 | 2489 | B7A7 | 0060 | 4527 |
| 0000131220 | 92EE | 4D09 | 0D5F | E2A0 | FFC5 | 4109 | B7A7 | FFE0 |
| 0000131240 | 0550 | B127 | 0040 | BBAD | 0060 | 00A0 | B7A9 | 0040 |
| 0000131260 | 2489 | B7A7 | 0060 | 40E9 | B32D | 0060 | 1827 | B2ED |
| 0000131300 | 00C0 | B5A9 | 0030 | 1429 | 4927 | C928 | B7AB | FFE0 |
| 0000131320 | B7A9 | 00C0 | 2489 | 4169 | A3CF | D3AE | 00A0 | D3AE |
| 0000131340 | 0060 | 0D5F | E2A0 | FFC5 | 0550 | B109 | 0040 | BBAD |
| 0000131360 | 0060 | 00A0 | B7A9 | 0040 | 2489 | B7A7 | 0060 | 40E9 |
| 0000131400 | B32D | 0060 | B7A7 | 00C0 | 1027 | B2ED | 00C0 | B5A7 |
| 0000131420 | 0030 | B7A9 | 00C0 | 1029 | 48E9 | C8D8 | B5AB | 0020 |
| 0000131440 | 07A9 | 6C60 | FFD2 | 5F2B | 248B | 07A7 | 6D30 | FFD2 |
| 0000131460 | 2447 | 4167 | 07AB | 6C40 | FFD2 | 248B | 4167 | 05AB |
| 0000131500 | 6DA0 | FFD2 | 248B | 4567 | B2ED | 0060 | B7AB | FFE0 |
| 0000131520 | B5A7 | 0030 | 1427 | 2487 | 4167 | A3CF | D3AE | 00A0 |
| 0000131540 | D3AE | 0060 | 0D5F | E2A0 | FFC5 | 0550 | B107 | 0040 |
| 0000131560 | B7EE | 00A0 | 09AF | 2A80 | 0962 | 098F | 0154 | 4DCD |
| 0000131600 | 0B0E | 0160 | B7AB | FFE0 | 0570 | B569 | 0080 | 0550 |
| 0000131620 | B567 | 0010 | 5AE9 | 812D | 85A9 | 17C9 | C202 | 1BC9 |
| 0000131640 | 812D | 85A9 | CB02 | 1827 | 80ED | 85A9 | 1429 | B12D |
| 0000131660 | 0020 | 1869 | B12D | 0040 | 0570 | B567 | 0090 | 0550 |
| 0000131700 | B56B | 0050 | 5B67 | B0ED | 0010 | B5AB | 0010 | 17CB |
| 0000131720 | C203 | 1BCB | B16D | 0010 | B5AB | 0010 | CB03 | 1827 |
| 0000131740 | B0ED | 0010 | B5AB | 0010 | 142B | B16D | 0030 | B12D |
| 0000131760 | 0050 | B7AB | FFE0 | B567 | 0050 | 07AB | 6C60 | FFD2 |
| 0000132000 | 5F67 | B5AB | 0030 | 5F67 | 2487 | 07AB | 6D30 | FFD2 |
| 0000132020 | 244B | 40EB | B7A7 | FFE0 | B4E7 | 0010 | B5A9 | 0020 |
| 0000132040 | 5F27 | 05A9 | 6D90 | FFD2 | 5F27 | 2F87 | 2487 | 40EB |
| 0000132060 | 05A7 | 6DA0 | FFD2 | 2487 | 44EB | B36D | 0090 | B36D |
| 0000132100 | 0070 | B7A7 | FFE0 | B4E7 | 0010 | 5F27 | 2F87 | B2ED |
| 0000132120 | 00B0 | A3CF | 1A47 | 92EE | 44E7 | 92FE | B7A7 | FFE0 |
| 0000132140 | 0B07 | 00A0 | 92EE | 0D5F | 9B60 | FFC6 | 4529 | 0550 |
| 0000132160 | B12D | 0130 | B5A7 | 0050 | 48E9 | C900 | 008C | 456B |
| 0000132200 | B16D | 0150 | B7A9 | FFE0 | B527 | 0050 | 48EB | C979 |
| 0000132220 | 456B | B16D | 0140 | B5A9 | 0040 | 492B | C95C | B5AB |
| 0000132240 | 0020 | CB28 | B5A9 | 0140 | CB25 | B7A7 | FFE0 | B5A9 |

THU MAR 14 17:37:32 1991 GSPMON.4 PAGE 50, LINE 2892

| | | | | | | | | |
|---|---|---|---|---|---|---|---|---|
| 0000132260 | 0130 | 4D2B | 24A9 | 248B | 4169 | 40E9 | B5AB | 0140 |
| 0000132300 | 248B | 4169 | A3CF | 05AB | 6DA0 | FFD2 | 248B | B7A7 |
| 0000132320 | 0070 | 40EB | 936E | B7AB | 00B0 | 248B | 40EB | 936E |
| 0000132340 | 0D5F | E2A0 | FFC5 | 0550 | B52B | 00A0 | 410B | B169 |
| 0000132360 | 00A0 | C020 | B7A9 | FFE0 | B5A7 | 0130 | 4CEB | 24A7 |
| 0000132400 | 248B | 4167 | 4127 | B5AB | 0140 | 248B | 4167 | A3CF |
| 0000132420 | D3AE | 0070 | B7AB | 00B0 | 248B | B7A9 | 0070 | 412B |
| 0000132440 | 936E | 0D5F | E2A0 | FFC5 | 0550 | B4EB | 00A0 | 410B |
| 0000132460 | B167 | 00A0 | B7AB | 00B0 | 248B | B7A9 | 0070 | 412B |
| 0000132500 | B36D | 0070 | B5A9 | 0140 | 1029 | B12D | 0140 | B5A7 |
| 0000132520 | 0040 | 48E9 | C8A4 | 07AB | 6C60 | FFD2 | 248B | B7A9 |
| 0000132540 | 0090 | 412B | B36D | 0090 | B36D | 0070 | B5A9 | 0150 |
| 0000132560 | 1029 | B12D | 0150 | B7A7 | FFE0 | B4E7 | 0050 | 48E9 |
| 0000132600 | C887 | B5AB | 0130 | 102B | B16D | 0130 | B5A9 | 0050 |
| 0000132620 | 492B | C800 | FF74 | B7EE | 00A0 | 09AF | 2A80 | 0962 |
| 0000132640 | 098F | 0154 | 4DCD | 0B0E | 0100 | B7AB | FFE0 | 0550 |
| 0000132660 | B569 | 0020 | 07A7 | 6C60 | FFD2 | 5EE9 | 2489 | 07AB |
| 0000132700 | 6D30 | FFD2 | 244B | 412B | B7A9 | FFE0 | B529 | 0060 |
| 0000132720 | 05A7 | 6D90 | FFD2 | 5EE9 | 2F89 | 2489 | 412B | 05A9 |
| 0000132740 | 6DA0 | FFD2 | 2489 | 452B | 836D | B7A9 | FFE0 | B529 |
| 0000132760 | 0050 | 5EE9 | 2F89 | B32D | 0020 | B7A9 | FFE0 | B52B |
| 0000133000 | 0070 | B529 | 0060 | 452B | 5EEB | 2F8B | 05A9 | 6DA0 |
| 0000133020 | FFD2 | 412B | B36D | 0060 | 07A7 | 6C60 | FFD2 | 4567 |
| 0000133040 | B2ED | 0080 | B7A7 | FFE0 | B4EB | 0040 | B4E7 | 0050 |
| 0000133060 | 142B | 5F67 | 05AB | 6D90 | FFD2 | 5F67 | 2F87 | B7A9 |
| 0000133100 | 0060 | 44E9 | B32D | 0040 | A3CF | 09C7 | 0800 | 92EE |
| 0000133120 | 44E7 | 92EE | B7A7 | FFE0 | 0B07 | 0080 | 92EE | 0D5F |
| 0000133140 | 9B60 | FFC6 | 456B | B36D | 00A0 | B7A7 | FFE0 | 0550 |
| 0000133160 | 84E7 | 1427 | 48EB | C900 | 00BA | 456B | B36D | 00E0 |
| 0000133200 | B7A9 | FFE0 | B527 | 0010 | 48EB | C900 | 00A4 | 456B |
| 0000133220 | B36D | 00C0 | B7A9 | FFE0 | B527 | 0040 | 1427 | 48EB |
| 0000133240 | C96A | 07AB | 6D30 | FFD2 | 244B | 87A9 | 4969 | C914 |
| 0000133260 | B7AB | FFE0 | A3CF | 07A7 | 6D30 | FFD2 | 2447 | 92EE |
| 0000133300 | B7A7 | 0020 | 2487 | 4127 | 92EE | 0D5F | E2A0 | FFC5 |
| 0000133320 | 0550 | B10B | 0080 | C03D | B7AB | 00C0 | CB20 | B7A7 |
| 0000133340 | FFE0 | B7A9 | 00A0 | 2529 | 40E9 | 248B | 4169 | A3CF |
| 0000133360 | 0550 | 05AB | 6DA0 | FFD2 | 248B | 87A7 | 40EB | 936E |
| 0000133400 | B7AB | 0020 | 248B | 40EB | 936E | 0D5F | E2A0 | FFC5 |
| 0000133420 | 0550 | B52B | 0080 | 410B | B169 | 0080 | C01A | B7A7 |
| 0000133440 | FFE0 | B7A9 | 00A0 | 2529 | 40E9 | 248B | 4169 | A3CF |
| 0000133460 | D3AE | 0000 | B7AB | 0020 | 248B | 87A7 | 40EB | 936E |
| 0000133500 | 0D5F | E2A0 | FFC5 | 0550 | B52B | 0080 | 410B | B169 |
| 0000133520 | 0080 | B7AB | 0020 | 248B | 87A9 | 412B | 836D | B7A9 |
| 0000133540 | 00C0 | 1029 | B32D | 00C0 | B7A7 | FFE0 | B4E7 | 0040 |
| 0000133560 | 1427 | 48E9 | C896 | B7AB | FFE0 | B7A9 | 00A0 | 2529 |
| 0000133600 | 4169 | B7A7 | 00C0 | 2487 | 40E9 | A3CF | D3AE | 0000 |
| 0000133620 | B7A7 | 0040 | 2487 | 87AB | 4167 | 92EE | 0D5F | E2A0 |
| 0000133640 | FFC5 | 0550 | B527 | 0080 | 4107 | B0E9 | 0080 | B7A9 |
| 0000133660 | 0040 | B7A7 | 0080 | 40E9 | 2489 | 4169 | 832D | B7AB |
| 0000133700 | 00E0 | 102B | B36D | 00E0 | B7A7 | FFE0 | B4E7 | 0010 |
| 0000133720 | 48EB | C800 | FF5C | B7A9 | 00A0 | 1029 | B32D | 00A0 |
| 0000133740 | B7A7 | FFE0 | 84E7 | 1427 | 48E9 | C800 | FF46 | B7AB |
| 0000133760 | FFE0 | 8569 | B567 | 0010 | 1429 | 5F27 | B2ED | 00E0 |
| 0000134000 | B569 | 0030 | 4927 | C300 | 0088 | 456B | B36D | 00C0 |
| 0000134020 | B7A9 | FFE0 | B527 | 0040 | 1427 | 48EB | C94E | B7AB |
| 0000134040 | 00C0 | CB20 | B7A9 | FFE0 | B7A7 | 00A0 | 2527 | 4127 |
| 0000134060 | 248B | 4167 | A3CF | 0550 | 05AB | 6DA0 | FFD2 | 248B |
| 0000134100 | 87A9 | 412B | 936E | B7AB | 0020 | 248B | 412B | 936E |
| 0000134120 | 0D5F | E2A0 | FFC5 | 0550 | B4EB | 0080 | 410B | B167 |

THU MAR 14 17:37:32 1991 GSPMON.4 PAGE 51, LINE 2951

| | | | | | | | | |
|---|---|---|---|---|---|---|---|---|
| 0000134140 | 0080 | C01A | B7A9 | FFE0 | B7A7 | 00A0 | 2527 | 4127 |
| 0000134160 | 248B | 4167 | A3CF | D3AE | 0000 | B7AB | 0020 | 248B |
| 0000134200 | 87A9 | 412B | 936E | 0D5F | E2A0 | FFC5 | 0550 | B4EB |
| 0000134220 | 0080 | 410B | B167 | 0080 | B7AB | 0020 | 248B | 412B |
| 0000134240 | 836D | B7A9 | 00C0 | 1029 | B32D | 00C0 | B7A7 | FFE0 |
| 0000134260 | B4E7 | 0040 | 1427 | 48E9 | C8B2 | B7AB | FFE0 | B7A9 |
| 0000134300 | 00A0 | 2529 | 4169 | B7A7 | 00C0 | 2487 | 40E9 | A3CF |
| 0000134320 | D3AE | 0000 | B7A7 | 0040 | 2487 | 87AB | 4167 | 92EE |
| 0000134340 | 0D5F | E2A0 | FFC5 | 0550 | B527 | 0080 | 4107 | B0E9 |
| 0000134360 | 0080 | B7A9 | 0040 | B7A7 | 0080 | 40E9 | 2489 | 4169 |
| 0000134400 | 832D | B7AB | 00E0 | 102B | B36D | 00E0 | B7A7 | FFE0 |
| 0000134420 | B4E7 | 0030 | 48EB | C200 | FF78 | B7EE | 00A0 | 09AF |
| 0000134440 | 2A80 | 0962 | 098F | 0054 | 4DCD | 0550 | 05AB | 6DA0 |
| 0000134460 | FFD2 | 394B | B7AB | FFE0 | B7A9 | FFC0 | 856B | 8529 |
| 0000134500 | 452B | 4D68 | 0528 | C064 | 05AB | 6DA0 | FFD2 | 148B |
| 0000134520 | CB26 | B7AB | FFE0 | 8569 | B56B | 0010 | 4169 | B7AB |
| 0000134540 | FFE0 | B56B | 0020 | 4169 | B7AB | FFE0 | B56B | 0030 |
| 0000134560 | 4169 | B7AB | FFC0 | 856B | 4569 | B7AB | FFC0 | B56B |
| 0000134600 | 0010 | 4569 | B7AB | FFC0 | B56B | 0020 | 4569 | B7AB |
| 0000134620 | FFC0 | B56B | 0030 | 4569 | 4D28 | 0528 | C039 | B7AB |
| 0000134640 | FFE0 | 8569 | B56B | 0010 | 4169 | B7AB | FFE0 | B56B |
| 0000134660 | 0020 | 4169 | B7AB | FFE0 | B56B | 0030 | 4169 | B7AB |
| 0000134700 | FFE0 | B56B | 0040 | 4169 | B7AB | FFE0 | B56B | 0050 |
| 0000134720 | 4169 | B7AB | FFC0 | 856B | 4569 | B7AB | FFC0 | B56B |
| 0000134740 | 0010 | 4569 | B7AB | FFC0 | B56B | 0020 | 4569 | B7AB |
| 0000134760 | FFC0 | B56B | 0030 | 4569 | B7AB | FFC0 | B56B | 0040 |
| 0000135000 | 4569 | B7AB | FFC0 | B56B | 0050 | 4569 | 4D28 | 0528 |
| 0000135020 | B7EE | 0080 | 09AF | 2A00 | 0962 | 098F | 0154 | 4DCD |
| 0000135040 | 120E | 456B | 0550 | 816D | B7AB | FFE0 | 85A9 | 856B |
| 0000135060 | 4969 | C91A | B7AB | FFE0 | 85A9 | 2489 | 4169 | B7AB |
| 0000135100 | FFC0 | 85A7 | 2487 | 4167 | B529 | 0040 | B4E7 | 0040 |
| 0000135120 | 48E9 | CA02 | 4508 | C009 | 85A9 | 1029 | 812D | B7A7 |
| 0000135140 | FFE0 | 84E7 | 48E9 | C8E6 | 1828 | B7EE | 00A0 | 09AF |
| 0000135160 | 2A80 | 0962 | 098F | 0554 | 4DCD | 100E | 456B | 0550 |
| 0000135200 | 816D | 456B | B16D | 0010 | B7AB | FFE0 | 85A9 | 4D27 |
| 0000135220 | 24A9 | 2487 | 40E9 | 4169 | B5A7 | 0010 | 2487 | 40E9 |
| 0000135240 | B7A7 | FFC0 | 85AB | 4D65 | 24AB | 2485 | 40AB | 40EB |
| 0000135260 | B5A5 | 0010 | 2485 | 40AB | B529 | 00A0 | B56B | 00A0 |
| 0000135300 | 4969 | CA02 | 4508 | C00D | B5AB | 0010 | 102B | B16D |
| 0000135320 | 0010 | 146B | C8D9 | 85AB | 102B | 816D | 146B | C8D1 |
| 0000135340 | 1828 | B7EE | 00C0 | 09AF | 2AA0 | 0962 | 098F | 0154 |
| 0000135360 | 4DCD | 0B0E | 0030 | 456B | 0550 | B16D | 0020 | 816D |
| 0000135400 | B7AB | FFE0 | 85A9 | 856B | 4969 | C944 | 456B | B16D |
| 0000135420 | 0010 | B7A9 | FFE0 | B529 | 0040 | 492B | C933 | B7AB |
| 0000135440 | FFE0 | 85A9 | 2529 | 4169 | B5AB | 0010 | 248B | 4169 |
| 0000135460 | B7AB | FFC0 | 85A7 | 2527 | 4167 | B5AB | 0010 | 248B |
| 0000135500 | 4167 | B52B | 0080 | B4E9 | 0080 | 492B | CA05 | B5AB |
| 0000135520 | 0020 | 102B | B16D | 0020 | B5AB | 0020 | 05A9 | 6D00 |
| 0000135540 | FFD2 | 492B | C202 | 4508 | C016 | B5A7 | 0010 | 1027 |
| 0000135560 | B0ED | 0010 | B7A7 | FFE0 | B5AB | 0010 | B4E7 | 0040 |
| 0000135600 | 48EB | C8CD | 85A9 | 1029 | 812D | B7A7 | FFE0 | 84E7 |
| 0000135620 | 48E9 | C8BC | 1828 | B7EE | 00A0 | 09AF | 2A80 | 0962 |
| 0000135640 | 098F | 0054 | 4DCD | B7AB | FFC0 | 09E9 | E030 | FFD1 |
| 0000135660 | 832B | 0D5F | BF50 | FFC4 | 4508 | B7EE | 0080 | 09AF |
| 0000135700 | 2A00 | 0962 | 098F | 0154 | 4DCD | B7AB | FFE0 | 0550 |
| 0000135720 | 8569 | 0589 | 6960 | FFD2 | B567 | 0010 | 0587 | 6970 |
| 0000135740 | FFD2 | B56B | 0020 | 058B | 6980 | FFD2 | B7A7 | FFE0 |
| 0000135760 | B4E7 | 0030 | 0587 | 6990 | FFD2 | A3CF | 09EB | 6960 |
| 0000136000 | FFD2 | 936E | 0D5F | E190 | FFC4 | 4508 | B7EE | 00A0 |

THU MAR 14 17:37:32 1991 GSPMON.4 PAGE 52, LINE 3010

| | | | | | | | | |
|---|---|---|---|---|---|---|---|---|
| 0000136020 | 09AF | 2A80 | 0962 | 098F | 0014 | 4DCD | A3CF | 09CB |
| 0000136040 | 0026 | 936E | D3AE | FFE0 | 09EB | DEB0 | FFD1 | 936E |
| 0000136060 | 0D5F | 7760 | FFC6 | 0D5F | F510 | FFC4 | 4508 | B7EE |
| 0000136100 | 0060 | 09AF | 2800 | 0962 | 098F | 0154 | 4DCD | B7AB |
| 0000136120 | FFE0 | 0550 | 8569 | 0589 | 69A0 | FFD2 | B567 | 0010 |
| 0000136140 | 0587 | 69B0 | FFD2 | B56B | 0020 | 058B | 69C0 | FFD2 |
| 0000136160 | B7A7 | FFE0 | B4E7 | 0030 | 0587 | 69D0 | FFD2 | B7A7 |
| 0000136200 | FFE0 | B4E7 | 0040 | 0587 | 69E0 | FFD2 | B7A7 | FFE0 |
| 0000136220 | B4E7 | 0050 | 0587 | 69F0 | FFD2 | B7A7 | FFE0 | B4E7 |
| 0000136240 | 0060 | 0587 | 6A00 | FFD2 | B7A7 | FFE0 | B4E7 | 0070 |
| 0000136260 | 0587 | 6A10 | FFD2 | A3CF | 09E7 | 69E0 | FFD2 | 92EE |
| 0000136300 | 09EB | 69A0 | FFD2 | 936E | 0D5F | FED0 | FFC4 | 4508 |
| 0000136320 | B7EE | 00A0 | 09AF | 2A80 | 0962 | 098F | 0054 | 4DCD |
| 0000136340 | B7AB | FFC0 | 09E9 | E030 | FFD1 | 832B | B7A9 | FFE0 |
| 0000136360 | 8729 | 2F89 | 1029 | 0789 | DD60 | FFD1 | 0D5F | 13B0 |
| 0000136400 | FFC5 | 4508 | B7EE | 0080 | 09AF | 2A00 | 0962 | 098F |
| 0000136420 | 0054 | 4DCD | B7AB | FFE0 | 8769 | 2F89 | 1029 | 0789 |
| 0000136440 | DD60 | FFD1 | 0D5F | 5430 | FFC5 | 4508 | B7EE | 0080 |
| 0000136460 | 09AF | 2A00 | 0962 | 098F | 0054 | 4DCD | B7AB | FFE0 |
| 0000136500 | 8769 | 2F89 | 1029 | 0789 | DD60 | FFD1 | 0D5F | 6830 |
| 0000136520 | FFC5 | 4508 | B7EE | 0080 | 09AF | 2A00 | 0962 | 098F |
| 0000136540 | 0054 | 4DCD | B7AB | FFC0 | 09E9 | E030 | FFD1 | 832B |
| 0000136560 | B7A9 | FFE0 | 8729 | 2F89 | 1029 | 0789 | DD60 | FFD1 |
| 0000136600 | 0D5F | 74D0 | FFC5 | 4508 | B7EE | 0080 | 09AF | 2A00 |
| 0000136620 | 0962 | 098F | 0054 | 4DCD | B7AB | FFC0 | 09E9 | 9970 |
| 0000136640 | FFD1 | 832B | 4508 | B7EE | 0080 | 09AF | 2A00 | 0962 |
| 0000136660 | 098F | 0054 | 4DCD | B7AB | FFC0 | 09E9 | 9BB0 | FFD1 |
| 0000136700 | 832B | 4508 | B7EE | 0080 | 09AF | 2A00 | 0962 | 098F |
| 0000136720 | 0054 | 4DCD | B7AB | FFC0 | 09E9 | 9CE0 | FFD1 | 832B |
| 0000136740 | 4508 | B7EE | 0080 | 09AF | 2A00 | 0962 | 098F | 0054 |
| 0000136760 | 4DCD | B7AB | FFC0 | 09E9 | E030 | FFD1 | 832B | B7A9 |
| 0000137000 | FFE0 | 0550 | 8529 | 0589 | E250 | FFD1 | B7AB | FFE0 |
| 0000137020 | B56B | 0010 | 058B | E260 | FFD1 | 0D5F | 0AE0 | FFC6 |
| 0000137040 | 4508 | B7EE | 0080 | 09AF | 2A00 | 0962 | 098F | 0050 |
| 0000137060 | A3CF | 0570 | 05AB | 9950 | FFD1 | 936E | 0D5F | 6480 |
| 0000137100 | FFC0 | 0550 | 05AB | E250 | FFD1 | 05A9 | 6DB0 | FFD2 |
| 0000137120 | 492B | C209 | A3CF | 1429 | 932E | 1829 | 932E | 0D5F |
| 0000137140 | 6660 | FFC0 | C007 | A3CF | 936E | 4529 | 932E | 0D5F |
| 0000137160 | 6660 | FFC0 | 456B | 0550 | 058B | 8E20 | FFC9 | 058B |
| 0000137200 | 8E30 | FFC9 | 058B | 8E40 | FFC9 | 058B | E030 | FFD1 |
| 0000137220 | 0541 | 05A9 | 6B50 | FFD2 | CA06 | 1829 | 0543 | 0589 |
| 0000137240 | DE10 | FFD1 | C009 | 0543 | 058B | DE10 | FFD1 | 1829 |
| 0000137260 | 0541 | 0589 | 6B50 | FFD2 | 09E9 | 1030 | FFC6 | 0789 |
| 0000137300 | 6B60 | FFD2 | 09E9 | 1B10 | FFC6 | 0789 | 6B80 | FFD2 |
| 0000137320 | 09AF | 0A00 | 0960 | 098F | 0050 | 0550 | 05AB | 8E30 |
| 0000137340 | FFC9 | 102B | 058B | 8E30 | FFC9 | C000 | 0090 | A3CF |
| 0000137360 | 456B | 936E | 0D5F | 66C0 | FFC0 | 078B | 6B20 | FFD2 |
| 0000137400 | 0550 | 058B | 8E40 | FFC9 | 184B | 0543 | 058B | DE10 |
| 0000137420 | FFD1 | C000 | 008B | A3CF | 456B | 936E | 0D5F | 66C0 |
| 0000137440 | FFC0 | 184B | 0543 | 058B | DE10 | FFD1 | C07F | A3CF |
| 0000137460 | 186B | 936E | 0D5F | 66C0 | FFC0 | 0543 | 058B | DE10 |
| 0000137500 | FFD1 | C074 | A3CF | 186B | 936E | 0D5F | 66C0 | FFCu |
| 0000137520 | 0550 | 05AB | 6CE0 | FFD2 | 07A9 | 6AA0 | FFD2 | 4969 |
| 0000137540 | C310 | 07A9 | 6B20 | FFD2 | 1029 | 0789 | 6B20 | FFD2 |
| 0000137560 | 0589 | 8E40 | FFC9 | 1869 | 0543 | 0589 | DE10 | FFD1 |
| 0000137600 | C055 | 4529 | 0541 | 0589 | E240 | FFD1 | 07C0 | 6AA0 |
| 0000137620 | FFD2 | E200 | FFD1 | 07C0 | 6B20 | FFD2 | E220 | FFD1 |
| 0000137640 | 0789 | 6B20 | FFD2 | 0550 | 0589 | 8E40 | FFC9 | 182B |
| 0000137660 | 058B | 8E20 | FFC9 | 0543 | 0589 | DE10 | FFD1 | 0550 |

THU MAR 14 17:37:32 1991 GSPMON.4 PAGE 53, LINE 3069

| | | | | | | | | |
|---|---|---|---|---|---|---|---|---|
| 0000137700 | 05AB | E260 | FFD1 | CA32 | A3CF | 196B | 936E | 0D5F |
| 0000137720 | 66C0 | FFC0 | 18E9 | 0543 | 0589 | DE10 | FFD1 | C026 |
| 0000137740 | A3CF | 196B | 936E | 0D5F | 66C0 | FFC0 | 0550 | 05A9 |
| 0000137760 | E030 | FFD1 | 38C9 | 18E9 | 0543 | 0589 | DE10 | FFD1 |
| 0000140000 | C015 | 4529 | 0543 | 0589 | DE10 | FFD1 | C00F | 0543 |
| 0000140020 | 05A8 | DE10 | FFD1 | CA00 | FF6A | 1428 | CA00 | FF7B |
| 0000140040 | 1428 | CA85 | 1428 | CA8E | 1488 | CADA | 09AF | 0A00 |
| 0000140060 | 0960 | 098F | 0050 | 0541 | 05AB | E240 | FFD1 | CB18 |
| 0000140100 | 182B | 058B | E240 | FFD1 | A3CF | 1909 | 932E | 09E9 |
| 0000140120 | E200 | FFD1 | 932E | 936E | 0D5F | 4490 | FFC0 | 0550 |
| 0000140140 | 05AB | E260 | FFD1 | CA04 | 1829 | 0589 | E030 | FFD1 |
| 0000140160 | 09AF | 0A00 | 0960 | 098F | 0014 | 4DCD | 0541 | B5AB |
| 0000140200 | FFE0 | 058B | 6A80 | FFD2 | B7EE | 0060 | 09AF | 2800 |
| 0000140220 | 0962 | A36F | 456B | 0541 | 058B | 6A80 | FFD2 | 058B |
| 0000140240 | 6A90 | FFD2 | 07C0 | 6A20 | FFD2 | 6A60 | FFD2 | 97EB |
| 0000140260 | 0960 | 0541 | 05A8 | 6A90 | FFD2 | 0960 | A36F | 0541 |
| 0000140300 | 05AB | 6A80 | FFD2 | CA02 | 1828 | C001 | 4508 | 97EB |
| 0000140320 | 0960 | A36F | 0541 | 05AB | 6A80 | FFD2 | CA10 | 07AB |
| 0000140340 | 6A60 | FFD2 | 142B | 078B | 6A60 | FFD2 | CB08 | 182B |
| 0000140360 | 058B | 6A90 | FFD2 | 456B | 058B | 6A80 | FFD2 | 97EB |
| 0000140400 | 0960 | 098F | 0054 | 4DCD | 456B | 0541 | 058B | 6A80 |
| 0000140420 | FFD2 | 058B | 6A90 | FFD2 | B7A9 | FFE0 | 0789 | 6A60 |
| 0000140440 | FFD2 | B7EE | 0080 | 09AF | 2A00 | 0962 | 098F | 00D4 |
| 0000140460 | 4DCD | I00E | A3CF | 182B | 936E | 0D5F | 6E60 | FFC0 |
| 0000140500 | 456B | 836D | 87AB | 102B | 836D | 154B | C4FB | A3CF |
| 0000140520 | 0570 | 05AB | 9960 | FFD1 | 936E | 0D5F | 66C0 | FFC0 |
| 0000140540 | 07AB | 6D10 | FFD2 | 8769 | 0B89 | 0000 | FFFF | 07AB |
| 0000140560 | 6D30 | FFD2 | 244B | 876B | 0B8B | 0000 | FFFF | 4569 |
| 0000140600 | 0789 | 6AA0 | FFD2 | 0541 | 05AB | D770 | FFC6 | CB04 |
| 0000140620 | 182B | 058B | 6AE0 | FFD2 | 0D5F | 2010 | FFC6 | 09EB |
| 0000140640 | 0120 | C000 | 0550 | 8569 | 0B89 | 0400 | FFFF | 812B |
| 0000140660 | A3CF | 192B | 936E | 0D5F | 3FE0 | FFC0 | 140E | 09AF |
| 0000140700 | 2B00 | 0940 | 098F | 0050 | 07AB | 6AF0 | FFD2 | 0550 |
| 0000140720 | 8569 | 0589 | 6B10 | FFD2 | C018 | 182B | 0541 | 058B |
| 0000140740 | 6AD0 | FFD2 | C02A | 182B | 0541 | 058B | 6AD0 | FFD2 |
| 0000140760 | C024 | 182B | 0541 | 058B | 6AD0 | FFD2 | C01E | 182B |
| 0000141000 | 0541 | 058B | 6AD0 | FFD2 | C018 | 1429 | 0B49 | FFF9 |
| 0000141020 | C314 | 24A9 | 0B29 | 2A70 | FFC6 | 8729 | 0169 | 2850 |
| 0000141040 | FFC6 | 2B50 | FFC6 | 28B0 | FFC6 | 2B50 | FFC6 | 2910 |
| 0000141060 | FFC6 | 2B50 | FFC6 | 2970 | FFC6 | 09AF | 0A00 | 0940 |
| 0000141100 | 098F | 0054 | 4DCD | A3CF | 09EB | 22E0 | FFC6 | 936E |
| 0000141120 | 1949 | 932E | 0D5F | 3CE0 | FFC0 | A3CF | 4529 | 932E |
| 0000141140 | 932E | 1889 | 932E | 0D5F | 4490 | FFC0 | 0541 | 05AB |
| 0000141160 | 6AE0 | FFD2 | CA04 | 4529 | 0589 | 6AE0 | FFD2 | 05AB |
| 0000141200 | 6AE0 | FFD2 | CB04 | 05AB | 6AE0 | FFD2 | CAFC | A3CF |
| 0000141220 | 09C9 | 00FF | 932E | 0D5F | 3FE0 | FFC0 | 456B | 0541 |
| 0000141240 | 058B | 6AE0 | FFD2 | 0D5F | 6CA0 | FFC0 | 07AB | 6B60 |
| 0000141260 | FFD2 | 092B | 0D5F | 6CA0 | FFC0 | A3CF | 192B | 936E |
| 0000141300 | 0D5F | 3E10 | FFC0 | A3CF | 932E | 0D5F | 3E10 | FFC0 |
| 0000141320 | 07AB | 6B80 | FFD2 | 092B | C0C9 | 098F | 0154 | 4DCD |
| 0000141340 | A3CF | D3AE | FFE0 | 0D5F | 4000 | FFC6 | B7AB | FFE0 |
| 0000141360 | 0550 | B569 | 00A0 | 0589 | 6D90 | FFD2 | B76B | 0080 |
| 0000141400 | 078B | 6D30 | FFD2 | B7A7 | FFE0 | B4E7 | 00B0 | 0587 |
| 0000141420 | 6D60 | FFD2 | B7A7 | FFE0 | B4E7 | 00C0 | 0587 | 6D70 |
| 0000141440 | FFD2 | B7A7 | FFE0 | B4E7 | 00D0 | 0587 | 6D80 | FFD2 |
| 0000141460 | B7A7 | FFE0 | B4E7 | 01B0 | 0541 | 0587 | 6DC0 | FFD2 |
| 0000141500 | 1827 | 0550 | 0587 | 6DA0 | FFD2 | 05A9 | 0060 | C000 |
| 0000141520 | 1469 | 0589 | 00A0 | C000 | 05A9 | 6D80 | FFD2 | 1429 |
| 0000141540 | 05AB | 6D90 | FFD2 | 5B69 | 1029 | 0589 | 6DB0 | FFD2 |

THU MAR 14 17:37:32 1991 GSPMON.4 PAGE 54, LINE 3128

| | | | | | | | | |
|---|---|---|---|---|---|---|---|---|
| 0000141560 | 05A9 | 6D60 | FFD2 | 5F69 | 0789 | 6BE0 | FFD2 | 2B89 |
| 0000141600 | 0789 | 6C40 | FFD2 | A3CF | 1869 | 932E | 0D5F | B0B0 |
| 0000141620 | FFC6 | 0788 | 6C00 | FFD2 | 2B88 | 0788 | 6C60 | FFD2 |
| 0000141640 | 0550 | 05AB | 6D70 | FFD2 | 07A7 | 6C00 | FFD2 | 142B |
| 0000141660 | 5EEB | 07A9 | 6BE0 | FFD2 | 412B | 0788 | 6C20 | FFD2 |
| 0000141700 | 2B8B | 078B | 6C80 | FFD2 | 05A7 | 6D70 | FFD2 | 5EE9 |
| 0000141720 | 2FA9 | 0789 | 6CA0 | FFD2 | 07A9 | 6C00 | FFD2 | 5EE9 |
| 0000141740 | 2FA9 | 0789 | 6CC0 | FFD2 | 07A7 | 6D30 | FFD2 | 2447 |
| 0000141760 | 07A9 | 6C20 | FFD2 | 1609 | 2B89 | 2489 | 4127 | 0787 |
| 0000142000 | 6D10 | FFD2 | B7A9 | FFE0 | B729 | 00E0 | 2F89 | 1029 |
| 0000142020 | 0789 | 6A20 | FFD2 | B7A7 | FFE0 | B6E7 | 0100 | 2F87 |
| 0000142040 | 1027 | 0787 | 6A40 | FFD2 | B7A7 | FFE0 | B6E7 | 0120 |
| 0000142060 | 0787 | 6BA0 | FFD2 | B7A7 | FFE0 | B6E7 | 0140 | 2F87 |
| 0000142100 | 1027 | 0787 | 6BC0 | FFD2 | B7A7 | FFE0 | B4E7 | 0160 |
| 0000142120 | 0587 | 6CE0 | FFD2 | B7A7 | FFE0 | B4E7 | 0170 | 0587 |
| 0000142140 | 6CF0 | FFD2 | B7A7 | FFE0 | B4E7 | 0180 | 0587 | 6D00 |
| 0000142160 | FFD2 | A3CF | B7A7 | FFE0 | D2EE | 0190 | 0D5F | 83C0 |
| 0000142200 | FFC4 | 456B | 0541 | 058B | 6B40 | FFD2 | 078B | 6B20 |
| 0000142220 | FFD2 | 0D5F | AD60 | FFC4 | A3CF | 1949 | 932E | 0D5F |
| 0000142240 | 3E10 | FFC0 | 09E9 | 0120 | C000 | 0550 | 852B | 0B8B |
| 0000142260 | 0400 | FFFF | 8169 | A3CF | 09CB | 00FF | 936E | 0D5F |
| 0000142300 | 3E10 | FFC0 | 4508 | B7EE | 00A0 | 09AF | 2A80 | 0962 |
| 0000142320 | 098F | 0054 | 4DCD | A3CF | B7AB | FFE0 | 0550 | 8568 |
| 0000142340 | 930E | 09E9 | 0000 | C000 | 932E | 0D5F | 46E0 | FFC6 |
| 0000142360 | A3CF | 0550 | B568 | 0010 | 930E | 1209 | 932E | 0D5F |
| 0000142400 | 46E0 | FFC6 | A3CF | 0550 | B568 | 0020 | 930E | 1209 |
| 0000142420 | 932E | 0D5F | 46E0 | FFC6 | A3CF | 09E9 | FFFE | 0000 |
| 0000142440 | 932E | 09E9 | 0030 | C000 | 932E | 0D5F | 46E0 | FFC6 |
| 0000142460 | A3CF | 0550 | B568 | 0030 | 930E | 1209 | 932E | 0D5F |
| 0000142500 | 46E0 | FFC6 | A3CF | 0550 | B568 | 0040 | 930E | 1209 |
| 0000142520 | 932E | 0D5F | 46E0 | FFC6 | A3CF | 0550 | B568 | 0050 |
| 0000142540 | 930E | 1209 | 932E | 0D5F | 46E0 | FFC6 | A3CF | 09E9 |
| 0000142560 | FFFE | 0000 | 932E | 09E9 | 0070 | C000 | 932E | 0D5F |
| 0000142600 | 46E0 | FFC6 | A3CF | 0550 | B568 | 0070 | 930E | 0D5F |
| 0000142620 | 7C50 | FFC0 | B7EE | 0080 | 09AF | 2A00 | 0962 | A3AF |
| 0000142640 | 4DCD | 4508 | B7EE | 0040 | 97ED | 0962 | 098F | 0014 |
| 0000142660 | 4DCD | B7AB | FFE0 | 0550 | B9AB | FFC0 | 0000 | B7EE |
| 0000142700 | 0060 | 09AF | 2800 | 0962 | 098F | 0054 | 4DCD | 0541 |
| 0000142720 | 05AB | 6B50 | FFD2 | CA08 | B7A9 | FFC0 | 07AB | 6B20 |
| 0000142740 | FFD2 | 248B | 8369 | C005 | B7A9 | FFC0 | 09CB | FFFF |
| 0000142760 | 8369 | 4508 | B7EE | 0080 | 09AF | 2A00 | 0962 | 098F |
| 0000143000 | 0054 | 4DCD | C03A | B7AB | FFE0 | B769 | 0020 | 2B89 |
| 0000143020 | 1029 | 0789 | 6BA0 | FFD2 | C04E | B7AB | FFE0 | B769 |
| 0000143040 | 0020 | 2B89 | 1029 | 0789 | 6BC0 | FFD2 | C044 | B7AB |
| 0000143060 | FFE0 | B769 | 0020 | 0550 | 0589 | 6CE0 | FFD2 | C03B |
| 0000143100 | B7AB | FFE0 | B769 | 0020 | 0550 | 0589 | 6D00 | FFD2 |
| 0000143120 | C032 | B7AB | FFE0 | B769 | 0020 | 2B89 | 1029 | 0789 |
| 0000143140 | 6A20 | FFD2 | C028 | B7AB | FFE0 | B769 | 0020 | 2B89 |
| 0000143160 | 1029 | 0789 | 6A40 | FFD2 | C01E | B7AB | FFE0 | 8768 |
| 0000143200 | 0BE8 | FF9A | 0B48 | FFF8 | C316 | 24A8 | 0B28 | 4E30 |
| 0000143220 | FFC6 | 8708 | 0168 | 49B0 | FFC6 | 4A50 | FFC6 | 4AF0 |
| 0000143240 | FFC6 | 4F30 | FFC6 | 4F30 | FFC6 | 4B80 | FFC6 | 4C10 |
| 0000143260 | FFC6 | 4CB0 | FFC6 | 4508 | B7EE | 0080 | 09AF | 2A00 |
| 0000143300 | 0962 | 098F | 0014 | 4DCD | A3CF | 18EB | 936E | 0D5F |
| 0000143320 | BA70 | FFC4 | 4508 | B7EE | 0060 | 09AF | 2800 | 0962 |
| 0000143340 | 098F | 0054 | 4DCD | C02D | B7AB | FFE0 | B769 | 0020 |
| 0000143360 | 0570 | 0589 | 9910 | FFD1 | C030 | B7AB | FFE0 | B769 |
| 0000143400 | 0020 | 0570 | 0589 | 9940 | FFD1 | C027 | B7AB | FFE0 |
| 0000143420 | B769 | 0020 | 0570 | 0589 | 9950 | FFD1 | C01E | B7AB |

THU MAR 14 17:37:32 1991 GSPMON.4 PAGE 55, LINE 3187

| | | | | | | | | |
|---|---|---|---|---|---|---|---|---|
| 0000143440 | FFE0 | B769 | 0020 | 0570 | 0589 | 9920 | FFD1 | C015 |
| 0000143460 | B7AB | FFE0 | B769 | 0020 | 0570 | 0589 | 9930 | FFD1 |
| 0000143500 | C00C | B7AB | FFE0 | 8768 | CACF | 1428 | CAD6 | 1428 |
| 0000143520 | CAE6 | 1428 | CADB | 1428 | CAEB | 4508 | B7EE | 0080 |
| 0000143540 | 09AF | 2A00 | 0962 | 098F | 0054 | 4DCD | A3CF | B7AB |
| 0000143560 | FFE0 | D36E | 0000 | 0D5F | 81D0 | FFC6 | B7A9 | FFC0 |
| 0000143600 | 8309 | 8729 | CB03 | 09C8 | FFFF | C001 | 4508 | B7EE |
| 0000143620 | 0080 | 09AF | 2A00 | 0962 | 098F | 0014 | 4DCD | A3CF |
| 0000143640 | B7AB | FFE0 | D36E | 0000 | 0D5F | 9370 | FFC6 | 4508 |
| 0000143660 | B7EE | 0060 | 09AF | 2800 | 0962 | 098F | 0014 | 4DCD |
| 0000143700 | A3CF | B7AB | FFE0 | 0550 | 8568 | 930E | 0D5F | BC80 |
| 0000143720 | FFC4 | 4508 | B7EE | 0060 | 09AF | 2800 | 0962 | 098F |
| 0000143740 | 0154 | 4DCD | 0B0E | 0140 | B7AB | FFE0 | 0570 | 8569 |
| 0000143760 | B32D | 0020 | B569 | 0010 | B32D | 0040 | 100B | B36D |
| 0000144000 | 0120 | 836D | A3CF | 932E | 0D5F | 61A0 | FFC6 | A3CF |
| 0000144020 | 09C9 | FFFF | 932E | 0550 | 05A9 | 6D70 | FFD2 | 932E |
| 0000144040 | 05A9 | 6D60 | FFD2 | 932E | 07A9 | 6D30 | FFD2 | 4D2B |
| 0000144060 | 244B | 452B | 936E | 0D5F | 6B30 | FFC6 | 456B | B36D |
| 0000144100 | 0060 | B7A9 | 0020 | 492B | C54D | 87AB | 0570 | B569 |
| 0000144120 | 0010 | 07A7 | 6C00 | FFD2 | 5CE9 | 856B | 0550 | 05A7 |
| 0000144140 | 6D90 | FFD2 | 5EEB | 4169 | 2F89 | 2489 | 07AB | 6D30 |
| 0000144160 | FFD2 | 4D67 | 2447 | 4567 | 4127 | B2ED | 00A0 | 87A9 |
| 0000144200 | 0570 | B527 | 0030 | B529 | 0010 | 4527 | B2ED | 00E0 |
| 0000144220 | 87A9 | B527 | 0020 | 8529 | 4527 | B2ED | 00C0 | 87A9 |
| 0000144240 | B527 | 0040 | 38A7 | 09C7 | FFFF | B2ED | 0100 | C003 |
| 0000144260 | 44E7 | B2ED | 0100 | A3CF | 92EE | D3AE | 00E0 | D3AE |
| 0000144300 | 00C0 | D3AE | 00A0 | 0D5F | 6B30 | FFC6 | B7AB | 0060 |
| 0000144320 | 102B | B36D | 0060 | 0B09 | 0050 | 832D | B7A7 | 0020 |
| 0000144340 | 48EB | C4B3 | 0D5F | 6730 | FFC6 | 4508 | B7EE | 00A0 |
| 0000144360 | 09AF | 2A80 | 0962 | A3AF | 4DCD | 4508 | B7EE | 0040 |
| 0000144400 | 97ED | 0962 | 098F | 0054 | 4DCD | 0B0E | 0080 | 456B |
| 0000144420 | B36D | 0020 | 182B | B36D | 0040 | B7A9 | FFE0 | 632B |
| 0000144440 | 19E9 | 5369 | 832D | 456B | B36D | 0060 | 87AB | B7A9 |
| 0000144460 | 0060 | 632B | B7A9 | 0020 | 552B | B36D | 0020 | B7A9 |
| 0000144500 | 0060 | 1089 | B32D | 0060 | 1609 | C4F0 | A3CF | 09C9 |
| 0000144520 | 00FF | 932E | 0D5F | 3FE0 | FFC0 | 07A9 | 6DD0 | FFD2 |
| 0000144540 | 872B | 078B | 6E10 | FFD2 | 07A9 | 6DF0 | FFD2 | 8729 |
| 0000144560 | 0789 | 6E30 | FFD2 | 07A9 | 6DD0 | FFD2 | BBA9 | 0020 |
| 0000144600 | 0000 | 07A9 | 6DF0 | FFD2 | 872B | 0B8B | 7C00 | FFFF |
| 0000144620 | 8369 | 872B | 0B8B | 0020 | FFFF | 8369 | A3CF | 09CB |
| 0000144640 | 00FF | 936E | 0D5F | 3E10 | FFC0 | 4508 | B7EE | 0080 |
| 0000144660 | 09AF | 2A00 | 0962 | 098F | 0050 | A3CF | 09CB | 00FF |
| 0000144700 | 936E | 0D5F | 3FE0 | FFC0 | 07A9 | 6DD0 | FFD2 | 07AB |
| 0000144720 | 6E10 | FFD2 | 8369 | 07A9 | 6DF0 | FFD2 | 07AB | 6E30 |
| 0000144740 | FFD2 | 8369 | A3CF | 09C9 | 00FF | 932E | 0D5F | 3E10 |
| 0000144760 | FFC0 | 4508 | 09AF | 0A00 | 0960 | A3AF | 4DCD | A3CF |
| 0000145000 | D3AE | FFC0 | 0D5F | 32A0 | FFC4 | 4508 | B7EE | 0040 |
| 0000145020 | 97ED | 0962 | 098F | 0014 | 4DCD | 18EB | 0570 | 058B |
| 0000145040 | 9960 | FFD1 | 0D5F | AD60 | FFC4 | 4508 | B7EE | 0060 |
| 0000145060 | 09AF | 2800 | 0962 | A20F | 099F | 213E | A7C0 | 4E02 |
| 0000145100 | A7C0 | A7C8 | 2608 | EF00 | 4E07 | A7C0 | 4E09 | 0FC0 |
| 0000145120 | 09BF | 7C84 | 97E0 | 0962 | 098F | 0014 | 4DCD | B7AB |
| 0000145140 | FFE0 | C503 | 4D68 | 03A8 | C001 | 4D68 | B7EE | 0060 |
| 0000145160 | 09AF | 2800 | 0962 | 098F | 0014 | 4DCD | B7AB | FFE0 |
| 0000145200 | C503 | 4D68 | 03A8 | C001 | 4D68 | B7EE | 0060 | 09AF |
| 0000145220 | 2800 | 0962 | 0740 | 09E9 | 6E70 | FFD2 | 4D2D | 4D2E |
| 0000145240 | 09E9 | 6830 | FFD3 | 4D2F | 09EA | B960 | FFC6 | 0B4A |
| 0000145260 | 0000 | CA05 | A3CF | 934E | 0D5F | 7010 | FFC6 | 0D5F |
| 0000145300 | 2000 | FFC0 | A3CF | 182B | 936E | 0D5F | 7170 | FFC6 |

THU MAR 14 17:37:32 1991 GSPMON.4 PAGE 56, LINE 3246

| | | | | | | | | |
|---|---|---|---|---|---|---|---|---|
| 0000145320 | 0940 | 098F | 0074 | 4DCD | B7A9 | FFE0 | 0550 | B72A |
| 0000145340 | 0010 | 852B | CA07 | 0B09 | 0030 | 4D6B | CAF8 | 992A |
| 0000145360 | 3C4B | C0F5 | B7EE | 00A0 | 09AF | 2E00 | 0962 | 098F |
| 0000145400 | 0054 | 4DCD | 07A9 | 6850 | FFD3 | CA0A | 1429 | 4D25 |
| 0000145420 | 24AB | 0B2B | 6870 | FFD3 | 876B | 092B | 4D28 | CBF6 |
| 0000145440 | C0FF | 098F | 0014 | 4DCD | 07AB | 6850 | FFD3 | 140B |
| 0000145460 | C402 | 1828 | C010 | 07AB | 6850 | FFD3 | 102B | 078B |
| 0000145500 | 6850 | FFD3 | 142B | 24AB | 0B2B | 6870 | FFD3 | BBAB |
| 0000145520 | FFE0 | 0000 | 4508 | B7EE | 0060 | 09AF | 2800 | 0962 |
| 0000145540 | A36F | A3CF | 456B | 936E | 0D5F | 7170 | FFC6 | 97EB |
| 0000145560 | D960 | 098F | 017C | 4DCD | B7A9 | FFE0 | B7AA | FFC0 |
| 0000145600 | B7AB | FFA0 | 4D4C | 4949 | C207 | 142B | C411 | 0568 |
| 0000145620 | 992A | 142B | C5FD | C00C | 4D67 | 2467 | 40E9 | 4D67 |
| 0000145640 | 2467 | 40EA | 142B | C404 | 0568 | A92A | 142B | C5FD |
| 0000145660 | 4D88 | B7EE | 00E0 | 09AF | 3E80 | 0962 | A3AF | 4DCD |
| 0000145700 | A3CF | D3AE | FFA0 | D3AE | FFE0 | D3AE | FFC0 | 0D5F |
| 0000145720 | 7510 | FFC6 | B7EE | 0040 | 97ED | 0962 | A3AF | 4DCD |
| 0000145740 | A3CF | D3AE | FFA0 | D3AE | FFE0 | D3AE | FFC0 | 0D5F |
| 0000145760 | 7510 | FFC6 | B7EE | 0040 | 97ED | 0962 | 098F | 0174 |
| 0000146000 | 4DCD | 07A9 | 6C70 | FFF3 | 454A | 4D29 | CB08 | B7AB |
| 0000146020 | FFE0 | 078B | 6C70 | FFF3 | B34B | 0020 | C02F | CA10 |
| 0000146040 | B7AB | FFE0 | 8727 | 876B | 4967 | C90A | 4D2A | B729 |
| 0000146060 | 0020 | CA06 | B7AB | FFE0 | 8727 | 876B | 4967 | C8F6 |
| 0000146100 | 4D27 | CB09 | BBAA | FFE0 | 0020 | B7AB | FFE0 | 44E7 |
| 0000146120 | B2EB | 0020 | C013 | 4D47 | CB0B | B7AB | FFE0 | 07A7 |
| 0000146140 | 6C70 | FFF3 | B2EB | 0020 | 078B | 6C70 | FFF3 | C006 |
| 0000146160 | B7AB | FFE0 | B32B | 0020 | B36A | 0020 | B7EE | 00C0 |
| 0000146200 | 09AF | 2E80 | 0962 | 098F | 0174 | 4DCD | 07A9 | 6C70 |
| 0000146220 | FFF3 | 454A | 4D29 | CA0C | B7AB | FFE0 | 4969 | CA08 |
| 0000146240 | 4D2A | B729 | 0020 | CA04 | B7AB | FFE0 | 4969 | CBF8 |
| 0000146260 | 4D2B | CB05 | 456B | 078B | 6C70 | FFF3 | C00F | 4D4B |
| 0000146300 | CB08 | B7AB | FFE0 | B767 | 0020 | 0787 | 6C70 | FFF3 |
| 0000146320 | C005 | B7AB | FFE0 | BB6A | 0020 | 0020 | B7EE | 00C0 |
| 0000146340 | 09AF | 2E80 | 0962 | 098F | 0050 | 09EB | 6C70 | FFD3 |
| 0000146360 | 078B | 6C70 | FFF3 | 09E9 | FFFC | 0003 | 832B | 4529 |
| 0000146400 | B32B | 0020 | 09AF | 0A00 | 0960 | 098F | 017C | 4DCD |
| 0000146420 | 07AA | 6C70 | FFF3 | B7A7 | FFE0 | CB02 | 4508 | C036 |
| 0000146440 | 4CE9 | 1069 | 2FC9 | 2449 | CB01 | 1889 | 4D48 | CA09 |
| 0000146460 | 8747 | 4927 | C906 | B74A | 0020 | CA03 | 8747 | 4927 |
| 0000146500 | C8FA | 4D47 | CB02 | 4508 | C021 | 874B | A3CF | 934E |
| 0000146520 | 0D5F | 7DB0 | FFC6 | 4D67 | 4527 | 1507 | C212 | 4D27 |
| 0000146540 | 2467 | 4147 | 4CEC | 100C | 4D67 | 4527 | 1487 | 82EC |
| 0000146560 | A3CF | 938E | 0D5F | 7960 | FFC6 | 4D27 | 1027 | 82EA |
| 0000146600 | C003 | 4D67 | 1027 | 82EA | 4D48 | 1008 | B7EE | 00E0 |
| 0000146620 | 09AF | 3E80 | 0962 | 098F | 0174 | 4DCD | B7A9 | FFC0 |
| 0000146640 | B7A7 | FFE0 | 5EE9 | A3CF | 932E | 0D5F | 81D0 | FFC6 |
| 0000146660 | 4D0A | 4D4B | CB02 | 4508 | C00F | 4D27 | 1067 | 4CE9 |
| 0000146700 | 2BC9 | 4D27 | 1429 | 4CE8 | CA06 | 44E7 | 92EA | 4D27 |
| 0000146720 | 1429 | 4CE8 | CBFA | 4D68 | B7EE | 00C0 | 09AF | 2E80 |
| 0000146740 | 0962 | 098F | 017C | 4DCD | 0B0E | 0040 | B7A9 | FFE0 |
| 0000146760 | 1409 | B7AA | FFC0 | 106A | B7A7 | FFC0 | C503 | 4508 |
| 0000147000 | C000 | 0098 | B7A7 | FFE0 | CB08 | A3CF | D3AE | FFC0 |
| 0000147020 | 0D5F | 81D0 | FFC6 | C000 | 008D | B7A7 | FFC0 | CB09 |
| 0000147040 | A3CF | D3AE | FFE0 | 0D5F | 9370 | FFC6 | 4508 | C000 |
| 0000147060 | 0081 | 2BCA | 244A | 4D48 | C701 | 188A | 872B | 1FEB |
| 0000147100 | CB02 | 4508 | C077 | 142B | 496A | CB03 | B7A8 | FFE0 |
| 0000147120 | C071 | 496A | C51E | 4D67 | 4547 | 1507 | C503 | B7A8 |
| 0000147140 | FFE0 | C068 | 4D47 | 1027 | 82E9 | 4D47 | 1087 | 44EB |
| 0000147160 | 4D47 | 1087 | 2467 | 40E9 | 4D67 | 1027 | 82E9 | A3CF |

THU MAR 14 17:37:32 1991 GSPMON.4 PAGE 57, LINE 3305

| | | | | | | | | |
|---|---|---|---|---|---|---|---|---|
| 0000147200 | 4D27 | 1007 | 92EE | 0D5F | 9370 | FFC6 | B7A8 | FFE0 |
| 0000147220 | C051 | 4D67 | 2467 | 4127 | 1007 | 82ED | 0B67 | 93AF |
| 0000147240 | 000C | C92E | 86E7 | 1FE7 | CB2B | 87A7 | 86E7 | 4167 |
| 0000147260 | 4547 | 1087 | B2ED | 0020 | C423 | A3CF | D3AE | 0000 |
| 0000147300 | 0D5F | 7DB0 | FFC6 | 1507 | C508 | B7A7 | 0020 | 4147 |
| 0000147320 | 1027 | 82E9 | B7A8 | FFE0 | C02D | 4D47 | 1027 | 82E9 |
| 0000147340 | 4D47 | 1087 | 2467 | 40E9 | B7A7 | 0020 | 1487 | 82E9 |
| 0000147360 | A3CF | 932E | 0D5F | 7960 | FFC6 | B7A8 | FFE0 | C01A |
| 0000147400 | A3CF | D3AE | FFC0 | 0D5F | 81D0 | FFC6 | 4D0C | CB02 |
| 0000147420 | 4508 | C010 | A3CF | 936E | 938E | 4D27 | 1007 | 92EE |
| 0000147440 | 0D5F | 7510 | FFC6 | A3CF | D3AE | FFE0 | 0D5F | 9370 |
| 0000147460 | FFC6 | 4D88 | B7EE | 00E0 | 09AF | 3E80 | 0962 | 098F |
| 0000147500 | 057C | 4DCD | 09C9 | FFFE | 458C | 4D8A | B7A7 | FFE0 |
| 0000147520 | 1407 | B2ED | FFE0 | 09EB | 6C70 | FFD3 | 48EB | C90A |
| 0000147540 | 4D6A | 8767 | 5127 | 2467 | 40EB | 100B | B7A7 | FFE0 |
| 0000147560 | 48EB | C8F6 | B7A7 | FFE0 | 48EB | CB5B | 8767 | 1FE7 |
| 0000147600 | CA58 | 8767 | 5127 | 82EB | 8767 | 2467 | 4167 | 4CEC |
| 0000147620 | 100C | 0B6C | 93AF | 000C | C201 | 458C | 4D47 | CA2F |
| 0000147640 | 8747 | 1FE7 | CB2C | 4D87 | CA1A | 8787 | 1FE7 | CB17 |
| 0000147660 | A3CF | 934E | 0D5F | 7DB0 | FFC6 | A3CF | 938E | 0D5F |
| 0000147700 | 7DB0 | FFC6 | 8767 | 8785 | 40A7 | 8745 | 1107 | 40E5 |
| 0000147720 | 82AA | A3CF | 934E | 0D5F | 7960 | FFC6 | C02A | A3CF |
| 0000147740 | 934E | 0D5F | 7DB0 | FFC6 | 8767 | 8745 | 1087 | 40E5 |
| 0000147760 | 82AA | A3CF | 934E | 0D5F | 7960 | FFC6 | C01A | 4D85 |
| 0000150000 | CA13 | 8787 | 1FE7 | CB10 | A3CF | 938E | 0D5F | 7DB0 |
| 0000150020 | FFC6 | 8787 | 8765 | 1087 | 40E5 | 82AB | A3CF | 936E |
| 0000150040 | 0D5F | 7960 | FFC6 | C005 | A3CF | 936E | 0D5F | 7960 |
| 0000150060 | FFC6 | B7EE | 0100 | 09AF | 3EA0 | 0962 | 098F | 007C |
| 0000150100 | 4DCD | B7A9 | FFE0 | B7AA | FFC0 | B7AB | FFA0 | 4D2C |
| 0000150120 | 142B | C404 | 0568 | 9149 | 142B | C5FD | 4D88 | B7EE |
| 0000150140 | 00C0 | 09AF | 3E00 | 0962 | 098F | 817C | 4DCD | B7A9 |
| 0000150160 | FFE0 | 454A | B7AB | FFC0 | 142B | B7AC | FFC0 | 2BEC |
| 0000150200 | B7A7 | FFA0 | 5D87 | 2467 | 4127 | 4CE0 | 496A | C567 |
| 0000150220 | A3CF | 920E | B7A7 | FFA0 | 5D47 | 2467 | 4127 | 92EE |
| 0000150240 | B7A7 | FF80 | 0927 | 4D08 | C50E | 102A | A3CF | 920E |
| 0000150260 | B7A7 | FFA0 | 5D47 | 2467 | 4127 | 92EE | B7A7 | FF80 |
| 0000150300 | 0927 | 4D08 | C4F2 | A3CF | 920E | B7A7 | FFA0 | 5D67 |
| 0000150320 | 2467 | 4127 | 92EE | B7A7 | FF80 | 0927 | 4D08 | C60E |
| 0000150340 | 142B | A3CF | 920E | B7A7 | FFA0 | 5D67 | 2467 | 4127 |
| 0000150360 | 92EE | B7A7 | FF80 | 0927 | 4D08 | C7F2 | 496A | C528 |
| 0000150400 | A3CF | D3AE | FFA0 | B7A7 | FFA0 | 5D67 | 2467 | 4127 |
| 0000150420 | 92EE | B7A7 | FFA0 | 5D47 | 2467 | 4127 | 92EE | 0D5F |
| 0000150440 | A710 | FFC6 | 494C | CB08 | 4D6C | B7A7 | FFA0 | 5D87 |
| 0000150460 | 2467 | 4127 | 4CE0 | C009 | 496C | CB07 | 4D4C | B7A7 |
| 0000150500 | FFA0 | 5D87 | 2467 | 4127 | 4CE0 | 102A | 142B | C005 |
| 0000150520 | 496A | CB03 | 102A | 142B | C002 | 496A | C499 | 4D67 |
| 0000150540 | C60C | A3CF | D3AE | FF80 | D3AE | FFA0 | 4D67 | 1027 |
| 0000150560 | 92EE | 932E | 0D5F | 9CC0 | FFC6 | B7A7 | FFC0 | 1427 |
| 0000150600 | 48EA | C512 | A3CF | D3AE | FF80 | D3AE | FFA0 | B7A7 |
| 0000150620 | FFC0 | 4547 | 92EE | B7A7 | FFA0 | 5D47 | 2467 | 4127 |
| 0000150640 | 92EE | 0D5F | 9CC0 | FFC6 | B7EE | 0100 | 09AF | 3E81 |
| 0000150660 | 0962 | 098F | 007C | 4DCD | B7A9 | FFE0 | B7AA | FFC0 |
| 0000150700 | B7AB | FFA0 | 142B | C407 | 0568 | 8F2C | D149 | 0000 |
| 0000150720 | 918A | 142B | C5FA | B7EE | 00C0 | 09AF | 3E00 | 0962 |
| 0000150740 | A7C8 | 0B08 | 01E0 | B7EE | 0020 | 0988 | FF7F | BBE8 |
| 0000150760 | 0000 | 01E0 | 5708 | 0962 | A7C8 | A7C1 | 09A8 | FEFC |
| 0000151000 | B700 | 0040 | 0B0F | 0040 | A20F | A22F | 09A8 | 0003 |
| 0000151020 | 97E8 | 0960 | A7C8 | 4F09 | 0962 | 098F | FC00 | 099F |
| 0000151040 | F100 | 0550 | A7C0 | A7C1 | A7C2 | A7C3 | A7C4 | A7C5 |

THU MAR 14 17:37:32 1991 GSPMON.4 PAGE 58, LINE 3364

| | | | | | | | | |
|---|---|---|---|---|---|---|---|---|
| 0000151060 | 4C71 | 4EA3 | 05A8 | 0130 | C000 | 05C0 | 0140 | C000 |
| 0000151100 | 0130 | C000 | 2603 | EE62 | 4E40 | 4E82 | 2601 | EE20 |
| 0000151120 | 4E07 | 0F40 | 0588 | 0130 | C000 | 09BF | 005F | 09AF |
| 0000151140 | 003F | 0962 | 098F | FF00 | 099F | E100 | 0550 | 05A6 |
| 0000151160 | 00B0 | C000 | 4CC7 | A7C0 | A7C1 | A7C2 | A7C3 | A7C4 |
| 0000151200 | A7C5 | 0B87 | 0300 | FFFF | 4844 | C603 | 0BA7 | 0100 |
| 0000151220 | 0000 | 4865 | C603 | 0BA7 | 0200 | 0000 | 0587 | 00B0 |
| 0000151240 | C000 | 4C71 | 05A8 | 0130 | C000 | 05C0 | 0140 | C000 |
| 0000151260 | 0130 | C000 | 2603 | EE62 | 4E40 | 2605 | EEA4 | 4E82 |
| 0000151300 | 2601 | EE20 | 4E07 | 0F60 | 0586 | 00B0 | C000 | 0588 |
| 0000151320 | 0130 | C000 | 09BF | 0087 | 09AF | 00FF | 0962 | 0550 |
| 0000151340 | A7C8 | 8508 | 0962 | A20F | A7C8 | 0B88 | FFF0 | FFFF |
| 0000151360 | 24A8 | 09E0 | B160 | FFC6 | 4100 | 0160 | 4E18 | C01D |
| 0000151400 | 4E38 | C01B | 4E58 | C019 | 4E78 | C017 | 4E98 | C015 |
| 0000151420 | 4EB8 | C013 | 4ED8 | C011 | 4EF8 | C00F | 4F18 | C00D |
| 0000151440 | 4F38 | C00B | 4F58 | C009 | 4F78 | C007 | 4F98 | C005 |
| 0000151460 | 4FB8 | C003 | 4FD8 | C001 | 4FF8 | 97E0 | 0962 | 098F |
| 0000151500 | FC00 | 099F | C13E | 0550 | A7C4 | A7C8 | A7C0 | A7C1 |
| 0000151520 | A7C2 | A7C3 | 4F01 | 4E80 | 2603 | EE62 | 4E42 | 2601 |
| 0000151540 | EE20 | 4E07 | 0F20 | 09BF | 7C83 | 09AF | 003F | 0962 |
| 0000151560 | A7C8 | 0545 | 0588 | 00BA | C000 | 0962 | 098F | DC00 |
| 0000151600 | 099F | 2100 | 0550 | A7C0 | CE21 | A7C1 | CE1F | A7C3 |
| 0000151620 | A7C4 | 4C88 | 2608 | EC68 | 4F02 | 4D05 | 1828 | 2608 |
| 0000151640 | EC08 | 1028 | 4F07 | 0FE0 | 4C28 | CA10 | 2608 | E0A8 |
| 0000151660 | 4F02 | 0FE0 | 1828 | 2608 | E105 | 4EA2 | 4E27 | 1437 |
| 0000151700 | 2617 | 1037 | 0FE0 | 4005 | 4EA2 | 0FE0 | 09BF | 0084 |
| 0000151720 | 09AF | 003B | 0962 | A20F | 099F | 213E | A7C0 | A7C8 |
| 0000151740 | 2608 | EF00 | 4E07 | A7C0 | A7C8 | 2608 | EF00 | 4E02 |
| 0000151760 | 0FE0 | 09BF | 7C84 | 97E0 | 0962 | 0001 | D770 | FFC6 |
| 0000152000 | 0000 | 0001 | F7C0 | FFC6 | 0000 | 0006 | 8850 | FFC7 |
| 0000152020 | 0000 | 0000 | 0000 | 0000 | 0000 | 0000 | 0001 | 88Cu |
| 0000152040 | FFC7 | 0002 | 0007 | 8900 | FFC7 | 0000 | 0000 | 0000 |
| 0000152060 | 0000 | 0000 | 0000 | 0000 | 0001 | 8980 | FFC7 | 0000 |
| 0000152100 | 0003 | 89D0 | FFC7 | 0000 | 0000 | 0000 | 0007 | 8A00 |
| 0000152120 | FFC7 | 0000 | 0000 | 0000 | 0000 | 0000 | 0000 | 0000 |
| 0000152140 | 0007 | 8A70 | FFC7 | 0000 | 0000 | 0000 | 0000 | 0000 |
| 0000152160 | 0000 | 0000 | 0001 | 54F0 | FFC9 | 0000 | 0001 | 5500 |
| 0000152200 | FFC9 | 0000 | 0001 | 5510 | FFC9 | 0004 | 0001 | 5520 |
| 0000152220 | FFC9 | 0002 | 0001 | 5530 | FFC9 | 0000 | 0008 | 5540 |
| 0000152240 | FFC9 | 0300 | 0202 | 0101 | 0101 | 0000 | 0000 | 0000 |
| 0000152260 | 0000 | 0008 | 55C0 | FFC9 | 0400 | 0403 | 0402 | 0403 |
| 0000152300 | 0401 | 0403 | 0402 | 0403 | 0002 | 7BE0 | FFC9 | 0000 |
| 0000152320 | 0000 | 0002 | 7C00 | FFC9 | 0000 | 0000 | 0002 | 7C20 |
| 0000152340 | FFC9 | 0000 | 0000 | 0012 | 8CF0 | FFC9 | 0000 | 0000 |
| 0000152360 | 0000 | FFFF | 0001 | 0000 | 0000 | 0001 | FFFF | 0000 |
| 0000152400 | FFFF | FFFF | FFFF | 0001 | 0001 | 0001 | 0001 | FFFF |
| 0000152420 | 0003 | 8E10 | FFC9 | 0000 | 0000 | 0000 | 0002 | 8EA0 |
| 0000152440 | FFC9 | 0000 | 0000 | 0001 | 8F40 | FFC9 | 0000 | 0001 |
| 0000152460 | 8F50 | FFC9 | 0000 | 0001 | 8F60 | FFC9 | 0000 | 0001 |
| 0000152500 | 8F70 | FFC9 | 0000 | 0002 | 8F80 | FFC9 | 0000 | 0000 |
| 0000152520 | 0001 | 9080 | FFC9 | 0000 | 0001 | 9090 | FFC9 | 0000 |
| 0000152540 | 0009 | 9750 | FFC9 | 0001 | 0001 | 0000 | 0001 | 0000 |
| 0000152560 | 0000 | 0000 | 0000 | 0000 | 0001 | 98A0 | FFD1 | 0000 |
| 0000152600 | 0001 | 9910 | FFD1 | 0004 | 0001 | 9920 | FFD1 | 0004 |
| 0000152620 | 0001 | 9930 | FFD1 | 0004 | 0001 | 9940 | FFD1 | 0004 |
| 0000152640 | 0001 | 9950 | FFD1 | 0004 | 0001 | 9960 | FFD1 | 00U7 |
| 0000152660 | 0001 | DFF0 | FFD1 | 0000 | 0001 | E000 | FFD1 | 0000 |
| 0000152700 | 0001 | E010 | FFD1 | 0000 | 0001 | E020 | FFD1 | 0000 |
| 0000152720 | 0001 | E030 | FFD1 | 0000 | 0001 | E040 | FFD1 | 0000 |

THU MAR 14 17:37:32 1991 GSPMON.4 PAGE 59, LINE 3423

| | | | | | | | | |
|---|---|---|---|---|---|---|---|---|
| 0000152740 | 0001 | E050 | FFD1 | 0000 | 0001 | E060 | FFD1 | 0000 |
| 0000152760 | 0001 | E070 | FFD1 | 0000 | 0001 | E080 | FFD1 | 0000 |
| 0000153000 | 0001 | E090 | FFD1 | 0000 | 0001 | E0A0 | FFD1 | 0000 |
| 0000153020 | 0001 | E0B0 | FFD1 | 0000 | 0001 | E0C0 | FFD1 | 0001 |
| 0000153040 | 0001 | E0D0 | FFD1 | 0000 | 0001 | E0E0 | FFD1 | 0000 |
| 0000153060 | 0002 | E0F0 | FFD1 | 0000 | 0000 | 0001 | E240 | FFD1 |
| 0000153100 | 0001 | 0001 | E290 | FFD1 | 0000 | 0001 | E2A0 | FFD1 |
| 0000153120 | 0000 | 0002 | 6A20 | FFD2 | 0000 | 0000 | 0002 | 6A40 |
| 0000153140 | FFD2 | 0000 | 0000 | 0002 | 6A60 | FFD2 | 0000 | 0000 |
| 0000153160 | 0001 | 6A80 | FFD2 | 0000 | 0001 | 6A90 | FFD2 | 0000 |
| 0000153200 | 0002 | 6AA0 | FFD2 | 0000 | 0000 | 0001 | 6AC0 | FFD2 |
| 0000153220 | 0000 | 0001 | 6AD0 | FFD2 | 0000 | 0001 | 6AE0 | FFD2 |
| 0000153240 | 0060 | 0002 | 6AF0 | FFD2 | 00C0 | 0400 | 0002 | 6B20 |
| 0000153260 | FFD2 | 0000 | 0000 | 0001 | 6B40 | FFD2 | 0000 | 0001 |
| 0000153300 | 6B50 | FFD2 | 0000 | 0001 | 6CE0 | FFD2 | 0000 | 0001 |
| 0000153320 | 6CF0 | FFD2 | 0000 | 0001 | 6D00 | FFD2 | 0000 | 0002 |
| 0000153340 | 6D10 | FFD2 | 0000 | 0000 | 0002 | 6D30 | FFD2 | 0000 |
| 0000153360 | 0040 | 0001 | 6D50 | FFD2 | 0000 | 0001 | 6DB0 | FFD2 |
| 0000153400 | 0001 | 0001 | 6DC0 | FFD2 | 0000 | 0002 | 6DD0 | FFD2 |
| 0000153420 | 0160 | C000 | 0002 | 6DF0 | FFD2 | 00B0 | C000 | 0002 |
| 0000153440 | 6850 | FFD3 | 0000 | 0000 | 0004 | 6C70 | FFD3 | FFFC |
| 0000153460 | 0003 | 0000 | 0000 | 0002 | 6C70 | FFF3 | 6C70 | FFD3 |
| 0000153500 | 0000 | 01D6 | 0000 | 0000 | 2040 | FFC0 | 0009 | 20A0 |
| 0000153520 | FFC0 | 000A | 2100 | FFC0 | 000C | 2160 | FFC0 | 000D |
| 0000153540 | 21A0 | FFC0 | 000E | 21E0 | FFC0 | 000F | 2240 | FFC0 |
| 0000153560 | 0010 | 22A0 | FFC0 | 0011 | 22E0 | FFC0 | 0012 | 2320 |
| 0000153600 | FFC0 | 0013 | 2380 | FFC0 | 0014 | 23E0 | FFC0 | 0015 |
| 0000153620 | 2440 | FFC0 | 0016 | 2480 | FFC0 | 0017 | 24E0 | FFC0 |
| 0000153640 | 0018 | 2510 | FFC0 | 0019 | 2560 | FFC0 | 001C | 2590 |
| 0000153660 | FFC0 | 001D | 25C0 | FFC0 | 001F | 2650 | FFC0 | 0021 |
| 0000153700 | 2680 | FFC0 | 0022 | 26D0 | FFC0 | 0024 | 26D0 | FFC0 |
| 0000153720 | 0025 | 2720 | FFC0 | 0026 | 2780 | FFC0 | 0027 | 2810 |
| 0000153740 | FFC0 | 0029 | 2860 | FFC0 | 002A | 28C0 | FFC0 | 002C |
| 0000153760 | 2900 | FFC0 | 002D | 29F0 | FFC0 | 002E | 2A00 | FFC0 |
| 0000154000 | 002F | 2B40 | FFC0 | 0030 | 2BA0 | FFC0 | 0031 | 2BD0 |
| 0000154020 | FFC0 | 0032 | 2C20 | FFC0 | 0024 | 01DE | 0000 | 0000 |
| 0000154040 | 2C50 | FFC0 | 0003 | 2CF0 | FFC0 | 0004 | 2D90 | FFC0 |
| 0000154060 | 0007 | 01E4 | 0000 | 0000 | 01EE | 0000 | 0000 | 2EE0 |
| 0000154100 | FFC0 | 0003 | 2F50 | FFC0 | 0004 | 2F90 | FFC0 | 0006 |
| 0000154120 | 2FF0 | FFC0 | 0008 | 3120 | FFC0 | 000A | 01F4 | 0000 |
| 0000154140 | 0000 | 01FA | 0000 | 0000 | 31A0 | FFC0 | 0006 | 3200 |
| 0000154160 | FFC0 | 0007 | 3260 | FFC0 | 0009 | 32C0 | FFC0 | 000A |
| 0000154200 | 3320 | FFC0 | 000B | 3360 | FFC0 | 000D | 33C0 | FFC0 |
| 0000154220 | 0010 | 33D0 | FFC0 | 0012 | 3430 | FFC0 | 0013 | 3440 |
| 0000154240 | FFC0 | 0015 | 3490 | FFC0 | 0016 | 3530 | FFC0 | 0017 |
| 0000154260 | 3540 | FFC0 | 0019 | 35B0 | FFC0 | 001A | 3610 | FFC0 |
| 0000154300 | 001B | 3670 | FFC0 | 001D | 36B0 | FFC0 | 001E | 37B0 |
| 0000154320 | FFC0 | 001F | 37C0 | FFC0 | 0020 | 3910 | FFC0 | 0021 |
| 0000154340 | 3980 | FFC0 | 0022 | 39C0 | FFC0 | 0024 | 3A20 | FFC0 |
| 0000154360 | 0026 | 3AF0 | FFC0 | 0028 | 3B00 | FFC0 | 002A | 3B60 |
| 0000154400 | FFC0 | 002B | 3B70 | FFC0 | 0010 | 3BF0 | FFC0 | 002D |
| 0000154420 | 3C50 | FFC0 | 002E | 0276 | 0000 | 0000 | 3D20 | FFC0 |
| 0000154440 | 0008 | 3D90 | FFC0 | 0009 | 0282 | 0000 | 0000 | 3E50 |
| 0000154460 | FFC0 | 0007 | 3EC0 | FFC0 | 0009 | 3ED0 | FFC0 | 000A |
| 0000154500 | 3F10 | FFC0 | 000B | 028C | 0000 | 0000 | 4020 | FFC0 |
| 0000154520 | 0007 | 4090 | FFC0 | 0009 | 40A0 | FFC0 | 000A | 40E0 |
| 0000154540 | FFC0 | 000B | 0296 | 0000 | 0000 | 41E0 | FFC0 | 0005 |
| 0000154560 | 4250 | FFC0 | 0006 | 42C0 | FFC0 | 0007 | 4300 | FFC0 |
| 0000154600 | 0009 | 4360 | FFC0 | 000B | 43B0 | FFC0 | 000C | 029E |

THU MAR 14 17:37:32 1991 GSPMON.4 PAGE 60, LINE 3482

| | | | | | | | | |
|---|---|---|---|---|---|---|---|---|
| 0000154620 | 0000 | 0000 | 44C0 | FFC0 | 0007 | 4520 | FFC0 | 0008 |
| 0000154640 | 4590 | FFC0 | 0009 | 4660 | FFC0 | 000A | 46D0 | FFC0 |
| 0000154660 | 000B | 4710 | FFC0 | 000D | 4770 | FFC0 | 000F | 4840 |
| 0000154700 | FFC0 | 0011 | 02C0 | 0000 | 0000 | 48B0 | FFC0 | 0004 |
| 0000154720 | 4910 | FFC0 | 0005 | 4970 | FFC0 | 0006 | 49D0 | FFC0 |
| 0000154740 | 0007 | 4A30 | FFC0 | 0008 | 4A90 | FFC0 | 0009 | 4AF0 |
| 0000154760 | FFC0 | 000A | 4B50 | FFC0 | 000B | 4BB0 | FFC0 | 000C |
| 0000155000 | 4C10 | FFC0 | 000D | 4C70 | FFC0 | 000E | 4CD0 | FFC0 |
| 0000155020 | 000F | 4D30 | FFC0 | 0010 | 4D90 | FFC0 | 0011 | 4DF0 |
| 0000155040 | FFC0 | 0012 | 4E50 | FFC0 | 0013 | 4EB0 | FFC0 | 0014 |
| 0000155060 | 4F10 | FFC0 | 0015 | 4F70 | FFC0 | 0016 | 4FD0 | FFC0 |
| 0000155100 | 0017 | 5030 | FFC0 | 0018 | 5090 | FFC0 | 0019 | 50F0 |
| 0000155120 | FFC0 | 001A | 5150 | FFC0 | 001B | 51B0 | FFC0 | 001C |
| 0000155140 | 5210 | FFC0 | 001D | 5270 | FFC0 | 001E | 52D0 | FFC0 |
| 0000155160 | 001F | 5330 | FFC0 | 0020 | 5390 | FFC0 | 0021 | 53F0 |
| 0000155200 | FFC0 | 0022 | 5450 | FFC0 | 0023 | 54B0 | FFC0 | 0024 |
| 0000155220 | 5510 | FFC0 | 0025 | 5570 | FFC0 | 0026 | 55D0 | FFC0 |
| 0000155240 | 0027 | 5630 | FFC0 | 0028 | 5690 | FFC0 | 0029 | 56F0 |
| 0000155260 | FFC0 | 002A | 5750 | FFC0 | 002B | 57B0 | FFC0 | 002C |
| 0000155300 | 5810 | FFC0 | 002D | 5870 | FFC0 | 002E | 58D0 | FFC0 |
| 0000155320 | 002F | 5930 | FFC0 | 0030 | 5990 | FFC0 | 0031 | 59F0 |
| 0000155340 | FFC0 | 0032 | 5A50 | FFC0 | 0033 | 5AB0 | FFC0 | 0034 |
| 0000155360 | 5B10 | FFC0 | 0035 | 5B70 | FFC0 | 0036 | 5BD0 | FFC0 |
| 0000155400 | 0037 | 5C30 | FFC0 | 0038 | 5C90 | FFC0 | 0039 | 5CF0 |
| 0000155420 | FFC0 | 003A | 04F0 | 0000 | 0000 | 5DA0 | FFC0 | 0005 |
| 0000155440 | 5DF0 | FFC0 | 0006 | 5E40 | FFC0 | 0007 | 5E70 | FFC0 |
| 0000155460 | 0008 | 5EB0 | FFC0 | 0009 | 5F10 | FFC0 | 000B | 5F60 |
| 0000155500 | FFC0 | 000C | 5F90 | FFC0 | 000D | 5FC0 | FFC0 | 000E |
| 0000155520 | 5FF0 | FFC0 | 000F | 6040 | FFC0 | 0010 | 6090 | FFC0 |
| 0000155540 | 0011 | 60C0 | FFC0 | 0012 | 6100 | FFC0 | 0013 | 6130 |
| 0000155560 | FFC0 | 0014 | 6190 | FFC0 | 0016 | 61D0 | FFC0 | 0017 |
| 0000155600 | 6210 | FFC0 | 0018 | 6240 | FFC0 | 0019 | 6280 | FFC0 |
| 0000155620 | 001A | 62B0 | FFC0 | 001B | 62E0 | FFC0 | 001C | 6310 |
| 0000155640 | FFC0 | 001D | 6360 | FFC0 | 001E | 6390 | FFC0 | 001F |
| 0000155660 | 63F0 | FFC0 | 0021 | 04F6 | 0000 | 0000 | 04FC | 0000 |
| 0000155700 | 0000 | 64B0 | FFC0 | 0008 | 6500 | FFC0 | 0009 | 6550 |
| 0000155720 | FFC0 | 000A | 6560 | FFC0 | 000D | 65C0 | FFC0 | 0012 |
| 0000155740 | 0504 | 0000 | 0000 | 050E | 0000 | 0000 | 66F0 | FFC0 |
| 0000155760 | 0006 | 67A0 | FFC0 | 0007 | 6850 | FFC0 | 0008 | 6900 |
| 0000156000 | FFC0 | 0009 | 69B0 | FFC0 | 0010 | 6A00 | FFC0 | 0013 |
| 0000156020 | 6A40 | FFC0 | 0014 | 6A7D | FFC0 | 0015 | 6AA0 | FFC0 |
| 0000156040 | 001C | 6B00 | FFC0 | 0027 | 6B60 | FFC0 | 0028 | 6BB0 |
| 0000156060 | FFC0 | 0029 | 6C00 | FFC0 | 002A | 0516 | 0000 | 0000 |
| 0000156100 | 6CB0 | FFC0 | 0005 | 6D00 | FFC0 | 0009 | 051C | 0000 |
| 0000156120 | 0000 | 6D90 | FFC0 | 0005 | 6DE0 | FFC0 | 0009 | 0522 |
| 0000156140 | 0000 | 0000 | 6E90 | FFC0 | 0005 | 6EF0 | FFC0 | 0006 |
| 0000156160 | 05AE | 0000 | 0000 | 6FB0 | FFC0 | 0005 | 7050 | FFC0 |
| 0000156200 | 0006 | 7100 | FFC0 | 0007 | 71C0 | FFC0 | 0008 | 7260 |
| 0000156220 | FFC0 | 0010 | 7320 | FFC0 | 0011 | 73C0 | FFC0 | 0012 |
| 0000156240 | 7460 | FFC0 | 0018 | 7520 | FFC0 | 0019 | 75D0 | FFC0 |
| 0000156260 | 001A | 7670 | FFC0 | 001B | 7710 | FFC0 | 001C | 77B0 |
| 0000156300 | FFC0 | 001D | 7850 | FFC0 | 001F | 78F0 | FFC0 | 0020 |
| 0000156320 | 79B0 | FFC0 | 0021 | 05B4 | 0000 | 0000 | 7BA0 | FFC0 |
| 0000156340 | 0006 | 071A | 0000 | 0000 | 7C80 | FFC0 | 000B | 7CF0 |
| 0000156360 | FFC0 | 000C | 7D40 | FFC0 | 000D | 7D70 | FFC0 | 000E |
| 0000156400 | 7DB0 | FFC0 | 000F | 7DE0 | FFC0 | 0010 | 7E20 | FFC0 |
| 0000156420 | 0012 | 7E60 | FFC0 | 0013 | 7E90 | FFC0 | 0014 | 7EC0 |
| 0000156440 | FFC0 | 0015 | 7EF0 | FFC0 | 0016 | 7F40 | FFC0 | 0017 |
| 0000156460 | 7F90 | FFC0 | 0018 | 7FE0 | FFC0 | 0019 | 8010 | FFC0 |

THU MAR 14 17:37:32 1991 GSPMON.4 PAGE 61, LINE 3541

| | | | | | | | | |
|---|---|---|---|---|---|---|---|---|
| 0000156500 | 001A | 8050 | FFC0 | 001B | 8080 | FFC0 | 001D | 80C0 |
| 0000156520 | FFC0 | 001E | 80F0 | FFC0 | 001F | 8140 | FFC0 | 0020 |
| 0000156540 | 8170 | FFC0 | 0021 | 81B0 | FFC0 | 0022 | 81F0 | FFC0 |
| 0000156560 | 0023 | 8220 | FFC0 | 0024 | 8260 | FFC0 | 0025 | 82A0 |
| 0000156600 | FFC0 | 0026 | 82E0 | FFC0 | 0028 | 8320 | FFC0 | 0029 |
| 0000156620 | 8360 | FFC0 | 002A | 8390 | FFC0 | 002B | 83D0 | FFC0 |
| 0000156640 | 002C | 8400 | FFC0 | 0034 | 8470 | FFC0 | 0035 | 84C0 |
| 0000156660 | FFC0 | 0036 | 84F0 | FFC0 | 0037 | 8520 | FFC0 | 0038 |
| 0000156700 | 8550 | FFC0 | 0039 | 8590 | FFC0 | 003B | 85D0 | FFC0 |
| 0000156720 | 003C | 8600 | FFC0 | 003D | 8630 | FFC0 | 003E | 8660 |
| 0000156740 | FFC0 | 003F | 86B0 | FFC0 | 0040 | 8700 | FFC0 | 0041 |
| 0000156760 | 8740 | FFC0 | 0042 | 8770 | FFC0 | 0043 | 87A0 | FFC0 |
| 0000157000 | 0044 | 87D0 | FFC0 | 0046 | 8810 | FFC0 | 0047 | 8840 |
| 0000157020 | FFC0 | 0048 | 8890 | FFC0 | 0049 | 88C0 | FFC0 | 004A |
| 0000157040 | 8900 | FFC0 | 004B | 8930 | FFC0 | 004C | 8970 | FFC0 |
| 0000157060 | 004D | 89A0 | FFC0 | 004E | 89E0 | FFC0 | 004F | 8A20 |
| 0000157100 | FFC0 | 0051 | 8A60 | FFC0 | 0052 | 8AA0 | FFC0 | 0053 |
| 0000157120 | 8AD0 | FFC0 | 0054 | 8B10 | FFC0 | 0055 | 8B40 | FFC0 |
| 0000157140 | 005C | 8BB0 | FFC0 | 005D | 8C00 | FFC0 | 005E | 8C30 |
| 0000157160 | FFC0 | 005F | 8C60 | FFC0 | 0060 | 8C90 | FFC0 | 0061 |
| 0000157200 | 8CD0 | FFC0 | 0063 | 8D10 | FFC0 | 0064 | 8D40 | FFC0 |
| 0000157220 | 0065 | 8D70 | FFC0 | 0066 | 8DA0 | FFC0 | 0067 | 8DF0 |
| 0000157240 | FFC0 | 0068 | 8E40 | FFC0 | 0069 | 8E90 | FFC0 | 006A |
| 0000157260 | 8EC0 | FFC0 | 006B | 8F00 | FFC0 | 006C | 8F30 | FFC0 |
| 0000157300 | 006E | 8F70 | FFC0 | 006F | 8FA0 | FFC0 | 0070 | 8FF0 |
| 0000157320 | FFC0 | 0071 | 9020 | FFC0 | 0072 | 9050 | FFC0 | 0073 |
| 0000157340 | 9080 | FFC0 | 0074 | 90B0 | FFC0 | 0075 | 90E0 | FFC0 |
| 0000157360 | 0076 | 9120 | FFC0 | 0077 | 9160 | FFC0 | 0079 | 91A0 |
| 0000157400 | FFC0 | 007A | 91E0 | FFC0 | 007B | 9210 | FFC0 | 007C |
| 0000157420 | 9250 | FFC0 | 007D | 9280 | FFC0 | 0084 | 92F0 | FFC0 |
| 0000157440 | 0085 | 9340 | FFC0 | 0086 | 9370 | FFC0 | 0087 | 93A0 |
| 0000157460 | FFC0 | 0088 | 93D0 | FFC0 | 0089 | 9410 | FFC0 | 008B |
| 0000157500 | 9450 | FFC0 | 008C | 9480 | FFC0 | 008D | 94B0 | FFC0 |
| 0000157520 | 008E | 94E0 | FFC0 | 008F | 9530 | FFC0 | 0090 | 9580 |
| 0000157540 | FFC0 | 0091 | 95D0 | FFC0 | 0092 | 9600 | FFC0 | 0093 |
| 0000157560 | 9640 | FFC0 | 0094 | 9670 | FFC0 | 0096 | 96B0 | FFC0 |
| 0000157600 | 0097 | 96E0 | FFC0 | 0098 | 9720 | FFC0 | 0099 | 9750 |
| 0000157620 | FFC0 | 009A | 9790 | FFC0 | 009B | 97D0 | FFC0 | 009C |
| 0000157640 | 9800 | FFC0 | 009D | 9840 | FFC0 | 009E | 9880 | FFC0 |
| 0000157660 | 009F | 98C0 | FFC0 | 00A1 | 9900 | FFC0 | 00A2 | 9940 |
| 0000157700 | FFC0 | 00A3 | 9970 | FFC0 | 00A4 | 99B0 | FFC0 | 00A5 |
| 0000157720 | 99E0 | FFC0 | 00AD | 9A50 | FFC0 | 00AE | 9AA0 | FFC0 |
| 0000157740 | 00AF | 9AD0 | FFC0 | 00B0 | 9B00 | FFC0 | 00B1 | 9B30 |
| 0000157760 | FFC0 | 00B2 | 9B70 | FFC0 | 00B4 | 9BB0 | FFC0 | 00B5 |
| 0000160000 | 9BE0 | FFC0 | 00B6 | 9C10 | FFC0 | 00B7 | 9C40 | FFC0 |
| 0000160020 | 00B8 | 9C90 | FFC0 | 00B9 | 9CE0 | FFC0 | 00BA | 9D30 |
| 0000160040 | FFC0 | 00BB | 9D60 | FFC0 | 00BC | 9DA0 | FFC0 | 00BD |
| 0000160060 | 9DD0 | FFC0 | 00BF | 9E10 | FFC0 | 00C0 | 9E40 | FFC0 |
| 0000160100 | 00C1 | 9E80 | FFC0 | 00C2 | 9EB0 | FFC0 | 00C3 | 9EF0 |
| 0000160120 | FFC0 | 00C4 | 9F30 | FFC0 | 00C5 | 9F60 | FFC0 | 00C6 |
| 0000160140 | 9FA0 | FFC0 | 00C7 | 9FE0 | FFC0 | 00C8 | A020 | FFC0 |
| 0000160160 | 00CA | A060 | FFC0 | 00CB | A0A0 | FFC0 | 00CC | A0D0 |
| 0000160200 | FFC0 | 00CD | A110 | FFC0 | 00CE | A140 | FFC0 | 00D5 |
| 0000160220 | A1B0 | FFC0 | 00D6 | A200 | FFC0 | 00D7 | A230 | FFC0 |
| 0000160240 | 00DB | A260 | FFC0 | 00DC | A290 | FFC0 | 00DD | A2D0 |
| 0000160260 | FFC0 | 00DF | A310 | FFC0 | 00E0 | A340 | FFC0 | 00E1 |
| 0000160300 | A370 | FFC0 | 00E2 | A3A0 | FFC0 | 00E3 | A3F0 | FFC0 |
| 0000160320 | 00E4 | A440 | FFC0 | 00E5 | A490 | FFC0 | 00E6 | A4C0 |
| 0000160340 | FFC0 | 00E7 | A500 | FFC0 | 00E8 | A530 | FFC0 | 00EA |

THU MAR 14 17:37:32 1991 GSPMON.4 PAGE 62, LINE 3600

| | | | | | | | | |
|---|---|---|---|---|---|---|---|---|
| 0000160360 | A570 | FFC0 | 00EB | A5A0 | FFC0 | 00EC | A5E0 | FFC0 |
| 0000160400 | 00ED | A620 | FFC0 | 00EE | A650 | FFC0 | 00EF | A680 |
| 0000160420 | FFC0 | 00F0 | A6B0 | FFC0 | 00F1 | A6F0 | FFC0 | 00F2 |
| 0000160440 | A730 | FFC0 | 00F4 | A770 | FFC0 | 00F6 | A7B0 | FFC0 |
| 0000160460 | 00F7 | A7F0 | FFC0 | 00F8 | A820 | FFC0 | 00F9 | A860 |
| 0000160500 | FFC0 | 00FA | A890 | FFC0 | 0101 | A900 | FFC0 | 0102 |
| 0000160520 | A950 | FFC0 | 0103 | A980 | FFC0 | 0104 | A9B0 | FFC0 |
| 0000160540 | 0105 | A9E0 | FFC0 | 0106 | AA20 | FFC0 | 0108 | AA60 |
| 0000160560 | FFC0 | 0109 | AA90 | FFC0 | 010A | AAC0 | FFC0 | 010B |
| 0000160600 | AAF0 | FFC0 | 010C | AB40 | FFC0 | 010D | AB90 | FFC0 |
| 0000160620 | 010E | ABE0 | FFC0 | 010F | AC10 | FFC0 | 0110 | AC50 |
| 0000160640 | FFC0 | 0111 | AC80 | FFC0 | 0113 | ACC0 | FFC0 | 0114 |
| 0000160660 | ACF0 | FFC0 | 0115 | AD40 | FFC0 | 0116 | AD80 | FFC0 |
| 0000160700 | 0117 | ADC0 | FFC0 | 0118 | AE00 | FFC0 | 0119 | AE30 |
| 0000160720 | FFC0 | 011A | AE70 | FFC0 | 011B | AEB0 | FFC0 | 011C |
| 0000160740 | AEE0 | FFC0 | 011E | AF30 | FFC0 | 011F | AF70 | FFC0 |
| 0000160760 | 0120 | AFA0 | FFC0 | 0121 | AFE0 | FFC0 | 0122 | B010 |
| 0000161000 | FFC0 | 0129 | B080 | FFC0 | 012A | B0D0 | FFC0 | 012B |
| 0000161020 | B100 | FFC0 | 012C | B130 | FFC0 | 012D | B160 | FFC0 |
| 0000161040 | 012E | B1A0 | FFC0 | 0130 | B1E0 | FFC0 | 0131 | B210 |
| 0000161060 | FFC0 | 0132 | B240 | FFC0 | 0133 | B270 | FFC0 | 0134 |
| 0000161100 | B2C0 | FFC0 | 0135 | B310 | FFC0 | 0136 | B360 | FFC0 |
| 0000161120 | 0137 | B390 | FFC0 | 0138 | B3D0 | FFC0 | 0139 | B400 |
| 0000161140 | FFC0 | 013B | B440 | FFC0 | 013C | B470 | FFC0 | 013D |
| 0000161160 | B4C0 | FFC0 | 013E | B500 | FFC0 | 013F | B540 | FFC0 |
| 0000161200 | 0140 | B580 | FFC0 | 0141 | B5B0 | FFC0 | 0142 | B5E0 |
| 0000161220 | FFC0 | 0143 | B620 | FFC0 | 0144 | B660 | FFC0 | 0146 |
| 0000161240 | B6A0 | FFC0 | 0147 | B6E0 | FFC0 | 0148 | B710 | FFC0 |
| 0000161260 | 0149 | B750 | FFC0 | 014A | B780 | FFC0 | 0151 | B7F0 |
| 0000161300 | FFC0 | 0152 | B840 | FFC0 | 0153 | B870 | FFC0 | 0154 |
| 0000161320 | B8A0 | FFC0 | 0155 | B8D0 | FFC0 | 0156 | B910 | FFC0 |
| 0000161340 | 0158 | B950 | FFC0 | 0159 | B980 | FFC0 | 015A | B9B0 |
| 0000161360 | FFC0 | 015B | B9E0 | FFC0 | 015C | BA30 | FFC0 | 015D |
| 0000161400 | BA80 | FFC0 | 015E | BAD0 | FFC0 | 015F | BB00 | FFC0 |
| 0000161420 | 0160 | BB40 | FFC0 | 0161 | BB70 | FFC0 | 0163 | BBB0 |
| 0000161440 | FFC0 | 0164 | BBE0 | FFC0 | 0165 | BC20 | FFC0 | 0166 |
| 0000161460 | BC60 | FFC0 | 0167 | BCA0 | FFC0 | 0168 | BCE0 | FFC0 |
| 0000161500 | 0169 | BD10 | FFC0 | 016A | BD40 | FFC0 | 016B | BD80 |
| 0000161520 | FFC0 | 016C | BDC0 | FFC0 | 016E | BE00 | FFC0 | 016F |
| 0000161540 | BE40 | FFC0 | 0170 | BE70 | FFC0 | 0171 | BEB0 | FFC0 |
| 0000161560 | 0172 | BEE0 | FFC0 | 0179 | BF50 | FFC0 | 017A | BFA0 |
| 0000161600 | FFC0 | 017B | BFD0 | FFC0 | 017C | C000 | FFC0 | 017D |
| 0000161620 | C030 | FFC0 | 017E | C070 | FFC0 | 0180 | C0B0 | FFC0 |
| 0000161640 | 0181 | C0E0 | FFC0 | 0182 | C110 | FFC0 | 0183 | C140 |
| 0000161660 | FFC0 | 0184 | C190 | FFC0 | 0185 | C1E0 | FFC0 | 0186 |
| 0000161700 | C230 | FFC0 | 0187 | C260 | FFC0 | 0188 | C2A0 | FFC0 |
| 0000161720 | 0189 | C2D0 | FFC0 | 018B | C310 | FFC0 | 018C | C340 |
| 0000161740 | FFC0 | 018D | C390 | FFC0 | 018E | C3C0 | FFC0 | 018F |
| 0000161760 | C3F0 | FFC0 | 0190 | C420 | FFC0 | 0191 | C450 | FFC0 |
| 0000162000 | 0192 | C480 | FFC0 | 0193 | C4C0 | FFC0 | 0194 | C500 |
| 0000162020 | FFC0 | 0196 | C540 | FFC0 | 0197 | C580 | FFC0 | 0198 |
| 0000162040 | C5B0 | FFC0 | 0199 | C5F0 | FFC0 | 019A | C620 | FFC0 |
| 0000162060 | 01A1 | C690 | FFC0 | 01A2 | C6E0 | FFC0 | 01A3 | C710 |
| 0000162100 | FFC0 | 01A4 | C740 | FFC0 | 01A5 | C770 | FFC0 | 01A6 |
| 0000162120 | C7B0 | FFC0 | 01A8 | C7F0 | FFC0 | 01A9 | C820 | FFC0 |
| 0000162140 | 01AA | C850 | FFC0 | 01AB | C880 | FFC0 | 01AC | C8D0 |
| 0000162160 | FFC0 | 01AD | C920 | FFC0 | 01AE | C970 | FFC0 | 01AF |
| 0000162200 | C9B0 | FFC0 | 01B0 | C9F0 | FFC0 | 01B1 | CA20 | FFC0 |
| 0000162220 | 01B3 | CA60 | FFC0 | 01B4 | CA90 | FFC0 | 01B5 | CAE0 |

THU MAR 14 17:37:32 1991 GSPMON.4 PAGE 63, LINE 3659

| | | | | | | | | |
|---|---|---|---|---|---|---|---|---|
| 0000162240 | FFC0 | 01B6 | CB10 | FFC0 | 01B7 | CB40 | FFC0 | 01B8 |
| 0000162260 | CB70 | FFC0 | 01B9 | CBB0 | FFC0 | 01BA | CBF0 | FFC0 |
| 0000162300 | 01BB | CC40 | FFC0 | 01BC | CC70 | FFC0 | 01BE | CCB0 |
| 0000162320 | FFC0 | 01BF | CCF0 | FFC0 | 01C0 | CD20 | FFC0 | 01C1 |
| 0000162340 | CD60 | FFC0 | 01C2 | CD90 | FFC0 | 01C9 | CE00 | FFC0 |
| 0000162360 | 01CA | CE50 | FFC0 | 01CB | CE80 | FFC0 | 01CC | CEB0 |
| 0000162400 | FFC0 | 01CD | CEE0 | FFC0 | 01CE | CF20 | FFC0 | 01D0 |
| 0000162420 | CF60 | FFC0 | 01D1 | CF90 | FFC0 | 01D2 | CFC0 | FFC0 |
| 0000162440 | 01D3 | CFF0 | FFC0 | 01D4 | D040 | FFC0 | 01D5 | D090 |
| 0000162460 | FFC0 | 01D6 | D0E0 | FFC0 | 01D7 | D110 | FFC0 | 01D8 |
| 0000162500 | D150 | FFC0 | 01D9 | D180 | FFC0 | 01DB | D1C0 | FFC0 |
| 0000162520 | 01DC | D1F0 | FFC0 | 01DD | D240 | FFC0 | 01DE | D270 |
| 0000162540 | FFC0 | 01DF | D2A0 | FFC0 | 01E0 | D2D0 | FFC0 | 01E1 |
| 0000162560 | D300 | FFC0 | 01E2 | D340 | FFC0 | 01E3 | D390 | FFC0 |
| 0000162600 | 01E4 | D3C0 | FFC0 | 01E6 | D400 | FFC0 | 01E7 | D440 |
| 0000162620 | FFC0 | 01E8 | D470 | FFC0 | 01E9 | D4B0 | FFC0 | 01EA |
| 0000162640 | D4E0 | FFC0 | 01F1 | D550 | FFC0 | 01F2 | D5A0 | FFC0 |
| 0000162660 | 01F3 | D5D0 | FFC0 | 01F4 | D600 | FFC0 | 01F5 | D630 |
| 0000162700 | FFC0 | 01F6 | D670 | FFC0 | 01F8 | D6B0 | FFC0 | 01F9 |
| 0000162720 | D6E0 | FFC0 | 01FA | D710 | FFC0 | 01FB | D740 | FFC0 |
| 0000162740 | 01FC | D790 | FFC0 | 01FD | D7E0 | FFC0 | 01FE | D820 |
| 0000162760 | FFC0 | 01FF | D860 | FFC0 | 0200 | D8A0 | FFC0 | 0201 |
| 0000163000 | D8D0 | FFC0 | 0203 | D910 | FFC0 | 0204 | D940 | FFC0 |
| 0000163020 | 0205 | D990 | FFC0 | 0206 | D9C0 | FFC0 | 0207 | D9F0 |
| 0000163040 | FFC0 | 0208 | DA30 | FFC0 | 0209 | DA70 | FFC0 | 020A |
| 0000163060 | DAA0 | FFC0 | 020B | DAF0 | FFC0 | 020C | DB20 | FFC0 |
| 0000163100 | 020E | DB60 | FFC0 | 020F | DBA0 | FFC0 | 0210 | DBD0 |
| 0000163120 | FFC0 | 0211 | DC10 | FFC0 | 0212 | DC40 | FFC0 | 0219 |
| 0000163140 | DCB0 | FFC0 | 021A | DD00 | FFC0 | 021B | DD30 | FFC0 |
| 0000163160 | 021C | DD60 | FFC0 | 021D | DD90 | FFC0 | 021E | DDD0 |
| 0000163200 | FFC0 | 0220 | DE10 | FFC0 | 0221 | DE40 | FFC0 | 0222 |
| 0000163220 | DE70 | FFC0 | 0223 | DEA0 | FFC0 | 0224 | DEF0 | FFC0 |
| 0000163240 | 0225 | DF40 | FFC0 | 0226 | DF90 | FFC0 | 0227 | DFC0 |
| 0000163260 | FFC0 | 0228 | DFF0 | FFC0 | 0229 | E030 | FFC0 | 022B |
| 0000163300 | E070 | FFC0 | 022C | E0A0 | FFC0 | 022D | E0F0 | FFC0 |
| 0000163320 | 022E | E120 | FFC0 | 022F | E150 | FFC0 | 0230 | E180 |
| 0000163340 | FFC0 | 0231 | E1C0 | FFC0 | 0232 | E200 | FFC0 | 0233 |
| 0000163360 | E240 | FFC0 | 0234 | E280 | FFC0 | 0236 | E2C0 | FFC0 |
| 0000163400 | 0237 | E300 | FFC0 | 0238 | E330 | FFC0 | 0239 | E370 |
| 0000163420 | FFC0 | 023A | E3A0 | FFC0 | 0241 | E410 | FFC0 | 0242 |
| 0000163440 | E460 | FFC0 | 0243 | E490 | FFC0 | 0244 | E4C0 | FFC0 |
| 0000163460 | 0245 | E4F0 | FFC0 | 0246 | E530 | FFC0 | 0248 | E570 |
| 0000163500 | FFC0 | 0249 | E5A0 | FFC0 | 024A | E5D0 | FFC0 | 024B |
| 0000163520 | E600 | FFC0 | 024C | E650 | FFC0 | 024D | E6A0 | FFC0 |
| 0000163540 | 024E | E6F0 | FFC0 | 024F | E720 | FFC0 | 0250 | E750 |
| 0000163560 | FFC0 | 0251 | E790 | FFC0 | 0253 | E7D0 | FFC0 | 0254 |
| 0000163600 | E800 | FFC0 | 0255 | E850 | FFC0 | 0256 | E880 | FFC0 |
| 0000163620 | 0257 | E8B0 | FFC0 | 0258 | E8F0 | FFC0 | 0259 | E930 |
| 0000163640 | FFC0 | 025A | E970 | FFC0 | 025B | E9B0 | FFC0 | 025C |
| 0000163660 | E9E0 | FFC0 | 025E | EA30 | FFC0 | 025F | EA70 | FFC0 |
| 0000163700 | 0260 | EAA0 | FFC0 | 0261 | EAE0 | FFC0 | 0262 | EB10 |
| 0000163720 | FFC0 | 026A | EB80 | FFC0 | 026B | EBD0 | FFC0 | 026C |
| 0000163740 | EC00 | FFC0 | 026D | EC30 | FFC0 | 026E | EC60 | FFC0 |
| 0000163760 | 026F | ECA0 | FFC0 | 0271 | ECE0 | FFC0 | 0272 | ED10 |
| 0000164000 | FFC0 | 0273 | ED40 | FFC0 | 0274 | ED70 | FFC0 | 0275 |
| 0000164020 | EDC0 | FFC0 | 0276 | EE10 | FFC0 | 0277 | EE60 | FFC0 |
| 0000164040 | 0278 | EE90 | FFC0 | 0279 | EEC0 | FFC0 | 027A | EF00 |
| 0000164060 | FFC0 | 027C | EF40 | FFC0 | 027D | EF70 | FFC0 | 027E |
| 0000164100 | EFC0 | FFC0 | 027F | F000 | FFC0 | 0280 | F040 | FFC0 |

THU MAR 14 17:37:32 1991 GSPMON.4 PAGE 64, LINE 3718

| | | | | | | | | |
|---|---|---|---|---|---|---|---|---|
| 0000164120 | 0281 | F080 | FFC0 | 0282 | F0C0 | FFC0 | 0283 | F100 |
| 0000164140 | FFC0 | 0284 | F140 | FFC0 | 0285 | F170 | FFC0 | 0287 |
| 0000164160 | F1C0 | FFC0 | 0288 | F200 | FFC0 | 0289 | F230 | FFC0 |
| 0000164200 | 028A | F270 | FFC0 | 028B | F2A0 | FFC0 | 0293 | F310 |
| 0000164220 | FFC0 | 0294 | F360 | FFC0 | 0295 | F390 | FFC0 | 0296 |
| 0000164240 | F3C0 | FFC0 | 0297 | F3F0 | FFC0 | 0298 | F430 | FFC0 |
| 0000164260 | 029A | F470 | FFC0 | 029B | F4A0 | FFC0 | 029C | F4D0 |
| 0000164300 | FFC0 | 029D | F500 | FFC0 | 029E | F550 | FFC0 | 029F |
| 0000164320 | F5A0 | FFC0 | 02A0 | F5F0 | FFC0 | 02A1 | F620 | FFC0 |
| 0000164340 | 02A2 | F660 | FFC0 | 02A3 | F690 | FFC0 | 02A5 | F6DU |
| 0000164360 | FFC0 | 02A6 | F700 | FFC0 | 02A7 | F750 | FFC0 | 02A8 |
| 0000164400 | F780 | FFC0 | 02A9 | F7C0 | FFC0 | 02AA | F800 | FFC0 |
| 0000164420 | 02AB | F830 | FFC0 | 02AC | F870 | FFC0 | 02AD | F8B0 |
| 0000164440 | FFC0 | 02AE | F8F0 | FFC0 | 02B0 | F930 | FFC0 | 02B1 |
| 0000164460 | F970 | FFC0 | 02B2 | F9A0 | FFC0 | 02B3 | F9E0 | FFC0 |
| 0000164500 | 02B4 | FA10 | FFC0 | 02BC | FA80 | FFC0 | 02BD | FAD0 |
| 0000164520 | FFC0 | 02BE | FB00 | FFC0 | 02BF | FB30 | FFC0 | 02C0 |
| 0000164540 | FB60 | FFC0 | 02C1 | FBA0 | FFC0 | 02C3 | FBE0 | FFC0 |
| 0000164560 | 02C4 | FC10 | FFC0 | 02C5 | FC40 | FFC0 | 02C6 | FC70 |
| 0000164600 | FFC0 | 02C7 | FCC0 | FFC0 | 02C8 | FD10 | FFC0 | 02C9 |
| 0000164620 | FD60 | FFC0 | 02CA | FDA0 | FFC0 | 02CB | FDE0 | FFC0 |
| 0000164640 | 02CC | FE10 | FFC0 | 02CE | FE50 | FFC0 | 02CF | FE80 |
| 0000164660 | FFC0 | 02D0 | FED0 | FFC0 | 02D1 | FF00 | FFC0 | 02D2 |
| 0000164700 | FF40 | FFC0 | 02D3 | FF80 | FFC0 | 02D4 | FFC0 | FFC0 |
| 0000164720 | 02D5 | FFF0 | FFC0 | 02D6 | 0030 | FFC1 | 02D7 | 0070 |
| 0000164740 | FFC1 | 02D9 | 00B0 | FFC1 | 02DA | 00F0 | FFC1 | 02DB |
| 0000164760 | 0120 | FFC1 | 02DC | 0160 | FFC1 | 02DD | 09E2 | 0000 |
| 0000165000 | 0000 | 0550 | FFC1 | 0006 | 0650 | FFC1 | 0007 | 0690 |
| 0000165020 | FFC1 | 0008 | 0730 | FFC1 | 0009 | 07D0 | FFC1 | 000A |
| 0000165040 | 0840 | FFC1 | 000B | 08E0 | FFC1 | 000D | 0920 | FFC1 |
| 0000165060 | 000E | 0960 | FFC1 | 000F | 09F0 | FFC1 | 0012 | 0A30 |
| 0000165100 | FFC1 | 0013 | 0A80 | FFC1 | 0014 | 0AC0 | FFC1 | 0019 |
| 0000165120 | 0AF0 | FFC1 | 001A | 0B30 | FFC1 | 001E | 0BA0 | FFC1 |
| 0000165140 | 001F | 0C00 | FFC1 | 0020 | 0C20 | FFC1 | 0021 | 0C90 |
| 0000165160 | FFC1 | 0023 | 0CC0 | FFC1 | 0024 | 0D50 | FFC1 | 0027 |
| 0000165200 | 0DA0 | FFC1 | 0028 | 0E20 | FFC1 | 0029 | 0EE0 | FFC1 |
| 0000165220 | 002A | 0F80 | FFC1 | 002B | 0FB0 | FFC1 | 002C | 1050 |
| 0000165240 | FFC1 | 002D | 1100 | FFC1 | 002E | 1180 | FFC1 | 002F |
| 0000165260 | 1250 | FFC1 | 0030 | 12F0 | FFC1 | 0031 | 1370 | FFC1 |
| 0000165300 | 0032 | 1410 | FFC1 | 0033 | 1450 | FFC1 | 0034 | 14D0 |
| 0000165320 | FFC1 | 0035 | 1560 | FFC1 | 0036 | 1600 | FFC1 | 0037 |
| 0000165340 | 1610 | FFC1 | 0038 | 16B0 | FFC1 | 0024 | 17F0 | FFC1 |
| 0000165360 | 003B | 1860 | FFC1 | 0021 | 18F0 | FFC1 | 003D | 1930 |
| 0000165400 | FFC1 | 003E | 19A0 | FFC1 | 003D | 1A20 | FFC1 | 0042 |
| 0000165420 | 1A80 | FFC1 | 0043 | 09F8 | 0000 | 0000 | 1B50 | FFC1 |
| 0000165440 | 000A | 1B70 | FFC1 | 000F | 1C20 | FFC1 | 0010 | 1C70 |
| 0000165460 | FFC1 | 0011 | 1CC0 | FFC1 | 0012 | 1D10 | FFC1 | 0013 |
| 0000165500 | 1D50 | FFC1 | 0014 | 1D90 | FFC1 | 0015 | 1DC0 | FFC1 |
| 0000165520 | 0016 | 1E20 | FFC1 | 0017 | 1E40 | FFC1 | 001C | 1E90 |
| 0000165540 | FFC1 | 001D | 1EF0 | FFC1 | 001E | 1F00 | FFC1 | 001F |
| 0000165560 | 1F60 | FFC1 | 0021 | 1FF0 | FFC1 | 0022 | 2030 | FFC1 |
| 0000165600 | 0023 | 2040 | FFC1 | 0024 | 20B0 | FFC1 | 0026 | 2100 |
| 0000165620 | FFC1 | 0027 | 2120 | FFC1 | 002B | 2170 | FFC1 | 002C |
| 0000165640 | 21D0 | FFC1 | 002D | 21E0 | FFC1 | 002E | 2240 | FFC1 |
| 0000165660 | 002F | 22D0 | FFC1 | 0030 | 2310 | FFC1 | 0031 | 2330 |
| 0000165700 | FFC1 | 0032 | 23A0 | FFC1 | 0034 | 23C0 | FFC1 | 0037 |
| 0000165720 | 24C0 | FFC1 | 003E | 2520 | FFC1 | 0040 | 2570 | FFC1 |
| 0000165740 | 0041 | 25D0 | FFC1 | 0042 | 2620 | FFC1 | 0043 | 2670 |
| 0000165760 | FFC1 | 0044 | 26A0 | FFC1 | 0046 | 26C0 | FFC1 | 0049 |

THU MAR 14 17:37:32 1991 GSPMON.4 PAGE 65, LINE 3777

| | | | | | | | | | |
|---|---|---|---|---|---|---|---|---|---|
| 0000166000 | 2710 | FFC1 | 004B | 27C0 | FFC1 | 004D | 2800 | FFC1 |
| 0000166020 | 004E | 2830 | FFC1 | 004F | 2870 | FFC1 | 0050 | 28A0 |
| 0000166040 | FFC1 | 0053 | 28C0 | FFC1 | 0055 | 2AC0 | FFC1 | 0056 |
| 0000166060 | 2B00 | FFC1 | 0058 | 2B60 | FFC1 | 0059 | 2BA0 | FFC1 |
| 0000166100 | 005C | 2BC0 | FFC1 | 005F | 2C10 | FFC1 | 0064 | 2C60 |
| 0000166120 | FFC1 | 0066 | 2CB0 | FFC1 | 0067 | 2CF0 | FFC1 | 0069 |
| 0000166140 | 2D00 | FFC1 | 006B | 2D50 | FFC1 | 006C | 2D90 | FFC1 |
| 0000166160 | 006F | 2DD0 | FFC1 | 0070 | 2E20 | FFC1 | 0071 | 2E40 |
| 0000166200 | FFC1 | 0073 | 2F20 | FFC1 | 0078 | 2F80 | FFC1 | 007A |
| 0000166220 | 2FD0 | FFC1 | 007C | 3030 | FFC1 | 007F | 3040 | FFC1 |
| 0000166240 | 0081 | 30C0 | FFC1 | 0082 | 3140 | FFC1 | 0085 | 3190 |
| 0000166260 | FFC1 | 0086 | 31E0 | FFC1 | 0087 | 3220 | FFC1 | 0088 |
| 0000166300 | 3260 | FFC1 | 008B | 3280 | FFC1 | 008F | 3300 | FFC1 |
| 0000166320 | 0091 | 3500 | FFC1 | 0094 | 3540 | FFC1 | 0095 | 3560 |
| 0000166340 | FFC1 | 0034 | 3640 | FFC1 | 0097 | 3640 | FFC1 | 009B |
| 0000166360 | 3690 | FFC1 | 009C | 36F0 | FFC1 | 009D | 3700 | FFC1 |
| 0000166400 | 009E | 3760 | FFC1 | 009F | 37F0 | FFC1 | 00A0 | 3830 |
| 0000166420 | FFC1 | 00A1 | 3840 | FFC1 | 00A2 | 38B0 | FFC1 | 00A5 |
| 0000166440 | 3A00 | FFC1 | 00AA | 3A60 | FFC1 | 00AC | 3AB0 | FFC1 |
| 0000166460 | 00AE | 3B10 | FFC1 | 00B1 | 3B20 | FFC1 | 00B3 | 3BA0 |
| 0000166500 | FFC1 | 00B4 | 3C20 | FFC1 | 00B7 | 3C70 | FFC1 | 00B8 |
| 0000166520 | 3CC0 | FFC1 | 00B9 | 3D10 | FFC1 | 00BA | 3D50 | FFC1 |
| 0000166540 | 00BD | 3D60 | FFC1 | 00C1 | 3DA0 | FFC1 | 00C2 | 3DBC |
| 0000166560 | FFC1 | 00C5 | 3DF0 | FFC1 | 00C6 | 3E00 | FFC1 | 000A |
| 0000166600 | 0A08 | 0000 | 0000 | 3F90 | FFC1 | 0005 | 3FB0 | FFC1 |
| 0000166620 | 0007 | 4000 | FFC1 | 0008 | 4070 | FFC1 | 000A | 40B0 |
| 0000166640 | FFC1 | 000B | 4170 | FFC1 | 000C | 41B0 | FFC1 | 000E |
| 0000166660 | 41E0 | FFC1 | 000F | 4210 | FFC1 | 0010 | 4240 | FFC1 |
| 0000166700 | 0012 | 4370 | FFC1 | 0015 | 4460 | FFC1 | 0018 | 44B0 |
| 0000166720 | FFC1 | 0019 | 44E0 | FFC1 | 001C | 45E0 | FFC1 | 001F |
| 0000166740 | 4620 | FFC1 | 0020 | 46B0 | FFC1 | 0022 | 46C0 | FFC1 |
| 0000166760 | 0023 | 4760 | FFC1 | 0025 | 47A0 | FFC1 | 0026 | 47E0 |
| 0000167000 | FFC1 | 0027 | 47F0 | FFC1 | 0029 | 4840 | FFC1 | 002B |
| 0000167020 | 48D0 | FFC1 | 003C | 4910 | FFC1 | 003F | 4AF0 | FFC1 |
| 0000167040 | 0040 | 4B30 | FFC1 | 0041 | 4B70 | FFC1 | 0042 | 4BC0 |
| 0000167060 | FFC1 | 0043 | 4C40 | FFC1 | 0044 | 4CB0 | FFC1 | 0043 |
| 0000167100 | 4D30 | FFC1 | 0045 | 4D40 | FFC1 | 004D | 4D90 | FFC1 |
| 0000167120 | 004F | 4DC0 | FFC1 | 0050 | 4DF0 | FFC1 | 0051 | 4F00 |
| 0000167140 | FFC1 | 0052 | 4F60 | FFC1 | 0055 | 5130 | FFC1 | 0056 |
| 0000167160 | 5180 | FFC1 | 0057 | 51E0 | FFC1 | 0058 | 5220 | FFC1 |
| 0000167200 | 0059 | 5260 | FFC1 | 005A | 5270 | FFC1 | 005D | 52B0 |
| 0000167220 | FFC1 | 005E | 52C0 | FFC1 | 0060 | 52C0 | FFC1 | 0005 |
| 0000167240 | 5360 | FFC1 | 0062 | 0A10 | 0000 | 0000 | 5440 | FFC1 |
| 0000167260 | 0004 | 5470 | FFC1 | 0005 | 54E0 | FFC1 | 0008 | 5550 |
| 0000167300 | FFC1 | 0009 | 55E0 | FFC1 | 0008 | 5670 | FFC1 | 000A |
| 0000167320 | 56B0 | FFC1 | 000B | 56E0 | FFC1 | 000E | 5770 | FFC1 |
| 0000167340 | 0010 | 0A1C | 0000 | 0000 | 5820 | FFC1 | 000D | 5910 |
| 0000167360 | FFC1 | 0011 | 5A70 | FFC1 | 0015 | 5B50 | FFC1 | 0016 |
| 0000167400 | 5BC0 | FFC1 | 0018 | 5C10 | FFC1 | 0019 | 5C60 | FFC1 |
| 0000167420 | 001A | 5C80 | FFC1 | 001B | 5CF0 | FFC1 | 001C | 5D20 |
| 0000167440 | FFC1 | 001E | 5DE0 | FFC1 | 001F | 5E60 | FFC1 | 0020 |
| 0000167460 | 5F20 | FFC1 | 0021 | 5FA0 | FFC1 | 001C | 6010 | FFC1 |
| 0000167500 | 0023 | 6150 | FFC1 | 0026 | 6160 | FFC1 | 0028 | 6190 |
| 0000167520 | FFC1 | 0029 | 61E0 | FFC1 | 002A | 6240 | FFC1 | 002B |
| 0000167540 | 6290 | FFC1 | 002C | 0A36 | 0000 | 0000 | 63A0 | FFC1 |
| 0000167560 | 000C | 63E0 | FFC1 | 000E | 6440 | FFC1 | 000F | 64A0 |
| 0000167600 | FFC1 | 0010 | 64D0 | FFC1 | 0011 | 65C0 | FFC1 | 0014 |
| 0000167620 | 65F0 | FFC1 | 0015 | 66B0 | FFC1 | 0016 | 6730 | FFC1 |
| 0000167640 | 0014 | 67A0 | FFC1 | 0018 | 68A0 | FFC1 | 0019 | 6900 |

THU MAR 14 17:37:32 1991 GSPMON.4 PAGE 66, LINE 3836

| | | | | | | | | |
|---|---|---|---|---|---|---|---|---|
| 0000167660 | FFC1 | 001A | 6A20 | FFC1 | 001B | 6A30 | FFC1 | 001C |
| 0000167700 | 6AB0 | FFC1 | 001D | 0A4E | 0000 | 0000 | 6C6D | FFC1 |
| 0000167720 | 0006 | 6CE0 | FFC1 | 0007 | 6D90 | FFC1 | 0006 | 0A58 |
| 0000167740 | 0000 | 0000 | 6EB0 | FFC1 | 0006 | 7090 | FFC1 | 000B |
| 0000167760 | 7160 | FFC1 | 000C | 7220 | FFC1 | 001A | 7240 | FFC1 |
| 0000170000 | 001C | 72A0 | FFC1 | 001E | 72F0 | FFC1 | 001F | 7320 |
| 0000170020 | FFC1 | 0020 | 7350 | FFC1 | 0022 | 73C0 | FFC1 | 0023 |
| 0000170040 | 7430 | FFC1 | 0026 | 7530 | FFC1 | 0027 | 7560 | FFC1 |
| 0000170060 | 0028 | 7650 | FFC1 | 0029 | 7650 | FFC1 | 002A | 76B0 |
| 0000170100 | FFC1 | 002B | 7700 | FFC1 | 002C | 7750 | FFC1 | 0027 |
| 0000170120 | 77D0 | FFC1 | 002E | 7800 | FFC1 | 002F | 7810 | FFC1 |
| 0000170140 | 0030 | 7840 | FFC1 | 0034 | 7870 | FFC1 | 0035 | 7900 |
| 0000170160 | FFC1 | 0037 | 7A30 | FFC1 | 0038 | 7AB0 | FFC1 | 0039 |
| 0000170200 | 7BA0 | FFC1 | 003A | 7BA0 | FFC1 | 003B | 7C00 | FFC1 |
| 0000170220 | 003C | 7C50 | FFC1 | 0038 | 7D00 | FFC1 | 003E | 7D30 |
| 0000170240 | FFC1 | 003F | 7D40 | FFC1 | 0040 | 7D70 | FFC1 | 0044 |
| 0000170260 | 7DF0 | FFC1 | 0045 | 7E20 | FFC1 | 0046 | 7E70 | FFC1 |
| 0000170300 | 0049 | 7EC0 | FFC1 | 004A | 7F30 | FFC1 | 004B | 7F60 |
| 0000170320 | FFC1 | 004C | 8010 | FFC1 | 004D | 8120 | FFC1 | 004E |
| 0000170340 | 81A0 | FFC1 | 004C | 8240 | FFC1 | 0050 | 82C0 | FFC1 |
| 0000170360 | 0051 | 82F0 | FFC1 | 0052 | 8450 | FFC1 | 0049 | 84C0 |
| 0000170400 | FFC1 | 0055 | 8680 | FFC1 | 0057 | 86B0 | FFC1 | 0058 |
| 0000170420 | 86C0 | FFC1 | 0059 | 87A0 | FFC1 | 005B | 8980 | FFC1 |
| 0000170440 | 005D | 89B0 | FFC1 | 005E | 89C0 | FFC1 | 005F | 8B00 |
| 0000170460 | FFC1 | 0060 | 8BE0 | FFC1 | 0061 | 8BF0 | FFC1 | 0062 |
| 0000170500 | 8C20 | FFC1 | 0066 | 8D40 | FFC1 | 0068 | 8E20 | FFC1 |
| 0000170520 | 0069 | 8EF0 | FFC1 | 006A | 8FC0 | FFC1 | 006B | 9090 |
| 0000170540 | FFC1 | 006D | 90B0 | FFC1 | 006F | 9330 | FFC1 | 0071 |
| 0000170560 | 9610 | FFC1 | 0073 | 98F0 | FFC1 | 0075 | 0A8C | 0000 |
| 0000170600 | 0000 | 9C60 | FFC1 | 0004 | 9CC0 | FFC1 | 0007 | 9D30 |
| 0000170620 | FFC1 | 0008 | 9E40 | FFC1 | 0007 | 0A96 | 0000 | 0000 |
| 0000170640 | 9F50 | FFC1 | 000C | 9FD0 | FFC1 | 000D | A0F0 | FFC1 |
| 0000170660 | 000C | A170 | FFC1 | 000E | A1C0 | FFC1 | 000F | A200 |
| 0000170700 | FFC1 | 0010 | A2E0 | FFC1 | 000F | A360 | FFC1 | 0012 |
| 0000170720 | A3B0 | FFC1 | 0013 | A3F0 | FFC1 | 0014 | A510 | FFC1 |
| 0000170740 | 0013 | A590 | FFC1 | 0015 | A5E0 | FFC1 | 0016 | A620 |
| 0000170760 | FFC1 | 0017 | A700 | FFC1 | 0016 | A780 | FFC1 | 001A |
| 0000171000 | A7D0 | FFC1 | 001B | A810 | FFC1 | 001C | A920 | FFC1 |
| 0000171020 | 001B | A9A0 | FFC1 | 001D | A9B0 | FFC1 | 001E | A9F0 |
| 0000171040 | FFC1 | 001F | AAA0 | FFC1 | 001E | AB20 | FFC1 | 0021 |
| 0000171060 | ABC0 | FFC1 | 0023 | AC50 | FFC1 | 0025 | ACD0 | FFC1 |
| 0000171100 | 0027 | AD10 | FFC1 | 0028 | AD60 | FFC1 | 0029 | AD90 |
| 0000171120 | FFC1 | 0025 | AE40 | FFC1 | 0021 | AEC0 | FFC1 | 002D |
| 0000171140 | AEF0 | FFC1 | 002E | AF30 | FFC1 | 002F | AF50 | FFC1 |
| 0000171160 | 0031 | AF90 | FFC1 | 0032 | AFD0 | FFC1 | 0035 | B010 |
| 0000171200 | FFC1 | 0037 | B100 | FFC1 | 0039 | B180 | FFC1 | 003B |
| 0000171220 | B1C0 | FFC1 | 003C | B210 | FFC1 | 003D | B240 | FFC1 |
| 0000171240 | 0039 | B2F0 | FFC1 | 0035 | B370 | FFC1 | 0041 | B410 |
| 0000171260 | FFC1 | 0045 | 0AAC | 0000 | 0000 | B4C0 | FFC1 | 000D |
| 0000171300 | B550 | FFC1 | 000E | B5B0 | FFC1 | 0011 | B640 | FFC1 |
| 0000171320 | 0012 | B6C0 | FFC1 | 0013 | B700 | FFC1 | 0015 | B730 |
| 0000171340 | FFC1 | 0016 | B850 | FFC1 | 0019 | B8A0 | FFC1 | 001B |
| 0000171360 | B8E0 | FFC1 | 001D | B940 | FFC1 | 001E | B9A0 | FFC1 |
| 0000171400 | 001F | BC00 | FFC1 | 0020 | BCD0 | FFC1 | 0021 | BDA0 |
| 0000171420 | FFC1 | 0022 | BE10 | FFC1 | 0023 | BE20 | FFC1 | 0025 |
| 0000171440 | BE80 | FFC1 | 0026 | BEE0 | FFC1 | 0027 | C140 | FFC1 |
| 0000171460 | 0028 | C210 | FFC1 | 0029 | C2E0 | FFC1 | 002A | C350 |
| 0000171500 | FFC1 | 002D | C3A0 | FFC1 | 002E | C3F0 | FFC1 | 0017 |
| 0000171520 | C450 | FFC1 | 0016 | C560 | FFC1 | 000F | C590 | FFC1 |

THU MAR 14 17:37:32 1991 GSPMON.4 PAGE 67, LINE 3895

| | | | | | | | | | |
|---|---|---|---|---|---|---|---|---|---|
| 0000171540 | 000E | C6B0 | FFC1 | 0032 | C6F0 | FFC1 | 0034 | C7E0 |
| 0000171560 | FFC1 | 0038 | C860 | FFC1 | 003C | C960 | FFC1 | 003D |
| 0000171600 | CA60 | FFC1 | 003E | CC80 | FFC1 | 0038 | CD00 | FFC1 |
| 0000171620 | 0042 | CD40 | FFC1 | 0044 | CE30 | FFC1 | 0049 | CEB0 |
| 0000171640 | FFC1 | 004D | CFF0 | FFC1 | 004E | D130 | FFC1 | 004F |
| 0000171660 | D390 | FFC1 | 0049 | D410 | FFC1 | 0054 | D4F0 | FFC1 |
| 0000171700 | 0055 | D520 | FFC1 | 0056 | D550 | FFC1 | 0059 | D5A0 |
| 0000171720 | FFC1 | 005A | D5E0 | FFC1 | 005C | 0ACC | 0000 | 0000 |
| 0000171740 | D670 | FFC1 | 0006 | D700 | FFC1 | 0007 | D720 | FFC1 |
| 0000171760 | 0008 | D7A0 | FFC1 | 0009 | D7D0 | FFC1 | 000B | 0AD6 |
| 0000172000 | 0000 | 0000 | D860 | FFC1 | 0007 | D890 | FFC1 | 0008 |
| 0000172020 | D900 | FFC1 | 000A | D940 | FFC1 | 000B | D990 | FFC1 |
| 0000172040 | 000C | 0AE0 | 0000 | 0000 | DA40 | FFC1 | 0007 | DA80 |
| 0000172060 | FFC1 | 0009 | DB90 | FFC1 | 000B | DC90 | FFC1 | 000D |
| 0000172100 | DD90 | FFC1 | 000F | DE90 | FFC1 | 0019 | DFB0 | FFC1 |
| 0000172120 | 001A | E100 | FFC1 | 001C | E230 | FFC1 | 001D | E380 |
| 0000172140 | FFC1 | 0021 | E3D0 | FFC1 | 0022 | E420 | FFC1 | 0023 |
| 0000172160 | E470 | FFC1 | 0024 | E4C0 | FFC1 | 0027 | E4E0 | FFC1 |
| 0000172200 | 0029 | E540 | FFC1 | 002A | E5A0 | FFC1 | 002B | E620 |
| 0000172220 | FFC1 | 0030 | E680 | FFC1 | 0031 | E6F0 | FFC1 | 0030 |
| 0000172240 | E760 | FFC1 | 0032 | E7E0 | FFC1 | 0033 | E860 | FFC1 |
| 0000172260 | 0032 | E8D0 | FFC1 | 0034 | E930 | FFC1 | 0036 | E9A0 |
| 0000172300 | FFC1 | 0037 | EA10 | FFC1 | 0036 | 0AF4 | 0000 | 0000 |
| 0000172320 | EAE0 | FFC1 | 0004 | EB40 | FFC1 | 0005 | EB90 | FFC1 |
| 0000172340 | 0006 | EBE0 | FFC1 | 0007 | DAFC | 0000 | 0000 | EC80 |
| 0000172360 | FFC1 | 0008 | ED20 | FFC1 | 000A | ED80 | FFC1 | 000C |
| 0000172400 | EFC0 | FFC1 | 0013 | F030 | FFC1 | 0014 | 0B08 | 0000 |
| 0000172420 | 0000 | F0E0 | FFC1 | 000B | F190 | FFC1 | 000D | F1F0 |
| 0000172440 | FFC1 | 0010 | F290 | FFC1 | 0011 | F2F0 | FFC1 | 0012 |
| 0000172460 | F350 | FFC1 | 0013 | F3A0 | FFC1 | 0014 | F4C0 | FFC1 |
| 0000172500 | 0019 | F6B0 | FFC1 | 0022 | F880 | FFC1 | 0029 | F8C0 |
| 0000172520 | FFC1 | 002A | F8F0 | FFC1 | 004D | F950 | FFC1 | 004F |
| 0000172540 | F9C0 | FFC1 | 0058 | FB70 | FFC1 | 0061 | FD60 | FFC1 |
| 0000172560 | 0069 | FDE0 | FFC1 | 006A | 0B1C | 0000 | 0000 | FE70 |
| 0000172600 | FFC1 | 0006 | FEB0 | FFC1 | 0008 | FFF0 | FFC1 | 000A |
| 0000172620 | 0010 | FFC2 | 000B | 0040 | FFC2 | 000E | 00A0 | FFC2 |
| 0000172640 | 000F | 0B26 | 0000 | 0000 | 0130 | FFC2 | 0006 | 0170 |
| 0000172660 | FFC2 | 0008 | 01C0 | FFC2 | 0009 | 0200 | FFC2 | 000C |
| 0000172700 | 0B30 | 0000 | 0000 | 0290 | FFC2 | 0006 | 0B38 | 0000 |
| 0000172720 | 0000 | 0380 | FFC2 | 0010 | 03C0 | FFC2 | 0011 | 03E0 |
| 0000172740 | FFC2 | 0013 | 0430 | FFC2 | 0014 | 0470 | FFC2 | 0016 |
| 0000172760 | 04A0 | FFC2 | 0017 | 04F0 | FFC2 | 0018 | 0520 | FFC2 |
| 0000173000 | 0019 | 05F0 | FFC2 | 001B | 0650 | FFC2 | 001C | 0720 |
| 0000173020 | FFC2 | 001D | 0770 | FFC2 | 001E | 07C0 | FFC2 | 001F |
| 0000173040 | 0860 | FFC2 | 001E | 08B0 | FFC2 | 001D | 08E0 | FFC2 |
| 0000173060 | 0018 | 0910 | FFC2 | 0016 | 0D6C | 0000 | 0000 | 09E0 |
| 0000173100 | FFC2 | 0009 | 0A20 | FFC2 | 000B | 0AC0 | FFC2 | 000D |
| 0000173120 | 0AF0 | FFC2 | 000F | 0B30 | FFC2 | 0011 | 0B40 | FFC2 |
| 0000173140 | 0012 | 0B90 | FFC2 | 0013 | 0BF0 | FFC2 | 0014 | 0C20 |
| 0000173160 | FFC2 | 0011 | 0C40 | FFC2 | 0017 | 0D20 | FFC2 | 0019 |
| 0000173200 | 0D7E | 0000 | 0000 | 0DC0 | FFC2 | 0005 | 0DF0 | FFC2 |
| 0000173220 | 0007 | 0E20 | FFC2 | 0008 | 0E50 | FFC2 | 0009 | 0EA0 |
| 0000173240 | FFC2 | 0007 | 0ED0 | FFC2 | 000B | 0D88 | 0000 | 0000 |
| 0000173260 | 0F80 | FFC2 | 0008 | 1020 | FFC2 | 0009 | 1040 | FFC2 |
| 0000173300 | 000B | 1070 | FFC2 | 000C | 10D0 | FFC2 | 000D | 1100 |
| 0000173320 | FFC2 | 000E | 1150 | FFC2 | 000C | 11C0 | FFC2 | 0011 |
| 0000173340 | 1210 | FFC2 | 0012 | 1260 | FFC2 | 0013 | 0D98 | 0000 |
| 0000173360 | 0000 | 1310 | FFC2 | 0008 | 1340 | FFC2 | 0009 | 1380 |
| 0000173400 | FFC2 | 000A | 13C0 | FFC2 | 0009 | 1400 | FFC2 | 000C |

THU MAR 14 17:37:32 1991 GSPMON.4 PAGE 68, LINE 3954

| | | | | | | | | |
|---|---|---|---|---|---|---|---|---|
| 0000173420 | 1440 | FFC2 | 000D | 0DA4 | 0000 | 0000 | 1500 | FFC2 |
| 0000173440 | 0007 | 1570 | FFC2 | 0008 | 1590 | FFC2 | 000B | 15E0 |
| 0000173460 | FFC2 | 000D | 1610 | FFC2 | 000E | 1660 | FFC2 | 0012 |
| 0000173500 | 1690 | FFC2 | 0013 | 16B0 | FFC2 | 0014 | 16D0 | FFC2 |
| 0000173520 | 0016 | 0DAC | 0000 | 0000 | 1770 | FFC2 | 0006 | 17B0 |
| 0000173540 | FFC2 | 0007 | 17D0 | FFC2 | 0008 | 1830 | FFC2 | 0009 |
| 0000173560 | 1850 | FFC2 | 000A | 1890 | FFC2 | 0007 | 18B0 | FFC2 |
| 0000173600 | 000C | 0DB6 | 0000 | 0000 | 1940 | FFC2 | 0005 | 19A0 |
| 0000173620 | FFC2 | 0006 | 19F0 | FFC2 | 0008 | 1A60 | FFC2 | 0009 |
| 0000173640 | 1AC0 | FFC2 | 000B | 1AD0 | FFC2 | 000C | 0DBE | 0000 |
| 0000173660 | 0000 | 1BD0 | FFC2 | 000C | 1C20 | FFC2 | 000D | 1C40 |
| 0000173700 | FFC2 | 000E | 1CA0 | FFC2 | 000F | 1CF0 | FFC2 | 0010 |
| 0000173720 | 1D10 | FFC2 | 0011 | 1DC0 | FFC2 | 0012 | 1E70 | FFC2 |
| 0000173740 | 0013 | 1FF0 | FFC2 | 0016 | 1FF0 | FFC2 | 0017 | 20D0 |
| 0000173760 | FFC2 | 001A | 2170 | FFC2 | 001C | 21F0 | FFC2 | 001E |
| 0000174000 | 2210 | FFC2 | 001F | 22A0 | FFC2 | 0020 | 2370 | FFC2 |
| 0000174020 | 0023 | 2400 | FFC2 | 0025 | 2420 | FFC2 | 0010 | 24C0 |
| 0000174040 | FFC2 | 0029 | 2510 | FFC2 | 000D | 2550 | FFC2 | 002B |
| 0000174060 | 0DD2 | 0000 | 0000 | 2620 | FFC2 | 001D | 26D0 | FFC2 |
| 0000174100 | 001E | 2720 | FFC2 | 001F | 27B0 | FFC2 | 0023 | 27F0 |
| 0000174120 | FFC2 | 0025 | 2870 | FFC2 | 0026 | 28A0 | FFC2 | 0027 |
| 0000174140 | 28D0 | FFC2 | 0028 | 28E0 | FFC2 | 0029 | 2910 | FFC2 |
| 0000174160 | 002B | 2920 | FFC2 | 002C | 29B0 | FFC2 | 002E | 2A80 |
| 0000174200 | FFC2 | 002F | 2B20 | FFC2 | 0033 | 2BE0 | FFC2 | 0034 |
| 0000174220 | 2CB0 | FFC2 | 0035 | 2DC0 | FFC2 | 0036 | 2E90 | FFC2 |
| 0000174240 | 0038 | 30B0 | FFC2 | 003D | 30D0 | FFC2 | 0042 | 3110 |
| 0000174260 | FFC2 | 0043 | 3170 | FFC2 | 0045 | 3190 | FFC2 | 0046 |
| 0000174300 | 31D0 | FFC2 | 0047 | 31E0 | FFC2 | 0048 | 3230 | FFC2 |
| 0000174320 | 0049 | 32D0 | FFC2 | 004B | 3350 | FFC2 | 004D | 33E0 |
| 0000174340 | FFC2 | 0051 | 3460 | FFC2 | 0053 | 34D0 | FFC2 | 0054 |
| 0000174360 | 3540 | FFC2 | 0056 | 35B0 | FFC2 | 0059 | 35E0 | FFC2 |
| 0000174400 | 005B | 35F0 | FFC2 | 0048 | 3620 | FFC2 | 005D | 3660 |
| 0000174420 | FFC2 | 0046 | 3690 | FFC2 | 005F | 36E0 | FFC2 | 0042 |
| 0000174440 | 3710 | FFC2 | 0062 | 3730 | FFC2 | 0067 | 3770 | FFC2 |
| 0000174460 | 0068 | 37D0 | FFC2 | 006A | 3840 | FFC2 | 006D | 3860 |
| 0000174500 | FFC2 | 0070 | 38D0 | FFC2 | 0071 | 3900 | FFC2 | 0072 |
| 0000174520 | 3940 | FFC2 | 0073 | 3990 | FFC2 | 0075 | 39C0 | FFC2 |
| 0000174540 | 0076 | 3AB0 | FFC2 | 0079 | 3AF0 | FFC2 | 007B | 3B00 |
| 0000174560 | FFC2 | 007C | 3B40 | FFC2 | 007E | 3B50 | FFC2 | 007F |
| 0000174600 | 3B90 | FFC2 | 0080 | 3C50 | FFC2 | 0082 | 3CD0 | FFC2 |
| 0000174620 | 0084 | 3D60 | FFC2 | 0088 | 3DE0 | FFC2 | 008A | 3E50 |
| 0000174640 | FFC2 | 008B | 3EC0 | FFC2 | 008D | 3F30 | FFC2 | 0091 |
| 0000174660 | 3F60 | FFC2 | 0093 | 3FA0 | FFC2 | 007F | 3FD0 | FFC2 |
| 0000174700 | 0095 | 3FE0 | FFC2 | 0072 | 4010 | FFC2 | 0097 | 4060 |
| 0000174720 | FFC2 | 0067 | 40A0 | FFC2 | 009A | 40C0 | FFC2 | 009F |
| 0000174740 | 4100 | FFC2 | 00A0 | 4160 | FFC2 | 00A2 | 41D0 | FFC2 |
| 0000174760 | 00A5 | 41F0 | FFC2 | 00A8 | 4260 | FFC2 | 00A9 | 42C0 |
| 0000175000 | FFC2 | 00AA | 4330 | FFC2 | 00AD | 4370 | FFC2 | 00AE |
| 0000175020 | 43C0 | FFC2 | 00AF | 4400 | FFC2 | 00B0 | 4410 | FFC2 |
| 0000175040 | 00B2 | 4440 | FFC2 | 00B3 | 4530 | FFC2 | 00B6 | 4570 |
| 0000175060 | FFC2 | 00B8 | 4580 | FFC2 | 00B9 | 45C0 | FFC2 | 00BA |
| 0000175100 | 4680 | FFC2 | 00BC | 4700 | FFC2 | 00BE | 4790 | FFC2 |
| 0000175120 | 00C2 | 4810 | FFC2 | 00C4 | 4880 | FFC2 | 00C5 | 48F0 |
| 0000175140 | FFC2 | 00C7 | 4960 | FFC2 | 00CB | 4990 | FFC2 | 00CD |
| 0000175160 | 49D0 | FFC2 | 00B9 | 4A00 | FFC2 | 00CF | 4A10 | FFC2 |
| 0000175200 | 00AD | 4A40 | FFC2 | 00D1 | 4A90 | FFC2 | 009F | 4AD0 |
| 0000175220 | FFC2 | 00D4 | 4AF0 | FFC2 | 00D9 | 4B30 | FFC2 | 00DA |
| 0000175240 | 4B90 | FFC2 | 00DC | 4C00 | FFC2 | 00DF | 4C20 | FFC2 |
| 0000175260 | 00E2 | 4C90 | FFC2 | 00E3 | 4CC0 | FFC2 | 00E4 | 4CF0 |

THU MAR 14 17:37:32 1991 GSPMON.4 PAGE 69, LINE 4013

| | | | | | | | | |
|---|---|---|---|---|---|---|---|---|
| 0000175300 | FFC2 | 00E5 | 4D40 | FFC2 | 00E7 | 4D70 | FFC2 | 00E8 |
| 0000175320 | 4E60 | FFC2 | 00EB | 4EA0 | FFC2 | 00EC | 4EB0 | FFC2 |
| 0000175340 | 00ED | 4EF0 | FFC2 | 00EF | 4F00 | FFC2 | 00F0 | 4F50 |
| 0000175360 | FFC2 | 00F1 | 5010 | FFC2 | 00F3 | 5090 | FFC2 | 00F5 |
| 0000175400 | 5120 | FFC2 | 00F9 | 51A0 | FFC2 | 00FB | 5210 | FFC2 |
| 0000175420 | 00FC | 5280 | FFC2 | 00FE | 52F0 | FFC2 | 0102 | 5320 |
| 0000175440 | FFC2 | 0104 | 5330 | FFC2 | 00F0 | 5360 | FFC2 | 0106 |
| 0000175460 | 53A0 | FFC2 | 00E4 | 53D0 | FFC2 | 0108 | 5420 | FFC2 |
| 0000175500 | 00D9 | 5460 | FFC2 | 010B | 5480 | FFC2 | 0110 | 54C0 |
| 0000175520 | FFC2 | 0111 | 5520 | FFC2 | 0113 | 5590 | FFC2 | 0116 |
| 0000175540 | 55B0 | FFC2 | 0119 | 5620 | FFC2 | 011A | 5680 | FFC2 |
| 0000175560 | 011B | 56F0 | FFC2 | 011D | 5720 | FFC2 | 011E | 5770 |
| 0000175600 | FFC2 | 011F | 57B0 | FFC2 | 0120 | 57C0 | FFC2 | 0122 |
| 0000175620 | 57F0 | FFC2 | 0123 | 58E0 | FFC2 | 0126 | 5920 | FFC2 |
| 0000175640 | 0128 | 5930 | FFC2 | 0129 | 5980 | FFC2 | 012A | 5A40 |
| 0000175660 | FFC2 | 012C | 5AC0 | FFC2 | 012E | 5B50 | FFC2 | 0132 |
| 0000175700 | 5BD0 | FFC2 | 0134 | 5C40 | FFC2 | 0135 | 5CB0 | FFC2 |
| 0000175720 | 0137 | 5D20 | FFC2 | 013B | 5D50 | FFC2 | 013D | 5D60 |
| 0000175740 | FFC2 | 0129 | 5D90 | FFC2 | 013F | 5DD0 | FFC2 | 011D |
| 0000175760 | 5E00 | FFC2 | 0141 | 5E50 | FFC2 | 0110 | 5E90 | FFC2 |
| 0000176000 | 0144 | 5EB0 | FFC2 | 014E | 5EF0 | FFC2 | 014F | 5F50 |
| 0000176020 | FFC2 | 0151 | 5F70 | FFC2 | 0152 | 5FC0 | FFC2 | 0153 |
| 0000176040 | 5FD0 | FFC2 | 0154 | 60A0 | FFC2 | 0156 | 60F0 | FFC2 |
| 0000176060 | 0157 | 6170 | FFC2 | 015A | 6240 | FFC2 | 015C | 62A0 |
| 0000176100 | FFC2 | 015D | 6340 | FFC2 | 0162 | 6370 | FFC2 | 0165 |
| 0000176120 | 63B0 | FFC2 | 0168 | 63B0 | FFC2 | 016A | 6450 | FFC2 |
| 0000176140 | 016C | 64D0 | FFC2 | 016E | 6560 | FFC2 | 0172 | 65E0 |
| 0000176160 | FFC2 | 0174 | 6650 | FFC2 | 0175 | 66C0 | FFC2 | 0177 |
| 0000176200 | 6730 | FFC2 | 017B | 6760 | FFC2 | 017D | 6770 | FFC2 |
| 0000176220 | 0156 | 67A0 | FFC2 | 017F | 67E0 | FFC2 | 0152 | 6820 |
| 0000176240 | FFC2 | 0181 | 6870 | FFC2 | 014E | 68B0 | FFC2 | 0184 |
| 0000176260 | 68D0 | FFC2 | 0189 | 6910 | FFC2 | 018A | 6970 | FFC2 |
| 0000176300 | 018C | 6990 | FFC2 | 018D | 69E0 | FFC2 | 018E | 69F0 |
| 0000176320 | FFC2 | 018F | 6AC0 | FFC2 | 0191 | 6B10 | FFC2 | 0192 |
| 0000176340 | 6B90 | FFC2 | 0195 | 6C80 | FFC2 | 0199 | 6CE0 | FFC2 |
| 0000176360 | 019A | 6D80 | FFC2 | 019F | 6DB0 | FFC2 | 01A1 | 6DF0 |
| 0000176400 | FFC2 | 01A4 | 6DF0 | FFC2 | 01A6 | 6E90 | FFC2 | 01A8 |
| 0000176420 | 6F10 | FFC2 | 01AA | 6FA0 | FFC2 | 01AE | 7020 | FFC2 |
| 0000176440 | 01B0 | 7090 | FFC2 | 01B1 | 7100 | FFC2 | 01B3 | 7170 |
| 0000176460 | FFC2 | 01B7 | 71A0 | FFC2 | 01B9 | 71B0 | FFC2 | 0191 |
| 0000176500 | 71E0 | FFC2 | 01BB | 7220 | FFC2 | 018D | 7260 | FFC2 |
| 0000176520 | 01BD | 72B0 | FFC2 | 0189 | 72F0 | FFC2 | 01C0 | 7310 |
| 0000176540 | FFC2 | 01C5 | 7350 | FFC2 | 01C6 | 73B0 | FFC2 | 01C8 |
| 0000176560 | 73D0 | FFC2 | 01C9 | 7420 | FFC2 | 01CA | 7430 | FFC2 |
| 0000176600 | 01CB | 7520 | FFC2 | 01CE | 7570 | FFC2 | 01CF | 75F0 |
| 0000176620 | FFC2 | 01D2 | 76C0 | FFC2 | 01D4 | 7720 | FFC2 | 01D5 |
| 0000176640 | 77C0 | FFC2 | 01DA | 77F0 | FFC2 | 01DB | 7830 | FFC2 |
| 0000176660 | 01DE | 7830 | FFC2 | 01E0 | 78D0 | FFC2 | 01E2 | 7950 |
| 0000176700 | FFC2 | 01E4 | 79E0 | FFC2 | 01E8 | 7A60 | FFC2 | 01EA |
| 0000176720 | 7AD0 | FFC2 | 01EB | 7B40 | FFC2 | 01ED | 7BB0 | FFC2 |
| 0000176740 | 01F1 | 7BE0 | FFC2 | 01F3 | 7BF0 | FFC2 | 01CE | 7C20 |
| 0000176760 | FFC2 | 01F5 | 7C60 | FFC2 | 01C9 | 7CA0 | FFC2 | 01F7 |
| 0000177000 | 7CF0 | FFC2 | 01C5 | 7D30 | FFC2 | 01FA | 7D50 | FFC2 |
| 0000177020 | 01FF | 7D90 | FFC2 | 0200 | 7DF0 | FFC2 | 0202 | 7E10 |
| 0000177040 | FFC2 | 0203 | 7E60 | FFC2 | 0204 | 7E70 | FFC2 | 0205 |
| 0000177060 | 7F60 | FFC2 | 0208 | 7FB0 | FFC2 | 0209 | 8030 | FFC2 |
| 0000177100 | 020C | 8120 | FFC2 | 0210 | 8180 | FFC2 | 0211 | 8220 |
| 0000177120 | FFC2 | 0216 | 8250 | FFC2 | 0217 | 8290 | FFC2 | 021A |
| 0000177140 | 8290 | FFC2 | 021C | 8330 | FFC2 | 021E | 83B0 | FFC2 |

THU MAR 14 17:37:32 1991 GSPMON.4 PAGE 70, LINE 4072

| | | | | | | | | |
|---|---|---|---|---|---|---|---|---|
| 0000177160 | 0220 | 8440 | FFC2 | 0224 | 84C0 | FFC2 | 0226 | 8530 |
| 0000177200 | FFC2 | 0227 | 85A0 | FFC2 | 0229 | 8610 | FFC2 | 022D |
| 0000177220 | 8630 | FFC2 | 022F | 8640 | FFC2 | 0208 | 8670 | FFC2 |
| 0000177240 | 0231 | 86B0 | FFC2 | 0203 | 86F0 | FFC2 | 0233 | 8740 |
| 0000177260 | FFC2 | 01FF | 8780 | FFC2 | 0236 | 8790 | FFC2 | 0238 |
| 0000177300 | 8790 | FFC2 | 003D | 89E0 | FFC2 | 0025 | 8A90 | FFC2 |
| 0000177320 | 0023 | 8B10 | FFC2 | 023C | 8B90 | FFC2 | 023D | 0E10 |
| 0000177340 | 0000 | 0000 | 8C60 | FFC2 | 0016 | 8C90 | FFC2 | 0017 |
| 0000177360 | 8CB0 | FFC2 | 001A | 8D00 | FFC2 | 001C | 8D30 | FFC2 |
| 0000177400 | 001D | 8D60 | FFC2 | 0020 | 8DC0 | FFC2 | 0021 | 8DE0 |
| 0000177420 | FFC2 | 0023 | 8E10 | FFC2 | 0027 | 8EA0 | FFC2 | 0029 |
| 0000177440 | 8F00 | FFC2 | 002E | 8F30 | FFC2 | 001D | 8F60 | FFC2 |
| 0000177460 | 0030 | 8F90 | FFC2 | 0031 | 8FC0 | FFC2 | 0032 | 8FD0 |
| 0000177500 | FFC2 | 0034 | 9030 | FFC2 | 0036 | 9090 | FFC2 | 0037 |
| 0000177520 | 90C0 | FFC2 | 0038 | 9130 | FFC2 | 0039 | 9160 | FFC2 |
| 0000177540 | 003B | 91C0 | FFC2 | 003C | 91F0 | FFC2 | 0040 | 9240 |
| 0000177560 | FFC2 | 0041 | 9260 | FFC2 | 0044 | 92F0 | FFC2 | 0045 |
| 0000177600 | 9320 | FFC2 | 0046 | 93D0 | FFC2 | 0047 | 9430 | FFC2 |
| 0000177620 | 0054 | 9480 | FFC2 | 0056 | 94B0 | FFC2 | 0058 | 94B0 |
| 0000177640 | FFC2 | 0059 | 94E0 | FFC2 | 005B | 94E0 | FFC2 | 005D |
| 0000177660 | 9550 | FFC2 | 005F | 9580 | FFC2 | 0039 | 95B0 | FFC2 |
| 0000177700 | 0063 | 95D0 | FFC2 | 0064 | 9600 | FFC2 | 0066 | 9620 |
| 0000177720 | FFC2 | 0067 | 9650 | FFC2 | 0068 | 9680 | FFC2 | 006A |
| 0000177740 | 96A0 | FFC2 | 006C | 96D0 | FFC2 | 006E | 9780 | FFC2 |
| 0000177760 | 0071 | 97B0 | FFC2 | 0073 | 97E0 | FFC2 | 0077 | 9870 |
| 0000200000 | FFC2 | 0079 | 98D0 | FFC2 | 007E | 98F0 | FFC2 | 006C |
| 0000200020 | 9920 | FFC2 | 0080 | 9950 | FFC2 | 0081 | 9970 | FFC2 |
| 0000200040 | 0082 | 9980 | FFC2 | 0084 | 99E0 | FFC2 | 0086 | 9A40 |
| 0000200060 | FFC2 | 0087 | 9A60 | FFC2 | 0088 | 9AD0 | FFC2 | 0089 |
| 0000200100 | 9AF0 | FFC2 | 008B | 9BA0 | FFC2 | 008D | 9BE0 | FFC2 |
| 0000200120 | 0090 | 9C30 | FFC2 | 0091 | 9C50 | FFC2 | 0094 | 9CE0 |
| 0000200140 | FFC2 | 0095 | 9D10 | FFC2 | 0096 | 9DC0 | FFC2 | 0097 |
| 0000200160 | 9E20 | FFC2 | 00A2 | 9E70 | FFC2 | 00A4 | 9E90 | FFC2 |
| 0000200200 | 00A6 | 9E90 | FFC2 | 00A7 | 9EB0 | FFC2 | 00A9 | 9EB0 |
| 0000200220 | FFC2 | 00AA | 9F20 | FFC2 | 00AB | 9F40 | FFC2 | 0089 |
| 0000200240 | 9F70 | FFC2 | 00AE | 0E32 | 0000 | 0000 | A010 | FFC2 |
| 0000200260 | 0011 | A040 | FFC2 | 0012 | A060 | FFC2 | 0015 | A0B0 |
| 0000200300 | FFC2 | 0016 | A0D0 | FFC2 | 0019 | A120 | FFC2 | 001A |
| 0000200320 | A170 | FFC2 | 001B | A1A0 | FFC2 | 001D | A200 | FFC2 |
| 0000200340 | 001E | A230 | FFC2 | 0021 | A290 | FFC2 | 0028 | A2E0 |
| 0000200360 | FFC2 | 002A | A300 | FFC2 | 002C | A300 | FFC2 | 002E |
| 0000200400 | A310 | FFC2 | 0030 | A330 | FFC2 | 001B | A360 | FFC2 |
| 0000200420 | 0033 | A380 | FFC2 | 0036 | A3B0 | FFC2 | 0038 | A3D0 |
| 0000200440 | FFC2 | 0039 | A400 | FFC2 | 003A | A420 | FFC2 | 003C |
| 0000200460 | A430 | FFC2 | 003E | A480 | FFC2 | 003F | A4D0 | FFC2 |
| 0000200500 | 0040 | A500 | FFC2 | 0042 | A5B0 | FFC2 | 0044 | A5F0 |
| 0000200520 | FFC2 | 0048 | A650 | FFC2 | 004F | A6A0 | FFC2 | 0051 |
| 0000200540 | A6C0 | FFC2 | 0053 | A6C0 | FFC2 | 0054 | A6D0 | FFC2 |
| 0000200560 | 0055 | A6F0 | FFC2 | 0040 | A720 | FFC2 | 0058 | 0E4E |
| 0000200600 | 0000 | 0000 | A7D0 | FFC2 | 000E | A800 | FFC2 | 000F |
| 0000200620 | A840 | FFC2 | 0010 | A8B0 | FFC2 | 0011 | A920 | FFC2 |
| 0000200640 | 0013 | A960 | FFC2 | 0014 | A990 | FFC2 | 0015 | A9C0 |
| 0000200660 | FFC2 | 0017 | AA60 | FFC2 | 0019 | AAB0 | FFC2 | 001A |
| 0000200700 | AB30 | FFC2 | 001C | AB70 | FFC2 | 001D | ABE0 | FFC2 |
| 0000200720 | 0020 | AD40 | FFC2 | 0026 | AD50 | FFC2 | 0027 | AD70 |
| 0000200740 | FFC2 | 0028 | AD80 | FFC2 | 0015 | ADF0 | FFC2 | 002C |
| 0000200760 | AE30 | FFC2 | 002D | AE70 | FFC2 | 002E | 0E72 | 0000 |
| 0000201000 | 0000 | AF10 | FFC2 | 000A | AF90 | FFC2 | 000B | AFB0 |
| 0000201020 | FFC2 | 000C | AFE0 | FFC2 | 0010 | B020 | FFC2 | 0011 |

THU MAR 14 17:37:32 1991 GSPMON.4 PAGE 71, LINE 4131

| | | | | | | | | |
|---|---|---|---|---|---|---|---|---|
| 0000201040 | B040 | FFC2 | 0012 | B050 | FFC2 | 0013 | B080 | FFC2 |
| 0000201060 | 0017 | B110 | FFC2 | 001C | B1E0 | FFC2 | 001F | B220 |
| 0000201100 | FFC2 | 0020 | 0E7E | 0000 | 0000 | B2B0 | FFC2 | 0007 |
| 0000201120 | B310 | FFC2 | 0008 | B350 | FFC2 | 000B | B3E0 | FFC2 |
| 0000201140 | 000C | B410 | FFC2 | 000E | B420 | FFC2 | 0011 | B4A0 |
| 0000201160 | FFC2 | 0013 | B4F0 | FFC2 | 0015 | B530 | FFC2 | 0018 |
| 0000201200 | 0E88 | 0000 | 0000 | B5D0 | FFC2 | 0008 | B610 | FFC2 |
| 0000201220 | 0009 | B650 | FFC2 | 000A | B670 | FFC2 | 0010 | B6C0 |
| 0000201240 | FFC2 | 0011 | B720 | FFC2 | 0012 | B770 | FFC2 | 0013 |
| 0000201260 | B7B0 | FFC2 | 0010 | B800 | FFC2 | 0016 | B850 | FFC2 |
| 0000201300 | 0018 | B8C0 | FFC2 | 001A | 11A6 | 0000 | 0000 | B940 |
| 0000201320 | FFC2 | 0006 | B990 | FFC2 | 0007 | B9C0 | FFC2 | 0008 |
| 0000201340 | B9F0 | FFC2 | 000A | BA40 | FFC2 | 000B | BA90 | FFC2 |
| 0000201360 | 000C | BAD0 | FFC2 | 000E | BB10 | FFC2 | 0010 | BB60 |
| 0000201400 | FFC2 | 0011 | BBE0 | FFC2 | 0014 | BCA0 | FFC2 | 0015 |
| 0000201420 | BCF0 | FFC2 | 0016 | BD40 | FFC2 | 0017 | BDF0 | FFC2 |
| 0000201440 | 001A | BE60 | FFC2 | 001F | C010 | FFC2 | 0025 | C080 |
| 0000201460 | FFC2 | 0026 | C0F0 | FFC2 | 0027 | C130 | FFC2 | 0028 |
| 0000201500 | C160 | FFC2 | 002E | C190 | FFC2 | 002F | C1D0 | FFC2 |
| 0000201520 | 0032 | C230 | FFC2 | 0033 | 11AC | 0000 | 0000 | C2E0 |
| 0000201540 | FFC2 | 000E | C360 | FFC2 | 000F | C3D0 | FFC2 | 0010 |
| 0000201560 | C3F0 | FFC2 | 0014 | C440 | FFC2 | 0015 | C490 | FFC2 |
| 0000201600 | 0016 | C4E0 | FFC2 | 0017 | C530 | FFC2 | 0018 | C580 |
| 0000201620 | FFC2 | 0019 | C5E0 | FFC2 | 001A | C620 | FFC2 | 001B |
| 0000201640 | C660 | FFC2 | 001C | C690 | FFC2 | 001D | C6D0 | FFC2 |
| 0000201660 | 001E | C6F0 | FFC2 | 0022 | C740 | FFC2 | 0024 | C7A0 |
| 0000201700 | FFC2 | 0028 | C8C0 | FFC2 | 002A | C960 | FFC2 | 002B |
| 0000201720 | CA40 | FFC2 | 002E | CA90 | FFC2 | 002F | CAE0 | FFC2 |
| 0000201740 | 0032 | CAF0 | FFC2 | 0034 | CB30 | FFC2 | 0035 | CB80 |
| 0000201760 | FFC2 | 0036 | CBD0 | FFC2 | 0038 | CC50 | FFC2 | 0039 |
| 0000202000 | CCD0 | FFC2 | 003A | CD10 | FFC2 | 003D | CDB0 | FFC2 |
| 0000202020 | 003E | CE00 | FFC2 | 003F | CE50 | FFC2 | 0040 | CE60 |
| 0000202040 | FFC2 | 0044 | CEB0 | FFC2 | 0045 | CF00 | FFC2 | 0046 |
| 0000202060 | CF10 | FFC2 | 004A | CF60 | FFC2 | 004B | CFB0 | FFC2 |
| 0000202100 | 004C | D000 | FFC2 | 004D | D030 | FFC2 | 004E | D040 |
| 0000202120 | FFC2 | 0051 | D040 | FFC2 | 0010 | 11B2 | 0000 | 0000 |
| 0000202140 | D190 | FFC2 | 000A | D1F0 | FFC2 | 000C | D210 | FFC2 |
| 0000202160 | 000F | D260 | FFC2 | 0011 | D3C0 | FFC2 | 0012 | D400 |
| 0000202200 | FFC2 | 0013 | D410 | FFC2 | 0015 | D470 | FFC2 | 0016 |
| 0000202220 | D4C0 | FFC2 | 0017 | D510 | FFC2 | 0018 | D560 | FFC2 |
| 0000202240 | 0019 | D5B0 | FFC2 | 001A | D600 | FFC2 | 001C | D6C0 |
| 0000202260 | FFC2 | 001E | D710 | FFC2 | 0020 | D720 | FFC2 | 0022 |
| 0000202300 | D770 | FFC2 | 0023 | D7F0 | FFC2 | 0025 | D840 | FFC2 |
| 0000202320 | 0026 | D860 | FFC2 | 0029 | D8B0 | FFC2 | 002B | DB80 |
| 0000202340 | FFC2 | 0031 | DBC0 | FFC2 | 0032 | DC10 | FFC2 | 0033 |
| 0000202360 | DC60 | FFC2 | 0034 | DD20 | FFC2 | 0036 | DD70 | FFC2 |
| 0000202400 | 0038 | DD80 | FFC2 | 003A | DDD0 | FFC2 | 003B | DE50 |
| 0000202420 | FFC2 | 003D | DEA0 | FFC2 | 003E | DEC0 | FFC2 | 0041 |
| 0000202440 | DF10 | FFC2 | 0043 | DF60 | FFC2 | 0044 | E010 | FFC2 |
| 0000202460 | 0046 | E060 | FFC2 | 0048 | E070 | FFC2 | 004A | E0C0 |
| 0000202500 | FFC2 | 004B | E140 | FFC2 | 004D | E190 | FFC2 | 004E |
| 0000202520 | E1B0 | FFC2 | 0051 | E200 | FFC2 | 0053 | E430 | FFC2 |
| 0000202540 | 0055 | E470 | FFC2 | 0057 | E4B0 | FFC2 | 0058 | E510 |
| 0000202560 | FFC2 | 0059 | E560 | FFC2 | 005F | E620 | FFC2 | 0061 |
| 0000202600 | E670 | FFC2 | 0063 | E680 | FFC2 | 0065 | E6D0 | FFC2 |
| 0000202620 | 0066 | E750 | FFC2 | 0068 | E7A0 | FFC2 | 0069 | E7C0 |
| 0000202640 | FFC2 | 006C | E810 | FFC2 | 006E | EA00 | FFC2 | 0070 |
| 0000202660 | EA40 | FFC2 | 0072 | EA80 | FFC2 | 0073 | EAE0 | FFC2 |
| 0000202700 | 0074 | EB30 | FFC2 | 0075 | EB80 | FFC2 | 0076 | EBD0 |

THU MAR 14 17:37:32 1991 GSPMON.4 PAGE 72, LINE 4190

| | | | | | | | | |
|---|---|---|---|---|---|---|---|---|
| 0000202720 | FFC2 | 0078 | EC90 | FFC2 | 007A | ECE0 | FFC2 | 007C |
| 0000202740 | ECF0 | FFC2 | 007E | ED40 | FFC2 | 007F | EDC0 | FFC2 |
| 0000202760 | 0081 | EE10 | FFC2 | 0082 | EE20 | FFC2 | 0085 | EE70 |
| 0000203000 | FFC2 | 0086 | EEC0 | FFC2 | 0087 | EEF0 | FFC2 | 0089 |
| 0000203020 | EF70 | FFC2 | 008A | EF80 | FFC2 | 008D | EF80 | FFC2 |
| 0000203040 | 000C | F100 | FFC2 | 0090 | F180 | FFC2 | 0091 | F1C0 |
| 0000203060 | FFC2 | 0092 | F200 | FFC2 | 0093 | 11C4 | 0000 | 0000 |
| 0000203100 | F2C0 | FFC2 | 0007 | F310 | FFC2 | 0008 | F3A0 | FFC2 |
| 0000203120 | 000A | F3F0 | FFC2 | 000B | 11CC | 0000 | 0000 | F4C0 |
| 0000203140 | FFC2 | 000B | F5A0 | FFC2 | 000C | F640 | FFC2 | 000D |
| 0000203160 | F710 | FFC2 | 000F | F760 | FFC2 | 0010 | F7F0 | FFC2 |
| 0000203200 | 0011 | F800 | FFC2 | 0013 | F8D0 | FFC2 | 0015 | F910 |
| 0000203220 | FFC2 | 0016 | F920 | FFC2 | 0017 | F960 | FFC2 | 001B |
| 0000203240 | F9C0 | FFC2 | 001C | F9F0 | FFC2 | 001D | 11DA | 0000 |
| 0000203260 | 0000 | FAC0 | FFC2 | 0017 | FAF0 | FFC2 | 0023 | FB1n |
| 0000203300 | FFC2 | 0029 | FC70 | FFC2 | 002A | FCB0 | FFC2 | 002B |
| 0000203320 | FD70 | FFC2 | 002C | FDB0 | FFC2 | 0032 | FE40 | FFC2 |
| 0000203340 | 0033 | FF60 | FFC2 | 0037 | 0000 | FFC3 | 0038 | 0030 |
| 0000203360 | FFC3 | 0039 | 0040 | FFC3 | 003A | 0070 | FFC3 | 003C |
| 0000203400 | 0090 | FFC3 | 003E | 0130 | FFC3 | 003F | 0240 | FFC3 |
| 0000203420 | 0041 | 0250 | FFC3 | 0042 | 02D0 | FFC3 | 0047 | 0350 |
| 0000203440 | FFC3 | 0049 | 0370 | FFC3 | 0050 | 0480 | FFC3 | 0051 |
| 0000203460 | 04C0 | FFC3 | 0052 | 0580 | FFC3 | 0053 | 05C0 | FFC3 |
| 0000203500 | 0058 | 0620 | FFC3 | 0059 | 06C0 | FFC3 | 005A | 07E0 |
| 0000203520 | FFC3 | 005E | 0860 | FFC3 | 005F | 0890 | FFC3 | 0060 |
| 0000203540 | 08A0 | FFC3 | 0061 | 08D0 | FFC3 | 0063 | 08F0 | FFC3 |
| 0000203560 | 0065 | 0980 | FFC3 | 0066 | 0A70 | FFC3 | 0068 | 0A80 |
| 0000203600 | FFC3 | 0069 | 0B00 | FFC3 | 006D | 0B80 | FFC3 | 006F |
| 0000203620 | 0BA0 | FFC3 | 0073 | 0BD0 | FFC3 | 0074 | 0C40 | FFC3 |
| 0000203640 | 0075 | 0C60 | FFC3 | 0078 | 0CA0 | FFC3 | 0023 | 0E60 |
| 0000203660 | FFC3 | 007F | 0E60 | FFC3 | 0084 | 0ED0 | FFC3 | 0085 |
| 0000203700 | 0F10 | FFC3 | 0089 | 0F40 | FFC3 | 008A | 0FC0 | FFC3 |
| 0000203720 | 008B | 1020 | FFC3 | 008C | 10A0 | FFC3 | 008E | 1180 |
| 0000203740 | FFC3 | 008F | 12B0 | FFC3 | 0095 | 13C0 | FFC3 | 0097 |
| 0000203760 | 1400 | FFC3 | 0098 | 1440 | FFC3 | 009A | 1540 | FFC3 |
| 0000204000 | 009B | 1570 | FFC3 | 009C | 1580 | FFC3 | 009D | 15B0 |
| 0000204020 | FFC3 | 009F | 15D0 | FFC3 | 00A1 | 1720 | FFC3 | 00A3 |
| 0000204040 | 1760 | FFC3 | 00A4 | 17A0 | FFC3 | 00A7 | 1830 | FFC3 |
| 0000204060 | 00A8 | 1850 | FFC3 | 00AD | 1900 | FFC3 | 00AE | 1940 |
| 0000204100 | FFC3 | 00B2 | 1980 | FFC3 | 00B3 | 1A00 | FFC3 | 00B4 |
| 0000204120 | 1A60 | FFC3 | 00B5 | 1AE0 | FFC3 | 00B7 | 1B80 | FFC3 |
| 0000204140 | 00B8 | 1CB0 | FFC3 | 00BE | 1DC0 | FFC3 | 00C0 | 1E00 |
| 0000204160 | FFC3 | 00C1 | 1E40 | FFC3 | 00C3 | 1F20 | FFC3 | 00C4 |
| 0000204200 | 1F50 | FFC3 | 00C5 | 1F60 | FFC3 | 00C6 | 1F90 | FFC3 |
| 0000204220 | 00C9 | 1FB0 | FFC3 | 00CB | 2100 | FFC3 | 00CD | 2140 |
| 0000204240 | FFC3 | 00CE | 2170 | FFC3 | 00D0 | 2200 | FFC3 | 00D1 |
| 0000204260 | 2210 | FFC3 | 00D5 | 2210 | FFC3 | 00D8 | 2240 | FFC3 |
| 0000204300 | 007F | 23F0 | FFC3 | 00DD | 25F0 | FFC3 | 00DF | 2620 |
| 0000204320 | FFC3 | 00E1 | 26C0 | FFC3 | 00E2 | 121C | 0000 | 0000 |
| 0000204340 | 2780 | FFC3 | 0024 | 2920 | FFC3 | 0026 | 2960 | FFC3 |
| 0000204360 | 0028 | 2AD0 | FFC3 | 002A | 2B10 | FFC3 | 002C | 2BA0 |
| 0000204400 | FFC3 | 002D | 2CE0 | FFC3 | 0030 | 2D90 | FFC3 | 0031 |
| 0000204420 | 2EC0 | FFC3 | 0036 | 2F00 | FFC3 | 0037 | 3030 | FFC3 |
| 0000204440 | 0038 | 30B0 | FFC3 | 0039 | 31A0 | FFC3 | 003A | 31F0 |
| 0000204460 | FFC3 | 003B | 3230 | FFC3 | 003C | 3240 | FFC3 | 0038 |
| 0000204500 | 32C0 | FFC3 | 0040 | 3300 | FFC3 | 0041 | 3330 | FFC3 |
| 0000204520 | 0045 | 33B0 | FFC3 | 0049 | 3420 | FFC3 | 004D | 3690 |
| 0000204540 | FFC3 | 0052 | 3780 | FFC3 | 0053 | 38C0 | FFC3 | 0055 |
| 0000204560 | 39F0 | FFC3 | 0056 | 3A30 | FFC3 | 0057 | 3A70 | FFC3 |

THU MAR 14 17:37:32 1991 GSPMON.4 PAGE 73, LINE 4249

| | | | | | | | | |
|---|---|---|---|---|---|---|---|---|
| 0000204600 | 0059 | 3AC0 | FFC3 | 005A | 3AE0 | FFC3 | 005C | 3B70 |
| 0000204620 | FFC3 | 005D | 3CB0 | FFC3 | 005F | 3DE0 | FFC3 | 0060 |
| 0000204640 | 3E20 | FFC3 | 0061 | 3E60 | FFC3 | 0062 | 3EE0 | FFC3 |
| 0000204660 | 0063 | 3F60 | FFC3 | 0065 | 3F90 | FFC3 | 006A | 3FD0 |
| 0000204700 | FFC3 | 006B | 4030 | FFC3 | 006C | 4060 | FFC3 | 006D |
| 0000204720 | 4070 | FFC3 | 006E | 40A0 | FFC3 | 006F | 40D0 | FFC3 |
| 0000204740 | 0078 | 41D0 | FFC3 | 0079 | 4350 | FFC3 | 007B | 4490 |
| 0000204760 | FFC3 | 007C | 44D0 | FFC3 | 007D | 4510 | FFC3 | 007E |
| 0000205000 | 4560 | FFC3 | 0085 | 45F0 | FFC3 | 0086 | 4670 | FFC3 |
| 0000205020 | 0087 | 4670 | FFC3 | 0089 | 4710 | FFC3 | 008B | 47B0 |
| 0000205040 | FFC3 | 008C | 4870 | FFC3 | 008D | 4950 | FFC3 | 008E |
| 0000205060 | 4950 | FFC3 | 008C | 49F0 | FFC3 | 0090 | 4A50 | FFC3 |
| 0000205100 | 0091 | 4B60 | FFC3 | 0092 | 4BA0 | FFC3 | 0093 | 4BE0 |
| 0000205120 | FFC3 | 0094 | 4C40 | FFC3 | 0095 | 4C60 | FFC3 | 0096 |
| 0000205140 | 4C80 | FFC3 | 0085 | 4D00 | FFC3 | 00A0 | 4DB0 | FFC3 |
| 0000205160 | 00A1 | 4F30 | FFC3 | 00A9 | 5070 | FFC3 | 00AA | 50B0 |
| 0000205200 | FFC3 | 00AB | 50F0 | FFC3 | 00AD | 5140 | FFC3 | 00AF |
| 0000205220 | 51D0 | FFC3 | 00B0 | 5250 | FFC3 | 00B1 | 5320 | FFC3 |
| 0000205240 | 00B2 | 53E0 | FFC3 | 00B3 | 54C0 | FFC3 | 00B4 | 54C0 |
| 0000205260 | FFC3 | 00B2 | 5560 | FFC3 | 00B5 | 5570 | FFC3 | 00B6 |
| 0000205300 | 55A0 | FFC3 | 00B8 | 5630 | FFC3 | 00B9 | 5650 | FFC3 |
| 0000205320 | 00BA | 5660 | FFC3 | 00BD | 5690 | FFC3 | 00BE | 57A0 |
| 0000205340 | FFC3 | 00BF | 57E0 | FFC3 | 00C0 | 5810 | FFC3 | 00C2 |
| 0000205360 | 5870 | FFC3 | 00C3 | 5890 | FFC3 | 00C4 | 58C0 | FFC3 |
| 0000205400 | 00AF | 5930 | FFC3 | 00CA | 5990 | FFC3 | 00CB | 59C0 |
| 0000205420 | FFC3 | 00CC | 5A50 | FFC3 | 00CD | 5A80 | FFC3 | 00CE |
| 0000205440 | 5B00 | FFC3 | 00CF | 5B80 | FFC3 | 00D0 | 125C | 0000 |
| 0000205460 | 0000 | 5C30 | FFC3 | 003D | 5F40 | FFC3 | 003F | 6220 |
| 0000205500 | FFC3 | 0041 | 6500 | FFC3 | 0043 | 67E0 | FFC3 | 0045 |
| 0000205520 | 6B00 | FFC3 | 0047 | 6E40 | FFC3 | 0049 | 7180 | FFC3 |
| 0000205540 | 004B | 74C0 | FFC3 | 004D | 7760 | FFC3 | 004F | 7A20 |
| 0000205560 | FFC3 | 0051 | 7CE0 | FFC3 | 0053 | 7FA0 | FFC3 | 0057 |
| 0000205600 | 7FF0 | FFC3 | 005C | 8030 | FFC3 | 005D | 8060 | FFC3 |
| 0000205620 | 005E | 8070 | FFC3 | 005F | 80A0 | FFC3 | 0062 | 80D0 |
| 0000205640 | FFC3 | 0064 | 8100 | FFC3 | 0065 | 8140 | FFC3 | 0066 |
| 0000205660 | 8170 | FFC3 | 0067 | 8180 | FFC3 | 0068 | 81B0 | FFC3 |
| 0000205700 | 0069 | 81F0 | FFC3 | 006A | 8250 | FFC3 | 006B | 8260 |
| 0000205720 | FFC3 | 006C | 8290 | FFC3 | 006D | 82D0 | FFC3 | 006E |
| 0000205740 | 8330 | FFC3 | 0071 | 8660 | FFC3 | 0075 | 86A0 | FFC3 |
| 0000205760 | 0076 | 86B0 | FFC3 | 0078 | 86F0 | FFC3 | 0079 | 8720 |
| 0000206000 | FFC3 | 007A | 8760 | FFC3 | 007B | 8770 | FFC3 | 007C |
| 0000206020 | 87A0 | FFC3 | 007D | 87D0 | FFC3 | 0081 | 8AA0 | FFC3 |
| 0000206040 | 0083 | 8AE0 | FFC3 | 0084 | 8AF0 | FFC3 | 0085 | 8B40 |
| 0000206060 | FFC3 | 0086 | 8B50 | FFC3 | 0087 | 8B80 | FFC3 | 0088 |
| 0000206100 | 8BC0 | FFC3 | 008B | 8BE0 | FFC3 | 008C | 8C40 | FFC3 |
| 0000206120 | 0093 | 8DC0 | FFC3 | 0094 | 8E00 | FFC3 | 0096 | 8E10 |
| 0000206140 | FFC3 | 0099 | 8E40 | FFC3 | 009B | 8E70 | FFC3 | 009C |
| 0000206160 | 8EB0 | FFC3 | 009D | 8EF0 | FFC3 | 009E | 8F30 | FFC3 |
| 0000206200 | 009F | 8F70 | FFC3 | 00A0 | 8FB0 | FFC3 | 00A1 | 8FF0 |
| 0000206220 | FFC3 | 00A4 | 9030 | FFC3 | 00A5 | 9060 | FFC3 | 00A6 |
| 0000206240 | 90A0 | FFC3 | 00A7 | 90E0 | FFC3 | 00A8 | 9120 | FFC3 |
| 0000206260 | 00A9 | 9160 | FFC3 | 00AA | 9170 | FFC3 | 00AB | 91A0 |
| 0000206300 | FFC3 | 00AD | 91E0 | FFC3 | 00AF | 92E0 | FFC3 | 00B1 |
| 0000206320 | 9320 | FFC3 | 00B2 | 9330 | FFC3 | 00B3 | 9370 | FFC3 |
| 0000206340 | 00B4 | 93B0 | FFC3 | 00B5 | 93E0 | FFC3 | 00B6 | 93F0 |
| 0000206360 | FFC3 | 00B7 | 9420 | FFC3 | 00B9 | 9580 | FFC3 | 00BA |
| 0000206400 | 95A0 | FFC3 | 00C4 | 9610 | FFC3 | 00C6 | 96C0 | FFC3 |
| 0000206420 | 00C7 | 97C0 | FFC3 | 00C8 | 9880 | FFC3 | 00C9 | 9880 |
| 0000206440 | FFC3 | 00C7 | 9960 | FFC3 | 00CB | 9A90 | FFC3 | 00CC |

THU MAR 14 17:37:32 1991 GSPMON.4 PAGE 74, LINE 4308

| | | | | | | | | |
|---|---|---|---|---|---|---|---|---|
| 0000206460 | 9AD0 | FFC3 | 00CD | 9B00 | FFC3 | 00D0 | 9BB0 | FFC3 |
| 0000206500 | 00D1 | 9CD0 | FFC3 | 00D2 | 9D90 | FFC3 | 00D3 | 9D90 |
| 0000206520 | FFC3 | 00D1 | 9E50 | FFC3 | 00D5 | 9F80 | FFC3 | 00D6 |
| 0000206540 | 9FC0 | FFC3 | 00D7 | 9FF0 | FFC3 | 00DA | A0D0 | FFC3 |
| 0000206560 | 00DB | A110 | FFC3 | 00DC | A120 | FFC3 | 00DD | A150 |
| 0000206600 | FFC3 | 00E0 | 12AA | 0000 | 0000 | A200 | FFC3 | 0016 |
| 0000206620 | A240 | FFC3 | 0025 | A260 | FFC3 | 0026 | A2C0 | FFC3 |
| 0000206640 | 0027 | A360 | FFC3 | 0028 | A4C0 | FFC3 | 0029 | A550 |
| 0000206660 | FFC3 | 002A | A670 | FFC3 | 002C | A930 | FFC3 | 002D |
| 0000206700 | AA00 | FFC3 | 002E | AAF0 | FFC3 | 002F | AB50 | FFC3 |
| 0000206720 | 002D | AC20 | FFC3 | 0032 | AE30 | FFC3 | 0035 | AEC0 |
| 0000206740 | FFC3 | 0036 | AF10 | FFC3 | 0037 | AF20 | FFC3 | 0038 |
| 0000206760 | AFC0 | FFC3 | 0039 | B100 | FFC3 | 003B | B210 | FFC3 |
| 0000207000 | 003D | B250 | FFC3 | 003E | B290 | FFC3 | 0040 | B300 |
| 0000207020 | FFC3 | 0042 | B3C0 | FFC3 | 0043 | B500 | FFC3 | 0045 |
| 0000207040 | B610 | FFC3 | 0047 | B650 | FFC3 | 0048 | B690 | FFC3 |
| 0000207060 | 0049 | B700 | FFC3 | 004D | B740 | FFC3 | 004E | B780 |
| 0000207100 | FFC3 | 0050 | B7C0 | FFC3 | 0052 | B860 | FFC3 | 0053 |
| 0000207120 | B970 | FFC3 | 0055 | BA50 | FFC3 | 0057 | BA80 | FFC3 |
| 0000207140 | 0059 | BB00 | FFC3 | 005A | BD20 | FFC3 | 005B | BF10 |
| 0000207160 | FFC3 | 005C | BF90 | FFC3 | 005D | BFF0 | FFC3 | 005E |
| 0000207200 | C0C0 | FFC3 | 005F | C200 | FFC3 | 0061 | C310 | FFC3 |
| 0000207220 | 0063 | C350 | FFC3 | 0064 | C390 | FFC3 | 0065 | C420 |
| 0000207240 | FFC3 | 0067 | C4C0 | FFC3 | 0068 | C620 | FFC3 | 006A |
| 0000207260 | C730 | FFC3 | 006B | C770 | FFC3 | 006C | C7B0 | FFC3 |
| 0000207300 | 006D | C840 | FFC3 | 006F | C990 | FFC3 | 0070 | CA10 |
| 0000207320 | FFC3 | 0071 | CA90 | FFC3 | 0059 | CB30 | FFC3 | 0076 |
| 0000207340 | CB70 | FFC3 | 0077 | CBC0 | FFC3 | 0078 | CC40 | FFC3 |
| 0000207360 | 0079 | CC80 | FFC3 | 007A | CD20 | FFC3 | 007B | CDF0 |
| 0000207400 | FFC3 | 007D | CE60 | FFC3 | 007E | CE70 | FFC3 | 007F |
| 0000207420 | CF20 | FFC3 | 0080 | CFE0 | FFC3 | 0081 | D0D0 | FFC3 |
| 0000207440 | 0082 | D1D0 | FFC3 | 007F | D270 | FFC3 | 0084 | D2C0 |
| 0000207460 | FFC3 | 0077 | D330 | FFC3 | 0087 | D370 | FFC3 | 0088 |
| 0000207500 | D3B0 | FFC3 | 0089 | D460 | FFC3 | 008A | D4F0 | FFC3 |
| 0000207520 | 008B | D880 | FFC3 | 008D | D8C0 | FFC3 | 008E | D8D0 |
| 0000207540 | FFC3 | 008A | D980 | FFC3 | 0089 | DA50 | FFC3 | 0094 |
| 0000207560 | DAB0 | FFC3 | 0095 | DB30 | FFC3 | 0096 | DBF0 | FFC3 |
| 0000207600 | 0097 | DCD0 | FFC3 | 0098 | DDC0 | FFC3 | 0095 | DE60 |
| 0000207620 | FFC3 | 009B | DE90 | FFC3 | 009C | DED0 | FFC3 | 009D |
| 0000207640 | DF20 | FFC3 | 009E | DF50 | FFC3 | 009F | DFD0 | FFC3 |
| 0000207660 | 00A0 | E050 | FFC3 | 00A1 | E080 | FFC3 | 00A2 | E090 |
| 0000207700 | FFC3 | 00A3 | E0A0 | FFC3 | 00A4 | E110 | FFC3 | 00A5 |
| 0000207720 | E160 | FFC3 | 00A6 | E190 | FFC3 | 00A7 | E1A0 | FFC3 |
| 0000207740 | 00A8 | E1F0 | FFC3 | 00A9 | E220 | FFC3 | 00AA | E2A0 |
| 0000207760 | FFC3 | 00AB | E320 | FFC3 | 00AC | E350 | FFC3 | 00AE |
| 0000210000 | E400 | FFC3 | 00AF | E450 | FFC3 | 00B0 | E520 | FFC3 |
| 0000210020 | 00B1 | E570 | FFC3 | 00B2 | E5B0 | FFC3 | 00B3 | E610 |
| 0000210040 | FFC3 | 00B5 | 12EE | 0000 | 0000 | E6E0 | FFC3 | 0010 |
| 0000210060 | E770 | FFC3 | 0011 | E7A0 | FFC3 | 0013 | E880 | FFC3 |
| 0000210100 | 0014 | E8B0 | FFC3 | 0016 | E8E0 | FFC3 | 0018 | E9B0 |
| 0000210120 | FFC3 | 001A | E9E0 | FFC3 | 001B | EA00 | FFC3 | 0021 |
| 0000210140 | EA40 | FFC3 | 0023 | EA90 | FFC3 | 0024 | EAB0 | FFC3 |
| 0000210160 | 0025 | EAC0 | FFC3 | 0026 | EB00 | FFC3 | 0027 | EB30 |
| 0000210200 | FFC3 | 0029 | EB40 | FFC3 | 002A | EBA0 | FFC3 | 002B |
| 0000210220 | EBD0 | FFC3 | 002C | EBE0 | FFC3 | 002D | EC10 | FFC3 |
| 0000210240 | 002F | EC20 | FFC3 | 0031 | EC60 | FFC3 | 0033 | ECC0 |
| 0000210260 | FFC3 | 0034 | ECF0 | FFC3 | 0035 | ED00 | FFC3 | 0036 |
| 0000210300 | ED60 | FFC3 | 0037 | ED90 | FFC3 | 0038 | EDA0 | FFC3 |
| 0000210320 | 0039 | EE00 | FFC3 | 003A | EE30 | FFC3 | 005E | EE60 |

THU MAR 14 17:37:32 1991 GSPMON.4 PAGE 75, LINE 4367

| | | | | | | | | |
|---|---|---|---|---|---|---|---|---|
| 0000210340 | FFC3 | 005F | 1304 | 0000 | 0000 | EF00 | FFC3 | 0007 |
| 0000210360 | EF40 | FFC3 | 0008 | EF90 | FFC3 | 0009 | EFE0 | FFC3 |
| 0000210400 | 000B | EFF0 | FFC3 | 000C | F030 | FFC3 | 000D | F090 |
| 0000210420 | FFC3 | 000E | F0F0 | FFC3 | 000F | F140 | FFC3 | 0010 |
| 0000210440 | 1310 | 0000 | 0000 | F1E0 | FFC3 | 0008 | F220 | FFC3 |
| 0000210460 | 0009 | F2A0 | FFC3 | 000A | F2F0 | FFC3 | 000B | F320 |
| 0000210500 | FFC3 | 000C | F380 | FFC3 | 000D | F3E0 | FFC3 | 000E |
| 0000210520 | F430 | FFC3 | 000F | 131C | 0000 | 0000 | F4D0 | FFC3 |
| 0000210540 | 0008 | F510 | FFC3 | 0009 | F580 | FFC3 | 000A | F5D0 |
| 0000210560 | FFC3 | 000B | F640 | FFC3 | 000C | F6B0 | FFC3 | 000D |
| 0000210600 | F6E0 | FFC3 | 000E | F760 | FFC3 | 000F | F7D0 | FFC3 |
| 0000210620 | 0010 | F850 | FFC3 | 0011 | F8D0 | FFC3 | 0012 | F940 |
| 0000210640 | FFC3 | 0013 | F990 | FFC3 | 0014 | F9F0 | FFC3 | 0015 |
| 0000210660 | FA50 | FFC3 | 0016 | FAA0 | FFC3 | 0017 | 1328 | 0000 |
| 0000210700 | 0000 | FB40 | FFC3 | 0008 | FB80 | FFC3 | 0009 | FBF0 |
| 0000210720 | FFC3 | 000A | FC40 | FFC3 | 000B | FCB0 | FFC3 | 000C |
| 0000210740 | FD20 | FFC3 | 000D | FDD0 | FFC3 | 000E | FE80 | FFC3 |
| 0000210760 | 000F | FEC0 | FFC3 | 0010 | FF40 | FFC3 | 0011 | FFB0 |
| 0000211000 | FFC3 | 0013 | 0020 | FFC4 | 0014 | 0090 | FFC4 | 0015 |
| 0000211020 | 00E0 | FFC4 | 0016 | 0140 | FFC4 | 0017 | 0190 | FFC4 |
| 0000211040 | 0018 | 01E0 | FFC4 | 0019 | 1334 | 0000 | 0000 | 0280 |
| 0000211060 | FFC4 | 0008 | 02C0 | FFC4 | 0009 | 0330 | FFC4 | 000A |
| 0000211100 | 0380 | FFC4 | 000B | 03F0 | FFC4 | 000C | 0460 | FFC4 |
| 0000211120 | 000D | 04A0 | FFC4 | 000E | 0520 | FFC4 | 000F | 0590 |
| 0000211140 | FFC4 | 0010 | 0610 | FFC4 | 0011 | 0690 | FFC4 | 0012 |
| 0000211160 | 0700 | FFC4 | 0013 | 0750 | FFC4 | 0014 | 07B0 | FFC4 |
| 0000211200 | 0015 | 0800 | FFC4 | 0016 | 0860 | FFC4 | 0017 | 1340 |
| 0000211220 | 0000 | 0000 | 08F0 | FFC4 | 0006 | 0940 | FFC4 | 0007 |
| 0000211240 | 134A | 0000 | 0000 | 09E0 | FFC4 | 0008 | 0A20 | FFC4 |
| 0000211260 | 0009 | 0A90 | FFC4 | 000A | 0AE0 | FFC4 | 000B | 0B50 |
| 0000211300 | FFC4 | 000C | 0BC0 | FFC4 | 000D | 0C70 | FFC4 | 000E |
| 0000211320 | 0D20 | FFC4 | 000F | 0DA0 | FFC4 | 0010 | 0E10 | FFC4 |
| 0000211340 | 0011 | 0E90 | FFC4 | 0012 | 0EE0 | FFC4 | 0013 | 0F40 |
| 0000211360 | FFC4 | 0014 | 0FA0 | FFC4 | 0015 | 0FF0 | FFC4 | 0016 |
| 0000211400 | 1356 | 0000 | 0000 | 1080 | FFC4 | 0009 | 10F0 | FFC4 |
| 0000211420 | 000A | 1140 | FFC4 | 000B | 1190 | FFC4 | 000D | 1200 |
| 0000211440 | FFC4 | 0012 | 1280 | FFC4 | 0013 | 12B0 | FFC4 | 0014 |
| 0000211460 | 1390 | FFC4 | 0015 | 13C0 | FFC4 | 0019 | 1400 | FFC4 |
| 0000211500 | 001B | 1430 | FFC4 | 001D | 1490 | FFC4 | 001F | 1360 |
| 0000211520 | 0000 | 0000 | 1520 | FFC4 | 000A | 1550 | FFC4 | 000C |
| 0000211540 | 15B0 | FFC4 | 000E | 136A | 0000 | 0000 | 1640 | FFC4 |
| 0000211560 | 0006 | 1680 | FFC4 | 0007 | 16C0 | FFC4 | 0008 | 1700 |
| 0000211600 | FFC4 | 0009 | 1374 | 0000 | 0000 | 17A0 | FFC4 | 000F |
| 0000211620 | 17E0 | FFC4 | 0010 | 1860 | FFC4 | 0011 | 18D0 | FFC4 |
| 0000211640 | 0012 | 1980 | FFC4 | 0013 | 19A0 | FFC4 | 0014 | 19B0 |
| 0000211660 | FFC4 | 0015 | 19D0 | FFC4 | 0010 | 1A50 | FFC4 | 0017 |
| 0000211700 | 1AE0 | FFC4 | 0018 | 1BA0 | FFC4 | 0019 | 1BE0 | FFC4 |
| 0000211720 | 0017 | 1C60 | FFC4 | 001B | 1C90 | FFC4 | 001D | 1D10 |
| 0000211740 | FFC4 | 001E | 1D80 | FFC4 | 001F | 1E30 | FFC4 | 0020 |
| 0000211760 | 1E50 | FFC4 | 0021 | 1E60 | FFC4 | 0022 | 1E80 | FFC4 |
| 0000212000 | 001D | 1F00 | FFC4 | 0024 | 1F60 | FFC4 | 0025 | 2020 |
| 0000212020 | FFC4 | 0026 | 2050 | FFC4 | 0024 | 20D0 | FFC4 | 0028 |
| 0000212040 | 1386 | 0000 | 0000 | 2190 | FFC4 | 0011 | 21D0 | FFC4 |
| 0000212060 | 0012 | 22D0 | FFC4 | 0013 | 2320 | FFC4 | 0014 | 23A0 |
| 0000212100 | FFC4 | 0015 | 2410 | FFC4 | 0016 | 24F0 | FFC4 | 0017 |
| 0000212120 | 2510 | FFC4 | 0018 | 2520 | FFC4 | 0019 | 2540 | FFC4 |
| 0000212140 | 0014 | 25C0 | FFC4 | 001B | 2650 | FFC4 | 001C | 2740 |
| 0000212160 | FFC4 | 001D | 2780 | FFC4 | 001B | 2800 | FFC4 | 001F |
| 0000212200 | 2840 | FFC4 | 0021 | 28C0 | FFC4 | 0022 | 2930 | FFC4 |

THU MAR 14 17:37:32 1991 GSPMON.4 PAGE 76, LINE 4426

| | | | | | | | | |
|---|---|---|---|---|---|---|---|---|
| 0000212220 | 0023 | 2A10 | FFC4 | 0024 | 2A30 | FFC4 | 0025 | 2A40 |
| 0000212240 | FFC4 | 0026 | 2A60 | FFC4 | 0021 | 2AE0 | FFC4 | 0029 |
| 0000212260 | 2B40 | FFC4 | 002A | 2C30 | FFC4 | 002B | 2C60 | FFC4 |
| 0000212300 | 0029 | 2CE0 | FFC4 | 002D | 139A | 0000 | 0000 | 2D80 |
| 0000212320 | FFC4 | 0006 | 13A2 | 0000 | 0000 | 2F40 | FFC4 | 0007 |
| 0000212340 | 13AC | 0000 | 0000 | 3100 | FFC4 | 0007 | 1666 | 0000 |
| 0000212360 | 0000 | 32C0 | FFC4 | 0005 | 3310 | FFC4 | 000A | 3370 |
| 0000212400 | FFC4 | 000C | 3380 | FFC4 | 000F | 33D0 | FFC4 | 0010 |
| 0000212420 | 33E0 | FFC4 | 0013 | 3420 | FFC4 | 0014 | 3460 | FFC4 |
| 0000212440 | 0015 | 3470 | FFC4 | 000C | 34E0 | FFC4 | 0018 | 34E0 |
| 0000212460 | FFC4 | 001A | 34E0 | FFC4 | 001D | 3530 | FFC4 | 001E |
| 0000212500 | 3540 | FFC4 | 0021 | 3570 | FFC4 | 0022 | 35C0 | FFC4 |
| 0000212520 | 0023 | 3600 | FFC4 | 0024 | 3610 | FFC4 | 0027 | 3650 |
| 0000212540 | FFC4 | 0028 | 3690 | FFC4 | 0029 | 36A0 | FFC4 | 001A |
| 0000212560 | 3730 | FFC4 | 002F | 3770 | FFC4 | 0030 | 37B0 | FFC4 |
| 0000212600 | 0032 | 3860 | FFC4 | 0033 | 38B0 | FFC4 | 0034 | 3920 |
| 0000212620 | FFC4 | 0035 | 3990 | FFC4 | 0038 | 39F0 | FFC4 | 0039 |
| 0000212640 | 166C | 0000 | 0000 | 3A90 | FFC4 | 0004 | 3AA0 | FFC4 |
| 0000212660 | 0007 | 3B10 | FFC4 | 0008 | 3B60 | FFC4 | 0009 | 3BB0 |
| 0000212700 | FFC4 | 000A | 3BF0 | FFC4 | 000B | 3C00 | FFC4 | 000C |
| 0000212720 | 3C40 | FFC4 | 000D | 3C50 | FFC4 | 0010 | 3CD0 | FFC4 |
| 0000212740 | 0011 | 3D30 | FFC4 | 0012 | 3D90 | FFC4 | 0013 | 3DD0 |
| 0000212760 | FFC4 | 0014 | 3DE0 | FFC4 | 0015 | 3E20 | FFC4 | 0016 |
| 0000213000 | 3E30 | FFC4 | 0019 | 3EB0 | FFC4 | 001A | 3F10 | FFC4 |
| 0000213020 | 001B | 3F60 | FFC4 | 001C | 3F70 | FFC4 | 001F | 3FB0 |
| 0000213040 | FFC4 | 0020 | 3FC0 | FFC4 | 0023 | 4000 | FFC4 | 0026 |
| 0000213060 | 4010 | FFC4 | 0004 | 1672 | 0000 | 0000 | 4150 | FFC4 |
| 0000213100 | 0006 | 4160 | FFC4 | 000B | 4160 | FFC4 | 000E | 41C0 |
| 0000213120 | FFC4 | 000F | 4220 | FFC4 | 0011 | 42A0 | FFC4 | 0013 |
| 0000213140 | 42E0 | FFC4 | 0018 | 4320 | FFC4 | 001A | 4350 | FFC4 |
| 0000213160 | 001E | 4390 | FFC4 | 001F | 43D0 | FFC4 | 0023 | 43E0 |
| 0000213200 | FFC4 | 0026 | 4460 | FFC4 | 0027 | 4460 | FFC4 | 0011 |
| 0000213220 | 44B0 | FFC4 | 002A | 44C0 | FFC4 | 0006 | 45A0 | FFC4 |
| 0000213240 | 002C | 167A | 0000 | 0000 | 4670 | FFC4 | 0006 | 46A0 |
| 0000213260 | FFC4 | 0007 | 4700 | FFC4 | 0008 | 1684 | 0000 | 0000 |
| 0000213300 | 47B0 | FFC4 | 000A | 4820 | FFC4 | 000B | 48D0 | FFC4 |
| 0000213320 | 000D | 4930 | FFC4 | 0010 | 49A0 | FFC4 | 0016 | 49C0 |
| 0000213340 | FFC4 | 001A | 4A50 | FFC4 | 001C | 4BE0 | FFC4 | 0021 |
| 0000213360 | 4D80 | FFC4 | 001A | 4E30 | FFC4 | 0027 | 4E50 | FFC4 |
| 0000213400 | 002B | 4EE0 | FFC4 | 002C | 5070 | FFC4 | 0031 | 5260 |
| 0000213420 | FFC4 | 002B | 5310 | FFC4 | 0037 | 5330 | FFC4 | 003B |
| 0000213440 | 53C0 | FFC4 | 003C | 55B0 | FFC4 | 003B | 5660 | FFC4 |
| 0000213460 | 0041 | 5680 | FFC4 | 0045 | 5710 | FFC4 | 0046 | 58D0 |
| 0000213500 | FFC4 | 004D | 5AB0 | FFC4 | 0045 | 5B60 | FFC4 | 0055 |
| 0000213520 | 5B80 | FFC4 | 0059 | 5C10 | FFC4 | 005A | 5DD0 | FFC4 |
| 0000213540 | 0061 | 5FB0 | FFC4 | 0069 | 6180 | FFC4 | 0070 | 6360 |
| 0000213560 | FFC4 | 0059 | 6420 | FFC4 | 0078 | 6430 | FFC4 | 007A |
| 0000213600 | 6460 | FFC4 | 007B | 6470 | FFC4 | 007E | 64A0 | FFC4 |
| 0000213620 | 007F | 64B0 | FFC4 | 0082 | 64B0 | FFC4 | 0085 | 64B0 |
| 0000213640 | FFC4 | 0016 | 6680 | FFC4 | 0088 | 66E0 | FFC4 | 0089 |
| 0000213660 | 1690 | 0000 | 0000 | 6800 | FFC4 | 000C | 6850 | FFC4 |
| 0000213700 | 000D | 6930 | FFC4 | 000E | 6980 | FFC4 | 0011 | 69F0 |
| 0000213720 | FFC4 | 0013 | 6A50 | FFC4 | 0014 | 6AA0 | FFC4 | 0015 |
| 0000213740 | 6AF0 | FFC4 | 0016 | 6B40 | FFC4 | 0018 | 6B90 | FFC4 |
| 0000213760 | 001A | 6BD0 | FFC4 | 001B | 6C30 | FFC4 | 001C | 6C40 |
| 0000214000 | FFC4 | 001D | 6C90 | FFC4 | 001F | 6CB0 | FFC4 | 0020 |
| 0000214020 | 6D10 | FFC4 | 0021 | 6D20 | FFC4 | 0022 | 6D70 | FFC4 |
| 0000214040 | 0024 | 6E10 | FFC4 | 0025 | 6E70 | FFC4 | 0026 | 6E80 |
| 0000214060 | FFC4 | 0027 | 6ED0 | FFC4 | 0029 | 6F70 | FFC4 | 002A |

THU MAR 14 17:37:32 1991 GSPMON.4 PAGE 77, LINE 4485

| | | | | | | | | |
|---|---|---|---|---|---|---|---|---|
| 0000214100 | 6FD0 | FFC4 | 002B | 6FE0 | FFC4 | 002C | 7030 | FFC4 |
| 0000214120 | 002E | 70D0 | FFC4 | 002F | 7280 | FFC4 | 002E | 7310 |
| 0000214140 | FFC4 | 0031 | 7320 | FFC4 | 0032 | 7380 | FFC4 | 0033 |
| 0000214160 | 73C0 | FFC4 | 0035 | 7420 | FFC4 | 0036 | 7480 | FFC4 |
| 0000214200 | 0038 | 7520 | FFC4 | 0039 | 76D0 | FFC4 | 0038 | 16A2 |
| 0000214220 | 0000 | 0000 | 7800 | FFC4 | 000C | 7870 | FFC4 | 000E |
| 0000214240 | 7890 | FFC4 | 000F | 7910 | FFC4 | 0010 | 79A0 | FFC4 |
| 0000214260 | 0011 | 7A00 | FFC4 | 0012 | 7A90 | FFC4 | 0013 | 7BB0 |
| 0000214300 | FFC4 | 0012 | 7C60 | FFC4 | 000E | 7CD0 | FFC4 | 0016 |
| 0000214320 | 16B2 | 0000 | 0000 | 7DB0 | FFC4 | 0008 | 7DF0 | FFC4 |
| 0000214340 | 000A | 7E20 | FFC4 | 000B | 16BE | 0000 | 0000 | 7ED0 |
| 0000214360 | FFC4 | 000B | 7F60 | FFC4 | 000D | 7F90 | FFC4 | 000E |
| 0000214400 | 7FE0 | FFC4 | 0010 | 8050 | FFC4 | 0011 | 80C0 | FFC4 |
| 0000214420 | 0012 | 8150 | FFC4 | 0011 | 81F0 | FFC4 | 0014 | 8270 |
| 0000214440 | FFC4 | 0015 | 82F0 | FFC4 | 0010 | 16CE | 0000 | 0000 |
| 0000214460 | 83F0 | FFC4 | 0005 | 1932 | 0000 | 0000 | 84D0 | FFC4 |
| 0000214500 | 0008 | 8510 | FFC4 | 000A | 8570 | FFC4 | 000C | 85B0 |
| 0000214520 | FFC4 | 000D | 8690 | FFC4 | 000E | 193E | 0000 | 0000 |
| 0000214540 | 8730 | FFC4 | 0008 | 8770 | FFC4 | 0009 | 8780 | FFC4 |
| 0000214560 | 000C | 87E0 | FFC4 | 000D | 87F0 | FFC4 | 000F | 8850 |
| 0000214600 | FFC4 | 0010 | 8860 | FFC4 | 0012 | 88C0 | FFC4 | 0013 |
| 0000214620 | 88D0 | FFC4 | 0016 | 8930 | FFC4 | 001A | 8940 | FFC4 |
| 0000214640 | 001C | 8940 | FFC4 | 0009 | 89C0 | FFC4 | 001E | 194A |
| 0000214660 | 0000 | 0000 | 8A50 | FFC4 | 0006 | 8AD0 | FFC4 | 0007 |
| 0000214700 | 1954 | 0000 | 0000 | 8B60 | FFC4 | 000D | 8BF0 | FFC4 |
| 0000214720 | 000F | 8C20 | FFC4 | 0010 | 8C70 | FFC4 | 0011 | 8CA0 |
| 0000214740 | FFC4 | 0013 | 8D10 | FFC4 | 0014 | 8D80 | FFC4 | 0015 |
| 0000214760 | 8E80 | FFC4 | 0014 | 8F20 | FFC4 | 0017 | 8FA0 | FFC4 |
| 0000215000 | 0018 | 9020 | FFC4 | 0019 | 90A0 | FFC4 | 0013 | 9120 |
| 0000215020 | FFC4 | 001B | 196A | 0000 | 0000 | 91D0 | FFC4 | 0009 |
| 0000215040 | 9240 | FFC4 | 000A | 92F0 | FFC4 | 000C | 9350 | FFC4 |
| 0000215060 | 000E | 93C0 | FFC4 | 0014 | 9450 | FFC4 | 0015 | 94D0 |
| 0000215100 | FFC4 | 0016 | 9620 | FFC4 | 0014 | 96D0 | FFC4 | 001C |
| 0000215120 | 9730 | FFC4 | 001D | 97B0 | FFC4 | 001E | 197A | 0000 |
| 0000215140 | 0000 | 9860 | FFC4 | 0009 | 98D0 | FFC4 | 000A | 9980 |
| 0000215160 | FFC4 | 000C | 99E0 | FFC4 | 000F | 9A50 | FFC4 | 0014 |
| 0000215200 | 9AE0 | FFC4 | 0015 | 9B60 | FFC4 | 0016 | 9C20 | FFC4 |
| 0000215220 | 0019 | 9C80 | FFC4 | 001A | 9D00 | FFC4 | 001B | 9F20 |
| 0000215240 | FFC4 | 0015 | 9FD0 | FFC4 | 0014 | A040 | FFC4 | 0051 |
| 0000215260 | A0A0 | FFC4 | 0052 | A120 | FFC4 | 0053 | 198E | 0000 |
| 0000215300 | 0000 | A1D0 | FFC4 | 0009 | A240 | FFC4 | 000A | A2F0 |
| 0000215320 | FFC4 | 000C | A350 | FFC4 | 000D | A3A0 | FFC4 | 000F |
| 0000215340 | A4E0 | FFC4 | 0014 | A540 | FFC4 | 0015 | A5C0 | FFC4 |
| 0000215360 | 0016 | 19A0 | 0000 | 0000 | A660 | FFC4 | 0008 | A700 |
| 0000215400 | FFC4 | 0009 | A760 | FFC4 | 000B | A8F0 | FFC4 | 0010 |
| 0000215420 | A960 | FFC4 | 0011 | 19AC | 0000 | 0000 | A9E0 | FFC4 |
| 0000215440 | 0006 | AA10 | FFC4 | 0007 | 19B6 | 0000 | 0000 | AA80 |
| 0000215460 | FFC4 | 0004 | AAE0 | FFC4 | 0005 | 19BC | 0000 | 0000 |
| 0000215500 | AB80 | FFC4 | 0004 | 19C2 | 0000 | 0000 | AC10 | FFC4 |
| 0000215520 | 0004 | AC70 | FFC4 | 0005 | ACD0 | FFC4 | 0006 | ACE0 |
| 0000215540 | FFC4 | 0007 | 1C9C | 0000 | 0000 | AD80 | FFC4 | 0005 |
| 0000215560 | AE10 | FFC4 | 0006 | AED0 | FFC4 | 0009 | AF20 | FFC4 |
| 0000215600 | 000A | AF50 | FFC4 | 000B | AF80 | FFC4 | 000E | AFD0 |
| 0000215620 | FFC4 | 000F | B020 | FFC4 | 0010 | B030 | FFC4 | 0011 |
| 0000215640 | B070 | FFC4 | 0012 | B0C0 | FFC4 | 0015 | B120 | FFC4 |
| 0000215660 | 0016 | 1CA2 | 0000 | 0000 | B1D0 | FFC4 | 0004 | B250 |
| 0000215700 | FFC4 | 0006 | B260 | FFC4 | 000A | B2C0 | FFC4 | 000B |
| 0000215720 | B330 | FFC4 | 000C | B380 | FFC4 | 000D | B390 | FFC4 |
| 0000215740 | 0011 | B3F0 | FFC4 | 0012 | B440 | FFC4 | 0013 | B450 |

THU MAR 14 17:37:32 1991 GSPMON.4 PAGE 78, LINE 4544

| | | | | | | | | |
|---|---|---|---|---|---|---|---|---|
| 0000215760 | FFC4 | 0017 | B4B0 | FFC4 | 0018 | B4F0 | FFC4 | 0019 |
| 0000216000 | B500 | FFC4 | 001D | B560 | FFC4 | 001E | B700 | FFC4 |
| 0000216020 | 0022 | B7A0 | FFC4 | 0023 | B7F0 | FFC4 | 0025 | B800 |
| 0000216040 | FFC4 | 0028 | B860 | FFC4 | 0029 | B8D0 | FFC4 | 002A |
| 0000216060 | B920 | FFC4 | 002B | B970 | FFC4 | 002D | B980 | FFC4 |
| 0000216100 | 0030 | B980 | FFC4 | 0006 | 1CA8 | 0000 | 0000 | 1CAE |
| 0000216120 | 0000 | 0000 | BAA0 | FFC4 | 0005 | BAF0 | FFC4 | 0006 |
| 0000216140 | BB50 | FFC4 | 0007 | BBB0 | FFC4 | 0008 | 1CB6 | 0000 |
| 0000216160 | 0000 | 1CBC | 0000 | 0000 | 1CC2 | 0000 | 0000 | BCB0 |
| 0000216200 | FFC4 | 0005 | BD00 | FFC4 | 0006 | BDA0 | FFC4 | 0007 |
| 0000216220 | BE00 | FFC4 | 0008 | 1CCA | 0000 | 0000 | BEC0 | FFC4 |
| 0000216240 | 0005 | 1CD0 | 0000 | 0000 | 1CD6 | 0000 | 0000 | BF70 |
| 0000216260 | FFC4 | 0004 | C000 | FFC4 | 0005 | C0C0 | FFC4 | 0007 |
| 0000216300 | C110 | FFC4 | 0008 | C140 | FFC4 | 0009 | C180 | FFC4 |
| 0000216320 | 000A | C1C0 | FFC4 | 000B | C1F0 | FFC4 | 000C | C250 |
| 0000216340 | FFC4 | 000D | C2A0 | FFC4 | 000E | C2F0 | FFC4 | 000F |
| 0000216360 | C300 | FFC4 | 0011 | C350 | FFC4 | 0012 | C3A0 | FFC4 |
| 0000216400 | 0015 | C400 | FFC4 | 0016 | 1CDC | 0000 | 0000 | C4B0 |
| 0000216420 | FFC4 | 0004 | C4D0 | FFC4 | 0008 | C530 | FFC4 | 0009 |
| 0000216440 | C560 | FFC4 | 000A | C5B0 | FFC4 | 000B | C5D0 | FFC4 |
| 0000216460 | 000F | C630 | FFC4 | 0010 | C680 | FFC4 | 0011 | C6A0 |
| 0000216500 | FFC4 | 0015 | C700 | FFC4 | 0016 | C740 | FFC4 | 0017 |
| 0000216520 | C760 | FFC4 | 001B | C7C0 | FFC4 | 001C | C850 | FFC4 |
| 0000216540 | 001E | C8C0 | FFC4 | 001F | C910 | FFC4 | 0021 | C960 |
| 0000216560 | FFC4 | 0023 | C9A0 | FFC4 | 0024 | CA00 | FFC4 | 0025 |
| 0000216600 | CA60 | FFC4 | 0026 | CABD | FFC4 | 0028 | CADO | FFC4 |
| 0000216620 | 002A | CB30 | FFC4 | 002B | CB80 | FFC4 | 002C | CBA0 |
| 0000216640 | FFC4 | 002F | CBA0 | FFC4 | 0030 | CBF0 | FFC4 | 0032 |
| 0000216660 | CC10 | FFC4 | 0035 | CC70 | FFC4 | 0036 | CCA0 | FFC4 |
| 0000216700 | 0037 | CCF0 | FFC4 | 0039 | CD10 | FFC4 | 003C | CDD0 |
| 0000216720 | FFC4 | 003D | CE30 | FFC4 | 003E | CE80 | FFC4 | 003F |
| 0000216740 | CEE0 | FFC4 | 0040 | CF90 | FFC4 | 0041 | CFE0 | FFC4 |
| 0000216760 | 0042 | D000 | FFC4 | 0045 | D060 | FFC4 | 0046 | D0F0 |
| 0000217000 | FFC4 | 0048 | D160 | FFC4 | 0049 | D1A0 | FFC4 | 004B |
| 0000217020 | D200 | FFC4 | 004C | D250 | FFC4 | 004E | D290 | FFC4 |
| 0000217040 | 004F | D2D0 | FFC4 | 0051 | D2E0 | FFC4 | 0053 | D360 |
| 0000217060 | FFC4 | 0054 | D3D0 | FFC4 | 0055 | D430 | FFC4 | 0056 |
| 0000217100 | D480 | FFC4 | 005A | D490 | FFC4 | 005D | D4F0 | FFC4 |
| 0000217120 | 005E | D550 | FFC4 | 005F | D580 | FFC4 | 0060 | D5D0 |
| 0000217140 | FFC4 | 0061 | D620 | FFC4 | 0063 | D630 | FFC4 | 0067 |
| 0000217160 | D690 | FFC4 | 0068 | D6E0 | FFC4 | 0069 | D730 | FFC4 |
| 0000217200 | 006A | D740 | FFC4 | 006D | D740 | FFC4 | 0004 | 1CE2 |
| 0000217220 | 0000 | 0000 | D960 | FFC4 | 0004 | D9B0 | FFC4 | 0006 |
| 0000217240 | DA10 | FFC4 | 0007 | DA50 | FFC4 | 0009 | DAA0 | FFC4 |
| 0000217260 | 000A | DAF0 | FFC4 | 000B | DB30 | FFC4 | 000C | DBF0 |
| 0000217300 | FFC4 | 000D | DC20 | FFC4 | 000E | DC30 | FFC4 | 0010 |
| 0000217320 | DC70 | FFC4 | 0012 | DCB0 | FFC4 | 0014 | DD00 | FFC4 |
| 0000217340 | 0015 | DD50 | FFC4 | 0016 | DDB0 | FFC4 | 0017 | DDF0 |
| 0000217360 | FFC4 | 0018 | DE80 | FFC4 | 001A | DF40 | FFC4 | 001B |
| 0000217400 | DF70 | FFC4 | 001C | DF80 | FFC4 | 0020 | E040 | FFC4 |
| 0000217420 | 0024 | E0A0 | FFC4 | 0028 | E130 | FFC4 | 0029 | E160 |
| 0000217440 | FFC4 | 002A | 1CE8 | 0000 | 0000 | E1C0 | FFC4 | 0005 |
| 0000217460 | E250 | FFC4 | 0006 | E310 | FFC4 | 0008 | E360 | FFC4 |
| 0000217500 | 0009 | E390 | FFC4 | 000A | E3F0 | FFC4 | 000B | E440 |
| 0000217520 | FFC4 | 000E | E4C0 | FFC4 | 000F | E510 | FFC4 | 0010 |
| 0000217540 | E520 | FFC4 | 0011 | E570 | FFC4 | 0015 | E580 | FFC4 |
| 0000217560 | 0017 | E5D0 | FFC4 | 0018 | E620 | FFC4 | 001A | E670 |
| 0000217600 | FFC4 | 001C | E6D0 | FFC4 | 001D | 1CF0 | 0000 | 0000 |
| 0000217620 | E7A0 | FFC4 | 0004 | E7B0 | FFC4 | 0008 | E810 | FFC4 |

THU MAR 14 17:37:32 1991 GSPMON.4 PAGE 79, LINE 4603

| | | | | | | | | |
|---|---|---|---|---|---|---|---|---|
| 0000217640 | 0009 | E840 | FFC4 | 000A | E890 | FFC4 | 000B | E8A0 |
| 0000217660 | FFC4 | 000F | E900 | FFC4 | 0010 | E950 | FFC4 | 0011 |
| 0000217700 | E960 | FFC4 | 0015 | E9C0 | FFC4 | 0016 | EA00 | FFC4 |
| 0000217720 | 0017 | EA10 | FFC4 | 001B | EA70 | FFC4 | 001C | EB00 |
| 0000217740 | FFC4 | 001E | EB70 | FFC4 | 001F | EBC0 | FFC4 | 0022 |
| 0000217760 | EC20 | FFC4 | 0023 | EC70 | FFC4 | 0024 | EC80 | FFC4 |
| 0000220000 | 0027 | ECD0 | FFC4 | 0029 | ECE0 | FFC4 | 002B | ED30 |
| 0000220020 | FFC4 | 002D | ED40 | FFC4 | 0031 | EDA0 | FFC4 | 0032 |
| 0000220040 | EDF0 | FFC4 | 0033 | EE40 | FFC4 | 0034 | EE50 | FFC4 |
| 0000220060 | 0037 | EE50 | FFC4 | 0004 | 1CF6 | 0000 | 0000 | EF70 |
| 0000220100 | FFC4 | 0006 | EFC0 | FFC4 | 0008 | F020 | FFC4 | 0009 |
| 0000220120 | F060 | FFC4 | 000B | F0E0 | FFC4 | 000C | F130 | FFC4 |
| 0000220140 | 000D | F180 | FFC4 | 000E | F1D0 | FFC4 | 0010 | F250 |
| 0000220160 | FFC4 | 0013 | F280 | FFC4 | 0014 | F2D0 | FFC4 | 0015 |
| 0000220200 | F390 | FFC4 | 0016 | F3C0 | FFC4 | 0017 | F3D0 | FFC4 |
| 0000220220 | 0019 | F420 | FFC4 | 001D | F4B0 | FFC4 | 001E | F4E0 |
| 0000220240 | FFC4 | 001F | 1CFE | 0000 | 0000 | F530 | FFC4 | 0004 |
| 0000220260 | F5C0 | FFC4 | 0005 | F680 | FFC4 | 0007 | F6D0 | FFC4 |
| 0000220300 | 0008 | F700 | FFC4 | 0009 | F760 | FFC4 | 000A | F7B0 |
| 0000220320 | FFC4 | 000D | F830 | FFC4 | 000E | F380 | FFC4 | 000F |
| 0000220340 | F890 | FFC4 | 0010 | F8E0 | FFC4 | 0014 | F8F0 | FFC4 |
| 0000220360 | 0016 | F940 | FFC4 | 0017 | F990 | FFC4 | 001A | F9F0 |
| 0000220400 | FFC4 | 001B | 1D04 | 0000 | 0000 | FAA0 | FFC4 | 0004 |
| 0000220420 | FAF0 | FFC4 | 0006 | FB50 | FFC4 | 0007 | FB90 | FFC4 |
| 0000220440 | 0009 | FC10 | FFC4 | 000C | FC40 | FFC4 | 000D | FC90 |
| 0000220460 | FFC4 | 000E | FD50 | FFC4 | 000F | FD80 | FFC4 | 0010 |
| 0000220500 | FD90 | FFC4 | 0012 | FDE0 | FFC4 | 0016 | FE70 | FFC4 |
| 0000220520 | 0017 | FEA0 | FFC4 | 0018 | 1D0A | 0000 | 0000 | FF00 |
| 0000220540 | FFC4 | 0006 | FF90 | FFC4 | 0007 | 0050 | FFC5 | 0009 |
| 0000220560 | 00A0 | FFC5 | 000A | 00D0 | FFC5 | 000B | 0130 | FFC5 |
| 0000220600 | 000C | 0180 | FFC5 | 000D | 01D0 | FFC5 | 000E | 01E0 |
| 0000220620 | FFC5 | 0010 | 0230 | FFC5 | 0011 | 0280 | FFC5 | 0013 |
| 0000220640 | 02D0 | FFC5 | 0014 | 0320 | FFC5 | 0016 | 0380 | FFC5 |
| 0000220660 | 0017 | 1D14 | 0000 | 0000 | 0450 | FFC5 | 0004 | 0460 |
| 0000220700 | FFC5 | 0008 | 04C0 | FFC5 | 0009 | 04F0 | FFC5 | 000A |
| 0000220720 | 0540 | FFC5 | 000B | 0550 | FFC5 | 000F | 05B0 | FFC5 |
| 0000220740 | 0010 | 0600 | FFC5 | 0011 | 0610 | FFC5 | 0015 | 0670 |
| 0000220760 | FFC5 | 0016 | 06B0 | FFC5 | 0017 | 06C0 | FFC5 | 001B |
| 0000221000 | 0720 | FFC5 | 001C | 07B0 | FFC5 | 001E | 0820 | FFC5 |
| 0000221020 | 001F | 0870 | FFC5 | 0022 | 08D0 | FFC5 | 0023 | 0920 |
| 0000221040 | FFC5 | 0024 | 0930 | FFC5 | 0027 | 0980 | FFC5 | 0029 |
| 0000221060 | 0990 | FFC5 | 002B | 09E0 | FFC5 | 002D | 09F0 | FFC5 |
| 0000221100 | 0031 | 0A50 | FFC5 | 0032 | 0AA0 | FFC5 | 0033 | 0AF0 |
| 0000221120 | FFC5 | 0034 | 0B00 | FFC5 | 0037 | 0B00 | FFC5 | 0004 |
| 0000221140 | 1D1A | 0000 | 0000 | 0C20 | FFC5 | 0006 | 0C70 | FFC5 |
| 0000221160 | 0008 | 0CD0 | FFC5 | 0009 | 0D10 | FFC5 | 000D | 0D90 |
| 0000221200 | FFC5 | 000E | 0DE0 | FFC5 | 000F | 0E30 | FFC5 | 0010 |
| 0000221220 | 0E80 | FFC5 | 0011 | 0EF0 | FFC5 | 0012 | 0F70 | FFC5 |
| 0000221240 | 0013 | 0FF0 | FFC5 | 0014 | 1070 | FFC5 | 0016 | 10F0 |
| 0000221260 | FFC5 | 0019 | 1120 | FFC5 | 001A | 1170 | FFC5 | 001B |
| 0000221300 | 1230 | FFC5 | 001C | 1260 | FFC5 | 001D | 1270 | FFC5 |
| 0000221320 | 0020 | 12C0 | FFC5 | 0024 | 1350 | FFC5 | 0025 | 1380 |
| 0000221340 | FFC5 | 0026 | 1D22 | 0000 | 0000 | 13D0 | FFC5 | 0004 |
| 0000221360 | 1460 | FFC5 | 0005 | 14D0 | FFC5 | 0006 | 1510 | FFC5 |
| 0000221400 | 0007 | 1540 | FFC5 | 0008 | 1570 | FFC5 | 000A | 15C0 |
| 0000221420 | FFC5 | 000C | 1600 | FFC5 | 000D | 1630 | FFC5 | 000E |
| 0000221440 | 1660 | FFC5 | 000F | 16B0 | FFC5 | 0010 | 1700 | FFC5 |
| 0000221460 | 0011 | 1750 | FFC5 | 0012 | 1790 | FFC5 | 0013 | 17C0 |
| 0000221500 | FFC5 | 0014 | 17F0 | FFC5 | 0015 | 1820 | FFC5 | 0016 |

THU MAR 14 17:37:32 1991 GSPMON.4 PAGE 80, LINE 4662

| | | | | | | | | |
|---|---|---|---|---|---|---|---|---|
| 0000221520 | 1850 | FFC5 | 0017 | 1880 | FFC5 | 001B | 18F0 | FFC5 |
| 0000221540 | 001D | 1950 | FFC5 | 001E | 19A0 | FFC5 | 0020 | 1A00 |
| 0000221560 | FFC5 | 0021 | 1D28 | 0000 | 0000 | 1AB0 | FFC5 | 0004 |
| 0000221600 | 1AD0 | FFC5 | 0008 | 1B30 | FFC5 | 000A | 1B70 | FFC5 |
| 0000221620 | 000B | 1BC0 | FFC5 | 000C | 1BE0 | FFC5 | 000F | 1C20 |
| 0000221640 | FFC5 | 0010 | 1CC0 | FFC5 | 0013 | 1D00 | FFC5 | 0015 |
| 0000221660 | 1D40 | FFC5 | 0016 | 1D70 | FFC5 | 0017 | 1DC0 | FFC5 |
| 0000221700 | 0019 | 1E10 | FFC5 | 001A | 1E80 | FFC5 | 001B | 1ED0 |
| 0000221720 | FFC5 | 001D | 1FB0 | FFC5 | 001F | 2000 | FFC5 | 0020 |
| 0000221740 | 2050 | FFC5 | 0022 | 2060 | FFC5 | 0024 | 20B0 | FFC5 |
| 0000221760 | 0025 | 2100 | FFC5 | 0026 | 2150 | FFC5 | 0028 | 21B0 |
| 0000222000 | FFC5 | 0029 | 2200 | FFC5 | 002A | 22B0 | FFC5 | 002B |
| 0000222020 | 2330 | FFC5 | 002C | 23D0 | FFC5 | 0030 | 2410 | FFC5 |
| 0000222040 | 0031 | 2470 | FFC5 | 0032 | 2490 | FFC5 | 0033 | 24F0 |
| 0000222060 | FFC5 | 0035 | 2510 | FFC5 | 0037 | 2550 | FFC5 | 0038 |
| 0000222100 | 25B0 | FFC5 | 0039 | 25C0 | FFC5 | 003A | 2620 | FFC5 |
| 0000222120 | 003B | 2670 | FFC5 | 003D | 26B0 | FFC5 | 003E | 2700 |
| 0000222140 | FFC5 | 0040 | 2740 | FFC5 | 0042 | 2780 | FFC5 | 0043 |
| 0000222160 | 27D0 | FFC5 | 0045 | 27F0 | FFC5 | 0047 | 28F0 | FFC5 |
| 0000222200 | 0049 | 2960 | FFC5 | 004A | 29C0 | FFC5 | 004C | 2A10 |
| 0000222220 | FFC5 | 004E | 2A80 | FFC5 | 0051 | 2AE0 | FFC5 | 0052 |
| 0000222240 | 2B90 | FFC5 | 0054 | 2BE0 | FFC5 | 0055 | 2CA0 | FFC5 |
| 0000222260 | 0056 | 2D20 | FFC5 | 0057 | 2DC0 | FFC5 | 005B | 2E00 |
| 0000222300 | FFC5 | 005C | 2E60 | FFC5 | 005D | 2E70 | FFC5 | 005E |
| 0000222320 | 2ED0 | FFC5 | 0062 | 2F20 | FFC5 | 0067 | 2F70 | FFC5 |
| 0000222340 | 006A | 3060 | FFC5 | 006C | 30B0 | FFC5 | 006D | 30E0 |
| 0000222360 | FFC5 | 0071 | 3100 | FFC5 | 0073 | 3140 | FFC5 | 0074 |
| 0000222400 | 3190 | FFC5 | 0075 | 31E0 | FFC5 | 0076 | 3220 | FFC5 |
| 0000222420 | 007A | 3230 | FFC5 | 007F | 3290 | FFC5 | 0080 | 32D0 |
| 0000222440 | FFC5 | 0081 | 3320 | FFC5 | 0082 | 3330 | FFC5 | 0083 |
| 0000222460 | 3380 | FFC5 | 0084 | 33D0 | FFC5 | 0085 | 33E0 | FFC5 |
| 0000222500 | 008A | 3420 | FFC5 | 008B | 3480 | FFC5 | 008C | 3490 |
| 0000222520 | FFC5 | 008D | 34F0 | FFC5 | 008E | 3550 | FFC5 | 008F |
| 0000222540 | 3620 | FFC5 | 0090 | 3670 | FFC5 | 0091 | 3680 | FFC5 |
| 0000222560 | 0092 | 36D0 | FFC5 | 0093 | 3720 | FFC5 | 0094 | 3730 |
| 0000222600 | FFC5 | 0098 | 3790 | FFC5 | 0099 | 37E0 | FFC5 | 009A |
| 0000222620 | 3830 | FFC5 | 009B | 3840 | FFC5 | 009E | 3840 | FFC5 |
| 0000222640 | 0004 | 1D2E | 0000 | 0000 | 39B0 | FFC5 | 0004 | 3A00 |
| 0000222660 | FFC5 | 0007 | 3AE0 | FFC5 | 000A | 3BC0 | FFC5 | 000F |
| 0000222700 | 3C50 | FFC5 | 0013 | 3C90 | FFC5 | 0015 | 3DE0 | FFC5 |
| 0000222720 | 0017 | 3EA0 | FFC5 | 0018 | 3ED0 | FFC5 | 0019 | 3EF0 |
| 0000222740 | FFC5 | 001B | 3F40 | FFC5 | 001D | 3F70 | FFC5 | 0020 |
| 0000222760 | 4000 | FFC5 | 0021 | 4030 | FFC5 | 0022 | 4050 | FFC5 |
| 0000223000 | 0024 | 4090 | FFC5 | 0026 | 40F0 | FFC5 | 0027 | 4130 |
| 0000223020 | FFC5 | 0029 | 4170 | FFC5 | 002A | 41C0 | FFC5 | 002B |
| 0000223040 | 41D0 | FFC5 | 002C | 4200 | FFC5 | 002D | 42C0 | FFC5 |
| 0000223060 | 002E | 4300 | FFC5 | 002F | 43C0 | FFC5 | 0031 | 4420 |
| 0000223100 | FFC5 | 0033 | 44D0 | FFC5 | 0036 | 4580 | FFC5 | 0039 |
| 0000223120 | 4690 | FFC5 | 003E | 4750 | FFC5 | 003F | 4780 | FFC5 |
| 0000223140 | 0040 | 47A0 | FFC5 | 0042 | 4800 | FFC5 | 0043 | 4840 |
| 0000223160 | FFC5 | 0045 | 4880 | FFC5 | 0046 | 48D0 | FFC5 | 0047 |
| 0000223200 | 48E0 | FFC5 | 0048 | 4910 | FFC5 | 0049 | 4970 | FFC5 |
| 0000223220 | 004A | 49B0 | FFC5 | 004B | 4A70 | FFC5 | 004D | 4AD0 |
| 0000223240 | FFC5 | 004F | 4B10 | FFC5 | 0051 | 4B50 | FFC5 | 0052 |
| 0000223260 | 4BA0 | FFC5 | 0053 | 4BB0 | FFC5 | 0054 | 4BE0 | FFC5 |
| 0000223300 | 0055 | 4C40 | FFC5 | 0056 | 4C80 | FFC5 | 0057 | 4D40 |
| 0000223320 | FFC5 | 005C | 4D90 | FFC5 | 0060 | 4E30 | FFC5 | 0061 |
| 0000223340 | 4E90 | FFC5 | 0063 | 4FC0 | FFC5 | 0068 | 5030 | FFC5 |
| 0000223360 | 0069 | 5080 | FFC5 | 006B | 50D0 | FFC5 | 006F | 5170 |

THU MAR 14 17:37:32 1991 GSPMON.4 PAGE 81, LINE 4721

| | | | | | | | | |
|---|---|---|---|---|---|---|---|---|
| 0000223400 | FFC5 | 0070 | 51D0 | FFC5 | 0072 | 5330 | FFC5 | 0077 |
| 0000223420 | 53A0 | FFC5 | 0078 | 1D40 | 0000 | 0000 | 5450 | FFC5 |
| 0000223440 | 0004 | 54E0 | FFC5 | 0005 | 55A0 | FFC5 | 0007 | 55E0 |
| 0000223460 | FFC5 | 0009 | 5620 | FFC5 | 000A | 5650 | FFC5 | 000B |
| 0000223500 | 5680 | FFC5 | 000C | 56B0 | FFC5 | 0010 | 5720 | FFC5 |
| 0000223520 | 0012 | 5780 | FFC5 | 0013 | 57D0 | FFC5 | 0015 | 5830 |
| 0000223540 | FFC5 | 0016 | 1D46 | 0000 | 0000 | 58E0 | FFC5 | 0004 |
| 0000223560 | 58F0 | FFC5 | 0008 | 5950 | FFC5 | 0009 | 59A0 | FFC5 |
| 0000223600 | 000A | 59B0 | FFC5 | 000E | 5A10 | FFC5 | 0010 | 5A50 |
| 0000223620 | FFC5 | 0011 | 5AA0 | FFC5 | 0012 | 5AB0 | FFC5 | 0016 |
| 0000223640 | 5B10 | FFC5 | 0017 | 5BA0 | FFC5 | 0019 | 5C10 | FFC5 |
| 0000223660 | 001A | 5C60 | FFC5 | 001C | 5CB0 | FFC5 | 001F | 5D10 |
| 0000223700 | FFC5 | 0020 | 5D60 | FFC5 | 0021 | 5D70 | FFC5 | 0024 |
| 0000223720 | 5D70 | FFC5 | 0025 | 5DC0 | FFC5 | 0027 | 5DD0 | FFC5 |
| 0000223740 | 0029 | 5E20 | FFC5 | 002A | 5E60 | FFC5 | 002C | 5E70 |
| 0000223760 | FFC5 | 0031 | 5EB0 | FFC5 | 0032 | 5F00 | FFC5 | 0033 |
| 0000224000 | 5F10 | FFC5 | 0036 | 5F10 | FFC5 | 0004 | 1D4C | 0000 |
| 0000224020 | 0000 | 6010 | FFC5 | 0007 | 6060 | FFC5 | 0009 | 60C0 |
| 0000224040 | FFC5 | 000B | 6110 | FFC5 | 000D | 6160 | FFC5 | 000F |
| 0000224060 | 61B0 | FFC5 | 0012 | 6230 | FFC5 | 0014 | 62D0 | FFC5 |
| 0000224100 | 0017 | 6300 | FFC5 | 0018 | 6390 | FFC5 | 001A | 63C0 |
| 0000224120 | FFC5 | 001B | 63D0 | FFC5 | 001F | 6420 | FFC5 | 0020 |
| 0000224140 | 6460 | FFC5 | 0021 | 6490 | FFC5 | 0025 | 64F0 | FFC5 |
| 0000224160 | 0028 | 65D0 | FFC5 | 002B | 66B0 | FFC5 | 002E | 6710 |
| 0000224200 | FFC5 | 0030 | 67D0 | FFC5 | 0031 | 6800 | FFC5 | 0032 |
| 0000224220 | 1D54 | 0000 | 0000 | 6850 | FFC5 | 0004 | 68E0 | FFC5 |
| 0000224240 | 0005 | 69A0 | FFC5 | 0007 | 69E0 | FFC5 | 0009 | 6A20 |
| 0000224260 | FFC5 | 000A | 6A50 | FFC5 | 000B | 6A80 | FFC5 | 000C |
| 0000224300 | 6AB0 | FFC5 | 0010 | 6B20 | FFC5 | 0012 | 6B80 | FFC5 |
| 0000224320 | 0013 | 6BD0 | FFC5 | 0015 | 6C30 | FFC5 | 0016 | 1D5A |
| 0000224340 | 0000 | 0000 | 6D00 | FFC5 | 0006 | 6D50 | FFC5 | 000C |
| 0000224360 | 6E40 | FFC5 | 000F | 6E90 | FFC5 | 0011 | 6F60 | FFC5 |
| 0000224400 | 0014 | 6F90 | FFC5 | 0015 | 7020 | FFC5 | 0017 | 7050 |
| 0000224420 | FFC5 | 0018 | 7060 | FFC5 | 001C | 70B0 | FFC5 | 001D |
| 0000224440 | 70F0 | FFC5 | 001E | 7120 | FFC5 | 0022 | 7180 | FFC5 |
| 0000224460 | 0025 | 7260 | FFC5 | 0028 | 7340 | FFC5 | 002B | 73A0 |
| 0000224500 | FFC5 | 002D | 7460 | FFC5 | 002E | 7490 | FFC5 | 002F |
| 0000224520 | 1D68 | 0000 | 0000 | 74F0 | FFC5 | 0004 | 7580 | FFC5 |
| 0000224540 | 0005 | 7640 | FFC5 | 0007 | 7690 | FFC5 | 0008 | 76E0 |
| 0000224560 | FFC5 | 000A | 7720 | FFC5 | 000B | 7750 | FFC5 | 000C |
| 0000224600 | 7780 | FFC5 | 000D | 77B0 | FFC5 | 000E | 77F0 | FFC5 |
| 0000224620 | 000F | 7820 | FFC5 | 0010 | 7860 | FFC5 | 0014 | 78D0 |
| 0000224640 | FFC5 | 0016 | 7930 | FFC5 | 0017 | 7980 | FFC5 | 0019 |
| 0000224660 | 79E0 | FFC5 | 001A | 1D6E | 0000 | 0000 | 7A90 | FFC5 |
| 0000224700 | 0004 | 7AB0 | FFC5 | 0008 | 7B10 | FFC5 | 0009 | 7B60 |
| 0000224720 | FFC5 | 000A | 7B80 | FFC5 | 000E | 7BE0 | FFC5 | 0010 |
| 0000224740 | 7C20 | FFC5 | 0011 | 7C70 | FFC5 | 0012 | 7C90 | FFC5 |
| 0000224760 | 0016 | 7CFC | FFC5 | 0017 | 7D80 | FFC5 | 0019 | 7DD0 |
| 0000225000 | FFC5 | 001A | 7E40 | FFC5 | 001B | 7E90 | FFC5 | 001D |
| 0000225020 | 7EE0 | FFC5 | 0020 | 7F40 | FFC5 | 0021 | 7F90 | FFC5 |
| 0000225040 | 0022 | 7FB0 | FFC5 | 0025 | 7FB0 | FFC5 | 0026 | 8000 |
| 0000225060 | FFC5 | 0028 | 8020 | FFC5 | 002A | 8070 | FFC5 | 002B |
| 0000225100 | 80B0 | FFC5 | 002D | 80D0 | FFC5 | 0030 | 8190 | FFC5 |
| 0000225120 | 0031 | 81F0 | FFC5 | 0032 | 8240 | FFC5 | 0033 | 8290 |
| 0000225140 | FFC5 | 0034 | 82B0 | FFC5 | 0036 | 8300 | FFC5 | 0037 |
| 0000225160 | 8350 | FFC5 | 0039 | 8370 | FFC5 | 003C | 83D0 | FFC5 |
| 0000225200 | 003D | 8460 | FFC5 | 003F | 84D0 | FFC5 | 0040 | 8530 |
| 0000225220 | FFC5 | 0042 | 8580 | FFC5 | 0044 | 85E0 | FFC5 | 0045 |
| 0000225240 | 8660 | FFC5 | 0046 | 86D0 | FFC5 | 0047 | 8730 | FFC5 |

THU MAR 14 17:37:32 1991 GSPMON.4 PAGE 82, LINE 4780

| | | | | | | | | |
|---|---|---|---|---|---|---|---|---|
| 0000225260 | 0048 | 8780 | FFC5 | 004C | 8790 | FFC5 | 004F | 87F0 |
| 0000225300 | FFC5 | 0050 | 8820 | FFC5 | 0051 | 8870 | FFC5 | 0052 |
| 0000225320 | 88B0 | FFC5 | 0054 | 88C0 | FFC5 | 0058 | 8910 | FFC5 |
| 0000225340 | 005A | 8970 | FFC5 | 005B | 89C0 | FFC5 | 005D | 89D0 |
| 0000225360 | FFC5 | 005F | 8A10 | FFC5 | 0060 | 8A70 | FFC5 | 0061 |
| 0000225400 | 8AD0 | FFC5 | 0062 | 8B20 | FFC5 | 0064 | 8B70 | FFC5 |
| 0000225420 | 0065 | 8B80 | FFC5 | 0068 | 8B80 | FFC5 | 0004 | 1D74 |
| 0000225440 | 0000 | 0000 | 8DA0 | FFC5 | 0007 | 8DF0 | FFC5 | 0009 |
| 0000225460 | 8E50 | FFC5 | 000B | 8EA0 | FFC5 | 000D | 8EF0 | FFC5 |
| 0000225500 | 000F | 8F40 | FFC5 | 0011 | 8F90 | FFC5 | 0013 | 8FE0 |
| 0000225520 | FFC5 | 0015 | 9030 | FFC5 | 0017 | 9080 | FFC5 | 001B |
| 0000225540 | 9100 | FFC5 | 001D | 91A0 | FFC5 | 001F | 91D0 | FFC5 |
| 0000225560 | 0020 | 9260 | FFC5 | 0022 | 9290 | FFC5 | 0023 | 92B0 |
| 0000225600 | FFC5 | 0027 | 9300 | FFC5 | 0028 | 9350 | FFC5 | 002A |
| 0000225620 | 93A0 | FFC5 | 002B | 93D0 | FFC5 | 002D | 93F0 | FFC5 |
| 0000225640 | 002F | 9440 | FFC5 | 0030 | 94A0 | FFC5 | 0031 | 94F0 |
| 0000225660 | FFC5 | 0032 | 95B0 | FFC5 | 0038 | 9610 | FFC5 | 003B |
| 0000225700 | 96C0 | FFC5 | 003E | 97A0 | FFC5 | 0041 | 9880 | FFC5 |
| 0000225720 | 0046 | 9940 | FFC5 | 0047 | 9970 | FFC5 | 0048 | 9990 |
| 0000225740 | FFC5 | 004B | 99E0 | FFC5 | 004D | 9A30 | FFC5 | 004E |
| 0000225760 | 9A90 | FFC5 | 004F | 9AD0 | FFC5 | 0050 | 9B90 | FFC5 |
| 0000226000 | 0052 | 9C30 | FFC5 | 0054 | 9C80 | FFC5 | 0055 | 9CB0 |
| 0000226020 | FFC5 | 0057 | 9CD0 | FFC5 | 0058 | 9D30 | FFC5 | 005B |
| 0000226040 | 9D90 | FFC5 | 005E | 9E70 | FFC5 | 0061 | 9F50 | FFC5 |
| 0000226060 | 0064 | 9FF0 | FFC5 | 0066 | A040 | FFC5 | 0067 | A0A0 |
| 0000226100 | FFC5 | 0068 | A160 | FFC5 | 0069 | A200 | FFC5 | 006A |
| 0000226120 | A250 | FFC5 | 006B | A2A0 | FFC5 | 006D | A3F0 | FFC5 |
| 0000226140 | 006E | A4B0 | FFC5 | 006F | A4E0 | FFC5 | 0070 | 1D7C |
| 0000226160 | 0000 | 0000 | A560 | FFC5 | 000F | A5C0 | FFC5 | 0010 |
| 0000226200 | A5F0 | FFC5 | 0011 | A620 | FFC5 | 0012 | A650 | FFC5 |
| 0000226220 | 0015 | A6C0 | FFC5 | 0017 | A860 | FFC5 | 0019 | A940 |
| 0000226240 | FFC5 | 001B | A990 | FFC5 | 001C | AA50 | FFC5 | 001E |
| 0000226260 | AA60 | FFC5 | 0020 | AAA0 | FFC5 | 0021 | ACA0 | FFC5 |
| 0000226300 | 0025 | ACB0 | FFC5 | 0026 | AEB0 | FFC5 | 002B | AEE0 |
| 0000226320 | FFC5 | 002C | AF60 | FFC5 | 002D | AFE0 | FFC5 | 002F |
| 0000226340 | B0F0 | FFC5 | 0030 | B120 | FFC5 | 0031 | B1A0 | FFC5 |
| 0000226360 | 002D | B260 | FFC5 | 0033 | B3E0 | FFC5 | 0035 | 1D96 |
| 0000226400 | 0000 | 0000 | B5A0 | FFC5 | 001B | B640 | FFC5 | 001D |
| 0000226420 | B670 | FFC5 | 001E | B690 | FFC5 | 0020 | B6B0 | FFC5 |
| 0000226440 | 0021 | B6D0 | FFC5 | 0023 | B710 | FFC5 | 0024 | B740 |
| 0000226460 | FFC5 | 0026 | B7D0 | FFC5 | 0028 | B810 | FFC5 | 0029 |
| 0000226500 | B840 | FFC5 | 002B | B870 | FFC5 | 002C | B8A0 | FFC5 |
| 0000226520 | 002E | B8F0 | FFC5 | 002F | B910 | FFC5 | 0031 | BB70 |
| 0000226540 | FFC5 | 0035 | BB90 | FFC5 | 0037 | BC10 | FFC5 | 0039 |
| 0000226560 | BCE0 | FFC5 | 003B | BD70 | FFC5 | 003D | BE00 | FFC5 |
| 0000226600 | 003F | BE70 | FFC5 | 0041 | BED0 | FFC5 | 0042 | C110 |
| 0000226620 | FFC5 | 0044 | C120 | FFC5 | 0045 | C320 | FFC5 | 0047 |
| 0000226640 | C3A0 | FFC5 | 003F | C430 | FFC5 | 0049 | C4C0 | FFC5 |
| 0000226660 | 004A | C4E0 | FFC5 | 003D | C590 | FFC5 | 003B | 1DBE |
| 0000226700 | 0000 | 0000 | C6D0 | FFC5 | 000A | C8D0 | FFC5 | 000C |
| 0000226720 | C950 | FFC5 | 000D | CA40 | FFC5 | 000F | CAA0 | FFC5 |
| 0000226740 | 0010 | CBC0 | FFC5 | 0013 | CCA0 | FFC5 | 0016 | CD50 |
| 0000226760 | FFC5 | 0018 | CDF0 | FFC5 | 001A | CE90 | FFC5 | 001C |
| 0000227000 | CF00 | FFC5 | 001D | D030 | FFC5 | 001F | D070 | FFC5 |
| 0000227020 | 0020 | D260 | FFC5 | 0022 | D270 | FFC5 | 0023 | D410 |
| 0000227040 | FFC5 | 0025 | D470 | FFC5 | 001A | D530 | FFC5 | 0027 |
| 0000227060 | D6F0 | FFC5 | 0029 | D770 | FFC5 | 0018 | D830 | FFC5 |
| 0000227100 | 0016 | D8F0 | FFC5 | 002C | D980 | FFC5 | 002D | D9D0 |
| 0000227120 | FFC5 | 002F | DA70 | FFC5 | 0031 | DAA0 | FFC5 | 0032 |

THU MAR 14 17:37:32 1991 GSPMON.4 PAGE 83, LINE 4839

| | | | | | | | | |
|---|---|---|---|---|---|---|---|---|
| 0000227140 | DC90 | FFC5 | 0034 | DCA0 | FFC5 | 0035 | DE40 | FFC5 |
| 0000227160 | 0037 | DE90 | FFC5 | 002F | DF50 | FFC5 | 0039 | E110 |
| 0000227200 | FFC5 | 003B | E190 | FFC5 | 002D | 1DD6 | 0000 | 0000 |
| 0000227220 | E2D0 | FFC5 | 0006 | E320 | FFC5 | 0007 | E3C0 | FFC5 |
| 0000227240 | 0009 | E410 | FFC5 | 000A | E670 | FFC5 | 000E | 1DE0 |
| 0000227260 | 0000 | 0000 | EA90 | FFC5 | 0008 | EB20 | FFC5 | 000A |
| 0000227300 | EC20 | FFC5 | 000C | EC40 | FFC5 | 0008 | ECCD | FFC5 |
| 0000227320 | 000E | 1DEC | 0000 | 0000 | ED60 | FFC5 | 0008 | ED90 |
| 0000227340 | FFC5 | 000A | EDC0 | FFC5 | 000C | EFA0 | FFC5 | 000E |
| 0000227360 | EFC0 | FFC5 | 000A | F030 | FFC5 | 0008 | F080 | FFC5 |
| 0000227400 | 0011 | 1DFA | 0000 | 0000 | F130 | FFC5 | 0006 | F170 |
| 0000227420 | FFC5 | 0008 | F1E0 | FFC5 | 000A | F270 | FFC5 | 000C |
| 0000227440 | F3F0 | FFC5 | 000E | F440 | FFC5 | 000F | F4B0 | FFC5 |
| 0000227460 | 0010 | F4D0 | FFC5 | 000A | F5A0 | FFC5 | 0008 | F620 |
| 0000227500 | FFC5 | 0013 | 1E0A | 0000 | 0000 | F6B0 | FFC5 | 0006 |
| 0000227520 | F710 | FFC5 | 0007 | F740 | FFC5 | 0008 | 1E14 | 0000 |
| 0000227540 | 0000 | F7D0 | FFC5 | 0008 | F840 | FFC5 | 0009 | F890 |
| 0000227560 | FFC5 | 000A | F8E0 | FFC5 | 000B | F950 | FFC5 | 000C |
| 0000227600 | F9D0 | FFC5 | 000D | 1E20 | 0000 | 0000 | FA60 | FFC5 |
| 0000227620 | 0006 | FB30 | FFC5 | 0007 | FB60 | FFC5 | 0008 | 1E2A |
| 0000227640 | 0000 | 0000 | FBF0 | FFC5 | 0009 | FC60 | FFC5 | 000A |
| 0000227660 | FCB0 | FFC5 | 000B | FD00 | FFC5 | 000C | FD70 | FFC5 |
| 0000227700 | 000D | FDE0 | FFC5 | 000E | FE50 | FFC5 | 000F | FEC0 |
| 0000227720 | FFC5 | 0010 | FF30 | FFC5 | 0011 | FFF0 | FFC5 | 0012 |
| 0000227740 | 1E38 | 0000 | 0000 | 0080 | FFC6 | 0006 | 00E0 | FFC6 |
| 0000227760 | 0007 | 0160 | FFC6 | 0008 | 0190 | FFC6 | 0009 | 1E42 |
| 0000230000 | 0000 | 0000 | 0220 | FFC6 | 0006 | 02A0 | FFC6 | 0007 |
| 0000230020 | 02D0 | FFC6 | 0008 | 1E4C | 0000 | 0000 | 0360 | FFC6 |
| 0000230040 | 0006 | 03E0 | FFC6 | 0007 | 0410 | FFC6 | 0008 | 1E56 |
| 0000230060 | 0000 | 0000 | 04A0 | FFC6 | 0006 | 0500 | FFC6 | 0007 |
| 0000230100 | 0580 | FFC6 | 0008 | 05B0 | FFC6 | 0009 | 1E60 | 0000 |
| 0000230120 | 0000 | 0640 | FFC6 | 0006 | 06A0 | FFC6 | 0007 | 1E6A |
| 0000230140 | 0000 | 0000 | 0730 | FFC6 | 0006 | 0790 | FFC6 | 0007 |
| 0000230160 | 1E74 | 0000 | 0000 | 0820 | FFC6 | 0006 | 0880 | FFC6 |
| 0000230200 | 0007 | 1E7E | 0000 | 0000 | 0910 | FFC6 | 0006 | 0970 |
| 0000230220 | FFC6 | 0007 | 09E0 | FFC6 | 0008 | 0A50 | FFC6 | 0009 |
| 0000230240 | 0A80 | FFC6 | 000A | 1E88 | 0000 | 0000 | 0B00 | FFC6 |
| 0000230260 | 0005 | 0B90 | FFC6 | 0006 | 0C20 | FFC6 | 0007 | 0CA0 |
| 0000230300 | FFC6 | 0008 | 0CB0 | FFC6 | 0009 | 0D20 | FFC6 | 000C |
| 0000230320 | 0D70 | FFC6 | 000D | 0DA0 | FFC6 | 000E | 0DD0 | FFC6 |
| 0000230340 | 0010 | 0E00 | FFC6 | 0013 | 0E50 | FFC6 | 0014 | 0EA0 |
| 0000230360 | FFC6 | 0015 | 0EB0 | FFC6 | 0017 | 0EF0 | FFC6 | 0018 |
| 0000230400 | 0F40 | FFC6 | 001B | 0FA0 | FFC6 | 001C | 1E8E | 0000 |
| 0000230420 | 0000 | 1050 | FFC6 | 0004 | 10D0 | FFC6 | 0005 | 10F0 |
| 0000230440 | FFC6 | 0009 | 1150 | FFC6 | 000A | 11C0 | FFC6 | 000B |
| 0000230460 | 1210 | FFC6 | 000C | 1230 | FFC6 | 0010 | 1290 | FFC6 |
| 0000230500 | 0011 | 12E0 | FFC6 | 0012 | 12F0 | FFC6 | 0016 | 1350 |
| 0000230520 | FFC6 | 0017 | 1390 | FFC6 | 0018 | 13A0 | FFC6 | 001C |
| 0000230540 | 1400 | FFC6 | 001D | 1490 | FFC6 | 001F | 1530 | FFC6 |
| 0000230560 | 0020 | 1580 | FFC6 | 0022 | 1590 | FFC6 | 0024 | 15E0 |
| 0000230600 | FFC6 | 0025 | 1630 | FFC6 | 0026 | 1680 | FFC6 | 0027 |
| 0000230620 | 16F0 | FFC6 | 0028 | 1730 | FFC6 | 0029 | 1770 | FFC6 |
| 0000230640 | 002A | 17C0 | FFC6 | 002C | 1820 | FFC6 | 002D | 1870 |
| 0000230660 | FFC6 | 0030 | 1880 | FFC6 | 0034 | 18E0 | FFC6 | 0035 |
| 0000230700 | 1930 | FFC6 | 0036 | 1980 | FFC6 | 0037 | 1990 | FFC6 |
| 0000230720 | 0038 | 19E0 | FFC6 | 0039 | 19F0 | FFC6 | 003C | 19F0 |
| 0000230740 | FFC6 | 0005 | 1E94 | 0000 | 0000 | 1B30 | FFC6 | 0004 |
| 0000230760 | 1B80 | FFC6 | 0006 | 1BC0 | FFC6 | 0007 | 1C70 | FFC6 |
| 0000231000 | 0008 | 1CC0 | FFC6 | 0009 | 1EC0 | 0000 | 0000 | 1D60 |

THU MAR 14 17:37:32 1991 GSPMON.4 PAGE 84, LINE 4898

| | | | | | | | | |
|---|---|---|---|---|---|---|---|---|
| 0000231020 | FFC6 | 0005 | 1EC8 | 0000 | 0000 | 1E20 | FFC6 | 0004 |
| 0000231040 | 1E70 | FFC6 | 0005 | 1EA0 | FFC6 | 0006 | 1ECE | 0000 |
| 0000231060 | 0000 | 1F10 | FFC6 | 0004 | 1ED4 | 0000 | 0000 | 1F70 |
| 0000231100 | FFC6 | 0004 | 1FC0 | FFC6 | 0005 | 1FE0 | FFC6 | 0007 |
| 0000231120 | 1EDA | 0000 | 0000 | 2020 | FFC6 | 0004 | 2070 | FFC6 |
| 0000231140 | 0005 | 20E0 | FFC6 | 0006 | 20F0 | FFC6 | 0007 | 2130 |
| 0000231160 | FFC6 | 0008 | 1EE0 | 0000 | 0000 | 21C0 | FFC6 | 0005 |
| 0000231200 | 2210 | FFC6 | 0006 | 2240 | FFC6 | 0007 | 213A | 0000 |
| 0000231220 | 0000 | 2320 | FFC6 | 0009 | 2380 | FFC6 | 000C | 23F0 |
| 0000231240 | FFC6 | 000F | 2480 | FFC6 | 0013 | 25B0 | FFC6 | 0034 |
| 0000231260 | 2600 | FFC6 | 0036 | 2640 | FFC6 | 0039 | 2670 | FFC6 |
| 0000231300 | 003C | 2700 | FFC6 | 003F | 2142 | 0000 | 0000 | 27C0 |
| 0000231320 | FFC6 | 0006 | 2840 | FFC6 | 0008 | 2850 | FFC6 | 000C |
| 0000231340 | 28A0 | FFC6 | 000D | 28B0 | FFC6 | 000F | 28B0 | FFC6 |
| 0000231360 | 0012 | 2900 | FFC6 | 0013 | 2910 | FFC6 | 0015 | 2910 |
| 0000231400 | FFC6 | 0018 | 2960 | FFC6 | 0019 | 2970 | FFC6 | 001B |
| 0000231420 | 2970 | FFC6 | 001E | 29C0 | FFC6 | 001F | 29D0 | FFC6 |
| 0000231440 | 0021 | 29D0 | FFC6 | 0008 | 23A6 | 0000 | 0000 | 2BB0 |
| 0000231460 | FFC6 | 0009 | 2C50 | FFC6 | 0010 | 2CE0 | FFC6 | 0012 |
| 0000231500 | 2CE0 | FFC6 | 0015 | 2D30 | FFC6 | 0016 | 2D70 | FFC6 |
| 0000231520 | 0017 | 2DF0 | FFC6 | 001D | 2E60 | FFC6 | 001E | 2EB0 |
| 0000231540 | FFC6 | 001F | 2EE0 | FFC6 | 0020 | 2F20 | FFC6 | 0021 |
| 0000231560 | 2F50 | FFC6 | 0024 | 2FB0 | FFC6 | 0025 | 3000 | FFC6 |
| 0000231600 | 0029 | 3040 | FFC6 | 0012 | 267C | 0000 | 0000 | 3080 |
| 0000231620 | FFC6 | 0006 | 30E0 | FFC6 | 0009 | 3160 | FFC6 | 000A |
| 0000231640 | 31B0 | FFC6 | 000B | 3220 | FFC6 | 000C | 3290 | FFC6 |
| 0000231660 | 000D | 3300 | FFC6 | 000E | 3380 | FFC6 | 0011 | 33D0 |
| 0000231700 | FFC6 | 0013 | 3440 | FFC6 | 001C | 3500 | FFC6 | 0020 |
| 0000231720 | 3570 | FFC6 | 0021 | 35B0 | FFC6 | 0023 | 3640 | FFC6 |
| 0000231740 | 0024 | 3680 | FFC6 | 0025 | 3780 | FFC6 | 0026 | 37C0 |
| 0000231760 | FFC6 | 0027 | 3840 | FFC6 | 0028 | 38C0 | FFC6 | 002A |
| 0000232000 | 39A0 | FFC6 | 0030 | 3A30 | FFC6 | 0031 | 3AC0 | FFC6 |
| 0000232020 | 0033 | 3B30 | FFC6 | 0034 | 3BC0 | FFC6 | 0036 | 3C30 |
| 0000232040 | FFC6 | 0037 | 3CA0 | FFC6 | 0039 | 3D10 | FFC6 | 003D |
| 0000232060 | 3D90 | FFC6 | 0040 | 3DE0 | FFC6 | 0041 | 3E10 | FFC6 |
| 0000232100 | 0044 | 3E40 | FFC6 | 0047 | 3EA0 | FFC6 | 0049 | 3F30 |
| 0000232120 | FFC6 | 004A | 3FA0 | FFC6 | 004B | 2686 | 0000 | 0000 |
| 0000232140 | 4030 | FFC6 | 0006 | 4100 | FFC6 | 0007 | 41A0 | FFC6 |
| 0000232160 | 0008 | 4240 | FFC6 | 0009 | 4300 | FFC6 | 000A | 43A0 |
| 0000232200 | FFC6 | 000B | 4440 | FFC6 | 000C | 44E0 | FFC6 | 000D |
| 0000232220 | 45A0 | FFC6 | 0016 | 268E | 0000 | 0000 | 4690 | FFC6 |
| 0000232240 | 009A | 2698 | 0000 | 0000 | 4710 | FFC6 | 0006 | 26A2 |
| 0000232260 | 0000 | 0000 | 47F0 | FFC6 | 0006 | 4840 | FFC6 | 0007 |
| 0000232300 | 48B0 | FFC6 | 0008 | 48C0 | FFC6 | 0009 | 4910 | FFC6 |
| 0000232320 | 000A | 26AC | 0000 | 0000 | 49A0 | FFC6 | 0006 | 49B0 |
| 0000232340 | FFC6 | 0008 | 4A40 | FFC6 | 000A | 4A50 | FFC6 | 000C |
| 0000232360 | 4AE0 | FFC6 | 000E | 4AF0 | FFC6 | 0010 | 4B70 | FFC6 |
| 0000232400 | 0011 | 4B80 | FFC6 | 0013 | 4C00 | FFC6 | 0015 | 4C10 |
| 0000232420 | FFC6 | 0017 | 4CA0 | FFC6 | 0019 | 4CB0 | FFC6 | 001B |
| 0000232440 | 4D40 | FFC6 | 001D | 4D50 | FFC6 | 001F | 4D50 | FFC6 |
| 0000232460 | 0006 | 4F30 | FFC6 | 0021 | 26B6 | 0000 | 0000 | 4FC0 |
| 0000232500 | FFC6 | 0006 | 5020 | FFC6 | 0007 | 26C0 | 0000 | 0000 |
| 0000232520 | 50B0 | FFC6 | 0006 | 50C0 | FFC6 | 0008 | 5140 | FFC6 |
| 0000232540 | 0009 | 5150 | FFC6 | 000B | 51D0 | FFC6 | 000C | 51E0 |
| 0000232560 | FFC6 | 000E | 5260 | FFC6 | 000F | 5270 | FFC6 | 0011 |
| 0000232600 | 52F0 | FFC6 | 0012 | 5300 | FFC6 | 0014 | 5380 | FFC6 |
| 0000232620 | 0015 | 5390 | FFC6 | 0017 | 5390 | FFC6 | 0006 | 5450 |
| 0000232640 | FFC6 | 0019 | 26CA | 0000 | 0000 | 54E0 | FFC6 | 0006 |
| 0000232660 | 5590 | FFC6 | 0007 | 55B0 | FFC6 | 0008 | 55E0 | FFC6 |

THU MAR 14 17:37:32 1991 GSPMON.4 PAGE 85, LINE 4957

| | | | | | | | | |
|---|---|---|---|---|---|---|---|---|
| 0000232700 | 0009 | 26D4 | 0000 | 0000 | 5670 | FFC6 | 0006 | 56F0 |
| 0000232720 | FFC6 | 0007 | 26DE | 0000 | 0000 | 5780 | FFC6 | 0006 |
| 0000232740 | 5810 | FFC6 | 0007 | 26E8 | 0000 | 0000 | 58C0 | FFC6 |
| 0000232760 | 0011 | 5920 | FFC6 | 0012 | 5960 | FFC6 | 0013 | 5990 |
| 0000233000 | FFC6 | 0014 | 59A0 | FFC6 | 0017 | 59F0 | FFC6 | 0019 |
| 0000233020 | 5B60 | FFC6 | 001C | 5BD0 | FFC6 | 001E | 5D70 | FFC6 |
| 0000233040 | 0021 | 5E00 | FFC6 | 0022 | 5E70 | FFC6 | 0023 | 5EB0 |
| 0000233060 | FFC6 | 0024 | 5EF0 | FFC6 | 0025 | 5F00 | FFC6 | 0026 |
| 0000233100 | 5F30 | FFC6 | 0027 | 5FE0 | FFC6 | 001C | 60A0 | FFC6 |
| 0000233120 | 0029 | 60D0 | FFC6 | 002A | 2706 | 0000 | 0000 | 6150 |
| 0000233140 | FFC6 | 0006 | 2710 | 0000 | 0000 | 61F0 | FFC6 | 0005 |
| 0000233160 | 6220 | FFC6 | 000A | 6250 | FFC6 | 000B | 62B0 | FFC6 |
| 0000233200 | 000C | 62E0 | FFC6 | 000D | 6370 | FFC6 | 000C | 63E0 |
| 0000233220 | FFC6 | 000F | 6450 | FFC6 | 0012 | 64C0 | FFC6 | 0013 |
| 0000233240 | 6530 | FFC6 | 0016 | 6590 | FFC6 | 0017 | 6610 | FFC6 |
| 0000233260 | 0018 | 6660 | FFC6 | 001A | 66D0 | FFC6 | 001B | 2720 |
| 0000233300 | 0000 | 0000 | 6750 | FFC6 | 0005 | 67C0 | FFC6 | 0008 |
| 0000233320 | 6830 | FFC6 | 0009 | 68A0 | FFC6 | 000B | 6910 | FFC6 |
| 0000233340 | 000C | 2726 | 0000 | 0000 | 6970 | FFC6 | 0006 | 69D0 |
| 0000233360 | FFC6 | 0007 | 2730 | 0000 | 0000 | 6A50 | FFC6 | 0006 |
| 0000233400 | 6AA0 | FFC6 | 0007 | 6AD0 | FFC6 | 0008 | 662E | 6C69 |
| 0000233420 | 0065 | 0000 | 0002 | 0000 | FFFE | 0000 | 0167 | 7367 |
| 0000233440 | 6D70 | 6E6F | 632E | 0000 | 0000 | 0000 | 0000 | 0000 |
| 0000233460 | 662E | 6C69 | 0065 | 0000 | 0004 | 0000 | FFFE | 0000 |
| 0000233500 | 0167 | 7473 | 6D64 | 682E | 0000 | 0000 | 0000 | 0000 |
| 0000233520 | 0000 | 0000 | 662E | 6C69 | 0065 | 0000 | 0006 | 0000 |
| 0000233540 | FFFE | 0000 | 0167 | 7367 | 6D70 | 6E6F | 632E | 0000 |
| 0000233560 | 0000 | 0000 | 0000 | 0000 | 662E | 6C69 | 0065 | 0000 |
| 0000233600 | 0008 | 0000 | FFFE | 0000 | 0167 | 7473 | 6164 | 6772 |
| 0000233620 | 682E | 0000 | 0000 | 0000 | 0000 | 0000 | 662E | 6C69 |
| 0000233640 | 0065 | 0000 | 000A | 0000 | FFFE | 0000 | 0167 | 7367 |
| 0000233660 | 6D70 | 6E6F | 632E | 0000 | 0000 | 0000 | 0000 | 0000 |
| 0000233700 | 662E | 6C69 | 0065 | 0000 | 000C | 0000 | FFFE | 0000 |
| 0000233720 | 0167 | 6573 | 6A74 | 706D | 682E | 0000 | 0000 | 0000 |
| 0000233740 | 0000 | 0000 | 662E | 6C69 | 0065 | 0000 | 000E | 0000 |
| 0000233760 | FFFE | 0000 | 0167 | 7367 | 6D70 | 6E6F | 632E | 0000 |
| 0000234000 | 0000 | 0000 | 0000 | 0000 | 662E | 6C69 | 0065 | 0000 |
| 0000234020 | 0018 | 0000 | FFFE | 0000 | 0167 | 7473 | 6C64 | 6269 |
| 0000234040 | 682E | 0000 | 0000 | 0000 | 0000 | 0000 | 302E | 6166 |
| 0000234060 | 656B | 0000 | 0000 | 0000 | FFFE | 0008 | 010A | 0000 |
| 0000234100 | 0000 | 0000 | 0040 | 0000 | 0000 | 0018 | 0000 | 0000 |
| 0000234120 | 715F | 6F75 | 0074 | 0000 | 0000 | 0000 | FFFF | 0004 |
| 0000234140 | 0108 | 0000 | 0000 | 0000 | 0020 | 0000 | 0000 | 0000 |
| 0000234160 | 0000 | 0000 | 725F | 6D65 | 0000 | 0000 | 0020 | 0000 |
| 0000234200 | FFFF | 0004 | 0108 | 0000 | 0000 | 0000 | 0020 | 0000 |
| 0000234220 | 0000 | 0000 | 0000 | 0000 | 652E | 736F | 0000 | 0000 |
| 0000234240 | 0000 | 0000 | FFFE | 0008 | 0166 | 0010 | 0000 | 0000 |
| 0000234260 | 0040 | 0000 | 0000 | 0000 | 0000 | 0000 | 662E | 6C69 |
| 0000234300 | 0065 | 0000 | 001A | 0000 | FFFE | 0000 | 0167 | 7367 |
| 0000234320 | 6D70 | 6E6F | 632E | 0000 | 0000 | 0000 | 0000 | 0000 |
| 0000234340 | 662E | 6C69 | 0065 | 0000 | 002A | 0000 | FFFE | 0000 |
| 0000234360 | 0167 | 7974 | 6570 | 6564 | 2E66 | 0068 | 0000 | 0000 |
| 0000234400 | 0000 | 0000 | 312E | 6166 | 656B | 0000 | 0000 | 0000 |
| 0000234420 | FFFE | 000A | 010F | 0000 | 0000 | 0000 | 0001 | 0000 |
| 0000234440 | 0000 | 0024 | 0000 | 0000 | 465F | 4C41 | 4553 | 0000 |
| 0000234460 | 0000 | 0000 | FFFF | 000B | 0110 | 0000 | 0000 | 0000 |
| 0000234500 | 0001 | 0000 | 0000 | 0000 | 0000 | 0000 | 545F | 5552 |
| 0000234520 | 0045 | 0000 | 0001 | 0000 | FFFF | 000B | 0110 | 0000 |
| 0000234540 | 0000 | 0000 | 0001 | 0000 | 0000 | 0000 | 0000 | 0000 |

THU MAR 14 17:37:32 1991 GSPMON.4 PAGE 86, LINE 5016

| | | | | | | | | |
|---|---|---|---|---|---|---|---|---|
| 0000234560 | 652E | 736F | 0000 | 0000 | 0000 | 0000 | FFFE | 000A |
| 0000234600 | 0166 | 001C | 0000 | 0000 | 0001 | 0000 | 0000 | 0000 |
| 0000234620 | 0000 | 0000 | 322E | 6166 | 656B | 0000 | 0000 | 0000 |
| 0000234640 | FFFE | 0008 | 010A | 0000 | 0000 | 0000 | 0004 | 0000 |
| 0000234660 | 0000 | 002A | 0000 | 0000 | 705F | 7869 | 6C65 | 0000 |
| 0000234700 | 0000 | 0000 | FFFF | 000E | 0112 | 0000 | 0000 | 0000 |
| 0000234720 | 0004 | 0000 | 0000 | 0000 | 0000 | 0000 | 652E | 736F |
| 0000234740 | 0000 | 0000 | 0000 | 0000 | FFFE | 0008 | 0166 | 0024 |
| 0000234760 | 0000 | 0000 | 0004 | 0000 | 0000 | 0000 | 0000 | 0000 |
| 0000235000 | 662E | 6C69 | 0065 | 0000 | 002C | 0000 | FFFE | 0000 |
| 0000235020 | 0167 | 7367 | 6D70 | 6E6F | 632E | 0000 | 0000 | 0000 |
| 0000235040 | 0000 | 0000 | 662E | 6C69 | 0065 | 0000 | 002E | 0000 |
| 0000235060 | FFFE | 0000 | 0167 | 7367 | 6870 | 6477 | 682E | 0000 |
| 0000235100 | 0000 | 0006 | 0000 | 0000 | 662E | 6C69 | 0065 | 0000 |
| 0000235120 | 0030 | 0000 | FFFE | 0000 | 0167 | 7367 | 6D70 | 6E6F |
| 0000235140 | 632E | 0000 | 0000 | 0000 | 0000 | 0000 | 662E | 6C69 |
| 0000235160 | 0065 | 0000 | 0066 | 0000 | FFFE | 0000 | 0167 | 7367 |
| 0000235200 | 7070 | 6F72 | 682E | 0000 | 0000 | 0000 | 0000 | 0000 |
| 0000235220 | 0000 | 0000 | 0004 | 0000 | 0000 | 0000 | FFFE | 000A |
| 0000235240 | 010F | 0000 | 0000 | 0000 | 0003 | 0000 | 0000 | 0046 |
| 0000235260 | 0000 | 0000 | 0000 | 0000 | 000E | 0000 | 0000 | 0000 |
| 0000235300 | FFFF | 000B | 0110 | 0000 | 0000 | 0000 | 0003 | 0000 |
| 0000235320 | 0000 | 0000 | 0000 | 0000 | 0000 | 0000 | 0019 | 0000 |
| 0000235340 | 0001 | 0000 | FFFF | 000B | 0110 | 0000 | 0000 | 0000 |
| 0000235360 | 0003 | 0000 | 0000 | 0000 | 0000 | 0000 | 0000 | 0030 |
| 0000235400 | 0026 | 0000 | 0002 | 0000 | FFFF | 000B | 0110 | 0000 |
| 0000235420 | 0000 | 0000 | 0003 | 0000 | 0000 | 0000 | 0000 | 0000 |
| 0000235440 | 415F | 5050 | 494C | 0043 | 0003 | 0000 | FFFF | 000B |
| 0000235460 | 0110 | 0000 | 0000 | 0000 | 0003 | 0000 | 0000 | 0000 |
| 0000235500 | 0000 | 0000 | 0000 | 0000 | 0030 | 0000 | 0004 | 0000 |
| 0000235520 | FFFF | 000B | 0110 | 0000 | 0000 | 0000 | 0003 | 0000 |
| 0000235540 | 0000 | 0000 | 0000 | 0000 | 0000 | 0000 | 003C | 0000 |
| 0000235560 | 0005 | 0000 | FFFF | 0008 | 0110 | 0000 | 000D | 0000 |
| 0000235600 | 0003 | 0000 | 0000 | 0000 | 0000 | 0000 | 435F | 4D4F |
| 0000235620 | 414D | 444E | 0006 | 0000 | FFFF | 000B | 0110 | 0000 |
| 0000235640 | 0000 | 0000 | 0003 | 0000 | 0000 | 0000 | 0000 | 0000 |
| 0000235660 | 0000 | 0000 | 0048 | 0000 | 0007 | 0000 | FFFF | 000B |
| 0000235700 | 0110 | 0000 | 0000 | 0000 | 0003 | 0000 | 0000 | 0000 |
| 0000235720 | 0000 | 0000 | 652E | 736F | 0000 | 0000 | 0000 | 0000 |
| 0000235740 | FFFE | 000A | 0166 | 0032 | 0000 | 0000 | 0003 | 0000 |
| 0000235760 | 0000 | 0000 | 0000 | 0000 | 332E | 6166 | 656B | 0000 |
| 0000236000 | 0000 | 0000 | FFFE | 0008 | 010A | 0000 | 0000 | 0000 |
| 0000236020 | 0010 | 0000 | 0000 | 0050 | 0000 | 0000 | 635F | 646F |
| 0000236040 | 0065 | 0000 | 0000 | 0000 | FFFF | 000E | 0112 | 0000 |
| 0000236060 | 0000 | 0000 | 000E | 0000 | 0000 | 0000 | 0000 | 0000 |
| 0000236100 | 635F | 6D5F | 646F | 0065 | 000E | 0000 | FFFF | 000E |
| 0000236120 | 0112 | 0000 | 0000 | 0000 | 0001 | 0000 | 0000 | 0000 |
| 0000236140 | 0000 | 0000 | 0000 | 0000 | 0055 | 0000 | 000F | 0000 |
| 0000236160 | FFFF | 000E | 0112 | 0000 | 0000 | 0000 | 0001 | 0000 |
| 0000236200 | 0000 | 0000 | 0000 | 0000 | 652E | 736F | 0000 | 0000 |
| 0000236220 | 0000 | 0000 | FFFE | 0008 | 0166 | 0046 | 0000 | 0000 |
| 0000236240 | 0010 | 0000 | 0000 | 0000 | 0000 | 0000 | 342E | 6166 |
| 0000236260 | 656B | 0000 | 0000 | 0000 | FFFE | 0008 | 010A | 0000 |
| 0000236300 | 0000 | 0000 | 0010 | 0000 | 0000 | 005E | 0000 | 0000 |
| 0000236320 | 6D5F | 6773 | 6E69 | 0000 | 0000 | 0000 | FFFF | 000E |
| 0000236340 | 0112 | 0000 | 0000 | 0000 | 0003 | 0000 | 0000 | 0000 |
| 0000236360 | 0000 | 0000 | 695F | 746E | 6E69 | 0000 | 0003 | 0000 |
| 0000236400 | FFFF | 000E | 0112 | 0000 | 0000 | 0000 | 0001 | 0000 |
| 0000236420 | 0000 | 0000 | 0000 | 0000 | 6D5F | 6773 | 756F | 0074 |

THU MAR 14 17:37:32 1991 GSPMON.4 PAGE 87, LINE 5075

| | | | | | | | | |
|---|---|---|---|---|---|---|---|---|
| 0000236440 | 0004 | 0000 | FFFF | 000E | 0112 | 0000 | 0000 | 0000 |
| 0000236460 | 0003 | 0000 | 0000 | 0000 | 0000 | 0000 | 695F | 746E |
| 0000236500 | 756F | 0074 | 0007 | 0000 | FFFF | 000E | 0112 | 0000 |
| 0000236520 | 0000 | 0000 | 0001 | 0000 | 0000 | 0000 | 0000 | 0000 |
| 0000236540 | 635F | 7274 | 5F6C | 6968 | 0008 | 0000 | FFFF | 000E |
| 0000236560 | 0112 | 0000 | 0000 | 0000 | 0008 | 0000 | 0000 | 0000 |
| 0000236600 | 0000 | 0000 | 652E | 736F | 0000 | 0000 | 0000 | 0000 |
| 0000236620 | FFFE | 0008 | 0166 | 0050 | 0000 | 0000 | 0010 | 0000 |
| 0000236640 | 0000 | 0000 | 0000 | 0000 | 352E | 6166 | 656B | 0000 |
| 0000236660 | 0000 | 0000 | FFFE | 0009 | 010C | 0000 | 0000 | 0000 |
| 0000236700 | 0010 | 0000 | 0000 | 0066 | 0000 | 0000 | 665F | 6569 |
| 0000236720 | 646C | 0073 | 0000 | 0000 | FFFF | 0008 | 010B | 0050 |
| 0000236740 | 0000 | 0000 | 0010 | 0000 | 0000 | 0000 | 0000 | 0000 |
| 0000236760 | 665F | 6C75 | 006C | 0000 | 0000 | 0000 | FFFF | 000D |
| 0000237000 | 010B | 0000 | 0000 | 0000 | 0010 | 0000 | 0000 | 0000 |
| 0000237020 | 0000 | 0000 | 652E | 736F | 0000 | 0000 | 0000 | 0000 |
| 0000237040 | FFFE | 0009 | 0166 | 005E | 0000 | 0000 | 0010 | 0000 |
| 0000237060 | 0000 | 0000 | 0000 | 0000 | 662E | 6C69 | 0065 | 0000 |
| 0000237100 | 0068 | 0000 | FFFE | 0000 | 0167 | 7367 | 6D70 | 6E6F |
| 0000237120 | 632E | 0000 | 0000 | 0000 | 0000 | 0000 | 662E | 6C69 |
| 0000237140 | 0065 | 0000 | 0076 | 0000 | FFFE | 0000 | 0167 | 7367 |
| 0000237160 | 6D70 | 6E6F | 682E | 0000 | 0000 | 0000 | 0000 | 0000 |
| 0000237200 | 362E | 6166 | 656B | 0000 | 0000 | 0000 | FFFE | 000A |
| 0000237220 | 010F | 0000 | 0000 | 0000 | 0002 | 0000 | 0000 | 0076 |
| 0000237240 | 0000 | 0000 | 0000 | 0000 | 0060 | 0000 | 0000 | 0000 |
| 0000237260 | FFFF | 000B | 0110 | 0000 | 0000 | 0000 | 0002 | 0000 |
| 0000237300 | 0000 | 000C | 0000 | 0000 | 0000 | 0000 | 006B | 0000 |
| 0000237320 | 0001 | 0000 | FFFF | 000B | 0110 | 0000 | 0000 | 0000 |
| 0000237340 | 0002 | 0000 | 0000 | 0000 | 0000 | 0000 | 0000 | 0000 |
| 0000237360 | 0075 | 0000 | 0002 | 0000 | FFFF | 000B | 0110 | 0000 |
| 0000237400 | 0000 | 0000 | 0002 | 0000 | 0000 | 0000 | 0000 | 0000 |
| 0000237420 | 0000 | 0000 | 0080 | 0000 | 0003 | 0000 | FFFF | 000B |
| 0000237440 | 0110 | 0000 | 0000 | 0000 | 0002 | 0000 | 0000 | 0000 |
| 0000237460 | 0000 | 0000 | 652E | 736F | 0000 | 0000 | 0000 | 0000 |
| 0000237500 | FFFE | 000A | 0166 | 006A | 0000 | 0000 | 0002 | 0000 |
| 0000237520 | 0000 | 0000 | 0000 | 0000 | 662E | 6C69 | 0065 | 0000 |
| 0000237540 | 0078 | 0000 | FFFE | 0000 | 0167 | 7367 | 6D70 | 6E6F |
| 0000237560 | 692E | 636E | 0000 | 0000 | 0000 | 0000 | 662E | 6C69 |
| 0000237600 | 0065 | 0000 | 007A | 0000 | FFFE | 0000 | 0167 | 7367 |
| 0000237620 | 6D70 | 6E6F | 682E | 0000 | 0000 | 0000 | 0000 | 0000 |
| 0000237640 | 662E | 6C69 | 0065 | 0000 | 007C | 0000 | FFFE | 0000 |
| 0000237660 | 0167 | 7367 | 6D70 | 6E6F | 632E | 0000 | 0000 | 0000 |
| 0000237700 | 0000 | 0000 | 662E | 6C69 | 0065 | 0000 | 007E | 0000 |
| 0000237720 | FFFE | 0000 | 0167 | 7367 | 6570 | 7272 | 682E | 0000 |
| 0000237740 | 0000 | 0000 | 0000 | 0000 | 662E | 6C69 | 0065 | 0000 |
| 0000237760 | 0080 | 0000 | FFFE | 0000 | 0167 | 7367 | 6D70 | 6E6F |
| 0000240000 | 632E | 0000 | 0000 | 0000 | 0000 | 0000 | 662E | 6C69 |
| 0000240020 | 0065 | 0000 | 0082 | 0000 | FFFE | 0000 | 0167 | 7367 |
| 0000240040 | 7370 | 7379 | 682E | 0000 | 0000 | 0000 | 0000 | 0000 |
| 0000240060 | 662E | 6C69 | 0065 | 0000 | 0084 | 0000 | FFFE | 0000 |
| 0000240100 | 0167 | 7367 | 7370 | 7379 | 692E | 636E | 0000 | 0000 |
| 0000240120 | 0000 | 0000 | 662E | 6C69 | 0065 | 0000 | 0086 | 0000 |
| 0000240140 | FFFE | 0000 | 0167 | 7367 | 7370 | 7379 | 682E | 0000 |
| 0000240160 | 0000 | 0000 | 0000 | 0000 | 662E | 6C69 | 0065 | 0000 |
| 0000240200 | 0088 | 0000 | FFFE | 0000 | 0167 | 7367 | 6D70 | 6E6F |
| 0000240220 | 632E | 0000 | 0000 | 0000 | 0000 | 0000 | 662E | 6C69 |
| 0000240240 | 0065 | 0000 | 008A | 0000 | FFFE | 0000 | 0167 | 7367 |
| 0000240260 | 6670 | 636E | 682E | 0000 | 0000 | 0000 | 0000 | 0000 |
| 0000240300 | 662E | 6C69 | 0065 | 0000 | 008C | 0000 | FFFE | 0000 |

THU MAR 14 17:37:32 1991 GSPMON.4 PAGE 88, LINE 5134

| | | | | | | | | |
|---|---|---|---|---|---|---|---|---|
| 0000240320 | 0167 | 7367 | 6670 | 636E | 692E | 636E | 0000 | 0000 |
| 0000240340 | 0000 | 0000 | 662E | 6C69 | 0065 | 0000 | 008E | 0000 |
| 0000240360 | FFFE | 0000 | 0167 | 7367 | 6670 | 636E | 682E | 0000 |
| 0000240400 | 0000 | 0000 | 0000 | 0000 | 662E | 6C69 | 0065 | 0000 |
| 0000240420 | 0090 | 0000 | FFFE | 0000 | 0167 | 7367 | 6D70 | 6E6F |
| 0000240440 | 632E | 0000 | 0000 | 0000 | 0000 | 0000 | 662E | 6C69 |
| 0000240460 | 0065 | 0000 | 016C | 0000 | FFFE | 0000 | 0167 | 7367 |
| 0000240500 | 6370 | 6766 | 682E | 0000 | 0000 | 0000 | 0000 | 0000 |
| 0000240520 | 0000 | 0000 | 008C | 0000 | 0000 | 0000 | FFFE | 000A |
| 0000240540 | 010F | 0000 | 0000 | 0000 | 0002 | 0000 | 0000 | 009C |
| 0000240560 | 0000 | 0000 | 4F5F | 454E | 315F | 0036 | 0000 | 0000 |
| 0000240600 | FFFF | 000B | 0110 | 0000 | 0000 | 0000 | 0002 | 0000 |
| 0000240620 | 0000 | 0000 | 0000 | 0000 | 545F | 4F57 | 385F | 0000 |
| 0000240640 | 0001 | 0000 | FFFF | 000B | 0110 | 0000 | 0000 | 0000 |
| 0000240660 | 0002 | 0000 | 0000 | 0000 | 0000 | 0000 | 465F | 554F |
| 0000240700 | 5F52 | 0034 | 0002 | 0000 | FFFF | 000B | 0110 | 0000 |
| 0000240720 | 0000 | 0000 | 0002 | 0000 | 0000 | 0000 | 0000 | 0000 |
| 0000240740 | 652E | 736F | 0000 | 0000 | 0000 | 0000 | FFFE | 000A |
| 0000240760 | 0166 | 0092 | 0000 | 0000 | 0002 | 0000 | 0000 | 0000 |
| 0000241000 | 0000 | 0000 | 635F | 726C | 655F | 7272 | 0000 | 0000 |
| 0000241020 | FFFE | 000A | 010F | 0000 | 0000 | 0000 | 0001 | 0000 |
| 0000241040 | 0000 | 00A4 | 0000 | 0000 | 4E5F | 5F4F | 4C43 | 0052 |
| 0000241060 | 0000 | 0000 | FFFF | 000B | 0110 | 0000 | 0000 | 0000 |
| 0000241100 | 0001 | 0000 | 0000 | 0000 | 0000 | 0000 | 435F | 524C |
| 0000241120 | 0000 | 0000 | 0001 | 0000 | FFFF | 000B | 0110 | 0000 |
| 0000241140 | 0000 | 0000 | 0001 | 0000 | 0000 | 0000 | 0000 | 0000 |
| 0000241160 | 652E | 736F | 0000 | 0000 | 0000 | 0000 | FFFE | 000A |
| 0000241200 | 0166 | 009C | 0000 | 0000 | 0001 | 0000 | 0000 | 0000 |
| 0000241220 | 0000 | 0000 | 0000 | 0000 | 0096 | 0000 | 0000 | 0000 |
| 0000241240 | FFFE | 000A | 010F | 0000 | 0000 | 0000 | 0003 | 0000 |
| 0000241260 | 0000 | 00B2 | 0000 | 0000 | 505F | 414C | 454E | 0030 |
| 0000241300 | 0000 | 0000 | FFFF | 000B | 0110 | 0000 | 0000 | 0000 |
| 0000241320 | 0003 | 0000 | 0000 | 0000 | 0000 | 0000 | 505F | 414C |
| 0000241340 | 454E | 0032 | 0001 | 0000 | FFFF | 000B | 0110 | 0000 |
| 0000241360 | 0000 | 0000 | 0003 | 0000 | 0000 | 0000 | 0000 | 0000 |
| 0000241400 | 505F | 414C | 454E | 0031 | 0002 | 0000 | FFFF | 000B |
| 0000241420 | 0110 | 0000 | 0000 | 0000 | 0003 | 0000 | 0000 | 0000 |
| 0000241440 | 0000 | 0000 | 505F | 414C | 454E | 0033 | 0003 | 0000 |
| 0000241460 | FFFF | 000B | 0110 | 0000 | 0000 | 0000 | 0003 | 0000 |
| 0000241500 | 0000 | 0000 | 0000 | 0000 | 4E5F | 504F | 414C | 454E |
| 0000241520 | 0004 | 0000 | FFFF | 000B | 0110 | 0000 | 0000 | 0000 |
| 0000241540 | 0003 | 0000 | 0000 | 0000 | 0000 | 0000 | 652E | 736F |
| 0000241560 | 0000 | 0000 | 0000 | 0000 | FFFE | 000A | 0166 | 00A4 |
| 0000241600 | 0000 | 0000 | 0003 | 0000 | 0000 | 0000 | 0000 | 0000 |
| 0000241620 | 0000 | 0000 | 00A1 | 0000 | 0000 | 0000 | FFFE | 000A |
| 0000241640 | 010F | 0000 | 0000 | 0000 | 0001 | 0000 | 0000 | 00BA |
| 0000241660 | 0000 | 0000 | 4E5F | 5F4F | 4944 | 5053 | 0000 | 0000 |
| 0000241700 | FFFF | 000B | 0110 | 0000 | 0000 | 0000 | 0001 | 0000 |
| 0000241720 | 0000 | 0000 | 0000 | 0000 | 445F | 5349 | 0050 | 0000 |
| 0000241740 | 0001 | 0000 | FFFF | 000B | 0110 | 0000 | 0000 | 0000 |
| 0000241760 | 0001 | 0000 | 0000 | 0000 | 0000 | 0000 | 652E | 736F |
| 0000242000 | 0000 | 0000 | 0000 | 0000 | FFFE | 000A | 0166 | 00B2 |
| 0000242020 | 0000 | 0000 | 0001 | 0000 | 0000 | 0000 | 0000 | 0000 |
| 0000242040 | 665F | 5F62 | 6E65 | 0000 | 0000 | 0000 | FFFE | 000A |
| 0000242060 | 010F | 0000 | 0000 | 0000 | 0001 | 0000 | 0000 | 00C2 |
| 0000242100 | 0000 | 0000 | 0000 | 0000 | 00AB | 0000 | 0000 | 0000 |
| 0000242120 | FFFF | 000B | 0110 | 0000 | 0000 | 0000 | 0001 | 0000 |
| 0000242140 | 0000 | 0000 | 0000 | 0000 | 0000 | 0000 | 00B6 | 0000 |
| 0000242160 | 0001 | 0000 | FFFF | 000B | 0110 | 0000 | 0000 | 0000 |

THU MAR 14 17:37:32 1991 GSPMON.4 PAGE 89, LINE 5193

| | | | | | | | | |
|---|---|---|---|---|---|---|---|---|
| 0000242200 | 0001 | 0000 | 0000 | 0000 | 0000 | 0000 | 652E | 736F |
| 0000242220 | 0000 | 0000 | 0000 | 0000 | FFFE | 000A | 0166 | 00BA |
| 0000242240 | 0000 | 0000 | 0001 | 0000 | 0000 | 0000 | 0000 | 0000 |
| 0000242260 | 7A5F | 7265 | 5F6F | 0062 | 0000 | 0000 | FFFE | 000A |
| 0000242300 | 010F | 0000 | 0000 | 0000 | 0001 | 0000 | 0000 | 00CA |
| 0000242320 | 0000 | 0000 | 0000 | 0000 | 00C0 | 0000 | 0000 | 0000 |
| 0000242340 | FFFF | 000B | 0110 | 0000 | 0000 | 0000 | 0001 | 0000 |
| 0000242360 | 0000 | 0000 | 0000 | 0000 | 0000 | 0000 | 00CC | 0000 |
| 0000242400 | 0001 | 0000 | FFFF | 000B | 0110 | 0000 | 0000 | 0000 |
| 0000242420 | 0001 | 0000 | 0000 | 0000 | 0000 | 0000 | 652E | 736F |
| 0000242440 | 0000 | 0000 | 0000 | 0000 | FFFE | 000A | 0166 | 00C2 |
| 0000242460 | 0000 | 0000 | 0001 | 0000 | 0000 | 0000 | 0000 | 0000 |
| 0000242500 | 7A5F | 7265 | 5F6F | 0061 | 0000 | 0000 | FFFE | 000A |
| 0000242520 | 010F | 0000 | 0000 | 0000 | 0001 | 0000 | 0000 | 00D2 |
| 0000242540 | 0000 | 0000 | 0000 | 0000 | 00D6 | 0000 | 0000 | 0000 |
| 0000242560 | FFFF | 000B | 0110 | 0000 | 0000 | 0000 | 0001 | 0000 |
| 0000242600 | 0000 | 0000 | 0000 | 0000 | 0000 | 0000 | 00E2 | 0000 |
| 0000242620 | 0001 | 0000 | FFFF | 000B | 0110 | 0000 | 0000 | 0000 |
| 0000242640 | 0001 | 0000 | 0000 | 0000 | 0000 | 0000 | 652E | 736F |
| 0000242660 | 0000 | 0000 | 0000 | 0000 | FFFE | 000A | 0166 | 00CA |
| 0000242700 | 0000 | 0000 | 0001 | 0000 | 0000 | 0000 | 0000 | 0000 |
| 0000242720 | 0000 | 0000 | 00EC | 0000 | 0000 | 0000 | FFFE | 000A |
| 0000242740 | 010F | 0000 | 0000 | 0000 | 0002 | 0000 | 0000 | 00DE |
| 0000242760 | 0000 | 0000 | 0000 | 0000 | 00F6 | 0000 | 0000 | 0000 |
| 0000243000 | FFFF | 000B | 0110 | 0000 | 0000 | 0000 | 0002 | 0000 |
| 0000243020 | 0000 | 0000 | 0000 | 0000 | 0000 | 0000 | 0100 | 0000 |
| 0000243040 | 0001 | 0000 | FFFF | 000B | 0110 | 0000 | 0000 | 0000 |
| 0000243060 | 0002 | 0000 | 0000 | 0000 | 0000 | 0000 | 0000 | 0000 |
| 0000243100 | 010A | 0000 | 0002 | 0000 | FFFF | 000B | 0110 | 0000 |
| 0000243120 | 0000 | 0000 | 0002 | 0000 | 0000 | 0000 | 0000 | 0000 |
| 0000243140 | 0000 | 0000 | 0114 | 0000 | 0003 | 0000 | FFFF | 000B |
| 0000243160 | 0110 | 0000 | 0000 | 0000 | 0002 | 0000 | 0000 | 0000 |
| 0000243200 | 0000 | 0000 | 652E | 736F | 0000 | 0000 | 0000 | 0000 |
| 0000243220 | FFFE | 000A | 0166 | 00D2 | 0000 | 0000 | 0002 | 0000 |
| 0000243240 | 0000 | 0000 | 0000 | 0000 | 615F | 756C | 665F | 636E |
| 0000243260 | 0000 | 0000 | FFFE | 000A | 010F | 0000 | 0000 | 0000 |
| 0000243300 | 0003 | 0000 | 0000 | 00F2 | 0000 | 0000 | 435F | 454C |
| 0000243320 | 5241 | 0000 | 0000 | 0000 | FFFF | 000B | 0110 | 0000 |
| 0000243340 | 0000 | 0000 | 0003 | 0000 | 0000 | 0000 | 0000 | 0000 |
| 0000243360 | 425F | 494D | 554E | 4153 | 0001 | 0000 | FFFF | 000B |
| 0000243400 | 0110 | 0000 | 0000 | 0000 | 0003 | 0000 | 0000 | 0000 |
| 0000243420 | 0000 | 0000 | 415F | 494D | 554E | 4253 | 0002 | 0000 |
| 0000243440 | FFFF | 000B | 0110 | 0000 | 0000 | 0000 | 0003 | 0000 |
| 0000243460 | 0000 | 0000 | 0000 | 0000 | 505F | 554C | 0053 | 0000 |
| 0000243500 | 0003 | 0000 | FFFF | 000B | 0110 | 0000 | 0000 | 0000 |
| 0000243520 | 0003 | 0000 | 0000 | 0000 | 0000 | 0000 | 585F | 524F |
| 0000243540 | 0000 | 0000 | 0004 | 0000 | FFFF | 000B | 0110 | 0000 |
| 0000243560 | 0000 | 0000 | 0003 | 0000 | 0000 | 0000 | 0000 | 0000 |
| 0000243600 | 4F5F | 0052 | 0000 | 0000 | 0005 | 0000 | FFFF | 000B |
| 0000243620 | 0110 | 0000 | 0000 | 0000 | 0003 | 0000 | 0000 | 0000 |
| 0000243640 | 0000 | 0000 | 415F | 444E | 0000 | 0000 | 0006 | 0000 |
| 0000243660 | FFFF | 000B | 0110 | 0000 | 0000 | 0000 | 0003 | 0000 |
| 0000243700 | 0000 | 0000 | 0000 | 0000 | 505F | 4552 | 4553 | 0054 |
| 0000243720 | 0007 | 000G | FFFF | 000B | 0110 | 0000 | 0000 | 0000 |
| 0000243740 | 0003 | 0000 | 0000 | 0000 | 0000 | 0000 | 652E | 736F |
| 0000243760 | 0000 | 0000 | 0000 | 0000 | FFFE | 000A | 0166 | 00DE |
| 0000244000 | 0000 | 0000 | 0003 | 0000 | 0000 | 0000 | 0000 | 0000 |
| 0000244020 | 615F | 756C | 635F | 7972 | 0000 | 0000 | FFFE | 000A |
| 0000244040 | 010F | 0000 | 0000 | 0000 | 0001 | 0000 | 0000 | 00FA |

THU MAR 14 17:37:32 1991 GSPMON.4 PAGE 90, LINE 5252

| | | | | | | | | |
|---|---|---|---|---|---|---|---|---|
| 0000244060 | 0000 | 0000 | 5A5F | 5245 | 004F | 0000 | 0000 | 0000 |
| 0000244100 | FFFF | 000B | 0110 | 0000 | 0000 | 0000 | 0001 | 0000 |
| 0000244120 | 0000 | 0000 | 0000 | 0000 | 4F5F | 454E | 0000 | 0000 |
| 0000244140 | 0001 | 0000 | FFFF | 000B | 0110 | 0000 | 0000 | 0000 |
| 0000244160 | 0001 | 0000 | 0000 | 0000 | 0000 | 0000 | 652E | 736F |
| 0000244200 | 0000 | 0000 | 0000 | 0000 | FFFE | 000A | 0166 | 00F2 |
| 0000244220 | 0000 | 0000 | 0001 | 0000 | 0000 | 0000 | 0000 | 0000 |
| 0000244240 | 0000 | 0000 | 011E | 0000 | 0000 | 0000 | FFFE | 000A |
| 0000244260 | 010F | 0000 | 0000 | 0000 | 0001 | 0000 | 0000 | 0102 |
| 0000244300 | 0000 | 0000 | 0000 | 0000 | 012A | 0000 | 0000 | 0000 |
| 0000244320 | FFFF | 000B | 0110 | 0000 | 0000 | 0000 | 0001 | 0000 |
| 0000244340 | 0000 | 0000 | 0000 | 0000 | 0000 | 0000 | 0137 | 0000 |
| 0000244360 | 0001 | 0000 | FFFF | 000B | 0110 | 0000 | 0000 | 0000 |
| 0000244400 | 0001 | 0000 | 0000 | 0000 | 0000 | 0000 | 652E | 736F |
| 0000244420 | 0000 | 0000 | 0000 | 0000 | FFFE | 000A | 0166 | 00FA |
| 0000244440 | 0000 | 0000 | 0001 | 0000 | 0000 | 0000 | 0000 | 0000 |
| 0000244460 | 0000 | 0000 | 0143 | 0000 | 0000 | 0000 | FFFE | 000A |
| 0000244500 | 010F | 0000 | 0000 | 0000 | 0001 | 0000 | 0000 | 010A |
| 0000244520 | 0000 | 0000 | 4D5F | 5341 | 5F4B | 4E45 | 0000 | 0000 |
| 0000244540 | FFFF | 000B | 0110 | 0000 | 0000 | 0000 | 0001 | 0000 |
| 0000244560 | 0000 | 0000 | 0000 | 0000 | 0000 | 0000 | 0150 | 0000 |
| 0000244600 | 0001 | 0000 | FFFF | 000B | 0110 | 0000 | 0000 | 0000 |
| 0000244620 | 0001 | 0000 | 0000 | 0000 | 0000 | 0000 | 652E | 736F |
| 0000244640 | 0000 | 0000 | 0000 | 0000 | FFFE | 000A | 0166 | 0102 |
| 0000244660 | 0000 | 0000 | 0001 | 0000 | 0000 | 0000 | 0000 | 0000 |
| 0000244700 | 0000 | 0000 | 015A | 0000 | 0000 | 0000 | FFFE | 000A |
| 0000244720 | 010F | 0000 | 0000 | 0000 | 0001 | 0000 | 0000 | 0112 |
| 0000244740 | 0000 | 0000 | 0000 | 0000 | 0165 | 0000 | 0000 | 0000 |
| 0000244760 | FFFF | 000B | 0110 | 0000 | 0000 | 0000 | 0001 | 0000 |
| 0000245000 | 0000 | 0000 | 0000 | 0000 | 0000 | 0000 | 016F | 0000 |
| 0000245020 | 0001 | 0000 | FFFF | 000B | 0110 | 0000 | 0000 | 0000 |
| 0000245040 | 0001 | 0000 | 0000 | 0000 | 0000 | 0000 | 652E | 736F |
| 0000245060 | 0000 | 0000 | 0000 | 0000 | FFFE | 000A | 0166 | 010A |
| 0000245100 | 0000 | 0000 | 0001 | 0000 | 0000 | 0000 | 0000 | 0000 |
| 0000245120 | 0000 | 0000 | 017A | 0000 | 0000 | 0000 | FFFE | 000A |
| 0000245140 | 010F | 0000 | 0000 | 0000 | 0001 | 0000 | 0000 | 011A |
| 0000245160 | 0000 | 0000 | 0000 | 0000 | 0185 | 0000 | 0000 | 0000 |
| 0000245200 | FFFF | 000B | 0110 | 0000 | 0000 | 0000 | 0001 | 0000 |
| 0000245220 | 0000 | 0000 | 0000 | 0000 | 0000 | 0000 | 0190 | 0000 |
| 0000245240 | 0001 | 0000 | FFFF | 000B | 0110 | 0000 | 0000 | 0000 |
| 0000245260 | 0001 | 0000 | 0000 | 0000 | 0000 | 0000 | 652E | 736F |
| 0000245300 | 0000 | 0000 | 0000 | 0000 | FFFE | 000A | 0166 | 0112 |
| 0000245320 | 0000 | 0000 | 0001 | 0000 | 0000 | 0000 | 0000 | 0000 |
| 0000245340 | 6D5F | 5F62 | 7566 | 636E | 0000 | 0000 | FFFE | 000A |
| 0000245360 | 010F | 0000 | 0000 | 0000 | 0002 | 0000 | 0000 | 0126 |
| 0000245400 | 0000 | 0000 | 0000 | 0000 | 019A | 0000 | 0000 | 0000 |
| 0000245420 | FFFF | 000B | 0110 | 0000 | 0000 | 0000 | 0002 | 0000 |
| 0000245440 | 0000 | 0000 | 0000 | 0000 | 4D5F | 5F42 | 5845 | 5257 |
| 0000245460 | 0001 | 0000 | FFFF | 000B | 0110 | 0000 | 0000 | 0000 |
| 0000245500 | 0002 | 0000 | 0000 | 0000 | 0000 | 0000 | 4D5F | 5F42 |
| 0000245520 | 4552 | 4441 | 0002 | 0000 | FFFF | 000B | 0110 | 0000 |
| 0000245540 | 0000 | 0000 | 0002 | 0000 | 0000 | 0000 | 0000 | 0000 |
| 0000245560 | 4D5F | 5F42 | 504F | 4E45 | 0003 | 0000 | FFFF | 000B |
| 0000245600 | 0110 | 0000 | 0000 | 0000 | 0002 | 0000 | 0000 | 000U |
| 0000245620 | 0000 | 0000 | 652E | 736F | 0000 | 0000 | 0000 | 0000 |
| 0000245640 | FFFE | 000A | 0166 | 011A | 0000 | 0000 | 0002 | 0000 |
| 0000245660 | 0000 | 0000 | 0000 | 0000 | 0000 | 0000 | 01A4 | 0000 |
| 0000245700 | 0000 | 0000 | FFFE | 000A | 010F | 0000 | 0000 | 0000 |
| 0000245720 | 0002 | 0000 | 0000 | 0130 | 0000 | 0000 | 0000 | 0000 |

THU MAR 14 17:37:32 1991 GSPMON.4 PAGE 91, LINE 5311

| | | | | | | | | |
|---|---|---|---|---|---|---|---|---|
| 0000245740 | 01AE | 0000 | 0000 | 0000 | FFFF | 000B | 0110 | 0000 |
| 0000245760 | 0000 | 0000 | 0002 | 0000 | 0000 | 0000 | 0000 | 0000 |
| 0000246000 | 0000 | 0000 | 01BA | 0000 | 0001 | 0000 | FFFF | 000B |
| 0000246020 | 0110 | 0000 | 0000 | 0000 | 0002 | 0000 | 0000 | 0000 |
| 0000246040 | 0000 | 0000 | 4D5F | 3442 | 525F | 0044 | 0003 | 0000 |
| 0000246060 | FFFF | 000B | 0110 | 0000 | 0000 | 0000 | 0002 | 0000 |
| 0000246100 | 0000 | 0000 | 0000 | 0000 | 652E | 736F | 0000 | 0000 |
| 0000246120 | 0000 | 0000 | FFFE | 000A | 0166 | 0126 | 0000 | 0000 |
| 0000246140 | 0002 | 0000 | 0000 | 0000 | 0000 | 0000 | 0000 | 0000 |
| 0000246160 | 01C5 | 0000 | 0000 | 0000 | FFFE | 000A | 010F | 0000 |
| 0000246200 | 0000 | 0000 | 0002 | 0000 | 0000 | 0138 | 0000 | 0000 |
| 0000246220 | 4D5F | 3542 | 575F | 0052 | 0000 | 0000 | FFFF | 000B |
| 0000246240 | 0110 | 0000 | 0000 | 0000 | 0002 | 0000 | 0000 | 0000 |
| 0000246260 | 0000 | 0000 | 4D5F | 3542 | 525F | 0044 | 0003 | 0000 |
| 0000246300 | FFFF | 000B | 0110 | 0000 | 0000 | 0000 | 0002 | 0000 |
| 0000246320 | 0000 | 0000 | 0000 | 0000 | 652E | 736F | 0000 | 0000 |
| 0000246340 | 0000 | 0000 | FFFE | 000A | 0166 | 0130 | 0000 | 0000 |
| 0000246360 | 0002 | 0000 | 0000 | 0000 | 0000 | 0000 | 0000 | 0000 |
| 0000246400 | 01CF | 0000 | 0000 | 0000 | FFFE | 000A | 010F | 0000 |
| 0000246420 | 0000 | 0000 | 0001 | 0000 | 0000 | 0140 | 0000 | 0000 |
| 0000246440 | 0000 | 0000 | 01DB | 0000 | 0000 | 0000 | FFFF | 000B |
| 0000246460 | 0110 | 0000 | 0000 | 0000 | 0001 | 0000 | 0000 | 0000 |
| 0000246500 | 0000 | 0000 | 0000 | 0000 | 01E6 | 0000 | 0001 | 0000 |
| 0000246520 | FFFF | 000B | 0110 | 0000 | 0000 | 0000 | 0001 | 0000 |
| 0000246540 | 0000 | 0000 | 0000 | 0000 | 652E | 736F | 0000 | 0000 |
| 0000246560 | 0000 | 0000 | FFFE | 000A | 0166 | 0138 | 0000 | 0000 |
| 0000246600 | 0001 | 0000 | 0000 | 0000 | 0000 | 0000 | 0000 | 0000 |
| 0000246620 | 01F0 | 0000 | 0000 | 0000 | FFFE | 000A | 010F | 0000 |
| 0000246640 | 0000 | 0000 | 0001 | 0000 | 0000 | 0148 | 0000 | 0000 |
| 0000246660 | 0000 | 0000 | 01FD | 0000 | 0000 | 0000 | FFFF | 000B |
| 0000246700 | 0110 | 0000 | 0000 | 0000 | 0001 | 0000 | 0000 | 0000 |
| 0000246720 | 0000 | 0000 | 0000 | 0000 | 0209 | 0000 | 0001 | 0000 |
| 0000246740 | FFFF | 000B | 0110 | 0000 | 0000 | 0000 | 0001 | 0000 |
| 0000246760 | 0000 | 0000 | 0000 | 0000 | 652E | 736F | 0000 | 0000 |
| 0000247000 | 0000 | 0000 | FFFE | 000A | 0166 | 0140 | 0000 | 0000 |
| 0000247020 | 0001 | 0000 | 0000 | 0000 | 0000 | 0000 | 0000 | 0000 |
| 0000247040 | 0216 | 0000 | 0000 | 0000 | FFFE | 000A | 010F | 0000 |
| 0000247060 | 0000 | 0000 | 0003 | 0000 | 0000 | 0158 | 0000 | 0000 |
| 0000247100 | 585F | 424D | 0030 | 0000 | 0000 | 0000 | FFFF | 000B |
| 0000247120 | 0110 | 0000 | 0000 | 0000 | 0003 | 0000 | 0000 | 0000 |
| 0000247140 | 0000 | 0000 | 585F | 424D | 0031 | 0000 | 0001 | 0000 |
| 0000247160 | FFFF | 000B | 0110 | 0000 | 0000 | 0000 | 0003 | 0000 |
| 0000247200 | 0000 | 0000 | 0000 | 0000 | 585F | 424D | 0032 | 0000 |
| 0000247220 | 0002 | 0000 | FFFF | 000B | 0110 | 0000 | 0000 | 0000 |
| 0000247240 | 0003 | 0000 | 0000 | 0000 | 0000 | 0000 | 585F | 424D |
| 0000247260 | 0033 | 0000 | 0003 | 0000 | FFFF | 000B | 0110 | 0000 |
| 0000247300 | 0000 | 0000 | 0003 | 0000 | 0000 | 0000 | 0000 | 0000 |
| 0000247320 | 585F | 424D | 0034 | 0000 | 0004 | 0000 | FFFF | 000B |
| 0000247340 | 0110 | 0000 | 0000 | 0000 | 0003 | 0000 | 0000 | 0000 |
| 0000247360 | 0000 | 0000 | 585F | 424D | 0035 | 0000 | 0005 | 0000 |
| 0000247400 | FFFF | 000B | 0110 | 0000 | 0000 | 0000 | 0003 | 0000 |
| 0000247420 | 0000 | 0000 | 0000 | 0000 | 652E | 736F | 0000 | 0000 |
| 0000247440 | 0000 | 0000 | FFFE | 000A | 0166 | 0148 | 0000 | 0000 |
| 0000247460 | 0003 | 0000 | 0000 | 0000 | 0000 | 0000 | 635F | 6E68 |
| 0000247500 | 006C | 0000 | 0000 | 0000 | FFFE | 000A | 010F | 0000 |
| 0000247520 | 0000 | 0000 | 0002 | 0000 | 0000 | 0164 | 0000 | 0000 |
| 0000247540 | 525F | 4445 | 435F | 0048 | 0000 | 0000 | FFFF | 000B |
| 0000247560 | 0110 | 0000 | 0000 | 0000 | 0002 | 0000 | 0000 | 0000 |
| 0000247600 | 0000 | 0000 | 0000 | 0000 | 0220 | 0000 | 0001 | 0000 |

THU MAR 14 17:37:32 1991 GSPMON.4 PAGE 92, LINE 5370

| | | | | | | | | |
|---|---|---|---|---|---|---|---|---|
| 0000247620 | FFFF | 000B | 0110 | 0000 | 0000 | 0000 | 0002 | 0000 |
| 0000247640 | 0000 | 0000 | 0000 | 0000 | 425F | 554C | 5F45 | 4843 |
| 0000247660 | 0002 | 0000 | FFFF | 000B | 0110 | 0000 | 0000 | 0000 |
| 0000247700 | 0002 | 0000 | 0000 | 0000 | 0000 | 0000 | 0000 | 0000 |
| 0000247720 | 022A | 0000 | 0003 | 0000 | FFFF | 000B | 0110 | 0000 |
| 0000247740 | 0000 | 0000 | 0002 | 0000 | 0000 | 0000 | 0000 | 0000 |
| 0000247760 | 652E | 736F | 0000 | 0000 | 0000 | 0000 | FFFE | 000A |
| 0000250000 | 0166 | 0158 | 0000 | 0000 | 0002 | 0000 | 0000 | 0000 |
| 0000250020 | 0000 | 0000 | 0000 | 0000 | 0236 | 0000 | 0000 | 0000 |
| 0000250040 | FFFE | 000A | 010F | 0000 | 0000 | 0000 | 0001 | 0000 |
| 0000250060 | 0000 | 016C | 0000 | 0000 | 0000 | 0000 | 0240 | 0000 |
| 0000250100 | 0000 | 0000 | FFFF | 000B | 0110 | 0000 | 0000 | 0000 |
| 0000250120 | 0001 | 0000 | 0000 | 0000 | 0000 | 0000 | 435F | 4359 |
| 0000250140 | 494C | 0043 | 0001 | 0000 | FFFF | 000B | 0110 | 0000 |
| 0000250160 | 0000 | 0000 | 0001 | 0000 | 0000 | 0000 | 0000 | 0000 |
| 0000250200 | 652E | 736F | 0000 | 0000 | 0000 | 0000 | FFFE | 000A |
| 0000250220 | 0166 | 0164 | 0000 | 0000 | 0001 | 0000 | 0000 | 0000 |
| 0000250240 | 0000 | 0000 | 662E | 6C69 | 0065 | 0000 | 016E | 0000 |
| 0000250260 | FFFE | 0000 | 0167 | 7367 | 6D70 | 6E6F | 632E | 0000 |
| 0000250300 | 0000 | 0000 | 0000 | 0000 | 662E | 6C69 | 0065 | 0000 |
| 0000250320 | 01CC | 0000 | FFFE | 0000 | 0167 | 7367 | 6870 | 6377 |
| 0000250340 | 682E | 0000 | 0000 | 0000 | 0000 | 0060 | 372E | 6166 |
| 0000250360 | 656B | 0000 | 0000 | 0000 | FFFE | 0008 | 010A | 0000 |
| 0000250400 | 0000 | 0000 | 0010 | 0000 | 0000 | 0188 | 0000 | 0000 |
| 0000250420 | 0000 | 0000 | 024A | 0000 | 0000 | 0000 | FFFF | 000E |
| 0000250440 | 0112 | 0000 | 0000 | 0000 | 0002 | 0000 | 0000 | 0000 |
| 0000250460 | 0000 | 0000 | 665F | 6C69 | 306C | 0000 | 0002 | 0000 |
| 0000250500 | FFFF | 000E | 0112 | 0000 | 0000 | 0000 | 0001 | 0000 |
| 0000250520 | 0000 | 0000 | 0000 | 0000 | 635F | 726C | 7265 | 0072 |
| 0000250540 | 0003 | 0000 | FFFF | 000E | 0112 | 0000 | 0000 | 0000 |
| 0000250560 | 0001 | 0000 | 0000 | 0000 | 0000 | 0000 | 665F | 6C69 |
| 0000250600 | 316C | 0000 | 0004 | 0000 | FFFF | 000E | 0112 | 0000 |
| 0000250620 | 0000 | 0000 | 0002 | 0000 | 0000 | 0000 | 0000 | 0000 |
| 0000250640 | 6D5F | 6B73 | 6573 | 006C | 0006 | 0000 | FFFF | 000E |
| 0000250660 | 0112 | 0000 | 0000 | 0000 | 0002 | 0000 | 0000 | 0000 |
| 0000250700 | 0000 | 0000 | 665F | 6468 | 7369 | 0070 | 0008 | 0000 |
| 0000250720 | FFFF | 000E | 0112 | 0000 | 0000 | 0000 | 0004 | 0000 |
| 0000250740 | 0000 | 0000 | 0000 | 0000 | 645F | 7369 | 6170 | 6C6C |
| 0000250760 | 000C | 0000 | FFFF | 000E | 0112 | 0000 | 0000 | 0000 |
| 0000251000 | 0001 | 0000 | 0000 | 0000 | 0000 | 0000 | 665F | 5F62 |
| 0000251020 | 6E65 | 0000 | 000D | 0000 | FFFF | 000E | 0112 | 0000 |
| 0000251040 | 0000 | 0000 | 0001 | 0000 | 0000 | 0000 | 0000 | 0000 |
| 0000251060 | 7A5F | 7265 | 5F6F | 0062 | 000E | 0000 | FFFF | 000E |
| 0000251100 | 0112 | 0000 | 0000 | 0000 | 0001 | 0000 | 0000 | 0000 |
| 0000251120 | 0000 | 0000 | 7A5F | 7265 | 5F6F | 0061 | 000F | 0000 |
| 0000251140 | FFFF | 000E | 0112 | 0000 | 0000 | 0000 | 0001 | 0000 |
| 0000251160 | 0000 | 0000 | 0000 | 0000 | 652E | 736F | 0000 | 0000 |
| 0000251200 | 0000 | 0000 | FFFE | 0008 | 0166 | 0170 | 0000 | 0000 |
| 0000251220 | 0010 | 0000 | 0000 | 0000 | 0000 | 0000 | 382E | 6166 |
| 0000251240 | 656B | 0000 | 0000 | 0000 | FFFE | 0008 | 010A | 0000 |
| 0000251260 | 0000 | 0000 | 0010 | 0000 | 0000 | 01A0 | 0000 | 0000 |
| 0000251300 | 6D5F | 6B73 | 6E65 | 0034 | 0000 | 0000 | FFFF | 000E |
| 0000251320 | 0112 | 0000 | 0000 | 0000 | 0001 | 0000 | 0000 | 0000 |
| 0000251340 | 0000 | 0000 | 6D5F | 6B73 | 6E65 | 0035 | 0001 | 0000 |
| 0000251360 | FFFF | 000E | 0112 | 0000 | 0000 | 0000 | 0001 | 0000 |
| 0000251400 | 0000 | 0000 | 0000 | 0000 | 705F | 6C6F | 7261 | 0034 |
| 0000251420 | 0002 | 0000 | FFFF | 000E | 0112 | 0000 | 0000 | 0000 |
| 0000251440 | 0001 | 0000 | 0000 | 0000 | 0000 | 0000 | 705F | 6C6F |
| 0000251460 | 7261 | 0035 | 0003 | 0000 | FFFF | 000E | 0112 | 0000 |

THU MAR 14 17:37:32 1991 GSPMON.4 PAGE 93, LINE 5429

| | | | | | | | | |
|---|---|---|---|---|---|---|---|---|
| 0000251500 | 0000 | 0000 | 0001 | 0000 | 0000 | 0000 | 0000 | 0000 |
| 0000251520 | 615F | 756C | 6E66 | 0063 | 0004 | 0000 | FFFF | 000E |
| 0000251540 | 0112 | 0000 | 0000 | 0000 | 0003 | 0000 | 0000 | 0000 |
| 0000251560 | 0000 | 0000 | 615F | 756C | 7263 | 0079 | 0007 | 0000 |
| 0000251600 | FFFF | 000E | 0112 | 0000 | 0000 | 0000 | 0001 | 0000 |
| 0000251620 | 0000 | 000C | 0000 | 0000 | 615F | 7273 | 0063 | 0000 |
| 0000251640 | 0008 | 0000 | FFFF | 000E | 0112 | 0000 | 0000 | 0000 |
| 0000251660 | 0002 | 0000 | 0000 | 0000 | 0000 | 0000 | 625F | 7273 |
| 0000251700 | 0063 | 0000 | 000A | 0000 | FFFF | 000E | 0112 | 0000 |
| 0000251720 | 0000 | 0000 | 0002 | 0000 | 0000 | 0000 | 0000 | 0000 |
| 0000251740 | 635F | 7273 | 0063 | 0000 | 000C | 0000 | FFFF | 000E |
| 0000251760 | 0112 | 0000 | 0000 | 0000 | 0002 | 0000 | 0000 | 0000 |
| 0000252000 | 0000 | 0000 | 645F | 7273 | 0063 | 0000 | 000E | 0000 |
| 0000252020 | FFFF | 000E | 0112 | 0000 | 0000 | 0000 | 0002 | 0000 |
| 0000252040 | 0000 | 0000 | 0000 | 0000 | 652E | 736F | 0000 | 0000 |
| 0000252060 | 0000 | 0000 | FFFE | 0008 | 0166 | 0188 | 0000 | 0000 |
| 0000252100 | 0010 | 0000 | 0000 | 0000 | 0000 | 0000 | 392E | 6166 |
| 0000252120 | 656B | 0000 | 0000 | 0000 | FFFE | 0008 | 010A | 0000 |
| 0000252140 | 0000 | 0000 | 0010 | 0000 | 0000 | 01B8 | 0000 | 0000 |
| 0000252160 | 655F | 636E | 6B68 | 0000 | 0000 | 0000 | FFFF | 000E |
| 0000252200 | 0112 | 0000 | 0000 | 0000 | 0001 | 0000 | 0000 | 0000 |
| 0000252220 | 0000 | 0000 | 675F | 6172 | 3262 | 0000 | 0001 | 0000 |
| 0000252240 | FFFF | 000E | 0112 | 0000 | 0000 | 0000 | 0001 | 0000 |
| 0000252260 | 0000 | 0000 | 0000 | 0000 | 6D5F | 6362 | 0035 | 0000 |
| 0000252300 | 0002 | 0000 | FFFF | 000E | 0112 | 0000 | 0000 | 0000 |
| 0000252320 | 0002 | 0000 | 0000 | 0000 | 0000 | 0000 | 6D5F | 6362 |
| 0000252340 | 0034 | 0000 | 0004 | 0000 | FFFF | 000E | 0112 | 0000 |
| 0000252360 | 0000 | 0000 | 0002 | 0000 | 0000 | 0000 | 0000 | 0000 |
| 0000252400 | 6D5F | 6362 | 0033 | 0000 | 0006 | 0000 | FFFF | 000E |
| 0000252420 | 0112 | 0000 | 0000 | 0000 | 0002 | 0000 | 0000 | 0000 |
| 0000252440 | 0000 | 0000 | 6D5F | 6362 | 0032 | 0000 | 0008 | 0000 |
| 0000252460 | FFFF | 000E | 0112 | 0000 | 0000 | 0000 | 0002 | 0000 |
| 0000252500 | 0000 | 0000 | 0000 | 0000 | 6D5F | 6362 | 0031 | 0000 |
| 0000252520 | 000A | 0000 | FFFF | 000E | 0112 | 0000 | 0000 | 0000 |
| 0000252540 | 0002 | 0000 | 0000 | 0000 | 0000 | 0000 | 6D5F | 6362 |
| 0000252560 | 0030 | 0000 | 000C | 0000 | FFFF | 000E | 0112 | 0000 |
| 0000252600 | 0000 | 0000 | 0002 | 0000 | 0000 | 0000 | 0000 | 0000 |
| 0000252620 | 735F | 6572 | 0000 | 0000 | 000E | 0000 | FFFF | 000E |
| 0000252640 | 0112 | 0000 | 0000 | 0000 | 0001 | 0000 | 0000 | 0000 |
| 0000252660 | 0000 | 0000 | 735F | 6472 | 0000 | 0000 | 000F | 0000 |
| 0000252700 | FFFF | 000E | 0112 | 0000 | 0000 | 0000 | 0001 | 0000 |
| 0000252720 | 0000 | 0000 | 0000 | 0000 | 652E | 736F | 0000 | 0000 |
| 0000252740 | 0000 | 0000 | FFFE | 0008 | 0166 | 01A0 | 0000 | 0000 |
| 0000252760 | 0010 | 0000 | 0000 | 0000 | 0000 | 0000 | 312E | 6630 |
| 0000253000 | 6B61 | 0065 | 0000 | 0000 | FFFE | 0008 | 010A | 0000 |
| 0000253020 | 0000 | 0000 | 0010 | 0000 | 0000 | 01C0 | 0000 | 0000 |
| 0000253040 | 765F | 6469 | 6573 | 006C | 0000 | 0000 | FFFF | 000E |
| 0000253060 | 0112 | 0000 | 0000 | 0000 | 0003 | 0000 | 0000 | 0000 |
| 0000253100 | 0000 | 0000 | 665F | 6C69 | 006C | 0000 | 0003 | 0000 |
| 0000253120 | FFFF | 000E | 0112 | 0000 | 0000 | 0000 | 000D | 0000 |
| 0000253140 | 0000 | 0000 | 0000 | 0000 | 652E | 736F | 0000 | 0000 |
| 0000253160 | 0000 | 0000 | FFFE | 0008 | 0166 | 01B8 | 0000 | 0000 |
| 0000253200 | 0010 | 0000 | 0000 | 0000 | 0000 | 0000 | 312E | 6631 |
| 0000253220 | 6B61 | 0065 | 0000 | 0000 | FFFE | 0008 | 010A | 0000 |
| 0000253240 | 0000 | 0000 | 0040 | 0000 | 0000 | 01CC | 0000 | 0000 |
| 0000253260 | 635F | 746E | 6C72 | 0030 | 0000 | 0000 | FFFF | 0008 |
| 0000253300 | 0108 | 0170 | 0000 | 0000 | 0010 | 0000 | 0000 | 0000 |
| 0000253320 | 0000 | 0000 | 635F | 746E | 6C72 | 0031 | 0010 | 0000 |
| 0000253340 | FFFF | 0008 | 0108 | 0188 | 0000 | 0000 | 0010 | 0000 |

THU MAR 14 17:37:32 1991 GSPMON.4 PAGE 94, LINE 5488

| | | | | | | | | |
|---|---|---|---|---|---|---|---|---|
| 0000253360 | 0000 | 0000 | 0000 | 0000 | 635F | 746E | 6C72 | 0032 |
| 0000253400 | 0020 | 0000 | FFFF | 0008 | 0108 | 01AD | 0000 | 0000 |
| 0000253420 | 0010 | 0000 | 0000 | 0000 | 0000 | 0000 | 635F | 746E |
| 0000253440 | 6C72 | 0033 | 0030 | 0000 | FFFF | 0008 | 0108 | 01B8 |
| 0000253460 | 0000 | 0000 | 0010 | 0000 | 0000 | 0000 | 0000 | 0000 |
| 0000253500 | 652E | 736F | 0000 | 0000 | 0000 | 0000 | FFFE | 0008 |
| 0000253520 | 0166 | 01C0 | 0000 | 0000 | 0040 | 0000 | 0000 | 0000 |
| 0000253540 | 0000 | 0000 | 662E | 6C69 | 0065 | 0000 | 01CE | 0000 |
| 0000253560 | FFFE | 0000 | 0167 | 7367 | 6D70 | 6E6F | 632E | 0000 |
| 0000253600 | 0000 | 0000 | 0000 | 0000 | 662E | 6C69 | 0065 | 0000 |
| 0000253620 | 01D0 | 0000 | FFFE | 0000 | 0167 | 7367 | 6370 | 6E6F |
| 0000253640 | 682E | 0000 | 0000 | 0000 | 0000 | 0000 | 662E | 6C69 |
| 0000253660 | 0065 | 0000 | 01D2 | 0000 | FFFE | 0000 | 0167 | 7367 |
| 0000253700 | 6370 | 6E6F | 692E | 636E | 0000 | 0000 | 0000 | 0000 |
| 0000253720 | 662E | 6C69 | 0065 | 0000 | 01D4 | 0000 | FFFE | 0000 |
| 0000253740 | 0167 | 7367 | 6370 | 6E6F | 682E | 0000 | 0000 | 0000 |
| 0000253760 | 0000 | 0000 | 662E | 6C69 | 0065 | 0000 | 020A | 0000 |
| 0000254000 | FFFE | 0000 | 0167 | 7367 | 6D70 | 6E6F | 632E | 0000 |
| 0000254020 | 0000 | 0000 | C300 | 0000 | 6D5F | 6961 | 006E | 0000 |
| 0000254040 | 2000 | FFC0 | 0001 | 0024 | 0102 | 0000 | 0000 | 0C30 |
| 0000254060 | 0000 | D742 | 0000 | 01DE | 0000 | 0003 | 622E | 0066 |
| 0000254100 | 0000 | 0000 | 2000 | FFC0 | 0001 | 0000 | 0165 | 0000 |
| 0000254120 | 0000 | 0044 | 0000 | 0000 | 0000 | 01FE | 0000 | 0000 |
| 0000254140 | 725F | 7165 | 6575 | 7473 | 0000 | 0000 | FFFF | 0008 |
| 0000254160 | 0101 | 0026 | 0000 | 0000 | 0010 | 0000 | 0000 | 0000 |
| 0000254200 | 0000 | 0000 | 652E | 0066 | 0000 | 0000 | 2C30 | FFC0 |
| 0000254220 | 0001 | 0000 | 0165 | 0000 | 0000 | 0077 | 0000 | 0000 |
| 0000254240 | 0000 | 0000 | 0000 | 0000 | 0000 | 0000 | 0254 | 0000 |
| 0000254260 | 2C30 | FFC0 | 0001 | 0020 | 0102 | 0000 | 0000 | 0230 |
| 0000254300 | 0000 | D81A | 0000 | 01E4 | 0000 | 0002 | 622E | 0066 |
| 0000254320 | 0000 | 0000 | 2C30 | FFC0 | 0001 | 0000 | 0165 | 0000 |
| 0000254340 | 0000 | 007A | 0000 | 0000 | 0000 | 0204 | 0000 | 0000 |
| 0000254360 | 652E | 0066 | 0000 | 0000 | 2E60 | FFC0 | 0001 | 0000 |
| 0000254400 | 0165 | 0000 | 0000 | 0081 | 0000 | 0000 | 0000 | 0000 |
| 0000254420 | 0000 | 0000 | 0000 | 0000 | 0269 | 0000 | 2E60 | FFC0 |
| 0000254440 | 0001 | 0024 | 0102 | 0000 | 0000 | 0060 | 0000 | D832 |
| 0000254460 | 0000 | 01EE | 0000 | 0001 | 622E | 0066 | 0000 | 0000 |
| 0000254500 | 2E60 | FFC0 | 0001 | 0000 | 0165 | 0000 | 0000 | 0084 |
| 0000254520 | 0000 | 0000 | 0000 | 020E | 0000 | 0000 | 635F | 646F |
| 0000254540 | 0065 | 0000 | FFE0 | FFFF | FFFF | 000D | 0109 | 0000 |
| 0000254560 | 0000 | 0000 | 0010 | 0000 | 0000 | 0000 | 0000 | 0000 |
| 0000254600 | 0000 | 0000 | 0274 | 0000 | FFC0 | FFFF | FFFF | 0010 |
| 0000254620 | 0109 | 0000 | 0000 | 0000 | 0020 | 0000 | 0000 | 0000 |
| 0000254640 | 0000 | 0000 | 652E | 0066 | 0000 | 0000 | 2EC0 | FFC0 |
| 0000254660 | 0001 | 0000 | 0165 | 0000 | 0000 | 0088 | 0000 | 0000 |
| 0000254700 | 0000 | 0000 | 0000 | 0000 | 0000 | 0000 | 027F | 0000 |
| 0000254720 | 2EC0 | FFC0 | 0001 | 0020 | 0102 | 0000 | 0000 | 0290 |
| 0000254740 | 0000 | D838 | 0000 | 01F4 | 0000 | 0002 | 622E | 0066 |
| 0000254760 | 0000 | 0000 | 2EC0 | FFC0 | 0001 | 0000 | 0165 | 0000 |
| 0000255000 | 0000 | 008B | 0000 | 0000 | 0000 | 0214 | 0000 | 0000 |
| 0000255020 | 652E | 0066 | 0000 | 0000 | 3150 | FFC0 | 0001 | 0000 |
| 0000255040 | 0165 | 0000 | 0000 | 0095 | 0000 | 0000 | 0000 | 0000 |
| 0000255060 | 0000 | 0000 | 635F | 695F | 746E | 3230 | 3150 | FFC0 |
| 0000255100 | 0001 | 0020 | 0102 | 0000 | 0000 | 0010 | 0000 | D85C |
| 0000255120 | 0000 | 01FA | 0000 | 0000 | 622E | 0066 | 0000 | 0000 |
| 0000255140 | 3150 | FFC0 | 0001 | 0000 | 0165 | 0000 | 0000 | 0098 |
| 0000255160 | 0000 | 0000 | 0000 | 021A | 0000 | 0000 | 652E | 0066 |
| 0000255200 | 0000 | 0000 | 3160 | FFC0 | 0001 | 0000 | 0165 | 0000 |
| 0000255220 | 0000 | 009A | 0000 | 0000 | 0000 | 0000 | 0000 | 0000 |

THU MAR 14 17:37:32 1991 GSPMON.4 PAGE 95, LINE 5547

| | | | | | | | | |
|---|---|---|---|---|---|---|---|---|
| 0000255240 | 635F | 695F | 746E | 3930 | 3160 | FFC0 | 0001 | 0020 |
| 0000255260 | 0102 | 0000 | 0000 | 0B80 | 0000 | D862 | 0000 | 0204 |
| 0000255300 | 0000 | 0004 | 622E | 0066 | 0000 | 0000 | 3160 | FFC0 |
| 0000255320 | 0001 | 0000 | 0165 | 0000 | 0000 | 009D | 0000 | 0000 |
| 0000255340 | 0000 | 0224 | 0000 | 0000 | 0000 | 0000 | 028F | 0000 |
| 0000255360 | 0000 | 0000 | FFFF | 000C | 0101 | 0000 | 0000 | 0000 |
| 0000255400 | 0008 | 0000 | 0000 | 0000 | 0000 | 0000 | 725F | 7165 |
| 0000255420 | 6575 | 7473 | 0010 | 0000 | FFFF | 0008 | 0101 | 0026 |
| 0000255440 | 0000 | 0000 | 0010 | 0000 | 0000 | 0000 | 0000 | 0000 |
| 0000255460 | 652E | 0066 | 0000 | 0000 | 3CE0 | FFC0 | 0001 | 0000 |
| 0000255500 | 0165 | 0000 | 0000 | 00CB | 0000 | 0000 | 0000 | 0000 |
| 0000255520 | 0000 | 0000 | 742E | 7865 | 0074 | 0000 | 2000 | FFC0 |
| 0000255540 | 0001 | 0000 | 0103 | 1CE0 | 0000 | 0048 | 004E | 0000 |
| 0000255560 | 0000 | 0000 | 0000 | 0000 | 642E | 7461 | 0061 | 0000 |
| 0000255600 | 0000 | 0000 | 0004 | 0000 | 0103 | 0000 | 0000 | 0000 |
| 0000255620 | 0000 | 0000 | 0000 | 0000 | 0000 | 0000 | 622E | 7373 |
| 0000255640 | 0000 | 0000 | D3A0 | FFC6 | 0003 | 0000 | 0103 | 03D0 |
| 0000255660 | 0000 | 0000 | 0000 | 0000 | 0000 | 0000 | 0000 | 0000 |
| 0000255700 | 662E | 6C69 | 0065 | 0000 | 020C | 0000 | FFFE | 0000 |
| 0000255720 | 0167 | 7367 | 7370 | 7379 | 632E | 0000 | 0000 | 0000 |
| 0000255740 | 0000 | 0000 | 662E | 6C69 | 0065 | 0000 | 020E | 0000 |
| 0000255760 | FFFE | 0000 | 0167 | 7473 | 6D64 | 682E | 0000 | 0000 |
| 0000256000 | 0000 | 0000 | 0000 | 0000 | 662E | 6C69 | 0065 | 0000 |
| 0000256020 | 0210 | 0000 | FFFE | 0000 | 0167 | 7367 | 7370 | 7379 |
| 0000256040 | 632E | 0000 | 0000 | 0000 | 0000 | 0000 | 662E | 6C69 |
| 0000256060 | 0065 | 0000 | 0212 | 0000 | FFFE | 0000 | 0167 | 6573 |
| 0000256100 | 6A74 | 706D | 682E | 0000 | 0000 | 0000 | 0000 | 0000 |
| 0000256120 | 662E | 6C69 | 0065 | 0000 | 0214 | 0000 | FFFE | 0000 |
| 0000256140 | 0167 | 7367 | 7370 | 7379 | 632E | 0000 | 0000 | 0000 |
| 0000256160 | 0000 | 0000 | 662E | 6C69 | 0065 | 0000 | 0224 | 0000 |
| 0000256200 | FFFE | 0000 | 0167 | 7974 | 6570 | 6564 | 2E66 | 0068 |
| 0000256220 | 0000 | 0000 | 0000 | 0000 | 302E | 6166 | 656B | 0000 |
| 0000256240 | 0000 | 0006 | FFFE | 000A | 010F | 0000 | 0000 | 0000 |
| 0000256260 | 0001 | 0000 | 0000 | 021E | 0000 | 0000 | 465F | 4C41 |
| 0000256300 | 4553 | 0000 | 0000 | 0000 | FFFF | 000B | 0110 | 0000 |
| 0000256320 | 0000 | 0000 | 0001 | 0000 | 0000 | 0000 | 0000 | 0000 |
| 0000256340 | 545F | 5552 | 0045 | 0000 | 0001 | 0000 | FFFF | 000B |
| 0000256360 | 0110 | 0000 | 0000 | 0000 | 0001 | 0000 | 0000 | 0000 |
| 0000256400 | 0000 | 0000 | 652E | 736F | 0000 | 0000 | 0000 | 0000 |
| 0000256420 | FFFE | 000A | 0166 | 0216 | 0000 | 0000 | 0001 | 0000 |
| 0000256440 | 0000 | 0000 | 0000 | 0000 | 312E | 6166 | 656B | 0000 |
| 0000256460 | 0000 | 0000 | FFFE | 0008 | 010A | 0000 | 0000 | 0000 |
| 0000256500 | 0004 | 0000 | 0000 | 0224 | 0000 | 0000 | 705F | 7869 |
| 0000256520 | 6C65 | 0000 | 0000 | 0000 | FFFF | 000E | 0112 | 0000 |
| 0000256540 | 0000 | 0000 | 0004 | 0000 | 0000 | 0000 | 0000 | 0000 |
| 0000256560 | 652E | 736F | 0000 | 0000 | 0000 | 0000 | FFFE | 0008 |
| 0000256600 | 0166 | 021E | 0000 | 0000 | 0004 | 0000 | 0000 | 0000 |
| 0000256620 | 0000 | 0000 | 662E | 6C69 | 0065 | 0000 | 0226 | 0000 |
| 0000256640 | FFFE | 0000 | 0167 | 7367 | 7370 | 7379 | 632E | 0000 |
| 0000256660 | 0000 | 0000 | 0000 | 0000 | 662E | 6C69 | 0065 | 0000 |
| 0000256700 | 0228 | 0000 | FFFE | 0000 | 0167 | 7367 | 6870 | 6477 |
| 0000256720 | 682E | 0000 | 0000 | 0000 | 0000 | 0000 | 662E | 6C69 |
| 0000256740 | 0065 | 0000 | 022A | 0000 | FFFE | 0000 | 0167 | 7367 |
| 0000256760 | 7370 | 7379 | 632E | 0000 | 0000 | 0000 | 0000 | 0000 |
| 0000257000 | 662E | 6C69 | 0065 | 0000 | 0260 | 0000 | FFFE | 0000 |
| 0000257020 | 0167 | 7367 | 7070 | 6F72 | 682E | 0000 | 0000 | 0000 |
| 0000257040 | 0000 | 0000 | 0000 | 0000 | 0299 | 0000 | 0000 | 0000 |
| 0000257060 | FFFE | 000A | 010F | 0000 | 0000 | 0000 | 0003 | 0000 |
| 0000257100 | 0000 | 0240 | 0000 | 0000 | 0000 | 0000 | 02A3 | 0000 |

THU MAR 14 17:37:32 1991 GSPMON.4 PAGE 96, LINE 5606

| | | | | | | | | |
|---|---|---|---|---|---|---|---|---|
| 0000257120 | 0000 | 0000 | FFFF | 000B | 0110 | 0000 | 0000 | 0000 |
| 0000257140 | 0003 | 0000 | 0000 | 0000 | 0000 | 0000 | 0000 | 0000 |
| 0000257160 | 02AE | 0000 | 0001 | 0000 | FFFF | 000B | 0110 | 0000 |
| 0000257200 | 0000 | 0000 | 0003 | 0000 | 0000 | 0000 | 0000 | 0000 |
| 0000257220 | 0000 | 0000 | 02BB | 0000 | 0002 | 0000 | FFFF | 000B |
| 0000257240 | 0110 | 0000 | 0000 | 0000 | 0003 | 0000 | 0000 | 0000 |
| 0000257260 | 0000 | 0000 | 415F | 5050 | 494C | 0043 | 0003 | 0000 |
| 0000257300 | FFFF | 000B | 0110 | 0000 | 0000 | 0000 | 0003 | 0000 |
| 0000257320 | 0000 | 0000 | 0000 | 0000 | 0000 | 0000 | 02C5 | 0000 |
| 0000257340 | 0004 | 0000 | FFFF | 000B | 0110 | 0000 | 0000 | 0000 |
| 0000257360 | 0003 | 0000 | 0000 | 0000 | 0000 | 0000 | 0000 | 0000 |
| 0000257400 | 02D1 | 0000 | 0005 | 0000 | FFFF | 000B | 0110 | 0000 |
| 0000257420 | 0000 | 0000 | 0003 | 0000 | 0000 | 0000 | 0000 | 0000 |
| 0000257440 | 435F | 4D4F | 414D | 444E | 0006 | 0000 | FFFF | 000B |
| 0000257460 | 0110 | 0000 | 0000 | 0000 | 0003 | 0000 | 0000 | 0000 |
| 0000257500 | 0000 | 0000 | 0000 | 0000 | 02DD | 0000 | 0007 | 0000 |
| 0000257520 | FFFF | 000B | 0110 | 0000 | 0000 | 0000 | 0003 | 0000 |
| 0000257540 | 0000 | 0000 | 0000 | 0000 | 652E | 736F | 0000 | 0000 |
| 0000257560 | 0000 | 0000 | FFFE | 000A | 0166 | 022C | 0000 | 0000 |
| 0000257600 | 0003 | 0000 | 0000 | 0000 | 0000 | 0000 | 322E | 6166 |
| 0000257620 | 656B | 0000 | 0000 | 0000 | FFFE | 0008 | 010A | 0000 |
| 0000257640 | 0000 | 0000 | 0010 | 0000 | 0000 | 024A | 0000 | 0000 |
| 0000257660 | 635F | 646F | 0065 | 0000 | 0000 | 0000 | FFFF | 000E |
| 0000257700 | 0112 | 0000 | 0000 | 0000 | 000E | 0000 | 0000 | 0000 |
| 0000257720 | 0000 | 0000 | 635F | 6D5F | 646F | 0065 | 000E | 0000 |
| 0000257740 | FFFF | 000E | 0112 | 0000 | 0000 | 0000 | 0001 | 0000 |
| 0000257760 | 0000 | 0000 | 0000 | 0000 | 0000 | 0000 | 02EA | 0000 |
| 0000260000 | 000F | 0000 | FFFF | 000E | 0112 | 0000 | 0000 | 0000 |
| 0000260020 | 0001 | 0000 | 0000 | 0000 | 0000 | 0000 | 652E | 736F |
| 0000260040 | 0000 | 0000 | 0000 | 0000 | FFFE | 0008 | 0166 | 0240 |
| 0000260060 | 0000 | 0000 | 0010 | 0000 | 0000 | 0000 | 0000 | 0000 |
| 0000260100 | 332E | 6166 | 656B | 0000 | 0000 | 0000 | FFFE | 0008 |
| 0000260120 | 010A | 0000 | 0000 | 0000 | 0010 | 0000 | 0000 | 0258 |
| 0000260140 | 0000 | 0000 | 6D5F | 6773 | 6E69 | 0000 | 0000 | 0000 |
| 0000260160 | FFFF | 000E | 0112 | 0000 | 0000 | 0000 | 0003 | 0000 |
| 0000260200 | 0000 | 0000 | 0000 | 0000 | 695F | 746E | 6E69 | 0000 |
| 0000260220 | 0003 | 0000 | FFFF | 000E | 0112 | 0000 | 0000 | 0000 |
| 0000260240 | 0001 | 0000 | 0000 | 0000 | 0000 | 0000 | 6D5F | 6773 |
| 0000260260 | 756F | 0074 | 0004 | 0000 | FFFF | 000E | 0112 | 0000 |
| 0000260300 | 0000 | 0000 | 0003 | 0000 | 0000 | 0000 | 0000 | 0000 |
| 0000260320 | 695F | 746E | 756F | 0074 | 0007 | 0000 | FFFF | 000E |
| 0000260340 | 0112 | 0000 | 0000 | 0000 | 0001 | 0000 | 0000 | 0000 |
| 0000260360 | 0000 | 0000 | 635F | 7274 | 5F6C | 6968 | 0008 | 0000 |
| 0000260400 | FFFF | 000E | 0112 | 0000 | 0000 | 0000 | 000B | 0000 |
| 0000260420 | 0000 | 0000 | 0000 | 0000 | 652E | 736F | 0000 | 0000 |
| 0000260440 | 0000 | 0000 | FFFE | 0008 | 0166 | 024A | 0000 | 0000 |
| 0000260460 | 0010 | 0000 | 0000 | 0000 | 0000 | 0000 | 342E | 6166 |
| 0000260500 | 656B | 0000 | 0000 | 0000 | FFFE | 0009 | 010C | 0000 |
| 0000260520 | 0000 | 0000 | 0010 | 0000 | 0000 | 0260 | 0000 | 0000 |
| 0000260540 | 665F | 6569 | 646C | 0073 | 0000 | 0000 | FFFF | 0008 |
| 0000260560 | 010B | 024A | 0000 | 0000 | 0010 | 0000 | 0000 | 0000 |
| 0000260600 | 0000 | 0000 | 665F | 6C75 | 006C | 0000 | 0000 | 0000 |
| 0000260620 | FFFF | 000D | 010B | 0000 | 0000 | 0000 | 0010 | 0000 |
| 0000260640 | 0000 | 0000 | 0000 | 0000 | 652E | 736F | 0000 | 0000 |
| 0000260660 | 0000 | 0000 | FFFE | 0009 | 0166 | 0258 | 0000 | 0000 |
| 0000260700 | 0010 | 0000 | 0000 | 0000 | 0000 | 0000 | 662E | 6C69 |
| 0000260720 | 0065 | 0000 | 0262 | 0000 | FFFE | 0000 | 0167 | 7367 |
| 0000260740 | 7370 | 7379 | 632E | 0000 | 0000 | 0000 | 0000 | 0000 |
| 0000260760 | 662E | 6C69 | 0065 | 0000 | 0270 | 0000 | FFFE | 0000 |

THU MAR 14 17:37:32 1991 GSPMON.4 PAGE 97, LINE 5665

| | | | | | | | | |
|---|---|---|---|---|---|---|---|---|
| 0000261000 | 0167 | 7367 | 6D70 | 6E6F | 682E | 0000 | 0000 | 0000 |
| 0000261020 | 0000 | 0000 | 352E | 6166 | 656B | 0000 | 0000 | 0000 |
| 0000261040 | FFFE | 000A | 010F | 0000 | 0000 | 0000 | 0002 | 0000 |
| 0000261060 | 0000 | 0270 | 0000 | 0000 | 0000 | 0000 | 02F5 | 0000 |
| 0000261100 | 0000 | 0000 | FFFF | 000B | 0110 | 0000 | 0000 | 0000 |
| 0000261120 | 0002 | 0000 | 0000 | 0000 | 0000 | 0000 | 0000 | 0000 |
| 0000261140 | 0300 | 0000 | 0001 | 0000 | FFFF | 000B | 0110 | 0000 |
| 0000261160 | 0000 | 0000 | 0002 | 0000 | 0000 | 0000 | 0000 | 0000 |
| 0000261200 | 0000 | 0000 | 030A | 0000 | 0002 | 0000 | FFFF | 000B |
| 0000261220 | 0110 | 0000 | 0000 | 0000 | 0002 | 0000 | 0000 | 0000 |
| 0000261240 | 0000 | 0000 | 0000 | 0000 | 0315 | 0000 | 0003 | 0000 |
| 0000261260 | FFFF | 000B | 0110 | 0000 | 0000 | 0000 | 0002 | 0000 |
| 0000261300 | 0000 | 0000 | 0000 | 0000 | 652E | 736F | 0000 | 0000 |
| 0000261320 | 0000 | 0000 | FFFE | 000A | 0166 | 0264 | 0000 | 0000 |
| 0000261340 | 0002 | 0000 | 0000 | 0000 | 0000 | 0000 | 662E | 6C69 |
| 0000261360 | 0065 | 0000 | 0272 | 0000 | FFFE | 0000 | 0167 | 7367 |
| 0000261400 | 6D70 | 6E6F | 692E | 636E | 0000 | 0000 | 0000 | 0000 |
| 0000261420 | 662E | 6C69 | 0065 | 0000 | 0274 | 0000 | FFFE | 0000 |
| 0000261440 | 0167 | 7367 | 6D70 | 6E6F | 682E | 0000 | 0000 | 0000 |
| 0000261460 | 0000 | 0000 | 662E | 6C69 | 0065 | 0000 | 02B2 | 0000 |
| 0000261500 | FFFE | 0000 | 0167 | 7367 | 7370 | 7379 | 632E | 0000 |
| 0000261520 | 0000 | 0000 | 0000 | 0000 | 0000 | 0000 | 0321 | 0000 |
| 0000261540 | 3CE0 | FFC0 | 0001 | 0020 | 0102 | 0000 | 0000 | 0130 |
| 0000261560 | 0000 | D916 | 0000 | 0282 | 0000 | 0002 | 622E | 0066 |
| 0000261600 | 0000 | 0000 | 3CE0 | FFC0 | 0001 | 0000 | 0165 | 0000 |
| 0000261620 | 0000 | 002C | 0000 | 0000 | 0000 | 007A | 0000 | 0000 |
| 0000261640 | 695F | 746E | 6E5F | 6D75 | FFE0 | FFFF | FFFF | 0003 |
| 0000261660 | 0109 | 0000 | 0000 | 0000 | 0010 | 0000 | 0000 | 0000 |
| 0000261700 | 0000 | 0000 | 0000 | 0000 | 0332 | 0000 | FFC0 | FFFF |
| 0000261720 | FFFF | 0010 | 0109 | 0000 | 0000 | 0000 | 0020 | 0000 |
| 0000261740 | 0000 | 0000 | 0000 | 0000 | 0000 | 0000 | 033C | 0000 |
| 0000261760 | 0000 | 0000 | FFFF | 0050 | 0101 | 0000 | 0000 | 0000 |
| 0000262000 | 0020 | 0000 | 0000 | 0000 | 0000 | 0000 | 652E | 0066 |
| 0000262020 | 0000 | 0000 | 3E10 | FFC0 | 0001 | 0000 | 0165 | 0000 |
| 0000262040 | 0000 | 0035 | 0000 | 0000 | 0000 | 0000 | 0000 | 0000 |
| 0000262060 | 0000 | 0000 | 0346 | 0000 | 3E10 | FFC0 | 0001 | 0020 |
| 0000262100 | 0102 | 0000 | 0000 | 01D0 | 0000 | D928 | 0000 | 028C |
| 0000262120 | 0000 | 0004 | 622E | 0066 | 0000 | 0000 | 3E10 | FFC0 |
| 0000262140 | 0001 | 0000 | 0165 | 0000 | 0000 | 0037 | 0000 | 0000 |
| 0000262160 | 0000 | 0084 | 0000 | 0000 | 695F | 746E | 6E5F | 6D75 |
| 0000262200 | FFE0 | FFFF | FFFF | 0003 | 0109 | 0000 | 0000 | 0000 |
| 0000262220 | 0010 | 0000 | 0000 | 0000 | 0000 | 0000 | 0000 | 0000 |
| 0000262240 | 0356 | 0000 | 0000 | 0000 | FFFF | 0013 | 0101 | 0000 |
| 0000262260 | 0000 | 0000 | 0020 | 0000 | 0000 | 0000 | 0000 | 0000 |
| 0000262300 | 652E | 0066 | 0000 | 0000 | 3FE0 | FFC0 | 0001 | 0000 |
| 0000262320 | 0165 | 0000 | 0000 | 0043 | 0000 | 0000 | 0000 | 0000 |
| 0000262340 | 0000 | 0000 | 0000 | 0000 | 0360 | 0000 | 3FE0 | FFC0 |
| 0000262360 | 0001 | 0020 | 0102 | 0000 | 0000 | 01D0 | 0000 | D946 |
| 0000262400 | 0000 | 0296 | 0000 | 0004 | 622E | 0066 | 0000 | 0000 |
| 0000262420 | 3FE0 | FFC0 | 0001 | 0000 | 0165 | 0000 | 0000 | 0046 |
| 0000262440 | 0000 | 0000 | 0000 | 008E | 0000 | 0000 | 695F | 746E |
| 0000262460 | 6E5F | 6D75 | FFE0 | FFFF | FFFF | 0003 | 0109 | 0000 |
| 0000262500 | 0000 | 0000 | 0010 | 0000 | 0000 | 0000 | 0000 | 0000 |
| 0000262520 | 0000 | 0000 | 0371 | 0000 | 0000 | 0000 | FFFF | 0013 |
| 0000262540 | 0101 | 0000 | 0000 | 0000 | 0020 | 0000 | 0000 | 0000 |
| 0000262560 | 0000 | 0000 | 652E | 0066 | 0000 | 0000 | 41B0 | FFC0 |
| 0000262600 | 0001 | 0000 | 0165 | 0000 | 0000 | 0052 | 0000 | 0000 |
| 0000262620 | 0000 | 0000 | 0000 | 0000 | 0000 | 0000 | 037B | 0000 |
| 0000262640 | 41B0 | FFC0 | 0001 | 0020 | 0102 | 0000 | 0000 | 02E0 |

THU MAR 14 17:37:32 1991 GSPMON.4 PAGE 98, LINE 5724

| | | | | | | | | |
|---|---|---|---|---|---|---|---|---|
| 0000262660 | 0000 | D964 | 0000 | 029E | 0000 | 0003 | 622E | 0066 |
| 0000262700 | 0000 | 0000 | 41B0 | FFC0 | 0001 | 0000 | 0165 | 0000 |
| 0000262720 | 0000 | 0054 | 0000 | 0000 | 0000 | 0096 | 0000 | 0000 |
| 0000262740 | 0000 | 0000 | 038E | 0000 | FFE0 | FFFF | FFFF | 0003 |
| 0000262760 | 0109 | 0000 | 0000 | 0000 | 0010 | 0000 | 0000 | 0000 |
| 0000263000 | 0000 | 0000 | 652E | 0066 | 0000 | 0000 | 4490 | FFC0 |
| 0000263020 | 0001 | 0000 | 0165 | 0000 | 0000 | 0060 | 0000 | 0000 |
| 0000263040 | 0000 | 0000 | 0000 | 0000 | 0000 | 0000 | 0399 | 0000 |
| 0000263060 | 4490 | FFC0 | 0001 | 0020 | 0102 | 0000 | 0000 | 0400 |
| 0000263100 | 0000 | D98E | 0000 | 02AA | 0000 | 0003 | 622E | 0066 |
| 0000263120 | 0000 | 0000 | 4490 | FFC0 | 0001 | 0000 | 0165 | 0000 |
| 0000263140 | 0000 | 0063 | 0000 | 0000 | 0000 | 00A2 | 0000 | 0000 |
| 0000263160 | 0000 | 0000 | 03AE | 0000 | FFE0 | FFFF | FFFF | 0003 |
| 0000263200 | 0109 | 0000 | 0000 | 0000 | 0010 | 0000 | 0000 | 0000 |
| 0000263220 | 0000 | 0000 | 0000 | 0000 | 03BA | 0000 | FFC0 | FFFF |
| 0000263240 | FFFF | 0010 | 0109 | 0000 | 0000 | 0000 | 0020 | 0000 |
| 0000263260 | 0000 | 0000 | 0000 | 0000 | 0000 | 0000 | 03C6 | 0000 |
| 0000263300 | FFA0 | FFFF | FFFF | 000D | 0109 | 0000 | 0000 | 0000 |
| 0000263320 | 0010 | 0000 | 0000 | 0000 | 0000 | 0000 | 652E | 0066 |
| 0000263340 | 0000 | 0000 | 4890 | FFC0 | 0001 | 0000 | 0165 | 0000 |
| 0000263360 | 0000 | 0074 | 0000 | 0000 | 0000 | 0000 | 0000 | 0000 |
| 0000263400 | 742E | 7865 | 0074 | 0000 | 3CE0 | FFC0 | 0001 | 0000 |
| 0000263420 | 0103 | 0BB0 | 0000 | 000E | 001D | 0000 | 0000 | 0000 |
| 0000263440 | 0000 | 0000 | 642E | 7461 | 0061 | 0000 | 0000 | 0000 |
| 0000263460 | 0004 | 0000 | 0103 | 0000 | 0000 | 0000 | 0000 | 0000 |
| 0000263500 | 0000 | 0000 | 0000 | 0000 | 622E | 7373 | 0000 | 0000 |
| 0000263520 | D770 | FFC6 | 0003 | 0000 | 0103 | 0010 | 0000 | 0000 |
| 0000263540 | 0000 | 0000 | 0000 | 0000 | 0000 | 0000 | 632E | 6E69 |
| 0000263560 | 7469 | 0000 | B960 | FFC6 | 0002 | 0000 | 0103 | 0040 |
| 0000263600 | 0000 | 0001 | 0000 | 0000 | 0000 | 0000 | 0000 | 0000 |
| 0000263620 | 662E | 6C69 | 0065 | 0000 | 02B4 | 0000 | FFFE | 0000 |
| 0000263640 | 0167 | 7367 | 6670 | 636E | 632E | 0000 | 0000 | 0000 |
| 0000263660 | 0000 | 0000 | 662E | 6C69 | 0065 | 0000 | 02B6 | 0000 |
| 0000263700 | FFFE | 0000 | 0167 | 7473 | 6D64 | 682E | 0000 | 0000 |
| 0000263720 | 0000 | 0000 | 0000 | 0000 | 662E | 6C69 | 0065 | 0000 |
| 0000263740 | 02B8 | 0000 | FFFE | 0000 | 0167 | 7367 | 6670 | 636E |
| 0000263760 | 632E | 0000 | 0000 | 0000 | 0000 | 0000 | 662E | 6C69 |
| 0000264000 | 0065 | 0000 | 02BA | 0000 | FFFE | 0000 | 0167 | 7367 |
| 0000264020 | 6670 | 636E | 682E | 0000 | 0000 | 0000 | 0000 | 0000 |
| 0000264040 | 662E | 6C69 | 0065 | 0000 | 02BC | 0000 | FFFE | 0000 |
| 0000264060 | 0167 | 7367 | 6670 | 636E | 692E | 636E | 0000 | 0000 |
| 0000264100 | 0000 | 0000 | 662E | 6C69 | 0065 | 0000 | 02BE | 0000 |
| 0000264120 | FFFE | 0000 | 0167 | 7367 | 6670 | 636E | 682E | 0000 |
| 0000264140 | 0000 | 0000 | 0000 | 0000 | 662E | 6C69 | 0065 | 0000 |
| 0000264160 | 02CC | 0000 | FFFE | 0000 | 0167 | 7367 | 6670 | 636E |
| 0000264200 | 632E | 0000 | 0000 | 0000 | 0000 | 0000 | 0000 | 0000 |
| 0000264220 | 03D3 | 0000 | 4890 | FFC0 | 0001 | 0020 | 0102 | 0000 |
| 0000264240 | 0000 | 14F0 | 0000 | D9C4 | 0000 | 02C6 | 0000 | 0002 |
| 0000264260 | 622E | 0066 | 0000 | 0000 | 4890 | FFC0 | 0001 | 0000 |
| 0000264300 | 0165 | 0000 | 0000 | 0030 | 0000 | 0000 | 0000 | 0016 |
| 0000264320 | 0000 | 0000 | 652E | 0066 | 0000 | 0000 | 5D80 | FFC0 |
| 0000264340 | 0001 | 0000 | 0165 | 0000 | 0000 | 006A | 0000 | 0000 |
| 0000264360 | 0000 | 0000 | 0000 | 0000 | 742E | 7865 | 0074 | 0000 |
| 0000264400 | 4890 | FFC0 | 0001 | 0000 | 0103 | 14F0 | 0000 | 006E |
| 0000264420 | 0038 | 0000 | 0000 | 0000 | 0000 | 0000 | 642E | 7461 |
| 0000264440 | 0061 | 0000 | 0000 | 0000 | 0004 | 0000 | 0103 | 0000 |
| 0000264460 | 0000 | 0000 | 0000 | 0000 | 0000 | 0000 | 0000 | 0000 |
| 0000264500 | 622E | 7373 | 0000 | 0000 | D780 | FFC6 | 0003 | 0000 |
| 0000264520 | 0103 | 2000 | 0000 | 0000 | 0000 | 0000 | 0000 | 0000 |

THU MAR 14 17:37:32 1991 GSPMON.4 PAGE 99, LINE 5783

| | | | | | | | | |
|---|---|---|---|---|---|---|---|---|
| 0000264540 | 0000 | 0000 | 662E | 6C69 | 0065 | 0000 | 02CE | 0000 |
| 0000264560 | FFFE | 0000 | 0167 | 7367 | 6870 | 6377 | 632E | 0000 |
| 0000264600 | 0000 | 0000 | 0000 | 0000 | 662E | 6C69 | 0065 | 0000 |
| 0000264620 | 02D0 | 0000 | FFFE | 0000 | 0167 | 7473 | 6D64 | 682E |
| 0000264640 | 0000 | 0000 | 0000 | 0000 | 0000 | 0000 | 662E | 6C69 |
| 0000264660 | 0065 | 0000 | 02D2 | 0000 | FFFE | 0000 | 0167 | 7367 |
| 0000264700 | 6870 | 6377 | 632E | 0000 | 0000 | 0000 | 0000 | 0000 |
| 0000264720 | 662E | 6C69 | 0065 | 0000 | 02E2 | 0000 | FFFE | 0000 |
| 0000264740 | 0167 | 7974 | 6570 | 6564 | 2E66 | 0068 | 0000 | 0000 |
| 0000264760 | 0000 | 0000 | 302E | 6166 | 656B | 0000 | 0000 | 0000 |
| 0000265000 | FFFE | 000A | 010F | 0000 | 0000 | 0000 | 0001 | 0000 |
| 0000265020 | 0000 | 02DC | 0000 | 0000 | 465F | 4C41 | 4553 | 0000 |
| 0000265040 | 0000 | 0000 | FFFF | 000B | 0110 | 0000 | 0000 | 0000 |
| 0000265060 | 0001 | 0000 | 0000 | 0000 | 0000 | 0000 | 545F | 5552 |
| 0000265100 | 0045 | 0000 | 0001 | 0000 | FFFF | 000B | 0110 | 0000 |
| 0000265120 | 0000 | 0000 | 0001 | 0000 | 0000 | 0000 | 0000 | 0000 |
| 0000265140 | 652E | 736F | 0000 | 0000 | 0000 | 0000 | FFFE | 000A |
| 0000265160 | 0166 | 02D4 | 0000 | 0000 | 0001 | 0000 | 0000 | 0000 |
| 0000265200 | 0000 | 0000 | 312E | 6166 | 656B | 0000 | 0000 | 0000 |
| 0000265220 | FFFE | 0008 | 010A | 0000 | 0000 | 0000 | 0004 | 0000 |
| 0000265240 | 0000 | 02E2 | 0000 | 0000 | 705F | 7869 | 6C65 | 0000 |
| 0000265260 | 0000 | 0000 | FFFF | 000E | 0112 | 0000 | 0000 | 0000 |
| 0000265300 | 0004 | 0000 | 0000 | 0000 | 0000 | 0000 | 652E | 736F |
| 0000265320 | 0000 | 0000 | 0000 | 0000 | FFFE | 0008 | 0166 | 02DC |
| 0000265340 | 0000 | 0000 | 0004 | 0000 | 0000 | 0000 | 0000 | 0000 |
| 0000265360 | 662E | 6C69 | 0065 | 0000 | 02E4 | 0000 | FFFE | 0000 |
| 0000265400 | 0167 | 7367 | 6870 | 6377 | 632E | 0000 | 0000 | 0000 |
| 0000265420 | 0000 | 0000 | 662E | 6C69 | 0065 | 0000 | 0342 | 0000 |
| 0000265440 | FFFE | 0000 | 0167 | 7367 | 6870 | 6377 | 682E | 0000 |
| 0000265460 | 0000 | 0000 | 0000 | 0000 | 322E | 6166 | 656B | 0000 |
| 0000265500 | 0000 | 0000 | FFFE | 0008 | 010A | 0000 | 0000 | 0000 |
| 0000265520 | 0010 | 0000 | 0000 | 02FE | 0000 | 0000 | 0000 | 0000 |
| 0000265540 | 03E8 | 0000 | 0000 | 0000 | FFFF | 000E | 0112 | 0000 |
| 0000265560 | 0000 | 0000 | 0002 | 0000 | 0000 | 0000 | 0000 | 0000 |
| 0000265600 | 665F | 6C69 | 306C | 0000 | 0002 | 0000 | FFFF | 000E |
| 0000265620 | 0112 | 0000 | 0000 | 0000 | 0001 | 0000 | 0000 | 0000 |
| 0000265640 | 0000 | 0000 | 635F | 726C | 7265 | 0072 | 0003 | 0000 |
| 0000265660 | FFFF | 000E | 0112 | 0000 | 0000 | 0000 | 0001 | 0000 |
| 0000265700 | 0000 | 0000 | 0000 | 0000 | 665F | 6C69 | 316C | 0000 |
| 0000265720 | 0004 | 0000 | FFFF | 000E | 0112 | 0000 | 0000 | 0000 |
| 0000265740 | 0002 | 0000 | 0000 | 0000 | 0000 | 0000 | 6D5F | 6B73 |
| 0000265760 | 6573 | 006C | 0006 | 0000 | FFFF | 000E | 0112 | 0000 |
| 0000266000 | 0000 | 0000 | 0002 | 0000 | 0000 | 0000 | 0000 | 0000 |
| 0000266020 | 665F | 6468 | 7369 | 0070 | 0008 | 0000 | FFFF | 000E |
| 0000266040 | 0112 | 0000 | 0000 | 0000 | 0004 | 0000 | 0000 | 0000 |
| 0000266060 | 0000 | 0000 | 645F | 7369 | 6170 | 6C6C | 000C | 0000 |
| 0000266100 | FFFF | 000E | 0112 | 0000 | 0000 | 0000 | 0001 | 0000 |
| 0000266120 | 0000 | 0000 | 0000 | 0000 | 665F | 5F62 | 6E65 | 0000 |
| 0000266140 | 000D | 0000 | FFFF | 000E | 0112 | 0000 | 0000 | 0000 |
| 0000266160 | 0001 | 0000 | 0000 | 0000 | 0000 | 0000 | 7A5F | 7265 |
| 0000266200 | 5F6F | 0062 | 000E | 0000 | FFFF | 000E | 0112 | 0000 |
| 0000266220 | 0000 | 0000 | 0001 | 0000 | 0000 | 0000 | 0000 | 0000 |
| 0000266240 | 7A5F | 7265 | 5F6F | 0061 | 000F | 0000 | FFFF | 000E |
| 0000266260 | 0112 | 0000 | 0000 | 0000 | 0001 | 0000 | 0000 | 0000 |
| 0000266300 | 0000 | 0000 | 652E | 736F | 0000 | 0000 | 0000 | 0000 |
| 0000266320 | FFFE | 0008 | 0166 | 02E6 | 0000 | 0000 | 0010 | 0000 |
| 0000266340 | 0000 | 0000 | 0000 | 0000 | 332E | 6166 | 656B | 0000 |
| 0000266360 | 0000 | 0000 | FFFE | 0008 | 010A | 0000 | 0000 | 0000 |
| 0000266400 | 0010 | 0000 | 0000 | 0316 | 0000 | 0000 | 6D5F | 6B73 |

THU MAR 14 17:37:32 1991 GSPMON.4 PAGE 100, LINE 5842

| | | | | | | | | |
|---|---|---|---|---|---|---|---|---|
| 0000266420 | 6E65 | 0034 | 0000 | 0000 | FFFF | 000E | 0112 | 0000 |
| 0000266440 | 0000 | 0000 | 0001 | 0000 | 0000 | 0000 | 0000 | 0000 |
| 0000266460 | 6D5F | 6B73 | 6E65 | 0035 | 0001 | 0000 | FFFF | 000E |
| 0000266500 | 0112 | 0000 | 0000 | 0000 | 0001 | 0000 | 0000 | 0000 |
| 0000266520 | 000D | 0000 | 705F | 6C6F | 7261 | 0034 | 0002 | 0000 |
| 0000266540 | FFFF | 000E | 0112 | 0000 | 0000 | 0000 | 0001 | 0000 |
| 0000266560 | 0000 | 0000 | 0000 | 0000 | 705F | 6C6F | 7261 | 0035 |
| 0000266600 | 0003 | 0000 | FFFF | 000E | 0112 | 0000 | 0000 | 0000 |
| 0000266620 | 0001 | 0000 | 0000 | 0000 | 0000 | 0000 | 615F | 756C |
| 0000266640 | 6E66 | 0063 | 0004 | 0000 | FFFF | 000E | 0112 | 0000 |
| 0000266660 | 0000 | 0000 | 0003 | 0000 | 0000 | 0000 | 0000 | 0000 |
| 0000266700 | 615F | 756C | 7263 | 0079 | 0007 | 0000 | FFFF | 000E |
| 0000266720 | 0112 | 0000 | 0000 | 0000 | 0001 | 0000 | 0000 | 0000 |
| 0000266740 | 0000 | 0000 | 615F | 7273 | 0063 | 0000 | 0008 | 0000 |
| 0000266760 | FFFF | 000E | 0112 | 0000 | 0000 | 0000 | 0002 | 0000 |
| 0000267000 | 0000 | 0000 | 0000 | 0000 | 625F | 7273 | 0063 | 0000 |
| 0000267020 | 000A | 0000 | FFFF | 000E | 0112 | 0000 | 0000 | 0000 |
| 0000267040 | 0002 | 0000 | 0000 | 0000 | 0000 | 0000 | 635F | 7273 |
| 0000267060 | 0063 | 0000 | 000C | 0000 | FFFF | 000E | 0112 | 0000 |
| 0000267100 | 0000 | 0000 | 0002 | 0000 | 0000 | 0000 | 0000 | 0000 |
| 0000267120 | 645F | 7273 | 0063 | 0000 | 000E | 0000 | FFFF | 000E |
| 0000267140 | 0112 | 0000 | 0000 | 0000 | 0002 | 0000 | 0000 | 0000 |
| 0000267160 | 0000 | 0000 | 652E | 736F | 0000 | 0000 | 0000 | 0000 |
| 0000267200 | FFFE | 0008 | 0166 | 02FE | 0000 | 0000 | 0010 | 0000 |
| 0000267220 | 0000 | 0000 | 0000 | 0000 | 342E | 6166 | 656B | 0000 |
| 0000267240 | 0000 | 0000 | FFFE | 0008 | 010A | 0000 | 0000 | 0000 |
| 0000267260 | 0010 | 0000 | 0000 | 032E | 0000 | 0000 | 655F | 636E |
| 0000267300 | 6B68 | 0000 | 0000 | 0000 | FFFF | 000E | 0112 | 0000 |
| 0000267320 | 0000 | 0000 | 0001 | 0000 | 0000 | 0000 | 0000 | 0000 |
| 0000267340 | 675F | 6172 | 3262 | 0000 | 0001 | 0000 | FFFF | 000E |
| 0000267360 | 0112 | 0000 | 0000 | 0000 | 0001 | 0000 | 0000 | 0000 |
| 0000267400 | 0000 | 0000 | 6D5F | 6362 | 0035 | 0000 | 0002 | 0000 |
| 0000267420 | FFFF | 000E | 0112 | 0000 | 0000 | 0000 | 0002 | 0000 |
| 0000267440 | 0000 | 0000 | 0000 | 0000 | 6D5F | 6362 | 0034 | 0000 |
| 0000267460 | 0004 | 0000 | FFFF | 000E | 0112 | 0000 | 0000 | 0000 |
| 0000267500 | 0002 | 0000 | 0000 | 0000 | 0000 | 0000 | 6D5F | 6362 |
| 0000267520 | 0033 | 0000 | 0006 | 0000 | FFFF | 000E | 0112 | 0000 |
| 0000267540 | 0000 | 0000 | 0002 | 0000 | 0000 | 0000 | 0000 | 0000 |
| 0000267560 | 6D5F | 6362 | 0032 | 0000 | 0008 | 0000 | FFFF | 000E |
| 0000267600 | 0112 | 0000 | 0000 | 0000 | 0002 | 0000 | 0000 | 0000 |
| 0000267620 | 0000 | 0000 | 6D5F | 6362 | 0031 | 0000 | 000A | 0000 |
| 0000267640 | FFFF | 000E | 0112 | 0000 | 0000 | 0000 | 0002 | 0000 |
| 0000267660 | 0000 | 0000 | 0000 | 0000 | 6D5F | 6362 | 0030 | 0000 |
| 0000267700 | 000C | 0000 | FFFF | 000E | 0112 | 0000 | 0000 | 0000 |
| 0000267720 | 0002 | 0000 | 0000 | 0000 | 0000 | 0000 | 735F | 6572 |
| 0000267740 | 0000 | 0000 | 000E | 0000 | FFFF | 000E | 0112 | 0000 |
| 0000267760 | 0000 | 0000 | 0001 | 0000 | 0000 | 0000 | 0000 | 0000 |
| 0000270000 | 735F | 6472 | 0000 | 0000 | 000F | 0000 | FFFF | 000E |
| 0000270020 | 0112 | 0000 | 0000 | 0000 | 0001 | 0000 | 0000 | 0000 |
| 0000270040 | 0000 | 0000 | 652E | 736F | 0000 | 0000 | 0000 | 0000 |
| 0000270060 | FFFE | 0008 | 0166 | 0316 | 0000 | 0000 | 0010 | 0000 |
| 0000270100 | 0000 | 0000 | 0000 | 000D | 352E | 6166 | 656B | 0000 |
| 0000270120 | 0000 | 0000 | FFFE | 0008 | 010A | 0000 | 0000 | 0000 |
| 0000270140 | 0010 | 0000 | 0000 | 0336 | 0000 | 0000 | 765F | 6469 |
| 0000270160 | 6573 | 006C | 0000 | 0000 | FFFF | 000E | 0112 | 0000 |
| 0000270200 | 0000 | 0000 | 0003 | 0000 | 0000 | 0000 | 0000 | 0000 |
| 0000270220 | 665F | 6C69 | 006C | 0000 | 0003 | 0000 | FFFF | 000E |
| 0000270240 | 0112 | 0000 | 0000 | 0000 | 000D | 0000 | 0000 | 0000 |
| 0000270260 | 0000 | 0000 | 652E | 736F | 0000 | 0000 | 0000 | 0000 |

THU MAR 14 17:37:32 1991 GSPMON.4 PAGE 101, LINE 5901

| | | | | | | | | |
|---|---|---|---|---|---|---|---|---|
| 0000270300 | FFFE | 0008 | 0166 | 032E | 0000 | 0000 | 0010 | 0000 |
| 0000270320 | 0000 | 0000 | 0000 | 0000 | 362E | 6166 | 656B | 0000 |
| 0000270340 | 0000 | 0000 | FFFE | 0008 | 010A | 0000 | 000D | 0000 |
| 0000270360 | 0040 | 0000 | 0000 | 0342 | 0000 | 0000 | 635F | 746E |
| 0000270400 | 6C72 | 0030 | 0000 | 0000 | FFFF | 0008 | 0108 | 02E6 |
| 0000270420 | 0000 | 0000 | 0010 | 0000 | 0000 | 0000 | 0000 | 0000 |
| 0000270440 | 635F | 746E | 6C72 | 0031 | 0010 | 0000 | FFFF | 0008 |
| 0000270460 | 0108 | 02FE | 0000 | 0000 | 0010 | 0000 | 0000 | 0000 |
| 0000270500 | 0000 | 0000 | 635F | 746E | 6C72 | 0032 | 0020 | 0000 |
| 0000270520 | FFFF | 0008 | 0108 | 0316 | 0000 | 0000 | 0010 | 0000 |
| 0000270540 | 0000 | 0000 | 0000 | 0000 | 635F | 746E | 6C72 | 0033 |
| 0000270560 | 0030 | 000C | FFFF | 0008 | 0108 | 032E | 0000 | 0000 |
| 0000270600 | 00I0 | 0000 | 0000 | 0000 | 0000 | 0000 | 652E | 736F |
| 0000270620 | 0000 | 0000 | 0000 | 0000 | FFFE | 0008 | 0166 | 0336 |
| 0000270640 | 0000 | 0000 | 0040 | 0000 | 0000 | 0000 | 0000 | 0000 |
| 0000270660 | 662E | 6C69 | 0065 | 0000 | 0344 | 0000 | FFFE | 0000 |
| 0000270700 | 0167 | 7367 | 6870 | 6377 | 632E | 0000 | 0000 | 0000 |
| 0000270720 | 0000 | 0000 | 662E | 6C69 | 0065 | 0000 | 0420 | 0000 |
| 0000270740 | FFFE | 0000 | 0167 | 7367 | 6370 | 6766 | 682E | 0000 |
| 0000270760 | 0000 | 0000 | 0000 | 0000 | 0000 | 0000 | 03F2 | 0000 |
| 0000271000 | 0000 | 0000 | FFFE | 000A | 010F | 0000 | 0000 | 0000 |
| 0000271020 | 0002 | 0000 | 0000 | 0350 | 0000 | 0000 | 4F5F | 454E |
| 0000271040 | 315F | 0036 | 0000 | 0000 | FFFF | 000B | 0110 | 0000 |
| 0000271060 | 0000 | 0000 | 0002 | 0000 | 0000 | 0000 | 0000 | 0000 |
| 0000271100 | 545F | 4F57 | 385F | 0000 | 0001 | 0000 | FFFF | 000B |
| 0000271120 | 0110 | 0000 | 0000 | 0000 | 0002 | 0000 | 0000 | 0000 |
| 0000271140 | 0000 | 0000 | 465F | 554F | 5F52 | 0034 | 0002 | 0000 |
| 0000271160 | FFFF | 000B | 0110 | 0000 | 0000 | 0000 | 0002 | 0000 |
| 0000271200 | 0000 | 0000 | 0000 | 0000 | 652E | 736F | 0000 | 0000 |
| 0000271220 | 0000 | 0000 | FFFE | 000A | 0166 | 0346 | 0000 | 0000 |
| 0000271240 | 0002 | 0000 | 0000 | 0000 | 0000 | 0000 | 635F | 726C |
| 0000271260 | 655F | 7272 | 0000 | 0000 | FFFE | 000A | 010F | 0000 |
| 0000271300 | 0000 | 0000 | 0001 | 0000 | 0000 | 0358 | 0000 | 0000 |
| 0000271320 | 4E5F | 5F4F | 4C43 | 0052 | 0000 | 0000 | FFFF | 000B |
| 0000271340 | 0110 | 0000 | 0000 | 0000 | 0001 | 0000 | 0000 | 0000 |
| 0000271360 | 0000 | 0000 | 435F | 524C | 0000 | 0000 | 0001 | 0000 |
| 0000271400 | FFFF | 000B | 0110 | 0000 | 0000 | 0000 | 0001 | 0000 |
| 0000271420 | 0000 | 0000 | 0000 | 0000 | 652E | 736F | 0000 | 0000 |
| 0000271440 | 0000 | 0000 | FFFE | 000A | 0166 | 0350 | 0000 | 0000 |
| 0000271460 | 0001 | 0000 | 0000 | 0000 | 0000 | 0000 | 0000 | 0000 |
| 0000271500 | 03FC | 0000 | 0000 | 0000 | FFFE | 000A | 010F | 0000 |
| 0000271520 | 0000 | 0000 | 0003 | 0000 | 0000 | 0366 | 0000 | 0000 |
| 0000271540 | 505F | 414C | 454E | 0030 | 0000 | 0000 | FFFF | 000B |
| 0000271560 | 0110 | 0000 | 0000 | 0000 | 0003 | 0000 | 0000 | 0000 |
| 0000271600 | 0000 | 0000 | 505F | 414C | 454E | 0032 | 0001 | 0000 |
| 0000271620 | FFFF | 000B | 0110 | 0000 | 0000 | 0000 | 0003 | 0000 |
| 0000271640 | 0000 | 0000 | 0000 | 0000 | 505F | 414C | 454E | 0031 |
| 0000271660 | 0002 | 0000 | FFFF | 000B | 0110 | 0000 | 0000 | 0000 |
| 0000271700 | 0003 | 0000 | 0000 | 0000 | 0000 | 0000 | 505F | 414C |
| 0000271720 | 454E | 0033 | 0003 | 0000 | FFFF | 000B | 0110 | 0000 |
| 0000271740 | 0000 | 0000 | 0003 | 0000 | 0000 | 0000 | 0000 | 0000 |
| 0000271760 | 4E5F | 504F | 414C | 454E | 0004 | 0000 | FFFF | 000B |
| 0000272000 | 0110 | 0000 | 0000 | 0000 | 0003 | 0000 | 0000 | 0000 |
| 0000272020 | 0000 | 000D | 652E | 736F | 0000 | 0000 | 0000 | 0000 |
| 0000272040 | FFFE | 000A | 0166 | 0358 | 0000 | 0000 | 0003 | 0000 |
| 0000272060 | 0000 | 0000 | 0000 | 0000 | 0000 | 0000 | 0407 | 0000 |
| 0000272100 | 0000 | 0000 | FFFE | 000A | 010F | 0000 | 0000 | 0000 |
| 0000272120 | 0001 | 0000 | 0000 | 036E | 0000 | 000D | 4E5F | 5F4F |
| 0000272140 | 4944 | 5053 | 0000 | 0000 | FFFF | 000B | 0110 | 0000 |

THU MAR 14 17:37:32 1991 GSPMON.4 PAGE 102, LINE 5960

| | | | | | | | | |
|---|---|---|---|---|---|---|---|---|
| 0000272160 | 0000 | 0000 | 0001 | 0000 | 0000 | 0000 | 0000 | 0000 |
| 0000272200 | 445F | 5349 | 0050 | 0000 | 0001 | 0000 | FFFF | 000B |
| 0000272220 | 0110 | 0000 | 0000 | 0000 | 0001 | 0000 | 0000 | 0000 |
| 0000272240 | 0000 | 0000 | 652E | 736F | 0000 | 0000 | 0000 | 0000 |
| 0000272260 | FFFE | 000A | 0166 | 0366 | 0000 | 0000 | 0001 | 0000 |
| 0000272300 | 0000 | 0000 | 0000 | 0000 | 665F | 5F62 | 6E65 | 0000 |
| 0000272320 | 0000 | 0000 | FFFE | 000A | 010F | 0000 | 0000 | 0000 |
| 0000272340 | 0001 | 0000 | 0000 | 0376 | 0000 | 0000 | 0000 | 0000 |
| 0000272360 | 0411 | 0000 | 0000 | 0000 | FFFF | 000B | 0110 | 0000 |
| 0000272400 | 0000 | 0000 | 0001 | 0000 | 0000 | 0000 | 0000 | 0000 |
| 0000272420 | 0000 | 0000 | 041C | 0000 | 0001 | 0000 | FFFF | 000B |
| 0000272440 | 0110 | 0000 | 0000 | 0000 | 0001 | 0000 | 0000 | 0000 |
| 0000272460 | 0000 | 0000 | 652E | 736F | 0000 | 0000 | 0000 | 0000 |
| 0000272500 | FFFE | 000A | 0166 | 036E | 0000 | 0000 | 0001 | 0000 |
| 0000272520 | 0000 | 0000 | 0000 | 0000 | 7A5F | 7265 | 5F6F | 0062 |
| 0000272540 | 0000 | 0000 | FFFE | 000A | 010F | 0000 | 0000 | 0000 |
| 0000272560 | 0001 | 0000 | 0000 | 037E | 0000 | 0000 | 0000 | 0000 |
| 0000272600 | 0426 | 0000 | 0000 | 0000 | FFFF | 000B | 0110 | 0000 |
| 0000272620 | 0000 | 0000 | 0001 | 0000 | 0000 | 0000 | 0000 | 0000 |
| 0000272640 | 0000 | 0000 | 0432 | 0000 | 0001 | 0000 | FFFF | 000B |
| 0000272660 | 0110 | 0000 | 0000 | 0000 | 0001 | 0000 | 0000 | 0000 |
| 0000272700 | 0000 | 0000 | 652E | 736F | 0000 | 0000 | 0000 | 0000 |
| 0000272720 | FFFE | 000A | 0166 | 0376 | 0000 | 0000 | 0001 | 0000 |
| 0000272740 | 0000 | 0000 | 0000 | 0000 | 7A5F | 7265 | 5F6F | 0061 |
| 0000272760 | 0000 | 0000 | FFFE | 000A | 010F | 0000 | 0000 | 0000 |
| 0000273000 | 0001 | 0000 | 0000 | 0386 | 0000 | 0000 | 0000 | 0000 |
| 0000273020 | 043C | 0000 | 0000 | 0000 | FFFF | 000B | 0110 | 0000 |
| 0000273040 | 0000 | 0000 | 0001 | 0000 | 0000 | 0000 | 0000 | 0000 |
| 0000273060 | 0000 | 0000 | 0448 | 0000 | 0001 | 0000 | FFFF | 000B |
| 0000273100 | 0110 | 0000 | 0000 | 0000 | 0001 | 0000 | 0000 | 0000 |
| 0000273120 | 0000 | 0000 | 652E | 736F | 0000 | 0000 | 0000 | 0000 |
| 0000273140 | FFFE | 000A | 0166 | 037E | 0000 | 0000 | 0001 | 0000 |
| 0000273160 | 0000 | 0000 | 0000 | 0000 | 0000 | 0000 | 0452 | 0000 |
| 0000273200 | 0000 | 0000 | FFFE | 000A | 010F | 0000 | 0000 | 0000 |
| 0000273220 | 0002 | 0000 | 0000 | 0392 | 0000 | 0000 | 0000 | 0000 |
| 0000273240 | 045C | 0000 | 0000 | 0000 | FFFF | 000B | 0110 | 0000 |
| 0000273260 | 0000 | 0000 | 0002 | 0000 | 0000 | 0000 | 0000 | 0000 |
| 0000273300 | 0000 | 0000 | 0466 | 0000 | 0001 | 0000 | FFFF | 000B |
| 0000273320 | 0110 | 0000 | 0000 | 0000 | 0002 | 0000 | 0000 | 0000 |
| 0000273340 | 0000 | 0000 | 0000 | 0000 | 0470 | 0000 | 0002 | 0000 |
| 0000273360 | FFFF | 000B | 0110 | 0000 | 0000 | 0000 | 0002 | 0000 |
| 0000273400 | 0000 | 0000 | 0000 | 0000 | 0000 | 0000 | 047A | 0000 |
| 0000273420 | 0003 | 0000 | FFFF | 000B | 0110 | 0000 | 0000 | 0000 |
| 0000273440 | 0002 | 0000 | 0000 | 0000 | 0000 | 0000 | 652E | 736F |
| 0000273460 | 0000 | 0000 | 0000 | 0000 | FFFE | 000A | 0166 | 0386 |
| 0000273500 | 0000 | 0000 | 0002 | 0000 | 0000 | 0000 | 0000 | 0000 |
| 0000273520 | 615F | 756C | 665F | 636E | 0000 | 0000 | FFFE | 000A |
| 0000273540 | 010F | 0000 | 0000 | 0000 | 0003 | 0000 | 0000 | 03A6 |
| 0000273560 | 0000 | 0000 | 435F | 454C | 5241 | 0000 | 0000 | 0000 |
| 0000273600 | FFFF | 000B | 0110 | 0000 | 0000 | 0000 | 0003 | 0000 |
| 0000273620 | 0000 | 0000 | 0000 | 0000 | 425F | 494D | 554E | 4153 |
| 0000273640 | 0001 | 0000 | FFFF | 000B | 0110 | 0000 | 0000 | 0000 |
| 0000273660 | 0003 | 0000 | 0000 | 0000 | 0000 | 0000 | 415F | 494D |
| 0000273700 | 554E | 4253 | 0002 | 0000 | FFFF | 000B | 0110 | 0000 |
| 0000273720 | 0000 | 0000 | 0003 | 0000 | 0000 | 0000 | 0000 | 0000 |
| 0000273740 | 505F | 554C | 0053 | 0000 | 0003 | 0000 | FFFF | 000B |
| 0000273760 | 0110 | 0000 | 0000 | 0000 | 0003 | 0000 | 0000 | 0000 |
| 0000274000 | 0000 | 0000 | 585F | 524F | 0000 | 0000 | 0004 | 0000 |
| 0000274020 | FFFF | 000B | 0110 | 0000 | 0000 | 0000 | 0003 | 0000 |

THU MAR 14 17:37:32 1991 GSPMON.4 PAGE 103, LINE 6019

| | | | | | | | | |
|---|---|---|---|---|---|---|---|---|
| 0000274040 | 0000 | 0000 | 0000 | 0000 | 4F5F | 0052 | 0000 | 0000 |
| 0000274060 | 0005 | 0000 | FFFF | 000B | 0110 | 0000 | 0000 | 0000 |
| 0000274100 | 0003 | 0000 | 0000 | 0000 | 0000 | 0000 | 415F | 444E |
| 0000274120 | 0000 | 0000 | 0006 | 0000 | FFFF | 000B | 0110 | 0000 |
| 0000274140 | 0000 | 0000 | 0003 | 0000 | 0000 | 0000 | 0000 | 0000 |
| 0000274160 | 505F | 4552 | 4553 | 0054 | 0007 | 0000 | FFFF | 000B |
| 0000274200 | 0110 | 0000 | 0000 | 0000 | 0003 | 0000 | 0000 | 0000 |
| 0000274220 | 0000 | 0000 | 652E | 736F | 0000 | 0000 | 0000 | 0000 |
| 0000274240 | FFFE | 000A | 0166 | 0392 | 0000 | 0000 | 0003 | 0000 |
| 0000274260 | 0000 | 0000 | 0000 | 0000 | 615F | 756C | 635F | 7972 |
| 0000274300 | 0000 | 0000 | FFFE | 000A | 010F | 0000 | 0000 | 0000 |
| 0000274320 | 0001 | 0000 | 0000 | 03AE | 0000 | 0000 | 5A5F | 5245 |
| 0000274340 | 004F | 0000 | 0000 | 0000 | FFFF | 000B | 0110 | 0000 |
| 0000274360 | 0000 | 0000 | 0001 | 0000 | 0000 | 0000 | 0000 | 0000 |
| 0000274400 | 4F5F | 454E | 0000 | 0000 | 0001 | 0000 | FFFF | 000B |
| 0000274420 | 0110 | 0000 | 0000 | 0000 | 0001 | 0000 | 0000 | 0000 |
| 0000274440 | 0000 | 0000 | 652E | 736F | 0000 | 0000 | 0000 | 0000 |
| 0000274460 | FFFE | 000A | 0166 | 03A6 | 0000 | 0000 | 0001 | 0000 |
| 0000274500 | 0000 | 0000 | 0000 | 0000 | 0000 | 0000 | 0484 | 0000 |
| 0000274520 | 0000 | 0000 | FFFE | 000A | 010F | 0000 | 0000 | 0000 |
| 0000274540 | 0001 | 0000 | 0000 | 03B6 | 0000 | 0000 | 0000 | 0000 |
| 0000274560 | 0490 | 0000 | 0000 | 0000 | FFFF | 000B | 0110 | 0000 |
| 0000274600 | 0000 | 0000 | 0001 | 0000 | 0000 | 0000 | 0000 | 0000 |
| 0000274620 | 0000 | 0000 | 049D | 0000 | 0001 | 0000 | FFFF | 000B |
| 0000274640 | 0110 | 0000 | 0000 | 0000 | 0001 | 0000 | 0000 | 0000 |
| 0000274660 | 0000 | 0000 | 652E | 736F | 0000 | 0000 | 0000 | 0000 |
| 0000274700 | FFFE | 000A | 0166 | 03AE | 0000 | 0000 | 0001 | 0000 |
| 0000274720 | 0000 | 0000 | 0000 | 0000 | 0000 | 0000 | 04A9 | 0000 |
| 0000274740 | 0000 | 0000 | FFFE | 000A | 010F | 0000 | 0000 | 0000 |
| 0000274760 | 0001 | 0000 | 0000 | 03BE | 0000 | 0000 | 4D5F | 5341 |
| 0000275000 | 5F4B | 4E45 | 0000 | 0000 | FFFF | 000B | 0110 | 0000 |
| 0000275020 | 0000 | 0000 | 0001 | 0000 | 0000 | 0000 | 0000 | 0000 |
| 0000275040 | 0000 | 0000 | 04B6 | 0000 | 0001 | 0000 | FFFF | 000B |
| 0000275060 | 0110 | 0000 | 0000 | 0000 | 0001 | 0000 | 0000 | 0000 |
| 0000275100 | 0000 | 0000 | 652E | 736F | 0000 | 0000 | 0000 | 0000 |
| 0000275120 | FFFE | 000A | 0166 | 03B6 | 0000 | 0000 | 0001 | 0000 |
| 0000275140 | 0000 | 0000 | 0000 | 0000 | 0000 | 0000 | 04C0 | 0000 |
| 0000275160 | 0000 | 0000 | FFFE | 000A | 010F | 0000 | 0000 | 0000 |
| 0000275200 | 0001 | 0000 | 0000 | 03C6 | 0000 | 0000 | 0000 | 0000 |
| 0000275220 | 04CB | 0000 | 0000 | 0000 | FFFF | 000B | 0110 | 0000 |
| 0000275240 | 0000 | 0000 | 0001 | 0000 | 0000 | 0000 | 0000 | 0000 |
| 0000275260 | 0000 | 0000 | 04D5 | 0000 | 0001 | 0000 | FFFF | 000B |
| 0000275300 | 0110 | 0000 | 0000 | 0000 | 0001 | 0000 | 0000 | 0000 |
| 0000275320 | 0000 | 0000 | 652E | 736F | 0000 | 0000 | 0000 | 0000 |
| 0000275340 | FFFE | 000A | 0166 | 03BE | 0000 | 0000 | 0001 | 0000 |
| 0000275360 | 0000 | 0000 | 0000 | 0000 | 0000 | 0000 | 04E0 | 0000 |
| 0000275400 | 0000 | 0000 | FFFE | 000A | 010F | 0000 | 0000 | 0000 |
| 0000275420 | 0001 | 0000 | 0000 | 03CE | 0000 | 0000 | 0000 | 0000 |
| 0000275440 | 04EB | 0000 | 0000 | 0000 | FFFF | 000B | 0110 | 0000 |
| 0000275460 | 0000 | 0000 | 0001 | 0000 | 0000 | 0000 | 0000 | 0000 |
| 0000275500 | 0000 | 0000 | 04F6 | 0000 | 0001 | 0000 | FFFF | 000B |
| 0000275520 | 0110 | 0000 | 0000 | 0000 | 0001 | 0000 | 0000 | 0000 |
| 0000275540 | 0000 | 0000 | 652E | 736F | 0000 | 0000 | 0000 | 0000 |
| 0000275560 | FFFE | 000A | 0166 | 03C6 | 0000 | 0000 | 0001 | 0000 |
| 0000275600 | 0000 | 0000 | 0000 | 0000 | 6D5F | 5F62 | 7566 | 636E |
| 0000275620 | 0000 | 0000 | FFFE | 000A | 010F | 0000 | 0000 | 0000 |
| 0000275640 | 0002 | 0000 | 0000 | 03DA | 0000 | 0000 | 0000 | 0000 |
| 0000275660 | 0500 | 0000 | 0000 | 0000 | FFFF | 000B | 0110 | 0000 |
| 0000275700 | 0000 | 0000 | 0002 | 0000 | 0000 | 0000 | 0000 | 0000 |

THU MAR 14 17:37:32 1991 GSPMON.4 PAGE 104, LINE 6078

| | | | | | | | | |
|---|---|---|---|---|---|---|---|---|
| 0000275720 | 4D5F | 5F42 | 5845 | 5257 | 0001 | 0000 | FFFF | 000B |
| 0000275740 | 0110 | 0000 | 0000 | 0000 | 0002 | 0000 | 0000 | 0000 |
| 0000275760 | 0000 | 0000 | 4D5F | 5F42 | 4552 | 4441 | 0002 | 0000 |
| 0000276000 | FFFF | 000B | 0110 | 0000 | 0000 | 0000 | 0002 | 0000 |
| 0000276020 | 0000 | 0000 | 0000 | 0000 | 4D5F | 5F42 | 504F | 4E45 |
| 0000276040 | 0003 | 0000 | FFFF | 000B | 0110 | 0000 | 0000 | 0000 |
| 0000276060 | 0002 | 0000 | 0000 | 0000 | 0000 | 0000 | 652E | 736F |
| 0000276100 | 0000 | 0000 | 0000 | 0000 | FFFE | 000A | 0166 | 03CE |
| 0000276120 | 0000 | 0000 | 0002 | 0000 | 0000 | 0000 | 0000 | 0000 |
| 0000276140 | 0000 | 0000 | 050A | 0000 | 0000 | 0000 | FFFE | 000A |
| 0000276160 | 010F | 0000 | 0000 | 0000 | 0002 | 0000 | 0000 | 03E4 |
| 0000276200 | 0000 | 0000 | 0000 | 0000 | 0514 | 0000 | 0000 | 0000 |
| 0000276220 | FFFF | 000B | 0110 | 0000 | 0000 | 0000 | 0002 | 0000 |
| 0000276240 | 0000 | 0000 | 0000 | 0000 | 0000 | 0000 | 0520 | 0000 |
| 0000276260 | 0001 | 0000 | FFFF | 000B | 0110 | 0000 | 0000 | 0000 |
| 0000276300 | 0002 | 0000 | 0000 | 0000 | 0000 | 0000 | 4D5F | 3442 |
| 0000276320 | 525F | 0044 | 0003 | 0000 | FFFF | 000B | 0110 | 0000 |
| 0000276340 | 0000 | 0000 | 0002 | 0000 | 0000 | 0000 | 0000 | 0000 |
| 0000276360 | 652E | 736F | 0000 | 0000 | 0000 | 0000 | FFFE | 000A |
| 0000276400 | 0166 | 03DA | 0000 | 0000 | 0002 | 0000 | 0000 | 0000 |
| 0000276420 | 0000 | 0000 | 0000 | 0000 | 052B | 0000 | 0000 | 0000 |
| 0000276440 | FFFE | 000A | 010F | 0000 | 0000 | 0000 | 0002 | 0000 |
| 0000276460 | 0000 | 03EC | 0000 | 0000 | 4D5F | 3542 | 575F | 0052 |
| 0000276500 | 0000 | 0000 | FFFF | 000B | 0110 | 0000 | 0000 | 0000 |
| 0000276520 | 0002 | 0000 | 0000 | 0000 | 0000 | 0000 | 4D5F | 3542 |
| 0000276540 | 525F | 0044 | 0003 | 0000 | FFFF | 000B | 0110 | 0000 |
| 0000276560 | 0000 | 0000 | 0002 | 0000 | 0000 | 0000 | 0000 | 0000 |
| 0000276600 | 652E | 736F | 0000 | 0000 | 0000 | 0000 | FFFE | 000A |
| 0000276620 | 0166 | 03E4 | 0000 | 0000 | 0002 | 0000 | 0000 | 0000 |
| 0000276640 | 0000 | 0000 | 0000 | 0000 | 0535 | 0000 | 0000 | 0000 |
| 0000276660 | FFFE | 000A | 010F | 0000 | 0000 | 0000 | 0001 | 0000 |
| 0000276700 | 0000 | 03F4 | 0000 | 0000 | 0000 | 0000 | 0541 | 0000 |
| 0000276720 | 0000 | 0000 | FFFF | 000B | 0110 | 0000 | 0000 | 0000 |
| 0000276740 | 0001 | 0000 | 0000 | 0000 | 0000 | 0000 | 0000 | 0000 |
| 0000276760 | 054C | 0000 | 0001 | 0000 | FFFF | 000B | 0110 | 0000 |
| 0000277000 | 0000 | 0000 | 0001 | 0000 | 0000 | 0000 | 0000 | 0000 |
| 0000277020 | 652E | 736F | 0000 | 0000 | 0000 | 0000 | FFFE | 000A |
| 0000277040 | 0166 | 03EC | 0000 | 0000 | 0001 | 0000 | 0000 | 0000 |
| 0000277060 | 0000 | 0000 | 0000 | 0000 | 0556 | 0000 | 0000 | 0000 |
| 0000277100 | FFFE | 000A | 010F | 0000 | 0000 | 0000 | 0001 | 0000 |
| 0000277120 | 0000 | 03FC | 0000 | 0000 | 0000 | 0000 | 0563 | 0000 |
| 0000277140 | 0000 | 0000 | FFFF | 000B | 0110 | 0000 | 0000 | 0000 |
| 0000277160 | 0001 | 0000 | 0000 | 0000 | 0000 | 0000 | 0000 | 0000 |
| 0000277200 | 056F | 0000 | 0001 | 0000 | FFFF | 000B | 0110 | 0000 |
| 0000277220 | 0000 | 0000 | 0001 | 0000 | 0000 | 0000 | 0000 | 0000 |
| 0000277240 | 652E | 736F | 0000 | 0000 | 0000 | 0000 | FFFE | 000A |
| 0000277260 | 0166 | 03F4 | 0000 | 0000 | 0001 | 0000 | 0000 | 0000 |
| 0000277300 | 0000 | 0000 | 0000 | 0000 | 057C | 0000 | 0000 | 0000 |
| 0000277320 | FFFE | 000A | 010F | 0000 | 0000 | 0000 | 0003 | 0000 |
| 0000277340 | 0000 | 040C | 0000 | 0000 | 585F | 424D | 0030 | 0000 |
| 0000277360 | 0000 | 0000 | FFFF | 000B | 0110 | 0000 | 0000 | 0000 |
| 0000277400 | 0003 | 000C | 0000 | 0000 | 0000 | 0000 | 585F | 424D |
| 0000277420 | 0031 | 0000 | 0001 | 0000 | FFFF | 000B | 0110 | 0000 |
| 0000277440 | 0000 | 0000 | 0003 | 0000 | 0000 | 0000 | 0000 | 0000 |
| 0000277460 | 585F | 424D | 0032 | 0000 | 0002 | 0000 | FFFF | 000B |
| 0000277500 | 0110 | 0000 | 0000 | 0000 | 0003 | 0000 | 0000 | 0000 |
| 0000277520 | 0000 | 0000 | 585F | 424D | 0033 | 0000 | 0003 | 0000 |
| 0000277540 | FFFF | 000B | 0110 | 0000 | 0000 | 0000 | 0003 | 0000 |
| 0000277560 | 0000 | 0000 | 0000 | 0000 | 585F | 424D | 0034 | 0000 |

THU MAR 14 17:37:32 1991 GSPMON.4 PAGE 105, LINE 6137

| | | | | | | | | |
|---|---|---|---|---|---|---|---|---|
| 0000277600 | 0004 | 0000 | FFFF | 000B | 0110 | 0000 | 0000 | 0000 |
| 0000277620 | 0003 | 0000 | 0000 | 0000 | 0000 | 0000 | 585F | 424D |
| 0000277640 | 0035 | 0000 | 0005 | 0000 | FFFF | 000B | 0110 | 0000 |
| 0000277660 | 0000 | 0000 | 0003 | 0000 | 0000 | 0000 | 0000 | 0000 |
| 0000277700 | 652E | 736F | 0000 | 0000 | 0000 | 0000 | FFFE | 000A |
| 0000277720 | 0166 | 03FC | 0000 | 0000 | 0003 | 0000 | 0000 | 0000 |
| 0000277740 | 0000 | 0000 | 635F | 6E68 | 006C | 0000 | 0000 | 0000 |
| 0000277760 | FFFE | 000A | 010F | 0000 | 0000 | 0000 | 0002 | 0000 |
| 0000300000 | 0000 | 0418 | 0000 | 0000 | 525F | 4445 | 435F | 0048 |
| 0000300020 | 0000 | 0000 | FFFF | 000B | 0110 | 0000 | 0000 | 0000 |
| 0000300040 | 0002 | 0000 | 0000 | 0000 | 0000 | 0000 | 0000 | 0000 |
| 0000300060 | 0586 | 0000 | 0001 | 0000 | FFFF | 000B | 0110 | 0000 |
| 0000300100 | 0000 | 0000 | 0002 | 0000 | 0000 | 0000 | 0000 | 0000 |
| 0000300120 | 425F | 554C | 5F45 | 4843 | 0002 | 0000 | FFFF | 000B |
| 0000300140 | 0110 | 0000 | 0000 | 0000 | 0002 | 0000 | 0000 | 0000 |
| 0000300160 | 0000 | 0000 | 0000 | 0000 | 0590 | 0000 | 0003 | 0000 |
| 0000300200 | FFFF | 000B | 0110 | 0000 | 0000 | 0000 | 0002 | 0000 |
| 0000300220 | 0000 | 0000 | 0000 | 0000 | 652E | 736F | 0000 | 0000 |
| 0000300240 | 0000 | 0000 | FFFE | 000A | 0166 | 040C | 0000 | 0000 |
| 0000300260 | 0002 | 0000 | 0000 | 0000 | 0000 | 0000 | 0000 | 0000 |
| 0000300300 | 059C | 0000 | 0000 | 0000 | FFFE | 000A | 010F | 0000 |
| 0000300320 | 0000 | 0000 | 0001 | 0000 | 0000 | 0420 | 0000 | 0000 |
| 0000300340 | 0000 | 0000 | 05A6 | 0000 | 0000 | 0000 | FFFF | 000B |
| 0000300360 | 0110 | 0000 | 0000 | 0000 | 0001 | 0000 | 0000 | 0000 |
| 0000300400 | 0000 | 0000 | 435F | 4359 | 494C | 0043 | 0001 | 0000 |
| 0000300420 | FFFF | 000B | 0110 | 0000 | 0000 | 0000 | 0001 | 0000 |
| 0000300440 | 0000 | 0000 | 0000 | 0000 | 652E | 736F | 0000 | 0000 |
| 0000300460 | 0000 | 0000 | FFFE | 000A | 0166 | 0418 | 0000 | 0000 |
| 0000300500 | 0001 | 0000 | 0000 | 0000 | 0000 | 0000 | 662E | 6C69 |
| 0000300520 | 0065 | 0000 | 0422 | 0000 | FFFE | 0000 | 0167 | 7367 |
| 0000300540 | 6870 | 6377 | 632E | 0000 | 0000 | 0000 | 0000 | 0000 |
| 0000300560 | 662E | 6C69 | 0065 | 0000 | 0424 | 0000 | FFFE | 0000 |
| 0000300600 | 0167 | 7367 | 6370 | 6E6F | 682E | 0000 | 0000 | 0000 |
| 0000300620 | 0000 | 0000 | 662E | 6C69 | 0065 | 0000 | 0426 | 0000 |
| 0000300640 | FFFE | 0000 | 0167 | 7367 | 6370 | 6E6F | 692E | 636E |
| 0000300660 | 0000 | 0000 | 0000 | 0000 | 662E | 6C69 | 0065 | 0000 |
| 0000300700 | 0428 | 0000 | FFFE | 0000 | 0167 | 7367 | 6370 | 6E6F |
| 0000300720 | 682E | 0000 | 0000 | 0000 | 0000 | 0000 | 662E | 6C69 |
| 0000300740 | 0065 | 0000 | 042A | 0000 | FFFE | 0000 | 0167 | 7367 |
| 0000300760 | 6870 | 6377 | 632E | 0000 | 0000 | 0000 | 0000 | 0000 |
| 0000301000 | 662E | 6C69 | 0065 | 0000 | 04EE | 0000 | FFFE | 0000 |
| 0000301020 | 0167 | 7067 | 705F | 6275 | 682E | 0000 | 0000 | 0000 |
| 0000301040 | 0000 | 0000 | 372E | 6166 | 656B | 0000 | 0000 | 0000 |
| 0000301060 | FFFE | 0008 | 010A | 0000 | 0000 | 0000 | 01C0 | 0000 |
| 0000301100 | 0000 | 045C | 0000 | 0000 | 685F | 7365 | 6E79 | 0063 |
| 0000301120 | 0000 | 0000 | FFFF | 000D | 0108 | 0000 | 0000 | 0000 |
| 0000301140 | 0010 | 0000 | 0000 | 0000 | 0000 | 0000 | 685F | 6265 |
| 0000301160 | 6E6C | 006B | 0010 | 0000 | FFFF | 000D | 0108 | 0000 |
| 0000301200 | 0000 | 0000 | 0010 | 0000 | 0000 | 0000 | 0000 | 0000 |
| 0000301220 | 685F | 6273 | 6E6C | 006B | 0020 | 0000 | FFFF | 000D |
| 0000301240 | 0108 | 0000 | 0000 | 0000 | 0010 | 0000 | 0000 | 0000 |
| 0000301260 | 0000 | 0000 | 765F | 7365 | 6E79 | 0063 | 0030 | 0000 |
| 0000301300 | FFFF | 000D | 0108 | 0000 | 0000 | 0000 | 0010 | 0000 |
| 0000301320 | 0000 | 0000 | 0000 | 0000 | 765F | 6265 | 6E6C | 006B |
| 0000301340 | 0040 | 0000 | FFFF | 000D | 0108 | 0000 | 0000 | 0000 |
| 0000301360 | 0010 | 0000 | 0000 | 0000 | 0000 | 0000 | 765F | 6273 |
| 0000301400 | 6E6C | 006B | 0050 | 0000 | FFFF | 000D | 0108 | 0000 |
| 0000301420 | 0000 | 0000 | 0010 | 0000 | 0000 | 0000 | 0000 | 0000 |
| 0000301440 | 0000 | 0000 | 05B0 | 0000 | 0060 | 0000 | FFFF | 000D |

THU MAR 14 17:37:32 1991 GSPMON.4 PAGE 106, LINE 6196

| | | | | | | | | |
|---|---|---|---|---|---|---|---|---|
| 0000301460 | 0108 | 0000 | 0000 | 0000 | 0010 | 0000 | 0000 | 0000 |
| 0000301500 | 0000 | 0000 | 665F | 6468 | 7369 | 0070 | 0070 | 0000 |
| 0000301520 | FFFF | 000D | 0108 | 0000 | 0000 | 0000 | 0010 | 0000 |
| 0000301540 | 0000 | 0000 | 0000 | 0000 | 6D5F | 5F62 | 6973 | 657A |
| 0000301560 | 0080 | 0000 | FFFF | 000F | 0108 | 0000 | 0000 | 0000 |
| 0000301600 | 0020 | 0000 | 0000 | 0000 | 0000 | 0000 | 0000 | 0000 |
| 0000301620 | 05BB | 0000 | 00A0 | 0000 | FFFF | 000D | 0108 | 0000 |
| 0000301640 | 0000 | 0000 | 0010 | 0000 | 0000 | 0000 | 0000 | 0000 |
| 0000301660 | 0000 | 0000 | 05C5 | 0000 | 00B0 | 0000 | FFFF | 000D |
| 0000301700 | 0108 | 0000 | 0000 | 0000 | 0010 | 0000 | 0000 | 0000 |
| 0000301720 | 0000 | 0000 | 0000 | 0000 | 05CF | 0000 | 00C0 | 0000 |
| 0000301740 | FFFF | 000D | 0108 | 0000 | 0000 | 0000 | 0010 | 0000 |
| 0000301760 | 0000 | 0000 | 0000 | 0000 | 0000 | 0000 | 05DA | 0000 |
| 0000302000 | 00D0 | 0000 | FFFF | 000D | 0108 | 0000 | 0000 | 0000 |
| 0000302020 | 0010 | 0000 | 0000 | 0000 | 0000 | 0000 | 0000 | 0000 |
| 0000302040 | 05E4 | 0000 | 00E0 | 0000 | FFFF | 000F | 0108 | 0000 |
| 0000302060 | 0000 | 0000 | 0020 | 0000 | 0000 | 0000 | 0000 | 0000 |
| 0000302100 | 0000 | 0000 | 05F1 | 0000 | 0100 | 0000 | FFFF | 000F |
| 0000302120 | 0108 | 0000 | 0000 | 0000 | 0020 | 0000 | 0000 | 0000 |
| 0000302140 | 0000 | 0000 | 0000 | 0000 | 0603 | 0000 | 0120 | 0000 |
| 0000302160 | FFFF | 000F | 0108 | 0000 | 0000 | 0000 | 0020 | 0000 |
| 0000302200 | 0000 | 0000 | 0000 | 0000 | 0000 | 0000 | 0612 | 0000 |
| 0000302220 | 0140 | 0000 | FFFF | 000F | 0108 | 0000 | 0000 | 0000 |
| 0000302240 | 0020 | 0000 | 0000 | 0000 | 0000 | 0000 | 0000 | 0000 |
| 0000302260 | 0628 | 0000 | 0160 | 0000 | FFFF | 000D | 0108 | 0000 |
| 0000302300 | 0000 | 0000 | 0010 | 0000 | 0000 | 0000 | 0000 | 0000 |
| 0000302320 | 0000 | 0000 | 0633 | 0000 | 0170 | 0000 | FFFF | 000D |
| 0000302340 | 0108 | 0000 | 0000 | 0000 | 0010 | 0000 | 0000 | 0000 |
| 0000302360 | 0000 | 0000 | 0000 | 0000 | 0647 | 0000 | 0180 | 0000 |
| 0000302400 | FFFF | 000D | 0108 | 0000 | 0000 | 0000 | 0010 | 0000 |
| 0000302420 | 0000 | 0000 | 0000 | 0000 | 0000 | 0000 | 065B | 0000 |
| 0000302440 | 0190 | 0000 | FFFF | 000F | 0108 | 0000 | 0000 | 0000 |
| 0000302460 | 0020 | 0000 | 0000 | 0000 | 0000 | 0000 | 0000 | 0000 |
| 0000302500 | 066A | 0000 | 01B0 | 0000 | FFFF | 000D | 0108 | 0000 |
| 0000302520 | 0000 | 0000 | 0010 | 0000 | 0000 | 0000 | 0000 | 0000 |
| 0000302540 | 652E | 736F | 0000 | 0000 | 0000 | 0000 | FFFE | 0008 |
| 0000302560 | 0166 | 042C | 0000 | 0000 | 01C0 | 0000 | 0000 | 0000 |
| 0000302600 | 0000 | 0000 | 382E | 6166 | 656B | 0000 | 0000 | 0000 |
| 0000302620 | FFFE | 0008 | 010A | 0000 | 0000 | 0000 | 0050 | 0000 |
| 0000302640 | 0000 | 0466 | 0000 | 0000 | 6D5F | 6773 | 705F | 7274 |
| 0000302660 | 0000 | 0000 | FFFF | 0010 | 0108 | 0000 | 0000 | 0000 |
| 0000302700 | 0020 | 0000 | 0000 | 0000 | 0000 | 0000 | 0000 | 0000 |
| 0000302720 | 0676 | 0000 | 0020 | 0000 | FFFF | 000F | 0108 | 0000 |
| 0000302740 | 0000 | 0000 | 0020 | 0000 | 0000 | 0000 | 0000 | 0000 |
| 0000302760 | 0000 | 0000 | 0680 | 0000 | 0040 | 0000 | FFFF | 000D |
| 0000303000 | 0108 | 0000 | 0000 | 0000 | 0010 | 0000 | 0000 | 0000 |
| 0000303020 | 0000 | 0000 | 652E | 736F | 0000 | 000D | 0000 | 0000 |
| 0000303040 | FFFE | 0008 | 0166 | 045C | 0000 | 0000 | 0050 | 0000 |
| 0000303060 | 0000 | 0000 | 0000 | 0000 | 392E | 6166 | 656B | 0000 |
| 0000303100 | 0000 | 0000 | FFFE | 0008 | 010A | 0000 | 0000 | 0000 |
| 0000303120 | 0040 | 0000 | 0000 | 0472 | 0000 | 0000 | 0000 | 0000 |
| 0000303140 | 068B | 0000 | 0000 | 0000 | FFFF | 000D | 0108 | 0000 |
| 0000303160 | 0000 | 0000 | 0010 | 0000 | 0000 | 0000 | 0000 | 0000 |
| 0000303200 | 6A5F | 6D75 | 0070 | 0000 | 0010 | 0000 | FFFF | 000D |
| 0000303220 | 0108 | 0000 | 0000 | 0000 | 0010 | 0000 | 0000 | 0000 |
| 0000303240 | 0000 | 0000 | 735F | 6174 | 7472 | 0000 | 0020 | 0000 |
| 0000303260 | FFFF | 000D | 0108 | 0000 | 0000 | 0000 | 0010 | 0000 |
| 0000303300 | 0000 | 0000 | 0000 | 0000 | 655F | 646E | 0000 | 0000 |
| 0000303320 | 0030 | 0000 | FFFF | 000D | 0108 | 0000 | 0000 | 0000 |

THU MAR 14 17:37:32 1991 GSPMON.4 PAGE 107, LINE 6255

| | | | | | | | | |
|---|---|---|---|---|---|---|---|---|
| 0000303340 | 0010 | 0000 | 0000 | 0000 | 0000 | 0000 | 652E | 736F |
| 0000303360 | 0000 | 0000 | 0000 | 0000 | FFFE | 0008 | 0166 | 0466 |
| 0000303400 | 0000 | 0000 | 0040 | 0000 | 0000 | 0000 | 0000 | 0000 |
| 0000303420 | 312E | 6630 | 6B61 | 0065 | 0000 | 0000 | FFFE | 0008 |
| 0000303440 | 010A | 0000 | 0000 | 0000 | 0080 | 0000 | 0000 | 047A |
| 0000303460 | 0000 | 0000 | 685F | 0000 | 0000 | 0000 | 0000 | 0000 |
| 0000303500 | FFFF | 0008 | 0108 | 0466 | 0000 | 0000 | 0040 | 0000 |
| 0000303520 | 0000 | 0000 | 0000 | 0000 | 765F | 0000 | 0000 | 0000 |
| 0000303540 | 0040 | 0000 | FFFF | 0008 | 0108 | 0466 | 0000 | 0000 |
| 0000303560 | 0040 | 0000 | 0000 | 0000 | 0000 | 0000 | 652E | 736F |
| 0000303600 | 0000 | 0000 | 0000 | 0000 | FFFE | 0008 | 0166 | 0472 |
| 0000303620 | 0000 | 0000 | 0080 | 0000 | 0000 | 0000 | 0000 | 0000 |
| 0000303640 | 312E | 6631 | 6B61 | 0065 | 0000 | 0000 | FFFE | 0009 |
| 0000303660 | 010C | 0000 | 0000 | 0000 | 0200 | 0000 | 0000 | 0484 |
| 0000303700 | 0000 | 0000 | 635F | 6B68 | 7573 | 006D | 0000 | 0000 |
| 0000303720 | FFFF | 003D | 010B | 0000 | 0000 | 0000 | 0200 | 0020 |
| 0000303740 | 0000 | 0000 | 0000 | 0000 | 655F | 7272 | 6E63 | 0074 |
| 0000303760 | 0000 | 0000 | FFFF | 003D | 010B | 0000 | 0000 | 0000 |
| 0000304000 | 0200 | 0020 | 0000 | 0000 | 0000 | 0000 | 635F | 6372 |
| 0000304020 | 3233 | 0000 | 0000 | 0000 | FFFF | 003D | 010B | 0000 |
| 0000304040 | 0000 | 0000 | 0200 | 0020 | 0000 | 0000 | 0000 | 0000 |
| 0000304060 | 652E | 736F | 0000 | 0000 | 0000 | 0000 | FFFE | 0009 |
| 0000304100 | 0166 | 047A | 0000 | 0000 | 0200 | 0000 | 0000 | 0000 |
| 0000304120 | 0000 | 0000 | 312E | 6632 | 6B61 | 0065 | 0000 | 0000 |
| 0000304140 | FFFE | 0008 | 010A | 0000 | 0000 | 0000 | 0240 | 0000 |
| 0000304160 | 0000 | 048C | 0000 | 0000 | 0000 | 0000 | 0697 | 0000 |
| 0000304200 | 0000 | 0000 | FFFF | 0008 | 0108 | 0466 | 0000 | 0000 |
| 0000304220 | 0040 | 0000 | 0000 | 0000 | 0000 | 0000 | 0000 | 0000 |
| 0000304240 | 06A4 | 0000 | 0040 | 0000 | FFFF | 0009 | 0108 | 047A |
| 0000304260 | 0000 | 0000 | 0200 | 0000 | 0000 | 0000 | 0000 | 0000 |
| 0000304300 | 652E | 736F | 0000 | 0000 | 0000 | 0000 | FFFE | 0008 |
| 0000304320 | 0166 | 0484 | 0000 | 0000 | 0240 | 0000 | 0000 | 0000 |
| 0000304340 | 0000 | 0000 | 312E | 6633 | 6B61 | 0065 | 0000 | 0000 |
| 0000304360 | FFFE | 0009 | 010C | 0000 | 0000 | 0000 | 4000 | 0000 |
| 0000304400 | 0000 | 0496 | 0000 | 0000 | 635F | 6B68 | 7573 | 006D |
| 0000304420 | 0000 | 0000 | FFFF | 00FD | 010B | 0000 | 0000 | 0000 |
| 0000304440 | 4000 | 0020 | 0020 | 0000 | 0000 | 0000 | 655F | 7272 |
| 0000304460 | 6E63 | 0074 | 0000 | 0000 | FFFF | 00FD | 010B | 0000 |
| 0000304500 | 0000 | 0000 | 4000 | 0020 | 0020 | 0000 | 0000 | 0000 |
| 0000304520 | 635F | 6372 | 3233 | 0000 | 0000 | 0000 | FFFF | 00FD |
| 0000304540 | 010B | 0000 | 0000 | 0000 | 4000 | 0020 | 0020 | 0000 |
| 0000304560 | 0000 | 0000 | 652E | 736F | 0000 | 0000 | 0000 | 0000 |
| 0000304600 | FFFE | 0009 | 0166 | 048C | 0000 | 0000 | 4000 | 0000 |
| 0000304620 | 0000 | 0000 | 0000 | 0000 | 312E | 6634 | 6B61 | 0065 |
| 0000304640 | 0000 | 0000 | FFFE | 0008 | 010A | 0000 | 0000 | 0000 |
| 0000304660 | 4080 | 0000 | 0000 | 04A0 | 0000 | 0000 | 0000 | 0000 |
| 0000304700 | 06B0 | 0000 | 0000 | 0000 | FFFF | 0008 | 0108 | 0466 |
| 0000304720 | 0000 | 0000 | 0040 | 0000 | 0000 | 0000 | 0000 | 0000 |
| 0000304740 | 0000 | 0000 | 06BD | 0000 | 0040 | 0000 | FFFF | 0008 |
| 0000304760 | 0108 | 0466 | 0000 | 0000 | 0040 | 0000 | 0000 | 0000 |
| 0000305000 | 0000 | 0000 | 0000 | 0000 | 06C9 | 0000 | 0030 | 0000 |
| 0000305020 | FFFF | 0009 | 0108 | 048C | 0000 | 0000 | 4000 | 0000 |
| 0000305040 | 0000 | 0000 | 0000 | 0000 | 652E | 736F | 0000 | 0000 |
| 0000305060 | 0000 | 0000 | FFFE | 0008 | 0166 | 0496 | 0000 | 0000 |
| 0000305100 | 4080 | 0000 | 0000 | 0000 | 0000 | 0000 | 312E | 6635 |
| 0000305120 | 6B61 | 0065 | 0000 | 0000 | FFFE | 0009 | 010C | 0000 |
| 0000305140 | 0000 | 0000 | 0090 | 0000 | 0000 | 04AA | 0000 | 0000 |
| 0000305160 | 635F | 6B68 | 7573 | 006D | 0000 | 0000 | FFFF | 00FD |
| 0000305200 | 010B | 0000 | 0000 | 0000 | 0090 | 0003 | 0003 | 0000 |

THU MAR 14 17:37:32 1991 GSPMON.4 PAGE 108, LINE 6314

| | | | | | | | | |
|---|---|---|---|---|---|---|---|---|
| 0000305220 | 0000 | 0000 | 655F | 7272 | 6E63 | 0074 | 0000 | 0000 |
| 0000305240 | FFFF | 00FD | 010B | 0000 | 0000 | 0000 | 0090 | 0003 |
| 0000305260 | 0003 | 0000 | 0000 | 0000 | 625F | 7263 | 3363 | 0032 |
| 0000305300 | 0000 | 0000 | 7FFF | 00FD | 010B | 0000 | 0000 | 0000 |
| 0000305320 | 0090 | 0003 | 0003 | 0000 | 0000 | 0000 | 652E | 736F |
| 0000305340 | 0000 | 0000 | 0000 | 0000 | FFFE | 0009 | 0166 | 04A0 |
| 0000305360 | 0000 | 0000 | 0090 | 0000 | 0000 | 0000 | 0000 | 0000 |
| 0000305400 | 312E | 6636 | 6B61 | 0065 | 0000 | 0000 | FFFE | 0008 |
| 0000305420 | 010A | 0000 | 0000 | 0000 | 0130 | 0000 | 0000 | 04B8 |
| 0000305440 | 0000 | 0000 | 0000 | 0000 | 06D3 | 0000 | 0000 | 0000 |
| 0000305460 | FFFF | 0008 | 0108 | 0466 | 0000 | 0000 | 0040 | 0000 |
| 0000305500 | 0000 | 0000 | 0000 | 0000 | 0000 | 0000 | 06E0 | 0000 |
| 0000305520 | 0040 | 0000 | FFFF | 0008 | 0108 | 0466 | 0000 | 0000 |
| 0000305540 | 0040 | 0000 | 0000 | 0000 | 0000 | 0000 | 785F | 635F |
| 0000305560 | 6F6F | 6472 | 0080 | 0000 | FFFF | 0003 | 0108 | 0000 |
| 0000305600 | 0000 | 0000 | 0010 | 0000 | 0000 | 0000 | 0000 | 0000 |
| 0000305620 | 795F | 635F | 6F6F | 6472 | 0090 | 0000 | FFFF | 0003 |
| 0000305640 | 0108 | 0000 | 0000 | 0000 | 0010 | 0000 | 0000 | 0000 |
| 0000305660 | 0000 | 0000 | 0000 | 0000 | 06EC | 0000 | 00A0 | 0000 |
| 0000305700 | FFFF | 0009 | 0108 | 04A0 | 0000 | 0000 | 0090 | 0000 |
| 0000305720 | 0000 | 0000 | 0000 | 0000 | 652E | 736F | 0000 | 0000 |
| 0000305740 | 0000 | 0000 | FFFE | 0008 | 0166 | 04AA | 0000 | 0000 |
| 0000305760 | 0130 | 0000 | 0000 | 0000 | 0000 | 0000 | 312E | 6637 |
| 0000306000 | 6B61 | 0065 | 0000 | 0000 | FFFE | 0008 | 010A | 0000 |
| 0000306020 | 0000 | 0000 | 0050 | 0000 | 0000 | 04C4 | 0000 | 0000 |
| 0000306040 | 0000 | 0000 | 06F6 | 0000 | 0000 | 0000 | FFFF | 000D |
| 0000306060 | 0108 | 0000 | 0000 | 0000 | 0010 | 0000 | 0000 | 0000 |
| 0000306100 | 0000 | 0000 | 0000 | 0000 | 070E | 0000 | 0010 | 0000 |
| 0000306120 | FFFF | 000D | 0108 | 0000 | 0000 | 0000 | 0010 | 0000 |
| 0000306140 | 0000 | 0000 | 0000 | 0000 | 0000 | 0000 | 0720 | 0000 |
| 0000306160 | 0020 | 0000 | FFFF | 000D | 0108 | 0000 | 0000 | 0000 |
| 0000306200 | 0010 | 0000 | 0000 | 0000 | 0000 | 0000 | 0000 | 0000 |
| 0000306220 | 072B | 0000 | 0030 | 0000 | FFFF | 0010 | 0108 | 0000 |
| 0000306240 | 0000 | 0000 | 0020 | 0000 | 0000 | 0000 | 0000 | 0000 |
| 0000306260 | 652E | 736F | 0000 | 0000 | 0000 | 0000 | FFFE | 0008 |
| 0000306300 | 0166 | 04B8 | 0000 | 0000 | 0050 | 0000 | 0000 | 0000 |
| 0000306320 | 0000 | 0000 | 312E | 6638 | 6B61 | 0065 | 0000 | 0000 |
| 0000306340 | FFFE | 0008 | 010A | 0000 | 0000 | 0000 | 0040 | 0000 |
| 0000306360 | 0000 | 04CC | 0000 | 0000 | 0000 | 0000 | 0735 | 0000 |
| 0000306400 | 0000 | 0000 | FFFF | 0005 | 0108 | 0000 | 0000 | 0000 |
| 0000306420 | 0020 | 0000 | 0000 | 0000 | 0000 | 0000 | 0000 | 0000 |
| 0000306440 | 0745 | 0000 | 0020 | 0000 | FFFF | 0005 | 0108 | 0000 |
| 0000306460 | 0000 | 0000 | 0020 | 0000 | 0000 | 0000 | 0000 | 0000 |
| 0000306500 | 652E | 736F | 0000 | 0000 | 0000 | 0000 | FFFE | 0008 |
| 0000306520 | 0166 | 04C4 | 0000 | 0000 | 0040 | 0000 | 0000 | 0000 |
| 0000306540 | 0000 | 0000 | 312E | 6639 | 6B61 | 0065 | 0000 | 0000 |
| 0000306560 | FFFE | 0008 | 010A | 0000 | 0000 | 0000 | 0050 | 0000 |
| 0000306600 | 0000 | 04DA | 0000 | 0000 | 785F | 656C | 7466 | 0000 |
| 0000306620 | 0000 | 0000 | FFFF | 0003 | 0108 | 0000 | 0000 | 0000 |
| 0000306640 | 0010 | 0000 | 0000 | 0000 | 0000 | 0000 | 795F | 6F74 |
| 0000306660 | 0070 | 0000 | 0010 | 0000 | FFFF | 0003 | 0108 | 0000 |
| 0000306700 | 0000 | 0000 | 0010 | 0000 | 0000 | 0000 | 0000 | 0000 |
| 0000306720 | 785F | 6972 | 6867 | 0074 | 0020 | 0000 | FFFF | 0003 |
| 0000306740 | 0108 | 0000 | 0000 | 0000 | 0010 | 0000 | 0000 | 0000 |
| 0000306760 | 0000 | 0000 | 795F | 6F64 | 6E77 | 0000 | 0030 | 0000 |
| 0000307000 | FFFF | 0003 | 0108 | 0000 | 0000 | 0000 | 0010 | 0000 |
| 0000307020 | 0000 | 0000 | 0000 | 0000 | 0000 | 0000 | 0754 | 0000 |
| 0000307040 | 0040 | 0000 | FFFF | 0003 | 0108 | 0000 | 0000 | 0000 |
| 0000307060 | 0010 | 0000 | 0000 | 0000 | 0000 | 0000 | 652E | 736F |

THU MAR 14 17:37:32 1991 GSPMON.4 PAGE 109, LINE 6373

| | | | | | | | | |
|---|---|---|---|---|---|---|---|---|
| 0000307100 | 0000 | 0000 | 0000 | 0000 | FFFE | 0008 | 0166 | 04CC |
| 0000307120 | 0000 | 0000 | 0050 | 0000 | 0000 | 0000 | 0000 | 0000 |
| 0000307140 | 322E | 6630 | 6B61 | 0065 | 0000 | 0000 | FFFE | 0008 |
| 0000307160 | 010A | 0000 | 0000 | 0000 | 0020 | 0000 | 0000 | 04E2 |
| 0000307200 | 0000 | 0000 | 0000 | 0000 | 075E | 0000 | 0000 | 0000 |
| 0000307220 | FFFF | 0003 | 0108 | 0000 | 0000 | 0000 | 0010 | 0000 |
| 0000307240 | 0000 | 0000 | 0000 | 0000 | 0000 | 0000 | 076A | 0000 |
| 0000307260 | 0010 | 0000 | FFFF | 0003 | 0108 | 0000 | 0000 | 0000 |
| 0000307300 | 0010 | 0000 | 0000 | 0000 | 0000 | 0000 | 652E | 736F |
| 0000307320 | 0000 | 0000 | 0000 | 0000 | FFFE | 0008 | 0166 | 04DA |
| 0000307340 | 0000 | 0000 | 0020 | 0000 | 0000 | 0000 | 0000 | 0000 |
| 0000307360 | 322E | 6631 | 6B61 | 0065 | 0000 | 0000 | FFFE | 0008 |
| 0000307400 | 010A | 0000 | 0000 | 0000 | 0040 | 0000 | 0000 | 04EE |
| 0000307420 | 0000 | 0000 | 0000 | 0000 | 0774 | 0000 | 0000 | 0000 |
| 0000307440 | FFFF | 000D | 0108 | 0000 | 0000 | 0000 | 0010 | 0000 |
| 0000307460 | 0000 | 0000 | 0000 | 0000 | 0000 | 00C0 | 0787 | 0000 |
| 0000307500 | 0010 | 0000 | FFFF | 000D | 0108 | 0000 | 0000 | 0000 |
| 0000307520 | 0010 | 0000 | 0000 | 0000 | 0000 | 0000 | 0000 | 0000 |
| 0000307540 | 0799 | 0000 | 0020 | 0000 | FFFF | 000D | 0108 | 0000 |
| 0000307560 | 0000 | 0000 | 0010 | 0000 | 0000 | 0000 | 0000 | 0000 |
| 0000307600 | 0000 | 0000 | 07A6 | 0000 | 0030 | 0000 | FFFF | 000D |
| 0000307620 | 0108 | 0000 | 0000 | 0000 | 0010 | 0000 | 0000 | 0000 |
| 0000307640 | 0000 | 0000 | 652E | 736F | 0000 | 0000 | 0000 | 0000 |
| 0000307660 | FFFE | 0008 | 0166 | 04E2 | 0000 | 0000 | 0040 | 0000 |
| 0000307700 | 0000 | 0000 | 0000 | 0000 | 662E | 6C69 | 0065 | 0000 |
| 0000307720 | 0532 | 0000 | FFFE | 0000 | 0167 | 7367 | 6870 | 6377 |
| 0000307740 | 632E | 0000 | 0000 | 0000 | 0000 | 0000 | 0000 | 0000 |
| 0000307760 | 07B4 | 0000 | 5D80 | FFC0 | 0001 | 0020 | 0102 | 0000 |
| 0000310000 | 0000 | 06F0 | 0000 | DB14 | 0000 | 04F6 | 0000 | 0002 |
| 0000310020 | 622E | 0066 | 0000 | 0000 | 5D80 | FFC0 | 0001 | 0000 |
| 0000310040 | 0165 | 0000 | 000D | 0041 | 0000 | 0000 | 0000 | 0238 |
| 0000310060 | 0000 | 0000 | 652E | 0066 | 0000 | 0000 | 6470 | FFC0 |
| 0000310100 | 0001 | 0000 | 0165 | 0000 | 0000 | 008C | 0000 | 0000 |
| 0000310120 | 0000 | 0000 | 0000 | 0000 | 0000 | 0000 | 07C7 | 0000 |
| 0000310140 | 6470 | FFC0 | 0001 | 0020 | 0102 | 0000 | 0000 | 0010 |
| 0000310160 | 0000 | DBB6 | 0000 | 04FC | 0000 | 0000 | 622E | 0066 |
| 0000310200 | 0000 | 0000 | 6470 | FFC0 | 0001 | 0000 | 0165 | 0000 |
| 0000310220 | 0000 | 009A | 0000 | 0000 | 0000 | 023E | 0000 | 0000 |
| 0000310240 | 652E | 0066 | 0000 | 0000 | 6480 | FFC0 | 0001 | 0000 |
| 0000310260 | 0165 | 0000 | 0000 | 00A9 | 0000 | 0000 | 0000 | 0000 |
| 0000310300 | 0000 | 0000 | 0000 | 0000 | 07DE | 0000 | 6480 | FFC0 |
| 0000310320 | 0001 | 0020 | 0102 | 0000 | 0000 | 01E0 | 0000 | DBBC |
| 0000310340 | 0000 | 0504 | 0000 | 0002 | 622E | 0066 | 0000 | 0000 |
| 0000310360 | 6480 | FFC0 | 0001 | 0000 | 0165 | 0000 | 0000 | 00B8 |
| 0000310400 | 0000 | 0000 | 0000 | 0246 | 0000 | 0000 | 705F | 616C |
| 0000310420 | 656E | 0000 | FFE0 | FFFF | FFFF | 000A | 0109 | 034A |
| 0000310440 | 000D | 0000 | 0003 | 0000 | 0000 | 0060 | 0000 | 0000 |
| 0000310460 | 652E | 0066 | 0000 | 0000 | 6660 | FFC0 | 0001 | 0000 |
| 0000310500 | 0165 | 0000 | 0000 | 00CB | 0000 | 0000 | 0000 | 0000 |
| 0000310520 | 0000 | 0000 | 0000 | 0000 | 07EC | 0000 | 6660 | FFC0 |
| 0000310540 | 0001 | 0020 | 0102 | 0000 | 0000 | 0060 | 0000 | DBE0 |
| 0000310560 | 0000 | 050E | 0000 | 0001 | 622E | 0066 | 0000 | 0000 |
| 0000310600 | 6660 | FFC0 | 0001 | 0000 | 0165 | 0000 | 0000 | 00DA |
| 0000310620 | 0000 | 0000 | 0000 | 0250 | 0000 | 0000 | 6D5F | 646F |
| 0000310640 | 0065 | 0000 | FFE0 | FFFF | FFFF | 000D | 0109 | 0000 |
| 0000310660 | 0000 | 0000 | 0010 | 0000 | 0000 | 0000 | 0000 | 0000 |
| 0000310700 | 635F | 6E68 | 006C | 0000 | FFC0 | FFFF | FFFF | 0004 |
| 0000310720 | 0109 | 0000 | 0000 | 0000 | 0020 | 0000 | 0000 | 0000 |
| 0000310740 | 0000 | 0000 | 652E | 0066 | 0000 | 0000 | 66C0 | FFC0 |

THU MAR 14 17:37:32 1991 GSPMON.4 PAGE 110, LINE 6432

| | | | | | | | | |
|---|---|---|---|---|---|---|---|---|
| 0000310760 | 0001 | 0000 | 0165 | 0000 | 0000 | 00F1 | 0000 | 0000 |
| 0000311000 | 0000 | 0000 | 0000 | 0000 | 0000 | 0000 | 07FF | 0000 |
| 0000311020 | 66CD | FFC0 | 0001 | 0020 | 0102 | 0000 | 0000 | 05E0 |
| 0000311040 | 0000 | DBE6 | 0000 | 0516 | 0000 | 0003 | 622E | 0066 |
| 0000311060 | 0000 | 0000 | 66CD | FFC0 | 0001 | 0000 | 0165 | 0000 |
| 0000311100 | 0000 | 0101 | 0000 | 0000 | 0000 | 0258 | 0000 | 0000 |
| 0000311120 | 6F5F | 6370 | 646F | 0065 | FFE0 | FFFF | FFFF | 000D |
| 0000311140 | 0109 | 0000 | 0000 | 0000 | 0010 | 0000 | 0000 | 0000 |
| 0000311160 | 0000 | 0000 | 652E | 0066 | 0000 | 0000 | 6CA0 | FFC0 |
| 0000311200 | 0001 | 0000 | 0165 | 0000 | 0000 | 012E | 0000 | 0000 |
| 0000311220 | 0000 | 0000 | 0000 | 0000 | 0000 | 0000 | 0812 | 0000 |
| 0000311240 | 6CA0 | FFC0 | 0001 | 0020 | 0102 | 0000 | 0000 | 00E0 |
| 0000311260 | 0000 | DC3A | 0000 | 051C | 0000 | 0001 | 622E | 0066 |
| 0000311300 | 0000 | 0000 | 6CA0 | FFC0 | 0001 | 0000 | 0165 | 0000 |
| 0000311320 | 0000 | 0131 | 0000 | 0000 | 0000 | 025E | 0000 | 0000 |
| 0000311340 | 652E | 0066 | 0000 | 0000 | 6D80 | FFC0 | 0001 | 0000 |
| 0000311360 | 0165 | 0000 | 0000 | 013A | 0000 | 0000 | 0000 | 0000 |
| 0000311400 | 0000 | 0000 | 0000 | 0000 | 081C | 0000 | 6D80 | FFC0 |
| 0000311420 | 0001 | 0020 | 0102 | 0000 | 0000 | 00E0 | 0000 | DC4C |
| 0000311440 | 0000 | 0522 | 0000 | 0001 | 622E | 0066 | 0000 | 0000 |
| 0000311460 | 6D80 | FFC0 | 0001 | 0000 | 0165 | 0000 | 0000 | 013D |
| 0000311500 | 0000 | 0000 | 0000 | 0264 | 0000 | 0000 | 652E | 0066 |
| 0000311520 | 0000 | 0000 | 6E60 | FFC0 | 0001 | 0000 | 0165 | 0000 |
| 0000311540 | 0000 | 0146 | 0000 | 0000 | 0000 | 0000 | 0000 | 0000 |
| 0000311560 | 0000 | 0000 | 0828 | 0000 | 6E60 | FFC0 | 0001 | 0020 |
| 0000311600 | 0102 | 0000 | 0000 | 0140 | 0000 | DC5E | 0000 | 052A |
| 0000311620 | 0000 | 0002 | 622E | 0066 | 0000 | 0000 | 6E60 | FFC0 |
| 0000311640 | 0001 | 0000 | 0165 | 0000 | 0000 | 0156 | 0000 | 0000 |
| 0000311660 | 0000 | 026C | 0000 | 0000 | 6D5F | 646F | 0065 | 0000 |
| 0000311700 | FFE0 | FFFF | FFFF | 000A | 0109 | 0342 | 0000 | 0000 |
| 0000311720 | 0001 | 000C | 0000 | 0000 | 0000 | 0000 | 652E | 0066 |
| 0000311740 | 0000 | 0000 | 6FA0 | FFC0 | 0001 | 0000 | 0165 | 0000 |
| 0000311760 | 0000 | 015C | 0000 | 0000 | 0000 | 0000 | 0000 | 0000 |
| 0000312000 | 742E | 7865 | 0074 | 0000 | 5D80 | FFC0 | 0001 | 0000 |
| 0000312020 | 0103 | 1220 | 0000 | 0035 | 003A | 0000 | 0000 | 0000 |
| 0000312040 | 0000 | 0000 | 642E | 7461 | 0061 | 0000 | 0000 | 0000 |
| 0000312060 | 0004 | 0000 | 0103 | 0000 | 0000 | 0000 | 0000 | 0000 |
| 0000312100 | 0000 | 0000 | 0000 | 0000 | 622E | 7373 | 0000 | 0000 |
| 0000312120 | F780 | FFC6 | 0003 | 0000 | 0103 | 0070 | 0000 | 0000 |
| 0000312140 | 0000 | 0000 | 0000 | 0000 | 0000 | 0000 | 632E | 6E69 |
| 0000312160 | 7469 | 0000 | B9A0 | FFC6 | 0002 | 0000 | 0103 | 0040 |
| 0000312200 | 0000 | 0001 | 0000 | 0000 | 0000 | 0000 | 0000 | 0000 |
| 0000312220 | 662E | 6C69 | 0065 | 0000 | 0534 | 0000 | FFFE | 0000 |
| 0000312240 | 0167 | 7367 | 6970 | 696E | 632E | 0000 | 0000 | 0000 |
| 0000312260 | 0000 | 0000 | 662E | 6C69 | 0065 | 0000 | 0536 | 0000 |
| 0000312300 | FFFE | 0000 | 0167 | 7473 | 6D64 | 682E | 0000 | 0000 |
| 0000312320 | 0000 | 0000 | 0000 | 0000 | 662E | 6C69 | 0065 | 0000 |
| 0000312340 | 0538 | 0000 | FFFE | 0000 | 0167 | 7367 | 6970 | 696E |
| 0000312360 | 632E | 0000 | 0000 | 0000 | 0000 | 0000 | 662E | 6C69 |
| 0000312400 | 0065 | 0000 | 0548 | 0000 | FFFE | 0000 | 0167 | 7974 |
| 0000312420 | 6570 | 6564 | 2E66 | 0068 | 0000 | 0000 | 0000 | 0000 |
| 0000312440 | 302E | 6166 | 656B | 0000 | 0000 | 0000 | FFFE | 000A |
| 0000312460 | 010F | 0000 | 0000 | 0000 | 0001 | 0000 | 0000 | 0542 |
| 0000312500 | 0000 | 0000 | 465F | 4C41 | 4553 | 0000 | 0000 | 0000 |
| 0000312520 | FFFF | 000B | 0110 | 0000 | 0000 | 0000 | 0001 | 0000 |
| 0000312540 | 0000 | 0000 | 0000 | 0000 | 545F | 5552 | 0045 | 0000 |
| 0000312560 | 0001 | 0000 | FFFF | 000B | 0110 | 0000 | 0000 | 0000 |
| 0000312600 | 0001 | 0000 | 0000 | 0000 | 0000 | 0000 | 652E | 736F |
| 0000312620 | 0000 | 0000 | 0000 | 0000 | FFFE | 000A | 0166 | 053A |

THU MAR 14 17:37:32 1991 GSPMON.4 PAGE 111, LINE 6491

| | | | | | | | | |
|---|---|---|---|---|---|---|---|---|
| 0000312640 | 0000 | 0000 | 0001 | 0000 | 0000 | 0000 | 0000 | 0000 |
| 0000312660 | 312E | 6166 | 656B | 0000 | 0000 | 0000 | FFFE | 0008 |
| 0000312700 | 010A | 0000 | 0000 | 0000 | 0004 | 0000 | 0000 | 0548 |
| 0000312720 | 0000 | 0000 | 705F | 7869 | 6C65 | 0000 | 0000 | 0000 |
| 0000312740 | FFFF | 000E | 0112 | 0000 | 0000 | 0000 | 0004 | 0000 |
| 0000312760 | 0000 | 0000 | 0000 | 0000 | 652E | 736F | 0000 | 0000 |
| 0000313000 | 0000 | 0000 | FFFE | 0008 | 0166 | 0542 | 0000 | 0000 |
| 0000313020 | 0004 | 0000 | 0000 | 0000 | 0000 | 0000 | 662E | 6C69 |
| 0000313040 | 0065 | 0000 | 054A | 0000 | FFFE | 0000 | 0167 | 7367 |
| 0000313060 | 6970 | 696E | 632E | 0000 | 0000 | 0000 | 0000 | 0000 |
| 0000313100 | 662E | 6C69 | 0065 | 0000 | 054C | 0000 | FFFE | 0000 |
| 0000313120 | 0167 | 7367 | 6870 | 6477 | 682E | 0000 | 0000 | 0000 |
| 0000313140 | 0000 | 0000 | 662E | 6C69 | 0065 | 0000 | 054E | 0000 |
| 0000313160 | FFFE | 0000 | 0167 | 7367 | 6970 | 696E | 632E | 0000 |
| 0000313200 | 0000 | 0000 | 0000 | 0000 | 662E | 6C69 | 0065 | 0000 |
| 0000313220 | 05AC | 0000 | FFFE | 0000 | 0167 | 7367 | 6870 | 6377 |
| 0000313240 | 682E | 0000 | 0000 | 0000 | 0000 | 0000 | 322E | 6166 |
| 0000313260 | 656B | 0000 | 0000 | 0000 | FFFE | 0008 | 010A | 0000 |
| 0000313300 | 0000 | 0000 | 0010 | 0000 | 0000 | 0568 | 0000 | 0000 |
| 0000313320 | 0000 | 0000 | 083A | 0000 | 0000 | 0000 | FFFF | 000E |
| 0000313340 | 0112 | 0000 | 0000 | 0000 | 0002 | 0000 | 0000 | 0000 |
| 0000313360 | 0000 | 0000 | 665F | 6C69 | 306C | 0000 | 0002 | 0000 |
| 0000313400 | FFFF | 000E | 0112 | 0000 | 0000 | 0000 | 0001 | 0000 |
| 0000313420 | 0000 | 0000 | 0000 | 0000 | 635F | 726C | 7265 | 0072 |
| 0000313440 | 0003 | 0000 | FFFF | 000E | 0112 | 0000 | 0000 | 0000 |
| 0000313460 | 0001 | 0000 | 0000 | 0000 | 0000 | 0000 | 665F | 6C69 |
| 0000313500 | 316C | 0000 | 0004 | 0000 | FFFF | 000E | 0112 | 0000 |
| 0000313520 | 0000 | 0000 | 0002 | 0000 | 0000 | 0000 | 0000 | 0000 |
| 0000313540 | 6D5F | 6B73 | 6573 | 006C | 0006 | 0000 | FFFF | 000E |
| 0000313560 | 0112 | 0000 | 0000 | 0000 | 0002 | 0000 | 0000 | 0000 |
| 0000313600 | 0000 | 0000 | 665F | 6468 | 7369 | 0070 | 0008 | 0000 |
| 0000313620 | FFFF | 000E | 0112 | 0000 | 0000 | 0000 | 0004 | 0000 |
| 0000313640 | 0000 | 0000 | 0000 | 0000 | 645F | 7369 | 6170 | 6C6C |
| 0000313660 | 000C | 0000 | FFFF | 000E | 0112 | 0000 | 0000 | 0000 |
| 0000313700 | 0001 | 0000 | 0000 | 0000 | 0000 | 0000 | 665F | 5F62 |
| 0000313720 | 6E65 | 0000 | 000D | 0000 | FFFF | 000E | 0112 | 0000 |
| 0000313740 | 0000 | 0000 | 0001 | 0000 | 0000 | 0000 | 0000 | 0000 |
| 0000313760 | 7A5F | 7265 | 5F6F | 0062 | 000E | 0000 | FFFF | 000E |
| 0000314000 | 0112 | 0000 | 0000 | 0000 | 0001 | 0000 | 0000 | 0000 |
| 0000314020 | 0000 | 0000 | 7A5F | 7265 | 5F6F | 0061 | 000F | 0000 |
| 0000314040 | FFFF | 000E | 0112 | 0000 | 0000 | 0000 | 0001 | 0000 |
| 0000314060 | 0000 | 0000 | 0000 | 0000 | 652E | 736F | 0000 | 0000 |
| 0000314100 | 0000 | 0000 | FFFE | 0008 | 0166 | 0550 | 0000 | 0000 |
| 0000314120 | 0010 | 0000 | 0000 | 0000 | 0000 | 0000 | 332E | 6166 |
| 0000314140 | 656B | 0000 | 0000 | 0000 | FFFE | 0008 | 010A | 0000 |
| 0000314160 | 0000 | 0000 | 0010 | 0000 | 0000 | 0580 | 0000 | 0000 |
| 0000314200 | 6D5F | 6B73 | 6E65 | 0034 | 0000 | 0000 | FFFF | 000E |
| 0000314220 | 0112 | 0000 | 0000 | 0000 | 0001 | 0000 | 0000 | 0000 |
| 0000314240 | 0000 | 0000 | 6D5F | 6B73 | 6E65 | 0035 | 0001 | 0000 |
| 0000314260 | FFFF | 000E | 0112 | 0000 | 0000 | 0000 | 0001 | 0000 |
| 0000314300 | 0000 | 0000 | 0000 | 0000 | 705F | 6C6F | 7261 | 0034 |
| 0000314320 | 0002 | 0000 | FFFF | 000E | 0112 | 0000 | 0000 | 0000 |
| 0000314340 | 0001 | 0000 | 0000 | 0000 | 0000 | 0000 | 705F | 6C6F |
| 0000314360 | 7261 | 0035 | 0003 | 0000 | FFFF | 000E | 0112 | 0000 |
| 0000314400 | 0000 | 0000 | 0001 | 0000 | 0000 | 0000 | 0000 | 0000 |
| 0000314420 | 615F | 756C | 6E66 | 0063 | 0004 | 0000 | FFFF | 000E |
| 0000314440 | 0112 | 0000 | 0000 | 0000 | 0003 | 0000 | 0000 | 0000 |
| 0000314460 | 0000 | 0000 | 615F | 756C | 7263 | 0079 | 0007 | 0000 |
| 0000314500 | FFFF | 000E | 0112 | 0000 | 0000 | 0000 | 0001 | 0000 |

THU MAR 14 17:37:32 1991 GSPMON.4 PAGE 112, LINE 6550

| | | | | | | | | |
|---|---|---|---|---|---|---|---|---|
| 0000314520 | 0000 | 0000 | 0000 | 0000 | 615F | 7273 | 0063 | 0000 |
| 0000314540 | 0008 | 0000 | FFFF | 000E | 0112 | 0000 | 0000 | 0000 |
| 0000314560 | 0002 | 0000 | 0000 | 0000 | 0000 | 0000 | 625F | 7273 |
| 0000314600 | 0063 | 0000 | 000A | 0000 | FFFF | 000E | 0112 | 0000 |
| 0000314620 | 0000 | 0000 | 0002 | 0000 | 0000 | 0000 | 0000 | 0000 |
| 0000314640 | 635F | 7273 | 0063 | 0000 | 000C | 0000 | FFFF | 000E |
| 0000314660 | 0112 | 0000 | 0000 | 0000 | 0002 | 0000 | 0000 | 0000 |
| 0000314700 | 0000 | 0000 | 645F | 7273 | 0063 | 0000 | 000E | 0000 |
| 0000314720 | FFFF | 000E | 0112 | 0000 | 0000 | 0000 | 0002 | 0000 |
| 0000314740 | 0000 | 0000 | 0000 | 0000 | 652E | 736F | 0000 | 0000 |
| 0000314760 | 0000 | 0000 | FFFE | 0008 | 0166 | 0568 | 0000 | 0000 |
| 0000315000 | 0010 | 0000 | 0000 | 0000 | 0000 | 0000 | 342E | 6166 |
| 0000315020 | 656B | 0000 | 0000 | 0000 | FFFE | 0008 | 010A | 0000 |
| 0000315040 | 0000 | 0000 | 0010 | 0000 | 0000 | 0598 | 0000 | 0000 |
| 0000315060 | 655F | 636E | 6B6B | 0000 | 0000 | 0000 | FFFF | 000E |
| 0000315100 | 0112 | 0000 | 0000 | 0000 | 0001 | 0000 | 0000 | 0000 |
| 0000315120 | 0000 | 0000 | 675F | 6172 | 3262 | 0000 | 0001 | 0000 |
| 0000315140 | FFFF | 000E | 0112 | 0000 | 0000 | 0000 | 0001 | 0000 |
| 0000315160 | 0000 | 0000 | 0000 | 0000 | 6D5F | 6362 | 0035 | 0000 |
| 0000315200 | 0002 | 0000 | FFFF | 000E | 0112 | 0000 | 0000 | 0000 |
| 0000315220 | 0002 | 0000 | 0000 | 0000 | 0000 | 0000 | 6D5F | 6362 |
| 0000315240 | 0034 | 0000 | 0004 | 0000 | FFFF | 000E | 0112 | 0000 |
| 0000315260 | 0000 | 0000 | 0002 | 0000 | 0000 | 0000 | 0000 | 0000 |
| 0000315300 | 6D5F | 6362 | 0033 | 0000 | 0006 | 0000 | FFFF | 000E |
| 0000315320 | 0112 | 0000 | 0000 | 0000 | 0002 | 0000 | 0000 | 0000 |
| 0000315340 | 0000 | 0000 | 6D5F | 6362 | 0032 | 0000 | 0008 | 0000 |
| 0000315360 | FFFF | 000E | 0112 | 0000 | 0000 | 0000 | 0002 | 0000 |
| 0000315400 | 0000 | 0000 | 0000 | 0000 | 6D5F | 6362 | 0031 | 0000 |
| 0000315420 | 000A | 0000 | FFFF | 000E | 0112 | 0000 | 0000 | 0000 |
| 0000315440 | 0002 | 0000 | 0000 | 0000 | 0000 | 0000 | 6D5F | 6362 |
| 0000315460 | 0030 | 0000 | 000C | 0000 | FFFF | 000E | 0112 | 0000 |
| 0000315500 | 0000 | 0000 | 0002 | 0000 | 0000 | 0000 | 0000 | 0000 |
| 0000315520 | 735F | 6572 | 0000 | 0000 | 000E | 0000 | FFFF | 000E |
| 0000315540 | 0112 | 0000 | 0000 | 0000 | 0001 | 0000 | 0000 | 0000 |
| 0000315560 | 0000 | 0000 | 735F | 6472 | 0000 | 0000 | 000F | 0000 |
| 0000315600 | FFFF | 000E | 0112 | 0000 | 0000 | 0000 | 0001 | 0000 |
| 0000315620 | 0000 | 0000 | 0000 | 0000 | 652E | 736F | 0000 | 0000 |
| 0000315640 | 0000 | 0000 | FFFE | 0008 | 0166 | 0580 | 0000 | 0000 |
| 0000315660 | 0010 | 0000 | 0000 | 0000 | 0000 | 0000 | 352E | 6166 |
| 0000315700 | 656B | 0000 | 0000 | 0000 | FFFE | 0008 | 010A | 0000 |
| 0000315720 | 0000 | 0000 | 0010 | 0000 | 0000 | 05A0 | 0000 | 0000 |
| 0000315740 | 765F | 6469 | 6573 | 006C | 0000 | 0000 | FFFF | 000E |
| 0000315760 | 0112 | 0000 | 0000 | 0000 | 0003 | 0000 | 0000 | 0000 |
| 0000316000 | 0000 | 0000 | 665F | 6C69 | 006C | 0000 | 0003 | 000D |
| 0000316020 | FFFF | 000E | 0112 | 0000 | 0000 | 0000 | 000D | 0000 |
| 0000316040 | 0000 | 0000 | 0000 | 0000 | 652E | 736F | 0000 | 0000 |
| 0000316060 | 0000 | 0000 | FFFE | 0008 | 0166 | 0598 | 0000 | 0000 |
| 0000316100 | 0010 | 0000 | 0000 | 0000 | 0000 | 0000 | 362E | 6166 |
| 0000316120 | 656B | 0000 | 0000 | 0000 | FFFE | 0008 | 010A | 0000 |
| 0000316140 | 0000 | 0000 | 0040 | 0000 | 0000 | 05AC | 0000 | 0000 |
| 0000316160 | 635F | 746E | 6C72 | 0030 | 0000 | 0000 | FFFF | 0008 |
| 0000316200 | 0108 | 0550 | 0000 | 0000 | 0010 | 0000 | 000D | 0000 |
| 0000316220 | 0000 | 0000 | 635F | 746E | 6C72 | 0031 | 0010 | 0000 |
| 0000316240 | FFFF | 0008 | 0108 | 0568 | 0000 | 0000 | 0010 | 0000 |
| 0000316260 | 0000 | 0000 | 0000 | 0000 | 635F | 746E | 6C72 | 0032 |
| 0000316300 | 0020 | 0000 | FFFF | 0008 | 0108 | 0580 | 0000 | 0000 |
| 0000316320 | 0010 | 0000 | 0000 | 0000 | 0000 | 0000 | 635F | 746E |
| 0000316340 | 6C72 | 0033 | 0030 | 0000 | FFFF | 0008 | 0108 | 0598 |
| 0000316360 | 0000 | 0000 | 0010 | 0000 | 0000 | 0000 | 0000 | 0000 |

THU MAR 14 17:37:32 1991 GSPMON.4 PAGE 113, LINE 6609

| | | | | | | | | |
|---|---|---|---|---|---|---|---|---|
| 0000316400 | 652E | 736F | 0000 | 0000 | 0000 | 0000 | FFFE | 0008 |
| 0000316420 | 0166 | 05A0 | 0000 | 0000 | 0040 | 0000 | 0000 | 0000 |
| 0000316440 | 0000 | 0000 | 662E | 6C69 | 0065 | 0000 | 05C4 | 0000 |
| 0000316460 | FFFE | 0000 | 0167 | 7367 | 6970 | 696E | 632E | 0000 |
| 0000316500 | 0000 | 0000 | 0000 | 0000 | 0000 | 0000 | 0844 | 0000 |
| 0000316520 | 6FA0 | FFC0 | 0001 | 0020 | 0102 | 0000 | 0000 | 0BD0 |
| 0000316540 | 0000 | DC70 | 0000 | 05B4 | 0000 | 0001 | 622E | 0066 |
| 0000316560 | 0000 | 0000 | 6FA0 | FFC0 | 0001 | 0000 | 0165 | 0000 |
| 0000316600 | 0000 | 0031 | 0000 | 0000 | 0000 | 0082 | 0000 | 0000 |
| 0000316620 | 652E | 0066 | 0000 | 0000 | 7B70 | FFC0 | 0001 | 0000 |
| 0000316640 | 0165 | 0000 | 0000 | 005F | 0000 | 0000 | 0000 | 0000 |
| 0000316660 | 0000 | 0000 | 0000 | 0000 | 0854 | 0000 | 7B70 | FFC0 |
| 0000316700 | 0001 | 0020 | 0103 | 0000 | 0000 | 00E0 | 0000 | DCD6 |
| 0000316720 | 0000 | 05BE | 0000 | 0002 | 622E | 0066 | 0000 | 0000 |
| 0000316740 | 7B70 | FFC0 | 0001 | 0000 | 0165 | 0000 | 0000 | 0061 |
| 0000316760 | 0000 | 0000 | 0000 | 008C | 0000 | 0000 | 615F | 6464 |
| 0000317000 | 6572 | 7373 | FFE0 | FFFF | FFFF | 0010 | 0109 | 0000 |
| 0000317020 | 0000 | 0000 | 0020 | 0000 | 0000 | 0000 | 0000 | 0000 |
| 0000317040 | 765F | 6C61 | 6575 | 0000 | FFC0 | FFFF | FFFF | 000D |
| 0000317060 | 0109 | 0000 | 0000 | 0000 | 0010 | 0000 | 0000 | 0000 |
| 0000317100 | 0000 | 0000 | 652E | 0066 | 0000 | 0000 | 7C50 | FFC0 |
| 0000317120 | 0001 | 0000 | 0165 | 0000 | 0000 | 0067 | 0000 | 0000 |
| 0000317140 | 0000 | 0000 | 0000 | 0000 | 742E | 7865 | 0074 | 000D |
| 0000317160 | 6FA0 | FFC0 | 0001 | 0000 | 0103 | 0CB0 | 0000 | 0010 |
| 0000317200 | 0013 | 0000 | 0000 | 0000 | 0000 | 0000 | 642E | 7461 |
| 0000317220 | 0061 | 0000 | 0000 | 0000 | 0004 | 0000 | 0103 | 0000 |
| 0000317240 | 0000 | 0000 | 0000 | 0000 | 0000 | 0000 | 0000 | 0000 |
| 0000317260 | 622E | 7373 | 0000 | 0000 | F7F0 | FFC6 | 0003 | 0000 |
| 0000317300 | 0103 | 0000 | 0000 | 0000 | 0000 | 0000 | 0000 | 0000 |
| 0000317320 | 0000 | 0000 | 662E | 6C69 | 0065 | 0000 | 05C6 | 0000 |
| 0000317340 | FFFE | 0000 | 0167 | 7367 | 6370 | 6E6F | 632E | 0000 |
| 0000317360 | 0000 | 0000 | 0000 | 0000 | 662E | 6C69 | 0065 | 0000 |
| 0000317400 | 05D6 | 0000 | FFFE | 0000 | 0167 | 7974 | 6570 | 6564 |
| 0000317420 | 2E66 | 0068 | 0000 | 0000 | 0000 | 0000 | 302E | 6166 |
| 0000317440 | 656B | 0000 | 0000 | 0000 | FFFE | 000A | 010F | 0000 |
| 0000317460 | 0000 | 0000 | 0001 | 0000 | 0000 | 05D0 | 0000 | 0000 |
| 0000317500 | 465F | 4C41 | 4553 | 0000 | 0000 | 0000 | FFFF | 000B |
| 0000317520 | 0110 | 0000 | 0000 | 0000 | 0001 | 0000 | 0000 | 0000 |
| 0000317540 | 0000 | 0000 | 545F | 5552 | 0045 | 0000 | 0001 | 0000 |
| 0000317560 | FFFF | 000B | 0110 | 0000 | 0000 | 0000 | 0001 | 0000 |
| 0000317600 | 0000 | 0000 | 0000 | 0000 | 652E | 736F | 0000 | 0000 |
| 0000317620 | 0000 | 0000 | FFFE | 000A | 0166 | 05C8 | 0000 | 0000 |
| 0000317640 | 0001 | 0000 | 0000 | 0000 | 0000 | 0000 | 312E | 6166 |
| 0000317660 | 656B | 0000 | 0000 | 0000 | FFFE | 0008 | 010A | 0000 |
| 0000317700 | 0000 | 0000 | 0004 | 0000 | 0000 | 05D6 | 0000 | 0000 |
| 0000317720 | 705F | 7869 | 6C65 | 0000 | 0000 | 0000 | FFFF | 000E |
| 0000317740 | 0112 | 0000 | 0000 | 0000 | 0004 | 0000 | 0000 | 0000 |
| 0000317760 | 0000 | 0000 | 652E | 736F | 0000 | 0000 | 0000 | 0000 |
| 0000320000 | FFFE | 0008 | 0166 | 05D0 | 0000 | 0000 | 0004 | 0000 |
| 0000320020 | 0000 | 0000 | 0000 | 0000 | 662E | 6C69 | 0065 | 0000 |
| 0000320040 | 05D8 | 0000 | FFFE | 0000 | 0167 | 7367 | 6370 | 6E6F |
| 0000320060 | 632E | 0000 | 0000 | 0000 | 0000 | 0000 | 662E | 6C69 |
| 0000320100 | 0065 | 0000 | 0636 | 0000 | FFFE | 0000 | 0167 | 7367 |
| 0000320120 | 6870 | 6377 | 682E | 0000 | 0000 | 0000 | 0000 | 0000 |
| 0000320140 | 322E | 6166 | 656B | 0000 | 0000 | 0000 | FFFE | 0008 |
| 0000320160 | 010A | 0000 | 0000 | 0000 | 0010 | 0000 | 0000 | 05F2 |
| 0000320200 | 0000 | 0000 | 0000 | 0000 | 0862 | 0000 | 0000 | 0000 |
| 0000320220 | FFFF | 000E | 0112 | 0000 | 0000 | 0000 | 0002 | 0000 |
| 0000320240 | 0000 | 0000 | 0000 | 0000 | 665F | 6C69 | 306C | 0000 |

THU MAR 14 17:37:32 1991 GSPMON.4 PAGE 114, LINE 6668

| | | | | | | | | |
|---|---|---|---|---|---|---|---|---|
| 0000320260 | 0002 | 0000 | FFFF | 000E | 0112 | 0000 | 0000 | 0000 |
| 0000320300 | 0001 | 0000 | 0000 | 0000 | 0000 | 0000 | 635F | 726C |
| 0000320320 | 7265 | 0072 | 0003 | 0000 | FFFF | 000E | 0112 | 0000 |
| 0000320340 | 0000 | 0000 | 0001 | 0000 | 0000 | 0000 | 0000 | 0000 |
| 0000320360 | 665F | 6C69 | 316C | 0000 | 0004 | 0000 | FFFF | 000E |
| 0000320400 | 0112 | 0000 | 0000 | 0000 | 0002 | 0000 | 0000 | 0000 |
| 0000320420 | 0000 | 0000 | 6D5F | 6B73 | 6573 | 006C | 0006 | 0000 |
| 0000320440 | FFFF | 000E | 0112 | 0000 | 0000 | 0000 | 0002 | 0000 |
| 0000320460 | 0000 | 0000 | 0000 | 0000 | 665F | 6468 | 7369 | 0070 |
| 0000320500 | 0008 | 0000 | FFFF | 000E | 0112 | 0000 | 0000 | 0000 |
| 0000320520 | 0004 | 0000 | 0000 | 0000 | 0000 | 0000 | 645F | 7369 |
| 0000320540 | 6170 | 6C6C | 000C | 0000 | FFFF | 000E | 0112 | 0000 |
| 0000320560 | 0000 | 0000 | 0001 | 0000 | 0000 | 0000 | 0000 | 0000 |
| 0000320600 | 665F | 5F62 | 6E65 | 0000 | 000D | 0000 | FFFF | 000E |
| 0000320620 | 0112 | 0000 | 0000 | 0000 | 0001 | 0000 | 0000 | 0000 |
| 0000320640 | 0000 | 0000 | 7A5F | 7265 | 5F6F | 0062 | 000E | 0000 |
| 0000320660 | FFFF | 000E | 0112 | 0000 | 0000 | 0000 | 0001 | 0000 |
| 0000320700 | 0000 | 0000 | 0000 | 0000 | 7A5F | 7265 | 5F6F | 0061 |
| 0000320720 | 000F | 0000 | FFFF | 000E | 0112 | 0000 | 0000 | 0000 |
| 0000320740 | 0001 | 0000 | 0000 | 0000 | 0000 | 0000 | 652E | 736F |
| 0000320760 | 0000 | 0000 | 0000 | 0000 | FFFE | 0008 | 0166 | 05DA |
| 0000321000 | 0000 | 0000 | 0010 | 0000 | 0000 | 0000 | 0000 | 0000 |
| 0000321020 | 332E | 6166 | 656B | 0000 | 0000 | 0000 | FFFE | 0008 |
| 0000321040 | 010A | 0000 | 0000 | 0000 | 0010 | 0000 | 0000 | 060A |
| 0000321060 | 0000 | 0000 | 6D5F | 6B73 | 6E65 | 0034 | 0000 | 0000 |
| 0000321100 | FFFF | 000E | 0112 | 0000 | 0000 | 0000 | 0001 | 0000 |
| 0000321120 | 0000 | 0000 | 0000 | 0000 | 6D5F | 6B73 | 6E65 | 0035 |
| 0000321140 | 0001 | 0000 | FFFF | 000E | 0112 | 0000 | 0000 | 0000 |
| 0000321160 | 0001 | 0000 | 0000 | 0000 | 0000 | 0000 | 705F | 6C6F |
| 0000321200 | 7261 | 0034 | 0002 | 0000 | FFFF | 000E | 0112 | 0000 |
| 0000321220 | 0000 | 0000 | 0001 | 0000 | 0000 | 0000 | 0000 | 0000 |
| 0000321240 | 705F | 6C6F | 7261 | 0035 | 0003 | 0000 | FFFF | 000E |
| 0000321260 | 0112 | 0000 | 0000 | 0000 | 0001 | 0000 | 0000 | 0000 |
| 0000321300 | 0000 | 0000 | 615F | 756C | 6E66 | 0063 | 0004 | 0000 |
| 0000321320 | FFFF | 000E | 0112 | 0000 | 0000 | 0000 | 0003 | 0000 |
| 0000321340 | 0000 | 0000 | 0000 | 0000 | 615F | 756C | 7263 | 0079 |
| 0000321360 | 0007 | 0000 | FFFF | 000E | 0112 | 0000 | 0000 | 0000 |
| 0000321400 | 0001 | 0000 | 0000 | 00 | 0000 | 0000 | 615F | 7273 |
| 0000321420 | 0063 | 0000 | 0008 | 0000 | FFFF | 000E | 0112 | 0000 |
| 0000321440 | 0000 | 0000 | 0002 | 0000 | 0000 | 0000 | 0000 | 0000 |
| 0000321460 | 625F | 7273 | 0063 | 0000 | 000A | 0000 | FFFF | 000E |
| 0000321500 | 0112 | 0000 | 0000 | 0000 | 0002 | 0000 | 0000 | 0000 |
| 0000321520 | 0000 | 0000 | 635F | 7273 | 0063 | 0000 | 000C | 0000 |
| 0000321540 | FFFF | 000E | 0112 | 0000 | 0000 | 0000 | 0002 | 0000 |
| 0000321560 | 0000 | 0000 | 0000 | 0000 | 645F | 7273 | 0063 | 0000 |
| 0000321600 | 000E | 0000 | FFFF | 000E | 0112 | 0000 | 0000 | 0000 |
| 0000321620 | 0002 | 0000 | 0000 | 0000 | 0000 | 0000 | 652E | 736F |
| 0000321640 | 0000 | 0000 | 0000 | 0000 | FFFE | 0008 | 0166 | 05F2 |
| 0000321660 | 0000 | 0000 | 0010 | 0000 | 0000 | 0000 | 0000 | 0000 |
| 0000321700 | 342E | 6166 | 656B | 0000 | 0000 | 0000 | FFFE | 0008 |
| 0000321720 | 010A | 0000 | 0000 | 0000 | 0010 | 0000 | 0000 | 0622 |
| 0000321740 | 0000 | 0000 | 655F | 636E | 6868 | 0000 | 0000 | 0000 |
| 0000321760 | FFFF | 000E | 0112 | 0000 | 0000 | 0000 | 0001 | 0000 |
| 0000322000 | 0000 | 0000 | 0000 | 0000 | 675F | 6172 | 3262 | 0000 |
| 0000322020 | 0001 | 0000 | FFFF | 000E | 0112 | 0000 | 0000 | 0000 |
| 0000322040 | 0001 | 0000 | 0000 | 0000 | 0000 | 0000 | 6D5F | 6362 |
| 0000322060 | 0035 | 0000 | 0002 | 0000 | FFFF | 000E | 0112 | 0000 |
| 0000322100 | 0000 | 0000 | 0002 | 0000 | 0000 | 0000 | 0000 | 0000 |
| 0000322120 | 6D5F | 6362 | 0034 | 0000 | 0004 | 0000 | FFFF | 000E |

THU MAR 14 17:37:32 1991 GSPMON.4 PAGE 115, LINE 6727

| | | | | | | | | |
|---|---|---|---|---|---|---|---|---|
| 0000322140 | 0112 | 0000 | 0000 | 0000 | 0002 | 0000 | 0000 | 0000 |
| 0000322160 | 0000 | 0000 | 6D5F | 6362 | 0033 | 0000 | 0006 | 0000 |
| 0000322200 | FFFF | 000E | 0112 | 0000 | 0000 | 0000 | 0002 | 0000 |
| 0000322220 | 0000 | 0000 | 0000 | 0000 | 6D5F | 6362 | 0032 | 0000 |
| 0000322240 | 0008 | 0000 | FFFF | 000E | 0112 | 0000 | 0000 | 0000 |
| 0000322260 | 0002 | 0000 | 0000 | 0000 | 0000 | 0000 | 6D5F | 6362 |
| 0000322300 | 0031 | 0000 | 000A | 0000 | FFFF | 000E | 0112 | 0000 |
| 0000322320 | 0000 | 0000 | 0002 | 0000 | 0000 | 0000 | 0000 | 0000 |
| 0000322340 | 6D5F | 6362 | 0030 | 0000 | 000C | 0000 | FFFF | 000E |
| 0000322360 | 0112 | 0000 | 0000 | 0000 | 0002 | 0000 | 0000 | 0000 |
| 0000322400 | 0000 | 0000 | 735F | 6572 | 0000 | 0000 | 000E | 0000 |
| 0000322420 | FFFF | 000E | 0112 | 0000 | 0000 | 0000 | 0001 | 0000 |
| 0000322440 | 0000 | 0000 | 0000 | 0000 | 735F | 6472 | 0000 | 0000 |
| 0000322460 | 000F | 0000 | FFFF | 000E | 0112 | 0000 | 0000 | 0000 |
| 0000322500 | 0001 | 0000 | 0000 | 0000 | 0000 | 0000 | 652E | 736F |
| 0000322520 | 0000 | 0000 | 0000 | 0000 | FFFE | 0008 | 0166 | 060A |
| 0000322540 | 0000 | 0000 | 0010 | 0000 | 0000 | 0000 | 0000 | 0000 |
| 0000322560 | 352E | 6166 | 656B | 0000 | 0000 | 0000 | FFFE | 0008 |
| 0000322600 | 010A | 0000 | 0000 | 0000 | 0010 | 0000 | 0000 | 062A |
| 0000322620 | 0000 | 0000 | 765F | 6469 | 6573 | 006C | 0000 | 0000 |
| 0000322640 | FFFF | 000E | 0112 | 0000 | 0000 | 0000 | 0003 | 0000 |
| 0000322660 | 0000 | 0000 | 0000 | 0000 | 665F | 6C69 | 006C | 0000 |
| 0000322700 | 0003 | 0000 | FFFF | 000E | 0112 | 0000 | 0000 | 0000 |
| 0000322720 | 000D | 0000 | 0000 | 0000 | 0000 | 0000 | 652E | 736F |
| 0000322740 | 0000 | 0000 | 0000 | 0000 | FFFE | 0008 | 0166 | 0622 |
| 0000322760 | 0000 | 0000 | 0010 | 0000 | 0000 | 0000 | 0000 | 0000 |
| 0000323000 | 362E | 6166 | 656B | 0000 | 0000 | 0000 | FFFE | 0008 |
| 0000323020 | 010A | 0000 | 0000 | 0000 | 0040 | 0000 | 0000 | 0636 |
| 0000323040 | 0000 | 0000 | 635F | 746E | 6C72 | 0030 | 0000 | 0000 |
| 0000323060 | FFFF | 0008 | 0108 | 05DA | 0000 | 0000 | 0010 | 0000 |
| 0000323100 | 0000 | 0000 | 0000 | 0000 | 635F | 746E | 6C72 | 0031 |
| 0000323120 | 0010 | 0000 | FFFF | 0008 | 0108 | 05F2 | 0000 | 0000 |
| 0000323140 | 0010 | 0000 | 0000 | 0000 | 0000 | 0000 | 635F | 746E |
| 0000323160 | 6C72 | 0032 | 0020 | 0000 | FFFF | 0008 | 0108 | 060A |
| 0000323200 | 0000 | 0000 | 0010 | 0000 | 0000 | 0000 | 0000 | 0000 |
| 0000323220 | 635F | 746E | 6C72 | 0033 | 0030 | 0000 | FFFF | 0008 |
| 0000323240 | 0108 | 0622 | 0000 | 0000 | 0010 | 0000 | 0000 | 0000 |
| 0000323260 | 0000 | 0000 | 652E | 736F | 0000 | 0000 | 0000 | 0000 |
| 0000323300 | FFFE | 0008 | 0166 | 062A | 0000 | 0000 | 0040 | 0000 |
| 0000323320 | 0000 | 0000 | 0000 | 0000 | 662E | 6C69 | 0065 | 0000 |
| 0000323340 | 0638 | 0000 | FFFE | 0000 | 0167 | 7367 | 6370 | 6E6F |
| 0000323360 | 632E | 0000 | 0000 | 0000 | 0000 | 0000 | 662E | 6C69 |
| 0000323400 | 0065 | 0000 | 0714 | 0000 | FFFE | 0000 | 0167 | 7367 |
| 0000323420 | 6370 | 6766 | 682E | 0000 | 0000 | 0000 | 0000 | 0000 |
| 0000323440 | 0000 | 0000 | 086C | 0000 | 0000 | 0000 | FFFE | 000A |
| 0000323460 | 010F | 0000 | 0000 | 0000 | 0002 | 0000 | 0000 | 0644 |
| 0000323500 | 0000 | 0000 | 4F5F | 454E | 315F | 0036 | 0000 | 0000 |
| 0000323520 | FFFF | 000B | 0110 | 0000 | 0000 | 0000 | 0002 | 0000 |
| 0000323540 | 0000 | 0000 | 0000 | 0000 | 545F | 4F57 | 385F | 0000 |
| 0000323560 | 0001 | 0000 | FFFF | 000B | 0110 | 0000 | 0000 | 0000 |
| 0000323600 | 0002 | 0000 | 0000 | 0000 | 0000 | 0000 | 465F | 554F |
| 0000323620 | 5F52 | 0034 | 0002 | 0000 | FFFF | 000B | 0110 | 0000 |
| 0000323640 | 0000 | 0000 | 0002 | 0000 | 0000 | 0000 | 0000 | 0000 |
| 0000323660 | 652E | 736F | 0000 | 0000 | 0000 | 0000 | FFFE | 000A |
| 0000323700 | 0166 | 063A | 0000 | 0000 | 0002 | 0000 | 0000 | 0000 |
| 0000323720 | 0000 | 0000 | 635F | 726C | 655F | 7272 | 0000 | 0000 |
| 0000323740 | FFFE | 000A | 010F | 0000 | 0000 | 0000 | 0001 | 0000 |
| 0000323760 | 0000 | 064C | 0000 | 0000 | 4E5F | 5F4F | 4C43 | 0052 |
| 0000324000 | 0000 | 0000 | FFFF | 000B | 0110 | 0000 | 0000 | 0000 |

THU MAR 14 17:37:32 1991 GSPMON.4 PAGE 116, LINE 6786

| | | | | | | | | |
|---|---|---|---|---|---|---|---|---|
| 0000324020 | 0001 | 0000 | 0000 | 0000 | 0000 | 0000 | 435F | 524C |
| 0000324040 | 0000 | 0000 | 0001 | 0000 | FFFF | 000B | 0110 | 0000 |
| 0000324060 | 0000 | 0000 | 0001 | 0000 | 0000 | 0000 | 0000 | 0000 |
| 0000324100 | 652E | 736F | 0000 | 0000 | 0000 | 0000 | FFFE | 000A |
| 0000324120 | 0166 | 0644 | 0000 | 0000 | 0001 | 0000 | 0000 | 0000 |
| 0000324140 | 0000 | 0000 | 0000 | 0000 | 0876 | 0000 | 0000 | 0000 |
| 0000324160 | FFFE | 000A | 010F | 0000 | 0000 | 0000 | 0003 | 0000 |
| 0000324200 | 0000 | 065A | 0000 | 0000 | 505F | 414C | 454E | 0030 |
| 0000324220 | 0000 | 0000 | FFFF | 000B | 0110 | 0000 | 0000 | 0000 |
| 0000324240 | 0003 | 000C | 0000 | 0000 | 0000 | 0000 | 505F | 414C |
| 0000324260 | 454E | 0032 | 0001 | 0000 | FFFF | 000B | 0110 | 0000 |
| 0000324300 | 0000 | 0000 | 0003 | 0000 | 0000 | 0000 | 0000 | 0000 |
| 0000324320 | 505F | 414C | 454E | 0031 | 0002 | 0000 | FFFF | 000B |
| 0000324340 | 0110 | 0000 | 0000 | 0000 | 0003 | 0000 | 0000 | 0000 |
| 0000324360 | 0000 | 0000 | 505F | 414C | 454E | 0033 | 0003 | 0000 |
| 0000324400 | FFFF | 000B | 0110 | 0000 | 0000 | 0000 | 0003 | 0000 |
| 0000324420 | 0000 | 0000 | 0000 | 0000 | 4E5F | 504F | 414C | 454E |
| 0000324440 | 0004 | 0000 | FFFF | 000B | 0110 | 0000 | 0000 | 0000 |
| 0000324460 | 0003 | 0000 | 0000 | 0000 | 0000 | 0000 | 652E | 736F |
| 0000324500 | 0000 | 0000 | 0000 | 0000 | FFFE | 000A | 0166 | 064C |
| 0000324520 | 0000 | 0000 | 0003 | 0000 | 0000 | 0000 | 0000 | 0000 |
| 0000324540 | 0000 | 0000 | 0881 | 0000 | 0000 | 0000 | FFFE | 000A |
| 0000324560 | 010F | 0000 | 0000 | 0000 | 0001 | 0000 | 0000 | 0662 |
| 0000324600 | 0000 | 0000 | 4E5F | 5F4F | 4944 | 5053 | 0000 | 0000 |
| 0000324620 | FFFF | 000B | 0110 | 0000 | 0000 | 0000 | 0001 | 0000 |
| 0000324640 | 0000 | 0000 | 0000 | 0000 | 445F | 5349 | 0050 | 0000 |
| 0000324660 | 0001 | 0000 | FFFF | 000B | 0110 | 0000 | 0000 | 0000 |
| 0000324700 | 0001 | 0000 | 0000 | 0000 | 0000 | 0000 | 652E | 736F |
| 0000324720 | 0000 | 0000 | 0000 | 0000 | FFFE | 000A | 0166 | 065A |
| 0000324740 | 0000 | 0000 | 0001 | 0000 | 0000 | 0000 | 0000 | 0000 |
| 0000324760 | 665F | 5F62 | 6E65 | 0000 | 0000 | 0000 | FFFE | 000A |
| 0000325000 | 010F | 0000 | 0000 | 0000 | 0001 | 0000 | 0000 | 066A |
| 0000325020 | 0000 | 0000 | 0000 | 0000 | 088B | 0000 | 0000 | 0000 |
| 0000325040 | FFFF | 000B | 0110 | 0000 | 0000 | 0000 | 0001 | 0000 |
| 0000325060 | 0000 | 0000 | 0000 | 0000 | 0000 | 0000 | 0896 | 0000 |
| 0000325100 | 0001 | 0000 | FFFF | 000B | 0110 | 0000 | 0000 | 0000 |
| 0000325120 | 0001 | 0000 | 0000 | 0000 | 0000 | 0000 | 652E | 736F |
| 0000325140 | 0000 | 0000 | 0000 | 0000 | FFFE | 000A | 0166 | 0662 |
| 0000325160 | 0000 | 0000 | 0001 | 0000 | 0000 | 0000 | 0000 | 0000 |
| 0000325200 | 7A5F | 7265 | 5F6F | 0062 | 0000 | 0000 | FFFE | 000A |
| 0000325220 | 010F | 0000 | 0000 | 0000 | 0001 | 0000 | 0000 | 0672 |
| 0000325240 | 0000 | 0000 | 0000 | 0000 | 08A0 | 0000 | 0000 | 0000 |
| 0000325260 | FFFF | 000B | 0110 | 0000 | 0000 | 0000 | 0001 | 0000 |
| 0000325300 | 0000 | 0000 | 0000 | 0000 | 0000 | 0000 | 08AC | 0000 |
| 0000325320 | 0001 | 0000 | FFFF | 000B | 0110 | 0000 | 0000 | 0000 |
| 0000325340 | 0001 | 0000 | 0000 | 0000 | 0000 | 0000 | 652E | 736F |
| 0000325360 | 0000 | 0000 | 0000 | 0000 | FFFE | 000A | 0166 | 066A |
| 0000325400 | 0000 | 0000 | 0001 | 0000 | 0000 | 0000 | 0000 | 0000 |
| 0000325420 | 7A5F | 7265 | 5F6F | 0061 | 0000 | 0000 | FFFE | 000A |
| 0000325440 | 010F | 0000 | 0000 | 0000 | 0001 | 0000 | 0000 | 067A |
| 0000325460 | 0000 | 0000 | 0000 | 0000 | 08B6 | 0000 | 0000 | 0000 |
| 0000325500 | FFFF | 000B | 0110 | 0000 | 0000 | 0000 | 0001 | 0000 |
| 0000325520 | 0000 | 0000 | 0000 | 0000 | 0000 | 0000 | 08C2 | 0000 |
| 0000325540 | 0001 | 0000 | FFFF | 000B | 0110 | 0000 | 0000 | 0000 |
| 0000325560 | 0001 | 0000 | 0000 | 0000 | 0000 | 0000 | 652E | 736F |
| 0000325600 | 0000 | 0000 | 0000 | 0000 | FFFE | 000A | 0166 | 0672 |
| 0000325620 | 0000 | 0000 | 0001 | 0000 | 0000 | 0000 | 0000 | 0000 |
| 0000325640 | 0000 | 0000 | 08CC | 0000 | 0000 | 0000 | FFFE | 000A |
| 0000325660 | 010F | 0000 | 0000 | 0000 | 0002 | 0000 | 0000 | 0686 |

THU MAR 14 17:37:32 1991 GSPMON.4 PAGE 117, LINE 6845

| | | | | | | | | |
|---|---|---|---|---|---|---|---|---|
| 0000325700 | 0000 | 0000 | 0000 | 0000 | 08D6 | 0000 | 0000 | 0000 |
| 0000325720 | FFFF | 000B | 0110 | 0000 | 0000 | 0000 | 0002 | 0000 |
| 0000325740 | 0000 | 0000 | 0000 | 0000 | 0000 | 0000 | 08E0 | 0000 |
| 0000325760 | 0001 | 0000 | FFFF | 000B | 0110 | 0000 | 0000 | 0000 |
| 0000326000 | 0002 | 0000 | 0000 | 0000 | 0000 | 0000 | 0000 | 0000 |
| 0000326020 | 08EA | 0000 | 0002 | 0000 | FFFF | 000B | 0110 | 0000 |
| 0000326040 | 0000 | 0000 | 0002 | 0000 | 0000 | 0000 | 0000 | 0000 |
| 0000326060 | 0000 | 0000 | 08F4 | 0000 | 0003 | 0000 | FFFF | 000B |
| 0000326100 | 0110 | 0000 | 0000 | 0000 | 0002 | 0000 | 0000 | 0000 |
| 0000326120 | 0000 | 0000 | 652E | 736F | 0000 | 0000 | 0000 | 0000 |
| 0000326140 | FFFE | 000A | 0166 | 067A | 0000 | 0000 | 0002 | 0000 |
| 0000326160 | 0000 | 0000 | 0000 | 0000 | 615F | 756C | 665F | 636E |
| 0000326200 | 0000 | 0000 | FFFE | 000A | 010F | 0000 | 0000 | 0000 |
| 0000326220 | 0003 | 0000 | 0000 | 069A | 0000 | 0000 | 435F | 454C |
| 0000326240 | 5241 | 0000 | 0000 | 0000 | FFFF | 000B | 0110 | 0000 |
| 0000326260 | 0000 | 0000 | 0003 | 0000 | 0000 | 0000 | 0000 | 0000 |
| 0000326300 | 425F | 494D | 554E | 4153 | 0001 | 0000 | FFFF | 000B |
| 0000326320 | 0110 | 0000 | 0000 | 0000 | 0003 | 0000 | 0000 | 0000 |
| 0000326340 | 0000 | 0000 | 415F | 494D | 554E | 4253 | 0002 | 0000 |
| 0000326360 | FFFF | 000B | 0110 | 0000 | 0000 | 0000 | 0003 | 0000 |
| 0000326400 | 0000 | 0000 | 0000 | 0000 | 505F | 554C | 0053 | 0000 |
| 0000326420 | 0003 | 0000 | FFFF | 000B | 0110 | 0000 | 0000 | 0000 |
| 0000326440 | 0003 | 0000 | 0000 | 0000 | 0000 | 0000 | 585F | 524F |
| 0000326460 | 0000 | 0000 | 0004 | 0000 | FFFF | 000B | 0110 | 0000 |
| 0000326500 | 0000 | 0000 | 0003 | 0000 | 0000 | 0000 | 0000 | 0000 |
| 0000326520 | 4F5F | 0052 | 0000 | 0000 | 0005 | 0000 | FFFF | 000B |
| 0000326540 | 0110 | 0000 | 0000 | 0000 | 0003 | 0000 | 0000 | 0000 |
| 0000326560 | 0000 | 0000 | 415F | 444E | 0000 | 0000 | 0006 | 0000 |
| 0000326600 | FFFF | 000B | 0110 | 0000 | 0000 | 0000 | 0003 | 0000 |
| 0000326620 | 0000 | 0000 | 0000 | 0000 | 505F | 4552 | 4553 | 0054 |
| 0000326640 | 0007 | 0000 | FFFF | 000B | 0110 | 0000 | 0000 | 0000 |
| 0000326660 | 0003 | 0000 | 0000 | 0000 | 0000 | 0000 | 652E | 736F |
| 0000326700 | 0000 | 0000 | 0000 | 0000 | FFFE | 000A | 0166 | 0686 |
| 0000326720 | 0000 | 0000 | 0003 | 0000 | 0000 | 0000 | 0000 | 0000 |
| 0000326740 | 615F | 756C | 635F | 7972 | 0000 | 0000 | FFFE | 000A |
| 0000326760 | 010F | 0000 | 0000 | 0000 | 0001 | 0000 | 0000 | 06A2 |
| 0000327000 | 0000 | 0000 | 5A5F | 5245 | 004F | 0000 | 0000 | 0000 |
| 0000327020 | FFFF | 000B | 0110 | 0000 | 0000 | 0000 | 0001 | 0000 |
| 0000327040 | 0000 | 0000 | 0000 | 0000 | 4F5F | 454E | 0000 | 0000 |
| 0000327060 | 0001 | 0000 | FFFF | 000B | 0110 | 0000 | 0000 | 0000 |
| 0000327100 | 0001 | 0000 | 0000 | 0000 | 0000 | 0000 | 652E | 736F |
| 0000327120 | 0000 | 0000 | 0000 | 0000 | FFFE | 000A | 0166 | 069A |
| 0000327140 | 0000 | 0000 | 0001 | 0000 | 0000 | 0000 | 0000 | 0000 |
| 0000327160 | 0000 | 0000 | 08FE | 0000 | 0000 | 0000 | FFFE | 000A |
| 0000327200 | 010F | 0000 | 0000 | 0000 | 0001 | 0000 | 0000 | 06AA |
| 0000327220 | 0000 | 0000 | 0000 | 0000 | 090A | 0000 | 0000 | 0000 |
| 0000327240 | FFFF | 000B | 0110 | 0000 | 0000 | 0000 | 0001 | 0000 |
| 0000327260 | 0000 | 0000 | 0000 | 0000 | 0000 | 0000 | 0917 | 0000 |
| 0000327300 | 0001 | 0000 | FFFF | 000B | 0110 | 0000 | 0000 | 0000 |
| 0000327320 | 0001 | 0000 | 0000 | 0000 | 0000 | 0000 | 652E | 736F |
| 0000327340 | 0000 | 0000 | 0000 | 0000 | FFFE | 000A | 0166 | 06A2 |
| 0000327360 | 0000 | 0000 | 0001 | 0000 | 0000 | 0000 | 0000 | 0000 |
| 0000327400 | 0000 | 0000 | 0923 | 0000 | 0000 | 0000 | FFFE | 000A |
| 0000327420 | 010F | 0000 | 0000 | 0000 | 0001 | 0000 | 0000 | 06B2 |
| 0000327440 | 0000 | 0000 | 4D5F | 5341 | 5F4B | 4E45 | 0000 | 0000 |
| 0000327460 | FFFF | 000B | 0110 | 0000 | 0000 | 0000 | 0001 | 0000 |
| 0000327500 | 0000 | 0000 | 0000 | 0000 | 0000 | 0000 | 0930 | 0000 |
| 0000327520 | 0001 | 0000 | FFFF | 000B | 0110 | 0000 | 0000 | 0000 |
| 0000327540 | 0001 | 0000 | 0000 | 0000 | 0000 | 0000 | 652E | 736F |

THU MAR 14 17:37:32 1991 GSPMON.4 PAGE 118, LINE 6904

| | | | | | | | | |
|---|---|---|---|---|---|---|---|---|
| 0000327560 | 0000 | 0000 | 0000 | 0000 | FFFE | 000A | 0166 | 06AA |
| 0000327600 | 0000 | 0000 | 0001 | 0000 | 0000 | 0000 | 0000 | 0000 |
| 0000327620 | 0000 | 0000 | 093A | 0000 | 0000 | 0000 | FFFE | 000A |
| 0000327640 | 010F | 0000 | 0000 | 0000 | 0001 | 0000 | 0000 | 06BA |
| 0000327660 | 0000 | 0000 | 0000 | 0000 | 0945 | 0000 | 0000 | 0000 |
| 0000327700 | FFFF | 000B | 0110 | 0000 | 0000 | 0000 | 0001 | 0000 |
| 0000327720 | 0000 | 0000 | 0000 | 0000 | 0000 | 0000 | 094F | 0000 |
| 0000327740 | 0001 | 0000 | FFFF | 000B | 0110 | 0000 | 0000 | 0000 |
| 0000327760 | 0001 | 0000 | 0000 | 0000 | 0000 | 0000 | 652E | 736F |
| 0000330000 | 0000 | 0000 | 0000 | 0000 | FFFE | 000A | 0166 | 06B2 |
| 0000330020 | 0000 | 0000 | 0001 | 0000 | 0000 | 0000 | 0000 | 0000 |
| 0000330040 | 0000 | 0000 | 095A | 0000 | 0000 | 0000 | FFFE | 000A |
| 0000330060 | 010F | 0000 | 0000 | 0000 | 0001 | 0000 | 0000 | 06C2 |
| 0000330100 | 0000 | 0000 | 0000 | 0000 | 0965 | 0000 | 0000 | 0000 |
| 0000330120 | FFFF | 000B | 0110 | 0000 | 0000 | 0000 | 0001 | 0000 |
| 0000330140 | 0000 | 0000 | 0000 | 0000 | 0000 | 0000 | 0970 | 0000 |
| 0000330160 | 0001 | 0000 | FFFF | 000B | 0110 | 0000 | 0000 | 0000 |
| 0000330200 | 0001 | 0000 | 0000 | 0000 | 0000 | 0000 | 652E | 736F |
| 0000330220 | 0000 | 0000 | 0000 | 0000 | FFFE | 000A | 0166 | 06BA |
| 0000330240 | 0000 | 0000 | 0001 | 0000 | 0000 | 0000 | 0000 | 0000 |
| 0000330260 | 6D5F | 5F62 | 7566 | 636E | 0000 | 0000 | FFFE | 000A |
| 0000330300 | 010F | 0000 | 0000 | 0000 | 0002 | 0000 | 0000 | 06CE |
| 0000330320 | 0000 | 0000 | 0000 | 0000 | 097A | 0000 | 0000 | 0000 |
| 0000330340 | FFFF | 000B | 0110 | 0000 | 0000 | 0000 | 0002 | 0000 |
| 0000330360 | 0000 | 0000 | 0000 | 0000 | 4D5F | 5F42 | 5845 | 5257 |
| 0000330400 | 0001 | 0000 | FFFF | 000B | 0110 | 0000 | 0000 | 0000 |
| 0000330420 | 0002 | 0000 | 0000 | 0000 | 0000 | 0000 | 4D5F | 5F42 |
| 0000330440 | 4552 | 4441 | 0002 | 0000 | FFFF | 000B | 0110 | 0000 |
| 0000330460 | 0000 | 0000 | 0002 | 0000 | 0000 | 0000 | 0000 | 0000 |
| 0000330500 | 4D5F | 5F42 | 504F | 4E45 | 0003 | 0000 | FFFF | 000B |
| 0000330520 | 0110 | 0000 | 0000 | 0000 | 0002 | 0000 | 0000 | 0000 |
| 0000330540 | 0000 | 0000 | 652E | 736F | 0000 | 0000 | 0000 | 0000 |
| 0000330560 | FFFE | 000A | 0166 | 06C2 | 0000 | 0000 | 0002 | 0000 |
| 0000330600 | 0000 | 0000 | 0000 | 0000 | 0000 | 0000 | 0984 | 0000 |
| 0000330620 | 0000 | 0000 | FFFE | 000A | 010F | 0000 | 0000 | 0000 |
| 0000330640 | 0002 | 0000 | 0000 | 06D8 | 0000 | 0000 | 0000 | 0000 |
| 0000330660 | 098E | 000C | 0000 | 0000 | FFFF | 000B | 0110 | 0000 |
| 0000330700 | 0000 | 0000 | 0002 | 0000 | 0000 | 0000 | 0000 | 0000 |
| 0000330720 | 0000 | 0000 | 099A | 0000 | 0001 | 0000 | FFFF | 000B |
| 0000330740 | 0110 | 0000 | 0000 | 0000 | 0002 | 0000 | 0000 | 0000 |
| 0000330760 | 0000 | 0000 | 4D5F | 3442 | 525F | 0044 | 0003 | 0000 |
| 0000331000 | FFFF | 000B | 0110 | 0000 | 0000 | 0000 | 0002 | 0000 |
| 0000331020 | 0000 | 0000 | 0000 | 0000 | 652E | 736F | 0000 | 0000 |
| 0000331040 | 0000 | 0000 | FFFE | 000A | 0166 | 06CE | 0000 | 0000 |
| 0000331060 | 0002 | 0000 | 0000 | 0000 | 0000 | 0000 | 0000 | 0000 |
| 0000331100 | 09A5 | 0000 | 0000 | 0000 | FFFE | 000A | 010F | 0000 |
| 0000331120 | 0000 | 0000 | 0002 | 0000 | 0000 | 06E0 | 0000 | 0000 |
| 0000331140 | 4D5F | 3542 | 575F | 0052 | 0000 | 0000 | FFFF | 000B |
| 0000331160 | 0110 | 0000 | 0000 | 0000 | 0002 | 0000 | 0000 | 0000 |
| 0000331200 | 0000 | 0000 | 4D5F | 3542 | 525F | 0044 | 0003 | 0000 |
| 0000331220 | FFFF | 000B | 0110 | 0000 | 0000 | 0000 | 0002 | 0000 |
| 0000331240 | 0000 | 0000 | 0000 | 0000 | 652E | 736F | 0000 | 0000 |
| 0000331260 | 0000 | 0000 | FFFE | 000A | 0166 | 06D8 | 0000 | 0000 |
| 0000331300 | 0002 | 0000 | 0000 | 0000 | 0000 | 0000 | 0000 | 0000 |
| 0000331320 | 09AF | 0000 | 0000 | 0000 | FFFE | 000A | 010F | 0000 |
| 0000331340 | 0000 | 0000 | 0001 | 0000 | 0000 | 06E8 | 0000 | 0000 |
| 0000331360 | 0000 | 0000 | 09BB | 0000 | 0000 | 0000 | FFFF | 000B |
| 0000331400 | 0110 | 0000 | 0000 | 0000 | 0001 | 0000 | 0000 | 0000 |
| 0000331420 | 0000 | 0000 | 0000 | 0000 | 09C6 | 0000 | 0001 | 0000 |

THU MAR 14 17:37:32 1991 GSPMON.4 PAGE 119, LINE 6963

| | | | | | | | | |
|---|---|---|---|---|---|---|---|---|
| 0000331440 | FFFF | 000B | 0110 | 0000 | 0000 | 0000 | 0001 | 0000 |
| 0000331460 | 0000 | 0000 | 0000 | 0000 | 652E | 736F | 0000 | 0000 |
| 0000331500 | 0000 | 0000 | FFFE | 000A | 0166 | 06E0 | 0000 | 0000 |
| 0000331520 | 0001 | 0000 | 0000 | 0000 | 0000 | 0000 | 0000 | 0000 |
| 0000331540 | 09D0 | 0000 | 0000 | 0000 | FFFE | 000A | 010F | 0000 |
| 0000331560 | 0000 | 0000 | 0001 | 0000 | 0000 | 06F0 | 0000 | 0000 |
| 0000331600 | 0000 | 0000 | 09DD | 0000 | 0000 | 0000 | FFFF | 000B |
| 0000331620 | 0110 | 0000 | 0000 | 0000 | 0001 | 0000 | 0000 | 0000 |
| 0000331640 | 0000 | 0000 | 0000 | 0000 | 09E9 | 0000 | 0001 | 0000 |
| 0000331660 | FFFF | 000B | 0110 | 0000 | 0000 | 0000 | 0001 | 0000 |
| 0000331700 | 0000 | 0000 | 0000 | 0000 | 652E | 736F | 0000 | 0000 |
| 0000331720 | 0000 | 0000 | FFFE | 000A | 0166 | 06E8 | 0000 | 0000 |
| 0000331740 | 0001 | 0000 | 0000 | 0000 | 0000 | 0000 | 0000 | 0000 |
| 0000331760 | 09F6 | 0000 | 0000 | 0000 | FFFE | 000A | 010F | 0000 |
| 0000332000 | 0000 | 0000 | 0003 | 0000 | 0000 | 0700 | 0000 | 0000 |
| 0000332020 | 585F | 424D | 0030 | 0000 | 0000 | 0000 | FFFF | 000B |
| 0000332040 | 0110 | 0000 | 0000 | 0000 | 0003 | 0000 | 0000 | 0000 |
| 0000332060 | 0000 | 0000 | 585F | 424D | 0031 | 0000 | 0001 | 0000 |
| 0000332100 | FFFF | 000B | 0110 | 0000 | 0000 | 0000 | 0003 | 0000 |
| 0000332120 | 0000 | 0000 | 0000 | 0000 | 585F | 424D | 0032 | 0000 |
| 0000332140 | 0002 | 0000 | FFFF | 000B | 0110 | 0000 | 0000 | 0000 |
| 0000332160 | 0003 | 0000 | 0000 | 0000 | 0000 | 0000 | 585F | 424D |
| 0000332200 | 0033 | 0000 | 0003 | 0000 | FFFF | 000B | 0110 | 0000 |
| 0000332220 | 0000 | 0000 | 0003 | 0000 | 0000 | 0000 | 0000 | 0000 |
| 0000332240 | 585F | 424D | 0034 | 0000 | 0004 | 0000 | FFFF | 000B |
| 0000332260 | 0110 | 0000 | 0000 | 0000 | 0003 | 0000 | 0000 | 0000 |
| 0000332300 | 0000 | 0000 | 585F | 424D | 0035 | 0000 | 0005 | 0000 |
| 0000332320 | FFFF | 000B | 0110 | 0000 | 0000 | 0000 | 0003 | 0000 |
| 0000332340 | 0000 | 0000 | 0000 | 0000 | 652E | 736F | 0000 | 0000 |
| 0000332360 | 0000 | 0000 | FFFE | 000A | 0166 | 06F0 | 0000 | 0000 |
| 0000332400 | 0003 | 0000 | 0000 | 0000 | 0000 | 0000 | 635F | 6E68 |
| 0000332420 | 006C | 0000 | 0000 | 0000 | FFFE | 000A | 010F | 0000 |
| 0000332440 | 0000 | 0000 | 0002 | 0000 | 0000 | 070C | 0000 | 0000 |
| 0000332460 | 525F | 4445 | 435F | 0048 | 0000 | 0000 | FFFF | 000B |
| 0000332500 | 0110 | 0000 | 0000 | 0000 | 0002 | 0000 | 0000 | 0000 |
| 0000332520 | 0000 | 0000 | 0000 | 0000 | 0A00 | 0000 | 0001 | 0000 |
| 0000332540 | FFFF | 000B | 0110 | 0000 | 0000 | 0000 | 0002 | 0000 |
| 0000332560 | 0000 | 0000 | 0000 | 0000 | 425F | 554C | 5F45 | 4843 |
| 0000332600 | 0002 | 0000 | FFFF | 000B | 0110 | 0000 | 0000 | 0000 |
| 0000332620 | 0002 | 0000 | 0000 | 0000 | 0000 | 0000 | 0000 | 0000 |
| 0000332640 | 0A0A | 0000 | 0003 | 0000 | FFFF | 000B | 0110 | 0000 |
| 0000332660 | 0000 | 0000 | 0002 | 0000 | 0000 | 0000 | 0000 | 0000 |
| 0000332700 | 652E | 736F | 0000 | 0000 | 0000 | 0000 | FFFE | 000A |
| 0000332720 | 0166 | 0700 | 0000 | 0000 | 0002 | 0000 | 0000 | 0000 |
| 0000332740 | 0000 | 0000 | 0000 | 0000 | 0A16 | 0000 | 0000 | 0000 |
| 0000332760 | FFFE | 000A | 010F | 0000 | 0000 | 0000 | 0001 | 0000 |
| 0000333000 | 0000 | 0714 | 0000 | 0000 | 0000 | 0000 | 0A20 | 0000 |
| 0000333020 | 0000 | 0000 | FFFF | 000B | 0110 | 0000 | 0000 | 0000 |
| 0000333040 | 0001 | 0000 | 0000 | 0000 | 0000 | 0000 | 435F | 4359 |
| 0000333060 | 494C | 0043 | 0301 | 0000 | FFFF | 000B | 0110 | 0000 |
| 0000333100 | 0000 | 0000 | 0001 | 0000 | 0000 | 0000 | 0000 | 0000 |
| 0000333120 | 652E | 736F | 0000 | 0000 | 0000 | 0000 | FFFE | 000A |
| 0000333140 | 0166 | 070C | 0000 | 0000 | 0001 | 0000 | 0000 | 0000 |
| 0000333160 | 0000 | 0000 | 662E | 6C69 | 0065 | 0000 | 0716 | 0000 |
| 0000333200 | FFFE | 0000 | 0167 | 7367 | 6370 | 6E6F | 632E | 0000 |
| 0000333220 | 0000 | 0000 | 0000 | 0000 | 662E | 6C69 | 0065 | 0000 |
| 0000333240 | 0718 | 0000 | FFFE | 0000 | 0167 | 7473 | 6D64 | 682E |
| 0000333260 | 0000 | 0000 | 0000 | 0000 | 0000 | 0000 | 662E | 6C69 |
| 0000333300 | 0065 | 0000 | 072E | 0000 | FFFE | 0000 | 0167 | 7367 |

THU MAR 14 17:37:32 1991 GSPMON.4 PAGE 120, LINE 7022

| | | | | | | | | |
|---|---|---|---|---|---|---|---|---|
| 0000333320 | 6370 | 6E6F | 632E | 0000 | 0000 | 0000 | 0000 | 0000 |
| 0000333340 | 0000 | 0000 | 0A2A | 0000 | 7C50 | FFC0 | 0001 | 0020 |
| 0000333360 | 0102 | 0000 | 0000 | 8590 | 0000 | DCE2 | 0000 | 0722 |
| 0000333400 | 0000 | 0003 | 622E | 0066 | 0000 | 0000 | 7C50 | FFC0 |
| 0000333420 | 0001 | 0000 | 0165 | 0000 | 0000 | 0033 | 0000 | 0000 |
| 0000333440 | 0000 | 0160 | 0000 | 0000 | 665F | 6468 | 7369 | 0070 |
| 0000333460 | FFE0 | FFFF | FFFF | 000D | 0109 | 0000 | 0000 | 0000 |
| 0000333500 | 0010 | 0000 | 0000 | 0000 | 0000 | 0000 | 652E | 0066 |
| 0000333520 | 0000 | 0000 | 01E0 | FFC1 | 0001 | 0000 | 0165 | 0000 |
| 0000333540 | 0000 | 0736 | 0000 | 0000 | 0000 | 0000 | 0000 | 0000 |
| 0000333560 | 742E | 7865 | 0074 | 0000 | 7C50 | FFC0 | 0001 | 0000 |
| 0000333600 | 0103 | 8590 | 0000 | 022E | 022F | 0000 | 0000 | 0000 |
| 0000333620 | 0000 | 0000 | 642E | 7461 | 0061 | 0000 | 0000 | 0000 |
| 0000333640 | 0004 | 0000 | 0103 | 0000 | 0000 | 0000 | 0000 | 0000 |
| 0000333660 | 0000 | 0000 | 0000 | 0000 | 622E | 7373 | 0000 | 0000 |
| 0000333700 | F7F0 | FFC6 | 0003 | 0000 | 0103 | 1000 | 0000 | 0000 |
| 0000333720 | 0000 | 0000 | 0000 | 0000 | 0000 | 0000 | 742E | 7865 |
| 0000333740 | 0074 | 0000 | 01E0 | FFC1 | 0001 | 0000 | 0103 | 0320 |
| 0000333760 | 0000 | 0007 | 0000 | 0000 | 0000 | 0000 | 0000 | 0000 |
| 0000334000 | 642E | 7461 | 0061 | 0000 | 0000 | 0000 | 0004 | 0000 |
| 0000334020 | 0103 | 0000 | 0000 | 0000 | 0000 | 0000 | 0000 | 0000 |
| 0000334040 | 0000 | 0000 | 622E | 7373 | 0000 | 0000 | 07F0 | FFC7 |
| 0000334060 | 0003 | 0000 | 0103 | 0000 | 0000 | 0000 | 0000 | 0000 |
| 0000334100 | 0000 | 0000 | 0000 | 0000 | 662E | 6C69 | 0065 | 0000 |
| 0000334120 | 0730 | 0000 | FFFE | 0000 | 0167 | 7067 | 6D5F | 756F |
| 0000334140 | 632E | 0000 | 0000 | 0000 | 0000 | 0000 | 662E | 6C69 |
| 0000334160 | 0065 | 0000 | 0732 | 0000 | FFFE | 0000 | 0167 | 7473 |
| 0000334200 | 6D64 | 682E | 0000 | 0000 | 0000 | 0000 | 0000 | 0000 |
| 0000334220 | 662E | 6C69 | 0065 | 0000 | 0734 | 0000 | FFFE | 0000 |
| 0000334240 | 0167 | 7067 | 6D5F | 756F | 632E | 0000 | 0000 | 0000 |
| 0000334260 | 0000 | 0000 | 662E | 6C69 | 0065 | 0000 | 073E | 0000 |
| 0000334300 | FFFE | 0000 | 0167 | 7473 | 6C64 | 6269 | 682E | 0000 |
| 0000334320 | 0000 | 0000 | 0000 | 0000 | 302E | 6166 | 656B | 0000 |
| 0000334340 | 0000 | 0000 | FFFE | 0008 | 010A | 0000 | 0000 | 0000 |
| 0000334360 | 0040 | 0000 | 0000 | 073E | 0000 | 0000 | 715F | 6F75 |
| 0000334400 | 0074 | 0000 | 0000 | 0000 | FFFF | 0004 | 0108 | 0000 |
| 0000334420 | 0000 | 0000 | 0020 | 0000 | 0000 | 0000 | 0000 | 0000 |
| 0000334440 | 725F | 6D65 | 0000 | 0000 | 0020 | 0000 | FFFF | 0004 |
| 0000334460 | 0108 | 0000 | 0000 | 0000 | 0020 | 0000 | 0000 | 0000 |
| 0000334500 | 0000 | 0000 | 652E | 736F | 0000 | 0000 | 0000 | 0000 |
| 0000334520 | FFFE | 0008 | 0166 | 0736 | 0000 | 0000 | 0040 | 0000 |
| 0000334540 | 0000 | 0000 | 0000 | 0000 | 662E | 6C69 | 0065 | 0000 |
| 0000334560 | 0740 | 0000 | FFFE | 0000 | 0167 | 7067 | 6D5F | 756F |
| 0000334600 | 632E | 0000 | 0000 | 0000 | 0000 | 0000 | 662E | 6C69 |
| 0000334620 | 0065 | 0000 | 0750 | 0000 | FFFE | 0000 | 0167 | 7974 |
| 0000334640 | 6570 | 6564 | 2E66 | 0068 | 0000 | 0000 | 0000 | 0000 |
| 0000334660 | 312E | 6166 | 656B | 0000 | 0000 | 0000 | FFFE | 000A |
| 0000334700 | 010F | 0000 | 0000 | 0000 | 0001 | 0000 | 0000 | 074A |
| 0000334720 | 0000 | 0000 | 465F | 4C41 | 4553 | 0000 | 0000 | 0000 |
| 0000334740 | FFFF | 000B | 0110 | 0000 | 0000 | 0000 | 0001 | 000C |
| 0000334760 | 0000 | 0000 | 0000 | 0000 | 545F | 5552 | 0045 | 0000 |
| 0000335000 | 0001 | 0000 | FFFF | 000B | 0110 | 0000 | 0000 | 0000 |
| 0000335020 | 0001 | 0000 | 0000 | 0000 | 0000 | 0000 | 652E | 736F |
| 0000335040 | 0000 | 0000 | 0000 | 0000 | FFFE | 000A | 0166 | 0742 |
| 0000335060 | 0000 | 0000 | 0001 | 0000 | 0000 | 0000 | 0000 | 0000 |
| 0000335100 | 322E | 6166 | 656B | 0000 | 0000 | 0000 | FFFE | 0008 |
| 0000335120 | 010A | 0000 | 0000 | 0000 | 0004 | 0000 | 0000 | 0750 |
| 0000335140 | 0000 | 0000 | 705F | 7869 | 6C65 | 0000 | 0000 | 0000 |
| 0000335160 | FFFF | 000E | 0112 | 0000 | 0000 | 0000 | 0004 | 0000 |

THU MAR 14 17:37:32 1991 GSPMON.4 PAGE 121, LINE 7081

| | | | | | | | | |
|---|---|---|---|---|---|---|---|---|
| 0000335200 | 0000 | 0000 | 0000 | 0000 | 652E | 736F | 0000 | 0000 |
| 0000335220 | 0000 | 0000 | FFFE | 0008 | 0166 | 074A | 0000 | 0000 |
| 0000335240 | 0004 | 0000 | 0000 | 0000 | 0000 | 0000 | 662E | 6C69 |
| 0000335260 | 0065 | 0000 | 0752 | 0000 | FFFE | 0000 | 0167 | 7067 |
| 0000335300 | 6D5F | 756F | 632E | 0000 | 0000 | 0000 | 0000 | 0000 |
| 0000335320 | 662E | 6C69 | 0065 | 0000 | 0754 | 0000 | FFFE | 0000 |
| 0000335340 | 0167 | 7367 | 7370 | 7379 | 682E | 0000 | 0000 | 0000 |
| 0000335360 | 0000 | 0000 | 662E | 6C69 | 0065 | 0000 | 0756 | 0000 |
| 0000335400 | FFFE | 0000 | 0167 | 7367 | 7370 | 7379 | 692E | 636E |
| 0000335420 | 0000 | 0000 | 0000 | 0000 | 662E | 6C69 | 0065 | 0000 |
| 0000335440 | 0758 | 0000 | FFFE | 0000 | 0167 | 7367 | 7370 | 7379 |
| 0000335460 | 682E | 0000 | 0000 | 0000 | 0000 | 0000 | 662E | 6C69 |
| 0000335500 | 0065 | 0000 | 075A | 0000 | FFFE | 0000 | 0167 | 7067 |
| 0000335520 | 6D5F | 756F | 632E | 0000 | 0000 | 0000 | 0000 | 0000 |
| 0000335540 | 662E | 6C69 | 0065 | 0000 | 0836 | 0000 | FFFE | 0000 |
| 0000335560 | 0167 | 7367 | 6370 | 6766 | 682E | 0000 | 0000 | 0000 |
| 0000335600 | 0000 | 0000 | 0000 | 0000 | 0A42 | 0000 | 0000 | 0000 |
| 0000335620 | FFFE | 000A | 010F | 0000 | 0000 | 0000 | 0002 | 0000 |
| 0000335640 | 0000 | 0766 | 0000 | 0000 | 4F5F | 454E | 315F | 0036 |
| 0000335660 | 0000 | 0000 | FFFF | 000B | 0110 | 0000 | 0000 | 0000 |
| 0000335700 | 0002 | 0000 | 0000 | 0000 | 0000 | 0000 | 545F | 4F57 |
| 0000335720 | 385F | 0000 | 0001 | 0000 | FFFF | 000B | 0110 | 0000 |
| 0000335740 | 0000 | 0000 | 0002 | 0000 | 0000 | 0000 | 0000 | 0000 |
| 0000335760 | 465F | 554F | 5F52 | 0034 | 0002 | 0000 | FFFF | 000B |
| 0000336000 | 0110 | 0000 | 0000 | 0000 | 0002 | 0000 | 000D | 0000 |
| 0000336020 | 0000 | 0000 | 652E | 736F | 0000 | 0000 | 0000 | 0000 |
| 0000336040 | FFFE | 000A | 0166 | 075C | 0000 | 0000 | 0002 | 0000 |
| 0000336060 | 0000 | 0000 | 0000 | 0000 | 635F | 726C | 655F | 7272 |
| 0000336100 | 0000 | 0000 | FFFE | 000A | 010F | 0000 | 0000 | 0000 |
| 0000336120 | 0001 | 0000 | 0000 | 076E | 0000 | 0000 | 4E5F | 5F4F |
| 0000336140 | 4C43 | 0052 | 0000 | 0000 | FFFF | 000B | 0110 | 0000 |
| 0000336160 | 0000 | 0000 | 0001 | 0000 | 0000 | 0000 | 0000 | 0000 |
| 0000336200 | 435F | 524C | 0000 | 0000 | 0001 | 0000 | FFFF | 000B |
| 0000336220 | 0110 | 0000 | 0000 | 0000 | 0001 | 0000 | 0000 | 0000 |
| 0000336240 | 0000 | 0000 | 652E | 736F | 0000 | 0000 | 0000 | 0000 |
| 0000336260 | FFFE | 000A | 0166 | 0766 | 0000 | 0000 | 0001 | 0000 |
| 0000336300 | 0000 | 0000 | 0000 | 0000 | 0000 | 0000 | 0A4C | 0000 |
| 0000336320 | 0000 | 0000 | FFFE | 000A | 010F | 0000 | 0000 | 0000 |
| 0000336340 | 0003 | 0000 | 0000 | 077C | 0000 | 0000 | 505F | 414C |
| 0000336360 | 454E | 0030 | 0000 | 0000 | FFFF | 000B | 0110 | 0000 |
| 0000336400 | 0000 | 0000 | 0003 | 0000 | 0000 | 0000 | 0000 | 0000 |
| 0000336420 | 505F | 414C | 454E | 0032 | 0001 | 0000 | FFFF | 000B |
| 0000336440 | 0110 | 0000 | 0000 | 0000 | 0003 | 0000 | 0000 | 0000 |
| 0000336460 | 0000 | 0000 | 505F | 414C | 454E | 0031 | 0002 | 0000 |
| 0000336500 | FFFF | 000B | 0110 | 0000 | 0000 | 0000 | 0003 | 0000 |
| 0000336520 | 0000 | 0000 | 0000 | 0000 | 505F | 414C | 454E | 0033 |
| 0000336540 | 0003 | 0000 | FFFF | 000B | 0110 | 0000 | 0000 | 0000 |
| 0000336560 | 0003 | 0000 | 0000 | 0000 | 0000 | 0000 | 4E5F | 504F |
| 0000336600 | 414C | 454E | 0004 | 0000 | FFFF | 000B | 0110 | 0000 |
| 0000336620 | 0000 | 0000 | 0003 | 0000 | 0000 | 0000 | 0000 | 0000 |
| 0000336640 | 652E | 736F | 0000 | 0000 | 0000 | 0000 | FFFE | 000A |
| 0000336660 | 0166 | 076E | 0000 | 0000 | 0003 | 0000 | 0000 | 0000 |
| 0000336700 | 0000 | 0000 | 0000 | 0000 | 0A57 | 0000 | 0000 | 0000 |
| 0000336720 | FFFE | 000A | 010F | 0000 | 0000 | 0000 | 0001 | 0000 |
| 0000336740 | 0000 | 0784 | 0000 | 0000 | 4E5F | 5F4F | 4944 | 5053 |
| 0000336760 | 0000 | 0000 | FFFF | 000B | 0110 | 0000 | 0000 | 0000 |
| 0000337000 | 0001 | 0000 | 0000 | 0000 | 0000 | 0000 | 445F | 5349 |
| 0000337020 | 0050 | 0000 | 0001 | 0000 | FFFF | 000B | 0110 | 0000 |
| 0000337040 | 0000 | 0000 | 0001 | 0000 | 0000 | 0000 | 0000 | 0000 |

THU MAR 14 17:37:32 1991 GSPMON.4 PAGE 122, LINE 7140

| | | | | | | | | |
|---|---|---|---|---|---|---|---|---|
| 0000337060 | 652E | 736F | 0000 | 0000 | 0000 | 0000 | FFFE | 000A |
| 0000337100 | 0166 | 077C | 0000 | 0000 | 0001 | 0000 | 0000 | 0000 |
| 0000337120 | 0000 | 0000 | 665F | 5F62 | 6E65 | 0000 | 0000 | 0000 |
| 0000337140 | FFFE | 000A | 010F | 0000 | 0000 | 0000 | 0001 | 0000 |
| 0000337160 | 0000 | 078C | 0000 | 0000 | 0000 | 0000 | 0A61 | 0000 |
| 0000337200 | 0000 | 0000 | FFFF | 000B | 0110 | 0000 | 0000 | 0000 |
| 0000337220 | 0001 | 0000 | 0000 | 0000 | 0000 | 0000 | 0000 | 0000 |
| 0000337240 | 0A6C | 0000 | 0001 | 0000 | FFFF | 000B | 0110 | 0000 |
| 0000337260 | 0000 | 0000 | 0001 | 0000 | 0000 | 0000 | 0000 | 0000 |
| 0000337300 | 652E | 736F | 0000 | 0000 | 0000 | 0000 | FFFE | 000A |
| 0000337320 | 0166 | 0784 | 0000 | 0000 | 0001 | 0000 | 0000 | 0000 |
| 0000337340 | 0000 | 0000 | 7A5F | 7265 | 5F6F | 0062 | 0000 | 0000 |
| 0000337360 | FFFE | 000A | 010F | 0000 | 0000 | 0000 | 0001 | 0000 |
| 0000337400 | 0000 | 0794 | 0000 | 0000 | 0000 | 0000 | 0A76 | 0000 |
| 0000337420 | 0000 | 0000 | FFFF | 000B | 0110 | 0000 | 0000 | 0000 |
| 0000337440 | 0001 | 0000 | 0000 | 0000 | 0000 | 0000 | 0000 | 0000 |
| 0000337460 | 0A82 | 0000 | 0001 | 0000 | FFFF | 000B | 0110 | 0000 |
| 0000337500 | 0000 | 0000 | 0001 | 0000 | 0000 | 0000 | 0000 | 0000 |
| 0000337520 | 652E | 736F | 0000 | 0000 | 0000 | 0000 | FFFE | 000A |
| 0000337540 | 0166 | 078C | 0000 | 0000 | 0001 | 0000 | 0000 | 0000 |
| 0000337560 | 0000 | 0000 | 7A5F | 7265 | 5F6F | 0061 | 0000 | 0000 |
| 0000337600 | FFFE | 000A | 010F | 0000 | 0000 | 0000 | 0001 | 0000 |
| 0000337620 | 0000 | 079C | 0000 | 0000 | 0000 | 0000 | 0A8C | 0000 |
| 0000337640 | 0000 | 0000 | FFFF | 000B | 0110 | 0000 | 0000 | 0000 |
| 0000337660 | 0001 | 0000 | 0000 | 0000 | 0000 | 0000 | 0000 | 0000 |
| 0000337700 | 0A98 | 0000 | 0001 | 0000 | FFFF | 000B | 0110 | 0000 |
| 0000337720 | 0000 | 0000 | 0001 | 0000 | 0000 | 0000 | 0000 | 0000 |
| 0000337740 | 652E | 736F | 0000 | 0000 | 0000 | 0000 | FFFE | 000A |
| 0000337760 | 0166 | 0794 | 0000 | 0000 | 0001 | 0000 | 0000 | 0000 |
| 0000340000 | 0000 | 0000 | 0000 | 0000 | 0AA2 | 0000 | 0000 | 0000 |
| 0000340020 | FFFE | 000A | 010F | 0000 | 0000 | 0000 | 0002 | 0000 |
| 0000340040 | 0000 | 07A8 | 0000 | 0000 | 0000 | 0000 | 0AAC | 0000 |
| 0000340060 | 0000 | 0000 | FFFF | 000B | 0110 | 0000 | 0000 | 0000 |
| 0000340100 | 0002 | 0000 | 0000 | 0000 | 0000 | 0000 | 0000 | 0000 |
| 0000340120 | 0AB6 | 0000 | 0001 | 0000 | FFFF | 000B | 0110 | 0000 |
| 0000340140 | 0000 | 0000 | 0002 | 0000 | 0000 | 0000 | 0000 | 0000 |
| 0000340160 | 0000 | 0000 | 0AC0 | 0000 | 0002 | 0000 | FFFF | 000B |
| 0000340200 | 0110 | 0000 | 0000 | 0000 | 0002 | 0000 | 0000 | 0000 |
| 0000340220 | 0000 | 0000 | 0000 | 0000 | 0ACA | 0000 | 0003 | 0000 |
| 0000340240 | FFFF | 000B | 0110 | 0000 | 0000 | 0000 | 0002 | 0000 |
| 0000340260 | 0000 | 0000 | 0000 | 0000 | 652E | 736F | 0000 | 0000 |
| 0000340300 | 0000 | 0000 | FFFE | 000A | 0166 | 079C | 0000 | 0000 |
| 0000340320 | 0002 | 0000 | 0000 | 0000 | 0000 | 0000 | 615F | 756C |
| 0000340340 | 665F | 636E | 0000 | 0000 | FFFE | 000A | 010F | 0000 |
| 0000340360 | 0000 | 0000 | 0003 | 0000 | 0000 | 07BC | 0000 | 0000 |
| 0000340400 | 435F | 454C | 5241 | 0000 | 0000 | 0000 | FFFF | 000B |
| 0000340420 | 0110 | 0000 | 0000 | 0000 | 0003 | 0000 | 0000 | 0000 |
| 0000340440 | 0000 | 0000 | 425F | 494D | 554E | 4153 | 0001 | 0000 |
| 0000340460 | FFFF | 000B | 0110 | 0000 | 0000 | 0000 | 0003 | 0000 |
| 0000340500 | 0000 | 0000 | 0000 | 0000 | 415F | 494D | 554E | 4253 |
| 0000340520 | 0002 | 0000 | FFFF | 000B | 0110 | 0000 | 0000 | 0000 |
| 0000340540 | 0003 | 0000 | 0000 | 0000 | 0000 | 0000 | 505F | 554C |
| 0000340560 | 0053 | 0000 | 0003 | 0000 | FFFF | 000B | 0110 | 0000 |
| 0000340600 | 0000 | 0000 | 0003 | 0000 | 0000 | 0000 | 0000 | 0000 |
| 0000340620 | 585F | 524F | 0000 | 0000 | 0004 | 0000 | FFFF | 000B |
| 0000340640 | 0110 | 0000 | 0000 | 0000 | 0003 | 0000 | 0000 | 0000 |
| 0000340660 | 0000 | 0000 | 4F5F | 0052 | 0000 | 0000 | 0005 | 0000 |
| 0000340700 | FFFF | 000B | 0110 | 0000 | 0000 | 0000 | 0003 | 0000 |
| 0000340720 | 0000 | 0000 | 0000 | 0000 | 415F | 444E | 0000 | 0000 |

THU MAR 14 17:37:32 1991 GSPMON.4 PAGE 123, LINE 7199

| | | | | | | | | |
|---|---|---|---|---|---|---|---|---|
| 0000340740 | 0006 | 0000 | FFFF | 000B | 0110 | 0000 | 0000 | 0000 |
| 0000340760 | 0003 | 0000 | 0000 | 0000 | 0000 | 0000 | 505F | 4552 |
| 0000341000 | 4553 | 0054 | 0007 | 0000 | FFFF | 000B | 0110 | 0000 |
| 0000341020 | 0000 | 0000 | 0003 | 0000 | 0000 | 0000 | 0000 | 0000 |
| 0000341040 | 652E | 736F | 0000 | 0000 | 0000 | 0000 | FFFE | 000A |
| 0000341060 | 0166 | 07A8 | 0000 | 0000 | 0003 | 0000 | 0000 | 0000 |
| 0000341100 | 0000 | 0000 | 615F | 756C | 635F | 7972 | 0000 | 0000 |
| 0000341120 | FFFE | 000A | 010F | 0000 | 0000 | 0000 | 0001 | 0000 |
| 0000341140 | 0000 | 07C4 | 0000 | 0000 | 5A5F | 5245 | 004F | 0000 |
| 0000341160 | 0000 | 0000 | FFFF | 000B | 0110 | 0000 | 0000 | 0000 |
| 0000341200 | 0001 | 0000 | 0000 | 0000 | 0000 | 0000 | 4F5F | 454E |
| 0000341220 | 0000 | 0000 | 0001 | 0000 | FFFF | 000B | 0110 | 0000 |
| 0000341240 | 0000 | 0000 | 0001 | 0000 | 0000 | 0000 | 0000 | 0000 |
| 0000341260 | 652E | 736F | 0000 | 0000 | 0000 | 0000 | FFFE | 000A |
| 0000341300 | 0166 | 07BC | 0000 | 0000 | 0001 | 0000 | 0000 | 0000 |
| 0000341320 | 0000 | 0000 | 0000 | 0000 | 0AD4 | 0000 | 0000 | 0000 |
| 0000341340 | FFFE | 000A | 010F | 0000 | 0000 | 0000 | 0001 | 0000 |
| 0000341360 | 0000 | 07CC | 0000 | 0000 | 0000 | 0000 | 0AE0 | 0000 |
| 0000341400 | 0000 | 0000 | FFFF | 000B | 0110 | 0000 | 0000 | 0000 |
| 0000341420 | 0001 | 0000 | 0000 | 0000 | 0000 | 0000 | 0000 | 0000 |
| 0000341440 | 0AED | 0000 | 0001 | 0000 | FFFF | 000B | 0110 | 0000 |
| 0000341460 | 0000 | 0000 | 0001 | 0000 | 0000 | 0000 | 0000 | 0000 |
| 0000341500 | 652E | 736F | 0000 | 0000 | 0000 | 0000 | FFFE | 000A |
| 0000341520 | 0166 | 07C4 | 0000 | 0000 | 0001 | 0000 | 0000 | 0000 |
| 0000341540 | 0000 | 0000 | 0000 | 0000 | 0AF9 | 0000 | 0000 | 0000 |
| 0000341560 | FFFE | 000A | 010F | 0000 | 0000 | 0000 | 0001 | 0000 |
| 0000341600 | 0000 | 07D4 | 0000 | 0000 | 4D5F | 5341 | 5F4B | 4E45 |
| 0000341620 | 0000 | 0000 | FFFF | 000B | 0110 | 0000 | 0000 | 0000 |
| 0000341640 | 0001 | 0000 | 0000 | 0000 | 0000 | 0000 | 0000 | 0000 |
| 0000341660 | 0B06 | 0000 | 0001 | 0000 | FFFF | 000B | 0110 | 0000 |
| 0000341700 | 0000 | 0000 | 0001 | 0000 | 0000 | 0000 | 0000 | 0000 |
| 0000341720 | 652E | 736F | 0000 | 0000 | 0000 | 0000 | FFFE | 000A |
| 0000341740 | 0166 | 07CC | 0000 | 0000 | 0001 | 0000 | 0000 | 0000 |
| 0000341760 | 0000 | 0000 | 0000 | 0000 | 0B10 | 0000 | 0000 | 0000 |
| 0000342000 | FFFE | 000A | 010F | 0000 | 0000 | 0000 | 0001 | 0000 |
| 0000342020 | 0000 | 07DC | 0000 | 0000 | 0000 | 0000 | 0B1B | 0000 |
| 0000342040 | 0000 | 0000 | FFFF | 000B | 0110 | 0000 | 0000 | 0000 |
| 0000342060 | 0001 | 0000 | 0000 | 0000 | 0000 | 0000 | 0000 | 0000 |
| 0000342100 | 0B25 | 0000 | 0001 | 0000 | FFFF | 000B | 0110 | 0000 |
| 0000342120 | 0000 | 0000 | 0001 | 0000 | 0000 | 0000 | 0000 | 0000 |
| 0000342140 | 652E | 736F | 0000 | 0000 | 0000 | 0000 | FFFE | 000A |
| 0000342160 | 0166 | 07D4 | 0000 | 0000 | 0001 | 0000 | 0000 | 0000 |
| 0000342200 | 0000 | 0000 | 0000 | 0000 | 0B30 | 0000 | 0000 | 0000 |
| 0000342220 | FFFE | 000A | 010F | 0000 | 0000 | 0000 | 0001 | 0000 |
| 0000342240 | 0000 | 07E4 | 0000 | 0000 | 0000 | 0000 | 0B3B | 0000 |
| 0000342260 | 0000 | 0000 | FFFF | 000B | 0110 | 0000 | 0000 | 0000 |
| 0000342300 | 0001 | 0000 | 0000 | 0000 | 0000 | 0000 | 0000 | 0000 |
| 0000342320 | 0B46 | 0000 | 0001 | 0000 | FFFF | 000B | 0110 | 0000 |
| 0000342340 | 0000 | 0000 | 0001 | 0000 | 0000 | 0000 | 0000 | 0000 |
| 0000342360 | 652E | 736F | 0000 | 0000 | 0000 | 0000 | FFFE | 000A |
| 0000342400 | 0166 | 07DC | 0000 | 0000 | 0001 | 0000 | 0000 | 0000 |
| 0000342420 | 0000 | 0000 | 6D5F | 5F62 | 7566 | 636E | 0000 | 0000 |
| 0000342440 | FFFE | 000A | 010F | 0000 | 0000 | 0000 | 0002 | 0000 |
| 0000342460 | 0000 | 07F0 | 0000 | 0000 | 0000 | 0000 | 0B50 | 0000 |
| 0000342500 | 0000 | 0000 | FFFF | 000B | 0110 | 0000 | 0000 | 0000 |
| 0000342520 | 0002 | 0000 | 0000 | 0000 | 0000 | 0000 | 4D5F | 5F42 |
| 0000342540 | 5845 | 5257 | 0001 | 0000 | FFFF | 000B | 0110 | 0000 |
| 0000342560 | 0000 | 0000 | 0002 | 0000 | 0000 | 0000 | 0000 | 0000 |
| 0000342600 | 4D5F | 5F42 | 4552 | 4441 | 0002 | 0000 | FFFF | 000B |

THU MAR 14 17:37:32 1991 GSPMON.4 PAGE 124, LINE 7258

| | | | | | | | | |
|---|---|---|---|---|---|---|---|---|
| 0000342620 | 0110 | 0000 | 0000 | 0000 | 0002 | 0000 | 0000 | 0000 |
| 0000342640 | 0000 | 0000 | 4D5F | 5F42 | 504F | 4E45 | 0003 | 0000 |
| 0000342660 | FFFF | 000B | 0110 | 0000 | 0000 | 0000 | 0002 | 0000 |
| 0000342700 | 0000 | 0000 | 0000 | 0000 | 652E | 736F | 0000 | 0000 |
| 0000342720 | 0000 | 0000 | FFFE | 000A | 0166 | 07E4 | 0000 | 0000 |
| 0000342740 | 0002 | 0000 | 0000 | 0000 | 0000 | 0000 | 0000 | 0000 |
| 0000342760 | 0B5A | 0000 | 0000 | 0000 | FFFE | 000A | 010F | 0000 |
| 0000343000 | 0000 | 0000 | 0002 | 0000 | 0000 | 07FA | 0000 | 0000 |
| 0000343020 | 0000 | 0000 | 0B64 | 0000 | 0000 | 0000 | FFFF | 000B |
| 0000343040 | 0110 | 0000 | 0000 | 0000 | 0002 | 0000 | 0000 | 0000 |
| 0000343060 | 0000 | 0000 | 0000 | 0000 | 0B70 | 0000 | 0001 | 0000 |
| 0000343100 | FFFF | 000B | 0110 | 0000 | 0000 | 0000 | 0002 | 0000 |
| 0000343120 | 0000 | 0000 | 0000 | 0000 | 4D5F | 3442 | 525F | 0044 |
| 0000343140 | 0003 | 0000 | FFFF | 000B | 0110 | 0000 | 0000 | 0000 |
| 0000343160 | 0002 | 0000 | 0000 | 0000 | 0000 | 0000 | 652E | 736F |
| 0000343200 | 0000 | 000G | G000 | 0000 | FFFE | 000A | 0166 | 07F0 |
| 0000343220 | 0000 | 0000 | 0002 | 0000 | 0000 | 0000 | 0000 | 0000 |
| 0000343240 | 0000 | 0000 | 0B7B | 0000 | 0000 | 0000 | FFFE | 000A |
| 0000343260 | 010F | 0000 | 0000 | 0000 | 0002 | 0000 | 0000 | 0802 |
| 0000343300 | 0000 | 0000 | 4D5F | 3542 | 575F | 0052 | 0000 | 0000 |
| 0000343320 | FFFF | 000B | 0110 | 0000 | 0000 | 0000 | 0002 | 0000 |
| 0000343340 | 0000 | 0000 | 0000 | 0000 | 4D5F | 3542 | 525F | 0044 |
| 0000343360 | 0003 | 0000 | FFFF | 000B | 0110 | 0000 | 0000 | 0000 |
| 0000343400 | 0002 | 0000 | 0000 | 0000 | 0000 | 0000 | 652E | 736F |
| 0000343420 | 0000 | 0000 | 0000 | 0000 | FFFE | 000A | 0166 | 07FA |
| 0000343440 | 0000 | 0000 | 0002 | 0000 | 0000 | 0000 | 0000 | 0000 |
| 0000343460 | 0000 | 0000 | 0B85 | 0000 | 0000 | 0000 | FFFE | 000A |
| 0000343500 | 010F | 0000 | 0000 | 0000 | 0001 | 0000 | 0000 | 080A |
| 0000343520 | 0000 | 0000 | 0000 | 0000 | 0B91 | 0000 | 0000 | 0000 |
| 0000343540 | FFFF | 000B | 0110 | 0000 | 0000 | 0000 | 0001 | 0000 |
| 0000343560 | 0000 | 0000 | 0000 | 0000 | 0000 | 0000 | 0B9C | 0000 |
| 0000343600 | 0001 | 0000 | FFFF | 000B | 0110 | 0000 | 0000 | 0000 |
| 0000343620 | 0001 | 0000 | 0000 | 0000 | 0000 | 0000 | 652E | 736F |
| 0000343640 | 0000 | 0000 | 0000 | 0000 | FFFE | 000A | 0166 | 0802 |
| 0000343660 | 0000 | 0000 | 0001 | 0000 | 0000 | 0000 | 0000 | 0000 |
| 0000343700 | 0000 | 0000 | 0BA6 | 0000 | 0000 | 0000 | FFFE | 000A |
| 0000343720 | 010F | 0000 | 0000 | 0000 | 0001 | 0000 | 0000 | 0812 |
| 0000343740 | 0000 | 0000 | 0000 | 0000 | 0BB3 | 0000 | 0000 | 0000 |
| 0000343760 | FFFF | 000B | 0110 | 0000 | 0000 | 0000 | 0001 | 0000 |
| 0000344000 | 0000 | 0000 | 0000 | 0000 | 0000 | 0000 | 0BBF | 0000 |
| 0000344020 | 0001 | 0000 | FFFF | 000B | 0110 | 0000 | 0000 | 0000 |
| 0000344040 | 0001 | 0000 | 0000 | 0000 | 0000 | 0000 | 652E | 736F |
| 0000344060 | 0000 | 0000 | 0000 | 0000 | FFFE | 000A | 0166 | 080A |
| 0000344100 | 0000 | 0000 | 0001 | 0000 | 0000 | 0000 | 0000 | 0000 |
| 0000344120 | 0000 | 0000 | 0BCC | 0000 | 0000 | 0000 | FFFE | 000A |
| 0000344140 | 010F | 0000 | 0000 | 0000 | 0003 | 0000 | 0000 | 0822 |
| 0000344160 | 0000 | 0000 | 585F | 424D | 0030 | 0000 | 0000 | 0000 |
| 0000344200 | FFFF | 000B | 0110 | 0000 | 0000 | 0000 | 0003 | 0000 |
| 0000344220 | 0000 | 0000 | 0000 | 0000 | 585F | 424D | 0031 | 0000 |
| 0000344240 | 0001 | 0000 | FFFF | 000B | 0110 | 0000 | 0000 | 0000 |
| 0000344260 | 0003 | 0000 | 0000 | 0000 | 0000 | 0000 | 585F | 424D |
| 0000344300 | 0032 | 0000 | 0002 | 0000 | FFFF | 000B | 0110 | 0000 |
| 0000344320 | 0000 | 0000 | 0003 | 0000 | 0000 | 0000 | 0000 | 0000 |
| 0000344340 | 585F | 424D | 0033 | 0000 | 0003 | 0000 | FFFF | 000B |
| 0000344360 | 0110 | 0000 | 0000 | 0000 | 0003 | 0000 | 0000 | 0000 |
| 0000344400 | 0000 | 0000 | 585F | 424D | 0034 | 0000 | 0004 | 0000 |
| 0000344420 | FFFF | 000B | 0110 | 0000 | 0000 | 0000 | 0003 | 0000 |
| 0000344440 | 0000 | 0000 | 0000 | 0000 | 585F | 424D | 0035 | 0000 |
| 0000344460 | 0005 | 0000 | FFFF | 000B | 0110 | 0000 | 0000 | 0000 |

THU MAR 14 17:37:32 1991 GSPMON.4 PAGE 125, LINE 7317

| | | | | | | | | |
|---|---|---|---|---|---|---|---|---|
| 0000344500 | 0003 | 0000 | 0000 | 0000 | 0000 | 0000 | 652E | 736F |
| 0000344520 | 0000 | 0000 | 0000 | 0000 | FFFE | 000A | 0166 | 0812 |
| 0000344540 | 0000 | 0000 | 0003 | 0000 | 0000 | 0000 | 0000 | 0000 |
| 0000344560 | 635F | 6E68 | 006C | 0000 | 0000 | 0000 | FFFE | 000A |
| 0000344600 | 010F | 0000 | 0000 | 0000 | 0002 | 0000 | 0000 | 082E |
| 0000344620 | 0000 | 0000 | 525F | 4445 | 435F | 0048 | 0000 | 0000 |
| 0000344640 | FFFF | 000B | 0110 | 0000 | 0000 | 0000 | 0002 | 0000 |
| 0000344660 | 0000 | 0000 | 0000 | 0000 | 0000 | 0000 | 0BD6 | 0000 |
| 0000344700 | 0001 | 0000 | FFFF | 000B | 0110 | 0000 | 0000 | 0000 |
| 0000344720 | 0002 | 0000 | 0000 | 0000 | 0000 | 0000 | 425F | 554C |
| 0000344740 | 5F45 | 4843 | 0002 | 0000 | FFFF | 000B | 0110 | 0000 |
| 0000344760 | 0000 | 0000 | 0002 | 0000 | 0000 | 0000 | 0000 | 0000 |
| 0000345000 | 0000 | 0000 | 0BE0 | 0000 | 0003 | 0000 | FFFF | 000B |
| 0000345020 | 0110 | 0000 | 0000 | 0000 | 0002 | 0000 | 0000 | 0000 |
| 0000345040 | 0000 | 0000 | 652E | 736F | 0000 | 0000 | 0000 | 0000 |
| 0000345060 | FFFE | 000A | 0166 | 0822 | 0000 | 0000 | 0002 | 0000 |
| 0000345100 | 0000 | 0000 | 0000 | 0000 | 0000 | 0000 | 0BEC | 0000 |
| 0000345120 | 0000 | 0000 | FFFE | 000A | 010F | 0000 | 0000 | 0000 |
| 0000345140 | 0001 | 0000 | 0000 | 0836 | 0000 | 0000 | 0000 | 0000 |
| 0000345160 | 0BF6 | 0000 | 0000 | 0000 | FFFF | 000B | 0110 | 0000 |
| 0000345200 | 0000 | 0000 | 0001 | 0000 | 0000 | 0000 | 0000 | 0000 |
| 0000345220 | 435F | 4359 | 494C | 0043 | 0001 | 0000 | FFFF | 000B |
| 0000345240 | 0110 | 0000 | 0000 | 0000 | 0001 | 0000 | 0000 | 0000 |
| 0000345260 | 0000 | 0000 | 652E | 736F | 0000 | 0000 | 0000 | 0000 |
| 0000345300 | FFFE | 000A | 0166 | 082E | 0000 | 0000 | 0001 | 0000 |
| 0000345320 | 0000 | 0000 | 0000 | 0000 | 662E | 6C69 | 0065 | 0000 |
| 0000345340 | 0838 | 0000 | FFFE | 0000 | 0167 | 7067 | 6D5F | 756F |
| 0000345360 | 632E | 0000 | 0000 | 0000 | 0000 | 0000 | 662E | 6C69 |
| 0000345400 | 0065 | 0000 | 033A | 0000 | FFFE | 0000 | 0167 | 7367 |
| 0000345420 | 6870 | 6477 | 682E | 0000 | 0000 | 0000 | 0000 | 0000 |
| 0000345440 | 662E | 6C69 | 0065 | 0000 | 083C | 0000 | FFFE | 0000 |
| 0000345460 | 0167 | 7067 | 6D5F | 756F | 632E | 0000 | 0000 | 0000 |
| 0000345500 | 0000 | 0000 | 662E | 6C69 | 0065 | 0000 | 0900 | 0000 |
| 0000345520 | FFFE | 0000 | 0167 | 7067 | 705F | 6275 | 682E | 0000 |
| 0000345540 | 0000 | 0000 | 0000 | 0000 | 332E | 6166 | 656B | 0000 |
| 0000345560 | 0000 | 0000 | FFFE | 0008 | 010A | 0000 | 0000 | 0000 |
| 0000345600 | 01C0 | 0000 | 0000 | 086E | 0000 | 0000 | 685F | 7365 |
| 0000345620 | 6E79 | 0063 | 0000 | 0000 | FFFF | 000D | 0108 | 0000 |
| 0000345640 | 0000 | 0000 | 0010 | 0000 | 0000 | 0000 | 0000 | 0000 |
| 0000345660 | 685F | 6265 | 6E6C | 006B | 0010 | 0000 | FFFF | 000D |
| 0000345700 | 0108 | 0000 | 0000 | 0000 | 0010 | 0000 | 0000 | 0000 |
| 0000345720 | 0000 | 0000 | 685F | 6273 | 6E6C | 006B | 0020 | 0000 |
| 0000345740 | FFFF | 000D | 0108 | 0000 | 0000 | 0000 | 0010 | 0000 |
| 0000345760 | 0000 | 0000 | 0000 | 0000 | 765F | 7365 | 6E79 | 0063 |
| 0000346000 | 0030 | 0000 | FFFF | 000D | 0108 | 0000 | 0000 | 0000 |
| 0000346020 | 0010 | 0000 | 0000 | 0000 | 0000 | 0000 | 765F | 6265 |
| 0000346040 | 6E6C | 006B | 0040 | 0000 | FFFF | 000D | 0108 | 0000 |
| 0000346060 | 0000 | 0000 | 0010 | 0000 | 0000 | 0000 | 0000 | 0000 |
| 0000346100 | 765F | 6273 | 6E6C | 006B | 0050 | 0000 | FFFF | 000D |
| 0000346120 | 0108 | 0000 | 0000 | 0000 | 0010 | 0000 | 0000 | 0000 |
| 0000346140 | 0000 | 0000 | 0000 | 0000 | 0C00 | 0000 | 0060 | 0000 |
| 0000346160 | FFFF | 000D | 0108 | 0000 | 0000 | 0000 | 0010 | 0000 |
| 0000346200 | 0000 | 0000 | 0000 | 0000 | 665F | 6468 | 7369 | 0070 |
| 0000346220 | 0070 | 0000 | FFFF | 000D | 0108 | 0000 | 0000 | 0000 |
| 0000346240 | 0010 | 0000 | 0000 | 0000 | 0000 | 0000 | 6D5F | 5F62 |
| 0000346260 | 6973 | 657A | 0080 | 0000 | FFFF | 000F | 0108 | 0000 |
| 0000346300 | 0000 | 0000 | 0020 | 0000 | 0000 | 0000 | 0000 | 0000 |
| 0000346320 | 0000 | 0000 | 0C0B | 0000 | 00A0 | 0000 | FFFF | 000D |
| 0000346340 | 0108 | 0000 | 0000 | 0000 | 0010 | 0000 | 0000 | 0000 |

THU MAR 14 17:37:32 1991 GSPMON.4 PAGE 126, LINE 7376

| | | | | | | | | |
|---|---|---|---|---|---|---|---|---|
| 0000346360 | 0000 | 0000 | 0000 | 0000 | 0C15 | 0000 | 00B0 | 0000 |
| 0000346400 | FFFF | 000D | 0108 | 0000 | 0000 | 0000 | 0010 | 0000 |
| 0000346420 | 0000 | 0000 | 0000 | 0000 | 0000 | 0000 | 0C1F | 0000 |
| 0000346440 | 00C0 | 0000 | FFFF | 000D | 0108 | 0000 | 0000 | 0000 |
| 0000346460 | 0010 | 0000 | 0000 | 0000 | 0000 | 0000 | 0000 | 0000 |
| 0000346500 | 0C2A | 0000 | 00D0 | 0000 | FFFF | 000D | 0108 | 0000 |
| 0000346520 | 0000 | 0000 | 0010 | 0000 | 0000 | 0000 | 0000 | 0000 |
| 0000346540 | 0000 | 0000 | 0C34 | 0000 | 00E0 | 0000 | FFFF | 000F |
| 0000346560 | 0108 | 0000 | 0000 | 0000 | 0020 | 0000 | 0000 | 0000 |
| 0000346600 | 0000 | 0000 | 0000 | 0000 | 0C41 | 0000 | 0100 | 0000 |
| 0000346620 | FFFF | 000F | 0108 | 0000 | 0000 | 0000 | 0020 | 0000 |
| 0000346640 | 0000 | 0000 | 0000 | 0000 | 0000 | 0000 | 0C53 | 0000 |
| 0000346660 | 0120 | 0000 | FFFF | 000F | 0108 | 0000 | 0000 | 0000 |
| 0000346700 | 0020 | 0000 | 0000 | 0000 | 0000 | 0000 | 0000 | 0000 |
| 0000346720 | 0C62 | 0000 | 0140 | 0000 | FFFF | 000F | 0108 | 0000 |
| 0000346740 | 0000 | 0000 | 0020 | 0000 | 0000 | 0000 | 0000 | 0000 |
| 0000346760 | 0000 | 0000 | 0C78 | 0000 | 0160 | 0000 | FFFF | 000D |
| 0000347000 | 0108 | 0000 | 0000 | 0000 | 0010 | 0000 | 0000 | 0000 |
| 0000347020 | 0000 | 0000 | 0000 | 0000 | 0C83 | 0000 | 0170 | 0000 |
| 0000347040 | FFFF | 000D | 0108 | 0000 | 0000 | 0000 | 0010 | 0000 |
| 0000347060 | 0000 | 0000 | 0000 | 0000 | 0000 | 0000 | 0C97 | 0000 |
| 0000347100 | 0180 | 0000 | FFFF | 000D | 0108 | 0000 | 0000 | 0000 |
| 0000347120 | 0010 | 0000 | 0000 | 0000 | 0000 | 0000 | 0000 | 0000 |
| 0000347140 | 0CAB | 0000 | 0190 | 0000 | FFFF | 000F | 0108 | 0000 |
| 0000347160 | 0000 | 0000 | 0020 | 0000 | 0000 | 0000 | 0000 | 0000 |
| 0000347200 | 0000 | 0000 | 0CBA | 0000 | 01B0 | 0000 | FFFF | 000D |
| 0000347220 | 0108 | 0000 | 0000 | 0000 | 0010 | 0000 | 0000 | 0000 |
| 0000347240 | 0000 | 0000 | 652E | 736F | 0000 | 0000 | 0000 | 0000 |
| 0000347260 | FFFE | 0008 | 0166 | 083E | 0000 | 0000 | 01C0 | 000C |
| 0000347300 | 0000 | 0000 | 0000 | 0000 | 342E | 6166 | 656B | 0000 |
| 0000347320 | 0000 | 0000 | FFFE | 0008 | 010A | 0000 | 0000 | 0000 |
| 0000347340 | 0050 | 0000 | 0000 | 0878 | 0000 | 0000 | 6D5F | 6773 |
| 0000347360 | 705F | 7274 | 0000 | 0000 | FFFF | 0010 | 0108 | 0000 |
| 0000347400 | 0000 | 0000 | 0020 | 0000 | 0000 | 0000 | 0000 | 0000 |
| 0000347420 | 0000 | 0000 | 0CC6 | 0000 | 0020 | 0000 | FFFF | 000F |
| 0000347440 | 0108 | 0000 | 0000 | 0000 | 0020 | 0000 | 0000 | 0000 |
| 0000347460 | 0000 | 0000 | 0000 | 0000 | 0CD0 | 0000 | 0040 | 0000 |
| 0000347500 | FFFF | 000D | 0108 | 0000 | 0000 | 0000 | 0010 | 0000 |
| 0000347520 | 0000 | 0000 | 0000 | 0000 | 652E | 736F | 0000 | 0000 |
| 0000347540 | 0000 | 0000 | FFFE | 0008 | 0166 | 086E | 0000 | 0000 |
| 0000347560 | 0050 | 0000 | 0000 | 0000 | 0000 | 0000 | 352E | 6166 |
| 0000347600 | 656B | 0000 | n000 | 0000 | FFFE | 0008 | 010A | 0000 |
| 0000347620 | 0000 | 0000 | 0040 | 0000 | 0000 | 0884 | 0000 | 0000 |
| 0000347640 | 0000 | 0000 | 0CDB | 0000 | 0000 | 0000 | FFFF | 000D |
| 0000347660 | 0108 | 0000 | 0000 | 0000 | 0010 | 0000 | 0000 | 0000 |
| 0000347700 | 0000 | 0000 | 6A5F | 6D75 | 0070 | 0000 | 0010 | 0000 |
| 0000347720 | FFFF | 000D | 0108 | 0000 | 0000 | 0000 | 0010 | 0000 |
| 0000347740 | 0000 | 0000 | 0000 | 0000 | 735F | 6174 | 7472 | 0000 |
| 0000347760 | 0020 | 0000 | FFFF | 000D | 0108 | 0000 | 0000 | 0000 |
| 0000350000 | 0010 | 0000 | 0000 | 0000 | 0000 | 0000 | 655F | 646E |
| 0000350020 | 0000 | 0000 | 0030 | 0000 | FFFF | 000D | 0108 | 0000 |
| 0000350040 | 0000 | 0000 | 0010 | 0000 | 0000 | 0000 | 0000 | 0000 |
| 0000350060 | 652E | 736F | 0000 | 0000 | 0000 | 0000 | FFFE | 0008 |
| 0000350100 | 0166 | 0878 | 0000 | 0000 | 0040 | 0000 | 0000 | 0000 |
| 0000350120 | 0000 | 0000 | 362E | 6166 | 656B | 0000 | 0000 | 0000 |
| 0000350140 | FFFE | 0008 | 010A | 0000 | 0000 | 0000 | 0080 | 0000 |
| 0000350160 | 0000 | 088C | 0000 | 0000 | 685F | 0000 | 0000 | 0000 |
| 0000350200 | 0000 | 0000 | FFFF | 0008 | 0108 | 0878 | 0000 | 0000 |
| 0000350220 | 0040 | 0000 | 0000 | 0000 | 0000 | 0000 | 765F | 0000 |

THU MAR 14 17:37:32 1991 GSPMON.4 PAGE 127, LINE 7435

| | | | | | | | | |
|---|---|---|---|---|---|---|---|---|
| 0000350240 | 0000 | 0000 | 0040 | 0000 | FFFF | 0008 | 0108 | 0878 |
| 0000350260 | 0000 | 0000 | 0040 | 0000 | 0000 | 0000 | 0000 | 0000 |
| 0000350300 | 652E | 736F | 0000 | 0000 | 0000 | 0000 | FFFE | 0008 |
| 0000350320 | 0166 | 0884 | 0000 | 0000 | 0080 | 0000 | 0000 | 0000 |
| 0000350340 | 0000 | 0000 | 372E | 6166 | 656B | 0000 | 0000 | 0000 |
| 0000350360 | FFFE | 0009 | 010C | 0000 | 0000 | 0000 | 0200 | 0000 |
| 0000350400 | 0000 | 0896 | 0000 | 0000 | 635F | 6B68 | 7573 | 006D |
| 0000350420 | 0000 | 0000 | FFFF | 003D | 010B | 0000 | 0000 | 0000 |
| 0000350440 | 0200 | 0020 | 0000 | 0000 | 0000 | 0000 | 655F | 7272 |
| 0000350460 | 6E63 | 0074 | 0000 | 0000 | FFFF | 003D | 010B | 0000 |
| 0000350500 | 0000 | 0000 | 0200 | 0020 | 0000 | 0000 | 0000 | 0000 |
| 0000350520 | 635F | 6372 | 3233 | 0000 | 0000 | 0000 | FFFF | 003D |
| 0000350540 | 010B | 0000 | 0000 | 0000 | 0200 | 0020 | 0000 | 0000 |
| 0000350560 | 0000 | 0000 | 652E | 736F | 0000 | 0000 | 0000 | 0000 |
| 0000350600 | FFFE | 0009 | 0166 | 088C | 0000 | 0000 | 0200 | 0000 |
| 0000350620 | 0000 | 0000 | 0000 | 0000 | 382E | 6166 | 656B | 0000 |
| 0000350640 | 0000 | 0000 | FFFE | 0008 | 010A | 0000 | 0000 | 0000 |
| 0000350660 | 0240 | 0000 | 0000 | 089E | 0000 | 0000 | 0000 | 0000 |
| 0000350700 | 0CE7 | 0000 | 0000 | 0000 | FFFF | 0008 | 0108 | 0878 |
| 0000350720 | 0000 | 0000 | 0040 | 0000 | 0000 | 0000 | 0000 | 0000 |
| 0000350740 | 0000 | 0000 | 0CF4 | 0000 | 0040 | 0000 | FFFF | 0009 |
| 0000350760 | 0108 | 088C | 0000 | 0000 | 0200 | 0000 | 0000 | 0000 |
| 0000351000 | 0000 | 0000 | 652E | 736F | 0000 | 0000 | 0000 | 0000 |
| 0000351020 | FFFE | 0008 | 0166 | 0896 | 0000 | 0000 | 0240 | 0000 |
| 0000351040 | 0000 | 0000 | 0000 | 0000 | 392E | 6166 | 656B | 0000 |
| 0000351060 | 0000 | 0000 | FFFE | 0009 | 010C | 0000 | 0000 | 0000 |
| 0000351100 | 4000 | 0000 | 0000 | 08A8 | 0000 | 0000 | 635F | 6B68 |
| 0000351120 | 7573 | 006D | 0000 | 0000 | FFFF | 00FD | 010B | 0000 |
| 0000351140 | 0000 | 0000 | 4000 | 0020 | 0020 | 0000 | 0000 | 0000 |
| 0000351160 | 655F | 7272 | 6E63 | 0074 | 0000 | 0000 | FFFF | 00FD |
| 0000351200 | 010B | 0000 | 0000 | 0000 | 4000 | 0020 | 0020 | 0000 |
| 0000351220 | 0000 | 0000 | 635F | 6372 | 3233 | 0000 | 0000 | 0000 |
| 0000351240 | FFFF | 00FD | 010B | 0000 | 0000 | 0000 | 4000 | 0020 |
| 0000351260 | 0020 | 0000 | 0000 | 0000 | 652E | 736F | 0000 | 0000 |
| 0000351300 | 0000 | 0000 | FFFE | 0009 | 0166 | 089E | 0000 | 0000 |
| 0000351320 | 4000 | 0000 | 0000 | 0000 | 0000 | 0000 | 312E | 6630 |
| 0000351340 | 6B61 | 0065 | 0000 | 0000 | FFFE | 0008 | 010A | 0000 |
| 0000351360 | 0000 | 0000 | 4080 | 0000 | 0000 | 08B2 | 0000 | 0000 |
| 0000351400 | 0000 | 0000 | 0D00 | 0000 | 0000 | 0000 | FFFF | 0008 |
| 0000351420 | 0108 | 0878 | 0000 | 0000 | 0040 | 0000 | 0000 | 0000 |
| 0000351440 | 0000 | 0000 | 0000 | 0000 | 0D0D | 0000 | 0040 | 0000 |
| 0000351460 | FFFF | 0008 | 0108 | 0878 | 0000 | 0000 | 0040 | 0000 |
| 0000351500 | 0000 | 0000 | 0000 | 0000 | 0000 | 0000 | 0D19 | 0000 |
| 0000351520 | 0080 | 0000 | FFFF | 0009 | 0108 | 089E | 0000 | 0000 |
| 0000351540 | 4000 | 0000 | 0000 | 0000 | 0000 | 0000 | 652E | 736F |
| 0000351560 | 0000 | 0000 | 0000 | 0000 | FFFE | 0008 | 0166 | 08A8 |
| 0000351600 | 0000 | 0000 | 4080 | 0000 | 0000 | 0000 | 0000 | 0000 |
| 0000351620 | 312E | 6631 | 6B61 | 0065 | 0000 | 0000 | FFFE | 0009 |
| 0000351640 | 010C | 0000 | 0000 | 0000 | 0090 | 0000 | 0000 | 08BC |
| 0000351660 | 0000 | 0000 | 635F | 6B68 | 7573 | 006D | 0000 | 0000 |
| 0000351700 | FFFF | 00FD | 010B | 0000 | 0000 | 0000 | 0090 | 0003 |
| 0000351720 | 0003 | 0000 | 0000 | 0000 | 655F | 7272 | 6E63 | 0074 |
| 0000351740 | 0000 | 0000 | FFFF | 00FD | 010B | 0000 | 0000 | 0000 |
| 0000351760 | 0090 | 0003 | 0003 | 0000 | 0000 | 0000 | 625F | 7263 |
| 0000352000 | 3363 | 0032 | 0000 | 0000 | FFFF | 00FD | 010B | 0000 |
| 0000352020 | 0000 | 0000 | 0090 | 0003 | 0003 | 0000 | 0000 | 0000 |
| 0000352040 | 652E | 736F | 0000 | 0000 | 0000 | 0000 | FFFE | 0009 |
| 0000352060 | 0166 | 08B2 | 0000 | 0000 | 0090 | 0000 | 0000 | 0000 |
| 0000352100 | 0000 | 0000 | 312E | 6632 | 6B61 | 0065 | 0000 | 0000 |

THU MAR 14 17:37:32 1991 GSPMON.4 PAGE 128, LINE 7494

| | | | | | | | | |
|---|---|---|---|---|---|---|---|---|
| 0000352120 | FFFE | 0008 | 010A | 0000 | 0000 | 0000 | 0130 | 0000 |
| 0000352140 | 0000 | 08CA | 0000 | 0000 | 0000 | 0000 | 0D23 | 0000 |
| 0000352160 | 0000 | 0000 | FFFF | 0008 | 0108 | 0878 | 0000 | 0000 |
| 0000352200 | 0040 | 0000 | 0000 | 0000 | 0000 | 0000 | 0000 | 0000 |
| 0000352220 | 0D30 | 0000 | 0040 | 0000 | FFFF | 0008 | 0108 | 0878 |
| 0000352240 | 0000 | 0000 | 0040 | 0000 | 0000 | 0000 | 0000 | 0000 |
| 0000352260 | 785F | 635F | 6F6F | 6472 | 0080 | 0000 | FFFF | 0003 |
| 0000352300 | 0108 | 0000 | 0000 | 0000 | 0010 | 0000 | 0000 | 0000 |
| 0000352320 | 0000 | 0000 | 795F | 635F | 6F6F | 6472 | 0090 | 0000 |
| 0000352340 | FFFF | 0003 | 0108 | 0000 | 0000 | 0000 | 0010 | 0000 |
| 0000352360 | 0000 | 0000 | 0000 | 0000 | 0000 | 0000 | 0D3C | 0000 |
| 0000352400 | 00A0 | 0000 | FFFF | 0009 | 0108 | 08B2 | 0000 | 0000 |
| 0000352420 | 0090 | 0000 | 0000 | 0000 | 0000 | 0000 | 652E | 736F |
| 0000352440 | 0000 | 0000 | 0000 | 0000 | FFFE | 0008 | 0166 | 08BC |
| 0000352460 | 0000 | 0000 | 0130 | 0000 | 0000 | 0000 | 0000 | 0000 |
| 0000352500 | 312E | 6633 | 6B61 | 0065 | 0000 | 0000 | FFFE | 0008 |
| 0000352520 | 010A | 0000 | 0000 | 0000 | 0050 | 0000 | 0000 | 08D6 |
| 0000352540 | 0000 | 0000 | 0000 | 0000 | 0D46 | 0000 | 0000 | 0000 |
| 0000352560 | FFFF | 000D | 0108 | 0000 | 0000 | 0000 | 0010 | 0000 |
| 0000352600 | 0000 | 0000 | 0000 | 0000 | 0000 | 0000 | 0D5E | 0000 |
| 0000352620 | 0010 | 0000 | FFFF | 000D | 0108 | 0000 | 0000 | 0000 |
| 0000352640 | 0010 | 0000 | 0000 | 0000 | 0000 | 0000 | 0000 | 0000 |
| 0000352660 | 0D70 | 0000 | 0020 | 0000 | FFFF | 000D | 0108 | 0000 |
| 0000352700 | 0000 | 0000 | 0010 | 0000 | 0000 | 0000 | 0000 | 0000 |
| 0000352720 | 0000 | 0000 | 0D7B | 0000 | 0030 | 0000 | FFFF | 0010 |
| 0000352740 | 0108 | 0000 | 0000 | 0000 | 0020 | 0000 | 0000 | 0000 |
| 0000352760 | 0000 | 0000 | 652E | 736F | 0000 | 0000 | 0000 | 0000 |
| 0000353000 | FFFE | 0008 | 0166 | 08CA | 0000 | 0000 | 0050 | 0000 |
| 0000353020 | 0000 | 0000 | 0000 | 0000 | 312E | 6634 | 6B61 | 0065 |
| 0000353040 | 0000 | 0000 | FFFE | 0008 | 010A | 0000 | 0000 | 0000 |
| 0000353060 | 0040 | 0000 | 0000 | 08DE | 0000 | 0000 | 0000 | 0000 |
| 0000353100 | 0D85 | 0000 | 0000 | 0000 | FFFF | 0005 | 0108 | 0000 |
| 0000353120 | 0000 | 0000 | 0020 | 0000 | 0000 | 0000 | 0000 | 0000 |
| 0000353140 | 0000 | 0000 | 0D95 | 0000 | 0020 | 0000 | FFFF | 0005 |
| 0000353160 | 0108 | 0000 | 0000 | 0000 | 0020 | 0000 | 0000 | 0000 |
| 0000353200 | 0000 | 0000 | 652E | 736F | 0000 | 0000 | 0000 | 0000 |
| 0000353220 | FFFE | 0008 | 0166 | 08D6 | 0000 | 0000 | 0040 | 0000 |
| 0000353240 | 0000 | 0000 | 0000 | 0000 | 312E | 6635 | 6B61 | 0065 |
| 0000353260 | 0000 | 0000 | FFFE | 0008 | 010A | 0000 | 0000 | 0000 |
| 0000353300 | 0050 | 0000 | 0000 | 08EC | 0000 | 0000 | 785F | 656C |
| 0000353320 | 7466 | 0000 | 0000 | 0000 | FFFF | 0003 | 0108 | 0000 |
| 0000353340 | 0000 | 0000 | 0010 | 0000 | 0000 | 0000 | 0000 | 0000 |
| 0000353360 | 795F | 6F74 | 0070 | 0000 | 0010 | 0000 | FFFF | 0003 |
| 0000353400 | 0108 | 0000 | 0000 | 0000 | 0010 | 0000 | 0000 | 0000 |
| 0000353420 | 0000 | 0000 | 785F | 6972 | 6867 | 0074 | 0020 | 0000 |
| 0000353440 | FFFF | 0003 | 0108 | 0000 | 0000 | 0000 | 0010 | 0000 |
| 0000353460 | 0000 | 0000 | 0000 | 0000 | 795F | 6F64 | 6E77 | 0000 |
| 0000353500 | 0030 | 0000 | FFFF | 0003 | 0108 | 0000 | 0000 | 0000 |
| 0000353520 | 0010 | 0000 | 0000 | 0000 | 0000 | 0000 | 0000 | 0000 |
| 0000353540 | 0DA4 | 0000 | 0040 | 0000 | FFFF | 0003 | 0108 | 0000 |
| 0000353560 | 0000 | 0000 | 0010 | 0000 | 0000 | 0000 | 0000 | 0000 |
| 0000353600 | 652E | 736F | 0000 | 0000 | 0000 | 0000 | FFFE | 0008 |
| 0000353620 | 0166 | 08DE | 0000 | 0000 | 0050 | 0000 | 0000 | 0000 |
| 0000353640 | 0000 | 0000 | 312E | 6636 | 6B61 | 0065 | 0000 | 0000 |
| 0000353660 | FFFE | 0008 | 010A | 0000 | 0000 | 0000 | 0020 | 0000 |
| 0000353700 | 0000 | 08F4 | 0000 | 0000 | 0000 | 0000 | 0DAE | 0000 |
| 0000353720 | 0000 | 0000 | FFFF | 0003 | 0108 | 0000 | 0000 | 0000 |
| 0000353740 | 0010 | 0000 | 0000 | 0000 | 0000 | 0000 | 0000 | 0000 |
| 0000353760 | 0DBA | 0000 | 0010 | 0000 | FFFF | 0003 | 0108 | 0000 |

THU MAR 14 17:37:32 1991 GSPMON.4 PAGE 129, LINE 7553

| | | | | | | | | |
|---|---|---|---|---|---|---|---|---|
| 0000354000 | 0000 | 0000 | 0010 | 0000 | 0000 | 0000 | 0000 | 0000 |
| 0000354020 | 652E | 736F | 0000 | 0000 | 0000 | 0000 | FFFE | 0008 |
| 0000354040 | 0166 | 08EC | 0000 | 0000 | 0020 | 0000 | 0000 | 0000 |
| 0000354060 | 0000 | 0000 | 312E | 6637 | 6B61 | 0065 | 0000 | 0000 |
| 0000354100 | FFFE | 0008 | 010A | 0000 | 0000 | 0000 | 0040 | 0000 |
| 0000354120 | 0000 | 0900 | 0000 | 0000 | 0000 | 0000 | 0DC4 | 0000 |
| 0000354140 | 0000 | 0000 | FFFF | 000D | 0108 | 0000 | 0000 | 0000 |
| 0000354160 | 0010 | 0000 | 0000 | 0000 | 0000 | 0000 | 0000 | 0000 |
| 0000354200 | 0DD7 | 0000 | 0010 | 0000 | FFFF | 000D | 0108 | 0000 |
| 0000354220 | 0000 | 0000 | 0010 | 0000 | 0000 | 0000 | 0000 | 0000 |
| 0000354240 | 0000 | 0000 | 0DE9 | 0000 | 0020 | 0000 | FFFF | 000D |
| 0000354260 | 0108 | 0000 | 0000 | 0000 | 0010 | 0000 | 0000 | 0000 |
| 0000354300 | 0000 | 0000 | 0000 | 0000 | 0DF6 | 0000 | 0030 | 0000 |
| 0000354320 | FFFF | 000D | 0108 | 0000 | 0000 | 0000 | 0010 | 0000 |
| 0000354340 | 0000 | 0000 | 0000 | 0000 | 652E | 736F | 0000 | 0000 |
| 0000354360 | 0000 | 0000 | FFFE | 0008 | 0166 | 08F4 | 0000 | 0000 |
| 0000354400 | 0040 | 0000 | 0000 | 0000 | 0000 | 0000 | 662E | 6C69 |
| 0000354420 | 0065 | 0000 | 0902 | 0000 | FFFE | 0000 | 0167 | 7067 |
| 0000354440 | 6D5F | 756F | 632E | 0000 | 0000 | 0000 | 0000 | 0000 |
| 0000354460 | 662E | 6C69 | 0065 | 0000 | 096E | 0000 | FFFE | 0000 |
| 0000354500 | 0167 | 7067 | 6D5F | 756F | 682E | 0000 | 0000 | 0000 |
| 0000354520 | 0000 | 0000 | 312E | 6638 | 6B61 | 0065 | 0000 | 0000 |
| 0000354540 | FFFE | 0008 | 010A | 0000 | 0000 | 0000 | 0060 | 0000 |
| 0000354560 | 0000 | 090E | 0000 | 0000 | 0000 | 0000 | 0E04 | 0000 |
| 0000354600 | 0000 | 0000 | FFFF | 000F | 0108 | 0000 | 0000 | 0000 |
| 0000354620 | 0020 | 0000 | 0000 | 0000 | 0000 | 0000 | 0000 | 0000 |
| 0000354640 | 0E11 | 0000 | 0020 | 0000 | FFFF | 000F | 0108 | 0000 |
| 0000354660 | 0000 | 0000 | 0020 | 0000 | 0000 | 0000 | 0000 | 0000 |
| 0000354700 | 0000 | 0000 | 0E27 | 0000 | 0040 | 0000 | FFFF | 000F |
| 0000354720 | 0108 | 0000 | 0000 | 0000 | 0020 | 0000 | 0000 | 0000 |
| 0000354740 | 0000 | 0000 | 652E | 736F | 0000 | 0000 | 0000 | 0000 |
| 0000354760 | FFFE | 0008 | 0166 | 0904 | 0000 | 0000 | 0060 | 0000 |
| 0000355000 | 0000 | 0000 | 0000 | 0000 | 312E | 6639 | 6B61 | 0065 |
| 0000355020 | 0000 | 0000 | FFFE | 0008 | 010A | 0000 | 0000 | 0000 |
| 0000355040 | 00C0 | 0000 | 0000 | 0928 | 0000 | 0000 | 635F | 0078 |
| 0000355060 | 0000 | 0000 | 0000 | 0000 | FFFF | 000D | 0108 | 0000 |
| 0000355100 | 0000 | 0000 | 0010 | 0000 | 0000 | 0000 | 0000 | 0000 |
| 0000355120 | 635F | 0079 | 0000 | 0000 | 0010 | 0000 | FFFF | 000D |
| 0000355140 | 0108 | 0000 | 0000 | 0000 | 0010 | 0000 | 0000 | 0000 |
| 0000355160 | 0000 | 0000 | 785F | 0031 | 0000 | 0000 | 0020 | 0000 |
| 0000355200 | FFFF | 0003 | 0108 | 0000 | 0000 | 0000 | 0010 | 0000 |
| 0000355220 | 0000 | 0000 | 0000 | 0000 | 795F | 0031 | 0000 | 0000 |
| 0000355240 | 0030 | 0000 | FFFF | 0003 | 0108 | 0000 | 0000 | 0000 |
| 0000355260 | 0010 | 0000 | 0000 | 0000 | 0000 | 0000 | 785F | 0032 |
| 0000355300 | 0000 | 0000 | 0040 | 0000 | FFFF | 0003 | 0108 | 0000 |
| 0000355320 | 0000 | 0000 | 0010 | 0000 | 0000 | 0000 | 0000 | 0000 |
| 0000355340 | 795F | 0032 | 0000 | 0000 | 0050 | 0000 | FFFF | 0003 |
| 0000355360 | 0108 | 0000 | 0000 | 0000 | 0010 | 0000 | 0000 | 0000 |
| 0000355400 | 0000 | 0000 | 685F | 5F70 | 0078 | 0000 | 0060 | 0000 |
| 0000355420 | FFFF | 0003 | 0108 | 0000 | 0000 | 0000 | 0010 | 0000 |
| 0000355440 | 0000 | 0000 | 0000 | 0000 | 685F | 5F70 | 0079 | 0000 |
| 0000355460 | 0070 | 0000 | FFFF | 0003 | 0108 | 0000 | 0000 | 0000 |
| 0000355500 | 0010 | 0000 | 0000 | 0000 | 0000 | 0000 | 0000 | 0000 |
| 0000355520 | 0E38 | 0000 | 0080 | 0000 | FFFF | 000F | 0108 | 0000 |
| 0000355540 | 0000 | 0000 | 0020 | 0000 | 0000 | 0000 | 0000 | 0000 |
| 0000355560 | 0000 | 0000 | 0E48 | 0000 | 00A0 | 0000 | FFFF | 000D |
| 0000355600 | 0108 | 0000 | 0000 | 0000 | 0010 | 0000 | 0000 | 0000 |
| 0000355620 | 0000 | 0000 | 0000 | 0000 | 0E57 | 0000 | 00B0 | 0000 |
| 0000355640 | FFFF | 000D | 0108 | 0000 | 0000 | 0000 | 0010 | 0000 |

THU MAR 14 17:37:32 1991 GSPMON.4 PAGE 130, LINE 7612

| | | | | | | | | |
|---|---|---|---|---|---|---|---|---|
| 0000355660 | 0000 | 0000 | 0000 | 0000 | 652E | 736F | 0000 | 0000 |
| 0000355700 | 0000 | 0000 | FFFE | 0008 | 0166 | 090E | 0000 | 0000 |
| 0000355720 | 00C0 | 0000 | 0000 | 0000 | 0000 | 0000 | 322E | 6630 |
| 0000355740 | 6B61 | 0065 | 0000 | 0000 | FFFE | 0008 | 010A | 0000 |
| 0000355760 | 0000 | 0000 | 0030 | 0000 | 0000 | 0932 | 0000 | 0000 |
| 0000356000 | 785F | 0000 | 0000 | 0000 | 0000 | 0000 | FFFF | 0003 |
| 0000356020 | 0108 | 0000 | 0000 | 0000 | 0010 | 0000 | 0000 | 0000 |
| 0000356040 | 0000 | 0000 | 795F | 0000 | 0000 | 0000 | 0010 | 0000 |
| 0000356060 | FFFF | 0003 | 0108 | 0000 | 0000 | 0000 | 0010 | 0000 |
| 0000356100 | 0000 | 0000 | 0000 | 0000 | 695F | 6F63 | 5F6E | 6469 |
| 0000356120 | 0020 | 0000 | FFFF | 0003 | 0108 | 0000 | 0000 | 0000 |
| 0000356140 | 0010 | 0000 | 0000 | 0000 | 0000 | 0000 | 652E | 736F |
| 0000356160 | 0000 | 0000 | 0000 | 0000 | FFFE | 0008 | 0166 | 0928 |
| 0000356200 | 0000 | 0000 | 0030 | 0000 | 0000 | 0000 | 0000 | 0000 |
| 0000356220 | 322E | 6631 | 6B61 | 0065 | 0000 | 0000 | FFFE | 0008 |
| 0000356240 | 010A | 0000 | 0000 | 0000 | 0070 | 0000 | 0000 | 0944 |
| 0000356260 | 0000 | 0000 | 785F | 0000 | 0000 | 0000 | 0000 | 0000 |
| 0000356300 | FFFF | 000D | 0108 | 0000 | 0000 | 0000 | 0010 | 0000 |
| 0000356320 | 0000 | 0000 | 0000 | 0000 | 795F | 0000 | 0000 | 0000 |
| 0000356340 | 0010 | 0000 | FFFF | 000D | 0108 | 0000 | 0000 | 0000 |
| 0000356360 | 0010 | 0000 | 0000 | 0000 | 0000 | 0000 | 695F | 6F63 |
| 0000356400 | 5F6E | 6469 | 0020 | 0000 | FFFF | 000D | 0108 | 0000 |
| 0000356420 | 0000 | 0000 | 0010 | 0000 | 0000 | 0000 | 0000 | 0000 |
| 0000356440 | 6C5F | 6665 | 0074 | 0000 | 0030 | 0000 | FFFF | 000D |
| 0000356460 | 0108 | 0000 | 0000 | 0000 | 0010 | 0000 | 0000 | 0000 |
| 0000356500 | 0000 | 0000 | 725F | 6769 | 7468 | 0000 | 0040 | 0000 |
| 0000356520 | FFFF | 000D | 0108 | 0000 | 0000 | 0000 | 0010 | 0000 |
| 0000356540 | 0000 | 0000 | 0000 | 0000 | 755F | 0070 | 0000 | 0000 |
| 0000356560 | 0050 | 0000 | FFFF | 000D | 0108 | 0000 | 0000 | 0000 |
| 0000356600 | 0010 | 0000 | 0000 | 0000 | 0000 | 0000 | 645F | 776F |
| 0000356620 | 006E | 0000 | 0060 | 0000 | FFFF | 000D | 0108 | 0000 |
| 0000356640 | 0000 | 0000 | 0010 | 0000 | 0000 | 0000 | 0000 | 0000 |
| 0000356660 | 652E | 736F | 0000 | 0000 | 0000 | 0000 | FFFE | 0008 |
| 0000356700 | 0166 | 0932 | 0000 | 0000 | 0070 | 0000 | 0000 | 0000 |
| 0000356720 | 0000 | 0000 | 322E | 6632 | 6B61 | 0065 | 0000 | 0000 |
| 0000356740 | FFFE | 0008 | 010A | 0000 | 0000 | 0000 | 0020 | 0000 |
| 0000356760 | 0000 | 094C | 0000 | 0000 | 6D5F | 646F | 0065 | 0000 |
| 0000357000 | 0000 | 0000 | FFFF | 000D | 0108 | 0000 | 0000 | 0000 |
| 0000357020 | 0010 | 0000 | 0000 | 0000 | 0000 | 0000 | 725F | 7365 |
| 0000357040 | 6C75 | 0074 | 0010 | 0000 | FFFF | 000D | 0108 | 0000 |
| 0000357060 | 0000 | 0000 | 0010 | 0000 | 0000 | 0000 | 0000 | 0000 |
| 0000357100 | 652E | 736F | 0000 | 0000 | 0000 | 0000 | FFFE | 0008 |
| 0000357120 | 0166 | 0944 | 0000 | 0000 | 0020 | 0000 | 0000 | 0000 |
| 0000357140 | 0000 | 0000 | 322E | 6633 | 6B61 | 0065 | 0000 | 0000 |
| 0000357160 | FFFE | 0008 | 010A | 0000 | 0000 | 0000 | 0020 | 0000 |
| 0000357200 | 0000 | 0958 | 0000 | 0000 | 0000 | 0000 | 0E68 | 0000 |
| 0000357220 | 0000 | 0000 | FFFF | 000C | 0108 | 0000 | 0000 | 0000 |
| 0000357240 | 0008 | 0000 | 0000 | 0000 | 0000 | 0000 | 0000 | 0000 |
| 0000357260 | 0E74 | 0000 | 0008 | 0000 | FFFF | 000C | 0108 | 0000 |
| 0000357300 | 0000 | 0000 | 0008 | 0000 | 0000 | 0000 | 0000 | 0000 |
| 0000357320 | 0000 | 0000 | 0E7F | 0000 | 0010 | 0000 | FFFF | 000C |
| 0000357340 | 0108 | 0000 | 0000 | 0000 | 0008 | 0000 | 0000 | 0000 |
| 0000357360 | 0000 | 0000 | 0000 | 0000 | 0E8A | 0000 | 0018 | 0000 |
| 0000357400 | FFFF | 000C | 0108 | 0000 | 0000 | 0000 | 0008 | 0000 |
| 0000357420 | 0000 | 0000 | 0000 | 0000 | 652E | 736F | 0030 | 0000 |
| 0000357440 | 0000 | 0000 | FFFE | 0008 | 0166 | 094C | 0000 | 0000 |
| 0000357460 | 0020 | 0000 | 0000 | 0000 | 0000 | 0000 | 322E | 6634 |
| 0000357500 | 6B61 | 0065 | 0000 | 0000 | FFFE | 0008 | 010A | 0000 |
| 0000357520 | 0000 | 0000 | 0020 | 0000 | 0000 | 0962 | 0000 | 0000 |

THU MAR 14 17:37:32 1991 GSPMON.4 PAGE 131, LINE 7671

| | | | | | | | | |
|---|---|---|---|---|---|---|---|---|
| 0000357540 | 615F | 7474 | 0072 | 0000 | 0000 | 0000 | FFFF | 000D |
| 0000357560 | 0108 | 0000 | 0000 | 0000 | 0010 | 0000 | 0000 | 0000 |
| 0000357600 | 0000 | 0000 | 735F | 7274 | 7069 | 0000 | 0010 | 0000 |
| 0000357620 | FFFF | 000C | 0108 | 0000 | 0000 | 0000 | 0008 | 0000 |
| 0000357640 | 0000 | 0000 | 0000 | 0000 | 725F | 6365 | 0074 | 0000 |
| 0000357660 | 0018 | 0000 | FFFF | 000C | 0108 | 0000 | 0000 | 0000 |
| 0000357700 | 0008 | 0000 | 0000 | 0000 | 0000 | 0000 | 652E | 736F |
| 0000357720 | 0000 | 0000 | 0300 | 0000 | FFFE | 0008 | 0166 | 0958 |
| 0000357740 | 0000 | 0000 | 0020 | 0000 | 0000 | 0000 | 0000 | 0000 |
| 0000357760 | 322E | 6635 | 6B61 | 0065 | 0000 | 0000 | FFFE | 0008 |
| 0000360000 | 010A | 0000 | 0000 | 0000 | 1930 | 0000 | 0000 | 096E |
| 0000360020 | 0000 | 0000 | 0000 | 0000 | 0E94 | 0000 | 0000 | 0000 |
| 0000360040 | FFFF | 000D | 0108 | 0000 | 0000 | 0000 | 0010 | 0000 |
| 0000360060 | 0000 | 0000 | 0000 | 0000 | 785F | 0000 | 0000 | 0000 |
| 0000360100 | 0010 | 0000 | FFFF | 000D | 0108 | 0000 | 0000 | 0000 |
| 0000360120 | 0010 | 0000 | 0000 | 0000 | 0000 | 0000 | 795F | 0000 |
| 0000360140 | 0000 | 0000 | 0020 | 0000 | FFFF | 000D | 0108 | 0000 |
| 0000360160 | 0000 | 0000 | 0010 | 0000 | 0000 | 0000 | 0000 | 0000 |
| 0000360200 | 0000 | 0000 | 0E9E | 0000 | 0030 | 0000 | FFFF | 0038 |
| 0000360220 | 0108 | 0958 | 0000 | 0000 | 1900 | 00C8 | 0000 | 0000 |
| 0000360240 | 0000 | 0000 | 652E | 736F | 0000 | 0000 | 0000 | 0000 |
| 0000360260 | FFFE | 0008 | 0166 | 0962 | 0000 | 0000 | 1930 | 0000 |
| 0000360300 | 0000 | 0000 | 0000 | 0000 | 662E | 6C69 | 0065 | 0000 |
| 0000360320 | 0970 | 0000 | FFFE | 0000 | 0167 | 7067 | 6D5F | 756F |
| 0000360340 | 632E | 0000 | 0000 | 0000 | 0000 | 0000 | 662E | 6C69 |
| 0000360360 | 0065 | 0000 | 097C | 0000 | FFFE | 0000 | 0167 | 7067 |
| 0000360400 | 615F | 6C70 | 682E | 0000 | 0000 | 0000 | 0000 | 0000 |
| 0000360420 | 322E | 6636 | 6B61 | 0065 | 0000 | 0000 | FFFE | 0008 |
| 0000360440 | 010A | 0000 | 0000 | 0000 | 0030 | 0000 | 0000 | 097C |
| 0000360460 | 0000 | 0000 | 775F | 6469 | 6874 | 0000 | 0000 | 0000 |
| 0000360500 | FFFF | 000D | 0108 | 0000 | 0000 | 0000 | 0010 | 0000 |
| 0000360520 | 0000 | 0000 | 0000 | 0000 | 685F | 6965 | 6867 | 0074 |
| 0000360540 | 0010 | 0000 | FFFF | 000D | 0108 | 0000 | 0000 | 0000 |
| 0000360560 | 0010 | 0000 | 0000 | 0000 | 0000 | 0000 | 645F | 7065 |
| 0000360600 | 6874 | 0000 | 0020 | 0000 | FFFF | 000D | 0108 | 0000 |
| 0000360620 | 0000 | 0000 | 0010 | 0000 | 0000 | 0000 | 0000 | 0000 |
| 0000360640 | 652E | 736F | 0000 | 0000 | 0000 | 0000 | FFFE | 0008 |
| 0000360660 | 0166 | 0972 | 0000 | 0000 | 0030 | 0000 | 0000 | 0000 |
| 0000360700 | 0000 | 0000 | 662E | 6C69 | 0065 | 0000 | 097E | 0000 |
| 0000360720 | FFFE | 0000 | 0167 | 7067 | 615F | 6C70 | 692E | 636E |
| 0000360740 | 0000 | 0000 | 0000 | 0000 | 662E | 6C69 | 0065 | 0000 |
| 0000360760 | 0980 | 0000 | FFFE | 0000 | 0167 | 7067 | 615F | 6C70 |
| 0000361000 | 682E | 0000 | 0000 | 0000 | 0000 | 0000 | 662E | 6C69 |
| 0000361020 | 0065 | 0000 | 0B64 | 0000 | FFFE | 0000 | 0167 | 7067 |
| 0000361040 | 6D5F | 756F | 632E | 0000 | 0000 | 0000 | 0000 | 0000 |
| 0000361060 | 0000 | 0000 | 0EAA | 0000 | 8850 | FFC7 | 0003 | 0008 |
| 0000361100 | 0103 | 08FC | 0000 | 0000 | 0060 | 0000 | 0000 | 0000 |
| 0000361120 | 0000 | 0000 | 322E | 6637 | 6B61 | 0065 | 0000 | 0000 |
| 0000361140 | FFFE | 000A | 010F | 0000 | 0000 | 0000 | 0003 | 0000 |
| 0000361160 | 0000 | 0992 | 0000 | 0000 | 0000 | 0000 | 0EB5 | 0000 |
| 0000361200 | 0000 | 0000 | FFFF | 000B | 0110 | 0000 | 0000 | 0000 |
| 0000361220 | 0003 | 0000 | 0000 | 0000 | 0000 | 0000 | 0000 | 0000 |
| 0000361240 | 0EC6 | 0000 | 0001 | 0000 | FFFF | 000B | 0110 | 0000 |
| 0000361260 | 0000 | 0000 | 0003 | 0000 | 0000 | 0000 | 0000 | 0000 |
| 0000361300 | 0000 | 0000 | 0ED7 | 0000 | 0002 | 0000 | FFFF | 000B |
| 0000361320 | 0110 | 0000 | 0000 | 0000 | 0003 | 0000 | 0000 | 0000 |
| 0000361340 | 0000 | 0000 | 0000 | 0000 | 0EE3 | 0000 | 0003 | 0000 |
| 0000361360 | FFFF | 000B | 0110 | 0000 | 0000 | 0000 | 0003 | 0000 |
| 0000361400 | 0000 | 0000 | 0000 | 0000 | 0000 | 0000 | 0EEF | 0000 |

THU MAR 14 17:37:32 1991 GSPMON.4 PAGE 132, LINE 7730

| | | | | | | | | |
|---|---|---|---|---|---|---|---|---|
| 0000361420 | 0004 | 0000 | FFFF | 000B | 0110 | 0000 | 0000 | 0000 |
| 0000361440 | 0003 | 0000 | 0000 | 0000 | 0000 | 0000 | 652E | 736F |
| 0000361460 | 0000 | 0000 | 0000 | 0000 | FFFE | 000A | 0166 | 0984 |
| 0000361500 | 0000 | 0000 | 0003 | 0000 | 0000 | 0000 | 0000 | 0000 |
| 0000361520 | 322E | 6638 | 6B61 | 0065 | 0000 | 0000 | FFFE | 000A |
| 0000361540 | 010F | 0000 | 0000 | 0000 | 0002 | 0000 | 0000 | 099C |
| 0000361560 | 0000 | 0000 | 0000 | 0000 | 0F02 | 0000 | 0000 | 0000 |
| 0000361600 | FFFF | 000B | 0110 | 0000 | 0000 | 0000 | 0002 | 000C |
| 0000361620 | 0000 | 0000 | 0000 | 0000 | 0000 | 0000 | 0F0F | 0000 |
| 0000361640 | 0001 | 0000 | FFFF | 000B | 0110 | 0000 | 0000 | 0000 |
| 0000361660 | 0002 | 0000 | 0000 | 0000 | 0000 | 0000 | 4E5F | 4E4F |
| 0000361700 | 0045 | 0000 | 0002 | 0000 | FFFF | 000B | 0110 | 0000 |
| 0000361720 | 0000 | 0000 | 0002 | 0000 | 0000 | 0000 | 0000 | 0000 |
| 0000361740 | 652E | 736F | 0000 | 0000 | 0000 | 0000 | FFFE | 000A |
| 0000361760 | 0166 | 0992 | 0000 | 0000 | 0002 | 0000 | 0000 | 0000 |
| 0000362000 | 0000 | 0000 | 322E | 6639 | 6B61 | 0065 | 0000 | 0000 |
| 0000362020 | FFFE | 0008 | 010A | 0000 | 0000 | 0000 | 0030 | 0000 |
| 0000362040 | 0000 | 09A6 | 0000 | 0000 | 645F | 7369 | 0074 | 0000 |
| 0000362060 | 0000 | 0000 | FFFF | 000D | 0108 | 0000 | 0000 | 0000 |
| 0000362100 | 0010 | 0000 | 0000 | 0000 | 0000 | 0000 | 785F | 0000 |
| 0000362120 | 0000 | 0000 | 0010 | 0000 | FFFF | 000D | 0108 | 0000 |
| 0000362140 | 0000 | 0006 | 0010 | 0000 | 0000 | 0000 | 0000 | 0000 |
| 0000362160 | 795F | 0000 | 0000 | 0000 | 0020 | 0000 | FFFF | 000D |
| 0000362200 | 0108 | 0000 | 0000 | 0000 | 0010 | 0000 | 0000 | 0000 |
| 0000362220 | 0000 | 0000 | 652E | 736F | 0000 | 0000 | 0000 | 0000 |
| 0000362240 | FFFE | 0008 | 0166 | 099C | 0000 | 0000 | 0030 | 0000 |
| 0000362260 | 0000 | 0000 | 0000 | 0000 | 0000 | 0000 | 0F25 | 0000 |
| 0000362300 | 88B0 | FFC7 | 0003 | 000A | 0103 | 0984 | 0000 | 0000 |
| 0000362320 | 0003 | 0000 | 0000 | 0000 | 0000 | 0000 | 0000 | 0000 |
| 0000362340 | 0F3D | 0000 | 88C0 | FFC7 | 0003 | 000A | 0103 | 0992 |
| 0000362360 | 0000 | 0000 | 0002 | 0000 | 0000 | 0000 | 0000 | 0000 |
| 0000362400 | 0000 | 0000 | 0F53 | 0000 | 88D0 | FFC7 | 0003 | 0008 |
| 0000362420 | 0103 | 093C | 0000 | 0000 | 0020 | 0000 | 0000 | 0000 |
| 0000362440 | 0000 | 0000 | 0000 | 0000 | 0F5F | 0000 | 88F0 | FFC7 |
| 0000362460 | 0003 | 000D | 0103 | 0000 | 0000 | 0000 | 0010 | 0000 |
| 0000362500 | 0000 | 0000 | 0000 | 0000 | 0000 | 0000 | 0F71 | 0000 |
| 0000362520 | 8900 | FFC7 | 0003 | 0008 | 0103 | 092A | 0000 | 0000 |
| 0000362540 | 0070 | 0000 | 0000 | 0000 | 0000 | 0000 | 0000 | 0000 |
| 0000362560 | 0F81 | 0000 | 8970 | FFC7 | 0003 | 000D | 0103 | 0000 |
| 0000362600 | 0000 | 0000 | 0010 | 0000 | 0000 | 0000 | 0000 | 0000 |
| 0000362620 | 0000 | 0000 | 0F92 | 0000 | 8980 | FFC7 | 0003 | 000D |
| 0000362640 | 0103 | 0000 | 0000 | 0000 | 0010 | 0000 | 0000 | 0000 |
| 0000362660 | 0000 | 0000 | 0000 | 0000 | 0F9E | 0000 | 8990 | FFC7 |
| 0000362700 | 0003 | 000D | 0103 | 0000 | 0000 | 0000 | 0010 | 0000 |
| 0000362720 | 0000 | 0000 | 0000 | 0000 | 0000 | 0000 | 0FB3 | 0000 |
| 0000362740 | 89A0 | FFC7 | 0003 | 000D | 0103 | 0000 | 0000 | 0000 |
| 0000362760 | 0010 | 0000 | 0000 | 0000 | 0000 | 0000 | 0000 | 0000 |
| 0000363000 | 0FC7 | 0000 | 89B0 | FFC7 | 0003 | 000D | 0103 | 0000 |
| 0000363020 | 0000 | 0000 | 0010 | 0000 | 0000 | 0000 | 0000 | 0000 |
| 0000363040 | 0000 | 0000 | 0FDA | 0000 | 89C0 | FFC7 | 0003 | 000D |
| 0000363060 | 0103 | 0000 | 0000 | 0000 | 0010 | 0000 | 0000 | 0000 |
| 0000363100 | 0000 | 0000 | 695F | 6F63 | 006E | 0000 | 89D0 | FFC7 |
| 0000363120 | 0003 | 0008 | 0103 | 0920 | 0000 | 0000 | 0030 | 0000 |
| 0000363140 | 0000 | 0000 | 0000 | 0000 | 0000 | 0000 | 0FEE | 0000 |
| 0000363160 | 8A00 | FFC7 | 0003 | 0008 | 0103 | 092A | 0000 | 0000 |
| 0000363200 | 0070 | 0000 | 0000 | 0000 | 0000 | 0000 | 0000 | 0000 |
| 0000363220 | 1002 | 0000 | 8A70 | FFC7 | 0003 | 0008 | 0103 | 092A |
| 0000363240 | 0000 | 0000 | 0070 | 0000 | 0000 | 0000 | 0000 | 0000 |
| 0000363260 | 0000 | 0000 | 1016 | 0000 | 8AE0 | FFC7 | 0003 | 003F |

THU MAR 14 17:37:32 1991 GSPMON.4 PAGE 133, LINE 7789

| | | | | | | | | |
|---|---|---|---|---|---|---|---|---|
| 0000363300 | 0103 | 0000 | 0000 | 0000 | 0400 | 0020 | 0000 | 0000 |
| 0000363320 | 0000 | 0000 | 0000 | 0000 | 1029 | 0000 | 8EE0 | FFC7 |
| 0000363340 | 0003 | 003F | 0103 | 0000 | 0000 | 0000 | 0400 | 0020 |
| 0000363360 | 0000 | 0000 | 0000 | 0000 | 0000 | 0000 | 103F | 0000 |
| 0000363400 | 92E0 | FFC7 | 0003 | 00FF | 0103 | 0000 | 0000 | 0000 |
| 0000363420 | 1000 | 0004 | 0020 | 0000 | 0000 | 0000 | 0000 | 0000 |
| 0000363440 | 1050 | 0000 | A2E0 | FFC7 | 0003 | 003F | 0103 | 0000 |
| 0000363460 | 0000 | 0000 | 0400 | 0020 | 0000 | 0000 | 0000 | 0000 |
| 0000363500 | 0000 | 0000 | 1062 | 0000 | A6E0 | FFC7 | 0003 | 003F |
| 0000363520 | 0103 | 0000 | 0000 | 0000 | 0400 | 0020 | 0000 | 0000 |
| 0000363540 | 0000 | 0000 | 0000 | 0000 | 1072 | 0000 | AAE0 | FFC7 |
| 0000363560 | 0003 | 00DF | 0103 | 0000 | 0000 | 0000 | 0020 | 0020 |
| 0000363600 | 0000 | 0000 | 0000 | 0000 | 0000 | 0000 | 1083 | 0000 |
| 0000363620 | AB00 | FFC7 | 0003 | 000D | 0103 | 0000 | 0000 | 0000 |
| 0000363640 | 0010 | 0000 | 0000 | 0000 | 0000 | 0000 | 0000 | 0000 |
| 0000363660 | 1098 | 0000 | AB10 | FFC7 | 0003 | 000F | 0103 | 0000 |
| 0000363700 | 0000 | 0000 | 0020 | 0000 | 0000 | 0000 | 0000 | 0000 |
| 0000363720 | 645F | 6D75 | 796D | 0000 | AB30 | FFC7 | 0003 | 0004 |
| 0000363740 | 0103 | 0000 | 0000 | 0000 | 0020 | 0000 | 0000 | 0000 |
| 0000363760 | 0000 | 0000 | 0000 | 0000 | 10A3 | 0000 | AB50 | FFC7 |
| 0000364000 | 0003 | 000D | 0103 | 0000 | 0000 | 0000 | 0010 | 0000 |
| 0000364020 | 0000 | 0000 | 0000 | 0000 | 0000 | 0000 | 10AD | 0000 |
| 0000364040 | AB60 | FFC7 | 0003 | 000D | 0103 | 0000 | 0000 | 0000 |
| 0000364060 | 0010 | 0000 | 0000 | 0000 | 0000 | 0000 | 0000 | 0000 |
| 0000364100 | 10B8 | 0000 | AB70 | FFC7 | 0003 | 000D | 0103 | 0000 |
| 0000364120 | 0000 | 0000 | 0010 | 0000 | 0000 | 0000 | 0000 | 0000 |
| 0000364140 | 0000 | 0000 | 10C2 | 0000 | AB80 | FFC7 | 0003 | 00F8 |
| 0000364160 | 0103 | 0950 | 0000 | 0000 | 9000 | 0064 | 0020 | 0000 |
| 0000364200 | 0000 | 0000 | 0000 | 0000 | 10CF | 0000 | 3B80 | FFC9 |
| 0000364220 | 0003 | 0008 | 0103 | 095A | 0000 | 0000 | 1930 | 0000 |
| 0000364240 | 0000 | 0000 | 0000 | 0000 | 0000 | 0000 | 10DA | 0000 |
| 0000364260 | 54B0 | FFC9 | 0003 | 000F | 0103 | 0000 | 0000 | 0000 |
| 0000364300 | 0020 | 0000 | 0000 | 0000 | 0000 | 0000 | 0000 | 0000 |
| 0000364320 | 10E6 | 0000 | 54D0 | FFC9 | 0003 | 000F | 0103 | 0000 |
| 0000364340 | 0000 | 000C | 0020 | 0000 | 0000 | 0000 | 0000 | 0000 |
| 0000364360 | 0000 | 0000 | 10F3 | 0000 | 0500 | FFC1 | 0001 | 0020 |
| 0000364400 | 0103 | 0000 | 0000 | 1630 | 0000 | E9FC | 0000 | 09F8 |
| 0000364420 | 0000 | 0003 | 622E | 0066 | 0000 | 0000 | 0500 | FFC1 |
| 0000364440 | 0001 | 0000 | 0165 | 0000 | 0000 | 0119 | 0000 | 0000 |
| 0000364460 | 0000 | 02D2 | 0000 | 0000 | 622E | 0062 | 0000 | 0000 |
| 0000364500 | 0B30 | FFC1 | 0001 | 0000 | 0164 | 0000 | 0000 | 001A |
| 0000364520 | 0000 | 0000 | 0000 | 09F6 | 0000 | 0000 | 695F | 0000 |
| 0000364540 | 0000 | 0000 | 0000 | 0000 | FFFF | 000D | 0101 | 0000 |
| 0000364560 | 0000 | 0000 | 0010 | 0000 | 0000 | 0000 | 0000 | 0000 |
| 0000364600 | 6A5F | 0000 | 0000 | 0000 | 0010 | 0000 | FFFF | 000D |
| 0000364620 | 0101 | 0000 | 0000 | 0000 | 0010 | 0000 | 0000 | 0000 |
| 0000364640 | 0000 | 0000 | 0000 | 0000 | 1109 | 0000 | 0020 | 0000 |
| 0000364660 | FFFF | 000F | 0101 | 0000 | 0000 | 0000 | 0020 | 0000 |
| 0000364700 | 0000 | 0000 | 0000 | 0000 | 0000 | 0000 | 111A | 0000 |
| 0000364720 | 0040 | 0000 | FFFF | 000F | 0101 | 0000 | 0000 | 0000 |
| 0000364740 | 0020 | 0000 | 0000 | 0000 | 0000 | 0000 | 745F | 6D65 |
| 0000364760 | 0070 | 0000 | 0060 | 0000 | FFFF | 000F | 0101 | 0000 |
| 0000365000 | 0000 | 0000 | 0020 | 0000 | 0000 | 0000 | 0000 | 0000 |
| 0000365020 | 625F | 7361 | 0065 | 0000 | 0080 | 0000 | FFFF | 000F |
| 0000365040 | 0101 | 0000 | 0000 | 0000 | 0020 | 0000 | 0000 | 0000 |
| 0000365060 | 0000 | 0000 | 652E | 0062 | 0000 | 0000 | 1A20 | FFC1 |
| 0000365100 | 0001 | 0000 | 0164 | 0000 | 0000 | 003D | 0000 | 0000 |
| 0000365120 | 0000 | 0000 | 0000 | 0000 | 652E | 0066 | 0000 | 0000 |
| 0000365140 | 1B30 | FFC1 | 0001 | 0000 | 0165 | 0000 | 0000 | 015C |

THU MAR 14 17:37:32 1991 GSPMON.4 PAGE 134, LINE 7848

| | | | | | | | | |
|---|---|---|---|---|---|---|---|---|
| 0000365160 | 0000 | 0000 | 0000 | 0000 | 0000 | 0000 | 0000 | 0000 |
| 0000365200 | 112C | 0000 | 1B30 | FFC1 | 0001 | 0020 | 0103 | 0000 |
| 0000365220 | 0000 | 2420 | 0000 | EB16 | 0000 | 0A08 | 0000 | 0002 |
| 0000365240 | 622E | 0066 | 0000 | 0000 | 1B30 | FFC1 | 0001 | 0000 |
| 0000365260 | 0165 | 0000 | 0000 | 0162 | 0000 | 0000 | 0000 | 02E2 |
| 0000365300 | 0000 | 0000 | 0000 | 0000 | 1142 | 0000 | 54F0 | FFC9 |
| 0000365320 | 0003 | 000D | 0103 | 0000 | 0000 | 0000 | 0010 | 0000 |
| 0000365340 | 0000 | 0000 | 0000 | 0000 | 0000 | 0000 | 1157 | 0000 |
| 0000365360 | 5500 | FFC9 | 0003 | 000D | 0103 | 0000 | 0000 | 0000 |
| 0000365400 | 0010 | 0000 | 0000 | 0000 | 0000 | 0000 | 0000 | 0000 |
| 0000365420 | 1169 | 0000 | 5510 | FFC9 | 0003 | 000D | 0103 | 0000 |
| 0000365440 | 0000 | 0000 | 0010 | 0000 | 0000 | 0000 | 0000 | 0000 |
| 0000365460 | 0000 | 0000 | 1178 | 0000 | 5520 | FFC9 | 0003 | 000D |
| 0000365500 | 0103 | 0000 | 0000 | 0000 | 0010 | 0000 | 0000 | 0000 |
| 0000365520 | 0000 | 0000 | 0000 | 0000 | 1184 | 0000 | 5530 | FFC9 |
| 0000365540 | 0003 | 000A | 0103 | 073A | 0000 | 0000 | 0001 | 0000 |
| 0000365560 | 0000 | 0000 | 0000 | 0000 | 652E | 0066 | 0000 | 0000 |
| 0000365600 | 3F50 | FFC1 | 0001 | 0000 | 0165 | 0000 | 0000 | 0229 |
| 0000365620 | 0000 | 0000 | 0000 | 0000 | 0000 | 0000 | 0000 | 0000 |
| 0000365640 | 1195 | 0000 | 3F50 | FFC1 | 0001 | 0020 | 0103 | 0000 |
| 0000365660 | 0000 | 14A0 | 0000 | ED80 | 0000 | 0A10 | 0000 | 0003 |
| 0000365700 | 622E | 0066 | 0000 | 0000 | 3F50 | FFC1 | 0001 | 0000 |
| 0000365720 | 0165 | 0000 | 0000 | 022F | 0000 | 0000 | 0000 | 02EA |
| 0000365740 | 0000 | 0000 | 695F | 0000 | 0000 | 0000 | 0000 | 0000 |
| 0000365760 | FFFF | 000D | 0101 | 0000 | 0000 | 0000 | 0010 | 0000 |
| 0000366000 | 0000 | 0000 | 0000 | 0000 | 652E | 0066 | 0000 | 0000 |
| 0000366020 | 53F0 | FFC1 | 0001 | 0000 | 0165 | 0000 | 0000 | 0291 |
| 0000366040 | 0000 | 0000 | 0000 | 0000 | 0000 | 0000 | 0000 | 0000 |
| 0000366060 | 11A9 | 0000 | 53F0 | FFC1 | 0001 | 002D | 0103 | 0000 |
| 0000366100 | 0000 | 03E0 | 0000 | EEA6 | 0000 | 0A1C | 0000 | 0003 |
| 0000366120 | 622E | 0066 | 0000 | 0000 | 53F0 | FFC1 | 0001 | 0000 |
| 0000366140 | 0165 | 0000 | 0000 | 02A1 | 0000 | 0000 | 0000 | 02F6 |
| 0000366160 | 0000 | 0000 | 665F | 7269 | 7473 | 0000 | 0000 | 0000 |
| 0000366200 | FFFF | 0003 | 0101 | 0000 | 0000 | 0000 | 0010 | 0000 |
| 0000366220 | 0000 | 0000 | 0000 | 0000 | 6C5F | 7361 | 0074 | 0000 |
| 0000366240 | 0010 | 0000 | FFFF | 0003 | 0101 | 0000 | 0000 | 0000 |
| 0000366260 | 0010 | 0000 | 0000 | 0000 | 0000 | 0000 | 695F | 000D |
| 0000366300 | 0000 | 0000 | 0020 | 0000 | FFFF | 0003 | 0101 | 0000 |
| 0000366320 | 0000 | 0000 | 0010 | 0000 | 0000 | 0000 | 0000 | 0000 |
| 0000366340 | 652E | 0066 | 0000 | 0000 | 57D0 | FFC1 | 0001 | 0000 |
| 0000366360 | 0165 | 0000 | 0000 | 02B1 | 0000 | 0000 | 0000 | 0000 |
| 0000366400 | 0000 | 0000 | 0000 | 0000 | 11BF | 0000 | 57D0 | FFC1 |
| 0000366420 | 0001 | 0020 | 0103 | 0000 | 0000 | 0B80 | 0000 | EEE2 |
| 0000366440 | 0000 | 0A36 | 0000 | 0003 | 622E | 0066 | 0000 | 0000 |
| 0000366460 | 57D0 | FFC1 | 0001 | 0000 | 0165 | 0000 | 0000 | 02B3 |
| 0000366500 | 0000 | 0000 | 0000 | 0310 | 0000 | 0000 | 665F | 7269 |
| 0000366520 | 7473 | 0000 | FFE0 | FFFF | FFFF | 0003 | 0109 | 0000 |
| 0000366540 | 0000 | 0000 | 0010 | 0000 | 0000 | 000D | 0000 | 0000 |
| 0000366560 | 6C5F | 7361 | 0074 | 0000 | FFC0 | FFFF | FFFF | 0003 |
| 0000366600 | 0109 | 0000 | 0000 | 0000 | 0010 | 0000 | 0000 | 0000 |
| 0000366620 | 0000 | 0000 | 6D5F | 6469 | 0000 | 0000 | 0000 | 0000 |
| 0000366640 | FFFF | 0003 | 0101 | 0000 | 0000 | 0000 | 0010 | 0000 |
| 0000366660 | 0000 | 0000 | 0000 | 0000 | 0000 | 0000 | 11D4 | 0000 |
| 0000366700 | 0010 | 0000 | FFFF | 000F | 0101 | 0000 | 0000 | 0000 |
| 0000366720 | 0020 | 0000 | 0000 | 0000 | 0000 | 0000 | 0000 | 0000 |
| 0000366740 | 11E4 | 0000 | 0030 | 0000 | FFFF | 000F | 0101 | 0000 |
| 0000366760 | 0000 | 0000 | 0020 | 0000 | 0000 | 0000 | 0000 | 0000 |
| 0000367000 | 695F | 0000 | 0000 | 0000 | 0050 | 0000 | FFFF | 0003 |
| 0000367020 | 0101 | 0000 | 0000 | 0000 | 0010 | 0000 | 0000 | 0000 |

THU MAR 14 17:37:32 1991 GSPMON.4 PAGE 135, LINE 7907

| | | | | | | | | |
|---|---|---|---|---|---|---|---|---|
| 0000367040 | 0000 | 0000 | 0000 | 0000 | 11F5 | 0000 | 0060 | 0000 |
| 0000367060 | FFFF | 0003 | 0101 | 0000 | 0000 | 0000 | 0010 | 0000 |
| 0000367100 | 0000 | 0000 | 0000 | 0000 | 0000 | 0000 | 1200 | 0000 |
| 0000367120 | 0070 | 0000 | FFFF | 0003 | 0101 | 0000 | 0000 | 0000 |
| 0000367140 | 0010 | 0000 | 0000 | 0000 | 0000 | 0000 | 0000 | 0000 |
| 0000367160 | 120A | 0000 | 0080 | 0000 | FFFF | 000F | 0101 | 0000 |
| 0000367200 | 0000 | 0000 | 0020 | 0000 | 0000 | 0000 | 0000 | 0000 |
| 0000367220 | 0000 | 0000 | 1214 | 0000 | 00A0 | 0000 | FFFF | 000F |
| 0000367240 | 0101 | 0000 | 0000 | 0000 | 0020 | 0000 | 0000 | 0000 |
| 0000367260 | 0000 | 0000 | 652E | 0066 | 0000 | 0000 | 6350 | FFC1 |
| 0000367300 | 0001 | 0000 | 0165 | 0000 | 0000 | 02E1 | 0000 | 0000 |
| 0000367320 | 0000 | 0000 | 0000 | 0000 | 0000 | 0000 | 121F | 0000 |
| 0000367340 | 6350 | FFC1 | 0001 | 0020 | 0103 | 0000 | 0000 | 08D0 |
| 0000367360 | 0000 | EF66 | 0000 | 0A4E | 0000 | 0004 | 622E | 0066 |
| 0000367400 | 0000 | 0000 | 6350 | FFC1 | 0001 | 0000 | 0165 | 0000 |
| 0000367420 | 0000 | 02E2 | 0000 | 0000 | 0000 | 0328 | 0000 | 0000 |
| 0000367440 | 735F | 7274 | 7069 | 0000 | FFE0 | FFFF | FFFF | 0003 |
| 0000367460 | 0109 | 0000 | 0000 | 0000 | 0010 | 0000 | 0000 | 0000 |
| 0000367500 | 0000 | 0000 | 665F | 7269 | 7473 | 0000 | FFC0 | FFFF |
| 0000367520 | FFFF | 0003 | 0109 | 0000 | 0000 | 0000 | 0010 | 0000 |
| 0000367540 | 0000 | 0000 | 0000 | 0000 | 6C5F | 7361 | 0074 | 0000 |
| 0000367560 | FFA0 | FFFF | FFFF | 0003 | 0109 | 0000 | 0000 | 0000 |
| 0000367600 | 0010 | 0000 | 0000 | 0000 | 0000 | 0000 | 0000 | 0000 |
| 0000367620 | 1233 | 0000 | FF80 | FFFF | FFFF | 0003 | 0109 | 0000 |
| 0000367640 | 0000 | 0000 | 0010 | 0000 | 0000 | 0000 | 0000 | 0000 |
| 0000367660 | 0000 | 0000 | 123E | 0000 | FF60 | FFFF | FFFF | 0003 |
| 0000367700 | 0109 | 0000 | 0000 | 0000 | 0010 | 0000 | 0000 | 0000 |
| 0000367720 | 0000 | 0000 | 6D5F | 6469 | 0000 | 0000 | 0000 | 0000 |
| 0000367740 | FFFF | 0003 | 0101 | 0000 | 0000 | 0000 | 0010 | 0000 |
| 0000367760 | 0000 | 0000 | 0000 | 0000 | 0000 | 0000 | 1248 | 0000 |
| 0000370000 | 0010 | 0000 | FFFF | 000F | 0101 | 0000 | 0000 | 0000 |
| 0000370020 | 0020 | 0000 | 0000 | 0000 | 0000 | 0000 | 695F | 0000 |
| 0000370040 | 0000 | 0000 | 0030 | 0000 | FFFF | 0003 | 0101 | 0000 |
| 0000370060 | 0000 | 0000 | 0010 | 0000 | 0000 | 0000 | 0000 | 0000 |
| 0000370100 | 6D5F | 6469 | 655F | 7272 | 0040 | 0000 | FFFF | 0003 |
| 0000370120 | 0101 | 0000 | 0000 | 0000 | 0010 | 0000 | 0000 | 0000 |
| 0000370140 | 0000 | 0000 | 652E | 0066 | 0000 | 0000 | 6C20 | FFC1 |
| 0000370160 | 0001 | 0000 | 0165 | 0000 | 0000 | 0301 | 0000 | 0000 |
| 0000370200 | 0000 | 0000 | 0000 | 0000 | 0000 | 0000 | 1256 | 0000 |
| 0000370220 | 6C20 | FFC1 | 0001 | 0020 | 0103 | 0000 | 0000 | 0240 |
| 0000370240 | 0000 | EFC6 | 0000 | 0A58 | 0000 | 0003 | 622E | 0066 |
| 0000370260 | 0000 | 0000 | 6C20 | FFC1 | 0001 | 0000 | 0165 | 0000 |
| 0000370300 | 0000 | 0307 | 0000 | 0000 | 0000 | 0332 | 0000 | 0000 |
| 0000370320 | 6D5F | 7265 | 6567 | 0000 | FFE0 | FFFF | FFFF | 000A |
| 0000370340 | 0109 | 073A | 0000 | 0000 | 0001 | 0000 | 0000 | 0000 |
| 0000370360 | 0000 | 0000 | 695F | 0000 | 0000 | 0000 | 0000 | 0000 |
| 0000370400 | FFFF | 000D | 0101 | 0000 | 0000 | 0000 | 0010 | 0000 |
| 0000370420 | 0000 | 0000 | 0000 | 0000 | 652E | 0066 | 0000 | 000D |
| 0000370440 | 6E60 | FFC1 | 0001 | 0000 | 0165 | 0000 | 0000 | 030E |
| 0000370460 | 0000 | 0000 | 0000 | 0000 | 0000 | 0000 | 0000 | 0000 |
| 0000370500 | 1269 | 0000 | 6E60 | FFC1 | 0001 | 0020 | 0102 | 0000 |
| 0000370520 | 0000 | 2DC0 | 0000 | EFDE | 0000 | 0A8C | 0000 | 0004 |
| 0000370540 | 622E | 0066 | 0000 | 0000 | 6E60 | FFC1 | 0001 | 0000 |
| 0000370560 | 0165 | 0000 | 0000 | 031E | 0000 | 0000 | 0000 | 0366 |
| 0000370600 | 0000 | 0000 | 6F5F | 6666 | 6573 | 0074 | FFE0 | FFFF |
| 0000370620 | FFFF | 000D | 0109 | 0000 | 0000 | 0000 | 0010 | 0000 |
| 0000370640 | 0000 | 0000 | 0000 | 0000 | 6D5F | 7265 | 6567 | 0000 |
| 0000370660 | FFC0 | FFFF | FFFF | 000A | 0109 | 073A | 0000 | 0000 |
| 0000370700 | 0001 | 0000 | 0000 | 0000 | 0000 | 0000 | 615F | 7264 |

THU MAR 14 17:37:32 1991 GSPMON.4 PAGE 136, LINE 7966

| | | | | | | | | |
|---|---|---|---|---|---|---|---|---|
| 0000370720 | 0000 | 0000 | 0000 | 0000 | FFFF | 000F | 0101 | 0000 |
| 0000370740 | 0000 | 0000 | 0020 | 0000 | 0000 | 0000 | 0000 | 0000 |
| 0000370760 | 0000 | 0000 | 127B | 0000 | 0020 | 0000 | FFFF | 000F |
| 0000371000 | 0101 | 0000 | 0000 | 0000 | 0020 | 0000 | 0000 | 0000 |
| 0000371020 | 0000 | 0000 | 0000 | 0000 | 1285 | 0000 | 0040 | 0000 |
| 0000371040 | FFFF | 000F | 0101 | 0000 | 0000 | 0000 | 0020 | 0000 |
| 0000371060 | 0000 | 0000 | 0000 | 0000 | 0000 | 0000 | 1294 | 0000 |
| 0000371100 | 0060 | 0000 | FFFF | 000F | 0101 | 0000 | 0000 | 0000 |
| 0000371120 | 0020 | 0000 | 0000 | 0000 | 0000 | 0000 | 0000 | 0000 |
| 0000371140 | 129E | 0000 | 0080 | 0000 | FFFF | 000F | 0101 | 0000 |
| 0000371160 | 0000 | 0000 | 0020 | 0000 | 0000 | 0000 | 0000 | 0000 |
| 0000371200 | 735F | 7274 | 7069 | 0000 | 00A0 | 0000 | FFFF | 000D |
| 0000371220 | 0101 | 0000 | 0000 | 0000 | 0010 | 0000 | 0000 | 0000 |
| 0000371240 | 0000 | 0000 | 725F | 6365 | 0074 | 0000 | 00B0 | 0000 |
| 0000371260 | FFFF | 000D | 0101 | 0000 | 0000 | 0000 | 0010 | 0000 |
| 0000371300 | 0000 | 0000 | 0000 | 0000 | 695F | 0000 | 0000 | 0000 |
| 0000371320 | 00C0 | 0000 | FFFF | 000D | 0101 | 0000 | 0000 | 0000 |
| 0000371340 | 0010 | 0000 | 0000 | 0000 | 0000 | 0000 | 6A5F | 0000 |
| 0000371360 | 0000 | 0000 | 00D0 | 0000 | FFFF | 000D | 0101 | 0000 |
| 0000371400 | 0000 | 0000 | 0010 | 0000 | 0000 | 0000 | 0000 | 0000 |
| 0000371420 | 0000 | 0000 | 12A9 | 0000 | 00E0 | 0000 | FFFF | 000C |
| 0000371440 | 0101 | 0000 | 0000 | 0000 | 0008 | 0000 | 0000 | 0000 |
| 0000371460 | 0000 | 0000 | 0000 | 0000 | 12B5 | 0000 | 00F0 | 0000 |
| 0000371500 | FFFF | 000C | 0101 | 0000 | 0000 | 0000 | 0008 | 0000 |
| 0000371520 | 0000 | 0000 | 0000 | 0000 | 0000 | 0000 | 12C0 | 0000 |
| 0000371540 | 0100 | 0000 | FFFF | 000C | 0101 | 0000 | 0000 | 0000 |
| 0000371560 | 0008 | 0000 | 0000 | 0000 | 0000 | 0000 | 0000 | 0000 |
| 0000371600 | 12CB | 0000 | 0110 | 0000 | FFFF | 000C | 0101 | 0000 |
| 0000371620 | 0000 | 0000 | 0008 | 0000 | 0000 | 0000 | 0000 | 0000 |
| 0000371640 | 695F | 646E | 7865 | 0000 | 0120 | 0000 | FFFF | 000D |
| 0000371660 | 0101 | 0000 | 0000 | 0000 | 0010 | 0000 | 0000 | 0000 |
| 0000371700 | 0000 | 0000 | 655F | 7272 | 765F | 6C61 | 0130 | 0000 |
| 0000371720 | FFFF | 003D | 0101 | 0000 | 0000 | 0000 | 0050 | 0005 |
| 0000371740 | 0000 | 0000 | 0000 | 0000 | 655F | 7272 | 615F | 7264 |
| 0000371760 | 0180 | 0000 | FFFF | 000F | 0101 | 0000 | 0000 | 0000 |
| 0000372000 | 0020 | 0000 | 0000 | 0000 | 0000 | 0000 | 655F | 7272 |
| 0000372020 | 695F | 636E | 01A0 | 0000 | FFFF | 000D | 0101 | 0000 |
| 0000372040 | 0000 | 0000 | 0010 | 0000 | 0000 | 0000 | 0000 | 0000 |
| 0000372060 | 655F | 7272 | 705F | 7869 | 01B0 | 0000 | FFFF | 000D |
| 0000372100 | 0101 | 0000 | 0000 | 0000 | 0010 | 0000 | 0000 | 0000 |
| 0000372120 | 0000 | 0000 | 655F | 7272 | 635F | 6C6F | 01C0 | 0000 |
| 0000372140 | FFFF | 000D | 0101 | 0000 | 0000 | 0000 | 0010 | 0000 |
| 0000372160 | 0000 | 0000 | 0000 | 0000 | 0000 | 0000 | 12D5 | 0000 |
| 0000372200 | 5540 | FFC9 | 0003 | 003C | 0103 | 0000 | 0000 | 0000 |
| 0000372220 | 0080 | 0010 | 0000 | 0000 | 0000 | 0000 | 0000 | 0000 |
| 0000372240 | 12E4 | 0000 | 55C0 | FFC9 | 0003 | 003C | 0103 | 0000 |
| 0000372260 | 0000 | 0000 | 0080 | 0010 | 0000 | 0000 | 0000 | 0000 |
| 0000372300 | 652E | 0066 | 0000 | 0000 | 9C20 | FFC1 | 0001 | 0000 |
| 0000372320 | 0165 | 0000 | 0000 | 0396 | 0000 | 0000 | 0000 | 0000 |
| 0000372340 | 0000 | 0000 | 0000 | 0000 | 12F2 | 0000 | 9C20 | FFC1 |
| 0000372360 | 0001 | 002D | 0103 | 0000 | 0000 | 02E0 | 0000 | F17C |
| 0000372400 | 0000 | 0A96 | 0000 | 0004 | 622E | 0066 | 0000 | 0000 |
| 0000372420 | 9C20 | FFC1 | 0001 | 0000 | 0165 | 0000 | 0000 | 0398 |
| 0000372440 | 0000 | 0000 | 0000 | 0370 | 0000 | 0000 | 6C5F | 7361 |
| 0000372460 | 0074 | 0000 | 0000 | 0000 | FFFF | 0003 | 0101 | 0000 |
| 0000372500 | 0000 | 0000 | 0010 | 0000 | 0000 | 0000 | 0000 | 0000 |
| 0000372520 | 695F | 0000 | 0000 | 0000 | 0010 | 0000 | FFFF | 0003 |
| 0000372540 | 0101 | 0000 | 0000 | 0000 | 0010 | 0000 | 0000 | 0000 |
| 0000372560 | 0000 | 0000 | 652E | 0066 | 0000 | 0000 | 9F00 | FFC1 |

THU MAR 14 17:37:32 1991 GSPMON.4 PAGE 137, LINE 8025

| | | | | | | | | |
|---|---|---|---|---|---|---|---|---|
| 0000372600 | 0001 | 0000 | 0165 | 0000 | 0000 | 03A0 | 0000 | 0000 |
| 0000372620 | 0000 | 0000 | 0000 | 0000 | 0000 | 0000 | 1305 | 0000 |
| 0000372640 | 9F00 | FFC1 | 0001 | 002D | 0103 | 0000 | 0000 | 1570 |
| 0000372660 | 0000 | F19A | 0000 | DAAC | 0000 | 0004 | 622E | 0066 |
| 0000372700 | 0000 | 0000 | 9F00 | FFC1 | 0001 | 0000 | 0165 | 0000 |
| 0000372720 | 0000 | 03A5 | 0000 | 0000 | 0000 | 0386 | 0000 | 0000 |
| 0000372740 | 0000 | 0000 | 1319 | 0000 | FFE0 | FFFF | FFFF | 00DF |
| 0000372760 | 0109 | 0000 | 0000 | 0000 | 0020 | 0020 | 0000 | 0000 |
| 0000373000 | 0000 | 0000 | 0000 | 0000 | 132A | 0000 | FFC0 | FFFF |
| 0000373020 | FFFF | 001F | 0109 | 0000 | 0000 | 0000 | 0020 | 0000 |
| 0000373040 | D000 | 0000 | 0000 | 0000 | 0000 | 0000 | 133A | 0000 |
| 0000373060 | FFA0 | FFFF | FFFF | 001D | 0109 | 0000 | 0000 | 0000 |
| 0000373100 | 0020 | 0000 | 0000 | 0000 | 0000 | 0000 | 695F | 0000 |
| 0000373120 | 0000 | 0000 | 0000 | 0000 | FFFF | 000D | 0101 | 0000 |
| 0000373140 | 0000 | 0000 | 0010 | 0000 | 0000 | 0000 | 0000 | 0000 |
| 0000373160 | 6A5F | 0000 | 0000 | 0000 | 0010 | 0000 | FFFF | 000D |
| 0000373200 | 0101 | 0000 | 0000 | 0000 | 0010 | 0000 | 0000 | 0000 |
| 0000373220 | 0000 | 0000 | 745F | 6D65 | 0070 | 0000 | 0020 | 0000 |
| 0000373240 | FFFF | 000F | 0101 | 0000 | 0000 | 0000 | 0020 | 0000 |
| 0000373260 | 0000 | 0000 | 0000 | 0000 | 0000 | 0000 | 1348 | 0000 |
| 0000373300 | 0040 | 0000 | FFFF | 003F | 0101 | 0000 | 0000 | 0000 |
| 0000373320 | 0400 | 0020 | 0000 | 0000 | 0000 | 0000 | 0000 | 0000 |
| 0000373340 | 1352 | 0000 | 0440 | 0000 | FFFF | 003F | 0101 | 0000 |
| 0000373360 | 0000 | 0000 | 0400 | 0020 | 0000 | 0000 | 0000 | 0000 |
| 0000373400 | 652E | 0066 | 0000 | 0000 | B470 | FFC1 | 0001 | 0000 |
| 0000373420 | 0165 | 0000 | 0000 | 03EA | 0000 | 0000 | 0000 | 0000 |
| 0000373440 | 0000 | 0000 | 0000 | 0000 | 135D | 0000 | B470 | FFC1 |
| 0000373460 | 0001 | 002D | 0103 | 0000 | 0000 | 21D0 | 0000 | F2B4 |
| 0000373500 | 0000 | DACC | 0000 | 0005 | 622E | 0066 | 0000 | 0000 |
| 0000373520 | B470 | FFC1 | 0001 | 0000 | 0165 | 0000 | 0000 | 03F0 |
| 0000373540 | 0000 | 0000 | 0000 | 03A6 | 0000 | 0000 | 785F | 0000 |
| 0000373560 | 0000 | 0000 | FFE0 | FFFF | FFFF | 0003 | 0109 | 0000 |
| 0000373600 | 0000 | 0000 | 0010 | 0000 | 0000 | 0000 | 0000 | 0000 |
| 0000373620 | 795F | 0000 | 0000 | 0000 | FFC0 | FFFF | FFFF | 0003 |
| 0000373640 | 0109 | 0000 | 0000 | 0000 | 0010 | 0000 | 0000 | 0000 |
| 0000373660 | 0000 | 0000 | 0000 | 0000 | 136F | 0000 | FFA0 | FFFF |
| 0000373700 | FFFF | 0018 | 0109 | 095A | 0000 | 0000 | 0020 | 0000 |
| 0000373720 | 0000 | 0000 | 0000 | 0000 | 735F | 6E69 | 3164 | 0000 |
| 0000373740 | 5640 | FFC9 | 0003 | 000D | 0103 | 0000 | 0000 | 0000 |
| 0000373760 | 0010 | 0000 | 0000 | 0000 | 0000 | 0000 | 735F | 6E69 |
| 0000374000 | 3264 | 0000 | 5650 | FFC9 | 0003 | 000D | 0103 | 0000 |
| 0000374020 | 0000 | 0000 | 0010 | 0000 | 0000 | 0000 | 0000 | 0000 |
| 0000374040 | 695F | 0000 | 0000 | 0000 | 0000 | 0000 | FFFF | 000D |
| 0000374060 | 0101 | 0000 | 0000 | 0000 | 0010 | 0000 | 0000 | 0000 |
| 0000374100 | D000 | 0000 | 6A5F | 0000 | 0000 | 0000 | 0010 | 0000 |
| 0000374120 | FFFF | 000D | 0101 | 0000 | 0000 | 0000 | 0010 | 0000 |
| 0000374140 | 0000 | 0000 | 0000 | 0000 | 735F | 7274 | 7069 | 0000 |
| 0000374160 | 0020 | 0000 | FFFF | 000D | 0101 | 0000 | 0000 | 0000 |
| 0000374200 | 0010 | 0000 | 0000 | 0000 | 0000 | 0000 | 725F | 6365 |
| 0000374220 | 0074 | 0000 | 0030 | 0000 | FFFF | 000D | 0101 | 0000 |
| 0000374240 | 0000 | 0000 | 0010 | 0000 | 0000 | 0000 | 0000 | 0000 |
| 0000374260 | 0000 | 0000 | 137A | 0000 | 5660 | FFC9 | 0003 | 0038 |
| 0000374300 | 0103 | 099C | 0000 | 0000 | 12C0 | 0064 | 0000 | 0000 |
| 0000374320 | 0000 | 0000 | 0000 | 0000 | 1387 | 0000 | 6920 | FFC9 |
| 0000374340 | 0003 | 0038 | 0103 | 099C | 0000 | 0000 | 12C0 | 0064 |
| 0000374360 | 0000 | 0000 | 0000 | 0000 | 745F | 6D65 | 0070 | 0000 |
| 0000374400 | 0040 | 0000 | FFFF | 000F | 0101 | 0000 | 0000 | 0000 |
| 0000374420 | 0020 | 0000 | 0000 | 0000 | 0000 | 0000 | 745F | 6D65 |
| 0000374440 | 3170 | 0000 | 0060 | 0000 | FFFF | 000F | 0101 | 0000 |

THU MAR 14 17:37:32 1991 GSPMON.4 PAGE 138, LINE 8084

| | | | | | | | | |
|---|---|---|---|---|---|---|---|---|
| 0000374460 | 0000 | 0006 | 0020 | 0000 | 0000 | 0000 | 0000 | 0000 |
| 0000374500 | 652E | 0066 | 0000 | 0000 | D640 | FFC1 | 0001 | 0000 |
| 0000374520 | 0165 | 0000 | 0000 | 044D | 0000 | 0000 | 0000 | 0000 |
| 0000374540 | 0000 | 0000 | 635F | 706D | 6964 | 7473 | D640 | FFC1 |
| 0000374560 | 0001 | 0024 | 0103 | 0000 | 0000 | 01F0 | 0000 | F3DA |
| 0000374600 | 0000 | 0AD6 | 0000 | 0003 | 622E | 0066 | 0000 | 0000 |
| 0000374620 | D640 | FFC1 | 0001 | 0000 | 0165 | 0000 | 0000 | 0453 |
| 0000374640 | 0000 | 0000 | 0000 | 03B0 | 0000 | 0000 | 655F | 656C |
| 0000374660 | 316D | 0000 | FFE0 | FFFF | FFFF | 0018 | 0109 | 099C |
| 0000374700 | 0000 | 0000 | 0020 | 0000 | 0000 | 0000 | 0000 | 0000 |
| 0000374720 | 655F | 656C | 326D | 0000 | FFC0 | FFFF | FFFF | 0018 |
| 0000374740 | 0109 | 099C | 0000 | 0000 | 0020 | 0000 | 0000 | 0030 |
| 0000374760 | 0000 | 0000 | 652E | 0066 | 0000 | 0000 | D830 | FFC1 |
| 0000375000 | 0001 | 0000 | 0165 | 0000 | 0000 | 045E | 0000 | 0000 |
| 0000375020 | 0000 | 0000 | 0000 | 0000 | 0000 | 0000 | 1394 | 0000 |
| 0000375040 | D830 | FFC1 | 0001 | 0024 | 0102 | 0000 | 0000 | 01C0 |
| 0000375060 | 0000 | F3FE | 0000 | 0AE0 | 0000 | 0003 | 622E | 0066 |
| 0000375100 | 0000 | 0000 | D830 | FFC1 | 0001 | 0000 | 0165 | 0000 |
| 0000375120 | 0000 | 046D | 0000 | 0000 | 0000 | 03BA | 0000 | 0000 |
| 0000375140 | 695F | 5F6E | 7470 | 0072 | FFE0 | FFFF | FFFF | 0010 |
| 0000375160 | 0109 | 0000 | 0000 | 0000 | 0020 | 0000 | 0000 | 0000 |
| 0000375200 | 0000 | 0000 | 6F5F | 7475 | 705F | 7274 | FFC0 | FFFF |
| 0000375220 | FFFF | 0010 | 0109 | 0000 | 0000 | 0000 | 0020 | 0000 |
| 0000375240 | 0000 | 0000 | 0000 | 0000 | 652E | 0066 | 0000 | 0000 |
| 0000375260 | D9F0 | FFC1 | 0001 | 0000 | 0165 | 0000 | 0000 | 0479 |
| 0000375300 | 0000 | 0000 | 0000 | 0000 | 0000 | 0000 | 0000 | 0000 |
| 0000375320 | 13AA | 0000 | D9F0 | FFC1 | 0001 | 0020 | 0103 | 0000 |
| 0000375340 | 0000 | 10F0 | 0000 | F422 | 0000 | 0AF4 | 0000 | 0004 |
| 0000375360 | 622E | 0066 | 0000 | 0000 | D9F0 | FFC1 | 0001 | 0000 |
| 0000375400 | 0165 | 0000 | 0000 | 047F | 0000 | 0000 | 0000 | 03CE |
| 0000375420 | 0000 | 0000 | 695F | 0000 | 0000 | 0000 | 0000 | 0000 |
| 0000375440 | FFFF | 000D | 0101 | 0000 | 0000 | 0000 | 0010 | 0000 |
| 0000375460 | 0000 | 0000 | 0000 | 0000 | 0000 | 0000 | 13BF | 0000 |
| 0000375500 | 0010 | 0000 | FFFF | 000D | 0101 | 0000 | 0000 | 0000 |
| 0000375520 | 0010 | 0000 | 0000 | 0000 | 0000 | 0000 | 0000 | 0000 |
| 0000375540 | 13CC | 0000 | 0020 | 0000 | FFFF | 000D | 0101 | 0000 |
| 0000375560 | 0000 | 0000 | 0010 | 0000 | 0000 | 0000 | 0000 | 0000 |
| 0000375600 | 0000 | 0000 | 13DA | 0000 | 0030 | 0000 | FFFF | 000D |
| 0000375620 | 0101 | 0000 | 0000 | 0000 | 0010 | 0000 | 0000 | 0000 |
| 0000375640 | 0000 | 0000 | 0000 | 0000 | 13E5 | 0000 | 0040 | 0000 |
| 0000375660 | FFFF | 000D | 0101 | 0000 | 0000 | 0000 | 0010 | 0000 |
| 0000375700 | 0000 | 0000 | 0000 | 0000 | 745F | 6D65 | 0070 | 0000 |
| 0000375720 | 0050 | 0000 | FFFF | 000D | 0101 | 0000 | 0000 | 0000 |
| 0000375740 | 0010 | 0000 | 0000 | 0000 | 0000 | 0000 | 0000 | 0000 |
| 0000375760 | 13F2 | 0000 | 0060 | 0000 | FFFF | 000F | 0101 | 0000 |
| 0000376000 | 0000 | 0000 | 0020 | 0000 | 0000 | 0000 | 0000 | 0000 |
| 0000376020 | 652E | 0066 | 0000 | 0000 | EAE0 | FFC1 | 0001 | 0000 |
| 0000376040 | 0165 | 0000 | 0000 | 04B7 | 0000 | 0000 | 0000 | 0000 |
| 0000376060 | 0000 | 0000 | 0000 | 0000 | 13FE | 0000 | EAE0 | FFC1 |
| 0000376100 | 0001 | 0020 | 0103 | 0000 | 0000 | 0160 | 0000 | F4CA |
| 0000376120 | 0000 | 0AFA | 0000 | 0000 | 622E | 0066 | 0000 | 0000 |
| 0000376140 | EAE0 | FFC1 | 0001 | 0000 | 0165 | 0000 | 0000 | 04BD |
| 0000376160 | 0000 | 0000 | 0000 | 03D4 | 0000 | 0000 | 652E | 0066 |
| 0000376200 | 0000 | 0000 | EC40 | FFC1 | 0001 | 0000 | 0165 | 0000 |
| 0000376220 | 0000 | 04C4 | 0000 | 0000 | 0000 | 0000 | 0000 | 0000 |
| 0000376240 | 0000 | 0000 | 141A | 0000 | 7BE0 | FFC9 | 0003 | 001F |
| 0000376260 | 0103 | 0000 | 0000 | 0000 | 0020 | 0000 | 0000 | 0000 |
| 0000376300 | 0000 | 0000 | 0000 | 0000 | 1424 | 0000 | EC40 | FFC1 |
| 0000376320 | 0001 | 0024 | 0102 | 0000 | 0000 | 0450 | 0000 | F4E8 |

THU MAR 14 17:37:32 1991 GSPMON.4 PAGE 139, LINE 8143

| | | | | | | | | |
|---|---|---|---|---|---|---|---|---|
| 0000376340 | 0000 | 0B08 | 0000 | 0003 | 622E | 0066 | 0000 | 0000 |
| 0000376360 | EC40 | FFC1 | 0001 | 0000 | 0165 | 0000 | 0000 | 04D5 |
| 0000376400 | 0000 | 0000 | 0000 | 03E2 | 0000 | 0000 | 695F | 5F6E |
| 0000376420 | 7470 | 0072 | FFE0 | FFFF | FFFF | 0018 | 0109 | 0906 |
| 0000376440 | 0000 | 0000 | 0020 | 0000 | 0000 | 0000 | 0000 | 0000 |
| 0000376460 | 6F5F | 7475 | 705F | 7274 | FFC0 | FFFF | FFFF | 0018 |
| 0000376500 | 0109 | 0906 | 0000 | 0000 | 0020 | 0000 | 0000 | 0000 |
| 0000376520 | 0000 | 0000 | 0000 | 0000 | 1431 | 0000 | 0000 | 0000 |
| 0000376540 | FFFF | 000D | 0101 | 0000 | 0000 | 0000 | 0010 | 0000 |
| 0000376560 | 0000 | 0000 | 0000 | 0000 | 652E | 0066 | 0000 | 0000 |
| 0000376600 | F090 | FFC1 | 0001 | 0000 | 0165 | 0000 | 0000 | 04EA |
| 0000376620 | 0000 | 0000 | 0000 | 0000 | 0000 | 0000 | 0000 | 0000 |
| 0000376640 | 143B | 0000 | F090 | FFC1 | 0001 | 0024 | 0102 | 0000 |
| 0000376660 | 0000 | 0DB0 | 0300 | F50C | 0000 | 0B1C | 0000 | 0004 |
| 0000376700 | 622E | 0066 | 0000 | 0000 | F090 | FFC1 | 0001 | 0000 |
| 0000376720 | 0165 | 0000 | 0000 | 04F9 | 0000 | 0000 | 0000 | 03F6 |
| 0000376740 | 0000 | 0000 | 695F | 5F6E | 7470 | 0072 | FFE0 | FFFF |
| 0000376760 | FFFF | 0018 | 0109 | 0906 | 0000 | 0000 | 0020 | 0000 |
| 0000377000 | 0000 | 0000 | 0000 | 0000 | 6F5F | 7475 | 705F | 7274 |
| 0000377020 | FFC0 | FFFF | FFFF | 0018 | 0109 | 0906 | 0000 | 0000 |
| 0000377040 | 0020 | 0000 | 0000 | 0000 | 0000 | 0000 | 0000 | 0000 |
| 0000377060 | 1448 | 0000 | 0000 | 0000 | FFFF | 001C | 0101 | 0000 |
| 0000377100 | 0000 | 0000 | 0020 | 0000 | 0000 | 0000 | 0000 | 0000 |
| 0000377120 | 0000 | 0000 | 1452 | 0000 | 0020 | 0000 | FFFF | 000D |
| 0000377140 | 0101 | 0000 | 0000 | 0000 | 0010 | 0000 | 0000 | 0000 |
| 0000377160 | 0000 | 0000 | 635F | 6C6F | 756F | 3172 | 0030 | 0000 |
| 0000377200 | FFFF | 000F | 0101 | 0000 | 000D | 0000 | 0020 | 0000 |
| 0000377220 | 0000 | 0000 | 0000 | 0000 | 685F | 5F70 | 0078 | 0000 |
| 0000377240 | 0050 | 0000 | FFFF | 0003 | 0101 | 0000 | 0000 | 0000 |
| 0000377260 | 0010 | 0000 | 0000 | 0000 | 0000 | 0000 | 685F | 5F70 |
| 0000377300 | 0079 | 0000 | 0060 | 0000 | FFFF | 0003 | 0101 | 0000 |
| 0000377320 | 0000 | 0000 | 0010 | 0000 | 0000 | 0000 | 0000 | 0000 |
| 0000377340 | 652E | 0066 | 0000 | 0000 | FE40 | FFC1 | 0001 | 0000 |
| 0000377360 | 0165 | 0000 | 0000 | 0564 | 0000 | 0000 | 0000 | 0000 |
| 0000377400 | 0000 | 0000 | 0000 | 0000 | 145C | 0000 | FE40 | FFC1 |
| 0000377420 | 0001 | 0024 | 0102 | 0000 | 0000 | 02C0 | 0000 | F578 |
| 0000377440 | 0000 | 0B26 | 0000 | 0004 | 622E | 0066 | 0000 | 0000 |
| 0000377460 | FE40 | FFC1 | 0001 | 0000 | 0165 | 0000 | 0000 | 0572 |
| 0000377500 | 0000 | 0000 | 0000 | 0400 | 0000 | 0000 | 695F | 5F6E |
| 0000377520 | 7470 | 0072 | FFE0 | FFFF | FFFF | 0018 | 0109 | 0906 |
| 0000377540 | 0000 | 0000 | 0020 | 0000 | 0000 | 0000 | 0000 | 0000 |
| 0000377560 | 6F5F | 7475 | 705F | 7274 | FFC0 | FFFF | FFFF | 001F |
| 0000377600 | 0109 | 0000 | 0000 | 0000 | 0020 | 0000 | 0000 | 0000 |
| 0000377620 | 0000 | 0000 | 652E | 0066 | 0000 | 0000 | 0100 | FFC2 |
| 0000377640 | 0001 | 0000 | 0165 | 0000 | 0000 | 0582 | 0000 | 0000 |
| 0000377660 | 0000 | 0000 | 0000 | 0000 | 0000 | 0000 | 146A | 0000 |
| 0000377700 | 0100 | FFC2 | 0001 | 0024 | 0102 | 0000 | 0000 | 0160 |
| 0000377720 | 0000 | F5A2 | 0000 | 0B30 | 0000 | 0002 | 622E | 0066 |
| 0000377740 | 0000 | 0000 | 0100 | FFC2 | 0001 | 0000 | 0165 | 0000 |
| 0000377760 | 0000 | 0590 | 0000 | 0000 | 0000 | 040A | 0000 | 0000 |
| 0000400000 | 695F | 5F6E | 7470 | 0072 | FFE0 | FFFF | FFFF | 0010 |
| 0000400020 | 0109 | 0000 | 0000 | 0000 | 0020 | 0000 | 0000 | 0000 |
| 0000400040 | 0000 | 0000 | 6F5F | 7475 | 705F | 7274 | FFC0 | FFFF |
| 0000400060 | FFFF | 0010 | 0109 | 0000 | 0000 | 0000 | 0020 | 0000 |
| 0000400100 | 0000 | 0000 | 0000 | 0000 | 652E | 0066 | 0000 | 0000 |
| 0000400120 | 0260 | FFC2 | 0001 | 0000 | 0165 | 0000 | 0000 | 059D |
| 0000400140 | 0000 | 0000 | 0000 | 0000 | 0000 | 0000 | 655F | 7272 |
| 0000400160 | 0000 | 0000 | 0260 | FFC2 | 0001 | 002F | 0103 | 0000 |
| 0000400200 | 0000 | 00D0 | 0000 | F5C0 | 0000 | 0B38 | 0000 | 0002 |

THU MAR 14 17:37:32 1991 GSPMON.4 PAGE 140, LINE 8202

| | | | | | | | | |
|---|---|---|---|---|---|---|---|---|
| 0000400220 | 622E | 0066 | 0000 | 0000 | 0260 | FFC2 | 0001 | 0000 |
| 0000400240 | 0165 | 0000 | 0000 | 05A3 | 0000 | 0000 | 0000 | 0412 |
| 0000400260 | 0000 | 0000 | 615F | 7264 | 0000 | 0000 | FFE0 | FFFF |
| 0000400300 | FFFF | 0010 | 0109 | 0000 | 0000 | 0000 | 0020 | 0000 |
| 0000400320 | 0000 | 0000 | 0000 | 0000 | 652E | 0066 | 0000 | 0000 |
| 0000400340 | 0330 | FFC2 | 0001 | 0000 | 0165 | 0000 | 0000 | 05B2 |
| 0000400360 | 0000 | 0000 | 0000 | 0000 | 0000 | 0000 | 0000 | 0000 |
| 0000400400 | 1477 | 0000 | 0330 | FFC2 | 0001 | 0020 | 0103 | 0000 |
| 0000400420 | 0000 | 0660 | 0000 | F5CC | 0000 | 0B5C | 0000 | 000C |
| 0000400440 | 622E | 0066 | 0000 | 0000 | 0330 | FFC2 | 0001 | 0000 |
| 0000400460 | 0165 | 0000 | 0000 | 05B9 | 0000 | 0000 | 0000 | 0436 |
| 0000400500 | 0000 | 0000 | 695F | 5F6E | 7470 | 0072 | FFE0 | FFFF |
| 0000400520 | FFFF | 0018 | 0109 | 0906 | 0000 | 0000 | 0020 | 0000 |
| 0000400540 | 0000 | 0000 | 0000 | 0000 | 0000 | 0000 | 1482 | 0005 |
| 0000400560 | FFC0 | FFFF | FFFF | 000D | 0109 | 0000 | 0000 | 0000 |
| 0000400600 | 0010 | 0000 | 0000 | 0000 | 0000 | 0000 | 6F5F | 7475 |
| 0000400620 | 705F | 7274 | FFA0 | FFFF | FFFF | 001C | 0109 | 0000 |
| 0000400640 | 0000 | 0000 | 0020 | 0000 | 0000 | 0000 | 0000 | 0000 |
| 0000400660 | 775F | 6469 | 6874 | 0000 | 0009 | 0000 | FFFF | 000D |
| 0000400700 | 0104 | 0000 | 0000 | 0000 | 0010 | 0000 | 0000 | 0000 |
| 0000400720 | 0000 | 0000 | 685F | 6965 | 6867 | 0074 | 000A | 0000 |
| 0000400740 | FFFF | 000D | 0104 | 0000 | 0000 | 0000 | 0010 | 0000 |
| 0000400760 | 0000 | 0000 | 0000 | 0000 | 0000 | 0000 | 148F | 0000 |
| 0000401000 | 000B | 0000 | FFFF | 000C | 0104 | 0000 | 0000 | 0000 |
| 0000401020 | 0008 | 0000 | 0000 | 0000 | 0000 | 0000 | 785F | 0000 |
| 0000401040 | 0000 | 0000 | 000C | 0000 | FFFF | 000D | 0104 | 0000 |
| 0000401060 | 0000 | 0000 | 0010 | 0000 | 0000 | 0000 | 0000 | 0000 |
| 0000401100 | 795F | 0000 | 0000 | 0000 | 0000 | 0000 | FFFF | 000D |
| 0000401120 | 0104 | 0000 | 0000 | 0000 | 0010 | 0000 | 0000 | 0000 |
| 0000401140 | 0000 | 0000 | 795F | 0069 | 0000 | 0000 | 0002 | 0000 |
| 0000401160 | FFFF | 000D | 0104 | 0000 | 0000 | 0000 | 0010 | 0000 |
| 0000401200 | 0000 | 0000 | 0000 | 0000 | 785F | 006A | 0000 | 0000 |
| 0000401220 | 0004 | 0000 | FFFF | 000D | 0104 | 0000 | 0000 | 0000 |
| 0000401240 | 0010 | 0000 | 0000 | 0000 | 0000 | 0000 | 0000 | 0000 |
| 0000401260 | 1499 | 0000 | 0006 | 0000 | FFFF | 000D | 0104 | 0000 |
| 0000401300 | 0000 | 0000 | 0010 | 0000 | 0000 | 0000 | 0000 | 0000 |
| 0000401320 | 0000 | 0000 | 14A5 | 0000 | 0000 | 0000 | FFFF | 000D |
| 0000401340 | 0101 | 0000 | 0000 | 0000 | 0010 | 0000 | 0000 | 0000 |
| 0000401360 | 0000 | 0000 | 7A5F | 6F6F | 5F6D | 0078 | 0010 | 0000 |
| 0000401400 | FFFF | 000D | 0101 | 0000 | 0000 | 0000 | 0010 | 0000 |
| 0000401420 | 0000 | 0000 | 0000 | 0000 | 7A5F | 6F6F | 5F6D | 0079 |
| 0000401440 | 0020 | 0000 | FFFF | 000D | 0101 | 0000 | 0000 | 0000 |
| 0000401460 | 0010 | 0000 | 0000 | 0000 | 0000 | 0000 | 705F | 5F6C |
| 0000401500 | 6461 | 7264 | 0030 | 0000 | FFFF | 001C | 0101 | 0000 |
| 0000401520 | 0000 | 0000 | 0020 | 0000 | 0000 | 0000 | 0000 | 0000 |
| 0000401540 | 652E | 0066 | 0000 | 0000 | 0990 | FFC2 | 0001 | 0000 |
| 0000401560 | 0165 | 0000 | 0000 | 05DC | 0000 | 0000 | 0000 | 0000 |
| 0000401600 | 0000 | 0000 | 742E | 7865 | 0074 | 0000 | 0500 | FFC1 |
| 0000401620 | 0001 | 0000 | 0103 | 0490 | 0001 | 01E6 | 020A | 0000 |
| 0000401640 | 0000 | 0000 | 0000 | 0000 | 642E | 7461 | 0061 | 0000 |
| 0000401660 | 0000 | 0000 | 0004 | 0000 | 0103 | 0000 | 0000 | 0000 |
| 0000401700 | 0000 | 0000 | 0000 | 0000 | 0000 | 0000 | 622E | 7373 |
| 0000401720 | 0000 | 0000 | 07F0 | FFC7 | 0003 | 0000 | 0103 | 7410 |
| 0000401740 | 0002 | 0000 | 0000 | 0000 | 0000 | 0000 | 0000 | 0000 |
| 0000401760 | 632E | 6E69 | 7469 | 0000 | B9E0 | FFC6 | 0002 | 0000 |
| 0000402000 | 0103 | 0640 | 0000 | 000F | 0000 | 0000 | 0000 | 0000 |
| 0000402020 | 0000 | 0000 | 662E | 6C69 | 0065 | 0000 | 0B66 | 0000 |
| 0000402040 | FFFE | 0000 | 0167 | 7067 | 635F | 726F | 2E72 | 0063 |
| 0000402060 | 0000 | 0000 | 0000 | 0000 | 662E | 6C69 | 0065 | 0000 |

THU MAR 14 17:37:32 1991 GSPMON.4 PAGE 141, LINE 8261

| | | | | | | | | |
|---|---|---|---|---|---|---|---|---|
| 0000402100 | 0B68 | 0000 | FFFE | 0000 | 0167 | 7473 | 6D64 | 682E |
| 0000402120 | 0000 | 0000 | 0000 | 0000 | 0000 | 0000 | 662E | 6C69 |
| 0000402140 | 0065 | 0000 | 0B6A | 0000 | FFFE | 0000 | 0167 | 7067 |
| 0000402160 | 635F | 726F | 2E72 | 0063 | 0000 | 0000 | 0000 | 0000 |
| 0000402200 | 662E | 6C69 | 0065 | 0000 | 0B74 | 0000 | FFFE | 0000 |
| 0000402220 | 0167 | 7473 | 6C64 | 6269 | 682E | 0000 | 0000 | 0000 |
| 0000402240 | 0000 | 0000 | 302E | 6166 | 656B | 0000 | 0000 | 0000 |
| 0000402260 | FFFE | 0008 | 010A | 0000 | 0000 | 0000 | 0040 | 0000 |
| 0000402300 | 0000 | 0B74 | 0000 | 0000 | 715F | 6F75 | 0074 | 0000 |
| 0000402320 | 0000 | 0000 | FFFF | 0004 | 0108 | 0000 | 0000 | 0000 |
| 0000402340 | 0020 | 0000 | 0000 | 0000 | 0000 | 0000 | 725F | 6D65 |
| 0000402360 | 0000 | 0000 | 0020 | 0000 | FFFF | 0004 | 0108 | 0000 |
| 0000402400 | 0000 | 0000 | 0020 | 0000 | 0000 | 0000 | 0000 | 0000 |
| 0000402420 | 652E | 736F | 0000 | 0000 | 0000 | 0000 | FFFE | 0008 |
| 0000402440 | 0166 | 0B6C | 0000 | 0000 | 0040 | 0000 | 0000 | 0000 |
| 0000402460 | 0000 | 0000 | 662E | 6C69 | 0065 | 0000 | 0B76 | 0000 |
| 0000402500 | FFFE | 0000 | 0167 | 7067 | 635F | 726F | 2E72 | 0063 |
| 0000402520 | 0000 | 0000 | 0000 | 0000 | 662E | 6C69 | 0065 | 0000 |
| 0000402540 | 0B86 | 0000 | FFFE | 0000 | 0167 | 7974 | 6570 | 6564 |
| 0000402560 | 2E66 | 0068 | 0000 | 0000 | 0000 | 0000 | 312E | 6166 |
| 0000402600 | 656B | 0000 | 0000 | 0000 | FFFE | 000A | 010F | 0000 |
| 0000402620 | 0000 | 0000 | 0001 | 0000 | 0000 | 0B80 | 0000 | 0000 |
| 0000402640 | 465F | 4C41 | 4553 | 0000 | 0000 | 0000 | FFFF | 000B |
| 0000402660 | 0110 | 0000 | 0000 | 0000 | 0001 | 0000 | 0000 | 0000 |
| 0000402700 | 0000 | 0000 | 545F | 5552 | 0045 | 0000 | 0001 | 0000 |
| 0000402720 | FFFF | 000B | 0110 | 0000 | 0000 | 0000 | 0001 | 0000 |
| 0000402740 | 0000 | 0000 | 0000 | 0000 | 652E | 736F | 0000 | 000n |
| 0000402760 | 0000 | 0000 | FFFE | 000A | 0166 | 0B78 | 0000 | 0000 |
| 0000403000 | 0001 | 0000 | 0000 | 0000 | 0000 | 0000 | 322E | 6166 |
| 0000403020 | 656B | 0000 | 0000 | 0000 | FFFE | 0008 | 010A | 0000 |
| 0000403040 | 0000 | 0000 | 0004 | 0000 | 0000 | 0B86 | 0000 | 0000 |
| 0000403060 | 705F | 7869 | 6C65 | 0000 | 0000 | 0000 | FFFF | 000E |
| 0000403100 | 0112 | 0000 | 0000 | 0000 | 0004 | 0000 | 0000 | 0000 |
| 0000403120 | 0000 | 0000 | 652E | 736F | 0000 | 0000 | 0000 | 0000 |
| 0000403140 | FFFE | 0008 | 0166 | 0B80 | 0000 | 0000 | 0004 | 0000 |
| 0000403160 | 0000 | 0000 | 0000 | 0000 | 662E | 6C69 | 0065 | 0000 |
| 0000403200 | 0B88 | 0000 | FFFE | 0000 | 0167 | 7067 | 635F | 726F |
| 0000403220 | 2E72 | 0063 | 0000 | 0000 | 0000 | 0000 | 662E | 6C69 |
| 0000403240 | 0065 | 0000 | 0B8A | 0000 | FFFE | 0000 | 0167 | 7367 |
| 0000403260 | 7370 | 7379 | 682E | 0000 | 0000 | 0000 | 0000 | 0000 |
| 0000403300 | 662E | 6C69 | 0065 | 0000 | 0B8C | 0000 | FFFE | 0000 |
| 0000403320 | 0167 | 7367 | 7370 | 7379 | 692E | 636E | 0000 | 0000 |
| 0000403340 | 0000 | 0000 | 662E | 6C69 | 0065 | 0000 | 0B8E | 0000 |
| 0000403360 | FFFE | 0000 | 0167 | 7367 | 7370 | 7379 | 682E | 0000 |
| 0000403400 | 0000 | 0000 | 0000 | 0000 | 662E | 6C69 | 0065 | 0000 |
| 0000403420 | 0B90 | 0000 | FFFE | 0000 | 0167 | 7067 | 635F | 726F |
| 0000403440 | 2E72 | 0063 | 0000 | 0000 | 0000 | 0000 | 662E | 6C69 |
| 0000403460 | 0065 | 0000 | 0C54 | 0000 | FFFE | 0000 | 0167 | 7067 |
| 0000403500 | 705F | 6275 | 682E | 0000 | 0000 | 0000 | 0000 | 0000 |
| 0000403520 | 332E | 6166 | 656B | 0000 | 0000 | 0000 | FFFE | 0008 |
| 0000403540 | 010A | 0000 | 0000 | 0000 | 01C0 | 0000 | 0000 | 0BC2 |
| 0000403560 | 0000 | 0000 | 685F | 7365 | 6E79 | 0063 | 0000 | 0000 |
| 0000403600 | FFFF | 000D | 0108 | 0000 | 0000 | 0000 | 0010 | 0000 |
| 0000403620 | 0000 | 0000 | 0000 | 0000 | 685F | 6265 | 6E6C | 006B |
| 0000403640 | 0010 | 0000 | FFFF | 000D | 0108 | 0000 | 0000 | 0000 |
| 0000403660 | 0010 | 0000 | 0000 | 0000 | 0000 | 0000 | 685F | 6273 |
| 0000403700 | 6E6C | 006B | 0020 | 0000 | FFFF | 000D | 0108 | 0000 |
| 0000403720 | 0000 | 0000 | 0010 | 0000 | 0000 | 0000 | 0000 | 0000 |
| 0000403740 | 765F | 7365 | 6E79 | 0063 | 0030 | 0000 | FFFF | 000D |

THU MAR 14 17:37:32 1991 GSPMON.4 PAGE 142, LINE 8320

| | | | | | | | | |
|---|---|---|---|---|---|---|---|---|
| 0000403760 | 0108 | 0000 | 0000 | 0000 | 0010 | 0000 | 0000 | 0000 |
| 0000404000 | 0000 | 0000 | 765F | 6265 | 6E6C | 006B | 0040 | 0000 |
| 0000404020 | FFFF | 000D | 0108 | 0000 | 0000 | 0000 | 0010 | 0000 |
| 0000404040 | 0000 | 0000 | 0000 | 0000 | 765F | 6273 | 6E6C | 006B |
| 0000404060 | 0050 | 0000 | FFFF | 000D | 0108 | 0000 | 0000 | 0000 |
| 0000404100 | 0010 | 0000 | 0000 | 0000 | 0000 | 0000 | 0000 | 0000 |
| 0000404120 | 14B2 | 0000 | 0060 | 0000 | FFFF | 000D | 0108 | 0000 |
| 0000404140 | 0000 | 0000 | 0010 | 0000 | 0000 | 0000 | 0000 | 0000 |
| 0000404160 | 665F | 6468 | 7369 | 0070 | 0070 | 0000 | FFFF | 000D |
| 0000404200 | 0108 | 0000 | 0000 | 0000 | 0010 | 0000 | 0000 | 0000 |
| 0000404220 | 0000 | 0000 | 6D5F | 5F62 | 6973 | 657A | 0080 | 0000 |
| 0000404240 | FFFF | 000F | 0108 | 0000 | 0000 | 0000 | 0020 | 0000 |
| 0000404260 | 0000 | 0000 | 0000 | 0000 | 0000 | 0000 | 14BD | 0000 |
| 0000404300 | 00A0 | 0000 | FFFF | 000D | 0108 | 0000 | 0000 | 0000 |
| 0000404320 | 0010 | 0000 | 0000 | 0000 | 0000 | 0000 | 0000 | 0000 |
| 0000404340 | 14C7 | 0000 | 00B0 | 0000 | FFFF | 000D | 0108 | 0000 |
| 0000404360 | 0000 | 0000 | 0010 | 0000 | 0000 | 0000 | 0000 | 0000 |
| 0000404400 | 0000 | 0000 | 14D1 | 0000 | 00C0 | 0000 | FFFF | 000D |
| 0000404420 | 0108 | 0000 | 0000 | 0000 | 0010 | 0000 | 0000 | 0000 |
| 0000404440 | 0000 | 0000 | 0000 | 0000 | 14DC | 0000 | 00D0 | 0000 |
| 0000404460 | FFFF | 000D | 0108 | 0000 | 0000 | 0000 | 0010 | 0000 |
| 0000404500 | 0000 | 0000 | 0000 | 0000 | 0000 | 0000 | 14E6 | 0000 |
| 0000404520 | 00E0 | 0000 | FFFF | 000F | 0108 | 0000 | 0000 | 0000 |
| 0000404540 | 0020 | 0000 | 0000 | 0000 | 0000 | 0000 | 0000 | 0000 |
| 0000404560 | 14F3 | 0000 | 0100 | 0000 | FFFF | 000F | 0108 | 0000 |
| 0000404600 | 0000 | 0000 | 0020 | 0000 | 0000 | 0000 | 0000 | 0000 |
| 0000404620 | 0000 | 0000 | 1505 | 0000 | 0120 | 0000 | FFFF | 000F |
| 0000404640 | 0108 | 0000 | 0000 | 0000 | 0020 | 0000 | 0000 | 0000 |
| 0000404660 | 0000 | 0000 | 0000 | 0000 | 1514 | 0000 | 0140 | 0000 |
| 0000404700 | FFFF | 000F | 0108 | 0000 | 0000 | 0000 | 0020 | 0000 |
| 0000404720 | 0000 | 0000 | 0000 | 0000 | 0000 | 0000 | 152A | 0000 |
| 0000404740 | 0160 | 0000 | FFFF | 000D | 0108 | 0000 | 0000 | 0000 |
| 0000404760 | 0010 | 0000 | 0000 | 0000 | 0000 | 0000 | 0000 | 0000 |
| 0000405000 | 1535 | 0000 | 0170 | 0000 | FFFF | 000D | 0108 | 0000 |
| 0000405020 | 0000 | 0000 | 0010 | 0000 | 0000 | 0000 | 0000 | 0000 |
| 0000405040 | 0000 | 0000 | 1549 | 0000 | 0180 | 0000 | FFFF | 000D |
| 0000405060 | 0108 | 0000 | 0000 | 0000 | 0010 | 0000 | 0000 | 0000 |
| 0000405100 | 0000 | 0000 | 0000 | 0000 | 155D | 0000 | 0190 | 0000 |
| 0000405120 | FFFF | 000F | 0108 | 0000 | 0000 | 0000 | 0020 | 0000 |
| 0000405140 | 0000 | 0000 | 0000 | 0000 | 0000 | 0000 | 156C | 0000 |
| 0000405160 | 01B0 | 0000 | FFFF | 000D | 0108 | 0000 | 0000 | 0000 |
| 0000405200 | 0010 | 0000 | 0000 | 0000 | 0000 | 0000 | 652E | 736F |
| 0000405220 | 0000 | 0000 | 0000 | 0000 | FFFE | 0008 | 0166 | 0B92 |
| 0000405240 | 0000 | 0000 | 01C0 | 0000 | 0000 | 0000 | 0000 | 0000 |
| 0000405260 | 342E | 6166 | 656B | 0000 | 0000 | 0000 | FFFE | 0008 |
| 0000405300 | 010A | 0000 | 0000 | 0000 | 0050 | 0000 | 0000 | 0BCC |
| 0000405320 | 0000 | 0000 | 6D5F | 6773 | 705F | 7274 | 0000 | 0000 |
| 0000405340 | FFFF | 0010 | 0108 | 0000 | 0000 | 0000 | 0020 | 0000 |
| 0000405360 | 0000 | 0000 | 0000 | 0000 | 0000 | 0000 | 1578 | 0000 |
| 0000405400 | 0020 | 0000 | FFFF | 000F | 0108 | 0000 | 0000 | 0000 |
| 0000405420 | 0020 | 0000 | 0000 | 0000 | 0000 | 0000 | 0000 | 0000 |
| 0000405440 | 1582 | 0000 | 0040 | 0000 | FFFF | 000D | 0108 | 0000 |
| 0000405460 | 0000 | 0000 | 0010 | 0000 | 0000 | 0000 | 0000 | 0000 |
| 0000405500 | 652E | 736F | 0000 | 0000 | 0000 | 0000 | FFFE | 0008 |
| 0000405520 | 0166 | 0BC2 | 0000 | 0000 | 0050 | 0000 | 0000 | 0000 |
| 0000405540 | 0000 | 0000 | 352E | 6166 | 656B | 0000 | 0000 | 0000 |
| 0000405560 | FFFE | 0008 | 010A | 0000 | 0000 | 0000 | 0040 | 0000 |
| 0000405600 | 0000 | 0BD8 | 0000 | 0000 | 0000 | 0000 | 158D | 0000 |
| 0000405620 | 0000 | 0000 | FFFF | 000D | 0108 | 0000 | 0000 | 0000 |

THU MAR 14 17:37:32 1991 GSPMON.4 PAGE 143, LINE 8379

| | | | | | | | | |
|---|---|---|---|---|---|---|---|---|
| 0000405640 | 0010 | 0000 | 0000 | 0000 | 0000 | 0000 | 6A5F | 6D75 |
| 0000405660 | 0070 | 0000 | 0010 | 0000 | FFFF | 000D | 0108 | 0000 |
| 0000405700 | 0000 | 0000 | 0010 | 0000 | 0000 | 0000 | 0000 | 0000 |
| 0000405720 | 735F | 6174 | 7472 | 0000 | 0020 | 0000 | FFFF | 000D |
| 0000405740 | 0108 | 0000 | 0000 | 0000 | 0010 | 0000 | 0000 | 0000 |
| 0000405760 | 0000 | 0000 | 655F | 646E | 0000 | 0000 | 0030 | 0000 |
| 0000406000 | FFFF | 000D | 0108 | 0000 | 0000 | 0000 | 0010 | 0000 |
| 0000406020 | 0000 | 0000 | 0000 | 0000 | 652E | 736F | 0000 | 0000 |
| 0000406040 | 0000 | 0000 | FFFE | 0008 | 0166 | 0BCC | 0000 | 0000 |
| 0000406060 | 0040 | 0000 | 0000 | 0000 | 0000 | 0000 | 362E | 6166 |
| 0000406100 | 656B | 0000 | 0000 | 0000 | FFFE | 0008 | 010A | 0000 |
| 0000406120 | 00C0 | 0000 | 0080 | 0000 | 0000 | 0BE0 | 0000 | 0000 |
| 0000406140 | 685F | 0000 | 0000 | 0000 | 0000 | 0000 | FFFF | 0008 |
| 0000406160 | 0108 | 0BCC | 0000 | 0000 | 0040 | 0000 | 0000 | 0000 |
| 0000406200 | 0000 | 0000 | 765F | 0000 | 0000 | 0000 | 0040 | 0000 |
| 0000406220 | FFFF | 0008 | 0108 | 0BCC | 0000 | 0000 | 0040 | 0000 |
| 0000406240 | 0000 | 0000 | 0000 | 0000 | 652E | 736F | 0000 | 0000 |
| 0000406260 | 0000 | 0000 | FFFE | 0008 | 0166 | 0BD8 | 0000 | 0000 |
| 0000406300 | 0080 | 0000 | 0000 | 0000 | 0000 | 0000 | 372E | 6166 |
| 0000406320 | 656B | 0000 | 0000 | 0000 | FFFE | 0009 | 010C | 0000 |
| 0000406340 | 0000 | 0000 | 0200 | 0000 | 0000 | 0BEA | 0000 | 0000 |
| 0000406360 | 635F | 6B68 | 7573 | 006D | 0000 | 0000 | FFFF | 003D |
| 0000406400 | 010B | 0000 | 0000 | 0000 | 0200 | 0020 | 0000 | 0000 |
| 0000406420 | 0000 | 0000 | 655F | 7272 | 6E63 | 0074 | 0000 | 0000 |
| 0000406440 | FFFF | 003D | 010B | 0000 | 0000 | 0000 | 0200 | 0020 |
| 0000406460 | 0000 | 0000 | 0000 | 0000 | 635F | 6372 | 3233 | 0000 |
| 0000406500 | 0000 | 0000 | FFFF | 003D | 010B | 0000 | 0000 | 0000 |
| 0000406520 | 0200 | 0020 | 0000 | 0000 | 0000 | 0000 | 652E | 736F |
| 0000406540 | 0000 | 0000 | 0000 | 0000 | FFFE | 0009 | 0166 | 0BE0 |
| 0000406560 | 0000 | 0000 | 0200 | 0000 | 0000 | 0000 | 0000 | 0000 |
| 0000406600 | 382E | 6166 | 656B | 0000 | 0000 | 0000 | FFFE | 0008 |
| 0000406620 | 010A | 0000 | 0000 | 0000 | 0240 | 0000 | 0000 | 0BF2 |
| 0000406640 | 0000 | 0000 | 0000 | 0000 | 1599 | 0000 | 0000 | 0000 |
| 0000406660 | FFFF | 0008 | 0108 | 0BCC | 0000 | 0000 | 0040 | 0000 |
| 0000406700 | 0000 | 0000 | 0000 | 0000 | 0000 | 0000 | 15A6 | 0000 |
| 0000406720 | 0040 | 0000 | FFFF | 0009 | 0108 | 0BE0 | 0000 | 0000 |
| 0000406740 | 0200 | 0000 | 0000 | 0000 | 0000 | 0000 | 652E | 736F |
| 0000406760 | 0000 | 0000 | 0000 | 0000 | FFFE | 0008 | 0166 | 0BEA |
| 0000407000 | 0000 | 0000 | 0240 | 0000 | 0000 | 0000 | 0000 | 0000 |
| 0000407020 | 392E | 6166 | 656B | 0000 | 0000 | 0000 | FFFE | 0009 |
| 0000407040 | 010C | 0000 | 0000 | 0000 | 4000 | 0000 | 0000 | 0BFC |
| 0000407060 | 0000 | 0000 | 635F | 6B68 | 7573 | 006D | 0000 | 0000 |
| 0000407100 | FFFF | 00FD | 010B | 0000 | 0000 | 0000 | 4000 | 0020 |
| 0000407120 | 0020 | 0000 | 0000 | 0000 | 655F | 7272 | 6E63 | 0074 |
| 0000407140 | 0000 | 0000 | FFFF | 00FD | 010B | 0000 | 0000 | 0000 |
| 0000407160 | 4000 | 0020 | 0020 | 0000 | 0000 | 0000 | 635F | 6372 |
| 0000407200 | 3233 | 0000 | 0000 | 0000 | FFFF | 00FD | 010B | 0000 |
| 0000407220 | 0000 | 0000 | 4000 | 0020 | 0020 | 0000 | 0000 | 0000 |
| 0000407240 | 652E | 736F | 0000 | 0000 | 0000 | 0000 | FFFE | 0009 |
| 0000407260 | 0166 | 0BF2 | 0000 | 0000 | 4000 | 0000 | 0000 | 0000 |
| 0000407300 | 0000 | 0000 | 312E | 6630 | 6B61 | 0065 | 0000 | 0000 |
| 0000407320 | FFFE | 0008 | 010A | 0000 | 0000 | 0000 | 4080 | 0000 |
| 0000407340 | 0000 | 0C06 | 0000 | 0000 | 0000 | 0000 | 15B2 | 0000 |
| 0000407360 | 0000 | 0000 | FFFF | 0008 | 0108 | 0BCC | 0000 | 0009 |
| 0000407400 | 0040 | 0000 | 0000 | 0000 | 0000 | 0000 | 0000 | 0000 |
| 0000407420 | 15BF | 0000 | 0040 | 0000 | FFFF | 0008 | 0108 | 0BCC |
| 0000407440 | 0000 | 0000 | 0040 | 0000 | 0000 | 0000 | 0000 | 0000 |
| 0000407460 | 0000 | 0000 | 15CB | 0000 | 0080 | 0000 | FFFF | 0009 |
| 0000407500 | 0108 | 0BF2 | 0000 | 0000 | 4000 | 0000 | 0000 | 0000 |

THU MAR 14 17:37:32 1991 GSPMON.4 PAGE 144, LINE 8438

| | | | | | | | | |
|---|---|---|---|---|---|---|---|---|
| 0000407520 | 0000 | 0000 | 652E | 736F | 0000 | 0000 | 0000 | 0000 |
| 0000407540 | FFFE | 0008 | 0166 | 0BFC | 0000 | 0000 | 4080 | 0000 |
| 0000407560 | 0000 | 0000 | 0000 | 0000 | 312E | 6631 | 6B61 | 0065 |
| 0000407600 | 0000 | 0000 | FFFE | 0009 | 010C | 0000 | 0000 | 0000 |
| 0000407620 | 0090 | 0000 | 0000 | 0C10 | 0000 | 0000 | 635F | 6B68 |
| 0000407640 | 7573 | 006D | 0000 | 0000 | FFFF | 00FD | 010B | 0000 |
| 0000407660 | 0000 | 0000 | 0090 | 0003 | 0003 | 0000 | 0000 | 0000 |
| 0000407700 | 655F | 7272 | 6E63 | 0074 | 0000 | 0000 | FFFF | 00FD |
| 0000407720 | 010B | 0000 | 0000 | 0000 | 0090 | 0003 | 0003 | 0000 |
| 0000407740 | 0000 | 0000 | 625F | 7263 | 3363 | 0032 | 0000 | 0000 |
| 0000407760 | FFFF | 00FD | 010B | 0000 | 0000 | 0000 | 0090 | 0003 |
| 0000410000 | 0003 | 0000 | 0000 | 0000 | 652E | 736F | 0000 | 0000 |
| 0000410020 | 0000 | 0000 | FFFE | 0009 | 0166 | 0C06 | 0000 | 0000 |
| 0000410040 | 0090 | 0000 | 0000 | 0000 | 0000 | 0000 | 312E | 6632 |
| 0000410060 | 6B61 | 0065 | 0000 | 0000 | FFFE | 0008 | 010A | 0000 |
| 0000410100 | 0000 | 0000 | 0130 | 0000 | 0000 | 0C1E | 0000 | 0000 |
| 0000410120 | 0000 | 0000 | 15D5 | 0000 | 0000 | 0000 | FFFF | 0008 |
| 0000410140 | 0108 | 0BCC | 0000 | 0000 | 0040 | 0000 | 0000 | 0000 |
| 0000410160 | 0000 | 0000 | 0000 | 0000 | 15E2 | 0000 | 0040 | 0000 |
| 0000410200 | FFFF | 0008 | 0108 | 0BCC | 0000 | 0000 | 0040 | 0000 |
| 0000410220 | 0000 | 0000 | 0000 | 0000 | 785F | 635F | 6F6F | 6472 |
| 0000410240 | 0080 | 0000 | FFFF | 0003 | 0108 | 0000 | 0000 | 0000 |
| 0000410260 | 0010 | 0000 | 0000 | 0000 | 0000 | 0000 | 795F | 635F |
| 0000410300 | 6F6F | 6472 | 0090 | 0000 | FFFF | 0003 | 0108 | 0000 |
| 0000410320 | 0000 | 0000 | 0010 | 0000 | 0000 | 0000 | 0000 | 0000 |
| 0000410340 | 0000 | 0000 | 15EE | 0000 | 00A0 | 0000 | FFFF | 0009 |
| 0000410360 | 0108 | 0C06 | 0000 | 0000 | 0090 | 0000 | 0000 | 0000 |
| 0000410400 | 0000 | 0000 | 652E | 736F | 0000 | 0000 | 0000 | 0000 |
| 0000410420 | FFFE | 0008 | 0166 | 0C10 | 0000 | 0000 | 0130 | 0000 |
| 0000410440 | 0000 | 0000 | 0000 | 0000 | 312E | 6633 | 6B61 | 0065 |
| 0000410460 | 0000 | 0000 | FFFE | 0008 | 010A | 0000 | 0000 | 0000 |
| 0000410500 | 0050 | 0000 | 0000 | 0C2A | 0000 | 0000 | 0000 | 0000 |
| 0000410520 | 15F8 | 0000 | 0000 | 0000 | FFFF | 000D | 0108 | 0000 |
| 0000410540 | 0000 | 0000 | 0010 | 0000 | 0000 | 0000 | 0000 | 0000 |
| 0000410560 | 0000 | 0000 | 1610 | 0000 | 0010 | 0000 | FFFF | 000D |
| 0000410600 | 0108 | 0000 | 0000 | 0000 | 0010 | 0000 | 0000 | 0000 |
| 0000410620 | 0000 | 0000 | 0000 | 0000 | 1622 | 0000 | 0020 | 0000 |
| 0000410640 | FFFF | 000D | 0108 | 0000 | 0000 | 0000 | 0010 | 0000 |
| 0000410660 | 0000 | 0000 | 0000 | 0000 | 0000 | 0000 | 162D | 0000 |
| 0000410700 | 0030 | 0000 | FFFF | 0010 | 0108 | 0000 | 0000 | 0000 |
| 0000410720 | 0020 | 0000 | 0000 | 0000 | 0000 | 0000 | 652E | 736F |
| 0000410740 | 0000 | 0000 | 0000 | 0000 | FFFE | 0008 | 0166 | 0C1E |
| 0000410760 | 0000 | 0000 | 0050 | 0000 | 0000 | 0000 | 0000 | 0000 |
| 0000411000 | 312E | 6634 | 6B61 | 0065 | 0000 | 0000 | FFFE | 0008 |
| 0000411020 | 010A | 0000 | 0000 | 0000 | 0040 | 0000 | 0000 | 0C32 |
| 0000411040 | 0000 | 0000 | 0000 | 0000 | 1637 | 0000 | 0000 | 0000 |
| 0000411060 | FFFF | 0005 | 0108 | 0000 | 0000 | 0000 | 0020 | 0000 |
| 0000411100 | 0000 | 0000 | 0000 | 0000 | 0000 | 0000 | 1647 | 0000 |
| 0000411120 | 0020 | 0000 | FFFF | 0005 | 0108 | 0000 | 0000 | 0000 |
| 0000411140 | 0020 | 0000 | 0000 | 0000 | 0000 | 0000 | 652E | 736F |
| 0000411160 | 0000 | 0000 | 0000 | 0000 | FFFE | 0008 | 0166 | 0C2A |
| 0000411200 | 0000 | 0000 | 0040 | 0000 | 0000 | 0000 | 0000 | 0000 |
| 0000411220 | 312E | 6635 | 6B61 | 0065 | 0000 | 0000 | FFFE | 0008 |
| 0000411240 | 010A | 0000 | 0000 | 0000 | 0050 | 0000 | 0000 | 0C40 |
| 0000411260 | 0000 | 0000 | 785F | 656C | 7466 | 0000 | 0000 | 0000 |
| 0000411300 | FFFF | 0003 | 0108 | 0000 | 0000 | 0000 | 0010 | 0000 |
| 0000411320 | 0000 | 0000 | 0000 | 0000 | 795F | 6F74 | 0070 | 0000 |
| 0000411340 | 0010 | 0000 | FFFF | 0003 | 0108 | 0000 | 0000 | 0000 |
| 0000411360 | 0010 | 0000 | 0000 | 0000 | 0000 | 0000 | 785F | 6972 |

THU MAR 14 17:37:32 1991 GSPMON.4 PAGE 145, LINE 8497

| | | | | | | | | |
|---|---|---|---|---|---|---|---|---|
| 0000411400 | 6867 | 0074 | 0020 | 0000 | FFFF | 0003 | 0108 | 0000 |
| 0000411420 | 0000 | 0000 | 0010 | 0000 | 0000 | 0000 | 0000 | 0000 |
| 0000411440 | 795F | 6F64 | 6E77 | 0000 | 0030 | 0000 | FFFF | 0003 |
| 0000411460 | 0108 | 0000 | 0000 | 0000 | 0010 | 0000 | 0000 | 0000 |
| 0000411500 | 0000 | 0000 | 0000 | 0000 | 1656 | 0000 | 0040 | 0000 |
| 0000411520 | FFFF | 0003 | 0108 | 0000 | 0000 | 0000 | 0010 | 0000 |
| 0000411540 | 0000 | 0000 | 0000 | 0000 | 652E | 736F | 0000 | 0000 |
| 0000411560 | 0000 | 0000 | FFFE | 0008 | 0166 | 0C32 | 0000 | 0000 |
| 0000411600 | 0050 | 0000 | 0000 | 0000 | 0000 | 0000 | 312E | 6636 |
| 0000411620 | 6B61 | 0065 | 0000 | 0000 | FFFE | 0008 | 010A | 0000 |
| 0000411640 | 0000 | 0000 | 0020 | 0000 | 0000 | 0C48 | 0000 | 0000 |
| 0000411660 | 0000 | 0000 | 1660 | 0000 | 0000 | 0000 | FFFF | 0003 |
| 0000411700 | 0108 | 0000 | 0000 | 0000 | 0010 | 0000 | 0000 | 0000 |
| 0000411720 | 0000 | 0000 | 0000 | 0000 | 166C | 0000 | 0010 | 0000 |
| 0000411740 | FFFF | 0003 | 0108 | 0000 | 0000 | 0000 | 0010 | 0000 |
| 0000411760 | 0000 | 0000 | 0000 | 0000 | 652E | 736F | 0000 | 0000 |
| 0000412000 | 0000 | 0000 | FFFE | 0008 | 0166 | 0C40 | 0000 | 0000 |
| 0000412020 | 0020 | 0000 | 0000 | 0000 | 0000 | 0000 | 312E | 6637 |
| 0000412040 | 6B61 | 0065 | 0000 | 0000 | FFFE | 0008 | 010A | 0000 |
| 0000412060 | 0000 | 0000 | 0040 | 0000 | 0000 | 0C54 | 0000 | 0000 |
| 0000412100 | 0000 | 0000 | 1676 | 0000 | 0000 | 0000 | FFFF | 000D |
| 0000412120 | 0108 | 0000 | 0000 | 0000 | 0010 | 0000 | 0000 | 0000 |
| 0000412140 | 0000 | 0000 | 0000 | 0000 | 1689 | 0000 | 0010 | 0000 |
| 0000412160 | FFFF | 000D | 0108 | 0000 | 0000 | 0000 | 0010 | 0000 |
| 0000412200 | 0000 | 0000 | 0000 | 0000 | 0000 | 0000 | 169B | 0000 |
| 0000412220 | 0020 | 0000 | FFFF | 000D | 0108 | 0000 | 0000 | 0000 |
| 0000412240 | 0010 | 0000 | 0000 | 0000 | 0000 | 0000 | 0000 | 0000 |
| 0000412260 | 16A8 | 0000 | 0030 | 0000 | FFFF | 000D | 0108 | 0000 |
| 0000412300 | 0000 | 0000 | 0010 | 0000 | 0000 | 0000 | 0000 | 0000 |
| 0000412320 | 652E | 736F | 0000 | 0000 | 0000 | 0000 | FFFE | 0008 |
| 0000412340 | 0166 | 0C48 | 0000 | 0000 | 0040 | 0000 | 0000 | 0000 |
| 0000412360 | 0000 | 0000 | 662E | 6C69 | 0065 | 0000 | 0C56 | 0000 |
| 0000412400 | FFFE | 0000 | 0167 | 7067 | 635F | 726F | 2E72 | 0063 |
| 0000412420 | 0000 | 0000 | 0000 | 0000 | 662E | 6C69 | 0065 | 0000 |
| 0000412440 | 0CC2 | 0000 | FFFE | 0000 | 0167 | 7067 | 6D5F | 756F |
| 0000412460 | 682E | 0000 | 0000 | 0000 | 0000 | 0000 | 312E | 6638 |
| 0000412500 | 6B61 | 0065 | 0000 | 0000 | FFFE | 0008 | 010A | 0000 |
| 0000412520 | 0000 | 0000 | 0060 | 0000 | 0000 | 0C62 | 0000 | 0000 |
| 0000412540 | 0000 | 0000 | 16B6 | 0000 | 0000 | 0000 | FFFF | 000F |
| 0000412560 | 0108 | 0000 | 0000 | 0000 | 0020 | 0000 | 0000 | 0000 |
| 0000412600 | 0000 | 0000 | 0000 | 0000 | 16C3 | 0000 | 0020 | 0000 |
| 0000412620 | FFFF | 000F | 0108 | 0000 | 0000 | 0000 | 0020 | 0000 |
| 0000412640 | 0000 | 0000 | 0000 | 0000 | 0000 | 0000 | 16D9 | 0000 |
| 0000412660 | 0040 | 0000 | FFFF | 000F | 0108 | 0000 | 0000 | 0000 |
| 0000412700 | 0020 | 0000 | 0000 | 0000 | 0000 | 0000 | 652E | 736F |
| 0000412720 | 0000 | 0000 | 0000 | 0000 | FFFE | 0008 | 0166 | 0C58 |
| 0000412740 | 0000 | 0000 | 0060 | 0000 | 0000 | 0000 | 0000 | 0000 |
| 0000412760 | 312E | 6639 | 6B61 | 0065 | 0000 | 0000 | FFFE | 0008 |
| 0000413000 | 010A | 0000 | 0000 | 0000 | 00C0 | 0000 | 0000 | 0C7C |
| 0000413020 | 0000 | 0000 | 635F | 0078 | 0000 | 0000 | 0000 | 0000 |
| 0000413040 | FFFF | 000D | 0108 | 0000 | 0000 | 0000 | 0010 | 0000 |
| 0000413060 | 0000 | 0000 | 0000 | 0000 | 635F | 0079 | 0000 | 0000 |
| 0000413100 | 0010 | 0000 | FFFF | 000D | 0108 | 0000 | 0000 | 0000 |
| 0000413120 | 0010 | 0000 | 0000 | 0000 | 0000 | 0000 | 785F | 0031 |
| 0000413140 | 0000 | 0000 | 0020 | 0000 | FFFF | 0003 | 0108 | 0000 |
| 0000413160 | 0000 | 0000 | 0010 | 0000 | 0000 | 0000 | 0000 | 0000 |
| 0000413200 | 795F | 0031 | 0000 | 0000 | 0030 | 0000 | FFFF | 0003 |
| 0000413220 | 0108 | 0000 | 0000 | 0000 | 0010 | 0000 | 0000 | 0000 |
| 0000413240 | 0000 | 0000 | 785F | 0032 | 0000 | 0000 | 0040 | 0000 |

THU MAR 14 17:37:32 1991 GSPMON.4 PAGE 146, LINE 8556

| | | | | | | | | |
|---|---|---|---|---|---|---|---|---|
| 0000413260 | FFFF | 0003 | 0108 | 0000 | 0000 | 0000 | 0010 | 0000 |
| 0000413300 | 0000 | 0000 | 0000 | 0000 | 795F | 0032 | 0000 | 0000 |
| 0000413320 | 0050 | 0000 | FFFF | 0003 | 0108 | 0000 | 0000 | 0000 |
| 0000413340 | 0010 | 0000 | 0000 | 0000 | 0000 | 0000 | 685F | 5F70 |
| 0000413360 | 0078 | 0000 | 0060 | 0000 | FFFF | 0003 | 0108 | 0000 |
| 0000413400 | 0000 | 0000 | 0010 | 0000 | 0000 | 0000 | 0000 | 0000 |
| 0000413420 | 685F | 5F70 | 0079 | 0000 | 0070 | 0000 | FFFF | 0003 |
| 0000413440 | 0108 | 0000 | 0000 | 0000 | 0010 | 0000 | 0000 | 0000 |
| 0000413460 | 0000 | 0000 | 0000 | 0000 | 16EA | 0000 | 0080 | 0000 |
| 0000413500 | FFFF | 000F | 0108 | 0000 | 0000 | 0000 | 0020 | 0000 |
| 0000413520 | 0000 | 0000 | 0000 | 0000 | 0000 | 0000 | 16FA | 0000 |
| 0000413540 | 00A0 | 0000 | FFFF | 000D | 0108 | 0000 | 0000 | 0000 |
| 0000413560 | 0010 | 0000 | 0000 | 0000 | 0000 | 0000 | 0000 | 0000 |
| 0000413600 | 1709 | 0000 | 00B0 | 0000 | FFFF | 000D | 0108 | 0000 |
| 0000413620 | 0000 | 0000 | 0010 | 0000 | 0000 | 0000 | 0000 | 0000 |
| 0000413640 | 652E | 736F | 0000 | 0000 | 0000 | 0000 | FFFE | 0008 |
| 0000413660 | 0166 | 0C62 | 0000 | 0000 | 00C0 | 0000 | 0000 | 0000 |
| 0000413700 | 0000 | 0000 | 322E | 6630 | 6B61 | 0065 | 0000 | 0000 |
| 0000413720 | FFFE | 0008 | 010A | 0000 | 0000 | 0000 | 0030 | 0000 |
| 0000413740 | 0000 | 0C86 | 0000 | 0000 | 785F | 0000 | 0000 | 0000 |
| 0000413760 | 0000 | 0000 | FFFF | 0003 | 0108 | 0000 | 0000 | 0000 |
| 0000414000 | 0010 | 0000 | 0000 | 0000 | 0000 | 0000 | 795F | 0000 |
| 0000414020 | 0000 | 0000 | 0010 | 0000 | FFFF | 0003 | 0108 | 0000 |
| 0000414040 | 0000 | 0000 | 0010 | 0000 | 0000 | 0000 | 0000 | 0000 |
| 0000414060 | 695F | 6F63 | 5F6E | 6469 | 0020 | 0000 | FFFF | 0003 |
| 0000414100 | 0108 | 0000 | 0000 | 0000 | 0010 | 0000 | 0000 | 0000 |
| 0000414120 | 0000 | 0000 | 652E | 736F | 0000 | 0000 | 0000 | 0000 |
| 0000414140 | FFFE | 0008 | 0166 | 0C7C | 0000 | 0000 | 0030 | 0000 |
| 0000414160 | 0000 | 0000 | 0000 | 0000 | 322E | 6631 | 6B61 | 0065 |
| 0000414200 | 0000 | 0000 | FFFE | 0008 | 010A | 0000 | 0000 | 0000 |
| 0000414220 | 0070 | 0000 | 0000 | 0C98 | 0000 | 0000 | 785F | 0000 |
| 0000414240 | 0000 | 0000 | 0000 | 0000 | FFFF | 000D | 0108 | 0000 |
| 0000414260 | 0000 | 0000 | 0010 | 0000 | 0000 | 0000 | 0000 | 0000 |
| 0000414300 | 795F | 0000 | 0000 | 0000 | 0010 | 0000 | FFFF | 000D |
| 0000414320 | 0108 | 0000 | 0000 | 0000 | 0010 | 0000 | 0000 | 0000 |
| 0000414340 | 0000 | 0000 | 695F | 6F63 | 5F6E | 6469 | 0020 | 0000 |
| 0000414360 | FFFF | 000D | 0108 | 0000 | 0000 | 0000 | 0010 | 0000 |
| 0000414400 | 0000 | 0000 | 0000 | 0000 | 6C5F | 6665 | 0074 | 0000 |
| 0000414420 | 0030 | 0000 | FFFF | 000D | 0108 | 0000 | 0000 | 0000 |
| 0000414440 | 0010 | 0000 | 0000 | 0000 | 0000 | 0000 | 725F | 6769 |
| 0000414460 | 7468 | 0000 | 0040 | 0000 | FFFF | 000D | 0108 | 0000 |
| 0000414500 | 0000 | 0000 | 0010 | 0000 | 0000 | 0000 | 0000 | 0000 |
| 0000414520 | 755F | 0070 | 0000 | 0000 | 0050 | 0000 | FFFF | 000D |
| 0000414540 | 0108 | 0000 | 0000 | 0000 | 0010 | 0000 | 0000 | 0000 |
| 0000414560 | 0000 | 0000 | 645F | 776F | 006E | 0000 | 0060 | 0000 |
| 0000414600 | FFFF | 000D | 0108 | 0000 | 0000 | 0000 | 0010 | 0000 |
| 0000414620 | 0000 | 0000 | 0000 | 0000 | 652E | 736F | 0000 | 0000 |
| 0000414640 | 0000 | 0000 | FFFE | 0008 | 0166 | 0C86 | 0000 | 0000 |
| 0000414660 | 0070 | 0000 | 0000 | 0000 | 0000 | 0000 | 322E | 6632 |
| 0000414700 | 6B61 | 0065 | 0000 | 0000 | FFFE | 0008 | 010A | 0000 |
| 0000414720 | 0000 | 0000 | 0020 | 0000 | 0000 | 0CA0 | 0000 | 0000 |
| 0000414740 | 6D5F | 646F | 0065 | 0000 | 0000 | 0000 | FFFF | 000D |
| 0000414760 | 0108 | 0000 | 0000 | 0000 | 0010 | 0000 | 0000 | 0000 |
| 0000415000 | 0000 | 0000 | 725F | 7365 | 6C75 | 0074 | 0010 | 0000 |
| 0000415020 | FFFF | 000D | 0108 | 0000 | 0000 | 0000 | 0010 | 0000 |
| 0000415040 | 0000 | 0000 | 0000 | 0000 | 652E | 736F | 0000 | 0000 |
| 0000415060 | 0000 | 0000 | FFFE | 0008 | 0166 | 0C98 | 0000 | 0000 |
| 0000415100 | 0020 | 0000 | 0000 | 0000 | 0000 | 0000 | 322E | 6633 |
| 0000415120 | 6B61 | 0065 | 0000 | 0000 | FFFE | 0008 | 010A | 0000 |

THU MAR 14 17:37:32 1991 GSPMON.4 PAGE 147, LINE 8615

| | | | | | | | | |
|---|---|---|---|---|---|---|---|---|
| 0000415140 | 0000 | 0000 | 0020 | 0000 | 0000 | 0CAC | 0000 | 0000 |
| 0000415160 | 0000 | 0000 | 171A | 0000 | 0000 | 0000 | FFFF | 000C |
| 0000415200 | 0108 | 0000 | 0000 | 0000 | 0008 | 0000 | 0000 | 0000 |
| 0000415220 | 0000 | 0000 | 0000 | 0000 | 1726 | 0000 | 0008 | 0000 |
| 0000415240 | FFFF | 000C | 0108 | 0000 | 0000 | 0000 | 0008 | 0000 |
| 0000415260 | 0000 | 0000 | 0000 | 0000 | 0000 | 0000 | 1731 | 0000 |
| 0000415300 | 0010 | 0000 | FFFF | 000C | 0108 | 0000 | 0000 | 0000 |
| 0000415320 | 0008 | 0000 | 0000 | 0000 | 0000 | 0000 | 0000 | 0000 |
| 0000415340 | 173C | 0000 | 0018 | 0000 | FFFF | 000C | 0108 | 0000 |
| 0000415360 | 0000 | 0000 | 0008 | 0000 | 0000 | 0000 | 0000 | 0000 |
| 0000415400 | 652E | 736F | 0000 | 0000 | 0000 | 0000 | FFFE | 0008 |
| 0000415420 | 0166 | 0CA0 | 0000 | 0000 | 0020 | 0000 | 0000 | 0000 |
| 0000415440 | 0000 | 0000 | 322E | 6634 | 6B61 | 0065 | 0000 | 0000 |
| 0000415460 | FFFE | 0008 | 010A | 0000 | 0000 | 0000 | 0020 | 0000 |
| 0000415500 | 0000 | 0CB6 | 0000 | 0000 | 615F | 7474 | 0072 | 0000 |
| 0000415520 | 0000 | 0000 | FFFF | 000D | 0108 | 0000 | 0000 | 0000 |
| 0000415540 | 0010 | 0000 | 0000 | 0000 | 0000 | 0000 | 735F | 7274 |
| 0000415560 | 7069 | 0000 | 0010 | 0000 | FFFF | 000C | 0108 | 0000 |
| 0000415600 | 0000 | 0000 | 0008 | 0000 | 0000 | 0000 | 0000 | 0000 |
| 0000415620 | 725F | 6365 | 0074 | 0000 | 0018 | 0000 | FFFF | 000C |
| 0000415640 | 0108 | 0000 | 0000 | 0000 | 0008 | 0000 | 0000 | 0000 |
| 0000415660 | 0000 | 0000 | 652E | 736F | 0000 | 0000 | 0000 | 0000 |
| 0000415700 | FFFE | 0008 | 0166 | 0CAC | 0000 | 0000 | 0020 | 0000 |
| 0000415720 | 0000 | 0000 | 0000 | 0000 | 322E | 6635 | 6B61 | 0065 |
| 0000415740 | 0000 | 0000 | FFFE | 0008 | 010A | 0000 | 0000 | 0000 |
| 0000415760 | 1930 | 0000 | 0000 | 0CC2 | 0000 | 0000 | 0000 | 0000 |
| 0000416000 | 1746 | 0000 | 0000 | 0000 | FFFF | 000D | 0108 | 0000 |
| 0000416020 | 0000 | 0000 | 0010 | 0000 | 0000 | 0000 | 0000 | 0000 |
| 0000416040 | 785F | 0000 | 0000 | 0000 | 0010 | 0000 | FFFF | 000D |
| 0000416060 | 0108 | 0000 | 0000 | 0000 | 0010 | 0000 | 0000 | 0000 |
| 0000416100 | 0000 | 0000 | 795F | 0000 | 0000 | 0000 | 0020 | 0000 |
| 0000416120 | FFFF | 000D | 0108 | 0000 | 0000 | 0000 | 0010 | 0000 |
| 0000416140 | 0000 | 0000 | 0000 | 0000 | 0000 | 0000 | 1750 | 0000 |
| 0000416160 | 0030 | 0000 | FFFF | 0038 | 0108 | 0CAC | 0000 | 0000 |
| 0000416200 | 1900 | 00C8 | 0000 | 0000 | 0000 | 0000 | 652E | 736F |
| 0000416220 | 0000 | 0000 | 0000 | 0000 | FFFE | 0008 | 0166 | 0CB6 |
| 0000416240 | 0000 | 0000 | 1930 | 0000 | 0000 | 0000 | 0000 | 0000 |
| 0000416260 | 662E | 6C69 | 0065 | 0000 | 0CC4 | 0000 | FFFE | 0000 |
| 0000416300 | 0167 | 7067 | 635F | 726F | 2E72 | 0063 | 0000 | 0000 |
| 0000416320 | 0000 | 0000 | 662E | 6C69 | 0065 | 0000 | 0CD0 | 0000 |
| 0000416340 | FFFE | 0000 | 0167 | 7067 | 615F | 6C70 | 682E | 0000 |
| 0000416360 | 0000 | 0000 | 0000 | 0000 | 322E | 6636 | 6B61 | 0065 |
| 0000416400 | 0000 | 0000 | FFFE | 0008 | 010A | 0000 | 0000 | 0000 |
| 0000416420 | 0030 | 0000 | 0000 | 0CD0 | 0000 | 0000 | 775F | 6469 |
| 0000416440 | 6874 | 0000 | 0000 | 0000 | FFFF | 000D | 0108 | 0000 |
| 0000416460 | 0000 | 0000 | 0010 | 0000 | 0000 | 0000 | 0000 | 0000 |
| 0000416500 | 685F | 6965 | 6867 | 0074 | 0010 | 0000 | FFFF | 000D |
| 0000416520 | 0108 | 0000 | 0000 | 0000 | 0010 | 0000 | 0000 | 0000 |
| 0000416540 | 0000 | 0000 | 645F | 7065 | 6874 | 0000 | 0020 | 0000 |
| 0000416560 | FFFF | 000D | 0108 | 0000 | 0000 | 0000 | 0010 | 0000 |
| 0000416600 | 0000 | 0000 | 0000 | 0000 | 652E | 736F | 0000 | 0000 |
| 0000416620 | 0000 | 0000 | FFFE | 0008 | 0166 | 0CC6 | 0000 | 0000 |
| 0000416640 | 0030 | 0000 | 0000 | 0000 | 0000 | 0000 | 662E | 6C69 |
| 0000416660 | 0065 | 0000 | 0CD2 | 0000 | FFFE | 0000 | 0167 | 7067 |
| 0000416700 | 615F | 6C70 | 692E | 636E | 0000 | 0000 | 0000 | 0000 |
| 0000416720 | 662E | 6C69 | 0065 | 0000 | 0CD4 | 0000 | FFFE | 0000 |
| 0000416740 | 0167 | 7067 | 615F | 6C70 | 682E | 0000 | 0000 | 0000 |
| 0000416760 | 0000 | 0000 | 662E | 6C69 | 0065 | 0000 | 0CD6 | 0000 |
| 0000417000 | FFFE | 0000 | 0167 | 7067 | 635F | 726F | 2E72 | 0063 |

THU MAR 14 17:37:32 1991 GSPMON.4 PAGE 148, LINE 8674

| | | | | | | | | |
|---|---|---|---|---|---|---|---|---|
| 0000417020 | 0000 | 0000 | 0000 | 0000 | 662E | 6C69 | 0065 | 0000 |
| 0000417040 | 0D54 | 0000 | FFFE | 0000 | 0167 | 7067 | 695F | 6F63 |
| 0000417060 | 736E | 682E | 0000 | 0000 | 0000 | 0000 | 322E | 6637 |
| 0000417100 | 6B61 | 0065 | 0000 | 0000 | FFFE | 0008 | 010A | 0000 |
| 0000417120 | 0000 | 0000 | 0020 | 0000 | 0000 | 0CE0 | 0000 | 0000 |
| 0000417140 | 785F | 0000 | 0000 | 0000 | 0000 | 0000 | FFFF | 0003 |
| 0000417160 | 0108 | 0000 | 0000 | 0000 | 0010 | 0000 | 0000 | 0000 |
| 0000417200 | 0000 | 0000 | 795F | 0000 | 0000 | 0000 | 0010 | 0000 |
| 0000417220 | FFFF | 0003 | 0108 | 0000 | 0000 | 0000 | 0010 | 0000 |
| 0000417240 | 0000 | 0000 | 0000 | 0000 | 652E | 736F | 0000 | 0000 |
| 0000417260 | 0000 | 0000 | FFFE | 0008 | 0166 | 0CD8 | 0000 | 0000 |
| 0000417300 | 0020 | 0000 | 0000 | 0000 | 0000 | 0000 | 322E | 6638 |
| 0000417320 | 6B61 | 0065 | 0000 | 0000 | FFFE | 0009 | 010C | 0000 |
| 0000417340 | 0000 | 0000 | 0020 | 0000 | 0000 | 0CE8 | 0000 | 0000 |
| 0000417360 | 0000 | 0000 | 175C | 0000 | 0000 | 0000 | FFFF | 0008 |
| 0000417400 | 010B | 0CD8 | 0000 | 0000 | 0020 | 0000 | 0000 | 0000 |
| 0000417420 | 0000 | 0000 | 6F5F | 6666 | 6573 | 0074 | 0000 | 0000 |
| 0000417440 | FFFF | 0005 | 010B | 0000 | 0000 | 0000 | 0020 | 0000 |
| 0000417460 | 0000 | 0000 | 0000 | 0000 | 652E | 736F | 0000 | 0000 |
| 0000417500 | 0000 | 0000 | FFFE | 0009 | 0166 | 0CED | 0000 | 0000 |
| 0000417520 | 0020 | 0000 | 0000 | 0000 | 0000 | 0000 | 322E | 6639 |
| 0000417540 | 6B61 | 0065 | 0000 | 0000 | FFFE | 0008 | 010A | 0000 |
| 0000417560 | 0000 | 0000 | 0010 | 0000 | 0000 | 0CF0 | 0000 | 0000 |
| 0000417600 | 0000 | 0000 | 1767 | 0000 | 0000 | 0000 | FFFF | 000C |
| 0000417620 | 0108 | 0000 | 0000 | 0000 | 0008 | 0000 | 0000 | 0000 |
| 0000417640 | 0000 | 0000 | 0000 | 0000 | 1771 | 0000 | 0008 | 0000 |
| 0000417660 | FFFF | 000C | 0108 | 0000 | 0000 | 0000 | 0008 | 0000 |
| 0000417700 | 0000 | 0000 | 0000 | 0000 | 652E | 736F | 0000 | 0000 |
| 0000417720 | 0000 | 0000 | FFFE | 0008 | 0166 | 0CE8 | 0000 | 0000 |
| 0000417740 | 0010 | 0000 | 0000 | 0000 | 0000 | 0000 | 332E | 6630 |
| 0000417760 | 6B61 | 0065 | 0000 | 0000 | FFFE | 0008 | 010A | 0000 |
| 0000420000 | 0000 | 0000 | 0020 | 0000 | 0000 | 0CF8 | 0000 | 0000 |
| 0000420020 | 705F | 7869 | [illegible]5F | 6666 | 0000 | 0000 | FFFF | 000D |
| 0000420040 | 0108 | 0000 | 0000 | 0000 | 0010 | 0000 | 0000 | 0000 |
| 0000420060 | 0000 | 0000 | 705F | 7869 | 765F | 6C61 | 0010 | 0000 |
| 0000420100 | FFFF | 000D | 0108 | 0000 | 0000 | 0000 | 0010 | 0000 |
| 0000420120 | 0000 | 0000 | 0000 | 0000 | 652E | 736F | 0000 | 0000 |
| 0000420140 | 0000 | 0000 | FFFE | 0008 | 0166 | 0CF0 | 0000 | 0000 |
| 0000420160 | 0020 | 0000 | 0000 | 0000 | 0000 | 0000 | 332E | 6631 |
| 0000420200 | 6B61 | 0065 | 0000 | 0000 | FFFE | 0009 | 010C | 0000 |
| 0000420220 | 0000 | 0000 | 0020 | 0000 | 0000 | 0D02 | 0000 | 0000 |
| 0000420240 | 745F | 6970 | 6578 | 0073 | 0000 | 0000 | FFFF | 000D |
| 0000420260 | 010B | 0000 | 0000 | 0000 | 0010 | 0000 | 0000 | 0000 |
| 0000420300 | 0000 | 0000 | 645F | 6175 | 5F6C | 7470 | 0000 | 0000 |
| 0000420320 | FFFF | 0008 | 010B | 0CE8 | 0000 | 0000 | 0010 | 0000 |
| 0000420340 | 0000 | 0000 | 0000 | 0000 | 0000 | 0000 | 177C | 0000 |
| 0000420360 | 0000 | 0000 | FFFF | 0008 | 010B | 0CF0 | 0000 | 0000 |
| 0000420400 | 0020 | 0000 | 0000 | 0000 | 0000 | 0000 | 652E | 736F |
| 0000420420 | 0000 | 0000 | 0000 | 0000 | FFFE | 0009 | 0166 | 0CF8 |
| 0000420440 | 0000 | 0000 | 0020 | 0000 | 0000 | 0000 | 0000 | 0000 |
| 0000420460 | 332E | 6632 | 6B61 | 0065 | 0000 | 0000 | FFFE | 0008 |
| 0000420500 | 010A | 0000 | 0000 | 0000 | 0040 | 0000 | 0000 | 0D0A |
| 0000420520 | 0000 | 0000 | 705F | 696F | 746E | 0000 | 0000 | 0000 |
| 0000420540 | FFFF | 0009 | 0108 | 0CED | 0000 | 0000 | 0020 | 0000 |
| 0000420560 | 0000 | 0000 | 0000 | 0000 | 705F | 0074 | 0000 | 0000 |
| 0000420600 | 0020 | 0000 | FFFF | 0009 | 0108 | 0CF8 | 0000 | 0000 |
| 0000420620 | 0020 | 0000 | 0000 | 0000 | 0000 | 0000 | 652E | 736F |
| 0000420640 | 0000 | 0000 | 0000 | 0000 | FFFE | 0008 | 0166 | 0D02 |
| 0000420660 | 0000 | 0000 | 0040 | 0000 | 0000 | 0000 | 0000 | 0000 |

THU MAR 14 17:37:32 1991 GSPMON.4 PAGE 149, LINE 8733

| | | | | | | | | |
|---|---|---|---|---|---|---|---|---|
| 0000420700 | 332E | 6633 | 6B61 | 0065 | 0000 | 0000 | FFFE | 0008 |
| 0000420720 | 010A | 0000 | 0000 | 0000 | 0020 | 0000 | 0000 | 0D12 |
| 0000420740 | 0000 | 0000 | 785F | 0000 | 0000 | 0000 | 0000 | 0000 |
| 0000420760 | FFFF | 0003 | 0108 | 0000 | 0000 | 0000 | 0010 | 0000 |
| 0000421000 | 0000 | 0000 | 0000 | 0000 | 795F | 0000 | 0000 | 0000 |
| 0000421020 | 0010 | 0000 | FFFF | 0003 | 0108 | 0000 | 0000 | 0000 |
| 0000421040 | 0010 | 0000 | 0000 | 0000 | 0000 | 0000 | 652E | 736F |
| 0000421060 | 0000 | 0000 | 0000 | 0000 | FFFE | 0008 | 0166 | 0D0A |
| 0000421100 | 0000 | 0000 | 0020 | 0000 | 0000 | 0000 | 0000 | 0000 |
| 0000421120 | 332E | 6634 | 6B61 | 0065 | 0000 | 0000 | FFFE | 0008 |
| 0000421140 | 010A | 0000 | 0000 | 0000 | 1030 | 0000 | 0000 | 0D1E |
| 0000421160 | 0000 | 0000 | 0000 | 0000 | 1787 | 0000 | 0000 | 0000 |
| 0000421200 | FFFF | 000D | 0108 | 0000 | 0000 | 0000 | 0010 | 0000 |
| 0000421220 | 0000 | 0000 | 0000 | 0000 | 0000 | 0000 | 1796 | 0000 |
| 0000421240 | 0010 | 0000 | FFFF | 000D | 0108 | 0000 | 0000 | 0000 |
| 0000421260 | 0010 | 0000 | 0000 | 0000 | 0000 | 0000 | 0000 | 0000 |
| 0000421300 | 17A8 | 0000 | 0020 | 0000 | FFFF | 000D | 0108 | 0000 |
| 0000421320 | 0000 | 0000 | 0010 | 0000 | 0000 | 0000 | 0000 | 0000 |
| 0000421340 | 0000 | 0000 | 17BA | 0000 | 0030 | 0000 | FFFF | 0038 |
| 0000421360 | 0108 | 0D02 | 0000 | 0000 | 1000 | 0040 | 0000 | 0000 |
| 0000421400 | 0000 | 0000 | 652E | 736F | 0000 | 0000 | 0000 | 0000 |
| 0000421420 | FFFE | 0008 | 0166 | 0D12 | 0000 | 0000 | 1030 | 0000 |
| 0000421440 | 0000 | 0000 | 0000 | 0000 | 332E | 6635 | 6B61 | 0065 |
| 0000421460 | 0000 | 0000 | FFFE | 0008 | 010A | 0000 | 0000 | 0000 |
| 0000421500 | 0230 | 0000 | 0000 | 0D2A | 0000 | 0000 | 0000 | 0000 |
| 0000421520 | 17C6 | 0000 | 0000 | 0000 | FFFF | 000D | 0108 | 0000 |
| 0000421540 | 0000 | 0000 | 0010 | 0000 | 0000 | 0000 | 0000 | 0000 |
| 0000421560 | 0000 | 0000 | 17D5 | 0000 | 0010 | 0000 | FFFF | 000D |
| 0000421600 | 0108 | 0000 | 0000 | 0000 | 0010 | 0000 | 0000 | 0000 |
| 0000421620 | 0000 | 0000 | 0000 | 0000 | 17E7 | 0000 | 0020 | 0000 |
| 0000421640 | FFFF | 000D | 0108 | 0000 | 0000 | 0000 | 0010 | 0000 |
| 0000421660 | 0000 | 0000 | 0000 | 0000 | 0000 | 0000 | 17F9 | 0000 |
| 0000421700 | 0030 | 0000 | FFFF | 003C | 0108 | 0000 | 0000 | 0000 |
| 0000421720 | 0200 | 0040 | 0000 | 0000 | 0000 | 0000 | 652E | 736F |
| 0000421740 | 0000 | 0000 | 0000 | 0000 | FFFE | 0008 | 0166 | 0D1E |
| 0000421760 | 0000 | 0000 | 0230 | 0000 | 0000 | 0000 | 0000 | 0000 |
| 0000422000 | 332E | 6636 | 6B61 | 0065 | 0000 | 0000 | FFFE | 0008 |
| 0000422020 | 010A | 0000 | 0000 | 0000 | 14B0 | 0000 | 0000 | 0D32 |
| 0000422040 | 0000 | 0000 | 0000 | 0000 | 180D | 0000 | 0000 | 0000 |
| 0000422060 | FFFF | 0032 | 0108 | 0000 | 0000 | 0000 | 0100 | 0020 |
| 0000422100 | 0000 | 0000 | 0000 | 0000 | 0000 | 0000 | 181B | 0000 |
| 0000422120 | 0100 | 0000 | FFFF | 0038 | 0108 | 0D1E | 0000 | 0000 |
| 0000422140 | 13B0 | 0009 | 0000 | 0000 | 0000 | 0000 | 652E | 736F |
| 0000422160 | 0000 | 0000 | 0000 | 0000 | FFFE | 0008 | 0166 | 0D2A |
| 0000422200 | 0000 | 0000 | 14B0 | 0000 | 0000 | 0000 | 0000 | 0000 |
| 0000422220 | 332E | 6637 | 6B61 | 0065 | 0000 | 0000 | FFFE | 0008 |
| 0000422240 | 010A | 000C | 0000 | 0000 | 39E0 | 0000 | 0000 | 0D46 |
| 0000422260 | 0000 | 0000 | 0000 | 0000 | 182A | 0000 | 0000 | 0000 |
| 0000422300 | FFFF | 000D | 0108 | 0000 | 0000 | 0000 | 0010 | 0000 |
| 0000422320 | 0000 | 0000 | 0000 | 0000 | 0000 | 0000 | 1835 | 0000 |
| 0000422340 | 0010 | 0000 | FFFF | 0003 | 0108 | 0000 | 0000 | 0000 |
| 0000422360 | 0010 | 0000 | 0000 | 0000 | 0000 | 0000 | 0000 | 0000 |
| 0000422400 | 1842 | 0000 | 0020 | 0000 | FFFF | 0003 | 0108 | 0000 |
| 0000422420 | 0000 | 0000 | 0010 | 0000 | 0000 | 0000 | 0000 | 0000 |
| 0000422440 | 0000 | 0000 | 1850 | 0000 | 0030 | 0000 | FFFF | 0003 |
| 0000422460 | 0108 | 0000 | 0000 | 0000 | 0010 | 0000 | 0000 | 0000 |
| 0000422500 | 0000 | 0000 | 0000 | 0000 | 185B | 0000 | 0040 | 0000 |
| 0000422520 | FFFF | 0003 | 0108 | 0000 | 0000 | 0000 | 0010 | 0000 |
| 0000422540 | 0000 | 0000 | 0000 | 0000 | 0000 | 0000 | 1868 | 0000 |

THU MAR 14 17:37:32 1991 GSPMON.4 PAGE 150, LINE 8792

| | | | | | | | | |
|---|---|---|---|---|---|---|---|---|
| 0000422560 | 0050 | 0000 | FFFF | 0008 | 0108 | 0D12 | 0000 | 0000 |
| 0000422600 | 1030 | 0000 | 0000 | 0000 | 0000 | 0000 | 0000 | 0000 |
| 0000422620 | 1874 | 0000 | 1080 | 0000 | FFFF | 0008 | 0108 | 0D2A |
| 0000422640 | 0000 | 0000 | 14B0 | 0000 | 0000 | 0000 | 0000 | 0000 |
| 0000422660 | 0000 | 0000 | 188E | 0000 | 2530 | 0000 | FFFF | 0008 |
| 0000422700 | 0108 | 0D2A | 0000 | 0000 | 14B0 | 0000 | 0000 | 0000 |
| 0000422720 | 0000 | 0000 | 652E | 736F | 0000 | 0000 | 0000 | 0000 |
| 0000422740 | FFFE | 0008 | 0166 | 0D32 | 0000 | 0000 | 39E0 | 0000 |
| 0000422760 | 0000 | 0000 | 0000 | 0000 | 0000 | 0000 | 18A5 | 0000 |
| 0000423000 | 0000 | 0000 | FFFE | 0008 | 010A | 0000 | 0000 | 0000 |
| 0000423020 | 3A40 | 0000 | 0000 | 0D54 | 0000 | 0000 | 695F | 6F63 |
| 0000423040 | 5F6E | 6469 | 0000 | 0000 | FFFF | 000D | 0108 | 0000 |
| 0000423060 | 0000 | 0000 | 0010 | 0000 | 0000 | 0000 | 0000 | 0000 |
| 0000423100 | 0000 | 0000 | 18B2 | 0000 | 0010 | 0000 | FFFF | 000D |
| 0000423120 | 0108 | 0000 | 0000 | 0000 | 0010 | 0000 | 0000 | 0000 |
| 0000423140 | 0000 | 0000 | 0000 | 0000 | 18C2 | 0000 | 0020 | 0000 |
| 0000423160 | FFFF | 0008 | 0108 | 0D32 | 0000 | 0000 | 39E0 | 0000 |
| 0000423200 | 0000 | 0000 | 0000 | 0000 | 0000 | 0000 | 18CE | 0000 |
| 0000423220 | 3A00 | 0000 | FFFF | 0018 | 0108 | 0D46 | 0000 | 0000 |
| 0000423240 | 0020 | 0000 | 0000 | 0000 | 0000 | 0000 | 0000 | 0000 |
| 0000423260 | 18DD | 0000 | 3A20 | 0000 | FFFF | 0018 | 0108 | 0D46 |
| 0000423300 | 0000 | 0000 | 0020 | 0000 | 0000 | 0000 | 0000 | 0000 |
| 0000423320 | 652E | 736F | 0000 | 0000 | 0000 | 0000 | FFFE | 0008 |
| 0000423340 | 0166 | 0D46 | 0000 | 0000 | 3A40 | 0000 | 0000 | 0000 |
| 0000423360 | 0000 | 0000 | 662E | 6C69 | 0065 | 0000 | 0E9C | 0000 |
| 0000423400 | FFFE | 0000 | 0167 | 7067 | 635F | 726F | 2E72 | 0063 |
| 0000423420 | 0000 | 0000 | 0000 | 0000 | 332E | 6638 | 6B61 | 0065 |
| 0000423440 | 0000 | 0000 | FFFE | 000A | 010F | 0000 | 0000 | 0000 |
| 0000423460 | 0001 | 0000 | 0000 | 0D5E | 0000 | 0000 | 0000 | 0000 |
| 0000423500 | 18E8 | 0000 | 0000 | 0000 | FFFF | 000B | 0110 | 0000 |
| 0000423520 | 0000 | 0000 | 0001 | 0000 | 0000 | 0000 | 0000 | 0000 |
| 0000423540 | 445F | 5249 | 4345 | 0054 | 0001 | 0000 | FFFF | 000B |
| 0000423560 | 0110 | 0000 | 0000 | 0000 | 0001 | 0000 | 0000 | 0000 |
| 0000423600 | 0000 | 0000 | 652E | 736F | 0000 | 0000 | 0000 | 0000 |
| 0000423620 | FFFE | 000A | 0166 | 0D56 | 0000 | 0000 | 0001 | 0000 |
| 0000423640 | 0000 | 0000 | 0000 | 0000 | 0000 | 0000 | 18F2 | 0000 |
| 0000423660 | 7C00 | FFC9 | 0003 | 0018 | 0103 | 0D46 | 0000 | 0000 |
| 0000423700 | 0020 | 0000 | 0000 | 0000 | 0000 | 0000 | 0000 | 0000 |
| 0000423720 | 1902 | 0000 | 7C20 | FFC9 | 0003 | 0018 | 0103 | 0D46 |
| 0000423740 | 0000 | 0000 | 0020 | 0000 | 0000 | 0000 | 0000 | 0000 |
| 0000423760 | 0000 | 0000 | 1917 | 0000 | 7C40 | FFC9 | 0003 | 0008 |
| 0000424000 | 0103 | 0D12 | 0000 | 0000 | 1030 | 0000 | 0000 | 0000 |
| 0000424020 | 0000 | 0000 | 0000 | 0000 | 192C | 0000 | 8C70 | FFC9 |
| 0000424040 | 0003 | 0018 | 0103 | 0D12 | 0000 | 0000 | 0020 | 0000 |
| 0000424060 | 0000 | 0000 | 0000 | 0000 | 0000 | 0000 | 1941 | 0000 |
| 0000424100 | 8C90 | FFC9 | 0003 | 0018 | 0103 | 0D1E | 0000 | 0000 |
| 0000424120 | 0020 | 0000 | 0000 | 0000 | 0000 | 0000 | 0000 | 000U |
| 0000424140 | 1953 | 0000 | 8CB0 | FFC9 | 0003 | 0018 | 0103 | 0D32 |
| 0000424160 | 0000 | 0000 | 0020 | 0000 | 0000 | 0000 | 0000 | 0000 |
| 0000424200 | 0000 | 0000 | 1963 | 0000 | 8CD0 | FFC9 | 0003 | 009A |
| 0000424220 | 0103 | 0B78 | 0000 | 0000 | 0020 | 0000 | 0000 | 0000 |
| 0000424240 | 0000 | 0000 | 0000 | 0000 | 1974 | 0000 | 0990 | FFC2 |
| 0000424260 | 0001 | 0024 | 0102 | 0000 | 0000 | 03F0 | 0000 | F638 |
| 0000424300 | 0000 | 0D7E | 0000 | 0003 | 622E | 0066 | 0000 | 0000 |
| 0000424320 | 0990 | FFC2 | 0001 | 0000 | 0165 | 0000 | 0000 | 008F |
| 0000424340 | 0000 | 0000 | 0000 | 021A | 0000 | 0000 | 695F | 5F6E |
| 0000424360 | 7470 | 0072 | FFE0 | FFFF | FFFF | 0010 | 0109 | 0000 |
| 0000424400 | 0000 | 0000 | 0020 | 0000 | 0000 | 0000 | 0000 | 0000 |
| 0000424420 | 6F5F | 7475 | 705F | 7274 | FFC0 | FFFF | FFFF | 0010 |

THU MAR 14 17:37:32 1991 GSPMON.4 PAGE 151, LINE 8851

| | | | | | | | | |
|---|---|---|---|---|---|---|---|---|
| 0000424440 | 0109 | 0000 | 0000 | 0000 | 0020 | 0000 | 0000 | 0000 |
| 0000424460 | 0000 | 0000 | 0000 | 0000 | 1988 | 0000 | 0000 | 0000 |
| 0000424500 | FFFF | 0018 | 0101 | 0D46 | 0000 | 0000 | 0020 | 0000 |
| 0000424520 | 0000 | 0000 | 0000 | 0000 | 0000 | 0000 | 199A | 0000 |
| 0000424540 | 0020 | 0000 | FFFF | 003D | 0101 | 0000 | 0000 | 0000 |
| 0000424560 | 0400 | 0040 | 0000 | 0000 | 0000 | 0000 | 0000 | 0000 |
| 0000424600 | 19A4 | 0000 | 0420 | 0000 | FFFF | 000D | 0101 | 0000 |
| 0000424620 | 0000 | 0000 | 0010 | 0000 | 0000 | 0000 | 0000 | 0000 |
| 0000424640 | 695F | 0000 | 0000 | 0000 | 0430 | 0000 | FFFF | 000D |
| 0000424660 | 0101 | 0000 | 0000 | 0000 | 0010 | 0000 | 0000 | 0000 |
| 0000424700 | 0000 | 0000 | 652E | 0066 | 0000 | 0000 | 0D80 | FFC2 |
| 0000424720 | 0001 | 0000 | 0165 | 0000 | 0000 | 00A8 | 0000 | 0000 |
| 0000424740 | 0000 | 0000 | 0000 | 0000 | 0000 | 0000 | 19B0 | 0000 |
| 0000424760 | 0DB0 | FFC2 | 0001 | 002D | 0103 | 0000 | 0000 | 01B0 |
| 0000425000 | 0000 | F680 | 0000 | 0D88 | 0000 | 0003 | 622E | 0066 |
| 0000425020 | 0000 | 0000 | 0D80 | FFC2 | 0001 | 0000 | 0165 | 0000 |
| 0000425040 | 0000 | 00B0 | 0000 | 0000 | 0000 | 0224 | 0000 | 0000 |
| 0000425060 | 0000 | 0000 | 19C2 | 0000 | FFE0 | FFFF | FFFF | 0018 |
| 0000425100 | 0109 | 0D46 | 0000 | 0000 | 0020 | 0000 | 0000 | 0000 |
| 0000425120 | 0000 | 0000 | 0000 | 0000 | 19CC | 0000 | 0000 | 0000 |
| 0000425140 | FFFF | 000D | 0101 | 0000 | 0000 | 0000 | 0010 | 0000 |
| 0000425160 | 0000 | 0000 | 0000 | 0000 | 652E | 0066 | 0000 | 0000 |
| 0000425200 | 0F30 | FFC2 | 0001 | 0000 | 0165 | 0000 | 0000 | 00BB |
| 0000425220 | 0000 | 0000 | 0000 | 0000 | 0000 | 0000 | 0000 | 0000 |
| 0000425240 | 19D6 | 0000 | 0F30 | FFC2 | 0001 | 0068 | 0103 | 0D46 |
| 0000425260 | 0000 | 03A0 | 0000 | F6AA | 0000 | 0D98 | 0000 | 0003 |
| 0000425300 | 622E | 0066 | 0000 | 0000 | 0F30 | FFC2 | 0001 | 0000 |
| 0000425320 | 0165 | 0000 | 0000 | 00C3 | 0000 | 0000 | 0000 | 0234 |
| 0000425340 | 0000 | 0000 | 0000 | 0000 | 19E8 | 0000 | FFE0 | FFFF |
| 0000425360 | FFFF | 000F | 0109 | 0000 | 0000 | 0000 | 0020 | 0000 |
| 0000425400 | 0000 | 0000 | 0000 | 0000 | 0000 | 0000 | 19FF | 0000 |
| 0000425420 | FFC0 | FFFF | FFFF | 0018 | 0109 | 0D46 | 0000 | 0000 |
| 0000425440 | 0020 | 0000 | 0000 | 0000 | 0000 | 0000 | 695F | 0000 |
| 0000425460 | 0000 | 0000 | 0000 | 0000 | FFFF | 000D | 0101 | 0000 |
| 0000425500 | 0000 | 0000 | 0010 | 0000 | 0000 | 0000 | 0000 | 0000 |
| 0000425520 | 0000 | 0000 | 1A0F | 0000 | 0010 | 0000 | FFFF | 0018 |
| 0000425540 | 0101 | 0D46 | 0000 | 0000 | 0020 | 0000 | 0000 | 0000 |
| 0000425560 | 0000 | 0000 | 0000 | 0000 | 1A19 | 0000 | 0030 | 0000 |
| 0000425600 | FFFF | 0018 | 0101 | 0D46 | 0000 | 0000 | 0020 | 0000 |
| 0000425620 | 0000 | 0000 | 0000 | 0000 | 652E | 0066 | 0000 | 0000 |
| 0000425640 | 12D0 | FFC2 | 0001 | 0000 | 0165 | 0000 | 0000 | 00D7 |
| 0000425660 | 0000 | 0000 | 0000 | 0000 | 0000 | 0000 | 0000 | 0000 |
| 0000425700 | 1A23 | 0000 | 12D0 | FFC2 | 0001 | 0020 | 0103 | 0000 |
| 0000425720 | 0000 | 0200 | 0000 | F6EC | 0000 | 0DA4 | 0000 | 0003 |
| 0000425740 | 622E | 0066 | 0000 | 0000 | 12D0 | FFC2 | 0001 | 0000 |
| 0000425760 | 0165 | 0000 | 0000 | 00DD | 0000 | 0000 | 0000 | 0240 |
| 0000426000 | 0000 | 0000 | 0000 | 0000 | 1A36 | 0000 | FFE0 | FFFF |
| 0000426020 | FFFF | 0018 | 0109 | 0D46 | 0000 | 0000 | 0020 | 0000 |
| 0000426040 | 0000 | 0000 | 0000 | 0000 | 0000 | 0000 | 1A47 | 0000 |
| 0000426060 | FFC0 | FFFF | FFFF | 0018 | 0109 | 0D46 | 0000 | 0000 |
| 0000426100 | 0020 | 0000 | 0000 | 0000 | 0000 | 0000 | 0000 | 0000 |
| 0000426120 | 1A59 | 0000 | 0000 | 0000 | FFFF | 0018 | 0101 | 0D46 |
| 0000426140 | 0000 | 0000 | 0020 | 0000 | 0000 | 0000 | 0000 | 0000 |
| 0000426160 | 652E | 0066 | 0000 | 0000 | 14D0 | FFC2 | 0001 | 0000 |
| 0000426200 | 0165 | 0000 | 0000 | 00EA | 0000 | 0000 | 0000 | 0000 |
| 0000426220 | 0000 | 0000 | 0000 | 0000 | 1A63 | 0000 | 14D0 | FFC2 |
| 0000426240 | 0001 | 0068 | 0103 | 0D46 | 0000 | 0260 | 0000 | F716 |
| 0000426260 | 0000 | 0DAC | 0000 | 0004 | 622E | 0066 | 0000 | 0000 |
| 0000426300 | 14D0 | FFC2 | 0001 | 0000 | 0165 | 0000 | 0000 | 00F0 |

THU MAR 14 17:37:32 1991 GSPMON.4 PAGE 152, LINE 8910

| | | | | | | | | |
|---|---|---|---|---|---|---|---|---|
| 0000426320 | 0000 | 0000 | 0000 | 0248 | 0000 | 0000 | 0000 | 0000 |
| 0000426340 | 1A7C | 0000 | FFE0 | FFFF | FFFF | 0018 | 0109 | 0D46 |
| 0000426360 | 0000 | 0000 | 0020 | 0000 | 0000 | 0000 | 0000 | 0000 |
| 0000426400 | 652E | 0066 | 0000 | 0000 | 1730 | FFC2 | 0001 | 0000 |
| 0000426420 | 0165 | 0000 | 0000 | 0107 | 0000 | 0000 | 0000 | 0000 |
| 0000426440 | 0000 | 0000 | 0000 | 0000 | 1A86 | 0000 | 1730 | FFC2 |
| 0000426460 | 0001 | 0068 | 0103 | 0D46 | 0000 | 01E0 | 0000 | F752 |
| 0000426500 | 0000 | 0DB6 | 0000 | 0003 | 622E | 0066 | 0000 | 0000 |
| 0000426520 | 1730 | FFC2 | 0001 | 0000 | 0165 | 0000 | 0000 | 010D |
| 0000426540 | 0000 | 0000 | 0000 | 0252 | 0000 | 0000 | 695F | 6F63 |
| 0000426560 | 5F6E | 6469 | FFE0 | FFFF | FFFF | 000D | 0109 | 0000 |
| 0000426600 | 0000 | 0000 | 0010 | 0000 | 0000 | 0000 | 0000 | 0000 |
| 0000426620 | 0000 | 0000 | 1A9A | 0000 | 0000 | 0000 | FFFF | 0018 |
| 0000426640 | 0101 | 0D46 | 0000 | 0000 | 0020 | 0000 | 0000 | 0000 |
| 0000426660 | 0000 | 0000 | 652E | 0066 | 0000 | 0000 | 1910 | FFC2 |
| 0000426700 | 0001 | 0000 | 0165 | 0000 | 0000 | 0119 | 0000 | 0000 |
| 0000426720 | 0000 | 0000 | 0000 | 0000 | 0000 | 0000 | 1AA4 | 0000 |
| 0000426740 | 1910 | FFC2 | 0001 | 0020 | 0103 | 0000 | 0000 | 0270 |
| 0000426760 | 0000 | F782 | 0000 | 0DBE | 0000 | 0002 | 622E | 0066 |
| 0000427000 | 0000 | 0000 | 1910 | FFC2 | 0001 | 0000 | 0165 | 0000 |
| 0000427020 | 0000 | 011E | 0000 | 0000 | 0000 | 025A | 0000 | 0000 |
| 0000427040 | 0000 | 0000 | 1ABB | 0000 | FFE0 | FFFF | FFFF | 0018 |
| 0000427060 | 0109 | 0D46 | 0000 | 0000 | 0020 | 0000 | 0000 | 0000 |
| 0000427100 | 0000 | 0000 | 652E | 0066 | 0000 | 0000 | 1B80 | FFC2 |
| 0000427120 | 0001 | 0000 | 0165 | 0000 | 0000 | 012B | 0000 | 0000 |
| 0000427140 | 0000 | 0000 | 0000 | 0000 | 0000 | 0000 | 1AC5 | 0000 |
| 0000427160 | 1B80 | FFC2 | 0001 | 002D | 0102 | 0000 | 0000 | 0A50 |
| 0000427200 | 0000 | F7AC | 0000 | 0DD2 | 0000 | 0004 | 622E | 0066 |
| 0000427220 | 0000 | 0000 | 1B80 | FFC2 | 0001 | 0000 | 0165 | 0000 |
| 0000427240 | 0000 | 0131 | 0000 | 0000 | 0000 | 026E | 0000 | 0000 |
| 0000427260 | 0000 | 0000 | 1ADD | 0000 | FFE0 | FFFF | FFFF | 0018 |
| 0000427300 | 0109 | 0C86 | 0000 | 0000 | 0020 | 0000 | 0000 | 0000 |
| 0000427320 | 0000 | 0000 | 695F | 0000 | 0000 | 0000 | 0000 | 0000 |
| 0000427340 | FFFF | 0004 | 0101 | 0000 | 0000 | 0000 | 0020 | 0000 |
| 0000427360 | 0000 | 0000 | 0000 | 0000 | 0000 | 0000 | 1AE7 | 0000 |
| 0000427400 | 0020 | 0000 | FFFF | 0018 | 0101 | 0D46 | 0000 | 0000 |
| 0000427420 | 0020 | 0000 | 0000 | 0000 | 0000 | 0000 | 0000 | 0000 |
| 0000427440 | 1AF9 | 0000 | 0040 | 0000 | FFFF | 000F | 0101 | 0000 |
| 0000427460 | 0000 | 0000 | 0020 | 0000 | 0000 | 0000 | 0000 | 0000 |
| 0000427500 | 0000 | 0000 | 1B0D | 0000 | 0060 | 0000 | FFFF | 0008 |
| 0000427520 | 0101 | 0D0A | 0000 | 0000 | 0020 | 0000 | 0000 | 0000 |
| 0000427540 | 0000 | 0000 | 0000 | 0000 | 1B1C | 0000 | 0080 | 0000 |
| 0000427560 | FFFF | 0018 | 0101 | 0D0A | 0000 | 0000 | 0020 | 0000 |
| 0000427600 | 0000 | 0000 | 0000 | 0000 | 0000 | 0000 | 1B2F | 0000 |
| 0000427620 | 8CF0 | FFC9 | 0003 | 0038 | 0103 | 0D0A | 0000 | 0000 |
| 0000427640 | 0120 | 0009 | 0000 | 0000 | 0000 | 0000 | 652E | 0066 |
| 0000427660 | 0000 | 0000 | 25D0 | FFC2 | 0001 | 0000 | 0165 | 0000 |
| 0000427700 | 0000 | 015C | 0000 | 0000 | 0000 | 0000 | 0000 | 0000 |
| 0000427720 | 0000 | 0000 | 1B45 | 0000 | 25D0 | FFC2 | 0001 | 002D |
| 0000427740 | 0102 | 0000 | 0000 | 6640 | 0000 | F830 | 0000 | 0E10 |
| 0000427760 | 0000 | 000C | 622E | 0066 | 0000 | 0000 | 25D0 | FFC2 |
| 0000430000 | 0001 | 0000 | 0165 | 0000 | 0000 | 0162 | 0000 | 0000 |
| 0000430020 | 0000 | 02AC | 0000 | 0000 | 0000 | 0000 | 1B5D | 0000 |
| 0000430040 | FFE0 | FFFF | FFFF | 0018 | 0109 | 0CB6 | 0000 | 0000 |
| 0000430060 | 0020 | 0000 | 0000 | 0000 | 0000 | 0000 | 725F | 7365 |
| 0000430100 | 6C75 | 0074 | FFC0 | FFFF | FFFF | 0018 | 0109 | 0C86 |
| 0000430120 | 0000 | 0000 | 0020 | 0000 | 0000 | 0000 | 0000 | 0000 |
| 0000430140 | 6B5F | 0000 | 0000 | 0000 | 0009 | 0000 | FFFF | 0003 |
| 0000430160 | 0104 | 0000 | 0000 | 0000 | 0010 | 0000 | 0000 | 0000 |

THU MAR 14 17:37:32 1991 GSPMON.4 PAGE 153, LINE 8969

| | | | | | | | | |
|---|---|---|---|---|---|---|---|---|
| 0000430200 | 0000 | 0000 | 6C5F | 0000 | 0000 | 0000 | 000A | 0000 |
| 0000430220 | FFFF | 0003 | 0104 | 0000 | 0000 | 0000 | 0010 | 0000 |
| 0000430240 | 0000 | 0000 | 0000 | 0000 | 695F | 646E | 7865 | 0000 |
| 0000430260 | 000B | 0000 | FFFF | 0003 | 0104 | 0000 | 0000 | 0000 |
| 0000430300 | 0010 | 0000 | 0000 | 0000 | 0000 | 0000 | 0000 | 0000 |
| 0000430320 | 1B68 | 0000 | 000C | 0000 | FFFF | 000F | 0104 | 0000 |
| 0000430340 | 0000 | 0000 | 0020 | 0000 | 0000 | 0000 | 0000 | 0000 |
| 0000430360 | 0000 | 0000 | 1B7D | 0000 | 0000 | 0000 | FFFF | 000F |
| 0000430400 | 0104 | 0000 | 0000 | 0000 | 0020 | 0000 | 0000 | 0000 |
| 0000430420 | 0000 | 0000 | 0000 | 0000 | 1B90 | 0000 | 0002 | 0000 |
| 0000430440 | FFFF | 000F | 0104 | 0000 | 0000 | 0000 | 0020 | 0000 |
| 0000430460 | 0000 | 0000 | 0000 | 0000 | 0000 | 0000 | 1BA4 | 0000 |
| 0000430500 | 0004 | 0000 | FFFF | 0003 | 0104 | 0000 | 0000 | 0000 |
| 0000430520 | 0010 | 0000 | 0000 | 0000 | 0000 | 0000 | 0000 | 0000 |
| 0000430540 | 1BAF | 0000 | 0006 | 0000 | FFFF | 0003 | 0104 | 0000 |
| 0000430560 | 0000 | 0000 | 0010 | 0000 | 0000 | 0000 | 0000 | 0000 |
| 0000430600 | 0000 | 0000 | 1BB9 | 0000 | 0000 | 0000 | FFFF | 0003 |
| 0000430620 | 0101 | 0000 | 0000 | 0000 | 0010 | 0000 | 0000 | 0000 |
| 0000430640 | 0000 | 0000 | 0000 | 0000 | 1BC5 | 0000 | 0010 | 0000 |
| 0000430660 | FFFF | 0003 | 0101 | 0000 | 0000 | 0000 | 0010 | 0000 |
| 0000430700 | 0000 | 0000 | 0000 | 0000 | 0000 | 0000 | 1BD0 | 0000 |
| 0000430720 | 0020 | 0000 | FFFF | 000F | 0101 | 0000 | 0000 | 0000 |
| 0000430740 | 0020 | 0000 | 0000 | 0000 | 0000 | 0000 | 695F | 0000 |
| 0000430760 | 0000 | 0000 | 0040 | 0000 | FFFF | 0003 | 0101 | 0000 |
| 0000431000 | 0000 | 0000 | 0010 | 0000 | 0000 | 0000 | 0000 | 0000 |
| 0000431020 | 6A5F | 0000 | 0000 | 0000 | 0050 | 0000 | FFFF | 0003 |
| 0000431040 | 0101 | 0000 | 0000 | 0000 | 0010 | 0000 | 0000 | 0000 |
| 0000431060 | 0000 | 0000 | 0000 | 0000 | 1BDC | 0000 | 0060 | 0000 |
| 0000431100 | FFFF | 0003 | 0101 | 0000 | 0000 | 0000 | 0010 | 0000 |
| 0000431120 | 0000 | 0000 | 0000 | 0000 | 735F | 7274 | 7069 | 0000 |
| 0000431140 | 0070 | 0000 | FFFF | 0003 | 0101 | 0000 | 0000 | 0000 |
| 0000431160 | 0010 | 0000 | 0000 | 0000 | 0000 | 0000 | 725F | 6365 |
| 0000431200 | 0074 | 0000 | 0080 | 0000 | FFFF | 0003 | 0101 | 0000 |
| 0000431220 | 0000 | 0000 | 0010 | 0000 | 0000 | 0000 | 0000 | 0000 |
| 0000431240 | 0000 | 0000 | 1BE8 | 0000 | 0090 | 0000 | FFFF | 0018 |
| 0000431260 | 0101 | 0D46 | 0000 | 0000 | 0020 | 0000 | 0000 | 0000 |
| 0000431300 | 0000 | 0000 | 0000 | 0000 | 1BFA | 0000 | 00B0 | 0000 |
| 0000431320 | FFFF | 0018 | 0101 | 0D46 | 0000 | 0000 | 0020 | 0000 |
| 0000431340 | 0000 | 0000 | 0000 | 0000 | 0000 | 0000 | 1C0A | 0000 |
| 0000431360 | 00D0 | 0000 | FFFF | 0018 | 0101 | 0D46 | 0000 | 0000 |
| 0000431400 | 0020 | 0000 | 0000 | 0000 | 0000 | 0000 | 0000 | 0000 |
| 0000431420 | 1C1B | 0000 | 00F0 | 0000 | FFFF | 0003 | 0101 | 0000 |
| 0000431440 | 0000 | 0000 | 0010 | 0000 | 0000 | 0000 | 0000 | 0000 |
| 0000431460 | 0000 | 0000 | 1C2A | 0000 | 0100 | 0000 | FFFF | 0003 |
| 0000431500 | 0101 | 0000 | 0000 | 0000 | 0010 | 0000 | 0000 | 0000 |
| 0000431520 | 0000 | 0000 | 0000 | 0000 | 1C36 | 0000 | 0110 | 0000 |
| 0000431540 | FFFF | 0003 | 0101 | 0000 | 0000 | 0000 | 0010 | 0000 |
| 0000431560 | 0000 | 0000 | 0000 | 0000 | 0000 | 0000 | 1C44 | 0000 |
| 0000431600 | 0120 | 0000 | FFFF | 0018 | 0101 | 0D2A | 0000 | 0000 |
| 0000431620 | 0020 | 0000 | 0000 | 0000 | 0000 | 0000 | 0000 | 0000 |
| 0000431640 | 1C5B | 0000 | 0140 | 0000 | FFFF | 000A | 0101 | 0D56 |
| 0000431660 | 0000 | 0000 | 0001 | 0000 | 0000 | 0000 | 0000 | 0000 |
| 0000431700 | 0000 | 0000 | 1C6E | 0000 | 0150 | 0000 | FFFF | 000A |
| 0000431720 | 0101 | 0B78 | 0000 | 0000 | 0001 | 0000 | 0000 | 0000 |
| 0000431740 | 0000 | 0000 | 0000 | 0000 | 1C7F | 0000 | 0160 | 0000 |
| 0000431760 | FFFF | 000A | 0101 | 0B78 | 0000 | 0000 | 0001 | 0000 |
| 0000432000 | 0000 | 0000 | 0000 | 0000 | 652E | 0066 | 0000 | 0000 |
| 0000432020 | 8C10 | FFC2 | 0001 | 0000 | 0165 | 0000 | 0000 | 039F |
| 0000432040 | 0000 | 0000 | 0000 | 0000 | 0000 | 0000 | 0000 | 0000 |

THU MAR 14 17:37:32 1991 GSPMON.4 PAGE 154, LINE 9028

| | | | | | | | | |
|---|---|---|---|---|---|---|---|---|
| 0000432060 | 1C8E | 0000 | 8C10 | FFC2 | 0001 | 002A | 0103 | 0B78 |
| 0000432100 | 0000 | 13C0 | 0000 | FEDE | 0000 | 0E32 | 0000 | 000B |
| 0000432120 | 622E | 0066 | 0000 | 0000 | 8C10 | FFC2 | 0001 | 0000 |
| 0000432140 | 0165 | 0000 | 0000 | 03A5 | 0000 | 0000 | 0000 | 02CE |
| 0000432160 | 0000 | 0000 | 0000 | 0000 | 1CA7 | 0000 | FFE0 | FFFF |
| 0000432200 | FFFF | 000F | 0109 | 0000 | 0000 | 0000 | 0020 | 0000 |
| 0000432220 | 0000 | 0000 | 0000 | 0000 | 6D5F | 646F | 0065 | 0000 |
| 0000432240 | FFC0 | FFFF | FFFF | 000A | 0109 | 0D56 | 0000 | 0000 |
| 0000432260 | 0001 | 0000 | 0000 | 0000 | 0000 | 0000 | 695F | 0000 |
| 0000432300 | 0000 | 0000 | 0009 | 0000 | FFFF | 000D | 0104 | 0000 |
| 0000432320 | 0000 | 0000 | 0010 | 0000 | 0000 | 0000 | 0000 | 0000 |
| 0000432340 | 6C5F | 6D69 | 7469 | 0000 | 000A | 0000 | FFFF | 000D |
| 0000432360 | 0104 | 0000 | 0000 | 0000 | 0010 | 0000 | 0000 | 0000 |
| 0000432400 | 0000 | 0000 | 0000 | 0000 | 1CB3 | 0000 | 000B | 0000 |
| 0000432420 | FFFF | 000F | 0104 | 0000 | 0000 | 0000 | 0020 | 0000 |
| 0000432440 | 0000 | 0000 | 0000 | 0000 | 0000 | 0000 | 1CBD | 0000 |
| 0000432460 | 000C | 0000 | FFFF | 0018 | 0104 | 0D12 | 0000 | 0000 |
| 0000432500 | 0020 | 0000 | 0000 | 0000 | 0000 | 0000 | 0000 | 0000 |
| 0000432520 | 1CC7 | 0000 | 0000 | 0000 | FFFF | 0018 | 0104 | 0D1E |
| 0000432540 | 0000 | 0000 | 0020 | 0000 | 0000 | 0000 | 0000 | 0000 |
| 0000432560 | 0000 | 0000 | 1CD3 | 0000 | 0002 | 0000 | FFFF | 0018 |
| 0000432600 | 0104 | 0D02 | 0000 | 0000 | 0020 | 0000 | 0000 | 0000 |
| 0000432620 | 0000 | 0000 | 745F | 6970 | 6578 | 0073 | 0004 | 0000 |
| 0000432640 | FFFF | 000D | 0104 | 0000 | 0000 | 0000 | 0010 | 0000 |
| 0000432660 | 0000 | 0000 | 0000 | 0000 | 0000 | 0000 | 1CDE | 0000 |
| 0000432700 | 0006 | 0000 | FFFF | 000D | 0104 | 0000 | 0000 | 0000 |
| 0000432720 | 0010 | 0000 | 0000 | 0000 | 0000 | 0000 | 0000 | 0000 |
| 0000432740 | 1CE8 | 0000 | 0000 | 0000 | FFFF | 000D | 0101 | 0000 |
| 0000432760 | 0000 | 0000 | 0010 | 0000 | 0000 | 0000 | 0000 | 0000 |
| 0000433000 | 655F | 7272 | 726F | 0073 | 0010 | 0000 | FFFF | 000D |
| 0000433020 | 0101 | 0000 | 0000 | 0000 | 0010 | 0000 | 0000 | 0000 |
| 0000433040 | 0000 | 0000 | 0000 | 0000 | 1CF4 | 0000 | 0020 | 0000 |
| 0000433060 | FFFF | 000D | 0101 | 0000 | 0000 | 0000 | 0010 | 0000 |
| 0000433100 | 0000 | 0000 | 0000 | 0000 | 745F | 6D65 | 0070 | 0000 |
| 0000433120 | 0030 | 0000 | FFFF | 000D | 0101 | 0000 | 0000 | 0000 |
| 0000433140 | 0010 | 0000 | 0000 | 0000 | 0000 | 0000 | 652E | 0066 |
| 0000433160 | 0000 | 0000 | 9FD0 | FFC2 | 0001 | 0000 | 0165 | 0000 |
| 0000433200 | 0000 | 0454 | 0000 | 0000 | 0000 | 0000 | 0000 | 0000 |
| 0000433220 | 0000 | 0000 | 1CFF | 0000 | 9FD0 | FFC2 | 0001 | 002A |
| 0000433240 | 0103 | 0B78 | 0000 | 07B0 | 0000 | 00A6 | 0001 | 0E4E |
| 0000433260 | 0000 | 000B | 622E | 0066 | 0000 | 0000 | 9FD0 | FFC2 |
| 0000433300 | 0001 | 0000 | 0165 | 0000 | 0000 | 045B | 0000 | 0000 |
| 0000433320 | 0000 | 02EA | 0000 | 0000 | 0000 | 0000 | 1D14 | 0000 |
| 0000433340 | FFE0 | FFFF | FFFF | 000F | 0109 | 0000 | 0000 | 0000 |
| 0000433360 | 0020 | 0000 | 0000 | 0000 | 0000 | 0000 | 6D5F | 646F |
| 0000433400 | 0065 | 0000 | FFC0 | FFFF | FFFF | 000A | 0109 | 0D56 |
| 0000433420 | 0000 | 0000 | 0001 | 0000 | 0000 | 0000 | 0000 | 0000 |
| 0000433440 | 695F | 0000 | 0000 | 0000 | 0009 | 0000 | FFFF | 000D |
| 0000433460 | 0104 | 0000 | 0000 | 0000 | 0010 | 0000 | 0000 | 0000 |
| 0000433500 | 0000 | 0000 | 6C5F | 6D69 | 7469 | 0000 | 000A | 0000 |
| 0000433520 | FFFF | 000D | 0104 | 0000 | 0000 | 0000 | 0010 | 0000 |
| 0000433540 | 0000 | 0000 | 0000 | 0000 | 0000 | 0000 | 1D20 | 0000 |
| 0000433560 | 000B | 0000 | FFFF | 000F | 0104 | 0000 | 0000 | 0000 |
| 0000433600 | 0020 | 0000 | 0000 | 0000 | 0000 | 0000 | 0000 | 0000 |
| 0000433620 | 1D2A | 0000 | 000C | 0000 | FFFF | 0018 | 0104 | 0D12 |
| 0000433640 | 0000 | 0000 | 0020 | 0000 | 0000 | 0000 | 0000 | 0000 |
| 0000433660 | 0000 | 0000 | 1D34 | 0000 | 0000 | 0000 | FFFF | 0018 |
| 0000433700 | 0104 | 0D1E | 0000 | 0000 | 0020 | 0000 | 0000 | 0000 |
| 0000433720 | 0000 | 0000 | 0000 | 0000 | 1D40 | 0000 | 0002 | 0000 |

THU MAR 14 17:37:32 1991 GSPMON.4 PAGE 155, LINE 9087

| | | | | | | | | |
|---|---|---|---|---|---|---|---|---|
| 0000433740 | FFFF | 0018 | 0104 | 0D02 | 0000 | 0000 | 0020 | 0000 |
| 0000433760 | 0000 | 0000 | 0000 | 0000 | 745F | 6970 | 6578 | 0073 |
| 0000434000 | 0004 | 0000 | FFFF | 000D | 0104 | 0000 | 0000 | 0000 |
| 0000434020 | 0010 | 0000 | 0000 | 0000 | 0000 | 0000 | 655F | 7272 |
| 0000434040 | 726F | 0073 | 0006 | 0000 | FFFF | 000D | 0104 | 0000 |
| 0000434060 | 0000 | 0000 | 0010 | 0000 | 0000 | 0000 | 0000 | 0000 |
| 0000434100 | 0000 | 0000 | 1D4B | 0000 | 0000 | 0000 | FFFF | 000D |
| 0000434120 | 0101 | 0000 | 0000 | 0000 | 0010 | 0000 | 0000 | 0000 |
| 0000434140 | 0000 | 0000 | 652E | 0066 | 0000 | 0000 | A780 | FFC2 |
| 0000434160 | 0001 | 0000 | 0165 | 0000 | 0000 | 04B4 | 0000 | 0000 |
| 0000434200 | 0000 | 0000 | 0000 | 0000 | 0000 | 0000 | 1D56 | 0000 |
| 0000434220 | A780 | FFC2 | 0001 | 0020 | 0103 | 0000 | 0000 | 0750 |
| 0000434240 | 0000 | 017E | 0001 | 0E72 | 0000 | 000B | 622E | 0066 |
| 0000434260 | 0000 | 0000 | A780 | FFC2 | 0001 | 0000 | 0165 | 0000 |
| 0000434300 | 0000 | 04BA | 0000 | 0000 | 0000 | 030E | 0000 | 0000 |
| 0000434320 | 0000 | 0000 | 1D6B | 0000 | FFE0 | FFFF | FFFF | 000F |
| 0000434340 | 0109 | 0000 | 0000 | 0000 | 0020 | 0000 | 0000 | 0000 |
| 0000434360 | 0000 | 0000 | 0000 | 0000 | 1D77 | 0000 | FFC0 | FFFF |
| 0000434400 | FFFF | 0018 | 0109 | 0D12 | 0000 | 0000 | 0020 | 0000 |
| 0000434420 | 0000 | 0000 | 0000 | 0000 | 0000 | 0000 | 1D8C | 0000 |
| 0000434440 | FFA0 | FFFF | FFFF | 0018 | 0109 | 0D12 | 0000 | 0000 |
| 0000434460 | 0020 | 0000 | 0000 | 0000 | 0000 | 0000 | 695F | 0000 |
| 0000434500 | 0000 | 0000 | 0009 | 0000 | FFFF | 000D | 0104 | 0000 |
| 0000434520 | 0000 | 0000 | 0010 | 0000 | 0000 | 0000 | 0000 | 0000 |
| 0000434540 | 6A5F | 0000 | 0000 | 0000 | 000A | 0000 | FFFF | 000D |
| 0000434560 | 0104 | 000C | 0000 | 0000 | 0010 | 0000 | 0000 | 0000 |
| 0000434600 | 0000 | 0000 | 6B5F | 0000 | 0000 | 0000 | 000B | 0000 |
| 0000434620 | FFFF | 000D | 0104 | 0000 | 0000 | 0000 | 0010 | 0000 |
| 0000434640 | 0000 | 0000 | 0000 | 0000 | 6C5F | 0000 | 0000 | 0000 |
| 0000434660 | 000C | 0000 | FFFF | 000D | 0104 | 0000 | 0000 | 0000 |
| 0000434700 | 0010 | 0000 | 0000 | 0000 | 0000 | 0000 | 0000 | 0000 |
| 0000434720 | 1DA1 | 0000 | 0000 | 0000 | FFFF | 000D | 0104 | 0000 |
| 0000434740 | 0000 | 0000 | 0010 | 0000 | 0000 | 0000 | 0000 | 0000 |
| 0000434760 | 0000 | 0000 | 1DAC | 0000 | 0002 | 0000 | FFFF | 0005 |
| 0000435000 | 0104 | 0000 | 0000 | 0000 | 0020 | 0000 | 0000 | 0000 |
| 0000435020 | 0000 | 0000 | 0000 | 0000 | 1DBB | 0000 | 0004 | 0000 |
| 0000435040 | FFFF | 0005 | 0104 | 0000 | 0000 | 0000 | 0020 | 0000 |
| 0000435060 | 0000 | 0000 | 0000 | 0000 | 0000 | 0000 | 1DCE | 0000 |
| 0000435100 | 0006 | 0000 | FFFF | 0005 | 0104 | 0000 | 0000 | 0000 |
| 0000435120 | 0020 | 0000 | 0000 | 0000 | 0000 | 0000 | 0000 | 0000 |
| 0000435140 | 1DE1 | 0000 | 0000 | 0000 | FFFF | 0005 | 0101 | 0000 |
| 0000435160 | 0000 | 0000 | 0020 | 0000 | 0000 | 0000 | 0000 | 0000 |
| 0000435200 | 0000 | 0000 | 1DEC | 0000 | 0020 | 0000 | FFFF | 0005 |
| 0000435220 | 0101 | 0000 | 0000 | 0000 | 0020 | 0000 | 0000 | 0000 |
| 0000435240 | 0000 | 0000 | 0000 | 0000 | 1DF9 | 0000 | 0040 | 0000 |
| 0000435260 | FFFF | 0005 | 0101 | 0000 | 0000 | 0000 | 0020 | 0000 |
| 0000435300 | 0000 | 0000 | 0000 | 0000 | 0000 | 0000 | 1E06 | 0000 |
| 0000435320 | 0060 | 0000 | FFFF | 0005 | 0101 | 0000 | 0000 | 0000 |
| 0000435340 | 0020 | 0000 | 0000 | 0000 | 0000 | 0000 | 652E | 0066 |
| 0000435360 | 0000 | 0000 | AED0 | FFC2 | 0001 | 0000 | 0165 | 0000 |
| 0000435400 | 0000 | 04E8 | 0000 | 0000 | 0000 | 0000 | 0000 | 0000 |
| 0000435420 | 0000 | 0000 | 1E14 | 0000 | AED0 | FFC2 | 0001 | 0024 |
| 0000435440 | 0102 | 0000 | 0000 | 03B0 | 0000 | 01FC | 0001 | 0E7E |
| 0000435460 | 0000 | 0002 | 622E | 0066 | 0000 | 0000 | AED0 | FFC2 |
| 0000435500 | 0001 | 0000 | 0165 | 0000 | 0000 | 04F8 | 0000 | 0000 |
| 0000435520 | 0000 | 031A | 0000 | 0000 | 695F | 5F6E | 7470 | 0072 |
| 0000435540 | FFE0 | FFFF | FFFF | 0010 | 0109 | 0000 | 0000 | 0000 |
| 0000435560 | 0020 | 0000 | 0000 | 0000 | 0000 | 0000 | 6F5F | 7475 |
| 0000435600 | 705F | 7274 | FFC0 | FFFF | FFFF | 0010 | 0109 | 0000 |

THU MAR 14 17:37:32 1991 GSPMON.4 PAGE 156, LINE 9146

| | | | | | | | | |
|---|---|---|---|---|---|---|---|---|
| 0000435620 | 0000 | 0000 | 0020 | 0000 | 0000 | 0000 | 0000 | 0000 |
| 0000435640 | 0000 | 0000 | 1E25 | 0000 | 0000 | 0000 | FFFF | 0018 |
| 0000435660 | 0101 | 0D46 | 0000 | 0000 | 0020 | 0000 | 000D | 0000 |
| 0000435700 | 0000 | 0000 | 652E | 0066 | 0000 | 0000 | B280 | FFC2 |
| 0000435720 | 0001 | 0000 | 0165 | 0000 | 0000 | 0518 | 0000 | 0000 |
| 0000435740 | 0000 | 0000 | 0000 | 0000 | 0000 | 0000 | 1E32 | 0000 |
| 0000435760 | B280 | FFC2 | 0001 | 0024 | 0102 | 0000 | 0000 | 0310 |
| 0000436000 | 0000 | 0244 | 0001 | 0E88 | 0000 | 0003 | 622E | 0066 |
| 0000436020 | 0000 | 0000 | B280 | FFC2 | 0001 | 0000 | 0165 | 0000 |
| 0000436040 | 0000 | 052A | 0000 | 0000 | 0000 | 0324 | 0000 | 0000 |
| 0000436060 | 695F | 5F6E | 7470 | 0072 | FFE0 | FFFF | FFFF | 0010 |
| 0000436100 | 0109 | 0000 | 0000 | 0000 | 0020 | 0000 | 0000 | 0000 |
| 0000436120 | 0000 | 0000 | 6F5F | 7475 | 705F | 7274 | FFC0 | FFFF |
| 0000436140 | FFFF | 0010 | 0109 | 0000 | 0000 | 0000 | 0020 | 0000 |
| 0000436160 | 0000 | 0000 | 0000 | 0000 | 652E | 0066 | 0000 | 0000 |
| 0000436200 | B590 | FFC2 | 0001 | 0000 | 0165 | 0000 | 0000 | 0542 |
| 0000436220 | 0000 | 0000 | 0000 | 0000 | 0000 | 0000 | 0000 | 0000 |
| 0000436240 | 1E42 | 0000 | B590 | FFC2 | 0001 | 0024 | 0102 | 0000 |
| 0000436260 | 0000 | 0390 | 0000 | 0280 | 0001 | 0E94 | 0000 | 0003 |
| 0000436300 | 622E | 0066 | 0000 | 0000 | B590 | FFC2 | 0001 | 0000 |
| 0000436320 | 0165 | 0000 | 0000 | 0555 | 0000 | 0000 | 0000 | 0330 |
| 0000436340 | 0000 | 0000 | 695F | 5F6E | 7470 | 0072 | FFE0 | FFFF |
| 0000436360 | FFFF | 0010 | 0109 | 0000 | 0000 | 0000 | 0020 | 0000 |
| 0000436400 | 0000 | 0000 | 0000 | 0000 | 6F5F | 7475 | 705F | 7274 |
| 0000436420 | FFC0 | FFFF | FFFF | 0010 | 0109 | 0000 | 0000 | 0000 |
| 0000436440 | 0020 | 0000 | 0000 | 0000 | 0000 | 0000 | 0000 | 0000 |
| 0000436460 | 1E56 | 0000 | 0000 | 0000 | FFFF | 0018 | 0101 | 0D46 |
| 0000436500 | 0000 | 0000 | 0020 | 0000 | 0000 | 0000 | 0000 | 0000 |
| 0000436520 | 652E | 0066 | 0000 | 0000 | B920 | FFC2 | 0001 | 0000 |
| 0000436540 | 0165 | 0000 | 0000 | 0570 | 0000 | 0000 | 0000 | 0000 |
| 0000436560 | 0000 | 0000 | 742E | 7865 | 0074 | 0000 | 0990 | FFC2 |
| 0000436600 | 0001 | 0000 | 0103 | AF90 | 0000 | 00B7 | 0218 | 0000 |
| 0000436620 | 0000 | 0000 | 0000 | 0000 | 642E | 7461 | 0061 | 0000 |
| 0000436640 | 0000 | 0000 | 0004 | 0000 | 0103 | 0000 | 0000 | 0000 |
| 0000436660 | 0000 | 0000 | 0000 | 0000 | 0000 | 0000 | 622E | 7373 |
| 0000436700 | 0000 | 0000 | 7C00 | FFC9 | 0003 | 0000 | 0103 | 1210 |
| 0000436720 | 0000 | 0000 | 0000 | 0000 | 0000 | 0000 | 0000 | 0000 |
| 0000436740 | 632E | 6E69 | 7469 | 0000 | C020 | FFC6 | 0002 | 0000 |
| 0000436760 | 0103 | 01F0 | 0000 | 0003 | 0000 | 0000 | 0000 | 0000 |
| 0000437000 | 0000 | 0000 | 662E | 6C69 | 0065 | 0000 | 0E9E | 0000 |
| 0000437020 | FFFE | 0000 | 0167 | 7067 | 735F | 6C63 | 632E | 0000 |
| 0000437040 | 0000 | 0000 | 0000 | 0000 | 662E | 6C69 | 0065 | 0000 |
| 0000437060 | 0EA0 | 0000 | FFFE | 0000 | 0167 | 7473 | 6D64 | 682E |
| 0000437100 | 0000 | 0000 | 0000 | 0000 | 0000 | 0000 | 662E | 6C69 |
| 0000437120 | 0065 | 0000 | 0EA2 | 0000 | FFFE | 0000 | 0167 | 7067 |
| 0000437140 | 735F | 6C63 | 632E | 0000 | 0000 | 0000 | 0000 | 0000 |
| 0000437160 | 662E | 6C69 | 0065 | 0000 | 0EAC | 0000 | FFFE | 0000 |
| 0000437200 | 0167 | 7473 | 6C64 | 6269 | 682E | 0000 | 0000 | 0000 |
| 0000437220 | 0000 | 0000 | 302E | 6166 | 656B | 0000 | 0000 | 0000 |
| 0000437240 | FFFE | 0008 | 010A | 0000 | 0000 | 0000 | 0040 | 0000 |
| 0000437260 | 0000 | 0EAC | 0000 | 0000 | 715F | 6F75 | 0074 | 0000 |
| 0000437300 | 0000 | 0000 | FFFF | 0004 | 0108 | 0000 | 0000 | 0000 |
| 0000437320 | 0020 | 0000 | 0000 | 0000 | 0000 | 0000 | 725F | 6D65 |
| 0000437340 | 0000 | 0000 | 0020 | 0000 | FFFF | 0004 | 0108 | 0000 |
| 0000437360 | 0000 | 0000 | 0020 | 0000 | 0000 | 0000 | 0000 | 0000 |
| 0000437400 | 652E | 736F | 0000 | 0000 | 0000 | 0000 | FFFE | 0008 |
| 0000437420 | 0166 | 0EA4 | 0000 | 0000 | 0040 | 0000 | 0000 | 0000 |
| 0000437440 | 0000 | 0000 | 662E | 6C69 | 0065 | 0000 | 0EAE | 0000 |
| 0000437460 | FFFE | 0000 | 0167 | 7067 | 735F | 6C63 | 632E | 0000 |

THU MAR 14 17:37:32 1991 GSPMON.4 PAGE 157, LINE 9205

| | | | | | | | | |
|---|---|---|---|---|---|---|---|---|
| 0000437500 | 0000 | 0000 | 0000 | 0000 | 662E | 6C69 | 0065 | 0000 |
| 0000437520 | 0EBE | 0000 | FFFE | 0000 | 0167 | 7974 | 6570 | 6564 |
| 0000437540 | 2E66 | 0068 | 0000 | 0000 | 0000 | 0000 | 312E | 6166 |
| 0000437560 | 656B | 0000 | 0000 | 0000 | FFFE | 000A | 010F | 0000 |
| 0000437600 | 0000 | 0000 | 0001 | 0000 | 0000 | 0EB8 | 0000 | 0000 |
| 0000437620 | 465F | 4C41 | 4553 | 0000 | 0000 | 0000 | FFFF | 000B |
| 0000437640 | 0110 | 0000 | 0000 | 0000 | 0001 | 0000 | 0000 | 0000 |
| 0000437660 | 0000 | 0000 | 545F | 5552 | 0045 | 0000 | 0001 | 0000 |
| 0000437700 | FFFF | 000B | 0110 | 0000 | 0000 | 0000 | 0001 | 0000 |
| 0000437720 | 0000 | 0000 | 0000 | 0000 | 652E | 736F | 0000 | 0000 |
| 0000437740 | 0000 | 0000 | FFFE | 000A | 0166 | 0EB0 | 0000 | 0000 |
| 0000437760 | 00G1 | 0000 | 0000 | 0000 | 0000 | 0000 | 322E | 6166 |
| 0000440000 | 656B | 0000 | 0000 | 0000 | FFFE | 0008 | 010A | 0000 |
| 0000440020 | 0000 | 0000 | 0004 | 0000 | 0000 | 0EBE | 0000 | 0000 |
| 0000440040 | 705F | 7869 | 6C65 | 0000 | 0000 | 0000 | FFFF | 000E |
| 0000440060 | 0112 | 0000 | 0000 | 0000 | 0004 | 0000 | 0000 | 0000 |
| 0000440100 | 0000 | 0000 | 652E | 736F | 0000 | 0000 | 0000 | 0000 |
| 0000440120 | FFFE | 0008 | 0166 | 0EB8 | 0000 | 0000 | 0004 | 0000 |
| 0000440140 | 0000 | 0000 | 0000 | 0000 | 662E | 6C69 | 0065 | 0000 |
| 0000440160 | 0EC0 | 0000 | FFFE | 0000 | 0167 | 7067 | 735F | 6C63 |
| 0000440200 | 632E | 0000 | 0000 | 0000 | 0000 | 0000 | 662E | 6C69 |
| 0000440220 | 0065 | 0000 | 0EC2 | 0000 | FFFE | 0000 | 0167 | 7367 |
| 0000440240 | 7370 | 7379 | 682E | 0000 | 0000 | 0000 | 0000 | 0000 |
| 0000440260 | 662E | 6C69 | 0065 | 0000 | 0EC4 | 0000 | FFFE | 0000 |
| 0000440300 | 0167 | 7367 | 7370 | 7379 | 692E | 636E | 0000 | 0000 |
| 0000440320 | 0000 | 0000 | 662E | 6C69 | 0065 | 0000 | 0EC6 | 0000 |
| 0000440340 | FFFE | 0000 | 0167 | 7367 | 7370 | 7379 | 682E | 0000 |
| 0000440360 | 0000 | 0000 | 0000 | 0000 | 662E | 6C69 | 0065 | 0000 |
| 0000440400 | 0EC8 | 0000 | FFFE | 0000 | 0167 | 7067 | 735F | 6C63 |
| 0000440420 | 632E | 0000 | 00G0 | 0000 | 0000 | 0000 | 662E | 6C69 |
| 0000440440 | 0065 | 0000 | 0FA4 | 0000 | FFFE | 0000 | 0167 | 7367 |
| 0000440460 | 6370 | 6766 | 682E | 0000 | 0000 | 0000 | 0000 | 0000 |
| 0000440500 | 0000 | 0000 | 1E63 | 0000 | 0000 | 0000 | FFFE | 000A |
| 0000440520 | 010F | 0000 | 0000 | 0000 | 0002 | 0000 | 0000 | 0ED4 |
| 0000440540 | 0000 | 0000 | 4F5F | 454E | 315F | 0036 | 0000 | 0000 |
| 0000440560 | FFFF | 000B | 0110 | 0000 | 0000 | 0000 | 0002 | 0000 |
| 0000440600 | 0000 | 0000 | 0000 | 0000 | 545F | 4F57 | 385F | 0000 |
| 0000440620 | 0001 | 0000 | FFFF | 000B | 0110 | 0000 | 0000 | 0000 |
| 0000440640 | 0002 | 0000 | 0000 | 0000 | 0000 | 0000 | 465F | 554F |
| 0000440660 | 5F52 | 0034 | 0002 | 0000 | FFFF | 000B | 0110 | 0000 |
| 0000440700 | 0000 | 0000 | 0002 | 0000 | 0000 | 0000 | 0000 | 0000 |
| 0000440720 | 652E | 736F | 0000 | 0000 | 0000 | 0000 | FFFE | 000A |
| 0000440740 | 0166 | 0ECA | 0000 | 0000 | 0002 | 0000 | 0000 | 0000 |
| 0000440760 | 0000 | 0000 | 635F | 726C | 655F | 7272 | 0000 | 0000 |
| 0000441000 | FFFE | 000A | 010F | 0000 | 0000 | 0000 | 0001 | 0000 |
| 0000441020 | 0000 | 0EDC | 0000 | 0000 | 4E5F | 5F4F | 4C43 | 0052 |
| 0000441040 | 0000 | 0000 | FFFF | 000B | 0110 | 0000 | 0000 | 0000 |
| 0000441060 | 0001 | 0000 | 0000 | 0000 | 0000 | 0000 | 435F | 524C |
| 0000441100 | 0000 | 0000 | 0001 | 0000 | FFFF | 000B | 0110 | 0000 |
| 0000441120 | 0000 | 0000 | 0001 | 0000 | 0000 | 0000 | 0000 | 0000 |
| 0000441140 | 652E | 736F | 0000 | 0000 | 0000 | 0000 | FFFE | 000A |
| 0000441160 | 0166 | 0ED4 | 0000 | 0000 | 0001 | 0000 | 0000 | 0000 |
| 0000441200 | 0000 | 000G | U000 | 0000 | 1E6D | 0000 | 0000 | 0000 |
| 0000441220 | FFFE | 000A | 010F | 0000 | 0000 | 0000 | 0003 | 0000 |
| 0000441240 | 0000 | 0EEA | 0000 | 0000 | 505F | 414C | 454E | 0030 |
| 0000441260 | 0000 | 0000 | FFFF | 000B | 0110 | 0000 | 0000 | 0000 |
| 0000441300 | 0003 | 0000 | 0000 | 0000 | 0000 | 0000 | 505F | 414C |
| 0000441320 | 454E | 0032 | 0001 | 0000 | FFFF | 000B | 0110 | 0000 |
| 0000441340 | 0000 | 0000 | 0003 | 0000 | 0000 | 0000 | 0000 | 0000 |

THU MAR 14 17:37:32 1991 GSPMON.4 PAGE 158, LINE 9264

| | | | | | | | | |
|---|---|---|---|---|---|---|---|---|
| 0000441360 | 505F | 414C | 454E | 0031 | 0002 | 0000 | FFFF | 000B |
| 0000441400 | 0110 | 0000 | 0000 | 0000 | 0003 | 0000 | 0000 | 0000 |
| 0000441420 | 0000 | 0000 | 505F | 414C | 454E | 0033 | 0003 | 0000 |
| 0000441440 | FFFF | 000B | 0110 | 0000 | 0000 | 0000 | 0003 | 0000 |
| 0000441460 | 0000 | 0000 | 0000 | 0000 | 4E5F | 504F | 414C | 454E |
| 0000441500 | 0004 | 0000 | FFFF | 000B | 0110 | 0000 | 0000 | 0000 |
| 0000441520 | 0003 | 0000 | 0000 | 0000 | 0000 | 0000 | 652E | 736F |
| 0000441540 | 0000 | 0000 | 0000 | 0000 | FFFE | 000A | 0166 | 0EDC |
| 0000441560 | 0000 | 0000 | 0003 | 0000 | 0000 | 0000 | 0000 | 0000 |
| 0000441600 | 0000 | 0000 | 1E78 | 0000 | 0000 | 0000 | FFFE | 000A |
| 0000441620 | 010F | 0000 | 0000 | 0000 | 0001 | 0000 | 0000 | 0EF2 |
| 0000441640 | 0000 | 0000 | 4E5F | 5F4F | 4944 | 5053 | 0000 | 0000 |
| 0000441660 | FFFF | 000B | 0110 | 0000 | 0000 | 0000 | 0001 | 0000 |
| 0000441700 | 0000 | 0000 | 0000 | 0000 | 445F | 5349 | 0050 | 0000 |
| 0000441720 | 0001 | 0000 | FFFF | 000B | 0110 | 0000 | 0000 | 0000 |
| 0000441740 | 0001 | 0000 | 0000 | 0000 | 0000 | 0000 | 652E | 736F |
| 0000441760 | 0000 | 0000 | 0000 | 0000 | FFFE | 000A | 0166 | 0EEA |
| 0000442000 | 0000 | 0000 | 0001 | 0000 | 0000 | 0000 | 0000 | 0000 |
| 0000442020 | 665F | 5F62 | 6E65 | 0000 | 0000 | 0000 | FFFE | 000A |
| 0000442040 | 010F | 0000 | 0000 | 0000 | 0001 | 0000 | 0000 | 0EFA |
| 0000442060 | 0000 | 0000 | 0000 | 0000 | 1E82 | 0000 | 0000 | 0000 |
| 0000442100 | FFFF | 000B | 0110 | 0000 | 0000 | 0000 | 0001 | 0000 |
| 0000442120 | 0000 | 0000 | 0000 | 0000 | 0000 | 0000 | 1E8D | 0000 |
| 0000442140 | 0001 | 0000 | FFFF | 000B | 0110 | 0000 | 0000 | 0000 |
| 0000442160 | 0001 | 0000 | 0000 | 0000 | 0000 | 0000 | 652E | 736F |
| 0000442200 | 0000 | 0000 | 0000 | 0000 | FFFE | 000A | 0166 | 0EF2 |
| 0000442220 | 0000 | 0000 | 0001 | 0000 | 0000 | 0000 | 0000 | 0000 |
| 0000442240 | 7A5F | 7265 | 5F6F | 0062 | 0000 | 0000 | FFFE | 000A |
| 0000442260 | 010F | 0000 | 0000 | 0000 | 0001 | 0000 | 0000 | 0F02 |
| 0000442300 | 0000 | 0000 | 0000 | 0000 | 1E97 | 0000 | 0000 | 0000 |
| 0000442320 | FFFF | 000B | 0110 | 0000 | 0000 | 0000 | 0001 | 0000 |
| 0000442340 | 0000 | 0000 | 0000 | 0000 | 0000 | 0000 | 1EA3 | 0000 |
| 0000442360 | 0001 | 0000 | FFFF | 000B | 0110 | 0000 | 0000 | 0000 |
| 0000442400 | 0001 | 0000 | 0000 | 0000 | 0000 | 0000 | 652E | 736F |
| 0000442420 | 0000 | 0000 | 0000 | 0000 | FFFE | 000A | 0166 | 0EFA |
| 0000442440 | 0000 | 0000 | 0001 | 0000 | 0000 | 0000 | 0000 | 0000 |
| 0000442460 | 7A5F | 7265 | 5F6F | 0061 | 0000 | 0000 | FFFE | 000A |
| 0000442500 | 010F | 0000 | 0000 | 0000 | 0001 | 0000 | 0000 | 0F0A |
| 0000442520 | 0000 | 0000 | 0000 | 0000 | 1EAD | 0000 | 0000 | 0000 |
| 0000442540 | FFFF | 000B | 0110 | 0000 | 0000 | 0000 | 0001 | 0000 |
| 0000442560 | 0000 | 0000 | 0000 | 0000 | 0000 | 0000 | 1EB9 | 0000 |
| 0000442600 | 0001 | 0000 | FFFF | 000B | 0110 | 0000 | 0000 | 0000 |
| 0000442620 | 0001 | 0000 | 0000 | 0000 | 0000 | 0000 | 652E | 736F |
| 0000442640 | 0000 | 0000 | 0000 | 0000 | FFFE | 000A | 0166 | 0F02 |
| 0000442660 | 0000 | 0000 | 0001 | 0000 | 0000 | 0000 | 0000 | 0000 |
| 0000442700 | 0000 | 0000 | 1EC3 | 0000 | 0000 | 0000 | FFFE | 000A |
| 0000442720 | 010F | 0000 | 0000 | 0000 | 0002 | 0000 | 0000 | 0F16 |
| 0000442740 | 0000 | 0000 | 0000 | 0000 | 1ECD | 0000 | 0000 | 0000 |
| 0000442760 | FFFF | 000B | 0110 | 0000 | 0000 | 0000 | 0002 | 0000 |
| 0000443000 | 0000 | 0000 | 0000 | 0000 | 0000 | 0000 | 1ED7 | 0000 |
| 0000443020 | 0001 | 0000 | FFFF | 000B | 0110 | 0000 | 0000 | 0000 |
| 0000443040 | 0002 | 0000 | 0000 | 0000 | 0000 | 0000 | 0000 | 0000 |
| 0000443060 | 1EE1 | 0000 | 0002 | 0000 | FFFF | 000B | 0110 | 0000 |
| 0000443100 | 0000 | 0000 | 0002 | 0000 | 0000 | 0000 | 0000 | 0000 |
| 0000443120 | 0000 | 0000 | 1EEB | 0000 | 0003 | 0000 | FFFF | 000B |
| 0000443140 | 0110 | 0000 | 0000 | 0000 | 0002 | 0000 | 0000 | 0000 |
| 0000443160 | 0000 | 0000 | 652E | 736F | 0000 | 0000 | 0000 | 0000 |
| 0000443200 | FFFE | 000A | 0166 | 0F0A | 0000 | 0000 | 0002 | 0000 |
| 0000443220 | 0000 | 0000 | 0000 | 0000 | 615F | 756C | 665F | 636E |

THU MAR 14 17:37:32 1991 GSPMON.4 PAGE 159, LINE 9323

| | | | | | | | | |
|---|---|---|---|---|---|---|---|---|
| 0000443240 | 0000 | 0000 | FFFE | 000A | 010F | 0000 | 0000 | 0000 |
| 0000443260 | 0003 | 0000 | 0000 | 0F2A | 0000 | 0000 | 435F | 454C |
| 0000443300 | 5241 | 0000 | 0000 | 0000 | FFFF | 000B | 0110 | 0000 |
| 0000443320 | 0000 | 0000 | 0003 | 0000 | 0000 | 0000 | 0000 | 0000 |
| 0000443340 | 425F | 494D | 554E | 4153 | 0001 | 0000 | FFFF | 000B |
| 0000443360 | 0110 | 0000 | 0000 | 0000 | 0003 | 0000 | 0000 | 0000 |
| 0000443400 | 0000 | 0000 | 415F | 494D | 554E | 4253 | 0002 | 0000 |
| 0000443420 | FFFF | 000B | 0110 | 0000 | 0000 | 0000 | 0003 | 0000 |
| 0000443440 | 0000 | 0000 | 0000 | 0000 | 505F | 554C | 0053 | 0000 |
| 0000443460 | 0003 | 0000 | FFFF | 000B | 0110 | 0000 | 0000 | 0000 |
| 0000443500 | 0003 | 0000 | 0000 | 0000 | 0000 | 0000 | 585F | 524F |
| 0000443520 | 0000 | 0000 | 0004 | 0000 | FFFF | 000B | 0110 | 0000 |
| 0000443540 | 0000 | 0000 | 0003 | 0000 | 0000 | 0000 | 0000 | 0000 |
| 0000443560 | 4F5F | 0052 | 0000 | 0000 | 0005 | 0000 | FFFF | 000B |
| 0000443600 | 0110 | 0000 | 0000 | 0000 | 0003 | 0000 | 0000 | 0000 |
| 0000443620 | 0000 | 0000 | 415F | 444E | 0000 | 0000 | 0006 | 0000 |
| 0000443640 | FFFF | 000B | 0110 | 0000 | 0000 | 0000 | 0003 | 0000 |
| 0000443660 | 0000 | 0000 | 0000 | 0000 | 505F | 4552 | 4553 | 0054 |
| 0000443700 | 0007 | 0000 | FFFF | 000B | 0110 | 0000 | 0000 | 0000 |
| 0000443720 | 0003 | 0000 | 0000 | 0000 | 0000 | 0000 | 652E | 736F |
| 0000443740 | 0000 | 0000 | 0000 | 0000 | FFFE | 000A | 0166 | 0F16 |
| 0000443760 | 0000 | 0000 | 0003 | 0000 | 0000 | 0000 | 0000 | 0000 |
| 0000444000 | 615F | 756C | 635F | 7972 | 0000 | 0000 | FFFE | 000A |
| 0000444020 | 010F | 0000 | 0000 | 0000 | 0001 | 0000 | 0000 | 0F32 |
| 0000444040 | 0000 | 0000 | 5A5F | 5245 | 004F | 0000 | 0000 | 0000 |
| 0000444060 | FFFF | 000B | 0110 | 0000 | 0000 | 0000 | 0001 | 0000 |
| 0000444100 | 0000 | 0000 | 0000 | 0000 | 4F5F | 454E | 0000 | 0000 |
| 0000444120 | 0001 | 0000 | FFFF | 000B | 0110 | 0000 | 0000 | 0000 |
| 0000444140 | 0001 | 0000 | 0000 | 0000 | 0000 | 0000 | 652E | 736F |
| 0000444160 | 0000 | 0000 | 0000 | 0000 | FFFE | 000A | 0166 | 0F2A |
| 0000444200 | 0000 | 0000 | 0001 | 0000 | 0000 | 0000 | 0000 | 0000 |
| 0000444220 | 0000 | 0000 | 1EF5 | 0000 | 0000 | 0000 | FFFE | 000A |
| 0000444240 | 010F | 0000 | 0000 | 0000 | 0001 | 0000 | 0000 | 0F3A |
| 0000444260 | 0000 | 0000 | 0000 | 0000 | 1F01 | 0000 | 0000 | 0000 |
| 0000444300 | FFFF | 000B | 0110 | 0000 | 0000 | 0000 | 0001 | 0000 |
| 0000444320 | 0000 | 0000 | 0000 | 0000 | 0000 | 0000 | 1F0E | 0000 |
| 0000444340 | 0001 | 0000 | FFFF | 000B | 0110 | 0000 | 0000 | 0000 |
| 0000444360 | 0001 | 0000 | 0000 | 0000 | 0000 | 0000 | 652E | 736F |
| 0000444400 | 0000 | 0000 | 0000 | 0000 | FFFE | 000A | 0166 | 0F32 |
| 0000444420 | 0000 | 0000 | 0001 | 0000 | 0000 | 0000 | 0000 | 0000 |
| 0000444440 | 0000 | 0000 | 1F1A | 0000 | 0000 | 0000 | FFFE | 000A |
| 0000444460 | 010F | 0000 | 0000 | 0000 | 0001 | 0000 | 0000 | 0F42 |
| 0000444500 | 0000 | 0000 | 4D5F | 5341 | 5F4B | 4E45 | 0000 | 0000 |
| 0000444520 | FFFF | 000B | 0110 | 0000 | 0000 | 0000 | 0001 | 0000 |
| 0000444540 | 0000 | 0000 | 0000 | 0000 | 0000 | 0000 | 1F27 | 0000 |
| 0000444560 | 0001 | 0000 | FFFF | 000B | 0110 | 0000 | 0000 | 0000 |
| 0000444600 | 0001 | 0000 | 0000 | 0000 | 0000 | 0000 | 652E | 736F |
| 0000444620 | 0000 | 0000 | 0000 | 0000 | FFFE | 000A | 0166 | 0F3A |
| 0000444640 | 0000 | 0000 | 0001 | 0000 | 0000 | 0000 | 0000 | 0000 |
| 0000444660 | 0000 | 0000 | 1F31 | 0000 | 0000 | 0000 | FFFE | 000A |
| 0000444700 | 010F | 0000 | 0000 | 0000 | 0001 | 0000 | 0000 | 0F4A |
| 0000444720 | 0000 | 0000 | 0000 | 0000 | 1F3C | 0000 | 0000 | 0000 |
| 0000444740 | FFFF | 000B | 0110 | 0000 | 0000 | 0000 | 0001 | 0000 |
| 0000444760 | 0000 | 0000 | 0000 | 0000 | 0000 | 0000 | 1F46 | 0000 |
| 0000445000 | 0001 | 0000 | FFFF | 000B | 0110 | 0000 | 0000 | 0000 |
| 0000445020 | 0001 | 0000 | 0000 | 0000 | 0000 | 0000 | 652E | 736F |
| 0000445040 | 0000 | 0000 | 0000 | 0000 | FFFE | 000A | 0166 | 0F42 |
| 0000445060 | 0000 | 0000 | 0001 | 0000 | 0000 | 0000 | 0000 | 0000 |
| 0000445100 | 0000 | 0000 | 1F51 | 0000 | 0000 | 0000 | FFFE | 000A |

THU MAR 14 17:37:32 1991 GSPMON.4 PAGE 160, LINE 9382

| | | | | | | | | |
|---|---|---|---|---|---|---|---|---|
| 0000445120 | 010F | 0000 | 0000 | 0000 | 0001 | 0000 | 0000 | 0F52 |
| 0000445140 | 0000 | 0000 | 0000 | 0000 | 1F5C | 0000 | 0000 | 0000 |
| 0000445160 | FFFF | 000B | 0110 | 0000 | 0000 | 0000 | 0001 | 0000 |
| 0000445200 | 0000 | 0000 | 0000 | 0000 | 0000 | 0000 | 1F67 | 0000 |
| 0000445220 | 0001 | 0000 | FFFF | 000B | 0110 | 0000 | 0000 | 0000 |
| 0000445240 | 0001 | 0000 | 0000 | 0000 | 0000 | 0000 | 652E | 736F |
| 0000445260 | 0000 | 0000 | 0000 | 0000 | FFFE | 000A | 0166 | 0F4A |
| 0000445300 | 0000 | 0000 | 0001 | 0000 | 0000 | 0000 | 0000 | 0000 |
| 0000445320 | 6D5F | 5F62 | 7566 | 636E | 0000 | 0000 | FFFE | 000A |
| 0000445340 | 010F | 0000 | 0000 | 0000 | 0002 | 0000 | 0000 | 0F5E |
| 0000445360 | 0000 | 0000 | 0000 | 0000 | 1F71 | 0000 | 0000 | 0000 |
| 0000445400 | FFFF | 000B | 0110 | 0000 | 0000 | 0000 | 0002 | 0000 |
| 0000445420 | 0000 | 0000 | 0000 | 0000 | 4D5F | 5F42 | 5845 | 5257 |
| 0000445440 | 0001 | 0000 | FFFF | 000B | 0110 | 0000 | 0000 | 0000 |
| 0000445460 | 0002 | 0000 | 0000 | 0000 | 0000 | 0000 | 4D5F | 5F42 |
| 0000445500 | 4552 | 4441 | 0002 | 0000 | FFFF | 000B | 0110 | 0000 |
| 0000445520 | 0000 | 0000 | 0002 | 0000 | 0000 | 0000 | 0000 | 0000 |
| 0000445540 | 4D5F | 5F42 | 504F | 4E45 | 0003 | 0000 | FFFF | 000B |
| 0000445560 | 0110 | 0000 | 0000 | 0000 | 0002 | 0000 | 0000 | 0000 |
| 0000445600 | 0000 | 0000 | 652E | 736F | 0000 | 0000 | 0000 | 0000 |
| 0000445620 | FFFE | 000A | 0166 | 0F52 | 0000 | 0000 | 0002 | 0000 |
| 0000445640 | 0000 | 0000 | 0000 | 0000 | 0000 | 0000 | 1F7B | 0000 |
| 0000445660 | 0000 | 0000 | FFFE | 000A | 010F | 0000 | 0000 | 0000 |
| 0000445700 | 0002 | 0000 | 0000 | 0F68 | 0000 | 0000 | 0000 | 0000 |
| 0000445720 | 1F85 | 0000 | 0000 | 0000 | FFFF | 000B | 0110 | 0000 |
| 0000445740 | 0000 | 0000 | 0002 | 0000 | 0000 | 0000 | 0000 | 0000 |
| 0000445760 | 0000 | 0000 | 1F91 | 0000 | 0001 | 0000 | FFFF | 000B |
| 0000446000 | 0110 | 0000 | 0000 | 0000 | 0002 | 0000 | 0000 | 0000 |
| 0000446020 | 0000 | 0000 | 4D5F | 3442 | 525F | 0044 | 0003 | 0000 |
| 0000446040 | FFFF | 000B | 0110 | 0000 | 0000 | 0000 | 0002 | 0000 |
| 0000446060 | 0000 | 0000 | 0000 | 0000 | 652E | 736F | 0000 | 0000 |
| 0000446100 | 0000 | 0000 | FFFE | 000A | 0166 | 0F5E | 0000 | 0000 |
| 0000446120 | 0002 | 0000 | 0000 | 0000 | 0000 | 0000 | 0000 | 0000 |
| 0000446140 | 1F9C | 0000 | 0000 | 0000 | FFFE | 000A | 010F | 0000 |
| 0000446160 | 0000 | 0000 | 0002 | 0000 | 0000 | 0F70 | 0000 | 0000 |
| 0000446200 | 4D5F | 3542 | 575F | 0052 | 0000 | 0000 | FFFF | 000B |
| 0000446220 | 0110 | 0000 | 0000 | 0000 | 0002 | 0000 | 0000 | 0000 |
| 0000446240 | 0000 | 0000 | 4D5F | 3542 | 525F | 0044 | 0003 | 0000 |
| 0000446260 | FFFF | 000B | 0110 | 0000 | 0000 | 0000 | 0002 | 0000 |
| 0000446300 | 0000 | 0000 | 0000 | 0000 | 652E | 736F | 0000 | 0000 |
| 0000446320 | 0000 | 0000 | FFFE | 000A | 0166 | 0F68 | 0000 | 0000 |
| 0000446340 | 0002 | 0000 | 0000 | 0000 | 0000 | 0000 | 0000 | 0000 |
| 0000446360 | 1FA6 | 0000 | 0000 | 0000 | FFFE | 000A | 010F | 0000 |
| 0000446400 | 0000 | 0000 | 0001 | 0000 | 0000 | 0F78 | 0000 | 0000 |
| 0000446420 | 0000 | 0000 | 1FB2 | 0000 | 0000 | 0000 | FFFF | 000B |
| 0000446440 | 0110 | 0000 | 0000 | 0000 | 0001 | 0000 | 0000 | 0000 |
| 0000446460 | 0000 | 0000 | 0000 | 0000 | 1FBD | 0000 | 0001 | 0000 |
| 0000446500 | FFFF | 000B | 0110 | 0000 | 0000 | 0000 | 0001 | 0000 |
| 0000446520 | 0000 | 0000 | 0000 | 0000 | 652E | 736F | 0000 | 0000 |
| 0000446540 | 0000 | 0000 | FFFE | 000A | 0166 | 0F70 | 0000 | 0000 |
| 0000446560 | 0001 | 0000 | 0000 | 0000 | 0000 | 0000 | 0000 | 0000 |
| 0000446600 | 1FC7 | 0000 | 0000 | 0000 | FFFE | 000A | 010F | 0000 |
| 0000446620 | 0000 | 0000 | 0001 | 0000 | 0000 | 0F80 | 0000 | 0000 |
| 0000446640 | 0000 | 0000 | 1FD4 | 0000 | 0000 | 0000 | FFFF | 000B |
| 0000446660 | 0110 | 0000 | 0000 | 0000 | 0001 | 0000 | 0000 | 0000 |
| 0000446700 | 0000 | 0000 | 0000 | 0000 | 1FE0 | 0000 | 0001 | 0000 |
| 0000446720 | FFFF | 000B | 0110 | 0000 | 0000 | 0000 | 0001 | 0000 |
| 0000446740 | 0000 | 0000 | 0000 | 0000 | 652E | 736F | 0000 | 0000 |
| 0000446760 | 0000 | 0000 | FFFE | 000A | 0166 | 0F78 | 0000 | 0000 |

THU MAR 14 17:37:32 1991 GSPMON.4 PAGE 161, LINE 9441

| | | | | | | | | |
|---|---|---|---|---|---|---|---|---|
| 0000447000 | 0001 | 0000 | 0000 | 0000 | 0000 | 0000 | 0000 | 0000 |
| 0000447020 | 1FED | 0000 | 0000 | 0000 | FFFE | 000A | 010F | 0000 |
| 0000447040 | 0000 | 0000 | 0003 | 0000 | 0000 | 0F90 | 0000 | 0000 |
| 0000447060 | 585F | 424D | 0030 | 0000 | 0000 | 0000 | FFFF | 000B |
| 0000447100 | 0110 | 000C | 0000 | 0000 | 0003 | 0000 | 0000 | 0000 |
| 0000447120 | 0000 | 0000 | 585F | 424D | 0031 | 0000 | 0001 | 0000 |
| 0000447140 | FFFF | 000B | 0110 | 0000 | 0000 | 0000 | 0003 | 0000 |
| 0000447160 | 0000 | 0000 | 0000 | 0000 | 585F | 424D | 0032 | 0000 |
| 0000447200 | 0002 | 0000 | FFFF | 000B | 0110 | 0000 | 0000 | 0000 |
| 0000447220 | 0003 | 0000 | 0000 | 0000 | 0000 | 0000 | 585F | 424D |
| 0000447240 | 0033 | 0000 | 0003 | 0000 | FFFF | 000B | 0110 | 0000 |
| 0000447260 | 0000 | 0000 | 0003 | 0000 | 0000 | 0000 | 0000 | 0000 |
| 0000447300 | 585F | 424D | 0034 | 0000 | 0004 | 0000 | FFFF | 000B |
| 0000447320 | 0110 | 0000 | 0000 | 0000 | 0003 | 0000 | 0000 | 0000 |
| 0000447340 | 0000 | 0000 | 585F | 424D | 0035 | 0000 | 0005 | 0000 |
| 0000447360 | FFFF | 000B | 0110 | 0000 | 0000 | 0000 | 0003 | 0000 |
| 0000447400 | 0000 | 0000 | 0000 | 0000 | 652E | 736F | 0000 | 0000 |
| 0000447420 | 0000 | 0000 | FFFE | 000A | 0166 | 0F80 | 0000 | 0000 |
| 0000447440 | 0003 | 0000 | 0000 | 0000 | 0000 | 0000 | 635F | 6E68 |
| 0000447460 | 006C | 0000 | 0000 | 0000 | FFFE | 000A | 010F | 0000 |
| 0000447500 | 0000 | 0000 | 0002 | 0000 | 0000 | 0F9C | 0000 | 0000 |
| 0000447520 | 525F | 4445 | 435F | 0048 | 0000 | 0000 | FFFF | 000B |
| 0000447540 | 0110 | 0000 | 0000 | 0000 | 0002 | 0000 | 0000 | 0000 |
| 0000447560 | 0000 | 0000 | 0000 | 0000 | 1FF7 | 0000 | 0001 | 0000 |
| 0000447600 | FFFF | 000B | 0110 | 0000 | 0000 | 0000 | 0002 | 0000 |
| 0000447620 | 0000 | 0000 | 0000 | 0000 | 425F | 554C | 5F45 | 4843 |
| 0000447640 | 0002 | 0000 | FFFF | 000B | 0110 | 0000 | 0000 | 0000 |
| 0000447660 | 0002 | 0000 | 0000 | 0000 | 0000 | 0000 | 0000 | 0000 |
| 0000447700 | 2001 | 0000 | 0003 | 0000 | FFFF | 000B | 0110 | 0000 |
| 0000447720 | 0000 | 0000 | 0002 | 0000 | 0000 | 0000 | 0000 | 0000 |
| 0000447740 | 652E | 736F | 0000 | 0000 | 0000 | 0000 | FFFE | 000A |
| 0000447760 | 0166 | 0F90 | 0000 | 0000 | 0002 | 0000 | 0000 | 0000 |
| 0000450000 | 0000 | 0000 | 0000 | 0000 | 200D | 0000 | 0000 | 0000 |
| 0000450020 | FFFE | 000A | 010F | 0000 | 0000 | 0000 | 0001 | 0000 |
| 0000450040 | 0000 | 0FA4 | 0000 | 0000 | 0000 | 0000 | 2017 | 0000 |
| 0000450060 | 0000 | 0000 | FFFF | 000B | 0110 | 0000 | 0000 | 0000 |
| 0000450100 | 0001 | 0000 | 0000 | 0000 | 0000 | 0000 | 435F | 4359 |
| 0000450120 | 494C | 0043 | 0001 | 0000 | FFFF | 000B | 0110 | 0000 |
| 0000450140 | 0000 | 0000 | 0001 | 0000 | 0000 | 0000 | 0000 | 0000 |
| 0000450160 | 652E | 736F | 0000 | 0000 | 0000 | 0000 | FFFE | 000A |
| 0000450200 | 0166 | 0F9C | 0000 | 0000 | 0001 | 0000 | 0000 | 0000 |
| 0000450220 | 0000 | 0000 | 662E | 6C69 | 0065 | 0000 | 0FA6 | 0000 |
| 0000450240 | FFFE | 0000 | 0167 | 7067 | 735F | 6C63 | 632E | 0000 |
| 0000450260 | 0000 | 0000 | 0000 | 0000 | 662E | 6C69 | 0065 | 0000 |
| 0000450300 | 0FA8 | 0000 | FFFE | 0000 | 0167 | 7367 | 6870 | 6477 |
| 0000450320 | 682E | 0000 | 0000 | 0000 | 0000 | 0000 | 662E | 6C69 |
| 0000450340 | 0065 | 0000 | 0FAA | 0000 | FFFE | 0000 | 0167 | 7067 |
| 0000450360 | 735F | 6C63 | 632E | 0000 | 0000 | 0000 | 0000 | 0000 |
| 0000450400 | 662E | 6C69 | 0065 | 0000 | 1070 | 0000 | FFFE | 0000 |
| 0000450420 | 0167 | 7067 | 705F | 6275 | 682E | 0000 | 0000 | 0000 |
| 0000450440 | 0000 | 0000 | 332E | 6166 | 656B | 0000 | 0000 | 0000 |
| 0000450460 | FFFE | 0008 | 010A | 0000 | 0000 | 0000 | 01B0 | 0000 |
| 0000450500 | 0000 | 0FDE | 0000 | 0000 | 685F | 7365 | 6E79 | 0063 |
| 0000450520 | 0000 | 0000 | FFFF | 000D | 0108 | 0000 | 0000 | 0000 |
| 0000450540 | 0010 | 0000 | 0000 | 0000 | 0000 | 0000 | 685F | 6265 |
| 0000450560 | 6E6C | 006B | 0010 | 0000 | FFFF | 000D | 0108 | 0000 |
| 0000450600 | 0000 | 0000 | 0010 | 0000 | 0000 | 0000 | 0000 | 0000 |
| 0000450620 | 685F | 6273 | 6E6C | 006B | 0020 | 0000 | FFFF | 000D |
| 0000450640 | 0108 | 0000 | 0000 | 0000 | 0010 | 0000 | 0000 | 0000 |

THU MAR 14 17:37:32 1991 GSPMON.4 PAGE 162, LINE 9500

| | | | | | | | | |
|---|---|---|---|---|---|---|---|---|
| 0000450660 | 0000 | 0000 | 765F | 7365 | 6E79 | 0063 | 0030 | 0000 |
| 0000450700 | FFFF | 000D | 0108 | 0000 | 0000 | 0000 | 0010 | 0000 |
| 0000450720 | 0000 | 0000 | 0000 | 0000 | 765F | 6265 | 6E6C | 006B |
| 0000450740 | 0040 | 0000 | FFFF | 000D | 0108 | 0000 | 0000 | 0000 |
| 0000450760 | 0010 | 0000 | 0000 | 0000 | 0000 | 0000 | 765F | 6273 |
| 0000451000 | 6E6C | 006B | 0050 | 0000 | FFFF | 000D | 0108 | 0000 |
| 0000451020 | 0000 | 0000 | 0010 | 0000 | 0000 | 0000 | 0000 | 0000 |
| 0000451040 | 0000 | 0000 | 2021 | 0000 | 0060 | 0000 | FFFF | 000D |
| 0000451060 | 0108 | 0000 | 0000 | 0000 | 0010 | 0000 | 0000 | 0000 |
| 0000451100 | 0000 | 0000 | 665F | 6468 | 7369 | 0070 | 0070 | 0000 |
| 0000451120 | FFFF | 000D | 0108 | 0000 | 0000 | 0000 | 0010 | 0000 |
| 0000451140 | 0000 | 0000 | 0000 | 0000 | 6D5F | 5F62 | 6973 | 657A |
| 0000451160 | 0080 | 0000 | FFFF | 000F | 0108 | 0000 | 0000 | 0000 |
| 0000451200 | 0020 | 0000 | 0000 | 0000 | 000D | 0000 | 0000 | 0000 |
| 0000451220 | 202C | 0000 | 00AD | 0000 | FFFF | 000D | 0108 | 0000 |
| 0000451240 | 0000 | 0000 | 0010 | 0000 | 0000 | 0000 | 0000 | 0000 |
| 0000451260 | 0000 | 0000 | 2036 | 0000 | 00B0 | 0000 | FFFF | 000D |
| 0000451300 | 0108 | 0000 | 0000 | 0000 | 0010 | 0000 | 0000 | 0000 |
| 0000451320 | 0000 | 0000 | 0000 | 0000 | 2040 | 0000 | 00C0 | 0000 |
| 0000451340 | FFFF | 000D | 0108 | 0000 | 0000 | 0000 | 0010 | 0000 |
| 0000451360 | 0000 | 0000 | 0000 | 0000 | 0000 | 0000 | 204B | 0000 |
| 0000451400 | 00D0 | 0000 | FFFF | 000D | 0108 | 0000 | 0000 | 0000 |
| 0000451420 | 0010 | 0000 | 0000 | 0000 | 0000 | 0000 | 0000 | 0000 |
| 0000451440 | 2055 | 0000 | 00E0 | 0000 | FFFF | 000F | 0108 | 0000 |
| 0000451460 | 0000 | 0000 | 0020 | 0000 | 0000 | 0000 | 0000 | 0000 |
| 0000451500 | 0000 | 0000 | 2062 | 0000 | 0100 | 0000 | FFFF | 000F |
| 0000451520 | 0108 | 0000 | 0000 | 0000 | 0020 | 0000 | 0000 | 0000 |
| 0000451540 | 0000 | 0000 | 0000 | 0000 | 2074 | 0000 | 0120 | 0000 |
| 0000451560 | FFFF | 000F | 0108 | 0000 | 0000 | 0000 | 0020 | 0000 |
| 0000451600 | 0000 | 0000 | 0000 | 0000 | 0000 | 0000 | 2083 | 0000 |
| 0000451620 | 0140 | 0000 | FFFF | 000F | 0108 | 0000 | 0000 | 0000 |
| 0000451640 | 0020 | 0000 | 0000 | 0000 | 0000 | 0000 | 0000 | 0000 |
| 0000451660 | 2099 | 0000 | 0160 | 0000 | FFFF | 000D | 0108 | 0000 |
| 0000451700 | 0000 | 0000 | 0010 | 0000 | 0000 | 0000 | 0000 | 0000 |
| 0000451720 | 0000 | 0000 | 20A4 | 0000 | 0170 | 0000 | FFFF | 000D |
| 0000451740 | 0108 | 0000 | 0000 | 0000 | 0010 | 0000 | 0000 | 0000 |
| 0000451760 | 0000 | 0000 | 0000 | 0000 | 20B8 | 0000 | 0180 | 0000 |
| 0000452000 | FFFF | 000D | 0108 | 0000 | 0000 | 0000 | 0010 | 0000 |
| 0000452020 | 0000 | 0000 | 0000 | 0000 | 0000 | 0000 | 20CC | 0000 |
| 0000452040 | 0190 | 0000 | FFFF | 000C | 0108 | 0000 | 0000 | 0000 |
| 0000452060 | 0008 | 0000 | 0000 | 0000 | 0000 | 0000 | 645F | 6D75 |
| 0000452100 | 796D | 0000 | 0198 | 0000 | FFFF | 000C | 0108 | 0000 |
| 0000452120 | 0000 | 0000 | 0008 | 0000 | 0000 | 0000 | 0000 | 0000 |
| 0000452140 | 0000 | 0000 | 20DB | 0000 | 01A0 | 0000 | FFFF | 000D |
| 0000452160 | 0108 | 0000 | 0000 | 0000 | 0010 | 0000 | 0000 | 0000 |
| 0000452200 | 0000 | 0000 | 652E | 736F | 0000 | 0000 | 0000 | 0000 |
| 0000452220 | FFFE | 0008 | 0166 | 0FAC | 0000 | 0000 | 01B0 | 0000 |
| 0000452240 | 0000 | 0000 | 0000 | 0000 | 342E | 6166 | 656B | 0000 |
| 0000452260 | 0000 | 0000 | FFFE | 0008 | 010A | 0000 | 0000 | 0000 |
| 0000452300 | 0050 | 0000 | 0000 | 0FE8 | 0000 | 0000 | 6D5F | 6773 |
| 0000452320 | 705F | 7274 | 0000 | 0000 | FFFF | 0010 | 0108 | 0000 |
| 0000452340 | 0000 | 0000 | 0020 | 0000 | 0000 | 0000 | 0000 | 0000 |
| 0000452360 | 0000 | 0000 | 20E7 | 0000 | 0020 | 0000 | FFFF | 000F |
| 0000452400 | 0108 | 0000 | 0000 | 0000 | 0020 | 0000 | 0000 | 0000 |
| 0000452420 | 0000 | 0000 | 0000 | 0000 | 20F1 | 0000 | 0040 | 0000 |
| 0000452440 | FFFF | 000D | 0108 | 0000 | 0000 | 0000 | 0010 | 0000 |
| 0000452460 | 0000 | 0000 | 0000 | 0000 | 652E | 736F | 0000 | 0000 |
| 0000452500 | 0000 | 0000 | FFFE | 0008 | 0166 | 0FDE | 0000 | 0000 |
| 0000452520 | 0050 | 0000 | 0000 | 0000 | 0000 | 0000 | 352E | 6166 |

THU MAR 14 17:37:32 1991 GSPMON.4 PAGE 163, LINE 9559

| | | | | | | | | |
|---|---|---|---|---|---|---|---|---|
| 0000452540 | 656B | 0000 | 0000 | 0000 | FFFE | 0008 | 010A | 0000 |
| 0000452560 | 0000 | 0000 | 0040 | 0000 | 0000 | 0FF4 | 0000 | 0000 |
| 0000452600 | 0000 | 0000 | 20FC | 0000 | 0000 | 0000 | FFFF | 000D |
| 0000452620 | 0108 | 0000 | 0000 | 0000 | 0010 | 0000 | 0000 | 0000 |
| 0000452640 | 0000 | 0000 | 6A5F | 6D75 | 0070 | 0000 | 0010 | 0000 |
| 0000452660 | FFFF | 000D | 0108 | 0000 | 0000 | 0000 | 0010 | 0000 |
| 0000452700 | 0000 | 0000 | 0000 | 0000 | 735F | 6174 | 7472 | 0000 |
| 0000452720 | 0020 | 0000 | FFFF | 000D | 0108 | 0000 | 0000 | 0000 |
| 0000452740 | 0010 | 0000 | 0000 | 0000 | 0000 | 0000 | 655F | 646E |
| 0000452760 | 0000 | 0000 | 0030 | 0000 | FFFF | 000D | 0108 | 0000 |
| 0000453000 | 0000 | 0000 | 0010 | 0000 | 0000 | 0000 | 0000 | 0000 |
| 0000453020 | 652E | 736F | 0000 | 0000 | 0000 | 0000 | FFFE | 0008 |
| 0000453040 | 0166 | 0FE8 | 0000 | 0000 | 0040 | 0000 | 0000 | 0000 |
| 0000453060 | 0000 | 0000 | 362E | 6166 | 656B | 0000 | 0000 | 0000 |
| 0000453100 | FFFE | 0008 | 010A | 0000 | 0000 | 0000 | 0080 | 0000 |
| 0000453120 | 0000 | 0FFC | 000D | 0000 | 685F | 0000 | 0000 | 0000 |
| 0000453140 | 0000 | 0000 | FFFF | 0008 | 0108 | 0FE8 | 0000 | 0000 |
| 0000453160 | 0040 | 0000 | 0000 | 0000 | 0000 | 0000 | 765F | 000D |
| 0000453200 | 0000 | 0000 | 0040 | 0000 | FFFF | 0008 | 0108 | 0FE8 |
| 0000453220 | 0000 | 0000 | 0040 | 0000 | 0000 | 0000 | 0000 | 0000 |
| 0000453240 | 652E | 736F | 0000 | 0000 | 0000 | 0000 | FFFE | 0008 |
| 0000453260 | 0166 | 0FF4 | 0000 | 0000 | 0080 | 0000 | 0000 | 0000 |
| 0000453300 | 0000 | 0000 | 372E | 6166 | 656B | 0000 | 0000 | 0000 |
| 0000453320 | FFFE | 0009 | 010C | 0000 | 0000 | 0000 | 0200 | 0000 |
| 0000453340 | 0000 | 1006 | 0000 | 0000 | 635F | 6B68 | 7573 | 006D |
| 0000453360 | 0000 | 0000 | FFFF | 003D | 010B | 0000 | 0000 | 0000 |
| 0000453400 | 0200 | 0020 | 0000 | 0000 | 0000 | 0000 | 655F | 7272 |
| 0000453420 | 6E63 | 0074 | 0000 | 0000 | FFFF | 003D | 010B | 0000 |
| 0000453440 | 0000 | 0000 | 0200 | 0020 | 0000 | 0000 | 0000 | 0000 |
| 0000453460 | 635F | 6372 | 3233 | 0000 | 0000 | 0000 | FFFF | 003D |
| 0000453500 | 010B | 0000 | 0000 | 0000 | 0200 | 0020 | 0000 | 0000 |
| 0000453520 | 0000 | 000C | 652E | 736F | 0000 | 0000 | 0000 | 0000 |
| 0000453540 | FFFE | 0009 | 0166 | 0FFC | 0000 | 0000 | 0200 | 0000 |
| 0000453560 | 0000 | 0000 | 0000 | 0000 | 382E | 6166 | 656B | 0000 |
| 0000453600 | 0000 | 0000 | FFFE | 0008 | 010A | 0000 | 0000 | 0000 |
| 0000453620 | 0240 | 0000 | 0000 | 100E | 0000 | 0000 | 0000 | 0000 |
| 0000453640 | 2108 | 0000 | 0000 | 0000 | FFFF | 0008 | 0108 | 0FE8 |
| 0000453660 | 0000 | 0000 | 0040 | 0000 | 0000 | 0000 | 0000 | 0000 |
| 0000453700 | 0000 | 0000 | 2115 | 0000 | 0040 | 0000 | FFFF | 0009 |
| 0000453720 | 0108 | 0FFC | 0000 | 0000 | 0200 | 0000 | 0000 | 0000 |
| 0000453740 | 0000 | 0000 | 652E | 736F | 0000 | 0000 | 0000 | 0000 |
| 0000453760 | FFFE | 0008 | 0166 | 1006 | 0000 | 0000 | 0240 | 0000 |
| 0000454000 | 0000 | 0000 | 0000 | 0000 | 392E | 6166 | 656B | 0000 |
| 0000454020 | 0000 | 0000 | FFFE | 0009 | 010C | 0000 | 0000 | 0000 |
| 0000454040 | 4000 | 0000 | 0000 | 1018 | 0000 | 0000 | 635F | 6B68 |
| 0000454060 | 7573 | 006D | 0000 | 0000 | FFFF | 00FD | 010B | 0000 |
| 0000454100 | 0000 | 0000 | 4000 | 0020 | 0020 | 0000 | 0000 | 0000 |
| 0000454120 | 655F | 7272 | 6E63 | 0074 | 0000 | 0000 | FFFF | 00FD |
| 0000454140 | 010B | 0000 | 0000 | 0000 | 4000 | 0020 | 0020 | 0000 |
| 0000454160 | 0000 | 0000 | 635F | 6372 | 3233 | 0000 | 0000 | 0000 |
| 0000454200 | FFFF | 00FD | 010B | 0000 | 0000 | 0000 | 4000 | 0020 |
| 0000454220 | 0020 | 0000 | 0000 | 0000 | 652E | 736F | 0000 | 0000 |
| 0000454240 | 0000 | 0000 | FFFE | 0009 | 0166 | 100E | 0000 | 0000 |
| 0000454260 | 4000 | 0000 | 0000 | 0000 | 0000 | 0000 | 312E | 6630 |
| 0000454300 | 6B61 | 0065 | 0000 | 0000 | FFFE | 0008 | 010A | 0000 |
| 0000454320 | 0000 | 0000 | 4080 | 0000 | 0000 | 1022 | 0000 | 0000 |
| 0000454340 | 0000 | 0000 | 2121 | 0000 | 0000 | 0000 | FFFF | 0008 |
| 0000454360 | 0108 | 0FE8 | 0000 | 0000 | 0040 | 0000 | 0000 | 0000 |
| 0000454400 | 0000 | 0000 | 0000 | 0000 | 212E | 0000 | 0040 | 0000 |

THU MAR 14 17:37:32 1991 GSPMON.4 PAGE 164, LINE 9618

| | | | | | | | | |
|---|---|---|---|---|---|---|---|---|
| 0000454420 | FFFF | 0008 | 0108 | 0FE8 | 0000 | 0000 | 0040 | 0000 |
| 0000454440 | 0000 | 0000 | 0000 | 0000 | 0000 | 0000 | 213A | 0000 |
| 0000454460 | 0080 | 0000 | FFFF | 0009 | 0108 | 100E | 0000 | 0000 |
| 0000454500 | 4000 | 0000 | 0000 | 0000 | 0000 | 0000 | 652E | 736F |
| 0000454520 | 0000 | 0000 | 0000 | 0000 | FFFE | 0008 | 0166 | 1018 |
| 0000454540 | 0000 | 0000 | 4080 | 0000 | 0000 | 0000 | 0000 | 0000 |
| 0000454560 | 312E | 6631 | 6B61 | 0065 | 0000 | 0000 | FFFE | 0009 |
| 0000454600 | 010C | 0000 | 0000 | 0000 | 0090 | 0000 | 0000 | 102C |
| 0000454620 | 0000 | 0000 | 635F | 6B68 | 7573 | 006D | 0000 | 0000 |
| 0000454640 | FFFF | 00FD | 010B | 0000 | 0000 | 0000 | 0090 | 0003 |
| 0000454660 | 0003 | 0000 | 0000 | 0000 | 655F | 7272 | 6E63 | 0074 |
| 0000454700 | 00G0 | 0000 | FFFF | 00FD | 010B | 0000 | 0000 | 0000 |
| 0000454720 | 0090 | 0003 | 0003 | 0000 | 0000 | 0000 | 625F | 7263 |
| 0000454740 | 3363 | 0032 | 0000 | 0000 | FFFF | 00FD | 010B | 0000 |
| 0000454760 | 0000 | 0000 | 0090 | 0003 | 0003 | 0000 | 0000 | 0000 |
| 0000455000 | 652E | 736F | 0000 | 0000 | 0000 | 0000 | FFFE | 0009 |
| 0000455020 | 0166 | 1022 | 0000 | 0000 | 0090 | 0000 | 0000 | 0000 |
| 0000455040 | 0000 | 0000 | 312E | 6632 | 6B61 | 0065 | 0000 | 0000 |
| 0000455060 | FFFE | 0008 | 010A | 0000 | 0000 | 0000 | 0130 | 0000 |
| 0000455100 | 0000 | 103A | 0000 | 0000 | 0000 | 0000 | 2144 | 0000 |
| 0000455120 | 0000 | 0000 | FFFF | 0008 | 0108 | 0FE8 | 0000 | 0000 |
| 0000455140 | 0040 | 0000 | 0000 | 0000 | 0000 | 0000 | 0000 | 0000 |
| 0000455160 | 2151 | 0000 | 0040 | 0000 | FFFF | 0008 | 0108 | 0FE8 |
| 0000455200 | 0000 | 0000 | 004D | 0000 | 0000 | 0000 | 0000 | 0000 |
| 0000455220 | 785F | 635F | 6F6F | 6472 | 0080 | 0000 | FFFF | 0003 |
| 0000455240 | 0108 | 0000 | 0000 | 0000 | 0010 | 0000 | 0000 | 0000 |
| 0000455260 | 0000 | 0000 | 795F | 635F | 6F6F | 6472 | 0090 | 0000 |
| 0000455300 | FFFF | 0003 | 0108 | 0000 | 0000 | 0000 | 0010 | 0000 |
| 0000455320 | 0000 | 0000 | 0000 | 0000 | 0000 | 0000 | 215D | 0000 |
| 0000455340 | 00A0 | 0000 | FFFF | 0009 | 0108 | 1022 | 0000 | 0000 |
| 0000455360 | 0090 | 0000 | 0000 | 0000 | 0000 | 0000 | 652E | 736F |
| 0000455400 | 0000 | 0000 | 0000 | 0000 | FFFE | 0008 | 0166 | 102C |
| 0000455420 | 0000 | 0000 | 0130 | 0000 | 0000 | 0000 | 0000 | 0000 |
| 0000455440 | 312E | 6633 | 6B61 | 0065 | 0000 | 0000 | FFFE | 0008 |
| 0000455460 | 010A | 0000 | 0000 | 0000 | 0050 | 0000 | 0000 | 1046 |
| 0000455500 | 0000 | 0000 | 0000 | 0000 | 2167 | 0000 | 0000 | 0000 |
| 0000455520 | FFFF | 000D | 0108 | 0000 | 0000 | 0000 | 0010 | 0000 |
| 0000455540 | 0000 | 0000 | 0000 | 0000 | 0000 | 0000 | 217F | 0000 |
| 0000455560 | 0010 | 0000 | FFFF | 000D | 0108 | 0000 | 0000 | 0000 |
| 0000455600 | 0010 | 0000 | 0000 | 0000 | 0000 | 0000 | 0000 | 0000 |
| 0000455620 | 2191 | 0000 | 0020 | 0000 | FFFF | 000D | 0108 | 0000 |
| 0000455640 | 0000 | 0000 | 0010 | 0000 | 0000 | 0000 | 0000 | 0000 |
| 0000455660 | 0000 | 0000 | 219C | 0000 | 0030 | 0000 | FFFF | 0010 |
| 0000455700 | 0108 | 0000 | 0000 | 0000 | 0020 | 0000 | 0000 | 0000 |
| 0000455720 | 0000 | 0000 | 652E | 736F | 0000 | 0000 | 0000 | 0000 |
| 0000455740 | FFFE | 0008 | 0166 | 103A | 0000 | 0000 | 0050 | 0000 |
| 0000455760 | 0000 | 0000 | 0000 | 0000 | 312E | 6634 | 6B61 | 0065 |
| 0000456000 | 0000 | 0000 | FFFE | 0008 | 010A | 0000 | 0000 | 0000 |
| 0000456020 | 0040 | 0000 | 0000 | 104E | 0000 | 0000 | 0000 | 0000 |
| 0000456040 | 21A6 | 0000 | 0000 | 0000 | FFFF | 0005 | 0108 | 0000 |
| 0000456060 | 0000 | 0000 | 0020 | 0000 | 0000 | 0000 | 0000 | 0000 |
| 0000456100 | 0000 | 0000 | 21B6 | 0000 | 0020 | 0000 | FFFF | 0005 |
| 0000456120 | 0108 | 0000 | 0000 | 0000 | 0020 | 0000 | 0000 | 0000 |
| 0000456140 | 0000 | 0000 | 652E | 736F | 0000 | 0000 | 0000 | 0000 |
| 0000456160 | FFFE | 0008 | 0166 | 1046 | 0000 | 0000 | 0040 | 0000 |
| 0000456200 | 0000 | 0000 | 0000 | 0000 | 312E | 6635 | 6B61 | 0065 |
| 0000456220 | 0000 | 0000 | FFFE | 0008 | 010A | 0000 | 0000 | 0000 |
| 0000456240 | 0050 | 0000 | 0000 | 105C | 0000 | 0000 | 785F | 656C |
| 0000456260 | 7466 | 0000 | 0000 | 0000 | FFFF | 0003 | 0108 | 0000 |

THU MAR 14 17:37:32 1991 GSPMON.4 PAGE 165, LINE 9677

| | | | | | | | | |
|---|---|---|---|---|---|---|---|---|
| 0000456300 | 0000 | 0000 | 0010 | 0000 | 0000 | 0000 | 0000 | 0000 |
| 0000456320 | 795F | 6F74 | 0070 | 0000 | 0010 | 0000 | FFFF | 0003 |
| 0000456340 | 0108 | 0000 | 0000 | 0000 | 0010 | 0000 | 0000 | 0000 |
| 0000456360 | 0000 | 0000 | 785F | 6972 | 6867 | 0074 | 0020 | 0000 |
| 0000456400 | FFFF | 0003 | 0108 | 0000 | 0000 | 0000 | 0010 | 0000 |
| 0000456420 | 0000 | 0000 | 0000 | 0000 | 795F | 6F64 | 6E77 | 0000 |
| 0000456440 | 0030 | 0000 | FFFF | 0003 | 0108 | 0000 | 0000 | 0000 |
| 0000456460 | 0010 | 0000 | 0000 | 0000 | 0000 | 0000 | 0000 | 0000 |
| 0000456500 | 21C5 | 0000 | 0040 | 0000 | FFFF | 0003 | 0108 | 0000 |
| 0000456520 | 0000 | 0000 | 0010 | 0000 | 0000 | 0000 | 0000 | 0000 |
| 0000456540 | 652E | 736F | 0000 | 0000 | 0000 | 0000 | FFFE | 0008 |
| 0000456560 | 0166 | 104E | 0000 | 0000 | 0050 | 0000 | 0000 | 0000 |
| 0000456600 | 0000 | 0000 | 312E | 6636 | 6B61 | 0065 | 0000 | 0000 |
| 0000456620 | FFFE | 0008 | 010A | 0000 | 0000 | 0000 | 0020 | 0000 |
| 0000456640 | 0000 | 1064 | 0000 | 0000 | 0000 | 0000 | 21CF | 0000 |
| 0000456660 | 0000 | 0000 | FFFF | 0003 | 0108 | 0000 | 0000 | 0000 |
| 0000456700 | 0010 | 0000 | 0000 | 0000 | 0000 | 0000 | 0000 | 0000 |
| 0000456720 | 21DB | 0000 | 0010 | 0000 | FFFF | 0003 | 0108 | 0000 |
| 0000456740 | 0000 | 0000 | 0010 | 0000 | 0000 | 0000 | 0000 | 0000 |
| 0000456760 | 652E | 736F | 0000 | 0000 | 0000 | 0000 | FFFE | 0008 |
| 0000457000 | 0166 | 105C | 0000 | 0000 | 0020 | 0000 | 0000 | 0000 |
| 0000457020 | 0000 | 0000 | 312E | 6637 | 6B61 | 0065 | 0000 | 0000 |
| 0000457040 | FFFE | 0008 | 010A | 0000 | 0000 | 0000 | 0040 | 0000 |
| 0000457060 | 0000 | 1070 | 0000 | 0000 | 0000 | 0000 | 21E5 | 0000 |
| 0000457100 | 0000 | 0000 | FFFF | 000D | 0108 | 0000 | 0000 | 0000 |
| 0000457120 | 0010 | 0000 | 0000 | 0000 | 0000 | 0000 | 0000 | 0000 |
| 0000457140 | 21F8 | 0000 | 0010 | 0000 | FFFF | 000D | 0108 | 0000 |
| 0000457160 | 0000 | 0000 | 0010 | 0000 | 0000 | 0000 | 0000 | 0000 |
| 0000457200 | 0000 | 0000 | 220A | 0000 | 0020 | 0000 | FFFF | 000D |
| 0000457220 | 0108 | 0000 | 0000 | 0000 | 0010 | 0000 | 0000 | 0000 |
| 0000457240 | 0000 | 0000 | 0000 | 0000 | 2217 | 0000 | 0030 | 0000 |
| 0000457260 | FFFF | 000D | 0108 | 0000 | 0000 | 0000 | 0010 | 0000 |
| 0000457300 | 0000 | 0000 | 0000 | 0000 | 652E | 736F | 0000 | 0000 |
| 0000457320 | 0000 | 0000 | FFFE | 0008 | 0166 | 1064 | 0000 | 0000 |
| 0000457340 | 0040 | 0000 | 0000 | 0000 | 0000 | 0000 | 662E | 6C69 |
| 0000457360 | 0065 | 0000 | 1072 | 0000 | FFFE | 0000 | 0167 | 7067 |
| 0000457400 | 735F | 6C63 | 632E | 0000 | 0000 | 0000 | 0000 | 0000 |
| 0000457420 | 662E | 6C69 | 0065 | 0000 | 10DE | 0000 | FFFE | 0000 |
| 0000457440 | 0167 | 7067 | 6D5F | 756F | 682E | 0000 | 0000 | 0000 |
| 0000457460 | 0000 | 0000 | 312E | 6638 | 6B61 | 0065 | 0000 | 0000 |
| 0000457500 | FFFE | 0008 | 010A | 0000 | 0000 | 0000 | 0060 | 0000 |
| 0000457520 | 0000 | 107E | 0000 | 0000 | 0000 | 0000 | 2225 | 0000 |
| 0000457540 | 0000 | 0000 | FFFF | 000F | 0108 | 0000 | 0000 | 0000 |
| 0000457560 | 0020 | 0000 | 0000 | 0000 | 0000 | 0000 | 0000 | 0000 |
| 0000457600 | 2232 | 0000 | 0020 | 0000 | FFFF | 000F | 0108 | 0000 |
| 0000457620 | 0000 | 0000 | 0020 | 0000 | 0000 | 0000 | 0000 | 000C |
| 0000457640 | 0000 | 0000 | 2248 | 0000 | 0040 | 0000 | FFFF | 000F |
| 0000457660 | 0108 | 0000 | 0000 | 0000 | 0020 | 0000 | 0000 | 0000 |
| 0000457700 | 0000 | 0000 | 652E | 736F | 0000 | 0000 | 0000 | 0000 |
| 0000457720 | FFFE | 0008 | 0166 | 1074 | 0000 | 0000 | 0060 | 0000 |
| 0000457740 | 0000 | 0000 | 0000 | 0000 | 312E | 6639 | 6B61 | 0065 |
| 0000457760 | 0000 | 0000 | FFFE | 0008 | 010A | 0000 | 0000 | 0000 |
| 0000460000 | 00C0 | 0000 | 0000 | 1098 | 0000 | 0000 | 635F | 0078 |
| 0000460020 | 0000 | 0000 | 0000 | 0000 | FFFF | 000D | 0108 | 0000 |
| 0000460040 | 0000 | 0000 | 0010 | 0000 | 0000 | 0000 | 0000 | 0000 |
| 0000460060 | 635F | 0079 | 0000 | 0000 | 0010 | 0000 | FFFF | 000D |
| 0000460100 | 0108 | 0000 | 0000 | 0000 | 0010 | 0000 | 0000 | 0000 |
| 0000460120 | 0000 | 0000 | 785F | 0031 | 0000 | 0000 | 0020 | 0000 |
| 0000460140 | FFFF | 0003 | 0108 | 0000 | 0000 | 0000 | 0010 | 0000 |

THU MAR 14 17:37:32 1991 GSPMON.4 PAGE 166, LINE 9736

| | | | | | | | | |
|---|---|---|---|---|---|---|---|---|
| 0000460160 | 0000 | 0000 | 0000 | 0000 | 795F | 0031 | 0000 | 0000 |
| 0000460200 | 0030 | 0000 | FFFF | 0003 | 0108 | 0000 | 0000 | 0000 |
| 0000460220 | 0010 | 0000 | 0000 | 0000 | 0000 | 0000 | 785F | 0032 |
| 0000460240 | 0000 | 0000 | 0040 | 0000 | FFFF | 0003 | 0108 | 0000 |
| 0000460260 | 0000 | 0000 | 0010 | 0000 | 0000 | 0000 | 0000 | 0000 |
| 0000460300 | 795F | 0032 | 0000 | 0000 | 0050 | 0000 | FFFF | 0003 |
| 0000460320 | 0108 | 0000 | 0000 | 0000 | 0010 | 0000 | 0000 | 0000 |
| 0000460340 | 0000 | 0000 | 685F | 5F70 | 0078 | 0000 | 0060 | 0000 |
| 0000460360 | FFFF | 0003 | 0108 | 0000 | 0000 | 0000 | 0010 | 0000 |
| 0000460400 | 0000 | 0000 | 0000 | 0000 | 685F | 5F70 | 0079 | 0000 |
| 0000460420 | 0070 | 0000 | FFFF | 0003 | 0108 | 0000 | 0000 | 0000 |
| 0000460440 | 0010 | 0000 | 0000 | 0000 | 0000 | 0000 | 0000 | 0000 |
| 0000460460 | 2259 | 0000 | 0080 | 0000 | FFFF | 000F | 0108 | 0000 |
| 0000460500 | 0000 | 0000 | 0020 | 0000 | 0000 | 0000 | 0000 | 0000 |
| 0000460520 | 0000 | 0000 | 2269 | 0000 | 00A0 | 0000 | FFFF | 000D |
| 0000460540 | 0108 | 0000 | 0000 | 0000 | 0010 | 0000 | 0000 | 0000 |
| 0000460560 | 0000 | 0000 | 0000 | 0000 | 2278 | 0000 | 00B0 | 0000 |
| 0000460600 | FFFF | 000D | 0108 | 0000 | 0000 | 0000 | 0010 | 0000 |
| 0000460620 | 0000 | 0000 | 0000 | 0000 | 652E | 736F | 0000 | 0000 |
| 0000460640 | 0000 | 0000 | FFFE | 0008 | 0166 | 107E | 0000 | 0000 |
| 0000460660 | 00C0 | 0000 | 0000 | 0000 | 0000 | 0000 | 322E | 6630 |
| 0000460700 | 6B61 | 0065 | 0000 | 0000 | FFFE | 0008 | 010A | 0000 |
| 0000460720 | 0000 | 0000 | 0030 | 0000 | 0000 | 10A2 | 0000 | 0000 |
| 0000460740 | 785F | 0000 | 0000 | 0000 | 0000 | 0000 | FFFF | 0003 |
| 0000460760 | 0108 | 0000 | 0000 | 0000 | 0010 | 0000 | 0000 | 0000 |
| 0000461000 | 0000 | 0000 | 795F | 0000 | 0000 | 0000 | 0010 | 0000 |
| 0000461020 | FFFF | 0003 | 0108 | 0000 | 0000 | 0000 | 0010 | 0000 |
| 0000461040 | 0000 | 0000 | 0000 | 0000 | 695F | 6F63 | 5F6E | 6469 |
| 0000461060 | 0020 | 0000 | FFFF | 0003 | 0108 | 0000 | 0000 | 0000 |
| 0000461100 | 0010 | 0000 | 0000 | 0000 | 0000 | 0000 | 652E | 736F |
| 0000461120 | 0000 | 0000 | 0000 | 0000 | FFFE | 0008 | 0166 | 1098 |
| 0000461140 | 0000 | 0000 | 0030 | 0000 | 0000 | 0000 | 0000 | 0000 |
| 0000461160 | 322E | 6631 | 6B61 | 0065 | 0000 | 0000 | FFFE | 0008 |
| 0000461200 | 010A | 0000 | 0000 | 0000 | 0070 | 0000 | 0000 | 10B4 |
| 0000461220 | 0000 | 0000 | 785F | 0000 | 0000 | 0000 | 0000 | 0000 |
| 0000461240 | FFFF | 000D | 0108 | 0000 | 0000 | 0000 | 0010 | 0000 |
| 0000461260 | 0000 | 0000 | 0000 | 0000 | 795F | 0000 | 0000 | 0000 |
| 0000461300 | 0010 | 0000 | FFFF | 000D | 0108 | 0000 | 0000 | 0000 |
| 0000461320 | 0010 | 0000 | 0000 | 0000 | 0000 | 0000 | 695F | 6F63 |
| 0000461340 | 5F6E | 6469 | 0020 | 0000 | FFFF | 000D | 0108 | 0000 |
| 0000461360 | 0000 | 0000 | 0010 | 0000 | 0000 | 0000 | 0000 | 0000 |
| 0000461400 | 6C5F | 6665 | 0074 | 0000 | 0030 | 0000 | FFFF | 000D |
| 0000461420 | 0108 | 0000 | 0000 | 0000 | 0010 | 0000 | 0000 | 0000 |
| 0000461440 | 0000 | 0000 | 725F | 6769 | 7468 | 0000 | 0040 | 0000 |
| 0000461460 | FFFF | 000D | 0108 | 0000 | 0000 | 0000 | 0010 | 0000 |
| 0000461500 | 0000 | 0000 | 0000 | 0000 | 755F | 0070 | 0000 | 0000 |
| 0000461520 | 0050 | 0000 | FFFF | 000D | 0108 | 0000 | 0000 | 0000 |
| 0000461540 | 0010 | 0000 | 0000 | 0000 | 0000 | 0000 | 645F | 776F |
| 0000461560 | 006E | 0000 | 0060 | 0000 | FFFF | 000D | 0108 | 0000 |
| 0000461600 | 0000 | 0000 | 0010 | 0000 | 0000 | 0000 | 0000 | 0000 |
| 0000461620 | 652E | 736F | 0000 | 0000 | 0000 | 0000 | FFFE | 0008 |
| 0000461640 | 0166 | 10A2 | 0000 | 0000 | 0070 | 0000 | 0000 | 0000 |
| 0000461660 | 0000 | 0000 | 322E | 6632 | 6B61 | 0065 | 0000 | 0000 |
| 0000461700 | FFFE | 0008 | 010A | 0000 | 0000 | 0000 | 0020 | 0000 |
| 0000461720 | 0000 | 10BC | 0000 | 0000 | 6D5F | 646F | 0065 | 0000 |
| 0000461740 | 0000 | 0000 | FFFF | 000D | 0108 | 0000 | 0000 | 0000 |
| 0000461760 | 0010 | 0000 | 0000 | 0000 | 0000 | 0000 | 725F | 7365 |
| 0000462000 | 6C75 | 0074 | 0010 | 0000 | FFFF | 000D | 0108 | 0000 |
| 0000462020 | 0000 | 0000 | 0010 | 0000 | 0000 | 0000 | 0000 | 0000 |

THU MAR 14 17:37:32 1991 GSPMON.4 PAGE 167, LINE 9795

| | | | | | | | | |
|---|---|---|---|---|---|---|---|---|
| 0000462040 | 652E | 736F | 0000 | 0000 | 0000 | 0000 | FFFE | 0008 |
| 0000462060 | 0166 | 10B4 | 0000 | 0000 | 0020 | 0000 | 0000 | 0000 |
| 0000462100 | 0000 | 0000 | 322E | 6633 | 6B61 | 0065 | 0000 | 0000 |
| 0000462120 | FFFE | 0008 | 010A | 0000 | 0000 | 0000 | 0020 | 0000 |
| 0000462140 | 0000 | 10C8 | 0000 | 0000 | 0000 | 0000 | 2289 | 0000 |
| 0000462160 | 0000 | 0000 | FFFF | 000C | 0108 | 0000 | 0000 | 0000 |
| 0000462200 | 0008 | 0000 | 0000 | 0000 | 0000 | 0000 | 0000 | 0000 |
| 0000462220 | 2295 | 0000 | 0008 | 0000 | FFFF | 000C | 0108 | 0000 |
| 0000462240 | 0000 | 0000 | 0008 | 0000 | 0000 | 0000 | 0000 | 0000 |
| 0000462260 | 0000 | 0000 | 22A0 | 0000 | 0010 | 0000 | FFFF | 000C |
| 0000462300 | 0108 | 0000 | 0000 | 0000 | 0008 | 0000 | 0000 | 0000 |
| 0000462320 | 0000 | 0000 | 0000 | 0000 | 22AB | 0000 | 0018 | 0000 |
| 0000462340 | FFFF | 000C | 0108 | 0000 | 0000 | 0000 | 0008 | 0000 |
| 0000462360 | 0000 | 0000 | 0000 | 0000 | 652E | 736F | 0000 | 0000 |
| 0000462400 | 0000 | 0000 | FFFE | 0008 | 0166 | 10BC | 0000 | 0000 |
| 0000462420 | 0020 | 0000 | 0000 | 0000 | 0000 | 0000 | 322E | 6634 |
| 0000462440 | 6B61 | 0065 | 0000 | 0000 | FFFE | 0008 | 010A | 0000 |
| 0000462460 | 0000 | 0000 | 0020 | 0000 | 0000 | 10D2 | 0000 | 0000 |
| 0000462500 | 615F | 7474 | 0072 | 0000 | 0000 | 0000 | FFFF | 000D |
| 0000462520 | 0108 | 0000 | 0000 | 0000 | 0010 | 0000 | 0000 | 0000 |
| 0000462540 | 0000 | 0000 | 735F | 7274 | 7069 | 0000 | 0010 | 0000 |
| 0000462560 | FFFF | 000C | 0108 | 0000 | 0000 | 0000 | 0008 | 0000 |
| 0000462600 | 0000 | 0000 | 0000 | 0000 | 725F | 6365 | 0074 | 0000 |
| 0000462620 | 0018 | 0000 | FFFF | 000C | 0108 | 0000 | 0000 | 0000 |
| 0000462640 | 0008 | 0000 | 0000 | 0000 | 0000 | 0000 | 652E | 736F |
| 0000462660 | 0000 | 0000 | 0000 | 0000 | FFFE | 0008 | 0166 | 10C8 |
| 0000462700 | 0000 | 0000 | 0020 | 0000 | 0000 | 0000 | 0000 | 0000 |
| 0000462720 | 322E | 6635 | 6B61 | 0065 | 0000 | 0000 | FFFE | 0008 |
| 0000462740 | 010A | 0000 | 0000 | 0000 | 1930 | 0000 | 0000 | 10DE |
| 0000462760 | 0000 | 0000 | 0000 | 0000 | 22B5 | 0000 | 0000 | 0000 |
| 0000463000 | FFFF | 000D | 0108 | 0000 | 0000 | 0000 | 0010 | 0000 |
| 0000463020 | 0000 | 0000 | 0000 | 0000 | 785F | 0000 | 0000 | 0000 |
| 0000463040 | 0010 | 0000 | FFFF | 000D | 0108 | 0000 | 0000 | 0000 |
| 0000463060 | 0010 | 0000 | 0000 | 0000 | 0000 | 0000 | 795F | 0000 |
| 0000463100 | 0000 | 0000 | 0020 | 0000 | FFFF | 000D | 0108 | 0000 |
| 0000463120 | 0000 | 0000 | 0010 | 0000 | 0000 | 0000 | 0000 | 0000 |
| 0000463140 | 0000 | 0000 | 228F | 0000 | 0030 | 0000 | FFFF | 0038 |
| 0000463160 | 0108 | 10C8 | 0000 | 0000 | 1900 | 00C8 | 0000 | 0000 |
| 0000463200 | 0000 | 0000 | 652E | 736F | 0000 | 0000 | 0000 | 0000 |
| 0000463220 | FFFE | 0008 | 0166 | 10D2 | 0000 | 0000 | 1930 | 0000 |
| 0000463240 | 0000 | 0000 | 0000 | 0000 | 662E | 6C69 | 0065 | 0000 |
| 0000463260 | 10E0 | 0000 | FFFE | 0000 | 0167 | 7067 | 735F | 6C63 |
| 0000463300 | 632E | 0000 | 0000 | 0000 | 0000 | 0000 | 662E | 6C69 |
| 0000463320 | 0065 | 0000 | 10EC | 0000 | FFFE | 0000 | 0167 | 7067 |
| 0000463340 | 615F | 6C70 | 682E | 0000 | 0000 | 0000 | 0000 | 0000 |
| 0000463360 | 322E | 6636 | 6B61 | 0065 | 0000 | 0000 | FFFE | 0008 |
| 0000463400 | 010A | 0000 | 0000 | 0000 | 0030 | 0000 | 0000 | 10EC |
| 0000463420 | 0000 | 0000 | 775F | 6469 | 6874 | 0000 | 0000 | 0000 |
| 0000463440 | FFFF | 000D | 0108 | 0000 | 0000 | 0000 | 0010 | 0000 |
| 0000463460 | 0000 | 0000 | 0000 | 0000 | 685F | 6965 | 6867 | 0074 |
| 0000463500 | 0010 | 0000 | FFFF | 000D | 0108 | 0000 | 0000 | 0000 |
| 0000463520 | 0010 | 0000 | 0000 | 0000 | 0000 | 0000 | 645F | 7065 |
| 0000463540 | 6874 | 0000 | 0020 | 0000 | FFFF | 000D | 0108 | 0000 |
| 0000463560 | 0000 | 0000 | 0010 | 0000 | 0000 | 0000 | 0000 | 0000 |
| 0000463600 | 652E | 736F | 0000 | 0000 | 0000 | 0000 | FFFE | 0008 |
| 0000463620 | 0166 | 10E2 | 0000 | 0000 | 0030 | 0000 | 0000 | 0000 |
| 0000463640 | 0000 | 0000 | 662E | 6C69 | 0065 | 0000 | 10EE | 0000 |
| 0000463660 | FFFE | 0000 | 0167 | 7067 | 615F | 6C70 | 692E | 636E |
| 0000463700 | 0000 | 0000 | 0000 | 0000 | 662E | 6C69 | 0065 | 0000 |

THU MAR 14 17:37:32 1991 GSPMON.4 PAGE 168, LINE 9854

| | | | | | | | | |
|---|---|---|---|---|---|---|---|---|
| 0000463720 | 10F0 | 0000 | FFFE | 0000 | 0167 | 7067 | 615F | 6C70 |
| 0000463740 | 682E | 0000 | 0000 | 0000 | 0000 | 0000 | 662E | 6C69 |
| 0000463760 | 0065 | 0000 | 10F2 | 0000 | FFFE | 0000 | 0167 | 7067 |
| 0000464000 | 735F | 6C63 | 632E | 0000 | 0000 | 0000 | 0000 | 0000 |
| 0000464020 | 662E | 6C69 | 0065 | 0000 | 1138 | 0000 | FFFE | 0000 |
| 0000464040 | 0167 | 7067 | 735F | 6C63 | 682E | 0000 | 0000 | 0000 |
| 0000464060 | 0000 | 0000 | 322E | 6637 | 6B61 | 0065 | 0000 | 0000 |
| 0000464100 | FFFE | 0008 | 010A | 0000 | 0000 | 0000 | 0020 | 0000 |
| 0000464120 | 0000 | 10FC | 0000 | 0000 | 785F | 0000 | 0000 | 0000 |
| 0000464140 | 0000 | 0000 | FFFF | 000D | 0108 | 0000 | 0000 | 0000 |
| 0000464160 | 0010 | 0000 | 0000 | 0000 | 0000 | 0000 | 795F | 0000 |
| 0000464200 | 0000 | 0000 | 0010 | 0000 | FFFF | 000D | 0108 | 0000 |
| 0000464220 | 0000 | 0000 | 0010 | 0000 | 0000 | 0000 | 0000 | 0000 |
| 0000464240 | 652E | 736F | 0000 | 0000 | 0000 | 0000 | FFFE | 0008 |
| 0000464260 | 0166 | 10F4 | 0000 | 0000 | 0020 | 0000 | 0000 | 0000 |
| 0000464300 | 0000 | 0000 | 322E | 6638 | 6B61 | 0065 | 0000 | 0000 |
| 0000464320 | FFFE | 0008 | 010A | 0000 | 0000 | 0000 | 0020 | 0000 |
| 0000464340 | 0000 | 1104 | 0000 | 0000 | 635F | 0078 | 0000 | 0000 |
| 0000464360 | 0000 | 0000 | FFFF | 000D | 0108 | 0000 | 0000 | 0000 |
| 0000464400 | 0010 | 0000 | 0000 | 0000 | 0000 | 0000 | 635F | 0079 |
| 0000464420 | 0000 | 0000 | 0010 | 0000 | FFFF | 000D | 0108 | 0000 |
| 0000464440 | 0000 | 0000 | 0010 | 0000 | 0000 | 0000 | 0000 | 0000 |
| 0000464460 | 652E | 736F | 0000 | 0000 | 0000 | 0000 | FFFE | 0008 |
| 0000464500 | 0166 | 10FC | 0000 | 0000 | 0020 | 0000 | 0000 | 0000 |
| 0000464520 | 0000 | 0000 | 322E | 6639 | 6B61 | 0065 | 0000 | 0000 |
| 0000464540 | FFFE | 0008 | 010A | 0000 | 0000 | 0000 | 0040 | 0000 |
| 0000464560 | 0000 | 110C | 0000 | 0000 | 705F | 0031 | 0000 | 0000 |
| 0000464600 | 0000 | 0000 | FFFF | 0008 | 0108 | 10F4 | 0000 | 0000 |
| 0000464620 | 0020 | 0000 | 0000 | 0000 | 0000 | 0000 | 735F | 7A69 |
| 0000464640 | 0000 | 0000 | 0020 | 0000 | FFFF | 0008 | 0108 | 10FC |
| 0000464660 | 0000 | 0000 | 0020 | 0000 | 0000 | 0000 | 0000 | 0000 |
| 0000464700 | 652E | 736F | 0000 | 0000 | 0000 | 0000 | FFFE | 0008 |
| 0000464720 | 0166 | 1104 | 0000 | 0000 | 0040 | 0000 | 0000 | 0000 |
| 0000464740 | 0000 | 0000 | 332E | 6630 | 6B61 | 0065 | 0000 | 0000 |
| 0000464760 | FFFE | 0008 | 010A | 0000 | 0000 | 0000 | 0030 | 0000 |
| 0000465000 | 0000 | 1114 | 0000 | 0000 | 0000 | 0000 | 22CB | 0000 |
| 0000465020 | 0000 | 0000 | FFFF | 000D | 0108 | 0000 | 0000 | 0000 |
| 0000465040 | 0010 | 0000 | 0000 | 0000 | 0000 | 0000 | 745F | 6D69 |
| 0000465060 | 6F65 | 7475 | 0010 | 0000 | FFFF | 000F | 0108 | 0000 |
| 0000465100 | 0000 | 0000 | 0020 | 0000 | 0000 | 0000 | 0000 | 0000 |
| 0000465120 | 652E | 736F | 0000 | 0000 | 0000 | 0000 | FFFE | 0008 |
| 0000465140 | 0166 | 110C | 0000 | 0000 | 0030 | 0000 | 0000 | 0000 |
| 0000465160 | 0000 | 0000 | 332E | 6631 | 6B61 | 0065 | 0000 | 0000 |
| 0000465200 | FFFE | 0008 | 010A | 0000 | 0000 | 0000 | 00B0 | 0000 |
| 0000465220 | 0000 | 1126 | 0000 | 0000 | 0000 | 0000 | 22DF | 0000 |
| 0000465240 | 0000 | 0000 | FFFF | 0008 | 0108 | 1104 | 0000 | 0000 |
| 0000465260 | 0040 | 0000 | 0000 | 0000 | 0000 | 0000 | 645F | 7269 |
| 0000465300 | 705F | 7261 | 0040 | 0000 | FFFF | 000D | 0108 | 0000 |
| 0000465320 | 0000 | 0000 | 0010 | 0000 | 0000 | 0000 | 0000 | 0000 |
| 0000465340 | 6D5F | 7861 | 785F | 0000 | 0050 | 0000 | FFFF | 0003 |
| 0000465360 | 0108 | 0000 | 0000 | 0000 | 0010 | 0000 | 0000 | 0000 |
| 0000465400 | 0000 | 0000 | 6D5F | 6E69 | 785F | 0000 | 0060 | 0000 |
| 0000465420 | FFFF | 0003 | 0108 | 0000 | 0000 | 0000 | 0010 | 0000 |
| 0000465440 | 0000 | 0000 | 0000 | 0000 | 645F | 0078 | 0000 | 0000 |
| 0000465460 | 0070 | 0000 | FFFF | 0003 | 0108 | 0000 | 0000 | 0000 |
| 0000465500 | 0010 | 0000 | 0000 | 0000 | 0000 | 0000 | 645F | 0079 |
| 0000465520 | 0000 | 0000 | 0080 | 0000 | FFFF | 0003 | 0108 | 0000 |
| 0000465540 | 0000 | 0000 | 0010 | 0000 | 0000 | 0000 | 0000 | 0000 |
| 0000465560 | 745F | 6D69 | 6F65 | 7475 | 0090 | 0000 | FFFF | 000F |

THU MAR 14 17:37:32 1991 GSPMON.4 PAGE 169, LINE 9913

| | | | | | | | | |
|---|---|---|---|---|---|---|---|---|
| 0000465600 | 0108 | 0000 | 0000 | 0000 | 0020 | 0000 | 0000 | 0000 |
| 0000465620 | 0000 | 0000 | 652E | 736F | 0000 | 0000 | 0000 | 0000 |
| 0000465640 | FFFE | 0008 | 0166 | 1114 | 0000 | 0000 | 00B0 | 0000 |
| 0000465660 | 0000 | 0000 | 0000 | 0000 | 332E | 6632 | 6B61 | 0065 |
| 0000465700 | 0000 | 0000 | FFFE | 0008 | 010A | 0000 | 0000 | 0000 |
| 0000465720 | 00A0 | 0000 | 0000 | 1138 | 0000 | 0000 | 725F | 7365 |
| 0000465740 | 6C75 | 0074 | 0000 | 0000 | FFFF | 0003 | 0108 | 0000 |
| 0000465760 | 0000 | 0000 | 0010 | 0000 | 0000 | 0000 | 0000 | 0000 |
| 0000466000 | 725F | 6365 | 0074 | 0000 | 0010 | 0000 | FFFF | 0008 |
| 0000466020 | 0108 | 1104 | 0000 | 0000 | 0040 | 0000 | 0000 | 0000 |
| 0000466040 | 0000 | 000C | 645F | 0078 | 0000 | 0000 | 0050 | 0000 |
| 0000466060 | FFFF | 0003 | 0108 | 0000 | 0000 | 0000 | 0010 | 0000 |
| 0000466100 | 0000 | 0000 | 0000 | 0000 | 645F | 0079 | 0000 | 0000 |
| 0000466120 | 0060 | 0000 | FFFF | 0003 | 0108 | 0000 | 0000 | 0000 |
| 0000466140 | 0010 | 0000 | 0000 | 0000 | 0000 | 0000 | 6D5F | 7861 |
| 0000466160 | 785F | 0000 | 0070 | 0000 | FFFF | 0003 | 0108 | 0000 |
| 0000466200 | 0000 | 0000 | 0010 | 0000 | 0000 | 0000 | 0000 | 0000 |
| 0000466220 | 6D5F | 6E69 | 785F | 0000 | 0080 | 0000 | FFFF | 0003 |
| 0000466240 | 0108 | 0000 | 0000 | 0000 | 0010 | 0000 | 0000 | 0000 |
| 0000466260 | 0000 | 0000 | 0000 | 0000 | 22E9 | 0000 | 0090 | 0000 |
| 0000466300 | FFFF | 0003 | 0108 | 0000 | 0000 | 0000 | 0010 | 0000 |
| 0000466320 | 0000 | 0000 | 0000 | 0000 | 652E | 736F | 0000 | 0000 |
| 0000466340 | 0000 | 0000 | FFFE | 0008 | 0166 | 1126 | 0000 | 0000 |
| 0000466360 | 00A0 | 0000 | 0000 | 0000 | 0000 | 0000 | 662E | 6C69 |
| 0000466400 | 0065 | 0000 | 13BE | 0000 | FFFE | 0000 | 0167 | 7067 |
| 0000466420 | 735F | 6C63 | 632E | 0000 | 0000 | 0000 | 0000 | 0000 |
| 0000466440 | 332E | 6633 | 6B61 | 0065 | 0000 | 0000 | FFFE | 000A |
| 0000466460 | 010F | 0000 | 0000 | 0000 | 0002 | 0000 | 0000 | 1146 |
| 0000466500 | 0000 | 0000 | 0000 | 0000 | 22F4 | 0000 | 0000 | 0000 |
| 0000466520 | FFFF | 000B | 0110 | 0000 | 0000 | 0000 | 0002 | 0000 |
| 0000466540 | 0000 | 0000 | 0000 | 0000 | 435F | 4D4F | 4150 | 4552 |
| 0000466560 | 0001 | 0000 | FFFF | 000B | 0110 | 0000 | 0000 | 0000 |
| 0000466600 | 0002 | 0000 | 0000 | 0000 | 0000 | 0000 | 505F | 4F52 |
| 0000466620 | 4543 | 5353 | 0002 | 0000 | FFFF | 000B | 0110 | 0000 |
| 0000466640 | 0000 | 0000 | 0002 | 0000 | 0000 | 0000 | 0000 | 0000 |
| 0000466660 | 0000 | 0000 | 22FF | 0000 | 0003 | 0000 | FFFF | 000B |
| 0000466700 | 0110 | 0000 | 0000 | 0000 | 0002 | 0000 | 0000 | 0000 |
| 0000466720 | 0000 | 0000 | 652E | 736F | 0000 | 0000 | 0000 | 0000 |
| 0000466740 | FFFE | 000A | 0166 | 113A | 0000 | 0000 | 0002 | 0000 |
| 0000466760 | 0000 | 0000 | 0000 | 0000 | 332E | 6634 | 6B61 | 0065 |
| 0000467000 | 0000 | 0000 | FFFE | 0008 | 010A | 0000 | 0000 | 0000 |
| 0000467020 | 0010 | 0000 | 0000 | 1152 | 0000 | 0000 | 705F | 7869 |
| 0000467040 | 0030 | 0000 | 0000 | 0000 | FFFF | 000E | 0112 | 0000 |
| 0000467060 | 0000 | 0000 | 0004 | 0000 | 0000 | 0000 | 0000 | 0000 |
| 0000467100 | 705F | 7869 | 0031 | 0000 | 0004 | 0000 | FFFF | 000E |
| 0000467120 | 0112 | 0000 | 0000 | 0000 | 0004 | 0000 | 0000 | 0000 |
| 0000467140 | 0000 | 0000 | 705F | 7869 | 0032 | 0000 | 0008 | 0000 |
| 0000467160 | FFFF | 000E | 0112 | 0000 | 0000 | 0000 | 0004 | 0000 |
| 0000467200 | 0000 | 0000 | 0000 | 0000 | 705F | 7869 | 0033 | 0000 |
| 0000467220 | 000C | 0000 | FFFF | 000E | 0112 | 0000 | 0000 | 0000 |
| 0000467240 | 0004 | 0000 | 0000 | 0000 | 0000 | 0000 | 652E | 736F |
| 0000467260 | 0000 | 0000 | 0000 | 0000 | FFFE | 0008 | 0166 | 1146 |
| 0000467300 | 0000 | 0000 | 0010 | 0000 | 0000 | 0000 | 0000 | 0000 |
| 0000467320 | 332E | 6635 | 6B61 | 0065 | 0000 | 0000 | FFFE | 0009 |
| 0000467340 | 010C | 0000 | 0000 | 0000 | 0010 | 0000 | 0000 | 115A |
| 0000467360 | 0000 | 0000 | 705F | 7869 | 0000 | 0000 | 0000 | 0000 |
| 0000467400 | FFFF | 0008 | 010B | 1146 | 0000 | 0000 | 0010 | 0000 |
| 0000467420 | 0000 | 0000 | 0000 | 0000 | 775F | 726F | 0064 | 0000 |
| 0000467440 | 0000 | 0000 | FFFF | 000D | 010B | 0000 | 0000 | 0000 |

THU MAR 14 17:37:32 1991 GSPMON.4 PAGE 170, LINE 9972

| | | | | | | | | |
|---|---|---|---|---|---|---|---|---|
| 0000467460 | 0010 | 0000 | 0000 | 0000 | 0000 | 0000 | 652E | 736F |
| 0000467500 | 0000 | 0000 | 0000 | 0000 | FFFE | 0009 | 0166 | 1152 |
| 0000467520 | 0000 | 0000 | 0010 | 0000 | 0000 | 0000 | 0000 | 0000 |
| 0000467540 | 0000 | 0000 | 230A | 0000 | 8E50 | FFC9 | 0003 | 000A |
| 0000467560 | 0103 | 113A | 0000 | 0000 | 0002 | 0000 | 0000 | 0000 |
| 0000467600 | 0000 | 0000 | 0000 | 0000 | 2320 | 0000 | 8E60 | FFC9 |
| 0000467620 | 0003 | 000A | 0103 | 0EAE | 0000 | 0000 | 0001 | 0000 |
| 0000467640 | 0000 | 0000 | 0000 | 0000 | 0000 | 0000 | 2338 | 0000 |
| 0000467660 | 8E70 | FFC9 | 0003 | 000A | 0103 | 0EAE | 0000 | 0000 |
| 0000467700 | 0001 | 0000 | 0000 | 0000 | 0000 | 0000 | 0000 | 0000 |
| 0000467720 | 234B | 0000 | 8E80 | FFC9 | 0003 | 000D | 0103 | 000D |
| 0000467740 | 0000 | 0000 | 0010 | 0000 | 0000 | 0000 | 0000 | 0000 |
| 0000467760 | 0000 | 0000 | 2360 | 0000 | 8E90 | FFC9 | 0003 | 000D |
| 0000470000 | 0103 | 0000 | 0000 | 0000 | 0010 | 0000 | 0000 | 0000 |
| 0000470020 | 0000 | 0000 | 0000 | 0000 | 236F | 0000 | 8EA0 | FFC9 |
| 0000470040 | 0003 | 000F | 0103 | 0000 | 0000 | 0000 | 0020 | 0000 |
| 0000470060 | 0000 | 0000 | 0000 | 0000 | 0000 | 0000 | 2384 | 0000 |
| 0000470100 | 8EC0 | FFC9 | 0003 | 000D | 0103 | 0000 | 0000 | 0000 |
| 0000470120 | 0010 | 0000 | 0000 | 0000 | 0000 | 0000 | 0000 | 0000 |
| 0000470140 | 2391 | 0000 | 8ED0 | FFC9 | 0003 | 000D | 0103 | 0000 |
| 0000470160 | 0000 | 0000 | 0010 | 0000 | 0000 | 0000 | 0000 | 0000 |
| 0000470200 | 0000 | 0000 | 23A1 | 0000 | 8EE0 | FFC9 | 0003 | 000D |
| 0000470220 | 0103 | 0000 | 0000 | 0000 | 0010 | 0000 | 0000 | 0000 |
| 0000470240 | 0000 | 0000 | 0000 | 0000 | 23B0 | 0000 | 8EF0 | FFC9 |
| 0000470260 | 0003 | 000D | 0103 | 0000 | 0000 | 0000 | 0010 | 0000 |
| 0000470300 | 0000 | 0000 | 0000 | 0000 | 0000 | 0000 | 23BF | 0000 |
| 0000470320 | 8F00 | FFC9 | 0003 | 000D | 0103 | 0000 | 0000 | 0000 |
| 0000470340 | 0010 | 0000 | 0000 | 0000 | 0000 | 0000 | 0000 | 0000 |
| 0000470360 | 23CD | 0000 | 8F10 | FFC9 | 0003 | 000D | 0103 | 0000 |
| 0000470400 | 0000 | 0000 | 0010 | 0000 | 0000 | 0000 | 0000 | 0000 |
| 0000470420 | 0000 | 0000 | 23DC | 000D | 8F20 | FFC9 | 0003 | 001F |
| 0000470440 | 0103 | 0000 | 0000 | 0000 | 0020 | 0000 | 0000 | 0000 |
| 0000470460 | 0000 | 0000 | 0000 | 0000 | 23ED | 0000 | 8F40 | FFC9 |
| 0000470500 | 0003 | 000A | 0103 | 0EAE | 0000 | 0000 | 0001 | 0000 |
| 0000470520 | 0000 | 0000 | 0000 | 0000 | 0000 | 0000 | 23FA | 0000 |
| 0000470540 | 8F50 | FFC9 | 0003 | 000D | 0103 | 0000 | 0000 | 0000 |
| 0000470560 | 0010 | 0000 | 0000 | 0000 | 0000 | 0000 | 0000 | 0000 |
| 0000470600 | 2410 | 0000 | 8F60 | FFC9 | 0003 | 000D | 0103 | 0000 |
| 0000470620 | 0000 | 0000 | 0010 | 0000 | 0000 | 0000 | 0000 | 0000 |
| 0000470640 | 0000 | 0000 | 2424 | 0000 | 8F70 | FFC9 | 0003 | 0003 |
| 0000470660 | 0103 | 0000 | 0000 | 0000 | 0010 | 0000 | 0000 | 0000 |
| 0000470700 | 0000 | 0000 | 0000 | 0000 | 242F | 0000 | 8F80 | FFC9 |
| 0000470720 | 0003 | 0004 | 0103 | 0000 | 0000 | 0000 | 0020 | 0000 |
| 0000470740 | 0000 | 0000 | 0000 | 0000 | 0000 | 0000 | 243E | 0000 |
| 0000470760 | 8FA0 | FFC9 | 0003 | 0008 | 0103 | 1102 | 0000 | 0000 |
| 0000471000 | 0040 | 0000 | 0000 | 0000 | 0000 | 0000 | 0000 | 0000 |
| 0000471020 | 2449 | 000D | 8FE0 | FFC9 | 0003 | 0008 | 0103 | 1102 |
| 0000471040 | 0000 | 0000 | 0040 | 0000 | 0000 | 0000 | 0000 | 0000 |
| 0000471060 | 0000 | 0000 | 2456 | 0000 | 9020 | FFC9 | 0003 | 000D |
| 0000471100 | 0103 | 0000 | 0000 | 0000 | 0010 | 0000 | 0000 | 0000 |
| 0000471120 | 0000 | 0000 | 675F | 7465 | 6E5F | 006F | 9030 | FFC9 |
| 0000471140 | 0003 | 0003 | 0103 | 0000 | 0000 | 0000 | 0010 | 0000 |
| 0000471160 | 0000 | 0000 | 0000 | 0000 | 695F | 6F63 | 5F6E | 7864 |
| 0000471200 | 9040 | FFC9 | 0003 | 0003 | 0103 | 0000 | 0000 | 0000 |
| 0000471220 | 0010 | 0000 | 0000 | 0000 | 0000 | 0000 | 695F | 6F63 |
| 0000471240 | 5F6E | 7964 | 9050 | FFC9 | 0003 | 0003 | 0103 | 0000 |
| 0000471260 | 0000 | 0000 | 0010 | 0000 | 0000 | 0000 | 0000 | 0000 |
| 0000471300 | 6D5F | 7861 | 785F | 0000 | 9060 | FFC9 | 0003 | 0003 |
| 0000471320 | 0103 | 0000 | 0000 | 0000 | 0010 | 0000 | 0000 | 0000 |

THU MAR 14 17:37:32 1991 GSPMON.4 PAGE 171, LINE 10031

| | | | | | | | | |
|---|---|---|---|---|---|---|---|---|
| 0000471340 | 0000 | 0000 | 6D5F | 6E69 | 785F | 0000 | 9070 | FFC9 |
| 0000471360 | 0003 | 0003 | 0103 | 0000 | 0000 | 0000 | 0010 | 0000 |
| 0000471400 | 0000 | 0000 | 0000 | 0000 | 0000 | 0000 | 2460 | 0000 |
| 0000471420 | 9080 | FFC9 | 0003 | 0003 | 0103 | 0000 | 0000 | 0000 |
| 0000471440 | 0010 | 0000 | 0000 | 0000 | 0000 | 0000 | 0000 | 0000 |
| 0000471460 | 2477 | 0000 | 9090 | FFC9 | 0003 | 0003 | 0103 | 0000 |
| 0000471500 | 0000 | 0000 | 0010 | 0000 | 0000 | 0000 | 0000 | 0000 |
| 0000471520 | 0000 | 0000 | 248C | 0000 | 90A0 | FFC9 | 0003 | 000D |
| 0000471540 | 0103 | 0000 | 0000 | 0000 | 0010 | 0000 | 0000 | 0000 |
| 0000471560 | 0000 | 0000 | 0000 | 0000 | 2496 | 0000 | 90B0 | FFC9 |
| 0000471600 | 0003 | 000D | 0103 | 0000 | 0000 | 0000 | 0010 | 0000 |
| 0000471620 | 00G0 | 0000 | 0000 | 0000 | 725F | 6365 | 7374 | 0000 |
| 0000471640 | 90C0 | FFC9 | 0003 | 0038 | 0103 | 1102 | 0000 | 0000 |
| 0000471660 | 0280 | 000A | 0000 | 0000 | 0000 | 0000 | 695F | 6F63 |
| 0000471700 | 5F6E | 6F6E | 9340 | FFC9 | 0003 | 0003 | 0103 | 0000 |
| 0000471720 | 0000 | 0000 | 0010 | 0000 | 0000 | 0000 | 0000 | 0000 |
| 0000471740 | 725F | 6365 | 5F74 | 6B6F | 9350 | FFC9 | 0003 | 003A |
| 0000471760 | 0103 | 0EAE | 0000 | 0000 | 000A | 000A | 0000 | 0000 |
| 0000472000 | 0000 | 0000 | 0000 | 0000 | 24A0 | 0000 | 9360 | FFC9 |
| 0000472020 | 0003 | 0038 | 0103 | 1102 | 0000 | 0000 | 0280 | 000A |
| 0000472040 | 0000 | 0000 | 0000 | 0000 | 0000 | 0000 | 24AC | 0000 |
| 0000472060 | 95E0 | FFC9 | 0003 | 0003 | 0103 | 0000 | 0000 | 0000 |
| 0000472100 | 0010 | 0000 | 0000 | 0000 | 0000 | 0000 | 0000 | 0000 |
| 0000472120 | 24BA | 0000 | 95F0 | FFC9 | 0003 | 003A | 0103 | 0EAE |
| 0000472140 | 0000 | 0000 | 000A | 000A | 0000 | 0000 | 0000 | 0000 |
| 0000472160 | 0000 | 0000 | 24C8 | 0000 | 9600 | FFC9 | 0003 | 0003 |
| 0000472200 | 0103 | 0000 | 0000 | 0000 | 0010 | 0000 | 0000 | 0000 |
| 0000472220 | 0000 | 0000 | 6F5F | 6676 | 006C | 0000 | 9610 | FFC9 |
| 0000472240 | 0003 | 0033 | 0103 | 0000 | 0000 | 0000 | 00A0 | 000A |
| 0000472260 | 0000 | 0000 | 0000 | 0000 | 0000 | 0000 | 24D8 | 0000 |
| 0000472300 | B920 | FFC2 | 0001 | 0020 | 0103 | 0000 | 0000 | 09A0 |
| 0000472320 | 0000 | 02C8 | 0001 | 11AC | 0000 | 0003 | 622E | 0066 |
| 0000472340 | 0000 | 0000 | B920 | FFC2 | 0001 | 0000 | 0165 | 0000 |
| 0000472360 | 0000 | 015C | 0000 | 0000 | 0000 | 0312 | 0000 | 0000 |
| 0000472400 | 652E | 0066 | 0000 | 0000 | C2C0 | FFC2 | 0001 | 0000 |
| 0000472420 | 0165 | 0000 | 0000 | 018F | 0000 | 0000 | 0000 | 0000 |
| 0000472440 | 0000 | 0000 | 0000 | 0000 | 24EC | 0000 | C2C0 | FFC2 |
| 0000472460 | 0001 | 0020 | 0103 | 0000 | 0000 | 0E80 | 0000 | 0358 |
| 0000472500 | 0001 | 11B2 | 0000 | 0003 | 622E | 0066 | 0000 | 0000 |
| 0000472520 | C2C0 | FFC2 | 0001 | 0000 | 0165 | 0000 | 0000 | 0195 |
| 0000472540 | 0000 | 0000 | 0000 | 0318 | 0000 | 0000 | 652E | 0066 |
| 0000472560 | 0000 | 0000 | D140 | FFC2 | 0001 | 0000 | 0165 | 0000 |
| 0000472600 | 0000 | 01E7 | 0000 | 0000 | 0000 | 0000 | 0000 | 0000 |
| 0000472620 | 0000 | 0000 | 2500 | 0000 | D140 | FFC2 | 0001 | 0020 |
| 0000472640 | 0103 | 0000 | 0000 | 2150 | 0000 | 045A | 0001 | 11C4 |
| 0000472660 | 0000 | 0004 | 622E | 0066 | 0000 | 0000 | D140 | FFC2 |
| 0000472700 | 0001 | 0000 | 0165 | 0000 | 0000 | 01ED | 0000 | 0000 |
| 0000472720 | 0000 | 032A | 0000 | 0000 | 725F | 6365 | 5F74 | 6F6E |
| 0000472740 | 0000 | 0000 | FFFF | 0003 | 0101 | 0000 | 0000 | 0000 |
| 0000472760 | 0010 | 0000 | 0000 | 0000 | 0000 | 0000 | 725F | 6365 |
| 0000473000 | 0074 | 0000 | 0010 | 0000 | FFFF | 0008 | 0101 | 1102 |
| 0000473020 | 0000 | 0000 | 0040 | 0000 | 0000 | 0000 | 0000 | 0000 |
| 0000473040 | 675F | 5F70 | 6164 | 6174 | 96B0 | FFC9 | 0003 | 0008 |
| 0000473060 | 0103 | 1124 | 0000 | 0000 | 00A0 | 0000 | 0000 | 0000 |
| 0000473100 | 0000 | 0000 | 645F | 0078 | 0000 | 0000 | 0050 | 0000 |
| 0000473120 | FFFF | 0003 | 0101 | 0000 | 0000 | 0000 | 0010 | 0000 |
| 0000473140 | 0000 | 0000 | 0000 | 0000 | 645F | 0079 | 0000 | 0000 |
| 0000473160 | 0060 | 0000 | FFFF | 0003 | 0101 | 0000 | 0000 | 0000 |
| 0000473200 | 0010 | 0000 | 0000 | 0000 | 0000 | 0000 | 725F | 7365 |

THU MAR 14 17:37:32 1991 GSPMON.4 PAGE 172, LINE 10090

| | | | | | | | | |
|---|---|---|---|---|---|---|---|---|
| 0000473220 | 0000 | 0000 | 0070 | 0000 | FFFF | 0004 | 0101 | 0000 |
| 0000473240 | 0000 | 0000 | 0020 | 0000 | 0000 | 0000 | 0000 | 0000 |
| 0000473260 | 652E | 0066 | 0000 | 0000 | F290 | FFC2 | 0001 | 0000 |
| 0000473300 | 0165 | 0000 | 0000 | 0283 | 0000 | 0000 | 0000 | 0000 |
| 0000473320 | 0000 | 0000 | 0000 | 0000 | 2512 | 0000 | F290 | FFC2 |
| 0000473340 | 0001 | 0020 | 0103 | 0000 | 0000 | 01E0 | 0000 | 063A |
| 0000473360 | 0001 | 11CC | 0000 | 0003 | 622E | 0066 | 0000 | 0000 |
| 0000473400 | F290 | FFC2 | 0001 | 0000 | 0165 | 0000 | 0000 | 0288 |
| 0000473420 | 0000 | 0000 | 0000 | 0332 | 0000 | 0000 | 675F | 5F70 |
| 0000473440 | 6164 | 6174 | FFE0 | FFFF | FFFF | 0018 | 0109 | 1124 |
| 0000473460 | 0000 | 0000 | 0020 | 0000 | 0000 | 0000 | 0000 | 0000 |
| 0000473500 | 652E | 0066 | 0000 | 0000 | F470 | FFC2 | 0001 | 0000 |
| 0000473520 | 0165 | 0000 | 0000 | 0294 | 0000 | 0000 | 0000 | 0000 |
| 0000473540 | 0000 | 0000 | 0000 | 0000 | 2526 | 0000 | F470 | FFC2 |
| 0000473560 | 0001 | 002A | 0103 | 0EAE | 0000 | 0600 | 0000 | 0658 |
| 0000473600 | 0001 | 11DA | 0000 | 0003 | 622E | 0066 | 0000 | 0000 |
| 0000473620 | F470 | FFC2 | 0001 | 0000 | 0165 | 0000 | 0000 | 02A2 |
| 0000473640 | 0000 | 0000 | 0000 | 0340 | 0000 | 0000 | 655F | 7272 |
| 0000473660 | 0000 | 0000 | 0000 | 0000 | FFFF | 000F | 0101 | 0000 |
| 0000473700 | 0000 | 0000 | 0020 | 0000 | 0000 | 0000 | 0000 | 0000 |
| 0000473720 | 0000 | 0000 | 2537 | 0000 | 0020 | 0000 | FFFF | 000F |
| 0000473740 | 0101 | 0000 | 0000 | 0000 | 0020 | 0000 | 0000 | 0000 |
| 0000473760 | 0000 | 0000 | 0000 | 0000 | 254D | 0000 | 0040 | 0000 |
| 0000474000 | FFFF | 000F | 0101 | 0000 | 0000 | 0000 | 0020 | 0000 |
| 0000474020 | 0000 | 0000 | 0000 | 0000 | 0000 | 0000 | 2561 | 0000 |
| 0000474040 | 0060 | 0000 | FFFF | 000A | 0101 | 0EAE | 0000 | 0000 |
| 0000474060 | 0001 | 0000 | 0000 | 0000 | 0000 | 0000 | 652E | 0066 |
| 0000474100 | 0000 | 0000 | FA70 | FFC2 | 0001 | 0000 | 0165 | 0000 |
| 0000474120 | 0000 | 02BF | 0000 | 0000 | 0000 | 0000 | 0000 | 0000 |
| 0000474140 | 0000 | 0000 | 256D | 0000 | FA70 | FFC2 | 0001 | 0024 |
| 0000474160 | 0103 | 0000 | 0000 | 2CCD | 0000 | 06AC | 0001 | 121C |
| 0000474200 | 0000 | 0004 | 622E | 0066 | 0000 | 0000 | FA70 | FFC2 |
| 0000474220 | 0001 | 0000 | 0165 | 0000 | 0000 | 02D1 | 0000 | 0000 |
| 0000474240 | 0000 | 0382 | 0000 | 0000 | 705F | 736F | 0078 | 0000 |
| 0000474260 | FFE0 | FFFF | FFFF | 000D | 0109 | 0000 | 0000 | 0000 |
| 0000474300 | 0010 | 0000 | 0000 | 0000 | 0000 | 0000 | 705F | 736F |
| 0000474320 | 0079 | 0000 | FFC0 | FFFF | FFFF | 000D | 0109 | 0000 |
| 0000474340 | 0000 | 0000 | 0010 | 0000 | 0000 | 0000 | 0000 | 0000 |
| 0000474360 | 635F | 0078 | 0000 | 0000 | FFA0 | FFFF | FFFF | 000D |
| 0000474400 | 0109 | 0000 | 0000 | 0000 | 0010 | 0000 | 0000 | 0000 |
| 0000474420 | 0000 | 0000 | 635F | 0079 | 0000 | 0000 | FF80 | FFFF |
| 0000474440 | FFFF | 000D | 0109 | 0000 | 0000 | 0000 | 0010 | 0000 |
| 0000474460 | 0000 | 0000 | 0000 | 0000 | 6D5F | 7861 | 785F | 0000 |
| 0000474500 | FF60 | FFFF | FFFF | 0003 | 0109 | 0000 | 0000 | 0000 |
| 0000474520 | 0010 | 0000 | 0000 | 0000 | 0000 | 0000 | 6D5F | 6E69 |
| 0000474540 | 785F | 0000 | FF40 | FFFF | FFFF | 0003 | 0109 | 0000 |
| 0000474560 | 0000 | 0000 | 0010 | 0000 | 0000 | 0000 | 0000 | 0000 |
| 0000474600 | 645F | 7269 | 0000 | 0000 | FF20 | FFFF | FFFF | 000D |
| 0000474620 | 0109 | 0000 | 0000 | 0000 | 0010 | 0000 | 0000 | 0000 |
| 0000474640 | 0000 | 0000 | 645F | 6C65 | 0078 | 0000 | FF00 | FFFF |
| 0000474660 | FFFF | 001D | 0109 | 0000 | 0000 | 0000 | 0020 | 0000 |
| 0000474700 | 0000 | 0000 | 0000 | 0000 | 645F | 6C65 | 0079 | 0000 |
| 0000474720 | FEE0 | FFFF | FFFF | 001D | 0109 | 0000 | 0000 | 0000 |
| 0000474740 | 0020 | 0000 | 0000 | 0000 | 0000 | 0000 | 665F | 756F |
| 0000474760 | 646E | 0000 | 0000 | 0000 | FFFF | 000A | 0101 | 0EAE |
| 0000475000 | 0000 | 0000 | 0001 | 0000 | 0000 | 0000 | 0000 | 0000 |
| 0000475020 | 655F | 7272 | 0000 | 0000 | 0010 | 0000 | FFFF | 000F |
| 0000475040 | 0101 | 0000 | 0000 | 0000 | 0020 | 0000 | 0000 | 0000 |
| 0000475060 | 0000 | 0000 | 695F | 0000 | 0000 | 0000 | 0030 | 0000 |

THU MAR 14 17:37:32 1991 GSPMON.4 PAGE 173, LINE 10149

| | | | | | | | | |
|---|---|---|---|---|---|---|---|---|
| 0000475100 | FFFF | 0003 | 0101 | 0000 | 0000 | 0000 | 0010 | 0000 |
| 0000475120 | 0000 | 0000 | 0000 | 0000 | 725F | 6365 | 5F74 | 6F6E |
| 0000475140 | 0040 | 0000 | FFFF | 0003 | 0101 | 0000 | 0000 | 0000 |
| 0000475160 | 0010 | 0000 | 0000 | 0000 | 0000 | 0000 | 0000 | 0000 |
| 0000475200 | 257A | 0000 | 0050 | 0000 | FFFF | 0003 | 0101 | 0000 |
| 0000475220 | 0000 | 0000 | 0010 | 0000 | 0000 | 0000 | 0000 | 0000 |
| 0000475240 | 0000 | 0000 | 2585 | 0000 | 0060 | 0000 | FFFF | 0003 |
| 0000475260 | 0101 | 0000 | 0000 | 0000 | 0010 | 0000 | 0000 | 0000 |
| 0000475300 | 0000 | 0000 | 645F | 0078 | 0000 | 0000 | 0070 | 0000 |
| 0000475320 | FFFF | 0003 | 0101 | 0000 | 0000 | 0000 | 0010 | 0000 |
| 0000475340 | 0000 | 0000 | 0000 | 0000 | 645F | 0079 | 0000 | 0000 |
| 0000475360 | 0080 | 0000 | FFFF | 0003 | 0101 | 0000 | 0000 | 0000 |
| 0000475400 | 0010 | 0000 | 0000 | 0000 | 0000 | 0000 | 725F | 7365 |
| 0000475420 | 0000 | 0000 | 0090 | 0000 | FFFF | 0003 | 0101 | 0000 |
| 0000475440 | 0000 | 0000 | 0010 | 0000 | 0000 | 0000 | 0000 | 0000 |
| 0000475460 | 0000 | 0000 | 2590 | 0000 | 00A0 | 0000 | FFFF | 000D |
| 0000475500 | 0101 | 0000 | 0000 | 0000 | 0010 | 0000 | 0000 | 0000 |
| 0000475520 | 0000 | 0000 | 0000 | 0000 | 259B | 0000 | 00B0 | 0000 |
| 0000475540 | FFFF | 000D | 0101 | 0000 | 0000 | 0000 | 0010 | 0000 |
| 0000475560 | 0000 | 0000 | 0000 | 0000 | 0000 | 0000 | 25A6 | 0000 |
| 0000475600 | 00C0 | 0000 | FFFF | 000D | 0101 | 0000 | 0000 | 0000 |
| 0000475620 | 0010 | 0000 | 0000 | 0000 | 0000 | 0000 | 0000 | 0000 |
| 0000475640 | 25B1 | 0000 | 00D0 | 0000 | FFFF | 000D | 0101 | 0000 |
| 0000475660 | 0000 | 0000 | 0010 | 0000 | 0000 | 0000 | 0000 | 0000 |
| 0000475700 | 0000 | 0000 | 25BC | 0000 | 00E0 | 0000 | FFFF | 000D |
| 0000475720 | 0101 | 0000 | 0000 | 0000 | 0010 | 0000 | 0000 | 0000 |
| 0000475740 | 0000 | 0000 | 0000 | 0000 | 25CA | 0000 | 00F0 | 0000 |
| 0000475760 | FFFF | 000D | 0101 | 0000 | 0000 | 0000 | 0010 | 0000 |
| 0000476000 | 0000 | 0000 | 0000 | 0000 | 0000 | 0000 | 25D8 | 0000 |
| 0000476020 | 0100 | 0000 | FFFF | 000D | 0101 | 0000 | 0000 | 0000 |
| 0000476040 | 0010 | 0000 | 0000 | 0000 | 0000 | 0000 | 0000 | 0000 |
| 0000476060 | 25E3 | 0000 | 0110 | 0000 | FFFF | 000D | 0101 | 0000 |
| 0000476100 | 0000 | 0000 | 0010 | 0000 | 0000 | 0000 | 0000 | 0000 |
| 0000476120 | 0000 | 0000 | 25EE | 0000 | 0120 | 0000 | FFFF | 000D |
| 0000476140 | 0101 | 0000 | 0000 | 0000 | 0010 | 0000 | 0000 | 0000 |
| 0000476160 | 0000 | 0000 | 0000 | 0000 | 25F9 | 0000 | 0130 | 0000 |
| 0000476200 | FFFF | 000D | 0101 | 0000 | 0000 | 0000 | 0010 | 0000 |
| 0000476220 | 0000 | 0000 | 0000 | 0000 | 0000 | 0000 | 2604 | 0000 |
| 0000476240 | 0140 | 0000 | FFFF | 000D | 0101 | 0000 | 0000 | 0000 |
| 0000476260 | 0010 | 0000 | 0000 | 0000 | 0000 | 0000 | 0000 | 0000 |
| 0000476300 | 2612 | 0000 | 0150 | 0000 | FFFF | 000D | 0101 | 0000 |
| 0000476320 | 0000 | 0000 | 0010 | 0000 | 0000 | 0000 | 0000 | 0000 |
| 0000476340 | 652E | 0066 | 0000 | 0000 | 2730 | FFC3 | 0001 | 0000 |
| 0000476360 | 0165 | 0000 | 0000 | 03B4 | 0000 | 0000 | 0000 | 0000 |
| 0000476400 | 0000 | 0000 | 0000 | 0000 | 2620 | 0000 | 2730 | FFC3 |
| 0000476420 | 0001 | 0024 | 0103 | 0000 | 0000 | 34B0 | 0000 | 08DA |
| 0000476440 | 0001 | 125C | 0000 | 0004 | 622E | 0066 | 0000 | 0000 |
| 0000476460 | 2730 | FFC3 | 0001 | 0000 | 0165 | 0000 | 0000 | 03CE |
| 0000476500 | 0000 | 0000 | 0000 | 03C2 | 0000 | 0000 | 645F | 7269 |
| 0000476520 | 0000 | 0000 | FFE0 | FFFF | FFFF | 000D | 0109 | 0000 |
| 0000476540 | 0000 | 0000 | 0010 | 0000 | 0000 | 0000 | 0000 | 0003 |
| 0000476560 | 725F | 6365 | 0074 | 0000 | FFC0 | FFFF | FFFF | 0018 |
| 0000476600 | 0109 | 1102 | 0000 | 0000 | 0020 | 0000 | 0000 | 0000 |
| 0000476620 | 0000 | 0000 | 6D5F | 7861 | 785F | 0000 | FFA0 | FFFF |
| 0000476640 | FFFF | 0013 | 0109 | 0000 | 0000 | 0000 | 0020 | 0000 |
| 0000476660 | 0000 | 0000 | 0000 | 0000 | 6D5F | 6E69 | 785F | 0000 |
| 0000476700 | FF80 | FFFF | FFFF | 0013 | 0109 | 0000 | 0000 | 0000 |
| 0000476720 | 0020 | 0000 | 0000 | 0000 | 0000 | 0000 | 695F | 0000 |
| 0000476740 | 0000 | 0000 | 0000 | 0000 | FFFF | 0003 | 0101 | 0000 |

THU MAR 14 17:37:32 1991 GSPMON.4 PAGE 174, LINE 10208

| | | | | | | | | |
|---|---|---|---|---|---|---|---|---|
| 0000476760 | 0000 | 0000 | 0010 | 0000 | 0000 | 0000 | 0000 | 0000 |
| 0000477000 | 6A5F | 0000 | 0000 | 0000 | 0010 | 0000 | FFFF | 0003 |
| 0000477020 | 0101 | 0000 | 0000 | 0000 | 0010 | 0000 | 0000 | 0000 |
| 0000477040 | 0000 | 0000 | 645F | 0079 | 0000 | 0000 | 0020 | 0000 |
| 0000477060 | FFFF | 0003 | 0101 | 0000 | 0000 | 0000 | 0010 | 0000 |
| 0000477100 | 0000 | 0000 | 0000 | 0000 | 655F | 7272 | 0000 | 0000 |
| 0000477120 | 0030 | 0000 | FFFF | 000F | 0101 | 0000 | 0000 | 0000 |
| 0000477140 | 0020 | 0000 | 0000 | 0000 | 0000 | 0000 | 675F | 7061 |
| 0000477160 | 0079 | 0000 | 0050 | 0000 | FFFF | 0003 | 0101 | 0000 |
| 0000477200 | 0000 | 0000 | 0010 | 0000 | 0000 | 0000 | 0000 | 0000 |
| 0000477220 | 635F | 6568 | 6B63 | 0079 | 0060 | 0000 | FFFF | 0003 |
| 0000477240 | 0101 | 0000 | 0000 | 0000 | 0010 | 0000 | 0000 | 0000 |
| 0000477260 | 0000 | 0000 | 665F | 7269 | 7473 | 0079 | 0070 | 0000 |
| 0000477300 | FFFF | 0003 | 0101 | 0000 | 0000 | 0000 | 0010 | 0000 |
| 0000477320 | 0000 | 0000 | 0000 | 0000 | 6C5F | 7361 | 7974 | 0000 |
| 0000477340 | 0080 | 0000 | FFFF | 0003 | 0101 | 0000 | 0000 | 0000 |
| 0000477360 | 0010 | 0000 | 0000 | 0000 | 0000 | 0000 | 6D5F | 6469 |
| 0000477400 | 0079 | 0000 | 0090 | 0000 | FFFF | 0003 | 0101 | 0000 |
| 0000477420 | 0000 | 0000 | 0010 | 0000 | 0000 | 0000 | 0000 | 0000 |
| 0000477440 | 6D5F | 6E69 | 0079 | 0000 | 00A0 | 0000 | FFFF | 0003 |
| 0000477460 | 0101 | 0000 | 0000 | 0000 | 0010 | 0000 | 0000 | 0000 |
| 0000477500 | 0000 | 0000 | 6D5F | 7861 | 0079 | 0000 | 00B0 | 0000 |
| 0000477520 | FFFF | 0003 | 0101 | 0000 | 0000 | 0000 | 0010 | 0000 |
| 0000477540 | 0000 | 0000 | 0000 | 0000 | 665F | 7269 | 7473 | 0078 |
| 0000477560 | 00C0 | 0000 | FFFF | 0003 | 0101 | 0000 | 0000 | 0000 |
| 0000477600 | 0010 | 0000 | 0000 | 0000 | 0000 | 0000 | 6C5F | 7361 |
| 0000477620 | 7874 | 0000 | 00D0 | 0000 | FFFF | 0003 | 0101 | 0000 |
| 0000477640 | 0000 | 0000 | 0010 | 0000 | 0000 | 0000 | 0000 | 0000 |
| 0000477660 | 0000 | 0000 | 262B | 0000 | 00E0 | 0000 | FFFF | 0003 |
| 0000477700 | 0101 | 0000 | 0000 | 0000 | 0010 | 0000 | 0000 | 0000 |
| 0000477720 | 0000 | 0000 | 745F | 6D65 | 7870 | 0000 | 00F0 | 0000 |
| 0000477740 | FFFF | 0003 | 0101 | 0000 | 0000 | 0000 | 0010 | 0000 |
| 0000477760 | 0000 | 0000 | 0000 | 0000 | 0000 | 0000 | 2637 | 0000 |
| 0000500000 | 0100 | 0000 | FFFF | 0003 | 0101 | 0000 | 0000 | 0000 |
| 0000500020 | 0010 | 0000 | 0000 | 0000 | 0000 | 0000 | 0000 | 0000 |
| 0000500040 | 2644 | 0000 | 0110 | 0000 | FFFF | 0003 | 0101 | 0000 |
| 0000500060 | 0000 | 0000 | 0010 | 0000 | 0000 | 0000 | 0000 | 0000 |
| 0000500100 | 0000 | 0000 | 2650 | 0000 | 0120 | 0000 | FFFF | 0003 |
| 0000500120 | 0101 | 0000 | 0000 | 0000 | 0010 | 0000 | 0000 | 0000 |
| 0000500140 | 0000 | 0000 | 0000 | 0000 | 265E | 0000 | 0130 | 0000 |
| 0000500160 | FFFF | 0003 | 0101 | 0000 | 0000 | 0000 | 0010 | 0000 |
| 0000500200 | 0000 | 0000 | 0000 | 0000 | 0000 | 0000 | 266B | 0000 |
| 0000500220 | 0140 | 0000 | FFFF | 000A | 0101 | 0EAE | 0000 | 0000 |
| 0000500240 | 0001 | 0000 | 0000 | 0000 | 0000 | 0000 | 725F | 7365 |
| 0000500260 | 0000 | 0000 | 0150 | 0000 | FFFF | 0003 | 0101 | 0000 |
| 0000500300 | 0000 | 0000 | 0010 | 0000 | 0000 | 0000 | 0000 | 0000 |
| 0000500320 | 6D5F | 6E69 | 635F | 6C6F | 0160 | 0000 | FFFF | 0003 |
| 0000500340 | 0101 | 0000 | 0000 | 0000 | 0010 | 0000 | 0000 | 0000 |
| 0000500360 | 0000 | 0000 | 6D5F | 7861 | 635F | 6C6F | 0170 | 0000 |
| 0000500400 | FFFF | 0003 | 0101 | 0000 | 0000 | 0000 | 0010 | 0000 |
| 0000500420 | 0000 | 0000 | 0000 | 0000 | 0000 | 0000 | 2677 | 0000 |
| 0000500440 | 0180 | 0000 | FFFF | 0003 | 0101 | 0000 | 0000 | 0000 |
| 0000500460 | 0010 | 0000 | 0000 | 0000 | 0000 | 0000 | 0000 | 0000 |
| 0000500500 | 2687 | 0000 | 0190 | 0000 | FFFF | 0003 | 0101 | 0000 |
| 0000500520 | 0000 | 0000 | 0010 | 0000 | 0000 | 0000 | 0000 | 0000 |
| 0000500540 | 652E | 0066 | 0000 | 0000 | 5BE0 | FFC3 | 0001 | 0000 |
| 0000500560 | 0165 | 0000 | 0000 | 04A0 | 0000 | 0000 | 0000 | 0000 |
| 0000500600 | 0000 | 0000 | 0000 | 0000 | 2697 | 0000 | 5BE0 | FFC3 |
| 0000500620 | 0001 | 0024 | 0103 | 0000 | 0000 | 45D0 | 0000 | 0B2C |

THU MAR 14 17:37:32 1991 GSPMON.4 PAGE 175, LINE 10267

| | | | | | | | | |
|---|---|---|---|---|---|---|---|---|
| 0000500640 | 0001 | 12AA | 0000 | 0005 | 622E | 0066 | 0000 | 0000 |
| 0000500660 | 5BE0 | FFC3 | 0001 | 0000 | 0165 | 0000 | 0000 | 04B9 |
| 0000500700 | 0000 | 0000 | 0000 | 0410 | 0000 | 0000 | 0000 | 0000 |
| 0000500720 | 26A1 | 0000 | FFE0 | FFFF | FFFF | 0000 | 0000 | 0000 |
| 0000500740 | 0000 | 0000 | 0020 | 0000 | 0000 | 0018 | 0109 | 1102 |
| 0000500760 | 725F | 6365 | 0074 | 0000 | FFC0 | 0000 | 0000 | 0000 |
| 0000501000 | 0109 | 1102 | 0000 | 0000 | 0020 | FFFF | FFFF | 0018 |
| 0000501020 | 0000 | 0000 | 6D5F | 7861 | 785F | 0000 | 0000 | 0000 |
| 0000501040 | FFFF | 0003 | 0109 | 0000 | 0000 | 0000 | FFA0 | FFFF |
| 0000501060 | 0000 | 0000 | 0000 | 0000 | 6D5F | 0000 | 0010 | 0000 |
| 0000501100 | FF80 | FFFF | FFFF | 0003 | 0109 | 6E69 | 785F | 0000 |
| 0000501120 | 0010 | 0000 | 0000 | 0000 | 0000 | 0000 | 0000 | 0000 |
| 0000501140 | 6574 | 0070 | FF60 | FFFF | FFFF | 0000 | 785F | 735F |
| 0000501160 | 0000 | 0000 | 0010 | 0000 | 0000 | 0003 | 0109 | 0000 |
| 0000501200 | 795F | 735F | 6574 | 0070 | FF40 | 0000 | 0000 | 0000 |
| 0000501220 | 0109 | 0000 | 0000 | 0000 | 0010 | FFFF | FF | 0003 |
| 0000501240 | 0000 | 0000 | 6E5F | 006F | 0000 | 0000 | 0000 | 0000 |
| 0000501260 | FFFF | 0013 | 0109 | 0000 | 0000 | 0000 | FF20 | FFFF |
| 0000501300 | 0000 | 0000 | 0000 | 0000 | 695F | 0000 | 0020 | 0000 |
| 0000501320 | 0000 | 0000 | FFFF | 0003 | 0101 | 0000 | 0000 | 0000 |
| 0000501340 | 0010 | 0000 | 0000 | 0000 | 0000 | 0000 | 0000 | 0000 |
| 0000501360 | 0000 | 0000 | 0010 | 0000 | FFFF | 0000 | 6A5F | 0000 |
| 0000501400 | 0000 | 0000 | 0010 | 0000 | 0000 | 0003 | 0101 | 0000 |
| 0000501420 | 655F | 7272 | 0000 | 0000 | 0020 | 0000 | 0000 | 0000 |
| 0000501440 | 0101 | 0000 | 0000 | 0000 | 0020 | 0000 | FFFF | 000F |
| 0000501460 | 0000 | 0000 | 725F | 7365 | 0000 | 0000 | 0000 | 0000 |
| 0000501500 | FFFF | 0003 | 0101 | 0000 | 0000 | 0000 | 0040 | 0000 |
| 0000501520 | 0000 | 0000 | 0000 | 0000 | 635F | 0000 | 0010 | 0000 |
| 0000501540 | 9750 | FFC9 | 0003 | 00F3 | 0103 | 726F | 6572 | 7463 |
| 0000501560 | 0090 | 0003 | 0003 | 0000 | 0000 | 0000 | 0000 | 0000 |
| 0000501600 | 646E | 0000 | 0050 | 0000 | FFFF | 0000 | 695F | 695F |
| 0000501620 | 0000 | 0000 | 0010 | 0000 | 0000 | 0003 | 0101 | 0000 |
| 0000501640 | 6A5F | 695F | 646E | 0000 | 0060 | 0000 | 0000 | 0000 |
| 0000501660 | 0101 | 0000 | 0000 | 0000 | 0010 | 0000 | FFFF | 0003 |
| 0000501700 | 0000 | 0000 | 0000 | 0000 | 26AC | 0000 | 0000 | 0000 |
| 0000501720 | FFFF | 0003 | 0101 | 0000 | 0000 | 0000 | 0070 | 0000 |
| 0000501740 | 0000 | 0000 | 0000 | 0000 | 0000 | 0000 | 0010 | 0000 |
| 0000501760 | 0080 | 0000 | FFFF | 0003 | 0101 | 0000 | 26B6 | 0000 |
| 0000502000 | 0010 | 0000 | 0000 | 0000 | 0000 | 0000 | 0000 | 0000 |
| 0000502020 | 26C0 | 0000 | 0090 | 0000 | FFFF | 0003 | 0000 | 0000 |
| 0000502040 | 0000 | 0000 | 0010 | 0000 | 0000 | 0000 | 0101 | 0000 |
| 0000502060 | 0000 | 0000 | 26CC | 0000 | 00A0 | 0000 | 0000 | 0000 |
| 0000502100 | 0101 | 0000 | 0000 | 0000 | 0010 | 0000 | FFFF | 0003 |
| 0000502120 | 0000 | 0000 | 0000 | 0000 | 26D7 | 0000 | 0000 | 0000 |
| 0000502140 | FFFF | 0003 | 0101 | 0000 | 0000 | 0000 | 00B0 | 0000 |
| 0000502160 | 0000 | 0000 | 0000 | 0000 | 0000 | 0000 | 0010 | 0000 |
| 0000502200 | 00C0 | 0000 | FFFF | 0003 | 0101 | 0000 | 26E4 | 0000 |
| 0000502220 | 0010 | 0000 | 0000 | 0000 | 0000 | 0000 | 0000 | 0000 |
| 0000502240 | 26F0 | 0000 | 00D0 | 0000 | FFFF | 0000 | 0000 | 0000 |
| 0000502260 | 0000 | 0000 | 0010 | 0000 | 0000 | 0003 | 0101 | 0000 |
| 0000502300 | 0000 | 0000 | 26FB | 0000 | 00E0 | 0000 | 0000 | 0000 |
| 0000502320 | 0101 | 0000 | 0000 | 0000 | 0010 | 0000 | FFFF | 0003 |
| 0000502340 | 0000 | 0000 | 725F | 6365 | 3174 | 0000 | 0000 | 0000 |
| 0000502360 | FFFF | 000A | 0101 | 0EAE | 0000 | 0000 | 00F0 | 0000 |
| 0000502400 | 0000 | 0000 | 0000 | 0000 | 725F | 0000 | 0001 | 0000 |
| 0000502420 | 0100 | 0000 | FFFF | 000A | 0101 | 6365 | 3274 | 0000 |
| 0000502440 | 0001 | 0000 | 0000 | 0000 | 0000 | 0EAE | 0000 | 0000 |
| 0000502460 | 2706 | 0000 | 0110 | 0000 | FFFF | 0000 | 0000 | 0000 |
| 0000502500 | 0000 | 0000 | 0001 | 0000 | 0000 | 000A | 0101 | 0EAE |
| | | | | | | 0000 | 0000 | 0000 |

THU MAR 14 17:37:32 1991 GSPMON.4 PAGE 176, LINE 10326

| | | | | | | | | |
|---|---|---|---|---|---|---|---|---|
| 0000502520 | 0000 | 0000 | 2717 | 0000 | 0120 | 0000 | FFFF | 000A |
| 0000502540 | 0101 | 0EAE | 0000 | 0000 | 0001 | 0000 | 0000 | 0000 |
| 0000502560 | 0000 | 0000 | 0000 | 0000 | 272E | 0000 | 0130 | 0000 |
| 0000502600 | FFFF | 000A | 0101 | 0EAE | 0000 | 0000 | 0001 | 0000 |
| 0000502620 | 0000 | 0000 | 0000 | 0000 | 0000 | 0000 | 273E | 0000 |
| 0000502640 | 0140 | 0000 | FFFF | 000A | 0101 | 0EAE | 0000 | 0000 |
| 0000502660 | 0001 | 0000 | 0000 | 0000 | 0000 | 0000 | 0000 | 0000 |
| 0000502700 | 2754 | 0000 | 0150 | 0000 | FFFF | 000A | 0101 | 0EAE |
| 0000502720 | 0000 | 0000 | 0001 | 0000 | 0000 | 0000 | 0000 | 0000 |
| 0000502740 | 0000 | 0000 | 276C | 0000 | 0160 | 0000 | FFFF | 000A |
| 0000502760 | 0101 | 0EAE | 0000 | 0000 | 0001 | 0000 | 0000 | 0000 |
| 0000503000 | 0000 | 0000 | 0000 | 0000 | 2783 | 0000 | 0170 | 0000 |
| 0000503020 | FFFF | 000A | 0101 | 0EAE | 0000 | 0000 | 0001 | 0000 |
| 0000503040 | 0000 | 0000 | 0000 | 0000 | 0000 | 0000 | 279D | 0000 |
| 0000503060 | 0180 | 0000 | FFFF | 000A | 0101 | 0EAE | 0000 | 0000 |
| 0000503100 | 0001 | 0000 | 0000 | 0000 | 0000 | 0000 | 0000 | 0000 |
| 0000503120 | 27B6 | 0000 | 0190 | 0000 | FFFF | 000A | 0101 | 0EAE |
| 0000503140 | 0000 | 0000 | 0001 | 0000 | 0000 | 0000 | 0000 | 0000 |
| 0000503160 | 0000 | 0000 | 27CF | 0000 | 01A0 | 0000 | FFFF | 000A |
| 0000503200 | 0101 | 0EAE | 0000 | 0000 | 0001 | 0000 | 0000 | 0000 |
| 0000503220 | 0000 | 0000 | 0000 | 0000 | 27E6 | 0000 | 01B0 | 0000 |
| 0000503240 | FFFF | 000A | 0101 | 0EAE | 0000 | 0000 | 0001 | 0000 |
| 0000503260 | 0000 | 0000 | 0000 | 0000 | 0000 | 0000 | 27F6 | 0000 |
| 0000503300 | 01C0 | 0000 | FFFF | 000A | 0101 | 0EAE | 0000 | 0000 |
| 0000503320 | 0001 | 0000 | 0000 | 0000 | 0000 | 0000 | 652E | 0066 |
| 0000503340 | 0000 | 0000 | A1B0 | FFC3 | 0001 | 0000 | 0165 | 0000 |
| 0000503360 | 0000 | 059A | 0000 | 0000 | 0000 | 0000 | 0000 | 0000 |
| 0000503400 | 0000 | 0000 | 280C | 0000 | A1B0 | FFC3 | 0001 | 0024 |
| 0000503420 | 0103 | 0000 | 0000 | 44E0 | 0000 | 0D84 | 0001 | 12EE |
| 0000503440 | 0000 | 0004 | 622E | 0066 | 0000 | 0000 | A1B0 | FFC3 |
| 0000503460 | 0001 | 0000 | 0165 | 0000 | 0000 | 05AE | 0000 | 0000 |
| 0000503500 | 0000 | 0454 | 0000 | 0000 | 6E5F | 006F | 0000 | 0000 |
| 0000503520 | FFE0 | FFFF | FFFF | 0003 | 0109 | 0000 | 0000 | 0000 |
| 0000503540 | 0010 | 0000 | 0000 | 0000 | 0000 | 0000 | 0000 | 0000 |
| 0000503560 | 2819 | 0000 | FFC0 | FFFF | FFFF | 0018 | 0109 | 1102 |
| 0000503600 | 0000 | 0000 | 0020 | 0000 | 0000 | 0000 | 0000 | 0000 |
| 0000503620 | 725F | 6365 | 0074 | 0000 | FFA0 | FFFF | FFFF | 0018 |
| 0000503640 | 0109 | 1102 | 0000 | 0000 | 0020 | 0000 | 0000 | 0000 |
| 0000503660 | 0000 | 0000 | 6D5F | 7861 | 785F | 0000 | FF80 | FFFF |
| 0000503700 | FFFF | 0003 | 0109 | 0000 | 0000 | 0000 | 0010 | 0000 |
| 0000503720 | 0000 | 0000 | 0000 | 0000 | 6D5F | 6E69 | 785F | 0000 |
| 0000503740 | FF60 | FFFF | FFFF | 0003 | 0109 | 0000 | 0000 | 0000 |
| 0000503760 | 0010 | 0000 | 0000 | 0000 | 0000 | 0000 | 785F | 735F |
| 0000504000 | 6574 | 0070 | FF40 | FFFF | FFFF | 0003 | 0109 | 0000 |
| 0000504020 | 0000 | 0000 | 0010 | 0000 | 0000 | 0000 | 0000 | 0000 |
| 0000504040 | 795F | 735F | 6574 | 0070 | FF20 | FFFF | FFFF | 0003 |
| 0000504060 | 0109 | 0000 | 0000 | 0000 | 0010 | 0000 | 0000 | 0000 |
| 0000504100 | 0000 | 0000 | 725F | 7365 | 6C75 | 0074 | FF00 | FFFF |
| 0000504120 | FFFF | 0013 | 0109 | 0000 | 0000 | 0000 | 0020 | 0000 |
| 0000504140 | 0000 | 0000 | 0000 | 0000 | 695F | 0000 | 0000 | 0000 |
| 0000504160 | 0000 | 0000 | FFFF | 0003 | 0101 | 0000 | 0000 | 0000 |
| 0000504200 | 0010 | 0000 | 0000 | 0000 | 0000 | 0000 | 6A5F | 0000 |
| 0000504220 | 0000 | 0000 | 0010 | 0000 | FFFF | 0003 | 0101 | 0000 |
| 0000504240 | 0000 | 0000 | 0010 | 0000 | 0000 | 0000 | 0000 | 0000 |
| 0000504260 | 6B5F | 0000 | 0000 | 0000 | 0020 | 0000 | FFFF | 0003 |
| 0000504300 | 0101 | 0000 | 0000 | 0000 | 0010 | 0000 | 0000 | 0000 |
| 0000504320 | 0000 | 0000 | 6C5F | 0000 | 0000 | 0000 | 0030 | 0000 |
| 0000504340 | FFFF | 0003 | 0101 | 0000 | 0000 | 0000 | 0010 | 0000 |
| 0000504360 | 0000 | 0000 | 0000 | 0000 | 6D5F | 0000 | 0000 | 0000 |

THU MAR 14 17:37:32 1991 GSPMON.4 PAGE 177, LINE 10385

| | | | | | | | | |
|---|---|---|---|---|---|---|---|---|
| 0000504400 | 0040 | 0000 | FFFF | 0003 | 0101 | 0000 | 0000 | 0000 |
| 0000504420 | 0010 | 0000 | 0000 | 0000 | 0000 | 0000 | 655F | 7272 |
| 0000504440 | 0000 | 0000 | 0050 | 0000 | FFFF | 000F | 0101 | 0000 |
| 0000504460 | 0000 | 0000 | 0020 | 0000 | 0000 | 0000 | 0000 | 0000 |
| 0000504500 | 665F | 7269 | 7473 | 0079 | 0070 | 0000 | FFFF | 0003 |
| 0000504520 | 0101 | 0000 | 0000 | 0000 | 0010 | 0000 | 0000 | 0000 |
| 0000504540 | 0000 | 0000 | 6C5F | 7361 | 7974 | 0000 | 0080 | 0000 |
| 0000504560 | FFFF | 0003 | 0101 | 0000 | 0000 | 0000 | 0010 | 0000 |
| 0000504600 | 0000 | 0000 | 0000 | 0000 | 6D5F | 6469 | 0079 | 0000 |
| 0000504620 | 0090 | 0000 | FFFF | 0003 | 0101 | 0000 | 0000 | 0000 |
| 0000504640 | 0010 | 0000 | 0000 | 0000 | 0000 | 0000 | 675F | 6D5F |
| 0000504660 | 6E69 | 0079 | 00A0 | 0000 | FFFF | 0003 | 0101 | 0000 |
| 0000504700 | 0000 | 0000 | 0010 | 0000 | 0000 | 0000 | 0000 | 0000 |
| 0000504720 | 675F | 6D5F | 7861 | 0079 | 00B0 | 0000 | FFFF | 0003 |
| 0000504740 | 0101 | 0000 | 0000 | 0000 | 0010 | 0000 | 0000 | 0000 |
| 0000504760 | 0000 | 0000 | 675F | 6D5F | 6E69 | 0078 | 00C0 | 0000 |
| 0000505000 | FFFF | 0003 | 0101 | 0000 | 0000 | 0000 | 0010 | 0000 |
| 0000505020 | 0000 | 0000 | 0000 | 0000 | 675F | 6D5F | 7861 | 0078 |
| 0000505040 | 00D0 | 0000 | FFFF | 0003 | 0101 | 0000 | 0000 | 0000 |
| 0000505060 | 0010 | 0000 | 0000 | 0000 | 0000 | 0000 | 665F | 7269 |
| 0000505100 | 7473 | 0078 | 00E0 | 0000 | FFFF | 0003 | 0101 | 0000 |
| 0000505120 | 0000 | 0000 | 0010 | 0000 | 0000 | 0000 | 0000 | 0000 |
| 0000505140 | 6C5F | 7361 | 7874 | 0000 | 00F0 | 0000 | FFFF | 0003 |
| 0000505160 | 0101 | 0000 | 0000 | 0000 | 0010 | 0000 | 0000 | 0000 |
| 0000505200 | 0000 | 0000 | 0000 | 0000 | 2824 | 0000 | 0100 | 0000 |
| 0000505220 | FFFF | 0003 | 0101 | 0000 | 0000 | 0000 | 0010 | 0000 |
| 0000505240 | 0000 | 0000 | 0000 | 0000 | 0000 | 0000 | 2831 | 0000 |
| 0000505260 | 0110 | 0000 | FFFF | 0003 | 0101 | 0000 | 0000 | 0000 |
| 0000505300 | 0010 | 0000 | 0000 | 0000 | 0000 | 0000 | 0000 | 0000 |
| 0000505320 | 283D | 0000 | 0120 | 0000 | FFFF | 0003 | 0101 | 0000 |
| 0000505340 | 0000 | 0000 | 0010 | 0000 | 0000 | 0000 | 0000 | 0000 |
| 0000505360 | 0000 | 0000 | 2848 | 0000 | 0130 | 0000 | FFFF | 0003 |
| 0000505400 | 0101 | 0000 | 0000 | 0000 | 0010 | 0000 | 0000 | 0000 |
| 0000505420 | 0000 | 0000 | 725F | 7365 | 0000 | 0000 | 0140 | 0000 |
| 0000505440 | FFFF | 0003 | 0101 | 0000 | 0000 | 0000 | 0010 | 0000 |
| 0000505460 | 0000 | 0000 | 0000 | 0000 | 745F | 6D65 | 7870 | 0000 |
| 0000505500 | 0150 | 0000 | FFFF | 0003 | 0101 | 0000 | 0000 | 0000 |
| 0000505520 | 0010 | 0000 | 0000 | 0000 | 0000 | 0000 | 0000 | 0000 |
| 0000505540 | 2853 | 0000 | 0160 | 0000 | FFFF | 0003 | 0101 | 0000 |
| 0000505560 | 0000 | 0000 | 0010 | 0000 | 0000 | 0000 | 0000 | 0000 |
| 0000505600 | 0000 | 0000 | 2860 | 0000 | 0170 | 0000 | FFFF | 000A |
| 0000505620 | 0101 | 0EAE | 0000 | 0000 | 0001 | 0000 | 0000 | 0000 |
| 0000505640 | 0000 | 0000 | 652E | 0066 | 0000 | 0000 | E690 | FFC3 |
| 0000505660 | 0001 | 0000 | 0165 | 0000 | 0000 | 0665 | 0000 | 0000 |
| 0000505700 | 0000 | 0000 | 0000 | 0000 | 0000 | 0000 | 286C | 0000 |
| 0000505720 | E690 | FFC3 | 0001 | 0024 | 0102 | 0000 | 0000 | 0830 |
| 0000505740 | 0000 | 1024 | 0001 | 1304 | 0000 | 0003 | 622E | 0066 |
| 0000505760 | 0000 | 0000 | E690 | FFC3 | 0001 | 0000 | 0165 | 0000 |
| 0000506000 | 0000 | 067D | 0000 | 0000 | 0000 | 046A | 0000 | 0000 |
| 0000506020 | 725F | 776F | 0000 | 0000 | FFE0 | FFFF | FFFF | 000D |
| 0000506040 | 0109 | 0000 | 0000 | 0000 | 0010 | 0000 | 0000 | 0000 |
| 0000506060 | 0000 | 0000 | 635F | 6C6F | 0000 | 0000 | FFC0 | FFFF |
| 0000506100 | FFFF | 000D | 0109 | 0000 | 0000 | 0000 | 0010 | 0000 |
| 0000506120 | 0000 | 0000 | 0000 | 0000 | 645F | 7269 | 0000 | 0000 |
| 0000506140 | FFA0 | FFFF | FFFF | 000D | 0109 | 0000 | 0000 | 0000 |
| 0000506160 | 0010 | 0000 | 0000 | 0000 | 0000 | 0000 | 705F | 7869 |
| 0000506200 | 0000 | 0000 | FF80 | FFFF | FFFF | 001D | 0109 | 0000 |
| 0000506220 | 0000 | 0000 | 0020 | 0000 | 0000 | 0000 | 0000 | 0000 |
| 0000506240 | 0000 | 0000 | 2880 | 0000 | 0000 | 0000 | FFFF | 000D |

THU MAR 14 17:37:32 1991 GSPMON.4 PAGE 178, LINE 10444

| | | | | | | | | |
|---|---|---|---|---|---|---|---|---|
| 0000506260 | 0101 | 0000 | 0000 | 0000 | 0010 | 0000 | 0000 | 0000 |
| 0000506300 | 0000 | 0000 | 655F | 7272 | 0000 | 0000 | 0010 | 0000 |
| 0000506320 | FFFF | 000D | 0101 | 0000 | 0000 | 0000 | 0010 | 0000 |
| 0000506340 | 0000 | 0000 | 0000 | 0000 | 6D5F | 7361 | 006B | 0000 |
| 0000506360 | 0020 | 0000 | FFFF | 000D | 0101 | 0000 | 0000 | 0000 |
| 0000506400 | 0010 | 0000 | 0000 | 0000 | 0000 | 0000 | 695F | 0000 |
| 0000506420 | 0000 | 0000 | 0030 | 0000 | FFFF | 000D | 0101 | 0000 |
| 0000506440 | 0000 | 0000 | 0010 | 0000 | 0000 | 0000 | 0000 | 0000 |
| 0000506460 | 652E | 0066 | 0000 | 0000 | EEC0 | FFC3 | 0001 | 0000 |
| 0000506500 | 0165 | 0000 | 0000 | 06DF | 0000 | 0000 | 0000 | 0000 |
| 0000506520 | 0000 | 0000 | 0000 | 0000 | 288A | 0000 | EEC0 | FFC3 |
| 0000506540 | 00G1 | 0024 | 0102 | 0000 | 0000 | 02E0 | 0000 | 10E4 |
| 0000506560 | 0001 | 1310 | 0000 | 0003 | 622E | 0066 | 0000 | 0000 |
| 0000506600 | EEC0 | FFC3 | 0001 | 0000 | 0165 | 0000 | 0000 | 06EE |
| 0000506620 | 0000 | 0000 | 0000 | 0476 | 0000 | 0000 | 695F | 5F6E |
| 0000506640 | 7470 | 0072 | FFE0 | FFFF | FFFF | 0010 | 0109 | 0000 |
| 0000506660 | 0000 | 0000 | 0020 | 0000 | 0000 | 0000 | 0000 | 0000 |
| 0000506700 | 6F5F | 7475 | 705F | 7274 | FFC0 | FFFF | FFFF | 0010 |
| 0000506720 | 0109 | 0000 | 0000 | 0000 | 0020 | 0000 | 0000 | 0000 |
| 0000506740 | 0000 | 0000 | 0000 | 0000 | 28A3 | 0000 | 0000 | 0000 |
| 0000506760 | FFFF | 0005 | 0101 | 0000 | 0000 | 0000 | 0020 | 0000 |
| 0000507000 | 0000 | 0000 | 0000 | 0000 | 652E | 0066 | 0000 | 0000 |
| 0000507020 | F1A0 | FFC3 | 0001 | 0000 | 0165 | 0000 | 0000 | 06FE |
| 0000507040 | 0000 | 0000 | 0000 | 0000 | 0000 | 0000 | 0000 | 0000 |
| 0000507060 | 28AD | 0000 | F1A0 | FFC3 | 0001 | 0024 | 0102 | 0000 |
| 0000507100 | 0000 | 02F0 | 0000 | 1120 | 0001 | 131C | 0000 | 0003 |
| 0000507120 | 622E | 0066 | 0000 | 0000 | F1A0 | FFC3 | 0001 | 0000 |
| 0000507140 | 0165 | 0000 | 0000 | 070F | 0000 | 0000 | 0000 | 0482 |
| 0000507160 | 0000 | 0000 | 695F | 5F6E | 7470 | 0J72 | FFE0 | FFFF |
| 0000507200 | FFFF | 0010 | 0109 | 0000 | 0000 | 0000 | 0020 | 0000 |
| 0000507220 | 0000 | 0000 | 0000 | 0000 | 6F5F | 7475 | 705F | 7274 |
| 0000507240 | FFC0 | FFFF | FFFF | 0010 | 0109 | 0000 | 0000 | 0000 |
| 0000507260 | 0020 | 0000 | 0000 | 0000 | 0000 | 0000 | 0000 | 0000 |
| 0000507300 | 28C0 | 0000 | 0000 | 0000 | FFFF | 0005 | 0101 | 0000 |
| 0000507320 | 0000 | 0000 | 0020 | 0000 | 0000 | 0000 | 0000 | 0000 |
| 0000507340 | 652E | 0066 | 0000 | 0000 | F490 | FFC3 | 0001 | 0000 |
| 0000507360 | 0165 | 0000 | 0000 | 071E | 0000 | 0000 | 0000 | 0000 |
| 0000507400 | 0000 | 0000 | 0000 | 0000 | 28CA | 0000 | F490 | FFC3 |
| 0000507420 | 0001 | 0024 | 0102 | 0000 | 0000 | 0670 | 0000 | 1156 |
| 0000507440 | 0001 | 1328 | 0000 | 0004 | 622E | 0066 | 0000 | 0000 |
| 0000507460 | F490 | FFC3 | 0001 | 0000 | 0165 | 0000 | 0000 | 072F |
| 0000507500 | 0000 | 0000 | 0000 | 048E | 0000 | 0000 | 695F | 5F6E |
| 0000507520 | 7470 | 0072 | FFE0 | FFFF | FFFF | 0010 | 0109 | 0000 |
| 0000507540 | 0000 | 0000 | 0020 | 0000 | 0000 | 0000 | 0000 | 0000 |
| 0000507560 | 6F5F | 7475 | 705F | 7274 | FFC0 | FFFF | FFFF | 0010 |
| 0000507600 | 0109 | 0000 | 0000 | 0000 | 0020 | 0000 | 0000 | 0000 |
| 0000507620 | 0000 | 0000 | 0000 | 0000 | 28DF | 0000 | 0000 | 0000 |
| 0000507640 | FFFF | 0005 | 0101 | 0000 | 0000 | 0000 | 0020 | 0000 |
| 0000507660 | 0000 | 0000 | 0000 | 0000 | 652E | 0066 | 0000 | 0000 |
| 0000507700 | FB00 | FFC3 | 0001 | 0000 | 0165 | 0000 | 0000 | 0746 |
| 0000507720 | 0000 | 0000 | 0000 | 0000 | 0000 | 0000 | 0000 | 0000 |
| 0000507740 | 28E9 | 0000 | FB00 | FFC3 | 0001 | 0024 | 0102 | 0000 |
| 0000507760 | 0000 | 0740 | 0000 | 11BC | 0001 | 1334 | 0000 | 0004 |
| 0000510000 | 622E | 0066 | 0000 | 0000 | FB00 | FFC3 | 0001 | 0000 |
| 0000510020 | 0165 | 0000 | 0000 | 0757 | 0000 | 0000 | 0000 | 049A |
| 0000510040 | 0000 | 0000 | 695F | 5F6E | 7470 | 0072 | FFE0 | FFFF |
| 0000510060 | FFFF | 0010 | 0109 | 0000 | 0000 | 0000 | 0020 | 0000 |
| 0000510100 | 0000 | 0000 | 0000 | 0000 | 6F5F | 7475 | 705F | 7274 |
| 0000510120 | FFC0 | FFFF | FFFF | 0010 | 0109 | 0000 | 0000 | 0000 |

THU MAR 14 17:37:32 1991 GSPMON.4 PAGE 179, LINE 10503

| | | | | | | | | |
|---|---|---|---|---|---|---|---|---|
| 0000510140 | 0020 | 0000 | 0000 | 0000 | 0000 | 0000 | 0000 | 0000 |
| 0000510160 | 28FB | 0000 | 0000 | 0000 | FFFF | 0005 | 0101 | 0000 |
| 0000510200 | 0000 | 0000 | 0020 | 0000 | 0000 | 0000 | 0000 | 0000 |
| 0000510220 | 652E | 0066 | 0000 | 0000 | 0240 | FFC4 | 0001 | 0000 |
| 0000510240 | 0165 | 0000 | 0000 | 0770 | 0000 | 0000 | 0000 | 0000 |
| 0000510260 | 0000 | 0000 | 0000 | 0000 | 2905 | 0000 | 0240 | FFC4 |
| 0000510300 | 0001 | 0024 | 0102 | 0000 | 0000 | 0680 | 0000 | 1228 |
| 0000510320 | 0001 | 1340 | 0000 | 0004 | 622E | 0066 | 0000 | 0000 |
| 0000510340 | 0240 | FFC4 | 0001 | 0000 | 0165 | 0000 | 0000 | 0781 |
| 0000510360 | 0000 | 0000 | 0000 | 04A6 | 0000 | 0000 | 695F | 5F6E |
| 0000510400 | 7470 | 0072 | FFE0 | FFFF | FFFF | 0010 | 0109 | 0000 |
| 0000510420 | 0000 | 0000 | 0020 | 0000 | 0000 | 0000 | 0000 | 0000 |
| 0000510440 | 6F5F | 7475 | 705F | 7274 | FFC0 | FFFF | FFFF | 0010 |
| 0000510460 | 0109 | 0000 | 0000 | 0000 | 0020 | 0000 | 0000 | 0000 |
| 0000510500 | 0000 | 0000 | 0000 | 0000 | 2919 | 0000 | 0000 | 0000 |
| 0000510520 | FFFF | 0005 | 0101 | 0000 | 0000 | 0000 | 0020 | 0000 |
| 0000510540 | 0000 | 0000 | 0000 | 0000 | 652E | 0066 | 0000 | 0000 |
| 0000510560 | 08C0 | FFC4 | 0001 | 0000 | 0165 | 0000 | 0000 | 0798 |
| 0000510600 | 0000 | 0000 | 0000 | 0000 | 0000 | 0000 | 0000 | 0000 |
| 0000510620 | 2923 | 0000 | 08C0 | FFC4 | 0001 | 0024 | 0102 | 0000 |
| 0000510640 | 0000 | 00E0 | 0000 | 128E | 0001 | 134A | 0000 | 0002 |
| 0000510660 | 622E | 0066 | 0000 | 0000 | 08C0 | FFC4 | 0001 | 0000 |
| 0000510700 | 0165 | 0000 | 0000 | 07A6 | 0000 | 0000 | 0000 | 04B0 |
| 0000510720 | 0000 | 0000 | 695F | 5F6E | 7470 | 0072 | FFE0 | FFFF |
| 0000510740 | FFFF | 0010 | 0109 | 0000 | 0000 | 0000 | 0020 | 0000 |
| 0000510760 | 0000 | 0000 | 0000 | 0000 | 6F5F | 7475 | 705F | 7274 |
| 0000511000 | FFC0 | FFFF | FFFF | 0010 | 0109 | 0000 | 0000 | 0000 |
| 0000511020 | 0020 | 0000 | 0000 | 0000 | 0000 | 0000 | 652E | 0066 |
| 0000511040 | 0000 | 0000 | 09A0 | FFC4 | 0001 | 0000 | 0165 | 0000 |
| 0000511060 | 0000 | 07AD | 0000 | 0000 | 0000 | 0000 | 0000 | 0003 |
| 0000511100 | 0000 | 0000 | 2935 | 0000 | 09A0 | FFC4 | 0001 | 0024 |
| 0000511120 | 0102 | 0000 | 0000 | 06B0 | 0000 | 12A0 | 0001 | 1356 |
| 0000511140 | 0000 | 0004 | 622E | 0066 | 0000 | 0000 | 09A0 | FFC4 |
| 0000511160 | 0001 | 0000 | 0165 | 0000 | 0000 | 07BE | 0000 | 0000 |
| 0000511200 | 0000 | 04BC | 0000 | 0000 | 695F | 5F6E | 7470 | 0072 |
| 0000511220 | FFE0 | FFFF | FFFF | 0010 | 0109 | 0000 | 0000 | 0000 |
| 0000511240 | 0020 | 0000 | 0000 | 0000 | 0000 | 0000 | 6F5F | 7475 |
| 0000511260 | 705F | 7274 | FFC0 | FFFF | FFFF | 0010 | 0109 | 0000 |
| 0000511300 | 0000 | 0000 | 0020 | 0000 | 0000 | 0000 | 0000 | 0000 |
| 0000511320 | 0000 | 0000 | 294A | 0000 | 0000 | 0000 | FFFF | 0005 |
| 0000511340 | 0101 | 0000 | 0000 | 0000 | 0020 | 0000 | 0000 | 0000 |
| 0000511360 | 0000 | 0000 | 652E | 0066 | 0000 | 0000 | 1050 | FFC4 |
| 0000511400 | 0001 | 0000 | 0165 | 0000 | 0000 | 07D4 | 0000 | 0000 |
| 0000511420 | 0000 | 0006 | 0000 | 0000 | 0000 | 0000 | 2954 | 0000 |
| 0000511440 | 1050 | FFC4 | 0001 | 0024 | 0102 | 0000 | 0000 | 04A0 |
| 0000511460 | 0000 | 1300 | 0001 | 1360 | 0000 | 0004 | 622E | 0066 |
| 0000511500 | 0000 | 0000 | 1050 | FFC4 | 0001 | 0000 | 0165 | 0000 |
| 0000511520 | 0000 | 07E1 | 0000 | 0000 | 0000 | 04C6 | 0000 | 0000 |
| 0000511540 | 695F | 5F6E | 7470 | 0072 | FFE0 | FFFF | FFFF | 0010 |
| 0000511560 | 0109 | 0000 | 0000 | 0000 | 0020 | 0000 | 0000 | 0000 |
| 0000511600 | 0000 | 0000 | 6F5F | 7475 | 705F | 7274 | FFC0 | FFFF |
| 0000511620 | FFFF | 0010 | 0109 | 0000 | 0000 | 0000 | 0020 | 0000 |
| 0000511640 | 0000 | 0000 | 0000 | 0000 | 652E | 0066 | 0000 | 0000 |
| 0000511660 | 14F0 | FFC4 | 0001 | 0000 | 0165 | 0000 | 0000 | 0800 |
| 0000511700 | 0000 | 0000 | 0000 | 0000 | 0000 | 0000 | 0000 | 0000 |
| 0000511720 | 2968 | 0000 | 14F0 | FFC4 | 0001 | 0024 | 0102 | 0000 |
| 0000511740 | 0000 | 0120 | 0000 | 134E | 0001 | 136A | 0000 | 0003 |
| 0000511760 | 622E | 0066 | 0000 | 0000 | 14F0 | FFC4 | 0001 | 0000 |
| 0000512000 | 0165 | 0000 | 0000 | 080E | 0000 | 0000 | 0000 | 04D0 |

THU MAR 14 17:37:32 1991 GSPMON.4 PAGE 180, LINE 10562

| | | | | | | | | |
|---|---|---|---|---|---|---|---|---|
| 0000512020 | 0000 | 0000 | 695F | 5F6E | 7470 | 0072 | FFE0 | FFFF |
| 0000512040 | FFFF | 0010 | 0109 | 0000 | 0000 | 0000 | 0020 | 0000 |
| 0000512060 | 0000 | 0000 | 0000 | 0000 | 6F5F | 7475 | 705F | 7274 |
| 0000512100 | FFC0 | FFFF | FFFF | 0010 | 0109 | 0000 | 0000 | 0000 |
| 0000512120 | 0020 | 0000 | 0000 | 0000 | 0000 | 0000 | 652E | 0066 |
| 0000512140 | 0000 | 0000 | 1610 | FFC4 | 0001 | 0000 | 0165 | 0000 |
| 0000512160 | 0000 | 081C | 0000 | 0000 | 0000 | 0000 | 0000 | 0000 |
| 0000512200 | 0000 | 0000 | 297B | 0000 | 1610 | FFC4 | 0001 | 0024 |
| 0000512220 | 0102 | 0000 | 0000 | 0150 | 0000 | 1366 | 0001 | 1374 |
| 0000512240 | 0000 | 0002 | 622E | 0066 | 0000 | 0000 | 1610 | FFC4 |
| 0000512260 | 0001 | 0000 | 0165 | 0000 | 0000 | 082B | 0000 | 0000 |
| 0000512300 | 0000 | 04DA | 0000 | 0000 | 695F | 5F6E | 7470 | 0072 |
| 0000512320 | FFE0 | FFFF | FFFF | 0010 | 0109 | 0000 | 0000 | 0000 |
| 0000512340 | 0020 | 0000 | 0000 | 0000 | 0000 | 0000 | 6F5F | 7475 |
| 0000512360 | 705F | 7274 | FFC0 | FFFF | FFFF | 0010 | 0109 | 0000 |
| 0000512400 | 0000 | 0000 | 0020 | 0000 | 0000 | 0000 | 0000 | 0000 |
| 0000512420 | 652E | 0066 | 0000 | 0000 | 1760 | FFC4 | 0001 | 0000 |
| 0000512440 | 0165 | 0000 | 0000 | 0834 | 0000 | 0000 | 0000 | 0000 |
| 0000512460 | 0000 | 0000 | 0000 | 0000 | 298E | 0000 | 1760 | FFC4 |
| 0000512500 | 0001 | 002D | 0103 | 0000 | 0000 | 09F0 | 0000 | 1384 |
| 0000512520 | 0001 | 1386 | 0000 | 0003 | 622E | 0066 | 0000 | 0000 |
| 0000512540 | 1760 | FFC4 | 0001 | 0000 | 0165 | 0000 | 0000 | 083B |
| 0000512560 | 0000 | 0000 | 0000 | 04EC | 0000 | 0000 | 625F | 6765 |
| 0000512600 | 6E69 | 0000 | FFE0 | FFFF | FFFF | 0003 | 0109 | 0000 |
| 0000512620 | 0000 | 0000 | 0010 | 0000 | 0000 | 0000 | 0000 | 0000 |
| 0000512640 | 6C5F | 7361 | 0074 | 0000 | FFC0 | FFFF | FFFF | 0003 |
| 0000512660 | 0109 | 0000 | 0000 | 0000 | 0010 | 0000 | 0000 | 0000 |
| 0000512700 | 0000 | 0000 | 655F | 7272 | 0000 | 0000 | FFA0 | FFFF |
| 0000512720 | FFFF | 000D | 0109 | 0000 | 0000 | 0000 | 0010 | 0000 |
| 0000512740 | 0000 | 0000 | 0000 | 0000 | 6D5F | 7861 | 0000 | 0000 |
| 0000512760 | FF80 | FFFF | FFFF | 000A | 0109 | 0EAE | 0000 | 0000 |
| 0000513000 | 0001 | 0000 | 0000 | 0000 | 0000 | 0000 | 6D5F | 6469 |
| 0000513020 | 0000 | 0000 | 0000 | 0000 | FFFF | 0003 | 0101 | 0000 |
| 0000513040 | 0000 | 0000 | 0010 | 0000 | 0000 | 0000 | 0000 | 0000 |
| 0000513060 | 695F | 0000 | 0000 | 0000 | 0010 | 0000 | FFFF | 0003 |
| 0000513100 | 0101 | 0000 | 0000 | 0000 | 0010 | 0000 | 0000 | 0000 |
| 0000513120 | 0000 | 0000 | 652E | 0066 | 0000 | 0000 | 2150 | FFC4 |
| 0000513140 | 0001 | 0000 | 0165 | 0000 | 0000 | 0864 | 0000 | 0000 |
| 0000513160 | 0000 | 0000 | 0000 | 0000 | 0000 | 0000 | 299A | 0000 |
| 0000513200 | 2150 | FFC4 | 0001 | 002D | 0103 | 0000 | 0000 | 0C00 |
| 0000513220 | 0000 | 1420 | 0001 | 139A | 0000 | 0003 | 622E | 0066 |
| 0000513240 | 0000 | 0000 | 2150 | FFC4 | 0001 | 0000 | 0165 | 0000 |
| 0000513260 | 0000 | 086A | 0000 | 0000 | 0000 | 0500 | 0000 | 0000 |
| 0000513300 | 625F | 6765 | 6E69 | 0000 | FFE0 | FFFF | FFFF | 0003 |
| 0000513320 | 0109 | 0000 | 0000 | 0000 | 0010 | 0000 | 0000 | 0000 |
| 0000513340 | 0000 | 0000 | 6C5F | 7361 | 0074 | 0000 | FFC0 | FFFF |
| 0000513360 | FFFF | 0003 | 0109 | 0000 | 0000 | 0000 | 0010 | 0000 |
| 0000513400 | 0000 | 0000 | 0000 | 0000 | 655F | 7272 | 0000 | 0000 |
| 0000513420 | FFA0 | FFFF | FFFF | 000D | 0109 | 0000 | 0000 | 0000 |
| 0000513440 | 0010 | 0000 | 0000 | 0000 | 0000 | 0000 | 6D5F | 7861 |
| 0000513460 | 0000 | 0000 | FF80 | FFFF | FFFF | 000A | 0109 | 0EAE |
| 0000513500 | 0000 | 0000 | 0001 | 0000 | 0000 | 0000 | 0000 | 0000 |
| 0000513520 | 6C5F | 6E69 | 0065 | 0000 | FF60 | FFFF | FFFF | 0003 |
| 0000513540 | 0109 | 0000 | 0000 | 0000 | 0010 | 0000 | 0000 | 0000 |
| 0000513560 | 0000 | 0000 | 6D5F | 6469 | 0000 | 0000 | 0000 | 0000 |
| 0000513600 | FFFF | 0003 | 0101 | 0000 | 0000 | 0000 | 0010 | 0000 |
| 0000513620 | 0000 | 0000 | 0000 | 0000 | 695F | 0000 | 0000 | 0000 |
| 0000513640 | 0010 | 0000 | FFFF | 0003 | 0101 | 0000 | 0000 | 0000 |
| 0000513660 | 0010 | 0000 | 0000 | 0000 | 0000 | 0000 | 652E | 0066 |

THU MAR 14 17:37:32 1991 GSPMON.4 PAGE 181, LINE 10621

| | | | | | | | | |
|---|---|---|---|---|---|---|---|---|
| 0000513700 | 0000 | 0000 | 2D50 | FFC4 | 0001 | 0000 | 0165 | 0000 |
| 0000513720 | 0000 | 0898 | 0000 | 0000 | 0000 | 0000 | 0000 | 0000 |
| 0000513740 | 0000 | 0000 | 29A8 | 0000 | 2D50 | FFC4 | 0001 | 002F |
| 0000513760 | 0103 | 0000 | 0000 | 01C0 | 0000 | 14C8 | 0001 | 13A2 |
| 0000514000 | 0000 | 0003 | 622E | 0066 | 0000 | 0000 | 2D50 | FFC4 |
| 0000514020 | 0001 | 0000 | 0165 | 0000 | 0000 | 089F | 0000 | 0000 |
| 0000514040 | 0000 | 0508 | 0000 | 0000 | 6C5F | 6E69 | 0065 | 0000 |
| 0000514060 | FFE0 | FFFF | FFFF | 000D | 0109 | 0000 | 0000 | 0000 |
| 0000514100 | 0010 | 0000 | 0000 | 0000 | 0000 | 0000 | 652E | 0066 |
| 0000514120 | 0000 | 0000 | 2F10 | FFC4 | 0001 | 0000 | 0165 | 0000 |
| 0000514140 | 0000 | 08B0 | 0000 | 0000 | 0000 | 0000 | 0000 | 0000 |
| 0000514160 | 0000 | 0000 | 29B6 | 0000 | 2F10 | FFC4 | 0001 | 002F |
| 0000514200 | 0103 | 0000 | 0000 | 01C0 | 0000 | 14D4 | 0001 | 13AC |
| 0000514220 | 0000 | 0003 | 622E | 0066 | 0000 | 0000 | 2F10 | FFC4 |
| 0000514240 | 0001 | 0000 | 0165 | 0000 | 0000 | 08B7 | 0000 | 0000 |
| 0000514260 | 0000 | 0512 | 0000 | 0000 | 785F | 0000 | 0000 | 0000 |
| 0000514300 | FFE0 | FFFF | FFFF | 000D | 0109 | 0000 | 0000 | 0000 |
| 0000514320 | 0010 | 0000 | 0000 | 0000 | 0000 | 0000 | 795F | 0000 |
| 0000514340 | 0000 | 0000 | FFC0 | FFFF | FFFF | 000D | 0109 | 0000 |
| 0000514360 | 0000 | 0000 | 0010 | 0000 | 0000 | 0000 | 0000 | 0000 |
| 0000514400 | 652E | 0066 | 0000 | 0000 | 30D0 | FFC4 | 0001 | 0000 |
| 0000514420 | 0165 | 0000 | 0000 | 08C8 | 0000 | 0000 | 0000 | 0000 |
| 0000514440 | 0000 | 0000 | 655F | 7272 | 785F | 726F | 30DD | FFC4 |
| 0000514460 | 0001 | 002D | 0103 | 0000 | 0000 | 01D0 | 0000 | 14E0 |
| 0000514500 | 0001 | 13B6 | 0000 | 0004 | 622E | 0066 | 0000 | 0000 |
| 0000514520 | 30D0 | FFC4 | 0001 | 0000 | 0165 | 0000 | 0000 | 08CE |
| 0000514540 | 0000 | 0000 | 0000 | 051C | 0000 | 0000 | 785F | 0000 |
| 0000514560 | 0000 | 0000 | FFE0 | FFFF | FFFF | 000D | 0109 | 0000 |
| 0000514600 | 0000 | 0000 | 0010 | 0000 | 0000 | 0000 | 0000 | 0000 |
| 0000514620 | 795F | 0000 | 0000 | 0000 | FFC0 | FFFF | FFFF | 000D |
| 0000514640 | 0109 | 0000 | 0000 | 0000 | 0010 | 0000 | 0000 | 0000 |
| 0000514660 | 0000 | 0000 | 652E | 0066 | 0000 | 0000 | 32A0 | FFC4 |
| 0000514700 | 0001 | 0000 | 0165 | 0000 | 0000 | 08D9 | 0000 | 0000 |
| 0000514720 | 0000 | 0000 | 0000 | 0000 | 742E | 7865 | 0074 | 0000 |
| 0000514740 | B920 | FFC2 | 0001 | 0000 | 0103 | 7980 | 0001 | 0220 |
| 0000514760 | 0306 | 0000 | 0000 | 0000 | 0000 | 0000 | 642E | 7461 |
| 0000515000 | 0061 | 0000 | 0000 | 0000 | 0004 | 0000 | 0103 | 0000 |
| 0000515020 | 0000 | 0000 | 0000 | 0000 | 0000 | 0000 | 0000 | 0000 |
| 0000515040 | 622E | 7373 | 0000 | 0000 | 8E10 | FFC9 | 0003 | 0000 |
| 0000515060 | 0103 | 09D0 | 0000 | 0000 | 0000 | 0000 | 0000 | 0000 |
| 0000515100 | 0000 | 0000 | 632E | 6E69 | 7469 | 0000 | C210 | FFC6 |
| 0000515120 | 0002 | 0000 | 0103 | 0340 | 0000 | 000A | 0000 | 0000 |
| 0000515140 | 0000 | 0000 | 0000 | 0000 | 662E | 6C69 | 0065 | 0000 |
| 0000515160 | 13C0 | 0000 | FFFE | 0000 | 0167 | 7067 | 615F | 696F |
| 0000515200 | 632E | 0000 | 0000 | 0000 | 0000 | 0000 | 662E | 6C69 |
| 0000515220 | 0065 | 0000 | 13C2 | 0000 | FFFE | 0000 | 0167 | 7473 |
| 0000515240 | 6D64 | 682E | 0000 | 0000 | 0000 | 0000 | 0000 | 0000 |
| 0000515260 | 662E | 6C69 | 0065 | 0000 | 13C4 | 0000 | FFFE | 0000 |
| 0000515300 | 0167 | 7067 | 615F | 696F | 632E | 0000 | 0000 | 0000 |
| 0000515320 | 0000 | 0000 | 662E | 6C69 | 0065 | 0000 | 13D4 | 0000 |
| 0000515340 | FFFE | 0000 | 0167 | 7974 | 6570 | 6564 | 2E66 | 0068 |
| 0000515360 | 0000 | 0000 | 0000 | 0000 | 302E | 6166 | 656B | 0000 |
| 0000515400 | 0000 | 0000 | FFFE | 000A | 010F | 0000 | 0000 | 0000 |
| 0000515420 | 0001 | 0000 | 0000 | 13CE | 0000 | 0000 | 465F | 4C41 |
| 0000515440 | 4553 | 0000 | 0000 | 0000 | FFFF | 000B | 0110 | 0000 |
| 0000515460 | 0000 | 0000 | 0001 | 0000 | 0000 | 0000 | 0000 | 0000 |
| 0000515500 | 545F | 5552 | 0045 | 0000 | 0001 | 0000 | FFFF | 0005 |
| 0000515520 | 0110 | 0000 | 0000 | 0000 | 0001 | 0000 | 0000 | 0000 |
| 0000515540 | 0000 | 0000 | 652E | 736F | 0000 | 0000 | 0000 | 0000 |

THU MAR 14 17:37:32 1991 GSPMON.4 PAGE 182, LINE 10680

| | | | | | | | | |
|---|---|---|---|---|---|---|---|---|
| 0000515560 | FFFE | 000A | 0166 | 13C6 | 0000 | 0000 | 0001 | 0000 |
| 0000515600 | 0000 | 0000 | 0000 | 0000 | 312E | 6166 | 656B | 0000 |
| 0000515620 | 0000 | 0000 | FFFE | 0008 | 010A | 0000 | 0000 | 0000 |
| 0000515640 | 0004 | 0000 | 0000 | 13D4 | 0000 | 0000 | 705F | 7869 |
| 0000515660 | 6C65 | 0000 | 0000 | 000D | FFFF | 000E | 0112 | 0000 |
| 0000515700 | 0000 | 0000 | 0004 | 0000 | 0000 | 0000 | 0000 | 0000 |
| 0000515720 | 652E | 736F | 0000 | 0000 | 0000 | 0000 | FFFE | 0008 |
| 0000515740 | 0166 | 13CE | 0000 | 0000 | 0004 | 0000 | 0000 | 0000 |
| 0000515760 | 0000 | 0000 | 662E | 6C69 | 0065 | 0000 | 13D6 | 0000 |
| 0000516000 | FFFE | 0000 | 0167 | 7067 | 615F | 696F | 632E | 0000 |
| 0000516020 | 0000 | 0000 | 0000 | 0000 | 662E | 6C69 | 0065 | 0000 |
| 0000516040 | 13E0 | 0000 | FFFE | 0000 | 0167 | 7473 | 6C64 | 6269 |
| 0000516060 | 682E | 0000 | 0000 | 0000 | 0000 | 0000 | 322E | 6166 |
| 0000516100 | 656B | 0000 | 0000 | 0000 | FFFE | 0008 | 010A | 0000 |
| 0000516120 | 0000 | 0000 | 0040 | 0000 | 0000 | 13E0 | 0000 | 0000 |
| 0000516140 | 715F | 6F75 | 0074 | 0000 | 0000 | 0000 | FFFF | 0004 |
| 0000516160 | 0108 | 0000 | 0000 | 0000 | 0020 | 0000 | 0000 | 0000 |
| 0000516200 | 0000 | 0000 | 725F | 6D65 | 0000 | 0000 | 0020 | 0000 |
| 0000516220 | FFFF | 0004 | 0108 | 0000 | 0000 | 0000 | 0020 | 0000 |
| 0000516240 | 0000 | 0000 | 0000 | 0000 | 652E | 736F | 0000 | 0000 |
| 0000516260 | 0000 | 0000 | FFFE | 0008 | 0166 | 13D8 | 0000 | 0000 |
| 0000516300 | 0040 | 0000 | 0000 | 0000 | 0000 | 0000 | 662E | 6C69 |
| 0000516320 | 0065 | 0000 | 13E2 | 0000 | FFFE | 0000 | 0167 | 7067 |
| 0000516340 | 615F | 696F | 632E | 0000 | 0000 | 0000 | 0000 | 0000 |
| 0000516360 | 662E | 6C69 | 0065 | 0000 | 13E4 | 0000 | FFFE | 0000 |
| 0000516400 | 0167 | 7974 | 6570 | 6564 | 2E66 | 0068 | 0000 | 0000 |
| 0000516420 | 0000 | 0000 | 662E | 6C69 | 0065 | 0000 | 13E6 | 0000 |
| 0000516440 | FFFE | 0000 | 0167 | 7067 | 615F | 696F | 632E | 0000 |
| 0000516460 | 0000 | 0000 | 0000 | 0000 | 662E | 6C69 | 0065 | 0000 |
| 0000516500 | 13E8 | 0000 | FFFE | 0000 | 0167 | 7367 | 7370 | 7379 |
| 0000516520 | 682E | 0000 | 0000 | 0000 | 0000 | 0000 | 662E | 6C69 |
| 0000516540 | 0065 | 0000 | 13EA | 0000 | FFFE | 0000 | 0167 | 7367 |
| 0000516560 | 7370 | 7379 | 692E | 636E | 0000 | 0000 | 0000 | 0000 |
| 0000516600 | 662E | 6C69 | 0065 | 0000 | 13EC | 0000 | FFFE | 0000 |
| 0000516620 | 0167 | 7367 | 7370 | 7379 | 682E | 0000 | 0000 | 0000 |
| 0000516640 | 0000 | 0000 | 662E | 6C69 | 0065 | 0000 | 13EE | 0000 |
| 0000516660 | FFFE | 0000 | 0167 | 7067 | 615F | 696F | 632E | 0000 |
| 0000516700 | 0000 | 0000 | 0000 | 0000 | 662E | 6C69 | 0065 | 0000 |
| 0000516720 | 14CA | 0000 | FFFE | 0000 | 0167 | 7367 | 6370 | 6766 |
| 0000516740 | 682E | 0000 | 0000 | 0000 | 0000 | 0000 | 0000 | 0000 |
| 0000516760 | 29C3 | 0000 | 0000 | 0000 | FFFE | 000A | 010F | 0000 |
| 0000517000 | 0000 | 0000 | 0002 | 0000 | 0000 | 13FA | 0000 | 0000 |
| 0000517020 | 4F5F | 454E | 315F | 0036 | 0000 | 0000 | FFFF | 000B |
| 0000517040 | 0110 | 0000 | 0000 | 0000 | 0002 | 0000 | 0000 | 0000 |
| 0000517060 | 0000 | 0000 | 545F | 4F57 | 385F | 0000 | 0001 | 0000 |
| 0000517100 | FFFF | 000B | 0110 | 0000 | 0000 | 0000 | 0002 | 0000 |
| 0000517120 | 0000 | 0000 | 0000 | 0000 | 465F | 554F | 5F52 | 0034 |
| 0000517140 | 0002 | 0000 | FFFF | 000B | 0110 | 0000 | 0000 | 0000 |
| 0000517160 | 0002 | 0000 | 0000 | 0000 | 0000 | 0000 | 652E | 736F |
| 0000517200 | 0000 | 0000 | 0000 | 0000 | FFFE | 000A | 0166 | 13F0 |
| 0000517220 | 0000 | 0000 | 0002 | 0000 | 0000 | 0000 | 0000 | 0000 |
| 0000517240 | 635F | 726C | 655F | 7272 | 0000 | 0000 | FFFE | 000A |
| 0000517260 | 010F | 0000 | 0000 | 0000 | 0001 | 0000 | 0000 | 1402 |
| 0000517300 | 0000 | 0000 | 4E5F | 5F4F | 4C43 | 0052 | 0000 | 0000 |
| 0000517320 | FFFF | 000B | 0110 | 0000 | 0000 | 0000 | 0001 | 0000 |
| 0000517340 | 0000 | 0000 | 0000 | 0000 | 435F | 524C | 0000 | 0000 |
| 0000517360 | 0001 | 0000 | FFFF | 000B | 0110 | 0000 | 0000 | 0000 |
| 0000517400 | 0001 | 0000 | 0000 | 0000 | 0000 | 0000 | 652E | 736F |
| 0000517420 | 0000 | 0000 | 0000 | 0000 | FFFE | 000A | 0166 | 13FA |

THU MAR 14 17:37:32 1991 GSPMON.4 PAGE 183, LINE 10739

| | | | | | | | | |
|---|---|---|---|---|---|---|---|---|
| 0000517440 | 0000 | 0000 | 0001 | 0000 | 0000 | 0000 | 0000 | 0000 |
| 0000517460 | 0000 | 0000 | 29CD | 0000 | 0000 | 0000 | FFFE | 000A |
| 0000517500 | 010F | 0000 | 0000 | 0000 | 0003 | 0000 | 0000 | 1410 |
| 0000517520 | 0000 | 0000 | 505F | 414C | 454E | 0030 | 0000 | 0000 |
| 0000517540 | FFFF | 000B | 0110 | 0000 | 0000 | 0000 | 0003 | 0000 |
| 0000517560 | 0000 | 0000 | 0000 | 0000 | 505F | 414C | 454E | 0032 |
| 0000517600 | 0001 | 0000 | FFFF | 000B | 0110 | 0000 | 0000 | 0000 |
| 0000517620 | 0003 | 0000 | 0000 | 0000 | 0000 | 0000 | 505F | 414C |
| 0000517640 | 454E | 0031 | 0002 | 0000 | FFFF | 000B | 0110 | 0000 |
| 0000517660 | 0000 | 0000 | 0003 | 0000 | 0000 | 0000 | 0000 | 0000 |
| 0000517700 | 505F | 414C | 454E | 0033 | 0003 | 0000 | FFFF | 000B |
| 0000517720 | 0110 | 0000 | 0000 | 0000 | 0003 | 0000 | 0000 | 0000 |
| 0000517740 | 0000 | 0000 | 4E5F | 504F | 414C | 454E | 0004 | 0000 |
| 0000517760 | FFFF | 000B | 0110 | 0000 | 0000 | 0000 | 0003 | 0000 |
| 0000520000 | 0000 | 0000 | 0000 | 0000 | 652E | 736F | 0000 | 0000 |
| 0000520020 | 0000 | 0000 | FFFE | 000A | 0166 | 1402 | 0000 | 0000 |
| 0000520040 | 0003 | 0000 | 0000 | 0000 | 0000 | 0000 | 0000 | 0000 |
| 0000520060 | 29D8 | 0000 | 0000 | 0000 | FFFE | 000A | 010F | 0000 |
| 0000520100 | 0000 | 0000 | 0001 | 0000 | 0000 | 1418 | 0000 | 0000 |
| 0000520120 | 4E5F | 5F4F | 4944 | 5053 | 0000 | 0000 | FFFF | 000B |
| 0000520140 | 0110 | 0000 | 0000 | 0000 | 0001 | 0000 | 0000 | 0000 |
| 0000520160 | 0000 | 0000 | 445F | 5349 | 0050 | 0000 | 0001 | 0000 |
| 0000520200 | FFFF | 000B | 0110 | 0000 | 0000 | 0000 | 0001 | 0000 |
| 0000520220 | 0000 | 0000 | 0000 | 0000 | 652E | 736F | 0000 | 0000 |
| 0000520240 | 0000 | 0000 | FFFE | 000A | 0166 | 1410 | 0000 | 0000 |
| 0000520260 | 0001 | 0000 | 0000 | 0000 | 0000 | 0000 | 665F | 5F62 |
| 0000520300 | 6E65 | 0000 | 0000 | 0000 | FFFE | 000A | 010F | 0000 |
| 0000520320 | 0000 | 0000 | 0001 | 0000 | 0000 | 1420 | 0000 | 0000 |
| 0000520340 | 0000 | 0000 | 29E2 | 0000 | 0000 | 0000 | FFFF | 000B |
| 0000520360 | 0110 | 0000 | 0000 | 0000 | 0001 | 0000 | 0000 | 0000 |
| 0000520400 | 0000 | 0000 | 0000 | 0000 | 29ED | 0000 | 0001 | 0000 |
| 0000520420 | FFFF | 000B | 0110 | 0000 | 0000 | 0000 | 0001 | 0000 |
| 0000520440 | 0000 | 0000 | 0000 | 0000 | 652E | 736F | 0000 | 0000 |
| 0000520460 | 0000 | 0000 | FFFE | 000A | 0166 | 1418 | 0000 | 0000 |
| 0000520500 | 0001 | 0000 | 0000 | 0000 | 0000 | 0000 | 7A5F | 7265 |
| 0000520520 | 5F6F | 0062 | 0000 | 0000 | FFFE | 000A | 010F | 0000 |
| 0000520540 | 0000 | 0000 | 0001 | 0000 | 0000 | 1428 | 0000 | 0000 |
| 0000520560 | 0000 | 0000 | 29F7 | 0000 | 0000 | 0000 | FFFF | 000B |
| 0000520600 | 0110 | 0000 | 0000 | 0000 | 0001 | 0000 | 0000 | 0000 |
| 0000520620 | 0000 | 0000 | 0000 | 0000 | 2A03 | 0000 | 0001 | 0000 |
| 0000520640 | FFFF | 000B | 0110 | 0000 | 0000 | 0000 | 0001 | 0000 |
| 0000520660 | 0000 | 0000 | 0000 | 0000 | 652E | 736F | 0000 | 0000 |
| 0000520700 | 0000 | 0000 | FFFE | 000A | 0166 | 1420 | 0000 | 0000 |
| 0000520720 | 0001 | 0000 | 0000 | 0000 | 0000 | 0000 | 7A5F | 7265 |
| 0000520740 | 5F6F | 0061 | 0000 | 0000 | FFFE | 000A | 010F | 0000 |
| 0000520760 | 0000 | 0000 | 0001 | 0000 | 0000 | 1430 | 0000 | 0000 |
| 0000521000 | 0000 | 0000 | 2A0D | 0000 | 0000 | 0000 | FFFF | 000B |
| 0000521020 | 0110 | 0000 | 0000 | 0000 | 0001 | 0000 | 0000 | 0000 |
| 0000521040 | 0000 | 0000 | 0000 | 0000 | 2A19 | 0000 | 0001 | 0000 |
| 0000521060 | FFFF | 000B | 0110 | 0000 | 0000 | 0000 | 0001 | 0000 |
| 0000521100 | 0000 | 0000 | 0000 | 0000 | 652E | 736F | 0000 | 0000 |
| 0000521120 | 0000 | 0000 | FFFE | 000A | 0166 | 1428 | 0000 | 0000 |
| 0000521140 | 0001 | 0000 | 0000 | 0000 | 0000 | 0000 | 0000 | 0000 |
| 0000521160 | 2A23 | 0000 | 0000 | 0000 | FFFE | 000A | 010F | 0000 |
| 0000521200 | 0000 | 0000 | 0002 | 0000 | 0000 | 143C | 0000 | 0000 |
| 0000521220 | 0000 | 0000 | 2A2D | 0000 | 0000 | 0000 | FFFF | 000B |
| 0000521240 | 0110 | 0000 | 0000 | 0000 | 0002 | 0000 | 0000 | 0000 |
| 0000521260 | 0000 | 0000 | 0000 | 0000 | 2A37 | 0000 | 0001 | 0000 |
| 0000521300 | FFFF | 000B | 0110 | 0000 | 0000 | 0000 | 0002 | 0000 |

THU MAR 14 17:37:32 1991 GSPMON.4 PAGE 184, LINE 10798

| | | | | | | | | |
|---|---|---|---|---|---|---|---|---|
| 0000521320 | 0000 | 0000 | 0000 | 0000 | 0000 | 0000 | 2A41 | 0000 |
| 0000521340 | 0002 | 0000 | FFFF | 000B | 0110 | 0000 | 0000 | 0000 |
| 0000521360 | 0002 | 0000 | 0000 | 0000 | 0000 | 0000 | 0000 | 0000 |
| 0000521400 | 2A4B | 0000 | 0003 | 0000 | FFFF | 000B | 0110 | 0000 |
| 0000521420 | 0000 | 0000 | 0002 | 0000 | 0000 | 0000 | 0000 | 0000 |
| 0000521440 | 652E | 736F | 0000 | 0000 | 0000 | 0000 | FFFE | 000A |
| 0000521460 | 0166 | 1430 | 0000 | 0000 | 0002 | 0000 | 0000 | 0000 |
| 0000521500 | 0000 | 0000 | 615F | 756C | 665F | 636E | 0000 | 0000 |
| 0000521520 | FFFE | 000A | 010F | 0000 | 0000 | 0000 | 0003 | 0000 |
| 0000521540 | 0000 | 1450 | 0000 | 0000 | 435F | 454C | 5241 | 0000 |
| 0000521560 | 0000 | 0000 | FFFF | 000B | 0110 | 0000 | 0000 | 0000 |
| 0000521600 | 0003 | 0000 | 0000 | 0000 | 0000 | 0000 | 425F | 494D |
| 0000521620 | 554E | 4153 | 0001 | 0000 | FFFF | 000B | 0110 | 0000 |
| 0000521640 | 0000 | 0000 | 0003 | 0000 | 0000 | 0000 | 0000 | 0000 |
| 0000521660 | 415F | 494D | 554E | 4253 | 0002 | 0000 | FFFF | 000B |
| 0000521700 | 0110 | 0000 | 0000 | 0000 | 0003 | 0000 | 0000 | 0000 |
| 0000521720 | 0000 | 0000 | 505F | 554C | 0053 | 0000 | 0003 | 0000 |
| 0000521740 | FFFF | 000B | 0110 | 0000 | 0000 | 0000 | 0003 | 0000 |
| 0000521760 | 0000 | 0000 | 0000 | 0000 | 585F | 524F | 0000 | 0000 |
| 0000522000 | 0004 | 0000 | FFFF | 000B | 0110 | 0000 | 0000 | 0000 |
| 0000522020 | 0003 | 0000 | 0000 | 0000 | 0000 | 0000 | 4F5F | 0052 |
| 0000522040 | 0000 | 0000 | 0005 | 0000 | FFFF | 000B | 0110 | 0000 |
| 0000522060 | 0000 | 0000 | 0003 | 0000 | 0000 | 0000 | 0000 | 0000 |
| 0000522100 | 415F | 444E | 0000 | 0000 | 0006 | 0000 | FFFF | 000B |
| 0000522120 | 0110 | 0000 | 0000 | 0000 | 0003 | 0000 | 0000 | 0000 |
| 0000522140 | 0000 | 0000 | 505F | 4552 | 4553 | 0054 | 0007 | 0000 |
| 0000522160 | FFFF | 000B | 0110 | 0000 | 0000 | 0000 | 0003 | 0000 |
| 0000522200 | 0000 | 0000 | 0000 | 0000 | 652E | 736F | 0000 | 0000 |
| 0000522220 | 0000 | 0000 | FFFE | 000A | 0166 | 143C | 0000 | 0000 |
| 0000522240 | 0003 | 0000 | 0000 | 0000 | 0000 | 0000 | 615F | 756C |
| 0000522260 | 635F | 7972 | 0000 | 0000 | FFFE | 000A | 010F | 0000 |
| 0000522300 | 0000 | 0000 | 0001 | 0000 | 0000 | 1458 | 0000 | 0000 |
| 0000522320 | 5A5F | 5245 | 004F | 0000 | 0000 | 0000 | FFFF | 000B |
| 0000522340 | 0110 | 0000 | 0000 | 0000 | 0001 | 0000 | 0000 | 0000 |
| 0000522360 | 0000 | 0000 | 4F5F | 454E | 0000 | 0000 | 0001 | 0000 |
| 0000522400 | FFFF | 000B | 0110 | 0000 | 0000 | 0000 | 0001 | 0000 |
| 0000522420 | 0000 | 0000 | 0000 | 0000 | 652E | 736F | 0000 | 0000 |
| 0000522440 | 0000 | 0000 | FFFE | 000A | 0166 | 1450 | 0000 | 0000 |
| 0000522460 | 0001 | 0000 | 0000 | 0000 | 0000 | 0000 | 0000 | 0000 |
| 0000522500 | 2A55 | 0000 | 0000 | 0000 | FFFE | 000A | 010F | 0000 |
| 0000522520 | 0000 | 0000 | 0001 | 0000 | 0000 | 1460 | 0000 | 0000 |
| 0000522540 | 0000 | 0000 | 2A61 | 0000 | 0000 | 0000 | FFFF | 000B |
| 0000522560 | 0110 | 0000 | 0000 | 0000 | 0001 | 0000 | 0000 | 0000 |
| 0000522600 | 0000 | 0000 | 0000 | 0000 | 2A6E | 0000 | 0001 | 0000 |
| 0000522620 | FFFF | 000B | 0110 | 0000 | 0000 | 0000 | 0001 | 0000 |
| 0000522640 | 0000 | 0000 | 0000 | 0000 | 652E | 736F | 0000 | 0000 |
| 0000522660 | 0000 | 0000 | FFFE | 000A | 0166 | 1458 | 0000 | 0000 |
| 0000522700 | 0001 | 0000 | 0000 | 0000 | 0000 | 0000 | 0000 | 0000 |
| 0000522720 | 2A7A | 0000 | 0000 | 0000 | FFFE | 000A | 010F | 0000 |
| 0000522740 | 0000 | 0000 | 0001 | 0000 | 0000 | 1468 | 0000 | 0000 |
| 0000522760 | 4D5F | 5341 | 5F4B | 4E45 | 0000 | 0000 | FFFF | 000B |
| 0000523000 | 0110 | 0000 | 0000 | 0000 | 0001 | 0000 | 0000 | 0000 |
| 0000523020 | 0000 | 0000 | 0000 | 0000 | 2A87 | 0000 | 0001 | 0000 |
| 0000523040 | FFFF | 000B | 0110 | 0000 | 0000 | 0000 | 0001 | 0000 |
| 0000523060 | 0000 | 0000 | 0000 | 0000 | 652E | 736F | 0000 | 0000 |
| 0000523100 | 0000 | 0000 | FFFE | 000A | 0166 | 1460 | 0000 | 0000 |
| 0000523120 | 0001 | 0000 | 0000 | 0000 | 0000 | 0000 | 0000 | 0000 |
| 0000523140 | 2A91 | 0000 | 0000 | 0000 | FFFE | 000A | 010F | 0000 |
| 0000523160 | 0000 | 0000 | 0001 | 0000 | 0000 | 1470 | 0000 | 0000 |

THU MAR 14 17:37:32 1991 GSPMON.4 PAGE 185, LINE 10857

| | | | | | | | | |
|---|---|---|---|---|---|---|---|---|
| 0000523200 | 0000 | 0000 | 2A9C | 0000 | 0000 | 0000 | FFFF | 000B |
| 0000523220 | 0110 | 0000 | 0000 | 0000 | 0001 | 0000 | 0000 | 0000 |
| 0000523240 | 0000 | 0000 | 0000 | 0000 | 2AA6 | 0000 | 0001 | 0000 |
| 0000523260 | FFFF | 000B | 0110 | 0000 | 0000 | 0000 | 0001 | 0000 |
| 0000523300 | 0000 | 0000 | 0000 | 0000 | 652E | 736F | 0000 | 0000 |
| 0000523320 | 0000 | 0000 | FFFE | 000A | 0166 | 1468 | 0000 | 0000 |
| 0000523340 | 0001 | 0000 | 0000 | 0000 | 0000 | 0000 | 0000 | 0000 |
| 0000523360 | 2AB1 | 0000 | 0000 | 0000 | FFFE | 000A | 010F | 0000 |
| 0000523400 | 0000 | 0000 | 0001 | 0000 | 0000 | 1478 | 0000 | 000C |
| 0000523420 | 0000 | 0000 | 2ABC | 0000 | 0000 | 0000 | FFFF | 000B |
| 0000523440 | 0110 | 0000 | 0000 | 0000 | 0001 | 0000 | 0000 | 0000 |
| 0000523460 | 0060 | 0000 | 0000 | 0000 | 2AC7 | 0000 | 0001 | 0000 |
| 0000523500 | FFFF | 000B | 0110 | 0000 | 0000 | 0000 | 0001 | 0000 |
| 0000523520 | 0000 | 0000 | 0000 | 0000 | 652E | 736F | 0000 | 0000 |
| 0000523540 | 0000 | 0000 | FFFE | 000A | 0166 | 1470 | 0000 | 0000 |
| 0000523560 | 0001 | 0000 | 0000 | 0000 | 0000 | 0000 | 6D5F | 5F62 |
| 0000523600 | 7566 | 636E | 0000 | 0000 | FFFE | 000A | 010F | 0000 |
| 0000523620 | 0000 | 0000 | 0002 | 0000 | 0000 | 1484 | 0000 | 0000 |
| 0000523640 | 0000 | 0000 | 2AD1 | 0000 | 0000 | 0000 | FFFF | 000B |
| 0000523660 | 0110 | 0000 | 0000 | 0000 | 0002 | 0000 | 0000 | 0000 |
| 0000523700 | 0000 | 0000 | 4D5F | 5F42 | 5845 | 5257 | 0001 | 0000 |
| 0000523720 | FFFF | 000B | 0110 | 0000 | 0000 | 0000 | 0002 | 0000 |
| 0000523740 | 0000 | 0000 | 0000 | 0000 | 4D5F | 5F42 | 4552 | 4441 |
| 0000523760 | 0002 | 0000 | FFFF | 000B | 0110 | 0000 | 0000 | 0000 |
| 0000524000 | 0002 | 0000 | 0000 | 0000 | 0000 | 0000 | 4D5F | 5F42 |
| 0000524020 | 504F | 4E45 | 0003 | 0000 | FFFF | 000B | 0110 | 0000 |
| 0000524040 | 0000 | 0000 | 0002 | 0000 | 0000 | 0000 | 0000 | 0000 |
| 0000524060 | 652E | 736F | 0000 | 0000 | 0000 | 0000 | FFFE | 000A |
| 0000524100 | 0166 | 1478 | 0000 | 0000 | 0002 | 0000 | 0000 | 0000 |
| 0000524120 | 0000 | 0000 | 0000 | 0000 | 2ADB | 0000 | 0000 | 0000 |
| 0000524140 | FFFE | 000A | 010F | 0000 | 0000 | 0000 | 0002 | 0000 |
| 0000524160 | 0000 | 148E | 0000 | 0000 | 0000 | 0000 | 2AE5 | 0000 |
| 0000524200 | 0000 | 0000 | FFFF | 000B | 0110 | 0000 | 0000 | 0000 |
| 0000524220 | 0002 | 0000 | 0000 | 0000 | 0000 | 0000 | 0000 | 0000 |
| 0000524240 | 2AF1 | 0000 | 0001 | 0000 | FFFF | 000B | 0110 | 0000 |
| 0000524260 | 0000 | 0000 | 0002 | 0000 | 0000 | 0000 | 0000 | 0000 |
| 0000524300 | 4D5F | 3442 | 525F | 0044 | 0003 | 0000 | FFFF | 000B |
| 0000524320 | 0110 | 0000 | 0000 | 0000 | 0002 | 0000 | 0000 | 0000 |
| 0000524340 | 0000 | 0000 | 652E | 736F | 0000 | 0000 | 0000 | 0000 |
| 0000524360 | FFFE | 000A | 0166 | 1484 | 0000 | 0000 | 0002 | 0000 |
| 0000524400 | 0000 | 0000 | 0000 | 0000 | 0000 | 0000 | 2AFC | 0000 |
| 0000524420 | 0000 | 0000 | FFFE | 000A | 010F | 0000 | 0000 | 0000 |
| 0000524440 | 0002 | 0000 | 0000 | 1496 | 0000 | 0000 | 4D5F | 3542 |
| 0000524460 | 575F | 0052 | 0000 | 0000 | FFFF | 000B | 0110 | 0000 |
| 0000524500 | 0000 | 0000 | 0002 | 0000 | 0000 | 0000 | 0000 | 0000 |
| 0000524520 | 4D5F | 3542 | 525F | 0044 | 0003 | 0000 | FFFF | 000B |
| 0000524540 | 0110 | 0000 | 0000 | 0000 | 0002 | 0000 | 0000 | 0000 |
| 0000524560 | 0000 | 0000 | 652E | 736F | 0000 | 0000 | 0000 | 0000 |
| 0000524600 | FFFE | 000A | 0166 | 148E | 0000 | 0000 | 0002 | 0000 |
| 0000524620 | 0000 | 0000 | 0000 | 0000 | 0000 | 0000 | 2B06 | 0000 |
| 0000524640 | 0000 | 0000 | FFFE | 000A | 010F | 0000 | 0000 | 0000 |
| 0000524660 | 0001 | 0000 | 0000 | 149E | 0000 | 0000 | 0000 | 0000 |
| 0000524700 | 2B12 | 0000 | 0000 | 0000 | FFFF | 000B | 0110 | 0000 |
| 0000524720 | 0000 | 0000 | 0001 | 0000 | 0000 | 0000 | 0000 | 0000 |
| 0000524740 | 0000 | 0000 | 2B1D | 0000 | 0001 | 0000 | FFFF | 000B |
| 0000524760 | 0110 | 0000 | 0000 | 0000 | 0001 | 0000 | 0000 | 0000 |
| 0000525000 | 0000 | 0000 | 652E | 736F | 0000 | 0000 | 0000 | 0000 |
| 0000525020 | FFFE | 000A | 0166 | 1496 | 0000 | 0000 | 0001 | 0000 |
| 0000525040 | 0000 | 0000 | 0000 | 0000 | 0000 | 0000 | 2B27 | 0000 |

THU MAR 14 17:37:32 1991 GSPMON.4 PAGE 186, LINE 10916

| | | | | | | | | |
|---|---|---|---|---|---|---|---|---|
| 0000525060 | 0000 | 0000 | FFFE | 000A | 010F | 0000 | 0000 | 0000 |
| 0000525100 | 0001 | 0000 | 0000 | 14A6 | 0000 | 0000 | 0000 | 0000 |
| 0000525120 | 2B34 | 0000 | 0000 | 0000 | FFFF | 000B | 0110 | 0000 |
| 0000525140 | 0000 | 0000 | 0001 | 0000 | 0000 | 0000 | 0000 | 0000 |
| 0000525160 | 0000 | 0000 | 2B40 | 0000 | 0001 | 0000 | FFFF | 000B |
| 0000525200 | 0110 | 0000 | 0000 | 0000 | 0001 | 0000 | 0000 | 0000 |
| 0000525220 | 0000 | 0000 | 652E | 736F | 0000 | 0000 | 0000 | 0000 |
| 0000525240 | FFFE | 000A | 0166 | 149E | 0000 | 0000 | 0001 | 0000 |
| 0000525260 | 0000 | 0000 | 0000 | 0000 | 0000 | 0000 | 2B4D | 0000 |
| 0000525300 | 0000 | 0000 | FFFE | 000A | 010F | 0000 | 0000 | 0000 |
| 0000525320 | 0003 | 0000 | 0000 | 14B6 | 0000 | 0000 | 585F | 424D |
| 0000525340 | 0030 | 0000 | 0000 | 0000 | FFFF | 000B | 0110 | 0000 |
| 0000525360 | 0000 | 0000 | 0003 | 0000 | 0000 | 0000 | 0000 | 0000 |
| 0000525400 | 585F | 424D | 0031 | 0000 | 0001 | 0000 | FFFF | 000B |
| 0000525420 | 0110 | 0000 | 0000 | 0000 | 0003 | 0000 | 0000 | 0000 |
| 0000525440 | 0000 | 0000 | 585F | 424D | 0032 | 0000 | 0002 | 0000 |
| 0000525460 | FFFF | 000B | 0110 | 0000 | 0000 | 0000 | 0003 | 0000 |
| 0000525500 | 0000 | 0000 | 0000 | 0000 | 585F | 424D | 0033 | 0000 |
| 0000525520 | 0003 | 0000 | FFFF | 000B | 0110 | 0000 | 0000 | 0000 |
| 0000525540 | 0003 | 0000 | 0000 | 0000 | 0000 | 0000 | 585F | 424D |
| 0000525560 | 0034 | 0000 | 0004 | 0000 | FFFF | 000B | 0110 | 0000 |
| 0000525600 | 0000 | 0000 | 0003 | 0000 | 0000 | 0000 | 0000 | 0000 |
| 0000525620 | 585F | 424D | 0035 | 0000 | 0005 | 0000 | FFFF | 000B |
| 0000525640 | 0110 | 0000 | 0000 | 0000 | 0003 | 0000 | 0000 | 0000 |
| 0000525660 | 0000 | 0000 | 652E | 736F | 0000 | 0000 | 0000 | 0000 |
| 0000525700 | FFFE | 000A | 0166 | 14A6 | 0000 | 0000 | 0003 | 0000 |
| 0000525720 | 0000 | 0000 | 0000 | 0000 | 635F | 6E68 | 006C | 0000 |
| 0000525740 | 0000 | 0000 | FFFE | 000A | 010F | 0000 | 0000 | 0000 |
| 0000525760 | 0002 | 0000 | 0000 | 14C2 | 0000 | 0000 | 525F | 4445 |
| 0000526000 | 435F | 0048 | 0000 | 0000 | FFFF | 000B | 0110 | 0000 |
| 0000526020 | 0000 | 0000 | 0002 | 0000 | 0000 | 0000 | 0000 | 0000 |
| 0000526040 | 0000 | 0000 | 2B57 | 0000 | 0001 | 0000 | FFFF | 000B |
| 0000526060 | 0110 | 0000 | 0000 | 0000 | 0002 | 0000 | 0000 | 0000 |
| 0000526100 | 0000 | 0000 | 425F | 554C | 5F45 | 4843 | 0002 | 0000 |
| 0000526120 | FFFF | 000B | 0110 | 0000 | 0000 | 0000 | 0002 | 0000 |
| 0000526140 | 0000 | 000C | 0000 | 0000 | 0000 | 0000 | 2B61 | 0000 |
| 0000526160 | 0003 | 0000 | FFFF | 000B | 0110 | 0000 | 0000 | 0000 |
| 0000526200 | 0002 | 0000 | 0000 | 0000 | 0000 | 0000 | 652E | 736F |
| 0000526220 | 0000 | 0000 | 0000 | 0000 | FFFE | 000A | 0166 | 14B6 |
| 0000526240 | 0000 | 0000 | 0002 | 0000 | 0000 | 0000 | 0000 | 0000 |
| 0000526260 | 0000 | 0000 | 2B6D | 0000 | 0000 | 0000 | FFFE | 000A |
| 0000526300 | 010F | 0000 | 0000 | 0000 | 0001 | 0000 | 0000 | 14CA |
| 0000526320 | 0000 | 0000 | 0000 | 0000 | 2B77 | 0000 | 0000 | 0000 |
| 0000526340 | FFFF | 000B | 0110 | 0000 | 0000 | 0000 | 0001 | 0000 |
| 0000526360 | 0000 | 0000 | 0000 | 0000 | 435F | 4359 | 494C | 0043 |
| 0000526400 | 0001 | 0000 | FFFF | 000B | 0110 | 0000 | 0000 | 0000 |
| 0000526420 | 0001 | 0000 | 0000 | 0000 | 0000 | 0000 | 652E | 736F |
| 0000526440 | 0000 | 0000 | 0000 | 0000 | FFFE | 000A | 0166 | 14C2 |
| 0000526460 | 0000 | 0000 | 0001 | 0000 | 0000 | 0000 | 0000 | 0000 |
| 0000526500 | 662E | 6C69 | 0065 | 0000 | 14CC | 0000 | FFFE | 0000 |
| 0000526520 | 0167 | 7067 | 615F | 696F | 632E | 0000 | 0000 | 0000 |
| 0000526540 | 0000 | 0000 | 662E | 6C69 | 0065 | 0000 | 14CE | 0000 |
| 0000526560 | FFFE | 0000 | 0167 | 7367 | 6870 | 6477 | 682E | 0000 |
| 0000526600 | 0000 | 0000 | 0000 | 0000 | 662E | 6C69 | 0065 | 0000 |
| 0000526620 | 14D0 | 0000 | FFFE | 0000 | 0167 | 7067 | 615F | 696F |
| 0000526640 | 632E | 0000 | 0000 | 0000 | 0000 | 0000 | 662E | 6C69 |
| 0000526660 | 0065 | 0000 | 1594 | 0000 | FFFE | 0000 | 0167 | 7067 |
| 0000526700 | 705F | 6275 | 682E | 0000 | 0000 | 0000 | 0000 | 0000 |
| 0000526720 | 332E | 6166 | 656B | 0000 | 0000 | 0000 | FFFE | 0008 |

THU MAR 14 17:37:32 1991 GSPMON.4 PAGE 187, LINE 10975

| | | | | | | | | |
|---|---|---|---|---|---|---|---|---|
| 0000526740 | 010A | 0000 | 0000 | 0000 | 01C0 | 0000 | 0000 | 1502 |
| 0000526760 | 0000 | 0000 | 685F | 7365 | 6E79 | 0063 | 0000 | 0000 |
| 0000527000 | FFFF | 000D | 0108 | 0000 | 0000 | 0000 | 0010 | 0000 |
| 0000527020 | 0000 | 0000 | 0000 | 0000 | 685F | 6265 | 6E6C | 006B |
| 0000527040 | 0010 | 0000 | FFFF | 000D | 0108 | 0000 | 0000 | 0000 |
| 0000527060 | 0010 | 0000 | 0000 | 0000 | 0000 | 0000 | 685F | 6273 |
| 0000527100 | 6E6C | 006B | 0020 | 0000 | FFFF | 000D | 0108 | 0000 |
| 0000527120 | 0000 | 0000 | 0010 | 0000 | 0000 | 0000 | 0000 | 0000 |
| 0000527140 | 765F | 7365 | 6E79 | 0063 | 0030 | 0000 | FFFF | 000D |
| 0000527160 | 0108 | 0000 | 0000 | 0000 | 0010 | 0000 | 0000 | 0000 |
| 0000527200 | 0000 | 0000 | 765F | 6265 | 6E6C | 006B | 0040 | 0000 |
| 0000527220 | FFFF | 000D | 0108 | 0000 | 0000 | 0000 | 0010 | 0000 |
| 0000527240 | 0000 | 0000 | 0000 | 0000 | 765F | 6273 | 6E6C | 006B |
| 0000527260 | 0050 | 0000 | FFFF | 000D | 0108 | 0000 | 0000 | 0000 |
| 0000527300 | 0010 | 0000 | 0000 | 0000 | 0000 | 0000 | 0000 | 0000 |
| 0000527320 | 2B81 | 0000 | 0060 | 0000 | FFFF | 000D | 0108 | 0000 |
| 0000527340 | 0000 | 0000 | 0010 | 0000 | 0000 | 0000 | 0000 | 0000 |
| 0000527360 | 665F | 6468 | 7369 | 0070 | 0070 | 0000 | FFFF | 000D |
| 0000527400 | 0108 | 0000 | 0000 | 0000 | 0010 | 0000 | 0000 | 0000 |
| 0000527420 | 0000 | 0000 | 6D5F | 5F62 | 6973 | 657A | 0080 | 0000 |
| 0000527440 | FFFF | 000F | 0108 | 0000 | 0000 | 0000 | 0020 | 0000 |
| 0000527460 | 0000 | 0000 | 0000 | 0000 | 0000 | 0000 | 2B8C | 0000 |
| 0000527500 | 00A0 | 0000 | FFFF | 000D | 0108 | 0000 | 0000 | 0000 |
| 0000527520 | 0010 | 0000 | 0000 | 0000 | 0000 | 0000 | 0000 | 0000 |
| 0000527540 | 2B96 | 0000 | 00B0 | 0000 | FFFF | 000D | 0108 | 0000 |
| 0000527560 | 0000 | 0000 | 0010 | 0000 | 0000 | 0000 | 0000 | 0000 |
| 0000527600 | 0000 | 0000 | 2BA0 | 0000 | 00C0 | 0000 | FFFF | 000D |
| 0000527620 | 0108 | 0000 | 0000 | 0000 | 0010 | 0000 | 0000 | 0000 |
| 0000527640 | 0000 | 0000 | 0000 | 0000 | 2BAB | 0000 | 00D0 | 0000 |
| 0000527660 | FFFF | 000D | 0108 | 0000 | 0000 | 0000 | 0010 | 0000 |
| 0000527700 | 0000 | 0000 | 0000 | 0000 | 0000 | 0000 | 2BB5 | 0000 |
| 0000527720 | 00E0 | 0000 | FFFF | 000F | 0108 | 0000 | 0000 | 0000 |
| 0000527740 | 0020 | 0000 | 0000 | 0000 | 0000 | 0000 | 0000 | 0000 |
| 0000527760 | 2BC2 | 0000 | 0100 | 0000 | FFFF | 000F | 0108 | 0000 |
| 0000530000 | 0000 | 0000 | 0020 | 0000 | 0000 | 0000 | 0000 | 0000 |
| 0000530020 | 0000 | 0000 | 2BD4 | 0000 | 0120 | 0000 | FFFF | 000F |
| 0000530040 | 0108 | 0000 | 0000 | 0000 | 0020 | 0000 | 0000 | 0000 |
| 0000530060 | 0000 | 0000 | 0000 | 0000 | 2BE3 | 0000 | 0140 | 0000 |
| 0000530100 | FFFF | 000F | 0108 | 0000 | 0000 | 0000 | 0020 | 0000 |
| 0000530120 | 0000 | 0000 | 0000 | 0000 | 0000 | 0000 | 2BF9 | 0000 |
| 0000530140 | 0160 | 0000 | FFFF | 000D | 0108 | 0000 | 0000 | 0000 |
| 0000530160 | 0010 | 0000 | 0000 | 0000 | 0000 | 0000 | 0000 | 0000 |
| 0000530200 | 2C04 | 0000 | 0170 | 0000 | FFFF | 000D | 0108 | 0000 |
| 0000530220 | 0000 | 0000 | 0010 | 0000 | 0000 | 0000 | 0000 | 0000 |
| 0000530240 | 0000 | 0000 | 2C18 | 0000 | 0180 | 0000 | FFFF | 000D |
| 0000530260 | 0108 | 0000 | 0000 | 0000 | 0010 | 0000 | 0000 | 0000 |
| 0000530300 | 0000 | 0000 | 0000 | 0000 | 2C2C | 0000 | 0190 | 0000 |
| 0000530320 | FFFF | 000F | 0108 | 0000 | 0000 | 00C0 | 0020 | 0000 |
| 0000530340 | 0000 | 0000 | 0000 | 0000 | 0000 | 0000 | 2C3B | 0000 |
| 0000530360 | 01B0 | 0000 | FFFF | 000D | 0108 | 0000 | 0000 | 0000 |
| 0000530400 | 0010 | 0000 | 0000 | 0000 | 0000 | 0000 | 652E | 736F |
| 0000530420 | 0000 | 0000 | 0000 | 0000 | FFFE | 0008 | 0166 | 14D2 |
| 0000530440 | 0000 | 0000 | 01C0 | 0000 | 0000 | 0000 | 0000 | 0000 |
| 0000530460 | 342E | 6166 | 656B | 0000 | 0000 | 0000 | FFFE | 0008 |
| 0000530500 | 010A | 0000 | 0000 | 0000 | 0050 | 0000 | 0000 | 150C |
| 0000530520 | 0000 | 0000 | 6D5F | 6773 | 705F | 7274 | 0000 | 0000 |
| 0000530540 | FFFF | 0010 | 0108 | 0000 | 0000 | 0000 | 0020 | 0000 |
| 0000530560 | 0000 | 0000 | 0000 | 0000 | 0000 | 0000 | 2C47 | 0000 |
| 0000530600 | 0020 | 0000 | FFFF | 000F | 0108 | 0000 | 0000 | 0000 |

THU MAR 14 17:37:32 1991 GSPMON.4 PAGE 188, LINE 11034

| | | | | | | | | |
|---|---|---|---|---|---|---|---|---|
| 0000530620 | 0020 | 0000 | 0000 | 0000 | 0000 | 0000 | 0000 | 0000 |
| 0000530640 | 2C51 | 0000 | 0040 | 0000 | FFFF | 000D | 0108 | 0000 |
| 0000530660 | 0000 | 0000 | 0010 | 0000 | 0000 | 0000 | 0000 | 0000 |
| 0000530700 | 652E | 736F | 0000 | 0000 | 0000 | 0000 | FFFE | 0008 |
| 0000530720 | 0166 | 1502 | 0000 | 0000 | 0050 | 0000 | 0000 | 0000 |
| 0000530740 | 0000 | 0000 | 352E | 6166 | 656B | 0000 | 0000 | 0000 |
| 0000530760 | FFFE | 0008 | 010A | 0000 | 0000 | 0000 | 0040 | 0000 |
| 0000531000 | 0000 | 1518 | 0000 | 0000 | 0000 | 0000 | 2C5C | 0000 |
| 0000531020 | 0000 | 0000 | FFFF | 000D | 0108 | 0000 | 0000 | 0000 |
| 0000531040 | 0010 | 0000 | 0000 | 0000 | 0000 | 0000 | 6A5F | 6D75 |
| 0000531060 | 0070 | 0000 | 0010 | 0000 | FFFF | 000D | 0108 | 0000 |
| 0000531100 | 0000 | 0000 | 0010 | 0000 | 0000 | 0000 | 0000 | 0000 |
| 0000531120 | 735F | 6174 | 7472 | 0000 | 0020 | 0000 | FFFF | 000D |
| 0000531140 | 0108 | 0000 | 0000 | 0000 | 0010 | 0000 | 0000 | 0000 |
| 0000531160 | 0000 | 0000 | 655F | 646E | 0000 | 0000 | 0030 | 0000 |
| 0000531200 | FFFF | 000D | 0108 | 0000 | 0000 | 0000 | 0010 | 0000 |
| 0000531220 | 0000 | 0000 | 0000 | 0000 | 652E | 736F | 0000 | 0000 |
| 0000531240 | 0000 | 0000 | FFFE | 0008 | 0166 | 150C | 0000 | 0000 |
| 0000531260 | 0040 | 0000 | 0000 | 0000 | 0000 | 0000 | 362E | 6166 |
| 0000531300 | 656B | 0000 | 0000 | 0000 | FFFE | 0008 | 010A | 0000 |
| 0000531320 | 0000 | 0000 | 0080 | 0000 | 0000 | 1520 | 0000 | 0000 |
| 0000531340 | 685F | 0000 | 0000 | 0000 | 0000 | 0000 | FFFF | 0008 |
| 0000531360 | 0108 | 150C | 0000 | 0000 | 0040 | 0000 | 0000 | 0000 |
| 0000531400 | 0000 | 0000 | 765F | 0000 | 0000 | 0000 | 0040 | 0000 |
| 0000531420 | FFFF | 0008 | 0108 | 150C | 0000 | 0000 | 0040 | 0000 |
| 0000531440 | 0000 | 0000 | 0000 | 0000 | 652E | 736F | 0000 | 0000 |
| 0000531460 | 0000 | 0000 | FFFE | 0008 | 0166 | 1518 | 0000 | 0000 |
| 0000531500 | 0080 | 0000 | 0000 | 0000 | 0000 | 0000 | 372E | 6166 |
| 0000531520 | 656B | 0000 | 0000 | 0000 | FFFE | 0009 | 010C | 0000 |
| 0000531540 | 0000 | 0000 | 0200 | 0000 | 0000 | 152A | 0000 | 0000 |
| 0000531560 | 635F | 6B68 | 7573 | 006D | 0000 | 0000 | FFFF | 003D |
| 0000531600 | 010B | 0000 | 0000 | 0000 | 0200 | 0020 | 0000 | 0000 |
| 0000531620 | 0000 | 0000 | 655F | 7272 | 6E63 | 0074 | 0000 | 0000 |
| 0000531640 | FFFF | 003D | 010B | 0000 | 0000 | 0000 | 0200 | 0020 |
| 0000531660 | 0000 | 0000 | 0000 | 0000 | 635F | 6372 | 3233 | 0000 |
| 0000531700 | 0000 | 0000 | FFFF | 003D | 010B | 0000 | 0000 | 0000 |
| 0000531720 | 0200 | 0020 | 0000 | 0000 | 0000 | 0000 | 652E | 736F |
| 0000531740 | 0000 | 0000 | 0000 | 0000 | FFFE | 0009 | 0166 | 1520 |
| 0000531760 | 0000 | 0000 | 0200 | 0000 | 0000 | 0000 | 0000 | 0000 |
| 0000532000 | 382E | 6166 | 656B | 0000 | 0000 | 0000 | FFFE | 0008 |
| 0000532020 | 010A | 0000 | 0000 | 0000 | 0240 | 0000 | 0000 | 1532 |
| 0000532040 | 0000 | 0000 | 0000 | 0000 | 2C68 | 0000 | 0000 | 0000 |
| 0000532060 | FFFF | 0008 | 0108 | 150C | 0000 | 0000 | 0040 | 0000 |
| 0000532100 | 0000 | 0000 | 0000 | 0000 | 0000 | 0000 | 2C75 | 0000 |
| 0000532120 | 0040 | 0000 | FFFF | 0009 | 0108 | 1520 | 0000 | 0000 |
| 0000532140 | 0200 | 0000 | 0000 | 0000 | 0000 | 0000 | 652E | 736F |
| 0000532160 | 0000 | 0000 | 0000 | 0000 | FFFE | 0008 | 0166 | 152A |
| 0000532200 | 0000 | 0000 | 0240 | 0000 | 0000 | 0000 | 0000 | 0000 |
| 0000532220 | 392E | 6166 | 656B | 0000 | 0000 | 0000 | FFFE | 0009 |
| 0000532240 | 010C | 0000 | 0000 | 0000 | 4000 | 0000 | 0000 | 153C |
| 0000532260 | 0000 | 0000 | 635F | 6B68 | 7573 | 006D | 0000 | 0000 |
| 0000532300 | FFFF | 00FD | 010B | 0000 | 0000 | 0000 | 4000 | 0020 |
| 0000532320 | 0020 | 0000 | 0000 | 0000 | 655F | 7272 | 6E63 | 0074 |
| 0000532340 | 0000 | 0000 | FFFF | 00FD | 010B | 0000 | 0000 | 0000 |
| 0000532360 | 4000 | 0020 | 0020 | 0000 | 0000 | 0000 | 635F | 6372 |
| 0000532400 | 3233 | 0000 | 0000 | 0000 | FFFF | 00FD | 010B | 0000 |
| 0000532420 | 0000 | 0000 | 4000 | 0020 | 0020 | 0000 | 0000 | 0000 |
| 0000532440 | 652E | 736F | 0000 | 0000 | 0000 | 0000 | FFFE | 0009 |
| 0000532460 | 0166 | 1532 | 0000 | 0000 | 4000 | 0000 | 0000 | 0000 |

THU MAR 14 17:37:32 1991 GSPMON.4 PAGE 189, LINE 11093

| | | | | | | | | |
|---|---|---|---|---|---|---|---|---|
| 0000532500 | 0000 | 0000 | 312E | 6630 | 6B61 | 0065 | 0000 | 0000 |
| 0000532520 | FFFE | 0008 | 010A | 0000 | 0000 | 0000 | 4080 | 0000 |
| 0000532540 | 0000 | 1546 | 0000 | 0000 | 0000 | 0000 | 2C81 | 0000 |
| 0000532560 | 0000 | 0000 | FFFF | 0008 | 0108 | 150C | 0000 | 0000 |
| 0000532600 | 0040 | 0000 | 0000 | 0000 | 0000 | 0000 | 0000 | 0000 |
| 0000532620 | 2C8E | 0000 | 0040 | 0000 | FFFF | 0008 | 0108 | 150C |
| 0000532640 | 0000 | 0000 | 0040 | 0000 | 0000 | 0000 | 0000 | 0000 |
| 0000532660 | 0000 | 0000 | 2C9A | 0000 | 0080 | 0000 | FFFF | 0009 |
| 0000532700 | 0108 | 1532 | 0000 | 0000 | 4000 | 0000 | 0000 | 0000 |
| 0000532720 | 0000 | 0000 | 652E | 736F | 0000 | 0000 | 0000 | 0000 |
| 0000532740 | FFFE | 0008 | 0166 | 153C | 0000 | 0000 | 4080 | 0000 |
| 0000532760 | 0000 | 0000 | 0000 | 0000 | 312E | 6631 | 6B61 | 0065 |
| 0000533000 | 0000 | 0000 | FFFE | 0009 | 010C | 0000 | 0000 | 0000 |
| 0000533020 | 0090 | 0000 | 0000 | 1550 | 0000 | 0000 | 635F | 6B68 |
| 0000533040 | 7573 | 006D | 0000 | 0000 | FFFF | 00FD | 010B | 0000 |
| 0000533060 | 0000 | 0000 | 0090 | 0003 | 0003 | 0000 | 0000 | 0000 |
| 0000533100 | 655F | 7272 | 6E63 | 0074 | 0000 | 0000 | FFFF | 00FD |
| 0000533120 | 010B | 0000 | 0000 | 0000 | 0090 | 0003 | 0003 | 0000 |
| 0000533140 | 0000 | 0000 | 625F | 7263 | 3363 | 0032 | 0000 | 0000 |
| 0000533160 | FFFF | 00FD | 010B | 0000 | 0000 | 0000 | 0090 | 0003 |
| 0000533200 | 0003 | 0000 | 0000 | 0000 | 652E | 736F | 0000 | 0000 |
| 0000533220 | 0000 | 0000 | FFFE | 0009 | 0166 | 1546 | 0000 | 0000 |
| 0000533240 | 0090 | 0000 | 0000 | 0000 | 0000 | 0000 | 312E | 6632 |
| 0000533260 | 6B61 | 0065 | 0000 | 0000 | FFFE | 0008 | 010A | 0000 |
| 0000533300 | 0000 | 0000 | 0130 | 0000 | 0000 | 155E | 0000 | 0000 |
| 0000533320 | 0000 | 0000 | 2CA4 | 0000 | 0000 | 0000 | FFFF | 0008 |
| 0000533340 | 0108 | 150C | 0000 | 0000 | 0040 | 0000 | 0000 | 0000 |
| 0000533360 | 0000 | 0000 | 0000 | 0000 | 2CB1 | 0000 | 0040 | 0000 |
| 0000533400 | FFFF | 0008 | 0108 | 150C | 0000 | 0000 | 0040 | 0000 |
| 0000533420 | 0000 | 0000 | 0000 | 0000 | 785F | 635F | 6F6F | 6472 |
| 0000533440 | 0080 | 0000 | FFFF | 0003 | 0108 | 0000 | 0000 | 0000 |
| 0000533460 | 0010 | 0000 | 0000 | 0000 | 0000 | 0000 | 795F | 635F |
| 0000533500 | 6F6F | 6472 | 0090 | 0000 | FFFF | 0003 | 0108 | 0000 |
| 0000533520 | 0000 | 0000 | 0010 | 0000 | 0000 | 0000 | 0000 | 0000 |
| 0000533540 | 0000 | 0000 | 2CBD | 0000 | 00A0 | 0000 | FFFF | 0009 |
| 0000533560 | 0108 | 1546 | 0000 | 0000 | 0090 | 0000 | 0000 | 0000 |
| 0000533600 | 0000 | 0000 | 652E | 736F | 0000 | 0000 | 0000 | 0000 |
| 0000533620 | FFFE | 0008 | 0166 | 1550 | 0000 | 0000 | 0130 | 0000 |
| 0000533640 | 0000 | 0000 | 0000 | 0000 | 312E | 6633 | 6B61 | 0065 |
| 0000533660 | 0000 | 0000 | FFFE | 0008 | 010A | 0000 | 0000 | 0000 |
| 0000533700 | 0050 | 0000 | 0000 | 156A | 0000 | 0000 | 0000 | 0000 |
| 0000533720 | 2CC7 | 0000 | 0000 | 0000 | FFFF | 000D | 0108 | 0000 |
| 0000533740 | 0000 | 0000 | 0010 | 0000 | 0000 | 0000 | 0000 | 0000 |
| 0000533760 | 0000 | 0000 | 2CDF | 0000 | 0010 | 0000 | FFFF | 000D |
| 0000534000 | 0108 | 0000 | 0000 | 0000 | 0010 | 0000 | 0000 | 0000 |
| 0000534020 | 0000 | 0000 | 0000 | 0000 | 2CF1 | 0000 | 0020 | 0000 |
| 0000534040 | FFFF | 000D | 0108 | 0000 | 0000 | 0000 | 0010 | 0000 |
| 0000534060 | 0000 | 0000 | 0000 | 0000 | 0000 | 0000 | 2CFC | 0000 |
| 0000534100 | 0030 | 0000 | FFFF | 0010 | 0108 | 0000 | 0000 | 0000 |
| 0000534120 | 0020 | 0000 | 0000 | 0000 | 0000 | 0000 | 652E | 736F |
| 0000534140 | 0000 | 0000 | 0000 | 0000 | FFFE | 0008 | 0166 | 155E |
| 0000534160 | 0000 | 0000 | 0050 | 0000 | 0000 | 0000 | 0000 | 0000 |
| 0000534200 | 312E | 6634 | 6B61 | 0065 | 0000 | 0000 | FFFE | 0008 |
| 0000534220 | 010A | 0000 | 0000 | 0000 | 0040 | 0000 | 0000 | 1572 |
| 0000534240 | 0000 | 0000 | 0000 | 0000 | 2D06 | 0000 | 0000 | 0000 |
| 0000534260 | FFFF | 0005 | 0108 | 0000 | 0000 | 0000 | 0020 | 0000 |
| 0000534300 | 0000 | 0000 | 0000 | 0000 | 0000 | 0000 | 2D16 | 0000 |
| 0000534320 | 0020 | 0000 | FFFF | 0005 | 0108 | 0000 | 0000 | 0000 |
| 0000534340 | 0020 | 0000 | 0000 | 0000 | 0000 | 0000 | 652E | 736F |

THU MAR 14 17:37:32 1991 GSPMON.4 PAGE 190, LINE 11152

| | | | | | | | | |
|---|---|---|---|---|---|---|---|---|
| 0000534360 | 0000 | 0000 | 0000 | 0000 | FFFE | 0008 | 0166 | 156A |
| 0000534400 | 0000 | 0000 | 0040 | 0000 | 0000 | 0000 | 0000 | 0000 |
| 0000534420 | 312E | 6635 | 6B61 | 0065 | 0000 | 0000 | FFFE | 0008 |
| 0000534440 | 010A | 0000 | 0000 | 0000 | 0050 | 0000 | 0000 | 1580 |
| 0000534460 | 0000 | 0000 | 785F | 656C | 7466 | 0000 | 0000 | 0000 |
| 0000534500 | FFFF | 0003 | 0108 | 0000 | 0000 | 0000 | 0010 | 0000 |
| 0000534520 | 0000 | 0000 | 0000 | 0000 | 795F | 6F74 | 0070 | 0000 |
| 0000534540 | 0010 | 0000 | FFFF | 0003 | 0108 | 0000 | 0000 | 0000 |
| 0000534560 | 0010 | 0000 | 0000 | 0000 | 0000 | 0000 | 785F | 6972 |
| 0000534600 | 6867 | 0074 | 0020 | 0000 | FFFF | 0003 | 0108 | 0000 |
| 0000534620 | 0000 | 0000 | 0010 | 0000 | 0000 | 0000 | 0000 | 0000 |
| 0000534640 | 795F | 6F64 | 6E77 | 0000 | 0030 | 0000 | FFFF | 0003 |
| 0000534660 | 0108 | 0000 | 0000 | 0000 | 0010 | 0000 | 0000 | 0000 |
| 0000534700 | 0000 | 0000 | 0000 | 0000 | 2D25 | 0000 | 0040 | 0000 |
| 0000534720 | FFFF | 0003 | 0108 | 0000 | 0000 | 0000 | 0010 | 0000 |
| 0000534740 | 0000 | 0000 | 0000 | 0000 | 652E | 736F | 0000 | 0000 |
| 0000534760 | 0000 | 0000 | FFFE | 0008 | 0166 | 1572 | 0000 | 0000 |
| 0000535000 | 0050 | 0000 | 0000 | 0000 | 0000 | 0000 | 312E | 6636 |
| 0000535020 | 6B61 | 0065 | 0000 | 0000 | FFFE | 0008 | 010A | 0000 |
| 0000535040 | 0000 | 0000 | 0020 | 0000 | 0000 | 1588 | 0000 | 0000 |
| 0000535060 | 0000 | 0000 | 2D2F | 0000 | 0000 | 0000 | FFFF | 0003 |
| 0000535100 | 0108 | 0000 | 0000 | 0000 | 0010 | 0000 | 0000 | 0000 |
| 0000535120 | 0000 | 0000 | 0000 | 0000 | 2D3B | 0000 | 0010 | 0000 |
| 0000535140 | FFFF | 0003 | 0108 | 0000 | 0000 | 0000 | 0010 | 0000 |
| 0000535160 | 0000 | 0000 | 0000 | 0000 | 652E | 736F | 0000 | 0000 |
| 0000535200 | 0000 | 0000 | FFFE | 0008 | 0166 | 1580 | 0000 | 0000 |
| 0000535220 | 0020 | 0000 | 0000 | 0000 | 0000 | 0000 | 312E | 6637 |
| 0000535240 | 6B61 | 0065 | 0000 | 0000 | FFFE | 0008 | 010A | 0000 |
| 0000535260 | 0000 | 0000 | 0040 | 0000 | 0000 | 1594 | 0000 | 0000 |
| 0000535300 | 0000 | 0000 | 2D45 | 0000 | 0000 | 0000 | FFFF | 000D |
| 0000535320 | 0108 | 0000 | 0000 | 0000 | 0010 | 0000 | 0000 | 0000 |
| 0000535340 | 0000 | 0000 | 0000 | 0000 | 2D58 | 0000 | 0010 | 0000 |
| 0000535360 | FFFF | 000D | 0108 | 0000 | 0000 | 0000 | 0010 | 0000 |
| 0000535400 | 0000 | 0000 | 0000 | 0000 | 0000 | 0000 | 2D6A | 0000 |
| 0000535420 | 0020 | 0000 | FFFF | 000D | 0108 | 0000 | 0000 | 0000 |
| 0000535440 | 0010 | 0000 | 0000 | 0000 | 0000 | 0000 | 0000 | 0000 |
| 0000535460 | 2D77 | 0000 | 0030 | 0000 | FFFF | 000D | 0108 | 0000 |
| 0000535500 | 0000 | 0000 | 0010 | 0000 | 0000 | 0000 | 0000 | 0000 |
| 0000535520 | 652E | 736F | 0000 | 0000 | 0000 | 0000 | FFFE | 0008 |
| 0000535540 | 0166 | 1588 | 0000 | 0000 | 0040 | 0000 | 0000 | 0000 |
| 0000535560 | 0000 | 0000 | 662E | 6C69 | 0065 | 0000 | 1596 | 0000 |
| 0000535600 | FFFE | 0000 | 0167 | 7067 | 615F | 696F | 632E | 0000 |
| 0000535620 | 0000 | 0000 | 0000 | 0000 | 662E | 6C69 | 0065 | 0000 |
| 0000535640 | 15CE | 0000 | FFFE | 0000 | 0167 | 7067 | 615F | 696F |
| 0000535660 | 682E | 0000 | 0000 | 0000 | 0000 | 0000 | 312E | 6638 |
| 0000535700 | 6B61 | 0065 | 0000 | 0000 | FFFE | 0008 | 010A | 0000 |
| 0000535720 | 0000 | 0000 | 0040 | 0000 | 0000 | 15A4 | 0000 | 0000 |
| 0000535740 | 785F | 0031 | 0000 | 0000 | 0000 | 0000 | FFFF | 0003 |
| 0000535760 | 0108 | 0000 | 0000 | 0000 | 0010 | 0000 | 0000 | 0000 |
| 0000536000 | 0000 | 0000 | 795F | 0031 | 0000 | 0000 | 0010 | 0000 |
| 0000536020 | FFFF | 0003 | 0108 | 0000 | 0000 | 0000 | 0010 | 0000 |
| 0000536040 | 0000 | 0000 | 0000 | 0000 | 785F | 0032 | 0000 | 0000 |
| 0000536060 | 0020 | 0000 | FFFF | 0003 | 0108 | 0000 | 0000 | 0000 |
| 0000536100 | 0010 | 0000 | 0000 | 0000 | 0000 | 0000 | 795F | 0032 |
| 0000536120 | 0000 | 0000 | 0030 | 0000 | FFFF | 0003 | 0108 | 0000 |
| 0000536140 | 0000 | 0000 | 0010 | 0000 | 0000 | 0000 | 0000 | 0000 |
| 0000536160 | 652E | 736F | 0000 | 0000 | 0000 | 0000 | FFFE | 0008 |
| 0000536200 | 0166 | 1598 | 0000 | 0000 | 0040 | 0000 | 0000 | 0000 |
| 0000536220 | 0000 | 0000 | 312E | 6639 | 6B61 | 0065 | 0000 | 0000 |

THU MAR 14 17:37:32 1991 GSPMON.4 PAGE 191, LINE 11211

| | | | | | | | | |
|---|---|---|---|---|---|---|---|---|
| 0000536240 | FFFE | 0008 | 010A | 0000 | 0000 | 0000 | 0080 | 0000 |
| 0000536260 | 0000 | 15B6 | 0000 | 0000 | 775F | 6469 | 6874 | 0031 |
| 0000536300 | 0000 | 0000 | FFFF | 0003 | 0108 | 0000 | 0000 | 0000 |
| 0000536320 | 0010 | 0000 | 0000 | 0000 | 0000 | 0000 | 685F | 6965 |
| 0000536340 | 6867 | 3174 | 0010 | 0000 | FFFF | 0003 | 0108 | 0000 |
| 0000536360 | 0000 | 0000 | 0010 | 0000 | 0000 | 0000 | 0000 | 0000 |
| 0000536400 | 6C5F | 6665 | 3174 | 0000 | 0020 | 0000 | FFFF | 0003 |
| 0000536420 | 0108 | 0000 | 0000 | 0000 | 0010 | 0000 | 0000 | 0000 |
| 0000536440 | 0000 | 0000 | 755F | 3170 | 0000 | 0000 | 0030 | 0000 |
| 0000536460 | FFFF | 0003 | 0108 | 0000 | 0000 | 0000 | 0010 | 0000 |
| 0000536500 | 0000 | 0000 | 0000 | 0000 | 775F | 6469 | 6874 | 0032 |
| 0000536520 | 0040 | 0000 | FFFF | 0003 | 0108 | 0000 | 0000 | 0000 |
| 0000536540 | 0010 | 0000 | 0000 | 0000 | 0000 | 0000 | 685F | 6965 |
| 0000536560 | 6867 | 3274 | 0050 | 0000 | FFFF | 0003 | 0108 | 0000 |
| 0000536600 | 0000 | 0000 | 0010 | 0000 | 0000 | 0000 | 0000 | 0000 |
| 0000536620 | 6C5F | 6665 | 3274 | 0000 | 0060 | 0000 | FFFF | 0003 |
| 0000536640 | 0108 | 0000 | 0000 | 0000 | 0010 | 0000 | 0000 | 0000 |
| 0000536660 | 0000 | 0000 | 755F | 3270 | 0000 | 0000 | 0070 | 0000 |
| 0000536700 | FFFF | 0003 | 0108 | 0000 | 0000 | 0000 | 0010 | 0000 |
| 0000536720 | 0000 | 0000 | 0000 | 0000 | 652E | 736F | 0000 | 0000 |
| 0000536740 | 0000 | 0000 | FFFE | 0008 | 0166 | 15A4 | 0000 | 0000 |
| 0000536760 | 0080 | 0000 | 0000 | 0000 | 0000 | 0000 | 322E | 6630 |
| 0000537000 | 6B61 | 0065 | 0000 | 0000 | FFFE | 0009 | 010C | 0000 |
| 0000537020 | 0000 | 0000 | 0080 | 0000 | 0000 | 15C2 | 0000 | 0000 |
| 0000537040 | 0000 | 0000 | 2D85 | 0000 | 0000 | 0000 | FFFF | 0008 |
| 0000537060 | 010B | 1598 | 0000 | 0000 | 0040 | 0000 | 0000 | 0000 |
| 0000537100 | 0000 | 0000 | 0000 | 0000 | 2D90 | 0000 | 0000 | 0000 |
| 0000537120 | FFFF | 0008 | 010B | 15A4 | 0000 | 0000 | 0080 | 0000 |
| 0000537140 | 0000 | 0000 | 0000 | 0000 | 665F | 6C69 | 6574 | 0072 |
| 0000537160 | 0000 | 0000 | FFFF | 0008 | 010B | 1572 | 0000 | 0000 |
| 0000537200 | 0050 | 0000 | 0000 | 0000 | 0000 | 0000 | 652E | 736F |
| 0000537220 | 0000 | 0000 | 0000 | 0000 | FFFE | 0009 | 0166 | 15B8 |
| 0000537240 | 0000 | 0000 | 0080 | 0000 | 0000 | 0000 | 0000 | 0000 |
| 0000537260 | 322E | 6631 | 6B61 | 0065 | 0000 | 0000 | FFFE | 0008 |
| 0000537300 | 010A | 0000 | 0000 | 0000 | 00B0 | 0000 | 0000 | 15CE |
| 0000537320 | 0000 | 0000 | 0000 | 0000 | 2D9D | 0000 | 0000 | 0000 |
| 0000537340 | FFFF | 0009 | 0108 | 15B8 | 0000 | 0000 | 0080 | 0000 |
| 0000537360 | 0000 | 0000 | 0000 | 0000 | 6D5F | 646F | 0065 | 0000 |
| 0000537400 | 0080 | 0000 | FFFF | 000D | 0108 | 0000 | 0000 | 0000 |
| 0000537420 | 0010 | 0000 | 0000 | 0000 | 0000 | 0000 | 675F | 5F70 |
| 0000537440 | 6C66 | 6761 | 0090 | 0000 | FFFF | 000D | 0108 | 0000 |
| 0000537460 | 0000 | 0000 | 0010 | 0000 | 0000 | 0000 | 0000 | 0000 |
| 0000537500 | 0000 | 0000 | 2DA9 | 0000 | 00A0 | 0000 | FFFF | 000D |
| 0000537520 | 0108 | 0000 | 0000 | 0000 | 0010 | 0000 | 0000 | 0000 |
| 0000537540 | 0000 | 0000 | 652E | 736F | 0000 | 0000 | 0000 | 0000 |
| 0000537560 | FFFE | 0008 | 0166 | 15C2 | 0000 | 0000 | 00B0 | 0000 |
| 0000537600 | 0000 | 0000 | 0000 | 0000 | 662E | 6C69 | 0065 | 0000 |
| 0000537620 | 15D0 | 0000 | FFFE | 0000 | 0167 | 7067 | 615F | 696F |
| 0000537640 | 632E | 0000 | 0000 | 0000 | 0000 | 0000 | 662E | 6C69 |
| 0000537660 | 0065 | 0000 | 163C | 0000 | FFFE | 0000 | 0167 | 7067 |
| 0000537700 | 6D5F | 756F | 682E | 0000 | 0000 | 0000 | 0000 | 0000 |
| 0000537720 | 322E | 6632 | 6B61 | 0065 | 0000 | 0000 | FFFE | 0008 |
| 0000537740 | 010A | 0000 | 0000 | 0000 | 0060 | 0000 | 0000 | 15DC |
| 0000537760 | 0000 | 0000 | 0000 | 0000 | 2DB4 | 0000 | 0000 | 0000 |
| 0000540000 | FFFF | 000F | 0108 | 0000 | 0000 | 0000 | 0020 | 0000 |
| 0000540020 | 0000 | 0000 | 0000 | 0000 | 0000 | 0000 | 2DC1 | 0000 |
| 0000540040 | 0020 | 0000 | FFFF | 000F | 0108 | 0000 | 0000 | 0000 |
| 0000540060 | 0020 | 0000 | 0000 | 0000 | 0000 | 0000 | 0000 | 0000 |
| 0000540100 | 2DD7 | 0000 | 0040 | 0000 | FFFF | 000F | 0108 | 0000 |

THU MAR 14 17:37:32 1991 GSPMON.4 PAGE 192, LINE 11270

| | | | | | | | | |
|---|---|---|---|---|---|---|---|---|
| 0000540120 | 0000 | 0000 | 0020 | 0000 | 0000 | 0000 | 0000 | 0000 |
| 0000540140 | 652E | 736F | 0000 | 0000 | 0000 | 0000 | FFFE | 0008 |
| 0000540160 | 0166 | 15D2 | 0000 | 0000 | 0060 | 0000 | 0000 | 0000 |
| 0000540200 | 0000 | 0000 | 322E | 6633 | 6B61 | 0065 | 0000 | 0000 |
| 0000540220 | FFFE | 0008 | 010A | 0000 | 0000 | 0000 | 00C0 | 0000 |
| 0000540240 | 0000 | 15F6 | 0000 | 0000 | 635F | 0078 | 0000 | 0000 |
| 0000540260 | 0000 | 0000 | FFFF | 000D | 0108 | 0000 | 0000 | 0000 |
| 0000540300 | 0010 | 0000 | 0000 | 0000 | 0000 | 0000 | 635F | 0079 |
| 0000540320 | 0000 | 0000 | 0010 | 0000 | FFFF | 000D | 0108 | 0000 |
| 0000540340 | 0000 | 0000 | 0010 | 0000 | 0000 | 0000 | 0000 | 0000 |
| 0000540360 | 785F | 0031 | 0000 | 0000 | 0020 | 0000 | FFFF | 0003 |
| 0000540400 | 0108 | 0000 | 0000 | 0000 | 0010 | 0000 | 0000 | 0000 |
| 0000540420 | 0000 | 0000 | 795F | 0031 | 0000 | 0000 | 0030 | 0000 |
| 0000540440 | FFFF | 0003 | 0108 | 0000 | 0000 | 0000 | 0010 | 0000 |
| 0000540460 | 0000 | 000C | 0J00 | 0000 | 785F | 0032 | 0000 | 0000 |
| 0000540500 | 0040 | 0000 | FFFF | 0003 | 0108 | 0000 | 0000 | 0000 |
| 0000540520 | 0010 | 0000 | 0000 | 0000 | 0000 | 0000 | 795F | 0032 |
| 0000540540 | 0000 | 0000 | 0050 | 0000 | FFFF | 0003 | 0108 | 0000 |
| 0000540560 | 0000 | 0000 | 0010 | 0000 | 0000 | 0000 | 0000 | 0000 |
| 0000540600 | 685F | 5F70 | 0078 | 0000 | 0060 | 0000 | FFFF | 0003 |
| 0000540620 | 0108 | 0000 | 0000 | 0000 | 0010 | 0000 | 0000 | 0000 |
| 0000540640 | 0000 | 0000 | 685F | 5F70 | 0079 | 0000 | 0070 | 0000 |
| 0000540660 | FFFF | 0003 | 0108 | 0000 | 0000 | 0000 | 0010 | 0000 |
| 0000540700 | 0000 | 0000 | 0000 | 0000 | 0000 | 0000 | 2DE8 | 0000 |
| 0000540720 | 0080 | 0000 | FFFF | 000F | 0108 | 0000 | 0000 | 0000 |
| 0000540740 | 0020 | 0000 | 0000 | 0000 | 0000 | 0000 | 0000 | 0000 |
| 0000540760 | 2DF8 | 0000 | 00A0 | 0000 | FFFF | 000D | 0108 | 0000 |
| 0000541000 | 0000 | 0000 | 0010 | 0000 | 0000 | 0000 | 0000 | 0000 |
| 0000541020 | 0000 | 0000 | 2E07 | 0000 | 00B0 | 0000 | FFFF | 000D |
| 0000541040 | 0108 | 0000 | 0000 | 0000 | 0010 | 0000 | 0000 | 0000 |
| 0000541060 | 0000 | 0000 | 652E | 736F | 0000 | 0000 | 0000 | 0000 |
| 0000541100 | FFFE | 0008 | 0166 | 15DC | 0000 | 0000 | 00C0 | 0000 |
| 0000541120 | 0000 | 0000 | 0000 | 0000 | 322E | 6634 | 6B61 | 0065 |
| 0000541140 | 0000 | 0000 | FFFE | 0008 | 010A | 0000 | 0000 | 0000 |
| 0000541160 | 0030 | 0000 | 0000 | 1600 | 0000 | 0000 | 785F | 0000 |
| 0000541200 | 0000 | 0000 | 0000 | 0000 | FFFF | 0003 | 0108 | 0000 |
| 0000541220 | 0000 | 0000 | 0010 | 0000 | 0000 | 0000 | 0000 | 0000 |
| 0000541240 | 795F | 0000 | 0000 | 0000 | 0010 | 0000 | FFFF | 0003 |
| 0000541260 | 0108 | 0000 | 0000 | 0000 | 0010 | 0000 | 0000 | 0000 |
| 0000541300 | 0000 | 0000 | 695F | 6F63 | 5F6E | 6469 | 0020 | 0000 |
| 0000541320 | FFFF | 0003 | 0108 | 0000 | 0000 | 0000 | 0010 | 0000 |
| 0000541340 | 0000 | 0000 | 0000 | 0000 | 652E | 736F | 0000 | 0000 |
| 0000541360 | 0000 | 0000 | FFFE | 0008 | 0166 | 15F6 | 0000 | 0000 |
| 0000541400 | 0030 | 0000 | 0000 | 0000 | 0000 | 0000 | 322E | 6635 |
| 0000541420 | 6B61 | 0065 | 0000 | 0000 | FFFE | 0008 | 010A | 0000 |
| 0000541440 | 0000 | 0000 | 0070 | 0000 | 0000 | 1612 | 0000 | 0000 |
| 0000541460 | 785F | 0000 | 0000 | 0000 | 0000 | 0000 | FFFF | 000D |
| 0000541500 | 0108 | 0000 | 0000 | 0000 | 0010 | 0000 | 0000 | 0000 |
| 0000541520 | 0000 | 0000 | 795F | 0000 | 0000 | 0000 | 0010 | 0000 |
| 0000541540 | FFFF | 000D | 0108 | 0000 | 0000 | 0000 | 0010 | 0000 |
| 0000541560 | 0000 | 0000 | 0000 | 0000 | 695F | 6F63 | 5F6E | 6469 |
| 0000541600 | 0020 | 0000 | FFFF | 000D | 0108 | 0000 | 0000 | 0000 |
| 0000541620 | 0010 | 0000 | 0000 | 0000 | 0000 | 0000 | 6C5F | 6665 |
| 0000541640 | 0074 | 0000 | 0030 | 0000 | FFFF | 000D | 0108 | 0000 |
| 0000541660 | 0000 | 0000 | 0010 | 0000 | 0000 | 0000 | 0000 | 0000 |
| 0000541700 | 725F | 6769 | 7468 | 0000 | 0040 | 0000 | FFFF | 000D |
| 0000541720 | 0108 | 0000 | 0000 | 0000 | 0010 | 0000 | 0000 | 0000 |
| 0000541740 | 0000 | 0000 | 755F | 0070 | 0000 | 0000 | 0050 | 0000 |
| 0000541760 | FFFF | 000D | 0108 | 0000 | 0000 | 0000 | 0010 | 0000 |

THU MAR 14 17:37:32 1991 GSPMON.4 PAGE 193, LINE 11329

| | | | | | | | | |
|---|---|---|---|---|---|---|---|---|
| 0000542000 | 0000 | 0000 | 0000 | 0000 | 645F | 776F | 006E | 0000 |
| 0000542020 | 0060 | 0000 | FFFF | 000D | 0108 | 0000 | 0000 | 0000 |
| 0000542040 | 0010 | 0000 | 0000 | 0000 | 0000 | 0000 | 652E | 736F |
| 0000542060 | 0000 | 0000 | 0000 | 0000 | FFFE | 0008 | 0166 | 1600 |
| 0000542100 | 0000 | 0000 | 0070 | 0000 | 0000 | 0000 | 0000 | 0000 |
| 0000542120 | 322E | 6636 | 6B61 | 0065 | 0000 | 0000 | FFFE | 0008 |
| 0000542140 | 010A | 0000 | 0000 | 0000 | 0020 | 0000 | 0000 | 161A |
| 0000542160 | 0000 | 0000 | 6D5F | 646F | 0065 | 0000 | 0000 | 0000 |
| 0000542200 | FFFF | 000D | 0108 | 0000 | 0000 | 0000 | 0010 | 0000 |
| 0000542220 | 0000 | 0000 | 0000 | 0000 | 725F | 7365 | 6C75 | 0074 |
| 0000542240 | 0010 | 0000 | FFFF | 000D | 0108 | 0000 | 0000 | 0000 |
| 0000542260 | 0010 | 0000 | 0000 | 0000 | 0000 | 0000 | 652E | 736F |
| 0000542300 | 0000 | 0000 | 0000 | 0000 | FFFE | 0008 | 0166 | 1612 |
| 0000542320 | 0000 | 0000 | 0020 | 0000 | 0000 | 0000 | 0000 | 0000 |
| 0000542340 | 322E | 6637 | 6B61 | 0065 | 0000 | 0000 | FFFE | 0008 |
| 0000542360 | 010A | 0000 | 0000 | 0000 | 0020 | 0000 | 0000 | 1626 |
| 0000542400 | 0000 | 0000 | 0000 | 0000 | 2E18 | 0000 | 0000 | 0000 |
| 0000542420 | FFFF | 000C | 0108 | 0000 | 0000 | 0000 | 0008 | 0000 |
| 0000542440 | 0000 | 0000 | 0000 | 0000 | 0000 | 0000 | 2E24 | 0000 |
| 0000542460 | 0008 | 0000 | FFFF | 000C | 0108 | 0000 | 0000 | 0000 |
| 0000542500 | 0008 | 0000 | 0000 | 0000 | 0000 | 0000 | 0000 | 0000 |
| 0000542520 | 2E2F | 0000 | 0010 | 0000 | FFFF | 000C | 0108 | 0000 |
| 0000542540 | 0000 | 0000 | 0008 | 0000 | 0000 | 0000 | 0000 | 0000 |
| 0000542560 | 0000 | 0000 | 2E3A | 0000 | 0018 | 0000 | FFFF | 000C |
| 0000542600 | 0108 | 0000 | 0000 | 0000 | 0008 | 0000 | 0000 | 0000 |
| 0000542620 | 0000 | 0000 | 652E | 736F | 0000 | 0000 | 0000 | 0000 |
| 0000542640 | FFFE | 0008 | 0166 | 161A | 0000 | 0000 | 0020 | 0000 |
| 0000542660 | 0000 | 0000 | 0000 | 0000 | 322E | 6638 | 6B61 | 0065 |
| 0000542700 | 0000 | 0000 | FFFE | 0008 | 010A | 0000 | 0000 | 0000 |
| 0000542720 | 0020 | 0000 | 0000 | 1630 | 0000 | 0000 | 615F | 7474 |
| 0000542740 | 0072 | 0000 | 0000 | 0000 | FFFF | 000D | 0108 | 0000 |
| 0000542760 | 0000 | 0000 | 0010 | 0000 | 0000 | 0000 | 0000 | 0000 |
| 0000543000 | 735F | 7274 | 7069 | 0000 | 0010 | 0000 | FFFF | 000C |
| 0000543020 | 0108 | 0000 | 0000 | 0000 | 0008 | 0000 | 0000 | 0000 |
| 0000543040 | 0000 | 0000 | 725F | 6365 | 0074 | 0000 | 0018 | 0000 |
| 0000543060 | FFFF | 000C | 0108 | 0000 | 0000 | 0000 | 0008 | 0000 |
| 0000543100 | 0000 | 0000 | 0000 | 0000 | 652E | 736F | 0000 | 0000 |
| 0000543120 | 0000 | 0000 | FFFE | 0008 | 0166 | 1626 | 0000 | 0000 |
| 0000543140 | 0020 | 0000 | 0000 | 0000 | 0000 | 0000 | 322E | 6639 |
| 0000543160 | 6B61 | 0065 | 0000 | 0000 | FFFE | 0008 | 010A | 0000 |
| 0000543200 | 0000 | 0000 | 1930 | 0000 | 0000 | 163C | 0000 | 0000 |
| 0000543220 | 0000 | 0000 | 2E44 | 0000 | 0000 | 0000 | FFFF | 000D |
| 0000543240 | 0108 | 0000 | 0000 | 0000 | 0010 | 0000 | 0000 | 0000 |
| 0000543260 | 0000 | 0000 | 785F | 0000 | 0000 | 0000 | 0010 | 0000 |
| 0000543300 | FFFF | 000D | 0108 | 0000 | 0000 | 0000 | 0010 | 0000 |
| 0000543320 | 0000 | 0000 | 0000 | 0000 | 795F | 0000 | 0000 | 0000 |
| 0000543340 | 0020 | 0000 | FFFF | 000D | 0108 | 0000 | 0000 | 0000 |
| 0000543360 | 0010 | 0000 | 0000 | 0000 | 0000 | 0000 | 0000 | 0000 |
| 0000543400 | 2E4E | 0000 | 0030 | 0000 | FFFF | 0038 | 0108 | 1626 |
| 0000543420 | 0000 | 0000 | 1900 | 00C8 | 0000 | 0000 | 0000 | 0000 |
| 0000543440 | 652E | 736F | 0000 | 0000 | 0000 | 0000 | FFFE | 0008 |
| 0000543460 | 0166 | 1630 | 0000 | 0000 | 1930 | 0000 | 0000 | 0000 |
| 0000543500 | 0000 | 0000 | 662E | 6C69 | 0065 | 0000 | 163E | 0000 |
| 0000543520 | FFFE | 0000 | 0167 | 7067 | 615F | 696F | 632E | 0000 |
| 0000543540 | 0000 | 0000 | 0000 | 0000 | 662E | 6C69 | 0065 | 0000 |
| 0000543560 | 164A | 0000 | FFFE | 0000 | 0167 | 7067 | 615F | 6C70 |
| 0000543600 | 682E | 0000 | 0000 | 0000 | 0000 | 0000 | 332E | 6630 |
| 0000543620 | 6B61 | 0065 | 0000 | 0000 | FFFE | 0008 | 010A | 0000 |
| 0000543640 | 0000 | 0000 | 0030 | 0000 | 0000 | 164A | 0000 | 0000 |

THU MAR 14 17:37:32 1991 GSPMON.4 PAGE 194, LINE 11388

| | | | | | | | | |
|---|---|---|---|---|---|---|---|---|
| 0000543660 | 775F | 6469 | 6874 | 0000 | 0000 | 0000 | FFFF | 000D |
| 0000543700 | 0108 | 0000 | 0000 | 0000 | 0010 | 0000 | 0000 | 0000 |
| 0000543720 | 0000 | 0000 | 685F | 6965 | 6867 | 0074 | 0010 | 0000 |
| 0000543740 | FFFF | 000D | 0108 | 0000 | 0000 | 0000 | 0010 | 0000 |
| 0000543760 | 0000 | 0000 | 0000 | 0000 | 645F | 7065 | 6874 | 0000 |
| 0000544000 | 0020 | 0000 | FFFF | 000D | 0108 | 0000 | 0000 | 0000 |
| 0000544020 | 0010 | 0000 | 0000 | 0000 | 0000 | 0000 | 652E | 736F |
| 0000544040 | 0000 | 0000 | 0000 | 0000 | FFFE | 0008 | 0166 | 1640 |
| 0000544060 | 0000 | 0000 | 0030 | 0000 | 0000 | 0000 | 0000 | 0000 |
| 0000544100 | 662E | 6C69 | 0065 | 0000 | 164C | 0000 | FFFE | 0000 |
| 0000544120 | 0167 | 7067 | 615F | 6C70 | 692E | 636E | 0000 | 0000 |
| 0000544140 | 0000 | 0000 | 662E | 6C69 | 0065 | 0000 | 164E | 0000 |
| 0000544160 | FFFE | 0000 | 0167 | 7067 | 615F | 6C70 | 682E | 0000 |
| 0000544200 | 0000 | 0000 | 0000 | 0000 | 662E | 6C69 | 0065 | 0000 |
| 0000544220 | 1650 | 0000 | FFFE | 0000 | 0167 | 7067 | 615F | 696F |
| 0000544240 | 632E | 0000 | 0000 | 0000 | 0000 | 0000 | 662E | 6C69 |
| 0000544260 | 0065 | 0000 | 1652 | 0000 | FFFE | 0000 | 0167 | 7473 |
| 0000544300 | 6972 | 676E | 682E | 0000 | 0000 | 0000 | 0000 | 0000 |
| 0000544320 | 662E | 6C69 | 0065 | 0000 | 16DE | 0000 | FFFE | 0000 |
| 0000544340 | 0167 | 7067 | 615F | 696F | 632E | 0000 | 0000 | 0000 |
| 0000544360 | 0000 | 0000 | 0000 | 0000 | 2E5A | 0000 | 97E0 | FFC9 |
| 0000544400 | 0003 | 000D | 0103 | 0000 | 0000 | 0000 | 0010 | 0000 |
| 0000544420 | 0000 | 0000 | 0000 | 0000 | 0000 | 0000 | 2E6A | 0000 |
| 0000544440 | 97F0 | FFC9 | 0003 | 003C | 0103 | 0000 | 0000 | 0000 |
| 0000544460 | 0000 | 0000 | 0000 | 0000 | 0000 | 0000 | 0000 | 0000 |
| 0000544500 | 2E74 | 0000 | 97F0 | FFD1 | 0003 | 0008 | 0103 | 15C2 |
| 0000544520 | 0000 | 0000 | 00B0 | 0000 | 0000 | 0000 | 0000 | 0000 |
| 0000544540 | 0000 | 0000 | 2E7F | 0000 | 98A0 | FFD1 | 0003 | 000A |
| 0000544560 | 0103 | 13C6 | 0000 | 0000 | 0001 | 0000 | 0000 | 0000 |
| 0000544600 | 0000 | 0000 | 0000 | 0000 | 2E93 | 0000 | 98B0 | FFD1 |
| 0000544620 | 0003 | 000D | 0103 | 0000 | 0000 | 0000 | 0010 | 0000 |
| 0000544640 | 0000 | 0000 | 0000 | 0000 | 0000 | 0000 | 2EA1 | 0000 |
| 0000544660 | 98C0 | FFD1 | 0003 | 000D | 0103 | 0000 | 0000 | 0000 |
| 0000544700 | 0010 | 0000 | 0000 | 0000 | 0000 | 0000 | 0000 | 0000 |
| 0000544720 | 2EB0 | 0000 | 98D0 | FFD1 | 0003 | 000D | 0103 | 0000 |
| 0000544740 | 0000 | 0000 | 0010 | 0000 | 0000 | 0000 | 0000 | 0000 |
| 0000544760 | 0000 | 0000 | 2EC3 | 0000 | 98E0 | FFD1 | 0003 | 000D |
| 0000545000 | 0103 | 0000 | 0000 | 0000 | 0010 | 0000 | 0000 | 0000 |
| 0000545020 | 0000 | 0000 | 0000 | 0000 | 2ED7 | 0000 | 98F0 | FFD1 |
| 0000545040 | 0003 | 000F | 0103 | 0000 | 0000 | 0000 | 0020 | 0000 |
| 0000545060 | 0000 | 0000 | 0000 | 0000 | 0000 | 0000 | 2EE3 | 0000 |
| 0000545100 | 32A0 | FFC4 | uJ01 | 0020 | 0102 | 0000 | 0000 | 07E0 |
| 0000545120 | 0000 | 14EC | 0001 | 166C | 0000 | 0002 | 622E | 0066 |
| 0000545140 | 0000 | 0000 | 32A0 | FFC4 | 0001 | 0000 | 0165 | 0000 |
| 0000545160 | 0000 | 0051 | 0000 | 0000 | 0000 | 02AE | 0000 | 0000 |
| 0000545200 | 652E | 0066 | 0000 | 0000 | 3A80 | FFC4 | 0001 | 0000 |
| 0000545220 | 0165 | 0000 | 0000 | 008A | 0000 | 0000 | 0000 | 0000 |
| 0000545240 | 0000 | 0000 | 0000 | 0000 | 2EF9 | 0000 | 3A80 | FFC4 |
| 0000545260 | 0001 | 0020 | 0103 | 0000 | 0000 | 0690 | 0000 | 15A0 |
| 0000545300 | 0001 | 1672 | 0000 | 0001 | 622E | 0066 | 0000 | 0000 |
| 0000545320 | 3A80 | FFC4 | 0001 | 0000 | 0165 | 0000 | 0000 | 0093 |
| 0000545340 | 0000 | 0000 | 0000 | 02B4 | 0000 | 0000 | 652E | 0066 |
| 0000545360 | 0000 | 0000 | 4110 | FFC4 | 0001 | 0000 | 0165 | 0000 |
| 0000545400 | 0000 | 00BA | 0000 | 0000 | 0000 | 0000 | 0000 | 0000 |
| 0000545420 | 0000 | 0000 | 2F0F | 0000 | 4110 | FFC4 | 0001 | 0020 |
| 0000545440 | 0103 | 0000 | 0000 | 0530 | 0000 | 1636 | 0001 | 167A |
| 0000545460 | 0000 | 0003 | 622E | 0066 | 0000 | 0000 | 4110 | FFC4 |
| 0000545500 | 0001 | 0000 | 0165 | 0000 | 0000 | 00C5 | 0000 | 0000 |
| 0000545520 | 0000 | 02BC | 0000 | 0000 | 0000 | 0000 | 2F23 | 0000 |

THU MAR 14 17:37:32 1991 GSPMON.4 PAGE 195, LINE 11447

| | | | | | | | | |
|---|---|---|---|---|---|---|---|---|
| 0000545540 | 0000 | 0000 | FFFF | 000F | 0101 | 0000 | 0000 | 0000 |
| 0000545560 | 0020 | 0000 | 0000 | 0000 | 0000 | 0000 | 652E | 0066 |
| 0000545600 | 0000 | 0000 | 4640 | FFC4 | 0001 | 0000 | 0165 | 0000 |
| 0000545620 | 0000 | 00F1 | 0000 | 0000 | 0000 | 0000 | 0000 | 0000 |
| 0000545640 | 0000 | 0000 | 2F2E | 0000 | 4640 | FFC4 | 0001 | 0024 |
| 0000545660 | 0102 | 0000 | 0000 | 0120 | 0000 | 16A2 | 0001 | 1684 |
| 0000545700 | 0000 | 0003 | 622E | 0066 | 0000 | 0000 | 4640 | FFC4 |
| 0000545720 | 0001 | 0000 | 0165 | 0000 | 0000 | 0102 | 0000 | 0000 |
| 0000545740 | 0000 | 02C6 | 0000 | 0000 | 695F | 5F6E | 7470 | 0072 |
| 0000545760 | FFE0 | FFFF | FFFF | 0010 | 0109 | 0000 | 0000 | 0000 |
| 0000546000 | 0020 | 0000 | 0000 | 0000 | 0000 | 0000 | 6F5F | 7475 |
| 0000546020 | 705F | 7274 | FFC0 | FFFF | FFFF | 0010 | 0109 | 0000 |
| 0000546040 | 0000 | 0000 | 0020 | 0000 | 0000 | 0000 | 0000 | 0000 |
| 0000546060 | 652E | 0066 | 0000 | 0000 | 4760 | FFC4 | 0001 | 0000 |
| 0000546100 | 0165 | 0000 | 0000 | 010A | 0000 | 0000 | 0000 | 0000 |
| 0000546120 | 0000 | 0000 | 0000 | 0000 | 2F3B | 0000 | 4760 | FFC4 |
| 0000546140 | 0001 | 0024 | 0103 | 0000 | 0000 | 2050 | 0000 | 16BA |
| 0000546160 | 0001 | 1690 | 0000 | 0003 | 622E | 0066 | 0000 | 0000 |
| 0000546200 | 4760 | FFC4 | 0001 | 0000 | 0165 | 0000 | 0000 | 0112 |
| 0000546220 | 0000 | 0000 | 0000 | 02D2 | 0000 | 0000 | 0000 | 0000 |
| 0000546240 | 2F4F | 0000 | 0000 | 0000 | FFFF | 0005 | 0101 | 0000 |
| 0000546260 | 0000 | 0000 | 0020 | 0000 | 0000 | 0000 | 0000 | 0000 |
| 0000546300 | 0000 | 0000 | 2F5B | 0000 | 0020 | 0000 | FFFF | 000D |
| 0000546320 | 0101 | 0000 | 0000 | 0000 | 0010 | 0000 | 0000 | 0000 |
| 0000546340 | 0000 | 0000 | 695F | 0000 | 0000 | 0000 | 0030 | 0000 |
| 0000546360 | FFFF | 000D | 0101 | 0000 | 0000 | 0000 | 0010 | 0000 |
| 0000546400 | 0000 | 0000 | 0000 | 0000 | 652E | 0066 | 0000 | 0000 |
| 0000546420 | 67B0 | FFC4 | 0001 | 0000 | 0165 | 0000 | 0000 | 019C |
| 0000546440 | 0000 | 0000 | 0000 | 0000 | 0000 | 0000 | 0000 | 0000 |
| 0000546460 | 2F65 | 0000 | 67B0 | FFC4 | 0001 | 0024 | 0103 | 0000 |
| 0000546500 | 0000 | 1000 | 0000 | 17B0 | 0001 | 16A2 | 0000 | 0003 |
| 0000546520 | 622E | 0066 | 0000 | 0000 | 67B0 | FFC4 | 0001 | 0000 |
| 0000546540 | 0165 | 0000 | 0000 | 01A4 | 0000 | 0000 | 0000 | 02E4 |
| 0000546560 | 0000 | 0000 | 695F | 0000 | 0000 | 0000 | 0000 | 0000 |
| 0000546600 | FFFF | 000D | 0101 | 0000 | 0000 | 0000 | 0010 | 0000 |
| 0000546620 | 0000 | 0000 | 0000 | 0000 | 6D5F | 6E69 | 785F | 0000 |
| 0000546640 | 0010 | 0000 | FFFF | 0003 | 0101 | 0000 | 0000 | 0000 |
| 0000546660 | 0010 | 0000 | 0000 | 0000 | 0000 | 0000 | 6D5F | 6E69 |
| 0000546700 | 795F | 0000 | 0020 | 0000 | FFFF | 0003 | 0101 | 0000 |
| 0000546720 | 0000 | 0000 | 0010 | 0000 | 0000 | 0000 | 0000 | 0000 |
| 0000546740 | 6D5F | 7861 | 785F | 0000 | 0030 | 0000 | FFFF | 0003 |
| 0000546760 | 0101 | 0000 | 0000 | 0000 | 0010 | 0000 | 0000 | 0000 |
| 0000547000 | 0000 | 0000 | 6D5F | 7861 | 795F | 0000 | 0040 | 0000 |
| 0000547020 | FFFF | 0003 | 0101 | 0000 | 0000 | 0000 | 0010 | 0000 |
| 0000547040 | 0000 | 0000 | 0000 | 0000 | 0000 | 0000 | 2F7A | 0000 |
| 0000547060 | 0050 | 0000 | FFFF | 0003 | 0101 | 0000 | 0000 | 0000 |
| 0000547100 | 0010 | 0000 | 0000 | 0000 | 0000 | 0000 | 652E | 0066 |
| 0000547120 | 0000 | 0000 | 77B0 | FFC4 | 0001 | 0000 | 0165 | 0000 |
| 0000547140 | 0000 | 01DF | 0000 | 0000 | 0000 | 0000 | 0000 | 0000 |
| 0000547160 | 0000 | 0000 | 2F87 | 0000 | 77B0 | FFC4 | 0001 | 0024 |
| 0000547200 | 0103 | 0000 | 0000 | 05C0 | 0000 | 188E | 0001 | 16B2 |
| 0000547220 | 0000 | 0003 | 622E | 0066 | 0000 | 0000 | 77B0 | FFC4 |
| 0000547240 | 0001 | 0000 | 0165 | 0000 | 0000 | 01E5 | 0000 | 0000 |
| 0000547260 | 0000 | 02F4 | 0000 | 0000 | 695F | 0000 | 0000 | 0000 |
| 0000547300 | 0000 | 0000 | FFFF | 000F | 0101 | 0000 | 0000 | 0000 |
| 0000547320 | 0020 | 0000 | 0000 | 0000 | 0000 | 0000 | 785F | 0000 |
| 0000547340 | 0000 | 0000 | 0020 | 0000 | FFFF | 0003 | 0101 | 0000 |
| 0000547360 | 0000 | 0000 | 0010 | 0000 | 0000 | 0000 | 0000 | 0000 |
| 0000547400 | 795F | 0000 | 0000 | 0000 | 0030 | 0000 | FFFF | 0003 |

THU MAR 14 17:37:32 1991 GSPMON.4 PAGE 196, LINE 11506

| | | | | | | | | |
|---|---|---|---|---|---|---|---|---|
| 0000547420 | 0101 | 0000 | 0000 | 0000 | 0010 | 0000 | 0000 | 0000 |
| 0000547440 | 0000 | 0000 | 0000 | 0000 | 2F9C | 0000 | 0040 | 0000 |
| 0000547460 | FFFF | 0003 | 0101 | 0000 | 0000 | 0000 | 0010 | 0000 |
| 0000547500 | 0000 | 0000 | 0000 | 0000 | 6A5F | 0000 | 0000 | 0000 |
| 0000547520 | 0050 | 0000 | FFFF | 000D | 0101 | 0000 | 0000 | 0000 |
| 0000547540 | 0010 | 0000 | 0000 | 0000 | 0000 | 0000 | 652E | 0066 |
| 0000547560 | 0000 | 0000 | 7D70 | FFC4 | 0001 | 0000 | 0165 | 0000 |
| 0000547600 | 0000 | 01FB | 0000 | 0000 | 0000 | 0000 | 0000 | 0000 |
| 0000547620 | 0000 | 0000 | 2FA9 | 0000 | 7D70 | FFC4 | 0001 | 0024 |
| 0000547640 | 0102 | 0000 | 0000 | 0110 | 0000 | 18D0 | 0001 | 16BE |
| 0000547660 | 0000 | 0003 | 622E | 0066 | 0000 | 0000 | 7D70 | FFC4 |
| 0000547700 | 0001 | 0000 | 0165 | 0000 | 0000 | 020B | 0000 | 0000 |
| 0000547720 | 0000 | 0300 | 0000 | 0000 | 695F | 5F6E | 7470 | 0072 |
| 0000547740 | FFE0 | FFFF | FFFF | 0010 | 0109 | 0000 | 0000 | 0000 |
| 0000547760 | 0020 | 0000 | 0000 | 0000 | 0000 | 0000 | 6F5F | 7475 |
| 0000550000 | 705F | 7274 | FFC0 | FFFF | FFFF | 0010 | 0109 | 0000 |
| 0000550020 | 0000 | 0000 | 0020 | 0000 | 0000 | 0000 | 0000 | 0000 |
| 0000550040 | 645F | 6762 | 765F | 7261 | 0000 | 0000 | FFFF | 000F |
| 0000550060 | 0101 | 0000 | 0000 | 0C[illegible] | 0020 | 0000 | 0000 | 0000 |
| 0000550100 | 0000 | 0000 | 652E | 0066 | 0000 | 0000 | 7E80 | FFC4 |
| 0000550120 | 0001 | 0000 | 0165 | 0000 | 0000 | 0216 | 0000 | 0000 |
| 0000550140 | 0000 | 0000 | 0000 | 0000 | 0000 | 0000 | 2FC2 | 0000 |
| 0000550160 | 7E80 | FFC4 | 0001 | 0024 | 0103 | 0000 | 0000 | 0540 |
| 0000550200 | 0000 | 18E8 | 0001 | 16CE | 0000 | 0003 | 622E | 0066 |
| 0000550220 | 0000 | 0000 | 7E80 | FFC4 | 0001 | 0000 | 0165 | 0000 |
| 0000550240 | 0000 | 021E | 0000 | 0000 | 0000 | 0310 | 0000 | 0000 |
| 0000550260 | 695F | 0000 | 0000 | 0000 | 0000 | 0000 | FFFF | 000D |
| 0000550300 | 0101 | 0000 | 0000 | 0000 | 0010 | 0000 | 0000 | 0000 |
| 0000550320 | 0000 | 0000 | 6A5F | 0000 | 0000 | 0000 | 0010 | 0000 |
| 0000550340 | FFFF | 000D | 0101 | 0000 | 0000 | 0000 | 0010 | 0000 |
| 0000550360 | 0000 | 0000 | 0000 | 0000 | 0000 | 0000 | 2FD5 | 0000 |
| 0000550400 | 0020 | 0000 | FFFF | 0005 | 0101 | 0000 | 0000 | 0000 |
| 0000550420 | 0020 | 0000 | 0000 | 0000 | 0000 | 0000 | 615F | 7264 |
| 0000550440 | 0030 | 0000 | 0040 | 0000 | FFFF | 001D | 0101 | 0000 |
| 0000550460 | 0000 | 0000 | 0020 | 0000 | 0000 | 0000 | 0000 | 0000 |
| 0000550500 | 615F | 7264 | 0031 | 0000 | 0060 | 0000 | FFFF | 001D |
| 0000550520 | 0101 | 0000 | 0000 | 0000 | 0020 | 0000 | 0000 | 0000 |
| 0000550540 | 0000 | 0000 | 652E | 0066 | 0000 | 0000 | 83C0 | FFC4 |
| 0000550560 | 0001 | 0000 | 0165 | 0000 | 0000 | 0234 | 0000 | 0000 |
| 0000550600 | 0000 | 0000 | 0000 | 0000 | 0000 | 0000 | 2FE3 | 0000 |
| 0000550620 | 83C0 | FFC4 | 0001 | 0020 | 0102 | 0000 | 0000 | 00D0 |
| 0000550640 | 0000 | 192A | 0001 | 16D6 | 0000 | 0002 | 622E | 0066 |
| 0000550660 | 0000 | 0000 | 83C0 | FFC4 | 0001 | 0000 | 0165 | 0000 |
| 0000550700 | 0000 | 0243 | 0000 | 0000 | 0000 | 0318 | 0000 | 0000 |
| 0000550720 | 0000 | 0000 | 2FF6 | 0000 | FFE0 | FFFF | FFFF | 000F |
| 0000550740 | 0109 | 0000 | 0000 | 0000 | 0020 | 0000 | 0000 | 0000 |
| 0000550760 | 0000 | 0000 | 652E | 0066 | 0000 | 0000 | 8490 | FFC4 |
| 0000551000 | 0001 | 0000 | 0165 | 0000 | 0000 | 0248 | 0000 | 0000 |
| 0000551020 | 0000 | 0000 | 0000 | 0000 | 742E | 7865 | 0074 | 0000 |
| 0000551040 | 32A0 | FFC4 | 0001 | 0000 | 0103 | 51F0 | 0000 | 00AA |
| 0000551060 | 00B7 | 0000 | 0000 | 0000 | 0000 | 0000 | 642E | 7461 |
| 0000551100 | 0061 | 0000 | 0000 | 0000 | 0004 | 0000 | 0103 | 0000 |
| 0000551120 | 0000 | 0000 | 0000 | 0000 | 0000 | 0000 | 0000 | 0000 |
| 0000551140 | 622E | 7373 | 0000 | 0000 | 97E0 | FFC9 | 0003 | 0000 |
| 0000551160 | 0103 | 0130 | 0008 | 0000 | 0000 | 0000 | 0000 | 0000 |
| 0000551200 | 0000 | 0000 | 632E | 6E69 | 7469 | 0000 | C550 | FFC6 |
| 0000551220 | 0002 | 0000 | 0103 | 0040 | 0000 | 0001 | 0000 | 0000 |
| 0000551240 | 0000 | 0000 | 0000 | 0000 | 662E | 6C69 | 0065 | 0000 |
| 0000551260 | 16E0 | 0000 | FFFE | 0000 | 0167 | 7067 | 645F | 7369 |

THU MAR 14 17:37:32 1991 GSPMON.4 PAGE 197, LINE 11565

| | | | | | | | | |
|---|---|---|---|---|---|---|---|---|
| 0000551300 | 2E70 | 0063 | 0000 | 0000 | 0000 | 0000 | 662E | 6C69 |
| 0000551320 | 0065 | 0000 | 16E2 | 0000 | FFFE | 0000 | 0167 | 7473 |
| 0000551340 | 6D64 | 682E | 0000 | 0000 | 0000 | 0000 | 0000 | 0000 |
| 0000551360 | 662E | 6C69 | 0065 | 0000 | 16E4 | 0000 | FFFE | 0000 |
| 0000551400 | 0167 | 7067 | 645F | 7369 | 2E70 | 0063 | 0000 | 0000 |
| 0000551420 | 0000 | 0000 | 662E | 6C69 | 0065 | 0000 | 16EE | 0000 |
| 0000551440 | FFFE | 0000 | 0167 | 7473 | 6C64 | 6269 | 682E | 0000 |
| 0000551460 | 0000 | 0000 | 0000 | 0000 | 302E | 6166 | 656B | 0000 |
| 0000551500 | 0000 | 0000 | FFFE | 0008 | 010A | 0000 | 0000 | 0000 |
| 0000551520 | 0040 | 0000 | 0000 | 16EE | 0000 | 0000 | 715F | 6F75 |
| 0000551540 | 0074 | 0000 | 0000 | 0000 | FFFF | 0004 | 0108 | 0000 |
| 0000551560 | 0000 | 0000 | 0020 | 0000 | 0000 | 0000 | 0000 | 0000 |
| 0000551600 | 725F | 6D65 | 0000 | 0000 | 0020 | 0000 | FFFF | 0004 |
| 0000551620 | 0108 | 0000 | 0000 | 0000 | 0020 | 0000 | 0000 | 0000 |
| 0000551640 | 0000 | 0000 | 652E | 736F | 0000 | 0000 | 0000 | 0000 |
| 0000551660 | FFFE | 0008 | 0166 | 16E6 | 0000 | 0000 | 0040 | 0000 |
| 0000551700 | 0000 | 0000 | 0000 | 0000 | 662E | 6C69 | 0065 | 0000 |
| 0000551720 | 16F0 | 0000 | FFFE | 0000 | 0167 | 7067 | 645F | 7369 |
| 0000551740 | 2E70 | 0063 | 0000 | 0000 | 0000 | 0000 | 662E | 6C69 |
| 0000551760 | 0065 | 0000 | 1700 | 0000 | FFFE | 0000 | 0167 | 7974 |
| 0000552000 | 6570 | 6564 | 2E66 | 0068 | 0000 | 0000 | 0000 | 0000 |
| 0000552020 | 312E | 6166 | 656B | 0000 | 0000 | 0000 | FFFE | 000A |
| 0000552040 | 010F | 0000 | 0000 | 0000 | 0001 | 0000 | 0000 | 16FA |
| 0000552060 | 0000 | 0000 | 465F | 4C41 | 4553 | 0000 | 0000 | 0000 |
| 0000552100 | FFFF | 000B | 0110 | 0000 | 0000 | 0000 | 0001 | 0000 |
| 0000552120 | 0000 | 0000 | 0000 | 0000 | 545F | 5552 | 0045 | 0000 |
| 0000552140 | 0001 | 0000 | FFFF | 000B | 0110 | 0000 | 0000 | 0000 |
| 0000552160 | 0001 | 0000 | 0000 | 0000 | 0000 | 0000 | 652E | 736F |
| 0000552200 | 0000 | 0000 | 0000 | 0000 | FFFE | 000A | 0166 | 16F2 |
| 0000552220 | 0000 | 0000 | 0001 | 0000 | 0000 | 0000 | 0000 | 0000 |
| 0000552240 | 322E | 6166 | 656B | 0000 | 0000 | 0000 | FFFE | 0008 |
| 0000552260 | 010A | 0000 | 0000 | 0000 | 0004 | 0000 | 0000 | 1700 |
| 0000552300 | 0000 | 0000 | 705F | 7869 | 6C65 | 0000 | 0000 | 0000 |
| 0000552320 | FFFF | 000E | 0112 | 0000 | 0000 | 0000 | 0004 | 0000 |
| 0000552340 | 0000 | 0000 | 0000 | 0000 | 652E | 736F | 0000 | 0000 |
| 0000552360 | 0000 | 0000 | FFFE | 0008 | 0166 | 16FA | 0000 | 0000 |
| 0000552400 | 0004 | 0000 | 0000 | 0000 | 0000 | 0000 | 662E | 6C69 |
| 0000552420 | 0065 | 0000 | 1702 | 0000 | FFFE | 0000 | 0167 | 7067 |
| 0000552440 | 645F | 7369 | 2E70 | 0063 | 0000 | 0000 | 0000 | 0000 |
| 0000552460 | 662E | 6C69 | 0065 | 0000 | 1704 | 0000 | FFFE | 0000 |
| 0000552500 | 0167 | 7367 | 7370 | 7379 | 682E | 0000 | 0000 | 0000 |
| 0000552520 | 0000 | 0000 | 662E | 6C69 | 0065 | 0000 | 1706 | 0000 |
| 0000552540 | FFFE | 0000 | 0167 | 7367 | 7370 | 7379 | 692E | 636E |
| 0000552560 | 0000 | 0000 | 0000 | 0000 | 662E | 6C69 | 0065 | 0000 |
| 0000552600 | 1708 | 0000 | FFFE | 0000 | 0167 | 7367 | 7370 | 7379 |
| 0000552620 | 682E | 0000 | 0000 | 0000 | 0000 | 0000 | 662E | 6C69 |
| 0000552640 | 0065 | 0000 | 170A | 0000 | FFFE | 0000 | 0167 | 7067 |
| 0000552660 | 645F | 7369 | 2E70 | 0063 | 0000 | 0000 | 0000 | 0000 |
| 0000552700 | 662E | 6C69 | 0065 | 0000 | 17E6 | 0000 | FFFE | 0000 |
| 0000552720 | 0167 | 7367 | 6370 | 6766 | 682E | 0000 | 0000 | 0000 |
| 0000552740 | 0000 | 0000 | 0000 | 0000 | 3001 | 0000 | 0000 | 0000 |
| 0000552760 | FFFE | 000A | 010F | 0000 | 0000 | 0000 | 0002 | 0000 |
| 0000553000 | 0000 | 1716 | 0000 | 0000 | 4F5F | 454E | 315F | 0036 |
| 0000553020 | 0000 | 0000 | FFFF | 000B | 0110 | 0000 | 0000 | 0000 |
| 0000553040 | 0002 | 0000 | 0000 | 0000 | 0000 | 0000 | 545F | 4F57 |
| 0000553060 | 385F | 0000 | 0001 | 0000 | FFFF | 000B | 0110 | 0000 |
| 0000553100 | 0000 | 0000 | 0002 | 0000 | 0000 | 0000 | 0000 | 0000 |
| 0000553120 | 465F | 554F | 5F52 | 0034 | 0002 | 0000 | FFFF | 000B |
| 0000553140 | 0110 | 0000 | 0000 | 0000 | 0002 | 0000 | 0000 | 0000 |

THU MAR 14 17:37:32 1991 GSPMON.4 PAGE 198, LINE 11624

| | | | | | | | | |
|---|---|---|---|---|---|---|---|---|
| 0000553160 | 0000 | 0000 | 652E | 736F | 0000 | 0000 | 0000 | 0000 |
| 0000553200 | FFFE | 000A | 0166 | 170C | 0000 | 0000 | 0002 | 0000 |
| 0000553220 | 0000 | 0000 | 0000 | 0000 | 635F | 726C | 655F | 7272 |
| 0000553240 | 0000 | 0000 | FFFE | 000A | 010F | 0000 | 0000 | 0000 |
| 0000553260 | 0001 | 0000 | 0000 | 171E | 0000 | 0000 | 4E5F | 5F4F |
| 0000553300 | 4C43 | 0052 | 0000 | 0000 | FFFF | 000B | 0110 | 0000 |
| 0000553320 | 0000 | 0000 | 0001 | 0000 | 0000 | 0000 | 0000 | 0000 |
| 0000553340 | 435F | 524C | 0000 | 0000 | 0001 | 0000 | FFFF | 000B |
| 0000553360 | 0110 | 0000 | 0000 | 0000 | 0001 | 0000 | 0000 | 0000 |
| 0000553400 | 0000 | 0000 | 652E | 736F | 0000 | 0000 | 0000 | 0000 |
| 0000553420 | FFFE | 000A | 0166 | 1716 | 0000 | 0000 | 0001 | 0000 |
| 0000553440 | 0000 | 0000 | 0000 | 0000 | 0000 | 0000 | 300B | 0000 |
| 0000553460 | 0000 | 0000 | FFFE | 000A | 010F | 0000 | 0000 | 0000 |
| 0000553500 | 0003 | 0000 | 0000 | 172C | 0000 | 0000 | 505F | 414C |
| 0000553520 | 454E | 0030 | 0000 | 0000 | FFFF | 000B | 0110 | 0000 |
| 0000553540 | 0000 | 0000 | 0003 | 0000 | 0000 | 0000 | 0000 | 0000 |
| 0000553560 | 505F | 414C | 454E | 0032 | 0001 | 0000 | FFFF | 000B |
| 0000553600 | 0110 | 0000 | 0000 | 0000 | 0003 | 0000 | 0000 | 0000 |
| 0000553620 | 0000 | 0000 | 505F | 414C | 454E | 0031 | 0002 | 0000 |
| 0000553640 | FFFF | 000B | 0110 | 0000 | 0000 | 0000 | 0003 | 0000 |
| 0000553660 | 0000 | 0000 | 0000 | 0000 | 505F | 414C | 454E | 0033 |
| 0000553700 | 0003 | 0000 | FFFF | 000B | 0110 | 0000 | 0000 | 0000 |
| 0000553720 | 0003 | 0000 | 0000 | 0000 | 0000 | 0000 | 4E5F | 504F |
| 0000553740 | 414C | 454E | 0004 | 0000 | FFFF | 000B | 0110 | 0000 |
| 0000553760 | 0000 | 0000 | 0003 | 0000 | 0000 | 0000 | 0000 | 0000 |
| 0000554000 | 652E | 736F | 0000 | 0000 | 0000 | 0000 | FFFE | 000A |
| 0000554020 | 0166 | 171E | 0000 | 0000 | 0003 | 0000 | 0000 | 0000 |
| 0000554040 | 0000 | 0000 | 0000 | 0000 | 3016 | 0000 | 0000 | 0000 |
| 0000554060 | FFFE | 000A | 010F | 0000 | 0000 | 0000 | 0001 | 0000 |
| 0000554100 | 0000 | 1734 | 0000 | 0000 | 4E5F | 5F4F | 4944 | 5053 |
| 0000554120 | 0000 | 0000 | FFFF | 000B | 0110 | 0000 | 0000 | 0000 |
| 0000554140 | 0001 | 0000 | 0000 | 0000 | 0000 | 0000 | 445F | 5349 |
| 0000554160 | 0050 | 0000 | 0001 | 0000 | FFFF | 000B | 0110 | 0000 |
| 0000554200 | 0000 | 0000 | 0001 | 0000 | 0000 | 0000 | 0000 | 0000 |
| 0000554220 | 652E | 736F | 0000 | 0000 | 0000 | 0000 | FFFE | 000A |
| 0000554240 | 0166 | 172C | 0000 | 0000 | 0001 | 0000 | 0000 | 0000 |
| 0000554260 | 0000 | 0000 | 665F | 5F62 | 6E65 | 0000 | 0000 | 0000 |
| 0000554300 | FFFE | 000A | 010F | 0000 | 0000 | 0000 | 0001 | 0000 |
| 0000554320 | 0000 | 173C | 0000 | 0000 | 0000 | 0000 | 3020 | 0000 |
| 0000554340 | 0000 | 0000 | FFFF | 000B | 0110 | 0000 | 0000 | 0000 |
| 0000554360 | 0001 | 0000 | 0000 | 0000 | 0000 | 0000 | 0000 | 0000 |
| 0000554400 | 302B | 0000 | 0001 | 0000 | FFFF | 000B | 0110 | 0000 |
| 0000554420 | 0000 | 0000 | 0001 | 0000 | 0000 | 0000 | 0000 | 0000 |
| 0000554440 | 652E | 736F | 0000 | 0000 | 0000 | 0000 | FFFE | 000A |
| 0000554460 | 0166 | 1734 | 0000 | 0000 | 0001 | 0000 | 0000 | 0000 |
| 0000554500 | 0000 | 0000 | 7A5F | 7265 | 5F6F | 0062 | 0000 | 0000 |
| 0000554520 | FFFE | 000A | 010F | 0000 | 0000 | 0000 | 0001 | 0000 |
| 0000554540 | 0000 | 1744 | 0000 | 0000 | 0000 | 0000 | 3035 | 0000 |
| 0000554560 | 0000 | 0000 | FFFF | 000B | 0110 | 0000 | 0000 | 0000 |
| 0000554600 | 0001 | 0000 | 0000 | 0000 | 0000 | 0000 | 0000 | 0000 |
| 0000554620 | 3041 | 0000 | 0001 | 0000 | FFFF | 000B | 0110 | 0000 |
| 0000554640 | 0000 | 0000 | 0001 | 0000 | 0000 | 0000 | 0000 | 0000 |
| 0000554660 | 652E | 736F | 0000 | 0000 | 0000 | 0000 | FFFE | 000A |
| 0000554700 | 0166 | 173C | 0000 | 0000 | 0001 | 0000 | 0000 | 0000 |
| 0000554720 | 0000 | 0000 | 7A5F | 7265 | 5F6F | 0061 | 0000 | 0000 |
| 0000554740 | FFFE | 000A | 010F | 0000 | 0000 | 0000 | 0001 | 0000 |
| 0000554760 | 0000 | 174C | 0000 | 0000 | 0000 | 0000 | 304B | 0000 |
| 0000555000 | 0000 | 0000 | FFFF | 000B | 0110 | 0000 | 0000 | 0000 |
| 0000555020 | 0001 | 0000 | 0000 | 0000 | 0000 | 0000 | 0000 | 0000 |

THU MAR 14 17:37:32 1991 GSPMON.4 PAGE 199, LINE 11683

| | | | | | | | | |
|---|---|---|---|---|---|---|---|---|
| 0000555040 | 3057 | 0000 | 0001 | 0000 | FFFF | 000B | 0110 | 0000 |
| 0000555060 | 0000 | 0000 | 0001 | 0000 | 0000 | 0000 | 0000 | 0000 |
| 0000555100 | 652E | 736F | 0000 | 0000 | 0000 | 0000 | FFFE | 000A |
| 0000555120 | 0166 | 1744 | 0000 | 0000 | 0001 | 0000 | 0000 | 0000 |
| 0000555140 | 0000 | 0000 | 0000 | 0000 | 3061 | 0000 | 0000 | 0000 |
| 0000555160 | FFFE | 000A | 010F | 0000 | 0000 | 0000 | 0002 | 0000 |
| 0000555200 | 0000 | 1758 | 0000 | 0000 | 0000 | 0000 | 306B | 0000 |
| 0000555220 | 0000 | 0000 | FFFF | 000B | 0110 | 0000 | 0000 | 0000 |
| 0000555240 | 0002 | 0000 | 0000 | 0000 | 0000 | 0000 | 0000 | 0000 |
| 0000555260 | 3075 | 0000 | 0001 | 0000 | FFFF | 000B | 0110 | 0000 |
| 0000555300 | 0000 | 0000 | 0002 | 0000 | 0000 | 0000 | 0000 | 0000 |
| 0000555320 | 0000 | 0000 | 307F | 0000 | 0002 | 0000 | FFFF | 000B |
| 0000555340 | 0110 | 0000 | 0000 | 0000 | 0002 | 0000 | 0000 | 0000 |
| 0000555360 | 0000 | 0000 | 0000 | 0000 | 3089 | 0000 | 0003 | 0000 |
| 0000555400 | FFFF | 000B | 0110 | 0000 | 0000 | 0000 | 0002 | 0000 |
| 0000555420 | 0000 | 0000 | 0000 | 0000 | 652E | 736F | 0000 | 0000 |
| 0000555440 | 0000 | 0000 | FFFE | 000A | 0166 | 174C | 0000 | 0000 |
| 0000555460 | 0002 | 0000 | 0000 | 0000 | 0000 | 0000 | 615F | 756C |
| 0000555500 | 665F | 636E | 0000 | 0000 | FFFE | 000A | 010F | 0000 |
| 0000555520 | 0000 | 0000 | 0003 | 0000 | 0000 | 176C | 0000 | 0000 |
| 0000555540 | 435F | 454C | 5241 | 0000 | 0000 | 0000 | FFFF | 000B |
| 0000555560 | 0110 | 0000 | 0000 | 0000 | 0003 | 0000 | 0000 | 0000 |
| 0000555600 | 0000 | 0000 | 425F | 494D | 554E | 4153 | 0001 | 0000 |
| 0000555620 | FFFF | 000B | 0110 | 0000 | 0000 | 0000 | 0003 | 0000 |
| 0000555640 | 0000 | 0000 | 0000 | 0000 | 415F | 494D | 554E | 4253 |
| 0000555660 | 0002 | 0000 | FFFF | 000B | 0110 | 0000 | 0000 | 0000 |
| 0000555700 | 0003 | 0000 | 0000 | 0000 | 0000 | 0000 | 505F | 554C |
| 0000555720 | 0053 | 0000 | 0003 | 0000 | FFFF | 000B | 0110 | 0000 |
| 0000555740 | 0000 | 0000 | 0003 | 0000 | 0000 | 0000 | 0000 | 0000 |
| 0000555760 | 585F | 524F | 0000 | 0000 | 0004 | 0000 | FFFF | 000B |
| 0000556000 | 0110 | 0000 | 0000 | 0000 | 0003 | 0000 | 0000 | 0000 |
| 0000556020 | 0000 | 0000 | 4F5F | 0052 | 0000 | 0000 | 0005 | 0000 |
| 0000556040 | FFFF | 000B | 0110 | 0000 | 0000 | 0000 | 0003 | 0000 |
| 0000556060 | 0000 | 0000 | 0000 | 0000 | 415F | 444E | 0000 | 0000 |
| 0000556100 | 0006 | 0000 | FFFF | 000B | 0110 | 0000 | 0000 | 0000 |
| 0000556120 | 0003 | 0000 | 0000 | 0000 | 0000 | 0000 | 505F | 4552 |
| 0000556140 | 4553 | 0054 | 0007 | 0000 | FFFF | 000B | 0110 | 0000 |
| 0000556160 | 0000 | 0000 | 0003 | 0000 | 0000 | 0000 | 0000 | 0000 |
| 0000556200 | 652E | 736F | 0000 | 0000 | 0000 | 0000 | FFFE | 000A |
| 0000556220 | 0166 | 1758 | 0000 | 0000 | 0003 | 0000 | 0000 | 0000 |
| 0000556240 | 0000 | 0000 | 615F | 756C | 635F | 7972 | 0000 | 0000 |
| 0000556260 | FFFE | 000A | 010F | 0000 | 0000 | 0000 | 0001 | 0000 |
| 0000556300 | 0000 | 1774 | 0000 | 0000 | 5A5F | 5245 | 004F | 0000 |
| 0000556320 | 0000 | 0000 | FFFF | 000B | 0110 | 0000 | 0000 | 0000 |
| 0000556340 | 0001 | 0000 | 0000 | 0000 | 0000 | 0000 | 4F5F | 454E |
| 0000556360 | 0000 | 0000 | 0001 | 0000 | FFFF | 000B | 0110 | 0000 |
| 0000556400 | 0000 | 0000 | 0001 | 0000 | 0000 | 0000 | 0000 | 0000 |
| 0000556420 | 652E | 736F | 0000 | 0000 | 0000 | 0000 | FFFE | 000A |
| 0000556440 | 0166 | 176C | 0000 | 0000 | 0001 | 0000 | 0000 | 0000 |
| 0000556460 | 0000 | 0000 | 0000 | 0000 | 3093 | 0000 | 0000 | 0000 |
| 0000556500 | FFFE | 000A | 010F | 0000 | 0000 | 0000 | 0001 | 0000 |
| 0000556520 | 0000 | 177C | 0000 | 0000 | 0000 | 0000 | 309F | 0000 |
| 0000556540 | 0000 | 0000 | FFFF | 000B | 0110 | 0000 | 0000 | 0000 |
| 0000556560 | 0001 | 0000 | 0000 | 0000 | 0000 | 0000 | 0000 | 0000 |
| 0000556600 | 30AC | 0000 | 0001 | 0000 | FFFF | 000B | 0110 | 0000 |
| 0000556620 | 0000 | 0000 | 0001 | 0000 | 0000 | 0000 | 0000 | 0000 |
| 0000556640 | 652E | 736F | 0000 | 0000 | 0000 | 0000 | FFFE | 000A |
| 0000556660 | 0166 | 1774 | 0000 | 0000 | 0001 | 0000 | 0000 | 0000 |
| 0000556700 | 0000 | 0000 | 0000 | 0000 | 30B8 | 0000 | 0000 | 0000 |

THU MAR 14 17:37:32 1991 GSPMON.4 PAGE 200, LINE 11742

| | | | | | | | | |
|---|---|---|---|---|---|---|---|---|
| 0000556720 | FFFE | 000A | 010F | 0000 | 0000 | 0000 | 0001 | 0000 |
| 0000556740 | 0000 | 1784 | 0000 | 0000 | 4D5F | 5341 | 5F4B | 4E45 |
| 0000556760 | 0000 | 0000 | FFFF | 000B | 0110 | 0000 | 0000 | 0000 |
| 0000557000 | 0001 | 0000 | 0000 | 0000 | 0000 | 0000 | 0000 | 0000 |
| 0000557020 | 30C5 | 0000 | 0001 | 0000 | FFFF | 000B | 0110 | 0000 |
| 0000557040 | 0000 | 0000 | 0001 | 0000 | 0000 | 0000 | 0000 | 0000 |
| 0000557060 | 652E | 736F | 0000 | 0000 | 0000 | 0000 | FFFE | 000A |
| 0000557100 | 0166 | 177C | 0000 | 0000 | 0001 | 0000 | 0000 | 0000 |
| 0000557120 | 0000 | 0000 | 0000 | 0000 | 30CF | 0000 | 0000 | 0000 |
| 0000557140 | FFFE | 000A | 010F | 0000 | 0000 | 0000 | 0001 | 0000 |
| 0000557160 | 0000 | 178C | 0000 | 0000 | 0000 | 0000 | 30DA | 0000 |
| 0000557200 | 0000 | 0000 | FFFF | 000B | 0110 | 0000 | 0000 | 0000 |
| 0000557220 | 0001 | 0000 | 0000 | 0000 | 0000 | 0000 | 0000 | 0000 |
| 0000557240 | 30E4 | 0000 | 0001 | 0000 | FFFF | 000B | 0110 | 0000 |
| 0000557260 | 0000 | 0000 | 0001 | 0000 | 0000 | 0000 | 0000 | 0000 |
| 0000557300 | 652E | 736F | 0000 | 0000 | 0000 | 0000 | FFFE | 000A |
| 0000557320 | 0166 | 1784 | 0000 | 0000 | 0001 | 0000 | 0000 | 0000 |
| 0000557340 | 0000 | 0000 | 0000 | 0000 | 30EF | 0000 | 0000 | 0000 |
| 0000557360 | FFFE | 000A | 010F | 0000 | 0000 | 0000 | 0001 | 0000 |
| 0000557400 | 0000 | 1794 | 0000 | 0000 | 0000 | 0000 | 30FA | 0000 |
| 0000557420 | 0000 | 000C | FFFF | 000B | 0110 | 0000 | 0000 | 0000 |
| 0000557440 | 0001 | 0000 | 0000 | 0000 | 0000 | 0000 | 0000 | 0000 |
| 0000557460 | 3105 | 0000 | 0001 | 0000 | FFFF | 000B | 0110 | 0000 |
| 0000557500 | 0000 | 0000 | 0001 | 0000 | 0000 | 0000 | 0000 | 0000 |
| 0000557520 | 652E | 736F | 0000 | 0000 | 0000 | 0000 | FFFE | 000A |
| 0000557540 | 0166 | 178C | 0000 | 0000 | 0001 | 0000 | 0000 | 0000 |
| 0000557560 | 0000 | 0000 | 6D5F | 5F62 | 7566 | 636E | 0000 | 0000 |
| 0000557600 | FFFE | 000A | 010F | 0000 | 0000 | 0000 | 0002 | 0000 |
| 0000557620 | 0000 | 17A0 | 0000 | 0000 | 0000 | 0000 | 310F | 0000 |
| 0000557640 | 0000 | 0000 | FFFF | 000B | 0110 | 0000 | 0000 | 0000 |
| 0000557660 | 0002 | 0000 | 0000 | 0000 | 0000 | 0000 | 4D5F | 5F42 |
| 0000557700 | 5845 | 5257 | 0001 | 0000 | FFFF | 000B | 0110 | 0000 |
| 0000557720 | 0000 | 0000 | 0002 | 0000 | 0000 | 0000 | 0000 | 0000 |
| 0000557740 | 4D5F | 5F42 | 4552 | 4441 | 0002 | 0000 | FFFF | 000B |
| 0000557760 | 0110 | 0000 | 0000 | 0000 | 0002 | 0000 | 0000 | 0000 |
| 0000560000 | 0000 | 0000 | 4D5F | 5F42 | 504F | 4E45 | 0003 | 0000 |
| 0000560020 | FFFF | 000B | 0110 | 0000 | 0000 | 0000 | 0002 | 0000 |
| 0000560040 | 0000 | 0000 | 0000 | 0000 | 652E | 736F | 0000 | 0000 |
| 0000560060 | 0000 | 0000 | FFFE | 000A | 0166 | 1794 | 0000 | 0000 |
| 0000560100 | 0002 | 0000 | 0000 | 0000 | 0000 | 0000 | 0000 | 0000 |
| 0000560120 | 3119 | 0000 | 0000 | 0000 | FFFE | 000A | 010F | 0000 |
| 0000560140 | 0000 | 0000 | 0002 | 0000 | 0000 | 17AA | 0000 | 0000 |
| 0000560160 | 0000 | 0000 | 3123 | 0000 | 0000 | 0000 | FFFF | 000B |
| 0000560200 | 0110 | 0000 | 0000 | 0000 | 0002 | 0000 | 0000 | 0000 |
| 0000560220 | 0000 | 0000 | 0000 | 0000 | 312F | 0000 | 0001 | 0000 |
| 0000560240 | FFFF | 000B | 0110 | 0000 | 0000 | 0000 | 0002 | 0000 |
| 0000560260 | 0000 | 0000 | 0000 | 0000 | 4D5F | 3442 | 525F | 0044 |
| 0000560300 | 0003 | 0000 | FFFF | 000B | 0110 | 0000 | 0000 | 0000 |
| 0000560320 | 0002 | 0000 | 0000 | 0000 | 0000 | 0000 | 652E | 736F |
| 0000560340 | 0000 | 0000 | 0000 | 0000 | FFFE | 000A | 0166 | 17A0 |
| 0000560360 | 0000 | 0000 | 0002 | 0000 | 0000 | 0000 | 0000 | 0000 |
| 0000560400 | 0000 | 0000 | 313A | 0000 | 0000 | 0000 | FFFE | 000A |
| 0000560420 | 010F | 0000 | 0000 | 0000 | 0002 | 0000 | 0000 | 17B2 |
| 0000560440 | 0000 | 0000 | 4D5F | 3542 | 575F | 0052 | 0000 | 0000 |
| 0000560460 | FFFF | 000B | 0110 | 0000 | 0000 | 0000 | 0002 | 0000 |
| 0000560500 | 0000 | 0000 | 0000 | 0000 | 4D5F | 3542 | 525F | 0044 |
| 0000560520 | 0003 | 0000 | FFFF | 000B | 0110 | 0000 | 0000 | 0000 |
| 0000560540 | 0002 | 0000 | 0000 | 0000 | 0000 | 0000 | 652E | 736F |
| 0000560560 | 0000 | 0000 | 0000 | 0000 | FFFE | 000A | 0166 | 17AA |

THU MAR 14 17:37:32 1991 GSPMON.4 PAGE 201, LINE 11801

| | | | | | | | | |
|---|---|---|---|---|---|---|---|---|
| 0000560600 | 0000 | 0000 | 0002 | 0000 | 0000 | 0000 | 0000 | 0000 |
| 0000560620 | 0000 | 0000 | 3144 | 0000 | 0000 | 0000 | FFFE | 000A |
| 0000560640 | 010F | 0000 | 0000 | 0000 | 0001 | 0000 | 0000 | 17BA |
| 0000560660 | 0000 | 0000 | 0000 | 0000 | 3150 | 0000 | 0000 | 0000 |
| 0000560700 | FFFF | 000B | 0110 | 0000 | 0000 | 0000 | 0001 | 0000 |
| 0000560720 | 0000 | 0000 | 0000 | 0000 | 0000 | 0000 | 315B | 0000 |
| 0000560740 | 0001 | 0000 | FFFF | 000B | 0110 | 0000 | 0000 | 0000 |
| 0000560760 | 0001 | 0000 | 0000 | 0000 | 0000 | 0000 | 652E | 736F |
| 0000561000 | 0000 | 0000 | 0000 | 0000 | FFFE | 000A | 0166 | 17B2 |
| 0000561020 | 0000 | 0000 | 0001 | 0000 | 0000 | 0000 | 0000 | 0000 |
| 0000561040 | 0000 | 0000 | 3165 | 0000 | 0000 | 0000 | FFFE | 000A |
| 0000561060 | 010F | 0000 | 0000 | 0000 | 0001 | 0000 | 0000 | 17C2 |
| 0000561100 | 0000 | 0000 | 0000 | 0000 | 3172 | 0000 | 0000 | 0000 |
| 0000561120 | FFFF | 000B | 0110 | 0000 | 0000 | 0000 | 0001 | 0000 |
| 0000561140 | 0000 | 0000 | 0000 | 0000 | 0000 | 0000 | 317E | 0000 |
| 0000561160 | 0001 | 0000 | FFFF | 000B | 0110 | 0000 | 0000 | 0000 |
| 0000561200 | 0001 | 0000 | 0000 | 0000 | 0000 | 0000 | 652E | 736F |
| 0000561220 | 0000 | 0000 | 0000 | 0000 | FFFE | 000A | 0166 | 17BA |
| 0000561240 | 0000 | 0000 | 0001 | 0000 | 0000 | 0000 | 0000 | 0000 |
| 0000561260 | 0000 | 0000 | 318B | 0000 | 0000 | 0000 | FFFE | 000A |
| 0000561300 | 010F | 0000 | 0000 | 0000 | 0003 | 0000 | 0000 | 17D2 |
| 0000561320 | 0000 | 0000 | 585F | 424D | 0030 | 0000 | 0000 | 0000 |
| 0000561340 | FFFF | 000B | 0110 | 0000 | 0000 | 0000 | 0003 | 0000 |
| 0000561360 | 0000 | 0000 | 0000 | 0000 | 585F | 424D | 0031 | 0000 |
| 0000561400 | 0001 | 0000 | FFFF | 000B | 0110 | 0000 | 0000 | 0000 |
| 0000561420 | 0003 | 0000 | 0000 | 0000 | 0000 | 0000 | 585F | 424D |
| 0000561440 | 0032 | 0000 | 0002 | 0000 | FFFF | 000B | 0110 | 0000 |
| 0000561460 | 0000 | 0000 | 0003 | 0000 | 0000 | 0000 | 0000 | 0000 |
| 0000561500 | 585F | 424D | 0033 | 0000 | 0003 | 0000 | FFFF | 000B |
| 0000561520 | 0110 | 0000 | 0000 | 0000 | 0003 | 0000 | 0000 | 0000 |
| 0000561540 | 0000 | 0000 | 585F | 424D | 0034 | 0000 | 0004 | 0000 |
| 0000561560 | FFFF | 000B | 0110 | 0000 | 0000 | 0000 | 0003 | 0000 |
| 0000561600 | 0000 | 0000 | 0000 | 0000 | 585F | 424D | 0035 | 0000 |
| 0000561620 | 0005 | 0000 | FFFF | 000B | 0110 | 0000 | 0000 | 0000 |
| 0000561640 | 0003 | 0000 | 0000 | 0000 | 0000 | 0000 | 652E | 736F |
| 0000561660 | 0000 | 0000 | 0000 | 0000 | FFFE | 000A | 0166 | 17C2 |
| 0000561700 | 0000 | 0000 | 0003 | 0000 | 0000 | 0000 | 0000 | 0000 |
| 0000561720 | 635F | 6E68 | 006C | 0000 | 0000 | 0000 | FFFE | 000A |
| 0000561740 | 010F | 0000 | 0000 | 0000 | 0002 | 0000 | 0000 | 17DE |
| 0000561760 | 0000 | 0000 | 525F | 4445 | 435F | 0048 | 0000 | 0000 |
| 0000562000 | FFFF | 000B | 0110 | 0000 | 0000 | 0000 | 0002 | 0000 |
| 0000562020 | 0000 | 0000 | 0000 | 0000 | 0000 | 0000 | 3195 | 0000 |
| 0000562040 | 0001 | 0000 | FFFF | 000B | 0110 | 0000 | 0000 | 0000 |
| 0000562060 | 0002 | 0000 | 0000 | 0000 | 0000 | 0000 | 425F | 554C |
| 0000562100 | 5F45 | 4843 | 0002 | 0000 | FFFF | 000B | 0110 | 0000 |
| 0000562120 | 0000 | 0000 | 0002 | 0000 | 0000 | 0000 | 0000 | 0000 |
| 0000562140 | 0000 | 0000 | 319F | 0000 | 0003 | 0000 | FFFF | 000B |
| 0000562160 | 0110 | 0000 | 0000 | 0000 | 0002 | 0000 | 0000 | 0000 |
| 0000562200 | 0000 | 0000 | 652E | 736F | 0000 | 0000 | 0000 | 0000 |
| 0000562220 | FFFE | 000A | 0166 | 17D2 | 0000 | 0000 | 0002 | 0000 |
| 0000562240 | 0000 | 0000 | 0000 | 0000 | 0000 | 0000 | 31AB | 0000 |
| 0000562260 | 0000 | 0000 | FFFE | 000A | 010F | 0000 | 0000 | 0000 |
| 0000562300 | 0001 | 0000 | 0000 | 17E6 | 0000 | 0000 | 0000 | 0000 |
| 0000562320 | 31B5 | 0000 | 0000 | 0000 | FFFF | 000B | 0110 | 0000 |
| 0000562340 | 0000 | 0000 | 0001 | 0000 | 0000 | 0000 | 0000 | 0000 |
| 0000562360 | 435F | 4359 | 494C | 0043 | 0001 | 0000 | FFFF | 000B |
| 0000562400 | 0110 | 0000 | 0000 | 0000 | 0001 | 0000 | 0000 | 0000 |
| 0000562420 | 0000 | 0000 | 652E | 736F | 0000 | 0000 | 0000 | 0000 |
| 0000562440 | FFFE | 000A | 0166 | 17DE | 0000 | 0000 | 0001 | 0000 |

THU MAR 14 17:37:32 1991 GSPMON.4 PAGE 202, LINE 11860

| | | | | | | | | |
|---|---|---|---|---|---|---|---|---|
| 0000562460 | 0000 | 0000 | 0000 | 0000 | 662E | 6C69 | 0065 | 0000 |
| 0000562500 | 17E8 | 0000 | FFFE | 0000 | 0167 | 7067 | 645F | 7369 |
| 0000562520 | 2E70 | 0063 | 0000 | 0000 | 0000 | 0000 | 662E | 6C69 |
| 0000562540 | 0065 | 0000 | 17EA | 0000 | FFFE | 0000 | 0167 | 7367 |
| 0000562560 | 6870 | 6477 | 682E | 0000 | 0000 | 0000 | 0000 | 0000 |
| 0000562600 | 662E | 6C69 | 0065 | 0000 | 17EC | 0000 | FFFE | 0000 |
| 0000562620 | 0167 | 7067 | 645F | 7369 | 2E70 | 0063 | 0000 | 0000 |
| 0000562640 | 0000 | 0000 | 662E | 6C69 | 0065 | 0000 | 18B0 | 0000 |
| 0000562660 | FFFE | 0000 | 0167 | 7067 | 705F | 6275 | 682E | 0000 |
| 0000562700 | 0000 | 0000 | 0000 | 0000 | 332E | 6166 | 656B | 0000 |
| 0000562720 | 0000 | 0000 | FFFE | 0008 | 010A | 0000 | 0000 | 0000 |
| 0000562740 | 01C0 | 0000 | 0000 | 181E | 0000 | 0000 | 685F | 7365 |
| 0000562760 | 6E79 | 0063 | 0000 | 0000 | FFFF | 000D | 0108 | 0000 |
| 0000563000 | 0000 | 0000 | 0010 | 0000 | 0000 | 0000 | 0000 | 0000 |
| 0000563020 | 685F | 6265 | 6E6C | 006B | 0010 | 0000 | FFFF | 000D |
| 0000563040 | 0108 | 0000 | 0000 | 0000 | 0010 | 0000 | 0000 | 0000 |
| 0000563060 | 0000 | 0000 | 685F | 6273 | 6E6C | 006B | 0020 | 0000 |
| 0000563100 | FFFF | 000D | 0108 | 0000 | 0000 | 0000 | 0010 | 0000 |
| 0000563120 | 0000 | 0000 | 0000 | 0000 | 765F | 7365 | 6E79 | 0063 |
| 0000563140 | 0030 | 0000 | FFFF | 000D | 0108 | 0000 | 0000 | 0000 |
| 0000563160 | 0010 | 0000 | 0000 | 0000 | 0000 | 0000 | 765F | 6265 |
| 0000563200 | 6E6C | 006B | 0040 | 0000 | FFFF | 000D | 0108 | 0000 |
| 0000563220 | 0000 | 0000 | 0010 | 0000 | 0000 | 0000 | 0000 | 0000 |
| 0000563240 | 765F | 6273 | 6E6C | 006B | 0050 | 0000 | FFFF | 000D |
| 0000563260 | 0108 | 0000 | 0000 | 0000 | 0010 | 0000 | 0000 | 0000 |
| 0000563300 | 0000 | 0000 | 0000 | 0000 | 31BF | 0000 | 0060 | 0000 |
| 0000563320 | FFFF | 000D | 0108 | 0000 | 0000 | 0000 | 0010 | 0000 |
| 0000563340 | 0000 | 0000 | 0000 | 0000 | 665F | 6468 | 7369 | 0070 |
| 0000563360 | 0070 | 0000 | FFFF | 000D | 0108 | 0000 | 0000 | 0000 |
| 0000563400 | 0010 | 0000 | 0000 | 0000 | 0000 | 0000 | 6D5F | 5F62 |
| 0000563420 | 6973 | 657A | 0080 | 0000 | FFFF | 000F | 0108 | 0000 |
| 0000563440 | 0000 | 0000 | 0020 | 0000 | 0000 | 0000 | 0000 | 0000 |
| 0000563460 | 0000 | 0000 | 31CA | 0000 | 00A0 | 0000 | FFFF | 000D |
| 0000563500 | 0108 | 0000 | 0000 | 0000 | 0010 | 0000 | 0000 | 0000 |
| 0000563520 | 0000 | 0000 | 0000 | 0000 | 31D4 | 0000 | 00B0 | 0000 |
| 0000563540 | FFFF | 000D | 0108 | 0000 | 0000 | 0000 | 0010 | 0000 |
| 0000563560 | 0000 | 0000 | 0000 | 0000 | 0000 | 0000 | 31DE | 0000 |
| 0000563600 | 00C0 | 0000 | FFFF | 000D | 0108 | 0000 | 0000 | 0000 |
| 0000563620 | 0010 | 0000 | 0000 | 0000 | 0000 | 0000 | 0000 | 0000 |
| 0000563640 | 31E9 | 0000 | 00D0 | 0000 | FFFF | 000D | 0108 | 0000 |
| 0000563660 | 0000 | 0000 | 0010 | 0000 | 0000 | 0000 | 0000 | 0000 |
| 0000563700 | 0000 | 0000 | 31F3 | 0000 | 00E0 | 0000 | FFFF | 000F |
| 0000563720 | 0108 | 0000 | 0000 | 0000 | 0020 | 0000 | 0000 | 0000 |
| 0000563740 | 0000 | 0000 | 0000 | 0000 | 3200 | 0000 | 0100 | 0000 |
| 0000563760 | FFFF | 000F | 0108 | 0000 | 0000 | 0000 | 0020 | 0000 |
| 0000564000 | 0000 | 0000 | 0000 | 0000 | 0000 | 0000 | 3212 | 0000 |
| 0000564020 | 0120 | 0000 | FFFF | 000F | 0108 | 0000 | 0000 | 0000 |
| 0000564040 | 0020 | 000C | 0000 | 0000 | 0000 | 0000 | 0000 | 0000 |
| 0000564060 | 3221 | 0000 | 0140 | 0000 | FFFF | 000F | 0108 | 0000 |
| 0000564100 | 0000 | 0000 | 0020 | 0000 | 0000 | 0000 | 0000 | 0000 |
| 0000564120 | 0000 | 0000 | 3237 | 0000 | 0160 | 0000 | FFFF | 000D |
| 0000564140 | 0108 | 0000 | 0000 | 0000 | 0010 | 0000 | 0000 | 0000 |
| 0000564160 | 0000 | 0000 | 0000 | 0000 | 3242 | 0000 | 0170 | 0000 |
| 0000564200 | FFFF | 000D | 0108 | 0000 | 0000 | 0000 | 0010 | 0000 |
| 0000564220 | 0000 | 0000 | 0000 | 0000 | 0000 | 0000 | 3256 | 0000 |
| 0000564240 | 0180 | 0000 | FFFF | 000D | 0108 | 0000 | 0000 | 0000 |
| 0000564260 | 0010 | 0000 | 0000 | 0000 | 0000 | 0000 | 0000 | 0000 |
| 0000564300 | 326A | 0000 | 0190 | 0000 | FFFF | 000F | 0108 | 0000 |
| 0000564320 | 0000 | 0000 | 0020 | 0000 | 0000 | 0000 | 0000 | 0000 |

THU MAR 14 17:37:32 1991 GSPMON.4 PAGE 203, LINE 11919

| | | | | | | | | |
|---|---|---|---|---|---|---|---|---|
| 0000564340 | 0000 | 0000 | 3279 | 0000 | 01B0 | 0000 | FFFF | 000D |
| 0000564360 | 0108 | 0000 | 0000 | 0000 | 0010 | 0000 | 0000 | 0000 |
| 0000564400 | 0000 | 0000 | 652E | 736F | 0000 | 0000 | 0000 | 0000 |
| 0000564420 | FFFE | 0008 | 0166 | 17EE | 0000 | 0000 | 01C0 | 0000 |
| 0000564440 | 0000 | 0000 | 0000 | 0000 | 342E | 6166 | 656B | 0000 |
| 0000564460 | 0000 | 0000 | FFFE | 0008 | 010A | 0000 | 0000 | 0000 |
| 0000564500 | 0050 | 0000 | 0000 | 1828 | 0000 | 0000 | 6D5F | 6773 |
| 0000564520 | 705F | 7274 | 0000 | 0000 | FFFF | 0010 | 0108 | 0000 |
| 0000564540 | 0000 | 0000 | 0020 | 0000 | 0000 | 0000 | 0000 | 0000 |
| 0000564560 | 0000 | 0000 | 3285 | 0000 | 0020 | 0000 | FFFF | 000F |
| 0000564600 | 0108 | 0000 | 0000 | 0000 | 0020 | 0000 | 0000 | 0000 |
| 0000564620 | 0000 | 0000 | 0000 | 0000 | 328F | 0000 | 0040 | 0000 |
| 0000564640 | FFFF | 000D | 0108 | 0000 | 0000 | 0000 | 0010 | 0000 |
| 0000564660 | 0000 | 0000 | 0000 | 0000 | 652E | 736F | 0000 | 0000 |
| 0000564700 | 0000 | 0000 | FFFE | 0008 | 0166 | 181E | 0000 | 0000 |
| 0000564720 | 0050 | 0000 | 0000 | 0000 | 0000 | 0000 | 352E | 6166 |
| 0000564740 | 656B | 0000 | 0000 | 0000 | FFFE | 0008 | 010A | 0000 |
| 0000564760 | 0000 | 0000 | 0040 | 0000 | 0000 | 1834 | 0000 | 0000 |
| 0000565000 | 0000 | 0000 | 329A | 0000 | 0000 | 0000 | FFFF | 000D |
| 0000565020 | 0108 | 0000 | 0000 | 0000 | 0010 | 0000 | 0000 | 0000 |
| 0000565040 | 0000 | 0000 | 6A5F | 6D75 | 0070 | 0000 | 0010 | 0000 |
| 0000565060 | FFFF | 000D | 0108 | 0000 | 0000 | 0000 | 0010 | 0000 |
| 0000565100 | 0000 | 0000 | 0000 | 0000 | 735F | 6174 | 7472 | 0000 |
| 0000565120 | 0020 | 0000 | FFFF | 000D | 0108 | 0000 | 0000 | 0000 |
| 0000565140 | 0010 | 0000 | 0000 | 0000 | 0000 | 0000 | 655F | 646E |
| 0000565160 | 0000 | 0000 | 0030 | 0000 | FFFF | 000D | 0108 | 0000 |
| 0000565200 | 0000 | 0000 | 0010 | 0000 | 0000 | 0000 | 0000 | 0000 |
| 0000565220 | 652E | 736F | 0000 | 0000 | 0000 | 0000 | FFFE | 0008 |
| 0000565240 | 0166 | 1828 | 0000 | 0000 | 0040 | 0000 | 0000 | 0000 |
| 0000565260 | 0000 | 0000 | 362E | 6166 | 656B | 0000 | 0000 | 0000 |
| 0000565300 | FFFE | 0008 | 010A | 0000 | 0000 | 0000 | 0080 | 0000 |
| 0000565320 | 0000 | 183C | 0000 | 0000 | 685F | 0000 | 0000 | 0000 |
| 0000565340 | 0000 | 0000 | FFFF | 0008 | 0108 | 1828 | 0000 | 0000 |
| 0000565360 | 0040 | 0000 | 0000 | 0000 | 0000 | 0000 | 765F | 0000 |
| 0000565400 | 0000 | 0000 | 0040 | 0000 | FFFF | 0008 | 0108 | 1828 |
| 0000565420 | 0000 | 0000 | 0040 | 0000 | 0000 | 0000 | 0000 | 0000 |
| 0000565440 | 652E | 736F | 0000 | 0000 | 0000 | 0000 | FFFE | 0008 |
| 0000565460 | 0166 | 1834 | 0000 | 0000 | 0080 | 0000 | 0000 | 0000 |
| 0000565500 | 0000 | 0000 | 372E | 6166 | 656B | 0000 | 0000 | 0000 |
| 0000565520 | FFFE | 0009 | 010C | 0000 | 0000 | 0000 | 0200 | 0000 |
| 0000565540 | 0000 | 1846 | 0000 | 0000 | 635F | 6B68 | 7573 | 006D |
| 0000565560 | 0000 | 0000 | FFFF | 003D | 010B | 0000 | 0000 | 0000 |
| 0000565600 | 0200 | 0020 | 0000 | 0000 | 0000 | 0000 | 655F | 7272 |
| 0000565620 | 6E63 | 0074 | 0000 | 0000 | FFFF | 003D | 010B | 0000 |
| 0000565640 | 0000 | 0000 | 0200 | 0020 | 0000 | 0000 | 0000 | 0000 |
| 0000565660 | 635F | 6372 | 3233 | 0000 | 0000 | 0000 | FFFF | 003D |
| 0000565700 | 010B | 0000 | 0000 | 0000 | 0200 | 0020 | 0000 | 0000 |
| 0000565720 | 0000 | 0000 | 652E | 736F | 0000 | 0000 | 0000 | 0000 |
| 0000565740 | FFFE | 0009 | 0166 | 183C | 0000 | 0000 | 0200 | 0000 |
| 0000565760 | 0000 | 0000 | 0000 | 0000 | 382E | 6166 | 656B | 0000 |
| 0000566000 | 0000 | 0000 | FFFE | 0008 | 010A | 0000 | 0000 | 0000 |
| 0000566020 | 0240 | 0000 | 0000 | 184E | 0000 | 0000 | 0000 | 0000 |
| 0000566040 | 32A6 | 0000 | 0000 | 0000 | FFFF | 0008 | 0108 | 1828 |
| 0000566060 | 0000 | 0000 | 0040 | 0000 | 0000 | 0000 | 0000 | 0000 |
| 0000566100 | 0000 | 0000 | 32B3 | 0000 | 0040 | 0000 | FFFF | 0009 |
| 0000566120 | 0108 | 183C | 0000 | 0000 | 0200 | 0000 | 0000 | 0000 |
| 0000566140 | 0000 | 0000 | 652E | 736F | 0000 | 0000 | 0000 | 0000 |
| 0000566160 | FFFE | 0008 | 0166 | 1846 | 0000 | 0000 | 0240 | 0000 |
| 0000566200 | 0000 | 0000 | 0000 | 0000 | 392E | 6166 | 656B | 0000 |

THU MAR 14 17:37:32 1991 GSPMON.4 PAGE 204, LINE 11978

| | | | | | | | | |
|---|---|---|---|---|---|---|---|---|
| 0000566220 | 0000 | 0000 | FFFE | 0009 | 010C | 0000 | 0000 | 0000 |
| 0000566240 | 4000 | 0000 | 0000 | 1858 | 0000 | 0000 | 635F | 6B68 |
| 0000566260 | 7573 | 006D | 0000 | 0000 | FFFF | 00FD | 010B | 0000 |
| 0000566300 | 0000 | 0000 | 4000 | 0020 | 0020 | 0000 | 0000 | 0000 |
| 0000566320 | 655F | 7272 | 6E63 | 0074 | 0000 | 0000 | FFFF | 00FD |
| 0000566340 | 010B | 0000 | 0000 | 0000 | 4000 | 0020 | 0020 | 0000 |
| 0000566360 | 0000 | 0000 | 635F | 6372 | 3233 | 0000 | 0000 | 0000 |
| 0000566400 | FFFF | 00FD | 010B | 0000 | 0000 | 0000 | 4000 | 0020 |
| 0000566420 | 0020 | 0000 | 0000 | 0000 | 652E | 736F | 0000 | 0000 |
| 0000566440 | 0000 | 0000 | FFFE | 0009 | 0166 | 184E | 0000 | 0000 |
| 0000566460 | 4000 | 0000 | 0000 | 0000 | 0000 | 0000 | 312E | 6630 |
| 0000566500 | 6B61 | 0065 | 0000 | 0000 | FFFE | 0008 | 010A | 0000 |
| 0000566520 | 0000 | 0000 | 4080 | 0000 | 0000 | 1862 | 0000 | 0000 |
| 0000566540 | 0000 | 0000 | 32BF | 0000 | 0000 | 0000 | FFFF | 0008 |
| 0000566560 | 0108 | 1828 | 0000 | 0000 | 0040 | 0000 | 0000 | 0000 |
| 0000566600 | 0000 | 0000 | 0000 | 0000 | 32CC | 0000 | 0040 | 0000 |
| 0000566620 | FFFF | 0008 | 0108 | 1828 | 0000 | 0000 | 0040 | 0000 |
| 0000566640 | 0000 | 0000 | 0000 | 0000 | 0000 | 0000 | 32D8 | 0000 |
| 0000566660 | 0080 | 0000 | FFFF | 0009 | 0108 | 184E | 0000 | 0000 |
| 0000566700 | 4000 | 0000 | 0000 | 0000 | 0000 | 0000 | 652E | 736F |
| 0000566720 | 0000 | 0000 | 0000 | 0000 | FFFE | 0008 | 0166 | 1858 |
| 0000566740 | 0000 | 0000 | 4080 | 0000 | 0000 | 0000 | 0000 | 0000 |
| 0000566760 | 312E | 6631 | 6B61 | 0065 | 0000 | 0000 | FFFE | 0009 |
| 0000567000 | 010C | 0000 | 0000 | 0000 | 0090 | 0000 | 0000 | 186C |
| 0000567020 | 0000 | 0000 | 635F | 6B68 | 7573 | 006D | 0000 | 0000 |
| 0000567040 | FFFF | 00FD | 010B | 0000 | 0000 | 0000 | 0090 | 0003 |
| 0000567060 | 0003 | 0000 | 0000 | 0000 | 655F | 7272 | 6E63 | 0074 |
| 0000567100 | 0000 | 0000 | FFFF | 00FD | 010B | 0000 | 0000 | 0000 |
| 0000567120 | 0090 | 0003 | 0003 | 0000 | 0000 | 0000 | 625F | 7263 |
| 0000567140 | 3363 | 0032 | 0000 | 0000 | FFFF | 00FD | 010B | 0000 |
| 0000567160 | 0000 | 0000 | 0090 | 0003 | 0003 | 0000 | 0000 | 0000 |
| 0000567200 | 652E | 736F | 0000 | 0000 | 0000 | 0000 | FFFE | 0009 |
| 0000567220 | 0166 | 1862 | 0000 | 0000 | 0090 | 0000 | 0000 | 0000 |
| 0000567240 | 0000 | 0000 | 312E | 6632 | 6B61 | 0065 | 0000 | 0000 |
| 0000567260 | FFFE | 0008 | 010A | 0000 | 0000 | 0000 | 0130 | 0000 |
| 0000567300 | 0000 | 187A | 0000 | 0000 | 0000 | 0000 | 32E2 | 0000 |
| 0000567320 | 0000 | 0000 | FFFF | 0008 | 0108 | 1828 | 0000 | 0000 |
| 0000567340 | 0040 | 0000 | 0000 | 0000 | 0000 | 0000 | 0000 | 0000 |
| 0000567360 | 32EF | 0000 | 0040 | 0000 | FFFF | 0008 | 0108 | 1828 |
| 0000567400 | 0000 | 0000 | 0040 | 0000 | 0000 | 0000 | 0000 | 0000 |
| 0000567420 | 785F | 635F | 6F6F | 6472 | 0080 | 0000 | FFFF | 0003 |
| 0000567440 | 0108 | 0000 | 0000 | 0000 | 0010 | 0000 | 0000 | 0000 |
| 0000567460 | 0000 | 0000 | 795F | 635F | 6F6F | 6472 | 0090 | 0000 |
| 0000567500 | FFFF | 0003 | 0108 | 0000 | 0000 | 0000 | 0010 | 0000 |
| 0000567520 | 0000 | 0000 | 0000 | 0000 | 0000 | 0000 | 32FB | 0000 |
| 0000567540 | 00A0 | 0000 | FFFF | 0009 | 0108 | 1862 | 0000 | 0000 |
| 0000567560 | 0090 | 0000 | 0000 | 0000 | 0000 | 0000 | 652E | 736F |
| 0000567600 | 0000 | 0000 | 0000 | 0000 | FFFE | 0008 | 0166 | 186C |
| 0000567620 | 0000 | 0000 | 0130 | 0000 | 0000 | 0000 | 0000 | 0000 |
| 0000567640 | 312E | 6633 | 6B61 | 0065 | 0000 | 0000 | FFFE | 0008 |
| 0000567660 | 010A | 0000 | 0000 | 0000 | 0050 | 0000 | 0000 | 1886 |
| 0000567700 | 0000 | 0000 | 0000 | 0000 | 3305 | 0000 | 0000 | 0000 |
| 0000567720 | FFFF | 000D | 0108 | 0000 | 0000 | 0000 | 0010 | 0000 |
| 0000567740 | 0000 | 0000 | 0000 | 0000 | 0000 | 0000 | 331D | 0000 |
| 0000567760 | 0010 | 0000 | FFFF | 000D | 0108 | 0000 | 0000 | 0000 |
| 0000570000 | 0010 | 0000 | 0000 | 0000 | 0000 | 0000 | 0000 | 0000 |
| 0000570020 | 332F | 0000 | 0020 | 0000 | FFFF | 000D | 0108 | 0000 |
| 0000570040 | 0000 | 0000 | 0010 | 0000 | 0000 | 0000 | 0000 | 0000 |
| 0000570060 | 0000 | 0000 | 333A | 0000 | 0030 | 0000 | FFFF | 0010 |

THU MAR 14 17:37:32 1991 GSPMON.4 PAGE 205, LINE 12037

| | | | | | | | | |
|---|---|---|---|---|---|---|---|---|
| 0000570100 | 0108 | 0000 | 0000 | 0000 | 0020 | 0000 | 0000 | 0000 |
| 0000570120 | 0000 | 0000 | 652E | 736F | 0000 | 0000 | 0000 | 0000 |
| 0000570140 | FFFE | 0008 | 0166 | 187A | 0000 | 0000 | 0050 | 0000 |
| 0000570160 | 0000 | 0000 | 0000 | 0000 | 312E | 6634 | 6B61 | 0065 |
| 0000570200 | 0000 | 0000 | FFFE | 0008 | 010A | 0000 | 0000 | 0000 |
| 0000570220 | 0040 | 0000 | 0000 | 188E | 0000 | 0000 | 0000 | 0000 |
| 0000570240 | 3344 | 0000 | 0000 | 0000 | FFFF | 0005 | 0108 | 0000 |
| 0000570260 | 0000 | 0000 | 0020 | 0000 | 0000 | 0000 | 0000 | 0000 |
| 0000570300 | 0000 | 0000 | 3354 | 0000 | 0020 | 0000 | FFFF | 0005 |
| 0000570320 | 0108 | 0000 | 0000 | 0000 | 0020 | 0000 | 0000 | 0000 |
| 0000570340 | 0000 | 0000 | 652E | 736F | 0000 | 0000 | 0000 | 0000 |
| 0000570360 | FFFE | 0008 | 0166 | 1886 | 0000 | 0000 | 0040 | 0000 |
| 0000570400 | 0000 | 0000 | 0000 | 0000 | 312E | 6635 | 6B61 | 0065 |
| 0000570420 | 0000 | 0000 | FFFE | 0008 | 010A | 0000 | 0000 | 0000 |
| 0000570440 | 0050 | 0000 | 0000 | 189C | 0000 | 0000 | 785F | 656C |
| 0000570460 | 7466 | 0000 | 0000 | 0000 | FFFF | 00G3 | 0108 | 0000 |
| 0000570500 | 0000 | 0000 | 0010 | 0000 | 0000 | 0000 | 0000 | 0000 |
| 0000570520 | 795F | 6F74 | 0070 | 0000 | 0010 | 0000 | FFFF | 0003 |
| 0000570540 | 0108 | 0000 | 0000 | 0000 | 0010 | 0000 | 0000 | 0000 |
| 0000570560 | 0000 | 0000 | 785F | 6972 | 6867 | 0074 | 0020 | 0000 |
| 0000570600 | FFFF | 0003 | 0108 | 0000 | 0000 | 0000 | 0010 | 0000 |
| 0000570620 | 0000 | 0000 | 0000 | 0000 | 795F | 6F64 | 6E77 | 0000 |
| 0000570640 | 0030 | 0000 | FFFF | 0003 | 0108 | 0000 | 0000 | 0000 |
| 0000570660 | 0010 | 0000 | 0000 | 0000 | 0000 | 0000 | 0000 | 0000 |
| 0000570700 | 3363 | 0000 | 0040 | 0000 | FFFF | 0003 | 0108 | 0000 |
| 0000570720 | 0000 | 0000 | 0010 | 0000 | 0000 | 0000 | 0000 | 0000 |
| 0000570740 | 652E | 736F | 0000 | 0000 | 0000 | 0000 | FFFE | 0008 |
| 0000570760 | 0166 | 188E | 0000 | 0000 | 0050 | 0000 | 0000 | 0000 |
| 0000571000 | 0000 | 0000 | 312E | 6636 | 6B61 | 0065 | 0000 | 0000 |
| 0000571020 | FFFE | 0008 | 010A | 0000 | 0000 | 0000 | 0020 | 0000 |
| 0000571040 | 0000 | 18A4 | 0000 | 0000 | 0000 | 0000 | 336D | 0000 |
| 0000571060 | 0000 | 0000 | FFFF | 0003 | 0108 | 0000 | 0000 | 0000 |
| 0000571100 | 0010 | 0000 | 0000 | 0000 | 0000 | 0000 | 0000 | 0000 |
| 0000571120 | 3379 | 0000 | 0010 | 0000 | FFFF | 0003 | 0108 | 0000 |
| 0000571140 | 0000 | 0000 | 0010 | 0000 | 0000 | 0000 | 0000 | 0000 |
| 0000571160 | 652E | 736F | 0000 | 0000 | 0000 | 0000 | FFFE | 0008 |
| 0000571200 | 0166 | 189C | 0000 | 0000 | 0020 | 0000 | 0000 | 0000 |
| 0000571220 | 0000 | 0000 | 312E | 6637 | 6B61 | 0065 | 0000 | 0000 |
| 0000571240 | FFFE | 0008 | 010A | 0000 | 0000 | 0000 | 0040 | 0000 |
| 0000571260 | 0000 | 18B0 | 0000 | 0000 | 0000 | 0000 | 3383 | 0000 |
| 0000571300 | 0000 | 0000 | FFFF | 000D | 0108 | 0000 | 0000 | 0000 |
| 0000571320 | 0010 | 0000 | 0000 | 0000 | 0000 | 0000 | 0000 | 0000 |
| 0000571340 | 3396 | 0000 | 0010 | 0000 | FFFF | 000D | 0108 | 0000 |
| 0000571360 | 0000 | 0000 | 0010 | 0000 | 0000 | 0000 | 0000 | 0000 |
| 0000571400 | 0000 | 0000 | 33A8 | 0000 | 0020 | 0000 | FFFF | 000D |
| 0000571420 | 0108 | 0000 | 0000 | 0000 | 0010 | 0000 | 0000 | 0000 |
| 0000571440 | 0000 | 0000 | 0000 | 0000 | 33B5 | 0000 | 0030 | 0000 |
| 0000571460 | FFFF | 000D | 0108 | 0000 | 0000 | 0000 | 0010 | 0000 |
| 0000571500 | 0000 | 0000 | 0000 | 0000 | 652E | 736F | 0000 | 0000 |
| 0000571520 | 0000 | 0000 | FFFE | 0008 | 0166 | 18A4 | 0000 | 0000 |
| 0000571540 | 0040 | 0000 | 0000 | 0000 | 0000 | 0000 | 662E | 6C69 |
| 0000571560 | 0065 | 0000 | 18B2 | 0000 | FFFE | 0000 | 0167 | 7067 |
| 0000571600 | 645F | 7369 | 2E70 | 0063 | 0000 | 0000 | 0000 | 0000 |
| 0000571620 | 662E | 6C69 | 0065 | 0000 | 191E | 0000 | FFFE | 0000 |
| 0000571640 | 0167 | 7067 | 6D5F | 756F | 682E | 0000 | 0000 | 0000 |
| 0000571660 | 0000 | 0000 | 312E | 6638 | 6B61 | 0065 | 0000 | 0000 |
| 0000571700 | FFFE | 0008 | 010A | 0000 | 0000 | 0000 | 0060 | 0000 |
| 0000571720 | 0000 | 18BE | 0000 | 0000 | 0000 | 0000 | 33C3 | 0000 |
| 0000571740 | 0000 | 0000 | FFFF | 000F | 0108 | 0000 | 0000 | 0000 |

THU MAR 14 17:37:32 1991 GSPMON.4 PAGE 206, LINE 12096

| | | | | | | | | |
|---|---|---|---|---|---|---|---|---|
| 0000571760 | 0020 | 0000 | 0000 | 0000 | 0000 | 0000 | 0000 | 0000 |
| 0000572000 | 33D0 | 0000 | 0020 | 0000 | FFFF | 000F | 0108 | 0000 |
| 0000572020 | 0000 | 0000 | 0020 | 0000 | 0000 | 0000 | 0000 | 0000 |
| 0000572040 | 0000 | 0000 | 33E6 | 0000 | 0040 | 0000 | FFFF | 000F |
| 0000572060 | 0108 | 0000 | 0000 | 0000 | 0020 | 0000 | 0000 | 0000 |
| 0000572100 | 0000 | 0000 | 652E | 736F | 0000 | 0000 | 0000 | 0000 |
| 0000572120 | FFFE | 0008 | 0166 | 18B4 | 0000 | 0000 | 0060 | 0000 |
| 0000572140 | 0000 | 0000 | 0000 | 0000 | 312E | 6639 | 6B61 | 0065 |
| 0000572160 | 0000 | 0000 | FFFE | 0008 | 010A | 0000 | 0000 | 0000 |
| 0000572200 | 00C0 | 0000 | 0000 | 18D8 | 0000 | 0000 | 635F | 0078 |
| 0000572220 | 0000 | 0000 | 0000 | 0000 | FFFF | 000D | 0108 | 0000 |
| 0000572240 | 0000 | 0000 | 0010 | 0000 | 0000 | 0000 | 0000 | 0000 |
| 0000572260 | 635F | 0079 | 0000 | 0000 | 0010 | 0000 | FFFF | 000D |
| 0000572300 | 0108 | 0000 | 0000 | 0000 | 0010 | 0000 | 0000 | 0000 |
| 0000572320 | 0000 | 0000 | 785F | 0031 | 0000 | 0000 | 0020 | 0000 |
| 0000572340 | FFFF | 0003 | 0108 | 0000 | 0000 | 0000 | 0010 | 0000 |
| 0000572360 | 0000 | 0000 | 0000 | 0000 | 795F | 0031 | 0000 | 0000 |
| 0000572400 | 0030 | 0000 | FFFF | 0003 | 0108 | 0000 | 0000 | 0000 |
| 0000572420 | 0010 | 0000 | 0000 | 0000 | 0000 | 0000 | 785F | 0032 |
| 0000572440 | 0000 | 0000 | 0040 | 0000 | FFFF | 0003 | 0108 | 0000 |
| 0000572460 | 0000 | 0000 | 0010 | 0000 | 0000 | 0000 | 0000 | 0000 |
| 0000572500 | 795F | 0032 | 0000 | 0000 | 0050 | 0000 | FFFF | 0003 |
| 0000572520 | 0108 | 0000 | 0000 | 0000 | 0010 | 0000 | 0000 | 0000 |
| 0000572540 | 0000 | 0000 | 685F | 5F70 | 0078 | 0000 | 0060 | 0000 |
| 0000572560 | FFFF | 0003 | 0108 | 0000 | 0000 | 0000 | 0010 | 0000 |
| 0000572600 | 0000 | 0000 | 0000 | 0000 | 685F | 5F70 | 0079 | 0000 |
| 0000572620 | 0070 | 0000 | FFFF | 0003 | 0108 | 0000 | 0000 | 0000 |
| 0000572640 | 0010 | 0000 | 0000 | 0000 | 0000 | 0000 | 0000 | 0000 |
| 0000572660 | 33F7 | 0000 | 0080 | 0000 | FFFF | 000F | 0108 | 0000 |
| 0000572700 | 0000 | 0000 | 0020 | 0000 | 0000 | 0000 | 0000 | 0000 |
| 0000572720 | 0000 | 0000 | 3407 | 0000 | 00A0 | 0000 | FFFF | 000D |
| 0000572740 | 0108 | 0000 | 0000 | 0000 | 0010 | 0000 | 0000 | 0000 |
| 0000572760 | 0000 | 0000 | 0000 | 0000 | 3416 | 0000 | 00B0 | 0000 |
| 0000573000 | FFFF | 000D | 0108 | 0000 | 0000 | 0000 | 0010 | 0000 |
| 0000573020 | 0000 | 0000 | 0000 | 0000 | 652E | 736F | 0000 | 0000 |
| 0000573040 | 0000 | 0000 | FFFE | 0008 | 0166 | 18BE | 0000 | 0000 |
| 0000573060 | 00C0 | 0000 | 0000 | 0000 | 0000 | 0000 | 322E | 6630 |
| 0000573100 | 6B61 | 0065 | 0000 | 0000 | FFFE | 0008 | 010A | 0000 |
| 0000573120 | 0000 | 0000 | 0030 | 0000 | 0000 | 18E2 | 0000 | 0000 |
| 0000573140 | 785F | 0000 | 0000 | 0000 | 0000 | 0000 | FFFF | 0003 |
| 0000573160 | 0108 | 0000 | 0000 | 0000 | 0010 | 0000 | 0000 | 0000 |
| 0000573200 | 0000 | 0000 | 795F | 0000 | 0000 | 0000 | 0010 | 0000 |
| 0000573220 | FFFF | 0003 | 0108 | 0000 | 0000 | 0000 | 0010 | 0000 |
| 0000573240 | 0000 | 0000 | 0000 | 0000 | 695F | 6F63 | 5F6E | 6469 |
| 0000573260 | 0020 | 0000 | FFFF | 0003 | 0108 | 0000 | 0000 | 0000 |
| 0000573300 | 0010 | 0000 | 0000 | 0000 | 0000 | 0000 | 652E | 736F |
| 0000573320 | 0000 | 0000 | 0000 | 0000 | FFFE | 0008 | 0166 | 18D8 |
| 0000573340 | 0000 | 0000 | 0030 | 0000 | 0000 | 0000 | 0000 | 0000 |
| 0000573360 | 322E | 6631 | 6B61 | 0065 | 0000 | 0000 | FFFE | 0008 |
| 0000573400 | 010A | 0000 | 0000 | 0000 | 0070 | 0000 | 0000 | 18F4 |
| 0000573420 | 0000 | 0000 | 785F | 0000 | 0000 | 0000 | 0000 | 0000 |
| 0000573440 | FFFF | 000D | 0108 | 0000 | 0000 | 0000 | 0010 | 0000 |
| 0000573460 | 0000 | 0000 | 0000 | 0000 | 795F | 0000 | 0000 | 0000 |
| 0000573500 | 0010 | 0000 | FFFF | 000D | 0108 | 0000 | 0000 | 0000 |
| 0000573520 | 0010 | 0000 | 0000 | 0000 | 0000 | 0000 | 695F | 6F63 |
| 0000573540 | 5F6E | 6469 | 0020 | 0000 | FFFF | 000D | 0108 | 0000 |
| 0000573560 | 0000 | 0000 | 0010 | 0000 | 0000 | 0000 | 0000 | 0000 |
| 0000573600 | 6C5F | 6665 | 0074 | 0000 | 0030 | 0000 | FFFF | 000D |
| 0000573620 | 0108 | 0000 | 0000 | 0000 | 0010 | 0000 | 0000 | 0000 |

THU MAR 14 17:37:32 1991 GSPMON.4 PAGE 207, LINE 12155

| | | | | | | | | |
|---|---|---|---|---|---|---|---|---|
| 0000573640 | 0000 | 0000 | 725F | 6769 | 7468 | 0000 | 0040 | 0000 |
| 0000573660 | FFFF | 000D | 0108 | 0000 | 0000 | 0000 | 0010 | 0000 |
| 0000573700 | 0000 | 0000 | 0000 | 0000 | 755F | 0070 | 0000 | 0000 |
| 0000573720 | 0050 | 0000 | FFFF | 000D | 0108 | 0000 | 0000 | 0000 |
| 0000573740 | 0010 | 0000 | 0000 | 0000 | 0000 | 0000 | 645F | 776F |
| 0000573760 | 006E | 0000 | 0060 | 0000 | FFFF | 000D | 0108 | 0000 |
| 0000574000 | 0000 | 0000 | 0010 | 0000 | 0000 | 0000 | 0000 | 0000 |
| 0000574020 | 652E | 736F | 0000 | 0000 | 0000 | 0000 | FFFE | 0008 |
| 0000574040 | 0166 | 18E2 | 0000 | 0000 | 0070 | 0000 | 0000 | 0000 |
| 0000574060 | 0000 | 0000 | 322E | 6632 | 6B61 | 0065 | 0000 | 0000 |
| 0000574100 | FFFE | 0008 | 010A | 0000 | 0000 | 0000 | 0020 | 0000 |
| 0000574120 | 0000 | 18FC | 0000 | 0000 | 6D5F | 646F | 0065 | 0000 |
| 0000574140 | 0000 | 0000 | FFFF | 000D | 0108 | 0000 | 0000 | 0000 |
| 0000574160 | 0010 | 0000 | 0000 | 0000 | 0000 | 0000 | 725F | 7365 |
| 0000574200 | 6C75 | 0074 | 0010 | 0000 | FFFF | 000D | 0108 | 0000 |
| 0000574220 | 0000 | 0000 | 0010 | 0000 | 0000 | 0000 | 0000 | 0000 |
| 0000574240 | 652E | 736F | 0000 | 0000 | 0000 | 0000 | FFFE | 0008 |
| 0000574260 | 0166 | 18F4 | 0000 | 0000 | 0020 | 0000 | 0000 | 0000 |
| 0000574300 | 0000 | 0000 | 322E | 6633 | 6B61 | 0065 | 0000 | 0000 |
| 0000574320 | FFFE | 0008 | 010A | 0000 | 0000 | 0000 | 0020 | 0000 |
| 0000574340 | 0000 | 1908 | 0000 | 0000 | 0000 | 0000 | 3427 | 0000 |
| 0000574360 | 0000 | 0000 | FFFF | 000C | 0108 | 0000 | 0000 | 0000 |
| 0000574400 | 0008 | 0000 | 0000 | 0000 | 0000 | 0000 | 0000 | 0000 |
| 0000574420 | 3433 | 0000 | 0008 | 0000 | FFFF | 000C | 0108 | 0000 |
| 0000574440 | 0000 | 0000 | 0008 | 0000 | 0000 | 0000 | 0000 | 0000 |
| 0000574460 | 0000 | 0000 | 343E | 0000 | 0010 | 0000 | FFFF | 000C |
| 0000574500 | 0108 | 0000 | 0000 | 0000 | 0008 | 0000 | 0000 | 0000 |
| 0000574520 | 0000 | 0000 | 0000 | 0000 | 3449 | 0000 | 0018 | 0000 |
| 0000574540 | FFFF | 000C | 0108 | 0000 | 0000 | 0000 | 0008 | 0000 |
| 0000574560 | 0000 | 0000 | 0000 | 0000 | 652E | 736F | 0000 | 0000 |
| 0000574600 | 0000 | 0000 | FFFE | 0008 | 0166 | 18FC | 0000 | 0000 |
| 0000574620 | 0020 | 0000 | 0000 | 0000 | 0000 | 0000 | 322E | 6634 |
| 0000574640 | 6B61 | 0065 | 0000 | 0000 | FFFE | 0008 | 010A | 0000 |
| 0000574660 | 0000 | 0000 | 0020 | 0000 | 0000 | 1912 | 0000 | 0000 |
| 0000574700 | 615F | 7474 | 0072 | 0000 | 0000 | 0000 | FFFF | 000D |
| 0000574720 | 0108 | 0000 | 0000 | 0000 | 0010 | 0000 | 0000 | 0000 |
| 0000574740 | 0000 | 0000 | 735F | 7274 | 7069 | 0000 | 0010 | 0000 |
| 0000574760 | FFFF | 000C | 0108 | 0000 | 0000 | 0000 | 0008 | 0000 |
| 0000575000 | 0000 | 0000 | 0000 | 0000 | 725F | 6365 | 0074 | 0000 |
| 0000575020 | 0018 | 0000 | FFFF | 000C | 0108 | 0000 | 0000 | 0000 |
| 0000575040 | 0008 | 0000 | 0000 | 0000 | 0000 | 0000 | 652E | 736F |
| 0000575060 | 0000 | 0000 | 0000 | 0000 | FFFE | 0008 | 0166 | 1908 |
| 0000575100 | 0000 | 0000 | 0020 | 0000 | 0000 | 0000 | 0000 | 0000 |
| 0000575120 | 322E | 6635 | 6B61 | 0065 | 0000 | 0000 | FFFE | 0008 |
| 0000575140 | 010A | 0000 | 0000 | 0000 | 1930 | 0000 | 0000 | 191E |
| 0000575160 | 0000 | 0000 | 0000 | 0000 | 3453 | 0000 | 0000 | 0000 |
| 0000575200 | FFFF | 000D | 0108 | 0000 | 0000 | 0000 | 0010 | 0000 |
| 0000575220 | 0000 | 0000 | 0000 | 0000 | 785F | 0000 | 0000 | 0000 |
| 0000575240 | 0010 | 0000 | FFFF | 000D | 0108 | 0000 | 0000 | 0000 |
| 0000575260 | 0010 | 0000 | 0000 | 0000 | 0000 | 0000 | 795F | 0000 |
| 0000575300 | 0000 | 0000 | 0020 | 0000 | FFFF | 000D | 0108 | 0000 |
| 0000575320 | 0000 | 0000 | 0010 | 0000 | 0000 | 0000 | 0000 | 0000 |
| 0000575340 | 0000 | 0000 | 345D | 0000 | 0030 | 0000 | FFFF | 0038 |
| 0000575360 | 0108 | 1908 | 0000 | 0000 | 1900 | 00C8 | 0000 | 0000 |
| 0000575400 | 0000 | 0000 | 652E | 736F | 0000 | 0000 | 0000 | 0000 |
| 0000575420 | FFFE | 0008 | 0166 | 1912 | 0000 | 0000 | 1930 | 0000 |
| 0000575440 | 0000 | 0000 | 0000 | 0000 | 662E | 6C69 | 0065 | 0000 |
| 0000575460 | 1920 | 0000 | FFFE | 0000 | 0167 | 7067 | 645F | 7369 |
| 0000575500 | 2E70 | 0063 | 0000 | 0000 | 0000 | 0000 | 662E | 6C69 |

THU MAR 14 17:37:32 1991 GSPMON.4 PAGE 208, LINE 12214

| | | | | | | | | |
|---|---|---|---|---|---|---|---|---|
| 0000575520 | 0065 | 0000 | 192C | 0000 | FFFE | 0000 | 0167 | 7067 |
| 0000575540 | 615F | 6C70 | 682E | 0000 | 0000 | 0000 | 0000 | 0000 |
| 0000575560 | 322E | 6636 | 6B61 | 0065 | 0000 | 0000 | FFFE | 0008 |
| 0000575600 | 010A | 0000 | 0000 | 0000 | 0030 | 0000 | 0000 | 192C |
| 0000575620 | 0000 | 0000 | 775F | 6469 | 6874 | 0000 | 0000 | 0000 |
| 0000575640 | FFFF | 000D | 0108 | 0000 | 0000 | 0000 | 0010 | 0000 |
| 0000575660 | 0000 | 0000 | 0000 | 0000 | 685F | 6965 | 6867 | 0074 |
| 0000575700 | 0010 | 0000 | FFFF | 000D | 0108 | 0000 | 0000 | 0000 |
| 0000575720 | 0010 | 0000 | 0000 | 0000 | 0000 | 0000 | 645F | 7065 |
| 0000575740 | 6874 | 0000 | 0020 | 0000 | FFFF | 000D | 0108 | 0000 |
| 0000575760 | 0000 | 0000 | 0010 | 0000 | 0000 | 0000 | 0000 | 0000 |
| 0000576000 | 652E | 736F | 0000 | 0000 | 0000 | 0000 | FFFE | 0008 |
| 0000576020 | 0166 | 1922 | 0000 | 0000 | 0030 | 0000 | 0000 | 0008 |
| 0000576040 | 0000 | 0000 | 662E | 6C69 | 0065 | 0000 | 192E | 0000 |
| 0000576060 | FFFE | 0000 | 0167 | 7067 | 615F | 6C70 | 692E | 636E |
| 0000576100 | 0000 | 0000 | 0000 | 0000 | 662E | 6C69 | 0065 | 0000 |
| 0000576120 | 1930 | 0000 | FFFE | 0000 | 0167 | 7067 | 615F | 6C70 |
| 0000576140 | 682E | 0000 | 0000 | 0000 | 0000 | 0000 | 662E | 6C69 |
| 0000576160 | 0065 | 0000 | 19CE | 0000 | FFFE | 0000 | 0167 | 7067 |
| 0000576200 | 645F | 7369 | 2E70 | 0063 | 0000 | 0000 | 0000 | 0000 |
| 0000576220 | 0000 | 0000 | 3469 | 0000 | 8490 | FFC4 | 0001 | 0024 |
| 0000576240 | 0102 | 0000 | 0000 | 0260 | 0000 | 1936 | 0001 | 193E |
| 0000576260 | 0000 | 0003 | 622E | 0066 | 0000 | 0000 | 8490 | FFC4 |
| 0000576300 | 0001 | 0000 | 0165 | 0000 | 0000 | 0051 | 0000 | 0000 |
| 0000576320 | 0000 | 0260 | 0000 | 0000 | 695F | 5F6E | 7470 | 0072 |
| 0000576340 | FFE0 | FFFF | FFFF | 0010 | 0109 | 0000 | 0000 | 0000 |
| 0000576360 | 0020 | 000C | 0000 | 0000 | 0000 | 0000 | 6F5F | 7475 |
| 0000576400 | 705F | 7274 | FFC0 | FFFF | FFFF | 0010 | 0109 | 0000 |
| 0000576420 | 0000 | 0000 | 0020 | 0000 | 0000 | 0000 | 0000 | 0000 |
| 0000576440 | 625F | 6E61 | 006B | 0000 | 0000 | 0000 | FFFF | 000D |
| 0000576460 | 0101 | 0000 | 0000 | 0000 | 0010 | 0000 | 0000 | 0000 |
| 0000576500 | 0000 | 0000 | 652E | 0066 | 0000 | 0000 | 86F0 | FFC4 |
| 0000576520 | 0001 | 0000 | 0165 | 0000 | 0000 | 005F | 0000 | 0000 |
| 0000576540 | 0000 | 0000 | 0000 | 0000 | 0000 | 0000 | 347A | 0000 |
| 0000576560 | 86F0 | FFC4 | 0001 | 0024 | 0102 | 0000 | 0000 | 0330 |
| 0000576600 | 0000 | 195A | 0001 | 194A | 0000 | 0002 | 622E | 0066 |
| 0000576620 | 0000 | 0000 | 86F0 | FFC4 | 0001 | 0000 | 0165 | 0000 |
| 0000576640 | 0000 | 006E | 0000 | 0000 | 0000 | 026C | 0000 | 0000 |
| 0000576660 | 695F | 5F6E | 7470 | 0072 | FFE0 | FFFF | FFFF | 0010 |
| 0000576700 | 0109 | 0000 | 0000 | 0000 | 0020 | 0000 | 0000 | 0000 |
| 0000576720 | 0000 | 0000 | 6F5F | 7475 | 705F | 7274 | FFC0 | FFFF |
| 0000576740 | FFFF | 0010 | 0109 | 0000 | 0000 | 0000 | 0020 | 0000 |
| 0000576760 | 0000 | 0000 | 0000 | 0000 | 625F | 6E61 | 006B | 0000 |
| 0000577000 | 0000 | 0000 | FFFF | 000D | 0101 | 0000 | 0000 | 0000 |
| 0000577020 | 0010 | 0000 | 0000 | 0000 | 0000 | 0000 | 652E | 0066 |
| 0000577040 | 0000 | 0000 | 8A20 | FFC4 | 0001 | 0000 | 0165 | 0000 |
| 0000577060 | 0000 | 008C | 0000 | 0000 | 0000 | 0000 | 0000 | 0000 |
| 0000577100 | 0000 | 0000 | 348D | 0000 | 8A20 | FFC4 | 0001 | 0024 |
| 0000577120 | 0102 | 0000 | 0000 | 00F0 | 0000 | 19AE | 0001 | 1954 |
| 0000577140 | 0000 | 0002 | 622E | 0066 | 0000 | 0000 | 8A20 | FFC4 |
| 0000577160 | 0001 | 0000 | 0165 | 0000 | 0000 | 009C | 0000 | 0000 |
| 0000577200 | 0000 | 0276 | 0000 | 0000 | 695F | 5F6E | 7470 | 0072 |
| 0000577220 | FFE0 | FFFF | FFFF | 0010 | 0109 | 0000 | 0000 | 0000 |
| 0000577240 | 0020 | 0000 | 0000 | 0000 | 0000 | 0000 | 6F5F | 7475 |
| 0000577260 | 705F | 7274 | FFC0 | FFFF | FFFF | 0010 | 0109 | 0000 |
| 0000577300 | 0000 | 0000 | 0020 | 0000 | 0000 | 0000 | 0000 | 0000 |
| 0000577320 | 652E | 0066 | 0000 | 0000 | 8B10 | FFC4 | 0001 | 0000 |
| 0000577340 | 0165 | 0000 | 0000 | 00A3 | 0000 | 0000 | 0000 | 0000 |
| 0000577360 | 0000 | 0000 | 0000 | 0000 | 34A5 | 0000 | 8B10 | FFC4 |

THU MAR 14 17:37:32 1991 GSPMON.4 PAGE 209, LINE 12273

```
0000577400  0001  0024  0102  0000  0000  0670  0000  19C0
0000577420  0001  196A  0000  0004  622E  0066  0000  0000
0000577440  8B10  FFC4  0001  0000  0165  0000  0000  00D4
0000577460  0000  0000  0000  028C  0000  0000  695F  5F6E
0000577500  7470  0072  FFE0  FFFF  FFFF  0010  0109  0000
0000577520  0000  0000  0020  0000  0000  0000  0000  0000
0000577540  6F5F  7475  705F  7274  FFC0  FFFF  FFFF  0010
0000577560  0109  0000  0000  0000  0020  0000  0000  0000
0000577600  0000  0000  695F  0000  0000  0000  0000  0000
0000577620  FFFF  000D  0101  0000  0000  0000  0010  0000
0000577640  0000  0000  0000  0000  6A5F  0000  0000  0000
0000577660  0010  0000  FFFF  000D  0101  0000  0000  0000
0000577700  0010  0000  0000  0000  0000  0000  0000  0000
0000577720  34B7  0000  0020  0000  FFFF  0005  0101  0000
0000577740  0000  0000  0020  0000  0000  0000  0000  0000
0000577760  615F  7264  0030  0000  0040  0000  FFFF  001D
0000600000  0101  0000  0000  0000  0020  0000  0000  0000
0000600020  0000  0000  615F  7264  0031  0000  0060  0000
0000600040  FFFF  001D  0101  0000  0000  0000  0020  0000
0000600060  0000  0000  0000  0000  615F  7264  0032  0000
0000600100  0080  0000  FFFF  001D  0101  0000  0000  0000
0000600120  0020  0000  0000  0000  0000  0000  652E  0066
0000600140  0000  0000  9180  FFC4  0001  0000  0165  0000
0000600160  0000  00EF  0000  0000  0000  0000  0000  0000
0000600200  0000  0000  34C5  0000  9180  FFC4  0001  0024
0000600220  0102  0000  0000  0690  0000  1A14  0001  197A
0000600240  0000  0004  622E  0066  0000  0000  9180  FFC4
0000600260  0001  0000  0165  0000  0000  00FD  0000  0000
0000600300  0000  029C  0000  0000  695F  5F6E  7470  0072
0000600320  FFE0  FFFF  FFFF  0010  0109  0000  0000  0000
0000600340  0020  0000  0000  0000  0000  0000  6F5F  7475
0000600360  705F  7274  FFC0  FFFF  FFFF  0010  0109  0000
0000600400  0000  0000  0020  0000  0000  0000  0000  0000
0000600420  0000  0000  34DD  0000  0000  0000  FFFF  000F
0000600440  0101  0000  0000  0000  0020  0000  0000  0000
0000600460  0000  0000  0000  0000  34E8  0000  0020  0000
0000600500  FFFF  000D  0101  0000  0000  0000  0010  0000
0000600520  0000  0000  0000  0000  695F  0000  0000  0000
0000600540  0030  0000  FFFF  000D  0101  0000  0000  0000
0000600560  0010  0000  0000  0000  0000  0000  652E  0066
0000600600  0000  0000  9810  FFC4  0001  0000  0165  0000
0000600620  0000  011C  0000  0000  0000  0000  0000  0000
0000600640  0000  0000  34F2  0000  9810  FFC4  0001  0024
0000600660  0102  0000  0000  0970  0000  1A5C  0001  198E
0000600700  0000  0004  622E  0066  0000  0000  9810  FFC4
0000600720  0001  0000  0165  0000  0000  012A  0000  0000
0000600740  0000  02B0  0000  0000  695F  5F6E  7470  0072
0000600760  FFE0  FFFF  FFFF  0010  0109  0000  0000  0000
0000601000  0020  0000  0000  0000  0000  0000  6F5F  7475
0000601020  705F  7274  FFC0  FFFF  FFFF  0010  0109  0000
0000601040  0000  0000  0020  0000  0000  0000  0000  0000
0000601060  0000  0000  3508  0000  0000  0000  FFFF  00UF
0000601100  0101  0000  0000  0000  0020  0000  0000  0000
0000601120  0000  0000  0000  0000  3513  0000  0020  0000
0000601140  FFFF  000D  0101  0000  0000  0000  0010  0000
0000601160  0000  0000  0000  0000  695F  0000  0000  0000
0000601200  0030  0000  FFFF  000D  0101  0000  0000  0000
0000601220  0010  0000  0000  0000  0000  0000  6A5F  0000
0000601240  0000  0000  0040  0000  FFFF  000D  0101  0000
```

THU MAR 14 17:37:32 1991 GSPMON.4 PAGE 210, LINE 12332

| | | | | | | | | |
|---|---|---|---|---|---|---|---|---|
| 0000601260 | 0000 | 0000 | 0010 | 0000 | 0000 | 0000 | 0000 | 0000 |
| 0000601300 | 6B5F | 0000 | 0000 | 0000 | 0050 | 0000 | FFFF | 000D |
| 0000601320 | 0101 | 0000 | 0000 | 0000 | 0010 | 0000 | 0000 | 0000 |
| 0000601340 | 0000 | 0000 | 652E | 0066 | 0000 | 0000 | A180 | FFC4 |
| 0000601360 | 0001 | 0000 | 0165 | 0000 | 0000 | 017E | 0000 | 0000 |
| 0000601400 | 0000 | 0000 | 0000 | 0000 | 0000 | 0000 | 351D | 0000 |
| 0000601420 | A180 | FFC4 | 0001 | 0024 | 0102 | 0000 | 0000 | 04A0 |
| 0000601440 | 0000 | 1ABC | 0001 | 19A0 | 0000 | 0003 | 622E | 0066 |
| 0000601460 | 0000 | 0000 | A180 | FFC4 | 0001 | 0000 | 0165 | 0000 |
| 0000601500 | 0000 | 018D | 0000 | 0000 | 000D | 02C2 | 0000 | 0000 |
| 0000601520 | 695F | 5F6E | 7470 | 0072 | FFE0 | FFFF | FFFF | 0010 |
| 0000601540 | 0109 | 0000 | 0000 | 0000 | 0020 | 0000 | 0000 | 0000 |
| 0000601560 | 0000 | 0000 | 6F5F | 7475 | 705F | 7274 | FFC0 | FFFF |
| 0000601600 | FFFF | 0010 | 0109 | 0000 | 0000 | 0000 | 0020 | 0000 |
| 0000601620 | 0000 | 0000 | 0000 | 0000 | 0000 | 0000 | 352C | 0000 |
| 0000601640 | 0000 | 0000 | FFFF | 000F | 0101 | 0000 | 0000 | 0000 |
| 0000601660 | 0020 | 0000 | 0000 | 0000 | 0000 | 0000 | 0000 | 0000 |
| 0000601700 | 3537 | 0000 | 0020 | 0000 | FFFF | 000D | 0101 | 0000 |
| 0000601720 | 0000 | 0000 | 0010 | 0000 | 0000 | 0000 | 0000 | 0000 |
| 0000601740 | 695F | 0000 | 0000 | 0000 | 0030 | 0000 | FFFF | 000D |
| 0000601760 | 0101 | 0000 | 0000 | 0000 | 0010 | 0000 | 0000 | 0000 |
| 0000602000 | 0000 | 0000 | 6A5F | 0000 | 0000 | 0000 | 0040 | 0000 |
| 0000602020 | FFFF | 000D | 0101 | 0000 | 0000 | 0000 | 0010 | 0000 |
| 0000602040 | 0000 | 0000 | 0000 | 0000 | 652E | 0066 | 0000 | 0000 |
| 0000602060 | A620 | FFC4 | 0001 | 0000 | 0165 | 0000 | 0000 | 01A4 |
| 0000602100 | 0000 | 0000 | 0000 | 0000 | 0000 | 0000 | 0000 | 0000 |
| 0000602120 | 3541 | 0000 | A620 | FFC4 | 0001 | 0024 | 0102 | 0000 |
| 0000602140 | 0000 | 03A0 | 0000 | 1AF2 | 0001 | 19AC | 0000 | 0003 |
| 0000602160 | 622E | 0066 | 0000 | 0000 | A620 | FFC4 | 0001 | 0000 |
| 0000602200 | 0165 | 0000 | 0000 | 01B3 | 0000 | 0000 | 0000 | 02CE |
| 0000602220 | 0000 | 0000 | 695F | 5F6E | 7470 | 0072 | FFE0 | FFFF |
| 0000602240 | FFFF | 0010 | 0109 | 0000 | 0000 | 0000 | 0020 | 0000 |
| 0000602260 | 0000 | 0000 | 0000 | 0000 | 6F5F | 7475 | 705F | 7274 |
| 0000602300 | FFC0 | FFFF | FFFF | 0010 | 0109 | 0000 | 0000 | 0000 |
| 0000602320 | 0020 | 0000 | 0000 | 0000 | 0000 | 0000 | 0000 | 0000 |
| 0000602340 | 354E | 0000 | 0000 | 0000 | FFFF | 000D | 0101 | 0000 |
| 0000602360 | 0000 | 0000 | 0010 | 0000 | 0000 | 0000 | 0000 | 0000 |
| 0000602400 | 652E | 0066 | 0000 | 0000 | A9C0 | FFC4 | 0001 | 0000 |
| 0000602420 | 0165 | 0000 | 0000 | 01C4 | 0000 | 0000 | 0000 | 0000 |
| 0000602440 | 0000 | 0000 | 0000 | 0000 | 3558 | 0000 | A9C0 | FFC4 |
| 0000602460 | 0001 | 0024 | 0102 | 0000 | 0000 | 00A0 | 0000 | 1B16 |
| 0000602500 | 0001 | 19B6 | 0000 | 0001 | 622E | 0066 | 0000 | 0000 |
| 0000602520 | A9C0 | FFC4 | 0001 | 0000 | 0165 | 0000 | 0000 | 01D2 |
| 0000602540 | 0000 | 0000 | 0000 | 02D8 | 0000 | 0000 | 695F | 5F6E |
| 0000602560 | 7470 | 0072 | FFE0 | FFFF | FFFF | 0010 | 0109 | 0000 |
| 0000602600 | 0000 | 0000 | 0020 | 0000 | 0000 | 0000 | 0000 | 0000 |
| 0000602620 | 6F5F | 7475 | 705F | 7274 | FFC0 | FFFF | FFFF | 0010 |
| 0000602640 | 0109 | 0000 | 0000 | 0000 | 0020 | 0000 | 0000 | 0000 |
| 0000602660 | 0000 | 0000 | 652E | 0066 | 0000 | 0000 | AA60 | FFC4 |
| 0000602700 | 0001 | 0000 | 0165 | 0000 | 0000 | 01D9 | 0000 | 0000 |
| 0000602720 | 0000 | 0000 | 0000 | 0000 | 0000 | 0000 | 356C | 0000 |
| 0000602740 | AA60 | FFC4 | 0001 | 0020 | 0103 | 0000 | 0000 | 0110 |
| 0000602760 | 0000 | 1B28 | 0001 | 19BC | 0000 | 0002 | 622E | 0066 |
| 0000603000 | 0000 | 0000 | AA60 | FFC4 | 0001 | 0000 | 0165 | 0000 |
| 0000603020 | 0000 | 01E0 | 0000 | 0000 | 0000 | 02DE | 0000 | 0000 |
| 0000603040 | 652E | 0066 | 0000 | 0000 | AB70 | FFC4 | 0001 | 0000 |
| 0000603060 | 0165 | 0000 | 0000 | 01E5 | 0000 | 0000 | 0000 | 0000 |
| 0000603100 | 0000 | 0000 | 0000 | 0000 | 357C | 0000 | AB70 | FFC4 |
| 0000603120 | 0001 | 0020 | 0103 | 0000 | 0000 | 0090 | 0000 | 1B3A |

THU MAR 14 17:37:32 1991 GSPMON.4 PAGE 211, LINE 12391

| | | | | | | | | |
|---|---|---|---|---|---|---|---|---|
| 0000603140 | 0001 | 19C2 | 0000 | 0001 | 622E | 0066 | 0000 | 0000 |
| 0000603160 | AB70 | FFC4 | 0001 | 0000 | 0165 | 0000 | 0000 | 01EB |
| 0000603200 | 0000 | 0000 | 0000 | 02E4 | 0000 | 0000 | 652E | 0066 |
| 0000603220 | 0000 | 0000 | AC00 | FFC4 | 0001 | 0000 | 0165 | 0000 |
| 0000603240 | 0000 | 01EF | 0000 | 0000 | 0000 | 0000 | 0000 | 0000 |
| 0000603260 | 0000 | 0000 | 358C | 0000 | AC00 | FFC4 | 0001 | 0020 |
| 0000603300 | 0103 | 0000 | 0000 | 0160 | 0000 | 1B46 | 0001 | 19C8 |
| 0000603320 | 0000 | 0001 | 622E | 0066 | 0000 | 0000 | AC00 | FFC4 |
| 0000603340 | 0001 | 0000 | 0165 | 0000 | 0000 | 01F5 | 0000 | 0000 |
| 0000603360 | 0000 | 02EA | 0000 | 0000 | 652E | 0066 | 0000 | 0000 |
| 0000603400 | AD60 | FFC4 | 0001 | 0000 | 0165 | 0000 | 0000 | 01FC |
| 0000603420 | 0000 | 0000 | 0000 | 0000 | 0000 | 0000 | 742E | 7865 |
| 0000603440 | 0074 | 0000 | 8490 | FFC4 | 0001 | 0000 | 0103 | 28D0 |
| 0000603460 | 0000 | 0046 | 005D | 0000 | 0000 | 0000 | 0000 | 0000 |
| 0000603500 | 642E | 7461 | 0061 | 0000 | 0000 | 0000 | 0004 | 0000 |
| 0000603520 | 0103 | 0000 | 0000 | 0000 | 0000 | 0000 | 0000 | 0000 |
| 0000603540 | 0000 | 0000 | 622E | 7373 | 0000 | 0000 | 9910 | FFD1 |
| 0000603560 | 0003 | 0000 | 0103 | 0000 | 0000 | 0000 | 0000 | 0000 |
| 0000603600 | 0000 | 0000 | 0000 | 0000 | 662E | 6C69 | 0065 | 0000 |
| 0000603620 | 19D0 | 0000 | FFFE | 0000 | 0167 | 7067 | 635F | 7673 |
| 0000603640 | 632E | 0000 | 0000 | 0000 | 0000 | 0000 | 662E | 6C69 |
| 0000603660 | 0065 | 0000 | 19D2 | 0000 | FFFE | 0000 | 0167 | 7473 |
| 0000603700 | 6D64 | 682E | 0000 | 0000 | 0000 | 0000 | 0000 | 0000 |
| 0000603720 | 662E | 6C69 | 0065 | 0000 | 19D4 | 0000 | FFFE | 0000 |
| 0000603740 | 0167 | 7067 | 635F | 7673 | 632E | 0000 | 0000 | 0000 |
| 0000603760 | 0000 | 0000 | 662E | 6C69 | 0065 | 0000 | 19DE | 0000 |
| 0000604000 | FFFE | 0000 | 0167 | 7473 | 6C64 | 6269 | 682E | 0000 |
| 0000604020 | 0000 | 0000 | 0000 | 0000 | 302E | 6166 | 656B | 0000 |
| 0000604040 | 0000 | 0000 | FFFE | 0008 | 010A | 0000 | 0000 | 0000 |
| 0000604060 | 0040 | 0000 | 0000 | 19DE | 0000 | 0000 | 715F | 6F75 |
| 0000604100 | 0074 | 0000 | 0000 | 0000 | FFFF | 0004 | 0108 | 0000 |
| 0000604120 | 0000 | 0000 | 0020 | 0000 | 0000 | 0000 | 0000 | 0000 |
| 0000604140 | 725F | 6D65 | 0000 | 0000 | 0020 | 0000 | FFFF | 0004 |
| 0000604160 | 0108 | 0000 | 0000 | 0000 | 0020 | 0000 | 0000 | 0000 |
| 0000604200 | 0000 | 0000 | 652E | 736F | 0000 | 0000 | 0000 | 0000 |
| 0000604220 | FFFE | 0008 | 0166 | 19D6 | 0000 | 0000 | 0040 | 0000 |
| 0000604240 | 0000 | 0000 | 0000 | 0000 | 662E | 6C69 | 0065 | 0000 |
| 0000604260 | 19E0 | 0000 | FFFE | 0000 | 0167 | 7067 | 635F | 7673 |
| 0000604300 | 632E | 0000 | 0000 | 0000 | 0000 | 0000 | 662E | 6C69 |
| 0000604320 | 0065 | 0000 | 19F0 | 0000 | FFFE | 0000 | 0167 | 7974 |
| 0000604340 | 6570 | 6564 | 2E66 | 0068 | 0000 | 0000 | 0000 | 0000 |
| 0000604360 | 312E | 6166 | 656B | 0000 | 0000 | 0000 | FFFE | 000A |
| 0000604400 | 010F | 0000 | 0000 | 0000 | 0001 | 0000 | 0000 | 19EA |
| 0000604420 | 0000 | 0000 | 465F | 4C41 | 4553 | 0000 | 0000 | 0000 |
| 0000604440 | FFFF | 000B | 0110 | 0000 | 0000 | 0000 | 0001 | 0000 |
| 0000604460 | 0000 | 0000 | 0000 | 0000 | 545F | 5552 | 0045 | 0000 |
| 0000604500 | 0001 | 0000 | FFFF | 000B | 0110 | 0000 | 0000 | 0000 |
| 0000604520 | 0001 | 0000 | 0000 | 0000 | 0000 | 0000 | 652E | 736F |
| 0000604540 | 0000 | 0000 | 0000 | 0000 | FFFE | 000A | 0166 | 19E2 |
| 0000604560 | 0000 | 0000 | 0001 | 0000 | 0000 | 0000 | 0000 | 0000 |
| 0000604600 | 322E | 6166 | 656B | 0000 | 0000 | 0000 | FFFE | 0008 |
| 0000604620 | 010A | 0000 | 0000 | 0000 | 0004 | 0000 | 0000 | 19F0 |
| 0000604640 | 0000 | 0000 | 705F | 7869 | 6C65 | 0000 | 0000 | 0000 |
| 0000604660 | FFFF | 000E | 0112 | 0000 | 0000 | 0000 | 0004 | 0000 |
| 0000604700 | 0000 | 0000 | 0000 | 0000 | 652E | 736F | 0000 | 0000 |
| 0000604720 | 0000 | 0000 | FFFE | 0008 | 0166 | 19EA | 0000 | 0000 |
| 0000604740 | 0004 | 0000 | 0000 | 0000 | 0000 | 0000 | 662E | 6C69 |
| 0000604760 | 0065 | 0000 | 19F2 | 0000 | FFFE | 0000 | 0167 | 7067 |
| 0000605000 | 635F | 7673 | 632E | 0000 | 0000 | 0000 | 0000 | 0000 |

THU MAR 14 17:37:32 1991 GSPMON.4 PAGE 212, LINE 12450

| | | | | | | | | |
|---|---|---|---|---|---|---|---|---|
| 0000605020 | 662E | 6C69 | 0065 | 0000 | 19F4 | 0000 | FFFE | 0000 |
| 0000605040 | 0167 | 7367 | 7370 | 7379 | 682E | 0000 | 0000 | 0000 |
| 0000605060 | 0000 | 0000 | 662E | 6C69 | 0065 | 0000 | 19F6 | 0000 |
| 0000605100 | FFFE | 0000 | 0167 | 7367 | 7370 | 7379 | 692E | 636E |
| 0000605120 | 0000 | 0000 | 0000 | 0000 | 662E | 6C69 | 0065 | 0000 |
| 0000605140 | 19F8 | 0000 | FFFE | 0000 | 0167 | 7367 | 7370 | 7379 |
| 0000605160 | 682E | 0000 | 0000 | 0000 | 0000 | 0000 | 662E | 6C69 |
| 0000605200 | 0065 | 0000 | 19FA | 0000 | FFFE | 0000 | 0167 | 7067 |
| 0000605220 | 635F | 7673 | 632E | 0000 | 0000 | 0000 | 0000 | 0000 |
| 0000605240 | 662E | 6C69 | 0065 | 0000 | 1AD6 | 0000 | FFFE | 0000 |
| 0000605260 | 0167 | 7367 | 6370 | 6766 | 682E | 0000 | 0000 | 0000 |
| 0000605300 | 0000 | 0000 | 0000 | 0000 | 359A | 0000 | 0000 | 0000 |
| 0000605320 | FFFE | 000A | 010F | 0000 | 0000 | 0000 | 0002 | 0000 |
| 0000605340 | 0000 | 1A06 | 0000 | 0000 | 4F5F | 454E | 315F | 0036 |
| 0000605360 | 0000 | 0000 | FFFF | 000B | 0110 | 0000 | 0000 | 0000 |
| 0000605400 | 0002 | 0000 | 0000 | 0000 | 0000 | 0000 | 545F | 4F57 |
| 0000605420 | 385F | 0000 | 0001 | 0000 | FFFF | 000B | 0110 | 0000 |
| 0000605440 | 0000 | 0000 | 0002 | 0000 | 0000 | 0000 | 0000 | 0000 |
| 0000605460 | 465F | 554F | 5F52 | 0034 | 0002 | 0000 | FFFF | 000B |
| 0000605500 | 0110 | 0000 | 0000 | 0000 | 0002 | 0000 | 0000 | 0000 |
| 0000605520 | 0000 | 0000 | 652E | 736F | 0000 | 0000 | 0000 | 0000 |
| 0000605540 | FFFE | 000A | 0166 | 19FC | 0000 | 0000 | 0002 | 0000 |
| 0000605560 | 0000 | 0000 | 0000 | 0000 | 635F | 726C | 655F | 7272 |
| 0000605600 | 0000 | 0000 | FFFE | 000A | 010F | 0000 | 0000 | 0000 |
| 0000605620 | 0001 | 0000 | 0000 | 1A0E | 0000 | 0000 | 4E5F | 5F4F |
| 0000605640 | 4C43 | 0052 | 0000 | 0000 | FFFF | 000B | 0110 | 0000 |
| 0000605660 | 0000 | 0000 | 0001 | 0000 | 0000 | 0000 | 0000 | 0000 |
| 0000605700 | 435F | 524C | 0000 | 0000 | 0001 | 0000 | FFFF | 000B |
| 0000605720 | 0110 | 0000 | 0000 | 0000 | 0001 | 0000 | 0000 | 0000 |
| 0000605740 | 0000 | 0000 | 652E | 736F | 0000 | 0000 | 0000 | 0000 |
| 0000605760 | FFFE | 000A | 0166 | 1A06 | 0000 | 0000 | 0001 | 0000 |
| 0000606000 | 0000 | 0000 | 0000 | 0000 | 0000 | 0000 | 35A4 | 0000 |
| 0000606020 | 0000 | 0000 | FFFE | 000A | 010F | 0000 | 0000 | 0000 |
| 0000606040 | 0003 | 0000 | 0000 | 1A1C | 0000 | 0000 | 505F | 414C |
| 0000606060 | 454E | 0030 | 0000 | 0000 | FFFF | 000B | 0110 | 0000 |
| 0000606100 | 0000 | 0000 | 0003 | 0000 | 0000 | 0000 | 0000 | 0000 |
| 0000606120 | 505F | 414C | 454E | 0032 | 0001 | 0000 | FFFF | 000B |
| 0000606140 | 0110 | 0000 | 0000 | 0000 | 0003 | 0000 | 0000 | 0000 |
| 0000606160 | 0000 | 0000 | 505F | 414C | 454E | 0031 | 0002 | 0000 |
| 0000606200 | FFFF | 000B | 0110 | 0000 | 0000 | 0000 | 0003 | 0000 |
| 0000606220 | 0000 | 0000 | 0000 | 0000 | 505F | 414C | 454E | 0033 |
| 0000606240 | 0003 | 0000 | FFFF | 000B | 0110 | 0000 | 0000 | 0000 |
| 0000606260 | 0003 | 0000 | 0000 | 0000 | 0000 | 0000 | 4E5F | 504F |
| 0000606300 | 414C | 454E | 0004 | 0000 | FFFF | 000B | 0110 | 0000 |
| 0000606320 | 0000 | 0000 | 0003 | 0000 | 0000 | 0000 | 0000 | 0000 |
| 0000606340 | 652E | 736F | 0000 | 0000 | 0000 | 0000 | FFFE | 000A |
| 0000606360 | 0166 | 1A0E | 0000 | 0000 | 0003 | 0000 | 0000 | 0000 |
| 0000606400 | 0000 | 0000 | 0000 | 0000 | 35AF | 0000 | 0000 | 0000 |
| 0000606420 | FFFE | 000A | 010F | 0000 | 0000 | 0000 | 0001 | 0000 |
| 0000606440 | 0000 | 1A24 | 0000 | 0000 | 4E5F | 5F4F | 4944 | 5053 |
| 0000606460 | 0000 | 0000 | FFFF | 000B | 0110 | 0000 | 0000 | 0000 |
| 0000606500 | 0001 | 0000 | 0000 | 0000 | 0000 | 0000 | 445F | 5349 |
| 0000606520 | 0050 | 0000 | 0001 | 0000 | FFFF | 000B | 0110 | 0000 |
| 0000606540 | 0000 | 0000 | 0001 | 0000 | 0000 | 0000 | 0000 | 0000 |
| 0000606560 | 652E | 736F | 0000 | 0000 | 0000 | 0000 | FFFE | 000A |
| 0000606600 | 0166 | 1A1C | 0000 | 0000 | 0001 | 0000 | 0000 | 0000 |
| 0000606620 | 0000 | 0000 | 665F | 5F62 | 6E65 | 0000 | 0000 | 0000 |
| 0000606640 | FFFE | 000A | 010F | 0000 | 0000 | 0000 | 0001 | 0000 |
| 0000606660 | 0000 | 1A2C | 0000 | 0000 | 0000 | 0000 | 35B9 | 0000 |

THU MAR 14 17:37:32 1991 GSPMON.4 PAGE 213, LINE 12509

| | | | | | | | | |
|---|---|---|---|---|---|---|---|---|
| 0000606700 | 0000 | 0000 | FFFF | 000B | 0110 | 0000 | 0000 | 0000 |
| 0000606720 | 0001 | 0000 | 0000 | 0000 | 0000 | 0000 | 0000 | 0000 |
| 0000606740 | 35C4 | 0000 | 0001 | 0000 | FFFF | 000B | 0110 | 0000 |
| 0000606760 | 0000 | 0000 | 0001 | 0000 | 0000 | 0000 | 0000 | 0000 |
| 0000607000 | 652E | 736F | 0000 | 0000 | 0000 | 0000 | FFFE | 000A |
| 0000607020 | 0166 | 1A24 | 0000 | 0000 | 0001 | 0000 | 0000 | 0000 |
| 0000607040 | 0000 | 0000 | 7A5F | 7265 | 5F6F | 0062 | 0000 | 0000 |
| 0000607060 | FFFE | 000A | 010F | 0000 | 0000 | 0000 | 0001 | 0000 |
| 0000607100 | 0000 | 1A34 | 0000 | 0000 | 0000 | 0000 | 35CE | 0000 |
| 0000607120 | 0000 | 0000 | FFFF | 000B | 0110 | 0000 | 0000 | 0000 |
| 0000607140 | 0001 | 0000 | 0000 | 0000 | 0000 | 0000 | 0000 | 0000 |
| 0000607160 | 35DA | 0000 | 0001 | 0000 | FFFF | 000B | 0110 | 0000 |
| 0000607200 | 0000 | 0000 | 0001 | 0000 | 0000 | 0000 | 0000 | 0000 |
| 0000607220 | 652E | 736F | 0000 | 0000 | 0000 | 0000 | FFFE | 000A |
| 0000607240 | 0166 | 1A2C | 0000 | 0000 | 0001 | 0000 | 0000 | 0000 |
| 0000607260 | 0000 | 0000 | 7A5F | 7265 | 5F6F | 0061 | 0000 | 0000 |
| 0000607300 | FFFE | 000A | 010F | 0000 | 0000 | 0000 | 0001 | 0000 |
| 0000607320 | 0000 | 1A3C | 0000 | 0000 | 0000 | 0000 | 35E4 | 0000 |
| 0000607340 | 0000 | 0000 | FFFF | 000B | 0110 | 0000 | 0000 | 0000 |
| 0000607360 | 0001 | 0000 | 0000 | 0000 | 0000 | 0000 | 0000 | 0000 |
| 0000607400 | 35F0 | 0000 | 0001 | 0000 | FFFF | 000B | 0110 | 0000 |
| 0000607420 | 0000 | 0000 | 0001 | 0000 | 0000 | 0000 | 0000 | 0000 |
| 0000607440 | 652E | 736F | 0000 | 0000 | 0000 | 0000 | FFFE | 000A |
| 0000607460 | 0166 | 1A34 | 0000 | 0000 | 0001 | 0000 | 0000 | 0000 |
| 0000607500 | 0000 | 0000 | 0000 | 0000 | 35FA | 0000 | 0000 | 0000 |
| 0000607520 | FFFE | 000A | 010F | 0000 | 0000 | 0000 | 0002 | 0000 |
| 0000607540 | 0000 | 1A48 | 0000 | 0000 | 0000 | 0000 | 3604 | 0000 |
| 0000607560 | 0000 | 0000 | FFFF | 000B | 0110 | 0000 | 0000 | 0000 |
| 0000607600 | 0002 | 0000 | 0000 | 0000 | 0000 | 0000 | 0000 | 0000 |
| 0000607620 | 360E | 0000 | 0001 | 0000 | FFFF | 000B | 0110 | 0000 |
| 0000607640 | 0000 | 0000 | 0002 | 0000 | 0000 | 0000 | 0000 | 0000 |
| 0000607660 | 0000 | 0000 | 3618 | 0000 | 0002 | 0000 | FFFF | 000B |
| 0000607700 | 0110 | 0000 | 0000 | 0000 | 0002 | 0000 | 0000 | 0000 |
| 0000607720 | 0000 | 0000 | 0000 | 0000 | 3622 | 0000 | 0003 | 0000 |
| 0000607740 | FFFF | 000B | 0110 | 0000 | 0000 | 0000 | 0002 | 0000 |
| 0000607760 | 0000 | 0000 | 0000 | 0000 | 652E | 736F | 0000 | 0000 |
| 0000610000 | 0000 | 0000 | FFFE | 000A | 0166 | 1A3C | 0000 | 0000 |
| 0000610020 | 0002 | 0000 | 0000 | 0000 | 0000 | 0000 | 615F | 756C |
| 0000610040 | 665F | 636E | 0000 | 0000 | FFFE | 000A | 010F | 0000 |
| 0000610060 | 0000 | 0000 | 0003 | 0000 | 0000 | 1A5C | 0000 | 0000 |
| 0000610100 | 435F | 454C | 5241 | 0000 | 0000 | 0000 | FFFF | 000B |
| 0000610120 | 0110 | 0000 | 0000 | 0000 | 0003 | 0000 | 0000 | 0000 |
| 0000610140 | 0000 | 0000 | 425F | 494D | 554E | 4153 | 0001 | 0000 |
| 0000610160 | FFFF | 000B | 0110 | 0000 | 0000 | 0000 | 0003 | 0000 |
| 0000610200 | 0000 | 0000 | 0000 | 0000 | 415F | 494D | 554E | 4253 |
| 0000610220 | 0002 | 0000 | FFFF | 000B | 0110 | 0000 | 0000 | 0000 |
| 0000610240 | 0003 | 0000 | 0000 | 0000 | 0000 | 0000 | 505F | 554C |
| 0000610260 | 0053 | 0000 | 0003 | 0000 | FFFF | 000B | 0110 | 0000 |
| 0000610300 | 0000 | 0000 | 0003 | 0000 | 0000 | 0000 | 0000 | 0000 |
| 0000610320 | 585F | 524F | 0000 | 0000 | 0004 | 0000 | FFFF | 000B |
| 0000610340 | 0110 | 0000 | 0000 | 0000 | 0003 | 0000 | 0000 | 0000 |
| 0000610360 | 0000 | 0000 | 4F5F | 0052 | 0000 | 0000 | 0005 | 0000 |
| 0000610400 | FFFF | 000B | 0110 | 0000 | 0000 | 0000 | 0003 | 0000 |
| 0000610420 | 0000 | 0000 | 0000 | 0000 | 415F | 444E | 0000 | 0000 |
| 0000610440 | 0006 | 0000 | FFFF | 000B | 0110 | 0000 | 0000 | 0000 |
| 0000610460 | 0003 | 0000 | 0000 | 0000 | 0000 | 0000 | 505F | 4552 |
| 0000610500 | 4553 | 0054 | 0007 | 0000 | FFFF | 000B | 0110 | 0000 |
| 0000610520 | 0000 | 0000 | 0003 | 0000 | 0000 | 0000 | 0000 | 0000 |
| 0000610540 | 652E | 736F | 0000 | 0000 | 0000 | 0000 | FFFE | 000A |

THU MAR 14 17:37:32 1991 GSPMON.4 PAGE 214, LINE 12568

| | | | | | | | | |
|---|---|---|---|---|---|---|---|---|
| 0000610560 | 0166 | 1A48 | 0000 | 0000 | 0003 | 0000 | 0000 | 0000 |
| 0000610600 | 0000 | 0000 | 615F | 756C | 635F | 7972 | 0000 | 0000 |
| 0000610620 | FFFE | 000A | 010F | 0000 | 0000 | 0000 | 0001 | 0000 |
| 0000610640 | 0000 | 1A64 | 0000 | 0000 | 5A5F | 5245 | 004F | 0000 |
| 0000610660 | 0000 | 0000 | FFFF | 000B | 0110 | 0000 | 0000 | 0000 |
| 0000610700 | 0001 | 0000 | 0000 | 0000 | 0000 | 0000 | 4F5F | 454E |
| 0000610720 | 0000 | 0000 | 0001 | 0000 | FFFF | 000B | 0110 | 0000 |
| 0000610740 | 0000 | 0000 | 0001 | 0000 | 0000 | 0000 | 0000 | 0000 |
| 0000610760 | 652E | 736F | 0000 | 0000 | 0000 | 0000 | FFFE | 000A |
| 0000611000 | 0166 | 1A5C | 0000 | 0000 | 0001 | 0000 | 0000 | 0000 |
| 0000611020 | 0000 | 0000 | 0000 | 0000 | 362C | 0000 | 0000 | 0000 |
| 0000611040 | FFFE | 000A | 010F | 0000 | 0000 | 0000 | 0001 | 0000 |
| 0000611060 | 0000 | 1A6C | 0000 | 0000 | 0000 | 0000 | 3638 | 0000 |
| 0000611100 | 0000 | 0000 | FFFF | 000B | 0110 | 0000 | 0000 | 0000 |
| 0000611120 | 0001 | 0000 | 0000 | 0000 | 0000 | 0000 | 0000 | 0000 |
| 0000611140 | 3645 | 0000 | 0001 | 0000 | FFFF | 000B | 0110 | 0000 |
| 0000611160 | 0000 | 0000 | 0001 | 0000 | 0000 | 0000 | 0000 | 0000 |
| 0000611200 | 652E | 736F | 0000 | 0000 | 0000 | 0000 | FFFE | 000A |
| 0000611220 | 0166 | 1A64 | 0000 | 0000 | 0001 | 0000 | 0000 | 0000 |
| 0000611240 | 0000 | 0000 | 0000 | 0000 | 3651 | 0000 | 0000 | 0000 |
| 0000611260 | FFFE | 000A | 010F | 0000 | 0000 | 0000 | 0001 | 0000 |
| 0000611300 | 0000 | 1A74 | 0000 | 0000 | 4D5F | 5341 | 5F4B | 4E45 |
| 0000611320 | 0000 | 0000 | FFFF | 000B | 0110 | 0000 | 0000 | 0000 |
| 0000611340 | 0001 | 0000 | 0000 | 0000 | 0000 | 0000 | 0000 | 0000 |
| 0000611360 | 365E | 0000 | 0001 | 0000 | FFFF | 000B | 0110 | 0000 |
| 0000611400 | 0000 | 0000 | 0001 | 0000 | 0000 | 0000 | 0000 | 0000 |
| 0000611420 | 652E | 736F | 0000 | 0000 | 0000 | 0000 | FFFE | 000A |
| 0000611440 | 0166 | 1A6C | 0000 | 0000 | 0001 | 0000 | 0000 | 0000 |
| 0000611460 | 0000 | 0000 | 0000 | 0000 | 3668 | 0000 | 0000 | 0000 |
| 0000611500 | FFFE | 000A | 010F | 0000 | 0000 | 0000 | 0001 | 0000 |
| 0000611520 | 0000 | 1A7C | 0000 | 0000 | 0000 | 0000 | 3673 | 0000 |
| 0000611540 | 0000 | 0000 | FFFF | 000B | 0110 | 0000 | 0000 | 0000 |
| 0000611560 | 0001 | 0000 | 0000 | 0000 | 0000 | 0000 | 0000 | 0000 |
| 0000611600 | 367D | 0000 | 0001 | 0000 | FFFF | 000B | 0110 | 0000 |
| 0000611620 | 0000 | 0000 | 0001 | 0000 | 0000 | 0000 | 0000 | 0000 |
| 0000611640 | 652E | 736F | 0000 | 0000 | 0000 | 0000 | FFFE | 000A |
| 0000611660 | 0166 | 1A74 | 0000 | 0000 | 0001 | 0000 | 0000 | 0000 |
| 0000611700 | 0000 | 0000 | 0000 | 0000 | 3688 | 0000 | 0000 | 0000 |
| 0000611720 | FFFE | 000A | 010F | 0000 | 0000 | 0000 | 0001 | 0000 |
| 0000611740 | 0000 | 1A84 | 0000 | 0000 | 0000 | 0000 | 3693 | 0000 |
| 0000611760 | 0000 | 0000 | FFFF | 000B | 0110 | 0000 | 0000 | 0000 |
| 0000612000 | 0001 | 0000 | 0000 | 0000 | 0000 | 0000 | 0000 | 0000 |
| 0000612020 | 369E | 0000 | 0001 | 0000 | FFFF | 000B | 0110 | 0000 |
| 0000612040 | 0000 | 0000 | 0001 | 0000 | 0000 | 0000 | 0000 | 0000 |
| 0000612060 | 652E | 736F | 0000 | 0000 | 0000 | 0000 | FFFE | 000A |
| 0000612100 | 0166 | 1A7C | 0000 | 0000 | 0001 | 0000 | 0000 | 0000 |
| 0000612120 | 0000 | 0000 | 6D5F | 5F62 | 7566 | 636E | 0000 | 0000 |
| 0000612140 | FFFE | 000A | 010F | 0000 | 0000 | 0000 | 0002 | 0000 |
| 0000612160 | 0000 | 1A90 | 0000 | 0000 | 0000 | 0000 | 36A8 | 0000 |
| 0000612200 | 0000 | 0000 | FFFF | 000B | 0110 | 0000 | 0000 | 0000 |
| 0000612220 | 0002 | 0000 | 0000 | 0000 | 0000 | 0000 | 4D5F | 5F42 |
| 0000612240 | 5845 | 5257 | 0001 | 0000 | FFFF | 000B | 0110 | 0000 |
| 0000612260 | 0000 | 0000 | 0002 | 0000 | 0000 | 0000 | 0000 | 0000 |
| 0000612300 | 4D5F | 5F42 | 4552 | 4441 | 0002 | 0000 | FFFF | 000B |
| 0000612320 | 0110 | 0000 | 0000 | 0000 | 0002 | 0000 | 0000 | 0000 |
| 0000612340 | 0000 | 0000 | 4D5F | 5F42 | 504F | 4E45 | 0003 | 0000 |
| 0000612360 | FFFF | 000B | 0110 | 0000 | 0000 | 0000 | 0002 | 0000 |
| 0000612400 | 0000 | 0000 | 0000 | 0000 | 652E | 736F | 0000 | 0000 |
| 0000612420 | 0000 | 0000 | FFFE | 000A | 0166 | 1A84 | 0000 | 0000 |

THU MAR 14 17:37:32 1991 GSPMON.4 PAGE 215, LINE 12627

| | | | | | | | | |
|---|---|---|---|---|---|---|---|---|
| 0000612440 | 0002 | 0000 | 0000 | 0000 | 0000 | 0000 | 0000 | 0000 |
| 0000612460 | 36B2 | 0000 | 0000 | 0000 | FFFE | 000A | 010F | 0000 |
| 0000612500 | 0000 | 0000 | 0002 | 0000 | 0000 | 1A9A | 0000 | 0000 |
| 0000612520 | 0000 | 0000 | 36BC | 0000 | 0000 | 0000 | FFFF | 000B |
| 0000612540 | 0110 | 0000 | 0000 | 0000 | 0002 | 0000 | 0000 | 0000 |
| 0000612560 | 0000 | 0000 | 0000 | 0000 | 36C8 | 0000 | 0001 | 000U |
| 0000612600 | FFFF | 000B | 0110 | 0000 | 0000 | 0000 | 0002 | 0000 |
| 0000612620 | 0000 | 0000 | 0000 | 0000 | 4D5F | 3442 | 525F | 0044 |
| 0000612640 | 0003 | 0000 | FFFF | 000B | 0110 | 0000 | 0000 | 0000 |
| 0000612660 | 0002 | 0000 | 0000 | 0000 | 0000 | 0000 | 652E | 736F |
| 0000612700 | 0000 | 0000 | 0000 | 0000 | FFFE | 000A | 0166 | 1A90 |
| 0000612720 | 0000 | 0000 | 0002 | 0000 | 0000 | 0000 | 0000 | 0000 |
| 0000612740 | 0000 | 0000 | 36D3 | 0000 | 0000 | 0000 | FFFE | 000A |
| 0000612760 | 010F | 0000 | 0000 | 0000 | 0002 | 0000 | 0000 | 1AA2 |
| 0000613000 | 0000 | 0000 | 4D5F | 3542 | 575F | 0052 | 0000 | 0000 |
| 0000613020 | FFFF | 000B | 0110 | 0000 | 0000 | 0000 | 0002 | 0000 |
| 0000613040 | 0000 | 0000 | 0000 | 0000 | 4D5F | 3542 | 525F | 0044 |
| 0000613060 | 0003 | 0000 | FFFF | 000B | 0110 | 0000 | 0000 | 0000 |
| 0000613100 | 0002 | 0000 | 0000 | 0000 | 0000 | 0000 | 652E | 736F |
| 0000613120 | 0000 | 0000 | 0000 | 0000 | FFFE | 000A | 0166 | 1A9A |
| 0000613140 | 0000 | 0000 | 0002 | 0000 | 0000 | 0000 | 0000 | 0000 |
| 0000613160 | 0000 | 0000 | 36DD | 0000 | 0000 | 0000 | FFFE | 000A |
| 0000613200 | 010F | 0000 | 0000 | 0000 | 0001 | 0000 | 0000 | 1AAA |
| 0000613220 | 0000 | 0000 | 0000 | 0000 | 36E9 | 0000 | 0000 | 0000 |
| 0000613240 | FFFF | 000B | 0110 | 0000 | 0000 | 0000 | 0001 | 0000 |
| 0000613260 | 0000 | 0000 | 0000 | 0000 | 0000 | 0000 | 36F4 | 0000 |
| 0000613300 | 0001 | 0000 | FFFF | 000B | 0110 | 0000 | 0000 | 0000 |
| 0000613320 | 0001 | 0000 | 0000 | 0000 | 0000 | 0000 | 652E | 736F |
| 0000613340 | 0000 | 0000 | 0000 | 0000 | FFFE | 000A | 0166 | 1AA2 |
| 0000613360 | 0000 | 0000 | 0001 | 0000 | 0000 | 0000 | 0000 | 0000 |
| 0000613400 | 0000 | 0000 | 36FE | 0000 | 0000 | 0000 | FFFE | 000A |
| 0000613420 | 010F | 0000 | 0000 | 0000 | 0001 | 0000 | 0000 | 1AB2 |
| 0000613440 | 0000 | 0000 | 0000 | 0000 | 370B | 0000 | 0000 | 0000 |
| 0000613460 | FFFF | 000B | 0110 | 0000 | 0000 | 0000 | 0001 | 0000 |
| 0000613500 | 0000 | 0000 | 0000 | 0000 | 0000 | 0000 | 3717 | 0000 |
| 0000613520 | 0001 | 0000 | FFFF | 000B | 0110 | 0000 | 0000 | 0000 |
| 0000613540 | 0001 | 0000 | 0000 | 0000 | 0000 | 0000 | 652E | 736F |
| 0000613560 | 0000 | 0000 | 0000 | 0000 | FFFE | 000A | 0166 | 1AAA |
| 0000613600 | 0000 | 0000 | 0001 | 0000 | 0000 | 0000 | 0000 | 0000 |
| 0000613620 | 0000 | 0000 | 3724 | 0000 | 0000 | 0000 | FFFE | 000A |
| 0000613640 | 010F | 0000 | 0000 | 0000 | 0003 | 0000 | 0000 | 1AC2 |
| 0000613660 | 0000 | 0000 | 585F | 424D | 0030 | 0000 | 0000 | 0000 |
| 0000613700 | FFFF | 000B | 0110 | 0000 | 0000 | 0000 | 0003 | 0000 |
| 0000613720 | 0000 | 0000 | 0000 | 0000 | 585F | 424D | 0031 | 0000 |
| 0000613740 | 0001 | 0000 | FFFF | 000B | 0110 | 0000 | 0000 | 0000 |
| 0000613760 | 0003 | 0000 | 0000 | 0000 | 0000 | 0000 | 585F | 424D |
| 0000614000 | 0032 | 0000 | 0002 | 0000 | FFFF | 000B | 0110 | 0000 |
| 0000614020 | 0000 | 0000 | 0003 | 0000 | 0000 | 0000 | 0000 | 0000 |
| 0000614040 | 585F | 424D | 0033 | 0000 | 0003 | 0000 | FFFF | 000B |
| 0000614060 | 0110 | 0000 | 0000 | 0000 | 0003 | 0000 | 0000 | 0000 |
| 0000614100 | 0000 | 0000 | 585F | 424D | 0034 | 0000 | 0004 | 0000 |
| 0000614120 | FFFF | 000B | 0110 | 0000 | 0000 | 0000 | 0003 | 0000 |
| 0000614140 | 0000 | 0000 | 0000 | 0000 | 585F | 424D | 0035 | 0000 |
| 0000614160 | 0005 | 0000 | FFFF | 000B | 0110 | 0000 | 0000 | 0000 |
| 0000614200 | 0003 | 0000 | 0000 | 0000 | 0000 | 0000 | 652E | 736F |
| 0000614220 | 0000 | 0000 | 0000 | 0000 | FFFE | 000A | 0166 | 1AB2 |
| 0000614240 | 0000 | 0000 | 0003 | 0000 | 0000 | 0000 | 0000 | 0000 |
| 0000614260 | 635F | 6E6B | 006C | 0000 | 0000 | 0000 | FFFE | 000A |
| 0000614300 | 010F | 0000 | 0000 | 0000 | 0002 | 0000 | 0000 | 1ACE |

THU MAR 14 17:37:32 1991 GSPMON.4 PAGE 216, LINE 12686

| | | | | | | | | |
|---|---|---|---|---|---|---|---|---|
| 0000614320 | 0000 | 0000 | 525F | 4445 | 435F | 0048 | 0000 | 0000 |
| 0000614340 | FFFF | 000B | 0110 | 0000 | 0000 | 0000 | 0002 | 0000 |
| 0000614360 | 0000 | 0000 | 0000 | 0000 | 0000 | 0000 | 372E | 0000 |
| 0000614400 | 0001 | 0000 | FFFF | 000B | 0110 | 0000 | 0000 | 0000 |
| 0000614420 | 0002 | 0000 | 0000 | 0000 | 0000 | 0000 | 425F | 554C |
| 0000614440 | 5F45 | 4843 | 0002 | 0000 | FFFF | 000B | 0110 | 0000 |
| 0000614460 | 0000 | 0000 | 0002 | 0000 | 0000 | 0000 | 0000 | 0000 |
| 0000614500 | 0000 | 0000 | 3738 | 0000 | 0003 | 0000 | FFFF | 000B |
| 0000614520 | 0110 | 0000 | 0000 | 0000 | 0002 | 0000 | 0000 | 0000 |
| 0000614540 | 0000 | 0000 | 652E | 736F | 0000 | 0000 | 0000 | 0000 |
| 0000614560 | FFFE | 000A | 0166 | 1AC2 | 0000 | 0000 | 0002 | 0000 |
| 0000614600 | 0000 | 0000 | 0000 | 0000 | 0000 | 0000 | 3744 | 0000 |
| 0000614620 | 0000 | 0000 | FFFE | 000A | 010F | 0000 | 0000 | 0000 |
| 0000614640 | 0001 | 0000 | 0000 | 1AD6 | 0000 | 0000 | 0000 | 0000 |
| 0000614660 | 374E | 0000 | 0000 | 0000 | FFFF | 000B | 0110 | 0000 |
| 0000614700 | 0000 | 0000 | 0001 | 0000 | 0000 | 0000 | 0000 | 0000 |
| 0000614720 | 435F | 4359 | 494C | 0043 | 0001 | 0000 | FFFF | 000B |
| 0000614740 | 0110 | 0000 | 0000 | 0000 | 0001 | 0000 | 0000 | 0000 |
| 0000614760 | 0000 | 0000 | 652E | 736F | 0000 | 0000 | 0000 | 0000 |
| 0000615000 | FFFE | 000A | 0166 | 1ACE | 0000 | 0000 | 0001 | 0000 |
| 0000615020 | 0000 | 0000 | 0000 | 0000 | 662E | 6C69 | 0065 | 0000 |
| 0000615040 | 1AD8 | 0000 | FFFE | 0000 | 0167 | 7067 | 635F | 7673 |
| 0000615060 | 632E | 0000 | 0000 | 0000 | 0000 | 0000 | 662E | 6C69 |
| 0000615100 | 0065 | 0000 | 1ADA | 0000 | FFFE | 0000 | 0167 | 7367 |
| 0000615120 | 6870 | 6477 | 682E | 0000 | 0000 | 0000 | 0000 | 0000 |
| 0000615140 | 662E | 6C69 | 0065 | 0000 | 1ADC | 0000 | FFFE | 0000 |
| 0000615160 | 0167 | 7067 | 635F | 7673 | 632E | 0000 | 0000 | 0000 |
| 0000615200 | 0000 | 0000 | 662E | 6C69 | 0065 | 0000 | 1BA0 | 0000 |
| 0000615220 | FFFE | 0000 | 0167 | 7067 | 705F | 6275 | 682E | 0000 |
| 0000615240 | 0000 | 0000 | 0000 | 0000 | 332E | 6166 | 656B | 0000 |
| 0000615260 | 0000 | 0000 | FFFE | 0008 | 010A | 0000 | 0000 | 0000 |
| 0000615300 | 01C0 | 0000 | 0000 | 1B0E | 0000 | 0000 | 685F | 7365 |
| 0000615320 | 6E79 | 0063 | 0000 | 0000 | FFFF | 000D | 0108 | 0000 |
| 0000615340 | 0000 | 0000 | 0010 | 0000 | 0000 | 0000 | 0000 | 0000 |
| 0000615360 | 685F | 6265 | 6E6C | 006B | 0010 | 0000 | FFFF | 000D |
| 0000615400 | 0108 | 0000 | 0000 | 0000 | 0010 | 0000 | 0000 | 0000 |
| 0000615420 | 0000 | 0000 | 685F | 6273 | 6E6C | 006B | 0020 | 0000 |
| 0000615440 | FFFF | 000D | 0108 | 0000 | 0000 | 0000 | 0010 | 0000 |
| 0000615460 | 0000 | 0000 | 0000 | 0000 | 765F | 7365 | 6E79 | 0063 |
| 0000615500 | 0030 | 0000 | FFFF | 000D | 0108 | 0000 | 0000 | 0000 |
| 0000615520 | 0010 | 0000 | 0000 | 0000 | 0000 | 0000 | 765F | 6265 |
| 0000615540 | 6E6C | 006B | 0040 | 0000 | FFFF | 000D | 0108 | 0000 |
| 0000615560 | 0000 | 0000 | 0010 | 0000 | 0000 | 0000 | 0000 | 0000 |
| 0000615600 | 765F | 6273 | 6E6C | 006B | 0050 | 0000 | FFFF | 000D |
| 0000615620 | 0108 | 0000 | 0000 | 0000 | 0010 | 0000 | 0000 | 0000 |
| 0000615640 | 0000 | 0000 | 0000 | 0000 | 3758 | 0000 | 0060 | 0000 |
| 0000615660 | FFFF | 000D | 0108 | 0000 | 0000 | 0000 | 0010 | 0000 |
| 0000615700 | 0000 | 0000 | 0000 | 0000 | 665F | 6468 | 7369 | 0070 |
| 0000615720 | 0070 | 0000 | FFFF | 000D | 0108 | 0000 | 0000 | 0000 |
| 0000615740 | 0010 | 0000 | 0000 | 0000 | 0000 | 0000 | 6D5F | 5F62 |
| 0000615760 | 6973 | 657A | 0080 | 0000 | FFFF | 000F | 0108 | 0000 |
| 0000616000 | 0000 | 0000 | 0020 | 0000 | 0000 | 0000 | 0000 | 0000 |
| 0000616020 | 0000 | 0000 | 3763 | 0000 | 00AD | 0000 | FFFF | 000D |
| 0000616040 | 0108 | 0000 | 0000 | 0000 | 0010 | 0000 | 0000 | 0000 |
| 0000616060 | 0000 | 0000 | 0000 | 0000 | 376D | 0000 | 00B0 | 0000 |
| 0000616100 | FFFF | 000D | 0108 | 0000 | 0000 | 0000 | 0010 | 0000 |
| 0000616120 | 0000 | 0000 | 0000 | 0000 | 0000 | 0000 | 3777 | 0000 |
| 0000616140 | 00C0 | 0000 | FFFF | 000D | 0108 | 0000 | 0000 | 0000 |
| 0000616160 | 0010 | 0000 | 0000 | 0000 | 0000 | 0000 | 0000 | 0000 |

THU MAR 14 17:37:32 1991 GSPMON.4 PAGE 217, LINE 12745

| | | | | | | | | |
|---|---|---|---|---|---|---|---|---|
| 0000616200 | 3782 | 0000 | 00D0 | 0000 | FFFF | 000D | 0108 | 0000 |
| 0000616220 | 0000 | 0000 | 0010 | 0000 | 0000 | 0000 | 0000 | 0000 |
| 0000616240 | 0000 | 0000 | 378C | 0000 | 00E0 | 0000 | FFFF | 000F |
| 0000616260 | 0108 | 0000 | 0000 | 0000 | 0020 | 0000 | 0000 | 0000 |
| 0000616300 | 0000 | 0000 | 0000 | 0000 | 3799 | 0000 | 0100 | 0000 |
| 0000616320 | FFFF | 000F | 0108 | 0000 | 0000 | 0000 | 0020 | 0000 |
| 0000616340 | 0000 | 0000 | 0000 | 0000 | 0000 | 0000 | 37AB | 0000 |
| 0000616360 | 0120 | 0000 | FFFF | 000F | 0108 | 0000 | 0000 | 0000 |
| 0000616400 | 0020 | 0000 | 0000 | 0000 | 0000 | 0000 | 0000 | 0000 |
| 0000616420 | 37BA | 0000 | 0140 | 0000 | FFFF | 000F | 0108 | 0000 |
| 0000616440 | 0000 | 0000 | 0020 | 0000 | 0000 | 0000 | 0000 | 0000 |
| 0000616460 | 0000 | 0000 | 37D0 | 0000 | 0160 | 0000 | FFFF | 000D |
| 0000616500 | 0108 | 0000 | 0000 | 0000 | 0010 | 0000 | 0000 | 0000 |
| 0000616520 | 0000 | 0000 | 0000 | 0000 | 37DB | 0000 | 0170 | 0000 |
| 0000616540 | FFFF | 000D | 0108 | 0000 | 0000 | 0000 | 0010 | 0000 |
| 0000616560 | 0000 | 0000 | 0000 | 0000 | 0000 | 0000 | 37EF | 0000 |
| 0000616600 | 0180 | 0000 | FFFF | 000D | 0108 | 0000 | 0000 | 0000 |
| 0000616620 | 0010 | 0000 | 0000 | 0000 | 0000 | 0000 | 0000 | 0000 |
| 0000616640 | 3803 | 0000 | 0190 | 0000 | FFFF | 000F | 0108 | 0000 |
| 0000616660 | 0000 | 0000 | 0020 | 0000 | 0000 | 0000 | 0000 | 0000 |
| 0000616700 | 0000 | 0000 | 3812 | 0000 | 01B0 | 0000 | FFFF | 000D |
| 0000616720 | 0108 | 0000 | 0000 | 0000 | 0010 | 0000 | 0000 | 0000 |
| 0000616740 | 0000 | 0000 | 652E | 736F | 0000 | 0000 | 0000 | 0000 |
| 0000616760 | FFFE | 0008 | 0166 | 1ADE | 0000 | 0000 | 01C0 | 0000 |
| 0000617000 | 0000 | 0000 | 0000 | 0000 | 342E | 6166 | 656B | 0000 |
| 0000617020 | 0000 | 0000 | FFFE | 0008 | 010A | 0000 | 0000 | 0000 |
| 0000617040 | 0050 | 0000 | 0000 | 1B18 | 0000 | 0000 | 6D5F | 6773 |
| 0000617060 | 705F | 7274 | 0000 | 0000 | FFFF | 0010 | 0108 | 0000 |
| 0000617100 | 0000 | 0000 | 0020 | 0000 | 0000 | 0000 | 0000 | 0000 |
| 0000617120 | 0000 | 0000 | 381E | 0000 | 0020 | 0000 | FFFF | 000F |
| 0000617140 | 0108 | 0000 | 0000 | 0000 | 0020 | 0000 | 0000 | 0000 |
| 0000617160 | 0000 | 0000 | 0000 | 0000 | 3828 | 0000 | 0040 | 0000 |
| 0000617200 | FFFF | 000D | 0108 | 0000 | 0000 | 0000 | 0010 | 0000 |
| 0000617220 | 0000 | 0000 | 0000 | 0000 | 652E | 736F | 0000 | 0000 |
| 0000617240 | 0000 | 0000 | FFFE | 0008 | 0166 | 1B0E | 0000 | 0000 |
| 0000617260 | 0050 | 0000 | 0000 | 0000 | 0000 | 0000 | 352E | 6166 |
| 0000617300 | 656B | 0000 | 0000 | 0000 | FFFE | 0008 | 010A | 0000 |
| 0000617320 | 0000 | 0000 | 0040 | 0000 | 0000 | 1B24 | 0000 | 0000 |
| 0000617340 | 0000 | 0000 | 3833 | 0000 | 0000 | 0000 | FFFF | 000D |
| 0000617360 | 0108 | 0000 | 0000 | 0000 | 0010 | 0000 | 0000 | 0000 |
| 0000617400 | 0000 | 0000 | 6A5F | 6D75 | 0070 | 0000 | 0010 | 0000 |
| 0000617420 | FFFF | 000D | 0108 | 0000 | 0000 | 0000 | 0010 | 0000 |
| 0000617440 | 0000 | 0000 | 0000 | 0000 | 735F | 6174 | 7472 | 0000 |
| 0000617460 | 0020 | 0000 | FFFF | 000D | 0108 | 0000 | 0000 | 0000 |
| 0000617500 | 0010 | 0000 | 0000 | 0000 | 0000 | 0000 | 655F | 646E |
| 0000617520 | 0000 | 000C | 0030 | 0000 | FFFF | 000D | 0108 | 0000 |
| 0000617540 | 0000 | 0000 | 0010 | 0000 | 0000 | 0000 | 0000 | 0000 |
| 0000617560 | 652E | 736F | 0000 | 0000 | 0000 | 0000 | FFFE | 0008 |
| 0000617600 | 0166 | 1B18 | 0000 | 0000 | 0040 | 0000 | 0000 | 0000 |
| 0000617620 | 0000 | 0000 | 362E | 6166 | 656B | 0000 | 0000 | 0000 |
| 0000617640 | FFFE | 0008 | 010A | 0000 | 0000 | 0000 | 0080 | 0000 |
| 0000617660 | 0000 | 1B2C | 0000 | 0000 | 685F | 0000 | 0000 | 0000 |
| 0000617700 | 0000 | 0000 | FFFF | 0008 | 0108 | 1B18 | 0000 | 0000 |
| 0000617720 | 0040 | 0000 | 0000 | 0000 | 0000 | 0000 | 765F | 0000 |
| 0000617740 | 0000 | 0000 | 0040 | 0000 | FFFF | 0008 | 0108 | 1B18 |
| 0000617760 | 0000 | 0000 | 0040 | 0000 | 0000 | 0000 | 0000 | 0000 |
| 0000620000 | 652E | 736F | 0000 | 0000 | 0000 | 0000 | FFFE | 0008 |
| 0000620020 | 0166 | 1B24 | 0000 | 0000 | 0080 | 0000 | 0000 | 0000 |
| 0000620040 | 0000 | 0000 | 372E | 6166 | 656B | 0000 | 0000 | 0000 |

THU MAR 14 17:37:32 1991 GSPMON.4 PAGE 218, LINE 12804

| | | | | | | | | |
|---|---|---|---|---|---|---|---|---|
| 0000620060 | FFFE | 0009 | 010C | 0000 | 0000 | 0000 | 0200 | 0000 |
| 0000620100 | 0000 | 1B36 | 0000 | 0000 | 635F | 6B68 | 7573 | 006D |
| 0000620120 | 0000 | 0000 | FFFF | 003D | 010B | 0000 | 0000 | 0000 |
| 0000620140 | 0200 | 0020 | 0000 | 0000 | 0000 | 0000 | 655F | 7272 |
| 0000620160 | 6E63 | 0074 | 0000 | 0000 | FFFF | 003D | 010B | 0000 |
| 0000620200 | 0000 | 0000 | 0200 | 0020 | 0000 | 0000 | 0000 | 0000 |
| 0000620220 | 635F | 6372 | 3233 | 0000 | 0000 | 0000 | FFFF | 003D |
| 0000620240 | 010B | 0000 | 0000 | 0000 | 0200 | 0020 | 0000 | 0000 |
| 0000620260 | 0000 | 0000 | 652E | 736F | 0000 | 0000 | 0000 | 0000 |
| 0000620300 | FFFE | 0009 | 0166 | 1B2C | 0000 | 0000 | 0200 | 0000 |
| 0000620320 | 0000 | 0000 | 0000 | 0000 | 382E | 6166 | 656B | 0000 |
| 0000620340 | 0000 | 0000 | FFFE | 0008 | 010A | 0000 | 0000 | 0000 |
| 0000620360 | 0240 | 0000 | 0000 | 1B3E | 0000 | 0000 | 0000 | 0000 |
| 0000620400 | 383F | 0000 | 0000 | 0000 | FFFF | 0008 | 0108 | 1B18 |
| 0000620420 | 0000 | 0000 | 0040 | 0000 | 0000 | 0000 | 0000 | 0000 |
| 0000620440 | 0000 | 0000 | 384C | 0000 | 0040 | 0000 | FFFF | 0009 |
| 0000620460 | 0108 | 1B2C | 0000 | 0000 | 0200 | 0000 | 0000 | 0000 |
| 0000620500 | 0000 | 0000 | 652E | 736F | 0000 | 0000 | 0000 | 0000 |
| 0000620520 | FFFE | 0008 | 0166 | 1B36 | 0000 | 0000 | 0240 | 0000 |
| 0000620540 | 0000 | 0000 | 0000 | 0000 | 392E | 6166 | 656B | 0000 |
| 0000620560 | 0000 | 0000 | FFFE | 0009 | 010C | 0000 | 0000 | 0000 |
| 0000620600 | 4000 | 0000 | 0000 | 1B48 | 0000 | 0000 | 635F | 6B68 |
| 0000620620 | 7573 | 006D | 0000 | 0000 | FFFF | 00FD | 010B | 0000 |
| 0000620640 | 0000 | 0000 | 4000 | 0020 | 0020 | 0000 | 0000 | 0000 |
| 0000620660 | 655F | 7272 | 6E63 | 0074 | 0000 | 0000 | FFFF | 00FD |
| 0000620700 | 010B | 0000 | 0000 | 0000 | 4000 | 0020 | 0020 | 0000 |
| 0000620720 | 0000 | 0000 | 635F | 6372 | 3233 | 0000 | 0000 | 0000 |
| 0000620740 | FFFF | 00FD | 010B | 0000 | 0000 | 0000 | 4000 | 0020 |
| 0000620760 | 0020 | 0000 | 0000 | 0000 | 652E | 736F | 0000 | 0000 |
| 0000621000 | 0000 | 0000 | FFFE | 0009 | 0166 | 1B3E | 0000 | 0000 |
| 0000621020 | 4000 | 0000 | 0000 | 0000 | 0000 | 0000 | 312E | 6630 |
| 0000621040 | 6B61 | 0065 | 0000 | 0000 | FFFE | 0008 | 010A | 0000 |
| 0000621060 | 0000 | 0000 | 4080 | 0000 | 0000 | 1B52 | 0000 | 0000 |
| 0000621100 | 0000 | 0000 | 3858 | 0000 | 0000 | 0000 | FFFF | 0008 |
| 0000621120 | 0108 | 1B18 | 0000 | 0000 | 0040 | 0000 | 0000 | 0000 |
| 0000621140 | 0000 | 0000 | 0000 | 0000 | 3865 | 0000 | 0040 | 0000 |
| 0000621160 | FFFF | 0008 | 0108 | 1B18 | 0000 | 0000 | 0040 | 0000 |
| 0000621200 | 0000 | 0000 | 0000 | 0000 | 0000 | 0000 | 3871 | 0000 |
| 0000621220 | 0080 | 0000 | FFFF | 0009 | 0108 | 1B3E | 0000 | 0000 |
| 0000621240 | 4000 | 0000 | 0000 | 0000 | 0000 | 0000 | 652E | 736F |
| 0000621260 | 0000 | 0000 | 0000 | 0000 | FFFE | 0008 | 0166 | 1B48 |
| 0000621300 | 0000 | 0000 | 4080 | 0000 | 0000 | 0000 | 0000 | 0000 |
| 0000621320 | 312E | 6631 | 6B61 | 0065 | 0000 | 0000 | FFFE | 0009 |
| 0000621340 | 010C | 0000 | 0000 | 0000 | 0090 | 0000 | 0000 | 1B5C |
| 0000621360 | 0000 | 0000 | 635F | 6B68 | 7573 | 006D | 0000 | 0000 |
| 0000621400 | FFFF | 00FD | 010B | 0000 | 0000 | 0000 | 0090 | 0003 |
| 0000621420 | 0003 | 0000 | 0000 | 0000 | 655F | 7272 | 6E63 | 0074 |
| 0000621440 | 0000 | 0000 | FFFF | 00FD | 010B | 0000 | 0000 | 0000 |
| 0000621460 | 0090 | 0003 | 0003 | 0000 | 0000 | 0000 | 625F | 7263 |
| 0000621500 | 3363 | 0032 | 0000 | 0000 | FFFF | 00FD | 010B | 0000 |
| 0000621520 | 0000 | 0000 | 0090 | 0003 | 0003 | 0000 | 0000 | 0000 |
| 0000621540 | 652E | 736F | 0000 | 0000 | 0000 | 0000 | FFFE | 0009 |
| 0000621560 | 0166 | 1B52 | 0000 | 0000 | 0090 | 0000 | 0000 | 0000 |
| 0000621600 | 0000 | 0000 | 312E | 6632 | 6B61 | 0065 | 0000 | 0000 |
| 0000621620 | FFFE | 0008 | 010A | 0000 | 0000 | 0000 | 0130 | 0000 |
| 0000621640 | 0000 | 1B6A | 0000 | 0000 | 0000 | 0000 | 387B | 0000 |
| 0000621660 | 0000 | 0000 | FFFF | 0008 | 0108 | 1B18 | 0000 | 0000 |
| 0000621700 | 0040 | 0000 | 0000 | 0000 | 0000 | 0000 | 0000 | 0000 |
| 0000621720 | 3888 | 0000 | 0040 | 0000 | FFFF | 0008 | 0108 | 1B18 |

THU MAR 14 17:37:32 1991 GSPMON.4 PAGE 219, LINE 12863

| | | | | | | | | |
|---|---|---|---|---|---|---|---|---|
| 0000621740 | 0000 | 0000 | 0040 | 0000 | 0000 | 0000 | 0000 | 0000 |
| 0000621760 | 785F | 635F | 6F6F | 6472 | 0080 | 0000 | FFFF | 0003 |
| 0000622000 | 0108 | 0000 | 0000 | 0000 | 0010 | 0000 | 0000 | 0000 |
| 0000622020 | 0000 | 0000 | 795F | 635F | 6F6F | 6472 | 0090 | 0000 |
| 0000622040 | FFFF | 0003 | 0108 | 0000 | 0000 | 0000 | 0010 | 0000 |
| 0000622060 | 0000 | 0000 | 0000 | 0000 | 0000 | 0000 | 3894 | 0000 |
| 0000622100 | 00A0 | 0000 | FFFF | 0009 | 0108 | 1B52 | 0000 | 0000 |
| 0000622120 | 0090 | 0000 | 0000 | 0000 | 0000 | 0000 | 652E | 736F |
| 0000622140 | 0000 | 0000 | 0000 | 0000 | FFFE | 0008 | 0166 | 1B5C |
| 0000622160 | 0000 | 0000 | 0130 | 0000 | 0000 | 0000 | 0000 | 0000 |
| 0000622200 | 312E | 6633 | 6B61 | 0065 | 0000 | 0000 | FFFE | 0008 |
| 0000622220 | 010A | 0000 | 0000 | 0000 | 0050 | 0000 | 0000 | 1B76 |
| 0000622240 | 0000 | 0000 | 0000 | 0000 | 389E | 0000 | 0000 | 0000 |
| 0000622260 | FFFF | 000D | 0108 | 0000 | 0000 | 0000 | 0010 | 0000 |
| 0000622300 | 0000 | 0000 | 0000 | 0000 | 0000 | 0000 | 38B6 | 0000 |
| 0000622320 | 0010 | 0000 | FFFF | 000D | 0108 | 0000 | 0000 | 0000 |
| 0000622340 | 0010 | 0000 | 0000 | 0000 | 0000 | 0000 | 0000 | 0000 |
| 0000622360 | 38C8 | 0000 | 0020 | 0000 | FFFF | 000D | 0108 | 0000 |
| 0000622400 | 0000 | 0000 | 0010 | 0000 | 0000 | 0000 | 0000 | 0000 |
| 0000622420 | 0000 | 0000 | 38D3 | 0000 | 0030 | 0000 | FFFF | 0010 |
| 0000622440 | 0108 | 0000 | 0000 | 0000 | 0020 | 0000 | 0000 | 0000 |
| 0000622460 | 0000 | 0000 | 652E | 736F | 0000 | 0000 | 0000 | 0000 |
| 0000622500 | FFFE | 0008 | 0166 | 1B6A | 0000 | 0000 | 0050 | 0000 |
| 0000622520 | 0000 | 0000 | 0000 | 0000 | 312E | 6634 | 6B61 | 0065 |
| 0000622540 | 0000 | 0000 | FFFE | 0008 | 010A | 0000 | 0000 | 0000 |
| 0000622560 | 0040 | 0000 | 0000 | 1B7E | 0000 | 0000 | 0000 | 0000 |
| 0000622600 | 38DD | 0000 | 0000 | 0000 | FFFF | 0005 | 0108 | 0000 |
| 0000622620 | 0000 | 0000 | 0020 | 0000 | 0000 | 0000 | 0000 | 0000 |
| 0000622640 | 0000 | 0000 | 38ED | 0000 | 0020 | 0000 | FFFF | 0005 |
| 0000622660 | 0108 | 0000 | 0000 | 0000 | 0020 | 0000 | 0000 | 0000 |
| 0000622700 | 0000 | 0000 | 652E | 736F | 0000 | 0000 | 0000 | 0000 |
| 0000622720 | FFFE | 0008 | 0166 | 1B76 | 0000 | 0000 | 0040 | 0000 |
| 0000622740 | 0000 | 0000 | 0000 | 0000 | 312E | 6635 | 6B61 | 0065 |
| 0000622760 | 0000 | 0000 | FFFE | 0008 | 010A | 0000 | 0000 | 0000 |
| 0000623000 | 0050 | 0000 | 0000 | 1B8C | 0000 | 0000 | 785F | 656C |
| 0000623020 | 7466 | 0000 | 0000 | 0000 | FFFF | 0003 | 0108 | 0000 |
| 0000623040 | 0000 | 0000 | 0010 | 0000 | 0000 | 0000 | 0000 | 0000 |
| 0000623060 | 795F | 6F74 | 0070 | 0000 | 0010 | 0000 | FFFF | 0003 |
| 0000623100 | 0108 | 0000 | 0000 | 0000 | 0010 | 0000 | 0000 | 0000 |
| 0000623120 | 0000 | 0000 | 785F | 6972 | 6867 | 0074 | 0020 | 0000 |
| 0000623140 | FFFF | 0003 | 0108 | 0000 | 0000 | 0000 | 0010 | 0000 |
| 0000623160 | 0000 | 0000 | 0000 | 0000 | 795F | 6F64 | 6E77 | 0000 |
| 0000623200 | 0030 | 0000 | FFFF | 0003 | 0108 | 0000 | 0000 | 0000 |
| 0000623220 | 0010 | 0000 | 0000 | 0000 | 0000 | 0000 | 0000 | 0000 |
| 0000623240 | 38FC | 0000 | 0040 | 0000 | FFFF | 0003 | 0108 | 0000 |
| 0000623260 | 0000 | 0000 | 0010 | 0000 | 0000 | 0000 | 0000 | 0000 |
| 0000623300 | 652E | 736F | 0000 | 0000 | 0000 | 0000 | FFFE | 0008 |
| 0000623320 | 0166 | 1B7E | 0000 | 0000 | 0050 | 0000 | 0000 | 0000 |
| 0000623340 | 0000 | 0000 | 312E | 6636 | 6B61 | 0065 | 0000 | 0000 |
| 0000623360 | FFFE | 0008 | 01CA | 0000 | 0000 | 0000 | 0020 | 0000 |
| 0000623400 | 0000 | 1B94 | 0000 | 0000 | 0000 | 0000 | 3906 | 0000 |
| 0000623420 | 0000 | 0000 | FFFF | 0003 | 0108 | 0000 | 0000 | 0000 |
| 0000623440 | 0010 | 0000 | 0000 | 0000 | 0000 | 0000 | 0000 | 0000 |
| 0000623460 | 3912 | 0000 | 0010 | 0000 | FFFF | 0003 | 0108 | 0000 |
| 0000623500 | 0000 | 0000 | 0010 | 0000 | 0000 | 0000 | 0000 | 0000 |
| 0000623520 | 652E | 736F | 0000 | 0000 | 0000 | 0000 | FFFE | 0008 |
| 0000623540 | 0166 | 1B8C | 0000 | 0000 | 0020 | 0000 | 0000 | 0000 |
| 0000623560 | 0000 | 0000 | 312E | 6637 | 6B61 | 0065 | 0000 | 0000 |
| 0000623600 | FFFE | 0008 | 010A | 0000 | 0000 | 0000 | 0040 | 0000 |

THU MAR 14 17:37:32 1991 GSPMON.4 PAGE 220, LINE 12922

| | | | | | | | | |
|---|---|---|---|---|---|---|---|---|
| 0000623620 | 0000 | 1BA0 | 0000 | 0000 | 0000 | 0000 | 391C | 0000 |
| 0000623640 | 0000 | 0000 | FFFF | 000D | 0108 | 0000 | 0000 | 0000 |
| 0000623660 | 0010 | 0000 | 0000 | 0000 | 0000 | 0000 | 0000 | 0000 |
| 0000623700 | 392F | 0000 | 0010 | 0000 | FFFF | 000D | 0108 | 0000 |
| 0000623720 | 0000 | 0000 | 0010 | 0000 | 0000 | 0000 | 0000 | 0000 |
| 0000623740 | 0000 | 0000 | 3941 | 0000 | 0020 | 0000 | FFFF | 000D |
| 0000623760 | 0108 | 0000 | 0000 | 0000 | 0010 | 0000 | 0000 | 0000 |
| 0000624000 | 0000 | 0000 | 0000 | 0000 | 394E | 0000 | 0030 | 0000 |
| 0000624020 | FFFF | 000D | 0108 | 0000 | 0000 | 0000 | 0010 | 0000 |
| 0000624040 | 0000 | 0000 | 0000 | 0000 | 652E | 736F | 0000 | 0000 |
| 0000624060 | 0000 | 0000 | FFFE | 0008 | 0166 | 1B94 | 0000 | 0000 |
| 0000624100 | 0040 | 0000 | 0000 | 0000 | 0000 | 0000 | 662E | 6C69 |
| 0000624120 | 0065 | 0000 | 1BA2 | 0000 | FFFE | 0000 | 0167 | 7067 |
| 0000624140 | 635F | 7673 | 632E | 0000 | 0000 | 0000 | 0000 | 0000 |
| 0000624160 | 662E | 6C69 | 0065 | 0000 | 1C0E | 0000 | FFFE | 0000 |
| 0000624200 | 0167 | 7067 | 6D5F | 756F | 682E | 0000 | 0000 | 0000 |
| 0000624220 | 0000 | 0000 | 312E | 6638 | 6B61 | 0065 | 0000 | 0000 |
| 0000624240 | FFFE | 0008 | 010A | 0000 | 0000 | 0000 | 0060 | 0000 |
| 0000624260 | 0000 | 1BAE | 0000 | 0000 | 0000 | 0000 | 395C | 0000 |
| 0000624300 | 0000 | 0000 | FFFF | 000F | 0108 | 0000 | 0000 | 0000 |
| 0000624320 | 0020 | 0000 | 0000 | 0000 | 0000 | 0000 | 0000 | 0000 |
| 0000624340 | 3969 | 0000 | 0020 | 0000 | FFFF | 000F | 0108 | 0000 |
| 0000624360 | 0000 | 0000 | 0020 | 0000 | 0000 | 0000 | 0000 | 0000 |
| 0000624400 | 0000 | 0000 | 397F | 0000 | 0040 | 0000 | FFFF | 000F |
| 0000624420 | 0108 | 0000 | 0000 | 0000 | 0020 | 0000 | 0000 | 0000 |
| 0000624440 | 0000 | 0000 | 652E | 736F | 0000 | 0000 | 0000 | 0000 |
| 0000624460 | FFFE | 0008 | 0166 | 1BA4 | 0000 | 0000 | 0060 | 0000 |
| 0000624500 | 0000 | 0000 | 0000 | 0000 | 312E | 6639 | 6B61 | 0065 |
| 0000624520 | 0000 | 0000 | FFFE | 0008 | 010A | 0000 | 0000 | 0000 |
| 0000624540 | 00C0 | 0000 | 0000 | 1BC8 | 0000 | 0000 | 635F | 0078 |
| 0000624560 | 0000 | 0000 | 0000 | 0000 | FFFF | 000D | 0108 | 0000 |
| 0000624600 | 0000 | 0000 | 0010 | 0000 | 0000 | 0000 | 0000 | 0000 |
| 0000624620 | 635F | 0079 | 0000 | 0000 | 0010 | 0000 | FFFF | 000D |
| 0000624640 | 0108 | 0000 | 0000 | 0000 | 0010 | 0000 | 0000 | 0000 |
| 0000624660 | 0000 | 0000 | 785F | 0031 | 0000 | 0000 | 0020 | 0000 |
| 0000624700 | FFFF | 0003 | 0108 | 0000 | 0000 | 0000 | 0010 | 0000 |
| 0000624720 | 0000 | 0000 | 0000 | 0000 | 795F | 0031 | 0000 | 0000 |
| 0000624740 | 0030 | 0000 | FFFF | 0003 | 0108 | 0000 | 0000 | 0000 |
| 0000624760 | 0010 | 0000 | 0000 | 0000 | 0000 | 0000 | 785F | 0032 |
| 0000625000 | 0000 | 0000 | 0040 | 0000 | FFFF | 0003 | 0108 | 0000 |
| 0000625020 | 0000 | 0000 | 0010 | 0000 | 0000 | 0000 | 0000 | 0000 |
| 0000625040 | 795F | 0032 | 0000 | 0000 | 0050 | 0000 | FFFF | 0003 |
| 0000625060 | 0108 | 0000 | 0000 | 0000 | 0010 | 0000 | 0000 | 0000 |
| 0000625100 | 0000 | 0000 | 685F | 5F70 | 0078 | 0000 | 0060 | 0000 |
| 0000625120 | FFFF | 0003 | 0108 | 0000 | 0000 | 0000 | 0010 | 0000 |
| 0000625140 | 0000 | 0000 | 0000 | 0000 | 685F | 5F70 | 0079 | 0000 |
| 0000625160 | 0070 | 0000 | FFFF | 0003 | 0108 | 0000 | 0000 | 0000 |
| 0000625200 | 0010 | 0000 | 0000 | 0000 | 0000 | 0000 | 0000 | 0000 |
| 0000625220 | 3990 | 0000 | 0080 | 0000 | FFFF | 000F | 0108 | 0000 |
| 0000625240 | 0000 | 0000 | 0020 | 0000 | 0000 | 0000 | 0000 | 0000 |
| 0000625260 | 0000 | 0000 | 39A0 | 0000 | 00A0 | 0000 | FFFF | 000D |
| 0000625300 | 0108 | 0000 | 0000 | 0000 | 0010 | 0000 | 0000 | 0000 |
| 0000625320 | 0000 | 0000 | 0000 | 0000 | 39AF | 0000 | 00B0 | 0000 |
| 0000625340 | FFFF | 000D | 0108 | 0000 | 0000 | 0000 | 0010 | 0000 |
| 0000625360 | 0000 | 0000 | 0000 | 0000 | 652E | 736F | 0000 | 0000 |
| 0000625400 | 0000 | 0000 | FFFE | 0008 | 0166 | 1BAE | 0000 | 0000 |
| 0000625420 | 00C0 | 0000 | 0000 | 0000 | 0000 | 0000 | 322E | 6630 |
| 0000625440 | 6B61 | 0065 | 0000 | 0000 | FFFE | 0008 | 010A | 0000 |
| 0000625460 | 0000 | 0000 | 0030 | 0000 | 0000 | 1BD2 | 0000 | 0000 |

THU MAR 14 17:37:32 19°! GSPMON.4 PAGE 221, LINE 12981

| | | | | | | | | |
|---|---|---|---|---|---|---|---|---|
| 0000625500 | 785F | 0000 | 0000 | 0000 | 0000 | 0000 | FFFF | 0003 |
| 0000625520 | 0108 | 0000 | 0000 | 0000 | 0010 | 0000 | 0000 | 0000 |
| 0000625540 | 0000 | 0000 | 795F | 0000 | 0000 | 0000 | 0010 | 0000 |
| 0000625560 | FFFF | 0003 | 0108 | 0000 | 0000 | 0000 | 0010 | 0000 |
| 0000625600 | 0000 | 0000 | 0000 | 0000 | 695F | 6F63 | 5F6E | 6469 |
| 0000625620 | 0020 | 0000 | FFFF | 0003 | 0108 | 0000 | 0000 | 0000 |
| 0000625640 | 0010 | 0000 | 0000 | 0000 | 0000 | 0000 | 652E | 736F |
| 0000625660 | 0000 | 0000 | 0000 | 0000 | FFFE | 0008 | 0166 | 1BC8 |
| 0000625700 | 0000 | 0000 | 0030 | 0000 | 0000 | 0000 | 0000 | 0000 |
| 0000625720 | 322E | 6631 | 6B61 | 0065 | 0000 | 0000 | FFFE | 0008 |
| 0000625740 | 010A | 0000 | 0000 | 0000 | 0070 | 0000 | 0000 | 1BE4 |
| 0000625760 | 0000 | 0000 | 785F | 0000 | 0000 | 0000 | 0000 | 0000 |
| 0000626000 | FFFF | 000D | 0108 | 0000 | 0000 | 0000 | 0010 | 0000 |
| 0000626020 | 0000 | 0000 | 0000 | 0000 | 795F | 0000 | 0000 | 0000 |
| 0000626040 | 0010 | 0000 | FFFF | 000D | 0108 | 0000 | 0000 | 0000 |
| 0000626060 | 0010 | 0000 | 0000 | 0000 | 0000 | 0000 | 695F | 6F63 |
| 0000626100 | 5F6E | 6469 | 0020 | 0000 | FFFF | 000D | 0108 | 0000 |
| 0000626120 | 0000 | 0000 | 0010 | 0000 | 0000 | 0000 | 0000 | 0000 |
| 0000626140 | 6C5F | 6665 | 0074 | 0000 | 0030 | 0000 | FFFF | 000D |
| 0000626160 | 0108 | 0000 | 0000 | 0000 | 0010 | 0000 | 0000 | 0000 |
| 0000626200 | 0000 | 0000 | 725F | 6769 | 7468 | 0000 | 0040 | 0000 |
| 0000626220 | FFFF | 000D | 0108 | 0000 | 0000 | 0000 | 0010 | 0000 |
| 0000626240 | 0000 | 0000 | 0000 | 0000 | 755F | 0070 | 0000 | 0000 |
| 0000626260 | 0050 | 0000 | FFFF | 000D | 0108 | 0000 | 0000 | 0000 |
| 0000626300 | 0010 | 0000 | 0000 | 0000 | 0000 | 0000 | 645F | 776F |
| 0000626320 | 006E | 0000 | 0060 | 0000 | FFFF | 000D | 0108 | 0000 |
| 0000626340 | 0000 | 0000 | 0010 | 0000 | 0000 | 0000 | 0000 | 0000 |
| 0000626360 | 652E | 736F | 0000 | 0000 | 0000 | 0000 | FFFE | 0008 |
| 0000626400 | 0166 | 1BD2 | 0000 | 0000 | 0070 | 0000 | 0000 | 0000 |
| 0000626420 | 0000 | 0000 | 322E | 6632 | 6B61 | 0065 | 0000 | 0000 |
| 0000626440 | FFFE | 0008 | 010A | 0000 | 0000 | 0000 | 0020 | 0000 |
| 0000626460 | 0000 | 1BEC | 0000 | 0000 | 6D5F | 646F | 0065 | 0000 |
| 0000626500 | 0000 | 0000 | FFFF | 000D | 0108 | 0000 | 0000 | 0000 |
| 0000626520 | 0010 | 0000 | 0000 | 0000 | 0000 | 0000 | 725F | 7365 |
| 0000626540 | 6C75 | 0074 | 0010 | 0000 | FFFF | 000D | 0108 | 0000 |
| 0000626560 | 0000 | 0000 | 0010 | 0000 | 0000 | 0000 | 0000 | 0000 |
| 0000626600 | 652E | 736F | 0000 | 0000 | 0000 | 0000 | FFFE | 0008 |
| 0000626620 | 0166 | 1BE4 | 0000 | 0000 | 0020 | 0000 | 0000 | 0000 |
| 0000626640 | 0000 | 0000 | 322E | 6633 | 6B61 | 0065 | 0000 | 0000 |
| 0000626660 | FFFE | 0008 | 010A | 0000 | 0000 | 0000 | 0020 | 0000 |
| 0000626700 | 0000 | 1BF8 | 0000 | 0000 | 0000 | 0000 | 39C0 | 0000 |
| 0000626720 | 0000 | 0000 | FFFF | 000C | 0108 | 0000 | 0000 | 0000 |
| 0000626740 | 0008 | 0000 | 0000 | 0000 | 0000 | 0000 | 0000 | 0000 |
| 0000626760 | 39CC | 0000 | 0008 | 0000 | FFFF | 000C | 0108 | 0000 |
| 0000627000 | 0000 | 0000 | 0008 | 0000 | 0000 | 0000 | 0000 | 0000 |
| 0000627020 | 0000 | 0000 | 39D7 | 0000 | 0010 | 0000 | FFFF | 000C |
| 0000627040 | 0108 | 0000 | 0000 | 0000 | 0008 | 0000 | 0000 | 0000 |
| 0000627060 | 0000 | 0000 | 0000 | 0000 | 39E2 | 0000 | 0018 | 0000 |
| 0000627100 | FFFF | 000C | 0108 | 0000 | 0000 | 0000 | 0008 | 0000 |
| 0000627120 | 0000 | 0000 | 0000 | 0000 | 652E | 736F | 0000 | 0000 |
| 0000627140 | 0000 | 0000 | FFFE | 0008 | 0166 | 1BEC | 0000 | 0000 |
| 0000627160 | 0020 | 0000 | 0000 | 0000 | 0000 | 0000 | 322E | 6634 |
| 0000627200 | 6B61 | 0065 | 0000 | 0000 | FFFE | 0008 | 010A | 0000 |
| 0000627220 | 0000 | 0000 | 0020 | 0000 | 0000 | 1C02 | 0000 | 0000 |
| 0000627240 | 615F | 7474 | 0072 | 0000 | 0000 | 0000 | FFFF | 000D |
| 0000627260 | 0108 | 0000 | 0000 | 0000 | 0010 | 0000 | 0000 | 0000 |
| 0000627300 | 0000 | 0000 | 735F | 7274 | 7069 | 0000 | 0010 | 0000 |
| 0000627320 | FFFF | 000C | 0108 | 0000 | 0000 | 0000 | 0008 | 0000 |
| 0000627340 | 0000 | 0000 | 0000 | 0000 | 725F | 6365 | 0074 | 0000 |

THU MAR 14 17:37:32 1991 GSPMON.4 PAGE 222, LINE 13040

| | | | | | | | | |
|---|---|---|---|---|---|---|---|---|
| 0000627360 | 0018 | 0000 | FFFF | 000C | 0108 | 0000 | 0000 | 0000 |
| 0000627400 | 0008 | 0000 | 000D | 0000 | 0000 | 0000 | 652E | 736F |
| 0000627420 | 0000 | 0000 | 0000 | 0000 | FFFE | 0008 | 0166 | 1BF8 |
| 0000627440 | 0000 | 0000 | 0020 | 0000 | 0000 | 0000 | 0000 | 0000 |
| 0000627460 | 322E | 6635 | 6B61 | 0065 | 0000 | 0000 | FFFE | 0008 |
| 0000627500 | 010A | 0000 | 0000 | 0000 | 1930 | 0000 | 0000 | 1C0E |
| 0000627520 | 0000 | 0000 | 0000 | 0000 | 39EC | 0000 | 0000 | 0000 |
| 0000627540 | FFFF | 000D | 0108 | 0000 | 0000 | 0000 | 0010 | 0000 |
| 0000627560 | 0000 | 0000 | 0000 | 0000 | 785F | 0000 | 0000 | 0000 |
| 0000627600 | 0010 | 0000 | FFFF | 000D | 0108 | 00C0 | 0000 | 0000 |
| 0000627620 | 0010 | 0000 | 0000 | 0000 | 0000 | 0000 | 795F | 0000 |
| 0000627640 | 0000 | 0006 | 0020 | 0000 | FFFF | 000D | 0108 | 0000 |
| 0000627660 | 0000 | 0000 | 0010 | 0000 | 0000 | 0000 | 0000 | 0000 |
| 0000627700 | 0000 | 0000 | 39F6 | 0000 | 0030 | 0000 | FFFF | 0038 |
| 0000627720 | 0108 | 1BF8 | 0000 | 0000 | 1900 | 00C8 | 0000 | 0000 |
| 0000627740 | 0000 | 0000 | 652E | 736F | 0000 | 0000 | 0000 | 0000 |
| 0000627760 | FFFE | 0008 | 0166 | 1C02 | 0000 | 0000 | 1930 | 0000 |
| 0000630000 | 0000 | 0000 | 0000 | 0000 | 662E | 6C69 | 0065 | 0000 |
| 0000630020 | 1C10 | 0000 | FFFE | 0000 | 0167 | 7067 | 635F | 7673 |
| 0000630040 | 632E | 0000 | 0000 | 0000 | 0000 | 0000 | 662E | 6C69 |
| 0000630060 | 0065 | 0000 | 1C1C | 0000 | FFFE | 0000 | 0167 | 7067 |
| 0000630100 | 615F | 6C70 | 682E | 0000 | 0000 | 0000 | 0000 | 0000 |
| 0000630120 | 322E | 6636 | 6B61 | 0065 | 0000 | 0000 | FFFE | 0008 |
| 0000630140 | 010A | 0000 | 0000 | 0000 | 0030 | 0000 | 0000 | 1C1C |
| 0000630160 | 0000 | 0000 | 775F | 6469 | 6874 | 0000 | 0000 | 0000 |
| 0000630200 | FFFF | 000D | 0108 | 0000 | 0000 | 0000 | 0010 | 0000 |
| 0000630220 | 0000 | 0000 | 0000 | 0000 | 685F | 6965 | 6867 | 0074 |
| 0000630240 | 0010 | 0000 | FFFF | 000D | 0108 | 0000 | 0000 | 0000 |
| 0000630260 | 0010 | 0000 | 0000 | 0000 | 0000 | 0000 | 645F | 7065 |
| 0000630300 | 6874 | 0000 | 0020 | 0000 | FFFF | 000D | 0108 | 0000 |
| 0000630320 | 0000 | 0000 | 0010 | 0000 | 0000 | 0000 | 0000 | 0000 |
| 0000630340 | 652E | 736F | 0000 | 0000 | 0000 | 0000 | FFFE | 0008 |
| 0000630360 | 0166 | 1C12 | 0000 | 0000 | 0030 | 0000 | 0000 | 0000 |
| 0000630400 | 0000 | 0000 | 662E | 6C69 | 0065 | 0000 | 1C1E | 0000 |
| 0000630420 | FFFE | 0000 | 0167 | 7067 | 615F | 6C70 | 692E | 636E |
| 0000630440 | 0000 | 0000 | 0000 | 0000 | 662E | 6C69 | 0065 | 0000 |
| 0000630460 | 1C20 | 0000 | FFFE | 0000 | 0167 | 7067 | 615F | 6C70 |
| 0000630500 | 682E | 0000 | 0000 | 0000 | 0000 | 0000 | 662E | 6C69 |
| 0000630520 | 0065 | 0000 | 1EA2 | 0000 | FFFE | 0000 | 0167 | 7067 |
| 0000630540 | 635F | 7673 | 632E | 0000 | 0000 | 0000 | 0000 | 0000 |
| 0000630560 | 322E | 6637 | 6B61 | 0065 | 0000 | 0000 | FFFE | 000A |
| 0000630600 | 010F | 0000 | 0000 | 0000 | 0003 | 0000 | 0000 | 1C36 |
| 0000630620 | 0000 | 0000 | 0000 | 0000 | 3A02 | 0000 | 0000 | 0000 |
| 0000630640 | FFFF | 000B | 0110 | 0000 | 0000 | 0000 | 0003 | 0000 |
| 0000630660 | 0000 | 0000 | 0000 | 0000 | 0000 | 0000 | 3A0D | 0000 |
| 0000630700 | 0001 | 0000 | FFFF | 000B | 0110 | 0000 | 0000 | 0000 |
| 0000630720 | 0003 | 0000 | 0000 | 0000 | 0000 | 0000 | 495F | 494E |
| 0000630740 | 0054 | 0000 | 0002 | 0000 | FFFF | 000B | 0110 | 0000 |
| 0000630760 | 0000 | 0000 | 0003 | 0000 | 0000 | 0000 | 0000 | 0000 |
| 0000631000 | 525F | 4E55 | 0000 | 0000 | 0003 | 0000 | FFFF | 000B |
| 0000631020 | 0110 | 0000 | 0000 | 0000 | 0003 | 0000 | 0000 | 0000 |
| 0000631040 | 0000 | 0000 | 435F | 5041 | 5554 | 4552 | 0004 | 0000 |
| 0000631060 | FFFF | 000B | 0110 | 0000 | 0000 | 0000 | 0003 | 0000 |
| 0000631100 | 0000 | 0000 | 0000 | 0000 | 0000 | 0000 | 3A18 | 0000 |
| 0000631120 | 0005 | 0000 | FFFF | 000B | 0110 | 0000 | 0000 | 0000 |
| 0000631140 | 0003 | 0000 | 0000 | 0000 | 0000 | 0000 | 0000 | 0000 |
| 0000631160 | 3A23 | 0000 | 0006 | 0000 | FFFF | 000B | 0110 | 0000 |
| 0000631200 | 0000 | 0000 | 0003 | 0000 | 0000 | 0000 | 0000 | 0000 |
| 0000631220 | 535F | 4F54 | 0050 | 0000 | 0007 | 0000 | FFFF | 000B |

THU MAR 14 17:37:32 1991 GSPMON.4 PAGE 223, LINE 13099

| | | | | | | | | |
|---|---|---|---|---|---|---|---|---|
| 0000631240 | 0110 | 0000 | 0000 | 0000 | 0003 | 0000 | 0000 | 0000 |
| 0000631260 | 0000 | 0000 | 652E | 736F | 0000 | 0000 | 0000 | 0000 |
| 0000631300 | FFFE | 000A | 0166 | 1C22 | 0000 | 0000 | 0003 | 0000 |
| 0000631320 | 0000 | 0000 | 0000 | 0000 | 0000 | 0000 | 3A2D | 0000 |
| 0000631340 | DD60 | FFD1 | 0003 | 000F | 0103 | 0000 | 0000 | 0000 |
| 0000631360 | 0020 | 0000 | 0000 | 0000 | 0000 | 0000 | 0000 | 0000 |
| 0000631400 | 3A3C | 0000 | DD80 | FFD1 | 0003 | 000A | 0103 | 1C22 |
| 0000631420 | 0000 | 0000 | 0003 | 0000 | 0000 | 0000 | 0000 | 0000 |
| 0000631440 | 0000 | 0000 | 3A4D | 0000 | DD90 | FFD1 | 0003 | 000A |
| 0000631460 | 0103 | 1C22 | 0000 | 0000 | 0003 | 0000 | 0000 | 0000 |
| 0000631500 | 0000 | 0000 | 0000 | 0000 | 3A60 | 0000 | DDA0 | FFD1 |
| 0000631520 | 0003 | 000A | 0103 | 1C22 | 0000 | 0000 | 0003 | 0000 |
| 0000631540 | 0000 | 0000 | 0000 | 0000 | 0000 | 0000 | 3A71 | 0000 |
| 0000631560 | DDB0 | FFD1 | 0003 | 000A | 0103 | 1C22 | 0000 | 0000 |
| 0000631600 | 0003 | 0000 | 0000 | 0000 | 0000 | 0000 | 0000 | 0000 |
| 0000631620 | 3A85 | 0000 | DDC0 | FFD1 | 0003 | 000A | 0103 | 1C22 |
| 0000631640 | 0000 | 0000 | 0003 | 0000 | 0000 | 0000 | 0000 | 0000 |
| 0000631660 | 0000 | 0000 | 3A99 | 0000 | DDD0 | FFD1 | 0003 | 000A |
| 0000631700 | 0103 | 1C22 | 0000 | 0000 | 0003 | 0000 | 0000 | 0000 |
| 0000631720 | 0000 | 0000 | 0000 | 0000 | 3AAC | 0000 | DDE0 | FFD1 |
| 0000631740 | 0003 | 000A | 0103 | 1C22 | 0000 | 0000 | 0003 | 0000 |
| 0000631760 | 0000 | 0000 | 0000 | 0000 | 0000 | 0000 | 3ABF | 0000 |
| 0000632000 | DDF0 | FFD1 | 0003 | 000A | 0103 | 1C22 | 0000 | 0000 |
| 0000632020 | 0003 | 0000 | 0000 | 0000 | 0000 | 0000 | 0000 | 0000 |
| 0000632040 | 3AD2 | 0000 | DE00 | FFD1 | 0003 | 000A | 0103 | 1C22 |
| 0000632060 | 0000 | 0000 | 0003 | 0000 | 0000 | 0000 | 0000 | 0000 |
| 0000632100 | 0000 | 0000 | 3AE6 | 0000 | DE10 | FFD1 | 0003 | 000A |
| 0000632120 | 0103 | 1C22 | 0000 | 0000 | 0003 | 0000 | 0000 | 0000 |
| 0000632140 | 0000 | 0000 | 0000 | 0000 | 3AFC | 0000 | DE20 | FFD1 |
| 0000632160 | 0003 | 0008 | 0103 | 1AFC | 0000 | 0000 | 0050 | 0000 |
| 0000632200 | 0000 | 0000 | 0000 | 0000 | 0000 | 0000 | 3B06 | 0000 |
| 0000632220 | DE70 | FFD1 | 0003 | 0018 | 0103 | 1B06 | 0000 | 0000 |
| 0000632240 | 0020 | 0000 | 0000 | 0000 | 0000 | 0000 | 0000 | 0000 |
| 0000632260 | 3B13 | 0000 | DE90 | FFD1 | 0003 | 0018 | 0103 | 1B06 |
| 0000632300 | 0000 | 0000 | 0020 | 0000 | 0000 | 0000 | 0000 | 0000 |
| 0000632320 | 0000 | 0000 | 3B20 | 0000 | DEB0 | FFD1 | 0003 | 0008 |
| 0000632340 | 0103 | 1B4A | 0000 | 0000 | 0130 | 0000 | 0000 | 0000 |
| 0000632360 | 0000 | 0000 | 0000 | 0000 | 3B2E | 0000 | DFE0 | FFD1 |
| 0000632400 | 0003 | 000D | 0103 | 0000 | 0000 | 0000 | 0010 | 0000 |
| 0000632420 | 0000 | 0000 | 0000 | 0000 | 0000 | 0000 | 3B3B | 0000 |
| 0000632440 | DFF0 | FFD1 | 0003 | 000A | 0103 | 19D0 | 0000 | 0000 |
| 0000632460 | 0001 | 0000 | 0000 | 0000 | 0000 | 0000 | 0000 | 0000 |
| 0000632500 | 3B49 | 0000 | E000 | FFD1 | 0003 | 000A | 0103 | 19D0 |
| 0000632520 | 0000 | 0000 | 0001 | 0000 | 0000 | 0000 | 0000 | 0000 |
| 0000632540 | 0000 | 0000 | 3B5B | 0000 | E010 | FFD1 | 0003 | 000A |
| 0000632560 | 0103 | 19D0 | 0000 | 0000 | 0001 | 0000 | 0000 | 0000 |
| 0000632600 | 0000 | 0000 | 0000 | 0000 | 3B6B | 0000 | E020 | FFD1 |
| 0000632620 | 0003 | 000D | 0103 | 0000 | 0000 | 0000 | 0010 | 0000 |
| 0000632640 | 0000 | 0000 | 0000 | 0000 | 0000 | 0000 | 3B76 | 0000 |
| 0000632660 | E030 | FFD1 | 0003 | 000D | 0103 | 0000 | 0000 | 0000 |
| 0000632700 | 0010 | 0000 | 0000 | 0000 | 0000 | 0000 | 0000 | 0000 |
| 0000632720 | 3B84 | 0000 | E040 | FFD1 | 0003 | 000A | 0103 | 19D0 |
| 0000632740 | 0000 | 0000 | 0001 | 0000 | 0000 | 0000 | 0000 | 0000 |
| 0000632760 | 0000 | 0000 | 3B90 | 0000 | E050 | FFD1 | 0003 | 000A |
| 0000633000 | 0103 | 19D0 | 0000 | 0000 | 0001 | 0000 | 0000 | 0000 |
| 0000633020 | 0000 | 0000 | 0000 | 0000 | 3BAD | 0000 | E060 | FFD1 |
| 0000633040 | 0003 | 000A | 0103 | 19D0 | 0000 | 0000 | 0001 | 0000 |
| 0000633060 | 0000 | 0000 | 0000 | 0000 | 0000 | 0000 | 3BB1 | 0000 |
| 0000633100 | E070 | FFD1 | 0003 | 000A | 0103 | 19D0 | 0000 | 0000 |

THU MAR 14 17:37:32 1991 GSPMON.4 PAGE 224, LINE 13158

| | | | | | | | | |
|---|---|---|---|---|---|---|---|---|
| 0000633120 | 0001 | 0000 | 0000 | 0000 | 0000 | 0000 | 0000 | 0000 |
| 0000633140 | 3BBC | 0000 | E080 | FFD1 | 0003 | 000A | 0103 | 19D0 |
| 0000633160 | 0000 | 0000 | 0001 | 0000 | 0000 | 0000 | 0000 | 0000 |
| 0000633200 | 0000 | 0000 | 3BCC | 0000 | E090 | FFD1 | 0003 | 000A |
| 0000633220 | 0103 | 19D0 | 0000 | 0000 | 0001 | 0000 | 0000 | 0000 |
| 0000633240 | 0000 | 0000 | 0000 | 0000 | 3BD6 | 0000 | E0A0 | FFD1 |
| 0000633260 | 0003 | 000A | 0103 | 19D0 | 0000 | 0000 | 0001 | 0000 |
| 0000633300 | 0000 | 0000 | 0000 | 0000 | 0000 | 0000 | 3BE5 | 0000 |
| 0000633320 | E0B0 | FFD1 | 0003 | 000A | 0103 | 19D0 | 0000 | 0000 |
| 0000633340 | 0001 | 0000 | 0000 | 0000 | 0000 | 0000 | 0000 | 0000 |
| 0000633360 | 3BF0 | 0000 | E0C0 | FFD1 | 0003 | 000A | 0103 | 19D0 |
| 0000633400 | 0000 | 0000 | 0001 | 0000 | 0000 | 0000 | 0000 | 0000 |
| 0000633420 | 0000 | 0000 | 3BFC | 0000 | E0D0 | FFD1 | 0003 | 000D |
| 0000633440 | 0103 | 0000 | 0000 | 0000 | 0010 | 0000 | 0000 | 0000 |
| 0000633460 | 0000 | 0000 | 0000 | 0000 | 3C09 | 0000 | E0E0 | FFD1 |
| 0000633500 | 0003 | 000D | 0103 | 0000 | 0000 | 0000 | 0010 | 0000 |
| 0000633520 | 0000 | 0000 | 0000 | 0000 | 0000 | 0000 | 3C16 | 0000 |
| 0000633540 | E0F0 | FFD1 | 0003 | 000F | 0103 | 0000 | 0000 | 0000 |
| 0000633560 | 0020 | 0000 | 0000 | 0000 | 0000 | 0000 | 0000 | 0000 |
| 0000633600 | 3C21 | 0000 | E110 | FFD1 | 0003 | 0008 | 0103 | 1B58 |
| 0000633620 | 0000 | 0000 | 0050 | 0000 | 0000 | 0000 | 0000 | 0000 |
| 0000633640 | 0000 | 0000 | 3C2D | 0000 | E160 | FFD1 | 0003 | 0008 |
| 0000633660 | 0103 | 1B58 | 0000 | 0000 | 0050 | 0000 | 0000 | 0000 |
| 0000633700 | 0000 | 0000 | 0000 | 0000 | 3C39 | 0000 | E1B0 | FFD1 |
| 0000633720 | 0003 | 0008 | 0103 | 1B58 | 0000 | 0000 | 0050 | 0000 |
| 0000633740 | 0000 | 0000 | 0000 | 0000 | 322E | 6638 | 6B61 | 0065 |
| 0000633760 | 0000 | 0000 | FFFE | 0008 | 010A | 0000 | 0000 | 0000 |
| 0000634000 | 0040 | 0000 | 0000 | 1C86 | 0000 | 0000 | 655F | 7272 |
| 0000634020 | 0000 | 0000 | 0000 | 0000 | FFFF | 000F | 0108 | 0000 |
| 0000634040 | 0000 | 0000 | 0020 | 0000 | 0000 | 0000 | 0000 | 0000 |
| 0000634060 | 665F | 6D72 | 0000 | 0000 | 0020 | 0000 | FFFF | 000F |
| 0000634100 | 0108 | 0000 | 0000 | 0000 | 0020 | 0000 | 0000 | 0000 |
| 0000634120 | 0000 | 0000 | 652E | 736F | 0000 | 0000 | 0000 | 0000 |
| 0000634140 | FFFE | 0008 | 0166 | 1C7E | 0000 | 0000 | 0040 | 0000 |
| 0000634160 | 0000 | 0000 | 0000 | 0000 | 6D5F | 6773 | 0000 | 0000 |
| 0000634200 | E200 | FFD1 | 0003 | 0008 | 0103 | 1C7E | 0000 | 0000 |
| 0000634220 | 0040 | 0000 | 0000 | 0000 | 0000 | 0000 | 0000 | 0000 |
| 0000634240 | 3C46 | 0000 | E240 | FFD1 | 0003 | 000A | 0103 | 19D0 |
| 0000634260 | 0000 | 0000 | 0001 | 0000 | 0000 | 0000 | 0000 | 0000 |
| 0000634300 | 322E | 6639 | 6B61 | 0065 | 0000 | 0000 | FFFE | 0008 |
| 0000634320 | 010A | 0000 | 0000 | 0000 | 0020 | 0000 | 0000 | 1C92 |
| 0000634340 | 0000 | 0000 | 0000 | 0000 | 3C55 | 0000 | 0000 | 0000 |
| 0000634360 | FFFF | 000D | 0108 | 0000 | 0000 | 0000 | 0010 | 0000 |
| 0000634400 | 0000 | 0000 | 0000 | 0000 | 6D5F | 646F | 0065 | 0000 |
| 0000634420 | 0010 | 0000 | FFFF | 000D | 0108 | 0000 | 0000 | 0000 |
| 0000634440 | 0010 | 0000 | 0000 | 0000 | 0000 | 0000 | 652E | 736F |
| 0000634460 | 0000 | 0000 | 0000 | 0000 | FFFE | 0008 | 0166 | 1C8A |
| 0000634500 | 0000 | 0000 | 0020 | 0000 | 0000 | 0000 | 0000 | 0000 |
| 0000634520 | 0000 | 0000 | 3C60 | 0000 | E250 | FFD1 | 0003 | 000D |
| 0000634540 | 0103 | 0000 | 0000 | 0000 | 0010 | 0000 | 0000 | 0000 |
| 0000634560 | 0000 | 0000 | 6D5F | 646F | 0065 | 0000 | E260 | FFD1 |
| 0000634600 | 0003 | 000D | 0103 | 0000 | 0000 | 0000 | 0010 | 0000 |
| 0000634620 | 0000 | 0000 | 0000 | 0000 | 705F | 7261 | 6D61 | 0073 |
| 0000634640 | E270 | FFD1 | 0003 | 0008 | 0103 | 1C8A | 0000 | 0000 |
| 0000634660 | 0020 | 0000 | 0000 | 0000 | 0000 | 0000 | 0000 | 0000 |
| 0000634700 | 3C6B | 0000 | E290 | FFD1 | 0003 | 000A | 0103 | 19D0 |
| 0000634720 | 0000 | 0000 | 0001 | 0000 | 0000 | 0000 | 0000 | 0000 |
| 0000634740 | 0000 | 0000 | 3C77 | 0000 | E2A0 | FFD1 | 0003 | 000A |
| 0000634760 | 0103 | 19D0 | 0000 | 0000 | 0001 | 0000 | 0000 | 0000 |

THU MAR 14 17:37:32 1991 GSPMON.4 PAGE 225, LINE 13217

| | | | | | | | | |
|---|---|---|---|---|---|---|---|---|
| 0000635000 | 0000 | 0000 | 0000 | 0000 | 3C83 | 0000 | AD60 | FFC4 |
| 0000635020 | 0001 | 0020 | 0102 | 0000 | 0000 | 0450 | 0000 | 1B64 |
| 0000635040 | 0001 | 1CA2 | 0000 | 0002 | 622E | 0066 | 0000 | 0000 |
| 0000635060 | AD60 | FFC4 | 0001 | 0000 | 0165 | 0000 | 0000 | 0141 |
| 0000635100 | 0000 | 0000 | 0000 | 02E6 | 0000 | 0000 | 652E | 0066 |
| 0000635120 | 0000 | 0000 | B1B0 | FFC4 | 0001 | 0000 | 0165 | 0000 |
| 0000635140 | 0000 | 0157 | 0000 | 0000 | 0000 | 0000 | 0000 | 0000 |
| 0000635160 | 0000 | 0000 | 3C92 | 0000 | B1B0 | FFC4 | 0001 | 0020 |
| 0000635200 | 0103 | 0000 | 0000 | 08B0 | 0000 | 1BB2 | 0001 | 1CA8 |
| 0000635220 | 0000 | 0002 | 622E | 0066 | 0000 | 0000 | B1B0 | FFC4 |
| 0000635240 | 0001 | 0000 | 0165 | 0000 | 0000 | 015D | 0000 | 0000 |
| 0000635260 | 0000 | 02EC | 0000 | 0000 | 652E | 0066 | 0000 | 0000 |
| 0000635300 | BA60 | FFC4 | 0001 | 0000 | 0165 | 0000 | 0000 | 018E |
| 0000635320 | 0000 | 0000 | 0000 | 0000 | 0000 | 0000 | 0000 | 0000 |
| 0000635340 | 3CA1 | 0000 | BA60 | FFC4 | 0001 | 0020 | 0103 | 0000 |
| 0000635360 | 0000 | 0010 | 0000 | 1C48 | 0001 | 1CAE | 0000 | 0000 |
| 0000635400 | 622E | 0066 | 0000 | 0000 | BA60 | FFC4 | 0001 | 0000 |
| 0000635420 | 0165 | 0000 | 0000 | 0194 | 0000 | 0000 | 0000 | 02F2 |
| 0000635440 | 0000 | 0000 | 652E | 0066 | 0000 | 0000 | BA70 | FFC4 |
| 0000635460 | 0001 | 0000 | 0165 | 0000 | 0000 | 0198 | 0000 | 0000 |
| 0000635500 | 0000 | 0000 | 0000 | 0000 | 0000 | 0000 | 3CAE | 0000 |
| 0000635520 | BA70 | FFC4 | 0001 | 0020 | 0102 | 0000 | 0000 | 01F0 |
| 0000635540 | 0000 | 1C4E | 0001 | 1CB6 | 0000 | 0003 | 622E | 0066 |
| 0000635560 | 0000 | 0000 | BA70 | FFC4 | 0001 | 0000 | 0165 | 0000 |
| 0000635600 | 0000 | 01AB | 0000 | 0000 | 0000 | 02FA | 0000 | 0000 |
| 0000635620 | 0000 | 0000 | 3CBF | 0000 | FFE0 | FFFF | FFFF | 0003 |
| 0000635640 | 0109 | 0000 | 0000 | 0000 | 0010 | 0000 | 0000 | 0000 |
| 0000635660 | 0000 | 0000 | 652E | 0066 | 0000 | 0000 | BC60 | FFC4 |
| 0000635700 | 0001 | 0000 | 0165 | 0000 | 0000 | 01B3 | 0000 | 0000 |
| 0000635720 | 0000 | 0000 | 0000 | 0000 | 0000 | 0000 | 3CCC | 0000 |
| 0000635740 | BC60 | FFC4 | 0001 | 0020 | 0103 | 0000 | 0000 | 0010 |
| 0000635760 | 0000 | 1C6C | 0001 | 1CBC | 0000 | 0000 | 622E | 0066 |
| 0000636000 | 0000 | 0000 | BC60 | FFC4 | 0001 | 0000 | 0165 | 0000 |
| 0000636020 | 0000 | 01B9 | 0000 | 0000 | 0000 | 0300 | 0000 | 0000 |
| 0000636040 | 652E | 0066 | 0000 | 0000 | BC70 | FFC4 | 0001 | 0000 |
| 0000636060 | 0165 | 0000 | 0000 | 01BC | 0000 | 0000 | 0000 | 0000 |
| 0000636100 | 0000 | 0000 | 0000 | 0000 | 3CDD | 0000 | BC70 | FFC4 |
| 0000636120 | 0001 | 0020 | 0103 | 0000 | 0000 | 0010 | 0000 | 1C72 |
| 0000636140 | 0001 | 1CC2 | 0000 | 0000 | 622E | 0066 | 0000 | 0000 |
| 0000636160 | BC70 | FFC4 | 0001 | 0000 | 0165 | 0000 | 0000 | 01C2 |
| 0000636200 | 0000 | 0000 | 0000 | 0306 | 0000 | 0000 | 652E | 0066 |
| 0000636220 | 0000 | 0000 | BC80 | FFC4 | 0001 | 0000 | 0165 | 0000 |
| 0000636240 | 0000 | 01C5 | 0000 | 0000 | 0000 | 0000 | 0000 | 0000 |
| 0000636260 | 0000 | 0000 | 3CEC | 0000 | BC80 | FFC4 | 0001 | 0020 |
| 0000636300 | 0102 | 0000 | 0000 | 0230 | 0000 | 1C78 | 0001 | 1CCA |
| 0000636320 | 0000 | 0003 | 622E | 0066 | 0000 | 0000 | BC80 | FFC4 |
| 0000636340 | 0001 | 0000 | 0165 | 0000 | 0000 | 01CA | 0000 | 0000 |
| 0000636360 | 0000 | 030E | 0000 | 0000 | 635F | 6E68 | 006C | 0000 |
| 0000636400 | FFE0 | FFFF | FFFF | 000D | 0109 | 0000 | 0000 | 0000 |
| 0000636420 | 0010 | 0000 | 0000 | 0000 | 0000 | 0000 | 652E | 0066 |
| 0000636440 | 0000 | 0000 | BEB0 | FFC4 | 0001 | 0000 | 0165 | 0000 |
| 0000636460 | 0000 | 01D2 | 0000 | 0000 | 0000 | 0000 | 0000 | 0000 |
| 0000636500 | 0000 | 0000 | 3CFC | 0000 | BEB0 | FFC4 | 0001 | 0020 |
| 0000636520 | 0103 | 0000 | 0000 | 0090 | 0000 | 1C96 | 0001 | 1CD0 |
| 0000636540 | 0000 | 0001 | 622E | 0066 | 0000 | 0000 | BEB0 | FFC4 |
| 0000636560 | 0001 | 0000 | 0165 | 0000 | 0000 | 01D8 | 0000 | 0000 |
| 0000636600 | 0000 | 0314 | 0000 | 0000 | 652E | 0066 | 0000 | 0000 |
| 0000636620 | BF40 | FFC4 | 0001 | 0000 | 0165 | 0000 | 0000 | 01DD |
| 0000636640 | 0000 | 0000 | 0000 | 0000 | 0000 | 0000 | 0000 | 0000 |

THU MAR 14 17:37:32 1991 GSPMON.4 PAGE 226, LINE 13276

| | | | | | | | | |
|---|---|---|---|---|---|---|---|---|
| 0000636660 | 3D0C | 0000 | BF40 | FFC4 | 0001 | 0020 | 0103 | 0000 |
| 0000636700 | 0000 | 0010 | 0000 | 1CA2 | 0001 | 1CD6 | 0000 | 0000 |
| 0000636720 | 622E | 0066 | 0000 | 0000 | BF40 | FFC4 | 0001 | 0000 |
| 0000636740 | 0165 | 0000 | 0000 | 01E3 | 0000 | 0000 | 0000 | 031A |
| 0000636760 | 0000 | 0000 | 652E | 0066 | 0000 | 0000 | BF50 | FFC4 |
| 0000637000 | 0001 | 0000 | 0165 | 0000 | 0000 | 01E7 | 0000 | 0000 |
| 0000637020 | 0000 | 0000 | 0000 | 0000 | 0000 | 0000 | 3D1A | 0000 |
| 0000637040 | BF50 | FFC4 | 0001 | 0020 | 0102 | 0000 | 0000 | 0540 |
| 0000637060 | 0000 | 1CA8 | 0001 | 1CDC | 0000 | 0002 | 622E | 0066 |
| 0000637100 | 0000 | 0000 | BF50 | FFC4 | 0001 | 0000 | 0165 | 0000 |
| 0000637120 | 0000 | 01F7 | 0000 | 0000 | 0000 | 0320 | 0000 | 0000 |
| 0000637140 | 652E | 0066 | 0000 | 0000 | C490 | FFC4 | 0001 | 0000 |
| 0000637160 | 0165 | 0000 | 0000 | 020D | 0000 | 0000 | 0000 | 0000 |
| 0000637200 | 0000 | 0000 | 0000 | 0000 | 3D2C | 0000 | C490 | FFC4 |
| 0000637220 | 0001 | 0020 | 0103 | 0000 | 0000 | 14B0 | 0000 | 1D08 |
| 0000637240 | 0001 | 1CE2 | 0000 | 0002 | 622E | 0066 | 0000 | 0000 |
| 0000637260 | C490 | FFC4 | 0001 | 0000 | 0165 | 0000 | 0000 | 0213 |
| 0000637300 | 0000 | 0000 | 0000 | 0326 | 0000 | 0000 | 652E | 0066 |
| 0000637320 | 0000 | 0000 | D940 | FFC4 | 0001 | 0000 | 0165 | 0000 |
| 0000637340 | 0000 | 0281 | 0000 | 0000 | 0000 | 0000 | 0000 | 0000 |
| 0000637360 | 0000 | 0000 | 3D3E | 0000 | D940 | FFC4 | 0001 | 0020 |
| 0000637400 | 0103 | 0000 | 0000 | 0850 | 0000 | 1E8E | 0001 | 1CE8 |
| 0000637420 | 0000 | 0002 | 622E | 0066 | 0000 | 0000 | D940 | FFC4 |
| 0000637440 | 0001 | 0000 | 0165 | 0000 | 0000 | 0287 | 0000 | 0000 |
| 0000637460 | 0000 | 032C | 0000 | 0000 | 652E | 0066 | 0000 | 0000 |
| 0000637500 | E190 | FFC4 | 0001 | 0000 | 0165 | 0000 | 0000 | 02B2 |
| 0000637520 | 0000 | 0000 | 0000 | 0000 | 0000 | 0000 | 0000 | 0000 |
| 0000637540 | 3D4E | 0000 | E190 | FFC4 | 0001 | 0020 | 0102 | 0000 |
| 0000637560 | 0000 | 05F0 | 0000 | 1F24 | 0001 | 1CF0 | 0000 | 0003 |
| 0000637600 | 622E | 0066 | 0000 | 0000 | E190 | FFC4 | 0001 | 0000 |
| 0000637620 | 0165 | 0000 | 0000 | 02C2 | 0000 | 0000 | 0000 | 0334 |
| 0000637640 | 0000 | 0000 | 0000 | 0000 | 3D60 | 0000 | FFE0 | FFFF |
| 0000637660 | FFFF | 0018 | 0109 | 1B06 | 0000 | 0000 | 0020 | 0000 |
| 0000637700 | 0000 | 0000 | 0000 | 0000 | 652E | 0066 | 0000 | 0000 |
| 0000637720 | E780 | FFC4 | 0001 | 0000 | 0165 | 0000 | 0000 | 02DF |
| 0000637740 | 0000 | 0000 | 0000 | 0000 | 0000 | 0000 | 0000 | 0000 |
| 0000637760 | 3D71 | 0000 | E780 | FFC4 | 0001 | 0020 | 0103 | 0000 |
| 0000640000 | 0000 | 07D0 | 0000 | 1F8A | 0001 | 1CF6 | 0000 | 0002 |
| 0000640020 | 622E | 0066 | 0000 | 0000 | E780 | FFC4 | 0001 | 0000 |
| 0000640040 | 0165 | 0000 | 0000 | 02E5 | 0000 | 0000 | 0000 | 033A |
| 0000640060 | 0000 | 0000 | 652E | 0066 | 0000 | 0000 | EF50 | FFC4 |
| 0000640100 | 0001 | 0000 | 0165 | 0000 | 0000 | 031D | 0000 | 0000 |
| 0000640120 | 0000 | 0000 | 0000 | 0000 | 0000 | 0000 | 3D83 | 0000 |
| 0000640140 | EF50 | FFC4 | 0001 | 0020 | 0103 | 0000 | 0000 | 05C0 |
| 0000640160 | 0000 | 2038 | 0001 | 1CFE | 0000 | 0003 | 622E | 0066 |
| 0000640200 | 0000 | 0000 | EF50 | FFC4 | 0001 | 0000 | 0165 | 0000 |
| 0000640220 | 0000 | 0323 | 0000 | 0000 | 0000 | 0342 | 0000 | 0000 |
| 0000640240 | 0000 | 0000 | 3D93 | 0000 | E2B0 | FFD1 | 0003 | 0008 |
| 0000640260 | 0103 | 1B24 | 0000 | 0000 | 0240 | 0000 | 0000 | 0000 |
| 0000640300 | 0000 | 0000 | 652E | 0066 | 0000 | 0000 | F510 | FFC4 |
| 0000640320 | 0001 | 0000 | 0165 | 0000 | 0000 | 0343 | 0000 | 0000 |
| 0000640340 | 0000 | 0000 | 0000 | 0000 | 0000 | 0000 | 3DA0 | 0000 |
| 0000640360 | F510 | FFC4 | 0001 | 0020 | 0102 | 0000 | 0000 | 0570 |
| 0000640400 | 0000 | 20A4 | 0001 | 1D04 | 0000 | 0002 | 622E | 0066 |
| 0000640420 | 0000 | 0000 | F510 | FFC4 | 0001 | 0000 | 0165 | 0000 |
| 0000640440 | 0000 | 0353 | 0000 | 0000 | 0000 | 0348 | 0000 | 0000 |
| 0000640460 | 652E | 0066 | 0000 | 0000 | FA80 | FFC4 | 0001 | 0000 |
| 0000640500 | 0165 | 0000 | 0000 | 036E | 0000 | 0000 | 0000 | 0000 |
| 0000640520 | 0000 | 0000 | 0000 | 0000 | 3DB6 | 0000 | FA80 | FFC4 |

THU MAR 14 17:37:32 1991 GSPMON.4 PAGE 227, LINE 13335

| | | | | | | | | |
|---|---|---|---|---|---|---|---|---|
| 0000640540 | 0001 | 0020 | 0103 | 0000 | 0000 | 0450 | 0000 | 2104 |
| 0000640560 | 0001 | 1D0A | 0000 | 0002 | 622E | 0066 | 0000 | 0000 |
| 0000640600 | FA80 | FFC4 | 0001 | 0000 | 0165 | 0000 | 0000 | 0374 |
| 0000640620 | 0000 | 0000 | 0000 | 034E | 0000 | 0000 | 652E | 0066 |
| 0000640640 | 0000 | 0000 | FED0 | FFC4 | 0001 | 0000 | 0165 | 0000 |
| 0000640660 | 0000 | 038D | 0000 | 0000 | 0000 | 0000 | 0000 | 0000 |
| 0000640700 | 0000 | 0000 | 3DCA | 0000 | FED0 | FFC4 | 0001 | 0020 |
| 0000640720 | 0102 | 0000 | 0000 | 0560 | 0000 | 2158 | 0001 | 1D14 |
| 0000640740 | 0000 | 0003 | 622E | 0066 | 0000 | 0000 | FED0 | FFC4 |
| 0000640760 | 0001 | 0000 | 0165 | 0000 | 0000 | 039C | 0000 | 0000 |
| 0000641000 | 0000 | 0358 | 0000 | 0000 | 0000 | 0000 | 3DDB | 0000 |
| 0000641020 | FFE0 | FFFF | FFFF | 0018 | 0109 | 1B06 | 0000 | 0000 |
| 0000641040 | 0020 | 0000 | 0000 | 0000 | 0000 | 0000 | 0000 | 0000 |
| 0000641060 | 3DEC | 0000 | FFC0 | FFFF | FFFF | 0018 | 0109 | 1B06 |
| 0000641100 | 0000 | 0000 | 0020 | 0000 | 0000 | 0000 | 0000 | 0000 |
| 0000641120 | 652E | 0066 | 0000 | 0000 | 0430 | FFC5 | 0001 | 0000 |
| 0000641140 | 0165 | 0000 | 0000 | 03B3 | 0000 | 0000 | 0000 | 0000 |
| 0000641160 | 0000 | 0000 | 0000 | 0000 | 3DFC | 0000 | 0430 | FFC5 |
| 0000641200 | 0001 | 0020 | 0103 | 0000 | 0000 | 07D0 | 0000 | 21B2 |
| 0000641220 | 0001 | 1D1A | 0000 | 0002 | 622E | 0066 | 0000 | 0000 |
| 0000641240 | 0430 | FFC5 | 0001 | 0000 | 0165 | 0000 | 0000 | 03B9 |
| 0000641260 | 0000 | 0000 | 0000 | 035E | 0000 | 0000 | 652E | 0066 |
| 0000641300 | 0000 | 0000 | 0C00 | FFC5 | 0001 | 0000 | 0165 | 0000 |
| 0000641320 | 0000 | 03F1 | 0000 | 0000 | 0000 | 0000 | 0000 | 0000 |
| 0000641340 | 0000 | 0000 | 3E0D | 0000 | 0C00 | FFC5 | 0001 | 0020 |
| 0000641360 | 0103 | 0000 | 0000 | 07B0 | 0000 | 2260 | 0001 | 1D22 |
| 0000641400 | 0000 | 0003 | 622E | 0066 | 0000 | 0000 | 0C00 | FFC5 |
| 0000641420 | 0001 | 0000 | 0165 | 0000 | 0000 | 03F7 | 0000 | 0000 |
| 0000641440 | 0000 | 0366 | 0000 | 0000 | 0000 | 0000 | 3E1C | 0000 |
| 0000641460 | E4F0 | FFD1 | 0003 | 0008 | 0103 | 1B36 | 0000 | 0000 |
| 0000641500 | 4080 | 0000 | 0000 | 0000 | 0000 | 0000 | 652E | 0066 |
| 0000641520 | 0000 | 0000 | 13B0 | FFC5 | 0001 | 0000 | 0165 | 0000 |
| 0000641540 | 0000 | 041E | 0000 | 0000 | 0000 | 0000 | 0000 | 0000 |
| 0000641560 | 0000 | 0000 | 3E28 | 0000 | 13B0 | FFC5 | 0001 | 0020 |
| 0000641600 | 0102 | 0000 | 0000 | 06E0 | 0000 | 22E4 | 0001 | 1D28 |
| 0000641620 | 0000 | 0002 | 622E | 0066 | 0000 | 0000 | 13B0 | FFC5 |
| 0000641640 | 0001 | 0000 | 0165 | 0000 | 0000 | 0431 | 0000 | 0000 |
| 0000641660 | 0000 | 036C | 0000 | 0000 | 652E | 0066 | 0000 | 0000 |
| 0000641700 | 1A90 | FFC5 | 0001 | 0000 | 0165 | 0000 | 0000 | 0452 |
| 0000641720 | 0000 | 0000 | 0000 | 0000 | 0000 | 0000 | 0000 | 0000 |
| 0000641740 | 3E39 | 0000 | 1A90 | FFC5 | 0001 | 0020 | 0103 | 0000 |
| 0000641760 | 0000 | 1EE0 | 0000 | 2374 | 0001 | 1D2E | 0000 | 0002 |
| 0000642000 | 622E | 0066 | 0000 | 0000 | 1A90 | FFC5 | 0001 | 0000 |
| 0000642020 | 0165 | 0000 | 0000 | 0458 | 0000 | 0000 | 0000 | 0372 |
| 0000642040 | 0000 | 0000 | 652E | 0066 | 0000 | 0000 | 3970 | FFC5 |
| 0000642060 | 0001 | 0000 | 0165 | 0000 | 0000 | 04F7 | 0000 | 0000 |
| 0000642100 | 0000 | 0000 | 0000 | 0000 | 0000 | 0000 | 3E4A | 0000 |
| 0000642120 | 3970 | FFC5 | 0001 | 0020 | 0103 | 0000 | 0000 | 1AC0 |
| 0000642140 | 0000 | 25A2 | 0001 | 1D40 | 0000 | 0004 | 622E | 0066 |
| 0000642160 | 0000 | 0000 | 3970 | FFC5 | 0001 | 0000 | 0165 | 0000 |
| 0000642200 | 0000 | 04FD | 0000 | 0000 | 0000 | 0384 | 0000 | 0000 |
| 0000642220 | 622E | 0062 | 0000 | 0000 | 4D90 | FFC5 | 0001 | 0000 |
| 0000642240 | 0164 | 0000 | 0000 | 005C | 0000 | 0000 | 0000 | 1D38 |
| 0000642260 | 0000 | 0000 | 0000 | 0000 | 3E59 | 0000 | 0000 | 0000 |
| 0000642300 | FFFF | 000D | 0101 | 0000 | 0000 | 0000 | 0010 | 0000 |
| 0000642320 | 0000 | 0000 | 0000 | 0000 | 652E | 0062 | 0000 | 0000 |
| 0000642340 | 5080 | FFC5 | 0001 | 0000 | 0164 | 0000 | 0000 | 0069 |
| 0000642360 | 0000 | 0000 | 0000 | 0000 | 0000 | 0000 | 622E | 0062 |
| 0000642400 | 0000 | 0000 | 50D0 | FFC5 | 0001 | 0000 | 0164 | 0000 |

THU MAR 14 17:37:32 1991 GSPMON.4 PAGE 228, LINE 13394

| | | | | | | | | |
|---|---|---|---|---|---|---|---|---|
| 0000642420 | 0000 | 006B | 0000 | 0000 | 0000 | 1D3E | 0000 | 0000 |
| 0000642440 | 0000 | 0000 | 3E63 | 0000 | 0000 | 0000 | FFFF | 000D |
| 0000642460 | 0101 | 0000 | 0000 | 0000 | 0010 | 0000 | 0000 | 0000 |
| 0000642500 | 0000 | 0000 | 652E | 0062 | 0000 | 0000 | 53F0 | FFC5 |
| 0000642520 | 0001 | 0000 | 0164 | 0000 | 0000 | 0078 | 0000 | 0000 |
| 0000642540 | 0000 | 0000 | 0000 | 0000 | 652E | 0066 | 0000 | 0000 |
| 0000642560 | 5430 | FFC5 | 0001 | 0000 | 0165 | 0000 | 0000 | 0579 |
| 0000642600 | 0000 | 0000 | 0000 | 0000 | 0000 | 0000 | 0000 | 0000 |
| 0000642620 | 3E6D | 0000 | 5430 | FFC5 | 0001 | 0020 | 0102 | 0000 |
| 0000642640 | 0000 | 0490 | 0000 | 2716 | 0001 | 1D46 | 0000 | 0002 |
| 0000642660 | 622E | 0066 | 0000 | 0000 | 5430 | FFC5 | 0001 | 0000 |
| 0000642700 | 0165 | 0000 | 0000 | 058B | 0000 | 0000 | 0000 | 038A |
| 0000642720 | 0000 | 0000 | 652E | 0066 | 0000 | 0000 | 58C0 | FFC5 |
| 0000642740 | 0001 | 0000 | 0165 | 0000 | 0000 | 05A1 | 0000 | 0000 |
| 0000642760 | 0000 | 0000 | 0000 | 0000 | 0000 | 0000 | 3E7F | 0000 |
| 0000643000 | 58C0 | FFC5 | 0001 | 0020 | 0103 | 0000 | 0000 | 0730 |
| 0000643020 | 0000 | 2764 | 0001 | 1D4C | 0000 | 0002 | 622E | 0066 |
| 0000643040 | 0000 | 0000 | 58C0 | FFC5 | 0001 | 0000 | 0165 | 0000 |
| 0000643060 | 0000 | 05A7 | 0000 | 0000 | 0000 | 0390 | 0000 | 0000 |
| 0000643100 | 652E | 0066 | 0000 | 0000 | 5FF0 | FFC5 | 0001 | 0000 |
| 0000643120 | 0165 | 0000 | 0000 | 05DE | 0000 | 0000 | 0000 | 0000 |
| 0000643140 | 0000 | 0000 | 0000 | 0000 | 3E91 | 0000 | 5FF0 | FFC5 |
| 0000643160 | 0001 | 0020 | 0103 | 0000 | 0000 | 0840 | 0000 | 280C |
| 0000643200 | 0001 | 1D54 | 0000 | 0002 | 622E | 0066 | 0000 | 0000 |
| 0000643220 | 5FF0 | FFC5 | 0001 | 0000 | 0165 | 0000 | 0000 | 05E4 |
| 0000643240 | 0000 | 0000 | 0000 | 0398 | 0000 | 0000 | 0000 | 0000 |
| 0000643260 | 3EA1 | 0000 | 2570 | FFD2 | 0003 | 0008 | 0103 | 1B24 |
| 0000643300 | 0000 | 0000 | 0240 | 0000 | 0000 | 0000 | 0000 | 0000 |
| 0000643320 | 652E | 0066 | 0000 | 0000 | 6830 | FFC5 | 0001 | 0000 |
| 0000643340 | 0165 | 0000 | 0000 | 0617 | 0000 | 0000 | 0000 | 0000 |
| 0000643360 | 0000 | 0000 | 0000 | 0000 | 3EB1 | 0000 | 6830 | FFC5 |
| 0000643400 | 0001 | 0020 | 0102 | 0000 | 0000 | 0490 | 0000 | 2890 |
| 0000643420 | 0001 | 1D5A | 0000 | 0002 | 622E | 0066 | 0000 | 0000 |
| 0000643440 | 6830 | FFC5 | 0001 | 0000 | 0165 | 0000 | 0000 | 0629 |
| 0000643460 | 0000 | 0000 | 0000 | 039E | 0000 | 0000 | 652E | 0066 |
| 0000643500 | 0000 | 0000 | 6CC0 | FFC5 | 0001 | 0000 | 0165 | 0000 |
| 0000643520 | 0000 | 063F | 0000 | 0000 | 0000 | 0000 | 0000 | 0000 |
| 0000643540 | 0000 | 0000 | 3EC7 | 0000 | 6CC0 | FFC5 | 0001 | 0020 |
| 0000643560 | 0103 | 0000 | 0000 | 0810 | 0000 | 28DE | 0001 | 1D68 |
| 0000643600 | 0000 | 0003 | 622E | 0066 | 0000 | 0000 | 6CC0 | FFC5 |
| 0000643620 | 0001 | 0000 | 0165 | 0000 | 0000 | 0645 | 0000 | 0000 |
| 0000643640 | 0000 | 03AC | 0000 | 0000 | 0000 | 0000 | 3EDB | 0000 |
| 0000643660 | 27B0 | FFD2 | 0003 | 0008 | 0103 | 1B4A | 0000 | 0000 |
| 0000643700 | 0130 | 0000 | 0000 | 0000 | 0000 | 0000 | 622E | 0062 |
| 0000643720 | 0000 | 0000 | 6D50 | FFC5 | 0001 | 0000 | 0164 | 0000 |
| 0000643740 | 0000 | 0006 | 0000 | 0000 | 0000 | 1D66 | 0000 | 0000 |
| 0000643760 | 695F | 0000 | 0000 | 0000 | 0000 | 0000 | FFFF | 000D |
| 0000644000 | 0101 | 0000 | 0000 | 0000 | 0010 | 0000 | 0000 | 0000 |
| 0000644020 | 0000 | 0000 | 652E | 0062 | 0000 | 0000 | 7120 | FFC5 |
| 0000644040 | 0001 | 0000 | 0164 | 0000 | 0000 | 001E | 0000 | 0000 |
| 0000644060 | 0000 | 0000 | 0000 | 0000 | 652E | 0066 | 0000 | 0000 |
| 0000644100 | 74D0 | FFC5 | 0001 | 0000 | 0165 | 0000 | 0000 | 0675 |
| 0000644120 | 0000 | 0000 | 0000 | 0000 | 0000 | 0000 | 0000 | 0000 |
| 0000644140 | 3EEF | 0000 | 74D0 | FFC5 | 0001 | 0020 | 0102 | 0000 |
| 0000644160 | 0000 | 05A0 | 0000 | 2950 | 0001 | 1D6E | 0000 | 0002 |
| 0000644200 | 622E | 0066 | 0000 | 0000 | 74D0 | FFC5 | 0001 | 0000 |
| 0000644220 | 0165 | 0000 | 0000 | 0683 | 0000 | 0000 | 0000 | 03B2 |
| 0000644240 | 0000 | 0000 | 652E | 0066 | 0000 | 0000 | 7A70 | FFC5 |
| 0000644260 | 0001 | 0000 | 0165 | 0000 | 0000 | 069D | 0000 | 0000 |

THU MAR 14 17:37:32 1991 GSPMON.4 PAGE 229, LINE 13453

| | | | | | | | | |
|---|---|---|---|---|---|---|---|---|
| 0000644300 | 0000 | 0000 | 0000 | 0000 | 0000 | 0000 | 3F00 | 0000 |
| 0000644320 | 7A70 | FFC5 | 0001 | 0020 | 0103 | 0000 | 0000 | 1310 |
| 0000644340 | 0000 | 29B6 | 0001 | 1D74 | 0000 | 0002 | 622E | 0066 |
| 0000644360 | 0000 | 000C | 7A70 | FFC5 | 0001 | 0000 | 0165 | 0000 |
| 0000644400 | 0000 | 06A3 | 0000 | 0000 | 0000 | 03B8 | 0000 | 0000 |
| 0000644420 | 652E | 0066 | 0000 | 0000 | 8D80 | FFC5 | 0001 | 0000 |
| 0000644440 | 0165 | 0000 | 0000 | 070C | 0000 | 0000 | 0000 | 0000 |
| 0000644460 | 0000 | 0000 | 0000 | 0000 | 3F11 | 0000 | 8D80 | FFC5 |
| 0000644500 | 0001 | 0020 | 0103 | 0000 | 0000 | 1790 | 0000 | 2B1E |
| 0000644520 | 0001 | 1D7C | 0000 | 0002 | 622E | 0066 | 0000 | 0000 |
| 0000644540 | 8D80 | FFC5 | 0001 | 0000 | 0165 | 0000 | 0000 | 0712 |
| 0000644560 | 0000 | 0000 | 0000 | 03C0 | 0000 | 0000 | 0000 | 0000 |
| 0000644600 | 3F20 | 0000 | 28E0 | FFD2 | 0003 | 0008 | 0103 | 1B36 |
| 0000644620 | 0000 | 0000 | 4080 | 0000 | 0000 | 0000 | 0000 | 0000 |
| 0000644640 | 652E | 0066 | 0000 | 0000 | A510 | FFC5 | 0001 | 0000 |
| 0000644660 | 0165 | 0000 | 0000 | 0783 | 0000 | 0000 | 0000 | 0000 |
| 0000644700 | 0000 | 0000 | 0000 | 0000 | 3F2F | 0000 | A510 | FFC5 |
| 0000644720 | 0001 | 0020 | 0103 | 0000 | 0000 | 1040 | 0000 | 2C6E |
| 0000644740 | 0001 | 1D96 | 0000 | 0004 | 622E | 0066 | 0000 | 0000 |
| 0000644760 | A510 | FFC5 | 0001 | 0000 | 0165 | 0000 | 0000 | 0791 |
| 0000645000 | 0000 | 0000 | 0000 | 03DA | 0000 | 0000 | 0000 | 0000 |
| 0000645020 | 3F42 | 0000 | FFE0 | FFFF | FFFF | 0018 | 0109 | 1B24 |
| 0000645040 | 0000 | 0000 | 0020 | 0000 | 0000 | 0000 | 0000 | 0000 |
| 0000645060 | 6A5F | 6D75 | 0070 | 0000 | 0000 | 0000 | FFFF | 000D |
| 0000645100 | 0101 | 0000 | 0000 | 0000 | 0010 | 0000 | 0000 | 0000 |
| 0000645120 | 0000 | 0000 | 735F | 6174 | 7472 | 0000 | 0010 | 0000 |
| 0000645140 | FFFF | 000D | 0101 | 0000 | 0000 | 0000 | 0010 | 0000 |
| 0000645160 | 0000 | 0000 | 0000 | 0000 | 655F | 646E | 0000 | 0000 |
| 0000645200 | 0020 | 000D | FFFF | 000D | 0101 | 0000 | 0000 | 0000 |
| 0000645220 | 0010 | 0000 | 0000 | 0000 | 0000 | 0000 | 0000 | 0000 |
| 0000645240 | 3F54 | 0000 | 0030 | 0000 | FFFF | 000D | 0101 | 0000 |
| 0000645260 | 0000 | 0000 | 0010 | 0000 | 0000 | 0000 | 0000 | 0000 |
| 0000645300 | 0000 | 0000 | 3F66 | 0000 | 0040 | 0000 | FFFF | 000F |
| 0000645320 | 0101 | 0000 | 0000 | 0000 | 0020 | 0000 | 0000 | 0000 |
| 0000645340 | 0000 | 0000 | 765F | 6C61 | 705F | 7274 | 0060 | 0000 |
| 0000645360 | FFFF | 001D | 0101 | 0000 | 0000 | 0000 | 0020 | 0000 |
| 0000645400 | 0000 | 0000 | 0000 | 0000 | 0000 | 0000 | 3F79 | 0000 |
| 0000645420 | 0080 | 0000 | FFFF | 001D | 0101 | 0000 | 0000 | 0000 |
| 0000645440 | 0020 | 0000 | 0000 | 0000 | 0000 | 0000 | 0000 | 0000 |
| 0000645460 | 3F84 | 0000 | 00A0 | 0000 | FFFF | 001D | 0101 | 0000 |
| 0000645500 | 0000 | 0000 | 0020 | 0000 | 0000 | 0000 | 0000 | 0000 |
| 0000645520 | 695F | 0000 | 0000 | 0000 | 00C0 | 0000 | FFFF | 0004 |
| 0000645540 | 0101 | 0000 | 0000 | 0000 | 0020 | 0000 | 0000 | 0000 |
| 0000645560 | 0000 | 0000 | 652E | 0066 | 0000 | 0000 | B550 | FFC5 |
| 0000645600 | 0001 | 0000 | 0165 | 0000 | 0000 | 07C7 | 0000 | 0000 |
| 0000645620 | 0000 | 0000 | 0000 | 0000 | 0000 | 0000 | 3F8E | 0000 |
| 0000645640 | B550 | FFC5 | 0001 | 0020 | 0103 | 0000 | 0000 | 1130 |
| 0000645660 | 0000 | 2CFE | 0001 | 1DBE | 0000 | 0004 | 622E | 0066 |
| 0000645700 | 0000 | 0000 | B550 | FFC5 | 0001 | 0000 | 0165 | 0000 |
| 0000645720 | 0000 | 07D8 | 0000 | 0000 | 0000 | 0402 | 0000 | 0000 |
| 0000645740 | 0000 | 0000 | 3FA0 | 0000 | FFE0 | FFFF | FFFF | 0018 |
| 0000645760 | 0109 | 1B4A | 0000 | 0000 | 0020 | 0000 | 0000 | 0000 |
| 0000646000 | 0000 | 0000 | 725F | 6365 | 5F74 | 0078 | 0000 | 0000 |
| 0000646020 | FFFF | 000D | 0101 | 0000 | 0000 | 0000 | 0010 | 0000 |
| 0000646040 | 0000 | 0000 | 0000 | 0000 | 725F | 6365 | 5F74 | 0079 |
| 0000646060 | 0010 | 0000 | FFFF | 000D | 0101 | 0000 | 0000 | 0000 |
| 0000646100 | 0010 | 0000 | 0000 | 0000 | 0000 | 0000 | 785F | 735F |
| 0000646120 | 6174 | 7472 | 0020 | 0000 | FFFF | 000D | 0101 | 0000 |
| 0000646140 | 0000 | 0000 | 0010 | 0000 | 0000 | 0000 | 0000 | 0000 |

THU MAR 14 17:37:32 1991 GSPMON.4 PAGE 230, LINE 13512

| | | | | | | | | |
|---|---|---|---|---|---|---|---|---|
| 0000646160 | 795F | 735F | 6174 | 7472 | 0030 | 0000 | FFFF | 000D |
| 0000646200 | 0101 | 0000 | 0000 | 0000 | 0010 | 0000 | 0000 | 0000 |
| 0000646220 | 0000 | 0000 | 785F | 655F | 656C | 736D | 0040 | 0000 |
| 0000646240 | FFFF | 000D | 0101 | 0000 | 0000 | 0000 | 0010 | 0000 |
| 0000646260 | 0000 | 0000 | 0000 | 0000 | 795F | 655F | 656C | 736D |
| 0000646300 | 0050 | 0000 | FFFF | 000D | 0101 | 0000 | 0000 | 0000 |
| 0000646320 | 0010 | 0000 | 0000 | 0000 | 0000 | 0000 | 745F | 706D |
| 0000646340 | 6A5F | 706D | 0060 | 0000 | FFFF | 000D | 0101 | 0000 |
| 0000646360 | 0000 | 0000 | 0010 | 0000 | 0000 | 0000 | 0000 | 0000 |
| 0000646400 | 765F | 6C61 | 705F | 7274 | 0070 | 0000 | FFFF | 001D |
| 0000646420 | 0101 | 0000 | 0000 | 0000 | 0020 | 0000 | 0000 | 0000 |
| 0000646440 | 0000 | 0000 | 0000 | 0000 | 3FB0 | 0000 | 0090 | 0000 |
| 0000646460 | FFFF | 001D | 0101 | 0000 | 0000 | 0000 | 0020 | 0000 |
| 0000646500 | 0000 | 0000 | 0000 | 0000 | 0000 | 0000 | 3FBB | 0000 |
| 0000646520 | 00B0 | 0000 | FFFF | 000F | 0101 | 0000 | 0000 | 0000 |
| 0000646540 | 0020 | 0000 | 0000 | 0000 | 0000 | 0000 | 0000 | 0000 |
| 0000646560 | 3FC7 | 0000 | 00D0 | 0000 | FFFF | 000F | 0101 | 0000 |
| 0000646600 | 0000 | 0000 | 0020 | 0000 | 0000 | 0000 | 0000 | 0000 |
| 0000646620 | 0000 | 0000 | 3FD3 | 0000 | 00F0 | 0000 | FFFF | 000F |
| 0000646640 | 0101 | 0000 | 0000 | 0000 | 0020 | 0000 | 0000 | 0000 |
| 0000646660 | 0000 | 0000 | 0000 | 0000 | 3FE5 | 0000 | 0110 | 0000 |
| 0000646700 | FFFF | 000F | 0101 | 0000 | 0000 | 0000 | 0020 | 0000 |
| 0000646720 | 0000 | 0000 | 0000 | 0000 | 695F | 0000 | 0000 | 0000 |
| 0000646740 | 0130 | 0000 | FFFF | 000D | 0101 | 0000 | 0000 | 0000 |
| 0000646760 | 0010 | 0000 | 0000 | 0000 | 0000 | 0000 | 6A5F | 0000 |
| 0000647000 | 0000 | 0000 | 0140 | 0000 | FFFF | 000D | 0101 | 0000 |
| 0000647020 | 0000 | 0000 | 0010 | 0000 | 0000 | 0000 | 0000 | 0000 |
| 0000647040 | 6B5F | 0000 | 0000 | 0000 | 0150 | 0000 | FFFF | 000D |
| 0000647060 | 0101 | 0000 | 0000 | 0000 | 0010 | 0000 | 0000 | 0000 |
| 0000647100 | 0000 | 0000 | 652E | 0066 | 0000 | 0000 | C680 | FFC5 |
| 0000647120 | 0001 | 0000 | 0165 | 0000 | 0000 | 0824 | 0000 | 0000 |
| 0000647140 | 0000 | 0000 | 0000 | 0000 | 0000 | 0000 | 3FF9 | 0000 |
| 0000647160 | C680 | FFC5 | 0001 | 0020 | 0103 | 0000 | 0000 | 1C20 |
| 0000647200 | 0000 | 2DBE | 0001 | 1DD6 | 0000 | 0004 | 622E | 0066 |
| 0000647220 | 0000 | 0000 | C680 | FFC5 | 0001 | 0000 | 0165 | 0000 |
| 0000647240 | 0000 | 0832 | 0000 | 0000 | 0000 | 041A | 0000 | 0000 |
| 0000647260 | 735F | 6769 | 705F | 7274 | FFE0 | FFFF | FFFF | 0018 |
| 0000647300 | 0109 | 1B36 | 0000 | 0000 | 0020 | 0000 | 0000 | 0000 |
| 0000647320 | 0000 | 0000 | 765F | 6C61 | 705F | 7274 | 0000 | 0000 |
| 0000647340 | FFFF | 001D | 0101 | 0000 | 0000 | 0000 | 0020 | 0000 |
| 0000647360 | 0000 | 0000 | 0000 | 0000 | 0000 | 0000 | 400C | 0000 |
| 0000647400 | 0020 | 0000 | FFFF | 000F | 0101 | 0000 | 0000 | 0000 |
| 0000647420 | 0020 | 0000 | 0000 | 0000 | 0000 | 0000 | 0000 | 0000 |
| 0000647440 | 4018 | 0000 | 0040 | 0000 | FFFF | 000F | 0101 | 0000 |
| 0000647460 | 0000 | 0000 | 0020 | 0000 | 0000 | 0000 | 0000 | 0000 |
| 0000647500 | 0000 | 0000 | 4024 | 0000 | 0060 | 0000 | FFFF | 000F |
| 0000647520 | 0101 | 0000 | 0000 | 0000 | 0020 | 0000 | 0000 | 0000 |
| 0000647540 | 0000 | 0000 | 0000 | 0000 | 4036 | 0000 | 0080 | 0000 |
| 0000647560 | FFFF | 000F | 0101 | 0000 | 0000 | 0000 | 0020 | 0000 |
| 0000647600 | 0000 | 0000 | 0000 | 0000 | 695F | 0000 | 0000 | 0000 |
| 0000647620 | 00A0 | 0000 | FFFF | 000F | 0101 | 0000 | 0000 | 0000 |
| 0000647640 | 0020 | 0000 | 0000 | 0000 | 0000 | 0000 | 6A5F | 0000 |
| 0000647660 | 0000 | 0000 | 00C0 | 0000 | FFFF | 000F | 0101 | 0000 |
| 0000647700 | 0000 | 0000 | 0020 | 0000 | 0000 | 0000 | 0000 | 0000 |
| 0000647720 | 6B5F | 0000 | 0000 | 0000 | 00E0 | 0000 | FFFF | 000F |
| 0000647740 | 0101 | 0000 | 0000 | 0000 | 0020 | 0000 | 0000 | 0000 |
| 0000647760 | 0000 | 0000 | 652E | 0066 | 0000 | 0000 | E2A0 | FFC5 |
| 0000650000 | 0001 | 0000 | 0165 | 0000 | 0000 | 086E | 0000 | 0000 |
| 0000650020 | 0000 | 0000 | 0000 | 0000 | 635F | 6B68 | 7573 | 006D |

THU MAR 14 17:37:32 1991 GSPMON.4 PAGE 231, LINE 13571

| | | | | | | | | |
|---|---|---|---|---|---|---|---|---|
| 0000650040 | E2A0 | FFC5 | 0001 | 002D | 0103 | 0000 | 0000 | 07B0 |
| 0000650060 | 0000 | 2E8A | 0001 | 1DE0 | 0000 | 0003 | 622E | 0066 |
| 0000650100 | 0000 | 0000 | E2A0 | FFC5 | 0001 | 0000 | 0165 | 0000 |
| 0000650120 | 0000 | 0874 | 0000 | 0000 | 0000 | 0424 | 0000 | 0000 |
| 0000650140 | 655F | 646E | 705F | 7274 | FFE0 | FFFF | FFFF | 001D |
| 0000650160 | 0109 | 0000 | 0000 | 0000 | 0020 | 0000 | 0000 | 0000 |
| 0000650200 | 0000 | 0000 | 0000 | 0000 | 404A | 0000 | FFC0 | FFFF |
| 0000650220 | FFFF | 001D | 0109 | 0000 | 0000 | 0000 | 0020 | 0000 |
| 0000650240 | 0000 | 0000 | 0000 | 0000 | 652E | 0066 | 0000 | 0000 |
| 0000650260 | EA50 | FFC5 | 0001 | 0000 | 0165 | 0000 | 0000 | 0885 |
| 0000650300 | 0000 | 0000 | 0000 | 0000 | 0000 | 0000 | 0000 | 0000 |
| 0000650320 | 4055 | 0000 | EA50 | FFC5 | 0001 | 002A | 0103 | 19D0 |
| 0000650340 | 0000 | 02D0 | 0000 | 2EAE | 0001 | 1DEC | 0000 | 0004 |
| 0000650360 | 622E | 0066 | 0000 | 0000 | EA50 | FFC5 | 0001 | 0000 |
| 0000650400 | 0165 | 0000 | 0000 | 0893 | 0000 | 0000 | 0000 | 0430 |
| 0000650420 | 0000 | 0000 | 0000 | 0000 | 4069 | 0000 | FFE0 | FFFF |
| 0000650440 | FFFF | 0018 | 0109 | 1B24 | 0000 | 0000 | 0020 | 0000 |
| 0000650460 | 0000 | 0000 | 0000 | 0000 | 0000 | 0000 | 4076 | 0000 |
| 0000650500 | FFC0 | FFFF | FFFF | 0018 | 0109 | 1B24 | 0000 | 0000 |
| 0000650520 | 0020 | 0000 | 0000 | 0000 | 0000 | 0000 | 695F | 0000 |
| 0000650540 | 0000 | 0000 | 0000 | 0000 | FFFF | 000D | 0101 | 0000 |
| 0000650560 | 0000 | 0000 | 0010 | 0000 | 0000 | 0000 | 0000 | 0000 |
| 0000650600 | 652E | 0066 | 0000 | 0000 | ED20 | FFC5 | 0001 | 0000 |
| 0000650620 | 0165 | 0000 | 0000 | 08A1 | 0000 | 0000 | 0000 | 0000 |
| 0000650640 | 0000 | 0000 | 0000 | 0000 | 4083 | 0000 | ED20 | FFC5 |
| 0000650660 | 0001 | 002A | 0103 | 19D0 | 0000 | 03C0 | 0000 | 2ED2 |
| 0000650700 | 0001 | 1DFA | 0000 | 0005 | 622E | 0066 | 0000 | 0000 |
| 0000650720 | ED20 | FFC5 | 0001 | 0000 | 0165 | 0000 | 0000 | 08AF |
| 0000650740 | 0000 | 0000 | 0000 | 043E | 0000 | 0000 | 0000 | 0000 |
| 0000650760 | 409A | 0000 | FFE0 | FFFF | FFFF | 0018 | 0109 | 1B4A |
| 0000651000 | 0000 | 000C | 0020 | 0000 | 0000 | 0000 | 0000 | 0000 |
| 0000651020 | 0000 | 0000 | 40AA | 0000 | FFC0 | FFFF | FFFF | 0018 |
| 0000651040 | 0109 | 1B4A | 0000 | 0000 | 0020 | 0000 | 0000 | 0000 |
| 0000651060 | 0000 | 0000 | 695F | 0000 | 0000 | 0000 | 0000 | 0000 |
| 0000651100 | FFFF | 000D | 0101 | 0000 | 0000 | 0000 | 0010 | 0000 |
| 0000651120 | 0000 | 0000 | 0000 | 0000 | 6A5F | 0000 | 0000 | 0000 |
| 0000651140 | 0010 | 0000 | FFFF | 000D | 0101 | 0000 | 0000 | 0000 |
| 0000651160 | 0010 | 0000 | 0000 | 0000 | 0000 | 0000 | 652E | 0066 |
| 0000651200 | 0000 | 0000 | F0E0 | FFC5 | 0001 | 0000 | 0165 | 0000 |
| 0000651220 | 0000 | 08C0 | 0000 | 0000 | 0000 | 0000 | 0000 | 0000 |
| 0000651240 | 0000 | 0000 | 40BA | 0000 | F0E0 | FFC5 | 0001 | 002A |
| 0000651260 | 0103 | 19D0 | 0000 | 05A0 | 0000 | 2F02 | 0001 | 1E0A |
| 0000651300 | 0000 | 0004 | 622E | 0066 | 0000 | 0000 | F0E0 | FFC5 |
| 0000651320 | 0001 | 0000 | 0165 | 0000 | 0000 | 08CE | 0000 | 0000 |
| 0000651340 | 0000 | 044E | 0000 | 0000 | 0000 | 0000 | 40CC | 0000 |
| 0000651360 | FFE0 | FFFF | FFFF | 0018 | 0109 | 1B36 | 0000 | 0000 |
| 0000651400 | 0020 | 0000 | 0000 | 0000 | 0000 | 0000 | 0000 | 0000 |
| 0000651420 | 40D7 | 0000 | FFC0 | FFFF | FFFF | 0018 | 0109 | 1B36 |
| 0000651440 | 0000 | 0000 | 0020 | 0000 | 0000 | 0000 | 0000 | 0000 |
| 0000651460 | 695F | 0000 | 0000 | 0000 | 0000 | 0000 | FFFF | 000D |
| 0000651500 | 0101 | 0000 | 0000 | 0000 | 0010 | 0000 | 0000 | 0000 |
| 0000651520 | 0000 | 0000 | 6A5F | 0000 | 0000 | 0000 | 0010 | 0000 |
| 0000651540 | FFFF | 000D | 0101 | 0000 | 0000 | 0000 | 0010 | 0000 |
| 0000651560 | 0000 | 0000 | 0000 | 0000 | 0000 | 0000 | 40E2 | 0000 |
| 0000651600 | 0020 | 0000 | FFFF | 000D | 0101 | 0000 | 0000 | 0000 |
| 0000651620 | 0010 | 0000 | 0000 | 0000 | 0000 | 0000 | 652E | 0066 |
| 0000651640 | 0000 | 0000 | F680 | FFC5 | 0001 | 0000 | 0165 | 0000 |
| 0000651660 | 0000 | 08E1 | 0000 | 0000 | 0000 | 0000 | 0000 | 0000 |
| 0000651700 | 0000 | 0000 | 40F1 | 0000 | F680 | FFC5 | 0001 | 0024 |

THU MAR 14 17:37:32 1991 GSPMON.4 PAGE 232, LINE 13630

| | | | | | | | | |
|---|---|---|---|---|---|---|---|---|
| 0000651720 | 0102 | 0000 | 0000 | 0120 | 0000 | 2F44 | 0001 | 1E14 |
| 0000651740 | 0000 | 0003 | 622E | 0066 | 0000 | 0000 | F680 | FFC5 |
| 0000651760 | 0001 | 0000 | 0165 | 0000 | 0000 | 08F6 | 0000 | 0000 |
| 0000652000 | 0000 | 0458 | 0000 | 0000 | 695F | 5F6E | 7470 | 0072 |
| 0000652020 | FFE0 | FFFF | FFFF | 0010 | 0109 | 0000 | 0000 | 0000 |
| 0000652040 | 0020 | 0000 | 0000 | 0000 | 0000 | 0000 | 6F5F | 7475 |
| 0000652060 | 705F | 7274 | FFC0 | FFFF | FFFF | 0010 | 0109 | 0000 |
| 0000652100 | 0000 | 0000 | 0020 | 0000 | 0000 | 0000 | 0000 | 0000 |
| 0000652120 | 652E | 0066 | 0000 | 0000 | F7A0 | FFC5 | 0001 | 0000 |
| 0000652140 | 0165 | 0000 | 0000 | 08FE | 0000 | 0000 | 0000 | 0000 |
| 0000652160 | 0000 | 0000 | 0000 | 0000 | 4104 | 0000 | F7A0 | FFC5 |
| 0000652200 | 0001 | 0024 | 0102 | 0000 | 0000 | 0290 | 0000 | 2F5C |
| 0000652220 | 0001 | 1E20 | 0000 | 0004 | 622E | 0066 | 0000 | 0000 |
| 0000652240 | F7A0 | FFC5 | 0001 | 0000 | 0165 | 0000 | 0000 | 0913 |
| 0000652260 | 0000 | 0000 | 0000 | 0464 | 0000 | 0000 | 695F | 5F6E |
| 0000652300 | 7470 | 0072 | FFE0 | FFFF | FFFF | 0010 | 0109 | 0000 |
| 0000652320 | 0000 | 0000 | 0020 | 0000 | 0000 | 0000 | 0000 | 0000 |
| 0000652340 | 6F5F | 7475 | 705F | 7274 | FFC0 | FFFF | FFFF | 0010 |
| 0000652360 | 0109 | 0000 | 0000 | 0000 | 0020 | 0000 | 0000 | 0000 |
| 0000652400 | 0000 | 0000 | 0000 | 0000 | 4115 | 0000 | 6960 | FFD2 |
| 0000652420 | 0003 | 0008 | 0103 | 1B06 | 0000 | 0000 | 0040 | 0000 |
| 0000652440 | 0000 | 0000 | 0000 | 0000 | 652E | 0066 | 0000 | 0000 |
| 0000652460 | FA30 | FFC5 | 0001 | 0000 | 0165 | 0000 | 0000 | 0920 |
| 0000652500 | 0000 | 0000 | 0000 | 0000 | 0000 | 0000 | 0000 | 0000 |
| 0000652520 | 4122 | 0000 | FA30 | FFC5 | 0001 | 0024 | 0102 | 0000 |
| 0000652540 | 0000 | 0190 | 0000 | 2F86 | 0001 | 1E2A | 0000 | 0002 |
| 0000652560 | 622E | 0066 | 0000 | 0000 | FA30 | FFC5 | 0001 | 0000 |
| 0000652600 | 0165 | 0000 | 0000 | 0930 | 0000 | 0000 | 0000 | 046E |
| 0000652620 | 0000 | 0000 | 695F | 5F6E | 7470 | 0072 | FFE0 | FFFF |
| 0000652640 | FFFF | 0010 | 0109 | 0000 | 0000 | 0000 | 0020 | 0000 |
| 0000652660 | 0000 | 0000 | 0000 | 0000 | 6F5F | 7475 | 705F | 7274 |
| 0000652700 | FFC0 | FFFF | FFFF | 0010 | 0109 | 0000 | 0000 | 0000 |
| 0000652720 | 0020 | 0000 | 0000 | 0000 | 0000 | 0000 | 652E | 0066 |
| 0000652740 | 0000 | 0000 | FBC0 | FFC5 | 0001 | 0000 | 0165 | 0000 |
| 0000652760 | 0000 | 0938 | 0000 | 0000 | 0000 | 0000 | 0000 | 0000 |
| 0000653000 | 0000 | 0000 | 413B | 0000 | FBC0 | FFC5 | 0001 | 0024 |
| 0000653020 | 0102 | 0000 | 0000 | 0490 | 0000 | 2F9E | 0001 | 1E38 |
| 0000653040 | 0000 | 0004 | 622E | 0066 | 0000 | 0000 | FBC0 | FFC5 |
| 0000653060 | 0001 | 0000 | 0165 | 0000 | 0000 | 0948 | 0000 | 0000 |
| 0000653100 | 0000 | 047C | 0000 | 0000 | 695F | 5F6E | 7470 | 0072 |
| 0000653120 | FFE0 | FFFF | FFFF | 0010 | 0109 | 0000 | 0000 | 0000 |
| 0000653140 | 0020 | 0000 | 0000 | 0000 | 0000 | 0000 | 6F5F | 7475 |
| 0000653160 | 705F | 7274 | FFC0 | FFFF | FFFF | 0010 | 0109 | 0000 |
| 0000653200 | 0000 | 0000 | 0020 | 0000 | 0000 | 0000 | 0000 | 0000 |
| 0000653220 | 0000 | 0000 | 414B | 0000 | 69A0 | FFD2 | 0003 | 0008 |
| 0000653240 | 0103 | 1B06 | 0000 | 0000 | 0040 | 0000 | 0000 | 0000 |
| 0000653260 | 0000 | 0000 | 0000 | 0000 | 4158 | 0000 | 69E0 | FFD2 |
| 0000653300 | 0003 | 0008 | 0103 | 1B06 | 0000 | 0000 | 0040 | 0000 |
| 0000653320 | 0000 | 0000 | 0000 | 0000 | 652E | 0066 | 0000 | 0000 |
| 0000653340 | 0050 | FFC6 | 0001 | 0000 | 0165 | 0000 | 0000 | 095A |
| 0000653360 | 0000 | 0000 | 0000 | 0000 | 0000 | 0000 | 0000 | 0000 |
| 0000653400 | 4164 | 0000 | 0050 | FFC6 | 0001 | 0024 | 0102 | 0000 |
| 0000653420 | 0000 | 01A0 | 0000 | 2FE0 | 0001 | 1E42 | 0000 | 0003 |
| 0000653440 | 622E | 0066 | 0000 | 0000 | 0050 | FFC6 | 0001 | 0000 |
| 0000653460 | 0165 | 0000 | 0000 | 0972 | 0000 | 0000 | 0000 | 0486 |
| 0000653500 | 0000 | 0000 | 695F | 5F6E | 7470 | 0072 | FFE0 | FFFF |
| 0000653520 | FFFF | 0010 | 0109 | 0000 | 0000 | 0000 | 0020 | 0000 |
| 0000653540 | 0000 | 0000 | 0000 | 0000 | 6F5F | 7475 | 705F | 7274 |
| 0000653560 | FFC0 | FFFF | FFFF | 0010 | 0109 | 0000 | 0000 | 0000 |

THU MAR 14 17:37:32 1991 GSPMON.4 PAGE 233, LINE 13689

| | | | | | | | | |
|---|---|---|---|---|---|---|---|---|
| 0000653600 | 0020 | 0000 | 0000 | 0000 | 0000 | 0000 | 652E | 0066 |
| 0000653620 | 0000 | 0000 | 01F0 | FFC6 | 0001 | 0000 | 0165 | 0000 |
| 0000653640 | 0000 | 097B | 0000 | 0000 | 0000 | 0000 | 0000 | 0000 |
| 0000653660 | 0000 | 0000 | 4176 | 0000 | 01F0 | FFC6 | 0001 | 0024 |
| 0000653700 | 0102 | 0000 | 0000 | 0140 | 0000 | 2FFE | 0001 | 1E4C |
| 0000653720 | 0000 | 0003 | 622E | 0066 | 0000 | 0000 | 01F0 | FFC6 |
| 0000653740 | 0001 | 0000 | 0165 | 0000 | 0000 | 0989 | 0000 | 0000 |
| 0000653760 | 0000 | 0490 | 0000 | 0000 | 695F | 5F6E | 7470 | 0072 |
| 0000654000 | FFE0 | FFFF | FFFF | 0010 | 0109 | 0000 | 0000 | 0000 |
| 0000654020 | 0020 | 0000 | 0000 | 0000 | 0000 | 0000 | 6F5F | 7475 |
| 0000654040 | 705F | 7274 | FFC0 | FFFF | FFFF | 0010 | 0109 | 0000 |
| 0000654060 | 0000 | 0000 | 0020 | 0000 | 0000 | 0000 | 0000 | 0000 |
| 0000654100 | 652E | 0066 | 0000 | 0000 | 0330 | FFC6 | 0001 | 0000 |
| 0000654120 | 0165 | 0000 | 0000 | 0991 | 0000 | 0000 | 0000 | 0000 |
| 0000654140 | 0000 | 0000 | 0000 | 0000 | 4186 | 0000 | 0330 | FFC6 |
| 0000654160 | 0001 | 0024 | 0102 | 0000 | 0000 | 0140 | 0000 | 3016 |
| 0000654200 | 0001 | 1E56 | 0000 | 0003 | 622E | 0066 | 0000 | 0000 |
| 0000654220 | 0330 | FFC6 | 0001 | 0000 | 0165 | 0000 | 0000 | 099F |
| 0000654240 | 0000 | 0000 | 0000 | 049A | 0000 | 0000 | 695F | 5F6E |
| 0000654260 | 7470 | 0072 | FFE0 | FFFF | FFFF | 0010 | 0109 | 0000 |
| 0000654300 | 0000 | 0000 | 0020 | 0000 | 0000 | 0000 | 0000 | 0000 |
| 0000654320 | 6F5F | 7475 | 705F | 7274 | FFC0 | FFFF | FFFF | 0010 |
| 0000654340 | 0109 | 0000 | 0000 | 0000 | 0020 | 0000 | 0000 | 0000 |
| 0000654360 | 0000 | 0000 | 652E | 0066 | 0000 | 0000 | 0470 | FFC6 |
| 0000654400 | 0001 | 0000 | 0165 | 0000 | 0000 | 09A7 | 0000 | 0000 |
| 0000654420 | 0000 | 0000 | 0000 | 0000 | 0000 | 0000 | 419E | 0000 |
| 0000654440 | 0470 | FFC6 | 0001 | 0024 | 0102 | 0000 | 0000 | 01A0 |
| 0000654460 | 0000 | 302E | 0001 | 1E60 | 0000 | 0003 | 622E | 0066 |
| 0000654500 | 0000 | 0000 | 0470 | FFC6 | 0001 | 0000 | 0165 | 0000 |
| 0000654520 | 0000 | 09C1 | 0000 | 0000 | 0000 | 04A4 | 0000 | 0000 |
| 0000654540 | 695F | 5F6E | 7470 | 0072 | FFE0 | FFFF | FFFF | 0010 |
| 0000654560 | 0109 | 0000 | 0000 | 0000 | 0020 | 0000 | 0000 | 0000 |
| 0000654600 | 0000 | 0000 | 6F5F | 7475 | 705F | 7274 | FFC0 | FFFF |
| 0000654620 | FFFF | 0010 | 0109 | 0000 | 0000 | 0000 | 0020 | 0000 |
| 0000654640 | 0000 | 0000 | 0000 | 0000 | 652E | 0066 | 0000 | 0000 |
| 0000654660 | 0610 | FFC6 | 0001 | 0000 | 0165 | 0000 | 0000 | 09CA |
| 0000654700 | 0000 | 0000 | 0000 | 0000 | 0000 | 0000 | 0000 | 0000 |
| 0000654720 | 41AD | 0000 | 0610 | FFC6 | 0001 | 0024 | 0102 | 0000 |
| 0000654740 | 0000 | 00F0 | 0000 | 304C | 0001 | 1E6A | 0000 | 0003 |
| 0000654760 | 622E | 0066 | 0000 | 0000 | 0610 | FFC6 | 0001 | 0000 |
| 0000655000 | 0165 | 0000 | 0000 | 09D8 | 0000 | 0000 | 0000 | 04AE |
| 0000655020 | 0000 | 0000 | 695F | 5F6E | 7470 | 0072 | FFE0 | FFFF |
| 0000655040 | FFFF | 0010 | 0109 | 0000 | 0000 | 0000 | 0020 | 0000 |
| 0000655060 | 0000 | 0000 | 0000 | 0000 | 6F5F | 7475 | 705F | 7274 |
| 0000655100 | FFC0 | FFFF | FFFF | 0010 | 0109 | 0000 | 0000 | 0000 |
| 0000655120 | 0020 | 0000 | 0000 | 0000 | 0000 | 0000 | 652E | 0066 |
| 0000655140 | 0000 | 0000 | 0700 | FFC6 | 0001 | 0000 | 0165 | 0000 |
| 0000655160 | 0000 | 09DF | 0000 | 0000 | 0000 | 0000 | 0000 | 0000 |
| 0000655200 | 0000 | 0000 | 41C0 | 0000 | 0700 | FFC6 | 0001 | 0024 |
| 0000655220 | 0102 | 0000 | 0000 | 00F0 | 0000 | 305E | 0001 | 1E74 |
| 0000655240 | 0000 | 0003 | 622E | 0066 | 0000 | 0000 | 0700 | FFC6 |
| 0000655260 | 0001 | 0000 | 0165 | 0000 | 0000 | 09ED | 0000 | 0000 |
| 0000655300 | 0000 | 04B8 | 0000 | 0000 | 695F | 5F6E | 7470 | 0072 |
| 0000655320 | FFE0 | FFFF | FFFF | 0010 | 0109 | 0000 | 0000 | 0000 |
| 0000655340 | 0020 | 0000 | 0000 | 0000 | 0000 | 0000 | 6F5F | 7475 |
| 0000655360 | 705F | 7274 | FFC0 | FFFF | FFFF | 0010 | 0109 | 0000 |
| 0000655400 | 0000 | 0000 | 0020 | 0000 | 0000 | 0000 | 0000 | 0000 |
| 0000655420 | 652E | 0066 | 0000 | 0000 | 07F0 | FFC6 | 0001 | 0000 |
| 0000655440 | 0165 | 0000 | 0000 | 09F4 | 0000 | 0000 | 0000 | 0000 |

THU MAR 14 17:37:32 1991 GSPMON.4 PAGE 234, LINE 13748

| | | | | | | | | |
|---|---|---|---|---|---|---|---|---|
| 0000655460 | 0000 | 0000 | 0000 | 0000 | 41D5 | 0000 | 07F0 | FFC6 |
| 0000655500 | 0001 | 0024 | 0102 | 0000 | 0000 | 00F0 | 0000 | 3070 |
| 0000655520 | 0001 | 1E7E | 0000 | 0003 | 622E | 0066 | 0000 | 0000 |
| 0000655540 | 07F0 | FFC6 | 0001 | 0000 | 0165 | 0000 | 0000 | 0A02 |
| 0000655560 | 0000 | 0000 | 0000 | 04C2 | 0000 | 0000 | 695F | 5F6E |
| 0000655600 | 7470 | 0072 | FFE0 | FFFF | FFFF | 0010 | 0109 | 0000 |
| 0000655620 | 0000 | 0000 | 0020 | 0000 | 0000 | 0000 | 0000 | 0000 |
| 0000655640 | 6F5F | 7475 | 705F | 7274 | FFC0 | FFFF | FFFF | 0010 |
| 0000655660 | 0109 | 0000 | 0000 | 0000 | 0020 | 0000 | 0000 | 0000 |
| 0000655700 | 0000 | 0000 | 652E | 0066 | 0000 | 0000 | 08E0 | FFC6 |
| 0000655720 | 0001 | 0000 | 0165 | 0000 | 0000 | 0A09 | 0000 | 0000 |
| 0000655740 | 0000 | 0000 | 0000 | 0000 | 0000 | 0000 | 41E6 | 0000 |
| 0000655760 | 08E0 | FFC6 | 0001 | 0024 | 0102 | 0000 | 0000 | 0200 |
| 0000656000 | 0000 | 3082 | 0001 | 1E88 | 0000 | 0003 | 622E | 0066 |
| 0000656020 | 0000 | 0000 | 08E0 | FFC6 | 0001 | 0000 | 0165 | 0000 |
| 0000656040 | 0000 | 0A18 | 0000 | 0000 | 0000 | 04CC | 0000 | 0000 |
| 0000656060 | 695F | 5F6E | 7470 | 0072 | FFE0 | FFFF | FFFF | 0010 |
| 0000656100 | 0109 | 0000 | 0000 | 0000 | 0020 | 0000 | 0000 | 0000 |
| 0000656120 | 0000 | 0000 | 6F5F | 7475 | 705F | 7274 | FFC0 | FFFF |
| 0000656140 | FFFF | 0010 | 0109 | 0000 | 0000 | 0000 | 0020 | 0000 |
| 0000656160 | 0000 | 0000 | 0000 | 0000 | 652E | 0066 | 0000 | 0000 |
| 0000656200 | 0AE0 | FFC6 | 0001 | 0000 | 0165 | 0000 | 0000 | 0A22 |
| 0000656220 | 0000 | 0000 | 0000 | 0000 | 0000 | 0000 | 0000 | 0000 |
| 0000656240 | 41FA | 0000 | 0AE0 | FFC6 | 0001 | 0020 | 0102 | 0000 |
| 0000656260 | 0000 | 0550 | 0000 | 30A6 | 0001 | 1E8E | 0000 | 0002 |
| 0000656300 | 622E | 0066 | 0000 | 0000 | 0AE0 | FFC6 | 0001 | 0000 |
| 0000656320 | 0165 | 0000 | 0000 | 0A32 | 0000 | 0000 | 0000 | 04D2 |
| 0000656340 | 0000 | 0000 | 652E | 0066 | 0000 | 0000 | 1030 | FFC6 |
| 0000656360 | 0001 | 0000 | 0165 | 0000 | 0000 | 0A4E | 0000 | 0000 |
| 0000656400 | 0000 | 0000 | 0000 | 0000 | 0000 | 0000 | 4214 | 0000 |
| 0000656420 | 1030 | FFC6 | 0001 | 0020 | 0103 | 0000 | 0000 | 0AE0 |
| 0000656440 | 0000 | 310C | 0001 | 1E94 | 0000 | 0002 | 622E | 0066 |
| 0000656460 | 0000 | 0000 | 1030 | FFC6 | 0001 | 0000 | 0165 | 0000 |
| 0000656500 | 0000 | 0A54 | 0000 | 0000 | 0000 | 04D8 | 0000 | 0000 |
| 0000656520 | 652E | 0066 | 0000 | 0000 | 1B10 | FFC6 | 0001 | 0000 |
| 0000656540 | 0165 | 0000 | 0000 | 0A91 | 0000 | 0000 | 0000 | 0000 |
| 0000656560 | 0000 | 0000 | 0000 | 0000 | 422E | 0000 | 1B10 | FFC6 |
| 0000656600 | 0001 | 0020 | 0103 | 0000 | 0000 | 0220 | 0000 | 31E4 |
| 0000656620 | 0001 | 1E9A | 0000 | 0002 | 622E | 0066 | 0000 | 0000 |
| 0000656640 | 1B10 | FFC6 | 0001 | 0000 | 0165 | 0000 | 0000 | 0A97 |
| 0000656660 | 0000 | 0000 | 0000 | 04DE | 0000 | 0000 | 652E | 0066 |
| 0000656700 | 0000 | 0000 | 1D30 | FFC6 | 0001 | 0000 | 0165 | 0000 |
| 0000656720 | 0000 | 0AA1 | 0000 | 0000 | 0000 | 0000 | 0000 | 0000 |
| 0000656740 | 742E | 7865 | 0074 | 0000 | AD60 | FFC4 | 0001 | 0000 |
| 0000656760 | 0103 | 6FD0 | 0001 | 03B4 | 03C6 | 0000 | 0000 | 0000 |
| 0000657000 | 0000 | 0000 | 642E | 7461 | 0061 | 0000 | 0000 | 0000 |
| 0000657020 | 0004 | 0000 | 0103 | 0000 | 0000 | 0000 | 0000 | 0000 |
| 0000657040 | 0000 | 0000 | 0000 | 0000 | 622E | 7373 | 0000 | 0000 |
| 0000657060 | 9910 | FFD1 | 0003 | 0000 | 0103 | D110 | 0000 | 0000 |
| 0000657100 | 0000 | 0000 | 0000 | 0000 | 0000 | 0000 | 632E | 6E69 |
| 0000657120 | 7469 | 0000 | C590 | FFC6 | 0002 | 0000 | 0103 | 0690 |
| 0000657140 | 0000 | 001A | 0000 | 0000 | 0000 | 0000 | 0000 | 0000 |
| 0000657160 | 662E | 6C69 | 0065 | 0000 | 1EA4 | 0000 | FFFE | 0000 |
| 0000657200 | 0167 | 7067 | 745F | 6D69 | 7265 | 632E | 0000 | 0000 |
| 0000657220 | 0000 | 0000 | 662E | 6C69 | 0065 | 0000 | 1EA6 | 0000 |
| 0000657240 | FFFE | 0000 | 0167 | 7473 | 6D64 | 682E | 0000 | 0000 |
| 0000657260 | 0000 | 0000 | 0000 | 0000 | 662E | 6C69 | 0065 | 0000 |
| 0000657300 | 1EA8 | 0000 | FFFE | 0000 | 0167 | 7067 | 745F | 6D69 |
| 0000657320 | 7265 | 632E | 0000 | 0000 | 0000 | 0000 | 662E | 6C69 |

THU MAR 14 17:37:32 1991 GSPMON.4 PAGE 235, LINE 13807

| | | | | | | | | |
|---|---|---|---|---|---|---|---|---|
| 0000657340 | 0065 | 0000 | 1EB8 | 0000 | FFFE | 0000 | 0167 | 7974 |
| 0000657360 | 6570 | 6564 | 2E66 | 0068 | 0000 | 0000 | 0000 | 0000 |
| 0000657400 | 302E | 6166 | 656B | 0000 | 0000 | 0000 | FFFE | 000A |
| 0000657420 | 010F | 0000 | 0000 | 0000 | 0001 | 0000 | 0000 | 1EB2 |
| 0000657440 | 0000 | 0000 | 465F | 4C41 | 4553 | 0000 | 0000 | 0000 |
| 0000657460 | FFFF | 000B | 0110 | 0000 | 0000 | 0000 | 0001 | 0000 |
| 0000657500 | 0000 | 0000 | 0000 | 0000 | 545F | 5552 | 0045 | 0000 |
| 0000657520 | 0001 | 0000 | FFFF | 000B | 0110 | 0000 | 0000 | 0000 |
| 0000657540 | 0001 | 0000 | 0000 | 0000 | 0000 | 0000 | 652E | 736F |
| 0000657560 | 0000 | 0000 | 0000 | 0000 | FFFE | 000A | 0166 | 1EAA |
| 0000657600 | 0000 | 0000 | 0001 | 0000 | 0000 | 0000 | 0000 | 0000 |
| 0000657620 | 312E | 6166 | 656B | 0000 | 0000 | 0000 | FFFE | 0008 |
| 0000657640 | 010A | 0000 | 0000 | 0000 | 0004 | 0000 | 0000 | 1EB8 |
| 0000657660 | 0000 | 0000 | 705F | 7869 | 6C65 | 0000 | 0000 | 0000 |
| 0000657700 | FFFF | 000E | 0112 | 0000 | 0000 | 0000 | 0004 | 0000 |
| 0000657720 | 0000 | 0000 | 0000 | 0000 | 652E | 736F | 0000 | 0000 |
| 0000657740 | 0000 | 0000 | FFFE | 0008 | 0166 | 1EB2 | 0000 | 0000 |
| 0000657760 | 0004 | 0000 | 0000 | 0000 | 0000 | 0000 | 662E | 6C69 |
| 0000660000 | 0065 | 0000 | 1EF0 | 0000 | FFFE | 0000 | 0167 | 7067 |
| 0000660020 | 745F | 6D69 | 7265 | 632E | 0000 | 0000 | 0000 | 0000 |
| 0000660040 | 745F | 6D69 | 7265 | 0000 | 6A60 | FFD2 | 0003 | 000F |
| 0000660060 | 0103 | 0000 | 0000 | 0000 | 0020 | 0000 | 0000 | 0000 |
| 0000660100 | 0000 | 0000 | 0000 | 0000 | 4246 | 0000 | 6A80 | FFD2 |
| 0000660120 | 0003 | 000A | 0103 | 1EA6 | 0000 | 0000 | 0001 | 0000 |
| 0000660140 | 0000 | 0000 | 0000 | 0000 | 0000 | 0000 | 4250 | 0000 |
| 0000660160 | 6A90 | FFD2 | 0003 | 000A | 0103 | 1EA6 | 0000 | 0000 |
| 0000660200 | 0001 | 0000 | 0000 | 0000 | 0000 | 0000 | 0000 | 0000 |
| 0000660220 | 425D | 0000 | 1D30 | FFC6 | 0001 | 0020 | 0102 | 0000 |
| 0000660240 | 0000 | 00E0 | 0000 | 3208 | 0001 | 1EC8 | 0000 | 0002 |
| 0000660260 | 622E | 0066 | 0000 | 0000 | 1D30 | FFC6 | 0001 | 0000 |
| 0000660300 | 0165 | 0000 | 0000 | 0038 | 0000 | 0000 | 0000 | 002A |
| 0000660320 | 0000 | 0000 | 735F | 0077 | 0000 | 0000 | FFE0 | FFFF |
| 0000660340 | FFFF | 000A | 0109 | 1EA6 | 0000 | 0000 | 0001 | 0000 |
| 0000660360 | 0000 | 0000 | 0000 | 0000 | 652E | 0066 | 0000 | 0000 |
| 0000660400 | 1E10 | FFC6 | 0001 | 0000 | 0165 | 0000 | 0000 | 003D |
| 0000660420 | 0000 | 0000 | 0000 | 0000 | 0000 | 0000 | 0000 | 0000 |
| 0000660440 | 426E | 0000 | 1E10 | FFC6 | 0001 | 0020 | 0102 | 0000 |
| 0000660460 | 0000 | 0100 | 0000 | 3214 | 0001 | 1ECE | 0000 | 0001 |
| 0000660500 | 622E | 0066 | 0000 | 0000 | 1E10 | FFC6 | 0001 | 0000 |
| 0000660520 | 0165 | 0000 | 0000 | 004B | 0000 | 0000 | 0000 | 0030 |
| 0000660540 | 0000 | 0000 | 652E | 0066 | 0000 | 0000 | 1F10 | FFC6 |
| 0000660560 | 0001 | 0000 | 0165 | 0000 | 0000 | 0051 | 0000 | 0000 |
| 0000660600 | 0000 | 0000 | 0000 | 0000 | 0000 | 0000 | 427E | 0000 |
| 0000660620 | 1F10 | FFC6 | 0001 | 002A | 0102 | 1EA6 | 0000 | 0050 |
| 0000660640 | 0000 | 322C | 0001 | 1ED4 | 0000 | 0000 | 622E | 0066 |
| 0000660660 | 0000 | 0000 | 1F10 | FFC6 | 0001 | 0000 | 0165 | 0000 |
| 0000660700 | 0000 | 005F | 0000 | 0000 | 0000 | 0036 | 0000 | 0000 |
| 0000660720 | 652E | 0066 | 0000 | 0000 | 1F60 | FFC6 | 0001 | 0000 |
| 0000660740 | 0165 | 0000 | 0000 | 0063 | 0000 | 0000 | 0000 | 0000 |
| 0000660760 | 0000 | 0000 | 0000 | 0000 | 428A | 0000 | 1F60 | FFC6 |
| 0000661000 | 0001 | 002A | 0102 | 1EA6 | 0000 | 00B0 | 0000 | 3238 |
| 0000661020 | 0001 | 1EDA | 0000 | 0001 | 622E | 0066 | 0000 | 0000 |
| 0000661040 | 1F60 | FFC6 | 0001 | 0000 | 0165 | 0000 | 0000 | 0071 |
| 0000661060 | 0000 | 0000 | 0000 | 003C | 0000 | 0000 | 652E | 0066 |
| 0000661100 | 0000 | 0000 | 2010 | FFC6 | 0001 | 0000 | 0165 | 0000 |
| 0000661120 | 0000 | 0078 | 0000 | 0000 | 0000 | 0000 | 0000 | 0000 |
| 0000661140 | 0000 | 0000 | 429B | 0000 | 2010 | FFC6 | 0001 | 0020 |
| 0000661160 | 0102 | 0000 | 0000 | 0180 | 0000 | 3250 | 0001 | 1EE0 |
| 0000661200 | 0000 | 0001 | 622E | 0066 | 0000 | 0000 | 2010 | FFC6 |

THU MAR 14 17:37:32 1991 GSPMON.4 PAGE 236, LINE 13866

| | | | | | | | | |
|---|---|---|---|---|---|---|---|---|
| 0000661220 | 0001 | 0000 | 0165 | 0000 | 0000 | 0088 | 0000 | 0000 |
| 0000661240 | 0000 | 0042 | 0000 | 0000 | 652E | 0066 | 0000 | 0000 |
| 0000661260 | 2190 | FFC6 | 0001 | 0000 | 0165 | 0000 | 0000 | 0092 |
| 0000661300 | 0000 | 0000 | 0000 | 0000 | 0000 | 0000 | 0000 | 0000 |
| 0000661320 | 42A5 | 0000 | 2190 | FFC6 | 0001 | 0020 | 0102 | 0000 |
| 0000661340 | 0000 | 0150 | 0000 | 3274 | 0001 | 1EE8 | 0000 | 0003 |
| 0000661360 | 622E | 0066 | 0000 | 0000 | 2190 | FFC6 | 0001 | 0000 |
| 0000661400 | 0165 | 0000 | 0000 | 00A2 | 0000 | 0000 | 0000 | 004A |
| 0000661420 | 0000 | 0000 | 745F | 6D69 | 6F65 | 7475 | FFE0 | FFFF |
| 0000661440 | FFFF | 000F | 0109 | 0000 | 0000 | 0000 | 0020 | 0000 |
| 0000661460 | 0000 | 0000 | 0000 | 0000 | 652E | 0066 | 0000 | 0000 |
| 0000661500 | 22E0 | FFC6 | 0001 | 0000 | 0165 | 0000 | 0000 | 00A9 |
| 0000661520 | 0000 | 0000 | 0000 | 0000 | 0000 | 0000 | 742E | 7865 |
| 0000661540 | 0074 | 0000 | 1D30 | FFC6 | 0001 | 0000 | 0103 | 05B0 |
| 0000661560 | 0000 | 000F | 0016 | 0000 | 0000 | 0000 | 0000 | 0000 |
| 0000661600 | 642E | 7461 | 0061 | 0000 | 0000 | 0000 | 0004 | 0000 |
| 0000661620 | 0103 | 0000 | 0000 | 0000 | 0000 | 0000 | 0000 | 0000 |
| 0000661640 | 0000 | 0000 | 622E | 7373 | 0000 | 0000 | 6A20 | FFD2 |
| 0000661660 | 0003 | 0000 | 0103 | 0080 | 0000 | 0000 | 0000 | 0000 |
| 0000661700 | 0000 | 0000 | 0000 | 0000 | 632E | 6E69 | 7469 | 0000 |
| 0000661720 | CC20 | FFC6 | 0002 | 0000 | 0103 | 0170 | 0000 | 0005 |
| 0000661740 | 0000 | 0000 | 0000 | 0000 | 0000 | 0000 | 662E | 6C69 |
| 0000661760 | 0065 | 0000 | 1EF2 | 0000 | FFFE | 0000 | 0167 | 7067 |
| 0000662000 | 695F | 746E | 2E72 | 0063 | 0000 | 0000 | 0000 | 0000 |
| 0000662020 | 662E | 6C69 | 0065 | 0000 | 1EF4 | 0000 | FFFE | 0000 |
| 0000662040 | 0167 | 7473 | 6D64 | 682E | 0000 | 0000 | 0000 | 0000 |
| 0000662060 | 0000 | 0000 | 662E | 6C69 | 0065 | 0000 | 1EF6 | 0000 |
| 0000662100 | FFFE | 0000 | 0167 | 7067 | 695F | 746E | 2E72 | 0063 |
| 0000662120 | 0000 | 0000 | 0000 | 0000 | 662E | 6C69 | 0065 | 0000 |
| 0000662140 | 1F06 | 0000 | FFFE | 0000 | 0167 | 7974 | 6570 | 6564 |
| 0000662160 | 2E66 | 0068 | 0000 | 0000 | 0000 | 0000 | 302E | 6166 |
| 0000662200 | 656B | 0000 | 0000 | 0000 | FFFE | 000A | 010F | 0000 |
| 0000662220 | 0000 | 0000 | 0001 | 0000 | 0000 | 1F00 | 0000 | 0000 |
| 0000662240 | 465F | 4C41 | 4553 | 0000 | 0000 | 0000 | FFFF | 000B |
| 0000662260 | 0110 | 0000 | 0000 | 0000 | 0001 | 0000 | 0000 | 0000 |
| 0000662300 | 0000 | 0000 | 545F | 5552 | 0045 | 0000 | 0001 | 0000 |
| 0000662320 | FFFF | 000B | 0110 | 0000 | 0000 | 0000 | 0001 | 0000 |
| 0000662340 | 0000 | 0000 | 0000 | 0000 | 652E | 736F | 0000 | 0000 |
| 0000662360 | 0000 | 0000 | FFFE | 000A | 0166 | 1EF8 | 0000 | 0000 |
| 0000662400 | 0001 | 0000 | 0000 | 0000 | 0000 | 0000 | 312E | 6166 |
| 0000662420 | 656B | 0000 | 0000 | 0000 | FFFE | 0008 | 010A | 0000 |
| 0000662440 | 0000 | 0000 | 0004 | 0000 | 0000 | 1F06 | 0000 | 0000 |
| 0000662460 | 705F | 7869 | 6C65 | 0000 | 0000 | 0000 | FFFF | 000E |
| 0000662500 | 0112 | 0000 | 0000 | 0000 | 0004 | 0000 | 0000 | 0000 |
| 0000662520 | 0000 | 0000 | 652E | 736F | 0000 | 0000 | 0000 | 0000 |
| 0000662540 | FFFE | 0008 | 0166 | 1F00 | 0000 | 0000 | 0004 | 0000 |
| 0000662560 | 0000 | 0000 | 0000 | 0000 | 662E | 6C69 | 0065 | 0000 |
| 0000662600 | 1F08 | 0000 | FFFE | 0000 | 0167 | 7067 | 695F | 746E |
| 0000662620 | 2E72 | 0063 | 0000 | 0000 | 0000 | 0000 | 662E | 6C69 |
| 0000662640 | 0065 | 0000 | 1F0A | 0000 | FFFE | 0000 | 0167 | 7367 |
| 0000662660 | 7370 | 7379 | 682E | 0000 | 0000 | 0000 | 0000 | 0000 |
| 0000662700 | 662E | 6C69 | 0065 | 0000 | 1F0C | 0000 | FFFE | 0000 |
| 0000662720 | 0167 | 7367 | 7370 | 7379 | 692E | 636E | 0000 | 0000 |
| 0000662740 | 0000 | 0000 | 662E | 6C69 | 0065 | 0000 | 1F0E | 0000 |
| 0000662760 | FFFE | 0000 | 0167 | 7367 | 7370 | 7379 | 682E | 0000 |
| 0000663000 | 0000 | 0000 | 0000 | 0000 | 662E | 6C69 | 0065 | 0000 |
| 0000663020 | 1F10 | 0000 | FFFE | 0000 | 0167 | 7067 | 695F | 746E |
| 0000663040 | 2E72 | 0063 | 0000 | 0000 | 0000 | 0000 | 662E | 6C69 |
| 0000663060 | 0065 | 0000 | 1FEC | 0000 | FFFE | 0000 | 0167 | 7367 |

THU MAR 14 17:37:32 1991 GSPMON.4 PAGE 237, LINE 13925

| | | | | | | | | |
|---|---|---|---|---|---|---|---|---|
| 0000663100 | 6370 | 6766 | 682E | 0000 | 0000 | 0000 | 0000 | 0000 |
| 0000663120 | 0000 | 0000 | 42B4 | 0000 | 0000 | 0000 | FFFE | 000A |
| 0000663140 | 010F | 0000 | 0000 | 0000 | 0002 | 0000 | 0000 | 1F1C |
| 0000663160 | 0000 | 0000 | 4F5F | 454E | 315F | 0036 | 0000 | 0000 |
| 0000663200 | FFFF | 000B | 0110 | 0000 | 0000 | 0000 | 0002 | 0000 |
| 0000663220 | 0000 | 0000 | 0000 | 0000 | 545F | 4F57 | 385F | 0000 |
| 0000663240 | 0001 | 0000 | FFFF | 000B | 0110 | 0000 | 0000 | 0000 |
| 0000663260 | 0002 | 0000 | 0000 | 0000 | 0000 | 0000 | 465F | 554F |
| 0000663300 | 5F52 | 0034 | 0002 | 0000 | FFFF | 000B | 0110 | 0000 |
| 0000663320 | 0000 | 000C | 0002 | 0000 | 0000 | 0000 | 0000 | 0000 |
| 0000663340 | 652E | 736F | 0000 | 0000 | 0000 | 0000 | FFFE | 000A |
| 0000663360 | 0166 | 1F12 | 0000 | 0000 | 0002 | 0000 | 0000 | 0000 |
| 0000663400 | 0000 | 0000 | 635F | 726C | 655F | 7272 | 0000 | 0000 |
| 0000663420 | FFFE | 000A | 010F | 0000 | 0000 | 0000 | 0001 | 0000 |
| 0000663440 | 0000 | 1F24 | 0000 | 0000 | 4E5F | 5F4F | 4C43 | 0052 |
| 0000663460 | 0000 | 0000 | FFFF | 000B | 0110 | 0000 | 0000 | 0000 |
| 0000663500 | 0001 | 0000 | 0000 | 0000 | 0000 | 0000 | 435F | 524C |
| 0000663520 | 0000 | 0000 | 0001 | 0000 | FFFF | 000B | 0110 | 0000 |
| 0000663540 | 0000 | 0000 | 0001 | 0000 | 0000 | 0000 | 0000 | 0000 |
| 0000663560 | 652E | 736F | 0000 | 0000 | 0000 | 0000 | FFFE | 000A |
| 0000663600 | 0166 | 1F1C | 0000 | 0000 | 0001 | 0000 | 0000 | 0000 |
| 0000663620 | 0000 | 0000 | 0000 | 0000 | 42BE | 0000 | 0000 | 0000 |
| 0000663640 | FFFE | 000A | 010F | 0000 | 0000 | 0000 | 0003 | 0000 |
| 0000663660 | 0000 | 1F32 | 0000 | 0000 | 505F | 414C | 454E | 0030 |
| 0000663700 | 0000 | 0000 | FFFF | 000B | 0110 | 0000 | 0000 | 0000 |
| 0000663720 | 0003 | 0000 | 0000 | 0000 | 0000 | 0000 | 505F | 414C |
| 0000663740 | 454E | 0032 | 0001 | 0000 | FFFF | 000B | 0110 | 0000 |
| 0000663760 | 0000 | 0000 | 0003 | 0000 | 0000 | 0000 | 0000 | 0000 |
| 0000664000 | 505F | 414C | 454E | 0031 | 0002 | 0000 | FFFF | 000B |
| 0000664020 | 0110 | 0000 | 0000 | 0000 | 0003 | 0000 | 0000 | 0000 |
| 0000664040 | 0000 | 0000 | 505F | 414C | 454E | 0033 | 0003 | 0000 |
| 0000664060 | FFFF | 000B | 0110 | 0000 | 0000 | 0000 | 0003 | 0000 |
| 0000664100 | 0000 | 0000 | 0000 | 0000 | 4E5F | 504F | 414C | 454E |
| 0000664120 | 0004 | 0000 | FFFF | 000B | 0110 | 0000 | 0000 | 0000 |
| 0000664140 | 0003 | 0000 | 0000 | 0000 | 0000 | 0000 | 652E | 736F |
| 0000664160 | 0000 | 0000 | 0000 | 0000 | FFFE | 000A | 0166 | 1F24 |
| 0000664200 | 0000 | 0000 | 0003 | 0000 | 0000 | 0000 | 0000 | 0000 |
| 0000664220 | 0000 | 0000 | 42C9 | 0000 | 0000 | 0000 | FFFE | 000A |
| 0000664240 | 010F | 0000 | 0000 | 0000 | 0001 | 0000 | 0000 | 1F3A |
| 0000664260 | 0000 | 0000 | 4E5F | 5F4F | 4944 | 5053 | 0000 | 0000 |
| 0000664300 | FFFF | 000B | 0110 | 0000 | 0000 | 0000 | 0001 | 0000 |
| 0000664320 | 0000 | 0000 | 0000 | 0000 | 445F | 5349 | 0050 | 0000 |
| 0000664340 | 0001 | 0000 | FFFF | 000B | 0110 | 0000 | 0000 | 0000 |
| 0000664360 | 0001 | 0000 | 0000 | 0000 | 0000 | 0000 | 652E | 736F |
| 0000664400 | 0000 | 0000 | 0000 | 0000 | FFFE | 000A | 0166 | 1F32 |
| 0000664420 | 0000 | 0000 | 0001 | 0000 | 0000 | 0000 | 0000 | 0000 |
| 0000664440 | 665F | 5F62 | 6E65 | 0000 | 0000 | 0000 | FFFE | 000A |
| 0000664460 | 010F | 0000 | 0000 | 0000 | 0001 | 0000 | 0000 | 1F42 |
| 0000664500 | 0000 | 0000 | 0000 | 0000 | 42D3 | 0000 | 0000 | 0000 |
| 0000664520 | FFFF | 000B | 0110 | 0000 | 0000 | 0000 | 0001 | 0000 |
| 0000664540 | 0000 | 0000 | 0000 | 0000 | 0000 | 0000 | 42DE | 0000 |
| 0000664560 | 0001 | 0000 | FFFF | 000B | 0110 | 0000 | 0000 | 0000 |
| 0000664600 | 0001 | 0000 | 0000 | 0000 | 0000 | 0000 | 652E | 736F |
| 0000664620 | 0000 | 0000 | 0000 | 0000 | FFFE | 000A | 0166 | 1F3A |
| 0000664640 | 0000 | 0000 | 0001 | 0000 | 0000 | 0000 | 0000 | 0000 |
| 0000664660 | 7A5F | 7265 | 5F6F | 0062 | 0000 | 0000 | FFFE | 000A |
| 0000664700 | 010F | 0000 | 0000 | 0000 | 0001 | 0000 | 0000 | 1F4A |
| 0000664720 | 0000 | 0000 | 0000 | 0000 | 42E8 | 0000 | 0000 | 0000 |
| 0000664740 | FFFF | 000B | 0110 | 0000 | 0000 | 0000 | 0001 | 0000 |

THU MAR 14 17:37:32 1991 GSPMON.4 PAGE 238, LINE 13984

| | | | | | | | | |
|---|---|---|---|---|---|---|---|---|
| 0000664760 | 0000 | 0000 | 0000 | 0000 | 0000 | 0000 | 42F4 | 0000 |
| 0000665000 | 0001 | 0000 | FFFF | 000B | 0110 | 0000 | 0000 | 0000 |
| 0000665020 | 0001 | 0000 | 0000 | 0000 | 0000 | 0000 | 652E | 736F |
| 0000665040 | 0000 | 0000 | 0000 | 0000 | FFFE | 000A | 0166 | 1F42 |
| 0000665060 | 0000 | 0000 | 0001 | 0000 | 0000 | 0000 | 0000 | 0000 |
| 0000665100 | 7A5F | 7265 | 5F6F | 0061 | 0000 | 0000 | FFFE | 000A |
| 0000665120 | 010F | 0000 | 0000 | 0000 | 0001 | 0000 | 0000 | 1F52 |
| 0000665140 | 0000 | 0000 | 0000 | 0000 | 42FE | 0000 | 0000 | 0000 |
| 0000665160 | FFFF | 000B | 0110 | 0000 | 0000 | 0000 | 0001 | 0000 |
| 0000665200 | 0000 | 0000 | 0000 | 0000 | 0000 | 0000 | 430A | 0000 |
| 0000665220 | 0001 | 0000 | FFFF | 000B | 0110 | 0000 | 0000 | 0000 |
| 0000665240 | 0001 | 0000 | 0000 | 0000 | 0000 | 0000 | 652E | 736F |
| 0000665260 | 0000 | 0000 | 0000 | 0000 | FFFE | 000A | 0166 | 1F4A |
| 0000665300 | 0000 | 0000 | 0001 | 0000 | 0000 | 0000 | 0000 | 0000 |
| 0000665320 | 0000 | 0000 | 4314 | 0000 | 0000 | 0000 | FFFE | 000A |
| 0000665340 | 010F | 0000 | 0000 | 0000 | 0002 | 0000 | 0000 | 1F5E |
| 0000665360 | 0000 | 0000 | 0000 | 0000 | 431E | 0000 | 0000 | 0000 |
| 0000665400 | FFFF | 000B | 0110 | 0000 | 0000 | 0000 | 0002 | 0000 |
| 0000665420 | 0000 | 0000 | 0000 | 0000 | 0000 | 0000 | 4328 | 0000 |
| 0000665440 | 0001 | 0000 | FFFF | 000B | 0110 | 0000 | 0000 | 0000 |
| 0000665460 | 0002 | 0000 | 0000 | 0000 | 0000 | 0000 | 0000 | 0000 |
| 0000665500 | 4332 | 0000 | 0002 | 0000 | FFFF | 000B | 0110 | 0000 |
| 0000665520 | 0000 | 0000 | 0002 | 0000 | 0000 | 0000 | 0000 | 0000 |
| 0000665540 | 0000 | 0000 | 433C | 0000 | 0003 | 0000 | FFFF | 000B |
| 0000665560 | 0110 | 0000 | 0000 | 0000 | 0002 | 0000 | 0000 | 0000 |
| 0000665600 | 0000 | 0000 | 652E | 736F | 0000 | 0000 | 0000 | 0000 |
| 0000665620 | FFFE | 000A | 0166 | 1F52 | 0000 | 0000 | 0002 | 0000 |
| 0000665640 | 0000 | 0000 | 0000 | 0000 | 615F | 756C | 665F | 636E |
| 0000665660 | 0000 | 0000 | FFFE | 000A | 010F | 0000 | 0000 | 0000 |
| 0000665700 | 0003 | 0000 | 0000 | 1F72 | 0000 | 0000 | 435F | 454C |
| 0000665720 | 5241 | 0000 | 0000 | 0000 | FFFF | 000B | 0110 | 0000 |
| 0000665740 | 0000 | 0000 | 0003 | 0000 | 0000 | 0000 | 0000 | 0000 |
| 0000665760 | 425F | 494D | 554E | 4153 | 0001 | 0000 | FFFF | 000B |
| 0000666000 | 0110 | 0000 | 0000 | 0000 | 0003 | 0000 | 0000 | 0000 |
| 0000666020 | 0000 | 0000 | 415F | 494D | 554E | 4253 | 0002 | 0000 |
| 0000666040 | FFFF | 000B | 0110 | 0000 | 0000 | 0000 | 0003 | 0000 |
| 0000666060 | 0000 | 0000 | 0000 | 0000 | 505F | 554C | 0053 | 0000 |
| 0000666100 | 0003 | 0000 | FFFF | 000B | 0110 | 0000 | 0000 | 0000 |
| 0000666120 | 0003 | 0000 | 0000 | 0000 | 0000 | 0000 | 585F | 524F |
| 0000666140 | 0000 | 0000 | 0004 | 0000 | FFFF | 000B | 0110 | 0000 |
| 0000666160 | 0000 | 0000 | 0003 | 0000 | 0000 | 0000 | 0000 | 0000 |
| 0000666200 | 4F5F | 0052 | 0000 | 0000 | 0005 | 0000 | FFFF | 000B |
| 0000666220 | 0110 | 0000 | 0000 | 0000 | 0003 | 0000 | 0000 | 0000 |
| 0000666240 | 0000 | 0000 | 415F | 444E | 0000 | 0000 | 0006 | 0000 |
| 0000666260 | FFFF | 000B | 0110 | 0000 | 0000 | 0000 | 0003 | 0000 |
| 0000666300 | 0000 | 0000 | 0000 | 0000 | 505F | 4552 | 4553 | 0054 |
| 0000666320 | 0007 | 0000 | FFFF | 000B | 0110 | 0000 | 0000 | 0000 |
| 0000666340 | 0003 | 0000 | 0000 | 0000 | 0000 | 0000 | 652E | 736F |
| 0000666360 | 0000 | 0000 | 0000 | 0000 | FFFE | 000A | 0166 | 1F5E |
| 0000666400 | 0000 | 0000 | 0003 | 0000 | 0000 | 0000 | 0000 | 0000 |
| 0000666420 | 615F | 756C | 635F | 7972 | 0000 | 0000 | FFFE | 000A |
| 0000666440 | 010F | 0000 | 0000 | 0000 | 0001 | 0000 | 0000 | 1F7A |
| 0000666460 | 0000 | 0000 | 5A5F | 5245 | 004F | 0000 | 0000 | 0000 |
| 0000666500 | FFFF | 000B | 0110 | 0000 | 0000 | 0000 | 0001 | 0000 |
| 0000666520 | 0000 | 0000 | 0000 | 0000 | 4F5F | 454E | 0000 | 0000 |
| 0000666540 | 0001 | 0000 | FFFF | 000B | 0110 | 0000 | 0000 | 0000 |
| 0000666560 | 0001 | 0000 | 0000 | 0000 | 0000 | 0000 | 652E | 736F |
| 0000666600 | 0000 | 0000 | 0000 | 0000 | FFFE | 000A | 0166 | 1F72 |
| 0000666620 | 0000 | 0000 | 0001 | 0000 | 0000 | 0000 | 0000 | 0000 |

THU MAR 14 17:37:32 1991 GSPMON.4 PAGE 239, LINE 14043

| | | | | | | | | |
|---|---|---|---|---|---|---|---|---|
| 0000666640 | 0000 | 0000 | 4346 | 0000 | 0000 | 0000 | FFFE | 000A |
| 0000666660 | 010F | 0000 | 0000 | 0000 | 0001 | 0000 | 0000 | 1F82 |
| 0000666700 | 0000 | 0000 | 0000 | 0000 | 4352 | 0000 | 0000 | 0000 |
| 0000666720 | FFFF | 000B | 0110 | 0000 | 0000 | 0000 | 0001 | 0000 |
| 0000666740 | 0000 | 0000 | 0000 | 0000 | 0000 | 0000 | 435F | 0000 |
| 0000666760 | 0001 | 0000 | FFFF | 000B | 0110 | 0000 | 0000 | 0000 |
| 0000667000 | 0001 | 0000 | 0000 | 0000 | 0000 | 0000 | 652E | 736F |
| 0000667020 | 0000 | 0000 | 0000 | 0000 | FFFE | 000A | 0166 | 1F7A |
| 0000667040 | 0000 | 0000 | 0001 | 0000 | 0000 | 0000 | 0000 | 0000 |
| 0000667060 | 0000 | 0000 | 436B | 0000 | 0000 | 0000 | FFFE | 000A |
| 0000667100 | 010F | 0000 | 0000 | 0000 | 0001 | 0000 | 0000 | 1F8A |
| 0000667120 | 0000 | 0000 | 4D5F | 5341 | 5F4B | 4E45 | 0000 | 0000 |
| 0000667140 | FFFF | 000B | 0110 | 0000 | 0000 | 0000 | 0001 | 0000 |
| 0000667160 | 0000 | 0000 | 0000 | 0000 | 0000 | 0000 | 4378 | 0000 |
| 0000667200 | 0001 | 0000 | FFFF | 000B | 0110 | 0000 | 0000 | 0000 |
| 0000667220 | 0001 | 0000 | 0000 | 0000 | 0000 | 0000 | 652E | 736F |
| 0000667240 | 0000 | 0000 | 0000 | 0000 | FFFE | 000A | 0166 | 1F82 |
| 0000667260 | 0000 | 0000 | 0001 | 0000 | 0000 | 0000 | 0000 | 0000 |
| 0000667300 | 0000 | 0000 | 4382 | 0000 | 0000 | 0000 | FFFE | 000A |
| 0000667320 | 010F | 0000 | 0000 | 0000 | 0001 | 0000 | 0000 | 1F92 |
| 0000667340 | 0000 | 0000 | 0000 | 0000 | 438D | 0000 | 0000 | 0000 |
| 0000667360 | FFFF | 000B | 0110 | 0000 | 0000 | 0000 | 0001 | 0000 |
| 0000667400 | 0000 | 0000 | 0000 | 0000 | 0000 | 0000 | 4397 | 0000 |
| 0000667420 | 0001 | 0000 | FFFF | 000B | 0110 | 0000 | 0000 | 0000 |
| 0000667440 | 0001 | 0000 | 0000 | 0000 | 0000 | 0000 | 652E | 736F |
| 0000667460 | 0000 | 0000 | 0000 | 0000 | FFFE | 000A | 0166 | 1F8A |
| 0000667500 | 0000 | 0000 | 0001 | 0000 | 0000 | 0000 | 0000 | 0000 |
| 0000667520 | 0000 | 0000 | 43A2 | 0000 | 0000 | 0000 | FFFE | 000A |
| 0000667540 | 010F | 0000 | 0000 | 0000 | 0001 | 0000 | 0000 | 1F9A |
| 0000667560 | 0000 | 0000 | 0000 | 0000 | 43AD | 0000 | 0000 | 0000 |
| 0000667600 | FFFF | 000B | 0110 | 0000 | 0000 | 0000 | 0001 | 0000 |
| 0000667620 | 0000 | 0000 | 0000 | 0000 | 0000 | 0000 | 43B8 | 0000 |
| 0000667640 | 0001 | 0000 | FFFF | 000B | 0110 | 0000 | 0000 | 0000 |
| 0000667660 | 0001 | 0000 | 0000 | 0000 | 0000 | 0000 | 652E | 736F |
| 0000667700 | 0000 | 0000 | 0000 | 0000 | FFFE | 000A | 0166 | 1F92 |
| 0000667720 | 0000 | 0000 | 0001 | 0000 | 0000 | 0000 | 0000 | 0000 |
| 0000667740 | 6D5F | 5F62 | 7566 | 636E | 0000 | 0000 | FFFE | 000A |
| 0000667760 | 010F | 0000 | 0000 | 0000 | 0002 | 0000 | 0000 | 1FA6 |
| 0000670000 | 0000 | 0000 | 0000 | 0000 | 43C2 | 0000 | 0000 | 0000 |
| 0000670020 | FFFF | 000B | 0110 | 0000 | 0000 | 0000 | 0002 | 0000 |
| 0000670040 | 0000 | 0000 | 0000 | 0000 | 4D5F | 5F42 | 5845 | 5257 |
| 0000670060 | 0001 | 0000 | FFFF | 000B | 0110 | 0000 | 0000 | 0000 |
| 0000670100 | 0002 | 0000 | 0000 | 0000 | 0000 | 0000 | 4D5F | 5F42 |
| 0000670120 | 4552 | 4441 | 0002 | 0000 | FFFF | 000B | 0110 | 0000 |
| 0000670140 | 0000 | 0000 | 0002 | 0000 | 0000 | 0000 | 0000 | 0000 |
| 0000670160 | 4D5F | 5F42 | 504F | 4E45 | 0003 | 0000 | FFFF | 000B |
| 0000670200 | 0110 | 0000 | 0000 | 0000 | 0002 | 0000 | 0000 | 0000 |
| 0000670220 | 0000 | 0000 | 652E | 736F | 0000 | 0000 | 0000 | 0000 |
| 0000670240 | FFFE | 000A | 0166 | 1F9A | 0000 | 0000 | 0002 | 0000 |
| 0000670260 | 0000 | 0000 | 0000 | 0000 | 0000 | 0000 | 43CC | 0000 |
| 0000670300 | 0000 | 0000 | FFFE | 000A | 010F | 0000 | 0000 | 0000 |
| 0000670320 | 0002 | 0000 | 0000 | 1FB0 | 0000 | 0000 | 0000 | 0000 |
| 0000670340 | 43D6 | 0000 | 0000 | 0000 | FFFF | 000B | 0110 | 0000 |
| 0000670360 | 0000 | 0000 | 0002 | 0000 | 0000 | 0000 | 0000 | 0000 |
| 0000670400 | 0000 | 0000 | 43E2 | 0000 | 0001 | 0000 | FFFF | 000B |
| 0000670420 | 0110 | 0000 | 0000 | 0000 | 0002 | 0000 | 0000 | 0000 |
| 0000670440 | 0000 | 0000 | 4D5F | 3442 | 525F | 0044 | 0003 | 0000 |
| 0000670460 | FFFF | 000B | 0110 | 0000 | 0000 | 0000 | 0002 | 0000 |
| 0000670500 | 0000 | 0000 | 0000 | 0000 | 652E | 736F | 0000 | 0000 |

THU MAR 14 17:37:32 1991 GSPMON.4 PAGE 240, LINE 14102

| | | | | | | | | |
|---|---|---|---|---|---|---|---|---|
| 0000670520 | 0000 | 0000 | FFFE | 000A | 0166 | 1FA6 | 0000 | 0000 |
| 0000670540 | 0002 | 0000 | 0000 | 0000 | 0000 | 0000 | 0000 | 0000 |
| 0000670560 | 43ED | 0000 | 0000 | 0000 | FFFE | 000A | 010F | 0000 |
| 0000670600 | 0000 | 0000 | 0002 | 0000 | 0000 | 1FB8 | 0000 | 0000 |
| 0000670620 | 4D5F | 3542 | 575F | 0052 | 0000 | 0000 | FFFF | 000B |
| 0000670640 | 0110 | 0000 | 0000 | 0000 | 0002 | 0000 | 0000 | 0000 |
| 0000670660 | 0000 | 0000 | 4D5F | 3542 | 525F | 0044 | 0003 | 0000 |
| 0000670700 | FFFF | 000B | 0110 | 0000 | 0000 | 0000 | 0002 | 0000 |
| 0000670720 | 0000 | 0000 | 0000 | 0000 | 652E | 736F | 0000 | 0000 |
| 0000670740 | 0000 | 0000 | FFFE | 000A | 0166 | 1FB0 | 0000 | 0000 |
| 0000670760 | 0002 | 0000 | 0000 | 0000 | 0000 | 0000 | 0000 | 0000 |
| 0000671000 | 43F7 | 0000 | 0000 | 0000 | FFFE | 000A | 010F | 0000 |
| 0000671020 | 0000 | 0000 | 0001 | 0000 | 0000 | 1FC0 | 0000 | 0000 |
| 0000671040 | 0000 | 0000 | 4403 | 0000 | 0000 | 0000 | FFFF | 000B |
| 0000671060 | 0110 | 0000 | 0000 | 0000 | 0001 | 0000 | 0000 | 0000 |
| 0000671100 | 0000 | 0000 | 0000 | 0000 | 440E | 0000 | 0001 | 0000 |
| 0000671120 | FFFF | 000B | 0110 | 0000 | 0000 | 0000 | 0001 | 0000 |
| 0000671140 | 0000 | 0000 | 0000 | 0000 | 652E | 736F | 0000 | 0000 |
| 0000671160 | 0000 | 0000 | FFFE | 000A | 0166 | 1FB8 | 0000 | 0000 |
| 0000671200 | 0001 | 0000 | 0000 | 0000 | 0000 | 0000 | 0000 | 0000 |
| 0000671220 | 4418 | 0000 | 0000 | 0000 | FFFE | 000A | 010F | 0000 |
| 0000671240 | 0000 | 0000 | 0001 | 0000 | 0000 | 1FC8 | 0000 | 0000 |
| 0000671260 | 0000 | 0000 | 4425 | 0000 | 0000 | 0000 | FFFF | 000B |
| 0000671300 | 0110 | 0000 | 0000 | 0000 | 0001 | 0000 | 0000 | 0000 |
| 0000671320 | 0000 | 0000 | 0000 | 0000 | 4431 | 0000 | 0001 | 0000 |
| 0000671340 | FFFF | 000B | 0110 | 0000 | 0000 | 0000 | 0001 | 0000 |
| 0000671360 | 0000 | 0000 | 0000 | 0000 | 652E | 736F | 0000 | 0000 |
| 0000671400 | 0000 | 0000 | FFFE | 000A | 0166 | 1FC0 | 0000 | 0000 |
| 0000671420 | 0001 | 0000 | 0000 | 0000 | 0000 | 0000 | 0000 | 0000 |
| 0000671440 | 443E | 0000 | 0000 | 0000 | FFFE | 000A | 010F | 0000 |
| 0000671460 | 0000 | 0000 | 0003 | 0000 | 0000 | 1FD8 | 0000 | 0000 |
| 0000671500 | 585F | 424D | 0030 | 0000 | 0000 | 0000 | FFFF | 000B |
| 0000671520 | 0110 | 0000 | 0000 | 0000 | 0003 | 0000 | 0000 | 0000 |
| 0000671540 | 0000 | 0000 | 585F | 424D | 0031 | 0000 | 0001 | 0000 |
| 0000671560 | FFFF | 000B | 0110 | 0000 | 0000 | 0000 | 0003 | 0000 |
| 0000671600 | 0000 | 0000 | 0000 | 0000 | 585F | 424D | 0032 | 0000 |
| 0000671620 | 0002 | 0000 | FFFF | 000B | 0110 | 0000 | 0000 | 0000 |
| 0000671640 | 0003 | 0000 | 0000 | 0000 | 0000 | 0000 | 585F | 424D |
| 0000671660 | 0033 | 0000 | 0003 | 0000 | FFFF | 000B | 0110 | 0000 |
| 0000671700 | 0000 | 0000 | 0003 | 0000 | 0000 | 0000 | 0000 | 0000 |
| 0000671720 | 585F | 424D | 0034 | 0000 | 0004 | 0000 | FFFF | 000B |
| 0000671740 | 0110 | 0000 | 0000 | 0000 | 0003 | 0000 | 0000 | 0000 |
| 0000671760 | 0000 | 0000 | 585F | 424D | 0035 | 0000 | 0005 | 0000 |
| 0000672000 | FFFF | 000B | 0110 | 0000 | 0000 | 0000 | 0003 | 0000 |
| 0000672020 | 0000 | 0000 | 0000 | 0000 | 652E | 736F | 0000 | 0000 |
| 0000672040 | 0000 | 0000 | FFFE | 000A | 0166 | 1FC8 | 0000 | 0000 |
| 0000672060 | 0003 | 0000 | 0000 | 0000 | 0000 | 0000 | 635F | 6E68 |
| 0000672100 | 006C | 0000 | 0000 | 0000 | FFFE | 000A | 010F | 0000 |
| 0000672120 | 0000 | 0000 | 0002 | 0000 | 0000 | 1FE4 | 0000 | 0000 |
| 0000672140 | 525F | 4445 | 435F | 0048 | 0000 | 0000 | FFFF | 000B |
| 0000672160 | 0110 | 0000 | 0000 | 0000 | 0002 | 0000 | 0000 | 0000 |
| 0000672200 | 0000 | 0000 | 0000 | 0000 | 4448 | 0000 | 0001 | 0000 |
| 0000672220 | FFFF | 000B | 0110 | 0000 | 0000 | 0000 | 0002 | 0000 |
| 0000672240 | 0000 | 0000 | 0000 | 0000 | 425F | 554C | 5F45 | 4843 |
| 0000672260 | 0002 | 0000 | FFFF | 000B | 0110 | 0000 | 0000 | 0000 |
| 0000672300 | 0002 | 0000 | 0000 | 0000 | 0000 | 0000 | 0000 | 0000 |
| 0000672320 | 4452 | 0000 | 0003 | 0000 | FFFF | 000B | 0110 | 0000 |
| 0000672340 | 0000 | 0000 | 0002 | 0000 | 0000 | 0000 | 0000 | 0000 |
| 0000672360 | 652E | 736F | 0000 | 0000 | 0000 | 0000 | FFFE | 000A |

THU MAR 14 17:37:32 1991 GSPMON.4 PAGE 241, LINE 14161

| | | | | | | | | |
|---|---|---|---|---|---|---|---|---|
| 0000672400 | 0166 | 1FD8 | 0000 | 0000 | 0002 | 0000 | 0000 | 0000 |
| 0000672420 | 0000 | 0000 | 0000 | 0000 | 445E | 0000 | 0000 | 0000 |
| 0000672440 | FFFE | 000A | 010F | 0000 | 0000 | 0000 | 0001 | 0000 |
| 0000672460 | 0000 | 1FEC | 0000 | 0000 | 0000 | 0000 | 4468 | 0000 |
| 0000672500 | 0000 | 0000 | FFFF | 000B | 0110 | 0000 | 0000 | 0000 |
| 0000672520 | 0001 | 0000 | 0000 | 0000 | 0000 | 0000 | 435F | 4359 |
| 0000672540 | 494C | 0043 | 0001 | 0000 | FFFF | 000B | 0110 | 0000 |
| 0000672560 | 0000 | 0000 | 0001 | 0000 | 0000 | 0000 | 0000 | 0000 |
| 0000672600 | 652E | 736F | 0000 | 0000 | 0000 | 0000 | FFFE | 000A |
| 0000672620 | 0166 | 1FE4 | 0000 | 0000 | 0001 | 0000 | 0000 | 0000 |
| 0000672640 | 0000 | 0000 | 662E | 6C69 | 0065 | 0000 | 1FEE | 0000 |
| 0000672660 | FFFE | 0000 | 0167 | 7067 | 695F | 746E | 2E72 | 0063 |
| 0000672700 | 0000 | 0000 | 0000 | 0000 | 662E | 6C69 | 0065 | 0000 |
| 0000672720 | 1FF0 | 0000 | FFFE | 0000 | 0167 | 7367 | 6870 | 6477 |
| 0000672740 | 682E | 0000 | 0000 | 0000 | 0000 | 0000 | 662E | 6C69 |
| 0000672760 | 0065 | 0000 | 1FF2 | 0000 | FFFE | 0000 | 0167 | 7067 |
| 0000673000 | 695F | 746E | 2E72 | 0063 | 0000 | 0000 | 0000 | 0000 |
| 0000673020 | 662E | 6C69 | 0065 | 0000 | 2086 | 0000 | FFFE | 0000 |
| 0000673040 | 0167 | 7067 | 705F | 6275 | 682E | 0000 | 0000 | 0000 |
| 0000673060 | 0000 | 0000 | 322E | 6166 | 656B | 0000 | 0000 | 0000 |
| 0000673100 | FFFE | 0008 | 010A | 0000 | 0000 | 0000 | 01C0 | 0000 |
| 0000673120 | 0000 | 2024 | 0000 | 0000 | 685F | 7365 | 6E79 | 0063 |
| 0000673140 | 0000 | 0000 | FFFF | 000D | 0108 | 0000 | 0000 | 0000 |
| 0000673160 | 0010 | 0000 | 0000 | 0000 | 0000 | 0000 | 685F | 6265 |
| 0000673200 | 6E6C | 006B | 0010 | 0000 | FFFF | 000D | 0108 | 0000 |
| 0000673220 | 0000 | 0000 | 0010 | 0000 | 0000 | 0000 | 0000 | 0000 |
| 0000673240 | 685F | 6273 | 6E6C | 006B | 0020 | 0000 | FFFF | 000D |
| 0000673260 | 0108 | 0000 | 0000 | 0000 | 0010 | 0000 | 0000 | 0000 |
| 0000673300 | 0000 | 0000 | 765F | 7365 | 6E79 | 0063 | 0030 | 0000 |
| 0000673320 | FFFF | 000D | 0108 | 0000 | 0000 | 0000 | 0010 | 0000 |
| 0000673340 | 0000 | 0000 | 0000 | 0000 | 765F | 6265 | 6E6C | 006B |
| 0000673360 | 0040 | 0000 | FFFF | 000D | 0108 | 0000 | 0000 | 0000 |
| 0000673400 | 0010 | 0000 | 0000 | 0000 | 0000 | 0000 | 765F | 6273 |
| 0000673420 | 6E6C | 006B | 0050 | 0000 | FFFF | 000D | 0108 | 0000 |
| 0000673440 | 0000 | 0000 | 0010 | 0000 | 0000 | 0000 | 0000 | 0000 |
| 0000673460 | 0000 | 0000 | 4472 | 0000 | 0060 | 0000 | FFFF | 000D |
| 0000673500 | 0108 | 0000 | 0000 | 0000 | 0010 | 0000 | 0000 | 0000 |
| 0000673520 | 0000 | 0000 | 665F | 6468 | 7369 | 0070 | 0070 | 0000 |
| 0000673540 | FFFF | 000D | 0108 | 0000 | 0000 | 0000 | 0010 | 0000 |
| 0000673560 | 0000 | 0000 | 0000 | 0000 | 6D5F | 5F62 | 6973 | 657A |
| 0000673600 | 0080 | 0000 | FFFF | 000F | 0108 | 0000 | 0000 | 0000 |
| 0000673620 | 0020 | 0000 | 0000 | 0000 | 0000 | 0000 | 0000 | 0000 |
| 0000673640 | 447D | 0000 | 00A0 | 0000 | FFFF | 000D | 0108 | 0000 |
| 0000673660 | 0000 | 0000 | 0010 | 0000 | 0000 | 0000 | 0000 | 0000 |
| 0000673700 | 0000 | 0000 | 4487 | 0000 | 00B0 | 0000 | FFFF | 000D |
| 0000673720 | 0108 | 0000 | 0000 | 0000 | 0010 | 0000 | 0000 | 0000 |
| 0000673740 | 0000 | 0000 | 0000 | 000D | 4491 | 0000 | 00C0 | 0000 |
| 0000673760 | FFFF | 000D | 0108 | 0000 | 0000 | 0000 | 0010 | 0000 |
| 0000674000 | 0000 | 0000 | 0000 | 0000 | 0000 | 0000 | 449C | 0000 |
| 0000674020 | 00D0 | 0000 | FFFF | 000D | 0108 | 0000 | 0000 | 0000 |
| 0000674040 | 0010 | 0000 | 0000 | 0000 | 0000 | 0000 | 0000 | 0000 |
| 0000674060 | 44A6 | 0000 | 00E0 | 0000 | FFFF | 000F | 0108 | 0000 |
| 0000674100 | 0000 | 0000 | 0020 | 0000 | 0000 | 0000 | 0000 | 0000 |
| 0000674120 | 0000 | 0000 | 44B3 | 0000 | 0100 | 0000 | FFFF | 000F |
| 0000674140 | 0108 | 0000 | 0000 | 0000 | 0020 | 0000 | 0000 | 0000 |
| 0000674160 | 0000 | 0000 | 0000 | 0000 | 44C5 | 0000 | 0120 | 0000 |
| 0000674200 | FFFF | 000F | 0108 | 0000 | 0000 | 0000 | 0020 | 0000 |
| 0000674220 | 0000 | 0000 | 0000 | 0000 | 0000 | 0000 | 44D4 | 0000 |
| 0000674240 | 0140 | 0000 | FFFF | 000F | 0108 | 0000 | 0000 | 0000 |

THU MAR 14 17:37:32 1991 GSPMON.4 PAGE 242, LINE 14220

| | | | | | | | | |
|---|---|---|---|---|---|---|---|---|
| 0000674260 | 0020 | 0000 | 0000 | 0000 | 0000 | 0000 | 0000 | 0000 |
| 0000674300 | 44EA | 0000 | 0160 | 0000 | FFFF | 000D | 0108 | 0000 |
| 0000674320 | 0000 | 0000 | 0010 | 0000 | 0000 | 0000 | 0000 | 0000 |
| 0000674340 | 0000 | 0000 | 44F5 | 0000 | 0170 | 0000 | FFFF | 000D |
| 0000674360 | 0108 | 0000 | 0000 | 0000 | 0010 | 0000 | 0000 | 0000 |
| 0000674400 | 0000 | 0000 | 0000 | 0000 | 4509 | 0000 | 0180 | 0000 |
| 0000674420 | FFFF | 000D | 0108 | 0000 | 0000 | 0000 | 0010 | 0000 |
| 0000674440 | 0000 | 0000 | 0000 | 0000 | 0000 | 0000 | 451D | 0000 |
| 0000674460 | 0190 | 0000 | FFFF | 000F | 0108 | 0000 | 0000 | 0000 |
| 0000674500 | 0020 | 0000 | 0000 | 0000 | 0000 | 0000 | 0000 | 0000 |
| 0000674520 | 452C | 0000 | 01B0 | 0000 | FFFF | 000D | 0108 | 0000 |
| 0000674540 | 0000 | 0000 | 0010 | 0000 | 0000 | 0000 | 0000 | 0000 |
| 0000674560 | 652E | 736F | 0000 | 0000 | 0000 | 0000 | FFFE | 0008 |
| 0000674600 | 0166 | 1FF4 | 0000 | 0000 | 01C0 | 0000 | 0000 | [illegible] |
| 0000674620 | 0000 | 0000 | 332E | 6166 | 656B | 0000 | 0000 | 0000 |
| 0000674640 | FFFE | 0008 | 010A | 0000 | 0000 | 0000 | 0050 | 0000 |
| 0000674660 | 0000 | 202E | 0000 | 0000 | 6D5F | 6773 | 705F | 7274 |
| 0000674700 | 0000 | 0000 | FFFF | 0010 | 0108 | 0000 | 0000 | 0000 |
| 0000674720 | 0020 | 0000 | 0000 | 0000 | 0000 | 0000 | 0000 | 0000 |
| 0000674740 | 4538 | 0000 | 0020 | 0000 | FFFF | 000F | 0108 | 0000 |
| 0000674760 | 0000 | 0000 | 0020 | 0000 | 0000 | 0000 | 0000 | 0000 |
| 0000675000 | 0000 | 0000 | 4542 | 0000 | 0040 | 0000 | FFFF | 000D |
| 0000675020 | 0108 | 0000 | 0000 | 0000 | 0010 | 0000 | 0000 | 0000 |
| 0000675040 | 0000 | 0000 | 652E | 736F | 0000 | 0000 | 0000 | 0000 |
| 0000675060 | FFFE | 0008 | 0166 | 2024 | 0000 | 0000 | 0050 | 0000 |
| 0000675100 | 0000 | 0000 | 0000 | 0000 | 342E | 6166 | 656B | 0000 |
| 0000675120 | 0000 | 0000 | FFFE | 0008 | 010A | 0000 | 0000 | 0000 |
| 0000675140 | 0040 | 0000 | 0000 | 203A | 0000 | 0000 | 0000 | 0000 |
| 0000675160 | 454D | 0000 | 0000 | 0000 | FFFF | 000D | 0108 | 0000 |
| 0000675200 | 0000 | 0000 | 0010 | 0000 | 0000 | 0000 | 0000 | 0000 |
| 0000675220 | 6A5F | 6D75 | 0070 | 0000 | 0010 | 0000 | FFFF | 000D |
| 0000675240 | 0108 | 0000 | 0000 | 0000 | 0010 | 0000 | 0000 | 0000 |
| 0000675260 | 0000 | 0000 | 735F | 6174 | 7472 | 0000 | 0020 | 0000 |
| 0000675300 | FFFF | 000D | 0108 | 0000 | 0000 | 0000 | 0010 | 0000 |
| 0000675320 | 0000 | 0000 | 0000 | 0000 | 655F | 646E | 0000 | 0000 |
| 0000675340 | 0030 | 0000 | FFFF | 000D | 0108 | 0000 | 0000 | 0000 |
| 0000675360 | 0010 | 0000 | 0000 | 0000 | 0000 | 0000 | 652E | 736F |
| 0000675400 | 0000 | 0000 | 0000 | 0000 | FFFE | 0008 | 0166 | 202E |
| 0000675420 | 0000 | 0000 | 0040 | 0000 | 0000 | 0000 | 0000 | 0000 |
| 0000675440 | 352E | 6166 | 656B | 0000 | 0000 | 0000 | FFFE | 0008 |
| 0000675460 | 010A | 0000 | 0000 | 0000 | 0080 | 0000 | 0000 | 2042 |
| 0000675500 | 0000 | 0000 | 685F | 0000 | 0000 | 0000 | 0000 | 0000 |
| 0000675520 | FFFF | 0008 | 0108 | 202E | 0000 | 0000 | 0040 | 0000 |
| 0000675540 | 0000 | 0000 | 0000 | 0000 | 765F | 0000 | 0000 | 0000 |
| 0000675560 | 0040 | 0000 | FFFF | 0008 | 0108 | 202E | 0000 | 0000 |
| 0000675600 | 0040 | 0000 | 0000 | 0000 | 0000 | 0000 | 652E | 736F |
| 0000675620 | 0000 | 0000 | 0000 | 0000 | FFFE | 0008 | 0166 | 203A |
| 0000675640 | 0000 | 0000 | 0080 | 0000 | 0000 | 0000 | 0000 | 0000 |
| 0000675660 | 362E | 6166 | 656B | 0000 | 0000 | 0000 | FFFE | 0009 |
| 0000675700 | 010C | 0000 | 0000 | 0000 | 0200 | 0000 | 0000 | 204C |
| 0000675720 | 0000 | 0000 | 635F | 6B68 | 7573 | 006D | 0000 | 0000 |
| 0000675740 | FFFF | 003D | 010B | 0000 | 0000 | 0000 | 0200 | 0020 |
| 0000675760 | 0000 | 0000 | 0000 | 0000 | 655F | 7272 | 6E63 | 0074 |
| 0000676000 | 0000 | 0000 | FFFF | 003D | 010B | 0000 | 0000 | 0000 |
| 0000676020 | 0200 | 0020 | 0000 | 0000 | 0000 | 0000 | 635F | 6372 |
| 0000676040 | 3233 | 0000 | 0000 | 0000 | FFFF | 003D | 010B | 0000 |
| 0000676060 | 0000 | 0000 | 0200 | 0020 | 0000 | 0000 | 0000 | 0000 |
| 0000676100 | 652E | 736F | 0000 | 0000 | 0000 | 0000 | FFFE | 0009 |
| 0000676120 | 0166 | 2042 | 0000 | 0000 | 0200 | 0000 | 0000 | 0000 |

THU MAR 14 17:37:32 1991 GSPMON.4 PAGE 243, LINE 14279

| | | | | | | | | |
|---|---|---|---|---|---|---|---|---|
| 0000676140 | 0000 | 0000 | 372E | 6166 | 656B | 0000 | 0000 | 0000 |
| 0000676160 | FFFE | 0008 | 010A | 0000 | 0000 | 0000 | 0240 | 0000 |
| 0000676200 | 0000 | 2054 | 0000 | 0000 | 0000 | 0000 | 4559 | 0000 |
| 0000676220 | 0000 | 0000 | FFFF | 0008 | 0108 | 202E | 0000 | 0000 |
| 0000676240 | 0040 | 0000 | 0000 | 0000 | 0000 | 0000 | 0000 | 0000 |
| 0000676260 | 4566 | 0000 | 0040 | 0000 | FFFF | 0009 | 0108 | 2042 |
| 0000676300 | 0000 | 0000 | 0200 | 0000 | 0000 | 0000 | 0000 | 0000 |
| 0000676320 | 652E | 736F | 0000 | 0000 | 0000 | 0000 | FFFE | 0008 |
| 0000676340 | 0166 | 204C | 0000 | 0000 | 0240 | 0000 | 0000 | 0000 |
| 0000676360 | 0000 | 0000 | 382E | 6166 | 656B | 0000 | 0000 | 0000 |
| 0000676400 | FFFE | 0009 | 010C | 0000 | 0000 | 0000 | 4000 | 0000 |
| 0000676420 | 0000 | 205E | 0000 | 0000 | 635F | 6B68 | 7573 | 006D |
| 0000676440 | 0000 | 0000 | FFFF | 00FD | 010B | 0000 | 0000 | 0000 |
| 0000676460 | 4000 | 0020 | 0020 | 0000 | 0000 | 0000 | 655F | 7272 |
| 0000676500 | 6E63 | 0074 | 0000 | 0000 | FFFF | 00FD | 010B | 0000 |
| 0000676520 | 0000 | 0000 | 4000 | 0020 | 0020 | 0000 | 0000 | 0000 |
| 0000676540 | 635F | 6372 | 3233 | 0000 | 0000 | 0000 | FFFF | 00FD |
| 0000676560 | 010B | 0000 | 0000 | 0000 | 4000 | 0020 | 0020 | 0000 |
| 0000676600 | 0000 | 0000 | 652E | 736F | 0000 | 0000 | 0000 | 0000 |
| 0000676620 | FFFE | 0009 | 0166 | 2054 | 0000 | 0000 | 4000 | 0000 |
| 0000676640 | 0000 | 0000 | 0000 | 0000 | 392E | 6166 | 656B | 0000 |
| 0000676660 | 0000 | 0000 | FFFE | 0008 | 010A | 0000 | 0000 | 0000 |
| 0000676700 | 4080 | 0000 | 0000 | 2068 | 0000 | 0000 | 0000 | 0000 |
| 0000676720 | 4572 | 0000 | 0000 | 0000 | FFFF | 0008 | 0108 | 202E |
| 0000676740 | 0000 | 0000 | 0040 | 0000 | 0000 | 0000 | 0000 | 0000 |
| 0000676760 | 0000 | 0000 | 457F | 0000 | 0040 | 0000 | FFFF | 0008 |
| 0000677000 | 0108 | 202E | 0000 | 0000 | 0040 | 0000 | 0000 | 0000 |
| 0000677020 | 0000 | 0000 | 0000 | 0000 | 458B | 0000 | 0080 | 0000 |
| 0000677040 | FFFF | 0009 | 0108 | 2054 | 0000 | 0000 | 4000 | 0000 |
| 0000677060 | 0000 | 0000 | 0000 | 0000 | 652E | 736F | 0000 | 0000 |
| 0000677100 | 0000 | 0000 | FFFE | 0008 | 0166 | 205E | 0000 | 0000 |
| 0000677120 | 4080 | 0000 | 0000 | 0000 | 0000 | 0000 | 312E | 6630 |
| 0000677140 | 6B61 | 0065 | 0000 | 0000 | FFFE | 0009 | 010C | 0000 |
| 0000677160 | 0000 | 0000 | 0090 | 0000 | 0000 | 2072 | 0000 | 0000 |
| 0000677200 | 635F | 6B68 | 7573 | 006D | 0000 | 0000 | FFFF | 00FD |
| 0000677220 | 010B | 0000 | 0000 | 0000 | 0090 | 0003 | 0003 | 0000 |
| 0000677240 | 0000 | 0000 | 655F | 7272 | 6E63 | 0074 | 0000 | 0000 |
| 0000677260 | FFFF | 00FD | 010B | 0000 | 0000 | 0000 | 0090 | 0003 |
| 0000677300 | 0003 | 0000 | 0000 | 0000 | 625F | 7263 | 3363 | 0032 |
| 0000677320 | 0000 | 0000 | FFFF | 00FD | 010B | 0000 | 0000 | 0000 |
| 0000677340 | 0090 | 0003 | 0003 | 0000 | 0000 | 0000 | 652E | 736F |
| 0000677360 | 0000 | 0000 | 0000 | 0000 | FFFE | 0009 | 0166 | 2068 |
| 0000677400 | 0000 | 0000 | 0090 | 0000 | 0000 | 0000 | 0000 | 0000 |
| 0000677420 | 312E | 6631 | 6B61 | 0065 | 0000 | 0000 | FFFE | 0008 |
| 0000677440 | 010A | 0000 | 0000 | 0000 | 0130 | 0000 | 0000 | 2080 |
| 0000677460 | 0000 | 0000 | 0000 | 0000 | 4595 | 0000 | 0000 | 0000 |
| 0000677500 | FFFF | 0008 | 0108 | 202E | 0000 | 0000 | 0040 | 0000 |
| 0000677520 | 0000 | 0000 | 0000 | 0000 | 0000 | 0000 | 45A2 | 0000 |
| 0000677540 | 0040 | 0000 | FFFF | 0008 | 0108 | 202E | 0000 | 0000 |
| 0000677560 | 0040 | 0000 | 0000 | 0000 | 0000 | 0000 | 785F | 635F |
| 0000677600 | 6F6F | 6472 | 0080 | 0000 | FFFF | 0003 | 0108 | 0000 |
| 0000677620 | 0000 | 0000 | 0010 | 0000 | 0000 | 0000 | 0000 | 0000 |
| 0000677640 | 795F | 635F | 6F6F | 6472 | 0090 | 0000 | FFFF | 0003 |
| 0000677660 | 0108 | 0000 | 0000 | 0000 | 0010 | 0000 | 0000 | 0000 |
| 0000677700 | 0000 | 0000 | 0000 | 0000 | 45AE | 0000 | 00A0 | 0000 |
| 0000677720 | FFFF | 0009 | 0108 | 2068 | 0000 | 0000 | 0090 | 0000 |
| 0000677740 | 0000 | 0000 | 0000 | 0000 | 652E | 736F | 0000 | 0000 |
| 0000677760 | 0000 | 0000 | FFFE | 0008 | 0166 | 2072 | 0000 | 0000 |
| 0000700000 | 0130 | 0000 | 0000 | 0000 | 0000 | 0000 | 312E | 6632 |

THU MAR 14 17:37:32 1991 GSPMON.4 PAGE 244, LINE 14338

| | | | | | | | | |
|---|---|---|---|---|---|---|---|---|
| 0000700020 | 6B61 | 0065 | 0000 | 0000 | FFFE | 0008 | 010A | 0000 |
| 0000700040 | 0000 | 0000 | 0050 | 0000 | 0000 | 208C | 0000 | 0000 |
| 0000700060 | 0000 | 0000 | 45B8 | 0000 | 0000 | 0000 | FFFF | 000D |
| 0000700100 | 0108 | 0000 | 0000 | 0000 | 0010 | 0000 | 0000 | 0000 |
| 0000700120 | 0000 | 0000 | 0000 | 0000 | 45D0 | 0000 | 0010 | 0000 |
| 0000700140 | FFFF | 000D | 0108 | 0000 | 0000 | 0000 | 0010 | 0000 |
| 0000700160 | 0000 | 0000 | 0000 | 0000 | 0000 | 0000 | 45E2 | 0000 |
| 0000700200 | 0020 | 0000 | FFFF | 000D | 0108 | 0000 | 0000 | 0000 |
| 0000700220 | 0010 | 0000 | 0000 | 0000 | 0000 | 0000 | 0000 | 0000 |
| 0000700240 | 45ED | 0000 | 0030 | 0000 | FFFF | 0010 | 0108 | 0000 |
| 0000700260 | 0000 | 0000 | 0020 | 0000 | 0000 | 0000 | 0000 | 0000 |
| 0000700300 | 652E | 736F | 0000 | 0000 | 0000 | 0000 | FFFE | 0008 |
| 0000700320 | 0166 | 2080 | 0000 | 0000 | 0050 | 0000 | 0000 | 0000 |
| 0000700340 | 0000 | 0000 | 312E | 6633 | 6B61 | 0065 | 0000 | 0000 |
| 0000700360 | FFFE | 0008 | 010A | 0000 | 0000 | 0000 | 0040 | 0000 |
| 0000700400 | 0000 | 2094 | 0000 | 0000 | 0000 | 0000 | 45F7 | 0000 |
| 0000700420 | 0000 | 0000 | FFFF | 0005 | 0108 | 0000 | 0000 | 0000 |
| 0000700440 | 0020 | 0000 | 0000 | 0000 | 0000 | 0000 | 0000 | 0000 |
| 0000700460 | 4607 | 0000 | 0020 | 0000 | FFFF | 0005 | 0108 | 0000 |
| 0000700500 | 0000 | 0000 | 0020 | 0000 | 0000 | 0000 | 0000 | 0000 |
| 0000700520 | 652E | 736F | 0000 | 0000 | 0000 | 0000 | FFFE | 0008 |
| 0000700540 | 0166 | 208C | 0000 | 0000 | 0040 | 0000 | 0000 | 0000 |
| 0000700560 | 0000 | 0000 | 312E | 6634 | 6B61 | 0065 | 0000 | 0000 |
| 0000700600 | FFFE | 0008 | 010A | 0000 | 0000 | 0000 | 0050 | 0000 |
| 0000700620 | 0000 | 20A2 | 0000 | 0000 | 785F | 656C | 7466 | 0000 |
| 0000700640 | 0000 | 0000 | FFFF | 0003 | 0108 | 0000 | 0000 | 0000 |
| 0000700660 | 0010 | 0000 | 0000 | 0000 | 0000 | 0000 | 795F | 6F74 |
| 0000700700 | 0070 | 0000 | 0010 | 0000 | FFFF | 0003 | 0108 | 0000 |
| 0000700720 | 0000 | 0000 | 0010 | 0000 | 0000 | 0000 | 0000 | 0000 |
| 0000700740 | 785F | 6972 | 6867 | 0074 | 0020 | 0000 | FFFF | 0003 |
| 0000700760 | 0108 | 0000 | 0000 | 0000 | 0010 | 0000 | 0000 | 0000 |
| 0000701000 | 0000 | 0000 | 795F | 6F64 | 6E77 | 0000 | 0030 | 0000 |
| 0000701020 | FFFF | 0003 | 0108 | 0000 | 0000 | 0000 | 0010 | 0000 |
| 0000701040 | 0000 | 0000 | 0000 | 0000 | 0000 | 0000 | 4616 | 0000 |
| 0000701060 | 0040 | 0000 | FFFF | 0003 | 0108 | 0000 | 0000 | 0000 |
| 0000701100 | 0010 | 0000 | 0000 | 0000 | 0000 | 0000 | 652E | 736F |
| 0000701120 | 0000 | 0000 | 0000 | 0000 | FFFE | 0008 | 0166 | 2094 |
| 0000701140 | 0000 | 0000 | 0050 | 0000 | 0000 | 0000 | 0000 | 0000 |
| 0000701160 | 312E | 6635 | 6B61 | 0065 | 0000 | 0000 | FFFE | 0008 |
| 0000701200 | 010A | 0000 | 0000 | 0000 | 0020 | 0000 | 0000 | 20AA |
| 0000701220 | 0000 | 0000 | 0000 | 0000 | 4620 | 0000 | 0000 | 0000 |
| 0000701240 | FFFF | 0003 | 0108 | 0000 | 0000 | 0000 | 0010 | 0000 |
| 0000701260 | 0000 | 0000 | 0000 | 0000 | 0000 | 0000 | 462C | 0000 |
| 0000701300 | 0010 | 0000 | FFFF | 0003 | 0108 | 0000 | 0000 | 0000 |
| 0000701320 | 0010 | 0000 | 0000 | 0000 | 0000 | 0000 | 652E | 736F |
| 0000701340 | 0000 | 0000 | 0000 | 0000 | FFFE | 0008 | 0166 | 20A2 |
| 0000701360 | 0000 | 0000 | 0020 | 0000 | 0000 | 0000 | 0000 | 0000 |
| 0000701400 | 312E | 6636 | 6B61 | 0065 | 0000 | 0000 | FFFE | 0008 |
| 0000701420 | 010A | 0000 | 0000 | 0000 | 0040 | 0000 | 0000 | 20B6 |
| 0000701440 | 0000 | 0000 | 0000 | 0000 | 4636 | 0000 | 0000 | 0000 |
| 0000701460 | FFFF | 000D | 0108 | 0000 | 0000 | 0000 | 0010 | 0000 |
| 0000701500 | 0000 | 0000 | 0000 | 0000 | 0000 | 0000 | 4649 | 0000 |
| 0000701520 | 0010 | 0000 | FFFF | 000D | 0108 | 0000 | 0000 | 0000 |
| 0000701540 | 0010 | 0000 | 0000 | 0000 | 0000 | 0000 | 0000 | 0000 |
| 0000701560 | 465B | 0000 | 0020 | 0000 | FFFF | 000D | 0108 | 0000 |
| 0000701600 | 0000 | 0000 | 0010 | 0000 | 0000 | 0000 | 0000 | 0000 |
| 0000701620 | 0000 | 0000 | 4668 | 0000 | 0030 | 0000 | FFFF | 000D |
| 0000701640 | 0108 | 0000 | 0000 | 0000 | 0010 | 0000 | 0000 | 0000 |
| 0000701660 | 0000 | 0000 | 652E | 736F | 0000 | 0000 | 0000 | 0000 |

THU MAR 14 17:37:32 1991 GSPMON.4 PAGE 245, LINE 14397

| | | | | | | | | |
|---|---|---|---|---|---|---|---|---|
| 0000701700 | FFFE | 0008 | 0166 | 20AA | 0000 | 0000 | 0040 | 0000 |
| 0000701720 | 0000 | 0000 | 0000 | 0000 | 662E | 6C69 | 0065 | 0000 |
| 0000701740 | 20B8 | 0000 | FFFE | 0000 | 0167 | 7067 | 695F | 746E |
| 0000701760 | 2E72 | 0063 | 0000 | 0000 | 0000 | 0000 | 662E | 6C69 |
| 0000702000 | 0065 | 0000 | 2124 | 0000 | FFFE | 0000 | 0167 | 7067 |
| 0000702020 | 6D5F | 756F | 682E | 0000 | 0000 | 0000 | 0000 | 0000 |
| 0000702040 | 312E | 6637 | 6B61 | 0065 | 0000 | 0000 | FFFE | 0008 |
| 0000702060 | 010A | 0000 | 0000 | 0000 | 0060 | 0000 | 0000 | 20C4 |
| 0000702100 | 0000 | 0000 | 0000 | 0000 | 4676 | 0000 | 0000 | 0000 |
| 0000702120 | FFFF | 000F | 0108 | 0000 | 0000 | 0000 | 0020 | 0000 |
| 0000702140 | 0000 | 0000 | 0000 | 0000 | 0000 | 0000 | 4683 | 0000 |
| 0000702160 | 0020 | 0000 | FFFF | 000F | 0108 | 0000 | 0000 | 0000 |
| 0000702200 | 0020 | 0000 | 0000 | 0000 | 0000 | 0000 | 0000 | 0000 |
| 0000702220 | 4699 | 0000 | 0040 | 0000 | FFFF | 000F | 0108 | 0000 |
| 0000702240 | 0000 | 0000 | 0020 | 0000 | 0000 | 0000 | 0000 | 0000 |
| 0000702260 | 652E | 736F | 0000 | 0000 | 0000 | 0000 | FFFE | 0008 |
| 0000702300 | 0166 | 20BA | 0000 | 0000 | 0060 | 0000 | 0000 | 0000 |
| 0000702320 | 0000 | 0000 | 312E | 6638 | 6B61 | 0065 | 0000 | 0000 |
| 0000702340 | FFFE | 0008 | 010A | 0000 | 0000 | 0000 | 00C0 | 0000 |
| 0000702360 | 0000 | 20DE | 0000 | 0000 | 635F | 0078 | 0000 | 0000 |
| 0000702400 | 0000 | 0000 | FFFF | 000D | 0108 | 0000 | 0000 | 0000 |
| 0000702420 | 0010 | 0000 | 0000 | 0000 | 0000 | 0000 | 635F | 0079 |
| 0000702440 | 0000 | 0000 | 0010 | 0000 | FFFF | 000D | 0108 | 0000 |
| 0000702460 | 0000 | 0000 | 0010 | 0000 | 0000 | 0000 | 0000 | 0000 |
| 0000702500 | 785F | 0031 | 0000 | 0000 | 0020 | 0000 | FFFF | 0003 |
| 0000702520 | 0108 | 0000 | 0000 | 0000 | 0010 | 0000 | 0000 | 0000 |
| 0000702540 | 0000 | 0000 | 795F | 0031 | 0000 | 0000 | 0030 | 0000 |
| 0000702560 | FFFF | 0003 | 0108 | 0000 | 0000 | 0000 | 0010 | 0000 |
| 0000702600 | 0000 | 0000 | 0000 | 0000 | 785F | 0032 | 0000 | 0000 |
| 0000702620 | 0040 | 0000 | FFFF | 0003 | 0108 | 0000 | 0000 | 0000 |
| 0000702640 | 0010 | 0000 | 0000 | 0000 | 0000 | 0000 | 795F | 0032 |
| 0000702660 | 0000 | 0000 | 0050 | 0000 | FFFF | 0003 | 0108 | 0000 |
| 0000702700 | 0000 | 0000 | 0010 | 0000 | 0000 | 0000 | 0000 | 0000 |
| 0000702720 | 685F | 5F70 | 0078 | 0000 | 0060 | 0000 | FFFF | 0003 |
| 0000702740 | 0108 | 0000 | 0000 | 0000 | 0010 | 0000 | 0000 | 0000 |
| 0000702760 | 0000 | 0000 | 685F | 5F70 | 0079 | 0000 | 0070 | 0000 |
| 0000703000 | FFFF | 0003 | 0108 | 0000 | 0000 | 0000 | 0010 | 0000 |
| 0000703020 | 0000 | 0000 | 0000 | 0000 | 0000 | 0000 | 46AA | 0000 |
| 0000703040 | 0080 | 0000 | FFFF | 000F | 0108 | 0000 | 0000 | 0000 |
| 0000703060 | 0020 | 0000 | 0000 | 0000 | 0000 | 0000 | 0000 | 0000 |
| 0000703100 | 46BA | 0000 | 00A0 | 0000 | FFFF | 000D | 0108 | 0000 |
| 0000703120 | 0000 | 0000 | 0010 | 0000 | 0000 | 0000 | 0000 | 0000 |
| 0000703140 | 0000 | 0000 | 46C9 | 0000 | 00B0 | 0000 | FFFF | 000D |
| 0000703160 | 0108 | 0000 | 0000 | 0000 | 0010 | 0000 | 0000 | 0000 |
| 0000703200 | 0000 | 0000 | 652E | 736F | 0000 | 0000 | 0000 | 0000 |
| 0000703220 | FFFE | 0008 | 0166 | 20C4 | 0000 | 0000 | 00C0 | 0000 |
| 0000703240 | 0000 | 0000 | 0000 | 0000 | 312E | 6639 | 6B61 | 0065 |
| 0000703260 | 0000 | 0000 | FFFE | 0008 | 010A | 0000 | 0000 | 0000 |
| 0000703300 | 0030 | 0000 | 0000 | 20E8 | 0000 | 0000 | 785F | 0000 |
| 0000703320 | 0000 | 0000 | 0000 | 0000 | FFFF | 0003 | 0108 | 0000 |
| 0000703340 | 0000 | 0000 | 0010 | 0000 | 0000 | 0000 | 0000 | 0000 |
| 0000703360 | 795F | 0000 | 0000 | 0000 | 0010 | 0000 | FFFF | 0003 |
| 0000703400 | 0108 | 0000 | 0000 | 0000 | 0010 | 0000 | 0000 | 0000 |
| 0000703420 | 0000 | 0000 | 695F | 6F63 | 5F6E | 6469 | 0020 | 0000 |
| 0000703440 | FFFF | 0003 | 0108 | 0000 | 0000 | 0000 | 0010 | 0000 |
| 0000703460 | 0000 | 0000 | 0000 | 0000 | 652E | 736F | 0000 | 0000 |
| 0000703500 | 0000 | 0000 | FFFE | 0008 | 0166 | 20DE | 0000 | 0000 |
| 0000703520 | 0030 | 0000 | 0000 | 0000 | 0000 | 0000 | 322E | 6630 |
| 0000703540 | 6B61 | 0065 | 0000 | 0000 | FFFE | 0008 | 010A | 0000 |

THU MAR 14 17:37:32 1991 GSPMON.4 PAGE 246, LINE 14456

| | | | | | | | | |
|---|---|---|---|---|---|---|---|---|
| 0000703560 | 0000 | 0000 | 0070 | 0000 | 0000 | 20FA | 0000 | 0000 |
| 0000703600 | 785F | 0000 | 0000 | 0000 | 0000 | 0000 | FFFF | 000D |
| 0000703620 | 0108 | 0000 | 0000 | 0000 | 0010 | 0000 | 0000 | 0000 |
| 0000703640 | 0000 | 0000 | 795F | 0000 | 0000 | 0000 | 0010 | 0000 |
| 0000703660 | FFFF | 000D | 0108 | 0000 | 0000 | 0000 | 0010 | 0000 |
| 0000703700 | 0000 | 0000 | 0000 | 0000 | 695F | 6F63 | 5F6E | 6469 |
| 0000703720 | 0020 | 0000 | FFFF | 000D | 0108 | 0000 | 0000 | 0000 |
| 0000703740 | 0010 | 0000 | 0000 | 0000 | 0000 | 0000 | 6C5F | 6665 |
| 0000703760 | 0074 | 0000 | 0030 | 0000 | FFFF | 000D | 0108 | 0000 |
| 0000704000 | 0000 | 0000 | 0010 | 0000 | 0000 | 0000 | 0000 | 0000 |
| 0000704020 | 725F | 6769 | 7468 | 0000 | 0040 | 0000 | FFFF | 000D |
| 0000704040 | 0108 | 0000 | 0000 | 0000 | 0010 | 0000 | 0000 | 0000 |
| 0000704060 | 0000 | 0000 | 755F | 0070 | 0000 | 0000 | 0050 | 0000 |
| 0000704100 | FFFF | 000D | 0108 | 0000 | 0000 | 0000 | 0010 | 0000 |
| 0000704120 | 0000 | 0000 | 0000 | 0000 | 645F | 776F | 006E | 0000 |
| 0000704140 | 0060 | 0000 | FFFF | 000D | 0108 | 0000 | 0000 | 0000 |
| 0000704160 | 0010 | 0000 | 0000 | 0000 | 0000 | 0000 | 652E | 736F |
| 0000704200 | 0000 | 0000 | 0000 | 0000 | FFFE | 0008 | 0166 | 20E8 |
| 0000704220 | 0000 | 0000 | 0070 | 0000 | 0000 | 0000 | 0000 | 0000 |
| 0000704240 | 322E | 6631 | 6B61 | 0065 | 0000 | 0000 | FFFE | 0008 |
| 0000704260 | 010A | 0000 | 0000 | 0000 | 0020 | 0000 | 0000 | 2102 |
| 0000704300 | 0000 | 0000 | 6D5F | 646F | 0065 | 0000 | 0000 | 0000 |
| 0000704320 | FFFF | 000D | 0108 | 0000 | 0000 | 0000 | 0010 | 0000 |
| 0000704340 | 0000 | 0000 | 0000 | 0000 | 725F | 7365 | 6C75 | 0074 |
| 0000704360 | 0010 | 0000 | FFFF | 000D | 0108 | 0000 | 0000 | 0000 |
| 0000704400 | 0010 | 0000 | 0000 | 0000 | 0000 | 0000 | 652E | 736F |
| 0000704420 | 0000 | 0000 | 0000 | 0000 | FFFE | 0008 | 0166 | 20FA |
| 0000704440 | 0000 | 0000 | 0020 | 0000 | 0000 | 0000 | 0000 | 0000 |
| 0000704460 | 322E | 6632 | 6361 | 0065 | 0000 | 0000 | FFFE | 0008 |
| 0000704500 | 010A | 0000 | 0000 | 0000 | 0020 | 0000 | 0000 | 210E |
| 0000704520 | 0000 | 0000 | 0000 | 0000 | 46DA | 0000 | 0000 | 0000 |
| 0000704540 | FFFF | 000C | 0108 | 0000 | 0000 | 0000 | 0008 | 0000 |
| 0000704560 | 0000 | 0000 | 0000 | 0000 | 0000 | 0000 | 46E6 | 0000 |
| 0000704600 | 0008 | 0000 | FFFF | 000C | 0108 | 0000 | 0000 | 0000 |
| 0000704620 | 0008 | 0000 | 0000 | 0000 | 0000 | 0000 | 0000 | 0000 |
| 0000704640 | 46F1 | 0000 | 0010 | 0000 | FFFF | 000C | 0108 | 0000 |
| 0000704660 | 0000 | 0000 | 0008 | 0000 | 0000 | 0000 | 0000 | 0000 |
| 0000704700 | 0000 | 0000 | 46FC | 0000 | 0018 | 0000 | FFFF | 000C |
| 0000704720 | 0108 | 0000 | 0000 | 0000 | 0008 | 0000 | 0000 | 0000 |
| 0000704740 | 0000 | 0000 | 652E | 736F | 0000 | 0000 | 0000 | 0000 |
| 0000704760 | FFFE | 0008 | 0166 | 2102 | 0000 | 0000 | 0020 | 0000 |
| 0000705000 | 0000 | 0000 | 0000 | 0000 | 322E | 6633 | 6B61 | 0065 |
| 0000705020 | 0000 | 0000 | FFFE | 0008 | 010A | 0000 | 0000 | 0000 |
| 0000705040 | 0020 | 0000 | 0000 | 2118 | 0000 | 0000 | 615F | 7474 |
| 0000705060 | 0072 | 0000 | 0000 | 0000 | FFFF | 000D | 0108 | 0000 |
| 0000705100 | 0000 | 0000 | 0010 | 0000 | 0000 | 0000 | 0000 | 0000 |
| 0000705120 | 735F | 7274 | 7069 | 0000 | 0010 | 0000 | FFFF | 000C |
| 0000705140 | 0108 | 0000 | 0000 | 0000 | 0008 | 0000 | 0000 | 0000 |
| 0000705160 | 0000 | 0000 | 725F | 6365 | 0074 | 0000 | 0018 | 0000 |
| 0000705200 | FFFF | 000C | 0108 | 0000 | 0000 | 0000 | 0008 | 0000 |
| 0000705220 | 0000 | 0000 | 0000 | 0000 | 652E | 736F | 0000 | 0000 |
| 0000705240 | 0000 | 0000 | FFFE | 0008 | 0166 | 210E | 0000 | 0000 |
| 0000705260 | 0020 | 0000 | 0000 | 0000 | 0000 | 0000 | 322E | 6634 |
| 0000705300 | 6B61 | 0065 | 0000 | 0000 | FFFE | 0008 | 010A | 0000 |
| 0000705320 | 0000 | 0000 | 1930 | 0000 | 0000 | 2124 | 0000 | 0000 |
| 0000705340 | 0000 | 0000 | 4706 | 0000 | 0000 | 0000 | FFFF | 000D |
| 0000705360 | 0108 | 0000 | 0000 | 0000 | 0010 | 0000 | 0000 | 0000 |
| 0000705400 | 0000 | 0000 | 785F | 0000 | 0000 | 0000 | 0010 | 0000 |
| 0000705420 | FFFF | 000D | 0108 | 0000 | 0000 | 0000 | 0010 | 0000 |

THU MAR 14 17:37:32 1991 GSPMON.4 PAGE 247, LINE 14515

| | | | | | | | | |
|---|---|---|---|---|---|---|---|---|
| 0000705440 | 0000 | 0000 | 0000 | 0000 | 795F | 0000 | 0000 | 0000 |
| 0000705460 | 0020 | 0000 | FFFF | 000D | 0108 | 0000 | 0000 | 0000 |
| 0000705500 | 0010 | 0000 | 0000 | 0000 | 0000 | 0000 | 0000 | 0000 |
| 0000705520 | 4710 | 0000 | 0030 | 0000 | FFFF | 0038 | 0108 | 210E |
| 0000705540 | 0000 | 0000 | 1900 | 00C8 | 0000 | 0000 | 0000 | 0000 |
| 0000705560 | 652E | 736F | 0000 | 0000 | 0000 | 0000 | FFFE | 0008 |
| 0000705600 | 0166 | 2118 | 0000 | 0000 | 1930 | 0000 | 0000 | 0000 |
| 0000705620 | 0000 | 0000 | 662E | 6C69 | 0065 | 0000 | 2126 | 0000 |
| 0000705640 | FFFE | 0000 | 0167 | 7067 | 695F | 746E | 2E72 | 0063 |
| 0000705660 | 0000 | 0000 | 0000 | 0000 | 662E | 6C69 | 0065 | 0000 |
| 0000705700 | 2132 | 0000 | FFFE | 0000 | 0167 | 7067 | 615F | 6C70 |
| 0000705720 | 682E | 0000 | 0000 | 0000 | 0000 | 0000 | 322E | 6635 |
| 0000705740 | 6B61 | 0065 | 0000 | 0000 | FFFE | 0008 | 010A | 0000 |
| 0000705760 | 0000 | 0000 | 0030 | 0000 | 0000 | 2132 | 0000 | 0000 |
| 0000706000 | 775F | 6469 | 6874 | 0000 | 0000 | 0000 | FFFF | 000D |
| 0000706020 | 0108 | 0000 | 0000 | 0000 | 0010 | 0000 | 0000 | 0000 |
| 0000706040 | 0000 | 0000 | 685F | 6965 | 6867 | 0074 | 0010 | 0000 |
| 0000706060 | FFFF | 000D | 0108 | 0000 | 0000 | 0000 | 0010 | 0000 |
| 0000706100 | 0000 | 0000 | 0000 | 0000 | 645F | 7065 | 6874 | 0000 |
| 0000706120 | 0020 | 0000 | FFFF | 000D | 0108 | 0000 | 0000 | 0000 |
| 0000706140 | 0010 | 0000 | 0000 | 0000 | 0000 | 0000 | 652E | 736F |
| 0000706160 | 0000 | 0000 | 0000 | 0000 | FFFE | 0008 | 0166 | 2128 |
| 0000706200 | 0000 | 0000 | 0030 | 0000 | 0000 | 0000 | 0000 | 0000 |
| 0000706220 | 662E | 6C69 | 0065 | 0000 | 2134 | 0000 | FFFE | 0000 |
| 0000706240 | 0167 | 7067 | 615F | 6C70 | 692E | 636E | 0000 | 0000 |
| 0000706260 | 0000 | 0000 | 662E | 6C69 | 0065 | 0000 | 2136 | 0000 |
| 0000706300 | FFFE | 0000 | 0167 | 7067 | 615F | 6C70 | 682E | 0000 |
| 0000706320 | 0000 | 0000 | 0000 | 0000 | 662E | 6C69 | 0065 | 0000 |
| 0000706340 | 2152 | 0000 | FFFE | 0000 | 0167 | 7067 | 695F | 746E |
| 0000706360 | 2E72 | 0063 | 0000 | 0000 | 0000 | 0000 | 0000 | 0000 |
| 0000706400 | 471C | 0000 | 6AF0 | FFD2 | 0003 | 000F | 0103 | 0000 |
| 0000706420 | 0000 | 0000 | 0020 | 0000 | 0000 | 0000 | 0000 | 0000 |
| 0000706440 | 635F | 695F | 746E | 3031 | 22E0 | FFC6 | 0001 | 0020 |
| 0000706460 | 0102 | 0000 | 0000 | 04C0 | 0000 | 328C | 0001 | 2142 |
| 0000706500 | 0000 | 0004 | 622E | 0066 | 0000 | 0000 | 22E0 | FFC6 |
| 0000706520 | 0001 | 0000 | 0165 | 0000 | 0000 | 0044 | 0000 | 0000 |
| 0000706540 | 0000 | 025A | 0000 | 0000 | 695F | 0000 | 0000 | 0000 |
| 0000706560 | 0000 | 0000 | FFFF | 0004 | 0101 | 0000 | 0000 | 0000 |
| 0000706600 | 0020 | 0000 | 0000 | 0000 | 0000 | 0000 | 652E | 0066 |
| 0000706620 | 0000 | 0000 | 27A0 | FFC6 | 0001 | 0000 | 0165 | 0000 |
| 0000706640 | 0000 | 0084 | 0000 | 0000 | 0000 | 0000 | 0000 | 0000 |
| 0000706660 | 635F | 695F | 746E | 3130 | 27A0 | FFC6 | 0001 | 0020 |
| 0000706700 | 0102 | 0000 | 0000 | 03E0 | 0000 | 32C8 | 0001 | 214A |
| 0000706720 | 0000 | 0002 | 622E | 0066 | 0000 | 0000 | 27A0 | FFC6 |
| 0000706740 | 0001 | 0000 | 0165 | 0000 | 0000 | 0097 | 0000 | 0000 |
| 0000706760 | 0000 | 0262 | 0000 | 0000 | 0000 | 0000 | 472A | 0000 |
| 0000707000 | 6B10 | FFD2 | 0003 | 000D | 0103 | 0000 | 0000 | 0000 |
| 0000707020 | 0010 | 0000 | 0000 | 0000 | 0000 | 0000 | 652E | 0066 |
| 0000707040 | 0000 | 0000 | 2B80 | FFC6 | 0001 | 0000 | 0165 | 0000 |
| 0000707060 | 0000 | 00B9 | 0000 | 0000 | 0000 | 0000 | 0000 | 0000 |
| 0000707100 | 742E | 7865 | 0074 | 0000 | 22E0 | FFC6 | 0001 | 0000 |
| 0000707120 | 0103 | 08A0 | 0000 | 0018 | 001A | 0000 | 0000 | 0000 |
| 0000707140 | 0000 | 0000 | 642E | 7461 | 0061 | 0000 | 0000 | 0000 |
| 0000707160 | 0004 | 0000 | 0103 | 0000 | 0000 | 0000 | 0000 | 0000 |
| 0000707200 | 0000 | 0000 | 0000 | 0000 | 622E | 7373 | 0000 | 0000 |
| 0000707220 | 6AA0 | FFD2 | 0003 | 0000 | 0103 | 0080 | 0000 | 0000 |
| 0000707240 | 0000 | 0000 | 0000 | 0000 | 0000 | 0000 | 632E | 6E69 |
| 0000707260 | 7469 | 0000 | CD90 | FFC6 | 0002 | 0000 | 0103 | 0160 |
| 0000707300 | 0000 | 0005 | 0000 | 0000 | 0000 | 0000 | 0000 | 0000 |

THU MAR 14 17:37:32 1991 GSPMON.4 PAGE 248, LINE 14574

| | | | | | | | | |
|---|---|---|---|---|---|---|---|---|
| 0000707320 | 662E | 6C69 | 0065 | 0000 | 2154 | 0000 | FFFE | 0000 |
| 0000707340 | 0167 | 7067 | 615F | 6C70 | 6369 | 632E | 0000 | 0000 |
| 0000707360 | 0000 | 0000 | 662E | 6C69 | 0065 | 0000 | 2156 | 0000 |
| 0000707400 | FFFE | 0000 | 0167 | 7473 | 6D64 | 682E | 0000 | 0000 |
| 0000707420 | 0000 | 0000 | 0000 | 0000 | 662E | 6C69 | 0065 | 0000 |
| 0000707440 | 2158 | 0000 | FFFE | 0000 | 0167 | 7067 | 615F | 6C70 |
| 0000707460 | 6369 | 632E | 0000 | 0000 | 0000 | 0000 | 662E | 6C69 |
| 0000707500 | 0065 | 0000 | 2162 | 0000 | FFFE | 0000 | 0167 | 7473 |
| 0000707520 | 6C64 | 6269 | 682E | 0000 | 0000 | 0000 | 0000 | 0000 |
| 0000707540 | 302E | 6166 | 656B | 0000 | 0000 | 0000 | FFFE | 0008 |
| 0000707560 | 010A | 0000 | 0000 | 0000 | 0040 | 0000 | 0000 | 2162 |
| 0000707600 | 0000 | 0000 | 715F | 6F75 | 0074 | 0000 | 0000 | 0000 |
| 0000707620 | FFFF | 0004 | 0108 | 0000 | 0000 | 0000 | 0020 | 0000 |
| 0000707640 | 0000 | 0000 | 0000 | 0000 | 725F | 6D65 | 0000 | 0000 |
| 0000707660 | 0020 | 0000 | FFFF | 0004 | 0108 | 0000 | 0000 | 0000 |
| 0000707700 | 0020 | 0000 | 0000 | 0000 | 0000 | 0000 | 652E | 736F |
| 0000707720 | 0000 | 0000 | 0000 | 0000 | FFFE | 0008 | 0166 | 215A |
| 0000707740 | 0000 | 0000 | 0040 | 0000 | 0000 | 0000 | 0000 | 0000 |
| 0000707760 | 662E | 6C69 | 0065 | 0000 | 2164 | 0000 | FFFE | 0000 |
| 0000710000 | 0167 | 7067 | 615F | 6C70 | 6369 | 632E | 0000 | 0000 |
| 0000710020 | 0000 | 0000 | 662E | 6C69 | 0065 | 0000 | 2174 | 0000 |
| 0000710040 | FFFE | 0000 | 0167 | 7974 | 6570 | 6564 | 2E66 | 0068 |
| 0000710060 | 0000 | 0000 | 0000 | 0000 | 312E | 6166 | 656B | 0000 |
| 0000710100 | 0000 | 0000 | FFFE | 000A | 010F | 0000 | 0000 | 0000 |
| 0000710120 | 0001 | 0000 | 0000 | 216E | 0000 | 0000 | 465F | 4C41 |
| 0000710140 | 4553 | 0000 | 0000 | 0000 | FFFF | 000B | 0110 | 0000 |
| 0000710160 | 0000 | 0000 | 0001 | 0000 | 0000 | 0000 | 0000 | 0000 |
| 0000710200 | 545F | 5552 | 0045 | 0000 | 0001 | 0000 | FFFF | 000B |
| 0000710220 | 0110 | 0000 | 0000 | 0000 | 0001 | 0000 | 0000 | 0000 |
| 0000710240 | 0000 | 0000 | 652E | 736F | 0000 | 0000 | 0000 | 0000 |
| 0000710260 | FFFE | 000A | 0166 | 2166 | 0000 | 0000 | 0001 | 0000 |
| 0000710300 | 0000 | 0000 | 0000 | 0000 | 322E | 6166 | 656B | 0000 |
| 0000710320 | 0000 | 0000 | FFFE | 0008 | 010A | 0000 | 0000 | 0000 |
| 0000710340 | 0004 | 0000 | 0000 | 2174 | 0000 | 0000 | 705F | 7869 |
| 0000710360 | 6C65 | 0000 | 0000 | 0000 | FFFF | 000E | 0112 | 0000 |
| 0000710400 | 0000 | 0000 | 0004 | 0000 | 0000 | 0000 | 0000 | 0000 |
| 0000710420 | 652E | 736F | 0000 | 0000 | 0000 | 0000 | FFFE | 0008 |
| 0000710440 | 0166 | 216E | 0000 | 0000 | 0004 | 0000 | 0000 | 0000 |
| 0000710460 | 0000 | 0000 | 662E | 6C69 | 0065 | 0000 | 2176 | 0000 |
| 0000710500 | FFFE | 0000 | 0167 | 7067 | 615F | 6C70 | 6369 | 632E |
| 0000710520 | 0000 | 0000 | 0000 | 0000 | 662E | 6C69 | 0065 | 0000 |
| 0000710540 | 2178 | 0000 | FFFE | 0000 | 0167 | 7367 | 7370 | 737° |
| 0000710560 | 682E | 0000 | 0000 | 0000 | 0000 | 0000 | 662E | 6C69 |
| 0000710600 | 0065 | 0000 | 217A | 0000 | FFFE | 0000 | 0167 | 7367 |
| 0000710620 | 7370 | 7379 | 692E | 636E | 0000 | 0000 | 0000 | 0000 |
| 0000710640 | 662E | 6C69 | 0065 | 0000 | 217C | 0000 | FFFE | 0000 |
| 0000710660 | 0167 | 7367 | 7370 | 7379 | 682E | 0000 | 0000 | 0000 |
| 0000710700 | 0000 | 0000 | 662E | 6C69 | 0065 | 0000 | 217E | 0000 |
| 0000710720 | FFFE | 0000 | 0167 | 7067 | 615F | 6C70 | 6369 | 632E |
| 0000710740 | 0000 | 0000 | 0000 | 0000 | 662E | 6C69 | 0065 | 0000 |
| 0000710760 | 225A | 0000 | FFFE | 0000 | 0167 | 7367 | 6370 | 6766 |
| 0000711000 | 682E | 0000 | 0000 | 0000 | 0000 | 0000 | 0000 | 0000 |
| 0000711020 | 4734 | 0000 | 0000 | 0000 | FFFE | 000A | 010F | 0000 |
| 0000711040 | 0000 | 0000 | 0002 | 0000 | 0000 | 218A | 0000 | 0000 |
| 0000711060 | 4F5F | 454E | 315F | 0036 | 0000 | 0000 | FFFF | 000B |
| 0000711100 | 0110 | 000C | 0000 | 0000 | 0002 | 0000 | 0000 | 0000 |
| 0000711120 | 0000 | 0000 | 545F | 4F57 | 385F | 0000 | 0001 | 0000 |
| 0000711140 | FFFF | 000B | 0110 | 0000 | 0000 | 0000 | 0002 | 0000 |
| 0000711160 | 0000 | 0000 | 0000 | 0000 | 465F | 554F | 5F52 | 0034 |

THU MAR 14 17:37:32 1991 GSPMON.4 PAGE 249, LINE 14633

| | | | | | | | | |
|---|---|---|---|---|---|---|---|---|
| 0000711200 | 0002 | 0000 | FFFF | 000B | 0110 | 0000 | 0000 | 0000 |
| 0000711220 | 0002 | 0000 | 0000 | 0000 | 0000 | 0000 | 652E | 736F |
| 0000711240 | 0000 | 0000 | 0000 | 0000 | FFFE | 000A | 0166 | 2180 |
| 0000711260 | 0000 | 0000 | 0002 | 0000 | 0000 | 0000 | 0000 | 0000 |
| 0000711300 | 635F | 726C | 655F | 7272 | 0000 | 0000 | FFFE | 000A |
| 0000711320 | 010F | 0000 | 0000 | 0000 | 0001 | 0000 | 0000 | 2192 |
| 0000711340 | 0000 | 0000 | 4E5F | 5F4F | 4C43 | 0052 | 0000 | 0000 |
| 0000711360 | FFFF | 000B | 0110 | 0000 | 0000 | 0000 | 0001 | 0000 |
| 0000711400 | 0000 | 0000 | 0000 | 0000 | 435F | 524C | 0000 | 0000 |
| 0000711420 | 0001 | 0000 | FFFF | 000B | 0110 | 0000 | 0000 | 0000 |
| 0000711440 | 0001 | 0000 | 0000 | 0000 | 0000 | 0000 | 652E | 736F |
| 0000711460 | 0000 | 0000 | 0000 | 0000 | FFFE | 000A | 0166 | 218A |
| 0000711500 | 0000 | 0000 | 0001 | 0000 | 0000 | 0000 | 0000 | 0000 |
| 0000711520 | 0000 | 0000 | 473E | 0000 | 0000 | 0000 | FFFE | 000A |
| 0000711540 | 010F | 0000 | 0000 | 0000 | 0003 | 0000 | 0000 | 21A0 |
| 0000711560 | 0000 | 0000 | 505F | 414C | 454E | 0030 | 0000 | 0000 |
| 0000711600 | FFFF | 000B | 0110 | 0000 | 0000 | 0000 | 0003 | 0000 |
| 0000711620 | 0000 | 0000 | 0000 | 0000 | 505F | 414C | 454E | 0032 |
| 0000711640 | 0001 | 0000 | FFFF | 000B | 0110 | 0000 | 0000 | 0000 |
| 0000711660 | 0003 | 0000 | 0000 | 0000 | 0000 | 0000 | 505F | 414C |
| 0000711700 | 454E | 0031 | 0002 | 0000 | FFFF | 000B | 0110 | 0000 |
| 0000711720 | 0000 | 0000 | 0003 | 0000 | 0000 | 0000 | 0000 | 0000 |
| 0000711740 | 505F | 414C | 454E | 0033 | 0003 | 0000 | FFFF | 000B |
| 0000711760 | 0110 | 0000 | 0000 | 0000 | 0003 | 0000 | 0000 | 0000 |
| 0000712000 | 0000 | 0000 | 4E5F | 504F | 414C | 454E | 0004 | 0000 |
| 0000712020 | FFFF | 000B | 0110 | 0000 | 0000 | 0000 | 0003 | 0000 |
| 0000712040 | 0000 | 0000 | 0000 | 0000 | 652E | 736F | 0000 | 0000 |
| 0000712060 | 0000 | 0000 | FFFE | 000A | 0166 | 2192 | 0000 | 0000 |
| 0000712100 | 0003 | 0000 | 0000 | 0000 | 0000 | 0000 | 0000 | 0000 |
| 0000712120 | 4749 | 0000 | 0000 | 0000 | FFFE | 000A | 010F | 0000 |
| 0000712140 | 0000 | 0000 | 0001 | 0000 | 0000 | 21A8 | 0000 | 0000 |
| 0000712160 | 4E5F | 5F4F | 4944 | 5053 | 0000 | 0000 | FFFF | 000B |
| 0000712200 | 0110 | 0000 | 0000 | 0000 | 0001 | 0000 | 0000 | 0000 |
| 0000712220 | 0000 | 0000 | 445F | 5349 | 0050 | 0000 | 0001 | 0000 |
| 0000712240 | FFFF | 000B | 0110 | 0000 | 0000 | 0000 | 0001 | 0000 |
| 0000712260 | 0000 | 0000 | 0000 | 0000 | 652E | 736F | 0000 | 0000 |
| 0000712300 | 0000 | 0000 | FFFE | 000A | 0166 | 21A0 | 0000 | 0000 |
| 0000712320 | 0001 | 0000 | 0000 | 0000 | 0000 | 0000 | 665F | 5F62 |
| 0000712340 | 6E65 | 0000 | 0000 | 0000 | FFFE | 000A | 010F | 0000 |
| 0000712360 | 0000 | 0000 | 0001 | 0000 | 0000 | 21B0 | 0000 | 0000 |
| 0000712400 | 0000 | 0000 | 4753 | 0000 | 0000 | 0000 | FFFF | 000B |
| 0000712420 | 0110 | 0000 | 0000 | 0000 | 0001 | 0000 | 0000 | 0000 |
| 0000712440 | 0000 | 0000 | 0000 | 0000 | 475E | 0000 | 0001 | 0000 |
| 0000712460 | FFFF | 000B | 0110 | 0000 | 0000 | 0000 | 0001 | 0000 |
| 0000712500 | 0000 | 0000 | 0000 | 0000 | 652E | 736F | 0000 | 0000 |
| 0000712520 | 0000 | 0000 | FFFE | 000A | 0166 | 21A8 | 0000 | 0000 |
| 0000712540 | 0001 | 0000 | 0000 | 0000 | 0000 | 0000 | 7A5F | 7265 |
| 0000712560 | 5F6F | 0062 | 0000 | 0000 | FFFE | 000A | 010F | 0000 |
| 0000712600 | 0000 | 0000 | 0001 | 0000 | 0000 | 21B8 | 0000 | 0000 |
| 0000712620 | 0000 | 0000 | 4768 | 0000 | 0000 | 0000 | FFFF | 000B |
| 0000712640 | 0110 | 0000 | 0000 | 0000 | 0001 | 0000 | 0000 | 0000 |
| 0000712660 | 0000 | 0000 | 0000 | 0000 | 4774 | 0000 | 0001 | 0000 |
| 0000712700 | FFFF | 000B | 0110 | 0000 | 0000 | 0000 | 0001 | 0000 |
| 0000712720 | 0000 | 0000 | 0000 | 0000 | 652E | 736F | 0000 | 0000 |
| 0000712740 | 0000 | 0000 | FFFE | 000A | 0166 | 21B0 | 0000 | 0000 |
| 0000712760 | 0001 | 0000 | 0000 | 0000 | 0000 | 0000 | 7A5F | 7265 |
| 0000713000 | 5F6F | 0061 | 0000 | 0000 | FFFE | 000A | 010F | 0000 |
| 0000713020 | 0000 | 0000 | 0001 | 0000 | 0000 | 21C0 | 0000 | 0000 |
| 0000713040 | 0000 | 0000 | 477E | 0000 | 0000 | 0000 | FFFF | 000B |

THU MAR 14 17:37:32 1991 GSPMON.4 PAGE 250, LINE 14692

| | | | | | | | | |
|---|---|---|---|---|---|---|---|---|
| 0000713060 | 0110 | 0000 | 0000 | 0000 | 0001 | 0000 | 0000 | 0000 |
| 0000713100 | 0000 | 0000 | 0000 | 0000 | 478A | 0000 | 0001 | 0000 |
| 0000713120 | FFFF | 000B | 0110 | 0000 | 0000 | 0000 | 0001 | 0000 |
| 0000713140 | 0000 | 0000 | 0000 | 0000 | 652E | 736F | 0000 | 0000 |
| 0000713160 | 0000 | 0000 | FFFE | 000A | 0166 | 21B8 | 0000 | 0000 |
| 0000713200 | 0001 | 0000 | 0000 | 0000 | 0000 | 0000 | 0000 | 0000 |
| 0000713220 | 4794 | 0000 | 0000 | 0000 | FFFE | 000A | 010F | 0000 |
| 0000713240 | 0000 | 0000 | 0002 | 0000 | 0000 | 21CC | 0000 | 0000 |
| 0000713260 | 0000 | 0000 | 479E | 0000 | 0000 | 0000 | FFFF | 000B |
| 0000713300 | 0110 | 0000 | 0000 | 0000 | 0002 | 0000 | 0000 | 0000 |
| 0000713320 | 0000 | 0000 | 0000 | 0000 | 47A8 | 0000 | 0001 | 0000 |
| 0000713340 | FFFF | 000B | 0110 | 0000 | 0000 | 0000 | 0002 | 0000 |
| 0000713360 | 0000 | 0000 | 0000 | 0000 | 0000 | 0000 | 47B2 | 0000 |
| 0000713400 | 0002 | 0000 | FFFF | 000B | 0110 | 0000 | 0000 | 0000 |
| 0000713420 | 0002 | 0000 | 0000 | 0000 | 0000 | 0000 | 0000 | 0000 |
| 0000713440 | 47BC | 0000 | 0003 | 0000 | FFFF | 000B | 0110 | 0000 |
| 0000713460 | 0000 | 0000 | 0002 | 0000 | 0000 | 0000 | 0000 | 0000 |
| 0000713500 | 652E | 736F | 0000 | 0000 | 0000 | 0000 | FFFE | 000A |
| 0000713520 | 0166 | 21C0 | 0000 | 0000 | 0002 | 0000 | 0000 | 0000 |
| 0000713540 | 0000 | 0000 | 615F | 756C | 665F | 636E | 0000 | 0000 |
| 0000713560 | FFFE | 000A | 010F | 0000 | 0000 | 0000 | 0003 | 0000 |
| 0000713600 | 0000 | 21E0 | 0000 | 0000 | 435F | 454C | 5241 | 0000 |
| 0000713620 | 0000 | 0000 | FFFF | 000B | 0110 | 0000 | 0000 | 0000 |
| 0000713640 | 0003 | 0000 | 0000 | 0000 | 0000 | 0000 | 425F | 494D |
| 0000713660 | 554E | 4153 | 0001 | 0000 | FFFF | 000B | 0110 | 0000 |
| 0000713700 | 0000 | 0000 | 0003 | 0000 | 0000 | 0000 | 0000 | 0000 |
| 0000713720 | 415F | 494D | 554E | 4253 | 0002 | 0000 | FFFF | 000B |
| 0000713740 | 0110 | 0000 | 0000 | 0000 | 0003 | 0000 | 0000 | 0000 |
| 0000713760 | 0000 | 0000 | 505F | 554C | 0053 | 0000 | 0003 | 0000 |
| 0000714000 | FFFF | 000B | 0110 | 0000 | 0000 | 0000 | 0003 | 0000 |
| 0000714020 | 0000 | 0000 | 0000 | 0000 | 585F | 524F | 0000 | 0000 |
| 0000714040 | 0004 | 0000 | FFFF | 000B | 0110 | 0000 | 0000 | 0000 |
| 0000714060 | 0003 | 0000 | 0000 | 0000 | 0000 | 0000 | 4F5F | 0052 |
| 0000714100 | 0000 | 0000 | 0005 | 0000 | FFFF | 000B | 0110 | 0000 |
| 0000714120 | 0000 | 0000 | 0003 | 0000 | 0000 | 0000 | 0000 | 0000 |
| 0000714140 | 415F | 444E | 0000 | 0000 | 0006 | 0000 | FFFF | 000B |
| 0000714160 | 0110 | 0000 | 0000 | 0000 | 0003 | 0000 | 0000 | 0000 |
| 0000714200 | 0000 | 0000 | 505F | 4552 | 4553 | 0054 | 0007 | 0000 |
| 0000714220 | FFFF | 000B | 0110 | 0000 | 0000 | 0000 | 0003 | 0000 |
| 0000714240 | 0000 | 0000 | 0000 | 0000 | 652E | 736F | 0000 | 0000 |
| 0000714260 | 0000 | 0000 | FFFE | 000A | 0166 | 21CC | 0000 | 0000 |
| 0000714300 | 0003 | 0000 | 0000 | 0000 | 0000 | 0000 | 615F | 756C |
| 0000714320 | 635F | 7972 | 0000 | 0000 | FFFE | 000A | 010F | 0000 |
| 0000714340 | 0000 | 0000 | 0001 | 0000 | 0000 | 21E8 | 0000 | 0000 |
| 0000714360 | 5A5F | 5245 | 004F | 0000 | 0000 | 0000 | FFFF | 000B |
| 0000714400 | 0110 | 0000 | 0000 | 0000 | 0001 | 0000 | 0000 | 0000 |
| 0000714420 | 0000 | 0000 | 4F5F | 454E | 0000 | 0000 | 0001 | 0000 |
| 0000714440 | FFFF | 000B | 0110 | 0000 | 0000 | 0000 | 0001 | 0000 |
| 0000714460 | 0000 | 0000 | 0000 | 0000 | 652E | 736F | 0000 | 0000 |
| 0000714500 | 0000 | 0000 | FFFE | 000A | 0166 | 21E0 | 0000 | 0000 |
| 0000714520 | 0001 | 0000 | 0000 | 0000 | 0000 | 0000 | 0000 | 0000 |
| 0000714540 | 47C6 | 0000 | 0000 | 0000 | FFFE | 000A | 010F | 0000 |
| 0000714560 | 0000 | 0000 | 0001 | 0000 | 0000 | 21F0 | 0000 | 0000 |
| 0000714600 | 0000 | 0000 | 47D2 | 0000 | 0000 | 0000 | FFFF | 000B |
| 0000714620 | 0110 | 0000 | 0000 | 0000 | 0001 | 0000 | 0000 | 0000 |
| 0000714640 | 0000 | 0000 | 0000 | 0000 | 47DF | 0000 | 0001 | 0000 |
| 0000714660 | FFFF | 000B | 0110 | 0000 | 0000 | 0000 | 0001 | 0000 |
| 0000714700 | 0000 | 0000 | 0000 | 0000 | 652E | 736F | 0000 | 0000 |
| 0000714720 | 0000 | 0000 | FFFE | 000A | 0166 | 21E8 | 0000 | 0000 |

THU MAR 14 17:37:32 1991 GSPMON.4 PAGE 251, LINE 14751

| | | | | | | | | |
|---|---|---|---|---|---|---|---|---|
| 0000714740 | 0001 | 0000 | 0000 | 0000 | 0000 | 0000 | 0000 | 0000 |
| 0000714760 | 47EB | 0000 | 0000 | 0000 | FFFE | 000A | 010F | 0000 |
| 0000715000 | 0000 | 0000 | 0001 | 0000 | 0000 | 21F8 | 0000 | 0000 |
| 0000715020 | 4D5F | 5341 | 5F4B | 4E45 | 0000 | 0000 | FFFF | 000B |
| 0000715040 | 0110 | 0000 | 0000 | 0000 | 0001 | 0000 | 0000 | 0000 |
| 0000715060 | 0000 | 0000 | 0000 | 0000 | 47F8 | 0000 | 0001 | 0030 |
| 0000715100 | FFFF | 000B | 0110 | 0000 | 0000 | 0000 | 0001 | 0000 |
| 0000715120 | 0000 | 0000 | 0000 | 0000 | 652E | 736F | 0000 | 0000 |
| 0000715140 | 0000 | 0000 | FFFE | 000A | 0166 | 21F0 | 0000 | 0000 |
| 0000715160 | 0001 | 0000 | 0000 | 0000 | 0000 | 0000 | 0000 | 0000 |
| 0000715200 | 4802 | 0000 | 0000 | 0000 | FFFE | 000A | 010F | 0000 |
| 0000715220 | 0000 | 0000 | 0001 | 0000 | 0000 | 2200 | 0000 | 0000 |
| 0000715240 | 0000 | 0000 | 480D | 0000 | 0000 | 0000 | FFFF | 000B |
| 0000715260 | 0110 | 0000 | 0000 | 0000 | 0001 | 0000 | 0000 | 0000 |
| 0000715300 | 0000 | 0000 | 0000 | 0000 | 4817 | 0000 | 0001 | 0000 |
| 0000715320 | FFFF | 000B | 0110 | 0000 | 0000 | 0000 | 0001 | 0000 |
| 0000715340 | 0000 | 0000 | 0000 | 0000 | 652E | 736F | 0000 | 0000 |
| 0000715360 | 0000 | 0000 | FFFE | 000A | 0166 | 21F8 | 0000 | 0000 |
| 0000715400 | 0001 | 0000 | 0000 | 0000 | 0000 | 0000 | 0000 | 0000 |
| 0000715420 | 4822 | 0000 | 0000 | 0000 | FFFE | 000A | 010F | 0000 |
| 0000715440 | 0000 | 0000 | 0001 | 0000 | 0000 | 2208 | 0000 | 0000 |
| 0000715460 | 0000 | 0000 | 482D | 0000 | 0000 | 0000 | FFFF | 000B |
| 0000715500 | 0110 | 0000 | 0000 | 0000 | 0001 | 0000 | 0000 | 0000 |
| 0000715520 | 0000 | 0000 | 0000 | 0000 | 4838 | 0000 | 0001 | 0000 |
| 0000715540 | FFFF | 000B | 0110 | 0000 | 0000 | 0000 | 0001 | 0000 |
| 0000715560 | 0000 | 0000 | 0000 | 0000 | 652E | 736F | 0000 | 0000 |
| 0000715600 | 0000 | 0000 | FFFE | 000A | 0166 | 2200 | 0000 | 0000 |
| 0000715620 | 0001 | 0000 | 0000 | 0000 | 0000 | 0000 | 6D5F | 5F62 |
| 0000715640 | 7566 | 636E | 0000 | 0000 | FFFE | 000A | 010F | 0000 |
| 0000715660 | 0000 | 0000 | 0002 | 0000 | 0000 | 2214 | 0000 | 0000 |
| 0000715700 | 0000 | 0000 | 4842 | 0000 | 0000 | 0000 | FFFF | 000B |
| 0000715720 | 0110 | 0000 | 0000 | 0000 | 0002 | 0000 | 0000 | 0000 |
| 0000715740 | 0000 | 0000 | 4D5F | 5F42 | 5845 | 5257 | 0001 | 0000 |
| 0000715760 | FFFF | 000B | 0110 | 0000 | 0000 | 0000 | 0002 | 0000 |
| 0000716000 | 0000 | 0000 | 0000 | 0000 | 4D5F | 5F42 | 4552 | 4441 |
| 0000716020 | 0002 | 0000 | FFFF | 000B | 0110 | 0000 | 0000 | 0000 |
| 0000716040 | 0002 | 0000 | 0000 | 0000 | 0000 | 0000 | 4D5F | 5F42 |
| 0000716060 | 504F | 4E45 | 0003 | 0000 | FFFF | 000B | 0110 | 0000 |
| 0000716100 | 0000 | 0000 | 0002 | 0000 | 0000 | 0000 | 0000 | 0000 |
| 0000716120 | 652E | 736F | 0000 | 0000 | 0000 | 0000 | FFFE | 000A |
| 0000716140 | 0166 | 2208 | 0000 | 0000 | 0002 | 0000 | 0000 | 0000 |
| 0000716160 | 0000 | 0000 | 0000 | 0000 | 484C | 0000 | 0000 | 0000 |
| 0000716200 | FFFE | 000A | 010F | 0000 | 0000 | 0000 | 0002 | 0000 |
| 0000716220 | 0000 | 221E | 0000 | 0000 | 0000 | 0000 | 4856 | 0000 |
| 0000716240 | 0000 | 0000 | FFFF | 000B | 0110 | 0000 | 0000 | 0000 |
| 0000716260 | 0002 | 0000 | 0000 | 0000 | 0000 | 0000 | 0000 | 0000 |
| 0000716300 | 4862 | 0000 | 0001 | 0000 | FFFF | 000B | 0110 | 0000 |
| 0000716320 | 0000 | 0000 | 0002 | 0000 | 0000 | 0000 | 0000 | 0000 |
| 0000716340 | 4D5F | 3442 | 525F | 0044 | 0003 | 0000 | FFFF | 000B |
| 0000716360 | 0110 | 0000 | 0000 | 0000 | 0002 | 0000 | 0000 | 0000 |
| 0000716400 | 0000 | 0000 | 652E | 736F | 0000 | 0000 | 0000 | 0000 |
| 0000716420 | FFFE | 000A | 0166 | 2214 | 0000 | 0000 | 0002 | 0000 |
| 0000716440 | 0000 | 0000 | 0000 | 0000 | 0000 | 0000 | 486D | 0000 |
| 0000716460 | 0000 | 0000 | FFFE | 000A | 010F | 0000 | 0000 | 0000 |
| 0000716500 | 0002 | 0000 | 0000 | 2226 | 0000 | 0000 | 4D5F | 3542 |
| 0000716520 | 575F | 0052 | 0000 | 0000 | FFFF | 000B | 0110 | 0000 |
| 0000716540 | 0000 | 0000 | 0002 | 0000 | 0000 | 0000 | 0000 | 0000 |
| 0000716560 | 4D5F | 3542 | 525F | 0044 | 0003 | 0000 | FFFF | 000B |
| 0000716600 | 0110 | 0000 | 0000 | 0000 | 0002 | 0000 | 0000 | 0000 |

THU MAR 14 17:37:32 1991 GSPMON.4 PAGE 252, LINE 14810

```
0000716620  0000  0000  652E  736F  0000  0000  0000  0000
0000716640  FFFE  000A  0166  221E  0000  0000  0002  0000
0000716660  0000  0000  0000  0000  0000  0000  4877  0000
0000716700  0000  0000  FFFE  000A  010F  0000  0000  0000
0000716720  0001  0000  0000  222E  0000  0000  0000  0000
0000716740  4883  0000  0000  0000  FFFF  000B  0110  0000
0000716760  0000  0000  0001  0000  0000  0000  0000  0000
0000717000  0000  0000  ·38E  0000  0001  0000  FFFF  000B
0000717020  0110  0000  0000  0000  0001  0000  0000  0000
0000717040  0000  0000  652E  736F  0000  0000  0000  0000
0000717060  FFFE  000A  0166  2226  0000  0000  0001  0000
0000717100  0000  0000  0000  0000  0000  0000  4898  0000
0000717120  0000  0000  FFFE  000A  010F  0000  0000  0000
0000717140  0001  0000  0000  2236  0000  0000  0000  0000
0000717160  48A5  0000  0000  0000  FFFF  000B  0110  0000
0000717200  0000  0000  0001  0000  0000  0000  0000  0000
0000717220  0000  0000  48B1  0000  0001  0000  FFFF  000B
0000717240  0110  0000  0000  0000  0001  0000  0000  0000
0000717260  0000  0000  652E  736F  0000  0000  0000  0000
0000717300  FFFE  000A  0166  222E  0000  0000  0001  0000
0000717320  0000  0000  0000  0000  0000  0000  48BE  0000
0000717340  0000  0000  FFFE  000A  010F  0000  0000  0000
0000717360  0003  0000  0000  2246  0000  0000  585F  424D
0000717400  0030  0000  0000  0000  FFFF  000B  0110  0000
0000717420  0000  0000  0003  0000  0000  0000  0000  0000
0000717440  585F  424D  0031  0000  0001  0000  FFFF  000B
0000717460  0110  0000  0000  0000  0003  0000  0000  0000
0000717500  0000  0000  585F  424D  0032  0000  0002  0000
0000717520  FFFF  000B  0110  0000  0000  0000  0003  0000
0000717540  0000  0000  0000  0000  585F  424D  0033  0000
0000717560  0003  0000  FFFF  000B  0110  0000  0000  0000
0000717600  0003  0000  0000  0000  0000  0000  585F  424D
0000717620  0034  0000  0004  0000  FFFF  000B  0110  0000
0000717640  0000  0000  0003  0000  0000  0000  0000  0000
0000717660  585F  424D  0035  0000  0005  0000  FFFF  000B
0000717700  0110  0000  0000  0000  0003  0000  0000  0000
0000717720  0000  0000  652E  736F  0000  0000  0000  0000
0000717740  FFFE  000A  0166  2236  0000  0000  0003  0000
0000717760  0000  0000  0000  0000  635F  6E68  006C  0000
0000720000  0000  0000  FFFE  000A  010F  0000  0000  0000
0000720020  0002  0000  0000  2252  0000  0000  525F  4445
0000720040  435F  0048  0000  0000  FFFF  000B  0110  0000
0000720060  0000  0000  0002  0000  0000  0000  0000  0000
0000720100  0000  0000  48C8  0000  0001  0000  FFFF  000B
0000720120  0110  0000  0000  0000  0002  0000  0000  0000
0000720140  0000  0000  425F  554C  5F45  4843  0002  0000
0000720160  FFFF  000B  0110  0000  0000  0000  0002  0000
0000720200  0000  0000  0000  0000  0000  0000  48D2  0000
0000720220  0003  0000  FFFF  000B  0110  0000  0000  0000
0000720240  0002  0000  0000  0000  0000  0000  652E  736F
0000720260  0000  0000  0000  0000  FFFE  000A  0166  2246
0000720300  0000  0000  0002  0000  0000  0000  0000  0000
0000720320  0000  0000  48DE  0000  0000  0000  FFFE  000A
0000720340  010F  0000  0000  0000  0001  0000  0000  225A
0000720360  0000  0000  0000  0000  48E8  0000  0000  0000
0000720400  FFFF  000B  0110  0000  0000  0000  0001  0000
0000720420  0000  0000  0000  0000  435F  4359  494C  0043
0000720440  0001  0000  FFFF  000B  0110  0000  0000  0000
0000720460  0001  0000  0000  0000  0000  0000  652E  736F
```

THU MAR 14 17:37:32 1991 GSPMON.4 PAGE 253, LINE 14869

| | | | | | | | | |
|---|---|---|---|---|---|---|---|---|
| 0000720500 | 0000 | 0000 | 0000 | 0000 | FFFE | 000A | 0166 | 2252 |
| 0000720520 | 0000 | 0000 | 0001 | 0000 | 0000 | 0000 | 0000 | 0000 |
| 0000720540 | 662E | 6C69 | 0065 | 0000 | 225C | 0000 | FFFE | 0000 |
| 0000720560 | 0167 | 7067 | 615F | 6C70 | 6369 | 632E | 0000 | 0000 |
| 0000720600 | 0000 | 0000 | 662E | 6C69 | 0065 | 0000 | 225E | 0000 |
| 0000720620 | FFFE | 0000 | 0167 | 7367 | 6870 | 6477 | 682E | 0000 |
| 0000720640 | 0000 | 0000 | 0000 | 0000 | 662E | 6C69 | 0065 | 0000 |
| 0000720660 | 2260 | 0000 | FFFE | 0000 | 0167 | 7067 | 615F | 6C70 |
| 0000720700 | 6369 | 632E | 0000 | 0000 | 0000 | 0000 | 662E | 6C69 |
| 0000720720 | 0065 | 0000 | 2324 | 0000 | FFFE | 0000 | 0167 | 7067 |
| 0000720740 | 705F | 6275 | 682E | 0000 | 0000 | 0000 | 0000 | 0000 |
| 0000720760 | 332E | 6166 | 656B | 0000 | 0000 | 0000 | FFFE | 0008 |
| 0000721000 | 010A | 0000 | 0000 | 0000 | 01C0 | 0000 | 0000 | 2292 |
| 0000721020 | 0000 | 0000 | 685F | 7365 | 6E79 | 0063 | 0000 | 0000 |
| 0000721040 | FFFF | 000D | 0108 | 0000 | 0000 | 0000 | 0010 | 0000 |
| 0000721060 | 0000 | 0000 | 0000 | 0000 | 685F | 6265 | 6E6C | 006B |
| 0000721100 | 0010 | 0000 | FFFF | 000D | 0108 | 0000 | 0000 | 0000 |
| 0000721120 | 0010 | 0000 | 0000 | 0000 | 0000 | 0000 | 685F | 6273 |
| 0000721140 | 6E6C | 006B | 0020 | 0000 | FFFF | 000D | 0108 | 0000 |
| 0000721160 | 0000 | 0000 | 0010 | 0000 | 0000 | 00C0 | 0000 | 0000 |
| 0000721200 | 765F | 7365 | 6E79 | 0063 | 0030 | 0000 | FFFF | 000D |
| 0000721220 | 0108 | 0000 | 0000 | 0000 | 0010 | 0000 | 0000 | 0000 |
| 0000721240 | 0000 | 0000 | 765F | 6265 | 6E6C | 006B | 0040 | 0000 |
| 0000721260 | FFFF | 000D | 0108 | 0000 | 0000 | 0000 | 0010 | 0000 |
| 0000721300 | 0000 | 0000 | 0000 | 0000 | 765F | 6273 | 6E6C | 006B |
| 0000721320 | 0050 | 0000 | FFFF | 000D | 0108 | 0000 | 0000 | 0000 |
| 0000721340 | 0010 | 0000 | 0000 | 0000 | 0000 | 0000 | 0000 | 0000 |
| 0000721360 | 48F2 | 0000 | 0060 | 0000 | FFFF | 000D | 0108 | 0000 |
| 0000721400 | 0000 | 0000 | 0010 | 0000 | 0000 | 0000 | 0000 | 0000 |
| 0000721420 | 665F | 6468 | 7369 | 0070 | 0070 | 0000 | FFFF | 000D |
| 0000721440 | 0108 | 0000 | 0000 | 0000 | 0010 | 0000 | 0000 | 0000 |
| 0000721460 | 0000 | 0000 | 6D5F | 5F62 | 6973 | 657A | 0080 | 0000 |
| 0000721500 | FFFF | 000F | 0108 | 0000 | 0000 | 0000 | 0020 | 0000 |
| 0000721520 | 0000 | 0000 | 0000 | 0000 | 0000 | 0000 | 48FD | 0000 |
| 0000721540 | 00A0 | 0000 | FFFF | 000D | 0108 | 0000 | 0000 | 0000 |
| 0000721560 | 0010 | 0000 | 0000 | 0000 | 0000 | 0000 | 0000 | 0000 |
| 0000721600 | 4907 | 0000 | 00B0 | 0000 | FFFF | 000D | 0108 | 0000 |
| 0000721620 | 0000 | 0000 | 0010 | 0000 | 0000 | 0000 | 0000 | 0000 |
| 0000721640 | 0000 | 0000 | 4911 | 0000 | 00C0 | 0000 | FFFF | 000D |
| 0000721660 | 0108 | 0000 | 0000 | 0000 | 0010 | 0000 | 0000 | 0000 |
| 0000721700 | 0000 | 0000 | 0000 | 0000 | 491C | 0000 | 00D0 | 0000 |
| 0000721720 | FFFF | 000D | 0108 | 0000 | 0000 | 0000 | 0010 | 0000 |
| 0000721740 | 0000 | 0000 | 0000 | 0000 | 0000 | 0000 | 4926 | 0000 |
| 0000721760 | 00E0 | 0000 | FFFF | 000F | 0108 | 0000 | 0000 | 0000 |
| 0000722000 | 0020 | 0000 | 0000 | 0000 | 0000 | 0000 | 0000 | 0000 |
| 0000722020 | 4933 | 0000 | 0100 | 0000 | FFFF | 000F | 0108 | 0000 |
| 0000722040 | 0000 | 0000 | 0020 | 0000 | 0000 | 0000 | 0000 | 0000 |
| 0000722060 | 0000 | 0000 | 4945 | 0000 | 0120 | 0000 | FFFF | 000F |
| 0000722100 | 0108 | 0000 | 0000 | 0000 | 0020 | 0000 | 0000 | 0000 |
| 0000722120 | 0000 | 0000 | 0000 | 0000 | 4954 | 0000 | 0140 | 0000 |
| 0000722140 | FFFF | 000F | 0108 | 0000 | 0000 | 0000 | 0020 | 0000 |
| 0000722160 | 0000 | 0000 | 0000 | 0000 | 0000 | 0000 | 496A | 0000 |
| 0000722200 | 0160 | 0000 | FFFF | 000D | 0108 | 0000 | 0000 | 0000 |
| 0000722220 | 0010 | 0000 | 0000 | 0000 | 0000 | 0000 | 0000 | 0000 |
| 0000722240 | 4975 | 0000 | 0170 | 0000 | FFFF | 000D | 0108 | 0000 |
| 0000722260 | 0000 | 0000 | 0010 | 0000 | 0000 | 0000 | 0000 | 0000 |
| 0000722300 | 0000 | 0000 | 4989 | 0000 | 0180 | 0000 | FFFF | 000D |
| 0000722320 | 0108 | 0000 | 0000 | 0000 | 0010 | 0000 | 0000 | 0000 |
| 0000722340 | 0000 | 0000 | 0000 | 0000 | 499D | 0000 | 0190 | 0000 |

THU MAR 14 17:37:32 1991 GSPMON.4 PAGE 254, LINE 14928

| | | | | | | | | |
|---|---|---|---|---|---|---|---|---|
| 0000722360 | FFFF | 000F | 0108 | 0000 | 0000 | 0000 | 0020 | 0000 |
| 0000722400 | 0000 | 0000 | 0000 | 0000 | 0000 | 0000 | 49AC | 0000 |
| 0000722420 | 01B0 | 0000 | FFFF | 000D | 0108 | 0000 | 0000 | 0000 |
| 0000722440 | 0010 | 0000 | 0000 | 0000 | 0000 | 0000 | 652E | 736F |
| 0000722460 | 0000 | 0000 | 0000 | 0000 | FFFE | 0008 | 0166 | 2262 |
| 0000722500 | 0000 | 0000 | 01C0 | 0000 | 0000 | 0000 | 0000 | 0000 |
| 0000722520 | 342E | 6166 | 656B | 0000 | 0000 | 0000 | FFFE | 0008 |
| 0000722540 | 010A | 0000 | 0000 | 0000 | 0050 | 0000 | 0000 | 229C |
| 0000722560 | 0000 | 0000 | 6D5F | 6773 | 705F | 7274 | 0000 | 0000 |
| 0000722600 | FFFF | 0010 | 0108 | 0000 | 0000 | 0000 | 0020 | 0000 |
| 0000722620 | 0000 | 0000 | 0000 | 0000 | 0000 | 0000 | 49B8 | 0000 |
| 0000722640 | 0020 | 0000 | FFFF | 000F | 0108 | 0000 | 0000 | 0000 |
| 0000722660 | 0020 | 0000 | 0000 | 0000 | 0000 | 0000 | 0000 | 0000 |
| 0000722700 | 49C2 | 0000 | 0040 | 0000 | FFFF | 000D | 0108 | 0000 |
| 0000722720 | 0000 | 0000 | 0010 | 0000 | 0000 | 0000 | 0000 | 0000 |
| 0000722740 | 652E | 736F | 0000 | 0000 | 0000 | 0000 | FFFE | 0008 |
| 0000722760 | 0166 | 2292 | 0000 | 0000 | 0050 | 0000 | 0000 | 0000 |
| 0000723000 | 0000 | 0000 | 352E | 6166 | 656B | 0000 | 0000 | 0000 |
| 0000723020 | FFFE | 0008 | 010A | 0000 | 0000 | 0000 | 0040 | 0000 |
| 0000723040 | 0000 | 22A8 | 0000 | 0000 | 0000 | 0000 | 49CD | 0000 |
| 0000723060 | 0000 | 0000 | FFFF | 000D | 0108 | 0000 | 0000 | 000P |
| 0000723100 | 0010 | 0000 | 0000 | 0000 | 0000 | 0000 | 6A5F | 6D75 |
| 0000723120 | 0070 | 0000 | 0010 | 0000 | FFFF | 000D | 0108 | 0000 |
| 0000723140 | 0000 | 0000 | 0010 | 0000 | 0000 | 0000 | 0000 | 0000 |
| 0000723160 | 735F | 6174 | 7472 | 0000 | 0020 | 0000 | FFFF | 000D |
| 0000723200 | 0108 | 0000 | 0000 | 0000 | 0010 | 0000 | 0000 | 0000 |
| 0000723220 | 0000 | 0000 | 655F | 646E | 0000 | 0000 | 0030 | 0000 |
| 0000723240 | FFFF | 000D | 0108 | 0000 | 0000 | 0000 | 0010 | 0000 |
| 0000723260 | 0000 | 0000 | 0000 | 0000 | 652E | 736F | 0000 | 0000 |
| 0000723300 | 0000 | 0000 | FFFE | 0008 | 0166 | 229C | 0000 | 0000 |
| 0000723320 | 0040 | 0000 | 0000 | 0000 | 0000 | 0000 | 362E | 6166 |
| 0000723340 | 656B | 0000 | 0000 | 0000 | FFFE | 0008 | 010A | 0000 |
| 0000723360 | 0000 | 0000 | 0080 | 0000 | 0000 | 22B0 | 0000 | 0000 |
| 0000723400 | 685F | 0000 | 0000 | 0000 | 0000 | 0000 | FFFF | 0008 |
| 0000723420 | 0108 | 229C | 0000 | 0000 | 0040 | 0000 | 0000 | 0000 |
| 0000723440 | 0000 | 0000 | 765F | 0000 | 0000 | 0000 | 0040 | 0000 |
| 0000723460 | FFFF | 0008 | 0108 | 229C | 0000 | 0000 | 0040 | 0000 |
| 0000723500 | 0000 | 0000 | 0000 | 0000 | 652E | 736F | 0000 | 0000 |
| 0000723520 | 0000 | 0000 | FFFE | 0008 | 0166 | 22A8 | 0000 | 0000 |
| 0000723540 | 0080 | 0000 | 0000 | 0000 | 0000 | 0000 | 372E | 6166 |
| 0000723560 | 656B | 0000 | 0000 | 0000 | FFFE | 0009 | 010C | 0000 |
| 0000723600 | 0000 | 0000 | 0200 | 0000 | 0000 | 22BA | 0000 | 0000 |
| 0000723620 | 635F | 6B | 7573 | 006D | 0000 | 0000 | FFFF | 003D |
| 0000723640 | 010B | 0000 | 0000 | 0000 | 0200 | 0020 | 0000 | 0000 |
| 0000723660 | 0000 | 0000 | 655F | 7272 | 6E63 | 0074 | 0000 | 0000 |
| 0000723700 | FFFF | 003D | 010B | 0000 | 0000 | 0000 | 0200 | 0020 |
| 0000723720 | 0000 | 0000 | 0000 | 0000 | 635F | 6372 | 3233 | 0000 |
| 0000723740 | 0000 | 0000 | FFFF | 003D | 010B | 0000 | 0000 | 0000 |
| 0000723760 | 0200 | 0020 | 0000 | 0000 | 0000 | 0000 | 652E | 736F |
| 0000724000 | 0000 | 0000 | 0000 | 0000 | FFFE | 0009 | 0166 | 22B0 |
| 0000724020 | 0000 | 0000 | 0200 | 0000 | 0000 | 0000 | 0000 | 0000 |
| 0000724040 | 382E | 6166 | 656B | 0000 | 0000 | 0000 | FF | 0008 |
| 0000724060 | 010A | 0000 | 0000 | 0000 | 0240 | 0000 | 0000 | 22C2 |
| 0000724100 | 0000 | 0000 | 0000 | 0000 | 49D9 | 0000 | 0000 | 0000 |
| 0000724120 | FFFF | 0008 | 0108 | 229C | 0000 | 0000 | 0040 | 0000 |
| 0000724140 | 0000 | 0000 | 0000 | 0000 | 0000 | 0000 | 49E6 | 0000 |
| 0000724160 | 0040 | 0000 | FFFF | 0009 | 0108 | 22B0 | 0000 | 0000 |
| 0000724200 | 0200 | 0000 | 0000 | 0000 | 0000 | 0000 | 652E | 736F |
| 0000724220 | 0000 | 0000 | 0000 | 0000 | FFFE | 0008 | 0166 | 22BA |

THU MAR 14 17:37:32 1991 GSPMON.4 PAGE 255, LINE 14987

| | | | | | | | | |
|---|---|---|---|---|---|---|---|---|
| 0000724240 | 0000 | 0000 | 0240 | 0000 | 0000 | 0000 | 0000 | 0000 |
| 0000724260 | 392E | 6166 | 656B | 0000 | 0000 | 0000 | FFFE | 0009 |
| 0000724300 | 010C | 0000 | 0000 | 0000 | 4000 | 0000 | 0000 | 22CC |
| 0000724320 | 0000 | 0000 | 635F | 6B68 | 7573 | 006D | 0000 | 0000 |
| 0000724340 | FFFF | 00FD | 010B | 0000 | 0000 | 0000 | 4000 | 0020 |
| 0000724360 | 0020 | 0000 | 0000 | 0000 | 655F | 7272 | 6E63 | 0074 |
| 0000724400 | 0000 | 0000 | FFFF | 00FD | 010B | 0000 | 0000 | 0000 |
| 0000724420 | 4000 | 0020 | 0020 | 0000 | 0000 | 0000 | 635F | 6372 |
| 0000724440 | 3233 | 0000 | 0000 | 0000 | FFFF | 00FD | 010B | 0000 |
| 0000724460 | 0000 | 0000 | 4000 | 0020 | 0020 | 0000 | 0000 | 0000 |
| 0000724500 | 652E | 736F | 0000 | 0000 | 0000 | 0000 | FFFE | 0009 |
| 0000724520 | 0166 | 22C2 | 0000 | 0000 | 4000 | 0000 | 0000 | 0000 |
| 0000724540 | 0000 | 0000 | 312E | 6630 | 6B61 | 0065 | 0000 | 0000 |
| 0000724560 | FFFE | 0008 | 010A | 0000 | 0000 | 0000 | 4080 | 0000 |
| 0000724600 | 0000 | 22D6 | 0000 | 0000 | 0000 | 0000 | 49F2 | 0000 |
| 0000724620 | 0000 | 0000 | FFFF | 0008 | 0108 | 229C | 0000 | 0000 |
| 0000724640 | 0040 | 0000 | 0000 | 0000 | 0000 | 0000 | 0000 | 0000 |
| 0000724660 | 49FF | 0000 | 0040 | 0000 | FFFF | 0008 | 0108 | 229C |
| 0000724700 | 0000 | 0000 | 0040 | 0000 | 0000 | 0000 | 0000 | 0000 |
| 0000724720 | 0000 | 0000 | 4A0B | 0000 | 0080 | 0000 | FFFF | 0009 |
| 0000724740 | 0108 | 22C2 | 0000 | 0000 | 4000 | 0000 | 0000 | 0000 |
| 0000724760 | 0000 | 0000 | 652E | 736F | 0000 | 0000 | 0000 | 0000 |
| 0000725000 | FFFE | 0008 | 0166 | 22CC | 0000 | 0000 | 4080 | 0000 |
| 0000725020 | 0000 | 0000 | 0000 | 0000 | 312E | 6631 | 6B61 | 0065 |
| 0000725040 | 0000 | 0000 | FFFE | 0009 | 010C | 0000 | 0000 | 0000 |
| 0000725060 | 0090 | 0000 | 0000 | 22E0 | 0000 | 0000 | 635F | 6B68 |
| 0000725100 | 7573 | 006D | 0000 | 0000 | FFFF | 00FD | 010B | 0000 |
| 0000725120 | 0000 | 0000 | 0090 | 0003 | 0003 | 0000 | 0000 | 0000 |
| 0000725140 | 655F | 7272 | 6E63 | 0074 | 0000 | 0000 | FFFF | 00FD |
| 0000725160 | 010B | 0000 | 0000 | 0000 | 0090 | 0003 | 0003 | 0000 |
| 0000725200 | 0000 | 0000 | 625F | 7263 | 3363 | 0032 | 0000 | 0000 |
| 0000725220 | FFFF | 00FD | 010B | 0000 | 0000 | 0000 | 0090 | 0003 |
| 0000725240 | 0003 | 0000 | 0000 | 0000 | 652E | 736F | 0000 | 0000 |
| 0000725260 | 0000 | 0000 | FFFE | 0009 | 0166 | 22D6 | 0000 | 0000 |
| 0000725300 | 0090 | 0000 | 0000 | 0000 | 0000 | 0000 | 312E | 6632 |
| 0000725320 | 6B61 | 0065 | 0000 | 0000 | FFFE | 0008 | 010A | 0000 |
| 0000725340 | 0000 | 0000 | 0130 | 0000 | 0000 | 22EE | 0000 | 0000 |
| 0000725360 | 0000 | 0000 | 4A15 | 0000 | 0000 | 0000 | FFFF | 0008 |
| 0000725400 | 0108 | 229C | 0000 | 0000 | 0040 | 0000 | 0000 | 0000 |
| 0000725420 | 0000 | 0000 | 0000 | 0000 | 4A22 | 0000 | 0040 | 0000 |
| 0000725440 | FFFF | 0008 | 0108 | 229C | 0000 | 0000 | 0040 | 0000 |
| 0000725460 | 0000 | 0000 | 0000 | 0000 | 785F | 635F | 6F6F | 6472 |
| 0000725500 | 0080 | 0000 | FFFF | 0003 | 0108 | 0000 | 0000 | 0000 |
| 0000725520 | 0010 | 0000 | 0000 | 0000 | 0000 | 0000 | 795F | 635F |
| 0000725540 | 6F6F | 6472 | 0090 | 0000 | FFFF | 0003 | 0108 | 0000 |
| 0000725560 | 0000 | 0000 | 0010 | 0000 | 0000 | 0000 | 0000 | 0000 |
| 0000725600 | 0000 | 0000 | 4A2E | 0000 | 00A0 | 0000 | FFFF | 0009 |
| 0000725620 | 0108 | 22D6 | 0300 | 0000 | 0090 | 0000 | 0000 | 0000 |
| 0000725640 | 0000 | 0000 | 652E | 736F | 0000 | 0000 | 0000 | 0000 |
| 0000725660 | FFFE | 0008 | 0166 | 22E0 | 0000 | 0000 | 0130 | 0000 |
| 0000725700 | 0000 | 0000 | 0000 | 0000 | 312E | 6633 | 6B61 | 0065 |
| 0000725720 | 0000 | 0000 | FFFE | 0008 | 010A | 0000 | 0000 | 0000 |
| 0000725740 | 0050 | 0000 | 0000 | 22FA | 0000 | 0000 | 0000 | 0000 |
| 0000725760 | 4A38 | 0000 | 0000 | 0000 | FFFF | 000D | 0108 | 0000 |
| 0000726000 | 0000 | 0000 | 0010 | 0000 | 0000 | 0000 | 0000 | 0000 |
| 0000726020 | 0000 | 0000 | 4A50 | 0000 | 0010 | 0000 | FFFF | 000D |
| 0000726040 | 0108 | 0000 | 0000 | 0000 | 0010 | 0000 | 0000 | 0000 |
| 0000726060 | 0000 | 0000 | 0000 | 0000 | 4A62 | 0000 | 0020 | 0000 |
| 0000726100 | FFFF | 000D | 0108 | 0000 | 0000 | 0000 | 0010 | 0000 |

THU MAR 14 17:37:32 1991 GSPMON.4 PAGE 256, LINE 15046

| | | | | | | | | |
|---|---|---|---|---|---|---|---|---|
| 0000726120 | 0000 | 0000 | 0000 | 0000 | 0000 | 0000 | 4A6D | 0000 |
| 0000726140 | 0030 | 0000 | FFFF | 0010 | 0108 | 0000 | 0000 | 0000 |
| 0000726160 | 0020 | 0000 | 0000 | 0000 | 0000 | 0000 | 652E | 736F |
| 0000726200 | 0000 | 0000 | 0000 | 0000 | FFFE | 0008 | 0166 | 22EE |
| 0000726220 | 0000 | 0000 | 0050 | 0000 | 0000 | 0000 | 0000 | 0000 |
| 0000726240 | 312E | 6634 | 6B61 | 0065 | 0000 | 0000 | FFFE | 0008 |
| 0000726260 | 010A | 0000 | 0000 | 0000 | 0040 | 0000 | 0000 | 2302 |
| 0000726300 | 0000 | 0000 | 0000 | 0000 | 4A77 | 0000 | 0000 | 0000 |
| 0000726320 | FFFF | 0005 | 0108 | 0000 | 0000 | 0000 | 0020 | 0000 |
| 0000726340 | 0000 | 0000 | 0000 | 0000 | 0000 | 0000 | 4A87 | 0000 |
| 0000726360 | 0020 | 0000 | FFFF | 0005 | 0108 | 0000 | 0000 | 0000 |
| 0000726400 | 0020 | 0000 | 0000 | 0000 | 0000 | 0000 | 652E | 736F |
| 0000726420 | 0000 | 0000 | 0000 | 0000 | FFFE | 0008 | 0166 | 22FA |
| 0000726440 | 0000 | 0000 | 0040 | 0000 | 0000 | 0000 | 0000 | 0000 |
| 0000726460 | 312E | 6635 | 6B61 | 0065 | 0000 | 0000 | FFFE | 0008 |
| 0000726500 | 010A | 0000 | 0000 | 0000 | 0050 | 0000 | 0000 | 2310 |
| 0000726520 | 0000 | 0000 | 785F | 656C | 7466 | 0000 | 0000 | 0000 |
| 0000726540 | FFFF | 0003 | 0108 | 0000 | 0000 | 0000 | 0010 | 0000 |
| 0000726560 | 0000 | 0000 | 0000 | 0000 | 795F | 6F74 | 0070 | 0000 |
| 0000726600 | 0010 | 0000 | FFFF | 0003 | 0108 | 0000 | 0000 | 0000 |
| 0000726620 | 0010 | 0000 | 0000 | 0000 | 0000 | 0000 | 785F | 6972 |
| 0000726640 | 6867 | 0074 | 0020 | 0000 | FFFF | 0003 | 0108 | 0000 |
| 0000726660 | 0000 | 0000 | 0010 | 0000 | 0000 | 0000 | 0000 | 0000 |
| 0000726700 | 795F | 6F64 | 6E77 | 0000 | 0030 | 0000 | FFFF | 0003 |
| 0000726720 | 0108 | 0000 | 0000 | 0000 | 0010 | 0000 | 0000 | 0000 |
| 0000726740 | 0000 | 0000 | 0000 | 0000 | 4A96 | 0000 | 0040 | 0000 |
| 0000726760 | FFFF | 0003 | 0108 | 0000 | 0000 | 0000 | 0010 | 0000 |
| 0000727000 | 0000 | 0000 | 0000 | 0000 | 652E | 736F | 0000 | 0000 |
| 0000727020 | 0000 | 0000 | FFFE | 0008 | 0166 | 2302 | 0000 | 0000 |
| 0000727040 | 0050 | 0000 | 0000 | 0000 | 0000 | 0000 | 312E | 6636 |
| 0000727060 | 6B61 | 0065 | 0000 | 0000 | FFFE | 0008 | 010A | 0000 |
| 0000727100 | 0000 | 0000 | 0020 | 0000 | 0000 | 2318 | 0000 | 0000 |
| 0000727120 | 0000 | 0000 | 4AA0 | 0000 | 0000 | 0000 | FFFF | 0003 |
| 0000727140 | 0108 | 0000 | 0000 | 0000 | 0010 | 0000 | 0000 | 0000 |
| 0000727160 | 0000 | 0000 | 0000 | 0000 | 4AAC | 0000 | 0010 | 0000 |
| 0000727200 | FFFF | 0003 | 0108 | 0000 | 0000 | 0000 | 0010 | 0000 |
| 0000727220 | 0000 | 0000 | 0000 | 0000 | 652E | 736F | 0000 | 0000 |
| 0000727240 | 0000 | 0000 | FFFE | 0008 | 0166 | 2310 | 0000 | 0000 |
| 0000727260 | 0020 | 0000 | 0000 | 0000 | 0000 | 0000 | 312E | 6637 |
| 0000727300 | 6B61 | 0065 | 0000 | 0000 | FFFE | 0008 | 010A | 0000 |
| 0000727320 | 0000 | 0000 | 0040 | 0000 | 0000 | 2324 | 0000 | 0000 |
| 0000727340 | 0000 | 0000 | 4AB6 | 0000 | 0000 | 0000 | FFFF | 000D |
| 0000727360 | 0108 | 0000 | 0000 | 0000 | 0010 | 0000 | 0000 | 0000 |
| 0000727400 | 0000 | 0000 | 0000 | 0000 | 4AC9 | 0000 | 0010 | 0000 |
| 0000727420 | FFFF | 000D | 0108 | 0000 | 0000 | 0000 | 0010 | 0000 |
| 0000727440 | 0000 | 0000 | 0000 | 0000 | 0000 | 0000 | 4ADB | 0000 |
| 0000727460 | 0020 | 0000 | FFFF | 000D | 0108 | 0000 | 0000 | 0000 |
| 0000727500 | 0010 | 0000 | 0000 | 0000 | 0000 | 0000 | 0000 | 0000 |
| 0000727520 | 4AE8 | 0000 | 0030 | 0000 | FFFF | 000D | 0108 | 0000 |
| 0000727540 | 0000 | 0000 | 0010 | 0000 | 0000 | 0000 | 0000 | 0000 |
| 0000727560 | 652E | 736F | 0000 | 0000 | 0000 | 0000 | FFFE | 0008 |
| 0000727600 | 0166 | 2318 | 0000 | 0000 | 0040 | 0000 | 0000 | 0000 |
| 0000727620 | 0000 | 0000 | 662E | 6C69 | 0065 | 0000 | 2326 | 0000 |
| 0000727640 | FFFE | 0000 | 0167 | 7067 | 615F | 6C70 | 6369 | 632E |
| 0000727660 | 0000 | 0000 | 0000 | 0000 | 662E | 6C69 | 0065 | 0000 |
| 0000727700 | 2392 | 0000 | FFFE | 0000 | 0167 | 7067 | 6D5F | 756F |
| 0000727720 | 682E | 0000 | 0000 | 0000 | 0000 | 0000 | 312E | 6638 |
| 0000727740 | 6B61 | 0065 | 0000 | 0000 | FFFE | 0008 | 010A | 0000 |
| 0000727760 | 0000 | 0000 | 0060 | 0000 | 0000 | 2332 | 0000 | 0000 |

THU MAR 14 17:37:32 1991 GSPMON.4 PAGE 257, LINE 15105

| | | | | | | | | |
|---|---|---|---|---|---|---|---|---|
| 0000730000 | 0000 | 0000 | 4AF6 | 0000 | 0000 | 0000 | FFFF | 000F |
| 0000730020 | 0108 | 0000 | 0000 | 0000 | 0020 | 0000 | 0000 | 0000 |
| 0000730040 | 0000 | 0000 | 0000 | 0000 | 4B03 | 0000 | 0020 | 0000 |
| 0000730060 | FFFF | 000F | 0108 | 0000 | 0000 | 0000 | 0020 | 0000 |
| 0000730100 | 0000 | 0000 | 0000 | 0000 | 0000 | 0000 | 4B19 | 0000 |
| 0000730120 | 0040 | 0000 | FFFF | 000F | 0108 | 0000 | 0000 | 0000 |
| 0000730140 | 0020 | 0000 | 0000 | 0000 | 0000 | 0000 | 652E | 736F |
| 0000730160 | 0000 | 0000 | 0000 | 0000 | FFFE | 0008 | 0166 | 2328 |
| 0000730200 | 0000 | 0000 | 0060 | 0000 | 0000 | 0000 | 0000 | 0000 |
| 0000730220 | 312E | 6639 | 6B61 | 0065 | 0000 | 0000 | FFFE | 0008 |
| 0000730240 | 010A | 0000 | 0000 | 0000 | 00C0 | 0000 | 0000 | 234C |
| 0000730260 | 0000 | 0000 | 635F | 0078 | 0000 | 0000 | 0000 | 0000 |
| 0000730300 | FFFF | 000D | 0108 | 0000 | 0000 | 0000 | 0010 | 0000 |
| 0000730320 | 0000 | 0000 | 0000 | 0000 | 635F | 0079 | 0000 | 0000 |
| 0000730340 | 0010 | 0000 | FFFF | 000D | 0108 | 0000 | 0000 | 0000 |
| 0000730360 | 0010 | 0000 | 0000 | 0000 | 0000 | 0000 | 785F | 0031 |
| 0000730400 | 0000 | 0000 | 0020 | 0000 | FFFF | 0003 | 0108 | 0000 |
| 0000730420 | 0000 | 0000 | 0010 | 0000 | 0000 | 0000 | 0000 | 0000 |
| 0000730440 | 795F | 0031 | 0000 | 0000 | 0030 | 0000 | FFFF | 0003 |
| 0000730460 | 0108 | 0000 | 0000 | 0000 | 0010 | 0000 | 0000 | 0000 |
| 0000730500 | 0000 | 0000 | 785F | 0032 | 0000 | 0000 | 0040 | 0000 |
| 0000730520 | FFFF | 0003 | 0108 | 0000 | 0000 | 0000 | 0010 | 0000 |
| 0000730540 | 0000 | 0000 | 0000 | 0000 | 795F | 0032 | 0000 | 0000 |
| 0000730560 | 0050 | 0000 | FFFF | 0003 | 0108 | 0000 | 0000 | 0000 |
| 0000730600 | 0010 | 0000 | 0000 | 0000 | 0000 | 0000 | 685F | 5F70 |
| 0000730620 | 0078 | 0000 | 0060 | 0000 | FFFF | 0003 | 0108 | 0000 |
| 0000730640 | 0000 | 0000 | 0010 | 0000 | 0000 | 0000 | 0000 | 0000 |
| 0000730660 | 685F | 5F70 | 0079 | 0000 | 0070 | 0000 | FFFF | 0003 |
| 0000730700 | 0108 | 0000 | 0000 | 0000 | 0010 | 0000 | 0000 | 0000 |
| 0000730720 | 0000 | 0000 | 0000 | 0000 | 4B2A | 0000 | 0080 | 0000 |
| 0000730740 | FFFF | 000F | 0108 | 0000 | 0000 | 0000 | 0020 | 0000 |
| 0000730760 | 0000 | 0000 | 0000 | 0000 | 0000 | 0000 | 4B3A | 0000 |
| 0000731000 | 00A0 | 0000 | FFFF | 000D | 0108 | 0000 | 0000 | 0000 |
| 0000731020 | 0010 | 0000 | 0000 | 0000 | 0000 | 0000 | 0000 | 0000 |
| 0000731040 | 4B49 | 0000 | 00B0 | 0000 | FFFF | 000D | 0108 | 0000 |
| 0000731060 | 0000 | 0000 | 0010 | 0000 | 0000 | 0000 | 0000 | 0000 |
| 0000731100 | 652E | 736F | 0000 | 0000 | 0000 | 0000 | FFFE | 0008 |
| 0000731120 | 0166 | 2332 | 0000 | 0000 | 00C0 | 0000 | 0000 | 0000 |
| 0000731140 | 0000 | 0000 | 322E | 6630 | 6B61 | 0065 | 0000 | 0000 |
| 0000731160 | FFFE | 0008 | 010A | 0000 | 0000 | 0000 | 0030 | 0000 |
| 0000731200 | 0000 | 2356 | 0000 | 0000 | 785F | 0000 | 0000 | 0000 |
| 0000731220 | 0000 | 0000 | FFFF | 0003 | 0108 | 0000 | 0000 | 0000 |
| 0000731240 | 0010 | 0000 | 0000 | 0000 | 0000 | 0000 | 795F | 0000 |
| 0000731260 | 0000 | 0000 | 0010 | 0000 | FFFF | 0003 | 0108 | 0000 |
| 0000731300 | 0000 | 0000 | 0010 | 0000 | 0000 | 0000 | 0000 | 0000 |
| 0000731320 | 695F | 6F63 | 5F6E | 6469 | 0020 | 0000 | FFFF | 0003 |
| 0000731340 | 0108 | 0000 | 0000 | 0000 | 0010 | 0000 | 0000 | 0000 |
| 0000731360 | 0000 | 0000 | 652E | 736F | 0000 | 0000 | 0000 | 0000 |
| 0000731400 | FFFE | 0008 | 0166 | 234C | 0000 | 0000 | 0030 | 0000 |
| 0000731420 | 0000 | 0000 | 0000 | 0000 | 322E | 6631 | 6B61 | 0065 |
| 0000731440 | 0000 | 0000 | FFFE | 0008 | 010A | 0000 | 0000 | 0000 |
| 0000731460 | 0070 | 0000 | 0000 | 2368 | 0000 | 0000 | 785F | 0000 |
| 0000731500 | 0000 | 0000 | 0000 | 0000 | FFFF | 000D | 0108 | 0000 |
| 0000731520 | 0000 | 0000 | 0010 | 0000 | 0000 | 0000 | 0000 | 0000 |
| 0000731540 | 795F | 0000 | 0000 | 0000 | 0010 | 0000 | FFFF | 000D |
| 0000731560 | 0108 | 0000 | 0000 | 0000 | 0010 | 0000 | 0000 | 0000 |
| 0000731600 | 0000 | 0000 | 695F | 6F63 | 5F6E | 6469 | 0020 | 0000 |
| 0000731620 | FFFF | 000D | 0108 | 0000 | 0000 | 0000 | 0010 | 0000 |
| 0000731640 | 0000 | 0000 | 0000 | 0000 | 6C5F | 6665 | 0074 | 0000 |

THU MAR 14 17:37:32 1991 GSPMON.4 PAGE 258, LINE 15164

| | | | | | | | | |
|---|---|---|---|---|---|---|---|---|
| 0000731660 | 0030 | 0000 | FFFF | 000D | 0108 | 0000 | 0000 | 0000 |
| 0000731700 | 0010 | 0000 | 0000 | 0000 | 0000 | 0000 | 725F | 6769 |
| 0000731720 | 7468 | 0000 | 0040 | 0000 | FFFF | 000D | 0108 | 0000 |
| 0000731740 | 0000 | 0000 | 0010 | 0000 | 0000 | 0000 | 0000 | 0000 |
| 0000731760 | 755F | 0070 | 0000 | 0000 | 0050 | 0000 | FFFF | 000D |
| 0000732000 | 0108 | 0000 | 0000 | 0000 | 0010 | 0000 | 0000 | 0000 |
| 0000732020 | 0000 | 0000 | 645F | 776F | 006E | 0000 | 0060 | 0000 |
| 0000732040 | FFFF | 000D | 0108 | 0000 | 0000 | 0000 | 0010 | 0000 |
| 0000732060 | 0000 | 0000 | 0000 | 0000 | 652E | 736F | 0000 | 0000 |
| 0000732100 | 0000 | 0000 | FFFE | 0008 | 0166 | 2356 | 0000 | 0000 |
| 0000732120 | 0070 | 0000 | 0000 | 0000 | 0000 | 0000 | 322E | 6632 |
| 0000732140 | 6B61 | 0065 | 0000 | 0000 | FFFE | 0008 | 010A | 0000 |
| 0000732160 | 0000 | 0000 | 0020 | 0000 | 0000 | 2370 | 0000 | 0000 |
| 0000732200 | 6D5F | 646F | 0065 | 0000 | 0000 | 0000 | FFFF | 000D |
| 0000732220 | 0108 | 0000 | 0000 | 0000 | 0010 | 0000 | 0000 | 0000 |
| 0000732240 | 0000 | 0000 | 725F | 7365 | 6C75 | 0074 | 0010 | 0000 |
| 0000732260 | FFFF | 000D | 0108 | 0000 | 0000 | 0000 | 0010 | 0000 |
| 0000732300 | 0000 | 0000 | 0000 | 0000 | 652E | 736F | 0000 | 0000 |
| 0000732320 | 0000 | 0000 | FFFE | 0008 | 0166 | 2368 | 0000 | 0000 |
| 0000732340 | 0020 | 0000 | 0000 | 0000 | 0000 | 0000 | 322E | 6633 |
| 0000732360 | 6B61 | 0065 | 0000 | 0000 | FFFE | 0008 | 010A | 0000 |
| 0000732400 | 0000 | 0000 | 0020 | 0000 | 0000 | 237C | 0000 | 0000 |
| 0000732420 | 0000 | 0000 | 4B5A | 0000 | 0000 | 0000 | FFFF | 000C |
| 0000732440 | 0108 | 0000 | 0000 | 0000 | 0008 | 0000 | 0000 | 0000 |
| 0000732460 | 0000 | 0000 | 0000 | 0000 | 4B66 | 0000 | 0008 | 0000 |
| 0000732500 | FFFF | 000C | 0108 | 0000 | 0000 | 0000 | 0008 | 0000 |
| 0000732520 | 0000 | 0000 | 0000 | 0000 | 0000 | 0000 | 4B71 | 0000 |
| 0000732540 | 0010 | 0000 | FFFF | 000C | 0108 | 0000 | 0000 | 0000 |
| 0000732560 | 0008 | 0000 | 0000 | 0000 | 0000 | 0000 | 0000 | 0000 |
| 0000732600 | 4B7C | 0000 | 0018 | 0000 | FFFF | 000C | 0108 | 0000 |
| 0000732620 | 0000 | 0000 | 0008 | 0000 | 0000 | 0000 | 0000 | 0000 |
| 0000732640 | 652E | 736F | 0000 | 0000 | 0000 | 0000 | FFFE | 0008 |
| 0000732660 | 0166 | 2370 | 0000 | 0000 | 0020 | 0000 | 0000 | 0000 |
| 0000732700 | 0000 | 0000 | 322E | 6634 | 6B61 | 0065 | 0000 | 0000 |
| 0000732720 | FFFE | 0008 | 010A | 0000 | 0000 | 0000 | 0020 | 0000 |
| 0000732740 | 0000 | 2386 | 0000 | 0000 | 615F | 7474 | 0072 | 0000 |
| 0000732760 | 0000 | 0000 | FFFF | 000D | 0108 | 0000 | 0000 | 0000 |
| 0000733000 | 0010 | 0000 | 0000 | 0000 | 0000 | 0000 | 735F | 7274 |
| 0000733020 | 7069 | 0000 | 0010 | 0000 | FFFF | 000C | 0108 | 0000 |
| 0000733040 | 0000 | 0000 | 0008 | 0000 | 0000 | 0000 | 0000 | 0000 |
| 0000733060 | 725F | 6365 | 0074 | 0000 | 0018 | 0000 | FFFF | 000C |
| 0000733100 | 0108 | 0000 | 0000 | 0000 | 0008 | 0000 | 0000 | 0000 |
| 0000733120 | 0000 | 0000 | 652E | 736F | 0000 | 0000 | 0000 | 0000 |
| 0000733140 | FFFE | 0008 | 0166 | 237C | 0000 | 0000 | 0020 | 0000 |
| 0000733160 | 0000 | 0000 | 0000 | 0000 | 322E | 6635 | 6B61 | 0065 |
| 0000733200 | 0000 | 0000 | FFFE | 0008 | 010A | 0000 | 0000 | 0000 |
| 0000733220 | 1930 | 0000 | 0000 | 2392 | 0000 | 0000 | 0000 | 0000 |
| 0000733240 | 4B86 | 0000 | 0000 | 0000 | FFFF | 000D | 0108 | 0000 |
| 0000733260 | 0000 | 0000 | 0010 | 0000 | 0000 | 0000 | 0000 | 0000 |
| 0000733300 | 785F | 0000 | 0000 | 0000 | 0010 | 0000 | FFFF | 000D |
| 0000733320 | 0108 | 0000 | 0000 | 0000 | 0010 | 0000 | 0000 | 0000 |
| 0000733340 | 0000 | 0000 | 795F | 0000 | 0000 | 0000 | 0020 | 0000 |
| 0000733360 | FFFF | 000D | 0108 | 0000 | 0000 | 0000 | 0010 | 0000 |
| 0000733400 | 0000 | 0000 | 0000 | 0000 | 0000 | 0000 | 4B90 | 0000 |
| 0000733420 | 0030 | 0000 | FFFF | 0038 | 0108 | 237C | 0000 | 0000 |
| 0000733440 | 1900 | 00C8 | 0000 | 0000 | 0000 | 0000 | 652E | 736F |
| 0000733460 | 0000 | 0000 | 0000 | 0000 | FFFE | 0008 | 0166 | 2386 |
| 0000733500 | 0000 | 0000 | 1930 | 0000 | 0000 | 0000 | 0000 | 0000 |
| 0000733520 | 662E | 6C69 | 0065 | 0000 | 2394 | 0000 | FFFE | 0000 |

THU MAR 14 17:37:32 1991 GSPMON.4 PAGE 259, LINE 15223

| | | | | | | | | |
|---|---|---|---|---|---|---|---|---|
| 0000733540 | 0167 | 7067 | 615F | 6C70 | 6369 | 632E | 0000 | 0000 |
| 0000733560 | 0000 | 0000 | 662E | 6C69 | 0065 | 0000 | 23A0 | 0000 |
| 0000733600 | FFFE | 0000 | 0167 | 7067 | 615F | 6C70 | 682E | 0000 |
| 0000733620 | 0000 | 0000 | 0000 | 0000 | 322E | 6636 | 6B61 | 0065 |
| 0000733640 | 0000 | 0000 | FFFE | 0008 | 010A | 0000 | 0000 | 0000 |
| 0000733660 | 0030 | 0000 | 0000 | 23A0 | 0000 | 0000 | 775F | 6469 |
| 0000733700 | 6874 | 0000 | 0000 | 0000 | FFFF | 000D | 0108 | 0000 |
| 0000733720 | 0000 | 0000 | 0010 | 0000 | 0000 | 0000 | 0000 | 0000 |
| 0000733740 | 685F | 6965 | 6867 | 0074 | 0010 | 0000 | FFFF | 000D |
| 0000733760 | 0108 | 0000 | 0000 | 0000 | 0010 | 0000 | 0000 | 0000 |
| 0000734000 | 0000 | 0000 | 645F | 7065 | 6874 | 0000 | 0020 | 0000 |
| 0000734020 | FFFF | 000D | 0108 | 0000 | 0000 | 0000 | 0010 | 0000 |
| 0000734040 | 0000 | 0000 | 0000 | 0000 | 652E | 736F | 0000 | 0000 |
| 0000734060 | 0000 | 0000 | FFFE | 0008 | 0166 | 2396 | 0000 | 0000 |
| 0000734100 | 0030 | 0000 | 0000 | 0000 | 0000 | 0000 | 662E | 6C69 |
| 0000734120 | 0065 | 0000 | 23A2 | 0000 | FFFE | 0000 | 0167 | 7067 |
| 0000734140 | 615F | 6C70 | 692E | 636E | 0000 | 0000 | 0000 | 0000 |
| 0000734160 | 662E | 6C69 | 0065 | 0000 | 23A4 | 0000 | FFFE | 0000 |
| 0000734200 | 0167 | 7067 | 615F | 6C70 | 682E | 0000 | 0000 | 0000 |
| 0000734220 | 0000 | 0000 | 662E | 6C69 | 0065 | 0000 | 23B8 | 0000 |
| 0000734240 | FFFE | 0000 | 0167 | 7067 | 615F | 6C70 | 6369 | 632E |
| 0000734260 | 0000 | 0000 | 0000 | 0000 | 0000 | 0000 | 4B9C | 0000 |
| 0000734300 | 2B80 | FFC6 | 0001 | 0024 | 0102 | 0000 | 0000 | 04D0 |
| 0000734320 | 0000 | 3328 | 0001 | 23B0 | 0000 | 0003 | 622E | 0066 |
| 0000734340 | 0000 | 0000 | 2B80 | FFC6 | 0001 | 0000 | 0165 | 0000 |
| 0000734360 | 0000 | 0060 | 0000 | 0000 | 0000 | 0268 | 0000 | 0000 |
| 0000734400 | 695F | 5F6E | 7470 | 0072 | FFE0 | FFFF | FFFF | 0010 |
| 0000734420 | 0109 | 0000 | 0000 | 0000 | 0020 | 0000 | 0000 | 0000 |
| 0000734440 | 0000 | 0000 | 6F5F | 7475 | 705F | 7274 | FFC0 | FFFF |
| 0000734460 | FFFF | 0010 | 0109 | 0000 | 0000 | 0000 | 0020 | 0000 |
| 0000734500 | 0000 | 0000 | 0000 | 0000 | 652E | 0066 | 0000 | 0000 |
| 0000734520 | 3050 | FFC6 | 0001 | 0000 | 0165 | 0000 | 0000 | 008D |
| 0000734540 | 0000 | 0000 | 0000 | 0000 | 0000 | 0000 | 742E | 7865 |
| 0000734560 | 0074 | 0000 | 2B80 | FFC6 | 0001 | 0000 | 0103 | 04D0 |
| 0000734600 | 0000 | 000F | 0010 | 0000 | 0000 | 0000 | 0000 | 0000 |
| 0000734620 | 642E | 7461 | 0061 | 0000 | 0000 | 0000 | 0004 | 0000 |
| 0000734640 | 0103 | 0000 | 0000 | 0000 | 0000 | 0000 | 0000 | 0000 |
| 0000734660 | 0000 | 0000 | 622E | 7373 | 0000 | 0000 | 6B20 | FFD2 |
| 0000734700 | 0003 | 0000 | 0103 | 0080 | 0000 | 0000 | 0000 | 0000 |
| 0000734720 | 0000 | 0000 | 0000 | 0000 | 632E | 6E69 | 7469 | 0000 |
| 0000734740 | CEF0 | FFC6 | 0002 | 0000 | 0103 | 00D0 | 0000 | 0003 |
| 0000734760 | 0000 | 0000 | 0000 | 0000 | 0000 | 0000 | 662E | 6C69 |
| 0000735000 | 0065 | 0000 | 23BA | 0000 | FFFE | 0000 | 0167 | 7067 |
| 0000735020 | 635F | 646D | 632E | 0000 | 0000 | 0000 | 0000 | 0000 |
| 0000735040 | 662E | 6C69 | 0065 | 0000 | 23BC | 0000 | FFFE | 0000 |
| 0000735060 | 0167 | 7473 | 6D64 | 682E | 0000 | 0000 | 0000 | 0000 |
| 0000735100 | 0000 | 0000 | 662E | 6C69 | 0065 | 0000 | 23BE | 0000 |
| 0000735120 | FFFE | 0000 | 0167 | 7067 | 635F | 646D | 632E | 0000 |
| 0000735140 | 0000 | 0000 | 0000 | 0000 | 662E | 6C69 | 0065 | 0000 |
| 0000735160 | 23C8 | 0000 | FFFE | 0000 | 0167 | 7473 | 6C64 | 6269 |
| 0000735200 | 682E | 0000 | 0000 | 0000 | 0000 | 0000 | 302E | 6166 |
| 0000735220 | 656B | 0000 | 0000 | 0000 | FFFE | 0008 | 010A | 0000 |
| 0000735240 | 0000 | 0000 | 0040 | 0000 | 0000 | 23C8 | 0000 | 0000 |
| 0000735260 | 715F | 6F75 | 0074 | 0000 | 0000 | 0000 | FFFF | 0004 |
| 0000735300 | 0108 | 0000 | 0000 | 0000 | 0020 | 0000 | 0000 | 0000 |
| 0000735320 | 0000 | 0000 | 725F | 6D65 | 0000 | 0000 | 0020 | 0000 |
| 0000735340 | FFFF | 0004 | 0108 | 0000 | 0000 | 0000 | 0020 | 0000 |
| 0000735360 | 0000 | 0000 | 0000 | 0000 | 652E | 736F | 0000 | 0000 |
| 0000735400 | 0000 | 0000 | FFFE | 0008 | 0166 | 23C0 | 0000 | 0000 |

THU MAR 14 17:37:32 1991 GSPMON.4 PAGE 260, LINE 15282

| | | | | | | | | |
|---|---|---|---|---|---|---|---|---|
| 0000735420 | 0040 | 0000 | 0000 | 0000 | 0000 | 0000 | 662E | 6C69 |
| 0000735440 | 0065 | 0000 | 23CA | 0000 | FFFE | 0000 | 0167 | 7067 |
| 0000735460 | 635F | 646D | 632E | 0000 | 0000 | 0000 | 0000 | 0000 |
| 0000735500 | 662E | 6C69 | 0065 | 0000 | 23DA | 0000 | FFFE | 0000 |
| 0000735520 | 0167 | 7974 | 6570 | 6564 | 2E66 | 0068 | 0000 | 0000 |
| 0000735540 | 0000 | 0000 | 312E | 6166 | 656B | 0000 | 0000 | 0000 |
| 0000735560 | FFFE | 000A | 010F | 0000 | 0000 | 0000 | 0001 | 0000 |
| 0000735600 | 0000 | 23D4 | 0000 | 0000 | 465F | 4C41 | 4553 | 0000 |
| 0000735620 | 0000 | 0000 | FFFF | 000B | 0110 | 0000 | 0000 | 0000 |
| 0000735640 | 0001 | 0000 | 0000 | 0000 | 0000 | 0000 | 545F | 5552 |
| 0000735660 | 0045 | 0000 | 0001 | 0000 | FFFF | 000B | 0110 | 0000 |
| 0000735700 | 0000 | 0000 | 0001 | 0000 | 0000 | 0000 | 0000 | 0000 |
| 0000735720 | 652E | 736F | 0000 | 0000 | 0000 | 0000 | FFFE | 000A |
| 0000735740 | 0166 | 23CC | 0000 | 0000 | 0001 | 0000 | 0000 | 0000 |
| 0000735760 | 0000 | 0000 | 322E | 6166 | 656B | 0000 | 0000 | 0000 |
| 0000736000 | FFFE | 0008 | 010A | 0000 | 0000 | 0000 | 0004 | 0000 |
| 0000736020 | 0000 | 23DA | 0000 | 0000 | 705F | 7869 | 6C65 | 0000 |
| 0000736040 | 0000 | 0000 | FFFF | 000E | 0112 | 0000 | 0000 | 0000 |
| 0000736060 | 0004 | 0000 | 0000 | 0000 | 0000 | 0000 | 652E | 736F |
| 0000736100 | 0000 | 0000 | 0000 | 0000 | FFFE | 0008 | 0166 | 23D4 |
| 0000736120 | 0000 | 0000 | 0004 | 0000 | 0000 | 0000 | 0000 | 0000 |
| 0000736140 | 662E | 6C69 | 0065 | 0000 | 23DC | 0000 | FFFE | 0000 |
| 0000736160 | 0167 | 7067 | 635F | 646D | 632E | 0000 | 0000 | 0000 |
| 0000736200 | 0000 | 0000 | 662E | 6C69 | 0065 | 0000 | 23DE | 0000 |
| 0000736220 | FFFE | 0000 | 0167 | 7367 | 7370 | 7379 | 682E | 0000 |
| 0000736240 | 0000 | 0000 | 0000 | 0000 | 662E | 6C69 | 0065 | 0000 |
| 0000736260 | 23E0 | 0000 | FFFE | 0000 | 0167 | 7367 | 7370 | 7379 |
| 0000736300 | 692E | 636E | 0000 | 0000 | 0000 | 0000 | 662E | 6C69 |
| 0000736320 | 0065 | 0000 | 23E2 | 0000 | FFFE | 0000 | 0167 | 7367 |
| 0000736340 | 7370 | 7379 | 682E | 0000 | 0000 | 0000 | 0000 | 0000 |
| 0000736360 | 662E | 6C69 | 0065 | 0000 | 23E4 | 0000 | FFFE | 0000 |
| 0000736400 | 0167 | 7067 | 635F | 646D | 632E | 0000 | 0000 | 0000 |
| 0000736420 | 0000 | 0000 | 662E | 6C69 | 0065 | 0000 | 24C0 | 0000 |
| 0000736440 | FFFE | 0000 | 0167 | 7367 | 6370 | 6766 | 682E | 0000 |
| 0000736460 | 0000 | 0000 | 0000 | 0000 | 0000 | 0000 | 4BAA | 0000 |
| 0000736500 | 0000 | 0000 | FFFE | 000A | 010F | 0000 | 0000 | 0000 |
| 0000736520 | 0002 | 0000 | 0000 | 23F0 | 0000 | 0000 | 4F5F | 454E |
| 0000736540 | 315F | 0036 | 0000 | 0000 | FFFF | 000B | 0110 | 0000 |
| 0000736560 | 0000 | 0000 | 0002 | 0000 | 0000 | 0000 | 0000 | 0000 |
| 0000736600 | 545F | 4F57 | 385F | 0000 | 0001 | 0000 | FFFF | 000B |
| 0000736620 | 0110 | 0000 | 0000 | 0000 | 0002 | 0000 | 0000 | 0000 |
| 0000736640 | 0000 | 0000 | 465F | 554F | 5F52 | 0034 | 0002 | 0000 |
| 0000736660 | FFFF | 000B | 0110 | 0000 | 0000 | 0000 | 0002 | 0000 |
| 0000736700 | 0000 | 0000 | 0000 | 0000 | 652E | 736F | 0000 | 0000 |
| 0000736720 | 0000 | 0000 | FFFE | 000A | 0166 | 23E6 | 0000 | 0000 |
| 0000736740 | 0002 | 0000 | 0000 | 0000 | 0000 | 0000 | 635F | 726C |
| 0000736760 | 655F | 7272 | 0000 | 0000 | FFFE | 000A | 010F | 0000 |
| 0000737000 | 0000 | 0000 | 0001 | 0000 | 0000 | 23F8 | 0000 | 0000 |
| 0000737020 | 4E5F | 5F4F | 4C43 | 0052 | 0000 | 0000 | FFFF | 000B |
| 0000737040 | 0110 | 0000 | 0000 | 0000 | 0001 | 0000 | 0000 | 0000 |
| 0000737060 | 0000 | 0000 | 435F | 524C | 0000 | 0000 | 0001 | 0000 |
| 0000737100 | FFFF | 000B | 0110 | 0000 | 0000 | 0000 | 0001 | 0000 |
| 0000737120 | 0000 | 0000 | 0000 | 0000 | 652E | 736F | 0000 | 0000 |
| 0000737140 | 0000 | 0000 | FFFE | 000A | 0166 | 23F0 | 0000 | 0000 |
| 0000737160 | 0001 | 0000 | 0000 | 0000 | 0000 | 0000 | 0000 | 0000 |
| 0000737200 | 4BB4 | 0000 | 0000 | 0000 | FFFE | 000A | 010F | 0000 |
| 0000737220 | 0000 | 0000 | 0003 | 0000 | 0000 | 2406 | 0000 | 0000 |
| 0000737240 | 505F | 414C | 454E | 0030 | 0000 | 0000 | FFFF | 000B |
| 0000737260 | 0110 | 0000 | 0000 | 0000 | 0003 | 0000 | 0000 | 0000 |

THU MAR 14 17:37:32 1991 GSPMON.4 PAGE 261, LINE 15341

| | | | | | | | | |
|---|---|---|---|---|---|---|---|---|
| 0000737300 | 0000 | 0000 | 505F | 414C | 454E | 0032 | 0001 | 0000 |
| 0000737320 | FFFF | 000B | 0110 | 0000 | 0000 | 0000 | 0003 | 0000 |
| 0000737340 | 0000 | 0000 | 0000 | 0000 | 505F | 414C | 454E | 0031 |
| 0000737360 | 0002 | 0000 | FFFF | 000B | 0110 | 0000 | 0000 | 0000 |
| 0000737400 | 0003 | 0000 | 0000 | 0000 | 0000 | 0000 | 505F | 414C |
| 0000737420 | 454E | 0033 | 0003 | 0000 | FFFF | 000B | 0110 | 0000 |
| 0000737440 | 0000 | 0000 | 0003 | 0000 | 0000 | 0000 | 0000 | 0000 |
| 0000737460 | 4E5F | 504F | 414C | 454E | 0004 | 0000 | FFFF | 000B |
| 0000737500 | 0110 | 0000 | 0000 | 0000 | 0003 | 0000 | 0000 | 0000 |
| 0000737520 | 0000 | 0000 | 652E | 736F | 0000 | 0000 | 0000 | 0000 |
| 0000737540 | FFFE | 000A | 0166 | 23F8 | 0000 | 0000 | 0003 | 0000 |
| 0000737560 | 0000 | 0000 | 0000 | 0000 | 0000 | 0000 | 4BBF | 0000 |
| 0000737600 | 0000 | 0000 | FFFE | 000A | 010F | 0000 | 0000 | 0000 |
| 0000737620 | 0001 | 0000 | 0000 | 240E | 0000 | 0000 | 4E5F | 5F4F |
| 0000737640 | 4944 | 5053 | 0000 | 0000 | FFFF | 000B | 0110 | 0000 |
| 0000737660 | 0000 | 0000 | 0001 | 0000 | 0000 | 0000 | 0000 | 0000 |
| 0000737700 | 445F | 5349 | 0050 | 0000 | 0001 | 0000 | FFFF | 000B |
| 0000737720 | 0110 | 0000 | 0000 | 0000 | 0001 | 0000 | 0000 | 0000 |
| 0000737740 | 0000 | 0000 | 652E | 736F | 0000 | 0000 | 0000 | 0000 |
| 0000737760 | FFFE | 000A | 0166 | 2406 | 0000 | 0000 | 0001 | 0000 |
| 0000740000 | 0000 | 0000 | 0000 | 0000 | 665F | 5F62 | 6E65 | 0000 |
| 0000740020 | 0000 | 0000 | FFFE | 000A | 010F | 0000 | 0000 | 0000 |
| 0000740040 | 0001 | 0000 | 0000 | 2416 | 0000 | 0000 | 0000 | 0000 |
| 0000740060 | 4BC9 | 0000 | 0000 | 0000 | FFFF | 000B | 0110 | 0000 |
| 0000740100 | 0000 | 0000 | 0001 | 0000 | 0000 | 0000 | 0000 | 0000 |
| 0000740120 | 0000 | 0000 | 4BD4 | 0000 | 0001 | 0000 | FFFF | 000B |
| 0000740140 | 0110 | 0000 | 0000 | 0000 | 0001 | 0000 | 0000 | 0000 |
| 0000740160 | 0000 | 0000 | 652E | 736F | 0000 | 0000 | 0000 | 0000 |
| 0000740200 | FFFE | 000A | 0166 | 240E | 0000 | 0000 | 0001 | 0000 |
| 0000740220 | 0000 | 0000 | 0000 | 0000 | 7A5F | 7265 | 5F6F | 0062 |
| 0000740240 | 0000 | 0000 | FFFE | 000A | 010F | 0000 | 0000 | 0000 |
| 0000740260 | 0001 | 0000 | 0000 | 241E | 0000 | 0000 | 0000 | 0000 |
| 0000740300 | 4BDE | 0000 | 0000 | 0000 | FFFF | 000B | 0110 | 0000 |
| 0000740320 | 0000 | 0000 | 0001 | 0000 | 0000 | 0000 | 0000 | 0000 |
| 0000740340 | 0000 | 0000 | 4BEA | 0000 | 0001 | 0000 | FFFF | 000B |
| 0000740360 | 0110 | 0000 | 0000 | 0000 | 0001 | 0000 | 0000 | 0000 |
| 0000740400 | 0000 | 0000 | 652E | 736F | 0000 | 0000 | 0000 | 0000 |
| 0000740420 | FFFE | 000A | 0166 | 2416 | 0000 | 0000 | 0001 | 0000 |
| 0000740440 | 0000 | 0000 | 0000 | 0000 | 7A5F | 7265 | 5F6F | 0061 |
| 0000740460 | 0000 | 0000 | FFFE | 000A | 010F | 0000 | 0000 | 0000 |
| 0000740500 | 0001 | 0000 | 0000 | 2426 | 0000 | 0000 | 0000 | 0000 |
| 0000740520 | 4BF4 | 0000 | 0000 | 0000 | FFFF | 000B | 0110 | 0000 |
| 0000740540 | 0000 | 0000 | 0001 | 0000 | 0000 | 0000 | 0000 | 0000 |
| 0000740560 | 0000 | 0000 | 4C00 | 0000 | 0001 | 0000 | FFFF | 000B |
| 0000740600 | 0110 | 0000 | 0000 | 0000 | 0001 | 0000 | 0000 | 0000 |
| 0000740620 | 0000 | 0000 | 652E | 736F | 0000 | 0000 | 0000 | 0000 |
| 0000740640 | FFFE | 000A | 0166 | 241E | 0000 | 0000 | 0001 | 0000 |
| 0000740660 | 0000 | 0000 | 0000 | 0000 | 0000 | 0000 | 4C0A | 0000 |
| 0000740700 | 0000 | 0000 | FFFE | 000A | 010F | 0000 | 0000 | 0000 |
| 0000740720 | 0002 | 0000 | 0000 | 2432 | 0000 | 0000 | 0000 | 0000 |
| 0000740740 | 4C14 | 0000 | 0000 | 0000 | FFFF | 000B | 0110 | 0000 |
| 0000740760 | 0000 | 0000 | 0002 | 0000 | 0000 | 0000 | 0000 | 0000 |
| 0000741000 | 0000 | 0000 | 4C1E | 0000 | 0001 | 0000 | FFFF | 000B |
| 0000741020 | 0110 | 0000 | 0000 | 0000 | 0002 | 0000 | 0000 | 0000 |
| 0000741040 | 0000 | 0000 | 0000 | 0000 | 4C28 | 0000 | 0002 | 0000 |
| 0000741060 | FFFF | 000B | 0110 | 0000 | 0000 | 0000 | 0002 | 0000 |
| 0000741100 | 0000 | 0000 | 0000 | 0000 | 0000 | 0000 | 4C32 | 0000 |
| 0000741120 | 0003 | 0000 | FFFF | 000B | 0110 | 0000 | 0000 | 0000 |
| 0000741140 | 0002 | 0000 | 0000 | 0000 | 0000 | 0000 | 652E | 736F |

THU MAR 14 17:37:32 1991 GSPMON.4 PAGE 262, LINE 15400

| | | | | | | | | |
|---|---|---|---|---|---|---|---|---|
| 0000741160 | 0000 | 0000 | 0000 | 0000 | FFFE | 000A | 0166 | 2426 |
| 0000741200 | 0000 | 0000 | 0002 | 0000 | 0000 | 0000 | 0000 | 0000 |
| 0000741220 | 615F | 756C | 665F | 636E | 0000 | 0000 | FFFE | 000A |
| 0000741240 | 010F | 0000 | 0000 | 0000 | 0003 | 0000 | 0000 | 2446 |
| 0000741260 | 0000 | 0000 | 435F | 454C | 5241 | 0000 | 0000 | 0000 |
| 0000741300 | FFFF | 000B | 0110 | 0000 | 0000 | 0000 | 0003 | 0000 |
| 0000741320 | 0000 | 0000 | 0000 | 0000 | 425F | 494D | 554E | 4153 |
| 0000741340 | 0001 | 0000 | FFFF | 000B | 0110 | 0000 | 0000 | 0000 |
| 0000741360 | 0003 | 0000 | 0000 | 0000 | 0000 | 0000 | 415F | 494D |
| 0000741400 | 554E | 4253 | 0002 | 0000 | FFFF | 000B | 0110 | 0000 |
| 0000741420 | 0000 | 0000 | 0003 | 0000 | 0000 | 0000 | 0000 | 0000 |
| 0000741440 | 505F | 554C | 0053 | 0000 | 0003 | 0000 | FFFF | 000B |
| 0000741460 | 0110 | 0000 | 0000 | 0000 | 0003 | 0000 | 0000 | 0000 |
| 0000741500 | 0000 | 0000 | 585F | 524F | 0000 | 0000 | 0004 | 0000 |
| 0000741520 | FFFF | 000B | 0110 | 0000 | 0000 | 0000 | 0003 | 0000 |
| 0000741540 | 0000 | 0000 | 0000 | 0000 | 4F5F | 0052 | 0000 | 0000 |
| 0000741560 | 0005 | 0000 | FFFF | 000B | 0110 | 0000 | 0000 | 0000 |
| 0000741600 | 0003 | 0000 | 0000 | 0000 | 0000 | 0000 | 415F | 444E |
| 0000741620 | 0000 | 0000 | 0006 | 0000 | FFFF | 000B | 0110 | 0000 |
| 0000741640 | 0000 | 0000 | 0003 | 0000 | 0000 | 0000 | 0000 | 0000 |
| 0000741660 | 505F | 4552 | 4553 | 0054 | 0007 | 0000 | FFFF | 000B |
| 0000741700 | 0110 | 0000 | 0000 | 0000 | 0003 | 0000 | 0000 | 0000 |
| 0000741720 | 0000 | 0000 | 652E | 736F | 0000 | 0000 | 0000 | 0000 |
| 0000741740 | FFFE | 000A | 0166 | 2432 | 0000 | 0000 | 0003 | 0000 |
| 0000741760 | 0000 | 0000 | 0000 | 0000 | 615F | 756C | 635F | 7972 |
| 0000742000 | 0000 | 0000 | FFFE | 000A | 010F | 0000 | 0000 | 0000 |
| 0000742020 | 0001 | 0000 | 0000 | 244E | 0000 | 0000 | 5A5F | 5245 |
| 0000742040 | 004F | 0000 | 0000 | 0000 | FFFF | 000B | 0110 | 0000 |
| 0000742060 | 0000 | 0000 | 0001 | 0000 | 0000 | 0000 | 0000 | 0000 |
| 0000742100 | 4F5F | 454E | 0000 | 0000 | 0001 | 0000 | FFFF | 000B |
| 0000742120 | 0110 | 0000 | 0000 | 0000 | 0001 | 0000 | 0000 | 0000 |
| 0000742140 | 0000 | 0000 | 652E | 736F | 0000 | 0000 | 0000 | 0000 |
| 0000742160 | FFFE | 000A | 0166 | 2446 | 0000 | 0000 | 0001 | 0000 |
| 0000742200 | 0000 | 0000 | 0000 | 0000 | 0000 | 0000 | 4C3C | 0000 |
| 0000742220 | 0000 | 0000 | FFFE | 000A | 010F | 0000 | 0000 | 0000 |
| 0000742240 | 0001 | 0000 | 0000 | 2456 | 0000 | 0000 | 0000 | 0000 |
| 0000742260 | 4C48 | 0000 | 0000 | 0000 | FFFF | 000B | 0110 | 0000 |
| 0000742300 | 0000 | 0000 | 0001 | 0000 | 0000 | 0000 | 0000 | 0000 |
| 0000742320 | 0000 | 0000 | 4C55 | 0000 | 0001 | 0000 | FFFF | 000B |
| 0000742340 | 0110 | 0000 | 0000 | 0000 | 0001 | 0000 | 0000 | 0000 |
| 0000742360 | 0000 | 0000 | 652E | 736F | 0000 | 0000 | 0000 | 0000 |
| 0000742400 | FFFE | 000A | 0166 | 244E | 0000 | 0000 | 0001 | 0000 |
| 0000742420 | 0000 | 0000 | 0000 | 0000 | 0000 | 0000 | 4C61 | 0000 |
| 0000742440 | 0000 | 0000 | FFFE | 000A | 010F | 0000 | 0000 | 0000 |
| 0000742460 | 0001 | 0000 | 0000 | 245E | 0000 | 0000 | 4D5F | 5341 |
| 0000742500 | 5F4B | 4E45 | 0000 | 0000 | FFFF | 000B | 0110 | 0000 |
| 0000742520 | 0000 | 0000 | 0001 | 0000 | 0000 | 0000 | 0000 | 0000 |
| 0000742540 | 0000 | 0000 | 4C6E | 0000 | 0001 | 0000 | FFFF | 000B |
| 0000742560 | 0110 | 0000 | 0000 | 0000 | 0001 | 0000 | 0000 | 0000 |
| 0000742600 | 0000 | 0000 | 652E | 736F | 0000 | 0000 | 0000 | 0000 |
| 0000742620 | FFFE | 000A | 0166 | 2456 | 0000 | 0000 | 0001 | 0000 |
| 0000742640 | 0000 | 0000 | 0000 | 0000 | 0000 | 0000 | 4C78 | 0000 |
| 0000742660 | 0000 | 0000 | FFFE | 000A | 010F | 0000 | 0000 | 0000 |
| 0000742700 | 0001 | 0000 | 0000 | 2466 | 0000 | 0000 | 0000 | 0000 |
| 0000742720 | 4C83 | 0000 | 0000 | 0000 | FFFF | 000B | 0110 | 0000 |
| 0000742740 | 0000 | 0000 | 0001 | 0000 | 0000 | 0000 | 0000 | 0000 |
| 0000742760 | 0000 | 0000 | 4C8D | 0000 | 0001 | 0000 | FFFF | 000B |
| 0000743000 | 0110 | 0000 | 0000 | 0000 | 0001 | 0000 | 0000 | 0000 |
| 0000743020 | 0000 | 0000 | 652E | 736F | 0000 | 0000 | 0000 | 0000 |

THU MAR 14 17:37:32 1991 GSPMON.4 PAGE 263, LINE 15459

| | | | | | | | | |
|---|---|---|---|---|---|---|---|---|
| 0000743040 | FFFE | 000A | 0166 | 245E | 0000 | 0000 | 0001 | 0000 |
| 0000743060 | 0000 | 0000 | 0000 | 0000 | 0000 | 0000 | 4C98 | 0000 |
| 0000743100 | 0000 | 0000 | FFFE | 000A | 010F | 0000 | 0000 | 0000 |
| 0000743120 | 0001 | 0000 | 0000 | 246E | 0000 | 0000 | 0000 | 0000 |
| 0000743140 | 4CA3 | 0000 | 0000 | 0000 | FFFF | 000B | 0110 | 0000 |
| 0000743160 | 0000 | 0000 | 0001 | 0000 | 0000 | 0000 | 0000 | 0000 |
| 0000743200 | 0000 | 0000 | 4CAE | 0000 | 0001 | 0000 | FFFF | 000B |
| 0000743220 | 0110 | 0000 | 0000 | 0000 | 0001 | 0000 | 0000 | 0000 |
| 0000743240 | 0000 | 0000 | 652E | 736F | 0000 | 0000 | 0000 | 0000 |
| 0000743260 | FFFE | 000A | 0166 | 2466 | 0000 | 0000 | 0001 | 0000 |
| 0000743300 | 0000 | 0000 | 0000 | 0000 | 6D5F | 5F62 | 7566 | 636E |
| 0000743320 | 0000 | 0000 | FFFE | 000A | 010F | 0000 | 0000 | 0000 |
| 0000743340 | 0002 | 0000 | 0000 | 247A | 0000 | 0000 | 0000 | 0000 |
| 0000743360 | 4CB8 | 0000 | 0000 | 0000 | FFFF | 000B | 0110 | 0000 |
| 0000743400 | 0000 | 0000 | 0002 | 0000 | 0000 | 0000 | 0000 | 0000 |
| 0000743420 | 4D5F | 5F42 | 5845 | 5257 | 0001 | 0000 | FFFF | 000B |
| 0000743440 | 0110 | 0000 | 0000 | 0000 | 0002 | 0000 | 0000 | 0000 |
| 0000743460 | 0000 | 0000 | 4D5F | 5F42 | 4552 | 4441 | 0002 | 0000 |
| 0000743500 | FFFF | 000B | 0110 | 0000 | 0000 | 0000 | 0002 | 0000 |
| 0000743520 | 0000 | 0000 | 0000 | 0000 | 4D5F | 5F42 | 504F | 4E45 |
| 0000743540 | 0003 | 0000 | FFFF | 000B | 0110 | 0000 | 0000 | 0000 |
| 0000743560 | 0002 | 0000 | 0000 | 0000 | 0000 | 0000 | 652E | 736F |
| 0000743600 | 0000 | 0000 | 0000 | 0000 | FFFE | 000A | 0166 | 246E |
| 0000743620 | 0000 | 0000 | 0002 | 0000 | 0000 | 0000 | 0000 | 0000 |
| 0000743640 | 0000 | 0000 | 4CC2 | 0000 | 0000 | 0000 | FFFE | 000A |
| 0000743660 | 010F | 0000 | 0000 | 0000 | 0002 | 0000 | 0000 | 2484 |
| 0000743700 | 0000 | 0000 | 0000 | 0000 | 4CCC | 0000 | 0000 | 0000 |
| 0000743720 | FFFF | 000B | 0110 | 0000 | 0000 | 0000 | 0002 | 0000 |
| 0000743740 | 0000 | 0000 | 0000 | 0000 | 0000 | 0000 | 4CD8 | 0000 |
| 0000743760 | 0001 | 0000 | FFFF | 000B | 0110 | 0000 | 0000 | 0000 |
| 0000744000 | 0002 | 0000 | 0000 | 0000 | 0000 | 0000 | 4D5F | 3442 |
| 0000744020 | 525F | 0044 | 0003 | 0000 | FFFF | 000B | 0110 | 0000 |
| 0000744040 | 0000 | 0000 | 0002 | 0000 | 0000 | 0000 | 0000 | 0000 |
| 0000744060 | 652E | 736F | 0000 | 0000 | 0000 | 0000 | FFFE | 000A |
| 0000744100 | 0166 | 247A | 0000 | 0000 | 0002 | 0000 | 0000 | 0000 |
| 0000744120 | 0000 | 0000 | 0000 | 0000 | 4CE3 | 0000 | 0000 | 0000 |
| 0000744140 | FFFE | 000A | 010F | 0000 | 0000 | 0000 | 0002 | 0000 |
| 0000744160 | 0000 | 248C | 0000 | 0000 | 4D5F | 3542 | 575F | 0052 |
| 0000744200 | 0000 | 0000 | FFFF | 000B | 0110 | 0000 | 0000 | 0000 |
| 0000744220 | 0002 | 0000 | 0000 | 0000 | 0000 | 0000 | 4D5F | 3542 |
| 0000744240 | 525F | 0044 | 0003 | 0000 | FFFF | 000B | 0110 | 0000 |
| 0000744260 | 0000 | 0000 | 0002 | 0000 | 0000 | 0000 | 0000 | 0000 |
| 0000744300 | 652E | 736F | 0000 | 0000 | 0000 | 0000 | FFFE | 000A |
| 0000744320 | 0166 | 2484 | 0000 | 0000 | 0002 | 0000 | 0000 | 0000 |
| 0000744340 | 0000 | 0000 | 0000 | 0000 | 4CED | 0000 | 0000 | 0000 |
| 0000744360 | FFFE | 000A | 010F | 0000 | 0000 | 0000 | 0001 | 0000 |
| 0000744400 | 0000 | 2494 | 0000 | 0000 | 0000 | 0000 | 4CF9 | 0000 |
| 0000744420 | 0000 | 0000 | FFFF | 000B | 0110 | 0000 | 0000 | 0000 |
| 0000744440 | 0001 | 0000 | 0000 | 0000 | 0000 | 0000 | 0000 | 0000 |
| 0000744460 | 4D04 | 0000 | 0001 | 0000 | FFFF | 000B | 0110 | 0000 |
| 0000744500 | 0000 | 0000 | 0001 | 0000 | 0000 | 0000 | 0000 | 0000 |
| 0000744520 | 652E | 736F | 0000 | 0000 | 0000 | 0000 | FFFE | 000A |
| 0000744540 | 0166 | 248C | 0000 | 0000 | 0001 | 0000 | 0000 | 0000 |
| 0000744560 | 0000 | 0000 | 0000 | 0000 | 4D0E | 0000 | 0000 | 0000 |
| 0000744600 | FFFE | 000A | 010F | 0000 | 0000 | 0000 | 0001 | 0000 |
| 0000744620 | 0000 | 249C | 0000 | 0000 | 0000 | 0000 | 4D1B | 0000 |
| 0000744640 | 0000 | 0000 | FFFF | 000B | 0110 | 0000 | 0000 | 0000 |
| 0000744660 | 0001 | 0000 | 0000 | 0000 | 0000 | 0000 | 0000 | 0000 |
| 0000744700 | 4D27 | 0000 | 0001 | 0000 | FFFF | 000B | 0110 | 0000 |

THU MAR 14 17:37:32 1991 GSPMON.4 PAGE 264, LINE 15518

| | | | | | | | | |
|---|---|---|---|---|---|---|---|---|
| 0000744720 | 0000 | 0000 | 0001 | 0000 | 0000 | 0000 | 0000 | 0000 |
| 0000744740 | 652E | 736F | 0000 | 0000 | 0000 | 0000 | FFFE | 000A |
| 0000744760 | 0166 | 2494 | 0000 | 0000 | 0001 | 0000 | 0000 | 0000 |
| 0000745000 | 0000 | 0000 | 0000 | 0000 | 4D34 | 0000 | 0000 | 0000 |
| 0000745020 | FFFE | 000A | 010F | 0000 | 0000 | 0000 | 0003 | 0000 |
| 0000745040 | 0000 | 24AC | 0000 | 0000 | 585F | 424D | 0030 | 0000 |
| 0000745060 | 0000 | 0000 | FFFF | 000B | 0110 | 0000 | 0000 | 0000 |
| 0000745100 | 0003 | 0000 | 0000 | 0000 | 0000 | 0000 | 585F | 424D |
| 0000745120 | 0031 | 0000 | 0001 | 0000 | FFFF | 000B | 0110 | 0000 |
| 0000745140 | 0000 | 0000 | 0003 | 0000 | 0000 | 0000 | 0000 | 0000 |
| 0000745160 | 585F | 424D | 0032 | 0000 | 0002 | 0000 | FFFF | 000B |
| 0000745200 | 0110 | 0000 | 0000 | 0000 | 0003 | 0000 | 0000 | 0000 |
| 0000745220 | 0000 | 0000 | 585F | 424D | 0033 | 0000 | 0003 | 0000 |
| 0000745240 | FFFF | 000B | 0110 | 0000 | 0000 | 0000 | 0003 | 0000 |
| 0000745260 | 0000 | 0000 | 0000 | 0000 | 585F | 424D | 0034 | 0000 |
| 0000745300 | 0004 | 0000 | FFFF | 000B | 0110 | 0000 | 0000 | 0000 |
| 0000745320 | 0003 | 0000 | 0000 | 0000 | 0000 | 0000 | 585F | 424D |
| 0000745340 | 0035 | 0000 | 0005 | 0000 | FFFF | 000B | 0110 | 0000 |
| 0000745360 | 0000 | 0000 | 0003 | 0000 | 0000 | 0000 | 0000 | 0000 |
| 0000745400 | 652E | 736F | 0000 | 0000 | 0000 | 0000 | FFFE | 000A |
| 0000745420 | 0166 | 249C | 0000 | 0000 | 0003 | 0000 | 0000 | 0000 |
| 0000745440 | 0000 | 0000 | 635F | 6E68 | 006C | 0000 | 0000 | 0000 |
| 0000745460 | FFFE | 000A | 010F | 0000 | 0000 | 0000 | 0002 | 0000 |
| 0000745500 | 0000 | 24B8 | 0000 | 0000 | 525F | 4445 | 435F | 0048 |
| 0000745520 | 0000 | 0000 | FFFF | 000B | 0110 | 0000 | 0000 | 0000 |
| 0000745540 | 0002 | 0000 | 0000 | 0000 | 0000 | 0000 | 0000 | 0000 |
| 0000745560 | 4D3E | 0000 | 0001 | 0000 | FFFF | 000B | 0110 | 0000 |
| 0000745600 | 0000 | 0000 | 0002 | 0000 | 0000 | 0000 | 0000 | 0000 |
| 0000745620 | 425F | 554C | 5F45 | 4843 | 0002 | 0000 | FFFF | 000B |
| 0000745640 | 0110 | 0000 | 0000 | 0000 | 0002 | 0000 | 0000 | 0000 |
| 0000745660 | 0000 | 0000 | 0000 | 0000 | 4D48 | 0000 | 0003 | 0000 |
| 0000745700 | FFFF | 000B | 0110 | 0000 | 0000 | 0000 | 0002 | 0000 |
| 0000745720 | 0000 | 0000 | 0000 | 0000 | 652E | 736F | 0000 | 0000 |
| 0000745740 | 0000 | 0000 | FFFE | 000A | 0166 | 24AC | 0000 | 0000 |
| 0000745760 | 0002 | 0000 | 0000 | 0000 | 0000 | 0000 | 0000 | 0000 |
| 0000746000 | 4D54 | 0000 | 0000 | 0000 | FFFE | 000A | 010F | 0000 |
| 0000746020 | 0000 | 0000 | 0001 | 0000 | 0000 | 24C0 | 0000 | 0000 |
| 0000746040 | 0000 | 0000 | 4D5E | 0000 | 0000 | 0000 | FFFF | 000B |
| 0000746060 | 0110 | 0000 | 0000 | 0000 | 0001 | 0000 | 0000 | 0000 |
| 0000746100 | 0000 | 0000 | 435F | 4359 | 494C | 0043 | 0001 | 0000 |
| 0000746120 | FFFF | 000B | 0110 | 0000 | 0000 | 0000 | 0001 | 0000 |
| 0000746140 | 0000 | 0000 | 0000 | 0000 | 652E | 736F | 0000 | 0000 |
| 0000746160 | 0000 | 0000 | FFFE | 000A | 0166 | 24B8 | 0000 | 0000 |
| 0000746200 | 0001 | 0000 | 0000 | 0000 | 0000 | 0000 | 662E | 6C69 |
| 0000746220 | 0065 | 0000 | 24C2 | 0000 | FFFE | 0000 | 0167 | 7067 |
| 0000746240 | 635F | 646D | 632E | 0000 | 0000 | 0000 | 0000 | 0000 |
| 0000746260 | 662E | 6C69 | 0065 | 0000 | 24C4 | 0000 | FFFE | 0000 |
| 0000746300 | 0167 | 7367 | 6870 | 6477 | 682E | 0000 | 0000 | 0000 |
| 0000746320 | 0000 | 0000 | 662E | 6C69 | 0065 | 0000 | 24C6 | 0000 |
| 0000746340 | FFFE | 0000 | 0167 | 7067 | 635F | 646D | 632E | 0000 |
| 0000746360 | 0000 | 0000 | 0000 | 0000 | 662E | 6C69 | 0065 | 0000 |
| 0000746400 | 2524 | 0000 | FFFE | 0000 | 0167 | 7367 | 6870 | 6377 |
| 0000746420 | 682E | 0000 | 0000 | 0000 | 0000 | 0000 | 332E | 6166 |
| 0000746440 | 656B | 0000 | 0000 | 0000 | FFFE | 0008 | 010A | 0000 |
| 0000746460 | 0000 | 0000 | 0010 | 0000 | 0000 | 24E0 | 0000 | 0000 |
| 0000746500 | 0000 | 0000 | 4D68 | 0000 | 0000 | 0000 | FFFF | 000E |
| 0000746520 | 0112 | 0000 | 0000 | 0000 | 0002 | 0000 | 0000 | 0000 |
| 0000746540 | 0000 | 0000 | 665F | 6C69 | 306C | 0000 | 0002 | 0000 |
| 0000746560 | FFFF | 000E | 0112 | 0000 | 0000 | 0000 | 0001 | 0000 |

THU MAR 14 17:37:32 1991 GSPMON.4 PAGE 265, LINE 15577

| | | | | | | | | |
|---|---|---|---|---|---|---|---|---|
| 0000746600 | 0000 | 0000 | 0000 | 0000 | 635F | 726C | 7265 | 0072 |
| 0000746620 | 0003 | 0000 | FFFF | 000E | 0112 | 0000 | 0000 | 0000 |
| 0000746640 | 0001 | 0000 | 0000 | 0000 | 0000 | 0000 | 665F | 6C69 |
| 0000746660 | 316C | 0000 | 0004 | 0000 | FFFF | 000E | 0112 | 0000 |
| 0000746700 | 0000 | 0000 | 0002 | 0000 | 0000 | 0000 | 0000 | 0000 |
| 0000746720 | 6D5F | 6B73 | 6573 | 006C | 0006 | 0000 | FFFF | 000E |
| 0000746740 | 0112 | 0000 | 0000 | 0000 | 0002 | 0000 | 0000 | 0000 |
| 0000746760 | 0000 | 0000 | 665F | 6468 | 7369 | 0070 | 0008 | 0000 |
| 0000747000 | FFFF | 000E | 0112 | 0000 | 0000 | 0060 | 0004 | 0000 |
| 0000747020 | 0000 | 0000 | 0000 | 0000 | 645F | 7369 | 6170 | 6C6C |
| 0000747040 | 000C | 0000 | FFFF | 000E | 0112 | 0000 | 0000 | 0000 |
| 0000747060 | 0001 | 0000 | 0000 | 0000 | 0000 | 0000 | 665F | 5F62 |
| 0000747100 | 6E65 | 0000 | 000D | 0000 | FFFF | 000E | 0112 | 0000 |
| 0000747120 | 0000 | 0000 | 0001 | 0000 | 0000 | 0000 | 0000 | 0000 |
| 0000747140 | 7A5F | 7265 | 5F6F | 0062 | 000E | 0000 | FFFF | 000E |
| 0000747160 | 0112 | 0000 | 0000 | 0000 | 0001 | 0000 | 0000 | 0000 |
| 0000747200 | 0000 | 0000 | 7A5F | 7265 | 5F6F | 0061 | 000F | 0000 |
| 0000747220 | FFFF | 000E | 0112 | 0000 | 0000 | 0000 | 0001 | 0000 |
| 0000747240 | 0000 | 0000 | 0000 | 0000 | 652E | 736F | 0000 | 0000 |
| 0000747260 | 0000 | 0000 | FFFE | 0008 | 0166 | 24C8 | 0000 | 0000 |
| 0000747300 | 0010 | 0000 | 0000 | 0000 | 0000 | 0000 | 342E | 6166 |
| 0000747320 | 656B | 0000 | 0000 | 0000 | FFFE | 0008 | 010A | 0000 |
| 0000747340 | 0000 | 0000 | 0010 | 0000 | 0000 | 24F8 | 0000 | 0000 |
| 0000747360 | 6D5F | 6B73 | 6E65 | 0034 | 0000 | 0000 | FFFF | 000E |
| 0000747400 | 0112 | 0000 | 0000 | 0000 | 0001 | 0000 | 0000 | 0000 |
| 0000747420 | 0000 | 0000 | 6D5F | 6B73 | 6E65 | 0035 | 0001 | 0000 |
| 0000747440 | FFFF | 000E | 0112 | 0000 | 0000 | 0000 | 0001 | 0000 |
| 0000747460 | 0000 | 0000 | 0000 | 0000 | 705F | 6C6F | 7261 | 0034 |
| 0000747500 | 0002 | 0000 | FFFF | 000E | 0112 | 0000 | 0000 | 0000 |
| 0000747520 | 0001 | 0000 | 0000 | 0000 | 0000 | 0000 | 705F | 6C6F |
| 0000747540 | 7261 | 0035 | 0003 | 0000 | FFFF | 000E | 0112 | 0000 |
| 0000747560 | 0000 | 0000 | 0001 | 0000 | 0000 | 0000 | 0000 | 0000 |
| 0000747600 | 615F | 756C | 6E66 | 0063 | 0004 | 0000 | FFFF | 000E |
| 0000747620 | 0112 | 0000 | 0000 | 0000 | 0003 | 0000 | 0000 | 0000 |
| 0000747640 | 0000 | 0000 | 615F | 756C | 7263 | 0079 | 0007 | 0000 |
| 0000747660 | FFFF | 000E | 0112 | 0000 | 0000 | 0000 | 0001 | 0000 |
| 0000747700 | 0000 | 0000 | 0000 | 0000 | 615F | 7273 | 0063 | 0000 |
| 0000747720 | 0008 | 0000 | FFFF | 000E | 0112 | 0000 | 0000 | 0000 |
| 0000747740 | 0002 | 0000 | 0000 | 0000 | 0000 | 0000 | 625F | 7273 |
| 0000747760 | 0063 | 0000 | 000A | 0000 | FFFF | 000E | 0112 | 0000 |
| 0000750000 | 0000 | 0000 | 0002 | 0000 | 0000 | 0000 | 0000 | 0000 |
| 0000750020 | 635F | 7273 | 0063 | 0000 | 000C | 0000 | FFFF | 000E |
| 0000750040 | 0112 | 0000 | 0000 | 0000 | 0002 | 0000 | 0000 | 0000 |
| 0000750060 | 0000 | 0000 | 645F | 7273 | 0063 | 0000 | 000E | 0000 |
| 0000750100 | FFFF | 000E | 0112 | 0000 | 0000 | 0000 | 0002 | 0000 |
| 0000750120 | 0000 | 0000 | 0000 | 0000 | 652E | 736F | 0000 | 0000 |
| 0000750140 | 0000 | 0000 | FFFE | 0008 | 0166 | 24E0 | 0000 | 0000 |
| 0000750160 | 0010 | 0000 | 0000 | 0000 | 0000 | 0000 | 352E | 6166 |
| 0000750200 | 656B | 0000 | 0000 | 0000 | FFFE | 0008 | 010A | 0000 |
| 0000750220 | 0000 | 0000 | 0010 | 0000 | 0000 | 2510 | 0000 | 0000 |
| 0000750240 | 655F | 636E | 6B68 | 0000 | 0000 | 0000 | FFFF | 000E |
| 0000750260 | 0112 | 0000 | 0000 | 0000 | 0001 | 0000 | 0000 | 0000 |
| 0000750300 | 0000 | 0000 | 675F | 6172 | 3262 | 0000 | 0001 | 0000 |
| 0000750320 | FFFF | 000E | 0112 | 0000 | 0000 | 0000 | 0001 | 0000 |
| 0000750340 | 0000 | 0000 | 0000 | 0000 | 6D5F | 6362 | 0035 | 0000 |
| 0000750360 | 0002 | 0000 | FFFF | 000E | 0112 | 0000 | 0000 | 0000 |
| 0000750400 | 0002 | 0000 | 0000 | 0000 | 0000 | 0000 | 6D5F | 6362 |
| 0000750420 | 0034 | 0000 | 0004 | 0000 | FFFF | 000E | 0112 | 0000 |
| 0000750440 | 0000 | 0000 | 0002 | 0000 | 0000 | 0000 | 0000 | 0000 |

THU MAR 14 17:37:32 1991 GSPMON.4 PAGE 266, LINE 15636

| | | | | | | | | |
|---|---|---|---|---|---|---|---|---|
| 0000750460 | 6D5F | 6362 | 0033 | 0000 | 0006 | 0000 | FFFF | 000E |
| 0000750500 | 0112 | 0000 | 0000 | 0000 | 0002 | 0000 | 0000 | 0000 |
| 0000750520 | 0000 | 0000 | 6D5F | 6362 | 0032 | 0000 | 0008 | 0000 |
| 0000750540 | FFFF | 000E | 0112 | 0000 | 0000 | 0000 | 0002 | 0000 |
| 0000750560 | 0000 | 0000 | 0000 | 0000 | 6D5F | 6362 | 0031 | 0000 |
| 0000750600 | 000A | 0000 | FFFF | 000E | 0112 | 0000 | 0000 | 0000 |
| 0000750620 | 0002 | 0000 | 0000 | 0000 | 0000 | 0000 | 6D5F | 6362 |
| 0000750640 | 0030 | 0000 | 000C | 0000 | FFFF | 000E | 0112 | 0000 |
| 0000750660 | 0000 | 0000 | 0002 | 0000 | 0000 | 0000 | 0000 | 0000 |
| 0000750700 | 735F | 6572 | 0000 | 0000 | 000E | 0000 | FFFF | 000E |
| 0000750720 | 0112 | 0000 | 0000 | 0000 | 0001 | 0000 | 0000 | 0000 |
| 0000750740 | 0000 | 0000 | 735F | 6472 | 0000 | 0000 | 000F | 0000 |
| 0000750760 | FFFF | 000E | 0112 | 0000 | 0000 | 0000 | 0001 | 0000 |
| 0000751000 | 0000 | 0000 | 0000 | 0000 | 652E | 736F | 0000 | 0000 |
| 0000751020 | 0000 | 0000 | FFFE | 0008 | 0166 | 24F8 | 0000 | 0000 |
| 0000751040 | 0010 | 0000 | 0000 | 0000 | 0000 | 0000 | 362E | 6166 |
| 0000751060 | 656B | 0000 | 0000 | 0000 | FFFE | 0008 | 010A | 0000 |
| 0000751100 | 0000 | 0000 | 0010 | 0000 | 0000 | 2518 | 0000 | 0000 |
| 0000751120 | 765F | 6469 | 6573 | 006C | 0000 | 0000 | FFFF | 000E |
| 0000751140 | 0112 | 0000 | 0000 | 0000 | 0003 | 0000 | 0000 | 0000 |
| 0000751160 | 0000 | 000D | 665F | 6C69 | 006C | 0000 | 0003 | 0000 |
| 0000751200 | FFFF | 000E | 0112 | 0000 | 0000 | 0000 | 000D | 0000 |
| 0000751220 | 0000 | 0000 | 0000 | 0000 | 652E | 736F | 0000 | 0000 |
| 0000751240 | 0000 | 0000 | FFFE | 0008 | 0166 | 2510 | 0000 | 0000 |
| 0000751260 | 0010 | 0000 | 0000 | 0000 | 0000 | 0000 | 372E | 6166 |
| 0000751300 | 656B | 0000 | 0000 | 0000 | FFFE | 0008 | 010A | 0000 |
| 0000751320 | 0000 | 0000 | 0040 | 0000 | 0000 | 2524 | 0000 | 0000 |
| 0000751340 | 635F | 746E | 6C72 | 0030 | 0000 | 0000 | FFFF | 0008 |
| 0000751360 | 0108 | 24C8 | 0000 | 0000 | 0010 | 0000 | 0000 | 0000 |
| 0000751400 | 0000 | 0000 | 635F | 746E | 6C72 | 0031 | 0010 | 0000 |
| 0000751420 | FFFF | 0008 | 0108 | 24E0 | 0000 | 0000 | 0010 | 0000 |
| 0000751440 | 0000 | 0000 | 0000 | 0000 | 635F | 746E | 6C72 | 0032 |
| 0000751460 | 0020 | 0000 | FFFF | 0008 | 0108 | 24F8 | 0000 | 0000 |
| 0000751500 | 0010 | 0000 | 0000 | 0000 | 0000 | 0000 | 635F | 746E |
| 0000751520 | 6C72 | 0033 | 0030 | 0000 | FFFF | 0008 | 0108 | 2510 |
| 0000751540 | 0000 | 0000 | 0010 | 0000 | 0000 | 0000 | 0000 | 0000 |
| 0000751560 | 652E | 736F | 0000 | 0000 | 0000 | 0000 | FFFE | 0008 |
| 0000751600 | 0166 | 2518 | 0000 | 0000 | 0040 | 0000 | 0000 | 0000 |
| 0000751620 | 0000 | 0000 | 662E | 6C69 | 0065 | 0000 | 2526 | 0000 |
| 0000751640 | FFFE | 0000 | 0167 | 7067 | 635F | 646D | 632E | 0000 |
| 0000751660 | 0000 | 0000 | 0000 | 0000 | 662E | 6C69 | 0065 | 0000 |
| 0000751700 | 2528 | 0000 | FFFE | 0000 | 0167 | 7367 | 6370 | 6E6F |
| 0000751720 | 682E | 0000 | 0000 | 0000 | 0000 | 0000 | 662E | 6C69 |
| 0000751740 | 0065 | 0000 | 252A | 0000 | FFFE | 0000 | 0167 | 7367 |
| 0000751760 | 6370 | 6E6F | 692E | 636E | 0000 | 0000 | 0000 | 0000 |
| 0000752000 | 662E | 6C69 | 0065 | 0000 | 252C | 0000 | FFFE | 0000 |
| 0000752020 | 0167 | 7367 | 6370 | 6E6F | 682E | 0000 | 0000 | 0000 |
| 0000752040 | 0000 | 0000 | 662E | 6C69 | 0065 | 0000 | 252E | 0000 |
| 0000752060 | FFFE | 0000 | 0167 | 7067 | 635F | 646D | 632E | 0000 |
| 0000752100 | 0000 | 0000 | 0000 | 0000 | 662E | 6C69 | 0065 | 0000 |
| 0000752120 | 25F2 | 0000 | FFFE | 0000 | 0167 | 7067 | 705F | 6275 |
| 0000752140 | 682E | 0000 | 0000 | 0000 | 0000 | 0000 | 382E | 6166 |
| 0000752160 | 656B | 0000 | 0000 | 0000 | FFFE | 0008 | 010A | 0000 |
| 0000752200 | 0000 | 0000 | 01C0 | 0000 | 0000 | 2560 | 0000 | 0000 |
| 0000752220 | 685F | 7365 | 6E79 | 0063 | 0000 | 0000 | FFFF | 000D |
| 0000752240 | 0108 | 0000 | 0000 | 0000 | 0010 | 0000 | 0000 | 0000 |
| 0000752260 | 0000 | 0000 | 685F | 6265 | 6E6C | 006B | 0010 | 0000 |
| 0000752300 | FFFF | 000D | 0108 | 0000 | 0000 | 0000 | 0010 | 0000 |
| 0000752320 | 0000 | 0000 | 0000 | 0000 | 685F | 6273 | 6E6C | 006B |

THU MAR 14 17:37:32 1991 GSPMON.4 PAGE 267, LINE 15695

| | | | | | | | | |
|---|---|---|---|---|---|---|---|---|
| 0000752340 | 0020 | 0000 | FFFF | 000D | 0108 | 0000 | 0000 | 0000 |
| 0000752360 | 0010 | 0000 | 0000 | 0000 | 0000 | 0000 | 765F | 7365 |
| 0000752400 | 6E79 | 0063 | 0030 | 0000 | FFFF | 000D | 0108 | 0000 |
| 0000752420 | 0000 | 0000 | 0010 | 0000 | 0000 | 0000 | 0000 | 0000 |
| 0000752440 | 765F | 6265 | 6E6C | 006B | 0040 | 0000 | FFFF | 000D |
| 0000752460 | 0108 | 0000 | 0000 | 0000 | 0010 | 0000 | 0000 | 0000 |
| 0000752500 | 0000 | 0000 | 765F | 6273 | 6E6C | 006B | 0050 | 0000 |
| 0000752520 | FFFF | 000D | 0108 | 0000 | 0000 | 0000 | 0010 | 0000 |
| 0000752540 | 0000 | 0000 | 0000 | 0000 | 0000 | 0000 | 4D72 | 0000 |
| 0000752560 | 0060 | 0000 | FFFF | 000D | 0108 | 0000 | 0000 | 0000 |
| 0000752600 | 0010 | 0000 | 0000 | 0000 | 0000 | 0000 | 665F | 6468 |
| 0000752620 | 7369 | 0070 | 0070 | 0000 | FFFF | 000D | 0108 | 0000 |
| 0000752640 | 0000 | 0000 | 0010 | 0000 | 0000 | 0000 | 0000 | 0000 |
| 0000752660 | 6D5F | 5F62 | 6973 | 657A | 0080 | 0000 | FFFF | 000F |
| 0000752700 | 0108 | 0000 | 0000 | 0000 | 0020 | 0000 | 0000 | 0000 |
| 0000752720 | 0000 | 0000 | 0000 | 0000 | 4D7D | 0000 | 00A0 | 0000 |
| 0000752740 | FFFF | 000D | 0108 | 0000 | 0000 | 0000 | 0010 | 0000 |
| 0000752760 | 0000 | 0000 | 0000 | 0000 | 0000 | 0000 | 4D87 | 0000 |
| 0000753000 | 00B0 | 0000 | FFFF | 000D | 0108 | 0000 | 0000 | 0000 |
| 0000753020 | 0010 | 0000 | 0000 | 0000 | 0000 | 0000 | 0000 | 0000 |
| 0000753040 | 4D91 | 0000 | 00C0 | 0000 | FFFF | 000D | 0108 | 0000 |
| 0000753060 | 0000 | 0000 | 0010 | 0000 | 0000 | 0000 | 0000 | 0000 |
| 0000753100 | 0000 | 0000 | 4D9C | 0000 | 00D0 | 0000 | FFFF | 000D |
| 0000753120 | 0108 | 0000 | 0000 | 0000 | 0010 | 0000 | 0000 | 0000 |
| 0000753140 | 0000 | 0000 | 0000 | 0000 | 4DA6 | 0000 | 00E0 | 0000 |
| 0000753160 | FFFF | 000F | 0108 | 0000 | 0000 | 0000 | 0020 | 0000 |
| 0000753200 | 0000 | 0000 | 0000 | 0000 | 0000 | 0000 | 4DB3 | 0000 |
| 0000753220 | 0100 | 0000 | FFFF | 000F | 0108 | 0000 | 0000 | 0000 |
| 0000753240 | 0020 | 0000 | 0000 | 0000 | 0000 | 0000 | 0000 | 0000 |
| 0000753260 | 4DC5 | 0000 | 0120 | 0000 | FFFF | 000F | 0108 | 0000 |
| 0000753300 | 0000 | 0000 | 0020 | 0000 | 0000 | 0000 | 0000 | 0000 |
| 0000753320 | 0000 | 0000 | 4DD4 | 0000 | 0140 | 0000 | FFFF | 000F |
| 0000753340 | 0108 | 0000 | 0000 | 0000 | 0020 | 0000 | 0000 | 0000 |
| 0000753360 | 0000 | 0000 | 0000 | 0000 | 4DEA | 0000 | 0160 | 0000 |
| 0000753400 | FFFF | 000D | 0108 | 0000 | 0000 | 0000 | 0010 | 0000 |
| 0000753420 | 0000 | 0000 | 0000 | 0000 | 0000 | 0000 | 4DF5 | 0000 |
| 0000753440 | 0170 | 0000 | FFFF | 000D | 0108 | 0000 | 0000 | 0000 |
| 0000753460 | 0010 | 0000 | 0000 | 0000 | 0000 | 0000 | 0000 | 0000 |
| 0000753500 | 4E09 | 0000 | 0180 | 0000 | FFFF | 000D | 0108 | 0000 |
| 0000753520 | 0000 | 0000 | 0010 | 0000 | 0000 | 0000 | 0000 | 0000 |
| 0000753540 | 0000 | 0000 | 4E1D | 0000 | 0190 | 0000 | FFFF | 000F |
| 0000753560 | 0108 | 0000 | 0000 | 0000 | 0020 | 0000 | 0000 | 0000 |
| 0000753600 | 0000 | 0000 | 0000 | 0000 | 4E2C | 0000 | 01B0 | 0000 |
| 0000753620 | FFFF | 000D | 0108 | 0000 | 0000 | 0000 | 0010 | 0000 |
| 0000753640 | 0000 | 0000 | 0000 | 0000 | 652E | 736F | 0000 | 0000 |
| 0000753660 | 0000 | 0000 | FFFE | 0008 | 0166 | 2530 | 0000 | 0000 |
| 0000753700 | 01C0 | 0000 | 0000 | 0000 | 0000 | 0000 | 392E | 6166 |
| 0000753720 | 656B | 0000 | 0000 | 0000 | FFFE | 0008 | 010A | 0000 |
| 0000753740 | 0000 | 0000 | 0050 | 0000 | 0000 | 256A | 0000 | 0000 |
| 0000753760 | 6D5F | 6773 | 705F | 7274 | 0000 | 0000 | FFFF | 0010 |
| 0000754000 | 0108 | 0000 | 0000 | 0000 | 0020 | 0000 | 0000 | 0000 |
| 0000754020 | 0000 | 0000 | 0000 | 0000 | 4E38 | 0000 | 0020 | 0000 |
| 0000754040 | FFFF | 000F | 0108 | 0000 | 0000 | 0000 | 0020 | 0000 |
| 0000754060 | 0000 | 0000 | 0000 | 0000 | 0000 | 0000 | 4E42 | 0000 |
| 0000754100 | 0040 | 0000 | FFFF | 000D | 0108 | 0000 | 0000 | 0000 |
| 0000754120 | 0010 | 0000 | 0000 | 0000 | 0000 | 0000 | 652E | 736F |
| 0000754140 | 0000 | 0000 | 0000 | 0000 | FFFE | 0008 | 0166 | 2560 |
| 0000754160 | 0000 | 0000 | 0050 | 0000 | 0000 | 0000 | 0000 | 0000 |
| 0000754200 | 312E | 6630 | 6B61 | 0065 | 0000 | 0000 | FFFE | 0008 |

THU MAR 14 17:37:32 1991 GSPMON.4 PAGE 268, LINE 15754

| | | | | | | | | |
|---|---|---|---|---|---|---|---|---|
| 0000754220 | 010A | 0000 | 0000 | 0000 | 0040 | 0000 | 0000 | 2576 |
| 0000754240 | 0000 | 0000 | 0000 | 0000 | 4E4D | 0000 | 0000 | 0000 |
| 0000754260 | FFFF | 000D | 0108 | 0000 | 0000 | 0000 | 0010 | 0000 |
| 0000754300 | 0000 | 0000 | 0000 | 0000 | 6A5F | 6D75 | 0070 | 0000 |
| 0000754320 | 0010 | 0000 | FFFF | 000D | 0108 | 0000 | 0000 | 0000 |
| 0000754340 | 0010 | 0000 | 0000 | 0000 | 0000 | 0000 | 735F | 6174 |
| 0000754360 | 7472 | 0000 | 0020 | 0000 | FFFF | 000D | 0108 | 0000 |
| 0000754400 | 0000 | 0000 | 0010 | 0000 | 0000 | 0000 | 0000 | 0000 |
| 0000754420 | 655F | 646E | 0000 | 0000 | 0030 | 0000 | FFFF | 000D |
| 0000754440 | 0108 | 0000 | 0000 | 0000 | 0010 | 0000 | 0000 | 0000 |
| 0000754460 | 0000 | 0000 | 652E | 736F | 0000 | 0000 | 0000 | 0000 |
| 0000754500 | FFFE | 0008 | 0166 | 256A | 0000 | 0000 | 0040 | 0000 |
| 0000754520 | 0000 | 0000 | 0000 | 0000 | 312E | 6631 | 6B61 | 0065 |
| 0000754540 | 0000 | 0000 | FFFE | 0008 | 010A | 0000 | 0000 | 0000 |
| 0000754560 | 0080 | 0000 | 0000 | 257E | 0000 | 0000 | 685F | 0000 |
| 0000754600 | 0000 | 0000 | 0000 | 0000 | FFFF | 0008 | 0108 | 256A |
| 0000754620 | 0000 | 0000 | 0040 | 0000 | 0000 | 0000 | 0000 | 0000 |
| 0000754640 | 765F | 0000 | 0000 | 0000 | 0040 | 0000 | FFFF | 0008 |
| 0000754660 | 0108 | 256A | 0000 | 0000 | 0040 | 0000 | 0000 | 0000 |
| 0000754700 | 0000 | 000C | 652E | 736F | 0000 | 0000 | 0000 | 0000 |
| 0000754720 | FFFE | 0008 | 0166 | 2576 | 0000 | 0000 | 0080 | 0000 |
| 0000754740 | 0000 | 0000 | 0000 | 0000 | 312E | 6632 | 6B61 | 0065 |
| 0000754760 | 0000 | 0000 | FFFE | 0009 | 010C | 0000 | 0000 | 0000 |
| 0000755000 | 0200 | 0000 | 0000 | 2588 | 0000 | 0000 | 635F | 6B68 |
| 0000755020 | 7573 | 006D | 0000 | 0000 | FFFF | 003D | 010B | 0000 |
| 0000755040 | 0000 | 0000 | 0200 | 0020 | 0000 | 0000 | 0000 | 0000 |
| 0000755060 | 655F | 7272 | 6E63 | 0074 | 0000 | 0000 | FFFF | 003D |
| 0000755100 | 010B | 0000 | 0000 | 0000 | 0200 | 0020 | 0000 | 0000 |
| 0000755120 | 0000 | 0000 | 635F | 6372 | 3233 | 0000 | 0000 | 0000 |
| 0000755140 | FFFF | 003D | 010B | 0000 | 0000 | 0000 | 0200 | 0020 |
| 0000755160 | 0000 | 0000 | 0000 | 0000 | 652E | 736F | 0000 | 0000 |
| 0000755200 | 0000 | 0000 | FFFE | 0009 | 0166 | 257E | 0000 | 0000 |
| 0000755220 | 0200 | 0000 | 0000 | 0000 | 0000 | 0000 | 312E | 6633 |
| 0000755240 | 6B61 | 0065 | 0000 | 0000 | FFFE | 0008 | 010A | 0000 |
| 0000755260 | 0000 | 0000 | 0240 | 0000 | 0000 | 2590 | 0000 | 0000 |
| 0000755300 | 0000 | 0000 | 4E59 | 0000 | 0000 | 0000 | FFFF | 0008 |
| 0000755320 | 0108 | 256A | 0000 | 0000 | 0040 | 0000 | 0000 | 0000 |
| 0000755340 | 0000 | 0000 | 0000 | 0000 | 4E66 | 0000 | 0040 | 0000 |
| 0000755360 | FFFF | 0009 | 0108 | 257E | 0000 | 0000 | 0200 | 0000 |
| 0000755400 | 0000 | 0000 | 0000 | 0000 | 652E | 736F | 0000 | 0000 |
| 0000755420 | 0000 | 0000 | FFFE | 0008 | 0166 | 2588 | 0000 | 0000 |
| 0000755440 | 0240 | 0000 | 0000 | 0000 | 0000 | 0000 | 312E | 6634 |
| 0000755460 | 6B61 | 0065 | 0000 | 0000 | FFFE | 0009 | 010C | 0000 |
| 0000755500 | 0000 | 0000 | 4000 | 0000 | 0000 | 259A | 0000 | 0000 |
| 0000755520 | 635F | 6B68 | 7573 | 006D | 0000 | 0000 | FFFF | 00FD |
| 0000755540 | 010B | 0000 | 0000 | 0000 | 4000 | 0020 | 0020 | 0000 |
| 0000755560 | 0000 | 0000 | 655F | 7272 | 6E63 | 0074 | 0000 | 0000 |
| 0000755600 | FFFF | 00FD | 010B | 0000 | 0000 | 0000 | 4000 | 0020 |
| 0000755620 | 0020 | 0000 | 0000 | 0000 | 635F | 63~2 | 3233 | 0000 |
| 0000755640 | 0000 | 0000 | FFFF | 00FD | 010B | 0000 | 0000 | 0000 |
| 0000755660 | 4000 | 0020 | 0020 | 0000 | 0000 | 0000 | 652E | 736F |
| 0000755700 | 0000 | 0000 | 0000 | 0000 | FFFE | 0009 | 0166 | 259D |
| 0000755720 | 0000 | 0000 | 4000 | 0000 | 0000 | 0000 | 0000 | 0000 |
| 0000755740 | 312E | 6635 | 6B61 | 0065 | 0000 | 0000 | FFFE | 0008 |
| 0000755760 | 010A | 0000 | 0000 | 0000 | 4080 | 0000 | 0000 | 25A4 |
| 0000756000 | 0000 | 0000 | 0000 | 0000 | 4E72 | 0000 | 0000 | 0000 |
| 0000756020 | FFFF | 0008 | 0108 | 256A | 0000 | 0000 | 0040 | 0000 |
| 0000756040 | 0000 | 0000 | 0000 | 0000 | 0000 | 0000 | 4E7F | 0000 |
| 0000756060 | 0040 | 0000 | FFFF | 0008 | 0108 | 256A | 0000 | 0000 |

THU MAR 14 17:37:32 1991 GSPMON.4 PAGE 269, LINE 15813

| | | | | | | | | |
|---|---|---|---|---|---|---|---|---|
| 0000756100 | 0040 | 0000 | 0000 | 0000 | 0000 | 0000 | 0000 | 0000 |
| 0000756120 | 4E8B | 0000 | 0080 | 0000 | FFFF | 0009 | 0108 | 2590 |
| 0000756140 | 0000 | 0000 | 4000 | 0000 | 0000 | 0000 | 0000 | 0000 |
| 0000756160 | 652E | 736F | 0000 | 0000 | 0000 | 0000 | FFFE | 0008 |
| 0000756200 | 0166 | 259A | 0000 | 0000 | 4080 | 0000 | 0000 | 0000 |
| 0000756220 | 0000 | 0000 | 312E | 6636 | 6B61 | 0065 | 0000 | 0000 |
| 0000756240 | FFFE | 0009 | 010C | 0000 | 0000 | 0000 | 0090 | 0000 |
| 0000756260 | 0000 | 25AE | 0000 | 0000 | 635F | 6B68 | 7573 | 006D |
| 0000756300 | 0000 | 0000 | FFFF | 00FD | 010B | 0000 | 0000 | 0000 |
| 0000756320 | 0090 | 0003 | 0003 | 0000 | 0000 | 0000 | 655F | 7272 |
| 0000756340 | 6E63 | 0074 | 0000 | 0000 | FFFF | 00FD | 010B | 0000 |
| 0000756360 | 0000 | 0000 | 0090 | 0003 | 0003 | 0000 | 0000 | 0000 |
| 0000756400 | 625F | 7263 | 3363 | 0032 | 0000 | 0000 | FFFF | 00FD |
| 0000756420 | 010B | 0000 | 0000 | 0000 | 0090 | 0003 | 0003 | 0000 |
| 0000756440 | 0000 | 0000 | 652E | 736F | 0000 | 0000 | 0000 | 0000 |
| 0000756460 | FFFE | 0009 | 0166 | 25A4 | 0000 | 0000 | 0090 | 0000 |
| 0000756500 | 0000 | 0000 | 0000 | 0000 | 312E | 6637 | 6B61 | 0065 |
| 0000756520 | 0000 | 0000 | FFFE | 0008 | 010A | 0000 | 0000 | 0000 |
| 0000756540 | 0130 | 0000 | 0000 | 25BC | 0000 | 0000 | 0000 | 0000 |
| 0000756560 | 4E95 | 0000 | 0000 | 0000 | FFFF | 0008 | 0108 | 256A |
| 0000756600 | 0000 | 0000 | 0040 | 0000 | 0000 | 0000 | 0000 | 0000 |
| 0000756620 | 0000 | 0000 | 4EA2 | 0000 | 0040 | 0000 | FFFF | 0008 |
| 0000756640 | 0108 | 256A | 0000 | 0000 | 0040 | 0000 | 0000 | 0000 |
| 0000756660 | 0000 | 0000 | 785F | 635F | 6F6F | 6472 | 0080 | 0000 |
| 0000756700 | FFFF | 0003 | 0108 | 0000 | 0000 | 0000 | 0010 | 0000 |
| 0000756720 | 0000 | 0000 | 0000 | 0000 | 795F | 635F | 6F6F | 6472 |
| 0000756740 | 0090 | 0000 | FFFF | 0003 | 0108 | 0000 | 0000 | 0000 |
| 0000756760 | 0010 | 0000 | 0000 | 0000 | 0000 | 0000 | 0000 | 0000 |
| 0000757000 | 4EAE | 0000 | 00A0 | 0000 | FFFF | 0009 | 0108 | 25A4 |
| 0000757020 | 0000 | 0000 | 0090 | 0000 | 0000 | 0000 | 0000 | 0000 |
| 0000757040 | 652E | 736F | 0000 | 0000 | 0000 | 0000 | FFFE | 0008 |
| 0000757060 | 0166 | 25AE | 0000 | 0000 | 0130 | 0000 | 0000 | 0000 |
| 0000757100 | 0000 | 0000 | 312E | 6638 | 6B61 | 0065 | 0000 | 0000 |
| 0000757120 | FFFE | 0008 | 010A | 0000 | 0000 | 0000 | 0050 | 0000 |
| 0000757140 | 0000 | 25C8 | 0000 | 0000 | 0000 | 0000 | 4EB8 | 0000 |
| 0000757160 | 0000 | 0000 | FFFF | 000D | 0108 | 0000 | 0000 | 0000 |
| 0000757200 | 0010 | 0000 | 0000 | 0000 | 0000 | 0000 | 0000 | 0000 |
| 0000757220 | 4ED0 | 0000 | 0010 | 0000 | FFFF | 000D | 0108 | 0000 |
| 0000757240 | 0000 | 0000 | 0010 | 0000 | 0000 | 0000 | 0000 | 0000 |
| 0000757260 | 0000 | 0000 | 4EE2 | 0000 | 0020 | 0000 | FFFF | 000D |
| 0000757300 | 0108 | 0000 | 0000 | 0000 | 0010 | 0000 | 0000 | 0000 |
| 0000757320 | 0000 | 0000 | 0000 | 0000 | 4EED | 0000 | 0030 | 0000 |
| 0000757340 | FFFF | 0010 | 0108 | 0000 | 0000 | 0000 | 0020 | 0000 |
| 0000757360 | 0000 | 0000 | 0000 | 0000 | 652E | 736F | 0000 | 0000 |
| 0000757400 | 0000 | 0000 | FFFE | 0008 | 0166 | 25BC | 0000 | 0000 |
| 0000757420 | 0050 | 0000 | 0000 | 0000 | 0000 | 0000 | 312E | 6639 |
| 0000757440 | 6B61 | 0065 | 0000 | 0000 | FFFE | 0008 | 010A | 0000 |
| 0000757460 | 0000 | 0000 | 0040 | 0000 | 0000 | 25D0 | 0000 | 0000 |
| 0000757500 | 0000 | 0000 | 4EF7 | 0000 | 0000 | 0000 | FFFF | 0005 |
| 0000757520 | 0108 | 0000 | 0000 | 0000 | 0020 | 0000 | 0000 | 0000 |
| 0000757540 | 0000 | 0000 | 0000 | 0000 | 4F07 | 0000 | 0020 | 0000 |
| 0000757560 | FFFF | 0005 | 0108 | 0000 | 0000 | 0000 | 0020 | 0000 |
| 0000757600 | 0000 | 0000 | 0000 | 0000 | 652E | 736F | 0000 | 0000 |
| 0000757620 | 0000 | 0000 | FFFE | 0008 | 0166 | 25C8 | 0000 | 0000 |
| 0000757640 | 0040 | 0000 | 0000 | 0000 | 0000 | 0000 | 322E | 6630 |
| 0000757660 | 6B61 | 0065 | 0000 | 0000 | FFFE | 0008 | 010A | 0000 |
| 0000757700 | 0000 | 0000 | 0050 | 0000 | 0000 | 25DE | 0000 | 0000 |
| 0000757720 | 785F | 656C | 7466 | 0000 | 0000 | 0000 | FFFF | 0003 |
| 0000757740 | 0108 | 0000 | 0000 | 0000 | 0010 | 0000 | 0000 | 0000 |

THU MAR 14 17:37:32 1991 GSPMON.4 PAGE 270, LINE 15872

| | | | | | | | | |
|---|---|---|---|---|---|---|---|---|
| 0000757760 | 0000 | 0000 | 795F | 6F74 | 0070 | 0000 | 0010 | 0000 |
| 0000760000 | FFFF | 0003 | 0108 | 0000 | 0000 | 0000 | 0010 | 0000 |
| 0000760020 | 0000 | 0000 | 0000 | 0000 | 785F | 6972 | 6867 | 0074 |
| 0000760040 | 0020 | 0000 | FFFF | 0003 | 0108 | 0000 | 0000 | 0000 |
| 0000760060 | 0010 | 0000 | 0000 | 0000 | 0000 | 0000 | 795F | 6F64 |
| 0000760100 | 6E77 | 0000 | 0030 | 0000 | FFFF | 0003 | 0108 | 0000 |
| 0000760120 | 0000 | 0000 | 0010 | 0000 | 0000 | 0000 | 0000 | 0000 |
| 0000760140 | 0000 | 0000 | 4F16 | 0000 | 0040 | 0000 | FFFF | 0003 |
| 0000760160 | 0108 | 0000 | 0000 | 0000 | 0010 | 0000 | 0000 | 0000 |
| 0000760200 | 0000 | 0000 | 652E | 736F | 0000 | 0000 | 0000 | 0000 |
| 0000760220 | FFFE | 0008 | 0166 | 25D0 | 0000 | 0000 | 0050 | 0000 |
| 0000760240 | 0000 | 0000 | 0000 | 0000 | 322E | 6631 | 6B61 | 0065 |
| 0000760260 | 0000 | 0000 | FFFE | 0008 | 010A | 0000 | 0000 | 0000 |
| 0000760300 | 0020 | 0000 | 0000 | 25E6 | 0000 | 0000 | 0000 | 0000 |
| 0000760320 | 4F20 | 0000 | 0000 | 0000 | FFFF | 0003 | 0108 | 0000 |
| 0000760340 | 0000 | 0000 | 0010 | 0000 | 0000 | 0000 | 0000 | 0000 |
| 0000760360 | 0000 | 0000 | 4F2C | 0000 | 0010 | 0000 | FFFF | 0003 |
| 0000760400 | 0108 | 0000 | 0000 | 0000 | 0010 | 0000 | 0000 | 0000 |
| 0000760420 | 0000 | 0000 | 652E | 736F | 0000 | 0000 | 0000 | 0000 |
| 0000760440 | FFFE | 0008 | 0166 | 25DE | 0000 | 0000 | 0020 | 0000 |
| 0000760460 | 0000 | 0000 | 0000 | 0000 | 322E | 6632 | 6B61 | 0065 |
| 0000760500 | 0000 | 0000 | FFFE | 0008 | 010A | 0000 | 0000 | 0000 |
| 0000760520 | 0040 | 0000 | 0000 | 25F2 | 0000 | 0000 | 0000 | 0000 |
| 0000760540 | 4F36 | 0000 | 0000 | 0000 | FFFF | 000D | 0108 | 0000 |
| 0000760560 | 0000 | 0000 | 0010 | 0000 | 0000 | 0000 | 0000 | 0000 |
| 0000760600 | 0000 | 0000 | 4F49 | 0000 | 0010 | 0000 | FFFF | 000D |
| 0000760620 | 0108 | 0000 | 0000 | 0000 | 0010 | 0000 | 0000 | 0000 |
| 0000760640 | 0000 | 0000 | 0000 | 0000 | 4F5B | 0000 | 0020 | 0000 |
| 0000760660 | FFFF | 000D | 0108 | 0000 | 0000 | 0000 | 0010 | 0000 |
| 0000760700 | 0000 | 0000 | 0000 | 0000 | 0000 | 0000 | 4F68 | 0000 |
| 0000760720 | 0030 | 0000 | FFFF | 000D | 0108 | 0000 | 0000 | 0000 |
| 0000760740 | 0010 | 0000 | 0000 | 0000 | 0000 | 0000 | 652E | 736F |
| 0000760760 | 0000 | 0000 | 0000 | 0000 | FFFE | 0008 | 0166 | 25E6 |
| 0000761000 | 0000 | 0000 | 0040 | 0000 | 0000 | 0000 | 0000 | 0000 |
| 0000761020 | 662E | 6C69 | 0065 | 0000 | 25F4 | 0000 | FFFE | 0000 |
| 0000761040 | 0167 | 7067 | 635F | 646D | 632E | 0000 | 0000 | 0000 |
| 0000761060 | 0000 | 0000 | 662E | 6C69 | 0065 | 0000 | 2660 | 0000 |
| 0000761100 | FFFE | 0000 | 0167 | 7067 | 6D5F | 756F | 682E | 0000 |
| 0000761120 | 0000 | 0000 | 0000 | 0000 | 322E | 6633 | 6B61 | 0065 |
| 0000761140 | 0000 | 0000 | FFFE | 0008 | 010A | 0000 | 0000 | 0000 |
| 0000761160 | 0060 | 0000 | 0000 | 2600 | 0000 | 0000 | 0000 | 0000 |
| 0000761200 | 4F76 | 0000 | 0000 | 0000 | FFFF | 000F | 0108 | 0000 |
| 0000761220 | 0000 | 0000 | 0020 | 0000 | 0000 | 0000 | 0000 | 0000 |
| 0000761240 | 0000 | 0000 | 4F83 | 0000 | 0020 | 0000 | FFFF | 000F |
| 0000761260 | 0108 | 0000 | 0000 | 0000 | 0020 | 0000 | 0000 | 0000 |
| 0000761300 | 0000 | 0000 | 0000 | 0000 | 4F99 | 0000 | 0040 | 0000 |
| 0000761320 | FFFF | 000F | 0108 | 0000 | 0000 | 0000 | 0020 | 0000 |
| 0000761340 | 0000 | 0000 | 0000 | 0000 | 652E | 736F | 0000 | 0000 |
| 0000761360 | 0000 | 0000 | FFFE | 0008 | 0166 | 25F6 | 0000 | 0000 |
| 0000761400 | 0060 | 0000 | 0000 | 0000 | 0000 | 0000 | 322E | 6634 |
| 0000761420 | 6B61 | 0065 | 0000 | 0000 | FFFE | 0008 | 010A | 0000 |
| 0000761440 | 0000 | 0000 | 00C0 | 0000 | 0000 | 261A | 0000 | 0000 |
| 0000761460 | 635F | 0078 | 0000 | 0000 | 0000 | 0000 | FFFF | 000D |
| 0000761500 | 0108 | 0000 | 0000 | 0000 | 0010 | 0000 | 0000 | 0000 |
| 0000761520 | 0000 | 0000 | 635F | 0079 | 0000 | 0000 | 0010 | 0000 |
| 0000761540 | FFFF | 000D | 0108 | 0000 | 0000 | 0000 | 0010 | 0000 |
| 0000761560 | 0000 | 0000 | 0000 | 0000 | 785F | 0031 | 0000 | 0000 |
| 0000761600 | 0020 | 0000 | FFFF | 0003 | 0108 | 0000 | 0000 | 0000 |
| 0000761620 | 0010 | 0000 | 0000 | 0000 | 0000 | 0000 | 795F | 0031 |

THU MAR 14 17:37:32 1991 GSPMON.4 PAGE 271, LINE 15931

| | | | | | | | | |
|---|---|---|---|---|---|---|---|---|
| 0000761640 | 0000 | 0000 | 0030 | 0000 | FFFF | 0003 | 0108 | 0000 |
| 0000761660 | 0000 | 0000 | 0010 | 0000 | 0000 | 0000 | 0000 | 0000 |
| 0000761700 | 785F | 0032 | 0000 | 0000 | 0040 | 0000 | FFFF | 0003 |
| 0000761720 | 0108 | 0000 | 0000 | 0000 | 0010 | 0000 | 0000 | 0000 |
| 0000761740 | 0000 | 0000 | 795F | 0032 | 0000 | 0000 | 0050 | 0000 |
| 0000761760 | FFFF | 0003 | 0108 | 0000 | 0000 | 0000 | 0010 | 0000 |
| 0000762000 | 0000 | 0000 | 0000 | 0000 | 685F | 5F70 | 0078 | 0000 |
| 0000762020 | 0060 | 0000 | FFFF | 0003 | 0108 | 0000 | 0000 | 0000 |
| 0000762040 | 0010 | 0000 | 0000 | 0000 | 0000 | 0000 | 685F | 5F70 |
| 0000762060 | 0079 | 0000 | 0070 | 0000 | FFFF | 0003 | 0108 | 0000 |
| 0000762100 | 0000 | 0000 | 0010 | 0000 | 0000 | 0000 | 0000 | 0000 |
| 0000762120 | 0000 | 0000 | 4FAA | 0000 | 0080 | 0000 | FFFF | 000F |
| 0000762140 | 0108 | 0000 | 0000 | 0000 | 0020 | 0000 | 0000 | 0000 |
| 0000762160 | 0000 | 0000 | 0000 | 0000 | 4FBA | 0000 | 00A0 | 0000 |
| 0000762200 | FFFF | 000D | 0108 | 0000 | 0000 | 0000 | 0010 | 0000 |
| 0000762220 | 0000 | 0000 | 0000 | 0000 | 0000 | 0000 | 4FC9 | 0000 |
| 0000762240 | 00B0 | 0000 | FFFF | 000D | 0108 | 0000 | 0000 | 0000 |
| 0000762260 | 0010 | 0000 | 0000 | 0000 | 0000 | 0000 | 652E | 736F |
| 0000762300 | 0000 | 0000 | 0000 | 0000 | FFFE | 0008 | 0166 | 2600 |
| 0000762320 | 0000 | 0000 | 00C0 | 0000 | 0000 | 0000 | 0000 | 0000 |
| 0000762340 | 322E | 6635 | 6B61 | 0065 | 0000 | 0000 | FFFE | 0008 |
| 0000762360 | 010A | 0000 | 0000 | 0000 | 0030 | 0000 | 0000 | 2624 |
| 0000762400 | 0000 | 0000 | 785F | 0000 | 0000 | 0000 | 0000 | 0000 |
| 0000762420 | FFFF | 0003 | 0108 | 0000 | 0000 | 0000 | 0010 | 0000 |
| 0000762440 | 0000 | 0000 | 0000 | 0000 | 795F | 0000 | 0000 | 0000 |
| 0000762460 | 0010 | 0000 | FFFF | 0003 | 0108 | 0000 | 0000 | 0000 |
| 0000762500 | 0010 | 0000 | 0000 | 0000 | 0000 | 0000 | 695F | 6F63 |
| 0000762520 | 5F6E | 6469 | 0020 | 0000 | FFFF | 0003 | 0108 | 0000 |
| 0000762540 | 0000 | 0000 | 0010 | 0000 | 0000 | 0000 | 0000 | 0000 |
| 0000762560 | 652E | 736F | 0000 | 0000 | 0000 | 0000 | FFFE | 0008 |
| 0000762600 | 0166 | 261A | 0000 | 0000 | 0030 | 0000 | 0000 | 0000 |
| 0000762620 | 0000 | 0000 | 322E | 6636 | 6B61 | 0065 | 0000 | 0000 |
| 0000762640 | FFFE | 0008 | 010A | 0000 | 0000 | 0000 | 0070 | 0000 |
| 0000762660 | 0000 | 2636 | 000D | 0000 | 785F | 0000 | 0000 | 0000 |
| 0000762700 | 0000 | 0000 | FFFF | 000D | 0108 | 0000 | 0000 | 0000 |
| 0000762720 | 0010 | 0000 | 0000 | 0000 | 0000 | 0000 | 795F | 0000 |
| 0000762740 | 0000 | 0000 | 0010 | 0000 | FFFF | 000D | 0108 | 0000 |
| 0000762760 | 0000 | 0000 | 0010 | 0000 | 0000 | 0000 | 0000 | 0000 |
| 0000763000 | 695F | 6F63 | 5F6E | 6469 | 0020 | 0000 | FFFF | 000D |
| 0000763020 | 0108 | 0000 | 0000 | 0000 | 0010 | 0000 | 0000 | 0000 |
| 0000763040 | 0000 | 0000 | 6C5F | 6665 | 0074 | 0000 | 0030 | 0000 |
| 0000763060 | FFFF | 000D | 0108 | 0000 | 0000 | 0000 | 0010 | 0000 |
| 0000763100 | 0000 | 0000 | 0000 | 0000 | 725F | 6769 | 7468 | 0000 |
| 0000763120 | 0040 | 0000 | FFFF | 000D | 0108 | 0000 | 0000 | 0000 |
| 0000763140 | 0010 | 0000 | 0000 | 0000 | 0000 | 0000 | 755F | 0070 |
| 0000763160 | 0000 | 0000 | 0050 | 0000 | FFFF | 000D | 0108 | 0000 |
| 0000763200 | 0000 | 0000 | 0010 | 0000 | 0000 | 0000 | 0000 | 0000 |
| 0000763220 | 645F | 776F | 006E | 0000 | 0060 | 0000 | FFFF | 000D |
| 0000763240 | 0108 | 0000 | 0000 | 0000 | 0010 | 0000 | 0000 | 0000 |
| 0000763260 | 0000 | 0000 | 652E | 736F | 0000 | 0000 | 0000 | 0000 |
| 0000763300 | FFFE | 0008 | 0166 | 2624 | 0000 | 0000 | 0070 | 0000 |
| 0000763320 | 0000 | 0000 | 0000 | 0000 | 322E | 6637 | 6B61 | 0065 |
| 0000763340 | 0000 | 0000 | FFFE | 0008 | 010A | 0000 | 0000 | 0000 |
| 0000763360 | 0020 | 0000 | 0000 | 263E | 0000 | 0000 | 6D5F | 646F |
| 0000763400 | 0065 | 0000 | 0000 | 0000 | FFFF | 000D | 0108 | 0000 |
| 0000763420 | 0000 | 0000 | 0010 | 0000 | 0000 | 0000 | 0000 | 0000 |
| 0000763440 | 725F | 7365 | 6C75 | 0074 | 0010 | 0000 | FFFF | 000D |
| 0000763460 | 0108 | 0000 | 0000 | 0000 | 0010 | 0000 | 0000 | 0000 |
| 0000763500 | 0000 | 0000 | 652E | 736F | 0000 | 0000 | 0000 | 0000 |

THU MAR 14 17:37:32 1991 GSPMON.4 PAGE 272, LINE 15990

| | | | | | | | | |
|---|---|---|---|---|---|---|---|---|
| 0000763520 | FFFE | 0008 | 0166 | 2636 | 0000 | 0000 | 0020 | 0000 |
| 0000763540 | 0000 | 0000 | 0000 | 0000 | 322E | 6638 | 6B61 | 0065 |
| 0000763560 | 0000 | 0000 | FFFE | 0008 | 010A | 0000 | 0000 | 0000 |
| 0000763600 | 0020 | 0000 | 0000 | 264A | 0000 | 0000 | 0000 | 0000 |
| 0000763620 | 4FDA | 0000 | 0000 | 0000 | FFFF | 000C | 0108 | 0000 |
| 0000763640 | 0000 | 0000 | 0008 | 0000 | 0000 | 0000 | 0000 | 0000 |
| 0000763660 | 0000 | 0000 | 4FE6 | 0000 | 0008 | 0000 | FFFF | 000C |
| 0000763700 | 0108 | 0000 | 0000 | 0000 | 0008 | 0000 | 0000 | 0000 |
| 0000763720 | 0000 | 0000 | 0000 | 0000 | 4FF1 | 0000 | 0010 | 0000 |
| 0000763740 | FFFF | 000C | 0108 | 0000 | 0000 | 0000 | 0008 | 0000 |
| 0000763760 | 0000 | 0000 | 0000 | 0000 | 0000 | 0000 | 4FFC | 0000 |
| 0000764000 | 0018 | 0000 | FFFF | 000C | 0108 | 0000 | 0000 | 0000 |
| 0000764020 | 0008 | 0000 | 0000 | 0000 | 0000 | 0000 | 652E | 736F |
| 0000764040 | 0000 | 0000 | 0000 | 0000 | FFFE | 0008 | 0166 | 263E |
| 0000764060 | 0000 | 0000 | 0020 | 0000 | 0000 | 0000 | 0000 | 0000 |
| 0000764100 | 322E | 6639 | 6B61 | 0065 | 0000 | 0000 | FFFE | 0008 |
| 0000764120 | 010A | 0000 | 0000 | 0000 | 0020 | 0000 | 0000 | 2654 |
| 0000764140 | 0000 | 0000 | 615F | 7474 | 0072 | 0000 | 0000 | 0000 |
| 0000764160 | FFFF | 000D | 0108 | 0000 | 0000 | 0000 | 0010 | 0000 |
| 0000764200 | 0000 | 0000 | 0000 | 0000 | 735F | 7274 | 7069 | 0000 |
| 0000764220 | 0010 | 0000 | FFFF | 000C | 0108 | 0000 | 0000 | 0000 |
| 0000764240 | 0008 | 0000 | 0000 | 0000 | 0000 | 0000 | 725F | 6365 |
| 0000764260 | 0074 | 0000 | 0018 | 0000 | FFFF | 000C | 0108 | 0000 |
| 0000764300 | 0000 | 0000 | 0008 | 0000 | 0000 | 0000 | 0000 | 0000 |
| 0000764320 | 652E | 736F | 0000 | 0000 | 0000 | 0000 | FFFE | 0008 |
| 0000764340 | 0166 | 264A | 0000 | 0000 | 0020 | 0000 | 0000 | 0000 |
| 0000764360 | 0000 | 0000 | 332E | 6630 | 6B61 | 0065 | 0000 | 0000 |
| 0000764400 | FFFE | 0008 | 010A | 0000 | 0000 | 0000 | 1930 | 0000 |
| 0000764420 | 0000 | 2660 | 0000 | 0000 | 0000 | 0000 | 5006 | 0000 |
| 0000764440 | 0000 | 0000 | FFFF | 000D | 0108 | 0000 | 0000 | 0000 |
| 0000764460 | 0010 | 0000 | 0000 | 0000 | 0000 | 0000 | 785F | 0000 |
| 0000764500 | 0000 | 0000 | 0010 | 0000 | FFFF | 000D | 0108 | 0000 |
| 0000764520 | 0000 | 0000 | 0010 | 0000 | 0000 | 0000 | 0000 | 0000 |
| 0000764540 | 795F | 0000 | 0000 | 0000 | 0020 | 0000 | FFFF | 000D |
| 0000764560 | 0108 | 0000 | 0000 | 0000 | 0010 | 0000 | 0000 | 0000 |
| 0000764600 | 0000 | 0000 | 0000 | 0000 | 5010 | 0000 | 0030 | 0000 |
| 0000764620 | FFFF | 0038 | 0108 | 264A | 0000 | 0000 | 1900 | 00C8 |
| 0000764640 | 0000 | 0000 | 0000 | 0000 | 652E | 736F | 0000 | 0000 |
| 0000764660 | 0000 | 0000 | FFFE | 0008 | 0166 | 2654 | 0000 | 0000 |
| 0000764700 | 1930 | 0000 | 0000 | 0000 | 0000 | 0000 | 662E | 6C69 |
| 0000764720 | 0065 | 0000 | 2662 | 0000 | FFFE | 0000 | 0167 | 7067 |
| 0000764740 | 635F | 646D | 632E | 0000 | 0000 | 0000 | 0000 | 0000 |
| 0000764760 | 662E | 6C69 | 0065 | 0000 | 266E | 0000 | FFFE | 0000 |
| 0000765000 | 0167 | 7067 | 615F | 6C70 | 682E | 0000 | 0000 | 0000 |
| 0000765020 | 0000 | 0000 | 332E | 6631 | 6B61 | 0065 | 0000 | 0000 |
| 0000765040 | FFFE | 0008 | 010A | 0000 | 0000 | 0000 | 0030 | 0000 |
| 0000765060 | 0000 | 266E | 0000 | 0000 | 775F | 6469 | 6874 | 0000 |
| 0000765100 | 0000 | 000C | FFFF | 000D | 0108 | 0000 | 0000 | 0000 |
| 0000765120 | 0010 | 0000 | 0000 | 0000 | 0000 | 0000 | 685F | 6965 |
| 0000765140 | 6867 | 0074 | 0010 | 0000 | FFFF | 000D | 0108 | 0000 |
| 0000765160 | 0000 | 0000 | 0010 | 0000 | 0000 | 0000 | 0000 | 0000 |
| 0000765200 | 645F | 7065 | 6874 | 0000 | 0020 | 0000 | FFFF | 000D |
| 0000765220 | 0108 | 0000 | 0000 | 0000 | 0010 | 0000 | 0000 | 0000 |
| 0000765240 | 0000 | 0000 | 652E | 736F | 0000 | 0000 | 0000 | 0000 |
| 0000765260 | FFFE | 0008 | 0166 | 2664 | 0000 | 0000 | 0030 | 0000 |
| 0000765300 | 0000 | 0000 | 0000 | 0000 | 662E | 6C69 | 0065 | 0000 |
| 0000765320 | 2670 | 0000 | FFFE | 0000 | 0167 | 7067 | 615F | 6C70 |
| 0000765340 | 692E | 636E | 0000 | 0000 | 0000 | 0000 | 662E | 6C69 |
| 0000765360 | 0065 | 0000 | 2672 | 0000 | FFFE | 0000 | 0167 | 7067 |

THU MAR 14 17:37:32 1991 GSPMON.4 PAGE 273, LINE 16049

| | | | | | | | | |
|---|---|---|---|---|---|---|---|---|
| 0000765400 | 615F | 6C70 | 682E | 0000 | 0000 | 0000 | 0000 | 0000 |
| 0000765420 | 662E | 6C69 | 0065 | 0000 | 277C | 0000 | FFFE | 0000 |
| 0000765440 | 0167 | 7067 | 635F | 646D | 632E | 0000 | 0000 | 0000 |
| 0000765460 | 0000 | 0000 | 0000 | 0000 | 501C | 0000 | 6DD0 | FFD2 |
| 0000765500 | 0003 | 0015 | 0103 | 0000 | 0000 | 0000 | 0020 | 0000 |
| 0000765520 | 0000 | 0000 | 0000 | 0000 | 0000 | 0000 | 5027 | 0000 |
| 0000765540 | 6DF0 | FFD2 | 0003 | 0015 | 0103 | 0000 | 0000 | 0000 |
| 0000765560 | 0020 | 0000 | 0000 | 0000 | 0000 | 0000 | 0000 | 0000 |
| 0000765600 | 5034 | 0000 | 6E10 | FFD2 | 0003 | 0005 | 0103 | 0000 |
| 0000765620 | 0000 | 0000 | 0020 | 0000 | 0000 | 0000 | 0000 | 0000 |
| 0000765640 | 0000 | 0000 | 5040 | 0000 | 6E30 | FFD2 | 0003 | 0005 |
| 0000765660 | 0103 | 0000 | 0000 | 0000 | 0020 | 0000 | 0000 | 0000 |
| 0000765700 | 0000 | 0000 | 675F | 5F70 | 6E69 | 7469 | 3050 | FFC6 |
| 0000765720 | 0001 | 0024 | 0102 | 0000 | 0000 | 0FB0 | 0000 | 3388 |
| 0000765740 | 0001 | 2686 | 0000 | 0004 | 622E | 0066 | 0000 | 0000 |
| 0000765760 | 3050 | FFC6 | 0001 | 0000 | 0165 | 0000 | 0000 | 008A |
| 0000766000 | 0000 | 0000 | 0000 | 02F8 | 0000 | 0000 | 695F | 5F6E |
| 0000766020 | 7470 | 0072 | FFE0 | FFFF | FFFF | 0010 | 0109 | 0000 |
| 0000766040 | 0000 | 0000 | 0020 | 0000 | 0000 | 0000 | 0000 | 0000 |
| 0000766060 | 6F5F | 7475 | 705F | 7274 | FFC0 | FFFF | FFFF | 0010 |
| 0000766100 | 0109 | 0000 | 0000 | 0000 | 0020 | 0000 | 0000 | 0000 |
| 0000766120 | 0000 | 0000 | 652E | 0066 | 0000 | 0000 | 4000 | FFC6 |
| 0000766140 | 0001 | 0000 | 0165 | 0000 | 0000 | 00D5 | 0000 | 0000 |
| 0000766160 | 0000 | 0000 | 0000 | 0000 | 0000 | 0000 | 504E | 0000 |
| 0000766200 | 4000 | FFC6 | 0001 | 0020 | 0103 | 0000 | 0000 | 0670 |
| 0000766220 | 0000 | 345A | 0001 | 268E | 0000 | 0003 | 622E | 0066 |
| 0000766240 | 0000 | 0000 | 4000 | FFC6 | 0001 | 0000 | 0165 | 0000 |
| 0000766260 | 0000 | 00DB | 0000 | 0000 | 0000 | 0300 | 0000 | 0000 |
| 0000766300 | 695F | 5F6E | 7470 | 0072 | FFE0 | FFFF | FFFF | 0010 |
| 0000766320 | 0109 | 0000 | 0000 | 0000 | 0020 | 0000 | 0000 | 0000 |
| 0000766340 | 0000 | 0000 | 652E | 0066 | 0000 | 0000 | 4670 | FFC6 |
| 0000766360 | 0001 | 0000 | 0165 | 0000 | 0000 | 00F1 | 0000 | 0000 |
| 0000766400 | 0000 | 0000 | 0000 | 0000 | 0000 | 0000 | 505D | 0000 |
| 0000766420 | 4670 | FFC6 | 0001 | 0024 | 0102 | 0000 | 0000 | 0070 |
| 0000766440 | 0000 | 3496 | 0001 | 2698 | 0000 | 0001 | 622E | 0066 |
| 0000766460 | 0000 | 0000 | 4670 | FFC6 | 0001 | 0000 | 0165 | 0000 |
| 0000766500 | 0000 | 0104 | 0000 | 0000 | 0000 | 030A | 0000 | 0000 |
| 0000766520 | 695F | 5F6E | 7470 | 0072 | FFE0 | FFFF | FFFF | 005D |
| 0000766540 | 0109 | 0000 | 0000 | 0000 | 0020 | 0000 | 0000 | 0000 |
| 0000766560 | 0000 | 0000 | 6F5F | 7475 | 705F | 7274 | FFC0 | FFFF |
| 0000766600 | FFFF | 0010 | 0109 | 0000 | 0000 | 0000 | 0020 | 0000 |
| 0000766620 | 0000 | 0000 | 0000 | 0000 | 652E | 0066 | 0000 | 0000 |
| 0000766640 | 46E0 | FFC6 | 0001 | 0000 | 0165 | 0000 | 0000 | 019E |
| 0000766660 | 0000 | 0000 | 0000 | 0000 | 0000 | 0000 | 0000 | 0000 |
| 0000766700 | 506A | 0000 | 46E0 | FFC6 | 0001 | 0020 | 0103 | 0000 |
| 0000766720 | 0000 | 00E0 | 0000 | 34A2 | 0001 | 26A2 | 0000 | 0002 |
| 0000766740 | 622E | 0066 | 0000 | 0000 | 46E0 | FFC6 | 0001 | 0000 |
| 0000766760 | 0165 | 0000 | 0000 | 01A3 | 0000 | 0000 | 0000 | 0314 |
| 0000767000 | 0000 | 0000 | 615F | 6464 | 6572 | 7373 | FFE0 | FFFF |
| 0000767020 | FFFF | 0010 | 0109 | 0000 | 0000 | 0000 | 0020 | 0000 |
| 0000767040 | 0000 | 0000 | 0000 | 0000 | 765F | 6C61 | 6575 | 0000 |
| 0000767060 | FFC0 | FFFF | FFFF | 000D | 0109 | 0000 | 0000 | 0000 |
| 0000767100 | 0010 | 0000 | 0000 | 0000 | 0000 | 0000 | 652E | 0066 |
| 0000767120 | 0000 | 0000 | 47C0 | FFC6 | 0001 | 0000 | 0165 | 0000 |
| 0000767140 | 0000 | 01A9 | 0000 | 0000 | 0000 | 0000 | 0000 | 0000 |
| 0000767160 | 0000 | 0000 | 5074 | 0000 | 47C0 | FFC6 | 0001 | 0024 |
| 0000767200 | 0102 | 0000 | 0000 | 01B0 | 0000 | 34AE | 0001 | 26AC |
| 0000767220 | 0000 | 0003 | 622E | 0066 | 0000 | 0000 | 47C0 | FFC6 |
| 0000767240 | 0001 | 0000 | 0165 | 0000 | 0000 | 01B7 | 0000 | 0000 |

THU MAR 14 17:37:32 1991 GSPMON.4 PAGE 274, LINE 16108

| | | | | | | | | |
|---|---|---|---|---|---|---|---|---|
| 0000767260 | 0000 | 031E | 0000 | 0000 | 695F | 5F6E | 7470 | 0072 |
| 0000767300 | FFE0 | FFFF | FFFF | 0010 | 0109 | 0000 | 0000 | 0000 |
| 0000767320 | 0020 | 0000 | 0000 | 0000 | 0000 | 0000 | 6F5F | 7475 |
| 0000767340 | 705F | 7274 | FFC0 | FFFF | FFFF | 0010 | 0109 | 0000 |
| 0000767360 | 0000 | 0000 | 0020 | 0000 | 0000 | 0000 | 0000 | 0000 |
| 0000767400 | 652E | 0066 | 0000 | 0000 | 4970 | FFC6 | 0001 | 0000 |
| 0000767420 | 0165 | 0000 | 0000 | 01C1 | 0000 | 0000 | 0000 | 0000 |
| 0000767440 | 0000 | 0000 | 0000 | 0000 | 5085 | 0000 | 4970 | FFC6 |
| 0000767460 | 0001 | 0024 | 0102 | 0000 | 0000 | 0620 | 0000 | 34D2 |
| 0000767500 | 0001 | 26B6 | 0000 | 0003 | 622E | 0066 | 0000 | 0000 |
| 0000767520 | 4970 | FFC6 | 0001 | 0000 | 0165 | 0000 | 0000 | 01D0 |
| 0000767540 | 0000 | 0000 | 0000 | 0328 | 0000 | 0000 | 695F | 5F6E |
| 0000767560 | 7470 | 0072 | FFE0 | FFFF | FFFF | 0010 | 0109 | 0000 |
| 0000767600 | 0000 | 0000 | 0020 | 0000 | 0000 | 0000 | 0000 | 0000 |
| 0000767620 | 6F5F | 7475 | 705F | 7274 | FFC0 | FFFF | FFFF | 0010 |
| 0000767640 | 0109 | 0000 | 0000 | 0000 | 0020 | 0000 | 0000 | 0000 |
| 0000767660 | 0000 | 0000 | 652E | 0066 | 0000 | 0000 | 4F90 | FFC6 |
| 0000767700 | 0001 | 0000 | 0165 | 0000 | 0000 | 01F1 | 0000 | 0000 |
| 0000767720 | 0000 | 0000 | 0000 | 0000 | 0000 | 0000 | 5097 | 0000 |
| 0000767740 | 4F90 | FFC6 | 0001 | 0024 | 0102 | 0000 | 0000 | 00F0 |
| 0000767760 | 0000 | 3538 | 0001 | 26C0 | 0000 | 0002 | 622E | 0066 |
| 0000770000 | 0000 | 0000 | 4F90 | FFC6 | 0001 | 0000 | 0165 | 0000 |
| 0000770020 | 0000 | 0200 | 0000 | 0000 | 0000 | 0332 | 0000 | 0000 |
| 0000770040 | 695F | 5F6E | 7470 | 0072 | FFE0 | FFFF | FFFF | 0010 |
| 0000770060 | 0109 | 0000 | 0000 | 0000 | 0020 | 0000 | 0000 | 0000 |
| 0000770100 | 0000 | 0000 | 6F5F | 7475 | 705F | 7274 | FFC0 | FFFF |
| 0000770120 | FFFF | 0010 | 0109 | 0000 | 0000 | 0000 | 0020 | 0000 |
| 0000770140 | 0000 | 0000 | 0000 | 0000 | 652E | 0066 | 0000 | 0000 |
| 0000770160 | 5080 | FFC6 | 0001 | 0000 | 0165 | 0000 | 0000 | 0207 |
| 0000770200 | 0000 | 0000 | 0000 | 0000 | 0000 | 0000 | 0000 | 0000 |
| 0000770220 | 50A2 | 0000 | 5080 | FFC6 | 0001 | 0024 | 0102 | 0000 |
| 0000770240 | 0000 | 0430 | 0000 | 354A | 0001 | 26CA | 0000 | 0003 |
| 0000770260 | 622E | 0066 | 0000 | 0000 | 5080 | FFC6 | 0001 | 0000 |
| 0000770300 | 0165 | 0000 | 0000 | 021B | 0000 | 0000 | 0000 | 033C |
| 0000770320 | 0000 | 0000 | 695F | 5F6E | 7470 | 0072 | FFE0 | FFFF |
| 0000770340 | FFFF | 0010 | 0109 | 0000 | 0000 | 0000 | 0020 | 0000 |
| 0000770360 | 0000 | 0000 | 0000 | 0000 | 6F5F | 7475 | 705F | 7274 |
| 0000770400 | FFC0 | FFFF | FFFF | 0010 | 0109 | 0000 | 0000 | 0000 |
| 0000770420 | 0020 | 0000 | 0000 | 0000 | 0000 | 0000 | 652E | 0066 |
| 0000770440 | 0000 | 0000 | 54B0 | FFC6 | 0001 | 0000 | 0165 | 0000 |
| 0000770460 | 0000 | 0234 | 0000 | 0000 | 0000 | 0000 | 0000 | 0000 |
| 0000770500 | 0000 | 0000 | 50AF | 0000 | 54B0 | FFC6 | 0001 | 0024 |
| 0000770520 | 0102 | 0000 | 0000 | 0190 | 0000 | 35A4 | 0001 | 26D4 |
| 0000770540 | 0000 | 0003 | 622E | 0066 | 0000 | 0000 | 54B0 | FFC6 |
| 0000770560 | 0001 | 0000 | 0165 | 0000 | 0000 | 0243 | 0000 | 0000 |
| 0000770600 | 0000 | 0346 | 0000 | 0000 | 695F | 5F6E | 7470 | 0072 |
| 0000770620 | FFE0 | FFFF | FFFF | 0010 | 0109 | 0000 | 0000 | 0000 |
| 0000770640 | 0020 | 0000 | 0000 | 0000 | 0000 | 0000 | 6F5F | 7475 |
| 0000770660 | 705F | 7274 | FFC0 | FFFF | FFFF | 0010 | 0109 | 0000 |
| 0000770700 | 0000 | 0000 | 0020 | 0000 | 0000 | 0000 | 0000 | 0000 |
| 0000770720 | 652E | 0066 | 0000 | 0000 | 5640 | FFC6 | 0001 | 0000 |
| 0000770740 | 0165 | 0000 | 0000 | 024C | 0000 | 0000 | 0000 | 0000 |
| 0000770760 | 0000 | 0000 | 0000 | 0000 | 50BA | 0000 | 5640 | FFC6 |
| 0000771000 | 0001 | 0024 | 0102 | 0000 | 0000 | 0110 | 0000 | 35C2 |
| 0000771020 | 0001 | 26DE | 0000 | 0002 | 622E | 0066 | 0000 | 0000 |
| 0000771040 | 5640 | FFC6 | 0001 | 0000 | 0165 | 0000 | 0000 | 025B |
| 0000771060 | 0000 | 0000 | 0000 | 0350 | 0000 | 0000 | 695F | 5F6E |
| 0000771100 | 7470 | 0072 | FFE0 | FFFF | FFFF | 0010 | 0109 | 0000 |
| 0000771120 | 0000 | 0000 | 0020 | 0000 | 0000 | 0000 | 0000 | 0000 |

THU MAR 14 17:37:32 1991 GSPMON.4 PAGE 275, LINE 16167

| | | | | | | | | |
|---|---|---|---|---|---|---|---|---|
| 0000771140 | 6F5F | 7475 | 705F | 7274 | FFC0 | FFFF | FFFF | 0010 |
| 0000771160 | 0109 | 0000 | 0000 | 0000 | 0020 | 0000 | 0000 | 0000 |
| 0000771200 | 0000 | 0000 | 652E | 0066 | 0000 | 0000 | 5750 | FFC6 |
| 0000771220 | 0001 | 0000 | 0165 | 0000 | 0000 | 0262 | 0000 | 0000 |
| 0000771240 | 0000 | 0000 | 0000 | 0000 | 0000 | 0000 | 50C4 | 0000 |
| 0000771260 | 5750 | FFC6 | 0001 | 0024 | 0102 | 0000 | 0000 | 0120 |
| 0000771300 | 0000 | 35D4 | 0001 | 26E8 | 0000 | 0002 | 622E | 0066 |
| 0000771320 | 0000 | 0000 | 5750 | FFC6 | 0001 | 0000 | 0165 | 0000 |
| 0000771340 | 0000 | 0270 | 0000 | 0000 | 0000 | 035A | 0000 | 0000 |
| 0000771360 | 695F | 5F6E | 7470 | 0072 | FFE0 | FFFF | FFFF | 0010 |
| 0000771400 | 0109 | 0000 | 0000 | 0000 | 0020 | 0000 | 0000 | 0000 |
| 0000771420 | 0000 | 0000 | 6F5F | 7475 | 705F | 7274 | FFC0 | FFFF |
| 0000771440 | FFFF | 0010 | 0109 | 0000 | 0000 | 0000 | 0020 | 0000 |
| 0000771460 | 0000 | 0000 | 0000 | 0000 | 652E | 0066 | 0000 | 0000 |
| 0000771500 | 5870 | FFC6 | 0001 | 0000 | 0165 | 0000 | 0000 | 0277 |
| 0000771520 | 0000 | 0000 | 0000 | 0000 | 0000 | 0000 | 0000 | 0000 |
| 0000771540 | 50D4 | 0000 | 5870 | FFC6 | 0001 | 0024 | 0102 | 0000 |
| 0000771560 | 0000 | 08C0 | 0000 | 35E6 | 0001 | 2706 | 0000 | 0004 |
| 0000771600 | 622E | 0066 | 0000 | 0000 | 5870 | FFC6 | 0001 | 0000 |
| 0000771620 | 0165 | 0000 | 0000 | 0289 | 0000 | 0000 | 0000 | 0378 |
| 0000771640 | 0000 | 0000 | 695F | 5F6E | 7470 | 0072 | FFE0 | FFFF |
| 0000771660 | FFFF | 0010 | 0109 | 0000 | 0000 | 0000 | 0020 | 0000 |
| 0000771700 | 0000 | 0000 | 0000 | 0000 | 6F5F | 7475 | 705F | 7274 |
| 0000771720 | FFC0 | FFFF | FFFF | 0010 | 0109 | 0000 | 0000 | 0000 |
| 0000771740 | 0020 | 0000 | 0000 | 0000 | 0000 | 0000 | 0000 | 0000 |
| 0000771760 | 50E0 | 0000 | 0000 | 0000 | FFFF | 0018 | 0101 | 25A6 |
| 0000772000 | 0000 | 0000 | 0020 | 0000 | 0000 | 0000 | 0000 | 0000 |
| 0000772020 | 0000 | 0000 | 50EC | 0000 | 0020 | 0000 | FFFF | 0005 |
| 0000772040 | 0101 | 0000 | 0000 | 0000 | 0020 | 0000 | 0000 | 0000 |
| 0000772060 | 0000 | 0000 | 705F | 616C | 656E | 0000 | 0040 | 0000 |
| 0000772100 | FFFF | 0005 | 0101 | 0000 | 0000 | 0000 | 0020 | 0000 |
| 0000772120 | 0000 | 0000 | 0000 | 0000 | 695F | 0000 | 0000 | 0000 |
| 0000772140 | 0060 | 0000 | FFFF | 0005 | 0101 | 0000 | 0000 | 0000 |
| 0000772160 | 0020 | 0000 | 0000 | 0000 | 0000 | 0000 | 0000 | 0000 |
| 0000772200 | 50F8 | 0000 | 0080 | 0000 | FFFF | 0005 | 0101 | 0000 |
| 0000772220 | 0000 | 0000 | 0020 | 0000 | 0000 | 0000 | 0000 | 0000 |
| 0000772240 | 0000 | 0000 | 5105 | 0000 | 00A0 | 0000 | FFFF | 001D |
| 0000772260 | 0101 | 0000 | 0000 | 0000 | 0020 | 0000 | 0000 | 0000 |
| 0000772300 | 0000 | 0000 | 0000 | 0000 | 5112 | 0000 | 00C0 | 0000 |
| 0000772320 | FFFF | 0005 | 0101 | 0000 | 0000 | 0000 | 0020 | 0000 |
| 0000772340 | 0000 | 0000 | 0000 | 0000 | 0000 | 0000 | 511E | 0000 |
| 0000772360 | 00E0 | 0000 | FFFF | 0005 | 0101 | 0000 | 0000 | 0000 |
| 0000772400 | 0020 | 0000 | 0000 | 0000 | 0000 | 0000 | 6D5F | 7361 |
| 0000772420 | 006B | 0000 | 0100 | 0000 | FFFF | 0005 | 0101 | 0000 |
| 0000772440 | 0000 | 0000 | 0020 | 0000 | 0000 | 0000 | 0000 | 0000 |
| 0000772460 | 745F | 6D65 | 0070 | 0000 | 0120 | 0000 | FFFF | 0018 |
| 0000772500 | 0101 | 25B4 | 0000 | 0000 | 0020 | 0000 | 0000 | 0000 |
| 0000772520 | 0000 | 0000 | 652E | 0066 | 0000 | 0000 | 6130 | FFC6 |
| 0000772540 | 0001 | 0000 | 0165 | 0000 | 0000 | 02B3 | 0000 | 0000 |
| 0000772560 | 0000 | 0000 | 0000 | 0000 | 0000 | 0000 | 512B | 0000 |
| 0000772600 | 6130 | FFC6 | 0001 | 0024 | 0102 | 0000 | 0000 | 0070 |
| 0000772620 | 0000 | 3658 | 0001 | 2710 | 0000 | 0001 | 622E | 0066 |
| 0000772640 | 0000 | 0000 | 6130 | FFC6 | 0001 | 0000 | 0165 | 0000 |
| 0000772660 | 0000 | 02C3 | 0000 | 0000 | 0000 | 0382 | 0000 | 0000 |
| 0000772700 | 695F | 5F6E | 7470 | 0072 | FFE0 | FFFF | FFFF | 0010 |
| 0000772720 | 0109 | 0000 | 0000 | 0000 | 0020 | 0000 | 0000 | 0000 |
| 0000772740 | 0000 | 0000 | 6F5F | 7475 | 705F | 7274 | FFC0 | FFFF |
| 0000772760 | FFFF | 0010 | 0109 | 0000 | 0000 | 0000 | 0020 | 0000 |
| 0000773000 | 0000 | 0000 | 0000 | 0000 | 652E | 0066 | 0000 | 0000 |

THU MAR 14 17:37:32 1991 GSPMON.4 PAGE 276, LINE 16226

| | | | | | | | | |
|---|---|---|---|---|---|---|---|---|
| 0000773020 | 61A0 | FFC6 | 0001 | 0000 | 0165 | 0000 | 0000 | 02C9 |
| 0000773040 | 0000 | 0000 | 0000 | 0000 | 0000 | 0000 | 0000 | 0000 |
| 0000773060 | 513A | 0000 | 61A0 | FFC6 | 0001 | 0024 | 0102 | 0000 |
| 0000773100 | 0000 | 0590 | 0000 | 3664 | 0001 | 2720 | 0000 | 0003 |
| 0000773120 | 622E | 0066 | 0000 | 0000 | 61A0 | FFC6 | 0001 | 0000 |
| 0000773140 | 0165 | 0000 | 0000 | 02D0 | 0000 | 0000 | 0000 | 0392 |
| 0000773160 | 0000 | 0000 | 705F | 616C | 656E | 0000 | FFE0 | FFFF |
| 0000773200 | FFFF | 0005 | 0109 | 0000 | 0000 | 0000 | 0020 | 0000 |
| 0000773220 | 0000 | 0000 | 0000 | 0000 | 0000 | 0000 | 514A | 0000 |
| 0000773240 | 0000 | 0000 | FFFF | 0005 | 0101 | 0000 | 0000 | 0000 |
| 0000773260 | 0020 | 0000 | 0000 | 0000 | 0000 | 0000 | 0000 | 0000 |
| 0000773300 | 5156 | 0000 | 0020 | 0000 | FFFF | 0005 | 0101 | 0000 |
| 0000773320 | 0000 | 0000 | 0020 | 0000 | 0000 | 0000 | 0000 | 0000 |
| 0000773340 | 6F5F | 656E | 0000 | 0000 | 0040 | 0000 | FFFF | 0005 |
| 0000773360 | 0101 | 0000 | 0000 | 0000 | 0020 | 0000 | 0000 | 0000 |
| 0000773400 | 0000 | 0000 | 695F | 0000 | 0000 | 0000 | 0060 | 0000 |
| 0000773420 | FFFF | 0005 | 0101 | 0000 | 0000 | 0000 | 0020 | 0000 |
| 0000773440 | 0000 | 0000 | 0000 | 0000 | 652E | 0066 | 0000 | 0000 |
| 0000773460 | 6730 | FFC6 | 0001 | 0000 | 0165 | 0000 | 0000 | 02EB |
| 0000773500 | 0000 | 0000 | 0000 | 0000 | 0000 | 0000 | 0000 | 0000 |
| 0000773520 | 5162 | 0000 | 6730 | FFC6 | 0001 | 0024 | 0102 | 0000 |
| 0000773540 | 0000 | 0220 | 0000 | 36BE | 0001 | 2726 | 0000 | 0002 |
| 0000773560 | 622E | 0066 | 0000 | 0000 | 6730 | FFC6 | 0001 | 0000 |
| 0000773600 | 0165 | 0000 | 0000 | 02F4 | 0000 | 0000 | 0000 | 0398 |
| 0000773620 | 0000 | 0000 | 652E | 0066 | 0000 | 0000 | 6950 | FFC6 |
| 0000773640 | 0001 | 0000 | 0165 | 0000 | 0000 | 0300 | 0000 | 0000 |
| 0000773660 | 0000 | 0000 | 0000 | 0000 | 0000 | 0000 | 5174 | 0000 |
| 0000773700 | 6950 | FFC6 | 0001 | 0024 | 0102 | 0000 | 0000 | 00D0 |
| 0000773720 | 0000 | 36E2 | 0001 | 2730 | 0000 | 0001 | 622E | 0066 |
| 0000773740 | 0000 | 0000 | 6950 | FFC6 | 0001 | 0000 | 0165 | 0000 |
| 0000773760 | 0000 | 030F | 0000 | 0000 | 0000 | 03A2 | 0000 | 0000 |
| 0000774000 | 695F | 5F6E | 7470 | 0072 | FFE0 | FFFF | FFFF | 0010 |
| 0000774020 | 0109 | 0000 | 0000 | 0000 | 0020 | 0000 | 0000 | 0000 |
| 0000774040 | 0000 | 0000 | 6F5F | 7475 | 705F | 7274 | FFC0 | FFFF |
| 0000774060 | FFFF | 0010 | 0109 | 0000 | 0000 | 0000 | 0020 | 0000 |
| 0000774100 | 0000 | 0000 | 0000 | 0000 | 652E | 0066 | 0000 | 0000 |
| 0000774120 | 6A20 | FFC6 | 0001 | 0000 | 0165 | 0000 | 0000 | 0316 |
| 0000774140 | 0000 | 0000 | 0000 | 0000 | 0000 | 0000 | 0000 | 0000 |
| 0000774160 | 5184 | 0000 | 6A20 | FFC6 | 0001 | 0024 | 0102 | 0000 |
| 0000774200 | 0000 | 0110 | 0000 | 36F4 | 0001 | 273A | 0000 | 0002 |
| 0000774220 | 622E | 0066 | 0000 | 0000 | 6A20 | FFC6 | 0001 | 0000 |
| 0000774240 | 0165 | 0000 | 0000 | 0324 | 0000 | 0000 | 0000 | 03AC |
| 0000774260 | 0000 | 0000 | 695F | 5F6E | 7470 | 0072 | FFE0 | FFFF |
| 0000774300 | FFFF | 0010 | 0109 | 0000 | 0000 | 0000 | 0020 | 0000 |
| 0000774320 | 0000 | 0000 | 0000 | 0000 | 6F5F | 7475 | 705F | 7274 |
| 0000774340 | FFC0 | FFFF | FFFF | 0010 | 0109 | 0000 | 0000 | 0000 |
| 0000774360 | 0020 | 0000 | 0000 | 0000 | 0000 | 0000 | 652E | 0066 |
| 0000774400 | 0000 | 0000 | 6B30 | FFC6 | 0001 | 0000 | 0165 | 0000 |
| 0000774420 | 0000 | 032C | 0000 | 0000 | 0000 | 0000 | 0000 | 0000 |
| 0000774440 | 742E | 7865 | 0074 | 0000 | 3050 | FFC6 | 0001 | 0000 |
| 0000774460 | 0103 | 3AE0 | 0000 | 0068 | 0096 | 0000 | 0000 | 0000 |
| 0000774500 | 0000 | 0000 | 642E | 7461 | 0061 | 0000 | 0000 | 0000 |
| 0000774520 | 0004 | 0000 | 0103 | 0000 | 0000 | 0000 | 0000 | 0000 |
| 0000774540 | 0000 | 0000 | 0000 | 0000 | 622E | 7373 | 0000 | 0000 |
| 0000774560 | 6BA0 | FFD2 | 0003 | 0000 | 0103 | 02D0 | 0000 | 0000 |
| 0000774600 | 0000 | 0000 | 0000 | 0000 | 0000 | 0000 | 632E | 6E69 |
| 0000774620 | 7469 | 0000 | CFC0 | FFC6 | 0002 | 0000 | 0103 | 02C0 |
| 0000774640 | 0000 | 000A | 0000 | 0000 | 0000 | 0000 | 0000 | 0000 |
| 0000774660 | 742E | 7865 | 0074 | 0000 | 6B30 | FFC6 | 0001 | 0000 |

THU MAR 14 17:37:32 1991 GSPMON.4 PAGE 277, LINE 16285

| | | | | | | | | |
|---|---|---|---|---|---|---|---|---|
| 0000774700 | 0103 | 0110 | 0000 | 0000 | 0000 | 0000 | 0000 | 0000 |
| 0000774720 | 0000 | 0000 | 642E | 7461 | 0061 | 0000 | 0000 | 0000 |
| 0000774740 | 0004 | 0000 | 0103 | 0000 | 0000 | 0000 | 0000 | 0000 |
| 0000774760 | 0000 | 0000 | 0000 | 0000 | 622E | 7373 | 0000 | 0000 |
| 0000775000 | 6E50 | FFD2 | 0003 | 0000 | 0103 | 0000 | 0000 | 0000 |
| 0000775020 | 0000 | 0000 | 0000 | 0000 | 0000 | 0000 | 742E | 7865 |
| 0000775040 | 0074 | 0000 | 6C40 | FFC6 | 0001 | 0000 | 0103 | 01E0 |
| 0000775060 | 0000 | 0000 | 0000 | 0000 | 0000 | 0000 | 0000 | 0000 |
| 0000775100 | 642E | 7461 | 0061 | 0000 | 0000 | 0000 | 0004 | 0000 |
| 0000775120 | 0103 | 0000 | 0000 | 0000 | 0000 | 0000 | 0000 | 0000 |
| 0000775140 | 0000 | 0000 | 622E | 7373 | 0000 | 0000 | 6E50 | FFD2 |
| 0000775160 | 0003 | 0000 | 0103 | 0000 | 0000 | 0000 | 0000 | 0000 |
| 0000775200 | 0000 | 0000 | 0000 | 0000 | 742E | 7865 | 0074 | 0000 |
| 0000775220 | 6E20 | FFC6 | 0001 | 0000 | 0103 | 0350 | 0000 | 0006 |
| 0000775240 | 0000 | 0000 | 0000 | 0000 | 0000 | 0000 | 642E | 7461 |
| 0000775260 | 0061 | 0000 | 0000 | 0000 | 0004 | 0000 | 0103 | 0000 |
| 0000775300 | 0000 | 0000 | 0000 | 0000 | 0000 | 0000 | 0000 | 0000 |
| 0000775320 | 622E | 7373 | 0000 | 0000 | 6E50 | FFD2 | 0003 | 0000 |
| 0000775340 | 0103 | FA00 | 0000 | 0000 | 0000 | 0000 | 0000 | 0000 |
| 0000775360 | 0000 | 0000 | 742E | 7865 | 0074 | 0000 | 7170 | FFC6 |
| 0000775400 | 0001 | 0000 | 0103 | 03A0 | 0000 | 0007 | 0000 | 0000 |
| 0000775420 | 0000 | 0000 | 0000 | 0000 | 642E | 7461 | 0061 | 0000 |
| 0000775440 | 0000 | 0000 | 0004 | 0000 | 0103 | 0000 | 0000 | 0000 |
| 0000775460 | 0000 | 0000 | 0000 | 0000 | 0000 | 0000 | 622E | 7373 |
| 0000775500 | 0000 | 0000 | 6850 | FFD3 | 0003 | 0000 | 0103 | 042n |
| 0000775520 | 0000 | 0000 | 0000 | 0000 | 0000 | 0000 | 0000 | 0000 |
| 0000775540 | 632E | 6E69 | 7469 | 0000 | D280 | FFC6 | 0002 | 0000 |
| 0000775560 | 0103 | 0050 | 0000 | 0001 | 0000 | 0000 | 0000 | 0000 |
| 0000775600 | 0000 | 0000 | 742E | 7865 | 0074 | 0000 | 7510 | FFC6 |
| 0000775620 | 0001 | 0000 | 0103 | 0450 | 0000 | 0002 | 0000 | 0000 |
| 0000775640 | 0000 | 0000 | 0000 | 0000 | 642E | 7461 | 0061 | 0000 |
| 0000775660 | 0000 | 0000 | 0004 | 0000 | 0103 | 0000 | 0000 | 0000 |
| 0000775700 | 0000 | 0000 | 0000 | 0000 | 0000 | 0000 | 622E | 7373 |
| 0000775720 | 0000 | 0000 | 6C70 | FFD3 | 0003 | 0000 | 0103 | 0000 |
| 0000775740 | 0000 | 0000 | 0000 | 0000 | 0000 | 0000 | 0000 | 0000 |
| 0000775760 | 742E | 7865 | 0074 | 0000 | 7960 | FFC6 | 0001 | 0000 |
| 0000776000 | 0103 | 2200 | 0000 | 0020 | 0000 | 0000 | 0000 | 0000 |
| 0000776020 | 0000 | 0000 | 642E | 7461 | 0061 | 0000 | 0000 | 0000 |
| 0000776040 | 0004 | 000C | 0103 | 0000 | 0000 | 0000 | 0000 | 0000 |
| 0000776060 | 0000 | 0000 | 0000 | 0000 | 622E | 7373 | 0000 | 0000 |
| 0000776100 | 6C70 | FFD3 | 0003 | 0000 | 0103 | 0020 | 0020 | 0000 |
| 0000776120 | 0000 | 0000 | 0000 | 0000 | 0000 | 0000 | 632E | 6E69 |
| 0000776140 | 7469 | 0000 | D2D0 | FFC6 | 0002 | 0000 | 0103 | 00C0 |
| 0000776160 | 0000 | 0003 | 0000 | 0000 | 0000 | 0000 | 0000 | 0000 |
| 0000776200 | 742E | 7865 | 0074 | 0000 | 9B60 | FFC6 | 0001 | 0000 |
| 0000776220 | 0103 | 0160 | 0000 | 0000 | 0000 | 0000 | 0000 | 0000 |
| 0000776240 | 0000 | 0000 | 642E | 7461 | 0061 | 0000 | 0000 | 0000 |
| 0000776260 | 0004 | 0000 | 0103 | 0000 | 0000 | 0000 | 0000 | 0000 |
| 0000776300 | 0000 | 0000 | 0000 | 0000 | 622E | 7373 | 0000 | 0000 |
| 0000776320 | 6C90 | FFF3 | 0003 | 0000 | 0103 | 0000 | 0000 | 0000 |
| 0000776340 | 0000 | 0000 | 0000 | 0000 | 0000 | 0000 | 742E | 7865 |
| 0000776360 | 0074 | 0000 | 9CC0 | FFC6 | 0001 | 0000 | 0103 | 0BC0 |
| 0000776400 | 0000 | 0003 | 0000 | 0000 | 0000 | 0000 | 0000 | 0000 |
| 0000776420 | 642E | 7461 | 0061 | 0000 | 0000 | 0000 | 0004 | 0000 |
| 0000776440 | 0103 | 0000 | 0000 | 0000 | 0000 | 0000 | 0000 | 0000 |
| 0000776460 | 0000 | 0000 | 622E | 7373 | 0000 | 0000 | 6C90 | FFF3 |
| 0000776500 | 0003 | 0000 | 0103 | 0000 | 0000 | 0000 | 0000 | 0000 |
| 0000776520 | 0000 | 0000 | 0000 | 0000 | 742E | 7865 | 0074 | 0000 |
| 0000776540 | A880 | FFC6 | 0001 | 0000 | 0103 | 01A0 | 0000 | 0000 |

THU MAR 14 17:37:32 1991 GSPMON.4 PAGE 278, LINE 16344

| | | | | | | | | |
|---|---|---|---|---|---|---|---|---|
| 0000776560 | 0000 | 0000 | 0000 | 0000 | 0000 | 0000 | 642E | 7461 |
| 0000776600 | 0061 | 0000 | 0000 | 0000 | 0004 | 0000 | 0103 | 0000 |
| 0000776620 | 0000 | 0000 | 0000 | 0000 | 0000 | 0000 | 0000 | 0000 |
| 0000776640 | 622E | 7373 | 0000 | 0000 | 6C90 | FFF3 | 0003 | 0000 |
| 0000776660 | 0103 | 0000 | 0000 | 0000 | 0000 | 0000 | 0000 | 0000 |
| 0000776700 | 0000 | 0000 | 662E | 6C69 | 0065 | 0000 | 2790 | 0000 |
| 0000776720 | FFFE | 0000 | 0167 | 6F63 | 6F6C | 3172 | 612E | 6D73 |
| 0000776740 | 0000 | 0000 | 0000 | 0000 | 742E | 7865 | 0074 | 0000 |
| 0000776760 | AA20 | FFC6 | 0001 | 0000 | 0103 | 0030 | 0000 | 0000 |
| 0000777000 | 0000 | 0000 | 0000 | 0000 | 0000 | 0000 | 642E | 7461 |
| 0000777020 | 0061 | 0000 | 0000 | 0000 | 0004 | 0000 | 0103 | 0000 |
| 0000777040 | 0000 | 0000 | 0000 | 0000 | 0000 | 0000 | 0000 | 0000 |
| 0000777060 | 622E | 7373 | 0000 | 0000 | 6C90 | FFF3 | 0003 | 0000 |
| 0000777100 | 0103 | 0000 | 0000 | 0000 | 0000 | 0000 | 0000 | 0000 |
| 0000777120 | 0000 | 0000 | 742E | 7865 | 0074 | 0000 | AA50 | FFC6 |
| 0000777140 | 0001 | 0000 | 0103 | 0250 | 0000 | 0000 | 0000 | 0000 |
| 0000777160 | 0000 | 0000 | 0000 | 0000 | 642E | 7461 | 0061 | 0000 |
| 0000777200 | 0000 | 0000 | 0004 | 0000 | 0103 | 0000 | 0000 | 0000 |
| 0000777220 | 0000 | 0000 | 0000 | 0000 | 0000 | 0000 | 622E | 7373 |
| 0000777240 | 0000 | 0000 | 6C90 | FFF3 | 0003 | 0000 | 0103 | 0000 |
| 0000777260 | 0000 | 0000 | 0000 | 0000 | 0000 | 0000 | 0000 | 0000 |
| 0000777300 | 742E | 7865 | 0074 | 0000 | ACA0 | FFC6 | 0001 | 0000 |
| 0000777320 | 0103 | 03D0 | 0000 | 0000 | 0000 | 0000 | 0000 | 0000 |
| 0000777340 | 0000 | 0000 | 642E | 7461 | 0061 | 0000 | 0000 | 0000 |
| 0000777360 | 0004 | 0000 | 0103 | 0000 | 0000 | 0000 | 0000 | 0000 |
| 0000777400 | 0000 | 0000 | 0000 | 0000 | 622E | 7373 | 0000 | 0000 |
| 0000777420 | 6C90 | FFF3 | 0003 | 0000 | 0103 | 0000 | 0000 | 0000 |
| 0000777440 | 0000 | 0000 | 0000 | 0000 | 0000 | 0000 | 662E | 6C69 |
| 0000777460 | 0065 | 0000 | 2798 | 0000 | FFFE | 0000 | 0167 | 6570 |
| 0000777500 | 6B65 | 612E | 6D73 | 0000 | 0000 | 0000 | 0000 | 0000 |
| 0000777520 | 742E | 7865 | 0074 | 0000 | B070 | FFC6 | 0001 | 0000 |
| 0000777540 | 0103 | 0040 | 0000 | 0000 | 0000 | 0000 | 0000 | 0000 |
| 0000777560 | 0000 | 0000 | 642E | 7461 | 0061 | 0000 | 0000 | 0000 |
| 0000777600 | 0004 | 0000 | 0103 | 0000 | 0000 | 0000 | 0000 | 0000 |
| 0000777620 | 0000 | 0000 | 0000 | 0000 | 622E | 7373 | 0000 | 0000 |
| 0000777640 | 6C90 | FFF3 | 0003 | 0000 | 0103 | 0000 | 0000 | 0000 |
| 0000777660 | 0000 | 0000 | 0000 | 0000 | 0000 | 0000 | 662E | 6C69 |
| 0000777700 | 0065 | 0000 | 27A6 | 0000 | FFFE | 0000 | 0167 | 6570 |
| 0000777720 | 6B65 | 7262 | 6765 | 612E | 6D73 | 0000 | 0000 | 0000 |
| 0000777740 | 742E | 7865 | 0074 | 0000 | B0B0 | FFC6 | 0001 | 0000 |
| 0000777760 | 0103 | 02C0 | 0000 | 0001 | 0000 | 0000 | 0000 | 0000 |
| 0001000000 | 0000 | 0000 | 642E | 7461 | 0061 | 0000 | 0000 | 0000 |
| 0001000020 | 0004 | 0000 | 0103 | 0000 | 0000 | 0000 | 0000 | 0000 |
| 0001000040 | 0000 | 0000 | 0000 | 0000 | 622E | 7373 | 0000 | 0000 |
| 0001000060 | 6C90 | FFF3 | 0003 | 0000 | 0103 | 0000 | 0000 | 0000 |
| 0001000100 | 0000 | 0000 | 0000 | 0000 | 0000 | 0000 | 742E | 7865 |
| 0001000120 | 0074 | 0000 | B370 | FFC6 | 0001 | 0000 | 0103 | 0190 |
| 0001000140 | 0000 | 0000 | 0000 | 0000 | 0000 | 0000 | 0000 | 0000 |
| 0001000160 | 642E | 7461 | 0061 | 0000 | 0000 | 0000 | 0004 | 0000 |
| 0001000200 | 0103 | 0000 | 0000 | 0000 | 0000 | 0000 | 0000 | 0000 |
| 0001000220 | 0000 | 0000 | 622E | 7373 | 0000 | 0000 | 6C90 | FFF3 |
| 0001000240 | 0003 | 0000 | 0103 | 0000 | 0000 | 0000 | 0000 | 0000 |
| 0001000260 | 0000 | 0000 | 0000 | 0000 | 662E | 6C69 | 0065 | 0000 |
| 0001000300 | 27BA | 0000 | FFFE | 0000 | 0167 | 6573 | 5F74 | 7070 |
| 0001000320 | 706F | 612E | 6D73 | 0000 | 0000 | 0000 | 742E | 7865 |
| 0001000340 | 0074 | 0000 | B500 | FFC6 | 0001 | 0000 | 0103 | 0060 |
| 0001000360 | 0000 | 0000 | 0000 | 0000 | 0000 | 0000 | 0000 | 0000 |
| 0001000400 | 642E | 7461 | 0061 | 0000 | 0000 | 0000 | 0004 | 0000 |
| 0001000420 | 0103 | 0000 | 0000 | 0000 | 0000 | 0000 | 0000 | 0000 |

THU MAR 14 17:37:32 1991 GSPMON.4 PAGE 279, LINE 16403

| | | | | | | | | |
|---|---|---|---|---|---|---|---|---|
| 0001000440 | 0000 | 0000 | 622E | 7373 | 0000 | 0000 | 6C90 | FFF3 |
| 0001000460 | 0003 | 0000 | 0103 | 0000 | 0000 | 0000 | 0000 | 0000 |
| 0001000500 | 0000 | 0000 | 0000 | 0000 | 742E | 7865 | 0074 | 0000 |
| 0001000520 | B560 | FFC6 | 0001 | 0000 | 0103 | 02D0 | 0000 | 0000 |
| 0001000540 | 0000 | 0000 | 0000 | 0000 | 0000 | 0000 | 642E | 7461 |
| 0001000560 | 0061 | 0000 | 0000 | 0000 | 0004 | 0000 | 0103 | 0000 |
| 0001000600 | 0000 | 0000 | 0000 | 0000 | 0000 | 0000 | 0000 | 0000 |
| 0001000620 | 622E | 7373 | 0000 | 0000 | 6C90 | FFF3 | 0003 | 0000 |
| 0001000640 | 0103 | 0000 | 0000 | 0000 | 0000 | 0000 | 0000 | 0000 |
| 0001000660 | 0000 | 0000 | 742E | 7865 | 0074 | 0000 | B830 | FFC6 |
| 0001000700 | 0001 | 0000 | 0103 | 0120 | 0000 | 0000 | 0000 | 0000 |
| 0001000720 | 0000 | 0000 | 0000 | 0000 | 642E | 7461 | 0061 | 0000 |
| 0001000740 | 0000 | 0000 | 0004 | 0000 | 0103 | 0000 | 0000 | 0000 |
| 0001000760 | 0000 | 0000 | 0000 | 0000 | 0000 | 0000 | 622E | 7373 |
| 0001001000 | 0000 | 0000 | 6C90 | FFF3 | 0003 | 0000 | 0103 | 0000 |
| 0001001020 | 0000 | 0000 | 0000 | 0000 | 0000 | 0000 | 0000 | 0000 |
| 0001001040 | 635F | 695F | 746E | 3030 | 6E20 | FFC6 | 0001 | 0000 |
| 0001001060 | 0002 | 0000 | 0000 | 518F | 0000 | D3A0 | FFC6 | 0003 |
| 0001001100 | 0035 | 0102 | 0000 | 0000 | 0000 | 0200 | 0010 | 0000 |
| 0001001120 | 0000 | 0000 | 0000 | 0000 | 0000 | 519B | 0000 | D5A0 |
| 0001001140 | FFC6 | 0003 | 000A | 0102 | 006A | 0000 | 0000 | 0002 |
| 0001001160 | 0000 | 0000 | 0000 | 0000 | 0000 | 685F | 736F | 6D74 |
| 0001001200 | 6773 | D5B0 | FFC6 | 0003 | 0018 | 0102 | 0050 | 0000 |
| 0001001220 | 0000 | 0020 | 0000 | 0000 | 0000 | 0000 | 0000 | 685F |
| 0001001240 | 736F | 6974 | 746E | D5D0 | FFC6 | 0003 | 0018 | 0102 |
| 0001001260 | 0050 | 0000 | 0000 | 0020 | 0000 | 0000 | 0000 | 0000 |
| 0001001300 | 0000 | 685F | 736F | 7274 | 7165 | D5F0 | FFC6 | 0003 |
| 0001001320 | 0018 | 0102 | 0046 | 0000 | 0000 | 0020 | 0000 | 0000 |
| 0001001340 | 0000 | 0000 | 0000 | 675F | 7073 | 7473 | 7461 | D610 |
| 0001001360 | FFC6 | 0003 | 0013 | 0102 | 0000 | 0000 | 0000 | 0020 |
| 0001001400 | 0000 | 0000 | 0000 | 0000 | 0000 | 675F | 7073 | 6E69 |
| 0001001420 | 0000 | D630 | FFC6 | 0003 | 0010 | 0102 | 0000 | 0000 |
| 0001001440 | 0000 | 0020 | 0000 | 0000 | 0000 | 0000 | 0000 | 675F |
| 0001001460 | 7073 | 756F | 0074 | D650 | FFC6 | 0003 | 0010 | 0102 |
| 0001001500 | 0000 | 0000 | 0000 | 0020 | 0000 | 0000 | 0000 | 0000 |
| 0001001520 | 0000 | 675F | 7073 | 6572 | 0071 | D670 | FFC6 | 0003 |
| 0001001540 | 001D | 0102 | 0000 | 0000 | 0000 | 0020 | 0000 | 0000 |
| 0001001560 | 0000 | 0000 | 0000 | 0000 | 0000 | 51A9 | 0000 | D690 |
| 0001001600 | FFC6 | 0003 | 0013 | 0102 | 0000 | 0000 | 0000 | 0020 |
| 0001001620 | 0000 | 0000 | 0000 | 0000 | 0000 | 685F | 736F | 6974 |
| 0001001640 | 006E | D6B0 | FFC6 | 0003 | 0010 | 0102 | 0000 | 0000 |
| 0001001660 | 0000 | 0020 | 0000 | 0000 | 0000 | 0000 | 0000 | 685F |
| 0001001700 | 736F | 6F74 | 7475 | D6D0 | FFC6 | 0003 | 0010 | 0102 |
| 0001001720 | 0000 | 0000 | 0000 | 0020 | 0000 | 0000 | 0000 | 0000 |
| 0001001740 | 0000 | 675F | 7073 | 6173 | 6576 | D6F0 | FFC6 | 0003 |
| 0001001760 | 0010 | 0102 | 0000 | 0000 | 0000 | 0020 | 0000 | 0000 |
| 0001002000 | 0000 | 0000 | 0000 | 635F | 646D | 7473 | 7461 | D710 |
| 0001002020 | FFC6 | 0003 | 0013 | 0102 | 0000 | 0000 | 0000 | 0020 |
| 0001002040 | 0000 | 0000 | 0000 | 0000 | 0000 | 635F | 646D | 6E69 |
| 0001002060 | 0000 | D730 | FFC6 | 0003 | 0010 | 0102 | 0000 | 0000 |
| 0001002100 | 0000 | 0020 | 0000 | 0000 | 0000 | 0000 | 0000 | 635F |
| 0001002120 | 646D | 756F | 0074 | D750 | FFC6 | 0003 | 0010 | 0102 |
| 0001002140 | 0000 | 0000 | 0000 | 0020 | 0000 | 0000 | 0000 | 0000 |
| 0001002160 | 0000 | 6C5F | 6E6F | 6A67 | 706D | A940 | FFC6 | 0001 |
| 0001002200 | 0000 | 0002 | 6D5F | 6E69 | 7469 | 0000 | 80B0 | FFC6 |
| 0001002220 | 0001 | 0000 | 0002 | 0000 | 0000 | 51B3 | 0000 | D770 |
| 0001002240 | FFC6 | 0003 | 000A | 0102 | 0216 | 0000 | 0000 | 0001 |
| 0001002260 | 0000 | 0000 | 0000 | 0000 | 0000 | 0000 | 0000 | 51C0 |
| 0001002300 | 0000 | 01E0 | FFC1 | 0001 | 0000 | 0002 | 5F5F | 6573 |

THU MAR 14 17:37:32 1991 GSPMON.4 PAGE 280, LINE 16462

| | | | | | | | | |
|---|---|---|---|---|---|---|---|---|
| 0001002320 | 6A74 | 706D | A880 | FFC6 | 0001 | 0000 | 0002 | 0000 |
| 0001002340 | 0000 | 51CF | 0000 | D780 | FFC6 | 0003 | 0274 | 0102 |
| 0001002360 | 0000 | 0000 | 0000 | 2000 | 0100 | 0000 | 0000 | 0000 |
| 0001002400 | 0000 | 0000 | 0000 | 51DB | 0000 | 0430 | FFC1 | 0001 |
| 0001002420 | 0000 | 0002 | 6D5F | 6D65 | 7063 | 0079 | 7760 | FFC6 |
| 0001002440 | 0001 | 0000 | 0002 | 635F | 6572 | 3067 | 0000 | F780 |
| 0001002460 | FFC6 | 0003 | 0008 | 0102 | 02E6 | 0000 | 0000 | 0010 |
| 0001002500 | 0000 | 0000 | 0000 | 0000 | 0000 | 635F | 6572 | 3167 |
| 0001002520 | 0000 | F790 | FFC6 | 0003 | 0008 | 0102 | 02FE | 0000 |
| 0001002540 | 0000 | 0010 | 0000 | 0000 | 0000 | 0000 | 0000 | 635F |
| 0001002560 | 6572 | 3267 | 0000 | F7A0 | FFC6 | 0003 | 0008 | 0102 |
| 0001002600 | 0316 | 0000 | 0000 | 0010 | 0000 | 0000 | 0000 | 0000 |
| 0001002620 | 0000 | 635F | 6572 | 3367 | 0000 | F7B0 | FFC6 | 0003 |
| 0001002640 | 0008 | 0102 | 032E | 0000 | 0000 | 0010 | 0000 | 0000 |
| 0001002660 | 0000 | 0000 | 0000 | 0000 | 0000 | 51E6 | 0000 | F7C0 |
| 0001002700 | FFC6 | 0003 | 000A | 0102 | 02D4 | 0000 | 0000 | 0001 |
| 0001002720 | 0000 | 0000 | 0000 | 0000 | 0000 | 0000 | 0000 | 51F1 |
| 0001002740 | 0000 | F7D0 | FFC6 | 0003 | 0008 | 0102 | 02E6 | 0000 |
| 0001002760 | 0000 | 0010 | 0000 | 0000 | 0000 | 0000 | 0000 | 0000 |
| 0001003000 | 0000 | 51FD | 0000 | F7E0 | FFC6 | 0003 | 0008 | 0102 |
| 0001003020 | 0316 | 0000 | 0000 | 0010 | 0000 | 0000 | 0000 | 0000 |
| 0001003040 | 0000 | 0000 | 0000 | 5209 | 0000 | F7F0 | FFC6 | 0003 |
| 0001003060 | 0038 | 0102 | 062A | 0000 | 0000 | 1000 | 0040 | 0000 |
| 0001003100 | 0000 | 0000 | 0000 | 0000 | 0000 | 5213 | 0000 | 0280 |
| 0001003120 | FFC1 | 0001 | 0000 | 0002 | 0000 | 0000 | 5222 | 0000 |
| 0001003140 | 07F0 | FFC7 | 0003 | 000F | 0102 | 0000 | 0000 | 0000 |
| 0001003160 | 0020 | 0000 | 0000 | 0000 | 0000 | 0000 | 0000 | 0000 |
| 0001003200 | 5230 | 0000 | 0810 | FFC7 | 0003 | 00F8 | 0102 | 094C |
| 0001003220 | 0000 | 0000 | 8000 | 0020 | 0020 | 0000 | 0000 | 0000 |
| 0001003240 | 0000 | 0000 | 523D | 0000 | 8810 | FFC7 | 0003 | 000F |
| 0001003260 | 0102 | 0000 | 0000 | 0000 | 0020 | 0000 | 0000 | 0000 |
| 0001003300 | 0000 | 0000 | 0000 | 0000 | 524B | 0000 | 8830 | FFC7 |
| 0001003320 | 0003 | 000F | 0102 | 0000 | 0000 | 0000 | 0020 | 0000 |
| 0001003340 | 0000 | 0000 | 0000 | 0000 | 715F | 6F73 | 7472 | 0000 |
| 0001003360 | 9CC0 | FFC6 | 0001 | 0000 | 0002 | 0000 | 0000 | 5258 |
| 0001003400 | 0000 | 6B20 | FFD2 | 0003 | 0005 | 0102 | 0000 | 0000 |
| 0001003420 | 0000 | 0020 | 0000 | 0000 | 0000 | 0000 | 0000 | 0000 |
| 0001003440 | 0000 | 5271 | 0000 | 6BE0 | FFD2 | 0003 | 0005 | 0102 |
| 0001003460 | 0000 | 0000 | 0000 | 0020 | 0000 | 0000 | 0000 | 0000 |
| 0001003500 | 0000 | 0000 | 0000 | 527E | 0000 | 6B50 | FFD2 | 0003 |
| 0001003520 | 000A | 0102 | 2166 | 0000 | 0000 | 0001 | 0000 | 0000 |
| 0001003540 | 0000 | 0000 | 0000 | 0000 | 0000 | 5292 | 0000 | B500 |
| 0001003560 | FFC6 | 0001 | 0000 | 0002 | 0000 | 0000 | 529C | 0000 |
| 0001003600 | 6B80 | FFD2 | 0003 | 0090 | 0102 | 0000 | 0000 | 0000 |
| 0001003620 | 0020 | 0000 | 0000 | 0000 | 0000 | 0000 | 0000 | 0000 |
| 0001003640 | 52A8 | 0000 | 6C00 | FFD2 | 0003 | 0005 | 0102 | 0000 |
| 0001003660 | 0000 | 0000 | 0020 | 0000 | 0000 | 0000 | 0000 | 0000 |
| 0001003700 | 6D5F | 6C61 | 6F6C | 0063 | 81D0 | FFC6 | 0001 | 0000 |
| 0001003720 | 0002 | 0000 | 0000 | 52B6 | 0000 | B370 | FFC6 | 0001 |
| 0001003740 | 0000 | 0002 | 0000 | 0000 | 52C0 | 0000 | 6D60 | FFD2 |
| 0001003760 | 0003 | 0008 | 0102 | 2664 | 0000 | 0000 | 0030 | 0000 |
| 0001004000 | 0000 | 0000 | 0000 | 0000 | 0000 | 0000 | 52CF | 0000 |
| 0001004020 | 6AA0 | FFD2 | 0003 | 000F | 0102 | 0000 | 0000 | 0000 |
| 0001004040 | 0020 | 0000 | 0000 | 0000 | 0000 | 0000 | 0000 | 0000 |
| 0001004060 | 52DC | 0000 | 6B60 | FFD2 | 0003 | 0090 | 0102 | 0000 |
| 0001004100 | 0000 | 0000 | 0020 | 0000 | 0000 | 0000 | 0000 | 0000 |
| 0001004120 | 665F | 6C69 | 006C | 0000 | B830 | FFC6 | 0001 | 0000 |
| 0001004140 | 0002 | 0000 | 0000 | 52EA | 0000 | 9960 | FFD1 | 0003 |
| 0001004160 | 0003 | 0102 | 0000 | 0000 | 0000 | 0010 | 0000 | 0000 |

THU MAR 14 17:37:32 1991 GSPMON.4 PAGE 281, LINE 16521

| | | | | | | | | |
|---|---|---|---|---|---|---|---|---|
| 0001004200 | 0000 | 0000 | 0000 | 0000 | 0000 | 5304 | 0000 | 6D90 |
| 0001004220 | FFD2 | 0003 | 000D | 0102 | 0000 | 0000 | 0000 | 0010 |
| 0001004240 | 0000 | 0000 | 0000 | 0000 | 0000 | 665F | 6572 | 0065 |
| 0001004260 | 0000 | 9370 | FFC6 | 0001 | 0000 | 0002 | 0000 | 0000 |
| 0001004300 | 530E | 0000 | AA50 | FFC6 | 0001 | 0000 | 0002 | 6D5F |
| 0001004320 | 5F62 | 6973 | 657A | 6D30 | FFD2 | 0003 | 000F | 0102 |
| 0001004340 | 0000 | 0000 | 0000 | 0020 | 0000 | 0000 | 0000 | 0000 |
| 0001004360 | 0000 | 705F | 6565 | 006B | 0000 | B070 | FFC6 | 0001 |
| 0001004400 | 0000 | 0002 | 615F | 7362 | 0000 | 0000 | 6C40 | FFC6 |
| 0001004420 | 0001 | 0000 | 0002 | 0000 | 0000 | 5318 | 000D | AA20 |
| 0001004440 | FFC6 | 0001 | 0000 | 0002 | 0000 | 0000 | 5324 | 0000 |
| 0001004460 | 8E10 | FFC9 | 0003 | 0008 | 0102 | 1064 | 0000 | 0000 |
| 0001004500 | 0040 | 0000 | 0000 | 0000 | 0000 | 0000 | 0000 | 0000 |
| 0001004520 | 532E | 0000 | 6C60 | FFD2 | 0003 | 0005 | 0102 | 0000 |
| 0001004540 | 0000 | 0000 | 0020 | 0000 | 0000 | 0000 | 0000 | 0000 |
| 0001004560 | 625F | 786F | 0000 | 0000 | B560 | FFC6 | 0001 | 0000 |
| 0001004600 | 0002 | 0000 | 0000 | 5341 | 0000 | B0B0 | FFC6 | 0001 |
| 0001004620 | 0000 | 0002 | 0000 | 0000 | 534C | 0000 | 6C40 | FFD2 |
| 0001004640 | 0003 | 0005 | 0102 | 0000 | 0000 | 0000 | 0020 | 0000 |
| 0001004660 | 0000 | 0000 | 0000 | 0000 | 6C5F | 7961 | 7265 | 0073 |
| 0001004700 | 6DB0 | FFD2 | 0003 | 000D | 0102 | 0000 | 0000 | 0000 |
| 0001004720 | 0010 | 0000 | 0000 | 0000 | 0000 | 0000 | 6D5F | 6D65 |
| 0001004740 | 6573 | 0074 | 9B60 | FFC6 | 0001 | 0000 | 0002 | 0000 |
| 0001004760 | 0000 | 535E | 0000 | ACA0 | FFC6 | 0001 | 0000 | 0002 |
| 0001005000 | 0000 | 0000 | 5369 | 0000 | 6CC0 | FFD2 | 0003 | 0005 |
| 0001005020 | 0102 | 0000 | 0000 | 0000 | 0020 | 0000 | 0000 | 0000 |
| 0001005040 | 0000 | 0000 | 0000 | 0000 | 5377 | 0000 | 9970 | FFD1 |
| 0001005060 | 0003 | 0008 | 0102 | 1B36 | 0000 | 0000 | 0240 | 0000 |
| 0001005100 | 0000 | 0000 | 0000 | 0000 | 0000 | 0000 | 538C | 0000 |
| 0001005120 | 9CE0 | FFD1 | 0003 | 0008 | 0102 | 1B48 | 0000 | 0000 |
| 0001005140 | 4080 | 0000 | 0000 | 0000 | 0000 | 0000 | 0000 | 0000 |
| 0001005160 | 539F | 0000 | 9910 | FFD1 | 0003 | 0003 | 0102 | 0000 |
| 0001005200 | 0000 | 0000 | 0010 | 0000 | 0000 | 0000 | 0000 | 0000 |
| 0001005220 | 0000 | 0000 | 53AA | 0000 | 9920 | FFD1 | 0003 | 0003 |
| 0001005240 | 0102 | 0000 | 0000 | 0000 | 0010 | 0000 | 0000 | 0000 |
| 0001005260 | 0000 | 0000 | 0000 | 0000 | 53B7 | 0000 | 9930 | FFD1 |
| 0001005300 | 0003 | 0003 | 0102 | 0000 | 0000 | 0000 | 0010 | 0000 |
| 0001005320 | 0000 | 0000 | 0000 | 0000 | 0000 | 0000 | 53C4 | 0000 |
| 0001005340 | 9940 | FFD1 | 0003 | 0003 | 0102 | 0000 | 0000 | 0000 |
| 0001005360 | 0010 | 0000 | 0000 | 0000 | 0000 | 0000 | 0000 | 0000 |
| 0001005400 | 53CF | 0000 | 9950 | FFD1 | 0003 | 0003 | 0102 | 0000 |
| 0001005420 | 0000 | 0000 | 0010 | 0000 | 0000 | 0000 | 0000 | 0000 |
| 0001005440 | 0000 | 0000 | 53DD | 0000 | 9BB0 | FFD1 | 0003 | 0008 |
| 0001005460 | 0102 | 1B5C | 0000 | 0000 | 0130 | 0000 | 0000 | 0000 |
| 0001005500 | 0000 | 0000 | 0000 | 0000 | 53F5 | 0000 | 6CA0 | FFD2 |
| 0001005520 | 0003 | 0005 | 0102 | 0000 | 0000 | 0000 | 0020 | 0000 |
| 0001005540 | 0000 | 0000 | 0000 | 0000 | 0000 | 0000 | 5404 | 0000 |
| 0001005560 | 6BC0 | FFD2 | 0003 | 000F | 0102 | 0000 | 0000 | 0000 |
| 0001005600 | 0020 | 0000 | 0000 | 0000 | 0000 | 0000 | 0000 | 0000 |
| 0001005620 | 541C | 0000 | 6BA0 | FFD2 | 0003 | 000F | 0102 | 0000 |
| 0001005640 | 0000 | 0000 | 0020 | 0000 | 0000 | 0000 | 0000 | 0000 |
| 0001005660 | 0000 | 0000 | 542D | 0000 | 6DA0 | FFD2 | 0003 | 000D |
| 0001005700 | 0102 | 0000 | 0000 | 0000 | 0010 | 0000 | 0000 | 0000 |
| 0001005720 | 0000 | 0000 | 0000 | 0000 | 5437 | 0000 | 6CF0 | FFD2 |
| 0001005740 | 0003 | 000D | 0102 | 0000 | 0000 | 0000 | 0010 | 0000 |
| 0001005760 | 0000 | 0000 | 0000 | 0000 | 0000 | 0000 | 544B | 0000 |
| 0001006000 | 6CE0 | FFD2 | 0003 | 000D | 0102 | 0000 | 0000 | 0000 |
| 0001006020 | 0010 | 0000 | 0000 | 0000 | 0000 | 0000 | 0000 | 0000 |
| 0001006040 | 5456 | 0000 | 6D00 | FFD2 | 0003 | 000D | 0102 | 0000 |

THU MAR 14 17:37:32 1991 GSPMON.4 PAGE 282, LINE 16580

| | | | | | | | | |
|---|---|---|---|---|---|---|---|---|
| 0001006060 | 0000 | 0000 | 0010 | 0000 | 0000 | 0000 | 0000 | 0000 |
| 0001006100 | 0000 | 0000 | 546A | 0000 | 6DC0 | FFD2 | 0003 | 000A |
| 0001006120 | 0102 | 23CC | 0000 | 0000 | 0001 | 0000 | 0000 | 0000 |
| 0001006140 | 0000 | 0000 | 0000 | 0000 | 5476 | 0000 | 6A20 | FFD2 |
| 0001006160 | 0003 | 000F | 0102 | 0000 | 0000 | 0000 | 0020 | 0000 |
| 0001006200 | 0000 | 0000 | 0000 | 0000 | 0000 | 0000 | 5485 | 0000 |
| 0001006220 | 6A40 | FFD2 | 0003 | 000F | 0102 | 0000 | 0000 | 0000 |
| 0001006240 | 0020 | 0000 | 0000 | 0000 | 0000 | 0000 | 0000 | 0000 |
| 0001006260 | 5499 | 0000 | 6AC0 | FFD2 | 0003 | 000A | 0102 | 1EF8 |
| 0001006300 | 0000 | 0000 | 0001 | 0000 | 0000 | 0000 | 0000 | 0000 |
| 0001006320 | 0000 | 0000 | 54A4 | 0000 | 6AD0 | FFD2 | 0003 | 000A |
| 0001006340 | 0102 | 1EF8 | 0000 | 0000 | 0001 | 0000 | 0000 | 0000 |
| 0001006360 | 0000 | 0000 | 665F | 735F | 6E79 | 0063 | 6AE0 | FFD2 |
| 0001006400 | 0003 | 000A | 0102 | 1EF8 | 0000 | 0000 | 0001 | 0000 |
| 0001006420 | 0000 | 0000 | 0000 | 0000 | 0000 | 0000 | 54B1 | 0000 |
| 0001006440 | 6D10 | FFD2 | 0003 | 001F | 0102 | 0000 | 0000 | 0000 |
| 0001006460 | 0020 | 0000 | 0000 | 0000 | 0000 | 0000 | 0000 | 0000 |
| 0001006500 | 54C2 | 0000 | 6B40 | FFD2 | 0003 | 000A | 0102 | 2166 |
| 0001006520 | 0000 | 0000 | 0001 | 0000 | 0000 | 0000 | 0000 | 0000 |
| 0001006540 | 0000 | 0000 | 54D1 | 0000 | 6C20 | FFD2 | 0003 | 0005 |
| 0001006560 | 0102 | 0000 | 0000 | 0000 | 0020 | 0000 | 0000 | 0000 |
| 0001006600 | 0000 | 0000 | 0000 | 0000 | 54E0 | 0000 | 6C80 | FFD2 |
| 0001006620 | 0003 | 0005 | 0102 | 0000 | 0000 | 0000 | 0020 | 0000 |
| 0001006640 | 0000 | 0000 | 0000 | 0000 | 0000 | 0000 | 54F4 | 0000 |
| 0001006660 | 6D50 | FFD2 | 0003 | 000D | 0102 | 0000 | 0000 | 0000 |
| 0001006700 | 0010 | 0000 | 0000 | 0000 | 0000 | 0000 | 0000 | 0000 |
| 0001006720 | 54FF | 0000 | 6B30 | FFC6 | 0001 | 0000 | 0002 | 6C5F |
| 0001006740 | 6261 | 0073 | 0000 | 6D30 | FFC6 | 0001 | 0000 | 0002 |
| 0001006760 | 0000 | 0000 | 550A | 0000 | 7010 | FFC6 | 0001 | 0000 |
| 0001007000 | 0002 | 6963 | 696E | 0074 | 0000 | B960 | FFC6 | 0002 |
| 0001007020 | 0000 | 0002 | 655F | 6978 | 0074 | 0000 | 7170 | FFC6 |
| 0001007040 | 0001 | 0000 | 0002 | 615F | 6F62 | 7472 | 0000 | 7480 |
| 0001007060 | FFC6 | 0001 | 0000 | 0002 | 615F | 6574 | 6978 | 0074 |
| 0001007100 | 7290 | FFC6 | 0001 | 0000 | 0002 | 6D5F | 6D65 | 6F6D |
| 0001007120 | 6576 | 7860 | FFC6 | 0001 | 0000 | 0002 | 6D5F | 766F |
| 0001007140 | 656D | 006D | 7510 | FFC6 | 0001 | 0000 | 0002 | 725F |
| 0001007160 | 6165 | 6C6C | 636F | 8890 | FFC6 | 0001 | 0000 | 0002 |
| 0001007200 | 635F | 6C61 | 6F6C | 0063 | 8630 | FFC6 | 0001 | 0000 |
| 0001007220 | 0002 | 735F | 7465 | 6D6A | 0070 | A880 | FFC6 | 0001 |
| 0001007240 | 0000 | 0002 | 742E | 7865 | 0074 | 0000 | 2000 | FFC0 |
| 0001007260 | 0001 | 0000 | 0002 | 7465 | 7865 | 0074 | 0000 | B950 |
| 0001007300 | FFC6 | 0001 | 0000 | 0002 | 642E | 7461 | 0061 | 0000 |
| 0001007320 | 0000 | 0000 | 0004 | 0000 | 0002 | 6465 | 7461 | 0061 |
| 0001007340 | 0000 | 0000 | 0000 | 0004 | 0000 | 0002 | 622E | 7373 |
| 0001007360 | 0000 | 0000 | D3A0 | FFC6 | 0003 | 0000 | 0002 | 6E65 |
| 0001007400 | 0064 | 0000 | 0000 | 6C90 | FFF3 | 0003 | 0000 | 0002 |
| 0001007420 | 5514 | 0000 | 6D5F | 6773 | 635F | 646F | 0065 | 455F |
| 0001007440 | 4358 | 5045 | 4954 | 4E4F | 5F00 | 554F | 5F54 | 4553 |
| 0001007460 | 5652 | 4349 | 0045 | 525F | 5345 | 5245 | 4556 | 0031 |
| 0001007500 | 455F | 444E | 415F | 5050 | 494C | 0043 | 415F | 5050 |
| 0001007520 | 494C | 5F43 | 534D | 0047 | 455F | 444E | 435F | 4D4F |
| 0001007540 | 414D | 444E | 5F00 | 6572 | 5F74 | 6176 | 756C | 0065 |
| 0001007560 | 495F | 4C44 | 5F45 | 4F4D | 4544 | 5F00 | 4F43 | 5F4D |
| 0001007600 | 4F4D | 4544 | 5F00 | 5041 | 4C50 | 4D5F | 444F | 0045 |
| 0001007620 | 455F | 4358 | 5045 | 4D5F | 444F | 0045 | 615F | 756C |
| 0001007640 | 6D5F | 646F | 0065 | 6D5F | 6D65 | 705F | 616C | 656E |
| 0001007660 | 5F00 | 6964 | 7073 | 615F | 6C6C | 5F00 | 4446 | 4342 |
| 0001007700 | 5F4B | 4944 | 0053 | 465F | 4244 | 4B43 | 455F | 004E |
| 0001007720 | 455F | 464E | 524F | 4543 | 305F | 0042 | 4E5F | 524F |

THU MAR 14 17:37:32 1991 GSPMON.4 PAGE 283, LINE 16639

| | | | | | | | | |
|---|---|---|---|---|---|---|---|---|
| 0001007740 | 414D | 5F4C | 0042 | 455F | 464E | 524F | 4543 | 305F |
| 0001007760 | 0041 | 4E5F | 524F | 414D | 5F4C | 0041 | 6D5F | 7875 |
| 0001010000 | 705F | 726F | 0074 | 565F | 4449 | 505F | 524F | 0054 |
| 0001010020 | 4D5F | 3242 | 505F | 524F | 0054 | 4D5F | 3142 | 505F |
| 0001010040 | 524F | 0054 | 4D5F | 3042 | 505F | 524F | 0054 | 6D5F |
| 0001010060 | 7361 | 5F6B | 6F70 | 616C | 0072 | 505F | 4C4F | 495F |
| 0001010100 | 564E | 5245 | 4553 | 5F00 | 4F50 | 5F4C | 4F4E | 4D52 |
| 0001010120 | 4C41 | 5F00 | 616D | 6B73 | 655F | 616E | 6C62 | 0065 |
| 0001010140 | 4D5F | 5341 | 5F4B | 4944 | 0053 | 735F | 6472 | 765F |
| 0001010160 | 6C61 | 6575 | 5F00 | 4956 | 4544 | 5F4F | 4E49 | 5F00 |
| 0001010200 | 4956 | 4544 | 5F4F | 554F | 0054 | 735F | 6572 | 765F |
| 0001010220 | 6C61 | 6575 | 5F00 | 4956 | 4544 | 5F4F | 4944 | 0053 |
| 0001010240 | 565F | 4449 | 4F45 | 455F | 004E | 4D5F | 5F42 | 4E49 |
| 0001010260 | 5754 | 0052 | 6D5F | 3462 | 665F | 6E75 | 0063 | 4D5F |
| 0001010300 | 3442 | 445F | 4649 | 5746 | 0052 | 4D5F | 3442 | 455F |
| 0001010320 | 5252 | 5257 | 5F00 | 626D | 5F35 | 7566 | 636E | 5F00 |
| 0001010340 | 7267 | 6261 | 5F32 | 6F6D | 6564 | 5F00 | 5247 | 4241 |
| 0001010360 | 5F32 | 464F | 0046 | 475F | 4152 | 3242 | 4F5F | 004E |
| 0001010400 | 635F | 6B68 | 736D | 5F6B | 6E65 | 6261 | 5F00 | 4843 |
| 0001010420 | 5F4B | 534D | 5F4B | 4E45 | 5F00 | 4843 | 5F4B | 534D |
| 0001010440 | 5F4B | 4944 | 0053 | 6D5F | 6D65 | 625F | 6E61 | 006B |
| 0001010460 | 475F | 4552 | 4E45 | 435F | 0048 | 4F5F | 4556 | 4C52 |
| 0001010500 | 5941 | 435F | 0048 | 705F | 6572 | 6D5F | 646F | 0065 |
| 0001010520 | 535F | 4C45 | 4345 | 4554 | 0044 | 615F | 756C | 6D5F |
| 0001010540 | 646F | 0065 | 6D5F | 6E6F | 695F | 736E | 6174 | 6C6C |
| 0001010560 | 695F | 746E | 7072 | 7374 | 5F00 | 6F6D | 5F6E | 6170 |
| 0001010600 | 7372 | 0065 | 705F | 7261 | 6D61 | 705F | 7274 | 5F00 |
| 0001010620 | 6F6D | 5F6E | 6E65 | 5F64 | 7061 | 6C70 | 6369 | 5F00 |
| 0001010640 | 6361 | 5F74 | 6F63 | 6564 | 5F00 | 736D | 5F67 | 6F63 |
| 0001010660 | 6564 | 5F00 | 5845 | 4543 | 5450 | 4F49 | 004E | 4F5F |
| 0001010700 | 5455 | 535F | 5245 | 4956 | 4543 | 5F00 | 4552 | 4553 |
| 0001010720 | 5652 | 3145 | 5F00 | 4E45 | 5F44 | 5041 | 4C50 | 4349 |
| 0001010740 | 5F00 | 5041 | 4C50 | 4349 | 4D5F | 4753 | 5F00 | 4E45 |
| 0001010760 | 5F44 | 4F43 | 4D4D | 4E41 | 0044 | 725F | 7465 | 765F |
| 0001011000 | 6C61 | 6575 | 5F00 | 4449 | 454C | 4D5F | 444F | 0045 |
| 0001011020 | 435F | 4D4F | 4D5F | 444F | 0045 | 415F | 5050 | 5F4C |
| 0001011040 | 4F4D | 4544 | 5F00 | 5845 | 4543 | 5F50 | 4F4D | 4544 |
| 0001011060 | 5F00 | 7973 | 5F73 | 6E69 | 7473 | 6C61 | 5F6C | 6E69 |
| 0001011100 | 0074 | 695F | 746E | 665F | 6E75 | 0063 | 665F | 6E75 |
| 0001011120 | 5F63 | 7470 | 0072 | 735F | 7379 | 655F | 616E | 6C62 |
| 0001011140 | 5F65 | 6E69 | 0074 | 695F | 746E | 6D5F | 7361 | 006B |
| 0001011160 | 735F | 7379 | 645F | 7369 | 6261 | 656C | 695F | 746E |
| 0001011200 | 5F00 | 6E69 | 5F74 | 616D | 6B73 | 5F00 | 7973 | 5F73 |
| 0001011220 | 6572 | 5F74 | 7865 | 6563 | 7470 | 6F69 | 006E | 655F |
| 0001011240 | 7272 | 726F | 6E5F | 6D75 | 5F00 | 7973 | 5F73 | 6F68 |
| 0001011260 | 7473 | 615F | 7070 | 696C | 5F63 | 736D | 0067 | 725F |
| 0001011300 | 7465 | 735F | 6174 | 7574 | 0073 | 705F | 7261 | 6D61 |
| 0001011320 | 5F73 | 7470 | 0072 | 705F | 7261 | 6D61 | 5F73 | 6973 |
| 0001011340 | 657A | 5F00 | 6F6D | 5F6E | 6E69 | 7469 | 665F | 6E75 |
| 0001011360 | 5F63 | 6174 | 6C62 | 0065 | 615F | 756C | 6D5F | 646F |
| 0001011400 | 0065 | 615F | 756C | 6D5F | 646F | 0065 | 6D5F | 6D65 |
| 0001011420 | 705F | 616C | 656E | 5F00 | 6964 | 7073 | 615F | 6C6C |
| 0001011440 | 5F00 | 4446 | 4342 | 5F4B | 4944 | 0053 | 465F | 4244 |
| 0001011460 | 4B43 | 455F | 004E | 455F | 464E | 524F | 4543 | 305F |
| 0001011500 | 0042 | 4E5F | 524F | 414D | 5F4C | 0042 | 455F | 464E |
| 0001011520 | 524F | 4543 | 305F | 0041 | 4E5F | 524F | 414D | 5F4C |
| 0001011540 | 0041 | 6D5F | 7875 | 705F | 726F | 0074 | 565F | 4449 |
| 0001011560 | 505F | 524F | 0054 | 4D5F | 3242 | 505F | 524F | 0054 |
| 0001011600 | 4D5F | 3142 | 505F | 524F | 0054 | 4D5F | 3042 | 505F |

THU MAR 14 17:37:32 1991 GSPMON.4 PAGE 284, LINE 16698

| | | | | | | | | |
|---|---|---|---|---|---|---|---|---|
| 0001011620 | 524F | 0054 | 6D5F | 7361 | 5F6B | 6F70 | 616C | 0072 |
| 0001011640 | 505F | 4C4F | 495F | 564E | 5245 | 4553 | 5F00 | 4F50 |
| 0001011660 | 5F4C | 4F4E | 4D52 | 4C41 | 5F00 | 616D | 6B73 | 655F |
| 0001011700 | 616E | 6C62 | 0065 | 4D5F | 5341 | 5F4B | 4944 | 0053 |
| 0001011720 | 735F | 6472 | 765F | 6C61 | 6575 | 5F00 | 4956 | 4544 |
| 0001011740 | 5F4F | 4E49 | 5F00 | 4956 | 4544 | 5F4F | 554F | 0054 |
| 0001011760 | 735F | 6572 | 765F | 6C61 | 6575 | 5F00 | 4956 | 4544 |
| 0001012000 | 5F4F | 4944 | 0053 | 565F | 4449 | 4F45 | 455F | 004E |
| 0001012020 | 4D5F | 5F42 | 4E49 | 5754 | 0052 | 6D5F | 3462 | 665F |
| 0001012040 | 6E75 | 0063 | 4D5F | 3442 | 445F | 4649 | 5746 | 0052 |
| 0001012060 | 4D5F | 3442 | 455F | 5252 | 5257 | 5F00 | 626D | 5F35 |
| 0001012100 | 7566 | 636E | 5F00 | 7267 | 6261 | 5F32 | 6F6D | 6564 |
| 0001012120 | 5F00 | 5247 | 4241 | 5F32 | 464F | 0046 | 475F | 4152 |
| 0001012140 | 3242 | 4F5F | 004E | 635F | 6B68 | 736D | 5F6B | 6E65 |
| 0001012160 | 6261 | 5F00 | 4843 | 5F4B | 534D | 5F4B | 4E45 | 5F00 |
| 0001012200 | 4843 | 5F4B | 534D | 5F4B | 4944 | 0053 | 6D5F | 6D65 |
| 0001012220 | 625F | 6E61 | 006B | 475F | 4552 | 4E45 | 435F | 0048 |
| 0001012240 | 4F5F | 4556 | 4C52 | 5941 | 435F | 0048 | 705F | 6572 |
| 0001012260 | 6D5F | 646F | 0065 | 535F | 4C45 | 4345 | 4554 | 0044 |
| 0001012300 | 675F | 7073 | 745F | 6D69 | 7265 | 5F00 | 7768 | 645F |
| 0001012320 | 7065 | 6874 | 5F00 | 6373 | 775F | 6469 | 6874 | 5F00 |
| 0001012340 | 6373 | 685F | 6965 | 6867 | 0074 | 735F | 5F63 | 6564 |
| 0001012360 | 7470 | 0068 | 745F | 6D69 | 6F65 | 7475 | 765F | 6C61 |
| 0001012400 | 5F00 | 7973 | 636E | 745F | 6D69 | 6F65 | 7475 | 765F |
| 0001012420 | 6C61 | 5F00 | 7473 | 6261 | 6C69 | 7469 | 5F79 | 6176 |
| 0001012440 | 006C | 765F | 7265 | 6669 | 5F79 | 7473 | 6261 | 6C69 |
| 0001012460 | 7469 | 5F79 | 6176 | 006C | 745F | 7268 | 7365 | 6F68 |
| 0001012500 | 646C | 5F00 | 6C62 | 6E69 | 696B | 676E | 745F | 7268 |
| 0001012520 | 7365 | 6F68 | 646C | 5F00 | 7265 | 5F72 | 6C65 | 6D65 |
| 0001012540 | 745F | 7268 | 7365 | 6F68 | 646C | 5F00 | 6F61 | 5F69 |
| 0001012560 | 6F78 | 5F72 | 6563 | 6F6C | 0072 | 695F | 746E | 7265 |
| 0001012600 | 616C | 6563 | 0064 | 6D5F | 6773 | 735F | 7A69 | 0065 |
| 0001012620 | 6C5F | 7961 | 7265 | 6E5F | 6D75 | 5F00 | 6C65 | 6D65 |
| 0001012640 | 635F | 756F | 746E | 5F00 | 6F68 | 6972 | 5F7A | 6170 |
| 0001012660 | 6172 | 006D | 735F | 7274 | 7069 | 645F | 7461 | 0061 |
| 0001012700 | 685F | 726F | 7A69 | 705F | 7261 | 6D61 | 5F00 | 6576 |
| 0001012720 | 7472 | 705F | 7261 | 6D61 | 5F00 | 6973 | 5F67 | 6164 |
| 0001012740 | 6174 | 5F00 | 6F68 | 6972 | 5F7A | 6170 | 6172 | 006D |
| 0001012760 | 765F | 7265 | 5F74 | 6170 | 6172 | 006D | 735F | 6769 |
| 0001013000 | 645F | 7461 | 0061 | 765F | 7265 | 6669 | 5F79 | 6373 |
| 0001013020 | 6572 | 6E65 | 705F | 6572 | 6573 | 636E | 0065 | 735F |
| 0001013040 | 7263 | 6565 | 5F6E | 7473 | 6261 | 6C69 | 7469 | 0079 |
| 0001013060 | 6C5F | 7961 | 7265 | 6E5F | 6D75 | 5F00 | 6964 | 6666 |
| 0001013100 | 705F | 7274 | 5F00 | 6170 | 6172 | 656D | 6574 | 5F72 |
| 0001013120 | 6F63 | 6564 | 5F00 | 6170 | 6172 | 656D | 6574 | 5F72 |
| 0001013140 | 6176 | 006C | 6D5F | 7361 | 5F6B | 6962 | 0074 | 665F |
| 0001013160 | 6C69 | 6574 | 5F72 | 756E | 006D | 685F | 5F77 | 6C70 |
| 0001013200 | 6E61 | 0065 | 635F | 6D6F | 6170 | 6572 | 735F | 6174 |
| 0001013220 | 6574 | 665F | 676C | 5F00 | 6863 | 6E61 | 6567 | 735F |
| 0001013240 | 6174 | 6574 | 665F | 676C | 5F00 | 7266 | 6D61 | 5F65 |
| 0001013260 | 6F63 | 6E75 | 0074 | 735F | 6174 | 6C62 | 5F65 | 6F63 |
| 0001013300 | 6E75 | 0074 | 695F | 696E | 5F74 | 6F63 | 746E | 6F72 |
| 0001013320 | 5F6C | 6572 | 7367 | 5F00 | 7973 | 5F73 | 6572 | 6573 |
| 0001013340 | 5F74 | 7265 | 5F72 | 6E61 | 5F64 | 6C61 | 0075 | 735F |
| 0001013360 | 7379 | 735F | 7465 | 6D5F | 7361 | 006B | 735F | 7379 |
| 0001013400 | 735F | 7465 | 635F | 6E68 | 5F6C | 6F6D | 6564 | 5F00 |
| 0001013420 | 7973 | 5F73 | 6573 | 5F74 | 776B | 635F | 6E6F | 6966 |
| 0001013440 | 0067 | 735F | 7465 | 6D5F | 7261 | 006B | 635F | 656C |
| 0001013460 | 7261 | 6D5F | 7261 | 006B | 735F | 7379 | 735F | 7465 |

THU MAR 14 17:37:32 1991 GSPMON.4 PAGE 285, LINE 16757

| | | | | | | | | |
|---|---|---|---|---|---|---|---|---|
| 0001013500 | 655F | 7272 | 635F | 746E | 0072 | 615F | 756C | 6D5F |
| 0001013520 | 646F | 0065 | 6D5F | 6E6F | 695F | 696E | 5F74 | 6976 |
| 0001013540 | 6564 | 006F | 6D5F | 6E6F | 695F | 696E | 5F74 | 6572 |
| 0001013560 | 0067 | 615F | 756C | 6D5F | 646F | 0065 | 615F | 756C |
| 0001013600 | 6D5F | 646F | 0065 | 6D5F | 6D65 | 705F | 616C | 656E |
| 0001013620 | 5F00 | 6964 | 7073 | 615F | 6C6C | 5F00 | 4446 | 4342 |
| 0001013640 | 5F4B | 4944 | 0053 | 465F | 4244 | 4B43 | 455F | 004E |
| 0001013660 | 455F | 464E | 524F | 4543 | 305F | 0042 | 4E5F | 524F |
| 0001013700 | 414D | 5F4C | 0042 | 455F | 464E | 524F | 4543 | 305F |
| 0001013720 | 0041 | 4E5F | 524F | 414D | 5F4C | 0041 | 6D5F | 7875 |
| 0001013740 | 705F | 726F | 0074 | 565F | 4449 | 505F | 524F | 0054 |
| 0001013760 | 4D5F | 3242 | 505F | 524F | 0054 | 4D5F | 3142 | 505F |
| 0001014000 | 524F | 0054 | 4D5F | 3042 | 505F | 524F | 0054 | 6D5F |
| 0001014020 | 7361 | 5F6B | 6F70 | 616C | 0072 | 505F | 4C4F | 495F |
| 0001014040 | 564E | 5245 | 4553 | 5F00 | 4F50 | 5F4C | 4F4E | 4D52 |
| 0001014060 | 4C41 | 5F00 | 616D | 6B73 | 655F | 616E | 6C62 | 0065 |
| 0001014100 | 4D5F | 5341 | 5F4B | 4944 | 0053 | 735F | 6472 | 765F |
| 0001014120 | 6C61 | 6575 | 5F00 | 4956 | 4544 | 5F4F | 4E49 | 5F00 |
| 0001014140 | 4956 | 4544 | 5F4F | 554F | 0054 | 735F | 6572 | 765F |
| 0001014160 | 6C61 | 6575 | 5F00 | 4956 | 4544 | 5F4F | 4944 | 0053 |
| 0001014200 | 565F | 4449 | 4F45 | 455F | 004E | 4D5F | 5F42 | 4E49 |
| 0001014220 | 5754 | 0052 | 6D5F | 3462 | 665F | 6E75 | 0063 | 4D5F |
| 0001014240 | 3442 | 445F | 4649 | 5746 | 0052 | 4D5F | 3442 | 455F |
| 0001014260 | 5252 | 5257 | 5F00 | 626D | 5F35 | 7566 | 636E | 5F00 |
| 0001014300 | 7267 | 6261 | 5F32 | 6F6D | 6564 | 5F00 | 5247 | 4241 |
| 0001014320 | 5F32 | 464F | 0046 | 475F | 4152 | 3242 | 4F5F | 004E |
| 0001014340 | 635F | 6B68 | 736D | 5F6B | 6E65 | 6261 | 5F00 | 4843 |
| 0001014360 | 5F4B | 534D | 5F4B | 4E45 | 5F00 | 4843 | 5F4B | 534D |
| 0001014400 | 5F4B | 4944 | 0053 | 6D5F | 6D65 | 625F | 6E61 | 006B |
| 0001014420 | 475F | 4552 | 4E45 | 435F | 0048 | 4F5F | 4556 | 4C52 |
| 0001014440 | 5941 | 435F | 0048 | 705F | 6572 | 6D5F | 646F | 0065 |
| 0001014460 | 535F | 4C45 | 4345 | 4554 | 0044 | 6D5F | 6E6F | 695F |
| 0001014500 | 696E | 5F74 | 7768 | 635F | 6E6F | 6966 | 5F67 | 6274 |
| 0001014520 | 006C | 615F | 756C | 6D5F | 646F | 0065 | 6D5F | 6D65 |
| 0001014540 | 705F | 616C | 656E | 5F00 | 6964 | 7073 | 615F | 6C6C |
| 0001014560 | 5F00 | 4446 | 4342 | 5F4B | 4944 | 0053 | 465F | 4244 |
| 0001014600 | 4B43 | 455F | 004E | 455F | 464E | 524F | 4543 | 305F |
| 0001014620 | 0042 | 4E5F | 524F | 414D | 5F4C | 0042 | 455F | 464E |
| 0001014640 | 524F | 4543 | 305F | 0041 | 4E5F | 524F | 414D | 5F4C |
| 0001014660 | 0041 | 6D5F | 7875 | 705F | 726F | 0074 | 565F | 4449 |
| 0001014700 | 505F | 524F | 0054 | 4D5F | 3242 | 505F | 524F | 0054 |
| 0001014720 | 4D5F | 3142 | 505F | 524F | 0054 | 4D5F | 3042 | 505F |
| 0001014740 | 524F | 0054 | 6D5F | 7361 | 5F6B | 6F70 | 616C | 0072 |
| 0001014760 | 505F | 4C4F | 495F | 564E | 5245 | 4553 | 5F00 | 4F50 |
| 0001015000 | 5F4C | 4F4E | 4D52 | 4C41 | 5F00 | 616D | 6B73 | 655F |
| 0001015020 | 616E | 6C62 | 0065 | 4D5F | 5341 | 5F4B | 4944 | 0053 |
| 0001015040 | 735F | 6472 | 765F | 6C61 | 6575 | 5F00 | 4956 | 4544 |
| 0001015060 | 5F4F | 4E49 | 5F00 | 4956 | 4544 | 5F4F | 554F | 0054 |
| 0001015100 | 735F | 6572 | 765F | 6C61 | 6575 | 5F00 | 4956 | 4544 |
| 0001015120 | 5F4F | 4944 | 0053 | 565F | 4449 | 4F45 | 455F | 004E |
| 0001015140 | 4D5F | 5F42 | 4E49 | 5754 | 0052 | 6D5F | 3462 | 665F |
| 0001015160 | 6E75 | 0063 | 4D5F | 3442 | 445F | 4649 | 5746 | 0052 |
| 0001015200 | 4D5F | 3442 | 455F | 5252 | 5257 | 5F00 | 626D | 5F35 |
| 0001015220 | 7566 | 636E | 5F00 | 7267 | 6261 | 5F32 | 6F6D | 6564 |
| 0001015240 | 5F00 | 5247 | 4241 | 5F32 | 464F | 0046 | 475F | 4152 |
| 0001015260 | 3242 | 4F5F | 004E | 635F | 6B68 | 736D | 5F6B | 6E65 |
| 0001015300 | 6261 | 5F00 | 4843 | 5F4B | 534D | 5F4B | 4E45 | 5F00 |
| 0001015320 | 4843 | 5F4B | 534D | 5F4B | 4944 | 0053 | 6D5F | 6D65 |
| 0001015340 | 625F | 6E61 | 006B | 475F | 4552 | 4E45 | 435F | 0048 |

THU MAR 14 17:37:32 1991 GSPMON.4 PAGE 286, LINE 16816

| | | | | | | | | |
|---|---|---|---|---|---|---|---|---|
| 0001015360 | 4F5F | 4556 | 4C52 | 5941 | 435F | 0048 | 705F | 6572 |
| 0001015400 | 6D5F | 646F | 0065 | 535F | 4C45 | 4345 | 4554 | 0044 |
| 0001015420 | 675F | 7073 | 745F | 6D69 | 7265 | 5F00 | 7768 | 645F |
| 0001015440 | 7065 | 6874 | 5F00 | 6373 | 775F | 6469 | 6874 | 5F00 |
| 0001015460 | 6373 | 685F | 6965 | 6867 | 0074 | 735F | 5F63 | 6564 |
| 0001015500 | 7470 | 0068 | 745F | 6D69 | 6F65 | 7475 | 765F | 6C61 |
| 0001015520 | 5F00 | 7973 | 636E | 745F | 6D69 | 6F65 | 7475 | 765F |
| 0001015540 | 6C61 | 5F00 | 7473 | 6261 | 6C69 | 7469 | 5F79 | 6176 |
| 0001015560 | 006C | 765F | 7265 | 6669 | 5F79 | 7473 | 6261 | 6C69 |
| 0001015600 | 7469 | 5F79 | 6176 | 006C | 745F | 7268 | 7365 | 6F68 |
| 0001015620 | 646C | 5F00 | 6C62 | 6E69 | 696B | 676E | 745F | 7268 |
| 0001015640 | 7365 | 6F68 | 646C | 5F00 | 7265 | 5F72 | 6C65 | 6D65 |
| 0001015660 | 745F | 7268 | 7365 | 6F68 | 646C | 5F00 | 6F61 | 5F69 |
| 0001015700 | 6F78 | 5F72 | 6F63 | 6F6C | 0072 | 695F | 746E | 7265 |
| 0001015720 | 616C | 6563 | 0064 | 6D5F | 6773 | 735F | 7A69 | 0065 |
| 0001015740 | 6C5F | 7961 | 7265 | 6E5F | 6D75 | 5F00 | 6C65 | 6D65 |
| 0001015760 | 635F | 756F | 746E | 5F00 | 6F68 | 6972 | 5F7A | 6170 |
| 0001016000 | 6172 | 006D | 735F | 7274 | 7069 | 645F | 7461 | 0061 |
| 0001016020 | 685F | 726F | 7A69 | 705F | 7261 | 6D61 | 5F00 | 6576 |
| 0001016040 | 7472 | 705F | 7261 | 6D61 | 5F00 | 6973 | 5F67 | 6164 |
| 0001016060 | 6174 | 5F00 | 6F68 | 6972 | 5F7A | 6170 | 6172 | 006D |
| 0001016100 | 765F | 7265 | 5F74 | 6170 | 6172 | 006D | 735F | 6769 |
| 0001016120 | 645F | 7461 | 0061 | 765F | 7265 | 6669 | 5F79 | 6373 |
| 0001016140 | 6572 | 6E65 | 705F | 6572 | 6573 | 636E | 0065 | 735F |
| 0001016160 | 7263 | 6565 | 5F6E | 7473 | 6261 | 6C69 | 7469 | 0079 |
| 0001016200 | 6C5F | 7961 | 7265 | 6E5F | 6D75 | 5F00 | 6964 | 6666 |
| 0001016220 | 705F | 7274 | 5F00 | 6170 | 6172 | 656D | 6574 | 5F72 |
| 0001016240 | 6F63 | 6564 | 5F00 | 6170 | 6172 | 656D | 6574 | 5F72 |
| 0001016260 | 6176 | 006C | 6D5F | 7361 | 5F6B | 6962 | 0074 | 665F |
| 0001016300 | 6C69 | 6574 | 5F72 | 756E | 006D | 685F | 5F77 | 6C70 |
| 0001016320 | 6E61 | 0065 | 635F | 6D6F | 6170 | 6572 | 735F | 6174 |
| 0001016340 | 6574 | 665F | 676C | 5F00 | 6863 | 6E61 | 6567 | 735F |
| 0001016360 | 6174 | 6574 | 665F | 676C | 5F00 | 7266 | 6D61 | 5F65 |
| 0001016400 | 6F63 | 6E75 | 0074 | 735F | 6174 | 6C62 | 5F65 | 6F63 |
| 0001016420 | 6E75 | 0074 | 635F | 6E6F | 7274 | 6C6F | 705F | 7274 |
| 0001016440 | 5F00 | 6F6D | 7375 | 5F65 | 7665 | 6E65 | 5F74 | 6573 |
| 0001016460 | 746E | 705F | 7274 | 5F00 | 6369 | 6E6F | 735F | 6165 |
| 0001016500 | 6372 | 5F68 | 7470 | 0072 | 695F | 6F63 | 5F6E | 7274 |
| 0001016520 | 6E61 | 5F73 | 7470 | 0072 | 735F | 7263 | 625F | 5F67 |
| 0001016540 | 6F63 | 6F6C | 7275 | 5F00 | 7068 | 635F | 6F72 | 7373 |
| 0001016560 | 635F | 6C6F | 756F | 0072 | 735F | 6174 | 7472 | 6C5F |
| 0001016600 | 6E69 | 0065 | 735F | 6F74 | 5F70 | 696C | 656E | 5F00 |
| 0001016620 | 7473 | 7261 | 5F74 | 6F63 | 006C | 735F | 6F74 | 5F70 |
| 0001016640 | 6F63 | 006C | 725F | 6365 | 5F74 | 756E | 006D | 725F |
| 0001016660 | 6365 | 5F74 | 7261 | 6172 | 0079 | 675F | 5F70 | 7473 |
| 0001016700 | 7572 | 7463 | 5F00 | 544D | 435F | 4D4F | 4150 | 4552 |
| 0001016720 | 495F | 494E | 0054 | 4D5F | 5F54 | 4F43 | 504D | 5241 |
| 0001016740 | 5F45 | 4F43 | 544E | 5F00 | 544D | 435F | 4D4F | 4150 |
| 0001016760 | 4552 | 5F00 | 544D | 505F | 4F52 | 4543 | 5353 | 5F00 |
| 0001017000 | 544D | 455F | 444E | 4F50 | 4E49 | 5F54 | 5453 | 4241 |
| 0001017020 | 004C | 445F | 5F4F | 4E45 | 5044 | 494F | 544E | 5F00 |
| 0001017040 | 4F44 | 545F | 4152 | 4B43 | 535F | 4145 | 4352 | 5F48 |
| 0001017060 | 494C | 5453 | 5F00 | 6F6D | 7375 | 5F65 | 7274 | 6361 |
| 0001017100 | 5F6B | 656E | 7478 | 735F | 6174 | 6574 | 5F00 | 6F6D |
| 0001017120 | 7375 | 5F65 | 7274 | 6361 | 5F6B | 7566 | 636E | 6974 |
| 0001017140 | 6E6F | 5F00 | 7067 | 635F | 6E6F | 7274 | 6C6F | 5F00 |
| 0001017160 | 6F6D | 7375 | 5F65 | 7665 | 6E65 | 5F74 | 6573 | 746E |
| 0001017200 | 5F00 | 7067 | 735F | 6165 | 6372 | 5F68 | 7261 | 6165 |
| 0001017220 | 5F00 | 6F6C | 6163 | 5F6C | 6874 | 6572 | 6873 | 6C6F |

THU MAR 14 17:37:32 1991 GSPMON.4 PAGE 287, LINE 16875

| | | | | | | | | |
|---|---|---|---|---|---|---|---|---|
| 0001017240 | 0064 | 645F | 756F | 6C62 | 5F65 | 7562 | 0066 | 735F |
| 0001017260 | 7274 | 7069 | 6E5F | 6D75 | 695F | 5F6E | 6373 | 6572 |
| 0001017300 | 6E65 | 5F00 | 6572 | 7463 | 6E5F | 6D75 | 695F | 5F6E |
| 0001017320 | 6373 | 6572 | 6E65 | 5F00 | 6573 | 7261 | 6863 | 725F |
| 0001017340 | 6365 | 5F74 | 6977 | 7464 | 0068 | 735F | 6165 | 6372 |
| 0001017360 | 5F68 | 6572 | 7463 | 685F | 6965 | 6867 | 0074 | 615F |
| 0001017400 | 7463 | 6175 | 5F6C | 6573 | 7261 | 6863 | 615F | 6572 |
| 0001017420 | 0061 | 665F | 6572 | 7A65 | 5F65 | 6573 | 7261 | 6863 |
| 0001017440 | 615F | 6572 | 0061 | 745F | 6172 | 6B63 | 725F | 6365 |
| 0001017460 | 5F74 | 616D | 7274 | 7869 | 5F00 | 6E65 | 7064 | 696F |
| 0001017500 | 746E | 725F | 6365 | 5F74 | 616D | 7274 | 7869 | 5F00 |
| 0001017520 | 6572 | 7463 | 6D5F | 7461 | 6972 | 5F78 | 7261 | 0072 |
| 0001017540 | 725F | 6365 | 5F74 | 616D | 7274 | 7869 | 6D5F | 7361 |
| 0001017560 | 006B | 725F | 6465 | 6375 | 6465 | 625F | 7469 | 616D |
| 0001017600 | 0070 | 725F | 6365 | 5F74 | 616D | 7274 | 7869 | 705F |
| 0001017620 | 7274 | 5F00 | 7263 | 6165 | 6574 | 6D5F | 7461 | 6972 |
| 0001017640 | 5F78 | 6E69 | 6564 | 0078 | 735F | 7274 | 7069 | 615F |
| 0001017660 | 7264 | 5F00 | 6572 | 7463 | 6E5F | 6D75 | 5F00 | 696D |
| 0001017700 | 5F6E | 6E69 | 6564 | 0078 | 6D5F | 6E69 | 725F | 6365 |
| 0001017720 | 0074 | 615F | 6464 | 6572 | 7373 | 615F | 7272 | 5F00 |
| 0001017740 | 6572 | 7463 | 6C5F | 7369 | 0074 | 665F | 6572 | 6873 |
| 0001017760 | 625F | 6E61 | 006B | 665F | 6F72 | 657A | 5F6E | 6162 |
| 0001020000 | 6B6E | 5F00 | 6573 | 5F74 | 7061 | 636C | 6D5F | 756F |
| 0001020020 | 6573 | 745F | 6172 | 6B63 | 5F00 | 6977 | 7464 | 5F68 |
| 0001020040 | 6E69 | 7263 | 6D65 | 6E65 | 0074 | 685F | 6965 | 6867 |
| 0001020060 | 5F74 | 6E69 | 7263 | 6D65 | 6E65 | 0074 | 6D5F | 756F |
| 0001020100 | 6573 | 745F | 6172 | 6B63 | 635F | 6972 | 6974 | 6163 |
| 0001020120 | 006C | 735F | 7475 | 745F | 6D69 | 6F65 | 7475 | 635F |
| 0001020140 | 756F | 746E | 7265 | 5F00 | 6E65 | 7064 | 696F | 746E |
| 0001020160 | 745F | 6D69 | 6F65 | 7475 | 5F00 | 6974 | 656D | 756F |
| 0001020200 | 5F74 | 6F63 | 736E | 0074 | 735F | 6274 | 5F6C | 6F63 |
| 0001020220 | 736E | 0074 | 615F | 7463 | 7669 | 5F65 | 6E65 | 7064 |
| 0001020240 | 696F | 746E | 5F00 | 6F6D | 7375 | 5F65 | 7274 | 6361 |
| 0001020260 | 5F6B | 6F6E | 6D72 | 6C61 | 5F00 | 6567 | 656E | 6172 |
| 0001020300 | 6574 | 735F | 6165 | 6372 | 5F68 | 696C | 7473 | 5F00 |
| 0001020320 | 6567 | 656E | 6172 | 6574 | 735F | 7274 | 7069 | 6C5F |
| 0001020340 | 7369 | 0074 | 6C5F | 7361 | 5F74 | 7473 | 6972 | 5F70 |
| 0001020360 | 6461 | 0072 | 665F | 7269 | 7473 | 735F | 7274 | 7069 |
| 0001020400 | 615F | 7264 | 5F00 | 6966 | 7372 | 5F74 | 7265 | 0072 |
| 0001020420 | 6C5F | 7361 | 5F74 | 7265 | 0072 | 745F | 6D65 | 5F70 |
| 0001020440 | 6461 | 0072 | 745F | 6D65 | 3170 | 615F | 7264 | 5F00 |
| 0001020460 | 6567 | 656E | 6172 | 6574 | 725F | 6365 | 5F74 | 696C |
| 0001020500 | 7473 | 5F00 | 6966 | 7372 | 5F74 | 7265 | 0072 | 6C5F |
| 0001020520 | 7361 | 5F74 | 7265 | 0072 | 6D5F | 6469 | 725F | 6365 |
| 0001020540 | 5F74 | 6461 | 0072 | 725F | 6465 | 6375 | 5F65 | 6572 |
| 0001020560 | 7463 | 5F73 | 7261 | 6165 | 5F00 | 6572 | 7564 | 6563 |
| 0001020600 | 725F | 6365 | 5F74 | 7261 | 6165 | 5F00 | 6572 | 7463 |
| 0001020620 | 615F | 7264 | 5F00 | 616C | 7473 | 6C5F | 6E69 | 5F65 |
| 0001020640 | 6461 | 0072 | 6C5F | 7361 | 5F74 | 6461 | 0072 | 665F |
| 0001020660 | 7269 | 7473 | 615F | 7264 | 5F00 | 6966 | 7372 | 5F74 |
| 0001020700 | 696C | 656E | 5F00 | 616C | 7473 | 6C5F | 6E69 | 0065 |
| 0001020720 | 665F | 7269 | 7473 | 635F | 6C6F | 5F00 | 616C | 7473 |
| 0001020740 | 635F | 6C6F | 5F00 | 6966 | 7372 | 5F74 | 6F63 | 5F6C |
| 0001020760 | 6E69 | 0064 | 6C5F | 7361 | 5F74 | 6F63 | 5F6C | 6E69 |
| 0001021000 | 0064 | 755F | 696E | 6E6F | 725F | 6365 | 5F74 | 616D |
| 0001021020 | 7274 | 7869 | 5F00 | 6572 | 7564 | 6563 | 735F | 6165 |
| 0001021040 | 6372 | 5F68 | 696C | 7473 | 5F00 | 6572 | 7463 | 6D5F |
| 0001021060 | 7461 | 6972 | 5F78 | 7470 | 0072 | 725F | 6465 | 6375 |
| 0001021100 | 6465 | 625F | 7469 | 616D | 0070 | 725F | 6365 | 5F74 |

THU MAR 14 17:37:32 1991 GSPMON.4 PAGE 288, LINE 16934

| | | | | | | | | |
|---|---|---|---|---|---|---|---|---|
| 0001021120 | 756E | 5F6D | 7470 | 0072 | 745F | 6D65 | 5F70 | 7261 |
| 0001021140 | 0072 | 745F | 6D65 | 5F70 | 7261 | 3172 | 5F00 | 6F73 |
| 0001021160 | 7472 | 735F | 6165 | 6372 | 5F68 | 696C | 7473 | 5F00 |
| 0001021200 | 6572 | 7463 | 6C5F | 7369 | 0074 | 735F | 726F | 5F74 |
| 0001021220 | 7261 | 6172 | 3179 | 5F00 | 6F73 | 7472 | 615F | 7272 |
| 0001021240 | 7961 | 0032 | 675F | 5F70 | 7473 | 7261 | 5F74 | 6F6D |
| 0001021260 | 7375 | 5F65 | 7274 | 6361 | 006B | 635F | 6D6F | 7570 |
| 0001021300 | 6574 | 735F | 6165 | 6372 | 5F68 | 616D | 6B73 | 5F00 |
| 0001021320 | 656C | 7466 | 625F | 726F | 6564 | 0072 | 725F | 6769 |
| 0001021340 | 7468 | 625F | 726F | 6564 | 0072 | 755F | 5F70 | 6F62 |
| 0001021360 | 6472 | 7265 | 5F00 | 6F64 | 6E77 | 625F | 726F | 6564 |
| 0001021400 | 0072 | 735F | 7274 | 7069 | 6D5F | 7361 | 006B | 665F |
| 0001021420 | 6572 | 7A65 | 5F65 | 7563 | 7272 | 6E65 | 5F74 | 6573 |
| 0001021440 | 7261 | 6863 | 615F | 6572 | 0061 | 695F | 6F63 | 5F6E |
| 0001021460 | 7470 | 0072 | 675F | 5F70 | 6567 | 5F74 | 6369 | 6E6F |
| 0001021500 | 5F00 | 6C6F | 5F64 | 7070 | 706F | 5F00 | 7067 | 705F |
| 0001021520 | 7475 | 695F | 6F63 | 006E | 7A5F | 6F6F | 5F6D | 7470 |
| 0001021540 | 0072 | 6F5F | 646C | 705F | 6F70 | 0070 | 675F | 5F70 |
| 0001021560 | 6E69 | 7469 | 695F | 6F63 | 006E | 675F | 5F70 | 6E65 |
| 0001021600 | 5F64 | 6369 | 6E6F | 5F00 | 6369 | 6E6F | 7A5F | 6F6F |
| 0001021620 | 006D | 7A5F | 6F6F | 5F6D | 6166 | 7463 | 726F | 5F00 |
| 0001021640 | 6C70 | 765F | 6C61 | 6575 | 5F00 | 6F7A | 6D6F | 775F |
| 0001021660 | 6469 | 6874 | 5F00 | 6F7A | 6D6F | 685F | 6965 | 6867 |
| 0001021700 | 0074 | 675F | 7073 | 745F | 6D69 | 7265 | 5F00 | 7768 |
| 0001021720 | 645F | 7065 | 6874 | 5F00 | 6373 | 775F | 6469 | 6874 |
| 0001021740 | 5F00 | 6373 | 685F | 6965 | 6867 | 0074 | 735F | 5F63 |
| 0001021760 | 6564 | 7470 | 0068 | 745F | 6D69 | 6F65 | 7475 | 765F |
| 0001022000 | 6C61 | 5F00 | 7973 | 636E | 745F | 6D69 | 6F65 | 7475 |
| 0001022020 | 765F | 6C61 | 5F00 | 7473 | 6261 | 6C69 | 7469 | 5F79 |
| 0001022040 | 6176 | 006C | 765F | 7265 | 6669 | 5F79 | 7473 | 6261 |
| 0001022060 | 6C69 | 7469 | 5F79 | 6176 | 006C | 745F | 7268 | 7365 |
| 0001022100 | 6F68 | 646C | 5F00 | 6C62 | 6E69 | 696B | 676E | 745F |
| 0001022120 | 7268 | 7365 | 6F68 | 646C | 5F00 | 7265 | 5F72 | 6C65 |
| 0001022140 | 6D65 | 745F | 7268 | 7365 | 6F68 | 646C | 5F00 | 6F61 |
| 0001022160 | 5F69 | 6F78 | 5F72 | 6F63 | 6F6C | 0072 | 695F | 746E |
| 0001022200 | 7265 | 616C | 6563 | 0064 | 6D5F | 6773 | 735F | 7A69 |
| 0001022220 | 0065 | 6C5F | 7961 | 7265 | 6E5F | 6D75 | 5F00 | 6C65 |
| 0001022240 | 6D65 | 635F | 756F | 746E | 5F00 | 6F68 | 6972 | 5F7A |
| 0001022260 | 6170 | 6172 | 006D | 735F | 7274 | 7069 | 645F | 7461 |
| 0001022300 | 0061 | 685F | 726F | 7A69 | 705F | 7261 | 6D61 | 5F00 |
| 0001022320 | 6576 | 7472 | 705F | 7261 | 6D61 | 5F00 | 6973 | 5F67 |
| 0001022340 | 6164 | 6174 | 5F00 | 6F68 | 6972 | 5F7A | 6170 | 6172 |
| 0001022360 | 006D | 765F | 7265 | 5F74 | 6170 | 6172 | 006D | 735F |
| 0001022400 | 6769 | 645F | 7461 | 0061 | 765F | 7265 | 6669 | 5F79 |
| 0001022420 | 6373 | 6572 | 6E65 | 705F | 6572 | 6573 | 636E | 0065 |
| 0001022440 | 735F | 7263 | 6565 | 5F6E | 7473 | 6261 | 6C69 | 7469 |
| 0001022460 | 0079 | 6C5F | 7961 | 7265 | 6E5F | 6D75 | 5F00 | 6964 |
| 0001022500 | 6666 | 705F | 7274 | 5F00 | 6170 | 6172 | 656D | 6574 |
| 0001022520 | 5F72 | 6F63 | 6564 | 5F00 | 6170 | 6172 | 656D | 6574 |
| 0001022540 | 5F72 | 6176 | 006C | 6D5F | 7361 | 5F6B | 6962 | 0074 |
| 0001022560 | 665F | 6C69 | 6574 | 5F72 | 756E | 006D | 685F | 5F77 |
| 0001022600 | 6C70 | 6E61 | 0065 | 635F | 6D6F | 6170 | 6572 | 735F |
| 0001022620 | 6174 | 6574 | 665F | 676C | 5F00 | 6863 | 6E61 | 6567 |
| 0001022640 | 735F | 6174 | 6574 | 665F | 676C | 5F00 | 7266 | 6D61 |
| 0001022660 | 5F65 | 6F63 | 6E75 | 0074 | 735F | 6174 | 6C62 | 5F65 |
| 0001022700 | 6F63 | 6E75 | 0074 | 635F | 6E6F | 7274 | 6C6F | 705F |
| 0001022720 | 7274 | 5F00 | 6F6D | 7375 | 5F65 | 7665 | 6E65 | 5F74 |
| 0001022740 | 6573 | 746E | 705F | 7274 | 5F00 | 6369 | 6E6F | 735F |
| 0001022760 | 6165 | 6372 | 5F68 | 7470 | 0072 | 695F | 6F63 | 5F6E |

THU MAR 14 17:37:32 1991 GSPMON.4 PAGE 289, LINE 16993

| | | | | | | | | |
|---|---|---|---|---|---|---|---|---|
| 0001023000 | 7274 | 6E61 | 5F73 | 7470 | 0072 | 735F | 7263 | 625F |
| 0001023020 | 5F67 | 6F63 | 6F6C | 7275 | 5F00 | 7068 | 635F | 6F72 |
| 0001023040 | 7373 | 635F | 6C6F | 756F | 0072 | 735F | 6174 | 7472 |
| 0001023060 | 6C5F | 6E69 | 0065 | 735F | 6F74 | 5F70 | 696C | 656E |
| 0001023100 | 5F00 | 7473 | 7261 | 5F74 | 6F63 | 006C | 735F | 6F74 |
| 0001023120 | 5F70 | 6F63 | 006C | 725F | 6365 | 5F74 | 756E | 006D |
| 0001023140 | 725F | 6365 | 5F74 | 7261 | 6172 | 0079 | 785F | 5F79 |
| 0001023160 | 666F | 7366 | 7465 | 5F00 | 656C | 7466 | 765F | 6C61 |
| 0001023200 | 5F00 | 6972 | 6867 | 5F74 | 6176 | 006C | 735F | 6E69 |
| 0001023220 | 6567 | 5F6C | 7470 | 5F00 | 756E | 5F6D | 666F | 705F |
| 0001023240 | 696F | 746E | 0073 | 6E5F | 6D75 | 6F5F | 5F66 | 6E69 |
| 0001023260 | 6574 | 6E72 | 6C61 | 0073 | 6E5F | 6D75 | 6F5F | 5F66 |
| 0001023300 | 7865 | 6574 | 6E72 | 6C61 | 0073 | 705F | 696F | 746E |
| 0001023320 | 765F | 6365 | 0074 | 6E5F | 6D75 | 6F5F | 5F66 | 6F70 |
| 0001023340 | 6E69 | 7374 | 5F00 | 756E | 5F6D | 666F | 695F | 746E |
| 0001023360 | 7265 | 616E | 736C | 5F00 | 756E | 5F6D | 666F | 655F |
| 0001023400 | 7478 | 7265 | 616E | 736C | 5F00 | 6F70 | 6E69 | 5F74 |
| 0001023420 | 6576 | 7463 | 6F5F | 6666 | 6573 | 7374 | 5F00 | 7473 |
| 0001023440 | 6972 | 5F70 | 6F6C | 6B6F | 7075 | 5F00 | 6361 | 6563 |
| 0001023460 | 7373 | 745F | 6261 | 656C | 0073 | 695F | 6F63 | 5F6E |
| 0001023500 | 6F6D | 6564 | 5F00 | 656C | 7466 | 625F | 726F | 6564 |
| 0001023520 | 0072 | 725F | 6769 | 7468 | 625F | 726F | 6564 | 0072 |
| 0001023540 | 755F | 5F70 | 6F62 | 6472 | 7265 | 5F00 | 6F64 | 6E77 |
| 0001023560 | 625F | 726F | 6564 | 0072 | 705F | 696F | 746E | 6C5F |
| 0001023600 | 7369 | 0074 | 6C5F | 6665 | 5F74 | 6972 | 6867 | 5F74 |
| 0001023620 | 6F62 | 6472 | 7265 | 615F | 6363 | 7365 | 0073 | 755F |
| 0001023640 | 5F70 | 6F64 | 6E77 | 625F | 726F | 6564 | 5F72 | 6361 |
| 0001023660 | 6563 | 7373 | 5F00 | 6369 | 6E6F | 645F | 6373 | 7072 |
| 0001023700 | 0074 | 695F | 6F63 | 5F6E | 7461 | 7274 | 6269 | 7475 |
| 0001023720 | 0065 | 695F | 6F63 | 5F6E | 6873 | 7061 | 0065 | 705F |
| 0001023740 | 6572 | 6976 | 756F | 5F73 | 6369 | 6E6F | 5F00 | 656E |
| 0001023760 | 7478 | 695F | 6F63 | 006E | 495F | 444E | 5249 | 4345 |
| 0001024000 | 0054 | 695F | 6F63 | 5F6E | 6174 | 6C62 | 5F65 | 7470 |
| 0001024020 | 0072 | 695F | 6F63 | 5F6E | 6174 | 6C62 | 5F65 | 616C |
| 0001024040 | 7473 | 705F | 7274 | 5F00 | 6F6D | 6964 | 6966 | 6465 |
| 0001024060 | 705F | 696F | 746E | 6C5F | 7369 | 0074 | 695F | 6F63 |
| 0001024100 | 5F6E | 6F70 | 6E69 | 5F74 | 696C | 7473 | 705F | 7274 |
| 0001024120 | 5F00 | 6361 | 6563 | 7373 | 745F | 6261 | 656C | 705F |
| 0001024140 | 7274 | 5F00 | 6369 | 6E6F | 735F | 6168 | 6570 | 705F |
| 0001024160 | 7274 | 5F00 | 6873 | 7061 | 5F65 | 6F63 | 7272 | 6C65 |
| 0001024200 | 7461 | 0065 | 675F | 5F70 | 6F63 | 6E75 | 5F74 | 6369 |
| 0001024220 | 6E6F | 6C5F | 7369 | 0074 | 635F | 7275 | 6572 | 746E |
| 0001024240 | 695F | 6F63 | 5F6E | 7470 | 0072 | 695F | 6F63 | 5F6E |
| 0001024260 | 7562 | 0066 | 695F | 6F63 | 5F6E | 6F63 | 6E75 | 0074 |
| 0001024300 | 635F | 756F | 746E | 695F | 6F63 | 5F6E | 6174 | 6C62 |
| 0001024320 | 0065 | 695F | 6F63 | 5F6E | 7470 | 0072 | 695F | 6F63 |
| 0001024340 | 5F6E | 756E | 006D | 735F | 6C70 | 7469 | 695F | 6F63 |
| 0001024360 | 5F6E | 6174 | 6C62 | 0065 | 6E5F | 6D75 | 6F5F | 5F66 |
| 0001024400 | 6369 | 6E6F | 5F73 | 6E69 | 665F | 7269 | 7473 | 5F00 |
| 0001024420 | 6966 | 7372 | 5F74 | 696C | 7473 | 705F | 7274 | 5F00 |
| 0001024440 | 6574 | 706D | 705F | 7274 | 5F00 | 616C | 7473 | 705F |
| 0001024460 | 7274 | 5F00 | 656D | 6772 | 5F65 | 6369 | 6E6F | 745F |
| 0001024500 | 6261 | 656C | 0073 | 665F | 7269 | 7473 | 745F | 6261 |
| 0001024520 | 656C | 705F | 7274 | 5F00 | 6573 | 6F63 | 646E | 745F |
| 0001024540 | 6261 | 656C | 705F | 7274 | 5F00 | 6574 | 706D | 705F |
| 0001024560 | 7274 | 5F00 | 7075 | 6164 | 6574 | 6D5F | 736F | 5F74 |
| 0001024600 | 6F63 | 6D6D | 6E6F | 695F | 6F63 | 006E | 695F | 6F63 |
| 0001024620 | 5F6E | 7470 | 0072 | 675F | 7465 | 695F | 6F63 | 5F6E |
| 0001024640 | 7470 | 5F72 | 7962 | 695F | 0064 | 695F | 6F63 | 5F6E |

THU MAR 14 17:37:32 1991 GSPMON.4 PAGE 290, LINE 17052

| | | | | | | | | |
|---|---|---|---|---|---|---|---|---|
| 0001024660 | 7470 | 0072 | 675F | 7465 | 695F | 6F63 | 5F6E | 6873 |
| 0001024700 | 7061 | 5F65 | 6170 | 6172 | 736D | 5F00 | 6369 | 6E6F |
| 0001024720 | 705F | 7274 | 5F00 | 6170 | 7373 | 7669 | 5F65 | 6573 |
| 0001024740 | 7261 | 6863 | 695F | 706E | 616C | 6563 | 5F00 | 6369 |
| 0001024760 | 6E6F | 705F | 7274 | 5F00 | 7563 | 7272 | 6E65 | 5F74 |
| 0001025000 | 6369 | 6E6F | 705F | 7274 | 5F00 | 7563 | 7272 | 6E65 |
| 0001025020 | 5F74 | 6F70 | 6E69 | 5F74 | 6461 | 7264 | 5F00 | 7563 |
| 0001025040 | 7272 | 6E65 | 5F74 | 6C70 | 6361 | 0065 | 635F | 7275 |
| 0001025060 | 6572 | 746E | 705F | 696F | 746E | 705F | 7274 | 5F00 |
| 0001025100 | 6E69 | 6C70 | 6361 | 5F65 | 6573 | 7261 | 6863 | 745F |
| 0001025120 | 6261 | 656C | 5F00 | 6170 | 7373 | 7669 | 5F65 | 6573 |
| 0001025140 | 7261 | 6863 | 695F | 5F6E | 6572 | 7463 | 5F00 | 6572 |
| 0001025160 | 7463 | 6C5F | 7369 | 0074 | 635F | 7275 | 6572 | 746E |
| 0001025200 | 635F | 6C6F | 6D75 | 5F6E | 6461 | 7264 | 5F00 | 7563 |
| 0001025220 | 7272 | 6E65 | 5F74 | 696C | 656E | 615F | 6464 | 0072 |
| 0001025240 | 635F | 7275 | 6572 | 746E | 705F | 696F | 746E | 615F |
| 0001025260 | 6464 | 0072 | 735F | 6F74 | 5F70 | 696C | 656E | 5F00 |
| 0001025300 | 7473 | 706F | 635F | 6C6F | 5F00 | 7473 | 7261 | 5F74 |
| 0001025320 | 696C | 656E | 5F00 | 7473 | 7261 | 5F74 | 6F63 | 006C |
| 0001025340 | 735F | 6174 | 7472 | 615F | 6464 | 0072 | 725F | 6365 |
| 0001025360 | 5F74 | 696C | 696D | 0074 | 635F | 7275 | 6572 | 746E |
| 0001025400 | 695F | 6F63 | 5F6E | 7470 | 0072 | 665F | 7269 | 7473 |
| 0001025420 | 6C5F | 7369 | 5F74 | 7470 | 0072 | 735F | 6365 | 6E6F |
| 0001025440 | 5F64 | 696C | 7473 | 705F | 7274 | 5F00 | 6573 | 7261 |
| 0001025460 | 6863 | 625F | 726F | 6564 | 0072 | 735F | 6C70 | 7469 |
| 0001025500 | 6C5F | 6E69 | 0065 | 695F | 646E | 7865 | 6F5F | 6666 |
| 0001025520 | 6573 | 0074 | 635F | 7275 | 6572 | 746E | 625F | 726F |
| 0001025540 | 6564 | 5F72 | 6F6C | 6B6F | 7075 | 5F00 | 6F70 | 6E69 |
| 0001025560 | 5F74 | 6361 | 6563 | 7373 | 6D5F | 646F | 0065 | 685F |
| 0001025600 | 726F | 7A69 | 6E6F | 6174 | 5F6C | 6C63 | 7069 | 5F00 |
| 0001025620 | 6576 | 7472 | 6369 | 6C61 | 635F | 696C | 0070 | 6F5F |
| 0001025640 | 6576 | 6C72 | 7961 | 735F | 6168 | 6570 | 635F | 726F |
| 0001025660 | 6572 | 616C | 6574 | 5F00 | 6F70 | 6E69 | 5F74 | 6461 |
| 0001025700 | 7264 | 5F00 | 6572 | 5F66 | 6461 | 7264 | 5F00 | 696C |
| 0001025720 | 7473 | 705F | 7274 | 5F00 | 6361 | 6563 | 7373 | 705F |
| 0001025740 | 7274 | 5F00 | 6F70 | 6E69 | 5F74 | 7470 | 0072 | 725F |
| 0001025760 | 6665 | 6970 | 6578 | 0073 | 615F | 6363 | 705F | 696F |
| 0001026000 | 746E | 0073 | 745F | 7268 | 7365 | 6F68 | 646C | 5F00 |
| 0001026020 | 6F78 | 5F72 | 6873 | 7061 | 5F65 | 6F63 | 7272 | 6C65 |
| 0001026040 | 7461 | 0065 | 705F | 696F | 746E | 615F | 6464 | 0072 |
| 0001026060 | 725F | 6665 | 615F | 6464 | 0072 | 6C5F | 7369 | 5F74 |
| 0001026100 | 7470 | 0072 | 615F | 6363 | 7365 | 5F73 | 7470 | 0072 |
| 0001026120 | 705F | 696F | 746E | 705F | 7274 | 5F00 | 6874 | 6572 |
| 0001026140 | 6873 | 6C6F | 0064 | 675F | 6E65 | 745F | 6D65 | 5F70 |
| 0001026160 | 6F70 | 6E69 | 5F74 | 696C | 7473 | 5F00 | 6F70 | 6E69 |
| 0001026200 | 5F74 | 6461 | 7264 | 5F00 | 726F | 6769 | 6E69 | 6C61 |
| 0001026220 | 705F | 696F | 746E | 6C5F | 7369 | 0074 | 6D5F | 646F |
| 0001026240 | 6669 | 6569 | 5F64 | 6F70 | 6E69 | 5F74 | 696C | 7473 |
| 0001026260 | 5F00 | 6E69 | 6574 | 6E72 | 6C61 | 0073 | 635F | 7275 |
| 0001026300 | 6572 | 746E | 705F | 696F | 746E | 5F00 | 7563 | 7272 |
| 0001026320 | 6E65 | 5F74 | 696C | 656E | 615F | 6464 | 0072 | 635F |
| 0001026340 | 7275 | 6572 | 746E | 625F | 6E61 | 5F6B | 6461 | 7264 |
| 0001026360 | 5F00 | 7075 | 625F | 726F | 6564 | 0072 | 645F | 776F |
| 0001026400 | 5F6E | 6F62 | 6472 | 7265 | 5F00 | 656C | 7466 | 625F |
| 0001026420 | 726F | 6564 | 0072 | 725F | 6769 | 7468 | 625F | 726F |
| 0001026440 | 6564 | 0072 | 675F | 5F70 | 6567 | 5F74 | 6369 | 6E6F |
| 0001026460 | 645F | 7461 | 5F00 | 7364 | 7263 | 7470 | 5F72 | 7470 |
| 0001026500 | 0072 | 675F | 5F70 | 7061 | 6570 | 646E | 695F | 6F63 |
| 0001026520 | 006E | 675F | 5F70 | 6C63 | 6165 | 5F72 | 6369 | 6E6F |

THU MAR 14 17:37:32 1991 GSPMON.4 PAGE 291, LINE 17111

| | | | | | | | | |
|---|---|---|---|---|---|---|---|---|
| 0001026540 | 6C5F | 7369 | 0074 | 645F | 6373 | 7072 | 7274 | 705F |
| 0001026560 | 7274 | 5F00 | 6C61 | 5F75 | 6F6D | 6564 | 5F00 | 656D |
| 0001026600 | 5F6D | 6C70 | 6E61 | 0065 | 645F | 7369 | 5F70 | 6C61 |
| 0001026620 | 006C | 465F | 4244 | 4B43 | 445F | 5349 | 5F00 | 4446 |
| 0001026640 | 4342 | 5F4B | 4E45 | 5F00 | 4E45 | 4F46 | 4352 | 5F45 |
| 0001026660 | 4230 | 5F00 | 4F4E | 4D52 | 4C41 | 425F | 5F00 | 4E45 |
| 0001026700 | 4F46 | 4352 | 5F45 | 4130 | 5F00 | 4F4E | 4D52 | 4C41 |
| 0001026720 | 415F | 5F00 | 756D | 5F78 | 6F70 | 7472 | 5F00 | 4956 |
| 0001026740 | 5F44 | 4F50 | 5452 | 5F00 | 424D | 5F32 | 4F50 | 5452 |
| 0001026760 | 5F00 | 424D | 5F31 | 4F50 | 5452 | 5F00 | 424D | 5F30 |
| 0001027000 | 4F50 | 5452 | 5F00 | 616D | 6B73 | 705F | 6C6F | 7261 |
| 0001027020 | 5F00 | 4F50 | 5F4C | 4E49 | 4556 | 5352 | 0045 | 505F |
| 0001027040 | 4C4F | 4E5F | 524F | 414D | 004C | 6D5F | 7361 | 5F6B |
| 0001027060 | 6E65 | 6261 | 656C | 5F00 | 414D | 4B53 | 445F | 5349 |
| 0001027100 | 5F00 | 7273 | 5F64 | 6176 | 756C | 0065 | 565F | 4449 |
| 0001027120 | 4F45 | 495F | 004E | 565F | 4449 | 4F45 | 4F5F | 5455 |
| 0001027140 | 5F00 | 7273 | 5F65 | 6176 | 756C | 0065 | 565F | 4449 |
| 0001027160 | 4F45 | 445F | 5349 | 5F00 | 4956 | 4544 | 5F4F | 4E45 |
| 0001027200 | 5F00 | 424D | 495F | 544E | 5257 | 5F00 | 626D | 5F34 |
| 0001027220 | 7566 | 636E | 5F00 | 424D | 5F34 | 4944 | 4646 | 5257 |
| 0001027240 | 5F00 | 424D | 5F34 | 5245 | 5752 | 0052 | 6D5F | 3562 |
| 0001027260 | 665F | 6E75 | 0063 | 675F | 6172 | 3262 | 6D5F | 646F |
| 0001027300 | 0065 | 475F | 4152 | 3242 | 4F5F | 4646 | 5F00 | 5247 |
| 0001027320 | 4241 | 5F32 | 4E4F | 5F00 | 6863 | 6D6B | 6B73 | 655F |
| 0001027340 | 616E | 0062 | 435F | 4B48 | 4D5F | 4B53 | 455F | 004E |
| 0001027360 | 435F | 4B48 | 4D5F | 4B53 | 445F | 5349 | 5F00 | 656D |
| 0001027400 | 5F6D | 6162 | 6B6E | 5F00 | 5247 | 4545 | 5F4E | 4843 |
| 0001027420 | 5F00 | 564F | 5245 | 414C | 5F59 | 4843 | 5F00 | 7270 |
| 0001027440 | 5F65 | 6F6D | 6564 | 5F00 | 4553 | 454C | 5443 | 4445 |
| 0001027460 | 5F00 | 7367 | 5F70 | 6974 | 656D | 0072 | 685F | 5F77 |
| 0001027500 | 6564 | 7470 | 0068 | 735F | 5F63 | 6977 | 7464 | 0068 |
| 0001027520 | 735F | 5F63 | 6568 | 6769 | 7468 | 5F00 | 6373 | 645F |
| 0001027540 | 7065 | 6874 | 5F00 | 6974 | 656D | 756F | 5F74 | 6176 |
| 0001027560 | 006C | 735F | 6E79 | 5F63 | 6974 | 656D | 756F | 5F74 |
| 0001027600 | 6176 | 006C | 735F | 6174 | 6962 | 696C | 7974 | 765F |
| 0001027620 | 6C61 | 5F00 | 6576 | 6972 | 7966 | 735F | 6174 | 6962 |
| 0001027640 | 696C | 7974 | 765F | 6C61 | 5F00 | 6874 | 6572 | 6873 |
| 0001027660 | 6C6F | 0064 | 625F | 696C | 6B6E | 6E69 | 5F67 | 6874 |
| 0001027700 | 6572 | 6873 | 6C6F | 0064 | 655F | 7272 | 655F | 656C |
| 0001027720 | 5F6D | 6874 | 6572 | 6873 | 6C6F | 0064 | 615F | 696F |
| 0001027740 | 785F | 726F | 635F | 6C6F | 726F | 5F00 | 6E69 | 6574 |
| 0001027760 | 6C72 | 6361 | 6465 | 5F00 | 736D | 5F67 | 6973 | 657A |
| 0001030000 | 5F00 | 616C | 6579 | 5F72 | 756E | 006D | 655F | 656C |
| 0001030020 | 5F6D | 6F63 | 6E75 | 0074 | 685F | 726F | 7A69 | 705F |
| 0001030040 | 7261 | 6D61 | 5F00 | 7473 | 6972 | 5F70 | 6164 | 6174 |
| 0001030060 | 5F00 | 6F68 | 6972 | 5F7A | 6170 | 6172 | 006D | 765F |
| 0001030100 | 7265 | 5F74 | 6170 | 6172 | 006D | 735F | 6769 | 645F |
| 0001030120 | 7461 | 0061 | 685F | 726F | 7A69 | 705F | 7261 | 6D61 |
| 0001030140 | 5F00 | 6576 | 7472 | 705F | 7261 | 6D61 | 5F00 | 6973 |
| 0001030160 | 5F67 | 6164 | 6174 | 5F00 | 6576 | 6972 | 7966 | 735F |
| 0001030200 | 7263 | 6565 | 5F6E | 7270 | 7365 | 6E65 | 6563 | 5F00 |
| 0001030220 | 6373 | 6572 | 6E65 | 735F | 6174 | 6962 | 696C | 7974 |
| 0001030240 | 5F00 | 616C | 6579 | 5F72 | 756E | 006D | 645F | 6669 |
| 0001030260 | 5F66 | 7470 | 0072 | 705F | 7261 | 6D61 | 7465 | 7265 |
| 0001030300 | 635F | 646F | 0065 | 705F | 7261 | 6D61 | 7465 | 7265 |
| 0001030320 | 765F | 6C61 | 5F00 | 616D | 6B73 | 625F | 7469 | 5F00 |
| 0001030340 | 6966 | 746C | 7265 | 6E5F | 6D75 | 5F00 | 7768 | 705F |
| 0001030360 | 616C | 656E | 5F00 | 6F63 | 706D | 7261 | 5F65 | 7473 |
| 0001030400 | 7461 | 5F65 | 6C66 | 0067 | 635F | 6168 | 676E | 5F65 |

THU MAR 14 17:37:32 1991 GSPMON.4 PAGE 292, LINE 17170

| | | | | | | | | |
|---|---|---|---|---|---|---|---|---|
| 0001030420 | 7473 | 7461 | 5F65 | 6C66 | 0067 | 665F | 6172 | 656D |
| 0001030440 | 635F | 756F | 746E | 5F00 | 7473 | 6261 | 656C | 635F |
| 0001030460 | 756F | 746E | 5F00 | 6F63 | 746E | 6F72 | 5F6C | 7470 |
| 0001030500 | 0072 | 6D5F | 756F | 6573 | 655F | 6576 | 746E | 735F |
| 0001030520 | 6E65 | 5F74 | 7470 | 0072 | 695F | 6F63 | 5F6E | 6573 |
| 0001030540 | 7261 | 6863 | 705F | 7274 | 5F00 | 6369 | 6E6F | 745F |
| 0001030560 | 6172 | 736E | 705F | 7274 | 5F00 | 6373 | 5F72 | 6762 |
| 0001030600 | 635F | 6C6F | 756F | 0072 | 685F | 5F70 | 7263 | 736F |
| 0001030620 | 5F73 | 6F63 | 6F6C | 7275 | 5F00 | 7473 | 7261 | 5F74 |
| 0001030640 | 696C | 656E | 5F00 | 7473 | 706F | 6C5F | 6E69 | 0065 |
| 0001030660 | 735F | 6174 | 7472 | 635F | 6C6F | 5F00 | 7473 | 706F |
| 0001030700 | 635F | 6C6F | 5F00 | 6572 | 7463 | 6E5F | 6D75 | 5F00 |
| 0001030720 | 6572 | 7463 | 615F | 7272 | 7961 | 5F00 | 6373 | 6572 |
| 0001030740 | 6E65 | 635F | 6168 | 676E | 5F65 | 7974 | 6570 | 5F00 |
| 0001030760 | 6572 | 7463 | 705F | 7261 | 5F00 | 6572 | 7463 | 745F |
| 0001031000 | 7079 | 0065 | 435F | 4D4F | 5F50 | 4E49 | 5449 | 5F00 |
| 0001031020 | 4F43 | 504D | 535F | 4F54 | 0050 | 695F | 6F63 | 5F6E |
| 0001031040 | 6572 | 7463 | 6E5F | 7865 | 5F74 | 7473 | 7461 | 0065 |
| 0001031060 | 735F | 6C63 | 735F | 6174 | 6962 | 696C | 7974 | 635F |
| 0001031100 | 6568 | 6B63 | 6F5F | 006E | 735F | 6C63 | 735F | 6174 |
| 0001031120 | 6962 | 696C | 7974 | 665F | 676C | 5F00 | 6373 | 5F6C |
| 0001031140 | 7473 | 6261 | 6C69 | 7469 | 5F79 | 6176 | 756C | 0065 |
| 0001031160 | 735F | 6C63 | 745F | 7268 | 7365 | 6F68 | 646C | 5F00 |
| 0001031200 | 6369 | 6E6F | 725F | 6365 | 5F74 | 6966 | 5F78 | 7265 |
| 0001031220 | 6F72 | 0072 | 655F | 7272 | 6C5F | 6E69 | 5F65 | 6F6E |
| 0001031240 | 5F00 | 6966 | 7372 | 5F74 | 7265 | 5F72 | 696C | 656E |
| 0001031260 | 5F00 | 6966 | 7372 | 5F74 | 7265 | 5F72 | 6F63 | 006C |
| 0001031300 | 6C5F | 7361 | 5F74 | 7265 | 5F72 | 696C | 656E | 5F00 |
| 0001031320 | 616C | 7473 | 655F | 7272 | 635F | 6C6F | 5F00 | 616C |
| 0001031340 | 7473 | 655F | 7272 | 775F | 726F | 0064 | 655F | 7272 |
| 0001031360 | 6F63 | 6E75 | 5F74 | 3030 | 705F | 7274 | 5F00 | 7270 |
| 0001031400 | 636F | 7365 | 5F73 | 6C66 | 0067 | 695F | 6F63 | 5F6E |
| 0001031420 | 6572 | 7463 | 735F | 6174 | 6574 | 625F | 7469 | 0073 |
| 0001031440 | 735F | 7263 | 6565 | 5F6E | 6863 | 6E61 | 6567 | 745F |
| 0001031460 | 7079 | 0065 | 635F | 6168 | 676E | 5F65 | 6F6E | 5F00 |
| 0001031500 | 6564 | 7562 | 5F67 | 6F63 | 6E75 | 6574 | 0072 | 695F |
| 0001031520 | 6F63 | 5F6E | 6572 | 7463 | 5F00 | 6977 | 646E | 776F |
| 0001031540 | 725F | 6365 | 0074 | 695F | 6F63 | 5F6E | 6964 | 0072 |
| 0001031560 | 6C5F | 7361 | 5F74 | 7265 | 6F72 | 5F72 | 7266 | 6D6F |
| 0001031600 | 625F | 6765 | 6E69 | 5F00 | 616C | 7473 | 655F | 7272 |
| 0001031620 | 726F | 665F | 6F72 | 5F6D | 6E65 | 0064 | 635F | 6168 |
| 0001031640 | 676E | 5F65 | 0078 | 635F | 6168 | 676E | 5F65 | 0079 |
| 0001031660 | 6C5F | 7361 | 5F74 | 6572 | 7463 | 0073 | 6C5F | 7361 |
| 0001031700 | 5F74 | 6369 | 6E6F | 6E5F | 006F | 6C5F | 7361 | 5F74 |
| 0001031720 | 6572 | 7463 | 6F5F | 006B | 6E5F | 5F6F | 666F | 655F |
| 0001031740 | 7272 | 6F5F | 6676 | 006C | 735F | 7465 | 615F | 6C70 |
| 0001031760 | 5F63 | 6369 | 6E6F | 725F | 6365 | 0074 | 695F | 6F63 |
| 0001032000 | 5F6E | 6572 | 7463 | 635F | 6972 | 6974 | 6163 | 006C |
| 0001032020 | 695F | 6F63 | 5F6E | 6572 | 7463 | 6E5F | 726F | 616D |
| 0001032040 | 006C | 735F | 7263 | 6565 | 5F6E | 6F6E | 5F74 | 6863 |
| 0001032060 | 6E61 | 6567 | 0064 | 695F | 5F73 | 6572 | 7463 | 635F |
| 0001032100 | 6168 | 676E | 6465 | 5F00 | 656E | 5F77 | 7265 | 6F72 |
| 0001032120 | 5F72 | 7266 | 6D6F | 625F | 6765 | 6E69 | 5F00 | 656E |
| 0001032140 | 5F77 | 7265 | 6F72 | 5F72 | 7266 | 6D6F | 655F | 646E |
| 0001032160 | 5F00 | 6863 | 6E61 | 6567 | 665F | 676C | 5F00 | 6573 |
| 0001032200 | 7261 | 6863 | 725F | 6365 | 0074 | 725F | 6365 | 5F74 |
| 0001032220 | 6F6E | 795F | 5F00 | 6572 | 7463 | 6E5F | 5F6F | 0078 |
| 0001032240 | 725F | 6365 | 5F31 | 696D | 796E | 5F00 | 6572 | 3163 |
| 0001032260 | 6D5F | 7861 | 0079 | 725F | 6365 | 5F31 | 696D | 786E |

THU MAR 14 17:37:32 1991 GSPMON.4 PAGE 293, LINE 17229

| | | | | | | | | |
|---|---|---|---|---|---|---|---|---|
| 0001032300 | 5F00 | 6572 | 3163 | 6D5F | 7861 | 0078 | 725F | 6365 |
| 0001032320 | 5F31 | 5F79 | 616D | 5F78 | 0078 | 725F | 6365 | 5F31 |
| 0001032340 | 5F79 | 696D | 5F6E | 0078 | 725F | 6365 | 5F32 | 696D |
| 0001032360 | 796E | 5F00 | 6572 | 3263 | 6D5F | 7861 | 0079 | 725F |
| 0001032400 | 6365 | 5F32 | 696D | 786E | 5F00 | 6572 | 3263 | 6D5F |
| 0001032420 | 7861 | 0078 | 725F | 6365 | 5F32 | 5F79 | 616D | 5F78 |
| 0001032440 | 0078 | 725F | 6365 | 5F32 | 5F79 | 696D | 5F6E | 0078 |
| 0001032460 | 665F | 6E69 | 5F64 | 6572 | 7463 | 5F00 | 6574 | 706D |
| 0001032500 | 705F | 7869 | 785F | 5F00 | 6966 | 7372 | 5F74 | 6970 |
| 0001032520 | 5F78 | 0078 | 6C5F | 7361 | 5F74 | 6970 | 5F78 | 0078 |
| 0001032540 | 665F | 7269 | 7473 | 6C5F | 6E69 | 5F65 | 0078 | 6C5F |
| 0001032560 | 7361 | 5F74 | 696C | 656E | 785F | 5F00 | 6167 | 5F70 |
| 0001032600 | 7865 | 7369 | 7374 | 5F00 | 696D | 5F6E | 7572 | 5F6E |
| 0001032620 | 656C | 676E | 6874 | 5F00 | 616D | 5F78 | 7572 | 5F6E |
| 0001032640 | 656C | 676E | 6874 | 5F00 | 6567 | 5F74 | 6369 | 6E6F |
| 0001032660 | 5F00 | 6369 | 6E6F | 725F | 6365 | 0074 | 635F | 726F |
| 0001032700 | 6572 | 7463 | 0032 | 725F | 6365 | 3174 | 635F | 0079 |
| 0001032720 | 665F | 7269 | 7473 | 6C5F | 6E69 | 0065 | 6C5F | 7361 |
| 0001032740 | 5F74 | 696C | 656E | 5F00 | 6572 | 5F63 | 6966 | 7372 |
| 0001032760 | 5F74 | 0078 | 725F | 6365 | 6C5F | 7361 | 5F74 | 0078 |
| 0001033000 | 725F | 6365 | 5F74 | 696D | 786E | 5F00 | 6572 | 7463 |
| 0001033020 | 6D5F | 7861 | 0078 | 725F | 6365 | 3274 | 665F | 7269 |
| 0001033040 | 7473 | 725F | 776F | 5F00 | 6572 | 7463 | 5F32 | 6661 |
| 0001033060 | 6574 | 5F72 | 6966 | 7372 | 5F74 | 6F72 | 0077 | 725F |
| 0001033100 | 6365 | 3274 | 6C5F | 7361 | 5F74 | 6F72 | 0077 | 725F |
| 0001033120 | 6365 | 3274 | 615F | 7466 | 7265 | 6C5F | 7361 | 5F74 |
| 0001033140 | 6F72 | 0077 | 725F | 6365 | 3274 | 625F | 6665 | 726F |
| 0001033160 | 5F65 | 6966 | 7372 | 5F74 | 6F72 | 0077 | 725F | 6365 |
| 0001033200 | 3274 | 625F | 6665 | 726F | 5F65 | 616C | 7473 | 725F |
| 0001033220 | 776F | 5F00 | 6572 | 7463 | 5F32 | 5F32 | 6562 | 6F66 |
| 0001033240 | 6572 | 665F | 7269 | 7473 | 725F | 776F | 5F00 | 6572 |
| 0001033260 | 7463 | 5F32 | 5F32 | 6562 | 6F66 | 6572 | 6C5F | 7361 |
| 0001033300 | 5F74 | 6F72 | 0077 | 725F | 6365 | 3174 | 325F | 625F |
| 0001033320 | 6665 | 726F | 5F65 | 616C | 7473 | 725F | 776F | 5F00 |
| 0001033340 | 6572 | 7463 | 5F31 | 6562 | 6F66 | 6572 | 6C5F | 7361 |
| 0001033360 | 5F74 | 6F72 | 0077 | 725F | 6365 | 3174 | 6C5F | 7361 |
| 0001033400 | 5F74 | 6F72 | 0077 | 725F | 6365 | 3174 | 615F | 7466 |
| 0001033420 | 7265 | 6C5F | 7361 | 5F74 | 6F72 | 0077 | 6C5F | 636F |
| 0001033440 | 7461 | 5F65 | 6572 | 7463 | 5F00 | 6369 | 6E6F | 725F |
| 0001033460 | 6365 | 0074 | 725F | 6365 | 665F | 7269 | 7473 | 785F |
| 0001033500 | 5F00 | 6572 | 5F63 | 616C | 7473 | 785F | 5F00 | 6572 |
| 0001033520 | 7463 | 6D5F | 6E69 | 0078 | 725F | 6365 | 5F74 | 616D |
| 0001033540 | 7878 | 5F00 | 6F6E | 6F5F | 5F66 | 6572 | 7463 | 0073 |
| 0001033560 | 695F | 6F63 | 5F6E | 6F66 | 6E75 | 0064 | 635F | 6E6F |
| 0001033600 | 6576 | 7472 | 655F | 7272 | 745F | 5F6F | 6970 | 0078 |
| 0001033620 | 745F | 6D65 | 5F70 | 6F63 | 006C | 675F | 5F70 | 7369 |
| 0001033640 | 695F | 6F63 | 5F6E | 6572 | 7463 | 635F | 6168 | 676E |
| 0001033660 | 6465 | 5F00 | 6974 | 656D | 765F | 6C61 | 5F00 | 7067 |
| 0001033700 | 665F | 6E69 | 5F64 | 6369 | 6E6F | 725F | 6365 | 0074 |
| 0001033720 | 745F | 6D69 | 5F65 | 6176 | 006C | 675F | 5F70 | 6F6C |
| 0001033740 | 6163 | 6574 | 695F | 6F63 | 5F6E | 6572 | 7463 | 5F00 |
| 0001033760 | 6974 | 656D | 765F | 6C61 | 5F00 | 7067 | 675F | 7465 |
| 0001034000 | 695F | 6F63 | 5F6E | 6572 | 7463 | 5F00 | 6974 | 656D |
| 0001034020 | 765F | 6C61 | 5F00 | 7067 | 745F | 6172 | 6B63 | 695F |
| 0001034040 | 6F63 | 5F6E | 6572 | 7463 | 5F00 | 6974 | 656D | 765F |
| 0001034060 | 6C61 | 5F00 | 7067 | 655F | 646E | 695F | 6F63 | 5F6E |
| 0001034100 | 6572 | 7463 | 5F00 | 7067 | 735F | 6165 | 6372 | 5F68 |
| 0001034120 | 6369 | 6E6F | 725F | 6365 | 0074 | 745F | 6D69 | 5F65 |
| 0001034140 | 6176 | 006C | 675F | 5F70 | 7473 | 7261 | 5F74 | 6369 |

THU MAR 14 17:37:32 1991 GSPMON.4 PAGE 294, LINE 17288

| | | | | | | | | |
|---|---|---|---|---|---|---|---|---|
| 0001034160 | 6E6F | 725F | 6365 | 0074 | 675F | 5F70 | 6469 | 656C |
| 0001034200 | 695F | 6F63 | 5F6E | 6572 | 7463 | 5F00 | 7067 | 695F |
| 0001034220 | 696E | 5F74 | 6369 | 6E6F | 725F | 6365 | 0074 | 625F |
| 0001034240 | 6E69 | 735F | 6165 | 6372 | 0068 | 625F | 6E69 | 735F |
| 0001034260 | 6165 | 6372 | 5F68 | 0078 | 655F | 7272 | 6F63 | 6E75 |
| 0001034300 | 5F74 | 6F65 | 006C | 655F | 7272 | 6F63 | 6E75 | 5F74 |
| 0001034320 | 7978 | 5F00 | 6C61 | 5F75 | 6F6D | 6564 | 5F00 | 656D |
| 0001034340 | 5F6D | 6C70 | 6E61 | 0065 | 645F | 7369 | 5F70 | 6C61 |
| 0001034360 | 006C | 465F | 4244 | 4B43 | 445F | 5349 | 5F00 | 4446 |
| 0001034400 | 4342 | 5F4B | 4E45 | 5F00 | 4E45 | 4F46 | 4352 | 5F45 |
| 0001034420 | 4230 | 5F00 | 4F4E | 4D52 | 4C41 | 425F | 5F00 | 4E45 |
| 0001034440 | 4F46 | 4352 | 5F45 | 4130 | 5F00 | 4F4E | 4D52 | 4C41 |
| 0001034460 | 415F | 5F00 | 756D | 5F78 | 6F70 | 7472 | 5F00 | 4956 |
| 0001034500 | 5F44 | 4F50 | 5452 | 5F00 | 424D | 5F32 | 4F50 | 5452 |
| 0001034520 | 5F00 | 424D | 5F31 | 4F50 | 5452 | 5F00 | 424D | 5F30 |
| 0001034540 | 4F50 | 5452 | 5F00 | 616D | 6B73 | 705F | 6C6F | 7261 |
| 0001034560 | 5F00 | 4F50 | 5F4C | 4E49 | 4556 | 5352 | 0045 | 505F |
| 0001034600 | 4C4F | 4E5F | 524F | 414D | 004C | 6D5F | 7361 | 5F6B |
| 0001034620 | 6E65 | 6261 | 656C | 5F00 | 414D | 4B53 | 445F | 5349 |
| 0001034640 | 5F00 | 7273 | 5F64 | 6176 | 756C | 0065 | 565F | 4449 |
| 0001034660 | 4F45 | 495F | 004E | 565F | 4449 | 4F45 | 4F5F | 5455 |
| 0001034700 | 5F00 | 7273 | 5F65 | 6176 | 756C | 0065 | 565F | 4449 |
| 0001034720 | 4F45 | 445F | 5349 | 5F00 | 4956 | 4544 | 5F4F | 4E45 |
| 0001034740 | 5F00 | 424D | 495F | 544E | 5257 | 5F00 | 626D | 5F34 |
| 0001034760 | 7566 | 636E | 5F00 | 424D | 5F34 | 4944 | 4646 | 5257 |
| 0001035000 | 5F00 | 424D | 5F34 | 5245 | 5752 | 0052 | 6D5F | 3562 |
| 0001035020 | 665F | 6E75 | 0063 | 675F | 6172 | 3262 | 6D5F | 646F |
| 0001035040 | 0065 | 475F | 4152 | 3242 | 4F5F | 4646 | 5F00 | 5247 |
| 0001035060 | 4241 | 5F32 | 4E4F | 5F00 | 6863 | 6D6B | 6B73 | 655F |
| 0001035100 | 616E | 0062 | 435F | 4B48 | 4D5F | 4B53 | 455F | 004E |
| 0001035120 | 435F | 4B48 | 4D5F | 4B53 | 445F | 5349 | 5F00 | 656D |
| 0001035140 | 5F6D | 6162 | 6B6E | 5F00 | 5247 | 4545 | 5F4E | 4843 |
| 0001035160 | 5F00 | 564F | 5245 | 414C | 5F59 | 4843 | 5F00 | 7270 |
| 0001035200 | 5F65 | 6F6D | 6564 | 5F00 | 4553 | 454C | 5443 | 4445 |
| 0001035220 | 5F00 | 7367 | 5F70 | 6974 | 656D | 0072 | 685F | 5F77 |
| 0001035240 | 6564 | 7470 | 0068 | 735F | 5F63 | 6977 | 7464 | 0068 |
| 0001035260 | 735F | 5F63 | 6568 | 6769 | 7468 | 5F00 | 6373 | 645F |
| 0001035300 | 7065 | 6874 | 5F00 | 6974 | 656D | 756F | 5F74 | 6176 |
| 0001035320 | 006C | 735F | 6E79 | 5F63 | 6974 | 656D | 756F | 5F74 |
| 0001035340 | 6176 | 006C | 735F | 6174 | 6962 | 696C | 7974 | 765F |
| 0001035360 | 6C61 | 5F00 | 6576 | 6972 | 7966 | 735F | 6174 | 6962 |
| 0001035400 | 696C | 7974 | 765F | 6C61 | 5F00 | 6874 | 6572 | 6873 |
| 0001035420 | 6C6F | 0064 | 625F | 696C | 6B6E | 6E69 | 5F67 | 6874 |
| 0001035440 | 6572 | 6873 | 6C6F | 0064 | 655F | 7272 | 655F | 656C |
| 0001035460 | 5F6D | 6874 | 6572 | 6873 | 6C6F | 0064 | 615F | 696F |
| 0001035500 | 785F | 726F | 635F | 6C6F | 726F | 5F00 | 6E69 | 6574 |
| 0001035520 | 6C72 | 6361 | 6465 | 5F00 | 736D | 5F67 | 6973 | 657A |
| 0001035540 | 5F00 | 616C | 6579 | 5F72 | 756E | 006D | 655F | 656C |
| 0001035560 | 5F6D | 6F63 | 6E75 | 0074 | 685F | 726F | 7A69 | 705F |
| 0001035600 | 7261 | 6D61 | 5F00 | 7473 | 6972 | 5F70 | 6164 | 6174 |
| 0001035620 | 5F00 | 6F68 | 6972 | 5F7A | 6170 | 6172 | 006D | 765F |
| 0001035640 | 7265 | 5F74 | 6170 | 6172 | 006D | 735F | 6769 | 645F |
| 0001035660 | 7461 | 0061 | 685F | 726F | 7A69 | 705F | 7261 | 6D61 |
| 0001035700 | 5F00 | 6576 | 7472 | 705F | 7261 | 6D61 | 5F00 | 6973 |
| 0001035720 | 5F67 | 6164 | 6174 | 5F00 | 6576 | 6972 | 7966 | 735F |
| 0001035740 | 7263 | 6565 | 5F6E | 7270 | 7365 | 6E65 | 6563 | 5F00 |
| 0001035760 | 6373 | 6572 | 6E65 | 735F | 6174 | 6962 | 696C | 7974 |
| 0001036000 | 5F00 | 616C | 6579 | 5F72 | 756E | 006D | 645F | 6669 |
| 0001036020 | 5F66 | 7470 | 0072 | 705F | 7261 | 6D61 | 7465 | 7265 |

THU MAR 14 17:37:32 1991 GSPMON.4 PAGE 295, LINE 17347

| | | | | | | | | |
|---|---|---|---|---|---|---|---|---|
| 0001036040 | 635F | 646F | 0065 | 705F | 7261 | 6D61 | 7465 | 7265 |
| 0001036060 | 765F | 6C61 | 5F00 | 616D | 6B73 | 625F | 7469 | 5F00 |
| 0001036100 | 6966 | 746C | 7265 | 6E5F | 6D75 | 5F00 | 7768 | 705F |
| 0001036120 | 616C | 656E | 5F00 | 6F63 | 706D | 7261 | 5F65 | 7473 |
| 0001036140 | 7461 | 5F65 | 6C66 | 0067 | 635F | 6168 | 676E | 5F65 |
| 0001036160 | 7473 | 7461 | 5F65 | 6C66 | 0067 | 665F | 6172 | 656D |
| 0001036200 | 635F | 756F | 746E | 5F00 | 7473 | 6261 | 656C | 635F |
| 0001036220 | 756F | 746E | 5F00 | 7264 | 6761 | 635F | 7372 | 0072 |
| 0001036240 | 645F | 6172 | 5F67 | 6966 | 746C | 7265 | 5F00 | 7264 |
| 0001036260 | 6761 | 655F | 6576 | 746E | 5F00 | 6F68 | 7473 | 665F |
| 0001036300 | 616C | 0067 | 635F | 6E6F | 7274 | 6C6F | 705F | 7274 |
| 0001036320 | 5F00 | 6F6D | 7375 | 5F65 | 7665 | 6E65 | 5F74 | 6573 |
| 0001036340 | 746E | 705F | 7274 | 5F00 | 6369 | 6E6F | 735F | 6165 |
| 0001036360 | 6372 | 5F68 | 7470 | 0072 | 695F | 6F63 | 5F6E | 7274 |
| 0001036400 | 6E61 | 5F73 | 7470 | 0072 | 735F | 7263 | 625F | 5F67 |
| 0001036420 | 6F63 | 6F6C | 7275 | 5F00 | 7068 | 635F | 6F72 | 7373 |
| 0001036440 | 635F | 6C6F | 756F | 0072 | 735F | 6174 | 7472 | 6C5F |
| 0001036460 | 6E69 | 0065 | 735F | 6F74 | 5F70 | 696C | 656E | 5F00 |
| 0001036500 | 7473 | 7261 | 5F74 | 6F63 | 006C | 735F | 6F74 | 5F70 |
| 0001036520 | 6F63 | 006C | 725F | 6365 | 5F74 | 756E | 006D | 725F |
| 0001036540 | 6365 | 5F74 | 7261 | 6172 | 0079 | 615F | 696F | 6E5F |
| 0001036560 | 7865 | 5F74 | 7473 | 7461 | 0065 | 6D5F | 7361 | 5F6B |
| 0001036600 | 7562 | 0066 | 615F | 696F | 655F | 6576 | 746E | 5F00 |
| 0001036620 | 6F61 | 5F69 | 6572 | 6573 | 5F74 | 616D | 6B73 | 625F |
| 0001036640 | 6675 | 5F00 | 7563 | 7372 | 726F | 775F | 6469 | 6874 |
| 0001036660 | 5F00 | 7563 | 7372 | 726F | 685F | 6965 | 6867 | 0074 |
| 0001036700 | 685F | 6C61 | 5F66 | 7563 | 7372 | 726F | 775F | 6469 |
| 0001036720 | 6874 | 5F00 | 6168 | 666C | 635F | 7275 | 6F73 | 5F72 |
| 0001036740 | 6568 | 6769 | 7468 | 5F00 | 7264 | 7761 | 635F | 6C6F |
| 0001036760 | 726F | 5F00 | 6573 | 5F74 | 7061 | 636C | 615F | 696F |
| 0001037000 | 685F | 6E61 | 6C64 | 7265 | 5F00 | 6F61 | 5F69 | 6168 |
| 0001037020 | 646E | 656C | 5F72 | 7263 | 7469 | 6369 | 6C61 | 5F00 |
| 0001037040 | 6F61 | 5F69 | 6168 | 646E | 656C | 5F72 | 6F6E | 6D72 |
| 0001037060 | 6C61 | 5F00 | 6177 | 6374 | 5F68 | 6F64 | 0067 | 675F |
| 0001037100 | 5F70 | 6F61 | 5F69 | 7061 | 636C | 5F00 | 6F61 | 5F69 |
| 0001037120 | 7264 | 7761 | 6F5F | 5F6E | 6373 | 6572 | 6E65 | 5F00 |
| 0001037140 | 6C6F | 5F64 | 6F63 | 6F6C | 3172 | 5F00 | 6C6F | 5F64 |
| 0001037160 | 7070 | 706F | 5F00 | 7277 | 7469 | 5F65 | 5F32 | 616D |
| 0001037200 | 6B73 | 625F | 6675 | 6566 | 0072 | 735F | 616D | 6C6C |
| 0001037220 | 775F | 6469 | 6874 | 5F00 | 7277 | 7469 | 5F65 | 616D |
| 0001037240 | 6B73 | 325F | 625F | 6E61 | 5F6B | 0030 | 735F | 616D |
| 0001037260 | 6C6C | 775F | 6469 | 6874 | 5F00 | 7067 | 735F | 6E65 |
| 0001037300 | 5F64 | 6461 | 7264 | 7365 | 5F73 | 6F74 | 685F | 736F |
| 0001037320 | 0074 | 635F | 5F70 | 6162 | 6B6E | 5F31 | 6F74 | 625F |
| 0001037340 | 6E61 | 306B | 5F00 | 6564 | 746C | 5F61 | 666F | 7366 |
| 0001037360 | 7465 | 5F00 | 6573 | 5F74 | 6F61 | 5F69 | 6F78 | 5F72 |
| 0001037400 | 6F63 | 6F6C | 0072 | 785F | 726F | 635F | 6C6F | 726F |
| 0001037420 | 5F00 | 6C61 | 5F75 | 6F6D | 6564 | 5F00 | 656D | 5F6D |
| 0001037440 | 6C70 | 6E61 | 0065 | 645F | 7369 | 5F70 | 6C61 | 006C |
| 0001037460 | 465F | 4244 | 4B43 | 445F | 5349 | 5F00 | 4446 | 4342 |
| 0001037500 | 5F4B | 4E45 | 5F00 | 4E45 | 4F46 | 4352 | 5F45 | 4230 |
| 0001037520 | 5F00 | 4F4E | 4D52 | 4C41 | 425F | 5F00 | 4E45 | 4F46 |
| 0001037540 | 4352 | 5F45 | 4130 | 5F00 | 4F4E | 4D52 | 4C41 | 415F |
| 0001037560 | 5F00 | 756D | 5F78 | 6F70 | 7472 | 5F00 | 4956 | 5F44 |
| 0001037600 | 4F50 | 5452 | 5F00 | 424D | 5F32 | 4F50 | 5452 | 5F00 |
| 0001037620 | 424D | 5F31 | 4F50 | 5452 | 5F00 | 424D | 5F30 | 4F50 |
| 0001037640 | 5452 | 5F00 | 616D | 6B73 | 705F | 6C6F | 7261 | 5F00 |
| 0001037660 | 4F50 | 5F4C | 4E49 | 4556 | 5352 | 0045 | 505F | 4C4F |
| 0001037700 | 4E5F | 524F | 414D | 004C | 6D5F | 7361 | 5F6B | 6E65 |

THU MAR 14 17:37:32 1991 GSPMON.4 PAGE 296, LINE 17406

| | | | | | | | | |
|---|---|---|---|---|---|---|---|---|
| 0001037720 | 6261 | 656C | 5F00 | 414D | 4B53 | 445F | 5349 | 5F00 |
| 0001037740 | 7273 | 5F64 | 6176 | 756C | 0065 | 565F | 4449 | 4F45 |
| 0001037760 | 495F | 004E | 565F | 4449 | 4F45 | 4F5F | 5455 | 5F00 |
| 0001040000 | 7273 | 5F65 | 6176 | 756C | 0065 | 565F | 4449 | 4F45 |
| 0001040020 | 445F | 5349 | 5F00 | 4956 | 4544 | 5F4F | 4E45 | 5F00 |
| 0001040040 | 424D | 495F | 544E | 5257 | 5F00 | 626D | 5F34 | 7566 |
| 0001040060 | 636E | 5F00 | 424D | 5F34 | 4944 | 4646 | 5257 | 5F00 |
| 0001040100 | 424D | 5F34 | 5245 | 5752 | 0052 | 6D5F | 3562 | 665F |
| 0001040120 | 6E75 | 0063 | 675F | 6172 | 3262 | 6D5F | 646F | 0065 |
| 0001040140 | 475F | 4152 | 3242 | 4F5F | 4646 | 5F00 | 5247 | 4241 |
| 0001040160 | 5F32 | 4E4F | 5F00 | 6863 | 6D6B | 6B73 | 655F | 616E |
| 0001040200 | 0062 | 435F | 4B48 | 4D5F | 4B53 | 455F | 004E | 435F |
| 0001040220 | 4B48 | 4D5F | 4B53 | 445F | 5349 | 5F00 | 656D | 5F6D |
| 0001040240 | 6162 | 6B6E | 5F00 | 5247 | 4545 | 5F4E | 4843 | 5F00 |
| 0001040260 | 564F | 5245 | 414C | 5F59 | 4843 | 5F00 | 7270 | 5F65 |
| 0001040300 | 6F6D | 6564 | 5F00 | 4553 | 454C | 5443 | 4445 | 5F00 |
| 0001040320 | 7367 | 5F70 | 6974 | 656D | 0072 | 685F | 5F77 | 6564 |
| 0001040340 | 7470 | 0068 | 735F | 5F63 | 6977 | 7464 | 0068 | 735F |
| 0001040360 | 5F63 | 6568 | 6769 | 7468 | 5F00 | 6373 | 645F | 7065 |
| 0001040400 | 6874 | 5F00 | 6974 | 656D | 756F | 5F74 | 6176 | 006C |
| 0001040420 | 735F | 6E79 | 5F63 | 6974 | 656D | 756F | 5F74 | 6176 |
| 0001040440 | 006C | 735F | 6174 | 6962 | 696C | 7974 | 765F | 6C61 |
| 0001040460 | 5F00 | 6576 | 6972 | 7966 | 735F | 6174 | 6962 | 696C |
| 0001040500 | 7974 | 765F | 6C61 | 5F00 | 6874 | 6572 | 6873 | 6C6F |
| 0001040520 | 0064 | 625F | 696C | 6B6E | 6E69 | 5F67 | 6874 | 6572 |
| 0001040540 | 6873 | 6C6F | 0064 | 655F | 7272 | 655F | 656C | 5F6D |
| 0001040560 | 6874 | 6572 | 6873 | 6C6F | 0064 | 615F | 696F | 785F |
| 0001040600 | 726F | 635F | 6C6F | 726F | 5F00 | 6E69 | 6574 | 6C72 |
| 0001040620 | 6361 | 6465 | 5F00 | 736D | 5F67 | 6973 | 657A | 5F00 |
| 0001040640 | 616C | 6579 | 5F72 | 756E | 006D | 655F | 656C | 5F6D |
| 0001040660 | 6F63 | 6E75 | 0074 | 685F | 726F | 7A69 | 705F | 7261 |
| 0001040700 | 6D61 | 5F00 | 7473 | 6972 | 5F70 | 6164 | 6174 | 5F00 |
| 0001040720 | 6F68 | 6972 | 5F7A | 6170 | 6172 | 006D | 765F | 7265 |
| 0001040740 | 5F74 | 6170 | 6172 | 006D | 735F | 6769 | 645F | 7461 |
| 0001040760 | 0061 | 685F | 726F | 7A69 | 705F | 7261 | 6D61 | 5F00 |
| 0001041000 | 6576 | 7472 | 705F | 7261 | 6D61 | 5F00 | 6973 | 5F67 |
| 0001041020 | 6164 | 6174 | 5F00 | 6576 | 6972 | 7966 | 735F | 7263 |
| 0001041040 | 6565 | 5F6E | 7270 | 7365 | 6E65 | 6563 | 5F00 | 6373 |
| 0001041060 | 6572 | 6E65 | 735F | 6174 | 6962 | 696C | 7974 | 5F00 |
| 0001041100 | 616C | 6579 | 5F72 | 756E | 006D | 645F | 6669 | 5F66 |
| 0001041120 | 7470 | 0072 | 705F | 7261 | 6D61 | 7465 | 7265 | 635F |
| 0001041140 | 646F | 0065 | 705F | 7261 | 6D61 | 7465 | 7265 | 765F |
| 0001041160 | 6C61 | 5F00 | 616D | 6B73 | 625F | 7469 | 5F00 | 6966 |
| 0001041200 | 746C | 7265 | 6E5F | 6D75 | 5F00 | 7768 | 705F | 616C |
| 0001041220 | 656E | 5F00 | 6F63 | 706D | 7261 | 5F65 | 7473 | 7461 |
| 0001041240 | 5F65 | 6C66 | 0067 | 635F | 6168 | 676E | 5F65 | 7473 |
| 0001041260 | 7461 | 5F65 | 6C66 | 0067 | 665F | 6172 | 656D | 635F |
| 0001041300 | 756F | 746E | 5F00 | 7473 | 6261 | 656C | 635F | 756F |
| 0001041320 | 746E | 5F00 | 6F63 | 746E | 6F72 | 5F6C | 7470 | 0072 |
| 0001041340 | 6D5F | 756F | 6573 | 655F | 6576 | 746E | 735F | 6E65 |
| 0001041360 | 5F74 | 7470 | 0072 | 695F | 6F63 | 5F6E | 6573 | 7261 |
| 0001041400 | 6863 | 705F | 7274 | 5F00 | 6369 | 6E6F | 745F | 6172 |
| 0001041420 | 736E | 705F | 7274 | 5F00 | 6373 | 5F72 | 6762 | 635F |
| 0001041440 | 6C6F | 756F | 0072 | 685F | 5F70 | 7263 | 736F | 5F73 |
| 0001041460 | 6F63 | 6F6C | 7275 | 5F00 | 7473 | 7261 | 5F74 | 696C |
| 0001041500 | 656E | 5F00 | 7473 | 706F | 6C5F | 6E69 | 0065 | 735F |
| 0001041520 | 6174 | 7472 | 635F | 6C6F | 5F00 | 7473 | 706F | 635F |
| 0001041540 | 6C6F | 5F00 | 6572 | 7463 | 6E5F | 6D75 | 5F00 | 6572 |
| 0001041560 | 7463 | 615F | 7272 | 7961 | 5F00 | 7067 | 645F | 7369 |

THU MAR 14 17:37:32 1991 GSPMON.4 PAGE 297, LINE 17465

| | | | | | | | | |
|---|---|---|---|---|---|---|---|---|
| 0001041600 | 6C70 | 7961 | 625F | 6E61 | 006B | 675F | 5F70 | 6964 |
| 0001041620 | 7073 | 616C | 5F79 | 6373 | 6572 | 6E65 | 5F00 | 7067 |
| 0001041640 | 645F | 7365 | 6C70 | 7961 | 6D5F | 6C75 | 6974 | 6C5F |
| 0001041660 | 7961 | 7265 | 5F00 | 7067 | 675F | 6E65 | 7265 | 7461 |
| 0001041700 | 5F65 | 6964 | 6666 | 5F00 | 6564 | 746C | 5F61 | 666F |
| 0001041720 | 7366 | 7465 | 5F00 | 7067 | 675F | 6E65 | 7265 | 7461 |
| 0001041740 | 5F65 | 7473 | 6972 | 5F70 | 6964 | 6666 | 5F00 | 6C6F |
| 0001041760 | 5F64 | 6F63 | 6F6C | 0072 | 6F5F | 646C | 705F | 6F70 |
| 0001042000 | 0070 | 675F | 5F70 | 6567 | 656E | 6172 | 6574 | 735F |
| 0001042020 | 6769 | 645F | 6669 | 0066 | 6F5F | 646C | 635F | 6C6F |
| 0001042040 | 726F | 5F00 | 6C6F | 5F64 | 7070 | 706F | 5F00 | 7067 |
| 0001042060 | 635F | 656C | 6E61 | 625F | 6E61 | 006B | 6F5F | 646C |
| 0001042100 | 635F | 6C6F | 726F | 5F00 | 6C6F | 5F64 | 7070 | 706F |
| 0001042120 | 5F00 | 7067 | 785F | 726F | 625F | 6E61 | 006B | 6F5F |
| 0001042140 | 646C | 705F | 6F70 | 0070 | 675F | 5F70 | 6C63 | 6165 |
| 0001042160 | 5F6E | 6C61 | 5F6C | 6162 | 6B6E | 0073 | 735F | 7465 |
| 0001042200 | 615F | 6C70 | 5F63 | 6C63 | 6165 | 006E | 635F | 656C |
| 0001042220 | 6E61 | 635F | 6972 | 6974 | 6163 | 006C | 635F | 656C |
| 0001042240 | 6E61 | 6E5F | 726F | 616D | 006C | 615F | 756C | 6D5F |
| 0001042260 | 646F | 0065 | 6D5F | 6D65 | 705F | 616C | 656E | 5F00 |
| 0001042300 | 6964 | 7073 | 615F | 6C6C | 5F00 | 4446 | 4342 | 5F4B |
| 0001042320 | 4944 | 0053 | 465F | 4244 | 4B43 | 455F | 004E | 455F |
| 0001042340 | 464E | 524F | 4543 | 305F | 0042 | 4E5F | 524F | 414D |
| 0001042360 | 5F4C | 0042 | 455F | 464E | 524F | 4543 | 305F | 0041 |
| 0001042400 | 4E5F | 524F | 414D | 5F4C | 0041 | 6D5F | 7875 | 705F |
| 0001042420 | 726F | 0074 | 565F | 4449 | 505F | 524F | 0054 | 4D5F |
| 0001042440 | 3242 | 505F | 524F | 0054 | 4D5F | 3142 | 505F | 524F |
| 0001042460 | 0054 | 4D5F | 3042 | 505F | 524F | 0054 | 6D5F | 7361 |
| 0001042500 | 5F6B | 6F70 | 616C | 0072 | 505F | 4C4F | 495F | 564E |
| 0001042520 | 5245 | 4553 | 5F00 | 4F50 | 5F4C | 4F4E | 4D52 | 4C41 |
| 0001042540 | 5F00 | 616D | 6B73 | 655F | 616E | 6C62 | 0065 | 4D5F |
| 0001042560 | 5341 | 5F4B | 4944 | 0053 | 735F | 6472 | 765F | 6C61 |
| 0001042600 | 6575 | 5F00 | 4956 | 4544 | 5F4F | 4E49 | 5F00 | 4956 |
| 0001042620 | 4544 | 5F4F | 554F | 0054 | 735F | 6572 | 765F | 6C61 |
| 0001042640 | 6575 | 5F00 | 4956 | 4544 | 5F4F | 4944 | 0053 | 565F |
| 0001042660 | 4449 | 4F45 | 455F | 004E | 4D5F | 5F42 | 4E49 | 5754 |
| 0001042700 | 0052 | 6D5F | 3462 | 665F | 6E75 | 0063 | 4D5F | 3442 |
| 0001042720 | 445F | 4649 | 5746 | 0052 | 4D5F | 3442 | 455F | 5252 |
| 0001042740 | 5257 | 5F00 | 626D | 5F35 | 7566 | 636E | 5F00 | 7267 |
| 0001042760 | 6261 | 5F32 | 6F6D | 6564 | 5F00 | 5247 | 4241 | 5F32 |
| 0001043000 | 464F | 0046 | 475F | 4152 | 3242 | 4F5F | 004E | 635F |
| 0001043020 | 6B68 | 736D | 5F6B | 6E65 | 6261 | 5F00 | 4843 | 5F4B |
| 0001043040 | 534D | 5F4B | 4E45 | 5F00 | 4843 | 5F4B | 534D | 5F4B |
| 0001043060 | 4944 | 0053 | 6D5F | 6D65 | 625F | 6E61 | 006B | 475F |
| 0001043100 | 4552 | 4E45 | 435F | 0048 | 4F5F | 4556 | 4C52 | 5941 |
| 0001043120 | 435F | 0048 | 705F | 6572 | 6D5F | 646F | 0065 | 535F |
| 0001043140 | 4C45 | 4345 | 4554 | 0044 | 675F | 7073 | 745F | 6D69 |
| 0001043160 | 7265 | 5F00 | 7768 | 645F | 7065 | 6874 | 5F00 | 6373 |
| 0001043200 | 775F | 6469 | 6874 | 5F00 | 6373 | 685F | 6965 | 6867 |
| 0001043220 | 0074 | 735F | 5F63 | 6564 | 7470 | 0068 | 745F | 6D69 |
| 0001043240 | 6F65 | 7475 | 765F | 6C61 | 5F00 | 7973 | 636E | 745F |
| 0001043260 | 6D69 | 6F65 | 7475 | 765F | 6C61 | 5F00 | 7473 | 6261 |
| 0001043300 | 6C69 | 7469 | 5F79 | 6176 | 006C | 765F | 7265 | 6669 |
| 0001043320 | 5F79 | 7473 | 6261 | 6C69 | 7469 | 5F79 | 6176 | 006C |
| 0001043340 | 745F | 7268 | 7365 | 6F68 | 646C | 5F00 | 6C62 | 6E69 |
| 0001043360 | 696B | 676E | 745F | 7268 | 7365 | 6F68 | 646C | 5F00 |
| 0001043400 | 7265 | 5F72 | 6C65 | 6D65 | 745F | 7268 | 7365 | 6F68 |
| 0001043420 | 646C | 5F00 | 6F61 | 5F69 | 6F78 | 5F72 | 6F63 | 6F6C |
| 0001043440 | 0072 | 695F | 746E | 7265 | 616C | 6563 | 0064 | 6D5F |

THU MAR 14 17:37:32 1991 GSPMON.4 PAGE 298, LINE 17524

| | | | | | | | | |
|---|---|---|---|---|---|---|---|---|
| 0001043460 | 6773 | 735F | 7A69 | 0065 | 6C5F | 7961 | 7265 | 6E5F |
| 0001043500 | 6D75 | 5F00 | 6C65 | 6D65 | 635F | 756F | 746E | 5F00 |
| 0001043520 | 6F68 | 6972 | 5F7A | 6170 | 6172 | 006D | 735F | 7274 |
| 0001043540 | 7069 | 645F | 7461 | 0061 | 685F | 726F | 7A69 | 705F |
| 0001043560 | 7261 | 6D61 | 5F00 | 6576 | 7472 | 705F | 7261 | 6D61 |
| 0001043600 | 5F00 | 6973 | 5F67 | 6164 | 6174 | 5F00 | 6F68 | 6972 |
| 0001043620 | 5F7A | 6170 | 6172 | 006D | 765F | 7265 | 5F74 | 6170 |
| 0001043640 | 6172 | 006D | 735F | 6769 | 645F | 7461 | 0061 | 765F |
| 0001043660 | 7265 | 6669 | 5F79 | 6373 | 6572 | 6E65 | 705F | 6572 |
| 0001043700 | 6573 | 636E | 0065 | 735F | 7263 | 6565 | 5F6E | 7473 |
| 0001043720 | 6261 | 6C69 | 7469 | 0079 | 6C5F | 7961 | 7265 | 6E5F |
| 0001043740 | 6D75 | 5F00 | 6964 | 6666 | 705F | 7274 | 5F00 | 6170 |
| 0001043760 | 6172 | 656D | 6574 | 5F72 | 6F63 | 6564 | 5F00 | 6170 |
| 0001044000 | 6172 | 656D | 6574 | 5F72 | 6176 | 006C | 6D5F | 7361 |
| 0001044020 | 5F6B | 6962 | 0074 | 665F | 6C69 | 6574 | 5F72 | 756E |
| 0001044040 | 006D | 685F | 5F77 | 6C70 | 6E61 | 0065 | 635F | 6D6F |
| 0001044060 | 6170 | 6572 | 735F | 6174 | 6574 | 665F | 676C | 5F00 |
| 0001044100 | 6863 | 6E61 | 6567 | 735F | 6174 | 6574 | 665F | 676C |
| 0001044120 | 5F00 | 7266 | 6D61 | 5F65 | 6F63 | 6E75 | 0074 | 735F |
| 0001044140 | 6174 | 6C62 | 5F65 | 6F63 | 6E75 | 0074 | 635F | 6E6F |
| 0001044160 | 7274 | 6C6F | 705F | 7274 | 5F00 | 6F6D | 7375 | 5F65 |
| 0001044200 | 7665 | 6E65 | 5F74 | 6573 | 746E | 705F | 7274 | 5F00 |
| 0001044220 | 6369 | 6E6F | 735F | 6165 | 6372 | 5F68 | 7470 | 0072 |
| 0001044240 | 695F | 6F63 | 5F6E | 7274 | 6E61 | 5F73 | 7470 | 0072 |
| 0001044260 | 735F | 7263 | 625F | 5F67 | 6F63 | 6F6C | 7275 | 5F00 |
| 0001044300 | 7068 | 635F | 6F72 | 7373 | 635F | 6C6F | 756F | 0072 |
| 0001044320 | 735F | 6174 | 7472 | 6C5F | 6E69 | 0065 | 735F | 6F74 |
| 0001044340 | 5F70 | 696C | 656E | 5F00 | 7473 | 7261 | 5F74 | 6F63 |
| 0001044360 | 006C | 735F | 6F74 | 5F70 | 6F63 | 006C | 725F | 6365 |
| 0001044400 | 5F74 | 756E | 006D | 725F | 6365 | 5F74 | 7261 | 6172 |
| 0001044420 | 0079 | 525F | 4145 | 5F44 | 4E49 | 5449 | 5F00 | 4552 |
| 0001044440 | 4441 | 435F | 4E4F | 0054 | 575F | 4941 | 5F54 | 4F43 |
| 0001044460 | 504D | 5F00 | 4143 | 5F50 | 4944 | 4646 | 5F00 | 6974 |
| 0001044500 | 656D | 756F | 5F74 | 6170 | 6172 | 006D | 695F | 6C64 |
| 0001044520 | 5F65 | 656E | 7478 | 735F | 6174 | 6574 | 5F00 | 7266 |
| 0001044540 | 6565 | 657A | 6E5F | 7865 | 5F74 | 7473 | 7461 | 0065 |
| 0001044560 | 655F | 6964 | 5F74 | 656E | 7478 | 735F | 6174 | 6574 |
| 0001044600 | 5F00 | 6163 | 7470 | 7275 | 5F65 | 656E | 7478 | 735F |
| 0001044620 | 6174 | 6574 | 5F00 | 6163 | 7370 | 6E79 | 5F63 | 656E |
| 0001044640 | 7478 | 735F | 6174 | 6574 | 5F00 | 6163 | 7370 | 6769 |
| 0001044660 | 6E5F | 7865 | 5F74 | 7473 | 7461 | 0065 | 765F | 7265 |
| 0001044700 | 6669 | 5F79 | 656E | 7478 | 735F | 6174 | 6574 | 5F00 |
| 0001044720 | 6576 | 7372 | 6769 | 6E5F | 7865 | 5F74 | 7473 | 7461 |
| 0001044740 | 0065 | 765F | 7265 | 7973 | 636E | 6E5F | 7865 | 5F74 |
| 0001044760 | 7473 | 7461 | 0065 | 735F | 6174 | 6962 | 696C | 7974 |
| 0001045000 | 6E5F | 7865 | 5F74 | 7473 | 7461 | 0065 | 685F | 736F |
| 0001045020 | 5F74 | 736D | 0067 | 685F | 705F | 7261 | 6D61 | 705F |
| 0001045040 | 7274 | 5F00 | 5F76 | 6170 | 6172 | 5F6D | 7470 | 0072 |
| 0001045060 | 6C5F | 636F | 735F | 6769 | 645F | 7461 | 0061 | 665F |
| 0001045100 | 6572 | 7A65 | 5F65 | 6F6D | 6564 | 5F00 | 6373 | 6572 |
| 0001045120 | 6E65 | 725F | 6165 | 7964 | 5F00 | 7573 | 5F62 | 6373 |
| 0001045140 | 6572 | 6E65 | 725F | 6165 | 7964 | 5F00 | 6162 | 6B63 |
| 0001045160 | 665F | 6F72 | 5F6D | 6E69 | 7469 | 5F00 | 616C | 6579 |
| 0001045200 | 5F72 | 756E | 006D | 685F | 736F | 5F74 | 7277 | 7469 |
| 0001045220 | 6E69 | 0067 | 765F | 7265 | 6669 | 5F79 | 6C66 | 0067 |
| 0001045240 | 735F | 6275 | 645F | 6669 | 5F66 | 6572 | 6461 | 0079 |
| 0001045260 | 6C5F | 7361 | 5F74 | 6964 | 6666 | 725F | 6165 | 7964 |
| 0001045300 | 5F00 | 6973 | 5F67 | 6572 | 6461 | 0079 | 735F | 7263 |
| 0001045320 | 6565 | 5F6E | 7270 | 7365 | 6E65 | 0074 | 6E5F | 766F |

THU MAR 14 17:37:32 1991 GSPMON.4 PAGE 299, LINE 17583

| | | | | | | | | |
|---|---|---|---|---|---|---|---|---|
| 0001045340 | 7265 | 6669 | 0079 | 645F | 6669 | 5F66 | 6163 | 7470 |
| 0001045360 | 7275 | 6465 | 5F00 | 656E | 5F77 | 616C | 6579 | 0072 |
| 0001045400 | 665F | 7269 | 7473 | 645F | 6669 | 0066 | 645F | 6669 |
| 0001045420 | 5F66 | 616C | 6579 | 7372 | 5F00 | 6966 | 7372 | 5F74 |
| 0001045440 | 616C | 6579 | 0072 | 665F | 7869 | 655F | 7272 | 726F |
| 0001045460 | 5F00 | 6576 | 6972 | 7966 | 6D5F | 6773 | 5F00 | 6576 |
| 0001045500 | 7372 | 6769 | 6D5F | 6773 | 5F00 | 6576 | 7372 | 6E79 |
| 0001045520 | 5F63 | 736D | 0067 | 735F | 6174 | 6962 | 696C | 7974 |
| 0001045540 | 665F | 676C | 5F00 | 6863 | 6C6E | 6D5F | 646F | 0065 |
| 0001045560 | 635F | 6E68 | 5F6C | 6F6D | 6564 | 5F00 | 6162 | 6B6E |
| 0001045600 | 5F30 | 6964 | 6666 | 5F00 | 6162 | 6B6E | 5F31 | 6964 |
| 0001045620 | 6666 | 5F00 | 6573 | 5F74 | 7061 | 636C | 695F | 6C64 |
| 0001045640 | 0065 | 695F | 6C64 | 5F65 | 7263 | 7469 | 6369 | 6C61 |
| 0001045660 | 5F00 | 6469 | 656C | 6E5F | 726F | 616D | 006C | 735F |
| 0001045700 | 7465 | 615F | 6C70 | 5F63 | 7266 | 6565 | 657A | 5F00 |
| 0001045720 | 7266 | 6565 | 657A | 6D5F | 646F | 0065 | 665F | 6572 |
| 0001045740 | 7A65 | 5F65 | 7263 | 7469 | 6369 | 6C61 | 5F00 | 7266 |
| 0001045760 | 6565 | 657A | 6E5F | 726F | 616D | 006C | 735F | 7465 |
| 0001046000 | 615F | 6C70 | 5F63 | 7267 | 6261 | 0030 | 675F | 6172 |
| 0001046020 | 3062 | 635F | 6972 | 6974 | 6163 | 006C | 675F | 6172 |
| 0001046040 | 3062 | 6E5F | 726F | 616D | 006C | 735F | 7465 | 615F |
| 0001046060 | 6C70 | 5F63 | 6163 | 7470 | 7275 | 0065 | 635F | 7061 |
| 0001046100 | 7574 | 6572 | 635F | 6972 | 6974 | 6163 | 006C | 635F |
| 0001046120 | 7061 | 7574 | 6572 | 6E5F | 726F | 616D | 006C | 735F |
| 0001046140 | 7465 | 615F | 6C70 | 5F63 | 6163 | 7370 | 6E79 | 0063 |
| 0001046160 | 685F | 726F | 7A69 | 705F | 7261 | 6D61 | 705F | 7274 |
| 0001046200 | 5F00 | 6163 | 7370 | 6E79 | 5F63 | 7263 | 7469 | 6369 |
| 0001046220 | 6C61 | 5F00 | 6163 | 7370 | 6E79 | 5F63 | 6F6E | 6D72 |
| 0001046240 | 6C61 | 5F00 | 6163 | 7370 | 6E79 | 5F63 | 736D | 0067 |
| 0001046260 | 735F | 7465 | 615F | 6C70 | 5F63 | 6163 | 7370 | 6E79 |
| 0001046300 | 5F63 | 6F6C | 0063 | 635F | 7061 | 7973 | 636E | 6C5F |
| 0001046320 | 636F | 6E5F | 726F | 616D | 006C | 735F | 7465 | 615F |
| 0001046340 | 6C70 | 5F63 | 6163 | 7370 | 6769 | 5F00 | 6F68 | 6972 |
| 0001046360 | 5F7A | 6170 | 6172 | 5F6D | 7470 | 0072 | 765F | 7265 |
| 0001046400 | 5F74 | 6170 | 6172 | 5F6D | 7470 | 0072 | 635F | 7061 |
| 0001046420 | 6973 | 5F67 | 7263 | 7469 | 6369 | 6C61 | 5F00 | 6163 |
| 0001046440 | 7370 | 6769 | 6E5F | 726F | 616D | 006C | 635F | 7061 |
| 0001046460 | 6973 | 5F67 | 736D | 0067 | 735F | 7465 | 615F | 6C70 |
| 0001046500 | 5F63 | 6576 | 6972 | 7966 | 5F00 | 6576 | 6972 | 7966 |
| 0001046520 | 635F | 6972 | 6974 | 6163 | 006C | 765F | 7265 | 6669 |
| 0001046540 | 5F79 | 6F6E | 6D72 | 6C61 | 5F00 | 6C6F | 5F64 | 7070 |
| 0001046560 | 706F | 5F00 | 6C6F | 5F64 | 7070 | 706F | 5F00 | 6573 |
| 0001046600 | 5F74 | 7061 | 636C | 765F | 7265 | 7973 | 636E | 5F00 |
| 0001046620 | 6576 | 7372 | 6E79 | 5F63 | 7263 | 7469 | 6369 | 6C61 |
| 0001046640 | 5F00 | 6576 | 7372 | 6E79 | 5F63 | 6F6E | 6D72 | 6C61 |
| 0001046660 | 5F00 | 7563 | 7272 | 735F | 6E79 | 5F63 | 6164 | 6174 |
| 0001046700 | 5F00 | 6573 | 5F74 | 7061 | 636C | 765F | 7265 | 7973 |
| 0001046720 | 636E | 6C5F | 636F | 5F00 | 6576 | 7372 | 6E79 | 5F63 |
| 0001046740 | 6F6C | 5F63 | 6F6E | 6D72 | 6C61 | 5F00 | 7563 | 7272 |
| 0001046760 | 6C5F | 636F | 735F | 6E79 | 5F63 | 6164 | 6174 | 5F00 |
| 0001047000 | 6573 | 5F74 | 7061 | 636C | 765F | 7265 | 6973 | 0067 |
| 0001047020 | 765F | 7265 | 6973 | 5F67 | 7263 | 7469 | 6369 | 6C61 |
| 0001047040 | 5F00 | 6576 | 7372 | 6769 | 6E5F | 726F | 616D | 006C |
| 0001047060 | 635F | 7275 | 5F72 | 6973 | 5F67 | 6164 | 6174 | 5F00 |
| 0001047100 | 6F63 | 706D | 7475 | 5F65 | 7473 | 6972 | 5F70 | 6973 |
| 0001047120 | 0067 | 735F | 7274 | 7069 | 735F | 7274 | 6375 | 5F74 |
| 0001047140 | 7470 | 0072 | 735F | 7274 | 7069 | 655F | 656C | 5F6D |
| 0001047160 | 6F63 | 6E75 | 0074 | 735F | 7274 | 7069 | 655F | 656C |
| 0001047200 | 5F6D | 666F | 7366 | 7465 | 5F00 | 7473 | 7261 | 5F74 |

THU MAR 14 17:37:32 1991 GSPMON.4 PAGE 300, LINE 17642

| | | | | | | | | |
|---|---|---|---|---|---|---|---|---|
| 0001047220 | 7470 | 0072 | 6C5F | 7361 | 5F74 | 7470 | 0072 | 635F |
| 0001047240 | 6D6F | 7570 | 6574 | 6C5F | 636F | 735F | 6E79 | 0063 |
| 0001047260 | 6C5F | 636F | 735F | 7274 | 6375 | 5F74 | 7470 | 0072 |
| 0001047300 | 735F | 6174 | 7472 | 705F | 7274 | 5F00 | 6F72 | 5F77 |
| 0001047320 | 666F | 7366 | 7465 | 5F00 | 6572 | 5F73 | 666F | 7366 |
| 0001047340 | 7465 | 5F00 | 6162 | 6B63 | 6C5F | 6E69 | 5F65 | 666F |
| 0001047360 | 7366 | 7465 | 5F00 | 7262 | 6E61 | 6863 | 6E5F | 7865 |
| 0001047400 | 5F74 | 666F | 7366 | 7465 | 5F00 | 6F63 | 706D | 7475 |
| 0001047420 | 5F65 | 6973 | 6E67 | 7461 | 7275 | 0065 | 725F | 776F |
| 0001047440 | 6F5F | 6666 | 6573 | 0074 | 725F | 7365 | 6F5F | 6666 |
| 0001047460 | 6573 | 0074 | 625F | 6361 | 5F6B | 696C | 656E | 6F5F |
| 0001047500 | 6666 | 6573 | 0074 | 625F | 6172 | 636E | 5F68 | 656E |
| 0001047520 | 7478 | 6F5F | 6666 | 6573 | 0074 | 735F | 6174 | 7472 |
| 0001047540 | 705F | 7274 | 5F00 | 6F63 | 706D | 7261 | 5F65 | 7473 |
| 0001047560 | 6972 | 5F70 | 6164 | 6174 | 5F00 | 7473 | 6972 | 5F70 |
| 0001047600 | 5F31 | 7470 | 0072 | 735F | 7274 | 7069 | 325F | 705F |
| 0001047620 | 7274 | 5F00 | 6F63 | 706D | 7261 | 5F65 | 6F6C | 5F63 |
| 0001047640 | 7973 | 636E | 645F | 7461 | 0061 | 6C5F | 636F | 735F |
| 0001047660 | 6E79 | 5F63 | 5F31 | 7470 | 0072 | 6C5F | 636F | 735F |
| 0001047700 | 6E79 | 5F63 | 5F32 | 7470 | 0072 | 635F | 6D6F | 6170 |
| 0001047720 | 6572 | 735F | 6769 | 645F | 7461 | 0061 | 735F | 6769 |
| 0001047740 | 315F | 705F | 7274 | 5F00 | 6973 | 5F67 | 5F32 | 7470 |
| 0001047760 | 0072 | 735F | 6769 | 655F | 7272 | 635F | 756F | 746E |
| 0001050000 | 5F00 | 7067 | 635F | 7061 | 7574 | 6572 | 735F | 7263 |
| 0001050020 | 6565 | 006E | 675F | 5F70 | 6163 | 7470 | 7275 | 5F65 |
| 0001050040 | 7973 | 636E | 5F00 | 6F68 | 6972 | 5F7A | 6170 | 6172 |
| 0001050060 | 006D | 675F | 5F70 | 6163 | 7470 | 7275 | 5F65 | 6F6C |
| 0001050100 | 6163 | 6F74 | 5F72 | 7973 | 636E | 5F00 | 7067 | 635F |
| 0001050120 | 7061 | 7574 | 6572 | 735F | 6769 | 5F00 | 6F68 | 6972 |
| 0001050140 | 5F7A | 6170 | 6172 | 006D | 765F | 7265 | 5F74 | 6170 |
| 0001050160 | 6172 | 006D | 675F | 5F70 | 6576 | 6972 | 7966 | 735F |
| 0001050200 | 7263 | 6565 | 006E | 675F | 5F70 | 6576 | 6972 | 7966 |
| 0001050220 | 735F | 6E79 | 0063 | 675F | 5F70 | 6576 | 6972 | 7966 |
| 0001050240 | 6C5F | 636F | 7461 | 726F | 735F | 6E79 | 0063 | 675F |
| 0001050260 | 5F70 | 6576 | 6972 | 7966 | 735F | 6769 | 5F00 | 7067 |
| 0001050300 | 735F | 6E65 | 5F64 | 7473 | 6972 | 5F70 | 7470 | 0072 |
| 0001050320 | 675F | 5F70 | 6573 | 646E | 6C5F | 636F | 735F | 6769 |
| 0001050340 | 705F | 7274 | 5F00 | 7067 | 735F | 6E65 | 5F64 | 6973 |
| 0001050360 | 5F67 | 7470 | 0072 | 675F | 5F70 | 7473 | 6261 | 6C69 |
| 0001050400 | 7469 | 5F79 | 6863 | 6365 | 006B | 735F | 7465 | 615F |
| 0001050420 | 6C70 | 5F63 | 7473 | 6261 | 6C69 | 7469 | 5F79 | 6863 |
| 0001050440 | 6365 | 006B | 735F | 6174 | 6962 | 696C | 7974 | 635F |
| 0001050460 | 6568 | 6B63 | 635F | 6972 | 6974 | 6163 | 006C | 735F |
| 0001050500 | 6174 | 6962 | 696C | 7974 | 635F | 6568 | 6B63 | 6E5F |
| 0001050520 | 726F | 616D | 006C | 745F | 6D69 | 7265 | 6F5F | 006E |
| 0001050540 | 745F | 6D69 | 6F65 | 7475 | 665F | 676C | 5F00 | 7067 |
| 0001050560 | 745F | 6D69 | 7265 | 735F | 6977 | 6374 | 0068 | 675F |
| 0001050600 | 5F70 | 6974 | 656D | 5F72 | 6572 | 6573 | 0074 | 675F |
| 0001050620 | 5F70 | 6974 | 656D | 756F | 0074 | 675F | 5F70 | 6974 |
| 0001050640 | 656D | 5F72 | 7473 | 7461 | 7375 | 5F00 | 7067 | 745F |
| 0001050660 | 6D69 | 7265 | 5F00 | 7067 | 745F | 6D69 | 7265 | 6C5F |
| 0001050700 | 616F | 0064 | 615F | 756C | 6D5F | 646F | 0065 | 6D5F |
| 0001050720 | 6D65 | 705F | 616C | 656E | 5F00 | 6964 | 7073 | 615F |
| 0001050740 | 6C6C | 5F00 | 4446 | 4342 | 5F4B | 4944 | 0053 | 465F |
| 0001050760 | 4244 | 4B43 | 455F | 004E | 455F | 464E | 524F | 4543 |
| 0001051000 | 305F | 0042 | 4E5F | 524F | 414D | 5F4C | 0042 | 455F |
| 0001051020 | 464E | 524F | 4543 | 305F | 0041 | 4E5F | 524F | 414D |
| 0001051040 | 5F4C | 0041 | 6D5F | 7875 | 705F | 726F | 0074 | 565F |
| 0001051060 | 4449 | 505F | 524F | 0054 | 4D5F | 3242 | 505F | 524F |

THU MAR 14 17:37:32 1991 GSPMON.4 PAGE 301, LINE 17701

| | | | | | | | | |
|---|---|---|---|---|---|---|---|---|
| 0001051100 | 0054 | 4D5F | 3142 | 505F | 524F | 0054 | 4D5F | 3042 |
| 0001051120 | 505F | 524F | 0054 | 6D5F | 7361 | 5F6B | 6F70 | 616C |
| 0001051140 | 0072 | 505F | 4C4F | 495F | 564E | 5245 | 4553 | 5F00 |
| 0001051160 | 4F50 | 5F4C | 4F4E | 4D52 | 4C41 | 5F00 | 616D | 6B73 |
| 0001051200 | 655F | 616E | 6C62 | 0065 | 4D5F | 5341 | 5F4B | 4944 |
| 0001051220 | 0053 | 735F | 6472 | 765F | 6C61 | 6575 | 5F00 | 4956 |
| 0001051240 | 4544 | 5F4F | 4E49 | 5F00 | 4956 | 4544 | 5F4F | 554F |
| 0001051260 | 0054 | 735F | 6572 | 765F | 6C61 | 6575 | 5F00 | 4956 |
| 0001051300 | 4544 | 5F4F | 4944 | 0053 | 565F | 4449 | 4F45 | 455F |
| 0001051320 | 004E | 4D5F | 5F42 | 4E49 | 5754 | 0052 | 6D5F | 3462 |
| 0001051340 | 665F | 6E75 | 0063 | 4D5F | 3442 | 445F | 4649 | 5746 |
| 0001051360 | 0052 | 4D5F | 3442 | 455F | 5252 | 5257 | 5F00 | 626D |
| 0001051400 | 5F35 | 7566 | 636E | 5F00 | 7267 | 6261 | 5F32 | 6F6D |
| 0001051420 | 6564 | 5F00 | 5247 | 4241 | 5F32 | 464F | 0046 | 475F |
| 0001051440 | 4152 | 3242 | 4F5F | 004E | 635F | 6B68 | 736D | 5F6B |
| 0001051460 | 6E65 | 6261 | 5F00 | 4843 | 5F4B | 534D | 5F4B | 4E45 |
| 0001051500 | 5F00 | 4843 | 5F4B | 534D | 5F4B | 4944 | 0053 | 6D5F |
| 0001051520 | 6D65 | 625F | 6E61 | 006B | 475F | 4552 | 4E45 | 435F |
| 0001051540 | 0048 | 4F5F | 4556 | 4C52 | 5941 | 435F | 0048 | 705F |
| 0001051560 | 6572 | 6D5F | 646F | 0065 | 535F | 4C45 | 4345 | 4554 |
| 0001051600 | 0044 | 675F | 7073 | 745F | 6D69 | 7265 | 5F00 | 7768 |
| 0001051620 | 645F | 7065 | 6874 | 5F00 | 6373 | 775F | 6469 | 6874 |
| 0001051640 | 5F00 | 6373 | 685F | 6965 | 6867 | 0074 | 735F | 5F63 |
| 0001051660 | 6564 | 7470 | 0068 | 745F | 6D69 | 6F65 | 7475 | 765F |
| 0001051700 | 6C61 | 5F00 | 7973 | 636E | 745F | 6D69 | 6F65 | 7475 |
| 0001051720 | 765F | 6C61 | 5F00 | 7473 | 6261 | 6C69 | 7469 | 5F79 |
| 0001051740 | 6176 | 006C | 765F | 7265 | 6669 | 5F79 | 7473 | 6261 |
| 0001051760 | 6C69 | 7469 | 5F79 | 6176 | 006C | 745F | 7268 | 7365 |
| 0001052000 | 6F68 | 646C | 5F00 | 6C62 | 6E69 | 696B | 676E | 745F |
| 0001052020 | 7268 | 7365 | 6F68 | 646C | 5F00 | 7265 | 5F72 | 6C65 |
| 0001052040 | 6D65 | 745F | 7268 | 7365 | 6F68 | 646C | 5F00 | 6F61 |
| 0001052060 | 5F69 | 6F78 | 5F72 | 6F63 | 6F6C | 0072 | 695F | 746E |
| 0001052100 | 7265 | 616C | 6563 | 0064 | 6D5F | 6773 | 735F | 7A69 |
| 0001052120 | 0065 | 6C5F | 7961 | 7265 | 6E5F | 6D75 | 5F00 | 6C65 |
| 0001052140 | 6D65 | 635F | 756F | 746E | 5F00 | 6F68 | 6972 | 5F7A |
| 0001052160 | 6170 | 6172 | 006D | 735F | 7274 | 7069 | 645F | 7461 |
| 0001052200 | 0061 | 685F | 726F | 7A69 | 705F | 7261 | 6D61 | 5F00 |
| 0001052220 | 6576 | 7472 | 705F | 7261 | 6D61 | 5F00 | 6973 | 5F67 |
| 0001052240 | 6164 | 6174 | 5F00 | 6F68 | 6972 | 5F7A | 6170 | 6172 |
| 0001052260 | 006D | 765F | 7265 | 5F74 | 6170 | 6172 | 006D | 735F |
| 0001052300 | 6769 | 645F | 7461 | 0061 | 765F | 7265 | 6669 | 5F79 |
| 0001052320 | 6373 | 6572 | 6E65 | 705F | 6572 | 6573 | 636E | 0065 |
| 0001052340 | 735F | 7263 | 6565 | 5F6E | 7473 | 6261 | 6C69 | 7469 |
| 0001052360 | 0079 | 6C5F | 7961 | 7265 | 6E5F | 6D75 | 5F00 | 6964 |
| 0001052400 | 6666 | 705F | 7274 | 5F00 | 6170 | 6172 | 656D | 6574 |
| 0001052420 | 5F72 | 6F63 | 6564 | 5F00 | 6170 | 6172 | 656D | 6574 |
| 0001052440 | 5F72 | 6176 | 006C | 6D5F | 7361 | 5F6B | 6962 | 0074 |
| 0001052460 | 665F | 6C69 | 6574 | 5F72 | 756E | 006D | 685F | 5F77 |
| 0001052500 | 6C70 | 6E61 | 0065 | 635F | 6D6F | 6170 | 6572 | 735F |
| 0001052520 | 6174 | 6574 | 665F | 676C | 5F00 | 6863 | 6E61 | 6567 |
| 0001052540 | 735F | 6174 | 6574 | 665F | 676C | 5F00 | 7266 | 6D61 |
| 0001052560 | 5F65 | 6F63 | 6E75 | 0074 | 735F | 6174 | 6C62 | 5F65 |
| 0001052600 | 6F63 | 6E75 | 0074 | 635F | 6E6F | 7274 | 6C6F | 705F |
| 0001052620 | 7274 | 5F00 | 6F6D | 7375 | 5F65 | 7665 | 6E65 | 5F74 |
| 0001052640 | 6573 | 746E | 705F | 7274 | 5F00 | 6369 | 6E6F | 735F |
| 0001052660 | 6165 | 6372 | 5F68 | 7470 | 0072 | 695F | 6F63 | 5F6E |
| 0001052700 | 7274 | 6E61 | 5F73 | 7470 | 0072 | 735F | 7263 | 625F |
| 0001052720 | 5F67 | 6F63 | 6F6C | 7275 | 5F00 | 7068 | 635F | 6F72 |
| 0001052740 | 7373 | 635F | 6C6F | 756F | 0072 | 735F | 6174 | 7472 |

THU MAR 14 17:37:32 1991 GSPMON.4 PAGE 302, LINE 17760

| | | | | | | | | |
|---|---|---|---|---|---|---|---|---|
| 0001052760 | 6C5F | 6E69 | 0065 | 735F | 6F74 | 5F70 | 696C | 656E |
| 0001053000 | 5F00 | 7473 | 7261 | 5F74 | 6F63 | 006C | 735F | 6F74 |
| 0001053020 | 5F70 | 6F63 | 006C | 725F | 6365 | 5F74 | 756E | 006D |
| 0001053040 | 725F | 6365 | 5F74 | 7261 | 6172 | 0079 | 655F | 7478 |
| 0001053060 | 695F | 746E | 5F72 | 7470 | 0072 | 695F | 746E | 5F72 |
| 0001053100 | 756E | 006D | 615F | 756C | 6D5F | 646F | 0065 | 6D5F |
| 0001053120 | 6D65 | 705F | 616C | 656E | 5F00 | 6964 | 7073 | 615F |
| 0001053140 | 6C6C | 5F00 | 4446 | 4342 | 5F4B | 4944 | 0053 | 465F |
| 0001053160 | 4244 | 4B43 | 455F | 004E | 455F | 464E | 524F | 4543 |
| 0001053200 | 305F | 0042 | 4E5F | 524F | 414D | 5F4C | 0042 | 455F |
| 0001053220 | 464E | 524F | 4543 | 305F | 0041 | 4E5F | 524F | 414D |
| 0001053240 | 5F4C | 0041 | 6D5F | 7875 | 705F | 726F | 0074 | 565F |
| 0001053260 | 4449 | 505F | 524F | 0054 | 4D5F | 3242 | 505F | 524F |
| 0001053300 | 0054 | 4D5F | 3142 | 505F | 524F | 0054 | 4D5F | 3042 |
| 0001053320 | 505F | 524F | 0054 | 6D5F | 7361 | 5F6B | 6F70 | 616C |
| 0001053340 | 0072 | 505F | 4C4F | 495F | 564E | 5245 | 4553 | 5F00 |
| 0001053360 | 4F50 | 5F4C | 4F4E | 4D52 | 4C41 | 5F00 | 616D | 6B73 |
| 0001053400 | 655F | 616E | 6C62 | 0065 | 4D5F | 5341 | 5F4B | 4944 |
| 0001053420 | 0053 | 735F | 6472 | 765F | 6C61 | 6575 | 5F00 | 4956 |
| 0001053440 | 4544 | 5F4F | 4E49 | 5F00 | 4956 | 4544 | 5F4F | 554F |
| 0001053460 | 0054 | 735F | 6572 | 765F | 6C61 | 6575 | 5F00 | 4956 |
| 0001053500 | 4544 | 5F4F | 4944 | 0053 | 565F | 4449 | 4F45 | 455F |
| 0001053520 | 004E | 4D5F | 5F42 | 4E49 | 5754 | 0052 | 6D5F | 3462 |
| 0001053540 | 665F | 6E75 | 0063 | 4D5F | 3442 | 445F | 4649 | 5746 |
| 0001053560 | 0052 | 4D5F | 3442 | 455F | 5252 | 5257 | 5F00 | 626D |
| 0001053600 | 5F35 | 7566 | 636E | 5F00 | 7267 | 6261 | 5F32 | 6F6D |
| 0001053620 | 6564 | 5F00 | 5247 | 4241 | 5F32 | 464F | 0046 | 475F |
| 0001053640 | 4152 | 3242 | 4F5F | 004E | 635F | 6B68 | 736D | 5F6B |
| 0001053660 | 6E65 | 6261 | 5F00 | 4843 | 5F4B | 534D | 5F4B | 4E45 |
| 0001053700 | 5F00 | 4843 | 5F4B | 534D | 5F4B | 4944 | 0053 | 6D5F |
| 0001053720 | 6D65 | 625F | 6E61 | 006B | 475F | 4552 | 4E45 | 435F |
| 0001053740 | 0048 | 4F5F | 4556 | 4C52 | 5941 | 435F | 0048 | 705F |
| 0001053760 | 6572 | 6D5F | 646F | 0065 | 535F | 4C45 | 4345 | 4554 |
| 0001054000 | 0044 | 675F | 7073 | 745F | 6D69 | 7265 | 5F00 | 7768 |
| 0001054020 | 645F | 7065 | 6874 | 5F00 | 6373 | 775F | 6469 | 6874 |
| 0001054040 | 5F00 | 6373 | 685F | 6965 | 6867 | 0074 | 735F | 5F63 |
| 0001054060 | 6564 | 7470 | 0068 | 745F | 6D69 | 6F65 | 7475 | 765F |
| 0001054100 | 6C61 | 5F00 | 7973 | 636E | 745F | 6D69 | 6F65 | 7475 |
| 0001054120 | 765F | 6C61 | 5F00 | 7473 | 6261 | 6C69 | 7469 | 5F79 |
| 0001054140 | 6176 | 006C | 765F | 7265 | 6669 | 5F79 | 7473 | 6261 |
| 0001054160 | 6C69 | 7469 | 5F79 | 6176 | 006C | 745F | 7268 | 7365 |
| 0001054200 | 6F68 | 646C | 5F00 | 6C62 | 6E69 | 696B | 676E | 745F |
| 0001054220 | 7268 | 7365 | 6F68 | 646C | 5F00 | 7265 | 5F72 | 6C65 |
| 0001054240 | 6D65 | 745F | 7268 | 7365 | 6F68 | 646C | 5F00 | 6F61 |
| 0001054260 | 5F69 | 6F78 | 5F72 | 6F63 | 6F6C | 0072 | 695F | 746E |
| 0001054300 | 7265 | 616C | 6563 | 0064 | 6D5F | 6773 | 735F | 7A69 |
| 0001054320 | 0065 | 6C5F | 7961 | 7265 | 6E5F | 6D75 | 5F00 | 6C65 |
| 0001054340 | 6D65 | 635F | 756F | 746E | 5F00 | 6F68 | 6972 | 5F7A |
| 0001054360 | 6170 | 6172 | 006D | 735F | 7274 | 7069 | 645F | 7461 |
| 0001054400 | 0061 | 685F | 726F | 7A69 | 705F | 7261 | 6D61 | 5F00 |
| 0001054420 | 6576 | 7472 | 705F | 7261 | 6D61 | 5F00 | 6973 | 5F67 |
| 0001054440 | 6164 | 6174 | 5F00 | 6F68 | 6972 | 5F7A | 6170 | 6172 |
| 0001054460 | 006D | 765F | 7265 | 5F74 | 6170 | 6172 | 006D | 735F |
| 0001054500 | 6769 | 645F | 7461 | 0061 | 765F | 7265 | 6669 | 5F79 |
| 0001054520 | 6373 | 6572 | 6E65 | 705F | 6572 | 6573 | 636E | 0065 |
| 0001054540 | 735F | 7263 | 6565 | 5F6E | 7473 | 6261 | 6C69 | 7469 |
| 0001054560 | 0079 | 6C5F | 7961 | 7265 | 6E5F | 6D75 | 5F00 | 6964 |
| 0001054600 | 6666 | 705F | 7274 | 5F00 | 6170 | 6172 | 656D | 6574 |
| 0001054620 | 5F72 | 6F63 | 6564 | 5F00 | 6170 | 6172 | 656D | 6574 |

THU MAR 14 17:37:32 1991 GSPMON.4 PAGE 303, LINE 17819

| | | | | | | | | |
|---|---|---|---|---|---|---|---|---|
| 0001054640 | 5F72 | 6176 | 006C | 6D5F | 7361 | 5F6B | 6962 | 0074 |
| 0001054660 | 665F | 6C69 | 6574 | 5F72 | 756E | 006D | 685F | 5F77 |
| 0001054700 | 6C70 | 6E61 | 0065 | 635F | 6D6F | 6170 | 6572 | 735F |
| 0001054720 | 6174 | 6574 | 665F | 676C | 5F00 | 6863 | 6E61 | 6567 |
| 0001054740 | 735F | 6174 | 6574 | 665F | 676C | 5F00 | 7266 | 6D61 |
| 0001054760 | 5F65 | 6F63 | 6E75 | 0074 | 735F | 6174 | 6C62 | 5F65 |
| 0001055000 | 6F63 | 6E75 | 0074 | 635F | 6E6F | 7274 | 6C6F | 705F |
| 0001055020 | 7274 | 5F00 | 6F6D | 7375 | 5F65 | 7665 | 6E65 | 5F74 |
| 0001055040 | 6573 | 746E | 705F | 7274 | 5F00 | 6369 | 6E6F | 735F |
| 0001055060 | 6165 | 6372 | 5F68 | 7470 | 0072 | 695F | 6F63 | 5F6E |
| 0001055100 | 7274 | 6E61 | 5F73 | 7470 | 0072 | 735F | 7263 | 625F |
| 0001055120 | 5F67 | 6F63 | 6F6C | 7275 | 5F00 | 7068 | 635F | 6F72 |
| 0001055140 | 7373 | 635F | 6C6F | 756F | 0072 | 735F | 6174 | 7472 |
| 0001055160 | 6C5F | 6E69 | 0065 | 735F | 6F74 | 5F70 | 696C | 656E |
| 0001055200 | 5F00 | 7473 | 7261 | 5F74 | 6F63 | 006C | 735F | 6F74 |
| 0001055220 | 5F70 | 6F63 | 006C | 725F | 6365 | 5F74 | 756E | 006D |
| 0001055240 | 725F | 6365 | 5F74 | 7261 | 6172 | 0079 | 675F | 5F70 |
| 0001055260 | 7363 | 5F76 | 7061 | 696C | 0063 | 615F | 756C | 6D5F |
| 0001055300 | 646F | 0065 | 6D5F | 6D65 | 705F | 616C | 656E | 5F00 |
| 0001055320 | 6964 | 7073 | 615F | 6C6C | 5F00 | 4446 | 4342 | 5F4B |
| 0001055340 | 4944 | 0053 | 465F | 4244 | 4B43 | 455F | 004E | 455F |
| 0001055360 | 464E | 524F | 4543 | 305F | 0042 | 4E5F | 524F | 414D |
| 0001055400 | 5F4C | 0042 | 455F | 464E | 524F | 4543 | 305F | 0041 |
| 0001055420 | 4E5F | 524F | 414D | 5F4C | 0041 | 6D5F | 7875 | 705F |
| 0001055440 | 726F | 0074 | 565F | 4449 | 505F | 524F | 0054 | 4D5F |
| 0001055460 | 3242 | 505F | 524F | 0054 | 4D5F | 3142 | 505F | 524F |
| 0001055500 | 0054 | 4D5F | 3042 | 505F | 524F | 0054 | 6D5F | 7361 |
| 0001055520 | 5F6B | 6F70 | 616C | 0072 | 505F | 4C4F | 495F | 564E |
| 0001055540 | 5245 | 4553 | 5F00 | 4F50 | 5F4C | 4F4E | 4D52 | 4C41 |
| 0001055560 | 5F00 | 616D | 6B73 | 655F | 616E | 6C62 | 0065 | 4D5F |
| 0001055600 | 5341 | 5F4B | 4944 | 0053 | 735F | 6472 | 765F | 6C61 |
| 0001055620 | 6575 | 5F00 | 4956 | 4544 | 5F4F | 4E49 | 5F00 | 4956 |
| 0001055640 | 4544 | 5F4F | 554F | 0054 | 735F | 6572 | 765F | 6C61 |
| 0001055660 | 6575 | 5F00 | 4956 | 4544 | 5F4F | 4944 | 0053 | 565F |
| 0001055700 | 4449 | 4F45 | 455F | 004E | 4D5F | 5F42 | 4E49 | 5754 |
| 0001055720 | 0052 | 6D5F | 3462 | 665F | 6E75 | 0063 | 4D5F | 3442 |
| 0001055740 | 445F | 4649 | 5746 | 0052 | 4D5F | 3442 | 455F | 5252 |
| 0001055760 | 5257 | 5F00 | 626D | 5F35 | 7566 | 636E | 5F00 | 7267 |
| 0001056000 | 6261 | 5F32 | 6F6D | 6564 | 5F00 | 5247 | 4241 | 5F32 |
| 0001056020 | 464F | 0046 | 475F | 4152 | 3242 | 4F5F | 004E | 635F |
| 0001056040 | 6B68 | 736D | 5F6B | 6E65 | 6261 | 5F00 | 4843 | 5F4B |
| 0001056060 | 534D | 5F4B | 4E45 | 5F00 | 4843 | 5F4B | 534D | 5F4B |
| 0001056100 | 4944 | 0053 | 6D5F | 6D65 | 625F | 6E61 | 006B | 475F |
| 0001056120 | 4552 | 4E45 | 435F | 0048 | 4F5F | 4556 | 4C52 | 5941 |
| 0001056140 | 435F | 0048 | 705F | 6572 | 6D5F | 646F | 0065 | 535F |
| 0001056160 | 4C45 | 4345 | 4554 | 0044 | 615F | 756C | 6D5F | 646F |
| 0001056200 | 0065 | 675F | 7073 | 745F | 6D69 | 7265 | 5F00 | 7768 |
| 0001056220 | 645F | 7065 | 6874 | 5F00 | 6373 | 775F | 6469 | 6874 |
| 0001056240 | 5F00 | 6373 | 685F | 6965 | 6867 | 0074 | 735F | 5F63 |
| 0001056260 | 6564 | 7470 | 0068 | 745F | 6D69 | 6F65 | 7475 | 765F |
| 0001056300 | 6C61 | 5F00 | 7973 | 636E | 745F | 6D69 | 6F65 | 7475 |
| 0001056320 | 765F | 6C61 | 5F00 | 7473 | 6261 | 6C69 | 7469 | 5F79 |
| 0001056340 | 6176 | 006C | 765F | 7265 | 6669 | 5F79 | 7473 | 6261 |
| 0001056360 | 6C69 | 7469 | 5F79 | 6176 | 006C | 745F | 7268 | 7365 |
| 0001056400 | 6F68 | 646C | 5F00 | 6C62 | 6E69 | 696B | 676E | 745F |
| 0001056420 | 7268 | 7365 | 6F68 | 646C | 5F00 | 7265 | 5F72 | 6C65 |
| 0001056440 | 6D65 | 745F | 7268 | 7365 | 6F68 | 646C | 5F00 | 6F61 |
| 0001056460 | 5F69 | 6F78 | 5F72 | 6F63 | 6F6C | 0072 | 695F | 746E |
| 0001056500 | 7265 | 616C | 6563 | 0064 | 6D5F | 6773 | 735F | 7A69 |

THU MAR 14 17:37:32 1991 GSPMON.4 PAGE 304, LINE 17878

| | | | | | | | | |
|---|---|---|---|---|---|---|---|---|
| 0001056520 | 0065 | 6C5F | 7961 | 7265 | 6E5F | 6D75 | 5F00 | 6C65 |
| 0001056540 | 6D65 | 635F | 756F | 746E | 5F00 | 6F68 | 6972 | 5F7A |
| 0001056560 | 6170 | 6172 | 006D | 735F | 7274 | 7069 | 645F | 7461 |
| 0001056600 | 0061 | 685F | 726F | 7A69 | 705F | 7261 | 6D61 | 5F00 |
| 0001056620 | 6576 | 7472 | 705F | 7261 | 6D61 | 5F00 | 6973 | 5F67 |
| 0001056640 | 6164 | 6174 | 5F00 | 6F68 | 6972 | 5F7A | 6170 | 6172 |
| 0001056660 | 006D | 765F | 7265 | 5F74 | 6170 | 6172 | 006D | 735F |
| 0001056700 | 6769 | 645F | 7461 | 0061 | 765F | 7265 | 6669 | 5F79 |
| 0001056720 | 6373 | 6572 | 6E65 | 705F | 6572 | 6573 | 636E | 0065 |
| 0001056740 | 735F | 7263 | 6565 | 5F6E | 7473 | 6261 | 6C69 | 7469 |
| 0001056760 | 0079 | 6C5F | 7961 | 7265 | 6E5F | 6D75 | 5F00 | 6964 |
| 0001057000 | 6666 | 705F | 7274 | 5F00 | 6170 | 6172 | 656D | 6574 |
| 0001057020 | 5F72 | 6F63 | 6564 | 5F00 | 6170 | 6172 | 656D | 6574 |
| 0001057040 | 5F72 | 6176 | 006C | 6D5F | 7361 | 5F6B | 6962 | 0074 |
| 0001057060 | 665F | 6C69 | 6574 | 5F72 | 756E | 006D | 685F | 5F77 |
| 0001057100 | 6C70 | 6E61 | 0065 | 635F | 6D6F | 6170 | 6572 | 735F |
| 0001057120 | 6174 | 6574 | 665F | 676C | 5F00 | 6B63 | 6E61 | 6567 |
| 0001057140 | 735F | 6174 | 6574 | 665F | 676C | 5F00 | 7266 | 6D61 |
| 0001057160 | 5F65 | 6F63 | 6E75 | 0074 | 735F | 6174 | 6C62 | 5F65 |
| 0001057200 | 6F63 | 6E75 | 0074 | 635F | 6E6F | 7274 | 6C6F | 705F |
| 0001057220 | 7274 | 5F00 | 6F6D | 7375 | 5F65 | 7665 | 6E65 | 5F74 |
| 0001057240 | 6573 | 746E | 705F | 7274 | 5F00 | 6369 | 6E6F | 735F |
| 0001057260 | 6165 | 6372 | 5F68 | 7470 | 0072 | 695F | 6F63 | 5F6E |
| 0001057300 | 7274 | 6E61 | 5F73 | 7470 | 0072 | 735F | 7263 | 625F |
| 0001057320 | 5F67 | 6F63 | 6F6C | 7275 | 5F00 | 7068 | 635F | 6F72 |
| 0001057340 | 7373 | 635F | 6C6F | 756F | 0072 | 735F | 6174 | 7472 |
| 0001057360 | 6C5F | 6E69 | 0065 | 735F | 6F74 | 5F70 | 696C | 656E |
| 0001057400 | 5F00 | 7473 | 7261 | 5F74 | 6F63 | 006C | 735F | 6F74 |
| 0001057420 | 5F70 | 6F63 | 006C | 725F | 6365 | 5F74 | 756E | 006D |
| 0001057440 | 725F | 6365 | 5F74 | 7261 | 6172 | 0079 | 705F | 616D |
| 0001057460 | 6B73 | 705F | 7274 | 5F00 | 6F63 | 746E | 6F72 | 5F6C |
| 0001057500 | 7470 | 0072 | 705F | 616D | 6B73 | 745F | 6D65 | 0070 |
| 0001057520 | 635F | 6E6F | 7274 | 6C6F | 745F | 6D65 | 0070 | 765F |
| 0001057540 | 6469 | 725F | 6765 | 5F73 | 6E69 | 7469 | 5F00 | 7067 |
| 0001057560 | 6C5F | 7475 | 695F | 696E | 0074 | 695F | 696E | 5F74 |
| 0001057600 | 6572 | 0067 | 675F | 5F70 | 656D | 7361 | 7275 | 5F65 |
| 0001057620 | 6974 | 656D | 5F00 | 7067 | 735F | 7465 | 705F | 7261 |
| 0001057640 | 6D61 | 7465 | 7265 | 5F00 | 7067 | 665F | 6572 | 7A65 |
| 0001057660 | 0065 | 675F | 5F70 | 6573 | 5F74 | 616D | 6B73 | 5F00 |
| 0001057700 | 7067 | 6D5F | 6C61 | 6F6C | 0063 | 675F | 5F70 | 666D |
| 0001057720 | 6572 | 0065 | 675F | 5F70 | 7267 | 6261 | 625F | 7079 |
| 0001057740 | 7361 | 0073 | 675F | 5F70 | 6573 | 5F74 | 6F61 | 0069 |
| 0001057760 | 665F | 6C69 | 6574 | 5F72 | 7470 | 0072 | 665F | 6C69 |
| 0001060000 | 6574 | 5F72 | 756E | 006D | 6C5F | 6E69 | 5F65 | 666F |
| 0001060020 | 7366 | 7465 | 5F00 | 6572 | 7463 | 6F5F | 6666 | 6573 |
| 0001060040 | 0074 | 725F | 6365 | 5F74 | 6977 | 7464 | 0068 | 725F |
| 0001060060 | 6365 | 5F74 | 6568 | 6769 | 7468 | 5F00 | 7067 | 735F |
| 0001060100 | 7465 | 665F | 6C69 | 6574 | 0072 | 735F | 7465 | 705F |
| 0001060120 | 616C | 656E | 6D5F | 7361 | 006B | 6D5F | 7361 | 5F6B |
| 0001060140 | 6970 | 6578 | 006C | 6D5F | 7361 | 5F6B | 6C70 | 6E61 |
| 0001060160 | 0065 | 725F | 7365 | 7465 | 705F | 616C | 656E | 6D5F |
| 0001060200 | 7361 | 006B | 675F | 5F70 | 6F61 | 5F69 | 6168 | 646E |
| 0001060220 | 656C | 0072 | 675F | 5F70 | 7962 | 6170 | 7373 | 5F00 |
| 0001060240 | 6D6A | 5F70 | 7562 | 6666 | 7265 | 5F00 | 7563 | 7272 |
| 0001060260 | 6E65 | 5F74 | 6F6D | 6564 | 5F00 | 6F68 | 7473 | 7473 |
| 0001060300 | 7461 | 5F00 | 6E69 | 685F | 736F | 5F74 | 6E69 | 0074 |
| 0001060320 | 735F | 7379 | 655F | 6378 | 7065 | 6974 | 6E6F | 5F00 |
| 0001060340 | 7566 | 636E | 745F | 6261 | 656C | 5F00 | 7361 | 5F6D |
| 0001060360 | 6E69 | 3374 | 0030 | 6D5F | 7361 | 5F6B | 6F6D | 6564 |

THU MAR 14 17:37:32 1991 GSPMON.4 PAGE 305, LINE 17937

| | | | | | | | | |
|---|---|---|---|---|---|---|---|---|
| 0001060400 | 5F00 | 6574 | 706D | 635F | 6572 | 3067 | 5F00 | 6574 |
| 0001060420 | 706D | 635F | 6572 | 3267 | 5F00 | 706F | 5F63 | 6F63 |
| 0001060440 | 666E | 5F00 | 7973 | 5F73 | 6173 | 6576 | 725F | 6765 |
| 0001060460 | 0073 | 635F | 7275 | 6572 | 746E | 625F | 6E61 | 006B |
| 0001060500 | 725F | 6465 | 6375 | 6465 | 615F | 7272 | 5F00 | 7473 |
| 0001060520 | 6972 | 5F70 | 666F | 7366 | 7465 | 5F00 | 6572 | 7463 |
| 0001060540 | 6F5F | 6666 | 6573 | 0074 | 665F | 6172 | 656D | 5F73 |
| 0001060560 | 7266 | 6D6F | 6C5F | 7361 | 5F74 | 6863 | 6E61 | 6567 |
| 0001060600 | 5F00 | 696C | 656E | 6F5F | 6666 | 6573 | 0074 | 735F |
| 0001060620 | 6174 | 6962 | 696C | 7974 | 635F | 6568 | 6B63 | 6F5F |
| 0001060640 | 006E | 735F | 7465 | 705F | 6F70 | 0070 | 725F | 6E75 |
| 0001060660 | 6E5F | 726F | 616D | 006C | 705F | 7469 | 6863 | 6F5F |
| 0001060700 | 6666 | 6573 | 0074 | 705F | 7475 | 725F | 6365 | 0074 |
| 0001060720 | 735F | 7263 | 6565 | 5F6E | 6F63 | 666E | 6769 | 5F00 |
| 0001060740 | 7265 | 6F72 | 5F72 | 6F63 | 6E75 | 0074 | 725F | 6E75 |
| 0001060760 | 635F | 6972 | 6974 | 6163 | 006C | 675F | 5F70 | 7563 |
| 0001061000 | 7272 | 6E65 | 5F74 | 7266 | 6565 | 657A | 6F5F | 7470 |
| 0001061020 | 6F69 | 006E | 685F | 5F77 | 6564 | 7470 | 0068 | 675F |
| 0001061040 | 7465 | 725F | 6365 | 0074 | 735F | 7465 | 635F | 6C6F |
| 0001061060 | 726F | 0031 | 675F | 5F70 | 6C66 | 6761 | 0073 | 705F |
| 0001061100 | 7469 | 6863 | 775F | 726F | 5F64 | 666F | 7366 | 7465 |
| 0001061120 | 5F00 | 6570 | 6B65 | 625F | 6572 | 0067 | 6C5F | 6E69 |
| 0001061140 | 5F65 | 6F77 | 6472 | 6F5F | 6666 | 6573 | 0074 | 6D5F |
| 0001061160 | 766F | 5F65 | 6572 | 7463 | 5F00 | 7266 | 6D61 | 5F65 |
| 0001061200 | 6973 | 657A | 625F | 5F00 | 7865 | 6570 | 7463 | 6465 |
| 0001061220 | 735F | 7274 | 7069 | 645F | 7461 | 0061 | 655F | 7078 |
| 0001061240 | 6365 | 6574 | 5F64 | 6973 | 5F67 | 6164 | 6174 | 5F00 |
| 0001061260 | 7973 | 636E | 6D5F | 7361 | 006B | 635F | 7061 | 6576 |
| 0001061300 | 5F72 | 616D | 6B73 | 5F00 | 6163 | 7370 | 6769 | 6D5F |
| 0001061320 | 7361 | 006B | 655F | 6378 | 5F70 | 616D | 6B73 | 5F00 |
| 0001061340 | 6564 | 6166 | 6C75 | 5F74 | 616D | 6B73 | 5F00 | 7865 |
| 0001061360 | 6570 | 7463 | 6465 | 6C5F | 636F | 735F | 6E79 | 5F63 |
| 0001061400 | 6164 | 6174 | 5F00 | 6373 | 6572 | 6E65 | 735F | 7A69 |
| 0001061420 | 5F65 | 0062 | 765F | 7265 | 6669 | 5F79 | 7473 | 6261 |
| 0001061440 | 6C69 | 7469 | 5F79 | 6176 | 756C | 0065 | 735F | 6174 |
| 0001061460 | 6962 | 696C | 7974 | 765F | 6C61 | 6575 | 5F00 | 7768 |
| 0001061500 | 775F | 6469 | 6874 | 5F00 | 6C62 | 6E69 | 696B | 676E |
| 0001061520 | 745F | 7268 | 7365 | 6F68 | 646C | 5F00 | 6874 | 6572 |
| 0001061540 | 6873 | 6C6F | 0064 | 735F | 6769 | 655F | 656C | 5F6D |
| 0001061560 | 6874 | 6572 | 6873 | 6C6F | 0064 | 695F | 746E | 7265 |
| 0001061600 | 616C | 6563 | 0064 | 745F | 6D69 | 6F65 | 7475 | 765F |
| 0001061620 | 6C61 | 6575 | 5F00 | 7973 | 636E | 745F | 6D69 | 6F65 |
| 0001061640 | 7475 | 765F | 6C61 | 6575 | 5F00 | 7265 | 6F72 | 5F72 |
| 0001061660 | 766F | 0066 | 655F | 7272 | 635F | 746E | 6F5F | 6676 |
| 0001061700 | 5F00 | 7265 | 6F72 | 5F72 | 6F63 | 6E75 | 5F74 | 7470 |
| 0001061720 | 0072 | 735F | 6174 | 6962 | 696C | 7974 | 665F | 676C |
| 0001061740 | 5F00 | 6373 | 6572 | 6E65 | 6F5F | 6666 | 6573 | 0074 |
| 0001061760 | 735F | 7263 | 6565 | 5F6E | 6F77 | 6472 | 6F5F | 6666 |
| 0001062000 | 6573 | 0074 | 6C5F | 7361 | 5F74 | 696C | 656E | 5F00 |
| 0001062020 | 6966 | 6C6C | 725F | 6365 | 0074 | 765F | 7261 | 695F |
| 0001062040 | 696E | 0074 | | | | | | |
| 0001062044 | | | | | | | | |

THU MAR 14 17:38:52 1991 IFD.SYS PAGE 1, LINE 1

| | | | | | | | | |
|---|---|---|---|---|---|---|---|---|
| 0000000000 | 5A4D | 00B6 | 0005 | 0000 | 0004 | 0000 | FFFF | 0000 |
| 0000000020 | 00B6 | 0000 | 0000 | 0000 | 0040 | 0000 | 0000 | 0000 |
| 0000000040 | 0000 | 0000 | 0000 | 0000 | 0000 | 0000 | 0000 | 0000 |
| 0000000060 | 0000 | 0000 | 0000 | 0000 | 0000 | 0000 | 0080 | 0000 |
| 0000000100 | 1F0E | 0EBA | B400 | CD09 | B821 | 4C01 | 21CD | 6854 |
| 0000000120 | 7369 | 7020 | 6F72 | 7267 | 6D61 | 6320 | 6E61 | 6F6E |
| 0000000140 | 2074 | 7572 | 206E | 6E69 | 4420 | 534F | 6D20 | 646F |
| 0000000160 | 2E65 | 0D0D | 240A | 0000 | 0000 | 0000 | 0000 | 0000 |
| 0000000200 | 454E | 0A05 | 0063 | 0002 | 3E49 | CD2C | 8009 | 0001 |
| 0000000220 | 0000 | 0000 | 0000 | 0000 | 0000 | 0000 | 0002 | 0001 |
| 0000000240 | 000D | 0040 | 0050 | 0050 | 0057 | 0059 | 00E5 | 0000 |
| 0000000260 | 0000 | 0004 | 0000 | 0001 | 0000 | 0000 | 0000 | 0000 |
| 0000000300 | 0010 | 0180 | 0C21 | 0180 | 0028 | 062C | 0D00 | 062C |
| 0000000320 | 4903 | 4446 | 0000 | 0100 | 0000 | 4408 | 534F | 4143 |
| 0000000340 | 4C4C | 0053 | 0900 | 5C2E | 6669 | 2E64 | 6C64 | 006C |
| 0000000360 | 0000 | 0000 | 0000 | 0000 | 0000 | 0000 | 0000 | 0000 |
| 0000000400 | FFFF | FFFF | 8880 | 0000 | 0000 | 5553 | 4954 | 544E |
| 0000000420 | 5245 | 0000 | 0000 | 0000 | 0000 | 0000 | 0000 | 0000 |
| 0000000440 | 0000 | 03FB | 0043 | 0043 | 0043 | 007C | 0143 | 0147 |
| 0000000460 | 014B | 00E1 | 014F | 0153 | 0157 | 0043 | 0047 | 015F |
| 0000000500 | 0043 | 017B | 0043 | 0043 | 0043 | 015B | 0000 | 0000 |
| 0000000520 | 0000 | 0000 | 0300 | 0000 | 0FE2 | 0000 | 0FFE | 0000 |
| 0000000540 | 0000 | 0000 | 0800 | 0000 | 0000 | 0000 | 0000 | F000 |
| 0000000560 | 00CD | E000 | 00CD | 0000 | 000F | 000E | 0000 | 000F |
| 0000000600 | 000A | 000A | 000A | 0001 | 0A0D | 5553 | 2054 | 6E49 |
| 0000000620 | 6574 | 6672 | 6361 | 2065 | 7244 | 7669 | 7265 | 7620 |
| 0000000640 | 7265 | 6973 | 6E6F | 3120 | 3131 | 3220 | 2E30 | 2E32 |
| 0000000660 | 3139 | 0A0D | 7245 | 6F72 | 2072 | 6E69 | 6920 | 746E |
| 0000000700 | 7265 | 7572 | 7470 | 6420 | 6665 | 6E69 | 7469 | 6F69 |
| 0000000720 | 206E | 0A0D | 4920 | 746E | 6420 | 6665 | 0D20 | 490A |
| 0000000740 | 746E | 7265 | 7572 | 7470 | 4620 | 0D20 | 490A | 746E |
| 0000000760 | 7265 | 7572 | 7470 | 4320 | 0D20 | 450A | 7272 | 726F |
| 0000001000 | 6920 | 206E | 6441 | 7264 | 7365 | 7373 | 6420 | 6665 |
| 0000001020 | 6E69 | 7469 | 6F69 | 206E | 0A0D | 6441 | 7264 | 7365 |
| 0000001040 | 2073 | 6E69 | 4520 | 5020 | 6761 | 2065 | 0A0D | 6441 |
| 0000001060 | 7264 | 7365 | 2073 | 6E69 | 4320 | 5020 | 6761 | 2065 |
| 0000001100 | 0A0D | 0A0D | 530A | 5455 | 4920 | 746E | 7265 | 6166 |
| 0000001120 | 6563 | 4420 | 6972 | 6576 | 2072 | 6241 | 726F | 6574 |
| 0000001140 | 0D64 | 0D0A | 200A | 2020 | 2020 | 2020 | 2020 | 2020 |
| 0000001160 | 2020 | 2020 | 2020 | 5244 | 5649 | 5245 | 4D20 | 4753 |
| 0000001200 | 8B26 | 027F | E781 | 00FF | FF83 | 7E14 | E806 | 0033 |
| 0000001220 | 07EB | 0390 | FFFF | 2295 | 2600 | 4789 | CB03 | 5350 |
| 0000001240 | C752 | 7606 | 0100 | B800 | 5555 | AABB | B2AA | FF05 |
| 0000001260 | 1A1E | FA00 | 78A0 | B200 | FF31 | 1A1E | 5A00 | 585B |
| 0000001300 | FBF8 | B8CB | 8103 | 53C3 | 06C7 | 0076 | 0001 | 06C7 |
| 0000001320 | 0060 | 0000 | 06C7 | 0064 | 0800 | 06C7 | 0068 | 0000 |
| 0000001340 | 1E8B | 0078 | 00B6 | 1BB2 | 1EB8 | FF00 | 1A1E | 7300 |
| 0000001360 | B806 | 810C | D4EB | B890 | 0100 | C35B | 5306 | 64E8 |
| 0000001400 | 8B03 | 4C1E | A100 | 004E | 0E8B | 0050 | 01B6 | 15B2 |
| 0000001420 | 1EFF | 001A | 0673 | 0BB8 | EB81 | 9043 | E0B8 | 2B0F |
| 0000001440 | 6406 | 8B00 | 500E | 8B00 | 83D9 | 0AEB | 0078 | D98B |
| 0000001460 | D82B | C51E | 6436 | 7800 | 8B18 | D1C8 | FCE9 | A5F3 |
| 0000001500 | D88C | 8B1F | BBCB | 0800 | 1E89 | 0064 | F38B | 8E1E |
| 0000001520 | D1D8 | FCE9 | A5F3 | 891F | 6436 | B800 | 0100 | 075B |
| 0000001540 | 06C3 | E853 | 02FF | 8B1E | 4C1E | A100 | 004E | 0E8B |
| 0000001560 | 0050 | 00B6 | 15B2 | 1EFF | 001A | 0673 | 0AB8 | EB81 |
| 0000001600 | 903F | DA8C | C41F | 603E | B800 | 0800 | 062B | 0060 |
| 0000001620 | 0E8B | 0050 | D98B | D82B | 1678 | 8B1E | D1C8 | 8EE9 |
| 0000001640 | FCDA | A5F3 | 8B1F | BBCB | 0000 | 1E89 | 0060 | FB8B |

THU MAR 14 17:38:52 1991 IFD.SYS PAGE 2, LINE 60

| | | | | | | | | |
|---|---|---|---|---|---|---|---|---|
| 0000001660 | 8E1E | D1DA | FCE9 | A5F3 | 891F | 603E | B800 | 0100 |
| 0000001700 | 075B | B8C3 | 0100 | B8C3 | 0100 | B8C3 | 0100 | B8C3 |
| 0000001720 | 0100 | B8C3 | 0100 | B8C3 | 0100 | B8C3 | 0100 | 53C3 |
| 0000001740 | 1E8B | 0078 | 1CB2 | 1EFF | 001A | 55B8 | BB55 | AAAA |
| 0000001760 | 05B2 | 1EFF | 001A | 00B8 | 5B01 | 06C3 | 2653 | 478B |
| 0000002000 | 3C0D | 7580 | EB2C | 9013 | 01B7 | 01F6 | 020D | 0256 |
| 0000002020 | 0286 | 029B | 02F2 | 0330 | 0387 | FC80 | 7200 | 8012 |
| 0000002040 | 08FC | 0D77 | 00B0 | C486 | F88B | FF03 | FF2E | 88A5 |
| 0000002060 | B801 | 8103 | 76E9 | A101 | 0076 | C00B | 1D75 | 1EC4 |
| 0000002100 | 0058 | C726 | 5507 | B855 | 5555 | AABB | BFAA | FFFF |
| 0000002120 | FFB9 | B6FF | B200 | FF04 | 1A1E | C400 | 5C1E | 2600 |
| 0000002140 | 078B | 06C7 | 0076 | 0000 | 075B | 5306 | C426 | 135F |
| 0000002160 | 8926 | E907 | 0134 | C426 | 0F5F | 8B26 | C707 | 5206 |
| 0000002200 | FC00 | C40F | 521E | 2600 | 0789 | 1DE9 | C701 | 5206 |
| 0000002220 | EC00 | C40F | 523E | 8B00 | 601E | 2600 | 1D89 | 06C7 |
| 0000002240 | 0052 | 0FEE | 3EC4 | 0052 | 8B26 | 2B05 | 6806 | 5B00 |
| 0000002260 | 0607 | 2653 | 5FC4 | 2613 | 0789 | C00B | 0F75 | 06C7 |
| 0000002300 | 0052 | 0FFC | 1EC4 | 0052 | C726 | 1107 | A100 | 0060 |
| 0000002320 | 68A3 | E900 | 00D4 | 06C7 | 0052 | 0FF2 | 3EC4 | 0052 |
| 0000002340 | 1E8B | 0064 | 8926 | C71D | 5206 | F000 | C40F | 523E |
| 0000002360 | 2600 | 058B | 062B | 0064 | 075B | 5306 | C426 | 135F |
| 0000002400 | 8926 | E907 | 00A4 | 06C7 | 0064 | 0800 | 06C7 | 0060 |
| 0000002420 | 0000 | 06C7 | 0068 | 0000 | 8FE9 | 2600 | 5FC4 | 260F |
| 0000002440 | 178B | 8B26 | 024F | F981 | 07D0 | 407F | 8B26 | 0847 |
| 0000002460 | C426 | 047F | 5250 | C08C | 00B6 | 27B2 | 1EFF | 001A |
| 0000002500 | 585A | 2872 | F78B | 8B06 | BFD9 | 0000 | 3E89 | 0052 |
| 0000002520 | 3EC4 | 0052 | D11F | FCE9 | A5F3 | 8926 | BF05 | 0FFA |
| 0000002540 | 8926 | BF15 | 0FF8 | 8926 | EB1D | 903F | 03B8 | EB81 |
| 0000002560 | 903C | 1EC4 | 006A | 00B8 | 2610 | 07C7 | 5555 | C726 |
| 0000002600 | 5507 | 2655 | 07C7 | 5555 | C726 | 5507 | 2655 | 07C7 |
| 0000002620 | 5555 | 7548 | C7E4 | 6406 | 0000 | C708 | 6006 | 0000 |
| 0000002640 | C700 | 6806 | 0000 | EB00 | 9001 | 00B8 | 5B01 | C307 |
| 0000002660 | C426 | 0F5F | 8B26 | A307 | 0060 | 8B26 | 0247 | 50A3 |
| 0000002700 | 2600 | 7FC4 | 8B04 | 8CF7 | C4C2 | 603E | B800 | 0FFC |
| 0000002720 | 062B | 0060 | 0E8B | 0050 | D38B | D82B | 1678 | 8B1E |
| 0000002740 | D1C8 | 8EE9 | FCDA | A5F3 | 8B1F | BBCB | 0000 | 1E89 |
| 0000002760 | 0060 | FB8B | 8E1E | D1DA | FCE9 | A5F3 | 891F | 603E |
| 0000003000 | B800 | 0100 | 075B | 26C3 | 5FC4 | 260F | 078B | 64A3 |
| 0000003020 | 2600 | 478B | A302 | 0050 | 075B | 5306 | C426 | 137F |
| 0000003040 | FCB8 | 2B0F | 6406 | 8B00 | 500E | 8B00 | 83D9 | 0AEB |
| 0000003060 | 0078 | D98B | D82B | C51E | 6436 | 7800 | 8B18 | D1C8 |
| 0000003100 | FCE9 | A5F3 | D88C | 8B1F | BBCB | 0000 | 1E89 | 0064 |
| 0000003120 | F38B | 8E1E | D1D8 | FCE9 | A5F3 | 891F | 6436 | B800 |
| 0000003140 | 0100 | 075B | 26C3 | 478B | A30E | 004C | 8B26 | 1047 |
| 0000003160 | 4EA3 | 2600 | 478B | A312 | 0050 | 6AC3 | 1E01 | 8868 |
| 0000003200 | 6A00 | 1E2C | 1E68 | 9A00 | FFFF | 0000 | 5306 | 2652 |
| 0000003220 | 5FC4 | 2612 | 178A | FA80 | 7400 | 8038 | 49FA | 3674 |
| 0000003240 | FA80 | 7441 | 4303 | EBEB | 2643 | 178A | FA80 | 7400 |
| 0000003260 | 8022 | 3DFA | EF75 | 2643 | 178A | FA80 | 7400 | 8014 |
| 0000003300 | 30FA | 027F | DFEB | FA80 | 7F39 | 800E | 30EA | 47EB |
| 0000003320 | EB90 | E9D2 | 00DD | 72EB | 8090 | 41FA | 0575 | 0AB2 |
| 0000003340 | 35EB | 8090 | 42FA | 0575 | 0BB2 | 2BEB | 8090 | 43FA |
| 0000003360 | 0575 | 0CB2 | 21EB | 8090 | 44FA | 0575 | 0DB2 | 17EB |
| 0000003400 | 8090 | 45FA | 0575 | 0EB2 | 0DEB | 8090 | 46FA | 0575 |
| 0000003420 | 0FB2 | 03EB | EB90 | B6BA | C100 | 08E2 | C283 | B80D |
| 0000003440 | F000 | 6EA3 | B800 | E000 | 72A3 | 8900 | 7016 | 8900 |
| 0000003460 | 7416 | E900 | FF6F | 016A | 681E | 00FB | 1F6A | 681E |
| 0000003500 | 001E | 089A | 0004 | E900 | FF5B | 2643 | 178A | FA80 |
| 0000003520 | 7400 | 8060 | 3DFA | BD75 | 2643 | 178A | FA80 | 7400 |

THU MAR 14 17:38:52 1991 IFD.SYS PAGE 3, LINE 119

```
0000003540  8052  46FA  1A75  06C7  0078  000F  016A  681E
0000003560  00DF  0E6A  681E  001E  C39A  0004  E900  FF25
0000003600  FA80  7543  C71A  7806  0C00  6A00  1E01  ED68
0000003620  6A00  1E0E  1E68  9A00  04F9  0000  06E9  6AFF
0000003640  1E01  B468  6A00  1E20  1E68  9A00  0518  0000
0000003660  F2E9  5AFE  075B  8B26  0E47  1AA3  2600  478B
0000003700  A310  001C  C726  0E47  03FB  C726  1047  0088
0000003720  5306  02B9  8C00  8ED8  BFC0  0054  2DB2  1EFF
0000003740  001A  4672  368B  0054  3689  0062  3689  005A
0000003760  3689  0066  3689  005E  1E8B  006E  70A1  B900
0000004000  1000  2EB2  1EFF  001A  2072  368B  0056  3689
0000004020  006C  1E8B  0072  74A1  B900  0100  2EB2  1EFF
0000004040  001A  0672  075B  00B8  C301  016A  681E  0142
0000004060  216A  681E  001E  2C9A  0005  5B00  2607  47C7
0000004100  000E  2600  47C7  0010  B800  810C  E8C3  0012
0000004120  075B  C726  0E47  0000  C726  1047  0000  0CB8
0000004140  C381  D88B  0CB1  E8D3  3004  65A2  8B01  B1C3
0000004160  D304  B1E0  D30C  04E8  A230  0166  C38B  08B1
0000004200  E0D3  0CB1  E8D3  3004  67A2  8B01  B1C3  D30C
0000004220  B1E0  D30C  04E8  A230  0168  016A  681E  0163
0000004240  1D6A  681E  001E  B79A  0005  C300  0001  0103
0000004260  0627  0001  008A  424E  3230  0011  0000  0700
0000004300  736F  2E32  696C  0162  0600  0001  0800  0000
0000004320  0900  4E00  3042  2532  0000  4100
0000004333
```

THU MAR 14 17:39:32 1991 IH.DLL PAGE 1, LINE 1

| | | | | | | | | |
|---|---|---|---|---|---|---|---|---|
| 0000000000 | 5A4D | 00FF | 0060 | 0000 | 0004 | 0000 | FFFF | 0000 |
| 0000000020 | 00B6 | 0000 | 0000 | 0000 | 0040 | 0000 | 0000 | 0000 |
| 0000000040 | 0000 | 0000 | 0000 | 0000 | 0000 | 0000 | 0000 | 0000 |
| 0000000060 | 0000 | 0000 | 0000 | 0000 | 0000 | 0000 | 0080 | 0000 |
| 0000000100 | 1F0E | 0EBA | B400 | CD09 | B821 | 4C01 | 21CD | 6854 |
| 0000000120 | 7369 | 7020 | 6F72 | 7267 | 6D61 | 6320 | 6E61 | 6F6E |
| 0000000140 | 2074 | 7572 | 206E | 6E69 | 4420 | 534F | 6D20 | 646F |
| 0000000160 | 2E65 | 0D0D | 240A | 0000 | 0000 | 0000 | 0000 | 0000 |
| 0000000200 | 454E | 0A05 | 0265 | 0040 | 9BAE | 96B0 | 8006 | 0005 |
| 0000000220 | 0000 | 0000 | 7404 | 0001 | 0000 | 0000 | 0005 | 0004 |
| 0000000240 | 0038 | 0040 | 0068 | 0068 | 0191 | 0199 | 0325 | 0000 |
| 0000000260 | 0000 | 0004 | 0000 | 0001 | 0000 | 0000 | 0000 | 0000 |
| 0000000300 | 0036 | 95D5 | 0D00 | 95D6 | 09AB | 00C6 | 0C01 | 0100 |
| 0000000320 | 0000 | 0000 | 0C01 | 0850 | 0000 | 0000 | 0C01 | 0200 |
| 0000000340 | 09B8 | 234D | 0D01 | 27B0 | 4902 | 0048 | 0900 | 5F49 |
| 0000000360 | 4547 | 5F54 | 534D | 0147 | 0E00 | 5F49 | 4553 | 5F54 |
| 0000000400 | 5250 | 4F49 | 4952 | 5954 | 0002 | 490A | 535F | 4E45 |
| 0000000420 | 5F44 | 534D | 0347 | 0600 | 5F49 | 4E49 | 5449 | 0004 |
| 0000000440 | 4910 | 495F | 534E | 5245 | 5F54 | 5041 | 5F50 | 534D |
| 0000000460 | 0547 | 1000 | 5F49 | 4E49 | 4553 | 5452 | 495F | 4350 |
| 0000000500 | 4D5F | 4753 | 0006 | 490C | 535F | 4E45 | 5F44 | 5F58 |
| 0000000520 | 534D | 0747 | 1100 | 5F49 | 5341 | 4F53 | 4943 | 5441 |
| 0000000540 | 5F45 | 5F51 | 4553 | 084D | 0600 | 5F49 | 4554 | 4D52 |
| 0000000560 | 0009 | 4907 | 415F | 4F42 | 5452 | 000A | 490F | 435F |
| 0000000600 | 5652 | 525F | 4345 | 4E4F | 454E | 5443 | 000B | 490E |
| 0000000620 | 435F | 5652 | 535F | 4E45 | 5F44 | 534D | 0C47 | 0A00 |
| 0000000640 | 5F49 | 5243 | 5F56 | 4E49 | 5449 | 000D | 490A | 495F |
| 0000000660 | 4350 | 495F | 494E | 0E54 | 0A00 | 5F49 | 5246 | 4545 |
| 0000000700 | 4D5F | 4753 | 000F | 490D | 525F | 5345 | 4F50 | 444E |
| 0000000720 | 4D5F | 4753 | 0010 | 4910 | 535F | 5445 | 545F | 4152 |
| 0000000740 | 534E | 465F | 4E55 | 1143 | 0A00 | 5F49 | 5243 | 5F56 |
| 0000000760 | 4554 | 4D52 | 0012 | 490A | 495F | 4350 | 545F | 5245 |
| 0000001000 | 134D | 0A00 | 5F49 | 414D | 454B | 4D5F | 4753 | 0014 |
| 0000001020 | 0100 | 0A00 | 1300 | C900 | 0000 | 4408 | 534F | 4143 |
| 0000001040 | 4C4C | 0853 | 414E | 504D | 5049 | 5345 | 6C06 | 6962 |
| 0000001060 | 6D70 | 0D74 | 425F | 5F58 | 4544 | 5542 | 4D47 | 444F |
| 0000001100 | 0D45 | 425F | 5F58 | 4954 | 454D | 4D53 | 444F | 0945 |
| 0000001120 | 425F | 5F58 | 5F42 | 4953 | 0E47 | 425F | 5F58 | 4544 |
| 0000001140 | 5542 | 4547 | 544E | 5245 | 5F0F | 5842 | 445F | 4245 |
| 0000001160 | 4755 | 4552 | 5554 | 4E52 | 5F0E | 5842 | 565F | 494F |
| 0000001200 | 5244 | 5445 | 5255 | 0E4E | 425F | 5F58 | 4544 | 5542 |
| 0000001220 | 5D47 | 4952 | 544E | 5F1D | 5842 | 545F | 5248 | 4145 |
| 0000001240 | 5F44 | 5453 | 5241 | 0E54 | 425F | 5F58 | 4854 | 4552 |
| 0000001260 | 4441 | 455F | 444E | 5F0E | 5842 | 505F | 4341 | 464B |
| 0000001300 | 4C49 | 4554 | 0D52 | 425F | 5F58 | 5245 | 4F52 | 4D52 |
| 0000001320 | 444F | 0E45 | 425F | 5F58 | 4544 | 5542 | 4547 | 5252 |
| 0000001340 | 524F | 5502 | 1449 | 0101 | 01D8 | 0101 | 0108 | 2D69 |
| 0000001360 | 8B01 | 012[illegible] | 04F8 | AD01 | 0103 | 313A | 5401 | 0127 |
| 0000001400 | 28D4 | 8901 | 0127 | 35B6 | DE01 | 012F | 227D | C701 |
| 0000001420 | 0124 | 375D | EB01 | 0133 | 0A19 | D801 | 012B | 2A37 |
| 0000001440 | 4301 | 0006 | 3400 | 6E49 | 7570 | 2074 | 6148 | 646E |
| 0000001460 | 656C | 2072 | 696C | 7262 | 7261 | 2079 | 4328 | 2029 |
| 0000001500 | 654D | 6372 | 7275 | 2079 | 6E49 | 6574 | 4172 | 7463 |
| 0000001520 | 7669 | 2C65 | 3120 | 3939 | 2030 | 0000 | 0000 | 0000 |
| 0000001540 | 581E | 4590 | 8B55 | 1EEC | D88E | EC81 | 0004 | 5657 |
| 0000001560 | 46C7 | 00FC | 8B00 | 0A46 | 568B | C40C | 065E | 8926 |
| 0000001600 | 2607 | 5789 | 8B02 | FC46 | 00E9 | 5E00 | 835F | 02ED |
| 0000001620 | E58B | 5D1F | CA4D | 0008 | 581E | 4590 | 8B55 | 1EEC |
| 0000001640 | D88E | EC81 | 0004 | 5657 | 46C7 | 00FC | 8B00 | 0A46 |

THU MAR 14 17:39:32 1991 IH.DLL PAGE 2, LINE 60

```
0000001660  568B  C40C  065E  8926  2607  5789  8B02  FC46
0000001700  00E9  5E00  835F  02ED  E58B  5D1F  CA4D  0008
0000001720  581E  4590  8B55  1EEC  D88E  EC81  0004  5657
0000001740  46C7  00FC  8B00  FC46  00E9  5E00  835F  02ED
0000001760  E58B  5D1F  CA4D  0004  581E  4590  8B55  1EEC
0000002000  D88E  EC81  000E  5657  46C7  00FA  6A00  9A18
0000002020  8D74  00E1  C483  8902  F246  5689  8BF4  F446
0000002040  460B  74F2  E903  0008  46C7  07FA  E900  00DC
0000002060  126A  76FF  FF0C  0A76  76FF  FFF4  F276  A29A
0000002100  1494  8301  0AC4  4689  89F6  F856  468B  8BF2
0000002120  F456  4639  74F6  E903  0008  5639  75F8  E903
0000002140  0008  46C7  06FA  E900  00A2  5EC4  26F2  77FF
0000002160  9A10  8D74  0154  C483  C402  F25E  8926  1447
0000002200  8926  1657  5EC4  26F2  478B  2616  470B  7514
0000002220  E903  0046  5EC4  26F2  77FF  8B10  0A46  568B
0000002240  050C  0012  5052  5EC4  26F2  77FF  2616  77FF
0000002260  9A14  94A2  FFFF  C483  C40A  F25E  3926  1447
0000002300  0374  0FE9  2600  5739  7416  E903  0006  01B8
0000002320  E900  0003  00B8  E900  0003  00B8  8900  FC46
0000002340  7E83  00FC  0374  08E9  C700  FA46  03F8  1BE9
0000002360  C400  F25E  C726  1247  0009  5EC4  26F2  47C7
0000002400  0110  C400  F25E  C726  0E47  0001  7E83  00FA
0000002420  0374  10E9  8B00  F246  568B  C4F4  065E  8926
0000002440  2607  5789  8B02  FA46  00E9  5E00  835F  02ED
0000002460  E58B  5D1F  CA4D  0008  581E  4590  8B55  1EEC
0000002500  D88E  EC81  002E  5657  B81E  FFFF  D88E  46C7
0000002520  51FA  8C00  FC5E  46C7  01F0  2B01  89C0  E246
0000002540  4689  8EED  E606  2621  3E83  FFFF  7500  E903
0000002560  001D  36FF  0066  36FF  0064  468D  16D8  9A50
0000002600  FFFF  0000  C483  3D08  0000  0374  0FE9  8E00
0000002620  E806  2621  3E83  0340  7500  E903  003A  681E
0000002640  0058  468D  16E4  8D50  D846  5016  468D  16F4
0000002660  6A50  1E7F  6868  FF00  6236  FF00  6036  FF00
0000002700  6636  FF00  6436  9A00  FFFF  0000  C483  891E
0000002720  F446  5689  E9F6  0008  C02B  4689  89F6  F446
0000002740  46C7  00F2  8D00  D246  5016  006A  4C9A  C768
0000002760  8302  06C4  4689  83F2  F27E  7500  E903  0008
0000003000  46C7  E8F2  E903  003F  7E83  02D2  0375  09E9
0000003020  8300  D27E  7400  E903  0018  468D  16F8  8D50
0000003040  D446  5016  7E9A  DF0B  8302  08C4  4689  E9F2
0000003060  0015  468D  16F8  8D50  D446  5016  4C9A  B20E
0000003100  8300  08C4  4689  8BF2  0846  460B  7506  E903
0000003120  0016  7E81  F7F2  7403  E903  000C  468B  C4F8
0000003140  065E  8926  E907  0019  7E83  00F2  0374  10E9
0000003160  8B00  D446  568B  C4D6  0A5E  8926  2607  5789
0000003200  8E02  E606  2621  3E83  020A  7500  E903  0009
0000003220  7E83  FEDC  0374  0FE9  8E00  E806  2621  3E83
0000003240  FFFF  7500  E903  0051  468B  89F2  DE46  76FF
0000003260  FFE2  E076  468D  16DE  FF50  F076  76FF  FFFC
0000003300  FA76  4E8D  16E4  8D51  F44E  5116  4E8D  16D8
0000003320  1E51  6868  6800  009D  36FF  0062  36FF  0060
0000003340  36FF  0066  36FF  0064  FF9A  00FF  8300  28C4
0000003360  468B  E9DE  0009  06E9  8B00  F246  00E9  1F00
0000003400  5F5E  ED83  8B02  1FE5  4D5D  08CA  1E00  9058
0000003420  5545  EC8B  8E1E  81D8  26EC  5700  1E56  EAB8
0000003440  8E01  C7D8  FA46  0072  5E8C  C7FC  F246  0101
0000003460  C02B  4689  89E4  E246  068E  21E6  8326  733E
0000003500  0004  0375  1DE9  FF00  6636  FF00  6436  8D00
0000003520  DA46  5016  209A  0002  8300  08C4  003D  7400
```

THU MAR 14 17:39:32 1991 IH.DLL PAGE 3, LINE 119

| | | | | | | | | |
|---|---|---|---|---|---|---|---|---|
| 0000003540 | E903 | 000F | 068E | 21E8 | 8326 | 8B3E | 0004 | 0375 |
| 0000003560 | 3BE9 | 1E00 | 7968 | 8D00 | E646 | 5016 | 468D | 16DA |
| 0000003600 | 8D50 | F646 | 5016 | B968 | 1E00 | 8068 | FF00 | 6236 |
| 0000003620 | FF00 | 6036 | FF00 | 6636 | FF00 | 6436 | 9A00 | 0268 |
| 0000003640 | 0000 | C483 | 891E | F646 | 5689 | E9F8 | 0008 | C02B |
| 0000003660 | 4689 | 89F8 | F646 | 46C7 | 00F4 | FF00 | 0876 | 76FF |
| 0000003700 | 9A06 | 1678 | 028F | C483 | 8904 | F446 | 068E | 21E6 |
| 0000003720 | 8326 | 283E | 0003 | 0375 | 09E9 | 8300 | DE7E | 74FE |
| 0000003740 | E903 | 000F | 068E | 21E8 | 8326 | 363E | 0002 | 0375 |
| 0000003760 | 51E9 | 8B00 | F446 | 4689 | FFE0 | E476 | 76FF | 8DE2 |
| 0000004000 | E046 | 5016 | 76FF | FFF2 | FC76 | 76FF | 8DFA | E64E |
| 0000004020 | 5116 | 4E8D | 16F6 | 8D51 | DA4E | 5116 | 681E | 0080 |
| 0000004040 | C068 | FF00 | 6236 | FF00 | 6036 | FF00 | 6636 | FF00 |
| 0000004060 | 6436 | 9A00 | 0389 | 0000 | C483 | 8B28 | E046 | 09E9 |
| 0000004100 | E900 | 0006 | 468B | E9F4 | 0000 | 5E1F | 835F | 02ED |
| 0000004120 | E58B | 5D1F | CA4D | 0004 | 581E | 459D | 8B55 | 1EEC |
| 0000004140 | D88E | EC81 | 0026 | 5657 | B81E | 03DF | D88E | 46C7 |
| 0000004160 | 91FA | 8C00 | FC5E | 46C7 | 01F2 | 2B01 | 89C0 | E446 |
| 0000004200 | 4689 | 8EE2 | E606 | 2621 | 3E83 | 05BE | 7500 | E903 |
| 0000004220 | 001D | 36FF | 0066 | 36FF | 0064 | 468D | 16DA | 9A50 |
| 0000004240 | 03F5 | 0000 | C483 | 3D08 | 0000 | 0374 | 0FE9 | 8E00 |
| 0000004260 | E806 | 2621 | 3E83 | 05D6 | 7500 | E903 | 003B | 681E |
| 0000004300 | 0098 | 468D | 16E6 | 8D50 | DA46 | 5016 | 468D | 16F6 |
| 0000004320 | 6850 | 00DB | 681E | 00A0 | 36FF | 0062 | 36FF | 0060 |
| 0000004340 | 36FF | 0066 | 36FF | 0064 | 3E9A | 0004 | 8300 | 1EC4 |
| 0000004360 | 4689 | 89F6 | F856 | 08E9 | 2B00 | 89C0 | F846 | 4689 |
| 0000004400 | C7F6 | F446 | 0000 | 76FF | FF08 | 0676 | D89A | 641A |
| 0000004420 | 8304 | 04C4 | 4689 | 8EF4 | E606 | 2621 | 3E83 | 03DF |
| 0000004440 | 7500 | E903 | 0009 | 7E83 | FEDE | 0374 | 0FE9 | 8E00 |
| 0000004460 | E806 | 2621 | 3E83 | 040B | 7500 | E903 | 0051 | 468B |
| 0000004500 | 89F4 | E046 | 76FF | FFE4 | E276 | 468D | 16E0 | FF50 |
| 0000004520 | F276 | 76FF | FFFC | FA76 | 4E8D | 16E6 | 8D51 | F64E |
| 0000004540 | 5116 | 4E8D | 16DA | 1E51 | A068 | 6800 | 00E2 | 36FF |
| 0000004560 | 0062 | 36FF | 0060 | 36FF | 0066 | 36FF | 0064 | D49A |
| 0000004600 | 0004 | 8300 | 28C4 | 468B | E9E0 | 0009 | 06E9 | 8B00 |
| 0000004620 | F446 | 00E9 | 1F00 | 5F5E | ED83 | 8B02 | 1FE5 | 4D5D |
| 0000004640 | 04CA | 1E00 | 9058 | 5545 | EC8B | 8E1E | 81D8 | 2AEC |
| 0000004660 | 5700 | 1E56 | 0AB8 | 8E05 | C7D8 | FA46 | 00B1 | 5E8C |
| 0000004700 | C7FC | F246 | 0101 | C02B | 4689 | 89E4 | E246 | 068E |
| 0000004720 | 21E6 | 8326 | 7C3E | 0007 | 0375 | 1DE9 | FF00 | 6636 |
| 0000004740 | FF00 | 6436 | 8D00 | DA46 | 5016 | 409A | 0005 | 8300 |
| 0000004760 | 08C4 | 003D | 7400 | E903 | 000F | 068E | 21E8 | 8326 |
| 0000005000 | 943E | 0007 | 0375 | 3BE9 | 1E00 | B868 | 8D00 | E646 |
| 0000005020 | 5016 | 468D | 16DA | 8D50 | F646 | 5016 | 0568 | 1E01 |
| 0000005040 | C068 | FF00 | 6236 | FF00 | 6036 | FF00 | 6636 | FF00 |
| 0000005060 | 6436 | 9A00 | 0589 | 0000 | C483 | 891E | F646 | 5689 |
| 0000005100 | E9F8 | 0008 | C02B | 4689 | 89F8 | F646 | 46C7 | 00F4 |
| 0000005120 | 8300 | 0E7E | 7401 | E903 | 0020 | 468B | 050A | 0003 |
| 0000005140 | C88B | E0D1 | C103 | E0D1 | 9A50 | 8D74 | 0724 | C483 |
| 0000005160 | 8902 | D646 | 5689 | E9D8 | 0015 | 468B | 050A | 0012 |
| 0000005200 | 9A50 | 8D74 | 0754 | C483 | 8902 | D646 | 5689 | 8BD8 |
| 0000005220 | D846 | 460B | 74D6 | E903 | 0008 | 46C7 | 07F4 | E900 |
| 0000005240 | 001A | 76FF | FF0A | 0C76 | 76FF | FF0E | D876 | 76FF |
| 0000005260 | 9AD6 | 44BA | 05AF | C483 | 890A | F446 | 7E83 | 00F4 |
| 0000005300 | 0374 | 10E9 | 8B00 | D646 | 568B | C4D8 | 065E | 8926 |
| 0000005320 | 2607 | 5789 | 8E02 | E606 | 2621 | 3E83 | 052A | 7500 |
| 0000005340 | E903 | 0009 | 7E83 | FEDE | 0374 | 0FE9 | 8E00 | E806 |
| 0000005360 | 2621 | 3E83 | 0556 | 7500 | E903 | 0051 | 468B | 89F4 |
| 0000005400 | E046 | 76FF | FFE4 | E276 | 468D | 16E0 | FF50 | F276 |

THU MAR 14 17:39:32 1991 IH.DLL PAGE 4, LINE 178

| | | | | | | | | |
|---|---|---|---|---|---|---|---|---|
| 0000005420 | 76FF | FFFC | FA76 | 4E8D | 16E6 | 8D51 | F64E | 5116 |
| 0000005440 | 4E8D | 16DA | 1E51 | C068 | 6800 | 011C | 36FF | 0062 |
| 0000005460 | 36FF | 0060 | 36FF | 0066 | 36FF | 0064 | 1F9A | 0006 |
| 0000005500 | 8300 | 28C4 | 468B | E9E0 | 0009 | 06E9 | 8B00 | F446 |
| 0000005520 | 00E9 | 1F00 | 5F5E | ED83 | 8B02 | 1FE5 | 4D5D | 0ACA |
| 0000005540 | 1E00 | 9058 | 5545 | EC8B | 8E1E | 81D8 | 2AEC | 5700 |
| 0000005560 | 1E56 | 55B8 | 8E06 | C7D8 | FA46 | 00CB | 5E8C | C7FC |
| 0000005600 | F046 | 0101 | C02B | 4689 | 89E0 | DE46 | 068E | 21E6 |
| 0000005620 | 8326 | 753E | 0006 | 0375 | 1DE9 | FF00 | 6636 | FF00 |
| 0000005640 | 6436 | 8D00 | D646 | 5016 | 8B9A | 0006 | 8300 | 08C4 |
| 0000005660 | 003D | 7400 | E903 | 000F | 068E | 21E8 | 8326 | A13E |
| 0000005700 | 0006 | 0375 | 3BE9 | 1E00 | D268 | 8D00 | E246 | 5016 |
| 0000005720 | 468D | 16D6 | 8D50 | F646 | 5016 | 4468 | 1E01 | DA68 |
| 0000005740 | FF00 | 6236 | FF00 | 6036 | FF00 | 6636 | FF00 | 6436 |
| 0000005760 | 9A00 | 06D4 | 0000 | C483 | 891E | F646 | 5689 | E9F8 |
| 0000006000 | 0008 | C02B | 4689 | 89F8 | F646 | 46C7 | 00F4 | C700 |
| 0000006020 | F246 | 0000 | 03E9 | FF00 | F246 | 7E83 | 04F2 | 037C |
| 0000006040 | 3DE9 | 8300 | F47E | 7400 | E903 | 0034 | 5E8B | D1F2 |
| 0000006060 | C4E3 | 0676 | FF26 | 9A30 | 9548 | 070C | C483 | 3D02 |
| 0000006100 | 0005 | 037C | 11E9 | 8B00 | F25E | E3D1 | 76C4 | 2606 |
| 0000006120 | 3883 | 7400 | E903 | 0005 | 46C7 | 13F4 | E900 | FFB7 |
| 0000006140 | 7E83 | 00F4 | 0374 | 6DE9 | C700 | F246 | 0000 | 03E9 |
| 0000006160 | FF00 | F246 | 7E83 | 04F2 | 037C | 59E9 | 8300 | F47E |
| 0000006200 | 7400 | E903 | 0050 | 468B | 40F2 | 4689 | E9EE | 0003 |
| 0000006220 | 46FF | 83EE | EE7E | 7C04 | E903 | 0037 | 5E8B | D1EE |
| 0000006240 | C4E3 | 0676 | FF26 | 9A30 | 9548 | 095F | C483 | 8B02 |
| 0000006260 | F25E | E3D1 | 76C4 | 2606 | 30FF | F08B | 489A | 8895 |
| 0000006300 | 8309 | 02C4 | C63B | 0374 | 05E9 | C700 | F446 | 0014 |
| 0000006320 | BDE9 | E9FF | FF9B | 7E83 | 00F4 | 0374 | 0EE9 | FF00 |
| 0000006340 | 0876 | 76FF | 9A06 | 1D3A | 08DA | C483 | 8E04 | E606 |
| 0000006360 | 2621 | 3E83 | 0833 | 7500 | E903 | 0009 | 7E83 | FEDA |
| 0000006400 | 0374 | 0FE9 | 8E00 | E806 | 2621 | 3E83 | 085F | 7500 |
| 0000006420 | E903 | 0051 | 468B | 89F4 | DC46 | 76FF | FFE0 | DE76 |
| 0000006440 | 468D | 16DC | FF50 | F076 | 76FF | FFFC | FA76 | 4E8D |
| 0000006460 | 16E2 | 8D51 | F64E | 5116 | 4E8D | 16D6 | 1E51 | DA68 |
| 0000006500 | 6800 | 015A | 36FF | 0062 | 36FF | 0060 | 36FF | 0066 |
| 0000006520 | 36FF | 0064 | DD9A | 0007 | 8300 | 28C4 | 468B | E9DC |
| 0000006540 | 0009 | 06E9 | 8B00 | F446 | 00E9 | 1F00 | 5F5E | ED83 |
| 0000006560 | 8B02 | 1FE5 | 4D5D | 04CA | 1E00 | 9058 | 5545 | EC8B |
| 0000006600 | 8E1E | 81D8 | 26EC | 5700 | 1E56 | 13B8 | 8E08 | C7D8 |
| 0000006620 | FA46 | 00E9 | 5E8C | C7FC | F246 | 0101 | C02B | 4689 |
| 0000006640 | 89E4 | E246 | 068E | 21E6 | 8326 | F93E | 000A | 0375 |
| 0000006660 | 1DE9 | FF00 | 6636 | FF00 | 6436 | 8D00 | DA46 | 5016 |
| 0000006700 | 499A | 0008 | 8300 | 08C4 | 003D | 7400 | E903 | 000F |
| 0000006720 | 068E | 21E8 | 8326 | 113E | 000B | 0375 | 3BE9 | 1E00 |
| 0000006740 | F068 | 8D00 | E646 | 5016 | 468D | 16DA | 8D50 | F646 |
| 0000006760 | 5016 | 7D68 | 1E01 | F868 | FF00 | 6236 | FF00 | 6036 |
| 0000007000 | FF00 | 6636 | FF00 | 6436 | 9A00 | 0892 | 0000 | C483 |
| 0000007020 | 891E | F646 | 5689 | E9F8 | 0008 | C02B | 4689 | 89F8 |
| 0000007040 | F646 | 46C7 | 00F4 | 8300 | 0A7E | 7F00 | E903 | 0009 |
| 0000007060 | 7E83 | 050A | 037D | 08E9 | C700 | F446 | 0013 | 11E9 |
| 0000007100 | FF00 | 0876 | 76FF | FF06 | 0A76 | C69A | 4A1D | 8309 |
| 0000007120 | 06C4 | 068E | 21E6 | 8326 | 943E | 0009 | 0375 | 09E9 |
| 0000007140 | 8300 | DE7E | 74FE | E903 | 000F | 068E | 21E8 | 8326 |
| 0000007160 | AC3E | 0009 | 0375 | 51E9 | 8B00 | F446 | 4689 | FFE0 |
| 0000007200 | E476 | 76FF | 8DE2 | E046 | 5016 | 76FF | FFF2 | FC76 |
| 0000007220 | 76FF | 8DFA | E64E | 5116 | 4E8D | 16F6 | 8D51 | DA4E |
| 0000007240 | 5116 | 681E | 00F8 | 8968 | FF01 | 6236 | FF00 | 6036 |
| 0000007260 | FF00 | 6636 | FF00 | 6436 | 9A00 | 09F5 | 0000 | C483 |

THU MAR 14 17:39:32 1991 IH.DLL PAGE 5, LINE 237

| | | | | | | | | |
|---|---|---|---|---|---|---|---|---|
| 0000007300 | 8B28 | E046 | 09E9 | E900 | 0006 | 468B | E9F4 | 000C |
| 0000007320 | 5E1F | 835F | 02ED | E58B | 5D1F | CA4D | 0006 | 581E |
| 0000007340 | 4590 | 8B55 | 1EEC | D88E | EC81 | 003A | 5657 | 46C7 |
| 0000007360 | 1AFA | 8C01 | FC5E | 46C7 | 01EA | 2B01 | 89C0 | DC46 |
| 0000007400 | 4689 | 8EDA | EA06 | 2621 | 3E83 | 0A4B | 7500 | E903 |
| 0000007420 | 001D | 36FF | 012E | 36FF | 012C | 468D | 16D2 | 9A50 |
| 0000007440 | 0A61 | 0000 | C483 | 3D08 | 0000 | 0374 | 0FE9 | 8E00 |
| 0000007460 | EC06 | 2621 | 3E83 | 0DE2 | 7500 | E903 | 003B | 681E |
| 0000007500 | 0121 | 468D | 16DE | 8D50 | D246 | 5016 | 468D | 16EE |
| 0000007520 | 6850 | 0095 | 681E | 1108 | 36FF | 012A | 36FF | 0128 |
| 0000007540 | 36FF | 012E | 36FF | 012C | AA9A | 000A | 8300 | 1EC4 |
| 0000007560 | 4689 | 89EE | F056 | 08E9 | 2B00 | 89C0 | F046 | 4689 |
| 0000007600 | C7EE | EC46 | 0000 | C02B | 4689 | 89CA | C846 | 7E83 |
| 0000007620 | 00EC | 0374 | 5DE9 | 8B01 | CA46 | 460B | 74C8 | E903 |
| 0000007640 | 0152 | C02B | 4689 | 89CA | C846 | 46C7 | 00CC | 8D00 |
| 0000007660 | CC46 | 5016 | 4E8D | 16C8 | 9A51 | 10C5 | 0C7B | C483 |
| 0000007700 | 8908 | EC46 | 7E81 | FCEC | 7403 | E903 | 0015 | 468D |
| 0000007720 | 16CC | 8D50 | C846 | 5016 | 309A | B313 | 830C | 08C4 |
| 0000007740 | 4689 | 81EC | EC7E | 03FC | 0374 | 04E9 | C701 | EC46 |
| 0000007760 | 0000 | 468D | 16F6 | 9A50 | FFFF | 0000 | 5EC4 | 26F6 |
| 0000010000 | 478B | E904 | 00D4 | 468D | 16CC | 8D50 | C846 | 5016 |
| 0000010020 | C59A | CB10 | 830C | 08C4 | 4689 | E9EC | 00D3 | 468D |
| 0000010040 | 16CC | 8D50 | C846 | 5016 | 309A | DE13 | 830C | 08C4 |
| 0000010060 | 4689 | E9EC | 00BB | 468D | 16CE | 9A50 | 1D0E | 0CF8 |
| 0000010100 | C483 | 8B04 | D046 | 460B | 75CE | E903 | 002B | 468D |
| 0000010120 | 16F2 | 6A50 | 9A04 | 1F25 | 0D11 | C483 | 8D06 | C846 |
| 0000010140 | 5016 | 76FF | FFF4 | F276 | 76FF | FFD0 | CE76 | 429A |
| 0000010160 | 6515 | 830D | 0CC4 | 4689 | E9EC | 0075 | 46A1 | 8B01 |
| 0000010200 | 4816 | 8901 | F246 | 5689 | FFF4 | F876 | 76FF | 8DF6 |
| 0000010220 | C846 | 5016 | 5EFF | 89F2 | CC46 | 7E83 | 00CC | 0375 |
| 0000010240 | 05E9 | C700 | EC46 | 03F7 | 468B | 0BCA | C846 | 0375 |
| 0000010260 | 21E9 | C400 | C85E | C726 | 0107 | 8D00 | C646 | 5016 |
| 0000010300 | 006A | 4C9A | ED68 | 830A | 06C4 | 468B | C4C6 | C85E |
| 0000010320 | 8926 | 0247 | 1AE9 | E900 | 0017 | 002D | 7510 | E903 |
| 0000010340 | FF24 | 7548 | E903 | FF36 | 7548 | E903 | FF48 | 8BE9 |
| 0000010360 | E9FF | FE9A | 7E81 | F7EC | 7403 | E903 | 000C | 468B |
| 0000010400 | C4CC | 0A5E | 8926 | E907 | 0019 | 7E83 | 00EC | 0374 |
| 0000010420 | 10E9 | 8B00 | C846 | 568B | C4CA | 065E | 8926 | 2607 |
| 0000010440 | 5789 | 8E02 | EA06 | 2621 | 3E83 | 0BAA | 7500 | E903 |
| 0000010460 | 0009 | 7E83 | FED6 | 0374 | 0FE9 | 8E00 | EC06 | 2621 |
| 0000010500 | 3E83 | 0A77 | 7500 | E903 | 0051 | 468B | 89EC | D846 |
| 0000010520 | 76FF | FFDC | DA76 | 468D | 16D8 | FF50 | EA76 | 76FF |
| 0000010540 | FFFC | FA76 | 4E8D | 16DE | 8D51 | EE4E | 5116 | 4E8D |
| 0000010560 | 16D2 | 1E51 | 0868 | 6811 | 00F2 | 36FF | 012A | 36FF |
| 0000010600 | 0128 | 36FF | 012E | 36FF | 012C | 5A9A | 000B | 8300 |
| 0000010620 | 28C4 | 468B | E9D8 | 0009 | 06E9 | 8B00 | EC46 | 00E9 |
| 0000010640 | 5E00 | 835F | 02ED | E58B | 5D1F | CB4D | 581E | 4590 |
| 0000010660 | 8B55 | 1EEC | D88E | EC81 | 0032 | 5657 | 46C7 | 16FA |
| 0000010700 | 8C11 | FC5E | 46C7 | 01F0 | 2B01 | 89C0 | E046 | 4689 |
| 0000010720 | 8EDE | EA06 | 2621 | 3E83 | 0DCA | 7500 | E903 | 001D |
| 0000010740 | 36FF | 012E | 36FF | 012C | 468D | 16D4 | 9A50 | 0BC0 |
| 0000010760 | 0000 | C483 | 3D08 | 0000 | 0374 | 0FE9 | 8E00 | EC06 |
| 0000011000 | 2621 | 3E83 | 0BD6 | 7500 | E903 | 003B | 681E | 111D |
| 0000011020 | 468D | 16E4 | 8D50 | D446 | 5016 | 468D | 16F6 | 6850 |
| 0000011040 | 010B | 681E | 1124 | 36FF | 012A | 36FF | 0128 | 36FF |
| 0000011060 | 012E | 36FF | 012C | 099A | 000C | 8300 | 1EC4 | 4689 |
| 0000011100 | 89F6 | F856 | 08E9 | 2B00 | 89C0 | F846 | 4689 | C7F6 |
| 0000011120 | F446 | 0000 | 3E83 | 0134 | 7500 | E903 | 004F | 06C7 |
| 0000011140 | 0134 | 0000 | 06C7 | 234E | 0003 | 46C7 | 00F2 | E900 |

THU MAR 14 17:39:32 1991 IH.DLL PAGE 6, LINE 296

| | | | | | | | | |
|---|---|---|---|---|---|---|---|---|
| 0000011160 | 0003 | 46FF | 83F2 | F27E | 7203 | E903 | 002F | 5E8B |
| 0000011200 | C1F2 | 02E3 | C02B | 8789 | 23B2 | 8789 | 23B0 | 468B |
| 0000011220 | C1F2 | 02E0 | B005 | 8B23 | F25E | CB8B | E3D1 | D903 |
| 0000011240 | E3D1 | 8789 | 2352 | 9F8C | 2354 | C5E9 | 2BFF | 89C0 |
| 0000011260 | D046 | 4689 | 83CE | F47E | 7400 | E903 | 00AF | 468B |
| 0000011300 | 0BD0 | CE46 | 0374 | A4E9 | 2B00 | 89C0 | D046 | 4689 |
| 0000011320 | C7CE | D246 | 0000 | 468D | 16D2 | 8D50 | CE4E | 5116 |
| 0000011340 | C59A | A210 | 830F | 08C4 | 4689 | 81F4 | F47E | 03FC |
| 0000011360 | 0374 | 15E9 | 8D00 | D246 | 5016 | 468D | 16CE | 9A50 |
| 0000011400 | 1330 | 0C5C | C483 | 8908 | F446 | 7E81 | FCF4 | 7403 |
| 0000011420 | E903 | 0056 | 46C7 | 00F4 | 1E00 | B468 | 9A23 | 0FC7 |
| 0000011440 | 0000 | 681E | 23B8 | FF9A | 00FF | 8D00 | DC46 | 5016 |
| 0000011460 | 681E | 234E | 006A | 1068 | 9A27 | FFFF | 0000 | 4689 |
| 0000011500 | 83E2 | E27E | 7500 | E903 | 000E | 7E83 | 79E2 | 0375 |
| 0000011520 | 05E9 | C700 | F446 | 0005 | 681E | 23B4 | 069A | 0010 |
| 0000011540 | 1E00 | B868 | 9A23 | FFFF | 0000 | 48E9 | 81FF | F47E |
| 0000011560 | 03F7 | 0374 | 0CE9 | 8B00 | D246 | 5EC4 | 260A | 0789 |
| 0000011600 | 19E9 | 8300 | F47E | 7400 | E903 | 0010 | 468B | 8BCE |
| 0000011620 | D056 | 5EC4 | 2606 | 0789 | 8926 | 0257 | 068E | 21EA |
| 0000011640 | 8326 | 783E | 000E | 0375 | 09E9 | 8300 | D87E | 74FE |
| 0000011660 | E903 | 000F | 068E | 21EC | 8326 | A43E | 000E | 0375 |
| 0000011700 | 51E9 | 8B00 | F446 | 4689 | FFDA | E076 | 76FF | 8DDE |
| 0000011720 | DA46 | 5016 | 76FF | FFF0 | FC76 | 76FF | 8DFA | E44E |
| 0000011740 | 5116 | 4E8D | 16F6 | 8D51 | D44E | 5116 | 681E | 1124 |
| 0000011760 | 5268 | FF01 | 2A36 | FF01 | 2836 | FF01 | 2E36 | FF01 |
| 0000012000 | 2C36 | 9A01 | 0E2B | 0000 | C483 | 8B28 | DA46 | 09E9 |
| 0000012020 | E900 | 0006 | 468B | E9F4 | 0000 | 5F5E | ED83 | 8B02 |
| 0000012040 | 1FE5 | 4D5D | 1ECB | 9058 | 5545 | EC8B | 8E1E | 81D8 |
| 0000012060 | 36EC | 5700 | C756 | FA46 | 1135 | 5E8C | C7FC | EA46 |
| 0000012100 | 0101 | C02B | 4689 | 89DA | D846 | 068E | 21EA | 8326 |
| 0000012120 | C63E | 0011 | 0375 | 1DE9 | FF00 | 2E36 | FF01 | 2C36 |
| 0000012140 | 8D01 | CC46 | 5016 | 8E9A | 000E | 8300 | 08C4 | 003D |
| 0000012160 | 7400 | E903 | 000F | 068E | 21EC | 8326 | 5B3E | 0010 |
| 0000012200 | 0375 | 3BE9 | 1E00 | 3C68 | 8D11 | DE46 | 5016 | 468D |
| 0000012220 | 16CC | 8D50 | F246 | 5016 | 7868 | 1E01 | 5A68 | FF11 |
| 0000012240 | 2A36 | FF01 | 2836 | FF01 | 2E36 | FF01 | 2C36 | 9A01 |
| 0000012260 | 0ED7 | 0000 | C483 | 891E | F246 | 5689 | E9F4 | 0008 |
| 0000012300 | C02B | 4689 | 89F4 | F246 | 46C7 | 00F0 | 1E00 | 3668 |
| 0000012320 | 6A01 | 6800 | 1388 | FF9A | 00FF | 8900 | DC46 | 7E83 |
| 0000012340 | 00DC | 0375 | 08E9 | C700 | F046 | 03FA | F6E9 | C700 |
| 0000012360 | CA46 | 0000 | 3E83 | 0156 | 7400 | E903 | 0008 | 46C7 |
| 0000012400 | FCF0 | E903 | 00C8 | 1E8B | 0158 | E3C1 | 8B02 | 5C87 |
| 0000012420 | 8B01 | 5E97 | 8901 | EC46 | 5689 | FFEE | 560E | 8E01 |
| 0000012440 | EA06 | 2621 | 3E83 | 1043 | 7500 | E903 | 0049 | 7E83 |
| 0000012460 | FED0 | 0375 | 40E9 | FF00 | 5636 | 1E01 | 4368 | 8D11 |
| 0000012500 | DE46 | 5016 | 468D | 16F2 | 8D50 | CC46 | 5016 | 681E |
| 0000012520 | 115A | 9668 | FF01 | 2A36 | FF01 | 2836 | FF01 | 2E36 |
| 0000012540 | FF01 | 2C36 | 1E01 | 5268 | 6811 | FFFF | FF68 | 9AFF |
| 0000012560 | FFFF | 0000 | C483 | 8328 | 563E | 0001 | 0375 | 15E9 |
| 0000012600 | FF00 | 5806 | 8101 | 583E | 2001 | 7403 | E903 | 0006 |
| 0000012620 | 06C7 | 0158 | 0000 | 4AA1 | 8B01 | 4C16 | 8901 | F646 |
| 0000012640 | 5689 | 8BF8 | F846 | 460B | 74F6 | E903 | 000F | 468B |
| 0000012660 | 8BEC | EE56 | 4689 | 89D4 | D656 | 11E9 | FF00 | EE76 |
| 0000012700 | 76FF | 8DEC | D446 | 5016 | 5EFF | 89F6 | CA46 | 7E83 |
| 0000012720 | 00CA | 0375 | 0EE9 | 8B00 | CA46 | 5EC4 | 260A | 0789 |
| 0000012740 | 46C7 | F7F0 | 1E03 | 3668 | 9A01 | 0FFD | 0000 | 7E83 |
| 0000012760 | 00F0 | 0374 | 10E9 | 8B00 | D446 | 568B | C4D6 | 065E |
| 0000013000 | 8926 | 2607 | 5789 | 8E02 | EA06 | 2621 | 3E83 | 10F1 |
| 0000013020 | 7500 | E903 | 0009 | 7E83 | FED0 | 0374 | 0FE9 | 8E00 |

THU MAR 14 17:39:32 1991 IH.DLL PAGE 7, LINE 355

| | | | | | | | | |
|---|---|---|---|---|---|---|---|---|
| 0000013040 | EC06 | 2621 | 3E83 | 111D | 7500 | E903 | 0051 | 468B |
| 0000013060 | 89F0 | D246 | 76FF | FFDA | D876 | 468D | 16D2 | FF50 |
| 0000013100 | EA76 | 76FF | FFFC | FA76 | 4E8D | 16DE | 8D51 | F24E |
| 0000013120 | 5116 | 4E8D | 16CC | 1E51 | 5A68 | 6811 | 01B5 | 36FF |
| 0000013140 | 012A | 36FF | 0128 | 36FF | 012E | 36FF | 012C | A49A |
| 0000013160 | 0010 | 8300 | 28C4 | 468B | E9D2 | 0009 | 06E9 | 8B00 |
| 0000013200 | FD46 | 00E9 | 5E00 | 835F | 02ED | E58B | 5D1F | CB4D |
| 0000013220 | 581E | 4590 | 8B55 | 1EEC | D88E | EC81 | 0036 | 5657 |
| 0000013240 | 46C7 | 69FA | 8C11 | FC5E | 46C7 | 01EA | 2B01 | 89C0 |
| 0000013260 | DA46 | 4689 | 8ED8 | EA06 | 2621 | 3E83 | 14C0 | 7500 |
| 0000013300 | E903 | 001D | 36FF | 012E | 36FF | 012C | 468D | 16CC |
| 0000013320 | 9A50 | 1107 | 0000 | C483 | 3D08 | 0000 | 0374 | 0FE9 |
| 0000013340 | 8E00 | EC06 | 2621 | 3E83 | 14D8 | 7500 | E903 | 003B |
| 0000013360 | 681E | 1170 | 468D | 16DE | 8D50 | CC46 | 5016 | 468D |
| 0000013400 | 16F2 | 6850 | 01DC | 681E | 1178 | 36FF | 012A | 36FF |
| 0000013420 | 0128 | 36FF | 012E | 36FF | 012C | 509A | 0011 | 8300 |
| 0000013440 | 1EC4 | 4689 | 89F2 | F456 | 08E9 | 2B00 | 89C0 | F446 |
| 0000013460 | 4689 | C7F2 | F046 | 0000 | 681E | 0136 | 006A | 8868 |
| 0000013500 | 9A13 | 1177 | 0000 | 4689 | 83DC | DC7E | 7500 | E903 |
| 0000013520 | 0008 | 46C7 | FAF0 | E903 | 009D | 46C7 | 00CA | 8300 |
| 0000013540 | DC3E | 000D | 0374 | 08E9 | C700 | F046 | 03FC | 6FE9 |
| 0000013560 | 8B00 | DE1E | C10D | 02E3 | 878B | 0DE2 | 978B | 0DE4 |
| 0000013600 | 4689 | 89EC | EE56 | 0EFF | 0DDC | 3E83 | 0DDC | 7500 |
| 0000013620 | E903 | 0014 | 06FF | 0DDE | 3E83 | 0DDE | 7464 | E903 |
| 0000013640 | 0006 | 06C7 | 0DDE | 0000 | 4EA1 | 8B01 | 5016 | 8901 |
| 0000013660 | F646 | 5689 | 8BF8 | F846 | 460B | 74F6 | E903 | 000F |
| 0000013700 | 468B | 8BEC | EE56 | 4689 | 89D4 | D656 | 11E9 | FF00 |
| 0000013720 | EE76 | 76FF | 8DEC | D446 | 5016 | 5EFF | 89F6 | CA46 |
| 0000013740 | 7E83 | 00CA | 0375 | 0EE9 | 8B00 | CA46 | 5EC4 | 260A |
| 0000013760 | 0789 | 46C7 | F7F0 | 1E03 | 3668 | 9A01 | 128A | 0000 |
| 0000014000 | 7E83 | 00F0 | 0374 | 10E9 | 8B00 | D446 | 568B | C4D6 |
| 0000014020 | 065E | 8926 | 2607 | 5789 | 8E02 | EA06 | 2621 | 3E83 |
| 0000014040 | 12AE | 7500 | E903 | 0009 | 7E83 | FED0 | 0374 | 0FE9 |
| 0000014060 | 8E00 | EC06 | 2621 | 3E83 | 12C6 | 7500 | E903 | 0051 |
| 0000014100 | 468B | 89F0 | D246 | 76FF | FFDA | D876 | 468D | 16D2 |
| 0000014120 | FF50 | EA76 | 76FF | FFFC | FA76 | 4E8D | 16DE | 8D51 |
| 0000014140 | F24E | 5116 | 4E8D | 16CC | 1E51 | 7868 | 6811 | 0218 |
| 0000014160 | 36FF | 012A | 36FF | 0128 | 36FF | 012E | 36FF | 012C |
| 0000014200 | 0F9A | 0013 | 8300 | 28C4 | 468B | E9D2 | 0009 | 06E9 |
| 0000014220 | 8B00 | F046 | 00E9 | 5E00 | 835F | 02ED | E58B | 5D1F |
| 0000014240 | CB4D | 581E | 4590 | 8B55 | 1EEC | D88E | EC81 | 0026 |
| 0000014260 | 5657 | 46C7 | 87FA | 8C11 | FC5E | 46C7 | 01F2 | 2B01 |
| 0000014300 | 89C0 | E446 | 4689 | 8EE2 | EA06 | 2621 | 3E83 | 15F6 |
| 0000014320 | 7500 | E903 | 001D | 36FF | 012E | 36FF | 012C | 468D |
| 0000014340 | 16DA | 9A50 | 1372 | 0000 | C483 | 3D08 | 0000 | 0374 |
| 0000014360 | 0FE9 | 8E00 | EC06 | 2621 | 3E83 | 160E | 7500 | E903 |
| 0000014400 | 003B | 681E | 118E | 468D | 16E6 | 8D50 | DA46 | 5016 |
| 0000014420 | 468D | 16F6 | 6850 | 0241 | 681E | 1196 | 36FF | 012A |
| 0000014440 | 36FF | 0128 | 36FF | 012E | 36FF | 012C | BB9A | 0013 |
| 0000014460 | 8300 | 1EC4 | 4689 | 89F6 | F856 | 08E9 | 2B00 | 89C0 |
| 0000014500 | F846 | 4689 | C7F6 | F446 | 0000 | 46C7 | FCF4 | 8E03 |
| 0000014520 | EA06 | 2621 | 3E83 | 135C | 7500 | E903 | 0009 | 7E83 |
| 0000014540 | FEDE | 0374 | 0FE9 | 8E00 | EC06 | 2621 | 3E83 | 1388 |
| 0000014560 | 7500 | E903 | 0051 | 468B | 89F4 | E046 | 76FF | FFE4 |
| 0000014600 | E276 | 468D | 16E0 | FF50 | F276 | 76FF | FFFC | FA76 |
| 0000014620 | 4E8D | 16E6 | 8D51 | F64E | 5116 | 4E8D | 16DA | 1E51 |
| 0000014640 | 9668 | 6811 | 0248 | 36FF | 012A | 36FF | 0128 | 36FF |
| 0000014660 | 012E | 36FF | 012C | 219A | 0015 | 8300 | 28C4 | 468B |
| 0000014700 | E9E0 | 0009 | 06E9 | 8B00 | F446 | 00E9 | 5E00 | 835F |

THU MAR 14 17:39:32 1991 IH.DLL PAGE 8, LINE 414

| | | | | | | | | |
|---|---|---|---|---|---|---|---|---|
| 0000014720 | 02ED | E58B | 5D1F | CB4D | 581E | 4590 | 8B55 | 1EEC |
| 0000014740 | D88E | EC81 | 002E | 5657 | 46C7 | A7FA | 8C11 | FC5E |
| 0000014760 | 46C7 | 01EE | 2B01 | 89CD | DE46 | 4689 | 8EDC | EA06 |
| 0000015000 | 2621 | 3E83 | 156E | 7500 | E903 | 001D | 36FF | 012E |
| 0000015020 | 36FF | 012C | 468D | 16D4 | 9A50 | 1584 | 0000 | C483 |
| 0000015040 | 3D08 | 0000 | 0374 | 0FE9 | 8E00 | EC06 | 2621 | 3E83 |
| 0000015060 | 159A | 7500 | E903 | 003B | 681E | 11AE | 468D | 16E2 |
| 0000015100 | 8D50 | D446 | 5016 | 468D | 16F2 | 6850 | 0260 | 681E |
| 0000015120 | 11FA | 36FF | 012A | 36FF | 0128 | 36FF | 012E | 36FF |
| 0000015140 | 012C | CD9A | 0015 | 8300 | 1EC4 | 4689 | 89F2 | F456 |
| 0000015160 | 08E9 | 2B00 | 89CD | F446 | 4689 | C7F2 | F046 | 0000 |
| 0000015200 | 681E | 0136 | 006A | 8868 | 9A13 | 13E2 | 0000 | 4689 |
| 0000015220 | 83ED | E07E | 7500 | E903 | 0008 | 46C7 | FAF0 | E903 |
| 0000015240 | 010C | 3E81 | 0156 | 0320 | 0374 | 08E9 | C700 | F046 |
| 0000015260 | 03F9 | F9E9 | C400 | 065E | C726 | 0207 | 8300 | 563E |
| 0000015300 | 0001 | 0375 | 15E9 | FF00 | 5A06 | 8101 | 5A3E | 2001 |
| 0000015320 | 7403 | E903 | 0006 | 06C7 | 015A | 0000 | 468B | 8B06 |
| 0000015340 | 0856 | 1E8B | 015A | E3C1 | 8902 | 5C87 | 8901 | 5E97 |
| 0000015360 | FF01 | 5606 | 8E01 | EA06 | 2621 | 3E83 | 16A4 | 7500 |
| 0000015400 | E903 | 0049 | 7E83 | FED8 | 0375 | 40E9 | FF00 | 5636 |
| 0000015420 | 1E01 | B568 | 8D11 | E246 | 5016 | 468D | 16F2 | 8D50 |
| 0000015440 | D446 | 5016 | 681E | 11FA | 8168 | FF02 | 2A36 | FF01 |
| 0000015460 | 2836 | FF01 | 2E36 | FF01 | 2C36 | 1E01 | C468 | 6811 |
| 0000015500 | 120A | 0D68 | 9A12 | 1210 | 0000 | C483 | 8D28 | D246 |
| 0000015520 | 5016 | 006A | 4C9A | 3068 | 8318 | 06C4 | 4689 | 83F0 |
| 0000015540 | D27E | 7502 | E903 | 0009 | 7E83 | 00D2 | 0374 | 13E9 |
| 0000015560 | 6800 | 1000 | 006A | 006A | 006A | 006A | FF9A | 00FF |
| 0000015600 | 8900 | F046 | 681E | 23B4 | 4A9A | 0018 | 9A00 | 73CE |
| 0000015620 | 0F83 | 4689 | 89F6 | F856 | 468B | 0BF8 | F646 | 0375 |
| 0000015640 | 0BE9 | FF00 | F876 | 76FF | 9AF6 | 1853 | 0000 | 681E |
| 0000015660 | 0136 | 9C9A | 0014 | 8300 | F07E | 7500 | E903 | 004E |
| 0000015700 | 068E | 21EE | 8326 | FF3E | 00FF | 0375 | 3FE9 | FF00 |
| 0000015720 | F076 | 681E | 11CC | 468D | 16E2 | 8D50 | F246 | 5016 |
| 0000015740 | 468D | 16D4 | 1E50 | FA68 | 6811 | 0295 | 36FF | 012A |
| 0000015760 | 36FF | 0128 | 36FF | 012E | 36FF | 012C | 681E | 11F2 |
| 0000016000 | E068 | 6817 | 17E3 | FF9A | 00FF | 8300 | 28C4 | D68E |
| 0000016020 | 21EA | 8326 | 9C3E | 0017 | 0375 | 09E9 | 8300 | D87E |
| 0000016040 | 74FE | E903 | 000F | 068E | 21EC | 8326 | D03E | 0016 |
| 0000016060 | 0375 | 51E9 | 8B00 | F046 | 4689 | FFDA | DE76 | 76FF |
| 0000016100 | 8DDC | DA46 | 5016 | 76FF | FFEE | FC76 | 76FF | 8DFA |
| 0000016120 | E24E | 5116 | 4E8D | 16F2 | 8D51 | D44E | 5116 | 681E |
| 0000016140 | 11FA | 9768 | FF02 | 2A36 | FF01 | 2836 | FF01 | 2E36 |
| 0000016160 | FF01 | 2C36 | 9A01 | 1657 | 0000 | C483 | 8B28 | DA46 |
| 0000016200 | 09E9 | E900 | 0006 | 468B | E9F0 | 0000 | 5F5E | ED83 |
| 0000016220 | 8B02 | 1FE5 | 4D5D | 1ECB | 9058 | 5545 | EC8B | 8E1E |
| 0000016240 | 81D8 | 2AEC | 5700 | C756 | FA46 | 120C | 5E8C | C7FC |
| 0000016260 | EE46 | 0101 | C02B | 4689 | 89E0 | DE46 | 068E | 21EA |
| 0000016300 | 8326 | 563E | 001A | 0375 | 1DE9 | FF00 | 2E36 | FF01 |
| 0000016320 | 2C36 | 8D01 | D646 | 5016 | BA9A | 0016 | 8300 | 08C4 |
| 0000016340 | 003D | 7400 | E903 | 000F | 068E | 21EC | 8326 | 6E3E |
| 0000016360 | 001A | 0375 | 3BE9 | 1E00 | 1368 | 8D12 | E246 | 5016 |
| 0000016400 | 468D | 16D6 | 8D50 | F646 | 5016 | AC6B | 1E02 | 1A6B |
| 0000016420 | FF12 | 2A36 | FF01 | 2836 | FF01 | 2E36 | FF01 | 2C36 |
| 0000016440 | 9A01 | 1703 | 0000 | C483 | 891E | F646 | 5689 | E9F8 |
| 0000016460 | 0008 | C02B | 4689 | 89F8 | F646 | 46C7 | 00F4 | 6A00 |
| 0000016500 | 9A18 | 8D74 | 1A0B | C483 | 8902 | F046 | 5689 | 8BF2 |
| 0000016520 | F246 | 460B | 74F0 | E903 | 0008 | 46C7 | 07F4 | E900 |
| 0000016540 | 004D | 76FF | FFF2 | F076 | 239A | 4746 | 831A | 04C4 |
| 0000016560 | 5EC4 | 26F0 | 47C7 | 010E | C400 | F05E | C726 | 1047 |

THU MAR 14 17:39:32 1991 IH.DLL PAGE 9, LINE 473

| | | | | | | | | |
|---|---|---|---|---|---|---|---|---|
| 0000016600 | 0001 | 5EC4 | 26F0 | 47C7 | EADC | C403 | F05E | C726 |
| 0000016620 | 1247 | 0001 | 468B | C406 | F05E | 8926 | 1447 | 76FF |
| 0000016640 | FFF2 | F076 | 789A | F716 | 8317 | 04C4 | 4689 | 8EF4 |
| 0000016660 | EA06 | 2621 | 3E83 | 18B5 | 7500 | E903 | 0009 | 7E83 |
| 0000016700 | FEDA | 0374 | 0FE9 | 8E00 | EC06 | 2621 | 3E83 | 18CD |
| 0000016720 | 7500 | E903 | 0051 | 468B | 89F4 | DC46 | 76FF | FFE0 |
| 0000016740 | DE76 | 468D | 16DC | FF50 | EE76 | 76FF | FFFC | FA76 |
| 0000016760 | 4E8D | 16E2 | 8D51 | F64E | 5116 | 4E8D | 16D6 | 1E51 |
| 0000017000 | 1A68 | 6812 | 02C4 | 36FF | 012A | 36FF | 0128 | 36FF |
| 0000017020 | 012E | 36FF | 012C | 169A | 0019 | 8300 | 28C4 | 468B |
| 0000017040 | E9DC | 0009 | 06E9 | 8B00 | F446 | 00E9 | 5E00 | 835F |
| 0000017060 | 02ED | E58B | 5D1F | CB4D | 581E | 4590 | 8B55 | 1EEC |
| 0000017100 | D88E | EC81 | 002E | 5657 | 46C7 | 30FA | 8C12 | FC5E |
| 0000017120 | 46C7 | 01EE | 2B01 | 89C0 | DE46 | 4689 | 8EDC | EA06 |
| 0000017140 | 2621 | 3E83 | 1963 | 7500 | E903 | 001D | 36FF | 012E |
| 0000017160 | 36FF | 012C | 468D | 16D4 | 9A50 | 1979 | 0000 | C483 |
| 0000017200 | 3D08 | 0000 | 0374 | 0FE9 | 8E00 | EC06 | 2621 | 3E83 |
| 0000017220 | 198F | 7500 | E903 | 003B | 681E | 1237 | 468D | 16E2 |
| 0000017240 | 8D50 | D446 | 5016 | 468D | 16F2 | 6850 | 02DC | 681E |
| 0000017260 | 123E | 36FF | 012A | 36FF | 0128 | 36FF | 012E | 36FF |
| 0000017300 | 012C | C29A | 0019 | 8300 | 1EC4 | 4689 | 89F2 | F456 |
| 0000017320 | 08E9 | 2B00 | 89C0 | F446 | 4689 | C7F2 | F046 | 0000 |
| 0000017340 | 681E | 0136 | 006A | 8868 | 9A13 | 172A | 0000 | 4689 |
| 0000017360 | 83E0 | E07E | 7500 | E903 | 0008 | 46C7 | FAF0 | E903 |
| 0000017400 | 00B2 | 3E83 | 0DDC | 7464 | E903 | 0008 | 46C7 | F9F0 |
| 0000017420 | E903 | 00A0 | 5EC4 | 2606 | 07C7 | 0003 | 3E83 | 0DDC |
| 0000017440 | 7500 | E903 | 0014 | 06FF | 0DE0 | 3E83 | 0DE0 | 7464 |
| 0000017460 | E903 | 0006 | 06C7 | 0DE0 | 0000 | 468B | 8B06 | 0856 |
| 0000017500 | 1E8B | 0DE0 | E3C1 | 8902 | E287 | 890D | E497 | FF0D |
| 0000017520 | DC06 | 8D0D | D246 | 5016 | 006A | 4C9A | E468 | 8319 |
| 0000017540 | 06C4 | 4689 | 83F0 | D27E | 7502 | E903 | 0009 | 7E83 |
| 0000017560 | 00D2 | 0374 | 13E9 | 6800 | 1001 | 006A | 006A | 006A |
| 0000017600 | 006A | 1D9A | 0018 | 8900 | F046 | 681E | 23B8 | 509A |
| 0000017620 | 001C | 9A0D | 73CE | 1BFD | 4689 | 89F6 | F856 | 468B |
| 0000017640 | 0BF8 | F646 | 0375 | 0BE9 | FF00 | F876 | 76FF | 9AF6 |
| 0000017660 | 1C59 | 0000 | 681E | 0136 | 299A | 0018 | 8E00 | EA06 |
| 0000017700 | 2621 | 3E83 | 1B04 | 7500 | E903 | 0009 | 7E83 | FED8 |
| 0000017720 | 0374 | 0FE9 | 8E00 | EC06 | 2621 | 3E83 | 1B30 | 7500 |
| 0000017740 | E903 | 0051 | 468B | 89F0 | DA46 | 76FF | FFDE | DC76 |
| 0000017760 | 468D | 16DA | FF50 | EE76 | 76FF | FFFC | FA76 | 4E8D |
| 0000020000 | 16E2 | 8D51 | F24E | 5116 | 4E8D | 16D4 | 1E51 | 3E68 |
| 0000020020 | 6812 | 030F | 36FF | 012A | 36FF | 0128 | 36FF | 012E |
| 0000020040 | 36FF | 012C | B79A | 001A | 8300 | 28C4 | 468B | E9DA |
| 0000020060 | 0009 | 06E9 | 8B00 | F046 | 00E9 | 5E00 | 835F | 02ED |
| 0000020100 | E58B | 5D1F | CB4D | 581E | 4590 | 8B55 | 1EEC | D88E |
| 0000020120 | EC81 | 0000 | 5657 | 468B | 8B06 | 0856 | 3AA3 | 8901 |
| 0000020140 | 3C16 | 5E01 | 835F | 02ED | E58B | 5D1F | CB4D | 581E |
| 0000020160 | 4590 | 8B55 | 1EEC | D88E | EC81 | 0000 | 5657 | 3AA1 |
| 0000020200 | 8B01 | 3C16 | C401 | 065E | 8926 | 2607 | 5789 | 5E02 |
| 0000020220 | 835F | 02ED | E58B | 5D1F | CB4D | 581E | 4590 | 8B55 |
| 0000020240 | 1EEC | D88E | EC81 | 0004 | 5657 | 46C7 | 00FC | E900 |
| 0000020260 | 0003 | 46FF | 83FC | FC7E | 7C03 | E903 | 0017 | 5E8B |
| 0000020300 | D1FC | C4E3 | 0676 | 8B26 | 8B00 | FC5E | E3D1 | 8789 |
| 0000020320 | 013E | DDE9 | 5EFF | 835F | 02ED | E58B | 5D1F | CB4D |
| 0000020340 | 581E | 4590 | 8B55 | 1EEC | D88E | EC81 | 0004 | 5657 |
| 0000020360 | 46C7 | 00FC | E900 | 0003 | 46FF | 83FC | FC7E | 7C03 |
| 0000020400 | E903 | 0017 | 5E8B | D1FC | C4E3 | 0676 | 7E8B | D1FC |
| 0000020420 | 8BE7 | 3E85 | 2601 | 0089 | DDE9 | 5EFF | 835F | 02ED |
| 0000020440 | E58B | 5D1F | CB4D | 581E | 4590 | 8B55 | 1EEC | D88E |

THU MAR 14 17:39:32 1991 IH.DLL PAGE 10, LINE 532

| | | | | | | | | |
|---|---|---|---|---|---|---|---|---|
| 0000020460 | EC81 | 0026 | 5657 | 46C7 | 50FA | 8C12 | FC5E | 46C7 |
| 0000020500 | 01F2 | 2B01 | 89CD | E446 | 4689 | 8EE2 | EA06 | 2621 |
| 0000020520 | 3E83 | 1EA3 | 7500 | E903 | 001D | 36FF | 012E | 36FF |
| 0000020540 | 012C | 468D | 16DA | 9A50 | 1B1A | 0000 | C483 | 3D08 |
| 0000020560 | 0000 | 0374 | 0FE9 | 8E00 | EC06 | 2621 | 3E83 | 1EBB |
| 0000020600 | 7500 | E903 | 003B | 681E | 1257 | 468D | 16E6 | 8D50 |
| 0000020620 | DA46 | 5016 | 468D | 16F6 | 6850 | 0397 | 681E | 125E |
| 0000020640 | 36FF | 012A | 36FF | 0128 | 36FF | 012E | 36FF | 012C |
| 0000020660 | 639A | 001B | 8300 | 1EC4 | 4689 | 89F6 | F856 | 08E9 |
| 0000020700 | 2B00 | 89C0 | F846 | 4689 | C7F6 | F446 | 0000 | 7E83 |
| 0000020720 | 0106 | 037D | 09E9 | 8300 | 067E | 7D05 | E903 | 0008 |
| 0000020740 | 46C7 | 13F4 | E900 | 0014 | 468B | 8B08 | DA56 | 5E8B |
| 0000020760 | C106 | 02E3 | 8789 | 0142 | 9789 | 0144 | 068E | 21EA |
| 0000021000 | 8326 | 643E | 001C | 0375 | 09E9 | 8300 | DE7E | 74FE |
| 0000021020 | E903 | 000F | 068E | 21EC | 8326 | 7C3E | 001C | 0375 |
| 0000021040 | 51E9 | 8B00 | F446 | 4689 | FFE0 | E476 | 76FF | 8DE2 |
| 0000021060 | E046 | 5016 | 76FF | FFF2 | FC76 | 76FF | 8DFA | E64E |
| 0000021100 | 5116 | 4E8D | 16F6 | 8D51 | DA4E | 5116 | 681E | 125E |
| 0000021120 | A368 | FF03 | 2A36 | FF01 | 2836 | FF01 | 2E36 | FF01 |
| 0000021140 | 2C36 | 9A01 | 1CC5 | 0000 | C483 | 8B28 | E046 | 09E9 |
| 0000021160 | E900 | 0006 | 468B | E9F4 | 0000 | 5F5E | ED83 | 8B02 |
| 0000021200 | 1FE5 | 4D5D | 1ECB | 9058 | 5545 | EC8B | 8E1E | 81D8 |
| 0000021220 | 26EC | 5700 | C756 | FA46 | 1270 | 5E8C | C7FC | F246 |
| 0000021240 | 0101 | C02B | 4689 | 89E4 | E246 | 068E | 21EA | 8326 |
| 0000021260 | 063E | 0020 | 0375 | 1DE9 | FF00 | 2E36 | FF01 | 2C36 |
| 0000021300 | 8D01 | DA46 | 5016 | 089A | 001E | 8300 | 08C4 | 003D |
| 0000021320 | 7400 | E903 | 000F | 068E | 21EC | 8326 | 1E3E | 0020 |
| 0000021340 | 0375 | 3BE9 | 1E00 | 7768 | 8D12 | E646 | 5016 | 468D |
| 0000021360 | 16DA | 8D50 | F646 | 5016 | BB68 | 1E03 | 7E68 | FF12 |
| 0000021400 | 2A36 | FF01 | 2836 | FF01 | 2E36 | FF01 | 2C36 | 9A01 |
| 0000021420 | 1E51 | 0000 | C483 | 891E | F646 | 5689 | E9F8 | 0008 |
| 0000021440 | C02B | 4689 | 89F8 | F646 | 46C7 | 00F4 | 8300 | 067E |
| 0000021460 | 7F00 | E903 | 0009 | 7E83 | 0506 | 037D | 08E9 | C700 |
| 0000021500 | F446 | 0013 | 18E9 | 8B00 | 065E | E3C1 | 8B02 | 4287 |
| 0000021520 | 8B01 | 4497 | C401 | 085E | 8926 | 2607 | 5789 | 8E02 |
| 0000021540 | EA06 | 2621 | 3E83 | 1DF2 | 7500 | E903 | 0009 | 7E83 |
| 0000021560 | FEDE | 0374 | 0FE9 | 8E00 | EC06 | 2621 | 3E83 | 1E1E |
| 0000021600 | 7500 | E903 | 0051 | 468B | 89F4 | E046 | 76FF | FFE4 |
| 0000021620 | E276 | 468D | 16E0 | FF50 | F276 | 76FF | FFFC | FA76 |
| 0000021640 | 4E8D | 16E6 | 8D51 | F64E | 5116 | 4E8D | 16DA | 1E51 |
| 0000021660 | 7E68 | 6812 | 03C7 | 36FF | 012A | 36FF | 0128 | 36FF |
| 0000021700 | 012E | 36FF | 012C | 049A | 001F | 8300 | 28C4 | 468B |
| 0000021720 | E9E0 | 0009 | 06E9 | 8B00 | F446 | 00E9 | 5E00 | 835F |
| 0000021740 | 02ED | E58B | 5D1F | CB4D | 581E | 4590 | 8B55 | 1EEC |
| 0000021760 | D88E | EC81 | 004A | 5657 | B81E | 0A2B | D88E | 46C7 |
| 0000022000 | 9BFA | 8C12 | FC5E | 46C7 | 01E4 | 2B01 | 89C0 | D646 |
| 0000022020 | 4689 | 8ED4 | F006 | 2621 | 3E83 | 1F51 | 7500 | E903 |
| 0000022040 | 001D | 36FF | 12BE | 36FF | 12BC | 468D | 16CC | 9A50 |
| 0000022060 | 1F67 | 0000 | C483 | 3D08 | 0000 | 0374 | 0FE9 | 8E00 |
| 0000022100 | F206 | 2621 | 3E83 | 2210 | 7500 | E903 | 003B | 681E |
| 0000022120 | 12A2 | 468D | 16D8 | 8D50 | CC46 | 5016 | 468D | 16F0 |
| 0000022140 | 6850 | 0084 | 681E | 12C8 | 36FF | 12BA | 36FF | 12B8 |
| 0000022160 | 36FF | 12BE | 36FF | 12BC | B09A | 001F | 8300 | 1EC4 |
| 0000022200 | 4689 | 89F0 | F256 | 08E9 | 2B00 | 89C0 | F246 | 4689 |
| 0000022220 | C7F0 | EE46 | 0000 | 7E83 | 0006 | 037D | 09E9 | 8300 |
| 0000022240 | 067E | 7D04 | E903 | 0008 | 46C7 | 13EE | E900 | 00A1 |
| 0000022260 | 129A | 7A5A | 8921 | EE46 | 7E83 | 00EE | 0374 | 90E9 |
| 0000022300 | 8B00 | 0646 | E0C1 | 0502 | 1452 | 9A68 | 5020 | 681E |
| 0000022320 | 12A9 | 468D | 16B6 | 9A50 | 93A4 | 218C | C483 | 8D0C |

THU MAR 14 17:39:32 1991 IH.DLL PAGE 11, LINE 591

| | | | | | | | | |
|---|---|---|---|---|---|---|---|---|
| 0000022340 | EC46 | 5016 | 4E8D | 16B6 | 9A51 | 4ECE | 21C9 | C483 |
| 0000022360 | 8908 | EE46 | 7E83 | 00EE | 0374 | 54E9 | 8D00 | E646 |
| 0000022400 | 5016 | FF9A | 00FF | 8B00 | E646 | 4689 | 8BCA | E846 |
| 0000022420 | 4689 | FFF8 | EC76 | 468D | 16B6 | FF50 | F876 | 76FF |
| 0000022440 | FFCA | 0676 | 006A | 339A | D867 | 8321 | 0EC4 | 468D |
| 0000022460 | 16F4 | 6A50 | 9A0D | 70DC | 21E9 | C483 | FF06 | F676 |
| 0000022500 | 76FF | FFF4 | EC76 | 069A | 3649 | 831C | D6C4 | 4689 |
| 0000022520 | 8EEE | F006 | 2621 | 3E83 | 20BA | 7500 | E903 | 0009 |
| 0000022540 | 7E83 | FED0 | 0374 | 0FE9 | 8E00 | F206 | 2621 | 3E83 |
| 0000022560 | 1F7D | 7500 | E903 | 0051 | 468B | 89EE | D246 | 76FF |
| 0000022600 | FFD6 | D476 | 468D | 16D2 | FF50 | E476 | 76FF | FFFC |
| 0000022620 | FA76 | 4E8D | 16D8 | 8D51 | F04E | 5116 | 4E8D | 16CC |
| 0000022640 | 1E51 | C868 | 6812 | 00B3 | 36FF | 12BA | 36FF | 12B8 |
| 0000022660 | 36FF | 12BE | 36FF | 12BC | 679A | 0020 | 8300 | 28C4 |
| 0000022700 | 468B | E9D2 | 0009 | 06E9 | 8B00 | EE46 | 00E9 | 1F00 |
| 0000022720 | 5F5E | ED83 | 8B02 | 1FE5 | 4D5D | 02CA | 1E00 | 9058 |
| 0000022740 | 5545 | EC8B | 8E1E | 81D8 | 48EC | 5700 | 1E56 | 6BB8 |
| 0000022760 | 8E21 | C7D8 | FA46 | 12CF | 5E8C | C7FC | EA46 | 0101 |
| 0000023000 | C02B | 4689 | 89DC | DA46 | 068E | 21FD | 8326 | 423E |
| 0000023020 | 0024 | 0375 | 1DE9 | FF00 | BE36 | FF12 | BC36 | 8D12 |
| 0000023040 | D246 | 5016 | D09A | 0020 | 8300 | 08C4 | 003D | 7400 |
| 0000023060 | E903 | 000F | 068E | 21F2 | 8326 | 5A3E | 0024 | 0375 |
| 0000023100 | 3BE9 | 1E00 | D668 | 8D12 | DE46 | 5016 | 468D | 16D2 |
| 0000023120 | 8D50 | F446 | 5016 | D768 | 1E00 | FC68 | FF12 | BA36 |
| 0000023140 | FF12 | B836 | FF12 | BE36 | FF12 | BC36 | 9A12 | 2119 |
| 0000023160 | 0000 | C483 | 891E | F446 | 5689 | E9F6 | 0008 | C02B |
| 0000023200 | 4689 | 89F6 | F446 | 46C7 | 00F2 | 6800 | 23A0 | 5668 |
| 0000023220 | 1E14 | DD68 | 8D12 | BC46 | 5016 | A49A | 4F93 | 8323 |
| 0000023240 | 0CC4 | 468D | 16BA | 8D50 | BC46 | 5016 | CE9A | 8E4E |
| 0000023260 | 8323 | 08C4 | 4689 | 83F2 | F27E | 7400 | E903 | 0086 |
| 0000023300 | 468B | 0B08 | 0646 | 0375 | 17E9 | C400 | 065E | C02B |
| 0000023320 | 8926 | 0247 | 8926 | FF07 | 0876 | 76FF | 9A06 | 0FBE |
| 0000023340 | 0000 | 76FF | FF08 | 0676 | 76FF | 9ABA | 4906 | 23B1 |
| 0000023360 | C483 | 8906 | F246 | 7E83 | 00F2 | 0374 | 47E9 | 6800 |
| 0000023400 | 228F | 5668 | 1E14 | EB68 | 8D12 | BC46 | 5016 | A49A |
| 0000023420 | C393 | 8323 | 0CC4 | 468D | 16B8 | 8D50 | BC4E | 5116 |
| 0000023440 | CE9A | DE4E | 8323 | 08C4 | 4689 | 83F2 | F27E | 7400 |
| 0000023460 | E903 | 0012 | 006A | 006A | 76FF | 9AB8 | 4906 | 2419 |
| 0000023500 | C483 | 8906 | F246 | 7E83 | 00F2 | 0374 | 4CE9 | 8D00 |
| 0000023520 | EC46 | 5016 | A39A | 0021 | 8B00 | EC46 | 4689 | 8BD0 |
| 0000023540 | EE46 | 4689 | FFF8 | BA76 | 681E | 12FB | 76FF | FFF8 |
| 0000023560 | D076 | 016A | 006A | 339A | 2467 | 8324 | 0EC4 | 76FF |
| 0000023600 | 9AB8 | 4D5D | 2153 | C483 | 8B02 | BA46 | 5EC4 | 260E |
| 0000023620 | 0789 | 468B | C4B8 | 0A5E | 8926 | 8E07 | F006 | 2621 |
| 0000023640 | 3E83 | 21F8 | 7500 | E903 | 0009 | 7E83 | FED6 | 0374 |
| 0000023660 | 0FE9 | 8E00 | F206 | 2621 | 3E83 | 20E6 | 7500 | E903 |
| 0000023700 | 0051 | 468B | 89F2 | D846 | 76FF | FFDC | DA76 | 468D |
| 0000023720 | 16D8 | FF50 | EA76 | 76FF | FFFC | FA76 | 4E8D | 16DE |
| 0000023740 | 8D51 | F44E | 5116 | 4E8D | 16D2 | 1E51 | FC68 | 6812 |
| 0000023760 | 010D | 36FF | 12BA | 36FF | 12B8 | 36FF | 12BE | 36FF |
| 0000024000 | 12BC | 599A | 0022 | 8300 | 28C4 | 46BB | E9D8 | 0009 |
| 0000024020 | 06E9 | 8B00 | F246 | 00E9 | 1F00 | 5F5E | ED83 | 8B02 |
| 0000024040 | 1FE5 | 4D5D | 0CCA | 1E00 | 9058 | 5545 | EC8B | 8E1E |
| 0000024060 | 81D8 | 4CEC | 5700 | 1E56 | 2CB8 | 8E23 | C7D8 | F846 |
| 0000024100 | 1307 | 5E8C | C7FA | E246 | 0101 | C02B | 4689 | 89D4 |
| 0000024120 | D246 | 068E | 21F0 | 8326 | AF3E | 0022 | 0375 | 1DE9 |
| 0000024140 | FF00 | BE36 | FF12 | BC36 | 8D12 | CA46 | 5016 | C59A |
| 0000024160 | 0022 | 8300 | 08C4 | 003D | 7400 | E903 | 000F | 068E |
| 0000024200 | 21F2 | 8326 | DB3E | 0022 | 0375 | 3BE9 | 1E00 | 0E68 |

THU MAR 14 17:39:32 1991  IH.DLL  PAGE 12, LINE 650

| | | | | | | | | |
|---|---|---|---|---|---|---|---|---|
| 0000024220 | 8D13 | D646 | 5016 | 468D | 16CA | 8D50 | EE46 | 5016 |
| 0000024240 | 3168 | 1E01 | 2868 | FF13 | BA36 | FF12 | B836 | FF12 |
| 0000024260 | BE36 | FF12 | BC36 | 9A12 | 230E | 0000 | C483 | 891E |
| 0000024300 | EE46 | 5689 | E9F0 | 0008 | C02B | 4689 | 89F0 | EE46 |
| 0000024320 | 46C7 | 00EC | 8300 | 0C7E | 7D00 | E903 | 001B | 7E83 |
| 0000024340 | 040C | 037C | 12E9 | 8300 | 0A7E | 7D00 | E903 | 0009 |
| 0000024360 | 7E83 | 040A | 037D | 08E9 | C700 | EC46 | 0013 | 15E9 |
| 0000024400 | 9A01 | 5A12 | 233D | 4689 | 8DEC | E446 | 5016 | F59A |
| 0000024420 | 0023 | 8B00 | E446 | 4689 | 8BC8 | E646 | 4689 | 6AF6 |
| 0000024440 | 1EFF | 1568 | FF13 | F676 | 76FF | FFC8 | 0C76 | 006A |
| 0000024460 | 339A | F267 | 8325 | 0EC4 | 7E83 | 00EC | 0374 | 1CE9 |
| 0000024500 | 8300 | 0A7E | 7401 | E903 | 0013 | 468D | 16FC | 9A50 |
| 0000024520 | 4B5D | 2618 | C483 | 8904 | EC46 | B9E9 | 8300 | EC7E |
| 0000024540 | 7400 | E903 | 0081 | 76FF | FF0A | C876 | 681E | 1316 |
| 0000024560 | 468D | 16B4 | 9A50 | 93A4 | 262A | C483 | 8D0C | EA46 |
| 0000024600 | 5016 | 4E8D | 16B4 | 9A51 | 4ECE | 2652 | C483 | 8908 |
| 0000024620 | EC46 | 7E83 | 00EC | 0374 | 4CE9 | 8D00 | FC46 | 5016 |
| 0000024640 | 76FF | 8DEA | B44E | 5116 | FF6A | FF6A | 76FF | 9A0A |
| 0000024660 | 659D | 266E | C483 | 8910 | EC46 | 7E83 | 00EC | 0374 |
| 0000024700 | 24E9 | 8D00 | F246 | 5016 | 76FF | 9AFC | 70DC | 267F |
| 0000024720 | C483 | FF06 | F476 | 76FF | FFF2 | EA76 | 069A | 9649 |
| 0000024740 | 8326 | 06C4 | 4689 | 83EC | EC7E | 7400 | E903 | 0026 |
| 0000024760 | 76FF | 9AFC | 3792 | 25A4 | C483 | 8902 | EC46 | 7E83 |
| 0000025000 | 00EC | 0375 | 0FE9 | 8100 | EC7E | 03F4 | 0375 | 05E9 |
| 0000025020 | C700 | EC46 | 03E9 | 7E83 | 00EC | 0374 | 09E9 | 8B00 |
| 0000025040 | FC46 | 5EC4 | 2606 | 0789 | 068E | 21F0 | 8326 | F93E |
| 0000025060 | 0024 | 0375 | 09E9 | 8300 | CE7E | 74FE | E903 | 000F |
| 0000025100 | 068E | 21F2 | 8326 | 253E | 0025 | 0375 | 51E9 | 8B00 |
| 0000025120 | EC46 | 4689 | FFD0 | D476 | 76FF | 8DD2 | D046 | 5016 |
| 0000025140 | 76FF | FFE2 | FA76 | 76FF | 8DF8 | D64E | 5116 | 4E8D |
| 0000025160 | 16EE | 8D51 | CA4E | 5116 | 681E | 1328 | 7B68 | FF01 |
| 0000025200 | BA36 | FF12 | B836 | FF12 | BE36 | FF12 | BC36 | 9A12 |
| 0000025220 | 24A3 | 0000 | C483 | 8B28 | D046 | 09E9 | E900 | 0006 |
| 0000025240 | 468B | E9EC | 0000 | 5E1F | 835F | 02ED | E58B | 5D1F |
| 0000025260 | CA4D | 0008 | 581E | 4590 | 8B55 | 1EEC | D88E | EC81 |
| 0000025300 | 0000 | 5657 | B81E | 24D9 | D88E | 76FF | FF08 | 0676 |
| 0000025320 | 8C9A | D373 | 8325 | 04C4 | 00E9 | 1F00 | 5F5E | ED83 |
| 0000025340 | 8B02 | 1FE5 | 4D5D | 04CA | 1E00 | 9058 | 5545 | EC8B |
| 0000025360 | 8E1E | 81D8 | 26EC | 5700 | 1E56 | 66B8 | 8E27 | C7D8 |
| 0000025400 | FA46 | 1333 | 5E8C | C7FC | F246 | 0101 | C02B | 4689 |
| 0000025420 | 89E4 | E246 | 068E | 21F0 | 8326 | 4F3E | 0028 | 0375 |
| 0000025440 | 1DE9 | FF00 | BE36 | FF12 | BC36 | 8D12 | DA46 | 5016 |
| 0000025460 | 0F9A | 0025 | 8300 | 08C4 | 003D | 7400 | E903 | 000F |
| 0000025500 | 068E | 21F2 | 8326 | 673E | 0028 | 0375 | 3BE9 | 1E00 |
| 0000025520 | 3A68 | 8D13 | E646 | 5016 | 468D | 16DA | 8D50 | F646 |
| 0000025540 | 5016 | B168 | 1E01 | 4268 | FF13 | BA36 | FF12 | B836 |
| 0000025560 | FF12 | BE36 | FF12 | BC36 | 9A12 | 2558 | 0000 | C483 |
| 0000025600 | 891E | F646 | 5689 | E9F8 | 0008 | C02B | 4689 | 89F8 |
| 0000025620 | F646 | 46C7 | 00F4 | 6800 | 03EC | 76FF | 9A06 | 42BF |
| 0000025640 | 2773 | C483 | 8904 | F446 | 068E | 21F0 | 8326 | CF3E |
| 0000025660 | 0026 | 0375 | 09E9 | 8300 | DE7E | 74FE | E903 | 000F |
| 0000025700 | 068E | 21F2 | 8326 | E73E | 0026 | 0375 | 51E9 | 8B00 |
| 0000025720 | F446 | 4689 | FFE0 | E476 | 76FF | 8DE2 | E046 | 5016 |
| 0000025740 | 76FF | FFF2 | FC76 | 76FF | 8DFA | E64E | 5116 | 4E8D |
| 0000025760 | 16F6 | 8D51 | DA4E | 5116 | 681E | 1342 | BA68 | FF01 |
| 0000026000 | BA36 | FF12 | B836 | FF12 | BE36 | FF12 | BC36 | 9A12 |
| 0000026020 | 2730 | 0000 | C483 | 8B28 | E046 | 09E9 | E900 | 0006 |
| 0000026040 | 468B | E9F4 | 0000 | 5E1F | 835F | 02ED | E58B | 5D1F |
| 0000026060 | CA4D | 0002 | 581E | 4590 | 8B55 | 1EEC | D88E | EC81 |

THU MAR 14 17:39:32 1991 IH.DLL PAGE 13, LINE 709

| | | | | | | | | |
|---|---|---|---|---|---|---|---|---|
| 0000026100 | 0028 | 5657 | B81E | 279B | D88E | 46C7 | 4AFA | 8C13 |
| 0000026120 | FC5E | 46C7 | 01F0 | 2B01 | 89C0 | E246 | 4689 | 8EE0 |
| 0000026140 | F006 | 2621 | 3E83 | 29B4 | 7500 | E903 | 001D | 36FF |
| 0000026160 | 12BE | 36FF | 12BC | 468D | 16D8 | 9A50 | 27D1 | 0000 |
| 0000026200 | C483 | 3D08 | 0000 | 0374 | 0FE9 | 8E00 | F206 | 2621 |
| 0000026220 | 3E83 | 29CC | 7500 | E903 | 003B | 681E | 1351 | 468D |
| 0000026240 | 16E4 | 8D50 | D846 | 5016 | 468D | 16F6 | 6850 | 01CE |
| 0000026260 | 681E | 1358 | 36FF | 12BA | 36FF | 12B8 | 36FF | 12BE |
| 0000026300 | 36FF | 12BC | 1A9A | 0028 | 8300 | 1EC4 | 4689 | 89F6 |
| 0000026320 | F856 | 08E9 | 2B00 | 89C0 | F846 | 4689 | C7F6 | F446 |
| 0000026340 | 0000 | 468D | 16F2 | 6A50 | 9A00 | 6C75 | 299A | C483 |
| 0000026360 | 8906 | F446 | 76FF | 9AF2 | 558A | 29A5 | C483 | FF02 |
| 0000026400 | F276 | D49A | 4056 | 8328 | 02C4 | 4689 | 8EF4 | F006 |
| 0000026420 | 2621 | 3E83 | 27BB | 7500 | E903 | 0009 | 7E83 | FEDC |
| 0000026440 | 0374 | 0FE9 | 8E00 | F206 | 2621 | 3E83 | 27E7 | 7500 |
| 0000026460 | E903 | 0051 | 468B | 89F4 | DE46 | 76FF | FFE2 | E076 |
| 0000026500 | 468D | 16DE | FF50 | F076 | 76FF | FFFC | FA76 | 4E8D |
| 0000026520 | 16E4 | 8D51 | F64E | 5116 | 4E8D | 16D8 | 1E51 | 5868 |
| 0000026540 | 6813 | 01DC | 36FF | 12BA | 36FF | 12B8 | 36FF | 12BE |
| 0000026560 | 36FF | 12BC | B09A | 0028 | 8300 | 28C4 | 468B | E9DE |
| 0000026600 | 0009 | 06E9 | 8B00 | F446 | 00E9 | 1F00 | 5F5E | ED83 |
| 0000026620 | 8B02 | 1FE5 | 4D5D | 1ECB | 9058 | 5545 | EC8B | 8E1E |
| 0000026640 | 81D8 | 2AEC | 5700 | 1E56 | E6B8 | 8E28 | C7D8 | FA46 |
| 0000026660 | 135F | 5E8C | C7FC | EE46 | 0101 | C02B | 4689 | 89E0 |
| 0000026700 | DE46 | 068E | 21F0 | 8326 | 063E | 0029 | 0375 | 1DE9 |
| 0000026720 | FF00 | BE36 | FF12 | BC36 | 8D12 | D646 | 5016 | 1C9A |
| 0000026740 | 0029 | 8300 | 08C4 | 003D | 7400 | E903 | 000F | 068E |
| 0000026760 | 21F2 | 8326 | 323E | 0029 | 0375 | 3BE9 | 1E00 | 6668 |
| 0000027000 | 8D13 | E246 | 5016 | 468D | 16D6 | 8D50 | F446 | 5016 |
| 0000027020 | F068 | 1E01 | 6E68 | FF13 | BA36 | FF12 | B836 | FF12 |
| 0000027040 | BE36 | FF12 | BC36 | 9A12 | 2965 | 0000 | C483 | 891E |
| 0000027060 | F446 | 5689 | E9F6 | 0008 | C02B | 4689 | 89F6 | F446 |
| 0000027100 | 46C7 | 00F2 | FF00 | 0676 | 4C9A | FE3A | 832A | 02C4 |
| 0000027120 | 4689 | 8DF2 | F046 | 5016 | 76FF | 9A06 | 6C75 | 2B11 |
| 0000027140 | C483 | 8906 | F246 | 468D | 16F8 | FF50 | 0676 | 4C9A |
| 0000027160 | 2E68 | 832B | 06C4 | 7E83 | 00F2 | 0374 | 22E9 | 8300 |
| 0000027200 | F87E | 7501 | E903 | 000B | 76FF | 9AF0 | 558A | 2B39 |
| 0000027220 | C483 | FF02 | F076 | D49A | 8C56 | 8329 | 02C4 | 4689 |
| 0000027240 | FFF2 | 0676 | DC9A | EB67 | 832A | 02C4 | 068E | 21F0 |
| 0000027260 | 8326 | 693E | 002A | 0375 | 09E9 | 8300 | DA7E | 74FE |
| 0000027300 | E903 | 000F | 068E | 21F2 | 8326 | 953E | 002A | 0375 |
| 0000027320 | 51E9 | 8B00 | F246 | 4689 | FFDC | E076 | 76FF | 8DDE |
| 0000027340 | DC46 | 5016 | 76FF | FFEE | FC76 | 76FF | 8DFA | E24E |
| 0000027360 | 5116 | 4E8D | 16F4 | 8D51 | D64E | 5116 | 681E | 136E |
| 0000027400 | 0868 | FF02 | BA36 | FF12 | B836 | FF12 | BE36 | FF12 |
| 0000027420 | BC36 | 9A12 | 2A15 | 0000 | C483 | 8B28 | DC46 | 09E9 |
| 0000027440 | E900 | 0006 | 468B | E9F2 | 0000 | 5E1F | 835F | 02ED |
| 0000027460 | E58B | 5D1F | CA4D | 0002 | 581E | 4590 | 8B55 | 1EEC |
| 0000027500 | D88E | EC81 | 0028 | 5657 | B81E | 2A49 | D88E | 46C7 |
| 0000027520 | 79FA | 8C13 | FC5E | 46C7 | 01F0 | 2B01 | 89C0 | E246 |
| 0000027540 | 4689 | 8EE0 | F006 | 2621 | 3E83 | 2CE6 | 7500 | E903 |
| 0000027560 | 001D | 36FF | 12BE | 36FF | 12BC | 468D | 16D8 | 9A50 |
| 0000027600 | 2A7F | 0000 | C483 | 3D08 | 0000 | 0374 | 0FE9 | 8E00 |
| 0000027620 | F206 | 2621 | 3E83 | 2CFE | 7500 | E903 | 003B | 681E |
| 0000027640 | 1380 | 468D | 16E4 | 8D50 | D846 | 5016 | 468D | 16F6 |
| 0000027660 | 6850 | 021D | 681E | 1388 | 36FF | 12BA | 36FF | 12B8 |
| 0000027700 | 36FF | 12BE | 36FF | 12BC | C89A | 002A | 8300 | 1EC4 |
| 0000027720 | 4689 | 89F6 | F856 | 08E9 | 2B00 | 89C0 | F846 | 4689 |
| 0000027740 | C7F6 | F446 | 0000 | 468D | 16F2 | 6A50 | 9A00 | 6C75 |

THU MAR 14 17:39:32 1991 IH.DLL PAGE 14, LINE 768

| | | | | | | | | |
|---|---|---|---|---|---|---|---|---|
| 0000027760 | 2CA7 | C483 | 8906 | F446 | 7E83 | 0DF4 | 0374 | 0EE9 |
| 0000030000 | FF00 | F276 | D49A | C056 | 832C | 02C4 | 4689 | 83F4 |
| 0000030020 | F47E | 7400 | E903 | 0010 | 468D | 16F2 | 9A50 | 4D81 |
| 0000030040 | 2CD7 | C483 | 8904 | F446 | 7E83 | 00F4 | 0374 | 0EE9 |
| 0000030060 | FF00 | F276 | D49A | 4756 | 832B | 02C4 | 4689 | 8EF4 |
| 0000030100 | F006 | 2621 | 3E83 | 2B53 | 7500 | E903 | 0009 | 7E83 |
| 0000030120 | FEDC | 0374 | 0FE9 | 8E00 | F206 | 2621 | 3E83 | 2B6B |
| 0000030140 | 7500 | E903 | 0051 | 468B | 89F4 | DE46 | 76FF | FFE2 |
| 0000030160 | E076 | 468D | 16DE | FF50 | F076 | 76FF | FFFC | FA76 |
| 0000030200 | 4E8D | 16E4 | 8D51 | F64E | 5116 | 4E8D | 16D8 | 1E51 |
| 0000030220 | 8868 | 6813 | 0231 | 36FF | 12BA | 36FF | 12B8 | 36FF |
| 0000030240 | 12BE | 36FF | 12BC | B49A | 002B | 8300 | 28C4 | 468B |
| 0000030260 | E9DE | 0009 | 06E9 | 8B00 | F446 | 00E9 | 1F00 | 5F5E |
| 0000030300 | ED83 | 8B02 | 1FE5 | 4D5D | 1ECB | 9058 | 5545 | EC8B |
| 0000030320 | 8E1E | 81D8 | 32EC | 5700 | 1E56 | EAB8 | 8E2B | C7D8 |
| 0000030340 | FA46 | 1393 | 5E8C | C7FC | EC46 | 0101 | C02B | 4689 |
| 0000030360 | 89DC | DA46 | 068E | 21F0 | 8326 | 593E | 002F | 0375 |
| 0000030400 | 1DE9 | FF00 | BE36 | FF12 | BC36 | 8D12 | D246 | 5016 |
| 0000030420 | 209A | 002C | 8300 | 08C4 | 003D | 7400 | E903 | 000F |
| 0000030440 | 068E | 21F2 | 8326 | 713E | 002F | 0375 | 3BE9 | 1E0[illegible] |
| 0000030460 | 9A68 | 8D13 | E046 | 5016 | 468D | 16D2 | 8D50 | F646 |
| 0000030500 | 5016 | 6068 | 1E02 | A268 | FF13 | BA36 | FF12 | B836 |
| 0000030520 | FF12 | BE36 | FF12 | BC36 | 9A12 | 2C69 | 0000 | C483 |
| 0000030540 | 891E | F646 | 5689 | E9F8 | 0008 | C02B | 4689 | 89F8 |
| 0000030560 | F646 | 46C7 | 00F4 | 1E00 | C068 | 8B12 | 1046 | 460B |
| 0000030600 | 740E | E903 | 0009 | 00B8 | BA00 | 0000 | 21E9 | 830U |
| 0000030620 | 0E7E | 74FF | E903 | 0012 | 7E83 | FF10 | 0374 | 09E9 |
| 0000030640 | B800 | FFFF | FFBA | E9FF | 0006 | 468B | 8B0E | 1056 |
| 0000030660 | 5052 | 8A9A | 001B | 8900 | DE46 | 7E83 | 00DE | 0375 |
| 0000030700 | 16E9 | 8300 | DE7E | 7479 | E903 | 0008 | 46C7 | EAF4 |
| 0000030720 | E903 | 0005 | 46C7 | 05F4 | 8300 | F47E | 7400 | E903 |
| 0000030740 | 00D0 | 468D | 16EE | FF50 | 1676 | 759A | A76C | 832E |
| 0000030760 | 06C4 | 4689 | 83F4 | F47E | 7400 | E903 | 0087 | 76FF |
| 0000031000 | FF14 | 1276 | 239A | B846 | 832E | D4C4 | 76FF | FF14 |
| 0000031020 | 1276 | 76FF | 9AEE | 3BB4 | 2F1D | C483 | 8906 | F446 |
| 0000031040 | 7E83 | 00F4 | 0374 | 5CE9 | 8B00 | 0846 | 460B | 7506 |
| 0000031060 | E903 | 0051 | 468D | 16F0 | 8B50 | 0C46 | 460B | 740A |
| 0000031100 | E903 | 0009 | 00B8 | BA00 | 0000 | 21E9 | 8300 | 0A7E |
| 0000031120 | 74FF | E903 | 0012 | 7E83 | FF0C | 0374 | 09E9 | B800 |
| 0000031140 | FFFF | FFBA | E9FF | 0006 | 468B | 8B0A | 0C56 | 5052 |
| 0000031160 | 5EC4 | 2612 | 77FF | FF06 | 1676 | B89A | 903E | 832C |
| 0000031200 | 0CC4 | 4689 | 83F4 | F47E | 7400 | E903 | 001B | 468B |
| 0000031220 | 0B08 | 0646 | 0375 | 10E9 | 8B00 | F046 | 568B | C4F2 |
| 0000031240 | 065E | 8926 | 2607 | 5789 | 1E02 | C068 | 9A12 | 1C2F |
| 0000031260 | 0000 | 068E | 21F0 | 8326 | 0A3E | 002C | 0375 | 09E9 |
| 0000031300 | 8300 | D67E | 74FE | E903 | 000F | 068E | 21F2 | 8326 |
| 0000031320 | 363E | 002C | 0375 | 51E9 | 8B00 | F446 | 4689 | FFD8 |
| 0000031340 | DC76 | 76FF | 8DDA | D846 | 5016 | 76FF | FFEC | FC76 |
| 0000031360 | 76FF | 8DFA | E04E | 5116 | 4E8D | 16F6 | 8D51 | D24E |
| 0000031400 | 5116 | 681E | 13A2 | 8F68 | FF02 | BA36 | FF12 | B836 |
| 0000031420 | FF12 | BE36 | FF12 | BC36 | 9A12 | 2D47 | 0000 | C483 |
| 0000031440 | 8B28 | D846 | 09E9 | E900 | 0006 | 468B | E9F4 | 0000 |
| 0000031460 | 5E1F | 835F | 02ED | E58B | 5D1F | CA4D | 0012 | 581E |
| 0000031500 | 4590 | 8B55 | 1EEC | D88E | EC81 | 0026 | 5657 | B81E |
| 0000031520 | 2D7B | D88E | 46C7 | ADFA | 8C13 | FC5E | 46C7 | 01F2 |
| 0000031540 | 2B01 | 89C0 | E446 | 4689 | 8EE2 | F006 | 2621 | 3E83 |
| 0000031560 | 30B5 | 7500 | E903 | 001D | 36FF | 12BE | 36FF | 12BC |
| 0000031600 | 468D | 16DA | 9A50 | 2DB1 | 0000 | C483 | 3D08 | 0000 |
| 0000031620 | 0374 | 0FE9 | 8E00 | F206 | 2621 | 3E83 | 30CD | 7500 |

THU MAR 14 17:39:32 1991 IH.DLL PAGE 15, LINE 827

| | | | | | | | | |
|---|---|---|---|---|---|---|---|---|
| 0000031640 | E903 | 003B | 681E | 13B4 | 468D | 16E6 | 8D50 | DA46 |
| 0000031660 | 5016 | 468D | 16F6 | 6850 | 02B7 | 681E | 13BC | 36FF |
| 0000031700 | 12BA | 36FF | 12B8 | 36FF | 12BE | 36FF | 12BC | FA9A |
| 0000031720 | 002D | 8300 | 1EC4 | 4689 | 89F6 | F856 | 08E9 | 2B00 |
| 0000031740 | 89C0 | F846 | 4689 | C7F6 | F446 | 0000 | 76FF | FF08 |
| 0000031760 | 0676 | 239A | A646 | 8330 | 04C4 | 76FF | FF08 | 0676 |
| 0000032000 | 76FF | 9A0A | 3BB4 | 2E8D | C483 | 8906 | F446 | 068E |
| 0000032020 | 21F0 | 8326 | 9B3E | 002D | 0375 | 09E9 | 8300 | DE7E |
| 0000032040 | 74FE | E903 | 000F | 068E | 21F2 | 8326 | C73E | 002D |
| 0000032060 | 0375 | 51E9 | 8B00 | F446 | 4689 | FFE0 | E476 | 76FF |
| 0000032100 | 8DE2 | E046 | 5016 | 76FF | FFF2 | FC76 | 76FF | 8DFA |
| 0000032120 | E64E | 5116 | 4E8D | 16F6 | 8D51 | DA4E | 5116 | 681E |
| 0000032140 | 13BC | C568 | FF02 | BA36 | FF12 | B836 | FF12 | BE36 |
| 0000032160 | FF12 | BC36 | 9A12 | 2FBA | 0000 | C483 | 8B28 | E046 |
| 0000032200 | 09E9 | E900 | 0006 | 468B | E9F4 | 0000 | 5E1F | 835F |
| 0000032220 | 02ED | E58B | 5D1F | CA4D | 0006 | 581E | 4590 | 8B55 |
| 0000032240 | 1EEC | D88E | EC81 | 0034 | 5657 | B81E | 2FF0 | D88E |
| 0000032260 | 46C7 | CBFA | 8C13 | FC5E | 46C7 | 01EA | 2B01 | 89C0 |
| 0000032300 | DA46 | 4689 | 8ED8 | F006 | 2621 | 3E83 | 3010 | 7500 |
| 0000032320 | E903 | 001D | 36FF | 12BE | 36FF | 12BC | 468D | 16D0 |
| 0000032340 | 9A50 | 3026 | 0000 | C483 | 3D08 | 0000 | 0374 | 0FE9 |
| 0000032360 | 8E00 | F206 | 2621 | 3E83 | 303C | 7500 | E903 | 003B |
| 0000032400 | 681E | 13D2 | 468D | 16DE | 8D50 | D046 | 5016 | 468D |
| 0000032420 | 16F4 | 6850 | 02F9 | 681E | 13DA | 36FF | 12BA | 36FF |
| 0000032440 | 12B8 | 36FF | 12BE | 36FF | 12BC | 6F9A | 0030 | 8300 |
| 0000032460 | 1EC4 | 4689 | 89F4 | F656 | 08E9 | 2B00 | 89C0 | F646 |
| 0000032500 | 4689 | C7F4 | F246 | 0000 | 468D | 16F8 | FF50 | 1676 |
| 0000032520 | 4C9A | 9568 | 8330 | 06C4 | 4689 | 81F2 | F27E | 03EF |
| 0000032540 | 0374 | 08E9 | C700 | F246 | 03E8 | 7CE9 | 8300 | F27E |
| 0000032560 | 7400 | E903 | 0011 | 7E83 | 01F8 | 0375 | 08E9 | C700 |
| 0000032600 | F246 | 0013 | 62E9 | 1E00 | C468 | 8B12 | 1046 | 460B |
| 0000032620 | 740E | E903 | 0009 | 00B8 | BA00 | 0000 | 21E9 | 8300 |
| 0000032640 | 0E7E | 74FF | E903 | 0012 | 7E83 | FF10 | 0374 | 09E9 |
| 0000032660 | B800 | FFFF | FFBA | E9FF | 0006 | 468B | 8B0E | 1056 |
| 0000032700 | 5052 | 539A | 002E | 8900 | DC46 | 7E83 | 00DC | 0375 |
| 0000032720 | 16E9 | 8300 | DC7E | 7479 | E903 | 0008 | 46C7 | EAF2 |
| 0000032740 | E903 | 0005 | 46C7 | 05F2 | 8300 | F27E | 7400 | E903 |
| 0000032760 | 00CD | 468D | 16EC | 9A50 | 4D81 | 32B4 | C483 | 8904 |
| 0000033000 | F246 | 7E83 | 00F2 | 0374 | 87E9 | FF00 | 1476 | 76FF |
| 0000033020 | 9A12 | 4623 | 32C5 | C483 | FFD4 | 1476 | 76FF | FF12 |
| 0000033040 | EC76 | B49A | 2A3B | 8333 | 06C4 | 4689 | 83F2 | F27E |
| 0000033060 | 7400 | E903 | 005C | 468B | 0B08 | 0646 | 0375 | 51E9 |
| 0000033100 | 8D00 | EE46 | 5016 | 468B | 0B0C | 0A46 | 0374 | 09E9 |
| 0000033120 | B800 | 0000 | 00BA | E900 | 0021 | 7E83 | FF0A | 0374 |
| 0000033140 | 12E9 | 8300 | 0C7E | 74FF | E903 | 0009 | FFB8 | BAFF |
| 0000033160 | FFFF | 06E9 | 8B00 | 0A46 | 568B | 520C | C450 | 125E |
| 0000033200 | FF26 | 0677 | 73FF | 9A16 | 3EB8 | 31F3 | C483 | 890C |
| 0000033220 | F246 | 7E83 | 00F2 | 0374 | 1BE9 | 8B00 | 0846 | 460B |
| 0000033240 | 7506 | E903 | 0010 | 468B | 8BEE | F056 | 5EC4 | 2606 |
| 0000033260 | 0789 | 8926 | 0257 | 681E | 12C4 | 4E9A | 002F | 8E00 |
| 0000033300 | F006 | 2621 | 3E83 | 316C | 7500 | E903 | 0009 | 7E83 |
| 0000033320 | FED4 | 0374 | 0FE9 | 8E00 | F206 | 2621 | 3E83 | 3198 |
| 0000033340 | 7500 | E903 | 0051 | 468B | 89F2 | D646 | 76FF | FFDA |
| 0000033360 | D876 | 468D | 16D6 | FF50 | EA76 | 76FF | FFFC | FA76 |
| 0000033400 | 4E8D | 16DE | 8D51 | F44E | 5116 | 4E8D | 16D0 | 1E51 |
| 0000033420 | DA68 | 6813 | 0336 | 36FF | 12BA | 36FF | 12B8 | 36FF |
| 0000033440 | 12BE | 36FF | 12BC | 169A | 0031 | 8300 | 28C4 | 468B |
| 0000033460 | E9D6 | 0009 | 06E9 | 8B00 | F246 | 00E9 | 1F00 | 5F5E |
| 0000033500 | ED83 | 8B02 | 1FE5 | 4D5D | 12CA | 1E00 | 9058 | 5545 |

THU MAR 14 17:39:32 1991 IH.DLL PAGE 16, LINE 886

| | | | | | | | | |
|---|---|---|---|---|---|---|---|---|
| 0000033520 | EC8B | 8E1E | 81D8 | 2AEC | 5700 | 1E56 | 4CB8 | 8E31 |
| 0000033540 | C7D8 | FA46 | 13E5 | 5E8C | C7FC | EE46 | 0101 | C02B |
| 0000033560 | 4689 | 89E0 | DE46 | 068E | 21F0 | 8326 | 313E | 0035 |
| 0000033600 | 0375 | 1DE9 | FF00 | BE36 | FF12 | BC36 | 8D12 | D646 |
| 0000033620 | 5016 | 829A | 0031 | 8300 | 08C4 | 003D | 7400 | E903 |
| 0000033640 | 000F | 068E | 21F2 | 8326 | 493E | 0035 | 0375 | 3BE9 |
| 0000033660 | 1E0D | EC68 | 8D13 | E246 | 5016 | 468D | 16D6 | 8D50 |
| 0000033700 | F446 | 5016 | 5168 | 1E03 | F468 | FF13 | BA36 | FF12 |
| 0000033720 | B836 | FF12 | BE36 | FF12 | BC36 | 9A12 | 31CB | 0000 |
| 0000033740 | C483 | 891E | F446 | 5689 | E9F6 | 0008 | C02B | 4689 |
| 0000033760 | 89F6 | F446 | 46C7 | 00F2 | 8D00 | F846 | 5016 | 006A |
| 0000034000 | 4C9A | CF68 | 8334 | 06C4 | 4689 | 83F2 | F27E | 7500 |
| 0000034020 | E903 | 0008 | 46C7 | E8F2 | E903 | 006E | 7E83 | 01F8 |
| 0000034040 | 0374 | 12E9 | 8D00 | F046 | 5016 | 006A | 759A | F36C |
| 0000034060 | 8334 | 06C4 | 38E9 | C400 | 0A5E | 8326 | 027F | 7401 |
| 0000034100 | E903 | 0017 | 468D | 16F0 | C450 | 0A5E | FF26 | 0277 |
| 0000034120 | 5A9A | 0A6F | 8335 | 06C4 | 14E9 | 8D00 | F046 | 5016 |
| 0000034140 | 5EC4 | 260A | 77FF | 9A04 | 6DD8 | 3522 | C483 | FF06 |
| 0000034160 | F076 | 5EC4 | 260A | 77FF | FF06 | 0876 | 76FF | 9A06 |
| 0000034200 | 3D53 | 329A | C483 | 8908 | F246 | 068E | 21F0 | 8326 |
| 0000034220 | 663E | 0033 | 0375 | 09E9 | 8300 | DA7E | 74FE | E903 |
| 0000034240 | 000F | 068E | 21F2 | 8326 | 7E3E | 0033 | 0375 | 51E9 |
| 0000034260 | 8B00 | F246 | 4689 | FFDC | E076 | 76FF | 8DDE | DC46 |
| 0000034300 | 5016 | 76FF | FFEE | FC76 | 76FF | 8DFA | E24E | 5116 |
| 0000034320 | 4E8D | 16F4 | 8D51 | D64E | 5116 | 681E | 13F4 | 7168 |
| 0000034340 | FF03 | BA36 | FF12 | B836 | FF12 | BE36 | FF12 | BC36 |
| 0000034360 | 9A12 | 33C7 | 0000 | C483 | 8B28 | DC46 | 09E9 | E900 |
| 0000034400 | 0006 | 468B | E9F2 | 0000 | 5E1F | 835F | 02ED | E58B |
| 0000034420 | 5D1F | CA4D | 0008 | 581E | 4590 | 8B55 | 1EEC | D88E |
| 0000034440 | EC81 | 002A | 5657 | B81E | 33FD | D88E | 46C7 | 02FA |
| 0000034460 | 8C14 | FC5E | 46C7 | 01F2 | 2B01 | 89C0 | E446 | 4689 |
| 0000034500 | 8EE2 | F006 | 2621 | 3E83 | 36D8 | 7500 | E903 | 001D |
| 0000034520 | 36FF | 12BE | 36FF | 12BC | 468D | 16DA | 9A50 | 3433 |
| 0000034540 | 0000 | C483 | 3D08 | 0000 | 0374 | 0FE9 | 8E00 | F206 |
| 0000034560 | 2621 | 3E83 | 36F0 | 7500 | E903 | 003B | 681E | 1409 |
| 0000034600 | 468D | 16E6 | 8D50 | DA46 | 5016 | 468D | 16F6 | 6850 |
| 0000034620 | 0390 | 681E | 1410 | 36FF | 12BA | 36FF | 12B8 | 36FF |
| 0000034640 | 12BE | 36FF | 12BC | 7C9A | 0034 | 8300 | 1EC4 | 4689 |
| 0000034660 | 89F6 | F856 | 08E9 | 2B00 | 89C0 | F846 | 4689 | C7F6 |
| 0000034700 | F446 | 0000 | 468D | 16D8 | 6A50 | 9A00 | 6C75 | 367B |
| 0000034720 | C483 | 8D06 | D646 | 5016 | 819A | AE4D | 8336 | 04C4 |
| 0000034740 | 468B | 0B08 | 0646 | 0375 | 17E9 | C400 | 065E | C02B |
| 0000034760 | 8926 | 0247 | 8926 | FF07 | 0876 | 76FF | 9A06 | 237E |
| 0000035000 | 0000 | 76FF | FF08 | 0676 | 76FF | 9AD8 | 47AA | 36C9 |
| 0000035020 | C483 | 8906 | F446 | 7E83 | 00F4 | 0374 | 12E9 | 6A00 |
| 0000035040 | 6A00 | FF00 | D676 | AA9A | A347 | 8334 | 06C4 | 4689 |
| 0000035060 | 8EF4 | F006 | 2621 | 3E83 | 341D | 7500 | E903 | 0009 |
| 0000035100 | 7E83 | FEDE | 0374 | 0FE9 | 8E00 | F206 | 2621 | 3E83 |
| 0000035120 | 3449 | 7500 | E903 | 0051 | 468B | 89F4 | E046 | 76FF |
| 0000035140 | FFE4 | E276 | 468D | 16E0 | FF50 | F276 | 76FF | FFFC |
| 0000035160 | FA76 | 4E8D | 16E6 | 8D51 | F64E | 5116 | 4E8D | 16DA |
| 0000035200 | 1E51 | 1068 | 6814 | 03A7 | 36FF | 12BA | 36FF | 12B8 |
| 0000035220 | 36FF | 12BE | 36FF | 12BC | 929A | 0035 | 8300 | 28C4 |
| 0000035240 | 468B | E9E0 | 0009 | 06E9 | 8B00 | F446 | 0DE9 | 1F00 |
| 0000035260 | 5F5E | ED83 | 8B02 | 1FE5 | 4D5D | 04CA | 1E00 | 9058 |
| 0000035300 | 5545 | EC8B | 8E1E | 81D8 | 00EC | 5700 | 1E56 | C8B8 |
| 0000035320 | 8E35 | FFD8 | 0876 | 76FF | 9A06 | 8D7E | 366E | C483 |
| 0000035340 | E904 | 0000 | 5E1F | 835F | 02ED | E58B | 5D1F | CA4D |
| 0000035360 | 0004 | 581E | 4590 | 8B55 | 1EEC | D88E | EC81 | 004C |

THU MAR 14 17:39:32 1991 IH.DLL PAGE 17, LINE 945

| | | | | | | | | |
|---|---|---|---|---|---|---|---|---|
| 0000035400 | 5657 | 46C7 | 2EFA | 8C14 | FC5E | 46C7 | 01E8 | 2B01 |
| 0000035420 | 89C0 | DA46 | 4689 | 8ED8 | F406 | 2621 | 3E83 | 35E8 |
| 0000035440 | 7500 | E903 | 001D | 36FF | 1450 | 36FF | 144E | 468D |
| 0000035460 | 16D0 | 9A50 | 35FE | 0000 | C483 | 3D08 | 0000 | 0374 |
| 0000035500 | 0FE9 | 8E00 | F606 | 2621 | 3E83 | 39E2 | 7500 | E903 |
| 0000035520 | 003A | 681E | 1435 | 468D | 16DC | 8D50 | D046 | 5016 |
| 0000035540 | 468D | 16EE | 6A50 | 1E64 | 6468 | FF14 | 4C36 | FF14 |
| 0000035560 | 4A36 | FF14 | 5036 | FF14 | 4E36 | 9A14 | 3647 | 000D |
| 0000035600 | C483 | 891E | EE46 | 5689 | E9F0 | 0008 | C02B | 4689 |
| 0000035620 | 89F0 | EE46 | 46C7 | 00EC | 8D00 | F246 | 5016 | 76FF |
| 0000035640 | 9A06 | 684C | 3860 | C483 | 8B06 | F246 | E0C1 | 0502 |
| 0000035660 | 1452 | 501E | 681E | 143C | 468D | 16B8 | 9A50 | 93A4 |
| 0000035700 | 3877 | C483 | 8D0C | EA46 | 5016 | 006A | 9868 | 8D3A |
| 0000035720 | B846 | 5016 | CC9A | 9350 | 8338 | 0CC4 | 4689 | 83EC |
| 0000035740 | EC7E | 7400 | E903 | 013B | 468D | 16CC | FF50 | 0676 |
| 0000035760 | 349A | A172 | 8338 | 06C4 | 76FF | FFCE | CC76 | 689A |
| 0000036000 | B490 | 8338 | 04C4 | 8940 | F846 | 468B | 05F8 | 0012 |
| 0000036020 | 9A50 | 8D74 | 38E3 | C483 | 8902 | F446 | 5689 | 8BF6 |
| 0000036040 | F646 | 460B | 74F4 | E903 | 0008 | 46C7 | 07EC | E900 |
| 0000036060 | 00E9 | 76FF | 68F8 | 03EF | 026A | 76FF | FFF6 | F476 |
| 0000036100 | BA9A | 0D44 | 8339 | 0AC4 | 468B | C4F8 | F45E | 8926 |
| 0000036120 | 1047 | 5EC4 | 26F4 | 77FF | FF1D | CE76 | 76FF | 8BCC |
| 0000036140 | F446 | 568B | 05F6 | 0012 | 5052 | A29A | 3894 | 8339 |
| 0000036160 | 0AC4 | 4E8B | 8BF4 | F65E | C183 | 3B12 | 74C1 | E903 |
| 0000036200 | 000A | D33B | 0374 | 03E9 | E900 | 0000 | 76FF | FFF6 |
| 0000036220 | F476 | 76FF | 9AEA | 3BB4 | 3960 | C483 | 8906 | EC46 |
| 0000036240 | 7E83 | 00EC | 0374 | 64E9 | 8D00 | B446 | 5016 | 006A |
| 0000036260 | 9868 | C43A | F45E | FF26 | 0677 | 76FF | 9A06 | 3EB8 |
| 0000036300 | 3992 | C483 | 890C | EC46 | 7E83 | 00EC | 0374 | 3CE9 |
| 0000036320 | C400 | B45E | 8326 | 147F | 7400 | E903 | 001C | 5EC4 |
| 0000036340 | 26B4 | 77FF | C406 | B45E | FF26 | 0477 | 76FF | 9A06 |
| 0000036360 | 679E | 39A8 | C483 | E906 | 0005 | 46C7 | F4EC | FF03 |
| 0000036400 | B676 | 76FF | 9AB4 | 8D7E | 39B6 | C483 | FF04 | F676 |
| 0000036420 | 76FF | 9AF4 | 8D7E | 377C | C483 | FF04 | EA76 | FF9A |
| 0000036440 | 00FF | 8E00 | F406 | 2621 | 3E83 | 37BE | 7500 | E903 |
| 0000036460 | 0009 | 7E83 | FED4 | 0374 | 0FE9 | 8E00 | F606 | 2621 |
| 0000036500 | 3E83 | 3614 | 7500 | E903 | 0051 | 468B | 89EC | D646 |
| 0000036520 | 76FF | FFDA | D876 | 468D | 16D6 | FF50 | E876 | 76FF |
| 0000036540 | FFFC | FA76 | 4E8D | 16DC | 8D51 | EE4E | 5116 | 4E8D |
| 0000036560 | 16D0 | 1E51 | 6468 | 6814 | 00A4 | 36FF | 144C | 36FF |
| 0000036600 | 144A | 36FF | 1450 | 36FF | 144E | 399A | 0037 | 8300 |
| 0000036620 | 28C4 | 468B | E9D6 | 0009 | 06E9 | 8B00 | EC46 | 00E9 |
| 0000036640 | 5E00 | 835F | 02ED | E58B | 5D1F | CB4D | 581E | 4590 |
| 0000036660 | 8B55 | 1EEC | D88E | EC81 | 0040 | 5657 | 46C7 | 76FA |
| 0000036700 | 8C14 | FC5E | 46C7 | 01D8 | 2B01 | 89C0 | CA46 | 4689 |
| 0000036720 | 8EC8 | F406 | 2621 | 3E83 | 3B32 | 7500 | E903 | 001D |
| 0000036740 | 36FF | 1450 | 36FF | 144E | 468D | 16C0 | 9A50 | 37D4 |
| 0000036760 | 0000 | C483 | 3D08 | 0000 | 0374 | 0FE9 | 8E00 | F606 |
| 0000037000 | 2621 | 3E83 | 3B4A | 7500 | E903 | 003B | 681E | 147D |
| 0000037020 | 468D | 16CC | 8D50 | C046 | 5016 | 468D | 16DE | 6850 |
| 0000037040 | 00B9 | 681E | 1484 | 36FF | 144C | 36FF | 144A | 36FF |
| 0000037060 | 1450 | 36FF | 144E | 1C9A | 0038 | 8300 | 1EC4 | 4689 |
| 0000037100 | 89DE | E056 | 08E9 | 2B00 | 89C0 | E046 | 4689 | C7DE |
| 0000037120 | DC46 | 0000 | 186A | F168 | 6A03 | 8D02 | E246 | 5016 |
| 0000037140 | BA9A | 1344 | 833B | 0AC4 | 468D | 16DA | FF50 | 0676 |
| 0000037160 | 759A | 236C | 833B | 06C4 | 468D | 16E2 | FF50 | DA76 |
| 0000037200 | B49A | 443B | 8338 | 06C4 | 4689 | 8EDC | F406 | 2621 |
| 0000037220 | 3E83 | 39CA | 7500 | E903 | 0009 | 7E83 | FEC4 | 0374 |
| 0000037240 | 0FE9 | 8E00 | F606 | 2621 | 3E83 | 37EA | 7500 | E903 |

THU MAR 14 17:39:32 1991 IH.DLL PAGE 18, LINE 1004

| | | | | | | | | |
|---|---|---|---|---|---|---|---|---|
| 0000037260 | 0051 | 468B | 89DC | C646 | 76FF | FFCA | C876 | 468D |
| 0000037300 | 16C6 | FF50 | D876 | 76FF | FFFC | FA76 | 4E8D | 16CC |
| 0000037320 | 8D51 | DE4E | 5116 | 4E8D | 16C0 | 1E51 | 8468 | 6814 |
| 0000037340 | 00C9 | 36FF | 144C | 36FF | 144A | 36FF | 1450 | 36FF |
| 0000037360 | 144E | 2B9A | 003A | 8300 | 28C4 | 468B | E9C6 | 0009 |
| 0000037400 | 06E9 | 8B00 | DC46 | 00E9 | 5E00 | 835F | 02ED | E58B |
| 0000037420 | 5D1F | CB4D | 581E | 4590 | 8B55 | 1EEC | D88E | EC81 |
| 0000037440 | 002E | 5657 | 46C7 | 95FA | 8C14 | FC5E | 46C7 | 01F0 |
| 0000037460 | 2B01 | 89C0 | E046 | 4689 | 8EDE | F406 | 2621 | 3E83 |
| 0000037500 | 3CD1 | 7500 | E903 | 001D | 36FF | 1450 | 36FF | 144E |
| 0000037520 | 468D | 16D6 | 9A50 | 3A8E | 0000 | C483 | 3D08 | 0000 |
| 0000037540 | 0374 | 0FE9 | 8E00 | F606 | 2621 | 3E83 | 3CE9 | 7500 |
| 0000037560 | E903 | 003B | 681E | 149C | 468D | 16E4 | 8D50 | D646 |
| 0000037600 | 5016 | 468D | 16F4 | 6850 | 00E3 | 681E | 14A4 | 36FF |
| 0000037620 | 144C | 36FF | 144A | 36FF | 1450 | 36FF | 144E | D79A |
| 0000037640 | 003A | 8300 | 1EC4 | 4689 | 89F4 | F656 | 08E9 | 2B00 |
| 0000037660 | 89C0 | F646 | 4689 | C7F4 | F246 | 0000 | 5EC4 | 2608 |
| 0000037700 | 7F83 | 010E | 0374 | 06E9 | B800 | 0006 | 16E9 | C400 |
| 0000037720 | 085E | 8326 | 0E7F | 7402 | E903 | 0006 | 01B8 | E900 |
| 0000037740 | 0003 | 00B8 | 8900 | D246 | 5EC4 | 2608 | 478B | F710 |
| 0000037760 | D266 | 1205 | 8900 | F846 | 76FF | FF06 | 0A76 | 76FF |
| 0000040000 | FF08 | F876 | 468D | 16D4 | 9A50 | FFFF | 0000 | 4689 |
| 0000040020 | 83E2 | E27E | 7400 | E903 | 000B | 468B | 39F8 | D446 |
| 0000040040 | 0375 | 05E9 | C700 | F246 | 000B | 068E | 21F4 | 8326 |
| 0000040060 | 783E | 003A | 0375 | 09E9 | 8300 | DA7E | 74FE | E903 |
| 0000040100 | 000F | 068E | 21F6 | 8326 | A43E | 003A | 0375 | 51E9 |
| 0000040120 | 8B00 | F246 | 4689 | FFDC | E076 | 76FF | 8DDE | DC46 |
| 0000040140 | 5016 | 76FF | FFF0 | FC76 | 76FF | 8DFA | E44E | 5116 |
| 0000040160 | 4E8D | 16F4 | 8D51 | D64E | 5116 | 681E | 14A4 | F468 |
| 0000040200 | FF00 | 4C36 | FF14 | 4A36 | FF14 | 5036 | FF14 | 4E36 |
| 0000040220 | 9A14 | 3B93 | 0000 | C483 | 8B28 | DC46 | 09E9 | E900 |
| 0000040240 | 0006 | 468B | E9F2 | 0000 | 5F5E | ED83 | 8B02 | 1FE5 |
| 0000040260 | 4D5D | 1ECB | 9058 | 5545 | EC8B | 8E1E | 81D8 | 26EC |
| 0000040300 | 5700 | C756 | FA46 | 14B4 | 5E8C | C7FC | F246 | 0101 |
| 0000040320 | C02B | 4689 | 89E4 | E246 | 068E | 21F4 | 8326 | E03E |
| 0000040340 | 003B | 0375 | 1DE9 | FF00 | 5036 | FF14 | 4E36 | 8D14 |
| 0000040360 | DA46 | 5016 | F69A | 003B | 8300 | 08C4 | 003D | 7400 |
| 0000040400 | E903 | 000F | 068E | 21F6 | 8326 | 0C3E | 003C | 0375 |
| 0000040420 | 3BE9 | 1E00 | BB68 | 8D14 | E646 | 5016 | 468D | 16DA |
| 0000040440 | 8D50 | F646 | 5016 | 0B68 | 1E01 | C268 | FF14 | 4C36 |
| 0000040460 | FF14 | 4A36 | FF14 | 5036 | FF14 | 4E36 | 9A14 | 3C3F |
| 0000040500 | 0000 | C483 | 891E | F646 | 5689 | E9F8 | 0008 | C02B |
| 0000040520 | 4689 | 89F8 | F646 | 46C7 | 00F4 | FF00 | 0876 | 76FF |
| 0000040540 | 9A06 | 4623 | 3E27 | C483 | C404 | 065E | C626 | 0847 |
| 0000040560 | 8B01 | 0A46 | 5EC4 | 2606 | 4789 | FF0A | 0876 | 76FF |
| 0000040600 | FF06 | 0C76 | B49A | 033B | 833B | 06C4 | 4689 | 8EF4 |
| 0000040620 | F406 | 2621 | 3E83 | 3D7F | 7500 | E903 | 0009 | 7E83 |
| 0000040640 | FEDE | 0374 | 0FE9 | 8E00 | F606 | 2621 | 3E83 | 3DAB |
| 0000040660 | 7500 | E903 | 0051 | 468B | 89F4 | E046 | 76FF | FFE4 |
| 0000040700 | E276 | 468D | 16E0 | FF50 | F276 | 76FF | FFFC | FA76 |
| 0000040720 | 4E8D | 16E6 | 8D51 | F64E | 5116 | 4E8D | 16DA | 1E51 |
| 0000040740 | C268 | 6814 | 0117 | 36FF | 144C | 36FF | 144A | 36FF |
| 0000040760 | 1450 | 36FF | 144E | 329A | 003D | 8300 | 28C4 | 468B |
| 0000041000 | E9E0 | 0009 | 06E9 | 8B00 | F446 | 00E9 | 5E00 | 835F |
| 0000041020 | 02ED | E58B | 5D1F | CB4D | 581E | 4590 | 8B55 | 1EEC |
| 0000041040 | D88E | EC81 | 0028 | 5657 | 46C7 | D1FA | 8C14 | FC5E |
| 0000041060 | 46C7 | 01F2 | 2B01 | 89C0 | E246 | 4689 | 8EE0 | F406 |
| 0000041100 | 2621 | 3E83 | 405B | 7500 | E903 | 001D | 36FF | 1450 |
| 0000041120 | 36FF | 144E | 468D | 16D8 | 9A50 | 3D95 | 0000 | C483 |

THU MAR 14 17:39:32 1991 IH.DLL PAGE 19, LINE 1063

| | | | | | | | | |
|---|---|---|---|---|---|---|---|---|
| 0000041140 | 3D08 | 0000 | 0374 | 0FE9 | 8E00 | F606 | 2621 | 3E83 |
| 0000041160 | 4073 | 7500 | E903 | 003B | 681E | 14D8 | 468D | 16E6 |
| 0000041200 | 8D50 | D846 | 5016 | 468D | 16F6 | 6850 | 0131 | 681E |
| 0000041220 | 14E0 | 36FF | 144C | 36FF | 144A | 36FF | 1450 | 36FF |
| 0000041240 | 144E | DE9A | 003D | 8300 | 1EC4 | 4689 | 89F6 | F856 |
| 0000041260 | 08E9 | 2B00 | 89C0 | F846 | 4689 | C7F6 | F446 | 0000 |
| 0000041300 | 468B | 8B06 | 085E | CB8B | E3D1 | D903 | E3C1 | 8902 |
| 0000041320 | C087 | 8B23 | 085E | C38B | E3D1 | D803 | E3C1 | C702 |
| 0000041340 | CA87 | 0123 | 8B00 | 085E | C38B | E3D1 | D803 | E3C1 |
| 0000041360 | 2B02 | 89C0 | C887 | 8923 | C687 | 8B23 | 0846 | C88B |
| 0000041400 | E0D1 | C103 | E0C1 | 0502 | 23C6 | 501E | 9E9A | 0036 |
| 0000041420 | 8B00 | 0846 | C88B | E0D1 | C103 | E0C1 | 0502 | 23C6 |
| 0000041440 | 501E | 76FF | FF0C | 0A76 | FF9A | 00FF | 8900 | E446 |
| 0000041460 | 468B | 8B08 | D1C8 | 03E0 | C1C1 | 02E0 | C605 | 1E23 |
| 0000041500 | 9A50 | 335B | 0000 | 5E8B | 8B08 | D1C3 | 03E3 | C1D8 |
| 0000041520 | 02E3 | 87C7 | 23CA | 0000 | 7E83 | 79E4 | 0374 | 08E9 |
| 0000041540 | C700 | F446 | 03F6 | 0EE9 | 8300 | E47E | 7500 | E903 |
| 0000041560 | 0005 | 46C7 | 05F4 | 8300 | F47E | 7400 | E903 | 0034 |
| 0000041600 | 5E8B | 8B08 | D1C3 | 03E3 | C1D8 | 02E3 | 878B | 23C2 |
| 0000041620 | 978B | 23C4 | 5EC4 | 260E | 0789 | 8926 | 0257 | 5EC4 |
| 0000041640 | 260E | 1FC4 | 8126 | 0C7F | 03EE | 0374 | 05E9 | C700 |
| 0000041660 | F446 | 03F5 | 068E | 21F4 | 8326 | 363E | 003E | 0375 |
| 0000041700 | 09E9 | 8300 | DC7E | 74FE | E903 | 000F | 068E | 21F6 |
| 0000041720 | 8326 | 4E3E | 003E | 0375 | 51E9 | 8B00 | F446 | 4689 |
| 0000041740 | FFDE | E276 | 76FF | 8DE0 | DE46 | 5016 | 76FF | FFF2 |
| 0000041760 | FC76 | 76FF | 8DFA | E64E | 5116 | 4E8D | 16F6 | 8D51 |
| 0000042000 | D84E | 5116 | 681E | 14E0 | 5368 | FF01 | 4C36 | FF14 |
| 0000042020 | 4A36 | FF14 | 5036 | FF14 | 4E36 | 9A14 | 3E97 | 0000 |
| 0000042040 | C483 | 8B28 | DE46 | 09E9 | E900 | 0006 | 468B | E9F4 |
| 0000042060 | 0000 | 5F5E | ED83 | 8B02 | 1FE5 | 4D5D | 1ECB | 9058 |
| 0000042100 | 5545 | EC8B | 8E1E | 81D8 | 26EC | 5700 | C756 | FA46 |
| 0000042120 | 14F1 | 5E8C | C7FC | F246 | 0000 | C02B | 4689 | 89E4 |
| 0000042140 | E246 | 068E | 21F4 | 8326 | 913E | 0041 | 0375 | 1DE9 |
| 0000042160 | FF00 | 5036 | FF14 | 4E36 | 8D14 | DA46 | 5016 | FA9A |
| 0000042200 | 003E | 8300 | 08C4 | 003D | 7400 | E903 | 000F | 068E |
| 0000042220 | 21F6 | 8326 | 703E | 0042 | 0375 | 3BE9 | 1E00 | F568 |
| 0000042240 | 8D14 | E646 | 5016 | 468D | 16DA | 8D50 | F446 | 5016 |
| 0000042260 | 6968 | 1E01 | 1A68 | FF15 | 4C36 | FF14 | 4A36 | FF14 |
| 0000042300 | 5036 | FF14 | 4E36 | 9A14 | 3F43 | 0000 | C483 | 891E |
| 0000042320 | F446 | 5689 | E9F6 | 0008 | C02B | 4689 | 89F6 | F446 |
| 0000042340 | 5EC4 | 2606 | 478B | 890A | F846 | 068E | 21F4 | 8326 |
| 0000042360 | 583E | 0042 | 0375 | 58E9 | 8300 | DE7E | 75FE | E903 |
| 0000042400 | 004F | 5E8B | 8BF8 | D1C3 | 03E3 | C1D8 | 02E3 | B7FF |
| 0000042420 | 23CA | 76FF | 1EF8 | F968 | 8D14 | E646 | 5016 | 468D |
| 0000042440 | 16F4 | 8D50 | DA46 | 5016 | 681E | 151A | 7068 | FF01 |
| 0000042460 | 4C36 | FF14 | 4A36 | FF14 | 5036 | FF14 | 4E36 | 1E14 |
| 0000042500 | 1268 | 6815 | 18A1 | A468 | 9A18 | 17E6 | 0000 | C483 |
| 0000042520 | 832A | F87E | 7214 | E903 | 0049 | 5E8B | 8BF8 | D1C3 |
| 0000042540 | 03E3 | C1D8 | 02E3 | BF83 | 23CA | 7500 | E903 | 0033 |
| 0000042560 | 468B | 8B06 | 0856 | 5E8B | 8BF8 | D1CB | 03E3 | C1D9 |
| 0000042600 | 02E3 | 8789 | 23C2 | 9789 | 23C4 | 468B | 8BF8 | D1C8 |
| 0000042620 | 03E0 | C1C1 | 02E0 | C605 | 1E23 | 9A50 | 3FE2 | 0000 |
| 0000042640 | 0EE9 | FF00 | 0876 | 76FF | 9A06 | 8D7E | 3E04 | C483 |
| 0000042660 | 8E04 | F406 | 2621 | 3E83 | 3EE4 | 7500 | E903 | 0009 |
| 0000042700 | 7E83 | FEDE | 0374 | 0FE9 | 8E00 | F606 | 2621 | 3E83 |
| 0000042720 | 3F10 | 7500 | E903 | 0039 | 468D | 16E6 | 8D50 | F446 |
| 0000042740 | 5016 | 468D | 16DA | 1E50 | 1A68 | 6815 | 017B | 36FF |
| 0000042760 | 144C | 36FF | 144A | 36FF | 1450 | 36FF | 144E | FF9A |
| 0000043000 | 00FF | 8300 | 1AC4 | 46C7 | 00E0 | E900 | 0006 | 03E9 |

THU MAR 14 17:39:32 1991 IH.DLL PAGE 20, LINE 1122

| | | | | | | | | |
|---|---|---|---|---|---|---|---|---|
| 0000043020 | E900 | 0000 | 5F5E | ED83 | 8B02 | 1FE5 | 4D5D | 1ECB |
| 0000043040 | 9058 | 5545 | EC8B | 8E1E | 81D8 | 2CEC | 5700 | C756 |
| 0000043060 | FA46 | 152A | 5E8C | C7FC | EC46 | 0101 | C02B | 4689 |
| 0000043100 | 89DE | DC46 | 068E | 21F4 | 8326 | 383E | 0044 | 0375 |
| 0000043120 | 1DE9 | FF00 | 5036 | FF14 | 4E36 | 8D14 | D446 | 5016 |
| 0000043140 | 1F9A | 0041 | 8300 | 08C4 | 003D | 7400 | E903 | 000F |
| 0000043160 | 068E | 21F6 | 8326 | 503E | 0044 | 0375 | 3BE9 | 1E00 |
| 0000043200 | 3168 | 8D15 | E046 | 5016 | 468D | 16D4 | 8D50 | F646 |
| 0000043220 | 5016 | 9168 | 1E01 | 3868 | FF15 | 4C36 | FF14 | 4A36 |
| 0000043240 | FF14 | 5036 | FF14 | 4E36 | 9A14 | 4168 | 0000 | C483 |
| 0000043260 | 891E | F646 | 5689 | E9F8 | 0008 | CD2B | 4689 | 89F8 |
| 0000043300 | F646 | 46C7 | 00F4 | C700 | EE46 | 0000 | 03E9 | FF00 |
| 0000043320 | EE46 | 7E83 | 14EE | 0372 | B6E9 | 8300 | F47E | 7400 |
| 0000043340 | E903 | 00AD | 5E8B | 8BEE | D1C3 | 03E3 | C1D8 | 02E3 |
| 0000043360 | BF83 | 23CA | 7500 | E903 | 0094 | 5E8B | 8BEE | D1C3 |
| 0000043400 | 03E3 | C1D8 | 02E3 | 468B | 3906 | C087 | 7423 | E903 |
| 0000043420 | 007C | 186A | 749A | DE8D | 8343 | 02C4 | 4689 | 89F0 |
| 0000043440 | F256 | 468B | 0BF2 | F046 | 0374 | 08E9 | C700 | F446 |
| 0000043460 | 0007 | 59E9 | FF00 | F276 | 76FF | 9AF0 | 4623 | 424C |
| 0000043500 | C483 | C404 | F05E | C626 | 0847 | C401 | F05E | C726 |
| 0000043520 | 0C47 | 03EE | 468B | C408 | F05E | 8926 | 1447 | 468B |
| 0000043540 | 8BF0 | F256 | 5E8B | 8BEE | D1CB | 03E3 | C1D9 | 02E3 |
| 0000043560 | 8789 | 23C2 | 9789 | 23C4 | 468B | 8BEE | D1C8 | 03E0 |
| 0000043600 | C1C1 | 02E0 | C605 | 1E23 | 9A50 | 423C | 0000 | 3EE9 |
| 0000043620 | 8EFF | F406 | 2621 | 3E83 | 4109 | 7500 | E903 | 0009 |
| 0000043640 | 7E83 | FED8 | 0374 | 0FE9 | 8E00 | F606 | 2621 | 3E83 |
| 0000043660 | 4135 | 7500 | E903 | 0051 | 468B | 89F4 | DA46 | 76FF |
| 0000043700 | FFDE | DC76 | 468D | 16DA | FF50 | EC76 | 76FF | FFFC |
| 0000043720 | FA76 | 4E8D | 16E0 | 8D51 | F64E | 5116 | 4E8D | 16D4 |
| 0000043740 | 1E51 | 3868 | 6815 | 01B0 | 36FF | 144C | 36FF | 144A |
| 0000043760 | 36FF | 1450 | 36FF | 144E | BC9A | 0040 | 8300 | 28C4 |
| 0000044000 | 468B | E9DA | 0009 | 06E9 | 8B00 | F446 | 00E9 | 5E00 |
| 0000044020 | 835F | 02ED | E58B | 5D1F | CB4D | 581E | 4590 | 8B55 |
| 0000044040 | 1EEC | D88E | EC81 | 0026 | 5657 | 46C7 | 46FA | 8C15 |
| 0000044060 | FC5E | 46C7 | 01F2 | 2B01 | 89C0 | E446 | 4689 | 8EE2 |
| 0000044100 | F406 | 2621 | 3E83 | 45A1 | 7500 | E903 | 001D | 36FF |
| 0000044120 | 1450 | 36FF | 144E | 468D | 16DA | 9A50 | 4301 | 0000 |
| 0000044140 | C483 | 3D08 | 0000 | 0374 | 0FE9 | 8E00 | F606 | 2621 |
| 0000044160 | 3E83 | 45B9 | 7500 | E903 | 003B | 681E | 154D | 468D |
| 0000044200 | 16E6 | 8D50 | DA46 | 5016 | 468D | 16F6 | 6850 | 01C8 |
| 0000044220 | 681E | 1554 | 36FF | 144C | 36FF | 144A | 36FF | 1450 |
| 0000044240 | 36FF | 144E | 4A9A | 0043 | 8300 | 1EC4 | 4689 | 89F6 |
| 0000044260 | F856 | 08E9 | 2B00 | 89C0 | F846 | 4689 | C7F6 | F446 |
| 0000044300 | 0000 | 76FF | FF08 | 0676 | 239A | B746 | 8343 | 04C4 |
| 0000044320 | 4689 | 83F4 | F47E | 7400 | E903 | 001E | 468B | C40C |
| 0000044340 | 065E | 8926 | 0C47 | 468B | C40A | 065E | 8926 | 0E47 |
| 0000044360 | 468B | C40E | 065E | 8926 | 1047 | 068E | 21F4 | 8326 |
| 0000044400 | EB3E | 0042 | 0375 | 09E9 | 8300 | DE7E | 74FE | E903 |
| 0000044420 | 000F | 068E | 21F6 | 8326 | 173E | 0043 | 0375 | 51E9 |
| 0000044440 | 8B00 | F446 | 4689 | FFE0 | E476 | 76FF | 8DE2 | E046 |
| 0000044460 | 5016 | 76FF | FFF2 | FC76 | 76FF | 8DFA | E64E | 5116 |
| 0000044500 | 4E8D | 16F6 | 8D51 | DA4E | 5116 | 681E | 1554 | D868 |
| 0000044520 | FF01 | 4C36 | FF14 | 4A36 | FF14 | 5036 | FF14 | 4E36 |
| 0000044540 | 9A14 | 4499 | 0000 | C483 | 8B28 | E046 | 09E9 | E900 |
| 0000044560 | 0006 | 468B | E9F4 | 0000 | 5F5E | ED83 | 8B02 | 1FE5 |
| 0000044600 | 4D5D | 1ECB | 9058 | 5545 | EC8B | 8E1E | 81D8 | 2EEC |
| 0000044620 | 5700 | C756 | FA46 | 1566 | 5E8C | C7FC | EC46 | 0101 |
| 0000044640 | C02B | 4689 | 89DE | DC46 | 068E | 21F4 | 8326 | 283E |
| 0000044660 | 0047 | 0375 | 1DE9 | FF00 | 5036 | FF14 | 4E36 | 8D14 |

THU MAR 14 17:39:32 1991 IH.DLL PAGE 21, LINE 1181

| | | | | | | | | |
|---|---|---|---|---|---|---|---|---|
| 0000044700 | D446 | 5016 | FC9A | 0044 | 8300 | 08C4 | 003D | 7400 |
| 0000044720 | E903 | 000F | 068E | 21F6 | 8326 | 403E | 0047 | 0375 |
| 0000044740 | 3BE9 | 1E00 | 6D68 | 8D15 | E046 | 5016 | 468D | 16D4 |
| 0000044760 | 8D50 | F646 | 5016 | ED68 | 1E01 | 7468 | FF15 | 4C36 |
| 0000045000 | FF14 | 4A36 | FF14 | 5036 | FF14 | 4E36 | 9A14 | 4545 |
| 0000045020 | 0000 | C483 | 891E | F646 | 5689 | E9F8 | 0008 | C02B |
| 0000045040 | 4689 | 89F8 | F646 | 46C7 | 00F4 | 8D00 | D246 | 5016 |
| 0000045060 | 006A | 4C9A | 0068 | 8347 | 06C4 | 4689 | 83F4 | F47E |
| 0000045100 | 7400 | E903 | 003B | 468B | C4D2 | 065E | 8926 | 0247 |
| 0000045120 | 468B | 8B06 | 0856 | 0405 | 5200 | 6A50 | 9A00 | 69AF |
| 0000045140 | 456B | C483 | 8D06 | EE46 | 5016 | AF9A | 0025 | 8B00 |
| 0000045160 | F046 | 5EC4 | 2606 | 4789 | C406 | 065E | C626 | 0847 |
| 0000045200 | 8E00 | F406 | 2621 | 3E83 | 44E6 | 7500 | E903 | 0009 |
| 0000045220 | 7E83 | FED8 | 0374 | 0FE9 | 8E00 | F606 | 2621 | 3E83 |
| 0000045240 | 4512 | 7500 | E903 | 0051 | 468B | 89F4 | DA46 | 76FF |
| 0000045260 | FFDE | DC76 | 468D | 16DA | FF50 | EC76 | 76FF | FFFC |
| 0000045300 | FA76 | 4E8D | 16E0 | 8D51 | F64E | 5116 | 4E8D | 16D4 |
| 0000045320 | 1E51 | 7468 | 6815 | 0202 | 36FF | 144C | 36FF | 144A |
| 0000045340 | 36FF | 1450 | 36FF | 144E | 029A | 0046 | 8300 | 28C4 |
| 0000045360 | 468B | E9DA | 0009 | 06E9 | 8B00 | F446 | 00E9 | 5E00 |
| 0000045400 | 835F | 02ED | E58B | 5D1F | CB4D | 581E | 4590 | 8B55 |
| 0000045420 | 1EEC | D88E | EC81 | 0026 | 5657 | 46C7 | 8FFA | 8C15 |
| 0000045440 | FC5E | 46C7 | 01F2 | 2B01 | 89C0 | E446 | 4689 | 8EE2 |
| 0000045460 | F406 | 2621 | 3E83 | 4884 | 7500 | E903 | 001D | 36FF |
| 0000045500 | 1450 | 36FF | 144E | 468D | 16DA | 9A50 | 4665 | 0000 |
| 0000045520 | C483 | 3D08 | 0300 | 0374 | 0FE9 | 8E00 | F606 | 2621 |
| 0000045540 | 3E83 | 489C | 7500 | E903 | 003B | 681E | 1596 | 468D |
| 0000045560 | 16E6 | 8D50 | DA46 | 5016 | 468D | 16F6 | 6850 | 0218 |
| 0000045600 | 681E | 159E | 36FF | 144C | 36FF | 144A | 36FF | 1450 |
| 0000045620 | 36FF | 144E | AE9A | 0046 | 8300 | 1EC4 | 4689 | 89F6 |
| 0000045640 | F856 | 08E9 | 2B00 | 89C0 | F846 | 4689 | C7F6 | F446 |
| 0000045660 | 0000 | 76FF | 9A06 | 558A | 4875 | C483 | 8902 | F446 |
| 0000045700 | 7E83 | 00F4 | 0374 | 14E9 | FF00 | 0A76 | 76FF | FF08 |
| 0000045720 | 0676 | 069A | D549 | 8346 | 06C4 | 4689 | 8EF4 | F406 |
| 0000045740 | 2621 | 3E83 | 464F | 7500 | E903 | 0009 | 7E83 | FEDE |
| 0000045760 | 0374 | 0FE9 | 8E00 | F606 | 2621 | 3E83 | 467B | 7500 |
| 0000046000 | E903 | 0051 | 468B | 89F4 | E046 | 76FF | FFE4 | E276 |
| 0000046020 | 468D | 16E0 | FF50 | F276 | 76FF | FFFC | FA76 | 4E8D |
| 0000046040 | 16E6 | 8D51 | F64E | 5116 | 4E8D | 16DA | 1E51 | 9E68 |
| 0000046060 | 6815 | 0225 | 36FF | 144C | 36FF | 144A | 36FF | 1450 |
| 0000046100 | 36FF | 144E | 899A | 0047 | 8300 | 28C4 | 468B | E9E0 |
| 0000046120 | 0009 | 06E9 | 8B00 | F446 | 00E9 | 5E00 | 835F | 02ED |
| 0000046140 | E58B | 5D1F | CB4D | 581E | 4590 | 8B55 | 1EEC | D88E |
| 0000046160 | EC81 | 002C | 5657 | 46C7 | B0FA | 8C15 | FC5E | 46C7 |
| 0000046200 | 01EC | 2B01 | 89C0 | DE46 | 4689 | 8EDC | F406 | 2621 |
| 0000046220 | 3E83 | 49F2 | 7500 | E903 | 001D | 36FF | 1450 | 36FF |
| 0000046240 | 144E | 468D | 16D4 | 9A50 | 47EC | 0000 | C483 | 3D08 |
| 0000046260 | 0000 | 0374 | 0FE9 | 8E00 | F606 | 2621 | 3E83 | 4A0A |
| 0000046300 | 7500 | E903 | 003B | 681E | 15B7 | 468D | 16E0 | 8D50 |
| 0000046320 | D446 | 5016 | 468D | 16F6 | 6850 | 023B | 681E | 15BE |
| 0000046340 | 36FF | 144C | 36FF | 144A | 36FF | 1450 | 36FF | 144E |
| 0000046360 | 359A | 0048 | 8300 | 1EC4 | 4689 | 89F6 | F856 | 08E9 |
| 0000046400 | 2B00 | 89C0 | F846 | 4689 | C7F6 | F446 | 0000 | 468B |
| 0000046420 | 8906 | EE46 | 468B | 8B08 | 0A56 | 4689 | 89F0 | F256 |
| 0000046440 | 006A | 006A | 468D | 16EE | 6850 | 0800 | D568 | 6849 |
| 0000046460 | FFFF | 1E9A | 5858 | 8348 | 0EC4 | 4689 | 83F4 | F47E |
| 0000046500 | 7500 | E903 | 0005 | 46C7 | 1CF4 | 8E00 | F406 | 2621 |
| 0000046520 | 3E83 | 47D6 | 7500 | E903 | 0009 | 7E83 | FED8 | 0374 |
| 0000046540 | 0FE9 | 8E00 | F606 | 2621 | 3E83 | 4802 | 7500 | E903 |

THU MAR 14 17:39:32 1991 IH.DLL PAGE 22, LINE 1240

| | | | | | | | | |
|---|---|---|---|---|---|---|---|---|
| 0000046560 | 0051 | 468B | 89F4 | DA46 | 76FF | FFDE | DC76 | 468D |
| 0000046600 | 16DA | FF50 | EC76 | 76FF | FFFC | FA76 | 4E8D | 16E0 |
| 0000046620 | 8D51 | F64E | 5116 | 4E8D | 16D4 | 1E51 | BE68 | 6815 |
| 0000046640 | 024E | 36FF | 144C | 36FF | 144A | 36FF | 1450 | 36FF |
| 0000046660 | 144E | E59A | 0048 | 8300 | 28C4 | 468B | E9DA | 0009 |
| 0000046700 | 06E9 | 8B00 | F446 | 00E9 | 5E00 | 835F | 02ED | E58B |
| 0000046720 | 5D1F | CB4D | 581E | 4590 | 8B55 | 1EEC | D88E | EC81 |
| 0000046740 | 000A | 5657 | 46C7 | 00F8 | 8E00 | F406 | 2621 | 3E83 |
| 0000046760 | 4B06 | 7400 | E903 | 000F | 068E | 21F6 | 8326 | 153E |
| 0000047000 | 004B | 0375 | 0CE9 | 1E00 | CE68 | 9A15 | FFFF | 0000 |
| 0000047020 | C483 | C404 | 065E | 8B26 | 8907 | F646 | 5EC4 | 2606 |
| 0000047040 | 478B | 2602 | 578B | 8904 | FA46 | 5689 | 9AFC | 59EB |
| 0000047060 | 4AD8 | 76FF | 9AF6 | 5440 | 49CD | C483 | 8902 | F846 |
| 0000047100 | 7E83 | 00F8 | 0374 | 16E9 | 8B00 | FC46 | 460B | 75FA |
| 0000047120 | E903 | 000B | 76FF | FFFC | FA76 | 2A9A | 0044 | 8E00 |
| 0000047140 | F406 | 2621 | 3E83 | 4932 | 7400 | E903 | 000F | 068E |
| 0000047160 | 21F6 | 8326 | 5E3E | D049 | 0375 | 05E9 | 9A00 | FFFF |
| 0000047200 | 0000 | 5F5E | ED83 | 8B02 | 1FE5 | 4D5D | 1ECB | 9058 |
| 0000047220 | 5545 | EC8B | 8E1E | 81D8 | 04EC | 5700 | C756 | FC46 |
| 0000047240 | 0000 | 006A | F468 | 9AD1 | FFFF | 0000 | 468B | E9FC |
| 0000047260 | 0000 | 5F5E | ED83 | 8B02 | 1FE5 | 4D5D | 1ECB | 9058 |
| 0000047300 | 5545 | EC8B | 8E1E | 81D8 | 44EC | 5700 | C756 | FA46 |
| 0000047320 | 15D6 | 5E8C | C7FC | EC46 | 0101 | C02B | 4689 | 89DE |
| 0000047340 | DC46 | 068E | 21F4 | 8326 | DB3E | 004C | 0375 | 1DE9 |
| 0000047360 | FF00 | 5036 | FF14 | 4E36 | 8D14 | D446 | 5016 | 489A |
| 0000047400 | 0049 | 8300 | 08C4 | 003D | 7400 | E903 | 000F | 068E |
| 0000047420 | 21F6 | 8326 | F33E | 004C | 0375 | 3BE9 | 1E00 | DD68 |
| 0000047440 | 8D15 | E046 | 5016 | 468D | 16D4 | 8D50 | F246 | 5016 |
| 0000047460 | A968 | 1E02 | 0268 | FF16 | 4C36 | FF14 | 4A36 | FF14 |
| 0000047500 | 5036 | FF14 | 4E36 | 9A14 | 4991 | 0000 | C483 | 891E |
| 0000047520 | F246 | 5689 | E9F4 | 0008 | C02B | 4689 | 89F4 | F246 |
| 0000047540 | 46C7 | 00F0 | 1E00 | 5668 | 1E14 | E468 | 8D15 | BE46 |
| 0000047560 | 5016 | A49A | 2C93 | 834C | 0CC4 | 468D | 16BC | 6A50 |
| 0000047600 | 6800 | 3A98 | 4E8D | 16BE | 9A51 | 50CC | 4C4D | C483 |
| 0000047620 | 890C | F046 | 7E83 | 00F0 | 0374 | 85E9 | 1E00 | 5668 |
| 0000047640 | 1E14 | F468 | 8D15 | BE46 | 5016 | A49A | 6493 | 834C |
| 0000047660 | 0CC4 | 468D | 16D2 | 6A50 | 6800 | 3A98 | 4E8D | 16BE |
| 0000047700 | 9A51 | 50CC | 4C8B | C483 | 890C | F046 | 7E83 | 00F0 |
| 0000047720 | 0374 | 4DE9 | 8D00 | EE46 | 5016 | 76FF | 8DD2 | BE4E |
| 0000047740 | 5116 | FF6A | FF6A | 016A | 9D9A | A265 | 834C | 10C4 |
| 0000047760 | 4689 | 83F0 | F07E | 7400 | E903 | 0026 | 76FF | 9ABC |
| 0000050000 | 4D5D | 4CB2 | C483 | 8D02 | F646 | 5016 | 76FF | 9AEE |
| 0000050020 | 70DC | 4AD0 | C483 | FF06 | F876 | 76FF | 9AF6 | 4AFB |
| 0000050040 | 0000 | 7E83 | 00F0 | 0374 | 09E9 | 8B00 | EE46 | 5EC4 |
| 0000050060 | 2606 | 0789 | 068E | 21F4 | 8326 | 903E | 004A | 0375 |
| 0000050100 | 09E9 | 8300 | D87E | 74FE | E903 | 000F | 068E | 21F6 |
| 0000050120 | 8326 | 9F3E | 004A | 0375 | 51E9 | 8B00 | F046 | 4689 |
| 0000050140 | FFDA | DE76 | 76FF | 8DDC | DA46 | 5016 | 76FF | FFEC |
| 0000050160 | FC76 | 76FF | 8DFA | E04E | 5116 | 4E8D | 16F2 | 8D51 |
| 0000050200 | D44E | 5116 | 681E | 1602 | D068 | FF02 | 4C36 | FF14 |
| 0000050220 | 4A36 | FF14 | 5036 | FF14 | 4E36 | 9A14 | 4A53 | 0000 |
| 0000050240 | C483 | 8B28 | DA46 | 09E9 | E900 | 0006 | 468B | E9F0 |
| 0000050260 | 0000 | 5F5E | ED83 | 8B02 | 1FE5 | 4D5D | 1ECB | 9058 |
| 0000050300 | 5545 | EC8B | 8E1E | 81D8 | 00EC | 5700 | 8B56 | 0646 |
| 0000050320 | 62A3 | E914 | 0000 | 5F5E | ED83 | 8B02 | 1FE5 | 4D5D |
| 0000050340 | 1ECB | 9058 | 5545 | EC8B | 8E1E | 81D8 | 26EC | 5700 |
| 0000050360 | C756 | FA46 | 1612 | 5E8C | C7FC | F246 | 0101 | C02B |
| 0000050400 | 4689 | 89E4 | E246 | 068E | 21F4 | 8326 | 4B3E | 004E |
| 0000050420 | 0375 | 1DE9 | FF00 | 5036 | FF14 | 4E36 | 8D14 | DA46 |

THU MAR 14 17:39:32 1991 IH.DLL PAGE 23, LINE 1299

| | | | | | | | | |
|---|---|---|---|---|---|---|---|---|
| 0000050440 | 5016 | 9F9A | 004B | 8300 | 08C4 | 003D | 7400 | E903 |
| 0000050460 | 000F | 068E | 21F6 | 8326 | 633E | 004E | 0375 | 3BE9 |
| 0000050500 | 1E00 | 1968 | 8D16 | E646 | 5016 | 468D | 16DA | 8D50 |
| 0000050520 | F646 | 5016 | 0168 | 1E03 | 2068 | FF16 | 4C36 | FF14 |
| 0000050540 | 4A36 | FF14 | 5036 | FF14 | 4E36 | 9A14 | 4BE8 | 0000 |
| 0000050560 | C483 | 891E | F646 | 5689 | E9F8 | 0008 | C02B | 4689 |
| 0000050600 | 89F8 | F646 | 46C7 | 00F4 | 8300 | 623E | FF14 | 0374 |
| 0000050620 | 08E9 | C700 | F446 | 03E8 | 09E9 | A100 | 1462 | 5EC4 |
| 0000050640 | 2606 | 0789 | 068E | 21F4 | 8326 | 893E | 004B | 0375 |
| 0000050660 | 09E9 | 8300 | DE7E | 74FE | E903 | 000F | 068E | 21F6 |
| 0000050700 | 8326 | B53E | 004B | 0375 | 51E9 | 8B00 | F446 | 4689 |
| 0000050720 | FFE0 | E476 | 76FF | 8DE2 | E046 | 5016 | 76FF | FFF2 |
| 0000050740 | FC76 | 76FF | 8DFA | E64E | 5116 | 4E8D | 16F6 | 8D51 |
| 0000050760 | DA4E | 5116 | 681E | 1620 | 0D68 | FF03 | 4C36 | FF14 |
| 0000051000 | 4A36 | FF14 | 5036 | FF14 | 4E36 | 9A14 | 4D3C | 0000 |
| 0000051020 | C483 | 8B28 | E046 | 09E9 | E900 | 0006 | 468B | E9F4 |
| 0000051040 | 0000 | 5F5E | ED83 | 8B02 | 1FE5 | 4D5D | 00CB | 581E |
| 0000051060 | 4590 | 8B55 | 1EEC | D88E | EC81 | 0030 | 5657 | 46C7 |
| 0000051100 | 3FF8 | 8C16 | FA5E | 46C7 | 01EA | 2B01 | 89C0 | DA46 |
| 0000051120 | 4689 | 8ED8 | F806 | 2621 | 3E83 | 4DAD | 7500 | E903 |
| 0000051140 | 001D | 36FF | 1684 | 36FF | 1682 | 468D | 16D0 | 9A50 |
| 0000051160 | 4DC3 | 0000 | C483 | 3D08 | 0000 | 0374 | 0FE9 | 8E00 |
| 0000051200 | FA06 | 2621 | 3E83 | 5063 | 7500 | E903 | 003A | 681E |
| 0000051220 | 1646 | 468D | 16DE | 8D50 | D046 | 5016 | 468D | 16F4 |
| 0000051240 | 6A50 | 1E44 | 8668 | FF16 | 8036 | FF16 | 7E36 | FF16 |
| 0000051260 | 8436 | FF16 | 8236 | 9A16 | 4E0C | 0000 | C483 | 891E |
| 0000051300 | F446 | 5689 | E9F6 | 0008 | C02B | 4689 | 89F6 | F446 |
| 0000051320 | 46C7 | 00F2 | 1E00 | 4D68 | 9A16 | 90BC | 4FA4 | C483 |
| 0000051340 | 8904 | EC46 | 5689 | 8BEE | EE46 | 460B | 75EC | E903 |
| 0000051360 | 001A | 468D | 16F0 | 1E50 | 6068 | FF16 | EE76 | 76FF |
| 0000051400 | 9AEC | 9418 | 4C15 | C483 | E90C | 0005 | 46C7 | 00F0 |
| 0000051420 | 8E40 | F806 | 2621 | 3E83 | 504B | 7500 | E903 | 0047 |
| 0000051440 | 7E83 | FED4 | 0375 | 3EE9 | FF00 | F076 | 681E | 1663 |
| 0000051460 | 468D | 16DE | 8D50 | F446 | 5016 | 468D | 16D0 | 1E50 |
| 0000051500 | 8668 | 6A16 | FF58 | 8036 | FF16 | 7E36 | FF16 | 8436 |
| 0000051520 | FF16 | 8236 | 1E16 | 7568 | 6816 | 41E4 | E768 | 9A41 |
| 0000051540 | 41EA | 0000 | C483 | FF28 | 0876 | 76FF | 8D06 | FC46 |
| 0000051560 | 5016 | 026A | FF68 | FF05 | F076 | 76FF | 6AF0 | 6800 |
| 0000051600 | 01F4 | FF9A | 00FF | 8900 | DC46 | 7E83 | 00DC | 0375 |
| 0000051620 | 08E9 | C700 | F246 | 0019 | 09E9 | 8B00 | FC46 | 5EC4 |
| 0000051640 | 260A | 0789 | 068E | 21F8 | 8326 | FA3E | 004E | 0375 |
| 0000051660 | 09E9 | 8300 | D47E | 74FE | E903 | 000F | 068E | 21FA |
| 0000051700 | 8326 | D93E | 004D | 0375 | 50E9 | 8B00 | F246 | 4689 |
| 0000051720 | FFD6 | DA76 | 76FF | 8DD8 | D646 | 5016 | 76FF | FFEA |
| 0000051740 | FA76 | 76FF | 8DF8 | DE4E | 5116 | 4E8D | 16F4 | 8D51 |
| 0000051760 | D04E | 5116 | 681E | 1686 | 666A | 36FF | 1680 | 36FF |
| 0000052000 | 167E | 36FF | 1684 | 36FF | 1682 | AC9A | 004E | 8300 |
| 0000052020 | 28C4 | 468B | E9D6 | 0009 | 06E9 | 8B00 | F246 | 00E9 |
| 0000052040 | 5E00 | 835F | 02ED | E58B | 5D1F | CB4D | 581E | 4590 |
| 0000052060 | 8B55 | 1EEC | D88E | EC81 | 0032 | 5657 | 46C7 | 93FA |
| 0000052100 | 8C16 | FC5E | 46C7 | 01EC | 2B01 | 89C0 | DC46 | 4689 |
| 0000052120 | 8EDA | F806 | 2621 | 3E83 | 51A0 | 7500 | E903 | 001D |
| 0000052140 | 36FF | 1684 | 36FF | 1682 | 468D | 16D2 | 9A50 | 4F10 |
| 0000052160 | 0000 | C483 | 3D08 | 0000 | 0374 | 0FE9 | 8E00 | FA06 |
| 0000052200 | 2621 | 3E83 | 53D6 | 7500 | E903 | 003A | 681E | 169A |
| 0000052220 | 468D | 16E0 | 8D50 | D246 | 5016 | 468D | 16F6 | 6A50 |
| 0000052240 | 1E7E | 0A68 | FF17 | 8036 | FF16 | 7E36 | FF16 | 8436 |
| 0000052260 | FF16 | 8236 | 9A16 | 4F58 | 0000 | C483 | 891E | F646 |
| 0000052300 | 5689 | E9F8 | 0008 | C02B | 4689 | 89F8 | F646 | 46C7 |

THU MAR 14 17:39:32 1991 IH.DLL PAGE 24, LINE 1358

| | | | | | | | | |
|---|---|---|---|---|---|---|---|---|
| 0000052320 | 00F4 | FF00 | 0876 | 76FF | 8D06 | EE46 | 5016 | 468D |
| 0000052340 | 16F0 | 6A50 | 6A00 | 6A00 | 6A00 | 6A01 | 6A42 | 6A00 |
| 0000052360 | 9A00 | 5336 | 0000 | 4689 | 8EDE | F806 | 2621 | 3E83 |
| 0000052400 | 5251 | 7500 | E903 | 0048 | 7E83 | FED6 | 0375 | 3FE9 |
| 0000052420 | FF00 | DE76 | 681E | 16A1 | 468D | 16E0 | 8D50 | F646 |
| 0000052440 | 5016 | 468D | 16D2 | 1E50 | 0A68 | 6817 | 0091 | 36FF |
| 0000052460 | 1680 | 36FF | 167E | 36FF | 1684 | 36FF | 1682 | 681E |
| 0000052500 | 16B6 | 9468 | 6852 | 5297 | 9A9A | 0052 | 8300 | 28C4 |
| 0000052520 | 468B | 0B0C | 0A46 | 0375 | A2E9 | 8101 | DE7E | 00E7 |
| 0000052540 | 0374 | 9FE9 | FF00 | 0876 | 76FF | 8B06 | 0C46 | 460B |
| 0000052560 | 740A | E903 | 0009 | 00B8 | BA00 | 0000 | 21E9 | 8300 |
| 0000052600 | 0A7E | 74FF | E903 | 0012 | 7E83 | FF0C | 0374 | 09E9 |
| 0000052620 | B800 | FFFF | FFBA | E9FF | 0006 | 468B | 8B0A | 0C56 |
| 0000052640 | 5052 | FF9A | 00FF | 8900 | DE46 | 068E | 21F8 | 8326 |
| 0000052660 | 473E | 0053 | 0375 | 48E9 | 8300 | D67E | 75FE | E903 |
| 0000052700 | 003F | 76FF | 1EDE | BE68 | 8D16 | E046 | 5016 | 468D |
| 0000052720 | 16F6 | 8D50 | D246 | 5016 | 681E | 170A | 9868 | FF00 |
| 0000052740 | 8036 | FF16 | 7E36 | FF16 | 8436 | FF16 | 8236 | 1E16 |
| 0000052760 | D968 | 6816 | 538D | 9068 | 9A53 | 5393 | 0000 | C483 |
| 0000053000 | E928 | 00F9 | 7E83 | 03DE | 0374 | F0E9 | C700 | F246 |
| 0000053020 | 0000 | 7E83 | 03DE | 0374 | E2E9 | 8B00 | 0C46 | 460B |
| 0000053040 | 740A | E903 | 0009 | 00B8 | BA00 | 0000 | 21E9 | 8300 |
| 0000053060 | 0A7E | 74FF | E903 | 0012 | 7E83 | FF0C | 0374 | 09E9 |
| 0000053100 | B800 | FFFF | FFBA | E9FF | 0006 | 468B | 8B0A | 0C56 |
| 0000053120 | C88B | E8B8 | 8B03 | F7DA | F266 | DA3B | 037D | 9CE9 |
| 0000053140 | 7E00 | E903 | 0007 | C83B | 0377 | 90E9 | 6A00 | 6800 |
| 0000053160 | 03E8 | 489A | 004B | FF00 | 0876 | 76FF | 8D06 | EE46 |
| 0000053200 | 5016 | 468D | 16F0 | 6A50 | 6A00 | 6A00 | 6A00 | 6A01 |
| 0000053220 | 6A42 | 6A00 | 9A00 | FFFF | 0000 | 4689 | FFDE | F246 |
| 0000053240 | 068E | 21F8 | 8326 | BE3E | 0053 | 0375 | 4BE9 | 8300 |
| 0000053260 | D67E | 75FE | E903 | 0042 | 76FF | FFF2 | DE76 | 681E |
| 0000053300 | 16E1 | 468D | 16E0 | 8D50 | F646 | 5016 | 468D | 16D2 |
| 0000053320 | 1E50 | 0A68 | 6817 | 00AF | 36FF | 1680 | 36FF | 167E |
| 0000053340 | 36FF | 1684 | 36FF | 1682 | 681E | 1701 | FA68 | 684F |
| 0000053360 | 4FFD | 009A | 0050 | 8300 | 2AC4 | 15E9 | 83FF | DE7E |
| 0000053400 | 7500 | E903 | 0008 | 46C7 | 1AF4 | E900 | 0009 | 468B |
| 0000053420 | C4EE | 0E5E | 8926 | 8E07 | F806 | 2621 | 3E83 | 4FB8 |
| 0000053440 | 7500 | E903 | 0009 | 7E83 | FED6 | 0374 | 0FE9 | 8E00 |
| 0000053460 | FA06 | 2621 | 3E83 | 4F26 | 7500 | E903 | 0051 | 468B |
| 0000053500 | 89F4 | D846 | 76FF | FFDC | DA76 | 468D | 16D8 | FF50 |
| 0000053520 | EC76 | 76FF | FFFC | FA76 | 4E8D | 16E0 | 8D51 | F64E |
| 0000053540 | 5116 | 4E8D | 16D2 | 1E51 | 0A68 | 6817 | 00BA | 36FF |
| 0000053560 | 1680 | 36FF | 167E | 36FF | 1684 | 36FF | 1682 | AB9A |
| 0000053600 | 0050 | 8300 | 28C4 | 468B | E9D8 | 0009 | 06E9 | 8B00 |
| 0000053620 | F446 | 00E9 | 5E00 | 835F | 02ED | E58B | 5D1F | CB4D |
| 0000053640 | 581E | 4590 | 8B55 | 1EEC | D88E | EC81 | 0028 | 5657 |
| 0000053660 | 46C7 | 17FA | 8C17 | FC5E | 46C7 | 01F2 | 2B01 | 89C0 |
| 0000053700 | E246 | 4689 | 8EE0 | F806 | 2621 | 3E83 | 5508 | 7500 |
| 0000053720 | E903 | 001D | 36FF | 1684 | 36FF | 1682 | 468D | 16D8 |
| 0000053740 | 9A50 | 510E | 0000 | C483 | 3D08 | 0000 | 0374 | 0FE9 |
| 0000053760 | 8E00 | FA06 | 2621 | 3E83 | 5520 | 7500 | E903 | 003B |
| 0000054000 | 681E | 171E | 468D | 16E6 | 8D50 | D846 | 5016 | 468D |
| 0000054020 | 16F6 | 6850 | 00D0 | 681E | 1726 | 36FF | 1680 | 36FF |
| 0000054040 | 167E | 36FF | 1684 | 36FF | 1682 | 569A | 0051 | 8300 |
| 0000054060 | 1EC4 | 4689 | 89F6 | F856 | 08E9 | 2B00 | 89C0 | F846 |
| 0000054100 | 4689 | C7F6 | F446 | 0000 | 76FF | 9A06 | FFFF | 0000 |
| 0000054120 | 4689 | 83E4 | E47E | 7500 | E903 | 0005 | 46C7 | 1CF4 |
| 0000054140 | 8E00 | F806 | 2621 | 3E83 | 50F8 | 7500 | E903 | 0009 |
| 0000054160 | 7E83 | FEDC | 0374 | 0FE9 | 8E00 | FA06 | 2621 | 3E83 |

THU MAR 14 17:39:32 1991 IH.DLL PAGE 25, LINE 1417

| | | | | | | | | |
|---|---|---|---|---|---|---|---|---|
| 0000054200 | 5124 | 7500 | E903 | 0051 | 468B | 89F4 | DE46 | 76FF |
| 0000054220 | FFE2 | E076 | 468D | 16DE | FF50 | F276 | 76FF | FFFC |
| 0000054240 | FA76 | 4E8D | 16E6 | 8D51 | F64E | 5116 | 4E8D | 16D8 |
| 0000054260 | 1E51 | 2668 | 6817 | 00DD | 36FF | 1680 | 36FF | 167E |
| 0000054300 | 36FF | 1684 | 36FF | 1682 | 1F9A | 0054 | 8300 | 28C4 |
| 0000054320 | 468B | E9DE | 0009 | 06E9 | 8B00 | F446 | 00E9 | 5E00 |
| 0000054340 | 835F | 02ED | E58B | 5D1F | CB4D | 581E | 4590 | 8B55 |
| 0000054360 | 1EEC | D88E | EC81 | 0028 | 5657 | 46C7 | 36FA | 8C17 |
| 0000054400 | FC5E | 46C7 | 01F2 | 2B01 | 89C0 | E246 | 4689 | 8EE0 |
| 0000054420 | F806 | 2621 | 3E83 | 546C | 7500 | E903 | 001D | 36FF |
| 0000054440 | 1684 | 36FF | 1682 | 468D | 16D8 | 9A50 | 5482 | 0000 |
| 0000054460 | C483 | 3D08 | 0000 | 0374 | 0FE9 | 8E00 | FA06 | 2621 |
| 0000054500 | 3E83 | 5498 | 7500 | E903 | 003B | 681E | 173D | 468D |
| 0000054520 | 16E6 | 8D5D | D846 | 5016 | 468D | 16F6 | 6850 | 00F2 |
| 0000054540 | 681E | 1744 | 36FF | 1680 | 36FF | 167E | 36FF | 1684 |
| 0000054560 | 36FF | 1682 | CB9A | 0054 | 8300 | 1EC4 | 4689 | 89F6 |
| 0000054600 | F856 | 08E9 | 2B00 | 89C0 | F846 | 4689 | C7F6 | F446 |
| 0000054620 | 0000 | 76FF | 9A06 | FFFF | 0000 | 4689 | 83E4 | E47E |
| 0000054640 | 7500 | E903 | 0005 | 46C7 | 1DF4 | 8E00 | F806 | 2621 |
| 0000054660 | 3E83 | 55B6 | 7500 | E903 | 0009 | 7E83 | FEDC | 0374 |
| 0000054700 | 0FE9 | 8E00 | FA06 | 2621 | 3E83 | 55E2 | 7500 | E903 |
| 0000054720 | 0051 | 468B | 89F4 | DE46 | 76FF | FFE2 | E076 | 468D |
| 0000054740 | 16DE | FF50 | F276 | 76FF | FFFC | FA76 | 4E8D | 16E6 |
| 0000054760 | 8D51 | F64E | 5116 | 4E8D | 16D8 | 1E51 | 4468 | 6817 |
| 0000055000 | 00FE | 36FF | 1680 | 36FF | 167E | 36FF | 1684 | 36FF |
| 0000055020 | 1682 | 699A | 0055 | 8300 | 28C4 | 468B | E9DE | 0009 |
| 0000055040 | 06E9 | 8B00 | F446 | 00E9 | 5E00 | 835F | 02ED | E58B |
| 0000055060 | 5D1F | CB4D | 581E | 4590 | 8B55 | 1EEC | D88E | EC81 |
| 0000055100 | 0028 | 5657 | 46C7 | 57FA | 8C17 | FC5E | 46C7 | 01F2 |
| 0000055120 | 2B01 | 89C0 | E246 | 4689 | 8EE0 | F806 | 2621 | 3E83 |
| 0000055140 | 579C | 7500 | E903 | 001D | 36FF | 1684 | 36FF | 1682 |
| 0000055160 | 468D | 16D8 | 9A50 | 55CC | 0000 | C483 | 3D08 | 0000 |
| 0000055200 | 0374 | 0FE9 | 8E00 | FA06 | 2621 | 3E83 | 57B4 | 7500 |
| 0000055220 | E903 | 003B | 681E | 175E | 468D | 16E6 | 8D50 | D846 |
| 0000055240 | 5016 | 468D | 16F6 | 6850 | 0113 | 681E | 1766 | 36FF |
| 0000055260 | 1680 | 36FF | 167E | 36FF | 1684 | 36FF | 1682 | 159A |
| 0000055300 | 0056 | 8300 | 1EC4 | 4689 | 89F6 | F856 | 08E9 | 2B00 |
| 0000055320 | 89C0 | F846 | 4689 | C7F6 | F446 | 0000 | 76FF | 9A06 |
| 0000055340 | 39BF | 0000 | 4689 | 83E4 | E47E | 7500 | E903 | 0005 |
| 0000055360 | 46C7 | 05F4 | 8E00 | F806 | 2621 | 3E83 | 5652 | 7500 |
| 0000055400 | E903 | 0009 | 7E83 | FEDC | 0374 | 0FE9 | 8E00 | FA06 |
| 0000055420 | 2621 | 3E83 | 566A | 7500 | E903 | 0051 | 468B | 89F4 |
| 0000055440 | DE46 | 76FF | FFE2 | E076 | 468D | 16DE | FF50 | F276 |
| 0000055460 | 76FF | FFFC | FA76 | 4E8D | 16E6 | 8D51 | F64E | 5116 |
| 0000055500 | 4E8D | 16D8 | 1E51 | 6668 | 6817 | 0120 | 36FF | 1680 |
| 0000055520 | 36FF | 167E | 36FF | 1684 | 36FF | 1682 | B39A | 0056 |
| 0000055540 | 8300 | 28C4 | 468B | E9DE | 0009 | 06E9 | 8B00 | F446 |
| 0000055560 | 00E9 | 5E00 | 835F | 02ED | E58B | 5D1F | CB4D | 581E |
| 0000055600 | 4590 | 8B55 | 1EEC | D88E | EC81 | 002C | 5657 | 46C7 |
| 0000055620 | 82FA | 8C17 | FC5E | 46C7 | 01EE | 2B01 | 89C0 | DE46 |
| 0000055640 | 4689 | 8EDC | FC06 | 2621 | 3E83 | 5700 | 7500 | E903 |
| 0000055660 | 001D | 36FF | 1796 | 36FF | 1794 | 468D | 16D4 | 9A50 |
| 0000055700 | 5716 | 0000 | C483 | 3D08 | 0000 | 0374 | 0FE9 | 8E00 |
| 0000055720 | FE06 | 2621 | 3E83 | 5981 | 7500 | E903 | 003A | 681E |
| 0000055740 | 1789 | 468D | 16E2 | 8D50 | D446 | 5016 | 468D | 16F6 |
| 0000055760 | 6A50 | 1E6B | 9C68 | FF17 | 9236 | FF17 | 9036 | FF17 |
| 0000056000 | 9636 | FF17 | 9436 | 9A17 | 575F | 0000 | C483 | 891E |
| 0000056020 | F646 | 5689 | E9F8 | 0008 | C02B | 4689 | 89F8 | F646 |
| 0000056040 | 46C7 | 00F4 | 8300 | 0A7E | 7500 | E903 | 0006 | 468B |

THU MAR 14 17:39:32 1991 IH.DLL PAGE 26, LINE 1476

| | | | | | | | | |
|---|---|---|---|---|---|---|---|---|
| 0000056060 | E90A | 0003 | 00B8 | 8908 | F246 | 681E | 1798 | AD9A |
| 0000056100 | 003F | 8900 | E046 | 76FF | FF0E | 0C76 | 76FF | 6AF2 |
| 0000056120 | 6A00 | FF00 | 0876 | 76FF | 9A06 | 921C | 4F7C | C483 |
| 0000056140 | 890E | F046 | 7E83 | FFF0 | 0374 | 08E9 | C700 | F446 |
| 0000056160 | 001E | 1EE9 | 1E00 | 9868 | 6A17 | 6AFF | 9AFF | 3FC9 |
| 0000056200 | 0000 | 4689 | 83E0 | E07E | 7500 | E903 | 0005 | 46C7 |
| 0000056220 | 1FF4 | 8300 | F47E | 7500 | E903 | 0009 | 681E | 1798 |
| 0000056240 | BE9A | 004C | 8B00 | 1246 | 460B | 7510 | E903 | 0012 |
| 0000056260 | 7E83 | FFF0 | 0375 | 09E9 | 8B00 | F046 | 5EC4 | 2610 |
| 0000056300 | 0789 | 068E | 21FC | 8326 | 4A3E | 0058 | 0375 | 09E9 |
| 0000056320 | 8300 | D87E | 74FE | E903 | 000F | 068E | 21FE | 8326 |
| 0000056340 | 2C3E | 0057 | 0375 | 51E9 | 8B00 | F446 | 4689 | FFDA |
| 0000056360 | DE76 | 76FF | 8DDC | DA46 | 5016 | 76FF | FFEE | FC76 |
| 0000056400 | 76FF | 8DFA | E24E | 5116 | 4E8D | 16F6 | 8D51 | D44E |
| 0000056420 | 5116 | 681E | 179C | 8C68 | FF00 | 9236 | FF17 | 9036 |
| 0000056440 | FF17 | 9636 | FF17 | 9436 | 9A17 | 57FD | 0000 | C483 |
| 0000056460 | 8B28 | DA46 | 09E9 | E900 | 0006 | 468B | E9F4 | 0000 |
| 0000056500 | 5F5E | ED83 | 8B02 | 1FE5 | 4D5D | 1ECB | 9058 | 5545 |
| 0000056520 | EC8B | 8E1E | 81D8 | 00EC | 5700 | 1E56 | 9868 | 9A17 |
| 0000056540 | 5941 | 0000 | 00E9 | 5E00 | 835F | 02ED | E58B | 5D1F |
| 0000056560 | CB4D | 581E | 4590 | 8B55 | 1EEC | D88E | EC81 | 0028 |
| 0000056600 | 5657 | 46C7 | BBFA | 8C17 | FC5E | 46C7 | 01F0 | 2B01 |
| 0000056620 | 89CD | E246 | 4689 | 8EE0 | 0006 | 2622 | 3E83 | 5969 |
| 0000056640 | 7500 | E903 | 001D | 36FF | 17D0 | 36FF | 17CE | 468D |
| 0000056660 | 16D8 | 9A50 | 5860 | 0000 | C483 | 3D08 | 0000 | 0374 |
| 0000056700 | 0FE9 | 8E00 | 0206 | 2622 | 3E83 | 5B81 | 7500 | E903 |
| 0000056720 | 003A | 681E | 17C2 | 468D | 16E4 | 8D50 | D846 | 5016 |
| 0000056740 | 468D | 16F6 | 6A50 | 1E60 | D868 | FF17 | CC36 | FF17 |
| 0000056760 | CA36 | FF17 | D036 | FF17 | CE36 | 9A17 | 58A8 | 0000 |
| 0000057000 | C483 | 891E | F646 | 5689 | E9F8 | 0008 | C02B | 4689 |
| 0000057020 | 89F8 | F646 | 46C7 | 00F4 | 8300 | D63E | 0017 | 0374 |
| 0000057040 | 9FE9 | C700 | F246 | 0000 | 03E9 | FF00 | F246 | 7E83 |
| 0000057060 | 10F2 | 037C | 0DE9 | 6B00 | F25E | C728 | 1287 | 0125 |
| 0000057100 | E900 | FFE7 | 06C7 | 24B0 | 0010 | 46C7 | 00F2 | E900 |
| 0000057120 | 0003 | 46FF | 83F2 | F27E | 7C10 | E903 | 0039 | 5E6B |
| 0000057140 | 28F2 | C02B | 8789 | 2532 | 8789 | 2530 | 466B | 28F2 |
| 0000057160 | 3005 | 1E25 | 9A50 | 58DF | 0000 | 466B | 28F2 | 3005 |
| 0000057200 | 8B25 | F25E | CB8B | E3D1 | D903 | E3D1 | 8789 | 24B4 |
| 0000057220 | 9F8C | 24B6 | BBE9 | 6AFF | 6A00 | 6A00 | 6A00 | 6800 |
| 0000057240 | 2000 | 4B68 | 685B | FFFF | 1E9A | FC58 | 8358 | 0EC4 |
| 0000057260 | 4689 | 83F4 | F47E | 7400 | E903 | 0006 | 06C7 | 17D6 |
| 0000057300 | 0001 | 068E | 2200 | 8326 | 3E3E | 005A | 0375 | 09E9 |
| 0000057320 | 8300 | DC7E | 74FE | E903 | 000F | 068E | 2202 | 8326 |
| 0000057340 | 763E | 0058 | 0375 | 50E9 | 8B00 | F446 | 4689 | FFDE |
| 0000057360 | E276 | 76FF | 8DE0 | DE46 | 5016 | 76FF | FFF0 | FC76 |
| 0000057400 | 76FF | 8DFA | E44E | 5116 | 4E8D | 16F6 | 8D51 | D84E |
| 0000057420 | 5116 | 681E | 17D8 | 7D6A | 36FF | 17CC | 36FF | 17CA |
| 0000057440 | 36FF | 17D0 | 36FF | 17CE | CA9A | 0059 | 8300 | 28C4 |
| 0000057460 | 468B | E9DE | 0009 | 06E9 | 8B00 | F446 | 00E9 | 5E00 |
| 0000057500 | 835F | 02ED | E58B | 5D1F | CB4D | 581E | 4590 | 8B55 |
| 0000057520 | 1EEC | D88E | EC81 | 0092 | 5657 | 46C7 | ECFA | 8C17 |
| 0000057540 | FC5E | 46C7 | 00AE | 2B00 | 89C0 | 7E86 | 89FF | 7C86 |
| 0000057560 | 8EFF | 0006 | 2622 | 3E83 | 5C9D | 7500 | E903 | 001E |
| 0000057600 | 36FF | 17D0 | 36FF | 17CE | 868D | FF74 | 5016 | 549A |
| 0000057620 | 005A | 8300 | 08C4 | 003D | 7400 | E903 | 000F | 068E |
| 0000057640 | 2202 | 8326 | AC3E | 005C | 0375 | 3CE9 | 1E00 | F068 |
| 0000057660 | 8D17 | A246 | 5016 | 868D | FF74 | 5016 | 468D | 16D6 |
| 0000057700 | 6850 | 0092 | 681E | 18D0 | 36FF | 17CC | 36FF | 17CA |
| 0000057720 | 36FF | 17D0 | 36FF | 17CE | 9C9A | 005A | 8300 | 1EC4 |

THU MAR 14 17:39:32 1991 IH.DLL PAGE 27, LINE 1535

| | | | | | | | | |
|---|---|---|---|---|---|---|---|---|
| 0000057740 | 4689 | 89D6 | D856 | 08E9 | 2B00 | 89C0 | D846 | 4689 |
| 0000057760 | C7D6 | D446 | 0000 | 068E | 2200 | 8326 | 913E | 005D |
| 0000060000 | 0374 | 0FE9 | 8E00 | 0206 | 2622 | 3E83 | 5A6A | 7500 |
| 0000060020 | E903 | 000C | 681E | 17F4 | AC9A | 004A | 8300 | 04C4 |
| 0000060040 | EB9A | 6059 | C75D | B046 | 0000 | 03E9 | FF00 | B046 |
| 0000060060 | 7E83 | 10B0 | 0372 | 11E9 | 6B00 | B05E | 2B28 | 89C0 |
| 0000060100 | 3887 | 8925 | 3687 | E925 | FFE3 | 46C7 | 00D4 | 8D00 |
| 0000060120 | B246 | 5016 | 681E | 24B0 | FF6A | FF6A | DA9A | 000F |
| 0000060140 | 8900 | A046 | 7E83 | 00A0 | 0375 | 08E9 | C700 | D446 |
| 0000060160 | 0005 | 81E9 | 6B03 | B246 | 0528 | 253D | 501E | 169A |
| 0000060200 | 005B | 6B00 | B25E | 8328 | 34BF | 0025 | 0374 | 59E9 |
| 0000060220 | 6B00 | B25E | 8328 | 12BF | 0025 | 0374 | 4BE9 | 6B00 |
| 0000060240 | B25E | C728 | 3487 | 0125 | 6B00 | B25E | 8B28 | 3887 |
| 0000060260 | 0B25 | 3687 | 7425 | E903 | 002D | 1268 | 9A04 | 8D74 |
| 0000060300 | 5E5C | C483 | 6B02 | B25E | 8928 | 3687 | 8925 | 3897 |
| 0000060320 | 6B25 | B25E | 8B28 | 3887 | 0B25 | 3687 | 7425 | E903 |
| 0000060340 | 0005 | 46C7 | 07D4 | E900 | 02AC | 068E | 2200 | 8326 |
| 0000060360 | 683E | 005E | 0375 | 4AE9 | 8300 | 78BE | FEFF | 0375 |
| 0000060400 | 40E9 | FF00 | B276 | 681E | 17F8 | 468D | 16A2 | 8D50 |
| 0000060420 | D646 | 5016 | 868D | FF74 | 5016 | 681E | 18D0 | CC68 |
| 0000060440 | FF00 | CC36 | FF17 | CA36 | FF17 | D036 | FF17 | CE36 |
| 0000060460 | 1E17 | 1368 | 6818 | 5F0D | 1068 | 9A5F | 5F13 | 0000 |
| 0000060500 | C483 | 8B28 | B276 | E6D1 | 7A83 | 00B4 | 0374 | 65E9 |
| 0000060520 | 8B00 | B276 | E6D1 | 7A83 | 00DA | 0374 | 57E9 | 6B00 |
| 0000060540 | B25E | C428 | 369F | 2625 | 7F83 | 010E | 0374 | 06E9 |
| 0000060560 | B800 | 0006 | 1BE9 | 6B00 | B25E | C428 | 369F | 2625 |
| 0000060600 | 7F83 | 020E | 0374 | 06E9 | B800 | 0001 | 03E9 | B800 |
| 0000060620 | 0000 | 8689 | FF6E | 5E6B | 28B2 | 9FC4 | 2536 | 8B26 |
| 0000060640 | 1047 | A6F7 | FF6E | 768B | D1B2 | 2BE6 | 8042 | EE3D |
| 0000060660 | 75FF | E903 | 00CC | 76FF | 9AB2 | 67DC | 5F3A | C483 |
| 0000060700 | 8E02 | 0006 | 2622 | 3E83 | 5B69 | 7500 | E903 | 00AA |
| 0000060720 | BE83 | FF78 | 75FE | E903 | 00A0 | 5E6B | 28B2 | 9FC4 |
| 0000060740 | 2536 | 8326 | 0E7F | 7401 | E903 | 0006 | 06B8 | E900 |
| 0000060760 | 001B | 5E6B | 28B2 | 9FC4 | 2536 | 8326 | 0E7F | 7402 |
| 0000061000 | E903 | 0006 | 01B8 | E900 | 0003 | 00B8 | 8900 | 6E86 |
| 0000061020 | 8BFF | B276 | E6D1 | 72FF | 6B80 | B25E | C428 | 369F |
| 0000061040 | 2625 | 478B | F710 | 6EA6 | 05FF | 0012 | 8B50 | B276 |
| 0000061060 | E6D1 | 72FF | 8BDA | B276 | E6D1 | 72FF | 1EB4 | 1B68 |
| 0000061100 | 8D18 | A246 | 5016 | 468D | 16D6 | 8D50 | 7486 | 16FF |
| 0000061120 | 1E50 | D068 | 6818 | 00DB | 36FF | 17CC | 36FF | 17CA |
| 0000061140 | 36FF | 17D0 | 36FF | 17CE | 681E | 185A | E368 | 6851 |
| 0000061160 | 51E6 | E99A | 0051 | 8300 | 2EC4 | 46C7 | EBD4 | E903 |
| 0000061200 | 0114 | 7E83 | 00B2 | 0374 | 30E9 | 6B00 | B25E | FF28 |
| 0000061220 | 38B7 | FF25 | 36B7 | 9A25 | 61EB | 5F4D | C483 | 8904 |
| 0000061240 | D446 | 681E | 2530 | 36FF | 252E | AA9A | 6647 | 835F |
| 0000061260 | 06C4 | 06C7 | 2534 | 0000 | DBE9 | 8B00 | B276 | E6D1 |
| 0000061300 | 72FF | 9A80 | 8D74 | 5B43 | C483 | 8902 | 7086 | 89FF |
| 0000061320 | 7296 | 8BFF | 7286 | 0BFF | 7086 | 74FF | E903 | 0008 |
| 0000061340 | 46C7 | 07D4 | E900 | 00AE | 768B | D1B2 | FFE6 | 8072 |
| 0000061360 | 5E6B | 28B2 | B7FF | 2538 | B7FF | 2536 | B6FF | FF72 |
| 0000061400 | B6FF | FF70 | A29A | 1B94 | 8360 | 0AC4 | 9EC4 | FF70 |
| 0000061420 | 8026 | 087F | 7500 | E903 | 0069 | 068E | 2200 | 8326 |
| 0000061440 | 183E | 005C | 0375 | 47E9 | 8300 | 78BE | FEFF | 0375 |
| 0000061460 | 3DE9 | 1E00 | 6268 | 8D18 | A246 | 5016 | 468D | 16D6 |
| 0000061500 | 8D50 | 7486 | 16FF | 1E50 | D068 | 6818 | 0101 | 36FF |
| 0000061520 | 17CC | 36FF | 17CA | 36FF | 17D0 | 36FF | 17CE | 681E |
| 0000061540 | 1873 | D668 | 685D | 5DD9 | DC9A | 005D | 8300 | 26C4 |
| 0000061560 | B6FF | FF72 | B6FF | FF70 | DD9A | 2E40 | 8360 | 04C4 |
| 0000061600 | 13E9 | FF00 | 72B6 | FFFF | 70B6 | 9AFF | 1678 | 5CC3 |

THU MAR 14 17:39:32 1991 IH.DLL PAGE 28, LINE 1594

| | | | | | | | | |
|---|---|---|---|---|---|---|---|---|
| 0000061620 | C483 | 8904 | D446 | 5E6B | 28B2 | BF83 | 2534 | 7401 |
| 0000061640 | E903 | 0052 | 5E6B | 28B2 | 878B | 2538 | 870B | 2536 |
| 0000061660 | 0375 | 41E9 | 6B00 | B25E | FF28 | 2EB7 | 6B25 | B246 |
| 0000061700 | 0528 | 2530 | 501E | 768B | D1B2 | 8DE6 | DA42 | 5016 |
| 0000061720 | 5E6B | 28B2 | B7FF | 2538 | B7FF | 2536 | 0068 | 8B0[illegible] |
| 0000061740 | B276 | E6D1 | 428D | 1680 | 9A50 | FFFF | 0000 | 768B |
| 0000061760 | D1B2 | 89E6 | B442 | 7E83 | 00D4 | 0375 | B5E9 | 8E00 |
| 0000062000 | 0406 | 2622 | 3E83 | 610C | 7500 | E903 | 0040 | 76FF |
| 0000062020 | 1ED4 | 7B68 | 8D18 | A246 | 5016 | 468D | 16D6 | 8D50 |
| 0000062040 | 7486 | 16FF | 1E50 | D068 | 6818 | 0127 | 36FF | 17CC |
| 0000062060 | 36FF | 17CA | 36FF | 17D0 | 36FF | 17CE | 681E | 189E |
| 0000062100 | 4768 | 6861 | 614A | 4D9A | 0061 | 8300 | 28C4 | 76FF |
| 0000062120 | 9AD4 | 1937 | 5FA7 | C483 | 8902 | D446 | 7E83 | 00D4 |
| 0000062140 | 0375 | 4FE9 | 8E00 | 0406 | 2622 | 3E83 | 1867 | 7500 |
| 0000062160 | E903 | 0040 | 76FF | 1ED4 | A668 | 8D18 | A246 | 5016 |
| 0000062200 | 468D | 16D6 | 8D50 | 7486 | 16FF | 1E50 | D068 | 6818 |
| 0000062220 | 012C | 36FF | 17CC | 36FF | 17CA | 36FF | 17D0 | 36FF |
| 0000062240 | 17CE | 681E | 18C7 | 0368 | 6860 | 6006 | A79A | 0018 |
| 0000062260 | 8300 | 28C4 | 93E9 | 8EFB | 0006 | 2622 | 3E83 | 6181 |
| 0000062300 | 7400 | E903 | 000F | 068E | 2202 | 8326 | 9A3E | 0061 |
| 0000062320 | 0375 | 05E9 | 9A00 | 4B1E | 0000 | 068E | 2200 | 8326 |
| 0000062340 | C13E | 005F | 0375 | 0AE9 | 8300 | 78BE | FEFF | 0374 |
| 0000062360 | 0FE9 | 8E00 | 0206 | 2622 | 3E83 | 5C45 | 7500 | E903 |
| 0000062400 | 003B | 468D | 16A2 | 8D50 | D646 | 5016 | 868D | FF74 |
| 0000062420 | 5016 | 681E | 18D0 | 3168 | FF01 | CC36 | FF17 | CA36 |
| 0000062440 | FF17 | D036 | FF17 | CE36 | 9A17 | 429F | 0000 | C483 |
| 0000062460 | C71A | 7A86 | 00FF | E900 | 0006 | 03E9 | E900 | 0000 |
| 0000062500 | 5F5E | ED83 | 8B02 | 1FE5 | 4D5D | 1ECB | 9058 | 5545 |
| 0000062520 | EC8B | 8E1E | 81D8 | 26EC | 5700 | C756 | FA46 | 18DE |
| 0000062540 | 5E8C | C7FC | F246 | 0101 | C02B | 4689 | 89E4 | E246 |
| 0000062560 | 068E | 2200 | 8326 | CB3E | 0062 | 0375 | 1DE9 | FF00 |
| 0000062600 | D036 | FF17 | CE36 | 8D17 | DA46 | 5016 | 2F9A | 005C |
| 0000062620 | 8300 | 08C4 | 003D | 7400 | E903 | 000F | 068E | 2202 |
| 0000062640 | 8326 | E33E | 0062 | 0375 | 3BE9 | 1E00 | E568 | 8D18 |
| 0000062660 | E646 | 5016 | 468D | 16DA | 8D50 | F646 | 5016 | 4768 |
| 0000062700 | 1E01 | EC68 | FF18 | CC36 | FF17 | CA36 | FF17 | D036 |
| 0000062720 | FF17 | CE36 | 9A17 | 5C79 | 0000 | C483 | 891E | F646 |
| 0000062740 | 5689 | E9F8 | 0008 | C02B | 4689 | 89F8 | F646 | 46C7 |
| 0000062760 | 00F4 | C400 | 065E | 8B26 | 0C47 | 1CE9 | FF00 | 0876 |
| 0000063000 | 76FF | 9A06 | 634D | 60F4 | C483 | 8904 | F446 | 13E9 |
| 0000063020 | C700 | F446 | 0013 | 0BE9 | 2D00 | 03EF | 0375 | DCE9 |
| 0000063040 | E9FF | FFED | 068E | 2200 | 8326 | 5E3E | 0061 | 0375 |
| 0000063060 | 09E9 | 8300 | DE7E | 74FE | E903 | 000F | 068E | 2202 |
| 0000063100 | 8326 | 6D3E | 0061 | 0375 | 51E9 | 8B00 | F446 | 4689 |
| 0000063120 | FFE0 | E476 | 76FF | 8DE2 | E046 | 5016 | 76FF | FFF2 |
| 0000063140 | FC76 | 76FF | 8DFA | E64E | 5116 | 4E8D | 16F6 | 8D51 |
| 0000063160 | DA4E | 5116 | 681E | 18EC | 5C68 | FF01 | CC36 | FF17 |
| 0000063200 | CA36 | FF17 | D036 | FF17 | CE36 | 9A!7 | 5BC9 | 0000 |
| 0000063220 | C483 | 8B28 | E046 | 09E9 | E900 | 0006 | 468B | E9F4 |
| 0000063240 | 0000 | 5F5E | ED83 | 8B02 | 1FE5 | 4D5D | 1ECB | 9058 |
| 0000063260 | 5545 | EC8B | 8E1E | 81D8 | 4AEC | 5700 | C756 | E246 |
| 0000063300 | 18FC | 5E8C | C7E4 | D646 | 0101 | C02B | 4689 | 89C8 |
| 0000063320 | C646 | 068E | 2200 | 8326 | 1B3E | 0065 | 0375 | 1DE9 |
| 0000063340 | FF00 | D036 | FF17 | CE36 | 8D17 | BA46 | 5016 | 2D9A |
| 0000063360 | 0062 | 8300 | 08C4 | 003D | 7400 | E903 | 000F | 068E |
| 0000063400 | 2202 | 8326 | 333E | 0065 | 0375 | 3BE9 | 1E00 | 0368 |
| 0000063420 | 8D19 | CA46 | 5016 | 468D | 16BA | 8D50 | DE46 | 5016 |
| 0000063440 | 7168 | 1E01 | 0A68 | FF19 | CC36 | FF17 | CA36 | FF17 |
| 0000063460 | D036 | FF17 | CE36 | 9A17 | 6276 | 0000 | C483 | 891E |

THU MAR 14 17:39:32 1991 IH.DLL PAGE 29, LINE 1653

| | | | | | | | | |
|---|---|---|---|---|---|---|---|---|
| 0000063500 | DE46 | 5689 | E9E0 | 0008 | C02B | 4689 | 89E0 | DE46 |
| 0000063520 | 46C7 | 00DC | 8B00 | 0646 | 568B | 0508 | 0012 | 4689 |
| 0000063540 | 89B6 | B856 | 468D | 16D8 | 6A50 | 6A00 | FF00 | B876 |
| 0000063560 | 76FF | 9AB6 | 50CC | 644D | C483 | 890C | DC46 | 7E83 |
| 0000063600 | 00DC | 0374 | B4E9 | 8D00 | DA46 | 5016 | 76FF | FFD8 |
| 0000063620 | B876 | 76FF | C4B6 | 065E | FF26 | 0677 | 5EC4 | 2606 |
| 0000063640 | 77FF | C404 | 065E | FF26 | 0277 | 9D9A | 7165 | 8364 |
| 0000063660 | 10C4 | 4689 | 83DC | DC7E | 7400 | E903 | 007D | 466B |
| 0000063700 | 28DA | 3005 | 1E25 | 9A50 | 5A00 | 0000 | 186A | 749A |
| 0000063720 | 9F8D | 8364 | 02C4 | 4689 | 89C2 | C456 | 468B | 0BC4 |
| 0000063740 | C246 | 0374 | 08E9 | C700 | DC46 | 0007 | 39E9 | 6A00 |
| 0000063760 | 6801 | 03EC | 016A | 76FF | FFC4 | C276 | BA9A | C044 |
| 0000064000 | 8364 | 0AC4 | 5EC4 | 26C2 | 47C7 | 0112 | 8B00 | DA46 |
| 0000064020 | 5EC4 | 26C2 | 4789 | FF14 | C476 | 76FF | 9AC2 | 1678 |
| 0000064040 | 64EA | C483 | 8904 | DC46 | 7E83 | 00DC | 0375 | 0AE9 |
| 0000064060 | 6B00 | DA5E | C728 | 1287 | 0125 | 6A00 | 6801 | 03ED |
| 0000064100 | 016A | 468D | 16E6 | 9A50 | 44BA | 650C | C483 | 8B0A |
| 0000064120 | DC46 | 4689 | 6BFA | DA5E | FF28 | 2EB7 | C425 | 065E |
| 0000064140 | FF26 | 0677 | 468D | 16E6 | 9A50 | 3D53 | 62A6 | C483 |
| 0000064160 | 8908 | DC46 | 068E | 2200 | 8326 | 173E | 0062 | 0375 |
| 0000064200 | 09E9 | 8300 | BE7E | 74FE | E903 | 000F | 068E | 2202 |
| 0000064220 | 8326 | 433E | 0062 | 0375 | 51E9 | 8B00 | DC46 | 4689 |
| 0000064240 | FFC0 | C876 | 76FF | 8DC6 | C046 | 5016 | 76FF | FFD6 |
| 0000064260 | E476 | 76FF | 8DE2 | CA4E | 5116 | 4E8D | 16DE | 8D51 |
| 0000064300 | BA4E | 5116 | 681E | 190A | AE68 | FF01 | CC36 | FF17 |
| 0000064320 | CA36 | FF17 | D036 | FF17 | CE36 | 9A17 | 632C | 0000 |
| 0000064340 | C483 | 8B28 | C046 | 09E9 | E900 | 0006 | 468B | E9DC |
| 0000064360 | 0000 | 5F5E | ED83 | 8B02 | 1FE5 | 4D5D | 1ECB | 9058 |
| 0000064400 | 5545 | EC8B | 8E1E | 81D8 | 28EC | 5700 | C756 | FA46 |
| 0000064420 | 1915 | 5E8C | C7FC | F046 | 0101 | C02B | 4689 | 89E2 |
| 0000064440 | E046 | 068E | 2200 | 8326 | B13E | 0066 | 0375 | 1DE9 |
| 0000064460 | FF00 | D036 | FF17 | CE36 | 8D17 | D846 | 5016 | 8F9A |
| 0000064500 | 0063 | 8300 | 08C4 | 003D | 7400 | E903 | 000F | 068E |
| 0000064520 | 2202 | 8326 | C93E | 0066 | 0375 | 3BE9 | 1E00 | 1C68 |
| 0000064540 | 8D19 | E446 | 5016 | 468D | 16D8 | 8D50 | F646 | 5016 |
| 0000064560 | C868 | 1E01 | 2468 | FF19 | CC36 | FF17 | CA36 | FF17 |
| 0000064600 | D036 | FF17 | CE36 | 9A17 | 63D8 | 0000 | C483 | 891E |
| 0000064620 | F646 | 5689 | E9F8 | 0008 | C02B | 4689 | 89F8 | F646 |
| 0000064640 | 46C7 | 00F4 | C700 | F246 | 0001 | 03E9 | FF00 | F246 |
| 0000064660 | 7E83 | 10F2 | 0372 | 11E9 | 6B00 | F25E | 8328 | 12BF |
| 0000064700 | 0025 | 0374 | 03E9 | E900 | FFE3 | 7E83 | 10F2 | 0373 |
| 0000064720 | 08E9 | C700 | F446 | 03F3 | 1DE9 | FF00 | 1076 | 76FF |
| 0000064740 | FF0E | 0C76 | 76FF | FF0A | 0876 | 76FF | FF06 | F276 |
| 0000064760 | 339A | 1667 | 8364 | 0EC4 | 7E83 | 00F4 | 0374 | 09E9 |
| 0000065000 | 8B00 | F246 | 5EC4 | 2612 | 0789 | 068E | 2200 | 8326 |
| 0000065020 | 793E | 0063 | 0375 | 09E9 | 8300 | DC7E | 74FE | E903 |
| 0000065040 | 000F | 068E | 2202 | 8326 | A53E | 0063 | 0375 | 51E9 |
| 0000065060 | 8B00 | F446 | 4689 | FFDE | E276 | 76FF | 8DE0 | DE46 |
| 0000065100 | 5016 | 76FF | FFF0 | FC76 | 76FF | 8DFA | E44E | 5116 |
| 0000065120 | 4E8D | 16F6 | 8D51 | D84E | 5116 | 681E | 1924 | DC68 |
| 0000065140 | FF01 | CC36 | FF17 | CA36 | FF17 | D036 | FF17 | CE36 |
| 0000065160 | 9A17 | 657C | 0000 | C483 | 8B28 | DE46 | 09E9 | E900 |
| 0000065200 | 0006 | 468B | E9F4 | 0000 | 5F5E | ED83 | 8B02 | 1FE5 |
| 0000065220 | 4D5D | 1ECB | 9058 | 5545 | EC8B | 8E1E | 81D8 | 00EC |
| 0000065240 | 5700 | 6B56 | 065E | C728 | 1287 | 0025 | 8B00 | 0846 |
| 0000065260 | 5E6B | 2806 | 8789 | 2514 | 468B | 6B0A | 065E | 8928 |
| 0000065300 | 1687 | 8B25 | 0C46 | 5E6B | 2806 | 8789 | 2518 | 76FF |
| 0000065320 | FF10 | 0E76 | 466B | 2806 | 1A05 | 1E25 | 9A50 | 9032 |
| 0000065340 | 6693 | C483 | 8B08 | 1246 | 5E6B | 2806 | 8789 | 252E |

THU MAR 14 17:39:32 1991 IH.DLL PAGE 30, LINE 1712

| | | | | | | | | |
|---|---|---|---|---|---|---|---|---|
| 0000065360 | 00E9 | 5E00 | 835F | 02ED | E58B | 5D1F | CB4D | 581E |
| 0000065400 | 4590 | 8B55 | 1EEC | D88E | EC81 | 0000 | 5657 | 5E6B |
| 0000065420 | 2806 | 87C7 | 2512 | 0000 | 468B | 6B08 | 065E | 8928 |
| 0000065440 | 1687 | 8B25 | 0A46 | 5E6B | 2806 | 8789 | 2518 | 00E9 |
| 0000065460 | 5E00 | 835F | 02ED | E58B | 5D1F | CB4D | 581E | 4590 |
| 0000065500 | 8B55 | 1EEC | D88E | EC81 | 0000 | 5657 | ED68 | FF03 |
| 0000065520 | 0676 | BF9A | 1D42 | 8368 | 04C4 | 5E6B | 2806 | 87C7 |
| 0000065540 | 2512 | 0001 | 5E6B | 2806 | 87C7 | 2534 | 0000 | 5E6B |
| 0000065560 | 2806 | B7FF | 2538 | B7FF | 2536 | 7E9A | 808D | 8367 |
| 0000065600 | 04C4 | 5E6B | 2806 | C02B | 8789 | 2538 | 8789 | 2536 |
| 0000065620 | 466B | 2806 | 3005 | 1E25 | 9A50 | 6468 | 0000 | 00E9 |
| 0000065640 | 5E00 | 835F | 02ED | E58B | 5D1F | CB4D | 581E | 4590 |
| 0000065660 | 8B55 | 1EEC | D88E | EC81 | 0026 | 5657 | 46C7 | 35FA |
| 0000065700 | 8C19 | FC5E | 46C7 | 01F2 | 2B01 | 89C0 | E446 | 4689 |
| 0000065720 | 8EE2 | 0006 | 2622 | 3E83 | 692D | 7500 | E903 | 001D |
| 0000065740 | 36FF | 17D0 | 36FF | 17CE | 468D | 16DA | 9A50 | 65DF |
| 0000065760 | 0000 | C483 | 3D08 | 0000 | 0374 | 0FE9 | 8E00 | 0206 |
| 0000066000 | 2622 | 3E83 | 6945 | 7500 | E903 | 003B | 681E | 193C |
| 0000066020 | 468D | 16E6 | 8D50 | DA46 | 5016 | 468D | 16F6 | 6850 |
| 0000066040 | 0255 | 681E | 1944 | 36FF | 17CC | 36FF | 17CA | 36FF |
| 0000066060 | 17D0 | 36FF | 17CE | 289A | 0066 | 8300 | 1EC4 | 4689 |
| 0000066100 | 89F6 | F856 | 08E9 | 2B00 | 89C0 | F846 | 4689 | C7F6 |
| 0000066120 | F446 | 0000 | 5E6B | 2806 | BF83 | 2512 | 7400 | E903 |
| 0000066140 | 000E | 5E6B | 2806 | BF83 | 2514 | 74FF | E903 | 0008 |
| 0000066160 | 46C7 | EFF4 | E903 | 000E | 5E6B | 2806 | 878B | 2514 |
| 0000066200 | 5EC4 | 2608 | 0789 | 068E | 2200 | 8326 | C93E | 0065 |
| 0000066220 | 0375 | 09E9 | 8300 | DE7E | 74FE | E903 | 000F | 068E |
| 0000066240 | 2202 | 8326 | F53E | 0065 | 0375 | 51E9 | 8B00 | F446 |
| 0000066260 | 4689 | FFE0 | E476 | 76FF | 8DE2 | E046 | 5016 | 76FF |
| 0000066300 | FFF2 | FC76 | 76FF | 8DFA | E64E | 5116 | 4E8D | 16F6 |
| 0000066320 | 8D51 | DA4E | 5116 | 681E | 1944 | 6268 | FF02 | CC36 |
| 0000066340 | FF17 | CA36 | FF17 | D036 | FF17 | CE36 | 9A17 | 6712 |
| 0000066360 | 0000 | C483 | 8B28 | E046 | 09E9 | E900 | 0006 | 468B |
| 0000066400 | E9F4 | 0000 | 5F5E | ED83 | 8B02 | 1FE5 | 4D5D | 1ECB |
| 0000066420 | 9058 | 5545 | EC8B | 8E1E | 81D8 | 26EC | 5700 | C756 |
| 0000066440 | FA46 | 194E | 5E8C | C7FC | F246 | 0101 | C02B | 4689 |
| 0000066460 | 89E4 | E246 | 068E | 2200 | 8326 | 903E | 006A | 0375 |
| 0000066500 | 1DE9 | FF00 | D036 | FF17 | CE36 | 8D17 | DA46 | 5016 |
| 0000066520 | 8E9A | 0068 | 8300 | 08C4 | 003D | 7400 | E903 | 000F |
| 0000066540 | 068E | 2202 | 8326 | A83E | 006A | 0375 | 3BE9 | 1E00 |
| 0000066560 | 5568 | 8D19 | E646 | 5016 | 468D | 16DA | 8D50 | F646 |
| 0000066600 | 5016 | 7968 | 1E02 | 5C68 | FF19 | CC36 | FF17 | CA36 |
| 0000066620 | FF17 | D036 | FF17 | CE36 | 9A17 | 68D7 | 0000 | C483 |
| 0000066640 | 891E | F646 | 5689 | E9F8 | 0008 | C02B | 4689 | 89F8 |
| 0000066660 | F646 | 46C7 | 00F4 | 6B00 | 065E | 8328 | 12BF | 0025 |
| 0000066700 | 0374 | 0EE9 | 6B00 | 065E | 8328 | 16BF | FF25 | 0374 |
| 0000066720 | 08E9 | C700 | F446 | 03F0 | 0EE9 | 6B00 | 065E | 8B28 |
| 0000066740 | 1687 | C425 | 085E | 8926 | 8E07 | 0006 | 2622 | 3E83 |
| 0000066760 | 6878 | 7500 | E903 | 0009 | 7E83 | FEDE | 0374 | 0FE9 |
| 0000067000 | 8E00 | 0206 | 2622 | 3E83 | 68A4 | 7500 | E903 | 0051 |
| 0000067020 | 468B | 89F4 | E046 | 76FF | FFE4 | E276 | 468D | 16E0 |
| 0000067040 | FF50 | F276 | 76FF | FFFC | FA76 | 4E8D | 16E6 | 8D51 |
| 0000067060 | F64E | 5116 | 4E8D | 16DA | 1E51 | 5C68 | 6819 | 0286 |
| 0000067100 | 36FF | 17CC | 36FF | 17CA | 36FF | 17D0 | 36FF | 17CE |
| 0000067120 | 8E9A | 0069 | 8300 | 28C4 | 468B | E9E0 | 0009 | 06E9 |
| 0000067140 | 8B00 | F446 | 00E9 | 5E00 | 835F | D2ED | E58B | 5D1F |
| 0000067160 | CB4D | 581E | 4590 | 8B55 | 1EEC | D88E | EC81 | 0026 |
| 0000067200 | 5657 | 46C7 | 65FA | 8C19 | FC5E | 46C7 | 01F2 | 2B01 |
| 0000067220 | 89C0 | E446 | 4689 | 8EE2 | 0006 | 2622 | 3E83 | 6BF3 |

THU MAR 14 17:39:32 1991 IH.DLL PAGE 31, LINE 1771

| | | | | | | | | |
|---|---|---|---|---|---|---|---|---|
| 0000067240 | 7500 | E903 | 001D | 36FF | 17D0 | 36FF | 17CE | 468D |
| 0000067260 | 16DA | 9A50 | 69F1 | 0000 | C483 | 3D08 | 0000 | 0374 |
| 0000067300 | 0FE9 | 8E00 | 0206 | 2622 | 3E83 | 6C0B | 7500 | E903 |
| 0000067320 | 003B | 681E | 196C | 468D | 16E6 | 8D50 | DA46 | 5016 |
| 0000067340 | 468D | 16F6 | 6850 | 029D | 681E | 1974 | 36FF | 17CC |
| 0000067360 | 36FF | 17CA | 36FF | 17D0 | 36FF | 17CE | 3A9A | 006A |
| 0000067400 | 8300 | 1EC4 | 4689 | 89F6 | F856 | 08E9 | 2B00 | 89C0 |
| 0000067420 | F846 | 4689 | C7F6 | F446 | 0000 | 5E6B | 2806 | BF83 |
| 0000067440 | 2512 | 7400 | E903 | 000E | 5E6B | 2806 | BF83 | 2518 |
| 0000067460 | 74FF | E903 | 0008 | 46C7 | F1F4 | E903 | 000E | 5E6B |
| 0000067500 | 2806 | 878B | 2518 | 5EC4 | 2608 | 0789 | 068E | 2200 |
| 0000067520 | 8326 | DB3E | 0069 | 0375 | 09E9 | 8300 | DE7E | 74FE |
| 0000067540 | E903 | 000F | 068E | 2202 | 8326 | 073E | 006A | 0375 |
| 0000067560 | 51E9 | 8B00 | F446 | 4689 | FFE0 | E476 | 76FF | 8DE2 |
| 0000067600 | E046 | 5016 | 76FF | FFF2 | FC76 | 76FF | 8DFA | E64E |
| 0000067620 | 5116 | 4E8D | 16F6 | 8D51 | DA4E | 5116 | 681E | 1974 |
| 0000067640 | AA68 | FF02 | CC36 | FF17 | CA36 | FF17 | D036 | FF17 |
| 0000067660 | CE36 | 9A17 | 6AF1 | 0000 | C483 | 8B28 | E046 | 09E9 |
| 0000067700 | E900 | 0006 | 468B | E9F4 | 0000 | 5F5E | ED83 | 8B02 |
| 0000067720 | 1FE5 | 4D5D | 1ECB | 9058 | 5545 | EC8B | 8E1E | 81D8 |
| 0000067740 | 26EC | 5700 | C756 | FA46 | 197D | 5E8C | C7FC | F246 |
| 0000067760 | 0101 | C02B | 4689 | 89E4 | E246 | 068E | 2200 | 8326 |
| 0000070000 | 563E | 006D | 0375 | 1DE9 | FF00 | D036 | FF17 | CE36 |
| 0000070020 | 8D17 | DA46 | 5016 | 549A | 006B | 8300 | 08C4 | 003D |
| 0000070040 | 7400 | E903 | 000F | 068E | 2202 | 8326 | 6E3E | 006D |
| 0000070060 | 0375 | 3BE9 | 1E00 | 8468 | 8D19 | E646 | 5016 | 468D |
| 0000070100 | 16DA | 8D50 | F646 | 5016 | C168 | 1E02 | 8C68 | FF19 |
| 0000070120 | CC36 | FF17 | CA36 | FF17 | D036 | FF17 | CE36 | 9A17 |
| 0000070140 | 6B9D | 0000 | C483 | 891E | F646 | 5689 | E9F8 | 0008 |
| 0000070160 | C02B | 4689 | 89F8 | F646 | 46C7 | 00F4 | 6B00 | 065E |
| 0000070200 | 8328 | 12BF | 0025 | 0374 | 0EE9 | 6B00 | 065E | 8328 |
| 0000070220 | 2EBF | FF25 | 0374 | 08E9 | C700 | F446 | 03EE | 0EE9 |
| 0000070240 | 6B00 | 065E | 8B28 | 2E87 | C425 | 085E | 8926 | 8E07 |
| 0000070260 | 0006 | 2622 | 3E83 | 6B3E | 7500 | E903 | 0009 | 7E83 |
| 0000070300 | FEDE | 0374 | 0FE9 | 8E00 | 0206 | 2622 | 3E83 | 6B6A |
| 0000070320 | 7500 | E903 | 0051 | 468B | 89F4 | E046 | 76FF | FFE4 |
| 0000070340 | E276 | 468D | 16E0 | FF50 | F276 | 76FF | FFFC | FA76 |
| 0000070360 | 4E8D | 16E6 | 8D51 | F64E | 5116 | 4E8D | 16DA | 1E51 |
| 0000070400 | 8C68 | 6819 | 02CE | 36FF | 17CC | 36FF | 17CA | 36FF |
| 0000070420 | 17D0 | 36FF | 17CE | 549A | 006C | 8300 | 28C4 | 468B |
| 0000070440 | E9E0 | 0009 | 06E9 | 8B00 | F446 | 00E9 | 5E00 | 835F |
| 0000070460 | 02ED | E58B | 5D1F | CB4D | 581E | 4590 | 8B55 | 1EEC |
| 0000070500 | D88E | EC81 | 0028 | 5657 | 46C7 | 94FA | 8C19 | FC5E |
| 0000070520 | 46C7 | 01F0 | 2B01 | 89C0 | E246 | 4689 | 8EE0 | 0006 |
| 0000070540 | 2622 | 3E83 | 6ED8 | 7500 | E903 | 001D | 36FF | 17D0 |
| 0000070560 | 36FF | 17CE | 468D | 16D8 | 9A50 | 6CB7 | 0000 | C483 |
| 0000070600 | 3D08 | 0000 | 0374 | 0FE9 | 8E00 | 0206 | 2622 | 3E83 |
| 0000070620 | 6EF0 | 7500 | E903 | 003B | 681E | 199B | 468D | 16E4 |
| 0000070640 | 8D50 | D846 | 5016 | 468D | 16F6 | 6850 | 02E4 | 681E |
| 0000070660 | 19A2 | 36FF | 17CC | 36FF | 17CA | 36FF | 17D0 | 36FF |
| 0000070700 | 17CE | 009A | 006D | 8300 | 1EC4 | 4689 | 89F6 | F856 |
| 0000070720 | 08E9 | 2B00 | 89C0 | F846 | 4689 | C7F6 | F446 | 0000 |
| 0000070740 | 46C7 | 00F2 | 8300 | F27E | 7210 | E903 | 0024 | 5E6B |
| 0000070760 | 28F2 | BF83 | 2512 | 7400 | E903 | 0010 | 5E6B | 28F2 |
| 0000071000 | 468B | 3906 | 1687 | 7525 | E903 | 0006 | 46FF | E9F2 |
| 0000071020 | FFD3 | 7E83 | 10F2 | 0373 | 08E9 | C700 | F446 | 03EE |
| 0000071040 | 0EE9 | 6B00 | F25E | 8B28 | 2E87 | C425 | 085E | 8926 |
| 0000071060 | 8E07 | 0006 | 2622 | 3E83 | 6CA1 | 7500 | E903 | 0009 |
| 0000071100 | 7E83 | FEDC | 0374 | 0FE9 | 8E00 | 0206 | 2622 | 3E83 |

THU MAR 14 17:39:32 1991  IH.DLL  PAGE 32, LINE 1830

```
0000071120  6CCD  7500  E903  0051  468B  89F4  DE46  76FF
0000071140  FFE2  E076  468D  16DE  FF50  F076  76FF  FFFC
0000071160  FA76  4E8D  16E4  8D51  F64E  5116  4E8D  16D8
0000071200  1E51  A268  6819  02F8  36FF  17CC  36FF  17CA
0000071220  36FF  17D0  36FF  17CE  B79A  006D  8300  28C4
0000071240  468B  E9DE  0009  06E9  8B00  F446  00E9  5E00
0000071260  835F  02ED  E58B  5D1F  CB4D  581E  4590  8B55
0000071300  1EEC  D88E  EC81  0028  5657  46C7  B1FA  8C19
0000071320  FC5E  46C7  01F0  2B01  89C0  E246  4689  8EE0
0000071340  0006  2622  3E83  705A  7500  E903  001D  36FF
0000071360  17D0  36FF  17CE  468D  16D8  9A50  6E1A  0000
0000071400  C483  3D08  0000  0374  0FE9  8E00  0206  2622
0000071420  3E83  7072  7500  E903  003B  681E  19B8  468D
0000071440  16E4  8D50  D846  5016  468D  16F6  6850  030E
0000071460  681E  19C0  36FF  17CC  36FF  17CA  36FF  17D0
0000071500  36FF  17CE  639A  006E  8300  1EC4  4689  89F6
0000071520  F856  08E9  2B00  89C0  F846  4689  C7F6  F446
0000071540  0000  46C7  00F2  8300  F27E  7210  E903  0024
0000071560  5E6B  28F2  BF83  2512  7400  E903  0010  5E6B
0000071600  28F2  468B  3906  1487  7525  E903  0006  46FF
0000071620  E9F2  FFD3  7E83  10F2  0373  08E9  C700  F446
0000071640  03EE  0EE9  6B00  F25E  8B28  2E87  C425  085E
0000071660  8926  8E07  0006  2622  3E83  6E04  7500  E903
0000071700  0009  7E83  FEDC  0374  0FE9  8E00  0206  2622
0000071720  3E83  6E30  7500  E903  0051  468B  89F4  DE46
0000071740  76FF  FFE2  E076  468D  16DE  FF50  F076  76FF
0000071760  FFFC  FA76  4E8D  16E4  8D51  F64E  5116  4E8D
0000072000  16D8  1E51  C068  6819  0322  36FF  17CC  36FF
0000072020  17CA  36FF  17D0  36FF  17CE  399A  006F  8300
0000072040  28C4  468B  E9DE  0009  06E9  8B00  F446  00E9
0000072060  5E00  835F  02ED  E58B  5D1F  CB4D  581E  4590
0000072100  8B55  1EEC  D88E  EC81  0026  5657  46C7  D0FA
0000072120  8C19  FC5E  46C7  01F2  2B01  89C0  E446  4689
0000072140  8EE2  0006  2622  3E83  71B2  7500  E903  001D
0000072160  36FF  17D0  36FF  17CE  468D  16DA  9A50  6F9C
0000072200  0000  C483  3D08  0000  0374  0FE9  8E00  0206
0000072220  2622  3E83  71CA  7500  E903  003B  681E  19D7
0000072240  468D  16E6  8D50  DA46  5016  468D  16F6  6850
0000072260  0339  681E  19DE  36FF  17CC  36FF  17CA  36FF
0000072300  17D0  36FF  17CE  E59A  006F  8300  1EC4  4689
0000072320  89F6  F856  08E9  2B00  89C0  F846  4689  C7F6
0000072340  F446  0000  5E6B  2806  BF83  2512  7500  E903
0000072360  0008  46C7  F2F4  E903  0011  466B  2806  3005
0000072400  C425  085E  8926  2607  5F8C  8E02  0006  2622
0000072420  3E83  6F86  7500  E903  0009  7E83  FEDE  0374
0000072440  0FE9  8E00  0206  2622  3E83  6FB2  7500  E903
0000072460  0051  468B  89F4  E046  76FF  FFE4  E276  468D
0000072500  16E0  FF50  F276  76FF  FFFC  FA76  4E8D  16E6
0000072520  8D51  F64E  5116  4E8D  16DA  1E51  DE68  6819
0000072540  0346  36FF  17CC  36FF  17CA  36FF  17D0  36FF
0000072560  17CE  BB9A  0070  8300  28C4  468B  E9E0  0009
0000072600  06E9  8B00  F446  00E9  5E00  835F  02ED  E58B
0000072620  5D1F  CB4D  581E  4590  8B55  1EEC  D88E  EC81
0000072640  0026  5657  46C7  E9FA  8C19  FC5E  46C7  01F2
0000072660  2B01  89C0  E446  4689  8EE2  0006  2622  3E83
0000072700  730A  7500  E903  001D  36FF  17D0  36FF  17CE
0000072720  468D  16DA  9A50  711E  0000  C483  3D08  0000
0000072740  0374  0FE9  8E00  0206  2622  3E83  7322  7500
0000072760  E903  003B  681E  19F0  468D  16E6  8D50  DA46
```

THU MAR 14 17:39:32 1991 IH.DLL PAGE 33, LINE 1889

| | | | | | | | | |
|---|---|---|---|---|---|---|---|---|
| 0000073000 | 5016 | 468D | 16F6 | 6850 | 035F | 681E | 19F8 | 36FF |
| 0000073020 | 17CC | 36FF | 17CA | 36FF | 17D0 | 36FF | 17CE | 679A |
| 0000073040 | 0071 | 8300 | 1EC4 | 4689 | 89F6 | F856 | 08E9 | 2B00 |
| 0000073060 | 89C0 | F846 | 4689 | C7F6 | F446 | 0000 | 5E6B | 2806 |
| 0000073100 | BF83 | 2512 | 7500 | E903 | 0008 | 46C7 | EEF4 | E903 |
| 0000073120 | 0011 | 466B | 2806 | 1A05 | C425 | 085E | 8926 | 2607 |
| 0000073140 | 5F8C | 8E02 | 0006 | 2622 | 3E83 | 7108 | 7500 | E903 |
| 0000073160 | 0009 | 7E83 | FEDE | 0374 | 0FE9 | 8E00 | 0206 | 2622 |
| 0000073200 | 3E83 | 7134 | 7500 | E903 | 0051 | 468B | 89F4 | E046 |
| 0000073220 | 76FF | FFE4 | E276 | 468D | 16E0 | FF50 | F276 | 76FF |
| 0000073240 | FFFC | FA76 | 4E8D | 16E6 | 8D51 | F64E | 5116 | 4E8D |
| 0000073260 | 16DA | 1E51 | F868 | 6819 | 036C | 36FF | 17CC | 36FF |
| 0000073300 | 17CA | 36FF | 17D0 | 36FF | 17CE | 139A | 0072 | 8300 |
| 0000073320 | 28C4 | 468B | E9E0 | 0009 | 06E9 | 8B00 | F446 | 00E9 |
| 0000073340 | 5E00 | 835F | 02ED | E58B | 5D1F | CB4D | 581E | 4590 |
| 0000073360 | 8B55 | 1EEC | D88E | EC81 | 0000 | 5657 | 5EC4 | 2B06 |
| 0000073400 | 26C0 | 4789 | 2602 | 0789 | 468B | 8B06 | 0856 | D2A3 |
| 0000073420 | 8917 | D416 | FF17 | 0876 | 76FF | 9A06 | 5D1F | 0000 |
| 0000073440 | 00E9 | 5E00 | 835F | 02ED | E58B | 5D1F | CB4D | 581E |
| 0000073460 | 4590 | 8B55 | 1EEC | D88E | EC81 | 0000 | 5657 | D2A1 |
| 0000073500 | 8B17 | D416 | E917 | 0000 | 5F5E | ED83 | 8B02 | 1FE5 |
| 0000073520 | 4D5D | 00CB | 0000 | 0000 | 0000 | 0000 | 0000 | 0000 |
| 0000073540 | 0000 | 0000 | 8B55 | 1EEC | 0E68 | 1E1A | 1268 | 9A1A |
| 0000073560 | FFFF | 0000 | 068E | 1A0E | A126 | 0015 | 4EA3 | BB1A |
| 0000073600 | 1A18 | 1F8C | B5BE | 8327 | FEE6 | 1E56 | FF9A | 00FF |
| 0000073620 | 0B00 | 74C0 | 3304 | EBC0 | 893A | 0477 | 894E | 1636 |
| 0000073640 | 831A | 03EE | 04C7 | 0001 | 7789 | 8906 | 0877 | C683 |
| 0000073660 | C702 | FE04 | 89FF | 0A77 | 681E | 1A0C | 681E | 1A0A |
| 0000073700 | FF9A | 00FF | E800 | 0020 | C89A | F576 | E867 | 0066 |
| 0000073720 | 01B8 | 5D00 | 50CB | 869A | 6B76 | 9A74 | 7800 | 7479 |
| 0000073740 | FF68 | 9A00 | 758F | 747E | BB1E | 000D | FF33 | 068E |
| 0000073760 | 1A0C | FFB9 | 267F | 3D80 | 7500 | 4701 | 8026 | 003D |
| 0000074000 | 3174 | 2CBE | 8B1A | 8BD1 | F3CB | 8BA6 | 74CA | 3308 |
| 0000074020 | F2CD | 74AE | EBE7 | 061C | 071E | F78B | BF1F | 1A53 |
| 0000074040 | 2CAC | 7241 | C00E | 04E0 | AC92 | 412C | 0572 | C20A |
| 0000074060 | EBAA | 1FED | 00C3 | 02BB | 5200 | D48B | A780 | 1A53 |
| 0000074100 | 50B7 | C48B | 1653 | 1650 | 9A52 | FFFF | 0000 | C00B |
| 0000074120 | 7558 | B110 | 3C40 | 7401 | 3C06 | 7502 | B106 | 0808 |
| 0000074140 | 538F | 4B1A | D679 | E85A | 0026 | E2BE | BF21 | 21E2 |
| 0000074160 | 5FE8 | BE01 | 21E2 | E2BF | E821 | 0156 | E2B8 | 3D21 |
| 0000074200 | 21E6 | 0B74 | 016A | 680E | 7561 | FF9A | 00FF | C300 |
| 0000074220 | 0E8B | 21D8 | 2AE3 | 06C4 | 21DA | C28C | DB33 | 1EFF |
| 0000074240 | 21D6 | 0373 | 61E9 | 8E01 | 1206 | 261A | 1E8B | 0006 |
| 0000074260 | 754B | C40D | DE06 | 8C21 | BBC2 | 0003 | 1EFF | 21D6 |
| 0000074300 | B8C3 | 376F | D88E | 63A1 | 0B1C | 75C0 | 0E10 | D0A1 |
| 0000074320 | 0B21 | 75C0 | E805 | 001F | 03EB | 24E8 | 6A00 | 6A03 |
| 0000074340 | 6A00 | 9A00 | 752B | 0000 | 8B55 | 33EC | EBC9 | 551A |
| 0000074360 | EC8B | 01B9 | EB00 | 5512 | EC8B | 5756 | 00B9 | EB01 |
| 0000074400 | 5508 | EC8B | 5756 | 01B9 | E801 | 004B | 0A51 | 75C9 |
| 0000074420 | BE12 | 27AA | AABF | E827 | 00B8 | E2BE | BF21 | 21E6 |
| 0000074440 | AFE8 | BE00 | 21E6 | E6BF | E821 | 00A6 | E6BE | BF21 |
| 0000074460 | 21E6 | 9DE8 | E800 | 008C | 0A58 | 75E4 | C713 | 6306 |
| 0000074500 | 011C | B800 | 0001 | 8A50 | 0646 | 9A50 | FFFF | 0000 |
| 0000074520 | 4EE8 | 5F00 | 5D5E | 55CB | EC8B | 0D6A | B3E8 | 831B |
| 0000074540 | 02C4 | 068E | 1A12 | 8B26 | 061E | 4B00 | 168B | 1C65 |
| 0000074560 | FA83 | 75FF | 8904 | 651E | 391C | 651E | 9F1C | 0D6A |
| 0000074600 | B9E8 | 831B | 02C4 | 749E | 6A0A | E80E | 1B64 | C483 |
| 0000074620 | EB02 | 3BC7 | 74D3 | 6A08 | E80E | 1B76 | C483 | 5D02 |
| 0000074640 | 55C3 | EC8B | 0D6A | 69E8 | 831B | 02C4 | 06C7 | 1C65 |

THU MAR 14 17:39:32 19,1 IH.DLL PAGE 34, LINE 1948

| | | | | | | | | |
|---|---|---|---|---|---|---|---|---|
| 0000074660 | FFFF | 0D6A | 85E8 | 831B | 02C4 | 0E6A | 7DE8 | 831B |
| 0000074700 | 02C4 | C35D | 0E8B | 21D8 | 07E3 | 02BB | FF00 | D61E |
| 0000074720 | C321 | F73B | 0E73 | EF83 | 8B04 | 0B05 | 0245 | F274 |
| 0000074740 | 1DFF | EEEB | 00C3 | 8B55 | B8EC | 00FC | 0E50 | 6FE8 |
| 0000074760 | 8301 | 6A3E | 001C | 0474 | 1EFF | 1C68 | FFB8 | 5000 |
| 0000075000 | E80E | 015C | E58B | CB5D | 02B8 | E900 | FDC7 | 5A59 |
| 0000075020 | DC8B | D82B | 0B72 | FB81 | 0200 | 0572 | E38B | 5152 |
| 0000075040 | 52CB | 3351 | E9C0 | FDAD | 14C8 | 0000 | 5657 | FF2B |
| 0000075060 | F78B | 3639 | 1A0C | 0375 | F0E9 | A100 | 1A0C | C92B |
| 0000075100 | 4E89 | 89F4 | F646 | 4E89 | 89F8 | FA46 | 0C6A | 76FF |
| 0000075120 | FFFA | F876 | 681E | 1A2C | 809A | 3C90 | 8377 | 0AC4 |
| 0000075140 | C00B | 1A74 | 8146 | FFFE | 767F | E903 | 00BD | 5EC4 |
| 0000075160 | FFF8 | F846 | 8026 | 003F | EA75 | EB47 | 900D | 5EC4 |
| 0000075200 | FFF8 | F846 | 8026 | 003F | F475 | 5E8B | 26F8 | 3F80 |
| 0000075220 | 7500 | 8DB9 | 0145 | 6A50 | 9A04 | 9474 | 774B | C483 |
| 0000075240 | 8904 | F046 | 5689 | 56F2 | 749A | 818D | 8377 | 02C4 |
| 0000075260 | 4689 | 89FC | FE56 | 468B | 0BF2 | F046 | 6D74 | C28B |
| 0000075300 | 460B | 74FC | 8B66 | F046 | 568B | A3F2 | 1C59 | 1689 |
| 0000075320 | 1C5B | 0C6A | 76FF | FFF6 | F476 | 681E | 1A2C | 809A |
| 0000075340 | 8690 | 8374 | 0AC4 | C00B | 2C74 | 468B | 8BFC | FE56 |
| 0000075360 | 5EC4 | 83F0 | F046 | 2604 | 0789 | 8926 | 0257 | 5EC4 |
| 0000075400 | FFF4 | F446 | 8A26 | C407 | FC5E | 46FF | 26FC | 0788 |
| 0000075420 | C00A | 0E74 | E8EB | 5EC4 | FFF4 | F446 | 8026 | 003F |
| 0000075440 | F475 | 5EC4 | 26F4 | 3F80 | 7500 | 5EA7 | C95F | 90CB |
| 0000075460 | 8B55 | 56EC | B857 | 7562 | D88E | C08E | 568B | BE06 |
| 0000075500 | 2210 | 3BAD | 74C2 | 4010 | 7496 | 970C | C033 | FFB9 |
| 0000075520 | F2FF | 8BAE | EBF7 | 96EB | 5E5F | E58B | CA5D | 0002 |
| 0000075540 | 8B55 | 57EC | 76FF | 0E06 | C5E8 | 0BFF | 74C0 | 921F |
| 0000075560 | FA8B | C033 | FFB9 | F2FF | F7AE | 49D1 | 8B50 | BBC4 |
| 0000075600 | 0002 | 1E53 | 5152 | 5016 | AA9A | 003C | 5B00 | 8B5F |
| 0000075620 | 5DE5 | 02CA | 0000 | 1601 | 0202 | 0203 | 1804 | 0D05 |
| 0000075640 | 0906 | 0C07 | 0C08 | 0C09 | 070A | 080B | 160C | 160D |
| 0000075660 | 020F | 0D10 | 1211 | 0212 | 0235 | 0D41 | 0243 | 0D52 |
| 0000075700 | 0D53 | 0D57 | 0B59 | 0D6C | 206D | 1C70 | 0972 | 1606 |
| 0000075720 | 0A80 | 0A81 | 0982 | 0D84 | 0BA4 | 02CE | 0BD7 | 0D00 |
| 0000075740 | 1608 | 8B52 | E8D8 | 1AA2 | 8E93 | 5AC2 | 8926 | 0247 |
| 0000075760 | 8926 | B817 | FFFF | 8B99 | 5DE5 | E8CB | 0008 | FFB8 |
| 0000076000 | 99FF | E58B | CB5D | D88B | 7FE8 | 931A | C28E | 8926 |
| 0000076020 | 0247 | BB53 | 7836 | 24B9 | 0A00 | 75E4 | 2E1B | 073A |
| 0000076040 | 1674 | 4343 | F7E2 | 133C | 0472 | 243C | 0A76 | 3C43 |
| 0000076060 | 72BC | 3C04 | 76CA | 4301 | 8A2E | 0147 | 5B98 | 8926 |
| 0000076100 | C307 | 8B55 | BBEC | 0002 | 05EB | 8B55 | 33EC | E8DB |
| 0000076120 | 1A38 | C303 | CB5D | 8B55 | 56EC | 8B57 | 0676 | 448A |
| 0000076140 | A80A | 7483 | A85F | 7540 | A85B | 7502 | 0C48 | 8801 |
| 0000076160 | 0A44 | FE8B | EF81 | 1C72 | C781 | 1E52 | 0CA8 | 0D75 |
| 0000076200 | 05F6 | 7501 | 1E08 | E856 | 014E | C483 | 8B04 | 0644 |
| 0000076220 | 0489 | 75FF | FF02 | 0874 | 3350 | 8ADB | 0B5C | 0E53 |
| 0000076240 | F5E8 | 8310 | 08C4 | C00B | 1174 | FF3D | 75FF | 801A |
| 0000076260 | 0A4C | EB20 | 800A | 0A4C | EB20 | 8009 | 0A4C | C710 |
| 0000076300 | 0444 | 0000 | FFB8 | EBFF | 8A25 | 53BF | 801A | 82E7 |
| 0000076320 | FF80 | 7582 | 8A0B | 0A7C | C7F6 | 7582 | 8003 | 200D |
| 0000076340 | 8948 | 0444 | 1CC4 | C033 | 8A26 | 4307 | 1C89 | 5E5F |
| 0000076360 | CB5D | 8B55 | 56EC | 8B57 | 0876 | 448A | A80A | 7482 |
| 0000076400 | A864 | 7540 | C760 | 0444 | 0000 | 01A8 | 0B74 | 10A8 |
| 0000076420 | 5374 | 4C8B | 8906 | 240C | 0CFE | 2402 | 88EF | 0A44 |
| 0000076440 | FE8B | EF81 | 1C72 | C781 | 1E52 | DB33 | 5C8A | A80B |
| 0000076460 | 7508 | A84B | 7504 | F618 | 0105 | 4275 | FE81 | 1C7E |
| 0000076500 | 0674 | FE81 | 1C8A | 2675 | 87F6 | 1A53 | 7440 | B91F |
| 0000076520 | 0001 | 1651 | 7E8D | 5706 | 0E53 | A3E8 | 8311 | 08C4 |

THU MAR 14 17:39:32 1991 IH.DLL PAGE 35, LINE 2007

| | | | | | | | | |
|---|---|---|---|---|---|---|---|---|
| 0000076540 | 01B9 | EB00 | B846 | FFFF | 4C80 | 200A | 65EB | 1E53 |
| 0000076560 | E856 | 0064 | C483 | 5B04 | 44F6 | 080A | D174 | 0C8B |
| 0000076600 | 548B | 2B06 | 42CA | 1489 | 558B | 4A02 | 5489 | E304 |
| 0000076620 | 5125 | FF51 | 0874 | 74FF | 5306 | E80E | 1162 | C483 |
| 0000076640 | 5908 | 7CC4 | 8B06 | 0656 | 8826 | 3B15 | 75C1 | 33B6 |
| 0000076660 | 8AC0 | 0646 | 1DEB | C033 | 87F6 | 1A53 | 7420 | B9E3 |
| 0000076700 | 0002 | 5051 | 5350 | E80E | 0F60 | C483 | 3308 | 8BC0 |
| 0000076720 | EBC8 | 5FCF | 5D5E | 00CB | 8B55 | 56EC | 768B | B804 |
| 0000076740 | 0200 | 9A50 | 8D74 | 76FB | 8B59 | 81DE | 72EB | 811C |
| 0000076760 | 52C3 | 0B1E | 74D2 | 800B | 0A4C | C708 | 0247 | 0200 |
| 0000077000 | 0EEB | 4C80 | C40A | 47C7 | 0102 | 8C00 | 8DDA | 0147 |
| 0000077020 | 5489 | 8902 | 8904 | 0854 | 4489 | C706 | 0444 | 0000 |
| 0000077040 | 5D5E | 00C3 | 04C8 | 0000 | 468B | 0B08 | 0646 | 0875 |
| 0000077060 | 006A | A7E8 | EB00 | 9031 | 468B | 2D06 | 1C72 | 0CB9 |
| 0000077100 | 9900 | F9F7 | 4689 | 50FC | 77E8 | 8316 | 02C4 | 76FF |
| 0000077120 | FF08 | 0676 | 0A9A | 4E7B | 837B | 04C4 | 4689 | FFFE |
| 0000077140 | FC76 | 69E8 | 8B16 | FE46 | CBC9 | 02C8 | 0000 | 5657 |
| 0000077160 | FF2B | 768B | 8A06 | 0A44 | C88B | 0324 | 023C | 3F75 |
| 0000077200 | C1F6 | 7508 | 8B0D | 81DE | 72EB | F61C | 5287 | 011E |
| 0000077220 | 2D74 | 048B | 442B | 8906 | FE46 | C00B | 217E | FF50 |
| 0000077240 | 0874 | 74FF | 8A06 | 0B4C | ED2A | 9A51 | 8BA0 | 7BCB |
| 0000077260 | C483 | 3908 | FE46 | 0774 | 4C80 | 200A | FFBF | 8BFF |
| 0000077300 | 0644 | 548B | 8908 | 8904 | 0254 | 44C7 | 0004 | 8B00 |
| 0000077320 | 5EC7 | C95F | 90CB | 016A | 01E8 | CB00 | 04C8 | 0000 |
| 0000077340 | 5657 | 72BE | 2B1C | 89FF | FE7E | 026A | 23E8 | 8316 |
| 0000077360 | 02C4 | 11EB | 46C7 | FFFE | FFFF | FC76 | CFE8 | 8315 |
| 0000077400 | 02C4 | C683 | 390C | 3236 | 7220 | 8B2B | 2DC6 | 1C72 |
| 0000077420 | 0CB9 | 9900 | F9F7 | 4689 | 50FC | A5E8 | 8315 | 02C4 |
| 0000077440 | 44F6 | 830A | D374 | 561E | 0A9A | 867B | 837A | 04C4 |
| 0000077460 | 7440 | 47C1 | C3EB | 026A | 01E8 | 8316 | 02C4 | 7E83 |
| 0000077500 | 0104 | 0475 | C78B | 03EB | 468B | 5EFE | C95F | 02C2 |
| 0000077520 | 9000 | 8B55 | B8EC | 01B4 | AE9A | AC76 | 577D | C656 |
| 0000077540 | B846 | 2B00 | 89C0 | E846 | 4689 | C4C6 | 0A5E | 8026 |
| 0000077560 | 003F | 0375 | 5FE9 | 2607 | 1F8A | FF2A | 87F6 | 20CF |
| 0000077600 | 7408 | FF2D | E84E | 468D | 16E8 | FF50 | 0876 | 76FF |
| 0000077620 | E806 | 07C6 | FF50 | 0876 | 76FF | E806 | 07A0 | 46FF |
| 0000077640 | C40A | 0A5E | 8A26 | 2A1F | F6FF | CF87 | 0820 | EE75 |
| 0000077660 | 5E8B | 260A | 3F80 | 7425 | E903 | 06F2 | 46C6 | 00C0 |
| 0000077700 | C02A | 4688 | 88FC | B646 | 4688 | 88F2 | F646 | 4688 |
| 0000077720 | 88EE | 5286 | 2BFE | 89C0 | EA46 | 4689 | 89BA | FE46 |
| 0000077740 | 4689 | 89C4 | C246 | 68EB | 9090 | 46FF | C40A | 0A5E |
| 0000077760 | 8A26 | 2A07 | 8BE4 | F6F8 | CF85 | 0420 | 1A74 | 46FF |
| 0000100000 | 8B8A | FE46 | C88B | E0C1 | 0302 | D1C1 | 03E0 | 2DC7 |
| 0000100020 | 0030 | 4689 | EBFE | 9039 | 6C3D | 7400 | 771C | 3C2D |
| 0000100040 | 744C | 7F13 | 2C1F | 742A | 2C15 | 741C | EB23 | 901D |
| 0000100060 | 46FE | EBFC | 901B | 46FE | FEF6 | F646 | 12EB | 46FE |
| 0000100100 | EBEE | 900D | 4E2C | 0874 | 1A2C | E474 | 86FE | FE52 |
| 0000100120 | BE80 | FE52 | 7400 | 8093 | EE7E | 7500 | C414 | 0E5E |
| 0000100140 | 4683 | 040E | 8B26 | 2607 | 578B | 8902 | F846 | 5689 |
| 0000100160 | C6FA | 5286 | 00FE | 5EC4 | 260A | 078A | 200C | E42A |
| 0000100200 | F88B | FF83 | 746E | 8329 | 63FF | 1674 | FF83 | 747B |
| 0000100220 | 8D11 | E846 | 5016 | 76FF | FF08 | 0676 | BBE8 | EB06 |
| 0000100240 | 900D | 46FF | FFE8 | 0876 | 76FF | E806 | 0662 | F0BB |
| 0000100260 | 7E83 | 00BA | 0974 | 7E83 | 00FE | 0375 | 83E9 | 8B05 |
| 0000100300 | E9C7 | 05A0 | 7E83 | 00BA | 0675 | 46FF | FFBA | FE46 |
| 0000100320 | 46C7 | 3CBC | 8C20 | BE5E | 23EB | 46C7 | 36BC | EB20 |
| 0000100340 | 90F4 | 46FF | C40A | 0A5E | 5E89 | 8CBC | BE46 | 8026 |
| 0000100360 | 5E3F | 0C75 | 478D | 8901 | BC46 | 468C | FEBE | B64E |
| 0000100400 | 206A | 006A | 468D | 16C8 | 9A50 | 9500 | 7AF7 | C483 |

THU MAR 14 17:39:32 1991 IH.DLL PAGE 36, LINE 2066

| | | | | | | | | |
|---|---|---|---|---|---|---|---|---|
| 0000100420 | 8308 | 7BFF | 0374 | A9E9 | C400 | BC5E | 8026 | 5D3F |
| 0000100440 | 0374 | 9DE9 | C600 | C046 | FF5D | BC46 | 46C6 | 20D3 |
| 0000100460 | 8FE9 | 9000 | 8A26 | 8807 | F446 | 46FF | 3CBC | 752D |
| 0000100500 | 800F | C07E | 7400 | 8B09 | BC5E | 8026 | 5D3F | 1E75 |
| 0000100520 | 5E8A | 88F4 | C05E | 01B0 | CB8A | E180 | C007 | 03EB |
| 0000100540 | FF2A | 568D | 03C8 | D2DA | 36E0 | 0708 | 54EB | 46FF |
| 0000100560 | 26BC | 078A | 4688 | 3AF4 | C046 | 0676 | 4688 | EBF0 |
| 0000100600 | 900D | 468A | 88C0 | F046 | 468A | 88F4 | C046 | 468A |
| 0000100620 | 88C0 | F446 | 1CEB | 5E8A | B0F4 | 8A01 | 80CB | 07E1 |
| 0000100640 | EBC0 | 2A03 | 8DFF | C856 | DA03 | E0D2 | 0836 | FE07 |
| 0000100660 | F446 | 468A | 98F0 | 4E8A | 2AF4 | 3BED | 7DC1 | 88D7 |
| 0000100700 | C06E | 5EC4 | 26BC | 3F80 | 745D | E903 | FF66 | 8026 |
| 0000100720 | 003F | 0375 | FFE9 | 8304 | 7BFF | 0A75 | C38B | C28C |
| 0000100740 | 4689 | 890A | 0C56 | 468B | 8BF8 | FA56 | 8689 | FE54 |
| 0000100760 | 9689 | FE56 | 7E83 | 00BA | 0A74 | 468B | FFFE | FE4E |
| 0000101000 | C00B | 4E74 | FE83 | 74FF | 8B49 | C1DE | 03FB | 468D |
| 0000101020 | 03C8 | 36D8 | 078A | 4632 | 98B6 | 01BA | 8B00 | 8BCE |
| 0000101040 | 80D9 | 07E1 | E2D3 | C285 | 2874 | 7E80 | 00EE | 0E75 |
| 0000101060 | C68B | 5EC4 | FFF8 | F846 | 8826 | EB07 | 9005 | 86FF |
| 0000101100 | FE54 | 46FF | FFE8 | 0876 | 76FF | E806 | 04C2 | F08B |
| 0000101120 | A2EB | 4EFF | 56E8 | 76FF | FF08 | 0676 | DFE8 | 8B04 |
| 0000101140 | F846 | 568B | 39FA | 5486 | 75FE | 3909 | 5696 | 75FE |
| 0000101160 | E903 | 0462 | 7E80 | 00EE | 0374 | 29E9 | FF04 | C646 |
| 0000101200 | FF83 | 7563 | E903 | 041E | C28E | D88B | C626 | 0007 |
| 0000101220 | 13E9 | 9004 | 64BF | 8300 | 2DFE | 0675 | 46FE | EBF2 |
| 0000101240 | 9006 | FE83 | 752B | FF1F | FE4E | 0C75 | 7E83 | 00BA |
| 0000101260 | 0674 | 86FE | FE52 | 0EEB | 46FF | FFE8 | 0876 | 76FF |
| 0000101300 | E806 | 044C | F08B | FE83 | 7430 | E903 | 0155 | 46FF |
| 0000101320 | FFE8 | 0876 | 76FF | E806 | 0436 | F08B | 783C | 0474 |
| 0000101340 | 583C | 1475 | 46FF | FFE8 | 0876 | 76FF | E806 | 0420 |
| 0000101360 | F08B | 78BF | E900 | 012B | 46FF | 83EA | 78FF | 0674 |
| 0000101400 | 6FBF | E900 | 011D | 4EFF | 56E8 | 76FF | FF08 | 0676 |
| 0000101420 | 2BE8 | BE04 | 0030 | 0AE9 | 9001 | 7E80 | 00FC | 0675 |
| 0000101440 | 46FE | BFF6 | 0046 | FE83 | 752D | FE05 | F246 | 08EB |
| 0000101460 | FE83 | 742B | E903 | 00EB | 4EFF | 74FE | E903 | 0095 |
| 0000101500 | 7E83 | 00BA | 0375 | 8CE9 | FE00 | 5286 | E9FE | 00D3 |
| 0000101520 | FF83 | 7478 | 830D | 70FF | 0874 | FF83 | 7446 | E903 |
| 0000101540 | 0084 | 84F6 | 20CF | 7480 | 6A15 | 8D04 | C246 | 5016 |
| 0000101560 | 789A | A195 | 5680 | 79E8 | 8B03 | EBF0 | 9036 | FF83 |
| 0000101600 | 7546 | 832C | EA7E | 7400 | 8326 | 3AFE | 1C75 | 468B |
| 0000101620 | 89C2 | EC46 | C02B | 4689 | 89C4 | C246 | 46C7 | FFEA |
| 0000101640 | BFFF | 0070 | 30BE | EB00 | 900A | 46C7 | 00EA | FE00 |
| 0000101660 | 5286 | 80FE | 52BE | 00FE | 5C75 | 46FF | 8DEA | D044 |
| 0000101700 | 0199 | C246 | 5611 | 83C4 | BA7E | 7400 | FF08 | FE4E |
| 0000101720 | 0375 | 74E9 | FFFF | E846 | 76FF | FF08 | 0676 | 2FE8 |
| 0000101740 | 8B03 | EBF0 | 903E | 84F6 | 20CF | 7404 | 83C2 | 6FFF |
| 0000101760 | 1475 | FE83 | 7D38 | 6AB8 | 8D03 | C246 | 5016 | 789A |
| 0000102000 | B295 | EB80 | 90AE | 006A | 0A6A | 468D | 16C2 | 9A50 |
| 0000102020 | 9556 | 7BFB | 9DEB | 4EFF | 56E8 | 76FF | FF08 | 0676 |
| 0000102040 | 1BE8 | 8003 | 52BE | 00FE | 0375 | 23E9 | 83FF | 70FF |
| 0000102060 | 0F75 | 7E80 | 00F6 | 0974 | 468B | 8BEC | C24E | 4689 |
| 0000102100 | 80C4 | F27E | 7400 | F70A | C25E | 5683 | 00C4 | 5EF7 |
| 0000102120 | 83C4 | 46FF | 0575 | 46C7 | 00EA | 8300 | EA7E | 7500 |
| 0000102140 | E903 | 0272 | 7E80 | 00EE | 0374 | 39E9 | FF02 | C646 |
| 0000102160 | 7E80 | 00F6 | 1474 | 468B | 8BC2 | C456 | 5EC4 | 26F8 |
| 0000102200 | 0789 | 8926 | 0257 | 1DE9 | 9002 | 468B | C4C2 | F85E |
| 0000102220 | 8926 | E907 | 0210 | 468B | 99E8 | 4689 | 89C2 | C456 |
| 0000102240 | CEEB | 868D | FE58 | 4689 | 8CBC | BE56 | FE83 | 752D |
| 0000102260 | 8B13 | 36D8 | 07C6 | 8D2D | 5986 | 89FE | BC46 | 568C |

THU MAR 14 17:39:32 1991 IH.DLL PAGE 37, LINE 2125

| | | | | | | | | |
|---|---|---|---|---|---|---|---|---|
| 0000102300 | EBBE | 9006 | FE83 | 752B | FF11 | FE4E | 46FF | FFE8 |
| 0000102320 | 0876 | 76FF | E806 | 0238 | F08B | 7E83 | 00BA | 0774 |
| 0000102340 | 7E81 | 5DFE | 7E01 | C72D | FE46 | 015D | 26EB | 468B |
| 0000102360 | FFFE | FE4E | C00B | 2374 | 46FF | 8BEA | C4C6 | BC5E |
| 0000102400 | 46FF | 26BC | 0788 | 46FF | FFE8 | 0876 | 76FF | E806 |
| 0000102420 | 01FE | F08B | 84F6 | 20CF | 7504 | 83D3 | 2EFE | 4375 |
| 0000102440 | 468B | FFFE | FE4E | C00B | 3974 | 5EC4 | FFBC | BC46 |
| 0000102460 | C626 | 2E07 | 18EB | 468B | FFFE | FE4E | C00B | 2374 |
| 0000102500 | 46FF | 8BEA | C4C6 | BC5E | 46FF | 26BC | 0788 | 46FF |
| 0000102520 | FFE8 | 0876 | 76FF | E806 | 01B6 | F08B | 84F6 | 20CF |
| 0000102540 | 7504 | 83D3 | EA7E | 7500 | E903 | 0081 | C68B | 653C |
| 0000102560 | 0474 | 453C | 7775 | 468B | FFFE | FE4E | C00B | 6D74 |
| 0000102600 | 5EC4 | FFBC | BC46 | C626 | 6507 | 46FF | FFE8 | 0876 |
| 0000102620 | 76FF | E806 | 017A | F08B | FE83 | 752D | C40F | BC5E |
| 0000102640 | 46FF | 26BC | 07C6 | EB2D | 9008 | 9090 | FE83 | 752B |
| 0000102660 | 8B35 | FE46 | 4EFF | 0BFE | 75C0 | FF1D | FE46 | 26EB |
| 0000102700 | 468B | FFFE | FE4E | C00B | 2374 | 46FF | 8BEA | C4C6 |
| 0000102720 | BC5E | 46FF | 26BC | 0788 | 46FF | FFE8 | 0876 | 76FF |
| 0000102740 | E806 | 012C | F08B | 84F6 | 20CF | 7504 | FFD3 | E84E |
| 0000102760 | FF56 | 0876 | 76FF | E806 | 0144 | 7E83 | 00EA | 0375 |
| 0000103000 | D3E9 | 8000 | EE7E | 7400 | E903 | 009A | 46FF | C4C6 |
| 0000103020 | BC5E | C626 | 0007 | 868D | FE58 | 5016 | 76FF | FFFA |
| 0000103040 | F876 | 468A | 98F6 | 8E50 | 0606 | 2622 | 1EFF | 20B8 |
| 0000103060 | C483 | EB0A | 9071 | 5EC4 | 260A | 078A | E42A | C63B |
| 0000103100 | 1274 | 4EFF | 56E8 | 76FF | FF08 | 0676 | EFE8 | E900 |
| 0000103120 | 0084 | 9090 | 4EFE | 80B8 | EE7E | 7500 | 8349 | 0E6E |
| 0000103140 | EB04 | 9043 | 632D | 3D00 | 0018 | CA77 | E0D1 | 2E93 |
| 0000103160 | A7FF | 8314 | 7D64 | 7FC6 | 8142 | 8142 | 8142 | 82D6 |
| 0000103200 | 7F34 | 82D6 | 82D6 | 82D6 | 82D6 | 8136 | 7FC6 | 7FBA |
| 0000103220 | 82D6 | 82D6 | 7D7A | 82D6 | 7FC6 | 82D6 | 82D6 | 7F37 |
| 0000103240 | 82D6 | 82D6 | 7D82 | 46FE | FFB8 | 0A46 | 20EB | 46FF |
| 0000103260 | FFE8 | 0876 | 76FF | E806 | 0056 | F08B | 5EC4 | FF0A |
| 0000103300 | 0A46 | 8A26 | 2A07 | 3BE4 | 74F0 | E903 | FF74 | FE83 |
| 0000103320 | 74FF | E903 | F895 | FE83 | 75FF | 830C | C67E | 7500 |
| 0000103340 | 8006 | B87E | 7400 | 8B05 | C646 | 02EB | C68B | 5F5E |
| 0000103360 | CBC9 | 8B55 | 8BEC | 045E | 87F6 | 20CF | 7404 | 8B05 |
| 0000103400 | EBC3 | 9008 | C38B | DF24 | 072D | C900 | 02C2 | 9000 |
| 0000103420 | 04C8 | 000C | 5EC4 | 2604 | 4FFF | 7804 | 2615 | 078B |
| 0000103440 | 8B26 | 0257 | FF26 | 8B07 | 8ED8 | 26C2 | 078A | E42A |
| 0000103460 | 07EB | 5306 | F69A | F378 | C983 | 04C2 | 9000 | 8B55 |
| 0000103500 | 83EC | 087E | 74FF | FF0E | 0676 | 76FF | FF04 | 0876 |
| 0000103520 | 569A | 1389 | C980 | 06C2 | 9000 | 8B55 | 56EC | 5EC4 |
| 0000103540 | 2608 | 07FF | 76FF | FF06 | 0476 | A3E8 | 8BFF | F6F0 |
| 0000103560 | CF84 | 0820 | E875 | C95E | 08C2 | 9000 | 8484 | 848F |
| 0000103600 | 84A5 | 84D9 | 8505 | 850D | 8536 | 8568 | 8B55 | B8EC |
| 0000103620 | 0171 | E80E | F278 | 5756 | C033 | 4689 | 88F8 | FB46 |
| 0000103640 | 76C4 | 260A | 89AC | 0A76 | 4688 | 0AFE | 74C0 | 8306 |
| 0000103660 | F87E | 7D00 | 8B06 | F846 | B5E9 | BB04 | 203E | 202C |
| 0000103700 | 583C | 0577 | 24D7 | EB0F | B002 | B100 | D203 | 02E0 |
| 0000103720 | FB46 | FED7 | D2C1 | 88E8 | FB46 | 8B98 | D1D8 | 2EE3 |
| 0000103740 | A7FF | 841C | 568A | B9FE | 0001 | 36E8 | EB04 | 33B1 |
| 0000103760 | 89C0 | F046 | 4689 | 89F6 | EE46 | 46C7 | 20FC | 4800 |
| 0000104000 | 4689 | EBF4 | 8A9B | FE46 | 2D3C | 0675 | 4E80 | 04FC |
| 0000104020 | 8EEB | 2B3C | 0675 | 4E80 | 01FC | 84EB | 203C | 0775 |
| 0000104040 | 4E80 | 02FC | 79E9 | 3CFF | 7523 | 8007 | FC4E | E980 |
| 0000104060 | FF6E | 4E80 | 08FC | 67E9 | 8AFF | FE4E | F980 | 752A |
| 0000104100 | E80F | 035C | C00B | 1779 | D8F7 | 4E80 | 04FC | 0FEB |
| 0000104120 | E980 | 3230 | 8BED | F646 | 0ABB | F700 | 03E3 | 89C1 |
| 0000104140 | F646 | 3BE9 | C7FF | F446 | 0000 | 33E9 | 8AFF | FE4E |

THU MAR 14 17:39:32 1991 IH.DLL PAGE 38, LINE 2184

| | | | | | | | | |
|---|---|---|---|---|---|---|---|---|
| 0000104160 | F980 | 752A | E80C | 0328 | C00B | 1479 | FFB8 | EBFF |
| 0000104200 | 800F | 30E9 | ED32 | 468B | BBF4 | 000A | E3F7 | C103 |
| 0000104220 | 4689 | E9F4 | FFDA | 468A | 3CFE | 756C | 8006 | FC4E |
| 0000104240 | EB10 | 3C22 | 7546 | 8006 | FC4E | EB20 | 3C18 | 754E |
| 0000104260 | 8006 | FD4E | EB10 | 3C0E | 754C | 8006 | FD4E | EB04 |
| 0000104300 | 8004 | FD4E | E908 | FED8 | 468A | 3CFE | 7564 | E903 |
| 0000104320 | 0194 | 693C | 0375 | 8DE9 | 3C01 | 7575 | E903 | 018A |
| 0000104340 | 583C | 0375 | 89E9 | 3C01 | 7578 | E903 | 0188 | 6F3C |
| 0000104360 | 0375 | A2E9 | 3C01 | 7463 | 3C1A | 7473 | 3C27 | 746E |
| 0000104400 | 3C51 | 7470 | 3C60 | 7445 | 3C07 | 7447 | E903 | 00BB |
| 0000104420 | B5E9 | E800 | 028A | BE8D | FE8F | 0716 | 4FAA | 01B9 |
| 0000104440 | E900 | 01F1 | 90E8 | 0B02 | 75FF | 8C12 | 0BC0 | 75C0 |
| 0000104460 | 1E0C | BF07 | 2097 | 0E8B | 209D | D8E9 | 5701 | 4E8B |
| 0000104500 | E3F4 | 3207 | F2C0 | 75AE | 4F01 | 2B59 | 87F9 | E9CF |
| 0000104520 | 01C3 | 62E8 | 8B02 | F846 | F6AB | FC46 | 7410 | 3303 |
| 0000104540 | ABC0 | 3BE9 | F6FE | FC46 | 7530 | E805 | 0232 | 39EB |
| 0000104560 | 36E8 | F602 | FD46 | 7518 | C630 | FF46 | B907 | 0010 |
| 0000104600 | 0716 | 3352 | 8DD2 | 97BE | BEFE | 0004 | B0E8 | B902 |
| 0000104620 | 0010 | BE8D | FE92 | 3358 | BED2 | 0004 | A0E8 | C602 |
| 0000104640 | 9386 | 3AFE | 09B9 | EB00 | C618 | FF46 | B907 | 0010 |
| 0000104660 | 0716 | D233 | BE8D | FE92 | 04BE | E800 | 0281 | 04B9 |
| 0000104700 | 8D00 | 8FBE | E9FE | 014D | 46FF | 80EE | FC4E | 8A40 |
| 0000104720 | FE46 | 200C | 8B98 | 83F0 | F47E | 7F00 | 7413 | C707 |
| 0000104740 | F446 | 0006 | 0AEB | 673D | 7500 | C705 | F446 | 0001 |
| 0000104760 | BE8D | FE8F | 76FF | FFEE | F476 | 1656 | FF57 | 1076 |
| 0000105000 | 76FF | F60E | FD46 | 7404 | FF0A | C41E | 8320 | 0E46 |
| 0000105020 | EB0A | FF08 | B01E | 8320 | 0E46 | 8308 | 0EC4 | 46F6 |
| 0000105040 | 80FC | 0F74 | 7E83 | 00F4 | 0975 | 5716 | 1EFF | 20BC |
| 0000105060 | C483 | 8304 | 67FE | 1075 | 46F7 | 80FC | 7500 | 1609 |
| 0000105100 | FF57 | B41E | 8320 | 04C4 | 0716 | 8026 | 2D3D | 0575 |
| 0000105120 | 8047 | FD4E | B901 | FFFF | B057 | F200 | 4FAE | 2B59 |
| 0000105140 | 87F9 | E9CF | 00AF | 4E80 | 40FC | 46C6 | 0AFA | 35EB |
| 0000105160 | 46C6 | 07FF | 04EB | 46C6 | 27FF | 46F6 | 80FC | 1174 |
| 0000105200 | 46C7 | 02F0 | C600 | F246 | B230 | 0251 | FF56 | 5688 |
| 0000105220 | C6F3 | FA46 | EB10 | F60E | FC46 | 7480 | 8004 | FD4E |
| 0000105240 | C602 | FA46 | F608 | FC46 | 7410 | E805 | 00FB | 0EEB |
| 0000105260 | EDE8 | F600 | FC46 | 7440 | 9903 | 02EB | D233 | 46F6 |
| 0000105300 | 40FC | 0F74 | D20B | 0B7D | 4E80 | 01FD | D8F7 | D285 |
| 0000105320 | F700 | 83DA | F47E | 7D00 | C707 | F446 | 0001 | 04EB |
| 0000105340 | 6680 | F7FC | D88B | DA0B | 0575 | 46C7 | 00F0 | 8D00 |
| 0000105360 | EB7E | 0716 | 4E8A | 32FA | 8BED | F476 | 40E8 | F601 |
| 0000105400 | FD46 | 7402 | E30E | 2606 | 3D80 | 7430 | 4F06 | C626 |
| 0000105420 | 3005 | EB41 | F600 | FC46 | 7440 | F631 | FD46 | 7401 |
| 0000105440 | C60B | F246 | C72D | F046 | 0001 | 20EB | 46F6 | 01FC |
| 0000105460 | 0B74 | 46C6 | 2BF2 | 46C7 | 01F0 | EB00 | F60F | FC46 |
| 0000105500 | 7402 | C609 | F246 | C720 | F046 | 0001 | 468B | 2BF6 |
| 0000105520 | 2BC1 | F046 | 027D | C033 | 5706 | F651 | FC46 | 750C |
| 0000105540 | 8B07 | B2C8 | E820 | 00BB | 1650 | 8D07 | F27E | 4E8B |
| 0000105560 | E8F0 | 0091 | F658 | FC46 | 7408 | F60D | FC46 | 7504 |
| 0000105600 | 8B07 | B2C8 | E830 | 009B | 5F59 | 5007 | 76E8 | 5800 |
| 0000105620 | 46F6 | 04FC | ^774 | C88B | 20B2 | 86E8 | E900 | FC00 |
| 0000105640 | 76C4 | 260E | 89AD | 0E76 | C4C3 | 0E76 | AD26 | D08B |
| 0000105660 | AD26 | 8992 | 0E76 | F6C3 | FC46 | 7420 | E808 | FFE9 |
| 0000105700 | C28E | F88B | E8C3 | FFD8 | F88B | C00B | 0375 | C08E |
| 0000105720 | 1EC3 | C307 | 0698 | C457 | 065E | FF26 | 044F | 1078 |
| 0000105740 | 8B26 | 263F | 07FF | 8E26 | 0247 | 33AA | 5FC0 | C307 |
| 0000105760 | 5251 | 5306 | 0E50 | F9E8 | 83F0 | 06C4 | 595A | FF3D |
| 0000106000 | 75FF | EBE8 | E3E8 | 8B1B | 01F7 | F84E | 3357 | 26FF |
| 0000106020 | E8AC | FFC0 | F80B | F7E2 | FF0B | 745F | C705 | F846 |

THU MAR 14 17:39:32 1991 IH.DLL PAGE 39, LINE 2243

| | | | | | | | | |
|---|---|---|---|---|---|---|---|---|
| 0000106040 | FFFF | E3C3 | 0119 | F84E | 3357 | 8AFF | E8C2 | FFA4 |
| 0000106060 | F80B | F7E2 | FF0B | 745F | C705 | F846 | FFFF | FDC3 |
| 0000106100 | 9357 | F60B | 0A7F | DB0B | 0675 | D20B | 0275 | 1AEB |
| 0000106120 | 3392 | F7D2 | 93F1 | F1F7 | 8792 | 04D3 | 3C30 | 7639 |
| 0000106140 | 0203 | FF46 | 8BAA | 4EC2 | D8EB | 2B59 | 47CF | C3FC |
| 0000106160 | 5E5F | E58B | CB5D | 04C8 | 0000 | 8B56 | 0676 | 468B |
| 0000106200 | 2D08 | 1C72 | 0CB9 | 9900 | F9F7 | 4689 | 50FE | 31E8 |
| 0000106220 | 8308 | 02C4 | 76FF | FF0A | 0876 | 9A56 | 8956 | 83D7 |
| 0000106240 | C483 | 8906 | FC46 | 76FF | E8FE | 0822 | C483 | 8B02 |
| 0000106260 | FC46 | C95E | 90CB | 8B55 | 57EC | 8B56 | 0676 | 7E8B |
| 0000106300 | 8308 | FFFE | 1274 | 45F6 | 010A | 1275 | 45F6 | 800A |
| 0000106320 | 0674 | 45F6 | 020A | 0674 | FFB8 | EBFF | 903E | 458B |
| 0000106340 | 0B08 | 0645 | 0875 | 571E | EDE8 | 83F0 | 04C4 | 058B |
| 0000106360 | 558B | 3902 | 0645 | 0D75 | 5539 | 7508 | 8308 | 047D |
| 0000106400 | 7500 | FFD5 | FF05 | 0445 | C68B | 0DFF | 1DC4 | 8826 |
| 0000106420 | 8007 | 0A65 | 80EF | 0A4D | 2A01 | 5EE4 | C95F | 90CB |
| 0000106440 | 8B55 | 83EC | 02EC | C033 | 09EB | 8B55 | 83EC | 02EC |
| 0000106460 | FFB8 | 89FF | FE46 | 5E8B | 3B06 | 511E | 721A | BA19 |
| 0000106500 | 0009 | C033 | 9BE9 | 8BEE | FE4E | C90B | 0774 | E853 |
| 0000106520 | 0794 | C483 | E902 | EEA3 | C00B | 0774 | E853 | 077A |
| 0000106540 | C483 | 8302 | 04EC | CC8B | FF53 | 0A76 | 76FF | FF08 |
| 0000106560 | 0C76 | 5116 | FF9A | 00FF | 5900 | 855A | 75C0 | 80C8 |
| 0000106600 | 53A7 | FD1A | 468B | 0BFE | 74C0 | 5307 | 57E8 | 8307 |
| 0000106620 | 02C4 | 8B91 | 5DE5 | 00CB | 8B55 | 83EC | 08EC | C033 |
| 0000106640 | 5E8B | 3B06 | 511E | 731A | 534D | 2DE8 | 8307 | 02C4 |
| 0000106660 | 4E8B | E30C | F647 | 5387 | 021A | 4075 | 3357 | 8BD2 |
| 0000106700 | 0C4E | 7EC4 | F608 | 5387 | 081A | 1074 | 878A | 1B53 |
| 0000106720 | 0A3C | 0874 | 42AA | C649 | 5387 | 0A1B | 0653 | 5157 |
| 0000106740 | 468D | 16FA | 9A50 | FFFF | 0000 | 0B5F | 74C0 | 530F |
| 0000106760 | F3E8 | 8306 | 02C4 | 09BA | E900 | EDE6 | 4AEB | 468B |
| 0000107000 | 03FA | F6C2 | 5387 | 801A | 3E74 | A780 | 1A53 | 56FB |
| 0000107020 | 1E57 | C507 | 0876 | FE8B | C88B | 28E3 | 0DB4 | 3C80 |
| 0000107040 | 750A | 2606 | 8F80 | 1A53 | AC04 | C43A | 2574 | 1A3C |
| 0000107060 | 0875 | 8026 | 538F | 021A | 05EB | 0588 | E247 | 8BEA |
| 0000107100 | 2BC7 | 0846 | 1F06 | 5E5F | E853 | 069A | C483 | 8B02 |
| 0000107120 | 5DE5 | 83CB | 01F9 | 0774 | 3C80 | 740A | EBE0 | 26DB |
| 0000107140 | 87F6 | 1A53 | 7440 | 0B2B | 75DB | 5323 | 468D | 16F9 |
| 0000107160 | 5150 | 468D | 16FA | 9A50 | 8A86 | 0000 | C085 | 0E74 |
| 0000107200 | 1F06 | 5E5F | E853 | 065E | C483 | E902 | ED6D | 0AB0 |
| 0000107220 | A8EB | 46C6 | 00F9 | 8D53 | F946 | 5016 | 8D51 | FA46 |
| 0000107240 | 5016 | 189A | 008B | 0B00 | 75C0 | F7D5 | FA46 | FFFF |
| 0000107260 | 3674 | 7E83 | 010C | 3574 | F626 | 5387 | 081A | 1C75 |
| 0000107300 | B853 | FFFF | 5050 | D8F7 | 8D50 | FC46 | 5016 | 159A |
| 0000107320 | 008A | 8000 | F97E | 750A | E90F | FF61 | 468A | 26F9 |
| 0000107340 | 8788 | 1B53 | 0A3C | 0274 | 0DB0 | 4DE9 | 80FF | F97E |
| 0000107360 | 750A | EBC5 | 0099 | 8B55 | 83EC | 0EEC | C033 | 09EB |
| 0000107400 | 8B55 | 83EC | 0EEC | FFB8 | 89FF | F246 | 5E8B | 3B06 |
| 0000107420 | 511E | 721A | BA08 | 0009 | C033 | C5E9 | 0BEC | 74C0 |
| 0000107440 | 5307 | B5E8 | 8305 | 02C4 | 87F6 | 1A53 | 7420 | 5312 |
| 0000107460 | C933 | 5151 | 4141 | 8D51 | F446 | 5016 | 6F9A | 008B |
| 0000107500 | F600 | 5387 | 801A | 6674 | 5E8C | 8EFA | 0A46 | 56C5 |
| 0000107520 | 3308 | 89C0 | FE46 | 4689 | FCFC | 5657 | FA8B | F28B |
| 0000107540 | 6689 | 8BF8 | 0C4E | 28E3 | 0AB0 | AEF2 | 3B75 | EC83 |
| 0000107560 | 8B02 | BADC | 0080 | E22B | D48B | FA8B | 0716 | 4E8B |
| 0000107600 | AC0C | 0A3C | 0D74 | FB3B | 1A74 | E2AA | E8F4 | 0038 |
| 0000107620 | AFE9 | B000 | 3B0D | 75FB | E803 | 002C | B0AA | FF0A |
| 0000107640 | FC46 | E2EB | 21E8 | EB00 | 5EE1 | 8E5F | FA5E | C8E9 |
| 0000107660 | 8B00 | F246 | C00B | 0974 | 76FF | E806 | 0528 | C483 |
| 0000107700 | B802 | FFFC | E80E | EA46 | 5350 | 1E51 | 1F06 | CF8B |

THU MAR 14 17:39:32 1991 IH.DLL PAGE 40, LINE 2302

| | | | | | | | | |
|---|---|---|---|---|---|---|---|---|
| 0000107720 | CA2B | 21E3 | 8B51 | 065E | 1E53 | 5152 | 468D | 16F4 |
| 0000107740 | 9A50 | 7829 | 0000 | 0B59 | 75C0 | 8B11 | F45E | 5E01 |
| 0000107760 | 3BFE | 72D9 | 1F07 | 5B59 | 8B58 | C3FA | 831F | 08C4 |
| 0000110000 | 7E83 | 00FE | 3C75 | C00B | 1874 | 6D3D | 7400 | 3D0D |
| 0000110020 | 0001 | 09BA | 7500 | BA08 | 001C | 03EB | 20BA | F900 |
| 0000110040 | 26EB | 5E8E | F6FA | 5387 | 401A | 0E74 | 5E8E | 8B0A |
| 0000110060 | 085E | 3F80 | 751A | F803 | 0EEB | 1CBA | 3300 | F9C0 |
| 0000110100 | 06EB | 468B | 2BFE | FC46 | 668B | 5EF8 | 8E5F | FA5E |
| 0000110120 | 1472 | 5E8B | 0BF2 | 74DB | FF09 | 0676 | 87E8 | 8304 |
| 0000110140 | 02C4 | E58B | CB5D | 5E8B | 0BF2 | 74DB | FF09 | 0676 |
| 0000110160 | 73E8 | 8304 | 02C4 | 69E9 | 8BEB | 0C4E | C90B | 0475 |
| 0000110200 | C18B | CEEB | C51E | 0856 | 1E53 | 5152 | 468D | 16F4 |
| 0000110220 | 9A50 | 8C82 | 0000 | 071E | 0B1F | 74C0 | 3D17 | 006D |
| 0000110240 | 0D74 | 013D | BA00 | 0009 | BC75 | 1CBA | EB00 | BAB7 |
| 0000110260 | 0020 | B2EB | 468B | 0BF4 | 75C0 | F697 | 5387 | 401A |
| 0000110300 | 0A74 | DA8B | 8026 | 1A3F | 0275 | 86EB | 1CBA | 3300 |
| 0000110320 | EBC0 | 0093 | 9BEA | 3E8D | EA89 | 8DBA | 8D77 | 88EA |
| 0000110340 | 7C8D | EA8D | 8D88 | 8D81 | 8B55 | 56EC | 76C4 | 8C06 |
| 0000110360 | E3C1 | 2605 | 4C80 | 01FE | 5D5E | 55CB | EC8B | 096A |
| 0000110400 | 0FE8 | 8304 | 02C4 | 76FF | 0E06 | 0DE8 | 5B00 | 096A |
| 0000110420 | 29E8 | 8304 | 02C4 | E58B | CB5D | 8B55 | 56EC | 8B57 |
| 0000110440 | 064E | F983 | 77E8 | 1E69 | A2A1 | 0B20 | 74C0 | BF48 |
| 0000110460 | 8EA2 | 368B | 20AA | 1EC5 | 20A4 | 561E | FF57 | 5FD7 |
| 0000110500 | 735E | 8C2B | C5DA | 0C5F | D63B | EF75 | 1F58 | C41E |
| 0000110520 | A436 | 2620 | 748B | C512 | A01E | 8C20 | 3BDA | 75D0 |
| 0000110540 | 1FD9 | 811E | 1EFF | 748F | BF0E | 8F1E | C4EB | 815E |
| 0000110560 | A2FF | 748E | EB0F | 070A | BF06 | 20A0 | E1E8 | 7201 |
| 0000110600 | E80E | 007E | 891F | A616 | 8920 | A41E | EB20 | 1F04 |
| 0000110620 | C033 | 5F99 | 5D5E | 00CB | 5706 | F88B | FB03 | 7F89 |
| 0000110640 | 4F04 | 2D4F | 0016 | 778D | C714 | FE05 | 89FF | 0A7F |
| 0000110660 | 8948 | 8C04 | 8B1F | 8CC6 | 8EDA | 8DC2 | 067F | ABFC |
| 0000110700 | 47AB | 3347 | ABCD | ABAB | 5FAB | C307 | 8B26 | 0245 |
| 0000110720 | C00B | 0975 | 8C26 | 025D | 8926 | EB1D | 0614 | C426 |
| 0000110740 | 0875 | 8C26 | 0E5C | 8926 | 0C5C | 478C | 8912 | 1077 |
| 0000110760 | 2607 | 5D8C | 260A | 5D89 | 2608 | 5D8C | 2606 | 5D89 |
| 0000111000 | C304 | 8041 | FEE1 | FC53 | 778B | 8B08 | 0A5F | FF33 |
| 0000111020 | 23EB | C38B | A85B | 7501 | 5342 | 778B | 8B06 | 085F |
| 0000111040 | DE3B | 3674 | 334B | EBFF | 900C | 548D | 3BFE | 73D3 |
| 0000111060 | 03E1 | 72F0 | AD23 | 01A8 | F074 | FE8B | 3B48 | 73C1 |
| 0000111100 | 0323 | 72F0 | 8B13 | ADD0 | 01A8 | DE74 | C203 | 0205 |
| 0000111120 | 8B00 | 89F7 | FE44 | E4EB | C08B | 8B5B | 0647 | 4789 |
| 0000111140 | F908 | 19EB | 895B | FE4C | 0974 | F903 | C12B | 8948 |
| 0000111160 | 2B05 | 03F9 | 89F9 | 087F | C68B | DA8C | C3F8 | 5751 |
| 0000111200 | 47F6 | 0102 | 6674 | B7E8 | 8B00 | 8BFE | A804 | 7401 |
| 0000111220 | 2B03 | 49C8 | 4141 | 778B | 0B04 | 74F6 | 034F | 73CE |
| 0000111240 | 3309 | BAC0 | FFF0 | 33E3 | 42EB | D6B8 | 8E77 | 26C0 |
| 0000111260 | AEA1 | 3D20 | 2000 | 1674 | 00BA | 3B80 | 72D0 | D106 |
| 0000111300 | 75EA | EBF8 | 8322 | 08FA | 1D72 | E2D1 | C28B | 8B48 |
| 0000111320 | 03D0 | 73C1 | 3302 | F7C0 | 23D2 | 52C2 | 2EE8 | 5A00 |
| 0000111340 | 0D73 | FA83 | 74F0 | B805 | 0010 | E2EB | EBF9 | 8B1B |
| 0000111360 | 2BD0 | 0457 | 4789 | 8904 | 087F | 778B | 4A0A | 1489 |
| 0000111400 | 0342 | C7F2 | FE04 | 89FF | 0A77 | 595F | 8BC3 | F6D0 |
| 0000111420 | 0247 | 7404 | 4A0F | 778B | 4E04 | D63B | 0572 | 5739 |
| 0000111440 | 73FE | 4218 | 1E50 | 2D9A | 0074 | 0B00 | 75C0 | 8B0F |
| 0000111460 | F6C2 | 0247 | 7404 | 4A04 | 5789 | F8FE | 01EB | C3F9 |
| 0000111500 | 8B57 | 0877 | 773B | 750A | 8B03 | 0677 | 3DAD | FFFE |
| 0000111520 | 0874 | FE8B | FE24 | F003 | F2EB | 4F4F | F78B | C35F |
| 0000111540 | D18B | C283 | 8027 | F0E2 | 8B50 | 52C4 | 5016 | C033 |
| 0000111560 | 9A50 | FFFF | 0000 | 0B1F | 75C0 | 3314 | 26DB | 458B |

THU MAR 14 17:39:32 1991 IH.DLL PAGE 41, LINE 2361

| | | | | | | | | |
|---|---|---|---|---|---|---|---|---|
| 0000111600 | 890C | 0247 | C28B | 0FE8 | E8FE | FE40 | EBF8 | F901 |
| 0000111620 | 00C3 | 8B55 | 8BEC | 8BD7 | 1EDE | 76C5 | 8B0A | 8CFE |
| 0000111640 | 8ED8 | 33C0 | B9C0 | FFFF | AEF2 | D1F7 | 7EC4 | 8B06 |
| 0000111660 | A8C7 | 7401 | A402 | D149 | F3E9 | 13A5 | F3C9 | 8BA4 |
| 0000111700 | 8BF3 | 1FFA | C28C | CB5D | 8B55 | 8BEC | C4D7 | 067E |
| 0000111720 | C033 | FFB9 | F2FF | F7AE | 49D1 | 8B91 | 5DFA | 00CB |
| 0000111740 | 8B55 | 57EC | 1E56 | 4E8B | E30E | 8B27 | C4D9 | 067E |
| 0000111760 | F78B | C033 | AEF2 | D9F7 | CB03 | FE8B | 76C5 | F30A |
| 0000112000 | 8AA6 | FF44 | C933 | 3A26 | FF45 | 0477 | 0474 | 4949 |
| 0000112020 | D1F7 | C18B | 5E1F | 8B5F | 5DE5 | 00CB | 04C8 | 0000 |
| 0000112040 | A156 | 1C59 | 168B | 1C5B | 4689 | 89FC | FE56 | 0C6A |
| 0000112060 | DFE8 | 8300 | 02C4 | 468B | 0BFE | FC46 | 7674 | 468B |
| 0000112100 | 0B08 | 0646 | 6E74 | 76FF | FF08 | 0676 | 689A | 0C90 |
| 0000112120 | 8391 | 04C4 | F08B | 5EC4 | 26FC | 478B | 2602 | 070B |
| 0000112140 | 5274 | FF26 | 0277 | FF26 | 9A37 | 9068 | 912D | C483 |
| 0000112160 | 3B04 | 7EC6 | C439 | FC5E | C426 | 261F | 3880 | 753D |
| 0000112200 | 562D | 76FF | FF08 | 0676 | 5306 | 809A | 8690 | 838D |
| 0000112220 | 0AC4 | C00B | 1875 | 0C6A | A1E8 | 8300 | 02C4 | 5EC4 |
| 0000112240 | 26FC | 078B | 8B26 | 0257 | C603 | EB40 | 9012 | 4683 |
| 0000112260 | 04FC | A2EB | 0C6A | 83E8 | 8300 | 02C4 | C02B | 5E99 |
| 0000112300 | CBC9 | 8B55 | 50EC | 468B | 0504 | 0014 | 4BEB | 8B55 |
| 0000112320 | 50EC | 468B | 0504 | 0014 | 69EB | 8B55 | 50EC | 468B |
| 0000112340 | 0504 | 0114 | 33EB | 8B55 | 50EC | 468B | 0504 | 0114 |
| 0000112360 | 51EB | 8B55 | 50EC | 468B | C104 | 02E0 | FF68 | 50FF |
| 0000112400 | FF6A | FF6A | 1E9A | 0059 | 0B00 | 75C0 | 5829 | E58B |
| 0000112420 | C35D | 8B55 | 50EC | 468B | FF04 | D006 | C121 | 02E0 |
| 0000112440 | 9D68 | 5091 | FF6A | FF6A | 639A | 0032 | 0B00 | 75C0 |
| 0000112460 | 5805 | E58B | C35D | 11B8 | E900 | E299 | 8B55 | 50EC |
| 0000112500 | 468B | C104 | 02E0 | C168 | 5091 | 3A9A | 0068 | 0B00 |
| 0000112520 | 75C0 | FFE3 | D00E | 5821 | E58B | C35D | 8B55 | FFEC |
| 0000112540 | 0676 | ADE8 | 83FF | 02C4 | E58B | CB5D | 8B55 | FFEC |
| 0000112560 | 0676 | C7E8 | 83FF | 02C4 | E58B | CB5D | 8B55 | 1EEC |
| 0000112600 | 8B07 | 0E4E | C90B | 3174 | C1F6 | 7501 | 8B2C | 0C56 |
| 0000112620 | 468B | 8B0A | 0BD8 | 75DA | 5112 | 749A | EF8D | 5990 |
| 0000112640 | D88B | DA0B | 1374 | D88B | EB43 | 0B0A | 74D2 | A80A |
| 0000112660 | 7501 | 8B06 | 03D8 | 73C1 | BA08 | 0016 | C033 | 21E9 |
| 0000112700 | 6AE6 | 8BFF | 52CC | 5653 | 0E57 | A168 | 1692 | 5251 |
| 0000112720 | 8B50 | 084E | 568B | 8B06 | 1276 | 7E8B | 9A10 | FFFF |
| 0000112740 | 0000 | 5E5F | C00B | 1374 | F65B | 01C3 | 0A74 | 534B |
| 0000112760 | 7E9A | 3D8D | 8392 | 04C4 | 00E9 | 83E6 | 04C4 | 5D58 |
| 0000113000 | 56CB | 0E57 | FD68 | 5192 | E852 | 007E | 8E93 | 26C2 |
| 0000113020 | 578B | 0B22 | 74D2 | 5015 | 0653 | 2652 | 77FF | 9A20 |
| 0000113040 | 8D7E | 9293 | C483 | 0704 | 585B | D233 | 8926 | 2617 |
| 0000113060 | 5789 | 2602 | 5789 | 2608 | 5789 | 260A | 5789 | 2620 |
| 0000113100 | 5789 | A822 | 7401 | 4809 | 8C26 | 2257 | 8926 | 2047 |
| 0000113120 | 0005 | 2602 | 4789 | 3304 | E8ED | E234 | 55CB | EC8B |
| 0000113140 | 61E8 | E8E3 | 0024 | D88B | C28E | C033 | 8926 | 2607 |
| 0000113160 | 4789 | 2602 | 4789 | 2608 | 4789 | 260A | 47C7 | 0004 |
| 0000113200 | 6A02 | 6A00 | 9A00 | 75EC | 0000 | 068E | 1A12 | A126 |
| 0000113220 | 0006 | 3B48 | D206 | 7721 | C107 | 06E0 | FFBA | C3FF |
| 0000113240 | 5357 | 6A51 | E80F | FE6A | C483 | 3B02 | D206 | 7621 |
| 0000113260 | 8B40 | 05D8 | 0004 | FC25 | 8BFF | C1C8 | 06E0 | 3DBA |
| 0000113300 | 5093 | 9A52 | 8FC7 | 0000 | C00B | 3275 | 8B49 | 87F9 |
| 0000113320 | D23E | 2B21 | 51CF | C147 | 06E7 | E1C1 | 5705 | C28E |
| 0000113340 | ABF3 | 595F | C726 | 0445 | 0200 | C783 | E240 | 8BF5 |
| 0000113360 | 6AC3 | E80F | FE46 | C483 | 5902 | 5F5B | 9BEB | 10B8 |
| 0000113400 | E900 | E0D1 | 04C8 | 0000 | 5657 | 126A | 03E8 | 83FE |
| 0000113420 | 02C4 | 06C6 | 279C | 8B42 | 0646 | 568B | A308 | 2798 |
| 0000113440 | 1689 | 279A | 92BE | 8927 | 8904 | 0254 | 06C7 | 2796 |

THU MAR 14 17:39:32 1991 IH.DLL PAGE 42, LINE 2420

| | | | | | | | | |
|---|---|---|---|---|---|---|---|---|
| 0000113460 | 7FFF | 468D | 160E | FF50 | 0C76 | 76FF | 1E0A | 9A56 |
| 0000113500 | 842C | 9405 | C483 | 8B0C | FFF8 | 960E | 7827 | C40F |
| 0000113520 | 921E | FF27 | 9206 | 2627 | 07C6 | EB0D | 900D | 561E |
| 0000113540 | 006A | 929A | C279 | 8392 | 06C4 | 126A | CDE8 | 83FD |
| 0000113560 | 02C4 | C78B | 5F5E | CBC9 | 04C8 | 0000 | 5657 | 116A |
| 0000113600 | 8FE8 | 83FD | 02C4 | 06C6 | 27A8 | 8B49 | 0646 | 568B |
| 0000113620 | A308 | 27A4 | 1689 | 27A6 | 9EBE | 8927 | 8904 | 0254 |
| 0000113640 | 5052 | 689A | 5F90 | 8394 | 04C4 | A2A3 | 8D27 | 0E46 |
| 0000113660 | 5016 | 76FF | FF0C | 0A76 | 681E | 279E | F29A | E27B |
| 0000113700 | 8393 | 0CC4 | F88B | 116A | 71E8 | 83FD | 02C4 | C78B |
| 0000113720 | 5F5E | CBC9 | 8B55 | 57EC | 468B | F706 | 0866 | 0573 |
| 0000113740 | C033 | EB99 | 501A | 749A | 458D | 5994 | D88B | DA0B |
| 0000113760 | 0D74 | 8B50 | 8EF8 | 33C2 | 41C0 | E9D1 | ABF3 | 5F58 |
| 0000114000 | CB5D | 8B55 | 8BEC | 0E4E | 571E | E356 | C548 | 0A76 |
| 0000114020 | 7EC4 | 8B06 | 48C1 | D78B | D2F7 | C22B | DB1B | C323 |
| 0000114040 | C203 | D68B | D2F7 | C22B | DB1B | C323 | C203 | 9140 |
| 0000114060 | C12B | E9D1 | A5F3 | C913 | A4F3 | E391 | 0B18 | 75F6 |
| 0000114100 | 8C07 | 05D8 | FFFF | D88E | FF0B | C775 | C08C | E405 |
| 0000114120 | 8E94 | EBC0 | 8BBE | 0646 | 568B | 5E08 | 1F5F | CB5D |
| 0000114140 | 8B55 | 8BEC | 0C4E | 38E3 | C457 | 067E | D78B | DAF7 |
| 0000114160 | 0C74 | D12B | DB1B | D323 | D103 | D187 | D12B | 468B |
| 0000114200 | 8A0A | D1E0 | F3E9 | 13AB | F3C9 | 87AA | E3D1 | 8C10 |
| 0000114220 | 81C3 | EFC3 | 8E94 | D1C3 | F3E9 | 13AB | F3C9 | 5FAA |
| 0000114240 | 468B | 8B06 | 0856 | CB5D | 8B55 | 8BEC | 0646 | 3399 |
| 0000114260 | 2BC2 | C9C2 | 90CB | 8B55 | 1EEC | C553 | 065E | 76FF |
| 0000114300 | FF0C | 0A76 | 77FF | FF02 | 0E37 | 2BE8 | 8900 | 8907 |
| 0000114320 | 0257 | 1F5B | CA5D | 0008 | 8B55 | 1EEC | C553 | 065E |
| 0000114340 | D78B | 578B | 8B02 | 0A4E | E80E | 003E | 0789 | 5789 |
| 0000114360 | 5B02 | 5D1F | 06CA | 0000 | 8B55 | 8BEC | 0846 | 4E8B |
| 0000114400 | 0B0C | 8BC8 | 0A4E | 0975 | 468B | F706 | 5DE1 | 08CA |
| 0000114420 | 5300 | E1F7 | D88B | 468B | F706 | 0C66 | D803 | 468B |
| 0000114440 | F706 | 03E1 | 5BD3 | CA5D | 0008 | ED32 | 06E3 | E0D1 |
| 0000114460 | D2D1 | FAE2 | 2FCB | 0200 | 8900 | 0194 | 0000 | 0300 |
| 0000114500 | 0902 | 0360 | 6E00 | 0500 | 8C02 | 0372 | 2800 | 0200 |
| 0000114520 | 5F00 | 0293 | 0000 | 0500 | 4600 | 015B | EA00 | 055B |
| 0000114540 | A602 | 0360 | AC00 | 0200 | E700 | 0391 | 0000 | 0300 |
| 0000114560 | 2601 | 0193 | 0500 | 0300 | 8401 | 0175 | 0700 | 0300 |
| 0000114600 | 1001 | 0174 | 0800 | 0300 | 2301 | 0250 | 0100 | 0300 |
| 0000114620 | 4301 | 018B | 8900 | 0300 | 3201 | 018D | 8A00 | 0300 |
| 0000114640 | EC01 | 0254 | 0300 | 0200 | 4B00 | 058F | 0000 | 0300 |
| 0000114660 | C901 | 0191 | 8C00 | 0500 | D000 | 0149 | 7400 | 034A |
| 0000114700 | 3601 | 0256 | 0400 | 0300 | EB01 | 0191 | 8D00 | 0300 |
| 0000114720 | B902 | 035C | 7D00 | 0500 | E402 | 0360 | 3600 | 0300 |
| 0000114740 | A501 | 0191 | 8E00 | 0300 | BC01 | 0173 | 8F00 | 0300 |
| 0000114760 | 4301 | 0252 | 0800 | 0300 | 7E01 | 0192 | 9100 | 0300 |
| 0000115000 | 8A01 | 0160 | 9500 | 0300 | FD01 | 015C | 1600 | 0300 |
| 0000115020 | 9801 | 040C | 0500 | 0300 | 7602 | 0361 | 8E00 | 0300 |
| 0000115040 | 1301 | 0153 | 2000 | 0500 | 3301 | 0195 | 8800 | 0300 |
| 0000115060 | 1201 | 0190 | 2200 | 0300 | 6401 | 0193 | 2600 | 0300 |
| 0000115100 | 2301 | 041C | 1200 | 0300 | 7602 | 0372 | 9D00 | 0200 |
| 0000115120 | E102 | 0360 | 3600 | 0300 | DD01 | 018B | 3A00 | 0300 |
| 0000115140 | 8001 | 0157 | 3B00 | 0300 | 9201 | 0151 | 4600 | 0300 |
| 0000115160 | E702 | 0360 | BA00 | 0300 | EA01 | 0174 | 4D00 | 0300 |
| 0000115200 | BF02 | 0372 | 4000 | 0300 | 6101 | 0174 | 5B00 | 0300 |
| 0000115220 | 0B01 | 0147 | 5E00 | 0300 | 6B02 | 0373 | 4F00 | 0300 |
| 0000115240 | CA02 | 0361 | 5F00 | 0500 | 6002 | 0372 | 1A00 | 0000 |
| 0000115260 | 0000 | 0000 | 0200 | 0000 | 0000 | 0000 | 0000 | 0000 |
| 0000115300 | 0000 | 0000 | 0000 | 0000 | 0000 | 0000 | 0000 | 0000 |

*

```
THU MAR 14 17:39:32 1991  IH.DLL  PAGE 43, LINE 2479

0000115360  0000  0000  0200  0000  0000  0000  0000  0000
0000115400  0000  0000  0000  0000  0000  0000  0000  0000
*
0000115460  0000  0000  0200  0000  0000  0000  0000  0000
0000115500  0000  0000  0000  0000  0000  0000  0000  0000
*
0000115560  0000  0000  0200  0000  0000  0000  0000  0000
0000115600  0000  0000  0000  0000  534D  5220  6E75  542D
0000115620  6D69  2065  694C  7262  7261  2079  202D  6F43
0000115640  7970  6972  6867  2074  6328  2029  3931  3039
0000115660  202C  694D  7263  736F  666F  2074  6F43  7072
0000115700  0018  5F69  6E69  7570  2E74  0063  6869  702E
0000115720  4700  455F  5F57  0054  5F47  5745  545F  0000
0000115740  0042  0066  004C  FFFF  5F69  6567  5F74  736D
0000115760  0067  5F47  5745  545F  4700  455F  5F57  0054
0000116000  5F69  6E69  6573  7472  695F  6370  6D5F  6773
0000116020  4700  455F  5F57  0054  5F47  5745  545F  0000
0000116040  5F69  6E69  6573  7472  615F  7070  6D5F  6773
0000116060  4700  455F  5F57  0054  5F47  5745  545F  0000
0000116100  5F69  616D  656B  6D5F  6773  4700  455F  5F57
0000116120  0054  5F47  5745  545F  0000  5F69  6573  5F74
0000116140  7270  6F69  6972  7974  4700  455F  5F57  0054
0000116160  5F47  5745  545F  0000  5F69  6573  5F74  7274
0000116200  6E61  5F73  7566  636E  0000  6969  695F  706E
0000116220  7475  632E  6900  2E68  0070  5F47  5745  545F
0000116240  4700  455F  5F57  0054  010A  012E  0115  0062
0000116260  0000  0000  0001  0000  0000  0000  0000  0002
0000116300  0003  0001  0004  0000  0000  0000  0000  0000
0000116320  0000  0070  FFFF  0000  0000  0000  0000  0000
0000116340  0000  0000  0000  0000  0000  0000  0000  0000
*
0000126200  0000  0000  0000  0000  6969  675F  7465  6D5F
0000126220  6773  505F  004D  5F47  5745  545F  4700  455F
0000126240  5F57  0054  6969  675F  7465  6D5F  6773  6E5F
0000126260  5F6F  4D50  4700  455F  5F57  0054  5F47  5745
0000126300  545F  4900  4350  5120  7320  7A69  3D65  2520
0000126320  0064  5F62  6564  7562  0067  6969  675F  7465
0000126340  695F  6370  6D5F  6773  4700  455F  5F57  0054
0000126360  5F47  5745  545F  0000  6969  675F  7465  615F
0000126400  7070  6D5F  6773  4700  455F  5F57  0054  5F47
0000126420  5745  545F  0000  6969  675F  7465  625F  7461
0000126440  6863  6D5F  6773  4700  455F  5F57  0054  5F47
0000126460  5745  545F  4900  4350  5120  7320  7A69  3D65
0000126500  2520  0064  5F62  6564  7562  0067  6146  6C69
0000126520  6465  6920  206E  693C  5F69  6E69  6573  7472
0000126540  695F  6370  6D5F  6773  2C3E  7220  3D63  2520
0000126560  0064  5F62  6564  7562  0067  6969  695F  736E
0000126600  7265  5F74  7069  5F63  736D  0067  5F47  5745
0000126620  545F  4700  455F  5F57  0054  6969  695F  736E
0000126640  7265  5F74  7069  5F63  7265  5F72  736D  0067
0000126660  5F47  5745  545F  4700  455F  5F57  0054  6969
0000126700  695F  736E  7265  5F74  7061  5F70  736D  0067
0000126720  5F47  5745  545F  4700  455F  5F57  0054  6969
0000126740  735F  7465  745F  6172  736E  665F  6E75  0063
0000126760  5F47  5745  545F  4700  455F  5F57  0054  6969
0000127000  715F  745F  6172  736E  665F  6E75  0063  5F69
0000127020  7069  2E63  0063  6869  702E  4700  455F  5F57
0000127040  0054  5F47  5745  545F  5C00  6970  6570  5F5C
0000127060  7325  312E  3332  0000  128E  12BE  1296  012A
```

THU MAR 14 17:39:32 1991 IH.DLL PAGE 44, LINE 2538

| | | | | | | | | |
|---|---|---|---|---|---|---|---|---|
| 0000127100 | 0000 | 0000 | 0000 | 0000 | 5F69 | 6E69 | 7469 | 4700 |
| 0000127120 | 455F | 5F57 | 0054 | 5F47 | 5745 | 545F | 5C00 | 6970 |
| 0000127140 | 6570 | 5F5C | 7325 | 312E | 3332 | 5C00 | 6970 | 6570 |
| 0000127160 | 5F5C | 7325 | 585F | 312E | 3332 | 0000 | 5F69 | 7263 |
| 0000127200 | 5F76 | 6E69 | 7469 | 4700 | 455F | 5F57 | 0054 | 5F47 |
| 0000127220 | 5745 | 545F | 0000 | 705C | 7069 | 5C65 | 255F | 5F64 |
| 0000127240 | 6425 | 312E | 3332 | 0000 | 5F69 | 7069 | 5F63 | 6E69 |
| 0000127260 | 7469 | 4700 | 455F | 5F57 | 0054 | 5F47 | 5745 | 545F |
| 0000127300 | 0000 | 5F69 | 6261 | 726F | 0074 | 5F47 | 5745 | 545F |
| 0000127320 | 4700 | 455F | 5F57 | 0054 | 5F69 | 6574 | 6D72 | 4700 |
| 0000127340 | 455F | 5F57 | 0054 | 5F47 | 5745 | 545F | 0000 | 5F69 |
| 0000127360 | 7069 | 5F63 | 6574 | 6D72 | 4700 | 455F | 5F57 | 0054 |
| 0000127400 | 5F47 | 5745 | 545F | 0000 | 5F69 | 7263 | 5F76 | 6574 |
| 0000127420 | 6D72 | 4700 | 455F | 5F57 | 0054 | 5F47 | 5745 | 545F |
| 0000127440 | 0000 | 5F69 | 6573 | 646E | 6D5F | 6773 | 4700 | 455F |
| 0000127460 | 5F57 | 0054 | 5F47 | 5745 | 545F | 0000 | 5F69 | 7263 |
| 0000127500 | 5F76 | 6573 | 646E | 6D5F | 6773 | 4700 | 455F | 5F57 |
| 0000127520 | 0054 | 5F47 | 5745 | 545F | 0000 | 5F69 | 6573 | 646E |
| 0000127540 | 6D5F | 6773 | 4700 | 455F | 5F57 | 0054 | 5F47 | 5745 |
| 0000127560 | 545F | 0000 | 5F69 | 6572 | 7073 | 6E6F | 5F64 | 736D |
| 0000127600 | 0067 | 5F47 | 5745 | 545F | 4700 | 455F | 5F57 | 0054 |
| 0000127620 | 5F69 | 7263 | 5F76 | 6572 | 6F63 | 6E6E | 6365 | 0074 |
| 0000127640 | 6969 | 695F | 6370 | 632E | 6900 | 2E68 | 0070 | 5F47 |
| 0000127660 | 5745 | 545F | 4700 | 455F | 5F57 | 0054 | 705C | 7069 |
| 0000127700 | 5C65 | 255F | 2E73 | 3231 | 0033 | 1420 | 1450 | 1429 |
| 0000127720 | 12BA | 5344 | 004B | 5243 | 0056 | 4D54 | 0000 | 4244 |
| 0000127740 | 0000 | FFFF | 6969 | 735F | 6E65 | 5F64 | 7473 | 7261 |
| 0000127760 | 5F74 | 736D | 0067 | 5F47 | 5745 | 545F | 4700 | 455F |
| 0000130000 | 5F57 | 0054 | 6969 | 735F | 6E65 | 5F64 | 7473 | 706F |
| 0000130020 | 6D5F | 6773 | 4700 | 455F | 5F57 | 0054 | 5F47 | 5745 |
| 0000130040 | 545F | 0000 | 6969 | 695F | 6370 | 735F | 6E65 | 5F64 |
| 0000130060 | 736D | 0067 | 5F47 | 5745 | 545F | 4700 | 455F | 5F57 |
| 0000130100 | 0054 | 6969 | 725F | 7365 | 6F70 | 646E | 6D5F | 6773 |
| 0000130120 | 4700 | 455F | 5F57 | 0054 | 5F47 | 5745 | 545F | 0000 |
| 0000130140 | 6969 | 775F | 6961 | 5F74 | 6572 | 7073 | 6E6F | 6573 |
| 0000130160 | 6900 | 746E | 6900 | 746E | 5400 | 4449 | 203D | 6425 |
| 0000130200 | 202E | 6552 | 7073 | 202E | 6154 | 6C62 | 3D65 | 2520 |
| 0000130220 | 0064 | 5F62 | 6564 | 7562 | 0067 | 6969 | 735F | 7465 |
| 0000130240 | 725F | 7365 | 6F70 | 736E | 0065 | 5F47 | 5745 | 545F |
| 0000130260 | 4700 | 455F | 5F57 | 0054 | 6969 | 635F | 656C | 7261 |
| 0000130300 | 725F | 7365 | 0070 | 5F47 | 5745 | 545F | 4700 | 455F |
| 0000130320 | 5F57 | 0054 | 6969 | 735F | 7465 | 6D5F | 6773 | 685F |
| 0000130340 | 6165 | 6564 | 0072 | 5F47 | 5745 | 545F | 4700 | 455F |
| 0000130360 | 5F57 | 0054 | 6969 | 735F | 7465 | 6D5F | 6773 | 685F |
| 0000130400 | 6165 | 6564 | 5F72 | 6E69 | 6574 | 6E72 | 6C61 | 4700 |
| 0000130420 | 455F | 5F57 | 0054 | 5F47 | 5745 | 545F | 0000 | 6969 |
| 0000130440 | 725F | 6365 | 6E6F | 656E | 7463 | 705F | 7069 | 0065 |
| 0000130460 | 5F47 | 5745 | 545F | 4700 | 455F | 5F57 | 0054 | 6969 |
| 0000130500 | 635F | 6E6F | 656E | 7463 | 775F | 6961 | 0074 | 6F63 |
| 0000130520 | 6E6E | 6365 | 0074 | 5F47 | 5745 | 545F | 4700 | 455F |
| 0000130540 | 5F57 | 0054 | 705C | 7069 | 5C65 | 255F | 5F73 | 2E58 |
| 0000130560 | 3231 | 0033 | 705C | 7069 | 5C65 | 255F | 2E73 | 3231 |
| 0000130600 | 0033 | 6969 | 695F | 696E | 5F74 | 7069 | 5F63 | 5243 |
| 0000130620 | 0056 | 5F47 | 5745 | 545F | 4700 | 455F | 5F57 | 0054 |
| 0000130640 | 6969 | 435F | 5652 | 675F | 7465 | 785F | 685F | 0070 |
| 0000130660 | 6969 | 705F | 7069 | 2E65 | 0063 | 6869 | 702E | 4700 |
| 0000130700 | 455F | 5F57 | 0054 | 5F47 | 5745 | 545F | 5400 | 3231 |
| 0000130720 | 5F33 | 4950 | 4550 | 425F | 4655 | 535F | 5A49 | 0045 |
| 0000130740 | 6425 | 7000 | 7069 | 2065 | 7562 | 5F66 | 6973 | 657A |

THU MAR 14 17:39:32 1991 IH.DLL PAGE 45, LINE 2597

| | | | | | | | | |
|---|---|---|---|---|---|---|---|---|
| 0000130760 | 203D | 6425 | 6200 | 645F | 6265 | 6775 | 0000 | 1630 |
| 0000131000 | 1684 | 163A | 144C | 6969 | 705F | 7069 | 5F65 | 616D |
| 0000131020 | 656B | 4700 | 455F | 5F57 | 0054 | 5F47 | 5745 | 545F |
| 0000131040 | 6600 | 6372 | 6620 | 6F72 | 206D | 6F44 | 4F73 | 6570 |
| 0000131060 | 3D6E | 2520 | 0064 | 5F62 | 6564 | 7562 | 0067 | 7266 |
| 0000131100 | 2063 | 7266 | 6D6F | 4420 | 736F | 6157 | 7469 | 6D4E |
| 0000131120 | 6950 | 6570 | 203D | 6425 | 6200 | 645F | 6265 | 6775 |
| 0000131140 | 6600 | 6372 | 6620 | 6F72 | 206D | 6F44 | 4F73 | 6570 |
| 0000131160 | 3D6E | 2520 | 3B64 | 7220 | 7465 | 7972 | 2320 | 6425 |
| 0000131200 | 6200 | 645F | 6265 | 6775 | 0000 | 6969 | 705F | 7069 |
| 0000131220 | 5F65 | 706F | 6E65 | 4700 | 455F | 5F57 | 0054 | 5F47 |
| 0000131240 | 5745 | 545F | 0000 | 6969 | 705F | 7069 | 5F65 | 6F63 |
| 0000131260 | 6E6E | 6365 | 0074 | 5F47 | 5745 | 545F | 4700 | 455F |
| 0000131300 | 5F57 | 0054 | 6969 | 705F | 7069 | 5F65 | 6964 | 6373 |
| 0000131320 | 6E6F | 656E | 7463 | 4700 | 455F | 5F57 | 0054 | 5F47 |
| 0000131340 | 5745 | 545F | 0000 | 6969 | 705F | 7069 | 5F65 | 6C63 |
| 0000131360 | 736F | 0065 | 5F69 | 6874 | 6472 | 632E | 6900 | 2E68 |
| 0000131400 | 0070 | 5F47 | 5745 | 545F | 4700 | 455F | 5F57 | 0054 |
| 0000131420 | 1774 | 1796 | 177D | 1680 | 0000 | 0000 | 5F69 | 7473 |
| 0000131440 | 7261 | 5F74 | 6874 | 6572 | 6461 | 0000 | 6969 | 745F |
| 0000131460 | 7268 | 2E64 | 0063 | 6869 | 702E | 4700 | 455F | 5F57 |
| 0000131500 | 0054 | 5F47 | 5745 | 545F | 0000 | 17AC | 17D0 | 17B6 |
| 0000131520 | 1792 | 0000 | 0000 | 0000 | 6969 | 735F | 6174 | 7472 |
| 0000131540 | 695F | 6370 | 745F | 7268 | 6165 | 0064 | 6E69 | 0074 |
| 0000131560 | 6E69 | 0074 | 7069 | 0063 | 2041 | 656D | 7373 | 6761 |
| 0000131600 | 2065 | 6572 | 6461 | 202E | 7069 | 5F63 | 6469 | 203D |
| 0000131620 | 6425 | 6200 | 645F | 6265 | 6775 | 5200 | 6165 | 2064 |
| 0000131640 | 7265 | 6F72 | 3A72 | 7220 | 6165 | 5F64 | 7266 | 3D63 |
| 0000131660 | 2520 | 3B64 | 7220 | 6165 | 5F64 | 7265 | 3D72 | 2520 |
| 0000131700 | 3B64 | 6D20 | 6773 | 735F | 7A69 | 3D65 | 2520 | 3B64 |
| 0000131720 | 7220 | 6165 | 3D64 | 2520 | 0064 | 5F62 | 6564 | 7562 |
| 0000131740 | 0067 | 6552 | 7073 | 6E6F | 6573 | 6D20 | 7365 | 6173 |
| 0000131760 | 6567 | 6200 | 645F | 6265 | 6775 | 4600 | 6961 | 656C |
| 0000132000 | 2064 | 6E69 | 6820 | 6E61 | 6C64 | 6E69 | 2067 | 5049 |
| 0000132020 | 2043 | 736D | 2C67 | 7220 | 3D63 | 2520 | 0064 | 5F62 |
| 0000132040 | 6564 | 7562 | 0067 | 6146 | 6C69 | 6465 | 6920 | 206E |
| 0000132060 | 6E69 | 6573 | 7472 | 6520 | 7272 | 6D20 | 6773 | 202C |
| 0000132100 | 6372 | 203D | 6425 | 6200 | 645F | 6265 | 6775 | 0000 |
| 0000132120 | 6969 | 695F | 6370 | 745F | 7268 | 6165 | 0064 | 5F47 |
| 0000132140 | 5745 | 545F | 4700 | 455F | 5F57 | 0054 | 6969 | 655F |
| 0000132160 | 6578 | 5F63 | 6572 | 7571 | 7365 | 0074 | 5F47 | 5745 |
| 0000132200 | 545F | 4700 | 455F | 5F57 | 0054 | 6969 | 6E5F | 7765 |
| 0000132220 | 695F | 6370 | 4700 | 455F | 5F57 | 0054 | 5F47 | 5745 |
| 0000132240 | 545F | 000C | 6969 | 615F | 6464 | 695F | 6370 | 655F |
| 0000132260 | 746E | 7972 | 4700 | 455F | 5F57 | 0054 | 5F47 | 5745 |
| 0000132300 | 545F | 0000 | 6969 | 715F | 705F | 6F72 | 0063 | 5F47 |
| 0000132320 | 5745 | 545F | 4700 | 455F | 5F57 | 0054 | 6969 | 715F |
| 0000132340 | 705F | 6469 | 4700 | 455F | 5F57 | 0054 | 5F47 | 5745 |
| 0000132360 | 545F | 0000 | 6969 | 715F | 745F | 6469 | 4700 | 455F |
| 0000132400 | 5F57 | 0054 | 5F47 | 5745 | 545F | 0000 | 6969 | 715F |
| 0000132420 | 685F | 0070 | 5F47 | 5745 | 545F | 4700 | 455F | 5F57 |
| 0000132440 | 0054 | 6969 | 715F | 685F | 5F70 | 7962 | 705F | 6469 |
| 0000132460 | 4700 | 455F | 5F57 | 0054 | 5F47 | 5745 | 545F | 0000 |
| 0000132500 | 6969 | 715F | 685F | 5F70 | 7962 | 705F | 6F72 | 0063 |
| 0000132520 | 5F47 | 5745 | 545F | 4700 | 455F | 5F57 | 0054 | 6969 |
| 0000132540 | 715F | 735F | 6D65 | 705F | 4700 | 455F | 5F57 | 0054 |
| 0000132560 | 5F47 | 5745 | 545F | 0000 | 6969 | 715F | 705F | 7069 |
| 0000132600 | 5F65 | 616E | 656D | 705F | 0000 | 0000 | 0000 | 0000 |
| 0000132620 | 0006 | 0000 | 27B0 | 27AF | 0000 | 0005 | 0000 | 0000 |

```
THU MAR 14 17:39:32 1991   IH.DLL   PAGE 46, LINE 2656

0000132640   0000  0000  0000  0000  0000  0000  435F  465F
0000132660   4C49  5F45  4E49  4F46  003D  0001  FFFF  0000
0000132700   0000  0000  0000  0000  0000  0000  0000  0000
0000132720   0001  8101  8181  0000  0000  0000  0000  0000
0000132740   0000  0000  0000  0000  0000  0000  0000  0000
*
0000133320   0000  0A00  0A0A  0A0A  0A0A  0A0A  0A0A  0A0A
0000133340   0A0A  0A0A  0A0A  0A0A  0A0A  0A0A  0A0A  0A0A
*
0000133720   0A0A  000A  0000  0000  0000  0000  0000  0000
0000133740   0000  0000  FF00  00FF  0000  0000  FFFF  FFFF
0000133760   0000  0000  1C7A  0000  0000  FFFF  0001  0000
0000134000   0000  0000  0000  0000  0102  0000  0000  0000
0000134020   0000  0000  0202  0000  0000  0000  0000  0000
0000134040   0000  0000  0000  0000  0000  0000  0000  0000
*
0000134720   0000  0001  0200  0000  0000  0000  0000  0000
0000134740   0000  0000  0000  0000  0000  0000  0000  0000
*
0000135660   0000  1E46  17CC  0920  0D2D  005D  005D  0006
0000135700   0600  0100  0000  0010  0603  0600  1002  4504
0000135720   4545  0505  0505  3505  0030  0050  0000  2000
0000135740   3020  5850  0807  3000  3030  5057  0007  2000
0000135760   0020  0000  0000  6008  6060  6060  0060  7000
0000136000   7870  7878  0878  0807  0000  0007  0808  0008
0000136020   0800  0800  0000  2808  756E  6C6C  0629  0000
0000136040   0000  0000  0000  0000  0000  0000  0003  2000
0000136060   76A8  21E4  76A8  20B2  76A8  20B6  76A8  20BA
0000136100   76A8  20BE  76A8  20C2  0000  0000  0101  2000
0000136120   2020  2020  2020  2020  2828  2828  2028  2020
0000136140   2020  2020  2020  2020  2020  2020  2020  4820
0000136160   1010  1010  1010  1010  1010  1010  1010  8410
0000136200   8484  8484  8484  8484  1084  1010  1010  1010
0000136220   8181  8181  8181  0101  0101  0101  0101  0101
0000136240   0101  0101  0101  0101  0101  1010  1010  1010
0000136260   8282  8282  8282  0202  0202  0202  0202  0202
0000136300   0202  0202  0202  0202  0202  1010  1010  0020
0000136320   0000  0000  0000  0000  0000  0000  0000  0000
*
0000136520   0000  0003  0000  0000  0000  0000  0000  0000
0000136540   0000  7B76  0154  FFFF  FFFF  21E6  21E8  FFFF
0000136560   21EA  21EC  21F0  21F2  21F4  21F6  21F8  21FA
0000136600   21FC  21FE  21EE  2034  3C3C  4D4E  4753  3E3E
0000136620   0000  3652  3030  0D30  2D0A  7320  6174  6B63
0000136640   6F20  6576  6672  6F6C  0D77  000A  0003  3652
0000136660   3030  0D33  2D0A  6920  746E  6765  7265  6420
0000136700   7669  6469  2065  7962  3020  0A0D  0800  5200
0000136720   3036  3830  0A0D  202D  6F6E  2074  6E65  756F
0000136740   6867  7320  6170  6563  6620  726F  6120  6772
0000136760   6D75  6E65  7374  0A0D  0900  5200  3036  3930
0000137000   0A0D  202D  6F6E  2074  6E65  756F  6867  7320
0000137020   6170  6563  6620  726F  6520  766E  7269  6E6F
0000137040   656D  746E  0A0D  FC00  0D00  000A  00FF  7572
0000137060   2D6E  6974  656D  6520  7272  726F  0020  0002
0000137100   3652  3030  0D32  2D0A  6620  6F6C  7461  6E69
0000137120   2D67  6F70  6E69  2074  7573  7070  726F  2074
0000137140   6F6E  2074  676C  6461  6465  0A0D  1100  5200
0000137160   3036  3731  0A0D  202D  6E75  7865  6570  7463
0000137200   6465  6D20  6C75  6974  6874  6572  6461  6C20
```

THU MAR 14 17:39:32 1991 IH.DLL PAGE 47, LINE 2715

| | | | | | | | | |
|---|---|---|---|---|---|---|---|---|
| 0000137220 | 636F | 206B | 7265 | 6F72 | 0D72 | 000A | 0010 | 3652 |
| 0000137240 | 3130 | 0D36 | 2D0A | 6E20 | 746F | 6520 | 6F6E | 6775 |
| 0000137260 | 2068 | 7073 | 6361 | 2065 | 6F66 | 2072 | 6874 | 6572 |
| 0000137300 | 6461 | 6420 | 7461 | 0D61 | 000A | FFFF | 06FF | 0200 |
| 0000137320 | C600 | 0120 | 0000 | 0200 | 7400 | 041C | 0000 | 0200 |
| 0000137340 | 0600 | 0522 | 0000 | 0200 | 0002 | 0322 | 1A00 | 0200 |
| 0000137360 | 0202 | 0322 | 2800 | 0200 | 0402 | 0322 | AC00 | 4E00 |
| 0000137400 | 3042 | 8432 | 00D6 | 0100 | 0000 | D800 | 0001 | 0000 |
| 0000137420 | 0100 | 1A00 | 745C | 3231 | 5C33 | 7061 | 5C70 | 6869 |
| 0000137440 | 6F5C | 6A62 | 695C | 5F69 | 7274 | 6F2E | 6A62 | 0001 |
| 0000137460 | 01D8 | 09A6 | 0000 | 0000 | 0001 | 5C1C | 3174 | 3332 |
| 0000137500 | 615C | 7070 | 695C | 5C68 | 626F | 5C6A | 5F69 | 6E69 |
| 0000137520 | 7570 | 2E74 | 626F | 016A | 7E00 | 0A0B | 0015 | 0000 |
| 0000137540 | 0100 | 1D00 | 745C | 3231 | 5C33 | 7061 | 5C70 | 6869 |
| 0000137560 | 6F5C | 6A62 | 695C | 5F69 | 6E69 | 7570 | 2E74 | 626F |
| 0000137600 | 016A | 8800 | 0A20 | 0017 | 0000 | 0100 | 1A00 | 745C |
| 0000137620 | 3231 | 5C33 | 7061 | 5C70 | 6869 | 6F5C | 6A62 | 695C |
| 0000137640 | 695F | 6370 | 6F2E | 6A62 | 0001 | 3792 | 173B | 0000 |
| 0000137660 | 0000 | 0001 | 5C1B | 3174 | 3332 | 615C | 7070 | 695C |
| 0000137700 | 5C68 | 626F | 5C6A | 6969 | 695F | 6370 | 6F2E | 6A62 |
| 0000137720 | 0001 | 4ECE | 0950 | 0000 | 0000 | 0001 | 5C1C | 3174 |
| 0000137740 | 3332 | 615C | 7070 | 695C | 5C68 | 626F | 5C6A | 6969 |
| 0000137760 | 705F | 7069 | 2E65 | 626F | 016A | 1E00 | F458 | 0001 |
| 0000140000 | 0000 | 0100 | 1B00 | 745C | 3231 | 5C33 | 7061 | 5C70 |
| 0000140020 | 6869 | 6F5C | 6A62 | 695C | 745F | 7268 | 2E64 | 626F |
| 0000140040 | 016A | 1200 | E15A | 0019 | 0000 | 0100 | 1C00 | 745C |
| 0000140060 | 3231 | 5C33 | 7061 | 5C70 | 6869 | 6F5C | 6A62 | 695C |
| 0000140100 | 5F69 | 6874 | 6472 | 6F2E | 6A62 | 0001 | 7404 | 00D1 |
| 0000140120 | 0000 | 0001 | 0001 | 640B | 6C6C | 635C | 7573 | 612E |
| 0000140140 | 6D73 | 0001 | 74D6 | 01AF | 0000 | 0001 | 0001 | 640E |
| 0000140160 | 6C6C | 635C | 7573 | 6164 | 2E74 | 7361 | 016D | 8600 |
| 0000140200 | 2276 | 0000 | 0100 | 0100 | 0F00 | 736F | 5C32 | 7263 |
| 0000140220 | 3074 | 736D | 2E67 | 7361 | 016D | A800 | 0676 | 0000 |
| 0000140240 | 0100 | 0100 | 0A00 | 7263 | 3074 | 7066 | 612E | 6D73 |
| 0000140260 | 0001 | 76AE | 001A | 0000 | 0001 | 0001 | 630A | 6B68 |
| 0000140300 | 7473 | 2E6B | 7361 | 016D | C800 | 0876 | 0001 | 0100 |
| 0000140320 | 0100 | 0D00 | 6C64 | 5C6C | 6573 | 6574 | 766E | 2E70 |
| 0000140340 | 0163 | D000 | 6577 | 0000 | 0100 | 0100 | 0F00 | 736F |
| 0000140360 | 5C32 | 6D6E | 6773 | 6468 | 2E72 | 7361 | 016D | 3600 |
| 0000140400 | C078 | 0000 | 0100 | 0100 | 0E00 | 736F | 5C32 | 6F64 |
| 0000140420 | 7273 | 7465 | 612E | 6D73 | 0000 | 0000 | 0000 | 0000 |
| 0000140440 | 0001 | 0000 | 5F0B | 6663 | 756C | 6873 | 612E | 6D73 |
| 0000140460 | 0000 | 0000 | 0000 | 0000 | 0001 | 0000 | 5F07 | 6966 |
| 0000140500 | 656C | 632E | 0001 | 78F6 | 009C | 0000 | 0001 | 0001 |
| 0000140520 | 5F0B | 6966 | 626C | 6675 | 612E | 6D73 | 0001 | 7992 |
| 0000140540 | 00E5 | 0000 | 0001 | 0001 | 5F0B | 6C66 | 6273 | 6675 |
| 0000140560 | 612E | 6D73 | 0001 | 7A78 | 004B | 0000 | 0001 | 0001 |
| 0000140600 | 5F0B | 6567 | 6274 | 6675 | 612E | 6D73 | 0001 | 7AC4 |
| 0000140620 | 012E | 0000 | 0001 | 0001 | 6608 | 6C66 | 7375 | 2E68 |
| 0000140640 | 0163 | F200 | 2A7B | 0008 | 0100 | 0100 | 0700 | 6E69 |
| 0000140660 | 7570 | 2E74 | 0163 | 1C00 | FAB4 | 0004 | 0100 | 0100 |
| 0000140700 | 0A00 | 756F | 7074 | 7475 | 612E | 6D73 | 0001 | 8916 |
| 0000140720 | 00AA | 0000 | 0001 | 0001 | 7508 | 676E | 7465 | 2E63 |
| 0000140740 | 0163 | C000 | 7789 | 0000 | 0100 | 0100 | 0D00 | 736F |
| 0000140760 | 5C32 | 736C | 6565 | 2E6B | 7361 | 016D | 3800 | 5D8A |
| 0000141000 | 0001 | 0100 | 0100 | 0C00 | 736F | 5C32 | 6572 | 6461 |
| 0000141020 | 612E | 6D73 | 0001 | 8B96 | 01DD | 0000 | 0001 | 0001 |
| 0000141040 | 7709 | 6972 | 6574 | 612E | 6D73 | 0001 | 8D74 | 0001 |
| 0000141060 | 0000 | 0001 | 0001 | 6D0A | 6C61 | 6F6C | 2E63 | 7361 |

THU MAR 14 17:39:32 1991 IH.DLL PAGE 48, LINE 2774

| | | | | | | | | |
|---|---|---|---|---|---|---|---|---|
| 0000141100 | 016D | 7E00 | 0A8D | 0000 | 0100 | 0100 | 0800 | 7266 |
| 0000141120 | 6565 | 612E | 6D73 | 0001 | 8D88 | 00AF | 0000 | 0001 |
| 0000141140 | 0001 | 660B | 616D | 6C6C | 636F | 612E | 6D73 | 0000 |
| 0000141160 | 0000 | 0000 | 0000 | 0001 | 0000 | 6609 | 6164 | 6174 |
| 0000141200 | 612E | 6D73 | 0001 | 8E38 | 0034 | 0000 | 0001 | 0001 |
| 0000141220 | 690B | 696E | 7374 | 6765 | 612E | 6D73 | 0001 | 8E6C |
| 0000141240 | 0036 | 0000 | 0001 | 0001 | 6C0B | 6E69 | 736B | 6765 |
| 0000141260 | 612E | 6D73 | 0001 | 8EA2 | 007C | 0000 | 0001 | 0001 |
| 0000141300 | 730C | 6165 | 6372 | 7368 | 2E67 | 7361 | 016D | 1E00 |
| 0000141320 | E28F | 0000 | 0100 | 0100 | 0B00 | 7267 | 776F | 6573 |
| 0000141340 | 2E67 | 7361 | 016D | 0000 | 3190 | 0000 | 0100 | 0100 |
| 0000141360 | 0A00 | 656E | 7377 | 6765 | 612E | 6D73 | 0001 | 9032 |
| 0000141400 | 0036 | 0000 | 0001 | 0001 | 730A | 7274 | 7063 | 2E79 |
| 0000141420 | 7361 | 016D | 6800 | 1790 | 0000 | 0100 | 0100 | 0A00 |
| 0000141440 | 7473 | 6C72 | 6E65 | 612E | 6D73 | 0001 | 9080 | 003B |
| 0000141460 | 0000 | 0001 | 0001 | 730B | 7274 | 636E | 706D | 612E |
| 0000141500 | 6D73 | 0000 | 0000 | 0000 | 0000 | 0001 | 0000 | 630C |
| 0000141520 | 696D | 6373 | 6164 | 2E74 | 7361 | 006D | 0000 | 0000 |
| 0000141540 | 0000 | 0100 | 0000 | 0900 | 7463 | 7079 | 2E65 | 7361 |
| 0000141560 | 016D | BC00 | A690 | 0000 | 0100 | 0100 | 0800 | 6567 |
| 0000141600 | 6574 | 766E | 632E | 0001 | 9162 | 00BA | 0000 | 0001 |
| 0000141620 | 0001 | 6F0D | 3273 | 6D5C | 6F6C | 6B63 | 612E | 6D73 |
| 0000141640 | 0001 | 921C | 010E | 0000 | 0001 | 0001 | 640E | 6C6C |
| 0000141660 | 745C | 7268 | 6165 | 2E64 | 7361 | 016D | 2A00 | 7A93 |
| 0000141700 | 0000 | 0100 | 0100 | 1000 | 6C64 | 5C6C | 6974 | 7464 |
| 0000141720 | 6261 | 656C | 612E | 6D73 | 0001 | 93A4 | 0074 | 0000 |
| 0000141740 | 0001 | 0001 | 7309 | 7270 | 6E69 | 6674 | 632E | 0001 |
| 0000141760 | 9418 | 005C | 0000 | 0001 | 0001 | 7308 | 6373 | 6E61 |
| 0000142000 | 2E66 | 0163 | 7400 | 2E94 | 0000 | 0100 | 0100 | 0A00 |
| 0000142020 | 6163 | 6C6C | 636F | 612E | 6D73 | 0001 | 94A2 | 005E |
| 0000142040 | 0000 | 0001 | 0001 | 680B | 656D | 636D | 7970 | 612E |
| 0000142060 | 6D73 | 0001 | 9500 | 0048 | 0000 | 0001 | 0001 | 680B |
| 0000142100 | 656D | 736D | 7465 | 612E | 6D73 | 0001 | 9548 | 000E |
| 0000142120 | 0000 | 0001 | 0001 | 6105 | 7362 | 632E | 0001 | 9556 |
| 0000142140 | 0022 | 0000 | 0001 | 0001 | 6109 | 6D6C | 6C75 | 612E |
| 0000142160 | 6D73 | 0001 | 9578 | 001F | 0000 | 0001 | 0001 | 6109 |
| 0000142200 | 736C | 6C68 | 612E | 6D73 | 0001 | 9598 | 0032 | 0000 |
| 0000142220 | 0001 | 0001 | 6C08 | 756D | 2E6C | 7361 | 016D | CA00 |
| 0000142240 | 0B95 | 0000 | 0100 | 0100 | 0800 | 736C | 6C68 | 612E |
| 0000142260 | 6D73 | 0000 | 0001 | 043F | 4911 | 5F49 | 5041 | 5F50 |
| 0000142300 | 5254 | 4E41 | 5F53 | 5546 | 434E | 0038 | 0001 | 0441 |
| 0000142320 | 4911 | 5F49 | 5049 | 5F43 | 5254 | 4E41 | 5F53 | 5546 |
| 0000142340 | 434E | 0070 | 0001 | 0445 | 4913 | 5F49 | 4142 | 4354 |
| 0000142360 | 5F48 | 5254 | 4E41 | 5F53 | 5546 | 434E | 0098 | 0001 |
| 0000142400 | 0447 | 4913 | 5F49 | 534D | 5F47 | 4C42 | 434F | 5F4B |
| 0000142420 | 4F54 | 4D5F | 4753 | 01D8 | 0001 | 04F4 | 4909 | 475F |
| 0000142440 | 5445 | 4D5F | 4753 | 03AD | 0001 | 04FA | 4910 | 495F |
| 0000142460 | 534E | 5245 | 5F54 | 5049 | 5F43 | 534D | F847 | 0104 |
| 0000142500 | FE00 | 1004 | 5F49 | 4E49 | 4553 | 5452 | 415F | 5050 |
| 0000142520 | 4D5F | 4753 | 0643 | 0001 | 0500 | 490A | 4D5F | 4B41 |
| 0000142540 | 5F45 | 534D | 0147 | 0108 | 0400 | 0E05 | 5F49 | 4553 |
| 0000142560 | 5F54 | 5250 | 4F49 | 4952 | 5954 | 0A19 | 0001 | 0508 |
| 0000142600 | 4910 | 535F | 5445 | 545F | 4152 | 534E | 465F | 4E55 |
| 0000142620 | C543 | 0110 | 5000 | 0F05 | 695F | 5F69 | 6567 | 5F74 |
| 0000142640 | 7069 | 5F63 | 736D | 3067 | 0113 | 5500 | 0F05 | 695F |
| 0000142660 | 5F69 | 6567 | 5F74 | 7061 | 5F70 | 736D | 4267 | 0115 |
| 0000142700 | 5700 | 1105 | 695F | 5F69 | 6567 | 5F74 | 6162 | 6374 |
| 0000142720 | 5F68 | 736D | 7867 | 0116 | 5900 | 1205 | 695F | 5F69 |
| 0000142740 | 6E69 | 6573 | 7472 | 695F | 6370 | 6D5F | 6773 | 1937 |

THU MAR 14 17:39:32 1991 IH.DLL PAGE 49, LINE 2833

| | | | | | | | | |
|---|---|---|---|---|---|---|---|---|
| 0000142760 | 0001 | 055E | 5F16 | 6969 | 695F | 736E | 7265 | 5F74 |
| 0000143000 | 7069 | 5F63 | 7265 | 5F72 | 736D | D867 | 011A | 6200 |
| 0000143020 | 1205 | 695F | 5F69 | 6E69 | 6573 | 7472 | 615F | 7070 |
| 0000143040 | 6D5F | 6773 | 1CE6 | 0001 | 0564 | 5F14 | 6969 | 735F |
| 0000143060 | 7465 | 625F | 7461 | 6863 | 685F | 6E61 | 6C64 | 0E65 |
| 0000143100 | 011D | 6600 | 1205 | 695F | 5F69 | 5F71 | 6162 | 6374 |
| 0000143120 | 5F68 | 6168 | 646E | 656C | 1D3A | 0001 | 0568 | 5F10 |
| 0000143140 | 6969 | 735F | 7465 | 705F | 6972 | 726F | 7469 | 8079 |
| 0000143160 | 011D | 6A00 | 0E05 | 695F | 5F69 | 5F71 | 7270 | 6F69 |
| 0000143200 | 6972 | 7974 | 1DC6 | 0001 | 056C | 5F12 | 6969 | 735F |
| 0000143220 | 7465 | 745F | 6172 | 736E | 665F | 6E75 | 3063 | 0501 |
| 0000143240 | 8600 | 0A00 | 695F | 6370 | 715F | 735F | 6D65 | 1F25 |
| 0000143260 | 0001 | 056E | 5F10 | 6969 | 715F | 745F | 6172 | 736E |
| 0000143300 | 665F | 6E75 | 7E63 | 010B | 4500 | 0E05 | 695F | 5F69 |
| 0000143320 | 6567 | 5F74 | 736D | 5F67 | 4D50 | 0E4C | 0001 | 054C |
| 0000143340 | 5F11 | 6969 | 675F | 7465 | 6D5F | 6773 | 6E5F | 5F6F |
| 0000143360 | 4D50 | 2088 | 0001 | 0516 | 4906 | 495F | 494E | 7D54 |
| 0000143400 | 0122 | 2000 | 0A05 | 5F49 | 5243 | 5F56 | 4E49 | 5449 |
| 0000143420 | 24C7 | 0001 | 0526 | 490A | 495F | 4350 | 495F | 494E |
| 0000143440 | 5454 | 0127 | 2900 | 1105 | 5F49 | 5341 | 4F53 | 4943 |
| 0000143460 | 5441 | 5F45 | 5F51 | 4553 | 894D | 0127 | 2B00 | 0705 |
| 0000143500 | 5F49 | 4241 | 524F | D454 | 0128 | 2D00 | 0605 | 5F49 |
| 0000143520 | 4554 | 4D52 | 2A37 | 0001 | 052F | 490A | 495F | 4350 |
| 0000143540 | 545F | 5245 | D84D | 012B | 3000 | 0A05 | 5F49 | 5243 |
| 0000143560 | 5F56 | 4554 | 4D52 | 2D69 | 0001 | 0532 | 490A | 535F |
| 0000143600 | 4E45 | 5F44 | 534D | DE47 | 012F | 3400 | 0E05 | 5F49 |
| 0000143620 | 5243 | 5F56 | 4553 | 444E | 4D5F | 4753 | 313A | 0001 |
| 0000143640 | 0538 | 490C | 535F | 4E45 | 5F44 | 5F58 | 534D | EB47 |
| 0000143660 | 0133 | 3A00 | 0D05 | 5F49 | 4552 | 5053 | 4E4F | 5F44 |
| 0000143700 | 534D | B647 | 0135 | 3D00 | 0F05 | 5F49 | 5243 | 5F56 |
| 0000143720 | 4552 | 4F43 | 4E4E | 4345 | 5D54 | 0137 | 4000 | 0A05 |
| 0000143740 | 5F49 | 5246 | 4545 | 4D5F | 4753 | 42BF | 0001 | 056C |
| 0000143760 | 5F0E | 6969 | 635F | 656C | 7261 | 725F | 7365 | BA70 |
| 0000144000 | 0144 | 6F00 | 1205 | 695F | 5F69 | 6573 | 5F74 | 736D |
| 0000144020 | 5F67 | 6568 | 6461 | 7265 | 4623 | 0001 | 0571 | 5F1B |
| 0000144040 | 6969 | 735F | 7465 | 6D5F | 6773 | 685F | 6165 | 6564 |
| 0000144060 | 5F72 | 6E69 | 6574 | 6E72 | 6C61 | 47AA | 0001 | 0575 |
| 0000144100 | 5F12 | 6969 | 725F | 6365 | 6E6F | 656E | 7463 | 705F |
| 0000144120 | 7069 | 0665 | 0149 | 7700 | 1005 | 695F | 5F69 | 6F63 |
| 0000144140 | 6E6E | 6365 | 5F74 | 6177 | 7469 | 4A74 | 0001 | 0579 |
| 0000144160 | 5F10 | 6969 | 635F | 6E6F | 656E | 7463 | 705F | 7069 |
| 0000144200 | 2D65 | 014B | 7B00 | 1105 | 695F | 5F69 | 6574 | 7473 |
| 0000144220 | 705F | 7069 | 5F65 | 6E65 | 5D64 | 014B | 7D00 | 1005 |
| 0000144240 | 695F | 5F69 | 6E69 | 7469 | 695F | 6370 | 435F | 5652 |
| 0000144260 | 4D5D | 0001 | 057F | 5F10 | 6969 | 435F | 5652 | 735F |
| 0000144300 | 7465 | 785F | 685F | 8170 | 014D | 8100 | 1005 | 695F |
| 0000144320 | 5F69 | 5243 | 5F56 | 6567 | 5F74 | 5F78 | 7068 | 1452 |
| 0000144340 | 0005 | 04CD | 5F10 | 5F49 | 5F43 | 4F4D | 5544 | 454C |
| 0000144360 | 4E5F | 4D41 | 9245 | 0137 | 5100 | 1205 | 695F | 5F69 |
| 0000144400 | 6573 | 646E | 735F | 6174 | 7472 | 6D5F | 6773 | 3A4C |
| 0000144420 | 0001 | 055A | 5F11 | 6969 | 735F | 6E65 | 5F64 | 7473 |
| 0000144440 | 706F | 6D5F | 6773 | 3BB4 | 0001 | 055E | 5F10 | 6969 |
| 0000144460 | 695F | 6370 | 735F | 6E65 | 5F64 | 736D | 5367 | 013D |
| 0000144500 | 6200 | 0F05 | 695F | 5F69 | 6572 | 7073 | 6E6F | 5F64 |
| 0000144520 | 736D | B867 | 013E | 6600 | 1105 | 695F | 5F69 | 6177 |
| 0000144540 | 7469 | 725F | 7365 | 6F70 | 736E | DD65 | 0140 | 6800 |
| 0000144560 | 1005 | 695F | 5F69 | 6573 | 5F74 | 6572 | 7073 | 6E6F |
| 0000144600 | 6573 | 4ECE | 0001 | 04DC | 5F0D | 6969 | 705F | 7069 |
| 0000144620 | 5F65 | 616D | 656B | 50CC | 0001 | 04E6 | 5F0D | 6969 |

THU MAR 14 17:39:32 1991 IH.DLL PAGE 50, LINE 2892

| | | | | | | | | |
|---|---|---|---|---|---|---|---|---|
| 0000144640 | 705F | 7069 | 5F65 | 706F | 6E65 | 5440 | 0001 | 04EB |
| 0000144660 | 5F10 | 6969 | 705F | 7069 | 5F65 | 6F63 | 6E6E | 6365 |
| 0000144700 | 8A74 | 0155 | EF00 | 1304 | 695F | 5F69 | 6970 | 6570 |
| 0000144720 | 645F | 7369 | 6F63 | 6E6E | 6365 | D474 | 0156 | F200 |
| 0000144740 | 0E04 | 695F | 5F69 | 6970 | 6570 | 635F | 6F6C | 6573 |
| 0000144760 | 59EB | 0001 | 0443 | 5F11 | 5F69 | 6874 | 6572 | 6461 |
| 0000145000 | 735F | 6174 | 7472 | 6465 | 581E | 0001 | 043B | 5F0F |
| 0000145020 | 5F69 | 7473 | 7261 | 5F74 | 6874 | 6572 | 6461 | 659D |
| 0000145040 | 0001 | 0580 | 5F11 | 6969 | 615F | 6464 | 695F | 6370 |
| 0000145060 | 655F | 746E | 7972 | 6733 | 0001 | 0583 | 5F11 | 6969 |
| 0000145100 | 735F | 7465 | 695F | 6370 | 655F | 746E | 7972 | 679E |
| 0000145120 | 0001 | 0585 | 5F0E | 6969 | 735F | 7465 | 695F | 6370 |
| 0000145140 | 695F | DC64 | 0167 | 8700 | 1105 | 695F | 5F69 | 6572 |
| 0000145160 | 6F6D | 6576 | 695F | 6370 | 695F | 4C64 | 0168 | 8900 |
| 0000145200 | 0A05 | 695F | 5F69 | 5F71 | 7270 | 636F | 69AF | 0001 |
| 0000145220 | 058C | 5F09 | 6969 | 715F | 705F | 6469 | 6B12 | 0001 |
| 0000145240 | 0590 | 5F09 | 6969 | 715F | 745F | 6469 | 6C75 | 0001 |
| 0000145260 | 0592 | 5F08 | 6969 | 715F | 685F | D870 | 016D | 9500 |
| 0000145300 | 0F05 | 695F | 5F69 | 5F71 | 7068 | 625F | 5F79 | 6970 |
| 0000145320 | 5A64 | 016F | 9900 | 1005 | 695F | 5F69 | 5F71 | 7068 |
| 0000145340 | 625F | 5F79 | 7270 | 636F | 70DC | 0001 | 059B | 5F0B |
| 0000145360 | 6969 | 715F | 735F | 6D65 | 705F | 7234 | 0001 | 059D |
| 0000145400 | 5F11 | 6969 | 715F | 705F | 7069 | 5F65 | 616E | 656D |
| 0000145420 | 705F | 738C | 0001 | 059F | 5F0D | 6969 | 735F | 7465 |
| 0000145440 | 715F | 735F | 6D65 | 73CE | 0001 | 05A0 | 5F0B | 6969 |
| 0000145460 | 715F | 715F | 735F | 6D65 | 5A12 | 0001 | 0567 | 5F14 |
| 0000145500 | 6969 | 735F | 6174 | 7472 | 695F | 6370 | 745F | 7268 |
| 0000145520 | 6165 | EA64 | 015B | 6C00 | 0E05 | 695F | 5F69 | 7069 |
| 0000145540 | 5F63 | 6874 | 6572 | 6461 | 61EB | 0001 | 0578 | 5F10 |
| 0000145560 | 6969 | 655F | 6578 | 5F63 | 6572 | 7571 | 7365 | 4D74 |
| 0000145600 | 0163 | 7C00 | 0B05 | 695F | 5F69 | 656E | 5F77 | 7069 |
| 0000145620 | 4E63 | 0523 | 0000 | 0600 | 655F | 6164 | 6174 | 27B0 |
| 0000145640 | 0005 | 0000 | 5F04 | 6E65 | 0464 | 0174 | 0000 | 0600 |
| 0000145660 | 5F43 | 4E49 | 5449 | 1A18 | 0005 | 0000 | 5F0C | 6E5F |
| 0000145700 | 6568 | 7061 | 645F | 7365 | B063 | 0527 | 0000 | 0C00 |
| 0000145720 | 735F | 6174 | 6B63 | 6F62 | 7474 | 6D6F | 1A3E | 0005 |
| 0000145740 | 0000 | 5F0C | 5F5F | 4461 | 7342 | 7077 | 6C66 | 0A67 |
| 0000145760 | 051A | 0000 | 0800 | 5F5F | 6361 | 646D | 6E6C | 1A3C |
| 0000146000 | 0005 | 0000 | 5F08 | 615F | 6573 | 6867 | 3A69 | 051A |
| 0000146020 | 0000 | 0800 | 5F5F | 7361 | 6765 | 6F6C | 1A16 | 0005 |
| 0000146040 | 0000 | 5F08 | 615F | 6973 | 647A | 1473 | 051A | 0000 |
| 0000146060 | 0800 | 5F5F | 7461 | 706F | 7073 | 1A2C | 0005 | 0000 |
| 0000146100 | 5F09 | 615F | 6663 | 6E69 | 6F66 | D6D6 | 0000 | 0001 |
| 0000146120 | 5F09 | 615F | 4244 | 7375 | 6465 | 1A0C | 0005 | 0000 |
| 0000146140 | 5F09 | 615F | 6E65 | 7376 | 6765 | 1A10 | 0005 | 0000 |
| 0000146160 | 5F0A | 745F | 7268 | 6165 | 6964 | 0E64 | 051A | 0000 |
| 0000146200 | 0A00 | 5F5F | 6967 | 666E | 736F | 6765 | D6D6 | 0000 |
| 0000146220 | 0001 | 5F0A | 615F | 4244 | 6F64 | 7773 | 1270 | 051A |
| 0000146240 | 0000 | 0A00 | 5F5F | 696C | 666E | 736F | 6765 | 9876 |
| 0000146260 | 0000 | 0001 | 5F0A | 615F | 7263 | 7574 | 6573 | 4064 |
| 0000146300 | 051A | 0000 | 0B00 | 5F5F | 615F | 4244 | 7472 | 7265 |
| 0000146320 | 7572 | 0174 | 0000 | 0B00 | 5F5F | 6D61 | 6773 | 655F |
| 0000146340 | 6978 | 4E74 | 051A | 0000 | 0B00 | 5F5F | 736F | 6576 |
| 0000146360 | 7372 | 6F69 | 8F6E | 0175 | 0000 | 0600 | 5F5F | 7865 |
| 0000146400 | 7469 | 7641 | 0001 | 0000 | 5F0C | 755F | 6C6E | 636F |
| 0000146420 | 656B | 6978 | 6174 | 051C | 0000 | 0700 | 5F5F | 6863 |
| 0000146440 | 6C69 | 5164 | 051A | 0000 | 0700 | 5F5F | 666E | 6C69 |
| 0000146460 | D665 | 0174 | 0000 | 0700 | 5F5F | 6963 | 696E | 5374 |
| 0000146500 | 051C | 0000 | 0700 | 5F5F | 615F | 6772 | 9763 | 0175 |

THU MAR 14 17:39:32 1991 IH.DLL PAGE 51, LINE 2951

| | | | | | | | | |
|---|---|---|---|---|---|---|---|---|
| 0000146520 | 0000 | 0700 | 5F5F | 6563 | 6978 | 4E74 | 051A | 0000 |
| 0000146540 | 0D00 | 5F5F | 6F64 | 7673 | 7265 | 616D | 6F6A | 5572 |
| 0000146560 | 051C | 0000 | 0700 | 5F5F | 615F | 6772 | 4F76 | 051A |
| 0000146600 | 0000 | 0D00 | 5F5F | 6F64 | 7673 | 7265 | 696D | 6F6E |
| 0000146620 | 5372 | 051B | 0000 | 0800 | 5F5F | 6970 | 6570 | 6863 |
| 0000146640 | 1C59 | 0005 | 0000 | 5F08 | 6E65 | 6976 | 6F72 | 536E |
| 0000146660 | 051A | 0000 | 0800 | 5F5F | 736F | 6966 | 656C | 1A50 |
| 0000146700 | 0005 | 0000 | 5F08 | 6F5F | 6D73 | 646F | 3065 | 0175 |
| 0000146720 | 0000 | 0800 | 5F5F | 6E69 | 7469 | 7066 | 21D6 | 0005 |
| 0000146740 | 0000 | 5F08 | 665F | 6970 | 696E | 6474 | 0176 | 0000 |
| 0000146760 | 0800 | 5F5F | 6574 | 6D72 | 7066 | 1C5D | 0005 | 0000 |
| 0000147000 | 5F08 | 705F | 6D67 | 7470 | A172 | 0175 | 0000 | 0800 |
| 0000147020 | 5F5F | 5F63 | 7865 | 7469 | 1A50 | 0005 | 0000 | 5F09 |
| 0000147040 | 645F | 736F | 6F6D | 6564 | 1A4E | 0005 | 0000 | 5F09 |
| 0000147060 | 6F5F | 6D73 | 6A61 | 726F | 1A4F | 0005 | 0000 | 5F09 |
| 0000147100 | 6F5F | 6D73 | 6E69 | 726F | 1C63 | 0005 | 0000 | 5F0A |
| 0000147120 | 655F | 6978 | 6474 | 6E6F | F765 | 0175 | 0000 | 0A00 |
| 0000147140 | 5F5F | 6F6C | 6B63 | 7865 | 7469 | 1A4C | 0005 | 0000 |
| 0000147160 | 5F0A | 755F | 616D | 6B73 | 6176 | 646C | 0176 | 0000 |
| 0000147200 | 0A00 | 5F5F | 7463 | 7265 | 736D | 6275 | 1C65 | 0005 |
| 0000147220 | 0000 | 5F0A | 655F | 6978 | 5F74 | 6974 | 4264 | 051A |
| 0000147240 | 0000 | 0500 | 5F5F | 6166 | 8863 | 0175 | 0000 | 0500 |
| 0000147260 | 655F | 697E | 6674 | 0176 | 0000 | 0E00 | 5F5F | 4646 |
| 0000147300 | 4D5F | 4753 | 4142 | 4E4E | 5245 | 1C68 | 0005 | 0000 |
| 0000147320 | 5F09 | 615F | 6264 | 6D67 | 6773 | 9876 | 0000 | 0001 |
| 0000147340 | 5F09 | 615F | 7263 | 6D74 | 6773 | 76A8 | 0001 | 0000 |
| 0000147360 | 5F08 | 665F | 7470 | 6172 | 6C70 | 051C | 0000 | 0C00 |
| 0000147400 | 5F5F | 6161 | 746C | 7473 | 6F6B | 7276 | 76AE | 0001 |
| 0000147420 | 0000 | 5F08 | 635F | 6B68 | 7473 | AE6B | 0176 | 0000 |
| 0000147440 | 0A00 | 5F5F | 4661 | 6863 | 736B | 6B74 | 76C8 | 0001 |
| 0000147460 | 0000 | 5F09 | 735F | 7465 | 6E65 | 7076 | 77D0 | 0001 |
| 0000147500 | 0000 | 5F0B | 4E5F | 534D | 5F47 | 4554 | 5458 | 7800 |
| 0000147520 | 0001 | 0000 | 5F0C | 4E5F | 534D | 5F47 | 5257 | 5449 |
| 0000147540 | E245 | 0178 | 0000 | 0B00 | 5F5F | 645F | 736F | 7265 |
| 0000147560 | 6E72 | EA6F | 0178 | 0000 | 0700 | 5F5F | 7265 | 6E72 |
| 0000147600 | 9B6F | 0178 | 0000 | 0800 | 5F5F | 6F64 | 7273 | 7465 |
| 0000147620 | 7882 | 0001 | 0000 | 5F09 | 645F | 736F | 6572 | 6674 |
| 0000147640 | 1C70 | 0005 | 0000 | 5F08 | 635F | 6C66 | 7375 | 0068 |
| 0000147660 | 0400 | 0000 | 0700 | 5F5F | 7562 | 6966 | 726E | 051C |
| 0000147700 | 0000 | 0500 | 5F5F | 6F69 | 5262 | 051E | 0000 | 0600 |
| 0000147720 | 5F5F | 6F69 | 3262 | 2032 | 0005 | 0000 | 5F09 | 6C5F |
| 0000147740 | 7361 | 6974 | 626F | 78F6 | 0001 | 0000 | 5F08 | 665F |
| 0000147760 | 6C69 | 7562 | 9266 | 0179 | 0000 | 0800 | 5F5F | 6C66 |
| 0000150000 | 6273 | 6675 | 7A78 | 0001 | 0000 | 5F08 | 675F | 7465 |
| 0000150020 | 7562 | 0A66 | 017B | 0000 | 0B00 | 5F5F | 6666 | 756C |
| 0000150040 | 6873 | 6C5F | C46B | 017A | 0000 | 0700 | 665F | 6C66 |
| 0000150060 | 7375 | 7668 | 017B | 0000 | 0900 | 665F | 756C | 6873 |
| 0000150100 | 6C61 | F26C | 017B | 0000 | 0700 | 5F5F | 6E69 | 7570 |
| 0000150120 | 2C74 | 0184 | 0000 | 0800 | 5F5F | 756F | 7074 | 7475 |
| 0000150140 | 8916 | 0001 | 0000 | 5F07 | 6E75 | 6567 | 6374 | 8956 |
| 0000150160 | 0001 | 0000 | 5F0B | 755F | 676E | 7465 | 5F63 | 6B6C |
| 0000150200 | 89CA | 0001 | 0000 | 5F06 | 736C | 6565 | C06B | 0189 |
| 0000150220 | 0000 | 0A00 | 5F5F | 736C | 6565 | 5F6B | 6B6C | 8A38 |
| 0000150240 | 0001 | 0000 | 5F05 | 6572 | 6461 | 8BA0 | 0001 | 0000 |
| 0000150260 | 5F06 | 7277 | 7469 | 9665 | 018B | 0000 | 0A00 | 5F5F |
| 0000150300 | 7277 | 7469 | 5F65 | 6B6C | 8D74 | 0001 | 0000 | 5F07 |
| 0000150320 | 616D | 6C6C | 636F | 8D79 | 0001 | 0000 | 5F0A | 616D |
| 0000150340 | 6C6C | 636F | 6C5F | 836B | 018D | 0000 | 0800 | 665F |
| 0000150360 | 6572 | 5F65 | 6B6C | 8D7E | 0001 | 0000 | 5F05 | 7266 |

THU MAR 14 17:39:32 1991 IH.DLL PAGE 52, LINE 3010

```
0000150400   6565  8DBA  0001  0000  5F0C  665F  616D  6C6C
0000150420   636F  6C5F  886B  018D  0000  0700  5F5F  6666
0000150440   6572  9B65  018D  0000  0900  5F5F  6D66  6C61
0000150460   6F6C  8863  018D  0000  0A00  5F5F  6666  6572
0000150500   5F65  6B6C  20A0  0005  0000  5F07  665F  6568
0000150520   7061  8E38  0001  0000  5F09  695F  696E  7374
0000150540   6765  8E6C  0001  0000  5F09  6C5F  6E69  736B
0000150560   6765  8EA2  0001  0000  5F0B  735F  6165  6372
0000150600   7368  6765  8FAD  0001  0000  5F08  695F  636E
0000150620   6573  1E67  018F  0000  0900  5F5F  7267  776F
0000150640   6573  E067  018F  0000  0A00  5F5F  6966  646E
0000150660   616C  7473  20AE  0005  0000  5F0A  615F  626D
0000150700   6B6C  6973  007A  0190  0000  0800  5F5F  656E
0000150720   7377  6765  9032  0001  0000  5F07  7473  6372
0000150740   7970  9068  0001  0000  5F07  7473  6C72  6E65
0000150760   9080  0001  0000  5F08  7473  6E72  6D63  B070
0000151000   0520  0000  0D00  5F5F  6663  746C  7663  5F74
0000151020   6174  CC62  0520  0000  0800  5F5F  7361  7A69
0000151040   4365  20CD  0005  0000  5F08  615F  6973  657A
0000151060   CA44  0520  0000  0B00  5F5F  6973  6967  746E
0000151100   666F  C866  0520  0000  0B00  5F5F  6973  6967
0000151120   746E  6573  CE67  0520  0000  0700  5F5F  7463
0000151140   7079  CE65  0520  0000  0800  5F5F  7463  7079
0000151160   5F65  90BC  0001  0000  5F07  6567  6574  766E
0000151200   91B2  0001  0000  5F06  6C5F  636F  FC6B  0191
0000151220   0000  0700  5F5F  6F6C  6B63  8666  0191  0000
0000151240   0D00  5F5F  6E75  6F6C  6B63  665F  6C69  6265
0000151260   0191  0000  0D00  5F5F  6F6C  6B63  735F  7274
0000151300   6165  DC6D  0191  0000  0800  5F5F  6E75  6F6C
0000151320   6B63  21D0  0005  0000  5F09  6C5F  636F  636B
0000151340   746E  920C  0001  0000  5F09  755F  6C6E  636F
0000151360   666B  916E  0001  0000  5F0F  755F  6C6E  636F
0000151400   5F6B  7473  6572  6D61  9192  0001  0000  5F0A
0000151420   775F  6961  6C74  636F  7A6B  0191  0000  0B00
0000151440   5F5F  6F6C  6B63  665F  6C69  1C65  0192  0000
0000151460   0D00  5F5F  6562  6967  746E  7268  6165  FD64
0000151500   0192  0000  0B00  5F5F  6E65  7464  7268  6165
0000151520   2A64  0193  0000  0B00  5F5F  6567  7474  6469
0000151540   6174  D262  0521  0000  0B00  5F5F  6974  7464
0000151560   6261  616D  A478  0193  0000  0800  735F  7270
0000151600   6E69  6674  9418  0001  0000  5F07  7373  6163
0000151620   666E  9474  0001  0000  5F07  6163  6C6C  636F
0000151640   94A2  0001  0000  5F07  656D  636D  7970  9500
0000151660   0001  0000  5F07  656D  736D  7465  9548  0001
0000151700   0000  5F04  6261  5673  0195  0000  0A00  5F5F
0000151720   4661  6146  6D6C  6C75  9556  0001  0000  5F0B
0000151740   615F  4646  7561  6D6C  6C75  9578  0001  0000
0000151760   5F0A  615F  4646  6C61  6873  986C  0195  0000
0000152000   0800  5F5F  4661  6D6C  6C75  9598  0001  0000
0000152020   5F09  615F  7546  6D6C  6C75  95CA  0001  0000
0000152040   5F08  615F  6C46  6873  016C  0001  0180  0001
0000152060   0180  0001  0180  0001  0180  0001  0180  0001
*
0000156120   0180  0001  0180  001B  2079  8309  040C  0D83
0000156140   8204  690F  755F  6D5F  6773  705F  7261  6D61
0000156160   745F  0169  001C  837F  0081  8583  8300  0082
0000156200   8683  8300  0088  8083  8300  0084  C083  8300
0000156220   00C0  6A01  7F00  0982  5F69  5F75  6873  726F
0000156240   0074  0A82  5F69  5F75  7375  6F68  7472  8200
```

THU MAR 14 17:39:32 1991 IH.DLL PAGE 53, LINE 3069

| | | | | | | | | |
|---|---|---|---|---|---|---|---|---|
| 0000156260 | 6908 | 755F | 6C5F | 6E6F | 0067 | 0982 | 5F69 | 5F75 |
| 0000156300 | 6C75 | 6E6F | 0067 | 0982 | 5F69 | 5F75 | 6C66 | 616F |
| 0000156320 | 0074 | 0882 | 5F69 | 5F75 | 6863 | 7261 | 8200 | 6909 |
| 0000156340 | 755F | 755F | 6863 | 7261 | 8200 | 6907 | 755F | 735F |
| 0000156360 | 7274 | 8200 | 6909 | 755F | 625F | 6F6C | 6B63 | 0100 |
| 0000156400 | 0019 | 3079 | 8302 | 040F | 1083 | 8204 | 690D | 6D5F |
| 0000156420 | 6773 | 705F | 7261 | 6D61 | 745F | 0169 | 0007 | 837F |
| 0000156440 | 0085 | 0B83 | 0104 | 0010 | 827F | 7404 | 7079 | 0065 |
| 0000156460 | 0582 | 6176 | 756C | 0265 | 0101 | 8000 | 1C01 | 7900 |
| 0000156500 | 9085 | 0900 | 1383 | 8304 | 0414 | 0E82 | 5F69 | 736D |
| 0000156520 | 5F67 | 6568 | 6461 | 7265 | 745F | 0169 | 001C | 837F |
| 0000156540 | 0081 | 8183 | 8300 | 0085 | 8583 | 8300 | 0084 | 8583 |
| 0000156560 | 8300 | 0085 | 8183 | 8300 | 0085 | 4701 | 7F00 | 0482 |
| 0000156600 | 5F71 | 6469 | 8200 | 7306 | 756F | 6372 | 0265 | 0382 |
| 0000156620 | 6970 | 0464 | 0382 | 6974 | 0664 | 0482 | 6572 | 7073 |
| 0000156640 | 8208 | 7208 | 7365 | 5F70 | 6974 | 0A64 | 0782 | 706F |
| 0000156660 | 635F | 646F | 0C65 | 0482 | 7974 | 6570 | 820E | 7304 |
| 0000156700 | 7A69 | 1065 | 1501 | 7900 | C085 | 0200 | 1783 | 8304 |
| 0000156720 | 0418 | 0782 | 5F69 | 736D | 5F67 | 6974 | 0501 | 7800 |
| 0000156740 | 8330 | 040E | 0701 | 7F00 | 1283 | 8304 | 0416 | 1701 |
| 0000156760 | 7F00 | 0682 | 6568 | 6461 | 7265 | 8200 | 700A | 7261 |
| 0000157000 | 6D61 | 6C5F | 7369 | 1274 | 0101 | 8000 | 0101 | 8000 |
| 0000157020 | 0701 | 7A00 | 8373 | 041C | 0082 | 0701 | 7A00 | 8373 |
| 0000157040 | 0415 | 0082 | 0101 | 8000 | 0101 | 8000 | 0101 | 8000 |
| 0000157060 | 0101 | 8000 | 0101 | 8000 | 0101 | 8000 | 0101 | 8000 |
| * | | | | | | | | |
| 0000157240 | 0101 | 8000 | 0101 | 8000 | 0701 | 7F00 | 1C83 | 8304 |
| 0000157260 | 041B | 0A01 | 7500 | 8380 | 0081 | 0273 | 3E83 | 0104 |
| 0000157300 | 0007 | 837F | 041C | 1B83 | 0104 | 000A | 8075 | 8183 |
| 0000157320 | 7300 | 8302 | 0440 | 0101 | 8000 | 0101 | 8000 | 0401 |
| 0000157340 | 7F00 | 1C83 | 0104 | 000A | 8075 | 8183 | 7300 | 8301 |
| 0000157360 | 0444 | 0701 | 7F00 | 1C83 | 8304 | 041B | 0A01 | 7500 |
| 0000157400 | 8380 | 0081 | 0273 | 4683 | 0104 | 0001 | 0180 | 0001 |
| 0000157420 | 0180 | 0016 | 3079 | 8303 | 0203 | 0483 | 8202 | 280A |
| 0000157440 | 6E75 | 6174 | 6767 | 6465 | 6929 | 0A01 | 7F00 | 8183 |
| 0000157460 | 8300 | 0081 | 8183 | 0100 | 001C | 827F | 7006 | 6361 |
| 0000157500 | 5F6B | 0068 | 0682 | 6966 | 656C | 685F | 8202 | 6606 |
| 0000157520 | 6E75 | 5F63 | 0468 | 0101 | 8000 | 0101 | 8000 | 0101 |
| 0000157540 | 8000 | 0101 | 8000 | 0101 | 8000 | 0101 | 8000 | 0101 |
| * | | | | | | | | |
| 0000157740 | 8000 | 0501 | 7800 | 8350 | 0080 | 0501 | 7800 | 8328 |
| 0000157760 | 0080 | 0101 | 8000 | 0101 | 8000 | 0101 | 8000 | 0101 |
| 0000160000 | 8000 | 0101 | 8000 | 0101 | 8000 | 0101 | 8000 | 0101 |
| * | | | | | | | | |
| 0000162400 | 8000 | 0101 | 8000 | 0101 | 8000 | 0101 | 8000 | 0701 |
| 0000162420 | 7A00 | 8373 | 0372 | 0082 | 0A01 | 7500 | 8380 | 0081 |
| 0000162440 | 0064 | 0183 | 0102 | 0001 | 0180 | 0001 | 0130 | 0001 |
| 0000162460 | 0180 | 0001 | 0180 | 0001 | 0180 | 0001 | 0180 | 0001 |
| * | | | | | | | | |
| 0000164160 | 0180 | 0001 | 0180 | 0001 | 0180 | 0001 | 0180 | 001B |
| 0000164200 | 2079 | 8309 | 044A | 4B83 | 8204 | 690F | 755F | 6D5F |
| 0000164220 | 6773 | 705F | 7261 | 6D61 | 745F | 0169 | 001C | 837F |
| 0000164240 | 0081 | 8583 | 8300 | 0082 | 8683 | 8300 | 0088 | 8083 |
| 0000164260 | 8300 | 0084 | C083 | 8300 | 00C0 | 6A01 | 7F00 | 0982 |
| 0000164300 | 5F69 | 5F75 | 6873 | 726F | 0074 | 0A82 | 5F69 | 5F75 |
| 0000164320 | 7375 | 6F68 | 7472 | 8200 | 6908 | 755F | 6C5F | 6E6F |
| 0000164340 | 0067 | 0982 | 5F69 | 5F75 | 6C75 | 6E6F | 0067 | 0982 |
| 0000164360 | 5F69 | 5F75 | 6C66 | 616F | 0074 | 0882 | 5F69 | 5F75 |
| 0000164400 | 6863 | 7261 | 8200 | 6909 | 755F | 755F | 6863 | 7261 |

```
THU MAR 14 17:39:32 1991  IH.DLL  PAGE 54, LINE 3128

0000164420  8200  6907  755F  735F  7274  8200  6909  755F
0000164440  625F  6F6C  6B63  0100  0019  3079  8302  044D
0000164460  4E83  8204  690D  6D5F  6773  705F  7261  6D61
0000164500  745F  0169  0007  837F  0085  4983  0104  0010
0000164520  827F  7404  7079  0065  0582  6176  756C  0265
0000164540  0101  8000  1C01  7900  9085  0900  5183  8304
0000164560  0452  0E82  5F69  736D  5F67  6568  6461  7265
0000164600  745F  0169  001C  837F  0081  8183  8300  0085
0000164620  8583  8300  0084  8583  8300  0085  8183  8300
0000164640  0085  4701  7F00  0482  5F71  6469  8200  7306
0000164660  756F  6372  0265  0382  6970  0464  0382  6974
0000164700  0664  0482  6572  7073  8208  7208  7365  5F70
0000164720  6974  0A64  0782  706F  635F  646F  0C65  0482
0000164740  7974  6570  820E  7304  7A69  1065  1501  7900
0000164760  C085  0200  5583  8304  0456  0782  5F69  736D
0000165000  5F67  6974  0501  7800  8330  044C  0701  7F00
0000165020  5083  8304  0454  1701  7F00  0682  6568  6461
0000165040  7265  8200  700A  7261  6D61  6C5F  7369  1274
0000165060  0101  8000  0101  8000  0701  7A00  8373  045A
0000165100  0082  0701  7A00  8373  0453  0082  0101  8000
0000165120  0101  8000  0101  8000  0101  8000  0101  8000
0000165140  0101  8000  0101  8000  0101  8000  0701  7A00
0000165160  8373  0464  0082  0A01  7500  8380  0081  0073
0000165200  0183  0102  0001  0180  0001  0180  0001  0180
0000165220  0001  0180  0001  0180  0001  0180  0001  0180
*
0000166260  0001  0180  0001  0180  0001  0180  0007  837F
0000166300  0459  C183  0100  000A  8075  8183  7300  8302
0000166320  04F3  0101  8000  0501  7800  8350  0080  0501
0000166340  7800  8338  0080  0501  7800  8360  0082  0401
0000166360  7F00  5A83  0104  000A  8075  8183  7300  8301
0000166400  04F9  0101  8000  0701  7800  8885  8300  0080
0000166420  0401  7F00  5A83  0104  000A  8075  8183  7300
0000166440  8301  04FD  0D01  7F00  8183  8300  0085  8583
0000166460  8300  0459  0A01  7500  8380  0081  0473  FF83
0000166500  0104  0001  0180  0005  5878  8083  0100  0004
0000166520  837F  00C1  0A01  7500  8380  0081  0173  0383
0000166540  0105  0001  0180  0005  7878  8083  0100  0007
0000166560  837F  0081  6383  0104  000A  8075  8183  7300
0000166600  8302  0507  0A01  7500  8380  0081  0064  0183
0000166620  0102  0001  0180  0016  3079  8303  0203  0483
0000166640  8202  280A  6E75  6174  6767  6465  6929  0A01
0000166660  7F00  8183  8300  0081  8183  0100  001C  827F
0000166700  7006  6361  5F6B  0068  0682  6966  656C  685F
0000166720  8202  6606  6E75  5F63  0468  0101  8000  0101
0000166740  8000  0101  8000  0101  8000  0101  8000  0101
*
0000167140  8000  0101  8000  0501  7800  8358  0080  0501
0000167160  7800  8328  0080  0101  8000  0101  8000  0101
0000167200  8000  0101  8000  0101  8000  0101  8000  1301
0000167220  7900  0240  3183  8302  0232  0782  505F  494F
0000167240  544E  694C  0701  7F00  8283  8300  0082  0901
0000167260  7F00  0182  0078  0182  0479  0101  8000  0101
0000167300  8000  0101  8000  0101  8000  0101  8000  0101
*
0000170600  8000  0101  8000  0101  8000  0101  8000  1301
0000170620  7900  0230  E983  8302  02EA  0782  4D5F  5855
0000170640  4553  694D  0701  7F00  8583  8300  00C0  0F01
0000170660  7F00  0482  657A  6F72  8200  6804  6573  026D
```

```
THU MAR 14 17:39:32 1991  IH.DLL  PAGE 55, LINE 3187

0000170700  0101  8000  1901  7900  1085  0203  EE83  8302
0000170720  02EF  0B82  4D5F  5855  4553  4C4D  5349  6954
0000170740  0701  7800  0085  8303  02E8  0701  7F00  8583
0000170760  8300  02ED  0F01  7F00  0482  6D63  7378  8200
0000171000  6104  786D  0273  0101  8000  0101  8000  0101
0000171020  8000  0101  8000  0101  8000  0101  8000  0101
*
0000171600  8000  1301  7900  D085  0600  5083  8303  0351
0000171620  0582  515F  534D  6947  1301  7F00  C083  8300
0000171640  0085  C083  8300  00C0  8683  8300  0230  2701
0000171660  7F00  0482  7768  646E  8200  6D03  6773  8204
0000171700  6D03  3170  8206  6D03  3270  820A  7404  6D69
0000171720  0E65  0382  7470  126C  0101  8000  0101  8000
0000171740  0101  8000  0101  8000  0101  8000  0101  8000
*
0000172000  0101  8000  0101  8000  0101  8000  0701  7A00
0000172020  8373  034F  0082  0101  8000  0101  8000  0101
0000172040  8000  0101  8000  0101  8000  0101  8000  0101
*
0000172540  8000  0101  8000  0701  7A00  8373  03B5  0082
0000172560  0A01  7500  8380  0081  0064  0183  0102  0001
0000172600  0180  0001  0180  0001  0180  0001  0180  0001
*
0000173320  0180  0001  0180  0001  0180  0001  0180  0012
0000173340  6079  8305  040F  1083  8204  5F06  6F69  7562
0000173360  6966  1001  7F00  C083  8300  0081  C083  8300
0000173400  0080  8083  0100  0027  827F  5F04  7470  0072
0000173420  0482  635F  746E  8204  5F05  6162  6573  8206
0000173440  5F05  6C66  6761  820A  5F05  6966  656C  010B
0000173460  0001  0180  0007  737A  0E83  8204  0100  0001
0000173500  0180  0001  0180  0001  0180  0001  0180  0001
*
0000174420  0180  0001  0180  0001  0180  001B  2079  8309
0000174440  048B  8C83  8204  690F  755F  6D5F  6773  705F
0000174460  7261  6D61  745F  0169  001C  837F  0081  8583
0000174500  8300  0082  8683  8300  0088  8083  8300  0084
0000174520  C083  8300  00C0  6A01  7F00  0982  5F69  5F75
0000174540  6873  726F  0074  0A82  5F69  5F75  7375  6F68
0000174560  7472  8200  6908  755F  6C5F  6E6F  0067  0982
0000174600  5F69  5F75  6C75  6E6F  0067  0982  5F69  5F75
0000174620  6C66  616F  0074  0882  5F69  5F75  6863  7261
0000174640  8200  6909  755F  755F  6863  7261  8200  6907
0000174660  755F  735F  7274  8200  6909  755F  625F  6F6C
0000174700  6B63  0100  0019  3079  8302  048E  8F83  8204
0000174720  690D  6D5F  6773  705F  7261  6D61  745F  0169
0000174740  0007  837F  0085  8A83  0104  0010  827F  7404
0000174760  7079  0065  0582  6176  756C  0265  0101  8000
0000175000  1C01  7900  9085  0900  9283  8304  0493  0E82
0000175020  5F69  736D  5F67  6568  6461  7265  745F  0169
0000175040  001C  837F  0081  8183  8300  0085  8583  8300
0000175060  0084  8583  8300  0085  8183  8300  0085  4701
0000175100  7F00  0482  5F71  6469  8200  7306  756F  6372
0000175120  0265  0382  6970  0464  0382  6974  0664  0482
0000175140  6572  7073  8208  7208  7365  5F70  6974  0A64
0000175160  0782  706F  635F  646F  0C65  0482  7974  6570
0000175200  820E  7304  7A69  1065  1501  7900  C085  0200
0000175220  9683  8304  0497  0782  5F69  736D  5F67  6974
0000175240  0501  7800  8330  048D  0701  7F00  9183  8304
0000175260  0495  1701  7F00  0682  6568  6461  7265  8200
```

THU MAR 14 17:39:32 1991 IH.DLL PAGE 56, LINE 3246

```
0000175300  700A  7261  6D61  6C5F  7369  1274  0101  8000
0000175320  0101  8000  0701  7A00  8373  049B  0082  0701
0000175340  7A00  8373  0494  0082  0101  8000  0101  8000
0000175360  0101  8000  0101  8000  0101  8000  0101  8000
0000175400  0101  8000  0101  8000  0701  7A00  8373  04A5
0000175420  0082  0A01  7500  8380  0081  0073  0183  0102
0000175440  0001  0180  0001  0180  0001  0180  0001  0180
*
0000176140  0001  0180  0007  737A  1283  8204  0100  0001
0000176160  0180  0001  0180  0001  0180  0001  0180  0001
0000176200  0180  0001  0180  0007  737A  A483  8204  0100
0000176220  0001  0180  0001  0180  0001  0180  0001  0180
*
0000176540  0001  0180  0001  0180  0001  0180  0007  8578
0000176560  0080  8683  0100  0005  4078  8183  0100  0007
0000176600  8578  0080  A483  0104  0018  8579  6430  8304
0000176620  053B  3C83  8205  280A  6E75  6174  6767  6465
0000176640  6929  0701  7800  0085  8364  049B  0D01  7F00
0000176660  8583  8300  0085  8583  8300  053A  2001  7F00
0000176700  0782  6F6E  5F66  736D  0067  0582  6966  7372
0000176720  0274  0482  616C  7473  8204  6D03  6773  0106
0000176740  0018  8579  0CB0  8304  053F  4083  8205  280A
0000176760  6E75  6174  6767  6465  6929  0701  7800  8085
0000177000  830C  049B  0D01  7F00  8583  8300  0085  8583
0000177020  8300  053E  2001  7F00  0782  6F6E  5F66  736D
0000177040  0067  0582  6966  7372  0274  0482  616C  7473
0000177060  8204  6D03  6773  0106  0018  8579  0CB0  8304
0000177100  0542  4383  8205  280A  6E75  6174  6767  6465
0000177120  6929  0D01  7F00  8583  8300  0085  8583  8300
0000177140  053E  2001  7F00  0782  6F6E  5F66  736D  0067
0000177160  0582  6966  7372  0274  0482  616C  7473  8204
0000177200  6D03  6773  0106  0007  837F  049A  C183  0100
0000177220  000A  8075  8183  6400  8302  0544  0101  8000
0000177240  0101  8000  0501  7800  8370  0080  0501  7800
0000177260  8338  0080  0501  7800  8360  0082  0701  7F00
0000177300  9A83  8304  00C1  0A01  7500  8380  0081  0264
0000177320  4B83  0105  0001  0180  0007  8578  0088  8083
0000177340  0100  0007  837F  049A  C183  0100  000A  8075
0000177360  8183  6400  8302  054F  0501  7800  8378  0080
0000177400  0501  7800  8378  0080  0501  7800  8340  0080
0000177420  0701  7F00  9A83  8304  00C1  0A01  7500  8380
0000177440  0081  0264  5483  0105  000A  837F  0412  A483
0000177460  8304  049A  0A01  7500  8380  0081  0364  5683
0000177500  0105  0004  837F  049B  0A01  7500  8380  0081
0000177520  0164  5883  0105  0001  0180  0007  8578  0090
0000177540  8083  0100  0007  8578  0130  8083  0100  0004
0000177560  837F  0081  0A01  7500  8380  0081  0164  5D83
0000177600  0105  0001  0180  0007  8578  00B0  8083  0100
0000177620  0004  837F  049B  0A01  7500  8380  0081  0164
0000177640  6183  0105  0004  837F  0412  0A01  7500  8380
0000177660  0200  0164  6383  0105  0004  837F  04F7  0A01
0000177700  7500  8380  0200  0164  6583  0105  0004  837F
0000177720  00C1  0A01  7500  8380  0200  0164  6783  0105
0000177740  0004  837F  00C1  0A01  7500  8380  0200  0164
0000177760  6983  0105  0007  837F  0081  A483  0104  000A
0000200000  8075  8183  6400  8302  056B  0701  7F00  8183
0000200020  8300  04FE  0A01  7500  8380  0081  0264  6D83
0000200040  0105  0001  0180  0007  8578  0080  8083  0100
0000200060  000A  8075  8183  6400  8300  0201  0101  8000
```

THU MAR 14 17:39:32 1991 IH.DLL PAGE 57, LINE 3305

```
0000200100  1601  7900  0330  0383  8302  0204  0A82  7528
0000200120  746E  6761  6567  2964  0169  000A  837F  0081
0000200140  8183  8300  0081  1C01  7F00  0682  6170  6B63
0000200160  685F  8200  6606  6C69  5F65  0268  0682  7566
0000200200  636E  685F  0104  0001  0180  0001  0180  0001
0000200220  0180  0001  0180  0001  0180  0001  0180  0001
*
0000200420  0180  0005  4078  8083  0100  0005  2878  8083
0000200440  0100  0001  0180  0001  0180  0001  0180  0001
0000200460  0180  0001  0180  0001  0180  0001  0180  0001
*
0000201100  0180  0001  0180  0001  0180  0014  3079  8303
0000201120  0275  7683  8202  5F08  4950  4944  464E  694F
0000201140  0A01  7F00  8583  8300  0085  8583  0100  0019
0000201160  827F  7003  6469  8200  7403  6469  8202  7009
0000201200  6469  6150  6572  746E  0104  0001  0180  0001
0000201220  0180  0001  0180  0001  0180  0001  0180  0001
*
0000205420  0180  0007  8578  0080  9A83  0104  0005  2078
0000205440  8083  0100  001B  2079  8309  049C  9D83  8204
0000205460  690F  755F  6D5F  6773  705F  7261  6D61  745F
0000205500  0169  001C  837F  0081  8583  8300  0082  8683
0000205520  8300  0088  8083  8300  0084  C083  8300  00C0
0000205540  6A01  7F00  0982  5F69  5F75  6873  726F  0074
0000205560  0A82  5F69  5F75  7375  6F68  7472  8200  6908
0000205600  755F  6C5F  6E6F  0067  0982  5F69  5F75  6C75
0000205620  6E6F  0067  0982  5F69  5F75  6C66  616F  0074
0000205640  0882  5F69  5F75  6863  7261  8200  6909  755F
0000205660  755F  6863  7261  8200  6907  755F  735F  7274
0000205700  8200  6909  755F  625F  6F6C  6B63  0100  0019
0000205720  3079  8302  049F  A083  8204  690D  6D5F  6773
0000205740  705F  7261  6D61  745F  0169  0007  837F  0085
0000205760  9B83  0104  0010  827F  7404  7079  0065  0582
0000206000  6176  756C  0265  0101  8000  1C01  7900  9085
0000206020  0900  A383  8304  04A4  0EB2  5F69  736D  5F67
0000206040  6568  6461  7265  745F  0169  001C  837F  0081
0000206060  8183  8300  0085  8583  8300  0084  8583  8300
0000206100  0085  8183  8300  0085  4701  7F00  0482  5F71
0000206120  6469  8200  7306  756F  6372  0265  0382  6970
0000206140  0464  0382  6974  0664  0482  6572  7073  8208
0000206160  7208  7365  5F70  6974  0A64  0782  706F  635F
0000206200  646F  0C65  0482  7974  6570  820E  7304  7A69
0000206220  1065  1501  7900  C085  0200  A783  8304  04A8
0000206240  0782  5F69  736D  5F67  6974  0501  7800  8330
0000206260  049E  0701  7F00  A283  8304  04A6  1701  7F00
0000206300  0682  6568  6461  7265  8200  700A  7261  6D61
0000206320  6C5F  7369  1274  0101  8000  0101  8000  0701
0000206340  7A00  8373  04AC  0082  0701  7A00  8373  04A5
0000206360  0082  0101  8000  0101  8000  0101  8000  0101
0000206400  8000  0101  8000  0101  8000  0101  8000  0101
*
0000207220  8000  0401  7F00  8183  0100  000A  8075  8183
0000207240  7300  8301  0515  0101  8000  0501  7800  8338
0000207260  0080  0501  7800  8338  0080  0701  7A00  8373
0000207300  051B  0082  0A01  7500  8380  0081  0064  0183
0000207320  0102  0005  6078  8283  0100  0007  8578  00A0
0000207340  8083  0100  0005  7078  8083  0100  000A  837F
0000207360  00C5  C583  8300  00C6  0A01  7500  8380  0081
0000207400  0373  1F83  0105  0001  0180  0005  5878  8083
```

```
THU MAR 14 17:39:32 1991  IH.DLL  PAGE 58, LINE 3364

0000207420  0100  0007  8578  0080  8083  0100  0005  0878
0000207440  8083  0100  000A  837F  0081  8183  8300  00C5
0000207460  0A01  7500  8380  0081  0373  2583  0105  0007
0000207500  8578  0088  8083  0100  0004  837F  00C6  0A01
0000207520  7500  8380  0200  0173  2883  0105  0004  837F
0000207540  0085  0A01  7500  8380  0081  0173  2A83  0105
0000207560  0005  4078  8083  0100  000A  8075  8183  7300
0000207600  8300  0201  0401  7F00  8583  0100  000A  8075
0000207620  8183  7300  8301  052E  0A01  7500  8380  0081
0000207640  0073  0183  0102  0010  837F  0085  AC83  8304
0000207660  0082  8283  8300  04AB  0A01  7500  8380  0081
0000207700  0573  3183  0105  0007  837F  0085  AC83  0104
0000207720  000A  8075  8183  7300  8302  0533  0101  8000
0000207740  0501  7800  8378  0080  1001  7F00  8583  8300
0000207760  04AC  8283  8300  0082  AB83  0104  000A  8075
0000210000  8183  7300  8305  0537  0701  7F00  AC83  8304
0000210020  04AC  0A01  7500  8380  0081  0273  3983  0105
0000210040  0005  7078  8083  0100  0004  837F  00C6  0A01
0000210060  7500  8380  0081  0173  3C83  0105  0007  8578
0000210100  0080  8083  0100  0004  837F  04AC  0A01  7500
0000210120  8380  0200  0173  3F83  0105  000A  8075  8183
0000210140  6400  8300  0201  0101  8000  1601  7900  0330
0000210160  0383  8302  0204  0A82  7528  746E  6761  6567
0000210200  2964  0169  000A  837F  0081  8183  8300  0081
0000210220  1C01  7F00  0682  6170  6B63  685F  8200  6606
0000210240  6C69  5F65  0268  0682  7566  636E  685F  0104
0000210260  0001  0180  0001  0180  0001  0180  0001  0180
*
0000210460  0001  0180  0001  0180  0001  0180  0005  4878
0000210500  8083  0100  0005  2878  8083  0100  0001  0180
0000210520  0001  0180  0001  0180  0001  0180  0001  0180
*
0000211160  0001  0180  0014  3079  8303  0275  7683  8202
0000211200  5F08  4950  4944  464E  694F  0A01  7F00  8583
0000211220  8300  0085  8583  0100  0019  827F  7003  6469
0000211240  8200  7403  6469  8202  7009  6469  6150  6572
0000211260  746E  0104  0001  0180  0001  0180  0001  0180
0000211300  0001  0180  0001  0180  0001  0180  0001  0180
*
0000214360  0001  0180  0001  0180  0001  0180  0007  737A
0000214400  0A83  8204  0100  000A  8075  8183  6400  8300
0000214420  0201  0101  8000  0101  8000  0101  8000  0101
0000214440  8000  0101  8000  0101  8000  0101  8000  0101
*
0000216020  8000  0101  8000  0101  8000  0701  7800  8085
0000216040  8300  04CE  0501  7800  8320  0080  1B01  7900
0000216060  0920  D083  8304  04D1  0F82  5F69  5F75  736D
0000216100  5F67  6170  6172  5F6D  6974  1C01  7F00  8183
0000216120  8300  0085  8283  8300  0086  8883  8300  0080
0000216140  8483  8300  00C0  C083  0100  006A  827F  6909
0000216160  755F  735F  6F68  7472  8200  690A  755F  755F
0000216200  6873  726F  0074  0882  5F69  5F75  6F6C  676E
0000216220  8200  6909  755F  755F  6F6C  676E  8200  6909
0000216240  755F  665F  6F6C  7461  8200  6908  755F  635F
0000216260  6168  0072  0982  5F69  5F75  6375  6168  0072
0000216300  0782  5F69  5F75  7473  0072  0982  5F69  5F75
0000216320  6C62  636F  006B  1901  7900  0230  D383  8304
0000216340  04D4  0D82  5F69  736D  5F67  6170  6172  5F6D
0000216360  6974  0701  7F00  8583  8300  04CF  1001  7F00
```

THU MAR 14 17:39:32 1991 IH.DLL PAGE 59, LINE 3423

```
0000216400  0482  7974  6570  8200  7605  6C61  6575  0102
0000216420  0001  0180  001C  8579  0090  8309  04D7  D883
0000216440  8204  690E  6D5F  6773  685F  6165  6564  5F72
0000216460  6974  1C01  7F00  8183  8300  0081  8583  8300
0000216500  0085  8483  8300  0085  8583  8300  0081  8583
0000216520  0100  0047  827F  7104  695F  0064  0682  6F73
0000216540  7275  6563  8202  7003  6469  8204  7403  6469
0000216560  8206  7204  7365  0870  0882  6572  7073  745F
0000216600  6469  820A  6F07  5F70  6F63  6564  820C  7404
0000216620  7079  0E65  0482  6973  657A  0110  0015  8579
0000216640  00C0  8302  04DB  DC83  8204  6907  6D5F  6773
0000216660  745F  0169  0005  3078  D283  0104  0007  837F
0000216700  04D6  DA83  0104  0017  827F  6806  6165  6564
0000216720  0072  0A82  6170  6172  5F6D  696C  7473  0112
0000216740  0001  0180  0001  0180  0007  737A  E083  8204
0000216760  0100  0007  737A  D983  8204  0100  0001  0180
0000217000  0001  0180  0001  0180  0001  0180  0001  0180
*
0000217320  0001  0180  0001  0180  0001  0180  001B  3079
0000217340  8302  051A  1B83  8205  5F0F  6969  705F  7069
0000217360  5F65  6F63  6E6E  745F  0169  0007  837F  0085
0000217400  C683  0100  0012  827F  6806  6E61  6C64  0065
0000217420  0582  6573  5F6D  0270  0101  8000  0101  8000
0000217440  0101  8000  0101  8000  0101  8000  0101  8000
*
0000217520  0101  8000  0101  8000  0101  8000  0701  7A00
0000217540  8373  0519  0082  0101  8000  0101  8000  0101
0000217560  8000  0101  8000  0101  8000  0101  8000  0101
*
0000217720  8000  0101  8000  0501  7800  8320  0080  0101
0000217740  8000  1B01  7900  0460  4D83  8305  054E  0F82
0000217760  725F  7365  5F70  736D  5F67  6174  6C62  6965
0000220000  0D01  7F00  8583  8300  04E0  8683  8300  0085
0000220020  2001  7F00  0682  7069  5F63  6469  8200  6D05
0000220040  6773  705F  8202  7303  6D65  8206  7305  7465
0000220060  665F  010A  0007  8578  0780  4C83  0105  0004
0000220100  837F  0085  0A01  7500  8380  0081  0164  5083
0000220120  0105  0001  0180  0001  0180  0007  8578  0090
0000220140  8083  0100  0005  3878  8083  0100  0005  6078
0000220160  8283  0100  0007  8578  00A0  8083  0100  0005
0000220200  7078  8083  0100  0004  837F  0085  0A01  7500
0000220220  8380  0081  0164  5983  0105  0001  0180  0007
0000220240  8578  0088  8083  0100  0007  837F  0085  E083
0000220260  0104  000A  8075  8183  6400  8302  055D  0701
0000220300  7800  8085  8300  0080  0701  7800  8085  8300
0000220320  0080  0A01  7F00  E083  8304  0085  8583  0100
0000220340  000A  8075  8183  6400  8303  0561  0101  8000
0000220360  0501  7800  8378  0080  0D01  7F00  8583  8300
0000220400  0085  8283  8300  04DF  0A01  7500  8380  0081
0000220420  0464  6583  0105  0004  837F  04E0  0A01  7500
0000220440  8380  0200  0164  6783  0105  0005  4078  8083
0000220460  0100  0007  8578  00C8  8083  0100  0007  837F
0000220500  0085  8183  0100  000A  8075  8183  6400  8302
0000220520  056B  0501  7800  8370  0080  0D01  7F00  E083
0000220540  8304  0081  8583  8300  0085  0A01  7500  8380
0000220560  0081  0464  6E83  0105  0004  837F  04E0  0A01
0000220600  7500  8380  0081  0164  7083  0105  0001  0180
0000220620  0007  8578  00D8  8083  0100  0007  837F  0085
0000220640  C683  0100  000A  8075  8183  6400  8302  0574
```

THU MAR 14 17:39:32 1991 IH.DLL PAGE 60, LINE 3482

```
0000220660  0701  7F00  8583  8300  00C6  0A01  7500  8380
0000220700  0081  0264  7683  0105  0004  837F  052D  0A01
0000220720  7500  8380  0200  0164  7883  0105  0004  837F
0000220740  0081  0A01  7500  8380  0081  0164  7A83  0105
0000220760  0004  837F  00C5  0A01  7500  8380  0081  0164
0000221000  7C83  0105  0004  837F  0085  0A01  7500  8380
0000221020  0200  0164  7E83  0105  0004  837F  00C5  0A01
0000221040  7500  8380  0081  0164  8083  0105  0001  0180
0000221060  0001  0180  0016  3079  8303  0203  0483  8202
0000221100  280A  6E75  6174  6767  6465  6929  0A01  7F00
0000221120  8183  8300  0081  8183  0100  001C  827F  7006
0000221140  6361  5F6B  0068  0682  6966  656C  685F  8202
0000221160  6606  6E75  5F63  0468  0101  8000  0101  8000
0000221200  0101  8000  0101  8000  0101  8000  0101  8000
*
0000221400  0101  8000  0501  7800  8350  0080  0501  7800
0000221420  8328  0080  0101  8000  0101  8000  0101  8000
0000221440  0101  8000  0101  8000  0101  8000  0101  8000
*
0000221640  0101  8000  0101  8000  0501  7800  8368  0080
0000221660  0101  8000  0101  8000  0101  8000  0101  8000
*
0000225120  0101  8000  0701  7A00  8373  03FA  0082  0A01
0000225140  7500  8380  0081  0064  0183  0102  0001  0180
0000225160  0001  0180  0001  0180  0001  0180  0001  0180
*
0000226740  0001  0180  0001  0180  0001  0180  0007  837F
0000226760  00C0  C583  0100  000A  8075  8183  6400  8302
0000227000  04DB  0101  8000  0101  8000  0501  7800  8338
0000227020  0080  0501  7800  8360  0082  0701  7800  9885
0000227040  8300  0080  0501  7800  8318  0080  0501  7800
0000227060  8340  0080  0701  7800  9085  8300  0080  0A01
0000227100  7F00  C083  8300  0082  C583  0100  000A  8075
0000227120  8183  6400  8303  04E5  0701  7800  A885  8300
0000227140  0080  0701  7800  D885  8300  0080  0701  7800
0000227160  0085  8301  0080  0401  7F00  8583  0100  000A
0000227200  8075  8183  6400  8301  04EA  0101  8000  0701
0000227220  7800  8085  8300  0080  0401  7F00  8583  0100
0000227240  000A  8075  8183  6400  8301  04EE  0701  7800
0000227260  9885  8300  0080  0401  7F00  8583  0100  000A
0000227300  8075  8183  6400  8301  04F1  0101  8000  0501
0000227320  7800  8370  C380  0A01  7500  8380  0081  0064
0000227340  0183  0102  0001  0180  0016  3079  8303  0203
0000227360  0483  8202  280A  6E75  6174  6767  6465  6929
0000227400  0A01  7F00  8183  8300  0081  8183  0100  001C
0000227420  827F  7006  6361  5F6B  0068  0682  6966  656C
0000227440  685F  8202  6606  6E75  5F63  0468  0101  8000
0000227460  0101  8000  0101  8000  0101  8000  0101  8000
*
0000227660  0101  8000  0101  8000  0501  7800  8348  0080
0000227700  0501  7800  8328  0080  0101  8000  0101  8000
0000227720  0101  8000  0101  8000  0101  8000  0101  8000
*
0000230400  0101  8000  0101  8000  0701  7A00  8373  027B
0000230420  0082  0A01  7500  8380  0200  0064  0183  0102
0000230440  0001  0180  0001  0180  0001  0180  0001  0180
*
0000234020  0001  0180  0001  0180  000D  837F  027A  8583
0000234040  8300  00C0  C583  0100  000A  8075  8183  6400
```

THU MAR 14 17:39:32 1991 IH.DLL PAGE 61, LINE 3541

```
0000234060  8304 043A 0101 8000 0101 8000 0501 7800
0000234100  8378 0080 0501 7800 8338 0080 0701 7A00
0000234120  8373 0441 0082 0A01 7500 8380 0081 0064
0000234140  0183 0102 0005 6078 8283 0100 000A 8075
0000234160  0083 6402 8300 0201 0A01 7500 8380 0081
0000234200  0064 0183 0102 0001 0180 0016 3079 8303
0000234220  0203 0483 8202 280A 6E75 6174 6767 6465
0000234240  6929 0A01 7F00 8183 8300 0081 8183 0100
0000234260  001C 827F 7006 6361 5F6B 0068 0682 6966
0000234300  656C 685F 8202 6606 6E75 5F63 0468 0701
0000234320  7A00 8373 00C0 0082 0101 8000 0101 8000
0000234340  0101 8000 0101 8000 0101 8000 0101 8000
*
0000234540  0501 7800 8350 0080 0501 7800 8328 0080
0000234560  0101 8000 0101 8000 0101 8000 0101 8000
*
0000236140  0101 8000 0101 8000 1301 7900 0230 E983
0000236160  8302 02EA 0782 4D5F 5855 4553 694D 0701
0000236200  7F00 8583 8300 00C0 0F01 7F00 0482 657A
0000236220  6F72 8200 6804 6573 026D 0101 8000 1901
0000236240  7900 1085 0203 EE83 8302 02EF 0B82 4D5F
0000236260  5855 4553 4C4D 5349 6954 0701 7800 0085
0000236300  8303 02E8 0701 7F00 8583 8300 02ED 0F01
0000236320  7F00 0482 6D63 7378 8200 6104 786D 0273
0000236340  0101 8000 0101 8000 0101 8000 0101 8000
*
0000240640  0101 8000 0701 7A00 8373 0422 0082 0A01
0000240660  7500 8380 0081 0064 0183 0102 0001 0180
0000240700  0001 0180 0001 0180 0001 0180 0001 0180
*
0000242300  0001 0180 0001 0180 0001 0180 001B 2079
0000242320  8309 04E8 E983 8204 690F 755F 6D5F 6773
0000242340  705F 7261 6D61 745F 0169 001C 837F 0081
0000242360  8583 8300 0082 8683 8300 0088 8083 8300
0000242400  0084 C083 8300 00C0 6A01 7F00 0982 5F69
0000242420  5F75 6873 726F 0074 0A82 5F69 5F75 7375
0000242440  6F68 7472 8200 6908 755F 6C5F 6E6F 0067
0000242460  0982 5F69 5F75 6C75 6E6F 0067 0982 5F69
0000242500  5F75 6C66 616F 0074 0882 5F69 5F75 6863
0000242520  7261 8200 6909 755F 755F 6863 7261 8200
0000242540  6907 755F 735F 7274 8200 6909 755F 625F
0000242560  6F6C 6B63 0100 0019 3079 8302 04EB EC83
0000242600  8204 690D 6D5F 6773 705F 7261 6D61 745F
0000242620  0169 0007 837F 0085 E783 0104 0010 827F
0000242640  7404 7079 0065 0582 6176 756C 0265 0101
0000242660  8000 1C01 7900 9085 0900 EF83 8304 04F0
0000242700  0E82 5F69 736D 5F67 6568 6461 7265 745F
0000242720  0169 001C 837F 0081 8183 8300 0085 8583
0000242740  8300 0084 8583 8300 0085 8183 8300 0085
0000242760  4701 7F00 0482 5F71 6469 8200 7306 756F
0000243000  6372 0265 0382 6970 0464 0382 6974 0664
0000243020  0482 6572 7073 8208 7208 7365 5F70 6974
0000243040  0A64 0782 706F 635F 646F 0C65 0482 7974
0000243060  6570 820E 7304 7A69 1065 15C1 7900 C085
0000243100  0200 F383 8304 04F4 0782 5F69 736D 5F67
0000243120  6974 0501 7800 8330 04EA 0701 7F00 EE83
0000243140  8304 04F2 1701 7F00 0682 6568 6461 7265
0000243160  8200 700A 7261 6D61 6C5F 7369 1274 0101
0000243200  8000 0101 8000 0101 8000 0701 7A00 8373
```

THU MAR 14 17:39:32 1991 IH.DLL PAGE 62, LINE 3600

```
0000243220  04F1  0082  0101  8000  0101  8000  0101  8000
0000243240  0101  8000  0101  8000  0101  8000  0101  8000
*
0000244020  0101  8000  0101  8000  0701  7A00  8373  00C6
0000244040  0082  0101  8000  0101  8000  0101  8000  0101
0000244060  8000  0101  8000  0101  8000  0101  8000  1A01
0000244100  7900  4085  0901  6483  8305  0565  0C82  695F
0000244120  6370  745F  6261  656C  735F  0169  0007  8578
0000244140  00A0  8083  0100  001C  837F  0085  8183  8300
0000244160  0085  8583  8300  0563  8583  8300  0086  8583
0000244200  8300  04F8  4901  7F00  0582  6D65  7470  0079
0000244220  0482  7270  636F  8202  7003  6469  8204  7403
0000244240  6469  8206  7009  7069  5F65  616E  656D  8208
0000244260  6802  1C70  0382  6573  1E6D  0782  6F63  6E6E
0000244300  6365  2274  0982  736D  5F67  7562  5F66  2470
0000244320  0701  7800  0085  8314  0562  0A01  7500  8380
0000244340  0081  0064  0183  0102  0001  0180  0001  0180
0000244360  0005  3878  8083  0100  0005  6078  8283  0100
0000244400  000A  8075  0083  6402  8300  0201  0101  8000
0000244420  0501  7800  8370  0080  0501  7800  8320  0080
0000244440  0701  7800  0085  8301  0085  0501  7800  8340
0000244460  0080  0701  7800  D885  8300  0080  0701  7800
0000244500  F885  8301  0080  0701  7800  8885  8300  0080
0000244520  0701  7800  1885  8301  0080  0701  7800  0885
0000244540  8301  0080  0401  7F00  F883  0104  000A  8075
0000244560  8183  6400  8301  0577  0101  8000  0701  7800
0000244600  8085  8300  0080  0401  7F00  F883  0104  000A
0000244620  8075  8183  6400  8301  057B  0101  8000  0501
0000244640  7800  8358  0080  1301  7F00  8183  8300  0085
0000244660  8583  8300  00C0  8583  8300  00C5  0A01  7500
0000244700  8380  0081  0664  7F83  0105  0007  8578  0088
0000244720  8083  0100  0013  837F  0085  8183  8300  0085
0000244740  8583  8300  00C0  8583  0100  000A  8075  0083
0000244760  6402  8306  0582  0A01  7F00  8583  8300  0085
0000245000  8583  0100  000A  8075  0083  6402  8303  0584
0000245020  0401  7F00  8583  0100  000A  8075  0083  6402
0000245040  8301  0586  0701  7F00  8583  8300  00C1  0A01
0000245060  7500  8380  0081  0264  8883  0105  0005  5078
0000245100  8083  0100  0007  837F  0085  C583  0100  000A
0000245120  8075  8183  6400  8302  058B  0101  8000  0501
0000245140  7800  8348  0080  0701  7F00  8583  8300  00C5
0000245160  0A01  7500  8380  0081  0264  8F83  0105  0007
0000245200  837F  0085  C583  0100  000A  8075  8183  6400
0000245220  8302  0591  0501  7800  8340  0080  0701  7F00
0000245240  8583  8300  00C5  0A01  7500  8380  0081  0264
0000245260  9483  0105  0001  0180  0005  7878  8083  0100
0000245300  0007  837F  0081  C583  0100  000A  8075  8183
0000245320  6400  8302  0598  0701  7F00  8583  8300  055A
0000245340  0A01  7500  8380  0081  0264  9A83  0105  0007
0000245360  837F  0085  0583  0102  000A  8075  8183  6400
0000245400  8302  059C  0401  7F00  C683  0100  000A  8075
0000245420  0083  6402  8301  059E  0A01  7500  8380  00C6
0000245440  0064  0183  0502  0111  0000  2000  0001  3F00
0000245460  3804  1000  2B00  0000  0400  6911  5F69  7061
0000245500  5F70  7274  6E61  5F73  7566  636E  040D  000A
0000245520  041C  6907  6D5F  6773  705F  040D  0006  041B
0000245540  6F07  6D5F  6773  705F  0408  FFFC  0081  7202
0000245560  0163  2002  3801  4100  3804  1000  2B00  0000
0000245600  0400  6911  5F69  7069  5F63  7274  6E61  5F73
```

THU MAR 14 17:39:32 1991 IH.DLL PAGE 63, LINE 3659

| | | | | | | | | |
|---|---|---|---|---|---|---|---|---|
| 0000245620 | 7566 | 636E | 040F | 000A | 041C | 6909 | 6370 | 6D5F |
| 0000245640 | 6773 | 705F | 040B | 0006 | 041B | 6D05 | 6773 | 705F |
| 0000245660 | 0408 | FFFC | 0081 | 7202 | 0163 | 2202 | 7001 | 4500 |
| 0000245700 | 2804 | 1000 | 1B00 | 0000 | 0400 | 6913 | 5F69 | 6162 |
| 0000245720 | 6374 | 5F68 | 7274 | 6E61 | 5F73 | 7566 | 636E | 040B |
| 0000245740 | 0006 | 041C | 6D05 | 6773 | 705F | 0408 | FFFC | 0081 |
| 0000245760 | 7202 | 0163 | 2202 | 9801 | 4700 | 4004 | 1001 | 3300 |
| 0000246000 | 0001 | 0400 | 6913 | 5F69 | 736D | 5F67 | 6C62 | 636F |
| 0000246020 | 5F6B | 6F74 | 6D5F | 6773 | 0411 | 000A | 041C | 620B |
| 0000246040 | 6F6C | 6B63 | 6D5F | 6773 | 705F | 040B | 0006 | 041B |
| 0000246060 | 6D05 | 6773 | 705F | 040D | FFF2 | 041C | 6907 | 6D5F |
| 0000246100 | 6773 | 705F | 040C | FFF6 | 041C | 6306 | 706F | 5F79 |
| 0000246120 | 0C70 | FC04 | 81FF | 0600 | 6F63 | 7970 | 665F | 0408 |
| 0000246140 | FFFA | 0081 | 7202 | 0163 | 0502 | 000D | 1A00 | 0500 |
| 0000246160 | 0111 | 0000 | 1800 | D801 | F401 | D504 | 1601 | C700 |
| 0000246200 | 0001 | 0400 | 6909 | 675F | 7465 | 6D5F | 6773 | 040B |
| 0000246220 | 000A | 0459 | 6D05 | 6773 | 705F | 0414 | 0006 | 00C1 |
| 0000246240 | 740E | 6172 | 736E | 665F | 6E75 | 5F63 | 7265 | 0C72 |
| 0000246260 | FA04 | C0FF | 0600 | 5F5F | 7974 | 6570 | 040F | FFF0 |
| 0000246300 | 0085 | 5F09 | 625F | 5F78 | 7974 | 6570 | 040D | FFE0 |
| 0000246320 | 0371 | 5F07 | 705F | 6972 | 746E | 040B | FFD8 | 0202 |
| 0000246340 | 5F05 | 6C5F | 6C76 | 040D | FFE4 | 04F8 | 5F07 | 635F |
| 0000246360 | 6F6C | 6B63 | 040D | FFF4 | 00C0 | 5F07 | 735F | 6174 |
| 0000246400 | 6B63 | 040E | FFDE | 0081 | 5F08 | 725F | 7465 | 6176 |
| 0000246420 | 0F6C | D204 | 81FF | 0900 | 7563 | 7272 | 705F | 6F72 |
| 0000246440 | 0D63 | D404 | 5AFF | 0704 | 5F69 | 736D | 5F67 | 1670 |
| 0000246460 | F804 | 81FF | 1000 | 5F69 | 7274 | 6E61 | 5F73 | 7566 |
| 0000246500 | 636E | 655F | 7272 | 0408 | FFF2 | 0081 | 7202 | 0E63 |
| 0000246520 | 6805 | 0500 | F600 | 0604 | 5F5F | 7566 | 636E | 0201 |
| 0000246540 | 011F | 03AD | 04FA | 014B | 0016 | 013D | 0000 | 1004 |
| 0000246560 | 5F69 | 6E69 | 6573 | 7472 | 695F | 6370 | 6D5F | 6773 |
| 0000246600 | 040B | 0006 | 045A | 6D05 | 6773 | 705F | 040C | FFFA |
| 0000246620 | 00C0 | 5F06 | 745F | 7079 | 0F65 | F204 | 85FF | 0900 |
| 0000246640 | 5F5F | 7862 | 745F | 7079 | 0D65 | E204 | 71FF | 0703 |
| 0000246660 | 5F5F | 7270 | 6E69 | 0B74 | DA04 | 02FF | 0502 | 5F5F |
| 0000246700 | 766C | 0D6C | E604 | F8FF | 0704 | 5F5F | 6C63 | 636F |
| 0000246720 | 0D6B | F604 | C0FF | 0700 | 5F5F | 7473 | 6361 | 0E6B |
| 0000246740 | E004 | 81FF | 0800 | 5F5F | 6572 | 7674 | 6C61 | 0408 |
| 0000246760 | FFF4 | 0081 | 7202 | 0E63 | 8005 | 0500 | FC00 | 0604 |
| 0000247000 | 5F5F | 7566 | 636E | 0201 | 011F | 04F8 | 04FE | 014B |
| 0000247020 | 0016 | 013D | 0000 | 1004 | 5F69 | 6E69 | 6573 | 7472 |
| 0000247040 | 615F | 7070 | 6D5F | 6773 | 040B | 0006 | 045A | 6D05 |
| 0000247060 | 6773 | 705F | 040C | FFFA | 00C0 | 5F06 | 745F | 7079 |
| 0000247100 | 0F65 | F204 | 85FF | 0900 | 5F5F | 7862 | 745F | 7079 |
| 0000247120 | 0D65 | E204 | 71FF | 0703 | 5F5F | 7270 | 6E69 | 0B74 |
| 0000247140 | DA04 | 02FF | 0502 | 5F5F | 766C | 0D6C | E604 | F8FF |
| 0000247160 | 0704 | 5F5F | 6C63 | 636F | 0D6B | F604 | C0FF | 0700 |
| 0000247200 | 5F5F | 7473 | 6361 | 0E6B | E004 | 81FF | 0800 | 5F5F |
| 0000247220 | 6572 | 7674 | 6C61 | 0408 | FFF4 | 0081 | 7202 | 0E63 |
| 0000247240 | A005 | 0500 | FC00 | 0604 | 5F5F | 7566 | 636E | 0201 |
| 0000247260 | 0119 | 0643 | 0500 | 01BE | 0016 | 01B0 | 0000 | 0A04 |
| 0000247300 | 5F69 | 616D | 656B | 6D5F | 6773 | 040E | 000E | 0081 |
| 0000247320 | 6D08 | 6773 | 745F | 7079 | 0D65 | 0C04 | 8500 | 0700 |
| 0000247340 | 706F | 635F | 646F | 0A65 | 0A04 | 8500 | 0400 | 6973 |
| 0000247360 | 657A | 040B | 0006 | 0459 | 6D05 | 6773 | 705F | 040C |
| 0000247400 | FFFA | 00C0 | 5F06 | 745F | 7079 | 0F65 | F204 | 85FF |
| 0000247420 | 0900 | 5F5F | 7862 | 745F | 7079 | 0D65 | E204 | 71FF |
| 0000247440 | 0703 | 5F5F | 7270 | 6E69 | 0B74 | DA04 | 02FF | 0502 |
| 0000247460 | 5F5F | 766C | 0D6C | E604 | F8FF | 0704 | 5F5F | 6C63 |

THU MAR 14 17:39:32 1991 IH.DLL PAGE 64, LINE 3718

| | | | | | | | | |
|---|---|---|---|---|---|---|---|---|
| 0000247500 | 636F | 0D6B | F604 | C0FF | 0700 | 5F5F | 7473 | 6361 |
| 0000247520 | 0E6B | E004 | 81FF | 0800 | 5F5F | 6572 | 7674 | 6C61 |
| 0000247540 | 040D | FFD6 | 045A | 6907 | 6D5F | 6773 | 705F | 0408 |
| 0000247560 | FFF4 | 0081 | 7202 | 0E63 | C005 | 0500 | 0200 | 0605 |
| 0000247600 | 5F5F | 7566 | 636E | 0201 | 011D | 0801 | 0504 | 0218 |
| 0000247620 | 0016 | 020A | 0000 | 0E04 | 5F69 | 6573 | 5F74 | 7270 |
| 0000247640 | 6F69 | 6972 | 7974 | 040C | 0006 | 00C1 | 6906 | 706E |
| 0000247660 | 705F | 0C72 | FA04 | C0FF | 0600 | 5F5F | 7974 | 6570 |
| 0000247700 | 040F | FFF0 | 0085 | 5F09 | 625F | 5F78 | 7974 | 6570 |
| 0000247720 | 040D | FFDE | 0371 | 5F07 | 705F | 6972 | 746E | 040B |
| 0000247740 | FFD6 | 0202 | 5F05 | 6C5F | 6C76 | 040D | FFE2 | 04F8 |
| 0000247760 | 5F07 | 635F | 6F6C | 6B63 | 040D | FFF6 | 00C0 | 5F07 |
| 0000250000 | 735F | 6174 | 6B63 | 040E | FFDC | 0081 | 5F08 | 725F |
| 0000250020 | 7465 | 6176 | 076C | F204 | 81FF | 0100 | 0769 | EE04 |
| 0000250040 | 81FF | 0100 | 086A | F404 | 81FF | 0200 | 6372 | 050E |
| 0000250060 | 00DA | 0005 | 0506 | 5F06 | 665F | 6E75 | 0163 | 1F02 |
| 0000250100 | 1901 | 080A | 6505 | 1601 | 5700 | 0001 | 0400 | 6910 |
| 0000250120 | 735F | 7465 | 745F | 6172 | 736E | 665F | 6E75 | 0A63 |
| 0000250140 | 0A04 | 8100 | 0400 | 5F71 | 6469 | 0410 | 0006 | 0463 |
| 0000250160 | 740A | 6172 | 736E | 665F | 6E75 | 0C63 | FA04 | C0FF |
| 0000250200 | 0600 | 5F5F | 7974 | 6570 | 040F | FFF2 | 0085 | 5F09 |
| 0000250220 | 625F | 5F78 | 7974 | 6570 | 040D | FFE2 | 0371 | 5F07 |
| 0000250240 | 705F | 6972 | 746E | 040B | FFDA | 0202 | 5F05 | 6C5F |
| 0000250260 | 6C76 | 040D | FFE6 | 04F8 | 5F07 | 635F | 6F6C | 6B63 |
| 0000250300 | 040D | FFF6 | 00C0 | 5F07 | 735F | 6174 | 6B63 | 040E |
| 0000250320 | FFE0 | 0081 | 5F08 | 725F | 7465 | 6176 | 086C | F404 |
| 0000250340 | 81FF | 0200 | 6372 | 050E | 00F8 | 0005 | 04FC | 5F06 |
| 0000250360 | 665F | 6E75 | 0163 | 0502 | 000D | 1A00 | 0F00 | 6005 |
| 0000250400 | 0500 | C000 | 0700 | 5F42 | 4678 | 6C69 | 0F65 | 6405 |
| 0000250420 | 0500 | C000 | 0700 | 5F42 | 5078 | 6361 | 146B | 0005 |
| 0000250440 | 0000 | 8100 | 0C00 | 7842 | 445F | 6265 | 6775 | 6F4D |
| 0000250460 | 6564 | 0514 | 0000 | 0000 | 0081 | 420C | 5F78 | 6954 |
| 0000250500 | 656D | 4D73 | 646F | 0565 | 0111 | 0000 | 1C00 | 7E01 |
| 0000250520 | 450B | CE05 | 1002 | C300 | 0002 | 0400 | 690D | 5F69 |
| 0000250540 | 6567 | 5F74 | 736D | 5F67 | 4D50 | 040B | 0006 | 049A |
| 0000250560 | 6D05 | 6773 | 705F | 0414 | 000A | 00C1 | 740E | 6172 |
| 0000250600 | 736E | 665F | 6E75 | 5F63 | 7265 | 0C72 | FA04 | C0FF |
| 0000250620 | 0600 | 5F5F | 7974 | 6570 | 040F | FFEA | 0085 | 5F09 |
| 0000250640 | 625F | 5F78 | 7974 | 6570 | 040D | FFDA | 03B4 | 5F07 |
| 0000250660 | 705F | 6972 | 746E | 040B | FFD2 | 0202 | 5F05 | 6C5F |
| 0000250700 | 6C76 | 040D | FFDE | 054A | 5F07 | 635F | 6F6C | 6B63 |
| 0000250720 | 040D | FFEE | 00C0 | 5F07 | 735F | 6174 | 6B63 | 040E |
| 0000250740 | FFD8 | 0081 | 5F08 | 725F | 7465 | 6176 | 0E6C | F604 |
| 0000250760 | 5FFF | 0803 | 4D50 | 6D5F | 6773 | 705F | 040D | FFC8 |
| 0000251000 | 049B | 6907 | 6D5F | 6773 | 705F | 0410 | FFF2 | 04A4 |
| 0000251020 | 740A | 6172 | 736E | 665F | 6E75 | 0963 | CC04 | 81FF |
| 0000251040 | 0300 | 7269 | 1263 | CE04 | 12FF | 0C04 | 6162 | 6374 |
| 0000251060 | 5F68 | 6168 | 646E | 656C | 040F | FFC6 | 0081 | 6309 |
| 0000251100 | 7275 | 5F72 | 7270 | 636F | 0408 | FFEC | 0081 | 7202 |
| 0000251120 | 0E63 | 0805 | 0511 | 4800 | 0605 | 5F5F | 7566 | 636E |
| 0000251140 | 0201 | 011F | 0E4C | 054C | 0279 | 0010 | 026E | 0000 |
| 0000251160 | 1004 | 6969 | 675F | 7465 | 6D5F | 6773 | 6E5F | 5F6F |
| 0000251200 | 4D50 | 040B | 0006 | 049A | 6D05 | 6773 | 705F | 0414 |
| 0000251220 | 000A | 00C1 | 740E | 6172 | 736E | 665F | 6E75 | 5F63 |
| 0000251240 | 7265 | 0C72 | FA04 | C0FF | 0600 | 5F5F | 7974 | 6570 |
| 0000251260 | 040F | FFF0 | 0085 | 5F09 | 625F | 5F78 | 7974 | 6570 |
| 0000251300 | 040D | FFDE | 03B4 | 5F07 | 705F | 6972 | 746E | 040B |
| 0000251320 | FFD4 | 0202 | 5F05 | 6C5F | 6C76 | 040D | FFE4 | 054A |
| 0000251340 | 5F07 | 635F | 6F6C | 6B63 | 040D | FFF6 | 00C0 | 5F07 |

THU MAR 14 17:39:32 1991 IH.DLL PAGE 65, LINE 3777

| | | | | | | | | |
|---|---|---|---|---|---|---|---|---|
| 0000251360 | 735F | 6174 | 6B63 | 040E | FFDA | 0081 | 5F08 | 725F |
| 0000251400 | 7465 | 6176 | 0D6C | CE04 | 9BFF | 0704 | 5F69 | 736D |
| 0000251420 | 5F67 | 0970 | D204 | 81FF | 0300 | 7269 | 0B63 | DC04 |
| 0000251440 | 85FF | 0500 | 7564 | 6D6D | 0779 | F204 | 85FF | 0100 |
| 0000251460 | 0969 | E204 | 85FF | 0300 | 7266 | 0863 | F404 | 81FF |
| 0000251500 | 0200 | 6372 | 050E | 1124 | 0005 | 054E | 5F06 | 665F |
| 0000251520 | 6E75 | 0163 | 1D02 | C501 | 5010 | 6B05 | 1002 | 6000 |
| 0000251540 | 0002 | 040C | 690E | 5F69 | 6567 | 5F74 | 7069 | 5F63 |
| 0000251560 | 736D | 0B67 | 0604 | 9A00 | 0504 | 736D | 5F67 | 1470 |
| 0000251600 | 0A04 | C100 | 0E00 | 7274 | 6E61 | 5F73 | 7566 | 636E |
| 0000251620 | 655F | 7272 | 040C | FFFA | 00C0 | 5F06 | 745F | 7079 |
| 0000251640 | 0F65 | EA04 | 85FF | 0900 | 5F5F | 7862 | 745F | 7079 |
| 0000251660 | 0D65 | D804 | B4FF | 0703 | 5F5F | 7270 | 6E69 | 0B74 |
| 0000251700 | CC04 | 02FF | 0502 | 5F5F | 766C | 0D6C | DE04 | 4AFF |
| 0000251720 | 0705 | 5F5F | 6C63 | 636F | 0D6B | F204 | C0FF | 0700 |
| 0000251740 | 5F5F | 7473 | 6361 | 0E6B | D204 | 81FF | 0800 | 5F5F |
| 0000251760 | 6572 | 7674 | 6C61 | 040D | FFEC | 049B | 7107 | 6D5F |
| 0000252000 | 6773 | 705F | 040E | FFD4 | 049B | 6908 | 5F6E | 736D |
| 0000252020 | 5F67 | 1070 | F604 | A4FF | 0A04 | 7274 | 6E61 | 5F73 |
| 0000252040 | 7566 | 636E | 0409 | FFDC | 0085 | 6603 | 6372 | 0409 |
| 0000252060 | FFCA | 0081 | 6903 | 6372 | 0408 | FFF0 | 0081 | 7202 |
| 0000252100 | 0E63 | 5A05 | 0511 | 5200 | 0605 | 5F5F | 7566 | 636E |
| 0000252120 | 0201 | 011D | 1330 | 0555 | 0212 | 0010 | 0207 | 0000 |
| 0000252140 | 0E04 | 6969 | 675F | 7465 | 615F | 7070 | 6D5F | 6773 |
| 0000252160 | 040B | 0006 | 049A | 6D05 | 6773 | 705F | 0414 | 000A |
| 0000252200 | 00C1 | 740E | 6172 | 736E | 665F | 6E75 | 5F63 | 7265 |
| 0000252220 | 0C72 | FA04 | C0FF | 0600 | 5F5F | 7974 | 6570 | 040F |
| 0000252240 | FFEA | 0085 | 5F09 | 625F | 5F78 | 7974 | 6570 | 040D |
| 0000252260 | FFD8 | 03B4 | 5F07 | 705F | 6972 | 746E | 040B | FFCC |
| 0000252300 | 0202 | 5F05 | 6C5F | 6C76 | 040D | FFDE | 054A | 5F07 |
| 0000252320 | 635F | 6F6C | 6B63 | 040D | FFF2 | 00C0 | 5F07 | 735F |
| 0000252340 | 6174 | 6B63 | 040E | FFD2 | 0081 | 5F08 | 725F | 7465 |
| 0000252360 | 6176 | 0D6C | EC04 | 9BFF | 0704 | 5F71 | 736D | 5F67 |
| 0000252400 | 0E70 | D404 | 9BFF | 0804 | 6E69 | 6D5F | 6773 | 705F |
| 0000252420 | 0410 | FFF6 | 04A4 | 740A | 6172 | 736E | 665F | 6E75 |
| 0000252440 | 0963 | DC04 | 85FF | 0300 | 7266 | 0963 | CA04 | 81FF |
| 0000252460 | 0300 | 7269 | 0863 | F004 | 81FF | 0200 | 6372 | 050E |
| 0000252500 | 1178 | 0005 | 0552 | 5F06 | 665F | 6E75 | 0163 | 1F02 |
| 0000252520 | 4201 | 5715 | 3605 | 1001 | 2B00 | 0001 | 0400 | 6910 |
| 0000252540 | 5F69 | 6567 | 5F74 | 6162 | 6374 | 5F68 | 736D | 1167 |
| 0000252560 | 0604 | 1200 | 0B04 | 6966 | 656C | 685F | 6E61 | 6C64 |
| 0000252600 | 1065 | 0A04 | A400 | 0A04 | 7274 | 6E61 | 5F73 | 7566 |
| 0000252620 | 636E | 040B | 000E | 049A | 6D05 | 6773 | 705F | 040C |
| 0000252640 | FFFA | 00C0 | 5F06 | 745F | 7079 | 0F65 | F204 | 85FF |
| 0000252660 | 0900 | 5F5F | 7862 | 745F | 7079 | 0D65 | E204 | B4FF |
| 0000252700 | 0703 | 5F5F | 7270 | 6E69 | 0B74 | DA04 | 02FF | 0502 |
| 0000252720 | 5F5F | 766C | 0D6C | E604 | 4AFF | 0705 | 5F5F | 6C63 |
| 0000252740 | 636F | 0D6B | F604 | C0FF | 0700 | 5F5F | 7473 | 6361 |
| 0000252760 | 0E6B | E004 | 81FF | 0800 | 5F5F | 6572 | 7674 | 6C61 |
| 0000253000 | 0408 | FFF4 | 0081 | 7202 | 0E63 | 9605 | 0511 | 4E00 |
| 0000253020 | 0605 | 5F5F | 7566 | 636E | 0201 | 0120 | 1678 | 0559 |
| 0000253040 | 02BF | 0010 | 02B4 | 0000 | 1104 | 6969 | 695F | 736E |
| 0000253060 | 7265 | 5F74 | 7069 | 5F63 | 736D | 0B67 | 0604 | 9B00 |
| 0000253100 | 0504 | 736D | 5F67 | 0C70 | FA04 | C0FF | 0600 | 5F5F |
| 0000253120 | 7974 | 6570 | 040F | FFEE | 0085 | 5F09 | 625F | 5F78 |
| 0000253140 | 7974 | 6570 | 040D | FFDC | 03B4 | 5F07 | 705F | 6972 |
| 0000253160 | 746E | 040B | FFD4 | 0202 | 5F05 | 6C5F | 6C76 | 040D |
| 0000253200 | FFE2 | 054A | 5F07 | 635F | 6F6C | 6B63 | 040D | FFF2 |
| 0000253220 | 00C0 | 5F07 | 735F | 6174 | 6B63 | 040E | FFDA | 0081 |

THU MAR 14 17:39:32 1991 IH.DLL PAGE 66, LINE 3836

| | | | | | | | | |
|---|---|---|---|---|---|---|---|---|
| 0000253240 | 5F08 | 725F | 7465 | 6176 | 0D6C | F604 | C6FF | 0700 |
| 0000253260 | 5F71 | 6573 | 5F6D | 0F70 | D204 | 81FF | 0900 | 7563 |
| 0000253300 | 7272 | 705F | 6F72 | 0963 | E004 | 85FF | 0300 | 7266 |
| 0000253320 | 0863 | F004 | 81FF | 0200 | 6372 | 050E | 11FA | 0005 |
| 0000253340 | 055B | 5F06 | 665F | 6E75 | 0163 | 2402 | 3701 | 5E19 |
| 0000253360 | A105 | 1001 | 9600 | 0001 | 0400 | 6915 | 5F69 | 6E69 |
| 0000253400 | 6573 | 7472 | 695F | 6370 | 655F | 7272 | 6D5F | 6773 |
| 0000253420 | 0409 | 0006 | 0081 | 6503 | 7272 | 040C | FFFA | 00C0 |
| 0000253440 | 5F06 | 745F | 7079 | 0F65 | EE04 | 85FF | 0900 | 5F5F |
| 0000253460 | 7862 | 745F | 7079 | 0D65 | DE04 | B4FF | 0703 | 5F5F |
| 0000253500 | 7270 | 6E69 | 0B74 | D604 | 02FF | 0502 | 5F5F | 766C |
| 0000253520 | 0D6C | E204 | 4AFF | 0705 | 5F5F | 6C63 | 636F | 0D6B |
| 0000253540 | F604 | C0FF | 0700 | 5F5F | 7473 | 6361 | 0E6B | DC04 |
| 0000253560 | 81FF | 0800 | 5F5F | 6572 | 7674 | 6C61 | 040B | FFF0 |
| 0000253600 | 049B | 6D05 | 6773 | 705F | 0408 | FFF4 | 0081 | 7202 |
| 0000253620 | 0E63 | 1A05 | 0512 | 6000 | 0605 | 5F5F | 7566 | 636E |
| 0000253640 | 0201 | 0120 | 1AD8 | 0562 | 020E | 0010 | 0203 | 0000 |
| 0000253660 | 1104 | 6969 | 695F | 736E | 7265 | 5F74 | 7061 | 5F70 |
| 0000253700 | 736D | 0B67 | 0604 | 9B00 | 0504 | 736D | 5F67 | 0C70 |
| 0000253720 | FA04 | C0FF | 0600 | 5F5F | 7974 | 6570 | 040F | FFEE |
| 0000253740 | 0085 | 5F09 | 625F | 5F78 | 7974 | 6570 | 040D | FFDC |
| 0000253760 | 03B4 | 5F07 | 705F | 6972 | 746E | 040B | FFD4 | 0202 |
| 0000254000 | 5F05 | 6C5F | 6C76 | 040D | FFE2 | 054A | 5F07 | 635F |
| 0000254020 | 6F6C | 6B63 | 040D | FFF2 | 00C0 | 5F07 | 735F | 6174 |
| 0000254040 | 6B63 | 040E | FFDA | 0081 | 5F08 | 725F | 7465 | 6176 |
| 0000254060 | 0D6C | F604 | C6FF | 0700 | 5F71 | 6573 | 5F6D | 0F70 |
| 0000254100 | D204 | 81FF | 0900 | 7563 | 7272 | 705F | 6F72 | 0963 |
| 0000254120 | E004 | 85FF | 0300 | 7266 | 0863 | F004 | 81FF | 0200 |
| 0000254140 | 6372 | 050E | 123E | 0005 | 055B | 5F06 | 665F | 6E75 |
| 0000254160 | 0163 | 2202 | E601 | 641C | 2805 | 1000 | 1D00 | 0000 |
| 0000254200 | 0400 | 6913 | 5F69 | 6573 | 5F74 | 6162 | 6374 | 5F68 |
| 0000254220 | 6168 | 646E | 656C | 0411 | 0006 | 0412 | 660B | 6C69 |
| 0000254240 | 5F65 | 6168 | 646E | 656C | 0201 | 0120 | 1D0E | 0566 |
| 0000254260 | 002C | 0010 | 0021 | 0000 | 1104 | 6969 | 715F | 625F |
| 0000254300 | 7461 | 6863 | 685F | 6E61 | 6C64 | 1165 | 0604 | F700 |
| 0000254320 | 0B04 | 6966 | 656C | 685F | 6E61 | 6C64 | 0165 | 1E02 |
| 0000254340 | 3A01 | 681D | 4605 | 1000 | 3B00 | 0000 | 0400 | 690F |
| 0000254360 | 5F69 | 6573 | 5F74 | 7270 | 6F69 | 6972 | 7974 | 040C |
| 0000254400 | 0006 | 00C1 | 6906 | 706E | 705F | 0772 | FC04 | 81FF |
| 0000254420 | 0100 | 0169 | 1C02 | 8001 | 6A1D | 4605 | 1000 | 3B00 |
| 0000254440 | 0000 | 0400 | 690D | 5F69 | 5F71 | 7270 | 6F69 | 6972 |
| 0000254460 | 7974 | 040C | 0006 | 00C1 | 6906 | 706E | 705F | 0772 |
| 0000254500 | FC04 | 81FF | 0100 | 0169 | 2002 | C601 | 6C1D | 5F05 |
| 0000254520 | 1001 | 5400 | 0001 | 0400 | 6911 | 5F69 | 6573 | 5F74 |
| 0000254540 | 7274 | 6E61 | 5F73 | 7566 | 636E | 0415 | 0006 | 0081 |
| 0000254560 | 690F | 706E | 7475 | 735F | 756F | 6372 | 5F65 | 6469 |
| 0000254600 | 0410 | 0008 | 04A4 | 740A | 6172 | 736E | 665F | 6E75 |
| 0000254620 | 0C63 | FA04 | C0FF | 0600 | 5F5F | 7974 | 6570 | 040F |
| 0000254640 | FFF2 | 0085 | 5F09 | 625F | 5F78 | 7974 | 6570 | 040D |
| 0000254660 | FFE2 | 03B4 | 5F07 | 705F | 6972 | 746E | 040B | FFDA |
| 0000254700 | 0202 | 5F05 | 6C5F | 6C76 | 040D | FFE6 | 054A | 5F07 |
| 0000254720 | 635F | 6F6C | 6B63 | 040D | FFF6 | 00C0 | 5F07 | 735F |
| 0000254740 | 6174 | 6B63 | 040E | FFE0 | 0081 | 5F08 | 725F | 7465 |
| 0000254760 | 6176 | 086C | F404 | 81FF | 0200 | 6372 | 050E | 125E |
| 0000255000 | 0005 | 055B | 5F06 | 665F | 6E75 | 0163 | 1E02 | 2501 |
| 0000255020 | 6E1F | 6305 | 1001 | 5800 | 0001 | 0400 | 690F | 5F69 |
| 0000255040 | 5F71 | 7274 | 6E61 | 5F73 | 7566 | 636E | 040F | 0006 |
| 0000255060 | 0081 | 7309 | 756F | 6372 | 5F65 | 6469 | 0410 | 0008 |
| 0000255100 | 04FE | 740A | 6172 | 736E | 665F | 6E75 | 0C63 | FA04 |

THU MAR 14 17:39:32 1991 IH.DLL PAGE 67, LINE 3895

| | | | | | | | | |
|---|---|---|---|---|---|---|---|---|
| 0000255120 | C0FF | 0600 | 5F5F | 7974 | 6570 | 040F | FFF2 | 0085 |
| 0000255140 | 5F09 | 625F | 5F78 | 7974 | 6570 | 040D | FFE2 | 03B4 |
| 0000255160 | 5F07 | 705F | 6972 | 746E | 040B | FFDA | 0202 | 5F05 |
| 0000255200 | 6C5F | 6C76 | 040D | FFE6 | 054A | 5F07 | 635F | 6F6C |
| 0000255220 | 6B63 | 040D | FFF6 | 00C0 | 5F07 | 735F | 6174 | 6B63 |
| 0000255240 | 040E | FFED | 0081 | 5F08 | 725F | 7465 | 6176 | 086C |
| 0000255260 | F404 | 81FF | 0200 | 6372 | 050E | 127E | 0005 | 0570 |
| 0000255300 | 5F06 | 665F | 6E75 | 0163 | 0502 | 000D | 1A00 | 0F00 |
| 0000255320 | 2805 | 0501 | C000 | 0700 | 5F42 | 4678 | 6C69 | 1165 |
| 0000255340 | 3005 | 0501 | 8600 | 0900 | 7069 | 5F63 | 5F71 | 6573 |
| 0000255360 | 166D | 3405 | 0501 | 8500 | 0E00 | 6966 | 7372 | 5F74 |
| 0000255400 | 6974 | 656D | 665F | 735F | 050F | 012C | 0005 | 00C0 |
| 0000255420 | 4207 | 785F | 6150 | 6B63 | 0514 | 0136 | 0005 | 0086 |
| 0000255440 | 630C | 6972 | 6974 | 5F63 | 6573 | 5F6D | 1373 | 4E05 |
| 0000255460 | 0523 | EC00 | 0B02 | 5F71 | 756D | 5F78 | 6573 | 5F6D |
| 0000255500 | 1473 | B005 | 0523 | 3600 | 0C05 | 5F71 | 6573 | 5F6D |
| 0000255520 | 696C | 7473 | 735F | 051B | 013A | 0005 | 0412 | 6213 |
| 0000255540 | 7461 | 6863 | 665F | 6C69 | 5F65 | 6168 | 646E | 656C |
| 0000255560 | 735F | 051C | 013E | 0005 | 0537 | 6914 | 706E | 7475 |
| 0000255600 | 705F | 6972 | 726F | 7469 | 5F79 | 6174 | 6C62 | 1865 |
| 0000255620 | 4605 | 0501 | 3800 | 1005 | 7274 | 6E61 | 5F73 | 7566 |
| 0000255640 | 636E | 745F | 6261 | 656C | 050D | 0156 | 0005 | 0539 |
| 0000255660 | 6905 | 6370 | 715F | 050D | 0DDC | 0005 | 053D | 6105 |
| 0000255700 | 7070 | 715F | 050F | 0F72 | 0005 | 0541 | 6207 | 7461 |
| 0000255720 | 6863 | 715F | 0514 | 0000 | 0000 | 0081 | 420C | 5F78 |
| 0000255740 | 6544 | 7562 | 4D67 | 646F | 1465 | 0005 | 0000 | 8100 |
| 0000255760 | 0C00 | 7842 | 545F | 6D69 | 7365 | 6F4D | 6564 | 0514 |
| 0000256000 | 0000 | 0000 | 0081 | 420C | 5F78 | 7245 | 6F72 | 4D72 |
| 0000256020 | 646F | 1065 | 0005 | 0000 | 8100 | 0800 | 7842 | 425F |
| 0000256040 | 735F | 6769 | 1105 | 0001 | 0000 | 0115 | 2088 | 0516 |
| 0000256060 | 01F5 | 0016 | 01E7 | 0000 | 0604 | 5F69 | 6E69 | 7469 |
| 0000256100 | 040F | 0006 | 0081 | 6309 | 7275 | 5F72 | 7270 | 636F |
| 0000256120 | 040C | FFFA | 00C0 | 5F06 | 745F | 7079 | 0F65 | E404 |
| 0000256140 | 85FF | 0900 | 5F5F | 7862 | 745F | 7079 | 0D65 | D404 |
| 0000256160 | 1AFF | 0705 | 5F5F | 7270 | 6E69 | 0B74 | CC04 | 02FF |
| 0000256200 | 0502 | 5F5F | 766C | 0D6C | D804 | 1CFF | 0705 | 5F5F |
| 0000256220 | 6C63 | 636F | 0D6B | F004 | C0FF | 0700 | 5F5F | 7473 |
| 0000256240 | 6361 | 0E6B | D204 | 81FF | 0800 | 5F5F | 6572 | 7674 |
| 0000256260 | 6C61 | 040D | FFE6 | 0274 | 7007 | 6469 | 6E69 | 6F66 |
| 0000256300 | 0409 | FFCA | 0085 | 7003 | 6469 | 0409 | FFF8 | 0085 |
| 0000256320 | 7403 | 6469 | 040F | FFB6 | 051D | 7009 | 7069 | 5F65 |
| 0000256340 | 616E | 656D | 0408 | FFEC | 0085 | 6802 | 0B70 | F404 |
| 0000256360 | C6FF | 0500 | 6573 | 5F6D | 0870 | EE04 | 81FF | 0200 |
| 0000256400 | 6372 | 050E | 12C8 | 0005 | 0519 | 5F06 | 665F | 6E75 |
| 0000256420 | 0163 | 1902 | 7D01 | 2022 | 4A05 | 1602 | 3C00 | 0002 |
| 0000256440 | 0400 | 690A | 635F | 7672 | 695F | 696E | 0C74 | 0E04 |
| 0000256460 | C500 | 0600 | 5F67 | 7068 | 705F | 040C | 000A | 00C5 |
| 0000256500 | 7806 | 685F | 5F70 | 0B70 | 0604 | C600 | 0500 | 6573 |
| 0000256520 | 5F6D | 0D70 | EC04 | 74FF | 0702 | 6970 | 6964 | 666E |
| 0000256540 | 096F | D004 | 85FF | 0300 | 6970 | 0964 | F804 | 85FF |
| 0000256560 | 0300 | 6974 | 0A64 | BA04 | 85FF | 0400 | 5F67 | 7068 |
| 0000256600 | 040A | FFB8 | 0085 | 7804 | 685F | 0F70 | BC04 | 1DFF |
| 0000256620 | 0905 | 6970 | 6570 | 6E5F | 6D61 | 0865 | F204 | 81FF |
| 0000256640 | 0200 | 6372 | D40C | FFFA | 00C0 | 5F06 | 745F | 7079 |
| 0000256660 | 0F65 | EA04 | 85FF | 0900 | 5F5F | 7862 | 745F | 7079 |
| 0000256700 | 0D65 | DA04 | 1AFF | 0705 | 5F5F | 7270 | 6E69 | 0B74 |
| 0000256720 | D204 | 02FF | 0502 | 5F5F | 766C | 0D6C | DE04 | 1CFF |
| 0000256740 | 0705 | 5F5F | 6C63 | 636F | 0D6B | F404 | C0FF | 0700 |
| 0000256760 | 5F5F | 7473 | 6361 | 0E6B | D804 | 81FF | 0800 | 5F5F |

THU MAR 14 17:39:32 1991  IH.DLL  PAGE 68, LINE 3954

| | | | | | | | | |
|---|---|---|---|---|---|---|---|---|
| 0000257000 | 6572 | 7674 | 6C61 | 050E | 12FC | 0005 | 0522 | 5F06 |
| 0000257020 | 665F | 6E75 | 0163 | 1902 | C701 | 2624 | 8D05 | 1602 |
| 0000257040 | 7F00 | 0002 | 0400 | 690A | 695F | 6370 | 695F | 696E |
| 0000257060 | 0F74 | 0C04 | 8100 | 0900 | 7563 | 7272 | 705F | 6F72 |
| 0000257100 | 0F63 | 0A04 | 8100 | 0900 | 6564 | 7473 | 705F | 6F72 |
| 0000257120 | 0C63 | 0604 | C500 | 0600 | 7069 | 5F63 | 6469 | 040C |
| 0000257140 | FFF8 | 00C0 | 5F06 | 745F | 7079 | 0F65 | E204 | 85FF |
| 0000257160 | 0900 | 5F5F | 7862 | 745F | 7079 | 0D65 | D204 | 1AFF |
| 0000257200 | 0705 | 5F5F | 7270 | 6E69 | 0B74 | CA04 | 02FF | 0502 |
| 0000257220 | 5F5F | 766C | 0D6C | D604 | 1CFF | 0705 | 5F5F | 6C63 |
| 0000257240 | 636F | 0D6B | EE04 | C0FF | 0700 | 5F5F | 7473 | 6361 |
| 0000257260 | 0E6B | D004 | 81FF | 0800 | 5F5F | 6572 | 7674 | 6C61 |
| 0000257300 | 0409 | FFC8 | 0085 | 7003 | 6469 | 0409 | FFF6 | 0085 |
| 0000257320 | 7403 | 6469 | 040D | FFE4 | 0274 | 7007 | 6469 | 6E69 |
| 0000257340 | 6F66 | 040F | FFB4 | 051D | 7009 | 7069 | 5F65 | 616E |
| 0000257360 | 656D | 0408 | FFEA | 0085 | 6802 | 0E70 | FC04 | 85FF |
| 0000257400 | 0800 | 5F69 | 7069 | 5F63 | 6469 | 040B | FFF2 | 00C6 |
| 0000257420 | 7305 | 6D65 | 705F | 0408 | FFEC | 0081 | 7202 | 0E63 |
| 0000257440 | 2805 | 0513 | 2200 | 0605 | 5F5F | 7566 | 636E | 0201 |
| 0000257460 | 0120 | 2754 | 0529 | 0035 | 0016 | 0027 | 0000 | 1104 |
| 0000257500 | 5F69 | 7361 | 6F73 | 6963 | 7461 | 5F65 | 5F71 | 6573 |
| 0000257520 | 0D6D | 0604 | C600 | 0700 | 5F71 | 6573 | 5F6D | 0170 |
| 0000257540 | 1602 | 8901 | 2B27 | 4B05 | 1601 | 3D00 | 0001 | 0400 |
| 0000257560 | 6907 | 615F | 6F62 | 7472 | 040C | 0006 | 0085 | 6906 |
| 0000257600 | 6370 | 695F | 0C64 | FA04 | C0FF | 0600 | 5F5F | 7974 |
| 0000257620 | 6570 | 040F | FFF2 | 0085 | 5F09 | 625F | 5F78 | 7974 |
| 0000257640 | 6570 | 040D | FFE2 | 051A | 5F07 | 705F | 6972 | 746E |
| 0000257660 | 040B | FFDA | 0202 | 5F05 | 6C5F | 6C76 | 040D | FFE6 |
| 0000257700 | 051C | 5F07 | 635F | 6F6C | 6B63 | 040D | FFF6 | 00C0 |
| 0000257720 | 5F07 | 735F | 6174 | 6B63 | 040E | FFE0 | 0081 | 5F08 |
| 0000257740 | 725F | 7465 | 6176 | 086C | F404 | 81FF | 0200 | 6372 |
| 0000257760 | 050E | 1342 | 0005 | 052C | 5F06 | 665F | 6E75 | 0163 |
| 0000260000 | 1502 | D401 | 2D28 | 6305 | 1601 | 5700 | 0001 | 0400 |
| 0000260020 | 6906 | 745F | 7265 | 0C6D | FA04 | C0FF | 0600 | 5F5F |
| 0000260040 | 7974 | 6570 | 040F | FFF0 | 0085 | 5F09 | 625F | 5F78 |
| 0000260060 | 7974 | 6570 | 040D | FFE0 | 051A | 5F07 | 705F | 6972 |
| 0000260100 | 746E | 040B | FFD8 | 0202 | 5F05 | 6C5F | 6C76 | 040D |
| 0000260120 | FFE4 | 051C | 5F07 | 635F | 6F6C | 6B63 | 040D | FFF6 |
| 0000260140 | 00C0 | 5F07 | 735F | 6174 | 6B63 | 040E | FFDE | 0081 |
| 0000260160 | 5F08 | 725F | 7465 | 6176 | 086C | F204 | 85FF | 0200 |
| 0000260200 | 7068 | 0408 | FFF4 | 0081 | 7202 | 0E63 | 5805 | 0513 |
| 0000260220 | 1900 | 0605 | 5F5F | 7566 | 636E | 0201 | 0119 | 2A37 |
| 0000260240 | 052F | 01A1 | 0016 | 0193 | 0000 | 0A04 | 5F69 | 7069 |
| 0000260260 | 5F63 | 6574 | 6D72 | 040C | 0006 | 0085 | 6906 | 6370 |
| 0000260300 | 695F | 0C64 | FA04 | C0FF | 0600 | 5F5F | 7974 | 6570 |
| 0000260320 | 040F | FFEE | 0085 | 5F09 | 625F | 5F78 | 7974 | 6570 |
| 0000260340 | 040D | FFDE | 051A | 5F07 | 705F | 6972 | 746E | 040B |
| 0000260360 | FFD6 | 0202 | 5F05 | 6C5F | 6C76 | 040D | FFE2 | 051C |
| 0000260400 | 5F07 | 635F | 6F6C | 6B63 | 040D | FFF4 | 00C0 | 5F07 |
| 0000260420 | 735F | 6174 | 6B63 | 040E | FFDC | 0081 | 5F08 | 725F |
| 0000260440 | 7465 | 6176 | 086C | F004 | 85FF | 0200 | 7068 | 040F |
| 0000260460 | FFF8 | 0081 | 6409 | 7365 | 5F74 | 7270 | 636F | 0408 |
| 0000260500 | FFF2 | 0081 | 7202 | 0E63 | 6E05 | 0513 | 2200 | 0605 |
| 0000260520 | 5F5F | 7566 | 636E | 0201 | 0119 | 2BD8 | 0530 | 0191 |
| 0000260540 | 0016 | 0185 | 0000 | 0A04 | 5F69 | 7263 | 5F76 | 6574 |
| 0000260560 | 6D72 | 040C | FFFA | 00C0 | 5F06 | 745F | 7079 | 0F65 |
| 0000260600 | F004 | 85FF | 0900 | 5F5F | 7862 | 745F | 7079 | 0D65 |
| 0000260620 | E004 | 1AFF | 0705 | 5F5F | 7270 | 6E69 | 0B74 | D804 |
| 0000260640 | 02FF | 0502 | 5F5F | 766C | 0D6C | E404 | 1CFF | 0705 |

THU MAR 14 17:39:32 1991 IH.DLL PAGE 69, LINE 4013

| | | | | | | | | |
|---|---|---|---|---|---|---|---|---|
| 0000260660 | 5F5F | 6C63 | 636F | 0D6B | F604 | C0FF | 0700 | 5F5F |
| 0000260700 | 7473 | 6361 | 0E6B | DE04 | 81FF | 0800 | 5F5F | 6572 |
| 0000260720 | 7674 | 6C61 | 0408 | FFF2 | 0085 | 6802 | 0870 | F404 |
| 0000260740 | 81FF | 0200 | 6372 | 050E | 1388 | 0005 | 0522 | 5F06 |
| 0000260760 | 665F | 6E75 | 0163 | 1902 | 6901 | 322D | 7505 | 1602 |
| 0000261000 | 6700 | 0002 | 0400 | 690A | 735F | 6E65 | 5F64 | 736D |
| 0000261020 | 0C67 | 1604 | 8500 | 0600 | 7069 | 5F63 | 6469 | 040F |
| 0000261040 | 0012 | 04AC | 6909 | 6370 | 6D5F | 6773 | 705F | 0412 |
| 0000261060 | 000E | 0082 | 620C | 7375 | 5F79 | 6974 | 656D | 756F |
| 0000261100 | 1274 | 0A04 | 8200 | 0C00 | 6572 | 7073 | 745F | 6D69 |
| 0000261120 | 6F65 | 7475 | 0410 | 0006 | 04AB | 720A | 7365 | 5F70 |
| 0000261140 | 736D | 5F67 | 0C7D | FA04 | C0FF | 0600 | 5F5F | 7974 |
| 0000261160 | 6570 | 040F | FFEC | 0085 | 5F09 | 625F | 5F78 | 7974 |
| 0000261200 | 6570 | 040D | FFDA | 051A | 5F07 | 705F | 6972 | 746E |
| 0000261220 | 040B | FFD2 | 0202 | 5F05 | 6C5F | 6C76 | 040D | FFE0 |
| 0000261240 | 051C | 5F07 | 635F | 6F6C | 6B63 | 040D | FFF6 | 00C0 |
| 0000261260 | 5F07 | 735F | 6174 | 6B63 | 040E | FFD8 | 0081 | 5F08 |
| 0000261300 | 725F | 7465 | 6176 | 086C | EE04 | 85FF | 0200 | 7068 |
| 0000261320 | 0412 | FFF0 | 04AC | 690C | 725F | 7365 | 5F70 | 736D |
| 0000261340 | 5F67 | 0970 | DE04 | 85FF | 0300 | 7266 | 0863 | F404 |
| 0000261360 | 81FF | 0200 | 6372 | 050E | 13A2 | 0005 | 0522 | 5F06 |
| 0000261400 | 665F | 6E75 | 0163 | 1D02 | DE01 | 342F | 5C05 | 1601 |
| 0000261420 | 4E00 | 0001 | 0400 | 690E | 635F | 7672 | 735F | 6E65 |
| 0000261440 | 5F64 | 736D | 0867 | 0A04 | 8500 | 0200 | 7068 | 040F |
| 0000261460 | 0006 | 04AC | 6909 | 6370 | 6D5F | 6773 | 705F | 040C |
| 0000261500 | FFFA | 00C0 | 5F06 | 745F | 7079 | 0F65 | F204 | 85FF |
| 0000261520 | 0900 | 5F5F | 7862 | 745F | 7079 | 0D65 | E204 | 1AFF |
| 0000261540 | 0705 | 5F5F | 7270 | 6E69 | 0B74 | DA04 | 02FF | 0502 |
| 0000261560 | 5F5F | 766C | 0D6C | E604 | 1CFF | 0705 | 5F5F | 6C63 |
| 0000261600 | 636F | 0D6B | F604 | C0FF | 0700 | 5F5F | 7473 | 6361 |
| 0000261620 | 0E6B | E004 | 81FF | 0800 | 5F5F | 6572 | 7674 | 6C61 |
| 0000261640 | 0408 | FFF4 | 0081 | 7202 | 0E63 | BC05 | 0513 | 3600 |
| 0000261660 | 0605 | 5F5F | 7566 | 636E | 0201 | 011B | 313A | 0538 |
| 0000261700 | 02B1 | 0016 | 02A3 | 0000 | 0C04 | 5F69 | 6573 | 646E |
| 0000261720 | 785F | 6D5F | 6773 | 040C | 0016 | 0085 | 6906 | 6370 |
| 0000261740 | 695F | 0F64 | 1204 | AC00 | 0904 | 7069 | 5F63 | 736D |
| 0000261760 | 5F67 | 1270 | 0E04 | 8200 | 0C00 | 7562 | 7973 | 745F |
| 0000262000 | 6D69 | 6F65 | 7475 | 0412 | 000A | 0082 | 720C | 7365 |
| 0000262020 | 5F70 | 6974 | 656D | 756F | 1074 | 0604 | AB00 | 0A04 |
| 0000262040 | 6572 | 7073 | 6D5F | 6773 | 705F | 040C | FFFA | 00C0 |
| 0000262060 | 5F06 | 745F | 7079 | 0F65 | EA04 | 85FF | 0900 | 5F5F |
| 0000262100 | 7862 | 745F | 7079 | 0D65 | D804 | 1AFF | 0705 | 5F5F |
| 0000262120 | 7270 | 6E69 | 0B74 | D004 | 02FF | 0502 | 5F5F | 766C |
| 0000262140 | 0D6C | DE04 | 1CFF | 0705 | 5F5F | 6C63 | 636F | 0D6B |
| 0000262160 | F404 | C0FF | 0700 | 5F5F | 7473 | 6361 | 0E6B | D604 |
| 0000262200 | 81FF | 0800 | 5F5F | 6572 | 7674 | 6C61 | 040A | FFF8 |
| 0000262220 | 0081 | 7004 | 6F72 | 0863 | EC04 | 85FF | 0200 | 7068 |
| 0000262240 | 0412 | FFEE | 04AC | 690C | 725F | 7365 | 5F70 | 736D |
| 0000262260 | 5F67 | 0970 | DC04 | 85FF | 0300 | 7266 | 0863 | F204 |
| 0000262300 | 81FF | 0200 | 6372 | 050E | 13DA | 0005 | 0522 | 5F06 |
| 0000262320 | 665F | 6E75 | 0163 | 1C02 | EB01 | 3A33 | CB05 | 1601 |
| 0000262340 | BD00 | 0001 | 0400 | 690D | 725F | 7365 | 6F70 | 646E |
| 0000262360 | 6D5F | 6773 | 040B | 000A | 04AC | 6D05 | 6773 | 705F |
| 0000262400 | 0410 | 0006 | 04AC | 720A | 7365 | 5F70 | 736D | 5F67 |
| 0000262420 | 0B70 | D604 | 02FF | 0502 | 5F5F | 766C | 0D6C | E204 |
| 0000262440 | 1CFF | 0705 | 5F5F | 6C63 | 636F | 0D6B | F404 | C0FF |
| 0000262460 | 0700 | 5F5F | 7473 | 6361 | 0E6B | DC04 | 81FF | 0800 |
| 0000262500 | 5F5F | 6572 | 7674 | 6C61 | 040A | FFF8 | 0081 | 7004 |
| 0000262520 | 6F72 | 0863 | F004 | 85FF | 0200 | 7068 | 0408 | FFF2 |

THU MAR 14 17:39:32 1991 IH.DLL PAGE 70, LINE 4072

| | | | | | | | | |
|---|---|---|---|---|---|---|---|---|
| 0000262540 | 0081 | 7202 | 0C63 | FA04 | C0FF | 0600 | 5F5F | 7974 |
| 0000262560 | 6570 | 040F | FFEE | 0085 | 5F09 | 625F | 5F78 | 7974 |
| 0000262600 | 6570 | 040D | FFDE | 051A | 5F07 | 705F | 6972 | 746E |
| 0000262620 | 050E | 13F4 | 0005 | 053B | 5F06 | 665F | 6E75 | 0163 |
| 0000262640 | 1E02 | B601 | 3D35 | A705 | 1601 | 9900 | 0001 | 0400 |
| 0000262660 | 690F | 635F | 7672 | 725F | 6365 | 6E6F | 656E | 7463 |
| 0000262700 | 040B | 0006 | 00C6 | 7305 | 6D65 | 705F | 040C | FFFA |
| 0000262720 | 00C0 | 5F06 | 745F | 7079 | 0F65 | F204 | 85FF | 0900 |
| 0000262740 | 5F5F | 7862 | 745F | 7079 | 0D65 | E204 | 1AFF | 0705 |
| 0000262760 | 5F5F | 7270 | 6E69 | 0B74 | DA04 | 02FF | 0502 | 5F5F |
| 0000263000 | 766C | 0D6C | E604 | 1CFF | 0705 | 5F5F | 6C63 | 636F |
| 0000263020 | 0D6B | F604 | C0FF | 0700 | 5F5F | 7473 | 6361 | 0E6B |
| 0000263040 | E004 | 81FF | 0800 | 5F5F | 6572 | 7674 | 6C61 | 040A |
| 0000263060 | FFD8 | 0085 | 6704 | 685F | 0A70 | D604 | 85FF | 0400 |
| 0000263100 | 5F78 | 7068 | 0408 | FFF4 | 0081 | 7202 | 0E63 | 1005 |
| 0000263120 | 0514 | 3E00 | 0605 | 5F5F | 7566 | 636E | 0201 | 0119 |
| 0000263140 | 375D | 0540 | 0035 | 0016 | 0027 | 0000 | 0A04 | 5F69 |
| 0000263160 | 7266 | 6565 | 6D5F | 6773 | 040B | 0006 | 04AC | 6D05 |
| 0000263200 | 6773 | 705F | 0201 | 0D05 | 0000 | 001A | 0512 | 12C0 |
| 0000263220 | 0005 | 0086 | 620A | 7375 | 5F79 | 6573 | 5F6D | 1473 |
| 0000263240 | C405 | 0512 | 8600 | 0C00 | 7562 | 7973 | 785F | 735F |
| 0000263260 | 6D65 | 735F | 050F | 12B8 | 0005 | 00C0 | 4207 | 785F |
| 0000263300 | 6946 | 656C | 050F | 12BC | 0005 | 00C0 | 4207 | 785F |
| 0000263320 | 6150 | 6B63 | 0517 | 1452 | 0005 | 0499 | 490F | 435F |
| 0000263340 | 4D5F | 444F | 4C55 | 5F45 | 414E | 454D | 0514 | 0000 |
| 0000263360 | 0000 | 0081 | 420C | 5F78 | 6544 | 7562 | 4D67 | 646F |
| 0000263400 | 1465 | 0005 | 0000 | 8100 | 0C00 | 7842 | 545F | 6D69 |
| 0000263420 | 7365 | 6F4D | 6564 | 1105 | 0001 | 0000 | 0120 | 3792 |
| 0000263440 | 0551 | 02BA | 0010 | 02AF | 0000 | 1104 | 6969 | 735F |
| 0000263460 | 6E65 | 5F64 | 7473 | 7261 | 5F74 | 736D | 0C67 | 0604 |
| 0000263500 | 8500 | 0600 | 7069 | 5F63 | 6469 | 040C | FFFA | 00C0 |
| 0000263520 | 5F06 | 745F | 7079 | 0F65 | E804 | 85FF | 0900 | 5F5F |
| 0000263540 | 7862 | 745F | 7079 | 0D65 | D804 | 09FF | 0704 | 5F5F |
| 0000263560 | 7270 | 6E69 | 0B74 | D004 | 02FF | 0502 | 5F5F | 766C |
| 0000263600 | 0D6C | DC04 | 56FF | 0705 | 5F5F | 6C63 | 636F | 0D6B |
| 0000263620 | EE04 | C0FF | 0700 | 5F5F | 7473 | 6361 | 0E6B | D604 |
| 0000263640 | 81FF | 0800 | 5F5F | 6572 | 7674 | 6C61 | 040F | FFF2 |
| 0000263660 | 0081 | 6409 | 7365 | 5F74 | 7270 | 636F | 0414 | FFB8 |
| 0000263700 | 0557 | 640E | 7365 | 5F74 | 6970 | 6570 | 6E5F | 6D61 |
| 0000263720 | 1165 | CC04 | C0FF | 0B00 | 6970 | 6570 | 6E5F | 6D61 |
| 0000263740 | 5F65 | 0870 | EA04 | 85FF | 0200 | 7068 | 040F | FFF4 |
| 0000263760 | 04E0 | 6909 | 6370 | 6D5F | 6773 | 705F | 040E | FFF8 |
| 0000264000 | 0085 | 6D08 | 6773 | 735F | 7A69 | 1065 | B404 | E0FF |
| 0000264020 | 0A04 | 6572 | 7073 | 6D5F | 6773 | 705F | 0408 | FFEC |
| 0000264040 | 0081 | 7202 | 0E63 | 6405 | 0514 | 5400 | 0605 | 5F5F |
| 0000264060 | 7566 | 636E | 0201 | 011F | 3A4C | 055A | 0168 | 0010 |
| 0000264100 | 015D | 0000 | 1004 | 6969 | 735F | 6E65 | 5F64 | 7473 |
| 0000264120 | 706F | 6D5F | 6773 | 040C | 0006 | 0085 | 6906 | 6370 |
| 0000264140 | 695F | 0C64 | FA04 | C0FF | 0600 | 5F5F | 7974 | 6570 |
| 0000264160 | 040F | FFD8 | 0085 | 5F09 | 625F | 5F78 | 7974 | 6570 |
| 0000264200 | 040D | FFC8 | 0409 | 5F07 | 705F | 6972 | 746E | 040B |
| 0000264220 | FFC0 | 0202 | 5F05 | 6C5F | 6C76 | 040D | FFCC | 0556 |
| 0000264240 | 5F07 | 635F | 6F6C | 6B63 | 040D | FFDE | 00C0 | 5F07 |
| 0000264260 | 735F | 6174 | 6B63 | 040E | FFC6 | 0081 | 5F08 | 725F |
| 0000264300 | 7465 | 6176 | 086C | DA04 | 85FF | 0200 | 7068 | 040D |
| 0000264320 | FFE2 | 04D9 | 6907 | 6370 | 6D5F | 6773 | 0408 | FFDC |
| 0000264340 | 0081 | 7202 | 0E63 | 8405 | 0514 | 5C00 | 0605 | 5F5F |
| 0000264360 | 7566 | 636E | 0201 | 011E | 3BB4 | 055E | 019F | 0010 |
| 0000264400 | 0194 | 0000 | 0F04 | 6969 | 695F | 6370 | 735F | 6E65 |

THU MAR 14 17:39:32 1991 IH.DLL PAGE 71, LINE 4131

| | | | | | | | | |
|---|---|---|---|---|---|---|---|---|
| 0000264420 | 5F64 | 736D | 1167 | 0604 | 8500 | 0B00 | 6970 | 6570 |
| 0000264440 | 685F | 6E61 | 6C64 | 0F65 | 0804 | E000 | 0904 | 7069 |
| 0000264460 | 5F63 | 736D | 5F67 | 0C70 | FA04 | C0FF | 0600 | 5F5F |
| 0000264500 | 7974 | 6570 | 040F | FFF0 | 0085 | 5F09 | 625F | 5F78 |
| 0000264520 | 7974 | 6570 | 040D | FFDE | 0409 | 5F07 | 705F | 6972 |
| 0000264540 | 746E | 040B | FFD6 | 0202 | 5F05 | 6C5F | 6C76 | 040D |
| 0000264560 | FFE4 | 0556 | 5F07 | 635F | 6F6C | 6B63 | 040D | FFF4 |
| 0000264600 | 00C0 | 5F07 | 735F | 6174 | 6B63 | 040E | FFDC | 0081 |
| 0000264620 | 5F08 | 725F | 7465 | 6176 | 0E6C | F804 | 85FF | 0800 |
| 0000264640 | 736D | 5F67 | 6973 | 657A | 040F | FFD4 | 0085 | 6209 |
| 0000264660 | 7479 | 6365 | 756F | 746E | 0409 | FFE2 | 0085 | 6603 |
| 0000264700 | 6372 | 0408 | FFF2 | 0081 | 7202 | 0E63 | A405 | 0514 |
| 0000264720 | 6000 | 0605 | 5F5F | 7566 | 636E | 0201 | 011D | 3D53 |
| 0000264740 | 0562 | 0165 | 0010 | 015A | 0000 | 0E04 | 6969 | 725F |
| 0000264760 | 7365 | 6F70 | 646E | 6D5F | 6773 | 040B | 0006 | 04E0 |
| 0000265000 | 6D05 | 6773 | 705F | 0409 | 000A | 0085 | 7403 | 6469 |
| 0000265020 | 0408 | 000C | 0085 | 6802 | 0C70 | FA04 | C0FF | 0600 |
| 0000265040 | 5F5F | 7974 | 6570 | 040F | FFF2 | 0085 | 5F09 | 625F |
| 0000265060 | 5F78 | 7974 | 6570 | 040D | FFE2 | 0409 | 5F07 | 705F |
| 0000265100 | 6972 | 746E | 040B | FFDA | 0202 | 5F05 | 6C5F | 6C76 |
| 0000265120 | 040D | FFE6 | 0556 | 5F07 | 635F | 6F6C | 6B63 | 040D |
| 0000265140 | FFF6 | 00C0 | 5F07 | 735F | 6174 | 6B63 | 040E | FFE0 |
| 0000265160 | 0081 | 5F08 | 725F | 7465 | 6176 | 086C | F404 | 81FF |
| 0000265200 | 0200 | 6372 | 050E | 14C2 | 0005 | 0564 | 5F06 | 665F |
| 0000265220 | 6E75 | 0163 | 1F02 | B801 | 663E | 2505 | 1002 | 1A00 |
| 0000265240 | 0002 | 0400 | 6910 | 5F69 | 6177 | 7469 | 725F | 7365 |
| 0000265260 | 6F70 | 736E | 0C65 | 0604 | 8500 | 0600 | 7069 | 5F63 |
| 0000265300 | 6469 | 0409 | 0008 | 0085 | 7403 | 6469 | 040D | 000A |
| 0000265320 | 0082 | 7407 | 6D69 | 6F65 | 7475 | 0410 | 000E | 04DF |
| 0000265340 | 720A | 7365 | 5F70 | 736D | 5F67 | 0C70 | FA04 | C0FF |
| 0000265360 | 0600 | 5F5F | 7974 | 6570 | 040F | FFF2 | 0085 | 5F09 |
| 0000265400 | 625F | 5F78 | 7974 | 6570 | 040D | FFE0 | 0409 | 5F07 |
| 0000265420 | 705F | 6972 | 746E | 040B | FFD8 | 0202 | 5F05 | 6C5F |
| 0000265440 | 6C76 | 040D | FFE6 | 0556 | 5F07 | 635F | 6F6C | 6B63 |
| 0000265460 | 040D | FFF6 | 00C0 | 5F07 | 735F | 6174 | 6B63 | 040E |
| 0000265500 | FFDE | 0081 | 5F08 | 725F | 7465 | 6176 | 096C | E404 |
| 0000265520 | 85FF | 0300 | 7266 | 0863 | F404 | 81FF | 0200 | 6372 |
| 0000265540 | 050E | 14E0 | 0005 | 055C | 5F06 | 665F | 6E75 | 0163 |
| 0000265560 | 1E02 | DD01 | 6840 | E205 | 1001 | D700 | 0001 | 0400 |
| 0000265600 | 690F | 5F69 | 6573 | 5F74 | 6572 | 7073 | 6E6F | 6573 |
| 0000265620 | 040B | 0006 | 04E0 | 6D05 | 6773 | 705F | 040C | FFFA |
| 0000265640 | 00C0 | 5F06 | 745F | 7079 | 0F65 | F204 | 85FF | 0900 |
| 0000265660 | 5F5F | 7862 | 745F | 7079 | 0D65 | E204 | 09FF | 0704 |
| 0000265700 | 5F5F | 7270 | 6E69 | 0B74 | DA04 | 02FF | 0502 | 5F5F |
| 0000265720 | 766C | 0D6C | E604 | 56FF | 0705 | 5F5F | 6C63 | 636F |
| 0000265740 | 0D6B | F404 | C0FF | 0700 | 5F5F | 7473 | 6361 | 0E6B |
| 0000265760 | E004 | 81FF | 0800 | 5F5F | 6572 | 7674 | 6C61 | 0409 |
| 0000266000 | FFF8 | 0085 | 7403 | 6469 | 050E | 151A | 0005 | 0560 |
| 0000266020 | 5F06 | 665F | 6E75 | 0163 | 1C02 | BF01 | 6C42 | F805 |
| 0000266040 | 1001 | F000 | 0001 | 0400 | 690D | 5F69 | 6C63 | 6165 |
| 0000266060 | 5F72 | 6572 | 7073 | 040C | 0006 | 0085 | 6906 | 6370 |
| 0000266100 | 695F | 0E64 | 0804 | 8100 | 0800 | 7265 | 5F72 | 6F63 |
| 0000266120 | 6564 | 040C | FFFA | 00C0 | 5F06 | 745F | 7079 | 0F65 |
| 0000266140 | EC04 | 85FF | 0900 | 5F5F | 7862 | 745F | 7079 | 0D65 |
| 0000266160 | DC04 | 09FF | 0704 | 5F5F | 7270 | 6E69 | 0B74 | D404 |
| 0000266200 | 02FF | 0502 | 5F5F | 766C | 0D6C | E004 | 56FF | 0705 |
| 0000266220 | 5F5F | 6C63 | 636F | 0D6B | F604 | C0FF | 0700 | 5F5F |
| 0000266240 | 7473 | 6361 | 0E6B | DA04 | 81FF | 0800 | 5F5F | 6572 |
| 0000266260 | 7674 | 6C61 | 040B | FFF0 | 04E0 | 6D05 | 6773 | 705F |

THU MAR 14 17:39:32 1991 IH.DLL PAGE 72, LINE 4190

| | | | | | | | | |
|---|---|---|---|---|---|---|---|---|
| 0000266300 | 0407 | FFEE | 0085 | 6901 | 0408 | FFF4 | 0081 | 7202 |
| 0000266320 | 0E63 | 3805 | 0515 | 6D00 | 0605 | 5F5F | 7566 | 636E |
| 0000266340 | 0201 | 0120 | 44BA | 056F | 0169 | 0010 | 015E | 0000 |
| 0000266360 | 11D4 | 6969 | 735F | 7465 | 6D5F | 6773 | 685F | 6165 |
| 0000266400 | 6564 | 0F72 | 0604 | E000 | 0904 | 7069 | 5F63 | 736D |
| 0000266420 | 5F67 | 0E70 | 0A04 | 8100 | 0800 | 736D | 5F67 | 7974 |
| 0000266440 | 6570 | 040D | 000C | 0085 | 6F07 | 5F70 | 6F63 | 6564 |
| 0000266460 | 040A | 000E | 0085 | 7304 | 7A69 | 0C65 | FA04 | C0FF |
| 0000266500 | 0600 | 5F5F | 7974 | 6570 | 040F | FFF2 | 0085 | 5F09 |
| 0000266520 | 625F | 5F78 | 7974 | 6570 | 040D | FFE2 | 0409 | 5F07 |
| 0000266540 | 705F | 6972 | 746E | 040B | FFDA | 0202 | 5F05 | 6C5F |
| 0000266560 | 6C76 | 040D | FFE6 | 0556 | 5F07 | 635F | 6F6C | 6B63 |
| 0000266600 | 040D | FFF6 | 00C0 | 5F07 | 735F | 6174 | 6B63 | 040E |
| 0000266620 | FFE0 | 0081 | 5F08 | 725F | 7465 | 6176 | 086C | F404 |
| 0000266640 | 81FF | 0200 | 6372 | 050E | 1554 | 0005 | 0554 | 5F06 |
| 0000266660 | 665F | 6E75 | 0163 | 2902 | 2301 | 7146 | 8705 | 1001 |
| 0000266700 | 7C00 | 0001 | 0400 | 691A | 5F69 | 6573 | 5F74 | 736D |
| 0000266720 | 5F67 | 6568 | 6461 | 7265 | 695F | 746E | 7265 | 616E |
| 0000266740 | 0F6C | 0604 | E000 | 0904 | 7069 | 5F63 | 736D | 5F67 |
| 0000266760 | 0C70 | FA04 | C0FF | 0600 | 5F5F | 7974 | 6570 | 040F |
| 0000267000 | FFEC | 0085 | 5F09 | 625F | 5F78 | 7974 | 6570 | 040D |
| 0000267020 | FFDC | 0409 | 5F07 | 705F | 6972 | 746E | 040B | FFD4 |
| 0000267040 | 0202 | 5F05 | 6C5F | 6C76 | 040D | FFE0 | 0556 | 5F07 |
| 0000267060 | 635F | 6F6C | 6B63 | 040D | FFF6 | 00C0 | 5F07 | 735F |
| 0000267100 | 6174 | 6B63 | 040E | FFDA | 0081 | 5F08 | 725F | 7465 |
| 0000267120 | 6176 | 0F6C | D204 | 81FF | 0900 | 7563 | 7272 | 705F |
| 0000267140 | 6F72 | 0D63 | EE04 | 74FF | 0702 | 6970 | 6964 | 666E |
| 0000267160 | 086F | F404 | 81FF | 0200 | 6372 | 050E | 1574 | 0005 |
| 0000267200 | 0573 | 5F06 | 665F | 6E75 | 0163 | 2002 | AA01 | 7547 |
| 0000267220 | 5C05 | 1001 | 5100 | 0001 | 0400 | 6911 | 5F69 | 6572 |
| 0000267240 | 6F63 | 6E6E | 6365 | 5F74 | 6970 | 6570 | 0408 | 0006 |
| 0000267260 | 0085 | 6802 | 0B70 | 0804 | C600 | 0500 | 6573 | 5F6D |
| 0000267300 | 0C70 | FA04 | C0FF | 0600 | 5F5F | 7974 | 6570 | 040F |
| 0000267320 | FFF2 | 0085 | 5F09 | 625F | 5F78 | 7974 | 6570 | 040D |
| 0000267340 | FFE2 | 0409 | 5F07 | 705F | 6972 | 746E | 040B | FFDA |
| 0000267360 | 0202 | 5F05 | 6C5F | 6C76 | 040D | FFE6 | 0556 | 5F07 |
| 0000267400 | 635F | 6F6C | 6B63 | 040D | FFF6 | 00C0 | 5F07 | 735F |
| 0000267420 | 6174 | 6B63 | 040E | FFE0 | 0081 | 5F08 | 725F | 7465 |
| 0000267440 | 6176 | 086C | F404 | 81FF | 0200 | 6372 | 050E | 159E |
| 0000267460 | 0005 | 0554 | 5F06 | 665F | 6E75 | 0163 | 1E02 | 0601 |
| 0000267500 | 7749 | 6E05 | 1001 | 6300 | 0001 | 0400 | 690F | 5F69 |
| 0000267520 | 6F63 | 6E6E | 6365 | 5F74 | 6177 | 7469 | 0408 | 0006 |
| 0000267540 | 0085 | 6802 | 0B70 | 0804 | C600 | 0500 | 6573 | 5F6D |
| 0000267560 | 0C70 | FA04 | C0FF | 0600 | 5F5F | 7974 | 6570 | 040F |
| 0000267600 | FFEC | 0085 | 5F09 | 625F | 5F78 | 7974 | 6570 | 040D |
| 0000267620 | FFDC | 0409 | 5F07 | 705F | 6972 | 746E | 040B | FFD4 |
| 0000267640 | 0202 | 5F05 | 6C5F | 6C76 | 040D | FFE0 | 0556 | 5F07 |
| 0000267660 | 635F | 6F6C | 6B63 | 040D | FFF6 | 00C0 | 5F07 | 735F |
| 0000267700 | 6174 | 6B63 | 040E | FFDA | 0081 | 5F08 | 725F | 7465 |
| 0000267720 | 6176 | 0F6C | EE04 | 19FF | 0905 | 6970 | 6570 | 695F |
| 0000267740 | 666E | 086F | F404 | 81FF | 0200 | 6372 | 050E | 15BE |
| 0000267760 | 0005 | 0560 | 5F06 | 665F | 6E75 | 0163 | 1E02 | 7401 |
| 0000270000 | 794A | B905 | 1000 | AE00 | 0000 | 0400 | 690F | 5F69 |
| 0000270020 | 6F63 | 6E6E | 6365 | 5F74 | 6970 | 6570 | 0411 | 0006 |
| 0000270040 | 052D | 700B | 7069 | 5F65 | 6E69 | 6F66 | 705F | 0408 |
| 0000270060 | FFF6 | 0085 | 6802 | 0B70 | FA04 | C6FF | 0500 | 6573 |
| 0000270100 | 5F6D | 0870 | F804 | 81FF | 0200 | 6372 | 0201 | 011F |
| 0000270120 | 4B2D | 057B | 0030 | 0010 | 0025 | 0000 | 1004 | 6969 |
| 0000270140 | 745F | 7365 | 5F74 | 6970 | 6570 | 655F | 646E | 040F |

THU MAR 14 17:39:32 1991 IH.DLL PAGE 73, LINE 4249

| | | | | | | | | |
|---|---|---|---|---|---|---|---|---|
| 0000270160 | 0006 | 0081 | 6409 | 7365 | 5F74 | 7270 | 636F | 0408 |
| 0000270200 | FFFC | 0081 | 7202 | 0163 | 1E02 | 5D01 | 7D4B | 0005 |
| 0000270220 | 1002 | F500 | 0001 | 0400 | 690F | 5F69 | 6E69 | 7469 |
| 0000270240 | 695F | 6370 | 435F | 5652 | 040E | 0006 | 00C5 | 6908 |
| 0000270260 | 6370 | 695F | 5F64 | 0C70 | FA04 | C0FF | 0600 | 5F5F |
| 0000270300 | 7974 | 6570 | 040F | FFEC | 0085 | 5F09 | 625F | 5F78 |
| 0000270320 | 7974 | 6570 | 040D | FFDC | 0409 | 5F07 | 705F | 6972 |
| 0000270340 | 746E | 040B | FFD4 | 0202 | 5F05 | 6C5F | 6C76 | 040D |
| 0000270360 | FFE0 | 0556 | 5F07 | 635F | 6F6C | 6B63 | 040D | FFF2 |
| 0000270400 | 00C0 | 5F07 | 735F | 6174 | 6B63 | 040E | FFDA | 0081 |
| 0000270420 | 5F08 | 725F | 7465 | 6176 | 0F6C | BE04 | 57FF | 0905 |
| 0000270440 | 6970 | 6570 | 6E5F | 6D61 | 0A65 | D204 | 85FF | 0400 |
| 0000270460 | 5F67 | 7068 | 040A | FFBC | 0085 | 7804 | 685F | 0C70 |
| 0000270500 | EE04 | 85FF | 0600 | 7069 | 5F63 | 6469 | 040B | FFF6 |
| 0000270520 | 00C6 | 7305 | 6D65 | 705F | 0408 | FFF0 | 0081 | 7202 |
| 0000270540 | 0E63 | 0205 | 0516 | 6000 | 0605 | 5F5F | 7566 | 636E |
| 0000270560 | 0201 | 011E | 4D5D | 057F | 0024 | 0010 | 0019 | 0000 |
| 0000270600 | 0F04 | 6969 | 435F | 5652 | 735F | 7465 | 785F | 685F |
| 0000270620 | 0A70 | 0604 | 8500 | 0400 | 5F78 | 7068 | 0201 | 011E |
| 0000270640 | 4D81 | 0581 | 014C | 0010 | 0141 | 0000 | 0F04 | 6969 |
| 0000270660 | 435F | 5652 | 675F | 7465 | 785F | 685F | 0A70 | 0604 |
| 0000270700 | C500 | 0400 | 5F78 | 7068 | 040C | FFFA | 00C0 | 5F06 |
| 0000270720 | 745F | 7079 | 0F65 | F204 | 85FF | 0900 | 5F5F | 7862 |
| 0000270740 | 745F | 7079 | 0D65 | E204 | 09FF | 0704 | 5F5F | 7270 |
| 0000270760 | 6E69 | 0B74 | DA04 | 02FF | 0502 | 5F5F | 766C | 0D6C |
| 0000271000 | E604 | 56FF | 0705 | 5F5F | 6C63 | 636F | 0D6B | F604 |
| 0000271020 | C0FF | 0700 | 5F5F | 7473 | 6361 | 0E6B | E004 | 81FF |
| 0000271040 | 0800 | 5F5F | 6572 | 7674 | 6C61 | 0408 | FFF4 | 0081 |
| 0000271060 | 7202 | 0E63 | 2005 | 0516 | 6000 | 0605 | 5F5F | 7566 |
| 0000271100 | 636E | 0201 | 0D05 | 0000 | 001A | 050F | 144A | 0005 |
| 0000271120 | 00C0 | 4207 | 785F | 6946 | 656C | 0518 | 23C0 | 0005 |
| 0000271140 | 054F | 7210 | 7365 | 5F70 | 736D | 5F67 | 6174 | 6C62 |
| 0000271160 | 5F65 | 0F73 | 4E05 | 0514 | C000 | 0700 | 5F42 | 5078 |
| 0000271200 | 6361 | 126B | 6205 | 0514 | 8500 | 0A00 | 5F78 | 5243 |
| 0000271220 | 5F56 | 7068 | 735F | 0517 | 1452 | 0005 | 04CD | 490F |
| 0000271240 | 435F | 4D5F | 444F | 4C55 | 5F45 | 414E | 454D | 0514 |
| 0000271260 | 0000 | 0000 | 0081 | 420C | 5F78 | 6544 | 7562 | 4D67 |
| 0000271300 | 646F | 1465 | 0005 | 0000 | 8100 | 0C00 | 7842 | 545F |
| 0000271320 | 6D69 | 7365 | 6F4D | 6564 | 0510 | 0000 | 0000 | 0081 |
| 0000271340 | 4208 | 5F78 | 5F42 | 6973 | 0567 | 0111 | 0000 | 1B00 |
| 0000271360 | CE01 | DC4E | FE04 | 1001 | F300 | 0001 | 0400 | 690C |
| 0000271400 | 5F69 | 6970 | 6570 | 6D5F | 6B61 | 1165 | 0604 | C000 |
| 0000271420 | 0B00 | 6970 | 6570 | 6E5F | 6D61 | 5F65 | 0A70 | 0A04 |
| 0000271440 | C500 | 0400 | 7068 | 705F | 040D | FFF4 | 00C0 | 5F07 |
| 0000271460 | 735F | 6174 | 6B63 | 040E | FFD6 | 0081 | 5F08 | 725F |
| 0000271500 | 7465 | 6176 | 0B6C | EC04 | C0FF | 0500 | 6E65 | 5F76 |
| 0000271520 | 0E70 | F004 | 85FF | 0800 | 7562 | 5F66 | 6973 | 657A |
| 0000271540 | 040A | FFFC | 0085 | 6904 | 685F | 0970 | DC04 | 85FF |
| 0000271560 | 0300 | 7266 | 0863 | F204 | 81FF | 0200 | 6372 | 040C |
| 0000271600 | FFF8 | 00C0 | 5F06 | 745F | 7079 | 0F65 | EA04 | 85FF |
| 0000271620 | 0900 | 5F5F | 7862 | 745F | 7079 | 0D65 | D804 | F9FF |
| 0000271640 | 0703 | 5F5F | 7270 | 6E69 | 0B74 | D004 | 02FF | 0502 |
| 0000271660 | 5F5F | 766C | 0D6C | DE04 | E0FF | 0704 | 5F5F | 6C63 |
| 0000271700 | 636F | 0E6B | 8605 | 0516 | 4F00 | 0602 | 5F5F | 7566 |
| 0000271720 | 636E | 0201 | 011B | 50CC | 04E6 | 0374 | 0010 | 0369 |
| 0000271740 | 0000 | 0C04 | 6969 | 705F | 7069 | 5F65 | 706F | 6E65 |
| 0000271760 | 0411 | 0006 | 00C0 | 700B | 7069 | 5F65 | 616E | 656D |
| 0000272000 | 705F | 040D | 000A | 0082 | 7407 | 6D69 | 6F65 | 7475 |
| 0000272020 | 040A | 000E | 00C5 | 6804 | 5F70 | 0C70 | FA04 | C0FF |

THU MAR 14 17:39:32 1991 IH.DLL PAGE 74, LINE 4308

| | | | | | | | | |
|---|---|---|---|---|---|---|---|---|
| 0000272040 | 0600 | 5F5F | 7974 | 6570 | 040F | FFEC | 0085 | 5F09 |
| 0000272060 | 625F | 5F78 | 7974 | 6570 | 040D | FFDA | 03F9 | 5F07 |
| 0000272100 | 705F | 6972 | 746E | 040B | FFD2 | 0202 | 5F05 | 6C5F |
| 0000272120 | 6C76 | 040D | FFE0 | 04E0 | 5F07 | 635F | 6F6C | 6B63 |
| 0000272140 | 040D | FFF6 | 00C0 | 5F07 | 735F | 6174 | 6B63 | 040E |
| 0000272160 | FFD8 | 0081 | 5F08 | 725F | 7465 | 6176 | 086C | EE04 |
| 0000272200 | 85FF | 0200 | 7068 | 0409 | FFF0 | 0085 | 6103 | 7463 |
| 0000272220 | 0409 | FFDE | 0085 | 6603 | 6372 | 040B | FFF2 | 0085 |
| 0000272240 | 7205 | 7465 | 7972 | 0408 | FFF4 | 0081 | 7202 | 0E63 |
| 0000272260 | 0A05 | 0517 | 4F00 | 0602 | 5F5F | 7566 | 636E | 0201 |
| 0000272300 | 011E | 5440 | 04EB | 014A | 0010 | 013F | 0000 | 0F04 |
| 0000272320 | 6969 | 705F | 7069 | 5F65 | 6F63 | 6E6E | 6365 | 0874 |
| 0000272340 | 0604 | 8500 | 0200 | 7068 | 040C | FFFA | 00C0 | 5F06 |
| 0000272360 | 745F | 7079 | 0F65 | F204 | 85FF | 0900 | 5F5F | 7862 |
| 0000272400 | 745F | 7079 | 0D65 | E004 | F9FF | 0703 | 5F5F | 7270 |
| 0000272420 | 6E69 | 0B74 | D804 | 02FF | 0502 | 5F5F | 766C | 0D6C |
| 0000272440 | E604 | E0FF | 0704 | 5F5F | 6C63 | 636F | 0D6B | F604 |
| 0000272460 | C0FF | 0700 | 5F5F | 7473 | 6361 | 0E6B | DE04 | 81FF |
| 0000272500 | 0800 | 5F5F | 6572 | 7674 | 6C61 | 0409 | FFE4 | 0085 |
| 0000272520 | 6603 | 6372 | 0408 | FFF4 | 0081 | 7202 | 0E63 | 2605 |
| 0000272540 | 0517 | ED00 | 0604 | 5F5F | 7566 | 636E | 0201 | 0121 |
| 0000272560 | 558A | 04EF | 014A | 0010 | 013F | 0000 | 1204 | 6969 |
| 0000272600 | 705F | 7069 | 5F65 | 6964 | 6373 | 6E6F | 656E | 7463 |
| 0000272620 | 0408 | 0006 | 0085 | 6802 | 0C70 | FA04 | C0FF | 0600 |
| 0000272640 | 5F5F | 7974 | 6570 | 040F | FFF2 | 0085 | 5F09 | 625F |
| 0000272660 | 5F78 | 7974 | 6570 | 040D | FFE0 | 03F9 | 5F07 | 705F |
| 0000272700 | 6972 | 746E | u40B | FFD8 | 0202 | 5F05 | 6C5F | 6C76 |
| 0000272720 | 040D | FFE6 | 04E0 | 5F07 | 635F | 6F6C | 6B63 | 040D |
| 0000272740 | FFF6 | 00C0 | 5F07 | 735F | 6174 | 6B63 | 040E | FFDE |
| 0000272760 | 0081 | 5F08 | 725F | 7465 | 6176 | 096C | E404 | 85FF |
| 0000273000 | 0300 | 7266 | 0863 | F404 | 81FF | 0200 | 6372 | 050E |
| 0000273020 | 1744 | 0005 | 04F0 | 5F06 | 665F | 6E75 | 0163 | 1C02 |
| 0000273040 | D401 | F256 | 4A04 | 1001 | 3F00 | 0001 | 0400 | 690D |
| 0000273060 | 5F69 | 6970 | 6570 | 635F | 6F6C | 6573 | 0408 | 0006 |
| 0000273100 | 0085 | 6802 | 0C70 | FA04 | C0FF | 0600 | 5F5F | 7974 |
| 0000273120 | 6570 | 040F | FFF2 | 0085 | 5F09 | 625F | 5F78 | 7974 |
| 0000273140 | 6570 | 040D | FFE0 | 03F9 | 5F07 | 705F | 6972 | 746E |
| 0000273160 | 040B | FFD8 | 0202 | 5F05 | 6C5F | 6C76 | 040D | FFE6 |
| 0000273200 | 04E0 | 5F07 | 635F | 6F6C | 6B63 | 040D | FFF6 | 00C0 |
| 0000273220 | 5F07 | 735F | 6174 | 6B63 | 040E | FFDE | 0081 | 5F08 |
| 0000273240 | 725F | 7465 | 6176 | 096C | E404 | 85FF | 0300 | 7266 |
| 0000273260 | 0863 | F404 | 81FF | 0200 | 6372 | 050E | 1766 | 0005 |
| 0000273300 | 04F4 | 5F06 | 665F | 6E75 | 0163 | 0502 | 000D | 1A00 |
| 0000273320 | 0F00 | 7E05 | 0516 | C000 | 0700 | 5F42 | 4678 | 6C69 |
| 0000273340 | 0F65 | 8205 | 0516 | C000 | 0700 | 5F42 | 5078 | 6361 |
| 0000273360 | 146B | 0005 | 0000 | 8100 | 0C00 | 7842 | 445F | 6265 |
| 0000273400 | 6775 | 6F4D | 6564 | 0514 | 0000 | 0000 | 0081 | 420C |
| 0000273420 | 5F78 | 6954 | 656D | 4D73 | 646F | 1065 | 0005 | 0000 |
| 0000273440 | 8100 | 0800 | 7842 | 425F | 735F | 6769 | 1105 | 0001 |
| 0000273460 | 0000 | 011D | 581E | 043B | 01CD | 0010 | 01C2 | 0000 |
| 0000273500 | 0E04 | 5F69 | 7473 | 7261 | 5F74 | 6874 | 6572 | 6461 |
| 0000273520 | 0411 | 0006 | 027A | 740B | 7268 | 6165 | 5F64 | 7566 |
| 0000273540 | 636E | 0410 | 000A | 0085 | 730A | 6174 | 6B63 | 735F |
| 0000273560 | 7A69 | 1265 | 0C04 | C000 | 0C00 | 6874 | 6572 | 6461 |
| 0000273600 | 705F | 7261 | 6D61 | 0409 | 0010 | 00C5 | 7403 | 6469 |
| 0000273620 | 0412 | FFF2 | 0085 | 690C | 735F | 6174 | 6B63 | 735F |
| 0000273640 | 7A69 | 0B65 | F004 | 85FF | 0500 | 5F69 | 6974 | 0964 |
| 0000273660 | E004 | 85FF | 0300 | 7266 | 0863 | F404 | 81FF | 0200 |
| 0000273700 | 6372 | 040C | FFFA | 00C0 | 5F06 | 745F | 7079 | 0F65 |

THU MAR 14 17:39:32 1991 IH.DLL PAGE 75, LINE 4367

| | | | | | | | | |
|---|---|---|---|---|---|---|---|---|
| 0000273720 | EE04 | 85FF | 0900 | 5F5F | 7862 | 745F | 7079 | 0D65 |
| 0000273740 | DC04 | 40FF | 0704 | 5F5F | 7270 | 6E69 | 0B74 | D404 |
| 0000273760 | 02FF | 0502 | 5F5F | 766C | 0D6C | E204 | 42FF | 0704 |
| 0000274000 | 5F5F | 6C63 | 636F | 0D6B | F604 | C0FF | 0700 | 5F5F |
| 0000274020 | 7473 | 6361 | 0E6B | DA04 | 81FF | 0800 | 5F5F | 6572 |
| 0000274040 | 7674 | 6C61 | 050E | 179C | 0005 | 043E | 5F06 | 665F |
| 0000274060 | 6E75 | 0163 | 1F02 | EB01 | 4359 | 2704 | 1000 | 1C00 |
| 0000274100 | 0000 | 0400 | 6910 | 745F | 7268 | 6165 | 5F64 | 7473 |
| 0000274120 | 7261 | 6574 | 0164 | 0502 | 000D | 1A00 | 0F00 | 9005 |
| 0000274140 | 0517 | C000 | 0700 | 5F42 | 4678 | 6C69 | 0F65 | 9405 |
| 0000274160 | 0517 | C000 | 0700 | 5F42 | 5078 | 6361 | 146B | 0005 |
| 0000274200 | 0000 | 8100 | 0C00 | 7842 | 445F | 6265 | 6775 | 6F4D |
| 0000274220 | 6564 | 0514 | 0000 | 0000 | 0081 | 420C | 5F78 | 6954 |
| 0000274240 | 656D | 4D73 | 646F | 1C65 | 9805 | 0517 | 8600 | 1400 |
| 0000274260 | 6874 | 6572 | 6461 | 735F | 6174 | 7472 | 6465 | 735F |
| 0000274300 | 6D65 | 735F | 1105 | 0001 | 0000 | 0122 | 5A12 | 0567 |
| 0000274320 | 01D8 | 0010 | 01CD | 0000 | 1304 | 6969 | 735F | 6174 |
| 0000274340 | 7472 | 695F | 6370 | 745F | 7268 | 6165 | DC64 | FA04 |
| 0000274360 | C0FF | 0600 | 5F5F | 7974 | 6570 | 040F | FFF0 | 0085 |
| 0000274400 | 5F09 | 625F | 5F78 | 7974 | 6570 | 040D | FFE0 | 0421 |
| 0000274420 | 5F07 | 705F | 6972 | 746E | 040B | FFD8 | 0202 | 5F05 |
| 0000274440 | 6C5F | 6C76 | 040D | FFE4 | 056B | 5F07 | 635F | 6F6C |
| 0000274460 | 6B63 | 040D | FFF6 | 00C0 | 5F07 | 735F | 6174 | 6B63 |
| 0000274500 | 040E | FFDE | 0081 | 5F08 | 725F | 7465 | 6176 | 076C |
| 0000274520 | F204 | 81FF | 0100 | 0869 | F404 | 81FF | 0200 | 6372 |
| 0000274540 | 050E | 17D8 | 0005 | 0563 | 5F06 | 665F | 6E75 | 0163 |
| 0000274560 | 1C02 | EA01 | 6C5B | 0105 | 1006 | F600 | 0005 | 0400 |
| 0000274600 | 690D | 5F69 | 7069 | 5F63 | 6874 | 6572 | 6461 | 040C |
| 0000274620 | FFFA | 00C0 | 5F06 | 745F | 7079 | 0F65 | AE04 | 85FF |
| 0000274640 | 0900 | 5F5F | 7862 | 745F | 7079 | 0D65 | 7C04 | 21FF |
| 0000274660 | 0704 | 5F5F | 7270 | 6E69 | 0B74 | 7404 | 02FF | 0502 |
| 0000274700 | 5F5F | 766C | 0D6C | A204 | 6BFF | 0705 | 5F5F | 6C63 |
| 0000274720 | 636F | 0D6B | D604 | C0FF | 0700 | 5F5F | 7473 | 6361 |
| 0000274740 | 0E6B | 7A04 | 81FF | 0800 | 5F5F | 6572 | 7674 | 6C61 |
| 0000274760 | 040C | FFB2 | 0085 | 6906 | 6370 | 695F | 0D64 | 7004 |
| 0000275000 | F8FF | 0704 | 5F69 | 736D | 5F67 | 0E70 | DA04 | 70FF |
| 0000275020 | 0805 | 6572 | 6461 | 655F | 7272 | 0407 | FF80 | 0570 |
| 0000275040 | 6B01 | 040E | FFB4 | 0570 | 7208 | 6165 | 5F64 | 7266 |
| 0000275060 | 0963 | A004 | 85FF | 0300 | 7266 | 0763 | B004 | 85FF |
| 0000275100 | 0100 | 0869 | D404 | 81FF | 0200 | 6372 | 050E | 18D0 |
| 0000275120 | 0005 | 056E | 5F06 | 665F | 6E75 | 0163 | 1E02 | EB01 |
| 0000275140 | 7861 | 6205 | 1001 | 5700 | 0001 | 0400 | 690F | 5F69 |
| 0000275160 | 7865 | 6365 | 725F | 7165 | 6575 | 7473 | 040B | 0006 |
| 0000275200 | 04F8 | 6D05 | 6773 | 705F | 040C | FFFA | 00C0 | 5F06 |
| 0000275220 | 745F | 7079 | 0F65 | F204 | 85FF | 0900 | 5F5F | 7862 |
| 0000275240 | 745F | 7079 | 0D65 | E204 | 21FF | 0704 | 5F5F | 7270 |
| 0000275260 | 6E69 | 0B74 | DA04 | 02FF | 0502 | 5F5F | 766C | 0D6C |
| 0000275300 | E604 | 6BFF | 0705 | 5F5F | 6C63 | 636F | 0D6B | F604 |
| 0000275320 | C0FF | 0700 | 5F5F | 7473 | 6361 | 0E6B | E004 | 81FF |
| 0000275340 | 0800 | 5F5F | 6572 | 7674 | 6C61 | 0408 | FFF4 | 0081 |
| 0000275360 | 7202 | 0E63 | EC05 | 0518 | 7A00 | 0605 | 5F5F | 7566 |
| 0000275400 | 636E | 0201 | 0119 | 634D | 057C | 0250 | 0010 | 0245 |
| 0000275420 | 0000 | 0A04 | 6969 | 6E5F | 7765 | 695F | 6370 | 040B |
| 0000275440 | 0006 | 04F8 | 6D05 | 6773 | 705F | 040C | FFE2 | 00C0 |
| 0000275460 | 5F06 | 745F | 7079 | 0F65 | D604 | 85FF | 0900 | 5F5F |
| 0000275500 | 7862 | 745F | 7079 | 0D65 | C604 | 21FF | 0704 | 5F5F |
| 0000275520 | 7270 | 6E69 | 0B74 | BA04 | 02FF | 0502 | 5F5F | 766C |
| 0000275540 | 0D6C | CA04 | 6BFF | 0705 | 5F5F | 6C63 | 636F | 0D6B |
| 0000275560 | DE04 | C0FF | 0700 | 5F5F | 7473 | 6361 | 0E6B | C004 |

THU MAR 14 17:39:32 1991 IH.DLL PAGE 76, LINE 4426

| | | | | | | | | |
|---|---|---|---|---|---|---|---|---|
| 0000275600 | 81FF | 0800 | 5F5F | 6572 | 7674 | 6C61 | 0411 | FFB6 |
| 0000275620 | 00C0 | 700B | 7069 | 5F65 | 616E | 656D | 705F | 0408 |
| 0000275640 | FFD8 | 0085 | 6802 | 0C70 | E604 | F1FF | 0604 | 6B6F |
| 0000275660 | 6D5F | 6773 | 0414 | FFC2 | 04F8 | 6E0E | 7765 | 705F |
| 0000275700 | 7069 | 5F65 | 736D | 5F67 | 0C70 | DA04 | 85FF | 0600 |
| 0000275720 | 7069 | 5F63 | 6469 | 0408 | FFDC | 0081 | 7202 | 0E63 |
| 0000275740 | 0A05 | 0519 | 7E00 | 0605 | 5F5F | 7566 | 636E | 0201 |
| 0000275760 | 011F | 659D | 0580 | 0196 | 0010 | 018B | 0000 | 1004 |
| 0000276000 | 6969 | 615F | 6464 | 695F | 6370 | 655F | 746E | 7972 |
| 0000276020 | 040A | 0006 | 0081 | 7004 | 6F72 | 0963 | 0804 | 8500 |
| 0000276040 | 0300 | 6970 | 0964 | 0A04 | 8500 | 0300 | 6974 | 0F64 |
| 0000276060 | 0C04 | C000 | 0900 | 6970 | 6570 | 6E5F | 6D61 | 0865 |
| 0000276100 | 1004 | 8500 | 0200 | 7068 | 040E | 0012 | 00C5 | 6908 |
| 0000276120 | 6370 | 695F | 5F64 | 0C70 | FA04 | C0FF | 0600 | 5F5F |
| 0000276140 | 7974 | 6570 | 040F | FFF0 | 0085 | 5F09 | 625F | 5F78 |
| 0000276160 | 7974 | 6570 | 040D | FFE0 | 0421 | 5F07 | 705F | 6972 |
| 0000276200 | 746E | 040B | FFD8 | 0202 | 5F05 | 6C5F | 6C76 | 040D |
| 0000276220 | FFE4 | 056B | 5F07 | 635F | 6F6C | 6B63 | 040D | FFF6 |
| 0000276240 | 00C0 | 5F07 | 735F | 6174 | 6B63 | 040E | FFDE | 0081 |
| 0000276260 | 5F08 | 725F | 7465 | 6176 | 076C | F204 | 85FF | 0100 |
| 0000276300 | 0869 | F404 | 81FF | 0200 | 6372 | 050E | 1924 | 0005 |
| 0000276320 | 0581 | 5F06 | 665F | 6E75 | 0163 | 1F02 | 3301 | 8367 |
| 0000276340 | 6B05 | 1000 | 6000 | 0000 | 0400 | 6910 | 5F69 | 6573 |
| 0000276360 | 5F74 | 7069 | 5F63 | 6E65 | 7274 | 0C79 | 0604 | 8500 |
| 0000276400 | 0600 | 7069 | 5F63 | 6469 | 040A | 0008 | 0081 | 7004 |
| 0000276420 | 6F72 | 0963 | 0A04 | 8500 | 0300 | 6970 | 0964 | 0C04 |
| 0000276440 | 8500 | 0300 | 6974 | 0F64 | 0E04 | C000 | 0900 | 6970 |
| 0000276460 | 6570 | 6E5F | 6D61 | 0865 | 1204 | 8500 | 0200 | 7068 |
| 0000276500 | 0201 | 011C | 679E | 0585 | 003E | 0010 | 0033 | 0000 |
| 0000276520 | 0D04 | 6969 | 735F | 7465 | 695F | 6370 | 695F | 0C64 |
| 0000276540 | 0604 | 8500 | 0600 | 7069 | 5F63 | 6469 | 0409 | 0008 |
| 0000276560 | 0085 | 7003 | 6469 | 0409 | 000A | 0085 | 7403 | 6469 |
| 0000276600 | 0201 | 011F | 67DC | 0587 | 0070 | 0010 | 0065 | 0000 |
| 0000276620 | 1004 | 6969 | 725F | 6D65 | 766F | 5F65 | 7069 | 5F63 |
| 0000276640 | 6469 | 040C | 0006 | 0085 | 6906 | 6370 | 695F | 0164 |
| 0000276660 | 1802 | 4C01 | 8968 | 6305 | 1001 | 5800 | 0001 | 0400 |
| 0000276700 | 6909 | 5F69 | 5F71 | 7270 | 636F | 040C | 0006 | 0085 |
| 0000276720 | 6906 | 6370 | 695F | 0C64 | 0804 | C100 | 0600 | 7270 |
| 0000276740 | 636F | 705F | 040D | FFE6 | 056B | 5F07 | 635F | 6F6C |
| 0000276760 | 6B63 | 040D | FFF6 | 00C0 | 5F07 | 735F | 6174 | 6B63 |
| 0000277000 | 040E | FFE0 | 0081 | 5F08 | 725F | 7465 | 6176 | 086C |
| 0000277020 | F404 | 81FF | 0200 | 6372 | 040C | FFFA | 00C0 | 5F06 |
| 0000277040 | 745F | 7079 | 0F65 | F204 | 85FF | 0900 | 5F5F | 7862 |
| 0000277060 | 745F | 7079 | 0D65 | E204 | 21FF | 0704 | 5F5F | 7270 |
| 0000277100 | 6E69 | 0B74 | DA04 | 02FF | 0502 | 5F5F | 766C | 0E6C |
| 0000277120 | 4405 | 0519 | 8A00 | 0605 | 5F5F | 7566 | 636E | 0201 |
| 0000277140 | 0117 | 69AF | 058C | 0163 | 0010 | 0158 | 0000 | 0804 |
| 0000277160 | 6969 | 715F | 705F | 6469 | 040C | 0006 | 0085 | 6906 |
| 0000277200 | 6370 | 695F | 0B64 | 0804 | C500 | 0500 | 6970 | 5F64 |
| 0000277220 | 0C70 | FA04 | C0FF | 0600 | 5F5F | 7974 | 6570 | 040F |
| 0000277240 | FFF2 | 0085 | 5F09 | 625F | 5F78 | 7974 | 6570 | 040D |
| 0000277260 | FFE2 | 0421 | 5F07 | 705F | 6972 | 746E | 040B | FFDA |
| 0000277300 | 0202 | 5F05 | 6C5F | 6C76 | 040D | FFE6 | 056B | 5F07 |
| 0000277320 | 635F | 6F6C | 6B63 | 040D | FFF6 | 00C0 | 5F07 | 735F |
| 0000277340 | 6174 | 6B63 | 040E | FFE0 | 0081 | 5F08 | 725F | 7465 |
| 0000277360 | 6176 | 086C | F404 | 81FF | 0200 | 6372 | 050E | 195C |
| 0000277400 | 0005 | 058E | 5F06 | 665F | 6E75 | 0163 | 1702 | 1201 |
| 0000277420 | 906B | 6305 | 1001 | 5800 | 0001 | 0400 | 6908 | 5F69 |
| 0000277440 | 5F71 | 6974 | 0C64 | 0604 | 8500 | 0600 | 7069 | 5F63 |

THU MAR 14 17:39:32 1991 IH.DLL PAGE 77, LINE 4485

| | | | | | | | | |
|---|---|---|---|---|---|---|---|---|
| 0000277460 | 6469 | 040B | 0008 | 00C5 | 7405 | 6469 | 705F | 040C |
| 0000277500 | FFFA | 00C0 | 5F06 | 745F | 7079 | 0F65 | F204 | 85FF |
| 0000277520 | 0900 | 5F5F | 7862 | 745F | 7079 | 0D65 | E204 | 21FF |
| 0000277540 | 0704 | 5F5F | 7270 | 6E69 | 0B74 | DA04 | 02FF | 0502 |
| 0000277560 | 5F5F | 766C | 0D6C | E604 | 6BFF | 0705 | 5F5F | 6C63 |
| 0000277600 | 636F | 0D6B | F604 | C0FF | 0700 | 5F5F | 7473 | 6361 |
| 0000277620 | 0E6B | E004 | 81FF | 0800 | 5F5F | 6572 | 7674 | 6C61 |
| 0000277640 | 0408 | FFF4 | 0081 | 7202 | 0E63 | 7405 | 0519 | 8E00 |
| 0000277660 | 0605 | 5F5F | 7566 | 636E | 0201 | 0116 | 6C75 | 0592 |
| 0000277700 | 0163 | 0010 | 0158 | 0000 | 0704 | 6969 | 715F | 685F |
| 0000277720 | 0C70 | 0604 | 8500 | 0600 | 7069 | 5F63 | 6469 | 040A |
| 0000277740 | 0008 | 00C5 | 6804 | 5F70 | 0C70 | FA04 | C0FF | 0600 |
| 0000277760 | 5F5F | 7974 | 6570 | 040F | FFF2 | 0085 | 5F09 | 625F |
| 0000300000 | 5F78 | 7974 | 6570 | 040D | FFE2 | 0421 | 5F07 | 705F |
| 0000300020 | 6972 | 746E | 040B | FFDA | 0202 | 5F05 | 6C5F | 6C76 |
| 0000300040 | 040D | FFE6 | 056B | 5F07 | 635F | 6F6C | 6B63 | 040D |
| 0000300060 | FFF6 | 00C0 | 5F07 | 735F | 6174 | 6B63 | 040E | FFE0 |
| 0000300100 | 0081 | 5F08 | 725F | 7465 | 6176 | 086C | F404 | 81FF |
| 0000300120 | 0200 | 6372 | 050E | 198C | 0005 | 0593 | 5F06 | 665F |
| 0000300140 | 6E75 | 0163 | 1D02 | D801 | 956D | 8205 | 1001 | 7700 |
| 0000300160 | 0001 | 0400 | 690E | 5F69 | 5F71 | 7068 | 625F | 5F79 |
| 0000300200 | 6970 | 0964 | 0604 | 8500 | 0300 | 6970 | 0A64 | 0804 |
| 0000300220 | C500 | 0400 | 7068 | 705F | 040C | FFFA | 00C0 | 5F06 |
| 0000300240 | 745F | 7079 | 0F65 | F004 | 85FF | 0900 | 5F5F | 7862 |
| 0000300260 | 745F | 7079 | 0D65 | E004 | 21FF | 0704 | 5F5F | 7270 |
| 0000300300 | 6E69 | 0B74 | D804 | 02FF | 0502 | 5F5F | 766C | 0D6C |
| 0000300320 | E404 | 6BFF | 0705 | 5F5F | 6C63 | 636F | 0D6B | F604 |
| 0000300340 | C0FF | 0700 | 5F5F | 7473 | 6361 | 0E6B | DE04 | 81FF |
| 0000300360 | 0800 | 5F5F | 6572 | 7674 | 6C61 | 0407 | FFF2 | 0085 |
| 0000300400 | 6901 | 0408 | FFF4 | 0081 | 7202 | 0E63 | A205 | 0519 |
| 0000300420 | 9700 | 0605 | 5F5F | 7566 | 636E | 0201 | 011E | 6F5A |
| 0000300440 | 0599 | 0182 | 0010 | 0177 | 0000 | 0F04 | 6969 | 715F |
| 0000300460 | 685F | 5F70 | 7962 | 705F | 6F72 | 0A63 | 0604 | 8100 |
| 0000300500 | 0400 | 7270 | 636F | 040A | 0008 | 00C5 | 6804 | 5F70 |
| 0000300520 | 0770 | F204 | 85FF | 0100 | 0869 | F404 | 81FF | 0200 |
| 0000300540 | 6372 | 040C | FFFA | 00C0 | 5F06 | 745F | 7079 | 0F65 |
| 0000300560 | F004 | 85FF | 0900 | 5F5F | 7862 | 745F | 7079 | 0D65 |
| 0000300600 | E004 | 21FF | 0704 | 5F5F | 7270 | 6E69 | 0B74 | D804 |
| 0000300620 | 02FF | 0502 | 5F5F | 766C | 0D6C | E404 | 6BFF | 0705 |
| 0000300640 | 5F5F | 6C63 | 636F | 0D6B | F604 | C0FF | 0700 | 5F5F |
| 0000300660 | 7473 | 6361 | 0E6B | DE04 | 81FF | 0800 | 5F5F | 6572 |
| 0000300700 | 7674 | 6C61 | 050E | 19C0 | 0005 | 057A | 5F06 | 665F |
| 0000300720 | 6E75 | 0163 | 1902 | DC01 | 9B70 | 5805 | 1001 | 4D00 |
| 0000300740 | 0001 | 0400 | 690A | 5F69 | 5F71 | 6573 | 5F6D | 0C70 |
| 0000300760 | 0604 | 8500 | 0600 | 7069 | 5F63 | 6469 | 040B | 0008 |
| 0000301000 | 055A | 7305 | 6D65 | 705F | 040C | FFFA | 00C0 | 5F06 |
| 0000301020 | 745F | 7079 | 0F65 | F204 | 85FF | 0900 | 5F5F | 7862 |
| 0000301040 | 745F | 7079 | 0D65 | E204 | 21FF | 0704 | 5F5F | 7270 |
| 0000301060 | 6E69 | 0B74 | DA04 | 02FF | 0502 | 5F5F | 766C | 0D6C |
| 0000301100 | E604 | 6BFF | 0705 | 5F5F | 6C63 | 636F | 0D6B | F604 |
| 0000301120 | C0FF | 0700 | 5F5F | 7473 | 6361 | 0E6B | E004 | 81FF |
| 0000301140 | 0800 | 5F5F | 6572 | 7674 | 6C61 | 0408 | FFF4 | 0081 |
| 0000301160 | 7202 | 0E63 | DE05 | 0519 | 7E00 | 0605 | 5F5F | 7566 |
| 0000301200 | 636E | 0201 | 011F | 7234 | 059D | 0158 | 0010 | 014D |
| 0000301220 | 0000 | 1004 | 6969 | 715F | 705F | 7069 | 5F65 | 616E |
| 0000301240 | 656D | 705F | 040C | 0006 | 0085 | 6906 | 6370 | 695F |
| 0000301260 | 1164 | 0804 | 0500 | 0B02 | 6970 | 6570 | 6E5F | 6D61 |
| 0000301300 | 5F65 | 0C70 | FA04 | C0FF | 0600 | 5F5F | 7974 | 6570 |
| 0000301320 | 040F | FFF2 | 0085 | 5F09 | 625F | 5F78 | 7974 | 6570 |

THU MAR 14 17:39:32 1991 IH.DLL PAGE 78, LINE 4544

| | | | | | | | | |
|---|---|---|---|---|---|---|---|---|
| 0000301340 | 040D | FFE2 | 0421 | 5F07 | 705F | 6972 | 746E | 040B |
| 0000301360 | FFDA | 0202 | 5F05 | 6C5F | 6C76 | 040D | FFE6 | 056B |
| 0000301400 | 5F07 | 635F | 6F6C | 6B63 | 040D | FFF6 | 00C0 | 5F07 |
| 0000301420 | 735F | 6174 | 6B63 | 040E | FFE0 | 0081 | 5F08 | 725F |
| 0000301440 | 7465 | 6176 | 086C | F404 | 81FF | 0200 | 6372 | 050E |
| 0000301460 | 19F8 | 0005 | 0581 | 5F06 | 665F | 6E75 | 0163 | 1B02 |
| 0000301500 | 8C01 | 9F73 | 4205 | 1000 | 3700 | 0000 | 0400 | 690C |
| 0000301520 | 5F69 | 6573 | 5F74 | 5F71 | 6573 | 0D6D | 0604 | C600 |
| 0000301540 | 0700 | 5F71 | 6573 | 5F6D | 0170 | 1902 | CE01 | A073 |
| 0000301560 | 2505 | 1000 | 1A00 | 0000 | 0400 | 690A | 5F69 | 5F71 |
| 0000301600 | 5F71 | 6573 | 016D | 0502 | 000D | 1A00 | 0F00 | CA05 |
| 0000301620 | 0517 | C000 | 0700 | 5F42 | 4678 | 6C69 | 0F65 | CE05 |
| 0000301640 | 0517 | C000 | 0700 | 5F42 | 5078 | 6361 | 146B | 0005 |
| 0000301660 | 0000 | 8100 | 0C00 | 7842 | 445F | 6265 | 6775 | 6F4D |
| 0000301700 | 6564 | 0514 | 0000 | 0000 | 0081 | 420C | 5F78 | 6954 |
| 0000301720 | 656D | 4D73 | 646F | 1465 | 0005 | 0000 | 8100 | 0C00 |
| 0000301740 | 7842 | 455F | 7272 | 726F | 6F4D | 6564 | 0513 | 2512 |
| 0000301760 | 0005 | 0566 | 690B | 6370 | 745F | 6261 | 656C | 735F |
| 0000302000 | 0510 | 0000 | 0000 | 0081 | 4208 | 5F78 | 5F42 | 6973 |
| 0000302020 | 1167 | D205 | 0517 | C600 | 0900 | 5F71 | 6573 | 5F6D |
| 0000302040 | 5F70 | 1573 | B005 | 0524 | EC00 | 0D02 | 7069 | 5F63 |
| 0000302060 | 756D | 5F78 | 6573 | 5F6D | 1E73 | D605 | 0517 | 8500 |
| 0000302100 | 1600 | 7069 | 5F63 | 6874 | 6572 | 6461 | 735F | 6174 |
| 0000302120 | 7472 | 6465 | 665F | 735F | 6907 | 5F69 | 7274 | 632E |
| 0000302140 | 0001 | 0023 | 003C | 0000 | 0040 | 0010 | 0042 | 0015 |
| 0000302160 | 0044 | 0025 | 0045 | 002B | 0059 | 0038 | 005A | 0048 |
| 0000302200 | 005E | 004D | 0060 | 005D | 0061 | 0063 | 0075 | 0070 |
| 0000302220 | 0079 | 0080 | 007B | 0085 | 007C | 008B | 0092 | 0098 |
| 0000302240 | 0097 | 00A8 | 009B | 00AD | 009D | 00BD | 009E | 00C8 |
| 0000302260 | 00A0 | 00CD | 00A2 | 00D0 | 00A4 | 00EC | 00A5 | 0102 |
| 0000302300 | 00A7 | 0107 | 00A9 | 010A | 00AD | 0180 | 00AE | 0189 |
| 0000302320 | 00B0 | 018E | 00B2 | 0191 | 00B3 | 019A | 00B4 | 01A3 |
| 0000302340 | 00BB | 01AC | 00BC | 01B5 | 00BE | 01C5 | 00BF | 01CB |
| 0000302360 | 6909 | 695F | 706E | 7475 | 632E | 0001 | 0045 | 007E |
| 0000302400 | 01D8 | 007F | 01EE | 0085 | 0280 | 0089 | 0285 | 008B |
| 0000302420 | 0297 | 008C | 02A0 | 008E | 02A5 | 0090 | 02A8 | 0091 |
| 0000302440 | 02BA | 0093 | 02CF | 0094 | 02D2 | 0096 | 02E7 | 0097 |
| 0000302460 | 02FC | 0099 | 0305 | 009A | 0308 | 009B | 0311 | 009D |
| 0000302500 | 0321 | 009E | 039F | 00B8 | 03AD | 00B9 | 03C3 | 00BB |
| 0000302520 | 0456 | 00BE | 045B | 00C0 | 046C | 00C1 | 04EA | 00DA |
| 0000302540 | 04F8 | 00DB | 050E | 00DD | 05A1 | 00E0 | 05A6 | 00E2 |
| 0000302560 | 05B7 | 00E3 | 0635 | 0104 | 0643 | 0105 | 0659 | 0109 |
| 0000302600 | 06EC | 010D | 06F1 | 010E | 06FA | 0110 | 0717 | 0111 |
| 0000302620 | 071A | 0113 | 072F | 0114 | 073A | 0116 | 073F | 0117 |
| 0000302640 | 0742 | 0119 | 075C | 011A | 0765 | 011C | 0775 | 011D |
| 0000302660 | 07F3 | 0143 | 0801 | 0144 | 0817 | 0148 | 08AA | 014D |
| 0000302700 | 08AF | 014E | 08CC | 014F | 08F8 | 0151 | 08FD | 0152 |
| 0000302720 | 0909 | 0153 | 0926 | 0154 | 093C | 0155 | 096B | 0157 |
| 0000302740 | 0970 | 0158 | 097F | 015A | 098D | 015B | 0A0B | 017C |
| 0000302760 | 0A19 | 017D | 0A2F | 017F | 0AC2 | 0183 | 0AC7 | 0184 |
| 0000303000 | 0AD9 | 0186 | 0ADE | 0187 | 0AE1 | 0189 | 0AF2 | 018A |
| 0000303020 | 0B70 | 690A | 5F69 | 6E69 | 7570 | 2E74 | 0163 | F700 |
| 0000303040 | 9400 | 7E00 | 950B | 8E00 | 9E0B | 2100 | A20C | 2600 |
| 0000303060 | A40C | 2E00 | A70C | 4200 | A80C | 4A00 | AB0C | 4F00 |
| 0000303100 | AD0C | 6400 | AE0C | 6E00 | B00C | 8300 | B20C | 8D00 |
| 0000303120 | B40C | 9200 | B60C | 9C00 | BA0C | A600 | BC0C | BB00 |
| 0000303140 | C00C | BE00 | C20C | D300 | C70C | D600 | C90C | E300 |
| 0000303160 | CB0C | EE00 | CECC | FD00 | D10C | 1900 | D90D | 1C00 |
| 0000303200 | DA0D | 2900 | DC0D | 3A00 | DD0D | 4300 | DF0D | 4800 |

THU MAR 14 17:39:32 1991 IH.DLL PAGE 79, LINE 4603

| | | | | | | | | |
|---|---|---|---|---|---|---|---|---|
| 0000303220 | E10D | 5300 | E30D | 5B00 | E40D | 6A00 | E70D | 7400 |
| 0000303240 | E80D | 7700 | EA0D | 9100 | EB0D | 9400 | EC0D | 9E00 |
| 0000303260 | EE0D | A700 | EF0D | AA00 | F00D | B300 | F20D | C300 |
| 0000303300 | F30D | 4100 | 0A0E | 4C01 | 0B0E | 5C01 | 130E | EF01 |
| 0000303320 | 170E | F401 | 190E | FE01 | 1C0E | 0401 | 1E0F | 0A01 |
| 0000303340 | 200F | 1E01 | 210F | 2E01 | 220F | 4A01 | 250F | 4D01 |
| 0000303360 | 270F | 5501 | 2A0F | 6901 | 2B0F | 7101 | 300F | 7601 |
| 0000303400 | 320F | 8B01 | 330F | 9501 | 350F | AA01 | 370F | B401 |
| 0000303420 | 3E0F | B901 | 3F0F | C201 | 400F | CB01 | 420F | E101 |
| 0000303440 | 430F | F301 | 470F | F801 | 480F | 0101 | 4A10 | 0A01 |
| 0000303460 | 4B10 | 0D01 | 4C10 | 1701 | 4E10 | 2001 | 4F10 | 2301 |
| 0000303500 | 5010 | 2C01 | 5210 | 3C01 | 5310 | BA01 | 7710 | C501 |
| 0000303520 | 7810 | D501 | 8010 | 6801 | 8511 | 6D01 | 8711 | 7E01 |
| 0000303540 | 8811 | 8701 | 8B11 | 8C01 | 8D11 | 8F01 | 8F11 | 9401 |
| 0000303560 | 9011 | 9E01 | 9211 | A301 | 9411 | A601 | 9511 | BB01 |
| 0000303600 | 9611 | BF01 | 9811 | 1701 | 9A12 | 2101 | 9C12 | 2501 |
| 0000303620 | 9D12 | 3001 | A112 | 3601 | A312 | 4301 | A412 | 4E01 |
| 0000303640 | A612 | 5A01 | A712 | 5D01 | A912 | 6E01 | AB12 | 7701 |
| 0000303660 | AC12 | 8001 | B012 | 8501 | B212 | 8E01 | B312 | 9701 |
| 0000303700 | B512 | A701 | B612 | 2501 | DB13 | 3001 | DC13 | 4001 |
| 0000303720 | E413 | D301 | E913 | D801 | EB13 | E901 | EC13 | F201 |
| 0000303740 | EF13 | F701 | F113 | FA01 | F313 | FF01 | F413 | 0901 |
| 0000303760 | F614 | 0E01 | F814 | 1101 | F914 | 2601 | FB14 | 2A01 |
| 0000304000 | FD14 | 3401 | FF14 | 3801 | 0014 | 4202 | 0414 | 4802 |
| 0000304020 | 0614 | 5502 | 0714 | 6002 | 0914 | 6C02 | 0A14 | 6F02 |
| 0000304040 | 0C14 | 8002 | 0E14 | 8902 | 0F14 | 9202 | 1314 | 9702 |
| 0000304060 | 1514 | A002 | 1614 | A902 | 1814 | B902 | 1914 | 3702 |
| 0000304100 | 4015 | 4202 | 4115 | 5202 | 4315 | E502 | 4615 | EA02 |
| 0000304120 | 4815 | EF02 | 4915 | 6D02 | 5F16 | 7802 | 6016 | 8802 |
| 0000304140 | 6616 | 1B02 | 6B17 | 2002 | 6D17 | 3102 | 6E17 | 3A02 |
| 0000304160 | 7017 | 3F02 | 7217 | 4202 | 7317 | 4D02 | 7517 | 5202 |
| 0000304200 | 7717 | 5502 | 7917 | 5D02 | 7B17 | 6702 | 7C17 | 6B02 |
| 0000304220 | 7D17 | 7602 | 7F17 | 7C02 | 8017 | 9102 | 8117 | 9502 |
| 0000304240 | 8317 | ED02 | 8617 | FF02 | 8717 | 1102 | 8918 | 2402 |
| 0000304260 | 8B18 | 2D02 | 8D18 | 3802 | 8E18 | 4302 | 9218 | 4E02 |
| 0000304300 | 9418 | 5702 | 9518 | 6002 | 9718 | AE02 | 9818 | 2C02 |
| 0000304320 | AB19 | 3702 | AC19 | 4702 | B019 | DA02 | B419 | DF02 |
| 0000304340 | B619 | EF02 | B719 | FA02 | B919 | FF02 | BB19 | 0202 |
| 0000304360 | BC1A | 1002 | BD1A | 1902 | BE1A | 2202 | BF1A | 2B02 |
| 0000304400 | C01A | 3402 | C21A | 3E02 | C41A | 4F02 | C51A | CD02 |
| 0000304420 | DB1A | D802 | DC1A | E802 | E21A | 7B02 | E71B | 8002 |
| 0000304440 | E91B | 9102 | EA1B | 9A02 | EC1B | 9F02 | EE1B | A202 |
| 0000304460 | EF1B | AC02 | F11B | B102 | F31B | B402 | F51B | BC02 |
| 0000304500 | F71B | C602 | F81B | CA02 | F91B | D402 | FB1B | DA02 |
| 0000304520 | FC1B | EF02 | FE1B | F302 | 011B | 0503 | 021C | 1703 |
| 0000304540 | D41C | 2A03 | 061C | 3303 | 081C | 3E03 | 091C | 4903 |
| 0000304560 | 0D1C | 5403 | 0F1C | 5D03 | 101C | DB03 | 271C | E603 |
| 0000304600 | 291C | F603 | 2A1C | 0303 | 401D | 0E03 | 421D | 1E03 |
| 0000304620 | 431D | 2F03 | 5B1D | 3A03 | 5F1D | 4A03 | 601D | 5E03 |
| 0000304640 | 611D | 7503 | 761D | 8003 | 7A1D | 9003 | 7B1D | A403 |
| 0000304660 | 7C1D | BB03 | 961D | C603 | 971D | D603 | 991D | 6903 |
| 0000304700 | 9D1E | 6E03 | 9E1E | 8003 | A01E | 8503 | A11E | 8803 |
| 0000304720 | A31E | 9C03 | A41E | 1A03 | BA1F | 2503 | BB1F | 3503 |
| 0000304740 | BD1F | C803 | C11F | CD03 | C21F | DF03 | C41F | E403 |
| 0000304760 | C51F | E703 | C71F | FF03 | C81F | 7D03 | 0720 | 5F69 |
| 0000305000 | 7069 | 2E63 | 0163 | D000 | 8300 | 8800 | 8420 | 9E00 |
| 0000305020 | 8D20 | 3100 | 9221 | 3600 | 9321 | 4800 | 9521 | 4D00 |
| 0000305040 | 9721 | 5000 | 9921 | 5800 | 9D21 | 6100 | 9F21 | 7F00 |
| 0000305060 | A121 | 9400 | A421 | 9D00 | A521 | A700 | A621 | AD00 |

THU MAR 14 17:39:32 1991 IH.DLL PAGE 80, LINE 4662

| | | | | | | | | |
|---|---|---|---|---|---|---|---|---|
| 0000305100 | A921 | B300 | AC21 | CE00 | AE21 | DD00 | B321 | F100 |
| 0000305120 | B421 | 6F00 | D622 | 7D00 | D722 | 9300 | E022 | 2600 |
| 0000305140 | E623 | 2B00 | E823 | 4200 | EA23 | 5700 | EC23 | 6000 |
| 0000305160 | EE23 | 6B00 | EF23 | 7700 | F123 | 8200 | F323 | 9600 |
| 0000305200 | F723 | 9F00 | F823 | B600 | FA23 | CB00 | FC23 | D400 |
| 0000305220 | FF23 | E600 | 0223 | EF01 | 0323 | F901 | 0423 | FF01 |
| 0000305240 | 0623 | 0501 | 0724 | 1E01 | 0924 | 2901 | 0A24 | 3201 |
| 0000305260 | 0D24 | 3B01 | 0E24 | B901 | 3024 | C701 | 3124 | DD01 |
| 0000305300 | 3B24 | 7001 | 4125 | 7501 | 4225 | 9901 | 4425 | 9E01 |
| 0000305320 | 4625 | A101 | 4925 | A901 | 4A25 | B301 | 4B25 | B901 |
| 0000305340 | 4D25 | BF01 | 5125 | D801 | 5325 | EA01 | 5525 | FA01 |
| 0000305360 | 5725 | FD01 | 5925 | 0601 | 5B26 | 1D01 | 5D26 | 3201 |
| 0000305400 | 6126 | 3B01 | 6326 | 5A01 | 6526 | 6301 | 6626 | 7301 |
| 0000305420 | 6A26 | 8701 | 6C26 | 9001 | 6E26 | 9E01 | 7026 | A701 |
| 0000305440 | 7126 | B101 | 7826 | B601 | 7926 | BF01 | 7B26 | C801 |
| 0000305460 | 7C26 | 4601 | 9627 | 5401 | 9A27 | 6A01 | 9C27 | 7801 |
| 0000305500 | 9D27 | 7B01 | B027 | 8901 | B127 | 9F01 | B327 | 3201 |
| 0000305520 | B828 | 3701 | BA28 | 4801 | BB28 | C601 | CD28 | D401 |
| 0000305540 | CE28 | EA01 | D228 | 7D01 | D629 | 8201 | D829 | 9401 |
| 0000305560 | DA29 | 9F01 | DC29 | AD01 | DD29 | 2B01 | EF2A | 3701 |
| 0000305600 | F02A | 4D01 | F52A | E001 | F92A | E501 | FB2A | F301 |
| 0000305620 | FD2A | 0601 | FF2B | 1601 | 012B | 1F02 | 022B | 2802 |
| 0000305640 | 042B | 3302 | 062B | 4102 | 082B | 4C02 | 092B | CA02 |
| 0000305660 | 1C2B | D802 | 1D2B | EE02 | 212B | 8102 | 262C | 8602 |
| 0000305700 | 282C | 9802 | 292C | A102 | 2B2C | AF02 | 2C2C | B802 |
| 0000305720 | 2E2C | C802 | 2F2C | D102 | 312C | DF02 | 322C | 5D02 |
| 0000305740 | 5F2D | 6902 | 602D | 7F02 | 662D | 1202 | 6A2E | 1702 |
| 0000305760 | 6C2E | 5A02 | 6E2E | 6302 | 6F2E | 6C02 | 712E | 7102 |
| 0000306000 | 722E | 7402 | 752E | 7902 | 772E | 8202 | 792E | 9502 |
| 0000306020 | 7B2E | 9E02 | 802E | AC02 | 832E | C002 | 862E | D402 |
| 0000306040 | 892E | 2502 | 8A2F | 3902 | 8C2F | 4902 | 8F2F | 5202 |
| 0000306060 | 902F | D002 | B62F | DE02 | B72F | F402 | B92F | 8702 |
| 0000306100 | BE30 | 8C02 | C330 | 9A02 | C530 | AE02 | C630 | 2C02 |
| 0000306120 | F831 | 3A02 | F931 | 5002 | 0031 | E303 | 0431 | E803 |
| 0000306140 | 0631 | FB03 | 0731 | 0503 | 0932 | 0A03 | 0A32 | 0D03 |
| 0000306160 | 0B32 | 1F03 | 0D32 | 2403 | 1032 | 2703 | 1232 | 6A03 |
| 0000306200 | 1432 | 7303 | 1532 | 7C03 | 1732 | 8103 | 1832 | 8403 |
| 0000306220 | 1C32 | 8903 | 1E32 | 9203 | 2032 | A203 | 2232 | AB03 |
| 0000306240 | 2732 | B903 | 2A32 | CD03 | 2D32 | E103 | 3032 | 3203 |
| 0000306260 | 3133 | 4603 | 3333 | 5603 | 3633 | 5F03 | 3733 | DD03 |
| 0000306300 | 5033 | EB03 | 5133 | 0103 | 5634 | 9403 | 5B34 | 9903 |
| 0000306320 | 5D34 | AB03 | 5E34 | B403 | 6034 | B903 | 6234 | BC03 |
| 0000306340 | 6434 | C503 | 6634 | D403 | 6834 | D703 | 6934 | E403 |
| 0000306360 | 6B34 | F803 | 6C34 | FB03 | 6E34 | 0F03 | 7135 | 2A03 |
| 0000306400 | 7235 | A803 | 8F35 | B603 | 9035 | CC03 | 9535 | 5F03 |
| 0000306420 | 9936 | 6403 | 9A36 | 7303 | 9C36 | 8003 | 9E36 | 8B03 |
| 0000306440 | 9F36 | 9703 | A136 | A203 | A336 | B603 | A536 | BF03 |
| 0000306460 | A736 | D103 | A836 | 4F03 | BA37 | 5D03 | BD37 | 7303 |
| 0000306500 | BF37 | 8103 | C037 | 8403 | 0837 | 6969 | 695F | 6370 |
| 0000306520 | 632E | 0001 | 00BF | 0063 | 3792 | 0064 | 37A2 | 006E |
| 0000306540 | 3834 | 0072 | 3839 | 0075 | 3849 | 0077 | 3865 | 0079 |
| 0000306560 | 387F | 007B | 3888 | 007D | 3898 | 007E | 38AA | 0080 |
| 0000306600 | 38BF | 0081 | 38CA | 0083 | 38CF | 0086 | 38D2 | 0088 |
| 0000306620 | 38E8 | 008A | 392C | 008C | 3940 | 0091 | 3949 | 0093 |
| 0000306640 | 3968 | 0095 | 3971 | 0098 | 397E | 009A | 3997 | 009B |
| 0000306660 | 399A | 009D | 399F | 00A0 | 39AD | 00A2 | 39BB | 00A4 |
| 0000306700 | 39C3 | 00A5 | 3A41 | 00B8 | 3A4C | 00B9 | 3A5C | 00BE |
| 0000306720 | 3AEF | 00C3 | 3AF4 | 00C5 | 3B08 | 00C7 | 3B18 | 00C9 |
| 0000306740 | 3B2B | 00CA | 3BA9 | 00E2 | 3BB4 | 00E3 | 3BC4 | 00E9 |

THU MAR 14 17:39:32 1991 IH.DLL PAGE 81, LINE 4721

| | | | | | | | | |
|---|---|---|---|---|---|---|---|---|
| 0000306760 | 3C57 | 00ED | 3C5C | 00EF | 3C98 | 00F1 | 3CB1 | 00F2 |
| 0000307000 | 3CC5 | 00F4 | 3CCA | 00F5 | 3D48 | 010A | 3D53 | 010B |
| 0000307020 | 3D63 | 010D | 3DF6 | 0110 | 3DFB | 0112 | 3E09 | 0113 |
| 0000307040 | 3E11 | 0115 | 3E1B | 0117 | 3E2F | 0118 | 3EAD | 0130 |
| 0000307060 | 3EB8 | 0131 | 3EC8 | 0135 | 3F5B | 0139 | 3F60 | 013A |
| 0000307100 | 3F73 | 013B | 3F85 | 013C | 3F9B | 013D | 3FB1 | 0140 |
| 0000307120 | 3FD0 | 0142 | 3FE6 | 0144 | 3FF8 | 0145 | 4001 | 0147 |
| 0000307140 | 4006 | 0148 | 4009 | 0149 | 4012 | 014B | 4017 | 014D |
| 0000307160 | 4020 | 014F | 403E | 0150 | 404F | 0153 | 4054 | 0154 |
| 0000307200 | 40D2 | 0168 | 40DD | 0169 | 40ED | 016E | 4180 | 016F |
| 0000307220 | 418A | 0172 | 41F1 | 0174 | 4210 | 0175 | 422A | 0177 |
| 0000307240 | 4240 | 0179 | 4243 | 017B | 4251 | 017C | 42B4 | 019D |
| 0000307260 | 42BF | 0191 | 42CF | 0196 | 4362 | 019A | 4367 | 019C |
| 0000307300 | 4384 | 019E | 43B2 | 01A0 | 43C2 | 01A1 | 43CD | 01A3 |
| 0000307320 | 43D2 | 01A5 | 43D5 | 01A7 | 43E3 | 01A8 | 43EB | 01A9 |
| 0000307340 | 43F4 | 01AB | 43FE | 01AC | 4418 | 01B0 | 442E | 01B1 |
| 0000307360 | 44AF | 01C7 | 44BA | 01C8 | 44CA | 01CA | 455D | 01CF |
| 0000307400 | 4562 | 01D1 | 4573 | 01D3 | 457C | 01D4 | 4586 | 01D5 |
| 0000307420 | 4590 | 01D8 | 459A | 01D9 | 4618 | 01EC | 4623 | 01ED |
| 0000307440 | 4633 | 01F2 | 46C6 | 01F7 | 46CB | 01F9 | 46DD | 01FB |
| 0000307460 | 46E6 | 01FC | 46F0 | 01FD | 4705 | 01FE | 470F | 01FF |
| 0000307500 | 4719 | 0202 | 4721 | 0203 | 479F | 0217 | 47AA | 0218 |
| 0000307520 | 47BA | 021A | 484D | 021F | 4852 | 0221 | 4860 | 0223 |
| 0000307540 | 4869 | 0225 | 487D | 0226 | 48FB | 023A | 4906 | 023B |
| 0000307560 | 4916 | 023F | 49A9 | 0244 | 49AE | 0245 | 49B4 | 0249 |
| 0000307600 | 49C0 | 024B | 49DD | 024C | 49E6 | 024E | 49EB | 024F |
| 0000307620 | 4A69 | 0264 | 4A74 | 0268 | 4A84 | 026C | 4A89 | 026E |
| 0000307640 | 4AB3 | 026F | 4ABC | 0271 | 4ACD | 0273 | 4AD2 | 0275 |
| 0000307660 | 4AE0 | 0276 | 4AE9 | 0277 | 4AF4 | 0279 | 4AFF | 027A |
| 0000307700 | 4B22 | 028D | 4B2D | 028E | 4B3D | 0291 | 4B42 | 0293 |
| 0000307720 | 4B4C | 0294 | 4B52 | 02A8 | 4B5D | 02A9 | 4B6D | 02B1 |
| 0000307740 | 4C00 | 02B6 | 4C05 | 02B7 | 4C1A | 02B9 | 4C34 | 02BC |
| 0000307760 | 4C3D | 02BD | 4C52 | 02BF | 4C6C | 02C2 | 4C75 | 02C4 |
| 0000310000 | 4C93 | 02C6 | 4C9C | 02C7 | 4CA7 | 02C9 | 4CB7 | 02CD |
| 0000310020 | 4CC2 | 02CE | 4CCB | 02D0 | 4CD4 | 02D1 | 4D52 | 02E5 |
| 0000310040 | 4D5D | 02E8 | 4D6D | 02EA | 4D73 | 02EB | 4D76 | 0300 |
| 0000310060 | 4D81 | 0301 | 4D91 | 0303 | 4E24 | 0307 | 4E29 | 0308 |
| 0000310100 | 4E33 | 030A | 4E38 | 030B | 4E3B | 030D | 4E44 | 030E |
| 0000310120 | 4EC2 | 6909 | 5F69 | 6970 | 6570 | 632E | 0001 | 0040 |
| 0000310140 | 0043 | 4ECE | 0044 | 4EDE | 004B | 4F70 | 0050 | 4F75 |
| 0000310160 | 0052 | 4F87 | 0053 | 4F92 | 0055 | 4FA9 | 0056 | 4FAC |
| 0000310200 | 0058 | 4FB1 | 005E | 5007 | 0060 | 502A | 0061 | 5033 |
| 0000310220 | 0063 | 5038 | 0064 | 503B | 0066 | 5044 | 0067 | 50C1 |
| 0000310240 | 007D | 50CC | 007E | 50DC | 0085 | 516E | 008F | 5173 |
| 0000310260 | 0091 | 5199 | 0093 | 51F0 | 0095 | 51FB | 0097 | 5205 |
| 0000310300 | 0098 | 524A | 009B | 52A1 | 009C | 52A4 | 009E | 52AD |
| 0000310320 | 00A1 | 52B2 | 00A3 | 530D | 00AA | 5317 | 00AC | 533D |
| 0000310340 | 00AE | 5340 | 00B0 | 539A | 00B4 | 539D | 00B5 | 53A6 |
| 0000310360 | 00B7 | 53AB | 00B8 | 53AE | 00BA | 53D7 | 00BB | 5435 |
| 0000310400 | 00CF | 5440 | 00D0 | 5450 | 00D4 | 54E3 | 00D8 | 54E8 |
| 0000310420 | 00DA | 54F3 | 00DB | 54FC | 00DD | 5501 | 00DE | 557F |
| 0000310440 | 00F1 | 558A | 00F2 | 559A | 00F6 | 562D | 00F9 | 5632 |
| 0000310460 | 00FB | 563D | 00FC | 5646 | 00FE | 564B | 00FF | 56C9 |
| 0000310500 | 0112 | 56D4 | 0113 | 56E4 | 0117 | 5777 | 011A | 577C |
| 0000310520 | 011C | 5787 | 011E | 5790 | 0120 | 5795 | 0121 | 5813 |
| 0000310540 | 6908 | 745F | 7268 | 2E64 | 0163 | 1600 | 6A00 | 1E00 |
| 0000310560 | 6B58 | 2E00 | 7158 | C000 | 7758 | C500 | 7958 | DA00 |
| 0000310600 | 7A58 | E600 | 7C58 | 0400 | 7D59 | 0D00 | 7F59 | 1200 |
| 0000310620 | 8159 | 1500 | 8359 | 2500 | 8459 | 2E00 | 8659 | 3300 |

THU MAR 14 17:39:32 1991 IH.DLL PAGE 82, LINE 4780

| | | | | | | | | |
|---|---|---|---|---|---|---|---|---|
| 0000310640 | 8759 | 3C00 | 8959 | 4500 | 8A59 | 5900 | 8C59 | 6200 |
| 0000310660 | 8D59 | E000 | A659 | EB00 | AA59 | FB00 | AC59 | 0400 |
| 0000310700 | AD5A | 0700 | 095A | 6969 | 745F | 7268 | 2E64 | 0163 |
| 0000310720 | E200 | 5F00 | 1200 | 605A | 2200 | 645A | B400 | 675A |
| 0000310740 | B900 | 6A5A | C300 | 6B5A | D700 | 6E5A | E400 | 705A |
| 0000310760 | EA00 | 725A | FE00 | 735A | 0C00 | 745B | 1A00 | 755B |
| 0000311000 | 3400 | 785B | 3700 | 7A5B | 5300 | 7B5B | 5C00 | 7D5B |
| 0000311020 | 6200 | 7E5B | DF00 | 915B | EA00 | 925B | FA00 | 9C5B |
| 0000311040 | 9100 | A15C | 9600 | A35C | C000 | A55C | C500 | A65C |
| 0000311060 | D900 | AA5C | EA00 | AD5C | EF00 | AF5C | 0400 | B05D |
| 0000311100 | 0D00 | B25D | 1200 | B45D | 1500 | BA5D | 2300 | BD5D |
| 0000311120 | 3F00 | BF5D | 4900 | C25D | 5A00 | C45D | 7100 | C55D |
| 0000311140 | 8200 | C95D | 8700 | CC5D | 8A00 | D05D | E300 | D55D |
| 0000311160 | 5600 | D75E | 6100 | DD5E | 1A00 | E05F | 1F00 | E15F |
| 0000311200 | 2200 | E85F | 2B00 | EC5F | 4200 | EE5F | 5200 | F05F |
| 0000311220 | 5800 | F35F | 5B00 | F55F | 7300 | F65F | 8000 | F85F |
| 0000311240 | 8500 | FC5F | 8800 | FF5F | AC00 | 015F | BA01 | 025F |
| 0000311260 | 1001 | 0560 | 2001 | 0760 | 2301 | 1960 | 3601 | 2060 |
| 0000311300 | 5501 | 2260 | 9601 | 2760 | 9F01 | 2960 | EE01 | 2B60 |
| 0000311320 | FC01 | 2C60 | 0501 | 2E61 | 5401 | 2F61 | 5701 | 3161 |
| 0000311340 | 7A01 | 3261 | E001 | 4661 | EB01 | 4761 | FB01 | 4961 |
| 0000311360 | 8E01 | 4D62 | 9301 | 5062 | 9D01 | 5262 | AE01 | 5A62 |
| 0000311400 | B101 | 5B62 | B601 | 5C62 | C401 | 5D62 | 4201 | 7063 |
| 0000311420 | 4D01 | 7163 | 5D01 | 7963 | F001 | 7D63 | F501 | 8063 |
| 0000311440 | 0401 | 8264 | 1E01 | 8964 | 2701 | 8B64 | 5501 | 8E64 |
| 0000311460 | 5E01 | 9164 | 6C01 | 9364 | 7C01 | 9464 | 8701 | 9664 |
| 0000311500 | 8C01 | 9A64 | 8F01 | 9C64 | A401 | 9D64 | AD01 | 9F64 |
| 0000311520 | B701 | A264 | C801 | A364 | D101 | A864 | DB01 | A964 |
| 0000311540 | EF01 | AC64 | F501 | AE64 | 1401 | AF65 | 9201 | C765 |
| 0000311560 | 9D01 | C865 | AD01 | CC65 | 4001 | D166 | 4501 | D366 |
| 0000311600 | 6A01 | D466 | 7301 | D666 | 7801 | D766 | 7B01 | D966 |
| 0000311620 | 9801 | DA66 | A101 | DC66 | AA01 | DD66 | 2801 | F667 |
| 0000311640 | 3301 | FA67 | 4301 | FB67 | 4D01 | FC67 | 5801 | FD67 |
| 0000311660 | 6301 | FE67 | 6E01 | FF67 | 8501 | 0167 | 9002 | 0267 |
| 0000311700 | 9302 | 1767 | 9E02 | 1A67 | AE02 | 1B67 | B802 | 1C67 |
| 0000311720 | C302 | 1E67 | CE02 | 1F67 | D102 | 3267 | DC02 | 3567 |
| 0000311740 | EC02 | 3767 | FA02 | 3867 | 0402 | 3968 | 0E02 | 3A68 |
| 0000311760 | 2202 | 3C68 | 3002 | 3E68 | 3E02 | 3F68 | 4102 | 5468 |
| 0000312000 | 4C02 | 5568 | 5C02 | 5768 | EF02 | 5C68 | F402 | 5D68 |
| 0000312020 | 1002 | 5F69 | 1502 | 6069 | 1802 | 6269 | 2602 | 6369 |
| 0000312040 | A402 | 7869 | AF02 | 7969 | BF02 | 7B69 | 5202 | 806A |
| 0000312060 | 5702 | 816A | 7302 | 836A | 7802 | 846A | 7B02 | 866A |
| 0000312100 | 8902 | 876A | 0702 | 9C6B | 1202 | 9D6B | 2202 | 9F6B |
| 0000312120 | B502 | A46B | BA02 | A56B | D602 | A76B | DB02 | A86B |
| 0000312140 | DE02 | AA6B | EC02 | AB6B | 6A02 | C06C | 7502 | C16C |
| 0000312160 | 8502 | C36C | 1802 | C86D | 1D02 | C96D | 3902 | CB6D |
| 0000312200 | 3E02 | CC6D | 4102 | CE6D | 4F02 | CF6D | CD02 | E36D |
| 0000312220 | D302 | E46D | E802 | E86D | 7B02 | EC6E | 8002 | EF6E |
| 0000312240 | 8502 | F06E | AC02 | F26E | B202 | F36E | BB02 | F56E |
| 0000312260 | C002 | F66E | C302 | F86E | D102 | F96E | 4F02 | 0D6F |
| 0000312300 | 5A03 | 0E6F | 6A03 | 126F | FD03 | 166F | 0203 | 1970 |
| 0000312320 | 0703 | 1A70 | 2E03 | 1C70 | 3403 | 1D70 | 3D03 | 1F70 |
| 0000312340 | 4203 | 2070 | 4503 | 2270 | 5303 | 2370 | D103 | 3870 |
| 0000312360 | DC03 | 3970 | EC03 | 3B70 | 7F03 | 3F71 | 8403 | 4171 |
| 0000312400 | 9203 | 4371 | 9703 | 4471 | 9A03 | 4671 | AB03 | 4771 |
| 0000312420 | 2903 | 5E72 | 3403 | 5F72 | 4403 | 6172 | D703 | 6572 |
| 0000312440 | DC03 | 6772 | EA03 | 6972 | EF03 | 6A72 | F203 | 6C72 |
| 0000312460 | 0303 | 6D73 | 8103 | 8073 | 8C03 | 8373 | 9C03 | 8573 |
| 0000312500 | A803 | 8773 | B503 | 8973 | C003 | 8A73 | C303 | 9E73 |

THU MAR 14 17:39:32 1991 IH.DLL PAGE 83, LINE 4839

| | | | | | | | | |
|---|---|---|---|---|---|---|---|---|
| 0000312520 | CE03 | A173 | DE03 | A273 | E803 | 0073 | 6C0C | 696C |
| 0000312540 | 6362 | 6C64 | 2E6C | 696C | 0762 | 736F | 2E32 | 696C |
| 0000312560 | 0A62 | 626C | 7069 | 746D | 6C2E | 6269 | 7506 | 2E69 |
| 0000312600 | 696C | 8962 | 0100 | 0101 | 0800 | 0000 | 2700 | 0200 |
| 0000312620 | 0101 | B300 | 0005 | 6400 | 0300 | 0101 | 2A00 | 0015 |
| 0000312640 | E000 | 040A | 0101 | 2600 | 008C | 4A00 | 0901 | 0101 |
| 0000312660 | 5900 | 00C5 | 9800 | 0100 | 0201 | 2F00 | 0000 | 2900 |
| 0000312700 | 0200 | 0201 | 1700 | 0006 | 7B00 | 0300 | 0201 | 0A00 |
| 0000312720 | 0020 | 7B00 | 040E | 0201 | 7000 | 008D | D800 | 0904 |
| 0000312740 | 0201 | F100 | 00C5 | 2200 | 0101 | 0301 | 5800 | 0000 |
| 0000312760 | 2A00 | 0200 | 0301 | 9200 | 0006 | 6100 | 0301 | 0301 |
| 0000313000 | 8500 | 002E | AB00 | 0412 | 0301 | 4800 | 0092 | DD00 |
| 0000313020 | 090A | 0301 | 1300 | 00C7 | EB00 | 0103 | 0401 | 8200 |
| 0000313040 | 0000 | 2700 | 0200 | 0401 | F300 | 0007 | F800 | 0300 |
| 0000313060 | 0401 | 3000 | 0041 | 2A00 | 0410 | 0401 | 2500 | 009D |
| 0000313100 | F200 | 090A | 0401 | FE00 | 00CA | 4C00 | 0103 | 0501 |
| 0000313120 | A900 | 0000 | 2800 | 0200 | 0501 | EB00 | 0008 | 9800 |
| 0000313140 | 0301 | 0501 | 5A00 | 0051 | D200 | 0411 | 0501 | 1700 |
| 0000313160 | 00A8 | D300 | 090B | 0501 | 4A00 | 00CE | 0900 | 0103 |
| 0000313200 | 0601 | D100 | 0000 | 2900 | 0200 | 0601 | 8300 | 000A |
| 0000313220 | 6E00 | 0300 | 0601 | 2C00 | 0063 | AB00 | 040C | 0601 |
| 0000313240 | EA00 | 00B3 | 4300 | 0904 | 0601 | 5300 | 00D1 | 0E00 |
| 0000313260 | 0101 | 0701 | FA00 | 0000 | 2800 | 0200 | 0701 | F100 |
| 0000313300 | 000A | 2E00 | 0300 | 0701 | D700 | 006F | A200 | 0409 |
| 0000313320 | 0701 | 2D00 | 00B8 | 9800 | 0901 | 0701 | 6100 | 00D2 |
| 0000313340 | 6500 | 0100 | 0801 | 2200 | 0001 | 2900 | 0200 | 0801 |
| 0000313360 | 1F00 | 000B | 7300 | 0301 | 0801 | 7900 | 0079 | AD00 |
| 0000313400 | 0412 | 0801 | C500 | 00B9 | 9400 | 090B | 0801 | C600 |
| 0000313420 | 00D2 | 9600 | 0103 | 0901 | 4B00 | 0001 | 1800 | 0200 |
| 0000313440 | 0901 | 9200 | 000C | 5200 | 0101 | 0A01 | 6300 | 0001 |
| 0000313460 | 1B00 | 0200 | 0A01 | E400 | 000D | D200 | 0101 | 0B01 |
| 0000313500 | 7E00 | 0001 | 1C00 | 0200 | 0B01 | B600 | 000F | 3500 |
| 0000313520 | 0100 | 0C01 | 9A00 | 0001 | 1700 | 0200 | 0C01 | EB0ù |
| 0000313540 | 000F | 0F00 | 0100 | 0D01 | B100 | 0001 | 1700 | 0200 |
| 0000313560 | 0D01 | FA00 | 000F | 3300 | 0100 | 0E01 | C800 | 0001 |
| 0000313600 | 1A00 | 0200 | 0E01 | 2D00 | 0010 | 1000 | 0100 | 0F01 |
| 0000313620 | E200 | 0001 | 1C00 | 0200 | 0F01 | 3D00 | 0010 | 2500 |
| 0000313640 | 0100 | 1001 | FE00 | 0001 | 1B00 | 0200 | 1001 | 6200 |
| 0000313660 | 0010 | 3F00 | 0100 | 1101 | 1900 | 0002 | 1800 | 0200 |
| 0000313700 | 1101 | A100 | 0010 | 0F00 | 0100 | 1201 | 3100 | 0002 |
| 0000313720 | 1400 | 0200 | 1201 | B000 | 0010 | 3700 | 0100 | 1301 |
| 0000313740 | 4500 | 0002 | 1800 | 0200 | 1301 | E700 | 0010 | 0F00 |
| 0000313760 | 0100 | 1401 | 5D00 | 0002 | 1800 | 0200 | 1401 | F600 |
| 0000314000 | 0010 | 0F00 | 0100 | 1501 | 7500 | 0002 | 1800 | 0200 |
| 0000314020 | 1501 | 0500 | 0011 | 0F00 | 0100 | 1601 | 8D00 | 0002 |
| 0000314040 | 1500 | 0200 | 1601 | 1400 | 0011 | 3000 | 0100 | 1701 |
| 0000314060 | A200 | 0002 | 1400 | 0200 | 1701 | 4400 | 0011 | 0E00 |
| 0000314100 | 0100 | 1801 | B600 | 0002 | 1700 | 0200 | 1801 | 5200 |
| 0000314120 | 0011 | 0F00 | 0100 | 1901 | CD00 | 0002 | 1500 | 0200 |
| 0000314140 | 1901 | 6100 | 0011 | 2000 | 0100 | 1A01 | E200 | 0002 |
| 0000314160 | 1A00 | 0200 | 1A01 | 8100 | 0011 | 1E00 | 0100 | 1B01 |
| 0000314200 | FC00 | 0002 | 1900 | 0200 | 1B01 | 9F00 | 0011 | 0C00 |
| 0000314220 | 0100 | 1C01 | 1500 | 0003 | 1600 | 0200 | 1C01 | AB00 |
| 0000314240 | 0011 | 1E00 | 0100 | 1D01 | 2B00 | 0003 | 1700 | 0200 |
| 0000314260 | 1D01 | C900 | 0011 | 1F00 | 0100 | 1E01 | 4200 | 0003 |
| 0000314300 | 1500 | 0200 | 1E01 | E800 | 0011 | 1B00 | 0100 | 1F01 |
| 0000314320 | 5700 | 0003 | 1800 | 0200 | 1F01 | 0300 | 0012 | 4200 |
| 0000314340 | 0100 | 2001 | 6F00 | 0003 | 1600 | 0200 | 2001 | 4500 |
| 0000314360 | 0012 | 0E00 | 0100 | 2101 | 8500 | 0003 | 1800 | 0200 |

THU MAR 14 17:39:32 1991 IH.DLL PAGE 84, LINE 4898

| | | | | | | | | |
|---|---|---|---|---|---|---|---|---|
| 0000314400 | 2101 | 5300 | 0012 | 1000 | 0100 | 2201 | 9D00 | 0003 |
| 0000314420 | 1800 | 0200 | 2201 | 6300 | 0012 | 1000 | 0100 | 2301 |
| 0000314440 | B500 | 0003 | 1900 | 0200 | 2301 | 7300 | 0012 | 1200 |
| 0000314460 | 0100 | 2401 | CE00 | 0003 | 1800 | 0200 | 2401 | 8500 |
| 0000314500 | 0012 | 4100 | 0100 | 2501 | E600 | 0003 | 1700 | 0200 |
| 0000314520 | 2501 | C600 | 0012 | 0F00 | 0100 | 2601 | FD00 | 0003 |
| 0000314540 | 1700 | 0200 | 2601 | D500 | 0012 | 0E00 | 0100 | 2701 |
| 0000314560 | 1400 | 0004 | 1700 | 0200 | 2701 | E300 | 0012 | 0E00 |
| 0000314600 | 0100 | 2801 | 2B00 | 0004 | 1800 | 0200 | 2801 | F100 |
| 0000314620 | 0012 | 0F00 | 0100 | 2901 | 4300 | 0004 | 1900 | 0200 |
| 0000314640 | 2901 | 0000 | 0013 | 5600 | 0100 | 2A01 | 5C00 | 0004 |
| 0000314660 | 1600 | 0200 | 2A01 | 5600 | 0013 | 1D00 | 0100 | 2B01 |
| 0000314700 | 7200 | 0004 | 1500 | 0200 | 2B01 | 7300 | 0013 | 0E00 |
| 0000314720 | 0100 | 2D01 | 8700 | 0004 | 1A00 | 0200 | 2D01 | 8100 |
| 0000314740 | 0013 | AB00 | 0100 | 2E01 | A100 | 0004 | 1B00 | 0200 |
| 0000314760 | 2E01 | 2C00 | 0014 | 2600 | 0100 | 2F01 | BC00 | 0004 |
| 0000315000 | 1D00 | 0200 | 2F01 | 5200 | 0014 | 2400 | 0100 | 3001 |
| 0000315020 | D900 | 0004 | 1600 | 0200 | 3001 | 7600 | 0014 | 0F00 |
| 0000315040 | 0100 | 3101 | EF00 | 0004 | 1500 | 0200 | 3101 | 8500 |
| 0000315060 | 0014 | 0E00 | 0100 | 3201 | 0400 | 0005 | 1700 | 0200 |
| 0000315100 | 3201 | 9300 | 0014 | 0E00 | 0100 | 3301 | 1B00 | 0005 |
| 0000315120 | 1800 | 0200 | 3301 | A100 | 0014 | 0E00 | 0100 | 3401 |
| 0000315140 | 3300 | 0005 | 1800 | 0200 | 3401 | AF00 | 0014 | 0E00 |
| 0000315160 | 0100 | 3501 | 4B00 | 0005 | 1200 | 0200 | 3501 | BD00 |
| 0000315200 | 0014 | 0B00 | 0100 | 3601 | 5D00 | 0005 | 1600 | 0200 |
| 0000315220 | 3601 | C800 | 0014 | 2300 | 0100 | 3701 | 7300 | 0005 |
| 0000315240 | 1600 | 0200 | 3701 | EB00 | 0014 | 1100 | 0100 | 3801 |
| 0000315260 | 8900 | 0005 | 1500 | 0200 | 3801 | FC00 | 0014 | 1F00 |
| 0000315300 | 0100 | 3901 | 9E00 | 0005 | 1500 | 0200 | 3901 | 1B00 |
| 0000315320 | 0015 | 0F00 | 0600 | 0001 | 5C00 | 00D6 | 2800 | 4E00 |
| 0000315340 | 3042 | E832 | 00DB | 0000 | | | | |
| 0000315347 | | | | | | | | |

THU MAR 14 17:39:56 1991 IPD.SYS PAGE 1, LINE 1

| | | | | | | | | |
|---|---|---|---|---|---|---|---|---|
| 0000000000 | 5A4D | 0098 | 0004 | 0000 | 0004 | 0000 | FFFF | 0000 |
| 0000000020 | 00B6 | 0000 | 0000 | 0000 | 0040 | 0000 | 0000 | 0000 |
| 0000000040 | 0000 | 0000 | 0000 | 0000 | 0000 | 0000 | 0000 | 0000 |
| 0000000060 | 0000 | 0000 | 0000 | 0000 | 0000 | 0000 | 0080 | 0000 |
| 0000000100 | 1F0E | 0EBA | B400 | CD09 | B821 | 4C01 | 21CD | 6854 |
| 0000000120 | 7369 | 7020 | 6F72 | 7267 | 6D61 | 6320 | 6E61 | 6F6E |
| 0000000140 | 2074 | 7572 | 206E | 6E69 | 4420 | 534F | 6D20 | 646F |
| 0000000160 | 2E65 | 0D0D | 240A | 0000 | 0000 | 0000 | 0000 | 0000 |
| 0000000200 | 454E | 0A05 | 0063 | 0002 | 5348 | A87F | 8009 | 0001 |
| 0000000220 | 0000 | 0000 | 0000 | 0000 | 0000 | 0000 | 0002 | 0001 |
| 0000000240 | 000D | 0040 | 0050 | 0050 | 0057 | 0059 | 00E5 | 0000 |
| 0000000260 | 0000 | 0004 | 0000 | 0001 | 0000 | 0000 | 0000 | 0000 |
| 0000000300 | 0010 | 0164 | 0C21 | 0164 | 0027 | 041E | 0D00 | 041E |
| 0000000320 | 4903 | 4450 | 0000 | 0100 | 0000 | 4408 | 534F | 4143 |
| 0000000340 | 4C4C | 0053 | 0900 | 5C2E | 7069 | 2E64 | 6C64 | 006C |
| 0000000360 | 0000 | 0000 | 0000 | 0000 | 0000 | 0000 | 0000 | 0000 |
| 0000000400 | FFFF | FFFF | 8880 | 0000 | 0000 | 5049 | 495F | 544E |
| 0000000420 | 5245 | 0000 | 0000 | 0000 | 0000 | 0000 | 0000 | 0000 |
| 0000000440 | 0000 | 0236 | 003D | 003D | 003D | 0065 | 010D | 0111 |
| 0000000460 | 0115 | 00B6 | 0119 | 011D | 0121 | 003D | 0041 | 0129 |
| 0000000500 | 003D | 014B | 003D | 003D | 003D | 0125 | 0000 | 0000 |
| 0000000520 | 0000 | 0000 | 0000 | 0D00 | 0000 | 0E00 | 0000 | 0F00 |
| 0000000540 | 0000 | 7000 | 000E | 0000 | 0003 | 000E | 0000 | 0003 |
| 0000000560 | 000A | 000A | 000A | 0001 | 0A0D | 5049 | 4920 | 746E |
| 0000000600 | 7265 | 6166 | 6563 | 4420 | 6972 | 6576 | 2072 | 6556 |
| 0000000620 | 2072 | 2E31 | 3131 | 0D20 | 450A | 7272 | 726F | 6920 |
| 0000000640 | 206E | 6E69 | 6574 | 7272 | 7075 | 2074 | 6564 | 6966 |
| 0000000660 | 696E | 6974 | 6E6F | 0D20 | 200A | 6E49 | 2074 | 6564 |
| 0000000700 | 2066 | 0A0D | 6E49 | 6574 | 7272 | 7075 | 2074 | 2033 |
| 0000000720 | 0A0D | 6E49 | 6574 | 7272 | 7075 | 2074 | 2043 | 0A0D |
| 0000000740 | 7245 | 6F72 | 2072 | 6E69 | 4120 | 6464 | 6572 | 7373 |
| 0000000760 | 2073 | 6564 | 6966 | 696E | 6974 | 6E6F | 0D20 | 410A |
| 0000001000 | 6464 | 6572 | 7373 | 6920 | 206E | 2045 | 6150 | 6567 |
| 0000001020 | 0D20 | 410A | 6464 | 6572 | 7373 | 6920 | 206E | 2043 |
| 0000001040 | 6150 | 6567 | 0D20 | 0D0A | 0A0A | 5049 | 4920 | 746E |
| 0000001060 | 7265 | 6166 | 6563 | 4420 | 6972 | 6576 | 2072 | 6241 |
| 0000001100 | 726F | 6574 | 0D64 | 0D0A | 200A | 2020 | 2020 | 2020 |
| 0000001120 | 2020 | 2020 | 2020 | 2020 | 2020 | 5244 | 5649 | 5245 |
| 0000001140 | 4D20 | 4753 | 0000 | 0000 | 0000 | 0000 | 0000 | 0000 |
| 0000001160 | 8B26 | 027F | E781 | 00FF | FF83 | 7E14 | E806 | 002D |
| 0000001200 | 07EB | 0390 | FFFF | 2295 | 2600 | 4789 | CB03 | 5350 |
| 0000001220 | B852 | 1111 | 22BB | B222 | FF05 | 1A1E | FA00 | 68A0 |
| 0000001240 | B200 | FF31 | 1A1E | 5A00 | 585B | FBF8 | B8CB | 8103 |
| 0000001260 | 53C3 | 00BB | 8900 | 661E | 8B00 | 681E | B600 | B200 |
| 0000001300 | B81B | 001E | 1EFF | 001A | 0673 | 0CB8 | EB81 | 9004 |
| 0000001320 | 00B8 | 5B01 | 06C3 | E853 | 01B6 | 1E8B | 004C | 4EA1 |
| 0000001340 | 8B00 | 500E | D100 | B6E1 | B201 | FF15 | 1A1E | 7300 |
| 0000001360 | B806 | 810B | 2DEB | D190 | 8BE9 | 81D9 | 80EB | 7806 |
| 0000001400 | B806 | 0680 | 09EB | 8B90 | 05C3 | 0680 | 01EB | 8B90 |
| 0000001420 | 1EC8 | 36C5 | 0052 | F3FC | 1FA5 | DB0B | 0278 | DBEB |
| 0000001440 | 00B8 | 5B01 | C307 | 5306 | 65E8 | 1E01 | 1E8B | 004C |
| 0000001460 | 4EA1 | 8B00 | 500E | D100 | B6E1 | B200 | FF15 | 1A1E |
| 0000001500 | 7300 | B806 | 810A | 32EB | 8C90 | 1FDA | E9D1 | D98B |
| 0000001520 | EB81 | 0680 | 0678 | 80B8 | EB06 | 9009 | C38B | 8005 |
| 0000001540 | EB06 | 9001 | C88B | 3EC4 | 0052 | 8E1E | FCDA | A5F3 |
| 0000001560 | 0B1F | 78DB | EB02 | B8D9 | 0100 | 075B | B8C3 | 0100 |
| 0000001600 | B8C3 | 0100 | B8C3 | 0100 | B8C3 | 0100 | B8C3 | 0100 |
| 0000001620 | B8C3 | 0100 | B8C3 | 0100 | 53C3 | 1E8B | 0068 | 1CB2 |
| 0000001640 | 1EFF | 001A | AAB8 | A3AA | 0066 | 11B8 | BB!1 | 2222 |

THU MAR 14 17:39:56 1991 IPD.SYS PAGE 2, LINE 60

| | | | | | | | | |
|---|---|---|---|---|---|---|---|---|
| 0000001660 | 05B2 | 1EFF | 001A | 00B8 | 5B01 | 06C3 | 2653 | 478B |
| 0000001700 | 3C0D | 7581 | EB24 | 900B | 017F | 01B8 | 01C9 | 01E5 |
| 0000001720 | 01FA | FC80 | 7200 | 8012 | 04FC | 0D77 | 00B0 | C486 |
| 0000001740 | F88B | FF03 | FF2E | 58A5 | B801 | 8103 | 9EE9 | B800 |
| 0000001760 | 1111 | 22BB | BF22 | FFFF | FFB9 | B6FF | B200 | FF04 |
| 0000002000 | 1A1E | A100 | 0066 | C00B | 0374 | 0EEB | C490 | 561E |
| 0000002020 | 2600 | 078B | 7025 | C100 | 04E8 | 075B | 5306 | C426 |
| 0000002040 | 135F | 8926 | EB07 | 9063 | C426 | 0F5F | 8B26 | C407 |
| 0000002060 | 561E | 2600 | 0789 | 52EB | 2690 | 5FC4 | 260F | 078B |
| 0000002100 | 8B26 | 0257 | 1EC4 | 005A | 8926 | C407 | 5E1E | 2600 |
| 0000002120 | 1789 | 36EB | C490 | 563E | 2600 | 058B | 075B | 5306 |
| 0000002140 | C426 | 135F | 8926 | EB07 | 9021 | 3EC4 | 005A | 8B26 |
| 0000002160 | C405 | 5E3E | 2600 | 158B | 075B | 5306 | C426 | 135F |
| 0000002200 | 8926 | 2607 | 5789 | EB02 | 9001 | 00R8 | 5B01 | C307 |
| 0000002220 | 8B26 | 0E47 | 4CA3 | 2600 | 478B | A310 | 004E | 8B26 |
| 0000002240 | 1247 | 50A3 | C300 | 016A | 681E | 0078 | 216A | 681E |
| 0000002260 | 001E | FF9A | 00FF | 0600 | 5253 | C426 | 125F | 8A26 |
| 0000002300 | 8017 | 00FA | 7F74 | FA80 | 7449 | 807D | 41FA | 0374 |
| 0000002320 | EB43 | 43EB | 8A26 | 8017 | 00FA | 6974 | FA80 | 753D |
| 0000002340 | 43EF | 8A26 | 8017 | 00FA | 5B74 | FA80 | 7545 | B81F |
| 0000002360 | 7000 | 62A3 | B800 | 000E | 64A3 | 6A00 | 1E01 | FF68 |
| 0000002400 | 6A00 | 1E14 | 1E68 | 9A00 | 0243 | 0000 | C2EB | FA80 |
| 0000002420 | 7543 | B81F | 7000 | 62A3 | B800 | 000C | 64A3 | 6A00 |
| 0000002440 | 1E01 | 1368 | 6A01 | 1E28 | 1E68 | 9A00 | 0298 | 0000 |
| 0000002460 | 9EEB | 016A | 681E | 00E0 | 1F6A | 681E | 001E | BC9A |
| 0000002500 | 0002 | EB00 | EB8B | 906A | 2643 | 178A | FA80 | 7400 |
| 0000002520 | 8060 | 3DFA | B675 | 2643 | 178A | FA80 | 7400 | 8052 |
| 0000002540 | 33FA | 1A75 | 06C7 | 0068 | 0003 | 016A | 681E | 00C4 |
| 0000002560 | 0E6A | 681E | 001E | CF9A | 0002 | E900 | FF52 | FA80 |
| 0000002600 | 7543 | C71A | 6806 | 0C00 | 6A00 | 1E01 | D268 | 6A00 |
| 0000002620 | 1E0E | 1E68 | 9A00 | 0307 | 0000 | 33E9 | 6AFF | 1E01 |
| 0000002640 | 9968 | 6A00 | 1E20 | 1E68 | 9A00 | 0326 | 0000 | 1FE9 |
| 0000002660 | 5AFF | 075B | 8B26 | 0E47 | 1AA3 | 2600 | 478B | A310 |
| 0000002700 | 001C | C726 | 0E47 | 0236 | C726 | 1047 | 0078 | 5306 |
| 0000002720 | 01B9 | 8C00 | 8ED8 | BFC0 | 0054 | 2DB2 | 1EFF | 001A |
| 0000002740 | 2A72 | 368B | 0054 | 3689 | 0058 | 3689 | 005C | 3689 |
| 0000002760 | 0060 | 1E8B | 0062 | 64A1 | B900 | 1000 | 01B6 | 2EB2 |
| 0000003000 | 1EFF | 001A | 0672 | 075B | 00B8 | C301 | 016A | 681E |
| 0000003020 | 0127 | 206A | 681E | 001E | 3A9A | 0003 | 5B00 | 2607 |
| 0000003040 | 47C7 | 000E | 2600 | 47C7 | 0010 | B800 | 810C | E8C3 |
| 0000003060 | 0012 | 075B | C726 | 0E47 | 0000 | C726 | 1047 | 0000 |
| 0000003100 | 0CB8 | C381 | D88B | 0CB1 | E8D3 | 3004 | 49A2 | 8B01 |
| 0000003120 | B1C3 | D304 | B1E0 | D30C | 04E8 | A230 | 014A | C38B |
| 0000003140 | 08B1 | E0D3 | 0CB1 | E8D3 | 3004 | 4BA2 | 8B01 | B1C3 |
| 0000003160 | D30C | B1E0 | D30C | 04E8 | A230 | 014C | 016A | 681E |
| 0000003200 | 0147 | 1D6A | 681E | 001E | A99A | 0003 | C300 | 0001 |
| 0000003220 | 0103 | 0419 | 0001 | 008A | 424E | 3230 | 0011 | 0000 |
| 0000003240 | 0700 | 736F | 2E32 | 696C | 0162 | 0600 | 0001 | 0800 |
| 0000003260 | 0000 | 0900 | 4E00 | 3042 | 2532 | 0000 | 1200 | |
| 0000003275 | | | | | | | | |

THU MAR 14 17:41:20 1991 LBIPMT.DLL PAGE 1, LINE 1

| | | | | | | | | |
|---|---|---|---|---|---|---|---|---|
| 0000000000 | 5A4D | 01D7 | 0084 | 0000 | 0004 | 0000 | FFFF | 0000 |
| 0000000020 | 00B6 | 0000 | 0000 | 0000 | 0040 | 0000 | 0000 | 0000 |
| 0000000040 | 0000 | 0000 | 0000 | 0000 | 0000 | 0000 | 0000 | 0000 |
| 0000000060 | 0000 | 0000 | 0000 | 0000 | 0000 | 0000 | 0080 | 0000 |
| 0000000100 | 1F0E | 0EBA | B400 | CD09 | B821 | 4C01 | 21CD | 6854 |
| 0000000120 | 7369 | 7020 | 6F72 | 7267 | 6D61 | 6320 | 6E61 | 6F6E |
| 0000000140 | 2074 | 7572 | 206E | 6E69 | 4420 | 534F | 6D20 | 646F |
| 0000000160 | 2E65 | 0D0D | 240A | 0000 | 0000 | 0000 | 0000 | 0000 |
| 0000000200 | 454E | 0A05 | 0235 | 006D | 03D6 | A062 | 8006 | 0006 |
| 0000000220 | 0000 | 0000 | 6FAA | 0001 | 0000 | 0000 | 0006 | 0002 |
| 0000000240 | 0018 | 0040 | 0070 | 0070 | 0221 | 0225 | 0322 | 0000 |
| 0000000260 | 0060 | 0004 | 0000 | 0001 | 0000 | 0000 | 0000 | 0000 |
| 0000000300 | 0034 | CA79 | 0D00 | CA7A | 0CF3 | 00C6 | 0C01 | 0100 |
| 0000000320 | 0000 | 0000 | 0C01 | 0850 | 0D00 | 022C | 0C01 | 023A |
| 0000000340 | 0000 | 0000 | 0C01 | 4AE2 | 0D23 | 358D | 0D01 | 9F60 |
| 0000000360 | 6C06 | 6962 | 6D70 | 0074 | 0D00 | 425F | 5F58 | 4544 |
| 0000000400 | 5542 | 5047 | 4952 | 0146 | 0F00 | 425F | 5F58 | 4544 |
| 0000000420 | 5542 | 5247 | 5445 | 5255 | 024E | 0800 | 425F | 5F58 |
| 0000000440 | 4E49 | 5449 | 0003 | 5F0D | 5842 | 495F | 444E | 5250 |
| 0000000460 | 4E49 | 4654 | 0004 | 5F0E | 5842 | 565F | 494F | 5244 |
| 0000000500 | 5445 | 5255 | 054E | 0900 | 425F | 5F58 | 5F42 | 4953 |
| 0000000520 | 0647 | 0B00 | 5842 | 455F | 4958 | 4654 | 4E55 | 0743 |
| 0000000540 | 0E00 | 425F | 5F58 | 4854 | 4552 | 4441 | 455F | 444E |
| 0000000560 | 0008 | 5F0D | 5842 | 545F | 4D49 | 5345 | 4F4D | 4544 |
| 0000000600 | 0009 | 5F11 | 5842 | 445F | 4245 | 4755 | 4156 | 4952 |
| 0000000620 | 4241 | 454C | 000A | 420E | 5F58 | 454D | 554E | 4C44 |
| 0000000640 | 5047 | 4F52 | 0B43 | 0700 | 425F | 5F58 | 4E49 | 0C44 |
| 0000000660 | 1000 | 425F | 5F58 | 4854 | 4552 | 4441 | 535F | 4154 |
| 0000000700 | 5452 | 000D | 5F0B | 5842 | 505F | 4F52 | 4543 | 5353 |
| 0000000720 | 000E | 5F0D | 5842 | 415F | 5353 | 4D55 | 4D45 | 4753 |
| 0000000740 | 000F | 5F0E | 5842 | 445F | 4245 | 4755 | 4E45 | 4554 |
| 0000000760 | 1052 | 0E00 | 425F | 5F58 | 4150 | 4B43 | 4946 | 544C |
| 0000001000 | 5245 | 0011 | 5F0D | 5842 | 455F | 5252 | 524F | 4F4D |
| 0000001020 | 4544 | 0012 | 5F0A | 5842 | 415F | 4554 | 4958 | 1354 |
| 0000001040 | 0A00 | 425F | 5F58 | 5250 | 4E49 | 4654 | 0014 | 5F0D |
| 0000001060 | 5842 | 445F | 4245 | 4755 | 4F43 | 4544 | 0015 | 5F0D |
| 0000001100 | 5842 | 415F | 5353 | 5245 | 4D54 | 4753 | 0016 | 5F0E |
| 0000001120 | 5842 | 445F | 4245 | 4755 | 5245 | 4F52 | 1752 | 0D00 |
| 0000001140 | 425F | 5F58 | 4544 | 5542 | 5447 | 4D49 | 1845 | 0D00 |
| 0000001160 | 425F | 5F58 | 4544 | 5542 | 4D47 | 444F | 1945 | 0D00 |
| 0000001200 | 425F | 5F58 | 5354 | 4154 | 5452 | 534D | 1A47 | 0E00 |
| 0000001220 | 425F | 5F58 | 4544 | 5542 | 5047 | 4952 | 544E | 001B |
| 0000001240 | 0100 | 0A00 | 0000 | 4408 | 534F | 4143 | 4C4C | 0553 |
| 0000001260 | 4D50 | 4957 | 054E | 0101 | 2BBE | 9A01 | 0126 | 3027 |
| 0000001300 | 2C01 | 0143 | 273A | 0601 | 0401 | 020B | 0101 | 5499 |
| 0000001320 | 5701 | 0157 | 0106 | 0184 | 0105 | 9001 | 0131 | 530F |
| 0000001340 | 8501 | 0141 | 56B7 | 5401 | 0130 | 0106 | 0B0E | 0102 |
| 0000001360 | CA01 | 0124 | 1023 | 0601 | 8601 | 0301 | 0101 | 3161 |
| 0000001400 | 7501 | 0140 | 2CB9 | 0601 | 0A01 | 020B | 0101 | 2A9A |
| 0000001420 | 3201 | 0228 | 0106 | 0182 | 1A01 | 010B | 0101 | 29A8 |
| 0000001440 | 0000 | 5C14 | 3174 | 3332 | 645C | 6C6C | 6C5C | 6962 |
| 0000001460 | 6D70 | 2E74 | 6C64 | 006C | 0000 | 0000 | 0000 | 0000 |
| 0000001500 | 581E | 4590 | 8B55 | 1EEC | D88E | EC81 | 0008 | 5657 |
| 0000001520 | FF9A | 00FF | 8E00 | 6C06 | 2633 | 3E83 | 211A | 7400 |
| 0000001540 | E903 | 000B | 06C7 | 0180 | 0001 | BD9A | 3201 | 9A00 |
| 0000001560 | 08BA | 0041 | 3E83 | 0188 | 75FF | E903 | 0005 | ED9A |
| 0000001600 | 4615 | 9A00 | 3A7C | 0053 | 681E | 0043 | 681E | 004A |
| 0000001620 | 719A | 6702 | 8300 | 08C4 | 003D | 7400 | E903 | 001D |
| 0000001640 | 681E | 004F | 099A | 7348 | 8300 | 04C4 | 681E | 0086 |

THU MAR 14 17:41:20 1991 LBIPMT.DLL PAGE 2, LINE 60

| | | | | | | | | |
|---|---|---|---|---|---|---|---|---|
| 0000001660 | 759A | 7B40 | 8300 | 04C4 | 6E9A | 8806 | 1E00 | B868 |
| 0000001700 | 1E00 | C068 | 9A00 | 0271 | 0090 | C483 | 9A08 | 0377 |
| 0000001720 | 0095 | 849A | A405 | 8300 | 923E | 0001 | 0374 | 21E9 |
| 0000001740 | 9A00 | 30AC | 00AB | 5052 | 4D9A | DB0A | 8300 | 04C4 |
| 0000001760 | 7440 | E903 | 000C | 00B8 | A300 | 0184 | 82A3 | E901 |
| 0000002000 | 000C | AAA1 | A302 | 0182 | A8A1 | A302 | 0184 | ACA1 |
| 0000002020 | A302 | 0186 | 681E | 00C7 | 4D9A | FF0A | 83FF | 04C4 |
| 0000002040 | 88A3 | 8301 | 883E | FF01 | 0374 | 59E9 | 1E00 | D068 |
| 0000002060 | 9A00 | 0AD8 | 0109 | C483 | 8904 | FC46 | 7540 | E903 |
| 0000002100 | 0019 | 681E | 00D9 | 769A | 2262 | 8301 | 04C4 | 4689 |
| 0000002120 | 89F8 | FA56 | D00B | 0374 | 15E9 | 1E00 | DB68 | 9A00 |
| 0000002140 | 4809 | 013E | C483 | C704 | 8206 | 0001 | E900 | 0016 |
| 0000002160 | 016A | 76FF | FFFA | F876 | 76FF | 9AFC | 0BD7 | 002D |
| 0000002200 | C483 | A308 | 0188 | 3E83 | 0182 | 7400 | E903 | 0014 |
| 0000002220 | 3E83 | 0184 | 7400 | E903 | 000A | 3E83 | 0186 | 7500 |
| 0000002240 | E903 | 0018 | 681E | 0103 | C29A | 773F | 8301 | 04C4 |
| 0000002260 | 681E | 0136 | C29A | 893F | 8301 | 04C4 | 3E83 | 02B8 |
| 0000002300 | 7500 | E903 | 0005 | 6E9A | 9C06 | 8301 | 843E | 0001 |
| 0000002320 | 0375 | 12E9 | 1E00 | 4968 | 9A01 | 3FC2 | 00F4 | C483 |
| 0000002340 | C704 | 8206 | 0001 | C700 | 8006 | 0001 | 9A00 | FFFF |
| 0000002360 | 0000 | 5F5E | ED83 | 8B02 | 1FE5 | 4D5D | 1ECB | 9058 |
| 0000002400 | 5545 | EC8B | 8E1E | 81D8 | 06EC | 5700 | 9A56 | 30AC |
| 0000002420 | 01DB | 4689 | 89FA | FC56 | 949A | E015 | 9A01 | 5642 |
| 0000002440 | 01E5 | 139A | EA3C | 9A01 | 2FDD | 01F3 | 681E | 02BE |
| 0000002460 | 759A | 0640 | 8302 | 04C4 | 468B | 0BFC | FA46 | 0374 |
| 0000002500 | 1CE9 | 9A00 | 1F7D | 020D | 5052 | 069A | 1730 | 5002 |
| 0000002520 | 681E | 02C0 | 759A | 2240 | 8302 | 0AC4 | 1FE9 | 9A00 |
| 0000002540 | 1F7D | 022F | 5052 | 76FF | FFFC | FA76 | 069A | 3930 |
| 0000002560 | 5002 | 681E | 02D5 | 759A | 5840 | 8302 | 0EC4 | 468B |
| 0000002600 | 0BFC | FA46 | 0374 | 06E9 | B800 | FFFF | 0EE9 | FF00 |
| 0000002620 | FC76 | 76FF | 9AFA | 0A4D | 016B | C483 | A304 | 018A |
| 0000002640 | 01B8 | E900 | 0000 | 5F5E | ED83 | 8B02 | 1FE5 | 4D5D |
| 0000002660 | 1ECB | 9058 | 5545 | EC8B | 8E1E | 81D8 | 0AEC | 5700 |
| 0000002700 | 8B56 | 0C46 | 460B | 750A | E903 | 001B | 76FF | FF0C |
| 0000002720 | 0A76 | D49A | C095 | 8302 | 04C4 | 4689 | 89FA | FC56 |
| 0000002740 | D00B | 0374 | 0CE9 | 8B00 | 0646 | 568B | 8908 | FA46 |
| 0000002760 | 5689 | 1EFC | EF68 | FF02 | FC76 | 76FF | 9AFA | 75F0 |
| 0000003000 | 02E7 | C483 | 8908 | F646 | 5689 | 0BF8 | 74D0 | E903 |
| 0000003020 | 0006 | 00B8 | E900 | 0053 | 76FF | FFFC | FA76 | FF68 |
| 0000003040 | 68FF | 0000 | 7A9A | D093 | 8301 | 08C4 | 068E | 336E |
| 0000003060 | C726 | 5406 | 0026 | 6800 | 02DF | 0068 | 1E00 | F168 |
| 0000003100 | 9A02 | 4075 | 0312 | C483 | FF08 | F876 | 76FF | 9AF6 |
| 0000003120 | 0336 | 0320 | C483 | FF04 | F876 | 76FF | 9AF6 | 749C |
| 0000003140 | 0295 | C483 | B804 | 0001 | 00E9 | 5E00 | 835F | 02ED |
| 0000003160 | E58B | 5D1F | CB4D | 581E | 4590 | 8B55 | 1EEC | D88E |
| 0000003200 | EC81 | 0000 | 5657 | 468B | 0B08 | 0646 | 0374 | 03E9 |
| 0000003220 | E900 | 0018 | 468B | 8B06 | 0856 | 068E | 3370 | A326 |
| 0000003240 | 2260 | 8926 | 6216 | 9A22 | 681D | 0304 | 5F5E | ED83 |
| 0000003260 | 8B02 | 1FE5 | 4D5D | 1ECB | 9058 | 5545 | EC8B | 8E1E |
| 0000003300 | 81D8 | FAEC | 5700 | A156 | 2CFD | 168B | 2CFF | 8689 |
| 0000003320 | FF7E | 5689 | A180 | 038C | 060B | 038A | 0375 | 10E9 |
| 0000003340 | FF00 | 8C36 | FF03 | 8A36 | 9A03 | 749C | 03BC | C483 |
| 0000003360 | 1E04 | FF68 | 1E02 | 0168 | 9A03 | 75F0 | 03DF | C483 |
| 0000003400 | A308 | 038A | 1689 | 038C | 8CA1 | 0B03 | 8A06 | 7403 |
| 0000003420 | E903 | 0013 | 681E | 0308 | 681E | 030F | 099A | F448 |
| 0000003440 | 8303 | 08C4 | 92E9 | 1E01 | 2F68 | 6803 | 04BC | 0068 |
| 0000003460 | 9A00 | 937A | 0442 | C483 | 8E08 | 6E06 | 2633 | 06C7 |
| 0000003500 | 2654 | 0000 | FDA1 | 8B2C | FF16 | 892C | 7E86 | 89FF |
| 0000003520 | 8056 | 05E9 | 8300 | 7E86 | 04FF | 9EC4 | FF7E | 8B26 |

THU MAR 14 17:41:20 1991 LBIPMT.DLL PAGE 3, LINE 119

| | | | | | | | | |
|---|---|---|---|---|---|---|---|---|
| 0000003540 | 0247 | 0B26 | 7507 | E903 | 00D9 | 06FF | 018C | 036A |
| 0000003560 | 681E | 0336 | 9EC4 | FF7E | FF26 | 0277 | FF26 | 9A37 |
| 0000003600 | 941C | 0463 | C483 | 3D0A | 0000 | 0375 | 24E9 | 6A00 |
| 0000003620 | 1E03 | 3A68 | C403 | 7E9E | 26FF | 77FF | 2602 | 37FF |
| 0000003640 | 1C9A | 8B94 | 8304 | 0AC4 | 003D | 7500 | E903 | 0003 |
| 0000003660 | A2E9 | C4FF | 7E9E | 26FF | 078B | 8B26 | 0257 | 0305 |
| 0000003700 | 5200 | 8D50 | 8246 | 5016 | 7A9A | 9A93 | 8304 | 08C4 |
| 0000003720 | 3D6A | 468D | 1682 | 9A50 | A214 | 04C4 | C483 | 8906 |
| 0000003740 | FA46 | 5689 | 0BFC | 74D0 | E903 | 0003 | 66E9 | C4FF |
| 0000003760 | FA5E | C626 | 0007 | 468D | 1682 | 6850 | 04E7 | EA68 |
| 0000004000 | 9A49 | 937A | 04DB | C483 | 8B08 | FA46 | 568B | 40FC |
| 0000004020 | 5052 | 868D | FF06 | 5016 | 7A9A | FB93 | 8304 | 08C4 |
| 0000004040 | 868D | FF06 | 5016 | F868 | 6802 | 49EA | 681E | 033E |
| 0000004060 | 36FF | 038C | 36FF | 038A | 089A | 0E76 | 8305 | 10C4 |
| 0000004100 | 12E9 | FFFF | 8C36 | FF03 | 8A36 | 9A03 | 749C | 051E |
| 0000004120 | C483 | 1E04 | 4768 | 1E03 | 4968 | 9A03 | 75F0 | 0541 |
| 0000004140 | C483 | A308 | 038A | 1689 | 038C | 8CA1 | 0803 | 8A06 |
| 0000004160 | 7403 | E903 | 0013 | 681E | 0350 | 681E | 0357 | 099A |
| 0000004200 | 5448 | 8305 | 08C4 | 30E9 | 1E00 | 7668 | 1E03 | 7D68 |
| 0000004220 | 9A03 | 4075 | 0564 | C483 | FF08 | 8C36 | FF03 | 8A36 |
| 0000004240 | 9A03 | 0336 | 0574 | C483 | FF04 | 8C36 | FF03 | 8A36 |
| 0000004260 | 9A03 | 749C | 036A | C483 | 5E04 | 835F | 02ED | E58B |
| 0000004300 | 5D1F | CB4D | 581E | 4590 | 8B55 | 1EEC | D88E | EC81 |
| 0000004320 | 006A | 5657 | 3E83 | 01AA | 7400 | E903 | 0003 | C2E9 |
| 0000004340 | 8300 | AC3E | 0001 | 0375 | 34E9 | C700 | FA46 | 038E |
| 0000004360 | 5E8C | 1EFC | 7668 | 1E02 | AE68 | 1E01 | 9068 | 8D03 |
| 0000004400 | 9646 | 5016 | CE9A | DA97 | 8305 | 10C4 | 76FF | FFFC |
| 0000004420 | FA76 | 468D | 1696 | 9A50 | 3C39 | 05E2 | C483 | 9A08 |
| 0000004440 | 30AC | 05FF | D00B | 0374 | 1CE9 | 1E00 | 7668 | 1E02 |
| 0000004460 | AE68 | 1E01 | 9868 | 8D03 | 9646 | 5016 | CE9A | 0E97 |
| 0000004500 | 8306 | 10C4 | 20E9 | 1E00 | 7668 | 9A02 | 30AC | 0622 |
| 0000004520 | 5052 | 681E | 01AE | 681E | 039E | 468D | 1696 | 9A50 |
| 0000004540 | 97CE | 065E | C483 | 8314 | AC3E | 0003 | 0375 | 06E9 |
| 0000004560 | B800 | 03A7 | 03E9 | B800 | 03A9 | 4689 | 8CFA | FC5E |
| 0000004600 | 3E83 | 03AC | 7500 | E903 | 0006 | 06C7 | 03AC | 0000 |
| 0000004620 | 76FF | FFFC | FA76 | 468D | 1696 | 9A50 | 3CB8 | 03AC |
| 0000004640 | C483 | 5E08 | 835F | 02ED | E58B | 5D1F | CB4D | 581E |
| 0000004660 | 4590 | 8B55 | 1EEC | D88E | EC81 | 0006 | 5657 | 46C7 |
| 0000004700 | 92FA | 8C01 | FC5E | 681E | 03AE | 759A | 9940 | 8306 |
| 0000004720 | 04C4 | 681E | 03D8 | 759A | AD40 | 8306 | 04C4 | 5EC4 |
| 0000004740 | 26FA | B7FF | 0118 | 681E | 03FA | 759A | C140 | 8306 |
| 0000004760 | 06C4 | 5EC4 | 26FA | B7FF | 0116 | 681E | 041B | 759A |
| 0000005000 | D540 | 8306 | 06C4 | 5EC4 | 26FA | B7FF | 011A | 681E |
| 0000005020 | 043E | 759A | E940 | 8306 | 06C4 | 5EC4 | 26FA | B7FF |
| 0000005040 | 0124 | 681E | 0461 | 759A | F540 | 8306 | 06C4 | 681E |
| 0000005060 | 0498 | 759A | 0740 | 8307 | 04C4 | 5EC4 | 26FA | 37FF |
| 0000005100 | 681E | 04BC | 759A | 1B40 | 8307 | 06C4 | 5EC4 | 26FA |
| 0000005120 | B7FF | 0120 | 681E | 04E1 | 759A | 2E40 | 8307 | 06C4 |
| 0000005140 | 5EC4 | 26FA | 77FF | 1E02 | 0768 | 9A05 | 4075 | 0741 |
| 0000005160 | C483 | C406 | FA5E | FF26 | 0477 | 681E | 052C | 759A |
| 0000005200 | 5440 | 8307 | 06C4 | 5EC4 | 26FA | 77FF | 1E06 | 4E68 |
| 0000005220 | 9A05 | 4075 | 0760 | C483 | 1E06 | 7068 | 9A05 | 4075 |
| 0000005240 | 0773 | C483 | C404 | FA5E | FF26 | 0A77 | 681E | 0596 |
| 0000005260 | 759A | 8740 | 8307 | 06C4 | 5EC4 | 26FA | B7FF | 011E |
| 0000005300 | 681E | 05B5 | 759A | 9B40 | 8307 | 06C4 | 5EC4 | 26FA |
| 0000005320 | B7FF | 0122 | 681E | 05DC | 759A | AE40 | 8307 | 06C4 |
| 0000005340 | 5EC4 | 26FA | 77FF | 1E0E | 0468 | 9A06 | 4075 | 07C1 |
| 0000005360 | C483 | C406 | FA5E | FF26 | 1077 | 681E | 062B | 759A |
| 0000005400 | D440 | 8307 | 06C4 | 5EC4 | 26FA | 77FF | 1E12 | 4F68 |

THU MAR 14 17:41:20 1991 LBIPMT.DLL PAGE 4, LINE 178

| | | | | | | | | |
|---|---|---|---|---|---|---|---|---|
| 0000005420 | 9A06 | 4075 | 07E7 | C483 | C406 | FA5E | FF26 | 1677 |
| 0000005440 | 681E | 0673 | 759A | FB40 | 8307 | 06C4 | 5EC4 | 26FA |
| 0000005460 | B7FF | 0128 | 681E | 069A | 759A | 0740 | 8308 | 06C4 |
| 0000005500 | 681E | 06CF | 759A | 1A40 | 8308 | 04C4 | 5EC4 | 26FA |
| 0000005520 | 77FF | 1E18 | F768 | 9A06 | 4075 | 0831 | C483 | 8B06 |
| 0000005540 | FA46 | 568B | 05FC | 001C | 5052 | 681E | 0717 | 759A |
| 0000005560 | 4440 | 8308 | 08C4 | 5EC4 | 26FA | 77FF | 1E1A | 4068 |
| 0000005600 | 9A07 | 4075 | 0858 | C483 | C406 | FA5E | FF26 | 1CB7 |
| 0000005620 | 1E01 | 6D68 | 9A07 | 4075 | 0864 | C483 | 1E06 | 9068 |
| 0000005640 | 9A07 | 4075 | 0877 | C483 | C404 | FA5E | FF26 | 0877 |
| 0000005660 | 681E | 07B6 | 759A | 8A40 | 8308 | 06C4 | 5EC4 | 26FA |
| 0000005700 | 77FF | 1E0C | E568 | 9A07 | 4075 | 089E | C483 | C406 |
| 0000005720 | FA5E | FF26 | 26B7 | 1E01 | 1068 | 9A08 | 4075 | 08AA |
| 0000005740 | C483 | 1E06 | 4568 | 9A08 | 4075 | 05C7 | C483 | 5E04 |
| 0000005760 | 835F | 02ED | E58B | 5D1F | CB4D | 581E | 4590 | 8B55 |
| 0000006000 | 1EEC | D88E | EC81 | 0004 | 5657 | 06C7 | 089E | 0000 |
| 0000006020 | 46C7 | 00FC | E900 | 0003 | 46FF | 83FC | FC7E | 7C1A |
| 0000006040 | E903 | 0013 | 068E | 3372 | 5E8B | D1FC | 26E3 | 87C7 |
| 0000006060 | 069E | 0000 | E1E9 | C7FF | FC46 | 0000 | 03E9 | FF00 |
| 0000006100 | FC46 | 7E81 | E5FC | 7C03 | E903 | 0136 | 068E | 3374 |
| 0000006120 | 5E8B | 8BFC | D1C3 | 03E3 | D1D8 | 03E3 | D1D8 | 26E3 |
| 0000006140 | 878B | 1278 | 0B26 | 7687 | 7512 | E903 | 0111 | 5E8B |
| 0000006160 | 8BFC | D1C3 | 03E3 | D1D8 | 03E3 | D1D8 | 26E3 | B7FF |
| 0000006200 | 1278 | FF26 | 76B7 | 9A12 | 9080 | 09AD | C483 | 8E04 |
| 0000006220 | 7406 | 8B33 | FC5E | C38B | E3D1 | D803 | E3D1 | D803 |
| 0000006240 | E3D1 | C02B | 8926 | 7887 | 2612 | 8789 | 1276 | 5E8B |
| 0000006260 | 8BFC | D1C3 | 03E3 | D1D8 | 03E3 | D1D8 | 26E3 | BF83 |
| 0000006300 | 127E | 7401 | E903 | 0071 | 5E8B | 8BFC | D1C3 | 03E3 |
| 0000006320 | D1D8 | 03E3 | D1D8 | 26E3 | 878B | 127C | 0B26 | 7A87 |
| 0000006340 | 7412 | E903 | 000F | 681E | 086E | 099A | D548 | 8309 |
| 0000006360 | 04C4 | 25E9 | 8E00 | 7406 | 8B33 | FC5E | C38B | E3D1 |
| 0000006400 | D803 | E3D1 | D803 | E3D1 | FF26 | 7CB7 | 2612 | B7FF |
| 0000006420 | 127A | A49A | 8D4B | 8306 | 04C4 | 068E | 3374 | 5E8B |
| 0000006440 | 8BFC | D1C3 | 03E3 | D1D8 | 03E3 | D1D8 | 2BE3 | 26C0 |
| 0000006460 | 8789 | 127C | 8926 | 7A87 | 8E12 | 7406 | 8B33 | FC5E |
| 0000006500 | C38B | E3D1 | D803 | E3D1 | D803 | E3D1 | C726 | 7E87 |
| 0000006520 | 0012 | 8B00 | FC5E | C38B | E3D1 | D803 | E3D1 | D803 |
| 0000006540 | E3D1 | C726 | 8287 | 0012 | 8B00 | FC5E | C38B | E3D1 |
| 0000006560 | D803 | E3D1 | D803 | E3D1 | C726 | 8087 | 0012 | E900 |
| 0000006600 | FEBD | 5F5E | ED83 | 8B02 | 1FE5 | 4D5D | 1ECB | 9058 |
| 0000006620 | 5545 | EC8B | 8E1E | 81D8 | 04EC | 5700 | 8B56 | 0846 |
| 0000006640 | 460B | 7406 | E903 | 0006 | FFB8 | E9FF | 005F | 5EC4 |
| 0000006660 | 2606 | 078A | 8B98 | D1D8 | 8EE3 | 7206 | 2633 | BF83 |
| 0000006700 | 069E | 7400 | E903 | 0006 | FFB8 | E9FF | 003F | 76FF |
| 0000006720 | FF08 | 0676 | FC9A | 4A14 | 8309 | 04C4 | 4689 | 8EFC |
| 0000006740 | 7406 | 8B33 | FC5E | C38B | E3D1 | D803 | E3D1 | D803 |
| 0000006760 | E3D1 | 8B26 | 7887 | 2612 | 870B | 1276 | 0374 | 06E9 |
| 0000007000 | 8600 | FFFF | 06E9 | 8B00 | FC46 | 00E9 | 5E00 | 835F |
| 0000007020 | 02ED | E58B | 5D1F | CB4D | 581E | 4590 | 8B55 | 1EEC |
| 0000007040 | D88E | EC81 | 0004 | 5657 | 76FF | FFD8 | 0676 | FC9A |
| 0000007060 | 3B14 | 830B | 04C4 | 4689 | 8EFC | 7406 | 8B33 | FC5E |
| 0000007100 | C38B | E3D1 | D803 | E3D1 | D803 | E3D1 | 8B26 | 7887 |
| 0000007120 | 2612 | 870B | 1276 | 0375 | 06E9 | 8B00 | FC46 | ABE9 |
| 0000007140 | 8100 | 9E3E | D608 | 7D03 | E903 | 0006 | FFB8 | E9FF |
| 0000007160 | 009A | 76FF | FF08 | 0676 | 429A | 82A2 | 830B | 04C4 |
| 0000007200 | 068E | 3374 | 5E8B | 8BFC | D1CB | 03E3 | D1D9 | 03E3 |
| 0000007220 | D1D9 | 26E3 | 8789 | 1276 | 8926 | 7897 | 8B12 | FC5E |
| 0000007240 | C38B | E3D1 | D803 | E3D1 | D803 | E3D1 | 8B26 | 7887 |
| 0000007260 | 2612 | 870B | 1276 | 0374 | 12E9 | 1E00 | A068 | 9A08 |

THU MAR 14 17:41:20 1991 LBIPMT.DLL PAGE 5, LINE 237

| | | | | | | | | |
|---|---|---|---|---|---|---|---|---|
| 0000007300 | 4809 | 0A97 | C483 | B804 | FFFF | 3FE9 | 8E00 | 7406 |
| 0000007320 | 8B33 | FC5E | C38B | E3D1 | D803 | E3D1 | D803 | E3D1 |
| 0000007340 | C726 | 7E87 | 0212 | 8B00 | FC5E | C38B | E3D1 | D803 |
| 0000007360 | E3D1 | D803 | E3D1 | C02B | 8926 | 7C87 | 2612 | 8789 |
| 0000007400 | 127A | 06FF | 089E | 468B | E9FC | 0000 | 5F5E | ED83 |
| 0000007420 | 8B02 | 1FE5 | 4D5D | 1ECB | 9058 | 5545 | EC8B | 8E1E |
| 0000007440 | 81D8 | 06EC | 5700 | 8E56 | 7406 | 8B33 | 065E | C38B |
| 0000007460 | E3D1 | D803 | E3D1 | D803 | E3D1 | C726 | 7E87 | 0112 |
| 0000007500 | 8B00 | 0C46 | 5E8B | 8B06 | D1CB | 03E3 | D1D9 | 03E3 |
| 0000007520 | D1D9 | 26E3 | 8789 | 1280 | 5E8B | 8B06 | D1C3 | 03E3 |
| 0000007540 | D1D8 | 03E3 | D1D8 | 26E3 | 878B | 127C | 0B26 | 7A87 |
| 0000007560 | 7512 | E903 | 0021 | 5E8B | 8B06 | D1C3 | 03E3 | D1D8 |
| 0000007600 | 03E3 | D1D8 | 26E3 | B7FF | 127C | FF26 | 7AB7 | 9A12 |
| 0000007620 | 4BA4 | 0C87 | C483 | 8B04 | 0846 | 568B | 8E0A | 7406 |
| 0000007640 | 8B33 | 065E | CB8B | E3D1 | D903 | E3D1 | D903 | E3D1 |
| 0000007660 | 8926 | 7A87 | 2612 | 9789 | 127C | 681E | 08BB | 76FF |
| 0000007700 | FF0A | 0876 | AB9A | E24F | 830C | 08C4 | 5E8B | 8B06 |
| 0000007720 | D1CB | 03E3 | D1D9 | 03E3 | D1D9 | 8EE3 | 7406 | 2633 |
| 0000007740 | 8789 | 1282 | 5E8B | 8B06 | D1C3 | 03E3 | D1D8 | 03E3 |
| 0000007760 | D1D8 | 26E3 | 878B | 1276 | 8B26 | 7897 | 8912 | FA46 |
| 0000010000 | 5689 | C4FC | FA5E | 8A26 | 9807 | D88B | E3D1 | 068E |
| 0000010020 | 3372 | C726 | 9E87 | 0106 | FF00 | FC76 | 76FF | 9AFA |
| 0000010040 | 39FE | 0CF8 | C483 | 3D04 | 0000 | 0375 | 24E9 | FF00 |
| 0000010060 | FC76 | 76FF | 9AFA | 3B59 | 0AF1 | C483 | 3D04 | 0000 |
| 0000010100 | 0374 | 0EE9 | FF00 | FC76 | 76FF | 9AFA | 3AED | 0C52 |
| 0000010120 | C483 | B804 | 0001 | 00E9 | 5E00 | 835F | 02ED | E58B |
| 0000010140 | 5D1F | CB4D | 581E | 4590 | 8B55 | 1EEC | D88E | EC81 |
| 0000010160 | 0004 | 5657 | 46C7 | 00FC | E900 | 0003 | 46FF | 81FC |
| 0000010200 | FC7E | 03E5 | 037C | BBE9 | 8E00 | 7406 | 8B33 | FC5E |
| 0000010220 | C38B | E3D1 | D803 | E3D1 | D803 | E3D1 | 8B26 | 7887 |
| 0000010240 | 2612 | 870B | 1276 | 0375 | 96E9 | 8B00 | FC5E | C38B |
| 0000010260 | E3D1 | D803 | E3D1 | D803 | E3D1 | 8326 | 7EBF | 0112 |
| 0000010300 | 0374 | 7CE9 | 8E00 | 7406 | 8B33 | FC5E | C38B | E3D1 |
| 0000010320 | D803 | E3D1 | D803 | E3D1 | 8326 | 80BF | 0112 | 0374 |
| 0000010340 | 06E9 | B800 | 0021 | 03E9 | B800 | 0020 | 8B5D | FC5E |
| 0000010360 | C38B | E3D1 | D803 | E3D1 | D803 | E3D1 | 068E | 3374 |
| 0000010400 | FF26 | 78B7 | 2612 | B7FF | 1276 | 681E | 08C1 | C29A |
| 0000010420 | D73F | 830D | 0AC4 | FC68 | 680D | FFFF | 068E | 3374 |
| 0000010440 | 5E8B | 8BFC | D1C3 | 03E3 | D1D8 | 03E3 | D1D8 | 26E3 |
| 0000010460 | B7FF | 127C | FF26 | 7AB7 | 9A12 | 4CC8 | 0D0E | C483 |
| 0000010500 | E908 | FF38 | 5F5E | ED83 | 8B02 | 1FE5 | 4D5D | 1ECB |
| 0000010520 | 9058 | 5545 | EC8B | 8E1E | 81D8 | 08EC | 5700 | B856 |
| 0000010540 | 0000 | 4689 | 89FA | F846 | 4689 | 8EFC | 7606 | 2633 |
| 0000010560 | 3E83 | 0188 | 74FF | E903 | 0005 | 009A | D100 | 8EDD |
| 0000010600 | 7806 | 2633 | 3E83 | 0194 | 7400 | E903 | 0060 | 5EC4 |
| 0000010620 | 260A | 078A | 8B98 | D1D8 | 8EE3 | 7206 | 2633 | BF83 |
| 0000010640 | 069E | 7400 | E903 | 000F | 5EC4 | 2606 | 47C7 | FE04 |
| 0000010660 | B8FF | 0000 | A1E9 | FF01 | 0C76 | 76FF | 9A0A | 0A4D |
| 0000010700 | 0EEF | C483 | C404 | 065E | 8926 | C407 | 065E | 8326 |
| 0000010720 | FF3F | 0374 | 12E9 | C400 | 065E | C726 | 0447 | FFFE |
| 0000010740 | 00B8 | E900 | 0172 | 05E9 | C700 | FA46 | 0001 | 068E |
| 0000010760 | 3378 | 8326 | [illegible]33E | 0001 | 0374 | 62E9 | C400 | 0E5E |
| 0000011000 | 8A26 | 9807 | D88B | E3D1 | 068E | 3372 | 8326 | 9EBF |
| 0000011020 | 0006 | 0374 | 0FE9 | C400 | 065E | C726 | 0447 | FFFE |
| 0000011040 | 00B8 | E900 | 0132 | 76FF | FF10 | 0E76 | 4D9A | 600A |
| 0000011060 | 830F | 04C4 | 5EC4 | 2606 | 4789 | C402 | 065E | 8326 |
| 0000011100 | 027F | 74FF | E903 | 0012 | 5EC4 | 2606 | 47C7 | FE04 |
| 0000011120 | B8FF | 0000 | 01E9 | E901 | 0005 | 46C7 | 01F8 | 8E00 |
| 0000011140 | 7806 | 2633 | 3E83 | 0198 | 7400 | E903 | 0062 | 5EC4 |

THU MAR 14 17:41:20 1991 LBIPMT.DLL PAGE 6, LINE 296

| | | | | | | | | |
|---|---|---|---|---|---|---|---|---|
| 0000011160 | 2612 | 078A | 8B98 | D1D8 | 8EE3 | 7206 | 2633 | BF83 |
| 0000011200 | 069E | 7400 | E903 | 000F | 5EC4 | 2606 | 47C7 | FE04 |
| 0000011220 | B8FF | 0000 | C1E9 | FF00 | 1476 | 76FF | 9A12 | 0A4D |
| 0000011240 | 0FA2 | C483 | C404 | 065E | 8926 | 0447 | 5EC4 | 2606 |
| 0000011260 | 7F83 | FF04 | 0374 | 12E9 | C400 | 065E | C726 | 0447 |
| 0000011300 | FFFE | 00B8 | E900 | 0090 | 05E9 | C700 | FC46 | 0001 |
| 0000011320 | 068E | 3378 | 8326 | B23E | 0002 | 0374 | 1AE9 | 9A00 |
| 0000011340 | 1362 | 0FCB | 7440 | E903 | 000F | 5EC4 | 2606 | 47C7 |
| 0000011360 | FE04 | B8FF | 0000 | 5FE9 | 8300 | FA7E | 7400 | E903 |
| 0000011400 | 0014 | 76FF | FF0C | 0A76 | 4D9A | E80A | 830F | 04C4 |
| 0000011420 | 5EC4 | 2606 | 0789 | 7E83 | 00F8 | 0374 | 15E9 | FF00 |
| 0000011440 | 1076 | 76FF | 9A0E | 0A4D | 1006 | C483 | C404 | 065E |
| 0000011460 | 8926 | 0247 | 7E83 | 00FC | 0374 | 15E9 | FFD0 | 1476 |
| 0000011500 | 76FF | 9A12 | 0A4D | 0E3D | C483 | C404 | 065E | 8926 |
| 0000011520 | 0447 | 01B8 | E900 | 0000 | 5F5E | ED83 | 8B02 | 1FE5 |
| 0000011540 | 4D5D | 1ECB | 9058 | 5545 | EC8B | 8E1E | 81D8 | 00EC |
| 0000011560 | 5700 | 1E56 | FFB8 | 8EFF | 83D8 | 0A7E | 7401 | E903 |
| 0000011600 | 000F | 7E83 | 000C | 0374 | 06E9 | B800 | 0001 | 72E9 |
| 0000011620 | 8E00 | 7606 | 2633 | 3E83 | 0188 | 74FF | E903 | 0005 |
| 0000011640 | 009A | 9700 | 8E10 | 7806 | 2633 | 3E83 | 0194 | 7400 |
| 0000011660 | E903 | 0049 | 5EC4 | 260A | 078A | 8B98 | D1D8 | 8EE3 |
| 0000011700 | 7206 | 2633 | BF83 | 069E | 7500 | E903 | 002F | 76FF |
| 0000011720 | FF0C | 0A76 | 4D9A | 800A | 830E | 04C4 | 5EC4 | 2606 |
| 0000011740 | 0789 | 5EC4 | 2606 | 3F83 | 74FF | E903 | 000F | 5EC4 |
| 0000011760 | 2606 | 47C7 | FE04 | B8FF | 0000 | 06E9 | B800 | 0001 |
| 0000012000 | 00E9 | 1F00 | 5F5E | ED83 | 8B02 | 1FE5 | 4D5D | 1ECB |
| 0000012020 | 9058 | 5545 | EC8B | 8E1E | 81D8 | 00EC | 5700 | 8356 |
| 0000012040 | 067E | 7C00 | E903 | 0006 | 00B8 | E900 | 00AB | 068E |
| 0000012060 | 3374 | 5E8B | 8B06 | D1C3 | 03E3 | D1D8 | 03E3 | D1D8 |
| 0000012100 | 26E3 | BF83 | 1282 | 7500 | E903 | 004E | 681E | 08C9 |
| 0000012120 | 76FF | FF0A | 0876 | B09A | 3393 | 8311 | 08C4 | 003D |
| 0000012140 | 7500 | E903 | 0034 | 681E | 08D1 | 76FF | FF0A | 0876 |
| 0000012160 | B09A | 4D93 | 8311 | 08C4 | 003D | 7500 | E903 | 001A |
| 0000012200 | 681E | 08D9 | 76FF | FF0A | 0876 | B09A | 8093 | 8311 |
| 0000012220 | 08C4 | 003D | 7400 | E903 | 0033 | 76FF | FF0A | 0876 |
| 0000012240 | 068E | 3374 | 5E8B | 8B06 | D1C3 | 03E3 | D1D8 | 03E3 |
| 0000012260 | D1D8 | 26E3 | B7FF | 127C | FF26 | 7AB7 | 9A12 | 4FAB |
| 0000012300 | 1063 | C483 | 3D08 | 0000 | 0375 | 06E9 | B800 | 0001 |
| 0000012320 | 03E9 | B800 | 0000 | 00E9 | 5E00 | 835F | 02ED | E58B |
| 0000012340 | 5D1F | CB4D | 581E | 4590 | 8B55 | 1EEC | D88E | EC81 |
| 0000012360 | 0000 | 5657 | 7E83 | FF06 | 0374 | 06E9 | B800 | 0000 |
| 0000012400 | 3EE9 | FF00 | 0A76 | 76FF | FF08 | 0676 | CF9A | 1910 |
| 0000012420 | 8311 | 06C4 | 003D | 7500 | E903 | 0006 | 01B8 | E900 |
| 0000012440 | 001F | 068E | 3374 | 5E8B | 8B06 | D1C3 | 03E3 | D1D8 |
| 0000012460 | 03E3 | D1D8 | 26E3 | BF83 | 1280 | F501 | C01B | 00E9 |
| 0000012500 | 5E00 | 835F | 02ED | E58B | 5D1F | CB4D | 581E | 4590 |
| 0000012520 | 8B55 | 1EEC | D88E | EC81 | 0004 | 5657 | 5EC4 | 2606 |
| 0000012540 | 7F83 | FE04 | 0374 | 06E9 | B800 | 0000 | 28E9 | FF01 |
| 0000012560 | 0C76 | 76FF | C40A | 065E | FF26 | 0477 | A49A | 7511 |
| 0000012600 | 8312 | 06C4 | 4689 | 48FC | 0374 | 09E9 | B800 | 0001 |
| 0000012620 | 04E9 | E901 | 000F | 7E83 | FFFC | 0374 | 06E9 | B800 |
| 0000012640 | 0000 | F2E9 | FF00 | 0C76 | 76FF | C40A | 065E | FF26 |
| 0000012660 | 0277 | A49A | AA11 | 8312 | 06C4 | 4689 | 48FC | 0374 |
| 0000012700 | 09E9 | B800 | 0001 | CEE9 | E900 | 000F | 7E83 | FFFC |
| 0000012720 | 0374 | 06E9 | B800 | 0000 | BCE9 | FF00 | 0C76 | 76FF |
| 0000012740 | C40A | 065E | FF26 | 9A37 | 11A4 | 12D9 | C483 | 8906 |
| 0000012760 | FC46 | 7448 | E903 | 0009 | 01B8 | E900 | 0099 | 0FE9 |
| 0000013000 | 8300 | FC7E | 74FF | E903 | 0006 | 00B8 | E900 | 0087 |
| 0000013020 | 76FF | FF0C | 0A76 | 629A | DF13 | 5012 | A49A | CF11 |

THU MAR 14 17:41:20 1991 LBIPMT.DLL PAGE 7, LINE 355

| | | | | | | | | |
|---|---|---|---|---|---|---|---|---|
| 0000013040 | 8311 | 06C4 | 4689 | 48FC | 0374 | 09E9 | B800 | 0001 |
| 0000013060 | 64E9 | E900 | 000F | 7E83 | FFFC | 0374 | 06E9 | B800 |
| 0000013100 | 0000 | 52E9 | FF00 | 0C76 | 76FF | 8E0A | 7A06 | 2633 |
| 0000013120 | 36FF | 018A | A49A | 4F11 | 8313 | 06C4 | 4689 | 48FC |
| 0000013140 | 0374 | 09E9 | B800 | 0001 | 2CE9 | E900 | 000F | 7E83 |
| 0000013160 | FFFC | 0374 | 06E9 | B800 | 0000 | 1AE9 | FF00 | 0C76 |
| 0000013200 | 76FF | 8E0A | 7606 | 2633 | 36FF | 0168 | CF9A | 3F10 |
| 0000013220 | 8312 | 06C4 | 00E9 | 5E00 | 835F | 02ED | E58B | 5D1F |
| 0000013240 | CB4D | 581E | 4590 | 8B55 | 1EEC | D88E | EC81 | 003C |
| 0000013260 | 5657 | 599A | 8058 | 8913 | F846 | 76FF | 9AF8 | 5896 |
| 0000013300 | 13C6 | C483 | 8902 | FA46 | 5689 | C4FC | FA5E | 8A26 |
| 0000013320 | 9807 | D88B | E3D1 | 068E | 3372 | 8326 | 9EBF | 0006 |
| 0000013340 | 0375 | 0DE9 | C400 | FA5E | 8026 | 017F | 743F | E903 |
| 0000013360 | 0006 | FFB8 | E9FF | 0046 | 76FF | FFFC | FA76 | 468D |
| 0000013400 | 16C4 | 9A50 | 937A | 13D7 | C483 | 1E08 | E068 | 8D08 |
| 0000013420 | C446 | 5016 | 349A | E493 | 8313 | 08C4 | 468D | 16C4 |
| 0000013440 | 9A50 | 0A4D | 1317 | C483 | 8904 | F646 | 7540 | E903 |
| 0000013460 | 0006 | 468B | E9F6 | 0006 | FFB8 | E9FF | 0000 | 5F5E |
| 0000013500 | ED83 | 8B02 | 1FE5 | 4D5D | 1ECB | 9058 | 5545 | EC8B |
| 0000013520 | 8E1E | 81D8 | 38EC | 5700 | C456 | 085E | 8A26 | 9807 |
| 0000013540 | D88B | E3D1 | 068E | 3372 | 8326 | 9EBF | 0006 | 0374 |
| 0000013560 | 06E9 | 8B00 | 0646 | 71E9 | FF00 | 0C76 | 76FF | FF0A |
| 0000013600 | 0876 | 681E | 08E3 | 468D | 16CA | 9A50 | 97CE | 145B |
| 0000013620 | C483 | 8D0E | CA46 | 5016 | 4D9A | 7B0A | 8314 | 04C4 |
| 0000013640 | 4689 | 40C8 | 0374 | 06E9 | 8B00 | 0646 | 3BE9 | FF00 |
| 0000013660 | 1076 | 76FF | FF0E | C876 | A49A | 7511 | 8313 | 06C4 |
| 0000013700 | 4689 | 40FC | 0374 | 09E9 | B800 | 0000 | 1BE9 | E900 |
| 0000013720 | 0018 | 7E83 | 01FC | 0374 | 09E9 | B800 | 0001 | 09E9 |
| 0000013740 | E900 | 0006 | 468B | E906 | 0000 | 5F5E | ED83 | 8B02 |
| 0000013760 | 1FE5 | 4D5D | 1ECB | 9058 | 5545 | EC8B | 8E1E | 81D8 |
| 0000014000 | 00EC | 5700 | BE56 | 0000 | 5EC4 | 2606 | 3F80 | 7500 |
| 0000014020 | E903 | 000F | 5EC4 | 2606 | 078A | 0398 | FFF0 | 0646 |
| 0000014040 | E5E9 | 8BFF | B9C6 | 03E5 | D22B | F1F7 | C28B | 00E9 |
| 0000014060 | 5E00 | 835F | 02ED | E58B | 5D1F | CB4D | 581E | 4590 |
| 0000014100 | 8B55 | 1EEC | D88E | EC81 | 0004 | 5657 | 76FF | FF08 |
| 0000014120 | 0676 | B59A | 6114 | 8315 | 04C4 | 4689 | 8EFC | 7406 |
| 0000014140 | 8B33 | FC5E | C38B | E3D1 | D803 | E3D1 | D803 | E3D1 |
| 0000014160 | 8B26 | 7887 | 2612 | 870B | 1276 | 0375 | 44E9 | FF00 |
| 0000014200 | 0876 | 76FF | 8B06 | FC5E | C38B | E3D1 | D803 | E3D1 |
| 0000014220 | D803 | E3D1 | FF26 | 78B7 | 2612 | B7FF | 1276 | B09A |
| 0000014240 | 4E93 | 8314 | 08C4 | 003D | 7500 | E903 | 0015 | 46FF |
| 0000014260 | 81FC | FC7E | 03E5 | 0374 | 05E9 | C700 | FC46 | 0000 |
| 0000014300 | 9AE9 | 8BFF | FC46 | 00E9 | 5E00 | 835F | 02ED | E58B |
| 0000014320 | 5D1F | CB4D | 581E | 4590 | 8B55 | 1EEC | D88E | EC81 |
| 0000014340 | 0004 | 5657 | 46C7 | 00FC | E900 | 0003 | 46FF | 83FC |
| 0000014360 | FC7E | 7C0A | E903 | 0024 | 4669 | 28FC | 050A | 35B0 |
| 0000014400 | 5E8B | C1FC | 02E3 | 8789 | 35A2 | 9F8C | 35A4 | 5E8B |
| 0000014420 | D1FC | C7E3 | 8E87 | 0035 | E900 | FFD0 | 01B8 | E900 |
| 0000014440 | 0000 | 5F5E | ED83 | 8B02 | 1FE5 | 4D5D | 1ECB | 9058 |
| 0000014460 | 5545 | EC8B | 8E1E | 81D8 | 0AEC | 5700 | C756 | FC46 |
| 0000014500 | 0000 | 03E9 | FF00 | FC46 | 7E83 | 0AFC | 037C | 69E9 |
| 0000014520 | C700 | F646 | 0000 | 03E9 | FF00 | F646 | 5E8B | D1FC |
| 0000014540 | 8BE3 | F646 | 8739 | 358E | 037F | 4AE9 | 6B00 | FC46 |
| 0000014560 | 0364 | F646 | C06B | 051A | 35CA | 4689 | 8CF8 | FA5E |
| 0000014600 | 5EC4 | 26F8 | 77FF | 260E | 77FF | C40C | F85E | FF26 |
| 0000014620 | 0A77 | FF26 | 0877 | 5EC4 | 26F8 | 77FF | 2606 | 77FF |
| 0000014640 | 8B04 | F846 | 568B | 05FA | 0010 | 5052 | 0F9A | 150E |
| 0000014660 | 8315 | 10C4 | A2E9 | E9FF | FF8B | 5F5E | ED83 | 8B02 |
| 0000014700 | 1FE5 | 4D5D | 1ECB | 9058 | 5545 | EC8B | 8E1E | 81D8 |

THU MAR 14 17:41:20 1991 LBIPMT.DLL PAGE 8, LINE 414

| | | | | | | | | |
|---|---|---|---|---|---|---|---|---|
| 0000014720 | 06EC | 5700 | 9A56 | 5859 | 16DD | 4689 | C7FC | FA46 |
| 0000014740 | 0000 | 5E8B | D1FC | 83E3 | 8EBF | 6435 | 037D | 12F9 |
| 0000014760 | 8B00 | FC5E | E3D1 | 87FF | 358E | 00B8 | BA0D | 0000 |
| 0000015000 | 31E9 | C401 | 185E | 8326 | 047F | 75FE | E903 | 0062 |
| 0000015020 | 681E | 08F2 | 76FF | FF1A | 1876 | 0C9A | 0612 | 8317 |
| 0000015040 | 08C4 | 003D | 7500 | E903 | 0048 | 681E | 08FA | 76FF |
| 0000015060 | FF14 | 1276 | 76FF | FF16 | 1076 | 76FF | FF0E | 0C76 |
| 0000015100 | 76FF | 9A0A | 47B5 | 1712 | C483 | 1E12 | 0068 | 9A09 |
| 0000015120 | 4075 | 166F | C483 | 8E04 | 7C06 | 2633 | 9CA1 | 8E01 |
| 0000015140 | 7E06 | 8B33 | FC5E | E3D1 | 0126 | C887 | C749 | FA46 |
| 0000015160 | 0001 | 5E8B | D1FC | FFE3 | 8E87 | 8B35 | FC5E | E3C1 |
| 0000015200 | 8362 | A287 | 1A35 | 468B | 8B06 | 0856 | 5E8B | C1FC |
| 0000015220 | 02E3 | 9FC4 | 35A2 | 8926 | 2607 | 5789 | 8B02 | 1246 |
| 0000015240 | 568B | 8B14 | FC5E | E3C1 | C402 | A29F | 2635 | 4789 |
| 0000015260 | 260C | 5789 | 8B0E | 0E46 | 568B | 8B10 | FC5E | E3C1 |
| 0000015300 | C402 | A29F | 2635 | 4789 | 2608 | 5789 | 8B0A | 0A46 |
| 0000015320 | 568B | 8B0C | FC5E | E3C1 | C402 | A29F | 2635 | 4789 |
| 0000015340 | 2604 | 5789 | 8B06 | 1646 | 5E8B | C1FC | 02E3 | 9FC4 |
| 0000015360 | 35A2 | 8926 | 1647 | 5E8B | C1FC | 02E3 | 9FC4 | 35A2 |
| 0000015400 | 468B | 8B18 | 1A56 | 8D1E | 107F | F08B | DA8E | A5A5 |
| 0000015420 | 1FA5 | 468B | 8BFA | FC5E | E3C1 | C402 | A29F | 2635 |
| 0000015440 | 4789 | 8B18 | FC5E | E3C1 | 8B02 | A287 | 8B35 | A497 |
| 0000015460 | E935 | 0000 | 5F5E | ED83 | 8B02 | 1FE5 | 4D5D | 1ECB |
| 0000015500 | 9058 | 5545 | EC8B | 8E1E | 81D8 | 14EC | 5700 | 9A56 |
| 0000015520 | 5859 | 181E | 4689 | 1EFC | 0268 | 9A09 | 3FC2 | 182A |
| 0000015540 | C483 | 1E04 | 3168 | 9A09 | 3FC2 | 1836 | C483 | 1E04 |
| 0000015560 | 6168 | 9A09 | 3FC2 | 1842 | C483 | 1E04 | 9168 | 9A09 |
| 0000015600 | 3FC2 | 184E | C483 | 1E04 | BB68 | 9A09 | 3FC2 | 1894 |
| 0000015620 | C483 | C704 | F646 | 0000 | 03E9 | FF00 | F646 | 5E8B |
| 0000015640 | D1FC | 8BE3 | F646 | 8739 | 358E | 037F | 97E9 | 6B00 |
| 0000015660 | FC46 | 0364 | F646 | C06B | 051A | 35CA | 4689 | 8CF8 |
| 0000015700 | FA5E | 681E | 09EB | 468B | 8BF8 | FA56 | 1005 | 5200 |
| 0000015720 | 9A50 | 120C | 18B4 | C483 | 3D08 | 0000 | 0375 | 06E9 |
| 0000015740 | B800 | 09F3 | 03E9 | B800 | 09F5 | 501E | 468D | 16EC |
| 0000015760 | 9A50 | 937A | 18C5 | C483 | 1E08 | F768 | 8D09 | EC46 |
| 0000016000 | 5016 | 349A | FE93 | 8318 | 08C4 | 5EC4 | 26F8 | 77FF |
| 0000016020 | 260E | 77FF | C40C | F85E | FF26 | 1677 | 5EC4 | 26F8 |
| 0000016040 | 77FF | 260A | 77FF | C408 | F85E | FF26 | 0677 | FF26 |
| 0000016060 | 0477 | 468D | 16EC | 1E50 | FA68 | 9A09 | 3FC2 | 1698 |
| 0000016100 | C483 | E916 | FF55 | 5F5E | ED83 | 8B02 | 1FE5 | 4D5D |
| 0000016120 | 1ECB | 9058 | 5545 | EC8B | 8E1E | 81D8 | 04EC | 5700 |
| 0000016140 | 9A56 | 5859 | 1A14 | 4689 | 8BFC | FC5E | E3D1 | BF83 |
| 0000016160 | 358E | 7F64 | E903 | 000F | 5E8B | D1FC | FFE3 | 8E8F |
| 0000016200 | B835 | 0000 | 83E9 | 8B01 | FC5E | E3D1 | BF83 | 358E |
| 0000016220 | 7F00 | E903 | 0154 | 5E8B | C1FC | 02E3 | 9FC4 | 35A2 |
| 0000016240 | 468B | 2606 | 0739 | 0377 | 2CE9 | 8B00 | FC5E | E3C1 |
| 0000016260 | 8B02 | A287 | 8B35 | A497 | 8B35 | FC5E | E3C1 | C402 |
| 0000016300 | A29F | 2635 | 1FC4 | 3926 | 7407 | E903 | 0009 | 3926 |
| 0000016320 | 0257 | 0375 | 13E9 | 8301 | 0E7E | 7400 | E903 | 0046 |
| 0000016340 | 468B | 8B06 | 0856 | 5E8B | C1FC | 02E3 | 9FC4 | 35A2 |
| 0000016360 | 3926 | 7407 | E903 | 002E | 3926 | 0257 | 0374 | 25E9 |
| 0000016400 | 8B00 | 0A46 | 568B | 8B0C | FC5E | E3C1 | C402 | A29F |
| 0000016420 | 2635 | 4739 | 740C | E903 | 000C | 3926 | 0E57 | 0374 |
| 0000016440 | 03E9 | E900 | 00C4 | 5E8B | C1FC | 02E3 | 9FC4 | 35A2 |
| 0000016460 | 8326 | 147F | 75FE | E903 | 0099 | 681E | 0A0A | 5E8B |
| 0000016500 | C1FC | 02E3 | 878B | 35A2 | 978B | 35A4 | 1005 | 5200 |
| 0000016520 | 9A50 | 120C | 1A82 | C483 | 3D08 | 0000 | 0375 | 72E9 |
| 0000016540 | 8E00 | 7C06 | 2633 | 9CA1 | 8E01 | 7E06 | 8B33 | FC5E |
| 0000016560 | E3D1 | 2926 | C887 | 1E49 | 1268 | 8B0A | FC5E | E3C1 |

THU MAR 14 17:41:20 1991 LBIPMT.DLL PAGE 9, LINE 473

| | | | | | | | | |
|---|---|---|---|---|---|---|---|---|
| 0000016600 | C402 | A29F | 2635 | 77FF | 260E | 77FF | 8B0C | FC5E |
| 0000016620 | E3C1 | C402 | A29F | 2635 | 77FF | 8B16 | FC5E | E3C1 |
| 0000016640 | C402 | A29F | 2635 | 77FF | 260A | 77FF | 8B08 | FC5E |
| 0000016660 | E3C1 | C402 | A29F | 2635 | 77FF | 2606 | 77FF | 9A04 |
| 0000016700 | 47B5 | 1A8E | C483 | 1E12 | 1868 | 9A0A | 4075 | 1812 |
| 0000016720 | C483 | 8B04 | FC5E | E3C1 | 8302 | A2AF | 1A35 | 5E8B |
| 0000016740 | D1FC | FFE3 | 8E8F | E935 | FE9D | 468B | 8B0A | 0C56 |
| 0000016760 | 068E | 3380 | 5E8B | C1FC | 02E3 | 8926 | 7287 | 2606 |
| 0000017000 | 9789 | 0674 | 00B8 | E900 | 0000 | 5F5E | ED83 | 8B02 |
| 0000017020 | 1FE5 | 4D5D | 1ECB | 9058 | 5545 | EC8B | 8E1E | 81D8 |
| 0000017040 | 0CEC | 5700 | C756 | F446 | 0000 | 599A | 8C58 | 891B |
| 0000017060 | FC46 | 5E8B | D1FC | 83E3 | 8EBF | 6435 | 037F | 06E9 |
| 0000017100 | B800 | 0000 | 6CE9 | 8B02 | FC5E | E3D1 | 878B | 358E |
| 0000017120 | 8948 | F646 | 03E9 | FF00 | F64E | 7E83 | 00F6 | 037D |
| 0000017140 | 41E9 | 6B02 | FC46 | 0364 | F646 | C06B | 051A | 35CA |
| 0000017160 | 4689 | 8CF8 | FA5E | 468B | 8B08 | 0A56 | 5EC4 | 26F8 |
| 0000017200 | 0739 | 0374 | 26E9 | 2600 | 5739 | 7402 | E903 | 001D |
| 0000017220 | 468B | 8BF8 | FA56 | 5EC4 | 26F8 | 1FC4 | 3926 | 7407 |
| 0000017240 | E903 | 0009 | 3926 | 0257 | 0375 | B5E9 | C400 | F85E |
| 0000017260 | 8326 | 147F | 75FE | E903 | 0091 | 681E | 0A2C | 468B |
| 0000017300 | 8BF8 | FA56 | 1005 | 5200 | 9A50 | 120C | 1BFA | C483 |
| 0000017320 | 3D08 | 0000 | 0375 | 72E9 | 8E00 | 7C06 | 2633 | 9CA1 |
| 0000017340 | 8E01 | 7E06 | 8B33 | FC5E | E3D1 | 2926 | C887 | 1E49 |
| 0000017360 | 3468 | 8B0A | FC5E | E3C1 | C402 | A29F | 2635 | 77FF |
| 0000017400 | 260E | 77FF | 8B0C | FC5E | E3C1 | C402 | A29F | 2635 |
| 0000017420 | 77FF | 8B16 | FC5E | E3C1 | C402 | A29F | 2635 | 77FF |
| 0000017440 | 260A | 77FF | 8B08 | FC5E | E3C1 | C402 | A29F | 2635 |
| 0000017460 | 77FF | 2606 | 77FF | 9A04 | 47B5 | 1C06 | C483 | 1E12 |
| 0000017500 | 3A68 | 9A0A | 4075 | 1C69 | C483 | 8B04 | FC5E | E3D1 |
| 0000017520 | 8FFF | 358E | 5E8B | C1FC | 02E3 | AF83 | 35A2 | E91A |
| 0000017540 | 013F | 46C7 | 01F4 | C400 | F85E | 8326 | 187F | 7500 |
| 0000017560 | E903 | 0016 | 068E | 337C | A126 | 019C | 068E | 337E |
| 0000017600 | 5E8B | D1FC | 26E3 | 8729 | 49C8 | 5EC4 | 26F8 | 7F83 |
| 0000017620 | FE14 | 0375 | F3E9 | 1E00 | 4F68 | 8B0A | F846 | 568B |
| 0000017640 | 05FA | 0010 | 5052 | 0C9A | B612 | 831C | 08C4 | 003D |
| 0000017660 | 7500 | E903 | 00D4 | 681E | 0A58 | 5E8B | C1FC | 02E3 |
| 0000017700 | 9FC4 | 35A2 | FF26 | 0E77 | FF26 | 0C77 | 76FF | 8B06 |
| 0000017720 | FC5E | E3C1 | C402 | A29F | 2635 | 77FF | 260A | 77FF |
| 0000017740 | 8B08 | FC5E | E3C1 | C402 | A29F | 2635 | 77FF | 2606 |
| 0000017760 | 77FF | 9A04 | 47B5 | 1CD2 | C483 | 8B12 | 1246 | 460B |
| 0000020000 | 7510 | E903 | 0048 | 76FF | FF18 | 1676 | 76FF | 9A14 |
| 0000020020 | 1D7E | 1D09 | C483 | 8B06 | 1C46 | 460B | 751A | E903 |
| 0000020040 | 002C | 76FF | FF18 | 1676 | 76FF | FF12 | 1076 | 5EFF |
| 0000020060 | 831A | 08C4 | 003D | 7500 | E903 | 0012 | 76FF | FF12 |
| 0000020100 | 1076 | 681E | 0A5E | 759A | 2040 | 831D | 08C4 | 681E |
| 0000020120 | 0A63 | 468B | 8BF8 | FA56 | 1005 | 5200 | 9A50 | 120C |
| 0000020140 | 1D36 | C483 | 3D08 | 0000 | 0375 | 11E9 | FF00 | 2076 |
| 0000020160 | 76FF | 9A1E | 2F8A | 1D45 | C483 | E904 | 000C | 681E |
| 0000020200 | 0A6A | 759A | 2440 | 8319 | 04C4 | 5E8B | D1FC | FFE3 |
| 0000020220 | 8E8F | 8B35 | FC5E | E3C1 | 8302 | A2AF | 1A35 | 03E9 |
| 0000020240 | E900 | FDB3 | 7E83 | 00F4 | 0374 | 00E9 | B800 | 0001 |
| 0000020260 | 00E9 | 5E00 | 835F | 02ED | E58B | 5D1F | CB4D | 581E |
| 0000020300 | 4590 | 8B55 | 1EEC | D88E | EC81 | 0000 | 5657 | 7E83 |
| 0000020320 | 0006 | 0374 | 06E9 | B800 | 0000 | 80E9 | 8B01 | 0646 |
| 0000020340 | 47E9 | C401 | 085E | FF26 | 1E37 | 6C68 | 9A0A | 352F |
| 0000020360 | 1DC6 | C483 | E906 | 015F | 5EC4 | 2608 | 078A | 1E50 |
| 0000020400 | 6D68 | 9A0A | 34CC | 1DDF | C483 | E906 | 0149 | 5EC4 |
| 0000020420 | 2608 | 77FF | 2602 | 37FF | 681E | 0A6E | 9D9A | 0036 |
| 0000020440 | 831E | 08C4 | 30E9 | C401 | 085E | FF26 | 0677 | FF26 |

THU MAR 14 17:41:20 1991 LBIPMT.DLL PAGE 10, LINE 532

| | | | | | | | | |
|---|---|---|---|---|---|---|---|---|
| 0000020460 | 0477 | FF26 | 0277 | FF26 | 1E37 | 6F68 | 9A0A | 37F0 |
| 0000020500 | 1E21 | C483 | E90C | 010F | 5EC4 | 2608 | 77FF | 2606 |
| 0000020520 | 77FF | 2604 | 77FF | 2602 | 37FF | 681E | 0A70 | E09A |
| 0000020540 | 3A38 | 831E | 0CC4 | EEE9 | C400 | 085E | FF26 | 0277 |
| 0000020560 | FF26 | 1E37 | 7168 | 9A0A | 395A | 1E53 | C483 | E908 |
| 0000020600 | 00D5 | 5EC4 | 2608 | 77FF | 2602 | 37FF | 681E | 0A72 |
| 0000020620 | 889A | 6837 | 831E | 08C4 | BCE9 | C400 | 085E | FF26 |
| 0000020640 | 1E37 | 7368 | 9A0A | 35CD | 1E7D | C483 | E906 | 00A7 |
| 0000020660 | 5EC4 | 2608 | 37FF | 681E | 0A74 | 359A | 9636 | 831E |
| 0000020700 | 06C4 | 92E9 | C400 | 085E | FF26 | 0277 | FF26 | 1E37 |
| 0000020720 | 7568 | 9A0A | 3720 | 1EAC | C483 | E908 | 0079 | 5EC4 |
| 0000020740 | 2608 | 078A | 1E50 | 7668 | 9A0A | 34CC | 1EC1 | C483 |
| 0000020760 | E906 | 0063 | 5EC4 | 2608 | 37FF | 681E | 0A77 | 6A9A |
| 0000021000 | D038 | 831E | 06C4 | 4EE9 | 1E00 | 7868 | 9A0A | 4075 |
| 0000021020 | 1EDF | C483 | FF04 | 0676 | 681E | 0A7A | 099A | ED48 |
| 0000021040 | 831A | 06C4 | 30E9 | E900 | 002D | 012D | 3D01 | 000C |
| 0000021060 | 0376 | D4E9 | D1FF | 93E0 | FF2E | FDA7 | A31E | B81D |
| 0000021100 | CE1D | E71L | 081D | 291E | 421E | 5B1E | 701E | 851E |
| 0000021120 | 9E1E | 9E1E | B41E | B81E | 0001 | 00E9 | 5E00 | 835F |
| 0000021140 | 02ED | E58B | 5D1F | CB4D | 581E | 4590 | 8B55 | 1EEC |
| 0000021160 | D88E | EC81 | 0006 | 5657 | 006A | 006A | B09A | 529E |
| 0000021200 | 831F | 04C4 | 4689 | 89FA | FC56 | 468D | 16FA | 9A50 |
| 0000021220 | 9ADA | 1F60 | C483 | 5204 | 1E50 | 5A68 | 9A9B | 937A |
| 0000021240 | 1DB0 | C483 | C608 | 6D06 | 009B | 65B8 | 8C9B | E9DA |
| 0000021260 | 0000 | 5F5E | ED83 | 8B02 | 1FE5 | 4D5D | 1ECB | 9058 |
| 0000021300 | 5545 | EC8B | 8E1E | 81D8 | 06EC | 5700 | 6A56 | 6A00 |
| 0000021320 | 9A00 | 9EB0 | 1FA7 | C483 | 8904 | FA46 | 5689 | 8DFC |
| 0000021340 | FA46 | 5016 | DA9A | B59A | 831F | 04C4 | 5052 | 681E |
| 0000021360 | 9B74 | 7A9A | 3F93 | 831F | 08C4 | 74B8 | 8C9B | E9DA |
| 0000021400 | 0000 | 5F5E | ED83 | 8B02 | 1FE5 | 4D5D | 1ECB | 9058 |
| 0000021420 | 5545 | EC8B | 8E1E | 81D8 | 06EC | 5700 | 8B56 | 0646 |
| 0000021440 | 568B | 8908 | FA46 | 5689 | C4FC | FA5E | 8026 | 003F |
| 0000021460 | 0375 | 45E9 | C400 | FA5E | 8A26 | 9807 | 803D | 7200 |
| 0000021500 | E903 | 0030 | 5EC4 | 26FA | 078A | 8B98 | F6D8 | 8187 |
| 0000021520 | 0131 | 0375 | 1DE9 | C400 | FA5E | 8A26 | 9807 | D88B |
| 0000021540 | 87F6 | 3181 | 7501 | E903 | 000A | 5EC4 | 26FA | 0780 |
| 0000021560 | E920 | 0000 | 46FF | E9FA | FFAF | 468B | 8B06 | 0856 |
| 0000021600 | 00E9 | 5E00 | 835F | 02ED | E58B | 5D1F | CB4D | 581E |
| 0000021620 | 4590 | 8B55 | 1EEC | D88E | EC81 | 0006 | 5657 | 468B |
| 0000021640 | 8B06 | 0856 | 4689 | 89FA | FC56 | 5EC4 | 26FA | 3F80 |
| 0000021660 | 7500 | E903 | 0045 | 5EC4 | 26FA | 078A | 3D98 | 0080 |
| 0000021700 | 0372 | 30E9 | C400 | FA5E | 8A26 | 9807 | D88B | 87F6 |
| 0000021720 | 3181 | 7502 | E903 | 001D | 5EC4 | 26FA | 078A | 8B98 |
| 0000021740 | F6D8 | 8187 | 0231 | 0375 | 0AE9 | C400 | FA5E | 8026 |
| 0000021760 | 202F | 00E9 | FF00 | FA46 | AFE9 | 8BFF | 0646 | 568B |
| 0000022000 | E908 | 0000 | 5F5E | ED83 | 8B02 | 1FE5 | 4D5D | 1ECB |
| 0000022020 | 9058 | 5545 | EC8B | 8E1E | 81D8 | 00EC | 5700 | C456 |
| 0000022040 | 065E | 8026 | 003F | 0375 | 24E9 | C400 | 065E | 8026 |
| 0000022060 | 203F | 0375 | 12E9 | C400 | 065E | 8026 | 093F | 0375 |
| 0000022100 | 06E9 | B800 | 0000 | 0CE9 | FF00 | 0646 | D0E9 | B8FF |
| 0000022120 | 0001 | 00E9 | 5E00 | 835F | 02ED | E58B | 5D1F | CB4D |
| 0000022140 | 581E | 4590 | 8B55 | 1EEC | D88E | EC81 | 0006 | 5657 |
| 0000022160 | 5EC4 | 260A | 3F80 | 7520 | E903 | 000C | 5EC4 | 260A |
| 0000022200 | 3F80 | 7409 | E903 | 0006 | 46FF | E90A | FFE2 | 468B |
| 0000022220 | 8B0A | 0C56 | 4689 | 89FA | FC56 | 5EC4 | 26FA | 3F80 |
| 0000022240 | 7500 | E903 | 001E | 5EC4 | 26FA | 3F80 | 7520 | E903 |
| 0000022260 | 0012 | 5EC4 | 26FA | 3F80 | 7509 | E903 | 0006 | 46FF |
| 0000022300 | E9FA | FFD6 | 5EC4 | 26FA | 3F80 | 7500 | E903 | 001D |
| 0000022320 | 76FF | FFFC | FA76 | CF9A | BC20 | 8321 | 04C4 | 003D |

THU MAR 14 17:41:20 1991 LBIPMT.DLL PAGE 11, LINE 591

| | | | | | | | | |
|---|---|---|---|---|---|---|---|---|
| 0000022340 | 7500 | E903 | 0007 | 5EC4 | 26FA | 07C6 | FF00 | 0C76 |
| 0000022360 | 76FF | FF0A | 0876 | 76FF | 9A06 | 937A | 1F94 | C483 |
| 0000022400 | E908 | 0000 | 5F5E | ED83 | 8B02 | 1FE5 | 4D5D | 1ECB |
| 0000022420 | 9058 | 5545 | EC8B | 8E1E | 81D8 | 06EC | 5700 | FF56 |
| 0000022440 | 0C76 | 76FF | FF0A | 0876 | 76FF | 9A06 | 75F0 | 221C |
| 0000022460 | C483 | 8908 | FA46 | 5689 | 0BFC | 7500 | E903 | 0009 |
| 0000022500 | 468B | 8BFA | FC56 | 21E9 | FF00 | 0C76 | 76FF | FF0A |
| 0000022520 | 0876 | 76FF | 1E06 | 9A68 | 9A0A | 4809 | 2199 | C483 |
| 0000022540 | B80C | 0000 | 00BA | E900 | 0000 | 5F5E | ED83 | 8B02 |
| 0000022560 | 1FE5 | 4D5D | 1ECB | 9058 | 5545 | EC8B | 8E1E | 81D8 |
| 0000022600 | 68EC | 5700 | 8D56 | 9A46 | 5016 | 681E | 0AB5 | B09A |
| 0000022620 | EE76 | 8321 | 08C4 | 468A | 889A | 9846 | 468A | E998 |
| 0000022640 | 0000 | 5F5E | ED83 | 8B02 | 1FE5 | 4D5D | 1ECB | 9058 |
| 0000022660 | 5545 | EC8B | 8E1E | 81D8 | 00EC | 5700 | 9A56 | 2235 |
| 0000022700 | 2251 | 00E9 | 5E00 | 835F | 02ED | E58B | 5D1F | CB4D |
| 0000022720 | 581E | 4590 | 8B55 | 1EEC | D88E | EC81 | 0000 | 5657 |
| 0000022740 | 379A | AA3D | 6A22 | 9A01 | 712E | 2280 | C483 | 5E02 |
| 0000022760 | 835F | 02ED | E58B | 5D1F | CB4D | 581E | 4590 | 8B55 |
| 0000023000 | 1EEC | D88E | EC81 | 0006 | 5657 | 46C7 | 26FA | 8C0B |
| 0000023020 | FC5E | 76FF | FFFC | FA76 | 76FF | FF08 | 0676 | 681E |
| 0000023040 | 0B44 | C29A | ED3F | 8322 | 0CC4 | EB9A | A351 | 5E22 |
| 0000023060 | 835F | 02ED | E58B | 5D1F | CB4D | 581E | 4590 | 8B55 |
| 0000023100 | 1EEC | D88E | EC81 | 000C | 5657 | 46C7 | 56F4 | 8C0B |
| 0000023120 | F65E | 739A | 4D3E | FF23 | FA06 | 830B | FA3E | 030B |
| 0000023140 | 037F | 06E9 | B800 | 0B83 | 03E9 | B800 | 0B74 | 4689 |
| 0000023160 | 8CF8 | FA5E | 76FF | FFFA | F876 | 76FF | FFF6 | F476 |
| 0000023200 | 76FF | FF08 | 0676 | 681E | 0B85 | C29A | 553F | 8323 |
| 0000023220 | 10C4 | 6D9A | 5E22 | 9823 | 73E9 | 9A00 | 2449 | 236A |
| 0000023240 | D1E9 | 1EFF | 9968 | 9A0B | 3FC2 | 2375 | C483 | E904 |
| 0000023260 | 00CC | 009A | 7D00 | E923 | FFBA | FF9A | 8917 | E923 |
| 0000023300 | FFB2 | 681E | C39B | C29A | 983F | 8323 | 04C4 | A3E9 |
| 0000023320 | 1EFF | CE68 | 9A0B | 3FC2 | 23A0 | C483 | 9A04 | 226D |
| 0000023340 | 23BC | 4688 | 3CFC | 7579 | E903 | 0009 | 7E80 | 59FC |
| 0000023360 | 0374 | 10E9 | 1E00 | E668 | 9A0B | 3FC2 | 22E5 | C483 |
| 0000023400 | FF04 | 221E | E90B | FF6C | 69E9 | E9FF | 006D | 583D |
| 0000023420 | 7500 | E903 | FFBB | 037E | 28E9 | 2D00 | 0041 | 0375 |
| 0000023440 | 9FE9 | 48FF | 7548 | E903 | FF79 | 052D | 7500 | E903 |
| 0000023460 | FF69 | 7548 | E903 | FF7A | 0E2D | 7500 | E903 | FF7A |
| 0000023500 | C5E9 | 3DFF | 0068 | 0375 | 50E9 | 7EFF | E903 | 0012 |
| 0000023520 | 612D | 7500 | E903 | FF6A | 4848 | 0375 | 44E9 | E9FF |
| 0000023540 | FFA6 | 692D | 7500 | E903 | FF48 | 0E2D | 7500 | E903 |
| 0000023560 | FF48 | 7548 | E903 | FF59 | 8DE9 | E9FF | FEF6 | 5F5E |
| 0000023600 | ED83 | 8B02 | 1FE5 | 4D5D | 1ECB | 9058 | 5545 | EC8B |
| 0000023620 | 8E1E | 81D8 | 00EC | 5700 | 1E56 | FC68 | 9A0B | 3FC2 |
| 0000023640 | 246C | C483 | 1E04 | 1568 | 9A0C | 3FC2 | 2478 | C483 |
| 0000023660 | 1E04 | 3168 | 9A0C | 3FC2 | 2484 | C483 | 1E04 | 6168 |
| 0000023700 | 9A0C | 3FC2 | 2490 | C483 | 1E04 | 8F68 | 9A0C | 3FC2 |
| 0000023720 | 249C | C483 | 1E04 | BB68 | 9A0C | 3FC2 | 24A8 | C483 |
| 0000023740 | 1E04 | DC68 | 9A0C | 3FC2 | 24B4 | C483 | 1E04 | ED68 |
| 0000023760 | 9A0C | 3FC2 | 2315 | C483 | B804 | 0001 | 00E9 | 5E00 |
| 0000024000 | 835F | 02ED | E58B | 5D1F | CB4D | 581E | 4590 | 8B55 |
| 0000024020 | 1EEC | D88E | EC81 | 0008 | 5657 | B81E | 1035 | D88E |
| 0000024040 | 068E | 3382 | 8326 | 843E | 0001 | 0375 | 27E9 | FF00 |
| 0000024060 | 1076 | 76FF | FF0E | 0C76 | 76FF | FF0A | 0876 | 76FF |
| 0000024100 | 1E06 | EF68 | 9A0C | 30D1 | 2460 | C483 | B810 | 0000 |
| 0000024120 | 00BA | E900 | 0178 | 068E | 3384 | 8326 | 823E | 0001 |
| 0000024140 | 0374 | 09E9 | B800 | 0000 | 00BA | E900 | 0160 | 7E83 |
| 0000024160 | 0106 | 0374 | 43E9 | 8300 | 087E | 7400 | E903 | 003A |
| 0000024200 | 06FF | 0DAE | 46C7 | F106 | 8C0C | 085E | 3E83 | 0DAE |

THU MAR 14 17:41:20 1991 LBIPMT.DLL PAGE 12, LINE 650

| | | | | | | | | |
|---|---|---|---|---|---|---|---|---|
| 0000024220 | 7C04 | E903 | 0024 | 681E | 0CFB | 099A | 6948 | 8325 |
| 0000024240 | 04C4 | 681E | 0D2C | 099A | 7548 | 8325 | 04C4 | 681E |
| 0000024260 | 0D5D | 099A | 9548 | 8325 | 04C4 | 76FF | FF10 | 0E76 |
| 0000024300 | 76FF | FF0C | 0A76 | 76FF | FF08 | 0676 | 76FF | FF1A |
| 0000024320 | 1876 | 0F9A | AE0E | 8325 | 10C4 | 003D | 7400 | E903 |
| 0000024340 | 0009 | 00B8 | BA00 | 0000 | E3E9 | 9A00 | 5859 | 2508 |
| 0000024360 | D88B | E3C1 | 8E02 | 8606 | 8B33 | 0E46 | 568B | 2610 |
| 0000024400 | 8789 | 0672 | 8926 | 7497 | 6A06 | FF01 | 1076 | 76FF |
| 0000024420 | FF0E | 1676 | 76FF | 9A14 | 1911 | 2603 | C483 | FF0A |
| 0000024440 | 1A76 | 76FF | FF18 | 1276 | 76FF | FF10 | 0E76 | 76FF |
| 0000024460 | FF0C | 0A76 | 76FF | FF08 | 0676 | 76FF | FF16 | 1476 |
| 0000024500 | 859A | 1B16 | 8326 | 16C4 | 4689 | 89FA | FC56 | 681E |
| 0000024520 | 0D86 | 76FF | FF1A | 1876 | 0C9A | 3112 | 8326 | 08C4 |
| 0000024540 | 003D | 7500 | E903 | 000E | 76FF | FF1E | 1C76 | 689A |
| 0000024560 | 4348 | 8326 | 04C4 | 681E | 0D8D | 76FF | FF1A | 1876 |
| 0000024600 | 0C9A | 5712 | 8326 | 08C4 | 003D | 7500 | E903 | 000F |
| 0000024620 | 681E | 0D95 | 249A | 6C2E | 8326 | D4C4 | 26E9 | 1E00 |
| 0000024640 | 9D68 | FF0D | 1A76 | 76FF | 9A18 | 120C | 2680 | C483 |
| 0000024660 | 3D08 | 0000 | 0375 | 0CE9 | 1E00 | A568 | 9A0D | 2E24 |
| 0000024700 | 255D | C483 | 8B04 | FA46 | 568B | E9FC | 0000 | 5E1F |
| 0000024720 | 835F | 02ED | E58B | 5D1F | CB4D | 581E | 4590 | 8B55 |
| 0000024740 | 1EEC | D88E | EC81 | 0000 | 5657 | B81E | 24DC | D88E |
| 0000024760 | 068E | 3382 | 8326 | 843E | 0001 | 0375 | 24E9 | FF00 |
| 0000025000 | 1276 | 76FF | FF10 | 0C76 | 76FF | FF0A | 0876 | 76FF |
| 0000025020 | 1E06 | B268 | 9A0D | 30D1 | 2723 | C483 | B810 | 0000 |
| 0000025040 | 4BE9 | C400 | 145E | 8326 | 047F | 74FE | E903 | 0006 |
| 0000025060 | 00B8 | E900 | 0038 | 76FF | FF1E | 1C76 | 76FF | FF2C |
| 0000025100 | 2A76 | 76FF | FF28 | 2676 | 76FF | FF24 | 2276 | 76FF |
| 0000025120 | FF20 | 1276 | 76FF | FF10 | 1A76 | 76FF | FF18 | 0E76 |
| 0000025140 | D59A | DA1A | 8325 | 1CC4 | 01B8 | E900 | 0000 | 5E1F |
| 0000025160 | 835F | 02ED | E58B | 5D1F | CB4D | 581E | 4590 | 8B55 |
| 0000025200 | 1EEC | D88E | EC81 | 0000 | 5657 | B81E | 26AC | D88E |
| 0000025220 | 068E | 3382 | 8326 | 843E | 0001 | 0375 | 24E9 | FF00 |
| 0000025240 | 1276 | 76FF | FF10 | 0C76 | 76FF | FF0A | 0876 | 76FF |
| 0000025260 | 1E06 | B468 | 9A0D | 30D1 | 27BC | C483 | B810 | 0000 |
| 0000025300 | 44E9 | C400 | 145E | 8326 | 047F | 74FE | E903 | 0006 |
| 0000025320 | 00B8 | E900 | 0031 | 76FF | FF1E | 1C76 | 006A | 006A |
| 0000025340 | 006A | 006A | 006A | 006A | 006A | 76FF | FF12 | 1076 |
| 0000025360 | 76FF | FF1A | 1876 | 76FF | 9A0E | 1AD5 | 26D8 | C483 |
| 0000025400 | B81C | 0001 | 00E9 | 1F00 | 5F5E | ED83 | 8B02 | 1FE5 |
| 0000025420 | 4D5D | 1ECB | 9058 | 5545 | EC8B | 8E1E | 81D8 | 00EC |
| 0000025440 | 5700 | 9A56 | 5859 | 281C | D88B | E3C1 | 8E02 | 8606 |
| 0000025460 | 8B33 | 1046 | 568B | 2612 | 8739 | 0672 | 0374 | 0AE9 |
| 0000025500 | 2600 | 9739 | 0674 | 0375 | 16E9 | 6A00 | FF00 | 1276 |
| 0000025520 | 76FF | FF10 | 1A76 | 76FF | 9A18 | 1911 | 2778 | C483 |
| 0000025540 | B80A | 0001 | 00E9 | 5E00 | 835F | 02ED | E58B | 5D1F |
| 0000025560 | CB4D | 581E | 4590 | 8B55 | 1EEC | D88E | EC81 | 0010 |
| 0000025600 | 5657 | B81E | 274C | D88E | 5EC4 | 2614 | 7F83 | FE04 |
| 0000025620 | 0374 | 06E9 | B800 | 0000 | 41E9 | 8B01 | 2046 | 39E9 |
| 0000025640 | FF00 | 1E76 | 76FF | 9A1C | 4868 | 287A | C483 | E904 |
| 0000025660 | 0038 | 468D | 16F0 | 9A50 | 4868 | 288C | C483 | E904 |
| 0000025700 | 0028 | 76FF | 1E20 | B668 | 9A0D | 4809 | 28AD | C483 |
| 0000025720 | B806 | 0000 | 05E9 | E901 | 0010 | C00B | 0375 | C0E9 |
| 0000025740 | 48FF | 0375 | CBE9 | E9FF | FFD8 | 599A | E658 | 8B27 |
| 0000025760 | C1D8 | 02E3 | 068E | 3386 | 468B | 8B10 | 1256 | 3926 |
| 0000026000 | 7287 | 7406 | E903 | 000A | 3926 | 7497 | 7506 | E903 |
| 0000026020 | 0016 | 006A | 76FF | FF12 | 1076 | 76FF | FF1A | 1876 |
| 0000026040 | 119A | F519 | 8328 | 0AC4 | 681E | 0DCC | 76FF | FF16 |
| 0000026060 | 1476 | 0C9A | 6A12 | 8328 | 08C4 | 4689 | 8EFC | 8806 |

THU MAR 14 17:41:20 1991 LBIPMT.DLL PAGE 13, LINE 709

| | | | | | | | | |
|---|---|---|---|---|---|---|---|---|
| 0000026100 | 2633 | 3E83 | 019A | 7500 | E903 | 001B | 681E | 0DD3 |
| 0000026120 | 76FF | FF0E | 1276 | 76FF | FF10 | FC76 | 099A | 4C14 |
| 0000026140 | 8329 | 0CC4 | 4689 | 83FC | FC7E | 7500 | E903 | 0066 |
| 0000026160 | 681E | 0DDA | 76FF | FF12 | 1076 | 76FF | FF0E | 0C76 |
| 0000026200 | 76FF | FF0A | 0876 | 76FF | 9A06 | 47B5 | 295A | C483 |
| 0000026220 | FF12 | 2476 | 76FF | 9A22 | 4075 | 2976 | C483 | 8304 |
| 0000026240 | 207E | 7401 | E903 | 0022 | 468D | 16F0 | FF50 | 1E76 |
| 0000026260 | 76FF | 9A1C | 4908 | 2982 | C483 | 1E08 | E168 | 9A0D |
| 0000026300 | 4075 | 2991 | C483 | E904 | 000C | 681E | 0DE3 | 759A |
| 0000026320 | E340 | 8328 | 04C4 | 01B8 | E900 | 0000 | 5E1F | 835F |
| 0000026340 | 02ED | E58B | 5D1F | CB4D | 581E | 4590 | 8B55 | 1EEC |
| 0000026360 | D88E | EC81 | 0006 | 5657 | B81E | 2844 | D88E | 04B8 |
| 0000026400 | 8C0B | 3BD9 | 0646 | 0374 | 08E9 | 3B00 | 084E | 0375 |
| 0000026420 | 1EE9 | 1E00 | E568 | 9A0D | 4809 | 29E6 | C483 | 1E04 |
| 0000026440 | 0F68 | 9A0E | 4809 | 2A07 | C483 | B804 | 0000 | 9DE9 |
| 0000026460 | C400 | 1C5E | 8326 | 047F | 74FE | E903 | 0006 | 00B8 |
| 0000026500 | E900 | 008A | 599A | 3D58 | 8B2A | C1D8 | 02E3 | 068E |
| 0000026520 | 3386 | 468B | 8B18 | 1A56 | 3926 | 7287 | 7406 | E903 |
| 0000026540 | 000A | 3926 | 7497 | 7506 | E903 | 0016 | 006A | 76FF |
| 0000026560 | FF1A | 1876 | 76FF | FF22 | 2076 | 119A | 7B19 | 832A |
| 0000026600 | 0AC4 | 468D | 8928 | FA46 | 568C | FFFC | FC76 | 76FF |
| 0000026620 | FFFA | 2676 | 76FF | FF24 | 1A76 | 76FF | FF18 | 1676 |
| 0000026640 | 76FF | FF14 | 1276 | 76FF | FF10 | 0E76 | 76FF | FF0C |
| 0000026660 | 0A76 | 76FF | FF1E | 1C76 | 4D9A | 1F2E | 8329 | 1EC4 |
| 0000026700 | C02B | 4689 | 89FC | FA46 | 01B8 | E900 | 0000 | 5E1F |
| 0000026720 | 835F | 02ED | E58B | 5D1F | CB4D | 581E | 4590 | 8B55 |
| 0000026740 | 1EEC | D88E | EC81 | 0006 | 5657 | B81E | 29BA | D88E |
| 0000026760 | 04B8 | 8C0B | 3BD9 | 0646 | 0374 | 08E9 | 3B00 | 084E |
| 0000027000 | 0375 | 1EE9 | 1E00 | 2A68 | 9A0E | 4809 | 2AD8 | C483 |
| 0000027020 | 1E04 | 5468 | 9A0E | 4809 | 2B16 | C483 | B804 | 0000 |
| 0000027040 | 40E9 | 8D00 | 2846 | 4689 | 8CFA | FC56 | 76FF | FFFC |
| 0000027060 | FA76 | 76FF | FF1A | 1876 | 76FF | FF16 | 1476 | 76FF |
| 0000027100 | FF12 | 1076 | 76FF | FF0E | 0C76 | 76FF | FF0A | 1E76 |
| 0000027120 | 76FF | 9A1C | 2B2F | 29DA | C483 | 2B1A | 89C0 | FC46 |
| 0000027140 | 4689 | 1FFA | 5F5E | ED83 | 8B02 | 1FE5 | 4D5D | 1ECB |
| 0000027160 | 9058 | 5545 | EC8B | 8E1E | 81D8 | 06EC | 5700 | FF56 |
| 0000027200 | 0C76 | 76FF | FF0A | 1A76 | 76FF | FF18 | 1676 | 76FF |
| 0000027220 | FF14 | 1276 | 76FF | FF10 | 0E76 | B59A | 8547 | 832B |
| 0000027240 | 12C4 | 5EC4 | 831C | 1C46 | 2604 | 078B | 8B26 | 0257 |
| 0000027260 | 4689 | 89FA | FC56 | 76FF | FF1E | 1C76 | 76FF | FFFC |
| 0000027300 | FA76 | 089A | 9140 | 832B | 08C4 | 681E | 0E6F | 759A |
| 0000027320 | AE40 | 832B | 04C4 | 068E | 3388 | 8326 | B63E | 0002 |
| 0000027340 | 0375 | 0EE9 | FF00 | 0C76 | 76FF | 9A0A | 2E24 | 2ACC |
| 0000027360 | C483 | 5E04 | 835F | 02ED | E58B | 5D1F | CB4D | 581F |
| 0000027400 | 4590 | 8B55 | 1EEC | D88E | EC81 | 0006 | 5657 | B81E |
| 0000027420 | 2AAC | D88E | 04B8 | 8C0B | 3BD9 | 0646 | 0374 | 08E9 |
| 0000027440 | 3B00 | 084E | 0375 | 1EE9 | 1E00 | 7168 | 9A0E | 4809 |
| 0000027460 | 2BFC | C483 | 1E04 | 9B68 | 9A0E | 4809 | 2C1D | C483 |
| 0000027500 | B804 | 0000 | A6E9 | C400 | 1C5E | 8326 | 047F | 74FE |
| 0000027520 | E903 | 0006 | 00B8 | E900 | 0093 | 599A | 5358 | 8B2C |
| 0000027540 | C1D8 | 02E3 | 068E | 3386 | 468B | 8B18 | 1A56 | 3926 |
| 0000027560 | 7287 | 7406 | E903 | 000A | 3926 | 7497 | 7506 | E903 |
| 0000027600 | 0016 | 006A | 76FF | FF1A | 1876 | 76FF | FF22 | 2076 |
| 0000027620 | 119A | 5D19 | 832B | 0AC4 | 468D | 892A | FA46 | 568C |
| 0000027640 | 83FC | 287E | 7500 | E903 | 0035 | 76FF | FFFC | FA76 |
| 0000027660 | 76FF | FF26 | 2476 | 76FF | FF1A | 1876 | 76FF | FF16 |
| 0000027700 | 1476 | 76FF | FF12 | 1076 | 76FF | FF0E | 0C76 | 76FF |
| 0000027720 | FF0A | 1E76 | 76FF | 9A1C | 2E4D | 2BF0 | C483 | 2B1E |
| 0000027740 | 89C0 | FC46 | 4689 | B8FA | 0001 | 00E9 | 1F00 | 5F5E |

THU MAR 14 17:41:20 1991 LBIPMT.DLL PAGE 14, LINE 768

| | | | | | | | | |
|---|---|---|---|---|---|---|---|---|
| 0000027760 | ED83 | 8B02 | 1FE5 | 4D5D | 1ECB | 9058 | 5545 | EC8B |
| 0000030000 | 8E1E | 81D8 | 04EC | 5700 | 1E56 | D0B8 | 8E2B | B8D8 |
| 0000030020 | 0B04 | D98C | 463B | 7406 | E903 | 0008 | 4E3B | 7508 |
| 0000030040 | E903 | 001E | 681E | 0EB6 | 099A | F748 | 832C | 04C4 |
| 0000030060 | 681E | 0EE0 | 099A | 1848 | 832D | 04C4 | 00B8 | E900 |
| 0000030100 | 0116 | 5EC4 | 261C | 7F83 | FE04 | 0374 | 06E9 | B800 |
| 0000030120 | 0000 | 03E9 | 9A01 | 5859 | 2D4E | D88B | E3C1 | 8E02 |
| 0000030140 | 8606 | 8B33 | 1846 | 568B | 261A | 8739 | 0672 | 0374 |
| 0000030160 | 0AE9 | 2600 | 9739 | 0674 | 0375 | 16E9 | 6A00 | FF00 |
| 0000030200 | 1A76 | 76FF | FF18 | 2276 | 76FF | 9A20 | 1911 | 2D62 |
| 0000030220 | C483 | FF0A | 0C76 | 76FF | FF0A | 1E76 | 76FF | 9A1C |
| 0000030240 | 120C | 2D8E | C483 | 8908 | FC46 | 068E | 3388 | 8326 |
| 0000030260 | 9A3E | 0001 | 0375 | 1DE9 | FF00 | 0C76 | 76FF | FF0A |
| 0000030300 | 1676 | 76FF | FF1A | 1876 | 76FF | 9AFC | 1409 | 2DCC |
| 0000030320 | C483 | 890C | FC46 | 7E83 | 00FC | 0375 | 73E9 | 8E00 |
| 0000030340 | 8806 | 2633 | 3E83 | 02BA | 7500 | E903 | 002F | 76FF |
| 0000030360 | FFDC | 0A76 | 76FF | FF1A | 1876 | 76FF | FF16 | 1476 |
| 0000030400 | 76FF | FF12 | 1076 | 76FF | 9A0E | 47B5 | 2DD8 | C483 |
| 0000030420 | 1E12 | FB68 | 9A0E | 4075 | 2E07 | C483 | FF04 | 2676 |
| 0000030440 | 76FF | FF24 | 1A76 | 76FF | FF18 | 1676 | 76FF | FF14 |
| 0000030460 | 1276 | 76FF | FF10 | 0E76 | 76FF | FF0C | 0A76 | 76FF |
| 0000030500 | FF1E | 1C76 | 3D9A | 9A2F | 832C | 1AC4 | 01B8 | E900 |
| 0000030520 | 0006 | 00B8 | E900 | 0000 | 5E1F | 835F | 02ED | E58B |
| 0000030540 | 5D1F | CB4D | 581E | 4590 | 8B55 | 1EEC | D88E | EC81 |
| 0000030560 | 0000 | 5657 | 76FF | FF08 | 0676 | BA9A | EB22 | 832C |
| 0000030600 | 04C4 | 5F5E | ED83 | 8B02 | 1FE5 | 4D5D | 1ECB | 9058 |
| 0000030620 | 5545 | EC8B | 8E1E | 81D8 | 08EC | 5700 | FF56 | 0C76 |
| 0000030640 | 76FF | FF0A | 0876 | 76FF | 9A06 | 120C | 2E98 | C483 |
| 0000030660 | 8908 | FC46 | 068E | 3388 | 8326 | 9A3E | 0001 | 0375 |
| 0000030700 | 1DE9 | FF00 | 0C76 | 76FF | FF0A | 1676 | 76FF | FF1A |
| 0000030720 | 1876 | 76FF | 9AFC | 1409 | 2ECA | C483 | 890C | FC46 |
| 0000030740 | 7E83 | 00FC | 0374 | 03E9 | E900 | 0086 | 76FF | FFDC |
| 0000030760 | 0A76 | 76FF | FF1A | 1876 | 76FF | FF16 | 1476 | 76FF |
| 0000031000 | FF12 | 1076 | 76FF | 9A0E | 47B5 | 2EF2 | C483 | C412 |
| 0000031020 | 205E | 4683 | 0420 | 8B26 | 2607 | 578B | 8902 | F846 |
| 0000031040 | 5689 | FFFA | 2276 | 76FF | FF20 | FA76 | 76FF | 9AF8 |
| 0000031060 | 4008 | 2EFE | C483 | 1E08 | 0868 | 9A0F | 4075 | 2F2D |
| 0000031100 | C483 | FF04 | 1E76 | 76FF | FF1C | 1A76 | 76FF | FF18 |
| 0000031120 | 1676 | 76FF | FF14 | 1276 | 76FF | FF10 | 0E76 | 76FF |
| 0000031140 | FF0C | 0A76 | 76FF | FF08 | 0676 | 3D9A | 3D2F | 832E |
| 0000031160 | 1AC4 | 5F5E | ED83 | 8B02 | 1FE5 | 4D5D | 1ECB | 9058 |
| 0000031200 | 5545 | EC8B | 8E1E | 81D8 | 06EC | 5700 | 8B56 | 0A46 |
| 0000031220 | 568B | 890C | FA46 | 5689 | 1EFC | 0A68 | FF0F | 0876 |
| 0000031240 | 76FF | 9A06 | 120C | 2F7A | C483 | 3D08 | 0000 | 0375 |
| 0000031260 | 0CE9 | 1E00 | 1268 | 9A0F | 2E24 | 2E6C | C483 | 5E04 |
| 0000031300 | 835F | 02ED | E58B | 5D1F | CB4D | 581E | 4590 | 8B55 |
| 0000031320 | 1EEC | D88E | EC81 | 000E | 5657 | 468D | 16F2 | 9A50 |
| 0000031340 | 4368 | 2FAE | C483 | 1E04 | 1A68 | 9A0F | 4075 | 2FC1 |
| 0000031360 | C483 | 8D04 | F246 | 5016 | 76FF | FF08 | 0676 | 089A |
| 0000031400 | CD49 | 832F | 08C4 | 681E | 0F20 | 759A | 6640 | 832F |
| 0000031420 | 04C4 | 5F5E | ED83 | 8B02 | 1FE5 | 4D5D | 1ECB | 9058 |
| 0000031440 | 5545 | EC8B | 8E1E | 81D8 | 00EC | 5700 | 9A56 | 5616 |
| 0000031460 | 2FA2 | 22A3 | B80F | 0001 | 00E9 | 5E00 | 835F | 02ED |
| 0000031500 | E58B | 5D1F | CB4D | 581E | 4590 | 8B55 | 1EEC | D88E |
| 0000031520 | EC81 | 0000 | 5657 | 22A1 | E90F | 0000 | 5F5E | ED83 |
| 0000031540 | 8B02 | 1FE5 | 4D5D | 1ECB | 9058 | 5545 | EC8B | 8E1E |
| 0000031560 | 81D8 | 00EC | 5700 | 1E56 | CBB8 | 8E2C | 9AD8 | 0000 |
| 0000031600 | 2FF0 | 01B8 | E900 | 0000 | 5E1F | 835F | 02ED | E58B |
| 0000031620 | 5D1F | CB4D | 581E | 4590 | 8B55 | 1EEC | D88E | EC81 |

THU MAR 14 17:41:20 1991 LBIPMT.DLL PAGE 15, LINE 827

| | | | | | | | | |
|---|---|---|---|---|---|---|---|---|
| 0000031640 | 0000 | 5657 | B81E | 3039 | D88E | 468B | 0B08 | 0646 |
| 0000031660 | 0375 | 1CE9 | FF00 | 0876 | 76FF | 1E06 | 8E68 | 9A9B |
| 0000031700 | 937A | 3094 | C483 | C708 | 1E06 | 8E0B | 8C9B | 201E |
| 0000031720 | 9A0B | 2FDD | 3040 | 1EA1 | 8B0B | 2016 | E90B | 0000 |
| 0000031740 | 5E1F | 835F | 02ED | E58B | 5D1F | CB4D | 581E | 4590 |
| 0000031760 | 8B55 | 1EEC | D88E | EC81 | 0000 | 5657 | 1EA1 | 8B0B |
| 0000032000 | 2016 | E90B | 0000 | 5F5E | ED83 | 8B02 | 1FE5 | 4D5D |
| 0000032020 | 1ECB | 9058 | 5545 | EC8B | 8E1E | 81D8 | 14EC | 5700 |
| 0000032040 | FF56 | 1476 | 76FF | FF12 | 1076 | 76FF | FF0E | 0C76 |
| 0000032060 | 76FF | 8D0A | F846 | 5016 | 0F9A | 140E | 8331 | 10C4 |
| 0000032100 | 7E83 | FEFC | 0374 | 03E9 | E900 | 004A | 468D | 16EC |
| 0000032120 | 9A50 | 4868 | 3138 | C483 | FF04 | 1476 | 76FF | FF12 |
| 0000032140 | 1076 | 76FF | FF0E | 0C76 | 76FF | FFUA | 0876 | 76FF |
| 0000032160 | 1E06 | 2468 | 9A0F | 4075 | 3145 | C483 | 8D14 | EC46 |
| 0000032200 | 5016 | BE9A | 5148 | 8331 | 04C4 | 681E | 0F34 | 759A |
| 0000032220 | 8240 | 8330 | 04C4 | 5F5E | ED83 | 8B02 | 1FE5 | 4D5D |
| 0000032240 | 1ECB | 9058 | 5545 | EC8B | 8E1E | 81D8 | 00EC | 5700 |
| 0000032260 | 1E56 | 66B8 | 8E30 | 8BD8 | 0646 | 568B | A308 | 0B22 |
| 0000032300 | 1689 | 0B24 | 5E1F | 835F | 02ED | E58B | 5D1F | CB4D |
| 0000032320 | 581E | 4590 | 8B55 | 1EEC | D88E | EC81 | 0034 | 5657 |
| 0000032340 | B81E | 3173 | D88E | 5EC4 | 2616 | 7F83 | FE04 | 0374 |
| 0000032360 | 06E9 | B800 | 0000 | 07E9 | 1E03 | 3668 | FF0F | 1876 |
| 0000032400 | 76FF | 9A16 | 120C | 31DI | C483 | 8908 | F846 | 599A |
| 0000032420 | FB58 | 8B30 | C1D8 | 02E3 | 068E | 338A | 468B | 8B12 |
| 0000032440 | 1456 | 3926 | 7287 | 7406 | E903 | 000A | 3926 | 7497 |
| 0000032460 | 7506 | E903 | 0016 | 006A | 76FF | FF14 | 1276 | 76FF |
| 0000032500 | FF1C | 1A76 | 119A | C619 | 8331 | 0AC4 | 068E | 338C |
| 0000032520 | 8326 | 9A3E | 0001 | 0375 | 1BE9 | 1E00 | 3D68 | FF0F |
| 0000032540 | 1076 | 76FF | FF14 | 1276 | 76FF | 9AF8 | 1409 | 3261 |
| 0000032560 | C483 | 890C | F846 | 7E83 | 00F8 | 0374 | 06E9 | B800 |
| 0000032600 | 0000 | 7BE9 | 1E02 | 4468 | FF0F | 1476 | 76FF | FF12 |
| 0000032620 | 1076 | 76FF | FF0E | 0C76 | 76FF | FF0A | 0876 | B59A |
| 0000032640 | 8E47 | 8332 | I2C4 | 468D | 8926 | FA46 | 568C | 8BFC |
| 0000032660 | 0646 | E3E9 | C401 | FA5E | 4683 | 02FA | 8B26 | 8907 |
| 0000032700 | CE46 | 76FF | FFCE | 2476 | 76FF | 9A22 | 352F | 32B0 |
| 0000032720 | C483 | E906 | 01EF | 5EC4 | 83FA | FA46 | 2602 | 078A |
| 0000032740 | 4688 | 8AEC | EC46 | FF50 | 2476 | 76FF | 9A22 | 34CC |
| 0000032760 | 32DB | C483 | E906 | 01CD | 5EC4 | 83FA | FA46 | 2604 |
| 0000033000 | 078B | 8B26 | 0257 | 4689 | 89F2 | F456 | 76FF | FFF4 |
| 0000033020 | F276 | 76FF | FF24 | 2276 | 9D9A | 1136 | 8333 | 08C4 |
| 0000033040 | A2E9 | 8B01 | FA46 | 568B | 83FC | FA46 | 1E08 | 7E8D |
| 0000033060 | 8BD0 | 16F0 | 8E07 | A5DA | A5A5 | IFA5 | 76FF | FFD6 |
| 0000033100 | D476 | 76FF | FFD2 | D076 | 76FF | FF24 | 2276 | F09A |
| 0000033120 | 4737 | 8333 | 0CC4 | 6CE9 | 8B01 | FA46 | 568B | 83FC |
| 0000033140 | FA46 | IE08 | 7E8D | 8BDE | 16F0 | 8E07 | A5DA | A5A5 |
| 0000033160 | IFA5 | 76FF | FFE4 | E276 | 76FF | FFE0 | DE76 | 76FF |
| 0000033200 | FF24 | 2276 | E09A | 7238 | 8333 | 0CC4 | 36E9 | C401 |
| 0000033220 | FA5E | 4683 | 04FA | 8B26 | 2607 | 578B | 8902 | D846 |
| 0000033240 | 5689 | FFDA | DA76 | 76FF | FFD8 | 2476 | 76FF | 9A22 |
| 0000033260 | 395A | 339D | C483 | E908 | 010B | 5EC4 | 83FA | FA46 |
| 0000033300 | 2604 | 078B | 8B26 | 0257 | 4689 | 89EE | F056 | 76FF |
| 0000033320 | FFF0 | EE76 | 76FF | FF24 | 2276 | 889A | BE37 | 8333 |
| 0000033340 | 08C4 | E0E9 | C400 | FA5E | 4683 | 02FA | 8B26 | 8907 |
| 0000033360 | F646 | 76FF | FFF6 | 2476 | 76FF | 9A22 | 35CD | 33DF |
| 0000033400 | C483 | E906 | 00BF | 5EC4 | 83FA | FA46 | 2602 | 078B |
| 0000033420 | 4689 | FFE6 | E676 | 76FF | FF24 | 2276 | 359A | 0A36 |
| 0000033440 | 8334 | 06C4 | 9EE9 | C400 | FA5E | 4683 | 04FA | 8B26 |
| 0000033460 | 2607 | 578B | 8902 | E846 | 5689 | FFEA | EA76 | 76FF |
| 0000033500 | FFE8 | 2476 | 76FF | 9A22 | 3720 | 342C | C483 | E908 |

THU MAR 14 17:41:20 1991 LBIPMT.DLL PAGE 16, LINE 886

| | | | | | | | | |
|---|---|---|---|---|---|---|---|---|
| 0000033520 | 0073 | 5EC4 | 83FA | FA46 | 2602 | 078A | 4688 | 8ADC |
| 0000033540 | DC46 | FF50 | 2476 | 76FF | 9A22 | 34CC | 344D | C483 |
| 0000033560 | E906 | 0051 | 5EC4 | 83FA | FA46 | 2602 | 078B | 4689 |
| 0000033600 | FFCC | CC76 | 76FF | FF24 | 2276 | 6A9A | AD38 | 8334 |
| 0000033620 | 06C4 | 30E9 | E900 | 002D | 012D | 3D01 | 000C | 0376 |
| 0000033640 | F2E9 | D1FF | 93E0 | FF2E | 6BA7 | 7534 | 9632 | B832 |
| 0000033660 | E332 | 1932 | 4F33 | 7A33 | A533 | C633 | E733 | 1233 |
| 0000033700 | 1234 | 3434 | FF34 | 2076 | 76FF | FF1E | 1476 | 76FF |
| 0000033720 | FF12 | 1076 | 76FF | FF0E | 0C76 | 76FF | FF0A | 0876 |
| 0000033740 | 681E | 0F4B | 76FF | FF18 | 1676 | 3D9A | 072F | 8332 |
| 0000033760 | 1AC4 | C02B | 4689 | 89FC | FA46 | 01B8 | E900 | 0000 |
| 0000034000 | 5E1F | 835F | 02ED | E58B | 5D1F | CB4D | 581E | 4590 |
| 0000034020 | 8B55 | 1EEC | D88E | EC81 | 0000 | 5657 | 5E8A | 2A0A |
| 0000034040 | C1FF | 02E3 | B7FF | 1A2E | B7FF | 1A2C | 76FF | FF08 |
| 0000034060 | 0676 | 681E | 1A1B | 759A | 0B40 | 8335 | 0CC4 | 681E |
| 0000034100 | 1A28 | 76FF | FF08 | 0676 | B09A | 1F93 | 8335 | 08C4 |
| 0000034120 | 003D | 7500 | E903 | 000C | 681E | 1A29 | 759A | 2E40 |
| 0000034140 | 8332 | 04C4 | 5F5E | ED83 | 8B02 | 1FE5 | 4D5D | 1ECB |
| 0000034160 | 9058 | 5545 | EC8B | 8E1E | 81D8 | 00EC | 5700 | FF56 |
| 0000034200 | 0A76 | 76FF | FF08 | 0676 | 681E | 1DC8 | 759A | 6740 |
| 0000034220 | 8335 | 0AC4 | 7E83 | 000A | 037C | 0FE9 | FF00 | 0A76 |
| 0000034240 | 681E | 1DD4 | 759A | 8840 | 8335 | 06C4 | 7E83 | 090A |
| 0000034260 | 037E | 09E9 | 8300 | 0A7E | 7C00 | E903 | 000F | 76FF |
| 0000034300 | 1E0A | D968 | 9A1D | 4075 | 359A | C483 | 1E06 | DF68 |
| 0000034320 | FF1D | 0876 | 76FF | 9A06 | 93B0 | 35AE | C483 | 3D08 |
| 0000034340 | 0000 | 0375 | 0FE9 | 1E00 | E068 | 9A1D | 4075 | 35BD |
| 0000034360 | C483 | E904 | 000C | 681E | 1DE2 | 759A | F940 | 8334 |
| 0000034400 | 04C4 | 5F5E | ED83 | 8B02 | 1FE5 | 4D5D | 1ECB | 9058 |
| 0000034420 | 5545 | EC8B | 8E1E | 81D8 | 00EC | 5700 | FF56 | 0A76 |
| 0000034440 | 76FF | FF0A | 0876 | 76FF | 1E06 | E468 | 9A1D | 4075 |
| 0000034460 | 3602 | C483 | 1E0C | F768 | FF1D | 0876 | 76FF | 9A06 |
| 0000034500 | 93B0 | 3616 | C483 | 3D08 | 0000 | 0375 | 0FE9 | 1E00 |
| 0000034520 | F868 | 9A1D | 4075 | 3625 | C483 | E904 | 000C | 681E |
| 0000034540 | 1DFA | 759A | 4F40 | 8335 | 04C4 | 5F5E | ED83 | 8B02 |
| 0000034560 | 1FE5 | 4D5D | 1ECB | 9058 | 5545 | EC8B | 8E1E | 81D8 |
| 0000034600 | 00EC | 5700 | FF56 | 0A76 | 76FF | FF0A | 0876 | 76FF |
| 0000034620 | 1E06 | FC68 | 9A1D | 4075 | 366A | C483 | 1E0C | 1068 |
| 0000034640 | FF1E | 0876 | 76FF | 9A06 | 93B0 | 367E | C483 | 3D08 |
| 0000034660 | 0000 | 0375 | 0FE9 | 1E00 | 1168 | 9A1E | 4075 | 368D |
| 0000034700 | C483 | E904 | 000C | 681E | 1E13 | 759A | F040 | 8335 |
| 0000034720 | 04C4 | 5F5E | ED83 | 8B02 | 1FE5 | 4D5D | 1ECB | 9058 |
| 0000034740 | 5545 | EC8B | 8E1E | 81D8 | 00EC | 5700 | FF56 | 0C76 |
| 0000034760 | 76FF | FF0A | 0876 | 76FF | 1E06 | 1568 | 9A1E | 4075 |
| 0000035000 | 36DB | C483 | 830C | 0C7E | 7C00 | E903 | 0012 | 76FF |
| 0000035020 | FF0C | 0A76 | 681E | 1E23 | 759A | ED40 | 8336 | 08C4 |
| 0000035040 | 681E | 1E29 | 76FF | FF08 | 0676 | B09A | 0193 | 8337 |
| 0000035060 | 08C4 | 003D | 7500 | E903 | 000F | 681E | 1E2A | 759A |
| 0000035100 | 1040 | 8337 | 04C4 | 0CE9 | 1E00 | 2C68 | 9A1E | 4075 |
| 0000035120 | 3658 | C483 | 5E04 | 835F | 02ED | E58B | 5D1F | CB4D |
| 0000035140 | 581E | 4590 | 8B55 | 1EEC | D88E | EC81 | 0000 | 5657 |
| 0000035160 | 76FF | FF0C | 0A76 | 76FF | FF08 | 0676 | 681E | 1E2E |
| 0000035200 | 759A | 5540 | 8337 | 0CC4 | 681E | 1E3D | 76FF | FF08 |
| 0000035220 | 0676 | B09A | 6993 | 8337 | 08C4 | 003D | 7500 | E903 |
| 0000035240 | 000F | 681E | 1E3E | 759A | 7840 | 8337 | 04C4 | 0CE9 |
| 0000035260 | 1E00 | 4068 | 9A1E | 4075 | 36C0 | C483 | 5E04 | 835F |
| 0000035300 | 02ED | E58B | 5D1F | CB4D | 581E | 4590 | 8B55 | 1EEC |
| 0000035320 | D88E | EC81 | 0000 | 5657 | 76FF | FF0C | 0A76 | 76FF |
| 0000035340 | FF08 | 0676 | 681E | 1E42 | 759A | BD40 | 8337 | 0CC4 |
| 0000035360 | 681E | 1E52 | 76FF | FF08 | 0676 | B09A | D193 | 8337 |

THU MAR 14 17:41:20 1991 LBIPMT.DLL PAGE 17, LINE 945

| | | | | | | | | |
|---|---|---|---|---|---|---|---|---|
| 0000035400 | 08C4 | 003D | 7500 | E903 | 000F | 681E | 1E53 | 759A |
| 0000035420 | ED40 | 8337 | 04C4 | 0CE9 | 1E00 | 5568 | 9A1E | 4075 |
| 0000035440 | 3743 | C483 | 5E04 | 835F | 02ED | E58B | 5D1F | CB4D |
| 0000035460 | 581E | 4590 | 8B55 | 1EEC | D88E | EC81 | 0000 | 5657 |
| 0000035500 | 76FF | FF10 | 0E76 | 76FF | FF0C | 0A76 | 76FF | FF10 |
| 0000035520 | 0E76 | 76FF | FF0C | 0A76 | 76FF | FF08 | 0676 | 681E |
| 0000035540 | 1E57 | 759A | 3740 | 8338 | 18C4 | 681E | 1E69 | 76FF |
| 0000035560 | FF08 | 0676 | B09A | 4B93 | 8338 | 08C4 | 003D | 7500 |
| 0000035600 | E903 | 000F | 681E | 1E6A | 759A | 5A40 | 8338 | 04C4 |
| 0000035620 | 0CE9 | 1E00 | [illegible] | 9A1E | 4075 | 37AB | C483 | 5E04 |
| 0000035640 | 835F | 02ED | E58B | 5D1F | CB4D | 581E | 4590 | 8B55 |
| 0000035660 | 1EEC | D88E | EC81 | 0000 | 5657 | 7E83 | 000A | 0375 |
| 0000035700 | 06E9 | B800 | 1E6E | 03E9 | B800 | 1E73 | 501E | 76FF |
| 0000035720 | FF08 | 0676 | 681E | 1E79 | 759A | AD40 | 8338 | 0CC4 |
| 0000035740 | 681E | 1E86 | 76FF | FF08 | 0676 | B09A | C193 | 8338 |
| 0000035760 | 08C4 | 003D | 7500 | E903 | 000F | 681E | 1E87 | 759A |
| 0000036000 | D040 | 8338 | 04C4 | 0CE9 | 1E00 | 8968 | 9A1E | 4075 |
| 0000036020 | 3825 | C483 | 5E04 | 835F | 02ED | E58B | 5D1F | CB4D |
| 0000036040 | 581E | 4590 | 8B55 | 1EEC | D88E | EC81 | 0000 | 5657 |
| 0000036060 | 76FF | FF10 | 0E76 | 76FF | FF0C | 0A76 | 76FF | FF10 |
| 0000036100 | 0E76 | 76FF | FF0C | 0A76 | 76FF | FF08 | 0676 | 681E |
| 0000036120 | 1E8B | 759A | 2740 | 8339 | 18C4 | 681E | 1E9C | 76FF |
| 0000036140 | FF08 | 0676 | B09A | 3B93 | 8339 | 08C4 | 003D | 7500 |
| 0000036160 | E903 | 000F | 681E | 1E9D | 759A | 4A40 | 8339 | 04C4 |
| 0000036200 | 0CE9 | 1E00 | 9F68 | 9A1E | 4075 | 389B | C483 | 5E04 |
| 0000036220 | 835F | 02ED | E58B | 5D1F | CB4D | 581E | 4590 | 8B55 |
| 0000036240 | 1EEC | D88E | EC81 | 0000 | 5657 | 468B | 0B0C | 0A46 |
| 0000036260 | 0375 | 31E9 | FF00 | 0C76 | 76FF | FF0A | 0C76 | 76FF |
| 0000036300 | FF0A | 0C76 | 76FF | 9A0A | 93DA | 399E | C483 | 4004 |
| 0000036320 | FF50 | 0876 | 76FF | 1E06 | A168 | 9A1E | 4075 | 39B9 |
| 0000036340 | C483 | E912 | 0018 | 76FF | FF0C | 0A76 | 76FF | FF08 |
| 0000036360 | 0676 | 681E | 1EB9 | 759A | CB40 | 8339 | 0CC4 | 681E |
| 0000036400 | 1ECF | 76FF | FF08 | 0676 | B09A | DF93 | 8339 | 08C4 |
| 0000036420 | 003D | 7500 | E903 | 000F | 681E | 1ED0 | 759A | EE40 |
| 0000036440 | 8339 | 04C4 | 0CE9 | 1E00 | D268 | 9A1E | 4075 | 3915 |
| 0000036460 | C483 | 5E04 | 835F | 02ED | E58B | 5D1F | CB4D | 581E |
| 0000036500 | 4590 | 8B55 | 1EEC | D88E | EC81 | 0006 | 5657 | 2E6A |
| 0000036520 | 76FF | FF08 | 0676 | 709A | 3EA2 | 833A | 06C4 | 4689 |
| 0000036540 | 89FA | FC56 | D00B | 0374 | 06E9 | B800 | 0000 | 40E9 |
| 0000036560 | 1E00 | D468 | FF1E | FC76 | 76FF | 9AFA | 93B0 | 3A58 |
| 0000036600 | C483 | 3D08 | 0000 | 0375 | 1AE9 | 1E00 | D768 | FF1E |
| 0000036620 | FC76 | 76FF | 9AFA | 93B0 | 398A | C483 | 3D08 | 0000 |
| 0000036640 | 0374 | 06E9 | B800 | 0001 | 03E9 | B800 | 0000 | 00E9 |
| 0000036660 | 5E00 | 835F | 02ED | E58B | 5D1F | CB4D | 581E | 4590 |
| 0000036700 | 8B55 | 1EEC | D88E | EC81 | 0004 | 5657 | 06C7 | 1EE2 |
| 0000036720 | 0000 | 46C7 | 00FC | E900 | 0003 | 46FF | 83FC | FC7E |
| 0000036740 | 7C64 | E903 | 003C | 5E8B | C1FC | 02E3 | 878B | 9D90 |
| 0000036760 | 870B | 9D8E | 0375 | 16E9 | 8B00 | FC5E | E3C1 | FF02 |
| 0000037000 | 90B7 | FF9D | 8EB7 | 9A9D | 9080 | 3A19 | C483 | 8B04 |
| 0000037020 | FC5E | E3C1 | 2B02 | 89C0 | 9087 | 899D | 8E87 | E99D |
| 0000037040 | FFB8 | 5F5E | ED83 | 8B02 | 1FE5 | 4D5D | 1ECB | 9058 |
| 0000037060 | 5545 | EC8B | 8E1E | 81D8 | 00EC | 5700 | 8356 | E23E |
| 0000037100 | 641E | 037D | 06E9 | B800 | 0000 | 41E9 | FF00 | 0876 |
| 0000037120 | 76FF | 9A06 | A242 | 3ACA | C483 | 8B04 | E21E | C11E |
| 0000037140 | 02E3 | 8789 | 9D8E | 9789 | 9D90 | 1E8B | 1EE2 | E3C1 |
| 0000037160 | 8B02 | 9087 | 0B9D | 8E87 | 749D | E903 | 0006 | 00B8 |
| 0000037200 | E900 | 000A | 06FF | 1EE2 | 01B8 | E900 | 0000 | 5F5E |
| 0000037220 | ED83 | 8B02 | 1FE5 | 4D5D | 1ECB | 9058 | 5545 | EC8B |
| 0000037240 | 8E1E | 81D8 | 04EC | 5700 | FF56 | 0876 | 76FF | 9A06 |

THU MAR 14 17:41:20 1991 LBIPMT.DLL PAGE 18, LINE 1004

| | | | | | | | | |
|---|---|---|---|---|---|---|---|---|
| 0000037260 | 39FE | 3BB2 | C483 | 3D04 | 0000 | 0374 | 06E9 | B800 |
| 0000037300 | 0000 | 49E9 | C700 | FC46 | 0000 | 03E9 | FF00 | FC46 |
| 0000037320 | E2A1 | 391E | FC46 | 037C | 2DE9 | FF00 | 0876 | 76FF |
| 0000037340 | 8B06 | FC5E | E3C1 | FF02 | 90B7 | FF9D | 8EB7 | 9A9D |
| 0000037360 | 93B0 | 3B16 | C483 | 3D08 | 0000 | 0374 | 06E9 | B800 |
| 0000037400 | 0001 | 09E9 | E900 | FFC5 | 00B8 | E900 | 0000 | 5F5E |
| 0000037420 | ED83 | 8B02 | 1FE5 | 4D5D | 00CB | 581E | 4590 | 8B55 |
| 0000037440 | 1EEC | D88E | EC81 | 0000 | 5657 | C02B | F2A3 | A31E |
| 0000037460 | 1EF0 | C02B | EEA3 | A31E | 1EEC | C02B | F6A3 | A31E |
| 0000037500 | 1EF4 | 01B8 | E900 | 0000 | 5F5E | ED83 | 8B02 | 1FE5 |
| 0000037520 | 4D5D | 1ECB | 9058 | 5545 | EC8B | 8E1E | 81D8 | 00EC |
| 0000037540 | 5700 | 9A56 | 5042 | 3B72 | 01B8 | E900 | 0000 | 5F5E |
| 0000037560 | ED83 | 8B02 | 1FE5 | 4D5D | 1ECB | 9058 | 5545 | EC8B |
| 0000037600 | 8E1E | 81D8 | 00EC | 5700 | A156 | 1EF2 | 060B | 1EF0 |
| 0000037620 | 0375 | 05E9 | 9A00 | 3D6C | 3C69 | 76FF | FF0C | 0A76 |
| 0000037640 | 76FF | FF08 | 0676 | F09A | 9475 | 833C | 08C4 | F0A3 |
| 0000037660 | 891E | F216 | A11E | 1EF2 | 060B | 1EF0 | 0374 | 26E9 |
| 0000037700 | FF00 | 0C76 | 76FF | FF0A | 0876 | 76FF | 1E06 | F868 |
| 0000037720 | 9A1E | 4809 | 3C26 | C483 | 2B0C | A3C0 | 1EF2 | F0A3 |
| 0000037740 | B81E | 0000 | 06E9 | B800 | 0001 | 00E9 | 5E00 | 835F |
| 0000037760 | 02ED | E58B | 5D1F | CB4D | 581E | 4590 | 8B55 | 1EEC |
| 0000040000 | D88E | EC81 | 0000 | 5657 | F6A1 | 0B1E | F406 | 751E |
| 0000040020 | E903 | 0005 | DF9A | E83D | FF3C | 0C76 | 76FF | FF0A |
| 0000040040 | 0876 | 76FF | 9A06 | 75F0 | 3D13 | C483 | A308 | 1EF4 |
| 0000040060 | 1689 | 1EF6 | F6A1 | 0B1E | F406 | 741E | E903 | 0026 |
| 0000040100 | 76FF | FF0C | 0A76 | 76FF | FF08 | 0676 | 681E | 1F18 |
| 0000040120 | 099A | 5848 | 833C | 0CC4 | C02B | F6A3 | A31E | 1EF4 |
| 0000040140 | 00B8 | E900 | 0006 | 01B8 | E900 | 0000 | 5F5E | ED83 |
| 0000040160 | 8B02 | 1FE5 | 4D5D | 1ECB | 9058 | 5545 | EC8B | 8E1E |
| 0000040200 | 81D8 | 00EC | 5700 | 9A56 | 3D6C | 3D4F | DF9A | 543D |
| 0000040220 | 9A3D | 3E52 | 3D59 | DA9A | D73B | B83C | 0001 | 00E9 |
| 0000040240 | 5E00 | 835F | 02ED | E58B | 5D1F | CB4D | 581E | 4590 |
| 0000040260 | 8B55 | 1EEC | D88E | EC81 | 0000 | 5657 | F2A1 | 0B1E |
| 0000040300 | F006 | 751E | E903 | 0046 | 26B8 | 8C2D | 3BD9 | F006 |
| 0000040320 | 741E | E903 | 0009 | 0E3B | 1EF2 | 0375 | 27E9 | B800 |
| 0000040340 | 2D32 | D98C | 063B | 1EF0 | 0374 | 09E9 | 3B00 | F20E |
| 0000040360 | 751E | E903 | 0010 | 36FF | 1EF2 | 36FF | 1EF0 | 9C9A |
| 0000040400 | 4A74 | 833D | 04C4 | C02B | F2A3 | A31E | 1EF0 | 01B8 |
| 0000040420 | E900 | 0000 | 5F5E | ED83 | 8B02 | 1FE5 | 4D5D | 1ECB |
| 0000040440 | 9058 | 5545 | EC8B | 8E1E | 81D8 | 00EC | 5700 | A156 |
| 0000040460 | 1EF6 | 060B | 1EF4 | 0375 | 46E9 | B800 | 2D26 | D98C |
| 0000040500 | 063B | 1EF4 | 0374 | 09E9 | 3B00 | F60E | 751E | E903 |
| 0000040520 | 0027 | 32B8 | 8C2D | 3BD9 | F006 | 741E | E903 | 0009 |
| 0000040540 | 0E3B | 1EF2 | 0375 | 10E9 | FF00 | F636 | FF1E | F436 |
| 0000040560 | 9A1E | 749C | 3DC1 | C483 | 2B04 | A3C0 | 1EF6 | F4A3 |
| 0000040600 | B81E | 0001 | 00E9 | 5E00 | 835F | 02ED | E58B | 5D1F |
| 0000040620 | CB4D | 581E | 4590 | 8B55 | 1EEC | D88E | EC81 | 0000 |
| 0000040640 | 5657 | 01B8 | E900 | 0000 | 5F5E | ED83 | 8B02 | 1FE5 |
| 0000040660 | 4D5D | 1ECB | 9058 | 5545 | EC8B | 8E1E | 81D8 | 00EC |
| 0000040700 | 5700 | A156 | 1EF2 | 060B | 1EF0 | 0375 | 10E9 | FF00 |
| 0000040720 | F236 | FF1E | F036 | 9A1E | 7AA0 | 3EB6 | C483 | A104 |
| 0000040740 | 1EF6 | 060B | 1EF4 | 0375 | 10E9 | FF00 | F636 | FF1E |
| 0000040760 | F436 | 9A1E | 7AA0 | 3E34 | C483 | B804 | 0001 | 00E9 |
| 0000041000 | 5E00 | 835F | 02ED | E58B | 5D1F | CB4D | 581E | 4590 |
| 0000041020 | 8B55 | 1EEC | D88E | EC81 | 0000 | 5657 | 468B | 0B08 |
| 0000041040 | 0646 | 0375 | 1AE9 | FF00 | 1076 | 76FF | FF0E | 0C76 |
| 0000041060 | 76FF | FF0A | 0876 | 76FF | 9A06 | 9842 | 3E9A | C483 |
| 0000041100 | 8E0C | 8E06 | 2633 | 3E83 | 02AE | 7500 | E903 | 0005 |
| 0000041120 | 739A | FC3E | B83E | 0001 | 00E9 | 5E00 | 835F | 02ED |

THU MAR 14 17:41:20 1991 LBIPMT.DLL PAGE 19, LINE 1063

| | | | | | | | | |
|---|---|---|---|---|---|---|---|---|
| 0000041140 | E58B | 5D1F | CB4D | 581E | 4590 | 8B55 | 1EEC | D88E |
| 0000041160 | EC81 | 0006 | 5657 | 468D | 890A | FA46 | 568C | FFFC |
| 0000041200 | FC76 | 76FF | FFFA | 0876 | 76FF | FF06 | F236 | FF1E |
| 0000041220 | F036 | 9A1E | 3ECC | 3F13 | C483 | 2B0C | 89C0 | FC46 |
| 0000041240 | 4689 | B8FA | 0001 | 00E9 | 5E00 | 835F | 02ED | E58B |
| 0000041260 | 5D1F | CB4D | 581E | 4590 | 8B55 | 1EEC | D88E | EC81 |
| 0000041300 | 0006 | 5657 | 468D | 890A | FA46 | 568C | FFFC | FC76 |
| 0000041320 | 76FF | FFFA | 0876 | 76FF | FF06 | F636 | FF1E | F436 |
| 0000041340 | 9A1E | 3ECC | 3F56 | C483 | 2B0C | 89C0 | FC46 | 4689 |
| 0000041360 | B8FA | 0001 | 00E9 | 5E00 | 835F | 02ED | E58B | 5D1F |
| 0000041400 | CB4D | 581E | 4590 | 8B55 | 1EEC | D88E | EC81 | 0006 |
| 0000041420 | 5657 | 468D | 890A | FA46 | 568C | FFFC | FC76 | 76FF |
| 0000041440 | FFFA | 0876 | 76FF | 9A06 | 50DE | 3FA4 | C483 | 2B08 |
| 0000041460 | 89C0 | FC46 | 4689 | B8FA | 0001 | 00E9 | 5E00 | 835F |
| 0000041500 | 02ED | E58B | 5D1F | CB4D | 581E | 4590 | 8B55 | 1EEC |
| 0000041520 | D88E | EC81 | 0000 | 5657 | 76FF | FF0C | 0A76 | 76FF |
| 0000041540 | FF08 | 0676 | DE9A | 4350 | 8340 | 08C4 | 76FF | FF0C |
| 0000041560 | 0A76 | 76FF | FF08 | 0676 | 36FF | 1EF2 | 36FF | 1EF0 |
| 0000041600 | CC9A | 5F3E | 8340 | 0CC4 | 76FF | FF0C | 0A76 | 76FF |
| 0000041620 | FF08 | 0676 | 36FF | 1EF6 | 36FF | 1EF4 | CC9A | EA3E |
| 0000041640 | 833F | 0CC4 | 01B8 | E900 | 0000 | 5F5E | ED83 | 8B02 |
| 0000041660 | 1FE5 | 4D5D | 1ECB | 9058 | 5545 | EC8B | 8E1E | 81D8 |
| 0000041700 | 06EC | 5700 | 1E56 | A2B8 | 8E31 | 8DD8 | 0A46 | 4689 |
| 0000041720 | 8CFA | FC56 | 76FF | FFFC | FA76 | 76FF | FF08 | 0676 |
| 0000041740 | 089A | 2740 | 8340 | 08C4 | C02B | 4689 | 89FC | FA46 |
| 0000041760 | 5E1F | 835F | 02ED | E58B | 5D1F | CB4D | 581E | 4590 |
| 0000042000 | 8B55 | 1EEC | D88E | EC81 | 0000 | 5657 | 681E | 1F38 |
| 0000042020 | 599A | A358 | 8B40 | D1D8 | 8EE3 | 9006 | 2633 | B7FF |
| 0000042040 | 49C8 | 681E | 1F39 | 269A | D33F | 8340 | 0AC4 | 01B8 |
| 0000042060 | E900 | 0000 | 5F5E | ED83 | 8B02 | 1FE5 | 4D5D | 1ECB |
| 0000042100 | 9058 | 5545 | EC8B | 8E1E | 81D8 | 00EC | 5700 | 1E56 |
| 0000042120 | 3D68 | 9A1F | 5859 | 412C | D88B | E3D1 | 068E | 3390 |
| 0000042140 | FF26 | C8B7 | 1E49 | 3E68 | 9A1F | 3F74 | 40E9 | C483 |
| 0000042160 | B80A | 0001 | 00E9 | 5E00 | 835F | 02ED | E58B | 5D1F |
| 0000042200 | CB4D | 581E | 4590 | 8B55 | 1EEC | D88E | EC81 | 0000 |
| 0000042220 | 5657 | 681E | 1F42 | 599A | 6F58 | 8B41 | D1D8 | 8EE3 |
| 0000042240 | 9006 | 2633 | B7FF | 49C8 | 681E | 1F43 | C29A | 163F |
| 0000042260 | 8341 | 0AC4 | 01B8 | E900 | 0000 | 5F5E | ED83 | 8B02 |
| 0000042300 | 1FE5 | 4D5D | 1ECB | 9058 | 5545 | EC8B | 8E1E | 81D8 |
| 0000042320 | 00EC | 5700 | 1E56 | 87B8 | 8E40 | 1ED8 | 4768 | 9A1F |
| 0000042340 | 5859 | 41B8 | D88B | E3D1 | 068E | 3390 | FF26 | C8B7 |
| 0000042360 | 1E49 | 4868 | 9A1F | 4075 | 4159 | C483 | 1F0A | 5F5E |
| 0000042400 | ED83 | 8B02 | 1FE5 | 4D5D | 1ECB | 9058 | 5545 | EC8B |
| 0000042420 | 8E1E | 81D8 | 06EC | 5700 | 9A56 | 4142 | 41F6 | 468D |
| 0000042440 | 890A | FA46 | 568C | FFFC | FC76 | 76FF | FFFA | 0876 |
| 0000042460 | 76FF | 9A06 | 50DE | 41A2 | C483 | 2B08 | 89C0 | FC46 |
| 0000042500 | 4689 | B8FA | 0001 | 00E9 | 5E00 | 835F | 02ED | E58B |
| 0000042520 | 5D1F | CB4D | 581E | 4590 | 8B55 | 1EEC | D88E | EC81 |
| 0000042540 | 0006 | 5657 | BC9A | 4940 | 8D42 | 0A46 | 4689 | 8CFA |
| 0000042560 | FC56 | 76FF | FFFC | FA76 | 76FF | FF08 | 0676 | 36FF |
| 0000042600 | 1EF2 | 36FF | 1EF0 | CC9A | DC3E | 8341 | 0CC4 | C02B |
| 0000042620 | 4689 | 89FC | FA46 | 01B8 | E900 | 0000 | 5F5E | ED83 |
| 0000042640 | 8B02 | 1FE5 | 4D5D | 1ECB | 9058 | 5545 | EC8B | 8E1E |
| 0000042660 | 81D8 | 06EC | 5700 | 9A56 | 40FF | 429C | 468D | 890A |
| 0000042700 | FA46 | 568C | FFFC | FC76 | 76FF | FFFA | 0876 | 76FF |
| 0000042720 | FF06 | F636 | FF1E | F436 | 9A1E | 3ECC | 4227 | C483 |
| 0000042740 | 2B0C | 89C0 | FC46 | 4689 | B8FA | 0001 | 00E9 | 5E00 |
| 0000042760 | 835F | 02ED | E58B | 5D1F | CB4D | 581E | 4590 | 8B55 |
| 0000043000 | 1EEC | D88E | EC81 | 0000 | 5657 | 859A | DE41 | FF42 |

THU MAR 14 17:41:20 1991 LBIPMT.DLL PAGE 20, LINE 1122

| | | | | | | | | |
|---|---|---|---|---|---|---|---|---|
| 0000043020 | 0C76 | 76FF | FF0A | 0876 | 76FF | 9A06 | 50DE | 42FA |
| 0000043040 | C483 | FF08 | 0C76 | 76FF | FF0A | 0876 | 76FF | FF06 |
| 0000043060 | F236 | FF1E | F036 | 9A1E | 3ECC | 4316 | C483 | FF0C |
| 0000043100 | 0C76 | 76FF | FF0A | 0876 | 76FF | FF06 | F636 | FF1E |
| 0000043120 | F436 | 9A1E | 3ECC | 427A | C483 | B80C | 0001 | 00E9 |
| 0000043140 | 5E00 | 835F | 02ED | E58B | 5D1F | CB4D | 581E | 4590 |
| 0000043160 | 8B55 | 1EEC | D88E | EC81 | 0006 | 5657 | B81E | 4197 |
| 0000043200 | D88E | 468D | 890A | FA46 | 568C | FFFC | FC76 | 76FF |
| 0000043220 | FFFA | 0876 | 76FF | 9A06 | 42BA | 42CD | C483 | 2B08 |
| 0000043240 | 89C0 | FC46 | 4689 | 1FFA | 5F5E | ED83 | 8B02 | 1FE5 |
| 0000043260 | 4D5D | 1ECB | 9058 | 5545 | EC8B | 8E1E | 81D8 | D6EC |
| 0000043300 | 5700 | C756 | FA46 | 0001 | 7E83 | 010A | 0374 | 43E9 |
| 0000043320 | 8300 | 0C7E | 7400 | E903 | 003A | 06FF | 2020 | 46C7 |
| 0000043340 | 4C0A | 8C1F | 0C5E | 3E83 | 2020 | 7C04 | E903 | 0024 |
| 0000043360 | 681E | 1F56 | 099A | C348 | 8343 | 04C4 | 681E | 1F87 |
| 0000043400 | 099A | CF48 | 8343 | 04C4 | 681E | 1FB8 | 099A | E148 |
| 0000043420 | 8343 | 04C4 | 681E | 1FE1 | 76FF | FF1A | 1876 | B09A |
| 0000043440 | FB93 | 8343 | 08C4 | 003D | 7500 | E903 | 001A | 681E |
| 0000043460 | 1FE7 | 76FF | FF1A | 1876 | B09A | 5A93 | 8343 | 08C4 |
| 0000043500 | 003D | 7400 | E903 | 0008 | 46C7 | 01FC | E900 | 0005 |
| 0000043520 | 46C7 | 00FC | C600 | 3286 | 00FF | 068E | 338E | 8326 |
| 0000043540 | B03E | 0002 | 0375 | 54E9 | 9A00 | 30AC | 4458 | 8689 |
| 0000043560 | FF2E | 9689 | FF30 | 868B | FF30 | 860B | FF2E | 0375 |
| 0000043600 | 1DE9 | FF00 | 30B6 | FFFF | 2EB6 | 1EFF | ED68 | 8D1F |
| 0000043620 | 3286 | 16FF | 9A50 | 97CE | 43B7 | C483 | E90C | 0018 |
| 0000043640 | 069A | 7330 | 5044 | 681E | 1FF3 | 868D | FF32 | 5016 |
| 0000043660 | CE9A | 2C97 | 8344 | 0AC4 | 46C7 | 00FA | 8E00 | 8E06 |
| 0000043700 | 2633 | 3E83 | 02B4 | 7500 | E903 | 0077 | 599A | 9C58 |
| 0000043720 | 8944 | 2E86 | FFFF | 2EB6 | 9AFF | 5896 | 44CE | C483 |
| 0000043740 | 8902 | 2A86 | 89FF | 2C96 | 8BFF | 2C86 | 0BFF | 2A86 |
| 0000043760 | 75FF | E903 | 0020 | B6FF | FF2E | B6FF | FF2C | B6FF |
| 0000044000 | FF2A | 681E | 1FF9 | 468D | 1696 | 9A50 | 97CE | 44E6 |
| 0000044020 | C483 | E90E | 0015 | B6FF | FF2E | 681E | 2002 | 468D |
| 0000044040 | 1696 | 9A50 | 97CE | 44F9 | C483 | 8D0A | 9646 | 5016 |
| 0000044060 | 868D | FF32 | 5016 | 349A | 6393 | 8344 | 08C4 | 46C7 |
| 0000044100 | 00FA | 8E00 | 9206 | 2633 | 3E83 | 1EE2 | 7F01 | E903 |
| 0000044120 | 003E | 068E | 338E | 8326 | A03E | 0001 | 0375 | 2FE9 |
| 0000044140 | FF00 | 0C76 | 76FF | 1E0A | 0968 | 8D20 | 9646 | 5016 |
| 0000044160 | CE9A | 4697 | 8345 | 0CC4 | 468D | 1696 | 8D50 | 3286 |
| 0000044200 | 16FF | 9A50 | 9334 | 4577 | C483 | C708 | FA46 | 0000 |
| 0000044220 | 068E | 338E | 8326 | A23E | 0001 | 0374 | 09E9 | 8300 |
| 0000044240 | FC7E | 7500 | E903 | 0019 | 76FF | FF10 | 0E76 | 868D |
| 0000044260 | FF32 | 5016 | 349A | A893 | 8345 | 08C4 | 46C7 | 00FA |
| 0000044300 | 8E00 | 8E06 | 2633 | 3E83 | 01A6 | 7400 | E903 | 0009 |
| 0000044320 | 7E83 | 00FC | 0375 | 2FE9 | FF00 | 1276 | 681E | 200D |
| 0000044340 | 468D | 1696 | 9A50 | 97CE | 45BB | C483 | 8D0A | 9646 |
| 0000044360 | 5016 | 868D | FF32 | 5016 | 349A | DE93 | 8345 | 08C4 |
| 0000044400 | 46C7 | 00FA | E900 | 001B | 7E83 | 00FA | 0374 | 12E9 |
| 0000044420 | 1E00 | 1368 | 8D20 | 3286 | 16FF | 9A50 | 9334 | 460A |
| 0000044440 | C483 | 8E08 | 8E06 | 2633 | 3E83 | 01A4 | 7400 | E903 |
| 0000044460 | 0009 | 7E83 | 00FC | 0375 | 2BE9 | FF00 | 1676 | 76FF |
| 0000044500 | 8D14 | 3286 | 16FF | 9A50 | 9334 | 461C | C483 | 1E08 |
| 0000044520 | 1568 | 8D20 | 3286 | 16FF | 9A50 | 9334 | 4656 | C483 |
| 0000044540 | C708 | FA46 | 0000 | 068E | 338E | 8326 | A83E | 0001 |
| 0000044560 | 0374 | 09E9 | 8300 | FC7E | 7500 | E903 | 005C | 7E83 |
| 0000044600 | 00FC | 0375 | 17E9 | FF00 | 1A76 | 76FF | 8D18 | 3286 |
| 0000044620 | 16FF | 9A50 | 9334 | 4670 | C483 | E908 | 002A | 76FF |
| 0000044640 | FF1A | 1876 | 681E | 2018 | 468D | 1696 | 9A50 | 97CE |
| 0000044660 | 4683 | C483 | 8D0C | 9646 | 5016 | 868D | FF32 | 5016 |

THU MAR 14 17:41:20 1991 LBIPMT.DLL PAGE 21, LINE I181

| | | | | | | | | |
|---|---|---|---|---|---|---|---|---|
| 0000044700 | 349A | 9593 | 8346 | 08C4 | 681E | 201D | 868D | FF32 |
| 0000044720 | 5016 | 349A | A993 | 8346 | 08C4 | 868D | FF32 | 5016 |
| 0000044740 | 76FF | FF08 | 0676 | 7A9A | 8F93 | 8344 | 08C4 | 5F5E |
| 0000044760 | ED83 | 8B02 | 1FE5 | 4D5D | 1ECB | 9058 | 5545 | EC8B |
| 0000045000 | 8E1E | 81D8 | 66EC | 5700 | FF56 | 1676 | 76FF | FF14 |
| 0000045020 | 1276 | 76FF | FF10 | 0E76 | 76FF | FF0C | 0A76 | 76FF |
| 0000045040 | FF08 | 0676 | 468D | 169A | 9A50 | 4373 | 46FD | C483 |
| 0000045060 | 8D16 | 9A46 | 5016 | 681E | 2022 | C99A | 3341 | 8345 |
| 0000045100 | 08C4 | 5F5E | ED83 | 8B02 | 1FE5 | 4D5D | 1ECB | 9058 |
| 0000045120 | 5545 | EC8B | 8E1E | 81D8 | 66EC | 5700 | FF56 | 1676 |
| 0000045140 | 76FF | FF14 | 1276 | 76FF | FF10 | 0E76 | 76FF | FF0C |
| 0000045160 | 0A76 | 76FF | FF08 | 0676 | 468D | 169A | 9A50 | 4373 |
| 0000045200 | 4751 | C483 | 8D16 | 9A46 | 5016 | 681E | 2025 | 149A |
| 0000045220 | EC42 | 8346 | 08C4 | 5F5E | ED83 | 8B02 | 1FE5 | 4D5D |
| 0000045240 | 1ECB | 9058 | 5545 | EC8B | 8E1E | 81D8 | 66EC | 5700 |
| 0000045260 | FF56 | 1676 | 76FF | FF14 | 1276 | 76FF | FF10 | 0E76 |
| 0000045300 | 76FF | FF0C | 0A76 | 76FF | FF08 | 0676 | 468D | 169A |
| 0000045320 | 9A50 | 4373 | 47A5 | C483 | 8D16 | 9A46 | 5016 | 681E |
| 0000045340 | 2028 | 679A | 4042 | 8347 | 08C4 | 5F5E | ED83 | 8B02 |
| 0000045360 | 1FE5 | 4D5D | 1ECB | 9058 | 5545 | EC8B | 8E1E | 81D8 |
| 0000045400 | 66EC | 5700 | FF56 | 1676 | 76FF | FF14 | 1276 | 76FF |
| 0000045420 | FF10 | 0E76 | 76FF | FF0C | 0A76 | 76FF | FF08 | 0676 |
| 0000045440 | 468D | 169A | 9A50 | 4373 | 47F9 | C483 | 8D16 | 9A46 |
| 0000045460 | 5016 | 681E | 202B | 2C9A | 9443 | 8347 | 08C4 | 5F5E |
| 0000045500 | ED83 | 8B02 | 1FE5 | 4D5D | 1ECB | 9058 | 5545 | EC8B |
| 0000045520 | 8E1E | 81D8 | 06EC | 5700 | 8D56 | 0A46 | 4689 | 8CFA |
| 0000045540 | FC56 | 681E | 202E | 759A | 3D40 | 8348 | 04C4 | 76FF |
| 0000045560 | FFFC | FA76 | 76FF | FF08 | 0676 | 089A | 4940 | 8348 |
| 0000045600 | 08C4 | 681E | 203F | 759A | E840 | 8347 | 04C4 | C02B |
| 0000045620 | 4689 | 89FC | FA46 | 01B8 | E900 | 0000 | 5F5E | ED83 |
| 0000045640 | 8B02 | 1FE5 | 4D5D | 00CB | 581E | 4590 | 8B55 | 1EEC |
| 0000045660 | D88E | EC81 | 0000 | 5657 | B89A | 29A1 | C448 | 065E |
| 0000045700 | 8926 | 0447 | 8926 | 0657 | 5EC4 | 2606 | 07C7 | FFFF |
| 0000045720 | C726 | 0247 | FFFF | 5EC4 | 2606 | 47C7 | FF08 | 26FF |
| 0000045740 | 47C7 | FF0A | C4FF | 065E | 8B26 | 0447 | 8B26 | 0657 |
| 0000045760 | 00E9 | 5E00 | 835F | 02ED | E58B | 5D1F | CB4D | 581E |
| 0000046000 | 4590 | 8B55 | 1EEC | D88E | EC81 | 0000 | 5657 | 5EC4 |
| 0000046020 | 8D06 | 045F | 749A | E0BC | 8D48 | 941E | 9A33 | BFF6 |
| 0000046040 | 48E5 | A89A | EFC2 | 8348 | 08EC | DC8B | D99A | F8BD |
| 0000046060 | 1E48 | 4268 | 9A20 | 4075 | 487B | C483 | 5E0C | 835F |
| 0000046100 | 02ED | E58B | 5D1F | CB4D | 581E | 4590 | 8B55 | 1EEC |
| 0000046120 | D88E | EC81 | 0006 | 5657 | 5EC4 | 260A | 478B | 2604 |
| 0000046140 | 578B | C406 | 065E | 2B26 | 0447 | 1B26 | 0657 | 5689 |
| 0000046160 | 89FC | FA46 | 5E8D | 9AFA | BC70 | 4943 | 1E8D | 3394 |
| 0000046200 | F69A | 48BF | 9A49 | C2A8 | 4952 | EC83 | 8B08 | 9ADC |
| 0000046220 | 8DD9 | 495B | 681E | 2048 | 759A | D740 | 8348 | 0CC4 |
| 0000046240 | 5F5E | ED83 | 8B02 | 1FE5 | 4D5D | 00CB | 581E | 4590 |
| 0000046260 | 8B55 | 1EEC | D88E | EC81 | 0000 | 5657 | 76FF | FF08 |
| 0000046300 | 0676 | 681E | 204E | C29A | 3A3F | 8349 | 08C4 | 01B8 |
| 0000046320 | E900 | 0000 | 5F5E | ED83 | 8B02 | 1FE5 | 4D5D | 1ECB |
| 0000046340 | 9058 | 5545 | EC8B | 8E1E | 81D8 | 00EC | 5700 | FF56 |
| 0000046360 | 0C76 | 76FF | FF0A | 0876 | 76FF | 9A06 | 93B0 | 4989 |
| 0000046400 | C483 | 3D08 | 0001 | C01B | D8F7 | 00E9 | 5E00 | 835F |
| 0000046420 | 02ED | E58B | 5D1F | CB4D | 581E | 4590 | 8B55 | 1EEC |
| 0000046440 | D88E | EC81 | 0000 | 5657 | 76FF | FF08 | 0676 | 681E |
| 0000046460 | 2052 | 629A | FF76 | 8349 | 08C4 | 016A | 2E9A | BE71 |
| 0000046500 | 8349 | 02C4 | 5F5E | ED83 | 8B02 | 1FE5 | 4D5D | 1ECB |
| 0000046520 | 9058 | 5545 | EC8B | 8E1E | 81D8 | 06EC | 5700 | 6A56 |
| 0000046540 | 9A68 | 9076 | 49F5 | C483 | 8902 | FA46 | 5689 | 0BFC |

THU MAR 14 17:41:20 1991 LBIPMT.DLL PAGE 22, LINE 1240

| | | | | | | | | |
|---|---|---|---|---|---|---|---|---|
| 0000046560 | 74D0 | E903 | 0009 | 00B8 | BA00 | 0000 | 1AE9 | 8B00 |
| 0000046600 | FA46 | 568B | C4FC | FA5E | 8926 | 6447 | 8926 | 6657 |
| 0000046620 | 468B | 8BFA | FC56 | 00E9 | 5E00 | 835F | 02ED | E58B |
| 0000046640 | 5D1F | CB4D | 581E | 4590 | 8B55 | 1EEC | D88E | EC81 |
| 0000046660 | 0006 | 5657 | 468B | 8B06 | 0856 | 5EC4 | 260A | 4739 |
| 0000046700 | 7464 | E903 | 0015 | 3926 | 6657 | 0374 | 0CE9 | 1E00 |
| 0000046720 | 5D68 | 9A20 | 49D8 | 4ACB | C483 | C404 | 0A5E | 8B26 |
| 0000046740 | 6447 | 8B26 | 6657 | 4689 | 89FA | FC56 | 5EC4 | 26FA |
| 0000046760 | 478B | 2664 | 578B | C466 | 0A5E | 8926 | 6447 | 8926 |
| 0000047000 | 6657 | 76FF | FFFC | FA76 | 809A | 2490 | 834A | 04C4 |
| 0000047020 | 5F5E | ED83 | 8B02 | 1FE5 | 4D5D | 1ECB | 9058 | 5545 |
| 0000047040 | EC8B | 8E1E | 81D8 | 06EC | 5700 | 6A56 | 9A68 | 9076 |
| 0000047060 | 4A96 | C483 | 8902 | FA46 | 5689 | 0BFC | 74D0 | E903 |
| 0000047100 | 0006 | 00B8 | E900 | 0041 | 468B | 8B0E | 1056 | 8B1E |
| 0000047120 | 8EF0 | C4DA | FA7E | 32B9 | F300 | 1FA5 | 5EC4 | 260A |
| 0000047140 | 478B | 2664 | 578B | C466 | FA5E | 8926 | 6447 | 8926 |
| 0000047160 | 6657 | 468B | 8BFA | FC56 | 5EC4 | 260A | 4789 | 2664 |
| 0000047200 | 5789 | B866 | 0001 | 00E9 | 5E00 | 835F | 02ED | E58B |
| 0000047220 | 5D1F | CB4D | 581E | 4590 | 8B55 | 1EEC | D88E | EC81 |
| 0000047240 | 0000 | 5657 | 468B | 8B06 | 0856 | 5EC4 | 2606 | 4739 |
| 0000047260 | 7464 | E903 | 0009 | 3926 | 6657 | 0375 | 0CE9 | 1E00 |
| 0000047300 | 7A68 | 9A20 | 49D8 | 4B94 | C483 | FF04 | 0876 | 76FF |
| 0000047320 | 9A06 | 9080 | 4AF0 | C483 | 5E04 | 835F | 02ED | E58B |
| 0000047340 | 5D1F | CB4D | 581E | 4590 | 8B55 | 1EEC | D88E | EC81 |
| 0000047360 | 0006 | 5657 | 468B | 8B06 | 0856 | 4689 | 89FA | FC56 |
| 0000047400 | 468B | 8B06 | 0856 | 5EC4 | 26FA | 4739 | 7464 | E903 |
| 0000047420 | 0009 | 3926 | 6657 | 0375 | 17E9 | FF00 | FC76 | 76FF |
| 0000047440 | FFFA | 0876 | 76FF | 9A06 | 4A64 | 4BFB | C483 | E908 |
| 0000047460 | FFCE | 76FF | FF08 | 0676 | 549A | 864B | 834B | 04C4 |
| 0000047500 | 5F5E | ED83 | 8B02 | 1FE5 | 4D5D | 1ECB | 9058 | 5545 |
| 0000047520 | EC8B | 8E1E | 81D8 | 00EC | 5700 | 8B56 | 0646 | 568B |
| 0000047540 | C408 | 0A5E | 3926 | 6447 | 0374 | 15E9 | 2600 | 5739 |
| 0000047560 | 7466 | E903 | 000C | 681E | 209E | D89A | EA49 | 834B |
| 0000047600 | 04C4 | 5EC4 | 260A | 478B | 2664 | 578B | 1E66 | F08B |
| 0000047620 | DA8E | 7EC4 | B90E | 0032 | A5F3 | 5E1F | 835F | 02ED |
| 0000047640 | E58B | 5D1F | CB4D | 581E | 4590 | 8B55 | 1EEC | D88E |
| 0000047660 | EC81 | 0000 | 5657 | 468B | 8B06 | 0856 | 5EC4 | 260A |
| 0000047700 | 4739 | 7464 | E903 | 0015 | 3926 | 6657 | 0374 | 0CE9 |
| 0000047720 | 1E00 | C268 | 9A20 | 49D8 | 4C3D | C483 | C404 | 0A5E |
| 0000047740 | 8B26 | 6447 | 8B26 | 6657 | 4E8B | 8B0E | 105E | 8B1E |
| 0000047760 | 8BF8 | 8EF1 | 8EC2 | B9DB | 0032 | A5F3 | 5E1F | 835F |
| 0000050000 | 02ED | E58B | 5D1F | CB4D | 581E | 4590 | 8B55 | 1EEC |
| 0000050020 | D88E | EC81 | 006A | 5657 | 468B | 8B06 | 0856 | 4689 |
| 0000050040 | 89FA | FC56 | 11E9 | C400 | FA5E | 8B26 | 6447 | 8B26 |
| 0000050060 | 6657 | 4689 | 89FA | FC56 | 468B | 8B06 | 0856 | 5EC4 |
| 0000050100 | 26FA | 4739 | 7464 | E903 | 0009 | 3926 | 6657 | 0375 |
| 0000050120 | 27E9 | 8D00 | 9646 | 5016 | 76FF | FFFC | FA76 | 76FF |
| 0000050140 | FF08 | 0676 | 0B9A | 414C | 834D | 0CC4 | 468D | 1696 |
| 0000050160 | FF50 | 0A5E | C483 | E904 | FFAD | 681E | 20E3 | C29A |
| 0000050200 | 983F | 834C | 04C4 | 5F5E | ED83 | 8B02 | 1FE5 | 4D5D |
| 0000050220 | 1ECB | 9058 | 5545 | EC8B | 8E1E | 81D8 | 72EC | 5700 |
| 0000050240 | 9A56 | 4A0F | 4DE8 | 4689 | 898E | 9056 | D00B | 0374 |
| 0000050260 | 09E9 | B800 | 0000 | 00BA | E900 | 00A7 | 468B | 8B06 |
| 0000050300 | 0856 | 4689 | 89FA | FC56 | 468B | 8B8E | 9056 | 4689 |
| 0000050320 | 89F6 | F856 | 22E9 | C400 | FA5E | 8B26 | 6447 | 8B26 |
| 0000050340 | 6657 | 4689 | 89FA | FC56 | 5EC4 | 26F6 | 478B | 2664 |
| 0000050360 | 578B | 8966 | F646 | 5689 | 8BF8 | 0646 | 568B | C408 |
| 0000050400 | FA5E | 3926 | 6447 | 0374 | 09E9 | 2600 | 5739 | 7566 |
| 0000050420 | E903 | 0046 | 468D | 1692 | FF50 | FC76 | 76FF | FFFA |

THU MAR 14 17:41:20 1991 LBIPMT.DLL PAGE 23, LINE 1299

| | | | | | | | | |
|---|---|---|---|---|---|---|---|---|
| 0000050440 | 0876 | 76FF | 9A06 | 4C0B | 4E01 | C483 | 8D0C | 9246 |
| 0000050460 | 5016 | 76FF | FFF8 | F676 | 76FF | FF90 | 8E76 | DB9A |
| 0000050500 | 274A | 834D | 0CC4 | 003D | 7400 | E903 | 0009 | 00B8 |
| 0000050520 | BA00 | 0000 | 0CE9 | E900 | FF7D | 468B | 8B8E | 9056 |
| 0000050540 | 00E9 | 5E00 | 835F | 02ED | E58B | 5D1F | CB4D | 581E |
| 0000050560 | 4590 | 8B55 | 1EEC | D88E | EC81 | 000A | 5657 | 468B |
| 0000050600 | 8B06 | 0856 | 4689 | 89FA | FC56 | 11E9 | C400 | FA5E |
| 0000050620 | 8B26 | 6447 | 8B26 | 6657 | 4689 | 89FA | FC56 | 468B |
| 0000050640 | 8B06 | 0856 | 5EC4 | 26FA | 4739 | 7464 | E903 | 0009 |
| 0000050660 | 3926 | 6657 | 0375 | 03E9 | E900 | FFD1 | 5EC4 | 260A |
| 0000050700 | 478B | 2664 | 578B | C466 | FA5E | 8926 | 6447 | 8926 |
| 0000050720 | 6657 | 468B | 8B0A | 0C56 | 4689 | 89F6 | F856 | 11E9 |
| 0000050740 | C400 | F65E | 8B26 | 6447 | 8B26 | 6657 | 4689 | 89F6 |
| 0000050760 | F856 | 468B | 8B0A | 0C56 | 5EC4 | 26F6 | 4739 | 7464 |
| 0000051000 | E903 | 0009 | 3926 | 6657 | 0375 | 03E9 | E900 | FFD1 |
| 0000051020 | 468B | 8B06 | 0856 | 5EC4 | 26F6 | 4789 | 2664 | 5789 |
| 0000051040 | FF66 | 0C76 | 76FF | 9A0A | 9080 | 4D64 | C483 | 8B04 |
| 0000051060 | 0646 | 568B | E908 | 0000 | 5F5E | ED83 | 8B02 | 1FE5 |
| 0000051100 | 4D5D | 1ECB | 9058 | 5545 | EC8B | 8E1E | 81D8 | 6AEC |
| 0000051120 | 5700 | 8B56 | 0846 | 460B | 7406 | E903 | 0006 | 00B8 |
| 0000051140 | E900 | 007C | 468B | 8B06 | 0856 | 4689 | 89FA | FC56 |
| 0000051160 | 11E9 | C400 | FA5E | 8B26 | 6447 | 8B26 | 6657 | 4689 |
| 0000051200 | 89FA | FC56 | 468B | 8B06 | 0856 | 5EC4 | 26FA | 4739 |
| 0000051220 | 7464 | E903 | 0009 | 3926 | 6657 | 0375 | 3BE9 | 8D00 |
| 0000051240 | 9646 | 5016 | 76FF | FFFC | FA76 | 76FF | FF08 | 0676 |
| 0000051260 | 0B9A | EA4C | 834E | 0CC4 | 468D | 1696 | FF50 | 0C76 |
| 0000051300 | 76FF | FF0A | 0E5E | C483 | 3D08 | 0000 | 0375 | 06E9 |
| 0000051320 | B800 | 0001 | 09E9 | E900 | FF99 | 00B8 | E900 | 0000 |
| 0000051340 | 5F5E | ED83 | 8B02 | 1FE5 | 4D5D | 1ECB | 9058 | 5545 |
| 0000051360 | EC8B | 8E1E | 81D8 | 06EC | 5700 | 8B56 | 0846 | 460B |
| 0000051400 | 7406 | E903 | 0006 | 00B8 | E900 | 006B | 468B | 8B06 |
| 0000051420 | 0856 | 4689 | 89FA | FC56 | 11E9 | C400 | FA5E | 8B26 |
| 0000051440 | 6447 | 8B26 | 6657 | 4689 | 89FA | FC56 | 468B | 8B06 |
| 0000051460 | 0856 | 5EC4 | 26FA | 4739 | 7464 | E903 | 0009 | 3926 |
| 0000051500 | 6657 | 0375 | 2AE9 | C400 | FA5E | FF26 | 6677 | FF26 |
| 0000051520 | 6477 | 76FF | FF0C | 0A76 | B09A | 7393 | 834F | 08C4 |
| 0000051540 | 003D | 7400 | E903 | 0006 | 01B8 | E900 | 0009 | AAE9 |
| 0000051560 | B8FF | 0000 | 00E9 | 5E00 | 835F | 02ED | E58B | 5D1F |
| 0000051600 | CB4D | 581E | 4590 | 8B55 | 1EEC | D88E | EC81 | 0004 |
| 0000051620 | 5657 | 3E83 | 211E | 7500 | E903 | 003A | 016A | 8B68 |
| 0000051640 | 6850 | FFFF | FF9A | 00FF | 6A00 | 6A00 | 6A00 | 1E00 |
| 0000051660 | E668 | 1E20 | 1C68 | 9A21 | FFFF | 0000 | 003D | 7500 |
| 0000051700 | E903 | 000C | 681E | 20EA | 7F9A | 1B55 | 8350 | 04C4 |
| 0000051720 | 06C7 | 211E | 0000 | 3E83 | 211A | 7400 | E903 | 002D |
| 0000051740 | 681E | 210F | 681E | 9F20 | 681E | 9F26 | 006A | 006A |
| 0000051760 | 006A | 016A | 426A | 006A | 006A | FF9A | 00FF | 8900 |
| 0000052000 | FC46 | 7E83 | 01FC | C01B | D8F7 | 1AA3 | B821 | 0000 |
| 0000052020 | 00E9 | 5E00 | 835F | 02ED | E58B | 5D1F | CB4D | 581E |
| 0000052040 | 4590 | 8B55 | 1EEC | D88E | EC81 | 080A | 5657 | 76FF |
| 0000052060 | FF0C | 0A76 | 76FF | FF08 | 0676 | 868D | FBFA | 5016 |
| 0000052100 | 9C9A | 1D98 | 8351 | 0CC4 | 4689 | FFFA | FA76 | 868D |
| 0000052120 | FBFA | 5016 | 868D | F7F8 | 5016 | 739A | 5C51 | 8351 |
| 0000052140 | 0AC4 | 8689 | F7F6 | 3E83 | 211A | 7500 | E903 | 0031 |
| 0000052160 | 36FF | 9F20 | 868D | F7F8 | 5016 | B6FF | F7F6 | 868D |
| 0000052200 | FBF8 | 5016 | FF9A | 00FF | 8900 | FC46 | 7E83 | 00FC |
| 0000052220 | 0375 | 0CE9 | 1E00 | 2068 | 9A21 | 557F | 505F | C483 |
| 0000052240 | 8B04 | F886 | E9FB | 0000 | 5F5E | ED83 | 8B02 | 1FE5 |
| 0000052260 | 4D5D | 1ECB | 9058 | 5545 | EC8B | 8E1E | 81D8 | 04EC |
| 0000052300 | 5700 | C756 | FC46 | 0000 | 5EC4 | 260A | 3F80 | 7500 |

THU MAR 14 17:41:20 1991 LBIPMT.DLL PAGE 24, LINE 1358

| | | | | | | | | |
|---|---|---|---|---|---|---|---|---|
| 0000052320 | E903 | 003F | 5EC4 | 260A | 3F80 | 740A | E903 | 001B |
| 0000052340 | 5EC4 | FF06 | 0646 | C626 | 0D07 | 5EC4 | FF06 | 0646 |
| 0000052360 | C626 | 0A07 | 4683 | 02FC | 12E9 | C400 | 0A5E | 8A26 |
| 0000052400 | C407 | 065E | 46FF | 2606 | 0788 | 46FF | FFFC | 0A46 |
| 0000052420 | B5E9 | C4FF | 065E | C626 | 0007 | 468B | E9FC | 0000 |
| 0000052440 | 5F5E | ED83 | 8B02 | 1FE5 | 4D5D | 1ECB | 9058 | 5545 |
| 0000052460 | EC8B | 8E1E | 81D8 | 18EC | 5700 | 8E56 | 9806 | 2633 |
| 0000052500 | 82A1 | A301 | 9F24 | 068E | 339A | A126 | 0186 | 22A3 |
| 0000052520 | 8E9F | 9C06 | 2633 | 84A1 | A301 | 9F1E | 068E | 3398 |
| 0000052540 | C726 | 8206 | 0001 | 8E00 | 9A06 | 2633 | 06C7 | 0186 |
| 0000052560 | 0000 | 068E | 339C | C726 | 8406 | 0001 | 8300 | 1C3E |
| 0000052600 | 0021 | 0374 | 06E9 | B800 | 0000 | B7E9 | 6A00 | 6A00 |
| 0000052620 | 8D01 | EE46 | 5016 | 0C6A | FF9A | 00FF | 8900 | E846 |
| 0000052640 | 7E83 | 00E8 | 0374 | 20E9 | 6A00 | 9A00 | FFFF | 0000 |
| 0000052660 | 4689 | 89EA | EC56 | 76FF | FFEC | EA76 | 006A | FF9A |
| 0000052700 | 00FF | 8900 | FA46 | 5689 | 6AFC | 6A00 | 6A01 | 6A00 |
| 0000052720 | 6801 | 5103 | FF68 | FFFF | 1C36 | 6821 | 0100 | 006A |
| 0000052740 | 006A | FF9A | 00FF | 3D00 | 0101 | 0375 | 03E9 | E900 |
| 0000052760 | FFD7 | 24A1 | 8E9F | 9806 | 2633 | 82A3 | A101 | 9F22 |
| 0000053000 | 068E | 339A | A326 | 0186 | 1EA1 | 8E9F | 9C06 | 2633 |
| 0000053020 | 84A3 | 1E01 | 3A68 | 9A21 | 3FC2 | 5292 | C483 | 8304 |
| 0000053040 | E87E | 7400 | E903 | 0016 | 76FF | FFFC | FA76 | FF9A |
| 0000053060 | 00FF | FF00 | EC76 | 76FF | 9AEA | FFFF | 0000 | 00B8 |
| 0000053100 | E900 | 0000 | 5F5E | ED83 | 8B02 | 1FE5 | 4D5D | 1ECB |
| 0000053120 | 9058 | 5545 | EC8B | 8E1E | 81D8 | 00EC | 5700 | 1E56 |
| 0000053140 | 3EB8 | 8E43 | 8BD8 | 0E46 | 30E9 | FF01 | 1276 | 76FF |
| 0000053160 | 6A10 | 6A00 | 6A00 | 6A00 | 6A00 | 6A00 | 6A00 | 9A02 |
| 0000053200 | FFFF | 0000 | 00B8 | BA00 | 0000 | 3EE9 | 8B01 | 0A46 |
| 0000053220 | DFE9 | FF00 | 1276 | 76FF | 6810 | 0105 | 799A | 0053 |
| 0000053240 | 9A00 | 2449 | 538D | 00B8 | BA00 | 0000 | 1CE9 | FF01 |
| 0000053260 | 1276 | 76FF | 6810 | 0101 | 9C9A | 0053 | B800 | 0000 |
| 0000053300 | 00BA | E900 | 0105 | 681E | 213C | 759A | A340 | 8353 |
| 0000053320 | 04C4 | 76FF | FF12 | 1076 | 0268 | 9A01 | 53FA | 0000 |
| 0000053340 | 009A | 0E00 | 8E54 | 9806 | 2633 | 82A1 | A301 | 9F24 |
| 0000053360 | 068E | 339A | A126 | 0186 | 22A3 | 8E9F | 9C06 | 2633 |
| 0000053400 | 84A1 | A301 | 9F1E | 068E | 3398 | C726 | 8206 | 0001 |
| 0000053420 | 8E00 | 9A06 | 2633 | 06C7 | 0186 | 0000 | 068E | 339C |
| 0000053440 | C726 | 8406 | 0001 | B800 | 0000 | 00BA | E900 | 009B |
| 0000053460 | 76FF | FF12 | 1076 | 0468 | 9A01 | 541D | 0000 | 00B8 |
| 0000053500 | BA00 | 0000 | 84E9 | 1E00 | 3E68 | 9A21 | 4075 | 5424 |
| 0000053520 | C483 | FF04 | 1276 | 76FF | 6810 | 0103 | FF9A | 00FF |
| 0000053540 | 9A00 | 17FF | 52DA | 00B8 | BA00 | 0000 | 5CE9 | E900 |
| 0000053560 | 0023 | 012D | 7501 | E903 | FF35 | 7548 | E903 | FF46 |
| 0000053600 | 7548 | E903 | FFC1 | 7548 | E903 | FFA4 | 7548 | E903 |
| 0000053620 | FF01 | 00E9 | E900 | 0016 | 13E9 | 2D00 | 0020 | 0375 |
| 0000053640 | EAE9 | 2DFE | 001B | 0375 | C0E9 | E9FE | 0000 | 76FF |
| 0000053660 | FF12 | 1076 | 76FF | FF0E | 0C76 | 76FF | FF0A | 0876 |
| 0000053700 | 76FF | 9A06 | FFFF | 0000 | 00E9 | 1F00 | 5F5E | ED83 |
| 0000053720 | 8B02 | 1FE5 | 4D5D | 0ECA | 1E00 | 9058 | 5545 | EC8B |
| 0000053740 | 8E1E | 81D8 | 34EC | 5700 | 1E56 | 21B8 | 8E53 | 8BD8 |
| 0000053760 | 0646 | 67E9 | 1E00 | 4068 | 8D21 | CC46 | 5016 | 7A9A |
| 0000054000 | D593 | 8354 | 08C4 | 6FE9 | 1E00 | 5368 | 8D21 | CC46 |
| 0000054020 | 5016 | 7A9A | E993 | 8354 | 08C4 | 5BE9 | 1E00 | 5E68 |
| 0000054040 | 8D21 | CC46 | 5016 | 7A9A | FD93 | 8354 | 08C4 | 47E9 |
| 0000054060 | 1E00 | 6D68 | 8D21 | CC46 | 5016 | 7A9A | 1193 | 8355 |
| 0000054100 | 08C4 | 33E9 | 1E00 | 7468 | 8D21 | CC46 | 5016 | 7A9A |
| 0000054120 | 4493 | 8355 | 08C4 | 1FE9 | E900 | 001C | C00B | 0375 |
| 0000054140 | 92E9 | 48FF | 0375 | A0E9 | 48FF | 0375 | C2E9 | 48FF |
| 0000054160 | 0375 | A8E9 | E9FF | FFCD | 468D | 16CC | 1E50 | 8168 |

THU MAR 14 17:41:20 1991 LBIPMT.DLL PAGE 25, LINE 1417

| | | | | | | | | |
|---|---|---|---|---|---|---|---|---|
| 0000054200 | 9A21 | 3FC2 | 5364 | C483 | FF08 | 1C36 | 9A21 | FFFF |
| 0000054220 | 0000 | 36FF | 9F20 | FF9A | 00FF | 9A00 | 3D37 | 54C1 |
| 0000054240 | 036A | 006A | 006A | 659A | 0050 | B800 | 0000 | 00E9 |
| 0000054260 | 1F00 | 5F5E | ED83 | 8B02 | 1FE5 | 4D5D | 02CA | 1E00 |
| 0000054300 | 9058 | 5545 | EC8B | 8E1E | 81D8 | 18EC | 5700 | 6A56 |
| 0000054320 | 6A00 | 8D01 | EE46 | 5016 | 0C6A | 599A | 0052 | 8900 |
| 0000054340 | E846 | 7E83 | 00E8 | 0374 | 20E9 | 6A00 | 9A00 | 526C |
| 0000054360 | 0000 | 4689 | 89EA | EC56 | 76FF | FFEC | EA76 | 006A |
| 0000054400 | 7F9A | 0052 | 8900 | FA46 | 5689 | 6AFC | 6A00 | 6A01 |
| 0000054420 | 6A00 | FF01 | 0876 | 76FF | 1E06 | A468 | 6A21 | 6A00 |
| 0000054440 | 9A20 | FFFF | 0000 | 7E83 | 00E8 | 0374 | 16E9 | FF00 |
| 0000054460 | FC76 | 76FF | 9AFA | 52EF | 0000 | 76FF | FFEC | EA76 |
| 0000054500 | FA9A | 0052 | B800 | 0000 | 00E9 | 5E00 | 835F | 02ED |
| 0000054520 | E58B | 5D1F | CB4D | 581E | 4590 | 8B55 | 1EEC | D88E |
| 0000054540 | EC81 | 0008 | 5657 | 468D | 16F8 | 9A50 | FFFF | 0000 |
| 0000054560 | 468B | E9F8 | 0J00 | 5F5E | ED83 | 8B02 | 1FE5 | 4D5D |
| 0000054600 | 00CB | 581E | 4590 | 8B55 | 1EEC | D88E | EC81 | 0004 |
| 0000054620 | 5657 | 46C7 | 01FC | E900 | 0003 | 46FF | 83FC | FC7E |
| 0000054640 | 7C0A | E903 | 0046 | 5E8B | C1FC | 02E3 | 878B | 21C4 |
| 0000054660 | 870B | 21C2 | 0375 | 16E9 | 8B00 | FC5E | E3C1 | FF02 |
| 0000054700 | C4B7 | FF21 | C2B7 | 9A21 | 9080 | 5696 | C483 | 1E04 |
| 0000054720 | BD68 | 9A21 | A242 | 555E | C483 | 8B04 | FC5E | E3C1 |
| 0000054740 | 8902 | C287 | 8921 | C497 | E921 | FFAE | 5F5E | ED83 |
| 0000054760 | 8B02 | 1FE5 | 4D5D | 1ECB | 9058 | 5545 | EC8B | 8E1E |
| 0000055000 | 81D8 | 04EC | 5700 | 1E56 | ABB8 | 8E54 | 9AD8 | 5859 |
| 0000055020 | 56E8 | 4689 | 83FC | FC7E | 7D0A | E903 | 0012 | 76FF |
| 0000055040 | 1EFC | EA68 | 9A21 | 4809 | 5714 | C483 | E906 | 005B |
| 0000055060 | 5E8B | C1FC | 02E3 | 878B | 21C4 | 870B | 21C2 | 0375 |
| 0000055100 | 16E9 | 8B00 | FC5E | E3C1 | FF02 | C4B7 | FF21 | C2B7 |
| 0000055120 | 9A21 | 9080 | 5722 | C483 | FF04 | 0876 | 76FF | 9A06 |
| 0000055140 | A242 | 568A | C483 | 8B04 | FC5E | E3C1 | 8902 | C287 |
| 0000055160 | 8921 | C497 | 8B21 | FC5E | E3C1 | 8B02 | C487 | 0B21 |
| 0000055200 | C287 | 7421 | E903 | 0003 | 00E9 | 1F00 | 5F5E | ED83 |
| 0000055220 | 8B02 | 1FE5 | 4D5D | 1ECB | 9058 | 5545 | EC8B | 8E1E |
| 0000055240 | 81D8 | 04EC | 5700 | 1E56 | C9B8 | 8E56 | 9AD8 | 5859 |
| 0000055260 | 5788 | 4689 | 83FC | FC7E | 7D0A | E903 | 0012 | 76FF |
| 0000055300 | 1EFC | 0568 | 9A22 | 4809 | 57B4 | C483 | E906 | 0043 |
| 0000055320 | 5E8B | C1FC | 02E3 | 878B | 21C4 | 870B | 21C2 | 0375 |
| 0000055340 | 16E9 | 8B00 | FC5E | E3C1 | FF02 | C4B7 | FF21 | C2B7 |
| 0000055360 | 9A21 | 9080 | 57C0 | C483 | 1E04 | 2068 | 9A22 | A242 |
| 0000055400 | 56D0 | C483 | 8B04 | FC5E | E3C1 | 8902 | C287 | 8921 |
| 0000055420 | C497 | 1F21 | 5F5E | ED83 | 8B02 | 1FE5 | 4D5D | 1ECB |
| 0000055440 | 9058 | 5545 | EC8B | 8E1E | 81D8 | 04EC | 5700 | 9A56 |
| 0000055460 | 5859 | 5770 | 4689 | 83FC | FC7E | 7E01 | E903 | 000A |
| 0000055500 | 3E83 | 21C0 | 7F01 | E903 | 0006 | 01R8 | E900 | 0003 |
| 0000055520 | 00B8 | E900 | 0000 | 5F5E | ED83 | 8B02 | 1FE5 | 4D5D |
| 0000055540 | 1ECB | 9058 | 5545 | EC8B | 8E1E | 81D8 | 04EC | 5700 |
| 0000055560 | 9A56 | 5859 | 57F2 | 4689 | 83FC | FC7E | 7401 | E903 |
| 0000055600 | 0006 | 01B8 | E900 | 0003 | 00B8 | E900 | 0000 | 5F5E |
| 0000055620 | ED83 | 8B02 | 1FE5 | 4D5D | 1ECB | 9058 | 5545 | EC8B |
| 0000055640 | 8E1E | 81D8 | 08EC | 5700 | 8D56 | F846 | 5016 | 2C9A |
| 0000055660 | 0056 | 8B00 | FA46 | 0639 | 21C0 | 0372 | 06E9 | 8B00 |
| 0000055700 | FA46 | C0A3 | 8B21 | FA46 | 00E9 | 5E00 | 835F | 02ED |
| 0000055720 | E58B | 5D1F | CB4D | 581E | 4590 | 8B55 | 1EEC | D88E |
| 0000055740 | EC81 | 0000 | 5657 | 7E83 | 0A06 | 037D | 08E9 | B800 |
| 0000055760 | 2223 | DA8C | 2CE9 | 8B00 | 065E | E3C1 | 8B02 | C487 |
| 0000056000 | 0B21 | C287 | 7521 | E903 | 0011 | 5E8B | C106 | 02E3 |
| 0000056020 | 878B | 21C2 | 978B | 21C4 | 08E9 | B800 | 2226 | DA8C |
| 0000056040 | 00E9 | 5E00 | 835F | 02ED | E58B | 5D1F | CB4D | 581E |

THU MAR 14 17:41:20 1991 LBIPMT.DLL PAGE 26, LINE 1476

| | | | | | | | | |
|---|---|---|---|---|---|---|---|---|
| 0000056060 | 4590 | 8B55 | 1EEC | D88E | EC81 | 0004 | 5657 | 599A |
| 0000056100 | 1958 | 8959 | FC46 | 7E83 | 0AFC | 037D | 17E9 | FF00 |
| 0000056120 | FC76 | 681E | 2229 | 099A | 3448 | 8358 | 06C4 | 44B8 |
| 0000056140 | 8C22 | E9DA | 002C | 5E8B | C1FC | 02E3 | 878B | 21C4 |
| 0000056160 | 870B | 21C2 | 0375 | 11E9 | 8B00 | FC5E | E3C1 | 8B02 |
| 0000056200 | C287 | 8B21 | C497 | E921 | 0008 | 47B8 | 8C22 | E9DA |
| 0000056220 | 0000 | 5F5E | ED83 | 8B02 | 1FE5 | 4D5D | 00CB | 581E |
| 0000056240 | 4590 | 8B55 | 1EEC | D88E | EC81 | 0004 | 5657 | 539A |
| 0000056260 | 015A | 8959 | FC46 | 003D | 7D00 | E903 | 00A3 | 468B |
| 0000056300 | E9FC | 0079 | 329A | BB5A | 3D59 | 0000 | 0375 | 06E9 |
| 0000056320 | B800 | 0000 | 90E9 | E900 | 0084 | 81E9 | E900 | 007E |
| 0000056340 | 01B8 | E901 | 0081 | 75E9 | B800 | 0102 | 78E9 | E900 |
| 0000056360 | 006C | EC68 | 6803 | 48FC | D89A | 710A | 8359 | 04C4 |
| 0000056400 | 068E | 339E | A326 | 4ADA | 03B8 | E901 | 0059 | 4DE9 |
| 0000056420 | 8E00 | A006 | 2633 | FCA0 | 9848 | 4AE9 | E900 | 003E |
| 0000056440 | 3BE9 | FF00 | FC76 | 681E | 224A | 36FF | 2266 | 36FF |
| 0000056460 | 2264 | 089A | 8776 | 8359 | 0AC4 | 21E9 | 4000 | 073D |
| 0000056500 | 7600 | E903 | FFDD | E0D1 | 2E93 | A7FF | 5A0E | 59E0 |
| 0000056520 | 5984 | 599A | 599D | 59A0 | 59A9 | 59B2 | 59D1 | 4DE9 |
| 0000056540 | B8FF | 0000 | 00E9 | 5E00 | 835F | 02ED | E58B | 5D1F |
| 0000056560 | CB4D | 581E | 4590 | 8B55 | 1EEC | D88E | EC81 | 0000 |
| 0000056600 | 5657 | 01B8 | E900 | 0000 | 5F5E | ED83 | 8B02 | 1FE5 |
| 0000056620 | 4D5D | 1ECB | 9058 | 5545 | EC8B | 8E1E | 81D8 | 22EC |
| 0000056640 | 5700 | 8E56 | A206 | 2633 | 3E83 | 1074 | 7400 | E903 |
| 0000056660 | 000D | 46C7 | FCFA | C748 | FC46 | 59B3 | 1EE9 | 8E00 |
| 0000056700 | A206 | 2633 | 06C7 | 1074 | 0000 | 068E | 33A4 | A126 |
| 0000056720 | 49E8 | FC05 | 8948 | FA46 | 46C7 | A5FC | C75A | E846 |
| 0000056740 | 002E | 46C7 | 7AEA | A15A | 25C4 | 168B | 25C6 | 4689 |
| 0000056760 | 89EC | EE56 | 068E | 33A6 | A326 | 002A | 8926 | 2C16 |
| 0000057000 | 8300 | 5A3E | 0A26 | 0374 | 04E9 | 8300 | EC46 | C40C |
| 0000057020 | EC5E | 8B26 | 2607 | 578B | 8902 | E446 | 5689 | B8E6 |
| 0000057040 | 2296 | D98C | 463B | 74E4 | E903 | 0043 | 4E3B | 74E6 |
| 0000057060 | E903 | 003B | 5EC4 | 26EC | 478B | 2604 | 578B | 8906 |
| 0000057100 | F246 | 5689 | 8BF4 | F446 | 46DB | 74F2 | E903 | 0003 |
| 0000057120 | AEE9 | B803 | 2296 | D98C | 5EC4 | 26F2 | 0739 | 0374 |
| 0000057140 | 0CE9 | 2600 | 4F39 | 7402 | E903 | 0003 | 92E9 | 8103 |
| 0000057160 | 563E | 1226 | 774A | E903 | 0017 | 0EFF | 2656 | 1EC4 |
| 0000057200 | 2656 | 8A26 | 9807 | 068E | 33A8 | A326 | 0028 | 18E9 |
| 0000057220 | FF00 | 6236 | FF22 | 6036 | 9A22 | 89BE | 59F5 | C483 |
| 0000057240 | 8E04 | A806 | 2633 | 28A3 | 8E00 | A806 | 2633 | 3E83 |
| 0000057260 | 0028 | 740A | E903 | 000E | 06FF | 2654 | A126 | 0028 |
| 0000057300 | 4689 | E9E2 | 000B | 068E | 33A8 | A126 | 0028 | 4689 |
| 0000057320 | 83E2 | E27E | 74FF | E903 | 0006 | 00B8 | E900 | 0008 |
| 0000057340 | 068E | 33A8 | A126 | 0028 | 4689 | C4F0 | FA5E | 46FF |
| 0000057360 | 26FA | 0788 | 468B | 8BE4 | E656 | 4689 | 89F6 | F856 |
| 0000057400 | 7E81 | 96E4 | 7F22 | E903 | 00CD | 468B | D1F0 | 03E0 |
| 0000057420 | F646 | 568B | 89F8 | E446 | 5689 | 8BE6 | E446 | 0639 |
| 0000057440 | 25C0 | 0373 | ADE9 | C400 | E45E | 8A26 | 9807 | C88B |
| 0000057460 | E0D1 | C103 | E0C1 | 0502 | 2518 | D98C | 463B | 74EC |
| 0000057500 | E903 | 0090 | 4E3B | 74EE | E903 | 0088 | 5EC4 | 26E4 |
| 0000057520 | 478A | 9801 | C88B | E0D1 | C103 | E0C1 | 0502 | 2518 |
| 0000057540 | D98C | 18BA | 8C25 | 3BDB | 74C2 | E903 | 003B | CB3B |
| 0000057560 | 0374 | 34E9 | FF00 | FA4E | 5EC4 | 26FA | 078A | 8E98 |
| 0000057600 | A806 | 2633 | 28A3 | 3D00 | 000A | 0374 | 04E9 | FF00 |
| 0000057620 | 540E | 8E26 | A806 | 2633 | 28A0 | C400 | 561E | 2626 |
| 0000057640 | 0788 | 06FF | 2656 | 58E9 | C402 | E45E | 8A26 | 0147 |
| 0000057660 | 8B98 | D1C8 | 03E0 | C1C1 | 02E0 | 1805 | 8925 | EC46 |
| 0000057700 | 5E8C | C4EE | E85E | 4683 | 04E8 | 8926 | 2607 | 5F8C |
| 0000057720 | E902 | 022A | B2E9 | 8101 | E47E | 2296 | 037C | A8E9 |

THU MAR 14 17:41:20 1991 LBIPMT.DLL PAGE 27, LINE 1535

| | | | | | | | | | |
|---|---|---|---|---|---|---|---|---|---|
| 0000057740 | B801 | 2296 | 462B | 25E4 | FFFE | 9605 | 8922 | F646 |
| 0000057760 | 5E8C | 89F8 | E446 | 5E8C | 8BE6 | F046 | E0D1 | 4601 |
| 0000060000 | 8BE4 | E446 | 0639 | 25C0 | 0373 | ADE9 | C400 | E45E |
| 0000060020 | 8A26 | 9807 | C88B | E0D1 | C103 | E0C1 | 0502 | 2518 |
| 0000060040 | D98C | 463B | 74EC | E903 | 0090 | 4E3B | 74EE | E903 |
| 0000060060 | 0088 | 5EC4 | 26E4 | 478A | 9801 | C88B | E0D1 | C103 |
| 0000060100 | E0C1 | 0502 | 2518 | D98C | 18BA | 8C25 | 3BDB | 74C2 |
| 0000060120 | E903 | 003B | CB3B | 0374 | 34E9 | FF00 | FA4E | 5EC4 |
| 0000060140 | 26FA | 078A | 8E98 | A806 | 2633 | 28A3 | 3D00 | 000A |
| 0000060160 | 0374 | 04E9 | FF00 | 540E | 8E26 | A806 | 2633 | 28A0 |
| 0000060200 | C400 | 561E | 2626 | 0788 | 06FF | 2656 | 72E9 | C401 |
| 0000060220 | E45E | 8A26 | 0147 | 8B98 | DIC8 | 03E0 | C1C1 | 02E0 |
| 0000060240 | 1805 | 8925 | EC46 | 5E8C | C4EE | E85E | 4683 | 04E8 |
| 0000060260 | 8926 | 2607 | 5F8C | E902 | 0144 | 5E8B | 8AF0 | C887 |
| 0000060300 | 9825 | E0D1 | 4603 | 8BF6 | F856 | 4689 | 89E4 | E656 |
| 0000060320 | 468B | 39E4 | C006 | 7325 | E903 | 00AD | 5EC4 | 26E4 |
| 0000060340 | 078A | 8B98 | DIC8 | 03E0 | C1C1 | 02E0 | 1805 | 8C25 |
| 0000060360 | 3BD9 | EC46 | 0374 | 90E9 | 3B00 | EE4E | 0374 | 88E9 |
| 0000060400 | C400 | E45E | 8A26 | 0147 | 8B98 | DIC8 | 03E0 | C1C1 |
| 0000060420 | 02E0 | 1805 | 8C25 | BAD9 | 2518 | DB8C | C23B | 0374 |
| 0000060440 | 3BE9 | 3B00 | 74CB | E903 | 0034 | 4EFF | C4FA | FA5E |
| 0000060460 | 8A26 | 9807 | 068E | 33A8 | A326 | 0028 | 0A3D | 7400 |
| 0000060500 | E903 | 0004 | 0EFF | 2654 | 068E | 33A8 | A026 | 0028 |
| 0000060520 | 1EC4 | 2656 | 8826 | FF07 | 5606 | E926 | 00A3 | 5EC4 |
| 0000060540 | 26E4 | 478A | 9801 | C88B | E0D1 | C103 | E0C1 | 0502 |
| 0000060560 | 2518 | 4689 | 8CEC | EE5E | 5EC4 | 83E8 | E846 | 2604 |
| 0000060600 | 0789 | 8C26 | 025F | 75E9 | C400 | EC5E | 8B26 | 0447 |
| 0000060620 | 8B26 | 0657 | 4689 | 89EC | EE56 | D00B | 0375 | 29E9 |
| 0000060640 | B800 | 2296 | D98C | 5EC4 | 26EC | 178B | 8B26 | 0277 |
| 0000060660 | 5689 | 89E4 | E676 | D03B | 0374 | 07E9 | 3B00 | 75F1 |
| 0000060700 | E903 | 0006 | 2DE9 | E9FD | 0034 | 4EFF | C4FA | FA5E |
| 0000060720 | 8A26 | 9807 | 068E | 33A8 | A326 | 0028 | 0A3D | 7400 |
| 0000060740 | E903 | 0004 | 0EFF | 2654 | 068E | 33A8 | A026 | 0028 |
| 0000060760 | 1EC4 | 2656 | 8826 | FF07 | 5606 | E926 | 0003 | 0EE9 |
| 0000061000 | 8BFC | E846 | 568B | 83EA | E86E | 3D04 | 002E | 0377 |
| 0000061020 | 64E9 | C401 | FA5E | 4EFF | 26FA | 07C6 | C400 | E85E |
| 0000061040 | 8B26 | 0247 | 0B26 | 7507 | E903 | 011A | 5EC4 | 26E8 |
| 0000061060 | 1FC4 | 8B26 | 0847 | 8B26 | 0A57 | 068E | 33AA | A326 |
| 0000061100 | 49C4 | 8926 | C616 | 0B49 | 75D0 | E903 | 00F8 | C426 |
| 0000061120 | C41E | 2649 | 3F83 | 7F00 | E903 | 00EA | 468B | 8BE8 |
| 0000061140 | EA56 | 068E | 33AC | A326 | 08A0 | 8926 | A216 | 8E08 |
| 0000061160 | AA06 | 2633 | 1EC4 | 49C4 | 8B26 | 801F | 4ABF | 0026 |
| 0000061200 | 0375 | 6DE9 | 6E00 | AA06 | 2633 | IEC4 | 49C4 | 8B26 |
| 0000061220 | F707 | 50D8 | 5EC4 | 26E8 | 1FC4 | FF26 | 0A77 | FF26 |
| 0000061240 | 0877 | 129A | 5C61 | 835B | 06C4 | 7548 | E903 | 0042 |
| 0000061260 | 7E81 | 2EE8 | 7700 | E903 | 0038 | 6E83 | 04E8 | 5EC4 |
| 0000061300 | FFFA | FA4E | 8A26 | 9807 | 068E | 33A8 | A326 | 0028 |
| 0000061320 | 0A3D | 7400 | E903 | 0004 | 0EFF | 2654 | 068E | 33A8 |
| 0000061340 | A026 | 0028 | 1EC4 | 2656 | 8826 | FF07 | 5606 | E926 |
| 0000061360 | FF93 | 5EC4 | 26FA | 078A | A398 | 265A | 468B | 8BE8 |
| 0000061400 | EA56 | 068E | 33AE | A326 | 49E4 | 8926 | E616 | 8B49 |
| 0000061420 | FA46 | FB2D | 8E48 | A406 | 2633 | E8A3 | 2649 | 1E8B |
| 0000061440 | 49E8 | 068E | 33A0 | C626 | FC87 | 0048 | 068E | 33AA |
| 0000061460 | 8B26 | C41E | 2649 | 0683 | 49C4 | 2602 | 068E | 49C6 |
| 0000061500 | 8B26 | E907 | 0101 | 5EC4 | 26FA | 078A | 8E98 | A806 |
| 0000061520 | 2633 | 28A3 | 3D00 | 000A | 0374 | 04E9 | FF00 | 540E |
| 0000061540 | 8E26 | A806 | 2633 | 28A0 | C400 | 561E | 2626 | 0788 |
| 0000061560 | 06FF | 2656 | 8AE9 | 8EFE | A006 | 2633 | 3E80 | 48FC |
| 0000061600 | 7400 | E903 | 0012 | 06C7 | 2656 | 4A12 | 06C7 | 2658 |

THU MAR 14 17:41:20 1991 LBIPMT.DLL PAGE 28, LINE 1594

| | | | | | | | | |
|---|---|---|---|---|---|---|---|---|
| 0000061620 | 6102 | 00B8 | E900 | 00AF | 3E81 | 2656 | 4A12 | 0377 |
| 0000061640 | 17E9 | FF00 | 560E | C426 | 561E | 2626 | 078A | 8E98 |
| 0000061660 | A806 | 2633 | 28A3 | E900 | 0018 | 36FF | 2262 | 36FF |
| 0000061700 | 2260 | BE9A | F589 | 8360 | 04C4 | 068E | 33A8 | A326 |
| 0000061720 | 0028 | 068E | 33A8 | 8326 | 283E | 0A00 | 0374 | 0EE9 |
| 0000061740 | FF00 | 5406 | 2626 | 28A1 | 8900 | DE46 | 0BE9 | 8E00 |
| 0000061760 | A806 | 2633 | 28A1 | 8900 | DE46 | 7E83 | FFDE | 0374 |
| 0000062000 | 05E9 | B000 | E900 | 0008 | 068E | 33A8 | A026 | 0028 |
| 0000062020 | 068E | 33A0 | A226 | 48FC | A398 | 265A | 3E83 | 265A |
| 0000062040 | 7F00 | E903 | 0014 | 36FF | 2266 | 36FF | 2264 | 36FF |
| 0000062060 | 265A | 729A | 6589 | 835F | 06C4 | 46C7 | FCFA | C748 |
| 0000062100 | FC46 | 5A9B | 96E9 | 5EF9 | 835F | 02ED | E58B | 5D1F |
| 0000062120 | CB4D | 581E | 4590 | 8B55 | 1EEC | D88E | EC81 | 0006 |
| 0000062140 | 5657 | 468B | 0B08 | 0646 | 0374 | 06E9 | B800 | 0000 |
| 0000062160 | 2DE9 | C400 | 065E | 8326 | 003F | 0375 | 1BE9 | C400 |
| 0000062200 | 065E | 4683 | 0206 | 468B | 260A | 0739 | 0374 | 06E9 |
| 0000062220 | B800 | 0001 | 09E9 | E900 | FFD9 | 00B8 | E900 | 0000 |
| 0000062240 | 5F5E | ED83 | 8B02 | 1FE5 | 4D5D | 1ECB | 9058 | 5545 |
| 0000062260 | EC8B | 8E1E | 81D8 | 04EC | 5700 | 8156 | 563E | 1226 |
| 0000062300 | 774A | E903 | 0017 | 0EFF | 2656 | 1EC4 | 2656 | 8A26 |
| 0000062320 | 9807 | 068E | 33A8 | A326 | 0028 | 18E9 | FF00 | 6236 |
| 0000062340 | FF22 | 6036 | 9A22 | 89BE | 6085 | C483 | 8E04 | A806 |
| 0000062360 | 2633 | 28A3 | 8E00 | A806 | 2633 | 3E83 | 0028 | 740A |
| 0000062400 | E903 | 000E | 06FF | 2654 | A126 | 0028 | 4689 | E9FC |
| 0000062420 | 000B | 068E | 33A8 | A126 | 0028 | 4689 | 83FC | FC7E |
| 0000062440 | 74FF | E903 | 0006 | 00B8 | E900 | 0008 | 068E | 33A8 |
| 0000062460 | A126 | 0028 | 00E9 | 5E00 | 835F | 02ED | E58B | 5D1F |
| 0000062500 | CB4D | 581E | 4590 | 8B55 | 1EEC | D88E | EC81 | 0000 |
| 0000062520 | 5657 | 36FF | 2266 | 36FF | 2264 | 76FF | 9A06 | 8972 |
| 0000062540 | 61A8 | C483 | 5E06 | 835F | 02ED | E58B | 5D1F | CB4D |
| 0000062560 | 581E | 4590 | 8B55 | 1EEC | D88E | EC81 | 0000 | 5657 |
| 0000062600 | 468B | 8E06 | A806 | 2633 | 28A3 | 3D00 | 000A | 0374 |
| 0000062620 | 04E9 | FF00 | 540E | 8E26 | A806 | 2633 | 28A0 | C400 |
| 0000062640 | 561E | 2626 | 0788 | 06FF | 2656 | 5F5E | ED83 | 8B02 |
| 0000062660 | 1FE5 | 4D5D | 00CB | 581E | 4590 | 8B55 | 1EEC | D88E |
| 0000062700 | EC81 | 006A | 5657 | 76FF | FF08 | 0676 | 468D | 1696 |
| 0000062720 | 9A50 | 937A | 629C | C483 | 9A08 | 4A0F | 62CC | 4689 |
| 0000062740 | 89FA | FC56 | 468B | 0BFC | FA46 | 0374 | 09E9 | B800 |
| 0000062760 | 0000 | 00BA | E900 | 0033 | 468D | 1696 | FF50 | FC76 |
| 0000063000 | 76FF | FFFA | FC76 | 76FF | 9AFA | 4ADB | 6220 | C483 |
| 0000063020 | 3D0C | 0000 | 0374 | 09E9 | B800 | 0000 | 00BA | E900 |
| 0000063040 | 0009 | 468B | 8BFA | FC56 | 00E9 | 5E00 | 835F | 02ED |
| 0000063060 | E58B | 5D1F | CB4D | 581E | 4590 | 8B55 | 1EEC | D88E |
| 0000063100 | EC81 | 0000 | 5657 | 068E | 33B0 | FF26 | 5436 | 6826 |
| 0000063120 | 6316 | FC68 | 6848 | 6050 | 0068 | 1E00 | 5C68 | 9A26 |
| 0000063140 | 4809 | 6294 | C483 | 5E0E | 835F | 02ED | E58B | 5D1F |
| 0000063160 | CB4D | 581E | 4590 | 8B55 | 1EEC | D88E | EC81 | 0072 |
| 0000063200 | 5657 | 068E | 33B2 | 5E8B | 8B06 | D1C3 | 03E3 | D1D8 |
| 0000063220 | 03E3 | D1D8 | 26E3 | 878B | 1276 | 8B26 | 7897 | 8912 |
| 0000063240 | F646 | 5689 | 8BF8 | 085E | C38B | E3D1 | D803 | E3D1 |
| 0000063260 | D803 | E3D1 | 8B26 | 7687 | 2612 | 978B | 1278 | 4689 |
| 0000063300 | 89F2 | F456 | 76FF | FFF4 | F276 | 589A | A794 | 8363 |
| 0000063320 | 04C4 | 4689 | C7FC | FA46 | 0001 | 681E | 2682 | 76FF |
| 0000063340 | FFF8 | F676 | B09A | 2293 | 8363 | 08C4 | 003D | 7400 |
| 0000063360 | E903 | 000E | 468B | 8EFC | B406 | 2633 | 9CA3 | E901 |
| 0000063400 | 044A | 681E | 238C | 76FF | FFF8 | F676 | B09A | F793 |
| 0000063420 | 8363 | 08C4 | 003D | 7400 | E903 | 000E | 468B | 8EFC |
| 0000063440 | B406 | 2633 | 9EA3 | E901 | 0422 | 681E | 269C | 76FF |
| 0000063460 | FFF8 | F676 | B09A | 1F93 | 8364 | 08C4 | 003D | 7400 |

THU MAR 14 17:41:20 1991 LBIPMT.DLL PAGE 29, LINE 1653

| | | | | | | | | |
|---|---|---|---|---|---|---|---|---|
| 0000063500 | E903 | 000E | 468B | 8EFC | B406 | 2633 | 92A3 | E901 |
| 0000063520 | 03FA | 681E | 26A5 | 76FF | FFF8 | F676 | B09A | 4793 |
| 0000063540 | 8364 | 08C4 | 003D | 7400 | E903 | 000E | 468B | 8EFC |
| 0000063560 | B406 | 2633 | 94A3 | E901 | 03D2 | 681E | 26AE | 76FF |
| 0000063600 | FFF8 | F676 | B09A | 6F93 | 8364 | 08C4 | 003D | 7400 |
| 0000063620 | E903 | 000E | 468B | 8EFC | B406 | 2633 | B2A3 | E902 |
| 0000063640 | 03AA | 681E | 26B9 | 76FF | FFF8 | F676 | B09A | 9793 |
| 0000063660 | 8364 | 08C4 | 003D | 7400 | E903 | 000E | 468B | 8EFC |
| 0000063700 | B406 | 2633 | 96A3 | E901 | 0382 | 681E | 26C2 | 76FF |
| 0000063720 | FFF8 | F676 | B09A | BF93 | 8364 | 08C4 | 003D | 7400 |
| 0000063740 | E903 | 000E | 468B | 8EFC | B406 | 2633 | 98A3 | E901 |
| 0000063760 | 035A | 681E | 26CB | 76FF | FFF8 | F676 | B09A | E793 |
| 0000064000 | 8364 | 08C4 | 003D | 7400 | E903 | 000E | 468B | 8EFC |
| 0000064020 | B406 | 2633 | 9AA3 | E901 | 0332 | 681E | 26DA | 76FF |
| 0000064040 | FFF8 | F676 | B09A | 0F93 | 8365 | 08C4 | 003D | 7400 |
| 0000064060 | E903 | 000E | 468B | 8EFC | B406 | 2633 | A0A3 | E901 |
| 0000064100 | 030A | 681E | 26E4 | 76FF | FFF8 | F676 | B09A | 3793 |
| 0000064120 | 8365 | 08C4 | 003D | 7400 | E903 | 000E | 468B | 8EFC |
| 0000064140 | B406 | 2633 | A2A3 | E901 | 02E2 | 681E | 26EE | 76FF |
| 0000064160 | FFF8 | F676 | B09A | 5F93 | 8365 | 08C4 | 003D | 7400 |
| 0000064200 | E903 | 000E | 468B | 8EFC | B406 | 2633 | A4A3 | E901 |
| 0000064220 | 02BA | 681E | 26F8 | 76FF | FFF8 | F676 | B09A | 8793 |
| 0000064240 | 8365 | 08C4 | 003D | 7400 | E903 | 000E | 468B | 8EFC |
| 0000064260 | B406 | 2633 | A6A3 | E901 | 0292 | 681E | 2702 | 76FF |
| 0000064300 | FFF8 | F676 | B09A | AF93 | 8365 | 08C4 | 003D | 7400 |
| 0000064320 | E903 | 000E | 468B | 8EFC | B406 | 2633 | A8A3 | E901 |
| 0000064340 | 026A | 681E | 270D | 76FF | FFF8 | F676 | B09A | D793 |
| 0000064360 | 8365 | 08C4 | 003D | 7400 | E903 | 000E | 468B | 8EFC |
| 0000064400 | B406 | 2633 | AAA3 | E901 | 0242 | 681E | 2714 | 76FF |
| 0000064420 | FFF8 | F676 | B09A | FF93 | 8365 | 08C4 | 003D | 7400 |
| 0000064440 | E903 | 000E | 468B | 8EFC | B406 | 2633 | ACA3 | E901 |
| 0000064460 | 021A | 681E | 2722 | 76FF | FFF8 | F676 | B09A | 8D93 |
| 0000064500 | 8363 | 08C4 | 003D | 7400 | E903 | 0029 | 76FF | FFF4 |
| 0000064520 | F276 | 468D | 168E | 9A50 | 2120 | 662D | C483 | 8D08 |
| 0000064540 | 8E46 | 5016 | 6968 | 6857 | 01AE | 7A9A | CF93 | 8363 |
| 0000064560 | 08C4 | D7E9 | 1E01 | 3268 | FF27 | F876 | 76FF | 9AF6 |
| 0000064600 | 93B0 | 661A | C483 | 3D08 | 0000 | 0374 | 29E9 | FF00 |
| 0000064620 | F476 | 76FF | 8DF2 | 8E46 | 5016 | 209A | 4221 | 8366 |
| 0000064640 | 08C4 | 468D | 168E | 6850 | 6625 | 7668 | 9A02 | 937A |
| 0000064660 | 665D | C483 | E908 | 0194 | 681E | 273D | 76FF | FFF8 |
| 0000064700 | F676 | B09A | AD93 | 8366 | 08C4 | 003D | 7400 | E903 |
| 0000064720 | 000E | 468B | 8EFC | B406 | 2633 | A8A3 | E902 | 016C |
| 0000064740 | 681E | 2746 | 76FF | FFF8 | F676 | B09A | D593 | 8366 |
| 0000064760 | 08C4 | 003D | 7400 | E903 | 000E | 468B | 8EFC | B406 |
| 0000065000 | 2633 | AAA3 | E902 | 0144 | 681E | 274F | 76FF | FFF8 |
| 0000065020 | F676 | B09A | FD93 | 8366 | 08C4 | 003D | 7400 | E903 |
| 0000065040 | 000E | 468B | 8EFC | B406 | 2633 | ACA3 | E902 | 011C |
| 0000065060 | 681E | 2759 | 76FF | FFF8 | F676 | B09A | 2593 | 8367 |
| 0000065100 | 08C4 | 003D | 7400 | E903 | 000E | 468B | 8EFC | B406 |
| 0000065120 | 2633 | B6A3 | E902 | 00F4 | 681E | 276A | 76FF | FFF8 |
| 0000065140 | F676 | B09A | 4D93 | 8367 | 08C4 | 003D | 7400 | E903 |
| 0000065160 | 000E | 468B | 8EFC | B406 | 2633 | AEA3 | E902 | 00CC |
| 0000065200 | 681E | 2773 | 76FF | FFF8 | F676 | B09A | 7593 | 8367 |
| 0000065220 | 08C4 | 003D | 7400 | E903 | 000E | 468B | 8EFC | B406 |
| 0000065240 | 2633 | B0A3 | E902 | 00A4 | 681E | 277D | 76FF | FFF8 |
| 0000065260 | F676 | B09A | 9D93 | 8367 | 08C4 | 003D | 7400 | E903 |
| 0000065300 | 000E | 468B | 8EFC | B406 | 2633 | B4A3 | E902 | 007C |
| 0000065320 | 681E | 2789 | 76FF | FFF8 | F676 | B09A | C593 | 8367 |
| 0000065340 | 08C4 | 003D | 7400 | E903 | 000E | 468B | 8EFC | B406 |

THU MAR 14 17:41:20 1991 LBIPMT.DLL PAGE 30, LINE 1712

| | | | | | | | | |
|---|---|---|---|---|---|---|---|---|
| 0000065360 | 2633 | B8A3 | E902 | 0054 | 681E | 2799 | 76FF | FFF8 |
| 0000065400 | F676 | B09A | 0793 | 8368 | 08C4 | 003D | 7400 | E903 |
| 0000065420 | 000E | 468B | 8EFC | B406 | 2633 | BAA3 | E902 | 002C |
| 0000065440 | 46C7 | 00FA | FF00 | F476 | 76FF | FFF2 | F876 | 76FF |
| 0000065460 | 8EF6 | B006 | 2633 | 36FF | 2654 | 1068 | 6863 | 0000 |
| 0000065500 | 681E | 27A9 | 099A | 7048 | 8366 | 12C4 | 468B | E9FA |
| 0000065520 | 0000 | 5F5E | ED83 | 8B02 | 1FE5 | 4D5D | 1ECB | 9058 |
| 0000065540 | 5545 | EC8B | 8E1E | 81D8 | AEEC | 5701 | C756 | FA46 |
| 0000065560 | 0000 | 06C7 | 2AAC | FFFF | 06C7 | 2AA6 | 0000 | 06C7 |
| 0000065600 | 2AAB | 0000 | 868D | FE64 | 4689 | 8CF6 | F856 | 86C7 |
| 0000065620 | FE62 | 034E | 86C7 | FE64 | 67FB | 4663 | 02F6 | 468B |
| 0000065640 | 8DF6 | F64E | C12B | FE25 | 3DFF | 0000 | 037F | 12E9 |
| 0000065660 | 1E00 | CD68 | 9A27 | 62F6 | 6685 | C483 | B804 | 0001 |
| 0000065700 | 0BE9 | 8B07 | FA46 | 5EC4 | 26F6 | 0789 | 8683 | FE62 |
| 0000065720 | 8E04 | B606 | 2633 | DCA1 | 2649 | 168B | 49DE | 9EC4 |
| 0000065740 | FE62 | 8926 | 2607 | 5789 | 8B02 | FA5E | E3D1 | 878B |
| 0000065760 | 2A14 | 8689 | FE58 | BE81 | FE58 | FC18 | 037E | 03E9 |
| 0000066000 | E900 | 0095 | 3E83 | 2AAC | 7C00 | E903 | 0018 | 5E9A |
| 0000066020 | 7859 | A368 | 2AAC | 3E83 | 2AAC | 7C00 | E903 | 0006 |
| 0000066040 | 06C7 | 2AAC | 0000 | ACA1 | 012A | 5886 | 83FE | 58BE |
| 0000066060 | 00FE | 037D | 0BE9 | 8100 | 58BE | E1FE | 7D00 | E903 |
| 0000066100 | 0003 | 54E9 | 8B00 | 589E | D1FE | 8BE3 | 529F | 8928 |
| 0000066120 | 589E | D1FE | A1E3 | 2AAC | 8739 | 2A66 | 0374 | 3BE9 |
| 0000066140 | C700 | AC06 | FF2A | 8EFF | B806 | 2633 | DAA1 | 264A |
| 0000066160 | 168B | 4ADC | 068E | 33B6 | A326 | 49DC | 8926 | DE16 |
| 0000066200 | 8B49 | 5886 | 89FE | FA46 | 3E83 | 2AA8 | 7F00 | E903 |
| 0000066220 | 0004 | DEFF | 2AA8 | 01E9 | 8BFF | FA5E | E3D1 | 878B |
| 0000066240 | 2A86 | 8689 | FE58 | FE3D | 74FF | E903 | 01D6 | 3E83 |
| 0000066260 | 2AAC | 7C00 | E903 | 0018 | 5E9A | D159 | A368 | 2AAC |
| 0000066300 | 3E83 | 2AAC | 7C00 | E903 | 0006 | 06C7 | 2AAC | 0000 |
| 0000066320 | 068E | 33BA | C726 | DE06 | 444A | 2628 | 1E8C | 4AE0 |
| 0000066340 | 0AE9 | 8E00 | BA06 | 2633 | 0683 | 4ADE | 8E04 | BA06 |
| 0000066360 | 2633 | 1EC4 | 4ADE | 8326 | FF3F | 0374 | 15E9 | 8E00 |
| 0000066400 | BA06 | 2633 | 1EC4 | 4ADE | 468B | 26FA | 4739 | 7502 |
| 0000066420 | E903 | 0003 | CCE9 | 8EFF | BA06 | 2633 | 0683 | 4ADE |
| 0000066440 | 2604 | 1EC4 | 4ADE | 8326 | 003F | 037D | 1AE9 | 8E00 |
| 0000066460 | BA06 | 2633 | 1EC4 | 4ADE | ACA1 | 262A | 0739 | 0374 |
| 0000066500 | 03E9 | E900 | 0003 | CEE9 | 8EFF | BA06 | 2633 | 1EC4 |
| 0000066520 | 4ADE | 8B26 | 0247 | 8689 | FE58 | 003D | 7C00 | E903 |
| 0000066540 | 0122 | 3E83 | 2842 | 7500 | E903 | 0112 | 681E | 27EC |
| 0000066560 | 068E | 33BC | FF26 | 9C36 | 2606 | 36FF | 069A | F09A |
| 0000066600 | 7B75 | 8369 | 08C4 | 068E | 33BE | A326 | 089C | 8926 |
| 0000066620 | 9E16 | 2608 | 9EA1 | 2608 | 060B | 089C | 0374 | 24E9 |
| 0000066640 | 8E00 | BC06 | 2633 | 36FF | 069C | FF26 | 9A36 | 1E06 |
| 0000066660 | EE68 | 1E27 | 3268 | 9A2D | 7608 | 6A41 | C483 | B80C |
| 0000066700 | 0000 | 09E9 | A105 | 2AAA | 8948 | 5686 | E9FE | 0004 |
| 0000066720 | 8EFF | FE56 | BE83 | FE56 | 7D00 | E903 | 008A | 068E |
| 0000066740 | 33C0 | 9E8B | FE56 | E3D1 | 8B26 | A49F | D108 | 8EE3 |
| 0000066760 | C206 | 2633 | 878B | 49E0 | 8689 | FE54 | 681E | 2805 |
| 0000067000 | 868B | FE54 | E0D1 | 4E05 | 6803 | 6AEB | 9A50 | 93B0 |
| 0000067020 | 6B03 | C483 | 3D08 | 0000 | 0375 | 2EE9 | 8B00 | 5486 |
| 0000067040 | FFFE | 5486 | D1FE | 05E0 | 034E | 5B68 | 5068 | 681E |
| 0000067060 | 280A | 068E | 33BE | FF26 | 9E36 | 2608 | 36FF | 089C |
| 0000067100 | 089A | 2076 | 836B | 0CC4 | B1E9 | 1EFF | 0E68 | 8E28 |
| 0000067120 | BE06 | 2633 | 36FF | 089E | FF26 | 9C36 | 9A08 | 7608 |
| 0000067140 | 6B39 | C483 | E908 | FF68 | 068E | 33BE | FF26 | 9E36 |
| 0000067160 | 2608 | 36FF | 089C | 9C9A | 7A74 | 836A | 04C4 | 00B8 |
| 0000067200 | E900 | 044A | BE83 | FE58 | 7400 | E903 | 01EA | A8A1 |
| 0000067220 | E92A | 01C8 | 681E | 2810 | F69A | D062 | 836A | 04C4 |

THU MAR 14 17:41:20 1991 LBIPMT.DLL PAGE 31, LINE 1771

| | | | | | | | | |
|---|---|---|---|---|---|---|---|---|
| 0000067240 | 06FF | 2AA6 | 06C7 | 2AA8 | 0003 | 868D | FE66 | 4639 |
| 0000067260 | 73F6 | E903 | 006B | 5EC4 | 26F6 | 1F8B | E3D1 | 878B |
| 0000067300 | 2A14 | 0005 | 8901 | 5886 | 83FE | 58BE | 00FE | 037D |
| 0000067320 | 32E9 | 8100 | 58BE | E1FE | 7C00 | E903 | 0027 | 9E8B |
| 0000067340 | FE58 | E3D1 | 9F8B | 2852 | E3D1 | BF81 | 2A66 | 0100 |
| 0000067360 | 0374 | 10E9 | 8B00 | 589E | D1FE | 8BE3 | 5287 | 8928 |
| 0000067400 | FA46 | 95E9 | C4FC | F65E | 8B26 | D11F | 8BE3 | 1487 |
| 0000067420 | 892A | 5886 | 83FE | F66E | 8302 | 62AE | 04FE | 89E9 |
| 0000067440 | 83FF | 423E | 0028 | 0375 | 12E9 | 1E01 | 1D68 | 8E28 |
| 0000067460 | BC06 | 2633 | 36FF | 069C | FF26 | 9A36 | 9A06 | 75F0 |
| 0000067500 | 6C39 | C483 | 8E08 | BE06 | 2633 | 9CA3 | 2608 | 1689 |
| 0000067520 | 089E | A126 | 089E | 0B26 | 9C06 | 7408 | E903 | 0024 |
| 0000067540 | 068E | 33BC | FF26 | 9C36 | 2606 | 36FF | 069A | 681E |
| 0000067560 | 281F | 681E | 2D32 | 089A | 8F76 | 836C | 0CC4 | 01B8 |
| 0000067600 | E900 | 034A | 86C7 | FE52 | 0001 | 04E9 | FF00 | 5286 |
| 0000067620 | A1FE | 2AAA | 8639 | FE52 | 037C | 8AE9 | 8E00 | C006 |
| 0000067640 | 8B33 | 529E | D1FE | 26E3 | 9F8B | 08A4 | E3D1 | 068E |
| 0000067660 | 33C2 | 8B26 | E087 | 8949 | 5486 | 1EFE | 3668 | 8B28 |
| 0000067700 | 5486 | D1FE | 05E0 | 034E | AA68 | 506C | B09A | C293 |
| 0000067720 | 836C | 08C4 | 003D | 7500 | E903 | 002E | 868B | FE54 |
| 0000067740 | 86FF | FE54 | E0D1 | 4E05 | 6803 | 6ACA | 1E50 | 3B68 |
| 0000067760 | 8E28 | BE06 | 2633 | 36FF | 089E | FF26 | 9C36 | 9A08 |
| 0000070000 | 7608 | 6CDF | C483 | E90C | FFB1 | 681E | 2B3F | 068E |
| 0000070020 | 33BE | FF26 | 9E36 | 2608 | 36FF | 089C | 089A | F876 |
| 0000070040 | 836C | 08C4 | 66E9 | 8EFF | BE06 | 2633 | 36FF | 089E |
| 0000070060 | FF26 | 9C36 | 9A08 | 749C | 6B5B | C483 | B804 | 0001 |
| 0000070100 | 8BE9 | 8302 | AC3E | 002A | 0374 | 03E9 | E900 | FED1 |
| 0000070120 | 06C7 | 2AAC | FFFF | 90E9 | E9FB | 001C | C00B | 0375 |
| 0000070140 | 31E9 | 48FE | 037D | 0FE9 | 4800 | 037F | 35E9 | 48FE |
| 0000070160 | 0375 | CEE9 | E9FF | 0000 | 3E83 | 2842 | 7500 | E903 |
| 0000070200 | 0022 | 3E81 | 2AAA | 03E8 | 037C | 17E9 | 8B00 | 5886 |
| 0000070220 | 8EFE | C006 | 8B33 | AA1E | D12A | 26E3 | 8789 | 08A4 |
| 0000070240 | 06FF | 2AAA | 9E8B | FE58 | E3D1 | 878B | 2A52 | E0D1 |
| 0000070260 | 4629 | 8BF6 | 6286 | 8BFE | 6496 | 89FE | 5C86 | 89FE |
| 0000070300 | 5E96 | 8BFE | 589E | D1FE | 8BE3 | 5287 | C12A | 02E0 |
| 0000070320 | 8629 | FE62 | 9EC4 | FE62 | 8B26 | 0447 | 8B26 | 0657 |
| 0000070340 | 068E | 33B6 | A326 | 49DC | 8926 | DE16 | 8B49 | 5886 |
| 0000070360 | 89FE | 5A86 | 8BFE | 589E | D1FE | 8BE3 | 3E87 | 892A |
| 0000070400 | 5886 | 8BFE | 589E | D1FE | 8BE3 | 3487 | C42A | F65E |
| 0000070420 | 0326 | 4007 | 8689 | FE60 | BE81 | FE60 | 00E1 | 037C |
| 0000070440 | 1FE9 | 8B00 | 609E | D1FE | 8BE3 | 529F | 8928 | FA5E |
| 0000070460 | E3D1 | 878B | 2A66 | 8603 | FE58 | 003D | 7500 | E903 |
| 0000070500 | 0013 | 9E8B | FE58 | E3D1 | 9F8B | 2A34 | E3D1 | 878B |
| 0000070520 | 2852 | 4689 | 8BFA | 5A86 | E9FE | 014D | 06C7 | 2AA8 |
| 0000070540 | 0000 | 66E9 | C401 | 5C9E | 26FE | 77FF | C4FC | 5C9E |
| 0000070560 | 26FE | 77FF | 2602 | 37FF | 9EC4 | FE5C | FF26 | F877 |
| 0000070600 | D79A | 5D0B | 836E | 08C4 | 40E9 | C401 | 5C9E | 26FE |
| 0000070620 | 37FF | 9EC4 | FE5C | FF26 | F877 | 329A | C763 | 836E |
| 0000070640 | 04C4 | 26E9 | 8E01 | B606 | 2633 | 06C7 | 49DC | 0000 |
| 0000070660 | 18E9 | 8E01 | B606 | 2633 | 06C7 | 49DC | 0001 | 0AE9 |
| 0000070700 | C401 | 5C9E | 26FE | 1F8B | C38B | E3D1 | D803 | E3D1 |
| 0000070720 | D803 | E3D1 | 068E | 33B2 | 8326 | 7EBF | 0212 | 0374 |
| 0000070740 | 39E9 | C400 | 5C9E | 26FE | 1F8B | C38B | E3D1 | D803 |
| 0000070760 | E3D1 | D803 | E3D1 | 068E | 33B2 | FF26 | 78B7 | 2612 |
| 0000071000 | B7FF | 1276 | 769A | 2262 | 836F | 04C4 | 068E | 33B6 |
| 0000071020 | A326 | 49DC | 8926 | DE16 | E949 | 0058 | 9EC4 | FE5C |
| 0000071040 | 8B26 | 8B1F | D1C3 | 03E3 | D1D8 | 03E3 | D1D8 | 8EE3 |
| 0000071060 | B206 | 2633 | BF83 | 127E | 7401 | E903 | 0036 | 9EC4 |
| 0000071100 | FE5C | 8B26 | 8B1F | D1C3 | 03E3 | D1D8 | 03E3 | D1D8 |

THU MAR 14 17:41:20 1991 LBIPMT.DLL PAGE 32, LINE 1830

| | | | | | | | | |
|---|---|---|---|---|---|---|---|---|
| 0000071120 | 8EE3 | B206 | 2633 | B7FF | 127C | FF26 | 7AB7 | 9A12 |
| 0000071140 | 4D51 | 6F51 | C483 | 8E04 | B606 | 2633 | DCA3 | 2649 |
| 0000071160 | 1689 | 49DE | 54E9 | C400 | 5C9E | 26FE | 77FF | 2602 |
| 0000071200 | 37FF | 9EC4 | FE5C | FF26 | FA77 | FF26 | F877 | 2E9A |
| 0000071220 | 004E | 836C | 08C4 | 068E | 33B6 | A326 | 49DC | 8926 |
| 0000071240 | DE16 | E949 | 0025 | 22E9 | 4800 | 3D48 | 0007 | 0376 |
| 0000071260 | 18E9 | D100 | 93E0 | FF2E | 7BA7 | 1C6F | 8B6E | 256F |
| 0000071300 | 4B6E | 656E | 736E | 816E | 376E | E96F | F8CC | 5F5E |
| 0000071320 | ED83 | 8B02 | 1FE5 | 4D5D | 00CB | 0000 | 0000 | 0000 |
| 0000071340 | 0000 | 0000 | 0000 | 0000 | 0000 | 8B55 | 1EEC | B268 |
| 0000071360 | 1E2A | B668 | 9A2A | FFFF | 0000 | 068E | 2AB2 | A126 |
| 0000071400 | 0015 | F2A3 | BB2A | 2ABC | 1F8C | 65BE | 839F | FEE6 |
| 0000071420 | 1E56 | FF9A | 00FF | 0B00 | 74C0 | 3304 | EBC0 | 893A |
| 0000071440 | 0477 | 894E | BA36 | 832A | 03EE | 04C7 | 0001 | 7789 |
| 0000071460 | 8906 | 0877 | C683 | C702 | FE04 | 89FF | 0A77 | 681E |
| 0000071500 | 2AB0 | 681E | 2AAE | FF9A | 00FF | E800 | 0020 | 6E9A |
| 0000071520 | 4372 | E86E | 0066 | 01B8 | 5D00 | 50CB | 2C9A | 1172 |
| 0000071540 | 9A70 | 73A6 | 701F | FF68 | 9A00 | 7135 | 7024 | BB1E |
| 0000071560 | 000D | FF33 | 068E | 2AB0 | FFB9 | 267F | 3D80 | 7500 |
| 0000071600 | 4701 | 8026 | 003D | 3174 | D0BE | 8B2A | 8BD1 | F3CB |
| 0000071620 | 8BA6 | 74CA | 3308 | F2C0 | 74AE | EBE7 | 061C | 071E |
| 0000071640 | F78B | BF1F | 2AF7 | 2CAC | 7241 | C00E | 04ED | AC92 |
| 0000071660 | 412C | 0572 | C20A | EBAA | 1FED | 00C3 | 02BB | 5200 |
| 0000071700 | D48B | A780 | 2AF7 | 50B7 | C48B | 1653 | 1650 | 9A52 |
| 0000071720 | FFFF | 0000 | C00B | 7558 | B110 | 3C40 | 7401 | 3C06 |
| 0000071740 | 7502 | B106 | 0808 | F78F | 4B2A | D679 | E85A | 0026 |
| 0000071760 | 60BE | BF33 | 3360 | 5FE8 | BE01 | 3360 | 68BF | E833 |
| 0000072000 | 0156 | 68B8 | 3D33 | 336C | 0B74 | 016A | 680E | 7107 |
| 0000072020 | 679A | 0055 | C300 | 0E8B | 3356 | 2AE3 | 06C4 | 3358 |
| 0000072040 | C28C | DB33 | 1EFF | 3354 | 0373 | 61E9 | 8E01 | B606 |
| 0000072060 | 262A | 1E8B | 0006 | 754B | C40D | 5C06 | 8C33 | BBC2 |
| 0000072100 | 0003 | 1EFF | 3354 | B8C3 | 6668 | D88E | 07A1 | 0B2D |
| 0000072120 | 75C0 | 0E10 | 82A1 | 0B32 | 75C0 | E805 | 001F | 03EB |
| 0000072140 | 24E8 | 6A00 | 6A03 | 6A00 | 9A00 | 70D1 | 0000 | 8B55 |
| 0000072160 | 33EC | EBC9 | 551A | EC8B | 01B9 | EB00 | 5512 | EC8B |
| 0000072200 | 5756 | 00B9 | EB01 | 5508 | EC8B | 5756 | 01B9 | E801 |
| 0000072220 | 004B | 0A51 | 75C9 | BE12 | 9F5C | 5CBF | E89F | 00B8 |
| 0000072240 | 68BE | BF33 | 336C | AFE8 | BE00 | 336C | 6CBF | E833 |
| 0000072260 | 00A6 | 6CBE | BF33 | 336C | 9DE8 | E800 | 008C | 0A58 |
| 0000072300 | 75E4 | C713 | 0706 | 012D | B800 | 0001 | 8A50 | 0646 |
| 0000072320 | 9A50 | FFFF | 0000 | 4EE8 | 5F00 | 5D5E | 55CB | EC8B |
| 0000072340 | 0D6A | 45E8 | 8325 | 02C4 | 068E | 2AB6 | 6B26 | 061E |
| 0000072360 | 4B00 | 168B | 2D09 | FA83 | 75FF | 8904 | 091E | 392D |
| 0000072400 | 091E | 9F2D | 0D6A | 4BE8 | 8325 | 02C4 | 749E | 6A0A |
| 0000072420 | E80E | 24F6 | C483 | EB02 | 3BC7 | 74D3 | 6A08 | E80E |
| 0000072440 | 2508 | C483 | 5D02 | 55C3 | EC8B | 0D6A | FBE8 | 8324 |
| 0000072460 | 02C4 | 06C7 | 2D09 | FFFF | 0D6A | 17E8 | 8325 | 02C4 |
| 0000072500 | 0E6A | 0FE8 | 8325 | 02C4 | C35D | 0E8B | 3356 | 07E3 |
| 0000072520 | 02BB | FF00 | 541E | C333 | F73B | 0E73 | EF83 | 8B04 |
| 0000072540 | 0B05 | 0245 | F274 | 1DFF | EEEB | 00C3 | 8B55 | B8EC |
| 0000072560 | 00FC | 0E50 | 6FE8 | 8301 | 0E3E | 002D | 0474 | 1EFF |
| 0000072600 | 2D0C | FFB8 | 5000 | E80E | 015C | E58B | CB5D | 02B8 |
| 0000072620 | E900 | FDC7 | 5A59 | DC8B | D82B | 0B72 | FB81 | 0200 |
| 0000072640 | 0572 | E38B | 5152 | 52CB | 3351 | E9CD | FDAD | 14C8 |
| 0000072660 | 0000 | 5657 | FF2B | F78B | 3639 | 2AB0 | 0375 | F0E9 |
| 0000072700 | A100 | 2AB0 | C92B | 4E89 | 89F4 | F646 | 4E89 | 89F8 |
| 0000072720 | FA46 | 0C6A | 76FF | FFFA | F876 | 681E | 2AD0 | 1C9A |
| 0000072740 | E294 | 8372 | 0AC4 | C00B | 1A74 | 8146 | FFFE | 767F |
| 0000072760 | E903 | 00BD | 5EC4 | FFF8 | F846 | 8026 | 003F | EA75 |

THU MAR 14 17:41:20 1991 LBIPMT.DLL PAGE 33, LINE 1889

| | | | | | | | | |
|---|---|---|---|---|---|---|---|---|
| 0000073000 | EB47 | 900D | 5EC4 | FFF8 | F846 | 8026 | 003F | F475 |
| 0000073020 | 5E8B | 26F8 | 3F80 | 7500 | 8DB9 | 0145 | 6A50 | 9A04 |
| 0000073040 | 9910 | 72F1 | C483 | 8904 | F046 | 5689 | 56F2 | 769A |
| 0000073060 | 2790 | 8373 | 02C4 | 4689 | 89FC | FE56 | 468B | 0BF2 |
| 0000073100 | F046 | 6D74 | C28B | 460B | 74FC | 8B66 | F046 | 568B |
| 0000073120 | A3F2 | 2CFD | 1689 | 2CFF | 0C6A | 76FF | FFF6 | F476 |
| 0000073140 | 681E | 2AD0 | 1C9A | 2C94 | 8370 | 0AC4 | C00B | 2C74 |
| 0000073160 | 468B | 8BFC | FE56 | 5EC4 | 83F0 | F046 | 2604 | 0789 |
| 0000073200 | 8926 | 0257 | 5EC4 | FFF4 | F446 | 8A26 | C407 | FC5E |
| 0000073220 | 46FF | 26FC | 0788 | C00A | 0E74 | E8EB | 5EC4 | FFF4 |
| 0000073240 | F446 | 8026 | 003F | F475 | 5EC4 | 26F4 | 3F80 | 7500 |
| 0000073260 | 5EA7 | C95F | 90CB | 8B55 | 56EC | B857 | 7108 | D88E |
| 0000073300 | C08E | 568B | BE06 | 33D8 | 3BAD | 74C2 | 4010 | 7496 |
| 0000073320 | 970C | C033 | FFB9 | F2FF | 8BAE | EBF7 | 96EB | 5E5F |
| 0000073340 | E58B | CA5D | 0002 | 8B55 | 57EC | 76FF | 0E06 | C5E8 |
| 0000073360 | 0BFF | 74C0 | 921F | FA8B | C033 | FFB9 | F2FF | F7AE |
| 0000073400 | 49D1 | 8B50 | BBC4 | 0002 | 1E53 | 5152 | 5016 | 459A |
| 0000073420 | 0051 | 5B00 | 8B5F | 5DE5 | 02CA | 0000 | 1601 | 0202 |
| 0000073440 | 0203 | 1804 | 0D05 | 0906 | 0C07 | 0C08 | 0C09 | 070A |
| 0000073460 | 080B | 160C | 160D | 020F | 0D10 | 1211 | 0212 | 0235 |
| 0000073500 | 0D41 | 0243 | 0D52 | 0D53 | 0D57 | 0B59 | 0D6C | 206D |
| 0000073520 | 1C70 | 0972 | 1606 | 0A80 | 0A81 | 0982 | 0D84 | 0BA4 |
| 0000073540 | 02CE | 0BD7 | 0D00 | 1608 | 8B52 | E8D8 | 2326 | 8E93 |
| 0000073560 | 5AC2 | 8926 | 0247 | 8926 | B817 | FFFF | 8B99 | 5DE5 |
| 0000073600 | E8CB | 0008 | FFB8 | 99FF | E58B | CB5D | D88B | 03E8 |
| 0000073620 | 9323 | C28E | 8926 | 0247 | BB53 | 73DC | 24B9 | 0A00 |
| 0000073640 | 75E4 | 2E1B | 073A | 1674 | 4343 | F7E2 | 133C | 0472 |
| 0000073660 | 243C | 0A76 | 3C43 | 72BC | 3C04 | 76CA | 4301 | 8A2E |
| 0000073700 | 0147 | 5B98 | 8926 | C307 | 8B55 | BBEC | 0002 | 05EB |
| 0000073720 | 8B55 | 33EC | E8DB | 22BC | C303 | CB5D | 04C8 | 0000 |
| 0000073740 | 46C7 | FFFC | C4FF | 065E | F626 | 0A47 | 7440 | 2607 |
| 0000073760 | 47C6 | 000A | 2CEB | C38B | 1A2D | B92D | 000C | F799 |
| 0000074000 | 89F9 | FE46 | E850 | 21D2 | C483 | FF02 | 0876 | 76FF |
| 0000074020 | 9A06 | 74E8 | 7502 | C483 | 8904 | FC46 | 76FF | E8FE |
| 0000074040 | 21C4 | 468B | C9FC | 90CB | 10C8 | 0000 | 5657 | FFBF |
| 0000074060 | 8BFF | 0676 | 44F6 | 830A | 0375 | 97E9 | 1E00 | 9A56 |
| 0000074100 | 7AE6 | 7527 | C483 | 8B04 | 8BF8 | 81DE | 1AEB | 8B2D |
| 0000074120 | FE87 | 892E | FA46 | 561E | 4FE8 | 8303 | 04C4 | 448A |
| 0000074140 | 2A0B | 50E4 | A49A | 428A | 8375 | 02C4 | C00B | 617C |
| 0000074160 | 7E83 | 00FA | 5E74 | 681E | 2D14 | 468D | 16F0 | 9A50 |
| 0000074200 | 937A | 7562 | C483 | 8D08 | F246 | 4689 | 8CFC | FE56 |
| 0000074220 | 7E80 | 5CF0 | 1474 | 681E | 2D16 | 468D | 16F0 | 9A50 |
| 0000074240 | 9334 | 757B | C483 | EB08 | 9004 | 4EFF | 6AFC | FF0A |
| 0000074260 | FE76 | 76FF | FFFC | FA76 | 169A | 8895 | 8375 | 08C4 |
| 0000074300 | 468D | 16F0 | 9A50 | A42E | 72A1 | C483 | 0B04 | 74C0 |
| 0000074320 | BF03 | FFFF | 44C6 | 000A | C78B | 5F5E | CBC9 | 08C8 |
| 0000074340 | 0000 | F29A | CC88 | 8975 | FC46 | 5689 | 0BFE | 75D0 |
| 0000074360 | 2B05 | 99C0 | 37EB | 76FF | 50FE | 76FF | FF0E | 0C76 |
| 0000074400 | 76FF | FF0A | 0876 | 76FF | 9A06 | 78EE | 7604 | C483 |
| 0000074420 | 890E | F846 | 5689 | 8BFA | FC46 | 1A2D | B92D | 000C |
| 0000074440 | F799 | 50F9 | BFE8 | 8B20 | F846 | 568B | C9FA | 90CB |
| 0000074460 | 8B55 | 6AEC | FF40 | 0C76 | 76FF | FF0A | 0876 | 76FF |
| 0000074500 | 9A06 | 759E | 74D4 | CBC9 | 08C8 | 0000 | 5657 | 768B |
| 0000074520 | 8B06 | 2DC6 | 2D1A | 0CB9 | 9900 | F9F7 | 4689 | 50FA |
| 0000074540 | 77E8 | 8320 | 02C4 | 561E | B5E8 | 8303 | 04C4 | F88B |
| 0000074560 | 468D | 160E | FF50 | 0C76 | 76FF | 1E0A | 9A56 | 8408 |
| 0000074600 | 75A5 | C483 | 890C | F846 | 561E | E857 | 040A | C483 |
| 0000074620 | FF06 | FA76 | 4FE8 | 8320 | 02C4 | 468B | 5EF8 | C95F |
| 0000074640 | 90CB | 08C8 | 0000 | B857 | 0001 | E850 | 202C | C483 |

THU MAR 14 17:41:20 1991 LBIPMT.DLL PAGE 34, LINE 1948

| | | | | | | | | |
|---|---|---|---|---|---|---|---|---|
| 0000074660 | 1E02 | 2668 | E82D | 0368 | C483 | 8B04 | 8DF8 | 0A46 |
| 0000074700 | 5016 | 76FF | FF08 | 0676 | 681E | 2D26 | 089A | 4084 |
| 0000074720 | 8376 | 0CC4 | 4689 | 1EF8 | 2668 | 572D | B9E8 | 8303 |
| 0000074740 | 06C4 | 016A | FFE8 | 831F | 02C4 | 468B | 5FF8 | CBC9 |
| 0000074760 | 06C8 | 0000 | 5657 | C02B | E850 | 1FDE | C483 | 8D02 |
| 0000075000 | 0A46 | 5016 | 76FF | FF08 | 0676 | 1ABE | 1E2D | 9A56 |
| 0000075020 | 7BCE | 768F | C483 | 8B0C | 6AF8 | E800 | 1FC8 | C483 |
| 0000075040 | 8B02 | 5EC7 | C95F | 90CB | 8B55 | 56EC | 8B57 | 0676 |
| 0000075060 | 448A | A80A | 7483 | A85F | 7540 | A85B | 7502 | 0C48 |
| 0000075100 | 8801 | 0A44 | FE8B | EF81 | 2D1A | C781 | 2EFA | 0CA8 |
| 0000075120 | 0D75 | 05F6 | 7501 | 1E08 | E856 | 0186 | C483 | 8B04 |
| 0000075140 | 0644 | 0489 | 75FF | FF02 | 0874 | 3350 | 8ADB | 0B5C |
| 0000075160 | 0E53 | 05E8 | 8316 | 08C4 | C00B | 1174 | FF3D | 75FF |
| 0000075200 | 801A | 0A4C | EB20 | 800A | 0A4C | EB20 | 8009 | 0A4C |
| 0000075220 | C710 | 0444 | 0000 | FFB8 | EBFF | 8A25 | F7BF | 802A |
| 0000075240 | 82E7 | FF80 | 7582 | 8A0B | 0A7C | C7F6 | 7582 | 8003 |
| 0000075260 | 200D | 8948 | 0444 | 1CC4 | C033 | 8A26 | 4307 | 1C89 |
| 0000075300 | 5E5F | CB5D | 8B55 | 56EC | 8B57 | 0876 | 448A | A80A |
| 0000075320 | 7482 | A864 | 7540 | C760 | 0444 | 0000 | 01A8 | 0B74 |
| 0000075340 | 10A8 | 5374 | 4C8B | 8906 | 240C | 0CFE | 2402 | 88EF |
| 0000075360 | 0A44 | FE8B | EF81 | 2D1A | C781 | 2EFA | DB33 | 5C8A |
| 0000075400 | A80B | 7508 | A84B | 7504 | F618 | 0105 | 4275 | FE81 |
| 0000075420 | 2D26 | 0674 | FE81 | 2D32 | 2675 | 87F6 | 2AF7 | 7440 |
| 0000075440 | B91F | 0001 | 1651 | 7E8D | 5706 | 0E53 | B3E8 | 8316 |
| 0000075460 | 08C4 | 01B9 | EB00 | B846 | FFFF | 4C80 | 200A | 65EB |
| 0000075500 | 1E53 | E856 | 009C | C483 | 5B04 | 44F6 | 080A | D174 |
| 0000075520 | 0C8B | 548B | 2B06 | 42CA | 1489 | 558B | 4A02 | 5489 |
| 0000075540 | E304 | 5125 | FF51 | 0874 | 74FF | 5306 | E80E | 1672 |
| 0000075560 | C483 | 5908 | 7CC4 | 8B06 | 0656 | 8826 | 3B15 | 75C1 |
| 0000075600 | 33B6 | 8AC0 | 0646 | 1DEB | C033 | 87F6 | 2AF7 | 7420 |
| 0000075620 | B9E3 | 0002 | 5051 | 5350 | E80E | 1292 | C483 | 3308 |
| 0000075640 | 8BC0 | EBC8 | 5FCF | 5D5E | 00CB | 8B55 | 56EC | 768B |
| 0000075660 | 8A04 | 0A44 | 83A8 | 2674 | 08A8 | 2274 | 74FF | FF08 |
| 0000075700 | 0674 | 809A | D290 | 8376 | 04C4 | 6480 | F70A | C033 |
| 0000075720 | 4489 | 8906 | 0344 | 0489 | 4489 | 8902 | 0444 | 5D5E |
| 0000075740 | 00C3 | 8B55 | 56EC | 768B | 8804 | 0200 | 9A50 | 9076 |
| 0000075760 | 7885 | 8B59 | 81DE | 1AEB | 812D | FAC3 | 0B2E | 74D2 |
| 0000076000 | 800B | 0A4C | C708 | 0247 | 0200 | 0EEB | 4C80 | 040A |
| 0000076020 | 47C7 | 0102 | 8C00 | 8DDA | 0147 | 5489 | 8902 | 8904 |
| 0000076040 | 0854 | 4489 | C706 | 0444 | 0000 | 5D5E | 00C3 | 08C8 |
| 0000076060 | 0000 | 5657 | 5EC4 | 260A | 078A | 3D98 | 0077 | 4874 |
| 0000076100 | 0877 | 612C | 4C74 | 112C | 0674 | C02B | E999 | 00CC |
| 0000076120 | F62B | 46C6 | 01FC | 46C7 | 01FE | FF00 | 0A46 | 5EC4 |
| 0000076140 | 260A | 3F80 | 7400 | 835B | FE7E | 7400 | 2655 | 078A |
| 0000076160 | 3D98 | 0074 | 3474 | 0877 | 2B2C | 1C74 | 372C | 3674 |
| 0000076200 | 46C7 | 00FE | EB00 | 90D4 | 01BE | C603 | FC46 | EB02 |
| 0000076220 | 90C5 | 09BE | EB01 | 90F4 | C6F7 | 0002 | E275 | CE83 |
| 0000076240 | 8302 | FEE6 | 46C6 | 80FC | B1EB | C6F7 | C000 | D075 |
| 0000076260 | CE81 | 4000 | A5EB | C6F7 | C000 | C475 | CE81 | 8000 |
| 0000076300 | 99EB | A468 | FF01 | 0E76 | FF56 | 0876 | 76FF | 9A06 |
| 0000076320 | 8B5C | 78B0 | C483 | 890A | FA46 | C00B | 037D | 69E9 |
| 0000076340 | FFFF | 1806 | 8B2D | 107E | C78B | 1A2D | 052D | 2EFA |
| 0000076360 | 4689 | 8AF8 | FC46 | 4588 | 8B0A | F85E | 07C6 | 2B00 |
| 0000076400 | 89C0 | 0445 | 4789 | 8904 | 0245 | 0589 | 4589 | 8908 |
| 0000076420 | 0645 | 468A | 88FA | 0B45 | C78B | DA8C | 5F5E | CBC9 |
| 0000076440 | 8B55 | 56EC | 8B57 | 0476 | DEBB | 8130 | 26FE | 742D |
| 0000076460 | BB09 | 30E2 | FE81 | 2D32 | 5875 | FE8B | EF81 | 2D1A |
| 0000076500 | C781 | 2EFA | 44F6 | 0C0A | 4875 | 05F6 | 7501 | 8B43 |
| 0000076520 | 8B07 | 0257 | C88B | CA0B | 2174 | 4489 | 8906 | 0854 |

THU MAR 14 17:41:20 1991 LBIPMT.DLL PAGE 35, LINE 2007

| | | | | | | | | |
|---|---|---|---|---|---|---|---|---|
| 0000076540 | 0489 | 5489 | C702 | 0444 | 0200 | 45C7 | 0002 | 8002 |
| 0000076560 | 0A4C | C602 | 1105 | 01B8 | EB00 | 5319 | 00B8 | 5002 |
| 0000076600 | 769A | 9290 | 5B79 | 0B5B | 74D2 | 8907 | 8907 | 0257 |
| 0000076620 | C8EB | C033 | 5E5F | C35D | 8B55 | 56EC | 8B57 | 0676 |
| 0000076640 | FE8B | EF81 | 2D1A | C781 | 2EFA | 05F6 | 7410 | 332D |
| 0000076660 | 8ADB | 0B5C | 87F6 | 2AF7 | 7440 | 1E21 | 0E56 | 65E8 |
| 0000076700 | 8300 | 04C4 | 7E83 | 0004 | 1274 | C033 | 0588 | 4589 |
| 0000076720 | 8902 | 8904 | 0244 | 4489 | 8906 | 0844 | 5E5F | C35D |
| 0000076740 | 04C8 | 0000 | 468B | 0B08 | 0646 | 0875 | 006A | A7E8 |
| 0000076760 | EB00 | 9031 | 468B | 2D06 | 2D1A | 0CB9 | 9900 | F9F7 |
| 0000077000 | 4689 | 50FC | D3E8 | 831B | 02C4 | 76FF | FF08 | 0676 |
| 0000077020 | E69A | 2A7A | 837B | 04C4 | 4689 | FFFE | FC76 | C5E8 |
| 0000077040 | 8B1B | FE46 | CBC9 | 02C8 | 0000 | 5657 | FF2B | 768B |
| 0000077060 | 8A06 | 0A44 | C88B | 0324 | 023C | 3F75 | C1F6 | 7508 |
| 0000077100 | 8B0D | 81DE | 1AEB | F62D | FA87 | 012E | 2D74 | 048B |
| 0000077120 | 442B | 8906 | FE46 | C00B | 217E | FF50 | 0874 | 74FF |
| 0000077140 | 8A06 | 0B4C | ED2A | 9A51 | 8EA2 | 7BA7 | C483 | 3908 |
| 0000077160 | FE46 | 0774 | 4C80 | 200A | FFBF | 8BFF | 0644 | 548B |
| 0000077200 | 8908 | 8904 | 0254 | 44C7 | 0004 | 8B00 | 5EC7 | C95F |
| 0000077220 | 90CB | 016A | 01E8 | CB00 | 04C8 | 0000 | 5657 | 1ABE |
| 0000077240 | 2B2D | 89FF | FE7E | 026A | 7FE8 | 831B | 02C4 | 11EB |
| 0000077260 | 46C7 | FFFE | FFFF | FC76 | 2BE8 | 831B | 02C4 | C683 |
| 0000077300 | 390C | DA36 | 7230 | 8B2B | 2DC6 | 2D1A | 0CB9 | 9900 |
| 0000077320 | F9F7 | 4689 | 50FC | 01E8 | 831B | 02C4 | 44F6 | 830A |
| 0000077340 | D374 | 561E | E69A | 437A | 837A | 04C4 | 7440 | 47C1 |
| 0000077360 | C3EB | 026A | 5DE8 | 831B | 02C4 | 7E83 | 0104 | 0475 |
| 0000077400 | C78B | 03EB | 468B | 5EFE | C95F | 02C2 | 9000 | 8B55 |
| 0000077420 | B8EC | 01B4 | 549A | 8872 | 577D | C656 | B846 | 2B00 |
| 0000077440 | 89C0 | E846 | 4689 | C4C6 | 0A5E | 8026 | 003F | 0375 |
| 0000077460 | 5FE9 | 2607 | 1F8A | FF2A | 87F6 | 3181 | 7408 | FF2D |
| 0000077500 | E84E | 468D | 16E8 | FF50 | 0876 | 76FF | E806 | 07C6 |
| 0000077520 | FF50 | 0876 | 76FF | E806 | 07A0 | 46FF | C40A | 0A5E |
| 0000077540 | 8A26 | 2A1F | F6FF | 8187 | 0831 | EE75 | 5E8B | 260A |
| 0000077560 | 3F80 | 7425 | E903 | 06F2 | 46C6 | 00C0 | C02A | 4688 |
| 0000077600 | 88FC | B646 | 4688 | 88F2 | F646 | 4688 | 88EE | 5286 |
| 0000077620 | 2BFE | 89C0 | EA46 | 4689 | 89BA | FE46 | 4689 | 89C4 |
| 0000077640 | C246 | 68EB | 9090 | 46FF | C40A | 0A5E | 8A26 | 2A07 |
| 0000077660 | 8BE4 | F6F8 | 8185 | 0431 | 1A74 | 46FF | 8BBA | FE46 |
| 0000077700 | C88B | E0C1 | 0302 | D1C1 | 03E0 | 2DC7 | 0030 | 4689 |
| 0000077720 | EBFE | 9039 | 6C3D | 7400 | 771C | 3C2D | 744C | 7F13 |
| 0000077740 | 2C1F | 742A | 2C15 | 741C | EB23 | 901D | 46FE | EBFC |
| 0000077760 | 901B | 46FE | FEF6 | F646 | 12EB | 46FE | EBEE | 900D |
| 0000100000 | 4E2C | 0874 | 1A2C | E474 | 86FE | FE52 | BE80 | FE52 |
| 0000100020 | 7400 | 8093 | EE7E | 7500 | C414 | 0E5E | 4683 | 040E |
| 0000100040 | 8B26 | 2607 | 578B | 8902 | F846 | 5689 | C6FA | 5286 |
| 0000100060 | 00FE | 5EC4 | 260A | 078A | 200C | E42A | F88B | FF83 |
| 0000100100 | 746E | 8329 | 63FF | 1674 | FF83 | 747B | 8D11 | E846 |
| 0000100120 | 5016 | 76FF | FF08 | 0676 | BBE8 | EB06 | 900D | 46FF |
| 0000100140 | FFE8 | 0876 | 76FF | E806 | 0662 | F08B | 7E83 | 00BA |
| 0000100160 | 0974 | 7E83 | 00FE | 0375 | 83E9 | 8B05 | E9C7 | 05A0 |
| 0000100200 | 7E83 | 00BA | 0675 | 46FF | FFBA | FE46 | 46C7 | ECBC |
| 0000100220 | 8C30 | BE5E | 23EB | 46C7 | E6BC | EB30 | 90F4 | 46FF |
| 0000100240 | C40A | 0A5E | 5E89 | 8CBC | BE46 | 8026 | 5E3F | 0C75 |
| 0000100260 | 478D | 8901 | BC46 | 468C | FEBE | B64E | 206A | 006A |
| 0000100300 | 468D | 16C8 | 9A50 | A368 | 7AD3 | C483 | 8308 | 7BFF |
| 0000100320 | 0374 | A9E9 | C400 | BC5E | 8026 | 5D3F | 0374 | 9DE9 |
| 0000100340 | C600 | C046 | FF5D | BC46 | 46C6 | 20D3 | 8FE9 | 9000 |
| 0000100360 | 8A26 | 8807 | F446 | 46FF | 3CBC | 752D | 800F | C07E |
| 0000100400 | 7400 | 8B09 | BC5E | 8026 | 5D3F | 1E75 | 5E8A | 88F4 |

THU MAR 14 17:41:20 1991 LBIPMT.DLL PAGE 36, LINE 2066

| | | | | | | | | |
|---|---|---|---|---|---|---|---|---|
| 0000100420 | C05E | 01B0 | CB8A | E180 | C007 | 03EB | FF2A | 568D |
| 0000100440 | 03C8 | D2DA | 36E0 | 0708 | 54EB | 46FF | 26BC | 078A |
| 0000100460 | 4688 | 3AF4 | C046 | 0676 | 4688 | EBF0 | 900D | 468A |
| 0000100500 | 88C0 | F046 | 468A | 88F4 | C046 | 468A | 88C0 | F446 |
| 0000100520 | 1CEB | 5E8A | B0F4 | 8A01 | 80CB | 07E1 | EBC0 | 2A03 |
| 0000100540 | 8DFF | C856 | DA03 | E0D2 | 0836 | FE07 | F446 | 468A |
| 0000100560 | 98F0 | 4E8A | 2AF4 | 3BED | 7DC1 | 88D7 | C06E | 5EC4 |
| 0000100600 | 26BC | 3F80 | 745D | E903 | FF66 | 8026 | 003F | 0375 |
| 0000100620 | FFE9 | 8304 | 7BFF | 0A75 | C38B | C28C | 4689 | 890A |
| 0000100640 | 0C56 | 468B | 8BF8 | FA56 | 8689 | FE54 | 9689 | FE56 |
| 0000100660 | 7E83 | 00BA | 0A74 | 468B | FFFE | FE4E | C00B | 4E74 |
| 0000100700 | FE83 | 74FF | 8B49 | C1DE | 03FB | 468D | 03C8 | 36D8 |
| 0000100720 | 078A | 4632 | 98B6 | 01BA | 8B00 | 8BCE | 80D9 | 07E1 |
| 0000100740 | E2D3 | C285 | 2874 | 7E80 | 00EE | 0E75 | C68B | 5EC4 |
| 0000100760 | FFF8 | F846 | 8826 | EB07 | 9005 | 86FF | FE54 | 46FF |
| 0000101000 | FFE8 | 0876 | 76FF | E806 | 04C2 | F08B | A2EB | 4EFF |
| 0000101020 | 56E8 | 76FF | FF08 | 0676 | DFE8 | 8B04 | F846 | 568B |
| 0000101040 | 39FA | 5486 | 75FE | 3909 | 5696 | 75FE | E903 | 0462 |
| 0000101060 | 7E80 | 00EE | 0374 | 29E9 | FF04 | C646 | FF83 | 7563 |
| 0000101100 | E903 | 041E | C28E | D88B | C626 | 0007 | 13E9 | 9004 |
| 0000101120 | 64BF | 8300 | 2DFE | 0675 | 46FE | EBF2 | 9006 | FE83 |
| 0000101140 | 752B | FF1F | FE4E | 0C75 | 7E83 | 00BA | 0674 | 86FE |
| 0000101160 | FE52 | 0EEB | 46FF | FFE8 | 0876 | 76FF | E806 | 044C |
| 0000101200 | F08B | FE83 | 7430 | E903 | 0155 | 46FF | FFE8 | 0876 |
| 0000101220 | 76FF | E806 | 0436 | F08B | 783C | 0474 | 583C | 1475 |
| 0000101240 | 46FF | FFE8 | 0876 | 76FF | E806 | 0420 | F08B | 78BF |
| 0000101260 | E900 | 012B | 46FF | 83EA | 78FF | 0674 | 6FBF | E900 |
| 0000101300 | 011D | 4EFF | 56E8 | 76FF | FF08 | 0676 | 2BE8 | BE04 |
| 0000101320 | 0030 | 0AE9 | 9001 | 7E80 | 00FC | 0675 | 46FE | BFF6 |
| 0000101340 | 0046 | FE83 | 752D | FE05 | F246 | 08EB | FE83 | 742B |
| 0000101360 | E903 | 00EB | 4EFF | 74FE | E903 | 0095 | 7E83 | 00BA |
| 0000101400 | 0375 | 8CE9 | FE00 | 5286 | E9FE | 00D3 | FF83 | 7478 |
| 0000101420 | 830D | 70FF | 0874 | FF83 | 7446 | E903 | 0084 | 84F6 |
| 0000101440 | 3181 | 7480 | 6A15 | 8D04 | C246 | 5016 | 909A | 7DA4 |
| 0000101460 | 5680 | 79E8 | 8B03 | EBF0 | 9036 | FF83 | 7546 | 832C |
| 0000101500 | EA7E | 7400 | 8326 | 3AFE | 1C75 | 468B | 89C2 | EC46 |
| 0000101520 | C02B | 4689 | 89C4 | C246 | 46C7 | FFEA | BFFF | 0070 |
| 0000101540 | 30BE | EB00 | 900A | 46C7 | 00EA | FE00 | 5286 | 80FE |
| 0000101560 | 52BE | 00FE | 5C75 | 46FF | 8DEA | D044 | 0199 | C246 |
| 0000101600 | 5611 | 83C4 | BA7E | 7400 | FF08 | FE4E | 0375 | 74E9 |
| 0000101620 | FFFF | E846 | 76FF | FF08 | 0676 | 2FE8 | 8B03 | EBF0 |
| 0000101640 | 903E | 84F6 | 3181 | 7404 | 83C2 | 6FFF | 1475 | FE83 |
| 0000101660 | 7D38 | 6AB8 | 8D03 | C246 | 5016 | 909A | 8EA4 | EB80 |
| 0000101700 | 90AE | 006A | 0A6A | 468D | 16C2 | 9A50 | A44C | 7BD7 |
| 0000101720 | 9DEB | 4EFF | 56E8 | 76FF | FF08 | 0676 | 1BE8 | 8003 |
| 0000101740 | 52BE | 00FE | 0375 | 23E9 | 83FF | 70FF | 0F75 | 7E80 |
| 0000101760 | 00F6 | 0974 | 468B | 8BEC | C24E | 4689 | 80C4 | F27E |
| 0000102000 | 7400 | F70A | C25E | 5683 | 00C4 | 5EF7 | 83C4 | 46FF |
| 0000102020 | 0575 | 46C7 | 00EA | 8300 | EA7E | 7500 | E903 | 0272 |
| 0000102040 | 7E80 | 00EE | 0374 | 39E9 | FF02 | C646 | 7E80 | 00F6 |
| 0000102060 | 1474 | 468B | 8BC2 | C456 | 5EC4 | 26F8 | 0789 | 8926 |
| 0000102100 | 0257 | 1DE9 | 9002 | 468B | C4C2 | F85E | 8926 | E907 |
| 0000102120 | 0210 | 468B | 99E8 | 4689 | 89C2 | C456 | CEEB | 868D |
| 0000102140 | FE58 | 4689 | 8CBC | BE56 | FE83 | 752D | 8B13 | 36D8 |
| 0000102160 | 07C6 | 8D2D | 5986 | 89FE | BC46 | 568C | EBBE | 9006 |
| 0000102200 | FE83 | 752B | FF11 | FE4E | 46FF | FFE8 | 0876 | 76FF |
| 0000102220 | E806 | 0238 | F08B | 7E83 | 00BA | 0774 | 7E81 | 5DFE |
| 0000102240 | 7E01 | C72D | FE46 | 015D | 26EB | 468B | FFFE | FE4E |
| 0000102260 | C00B | 2374 | 46FF | 8BEA | C4C6 | BC5E | 46FF | 26BC |

THU MAR 14 17:41:20 1991 LBIPMT.DLL PAGE 37, LINE 2125

| | | | | | | | | |
|---|---|---|---|---|---|---|---|---|
| 0000102300 | 0788 | 46FF | FFE8 | 0876 | 76FF | E806 | 01FE | F08B |
| 0000102320 | 84F6 | 3181 | 7504 | 83D3 | 2EFE | 4375 | 468B | FFFE |
| 0000102340 | FE4E | C00B | 3974 | 5EC4 | FFBC | BC46 | C626 | 2E07 |
| 0000102360 | 18EB | 468B | FFFE | FE4E | C00B | 2374 | 46FF | 8BEA |
| 0000102400 | C4C6 | BC5E | 46FF | 26BC | 0788 | 46FF | FFE8 | 0876 |
| 0000102420 | 76FF | E806 | 01B6 | F08B | 84F6 | 3181 | 7504 | 83D3 |
| 0000102440 | EA7E | 7500 | E903 | 0081 | C68B | 653C | 0474 | 453C |
| 0000102460 | 7775 | 468B | FFFE | FE4E | C00B | 6D74 | 5EC4 | FFBC |
| 0000102500 | BC46 | C626 | 6507 | 46FF | FFE8 | 0876 | 76FF | E806 |
| 0000102520 | 017A | F08B | FE83 | 752D | C40F | BC5E | 46FF | 26BC |
| 0000102540 | 07C6 | EB2D | 9008 | 9090 | FE83 | 752B | 8B35 | FE46 |
| 0000102560 | 4EFF | 0BFE | 75C0 | FF1D | FE46 | 26EB | 468B | FFFE |
| 0000102600 | FE4E | C00B | 2374 | 46FF | 8BEA | C4C6 | BC5E | 46FF |
| 0000102620 | 26BC | 0788 | 46FF | FFE8 | 0876 | 76FF | E806 | 012C |
| 0000102640 | F08B | 84F6 | 3181 | 7504 | FFD3 | E84E | FF56 | 0876 |
| 0000102660 | 76FF | E806 | 0144 | 7E83 | 00EA | 0375 | D3E9 | 8000 |
| 0000102700 | EE7E | 7400 | E903 | 009A | 46FF | C4C6 | BC5E | C626 |
| 0000102720 | 0007 | 868D | FE58 | 5016 | 76FF | FFFA | F876 | 468A |
| 0000102740 | 98F6 | 8E50 | C406 | 2633 | 1EFF | 316A | C483 | EB0A |
| 0000102760 | 9071 | 5EC4 | 260A | 078A | E42A | C63B | 1274 | 4EFF |
| 0000103000 | 56E8 | 76FF | FF08 | 0676 | EFE8 | E900 | 0084 | 9090 |
| 0000103020 | 4EFE | 80B8 | EE7E | 7500 | 8349 | 0E6E | EB04 | 9043 |
| 0000103040 | 632D | 3D00 | 0018 | CA77 | E0D1 | 2E93 | A7FF | 82F0 |
| 0000103060 | 7D40 | 7FA2 | 811E | 811E | 811E | 82B2 | 7F10 | 82B2 |
| 0000103100 | 82B2 | 82B2 | 82B2 | 8112 | 7FA2 | 7F96 | 82B2 | 82B2 |
| 0000103120 | 7D56 | 82B2 | 7FA2 | 82B2 | 82B2 | 7F13 | 82B2 | 82B2 |
| 0000103140 | 7D5E | 46FE | FFB8 | 0A46 | 20EB | 46FF | FFE8 | 0876 |
| 0000103160 | 76FF | E806 | 0056 | F08B | 5EC4 | FF0A | 0A46 | 8A26 |
| 0000103200 | 2A07 | 3BE4 | 74F0 | E903 | FF74 | FE83 | 74FF | E903 |
| 0000103220 | F895 | FE83 | 75FF | 830C | C67E | 7500 | 8006 | B87E |
| 0000103240 | 7400 | 8B05 | C646 | 02EB | C68B | 5F5E | CBC9 | 8B55 |
| 0000103260 | 8BEC | 045E | 87F6 | 3181 | 7404 | 8B05 | EBC3 | 9008 |
| 0000103300 | C38B | DF24 | 072D | C900 | 02C2 | 9000 | 04C8 | 0000 |
| 0000103320 | 5EC4 | 2604 | 4FFF | 7804 | 2615 | 078B | 8B26 | 0257 |
| 0000103340 | FF26 | 8B07 | 8ED8 | 26C2 | 078A | E42A | 07EB | 5306 |
| 0000103360 | E89A | CF76 | C983 | 04C2 | 9000 | 8B55 | 83EC | 087E |
| 0000103400 | 74FF | FF0E | 0676 | 76FF | FF04 | 0876 | 3A9A | EF8A |
| 0000103420 | C97F | 06C2 | 9000 | 8B55 | 56EC | 5EC4 | 2608 | 07FF |
| 0000103440 | 76FF | FF06 | 0476 | A3E8 | 8BFF | F6F0 | 8184 | 0831 |
| 0000103460 | E875 | C95E | 08C2 | 9000 | 8460 | 846B | 8481 | 84B5 |
| 0000103500 | 84E1 | 84E9 | 8512 | 8544 | 8B55 | B8EC | 0171 | E80E |
| 0000103520 | EE42 | 5756 | C033 | 4689 | 88F8 | FB46 | 76C4 | 260A |
| 0000103540 | 89AC | 0A76 | 4688 | 0AFE | 74C0 | 8306 | F87E | 7D00 |
| 0000103560 | 8B06 | F846 | B5E9 | BB04 | 30EE | 202C | 583C | 0577 |
| 0000103600 | 24D7 | EB0F | B002 | B100 | D203 | 02E0 | FB46 | FED7 |
| 0000103620 | D2C1 | 88E8 | FB46 | 8B98 | D1D8 | 2EE3 | A7FF | 83F8 |
| 0000103640 | 568A | B9FE | 0001 | 36E8 | EB04 | 33B1 | 89C0 | F046 |
| 0000103660 | 4689 | 89F6 | EE46 | 46C7 | 20FC | 4800 | 4689 | EBF4 |
| 0000103700 | 8A9B | FE46 | 2D3C | 0675 | 4E80 | 04FC | 8EEB | 2B3C |
| 0000103720 | 0675 | 4E80 | 01FC | 84EB | 203C | 0775 | 4E80 | 02FC |
| 0000103740 | 79E9 | 3CFF | 7523 | 8007 | FC4E | E980 | FF6E | 4E80 |
| 0000103760 | 08FC | 67E9 | 8AFF | FE4E | F980 | 752A | E80F | 035C |
| 0000104000 | C00B | 1779 | D8F7 | 4E80 | 04FC | 0FEB | E980 | 3230 |
| 0000104020 | 8BED | F646 | 0ABB | F700 | 03E3 | 89C1 | F646 | 3BE9 |
| 0000104040 | C7FF | F446 | 0000 | 33E9 | 8AFF | FE4E | F980 | 752A |
| 0000104060 | E80C | 0328 | C00B | 1479 | FFB8 | EBFF | 800F | 30E9 |
| 0000104100 | ED32 | 468B | BBF4 | 000A | E3F7 | C103 | 4689 | E9F4 |
| 0000104120 | FF0A | 468A | 3CFE | 756C | 8006 | FC4E | EB10 | 3C22 |
| 0000104140 | 7546 | 8006 | FC4E | EB20 | 3C18 | 754E | 8006 | FD4E |

THU MAR 14 17:41:20 1991 LBIPMT.DLL PAGE 38, LINE 2184

| | | | | | | | | |
|---|---|---|---|---|---|---|---|---|
| 0000104160 | EB10 | 3C0E | 754C | 8006 | FD4E | EB04 | 8004 | FD4E |
| 0000104200 | E908 | FED8 | 468A | 3CFE | 7564 | E903 | 0194 | 693C |
| 0000104220 | 0375 | 8DE9 | 3C01 | 7575 | E903 | 018A | 583C | 0375 |
| 0000104240 | 89E9 | 3C01 | 7578 | E903 | 0188 | 6F3C | 0375 | A2E9 |
| 0000104260 | 3C01 | 7463 | 3C1A | 7473 | 3C27 | 746E | 3C51 | 7470 |
| 0000104300 | 3C60 | 7445 | 3C07 | 7447 | E903 | 00BB | B5E9 | E800 |
| 0000104320 | 028A | BE8D | FE8F | 0716 | 4FAA | 01B9 | E900 | 01F1 |
| 0000104340 | 90E8 | 0B02 | 75FF | 8C12 | 0BC0 | 75C0 | 1E0C | BF07 |
| 0000104360 | 3147 | 0E8B | 314D | D8E9 | 5701 | 4E8B | E3F4 | 3207 |
| 0000104400 | F2C0 | 75AE | 4F01 | 2B59 | 87F9 | E9CF | 01C3 | 62E8 |
| 0000104420 | 8B02 | F846 | F6AB | FC46 | 7410 | 3303 | ABC0 | 3BE9 |
| 0000104440 | F6FE | FC46 | 7530 | E805 | 0232 | 39EB | 36E8 | F602 |
| 0000104460 | FD46 | 7518 | C630 | FF46 | B907 | 0010 | 0716 | 3352 |
| 0000104500 | 8DD2 | 97BE | BEFE | 0004 | B0E8 | B902 | 0010 | BE8D |
| 0000104520 | FE92 | 3358 | BED2 | 0004 | A0E8 | C602 | 9386 | 3AFE |
| 0000104540 | 09B9 | EB00 | C618 | FF46 | B907 | 0010 | 0716 | D233 |
| 0000104560 | BE8D | FE92 | 04BE | E800 | 0281 | 04B9 | 8D00 | 8FBE |
| 0000104600 | E9FE | 014D | 46FF | 80EE | FC4E | 8A40 | FE46 | 200C |
| 0000104620 | 8B98 | 83F0 | F47E | 7F00 | 7413 | C707 | F446 | 0006 |
| 0000104640 | 0AEB | 673D | 7500 | C705 | F446 | 0001 | BE8D | FE8F |
| 0000104660 | 76FF | FFEE | F476 | 1656 | FF57 | 1076 | 76FF | F60E |
| 0000104700 | FD46 | 7404 | FF0A | 761E | 8331 | 0E46 | EB0A | FF08 |
| 0000104720 | 621E | 8331 | 0E46 | 8308 | 0EC4 | 46F6 | 80FC | 0F74 |
| 0000104740 | 7E83 | 00F4 | 0975 | 5716 | 1EFF | 316E | C483 | 8304 |
| 0000104760 | 67FE | 1075 | 46F7 | 80FC | 7500 | 1609 | FF57 | 661E |
| 0000105000 | 8331 | 04C4 | 0716 | 8026 | 2D3D | 0575 | 8047 | FD4E |
| 0000105020 | B901 | FFFF | B057 | F200 | 4FAE | 2B59 | 87F9 | E9CF |
| 0000105040 | 00AF | 4E80 | 40FC | 46C6 | 0AFA | 35EB | 46C6 | 07FF |
| 0000105060 | 04EB | 46C6 | 27FF | 46F6 | 80FC | 1174 | 46C7 | 02F0 |
| 0000105100 | C600 | F246 | B230 | 0251 | FF56 | 5688 | C6F3 | FA46 |
| 0000105120 | EB10 | F60E | FC46 | 7480 | 8004 | FD4E | C602 | FA46 |
| 0000105140 | F608 | FC46 | 7410 | E805 | 00FB | 0EEB | EDE8 | F600 |
| 0000105160 | FC46 | 7440 | 9903 | 02EB | D233 | 46F6 | 40FC | 0F74 |
| 0000105200 | D20B | 0B7D | 4E80 | 01FD | D8F7 | D283 | F700 | 83DA |
| 0000105220 | F47E | 7D00 | C707 | F446 | 0001 | 04EB | 6680 | F7FC |
| 0000105240 | D88B | DA0B | 0575 | 46C7 | 00F0 | 8D00 | EB7E | 0716 |
| 0000105260 | 4E8A | 32FA | 8BED | F476 | 40E8 | F601 | FD46 | 7402 |
| 0000105300 | E30E | 2606 | 3D80 | 7430 | 4F06 | C626 | 30D5 | EB41 |
| 0000105320 | F600 | FC46 | 7440 | F631 | FD46 | 7401 | C60B | F246 |
| 0000105340 | C72D | F046 | 0001 | 20EB | 46F6 | 01FC | 0B74 | 46C6 |
| 0000105360 | 2BF2 | 46C7 | 01F0 | EB00 | F60F | FC46 | 7402 | C609 |
| 0000105400 | F246 | C720 | F046 | 0001 | 468B | 2BF6 | 2BC1 | F046 |
| 0000105420 | 027D | C033 | 5706 | F651 | FC46 | 750C | 8B07 | B2C8 |
| 0000105440 | E820 | 00BB | 1650 | 8D07 | F27E | 4E8B | E8F0 | 0091 |
| 0000105460 | F658 | FC46 | 7408 | F60D | FC46 | 7504 | 8B07 | B2C8 |
| 0000105500 | E830 | 009B | 5F59 | 5007 | 76E8 | 5800 | 46F6 | 04FC |
| 0000105520 | 0774 | C88B | 20B2 | 86E8 | E900 | FC00 | 76C4 | 260E |
| 0000105540 | 89AD | 0E76 | C4C3 | 0E76 | AD26 | D08B | AD26 | 8992 |
| 0000105560 | 0E76 | F6C3 | FC46 | 7420 | E808 | FFE9 | C28E | F88B |
| 0000105600 | E8C3 | FFD8 | F88B | C00B | 0375 | C08E | 1EC3 | C307 |
| 0000105620 | 0698 | C457 | 065E | FF26 | 044F | 1078 | 8B26 | 263F |
| 0000105640 | 07FF | 8E26 | 0247 | 33AA | 5FC0 | C307 | 5251 | 5306 |
| 0000105660 | 0E50 | 0FE8 | 83EF | 06C4 | 595A | FF3D | 75FF | EBE8 |
| 0000105700 | E3E8 | 8B1B | 01F7 | F84E | 3357 | 26FF | E8AC | FFC0 |
| 0000105720 | F80B | F7E2 | FF0B | 745F | C705 | F846 | FFFF | E3C3 |
| 0000105740 | 0119 | F84E | 3357 | 8AFF | E8C2 | FFA4 | F80B | F7E2 |
| 0000105760 | FF0B | 745F | C705 | F846 | FFFF | FDC3 | 9357 | F60B |
| 0000106000 | 0A7F | DB0B | 0675 | D20B | 0275 | 1AEB | 3392 | F7D2 |
| 0000106020 | 93F1 | F1F7 | 8792 | 04D3 | 3C30 | 7639 | 0203 | FF46 |

THU MAR 14 17:41:20 1991 LBIPMT.DLL PAGE 39, LINE 2243

| | | | | | | | | |
|---|---|---|---|---|---|---|---|---|
| 0000106040 | 8BAA | 4EC2 | D8EB | 2B59 | 47CF | C3FC | 5E5F | E58B |
| 0000106060 | CB5D | 06C8 | 0000 | BE56 | 2D1A | C02B | 4689 | 89FC |
| 0000106100 | FA46 | 026A | E3E8 | 830D | 02C4 | 0CEB | 76FF | E8FE |
| 0000106120 | 0D94 | C483 | 8302 | 0CC6 | 3639 | 30DA | 3B72 | C68B |
| 0000106140 | 1A2D | B92D | 000C | F799 | 89F9 | FE46 | E850 | 0D6A |
| 0000106160 | C483 | F602 | 0A44 | 7583 | C7D3 | 0444 | 0000 | 44C6 |
| 0000106200 | 000A | C02B | 4489 | 8908 | 0644 | 4489 | 8902 | C604 |
| 0000106220 | 0B44 | 89FF | FA76 | 5E8C | 6AFC | E802 | 0DB6 | C483 |
| 0000106240 | 8B02 | FA46 | 568B | 5EFC | CBC9 | 8B55 | BBEC | 2D26 |
| 0000106260 | 06EB | 8B55 | 8BEC | 085E | C38B | 1A2D | 992D | 0CB9 |
| 0000106300 | F700 | 50F1 | E850 | 0D12 | C483 | FF02 | 044F | 0F78 |
| 0000106320 | 07FF | 1FC4 | 468A | 2606 | 4788 | 32FF | EBE4 | 1E0C |
| 0000106340 | FF53 | 0676 | E80E | EDDC | C483 | 5B06 | E853 | 0CF6 |
| 0000106360 | C483 | 5D02 | 00CB | 8B55 | BBEC | 2D1A | 06EB | 8B55 |
| 0000106400 | 8BEC | 065E | C38B | 1A2D | 992D | 0CB9 | F700 | 50F1 |
| 0000106420 | E850 | 0CC6 | C483 | FF02 | 044F | 0C78 | 07FF | 1FC4 |
| 0000106440 | 8A26 | FF47 | E432 | 08EB | 531E | E80E | ECFA | 5B5B |
| 0000106460 | 535B | B1E8 | 830C | 02C4 | CB5D | 04C8 | 0000 | 8B56 |
| 0000106500 | 0676 | 468B | 2D08 | 2D1A | 0CB9 | 9900 | F9F7 | 4689 |
| 0000106520 | 50FE | 85E8 | 830C | 02C4 | 76FF | FF0A | 0876 | 9A56 |
| 0000106540 | 8A3A | 83B3 | C483 | 8906 | FC46 | 76FF | E8FE | 0C76 |
| 0000106560 | C483 | 8B02 | FC46 | C95E | 90CB | 8B55 | 57EC | 8B56 |
| 0000106600 | 0676 | 7E8B | 8308 | FFFE | 1274 | 45F6 | 010A | 1275 |
| 0000106620 | 45F6 | 800A | 0674 | 45F6 | 020A | 0674 | FFB8 | EBFF |
| 0000106640 | 903E | 458B | 0B08 | 0645 | 0875 | 571E | 33E8 | 83EE |
| 0000106660 | 04C4 | 058B | 558B | 3902 | 0645 | 0D75 | 5539 | 7508 |
| 0000106700 | 8308 | 047D | 7500 | FFD5 | FF05 | 0445 | C68B | 0DFF |
| 0000106720 | 1DC4 | 8826 | 8007 | 0A65 | 80EF | 0A4D | 2A01 | 5EE4 |
| 0000106740 | C95F | 90CB | 8B55 | 8BEC | 065E | 1E3B | 2AF5 | 1272 |
| 0000106760 | 09BA | 3300 | E9C0 | E970 | E853 | 0C02 | C483 | E902 |
| 0000107000 | E97F | E853 | 0BEC | C483 | 5302 | 579A | 0055 | 8500 |
| 0000107020 | 75C0 | C6E5 | F787 | 002A | E853 | 0BE2 | C483 | 8B02 |
| 0000107040 | 5DE5 | 00CB | 8B55 | 83EC | 02EC | C033 | 09EB | 8B55 |
| 0000107060 | 83EC | 02EC | FFB8 | 89FF | FE46 | 5E8B | 3B06 | F51E |
| 0000107100 | 722A | BA19 | 0009 | C033 | 1DE9 | 8BE9 | FE4E | C90B |
| 0000107120 | 0774 | E853 | 0BA8 | C483 | E902 | E925 | C00B | 0774 |
| 0000107140 | E853 | 0B8E | C483 | 8302 | 04EC | CC8B | FF53 | 0A76 |
| 0000107160 | 76FF | FF08 | 0C76 | 5116 | FF9A | 00FF | 5900 | 855A |
| 0000107200 | 75C0 | 80C8 | F7A7 | FD2A | 468B | 0BFE | 74C0 | 5307 |
| 0000107220 | 6BE8 | 830B | D2C4 | 8B91 | 5DE5 | 00CB | 8B55 | 83EC |
| 0000107240 | 0EEC | 7E8A | 8B0C | 0E46 | 4689 | EB0C | 5508 | EC8B |
| 0000107260 | EC83 | B70E | FF40 | 0876 | 76FF | 1606 | 568D | 52FE |
| 0000107300 | 8D16 | F856 | 3352 | 52D2 | 8B52 | 0C4E | 99E8 | 8B01 |
| 0000107320 | 0A46 | 00A9 | 7401 | 8008 | 10CA | 00A9 | 7504 | A92A |
| 0000107340 | 0200 | 2274 | CA80 | 5002 | 468D | FFFE | 0876 | 76FF |
| 0000107360 | 1606 | 3350 | 50C0 | 9A50 | FFFF | 0000 | C085 | 7558 |
| 0000107400 | 8B08 | FE4E | 03EB | CA80 | 5101 | 2552 | 0003 | C70A |
| 0000107420 | 3350 | 50C0 | 9A50 | 50BB | 0000 | C00B | 1674 | 6E3D |
| 0000107440 | 7500 | F60E | F0C2 | 02BA | 7400 | BA03 | 0011 | 37E9 |
| 0000107460 | E9E8 | 009D | 468B | 3BFE | F506 | 722A | 500D | CB9A |
| 0000107500 | 008A | BA00 | 0018 | C033 | E4EB | E850 | 0AA4 | C483 |
| 0000107520 | 8B02 | 50D0 | 8D16 | F45E | 1653 | 468D | 50F8 | 909A |
| 0000107540 | 0070 | 0B00 | 75C0 | 8B61 | 0A46 | C933 | 00A9 | 7580 |
| 0000107560 | A90E | 4000 | 0775 | 06F6 | 3151 | 7580 | B102 | 8880 |
| 0000107600 | F24E | 468A | 3CF4 | 7501 | C607 | F446 | E940 | 008F |
| 0000107620 | 023C | 0775 | 46C6 | 08F4 | 84E9 | 3200 | 88C0 | F446 |
| 0000107640 | C90A | F474 | 46F7 | 020A | 7400 | 5274 | FFB9 | 51FF |
| 0000107660 | B951 | 0002 | 1651 | 468D | 50FA | 399A | 008B | 0B00 |
| 0000107700 | 74C0 | 3D15 | 0083 | 0C74 | 76FF | E8FE | 0A30 | C483 |

THU MAR 14 17:41:20 1991 LBIPMT.DLL PAGE 40, LINE 2302

| | | | | | | | | |
|---|---|---|---|---|---|---|---|---|
| 0000107720 | E902 | E7AD | C033 | 47EB | 1652 | 468D | 50F6 | 01B8 |
| 0000107740 | 5000 | 8D16 | F846 | 9A50 | FFFF | 0000 | C00B | 1B75 |
| 0000107760 | 4639 | 74F8 | 802A | F67E | 751A | 5210 | 76FF | FFFC |
| 0000110000 | FA76 | FF9A | 00FF | 0B00 | 75C0 | 52BD | C033 | 5050 |
| 0000110020 | 1650 | 468D | 50FA | 7B9A | 008C | 0B00 | 75C0 | 8AA9 |
| 0000110040 | F44E | C1F6 | 7548 | FF28 | 0876 | 76FF | 1606 | 468D |
| 0000110060 | 50F8 | C033 | 5050 | B89A | 008B | F700 | F846 | 0001 |
| 0000110100 | 0374 | C980 | F710 | 0A46 | 0008 | 0374 | C980 | 0A20 |
| 0000110120 | F24E | C980 | 8B01 | 8BC2 | 88D8 | F78F | 532A | 9DE8 |
| 0000110140 | 8309 | 02C4 | E58B | CB5D | F0A1 | F72A | 23D0 | 33C1 |
| 0000110160 | A8C9 | 7580 | 8003 | 01C9 | 00C3 | 8B55 | 83EC | 08EC |
| 0000110200 | C033 | 5E8B | 3B06 | F51E | 732A | 534D | 63E8 | 8309 |
| 0000110220 | 02C4 | 4E8B | E30C | F647 | F787 | 022A | 4075 | 3357 |
| 0000110240 | 8BD2 | 0C4E | 75C4 | F608 | F787 | 082A | 1074 | 878A |
| 0000110260 | 2BF7 | 0A3C | 0874 | 42AA | C649 | F787 | 0A2B | 0653 |
| 0000110300 | 5157 | 468D | 16FA | 9A50 | 8CA8 | 0000 | 0B5F | 74C0 |
| 0000110320 | 530F | 29E8 | 8309 | 02C4 | 09BA | E900 | E68A | 4AEB |
| 0000110340 | 468B | 03FA | F6C2 | F787 | 802A | 3E74 | A780 | 2AF7 |
| 0000110360 | 56FB | 1E57 | C507 | 0876 | FE8B | C88B | 28E3 | 0DB4 |
| 0000110400 | 3C80 | 750A | 2606 | 8F80 | 2AF7 | AC04 | C43A | 2574 |
| 0000110420 | 1A3C | 0875 | 8026 | F78F | 022A | 05EB | 0588 | E247 |
| 0000110440 | 8BEA | 2BC7 | 0846 | 1F06 | 5E5F | E853 | 08D0 | C483 |
| 0000110460 | 8B02 | 5DE5 | 83CB | 01F9 | 0774 | 3C80 | 740A | EBE0 |
| 0000110500 | 26DB | 87F6 | 2AF7 | 744D | 0B2B | 75DB | 5323 | 468D |
| 0000110520 | 16F9 | 5150 | 468D | 16FA | 9A50 | 8D88 | 0000 | C085 |
| 0000110540 | 0E74 | 1F06 | 5E5F | E853 | 0894 | C483 | E902 | E611 |
| 0000110560 | 0AB0 | A8EB | 46C6 | 00F9 | 8D53 | F946 | 5016 | 8D51 |
| 0000110600 | FA46 | 5016 | 1A9A | 008E | 0B00 | 75C0 | F7D5 | FA46 |
| 0000110620 | FFFF | 3674 | 7E83 | 010C | 3574 | F626 | F787 | 082A |
| 0000110640 | 1C75 | B853 | FFFF | 5050 | D8F7 | 8D50 | FC46 | 5016 |
| 0000110660 | D79A | 008C | 8000 | F97E | 750A | E90F | FF61 | 468A |
| 0000110700 | 26F9 | 8788 | 2BF7 | 0A3C | 0274 | 0DB0 | 4DE9 | 80FF |
| 0000110720 | F97E | 750A | EBC5 | 0099 | 8B55 | 83EC | 0EEC | C033 |
| 0000110740 | 09EB | 8B55 | 83EC | 0EEC | FFB8 | 89FF | F246 | 5E8B |
| 0000110760 | 3B06 | F51E | 722A | BA08 | 0009 | C033 | 69E9 | 0BE5 |
| 0000111000 | 74C0 | 5307 | EBE8 | 8307 | 02C4 | 87F6 | 2AF7 | 7420 |
| 0000111020 | 5312 | C933 | 5151 | 4141 | 8D51 | F446 | 5016 | 719A |
| 0000111040 | 008E | F600 | F787 | 802A | 6674 | 5E8C | 8EFA | 0A46 |
| 0000111060 | 56C5 | 3308 | 89C0 | FE46 | 4689 | FCFC | 5657 | FA8B |
| 0000111100 | F28B | 6689 | 8BF8 | 0C4E | 28E3 | 0AB0 | AEF2 | 3B75 |
| 0000111120 | EC83 | 8B02 | BADC | 0080 | E22B | D48B | FA8B | 0716 |
| 0000111140 | 4E8B | AC0C | 0A3C | 0D74 | FB3B | 1A74 | E2AA | E8F4 |
| 0000111160 | 0038 | AFE9 | B000 | 3B0D | 75FB | E803 | 002C | B0AA |
| 0000111200 | FF0A | FC46 | E2EB | 21E8 | EB00 | 5EE1 | 8E5F | FA5E |
| 0000111220 | C8E9 | 8B00 | F246 | C00B | 0974 | 76FF | E806 | 075E |
| 0000111240 | C483 | B802 | FFFC | E80E | E2EA | 5350 | 1E51 | 1F06 |
| 0000111260 | CF8B | CA2B | 21E3 | 8B51 | 065E | 1E53 | 5152 | 468D |
| 0000111300 | 16F4 | 9A50 | 73CF | 0000 | 0B59 | 75C0 | 8B11 | F45E |
| 0000111320 | 5E01 | 3BFE | 72D9 | 1F07 | 5B59 | 8B58 | C3FA | 831F |
| 0000111340 | 08C4 | 7E83 | 00FE | 3C75 | C00B | 1874 | 6D3D | 7400 |
| 0000111360 | 3D0D | 0001 | 09BA | 7500 | BA08 | D01C | 03EB | 20BA |
| 0000111400 | F900 | 26EB | 5E8E | F6FA | F787 | 402A | 0E74 | 5E8E |
| 0000111420 | 8B0A | 085E | 3F80 | 751A | F803 | 0EEB | 1CBA | 3300 |
| 0000111440 | F9C0 | 06EB | 468B | 2BFE | FC46 | 668B | 5EF8 | 8E5F |
| 0000111460 | FA5E | 1472 | 5E8B | 0BF2 | 74DB | FF09 | 0676 | BDE8 |
| 0000111500 | 8306 | 02C4 | E58B | CB5D | 5E8B | 0BF2 | 74DB | FF09 |
| 0000111520 | 0676 | A9E8 | 8306 | 02C4 | 0DE9 | 8BE4 | 0C4E | C90B |
| 0000111540 | 0475 | C18B | CEEB | C51E | 0856 | 1E53 | 5152 | 468D |
| 0000111560 | 16F4 | 9A50 | 8F84 | 0000 | 071E | 0B1F | 74C0 | 3D17 |

THU MAR 14 17:41:20 1991 LBIPMT.DLL PAGE 41, LINE 2361

| | | | | | | | | |
|---|---|---|---|---|---|---|---|---|
| 0000111600 | 006D | 0D74 | 013D | BA00 | 0009 | BC75 | 1CBA | EB00 |
| 0000111620 | BAB7 | 0020 | B2EB | 468B | 0BF4 | 75C0 | F697 | F787 |
| 0000111640 | 402A | 0A74 | DA8B | 8026 | 1A3F | 0275 | 86EB | 1CBA |
| 0000111660 | 3300 | EBC0 | 0093 | 9DEA | 2290 | EA8A | 90BC | 9079 |
| 0000111700 | 8AEA | 7E90 | EA90 | 908A | 9083 | 8B55 | 56EC | 76C4 |
| 0000111720 | 8C06 | E3C1 | 2605 | 4C80 | 01FE | 5D5E | 55CB | EC8B |
| 0000111740 | 096A | 45E8 | 8306 | 02C4 | 76FF | 0E06 | 0DE8 | 5B00 |
| 0000111760 | 096A | 5FE8 | 8306 | 02C4 | E58B | CB5D | 8B55 | 56EC |
| 0000112000 | 8B57 | 064E | F983 | 77E8 | 1E69 | 54A1 | 0B31 | 74C0 |
| 0000112020 | BF48 | 91A4 | 368B | 315C | 1EC5 | 3156 | 561E | FF57 |
| 0000112040 | 5FD7 | 735E | 8C2B | C5DA | 0C5F | D63B | EF75 | 1F58 |
| 0000112060 | C41E | 5636 | 2631 | 748B | C512 | 521E | 8C31 | 3BDA |
| 0000112100 | 75D0 | 1FD9 | 811E | 20FF | 7492 | BF0E | 9220 | C4EB |
| 0000112120 | 815E | A4FF | 7491 | EB0F | 070A | BF06 | 3152 | E1E8 |
| 0000112140 | 7201 | E80E | 007E | 891F | 5816 | 8931 | 561E | EB31 |
| 0000112160 | 1F04 | C033 | 5F99 | 5D5E | 00CB | 5706 | F88B | FB03 |
| 0000112200 | 7F89 | 4F04 | 2D4F | 0016 | 778D | C714 | FE05 | 89FF |
| 0000112220 | 0A7F | 8948 | 8C04 | 8B1F | 8CC6 | 8EDA | 8DC2 | 067F |
| 0000112240 | ABFC | 47AB | 3347 | ABC0 | ABAB | 5FAB | C307 | 8B26 |
| 0000112260 | 0245 | C00B | 0975 | 8C26 | 025D | 8926 | EB1D | 0614 |
| 0000112300 | C426 | 0875 | 8C26 | 0E5C | 8926 | 0C5C | 478C | 8912 |
| 0000112320 | 1077 | 2607 | 5D8C | 260A | 5D89 | 2608 | 5D8C | 2606 |
| 0000112340 | 5D89 | C304 | 8041 | FEE1 | FC53 | 778B | 8B08 | 0A5F |
| 0000112360 | FF33 | 23EB | C38B | A85B | 7501 | 5342 | 778B | 8B06 |
| 0000112400 | 085F | DE3B | 3674 | 334B | EBFF | 900C | 548D | 3BFE |
| 0000112420 | 73D3 | 03E1 | 72F0 | AD23 | 01A8 | F074 | FE8B | 3B48 |
| 0000112440 | 73C1 | 0323 | 72F0 | 8B13 | ADD0 | 01A8 | DE74 | C203 |
| 0000112460 | 0205 | 8B06 | 89F7 | FE44 | E4EB | C08B | 8B5B | 0647 |
| 0000112500 | 4789 | F908 | 19EB | 895B | FE4C | 0974 | F903 | C12B |
| 0000112520 | 8948 | 2B05 | 03F9 | 89F9 | 087F | C68B | DA8C | C3F8 |
| 0000112540 | 5751 | 47F6 | 0102 | 6674 | B7E8 | 8800 | 8BFE | A804 |
| 0000112560 | 7401 | 2B03 | 49C8 | 4141 | 778B | 0B04 | 74F6 | 034F |
| 0000112600 | 73CE | 3309 | BAC0 | FFF0 | 33E3 | 42EB | 7CB8 | 8E73 |
| 0000112620 | 26C0 | 60A1 | 3D31 | 2000 | 1674 | 00BA | 3B80 | 72D0 |
| 0000112640 | D106 | 75EA | EBF8 | 8322 | 08FA | 1D72 | E2D1 | C28B |
| 0000112660 | 8B48 | 03D0 | 73C1 | 3302 | F7C0 | 23D2 | 52C2 | 2EE8 |
| 0000112700 | 5A00 | 0D73 | FA83 | 74F0 | B805 | 0010 | E2EB | EBF9 |
| 0000112720 | 8B1B | 2BD0 | 0457 | 4789 | 8904 | 087F | 778B | 4A0A |
| 0000112740 | 1489 | 0342 | C7F2 | FE04 | 89FF | 0A77 | 595F | 8BC3 |
| 0000112760 | F6D0 | 0247 | 7404 | 4A0F | 778B | 4E04 | D63B | 0572 |
| 0000113000 | 5739 | 73FE | 4218 | 1E50 | D39A | 006F | 0B00 | 75C0 |
| 0000113020 | 8B0F | F6C2 | 0247 | 7404 | 4A04 | 5789 | F8FE | 01EB |
| 0000113040 | C3F9 | 8B57 | 0877 | 773B | 750A | 8B03 | 0677 | 3DAD |
| 0000113060 | FFFE | 0874 | FE8B | FE24 | F003 | F2EB | 4F4F | F78B |
| 0000113100 | C35F | D18B | C283 | 8027 | F0E2 | 8B50 | 52C4 | 5016 |
| 0000113120 | C033 | 9A50 | FFFF | 0000 | 0B1F | 75C0 | 3314 | 26DB |
| 0000113140 | 458B | 890C | 0247 | C28B | 0FE8 | E8FE | FE40 | EBF8 |
| 0000113160 | F901 | 00C3 | 8B55 | 8BEC | 8BD7 | 1EDE | 7EC4 | 3306 |
| 0000113200 | B9C0 | FFFF | AEF2 | 758D | C4FF | 0A7E | FFB9 | F2FF |
| 0000113220 | F7AE | 2BD1 | 8CF9 | 8EC0 | 8ED8 | 0846 | FE87 | 468B |
| 0000113240 | F706 | 01C6 | 7400 | A402 | D149 | F3E9 | 13A5 | F3C9 |
| 0000113260 | 8BA4 | 8BF3 | 1FFA | C28C | CB5D | 8B55 | 8BEC | 8BD7 |
| 0000113300 | 1EDE | 76C5 | 8B0A | 8CFE | 8ED8 | 33C0 | B9C0 | FFFF |
| 0000113320 | AEF2 | D1F7 | 7EC4 | 8B06 | A8C7 | 7401 | A402 | D149 |
| 0000113340 | F3E9 | 13A5 | F3C9 | 8BA4 | 8BF3 | 1FFA | C28C | CB5D |
| 0000113360 | 8B55 | 8BEC | 8BD7 | 1EDE | 76C5 | C406 | 0A7E | C033 |
| 0000113400 | FFB9 | F2FF | F7AE | 2BD1 | F3F9 | 74A6 | 1B05 | 1DC0 |
| 0000113420 | FFFF | 8B1F | 8BF3 | 5DFA | 00CB | 8B55 | 8BEC | C4D7 |
| 0000113440 | 067E | C033 | FFB9 | F2FF | F7AE | 49D1 | 8B91 | 5DFA |

THU MAR 14 17:41:20 1991 LBIPMT.DLL PAGE 42, LINE 2420

| | | | | | | | | |
|---|---|---|---|---|---|---|---|---|
| 0000113460 | 00CB | 8B55 | 57EC | 1E56 | 7EC4 | C506 | 0A76 | DF8B |
| 0000113500 | 4E8B | E30E | ACDC | C00A | 0374 | E2AA | 32F8 | F3C0 |
| 0000113520 | 8BAA | 8CC3 | 1FC2 | 5F5E | E58B | CB5D | 8B55 | 57EC |
| 0000113540 | 1E56 | 4E8B | E30E | 8B27 | C4D9 | D67E | F78B | C033 |
| 0000113560 | AEF2 | D9F7 | CB03 | FE8B | 76C5 | F30A | 8AA6 | FF44 |
| 0000113600 | C933 | 3A26 | FF45 | 0477 | 0474 | 4949 | D1F7 | C18B |
| 0000113620 | 5E1F | 8B5F | 5DE5 | 00CB | 65E9 | 0000 | 61E9 | 0000 |
| 0000113640 | 12C8 | 0000 | 5657 | 03EB | 46FF | C408 | 085E | 8A26 |
| 0000113660 | 9807 | D88B | 87F6 | 3181 | 7508 | 6AED | 6A00 | 0600 |
| 0000113700 | 76FF | 9A08 | 93DA | 9499 | C483 | 5004 | 76FF | FF0A |
| 0000113720 | 0876 | 468D | 50F0 | 6B9A | 88C3 | 8390 | 0CC4 | 0805 |
| 0000113740 | 8B00 | 065E | FB8B | F08B | 0716 | 8E1E | A5DA | A5A5 |
| 0000113760 | 1FA5 | 5E89 | 8BEE | 8CC3 | 5ED2 | C95F | 06CA | 9000 |
| 0000114000 | 8B55 | 57EC | 1E56 | 76C5 | 3306 | 99C0 | DB33 | 3CAC |
| 0000114020 | 7420 | 3CFB | 7409 | 50F7 | 2D3C | 0474 | 2B3C | 0175 |
| 0000114040 | 3CAC | 7739 | 2C1F | 7230 | D11B | D1E3 | 8BD2 | 8BCB |
| 0000114060 | D1FA | D1E3 | D1D2 | D1E3 | 03D2 | 13D9 | 03D7 | 83D8 |
| 0000114100 | 00D2 | DCEB | 3C58 | 932D | 0775 | D8F7 | D283 | F700 |
| 0000114120 | 1FDA | 5F5E | CB5D | 8B55 | 56EC | B357 | 8B01 | 0C4E |
| 0000114140 | 468B | 3306 | 83D2 | 0AF9 | 0175 | 1E99 | 7EC5 | E908 |
| 0000114160 | 0E8B | 08C8 | 0000 | 5EC4 | 260C | 478B | 2606 | 578B |
| 0000114200 | 8908 | F846 | 5689 | C4FA | 065E | C626 | 3007 | 478D |
| 0000114220 | 8901 | FC46 | 468C | EBFE | 9026 | 5EC4 | 26F8 | 3F80 |
| 0000114240 | 7400 | 260F | 078A | 5EC4 | 26FC | 0788 | 46FF | EBF8 |
| 0000114260 | 9008 | 5EC4 | 26FC | 07C6 | FF30 | FC46 | 4EFF | 830A |
| 0000114300 | 0A7E | 7F00 | C4D5 | FC5E | C626 | 0007 | 7E83 | 000A |
| 0000114320 | 1F7C | 5EC4 | 26F8 | 3F80 | 7C35 | EB16 | 9005 | C626 |
| 0000114340 | 3007 | 4EFF | C4FC | FC5E | 8026 | 393F | F074 | FE26 |
| 0000114360 | C407 | 065E | 8026 | 313F | 0A75 | 5EC4 | 260C | 47FF |
| 0000114400 | EB02 | 900F | C38B | C28C | 5240 | 5250 | 9A53 | 937A |
| 0000114420 | 9486 | CBC9 | 04C8 | 0000 | A156 | 2CFD | 168B | 2CFF |
| 0000114440 | 4689 | 89FC | FE56 | 0C6A | FFE8 | 8300 | 02C4 | 468B |
| 0000114460 | 0BFE | FC46 | 7674 | 468B | 0B08 | 0646 | 6E74 | 76FF |
| 0000114500 | FF08 | 0676 | DA9A | 2493 | 8396 | 04C4 | F08B | 5EC4 |
| 0000114520 | 26FC | 478B | 2602 | 070B | 5274 | FF26 | 0277 | FF26 |
| 0000114540 | 9A37 | 93DA | 9645 | C483 | 3B04 | 7EC6 | C439 | FC5E |
| 0000114560 | C426 | 261F | 388D | 753D | 562D | 76FF | FF08 | 0676 |
| 0000114600 | 5306 | 1C9A | D094 | 8395 | 0AC4 | C00B | 1875 | 0C6A |
| 0000114620 | C1E8 | 8300 | 02C4 | 5EC4 | 26FC | 078B | 8B26 | 0257 |
| 0000114640 | C603 | EB4D | 9012 | 4683 | 04FC | A2EB | 0C6A | A3E8 |
| 0000114660 | 8300 | 02C4 | CJ2B | 5E99 | CBC9 | 8B55 | 53EC | 8B51 |
| 0000114700 | 0646 | 568B | 8B08 | 0C5E | FFB9 | D3FF | D3EA | 2BEB |
| 0000114720 | 0A46 | D31B | 5B59 | CA5D | 0008 | 8B55 | 50EC | 468B |
| 0000114740 | 0504 | 0014 | 4BEB | 8B55 | 50EC | 468B | 0504 | 0014 |
| 0000114760 | 69EB | 8B55 | 50EC | 468B | 0504 | 0114 | 33EB | 8B55 |
| 0000115000 | 50EC | 468B | 0504 | 0114 | 51EB | 8B55 | 50EC | 468B |
| 0000115020 | C104 | 02E0 | FF68 | 50FF | FF6A | FF6A | FF9A | 00FF |
| 0000115040 | 0B00 | 75C0 | 5829 | E58B | C35D | 8B55 | 50EC | 468B |
| 0000115060 | FF04 | 8206 | C132 | 02E0 | D568 | 5096 | FF6A | FF6A |
| 0000115100 | FF9A | 00FF | 0B00 | 75C0 | 5805 | E58B | C35D | 11B8 |
| 0000115120 | E900 | D907 | 8B55 | 50EC | 468B | C104 | 02E0 | F968 |
| 0000115140 | 5096 | FF9A | 00FF | 0B00 | 75C0 | FFE3 | 820E | 5832 |
| 0000115160 | E58B | C35D | 8B55 | FFEC | 0676 | ADE8 | 83FF | 02C4 |
| 0000115200 | E58B | CB5D | 8B55 | FFEC | 0676 | C7E8 | 83FF | 02C4 |
| 0000115220 | E58B | CB5D | 068E | 2AB6 | A126 | 0006 | 3B48 | 8406 |
| 0000115240 | 7732 | C107 | 06E0 | FFBA | C3FF | 5357 | 6A51 | E80F |
| 0000115260 | FF78 | C483 | 3B02 | 8406 | 7632 | 8B40 | 05D8 | 0004 |
| 0000115300 | FC25 | 8BFF | C1C8 | 06E0 | 67BA | 5097 | 9A52 | 92C9 |
| 0000115320 | 0000 | C00B | 3275 | 8B49 | 87F9 | 843E | 2B32 | 51CF |

THU MAR 14 17:41:20 1991 LBIPMT.DLL PAGE 43, LINE 2479

| | | | | | | | | |
|---|---|---|---|---|---|---|---|---|
| 0000115340 | C147 | 06E7 | E1C1 | 5705 | C28E | ABF3 | 595F | C726 |
| 0000115360 | 0445 | 0200 | C783 | E240 | 8BF5 | 6AC3 | E80F | FF54 |
| 0000115400 | C483 | 5902 | 5F5B | 9BEB | 10B8 | E900 | D84D | 04C8 |
| 0000115420 | 0000 | 5657 | 126A | 11E8 | 83FF | 02C4 | 06C6 | 9F32 |
| 0000115440 | 8B42 | 0646 | 568B | A308 | 9F2E | 1689 | 9F30 | 28BE |
| 0000115460 | 899F | 8904 | 0254 | 06C7 | 9F2C | 7FFF | 468D | 160E |
| 0000115500 | FF50 | 0C76 | 76FF | 1E0A | 9A56 | 8408 | 982F | C483 |
| 0000115520 | 8B0C | FFF8 | 2C0E | 789F | C40F | 281E | FF9F | 2806 |
| 0000115540 | 269F | 07C6 | EB00 | 900D | 561E | 006A | 849A | 0777 |
| 0000115560 | 8396 | 06C4 | 126A | DBE8 | 83FE | 02C4 | C78B | 5F5E |
| 0000115600 | CBC9 | 04C8 | 0000 | 5657 | 768B | 8B06 | 2DC6 | 2D1A |
| 0000115620 | 0CB9 | 9900 | F9F7 | 4689 | 50FE | 3DE8 | 83FE | 02C4 |
| 0000115640 | 561E | 7BE8 | 83E1 | 04C4 | F88B | 76FF | FF10 | 0E76 |
| 0000115660 | 76FF | FF0C | 0A76 | 561E | 089A | 0C84 | 8398 | 0CC4 |
| 0000115700 | 4689 | 1EFC | 5756 | CFE8 | 83E1 | 06C4 | 76FF | E8FE |
| 0000115720 | FE14 | C483 | 8B02 | FC46 | 5F5E | CBC9 | 8B55 | 57EC |
| 0000115740 | 6A56 | E813 | FE44 | C483 | C602 | 3E06 | 429F | 468B |
| 0000115760 | 8B06 | 0856 | 3AA3 | 899F | 3C16 | BE9F | 9F34 | 0489 |
| 0000116000 | 5489 | C702 | 3806 | FF9F | FF7F | 1076 | 76FF | FF0E |
| 0000116020 | 0C76 | 76FF | 1E0A | 9A56 | 8408 | 98FD | C483 | 8B0C |
| 0000116040 | FFF8 | 380E | 789F | C40F | 341E | FF9F | 3406 | 269F |
| 0000116060 | 07C6 | EB00 | 900D | 561E | 006A | 849A | 7B77 | 8398 |
| 0000116100 | 06C4 | 136A | 0DE8 | 83FE | 02C4 | C78B | 5F5E | CBC9 |
| 0000116120 | 8B55 | 57EC | 468B | F706 | 0866 | 0573 | C033 | EB99 |
| 0000116140 | 5D1A | 769A | DA90 | 5998 | D88B | DA0B | 0D74 | 8B5D |
| 0000116160 | 8EF8 | 33C2 | 41C0 | E9D1 | ABF3 | 5F58 | CB5D | 8B55 |
| 0000116200 | 56EC | 768B | 8B04 | B9C6 | 000A | F799 | 04F9 | C430 |
| 0000116220 | 065E | 46FF | 2606 | 0788 | C68B | F799 | 80F9 | 30C2 |
| 0000116240 | 5E8B | FF06 | 0646 | 8826 | 8B17 | 0646 | C28C | C95E |
| 0000116260 | 06C2 | 9000 | 12C8 | 0000 | E856 | FDD8 | C28E | D88B |
| 0000116300 | 5E89 | 8CF2 | F446 | 8B26 | 1A47 | 0B26 | 1847 | 2E75 |
| 0000116320 | 1A6A | 769A | 2590 | 8399 | 02C4 | 5EC4 | 26F2 | 4789 |
| 0000116340 | 2618 | 5789 | 8B1A | 26C2 | 470B | 7518 | C70B | EE46 |
| 0000116360 | 9F40 | 5E8C | EBF0 | 9015 | 8B26 | 1847 | 08EB | 8B26 |
| 0000116400 | 1847 | 8B26 | 1A57 | 4689 | 89EE | F056 | 468B | 8BEE |
| 0000116420 | F056 | 4689 | 89F6 | F856 | 5EC4 | 2606 | 478B | 8B0C |
| 0000116440 | D1C8 | 03E0 | 89C1 | FA46 | 8B26 | 0847 | C88B | E0D1 |
| 0000116460 | C103 | 4689 | C7FC | FE46 | 0000 | 768B | 8BFE | FA5E |
| 0000116500 | 808A | 32E6 | 5EC4 | 26EE | 0788 | 5E8B | 8AFC | FC80 |
| 0000116520 | 8B32 | EE5E | 8826 | 0447 | 46FF | FFFE | EE46 | 7E83 |
| 0000116540 | 03FE | D67C | 5E8B | 83EE | EE46 | 2604 | 07C6 | 8B2G |
| 0000116560 | EE5E | 46FF | 26EE | 07C6 | 0620 | 76FF | C4EE | 065E |
| 0000116600 | FF26 | 0677 | F7E8 | 8EFE | 8BC2 | 26D8 | 07C6 | 8D20 |
| 0000116620 | 0147 | 5006 | 5EC4 | 2606 | 77FF | E804 | FEE0 | C28E |
| 0000116640 | D88B | C626 | 3A07 | 478D | 0601 | C450 | 065E | FF26 |
| 0000116660 | 0277 | C9E8 | 8EFE | 8BC2 | 26D8 | 07C6 | 8D3A | 0147 |
| 0000116700 | 5006 | 5EC4 | 2606 | 37FF | B3E8 | 8EFE | 8BC2 | 26D8 |
| 0000116720 | 07C6 | 8D20 | 0147 | 5006 | 5EC4 | 2606 | 478B | B90A |
| 0000116740 | 0064 | D88B | F799 | 05F9 | 0013 | 8B50 | E8F3 | FE8E |
| 0000116760 | 5052 | 64B9 | 8B00 | 99C6 | F9F7 | E852 | FE80 | C28E |
| 0000117000 | D88B | C626 | 0A07 | 8943 | EE5E | 468C | 26F0 | 07C6 |
| 0000117020 | 8B00 | F646 | 568B | 5EF8 | CBC9 | 04C8 | 0000 | 76FF |
| 0000117040 | FF08 | 0676 | 2C9A | FA9E | 839A | 04C4 | 5689 | 0BFE |
| 0000117060 | 74D0 | FF0F | FE76 | 9A50 | 9974 | 9995 | C483 | EB04 |
| 0000117100 | 9004 | C02B | C999 | 90CB | 1EC8 | 0000 | FA9A | 209E |
| 0000117120 | 6A9B | 6A00 | FF3C | DA36 | FF32 | D836 | 9A32 | A4B0 |
| 0000117140 | 9B6F | 5EC4 | 2606 | 4789 | A106 | 32DC | 8926 | 0847 |
| 0000117160 | 468D | 16E2 | 9A50 | FFFF | 0000 | 468A | 2AE5 | 8BE4 |
| 0000117200 | C1C8 | 02E0 | C103 | E0D1 | 5EC4 | 2606 | 4789 | 8A04 |

THU MAR 14 17:41:20 1991 LBIPMT.DLL PAGE 44, LINE 2538

| | | | | | | | | |
|---|---|---|---|---|---|---|---|---|
| 0000117220 | E446 | E42A | 8A50 | E346 | 8A50 | E246 | 8A50 | E646 |
| 0000117240 | 8A50 | E746 | 8B50 | E846 | BC2D | 5007 | C29A | C6A0 |
| 0000117260 | 839B | 0CC4 | 5EC4 | 2606 | 0789 | 8926 | 0257 | 468B |
| 0000117300 | 2DE8 | 076C | 4689 | 8AF8 | E246 | E42A | 4689 | 8AF2 |
| 0000117320 | E75E | FF2A | 894B | F65E | E3D1 | 468A | 89E6 | F446 |
| 0000117340 | 8703 | 32A0 | 4689 | F6FC | E846 | 7503 | 800A | E77E |
| 0000117360 | 7602 | 4004 | 4689 | 83FC | DC3E | 0032 | 1C74 | 468D |
| 0000117400 | 16EE | 9A50 | 9FF4 | 9AE7 | C483 | 0B04 | 74C0 | C40B |
| 0000117420 | 065E | C726 | 0847 | 0001 | 09EB | 5EC4 | 2606 | 47C7 |
| 0000117440 | 0008 | C900 | 90CB | 14C8 | 0000 | 5657 | 5EC4 | 2606 |
| 0000117460 | 7F81 | CE02 | 7712 | 720F | 2607 | 3F81 | A600 | 0673 |
| 0000117500 | C02B | E999 | 0222 | 4BE8 | 8EFB | 8BC2 | 89D8 | F45E |
| 0000117520 | 468C | 26F6 | 478B | 261E | 470B | 751C | 6A2D | 9A12 |
| 0000117540 | 9076 | 9C6B | C483 | C402 | F45E | 8926 | 1C47 | 8926 |
| 0000117560 | 1E57 | C28B | 0B26 | 1C47 | 0A75 | 46C7 | BAF8 | 8C32 |
| 0000117600 | FA5E | 14EB | 8B26 | 1C47 | 08EB | 8B26 | 1C47 | 8B26 |
| 0000117620 | 1E57 | 4689 | 89F8 | FA56 | E168 | 6801 | 3380 | 5EC4 |
| 0000117640 | 2606 | 77FF | 2602 | 37FF | 889A | 89A6 | 6A9C | 68FE |
| 0000117660 | AE80 | E168 | 6801 | 3380 | 5EC4 | 2606 | 77FF | 2602 |
| 0000117700 | 37FF | F08B | FA8B | 289A | AFA6 | C49C | F85E | 8926 |
| 0000117720 | 0A47 | 9940 | C233 | C22B | F8C1 | 3302 | 2BC2 | 8BC2 |
| 0000117740 | 8BCE | 6AF0 | 5600 | 4E89 | 89EC | EE7E | 4A9A | 4FA5 |
| 0000117760 | 039D | EC46 | D713 | 4689 | 89FC | FE56 | 468E | 83FA |
| 0000120000 | FE7E | 7D00 | 812D | FC46 | 3380 | 5681 | E1FE | 8B01 |
| 0000120020 | F85E | 8B26 | 0A47 | B940 | 0004 | F799 | 0BF9 | 75D2 |
| 0000120040 | 810A | FC46 | 5180 | 5683 | 01FE | 264E | 4FFF | EB0A |
| 0000120060 | 90CE | 5EC4 | 26F8 | 4781 | B20A | 2607 | 478B | B90A |
| 0000120100 | 0004 | D88B | F799 | 0BF9 | 75D2 | 8B25 | B9C3 | 0064 |
| 0000120120 | F799 | 0BF9 | 75D2 | 8B11 | F85E | 8B26 | 0A47 | 90B9 |
| 0000120140 | 9901 | F9F7 | D20B | 0875 | 46C7 | 86F0 | EB32 | 9006 |
| 0000120160 | 46C7 | A0F0 | 8C32 | F25E | 5E8B | 26F8 | 6F81 | 6C0A |
| 0000120200 | 6A07 | 6801 | 5180 | 76FF | FFFE | FC76 | B09A | 65A4 |
| 0000120220 | C49D | F85E | 8926 | 0E47 | 016A | 8068 | 8D51 | FC46 |
| 0000120240 | 5016 | 6E9A | C1A4 | C49D | F85E | C726 | 0847 | 0001 |
| 0000120260 | 07EB | 5EC4 | 26F8 | 47FF | C408 | F85E | 8B26 | 0E47 |
| 0000120300 | 8B26 | 085F | E3D1 | 7EC4 | 26F0 | 0139 | E47C | 5EC4 |
| 0000120320 | 26F8 | 4FFF | 2608 | 5F8B | C408 | F87E | 8B26 | 0E45 |
| 0000120340 | E3D1 | 7EC4 | 8BF0 | 26C8 | 012B | 5EC4 | 26F8 | 4789 |
| 0000120360 | 6A06 | 6800 | 0E10 | 76FF | FFFE | FC76 | F98B | B09A |
| 0000120400 | DBA4 | C49D | F85E | 8926 | 0447 | 006A | 3C6A | 006A |
| 0000120420 | 1068 | 8D0E | FC46 | 5016 | 6E9A | E8A4 | 529D | 8950 |
| 0000120440 | EC46 | 5689 | 9AEE | A4B0 | 9DFE | 5EC4 | 26F8 | 4789 |
| 0000120460 | 6A02 | 6A00 | FF3C | EE76 | 76FF | 9AEC | A57C | 9B0F |
| 0000120500 | 5EC4 | 26F8 | 0789 | 6926 | 0A47 | 016D | C703 | C603 |
| 0000120520 | CA2D | B963 | 0007 | D22B | F1F7 | 8926 | 0C57 | C726 |
| 0000120540 | 1047 | 0000 | C38B | C28C | 5F5E | CBC9 | 08C8 | 0000 |
| 0000120560 | FA9A | 559E | C49E | 065E | 8B26 | 2607 | 578B | 2B02 |
| 0000120600 | D806 | 1B32 | DA16 | 8932 | FC46 | 5689 | 8DFE | FC46 |
| 0000120620 | 5016 | E69A | 789B | 839E | 04C4 | 4689 | 89F8 | FA56 |
| 0000120640 | D00B | 0675 | C02B | EB99 | 9044 | 3E83 | 32DC | 7400 |
| 0000120660 | FF36 | FA76 | 9A50 | 9FF4 | 9E92 | C483 | 0B04 | 74C0 |
| 0000120700 | 8126 | FC46 | 0E10 | 5683 | 00FE | 468D | 16FC | 9A50 |
| 0000120720 | 9BE6 | 9C22 | C483 | 8E04 | 8BC2 | 89D8 | F85E | 468C |
| 0000120740 | 26FA | 47C7 | 0110 | 8B0D | F846 | 568B | C9FA | 90CB |
| 0000120760 | 8B55 | 83EC | 0CEC | 468D | 16F4 | 9A50 | 9B36 | 0000 |
| 0000121000 | 00B4 | 468A | 50F6 | 468A | 50F5 | 468A | 50F4 | 468A |
| 0000121020 | 50F8 | 468A | 50F9 | 468B | 2DFA | 07BC | 9A50 | A0C2 |
| 0000121040 | 9E33 | C483 | 830C | 087E | 7400 | C40A | 065E | 8926 |
| 0000121060 | 0257 | 8926 | 8B07 | 5DE5 | 00CB | 0B6A | EBE8 | 83F7 |

THU MAR 14 17:41:20 1991 LBIPMT.DLL PAGE 45, LINE 2597

| | | | | | | | | |
|---|---|---|---|---|---|---|---|---|
| 0000121100 | 02C4 | 3E83 | 9F5A | 7500 | E807 | 0022 | 06FF | 9F5A |
| 0000121120 | 0B6A | FFE8 | 83F7 | 02C4 | 90CB | 0B6A | CBE8 | 83F7 |
| 0000121140 | 02C4 | 09E8 | 6A00 | E80B | F7EA | C483 | CB02 | 04C8 |
| 0000121160 | 0000 | 1E56 | CC68 | 9A32 | 95D4 | 9F67 | C483 | 8904 |
| 0000121200 | FC46 | 5689 | 0BFE | 75D0 | E903 | 00A4 | 5EC4 | 26FC |
| 0000121220 | 3F80 | 7500 | E903 | 0098 | 036A | 5006 | 36FF | 32E0 |
| 0000121240 | 36FF | 32DE | F29A | 7E93 | 839F | 0AC4 | 006A | 1068 |
| 0000121260 | 830E | FC46 | FF03 | FE76 | 76FF | 9AFC | 945C | 9F88 |
| 0000121300 | C483 | 5204 | 9A50 | A54A | 9FD3 | D8A3 | 8932 | DA16 |
| 0000121320 | 2B32 | 8EF6 | FE46 | 5E8B | 26FC | 3880 | 7400 | 261A |
| 0000121340 | 008A | C88B | 8B98 | F6D8 | 8187 | 0431 | 0575 | F980 |
| 0000121360 | 752D | 4606 | FE83 | 7C03 | 8BDD | FC5E | 8026 | 0038 |
| 0000121400 | 1874 | 036A | DE03 | 5306 | 36FF | 32E4 | 36FF | 32E2 |
| 0000121420 | F29A | E093 | 839E | 0AC4 | 08EB | 1EC4 | 32E2 | C626 |
| 0000121440 | 0007 | 1EC4 | 32E2 | 8026 | 013F | C01B | A340 | 32DC |
| 0000121460 | C95E | 90C3 | 04C8 | 0000 | C456 | 065E | 8326 | 087F |
| 0000121500 | 7D03 | E903 | 00B6 | 8326 | 087F | 7E09 | E903 | 00AC |
| 0000121520 | 8326 | 087F | 7E03 | 260A | 7F83 | 0908 | 037D | 81E9 |
| 0000121540 | 2600 | 778B | 810A | 6CC6 | 8107 | C2FE | 7E07 | 2617 |
| 0000121560 | 7F83 | 0308 | 1075 | 8B26 | 085F | E3D1 | 878B | 32A0 |
| 0000121600 | 0705 | EB00 | 900B | 8B26 | 085F | E3D1 | 878B | 32A2 |
| 0000121620 | 4689 | F7FC | 03C6 | 7500 | FF03 | FC46 | 5E8B | 2606 |
| 0000121640 | 778B | 830A | 46EE | 448D | 9901 | C233 | C22B | F8C1 |
| 0000121660 | 3302 | 2BC2 | 69C2 | 6DCE | 0301 | 03C1 | FC46 | 0405 |
| 0000121700 | B900 | 0007 | F799 | 2BF9 | FC56 | DAF7 | 8326 | 087F |
| 0000121720 | 7503 | 2615 | 573B | 7C0E | 7509 | 2621 | 7F83 | 0204 |
| 0000121740 | 1A7C | 01B8 | EB00 | 9017 | 5EC4 | 8B06 | 26C2 | 4739 |
| 0000121760 | 7C0E | 75EF | 2607 | 7F83 | 0104 | E67C | C02B | C95E |
| 0000122000 | 90CB | 16C8 | 0000 | 5657 | 768B | 6A06 | 6801 | 5180 |
| 0000122020 | 448D | 9903 | C233 | C22B | F8C1 | 3302 | 2BC2 | 99C2 |
| 0000122040 | 5052 | 4A9A | 14A5 | 89A1 | EA46 | 5689 | 8BEC | 085E |
| 0000122060 | E3D1 | BF8B | 329E | C68B | 04B9 | 9900 | F9F7 | D20B |
| 0000122100 | 0775 | 7E83 | 0208 | 017E | 8B47 | 0A46 | C703 | 4689 |
| 0000122120 | 9AFC | 9EFA | A137 | 006A | 3C6A | 006A | 3C6A | 006A |
| 0000122140 | 186A | C669 | 016D | 4603 | 030A | 99C7 | 4405 | 830E |
| 0000122160 | 00D2 | 5052 | 4A9A | 4AA5 | 8BA1 | 8BC8 | 0C46 | DA8B |
| 0000122200 | 0399 | 13C1 | 52D3 | 9A50 | A54A | A15D | C88B | 468B |
| 0000122220 | 8B0E | 99DA | C103 | D313 | 5052 | 4A9A | 9BA5 | 8BA1 |
| 0000122240 | 8BC8 | 1046 | DA8B | 0399 | 13C1 | 03D3 | D806 | 1332 |
| 0000122260 | DA16 | 0132 | EA46 | 5611 | 8DEC | 5044 | 4689 | 8BF8 |
| 0000122300 | 0846 | 8948 | F646 | 468B | 890C | F246 | 3E83 | 32DC |
| 0000122320 | 7400 | 8D1A | EE46 | 5016 | F49A | 3A9F | 839F | 04C4 |
| 0000122340 | C00B | 0974 | 6E81 | 10EA | 830E | EC5E | 8B0D | EA46 |
| 0000122360 | 568B | 5EEC | C95F | 90CB | 0EC8 | 0000 | 068E | 33C6 |
| 0000122400 | C726 | 2206 | 0033 | 8D00 | F646 | 5016 | 089A | EC9B |
| 0000122420 | 83A1 | 04C4 | 006A | E868 | 8B03 | F646 | 568B | 2BF8 |
| 0000122440 | 2406 | 1B33 | 2616 | 5233 | 9A50 | A54A | A20D | C88B |
| 0000122460 | 468B | 2BFA | 2806 | 8B33 | 99DA | C103 | D313 | 4689 |
| 0000122500 | 89F2 | F456 | CBC9 | 681E | 3324 | 089A | E59B | 83AD |
| 0000122520 | 04C4 | 90CB | 8B55 | 57EC | 7EC4 | 8B06 | 33DF | B9C0 |
| 0000122540 | FFFF | AEF2 | F741 | 8AD9 | 0A46 | FB8B | AEF2 | 264F |
| 0000122560 | 0538 | 0474 | FF33 | C78E | C78B | C28C | 8B5F | 5DE5 |
| 0000122600 | 00CB | 8B55 | 57EC | 7EC4 | 0606 | 9A57 | 93DA | A1CF |
| 0000122620 | 5040 | 769A | 4E90 | 5BA2 | D88B | DA0B | 0575 | C483 |
| 0000122640 | EB04 | 520A | 9A50 | 937A | A255 | C483 | 5F08 | CB5D |
| 0000122660 | 8B55 | 57EC | 7EC4 | 3306 | B9C0 | FFFF | AEF2 | F741 |
| 0000122700 | 4FD9 | 468A | FD0A | AEF2 | 2647 | 0538 | 0674 | C033 |
| 0000122720 | D08B | 04EB | C78B | C28C | 5FFC | E58B | CB5D | 8B55 |
| 0000122740 | 8BEC | 0E4E | 571E | 0B56 | 75C9 | E903 | 00AF | 76C5 |

THU MAR 14 17:41:20 1991 LBIPMT.DLL PAGE 46, LINE 2656

| | | | | | | | | |
|---|---|---|---|---|---|---|---|---|
| 0000122760 | C40A | 067E | 561E | 5706 | 7A9A | 6896 | 8BA2 | 0E4E |
| 0000123000 | D20B | 5778 | C12B | DA83 | 7300 | 4950 | F103 | 0773 |
| 0000123020 | D88C | FF05 | 8EFF | 03D8 | 73F9 | 8C07 | 05C0 | A2D3 |
| 0000123040 | C08E | 8B41 | 48C1 | C72B | DB1B | C323 | C703 | C62B |
| 0000123060 | DB1B | C323 | C603 | 9140 | C12B | F3FD | FCA4 | E391 |
| 0000123100 | 835C | FFFE | 0775 | D88C | DE2D | 8EA2 | 83D8 | FFFF |
| 0000123120 | D175 | C08C | 092D | 8EA3 | EBC0 | 8BC8 | 48C1 | D78B |
| 0000123140 | D2F7 | C22B | DB1B | C323 | C203 | D68B | D2F7 | C22B |
| 0000123160 | DB1B | C323 | C203 | 9140 | C12B | E9D1 | A5F3 | C913 |
| 0000123200 | A4F3 | E391 | 0B18 | 75F6 | 8C07 | 05D8 | A315 | D88E |
| 0000123220 | FF0B | C775 | C08C | 4C05 | 8EA3 | EBC0 | 8BBE | 0646 |
| 0000123240 | 568B | 5E08 | 1F5F | CB5D | 8B55 | 8BEC | 0C4E | 38E3 |
| 0000123260 | C457 | 067E | D78B | DAF7 | 0C74 | D12B | DB1B | D323 |
| 0000123300 | D103 | D187 | D12B | 468B | 8A0A | D1E0 | F3E9 | 13AB |
| 0000123320 | F3C9 | 87AA | E3D1 | 8C1D | 81C3 | 57C3 | 8EA3 | D1C3 |
| 0000123340 | F3E9 | 13AB | F3C9 | 5FAA | 468B | 8B06 | 0856 | CB5D |
| 0000123360 | 4E8B | 8B0E | 0646 | 568B | 1E08 | 7EC5 | 570A | 071E |
| 0000123400 | 93FC | C00A | 1374 | F983 | 750A | 0B0E | 79D2 | B00A |
| 0000123420 | AA2D | DBF7 | D283 | F700 | 8BDA | 92F7 | D233 | C00B |
| 0000123440 | 0274 | F1F7 | F793 | 92F1 | D387 | 3004 | 393C | 0276 |
| 0000123460 | 2704 | 8BAA | 0BC2 | 75C3 | 88E2 | 4F05 | 86AC | 8805 |
| 0000123500 | FF44 | 448D | 3B01 | 72C7 | 8CF2 | 58DA | 5F1F | 8B5E |
| 0000123520 | 5DE5 | 00CB | 078A | E42A | 578D | 5301 | DC8B | 02B9 |
| 0000123540 | 5100 | 521E | 1650 | 9A53 | 9034 | 0000 | CB5B | 8B55 |
| 0000123560 | FFEC | 0876 | 76FF | 3306 | 50C0 | 9A50 | FFFF | 0000 |
| 0000123600 | C085 | 0374 | FAE9 | 8BCF | 5DE5 | 00CB | 8B55 | 1EEC |
| 0000123620 | C553 | 065E | 76FF | FF0C | 0A76 | 77FF | FF02 | 0E37 |
| 0000123640 | E7E8 | 8900 | 8907 | 0257 | 1F5B | CA5D | 0008 | 8B55 |
| 0000123660 | 1EEC | C553 | 065E | 76FF | FF0C | 0A76 | 77FF | FF02 |
| 0000123700 | 0E37 | F7E8 | 8900 | 0257 | 0789 | 1F5B | CA5D | 0008 |
| 0000123720 | 8B55 | 1EEC | C553 | 065E | 078B | 578B | 8B02 | 0A4E |
| 0000123740 | E80E | 0178 | 0789 | 5789 | 5B02 | 5D1F | D6CA | 0000 |
| 0000123760 | 8B55 | 57EC | 5356 | FF33 | 468B | 0B08 | 7DC0 | 4711 |
| 0000124000 | 568B | F706 | F7D8 | 1DDA | 0000 | 4689 | 8908 | 0656 |
| 0000124020 | 468B | 0B0C | 7DC0 | 4711 | 568B | F70A | F7D8 | 1DDA |
| 0000124040 | 0000 | 4689 | 890C | 0A56 | C00B | 1575 | 4E8B | 8B0A |
| 0000124060 | 0846 | D233 | F1F7 | D88B | 468B | F706 | 8BF1 | EBD3 |
| 0000124100 | 8B38 | 8BD8 | 0A4E | 568B | 8B08 | 0646 | EBD1 | D9D1 |
| 0000124120 | EAD1 | D8D1 | DB0B | F475 | F1F7 | F08B | 66F7 | 910C |
| 0000124140 | 468B | F70A | 03E6 | 72D1 | 3B0C | 0856 | 0777 | 0672 |
| 0000124160 | 463B | 7606 | 4E01 | D233 | 4F96 | 0775 | DAF7 | D8F7 |
| 0000124200 | DA83 | 5B00 | 5F5E | CA5D | 0008 | 8B55 | 8BEC | 0846 |
| 0000124220 | 4E8B | 0B0C | 8BC8 | 0A4E | 0975 | 468B | F706 | 5DE1 |
| 0000124240 | 08CA | 5300 | E1F7 | D88B | 468B | F706 | 0C66 | D803 |
| 0000124260 | 468B | F706 | 03E1 | 5BD3 | CA5D | 0008 | 8B55 | 53EC |
| 0000124300 | 3357 | 8BFF | 0846 | C00B | 117D | 8B47 | 0656 | D8F7 |
| 0000124320 | DAF7 | 001D | 8900 | 0846 | 5689 | 8B06 | 0C46 | C00B |
| 0000124340 | 107D | 568B | F70A | F7D8 | 1DDA | 0000 | 4689 | 890C |
| 0000124360 | 0A56 | C00B | 1875 | 4E8B | 8B0A | 0846 | D233 | F1F7 |
| 0000124400 | 468B | F706 | 8BF1 | 33C2 | 4FD2 | 4379 | 48EB | D88B |
| 0000124420 | 4E8B | 8B0A | 0856 | 468B | D106 | D1EB | D1D9 | D1EA |
| 0000124440 | 0BD8 | 75DB | F7F4 | 8BF1 | F7C8 | 0C66 | F791 | 0A66 |
| 0000124460 | D103 | 0C72 | 563B | 7708 | 7207 | 3B0B | 0646 | 0676 |
| 0000124500 | 462B | 1B0A | 0C56 | 462B | 1B06 | 0856 | 794F | F707 |
| 0000124520 | F7DA | 83D8 | 00DA | 5B5F | CA5D | 0008 | ED32 | 06E3 |
| 0000124540 | E0D1 | D2D1 | FAE2 | 00CB | 8B55 | 53EC | 8B56 | 0C46 |
| 0000124560 | C00B | 1575 | 4E8B | 8B0A | 0846 | D233 | F1F7 | D88B |
| 0000124600 | 468B | F706 | 8BF1 | EBD3 | 8B38 | 8BC8 | 0A5E | 568B |
| 0000124620 | 8B08 | 0646 | E9D1 | DBD1 | EAD1 | D8D1 | C90B | F475 |

THU MAR 14 17:41:20 1991 LBIPMT.DLL PAGE 47, LINE 2715

| | | | | | | | | |
|---|---|---|---|---|---|---|---|---|
| 0000124640 | F3F7 | F08B | 66F7 | 910C | 468B | F70A | 03E6 | 72D1 |
| 0000124660 | 3B0C | 0856 | 0777 | 0672 | 463B | 7606 | 4E01 | D233 |
| 0000124700 | 5E96 | 5D5B | 08CA | 000D | 8B55 | 53EC | 468B | 0B0C |
| 0000124720 | 75C0 | 8B15 | 0A4E | 468B | 3308 | F7D2 | 8BF1 | 0646 |
| 0000124740 | F1F7 | C28B | D233 | 45EB | C88B | 5E8B | 8B0A | 0856 |
| 0000124760 | 468B | D106 | D1E9 | D1DB | D1EA | 0BD8 | 75C9 | F7F4 |
| 0000125000 | 8BF3 | F7C6 | 0C66 | F791 | 0A66 | D103 | 0C72 | 563B |
| 0000125020 | 7708 | 7207 | 3B0B | 0646 | 0676 | 462B | 1B0A | 0C56 |
| 0000125040 | 462B | 1B06 | 0856 | DAF7 | D8F7 | DA83 | 5B00 | CA5D |
| 0000125060 | 0008 | 831E | 03FB | 1677 | 0D74 | 2FE8 | 8E14 | C7D8 |
| 0000125100 | 8606 | 1601 | EB00 | A307 | 332E | 1689 | 3330 | 1FF8 |
| 0000125120 | A1CB | 0186 | 162D | B300 | F60C | CBF3 | F38B | 08BF |
| 0000125140 | 8C00 | 8CC0 | 8ED9 | 8EC1 | FCD8 | A5A5 | D98E | 08BE |
| 0000125160 | C300 | F38B | 08BF | 8C00 | 8CC0 | 8ED9 | 8EC1 | FCD8 |
| 0000125200 | A5A5 | A5A5 | D98E | 08BE | C300 | 758B | 89FC | FC7D |
| 0000125220 | 45C6 | 07FE | 03EB | 758B | FCFC | C033 | 0C8B | 548B |
| 0000125240 | F702 | 80C2 | 747F | 8925 | D105 | D1FA | D1D9 | D1D8 |
| 0000125260 | D1FA | D1D9 | D1D8 | D1FA | D1D9 | 89D8 | 0245 | 4D89 |
| 0000125300 | 8004 | 8FE6 | C281 | 3800 | 5589 | C306 | 0589 | 4589 |
| 0000125320 | 8902 | 0445 | 4589 | C306 | 3E8B | 0186 | 8BFC | 8B0C |
| 0000125340 | 0254 | C033 | C2F7 | 7F80 | 2974 | FAD1 | D9D1 | D8D1 |
| 0000125360 | FAD1 | D9D1 | D8D1 | FAD1 | D9D1 | D8D1 | E680 | 818F |
| 0000125400 | 00C2 | C738 | 0005 | 8900 | 0245 | 4D89 | 8904 | 0655 |
| 0000125420 | F78B | 8BC3 | 8AC8 | EBDD | 8BEA | 863E | FC01 | 8BAD |
| 0000125440 | ADC8 | C80A | D48A | 8AAD | 8AF0 | ADDC | F88A | E2D1 |
| 0000125460 | D3D1 | E2D1 | D3D1 | E2D1 | D3D1 | CD0A | 0374 | CA80 |
| 0000125500 | B101 | 0A80 | 8AF9 | 22EC | 25E9 | 7FF0 | E03D | 7747 |
| 0000125520 | 2D3D | 3800 | 3B72 | E0D1 | E0D1 | E0D1 | D13A | 0777 |
| 0000125540 | 1572 | C6F6 | 7401 | 8010 | 01C6 | D383 | 7300 | 0508 |
| 0000125560 | 0080 | 803D | 747F | 0B17 | 74C0 | 8016 | 7FE7 | C70A |
| 0000125600 | E50A | 4589 | 8A02 | 8AE3 | 89C6 | 8B05 | C3F7 | 71E9 |
| 0000125620 | 331A | 89C0 | 8905 | 0245 | F78B | 33C3 | 8BD2 | 8BDA |
| 0000125640 | 8BD0 | EBC3 | 8B1D | 33D0 | 0BDB | 79D2 | F715 | EBDA |
| 0000125660 | 8B11 | 8BDA | 8BD0 | 0BC3 | 79C0 | F707 | F7DB | 83DA |
| 0000125700 | 00DB | C48A | 8024 | 9EB4 | 75E9 | 3304 | 8BD2 | 8BDA |
| 0000125720 | 8BC8 | EBC3 | 8B1D | 33C8 | 0BDB | 79C9 | F715 | EBD9 |
| 0000125740 | 8B11 | 8BDA | 8BC8 | 0BC3 | 79C0 | F707 | F7DB | 83D9 |
| 0000125760 | 00DB | C48A | 8024 | FF33 | D233 | 60BD | E985 | 07B6 |
| 0000126000 | 3AE8 | EB00 | E80D | 002B | 08EB | 35E8 | EB00 | E803 |
| 0000126020 | 0026 | C0D1 | D283 | 7500 | D167 | C3C8 | 9CE8 | EB00 |
| 0000126040 | E80D | 003E | 08EB | 5DE8 | EB00 | E803 | 0039 | D20B |
| 0000126060 | 4E75 | E8C3 | 002C | 0DEB | 2CE8 | EB00 | E808 | 007B |
| 0000126100 | 03EB | 41E8 | 3300 | 0BC9 | 79FF | F7DD | F7D1 | F7D2 |
| 0000126120 | F5D8 | D283 | 8300 | 00D1 | C2D1 | D183 | 7500 | D121 |
| 0000126140 | C3CA | 56E8 | EB00 | E803 | 001C | DB33 | 01B5 | E822 |
| 0000126160 | CD0A | F980 | F581 | DB13 | C313 | D283 | 7200 | C301 |
| 0000126200 | 7FE9 | E919 | 00A4 | 92AD | D60A | 93AD | 91AD | 91AD |
| 0000126220 | EE83 | 8B08 | B6F9 | 220F | 80F1 | 10CE | E580 | D17F |
| 0000126240 | D1E9 | D1E9 | D1E9 | 0BE9 | 74C9 | 81D8 | FEE9 | 7203 |
| 0000126260 | 8378 | 20F9 | CA7F | E983 | EB25 | 332F | 8AD2 | ACDA |
| 0000126300 | F88A | 8AAD | ACC8 | C186 | EE83 | 8A04 | 8BE9 | 83F9 |
| 0000126320 | 7FE1 | E4D0 | D1D0 | D0F9 | 0BDC | 74C9 | 804D | 7EE9 |
| 0000126340 | 4772 | F983 | 7F20 | 8399 | 20E9 | D9F7 | F980 | 7C08 |
| 0000126360 | 801A | 01FA | D0F5 | 80D2 | 01E2 | D30A | DF8A | F88A |
| 0000126400 | C48A | E68A | F632 | E980 | EB08 | E3E1 | 8015 | 01FA |
| 0000126420 | 01B2 | DA80 | D000 | D1EE | D1D8 | D0DB | 80DA | 00D2 |
| 0000126440 | F3E2 | CA8A | D08B | C38B | F9C3 | 00B1 | D180 | 3300 |
| 0000126460 | 8BC0 | C3D0 | CBE9 | E818 | 0068 | 07B0 | 31E8 | 8B01 |
| 0000126500 | 8636 | 0301 | 067C | EF83 | 8B10 | 80D7 | 7FE6 | FA81 |

THU MAR 14 17:41:20 1991 LBIPMT.DLL PAGE 48, LINE 2774

| | | | | | | | | |
|---|---|---|---|---|---|---|---|---|
| 0000126520 | 7FF0 | E073 | 7C89 | 8B06 | C3FE | A5E9 | E818 | 0087 |
| 0000126540 | 03B0 | 0BE8 | 8B01 | 8636 | 0301 | 027C | EF81 | 0080 |
| 0000126560 | D78B | E680 | 817F | 80FA | 737F | 89DF | 027C | FE8B |
| 0000126600 | E8C3 | 001E | 368B | 0186 | EF83 | 0110 | 067C | FE8B |
| 0000126620 | E8C3 | 0053 | 368B | 0186 | EF81 | 0080 | 7C01 | 8B02 |
| 0000126640 | C3FE | 8BFC | 863E | 8C01 | 8CC0 | 8ED9 | A5C1 | A5A5 |
| 0000126660 | 8EA5 | 8BC0 | 8636 | BA01 | 001D | 4C8B | 8B06 | 83F9 |
| 0000126700 | 0FE1 | CA0A | 4C89 | 8306 | F0E7 | CF8B | E580 | B87F |
| 0000126720 | 0035 | E9D1 | E9D1 | E9D1 | E9D1 | E981 | 0433 | 047D |
| 0000126740 | D9F7 | 3FEB | 82E9 | FC00 | 3E8B | 0186 | C08C | D98C |
| 0000126760 | C18E | A5A5 | CD8E | 368B | 0186 | 80BA | 8B00 | 024C |
| 0000127000 | F98B | E183 | 0A7F | 89CA | 024C | E783 | 8B80 | 80CF |
| 0000127020 | 7FE5 | 18B8 | D100 | 8AE1 | 32CD | 81ED | 96E9 | 7D00 |
| 0000127040 | F748 | 3BD9 | 8BC8 | 7CEF | 8114 | 00E7 | 0B80 | 3BFA |
| 0000127060 | 74C8 | 8B0A | 8BC8 | 81EF | 00E5 | 2B80 | 33EA | 80D2 |
| 0000127100 | 08F9 | 147C | FA80 | F501 | 00B2 | D280 | 0A00 | C614 |
| 0000127120 | 0004 | E980 | 4608 | E7EB | 348A | 0CE3 | 88BB | 8A01 |
| 0000127140 | D7C1 | EE8A | E822 | 2C88 | 33C3 | 8BC9 | 8AD1 | C334 |
| 0000127160 | 01BB | 8A00 | 8AEF | E3E1 | D106 | D0EA | E2D7 | 0AFA |
| 0000127200 | 22D7 | 0ADE | 60D3 | 81FA | 01B2 | DA80 | 7400 | 8B02 |
| 0000127220 | 8AFD | D3CC | 8BE2 | 860E | 9801 | C803 | CE2B | F202 |
| 0000127240 | 3488 | 06E3 | 8046 | 0014 | FAE2 | 00C3 | C3F7 | 7F80 |
| 0000127260 | 4C74 | D3D1 | C3F5 | 57E9 | 8017 | 7FCC | E4D0 | 8BC3 |
| 0000127300 | 0244 | 8B26 | 025D | 80A9 | 747F | F7E1 | A9D0 | 7F80 |
| 0000127320 | D0F7 | E274 | D3F7 | C3F7 | 7F80 | D3F7 | D874 | EC8A |
| 0000127340 | EF32 | D578 | E3D1 | E0D1 | 0B73 | 8793 | 8CF7 | 8CC2 |
| 0000127360 | 8ED9 | 8EC1 | 3BDA | 75C3 | 8B05 | 2604 | 053B | F7C3 |
| 0000127400 | F0C3 | 747F | D15E | F5D3 | E9C3 | 1704 | CC80 | D07F |
| 0000127420 | C3E4 | 448B | 2606 | 5D8B | A906 | 7FF0 | E174 | D0F7 |
| 0000127440 | F0A9 | F77F | 74D0 | F7E2 | F7D3 | F0C3 | F77F | 74D3 |
| 0000127460 | 8AD8 | 32EC | 78EF | D1D5 | D1E3 | 73E0 | 930B | F787 |
| 0000127500 | C28C | D98C | C18E | DA8E | C33B | 1775 | 448B | 2604 |
| 0000127520 | 453B | 7504 | 8B0E | 0244 | 3B26 | 0245 | 0575 | 048B |
| 0000127540 | 3B26 | C305 | F787 | 458B | 8002 | 80F4 | 03EB | 458B |
| 0000127560 | 8B02 | 015D | 358A | 00B2 | CF80 | 8B80 | 024C | 7C8B |
| 0000127600 | 8BFF | 0174 | E781 | FF00 | CE81 | 8000 | C1D1 | C0D1 |
| 0000127620 | ED0A | 6574 | E40A | 5B74 | EC3A | 0573 | F387 | FA87 |
| 0000127640 | 2A91 | F6E5 | 80DC | 18FC | 4977 | C9D0 | E8D0 | D9D0 |
| 0000127660 | 8A91 | B5CD | E300 | 8055 | 0EF9 | 127C | D20B | 0374 |
| 0000127700 | CB80 | 8B01 | 33D3 | 80DB | 10E9 | 1D72 | 3E74 | F980 |
| 0000127720 | 7E05 | 0A2B | 74D2 | 8003 | 01CE | D68A | F38A | DF8A |
| 0000127740 | FD8A | E980 | 7708 | 7417 | D123 | D1E2 | FED3 | 75C1 |
| 0000127760 | EBF8 | 8B19 | 8BDE | 8BD7 | D0C1 | E9E8 | 0097 | C2F6 |
| 0000130000 | 743F | 8003 | 20CA | EBD1 | DAD1 | FAE2 | C2F6 | 743F |
| 0000130020 | 8003 | 20CA | E0D0 | 1470 | D703 | DE13 | 5073 | DBD1 |
| 0000130040 | DAD1 | C4FE | FC80 | 75FF | E945 | 15D6 | FA2B | F31B |
| 0000130060 | D78B | DE8B | 0A73 | D3F7 | DAF7 | 83F5 | 00D3 | D0F6 |
| 0000130100 | DB0B | 0B75 | EC80 | 7610 | 876A | 0BDA | 74DB | 0A64 |
| 0000130120 | 75FF | 800F | 08EC | 5B76 | FB8A | DE8A | F28A | D232 |
| 0000130140 | FF0A | 0A78 | CCFE | 4B74 | E2D1 | D3D1 | F671 | 3E80 |
| 0000130160 | 0190 | 7400 | E903 | 017C | FA80 | 7780 | 7207 | F614 |
| 0000130200 | 01C6 | 0F74 | C680 | 8301 | 00D3 | D773 | C4FE | FC80 |
| 0000130220 | 74FF | D03A | D1E0 | A9D8 | 7F80 | 1774 | 8024 | E780 |
| 0000130240 | 0A7F | 8BC7 | 863E | 8901 | 0245 | E38A | C68A | D589 |
| 0000130260 | F78B | 80C3 | 903E | 0001 | 0374 | 7EE9 | 3301 | 8BC0 |
| 0000130300 | 863E | 8901 | 0245 | 0589 | F78B | 79C3 | E9E6 | 1532 |
| 0000130320 | ADFC | 348B | D196 | D0E0 | 0AD8 | 74E4 | 8BD6 | 024D |
| 0000130340 | E1D1 | D9D0 | ED0A | CB74 | 3D8B | D88B | C132 | EC80 |
| 0000130360 | 8080 | 7FED | E502 | D370 | C480 | 8080 | FFFC | CD74 |

THU MAR 14 17:41:20 1991 LBIPMT.DLL PAGE 49, LINE 2833

| | | | | | | | | |
|---|---|---|---|---|---|---|---|---|
| 0000130400 | 3250 | 8AFF | 80EF | 80CB | C980 | 8B80 | 8BEB | F7C6 |
| 0000130420 | 8BE7 | 0BDA | 9FC0 | 8B50 | F7C5 | 03E7 | 83D8 | 00D2 |
| 0000130440 | FA8B | C18B | E6F7 | D803 | FA13 | 9E58 | 0374 | CB80 |
| 0000130460 | 8B01 | F6C5 | 03E1 | 8BC7 | 93D3 | 0A58 | 78FF | D10B |
| 0000130500 | D1E2 | 0AD3 | 75E4 | E90A | FF69 | C4FE | FC80 | 74FF |
| 0000130520 | E9AD | FF1A | F787 | 4D8B | D102 | D0E1 | 8BD9 | 0244 |
| 0000130540 | E0D1 | D8D0 | ED0A | 5C74 | E40A | DB74 | C132 | EC80 |
| 0000130560 | 8081 | 7FED | E52A | 0371 | 7BE9 | 80FF | 80C4 | FC80 |
| 0000130600 | 75FF | E903 | FF78 | 5D8B | 8A01 | 322D | 80C9 | 80CF |
| 0000130620 | 3E80 | 0190 | 7400 | D108 | D1EB | 02D9 | 903E | 5001 |
| 0000130640 | 548B | 8A01 | 3224 | 80C0 | 80CE | EAD1 | D8D1 | 1AE8 |
| 0000130660 | 8B00 | E8EE | 0011 | C20B | D68B | 0374 | CA80 | 8B01 |
| 0000130700 | E9DD | FF76 | 42E9 | 3B14 | 73D3 | F71D | 96F3 | C033 |
| 0000130720 | 15E3 | FA8B | C68B | E1F7 | D8F7 | FA1B | D78B | 0773 |
| 0000130740 | 034E | 13C1 | 73D3 | C3F9 | FFBE | 2BFF | 03C1 | 8BD0 |
| 0000130760 | 73C1 | C3ED | 06C6 | 0190 | 8A00 | 922E | 0A01 | 74ED |
| 0000131000 | 8007 | DEED | EC3A | 3C77 | E40A | 3874 | 36FF | 0186 |
| 0000131020 | 06C7 | 0186 | 0193 | 5350 | 3352 | 32D2 | E8DB | FE4E |
| 0000131040 | 5B5A | C758 | 8606 | 9701 | 5001 | 5253 | FF32 | 0FE8 |
| 0000131060 | 5AFE | 585B | 068F | 0186 | 33E9 | 33FE | 33C0 | 33D8 |
| 0000131100 | A2D2 | 0190 | 36FF | 0186 | 06C7 | 0186 | 0197 | 5350 |
| 0000131120 | E852 | FE1A | C033 | 93A3 | A301 | 0195 | D3EB | F787 |
| 0000131140 | 6D8B | 8106 | 00F5 | EB80 | 8B1D | 8BF7 | 863E | A501 |
| 0000131160 | A5A5 | 80AD | 7FE4 | E680 | 0A80 | ABE6 | 368B | 0186 |
| 0000131200 | FE8B | 8BC3 | 066D | 8BFC | 0644 | E5D1 | DED0 | E0D1 |
| 0000131220 | DAD0 | E025 | 74FF | 83D2 | E0E5 | E83B | 0977 | F787 |
| 0000131240 | 8695 | 0BD6 | 74C0 | 2BC2 | F7C5 | 3DD8 | 06A0 | B977 |
| 0000131260 | E6D0 | DDD1 | E2D0 | DDD1 | D157 | D1C0 | D1C0 | 86C0 |
| 0000131300 | 8BE0 | ACF8 | E08A | C032 | AD92 | AD91 | AD93 | E480 |
| 0000131320 | 800F | 10CC | FF0B | 6374 | FF83 | 7C0E | 0B18 | 74D2 |
| 0000131340 | 8003 | 01C9 | D18B | CB8B | D88B | C033 | EF83 | 771D |
| 0000131360 | 74E7 | 7248 | 8323 | 06FF | 2B7C | D2CA | 0374 | CE80 |
| 0000131400 | 8A01 | 8AD6 | 8AF1 | 8ACD | 8AEB | 8ADF | 8AF8 | 32C4 |
| 0000131420 | 83E4 | 08EF | 0F77 | 2374 | E2D1 | D1D1 | D3D1 | D0D1 |
| 0000131440 | 7547 | EBF5 | 8716 | F6CF | 3FC2 | 0374 | CA80 | D120 |
| 0000131460 | D1E8 | D1DB | D1DF | E2DA | 87F6 | 5ECF | F697 | 3FC2 |
| 0000131500 | 0374 | CA80 | D120 | 70E5 | D13B | D0E5 | 02D8 | 1334 |
| 0000131520 | 014C | 5C13 | 5003 | 509F | 748B | 8105 | FFE6 | 810F |
| 0000131540 | 00CE | 5810 | 589E | FE13 | C7F7 | 2000 | 1374 | DFD1 |
| 0000131560 | DBD1 | D9D1 | DAD1 | C583 | 8320 | E0FD | 0375 | 81E9 |
| 0000131600 | E912 | 0087 | E5D1 | D8D0 | D0F6 | 342A | 4C1B | 1B01 |
| 0000131620 | 035C | 748B | 9F05 | E681 | 0FFF | CE81 | 1000 | 1B9E |
| 0000131640 | 73FE | 3313 | F6F6 | F7D0 | F7D7 | F7D3 | F7D1 | F5DA |
| 0000131660 | CE13 | DE13 | FE13 | BEFC | 0004 | FF0B | 1875 | C7F6 |
| 0000131700 | 75E0 | 8113 | 00ED | 7602 | 4E40 | 3D74 | FB8B | D93B |
| 0000131720 | CA8B | D233 | E4EB | C7F7 | 1FE0 | 1875 | ED81 | 0100 |
| 0000131740 | 2776 | 8A97 | 8AE0 | 8AC7 | 8AFB | 8ADD | 8AE9 | 8ACE |
| 0000131760 | B2F2 | 9700 | C7F7 | 1000 | 1175 | ED83 | 7420 | D170 |
| 0000132000 | D1E2 | D1D1 | D1D3 | EBD7 | EBEB | FC64 | 3E80 | 01A8 |
| 0000132020 | 7400 | E903 | 0385 | FA80 | 7780 | 7207 | F61F | 01C6 |
| 0000132040 | 1A74 | C680 | 8301 | 00D1 | D383 | 8300 | 00D7 | C7F7 |
| 0000132060 | 2000 | 0874 | C583 | 8320 | E0FD | 3074 | F78B | 3E8B |
| 0000132100 | 0186 | DE87 | 8024 | E780 | D10F | 74ED | 8622 | 32E0 |
| 0000132120 | 0BC0 | 0AC5 | 89C7 | 0645 | 5D88 | 8A05 | AAC6 | C18B |
| 0000132140 | 8BAB | ABC6 | EF83 | 8B05 | C3F7 | 0379 | 93E9 | FC11 |
| 0000132160 | 3E80 | 01A8 | 7400 | E903 | 0377 | C033 | 3E8B | 0186 |
| 0000132200 | F78B | ABAB | ABAB | FE8B | FCC3 | 448B | 8B06 | 25D0 |
| 0000132220 | 7FF0 | DB74 | 4D8B | 3306 | 81D1 | F0E1 | 747F | D1D0 |
| 0000132240 | D1E0 | 2DE1 | 8000 | E981 | 7FE0 | C103 | BC70 | 0005 |

THU MAR 14 17:41:20 1991 LBIPMT.DLL PAGE 50, LINE 2892

| | | | | | | | | |
|---|---|---|---|---|---|---|---|---|
| 0000132260 | 3D80 | FFE0 | B674 | E6D0 | D8D1 | E850 | 0181 | 0374 |
| 0000132300 | CA80 | 5D01 | E5D1 | D8D0 | C7F7 | 1000 | 0E75 | E2D1 |
| 0000132320 | D1D1 | D3D1 | D7D1 | ED0B | 0A75 | 93EB | C583 | 8320 |
| 0000132340 | E0FD | 8874 | 24E9 | E9FF | 111F | F787 | 8BFC | 064D |
| 0000132360 | D18B | E181 | 7FF0 | EF74 | 448B | 3306 | 25D0 | 7FF0 |
| 0000132400 | 9B74 | E0D1 | E1D1 | 202D | 8180 | E0E9 | 2B7F | 70C1 |
| 0000132420 | 059B | 8000 | E03D | 74FF | D09B | D1E6 | 50D8 | 8AAC |
| 0000132440 | 32E8 | ADC9 | AD93 | AD92 | E480 | 800F | 10CC | 5092 |
| 0000132460 | F78B | C683 | BF05 | 01A6 | ADFD | E480 | 800F | 10CC |
| 0000132500 | A5AB | 46A5 | A447 | C6FC | 0005 | 3E80 | 01A8 | 7400 |
| 0000132520 | FD1F | A6BF | 8B01 | ADF7 | E88B | E8D1 | 2602 | 01A8 |
| 0000132540 | D1AB | ADED | D8D1 | ADAB | D8D1 | ADAB | D8D1 | FCAB |
| 0000132560 | D158 | D1EA | D1D8 | D1DB | E8D9 | 003F | E857 | 003B |
| 0000132600 | E857 | 0037 | E857 | 0033 | C30B | C10B | C20B | D78B |
| 0000132620 | 5B59 | 745F | 8003 | 01CA | C2F6 | 7407 | 8003 | 08CA |
| 0000132640 | EFD1 | DBD1 | D9D1 | DAD1 | EFD1 | DBD1 | D9D1 | DAD1 |
| 0000132660 | EFD1 | DBD1 | D9D1 | DAD1 | 08E9 | 8BFF | A636 | 3301 |
| 0000132700 | 3BFF | 73D6 | 0B5C | 75D2 | 3B04 | 77F0 | F73B | 52F6 |
| 0000132720 | 3397 | 8BED | A1F5 | 01A0 | C00B | 0474 | E7F7 | F28B |
| 0000132740 | A150 | 01A2 | C00B | 0674 | E7F7 | F003 | EA13 | A4A1 |
| 0000132760 | 0B01 | 74C0 | F708 | 03E7 | 83E8 | 00D2 | 5A92 | DAF7 |
| 0000133000 | CE1B | DD1B | 1B5D | 95E8 | 9192 | 7393 | 4F13 | 0E03 |
| 0000133020 | 01A0 | 1E13 | 01A2 | 0613 | 01A4 | 1613 | 01A6 | ED73 |
| 0000133040 | 4FC3 | 0E2B | 01A0 | 1E1B | 01A2 | 061B | 01A4 | 0E03 |
| 0000133060 | 01A2 | 1E13 | 01A4 | C213 | 168B | 01A0 | EBF5 | 8AC9 |
| 0000133100 | 0644 | E432 | 0F24 | 100C | 9CA3 | 8A01 | 0645 | 0F24 |
| 0000133120 | 100C | 9EA3 | 3301 | 8BDB | 8BEB | E30C | 911A | 0D8B |
| 0000133140 | 08E3 | E1F7 | E88B | CA8B | 048B | 558B | 0B02 | 74D2 |
| 0000133160 | F706 | 03E2 | 13C8 | 55DA | ED33 | 448B | 0B02 | 74C0 |
| 0000133200 | 8B0E | 0B15 | 74D2 | F708 | 03E2 | 13C8 | D1DA | 58D5 |
| 0000133220 | C10B | 8B50 | 0244 | C00B | 0D74 | 558B | 0B02 | 74D2 |
| 0000133240 | F706 | 03E2 | 13D8 | 33EA | 8BC9 | 0B04 | 74C0 | 8B0F |
| 0000133260 | 0455 | D20B | 0874 | E2F7 | D803 | EA13 | D1D1 | 448B |
| 0000133300 | 0B04 | 74CD | 8B0F | 0B15 | 74D2 | F709 | 03E2 | 13D8 |
| 0000133320 | 83EA | 00D1 | 0B58 | 50C3 | 048B | C00B | 0874 | 26F7 |
| 0000133340 | 019E | E803 | CA13 | 058B | C00B | 0874 | 26F7 | 019C |
| 0000133360 | E803 | CA13 | DB33 | 448B | 0B02 | 74C0 | 8B0F | 0455 |
| 0000133400 | D20B | 0874 | E2F7 | E803 | CA13 | D3D1 | 448B | 0B04 |
| 0000133420 | 74C0 | 8B10 | 0255 | D20B | 0974 | E2F7 | E803 | CA13 |
| 0000133440 | D383 | 5500 | ED33 | 458B | 0B02 | 74C0 | F708 | 9C26 |
| 0000133460 | 0301 | 13C8 | 8BDA | 0244 | C00B | 0874 | 26F7 | 019E |
| 0000133500 | C803 | DA13 | 448B | 0B04 | 74C0 | 8B1A | 0455 | D20B |
| 0000133520 | 0B74 | E2F7 | C803 | DA13 | D5D1 | 448B | F704 | 9E26 |
| 0000133540 | 0301 | 13D8 | 8BEA | 0445 | C00B | 0874 | 26F7 | 019C |
| 0000133560 | D803 | EA13 | 9CA0 | F601 | 9E26 | 0301 | 97C5 | D15A |
| 0000133600 | D1E2 | D1D1 | D1D3 | D1D7 | D1E2 | D1D1 | D1D3 | D1D7 |
| 0000133620 | D1E2 | D1D1 | D1D3 | 5ED7 | F60B | C6C3 | A806 | 0001 |
| 0000133640 | 368B | 01A9 | F60B | 0874 | EE81 | 04C0 | F53B | 5077 |
| 0000133660 | ED0B | 4C74 | 36FF | 0186 | 06C7 | 0186 | 01AB | 5150 |
| 0000133700 | 5352 | 5755 | DB33 | C933 | D233 | 3EE8 | 5FFC | 5B5D |
| 0000133720 | 595A | C758 | 8606 | B301 | 5001 | 5251 | 5553 | 3357 |
| 0000133740 | E8FF | FBD2 | 5D5F | 5A5B | 5859 | 068F | 0186 | 1AE9 |
| 0000133760 | 33FC | 33C0 | 33C9 | 33D2 | 33DB | 33ED | A2FF | 01A8 |
| 0000134000 | 36FF | 0186 | 06C7 | 0186 | 01B3 | 5150 | 5352 | 5755 |
| 0000134020 | F8E8 | BFFB | 01AB | C033 | ABAB | ABAB | C6EB | 5653 |
| 0000134040 | 648A | 2E09 | 478A | 2509 | 8080 | C43A | 1675 | C683 |
| 0000134060 | 830A | 0AC3 | 05B9 | 8300 | 02EE | EB83 | 8B02 | 2E04 |
| 0000134100 | 073B | F3E1 | 5B5E | 56C3 | 95AD | 92AD | 93AD | 33AD |
| 0000134120 | B9FF | 0005 | E8D1 | DBD1 | DAD1 | DDD1 | DFD1 | F4E2 |

THU MAR 14 17:41:20 1991 LBIPMT.DLL PAGE 51, LINE 2951

| | | | | | | | | |
|---|---|---|---|---|---|---|---|---|
| 0000134140 | E3D1 | D0D1 | 013D | F500 | DBD1 | FE2D | 5E03 | 3C89 |
| 0000134160 | 6C89 | 8902 | 0454 | 5C89 | 8906 | 0844 | 66C3 | FFFC |
| 0000134200 | FFFF | FFFF | 00FF | CD00 | CCCC | CCCC | CCCC | FDCC |
| 0000134220 | BEFF | 01C8 | 04C6 | C601 | 0144 | 3330 | 8BC0 | 40D0 |
| 0000134240 | 075B | C31F | E81E | 05C4 | C08E | FC50 | BCBF | 5701 |
| 0000134260 | 04B9 | F300 | 5EA5 | D88E | 4C8B | 8006 | 0764 | B37F |
| 0000134300 | F720 | F0C1 | 747F | 0B06 | 79C9 | B302 | 532D | 76E8 |
| 0000134320 | 33FF | BEFF | 01C3 | A8AC | 7480 | 8AB6 | ADF8 | FE05 |
| 0000134340 | 8B3F | BAC8 | 4D10 | E2F7 | B091 | F64D | 03E4 | 13C8 |
| 0000134360 | B0D7 | F69A | 03E7 | 13C8 | 81FA | F4E9 | 8112 | 43DF |
| 0000134400 | 5713 | DFF7 | BCBE | E801 | 053D | 3DBB | E8B5 | FF0E |
| 0000134420 | 725F | 4709 | BB57 | B547 | C6E8 | 5F03 | AD57 | AD97 |
| 0000134440 | AD95 | AD92 | AD93 | F791 | 8BD9 | 33F7 | E3C0 | D10C |
| 0000134460 | D1EB | D1DA | D1DD | D0DE | E2DC | 80F4 | 56C4 | D681 |
| 0000134500 | 039A | E913 | D113 | D913 | C9BF | B901 | 0010 | C032 |
| 0000134520 | 5351 | 5552 | 5056 | E4D0 | D6D1 | D5D1 | D2D1 | D3D1 |
| 0000134540 | D0D0 | E4D0 | D6D1 | D5D1 | D2D1 | D3D1 | D0D0 | 0259 |
| 0000134560 | 59E5 | F113 | 1359 | 59E9 | D113 | 1359 | 14D9 | D000 |
| 0000134600 | D1E4 | D1D6 | D1D5 | D1D2 | D0D3 | 04D0 | AA30 | E259 |
| 0000134620 | 4FBD | B049 | FD30 | AEF3 | 83FC | 12C1 | C8BE | 8801 |
| 0000134640 | B80C | 0001 | 5B5A | 1F07 | 58C3 | C980 | 8030 | 40C9 |
| 0000134660 | D78B | FF33 | EF8B | 9FE8 | 3301 | E9DB | 00C6 | 1E89 |
| 0000134700 | 01E8 | DB33 | 26E8 | 7202 | 8BE1 | E8F8 | 021F | E072 |
| 0000134720 | 8B50 | F7C7 | E826 | 8B01 | 8BF8 | 8BEA | F7C3 | E82E |
| 0000134740 | 0B01 | 75D2 | 03C4 | 8BC5 | 72D8 | 58BE | F803 | D383 |
| 0000134760 | 7300 | EBD8 | 50B5 | 5153 | E852 | 0470 | D88E | C08E |
| 0000135000 | 595A | 585B | 89FC | DE3E | D301 | 89CE | E00E | A301 |
| 0000135020 | 01EA | 1689 | 01EC | C033 | E4A3 | A301 | 01E2 | E6A3 |
| 0000135040 | 9101 | 585A | A258 | 01DA | A258 | 01DB | E852 | 01AD |
| 0000135060 | 0375 | CD80 | 0B80 | 75DB | E885 | 00E7 | DB33 | FDE8 |
| 0000135100 | 7401 | 4E41 | 443C | 1C74 | 453C | 1274 | 3E80 | 01DB |
| 0000135120 | 7400 | 3C31 | 742B | 3C06 | 742D | 7502 | 4E27 | C981 |
| 0000135140 | 0402 | 03EB | C980 | C70E | EA06 | 0001 | 4600 | 6CE8 |
| 0000135160 | 9F01 | E850 | 008B | C5F6 | 7502 | 8003 | 40C9 | 9E58 |
| 0000135200 | 0275 | DBF7 | 3E8B | 01EA | FF0B | 0675 | C1F7 | 1872 |
| 0000135220 | 0374 | C980 | 0330 | 03FB | E63E | F601 | 10C5 | 0475 |
| 0000135240 | 3E2B | 01EC | FF81 | 0190 | 507F | 5156 | F2BE | E801 |
| 0000135260 | 0395 | 3E8B | 01DE | 06C6 | 01FC | E800 | 01AD | 5E59 |
| 0000135300 | 3875 | EEA1 | 8B01 | F01E | F601 | 80C5 | 1374 | D3F7 |
| 0000135320 | D8F7 | 83F5 | 00D3 | 45F7 | F006 | 747F | 8004 | 074D |
| 0000135340 | 8380 | E43E | 0701 | 0376 | C980 | 8A08 | FC2E | 8301 |
| 0000135360 | E43E | 0001 | 0375 | CD80 | C302 | C980 | C301 | FFBB |
| 0000135400 | C63F | E806 | 0A01 | E4E8 | 7200 | 8117 | CCFB | 770C |
| 0000135420 | 80ED | 02CD | E3D1 | C303 | E3D1 | E3D1 | D803 | DE78 |
| 0000135440 | DFEB | 33C3 | 8BFF | 8BEF | 8BDF | E8D7 | 00D6 | 2872 |
| 0000135460 | E850 | 008A | 0358 | 83D0 | 00D3 | D583 | 8300 | 00D7 |
| 0000135500 | FF81 | 1999 | E572 | BBE8 | 7200 | 0A0D | 74C0 | 8003 |
| 0000135520 | 01CA | 06FF | 01E6 | EEEB | C78B | C50B | 060B | 01E6 |
| 0000135540 | 1675 | C7F6 | 7480 | F617 | 80C5 | 0F74 | FB81 | 8000 |
| 0000135560 | 0975 | D20B | 0575 | 06EB | C980 | 8010 | 20C9 | 1689 |
| 0000135600 | 01EE | 1E89 | 01F0 | C78B | C50B | C30B | C20B | 1C74 |
| 0000135620 | FF81 | 1999 | 0973 | 25E8 | FF00 | E60E | EB01 | B8F1 |
| 0000135640 | 0040 | FF0B | 0678 | E848 | 002A | F6EB | 8B56 | BFF7 |
| 0000135660 | 01F2 | AB92 | AB93 | AB95 | AB96 | AB92 | C35E | 5557 |
| 0000135700 | 8B53 | E8C2 | 000E | 0BE8 | 0300 | 58D0 | D813 | 1358 |
| 0000135720 | 58E8 | F813 | E2D1 | D3D1 | D5D1 | D7D1 | E8C3 | 005E |
| 0000135740 | 0874 | 2D3C | 0674 | 2B3C | 0175 | 4E46 | E8C3 | 004E |
| 0000135760 | 4A74 | 302C | 4572 | 093C | 027E | 072C | 063A | 01E8 |
| 0000136000 | 397D | 1DEB | 37E8 | 7400 | 3C33 | 742E | 2C20 | 7230 |

THU MAR 14 17:41:20 1991 LBIPMT.DLL PAGE 52, LINE 3010

| | | | | | | | | |
|---|---|---|---|---|---|---|---|---|
| 0000136020 | 3C2A | 7709 | F626 | 10C5 | 0E74 | DEFF | 01E6 | CD80 |
| 0000136040 | FF08 | E406 | 3201 | C3E4 | CD80 | EB20 | F6F4 | 10C5 |
| 0000136060 | 0975 | 06FF | 01E2 | CD80 | EB10 | 4EC9 | C3F9 | 363B |
| 0000136100 | 01E0 | 2473 | AC36 | 3E80 | 01DA | 7400 | 3C10 | 7420 |
| 0000136120 | 3CED | 7409 | 3CE9 | 740A | 3CE5 | 740D | 3CE1 | 7261 |
| 0000136140 | 3C06 | 777A | 2402 | C35F | C032 | 57C3 | 92AD | 91AD |
| 0000136160 | 95AD | 8BAD | 0BF8 | 0BC5 | 0BC1 | 74C2 | AD49 | FE05 |
| 0000136200 | 7803 | D13E | D1E7 | D1E8 | BBDF | 0005 | E2D1 | D1D1 |
| 0000136220 | D5D1 | D7D1 | D0D1 | D7D0 | CBFE | F075 | 2243 | 0AD9 |
| 0000136240 | 33D3 | 81F6 | 01FA | F580 | CE13 | EE13 | FE13 | C613 |
| 0000136260 | D780 | A900 | FFF0 | 0E74 | F03D | F57F | D780 | EB00 |
| 0000136300 | 800F | FC0E | 0101 | C033 | D88B | C88B | E88B | F88B |
| 0000136320 | F78B | 895F | 890D | 026D | 7589 | 8904 | 0645 | FF0A |
| 0000136340 | BDC3 | 01FE | 08B9 | 8B00 | 33FD | F3C0 | 2EAB | 478B |
| 0000136360 | 0108 | 0844 | 07BF | B800 | 0004 | C72B | E022 | C42A |
| 0000136400 | C42A | D8F6 | 0404 | 8B98 | 53C8 | 2B56 | 2BD9 | 83DF |
| 0000136420 | 08C3 | F103 | F72B | C683 | 8B06 | 2E04 | 27F7 | 013E |
| 0000136440 | 0046 | 113E | 0256 | 833E | 0456 | 8300 | 02EE | C383 |
| 0000136460 | E202 | 5EE6 | 835B | 02C5 | 754F | 83BC | 0EED | F587 |
| 0000136500 | 91AD | 0BAD | ADC8 | C80B | CD0A | 92AD | D10A | 97AD |
| 0000136520 | 91AD | 93AD | 8BAD | 0BF5 | 78C0 | FF0D | 084C | E2D1 |
| 0000136540 | D7D1 | D1D1 | D3D1 | D0D1 | 01BD | 2300 | 0BEF | 33D5 |
| 0000136560 | 81ED | 01FA | F580 | FD13 | CD13 | DD13 | C513 | D5D1 |
| 0000136600 | 6C01 | D108 | 0BCD | 89C5 | 893C | 024C | 5C89 | 8904 |
| 0000136620 | 0644 | 00C3 | 0000 | 0000 | 0000 | 04A0 | 0000 | 0000 |
| 0000136640 | 0000 | 0000 | 07C8 | 0000 | 0000 | 0000 | 4000 | 0E9C |
| 0000136660 | 0000 | 0000 | 0000 | BC20 | 1BBE | 0000 | 0000 | BF04 |
| 0000136700 | 1BC9 | 368E | 9E00 | 70B5 | A82B | C5AD | 6B9D | D500 |
| 0000136720 | CFA6 | 49FF | 781F | D5C2 | E000 | E98C | C980 | BA47 |
| 0000136740 | AA93 | 8E01 | F9DE | FB9D | 7EEB | 53AA | CD03 | CCCC |
| 0000136760 | CCCC | CCCC | FDCC | 0AFF | A3D7 | 3D70 | D70A | FAA3 |
| 0000137000 | 2CFF | 1965 | 58E2 | B717 | F3D1 | FDFF | 61CE | 1184 |
| 0000137020 | CC77 | E6AB | 5BFF | 4DE1 | BEC4 | 9594 | CBE6 | BAFF |
| 0000137040 | 3994 | AD45 | B11E | 96CF | A5FF | 39E9 | 27A5 | 7FEA |
| 0000137060 | 2CA8 | A1FF | BCE4 | 7C64 | D046 | 57DD | 3AFE | 7A19 |
| 0000137100 | 2563 | 3143 | AEC0 | BBFC | BA53 | FF0B | 0579 | ADBB |
| 0000137120 | F7BA | 83DF | 0AEB | C383 | 0B0A | 74FF | D10D | 73EF |
| 0000137140 | 53F5 | E857 | FE7B | 5B5F | ECEB | 00C3 | 02C8 | 0000 |
| 0000137160 | 061E | 4DB8 | 8E92 | E8D8 | DC1A | C28E | D88B | 8B26 |
| 0000137200 | 0647 | C00B | 3275 | 3A68 | 1602 | 468D | 50FE | 006A |
| 0000137220 | 149A | 0093 | 0B00 | 75C0 | 8B23 | FE46 | 8926 | 0647 |
| 0000137240 | 561E | 8E57 | 33C0 | B8FF | FFFF | D88E | F633 | 3AB9 |
| 0000137260 | F302 | 8CA4 | 5FC0 | 1F5E | 1F07 | C3C9 | 46C7 | 00FE |
| 0000137300 | EB00 | 00F5 | 5756 | D88C | C08E | 32BE | BF33 | 3162 |
| 0000137320 | 0AB9 | F300 | 5FA5 | CB5E | D08C | C08E | 04EB | D88C |
| 0000137340 | C08E | 531E | 85E8 | 5BFF | D88E | 5756 | F38B | 1E8B |
| 0000137360 | 0186 | C383 | 8B0C | 8CFB | 8CC0 | 8ED9 | 8EC1 | FCD8 |
| 0000137400 | A5A5 | D98E | F38B | FB81 | 0172 | 4374 | 1E89 | 0186 |
| 0000137420 | 7789 | C6FC | FE47 | 5F03 | 1F5E | 8CCB | 8ED0 | EBC0 |
| 0000137440 | 8C04 | 8ED8 | 1EC0 | E853 | FF42 | 8E5B | 56D8 | 8B57 |
| 0000137460 | 8BF3 | 861E | 8301 | 0CC3 | FB8B | C08C | D98C | C18E |
| 0000137500 | D88E | A5FC | A5A5 | 8EA5 | 8BD9 | 81F3 | 72FB | 7401 |
| 0000137520 | 890F | 861E | C601 | FE47 | 8907 | FC77 | 5E5F | CB1F |
| 0000137540 | B4E9 | 1E06 | E853 | FF04 | 8E5B | 56D8 | 8C57 | EBD0 |
| 0000137560 | 1E0E | 1E07 | E853 | FEF4 | 8E5B | 56D8 | 8C57 | 8CC0 |
| 0000137600 | 8ED9 | 8EC1 | FCD8 | F38B | 1E8B | 0186 | C383 | 8B0C |
| 0000137620 | ADFB | 4588 | A5FE | 3CA5 | 7403 | A502 | 81A5 | 72FB |
| 0000137640 | 7401 | 89BD | 861E | 8901 | FC5F | D98E | 5E5F | CB1F |
| 0000137660 | D08C | C08E | 8B26 | 2607 | 578B | EB02 | 8C14 | 8ED0 |

THU MAR 14 17:41:20 1991 LBIPMT.DLL PAGE 53, LINE 3069

| | | | | | | | | |
|---|---|---|---|---|---|---|---|---|
| 0000137700 | 26C0 | 078B | EB99 | 8B0A | 8B07 | 0257 | 03EB | 078B |
| 0000137720 | 1E99 | 5250 | E853 | FE94 | 8E5B | 5AD8 | 5658 | 8B57 |
| 0000137740 | 8BDA | 8AD0 | 24C7 | 7980 | F707 | F7DB | 83DA | 00DB |
| 0000137760 | 3E8B | 0186 | C783 | 810C | 72FF | 7401 | 891D | 863E |
| 0000140000 | 8901 | FC7D | D98C | C18E | FF80 | 7500 | C610 | FE45 |
| 0000140020 | B403 | E89E | F02A | 5E5F | CB1F | 43E9 | C6FF | FE45 |
| 0000140040 | 5507 | 60BD | 8B87 | 33CB | 8BDB | E8FB | F388 | 5F5D |
| 0000140060 | 1F5E | 1ECB | E853 | FE34 | 8E5B | 56D8 | 8C57 | 8ED8 |
| 0000140100 | 8BC0 | 863E | 8B01 | FC75 | 458A | 83FE | 0CC7 | FF81 |
| 0000140120 | 0172 | A774 | 3E89 | 0186 | 7D89 | 88FC | FE45 | A5FC |
| 0000140140 | 3CA5 | 7403 | A502 | 5FA5 | 1F5E | 1ECB | E853 | FDFC |
| 0000140160 | 8E5B | 56D8 | 8B57 | 863E | 8301 | 0CC7 | FF81 | 0172 |
| 0000140200 | 9874 | 3E89 | 0186 | 7D89 | C6FC | FE45 | 8C03 | 8ED8 |
| 0000140220 | 33C0 | FCC0 | ABAB | 5E5F | CB1F | D08C | 02EB | D88C |
| 0000140240 | C08E | 531E | C5E8 | 5BFD | D88E | 5756 | FB8B | 8BFC |
| 0000140260 | 861E | 8301 | 8606 | 0C01 | 19EB | D08C | 02EB | D88C |
| 0000140300 | C08E | 531E | A5E8 | 5BFD | D88E | 5756 | FB8B | 8BFC |
| 0000140320 | 861E | 8001 | FE7F | 7503 | 8B0E | FC77 | A5A5 | 2E83 |
| 0000140340 | 0186 | 5F0C | 1F5E | 55CB | 2689 | 022E | 778B | 57FC |
| 0000140360 | 26E8 | 5FEA | DE8B | EB5D | 8CE3 | EBD0 | 8C02 | 8ED8 |
| 0000140400 | 1EC0 | E853 | FD66 | 8E5B | 56D8 | 8B57 | FCFB | 1E8B |
| 0000140420 | 0186 | 0683 | 0186 | EB0C | 8C19 | EBD0 | 8C02 | 8ED8 |
| 0000140440 | 1ECD | E853 | FD46 | 8E5B | 56D8 | 8B57 | FCFB | 1E8B |
| 0000140460 | 0186 | 7F80 | 07FE | 1075 | 778B | A5FC | A5A5 | 83A5 |
| 0000140500 | 862E | 0C01 | 5E5F | CB1F | DF87 | 3DE8 | 8BE9 | 87F7 |
| 0000140520 | EBDF | 8CE8 | EBD0 | 8C02 | 8ED8 | 1EC0 | E853 | FD0C |
| 0000140540 | 8E5B | 56D8 | 8B57 | 8BFB | 861E | 8301 | 8606 | 0C01 |
| 0000140560 | 18EB | D08C | 02EB | D88C | C08E | 531E | EDE8 | 5BFC |
| 0000140600 | D88E | 5756 | FB8B | 1E8B | 0186 | F38B | 478A | 83FE |
| 0000140620 | 862E | 0C01 | ABFC | A5A5 | 033C | 0274 | A5A5 | 5E5F |
| 0000140640 | CB1F | C5B8 | BAA8 | A8CF | 4BEB | F3B8 | BAA8 | A8F8 |
| 0000140660 | 43EB | F39A | BBBE | 9FA2 | 2688 | 022C | 84B8 | BABE |
| 0000140700 | BE89 | 31EB | 9BE8 | EBEA | E80D | EA9B | 08EB | EAE8 |
| 0000140720 | EBEA | E803 | EAB0 | 8A50 | 2C26 | 9E02 | 7358 | F707 |
| 0000140740 | 83D8 | 00D2 | DAF7 | 9AC3 | BEF3 | BE75 | 8A9F | B8FC |
| 0000140760 | BE8E | 93BA | 1EBE | 5350 | 5251 | E853 | FC6E | 8E5B |
| 0000141000 | 5AD8 | 5B59 | 5658 | 8857 | 2C3E | 5502 | 2689 | 022E |
| 0000141020 | 5153 | 368B | 0186 | EE83 | 890C | 8636 | 8001 | 0A7C |
| 0000141040 | 8B03 | 0874 | 0475 | D0FF | 02EB | D2FF | 5B59 | 5F5D |
| 0000141060 | 1F5E | 1ECB | E853 | FC34 | 8E5B | 57D8 | 3E8B | 0186 |
| 0000141100 | 5D8A | 32FE | F6FF | 7F01 | 1475 | FB80 | 7403 | F609 |
| 0000141120 | FF41 | 75F0 | 5F09 | CB1F | 41F6 | 80FF | F774 | 01F6 |
| 0000141140 | 5F80 | 751F | 0B03 | CBE4 | CBF9 | 531E | FDE8 | 5BFB |
| 0000141160 | D88E | 8B57 | 863E | 8A01 | FE5D | FF32 | 2180 | 5F7F |
| 0000141200 | CB1F | 531E | E5E8 | 5BFB | D88E | 5756 | 3E8B | 0186 |
| 0000141220 | 5D8A | 8BFE | FC75 | F73B | 0975 | FF32 | 3130 | 5F80 |
| 0000141240 | 1F5E | 89CB | FC7D | D98C | C18E | A5FC | FB80 | 7503 |
| 0000141260 | AD09 | F480 | AB80 | 5E5F | CB1F | A5A5 | 80AD | 80F4 |
| 0000141300 | 5FAB | 1F5E | 1ECB | E853 | FBA2 | 8E5B | 56D8 | 8C57 |
| 0000141320 | 8ED0 | EBC0 | 1E0A | E853 | FB92 | 8E5B | 56D8 | E857 |
| 0000141340 | E77A | 04EB | 071E | EDEB | 08B8 | E900 | 00C7 | 531E |
| 0000141360 | 79E8 | 5BFB | D88E | 5756 | D08C | C08E | 0AEB | 531E |
| 0000141400 | 69E8 | 5BFB | D88E | 5756 | 51E8 | EBE7 | 1E04 | EB07 |
| 0000141420 | B8ED | 0004 | 9EE9 | 1E00 | E853 | FB50 | 8E5B | 56D8 |
| 0000141440 | 8C57 | 8ED0 | EBC0 | 1E0A | E853 | FB40 | 8E5B | 56D8 |
| 0000141460 | E857 | E728 | 04EB | 071E | EDEB | 0CB8 | EB00 | 1E76 |
| 0000141500 | E853 | FB28 | 8E5B | 56D8 | 8C57 | 8ED0 | EBC0 | 1E0A |
| 0000141520 | E853 | FB18 | 8E5B | 56D8 | E857 | E700 | 04EB | 071E |
| 0000141540 | EDEB | 14B8 | EB00 | 1E4E | E853 | FB00 | 8E5B | 56D8 |

THU MAR 14 17:41:20 1991 LBIPMT.DLL PAGE 54, LINE 3128

| | | | | | | | | |
|---|---|---|---|---|---|---|---|---|
| 0000141560 | 8C57 | 8ED0 | EBC0 | 1E0A | E853 | FAF0 | 8E5B | 56D8 |
| 0000141600 | E857 | E6D8 | 04EB | 071E | EDEB | 10B8 | EB00 | 1E26 |
| 0000141620 | E853 | FAD8 | 8E5B | 56D8 | 8C57 | 8ED0 | EBC0 | 1E0A |
| 0000141640 | E853 | FAC8 | 8E5B | 56D8 | E857 | E6B0 | 04EB | 071E |
| 0000141660 | EDEB | 00B8 | 8B00 | 8BD8 | 863E | 8C01 | 8ED9 | 80C1 |
| 0000141700 | FE7D | 7407 | 8711 | FC7D | 8955 | 2E26 | FF02 | 1097 |
| 0000141720 | 5D02 | 5E5F | CB1F | C383 | BF02 | 0008 | BAE8 | 8BE6 |
| 0000141740 | 8BF7 | 863E | EB01 | 1EDE | E853 | FA80 | 8E5B | 56D8 |
| 0000141760 | 8C57 | 8ED0 | EBC0 | 1E0A | E853 | FA70 | 8E5B | 56D8 |
| 0000142000 | E857 | E66E | 04EB | 071E | EDEB | 0AB8 | E900 | 00C7 |
| 0000142020 | 531E | 57E8 | 5BFA | D88E | 5756 | D08C | C08E | 0AEB |
| 0000142040 | 531E | 47E8 | 5BFA | D88E | 5756 | 45E8 | EBE6 | 1E04 |
| 0000142060 | EB07 | B8ED | 0006 | 9EE9 | 1E00 | E853 | FA2E | 8E5B |
| 0000142100 | 56D8 | 8C57 | 8ED0 | EBC0 | 1E0A | E853 | FA1E | 8E5B |
| 0000142120 | 56D8 | E857 | E61C | 04EB | 071E | EDEB | 0EB8 | EB00 |
| 0000142140 | 1E76 | E853 | FA06 | 8E5B | 56D8 | 8C57 | 8ED0 | EBC0 |
| 0000142160 | 1E0A | E853 | F9F6 | 8E5B | 56D8 | E857 | E5F4 | 04EB |
| 0000142200 | 071E | EDEB | 16B8 | EB00 | 1E4E | E853 | F9DE | 8E5B |
| 0000142220 | 56D8 | 8C57 | 8ED0 | EBC0 | 1E0A | E853 | F9CE | 8E5B |
| 0000142240 | 56D8 | E857 | E5CC | 04EB | 071E | EDEB | 12B8 | EB00 |
| 0000142260 | 1E26 | E853 | F9B6 | 8E5B | 56D8 | 8C57 | 8ED0 | EBC0 |
| 0000142300 | 1E0A | E853 | F9A6 | 8E5B | 56D8 | E857 | E5A4 | 04EB |
| 0000142320 | 071E | EDEB | 02B8 | 8B00 | 8BD8 | 863E | 8C01 | 8ED9 |
| 0000142340 | 80C1 | FE7D | 7407 | 5605 | 9FE8 | 5EE5 | D6E9 | BBFE |
| 0000142360 | 0004 | 21EB | 08BB | EB00 | BB1C | 000C | 17EB | 10BB |
| 0000142400 | EB00 | BB12 | 0014 | 0DEB | 00BB | EB00 | BB08 | 001C |
| 0000142420 | 03EB | 18BB | 1E00 | E853 | F952 | 8E5B | 56D8 | 8B57 |
| 0000142440 | 863E | 8001 | FE7D | 7407 | 803A | F27D | 7407 | 832C |
| 0000142460 | 0CEF | 3E89 | 0186 | D88C | C08E | 758B | 89FC | FC7D |
| 0000142500 | 7D8B | 8308 | 1CFB | 3073 | FB83 | 7318 | 5540 | 2689 |
| 0000142520 | 022E | 97FF | 0210 | 5F5D | 1F5E | 83CB | 02C3 | 29E8 |
| 0000142540 | EBE5 | 83CC | 02C3 | 7D80 | 07F2 | C374 | EF83 | 890C |
| 0000142560 | 863E | E801 | E514 | BEEB | F787 | 2E83 | 0186 | 550C |
| 0000142600 | 2689 | 022E | 97FF | 020C | 5F5D | 1F5E | 83CB | 862E |
| 0000142620 | 0C01 | 8955 | 2E26 | FF02 | 1097 | 5D02 | 259F | 4100 |
| 0000142640 | E8D1 | E4D0 | E00A | 5E5F | 9E1F | D0CB | D0E3 | 8AE3 |
| 0000142660 | D0FB | 02E7 | 32DF | EBFF | BB03 | 000C | 531E | ABE8 |
| 0000142700 | 5BF8 | D88E | 5756 | D88C | C08E | 8BFC | 8636 | 4E01 |
| 0000142720 | 8B4E | 2BFE | B9FB | 0005 | 87AD | 8905 | FE44 | 1D8B |
| 0000142740 | 4747 | F4E2 | 5E5F | CB1F | 5756 | E81E | F87E | D88E |
| 0000142760 | 3E8B | 0186 | 7D80 | 07FE | 0374 | 8DE8 | 1FE4 | 5E5F |
| 0000143000 | 00CB | 3068 | B034 | EB84 | 6813 | 3330 | 83B0 | 0CEB |
| 0000143020 | 3068 | B031 | EB81 | 6805 | 3031 | 8AB0 | 681E | BB33 |
| 0000143040 | 831F | 303E | 0033 | 0674 | 1EFF | 332E | C31F | F59A |
| 0000143060 | AAC2 | 1FBE | 55C3 | EC8B | EC83 | 1E02 | DEBB | 8EC2 |
| 0000143100 | 8BDB | 085E | 1E89 | 334A | 8C3C | 0675 | 06C7 | 334A |
| 0000143120 | 3231 | E42A | 4689 | 9AFE | 722C | C2F1 | 46BB | 9A33 |
| 0000143140 | A414 | C31A | FDB8 | 5000 | A69A | 2273 | 8BC3 | FE46 |
| 0000143160 | E405 | 50FF | A69A | 2B73 | FFC3 | FE76 | 2E9A | 3771 |
| 0000143200 | 1FC3 | E58B | CB5D | 8B55 | 83EC | 64EC | 5756 | 331E |
| 0000143220 | 8BDB | 1056 | 01B8 | E800 | 002B | 763B | 730C | 8005 |
| 0000143240 | 40C9 | 0D89 | 5F1F | 8B5E | 5DE5 | 55CB | EC8B | EC83 |
| 0000143260 | 5664 | 1E57 | C033 | D233 | 5E8B | E810 | 0007 | 5F1F |
| 0000143300 | 8B5E | 5DE5 | FCCB | 5055 | 006A | 006A | D08C | C08E |
| 0000143320 | D88E | 4E8B | 830C | 64F9 | 0676 | 40B1 | F633 | 26EB |
| 0000143340 | 76C5 | 8D08 | 9C7E | A4F3 | D88E | 4E8B | 8D0C | 9C76 |
| 0000143360 | 7689 | 8B08 | 0E46 | 4E01 | BF08 | 0230 | F6E8 | 5DF2 |
| 0000143400 | 762B | 0308 | 0C76 | 7E8B | 3606 | 0D89 | 8936 | 0275 |
| 0000143420 | 8936 | 0445 | 8936 | 065D | 30BE | 8B02 | 3604 | 4589 |

THU MAR 14 17:41:20 1991 LBIPMT.DLL PAGE 55, LINE 3187

| | | | | | | | | |
|---|---|---|---|---|---|---|---|---|
| 0000143440 | 8B08 | 0244 | 8936 | 0A45 | 448B | 3604 | 4589 | 8B0C |
| 0000143460 | 0644 | 8936 | 0E45 | C78B | D28C | 00C3 | 8B55 | 56EC |
| 0000143500 | 1E57 | 1F16 | 768D | 5506 | 59E8 | 5DF1 | 8B1F | 26C8 |
| 0000143520 | 98AC | FE8B | F803 | C626 | 0005 | 7E8B | 320E | 36FF |
| 0000143540 | 1D89 | 8936 | 0255 | 8936 | 044D | 8936 | 0675 | 8C36 |
| 0000143560 | 0845 | D28C | C78B | 5E5F | E58B | CB5D | 8B55 | 83EC |
| 0000143600 | 0AEC | 5EC4 | 2606 | 078A | 8B98 | F6D8 | 8187 | 0131 |
| 0000143620 | 0674 | 478D | EB20 | 9008 | 5E8B | 2606 | 078A | 3D98 |
| 0000143640 | 0065 | 1374 | 46FF | C406 | 065E | 8A26 | 9807 | D88B |
| 0000143660 | 87F6 | 3181 | 7504 | C4ED | 065E | 8A26 | 8807 | FE46 |
| 0000143700 | C626 | 2E07 | 46FF | C406 | 065E | 8A26 | 8807 | FC46 |
| 0000143720 | 468A | 26FE | 0788 | 468A | 88FC | FE46 | 5EC4 | FF06 |
| 0000143740 | 0646 | 8026 | 003F | DF75 | E58B | CB5D | 8B55 | 83EC |
| 0000143760 | 08EC | 09EB | 8026 | 2E3F | 0C74 | 46FF | C406 | 065E |
| 0000144000 | 8026 | 003F | EE75 | 46FF | 2606 | 3F80 | 7400 | EB56 |
| 0000144020 | 9010 | 8026 | 653F | 1274 | 8026 | 453F | 0C74 | 46FF |
| 0000144040 | 8B06 | 065E | 8026 | 003F | E875 | C38B | C28C | 4EFF |
| 0000144060 | 8906 | FC46 | 5689 | EBFE | 9004 | 4EFF | 8B06 | 065E |
| 0000144100 | 8026 | 303F | F474 | 8026 | 2E3F | 0375 | 4EFF | C406 |
| 0000144120 | FC5E | 46FF | 26FC | 078A | 46FF | C406 | 065E | 8826 |
| 0000144140 | 0A07 | 75C0 | 8BEA | 5DE5 | 90CB | 8B55 | 8DEC | C81E |
| 0000144160 | 9A33 | BBE1 | C53C | 5EC4 | 9A06 | BBE5 | C541 | CD9A |
| 0000144200 | 6DC1 | 72C5 | B807 | 0001 | E58B | CB5D | C02B | E58B |
| 0000144220 | CB5D | 8B55 | 83EC | 10EC | 5657 | 7E83 | 0006 | 2274 |
| 0000144240 | 76FF | FF0E | 0C76 | 468D | 50F8 | 609A | 8F94 | 8BC5 |
| 0000144260 | 1EF0 | 1F16 | 7EC4 | A508 | A5A5 | 1FA5 | 5F5E | E58B |
| 0000144300 | CB5D | 76FF | FF0E | 0C76 | 468D | 50F0 | 609A | 9694 |
| 0000144320 | 8BC5 | 9AD8 | BBDB | C59E | 5EC4 | 9A08 | BD82 | C63E |
| 0000144340 | 5F5E | E58B | CB5D | 8B55 | 83EC | 06EC | 5657 | 5EC4 |
| 0000144360 | 2612 | 478B | 4802 | 7E80 | 0016 | 2E74 | 8326 | 2D3F |
| 0000144400 | 0675 | 01B8 | EB00 | 9003 | C02B | 4603 | 8B0A | 0C56 |
| 0000144420 | 4689 | 89FA | FC56 | 5052 | 7E83 | 000E | 067E | 01B8 |
| 0000144440 | EB00 | 9003 | C02B | E850 | 045C | 468B | 8B0A | 0C56 |
| 0000144460 | 4689 | 89FA | FC56 | 5EC4 | 2612 | 3F83 | 752D | 8E0C |
| 0000144500 | 8BC2 | 26D8 | 07C6 | 402D | 4689 | 83FA | 0E7E | 7E00 |
| 0000144520 | C412 | FA5E | 8A26 | 0147 | 8826 | 4307 | 5E89 | 26FA |
| 0000144540 | 07C6 | B82E | 334C | 501E | 7E80 | 0116 | C01B | D8F7 |
| 0000144560 | 4603 | 8BFA | FC56 | 4603 | 520E | 9A50 | 937A | C6F1 |
| 0000144600 | C483 | 8908 | FA46 | 5689 | 83FC | 107E | 7400 | C407 |
| 0000144620 | FA5E | C626 | 4507 | 46FF | C4FA | 125E | C426 | 067F |
| 0000144640 | 8026 | 303D | 5C74 | 468E | 2614 | 778B | 4E02 | 0D79 |
| 0000144660 | C68B | D8F7 | F08B | 5EC4 | 26FA | 07C6 | FF2D | FA46 |
| 0000144700 | FE83 | 7C64 | 8B15 | B9C6 | 0064 | F799 | C4F9 | FA5E |
| 0000144720 | 0026 | 8B07 | 99C6 | F9F7 | F28B | 46FF | 83FA | 0AFE |
| 0000144740 | 157C | C68B | 0AB9 | 9900 | F9F7 | 5EC4 | 26FA | 0700 |
| 0000144760 | C68B | F799 | 8BF9 | 8BF2 | FFC6 | FA46 | 5EC4 | 26FA |
| 0000145000 | 0700 | 468B | 8B0A | 0C56 | 5F5E | E58B | CB5D | 8B55 |
| 0000145020 | 83EC | 28EC | 468D | 50EA | 468D | 50DC | 5EC4 | 2606 |
| 0000145040 | 77FF | 2606 | 77FF | 2604 | 77FF | 2602 | 37FF | FC9A |
| 0000145060 | 3EC3 | 83C7 | 0CC4 | 468D | 89DC | E646 | 568C | 16E8 |
| 0000145100 | 8B50 | 0E4E | 5141 | 7E83 | 000E | 067E | 01B8 | EB00 |
| 0000145120 | 9003 | C02B | 5EC4 | 89E6 | DA46 | 2650 | 078B | 4689 |
| 0000145140 | 58D8 | 8326 | 2D3F | 0675 | 01B8 | EB00 | 9003 | C02B |
| 0000145160 | 4603 | 03DA | 0A46 | 568B | 520C | 9A50 | 9532 | C863 |
| 0000145200 | C483 | 2A0A | 50C0 | 76FF | FFE8 | E676 | 76FF | FF10 |
| 0000145220 | 0E76 | 76FF | FF0C | 0A76 | 76FF | FF08 | 0676 | E80E |
| 0000145240 | FE44 | 468B | 8B0A | 0C56 | E58B | CB5D | 8B55 | 83EC |
| 0000145260 | 0CEC | C456 | 105E | 8B26 | 0247 | 8948 | FE46 | 7E80 |
| 0000145300 | 0014 | 3474 | 8326 | 2D3F | 0675 | 01B8 | EB00 | 9003 |

THU MAR 14 17:41:20 1991 LBIPMT.DLL PAGE 56, LINE 3246

| | | | | | | | | |
|---|---|---|---|---|---|---|---|---|
| 0000145320 | C02B | 4603 | 8B0A | 0C56 | 4689 | 89F4 | F656 | 4E8B |
| 0000145340 | 390E | FE4E | 1275 | C28E | D88B | 768B | 26FE | 00C6 |
| 0000145360 | 0330 | 43DE | C626 | 0007 | 468B | 8B0A | 0C56 | 4689 |
| 0000145400 | 89F4 | F656 | 5EC4 | 2610 | 3F83 | 752D | 8E0C | 8BC2 |
| 0000145420 | 26D8 | 07C6 | 402D | 4689 | C4F4 | 105E | 8326 | 027F |
| 0000145440 | 7F00 | FF19 | F676 | 76FF | B8F4 | 0001 | E850 | 0256 |
| 0000145460 | 5EC4 | 26F4 | 07C6 | FF30 | F446 | 07EB | 8B26 | 0247 |
| 0000145500 | 4601 | 83F4 | 0E7E | 7E00 | FF5F | F676 | 76FF | B8F4 |
| 0000145520 | 0001 | E850 | 0230 | 5EC4 | 26F4 | 07C6 | FF2E | F446 |
| 0000145540 | 5EC4 | 2610 | 7F83 | 0002 | 3E7D | 7E80 | 0014 | 0874 |
| 0000145560 | 8B26 | 0247 | D8F7 | 0EEB | 8B26 | 0247 | D8F7 | 463B |
| 0000145600 | 7E0E | 8B03 | 0E46 | 4689 | FF0E | F676 | 76FF | 50F4 |
| 0000145620 | F3E8 | FF01 | 0E76 | 30B8 | 5000 | 76FF | FFF6 | F476 |
| 0000145640 | 689A | 97A3 | 83C8 | 08C4 | 468B | 8B0A | 0C56 | 8B5E |
| 0000145660 | 5DE5 | 90CB | 8B55 | 83EC | 26EC | 468D | 50EA | 468D |
| 0000145700 | 50DC | 5EC4 | 2606 | 77FF | 2606 | 77FF | 2604 | 77FF |
| 0000145720 | 2602 | 37FF | FC9A | D1C3 | 83C8 | 0CC4 | 468D | 89DC |
| 0000145740 | E646 | 568C | 16E8 | 8B50 | DE4E | 4E03 | 510E | D88B |
| 0000145760 | 3650 | 078B | 4689 | 58DA | 8336 | 2D3F | 0675 | 01B8 |
| 0000146000 | EB00 | 9003 | C02B | 4603 | 8B0A | 0C56 | 5052 | 329A |
| 0000146020 | 3F95 | 83C3 | 0AC4 | C02A | FF50 | E876 | 76FF | FFE6 |
| 0000146040 | 0E76 | 76FF | FF0C | 0A76 | 76FF | FF08 | 0676 | E80E |
| 0000146060 | FE7A | 468B | 8B0A | 0C56 | E58B | CB5D | 8B55 | 83EC |
| 0000146100 | 32EC | 468D | 50E4 | 468D | 50D8 | 5EC4 | 2606 | 77FF |
| 0000146120 | 2606 | 77FF | 2604 | 77FF | 2602 | 37FF | FC9A | 59C3 |
| 0000146140 | 83C9 | 0CC4 | 468B | 48DA | 4689 | 8DE2 | D846 | 4689 |
| 0000146160 | 8CD4 | D656 | 5016 | 76FF | 8B0E | 36D8 | 3F83 | 752D |
| 0000146200 | B805 | 0001 | 02EB | C02B | 4603 | 8B0A | 0C56 | 4689 |
| 0000146220 | 89FC | FE56 | 5052 | 329A | 5895 | 83CA | 0AC4 | 468B |
| 0000146240 | 48DA | 4689 | 3BD2 | E246 | 047E | 01B0 | 02EB | C02A |
| 0000146260 | 4688 | 8BFA | D246 | 4689 | 3DE2 | FFFC | 057C | 463B |
| 0000146300 | 7C0E | B027 | 5001 | 76FF | FFD6 | D476 | 76FF | FF10 |
| 0000146320 | 0E76 | 76FF | FF0C | 0A76 | 76FF | FF08 | 0676 | E80E |
| 0000146340 | FC04 | C483 | 8B12 | 5DE5 | 90CB | 7E80 | 00FA | 1474 |
| 0000146360 | 5EC4 | FFFC | FC46 | 8026 | 003F | F475 | 5E8B | 26FC |
| 0000146400 | 47C6 | 00FE | 01B0 | FF50 | D676 | 76FF | FFD4 | 0E76 |
| 0000146420 | 76FF | FF0C | 0A76 | 76FF | FF08 | 0676 | E80E | FD8C |
| 0000146440 | E58B | CB5D | 8B55 | 83EC | 0E7E | 7465 | 8306 | 0E7E |
| 0000146460 | 7545 | FF1D | 1276 | 76FF | FF10 | 0C76 | 76FF | FF0A |
| 0000146500 | 0876 | 76FF | 0E06 | C5E8 | 8BFC | 8BE5 | 5DE5 | 90CB |
| 0000146520 | 7E83 | 660E | 1675 | 76FF | FF10 | 0C76 | 76FF | FF0A |
| 0000146540 | 0876 | 76FF | 0E06 | 4BE8 | EBFE | 90DE | 76FF | FF12 |
| 0000146560 | 1076 | 76FF | FF0C | 0A76 | 76FF | FF08 | 0676 | E80E |
| 0000146600 | FEBA | E58B | CB5D | 8B55 | 83EC | 047E | 7400 | FF25 |
| 0000146620 | 0876 | 76FF | 9A06 | 93DA | CA72 | E58B | 5040 | 76FF |
| 0000146640 | FF08 | 0676 | 468B | 8B06 | 0856 | 4603 | 5204 | 9A50 |
| 0000146660 | A29E | C534 | E58B | C25D | 2D06 | 0200 | 1F00 | 01C9 |
| 0000146700 | 0000 | 0300 | AE01 | 0255 | F600 | 0300 | 0101 | 0256 |
| 0000146720 | F700 | 0200 | 8900 | 0297 | 0000 | 0300 | 1101 | 0100 |
| 0000146740 | 0300 | 0500 | DA00 | 010D | 6C00 | 0249 | 1F00 | 0397 |
| 0000146760 | 0000 | 0300 | A301 | 0252 | 7D00 | 0300 | 9201 | 0171 |
| 0000147000 | 0500 | 0300 | AE01 | 0101 | 0600 | 0300 | 5D01 | 0253 |
| 0000147020 | 7E00 | 0300 | 2A01 | 0171 | 0700 | 0300 | B601 | 016F |
| 0000147040 | 0800 | 0200 | 6800 | 04BB | 0000 | 0300 | 4501 | 018E |
| 0000147060 | 8900 | 0300 | 2801 | 01A4 | 8A00 | 0200 | 8900 | 056C |
| 0000147100 | 0000 | 0300 | 0101 | 0197 | 8C00 | 0300 | 2301 | 0197 |
| 0000147120 | 8D00 | 0300 | DD01 | 0196 | 8E00 | 0200 | FD00 | 06C2 |
| 0000147140 | 0000 | 0300 | 4001 | 0253 | 0800 | 0300 | E201 | 0255 |
| 0000147160 | 8B00 | 0500 | 8901 | 0196 | 8700 | 0500 | 9B01 | 01A3 |

```
THU MAR 14 17:41:20 1991  LBIPMT.DLL  PAGE 57, LINE 3305

0000147200  8800  0300  BC01  019E  2100  0300  5101  01BB
0000147220  2200  0300  8E01  0197  2600  0500  9500  0152
0000147240  0F00  0353  9B01  0255  1F00  0301  7801  0150
0000147260  2C00  0300  4E01  0155  2E00  0500  6200  0150
0000147300  9900  0354  DF01  018E  3A00  0300  8401  0254
0000147320  B300  0300  FF01  018B  3B00  0300  3C01  01A4
0000147340  3C00  0300  C101  0255  3A00  0300  F601  0255
0000147360  3B00  0300  C301  018C  4400  0300  D601  018B
0000147400  4600  0300  F701  018C  4B00  0300  1F01  018C
0000147420  4D00  0300  0701  0170  5B00  0300  6F01  0158
0000147440  5E00  0000  0000  0000  0000  0000  0000  0000
0000147460  0000  0000  0200  0000  0000  0000  0000  0000
0000147500  0000  0000  0000  0000  0000  0000  0000  0000
*
0000147560  0000  0000  0200  0000  0000  0000  0000  0000
0000147600  0000  0000  0000  0000  0000  0000  0000  0000
*
0000147660  0000  0000  0200  0000  0000  0000  0000  0000
0000147700  0000  0000  0000  0000  0000  0000  0000  0000
*
0000147760  0000  0000  0200  0000  0000  0000  0000  0000
0000150000  0000  0000  0000  0000  0000  0000  0000  0000
*
0000150600  0000  0000  0000  0016  FEFF  F8FC  E0F0  80C0
0000150620  0000  0000  0000  0000  0000  0000  0000  0000
*
0000151020  AC2E  AF43  AC26  AF20  AC24  AF1E  AD90  B149
0000151040  AE16  B1AC  AE14  B1AA  AB7F  ABD2  0000  0000
0000151060  0000  0000  0000  0000  534D  5220  6E75  542D
0000151100  6D69  2065  694C  7262  7261  2079  202D  6F43
0000151120  7970  6972  6867  2074  6328  2029  3931  3039
0000151140  202C  694D  7263  736F  666F  2074  6F43  7072
0000151160  0018  4200  4958  494E  0054  7862  6372  5700
0000151200  7261  696E  676E  203A  6942  2070  7953  7473
0000151220  6D65  772D  6469  2065  6F63  666E  6769  6175
0000151240  7472  6F69  206E  6966  656C  6E20  746F  6620
0000151260  756F  646E  0021  7355  6E69  2067  6874  2065
0000151300  6F66  6C6C  776F  6E69  2067  6168  6472  6F63
0000151320  6564  2064  6E69  7469  6169  206C  6564  6166
0000151340  6C75  7374  0A3A  000A  5842  4644  4C49  0045
0000151360  645F  6265  6775  4400  4544  4146  4C55  0054
0000151400  4444  4645  5541  544C  3000  4400  4544  4146
0000151420  4C55  2054  6E75  6564  6966  656E  2064  2021
0000151440  202D  6544  7562  2067  7574  6E72  6465  6F20
0000151460  6666  0A00  2020  4220  7069  4420  6265  6775
0000151500  6567  2072  6556  2E72  3220  322E  2D20  2820
0000151520  2943  5920  636F  6968  5320  6F6C  696E  206D
0000151540  3931  3039  000A  2020  2E20  2E2E  6E49  7469
0000151560  6169  696C  657A  0A64  0A00  420A  7069  5020
0000151600  6F72  6966  696C  676E  6D20  646F  2065  7369
0000151620  4F20  2C4E  4420  6265  6775  7420  7275  656E
0000151640  2064  666F  0A66  000A  5725  2025  4725  0025
0000151660  0000  0001  0000  0001  FFFF  FFFF  0000  0042
0000151700  3370  0001  0000  0001  0001  0001  0003  0001
0000151720  0001  0000  0001  0001  0001  0000  0000  5842
0000151740  0000  0000  0000  0000  0000  0000  0000  0000
*
0000152240  0000  0000  0000  6F6C  0067  0000  0000  0000
0000152260  0000  0000  0000  0000  0000  0000  0000  0000
```

THU MAR 14 17:41:20 1991 LBIPMT.DLL PAGE 58, LINE 3364

*

| | | | | | | | | |
|---|---|---|---|---|---|---|---|---|
| 0000152340 | 0000 | 0001 | 0001 | 0000 | 0000 | 0001 | 0001 | 000A |
| 0000152360 | 2840 | 2926 | 2050 | 6970 | 2064 | 255B | 5D64 | 7E20 |
| 0000152400 | 2520 | 0A73 | 4000 | 2628 | 5029 | 7020 | 6469 | 5B20 |
| 0000152420 | 6425 | 205D | 2528 | 2973 | 7E20 | 2520 | 0A73 | 7200 |
| 0000152440 | 5200 | 6165 | 6964 | 676E | 203A | 7325 | 0A20 | 7700 |
| 0000152460 | 4200 | 2E58 | 6E65 | 0076 | 5842 | 652E | 766E | 4300 |
| 0000152500 | 6E61 | 7427 | 7720 | 6972 | 6574 | 6520 | 766E | 7269 |
| 0000152520 | 6E6F | 656D | 746E | 6620 | 6C69 | 2065 | 7325 | 4200 |
| 0000152540 | 2E58 | 6E65 | 0076 | 7862 | 005F | 5842 | 005F | 7325 |
| 0000152560 | 3D20 | 2520 | 0A73 | 7200 | 4200 | 2E58 | 6E65 | 0076 |
| 0000152600 | 5842 | 652E | 766E | 4300 | 6E61 | 7427 | 6F20 | 6570 |
| 0000152620 | 206E | 6E65 | 6976 | 6F72 | 6D6E | 6E65 | 2074 | 6966 |
| 0000152640 | 656C | 2520 | 0073 | 5842 | 652E | 766E | 5200 | 6165 |
| 0000152660 | 6964 | 676E | 203A | 7325 | 000A | 0000 | 0000 | 0061 |
| 0000152700 | 7325 | 535F | 252E | 0073 | 7325 | 252E | 0073 | 7325 |
| 0000152720 | 255F | 2E73 | 7325 | 7700 | 6100 | 0000 | 0001 | 2D0A |
| 0000152740 | 2D2D | 2D2D | 2D2D | 2D2D | 202D | 6942 | 2070 | 706F |
| 0000152760 | 6974 | 6E6F | 2073 | 7564 | 706D | 2D20 | 2D2D | 2D2D |
| 0000153000 | 2D2D | 2D2D | 0A2D | 000A | 2D0A | 2D2D | 2D2D | 2D2D |
| 0000153020 | 2D2D | 202D | 6942 | 2070 | 6F4D | 6564 | 2073 | 2D2D |
| 0000153040 | 2D2D | 2D2D | 2D2D | 2D2D | 000A | 4223 | 5F58 | 4544 |
| 0000153060 | 5542 | 2047 | 203D | 6425 | 2820 | 6942 | 2070 | 6544 |
| 0000153100 | 7562 | 2067 | 6F6D | 6564 | 0A29 | 2300 | 5842 | 545F |
| 0000153120 | 4D49 | 5345 | 3D20 | 2520 | 2064 | 4228 | 7069 | 5020 |
| 0000153140 | 6F72 | 6966 | 656C | 6D20 | 646F | 2965 | 000A | 4223 |
| 0000153160 | 5F58 | 5245 | 4F52 | 5352 | 3D20 | 2520 | 2064 | 4228 |
| 0000153200 | 7069 | 4520 | 7272 | 726F | 2073 | 6F6D | 6564 | 0A29 |
| 0000153220 | 2300 | 5842 | 455F | 5252 | 524F | 5F53 | 4944 | 4C41 |
| 0000153240 | 474F | 3D20 | 2520 | 2064 | 4228 | 7069 | 6220 | 6572 |
| 0000153260 | 6B61 | 6F2D | 2D6E | 7265 | 6F72 | 2072 | 202D | 4D50 |
| 0000153300 | 6F20 | 6C6E | 2979 | 000A | 2D0A | 2D2D | 2D2D | 2D2D |
| 0000153320 | 2D2D | 202D | 6942 | 2070 | 6946 | 746C | 7265 | 2073 |
| 0000153340 | 2D2D | 2D2D | 2D2D | 2D2D | 2D2D | 000A | 4223 | 5F58 |
| 0000153360 | 5049 | 4F52 | 2043 | 203D | 6425 | 2820 | 6942 | 2070 |
| 0000153400 | 7270 | 636F | 7365 | 2073 | 6966 | 746C | 7265 | 0A29 |
| 0000153420 | 2300 | 5842 | 495F | 4854 | 4552 | 4441 | 3D20 | 2520 |
| 0000153440 | 2064 | 4228 | 7069 | 7420 | 7268 | 6165 | 2064 | 6966 |
| 0000153460 | 746C | 7265 | 0A29 | 2300 | 5842 | 495F | 4150 | 4B43 |
| 0000153500 | 3D20 | 2520 | 2064 | 4228 | 7069 | 7020 | 6361 | 616B |
| 0000153520 | 6567 | 6620 | 6C69 | 6574 | 2972 | 000A | 4223 | 5F58 |
| 0000153540 | 4649 | 4C49 | 2045 | 203D | 6425 | 2820 | 6942 | 2070 |
| 0000153560 | 6966 | 656C | 6620 | 6C69 | 6574 | 2972 | 000A | 4223 |
| 0000153600 | 5F58 | 4649 | 4C49 | 2045 | 203D | 6425 | 2820 | 6942 |
| 0000153620 | 2070 | 7566 | 636E | 6620 | 6C69 | 6574 | 2972 | 000A |
| 0000153640 | 2D0A | 2D2D | 2D2D | 2D2D | 2D2D | 202D | 7250 | 6E69 |
| 0000153660 | 2074 | 6F63 | 746E | 6F72 | 206C | 2D2D | 2D2D | 2D2D |
| 0000153700 | 2D2D | 2D2D | 000A | 4223 | 5F58 | 4E49 | 4544 | 544E |
| 0000153720 | 3D20 | 2520 | 2064 | 4928 | 646E | 6E65 | 2074 | 7473 |
| 0000153740 | 7065 | 0A29 | 2300 | 5842 | 505F | 5052 | 4F52 | 2043 |
| 0000153760 | 203D | 6425 | 2820 | 7270 | 6E69 | 2074 | 7270 | 636F |
| 0000154000 | 7365 | 2073 | 616E | 656D | 2973 | 000A | 4223 | 5F58 |
| 0000154020 | 5250 | 4854 | 4552 | 4441 | 3D20 | 2520 | 2064 | 7028 |
| 0000154040 | 6972 | 746E | 7420 | 7268 | 6165 | 2064 | 616E | 656D |
| 0000154060 | 2973 | 000A | 4223 | 5F58 | 5250 | 4150 | 4B43 | 3D20 |
| 0000154100 | 2520 | 2064 | 7028 | 6972 | 746E | 7020 | 6361 | 616B |
| 0000154120 | 6567 | 6E20 | 6D61 | 7365 | 0A29 | 2300 | 5842 | 505F |
| 0000154140 | 4652 | 4C49 | 2045 | 203D | 6425 | 2820 | 7270 | 6E69 |
| 0000154160 | 2074 | 6966 | 656C | 6E20 | 6D61 | 7365 | 0A29 | 2300 |

THU MAR 14 17:41:20 1991 LBIPMT.DLL PAGE 59, LINE 3423

| | | | | | | | | |
|---|---|---|---|---|---|---|---|---|
| 0000154200 | 5842 | 505F | 4652 | 4E55 | 2043 | 203D | 6425 | 2820 |
| 0000154220 | 7270 | 6E69 | 2074 | 7566 | 636E | 6E20 | 6D61 | 7365 |
| 0000154240 | 0A29 | 2300 | 5842 | 505F | 4C52 | 5645 | 4C45 | 3D20 |
| 0000154260 | 2520 | 2064 | 7028 | 6972 | 746E | 6420 | 6265 | 6775 |
| 0000154300 | 6C20 | 7665 | 6C65 | 2973 | 000A | 4223 | 5F58 | 4342 |
| 0000154320 | 444F | 5F45 | 4F4E | 4954 | 5946 | 3D20 | 2520 | 2064 |
| 0000154340 | 4228 | 6F63 | 6564 | 2928 | 6C20 | 6E69 | 2065 | 7270 |
| 0000154360 | 6665 | 7869 | 6320 | 6E6F | 7274 | 6C6F | 0A29 | 0A00 |
| 0000154400 | 2D2D | 2D2D | 2D2D | 2D2D | 2D2D | 4C20 | 676F | 6966 |
| 0000154420 | 656C | 6320 | 6E6F | 7274 | 6C6F | 2D20 | 2D2D | 2D2D |
| 0000154440 | 2D2D | 2D2D | 0A2D | 2300 | 5842 | 4C5F | 474F | 3D20 |
| 0000154460 | 2520 | 2064 | 4328 | 6572 | 7461 | 2065 | 6F6C | 2067 |
| 0000154500 | 6966 | 656C | 0A29 | 2300 | 5842 | 4C5F | 474F | 4946 |
| 0000154520 | 454C | 4E5F | 4D41 | 2045 | 203D | 7325 | 2820 | 616E |
| 0000154540 | 656D | 6F20 | 2066 | 6F6C | 6667 | 6C69 | 2965 | 000A |
| 0000154560 | 4223 | 5F58 | 4853 | 5241 | 4445 | 4C5F | 474F | 3D20 |
| 0000154600 | 2520 | 2064 | 6328 | 6572 | 7461 | 2065 | 6873 | 7261 |
| 0000154620 | 6465 | 6C20 | 676F | 6966 | 656C | 0A29 | 2300 | 5842 |
| 0000154640 | 465F | 554C | 4853 | 3D20 | 2520 | 2064 | 4228 | 7069 |
| 0000154660 | 6C20 | 676F | 6620 | 756C | 6873 | 6E69 | 2967 | 000A |
| 0000154700 | 2D0A | 2D2D | 2D2D | 2D2D | 2D2D | 202D | 744F | 6568 |
| 0000154720 | 2072 | 706F | 6974 | 6E6F | 2073 | 2D2D | 2D2D | 2D2D |
| 0000154740 | 2D2D | 2D2D | 000A | 4223 | 5F58 | 4953 | 474E | 454C |
| 0000154760 | 4C5F | 4E49 | 2045 | 203D | 6425 | 2820 | 6953 | 676E |
| 0000155000 | 656C | 6C20 | 6E69 | 2065 | 6544 | 7562 | 2067 | 6F4D |
| 0000155020 | 6564 | 0A29 | 2300 | 5842 | 455F | 4958 | 5F54 | 4F43 |
| 0000155040 | 464E | 5249 | 204D | 203D | 6425 | 2820 | 7845 | 7469 |
| 0000155060 | 6320 | 6E6F | 6966 | 6D72 | 7461 | 6F69 | 296E | 000A |
| 0000155100 | 4223 | 5F58 | 5544 | 504D | 4F5F | 5450 | 4F49 | 534E |
| 0000155120 | 3D20 | 2520 | 2064 | 4428 | 6D75 | 2070 | 6942 | 2070 |
| 0000155140 | 706F | 6974 | 6E6F | 2073 | 6E6F | 7320 | 6174 | 7472 |
| 0000155160 | 7075 | 0A29 | 0A00 | 2D2D | 2D2D | 2D2D | 2D2D | 2D2D |
| 0000155200 | 4520 | 646E | 6F20 | 2066 | 706F | 6974 | 6E6F | 2073 |
| 0000155220 | 2D2D | 2D2D | 2D2D | 2D2D | 2D2D | 0A0A | 0000 | 6174 |
| 0000155240 | 6962 | 696E | 3A74 | 6920 | 746E | 7265 | 616E | 206C |
| 0000155260 | 202D | 7973 | 626D | 6C6F | 7420 | 6261 | 656C | 6320 |
| 0000155300 | 6172 | 6873 | 0000 | 5725 | 2025 | 4725 | 0025 | 0000 |
| 0000155320 | 7953 | 746D | 6261 | 6928 | 736E | 7265 | 2974 | 2D20 |
| 0000155340 | 4E20 | 206F | 656D | 6F6D | 7972 | 6200 | 615F | 6C6C |
| 0000155360 | 2500 | 2073 | 253D | 2063 | 6200 | 705F | 7561 | 6573 |
| 0000155400 | 6200 | 625F | 6572 | 6B61 | 6200 | 745F | 6D69 | 0065 |
| 0000155420 | 742E | 2500 | 2E73 | 6425 | 0000 | 5725 | 2025 | 4725 |
| 0000155440 | 0025 | 5F62 | 6E65 | 6574 | 0072 | 2D2D | 2D2D | 003E |
| 0000155460 | 000A | 2D0A | 2D2D | 2D2D | 2D2D | 2D2D | 2D2D | 2D2D |
| 0000155500 | 2D2D | 2D2D | 2D2D | 2D2D | 2D2D | 2D2D | 2D2D | 2D2D |
| 0000155520 | 2D2D | 2D2D | 2D2D | 2D2D | 2D2D | 2D2D | 2D2D | 2D2D |
| 0000155540 | 2000 | 2020 | 2020 | 2020 | 2020 | 2020 | 2D2D | 0A2D |
| 0000155560 | 7320 | 6174 | 6B63 | 7020 | 2020 | 2020 | 4220 | 7069 |
| 0000155600 | 2020 | 2020 | 2020 | 2020 | 6972 | 746E | 756F | 2074 |
| 0000155620 | 4E00 | 746F | 3A65 | 4F20 | 2020 | 2020 | 2020 | 0A20 |
| 0000155640 | 7265 | 6527 | 2064 | 7566 | 6C6E | 2079 | 6542 | 746E |
| 0000155660 | 7261 | 2065 | 696C | 7473 | 636E | 6974 | 6E6F | 2073 |
| 0000155700 | 6500 | 3D20 | 6220 | 6465 | 6465 | 2020 | 2020 | 0A20 |
| 0000155720 | 6361 | 6974 | 6576 | 655F | 746E | 7265 | 6920 | 2073 |
| 0000155740 | 6E75 | 7463 | 6F69 | 6920 | 206E | 6874 | 7369 | 6620 |
| 0000155760 | 2D2D | 2D2D | 2D2D | 206E | 0A20 | 0A00 | 2D2D | 2D2D |
| * | | | | | | | | |
| 0000156020 | 2D2D | 2D2D | 2D2D | 2D2D | 0A0A | 6200 | 655F | 746E |
| 0000156040 | 7265 | 6500 | 2000 | 2000 | 0020 | 7325 | 7325 | 252F |

THU MAR 14 17:41:20 1991 LBIPMT.DLL PAGE 60, LINE 3482

| | | | | | | | | |
|---|---|---|---|---|---|---|---|---|
| 0000156060 | 2873 | 6425 | 2029 | 7325 | 000A | 5F62 | 6E65 | 6574 |
| 0000156100 | 0072 | 2D3C | 2D2D | 002D | 3F3F | 5520 | 6573 | 4220 |
| 0000156120 | 6572 | 7574 | 6E72 | 2928 | 2120 | 000A | 5F62 | 6E65 |
| 0000156140 | 6574 | 0072 | 2D3C | 2D2D | 002D | 3F3F | 203F | 7355 |
| 0000156160 | 2065 | 7242 | 7465 | 7275 | 286E | 2029 | 0A21 | 6200 |
| 0000156200 | 725F | 7465 | 7275 | 006E | 2D3C | 2D2D | 002D | 253F |
| 0000156220 | 3F73 | 6200 | 745F | 6D69 | 0065 | 000A | 0000 | 0000 |
| 0000156240 | 0000 | 0000 | 0000 | 0000 | 000A | 6E55 | 6E6B | 776F |
| 0000156260 | 206E | 7566 | 636E | 6974 | 6E6F | 7220 | 7465 | 7275 |
| 0000156300 | 206E | 7974 | 6570 | 2520 | 0064 | 6143 | 276E | 2074 |
| 0000156320 | 706F | 6E65 | 6620 | 6C69 | 2065 | 7325 | 6D20 | 646F |
| 0000156340 | 2065 | 7325 | 2500 | 0073 | 7325 | 6620 | 6961 | 656C |
| 0000156360 | 0064 | 7341 | 6573 | 7472 | 6F69 | 206E | 7325 | 6620 |
| 0000156400 | 6961 | 656C | 0064 | 7341 | 7573 | 706D | 6974 | 6E6F |
| 0000156420 | 2520 | 2073 | 6166 | 6C69 | 6465 | 2500 | 2073 | 6166 |
| 0000156440 | 6C69 | 6465 | 2E00 | 2E2E | 3000 | 0000 | 5725 | 2025 |
| 0000156460 | 4725 | 0025 | 0000 | 0AB8 | 0B0C | 0AC2 | 0B10 | 0AD6 |
| 0000156500 | 0B14 | 0AEB | 0B18 | 0AF5 | 0B1C | 0AF9 | 3388 | 0000 |
| 0000156520 | 0000 | 2290 | FFFF | 6548 | 706C | 202C | 6F43 | 746E |
| 0000156540 | 202C | 6E49 | 7469 | 202C | 6857 | 7265 | 2C65 | 6520 |
| 0000156560 | 6958 | 0074 | 280A | 6942 | 2970 | 3C20 | 7325 | 203E |
| 0000156600 | 203A | 7325 | 000A | 6548 | 706C | 202C | 6F43 | 746E |
| 0000156620 | 202C | 6E49 | 7469 | 202C | 6857 | 7265 | 2C65 | 6520 |
| 0000156640 | 6958 | 0074 | 202C | 6241 | 756F | 2074 | 6942 | 2070 |
| 0000156660 | 203A | 2000 | 0A00 | 4228 | 7069 | 2029 | 253C | 3E73 |
| 0000156700 | 3A20 | 2520 | 2073 | 7325 | 0A00 | 0A00 | 2020 | 4220 |
| 0000156720 | 7069 | 4420 | 6265 | 6775 | 6567 | 2072 | 6556 | 2E72 |
| 0000156740 | 3220 | 322E | 2D20 | 2820 | 2943 | 5920 | 636F | 6968 |
| 0000156760 | 5320 | 6F6C | 696E | 206D | 3931 | 3039 | 000A | 410A |
| 0000157000 | 6572 | 7920 | 756F | 7320 | 7275 | 2065 | 203F | 7928 |
| 0000157020 | 6E2F | 2029 | 0020 | 200A | 2020 | 3C3C | 203C | 7845 |
| 0000157040 | 7469 | 3E20 | 3E3E | 0A20 | 000A | 0000 | 200A | 2020 |
| 0000157060 | 2020 | 2020 | 4F20 | 7470 | 6F69 | 736E | 6120 | 6572 |
| 0000157100 | 203A | 0A0A | 4800 | 682C | 2D20 | 4720 | 7465 | 7420 |
| 0000157120 | 6968 | 2073 | 6568 | 706C | 7320 | 7263 | 6565 | 0A6E |
| 0000157140 | 4300 | 632C | 2D20 | 4320 | 6E6F | 6974 | 756E | 2065 |
| 0000157160 | 7865 | 6365 | 7475 | 6F69 | 206E | 5028 | 736F | 6973 |
| 0000157200 | 6C62 | 2079 | 6661 | 6574 | 2072 | 6E49 | 7469 | 0A29 |
| 0000157220 | 4900 | 692C | 2D20 | 4920 | 696E | 2C74 | 5220 | 2D65 |
| 0000157240 | 6572 | 6461 | 6420 | 6265 | 6775 | 6620 | 6C69 | 2065 |
| 0000157260 | 2026 | 6E65 | 6976 | 6F72 | 6D6E | 6E65 | 0A74 | 5800 |
| 0000157300 | 782C | 2D20 | 4520 | 6978 | 2C74 | 6320 | 6C61 | 206C |
| 0000157320 | 7375 | 7265 | 7420 | 7265 | 696D | 616E | 6974 | 6E6F |
| 0000157340 | 6620 | 6E75 | 7463 | 6F69 | 0A6E | 5700 | 772C | 2D20 |
| 0000157360 | 5720 | 6568 | 6572 | 202C | 6942 | 2070 | 7473 | 6361 |
| 0000157400 | 206B | 7270 | 6E69 | 6F74 | 7475 | 000A | 2C41 | 2061 |
| 0000157420 | 202D | 6241 | 756F | 2074 | 6942 | 0A70 | 0A00 | 6500 |
| 0000157440 | 4200 | 4441 | 4150 | 4B43 | 702E | 4200 | 6461 | 5020 |
| 0000157460 | 6361 | 616B | 6567 | 6E20 | 6D61 | 2165 | 2820 | 5842 |
| 0000157500 | 4150 | 4B43 | 6420 | 6665 | 6E69 | 7469 | 6F69 | 206E |
| 0000157520 | 7270 | 626F | 656C | 206D | 213F | 0029 | 6F4E | 6574 |
| 0000157540 | 7420 | 6168 | 2074 | 7073 | 6361 | 7365 | 6120 | 6572 |
| 0000157560 | 6E20 | 746F | 6120 | 6C6C | 776F | 6465 | 6920 | 206E |
| 0000157600 | 442D | 5842 | 4150 | 4B43 | 2E3D | 2E2E | 5300 | 7465 |
| 0000157620 | 6420 | 6265 | 6775 | 7620 | 7261 | 4220 | 4441 | 4150 |
| 0000157640 | 4B43 | 702E | 7420 | 206F | 6573 | 2065 | 7270 | 6E69 |
| 0000157660 | 6F74 | 7475 | 0073 | 5F62 | 6974 | 656D | 6200 | 705F |
| 0000157700 | 7561 | 6573 | 6200 | 705F | 7561 | 6573 | 6200 | 625F |
| 0000157720 | 6572 | 6B61 | 6200 | 625F | 6572 | 6B61 | 0000 | 0000 |

THU MAR 14 17:41:20 1991 LBIPMT.DLL PAGE 61, LINE 3541

| | | | | | | | | |
|---|---|---|---|---|---|---|---|---|
| 0000157740 | 0001 | 0072 | 0072 | 6142 | 2064 | 6974 | 656D | 2072 |
| 0000157760 | 6572 | 7571 | 7365 | 2074 | 6425 | 000A | 5F62 | 6974 |
| 0000160000 | 656D | 6200 | 745F | 6D69 | 0065 | 5F62 | 6974 | 656D |
| 0000160020 | 0A00 | 0A00 | 4200 | 6461 | 4420 | 6265 | 6775 | 4C20 |
| 0000160040 | 7665 | 6C65 | 6120 | 6772 | 6D75 | 6E65 | 2074 | 4D28 |
| 0000160060 | 7961 | 6220 | 2065 | 696D | 7373 | 6E69 | 2967 | 4300 |
| 0000160100 | 6568 | 6B63 | 7920 | 756F | 2072 | 6F73 | 7275 | 6563 |
| 0000160120 | 6320 | 646F | 2065 | 2121 | 0020 | 6142 | 2064 | 6544 |
| 0000160140 | 7562 | 2067 | 654C | 6576 | 206C | 7261 | 7567 | 656D |
| 0000160160 | 746E | 2820 | 614D | 2079 | 6562 | 6D20 | 7369 | 6973 |
| 0000160200 | 676E | 0029 | 6843 | 6365 | 206B | 6F79 | 7275 | 7320 |
| 0000160220 | 756F | 6372 | 2065 | 6F63 | 6564 | 2120 | 2021 | 0A00 |
| 0000160240 | 4200 | 6461 | 4420 | 6265 | 6775 | 4C20 | 7665 | 6C65 |
| 0000160260 | 6120 | 6772 | 6D75 | 6E65 | 2074 | 4D28 | 7961 | 6220 |
| 0000160300 | 2065 | 696D | 7373 | 6E69 | 2967 | 4300 | 6568 | 6B63 |
| 0000160320 | 7920 | 756F | 2072 | 6F73 | 7275 | 6563 | 6320 | 646F |
| 0000160340 | 2065 | 2121 | 0020 | 6142 | 2064 | 6544 | 7562 | 2067 |
| 0000160360 | 654C | 6576 | 206C | 7261 | 7567 | 656D | 746E | 2820 |
| 0000160400 | 614D | 2079 | 6562 | 6D20 | 7369 | 6973 | 676E | 0029 |
| 0000160420 | 6843 | 6365 | 206B | 6F79 | 7275 | 7320 | 756F | 6372 |
| 0000160440 | 2065 | 6F63 | 6564 | 2120 | 2021 | 2000 | 3C3C | 4320 |
| 0000160460 | 646F | 2065 | 3E3E | 000A | 000A | 5F62 | 7262 | 6165 |
| 0000160500 | 006B | 5F62 | 7262 | 6165 | 006B | 6954 | 656D | 0020 |
| 0000160520 | 000A | 0000 | 407E | 207E | 7325 | 2520 | 2073 | 7325 |
| 0000160540 | 2520 | 0073 | 000A | 5F62 | 6176 | 7372 | 6200 | 765F |
| 0000160560 | 7261 | 0073 | 5F62 | 6176 | 7372 | 6200 | 765F | 7261 |
| 0000160600 | 0073 | 5725 | 2025 | 4725 | 0025 | 2020 | 2030 | 3030 |
| 0000160620 | 2720 | 405E | 2027 | 554E | 004C | 2020 | 2031 | 3130 |
| 0000160640 | 2720 | 415E | 2027 | 4F53 | 0048 | 2020 | 2032 | 3230 |
| 0000160660 | 2720 | 425E | 2027 | 5453 | 0058 | 2020 | 2033 | 3330 |
| 0000160700 | 2720 | 435E | 2027 | 5445 | 0058 | 2020 | 2034 | 3430 |
| 0000160720 | 2720 | 445E | 2027 | 4F45 | 0054 | 2020 | 2035 | 3530 |
| 0000160740 | 2720 | 455E | 2027 | 4E45 | 0051 | 2020 | 2036 | 3630 |
| 0000160760 | 2720 | 465E | 2027 | 4341 | 004B | 2020 | 2037 | 3730 |
| 0000161000 | 2720 | 475E | 2027 | 4542 | 204C | 5C27 | 2761 | 2000 |
| 0000161020 | 3820 | 3020 | 2038 | 5E27 | 2748 | 4220 | 2053 | 5C27 |
| 0000161040 | 2762 | 2000 | 3920 | 3020 | 2039 | 5E27 | 2749 | 4820 |
| 0000161060 | 2054 | 5C27 | 2774 | 2000 | 3031 | 3020 | 2041 | 5E27 |
| 0000161100 | 274A | 4C20 | 2046 | 5C27 | 276E | 2000 | 3131 | 3020 |
| 0000161120 | 2042 | 5E27 | 274B | 5620 | 2054 | 5C27 | 2776 | 2000 |
| 0000161140 | 3231 | 3020 | 2043 | 5E27 | 274C | 4620 | 2046 | 5C27 |
| 0000161160 | 2766 | 2000 | 3331 | 3020 | 2044 | 5E27 | 274D | 4320 |
| 0000161200 | 2052 | 5C27 | 2772 | 2000 | 3431 | 3020 | 2045 | 5E27 |
| 0000161220 | 274E | 5320 | 004F | 3120 | 2035 | 4630 | 2720 | 4F5E |
| 0000161240 | 2027 | 5327 | 0049 | 3120 | 2036 | 3031 | 2720 | 505E |
| 0000161260 | 2027 | 4C44 | 0045 | 3120 | 2037 | 3131 | 2720 | 515E |
| 0000161300 | 2027 | 4344 | 0031 | 3120 | 2038 | 3231 | 2720 | 525E |
| 0000161320 | 2027 | 4344 | 0032 | 3120 | 2039 | 3331 | 2720 | 535E |
| 0000161340 | 2027 | 4344 | 0033 | 3220 | 2030 | 3431 | 2720 | 545E |
| 0000161360 | 2027 | 4344 | 0034 | 3220 | 2031 | 3531 | 2720 | 555E |
| 0000161400 | 2027 | 414E | 004B | 3220 | 2032 | 3631 | 2720 | 565E |
| 0000161420 | 2027 | 5953 | 004E | 3220 | 2033 | 3731 | 2720 | 575E |
| 0000161440 | 2027 | 5445 | 0042 | 3220 | 2034 | 3831 | 2720 | 585E |
| 0000161460 | 2027 | 4143 | 004E | 3220 | 2035 | 3931 | 2720 | 595E |
| 0000161500 | 2027 | 4D45 | 2000 | 3632 | 3120 | 2041 | 5E27 | 275A |
| 0000161520 | 5320 | 4255 | 2000 | 3732 | 3120 | 2042 | 5E27 | 275B |
| 0000161540 | 4520 | 4353 | 2000 | 3832 | 3120 | 2043 | 5E27 | 2027 |
| 0000161560 | 5346 | 2000 | 3932 | 3120 | 2044 | 5E27 | 275D | 4720 |
| 0000161600 | 0053 | 3320 | 2030 | 4531 | 2720 | 5E5E | 2027 | 5352 |

THU MAR 14 17:41:20 1991 LBIPMT.DLL PAGE 62, LINE 3600

| | | | | | | | | |
|---|---|---|---|---|---|---|---|---|
| 0000161620 | 2000 | 3133 | 3120 | 2046 | 5E27 | 275F | 5520 | 0053 |
| 0000161640 | 3320 | 2032 | 3032 | 2720 | 2720 | 2020 | 5053 | 2000 |
| 0000161660 | 3333 | 3220 | 2031 | 2127 | 0027 | 3320 | 2034 | 3232 |
| 0000161700 | 2720 | 225C | 0027 | 3320 | 2035 | 3332 | 2720 | 2723 |
| 0000161720 | 2000 | 3633 | 3220 | 2034 | 2427 | 0027 | 3320 | 2037 |
| 0000161740 | 3532 | 2720 | 2725 | 2000 | 3833 | 3220 | 2036 | 2627 |
| 0000161760 | 0027 | 3320 | 2039 | 3732 | 2720 | 275C | 0027 | 3420 |
| 0000162000 | 2030 | 3832 | 2720 | 2728 | 2000 | 3134 | 3220 | 2039 |
| 0000162020 | 2927 | 0027 | 3420 | 2032 | 4132 | 2720 | 272A | 2000 |
| 0000162040 | 3334 | 3220 | 2042 | 2B27 | 0027 | 3420 | 2034 | 4332 |
| 0000162060 | 2720 | 272C | 2000 | 3534 | 3220 | 2044 | 2D27 | 0027 |
| 0000162100 | 3420 | 2036 | 4532 | 2720 | 272E | 2000 | 3734 | 3220 |
| 0000162120 | 2046 | 2F27 | 0027 | 3420 | 2038 | 3033 | 2720 | 2730 |
| 0000162140 | 2000 | 3934 | 3320 | 2031 | 3127 | 0027 | 3520 | 2030 |
| 0000162160 | 3233 | 2720 | 2732 | 2000 | 3135 | 3320 | 2033 | 3327 |
| 0000162200 | 0027 | 3520 | 2032 | 3433 | 2720 | 2734 | 2000 | 3335 |
| 0000162220 | 3320 | 2035 | 3527 | 0027 | 3520 | 2034 | 3633 | 2720 |
| 0000162240 | 2736 | 2000 | 3535 | 3320 | 2037 | 3727 | 0027 | 3520 |
| 0000162260 | 2036 | 3833 | 2720 | 2738 | 2000 | 3735 | 3320 | 2039 |
| 0000162300 | 3927 | 0027 | 3520 | 2038 | 4133 | 2720 | 273A | 2000 |
| 0000162320 | 3935 | 3320 | 2042 | 3B27 | 0027 | 3620 | 2030 | 4333 |
| 0000162340 | 2720 | 273C | 2000 | 3136 | 3320 | 2044 | 3D27 | 0027 |
| 0000162360 | 3620 | 2032 | 4533 | 2720 | 273E | 2000 | 3336 | 3320 |
| 0000162400 | 2046 | 3F27 | 0027 | 3620 | 2034 | 3034 | 2720 | 2740 |
| 0000162420 | 2000 | 3536 | 3420 | 2031 | 4127 | 0027 | 3620 | 2036 |
| 0000162440 | 3234 | 2720 | 2742 | 2000 | 3736 | 3420 | 2033 | 4327 |
| 0000162460 | 0027 | 3620 | 2038 | 3434 | 2720 | 2744 | 2000 | 3936 |
| 0000162500 | 3420 | 2035 | 4527 | 0027 | 3720 | 2030 | 3634 | 2720 |
| 0000162520 | 2746 | 2000 | 3137 | 3420 | 2037 | 4727 | 0027 | 3720 |
| 0000162540 | 2032 | 3834 | 2720 | 2748 | 2000 | 3337 | 3420 | 2039 |
| 0000162560 | 4927 | 0027 | 3720 | 2034 | 4134 | 2720 | 274A | 2000 |
| 0000162600 | 3537 | 3420 | 2042 | 4B27 | 0027 | 3720 | 2036 | 4334 |
| 0000162620 | 2720 | 274C | 2000 | 3737 | 3420 | 2044 | 4D27 | 0027 |
| 0000162640 | 3720 | 2038 | 4534 | 2720 | 274E | 2000 | 3937 | 3420 |
| 0000162660 | 2046 | 4F27 | 0027 | 3820 | 2030 | 3035 | 2720 | 2750 |
| 0000162700 | 2000 | 3138 | 3520 | 2031 | 5127 | 0027 | 3820 | 2032 |
| 0000162720 | 3235 | 2720 | 2752 | 2000 | 3338 | 3520 | 2033 | 5327 |
| 0000162740 | 0027 | 3820 | 2034 | 3435 | 2720 | 2754 | 2000 | 3538 |
| 0000162760 | 3520 | 2035 | 5527 | 0027 | 3820 | 2036 | 3635 | 2720 |
| 0000163000 | 2756 | 2000 | 3738 | 3520 | 2037 | 5727 | 0027 | 3820 |
| 0000163020 | 2038 | 3835 | 2720 | 2758 | 2000 | 3938 | 3520 | 2039 |
| 0000163040 | 5927 | 0027 | 3920 | 2030 | 4135 | 2720 | 275A | 2000 |
| 0000163060 | 3139 | 3520 | 2042 | 5B27 | 0027 | 3920 | 2032 | 4335 |
| 0000163100 | 2720 | 5C5C | 0027 | 3920 | 2033 | 4435 | 2720 | 275D |
| 0000163120 | 2000 | 3439 | 3520 | 2045 | 5E27 | 0027 | 3920 | 2035 |
| 0000163140 | 4635 | 2720 | 275F | 2000 | 3639 | 3620 | 2030 | 6027 |
| 0000163160 | 0027 | 3920 | 2037 | 3136 | 2720 | 2761 | 2000 | 3839 |
| 0000163200 | 3620 | 2032 | 6227 | 0027 | 3920 | 2039 | 3336 | 2720 |
| 0000163220 | 2763 | 3100 | 3030 | 3620 | 2034 | 6427 | 0027 | 3031 |
| 0000163240 | 2031 | 3536 | 2720 | 2765 | 3100 | 3230 | 3620 | 2036 |
| 0000163260 | 6627 | 0027 | 3031 | 2033 | 3736 | 2720 | 2767 | 3100 |
| 0000163300 | 3430 | 3620 | 2038 | 6827 | 0027 | 3031 | 2035 | 3936 |
| 0000163320 | 2720 | 2769 | 3100 | 3630 | 3620 | 2041 | 6A27 | 0027 |
| 0000163340 | 3031 | 2037 | 4236 | 2720 | 276B | 3100 | 3830 | 3620 |
| 0000163360 | 2043 | 6C27 | 0027 | 3031 | 2039 | 4436 | 2720 | 276D |
| 0000163400 | 3100 | 3031 | 3620 | 2045 | 6E27 | 0027 | 3131 | 2031 |
| 0000163420 | 4636 | 2720 | 276F | 3100 | 3231 | 3720 | 2030 | 7027 |
| 0000163440 | 0027 | 3131 | 2033 | 3137 | 2720 | 2771 | 3100 | 3431 |
| 0000163460 | 3720 | 2032 | 7227 | 0027 | 3131 | 2035 | 3337 | 2720 |

THU MAR 14 17:41:20 1991 LBIPMT.DLL PAGE 63, LINE 3659

| | | | | | | | | |
|---|---|---|---|---|---|---|---|---|
| 0000163500 | 2773 | 3100 | 3631 | 3720 | 2034 | 7427 | 0027 | 3131 |
| 0000163520 | 2037 | 3537 | 2720 | 2775 | 3100 | 3831 | 3720 | 2036 |
| 0000163540 | 7627 | 0027 | 3131 | 2039 | 3737 | 2720 | 2777 | 3100 |
| 0000163560 | 3032 | 3720 | 2038 | 7827 | 0027 | 3231 | 2031 | 3937 |
| 0000163600 | 2720 | 2779 | 3100 | 3232 | 3720 | 2041 | 7A27 | 0027 |
| 0000163620 | 3231 | 2033 | 4237 | 2720 | 277B | 3100 | 3432 | 3720 |
| 0000163640 | 2043 | 7C27 | 0027 | 3231 | 2035 | 4437 | 2720 | 277D |
| 0000163660 | 3100 | 3632 | 3720 | 2045 | 7E27 | 0027 | 3231 | 2037 |
| 0000163700 | 4637 | 2720 | 3F5E | 2027 | 4544 | 004C | 3231 | 2038 |
| 0000163720 | 3038 | 2720 | 2D4D | 2740 | 3100 | 3932 | 3820 | 2031 |
| 0000163740 | 0127 | 0027 | 3331 | 2030 | 3238 | 2720 | 2702 | 3100 |
| 0000163760 | 3133 | 3820 | 2033 | 0327 | 0027 | 3331 | 2032 | 3438 |
| 0000164000 | 2720 | 2704 | 3100 | 3333 | 3820 | 2035 | 0527 | 0027 |
| 0000164020 | 3331 | 2034 | 3638 | 2720 | 2706 | 3100 | 3533 | 3820 |
| 0000164040 | 2037 | 0727 | 0027 | 3331 | 2036 | 3838 | 2720 | 2708 |
| 0000164060 | 3100 | 3733 | 3820 | 2039 | 4D27 | 5E2D | 2749 | 3100 |
| 0000164100 | 3833 | 3820 | 2041 | 4D27 | 5E2D | 274A | 3100 | 3933 |
| 0000164120 | 3820 | 2042 | 0B27 | 0027 | 3431 | 2030 | 4338 | 2720 |
| 0000164140 | 270C | 3100 | 3134 | 3820 | 2044 | 2727 | 3100 | 3234 |
| 0000164160 | 3820 | 2045 | 0E27 | 0027 | 3431 | 2033 | 4638 | 2720 |
| 0000164200 | 270F | 3100 | 3434 | 3920 | 2030 | 1027 | 0027 | 3431 |
| 0000164220 | 2035 | 3139 | 2720 | 2711 | 3100 | 3634 | 3920 | 2032 |
| 0000164240 | 1227 | 0027 | 3431 | 2037 | 3339 | 2720 | 2713 | 3100 |
| 0000164260 | 3834 | 3920 | 2034 | 1427 | 0027 | 3431 | 2039 | 3539 |
| 0000164300 | 2720 | 2715 | 3100 | 3035 | 3920 | 2036 | 1627 | 0027 |
| 0000164320 | 3531 | 2031 | 3739 | 2720 | 2717 | 3100 | 3235 | 3920 |
| 0000164340 | 2038 | 1827 | 0027 | 3531 | 2033 | 3939 | 2720 | 2719 |
| 0000164360 | 3100 | 3435 | 3920 | 2041 | 4227 | 2033 | 3327 | 0027 |
| 0000164400 | 3831 | 2030 | 3442 | 2720 | 2734 | 3100 | 3138 | 4220 |
| 0000164420 | 2035 | 3527 | 0027 | 3831 | 2032 | 3642 | 2720 | 2736 |
| 0000164440 | 3100 | 3338 | 4220 | 2037 | 3727 | 0027 | 3831 | 2034 |
| 0000164460 | 3842 | 2720 | 2738 | 3100 | 3538 | 4220 | 2039 | 3927 |
| 0000164500 | 0027 | 3831 | 2036 | 4142 | 2720 | 273A | 3100 | 3738 |
| 0000164520 | 4220 | 2042 | 3B27 | 0027 | 3831 | 2038 | 4342 | 2720 |
| 0000164540 | 273C | 3100 | 3938 | 4220 | 2044 | 3D27 | 0027 | 3931 |
| 0000164560 | 2030 | 4542 | 2720 | 273E | 3100 | 3139 | 4220 | 2046 |
| 0000164600 | 3F27 | 0027 | 3931 | 2032 | 3043 | 2720 | 2740 | 3100 |
| 0000164620 | 3339 | 4320 | 2031 | 4127 | 0027 | 3931 | 2034 | 3243 |
| 0000164640 | 2720 | 2742 | 3100 | 3539 | 4320 | 2033 | 4327 | 0027 |
| 0000164660 | 3931 | 2036 | 3443 | 2720 | 2744 | 3100 | 3739 | 4320 |
| 0000164700 | 2035 | 4527 | 0027 | 3931 | 2038 | 3643 | 2720 | 2746 |
| 0000164720 | 3100 | 3939 | 4320 | 2037 | 4727 | 0027 | 3032 | 2030 |
| 0000164740 | 3843 | 2720 | 2748 | 3200 | 3130 | 4320 | 2039 | 4927 |
| 0000164760 | 0027 | 3032 | 2032 | 4143 | 2720 | 274A | 3200 | 3330 |
| 0000165000 | 4320 | 2042 | 4B27 | 0027 | 3032 | 2034 | 4343 | 2720 |
| 0000165020 | 274C | 3200 | 3530 | 4320 | 2044 | 4D27 | 0027 | 3032 |
| 0000165040 | 2036 | 4543 | 2720 | 274E | 3200 | 3730 | 4320 | 2046 |
| 0000165060 | 4F27 | 0027 | 3032 | 2038 | 3044 | 2720 | 2750 | 3200 |
| 0000165100 | 3930 | 4420 | 2031 | 5127 | 0027 | 3132 | 2030 | 3244 |
| 0000165120 | 2720 | 2752 | 3200 | 3131 | 4420 | 2033 | 5327 | 0027 |
| 0000165140 | 3132 | 2032 | 3444 | 2720 | 2754 | 3200 | 3331 | 4420 |
| 0000165160 | 2035 | 5527 | 0027 | 3132 | 2034 | 3644 | 2720 | 2756 |
| 0000165200 | 3200 | 3531 | 4420 | 2037 | 5727 | 0027 | 3132 | 2036 |
| 0000165220 | 3844 | 2720 | 2758 | 3200 | 3731 | 4420 | 2039 | 5927 |
| 0000165240 | 0027 | 3132 | 2038 | 4144 | 2720 | 275A | 3200 | 3931 |
| 0000165260 | 4420 | 2042 | 5B27 | 0027 | 3232 | 2030 | 4344 | 2720 |
| 0000165300 | 0027 | 3232 | 2031 | 4444 | 2720 | 275D | 3200 | 3232 |
| 0000165320 | 4420 | 2045 | 5E27 | 0027 | 3232 | 2033 | 4644 | 2720 |
| 0000165340 | 275F | 3200 | 3432 | 4520 | 2030 | 6027 | 0027 | 3232 |

THU MAR 14 17:41:20 1991 LBIPMT.DLL PAGE 64, LINE 3718

| | | | | | | | | |
|---|---|---|---|---|---|---|---|---|
| 0000165360 | 2035 | 3145 | 2720 | 2761 | 3200 | 3632 | 4520 | 2032 |
| 0000165400 | 6227 | 0027 | 3232 | 2037 | 3345 | 2720 | 2763 | 3200 |
| 0000165420 | 3832 | 4520 | 2034 | 6427 | 0027 | 3232 | 2039 | 3545 |
| 0000165440 | 2720 | 2765 | 3200 | 3033 | 4520 | 2036 | 6627 | 0027 |
| 0000165460 | 3332 | 2031 | 3745 | 2720 | 2767 | 3200 | 3233 | 4520 |
| 0000165500 | 2038 | 6827 | 0027 | 3332 | 2033 | 3945 | 2720 | 2769 |
| 0000165520 | 3200 | 3433 | 4520 | 2041 | 6A27 | 0027 | 3332 | 2035 |
| 0000165540 | 4245 | 2720 | 276B | 3200 | 3633 | 4520 | 2043 | 6C27 |
| 0000165560 | 0027 | 3332 | 2037 | 4445 | 2720 | 276D | 3200 | 3833 |
| 0000165600 | 4520 | 2045 | 6E27 | 0027 | 3332 | 2039 | 4645 | 2720 |
| 0000165620 | 276F | 3200 | 3034 | 4620 | 2030 | 7027 | 0027 | 3432 |
| 0000165640 | 2031 | 3146 | 2720 | 2771 | 3200 | 3234 | 4620 | 2032 |
| 0000165660 | 7227 | 0027 | 3432 | 2033 | 3346 | 2720 | 2773 | 3200 |
| 0000165700 | 3434 | 4620 | 2034 | 7427 | 0027 | 3432 | 2035 | 3546 |
| 0000165720 | 2720 | 2775 | 3200 | 3634 | 4620 | 2036 | 7627 | 0027 |
| 0000165740 | 3432 | 2037 | 3746 | 2720 | 2777 | 3200 | 3834 | 4620 |
| 0000165760 | 2038 | 7827 | 0027 | 3432 | 2039 | 3946 | 2720 | 2779 |
| 0000166000 | 3200 | 3035 | 4620 | 2041 | 7A27 | 0027 | 3532 | 2031 |
| 0000166020 | 4246 | 2720 | 277B | 3200 | 3235 | 4620 | 2043 | 7C27 |
| 0000166040 | 0027 | 3532 | 2033 | 4446 | 2720 | 277D | 3200 | 3435 |
| 0000166060 | 4620 | 2045 | 7E27 | 0027 | 3532 | 2035 | 4646 | 2720 |
| 0000166100 | 277F | 4120 | 746C | 322D | 3535 | 6300 | 6168 | 2072 |
| 0000166120 | 7325 | 3D20 | 2520 | 0073 | 0A00 | 0000 | 0F5A | 1A32 |
| 0000166140 | 0F6A | 1A36 | 0F7A | 1A3A | 0F8A | 1A3E | 0F9A | 1A42 |
| 0000166160 | 0FAA | 1A46 | 0FBA | 1A4A | 0FCA | 1A4E | 0FDF | 1A52 |
| 0000166200 | 0FF3 | 1A56 | 1007 | 1A5A | 101B | 1A5E | 102F | 1A62 |
| 0000166220 | 1043 | 1A66 | 1057 | 1A6A | 1066 | 1A6E | 1076 | 1A72 |
| 0000166240 | 1086 | 1A76 | 1096 | 1A7A | 10A6 | 1A7E | 10B6 | 1A82 |
| 0000166260 | 10C6 | 1A86 | 10D6 | 1A8A | 10E6 | 1A8E | 10F6 | 1A92 |
| 0000166300 | 1106 | 1A96 | 1115 | 1A9A | 1125 | 1A9E | 1135 | 1AA2 |
| 0000166320 | 1143 | 1AA6 | 1152 | 1AAA | 1161 | 1AAE | 1170 | 1AB2 |
| 0000166340 | 117F | 1AB6 | 118A | 1ABA | 1196 | 1ABE | 11A1 | 1AC2 |
| 0000166360 | 11AC | 1AC6 | 11B7 | 1ACA | 11C2 | 1ACE | 11CE | 1AD2 |
| 0000166400 | 11D9 | 1AD6 | 11E4 | 1ADA | 11EF | 1ADE | 11FA | 1AE2 |
| 0000166420 | 1205 | 1AE6 | 1210 | 1AEA | 121B | 1AEE | 1226 | 1AF2 |
| 0000166440 | 1231 | 1AF6 | 123C | 1AFA | 1247 | 1AFE | 1252 | 1B02 |
| 0000166460 | 125D | 1B06 | 1268 | 1B0A | 1273 | 1B0E | 127E | 1B12 |
| 0000166500 | 1289 | 1B16 | 1294 | 1B1A | 129F | 1B1E | 12AA | 1B22 |
| 0000166520 | 12B5 | 1B26 | 12C0 | 1B2A | 12CB | 1B2E | 12D6 | 1B32 |
| 0000166540 | 12E1 | 1B36 | 12EC | 1B3A | 12F7 | 1B3E | 1302 | 1B42 |
| 0000166560 | 130D | 1B46 | 1318 | 1B4A | 1323 | 1B4E | 132E | 1B52 |
| 0000166600 | 1339 | 1B56 | 1344 | 1B5A | 134F | 1B5E | 135A | 1B62 |
| 0000166620 | 1365 | 1B66 | 1370 | 1B6A | 137B | 1B6E | 1386 | 1B72 |
| 0000166640 | 1391 | 1B76 | 139C | 1B7A | 13A7 | 1B7E | 13B2 | 1B82 |
| 0000166660 | 13BD | 1B86 | 13C8 | 1B8A | 13D3 | 1B8E | 13DE | 1B92 |
| 0000166700 | 13E9 | 1B96 | 13F4 | 1B9A | 13FF | 1B9E | 140A | 1BA2 |
| 0000166720 | 1416 | 1BA6 | 1421 | 1BAA | 142C | 1BAE | 1437 | 1BB2 |
| 0000166740 | 1442 | 1BB6 | 144D | 1BBA | 1458 | 1BBE | 1463 | 1BC2 |
| 0000166760 | 146E | 1BC6 | 1479 | 1BCA | 1484 | 1BCE | 148F | 1BD2 |
| 0000167000 | 149A | 1BD6 | 14A5 | 1BDA | 14B0 | 1BDE | 14BB | 1BE2 |
| 0000167020 | 14C6 | 1BE6 | 14D1 | 1BEA | 14DC | 1BEE | 14E7 | 1BF2 |
| 0000167040 | 14F2 | 1BF6 | 14FD | 1BFA | 1508 | 1BFE | 1513 | 1C02 |
| 0000167060 | 151E | 1C06 | 1529 | 1C0A | 1534 | 1C0E | 153F | 1C12 |
| 0000167100 | 154A | 1C16 | 1555 | 1C1A | 1560 | 1C1E | 156B | 1C22 |
| 0000167120 | 1576 | 1C26 | 1581 | 1C2A | 158C | 1C2E | 159C | 1C32 |
| 0000167140 | 15A9 | 1C36 | 15B4 | 1C3A | 15BF | 1C3E | 15CA | 1C42 |
| 0000167160 | 15D5 | 1C46 | 15E0 | 1C4A | 15EB | 1C4E | 15F6 | 1C52 |
| 0000167200 | 1601 | 1C56 | 160F | 1C5A | 161D | 1C5E | 1628 | 1C62 |
| 0000167220 | 1633 | 1C66 | 163D | 1C6A | 1648 | 1C6E | 1653 | 1C72 |

THU MAR 14 17:41:20 1991 LBIPMT.DLL PAGE 65, LINE 3777

| | | | | | | | | |
|---|---|---|---|---|---|---|---|---|
| 0000167240 | 165E | 1C76 | 1669 | 1C7A | 1674 | 1C7E | 167F | 338C |
| 0000167260 | 168A | 1C86 | 1695 | 1C8A | 16A0 | 1C8E | 16AB | 1C92 |
| 0000167300 | 16B6 | 1C96 | 16C1 | 1C9A | 16D0 | 1C9E | 16DB | 1CA2 |
| 0000167320 | 16E6 | 1CA6 | 16F1 | 1CAA | 16FC | 1CAE | 1707 | 1CB2 |
| 0000167340 | 1712 | 1CB6 | 171D | 1CBA | 1728 | 1CBE | 1733 | 1CC2 |
| 0000167360 | 173E | 1CC6 | 1749 | 1CCA | 1754 | 1CCE | 175F | 1CD2 |
| 0000167400 | 176A | 1CD6 | 1775 | 1CDA | 1780 | 1CDE | 178B | 1CE2 |
| 0000167420 | 1796 | 1CE6 | 17A1 | 1CEA | 17AC | 1CEE | 17B7 | 1CF2 |
| 0000167440 | 17C2 | 1CF6 | 17CD | 1CFA | 17D8 | 1CFE | 17E3 | 1D02 |
| 0000167460 | 17EE | 1D06 | 17F9 | 1D0A | 1804 | 1D0E | 180F | 1D12 |
| 0000167500 | 181A | 1D16 | 1825 | 1D1A | 1830 | 1D1E | 183B | 1D22 |
| 0000167520 | 1846 | 1D26 | 1851 | 1D2A | 185C | 1D2E | 1867 | 1D32 |
| 0000167540 | 1872 | 1D36 | 187D | 1D3A | 1888 | 1D3E | 1892 | 1D42 |
| 0000167560 | 189D | 1D46 | 18A8 | 1D4A | 18B3 | 1D4E | 18BE | 1D52 |
| 0000167600 | 18C9 | 1D56 | 18D4 | 1D5A | 18DF | 1D5E | 18EA | 1D62 |
| 0000167620 | 18F5 | 1D66 | 1900 | 1D6A | 190B | 1D6E | 1916 | 1D72 |
| 0000167640 | 1921 | 1D76 | 192C | 1D7A | 1937 | 1D7E | 1942 | 1D82 |
| 0000167660 | 194D | 1D86 | 1958 | 1D8A | 1963 | 1D8E | 196E | 1D92 |
| 0000167700 | 1979 | 1D96 | 1984 | 1D9A | 198F | 1D9E | 199A | 1DA2 |
| 0000167720 | 19A5 | 1DA6 | 19B0 | 1DAA | 19BB | 1DAE | 19C6 | 1DB2 |
| 0000167740 | 19D1 | 1DB6 | 19DC | 1DBA | 19E7 | 1DBE | 19F2 | 1DC2 |
| 0000167760 | 19FD | 1DC6 | 1A08 | 1A2E | 6E69 | 2074 | 7325 | 3D20 |
| 0000170000 | 2520 | 0064 | 2520 | 5575 | 2000 | 7830 | 5825 | 0000 |
| 0000170020 | 000A | 0020 | 6873 | 726F | 2074 | 7325 | 3D20 | 2520 |
| 0000170040 | 6468 | 2520 | 7868 | 0000 | 000A | 0020 | 7355 | 6F68 |
| 0000170060 | 7472 | 2520 | 2073 | 203D | 6825 | 2075 | 6825 | 0078 |
| 0000170100 | 0A00 | 2000 | 6C00 | 6E6F | 2067 | 7325 | 3D20 | 2520 |
| 0000170120 | 646C | 2000 | 6C25 | 5575 | 0000 | 000A | 0020 | 6C55 |
| 0000170140 | 6E6F | 2067 | 7325 | 3D20 | 2520 | 756C | 0000 | 000A |
| 0000170160 | 0020 | 6F50 | 6E69 | 6574 | 2072 | 7325 | 3D20 | 2520 |
| 0000170200 | 0070 | 0A00 | 2000 | 4400 | 756F | 6C62 | 2065 | 7325 |
| 0000170220 | 3D20 | 2520 | 2067 | 6625 | 0000 | 000A | 0020 | 5254 |
| 0000170240 | 4555 | 4600 | 4C41 | 4553 | 4200 | 6F6F | 206C | 7325 |
| 0000170260 | 3D20 | 2520 | 0073 | 0A00 | 2000 | 6600 | 6F6C | 7461 |
| 0000170300 | 2520 | 2073 | 203D | 6725 | 2520 | 0066 | 0A00 | 2000 |
| 0000170320 | 5300 | 7274 | 6E69 | 2067 | 7325 | 255B | 5D64 | 2520 |
| 0000170340 | 2070 | 203D | 2522 | 2273 | 5300 | 7274 | 6E69 | 2067 |
| 0000170360 | 7325 | 3D20 | 2820 | 554E | 4C4C | 2029 | 7025 | 0000 |
| 0000170400 | 000A | 0020 | 702E | 2E00 | 0050 | 5725 | 2025 | 4725 |
| 0000170420 | 0025 | 0000 | 5725 | 2025 | 4725 | 0025 | 0000 | 0000 |
| 0000170440 | 0000 | 0000 | 0000 | 0000 | 6143 | 6E6E | 746F | 6F20 |
| 0000170460 | 6570 | 206E | 6F6C | 2067 | 6966 | 656C | 2520 | 2073 |
| 0000170500 | 6F6D | 6564 | 2520 | 0073 | 6143 | 6E6E | 746F | 6F20 |
| 0000170520 | 6570 | 206E | 6F6C | 2067 | 6966 | 656C | 2520 | 2073 |
| 0000170540 | 6F6D | 6564 | 2520 | 0073 | 2500 | 732A | 0000 | 2A25 |
| 0000170560 | 0073 | 2500 | 732A | 0000 | 2A25 | 0073 | 4142 | 5044 |
| 0000170600 | 4341 | 2E4B | 0070 | 6142 | 2064 | 6150 | 6B63 | 6761 |
| 0000170620 | 2065 | 616E | 656D | 2021 | 4228 | 5058 | 4341 | 204B |
| 0000170640 | 6564 | 6966 | 696E | 6974 | 6E6F | 7020 | 6F72 | 6C62 |
| 0000170660 | 6D65 | 3F20 | 2921 | 4E00 | 746F | 2065 | 6874 | 7461 |
| 0000170700 | 7320 | 6170 | 6563 | 2073 | 7261 | 2065 | 6F6E | 2074 |
| 0000170720 | 6C61 | 6F6C | 6577 | 2064 | 6E69 | 2D20 | 4244 | 5058 |
| 0000170740 | 4341 | 3D4B | 2E2E | 002E | 6553 | 2074 | 6564 | 7562 |
| 0000170760 | 2067 | 6176 | 2072 | 4142 | 5044 | 4341 | 2E4B | 2070 |
| 0000171000 | 6F74 | 7320 | 6565 | 7020 | 6972 | 746E | 756F | 7374 |
| 0000171020 | 2D00 | 2D2D | 3E2D | 3C00 | 2D2D | 2D2D | 5B00 | 7325 |
| 0000171040 | 205D | 5B00 | 6425 | 205D | 2800 | 7325 | 252E | 2964 |
| 0000171060 | 0020 | 5428 | 6425 | 2029 | 2500 | 2F73 | 2800 | 6425 |
| 0000171100 | 2029 | 2000 | 3A00 | 0020 | 2528 | 2973 | 2000 | 0000 |

```
THU MAR 14 17:41:20 1991  LBIPMT.DLL  PAGE 66, LINE 3836

0000171120  0000  7325  2500  0073  7325  2500  0073  2A0A
0000171140  2A2A  4220  7069  4520  5252  524F  203A  0A00
0000171160  0000  2520  322E  0066  2E25  6632  0000  7325
0000171200  0020  624C  6775  3A20  2520  0A73  6200  4C78
0000171220  6564  206C  6163  6C6C  6465  7720  7469  2068
0000171240  3D70  6E65  2864  296C  0020  7862  634C  6F6C
0000171260  6573  6320  6C61  656C  2064  6977  6874  6E20
0000171300  6E6F  6520  706D  7974  6C20  7369  0074  7862
0000171320  724C  7465  6972  7665  2065  6163  6C6C  6465
0000171340  7720  7469  2068  2070  203D  6E65  2864  296C
0000171360  0020  7862  734C  6F74  6572  6320  6C61  656C
0000171400  2064  6977  6874  7020  3D20  6520  646E  6C28
0000171420  2029  0A00  0000  6962  0070  6143  6E6E  746F
0000171440  6C20  616F  2064  6942  2070  7944  616E  696D
0000171460  2063  694C  6B6E  4C20  6269  6172  7972  5C00
0000171500  6970  6570  625C  7069  0000  0000  0000  0001
0000171520  7245  6F72  2072  7277  7469  6E69  2067  6F74
0000171540  4220  7069  7020  7069  0065  000A  000A  000A
0000171560  7250  636F  7365  2073  6574  6D72  6E69  7461
0000171600  6465  4800  7261  2064  7245  6F72  0072  7250
0000171620  636F  7365  2073  696B  6C6C  6465  5400  6172
0000171640  6570  0064  7953  7473  6D65  4520  7272  726F
0000171660  4000  2628  3E29  4520  6978  6974  676E  4220
0000171700  7069  4420  6265  6775  6567  2072  202D  2528
0000171720  2973  000A  6942  2070  6544  7562  6767  7265
0000171740  0000  614D  6E69  6854  6572  6461  7400  003F
0000171760  0001  21B2  339C  0000  0000  0000  0000  0000
0000172000  0000  0000  0000  0000  0000  0000  0000  0000
0000172020  0000  0000  0000  0000  0000  6F54  6D20  6E61
0000172040  2079  6874  6572  6461  3A73  7420  6469  3D20
0000172060  2520  0A64  5400  206F  616D  796E  7420  7268
0000172100  6165  7364  203A  6974  2064  203D  6425  000A
0000172120  3F74  5400  003F  3F54  5400  206F  616D  796E
0000172140  7420  7268  6165  7364  203A  6974  2064  203D
0000172160  6425  000A  3F54  5400  003F  6162  2064  7773
0000172200  7469  6863  7920  6C79  6F6F  206B  6425  0000
0000172220  2D1A  2266  2D26  2526  0000  0006  0000  0001
0000172240  0006  0000  0001  0000  0005  0006  0000  0006
0000172260  0000  0003  0006  0000  0005  0000  0002  0000
0000172300  0004  0000  0000  0000  0000  0301  0000  0000
0000172320  0000  0A07  0000  0000  0000  0401  0501  0504
0000172340  0504  0A07  0B07  0000  0000  0000  0000  0000
0000172360  0000  0000  0000  0000  0000  0000  0000  0000
0000172400  0000  0000  0000  0000  0000  0C08  0504  0000
0000172420  0000  0000  0000  0000  0000  0000  0000  0000
0000172440  0000  0000  0601  0000  0000  0000  0A07  0000
0000172460  0000  0000  0000  0000  0000  0000  0000  0701
0000172500  0702  0801  0802  0006  0006  0006  0006  0006
0000172520  0006  0006  0006  0006  0006  0006  0006  0006
*
0000172640  0906  0000  0000  0000  0000  0000  0000  0000
0000172660  0000  0000  0000  0000  0006  0006  0006  0006
0000172700  0006  0006  0006  0000  0000  0000  0000  0000
0000172720  0000  0000  0000  0000  0000  0000  0000  0000
*
0000172760  0000  0000  0000  0000  0000  0006  0006  0006
0000173000  0006  0000  0006  0000  0000  00C0  0000  0000
0000173020  0000  0000  0000  0000  0000  0000  0000  0000
*
```

THU MAR 14 17:41:20 1991 LBIPMT.DLL PAGE 67, LINE 3895

```
0000173060  0000  0000  0000  0000  0000  0006  0006  0006
0000173100  0006  0006  0009  0009  0009  0009  0009  0009
0000173120  0009  0009  0009  0009  0009  0009  0009  0009
*
0000173220  0009  0009  0009  0009  0009  0009  0009  0000
0000173240  0000  0000  0000  0000  0000  0000  0000  0000
0000173260  0000  0000  0000  0009  0009  0009  0009  0009
0000173300  0009  0009  0000  0000  0000  0000  0000  0000
0000173320  0000  0000  0000  0000  0000  0000  0000  0000
*
0000173360  0000  0000  0000  0000  0009  0009  0009  0009
0000173400  0000  0009  0000  0000  0000  0000  0000  0000
0000173420  0000  0000  0000  0000  0000  0000  0000  0000
*
0000173460  0000  0000  0000  0000  0009  0009  0009  0009
0000173500  0009  0000  0000  0000  0000  0000  0000  0000
0000173520  0000  0000  2294  2532  0000  0000  0000  0000
0000173540  2292  2536  2524  253E  ·0000 0000  2296  2546
0000173560  0000  0000  226A  254A  229C  2552  0000  0000
0000173600  226E  2556  2296  255A  2548  255E  2274  256A
0000173620  2218  2586  0000  0000  2278  256E  228C  2576
0000173640  0000  0000  227E  257A  2298  2582  0000  0000
0000173660  2282  258A  211A  33AE  2560  258E  2288  2592
0000173700  2296  2596  256C  259E  0000  0000  2296  25A6
0000173720  0000  0000  228C  25AA  2296  25B2  0000  0000
0000173740  2290  25C2  0000  0000  0000  0000  0000  0000
0000173760  2510  25C6  2524  21C4  0100  0101  0101  0101
0000174000  0901  010A  0101  0101  0101  0101  0101  0101
0000174020  0101  0101  0101  0101  0109  0101  0101  0101
0000174040  0101  0101  0101  2E2E  2E2E  2E2E  2E2E  2E2E
0000174060  2E2E  0101  0101  0101  2E01  2E2E  2E2E  2E2E
0000174100  2E2E  2E2E  2E2E  2E2E  2E2E  2E2E  2E2E  2E2E
0000174120  2E2E  012E  0101  2E01  2E01  2E2E  2E2E  2E2E
0000174140  2E2E  2E2E  2E2E  2E2E  2E2E  2E2E  2E2E  2E2E
0000174160  2E2E  012E  0101  0101  0000  0000  0000  0000
0000174200  0000  0000  0001  4A12  2562  000A  7325  203A
0000174220  255B  5D73  2D20  5320  6E79  6174  2078  7265
0000174240  6F72  2072  656E  7261  6C20  6E69  2065  6425
0000174260  000A  5842  495F  444E  4E45  0054  5842  455F
0000174300  4958  5F54  4F43  464E  5249  004D  5842  495F
0000174320  5250  434F  4200  5F58  5049  4341  004B  5842
0000174340  495F  4854  4552  4441  4200  5F58  4649  4C49
0000174360  0045  5842  495F  5546  434E  4200  5F58  4953
0000174400  474E  454C  4C5F  4E49  0045  5842  505F  5052
0000174420  4341  004B  5842  505F  4652  4C49  0045  5842
0000174440  505F  4652  4E55  0043  5842  505F  4C52  4E49
0000174460  0045  5842  505F  4C52  5645  4C45  4200  5F58
0000174500  4F4C  0047  5842  535F  4148  4552  5F44  4F4C
0000174520  0047  5842  4C5F  474F  4946  454C  4E5F  4D41
0000174540  0045  5842  4C5F  474F  455F  5458  4200  5F58
0000174560  4954  454D  0053  5842  445F  4245  4755  4200
0000174600  5F58  5245  4F52  5352  4200  5F58  5245  4F52
0000174620  5352  445F  4149  4F4C  0047  5842  465F  554C
0000174640  4853  4200  5F58  5250  5250  434F  4200  5F58
0000174660  5250  4854  4552  4441  4200  5F58  5544  504D
0000174700  4F5F  5450  4F49  534E  4200  5F58  4342  444F
0000174720  5F45  4F4E  4954  5946  2500  2873  6425  2C29
0000174740  4920  6C6C  6765  6C61  6420  7269  6365  6974
0000174760  6576  203A  2523  2073  203D  7325  7000  7963
```

THU MAR 14 17:41:20 1991 LBIPMT.DLL PAGE 68, LINE 3954

```
0000175000  6361  2063  6E69  6574  6E72  6C61  7320  6174
0000175020  6B63  6F20  6576  6672  6F6C  0077  0077  6143
0000175040  276E  2074  706F  6E65  7420  6620  6C69  3A65
0000175060  2520  0A73  2400  4F45  0050  7325  0020  000A
0000175100  7973  746E  7861  6520  7272  726F  7700  4300
0000175120  6E61  7427  6F20  6570  206E  2074  6966  656C
0000175140  203A  7325  000A  4524  504F  2500  2073  0A00
0000175160  0000  0000  FFFF  0001  0000  FFFF  FFFE  0000
0000175200  0000  0005  000B  000E  0007  0008  000D  0009
0000175220  000A  0006  0002  0001  0000  0000  0000  0000
0000175240  0000  0000  0000  000C  0000  0000  000F  0000
0000175260  0000  0000  0000  0000  0000  0000  0000  0000
*
0000176060  0000  0000  0000  0000  0000  00U0  0003  0000
0000176100  0000  0004  FC18  FFDD  FC18  FC18  FF02  FF03
0000176120  FEFE  FC18  FC18  FF02  FFDA  FC18  FEFF  FEFE
0000176140  FC18  FC18  0000  0007  0008  000A  0009  0000
0000176160  0003  0003  0003  0004  0004  0002  0002  0001
0000176200  0001  0000  0000  0002  0002  0003  0004  0001
0000176220  0001  0001  0003  FC18  FFFD  FFFC  0100  0103
0000176240  0023  FFFE  0101  0102  0103  FFFF  0103  FFFE
0000176260  002B  0103  FFFF  0001  FFFE  0002  0003  0000
0000176300  0000  0000  0006  0007  0000  0004  0008  0000
0000176320  0000  0005  0009  0000  0000  0000  FFFF  0000
0000176340  0000  0000  0006  0000  9F60  9F5F  0000  0005
0000176360  0000  0000  0000  0000  0000  0000  0000  0000
0000176400  435F  465F  4C49  5F45  4E49  4F46  003D  0001
0000176420  FFFF  0000  0000  0000  0000  0000  0000  0000
0000176440  0000  0000  0001  8101  8181  0000  0000  0000
0000176460  0000  0000  0000  0000  0000  0000  0000  0000
*
0000177040  0000  0000  0000  0A00  0A0A  0A0A  0A0A  0A0A
0000177060  0A0A  0A0A  0A0A  0A0A  0A0A  0A0A  0A0A  0A0A
*
0000177440  0A0A  0A0A  0A0A  000A  0000  0000  0000  0000
0000177460  0000  0000  0000  0000  FF00  00FF  0000  0000
0000177500  FFFF  FFFF  005C  005C  0000  1076  2D22  0000
0000177520  1076  33C2  0001  0000  0000  0000  0000  0000
0000177540  0102  0000  0000  0000  0000  0000  0202  0000
0000177560  0000  0000  0000  0000  0000  0000  0000  0000
*
0000200440  0000  0000  0000  0000  0000  0001  0200  0000
0000200460  0000  0000  0000  0000  0000  0000  0000  0000
*
0000201400  0000  0000  0000  0000  0000  2EEE  33B4  0000
0000201420  0000  0000  0000  0920  0D2D  005D  005D  0006
0000201440  0600  0100  0000  0010  0603  0600  1002  4504
0000201460  4545  0505  0505  3505  0030  0050  0000  2000
0000201500  3020  5850  0807  3000  3030  5057  0007  2000
0000201520  0020  0000  0000  6008  6060  6060  0060  7000
0000201540  7870  7878  0878  0807  0000  0007  0808  0008
0000201560  0800  0800  0000  2808  756E  6C6C  0629  0000
0000201600  0000  0000  0000  0000  0000  0000  0000  0003
0000201620  2000  724E  336A  724E  3164  724E  3168  724E
0000201640  316C  724E  3170  724E  3174  0000  0000  0101
0000201660  2000  2020  2020  2020  2020  2828  2828  2028
0000201700  2020  2020  2020  2020  2020  2020  2020  2020
0000201720  4820  1010  1010  1010  1010  1010  1010  1010
0000201740  8410  8484  8484  8484  8484  1084  1010  1010
```

THU MAR 14 17:41:20 1991 LBIPMT.DLL PAGE 69, LINE 4013

| | | | | | | | | |
|---|---|---|---|---|---|---|---|---|
| 0000201760 | 1010 | 8181 | 8181 | 8181 | 0101 | 0101 | 0101 | 0101 |
| 0000202000 | 0101 | 0101 | 0101 | 0101 | 0101 | 0101 | 1010 | 1010 |
| 0000202020 | 1010 | 8282 | 8282 | 8282 | 0202 | 0202 | 0202 | 0202 |
| 0000202040 | 0202 | 0202 | 0202 | 0202 | 0202 | 0202 | 1010 | 1010 |
| 0000202060 | 0020 | 0000 | 0000 | 0000 | 0000 | 0000 | 0000 | 0000 |
| 0000202100 | 0000 | 0000 | 0000 | 0000 | 0000 | 0000 | 0000 | 0000 |
| * | | | | | | | | |
| 0000202260 | 0000 | 0000 | 0003 | FFFF | 001E | 003B | 005A | 0078 |
| 0000202300 | 0097 | 00B5 | 00D4 | 00F3 | 0111 | 0130 | 014E | 016D |
| 0000202320 | FFFF | 001E | 003A | 0059 | 0077 | 0096 | 00B4 | 00D3 |
| 0000202340 | 00F2 | 0110 | 012F | 014D | 016C | 0000 | 0000 | 0000 |
| 0000202360 | 0000 | 0000 | 0000 | 0000 | 0000 | 0000 | 5A54 | 0000 |
| 0000202400 | 5350 | 0054 | 4450 | 0054 | 7080 | 0000 | 0001 | 32D0 |
| 0000202420 | 32E4 | 32D4 | 33C4 | 7553 | 4D6E | 6E6F | 7554 | 5765 |
| 0000202440 | 6465 | 6854 | 4675 | 6972 | 6153 | 0074 | 614A | 466E |
| 0000202460 | 6265 | 614D | 4172 | 7270 | 614D | 4A79 | 6E75 | 754A |
| 0000202500 | 416C | 6775 | 6553 | 4F70 | 7463 | 6F4E | 4476 | 6365 |
| 0000202520 | 0000 | 0000 | 0000 | 0000 | 0000 | 0000 | 0000 | 0000 |
| 0000202540 | 0000 | C9E4 | 335E | C4AC | 3334 | C552 | 3338 | C43C |
| 0000202560 | 333C | C52A | 3340 | 4D05 | 3136 | 7878 | 2B65 | 3030 |
| 0000202600 | 0030 | 0000 | A6F2 | 3362 | 0000 | 0000 | C2F5 | 3356 |
| 0000202620 | A206 | 3178 | BB84 | 3344 | 7B52 | 0B24 | FFFF | 336C |
| 0000202640 | 336E | FFFF | 3372 | 0190 | 3376 | 3378 | 337A | 3374 |
| 0000202660 | 337E | 337C | 3382 | 3380 | 3384 | 3386 | 0B08 | 1C82 |
| 0000202700 | 338A | 338E | 126F | 3A83 | 3392 | 3398 | 339A | 3390 |
| 0000202720 | 339E | 33A0 | 33A2 | 33A4 | 33A6 | 33A8 | 33AA | 33AC |
| 0000202740 | 2262 | 2658 | 33B0 | 33B2 | 33B6 | 33B8 | 33BA | 33BC |
| 0000202760 | 33BE | 33C0 | 30DC | 32E0 | 0000 | 0000 | 0000 | 0000 |
| 0000203000 | 3C3C | 4D4E | 4753 | 3E3E | 0000 | 3652 | 3030 | 0D30 |
| 0000203020 | 2D0A | 7320 | 6174 | 6B63 | 6F20 | 6576 | 6672 | 6F6C |
| 0000203040 | 0D77 | 000A | 0003 | 3652 | 3030 | 0D33 | 2D0A | 6920 |
| 0000203060 | 746E | 6765 | 7265 | 6420 | 7669 | 6469 | 2065 | 7962 |
| 0000203100 | 3020 | 0A0D | 0800 | 5200 | 3036 | 3830 | 0A0D | 202D |
| 0000203120 | 6F6E | 2074 | 6E65 | 756F | 6867 | 7320 | 6170 | 6563 |
| 0000203140 | 6620 | 726F | 6120 | 6772 | 6D75 | 6E65 | 7374 | 0A0D |
| 0000203160 | 0900 | 5200 | 3036 | 3930 | 0A0D | 202D | 6F6E | 2074 |
| 0000203200 | 6E65 | 756F | 6867 | 7320 | 6170 | 6563 | 6620 | 726F |
| 0000203220 | 6520 | 766E | 7269 | 6E6F | 656D | 746E | 0A0D | FC00 |
| 0000203240 | 0D00 | 000A | 00FF | 7572 | 2D6E | 6974 | 656D | 6520 |
| 0000203260 | 7272 | 726F | 0020 | 0002 | 3652 | 3030 | 0D32 | 2D0A |
| 0000203300 | 6620 | 6F6C | 7461 | 6E69 | 2D67 | 6F70 | 6E69 | 2074 |
| 0000203320 | 7573 | 7070 | 726F | 2074 | 6F6E | 2074 | 6F6C | 6461 |
| 0000203340 | 6465 | 0A0D | 1100 | 5200 | 3036 | 3731 | 0A0D | 202D |
| 0000203360 | 6E75 | 7865 | 6570 | 7463 | 6465 | 6D20 | 6C75 | 6974 |
| 0000203400 | 6874 | 6572 | 6461 | 6C20 | 636F | 206B | 7265 | 6F72 |
| 0000203420 | 0D72 | 000A | 0010 | 3652 | 3130 | 0D36 | 2D0A | 6E20 |
| 0000203440 | 746F | 6520 | 6F6E | 6775 | 2068 | 7073 | 6361 | 2065 |
| 0000203460 | 6F66 | 2072 | 6874 | 6572 | 6461 | 6420 | 7461 | 0D61 |
| 0000203500 | 000A | 00FD | 203A | 414D | 4854 | 0A0D | 202D | 6C66 |
| 0000203520 | 616F | 6974 | 676E | 702D | 696F | 746E | 6520 | 7272 |
| 0000203540 | 726F | 203A | 6500 | 6900 | 766E | 6C61 | 6469 | 0A0D |
| 0000203560 | 6700 | 6400 | 7669 | 6469 | 2065 | 7962 | 3020 | 0A0D |
| 0000203600 | 6800 | 6F00 | 6576 | 6672 | 6F6C | 0D77 | 000A | 006E |
| 0000203620 | 7473 | 6361 | 206B | 766F | 7265 | 6C66 | 776F | 0A0D |
| 0000203640 | 7000 | 6500 | 7078 | 696C | 6963 | 6C74 | 2079 | 6567 |
| 0000203660 | 656E | 6172 | 6574 | 0D64 | 000A | FFFF | 03FF | 0200 |
| 0000203700 | 6600 | 0133 | 0000 | 0200 | 1C00 | 052D | 0000 | 0200 |
| 0000203720 | C600 | 0633 | 0000 | 4E00 | 3042 | A232 | 010D | 0100 |
| 0000203740 | 0000 | BA00 | 0008 | 0000 | 0100 | 2700 | 755C | 7273 |

THU MAR 14 17:41:20 1991 LBIPMT.DLL PAGE 70, LINE 4072

| | | | | | | | | |
|---|---|---|---|---|---|---|---|---|
| 0000203760 | 795C | 636F | 6968 | 625C | 7069 | 625C | 7069 | 746D |
| 0000204000 | 645C | 6C6C | 626F | 5C6A | 7862 | 695F | 696E | 2E74 |
| 0000204020 | 626F | 016A | BA00 | DA08 | 000C | 0000 | 0100 | 2700 |
| 0000204040 | 755C | 7273 | 795C | 636F | 6968 | 625C | 7069 | 625C |
| 0000204060 | 7069 | 746D | 645C | 6C6C | 626F | 5C6A | 7862 | 685F |
| 0000204100 | 7361 | 2E68 | 626F | 016A | 9400 | 9415 | 0009 | 0000 |
| 0000204120 | 0100 | 2800 | 755C | 7273 | 795C | 636F | 6968 | 625C |
| 0000204140 | 7069 | 625C | 7069 | 746D | 645C | 6C6C | 626F | 5C6A |
| 0000204160 | 7862 | 735F | 6174 | 6B63 | 6F2E | 6A62 | 0001 | 1F28 |
| 0000204200 | 0368 | 0000 | 0000 | 0001 | 5C28 | 7375 | 5C72 | 6F79 |
| 0000204220 | 6863 | 5C69 | 6962 | 5C70 | 6962 | 6D70 | 5C74 | 6C64 |
| 0000204240 | 6F6C | 6A62 | 625C | 5F78 | 7475 | 6C69 | 2E73 | 626F |
| 0000204260 | 016A | 9000 | 0022 | 000F | 0000 | 0100 | 2800 | 755C |
| 0000204300 | 7273 | 795C | 636F | 6968 | 625C | 7069 | 625C | 7069 |
| 0000204320 | 746D | 645C | 6C6C | 626F | 5C6A | 7862 | 635F | 6C61 |
| 0000204340 | 736C | 6F2E | 6A62 | 0001 | 3190 | 086E | 0000 | 0000 |
| 0000204360 | 0001 | 5C27 | 7375 | 5C72 | 6F79 | 6863 | 5C69 | 6962 |
| 0000204400 | 5C70 | 6962 | 6D70 | 5C74 | 6C64 | 6F6C | 6A62 | 625C |
| 0000204420 | 5F78 | 6176 | 7372 | 6F2E | 6A62 | 0001 | 39FE | 01DB |
| 0000204440 | 0000 | 0000 | 0001 | 5C28 | 7375 | 5C72 | 6F79 | 6863 |
| 0000204460 | 5C69 | 6962 | 5C70 | 6962 | 6D70 | 5C74 | 6C64 | 6F6C |
| 0000204500 | 6A62 | 625C | 5F78 | 6170 | 6B63 | 2E73 | 626F | 016A |
| 0000204520 | DA00 | 8D3B | 000C | 0000 | 0100 | 2800 | 755C | 7273 |
| 0000204540 | 795C | 636F | 6968 | 625C | 7069 | 625C | 7069 | 746D |
| 0000204560 | 645C | 6C6C | 626F | 5C6A | 7862 | 705F | 6972 | 746E |
| 0000204600 | 6F2E | 6A62 | 0001 | 4868 | 0103 | 0000 | 0000 | 0001 |
| 0000204620 | 5C27 | 7375 | 5C72 | 6F79 | 6863 | 5C69 | 6962 | 5C70 |
| 0000204640 | 6962 | 6D70 | 5C74 | 6C64 | 6F6C | 6A62 | 625C | 5F78 |
| 0000204660 | 6974 | 656D | 6F2E | 6A62 | 0001 | 496C | 06D6 | 0000 |
| 0000204700 | 0000 | 0001 | 5C25 | 7375 | 5C72 | 6F79 | 6863 | 5C69 |
| 0000204720 | 6962 | 5C70 | 6962 | 6D70 | 5C74 | 6C64 | 6F6C | 6A62 |
| 0000204740 | 645C | 696C | 7473 | 6F2E | 6A62 | 0001 | 5042 | 05FF |
| 0000204760 | 0000 | 0000 | 0001 | 5C28 | 7375 | 5C72 | 6F79 | 6863 |
| 0000205000 | 5C69 | 6962 | 5C70 | 6962 | 6D70 | 5C74 | 6C64 | 6F6C |
| 0000205020 | 6A62 | 6F5C | 3273 | 7270 | 6E69 | 2E74 | 626F | 016A |
| 0000205040 | 4200 | 1B56 | 0003 | 0000 | 0100 | 2700 | 755C | 7273 |
| 0000205060 | 795C | 636F | 6968 | 625C | 7069 | 625C | 7069 | 746D |
| 0000205100 | 645C | 6C6C | 626F | 5C6A | 7862 | 745F | 7268 | 2E64 |
| 0000205120 | 626F | 016A | 5E00 | 1759 | 0009 | 0000 | 0100 | 2300 |
| 0000205140 | 755C | 7273 | 795C | 636F | 6968 | 625C | 7069 | 625C |
| 0000205160 | 7069 | 746D | 645C | 6C6C | 626F | 5C6A | 656C | 2E78 |
| 0000205200 | 626F | 016A | 7600 | 2362 | 000D | 0000 | 0100 | 2300 |
| 0000205220 | 755C | 7273 | 795C | 636F | 6968 | 625C | 7069 | 625C |
| 0000205240 | 7069 | 746D | 645C | 6C6C | 626F | 5C6A | 7267 | 2E6D |
| 0000205260 | 626F | 016A | AA00 | D16F | 0000 | 0100 | 0100 | 0B00 |
| 0000205300 | 6C64 | 5C6C | 7363 | 2E75 | 7361 | 016D | 7C00 | AF70 |
| 0000205320 | 0001 | 0100 | 0100 | 0E00 | 6C64 | 5C6C | 7363 | 6475 |
| 0000205340 | 7461 | 612E | 6D73 | 0001 | 722C | 0022 | 0000 | 0001 |
| 0000205360 | 0001 | 6F0F | 3273 | 635C | 7472 | 6D30 | 6773 | 612E |
| 0000205400 | 6D73 | 0001 | 724E | 0006 | 0000 | 0001 | 0001 | 630A |
| 0000205420 | 7472 | 6630 | 2E70 | 7361 | 016D | 5400 | 1A72 | 0000 |
| 0000205440 | 0100 | 0100 | 0A00 | 6863 | 736B | 6B74 | 612E | 6D73 |
| 0000205460 | 0001 | 726E | 0108 | 0000 | 0001 | 0001 | 640D | 6C6C |
| 0000205500 | 735C | 7465 | 6E65 | 7076 | 632E | 0001 | 7376 | 0065 |
| 0000205520 | 0000 | 0001 | 0001 | 6F0F | 3273 | 6E5C | 736D | 6867 |
| 0000205540 | 7264 | 612E | 6D73 | 0001 | 73DC | 00C0 | 0000 | 0001 |
| 0000205560 | 0001 | 6F0E | 3273 | 645C | 736F | 6572 | 2E74 | 7361 |
| 0000205600 | 016D | 9C00 | 0274 | 0001 | 0100 | 0100 | 0800 | 6366 |
| 0000205620 | 6F6C | 6573 | 632E | 0001 | 759E | 006A | 0000 | 0001 |

THU MAR 14 17:41:20 1991 LBIPMT.DLL PAGE 71, LINE 4131

| | | | | | | | | |
|---|---|---|---|---|---|---|---|---|
| 0000205640 | 0001 | 6607 | 706F | 6E65 | 632E | 0001 | 7608 | 005A |
| 0000205660 | 0000 | 0001 | 0001 | 6609 | 7270 | 6E69 | 6674 | 632E |
| 0000205700 | 0001 | 7662 | 004E | 0000 | 0001 | 0001 | 7008 | 6972 |
| 0000205720 | 746E | 2E66 | 0163 | B000 | 3876 | 0000 | 0100 | 0100 |
| 0000205740 | 0700 | 6373 | 6E61 | 2E66 | 0063 | 0000 | 0000 | 0000 |
| 0000205760 | 0100 | 0000 | 0B00 | 635F | 6C66 | 7375 | 2E68 | 7361 |
| 0000206000 | 006D | 0000 | 0000 | 0000 | 0100 | 0000 | 0700 | 665F |
| 0000206020 | 6C69 | 2E65 | 0163 | E800 | 9C76 | 0000 | 0100 | 0100 |
| 0000206040 | 0B00 | 665F | 6C69 | 7562 | 2E66 | 7361 | 016D | 8400 |
| 0000206060 | E577 | 0000 | 0100 | 0100 | 0B00 | 665F | 736C | 7562 |
| 0000206100 | 2E66 | 7361 | 016D | 6A00 | 3778 | 0000 | 0100 | 0100 |
| 0000206120 | 0C00 | 665F | 6572 | 6265 | 6675 | 612E | 6D73 | 0001 |
| 0000206140 | 78A2 | 004B | 0000 | 0001 | 0001 | 5F0B | 6567 | 6274 |
| 0000206160 | 6675 | 612E | 6D73 | 0001 | 78EE | 00F2 | 0000 | 0001 |
| 0000206200 | 0001 | 5F07 | 706F | 6E65 | 632E | 0001 | 79E0 | 00C0 |
| 0000206220 | 0000 | 0001 | 0001 | 5F0B | 6673 | 6274 | 6675 | 612E |
| 0000206240 | 6D73 | 0001 | 7AA0 | 012E | 0000 | 0001 | 0001 | 6608 |
| 0000206260 | 6C66 | 7375 | 2E68 | 0163 | CE00 | 2A7B | 0008 | 0100 |
| 0000206300 | 0100 | 0700 | 6E69 | 7570 | 2E74 | 0163 | F800 | FA83 |
| 0000206320 | 0004 | 0100 | 0100 | 0A00 | 756F | 7074 | 7475 | 612E |
| 0000206340 | 6D73 | 0001 | 88F2 | 0078 | 0000 | 0001 | 0001 | 7308 |
| 0000206360 | 7274 | 6165 | 2E6D | 0163 | 6A00 | 4B89 | 0000 | 0100 |
| 0000206400 | 0100 | 0800 | 7570 | 6374 | 612E | 6D73 | 0001 | 89B6 |
| 0000206420 | 0044 | 0000 | 0001 | 0001 | 6708 | 7465 | 2E63 | 7361 |
| 0000206440 | 016D | FA00 | AA89 | 0000 | 0100 | 0100 | 0800 | 6E75 |
| 0000206460 | 6567 | 6374 | 632E | 0001 | 8AA4 | 003F | 0000 | 0001 |
| 0000206500 | 0001 | 6F0D | 3273 | 635C | 6F6C | 6573 | 612E | 6D73 |
| 0000206520 | 0001 | 8AE4 | 0077 | 0000 | 0001 | 0001 | 6F0D | 3273 |
| 0000206540 | 6C5C | 6573 | 6B65 | 612E | 6D73 | 0001 | 8B5C | 01DD |
| 0000206560 | 000D | 0001 | 0001 | 6F0C | 3273 | 6F5C | 6570 | 2E6E |
| 0000206600 | 7361 | 016D | 3A00 | 5D8D | 0001 | 0100 | 0100 | 0C00 |
| 0000206620 | 736F | 5C32 | 6572 | 6461 | 612E | 6D73 | 0001 | 8E98 |
| 0000206640 | 01DD | 0000 | 0001 | 0001 | 7709 | 6972 | 6574 | 612E |
| 0000206660 | 6D73 | 0000 | 0000 | 0000 | 0000 | 0001 | 0000 | 740B |
| 0000206700 | 7478 | 6F6D | 6564 | 612E | 6D73 | 0001 | 9076 | 000A |
| 0000206720 | 0000 | 0001 | 0001 | 6D0A | 6C61 | 6F6C | 2E63 | 7361 |
| 0000206740 | 016D | 8000 | 0A90 | 0000 | 0100 | 0100 | 0800 | 7266 |
| 0000206760 | 6565 | 612E | 6D73 | 0001 | 908A | 00AF | 0000 | 0001 |
| 0000207000 | 0001 | 660B | 616D | 6C6C | 636F | 612E | 6D73 | 0000 |
| 0000207020 | 0000 | 0000 | 0000 | 0001 | 0000 | 6609 | 6164 | 6174 |
| 0000207040 | 612E | 6D73 | 0001 | 913A | 0034 | 0000 | 0001 | 0001 |
| 0000207060 | 690B | 696E | 7374 | 6765 | 612E | 6D73 | 0001 | 916E |
| 0000207100 | 0036 | 0000 | 0001 | 0001 | 6C0B | 6E69 | 736B | 6765 |
| 0000207120 | 612E | 6D73 | 0001 | 91A4 | 007C | 0000 | 0001 | 0001 |
| 0000207140 | 730C | 6165 | 6372 | 7368 | 2E67 | 7361 | 016D | 2000 |
| 0000207160 | E292 | 0000 | 0100 | 0100 | 0B00 | 7267 | 776F | 6573 |
| 0000207200 | 2E67 | 7361 | 016D | 0200 | 3193 | 0000 | 0100 | 0100 |
| 0000207220 | 0A00 | 656E | 7377 | 6765 | 612E | 6D73 | 0001 | 9334 |
| 0000207240 | 0046 | 0000 | 0001 | 0001 | 730A | 7274 | 6163 | 2E74 |
| 0000207260 | 7361 | 016D | 7A00 | 3693 | 0000 | 0100 | 0100 | 0A00 |
| 0000207300 | 7473 | 6372 | 7970 | 612E | 6D73 | 0001 | 93B0 | 0029 |
| 0000207320 | 0000 | 0001 | 0001 | 730A | 7274 | 6D63 | 2E70 | 7361 |
| 0000207340 | 016D | DA00 | 1793 | 0000 | 0100 | 0100 | 0A00 | 7473 |
| 0000207360 | 6C72 | 6E65 | 612E | 6D73 | 0001 | 93F2 | 002A | 0000 |
| 0000207400 | 0001 | 0001 | 730B | 7274 | 636E | 7970 | 612E | 6D73 |
| 0000207420 | 0001 | 941C | 003B | 0000 | 0001 | 0001 | 730B | 7274 |
| 0000207440 | 636E | 706D | 612E | 6D73 | 0001 | 9458 | 0003 | 0000 |
| 0000207460 | 0001 | 0001 | 6108 | 6F74 | 2E69 | 7361 | 016D | 5C00 |
| 0000207500 | 0394 | 0000 | 0100 | 0100 | 0800 | 7461 | 6C6F | 612E |

THU MAR 14 17:41:20 1991 LBIPMT.DLL PAGE 72, LINE 4190

| | | | | | | | | |
|---|---|---|---|---|---|---|---|---|
| 0000207520 | 6D73 | 0001 | 9460 | 0060 | 0000 | 0001 | 0001 | 6106 |
| 0000207540 | 6F74 | 2E66 | 0163 | C000 | 5694 | 0000 | 0100 | 0100 |
| 0000207560 | 0800 | 7461 | 786F | 612E | 6D73 | 0001 | 9516 | 001C |
| 0000207600 | 0000 | 0001 | 0001 | 6908 | 6F74 | 2E61 | 7361 | 016D |
| 0000207620 | 3200 | A295 | 0000 | 0100 | 0100 | 0A00 | 665F | 7470 |
| 0000207640 | 736F | 7274 | 632E | 0000 | 0000 | 0000 | 0000 | 0001 |
| 0000207660 | 0000 | 630C | 696D | 6373 | 6164 | 2E74 | 7361 | 006D |
| 0000207700 | 0000 | 0000 | 0000 | 0100 | 0000 | 0900 | 7463 | 7079 |
| 0000207720 | 2E65 | 7361 | 016D | D400 | A695 | 0000 | 0100 | 0100 |
| 0000207740 | 0800 | 6567 | 6574 | 766E | 632E | 0001 | 967A | 0020 |
| 0000207760 | 0000 | 0001 | 0001 | 6F0D | 3273 | 685C | 6964 | 6666 |
| 0000210000 | 612E | 6D73 | 0001 | 969A | 00BA | 0000 | 0001 | 0001 |
| 0000210020 | 6F0D | 3273 | 6D5C | 6F6C | 6B63 | 612E | 6D73 | 0001 |
| 0000210040 | 9754 | 007A | 0000 | 0001 | 0001 | 6410 | 6C6C | 745C |
| 0000210060 | 6469 | 6174 | 6C62 | 2E65 | 7361 | 016D | CE00 | 7497 |
| 0000210100 | 0000 | 0100 | 0100 | 0900 | 7073 | 6972 | 746E | 2E66 |
| 0000210120 | 0163 | 4200 | 5A98 | 0000 | 0100 | 0100 | 0A00 | 6676 |
| 0000210140 | 7270 | 6E69 | 6674 | 632E | 0001 | 989C | 0074 | 0000 |
| 0000210160 | 0001 | 0001 | 760A | 7073 | 6972 | 746E | 2E66 | 0163 |
| 0000210200 | 1000 | 2E99 | 0000 | 0100 | 0100 | 0A00 | 6163 | 6C6C |
| 0000210220 | 636F | 612E | 6D73 | 0001 | 993E | 019C | 0000 | 0001 |
| 0000210240 | 0001 | 6109 | 6373 | 6974 | 656D | 632E | 0001 | 9ADA |
| 0000210260 | 002E | 0000 | 0001 | 0001 | 6307 | 6974 | 656D | 632E |
| 0000210300 | 0000 | 0000 | 0000 | 0000 | 0001 | 0000 | 6406 | 7961 |
| 0000210320 | 2E73 | 0163 | 0800 | DE9B | 0000 | 0100 | 0100 | 0B00 |
| 0000210340 | 736F | 5C32 | 7466 | 6D69 | 2E65 | 0163 | E600 | 469B |
| 0000210360 | 0002 | 0100 | 0100 | 0800 | 6D67 | 6974 | 656D | 632E |
| 0000210400 | 0001 | 9E2C | 0084 | 0000 | 0001 | 0001 | 6C0A | 636F |
| 0000210420 | 6C61 | 6974 | 2E6D | 0163 | B000 | 499E | 0000 | 0100 |
| 0000210440 | 0100 | 0C00 | 736F | 5C32 | 6974 | 656D | 612E | 6D73 |
| 0000210460 | 0001 | 9EFA | 01C8 | 0000 | 0001 | 0001 | 7407 | 737A |
| 0000210500 | 7465 | 632E | 0000 | 0000 | 0000 | 0000 | 0001 | 0000 |
| 0000210520 | 7409 | 6D69 | 7365 | 7465 | 632E | 0001 | A0C2 | 00F6 |
| 0000210540 | 0000 | 0001 | 0001 | 640A | 6F74 | 7478 | 6D69 | 2E65 |
| 0000210560 | 0063 | 0000 | 0000 | 0000 | 0100 | 0000 | 0C00 | 635F |
| 0000210600 | 6E69 | 7469 | 6D74 | 612E | 6D73 | 0001 | A1B8 | 005C |
| 0000210620 | 0000 | 0001 | 0001 | 6307 | 6F6C | 6B63 | 632E | 0001 |
| 0000210640 | A214 | 002D | 0000 | 0001 | 0001 | 730A | 7274 | 6863 |
| 0000210660 | 2E72 | 7361 | 016D | 4200 | 2EA2 | 0000 | 0100 | 0100 |
| 0000210700 | 0A00 | 7473 | 6472 | 7075 | 612E | 6D73 | 0001 | A270 |
| 0000210720 | 002E | 0000 | 0001 | 0001 | 730B | 7274 | 6372 | 7268 |
| 0000210740 | 612E | 6D73 | 0001 | A29E | 00CA | 0000 | 0001 | 0001 |
| 0000210760 | 680B | 656D | 636D | 7970 | 612E | 6D73 | 0001 | A368 |
| 0000211000 | 0048 | 0000 | 0001 | 0001 | 680B | 656D | 736D | 7465 |
| 0000211020 | 612E | 6D73 | 0001 | A3B0 | 0063 | 0000 | 0001 | 0001 |
| 0000211040 | 7808 | 6F74 | 2E61 | 7361 | 016D | 1400 | 1AA4 | 0000 |
| 0000211060 | 0100 | 0100 | 0F00 | 736F | 5C32 | 7277 | 3274 | 7265 |
| 0000211100 | 2E72 | 7361 | 016D | 2E00 | 1DA4 | 0000 | 0100 | 0100 |
| 0000211120 | 0E00 | 736F | 5C32 | 6E75 | 696C | 6B6E | 612E | 6D73 |
| 0000211140 | 0001 | A44C | 0022 | 0000 | 0001 | 0001 | 6109 | 6D6C |
| 0000211160 | 6C75 | 612E | 6D73 | 0001 | A46E | 0022 | 0000 | 0001 |
| 0000211200 | 0001 | 6109 | 726C | 6D65 | 612E | 6D73 | 0001 | A490 |
| 0000211220 | 001F | 0000 | 0001 | 0001 | 6109 | 736C | 6C68 | 612E |
| 0000211240 | 6D73 | 0001 | A4B0 | 009A | 0000 | 0001 | 0001 | 6C08 |
| 0000211260 | 6964 | 2E76 | 7361 | 016D | 4A00 | 32A5 | 0000 | 0100 |
| 0000211300 | 0100 | 0800 | 6D6C | 6C75 | 612E | 6D73 | 0001 | A57C |
| 0000211320 | 00A0 | 0000 | 0001 | 0001 | 6C08 | 6572 | 2E6D | 7361 |
| 0000211340 | 016D | 1C00 | 0BA6 | 0000 | 0100 | 0100 | 0800 | 736C |
| 0000211360 | 6C68 | 612E | 6D73 | 0001 | A628 | 005F | 0000 | 0001 |

THU MAR 14 17:41:20 1991 LBIPMT.DLL PAGE 73, LINE 4249

| | | | | | | | | |
|---|---|---|---|---|---|---|---|---|
| 0000211400 | 0001 | 7509 | 646C | 7669 | 612E | 6D73 | 0001 | A688 |
| 0000211420 | 006A | 0000 | 0001 | 0001 | 7509 | 726C | 6D65 | 612E |
| 0000211440 | 6D73 | 0001 | A6F2 | 00A6 | 0000 | 0001 | 0001 | 5C16 |
| 0000211460 | 726D | 5C74 | 6F63 | 6D6D | 6E6F | 6D5C | 6366 | 6C61 |
| 0000211500 | 2E6C | 7361 | 016D | 9800 | D3A7 | 0003 | 0100 | 0100 |
| 0000211520 | 1600 | 6D5C | 7472 | 635C | 6D6F | 6F6D | 5C6E | 7869 |
| 0000211540 | 6F63 | 766E | 412E | 4D53 | 0001 | AB6C | 00B8 | 0000 |
| 0000211560 | 0001 | 0001 | 5C16 | 726D | 5C74 | 6F63 | 6D6D | 6E6F |
| 0000211600 | 695C | 6378 | 6D6F | 2E70 | 5341 | 014D | 2400 | FAAC |
| 0000211620 | 0002 | 0100 | 0100 | 1600 | 6D5C | 7472 | 635C | 6D6F |
| 0000211640 | 6F6D | 5C6E | 3462 | 616D | 6874 | 412E | 4D53 | 0001 |
| 0000211660 | AF1E | 05C0 | 0000 | 0001 | 0001 | 5C16 | 726D | 5C74 |
| 0000211700 | 6F63 | 6D6D | 6E6F | 625C | 6D38 | 7461 | 2E68 | 5341 |
| 0000211720 | 014D | DE00 | 8BB4 | 0001 | 0100 | 0100 | 1700 | 6D5C |
| 0000211740 | 7472 | 635C | 6D6F | 6F6D | 5C6E | 696D | 6638 | 756F |
| 0000211760 | 2E74 | 7361 | 016D | 6900 | 38B6 | 0003 | 0100 | 0100 |
| 0000212000 | 1600 | 6D5C | 7472 | 635C | 6D6F | 6F6D | 5C6E | 696D |
| 0000212020 | 6638 | 6E69 | 612E | 6D73 | 0001 | B9A1 | 018A | 0000 |
| 0000212040 | 0001 | 0001 | 5C17 | 726D | 5C74 | 6F63 | 6D6D | 6E6F |
| 0000212060 | 6D5C | 3869 | 6D74 | 6C75 | 612E | 6D73 | 0001 | BB2C |
| 0000212100 | 0057 | 0000 | 0001 | 0001 | 5C11 | 726D | 5C74 | 5C63 |
| 0000212120 | 616D | 706D | 6474 | 612E | 6D73 | 0001 | BB84 | 0014 |
| 0000212140 | 0000 | 0001 | 0001 | 5C12 | 726D | 5C74 | 5C63 | 6C66 |
| 0000212160 | 7574 | 6573 | 2E64 | 5341 | 014D | 9800 | 29BB | 0007 |
| 0000212200 | 0100 | 0100 | 1100 | 6D5C | 7472 | 635C | 6D5C | 6363 |
| 0000212220 | 6C61 | 2E6C | 7361 | 016D | C200 | 84C2 | 0000 | 0100 |
| 0000212240 | 0100 | 1200 | 6D5C | 7472 | 635C | 6D5C | 6363 | 6C61 |
| 0000212260 | 656C | 612E | 6D73 | 0001 | C346 | 00B5 | 0000 | 0001 |
| 0000212300 | 0001 | 5C10 | 726D | 5C74 | 5C63 | 636D | 6966 | 2E6E |
| 0000212320 | 7361 | 016D | FC00 | 40C3 | 0000 | 0100 | 0100 | 1100 |
| 0000212340 | 6D5C | 7472 | 635C | 6D5C | 6663 | 756F | 2E74 | 7361 |
| 0000212360 | 016D | 3C00 | 3EC4 | 0006 | 0100 | 0100 | 0C00 | 6D5C |
| 0000212400 | 7472 | 635C | 635C | 7476 | 632E | 0000 | 0005 | 055D |
| 0000212420 | 5F08 | 7842 | 665F | 6C69 | EA65 | 0549 | 5D00 | 0B05 |
| 0000212440 | 425F | 5F78 | 6176 | 6E72 | 6D61 | 8065 | 0601 | 8100 |
| 0000212460 | 1600 | 625F | 5F78 | 6769 | 6F6E | 6572 | 705F | 7069 |
| 0000212500 | 5F65 | 7265 | 6F72 | 7372 | 0188 | 0006 | 0081 | 5F11 |
| 0000212520 | 7842 | 445F | 6665 | 7561 | 746C | 6148 | 646E | 656C |
| 0000212540 | 018A | 0006 | 0081 | 5F11 | 7842 | 505F | 6F72 | 6563 |
| 0000212560 | 7373 | 6148 | 646E | 656C | 018C | 0006 | 0081 | 5F0A |
| 0000212600 | 7842 | 6C5F | 6E69 | 6E65 | 8E6F | 0601 | C000 | 0B00 |
| 0000212620 | 425F | 5F78 | 754E | 6C6C | 7453 | 9272 | 0601 | 0300 |
| 0000212640 | 0B05 | 625F | 5F78 | 706F | 6974 | 6E6F | 8273 | 0601 |
| 0000212660 | 8100 | 0D00 | 425F | 5F78 | 6544 | 7562 | 4D67 | 646F |
| 0000212700 | 8465 | 0601 | 8100 | 0D00 | 425F | 5F78 | 6954 | 656D |
| 0000212720 | 4D73 | 646F | 8665 | 0601 | 8100 | 0D00 | 425F | 5F78 |
| 0000212740 | 7245 | 6F72 | 4D72 | 646F | 7165 | 0102 | 7400 | 0D05 |
| 0000212760 | 425F | 5F78 | 6170 | 7372 | 6665 | 6C69 | 0065 | 0100 |
| 0000213000 | 6200 | 0D05 | 425F | 5F78 | 6544 | 7562 | 4967 | 696E |
| 0000213020 | 6E74 | 0106 | 7F00 | 1105 | 425F | 5F78 | 7270 | 6E69 |
| 0000213040 | 5F74 | 706F | 6974 | 6E6F | 7673 | 0512 | 3700 | 0503 |
| 0000213060 | 685F | 6174 | 9E62 | 0506 | 3800 | 0903 | 685F | 6174 |
| 0000213100 | 5F62 | 706F | 0974 | 0114 | 5800 | 0D03 | 425F | 5F78 |
| 0000213120 | 696C | 656E | 616D | 6374 | 0F68 | 010E | 4A00 | 0A03 |
| 0000213140 | 425F | 5F78 | 6966 | 746C | 7265 | 1023 | 0001 | 034D |
| 0000213160 | 5F0E | 7842 | 705F | 6361 | 666B | 6C69 | 6574 | BA72 |
| 0000213200 | 0108 | 3E00 | 0B03 | 425F | 5F78 | 6174 | 6962 | 696E |
| 0000213220 | D874 | 010A | 4300 | 0D03 | 425F | 5F78 | 6174 | 6962 |
| 0000213240 | 736E | 7265 | 4D74 | 010A | 4100 | 0B03 | 425F | 5F78 |

THU MAR 14 17:41:20 1991 LBIPMT.DLL PAGE 74, LINE 4308

| | | | | | | | | |
|---|---|---|---|---|---|---|---|---|
| 0000213260 | 6174 | 6662 | 6E69 | D764 | 010B | 4600 | 0E03 | 425F |
| 0000213300 | 5F78 | 6174 | 6D62 | 6B61 | 7665 | 7261 | 0D24 | 0001 |
| 0000213320 | 0348 | 5F0C | 7842 | 745F | 6261 | 7270 | 6E69 | 6274 |
| 0000213340 | 0113 | 5500 | 1003 | 425F | 5F78 | 6854 | 6572 | 6461 |
| 0000213360 | 6148 | 646E | 656C | 120C | 0001 | 0354 | 5F09 | 7842 |
| 0000213400 | 6D5F | 7461 | 6863 | 49C8 | 0005 | 0352 | 5F0A | 7842 |
| 0000213420 | 695F | 646E | 6E65 | 7274 | 0506 | 5300 | 0903 | 425F |
| 0000213440 | 5F78 | 6673 | 6E75 | 8563 | 0116 | 5900 | 0D03 | 425F |
| 0000213460 | 5F78 | 6544 | 7562 | 5067 | 7375 | 1168 | 0119 | 6400 |
| 0000213500 | 0C03 | 425F | 5F78 | 6544 | 7562 | 5067 | 706F | 15ED |
| 0000213520 | 0001 | 0356 | 5F12 | 7842 | 725F | 7365 | 6E79 | 6863 |
| 0000213540 | 735F | 6174 | 6B63 | FF73 | 0117 | 5C00 | 0F03 | 425F |
| 0000213560 | 5F78 | 7270 | 6E69 | 5F74 | 7473 | 6361 | D56B | 011A |
| 0000213600 | 6700 | 0B03 | 425F | 5F78 | 7546 | 636E | 6552 | 9474 |
| 0000213620 | 0115 | 5400 | 0E03 | 425F | 5F78 | 6E69 | 7469 | 735F |
| 0000213640 | 6174 | 6B63 | 1D7E | 0001 | 036D | 5F0D | 7842 | 735F |
| 0000213660 | 6474 | 6572 | 7674 | 6C61 | 1F28 | 0001 | 0319 | 5F09 |
| 0000213700 | 7842 | 615F | 6974 | 656D | 1F7D | 0001 | 031B | 5F09 |
| 0000213720 | 7842 | 635F | 6974 | 656D | 1FCD | 0001 | 031D | 5F0A |
| 0000213740 | 7842 | 735F | 7274 | 776C | 4E72 | 0120 | 1F00 | 0A03 |
| 0000213760 | 425F | 5F78 | 7473 | 7572 | 7270 | 20CF | 0001 | 0321 |
| 0000214000 | 5F0B | 7842 | 495F | 5773 | 6968 | 6574 | 2120 | 0001 |
| 0000214020 | 0323 | 5F0D | 7842 | 435F | 7475 | 6C42 | 6E61 | 736B |
| 0000214040 | 226D | 0001 | 032C | 5F09 | 7842 | 6547 | 4B74 | 7965 |
| 0000214060 | 21CF | 0001 | 0326 | 5F0A | 7842 | 655F | 6F66 | 6570 |
| 0000214100 | 9A6E | 0126 | 6D00 | 0F03 | 425F | 5F78 | 6544 | 7562 |
| 0000214120 | 5267 | 7465 | 7275 | 326E | 0128 | 7500 | 0D03 | 425F |
| 0000214140 | 5F78 | 6544 | 7562 | 5467 | 6D69 | 3A65 | 0127 | 6F00 |
| 0000214160 | 0E03 | 425F | 5F78 | 6F56 | 6469 | 6552 | 7574 | 6E72 |
| 0000214200 | 0B06 | 0006 | 00C0 | 5F0A | 7842 | 625F | 6775 | 736D |
| 0000214220 | 2767 | 0130 | 9000 | 0803 | 425F | 5F78 | 6E49 | 7469 |
| 0000214240 | 3161 | 0001 | 039A | 5F0A | 7842 | 615F | 6574 | 6978 |
| 0000214260 | 1274 | 060B | C000 | 0A00 | 425F | 5F78 | 7265 | 6D72 |
| 0000214300 | 6773 | 0B16 | 0006 | 00C0 | 5F08 | 7842 | 645F | 746F |
| 0000214320 | 5473 | 0130 | 9200 | 0B03 | 425F | 5F78 | 7270 | 636F |
| 0000214340 | 7365 | A873 | 0129 | 7900 | 0E03 | 425F | 5F78 | 6544 |
| 0000214360 | 7562 | 5067 | 6972 | 746E | 2BBE | 0001 | 0381 | 5F0D |
| 0000214400 | 7842 | 445F | 6265 | 6775 | 7250 | 6669 | 2FDD | 0001 |
| 0000214420 | 038E | 5F0A | 7842 | 735F | 7465 | 6970 | 0664 | 0130 |
| 0000214440 | 8F00 | 0A03 | 425F | 5F78 | 6567 | 7074 | 6469 | 27D3 |
| 0000214460 | 0001 | 0373 | 5F0D | 7842 | 445F | 6265 | 6775 | 7953 |
| 0000214500 | 636E | 30AC | 0001 | 0394 | 5F0F | 7842 | 705F | 6F72 |
| 0000214520 | 6563 | 7373 | 616E | 656D | 0B0A | 0006 | 00C0 | 5F0D |
| 0000214540 | 7842 | 615F | 7373 | 7265 | 6D74 | 6773 | 0B0E | 0006 |
| 0000214560 | 00C0 | 5F0D | 7842 | 615F | 7373 | 6D75 | 6D65 | 6773 |
| 0000214600 | 0B1A | 0006 | 00C0 | 5F0D | 7842 | 745F | 7473 | 7261 |
| 0000214620 | 6D74 | 6773 | 2CB9 | 0001 | 0383 | 5F0D | 7842 | 445F |
| 0000214640 | 6265 | 6775 | 6F43 | 6564 | 0B04 | 0006 | 0081 | 5F09 |
| 0000214660 | 7842 | 425F | 735F | 6769 | 2F3D | 0001 | 038A | 5F13 |
| 0000214700 | 6544 | 7562 | 5367 | 6570 | 6963 | 6C61 | 6341 | 6974 |
| 0000214720 | 6E6F | 2449 | 0001 | 035D | 5F08 | 7842 | 685F | 6C65 |
| 0000214740 | 9A70 | 012A | 7D00 | 0E03 | 425F | 5F78 | 6544 | 7562 |
| 0000214760 | 4567 | 7272 | 726F | 24CA | 0001 | 0367 | 5F0E | 7842 |
| 0000215000 | 445F | 6265 | 6775 | 6E45 | 6574 | D172 | 0130 | 9600 |
| 0000215020 | 0B03 | 425F | 5F78 | 7270 | 666F | 6C69 | 8A65 | 012F |
| 0000215040 | 8C00 | 0E03 | 425F | 5F78 | 6974 | 656D | 6173 | 706D |
| 0000215060 | 656C | 3190 | 0001 | 02FC | 5F11 | 7842 | 445F | 6265 |
| 0000215100 | 6775 | 6156 | 6972 | 6261 | 656C | 34CC | 0001 | 0300 |
| 0000215120 | 5F0D | 7842 | 445F | 6265 | 6775 | 6843 | 7261 | 369D |

THU MAR 14 17:41:20 1991 LBIPMT.DLL PAGE 75, LINE 4367

| | | | | | | | | |
|---|---|---|---|---|---|---|---|---|
| 0000215140 | 0001 | 0318 | 5F0D | 7842 | 445F | 6265 | 6775 | 6F4C |
| 0000215160 | 676E | 37F0 | 0001 | 031E | 5F0F | 7842 | 445F | 6265 |
| 0000215200 | 6775 | 6F44 | 6275 | 656C | 38E0 | 0001 | 0323 | 5F0E |
| 0000215220 | 7842 | 445F | 6265 | 6775 | 6C46 | 616F | 5A74 | 0139 |
| 0000215240 | 2600 | 0C03 | 425F | 5F78 | 6544 | 7562 | 5367 | 7274 |
| 0000215260 | 3788 | 0001 | 031C | 5F10 | 7842 | 445F | 6265 | 6775 |
| 0000215300 | 6F50 | 6E69 | 6574 | CD72 | 0135 | 1400 | 0E03 | 425F |
| 0000215320 | 5F78 | 6544 | 7562 | 5367 | 6F68 | 7472 | 3635 | 0001 |
| 0000215340 | 0316 | 5F0F | 7842 | 445F | 6265 | 6775 | 7355 | 6F68 |
| 0000215360 | 7472 | 3720 | 0001 | 031A | 5F0E | 7842 | 445F | 6265 |
| 0000215400 | 6775 | 6C55 | 6E6F | 6A67 | 0138 | 2100 | 0D03 | 425F |
| 0000215420 | 5F78 | 6544 | 7562 | 4267 | 6F6F | 2F6C | 0135 | 1000 |
| 0000215440 | 0C03 | 425F | 5F78 | 6544 | 7562 | 4967 | 746E | 39FE |
| 0000215460 | 0001 | 02FC | 5F10 | 7842 | 695F | 5F73 | 6170 | 6B63 |
| 0000215500 | 6E5F | 6D61 | E265 | 061E | 8100 | 0D00 | 425F | 5F78 |
| 0000215520 | 756E | 5F6D | 6170 | 6B63 | ED73 | 013A | 0100 | 0C03 |
| 0000215540 | 425F | 5F78 | 6461 | 5F64 | 6170 | 6B63 | 3B59 | 0001 |
| 0000215560 | 0303 | 5F12 | 7842 | 695F | 5F73 | 6361 | 6974 | 6576 |
| 0000215600 | 705F | 6361 | 7C6B | 013A | FF00 | 0E02 | 425F | 5F78 |
| 0000215620 | 6E69 | 7469 | 705F | 6361 | 736B | 3BDA | 0001 | 0300 |
| 0000215640 | 5F0A | 7842 | 705F | 6972 | 696E | 1374 | 013C | 0100 |
| 0000215660 | 0903 | 425F | 5F78 | 6F63 | 6570 | 736E | 0143 | 2B00 |
| 0000215700 | 1403 | 425F | 5F78 | 6544 | 7562 | 4267 | 6975 | 646C |
| 0000215720 | 7250 | 6665 | 7869 | 3C39 | 0001 | 0303 | 5F09 | 7842 |
| 0000215740 | 6C5F | 706F | 6E65 | 4809 | 0001 | 0340 | 5F09 | 7842 |
| 0000215760 | 655F | 7272 | 726F | 3CB8 | 0001 | 0306 | 5F0A | 7842 |
| 0000216000 | 705F | 6F6C | 6570 | 376E | 013D | 0700 | 0B03 | 425F |
| 0000216020 | 5F78 | 7270 | 6C63 | 736F | 6C65 | 013D | 0800 | 0A03 |
| 0000216040 | 425F | 5F78 | 636C | 6F6C | 6573 | 3DDF | 0001 | 0309 |
| 0000216060 | 5F0B | 7842 | 705F | 636C | 6F6C | 6573 | 3E52 | 0001 |
| 0000216100 | 030A | 5F0A | 7842 | 635F | 6C63 | 736F | 7365 | 013E |
| 0000216120 | 0B00 | 0903 | 425F | 5F78 | 6C66 | 7375 | CC68 | 013E |
| 0000216140 | 0D00 | 0C03 | 765F | 7842 | 665F | 7270 | 6E69 | 6674 |
| 0000216160 | 3F26 | 0001 | 030F | 5F0B | 7842 | 6C5F | 7270 | 6E69 |
| 0000216200 | 6674 | 3F74 | 0001 | 0311 | 5F0C | 7842 | 705F | 706C |
| 0000216220 | 6972 | 746E | 7566 | 0140 | 1700 | 0A03 | 425F | 5F78 |
| 0000216240 | 7270 | 6E69 | 6674 | 4185 | 0001 | 031E | 5F07 | 7842 |
| 0000216260 | 695F | 646E | 3FC2 | 0001 | 0313 | 5F0B | 7842 | 635F |
| 0000216300 | 7270 | 6E69 | 6674 | 432C | 0001 | 0328 | 5F0D | 7842 |
| 0000216320 | 695F | 646E | 7270 | 6E69 | 6674 | 4008 | 0001 | 0315 |
| 0000216340 | 5F0B | 4276 | 5F78 | 7270 | 6E69 | 6674 | 40BC | 0001 |
| 0000216360 | 0318 | 5F08 | 7842 | 6C5F | 6E69 | FF64 | 0140 | 1B00 |
| 0000216400 | 0903 | 425F | 5F78 | 6C70 | 6E69 | 4264 | 0141 | 1C00 |
| 0000216420 | 0803 | 425F | 5F78 | 6963 | 646E | 41C9 | 0001 | 0320 |
| 0000216440 | 5F0E | 7842 | 635F | 6E69 | 7064 | 6972 | 746E | 1466 |
| 0000216460 | 0142 | 2200 | 0E03 | 425F | 5F78 | 696C | 646E | 7270 |
| 0000216500 | 6E69 | 6674 | 4267 | 0001 | 0324 | 5F0F | 7842 | 705F |
| 0000216520 | 696C | 646E | 7270 | 6E69 | 6674 | 42BA | 0001 | 0326 |
| 0000216540 | 5F0E | 4276 | 5F78 | 6E69 | 7064 | 6972 | 746E | B966 |
| 0000216560 | 0146 | 3800 | 1503 | 425F | 5F78 | 4463 | 6265 | 6775 |
| 0000216600 | 7250 | 6E69 | 5074 | 6572 | 6966 | 0D78 | 0147 | 3A00 |
| 0000216620 | 1503 | 425F | 5F78 | 446C | 6265 | 6775 | 7250 | 6E69 |
| 0000216640 | 5074 | 6572 | 6966 | 6178 | 0147 | 3C00 | 1603 | 425F |
| 0000216660 | 5F78 | 6C70 | 6544 | 7562 | 5067 | 6972 | 746E | 7250 |
| 0000216700 | 6665 | 7869 | 47B5 | 0001 | 033E | 5F14 | 7842 | 445F |
| 0000216720 | 6265 | 6775 | 7250 | 6E69 | 5074 | 6572 | 6966 | 6878 |
| 0000216740 | 0148 | A200 | 0902 | 425F | 5F78 | 6C63 | 636F | BE6B |
| 0000216760 | 0148 | A500 | 0A02 | 425F | 5F78 | 7270 | 6974 | 656D |
| 0000217000 | 4908 | 0001 | 02A8 | 5F0F | 7842 | 705F | 5F72 | 6974 |

THU MAR 14 17:41:20 1991 LBIPMT.DLL PAGE 76, LINE 4426

| | | | | | | | | |
|---|---|---|---|---|---|---|---|---|
| 0000217020 | 656D | 6964 | 6666 | 4A64 | 0001 | 0332 | 5F07 | 7842 |
| 0000217040 | 644C | 6C65 | 4ADB | 0001 | 0335 | 5F07 | 7862 | 694C |
| 0000217060 | 736E | 4B54 | 0001 | 0337 | 5F09 | 7862 | 634C | 6F6C |
| 0000217100 | 6573 | 4BA4 | 0001 | 033A | 5F08 | 7862 | 664C | 6572 |
| 0000217120 | 0B65 | 014C | 3C00 | 0C03 | 625F | 4C78 | 6572 | 7274 |
| 0000217140 | 6569 | 6576 | 4C66 | 0001 | 033E | 5F09 | 7862 | 734C |
| 0000217160 | 6F74 | 6572 | 4CC8 | 0001 | 0341 | 5F09 | 7862 | 704C |
| 0000217200 | 6972 | 746E | 4D51 | 0001 | 0344 | 5F08 | 7862 | 634C |
| 0000217220 | 706F | 2E79 | 014E | 4600 | 0A03 | 625F | 4C78 | 6F63 |
| 0000217240 | 636E | 7461 | 4F03 | 0001 | 0348 | 5F08 | 7862 | 664C |
| 0000217260 | 6E69 | 6C64 | 0149 | 2700 | 0703 | 625F | 4C78 | 7270 |
| 0000217300 | 9F74 | 0149 | 2A00 | 0803 | 625F | 4C78 | 6F63 | 706D |
| 0000217320 | 4FAB | 0001 | 034A | 5F0A | 7862 | 734C | 6165 | 6372 |
| 0000217340 | DF68 | 014A | 3000 | 0803 | 625F | 4C78 | 706F | 6E65 |
| 0000217360 | 5499 | 0001 | 077A | 420B | 5F58 | 5845 | 5449 | 5546 |
| 0000217400 | 434E | 5042 | 0001 | 076A | 5F0D | 7842 | 6F5F | 3273 |
| 0000217420 | 635F | 706F | 6E65 | 50DE | 0001 | 076F | 5F0E | 7842 |
| 0000217440 | 6F5F | 3273 | 705F | 6972 | 746E | EB66 | 0151 | 7400 |
| 0000217460 | 0E07 | 425F | 5F78 | 736F | 7032 | 5F6D | 656D | 756E |
| 0000217500 | 5616 | 0001 | 0783 | 5F0A | 7842 | 6F5F | 3273 | 6970 |
| 0000217520 | 1A64 | 0621 | 8100 | 0D00 | 625F | 5F78 | 6970 | 6570 |
| 0000217540 | 7661 | 6961 | 0F6C | 0153 | 7700 | 0E07 | 5842 | 4D5F |
| 0000217560 | 4E45 | 4455 | 474C | 5250 | 434F | 21C0 | 0006 | 0081 |
| 0000217600 | 5F0F | 7842 | 6E5F | 6D75 | 745F | 7268 | 6165 | 7364 |
| 0000217620 | 56B7 | 0001 | 0523 | 5F10 | 7842 | 745F | 7268 | 6165 |
| 0000217640 | 5F64 | 7473 | 7261 | 5774 | 0157 | 2600 | 0E05 | 425F |
| 0000217660 | 5F78 | 6874 | 6572 | 6461 | 655F | 646E | 5859 | 0001 |
| 0000217700 | 0529 | 5F07 | 7842 | 745F | 6469 | 5821 | 0001 | 0528 |
| 0000217720 | 5F0F | 7842 | 6D5F | 6961 | 5F6E | 6874 | 6572 | 6461 |
| 0000217740 | 5896 | 0001 | 052B | 5F0F | 7842 | 745F | 7268 | 6165 |
| 0000217760 | 5F64 | 616E | 656D | 5642 | 0001 | 0520 | 5F10 | 7842 |
| 0000220000 | 695F | 696E | 5F74 | 6874 | 6572 | 6461 | DF73 | 0157 |
| 0000220020 | 2700 | 1205 | 425F | 5F78 | 7369 | 6D5F | 7475 | 5F69 |
| 0000220040 | 6874 | 6572 | 6461 | 58EE | 0001 | 052D | 5F0F | 7842 |
| 0000220060 | 635F | 7275 | 5F72 | 6874 | 6572 | 6461 | 49E8 | 0005 |
| 0000220100 | 0081 | 5F07 | 7979 | 656C | 676E | 48FC | 0005 | 0279 |
| 0000220120 | 5F07 | 7979 | 6574 | 7478 | 1074 | 0005 | 0081 | 5F08 |
| 0000220140 | 7979 | 6F6D | 6672 | 1267 | 054A | 7900 | 0702 | 795F |
| 0000220160 | 7379 | 7562 | 2866 | 0500 | 8100 | 0800 | 795F | 7479 |
| 0000220200 | 6863 | 7261 | 002A | 0005 | 024A | 5F09 | 7979 | 7365 |
| 0000220220 | 6174 | 6574 | 002E | 0005 | 02CA | 5F09 | 7979 | 736C |
| 0000220240 | 6174 | 6574 | 49E4 | 0005 | 02CB | 5F06 | 7979 | 736C |
| 0000220260 | A070 | 0508 | CB00 | 0702 | 795F | 6F79 | 736C | C470 |
| 0000220300 | 0549 | C100 | 0600 | 795F | 6679 | 646E | 595E | 0001 |
| 0000220320 | 02BE | 5F06 | 7979 | 656C | 5378 | 015A | CC00 | 0702 |
| 0000220340 | 795F | 6C79 | 6F6F | 126B | 0161 | D000 | 0702 | 795F |
| 0000220360 | 6279 | 6361 | 326B | 015A | C000 | 0702 | 795F | 7779 |
| 0000220400 | 6172 | 5670 | 0626 | C000 | 0700 | 795F | 7379 | 7470 |
| 0000220420 | 6072 | 0622 | 0600 | 0502 | 795F | 6979 | 646E | 0622 |
| 0000220440 | 0600 | 0602 | 795F | 6F79 | 7475 | 2654 | 0006 | 0081 |
| 0000220460 | 5F09 | 7979 | 696C | 656E | 6F6E | 2518 | 0006 | 02C7 |
| 0000220500 | 5F07 | 7979 | 7673 | 6365 | 2268 | 0006 | 02C2 | 5F08 |
| 0000220520 | 7979 | 7376 | 6F74 | C470 | 0625 | 4A00 | 0702 | 795F |
| 0000220540 | 6279 | 6967 | 966E | 0622 | C600 | 0802 | 795F | 6379 |
| 0000220560 | 6172 | 6B6E | 25C0 | 0006 | 0249 | 5F06 | 7979 | 6F74 |
| 0000220600 | C870 | 0625 | C800 | 0802 | 795F | 6D79 | 7461 | 6863 |
| 0000220620 | 616B | 0001 | 02D1 | 5F08 | 7979 | 6E69 | 7570 | 4A74 |
| 0000220640 | 0626 | C900 | 0802 | 795F | 6579 | 7478 | 6172 | 6202 |
| 0000220660 | 0001 | 02D3 | 5F09 | 7979 | 756F | 7074 | 7475 | 265A |

THU MAR 14 17:41:20 1991 LBIPMT.DLL PAGE 77, LINE 4485

| | | | | | | | | |
|---|---|---|---|---|---|---|---|---|
| 0000220700 | 0006 | 0081 | 5F0B | 7979 | 7270 | 7665 | 6F69 | 7375 |
| 0000220720 | 6230 | 0001 | 02D5 | 5F08 | 7979 | 6E75 | 7570 | 9C74 |
| 0000220740 | 0508 | 0600 | 0902 | 795F | 7479 | 6966 | 656C | 9A70 |
| 0000220760 | 0506 | C000 | 0900 | 795F | 7479 | 6966 | 656C | E06E |
| 0000221000 | 0549 | 4F00 | 0703 | 735F | 6476 | 7270 | 4E64 | 0503 |
| 0000221020 | 5000 | 0803 | 735F | 6476 | 616E | 736D | 4ADE | 0005 |
| 0000221040 | 00C1 | 5F05 | 7979 | 6978 | 0352 | 0005 | 0358 | 5F04 |
| 0000221060 | 7979 | A476 | 0508 | 5900 | 0703 | 725F | 6465 | 6573 |
| 0000221100 | DA71 | 054A | 3A00 | 0703 | 795F | 6C79 | 6176 | DC6C |
| 0000221120 | 0549 | 3A00 | 0603 | 795F | 7679 | 6C61 | 2842 | 0006 |
| 0000221140 | 0081 | 5F08 | 7979 | 6674 | 616C | 4467 | 0628 | 5300 |
| 0000221160 | 0703 | 795F | 6579 | 6378 | 5261 | 0628 | 5400 | 0603 |
| 0000221200 | 795F | 6179 | 7463 | 2A14 | 0006 | 0355 | 5F07 | 7979 |
| 0000221220 | 6170 | 7463 | 2A34 | 0006 | 0356 | 5F06 | 7979 | 6770 |
| 0000221240 | 3E6F | 062A | 5700 | 0503 | 795F | 7279 | 5231 | 062A |
| 0000221260 | 5700 | 0503 | 795F | 7279 | 6632 | 062A | 5500 | 0603 |
| 0000221300 | 795F | 6379 | 6B68 | 2A86 | 0006 | 0355 | 5F06 | 7979 |
| 0000221320 | 6564 | A666 | 062A | 8100 | 0A00 | 705F | 7963 | 6579 |
| 0000221340 | 7272 | 7463 | 2AA8 | 0006 | 0081 | 5F0A | 6370 | 7979 |
| 0000221360 | 7265 | 6672 | AA6C | 062A | 8100 | 0700 | 725F | 6465 |
| 0000221400 | 6E63 | AC74 | 062A | 8100 | 0A00 | 705F | 7963 | 7479 |
| 0000221420 | 6B6F | 6E65 | 681D | 0001 | 035A | 5F08 | 7979 | 6170 |
| 0000221440 | 7372 | 7665 | 0162 | 3F00 | 1003 | 645F | 6762 | 6C5F |
| 0000221460 | 7369 | 5F74 | 7263 | 6165 | 6574 | 62F6 | 0001 | 0341 |
| 0000221500 | 5F08 | 7979 | 7265 | 6F72 | 8E72 | 0635 | 0000 | 0600 |
| 0000221520 | 655F | 6164 | 6174 | 9F60 | 0006 | 0000 | 5F04 | 6E65 |
| 0000221540 | AA64 | 016F | 0000 | 0600 | 5F43 | 4E49 | 5449 | 2ABC |
| 0000221560 | 0006 | 0000 | 5F0C | 6E5F | 6568 | 7061 | 645F | 7365 |
| 0000221600 | 6063 | 069F | 0000 | 0C00 | 735F | 6174 | 6B63 | 6F62 |
| 0000221620 | 7474 | 6D6F | 2AE2 | 0006 | 0000 | 5F0C | 5F5F | 4461 |
| 0000221640 | 7342 | 7077 | 6C66 | AE67 | 062A | 0000 | 0800 | 5F5F |
| 0000221660 | 6361 | 646D | 6E6C | 2AE0 | 0006 | 0000 | 5F08 | 615F |
| 0000221700 | 6573 | 6867 | DE69 | 062A | 0000 | 0800 | 5F5F | 7361 |
| 0000221720 | 6765 | 6F6C | 2ABA | 0006 | 0000 | 5F08 | 615F | 6973 |
| 0000221740 | 647A | B873 | 062A | 0000 | 0800 | 5F5F | 7461 | 706F |
| 0000221760 | 7073 | 2AD0 | 0006 | 0000 | 5F09 | 615F | 6663 | 6E69 |
| 0000222000 | 6F66 | D6D6 | 0000 | 0001 | 5F09 | 615F | 4244 | 7375 |
| 0000222020 | 6465 | 2AB0 | 0006 | 0000 | 5F09 | 615F | 6E65 | 7376 |
| 0000222040 | 6765 | 2AB4 | 0006 | 0000 | 5F0A | 745F | 7268 | 6165 |
| 0000222060 | 6964 | B264 | 062A | 0000 | 0A00 | 5F5F | 6967 | 666E |
| 0000222100 | 736F | 6765 | D6D6 | 0000 | 0001 | 5F0A | 615F | 4244 |
| 0000222120 | 6F64 | 7773 | B670 | 062A | 0000 | 0A00 | 5F5F | 696C |
| 0000222140 | 666E | 736F | 6765 | 9876 | 0000 | 0001 | 5F0A | 615F |
| 0000222160 | 7263 | 7574 | 6573 | E464 | 062A | 0000 | 0B00 | 5F5F |
| 0000222200 | 615F | 4244 | 7472 | 7265 | 1B72 | 0170 | 0000 | 0B00 |
| 0000222220 | 5F5F | 6D61 | 6773 | 655F | 6978 | F274 | 062A | 0000 |
| 0000222240 | 0B00 | 5F5F | 736F | 6576 | 7372 | 6F69 | 356E | 0171 |
| 0000222260 | 0000 | 0600 | 5F5F | 7865 | 7469 | 71E7 | 0001 | 0000 |
| 0000222300 | 5F0C | 755F | 6C6E | 636F | 656B | 6978 | 0574 | 062D |
| 0000222320 | 0000 | 0700 | 5F5F | 6863 | 6C69 | F564 | 062A | 0000 |
| 0000222340 | 0700 | 5F5F | 666E | 6C69 | 7C65 | 0170 | 0000 | 0700 |
| 0000222360 | 5F5F | 6963 | 696E | F774 | 062C | 0000 | 0700 | 5F5F |
| 0000222400 | 615F | 6772 | 3D63 | 0171 | 0000 | 0700 | 5F5F | 6563 |
| 0000222420 | 6978 | F274 | 062A | 0000 | 0D00 | 5F5F | 6F64 | 7673 |
| 0000222440 | 7265 | 616D | 6F6A | F972 | 062C | 0000 | 0700 | 5F5F |
| 0000222460 | 615F | 6772 | F376 | 062A | 0000 | 0D00 | 5F5F | 6F64 |
| 0000222500 | 7673 | 7265 | 696D | 6F6E | F772 | 062B | 0000 | 0800 |
| 0000222520 | 5F5F | 6970 | 6570 | 6863 | 2CFD | 0006 | 0000 | 5F08 |
| 0000222540 | 6E65 | 6976 | 6F72 | F76E | 062A | 0000 | 0800 | 5F5F |

THU MAR 14 17:41:20 1991 LBIPMT.DLL PAGE 78, LINE 4544

| | | | | | | | | |
|---|---|---|---|---|---|---|---|---|
| 0000222560 | 736F | 6966 | 656C | 2AF4 | 0006 | 0000 | 5F08 | 6F5F |
| 0000222600 | 6D73 | 646F | D665 | 0170 | 0000 | 0800 | 5F5F | 6E69 |
| 0000222620 | 7469 | 7066 | 3354 | 0006 | 0000 | 5F08 | 665F | 6970 |
| 0000222640 | 696E | 0A74 | 0172 | 0000 | 0800 | 5F5F | 6574 | 6D72 |
| 0000222660 | 7066 | 2D01 | 0006 | 0000 | 5F08 | 705F | 6D67 | 7470 |
| 0000222700 | 4772 | 0171 | 0000 | 0800 | 5F5F | 5F63 | 7865 | 7469 |
| 0000222720 | 2AF4 | 0006 | 0000 | 5F09 | 645F | 736F | 6F6D | 6564 |
| 0000222740 | 2AF2 | 0006 | 0000 | 5F09 | 6F5F | 6D73 | 6A61 | 726F |
| 0000222760 | 2AF3 | 0006 | 0000 | 5F09 | 6F5F | 6D73 | 6E69 | 726F |
| 0000223000 | 2D07 | 0006 | 0000 | 5F0A | 655F | 6978 | 6474 | 6E6F |
| 0000223020 | 9D65 | 0171 | 0000 | 0A00 | 5F5F | 6F6C | 6B63 | 7865 |
| 0000223040 | 7469 | 2AF0 | 0006 | 0000 | 5F0A | 755F | 616D | 6B73 |
| 0000223060 | 6176 | 0A6C | 0172 | 0000 | 0A00 | 5F5F | 7463 | 7265 |
| 0000223100 | 736D | 6275 | 2D09 | 0006 | 0000 | 5F0A | 655F | 6978 |
| 0000223120 | 5F74 | 6974 | E664 | 062A | 0000 | 0500 | 5F5F | 6166 |
| 0000223140 | 2E63 | 0171 | n000 | 0500 | 655F | 6978 | 2C74 | 0172 |
| 0000223160 | 0000 | 0E06 | 5F5F | 4646 | 4D5F | 4753 | 4142 | 4E4E |
| 0000223200 | 5245 | 2D0C | 0006 | 0000 | 5F09 | 615F | 6264 | 6D67 |
| 0000223220 | 6773 | 9876 | 0000 | 0001 | 5F09 | 615F | 7263 | 6D74 |
| 0000223240 | 6773 | 724E | 0001 | 0000 | 5F08 | 665F | 7470 | 6172 |
| 0000223260 | 1070 | 062D | 0000 | 0C00 | 5F5F | 6161 | 746C | 7473 |
| 0000223300 | 6F6B | 7276 | 7254 | 0001 | 0000 | 5F08 | 635F | 6B68 |
| 0000223320 | 7473 | 546B | 0172 | 0000 | 0A00 | 5F5F | 4661 | 6863 |
| 0000223340 | 736B | 6B74 | 726E | 0001 | 0000 | 5F09 | 735F | 7465 |
| 0000223360 | 6E65 | 7076 | 7376 | 0001 | 0000 | 5F0B | 4E5F | 534D |
| 0000223400 | 5F47 | 4554 | 5458 | 73A6 | 0001 | 0000 | 5F0C | 4E5F |
| 0000223420 | 534D | 5F47 | 5257 | 5449 | 8845 | 0174 | 0000 | 0B00 |
| 0000223440 | 5F5F | 645F | 736F | 7265 | 6E72 | 906F | 0174 | 0000 |
| 0000223460 | 0700 | 5F5F | 7265 | 6E72 | 416F | 0174 | 0000 | 0800 |
| 0000223500 | 5F5F | 6F64 | 7273 | 7465 | 7428 | 0001 | 0000 | 5F09 |
| 0000223520 | 645F | 736F | 6572 | 6674 | 74E8 | 0001 | 0000 | 5F0B |
| 0000223540 | 665F | 6C63 | 736F | 5F65 | 6B6C | 749C | 0001 | 0000 |
| 0000223560 | 5F07 | 6366 | 6F6C | 6573 | 759E | 0001 | 0000 | 5F08 |
| 0000223600 | 665F | 6F73 | 6570 | F06E | 0175 | 0000 | 0600 | 665F |
| 0000223620 | 706F | 6E65 | 7608 | 0001 | 0000 | 5F08 | 7066 | 6972 |
| 0000223640 | 746E | 6266 | 0176 | 0000 | 0700 | 705F | 6972 | 746E |
| 0000223660 | B066 | 0176 | 0000 | 0600 | 735F | 6163 | 666E | 2D18 |
| 0000223700 | 0006 | 0000 | 5F08 | 635F | 6C66 | 7375 | 7668 | 0510 |
| 0000223720 | 0000 | 0700 | 5F5F | 7562 | 6966 | 1A6E | 062D | 0000 |
| 0000223740 | 0500 | 5F5F | 6F69 | FA62 | 062E | 0000 | 0600 | 5F5F |
| 0000223760 | 6F69 | 3262 | 30DA | 0006 | 0000 | 5F09 | 6C5F | 7361 |
| 0000224000 | 6974 | 626F | 76E8 | 0001 | 0000 | 5F08 | 665F | 6C69 |
| 0000224020 | 7562 | 8466 | 0177 | 0000 | 0800 | 5F5F | 6C66 | 6273 |
| 0000224040 | 6675 | 786A | 0001 | 0000 | 5F09 | 665F | 6572 | 6265 |
| 0000224060 | 6675 | 78A2 | 0001 | 0000 | 5F08 | 675F | 7465 | 7562 |
| 0000224100 | EE66 | 0178 | 0000 | 0A00 | 5F5F | 706F | 6E65 | 6966 |
| 0000224120 | 656C | 7A58 | 0001 | 0000 | 5F07 | 665F | 6274 | 6675 |
| 0000224140 | 79E0 | 0001 | 0000 | 5F07 | 735F | 6274 | 6675 | 7AE6 |
| 0000224160 | 0001 | 0000 | 5F0B | 665F | 6C66 | 7375 | 5F68 | 6B6C |
| 0000224200 | 7AA0 | 0001 | 0000 | 5F07 | 6666 | 756C | 6873 | 7B52 |
| 0000224220 | 0001 | 0000 | 5F09 | 6C66 | 7375 | 6168 | 6C6C | 7BCE |
| 0000224240 | 0001 | 0000 | 5F07 | 695F | 706E | 7475 | 8408 | 0001 |
| 0000224260 | 0000 | 5F08 | 6F5F | 7475 | 7570 | F274 | 0188 | 0000 |
| 0000224300 | 0B00 | 5F5F | 6567 | 7374 | 7274 | 6165 | 726D | 0189 |
| 0000224320 | 0000 | 0600 | 665F | 7570 | 6374 | 896A | 0001 | 0000 |
| 0000224340 | 5F08 | 7570 | 6374 | 6168 | 6A72 | 0189 | 0000 | 0900 |
| 0000224360 | 665F | 7570 | 6374 | 6168 | 7272 | 0189 | 0000 | 0500 |
| 0000224400 | 705F | 7475 | BE63 | 0189 | 0000 | 0600 | 665F | 6567 |
| 0000224420 | 6374 | 89B6 | 0001 | 0000 | 5F08 | 6567 | 6374 | 6168 |

THU MAR 14 17:41:20 1991 LBIPMT.DLL PAGE 79, LINE 4603

| | | | | | | | | |
|---|---|---|---|---|---|---|---|---|
| 0000224440 | B672 | 0189 | 0000 | 0900 | 665F | 6567 | 6374 | 6168 |
| 0000224460 | BE72 | 0189 | 0000 | 0500 | 675F | 7465 | FA63 | 0189 |
| 0000224500 | 0000 | 0700 | 755F | 676E | 7465 | 3A63 | 018A | 0000 |
| 0000224520 | 0B00 | 5F5F | 6E75 | 6567 | 6374 | 6C5F | A46B | 018A |
| 0000224540 | 0000 | 0600 | 635F | 6F6C | 6573 | 8AEE | 0001 | 0000 |
| 0000224560 | 5F06 | 736C | 6565 | E46B | 018A | 0000 | 0A00 | 5F5F |
| 0000224600 | 736C | 6565 | 5F6B | 6B6C | 8B5C | 0001 | 0000 | 5F06 |
| 0000224620 | 6F73 | 6570 | 6D6E | 018B | 0000 | 0500 | 6F5F | 6570 |
| 0000224640 | 286E | 018D | 0000 | 1100 | 5F5F | 5863 | 4E45 | 5849 |
| 0000224660 | 6F74 | 4F44 | 6D53 | 646F | 3A65 | 018D | 0000 | 0500 |
| 0000224700 | 725F | 6165 | A264 | 018E | 0000 | 0600 | 775F | 6972 |
| 0000224720 | 6574 | 8E98 | 0001 | 0000 | 5F0A | 775F | 6972 | 6574 |
| 0000224740 | 6C5F | 506B | 0631 | 0000 | 0700 | 5F5F | 6D66 | 646F |
| 0000224760 | 5065 | 0631 | 0000 | 0800 | 5F5F | 6F69 | 6F6D | 6564 |
| 0000225000 | 9076 | 0001 | 0000 | 5F07 | 616D | 6C6C | 636F | 907B |
| 0000225020 | 0001 | 0000 | 5F0A | 616D | 6C6C | 636F | 6C5F | 856R |
| 0000225040 | 0190 | 0000 | 0800 | 665F | 6572 | 5F65 | 6B6C | 9080 |
| 0000225060 | 0001 | 0000 | 5F05 | 7266 | 6565 | 90BC | 0001 | 0000 |
| 0000225100 | 5F0C | 665F | 616D | 6C6C | 636F | 6C5F | 8A6B | 0190 |
| 0000225120 | 0000 | 0700 | 5F5F | 6666 | 6572 | 9D65 | 0190 | 0000 |
| 0000225140 | 0900 | 5F5F | 6D66 | 6C61 | 6F6C | 8A63 | 0190 | 0000 |
| 0000225160 | 0A00 | 5F5F | 6666 | 6572 | 5F65 | 6B6C | 3152 | 0006 |
| 0000225200 | 0000 | 5F07 | 665F | 6568 | 7061 | 913A | 0001 | 0000 |
| 0000225220 | 5F09 | 695F | 696E | 7374 | 6765 | 916E | 0001 | 0000 |
| 0000225240 | 5F09 | 6C5F | 6E69 | 736B | 6765 | 91A4 | 0001 | 0000 |
| 0000225260 | 5F0B | 735F | 6165 | 6372 | 7368 | 6765 | 92AF | 0001 |
| 0000225300 | 0000 | 5F08 | 695F | 636E | 6573 | 2067 | 0192 | 0000 |
| 0000225320 | 0900 | 5F5F | 7267 | 776F | 6573 | E267 | 0192 | 0000 |
| 0000225340 | 0A00 | 5F5F | 6966 | 646E | 616C | 7473 | 3160 | 0006 |
| 0000225360 | 0000 | 5F0A | 615F | 626D | 6B6C | 6973 | 027A | 0193 |
| 0000225400 | 0000 | 0800 | 5F5F | 656E | 7377 | 6765 | 9334 | 0001 |
| 0000225420 | 0000 | 5F07 | 7473 | 6372 | 7461 | 937A | 0001 | 0000 |
| 0000225440 | 5F07 | 7473 | 6372 | 7970 | 93B0 | 0001 | 0000 | 5F07 |
| 0000225460 | 7473 | 6372 | 706D | 93DA | 0001 | 0000 | 5F07 | 7473 |
| 0000225500 | 6C72 | 6E65 | 93F2 | 0001 | 0000 | 5F08 | 7473 | 6E72 |
| 0000225520 | 7063 | 1C79 | 0194 | 0000 | 0800 | 735F | 7274 | 636E |
| 0000225540 | 706D | 9458 | 0001 | 0000 | 5F05 | 7461 | 696F | 945C |
| 0000225560 | 0001 | 0000 | 5F05 | 7461 | 6C6F | 9460 | 0001 | 0000 |
| 0000225600 | 4104 | 4F54 | C046 | 0194 | 0000 | 0700 | 5F5F | 6163 |
| 0000225620 | 6F74 | 1678 | 0195 | 0000 | 0500 | 695F | 6F74 | 3261 |
| 0000225640 | 0195 | 0000 | 0900 | 5F5F | 7066 | 6F74 | 7473 | 6272 |
| 0000225660 | 0631 | 0000 | 0D00 | 5F5F | 6663 | 746C | 7663 | 5F74 |
| 0000225700 | 6174 | 7E62 | 0631 | 0000 | 0800 | 5F5F | 7361 | 7A69 |
| 0000225720 | 4365 | 317F | 0006 | 0000 | 5F08 | 615F | 6973 | 657A |
| 0000225740 | 7C44 | 0631 | 0000 | 0B00 | 5F5F | 6973 | 6967 | 746E |
| 0000225760 | 666F | 7A66 | 0631 | 0000 | 0B00 | 5F5F | 6973 | 6967 |
| 0000226000 | 746E | 6573 | 8067 | 0631 | 0000 | 0700 | 5F5F | 7463 |
| 0000226020 | 7079 | 8065 | 0631 | 0000 | 0800 | 5F5F | 7463 | 7079 |
| 0000226040 | 5F65 | 95D4 | 0001 | 0000 | 5F07 | 6567 | 6574 | 766E |
| 0000226060 | 967A | 0001 | 0000 | 5F0A | 615F | 6146 | 6468 | 6669 |
| 0000226100 | EA66 | 0196 | 0000 | 0600 | 5F5F | 6F6C | 6B63 | 9734 |
| 0000226120 | 0001 | 0000 | 5F07 | 6C5F | 636F | 666B | 96BE | 0001 |
| 0000226140 | 0000 | 5F0D | 755F | 6C6E | 636F | 5F6B | 6966 | 656C |
| 0000226160 | 969A | 0001 | 0000 | 5F0D | 6C5F | 636F | 5F6B | 7473 |
| 0000226200 | 6572 | 6D61 | 9714 | 0001 | 0000 | 5F08 | 755F | 6C6E |
| 0000226220 | 636F | 826B | 0632 | 0000 | 0900 | 5F5F | 6F6C | 6B63 |
| 0000226240 | 6E63 | 4474 | 0197 | 0000 | 0900 | 5F5F | 6E75 | 6F6C |
| 0000226260 | 6B63 | A666 | 0196 | 0000 | 0F00 | 5F5F | 6E75 | 6F6C |
| 0000226300 | 6B63 | 735F | 7274 | 6165 | CA6D | 0196 | 0000 | 0A00 |

THU MAR 14 17:41:20 1991 LBIPMT.DLL PAGE 80, LINE 4662

| | | | | | | | | |
|---|---|---|---|---|---|---|---|---|
| 0000226320 | 5F5F | 6177 | 7469 | 6F6C | 6B63 | 96B2 | 0001 | 0000 |
| 0000226340 | 5F0B | 6C5F | 636F | 5F6B | 6966 | 656C | 9754 | 0001 |
| 0000226360 | 0000 | 5F0B | 675F | 7465 | 6974 | 7464 | 6261 | 3284 |
| 0000226400 | 0006 | 0000 | 5F0B | 745F | 6469 | 6174 | 6D62 | 7861 |
| 0000226420 | 97CE | 0001 | 0000 | 5F08 | 7073 | 6972 | 746E | 4266 |
| 0000226440 | 0198 | 0000 | 0900 | 765F | 7066 | 6972 | 746E | 9C66 |
| 0000226460 | 0198 | 0000 | 0900 | 765F | 7073 | 6972 | 746E | 1066 |
| 0000226500 | 0199 | 0000 | 0700 | 635F | 6C61 | 6F6C | 7463 | 0199 |
| 0000226520 | 0000 | 0800 | 615F | 6373 | 6974 | 656D | 9ADA | 0001 |
| 0000226540 | 0000 | 5F06 | 7463 | 6D69 | A065 | 0632 | 0000 | 0600 |
| 0000226560 | 5F5F | 6164 | 7379 | 3286 | 0006 | 0000 | 5F08 | 6C5F |
| 0000226600 | 6470 | 7961 | 0873 | 019B | 0000 | 0600 | 665F | 6974 |
| 0000226620 | 656D | 9BE6 | 0001 | 0000 | 5F07 | 6D67 | 6974 | 656D |
| 0000226640 | 9E2C | 0001 | 0000 | 5F0A | 6F6C | 6163 | 746C | 6D69 |
| 0000226660 | B065 | 019E | 0000 | 0500 | 745F | 6D69 | 1A65 | 019F |
| 0000226700 | 0000 | 0600 | 745F | 737A | 7465 | 9FF4 | 0001 | 0000 |
| 0000226720 | 5F09 | 695F | 6973 | 646E | 7473 | 9EFA | 0001 | 0000 |
| 0000226740 | 5F08 | 5F5F | 7A74 | 6573 | DC74 | 0632 | 0000 | 0900 |
| 0000226760 | 645F | 7961 | 696C | 6867 | D874 | 0632 | 0000 | 0900 |
| 0000227000 | 745F | 6D69 | 7A65 | 6E6F | DE65 | 0632 | 0000 | 0700 |
| 0000227020 | 745F | 6E7A | 6D61 | E665 | 0632 | 0000 | 0900 | 5F5F |
| 0000227040 | 645F | 616E | 656D | FC73 | 0632 | 0000 | 0900 | 5F5F |
| 0000227060 | 6D5F | 616E | 656D | C273 | 01A0 | 0000 | 0A00 | 5F5F |
| 0000227100 | 7464 | 786F | 6974 | 656D | 3322 | 0006 | 0000 | 5F08 |
| 0000227120 | 635F | 7469 | 6D69 | 0665 | 01A2 | 0000 | 0A00 | 5F5F |
| 0000227140 | 6E69 | 7469 | 6974 | 656D | A1B8 | 0001 | 0000 | 5F06 |
| 0000227160 | 6C63 | 636F | 146B | 01A2 | 0000 | 0700 | 735F | 7274 |
| 0000227200 | 6863 | 4272 | 01A2 | 0000 | 0700 | 735F | 7274 | 7564 |
| 0000227220 | 7070 | 01A2 | 0000 | 0800 | 735F | 7274 | 6372 | 7268 |
| 0000227240 | A29E | 0001 | 0000 | 5F08 | 656D | 6D6D | 766F | 6865 |
| 0000227260 | 01A3 | 0000 | 0700 | 6D5F | 6D65 | 6573 | BD74 | 01A3 |
| 0000227300 | 0000 | 0700 | 5F5F | 7863 | 6F74 | B061 | 01A3 | 0000 |
| 0000227320 | 0A00 | 5F5F | 6C63 | 6F74 | 7361 | 6275 | A414 | 0001 |
| 0000227340 | 0000 | 5F09 | 775F | 7472 | 6532 | 7272 | A42E | 0001 |
| 0000227360 | 0000 | 5F07 | 6572 | 6F6D | 6576 | A42E | 0001 | 0000 |
| 0000227400 | 5F07 | 6E75 | 696C | 6B6E | A44C | 0001 | 0000 | 5F0A |
| 0000227420 | 615F | 4646 | 6C61 | 756D | 4C6C | 01A4 | 0000 | 0B00 |
| 0000227440 | 5F5F | 4661 | 6146 | 6C75 | 756D | 6E6C | 01A4 | 0000 |
| 0000227460 | 0A00 | 5F5F | 4661 | 6146 | 726C | 6D65 | A490 | 0001 |
| 0000227500 | 0000 | 5F0A | 615F | 4646 | 6C61 | 6873 | B06C | 01A4 |
| 0000227520 | 0000 | 0800 | 5F5F | 4661 | 646C | 7669 | A54A | 0001 |
| 0000227540 | 0000 | 5F08 | 615F | 6C46 | 756D | 4A6C | 01A5 | 0000 |
| 0000227560 | 0900 | 5F5F | 4661 | 6C75 | 756D | 7C6C | 01A5 | 0000 |
| 0000227600 | 0800 | 5F5F | 4661 | 726C | 6D65 | A61C | 0001 | 0000 |
| 0000227620 | 5F08 | 615F | 6C46 | 6873 | 286C | 01A6 | 0000 | 0900 |
| 0000227640 | 5F5F | 4661 | 6C75 | 6964 | 8876 | 01A6 | 0000 | 0900 |
| 0000227660 | 5F5F | 4661 | 6C75 | 6572 | 116D | 01A7 | 0000 | 0C00 |
| 0000227700 | 5F5F | 5046 | 754E | 536D | 6174 | 6B63 | 0000 | 0004 |
| 0000227720 | 0000 | 5F07 | 505F | 6654 | 6361 | 0008 | 0004 | 0000 |
| 0000227740 | 5F07 | 665F | 7463 | 706D | A732 | 0001 | 0000 | 5F0D |
| 0000227760 | 645F | 6F6D | 7476 | 706D | 7365 | 7862 | A734 | 0001 |
| 0000230000 | 0000 | 5F0D | 645F | 6F6D | 7476 | 706D | 7365 | 6973 |
| 0000230020 | A71C | 0001 | 0000 | 5F0D | 735F | 6F6D | 7476 | 706D |
| 0000230040 | 7365 | 7862 | A71E | 0001 | 0000 | 5F0D | 735F | 6F6D |
| 0000230060 | 7476 | 706D | 7365 | 6973 | A6F2 | 0001 | 0000 | 5F08 |
| 0000230100 | 665F | 6D70 | 7461 | 4A68 | 01A7 | 0000 | 0900 | 5F5F |
| 0000230120 | 6364 | 7476 | 7473 | 8630 | 0401 | 0000 | 0A00 | 6924 |
| 0000230140 | 5F34 | 6572 | 7573 | 746C | 0172 | 0004 | 0000 | 5F09 |
| 0000230160 | 665F | 7463 | 706F | 7473 | 0186 | 0004 | 0000 | 240A |

THU MAR 14 17:41:20 1991 LBIPMT.DLL PAGE 81, LINE 4721

| | | | | | | | | |
|---|---|---|---|---|---|---|---|---|
| 0000230200 | 3869 | 725F | 7365 | 6C75 | 5674 | 01A7 | 0000 | 0A00 |
| 0000230220 | 5F5F | 6364 | 7476 | 7473 | 6130 | 332E | 0006 | 0000 |
| 0000230240 | 5F0A | 665F | 7370 | 6769 | 6461 | 5972 | 01A7 | 0000 |
| 0000230260 | 0A00 | 5F5F | 6364 | 7476 | 6964 | 6973 | A8E1 | 0001 |
| 0000230300 | 0000 | 240C | 3469 | 745F | 5F6F | 6977 | 6E72 | CF64 |
| 0000230320 | 01A8 | 0000 | 0C00 | 6924 | 5F38 | 6F74 | 735F | 7269 |
| 0000230340 | 646E | A8EB | 0001 | 0000 | 240C | 3869 | 745F | 5F6F |
| 0000230360 | 6977 | 6E72 | 5164 | 01AA | 0000 | 0700 | 6924 | 5F34 |
| 0000230400 | 6966 | 4178 | 01AA | 0000 | 0700 | 6924 | 5F38 | 6966 |
| 0000230420 | FD78 | 01A8 | 0000 | 0800 | 6924 | 5F34 | 6F74 | 6C5F |
| 0000230440 | A902 | 0001 | 0000 | 2408 | 3869 | 745F | 5F6F | 7B6C |
| 0000230460 | 01A9 | 0000 | 0800 | 6924 | 5F34 | 6F74 | 715F | A8C0 |
| 0000230500 | 0001 | 0000 | 2408 | 3469 | 745F | 5F6F | 4673 | 01A9 |
| 0000230520 | 0000 | 0800 | 6924 | 5F38 | 6F74 | 715F | A8DC | 0001 |
| 0000230540 | 0000 | 2408 | 3469 | 745F | 5F6F | CA77 | 01A8 | 0000 |
| 0000230560 | 0800 | 6924 | 5F38 | 6F74 | 735F | A8E6 | 0001 | 0000 |
| 0000230600 | 2408 | 3869 | 745F | 5F6F | 1D77 | 01AA | 0000 | 0A00 |
| 0000230620 | 6924 | 5F34 | 6966 | 7278 | 646E | A9F7 | 0001 | 0000 |
| 0000230640 | 240A | 3869 | 665F | 7869 | 6E72 | D964 | 01A7 | 0000 |
| 0000230660 | 0500 | 6924 | 5F34 | 9838 | 01A7 | 0000 | 0500 | 6924 |
| 0000230700 | 5F38 | 7134 | 01A8 | 0000 | 0500 | 6924 | 5F34 | A16C |
| 0000230720 | 01A8 | 0000 | 0500 | 6924 | 5F38 | 1D6C | 01AA | 0000 |
| 0000230740 | 0B00 | 6924 | 5F34 | 6966 | 6978 | 6E72 | 5D64 | 01A8 |
| 0000230760 | 0000 | 0500 | 6924 | 5F34 | 6571 | 01A8 | 0000 | 0500 |
| 0000231000 | 6924 | 5F34 | F773 | 01A9 | 0000 | 0B00 | 6924 | 5F38 |
| 0000231020 | 6966 | 6978 | 6E72 | 8D64 | 01A8 | 0000 | 0500 | 6924 |
| 0000231040 | 5F38 | 9571 | 01A8 | 0000 | 0500 | 6924 | 5F38 | 5B73 |
| 0000231060 | 01A8 | 0000 | 0500 | 6924 | 5F34 | 8B77 | 01A8 | 0000 |
| 0000231100 | 0500 | 6924 | 5F38 | F377 | 01A8 | 0000 | 0B00 | 6924 |
| 0000231120 | 5F34 | 6F74 | 6C5F | 6E72 | F864 | 01A8 | 0000 | 0B00 |
| 0000231140 | 6924 | 5F38 | 6F74 | 6C5F | 6E72 | 2264 | 01A9 | 0000 |
| 0000231160 | 0B00 | 6924 | 5F34 | 6F74 | 715F | 6E72 | C564 | 01A8 |
| 0000231200 | 0000 | 0B00 | 6924 | 5F34 | 6F74 | 735F | 6E72 | 2764 |
| 0000231220 | 01A9 | 0000 | 0B00 | 6924 | 5F38 | 6F74 | 715F | 6E72 |
| 0000231240 | E164 | 01A8 | 0000 | 0B00 | 6924 | 5F34 | 6F74 | 775F |
| 0000231260 | 6E72 | CF64 | 01A8 | 0000 | 0B00 | 6924 | 5F38 | 6F74 |
| 0000231300 | 735F | 6E72 | EB64 | 01A8 | 0000 | 0B00 | 6924 | 5F38 |
| 0000231320 | 6F74 | 775F | 6E72 | F364 | 01A8 | 0000 | 0C00 | 6924 |
| 0000231340 | 5F34 | 6F74 | 6C5F | 7269 | 646E | A8F8 | 0001 | 0000 |
| 0000231360 | 240C | 3869 | 745F | 5F6F | 696C | 6E72 | 2264 | 01A9 |
| 0000231400 | 0000 | 0C00 | 6924 | 5F34 | 6F74 | 715F | 7269 | 646E |
| 0000231420 | A8C5 | 0001 | 0000 | 240C | 3469 | 745F | 5F6F | 6973 |
| 0000231440 | 6E72 | 2764 | 01A9 | 0000 | 0C00 | 6924 | 5F38 | 6F74 |
| 0000231460 | 715F | 7269 | 646E | AB7F | 0001 | 0000 | 2407 | 3469 |
| 0000231500 | 635F | 706D | ABD2 | 0001 | 0000 | 2407 | 3869 | 635F |
| 0000231520 | 706D | AC2E | 0001 | 0000 | 2407 | 3469 | 615F | 6464 |
| 0000231540 | AE16 | 0001 | 0000 | 2407 | 3469 | 645F | 7669 | AC26 |
| 0000231560 | 0001 | 0000 | 2407 | 3469 | 735F | 6275 | AD90 | 0001 |
| 0000231600 | 0000 | 2407 | 3469 | 6D5F | 6C75 | 0191 | 0004 | 0000 |
| 0000231620 | 240D | 3469 | 725F | 756F | 646E | 655F | 7078 | AD00 |
| 0000231640 | 0001 | 0000 | 2408 | 3469 | 6E5F | 726F | 906D | 0401 |
| 0000231660 | 0000 | 0E00 | 6924 | 5F34 | 6F72 | 6E75 | 5F64 | 6C66 |
| 0000231700 | 6761 | 0193 | 0004 | 0000 | 2409 | 3469 | 615F | 5F63 |
| 0000231720 | 6968 | 0197 | 0004 | 0000 | 2409 | 3469 | 615F | 5F63 |
| 0000231740 | 6F6C | AD2E | 0001 | 0000 | 2409 | 3469 | 725F | 756F |
| 0000231760 | 646E | AE14 | 0001 | 0000 | 240A | 3469 | 645F | 7669 |
| 0000232000 | 6572 | 2476 | u1AC | 0000 | 0A00 | 6924 | 5F34 | 7573 |
| 0000232020 | 7262 | 7665 | AF43 | 0001 | 0000 | 2407 | 3869 | 615F |
| 0000232040 | 6464 | B1AC | 0001 | 0000 | 2407 | 3869 | 645F | 7669 |

THU MAR 14 17:41:20 1991 LBIPMT.DLL PAGE 82, LINE 4780

| | | | | | | | | |
|---|---|---|---|---|---|---|---|---|
| 0000232060 | AF20 | 0001 | 0000 | 2407 | 3869 | 735F | 6275 | B149 |
| 0000232100 | 0001 | 0000 | 2407 | 3869 | 6D5F | 6C75 | 01A9 | 0004 |
| 0000232120 | 0000 | 240D | 3869 | 725F | 756F | 646E | 655F | 7078 |
| 0000232140 | B076 | 0001 | 0000 | 2408 | 3869 | 6E5F | 726F | A86D |
| 0000232160 | 0401 | 0000 | 0E00 | 6924 | 5F38 | 6F72 | 6E75 | 5F64 |
| 0000232200 | 6C66 | 6761 | 01AB | 0004 | 0000 | 2409 | 3869 | 615F |
| 0000232220 | 5F63 | 6968 | 01B3 | 0004 | 0000 | 2409 | 3869 | 615F |
| 0000232240 | 5F63 | 6F6C | B0CB | 0001 | 0000 | 2409 | 3869 | 725F |
| 0000232260 | 756F | 646E | B1AA | 0001 | 0000 | 240A | 3869 | 645F |
| 0000232300 | 7669 | 6572 | 1E76 | 01AF | 0000 | 0A00 | 6924 | 5F38 |
| 0000232320 | 7573 | 7262 | 7665 | B564 | 0001 | 0000 | 240A | 3869 |
| 0000232340 | 6F5F | 7475 | 7570 | DA74 | 0401 | 0000 | 0C00 | 6924 |
| 0000232360 | 5F38 | 6E69 | 7570 | 5F74 | 7377 | B6B5 | 0001 | 0000 |
| 0000232400 | 2409 | 3869 | 695F | 706E | 7475 | 01DB | 0004 | 0000 |
| 0000232420 | 2410 | 3869 | 695F | 706D | 696C | 6963 | 5F74 | 7865 |
| 0000232440 | A170 | 01B9 | 0000 | 0800 | 6924 | 5F38 | 6D74 | 6C75 |
| 0000232460 | BB07 | 0001 | 0000 | 240A | 3869 | 745F | 7770 | 3172 |
| 0000232500 | 2C30 | 01BB | 0000 | 0F00 | 5F5F | 6547 | 4174 | 746C |
| 0000232520 | 616D | 6874 | 5450 | 7644 | 0098 | 0100 | 0900 | 5F5F |
| 0000232540 | 6C66 | 7574 | 6573 | C864 | 01C1 | 0000 | 0600 | 5F5F |
| 0000232560 | 6166 | 6464 | BBE5 | 0001 | 0000 | 5F06 | 655F | 646C |
| 0000232600 | E164 | 01BB | 0000 | 0600 | 5F5F | 6C66 | 6464 | BF2A |
| 0000232620 | 0001 | 0000 | 5F06 | 665F | 6261 | 7473 | 01BC | 0000 |
| 0000232640 | 0600 | 5F5F | 6C65 | 6C64 | BC87 | 0001 | 0000 | 5F06 |
| 0000232660 | 665F | 646C | 426C | 01BF | 0000 | 0600 | 5F5F | 6366 |
| 0000232700 | 7368 | C1D2 | 0001 | 0000 | 5F06 | 665F | 6D63 | DB70 |
| 0000232720 | 01BB | 0000 | 0600 | 5F5F | 6C73 | 6464 | BBA2 | 0001 |
| 0000232740 | 0000 | 5F06 | 655F | 646C | 7973 | 01C2 | 0000 | 0600 |
| 0000232760 | 5F5F | 7866 | 6863 | C1BE | 0001 | 0000 | 5F06 | 665F |
| 0000233000 | 6964 | 9E76 | 01BB | 0000 | 0600 | 5F5F | 6C66 | 7364 |
| 0000233020 | BC31 | 0001 | 0000 | 5F06 | 665F | 646C | 8174 | 01BC |
| 0000233040 | 0000 | 0600 | 5F5F | 6C65 | 7764 | BC8E | 0001 | 0000 |
| 0000233060 | 5F06 | 665F | 646C | F377 | 01BC | 0000 | 0600 | 5F5F |
| 0000233100 | 6466 | 7075 | BC70 | 0001 | 0000 | 5F06 | 735F | 646C |
| 0000233120 | AF6C | 01C1 | 0000 | 0600 | 5F5F | 7366 | 6275 | BDC1 |
| 0000233140 | 0001 | 0000 | 5F06 | 655F | 7473 | 2B64 | 01BD | 0000 |
| 0000233160 | 0600 | 5F5F | 6C66 | 7A64 | C2A8 | 0001 | 0000 | 5F06 |
| 0000233200 | 645F | 7663 | BD74 | 01BD | 0000 | 0600 | 5F5F | 7366 |
| 0000233220 | 6474 | C1B9 | 0001 | 0000 | 5F06 | 665F | 756D | A76C |
| 0000233240 | 01BE | 0000 | 0600 | 5F5F | 7466 | 6C6F | BB98 | 0001 |
| 0000233260 | 0000 | 5F06 | 735F | 646C | 2373 | 01BC | 0000 | 0600 |
| 0000233300 | 5F5F | 6C73 | 7464 | BC7D | 0001 | 0000 | 5F06 | 735F |
| 0000233320 | 646C | B977 | 01BD | 0000 | 0600 | 5F5F | 7373 | 6474 |
| 0000233340 | BD62 | 0001 | 0000 | 5F06 | 655F | 7473 | 5E73 | 01BD |
| 0000233360 | 0000 | 0600 | 5F5F | 7366 | 7374 | BEF3 | 0001 | 0000 |
| 0000233400 | 5F06 | 665F | 7374 | 1774 | 01BE | 0000 | 0600 | 5F5F |
| 0000233420 | 7366 | 7474 | BD5A | 0001 | 0000 | 5F06 | 735F | 7473 |
| 0000233440 | 1373 | 01BE | 0000 | 0600 | 5F5F | 7373 | 7474 | C181 |
| 0000233460 | 0001 | 0000 | 5F07 | 655F | 6461 | 6464 | C190 | 0001 |
| 0000233500 | 0000 | 5F07 | 665F | 6461 | 6464 | C171 | 0001 | 0000 |
| 0000233520 | 5F07 | 735F | 6461 | 6464 | C05F | 0001 | 0000 | 5F07 |
| 0000233540 | 655F | 6461 | 7364 | C06E | 0001 | 0000 | 5F07 | 665F |
| 0000233560 | 6461 | 7364 | C131 | 0001 | 0000 | 5F07 | 655F | 6964 |
| 0000233600 | 6476 | C140 | 0001 | 0000 | 5F07 | 665F | 6964 | 6476 |
| 0000233620 | C04F | 0001 | 0000 | 5F07 | 735F | 6461 | 7364 | C0B7 |
| 0000233640 | 0001 | 0000 | 5F07 | 655F | 7573 | 6462 | C0C6 | 0001 |
| 0000233660 | 0000 | 5F07 | 665F | 7573 | 6462 | C109 | 0001 | 0000 |
| 0000233700 | 5F07 | 655F | 756D | 646C | C118 | 0001 | 0000 | 5F07 |
| 0000233720 | 665F | 756D | 646C | C26B | 0001 | 0000 | 5F07 | 665F |

THU MAR 14 17:41:20 1991 LBIPMT.DLL PAGE 83, LINE 4839

| | | | | | | | | |
|---|---|---|---|---|---|---|---|---|
| 0000233740 | 6378 | 7168 | C121 | 0001 | 0000 | 5F07 | 735F | 6964 |
| 0000233760 | 6476 | C1C3 | 0001 | 0000 | 5F07 | 665F | 6964 | 7276 |
| 0000234000 | C00F | 0001 | 0000 | 5F07 | 655F | 6964 | 7376 | C01E |
| 0000234020 | 0001 | 0000 | 5F07 | 665F | 6964 | 7376 | BDE1 | 0001 |
| 0000234040 | 0000 | 5F07 | 655F | 7473 | 7064 | C0A7 | 0001 | 0000 |
| 0000234060 | 5F07 | 735F | 7573 | 6462 | BDDD | 0001 | 0000 | 5F07 |
| 0000234100 | 665F | 7473 | 7064 | C1B4 | 0001 | 0000 | 5F07 | 665F |
| 0000234120 | 7573 | 7262 | BF95 | 0001 | 0000 | 5F07 | 655F | 7573 |
| 0000234140 | 7362 | BFA4 | 0001 | 0000 | 5F07 | 665F | 7573 | 7362 |
| 0000234160 | C0F9 | 0001 | 0000 | 5F07 | 735F | 756D | 646C | BFE7 |
| 0000234200 | 0001 | 0000 | 5F07 | 655F | 756D | 736C | BFF6 | 0001 |
| 0000234220 | 0000 | 5F07 | 665F | 756D | 736C | BFFF | 0001 | 0000 |
| 0000234240 | 5F07 | 735F | 6964 | 7376 | BDD9 | 0001 | 0000 | 5F07 |
| 0000234260 | 735F | 7473 | 7064 | BD82 | 0001 | 0000 | 5F07 | 655F |
| 0000234300 | 7473 | 7073 | BF85 | 0001 | 0000 | 5F07 | 735F | 7573 |
| 0000234320 | 7362 | BD7E | 0001 | 0000 | 5F07 | 665F | 7473 | 7073 |
| 0000234340 | BE36 | 0001 | 0000 | 5F07 | 665F | 7473 | 7074 | BFD7 |
| 0000234360 | 0001 | 0000 | 5F07 | 735F | 756D | 736C | C1C8 | 0001 |
| 0000234400 | 0000 | 5F08 | 615F | 6646 | 6461 | 7A64 | 01BD | 0000 |
| 0000234420 | 0700 | 5F5F | 7373 | 7374 | 3270 | 01BE | 0000 | 0700 |
| 0000234440 | 5F5F | 7373 | 7474 | E570 | 01BB | 0000 | 0800 | 5F5F |
| 0000234460 | 4661 | 6C65 | 6464 | BBE1 | 0001 | 0000 | 5F08 | 615F |
| 0000234500 | 6646 | 646C | 2A64 | 01BF | 0000 | 0800 | 5F5F | 4661 |
| 0000234520 | 6166 | 7362 | BC74 | 0001 | 0000 | 5F08 | 615F | 6546 |
| 0000234540 | 646C | 876C | 01BC | 0000 | 0800 | 5F5F | 4661 | 6C66 |
| 0000234560 | 6C64 | BF42 | 0001 | 0000 | 5F08 | 615F | 6646 | 6863 |
| 0000234600 | D273 | 01C1 | 0000 | 0800 | 5F5F | 4661 | 6366 | 706D |
| 0000234620 | BBDB | 0001 | 0000 | 5F08 | 615F | 7346 | 646C | A264 |
| 0000234640 | 01BB | 0000 | 0800 | 5F5F | 4661 | 6C65 | 7364 | C279 |
| 0000234660 | 0001 | 0000 | 5F08 | 615F | 6646 | 6378 | BE68 | 01C1 |
| 0000234700 | 0000 | 0800 | 5F5F | 4661 | 6466 | 7669 | BB9E | 0001 |
| 0000234720 | 0000 | 5F08 | 615F | 6646 | 646C | 3173 | 01BC | 0000 |
| 0000234740 | 0800 | 5F5F | 4661 | 6C66 | 7464 | BC81 | 0001 | 0000 |
| 0000234760 | 5F08 | 615F | 6546 | 646C | 8E77 | 01BC | 0000 | 0800 |
| 0000235000 | 5F5F | 4661 | 6C66 | 7764 | BCF3 | 0001 | 0000 | 5F08 |
| 0000235020 | 615F | 6646 | 7564 | 7070 | 01BC | 0000 | 0800 | 5F5F |
| 0000235040 | 4661 | 6C73 | 6C64 | C1AF | 0001 | 0000 | 5F08 | 615F |
| 0000235060 | 6646 | 7573 | C162 | 01BD | 0000 | 0800 | 5F5F | 4661 |
| 0000235100 | 7365 | 6474 | BD2B | 0001 | 0000 | 5F08 | 615F | 6646 |
| 0000235120 | 646C | A87A | 01C2 | 0000 | 0800 | 5F5F | 4661 | 6364 |
| 0000235140 | 7476 | BDBD | 0001 | 0000 | 5F08 | 615F | 6646 | 7473 |
| 0000235160 | B964 | 01C1 | 0000 | 0800 | 5F5F | 4661 | 6D66 | 6C75 |
| 0000235200 | BEA7 | 0001 | 0000 | 5F08 | 615F | 6646 | 6F74 | 986C |
| 0000235220 | 01BB | 0000 | 0800 | 5F5F | 4661 | 6C73 | 7364 | C159 |
| 0000235240 | 0001 | 0000 | 5F08 | 655F | 6964 | 6476 | 2372 | 01BC |
| 0000235260 | 0000 | 0800 | 5F5F | 4661 | 6C73 | 7464 | C168 | 0001 |
| 0000235300 | 0000 | 5F08 | 665F | 6964 | 6476 | 7D72 | 01BC | 0000 |
| 0000235320 | 0800 | 5F5F | 4661 | 6C73 | 7764 | C1CD | 0001 | 0000 |
| 0000235340 | 5F08 | 665F | 6F63 | 706D | E070 | 01C0 | 0000 | 0800 |
| 0000235360 | 5F5F | 7365 | 6275 | 7264 | BDB9 | 0001 | 0000 | 5F08 |
| 0000235400 | 615F | 7346 | 7473 | EF64 | 01C0 | 0000 | 0800 | 5F5F |
| 0000235420 | 7366 | 6275 | 7264 | BD62 | 0001 | 0000 | 5F08 | 615F |
| 0000235440 | 6546 | 7473 | 5E73 | 01BD | 0000 | 0800 | 5F5F | 4661 |
| 0000235460 | 7366 | 7374 | BEF3 | 0001 | 0000 | 5F08 | 615F | 6646 |
| 0000235500 | 7374 | 1774 | 01BE | 0000 | 0800 | 5F5F | 4661 | 7366 |
| 0000235520 | 7474 | C149 | 0001 | 0000 | 5F08 | 735F | 6964 | 6476 |
| 0000235540 | 3772 | 01C0 | 0000 | 0800 | 5F5F | 6465 | 7669 | 7273 |
| 0000235560 | C046 | 0001 | 0000 | 5F08 | 665F | 6964 | 7376 | D072 |
| 0000235600 | 01C0 | 0000 | 0800 | 5F5F | 7373 | 6275 | 7264 | BFBE |

THU MAR 14 17:41:20 1991 LBIPMT.DLL PAGE 84, LINE 4898

| | | | | | | | | |
|---|---|---|---|---|---|---|---|---|
| 0000235620 | 0001 | 0000 | 5F08 | 655F | 7573 | 7362 | 5A72 | 01BD |
| 0000235640 | 0000 | 0800 | 5F5F | 4661 | 7373 | 7374 | BFCD | 0001 |
| 0000235660 | 0000 | 5F08 | 665F | 7573 | 7362 | 1372 | 01BE | 0000 |
| 0000235700 | 0800 | 5F5F | 4661 | 7373 | 7474 | C181 | 0001 | 0000 |
| 0000235720 | 5F09 | 615F | 6546 | 6461 | 6464 | C190 | 0001 | 0000 |
| 0000235740 | 5F09 | 615F | 6646 | 6461 | 6464 | C027 | 0001 | 0000 |
| 0000235760 | 5F08 | 735F | 6964 | 7376 | AE72 | 01BF | 0000 | 0800 |
| 0000236000 | 5F5F | 7373 | 6275 | 7273 | C171 | 0001 | 0000 | 5F09 |
| 0000236020 | 615F | 7346 | 6461 | 6464 | C05F | 0001 | 0000 | 5F09 |
| 0000236040 | 615F | 6546 | 6461 | 7364 | C06E | 0001 | 0000 | 5F09 |
| 0000236060 | 615F | 6646 | 6461 | 7364 | C131 | 0001 | 0000 | 5F09 |
| 0000236100 | 615F | 6546 | 6964 | 6476 | C140 | 0001 | 0000 | 5F09 |
| 0000236120 | 615F | 6646 | 6964 | 6476 | C04F | 0001 | 0000 | 5F09 |
| 0000236140 | 615F | 7346 | 6461 | 7364 | C0B7 | 0001 | 0000 | 5F09 |
| 0000236160 | 615F | 6546 | 7573 | 6462 | C0C6 | 0001 | 0000 | 5F09 |
| 0000236200 | 615F | 6646 | 7573 | 6462 | C109 | 0001 | 0000 | 5F09 |
| 0000236220 | 615F | 6546 | 756D | 646C | C118 | 0001 | 0000 | 5F09 |
| 0000236240 | 615F | 6646 | 756D | 646C | C26B | 0001 | 0000 | 5F09 |
| 0000236260 | 615F | 6646 | 6378 | 7168 | C121 | 0001 | 0000 | 5F09 |
| 0000236300 | 615F | 7346 | 6964 | 6476 | C1C3 | 0001 | 0000 | 5F09 |
| 0000236320 | 615F | 6646 | 6964 | 7276 | C00F | 0001 | 0000 | 5F09 |
| 0000236340 | 615F | 6546 | 6964 | 7376 | C01E | 0001 | 0000 | 5F09 |
| 0000236360 | 615F | 6646 | 6964 | 7376 | BDE1 | 0001 | 0000 | 5F09 |
| 0000236400 | 615F | 6546 | 7473 | 7064 | C0A7 | 0001 | 0000 | 5F09 |
| 0000236420 | 615F | 7346 | 7573 | 6462 | BDDD | 0001 | 0000 | 5F09 |
| 0000236440 | 615F | 6646 | 7473 | 7064 | C1B4 | 0001 | 0000 | 5F09 |
| 0000236460 | 615F | 6646 | 7573 | 7262 | BF95 | 0001 | 0000 | 5F09 |
| 0000236500 | 615F | 6546 | 7573 | 7362 | BFA4 | 0001 | 0000 | 5F09 |
| 0000236520 | 615F | 6646 | 7573 | 7362 | C0F9 | 0001 | 0000 | 5F09 |
| 0000236540 | 615F | 7346 | 756D | 646C | BFE7 | 0001 | 0000 | 5F09 |
| 0000236560 | 615F | 6546 | 756D | 736C | BFF6 | 0001 | 0000 | 5F09 |
| 0000236600 | 615F | 6646 | 756D | 736C | BFFF | 0001 | 0000 | 5F09 |
| 0000236620 | 615F | 7346 | 6964 | 7376 | BDD9 | 0001 | 0000 | 5F09 |
| 0000236640 | 615F | 7346 | 7473 | 7064 | BD82 | 0001 | 0000 | 5F09 |
| 0000236660 | 615F | 6546 | 7473 | 7073 | BF85 | 0001 | 0000 | 5F09 |
| 0000236700 | 615F | 7346 | 7573 | 7362 | BD7E | 0001 | 0000 | 5F09 |
| 0000236720 | 615F | 6646 | 7473 | 7073 | BE36 | 0001 | 0000 | 5F09 |
| 0000236740 | 615F | 6646 | 7473 | 7074 | BFD7 | 0001 | 0000 | 5F09 |
| 0000236760 | 615F | 7346 | 756D | 736C | BD7A | 0001 | 0000 | 5F09 |
| 0000237000 | 615F | 7346 | 7473 | 7073 | BE32 | 0001 | 0000 | 5F09 |
| 0000237020 | 615F | 7346 | 7473 | 7074 | C159 | 0001 | 0000 | 5F0A |
| 0000237040 | 615F | 6546 | 6964 | 6476 | 6872 | 01C1 | 0000 | 0A00 |
| 0000237060 | 5F5F | 4661 | 6466 | 7669 | 7264 | C1CD | 0001 | 0000 |
| 0000237100 | 5F0A | 615F | 6646 | 6F63 | 706D | E070 | 01C0 | 0000 |
| 0000237120 | 0A00 | 5F5F | 4661 | 7365 | 6275 | 7264 | C0EF | 0001 |
| 0000237140 | 0000 | 5F0A | 615F | 6646 | 7573 | 6462 | 4972 | 01C1 |
| 0000237160 | 0000 | 0A00 | 5F5F | 4661 | 6473 | 7669 | 7264 | C037 |
| 0000237200 | 0001 | 0000 | 5F0A | 615F | 6546 | 6964 | 7376 | 4672 |
| 0000237220 | 01C0 | 0000 | 0A00 | 5F5F | 4661 | 6466 | 7669 | 7273 |
| 0000237240 | C0D0 | 0001 | 0000 | 5F0A | 615F | 7346 | 7573 | 6462 |
| 0000237260 | BE72 | 01BF | 0000 | 0A00 | 5F5F | 4661 | 7365 | 6275 |
| 0000237300 | 7273 | BFCD | 0001 | 0000 | 5F0A | 615F | 6646 | 7573 |
| 0000237320 | 7362 | 2772 | 01C0 | 0000 | 0A00 | 5F5F | 4661 | 6473 |
| 0000237340 | 7669 | 7273 | BFAE | 0001 | 0000 | 5F0A | 615F | 7346 |
| 0000237360 | 7573 | 7362 | 9072 | 01BC | 0000 | 0600 | 2442 | 4946 |
| 0000237400 | 324C | 0210 | 0004 | 0000 | 4F05 | 5470 | 6261 | BE62 |
| 0000237420 | 0001 | 0000 | 4206 | 4624 | 5349 | 9132 | 01BC | 0000 |
| 0000237440 | 0600 | 2442 | 4946 | 444C | C1CD | 0001 | 0000 | 4206 |
| 0000237460 | 4624 | 4D43 | 6A50 | 01BE | 0000 | 0600 | 2442 | 4946 |

THU MAR 14 17:41:20 1991 LBIPMT.DLL PAGE 85, LINE 4957

```
0000237500  5453 BE72 0001 0000 4206 4624 5355 2E54
0000237520  0402 0000 0600 5F5F 6366 7073 C2C2 0001
0000237540  0000 240A 3469 655F 7272 6E69 C266 01C2
0000237560  0000 0A00 6924 5F38 7265 6972 666E C2C9
0000237600  0001 0000 240B 3469 655F 7272 6964 3076
0000237620  C2C9 0001 0000 240B 3869 655F 7272 6964
0000237640  3076 C2F5 0001 0000 5F0A 665F 7370 6769
0000237660  616E C26C 01C2 0000 0B00 6924 5F34 7265
0000237700  6D72 6E69 C266 01C2 0000 0B00 6924 5F34
0000237720  7265 7072 6E69 C266 01C2 0000 0B00 6924
0000237740  5F38 7265 6D72 6E69 C266 01C2 0000 0B00
0000237760  6924 5F38 7265 7072 6E69 D766 01C2 0000
0000240000  0C00 6924 5F38 7265 7372 6174 6B63 C2D0
0000240020  0001 0000 240C 3469 655F 7272 6E69 6C76
0000240040  D064 01C2 0000 0C00 6924 5F38 7265 6972
0000240060  766E 646C C36B 0001 0000 5F08 665F 746C
0000240100  6E69 4632 01C3 0000 0900 5F5F 6C66 6974
0000240120  666E FC32 01C3 0000 0900 5F5F 6C66 6F74
0000240140  7475 3C32 01C4 0000 0B00 5F5F 6F66 6372
0000240160  6564 7063 AC74 01C4 0000 0B00 5F5F 7263
0000240200  706F 657A 6F72 2A73 01C5 0000 0A00 5F5F
0000240220  6F70 6973 6974 6576 C552 0001 0000 5F09
0000240240  665F 7361 6973 6E67 C6CE 0001 0000 5F07
0000240260  635F 7466 656F C874 0001 0000 5F07 635F
0000240300  7466 666F C8FC 0001 0000 5F07 635F 7466
0000240320  676F C9E4 0001 0000 5F09 635F 6C66 6374
0000240340  7476 0A01 7500 8380 0081 0064 0183 0102
0000240360  0001 0180 0001 0180 0005 4078 8083 0100
0000240400  0005 4078 8083 0100 0012 6079 8305 0206
0000240420  0783 8202 5F06 6F69 7562 6966 1001 7F00
0000240440  C083 8300 0081 C083 8300 0080 8083 0100
0000240460  0027 827F 5F04 7470 0072 0482 635F 746E
0000240500  8204 5F05 6162 6573 8206 5F05 6C66 6761
0000240520  820A 5F05 6966 656C 010B 0001 0180 0007
0000240540  737A 0583 8202 0100 0001 0180 0001 0180
0000240560  0001 0180 0001 0180 0001 0180 0001 0180
0000240600  0001 0180 000A 8075 0083 6402 8301 0212
0000240620  0401 7F00 0983 0102 000A 8075 8183 6400
0000240640  8300 0201 0101 8000 0101 8000 0101 8000
0000240660  0101 8000 0101 8000 0101 8000 0101 8000
*
0000244300  0101 8000 0101 8000 0101 8000 0701 7A00
0000244320  8373 00C0 0082 0101 8000 0101 8000 0101
0000244340  8000 0101 8000 0101 8000 0101 8000 0101
*
0000245660  8000 0101 8000 0101 8000 0101 8000 0701
0000245700  7A00 8373 00C0 0082 0101 8000 0101 8000
0000245720  0101 8000 0101 8000 0101 8000 0101 8000
*
0000246540  0101 8000 0101 8000 0101 8000 1801 7900
0000246560  5085 1A09 0683 8305 0507 0A82 5842 6F5F
0000246600  7470 6F69 736E 0169 0007 8578 0640 8083
0000246620  0100 0007 8578 0190 8083 0100 004F 837F
0000246640  0081 8183 8300 0081 8183 8300 0081 8183
0000246660  8300 0081 8183 8300 0081 8183 8300 0081
0000246700  8183 8300 0081 8183 8300 0504 0583 8305
0000246720  0081 8183 8300 0081 8183 8300 0081 8183
0000246740  8300 0081 8183 8300 0081 8183 0100 01B8
0000246760  827F 420F 5F78 7270 636F 695F 686E 7265
```

```
THU MAR 14 17:41:20 1991  LBIPMT.DLL  PAGE 86, LINE 5016

0000247000  7469  8200  420F  5F78  6170  6B63  695F  686E
0000247020  7265  7469  8202  420F  5F78  6966  656C  695F
0000247040  686E  7265  7469  8204  420F  5F78  7566  636E
0000247060  695F  686E  7265  7469  8206  420E  5F78  6973
0000247100  676E  656C  6C5F  6E69  0865  0E82  7842  695F
0000247120  646E  6E65  5F74  7473  7065  820A  420F  5F78
0000247140  7865  7469  635F  6E6F  6966  6D72  820C  420E
0000247160  5F78  7270  6E69  5F74  6170  6B63  0E73  0E82
0000247200  7842  705F  6972  746E  665F  6C69  7365  8210
0000247220  420E  5F78  7270  6E69  5F74  7566  636E  1273
0000247240  0D82  7842  705F  6972  746E  6C5F  6E69  1465
0000247260  0E82  7842  705F  6972  746E  6C5F  7665  6C65
0000247300  8216  4206  5F78  6F6C  1867  0D82  7842  735F
0000247320  6168  6572  5F64  6F6C  1A67  0B82  7842  6C5F
0000247340  676F  665F  6C69  1C65  0A82  7842  6C5F  676F
0000247360  655F  7478  E485  8200  4208  5F78  6974  656D
0000247400  8573  0116  0882  7842  645F  6265  6775  1885
0000247420  8201  4209  5F78  7265  6F72  7372  1A85  8201
0000247440  4208  5F78  6C66  7375  8568  011C  1082  7842
0000247460  705F  6972  746E  705F  6F72  6563  7373  1E85
0000247500  8201  4211  5F78  6874  6572  6461  695F  686E
0000247520  7265  7469  2085  8201  420F  5F78  7270  6E69
0000247540  5F74  6874  6572  6461  2285  8201  4210  5F78
0000247560  7265  6F72  7372  645F  6169  6F6C  8567  0124
0000247600  0F82  7842  645F  6D75  5F70  706F  6974  6E6F
0000247620  8573  0126  0F82  7842  625F  6F63  6564  6E5F
0000247640  746F  6669  8579  0128  0101  8000  0101  8000
0000247660  0101  8000  0101  8000  0101  8000  0101  8000
0000247700  0101  8000  0101  8000  0101  8000  1201  7900
0000247720  2085  0103  1383  8305  0514  0482  6E69  6F66
0000247740  0169  0007  8578  0320  8083  0100  0004  837F
0000247760  0512  0A01  7F00  0682  6264  7367  7274  0100
0000250000  0015  8579  0340  8302  0517  1883  8205  6507
0000250020  656C  656D  746E  0169  0007  737A  1583  8205
0000250040  0100  0007  837F  0511  1683  0105  000F  827F
0000250060  6904  666E  006F  0482  656E  7478  0164  0001
0000250100  0180  0001  0180  0001  0180  0001  0180  0001
*
0000250500  0180  0001  0180  0001  0180  0001  0180  0007
0000250520  8578  0140  8083  0100  0005  0878  8083  0100
0000250540  0001  0180  0005  2078  8083  0100  0001  0180
0000250560  000A  8075  0083  6402  8300  0201  0501  7800
0000250600  8328  0080  0501  7800  8338  0080  0701  7800
0000250620  B885  8301  0080  0701  7800  9085  8301  0080
0000250640  0501  7800  8348  0080  0101  8000  0101  8000
0000250660  0501  7800  8310  0080  0701  7800  4085  8301
0000250700  0080  0701  7800  9885  8301  0080  0701  7800
0000250720  9885  8300  0080  0701  7800  7885  8301  0080
0000250740  0A01  7500  8380  0081  0064  0183  0102  0001
0000250760  0180  0007  8578  00A8  8083  0100  0007  8578
0000251000  00D0  8083  0100  0007  837F  00C0  C083  0100
0000251020  000A  8075  8183  6400  8302  0573  0501  7800
0000251040  8370  0080  0401  7F00  0983  0102  000A  8075
0000251060  0083  6402  8301  0576  0A01  7500  8380  0200
0000251100  0064  0183  0102  0007  8578  03C0  8083  0100
0000251120  0007  8578  0100  8083  0100  0007  8578  00F8
0000251140  8083  0100  0005  6878  8083  0100  000A  8075
0000251160  0083  6402  8300  0201  0501  7800  8330  0080
0000251200  0A01  7500  8380  0200  0064  0183  0102  0007
```

THU MAR 14 17:41:20 1991 LBIPMT.DLL PAGE 87, LINE 5075

| | | | | | | | | |
|---|---|---|---|---|---|---|---|---|
| 0000251220 | 737A | 0383 | 8205 | 0100 | 0007 | 8578 | 0150 | 8083 |
| 0000251240 | 0100 | 0007 | 8578 | 0110 | 8083 | 0100 | 0007 | 8578 |
| 0000251260 | 0108 | 8083 | 0100 | 0007 | 8578 | 0118 | 8083 | 0100 |
| 0000251300 | 0007 | 8578 | 0120 | 8083 | 0100 | 0007 | 8578 | 0128 |
| 0000251320 | 8083 | 0100 | 0007 | 8578 | 0130 | 8083 | 0100 | 0007 |
| 0000251340 | 8578 | 0138 | 8083 | 0100 | 0007 | 8578 | 01A8 | 8083 |
| 0000251360 | 0100 | 0007 | 8578 | 0148 | 8083 | 0100 | 0007 | 8578 |
| 0000251400 | 0168 | 8083 | 0100 | 0007 | 8578 | 0158 | 8083 | 0100 |
| 0000251420 | 000A | 8075 | 8183 | 6400 | 8300 | 0201 | 0101 | 8000 |
| 0000251440 | 0101 | 8000 | 0501 | 7800 | 8340 | 0080 | 0501 | 7800 |
| 0000251460 | 8340 | 0080 | 0101 | 8000 | 0101 | 8000 | 0101 | 8000 |
| 0000251500 | 0101 | 8000 | 0101 | 8000 | 0101 | 8000 | 0101 | 8000 |
| * | | | | | | | | |
| 0000252320 | 0101 | 8000 | 0101 | 8000 | 0101 | 8000 | 1601 | 7900 |
| 0000252340 | 0330 | 7083 | 8302 | 0271 | 0A82 | 7528 | 746E | 6761 |
| 0000252360 | 6567 | 2964 | 0169 | 000A | 837F | 0081 | 8183 | 8300 |
| 0000252400 | 0081 | 1C01 | 7F00 | 0682 | 6170 | 6B63 | 685F | 8200 |
| 0000252420 | 6606 | 6C69 | 5F65 | 0268 | 0682 | 7566 | 636E | 685F |
| 0000252440 | 0104 | 0001 | 0180 | 0007 | 737A | 6F83 | 8202 | 0100 |
| 0000252460 | 0001 | 0180 | 0001 | 0180 | 0001 | 0180 | 0001 | 0180 |
| * | | | | | | | | |
| 0000252660 | 0001 | 0180 | 0001 | 0180 | 0001 | 0180 | 0018 | 8579 |
| 0000252700 | 0950 | 831A | 029A | 9B83 | 8202 | 420A | 5F58 | 706F |
| 0000252720 | 6974 | 6E6F | 6973 | 0701 | 7800 | 4085 | 8306 | 0080 |
| 0000252740 | 0701 | 7800 | 9085 | 8301 | 0080 | 4F01 | 7F00 | 8183 |
| 0000252760 | 8300 | 0081 | 8183 | 8300 | 0081 | 8183 | 8300 | 0081 |
| 0000253000 | 8183 | 8300 | 0081 | 8183 | 8300 | 0081 | 8183 | 8300 |
| 0000253020 | 0081 | 8183 | 8300 | 0081 | 9883 | 8302 | 0299 | 8183 |
| 0000253040 | 8300 | 0081 | 8183 | 8300 | 0081 | 8183 | 8300 | 0081 |
| 0000253060 | 8183 | 8300 | 0081 | 8183 | 8300 | 0081 | B801 | 7F01 |
| 0000253100 | 0F82 | 7842 | 705F | 6F72 | 5F63 | 6E69 | 6568 | 6972 |
| 0000253120 | 0074 | 0F82 | 7842 | 705F | 6361 | 5F6B | 6E69 | 6568 |
| 0000253140 | 6972 | 0274 | 0F82 | 7842 | 665F | 6C69 | 5F65 | 6E69 |
| 0000253160 | 6568 | 6972 | 0474 | 0F82 | 7842 | 665F | 6E75 | 5F63 |
| 0000253200 | 6E69 | 6568 | 6972 | 0674 | 0E82 | 7842 | 735F | 6E69 |
| 0000253220 | 6C67 | 5F6E | 696C | 656E | 8208 | 420E | 5F78 | 6E69 |
| 0000253240 | 6564 | 746E | 735F | 6574 | 0A70 | 0F82 | 7842 | 655F |
| 0000253260 | 6978 | 5F74 | 6F63 | 666E | 7269 | 0C6D | 0E82 | 7842 |
| 0000253300 | 705F | 6972 | 746E | 705F | 6361 | 736B | 820E | 420E |
| 0000253320 | 5F78 | 7270 | 6E69 | 5F74 | 6966 | 656C | 1073 | 0E82 |
| 0000253340 | 7842 | 705F | 6972 | 746E | 665F | 6E75 | 7363 | 8212 |
| 0000253360 | 420D | 5F78 | 7270 | 6E69 | 5F74 | 696C | 656E | 8214 |
| 0000253400 | 420E | 5F78 | 7270 | 6E69 | 5F74 | 656C | 6576 | 166C |
| 0000253420 | 0682 | 7842 | 6C5F | 676F | 8218 | 420D | 5F78 | 6873 |
| 0000253440 | 7261 | 6465 | 6C5F | 676F | 821A | 420B | 5F78 | 6F6C |
| 0000253460 | 5F67 | 6966 | 656C | 821C | 420A | 5F78 | 6F6C | 5F67 |
| 0000253500 | 7865 | 8574 | 00E4 | 0882 | 7842 | 745F | 6D69 | 7365 |
| 0000253520 | 1685 | 8201 | 4208 | 5F78 | 6564 | 7562 | 8567 | 0118 |
| 0000253540 | 0982 | 7842 | 655F | 7272 | 726F | 8573 | 011A | 0882 |
| 0000253560 | 7842 | 665F | 756C | 6873 | 1C85 | 8201 | 4210 | 5F78 |
| 0000253600 | 7270 | 6E69 | 5F74 | 7270 | 636F | 7365 | 8573 | 011E |
| 0000253620 | 1182 | 7842 | 745F | 7268 | 6165 | 5F64 | 6E69 | 6568 |
| 0000253640 | 6972 | 8574 | 0120 | 0F82 | 7842 | 705F | 6972 | 746E |
| 0000253660 | 745F | 7268 | 6165 | 8564 | 0122 | 1082 | 7842 | 655F |
| 0000253700 | 7272 | 726F | 5F73 | 6964 | 6C61 | 676F | 2485 | 8201 |
| 0000253720 | 420F | 5F78 | 7564 | 706D | 6F5F | 7470 | 6F69 | 736E |
| 0000253740 | 2685 | 8201 | 420F | 5F78 | 6362 | 646F | 5F65 | 6F6E |
| 0000253760 | 6974 | 7966 | 2885 | 0101 | 0001 | 0180 | 0001 | 0180 |
| 0000254000 | 0001 | 0180 | 0001 | 0180 | 0001 | 0180 | 0001 | 0180 |

```
THU MAR 14 17:41:20 1991  LBIPMT.DLL  PAGE 88, LINE 5134

0000254020  0001  0180  0001  0180  0001  0180  0012  8579
0000254040  0320  8301  02A7  A883  8202  6904  666E  696F
0000254060  0701  7800  2085  8303  0080  0401  7F00  A683
0000254100  0102  000A  827F  6406  6762  7473  0072  1501
0000254120  7900  4085  0203  AB83  8302  02AC  0782  6C65
0000254140  6D65  6E65  6974  0701  7A00  8373  02A9  0082
0000254160  0701  7F00  A583  8302  02AA  0F01  7F00  0482
0000254200  6E69  6F66  8200  6E04  7865  6474  0101  8000
0000254220  0101  8000  0101  8000  0101  8000  0101  8000
*
0000254400  0101  8000  0101  8000  0101  8000  1001  7900
0000254420  0570  CE83  8302  02CF  0482  7465  6261  0169
0000254440  0010  837F  00C0  AA83  8302  0081  8183  8300
0000254460  0081  2001  7F00  0282  6469  8200  6C03  7473
0000254500  8204  7404  7079  0865  0482  6F6D  6564  820A
0000254520  6103  6C6C  010C  0001  0180  0001  0180  0001
0000254540  0180  0001  0180  0001  0180  0001  0180  0001
*
0000255360  0180  0009  8678  B430  0001  CD83  0102  0007
0000255400  8578  0FF0  8183  0100  000A  8075  8583  6400
0000255420  8301  033A  0401  7F00  C083  0100  0001  0180
0000255440  0001  0180  0001  0180  000A  8075  0083  6402
0000255460  8300  0201  0701  7800  3885  8301  0080  0401
0000255500  7F00  C083  0100  000A  8075  8183  6400  8301
0000255520  0340  0401  7F00  C083  0100  000A  8075  8183
0000255540  6400  8301  0342  0701  7800  D885  8300  0080
0000255560  0A01  7F00  8183  8300  02AA  8183  0100  000A
0000255600  8075  8183  6400  8303  0345  0501  7800  8330
0000255620  0080  0A01  7500  8380  0200  0064  0183  0102
0000255640  000D  837F  0273  C083  8300  00C0  C083  0100
0000255660  000A  8075  8183  6400  8304  0349  0101  8000
0000255700  0701  7F00  7383  8302  00C0  0A01  7500  8380
0000255720  0081  0264  4C83  0103  0007  837F  0081  C083
0000255740  0100  000A  8075  8183  6400  8302  034E  0501
0000255760  7800  8338  0080  0701  7F00  8183  8300  00C0
0000256000  0A01  7500  8380  0081  0264  5183  0103  0007
0000256020  837F  0273  C083  0100  000A  8075  8183  6400
0000256040  8302  0353  0A01  7500  8380  0081  0064  0183
0000256060  0102  0005  1878  8083  0100  000D  837F  0081
0000256100  C083  8300  0081  C083  0100  000A  8075  8183
0000256120  6400  8304  0357  0101  8000  0401  7F00  C083
0000256140  0100  000A  8075  8583  6400  8301  035A  0401
0000256160  7F00  C083  0100  000A  8075  8583  6400  8301
0000256200  035C  0A01  7500  8380  0081  0064  0183  0102
0000256220  0001  0180  0001  0180  0005  4078  8083  0100
0000256240  0005  4078  8083  0100  0001  0180  0001  0180
0000256260  0001  0180  0001  0180  0001  0180  0001  0180
*
0000256760  0007  737A  C983  8200  0100  0001  0180  0001
0000257000  0180  0001  0180  0001  0180  0001  0180  0001
*
0000257620  0180  0001  0180  0001  0180  0001  0180  0016
0000257640  3079  8303  02C2  C383  8202  280A  6E75  6174
0000257660  6767  6465  6929  0A01  7F00  8183  8300  0081
0000257700  8183  0100  001C  827F  7006  6361  5F6B  0068
0000257720  0682  6966  656C  685F  8202  6606  6E75  5F63
0000257740  0468  0701  7A00  8373  02C1  0082  0101  8000
0000257760  0101  8000  0701  7A00  8373  02C8  0082  0A01
0000260000  7500  8380  0081  0264  C983  0102  0007  837F
```

THU MAR 14 17:41:20 1991 LBIPMT.DLL PAGE 89, LINE 5193

| | | | | | | | | |
|---|---|---|---|---|---|---|---|---|
| 0000260020 | 00C0 | C083 | 0100 | 0001 | 0180 | 0001 | 0180 | 0001 |
| 0000260040 | 0180 | 0001 | 0180 | 0001 | 0180 | 0001 | 0180 | 0001 |
| * | | | | | | | | |
| 0000260200 | 0180 | 0001 | 0180 | 0001 | 0180 | 0018 | 8579 | 0950 |
| 0000260220 | 831A | 02EA | EB83 | 8202 | 420A | 5F58 | 706F | 6974 |
| 0000260240 | 6E6F | 6973 | 0701 | 7800 | 4085 | 8306 | 0080 | 0701 |
| 0000260260 | 7800 | 9085 | 8301 | 0080 | 4F01 | 7F00 | 8183 | 8300 |
| 0000260300 | 0081 | 8183 | 8300 | 0081 | 8183 | 8300 | 0081 | 8183 |
| 0000260320 | 8300 | 0081 | 8183 | 8300 | 0081 | 8183 | 8300 | 0081 |
| 0000260340 | 8183 | 8300 | 0081 | E883 | 8302 | 02E9 | 8183 | 8300 |
| 0000260360 | 0081 | 8183 | 8300 | 0081 | 8183 | 8300 | 0081 | 8183 |
| 0000260400 | 8300 | 0081 | 8183 | 8300 | 0081 | B801 | 7F01 | 0F82 |
| 0000260420 | 7842 | 705F | 6F72 | 5F63 | 6E69 | 6568 | 6972 | 0074 |
| 0000260440 | 0F82 | 7842 | 705F | 6361 | 5F6B | 6E69 | 6568 | 6972 |
| 0000260460 | 0274 | 0F82 | 7842 | 665F | 6C69 | 5F65 | 6E69 | 6568 |
| 0000260500 | 6972 | 0474 | 0F82 | 7842 | 665F | 6E75 | 5F63 | 6E69 |
| 0000260520 | 6568 | 6972 | 0674 | 0E82 | 7842 | 735F | 6E69 | 6C67 |
| 0000260540 | 5F65 | 696C | 656E | 8208 | 420E | 5F78 | 6E69 | 6564 |
| 0000260560 | 746E | 735F | 6574 | 0A70 | 0F82 | 7842 | 655F | 6978 |
| 0000260600 | 5F74 | 6F63 | 666E | 7269 | 0C6D | 0E82 | 7842 | 705F |
| 0000260620 | 6972 | 746E | 705F | 6361 | 736B | 820E | 420E | 5F78 |
| 0000260640 | 7270 | 6E69 | 5F74 | 6966 | 656C | 1073 | 0E82 | 7842 |
| 0000260660 | 705F | 6972 | 746E | 665F | 6E75 | 7363 | 8212 | 420D |
| 0000260700 | 5F78 | 7270 | 6E69 | 5F74 | 696C | 656E | 8214 | 420E |
| 0000260720 | 5F78 | 7270 | 6E69 | 5F74 | 656C | 6576 | 166C | 0682 |
| 0000260740 | 7842 | 6C5F | 676F | 8218 | 420D | 5F78 | 6873 | 7261 |
| 0000260760 | 6465 | 6C5F | 676F | 821A | 420B | 5F78 | 6F6C | 5F67 |
| 0000261000 | 6966 | 656C | 821C | 420A | 5F78 | 6F6C | 5F67 | 7865 |
| 0000261020 | 8574 | 00E4 | 0882 | 7842 | 745F | 6D69 | 7365 | 1685 |
| 0000261040 | 8201 | 4208 | 5F78 | 6564 | 7562 | 8567 | 0118 | 0982 |
| 0000261060 | 7842 | 655F | 7272 | 726F | 8573 | 011A | 0882 | 7842 |
| 0000261100 | 665F | 756C | 6873 | 1C85 | 8201 | 4210 | 5F78 | 7270 |
| 0000261120 | 6E69 | 5F74 | 7270 | 636F | 7365 | 8573 | 011E | 1182 |
| 0000261140 | 7842 | 745F | 7268 | 6165 | 5F64 | 6E69 | 6568 | 6972 |
| 0000261160 | 8574 | 0120 | 0F82 | 7842 | 705F | 6972 | 746E | 745F |
| 0000261200 | 7268 | 6165 | 8564 | 0122 | 1082 | 7842 | 655F | 7272 |
| 0000261220 | 726F | 5F73 | 6964 | 6C61 | 676F | 2485 | 8201 | 420F |
| 0000261240 | 5F78 | 7564 | 706D | 6F5F | 7470 | 6F69 | 736E | 2685 |
| 0000261260 | 8201 | 420F | 5F78 | 6362 | 646F | 5F65 | 6F6E | 6974 |
| 0000261300 | 7966 | 2885 | 0101 | 0001 | 0180 | 0001 | 0180 | 0001 |
| 0000261320 | 0180 | 0001 | 0180 | 0001 | 0180 | 0001 | 0180 | 0001 |
| * | | | | | | | | |
| 0000262060 | 0180 | 0001 | 0180 | 0001 | 0180 | 0001 | 0180 | 0019 |
| 0000262100 | 8579 | 00D0 | 8307 | 034B | 4C83 | 8203 | 530B | 6174 |
| 0000262120 | 6B63 | 7449 | 6D65 | 745F | 0169 | 0016 | 837F | 0257 |
| 0000262140 | C083 | 8300 | 00C0 | C083 | 8300 | 02C1 | 8183 | 8300 |
| 0000262160 | 0081 | 3301 | 7F00 | 0582 | 7473 | 6361 | 006B | 0482 |
| 0000262200 | 6170 | 6B63 | 8204 | 6604 | 6C69 | 0865 | 0482 | 7566 |
| 0000262220 | 636E | 820C | 6C05 | 7665 | 6C65 | 8210 | 6C04 | 6E69 |
| 0000262240 | 1665 | 0382 | 6E69 | 1864 | 0101 | 8000 | 0901 | 7800 |
| 0000262260 | 8086 | 032C | 8300 | 034F | 0701 | 7800 | 4085 | 8351 |
| 0000262300 | 034A | 0701 | 7800 | 4085 | 8301 | 0351 | 0701 | 7A00 |
| 0000262320 | 8373 | 034A | 0082 | 0701 | 7800 | A085 | 8300 | 0081 |
| 0000262340 | 0701 | 7800 | 4085 | 8301 | 00C0 | 0A01 | 7500 | 8380 |
| 0000262360 | 0081 | 0064 | 0183 | 0102 | 0001 | 0180 | 000A | 8075 |
| 0000262400 | 0083 | 6402 | 8300 | 0201 | 0101 | 8000 | 1301 | 7F00 |
| 0000262420 | 5783 | 8302 | 00C0 | C083 | 8300 | 00C0 | 8183 | 8300 |
| 0000262440 | 02C4 | 0A01 | 7500 | 8380 | 00C0 | 0664 | 5883 | 0103 |
| 0000262460 | 0005 | 3078 | 8083 | 0100 | 0005 | 1078 | 8083 | 0100 |

```
THU MAR 14 17:41:20 1991  LBIPMT.DLL  PAGE 90, LINE 5252

0000262500  000A  8075  0083  6402  8300  0201  0501  7800
0000262520  8350  0080  0701  7800  7885  8301  0080  0701
0000262540  7800  8085  8301  0080  0701  7800  5085  8301
0000262560  0080  0501  7800  8318  0080  07C1  7800  8085
0000262600  8300  0080  0A01  7F00  5783  8302  00C0  8183
0000262620  0100  000A  8075  8183  6400  8303  0363  0701
0000262640  7800  A085  8300  0080  1901  7F00  8183  8300
0000262660  0257  C083  8300  00C0  8183  8300  00C0  C783
0000262700  8302  00C2  0A01  7500  8380  0081  0864  6683
0000262720  0103  0007  8578  00A8  8083  0100  0005  4878
0000262740  8083  0100  0005  2878  8083  0100  0005  3878
0000262760  8083  0100  0007  837F  0081  C083  0100  000A
0000263000  8075  8183  6400  8302  036C  0501  7800  8308
0000263020  0080  0101  8000  0701  7800  0085  8301  0080
0000263040  0101  8000  0101  8000  1201  7900  0560  0383
0000263060  8302  0204  0682  695F  626F  6675  0169  0010
0000263100  837F  00C0  8183  8300  00C0  8083  8300  0080
0000263120  2701  7F00  0482  705F  7274  8200  5F04  6E63
0000263140  0474  0582  625F  7361  0665  0582  665F  616C
0000263160  0A67  0582  665F  6C69  0B65  0101  8000  0701
0000263200  7A00  8373  0202  0082  0101  8000  0101  8000
0000263220  0101  8000  0101  8000  0101  8000  0701  7A00
0000263240  8373  0202  0082  0101  8000  0101  8000  0101
0000263260  8000  0101  8000  0101  8000  0101  8000  0101
*
0000264040  8000  0501  7800  8300  0084  0101  8000  0101
0000264060  8000  0101  8000  0101  8000  0101  8000  0101
*
0000265320  8000  0101  8000  0101  8000  0A01  7500  8380
0000265340  00C0  0064  0183  0102  0007  8578  00D0  8083
0000265360  0100  000A  8075  C083  6400  8300  0201  0401
0000265400  7F00  C083  0100  000A  8075  C083  6400  8301
0000265420  031C  0401  7F00  C083  0100  000A  8075  C083
0000265440  6400  8301  031E  0401  7F00  C083  0100  000A
0000265460  8075  8183  6400  8301  0320  0701  7F00  C083
0000265500  8300  00C0  0A01  7500  8380  00C0  0264  2283
0000265520  0103  0001  0180  0007  837F  00C0  C083  0100
0000265540  000A  8075  0C83  6402  8302  0325  0701  7800
0000265560  D885  8300  0080  0101  8000  0A01  7500  8380
0000265600  0080  0064  0183  0102  0007  8578  0320  8083
0000265620  0100  0005  1878  8083  0100  000A  8075  8083
0000265640  6400  8300  0201  0A01  7500  8380  0081  0064
0000265660  0183  0102  0001  0180  0001  0180  0005  4078
0000265700  8083  0100  0005  4078  8083  0100  0001  0180
0000265720  0001  0180  0001  0180  0001  0180  0001  0180
*
0000266420  0001  0180  0007  737A  C083  8200  0100  0001
0000266440  0180  0001  0180  0001  0180  0001  0180  0001
0000266460  0180  0007  737A  5E83  8202  0100  000A  8075
0000266500  0083  6402  8300  0201  0101  8000  0101  8000
0000266520  0101  8000  0101  8000  0101  8000  0101  8000
*
0000267320  1601  7900  0330  C283  8302  02C3  0A82  7528
0000267340  746E  6761  6567  2964  0169  000A  837F  0081
0000267360  8183  8300  0081  1C01  7F00  0682  6170  6B63
0000267400  685F  8200  6606  6C69  5F65  0268  0682  7566
0000267420  636E  685F  0104  0007  737A  C183  8202  0100
0000267440  0001  0180  0001  0180  0007  737A  C883  8202
0000267460  0100  000A  8075  8183  6400  8302  02C9  0701
```

THU MAR 14 17:41:20 1991 LBIPMT.DLL PAGE 91, LINE 5311

```
0000267500  7F00  C083  8300  00C0  0101  8000  0101  8000
0000267520  0101  8000  0101  8000  0101  8000  0101  8000
*
0000267600  0101  8000  0101  8000  0101  8000  0701  7A00
0000267620  8373  02DC  0082  0A01  7500  8380  0200  0064
0000267640  0183  0102  0001  0180  0001  0180  0001  0180
0000267660  0001  0180  0001  0180  0001  0180  0001  0180
0000267700  0001  0180  0001  0180  0001  0180  0001  0180
0000267720  0950  831A  02EA  EB83  8202  420A  0018  8579
0000267740  6974  6E6F  6973  0701  7800  4085  5F58  706F
0000267760  0701  7800  9085  8301  0080  4F01  8306  0080
0000270000  8300  0081  8183  8300  0081  8183  7F00  8183
0000270020  8183  8300  0081  8183  8300  0081  8300  0081
0000270040  0081  8183  8300  0081  8300  0081  8183  8300
0000270060  8300  0081  8183  8300  E883  8302  02E9  8183
0000270100  8183  8300  0081  8183  0081  8183  8300  0081
0000270120  0F82  7842  705F  6F72  8300  0081  B801  7F01
0000270140  0074  0F82  7842  705F  5F63  6E69  6568  6972
0000270160  6972  0274  0F82  7842  6361  5F6B  6E69  6568
0000270200  6568  6972  0474  0F82  665F  6C69  5F65  6E69
0000270220  6E69  6568  6972  0674  7842  665F  6E75  5F63
0000270240  6C67  5F65  696C  656E  0E82  7842  735F  6E69
0000270260  6564  746E  735F  6574  8208  420E  5F78  6E69
0000270300  6978  5F74  6F63  666E  0A70  0F82  7842  655F
0000270320  705F  6972  746E  705F  7269  0C6D  0E82  7842
0000270340  5F78  7270  6E69  5F74  6361  736B  820E  420E
0000270360  7842  705F  6972  746E  6966  656C  1073  0E82
0000270400  420D  5F78  7270  6E69  665F  6E75  7363  8212
0000270420  420E  5F78  7270  6E69  5F74  696C  656E  8214
0000270440  0682  7842  6C5F  676F  5F74  656C  6576  166C
0000270460  7261  6465  6C5F  676F  8218  420D  5F78  6873
0000270500  5F67  6966  656C  821C  821A  420B  5F78  6F6C
0000270520  7865  8574  00E4  0882  420A  5F78  6F6C  5F67
0000270540  1685  8201  4208  5F78  7842  745F  6D69  7365
0000270560  0982  7842  655F  7272  6564  7562  8567  0118
0000270600  7842  665F  756C  6873  726F  8573  011A  0882
0000270620  7270  6E69  5F74  7270  1C85  8201  4210  5F78
0000270640  1182  7842  745F  7268  636F  7365  8573  011E
0000270660  6972  8574  0120  0F82  6165  5F64  6E69  6568
0000270700  745F  7268  6165  8564  7842  705F  6972  746E
0000270720  7272  726F  5F73  6964  0122  1082  7842  655F
0000270740  420F  5F78  7564  706D  6C61  676F  2485  8201
0000270760  2685  8201  420F  5F78  6F5F  7470  6F69  736E
0000271000  6974  7966  2885  0101  6362  646F  5F65  6F6E
0000271020  0001  0180  0001  0180  0001  0180  0001  0180
*
0000271540  0001  0180  0001  0180  0001  0180  0005  5078
0000271560  8083  0100  0007  8578  00A0  8083  0100  0007
0000271600  8578  00A8  8083  0100  0005  2078  8083  0100
0000271620  0005  1078  8083  0100  0007  8578  0140  C083
0000271640  0100  0001  0180  0001  0180  000A  8075  0083
0000271660  6402  8308  034E  1901  7F00  C483  8302  00C0
0000271700  C083  8300  00C0  8183  8300  00C0  C283  8300
0000271720  00C0  0A01  7500  8380  0200  0764  5083  0103
0000271740  0016  837F  02C4  C083  8300  00C0  C083  8300
0000271760  0081  C083  8300  00C0  0701  7800  0085  8310
0000272000  0080  0101  8000  0A01  7500  8380  0200  0064
0000272020  0183  0102  0004  837F  00C0  0A01  7500  8380
0000272040  0200  0164  5483  0103  0007  8578  00F0  8083
```

THU MAR 14 17:41:20 1991 LBIPMT.DLL PAGE 92, LINE 5370

| | | | | | | | | |
|---|---|---|---|---|---|---|---|---|
| 0000272060 | 0100 | 0007 | 8578 | 0090 | 8083 | 0100 | 0004 | 837F |
| 0000272100 | 00C0 | 0A01 | 7500 | 8380 | 0200 | 0164 | 5883 | 0103 |
| 0000272120 | 0005 | 7878 | 8083 | 0100 | 0007 | 8578 | 0198 | 8083 |
| 0000272140 | 0100 | 0007 | 8578 | 00C0 | 8083 | 0100 | 000A | 8075 |
| 0000272160 | 8183 | 6400 | 8300 | 0201 | 0701 | 7800 | C885 | 8300 |
| 0000272200 | 0080 | 0701 | 7800 | E085 | 8300 | 0080 | 0701 | 7800 |
| 0000272220 | 8085 | 8301 | 0080 | 0701 | 7800 | 7085 | 8301 | 0080 |
| 0000272240 | 0701 | 7800 | 6085 | 8301 | 0080 | 0701 | 7800 | 0885 |
| 0000272260 | 8301 | 0080 | 0701 | 7800 | 8885 | 8300 | 0080 | 0101 |
| 0000272300 | 8000 | 1901 | 7F00 | C083 | 8300 | 00C0 | C083 | 8300 |
| 0000272320 | 0081 | 5783 | 8302 | 02C4 | C283 | 8300 | 00C0 | 0A01 |
| 0000272340 | 7500 | 8380 | 00C0 | 0864 | 6683 | 0103 | 0007 | 8578 |
| 0000272360 | 0188 | 8083 | 0100 | 0007 | 8578 | 0148 | 8083 | 0100 |
| 0000272400 | 0005 | 3878 | 8083 | 0100 | 0001 | 0180 | 0022 | 837F |
| 0000272420 | 00C0 | C083 | 8300 | 0081 | C083 | 8300 | 02C4 | 5783 |
| 0000272440 | 8302 | 00C2 | C083 | 8300 | 0081 | C083 | 8300 | 02C7 |
| 0000272460 | 0A01 | 7500 | 8380 | 0081 | 0B64 | 6C83 | 0103 | 0016 |
| 0000272500 | 837F | 00C0 | C083 | 8300 | 0081 | C083 | 8300 | 02C4 |
| 0000272520 | 5783 | 8302 | 00C2 | 0A01 | 7500 | 8380 | 0081 | 0764 |
| 0000272540 | 6E83 | 0103 | 0001 | 0180 | 0001 | 0180 | 0016 | 837F |
| 0000272560 | 00C0 | C083 | 8300 | 0081 | C083 | 8300 | 02C4 | 5783 |
| 0000272600 | 8302 | 00C2 | 0A01 | 7500 | 8380 | 0081 | 0764 | 7283 |
| 0000272620 | 0103 | 001C | 837F | 00C0 | C083 | 8300 | 0081 | C083 |
| 0000272640 | 8300 | 02C4 | 5783 | 8302 | 00C2 | 8183 | 8300 | 00C0 |
| 0000272660 | 0A01 | 7500 | 8380 | 0081 | 0964 | 7483 | 0103 | 0005 |
| 0000272700 | 6078 | 8283 | 0100 | 0007 | 8578 | 00B0 | 8083 | 0100 |
| 0000272720 | 001F | 837F | 00C1 | C083 | 8300 | 00C0 | C083 | 8300 |
| 0000272740 | 0081 | C083 | 8300 | 02C4 | 5783 | 8302 | 00C2 | 0083 |
| 0000272760 | 0100 | 000A | 8075 | 8183 | 6400 | 830A | 0378 | 0701 |
| 0000273000 | 7800 | 5085 | 8301 | 0080 | 0701 | 7800 | D885 | 8300 |
| 0000273020 | 0080 | 1F01 | 7F00 | C183 | 8300 | 00C0 | C083 | 8300 |
| 0000273040 | 00C0 | 8183 | 8300 | 00C0 | C483 | 8302 | 0257 | C283 |
| 0000273060 | 8300 | 0000 | 0A01 | 7500 | 8380 | 0081 | 0A64 | 7C83 |
| 0000273100 | 0103 | 0016 | 837F | 02C4 | C083 | 8300 | 00C0 | C083 |
| 0000273120 | 8300 | 0081 | C083 | 8300 | 00C0 | 0A01 | 7500 | 8380 |
| 0000273140 | 0200 | 0764 | 7E83 | 0103 | 0022 | 837F | 00C1 | C083 |
| 0000273160 | 8300 | 00C0 | C083 | 8300 | 0081 | C083 | 8300 | 02C4 |
| 0000273200 | 5783 | 8302 | 00C2 | 8183 | 8300 | 0000 | 0A01 | 7500 |
| 0000273220 | 8380 | 0081 | 0B64 | 8083 | 0103 | 001C | 837F | 00C1 |
| 0000273240 | C083 | 8300 | 00C0 | C083 | 8300 | 0081 | C083 | 8300 |
| 0000273260 | 02C4 | 5783 | 8302 | 00C2 | 0A01 | 7500 | 8380 | 0081 |
| 0000273300 | 0964 | 8283 | 0103 | 0005 | 6878 | 8083 | 0100 | 0004 |
| 0000273320 | 837F | 00C0 | 0A01 | 7500 | 8380 | 0200 | 0164 | 8583 |
| 0000273340 | 0103 | 0019 | 837F | 02C4 | C083 | 8300 | 00C0 | C083 |
| 0000273360 | 8300 | 0081 | C083 | 8300 | 00C2 | C083 | 0100 | 000A |
| 0000273400 | 8075 | 0083 | 6402 | 8308 | 0387 | 1601 | 7F00 | C483 |
| 0000273420 | 8302 | 00C0 | C083 | 8300 | 00C0 | 8183 | 8300 | 00C0 |
| 0000273440 | C283 | 0100 | 000A | 8075 | 0083 | 6402 | 8307 | 0389 |
| 0000273460 | 0401 | 7F00 | C283 | 0100 | 000A | 8075 | 0083 | 6402 |
| 0000273500 | 8301 | 038B | 0501 | 7800 | 8330 | 0080 | 0A01 | 7500 |
| 0000273520 | 8380 | 0081 | 0064 | 0183 | 0102 | 000A | 8075 | 8183 |
| 0000273540 | 6400 | 8300 | 0201 | 0A01 | 7500 | 8380 | 0081 | 0064 |
| 0000273560 | 0183 | 0102 | 0004 | 837F | 00C0 | 0A01 | 7500 | 8380 |
| 0000273600 | 00C0 | 0164 | 9183 | 0103 | 0001 | 0180 | 000A | 8075 |
| 0000273620 | C083 | 6400 | 8300 | 0201 | 0D01 | 7F00 | C083 | 8300 |
| 0000273640 | 00C0 | C083 | 8300 | 00C0 | 0A01 | 7500 | 8380 | 0200 |
| 0000273660 | 0464 | 9583 | 0103 | 0007 | 8578 | 0080 | 8083 | 0100 |
| 0000273700 | 0001 | 0180 | 0004 | 837F | 02DB | 0A01 | 7500 | 8380 |
| 0000273720 | 0200 | 0164 | 9983 | 0103 | 000A | 8075 | 8183 | 6400 |

```
THU MAR 14 17:41:20 1991  LBIPMT.DLL  PAGE 93, LINE 5429

0000273740  8300  0201  0101  8000  0101  8000  0101  8000
0000273760  0501  7800  8340  0080  0101  8000  0101  8000
0000274000  0101  8000  0101  8000  0101  8000  0101  8000
*
0000274640  1601  7900  0330  7083  8302  0271  0A82  7528
0000274660  746E  6761  6567  2964  0169  000A  837F  0081
0000274700  8183  8300  0081  1C01  7F00  0682  6170  6B63
0000274720  685F  8200  6606  6C69  5F65  0268  0682  7566
0000274740  636E  685F  0104  0007  737A  C083  8200  0100
0000274760  0007  737A  6F83  8202  0100  0001  0180  0001
0000275000  0180  0001  0180  0001  0180  0001  0180  0001
*
0000275200  0180  0001  0180  0018  8579  0950  831A  029A
0000275220  9B83  8202  420A  5F58  706F  6974  6E6F  6973
0000275240  0701  780C  4085  8306  0080  0701  7800  9085
0000275260  8301  0080  4F01  7F00  8183  8300  0081  8183
0000275300  8300  0081  8183  8300  0081  8183  8300  0081
0000275320  8183  8300  0081  8183  8300  0081  8183  8300
0000275340  0081  9883  8302  0299  8183  8300  0081  8183
0000275360  8300  0081  8183  8300  0081  8183  8300  0081
0000275400  8183  8300  0081  B801  7F01  0F82  7842  705F
0000275420  6F72  5F63  6E69  6568  6972  0074  0F82  7842
0000275440  705F  6361  5F6B  6E69  6568  6972  0274  0F82
0000275460  7842  665F  6C69  5F65  6E69  6568  6972  0474
0000275500  0F82  7842  665F  6E75  5F63  6E69  6568  6972
0000275520  0674  0E82  7842  735F  6E69  6C67  5F65  696C
0000275540  656E  8208  420E  5F78  6E69  6564  746E  735F
0000275560  6574  0A70  0F82  7842  655F  6978  5F74  6F63
0000275600  666E  7269  0C6D  0E82  7842  705F  6972  746E
0000275620  705F  6361  736B  820E  420E  5F78  7270  6E69
0000275640  5F74  6966  656C  1073  0E82  7842  705F  6972
0000275660  746E  665F  6E75  7363  8212  420D  5F78  7270
0000275700  6E69  5F74  696C  656E  8214  420E  5F78  7270
0000275720  6E69  5F74  656C  6576  166C  0682  7842  6C5F
0000275740  676F  8218  420D  5F78  6873  7261  6465  6C5F
0000275760  676F  821A  420B  5F78  6F6C  5F67  6966  656C
0000276000  821C  420A  5F78  6F6C  5F67  7865  8574  00E4
0000276020  0882  7842  745F  6D69  7365  1685  8201  4208
0000276040  5F78  6564  7562  8567  0118  0982  7842  655F
0000276060  7272  726F  8573  011A  0882  7842  665F  756C
0000276100  6873  1C85  8201  4210  5F78  7270  6E69  5F74
0000276120  7270  636F  7365  8573  011E  1182  7842  745F
0000276140  7268  6165  5F64  6E69  6568  6972  8574  0120
0000276160  0F82  7842  705F  6972  746E  745F  7268  6165
0000276200  8564  0122  1082  7842  655F  7272  726F  5F73
0000276220  6964  6C61  676F  2485  8201  420F  5F78  7564
0000276240  706D  6F5F  7470  6F69  736E  2685  8201  420F
0000276260  5F78  6362  646F  5F65  6F6E  6974  7966  2885
0000276300  0101  0001  0180  0001  0180  0001  0180  0001
0000276320  0180  0001  0180  0001  0180  0001  0180  0001
*
0000277060  0180  0001  0180  0001  0180  0007  8578  0140
0000277100  C083  0100  001F  837F  0081  C083  8300  00C0
0000277120  8183  8300  00C0  7383  8302  0272  C283  8300
0000277140  00C0  0083  0100  000A  8075  8183  6400  830A
0000277160  02FB  0501  7800  8338  0080  0101  8000  0701
0000277200  7F00  C083  8300  0080  0A01  7500  8380  0200
0000277220  0264  FF83  0102  0001  0180  0007  8578  0080
0000277240  8083  0100  0007  8578  00A8  8083  0100  0007
```

THU MAR 14 17:41:20 1991 LBIPMT.DLL PAGE 94, LINE 5488

```
0000277260  8578  00A0  8083  0100  0005  7878  8083  0100
0000277300  0005  7078  8083  0100  0005  5878  8083  0100
0000277320  0005  6078  8083  0100  0005  6878  8083  0100
0000277340  0005  5078  8083  0100  0007  8578  0098  8083
0000277360  0100  0007  8578  1CE0  C083  0100  0005  0878
0000277400  8083  0100  0005  1078  8083  0100  0007  837F
0000277420  00C0  8183  0100  000A  8075  0083  6402  8302
0000277440  030F  0501  7800  8328  0080  0501  7800  8330
0000277460  0080  0701  7F00  C083  8300  0081  0A01  7500
0000277500  8380  0200  0264  1383  0103  0007  837F  00C0
0000277520  8583  0100  000A  8075  0083  6402  8302  0315
0000277540  0701  7F00  C083  8300  0082  0A01  7500  8380
0000277560  0200  0264  1783  0103  0007  837F  00C0  8683
0000277600  0100  000A  8075  0083  6402  8302  0319  0701
0000277620  7F00  C083  8300  00C0  0A01  7500  8380  0200
0000277640  0264  1B83  0103  0007  837F  00C0  8983  0100
0000277660  000A  8075  0083  6402  8302  031D  0701  7800
0000277700  9085  8300  0080  0701  7F00  C083  8300  0081
0000277720  0A01  7500  8380  0200  0264  2083  0103  0007
0000277740  837F  00C0  8983  0100  000A  8075  0083  6402
0000277760  8302  0322  0701  7800  8885  8300  0080  0701
0000300000  7F00  C083  8300  00C0  0A01  7500  8380  0200
0000300020  0264  2583  0103  0007  8578  00C0  8083  0100
0000300040  0007  8578  00B0  8083  0100  000A  8075  8183
0000300060  6400  8300  0201  0101  8000  0101  8000  0101
0000300100  8000  0501  7800  8340  0080  0101  8000  0101
0000300120  8000  0101  8000  0101  8000  0101  8000  0101
*
0000302020  8000  0101  8000  0101  8000  0101  8000  0701
0000302040  7800  8085  830C  00C0  0401  7F00  C083  0100
0000302060  000A  8075  8183  6400  8301  02FB  0501  7800
0000302100  8318  0080  0101  8000  0A01  7500  8380  0200
0000302120  0064  0183  0102  0004  837F  00C0  0A01  7500
0000302140  8380  0081  0164  0083  0103  0004  837F  00C0
0000302160  0A01  7500  8380  0081  0164  0283  0103  000A
0000302200  8075  8183  6400  8300  0201  0101  8000  0101
0000302220  8000  0101  8000  0501  7800  8340  0080  1201
0000302240  7900  0560  0683  8302  0207  0682  695F  626F
0000302260  6675  0169  0010  837F  00C0  8183  8300  00C0
0000302300  8083  8300  0080  2701  7F00  0482  705F  7274
0000302320  8200  5F04  6E63  0474  0582  625F  7361  0665
0000302340  0582  665F  616C  0A67  0582  665F  6C69  0B65
0000302360  0501  7800  8300  0205  0701  7A00  8373  0205
0000302400  0082  0101  8000  0101  8000  0101  8000  0101
0000302420  8000  0101  8000  0101  8000  0101  8000  0101
*
0000304160  8000  0101  8000  0101  8000  0101  8000  1801
0000304200  7900  5085  1A09  EC83  8302  02ED  0A82  5842
0000304220  6F5F  7470  6F69  736E  0169  0007  8578  0640
0000304240  8083  0100  0007  8578  0190  8083  0100  004F
0000304260  837F  0081  8183  8300  0081  8183  8300  0081
0000304300  8183  8300  0081  8183  8300  0081  8183  8300
0000304320  0081  8183  8300  0081  8183  8300  02EA  EB83
0000304340  8302  0081  8183  8300  0081  8183  8300  0081
0000304360  8183  8300  0081  8183  8300  0081  8183  0100
0000304400  01B8  827F  420F  5F78  7270  636F  695F  686E
0000304420  7265  7469  8200  420F  5F78  6170  6B63  695F
0000304440  686E  7265  7469  8202  420F  5F78  6966  656C
0000304460  695F  686E  7265  7469  8204  420F  5F78  7566
```

THU MAR 14 17:41:20 1991 LBIPMT.DLL PAGE 95, LINE 5547

```
0000304500  636E 695F 686E 7265 7469 8206 420E 5F78
0000304520  6973 676E 656C 6C5F 6E69 0865 0E82 7842
0000304540  695F 646E 6E65 5F74 7473 7065 820A 420F
0000304560  5F78 7865 7469 635F 6E6F 6966 6D72 820C
0000304600  420E 5F78 7270 6E69 5F74 6170 6B63 0E73
0000304620  0E82 7842 705F 6972 746E 665F 6C69 7365
0000304640  8210 420E 5F78 7270 6E69 5F74 7566 636E
0000304660  1273 0D82 7842 705F 6972 746E 6C5F 6E69
0000304700  1465 0E82 7842 705F 6972 746E 6C5F 7665
0000304720  6C65 8216 4206 5F78 6F6C 1867 0D82 7842
0000304740  735F 6168 6572 5F64 6F6C 1A67 0B82 7842
0000304760  6C5F 676F 665F 6C69 1C65 0A82 7842 6C5F
0000305000  676F 655F 7478 E485 8200 4208 5F78 6974
0000305020  656D 8573 0116 0882 7842 645F 6265 6775
0000305040  1885 8201 4209 5F78 7265 6F72 7372 1A85
0000305060  8201 4208 5F78 6C66 7375 8568 011C 1082
0000305100  7842 705F 6972 746E 705F 6F72 6563 7373
0000305120  1E85 8201 4211 5F78 6874 6572 6461 695F
0000305140  686E 7265 7469 2085 8201 420F 5F78 7270
0000305160  6E69 5F74 6874 6572 6461 2285 8201 4210
0000305200  5F78 7265 6F72 7372 645F 6169 6F6C 8567
0000305220  0124 0F82 7842 645F 6D75 5F70 706F 6974
0000305240  6E6F 8573 0126 0F82 7842 625F 6F63 6564
0000305260  6E5F 746F 6669 8579 0128 0101 8000 0101
0000305300  8000 0101 8000 0101 8000 0101 8000 0101
*
0000305360  8000 0101 8000 0101 8000 0101 8000 0701
0000305400  7800 A085 8300 0081 0A01 7500 8380 0081
0000305420  0064 0183 0102 000A 8075 8183 6400 8300
0000305440  0201 0701 7F00 C083 8300 00C0 0A01 7500
0000305460  8380 0081 0264 0283 0103 0007 8578 0100
0000305500  8083 0100 0007 837F 00C0 C083 0100 000A
0000305520  8075 8183 6400 8302 0305 0A01 7500 8380
0000305540  0081 0064 0183 0102 000A 8075 8183 6400
0000305560  8300 0201 0A01 7500 8380 0081 0064 0183
0000305600  0102 000A 8075 8183 6400 8300 0201 0A01
0000305620  7500 8380 0081 0064 0183 0102 000A 837F
0000305640  0209 C083 8300 00C0 0A01 7500 8380 0081
0000305660  0364 0C83 0103 0007 837F 00C0 0083 0100
0000305700  000A 8075 8183 6400 8302 030E 0701 7F00
0000305720  C083 8300 0000 0A01 7500 8380 0081 0264
0000305740  1083 0103 0007 837F 00C0 0083 0100 000A
0000305760  8075 8183 6400 8302 0312 0701 7F00 C083
0000306000  8300 00C0 0A01 7500 8380 0081 0264 1483
0000306020  0103 0007 837F 00C0 0083 0100 000A 8075
0000306040  0083 6402 8302 0316 0A01 7500 8380 0081
0000306060  0064 0183 0102 0005 2078 8083 0100 0005
0000306100  0878 8083 0100 000A 8075 8183 6400 8300
0000306120  0201 0A01 7500 8380 0081 0064 0183 0102
0000306140  0001 0180 000A 8075 0083 6402 8300 0201
0000306160  0701 7F00 C083 8300 0000 0A01 7500 8380
0000306200  0081 0264 1F83 0103 0007 837F 00C0 0083
0000306220  0100 000A 8075 8183 6400 8302 0321 0701
0000306240  7F00 C083 8300 0000 0A01 7500 8380 0081
0000306260  0264 2383 0103 0007 837F 00C0 C083 0100
0000306300  000A 8075 8183 6400 8302 0325 0701 7F00
0000306320  C083 8300 0000 0A01 7500 8380 0200 0264
0000306340  2783 0103 0001 0180 0013 837F 00C0 C083
0000306360  8300 00C0 8183 8300 00C0 C083 0100 000A
```

```
THU MAR 14 17:41:20 1991  LBIPMT.DLL  PAGE 96, LINE 5606

0000306400  8075 0083 6402 8306 032A 0701 7800 2085
0000306420  8303 0080 0101 8000 0501 7800 8350 0080
0000306440  0701 7800 8885 8301 0080 0701 7800 4885
0000306460  8301 0080 0501 7800 8330 0080 0501 7800
0000306500  8348 0080 0501 7800 8338 0080 0501 7800
0000306520  8310 0080 0501 7800 8318 0080 0501 7800
0000306540  8328 0080 1001 7F00 C083 8300 00C0 8183
0000306560  8300 00C0 C083 0100 000A 8075 0083 6402
0000306600  8305 0337 1001 7F00 C083 8300 00C0 8183
0000306620  8300 00C0 C083 0100 000A 8075 0083 6402
0000306640  8305 0339 1001 7F00 C083 8300 00C0 8183
0000306660  8300 00C0 C083 0100 000A 8075 0083 6402
0000306700  8305 033B 1001 7F00 C083 8300 00C0 8183
0000306720  8300 00C0 C083 0100 000A 8075 0083 6402
0000306740  8305 033D 0701 7F00 C083 8300 0000 0A01
0000306760  7500 8380 0081 0264 3F83 0103 0007 8578
0000307000  0088 8083 0100 000A 8075 8183 6400 8300
0000307020  0201 0101 8000 0101 8000 0101 8000 0101
0000307040  8000 0101 8000 0101 8000 0101 8000 0101
*
0000310220  8000 0401 7F00 C283 0100 000A 8075 8283
0000310240  6400 8301 02A1 0101 8000 0401 7F00 C283
0000310260  0100 000A 8075 0083 6402 8301 02A4 0501
0000310300  7800 8330 0080 0701 7F00 C283 8300 00C2
0000310320  0A01 7500 8380 0200 0264 A783 0102 0005
0000310340  2878 8083 0100 000A 8075 8183 6400 8300
0000310360  0201 0101 8000 0101 8000 0101 8000 0101
0000310400  8000 0101 8000 0101 8000 0101 8000 0101
*
0000312260  8000 0101 8000 1201 7900 2085 0103 F483
0000312300  8302 02F5 0482 6E69 6F66 0169 0007 8578
0000312320  0320 8083 0100 0004 837F 02F3 0A01 7F00
0000312340  0682 6264 7367 7274 0100 0015 8579 0340
0000312360  8302 02F8 F983 8202 6507 656C 656D 746E
0000312400  0169 0007 737A F683 8202 0100 0007 837F
0000312420  02F2 F783 0102 000F 827F 6904 666E 006F
0000312440  0482 656E 7478 0164 0001 0180 0001 0180
0000312460  0007 737A F683 8202 0100 0001 0180 0001
0000312500  0180 0007 737A F283 8202 0100 0001 0180
0000312520  0001 0180 0001 0180 0001 0180 0001 0180
0000312540  0001 0180 0007 737A 0783 8203 0100 000A
0000312560  8075 8183 6400 8301 0308 0401 7F00 FF83
0000312600  0102 0001 0180 0001 0180 0001 0180 0001
0000312620  0180 0001 0180 0001 0180 0007 737A 1083
0000312640  8203 0100 000A 8075 8183 6400 8302 0311
0000312660  0701 7F00 FF83 8302 02FF 0101 8000 0101
0000312700  8000 0101 8000 0101 8000 0101 8000 0101
*
0000313000  8000 0101 8000 0101 8000 0401 7F00 FF83
0000313020  0102 000A 8075 8183 6400 8301 0326 0501
0000313040  7800 8320 0080 0701 7F00 FF83 8302 02FF
0000313060  0A01 7500 8380 0081 0264 2983 0103 0001
0000313100  0180 0004 837F 00C0 0A01 7500 8380 0200
0000313120  0164 2C83 0103 0005 5878 8063 0100 0001
0000313140  0180 000A [illegible]075 FC83 6402 8300 0201 0701
0000313160  7F00 F783 8302 02F7 0A01 7500 8380 0200
0000313200  0264 3183 0103 0007 8578 00E8 8083 0100
0000313220  000A 837F 02F7 F783 8302 02FF 0A01 7500
0000313240  8380 0081 0364 3483 0103 0004 837F 02F7
```

```
THU MAR 14 17:41:20 1991  LBIPMT.DLL  PAGE 97, LINE 5665

0000313260  0A01  7500  8380  0200  0164  3683  0103  0007
0000313300  8578  0120  8083  0100  0004  837F  02F7  0A01
0000313320  7500  8380  0200  0164  3983  0103  000A  837F
0000313340  02F7  F783  8302  02FF  0A01  7500  8380  0200
0000313360  0364  3B83  0103  000A  837F  02F7  F783  8302
0000313400  02FF  0A01  7500  8380  0200  0364  3D83  0103
0000313420  0007  8578  0108  8083  0100  0007  837F  02F7
0000313440  0683  0103  000A  8075  0083  6402  8302  0340
0000313460  0501  7800  8310  0080  0401  7F00  F783  0102
0000313500  000A  8075  FC83  6402  8301  0343  0701  7F00
0000313520  F783  8302  02F7  0A01  7500  8380  02FC  0264
0000313540  4583  0103  000A  837F  02F7  FF83  8302  030F
0000313560  0A01  7500  8380  0081  0364  4783  0103  0007
0000313600  837F  02F7  C083  0100  000A  8075  8183  6400
0000313620  8302  0349  0101  8000  0101  8000  0101  8000
0000313640  0101  8000  0101  8000  0101  8000  0101  8000
*
0000314300  0101  8000  1401  7900  0330  4D83  8302  024E
0000314320  0882  505F  4449  4E49  4F46  0169  000A  837F
0000314340  0085  8583  8300  0085  1901  7F00  0382  6970
0000314360  0064  0382  6974  0264  0982  6970  5064  7261
0000314400  6E65  0474  0101  8000  0101  8000  0101  8000
0000314420  0101  8000  0101  8000  0101  8000  0101  8000
*
0000320200  0101  8000  1301  7900  0560  3083  8304  0431
0000320220  0782  4D5F  4951  464E  694F  1001  7F00  8583
0000320240  8300  0085  8583  8300  0085  C083  0100  0026
0000320260  827F  6302  0062  0382  6970  0264  0382  6974
0000320300  0464  0582  6D63  6773  0673  0982  5270  7365
0000320320  7265  6576  0864  0101  8000  0101  8000  0101
0000320340  8000  0101  8000  0101  8000  0101  8000  0101
*
0000322100  8000  0701  7800  0085  8320  0080  0101  8000
0000322120  0101  8000  0101  8000  0101  8000  0101  8000
*
0000326440  0101  8000  0101  8000  0101  8000  0701  7800
0000326460  9085  8301  0080  0101  8000  0101  8000  0101
0000326500  8000  0101  8000  0101  8000  0101  8000  0101
*
0000326640  8000  0101  8000  0101  8000  0A01  7500  8380
0000326660  0085  0364  6583  0107  000A  837F  00C0  C083
0000326700  8300  0081  0101  8000  0101  8000  0A01  7500
0000326720  8380  0081  0164  6983  0107  0004  837F  00C0
0000326740  0A01  7500  8380  0081  0064  0183  0102  0005
0000326760  2078  8083  0100  0007  8578  0128  8083  0100
0000327000  0005  5078  8083  0100  0007  837F  00C0  C083
0000327020  0100  000A  8075  8183  6400  8302  076E  0701
0000327040  7800  D085  8300  0080  0101  8000  0A01  7F00
0000327060  C083  8300  00C0  8183  0100  000A  8075  8583
0000327100  6400  8303  0772  0A01  7500  8380  0081  0064
0000327120  0183  0102  0005  1078  8083  0100  000D  837F
0000327140  00C0  8583  8300  00C0  C083  0100  000A  8075
0000327160  C083  7300  8304  0776  0101  8000  0401  7F00
0000327200  8583  0100  000A  8075  8183  7300  8301  0779
0000327220  0701  7800  9885  8300  0080  0501  7800  8355
0000327240  0080  0501  7800  8378  0080  0501  7800  8338
0000327260  0080  0501  7800  8368  0080  0701  7800  1885
0000327300  8301  0080  0401  7F00  C083  0100  000A  8075
0000327320  8183  6400  8301  0781  0A01  7500  8380  0081
```

THU MAR 14 17:41:20 1991  LBIPMT.DLL  PAGE 98, LINE 5724

```
0000327340  0064  0183  0102  000A  8075  8183  6400  8300
0000327360  0201  0101  8000  0101  8000  0101  8000  0101
0000327400  8000  0101  8000  0101  8000  0101  8000  0101
*
0000331400  8000  0101  8000  0101  8000  0101  8000  1401
0000331420  7900  0330  0983  8303  030A  0882  505F  4449
0000331440  4E49  4F46  0169  000A  837F  0085  8583  8300
0000331460  0085  1901  7F00  0382  6970  0064  0382  6974
0000331500  0264  0982  6970  5064  7261  6E65  0474  0101
0000331520  8000  0101  8000  0101  8000  0101  8000  0101
*
0000335620  8000  0101  8000  0701  7800  4085  8301  00C0
0000335640  0501  7800  8358  0080  0101  8000  0A01  7500
0000335660  8380  0200  0064  0183  0102  0005  1878  8083
0000335700  0100  0004  837F  00C0  0A01  7500  8380  0200
0000335720  0164  2283  0105  0007  8578  00D8  8083  0100
0000335740  0001  0180  000A  8075  0083  6402  8300  0201
0000335760  0A01  7500  8380  0081  0064  0183  0102  000A
0000336000  8075  8183  6400  8300  0201  0A01  7500  8380
0000336020  0081  0064  0183  0102  0004  837F  0081  0A01
0000336040  7500  8380  00C0  0164  2A83  0105  0001  0180
0000336060  000A  8075  C083  6400  8300  0201  0101  8000
0000336100  0101  8000  1201  7900  0560  0383  8302  0204
0000336120  0682  695F  626F  6675  0169  0010  837F  00C0
0000336140  8183  8300  00C0  8083  8300  0080  2701  7F00
0000336160  0482  705F  7274  8200  5F04  6E63  0474  0582
0000336200  625F  7361  0665  0582  665F  616C  0A67  0582
0000336220  665F  6C69  0B65  0501  7800  8300  0202  0701
0000336240  7A00  8373  0202  0082  0101  8000  0101  8000
0000336260  0101  8000  0101  8000  0101  8000  0101  8000
*
0000336640  0101  8000  0501  7800  8300  0080  1101  7900
0000336660  0360  4B83  8302  024C  0582  7979  7673  6966
0000336700  1201  7900  0210  C383  8302  02C4  0682  7979
0000336720  6F77  6B72  0169  0007  737A  4883  8202  0100
0000336740  0007  737A  4783  8202  0100  000A  837F  0249
0000336760  4A83  8302  00C1  1F01  7F00  0782  7979  7473
0000337000  666F  0066  0782  7979  746F  6568  0472  0782
0000337020  7979  7473  706F  0873  0101  8000  0101  8000
0000337040  0101  8000  0101  8000  0101  8000  0101  8000
*
0000337300  0101  8000  0101  8000  0701  7800  4085  8306
0000337320  0080  0101  8000  0101  8000  0101  8000  0101
0000337340  8000  0101  8000  0101  8000  0101  8000  0101
*
0000337400  8000  1201  7900  2085  0103  8883  8302  0289
0000337420  0482  6E69  6F66  0169  0007  8578  0320  8083
0000337440  0100  0004  837F  0287  0A01  7F00  0682  6264
0000337460  7367  7274  0100  0015  8579  0340  8302  028C
0000337500  8D83  8202  6507  656C  656D  746E  0169  0007
0000337520  737A  8A83  8202  0100  0007  837F  0286  8B83
0000337540  0102  000F  827F  6904  666E  006F  0482  656E
0000337560  7478  0164  0001  0180  0001  0180  0001  0180
0000337600  0001  0180  0001  0180  0001  0180  0001  0180
*
0000340040  0001  0180  0001  0180  0016  2079  8303  02BC
0000340060  BD83  8202  280A  6E75  6174  6767  6465  6929
0000340100  0A01  7F00  8183  8300  028B  8183  0100  0016
0000340120  827F  7303  6D79  8200  6C03  7473  8200  6906
```

THU MAR 14 17:41:20 1991 LBIPMT.DLL PAGE 99, LINE 5783

| | | | | | | | | |
|---|---|---|---|---|---|---|---|---|
| 0000340140 | 746E | 6176 | 006C | 0A01 | 7500 | 8380 | 0081 | 0064 |
| 0000340160 | 0183 | 0102 | 0007 | 8578 | 00A8 | 8083 | 0100 | 000A |
| 0000340200 | 8075 | 8183 | 6400 | 8300 | 0201 | 0101 | 8000 | 0701 |
| 0000340220 | 7800 | 7085 | 8301 | 0081 | 0701 | 7F00 | 8083 | 8300 |
| 0000340240 | 0080 | 1401 | 7F00 | 0682 | 6576 | 6972 | 7966 | 8200 |
| 0000340260 | 6107 | 7664 | 6E61 | 6563 | 0101 | 0001 | 0180 | 0007 |
| 0000340300 | 8578 | 1410 | 4883 | 0102 | 0007 | 8578 | 0540 | 4783 |
| 0000340320 | 0102 | 0007 | 8578 | 0408 | 8083 | 0100 | 0005 | 4878 |
| 0000340340 | 8083 | 0100 | 0007 | 8578 | 1900 | 4A83 | 0102 | 0007 |
| 0000340360 | 737A | 4A83 | 8202 | 0100 | 000A | 8075 | 8183 | 6400 |
| 0000340400 | 8300 | 0201 | 0101 | 8000 | 0101 | 8000 | 0701 | 7F00 |
| 0000340420 | C183 | 8300 | 0081 | 0A01 | 7500 | 8380 | 0081 | 0264 |
| 0000340440 | CF83 | 0102 | 000A | 8075 | 8183 | 6400 | 8300 | 0201 |
| 0000340460 | 0401 | 7F00 | 8183 | 0100 | 000A | 8075 | 8183 | 6400 |
| 0000340500 | 8301 | 02D2 | 0401 | 7F00 | 8183 | 0100 | 000A | 8075 |
| 0000340520 | 8183 | 6400 | 8301 | 02D4 | 0101 | 8000 | 0101 | 8000 |
| 0000340540 | 1201 | 7900 | 0560 | 0383 | 8302 | 0204 | 0682 | 695F |
| 0000340560 | 626F | 6675 | 0169 | 0010 | 837F | 00C0 | 8183 | 8300 |
| 0000340600 | 00C0 | 8083 | 8300 | 0080 | 2701 | 7F00 | 0482 | 705F |
| 0000340620 | 7274 | 8200 | 5F04 | 6E63 | 0474 | 0582 | 625F | 7361 |
| 0000340640 | 0665 | 0582 | 665F | 616C | 0A67 | 0582 | 665F | 6C69 |
| 0000340660 | 0B65 | 0501 | 7800 | 8300 | 0202 | 0701 | 7A00 | 8373 |
| 0000340700 | 0202 | 0082 | 0101 | 8000 | 0101 | 8000 | 0101 | 8000 |
| 0000340720 | 0101 | 8000 | 0101 | 8000 | 0101 | 8000 | 0101 | 8000 |
| * | | | | | | | | |
| 0000341760 | 0101 | 8000 | 0101 | 8000 | 1801 | 7900 | 5085 | 1A09 |
| 0000342000 | 9783 | 8302 | 0298 | 0A82 | 5842 | 6F5F | 7470 | 6F69 |
| 0000342020 | 736E | 0169 | 0007 | 8578 | 0640 | 8083 | 0100 | 0007 |
| 0000342040 | 8578 | 0190 | 8083 | 0100 | 004F | 837F | 0081 | 8183 |
| 0000342060 | 8300 | 0081 | 8183 | 8300 | 0081 | 8183 | 8300 | 0081 |
| 0000342100 | 8183 | 8300 | 0081 | 8183 | 8300 | 0081 | 8183 | 8300 |
| 0000342120 | 0081 | 8183 | 8300 | 0295 | 9683 | 8302 | 0081 | 8183 |
| 0000342140 | 8300 | 0081 | 8183 | 8300 | 0081 | 8183 | 8300 | 0081 |
| 0000342160 | 8183 | 8300 | 0081 | 8183 | 0100 | 01B8 | 827F | 420F |
| 0000342200 | 5F78 | 7270 | 636F | 695F | 686E | 7265 | 7469 | 8200 |
| 0000342220 | 420F | 5F78 | 6170 | 6B63 | 695F | 686E | 7265 | 7469 |
| 0000342240 | 8202 | 420F | 5F78 | 6966 | 656C | 695F | 686E | 7265 |
| 0000342260 | 7469 | 8204 | 420F | 5F78 | 7566 | 636E | 695F | 686E |
| 0000342300 | 7265 | 7469 | 8206 | 420E | 5F78 | 6973 | 676E | 656C |
| 0000342320 | 6C5F | 6E69 | 0865 | 0E82 | 7842 | 695F | 646E | 6E65 |
| 0000342340 | 5F74 | 7473 | 7065 | 820A | 420F | 5F78 | 7865 | 7469 |
| 0000342360 | 635F | 6E6F | 6966 | 6D72 | 820C | 420E | 5F78 | 7270 |
| 0000342400 | 6E69 | 5F74 | 6170 | 6B63 | 0E73 | 0E82 | 7842 | 705F |
| 0000342420 | 6972 | 746E | 665F | 6C69 | 7365 | 8210 | 420E | 5F78 |
| 0000342440 | 7270 | 6E69 | 5F74 | 7566 | 636E | 1273 | 0D82 | 7842 |
| 0000342460 | 705F | 6972 | 746E | 6C5F | 6E69 | 1465 | 0E82 | 7842 |
| 0000342500 | 705F | 6972 | 746E | 6C5F | 7665 | 6C65 | 8216 | 4206 |
| 0000342520 | 5F78 | 6F6C | 1867 | 0D82 | 7842 | 735F | 6168 | 6572 |
| 0000342540 | 5F64 | 6F6C | 1A67 | 0B82 | 7842 | 6C5F | 676F | 665F |
| 0000342560 | 6C69 | 1C65 | 0A82 | 7842 | 6C5F | 676F | 655F | 7478 |
| 0000342600 | E485 | 8200 | 4208 | 5F78 | 6974 | 656D | 8573 | 0116 |
| 0000342620 | 0882 | 7842 | 645F | 6265 | 6775 | 1885 | 8201 | 4209 |
| 0000342640 | 5F78 | 7265 | 6F72 | 7372 | 1A85 | 8201 | 4208 | 5F78 |
| 0000342660 | 6C66 | 7375 | 8568 | 011C | 1082 | 7842 | 705F | 6972 |
| 0000342700 | 746E | 705F | 6F72 | 6563 | 7373 | 1E85 | 8201 | 4211 |
| 0000342720 | 5F78 | 6874 | 6572 | 6461 | 695F | 686E | 7265 | 7469 |
| 0000342740 | 2085 | 8201 | 420F | 5F78 | 7270 | 6E69 | 5F74 | 6874 |
| 0000342760 | 6572 | 6461 | 2285 | 8201 | 4210 | 5F78 | 7265 | 6F72 |
| 0000343000 | 7372 | 645F | 6169 | 6F6C | 8567 | 0124 | 0F82 | 7842 |

```
THU MAR 14 17:41:20 1991  LBIPMT.DLL  PAGE 100, LINE 5842

0000343020  645F  6D75  5F70  706F  6974  6E6F  8573  0126
0000343040  0F82  7842  625F  6F63  6564  6E5F  746F  6669
0000343060  8579  0128  0101  8000  0101  8000  0101  8000
0000343100  0101  8000  0101  8000  0101  8000  0101  8000
0000343120  0101  8000  0101  8000  1201  7900  2085  0103
0000343140  A483  8302  02A5  0482  6E69  6F66  0169  0007
0000343160  8578  0320  8083  0100  0004  837F  02A3  0A01
0000343200  7F00  0682  6264  7367  7274  0100  0015  8579
0000343220  0340  8302  02A8  A983  8202  6507  656C  656D
0000343240  746E  0169  0007  737A  A683  8202  0100  0007
0000343260  837F  02A2  A783  0102  000F  827F  6904  666E
0000343300  006F  0482  656E  7478  0164  0001  0180  0001
0000343320  0180  0007  737A  A683  8202  0100  0001  0180
0000343340  0001  0180  0001  0180  0001  0180  0001  0180
*
0000343520  0010  7079  8305  02CB  CC83  8202  6504  6174
0000343540  6962  1001  7F00  C083  8300  02A7  8183  8300
0000343560  0081  8183  0100  0020  827F  6902  0064  0382
0000343600  736C  0474  0482  7974  6570  8208  6D04  646F
0000343620  0A65  0382  6C61  0C6C  0101  8000  0101  8000
0000343640  0101  8000  0101  8000  0101  8000  0101  8000
*
0000344460  0101  8000  0501  7800  8300  0080  0501  7800
0000344500  8300  02CA  0101  8000  0101  8000  0101  8000
0000344520  0101  8000  1601  7900  0320  3B83  8303  033C
0000344540  0A82  7528  746E  6761  6567  2964  0169  000A
0000344560  837F  0081  A783  8302  0081  1601  7F00  0382
0000344600  7973  006D  0382  736C  0074  0682  6E69  7674
0000344620  6C61  0100  0001  0180  0004  837F  00C0  0A01
0000344640  7500  8380  02AC  0164  3E83  0103  0004  837F
0000344660  00C0  0A01  7500  8380  0081  0164  4083  0103
0000344700  0007  8578  0130  8083  0100  0007  837F  0081
0000344720  8183  0100  000A  8075  8183  6400  8302  0343
0000344740  0501  7800  8350  0080  0701  7800  8085  8300
0000344760  0080  0501  7800  8348  0080  0501  7800  8358
0000345000  0080  0501  7800  8378  0080  0501  7800  8338
0000345020  0080  0501  7800  8370  0080  0701  7800  8885
0000345040  8300  0080  0501  7800  8360  0080  0701  7800
0000345060  2085  8301  0080  0501  7800  8320  0081  0501
0000345100  7800  8320  0351  0501  7800  8310  0080  0101
0000345120  8000  0501  7800  8370  0081  0701  7800  1085
0000345140  830E  0081  0701  7800  0085  8301  0081  0501
0000345160  7800  8350  0081  0701  7800  A085  8300  0081
0000345200  0701  7800  0085  8319  033A  0701  7800  8085
0000345220  833E  0081  0A01  7500  8380  0081  0064  0183
0000345240  0102  0007  8578  0C80  8183  0100  0007  737A
0000345260  3A83  8203  0100  0007  8578  00F8  8083  0100
0000345300  0005  1078  8083  0100  0007  8578  00B8  8083
0000345320  0100  0005  2878  8083  0100  0005  2078  8083
0000345340  0100  0005  6878  8083  0500  0111  0000  1B00
0000345360  0001  6200  BD05  1001  B200  0001  0400  420C
0000345400  5F78  6544  7562  4967  696E  0D74  BC05  0602
0000345420  8100  0500  6966  7372  1474  1A05  0621  8100
0000345440  0C00  7862  705F  7069  6165  6176  6C69  0005
0000345460  00ED  0059  0409  FFFC  0081  7003  736F  0407
0000345500  FFF8  0516  6C01  0201  0201  011C  01BD  056F
0000345520  00B4  0010  00A9  0000  0D04  7842  665F  7269
0000345540  7473  695F  696E  0D74  FA04  C0FF  0700  7270
0000345560  636F  7365  0173  1B02  7101  7402  C505  1000
```

THU MAR 14 17:41:20 1991 LBIPMT.DLL PAGE 101, LINE 5901

| | | | | | | | | |
|---|---|---|---|---|---|---|---|---|
| 0000345600 | BA00 | 0000 | 0400 | 420C | 5F78 | 6170 | 7372 | 6665 |
| 0000345620 | 6C69 | 0D65 | 0604 | C000 | 0700 | 6564 | 6E66 | 6D61 |
| 0000345640 | 0C65 | 0A04 | C000 | 0600 | 6E65 | 7376 | 7274 | 0408 |
| 0000345660 | FFF6 | 0209 | 6602 | 0A70 | FA04 | C0FF | 0400 | 6966 |
| 0000345700 | 656C | 0201 | 0117 | 0336 | 0577 | 0041 | 0010 | 0036 |
| 0000345720 | 0000 | 0804 | 7862 | 705F | 7261 | 6573 | 0408 | 0006 |
| 0000345740 | 0209 | 6602 | 0170 | 1602 | 7701 | 7803 | 0D05 | 1002 |
| 0000345760 | 0200 | 0002 | 0400 | 5207 | 6165 | 4564 | 766E | 040A |
| 0000346000 | FF7E | 03DE | 6504 | 766E | 0770 | FA04 | C0FF | 0100 |
| 0000346020 | 0C63 | 0604 | 79FF | 0605 | 6264 | 6567 | 7078 | 0409 |
| 0000346040 | FF82 | 0579 | 7303 | 7274 | 050A | 038A | 0006 | 0209 |
| 0000346060 | 6602 | 0170 | 1902 | 8401 | 7D05 | EA05 | 1000 | DF00 |
| 0000346100 | 0000 | 0400 | 530A | 7465 | 6F4C | 4667 | 6C69 | 0E65 |
| 0000346120 | 9604 | 12FF | 0805 | 6F6C | 6667 | 616E | 656D | 040A |
| 0000346140 | FFFA | 00C0 | 6D04 | 646F | 0D65 | AC05 | 0603 | 8100 |
| 0000346160 | 0500 | 6966 | 7372 | 0174 | 1F02 | 6E01 | 7F06 | 4C05 |
| 0000346200 | 1002 | 4100 | 0002 | 0400 | 4210 | 5F78 | 7270 | 6E69 |
| 0000346220 | 5F74 | 706F | 6974 | 6E6F | 0773 | FA04 | 80FF | 0105 |
| 0000346240 | 0170 | 0502 | 000D | 1A00 | 0C0D | 6005 | 0622 | 0900 |
| 0000346260 | 0402 | 7979 | 6E69 | 0510 | 2654 | 0006 | 0081 | 7908 |
| 0000346300 | 6C79 | 6E69 | 6E65 | 1D6F | 8005 | 0601 | 8100 | 1500 |
| 0000346320 | 7862 | 695F | 6E67 | 726F | 5F65 | 6970 | 6570 | 655F |
| 0000346340 | 7272 | 726F | 1873 | 8805 | 0601 | 8100 | 1000 | 7842 |
| 0000346360 | 445F | 6665 | 7561 | 746C | 6148 | 646E | 656C | 0518 |
| 0000346400 | 018A | 0006 | 0081 | 4210 | 5F78 | 7250 | 636F | 7365 |
| 0000346420 | 4873 | 6E61 | 6C64 | 0F65 | 0005 | 0500 | 5D00 | 0705 |
| 0000346440 | 7842 | 665F | 6C69 | 1165 | 8C05 | 0601 | 8100 | 0900 |
| 0000346460 | 7842 | 6C5F | 6E69 | 6E65 | 126F | EA05 | 0549 | 5D00 |
| 0000346500 | 0A05 | 7842 | 765F | 7261 | 616E | 656D | 0512 | 018E |
| 0000346520 | 0006 | 00C0 | 420A | 5F78 | 754E | 6C6C | 7453 | 1272 |
| 0000346540 | 9205 | 0601 | 0300 | 0A05 | 7862 | 6F5F | 7470 | 6F69 |
| 0000346560 | 736E | 050E | 0178 | 0006 | 0204 | 7306 | 6363 | 6973 |
| 0000346600 | 1464 | 8205 | 0601 | 8100 | 0C00 | 7842 | 445F | 6265 |
| 0000346620 | 6775 | 6F4D | 6564 | 0514 | 0184 | 0006 | 0081 | 420C |
| 0000346640 | 5F78 | 6954 | 656D | 4D73 | 646F | 1465 | 8605 | 0601 |
| 0000346660 | 8100 | 0C00 | 7842 | 455F | 7272 | 726F | 6F4D | 6564 |
| 0000346700 | 050F | 2CFD | 0006 | 0499 | 6507 | 766E | 7269 | 6E6F |
| 0000346720 | 1105 | 0001 | 0000 | 0119 | 08BA | 033E | 0193 | 0010 |
| 0000346740 | 0188 | 0000 | 0A04 | 7842 | 745F | 6261 | 6E69 | 7469 |
| 0000346760 | 0407 | FFFC | 0081 | 6901 | 0201 | 0119 | 0A4D | 0341 |
| 0000347000 | 008B | 0010 | 0080 | 0000 | 0A04 | 7842 | 745F | 6261 |
| 0000347020 | 6966 | 646E | 0409 | 0006 | 00C0 | 7303 | 7274 | 040B |
| 0000347040 | FFFC | 0081 | 7005 | 616C | 6563 | 0201 | 011B | 0AD8 |
| 0000347060 | 0343 | 00FF | 0010 | 00F4 | 0000 | 0C04 | 7842 | 745F |
| 0000347100 | 6261 | 6E69 | 6573 | 7472 | 0409 | 0006 | 00C0 | 7303 |
| 0000347120 | 7274 | 040B | FFFC | 0081 | 7005 | 616C | 6563 | 0201 |
| 0000347140 | 011C | 0BD7 | 0346 | 014D | 0010 | 0142 | 0000 | 0D04 |
| 0000347160 | 7842 | 745F | 6261 | 616D | 656B | 6176 | 0972 | 0604 |
| 0000347200 | 8100 | 0300 | 6F70 | 0A73 | 0804 | AA00 | 0402 | 696C |
| 0000347220 | 7473 | 040A | 000C | 0081 | 6D04 | 646F | 0865 | FA04 |
| 0000347240 | C0FF | 0200 | 6469 | 0201 | 011A | 0D24 | 0348 | 00EB |
| 0000347260 | 0010 | 00E0 | 0000 | 0B04 | 7842 | 745F | 6261 | 7270 |
| 0000347300 | 6E69 | 0774 | FC04 | 81FF | 0100 | 0169 | 1802 | 0F01 |
| 0000347320 | 4A0E | 1403 | 1002 | 0900 | 0002 | 0400 | 4209 | 5F78 |
| 0000347340 | 6966 | 746C | 7265 | 040A | 0006 | 0273 | 6C04 | 6C76 |
| 0000347360 | 0A70 | 0A04 | C000 | 0400 | 6170 | 6B63 | 040A | 000E |
| 0000347400 | 00C0 | 6604 | 6C69 | 0A65 | 1204 | C000 | 0400 | 7566 |
| 0000347420 | 636E | 0411 | FFFA | 0081 | 700B | 6361 | 5F6B | 6163 |
| 0000347440 | 636C | 6465 | 0411 | FFF8 | 0081 | 660B | 6C69 | 5F65 |

THU MAR 14 17:41:20 1991 LBIPMT.DLL PAGE 102, LINE 5960

| | | | | | | | | |
|---|---|---|---|---|---|---|---|---|
| 0000347460 | 6163 | 636C | 6465 | 0411 | FFFC | 0081 | 660B | 6E75 |
| 0000347500 | 5F63 | 6163 | 636C | 6465 | 0201 | 011C | 1023 | 034D |
| 0000347520 | 00AC | 0016 | 00A0 | 0000 | 0D04 | 7842 | 705F | 6361 |
| 0000347540 | 666B | 6C69 | 6574 | 0A72 | 0604 | 7300 | 0402 | 766C |
| 0000347560 | 706C | 040A | 000A | 00C0 | 7004 | 6361 | 016B | 1B02 |
| 0000347600 | CF01 | 4F10 | D503 | 1000 | CA00 | 0000 | 0400 | 620C |
| 0000347620 | 5F78 | 6174 | 7362 | 6165 | 6372 | 0968 | 0604 | 8100 |
| 0000347640 | 0300 | 6F70 | 0773 | 0804 | C000 | 0100 | 0173 | 1602 |
| 0000347660 | A401 | 5211 | 6803 | 1000 | 5D00 | 0000 | 0400 | 6207 |
| 0000347700 | 5F78 | 6966 | 646E | 0409 | 0006 | 0081 | 7003 | 736F |
| 0000347720 | 0407 | 0008 | 00C0 | 7301 | 0201 | 0117 | 120C | 0354 |
| 0000347740 | 0156 | 0010 | 014B | 0000 | 0804 | 7842 | 6D5F | 7461 |
| 0000347760 | 6863 | 040A | 0006 | 0273 | 6C04 | 6C76 | 0770 | 0A04 |
| 0000350000 | C000 | 0100 | 0873 | FC04 | 81FF | 0200 | 746D | 0201 |
| 0000350020 | 011E | 1362 | 0355 | 00A7 | 0010 | 009C | 0000 | 0F04 |
| 0000350040 | 7842 | 545F | 7268 | 6165 | 4864 | 6E61 | 6C64 | 0A65 |
| 0000350060 | C404 | 99FF | 0402 | 7674 | 7261 | 0407 | FFFA | 00C0 |
| 0000350100 | 7001 | 0409 | FFF6 | 0081 | 6803 | 6C64 | 0409 | FFF8 |
| 0000350120 | 0081 | 7403 | 6469 | 0201 | 011B | 1409 | 0358 | 00AC |
| 0000350140 | 0010 | 00A1 | 0000 | 0C04 | 7842 | 6C5F | 6E69 | 6D65 |
| 0000350160 | 7461 | 6863 | 040C | 0006 | 0081 | 6D06 | 6674 | 6E75 |
| 0000350200 | 0A63 | 0804 | C000 | 0400 | 7566 | 636E | 040A | 000C |
| 0000350220 | 0081 | 6C04 | 6E69 | 0765 | 0E04 | C000 | 0100 | 0D73 |
| 0000350240 | CA04 | 99FF | 0702 | 696C | 656E | 6176 | 0972 | C804 |
| 0000350260 | 81FF | 0300 | 6F70 | 0873 | FC04 | 81FF | 0200 | 746D |
| 0000350300 | 0201 | 0113 | 14B5 | 035B | 0047 | 0010 | 003C | 0000 |
| 0000350320 | 0404 | 6168 | 6873 | 0409 | 0006 | 00C0 | 7303 | 7274 |
| 0000350340 | 0D08 | 0085 | 030E | 6176 | 016C | 1302 | FC01 | 5D14 |
| 0000350360 | 9803 | 1000 | 8D00 | 0000 | 0400 | 6604 | 6E69 | 0964 |
| 0000350400 | 0604 | C000 | 0300 | 7473 | 0B72 | FC04 | 85FF | 0500 |
| 0000350420 | 6C70 | 6361 | 0165 | 0502 | 000D | 1A00 | 0E00 | 9605 |
| 0000350440 | 0608 | 0400 | 0602 | 6373 | 7363 | 6469 | 0518 | 0188 |
| 0000350460 | 0006 | 0081 | 4210 | 5F78 | 6544 | 6166 | 6C75 | 4874 |
| 0000350500 | 6E61 | 6C64 | 1365 | 8A05 | 0601 | 8100 | 1000 | 7842 |
| 0000350520 | 505F | 6F72 | 6563 | 7373 | 6148 | 646E | 656C | 0512 |
| 0000350540 | 0192 | 0006 | 0297 | 620A | 5F78 | 706F | 6974 | 6E6F |
| 0000350560 | 0C73 | 7605 | 0512 | 3700 | 0403 | 7468 | 6261 | 0510 |
| 0000350600 | 069E | 0005 | 0338 | 6808 | 6174 | 5F62 | 706F | 0E74 |
| 0000350620 | 9E05 | 0608 | 8100 | 0600 | 694E | 6574 | 736D | 1105 |
| 0000350640 | 0001 | 0000 | 011C | 1594 | 0354 | 0059 | 0010 | 004E |
| 0000350660 | 0000 | 0D04 | 7842 | 695F | 696E | 5F74 | 7473 | 6361 |
| 0000350700 | 076B | FC04 | 81FF | 0100 | 0169 | 2002 | ED01 | 5615 |
| 0000350720 | 9803 | 1000 | 8D00 | 0000 | 0400 | 4211 | 5F78 | 6572 |
| 0000350740 | 7973 | 636E | 5F68 | 7473 | 6361 | 736B | 0409 | FFFC |
| 0000350760 | 0081 | 7403 | 6469 | 0407 | FFF6 | 0081 | 6901 | 0408 |
| 0000351000 | FFF8 | 0351 | 7302 | 0170 | 1B02 | 8501 | 5916 | 7A03 |
| 0000351020 | 1001 | 6F00 | 0001 | 0400 | 420C | 5F78 | 6544 | 7562 |
| 0000351040 | 5067 | 7375 | 0B68 | 0604 | 5700 | 0502 | 7473 | 6361 |
| 0000351060 | 0A6B | 0A04 | C000 | 0400 | 6170 | 6B63 | 040A | 000E |
| 0000351100 | 00C0 | 6604 | 6C69 | 0A65 | 1204 | C000 | 0400 | 7566 |
| 0000351120 | 636E | 040A | 0016 | 0081 | 6C04 | 6E69 | 0A65 | 1804 |
| 0000351140 | C400 | 0402 | 766C | 706C | 0409 | FFFC | 0081 | 7403 |
| 0000351160 | 6469 | 0409 | FFFA | 0081 | 6903 | 646E | 0201 | 011D |
| 0000351200 | 17FF | 035C | 0112 | 0010 | 0107 | 0000 | 0E04 | 7842 |
| 0000351220 | 705F | 6972 | 746E | 735F | 6174 | 6B63 | 0407 | FFF6 |
| 0000351240 | 0081 | 6901 | 040C | FFEC | 035D | 7006 | 6572 | 6966 |
| 0000351260 | 0878 | F804 | 51FF | 0203 | 7073 | 0409 | FFFC | 0081 |
| 0000351300 | 7403 | 6469 | 0201 | 011A | 1911 | 0364 | 01C4 | 0010 |
| 0000351320 | 01B9 | 0000 | 0B04 | 7842 | 445F | 6265 | 6775 | 6F50 |

THU MAR 14 17:41:20 1991 LBIPMT.DLL PAGE 103, LINE 6019

| | | | | | | | | |
|---|---|---|---|---|---|---|---|---|
| 0000351340 | 0B70 | 0604 | 5700 | 0502 | 7473 | 6361 | 0A6B | 0A04 |
| 0000351360 | C000 | 0400 | 7566 | 636E | 040D | 000E | 0081 | 4907 |
| 0000351400 | 4573 | 746E | 7265 | 0409 | FFFC | 0081 | 7403 | 6469 |
| 0000351420 | 0201 | 0119 | 1AD5 | 0367 | 02A9 | 0010 | 029E | 0000 |
| 0000351440 | 0A04 | 7842 | 465F | 6E75 | 5263 | 7465 | 040A | 0006 |
| 0000351460 | 0081 | 6C04 | 6E69 | 0B65 | 0804 | 5700 | 0502 | 7473 |
| 0000351500 | 6361 | 0A6B | 0C04 | C000 | 0400 | 7566 | 636E | 040D |
| 0000351520 | 0010 | 00C0 | 7407 | 7079 | 7365 | 7274 | 040D | 0014 |
| 0000351540 | 0081 | 6207 | 5F78 | 7974 | 6570 | 040A | 0016 | 00C0 |
| 0000351560 | 7604 | 6C61 | 0F70 | 1A04 | C700 | 0902 | 7270 | 6E69 |
| 0000351600 | 6674 | 6E75 | 0B63 | 1E04 | C200 | 0500 | 6C63 | 636F |
| 0000351620 | 086B | F804 | 51FF | 0203 | 7073 | 0407 | FFF6 | 0081 |
| 0000351640 | 6901 | 040B | FFF4 | 0081 | 6605 | 756F | 646E | 0409 |
| 0000351660 | FFFC | 0081 | 7403 | 6469 | 0201 | 011B | 1D7E | 036D |
| 0000351700 | 01AA | 0010 | 019F | 0000 | 0C04 | 7842 | 735F | 6474 |
| 0000351720 | 6572 | 7674 | 6C61 | 040D | 0006 | 0081 | 6207 | 5F78 |
| 0000351740 | 7974 | 6570 | 040A | 0008 | 00C0 | 7604 | 6C61 | 0170 |
| 0000351760 | 0502 | 000D | 1A00 | 1200 | 9205 | 0601 | E700 | 0A02 |
| 0000352000 | 7862 | 6F5F | 7470 | 6F69 | 736E | 0510 | 35CA | 0006 |
| 0000352020 | 034E | 6208 | 5F78 | 7473 | 6361 | 096B | A205 | 0635 |
| 0000352040 | 5000 | 0103 | 0F53 | 8E05 | 0635 | 5200 | 0703 | 7862 |
| 0000352060 | 735F | 6564 | 1170 | C805 | 0549 | 5200 | 0903 | 7842 |
| 0000352100 | 695F | 646E | 6E65 | 1074 | 7205 | 0506 | 5300 | 0803 |
| 0000352120 | 7842 | 735F | 7566 | 636E | 050E | 08EA | 0006 | 0204 |
| 0000352140 | 7306 | 6363 | 6973 | 0564 | 0111 | 0000 | 1700 | 2801 |
| 0000352160 | 191F | 5503 | 1000 | 4A00 | 0000 | 0400 | 4208 | 5F78 |
| 0000352200 | 7461 | 6D69 | 0765 | FA04 | 82FF | 0100 | 0B74 | 5A05 |
| 0000352220 | 069B | 1A00 | 0303 | 7361 | 0163 | 1702 | 7D01 | 1B1F |
| 0000352240 | 5003 | 1000 | 4500 | 0000 | 0400 | 4208 | 5F78 | 7463 |
| 0000352260 | 6D69 | 0765 | FA04 | 82FF | 0100 | 0F74 | 7405 | 069B |
| 0000352300 | 1A00 | 0703 | 7361 | 7463 | 6D69 | 0165 | 1802 | CD01 |
| 0000352320 | 1D1F | 8103 | 1000 | 7600 | 0000 | 0400 | 4209 | 5F78 |
| 0000352340 | 7473 | 6C72 | 7277 | 0409 | 0006 | 00C0 | 7303 | 7274 |
| 0000352360 | 0407 | FFFA | 00C0 | 7301 | 0201 | 0118 | 204E | 031F |
| 0000352400 | 0081 | 0010 | 0076 | 0000 | 0904 | 7842 | 735F | 7274 |
| 0000352420 | 7075 | 0972 | 0604 | C000 | 0300 | 7473 | 0772 | FA04 |
| 0000352440 | C0FF | 0100 | 0173 | 1902 | CF01 | 2120 | 5103 | 1000 |
| 0000352460 | 4600 | 0000 | 0400 | 420A | 5F78 | 7349 | 6857 | 7469 |
| 0000352500 | 0765 | 0604 | C000 | 0100 | 0173 | 1B02 | 2001 | 2321 |
| 0000352520 | AF03 | 1000 | A400 | 0000 | 0400 | 420C | 5F78 | 7543 |
| 0000352540 | 4274 | 616C | 6B6E | 0973 | 0604 | C000 | 0300 | 756F |
| 0000352560 | 0774 | 0A04 | C000 | 0100 | 0773 | FA04 | C0FF | 0100 |
| 0000352600 | 0170 | 1802 | CF01 | 2621 | 6603 | 1000 | 5B00 | 0000 |
| 0000352620 | 0400 | 4209 | 5F78 | 6665 | 706F | 6E65 | 040A | 0006 |
| 0000352640 | 00C0 | 6604 | 6C69 | 0A65 | 0A04 | C000 | 0400 | 6F6D |
| 0000352660 | 6564 | 0408 | FFFA | 0206 | 6602 | 0170 | 2002 | 3501 |
| 0000352700 | 2922 | 3803 | 1000 | 2D00 | 0000 | 0400 | 4211 | 5F78 |
| 0000352720 | 6564 | 6166 | 6C75 | 5F74 | 6567 | 6B74 | 7965 | 040C |
| 0000352740 | FF9A | 032A | 7306 | 7274 | 6E69 | 0967 | 9804 | 80FF |
| 0000352760 | 0300 | 656B | 0179 | 1702 | 6D01 | 2C22 | 2303 | 1000 |
| 0000353000 | 1800 | 0000 | 0400 | 4208 | 4778 | 7465 | 654B | 0179 |
| 0000353020 | 0502 | 000D | 1A00 | 0E00 | 8005 | 0631 | 6C00 | 0602 |
| 0000353040 | 635F | 7974 | 6570 | 1105 | 0001 | 0000 | 0116 | 2290 |
| 0000353060 | 0353 | 002A | 0010 | 001F | 0000 | 0704 | 7842 | 655F |
| 0000353100 | 6978 | 0174 | 1602 | BA01 | 5522 | 4003 | 1000 | 3500 |
| 0000353120 | 0000 | 0400 | 4207 | 5F78 | 656D | 756E | 040C | 0006 |
| 0000353140 | 00C0 | 7006 | 6F72 | 706D | 0D74 | FA04 | C0FF | 0700 |
| 0000353160 | 706F | 6974 | 6E6F | 0173 | 1A02 | FA01 | 5922 | 4F03 |
| 0000353200 | 1001 | 4400 | 0001 | 0400 | 420B | 5F78 | 7473 | 5F64 |

THU MAR 14 17:41:20 1991 LBIPMT.DLL PAGE 104, LINE 6078

| | | | | | | | | |
|---|---|---|---|---|---|---|---|---|
| 0000353220 | 656D | 756E | 040C | 0006 | 00C0 | 7006 | 6F72 | 706D |
| 0000353240 | 0D74 | F404 | C0FF | 0700 | 706F | 6974 | 6E6F | 0B73 |
| 0000353260 | F804 | C0FF | 0500 | 6261 | 756F | 0774 | FC04 | 80FF |
| 0000353300 | 0100 | 0B63 | FA05 | 060B | 8100 | D300 | 6E63 | 0174 |
| 0000353320 | 1602 | 4901 | 5D24 | 8103 | 1000 | 7600 | 0000 | 0400 |
| 0000353340 | 4207 | 5F78 | 6568 | 706C | 0201 | 011C | 24CA | 0367 |
| 0000353360 | 01D0 | 0016 | 01C4 | 0000 | 0D04 | 7842 | 445F | 6265 |
| 0000353400 | 6775 | 6E45 | 6574 | 0A72 | 0604 | C000 | 0400 | 6170 |
| 0000353420 | 6B63 | 040A | 000A | 00C0 | 6604 | 6C69 | 0A65 | 0E04 |
| 0000353440 | C000 | 0400 | 7566 | 636E | 040A | 0012 | 0081 | 6C04 |
| 0000353460 | 6E69 | 0B65 | 1404 | 5700 | 0502 | 7473 | 6361 | 0A6B |
| 0000353500 | 1804 | C400 | 0402 | 766C | 706C | 040B | 001C | 00C2 |
| 0000353520 | 6305 | 6F6C | 6B63 | 040A | 0020 | 00C0 | 7404 | 7079 |
| 0000353540 | 0765 | FA04 | C0FF | 0100 | 0B70 | AE05 | 060D | 8100 |
| 0000353560 | 0300 | 7265 | 0D72 | B005 | 060D | 8100 | 0500 | 6966 |
| 0000353600 | 7372 | 0174 | 1D02 | 9A01 | 6D26 | A003 | 1600 | 9400 |
| 0000353620 | 0000 | 0400 | 420E | 5F78 | 6544 | 7562 | 5267 | 7465 |
| 0000353640 | 7275 | 0A6E | 0604 | C000 | 0400 | 6170 | 6B63 | 040A |
| 0000353660 | 000A | 00C0 | 6604 | 6C69 | 0A65 | 0E04 | 8100 | 0400 |
| 0000353700 | 696C | 656E | 040A | 0010 | 00C0 | 6604 | 6E75 | 0A63 |
| 0000353720 | 1404 | C400 | 0402 | 766C | 706C | 040B | 0018 | 0257 |
| 0000353740 | 7305 | 6174 | 6B63 | 040B | 001C | 00C2 | 6305 | 6F6C |
| 0000353760 | 6B63 | 040D | 0020 | 00C0 | 7407 | 7079 | 7365 | 7274 |
| 0000354000 | 040D | 0024 | 0081 | 6207 | 5F78 | 7974 | 6570 | 040A |
| 0000354020 | 0026 | 00C0 | 7604 | 6C61 | 0F70 | 2A04 | C700 | 0902 |
| 0000354040 | 7270 | 6E69 | 6674 | 6E75 | 0163 | 1C02 | 3A01 | 6F27 |
| 0000354060 | 9903 | 1600 | 8D00 | 0000 | 0400 | 420D | 5F78 | 6F56 |
| 0000354100 | 6469 | 6552 | 7574 | 6E72 | 040A | 0006 | 00C0 | 7004 |
| 0000354120 | 6361 | 0A6B | 0A04 | C000 | 0400 | 6966 | 656C | 040A |
| 0000354140 | 000E | 0081 | 6C04 | 6E69 | 0A65 | 1004 | C000 | 0400 |
| 0000354160 | 7566 | 636E | 040A | 0014 | 02C4 | 6C04 | 6C76 | 0B70 |
| 0000354200 | 1804 | 5700 | 0502 | 7473 | 6361 | 0B6B | 1C04 | C200 |
| 0000354220 | 0500 | 6C63 | 636F | 016B | 1B02 | D301 | 7327 | 5F03 |
| 0000354240 | 1000 | 5400 | 0000 | 0400 | 420C | 5F78 | 6544 | 7562 |
| 0000354260 | 5367 | 6E79 | 0A63 | 0604 | C000 | 0400 | 6170 | 6B63 |
| 0000354300 | 040A | 000A | 00C0 | 6604 | 6C69 | 0A65 | 0E04 | 8100 |
| 0000354320 | 0400 | 696C | 656E | 040A | 0010 | 00C0 | 6604 | 6E75 |
| 0000354340 | 0963 | 1404 | C400 | 0302 | 766C | 0B6C | 1804 | 5700 |
| 0000354360 | 0502 | 7473 | 6361 | 0B6B | 1C04 | C200 | 0500 | 6C63 |
| 0000354400 | 636F | 016B | 1B02 | 3201 | 7528 | 7603 | 1601 | 6A00 |
| 0000354420 | 0001 | 0400 | 420C | 5F78 | 6544 | 7562 | 5467 | 6D69 |
| 0000354440 | 0A65 | 0604 | C000 | 0400 | 6170 | 6B63 | 040A | 000A |
| 0000354460 | 00C0 | 6604 | 6C69 | 0A65 | 0ED4 | 8100 | 0400 | 696C |
| 0000354500 | 656E | 040A | 0010 | 00C0 | 6604 | 6E75 | 0A63 | 1404 |
| 0000354520 | C400 | 0402 | 766C | 706C | 040B | 0018 | 0257 | 7305 |
| 0000354540 | 6174 | 6B63 | 040B | 001C | 00C2 | 6305 | 6F6C | 6B63 |
| 0000354560 | 0409 | 0020 | 0081 | 7203 | 7165 | 0409 | 0022 | 00C0 |
| 0000354600 | 6D03 | 6773 | 040A | FFF0 | 0376 | 6304 | 6B6C | 0831 |
| 0000354620 | FC04 | 81FF | 0200 | 746D | 0201 | 011C | 29A8 | 0379 |
| 0000354640 | 00F2 | 0016 | 00E6 | 0000 | 0D04 | 7842 | 445F | 6265 |
| 0000354660 | 6775 | 7250 | 6E69 | 0A74 | 0604 | C100 | 0400 | 7342 |
| 0000354700 | 6769 | 0409 | 000A | 00C0 | 6403 | 7362 | 040A | 000E |
| 0000354720 | 00C0 | 7004 | 6361 | 0A6B | 1204 | C000 | 0400 | 6966 |
| 0000354740 | 656C | 040A | 0016 | 0081 | 6C04 | 6E69 | 0A65 | 1804 |
| 0000354760 | C000 | 0400 | 7566 | 636E | 040A | 001C | 02C4 | 6C04 |
| 0000355000 | 6C76 | 0B70 | 2004 | 5700 | 0502 | 7473 | 6361 | 0B6B |
| 0000355020 | 2404 | C200 | 0500 | 6C63 | 636F | 086B | FA04 | C0FF |
| 0000355040 | 0200 | 7061 | 0201 | 011C | 2A9A | 037D | 0095 | 0016 |
| 0000355060 | 0089 | 0000 | 0D04 | 7842 | 445F | 6265 | 6775 | 7245 |

THU MAR 14 17:41:20 1991 LBIPMT.DLL PAGE 105, LINE 6137

| | | | | | | | | |
|---|---|---|---|---|---|---|---|---|
| 0000355100 | 6F72 | 0A72 | 0604 | C100 | 0400 | 7342 | 6769 | 0409 |
| 0000355120 | 000A | 00C0 | 6403 | 7362 | 040A | 000E | 00C0 | 7004 |
| 0000355140 | 6361 | 0A6B | 1204 | C000 | 0400 | 6966 | 656C | 040A |
| 0000355160 | 0016 | 0081 | 6C04 | 6E69 | 0A65 | 1804 | C000 | 0400 |
| 0000355200 | 7566 | 636E | 040A | 001C | 02C4 | 6C04 | 6C76 | 0B70 |
| 0000355220 | 2004 | 5700 | 0502 | 7473 | 6361 | 0B6B | 2404 | C200 |
| 0000355240 | 0500 | 6C63 | 636F | 086B | FA04 | C0FF | 0200 | 7061 |
| 0000355260 | 0201 | 011F | 2B2F | 037F | 008F | 0010 | 0084 | 0000 |
| 0000355300 | 1004 | 6544 | 7562 | 4567 | 7272 | 726F | 6341 | 6974 |
| 0000355320 | 6E6F | 040A | 0006 | 02C4 | 6C04 | 6C76 | 0970 | 0A04 |
| 0000355340 | C000 | 0300 | 6264 | 0A73 | 0E04 | C000 | 0400 | 6170 |
| 0000355360 | 6B63 | 040A | 0012 | 00C0 | 6604 | 6C69 | 0A65 | 1604 |
| 0000355400 | 8100 | 0400 | 696C | 656E | 040A | 0018 | 00C0 | 6604 |
| 0000355420 | 6E75 | 0863 | 1C04 | C000 | 0200 | 7061 | 040C | FFFA |
| 0000355440 | 00C0 | 6606 | 726F | 616D | 0174 | 1B02 | BE01 | 812B |
| 0000355460 | FB03 | 1600 | EF00 | 0000 | 0400 | 420C | 5F78 | 6544 |
| 0000355500 | 7562 | 5067 | 6972 | 0A66 | 0604 | C100 | 0400 | 7342 |
| 0000355520 | 6769 | 0409 | 000A | 00C0 | 6403 | 7362 | 040A | 000E |
| 0000355540 | 00C0 | 7004 | 6361 | 0A6B | 1204 | C000 | 0400 | 6966 |
| 0000355560 | 656C | 040A | 0016 | 0081 | 6C04 | 6E69 | 0A65 | 1804 |
| 0000355600 | C000 | 0400 | 7566 | 636E | 040A | 001C | 02C4 | 6C04 |
| 0000355620 | 6C76 | 0B70 | 2004 | 5700 | 0502 | 7473 | 6361 | 0B6B |
| 0000355640 | 2404 | C200 | 0500 | 6C63 | 636F | 096B | 2804 | 8100 |
| 0000355660 | 0300 | 7865 | 0870 | FA04 | C0FF | 0200 | 7061 | 0201 |
| 0000355700 | 011B | 2CB9 | 0383 | 016B | 0016 | 015F | 0000 | 0C04 |
| 0000355720 | 7842 | 445F | 6265 | 6775 | 6F43 | 6564 | 040A | 0006 |
| 0000355740 | 00C1 | 4204 | 6973 | 0967 | 0A04 | C000 | 0300 | 6264 |
| 0000355760 | 0A73 | 0E04 | C000 | 0400 | 6170 | 6B63 | 040A | 0012 |
| 0000356000 | 00C0 | 6604 | 6C69 | 0A65 | 1604 | 8100 | 0400 | 696C |
| 0000356020 | 656E | 040A | 0018 | 00C0 | 6604 | 6E75 | 0A63 | 1C04 |
| 0000356040 | C400 | 0402 | 766C | 706C | 040B | 0020 | 0257 | 7305 |
| 0000356060 | 6174 | 6B63 | 040B | 0024 | 00C2 | 6305 | 6F6C | 6B63 |
| 0000356100 | 0408 | FFFC | 0081 | 6D02 | 0174 | 1C02 | 2401 | 862E |
| 0000356120 | 2903 | 1000 | 1E00 | 0000 | 0400 | 420D | 5F78 | 6544 |
| 0000356140 | 7562 | 4267 | 6572 | 6B61 | 040C | 0006 | 00C0 | 7006 |
| 0000356160 | 6F72 | 706D | 0174 | 1A02 | 4D01 | 882E | F003 | 1000 |
| 0000356200 | E500 | 0000 | 0400 | 440B | 6265 | 6775 | 6341 | 6974 |
| 0000356220 | 6E6F | 040A | 0006 | 02C4 | 6C04 | 6C76 | 0970 | 0A04 |
| 0000356240 | C000 | 0300 | 6264 | 0A73 | 0E04 | C000 | 0400 | 6170 |
| 0000356260 | 6B63 | 040A | 0012 | 00C0 | 6604 | 6C69 | 0A65 | 1604 |
| 0000356300 | 8100 | 0400 | 696C | 656E | 040A | 0018 | 00C0 | 6604 |
| 0000356320 | 6E75 | 0B63 | 1C04 | C200 | 0500 | 6C63 | 636F | 086B |
| 0000356340 | 2004 | C000 | 0200 | 7061 | 040C | FFF8 | 00C0 | 6606 |
| 0000356360 | 726F | 616D | 0874 | FC04 | 81FF | 0200 | 746D | 0201 |
| 0000356400 | 0121 | 2F3D | 038A | 004D | 0010 | 0042 | 0000 | 1204 |
| 0000356420 | 6544 | 7562 | 5367 | 6570 | 6963 | 6C61 | 6341 | 6974 |
| 0000356440 | 6E6F | 040A | 0006 | 02C4 | 6C04 | 6C76 | 0970 | 0A04 |
| 0000356460 | C000 | 0300 | 6264 | 0A73 | 0E04 | C000 | 0400 | 6170 |
| 0000356500 | 6B63 | 040A | 0012 | 00C0 | 6604 | 6C69 | 0A65 | 1604 |
| 0000356520 | 8100 | 0400 | 696C | 656E | 040A | 0018 | 00C0 | 6604 |
| 0000356540 | 6E75 | 0B63 | 1C04 | C200 | 0500 | 6C63 | 636F | 106B |
| 0000356560 | FA04 | C0FF | 0A00 | 6967 | 6576 | 6C6E | 7665 | 6C65 |
| 0000356600 | 0201 | 011C | 2F8A | 038C | 0053 | 0010 | 0048 | 0000 |
| 0000356620 | 0D04 | 7842 | 745F | 6D69 | 7365 | 6D61 | 6C70 | 0B65 |
| 0000356640 | 0604 | C200 | 0500 | 6C63 | 636F | 096B | F204 | 76FF |
| 0000356660 | 0303 | 6C63 | 016B | 1802 | DD01 | 8E2F | 2903 | 1000 |
| 0000356700 | 1E00 | 0000 | 0400 | 4209 | 5F78 | 6573 | 7074 | 6469 |
| 0000356720 | 0201 | 0118 | 3006 | 038F | 0021 | 0010 | 0016 | 0000 |
| 0000356740 | 0904 | 7842 | 675F | 7465 | 6970 | 0164 | 1602 | 2701 |

THU MAR 14 17:41:20 1991 LBIPMT.DLL PAGE 106, LINE 6196

| | | | | | | | | |
|---|---|---|---|---|---|---|---|---|
| 0000356760 | 9030 | 2D03 | 1600 | 2100 | 0000 | 0400 | 4207 | 5F78 |
| 0000357000 | 6E49 | 7469 | 0201 | 0119 | 3054 | 0392 | 0058 | 0016 |
| 0000357020 | 004C | 0000 | 0A04 | 7842 | 705F | 6F72 | 6563 | 7373 |
| 0000357040 | 0408 | 0006 | 00C0 | 7002 | 0173 | 1D02 | AC01 | 9430 |
| 0000357060 | 2503 | 1000 | 1A00 | 0000 | 0400 | 420E | 5F78 | 7270 |
| 0000357100 | 636F | 7365 | 6E73 | 6D61 | 0165 | 1902 | D101 | 9630 |
| 0000357120 | 9003 | 1000 | 8500 | 0000 | 0400 | 420A | 5F78 | 7270 |
| 0000357140 | 666F | 6C69 | 0A65 | 0604 | C000 | 0400 | 6564 | 6373 |
| 0000357160 | 040A | 000A | 00C0 | 7004 | 6361 | 0A6B | 0E04 | C000 |
| 0000357200 | 0400 | 6966 | 656C | 040A | 0012 | 00C0 | 6604 | 6E75 |
| 0000357220 | 0963 | EC04 | 76FF | 0303 | 6C63 | 096B | F804 | C1FF |
| 0000357240 | 0302 | 7564 | 016D | 1802 | 6101 | 9A31 | 2F03 | 1600 |
| 0000357260 | 2360 | 0000 | 0400 | 4209 | 5F78 | 7461 | 7865 | 7469 |
| 0000357300 | 040B | 0006 | 02DB | 7405 | 7566 | 636E | 0201 | 0D05 |
| 0000357320 | 0000 | 001A | 0511 | 0B06 | 0006 | 00C0 | 4209 | 5F78 |
| 0000357340 | 7562 | 6D67 | 6773 | 0511 | 0B12 | 0006 | 00C0 | 4209 |
| 0000357360 | 5F78 | 7265 | 6D72 | 6773 | 050F | 0B16 | 0006 | 00C0 |
| 0000357400 | 4207 | 5F78 | 6F64 | 7374 | 0510 | 0672 | 0005 | 034A |
| 0000357420 | 4208 | 5F78 | 6673 | 6E75 | 1263 | 9205 | 0601 | E700 |
| 0000357440 | 0A02 | 7862 | 6F5F | 7470 | 6F69 | 736E | 050E | 0AFC |
| 0000357460 | 0006 | 0204 | 7306 | 6363 | 6973 | 1464 | 0A05 | 060B |
| 0000357500 | C000 | 0C00 | 7842 | 615F | 7373 | 7265 | 6D74 | 6773 |
| 0000357520 | 0514 | 0B0E | 0006 | 00C0 | 420C | 5F78 | 7361 | 7573 |
| 0000357540 | 656D | 736D | 1467 | 1A05 | 060B | C000 | 0C00 | 7842 |
| 0000357560 | 745F | 7473 | 7261 | 6D74 | 6773 | 0514 | 0182 | 0006 |
| 0000357600 | 0081 | 420C | 5F78 | 6544 | 7562 | 4D67 | 646F | 1465 |
| 0000357620 | 8405 | 0601 | 8100 | 0C00 | 7842 | 545F | 6D69 | 7365 |
| 0000357640 | 6F4D | 6564 | 0510 | 0B04 | 0006 | 0081 | 4208 | 5F78 |
| 0000357660 | 5F42 | 6973 | 1367 | 8E05 | 069B | 5100 | 0803 | 7862 |
| 0000357700 | 705F | 6F72 | 6E63 | 6D61 | 1465 | 1E05 | 060B | C000 |
| 0000357720 | 0C00 | 7862 | 705F | 6F72 | 6E63 | 6D61 | 7065 | 0514 |
| 0000357740 | 0B22 | 0006 | 025D | 420C | 5F78 | 6574 | 6D72 | 665F |
| 0000357760 | 6E75 | 0E63 | 2205 | 060F | 8100 | 0600 | 7842 | 705F |
| 0000360000 | 6469 | 1105 | 0001 | 0000 | 011F | 3190 | 02FC | 033C |
| 0000360020 | 0016 | 0330 | 0000 | 1004 | 7842 | 445F | 6265 | 6775 |
| 0000360040 | 6156 | 6972 | 6261 | 656C | 0408 | 0006 | 0081 | 6902 |
| 0000360060 | 0A64 | 0804 | C000 | 0400 | 6170 | 6B63 | 040A | 000C |
| 0000360100 | 00C0 | 6604 | 6C69 | 0A65 | 1004 | 8100 | 0400 | 696C |
| 0000360120 | 656E | 040A | 0012 | 00C0 | 6604 | 6E75 | 0A63 | 1604 |
| 0000360140 | 7300 | 0402 | 766C | 706C | 040B | 001A | 0272 | 7305 |
| 0000360160 | 6174 | 6B63 | 040B | 001E | 00C2 | 6305 | 6F6C | 6B63 |
| 0000360200 | 0409 | 0022 | 00C0 | 7603 | 7261 | 040A | FFEC | 0080 |
| 0000360220 | 6304 | 6176 | 0B6C | DC04 | 84FF | 0500 | 6375 | 6176 |
| 0000360240 | 0C6C | CE04 | 81FF | 0600 | 6E69 | 7674 | 6C61 | 040D |
| 0000360260 | FFF2 | 0082 | 6C07 | 6E6F | 7667 | 6C61 | 040F | FFD0 |
| 0000360300 | 0089 | 6409 | 756F | 6C62 | 7665 | 6C61 | 040E | FFDE |
| 0000360320 | 0089 | 6608 | 6F6C | 7461 | 6176 | 0C6C | D804 | C0FF |
| 0000360340 | 0600 | 7473 | 7672 | 6C61 | 0410 | FFEE | 00C0 | 700A |
| 0000360360 | 696F | 746E | 7265 | 6176 | 086C | F804 | 81FF | 0200 |
| 0000360400 | 746D | 040E | FFF6 | 0081 | 7308 | 6F68 | 7472 | 6176 |
| 0000360420 | 0F6C | E604 | 85FF | 0900 | 7375 | 6F68 | 7472 | 6176 |
| 0000360440 | 0E6C | E804 | 86FF | 0800 | 6C75 | 6E6F | 7667 | 6C61 |
| 0000360460 | 040D | FFCC | 0081 | 6207 | 6F6F | 766C | 6C61 | 0408 |
| 0000360500 | FFFA | 00C0 | 6102 | 0170 | 1B02 | CC01 | 0034 | 6303 |
| 0000360520 | 1000 | 5800 | 0000 | 0400 | 420C | 5F78 | 6544 | 7562 |
| 0000360540 | 4367 | 6168 | 0972 | 0604 | C000 | 0300 | 6176 | 0972 |
| 0000360560 | 0A04 | 8000 | 0300 | 6176 | 116C | 2C05 | 061A | 0C00 |
| 0000360600 | 0903 | 6843 | 7261 | 6154 | 6C62 | 0165 | 1A02 | 2F01 |
| 0000360620 | 1035 | 9E03 | 1000 | 9300 | 0000 | 0400 | 420B | 5F78 |

THU MAR 14 17:41:20 1991 LBIPMT.DLL PAGE 107, LINE 6255

| | | | | | | | | |
|---|---|---|---|---|---|---|---|---|
| 0000360640 | 6544 | 7562 | 4967 | 746E | 0409 | 0006 | 00C0 | 7603 |
| 0000360660 | 7261 | 0409 | 000A | 0081 | 7603 | 6C61 | 0201 | 011C |
| 0000360700 | 35CD | 0314 | 0068 | 0010 | 005D | 0000 | 0D04 | 7842 |
| 0000360720 | 445F | 6265 | 6775 | 6853 | 726F | 0974 | 0604 | C000 |
| 0000360740 | 0300 | 6176 | 0972 | 0A04 | 8100 | 0300 | 6176 | 016C |
| 0000360760 | 1D02 | 3501 | 1636 | 6803 | 1000 | 5D00 | 0000 | 0400 |
| 0000361000 | 420E | 5F78 | 6544 | 7562 | 5567 | 6873 | 726F | 0974 |
| 0000361020 | 0604 | C000 | 0300 | 6176 | 0972 | 0A04 | 8500 | 0300 |
| 0000361040 | 6176 | 016C | 1B02 | 9D01 | 1836 | 8303 | 1000 | 7800 |
| 0000361060 | 0000 | 0400 | 420C | 5F78 | 6544 | 7562 | 4C67 | 6E6F |
| 0000361100 | 0967 | 0604 | C000 | 0300 | 6176 | 0972 | 0A04 | 8200 |
| 0000361120 | 0300 | 6176 | 016C | 1C02 | 2001 | 1A37 | 6803 | 1000 |
| 0000361140 | 5D00 | 0000 | 0400 | 420D | 5F78 | 6544 | 7562 | 5567 |
| 0000361160 | 6F6C | 676E | 0409 | 0006 | 00C0 | 7603 | 7261 | 0409 |
| 0000361200 | 000A | 0086 | 7603 | 6C61 | 0201 | 011E | 3788 | 031C |
| 0000361220 | 0068 | 0010 | 005D | 0000 | 0F04 | 7842 | 445F | 6265 |
| 0000361240 | 6775 | 6F50 | 6E69 | 6574 | 0972 | 0604 | C000 | 0300 |
| 0000361260 | 6176 | 0972 | 0A04 | C000 | 0300 | 6176 | 016C | 1D02 |
| 0000361300 | F001 | 1E37 | 7A03 | 1000 | 6F00 | 0000 | 0400 | 420E |
| 0000361320 | 5F78 | 6544 | 7562 | 4467 | 756F | 6C62 | 0965 | 0604 |
| 0000361340 | C000 | 0300 | 6176 | 0972 | 0A04 | 8900 | 0300 | 6176 |
| 0000361360 | 016C | 1B02 | 6A01 | 2138 | 7603 | 1000 | 6B00 | 0000 |
| 0000361400 | 0400 | 420C | 5F78 | 6544 | 7562 | 4267 | 6F6F | 096C |
| 0000361420 | 0604 | C000 | 0300 | 6176 | 0972 | 0A04 | 8100 | 0300 |
| 0000361440 | 6176 | 016C | 1C02 | E001 | 2338 | 7A03 | 1000 | 6F00 |
| 0000361460 | 0000 | 0400 | 420D | 5F78 | 6544 | 7562 | 4667 | 6F6C |
| 0000361500 | 7461 | 0409 | 0006 | 00C0 | 7603 | 7261 | 0409 | 000A |
| 0000361520 | 0089 | 7603 | 6C61 | 0201 | 011A | 395A | 0326 | 00A4 |
| 0000361540 | 0010 | 0099 | 0000 | 0B04 | 7842 | 445F | 6265 | 6775 |
| 0000361560 | 7453 | 0972 | 0604 | C000 | 0300 | 6176 | 0972 | 0A04 |
| 0000361600 | C000 | 0300 | 6176 | 016C | 0502 | 000D | 1A00 | 1000 |
| 0000361620 | 7205 | 0506 | FA00 | 0802 | 7842 | 735F | 7566 | 636E |
| 0000361640 | 0512 | 0192 | 0006 | 0297 | 620A | 5F78 | 706F | 6974 |
| 0000361660 | 6E6F | 0E73 | 5205 | 060F | 0400 | 0602 | 6373 | 7363 |
| 0000361700 | 6469 | 1105 | 0001 | 0000 | 011E | 39FE | 02FC | 007E |
| 0000361720 | 0010 | 0073 | 0000 | 0F04 | 7842 | 695F | 5F73 | 6170 |
| 0000361740 | 6B63 | 6E5F | 6D61 | 0765 | 0604 | C000 | 0100 | 0770 |
| 0000361760 | FA04 | C0FF | 0100 | 0173 | 1C02 | 7C01 | FF3A | 7102 |
| 0000362000 | 1000 | 6600 | 0000 | 0400 | 420D | 5F78 | 6E69 | 7469 |
| 0000362020 | 705F | 6361 | 736B | 0407 | FFFC | 0081 | 6901 | 0201 |
| 0000362040 | 011A | 3AED | 0301 | 006C | 0010 | 0061 | 0000 | 0B04 |
| 0000362060 | 7842 | 615F | 6464 | 705F | 6361 | 076B | 0604 | C000 |
| 0000362100 | 0100 | 0170 | 2002 | 5901 | 033B | 8003 | 1000 | 7500 |
| 0000362120 | 0000 | 0400 | 4211 | 5F78 | 7369 | 615F | 7463 | 7669 |
| 0000362140 | 5F65 | 6170 | 6B63 | 0407 | 0006 | 00C0 | 7001 | 0407 |
| 0000362160 | FFFC | 0081 | 6901 | 0201 | 0D05 | 0000 | 001A | 0514 |
| 0000362200 | 1EE2 | 0006 | 0081 | 420C | 5F78 | 756E | 5F6D | 6170 |
| 0000362220 | 6B63 | 1073 | 8E05 | 069D | FA00 | 0802 | 7862 | 705F |
| 0000362240 | 6361 | 736B | 050E | 1EDA | 0006 | 0204 | 7306 | 6363 |
| 0000362260 | 6973 | 0564 | 0111 | 0000 | 1800 | DA01 | 003B | 3903 |
| 0000362300 | 1000 | 2E00 | 0000 | 0400 | 4209 | 5F78 | 7270 | 6E69 |
| 0000362320 | 7469 | 0201 | 0117 | 3C13 | 0301 | 0026 | 0010 | 001B |
| 0000362340 | 0000 | 0804 | 7842 | 635F | 706F | 6E65 | 0201 | 0117 |
| 0000362360 | 3C39 | 0303 | 007F | 0010 | 0074 | 0000 | 0804 | 7842 |
| 0000362400 | 6C5F | 706F | 6E65 | 040A | 0006 | 00C0 | 6604 | 6C69 |
| 0000362420 | 0A65 | 0A04 | C000 | 0400 | 6F6D | 6564 | 0201 | 0118 |
| 0000362440 | 3CB8 | 0306 | 007F | 0010 | 0074 | 0000 | 0904 | 7842 |
| 0000362460 | 705F | 6F6C | 6570 | 0A6E | 0604 | C000 | 0400 | 6966 |
| 0000362500 | 656C | 040A | 000A | 00C0 | 6D04 | 646F | 0165 | 1902 |

THU MAR 14 17:41:20 1991 LBIPMT.DLL PAGE 108, LINE 6314

| | | | | | | | | |
|---|---|---|---|---|---|---|---|---|
| 0000362520 | 3701 | 073D | 3503 | 1000 | 2A00 | 0000 | 0400 | 420A |
| 0000362540 | 5F78 | 7270 | 6C63 | 736F | 0165 | 1802 | 6C01 | 083D |
| 0000362560 | 7303 | 1000 | 6800 | 0000 | 0400 | 4209 | 5F78 | 636C |
| 0000362600 | 6F6C | 6573 | 0201 | 0119 | 3DDF | 0309 | 0073 | 0010 |
| 0000362620 | 0068 | 0000 | 0A04 | 7842 | 705F | 636C | 6F6C | 6573 |
| 0000362640 | 0201 | 0118 | 3E52 | 030A | 0021 | 0010 | 0016 | 0000 |
| 0000362660 | 0904 | 7842 | 635F | 6C63 | 736F | 0165 | 1702 | 7301 |
| 0000362700 | 0B3E | 5903 | 1000 | 4E00 | 0000 | 0400 | 4208 | 5F78 |
| 0000362720 | 6C66 | 7375 | 0168 | 1A02 | CC01 | 0D3E | 5A03 | 1000 |
| 0000362740 | 4F00 | 0000 | 0400 | 760B | 7842 | 665F | 7270 | 6E69 |
| 0000362760 | 6674 | 0408 | 0006 | 0209 | 6602 | 0970 | 0A04 | C000 |
| 0000363000 | 0300 | 6D66 | 0874 | 0E04 | C000 | 0200 | 7061 | 0201 |
| 0000363020 | 0119 | 3F26 | 030F | 004E | 0010 | 0043 | 0000 | 0A04 |
| 0000363040 | 7842 | 6C5F | 7270 | 6E69 | 6674 | 0409 | 0006 | 00C0 |
| 0000363060 | 6603 | 746D | 0408 | FFFA | 00C0 | 6102 | 0170 | 1A02 |
| 0000363100 | 7401 | 113F | 4E03 | 1000 | 4300 | 0000 | 0400 | 420B |
| 0000363120 | 5F78 | 6C70 | 7270 | 6E69 | 6674 | 0409 | 0006 | 00C0 |
| 0000363140 | 6603 | 746D | 0408 | FFFA | 00C0 | 6102 | 0170 | 1902 |
| 0000363160 | C201 | 133F | 4603 | 1000 | 3B00 | 0000 | 0400 | 420A |
| 0000363200 | 5F78 | 7063 | 6972 | 746E | 0966 | 0604 | C000 | 0300 |
| 0000363220 | 6D66 | 0874 | FA04 | C0FF | 0200 | 7061 | 0201 | 0119 |
| 0000363240 | 4008 | 0315 | 006D | 0010 | 0062 | 0000 | 0A04 | 4276 |
| 0000363260 | 5F78 | 7270 | 6E69 | 6674 | 0409 | 0006 | 00C0 | 6603 |
| 0000363300 | 746D | 0408 | 000A | 00C0 | 6102 | 0170 | 1802 | 7501 |
| 0000363320 | 1740 | 4703 | 1600 | 3B00 | 0000 | 0400 | 4209 | 5F78 |
| 0000363340 | 7270 | 6E69 | 6674 | 0409 | 0006 | 00C0 | 6603 | 746D |
| 0000363360 | 0408 | FFFA | 00C0 | 6102 | 0170 | 1602 | BC01 | 1840 |
| 0000363400 | 4303 | 1000 | 3800 | 0000 | 0400 | 4207 | 5F78 | 696C |
| 0000363420 | 646E | 0201 | 0117 | 40FF | 031B | 0043 | 0010 | 0038 |
| 0000363440 | 0000 | 0804 | 7842 | 705F | 696C | 646E | 0201 | 0116 |
| 0000363460 | 4142 | 031C | 0043 | 0010 | 0038 | 0000 | 0704 | 7842 |
| 0000363500 | 635F | 6E69 | 0164 | 1502 | 8501 | 1E41 | 4403 | 1600 |
| 0000363520 | 3800 | 0000 | 0400 | 4206 | 5F78 | 6E69 | 0164 | 1C02 |
| 0000363540 | C901 | 2041 | 4B03 | 1000 | 4000 | 0000 | 0400 | 420D |
| 0000363560 | 5F78 | 6963 | 646E | 7270 | 6E69 | 6674 | 0409 | 0006 |
| 0000363600 | 00C0 | 6603 | 746D | 0408 | FFFA | 00C0 | 6102 | 0170 |
| 0000363620 | 1C02 | 1401 | 2242 | 5303 | 1000 | 4800 | 0000 | 0400 |
| 0000363640 | 420D | 5F78 | 696C | 646E | 7270 | 6E69 | 6674 | 0409 |
| 0000363660 | 0006 | 00C0 | 6603 | 746D | 0408 | FFFA | 00C0 | 6102 |
| 0000363700 | 0170 | 1D02 | 6701 | 2442 | 5303 | 1000 | 4800 | 0000 |
| 0000363720 | 0400 | 420E | 5F78 | 6C70 | 6E69 | 7064 | 6972 | 746E |
| 0000363740 | 0966 | 0604 | C000 | 0300 | 6D66 | 0874 | FA04 | C0FF |
| 0000363760 | 0200 | 7061 | 0201 | 011C | 42BA | 0326 | 0072 | 0010 |
| 0000364000 | 0067 | 0000 | 0D04 | 4276 | 5F78 | 6E69 | 7064 | 6972 |
| 0000364020 | 746E | 0966 | 0604 | C000 | 0300 | 6D66 | 0874 | 0A04 |
| 0000364040 | C000 | 0200 | 7061 | 0201 | 011B | 432C | 0328 | 0047 |
| 0000364060 | 0016 | 003B | 0000 | 0C04 | 7842 | 695F | 646E | 7270 |
| 0000364100 | 6E69 | 6674 | 0409 | 0006 | 00C0 | 6603 | 746D | 0408 |
| 0000364120 | FFFA | 00C0 | 6102 | 0170 | 2202 | 7301 | 2B43 | 4603 |
| 0000364140 | 1003 | 3B00 | 0003 | 0400 | 4213 | 5F78 | 6544 | 7562 |
| 0000364160 | 4267 | 6975 | 646C | 7250 | 6665 | 7869 | 040D | 0006 |
| 0000364200 | 00C0 | 7007 | 6572 | 7366 | 7274 | 040A | 000A | 00C0 |
| 0000364220 | 7004 | 6361 | 0A6B | 0E04 | C000 | 0400 | 6966 | 656C |
| 0000364240 | 040A | 0012 | 0081 | 6C04 | 6E69 | 0A65 | 1404 | C000 |
| 0000364260 | 0400 | 7566 | 636E | 0409 | 0018 | 00C0 | 6403 | 7362 |
| 0000364300 | 0409 | FF32 | 032C | 6203 | 6675 | 040A | FF96 | 032C |
| 0000364320 | 6C04 | 7562 | 0B66 | FA04 | 81FF | 0500 | 6966 | 7372 |
| 0000364340 | 0D74 | FC04 | 81FF | 0700 | 7073 | 6365 | 6169 | 0B6C |
| 0000364360 | 2005 | 0620 | 8100 | 0300 | 7265 | 0572 | 2900 | 5444 |

THU MAR 14 17:41:20 1991 LBIPMT.DLL PAGE 109, LINE 6373

| | | | | | | | | |
|---|---|---|---|---|---|---|---|---|
| 0000364400 | 0800 | 2E04 | C0FF | 0200 | 7370 | 0201 | 0005 | 448C |
| 0000364420 | 0077 | 0409 | FF2E | 0081 | 7403 | 6469 | 0408 | FF2A |
| 0000364440 | 00C0 | 7002 | 0174 | 0102 | 2302 | B901 | 3846 | 5403 |
| 0000364460 | 1000 | 4900 | 0000 | 0400 | 4214 | 5F78 | 4463 | 6265 |
| 0000364500 | 6775 | 7250 | 6E69 | 5074 | 6572 | 6966 | 0A78 | 0604 |
| 0000364520 | C000 | 0400 | 6170 | 6B63 | 040A | 000A | 00C0 | 6604 |
| 0000364540 | 6C69 | 0A65 | 0E04 | 8100 | 0400 | 696C | 656E | 040A |
| 0000364560 | 0010 | 00C0 | 6604 | 6E75 | 0963 | 1404 | C000 | 0300 |
| 0000364600 | 6264 | 0D73 | 9A04 | 2CFF | 0703 | 7270 | 6665 | 7473 |
| 0000364620 | 0172 | 2302 | 0D01 | 3A47 | 5403 | 1000 | 4900 | 0000 |
| 0000364640 | 0400 | 4214 | 5F78 | 446C | 6265 | 6775 | 7250 | 6E69 |
| 0000364660 | 5074 | 6572 | 6966 | 0A78 | 0604 | C000 | 0400 | 6170 |
| 0000364700 | 6B63 | 040A | 000A | 00C0 | 6604 | 6C69 | 0A65 | 0E04 |
| 0000364720 | 8100 | 0400 | 696C | 656E | 040A | 0010 | 00C0 | 6604 |
| 0000364740 | 6E75 | 0963 | 1404 | C000 | 0300 | 6264 | 0D73 | 9A04 |
| 0000364760 | 2CFF | 0703 | 7270 | 6665 | 7473 | 0172 | 2402 | 6101 |
| 0000365000 | 3C47 | 5403 | 1000 | 4900 | 0000 | 0400 | 4215 | 5F78 |
| 0000365020 | 6C70 | 6544 | 7562 | 5067 | 6972 | 746E | 7250 | 6665 |
| 0000365040 | 7869 | 040A | 0006 | 00C0 | 7004 | 6361 | 0A6B | 0A04 |
| 0000365060 | C000 | 0400 | 6966 | 656C | 040A | 000E | 0081 | 6C04 |
| 0000365100 | 6E69 | 0A65 | 1004 | C000 | 0400 | 7566 | 636E | 0409 |
| 0000365120 | 0014 | 00C0 | 6403 | 7362 | 040D | FF9A | 032C | 7007 |
| 0000365140 | 6572 | 7366 | 7274 | 0201 | 0122 | 47B5 | 033E | 0054 |
| 0000365160 | 0010 | 0049 | 0000 | 1304 | 7842 | 445F | 6265 | 6775 |
| 0000365200 | 7250 | 6E69 | 5074 | 6572 | 6966 | 0A78 | 0604 | C000 |
| 0000365220 | 0400 | 6170 | 6B63 | 040A | 000A | 00C0 | 6604 | 6C69 |
| 0000365240 | 0A65 | 0E04 | 8100 | 0400 | 696C | 656E | 040A | 0010 |
| 0000365260 | 00C0 | 6604 | 6E75 | 0963 | 1404 | C000 | 0300 | 6264 |
| 0000365300 | 0D73 | 9A04 | 2CFF | 0703 | 7270 | 6665 | 7473 | 0172 |
| 0000365320 | 1702 | 0901 | 4048 | 5E03 | 1000 | 5300 | 0000 | 0400 |
| 0000365340 | 4208 | 5F78 | 7265 | 6F72 | 0972 | 0604 | C000 | 0300 |
| 0000365360 | 6D66 | 0874 | FA04 | C0FF | 0200 | 7061 | 0201 | 0D05 |
| 0000365400 | 0000 | 001A | 0511 | 49C8 | 0005 | 02FF | 4209 | 5F78 |
| 0000365420 | 6E69 | 6564 | 746E | 0512 | 0192 | 0006 | 02E9 | 620A |
| 0000365440 | 5F78 | 706F | 6974 | 6E6F | 1473 | E205 | 061E | 8100 |
| 0000365460 | 0C00 | 7842 | 6E5F | 6D75 | 705F | 6361 | 736B | 0511 |
| 0000365500 | 1EEC | 0006 | 0209 | 4209 | 5F78 | 7473 | 6264 | 6775 |
| 0000365520 | 0511 | 1EF0 | 0006 | 0209 | 4209 | 5F78 | 7473 | 6C64 |
| 0000365540 | 676F | 0512 | 1EF4 | 0006 | 0209 | 420A | 5F78 | 7270 |
| 0000365560 | 636F | 6F6C | 0E67 | E405 | 061E | 0400 | 0602 | 6373 |
| 0000365600 | 7363 | 6469 | 050C | 2D1A | 0006 | 0208 | 5F04 | 6F69 |
| 0000365620 | 0562 | 0111 | 0000 | 1700 | 6801 | A248 | 5602 | 1000 |
| 0000365640 | 4B00 | 0000 | 0400 | 4208 | 5F78 | 6C63 | 636F | 0F6B |
| 0000365660 | 0604 | C200 | 0900 | 7572 | 5F73 | 6974 | 656D | 0173 |
| 0000365700 | 1802 | BE01 | A548 | 4A02 | 1000 | 3F00 | 0000 | 0400 |
| 0000365720 | 4209 | 5F78 | 7270 | 6974 | 656D | 0407 | 0006 | 00C2 |
| 0000365740 | 7401 | 0201 | 011D | 4908 | 02A8 | 0063 | 0010 | 0058 |
| 0000365760 | 0000 | 0E04 | 7842 | 705F | 5F72 | 6974 | 656D | 6964 |
| 0000366000 | 6666 | 0408 | 0006 | 00C2 | 7402 | 0831 | 0A04 | C200 |
| 0000366020 | 0200 | 3274 | 0201 | 0D05 | 0000 | 001A | 1105 | 0001 |
| 0000366040 | 0000 | 0115 | 496C | 0327 | 0033 | 0010 | 0028 | 0000 |
| 0000366060 | 0604 | 7862 | 704C | 7472 | 0408 | 0006 | 02FF | 7402 |
| 0000366100 | 0170 | 1602 | 9F01 | 2A49 | 3903 | 1000 | 2E00 | 0000 |
| 0000366120 | 0400 | 6207 | 4C78 | 6F63 | 706D | 0409 | 0006 | 02FF |
| 0000366140 | 7403 | 3170 | 0409 | 000A | 02FF | 7403 | 3270 | 0201 |
| 0000366160 | 0113 | 49D8 | 032D | 0037 | 0010 | 002C | 0000 | 0404 |
| 0000366200 | 624C | 6775 | 0407 | 0006 | 00C0 | 7301 | 0201 | 0116 |
| 0000366220 | 4A0F | 0330 | 0055 | 0010 | 004A | 0000 | 0704 | 7862 |
| 0000366240 | 6F4C | 6570 | 076E | FA04 | F7FF | 0102 | 0170 | 1502 |

THU MAR 14 17:41:20 1991 LBIPMT.DLL PAGE 110, LINE 6432

| | | | | | | | | |
|---|---|---|---|---|---|---|---|---|
| 0000366260 | 6401 | 324A | 7703 | 1000 | 6C00 | 0000 | 0400 | 6206 |
| 0000366300 | 4C78 | 6564 | 076C | 0604 | F700 | 0102 | 076C | 0A04 |
| 0000366320 | F700 | 0102 | 0770 | FA04 | F7FF | 0102 | 0171 | 1502 |
| 0000366340 | DB01 | 354A | 7903 | 1000 | 6E00 | 0000 | 0400 | 6206 |
| 0000366360 | 4C78 | 6E69 | 0773 | 0604 | F700 | 0102 | 076C | 0A04 |
| 0000366400 | F700 | 0102 | 0770 | 0E04 | FF00 | 0102 | 0766 | FA04 |
| 0000366420 | F7FF | 0102 | 0171 | 1702 | 5401 | 374B | 5003 | 1000 |
| 0000366440 | 4500 | 0000 | 0400 | 6208 | 4C78 | 6C63 | 736F | 0765 |
| 0000366460 | 0604 | F700 | 0102 | 016C | 1602 | A401 | 3A4B | 6703 |
| 0000366500 | 1000 | 5C00 | 0000 | 0400 | 6207 | 4C78 | 7266 | 6565 |
| 0000366520 | 0407 | 0006 | 02F7 | 6C01 | 0407 | FFFA | 02F7 | 7001 |
| 0000366540 | 0201 | 011A | 4C0B | 033C | 005B | 0010 | 0050 | 0000 |
| 0000366560 | 0B04 | 7862 | 724C | 7465 | 6972 | 7665 | 0765 | 0604 |
| 0000366600 | F700 | 0102 | 076C | 0A04 | F700 | 0102 | 0770 | 0E04 |
| 0000366620 | FF00 | 0102 | 0166 | 1702 | 6601 | 3E4C | 6203 | 1000 |
| 0000366640 | 5700 | 0000 | 0400 | 6208 | 4C78 | 7473 | 726F | 0765 |
| 0000366660 | 0604 | F700 | 0102 | 076C | 0A04 | F700 | 0102 | 0770 |
| 0000366700 | 0E04 | FF00 | 0102 | 0166 | 1702 | C801 | 414C | 8903 |
| 0000366720 | 1000 | 7E00 | 0000 | 0400 | 6208 | 4C78 | 7270 | 6E69 |
| 0000366740 | 0774 | 0604 | F700 | 0102 | 0C6C | 0A04 | 0600 | 0603 |
| 0000366760 | 7066 | 6972 | 746E | 0407 | FFFA | 02F7 | 7001 | 0407 |
| 0000367000 | FF96 | 02F2 | 7501 | 0201 | 0116 | 4D51 | 0344 | 00DD |
| 0000367020 | 0010 | 00D2 | 0000 | 0704 | 7862 | 634C | 706F | 0779 |
| 0000367040 | 0604 | F700 | 0102 | 096C | 8E04 | F7FF | 0302 | 636C |
| 0000367060 | 0770 | 9204 | F2FF | 0102 | 0774 | FA04 | F7FF | 0102 |
| 0000367100 | 0770 | F604 | F7FF | 0102 | 0171 | 1802 | 2E01 | 464E |
| 0000367120 | D503 | 1000 | CA00 | 0000 | 0400 | 6209 | 4C78 | 6F63 |
| 0000367140 | 636E | 7461 | 0408 | 0006 | 02F7 | 6C02 | 0831 | 0A04 |
| 0000367160 | F700 | 0202 | 326C | 0408 | FFFA | 02F7 | 7002 | 0831 |
| 0000367200 | F604 | F7FF | 0202 | 3270 | 0201 | 0116 | 4F03 | 0348 |
| 0000367220 | 00A8 | 0010 | 009D | 0000 | 0704 | 7862 | 664C | 6E69 |
| 0000367240 | 0764 | 0604 | F700 | 0102 | 086C | 0A04 | FF00 | 0202 |
| 0000367260 | 7074 | 040D | 000E | 030F | 6307 | 6D6F | 6170 | 6572 |
| 0000367300 | 0407 | FFFA | 02F7 | 7001 | 0407 | FF96 | 02F2 | 7401 |
| 0000367320 | 0201 | 0118 | 4FAB | 034A | 0097 | 0010 | 008C | 0000 |
| 0000367340 | 0904 | 7862 | 734C | 6165 | 6372 | 0768 | 0604 | F700 |
| 0000367360 | 0102 | 076C | 0A04 | C000 | 0100 | 0773 | FA04 | F7FF |
| 0000367400 | 0102 | 0170 | 0502 | 000D | 1A00 | 0500 | 0111 | 0000 |
| 0000367420 | 1B00 | 4201 | 6A50 | 9C07 | 1000 | 9100 | 0000 | 0400 |
| 0000367440 | 420C | 5F78 | 736F | 5F32 | 6F63 | 6570 | 086E | FC04 |
| 0000367460 | 85FF | 0200 | 6372 | 050D | 211E | 0006 | 0081 | 6605 |
| 0000367500 | 7269 | 7473 | 0201 | 011C | 50DE | 076F | 0095 | 0010 |
| 0000367520 | 008A | 0000 | 0D04 | 7842 | 6F5F | 3273 | 705F | 6972 |
| 0000367540 | 746E | 0E66 | 0604 | C000 | 0800 | 7A73 | 6F46 | 6D72 |
| 0000367560 | 7461 | 0410 | 000A | 00C0 | 700A | 7241 | 7567 | 656D |
| 0000367600 | 746E | 0E73 | FA04 | 0DFB | 0805 | 6863 | 7542 | 6666 |
| 0000367620 | 7265 | 040D | FFFA | 0081 | 7307 | 654C | 676E | 6874 |
| 0000367640 | 0409 | F7F8 | 050D | 6203 | 6675 | 0408 | FFFC | 0085 |
| 0000367660 | 7202 | 0963 | F604 | 85F7 | 0300 | 656C | 0F6E | F804 |
| 0000367700 | 85FB | 0900 | 7962 | 6574 | 6F63 | 6E75 | 0174 | 2002 |
| 0000367720 | 7301 | 7351 | 7807 | 1000 | 6D00 | 0000 | 0400 | 6E11 |
| 0000367740 | 7765 | 6C5F | 6E69 | 7365 | 745F | 5F6F | 7263 | 666C |
| 0000367760 | 04DC | 0006 | 00C0 | 6F06 | 7475 | 7473 | 0B72 | 0A04 |
| 0000370000 | C000 | 0500 | 6E69 | 7473 | 0B72 | 0E04 | 8100 | 0500 |
| 0000370020 | 6E69 | 656C | 0C6E | FC04 | 81FF | 0600 | 756F | 6C74 |
| 0000370040 | 6E65 | 0201 | 011C | 51EB | 0774 | 0124 | 0010 | 0119 |
| 0000370060 | 0000 | 0D04 | 7842 | 6F5F | 3273 | 6D70 | 6D5F | 6E65 |
| 0000370100 | 0975 | EE04 | 2FFF | 0304 | 716D | 0C69 | E804 | 85FF |
| 0000370120 | 0600 | 6571 | 6978 | 7473 | 0409 | FFEA | 00C0 | 6803 |

THU MAR 14 17:41:20 1991 LBIPMT.DLL PAGE 111, LINE 6491

| | | | | | | | | |
|---|---|---|---|---|---|---|---|---|
| 0000370140 | 6261 | 0409 | FFFA | 00C0 | 6803 | 716D | 0201 | 011D |
| 0000370160 | 530F | 0777 | 018A | 0016 | 017C | 0000 | 0E04 | 7842 |
| 0000370200 | 4D5F | 6E65 | 4475 | 676C | 7250 | 636F | 040A | 0010 |
| 0000370220 | 00C0 | 6804 | 6E77 | 0964 | 0E04 | 8500 | 0300 | 736D |
| 0000370240 | 0967 | 0A04 | C000 | 0300 | 706D | 0931 | 0604 | C000 |
| 0000370260 | 0300 | 706D | 0132 | 1A02 | 9901 | 7A54 | E607 | 1600 |
| 0000370300 | D800 | 0000 | 0400 | 420B | 5F78 | 7865 | 7469 | 7566 |
| 0000370320 | 636E | 040E | 0006 | 0085 | 7408 | 7265 | 636D | 646F |
| 0000370340 | 0965 | CC04 | 46FF | 0307 | 7562 | 0166 | 1802 | 7F01 |
| 0000370360 | 8255 | 9707 | 1000 | 8C00 | 0000 | 0400 | 4209 | 5F78 |
| 0000370400 | 736D | 6267 | 786F | 0407 | 0006 | 00C0 | 7301 | 0409 |
| 0000370420 | FFEE | 042F | 6D03 | 6971 | 040C | FFE8 | 0085 | 7106 |
| 0000370440 | 7865 | 7369 | 0974 | EA04 | C0FF | 0300 | 6168 | 0962 |
| 0000370460 | FA04 | C0FF | 0300 | 6D68 | 0171 | 1802 | 1601 | 8356 |
| 0000370500 | 2B07 | 1000 | 2000 | 0000 | 0400 | 4209 | 5F78 | 736F |
| 0000370520 | 7032 | 6469 | 040B | FFF8 | 024C | 7005 | 6970 | 6964 |
| 0000370540 | 0201 | 0D05 | 0000 | 001A | 0514 | 211A | 0006 | 0081 |
| 0000370560 | 620C | 5F78 | 6970 | 6570 | 7661 | 6961 | 0A6C | 2005 |
| 0000370600 | 069F | 8500 | 0200 | 7068 | 050B | 9F26 | 0006 | 0085 |
| 0000370620 | 6103 | 7463 | 0514 | 9F24 | 0006 | 0081 | 730C | 7661 |
| 0000370640 | 5F65 | 7862 | 6D5F | 646F | 1765 | 2205 | 069F | 8100 |
| 0000370660 | 0F00 | 6173 | 6576 | 655F | 7272 | 726F | 6D5F | 646F |
| 0000370700 | 1765 | 1E05 | 069F | 8100 | 0F00 | 6173 | 6576 | 745F |
| 0000370720 | 6D69 | 7365 | 6D5F | 646F | 0F65 | 1C05 | 0621 | 8500 |
| 0000370740 | 0700 | 6D68 | 646F | 6962 | 1470 | 8205 | 0601 | 8100 |
| 0000370760 | 0C00 | 7842 | 445F | 6265 | 6775 | 6F4D | 6564 | 0514 |
| 0000371000 | 0184 | 0006 | 0081 | 420C | 5F78 | 6954 | 656D | 4D73 |
| 0000371020 | 646F | 1465 | 8605 | 0601 | 8100 | 0C00 | 7842 | 455F |
| 0000371040 | 7272 | 726F | 6F4D | 6564 | 1105 | 0001 | 0000 | 011E |
| 0000371060 | 5642 | 0520 | 0075 | 0010 | 006A | 0000 | 0F04 | 7842 |
| 0000371100 | 695F | 696E | 5F74 | 6874 | 6572 | 6461 | 0773 | FC04 |
| 0000371120 | 81FF | 0100 | 0169 | 1E02 | B701 | 2356 | A005 | 1600 |
| 0000371140 | 9400 | 0000 | 0400 | 420F | 5F78 | 6874 | 6572 | 6461 |
| 0000371160 | 735F | 6174 | 7472 | 0407 | 0006 | 00C0 | 7401 | 0409 |
| 0000371200 | FFFC | 0081 | 7403 | 6469 | 0201 | 011C | 5757 | 0526 |
| 0000371220 | 0088 | 0016 | 007C | 0000 | 0D04 | 7842 | 745F | 7268 |
| 0000371240 | 6165 | 5F64 | 6E65 | 0964 | FC04 | 81FF | 0300 | 6974 |
| 0000371260 | 0164 | 2002 | DF01 | 2757 | 4205 | 1000 | 3700 | 0000 |
| 0000371300 | 0400 | 4211 | 5F78 | 7369 | 6D5F | 7475 | 5F69 | 6874 |
| 0000371320 | 6572 | 6461 | 0409 | FFFC | 0081 | 7403 | 6469 | 0201 |
| 0000371340 | 011D | 5821 | 0528 | 0038 | 0010 | 002D | 0000 | 0E04 |
| 0000371360 | 7842 | 6D5F | 6961 | 5F6E | 6874 | 6572 | 6461 | 0409 |
| 0000371400 | FFFC | 0081 | 7403 | 6469 | 0201 | 0115 | 5859 | 0529 |
| 0000371420 | 003D | 0010 | 0032 | 0000 | 0604 | 7842 | 745F | 6469 |
| 0000371440 | 040B | FFF8 | 0308 | 7005 | 6970 | 6964 | 0201 | 011D |
| 0000371460 | 5896 | 052B | 0058 | 0010 | 004D | 0000 | 0E04 | 7842 |
| 0000371500 | 745F | 7268 | 6165 | 5F64 | 616E | 656D | 0409 | 0006 |
| 0000371520 | 0081 | 7403 | 6469 | 0201 | 011D | 58EE | 052D | 006F |
| 0000371540 | 0010 | 0064 | 0000 | 0E04 | 7842 | 635F | 7275 | 5F72 |
| 0000371560 | 6874 | 6572 | 6461 | 0409 | FFFC | 0081 | 7403 | 6469 |
| 0000371600 | 0201 | 0D05 | 0000 | 001A | 0516 | 21C0 | 0006 | 0081 |
| 0000371620 | 420E | 5F78 | 756E | 5F6D | 6874 | 6572 | 6461 | 1273 |
| 0000371640 | C205 | 0621 | 1000 | 0A05 | 7842 | 745F | 7268 | 6165 |
| 0000371660 | 7364 | 1105 | 0001 | 0000 | 0114 | 595E | 02BE | 00D4 |
| 0000371700 | 0010 | 00C9 | 0000 | 0504 | 7979 | 656C | 0A78 | FC04 |
| 0000371720 | 81FF | 0400 | 736E | 7274 | 0B0C | 597E | 0700 | 7979 |
| 0000371740 | 7566 | 7373 | 0179 | 1502 | 3201 | C05A | 2102 | 1000 |
| 0000371760 | 1600 | 0000 | 0400 | 7906 | 7779 | 6172 | 0170 | 1502 |
| 0000372000 | 5301 | CC5A | BF02 | 1006 | B400 | 0006 | 0400 | 7906 |

THU MAR 14 17:41:20 1991 LBIPMT.DLL PAGE 112, LINE 6550

| | | | | | | | | |
|---|---|---|---|---|---|---|---|---|
| 0000372020 | 6C79 | 6F6F | 096B | F604 | 49FF | 0302 | 7979 | 0E72 |
| 0000372040 | FA04 | C0FF | 0800 | 7979 | 616C | 7473 | 6863 | 040D |
| 0000372060 | FFEC | 024A | 7907 | 7379 | 6174 | 6574 | 0409 | FFE8 |
| 0000372100 | 02CB | 6C03 | 7073 | 0409 | FFE4 | 0249 | 7903 | 7479 |
| 0000372120 | 0409 | FFF2 | 024A | 7903 | 7A79 | 040A | FFF0 | 0081 |
| 0000372140 | 7904 | 6379 | 0D68 | B40B | 005B | 7408 | 7972 | 6761 |
| 0000372160 | 6961 | 0B6E | BE0B | 005E | 6306 | 6E6F | 6974 | 016E |
| 0000372200 | 1502 | 1201 | D061 | 5902 | 1000 | 4E00 | 0000 | 0400 |
| 0000372220 | 7906 | 6279 | 6361 | 076B | 0604 | C100 | 0100 | 0770 |
| 0000372240 | DA04 | 8100 | 0100 | 016D | 1602 | 6B01 | D161 | 9702 |
| 0000372260 | 1000 | 8C00 | 0000 | 0400 | 7907 | 6979 | 706E | 7475 |
| 0000372300 | 0201 | 0117 | 6202 | 02D3 | 002E | 0010 | 0023 | 0000 |
| 0000372320 | 0804 | 7979 | 756F | 7074 | 7475 | 0407 | 0006 | 0081 |
| 0000372340 | 6301 | 0201 | 0116 | 6230 | 02D5 | 0045 | 0010 | 003A |
| 0000372360 | 0000 | 0704 | 7979 | 6E75 | 7570 | 0774 | 0604 | 8100 |
| 0000372400 | 0100 | 0163 | 0502 | 000D | 1A00 | 0E00 | DA05 | 054A |
| 0000372420 | BB00 | 0602 | 7979 | 766C | 6C61 | 050E | 49E8 | 0005 |
| 0000372440 | 0081 | 7906 | 6C79 | 6E65 | 0E67 | FC05 | 0548 | 7900 |
| 0000372460 | 0602 | 7979 | 6574 | 7478 | 050F | 1074 | 0005 | 0081 |
| 0000372500 | 7907 | 6D79 | 726F | 6766 | 050E | 2656 | 0006 | 00C0 |
| 0000372520 | 7906 | 7379 | 7470 | 0E72 | 1205 | 054A | 7900 | 0602 |
| 0000372540 | 7979 | 6273 | 6675 | 050F | 0028 | 0005 | 0081 | 7907 |
| 0000372560 | 7479 | 6863 | 7261 | 050C | 2D1A | 0006 | 0205 | 5F04 |
| 0000372600 | 6F69 | 0C62 | 6005 | 0622 | 0600 | 0402 | 7979 | 6E69 |
| 0000372620 | 050D | 2264 | 0006 | 0206 | 7905 | 6F79 | 7475 | 0510 |
| 0000372640 | 2654 | 0006 | 0081 | 7908 | 6C79 | 6E69 | 6E65 | 106F |
| 0000372660 | 2A05 | 0500 | 4A00 | 0802 | 7979 | 7365 | 6174 | 6574 |
| 0000372700 | 050E | 2518 | 0006 | 02C7 | 7906 | 7379 | 6576 | 0F63 |
| 0000372720 | 6805 | 0622 | C200 | 0702 | 7979 | 7376 | 6F74 | 0E70 |
| 0000372740 | C405 | 0625 | 4A00 | 0602 | 7979 | 6762 | 6E69 | 050F |
| 0000372760 | 2296 | 0006 | 02C6 | 7907 | 6379 | 6172 | 6B6E | 050D |
| 0000373000 | 25C0 | 0006 | 0249 | 7905 | 7479 | 706F | 050F | 25C8 |
| 0000373020 | 0006 | 02C8 | 7907 | 6D79 | 7461 | 6863 | 050F | 264A |
| 0000373040 | 0006 | 02C9 | 7907 | 6579 | 7478 | 6172 | 0510 | 002E |
| 0000373060 | 0005 | 02CA | 7908 | 6C79 | 7473 | 7461 | 0D65 | E405 |
| 0000373100 | 0549 | CB00 | 0502 | 7979 | 736C | 0E70 | A005 | 0508 |
| 0000373120 | CB00 | 0602 | 7979 | 6C6F | 7073 | 050D | 49C4 | 0005 |
| 0000373140 | 00C1 | 7905 | 6679 | 646E | 0512 | 265A | 0006 | 0081 |
| 0000373160 | 790A | 7079 | 6572 | 6976 | 756F | 0573 | 0111 | 0000 |
| 0000373200 | 1E00 | 7601 | 3F62 | 8003 | 1000 | 7500 | 0000 | 0400 |
| 0000373220 | 640F | 6762 | 6C5F | 7369 | 5F74 | 7263 | 6165 | 6574 |
| 0000373240 | 0407 | 0006 | 00C0 | 7301 | 040A | FF96 | 02A2 | 6904 |
| 0000373260 | 666E | 076F | FA04 | A7FF | 0102 | 016C | 1602 | F601 |
| 0000373300 | 4162 | 3C03 | 1000 | 3100 | 0000 | 0400 | 7907 | 6579 |
| 0000373320 | 7272 | 726F | 0407 | 0006 | 00C0 | 7301 | 0201 | 011E |
| 0000373340 | 6332 | 0344 | 04EB | 0010 | 04E0 | 0000 | 0F04 | 7842 |
| 0000373360 | 645F | 5F6F | 6964 | 6572 | 7463 | 7669 | 1165 | 0604 |
| 0000373400 | 8100 | 0B00 | 6F70 | 5F73 | 6176 | 6E72 | 6D61 | 1065 |
| 0000373420 | 0804 | 8100 | 0A00 | 6F70 | 5F73 | 6176 | 7672 | 6C61 |
| 0000373440 | 040D | FFF6 | 00C0 | 7607 | 7261 | 616E | 656D | 040C |
| 0000373460 | FFF2 | 00C0 | 7606 | 7261 | 6176 | 096C | FC04 | 81FF |
| 0000373500 | 0300 | 6176 | 0B6C | FA04 | 81FF | 0500 | 6F6E | 7265 |
| 0000373520 | 0572 | 0C00 | 2666 | 0A00 | 8E04 | A3FF | 0402 | 616F |
| 0000373540 | 656D | 0201 | 0005 | 664F | 0026 | 040A | FF8E | 02A3 |
| 0000373560 | 6E04 | 6D61 | 0165 | 0102 | 1602 | 1D01 | 5A68 | 7C03 |
| 0000373600 | 1007 | 7100 | 0007 | 0400 | 7907 | 7079 | 7261 | 6573 |
| 0000373620 | 0410 | FE66 | 035B | 730A | 6174 | 6574 | 7473 | 6361 |
| 0000373640 | 076B | 6004 | 81FE | 0100 | 076A | 5A04 | 81FE | 0100 |
| 0000373660 | 0B6D | 5C04 | 5CFE | 0503 | 7979 | 7670 | 0E74 | FA04 |

THU MAR 14 17:41:20 1991 LBIPMT.DLL PAGE 113, LINE 6609

| | | | | | | | | |
|---|---|---|---|---|---|---|---|---|
| 0000373700 | 81FF | 0800 | 6D74 | 7370 | 6174 | 6574 | 040E | FFFC |
| 0000373720 | 0081 | 7408 | 706D | 6F74 | 656B | 0A6E | F604 | C1FF |
| 0000373740 | 0400 | 7979 | 7370 | 0407 | FE58 | 0081 | 6E01 | 040A |
| 0000373760 | FE62 | 035C | 7904 | 7079 | 0C76 | 5A0B | 0068 | 6507 |
| 0000374000 | 736E | 6174 | 6B63 | 0B0D | 68A9 | 0800 | 656E | 7377 |
| 0000374020 | 6174 | 6574 | 0B0F | 6959 | 0A00 | 6564 | 6166 | 6C75 |
| 0000374040 | 6174 | 7463 | 0005 | 6A2C | 0112 | 0408 | FE56 | 0081 |
| 0000374060 | 7402 | 0869 | 5404 | 81FE | 0200 | 6A74 | 0201 | 0B0D |
| 0000374100 | 6B60 | 0800 | 7979 | 7265 | 6C72 | 6261 | 0B0C | 6BE1 |
| 0000374120 | 0700 | 7979 | 6261 | 726F | 0574 | EB00 | 126B | 0801 |
| 0000374140 | 5204 | 81FE | 0200 | 6974 | 0408 | FE54 | 0081 | 7402 |
| 0000374160 | 016A | 0102 | 0502 | 000D | 1A00 | 1000 | 9C05 | 0508 |
| 0000374200 | 0660 | 0802 | 7979 | 6674 | 6C69 | 7065 | 0510 | 069A |
| 0000374220 | 0005 | 00C0 | 7908 | 7479 | 6966 | 656C | 0F6E | 4205 |
| 0000374240 | 0628 | 8100 | 0700 | 7979 | 6674 | 616C | 0E67 | E005 |
| 0000374260 | 0549 | 4F00 | 0603 | 7673 | 7064 | 6472 | 050F | 034E |
| 0000374300 | 0005 | 0350 | 7307 | 6476 | 616E | 736D | 050E | 2844 |
| 0000374320 | 0006 | 0353 | 7906 | 6579 | 6378 | 0D61 | 5205 | 0628 |
| 0000374340 | 5400 | 0503 | 7979 | 6361 | 0E74 | 1405 | 062A | 5500 |
| 0000374360 | 0603 | 7979 | 6170 | 7463 | 050D | 2A34 | 0006 | 0356 |
| 0000374400 | 7905 | 7079 | 6F67 | 050C | 2A3E | 0006 | 0357 | 7904 |
| 0000374420 | 7279 | 0C31 | 5205 | 062A | 5700 | 0403 | 7979 | 3272 |
| 0000374440 | 050D | 2A66 | 0006 | 0355 | 7905 | 6379 | 6B68 | 050D |
| 0000374460 | 2A86 | 0006 | 0355 | 7905 | 6479 | 6665 | 050C | 4ADE |
| 0000374500 | 0005 | 00C1 | 7904 | 7879 | 0B69 | 5205 | 0503 | 5800 |
| 0000374520 | 0303 | 7979 | 1076 | 5405 | 0626 | 8100 | 0800 | 7979 |
| 0000374540 | 696C | 656E | 6F6E | 0511 | 2AA6 | 0006 | 0081 | 7009 |
| 0000374560 | 7963 | 6579 | 7272 | 7463 | 050F | 0000 | 0005 | 0334 |
| 0000374600 | 4207 | 5F78 | 6966 | 656C | 0511 | 2AA8 | 0006 | 0081 |
| 0000374620 | 7009 | 7963 | 6579 | 7272 | 6C66 | 050C | 1276 | 0005 |
| 0000374640 | 0335 | 6804 | 6174 | 0E62 | A405 | 0508 | 5900 | 0603 |
| 0000374660 | 6572 | 7364 | 7165 | 0512 | 0192 | 0006 | 0294 | 620A |
| 0000374700 | 5F78 | 706F | 6974 | 6E6F | 0E73 | AA05 | 062A | 8100 |
| 0000374720 | 0600 | 6572 | 6364 | 746E | 0511 | 2AAC | 0006 | 0081 |
| 0000374740 | 7009 | 7963 | 7479 | 6B6F | 6E65 | 050E | 4ADA | 0005 |
| 0000374760 | 033A | 7906 | 6C79 | 6176 | 0D6C | DC05 | 0549 | 3A00 |
| 0000375000 | 0503 | 7979 | 6176 | 0E6C | FC05 | 0548 | 3400 | 0603 |
| 0000375020 | 7979 | 6574 | 7478 | 050C | 2D1A | 0006 | 0205 | 5F04 |
| 0000375040 | 6F69 | 0962 | 7862 | 695F | 696E | 2E74 | 0163 | 9500 |
| 0000375060 | 9100 | 0000 | A500 | 1000 | A700 | 1500 | A800 | 2400 |
| 0000375100 | A900 | 2A00 | B300 | 2F00 | BA00 | 3400 | BB00 | 3E00 |
| 0000375120 | BD00 | 4300 | C500 | 4800 | C600 | 6000 | C700 | 6C00 |
| 0000375140 | C800 | 7800 | CA00 | 7D00 | CB00 | 8D00 | CC00 | 9200 |
| 0000375160 | D600 | 9700 | D700 | B600 | D800 | BF00 | D900 | C200 |
| 0000375200 | DA00 | C800 | DC00 | CE00 | E100 | D400 | E600 | ED00 |
| 0000375220 | E800 | 1B00 | E901 | 2700 | EA01 | 2D00 | EB01 | 3000 |
| 0000375240 | EE01 | 4600 | EF01 | 6400 | F001 | 7000 | F301 | 7C00 |
| 0000375260 | F401 | 8600 | F801 | 8B00 | F901 | 9500 | FA01 | A100 |
| 0000375300 | FE01 | A700 | FF01 | AD00 | 0201 | B201 | 1001 | BD01 |
| 0000375320 | 1201 | CD01 | 1401 | D801 | 1501 | DD01 | 1801 | E201 |
| 0000375340 | 1A01 | E701 | 1C01 | EC01 | 1E01 | F801 | 1F01 | 0301 |
| 0000375360 | 2002 | 1C01 | 2102 | 1F01 | 2302 | 3E01 | 2502 | 6001 |
| 0000375400 | 2602 | 6601 | 3202 | 7101 | 3802 | 8101 | 3902 | A701 |
| 0000375420 | 3A02 | B301 | 3B02 | D201 | 3D02 | D801 | 3E02 | EC01 |
| 0000375440 | 4102 | F701 | 4202 | 0901 | 4303 | 1701 | 4403 | 2501 |
| 0000375460 | 4503 | 2B01 | 4903 | 3601 | 4B03 | 4601 | 4C03 | 5101 |
| 0000375500 | 4D03 | 5401 | 4E03 | 6701 | 4F03 | 6C01 | 5E03 | 7701 |
| 0000375520 | 6303 | 8701 | 6803 | 9501 | 6903 | A101 | 6B03 | B101 |
| 0000375540 | 6C03 | D401 | 6D03 | E401 | 6F03 | E701 | 7003 | F901 |

THU MAR 14 17:41:20 1991 LBIPMT.DLL PAGE 114, LINE 6668

| | | | | | | | | |
|---|---|---|---|---|---|---|---|---|
| 0000375560 | 7203 | 0401 | 7304 | 2A01 | 7404 | 2E01 | 7504 | 7001 |
| 0000375600 | 7604 | 7301 | 7704 | 9001 | 7804 | AC01 | 7904 | AF01 |
| 0000375620 | 7A04 | B601 | 7B04 | C901 | 7C04 | E001 | 7D04 | 0001 |
| 0000375640 | 7E05 | 0301 | 7F05 | 1301 | 8005 | 3601 | 8105 | 4601 |
| 0000375660 | 8305 | 4901 | 8405 | 5901 | 8505 | 6901 | 8605 | 7901 |
| 0000375700 | 9005 | 8401 | 9605 | 9401 | 9705 | 9E01 | 9D05 | A101 |
| 0000375720 | 9E05 | AB01 | A005 | B301 | A105 | CC01 | A905 | DF01 |
| 0000375740 | AB05 | EB01 | AC05 | 0401 | AD06 | 0701 | AF06 | 2701 |
| 0000375760 | B006 | 4001 | B106 | 5001 | B206 | 6301 | C706 | 6E01 |
| 0000376000 | C806 | 7E01 | CA06 | B601 | CC06 | 9201 | CD06 | 9E01 |
| 0000376020 | CE06 | B201 | CF06 | C601 | D106 | DA01 | D306 | EE01 |
| 0000376040 | D406 | FA01 | D506 | 0C01 | D607 | 2001 | D707 | 3301 |
| 0000376060 | D807 | 4601 | DA07 | 5901 | DB07 | 6501 | DC07 | 7801 |
| 0000376100 | DD07 | 8C01 | DE07 | A001 | DF07 | B301 | E007 | C601 |
| 0000376120 | E107 | D901 | E307 | EC01 | E607 | 0001 | E708 | 0C01 |
| 0000376140 | E808 | 1F01 | EA08 | 3601 | EB08 | 4901 | ED08 | 5D01 |
| 0000376160 | EF08 | 6901 | F208 | 7C01 | F508 | 8F01 | F808 | A301 |
| 0000376200 | F908 | AF01 | 0908 | 7862 | 685F | 7361 | 2E68 | 0163 |
| 0000376220 | AD00 | 2A00 | BA00 | 2D08 | CA00 | 2F08 | D000 | 3008 |
| 0000376240 | E400 | 3208 | F700 | 3308 | 0C00 | 3409 | 2E00 | 3509 |
| 0000376260 | 4F00 | 3809 | 6E00 | 3909 | 8800 | 3A09 | A600 | 3B09 |
| 0000376300 | B200 | 3C09 | DA00 | 3E09 | F900 | 3F09 | 1300 | 400A |
| 0000376320 | 2900 | 420A | 3F00 | 430A | 4200 | 510A | 4D00 | 550A |
| 0000376340 | 5D00 | 560A | 6800 | 5A0A | 6E00 | 5B0A | 8800 | 5D0A |
| 0000376360 | 8E00 | 5E0A | 9F00 | 5F0A | C100 | 600A | C700 | 610A |
| 0000376400 | CD00 | 6D0A | D800 | 700A | E800 | 720A | F900 | 730A |
| 0000376420 | 1B00 | 750B | 2100 | 760B | 2C00 | 780B | 3200 | 790B |
| 0000376440 | 7B00 | 7A0B | 8700 | 7C0B | 8D00 | 7D0B | A700 | 7F0B |
| 0000376460 | C200 | 800B | C600 | 810B | CC00 | 950B | D700 | 9B0B |
| 0000376500 | E700 | 9C0B | 0100 | 9F0C | 1800 | A00C | 3600 | A20C |
| 0000376520 | 5700 | A30C | 7A00 | A50C | A400 | A60C | C300 | A80C |
| 0000376540 | D900 | A90C | 0500 | AB0D | 1300 | AC0D | 1900 | B30D |
| 0000376560 | 2400 | B60D | 3400 | B70D | 4900 | B90D | 8500 | BA0D |
| 0000376600 | D600 | BC0D | 0100 | D00E | 0F00 | D30E | 1F00 | D50E |
| 0000376620 | 2B00 | D60E | 3A00 | DC0E | 3F00 | DD0E | 4E00 | DE0E |
| 0000376640 | 6800 | DF0E | 7100 | E10E | 7700 | E20E | 9700 | E30E |
| 0000376660 | A000 | E50E | A600 | E80E | AE00 | E90E | BD00 | EA0E |
| 0000376700 | D700 | EB0E | E000 | ED0E | E600 | EE0E | 0800 | EF0F |
| 0000376720 | 1100 | F10F | 1700 | F40F | 1F00 | F50F | 2E00 | F60F |
| 0000376740 | 4800 | F70F | 5100 | F90F | 5700 | FA0F | 7900 | FB0F |
| 0000376760 | 8200 | FD0F | 8800 | 010F | 9001 | 020F | 9F01 | 030F |
| 0000377000 | AA01 | 040F | B301 | 090F | B901 | 0A0F | C201 | 0B0F |
| 0000377020 | D601 | 0C0F | DF01 | 0D0F | F401 | 0E0F | FD01 | 100F |
| 0000377040 | 1201 | 1110 | 1801 | 1A10 | 2301 | 1E10 | 3901 | 1F10 |
| 0000377060 | 4B01 | 2110 | 5101 | 2210 | 6001 | 2710 | 6501 | 2910 |
| 0000377100 | AE01 | 2A10 | B701 | 2C10 | BD01 | 2D10 | C301 | 3610 |
| 0000377120 | CF01 | 3910 | DF01 | 3A10 | E801 | 3E10 | EE01 | 3F10 |
| 0000377140 | 9901 | 4711 | A401 | 4A11 | B401 | 4B11 | BD01 | 4D11 |
| 0000377160 | C301 | 4E11 | DC01 | 5311 | E201 | 5411 | 0101 | 5D12 |
| 0000377200 | 0C01 | 6512 | 1C01 | 6612 | 2901 | 6E12 | 2F01 | 6F12 |
| 0000377220 | 6501 | 7012 | 9B01 | 7112 | D001 | 7212 | 0501 | 7413 |
| 0000377240 | 3D01 | 7713 | 5701 | 7D13 | 6201 | 8113 | 7201 | 8613 |
| 0000377260 | 7A01 | 8713 | 8B01 | 8813 | B201 | 8B13 | B801 | 8C13 |
| 0000377300 | CB01 | 8E13 | DC01 | 8F13 | F201 | 9A13 | F801 | 9B13 |
| 0000377320 | FE01 | A013 | 0901 | A814 | 1901 | A914 | 3301 | AB14 |
| 0000377340 | 3901 | AE14 | 5301 | AF14 | 6901 | B114 | 6F01 | B214 |
| 0000377360 | 8901 | B414 | 8F01 | B514 | 9B01 | B714 | A101 | B814 |
| 0000377400 | AA01 | C414 | B501 | C614 | C501 | C814 | C801 | C914 |
| 0000377420 | D401 | CA14 | DD01 | CB14 | E001 | CC14 | E301 | CD14 |

THU MAR 14 17:41:20 1991 LBIPMT.DLL PAGE 115, LINE 6727

| | | | | | | | | |
|---|---|---|---|---|---|---|---|---|
| 0000377440 | F101 | DA14 | FC01 | DC14 | 0C01 | DF15 | 1D01 | E015 |
| 0000377460 | 6E01 | E115 | 7101 | E215 | 7B01 | E315 | 8001 | E415 |
| 0000377500 | 8301 | E515 | 8901 | 0A15 | 7862 | 735F | 6174 | 6B63 |
| 0000377520 | 632E | 0001 | 0087 | 003D | 1594 | 0040 | 15A4 | 0041 |
| 0000377540 | 15B8 | 0042 | 15CE | 0043 | 15D9 | 0045 | 15DC | 0046 |
| 0000377560 | 15E2 | 0053 | 15ED | 0057 | 15FD | 0058 | 1611 | 0059 |
| 0000377600 | 162D | 005B | 1640 | 005C | 1674 | 005D | 1677 | 005E |
| 0000377620 | 167A | 0064 | 1685 | 006B | 1695 | 006C | 169D | 006F |
| 0000377640 | 16A2 | 0070 | 16B1 | 0071 | 16BA | 0079 | 16C3 | 007A |
| 0000377660 | 16EA | 007B | 170B | 007C | 1717 | 007D | 172D | 007F |
| 0000377700 | 1732 | 0080 | 173B | 0082 | 1746 | 0083 | 175D | 0084 |
| 0000377720 | 1775 | 0085 | 178D | 0086 | 17A5 | 0087 | 17B6 | 0088 |
| 0000377740 | 17D2 | 0089 | 17E3 | 008A | 17F4 | 0094 | 17FF | 0098 |
| 0000377760 | 180F | 009A | 1817 | 009B | 1823 | 009C | 182F | 009D |
| 0000400000 | 183B | 009E | 1847 | 00A0 | 1853 | 00A1 | 186F | 00A3 |
| 0000400020 | 1882 | 00A4 | 18B9 | 00A6 | 18CA | 00A7 | 1903 | 00A8 |
| 0000400040 | 1906 | 00B1 | 1911 | 00B5 | 1921 | 00B8 | 1929 | 00B9 |
| 0000400060 | 1938 | 00BA | 1941 | 00BE | 1947 | 00C0 | 1997 | 00C1 |
| 0000400100 | 19E3 | 00C4 | 19E6 | 00C6 | 1A21 | 00C8 | 1A37 | 00C9 |
| 0000400120 | 1A87 | 00CD | 1A93 | 00CE | 1AA7 | 00CF | 1AAA | 00D0 |
| 0000400140 | 1AC4 | 00D1 | 1ACA | 00DD | 1AD5 | 00E8 | 1AE5 | 00EA |
| 0000400160 | 1AEA | 00EC | 1AF2 | 00ED | 1B01 | 00F1 | 1B07 | 00F2 |
| 0000400200 | 1B23 | 00FD | 1B36 | 00FF | 1B6D | 0101 | 1B99 | 0103 |
| 0000400220 | 1BAF | 0104 | 1BFF | 0106 | 1C0B | 0108 | 1C1F | 010E |
| 0000400240 | 1C22 | 010F | 1C27 | 0110 | 1C34 | 0112 | 1C4A | 0115 |
| 0000400260 | 1C76 | 0118 | 1CBB | 011B | 1CC6 | 0122 | 1CD7 | 0123 |
| 0000400300 | 1CE2 | 0124 | 1CFC | 0129 | 1D0E | 012A | 1D2D | 012B |
| 0000400320 | 1D3B | 012D | 1D4A | 012E | 1D5E | 0131 | 1D61 | 0132 |
| 0000400340 | 1D64 | 0137 | 1D6D | 0138 | 1D73 | 0145 | 1D7E | 0149 |
| 0000400360 | 1D8E | 014A | 1D97 | 014C | 1D9D | 014E | 1DA3 | 014F |
| 0000400400 | 1DB5 | 0151 | 1DB8 | 0152 | 1DCB | 0154 | 1DCE | 0155 |
| 0000400420 | 1DE4 | 0157 | 1DE7 | 0158 | 1E05 | 015A | 1E08 | 015B |
| 0000400440 | 1E26 | 015D | 1E29 | 015E | 1E3F | 0160 | 1E42 | 0161 |
| 0000400460 | 1E58 | 0163 | 1E5B | 0164 | 1E6D | 0166 | 1E70 | 0167 |
| 0000400500 | 1E82 | 0169 | 1E85 | 016A | 1E9B | 016D | 1E9E | 016E |
| 0000400520 | 1EB1 | 0170 | 1EB4 | 0171 | 1EC6 | 0173 | 1EC9 | 0174 |
| 0000400540 | 1ED5 | 0175 | 1EE4 | 0176 | 1EE7 | 0177 | 1F17 | 0178 |
| 0000400560 | 1F1D | 620A | 5F78 | 7475 | 6C69 | 2E73 | 0163 | 3D00 |
| 0000400600 | 3E00 | 2800 | 401F | 3800 | 431F | 4A00 | 441F | 6500 |
| 0000400620 | 451F | 6A00 | 461F | 7200 | 501F | 7D00 | 521F | 8D00 |
| 0000400640 | 541F | 9F00 | 551F | BA00 | 561F | C200 | 731F | CD00 |
| 0000400660 | 751F | DD00 | 771F | E900 | 781F | F500 | 791F | 1700 |
| 0000400700 | 7A20 | 3400 | 7B20 | 3700 | 7C20 | 3A00 | 7D20 | 4300 |
| 0000400720 | 8620 | 4E00 | 8820 | 5E00 | 8A20 | 6A00 | 8B20 | 7600 |
| 0000400740 | 8C20 | 9800 | 8D20 | B500 | 8E20 | B800 | 8F20 | BB00 |
| 0000400760 | 9020 | C400 | AD20 | CF00 | AF20 | DF00 | B020 | EB00 |
| 0000401000 | B120 | 0300 | B221 | 0900 | B321 | 0C00 | B421 | 0F00 |
| 0000401020 | B521 | 1500 | BF21 | 2000 | C521 | 3000 | C621 | 4800 |
| 0000401040 | C721 | 4E00 | C821 | 5A00 | C921 | 7E00 | CB21 | 8400 |
| 0000401060 | CC21 | A600 | CD21 | AD00 | CE21 | C400 | D421 | CF00 |
| 0000401100 | D821 | DF00 | D921 | 0000 | DB22 | 0900 | DC22 | 2100 |
| 0000401120 | DD22 | 2A00 | 1522 | 3501 | 1922 | 4501 | 1A22 | 5601 |
| 0000401140 | 1B22 | 5C01 | 1C22 | 6201 | 2522 | 6D01 | 2C22 | 7D01 |
| 0000401160 | 2F22 | 8501 | 0A22 | 7862 | 635F | 6C61 | 736C | 632E |
| 0000401200 | 0001 | 00EF | 0088 | 2290 | 0089 | 22A0 | 008A | 22A5 |
| 0000401220 | 008B | 22AF | 0092 | 22BA | 0095 | 22CA | 0096 | 22D2 |
| 0000401240 | 0097 | 22EA | 009B | 22EF | 009F | 22FA | 00A1 | 230A |
| 0000401260 | 00A6 | 2312 | 00A8 | 2317 | 00A9 | 231B | 00AC | 2334 |
| 0000401300 | 00AD | 2352 | 00B0 | 235B | 00B1 | 2360 | 00B4 | 2363 |

THU MAR 14 17:41:20 1991 LBIPMT.DLL PAGE 116, LINE 6786

| | | | | | | | | |
|---|---|---|---|---|---|---|---|---|
| 0000401320 | 00B5 | 236F | 00B9 | 2372 | 00BA | 2377 | 00BE | 237A |
| 0000401340 | 00BF | 237F | 00C3 | 2382 | 00C4 | 238E | 00C7 | 2391 |
| 0000401360 | 00C8 | 239D | 00C9 | 23B5 | 00CA | 23C1 | 00CC | 23C5 |
| 0000401400 | 00CF | 23C8 | 00D0 | 23CB | 00D1 | 243B | 00D2 | 243E |
| 0000401420 | 00D9 | 2449 | 00DA | 2459 | 00DB | 2465 | 00DC | 2471 |
| 0000401440 | 00DD | 247D | 00DE | 2489 | 00DF | 2495 | 00E0 | 24A1 |
| 0000401460 | 00E1 | 24AD | 00E3 | 24B9 | 00E4 | 24BF | 00ED | 24CA |
| 0000401500 | 00FA | 24E0 | 00FB | 24EF | 00FC | 250D | 00FE | 2516 |
| 0000401520 | 00FF | 2525 | 010E | 252E | 010F | 2540 | 0110 | 2544 |
| 0000401540 | 0111 | 254C | 0112 | 2556 | 0113 | 2562 | 0114 | 256E |
| 0000401560 | 0118 | 257A | 0119 | 25A2 | 011B | 25AB | 011C | 25C9 |
| 0000401600 | 011E | 25DF | 0121 | 260E | 0122 | 2628 | 0124 | 2636 |
| 0000401620 | 0125 | 2650 | 0127 | 265C | 0128 | 2679 | 012A | 2685 |
| 0000401640 | 012B | 268E | 013F | 269A | 014B | 26B0 | 014C | 26BF |
| 0000401660 | 014D | 26DD | 0150 | 26E3 | 0153 | 26F6 | 0155 | 2728 |
| 0000401700 | 0156 | 272E | 015E | 273A | 0164 | 2750 | 0165 | 275F |
| 0000401720 | 0166 | 277D | 0169 | 2783 | 016B | 2796 | 016D | 27C1 |
| 0000401740 | 016E | 27C7 | 0181 | 27D3 | 0187 | 27E3 | 0188 | 280B |
| 0000401760 | 018A | 2821 | 018B | 2827 | 019B | 2832 | 01A6 | 2848 |
| 0000402000 | 01A8 | 285B | 01AA | 2861 | 01AB | 286F | 01AD | 2872 |
| 0000402020 | 01AE | 287F | 01B0 | 2882 | 01B1 | 2891 | 01B2 | 2897 |
| 0000402040 | 01B5 | 28AA | 01B6 | 28D2 | 01B8 | 28E8 | 01BD | 28FD |
| 0000402060 | 01BE | 290C | 01C0 | 2927 | 01C1 | 2930 | 01C2 | 2951 |
| 0000402100 | 01C3 | 295F | 01C4 | 2968 | 01C5 | 297B | 01C7 | 2987 |
| 0000402120 | 01C9 | 2996 | 01CA | 299C | 01E5 | 29A8 | 01E8 | 29BE |
| 0000402140 | 01E9 | 29D3 | 01EA | 29DF | 01EB | 29EB | 01EE | 29F1 |
| 0000402160 | 01F0 | 2A04 | 01F1 | 2A2C | 01F3 | 2A42 | 01F4 | 2A4B |
| 0000402200 | 01F5 | 2A80 | 01F7 | 2A88 | 01F8 | 2A8E | 0212 | 2A9A |
| 0000402220 | 0215 | 2AB0 | 0216 | 2AC5 | 0217 | 2AD1 | 0218 | 2ADD |
| 0000402240 | 021B | 2AE3 | 021C | 2AEC | 021D | 2B1B | 021E | 2B23 |
| 0000402260 | 0227 | 2B2F | 022F | 2B3F | 0231 | 2B62 | 0232 | 2B76 |
| 0000402300 | 0233 | 2B8A | 0236 | 2B96 | 0237 | 2BA5 | 0238 | 2BB3 |
| 0000402320 | 0257 | 2BBE | 025A | 2BD4 | 025B | 2BE9 | 025C | 2BF5 |
| 0000402340 | 025D | 2C01 | 0260 | 2C07 | 0262 | 2C1A | 0263 | 2C42 |
| 0000402360 | 0265 | 2C58 | 0266 | 2C61 | 0267 | 2C6A | 0268 | 2C9F |
| 0000402400 | 026A | 2CA7 | 026B | 2CAD | 0276 | 2CB9 | 0280 | 2CCF |
| 0000402420 | 0281 | 2CE4 | 0282 | 2CF0 | 0283 | 2CFC | 0286 | 2D02 |
| 0000402440 | 0288 | 2D15 | 0289 | 2D3D | 028A | 2D53 | 028F | 2D6A |
| 0000402460 | 0290 | 2D79 | 0292 | 2D96 | 0294 | 2D9F | 0295 | 2DAE |
| 0000402500 | 0296 | 2DD1 | 0299 | 2DDD | 029A | 2E0C | 029C | 2E12 |
| 0000402520 | 029D | 2E18 | 02B7 | 2E24 | 02B9 | 2E34 | 02BA | 2E42 |
| 0000402540 | 02C6 | 2E4D | 02D1 | 2E5D | 02D7 | 2E74 | 02D8 | 2E83 |
| 0000402560 | 02DA | 2EA0 | 02DB | 2EA9 | 02DD | 2EAC | 02DF | 2ECF |
| 0000402600 | 02E0 | 2EE3 | 02E1 | 2EF7 | 02E2 | 2F03 | 02E3 | 2F32 |
| 0000402620 | 02F2 | 2F3D | 02F8 | 2F4D | 0304 | 2F59 | 0305 | 2F73 |
| 0000402640 | 0325 | 2F7F | 032B | 2F8A | 032E | 2F9A | 032F | 2FA7 |
| 0000402660 | 0330 | 2FB3 | 0331 | 2FC6 | 0332 | 2FD2 | 033E | 2FDD |
| 0000402700 | 0342 | 2FED | 0347 | 2FF5 | 0348 | 2FFB | 034E | 3006 |
| 0000402720 | 034F | 3016 | 0350 | 301C | 0366 | 3027 | 0367 | 303D |
| 0000402740 | 0369 | 3042 | 036A | 3048 | 0377 | 3054 | 0379 | 306A |
| 0000402760 | 037A | 3075 | 037B | 3087 | 037D | 3091 | 037E | 3096 |
| 0000403000 | 037F | 30A0 | 0392 | 30AC | 0393 | 30BC | 0394 | 30C6 |
| 0000403020 | 0399 | 30D1 | 039F | 30E1 | 03A0 | 3100 | 03A1 | 3109 |
| 0000403040 | 03A3 | 310C | 03A4 | 3119 | 03A5 | 313D | 03A6 | 314A |
| 0000403060 | 03A7 | 3156 | 03B1 | 3161 | 03B3 | 3177 | 03B4 | 3184 |
| 0000403100 | 6209 | 5F78 | 6176 | 7372 | 632E | 0001 | 007F | 003A |
| 0000403120 | 3190 | 004B | 31A6 | 004D | 31B9 | 004F | 31CE | 0050 |
| 0000403140 | 31F6 | 0052 | 320C | 0053 | 321B | 0055 | 3236 | 0056 |
| 0000403160 | 323F | 0058 | 3245 | 005A | 3266 | 005C | 326F | 005E |

THU MAR 14 17:41:20 1991 LBIPMT.DLL PAGE 117, LINE 6845

| | | | | | | | | |
|---|---|---|---|---|---|---|---|---|
| 0000403200 | 3275 | 005F | 3282 | 0060 | 3293 | 0062 | 3296 | 0063 |
| 0000403220 | 32A3 | 0064 | 32B5 | 0066 | 32B8 | 0067 | 32CC | 0068 |
| 0000403240 | 32E0 | 006A | 32E3 | 006B | 32FC | 006C | 3316 | 006E |
| 0000403260 | 3319 | 006F | 3332 | 0070 | 334C | 0072 | 334F | 0073 |
| 0000403300 | 3363 | 0074 | 3377 | 0076 | 337A | 0077 | 338E | 0078 |
| 0000403320 | 33A2 | 007A | 33A5 | 007B | 33B2 | 007C | 33C3 | 007E |
| 0000403340 | 33C6 | 007F | 33D3 | 0080 | 33E4 | 0082 | 33E7 | 0083 |
| 0000403360 | 33FB | 0084 | 340F | 0087 | 3412 | 0088 | 341F | 0089 |
| 0000403400 | 3431 | 008B | 3434 | 008C | 3441 | 008D | 3452 | 0090 |
| 0000403420 | 3455 | 0093 | 3485 | 0094 | 34B2 | 0096 | 34BA | 0097 |
| 0000403440 | 34C0 | 009F | 34CC | 00A6 | 34DC | 00A7 | 34FE | 00A8 |
| 0000403460 | 3518 | 00A9 | 3524 | 00AE | 352F | 00B1 | 353F | 00B2 |
| 0000403500 | 3554 | 00B3 | 355D | 00B4 | 356C | 00B5 | 357E | 00B6 |
| 0000403520 | 358D | 00B7 | 35A7 | 00B8 | 35B3 | 00B9 | 35C2 | 00BF |
| 0000403540 | 35CD | 00C2 | 35DD | 00C3 | 35F5 | 00C4 | 360F | 00C5 |
| 0000403560 | 361B | 00C6 | 362A | 00CB | 3635 | 00CE | 3645 | 00CF |
| 0000403600 | 365D | 00D0 | 3677 | 00D1 | 3683 | 00D2 | 3692 | 00D8 |
| 0000403620 | 369D | 00DB | 36AD | 00DC | 36C5 | 00DD | 36CE | 00DE |
| 0000403640 | 36E0 | 00DF | 36FA | 00E0 | 3706 | 00E1 | 3715 | 00E6 |
| 0000403660 | 3720 | 00E9 | 3730 | 00EA | 3748 | 00EB | 3762 | 00EC |
| 0000403700 | 376E | 00ED | 377D | 00F3 | 3788 | 00F6 | 3798 | 00F7 |
| 0000403720 | 37B0 | 00F8 | 37CA | 00F9 | 37D6 | 00FA | 37E5 | 0101 |
| 0000403740 | 37F0 | 0104 | 3800 | 0105 | 382A | 0106 | 3844 | 0107 |
| 0000403760 | 3850 | 0108 | 385F | 010D | 386A | 0110 | 387A | 0111 |
| 0000404000 | 38A0 | 0112 | 38BA | 0113 | 38C6 | 0114 | 38D5 | 011B |
| 0000404020 | 38E0 | 011E | 38F0 | 011F | 391A | 0120 | 3934 | 0121 |
| 0000404040 | 3940 | 0122 | 394F | 012A | 395A | 012D | 396A | 012F |
| 0000404060 | 3975 | 0130 | 39A3 | 0131 | 39A6 | 0133 | 39BE | 0134 |
| 0000404100 | 39D8 | 0135 | 39E4 | 0136 | 39F3 | 620A | 5F78 | 6170 |
| 0000404120 | 6B63 | 2E73 | 0163 | 1D00 | 1B00 | FE00 | 1E39 | 0E00 |
| 0000404140 | 1F3A | 2B00 | 203A | 3100 | 213A | 7100 | 273A | 7C00 |
| 0000404160 | 2A3A | 8C00 | 2B3A | 9200 | 2C3A | A600 | 2D3A | B900 |
| 0000404200 | 2E3A | CF00 | 2F3A | DF00 | 303A | E200 | 373A | ED00 |
| 0000404220 | 393A | FD00 | 3A3A | 0700 | 3B3B | 0D00 | 3C3B | 3E00 |
| 0000404240 | 3D3B | 4400 | 3E3B | 4800 | 3F3B | 4E00 | 453B | 5900 |
| 0000404260 | 493B | 6900 | 4A3B | 7F00 | 4C3B | 8500 | 4D3B | 9800 |
| 0000404300 | 4E3B | BF00 | 4F3B | C500 | 503B | CE00 | 0A3B | 7862 |
| 0000404320 | 705F | 6972 | 746E | 632E | 0001 | 00D8 | 0035 | 3BDA |
| 0000404340 | 0036 | 3BEA | 0037 | 3BF2 | 0038 | 3BFA | 0039 | 3C02 |
| 0000404360 | 003A | 3C08 | 0044 | 3C13 | 0046 | 3C23 | 004A | 3C28 |
| 0000404400 | 004B | 3C2E | 0056 | 3C39 | 0059 | 3C49 | 005A | 3C55 |
| 0000404420 | 005C | 3C5A | 005D | 3C81 | 005E | 3C99 | 005F | 3CA1 |
| 0000404440 | 0061 | 3CA7 | 0062 | 3CAD | 006E | 3CB8 | 0072 | 3CC8 |
| 0000404460 | 0073 | 3CD4 | 0075 | 3CD9 | 0076 | 3D00 | 0077 | 3D18 |
| 0000404500 | 0078 | 3D20 | 007A | 3D26 | 007B | 3D2C | 0084 | 3D37 |
| 0000404520 | 0085 | 3D47 | 0086 | 3D4C | 0087 | 3D51 | 0088 | 3D56 |
| 0000404540 | 008A | 3D5B | 008C | 3D61 | 0095 | 3D6C | 0096 | 3D7C |
| 0000404560 | 0097 | 3D88 | 0098 | 3DB6 | 0099 | 3DC6 | 009B | 3DCE |
| 0000404600 | 009C | 3DD4 | 00A7 | 3DDF | 00A8 | 3DEF | 00A9 | 3DFB |
| 0000404620 | 00AA | 3E29 | 00AB | 3E39 | 00AD | 3E41 | 00AE | 3E47 |
| 0000404640 | 00B9 | 3E52 | 00C3 | 3E62 | 00C4 | 3E68 | 00CE | 3E73 |
| 0000404660 | 00D2 | 3E83 | 00D3 | 3E9F | 00D5 | 3EBB | 00D6 | 3EC1 |
| 0000404700 | 00E7 | 3ECC | 00EB | 3EDC | 00EC | 3EE7 | 00F1 | 3F01 |
| 0000404720 | 00F2 | 3F10 | 00F4 | 3F15 | 00F5 | 3F1B | 0108 | 3F26 |
| 0000404740 | 010B | 3F36 | 010C | 3F3F | 010D | 3F5B | 010F | 3F63 |
| 0000404760 | 0110 | 3F69 | 0125 | 3F74 | 0128 | 3F84 | 0129 | 3F8D |
| 0000405000 | 012A | 3FA9 | 012C | 3FB1 | 012D | 3FB7 | 0144 | 3FC2 |
| 0000405020 | 0147 | 3FD2 | 014A | 3FDB | 014F | 3FEF | 0150 | 3FF7 |
| 0000405040 | 0151 | 3FFD | 015C | 4008 | 0160 | 4018 | 0164 | 402C |

THU MAR 14 17:41:20 1991  LBIPMT.DLL  PAGE 118, LINE 6904

| | | | | | | | | |
|---|---|---|---|---|---|---|---|---|
| 0000405060 | 0165 | 4048 | 0166 | 4064 | 0167 | 406A | 017B | 4075 |
| 0000405100 | 017E | 408B | 0180 | 4094 | 0182 | 40A8 | 0183 | 40B0 |
| 0000405120 | 0192 | 40BC | 0193 | 40CC | 0194 | 40EE | 0195 | 40F4 |
| 0000405140 | 019F | 40FF | 01A0 | 410F | 01A1 | 4131 | 01A2 | 4137 |
| 0000405160 | 01B0 | 4142 | 01B1 | 4152 | 01B2 | 4174 | 01B3 | 417A |
| 0000405200 | 01BE | 4185 | 01BF | 419B | 01C0 | 41BD | 01D6 | 41C9 |
| 0000405220 | 01D9 | 41D9 | 01DA | 41DE | 01DD | 41E7 | 01E2 | 41FB |
| 0000405240 | 01E3 | 4203 | 01E4 | 4209 | 01F6 | 4214 | 01F9 | 4224 |
| 0000405260 | 01FA | 4229 | 01FB | 4232 | 01FC | 424E | 01FD | 4256 |
| 0000405300 | 01FE | 425C | 0215 | 4267 | 0218 | 4277 | 0219 | 427C |
| 0000405320 | 021A | 4285 | 021B | 42A1 | 021C | 42A9 | 021D | 42AF |
| 0000405340 | 0229 | 42BA | 022C | 42CA | 022F | 42CF | 0234 | 42E3 |
| 0000405360 | 0235 | 42FF | 0236 | 431B | 0237 | 4321 | 024B | 432C |
| 0000405400 | 024E | 4342 | 0250 | 434B | 0252 | 435F | 0253 | 4367 |
| 0000405420 | 026E | 4373 | 0277 | 4383 | 027F | 4388 | 0280 | 439A |
| 0000405440 | 0281 | 439E | 0282 | 43A6 | 0283 | 43B0 | 0284 | 43BC |
| 0000405460 | 0285 | 43C8 | 028C | 43D4 | 028E | 4415 | 0290 | 441A |
| 0000405500 | 0291 | 4429 | 0292 | 4436 | 0293 | 4443 | 0294 | 445D |
| 0000405520 | 0295 | 4478 | 0299 | 447D | 029B | 448C | 029C | 4495 |
| 0000405540 | 029D | 44A9 | 029E | 44B6 | 029F | 44D3 | 02A0 | 44EB |
| 0000405560 | 02A1 | 44FE | 02A4 | 4503 | 02A5 | 4521 | 02A6 | 4538 |
| 0000405600 | 02A7 | 454B | 02AA | 4550 | 02AB | 4568 | 02AC | 457C |
| 0000405620 | 02AF | 4581 | 02B0 | 4599 | 02B1 | 45AD | 02B2 | 45C0 |
| 0000405640 | 02B3 | 45C5 | 02B4 | 45D1 | 02B6 | 45E3 | 02B7 | 45FB |
| 0000405660 | 02B8 | 460F | 02B9 | 4621 | 02BC | 4626 | 02BD | 463E |
| 0000405700 | 02BE | 4647 | 02BF | 465B | 02C0 | 465E | 02C1 | 4675 |
| 0000405720 | 02C3 | 4688 | 02C6 | 469A | 02C8 | 46AE | 02D3 | 46B9 |
| 0000405740 | 02DB | 46C9 | 02DC | 46F1 | 02DD | 4702 | 02EC | 470D |
| 0000405760 | 02F4 | 471D | 02F5 | 4745 | 02F6 | 4756 | 0305 | 4761 |
| 0000406000 | 030D | 4771 | 030E | 4799 | 030F | 47AA | 031F | 47B5 |
| 0000406020 | 0327 | 47C5 | 0328 | 47ED | 0329 | 47FE | 033F | 4809 |
| 0000406040 | 0342 | 4819 | 0344 | 4822 | 0345 | 482E | 0346 | 4847 |
| 0000406060 | 034C | 484E | 034D | 4856 | 034E | 485C | 6209 | 5F78 |
| 0000406100 | 6974 | 656D | 632E | 0001 | 000C | 0060 | 4868 | 0062 |
| 0000406120 | 4878 | 0063 | 4888 | 0064 | 4896 | 0065 | 48A5 | 0066 |
| 0000406140 | 48B3 | 006A | 48BE | 006C | 48CE | 006D | 48FD | 0072 |
| 0000406160 | 4908 | 0075 | 4918 | 0076 | 4960 | 6407 | 696C | 7473 |
| 0000406200 | 632E | 0001 | 0061 | 001C | 496C | 001E | 497C | 001F |
| 0000406220 | 498E | 0020 | 4994 | 0026 | 499F | 0028 | 49AF | 0029 |
| 0000406240 | 49CD | 0034 | 49D8 | 0036 | 49E8 | 0037 | 49FA | 0038 |
| 0000406260 | 4A04 | 003F | 4A0F | 0042 | 4A1F | 0043 | 4A36 | 0044 |
| 0000406300 | 4A3F | 0045 | 4A50 | 0046 | 4A59 | 0049 | 4A64 | 004E |
| 0000406320 | 4A74 | 004F | 4A8F | 0050 | 4A9B | 0051 | 4AAC | 0052 |
| 0000406340 | 4AC2 | 0053 | 4AD0 | 0057 | 4ADB | 005D | 4AEB | 005E |
| 0000406360 | 4B02 | 005F | 4B08 | 0060 | 4B1C | 0061 | 4B32 | 0062 |
| 0000406400 | 4B43 | 0063 | 4B49 | 006A | 4B54 | 006C | 4B64 | 006D |
| 0000406420 | 4B7F | 006E | 4B8B | 006F | 4B99 | 0074 | 4BA4 | 0078 |
| 0000406440 | 4BB4 | 0079 | 4BDB | 007A | 4BF2 | 007B | 4C00 | 0084 |
| 0000406460 | 4C0B | 0089 | 4C1B | 008A | 4C36 | 008B | 4C42 | 008C |
| 0000406500 | 4C5B | 0091 | 4C66 | 0095 | 4C76 | 0096 | 4C91 | 0097 |
| 0000406520 | 4C9D | 0098 | 4CBD | 009E | 4CC8 | 00A4 | 4CD8 | 00A5 |
| 0000406540 | 4D13 | 00A6 | 4D2C | 00A7 | 4D37 | 00A8 | 4D3A | 00A9 |
| 0000406560 | 4D46 | 00B5 | 4D51 | 00BB | 4D61 | 00BC | 4D73 | 00BF |
| 0000406600 | 4D7C | 00C0 | 4DD4 | 00C1 | 4DED | 00C2 | 4E0E | 00C3 |
| 0000406620 | 4E17 | 00C4 | 4E1A | 00C5 | 4E23 | 00CE | 4E2E | 00D3 |
| 0000406640 | 4E3E | 00D4 | 4E79 | 00D7 | 4E7C | 00DA | 4E92 | 00DB |
| 0000406660 | 4ECD | 00DD | 4ED0 | 00E0 | 4EE1 | 00E2 | 4EEF | 00E3 |
| 0000406700 | 4EF8 | 00EB | 4F03 | 00F2 | 4F13 | 00F3 | 4F1E | 00F5 |
| 0000406720 | 4F24 | 00F6 | 4F5F | 00F7 | 4F78 | 00F8 | 4F91 | 00F9 |

THU MAR 14 17:41:20 1991 LBIPMT.DLL PAGE 119, LINE 6963

| | | | | | | | | |
|---|---|---|---|---|---|---|---|---|
| 0000406740 | 4F97 | 00FA | 4F9A | 00FB | 4FA0 | 0101 | 4FAB | 0106 |
| 0000406760 | 4FBB | 0107 | 4FC6 | 0109 | 4FCC | 010A | 5007 | 010B |
| 0000407000 | 5028 | 010C | 502E | 010D | 5037 | 6F0A | 3273 | 7270 |
| 0000407020 | 6E69 | 2E74 | 0163 | 7D00 | 3900 | 4200 | 4150 | 5200 |
| 0000407040 | 4250 | 5C00 | 4350 | 6900 | 4450 | 8400 | 4550 | 9000 |
| 0000407060 | 4950 | 9600 | 4A50 | A000 | 4B50 | C200 | 4E50 | CD00 |
| 0000407100 | 4F50 | D300 | 5650 | DE00 | 5C50 | EE00 | 5E50 | 0B00 |
| 0000407120 | 5F51 | 2600 | 6051 | 3000 | 6151 | 4C00 | 6251 | 5500 |
| 0000407140 | 6551 | 6100 | 6651 | 6800 | 6E51 | 7300 | 7251 | 8300 |
| 0000407160 | 7451 | 8800 | 7551 | 9400 | 7651 | A000 | 7751 | AA00 |
| 0000407200 | 7851 | B400 | 7A51 | B800 | 7B51 | BB00 | 7C51 | CA00 |
| 0000407220 | 7E51 | CD00 | 7F51 | D000 | 8051 | D300 | 8151 | DA00 |
| 0000407240 | 8251 | E000 | 8A51 | EB00 | 9751 | FB00 | 9851 | 0600 |
| 0000407260 | 9952 | 1100 | 9B52 | 1C00 | 9C52 | 2700 | 9D52 | 3200 |
| 0000407300 | A352 | 3D00 | A452 | 4700 | AA52 | 4D00 | AB52 | 6000 |
| 0000407320 | AC52 | 6900 | AD52 | 7600 | B152 | 8900 | B252 | AF00 |
| 0000407340 | B352 | B200 | B452 | BD00 | B552 | C800 | B752 | D300 |
| 0000407360 | B952 | DF00 | BA52 | E800 | BB52 | F300 | BD52 | FE00 |
| 0000407400 | BE52 | 0400 | C453 | 0F00 | C553 | 2500 | C753 | 2B00 |
| 0000407420 | C853 | 4400 | CB53 | 4D00 | CD53 | 5300 | CE53 | 6100 |
| 0000407440 | CF53 | 6600 | D253 | 6F00 | D353 | 7D00 | D653 | 8600 |
| 0000407460 | D753 | 9200 | D853 | A000 | DE53 | A500 | DF53 | B000 |
| 0000407500 | E053 | BB00 | E153 | C600 | E253 | D100 | E353 | DC00 |
| 0000407520 | E553 | E700 | E853 | F000 | E953 | FE00 | ED53 | 0700 |
| 0000407540 | EE54 | 1300 | EF54 | 2100 | F054 | 2600 | F154 | 2F00 |
| 0000407560 | F254 | 5500 | F354 | 5800 | F454 | 6E00 | F554 | 8B00 |
| 0000407600 | FB54 | 9900 | FE54 | AF00 | 0054 | B501 | 0154 | C601 |
| 0000407620 | 0354 | C901 | 0454 | DA01 | 0654 | DD01 | 0754 | EE01 |
| 0000407640 | 0954 | F101 | 0A54 | 0201 | 0C55 | 0501 | 0D55 | 1601 |
| 0000407660 | 0E55 | 1901 | 1455 | 3801 | 1555 | 4901 | 1655 | 5201 |
| 0000407700 | 1755 | 5B01 | 1955 | 6001 | 1B55 | 6B01 | 1C55 | 7101 |
| 0000407720 | 2255 | 7F01 | 2855 | 8F01 | 2955 | A201 | 2A55 | AB01 |
| 0000407740 | 2B55 | B801 | 2F55 | CB01 | 3155 | E601 | 3255 | EF01 |
| 0000407760 | 3355 | FA01 | 3555 | 0501 | 3656 | 0B01 | 3D56 | 1601 |
| 0000410000 | 4056 | 2601 | 4256 | 3001 | 4356 | 3601 | 0956 | 7862 |
| 0000410020 | 745F | 7268 | 2E64 | 0163 | 3800 | 2000 | 4200 | 2356 |
| 0000410040 | 5200 | 2456 | 6600 | 2556 | 7900 | 2656 | 8F00 | 2756 |
| 0000410060 | A900 | 2856 | AC00 | 2E56 | B700 | 2F56 | CD00 | 3156 |
| 0000410100 | D500 | 3256 | DE00 | 3356 | ED00 | 3656 | F000 | 3756 |
| 0000410120 | 0300 | 3957 | 1900 | 3A57 | 4800 | 3B57 | 4B00 | 4057 |
| 0000410140 | 5700 | 4157 | 6D00 | 4357 | 7500 | 4457 | 7E00 | 4557 |
| 0000410160 | 8D00 | 4857 | 9000 | 4957 | A300 | 4A57 | B900 | 4B57 |
| 0000410200 | D300 | 4F57 | DF00 | 5057 | EF00 | 5257 | F700 | 5357 |
| 0000410220 | 1600 | 5758 | 2100 | 5858 | 3100 | 5958 | 3900 | 5A58 |
| 0000410240 | 4E00 | 5F58 | 5900 | 6258 | 6900 | 6458 | 7300 | 6558 |
| 0000410260 | 7F00 | 6758 | 8500 | 6858 | 8B00 | 6F58 | 9600 | 7056 |
| 0000410300 | A600 | 7158 | AF00 | 7258 | B700 | 7358 | CA00 | 7458 |
| 0000410320 | DB00 | 7558 | E300 | 7B58 | EE00 | 7C58 | FE00 | 7E58 |
| 0000410340 | 0600 | 7F59 | 0F00 | 8059 | 1E00 | 8259 | 2600 | 8359 |
| 0000410360 | 3900 | 8459 | 4A00 | 8559 | 5200 | 0559 | 656C | 2E78 |
| 0000410400 | 0163 | 6800 | 2700 | 5E00 | 2959 | 6E00 | 2A59 | 7E00 |
| 0000410420 | 2C59 | 8400 | 2F59 | 9A00 | 3259 | 9D00 | 3459 | A000 |
| 0000410440 | 3559 | A600 | 3759 | A900 | 3859 | AF00 | 3A59 | B200 |
| 0000410460 | 3B59 | CE00 | 3D59 | D100 | 3E59 | DD00 | 4059 | E000 |
| 0000410500 | 4259 | E300 | 4359 | FA00 | 4859 | 3200 | 495A | 4200 |
| 0000410520 | 4A5A | 4800 | F25A | 5300 | 005A | 6301 | 015A | 7201 |
| 0000410540 | 025A | 7C01 | 035A | 7F01 | 045A | 8A01 | 075A | 9D01 |
| 0000410560 | 085A | A701 | 095A | C101 | 0E5A | CF01 | 0F5A | DF01 |
| 0000410600 | 105A | F401 | 115A | 0501 | 125B | 1301 | 145B | 2F01 |

THU MAR 14 17:41:20 1991 LBIPMT.DLL PAGE 120, LINE 7022

| | | | | | | | | |
|---|---|---|---|---|---|---|---|---|
| 0000410620 | 1D5B | B401 | 1E5B | C001 | 1F5B | CA01 | 205B | DB01 |
| 0000410640 | 215B | 0C01 | 225C | 3501 | 235C | 6901 | 245C | 9101 |
| 0000410660 | 285C | 9401 | 295C | A101 | 2D5C | B901 | 2E5C | C101 |
| 0000410700 | 2F5C | F201 | 305C | 1B01 | 315D | 4F01 | 325D | 7701 |
| 0000410720 | 345D | 7A01 | 3C5D | 9001 | 3D5D | C101 | 3E5D | EA01 |
| 0000410740 | 3F5D | 1E01 | 405E | 4601 | 435E | 4901 | 475E | 8401 |
| 0000410760 | 4A5E | 8701 | 4B5E | 8A01 | 555E | BE01 | 5D5E | C101 |
| 0000411000 | 5E5E | D301 | 5F5E | DD01 | 605E | 1C01 | 615F | 2F01 |
| 0000411020 | 625F | 4501 | 635F | 7A01 | 645F | 7E01 | 655F | AF01 |
| 0000411040 | 675F | B201 | 685F | BC01 | 695F | CF01 | 6A5F | DD01 |
| 0000411060 | 725F | EC01 | 745F | 0601 | 7560 | 3401 | 7660 | 3701 |
| 0000411100 | 7860 | 4601 | 7960 | 5201 | 7B60 | 5801 | 7C60 | DC01 |
| 0000411120 | 7D60 | E601 | 7E60 | FA01 | 8260 | 0401 | 8361 | 0701 |
| 0000411140 | 8561 | 1201 | 8761 | 2201 | 8861 | 3301 | 8A61 | 3F01 |
| 0000411160 | 8B61 | 5101 | 8C61 | 5701 | 8D61 | 5A01 | 8E61 | 6001 |
| 0000411200 | 9061 | 6B01 | 9161 | 7B01 | 9261 | F701 | 9461 | 0201 |
| 0000411220 | 9562 | 1201 | 9662 | 2501 | 9862 | 3001 | 9962 | 4001 |
| 0000411240 | 9A62 | 6A01 | 0562 | 7267 | 2E6D | 0179 | AD00 | 6200 |
| 0000411260 | 7600 | 6862 | 8600 | 6962 | 9900 | 6A62 | A400 | 6B62 |
| 0000411300 | AF00 | 6C62 | B800 | 6D62 | D900 | 6E62 | E200 | 6F62 |
| 0000411320 | EB00 | 7462 | F600 | 7762 | 0600 | 7863 | 2700 | 8563 |
| 0000411340 | 3200 | 8E63 | 4200 | 8F63 | 6500 | 9163 | 8400 | 9263 |
| 0000411360 | 9500 | 9463 | 9A00 | 9563 | B400 | 9763 | BF00 | 9863 |
| 0000411400 | DC00 | 9A63 | E700 | 9B63 | 0400 | 9D64 | 0F00 | 9E64 |
| 0000411420 | 2C00 | A064 | 3700 | A164 | 5400 | A364 | 5F00 | A464 |
| 0000411440 | 7C00 | A664 | 8700 | A764 | A400 | A964 | AF00 | AA64 |
| 0000411460 | CC00 | AC64 | D700 | AD64 | F400 | AE64 | FF00 | AF64 |
| 0000411500 | 1C00 | B165 | 2700 | B265 | 4400 | B465 | 4F00 | B565 |
| 0000411520 | 6C00 | B765 | 7700 | B865 | 9400 | BA65 | 9F00 | BB65 |
| 0000411540 | BC00 | BD65 | C700 | BE65 | E400 | C065 | EF00 | C265 |
| 0000411560 | 0C00 | C366 | 1F00 | C566 | 3200 | C766 | 4F00 | C866 |
| 0000411600 | 6200 | CB66 | 7500 | CC66 | 9200 | CE66 | 9D00 | CF66 |
| 0000411620 | BA00 | D166 | C500 | D266 | E200 | D466 | ED00 | D566 |
| 0000411640 | 0A00 | D767 | 1500 | D867 | 3200 | DA67 | 3D00 | DB67 |
| 0000411660 | 5A00 | DD67 | 6500 | DE67 | 8200 | E067 | 8D00 | E167 |
| 0000411700 | AA00 | E367 | B500 | E467 | D200 | E667 | DD00 | E767 |
| 0000411720 | E000 | E967 | E500 | EB67 | 0C00 | EC68 | 1200 | B568 |
| 0000411740 | 1D01 | BD68 | 2D01 | BE68 | 3201 | C268 | 3801 | C368 |
| 0000411760 | 3E01 | C468 | 4401 | C568 | 4E01 | CC68 | 5A01 | CD68 |
| 0000412000 | 7101 | CE68 | 7D01 | D068 | 8301 | D168 | 8C01 | D268 |
| 0000412020 | 9101 | D668 | A901 | D768 | B601 | DA68 | C401 | DB68 |
| 0000412040 | E601 | DE68 | 0501 | E269 | 2101 | E369 | 2701 | E469 |
| 0000412060 | 4101 | E569 | 4801 | E669 | 5601 | ED69 | 5901 | EE69 |
| 0000412100 | 6E01 | EF69 | 9001 | F069 | D701 | F169 | 0601 | F26A |
| 0000412120 | 2201 | F46A | 2C01 | F56A | 5301 | F66A | 6101 | F76A |
| 0000412140 | 7F01 | F86A | 8501 | F96A | 9E01 | FA6A | BC01 | FB6A |
| 0000412160 | DD01 | FC6A | 0B01 | FD6B | 2501 | FE6B | 2801 | 006B |
| 0000412200 | 3E02 | 056B | 4402 | 066B | 4E02 | 086B | 5402 | 0A6B |
| 0000412220 | 6002 | 0D6B | 6402 | 0F6B | 6A02 | 106B | 7602 | 116B |
| 0000412240 | 8902 | 126B | B502 | 136B | C202 | 156B | C502 | 1C6B |
| 0000412260 | D502 | 1D6B | D902 | 1E6B | DE02 | 226B | E102 | 246B |
| 0000412300 | EB02 | 256B | 1202 | 266C | 2002 | 276C | 3E02 | 286C |
| 0000412320 | 4402 | 296C | 5D02 | 2A6C | 7B02 | 2B6C | 9C02 | 2C6C |
| 0000412340 | CA02 | 2D6C | E402 | 2E6C | E702 | 306C | FD02 | 376C |
| 0000412360 | 0302 | 386D | 1002 | 396D | 1602 | 416D | 3802 | 426D |
| 0000412400 | 6402 | 436D | 7302 | 446D | 8302 | 456D | 9402 | 466D |
| 0000412420 | AD02 | 486D | B502 | 496D | C302 | 4A6D | D802 | 4B6D |
| 0000412440 | 1502 | 336E | 1C00 | 3B6E | 2500 | 3C6E | 4800 | 3F6E |
| 0000412460 | 4B00 | 406E | 6200 | 426E | 6500 | 436E | 7300 | 4A6E |

THU MAR 14 17:41:20 1991 LBIPMT.DLL PAGE 121, LINE 7081

| | | | | | | | | |
|---|---|---|---|---|---|---|---|---|
| 0000412500 | 8100 | 4B6E | A300 | 4C6E | D900 | 4D6E | FE00 | 4E6E |
| 0000412520 | 3400 | 536F | 3700 | 546F | 6300 | 556F | 8B00 | 566F |
| 0000412540 | 8E00 | 006F | 6C0C | 696C | 6362 | 6C64 | 2E6C | 696C |
| 0000412560 | 0762 | 736F | 2E32 | 696C | 2162 | 0101 | 0101 | 0800 |
| 0000412600 | 0000 | 3400 | 0200 | 0101 | 3300 | 000D | 1F00 | 0301 |
| 0000412620 | 0101 | 0B00 | 0039 | 2D00 | 0412 | 0101 | 1200 | 00C3 |
| 0000412640 | E700 | 0902 | 0101 | 4C00 | 00F2 | 6200 | 0102 | 0201 |
| 0000412660 | 3C00 | 0000 | 3400 | 0200 | 0201 | 5200 | 000E | DD00 |
| 0000412700 | 0300 | 0201 | 3800 | 004B | 7300 | 0409 | 0201 | F900 |
| 0000412720 | 00C5 | CE00 | 0903 | 0201 | AE00 | 00F4 | C200 | 0102 |
| 0000412740 | 0301 | 7000 | 0000 | 3500 | 0200 | 0301 | 2F00 | 000F |
| 0000412760 | B200 | 0300 | 0301 | AB00 | 0054 | 9E00 | 0409 | 0301 |
| 0000413000 | C700 | 00C9 | C900 | 0902 | 0301 | 7000 | 00F7 | 2B00 |
| 0000413020 | 0102 | 0401 | A500 | 0000 | 3500 | 0200 | 0401 | E100 |
| 0000413040 | 000F | 8900 | 0300 | 0401 | 4900 | 005E | 8600 | 0405 |
| 0000413060 | 0401 | 9000 | 00CC | BF00 | 0901 | 0401 | 9B00 | 00F9 |
| 0000413100 | 0300 | 0101 | 0501 | DA00 | 0000 | 3500 | 0200 | 0501 |
| 0000413120 | 6A00 | 0010 | F100 | 0301 | 0501 | CF00 | 0063 | 3100 |
| 0000413140 | 040C | 0501 | 4F00 | 00CE | DC00 | 0909 | 0501 | 9E00 |
| 0000413160 | 00FA | CB00 | 0103 | 0601 | 0F00 | 0001 | 3400 | 0200 |
| 0000413200 | 0601 | 5B00 | 0012 | FC00 | 0300 | 0601 | 0000 | 0070 |
| 0000413220 | 5200 | 0408 | 0601 | 2B00 | 00D8 | C000 | 0903 | 0601 |
| 0000413240 | 6900 | 00FE | 0A00 | 0102 | 0701 | 4300 | 0001 | 3500 |
| 0000413260 | 0200 | 0701 | 5700 | 0013 | 6C00 | 0300 | 0701 | 5200 |
| 0000413300 | 0078 | 5400 | 0404 | 0701 | EB00 | 00DB | F100 | 0900 |
| 0000413320 | 0701 | 7300 | 0100 | 8300 | 0100 | 0801 | 7800 | 0001 |
| 0000413340 | 3500 | 0200 | 0801 | C300 | 0013 | 4500 | 0302 | 0801 |
| 0000413360 | A600 | 007C | 8800 | 0409 | 0801 | DC00 | 00DC | DE00 |
| 0000413400 | 0906 | 0801 | F600 | 0100 | 6F00 | 0103 | 0901 | AD00 |
| 0000413420 | 0001 | 3400 | 0200 | 0901 | 0800 | 0016 | 3700 | 0300 |
| 0000413440 | 0901 | 2E00 | 0086 | E000 | 0402 | 0901 | BA00 | 00E3 |
| 0000413460 | 8B00 | 0900 | 0901 | 6500 | 0104 | 3E00 | 0100 | 0A01 |
| 0000413500 | E100 | 0001 | 3200 | 0200 | 0A01 | 3F00 | 0016 | DA00 |
| 0000413520 | 0300 | 0A01 | 0E00 | 0089 | AF00 | 0406 | 0A01 | 4500 |
| 0000413540 | 00E4 | EF00 | 0902 | 0A01 | A300 | 0104 | 9000 | 0101 |
| 0000413560 | 0B01 | 1300 | 0002 | 3500 | 0200 | 0B01 | 1900 | 0017 |
| 0000413600 | 8A00 | 0300 | 0B01 | BD00 | 008F | 5100 | 0417 | 0B01 |
| 0000413620 | 3400 | 00E7 | 1D00 | 0903 | 0B01 | 3300 | 0106 | 0300 |
| 0000413640 | 0102 | 0C01 | 4800 | 0002 | 3400 | 0200 | 0C01 | A300 |
| 0000413660 | 0017 | C200 | 0300 | 0C01 | 0E00 | 00A7 | 5700 | 040D |
| 0000413700 | 0C01 | 5100 | 00EA | 8A00 | 0901 | 0C01 | 3600 | 0108 |
| 0000413720 | EE00 | 0100 | 0D01 | 7C00 | 0002 | 3000 | 0200 | 0D01 |
| 0000413740 | 6500 | 0018 | A300 | 0301 | 0D01 | 6500 | 00B4 | 1C00 |
| 0000413760 | 0405 | 0D01 | DB00 | 00EB | C900 | 0902 | 0D01 | 2400 |
| 0000414000 | 0109 | AA00 | 0101 | 0E01 | AC00 | 0002 | 3000 | 0200 |
| 0000414020 | 0E01 | 0800 | 001A | 6A00 | 0301 | 0E01 | 8100 | 00B9 |
| 0000414040 | 9100 | 0409 | 0E01 | A400 | 00EE | A800 | 0903 | 0E01 |
| 0000414060 | CE00 | 010A | BE00 | 0102 | 0F01 | DC00 | 0002 | 1800 |
| 0000414100 | 0200 | 0F01 | 7200 | 001B | 5200 | 0101 | 1001 | F400 |
| 0000414120 | 0002 | 1B00 | 0200 | 1001 | C400 | 001C | D200 | 0101 |
| 0000414140 | 1101 | 0F00 | 0003 | 1C00 | 0200 | 1101 | 9600 | 001E |
| 0000414160 | 3500 | 0100 | 1201 | 2B00 | 0003 | 1700 | 0200 | 1201 |
| 0000414200 | CB00 | 001E | 0F00 | 0100 | 1301 | 4200 | 0003 | 1700 |
| 0000414220 | 0200 | 1301 | DA00 | 001E | 3300 | 0100 | 1401 | 5900 |
| 0000414240 | 0003 | 1A00 | 0200 | 1401 | 0D00 | 001F | 1000 | 0100 |
| 0000414260 | 1501 | 7300 | 0003 | 1C00 | 0200 | 1501 | 1D00 | 001F |
| 0000414300 | 2500 | 0100 | 1601 | 8F00 | 0003 | 1B00 | 0200 | 1601 |
| 0000414320 | 4200 | 001F | 3F00 | 0100 | 1701 | AA00 | 0003 | 1500 |
| 0000414340 | 0200 | 1701 | 8100 | 001F | 2000 | 0100 | 1801 | BF00 |

THU MAR 14 17:41:20 19°! LBIPMT.DLL PAGE 122, LINE 7140

| | | | | | | | | |
|---|---|---|---|---|---|---|---|---|
| 0000414360 | 0003 | 1400 | 0200 | 1801 | A100 | 001F | 1C00 | 0100 |
| 0000414400 | 1901 | D300 | 0003 | 1600 | 0200 | 1901 | BD00 | 001F |
| 0000414420 | 0F00 | 0100 | 1A01 | E900 | 0003 | 1500 | 0200 | 1A01 |
| 0000414440 | CC00 | 001F | 0E00 | 0100 | 1B01 | FE00 | 0003 | 1400 |
| 0000414460 | 0200 | 1B01 | DA00 | 001F | 0D00 | 0100 | 1C01 | 1200 |
| 0000414500 | 0004 | 1800 | 0200 | 1C01 | E700 | 001F | 0F00 | 0100 |
| 0000414520 | 1D01 | 2A00 | 0004 | 1400 | 0200 | 1D01 | F600 | 001F |
| 0000414540 | 3700 | 0100 | 1E01 | 3E00 | 0004 | 1800 | 0200 | 1E01 |
| 0000414560 | 2D00 | 0020 | 0F00 | 0100 | 1F01 | 5600 | 0004 | 1800 |
| 0000414600 | 0200 | 1F01 | 3C00 | 0020 | 0F00 | 0100 | 2001 | 6EU0 |
| 0000414620 | 0004 | 1900 | 0200 | 2001 | 4B00 | 0020 | 1000 | 0100 |
| 0000414640 | 2101 | 8700 | 0004 | 1800 | 0200 | 2101 | 5B00 | 0020 |
| 0000414660 | 0F00 | 0100 | 2201 | 9F00 | 0004 | 1400 | 0200 | 2201 |
| 0000414700 | 6A00 | 0020 | 1100 | 0100 | 2301 | B300 | 0004 | 1800 |
| 0000414720 | 0200 | 2301 | 7B00 | 0020 | 1C00 | 0100 | 2401 | CB00 |
| 0000414740 | 0004 | 1500 | 0200 | 2401 | 9700 | 0020 | 3000 | 0100 |
| 0000414760 | 2501 | E000 | 0004 | 1400 | 0200 | 2501 | C700 | 0020 |
| 0000415000 | 0E00 | 0100 | 2601 | F400 | 0004 | 1700 | 0200 | 2601 |
| 0000415020 | D500 | 0020 | 0F00 | 0100 | 2701 | 0B00 | 0005 | 1500 |
| 0000415040 | 0200 | 2701 | E400 | 0020 | 1200 | 0100 | 2801 | 2000 |
| 0000415060 | 0005 | 1500 | 0200 | 2801 | F600 | 0020 | 3800 | 0100 |
| 0000415100 | 2901 | 3500 | 0005 | 1500 | 0200 | 2901 | 2E00 | 0021 |
| 0000415120 | 3800 | 0100 | 2A01 | 4A00 | 0005 | 1500 | 0200 | 2A01 |
| 0000415140 | 6600 | 0021 | 2000 | 0100 | 2B01 | 5F00 | 0005 | 1A00 |
| 0000415160 | 0200 | 2B01 | 8600 | 0021 | 0D00 | 0100 | 2C01 | 7900 |
| 0000415200 | 0005 | 1A00 | 0200 | 2C01 | 9300 | 0021 | 1E00 | 0100 |
| 0000415220 | 2D01 | 9300 | 0005 | 1900 | 0200 | 2D01 | B100 | 0021 |
| 0000415240 | 3100 | 0100 | 2E01 | AC00 | 0005 | 1900 | 0200 | 2E01 |
| 0000415260 | E200 | 0021 | 0C00 | 0100 | 2F01 | C500 | 0005 | 1600 |
| 0000415300 | 0200 | 2F01 | EE00 | 0021 | 1E00 | 0100 | 3001 | DB00 |
| 0000415320 | 0005 | 1800 | 0200 | 3001 | 0C00 | 0022 | 1D00 | 0100 |
| 0000415340 | 3101 | F300 | 0005 | 1700 | 0200 | 3101 | 2900 | 0022 |
| 0000415360 | 1F00 | 0100 | 3201 | 0A00 | 0006 | 1500 | 0200 | 3201 |
| 0000415400 | 4800 | 0022 | 1B00 | 0100 | 3301 | 1F00 | 0006 | 1800 |
| 0000415420 | 0200 | 3301 | 6300 | 0022 | 4200 | 0100 | 3401 | 3700 |
| 0000415440 | 0006 | 1600 | 0200 | 3401 | A500 | 0022 | 0E00 | 0100 |
| 0000415460 | 3501 | 4D00 | 0006 | 1800 | 0200 | 3501 | B300 | 0022 |
| 0000415500 | 1000 | 0100 | 3601 | 6500 | 0006 | 1800 | 0200 | 3601 |
| 0000415520 | C300 | 0022 | 1000 | 0100 | 3701 | 7D00 | 0006 | 1900 |
| 0000415540 | 0200 | 3701 | D300 | 0022 | 1200 | 0100 | 3801 | 9600 |
| 0000415560 | 0006 | 1800 | 0200 | 3801 | E500 | 0022 | 4100 | 0100 |
| 0000415600 | 3901 | AE00 | 0006 | 1700 | 0200 | 3901 | 2600 | 0023 |
| 0000415620 | 0F00 | 0100 | 3A01 | C500 | 0006 | 1700 | 0200 | 3A01 |
| 0000415640 | 3500 | 0023 | 0E00 | 0100 | 3B01 | DC00 | 0006 | 1700 |
| 0000415660 | 0200 | 3B01 | 4300 | 0023 | 0E00 | 0100 | 3C01 | F300 |
| 0000415700 | 0006 | 1700 | 0200 | 3C01 | 5100 | 0023 | 0E00 | 0100 |
| 0000415720 | 3D01 | 0A00 | 0007 | 1700 | 0200 | 3D01 | 5F00 | 0023 |
| 0000415740 | 0E00 | 0100 | 3E01 | 2100 | 0007 | 1800 | 0200 | 3E01 |
| 0000415760 | 6D00 | 0023 | 0F00 | 0100 | 3F01 | 3900 | 0007 | 1800 |
| 0000416000 | 0200 | 3F01 | 7C00 | 0023 | 0F00 | 0100 | 4001 | 5100 |
| 0000416020 | 0007 | 1500 | 0200 | 4001 | 8B00 | 0023 | 0C00 | 0100 |
| 0000416040 | 4101 | 6600 | 0007 | 1500 | 0200 | 4101 | 9700 | 0023 |
| 0000416060 | 0C00 | 0100 | 4201 | 7B00 | 0007 | 1300 | 0200 | 4201 |
| 0000416100 | A300 | 0023 | 0B00 | 0100 | 4301 | 8E00 | 0007 | 1500 |
| 0000416120 | 0200 | 4301 | AE00 | 0023 | 0E00 | 0100 | 4401 | A300 |
| 0000416140 | 0007 | 1500 | 0200 | 4401 | BC00 | 0023 | 0C00 | 0100 |
| 0000416160 | 4501 | B800 | 0007 | 1700 | 0200 | 4501 | C800 | 0023 |
| 0000416200 | 1000 | 0100 | 4601 | CF00 | 0007 | 1900 | 0200 | 4601 |
| 0000416220 | D800 | 0023 | 5600 | 0100 | 4701 | E800 | 0007 | 1600 |

THU MAR 14 17:41:20 1991 LBIPMT.DLL PAGE 123, LINE 7199

| | | | | | | | | |
|---|---|---|---|---|---|---|---|---|
| 0000416240 | 0200 | 4701 | 2E00 | 0024 | 1D00 | 0100 | 4801 | FE00 |
| 0000416260 | 0007 | 1500 | 0200 | 4801 | 4B00 | 0024 | 0E00 | 0100 |
| 0000416300 | 4901 | 1300 | 0008 | 1A00 | 0200 | 4901 | 5900 | 0024 |
| 0000416320 | 1100 | 0100 | 4C01 | 2D00 | 0008 | 1A00 | 0200 | 4C01 |
| 0000416340 | 6A00 | 0024 | AB00 | 0100 | 4D01 | 4700 | 0008 | 1D00 |
| 0000416360 | 0200 | 4D01 | 1500 | 0025 | 2400 | 0100 | 4E01 | 6400 |
| 0000416400 | 0008 | 1600 | 0200 | 4E01 | 3900 | 0025 | 0F00 | 0100 |
| 0000416420 | 4F01 | 7A00 | 0008 | 1700 | 0200 | 4F01 | 4800 | 0025 |
| 0000416440 | 1000 | 0100 | 5001 | 9100 | 0008 | 1700 | 0200 | 5001 |
| 0000416460 | 5800 | 0025 | 1000 | 0100 | 5101 | A800 | 0008 | 1700 |
| 0000416500 | 0200 | 5101 | 6800 | 0025 | 0E00 | 0100 | 5201 | BF00 |
| 0000416520 | 0008 | 1600 | 0200 | 5201 | 7600 | 0025 | 0F00 | 0100 |
| 0000416540 | 5301 | D500 | 0008 | 1400 | 0200 | 5301 | 8500 | 0025 |
| 0000416560 | 0D00 | 0100 | 5401 | E900 | 0008 | 1300 | 0200 | 5401 |
| 0000416600 | 9200 | 0025 | 1C00 | 0100 | 5501 | FC00 | 0008 | 1800 |
| 0000416620 | 0200 | 5501 | AE00 | 0025 | 0D00 | 0100 | 5601 | 1400 |
| 0000416640 | 0009 | 1500 | 0200 | 5601 | BB00 | 0025 | 0E00 | 0100 |
| 0000416660 | 5701 | 2900 | 0009 | 1700 | 0200 | 5701 | C900 | 0025 |
| 0000416700 | 1100 | 0100 | 5801 | 4000 | 0009 | 1900 | 0200 | 5801 |
| 0000416720 | DA00 | 0025 | 0C00 | 0100 | 5901 | 5900 | 0009 | 1400 |
| 0000416740 | 0200 | 5901 | E600 | 0025 | 2C00 | 0100 | 5A01 | 6D00 |
| 0000416760 | 0009 | 1600 | 0200 | 5A01 | 1200 | 0026 | 4E00 | 0100 |
| 0000417000 | 5B01 | 8300 | 0009 | 1700 | 0200 | 5B01 | 6000 | 0026 |
| 0000417020 | 1100 | 0100 | 5C01 | 9A00 | 0009 | 1900 | 0200 | 5C01 |
| 0000417040 | 7100 | 0026 | 0F00 | 0100 | 5D01 | B300 | 0009 | 1400 |
| 0000417060 | 0200 | 5D01 | 8000 | 0026 | 1E00 | 0100 | 5E01 | C700 |
| 0000417100 | 0009 | 1700 | 0200 | 5E01 | 9E00 | 0026 | 0E00 | 0100 |
| 0000417120 | 5F01 | DE00 | 0009 | 1700 | 0200 | 5F01 | AC00 | 0026 |
| 0000417140 | 0E00 | 0100 | 6001 | F500 | 0009 | 1800 | 0200 | 6001 |
| 0000417160 | BA00 | 0026 | 0F00 | 0100 | 6101 | 0D00 | 000A | 1800 |
| 0000417200 | 0200 | 6101 | C900 | 0026 | 0F00 | 0100 | 6201 | 2500 |
| 0000417220 | 000A | 1800 | 0200 | 6201 | D800 | 0026 | 0E00 | 0100 |
| 0000417240 | 6301 | 3D00 | 000A | 1500 | 0200 | 6301 | E600 | 0026 |
| 0000417260 | 1F00 | 0100 | 6401 | 5200 | 000A | 1C00 | 0200 | 6401 |
| 0000417300 | 0500 | 0027 | 1000 | 0100 | 6501 | 6E00 | 000A | 1B00 |
| 0000417320 | 0200 | 6501 | 1500 | 0027 | 1C00 | 0100 | 6601 | 8900 |
| 0000417340 | 000A | 1600 | 0200 | 6601 | 3100 | 0027 | 2300 | 0100 |
| 0000417360 | 6701 | 9F00 | 000A | 1600 | 0200 | 6701 | 5400 | 0027 |
| 0000417400 | 1100 | 0100 | 6801 | B500 | 000A | 1600 | 0200 | 6801 |
| 0000417420 | 6500 | 0027 | 1100 | 0100 | 6901 | CB00 | 000A | 1500 |
| 0000417440 | 0200 | 6901 | 7600 | 0027 | 0F00 | 0100 | 6A01 | E000 |
| 0000417460 | 000A | 1500 | 0200 | 6A01 | 8500 | 0027 | 1F00 | 0100 |
| 0000417500 | 6B01 | F500 | 000A | 1500 | 0200 | 6B01 | A400 | 0027 |
| 0000417520 | 0F00 | 0100 | 6C01 | 0A00 | 000B | 1500 | 0200 | 6C01 |
| 0000417540 | B300 | 0027 | 0F00 | 0100 | 6D01 | 1F00 | 000B | 1600 |
| 0000417560 | 0200 | 6D01 | C200 | 0027 | 1000 | 0100 | 6E01 | 3500 |
| 0000417600 | 000B | 1600 | 0200 | 6E01 | D200 | 0027 | 1000 | 0100 |
| 0000417620 | 6F01 | 4B00 | 000B | 2300 | 0200 | 6F01 | E200 | 0027 |
| 0000417640 | 0300 | 0101 | 7001 | 6E00 | 000B | 2300 | 0200 | 7001 |
| 0000417660 | E500 | 0028 | 7A00 | 0102 | 7101 | 9100 | 000B | 2300 |
| 0000417700 | 0200 | 7101 | 5F00 | 002B | 1C00 | 0100 | 7201 | B400 |
| 0000417720 | 000B | 2300 | 0200 | 7201 | 7B00 | 002B | C200 | 0100 |
| 0000417740 | 7301 | D700 | 000B | 2300 | 0200 | 7301 | 3D00 | 002C |
| 0000417760 | C200 | 0100 | 7401 | FA00 | 000B | 2400 | 0200 | 7401 |
| 0000420000 | FF00 | 002C | 1100 | 0100 | 7501 | 1E00 | 000C | 2300 |
| 0000420020 | 0200 | 7501 | 1000 | 002D | 3A00 | 0100 | 7601 | 4100 |
| 0000420040 | 000C | 2400 | 0200 | 7601 | 4A00 | 002D | 2000 | 0100 |
| 0000420060 | 7701 | 6500 | 000C | 1E00 | 0200 | 7701 | 6A00 | 002D |
| 0000420100 | 1600 | 0100 | 7801 | 8300 | 000C | 1F00 | 0200 | 7801 |

THU MAR 14 17:41:20 1991   LBIPMT.DLL   PAGE 124, LINE 7258

```
0000420120  8000  002D  1000  0100  7901  A200  000C  1E00
0000420140  0200  7901  9000  002D  E800  0109  7A01  C000
0000420160  000C  1F00  0200  7A01  7800  0037  E500  0100
0000420200  7B01  DF00  000C  1D00  0200  7B01  5D00  0038
0000420220  1F00  0100  7C01  FC00  000C  1E00  0200  7C01
0000420240  7C00  0038  1000  0100  7D01  1A00  000D  1900
0000420260  0200  7D01  8C00  0038  7F00  0600  0001  8C00
0000420300  010D  1600  4E00  3042  F632  0118  0000
0000420315
```

THU MAR 14 17:41:54 1991 MASTER.TCF PAGE 1, LINE 1

| | | | | | | | | |
|---|---|---|---|---|---|---|---|---|
| 0000000000 | 0923 | 614D | 7473 | 7265 | 6320 | 6E6F | 6966 | 7567 |
| 0000000020 | 6172 | 6974 | 6E6F | 6620 | 6C69 | 0D65 | 230A | 4309 |
| 0000000040 | 6E6F | 6174 | 6E69 | 2073 | 6564 | 6166 | 6C75 | 7374 |
| 0000000060 | 6620 | 726F | 6120 | 6C6C | 7320 | 7379 | 6574 | 206D |
| 0000000100 | 6F63 | 666E | 6769 | 7275 | 7461 | 6F69 | 206E | 6170 |
| 0000000120 | 6172 | 656D | 6574 | 7372 | 0D2E | 230A | 4C09 | 636F |
| 0000000140 | 7461 | 6F69 | 206E | 203A | 3A69 | 745C | 3231 | 5C33 |
| 0000000160 | 6164 | 2074 | 6428 | 7461 | 6420 | 7269 | 6365 | 6F74 |
| 0000000200 | 7972 | 7020 | 7261 | 6C61 | 656C | 206C | 6F74 | 7420 |
| 0000000220 | 6568 | 4420 | 2042 | 6C64 | 296C | 0D2E | 230A | 3309 |
| 0000000240 | 322E | 392E | 0931 | 4120 | 656C | 2078 | 7A41 | 6C75 |
| 0000000260 | 7961 | 0D2E | 0D0A | 0D0A | 230A | 2D20 | 2D2D | 2D2D |
| 0000000300 | 2D2D | 2D2D | 2D2D | 2D2D | 202D | 6F43 | 736E | 6174 |
| 0000000320 | 6E74 | 7374 | 7520 | 6573 | 2064 | 6E69 | 6320 | 6E6F |
| 0000000340 | 6966 | 7567 | 6172 | 6974 | 6E6F | 6620 | 6C69 | 2065 |
| 0000000360 | 2D2D | 2D2D | 2D2D | 2D2D | 2D2D | 2D2D | 0D2D | 540A |
| 0000000400 | 3231 | 5F33 | 5845 | 5F45 | 4150 | 4854 | 0920 | 203D |
| 0000000420 | 3A69 | 5C5C | 3174 | 3332 | 5C5C | 6962 | 096E | 0909 |
| 0000000440 | 2309 | 4520 | 6578 | 7563 | 6174 | 6C62 | 7365 | 6420 |
| 0000000460 | 7269 | 6365 | 6F74 | 7972 | 7020 | 7461 | 0D68 | 540A |
| 0000000500 | 3231 | 5F33 | 4144 | 5F54 | 4150 | 4854 | 0920 | 203D |
| 0000000520 | 3A69 | 5C5C | 3174 | 3332 | 5C5C | 6164 | 0974 | 0909 |
| 0000000540 | 2309 | 4420 | 7461 | 6420 | 7269 | 6365 | 6F74 | 7972 |
| 0000000560 | 7020 | 7461 | 0D68 | 540A | 3231 | 5F33 | 4553 | 5554 |
| 0000000600 | 5F50 | 4150 | 4854 | 3D09 | 2420 | 5428 | 3231 | 5F33 |
| 0000000620 | 4144 | 5F54 | 4150 | 4854 | 5C29 | 735C | 7465 | 7075 |
| 0000000640 | 2309 | 5320 | 7465 | 7075 | 6420 | 7269 | 6365 | 6F74 |
| 0000000660 | 7972 | 7020 | 7461 | 0D68 | 0D0A | 0D0A | 230A | 2D20 |
| 0000000700 | 2D2D | 2D2D | 2D2D | 2D2D | 2D2D | 2D2D | 2D2D | 2D2D |
| 0000000720 | 2D2D | 2D2D | 2D2D | 202D | 6C47 | 626F | 6C61 | 4C20 |
| 0000000740 | 6269 | 6172 | 6972 | 7365 | 2D20 | 2D2D | 2D2D | 2D2D |
| 0000000760 | 2D2D | 2D2D | 2D2D | 2D2D | 2D2D | 2D2D | 2D2D | 2D2D |
| 0000001000 | 202D | 0A0D | 0A0D | 3154 | 3332 | 475F | 4F4C | 5F42 |
| 0000001020 | 4946 | 544C | 5245 | 4C5F | 4249 | 3D20 | 2020 | 3A74 |
| 0000001040 | 092F | 0909 | 2023 | 6C47 | 626F | 6C61 | 4620 | 6C69 |
| 0000001060 | 6574 | 7372 | 6C20 | 6269 | 6172 | 7972 | 6620 | 6C6F |
| 0000001100 | 6564 | 2E72 | 0A0D | 3154 | 3332 | 475F | 4F4C | 5F42 |
| 0000001120 | 4F50 | 4E49 | 4554 | 5F52 | 494C | 2042 | 203D | 3A74 |
| 0000001140 | 092F | 0909 | 2023 | 6C47 | 626F | 6C61 | 5020 | 696F |
| 0000001160 | 746E | 7265 | 2073 | 696C | 7262 | 7261 | 2079 | 6F66 |
| 0000001200 | 646C | 7265 | 0D2E | 0D0A | 0D0A | 230A | 2D20 | 2D2D |
| 0000001220 | 2D2D | 2D2D | 2D2D | 2D2D | 2D2D | 2D2D | 2D2D | 2D2D |
| 0000001240 | 2D2D | 2D2D | 2D2D | 5520 | 6573 | 2072 | 6544 | 6166 |
| 0000001260 | 6C75 | 7374 | 2D20 | 2D2D | 2D2D | 2D2D | 2D2D | 2D2D |
| 0000001300 | 2D2D | 2D2D | 2D2D | 2D2D | 2D2D | 2D2D | 2D2D | 202D |
| 0000001320 | 0A0D | 0A0D | 2023 | 3154 | 3332 | 545F | 4552 | 5F45 |
| 0000001340 | 5244 | 5649 | 2045 | 203D | 3A74 | 092F | 0909 | 2023 |
| 0000001360 | 6544 | 6166 | 6C75 | 2074 | 7254 | 6565 | 7520 | 6573 |
| 0000001400 | 2E64 | 0A0D | 2023 | 3154 | 3332 | 535F | 4145 | 4352 |
| 0000001420 | 5F48 | 4150 | 4854 | 3D20 | 2E20 | 0909 | 2309 | 4420 |
| 0000001440 | 6665 | 7561 | 746C | 5320 | 6165 | 6372 | 2068 | 6150 |
| 0000001460 | 6874 | 0D2E | 0D0A | 0D0A | 230A | 2D2D | 2D2D | 2D2D |
| 0000001500 | 2D2D | 2D2D | 2D2D | 2D2D | 2D2D | 2D2D | 2D2D | 202D |
| 0000001520 | 614D | 6863 | 6E69 | 2065 | 6843 | 7261 | 6361 | 6574 |
| 0000001540 | 6972 | 7473 | 6369 | 2D20 | 2D2D | 2D2D | 2D2D | 2D2D |
| 0000001560 | 2D2D | 2D2D | 2D2D | 2D2D | 2D2D | 2D2D | 0A0D | 0A0D |
| 0000001600 | 2D23 | 202D | 6353 | 6572 | 6E65 | 3A20 | 0A0D | 0A0D |
| 0000001620 | 3154 | 3332 | 535F | 5243 | 445F | 5045 | 4854 | 0920 |
| 0000001640 | 3D09 | 3820 | 0909 | 2309 | 5320 | 7263 | 6565 | 206E |

THU MAR 14 17:41:54 1991 MASTER.TCF PAGE 2, LINE 60

| | | | | | | | | |
|---|---|---|---|---|---|---|---|---|
| 0000001660 | 6544 | 7470 | 0D68 | 540A | 3231 | 5F33 | 4353 | 5F52 |
| 0000001700 | 414C | 5F59 | 4544 | 5450 | 2048 | 3D09 | 3820 | 0909 |
| 0000001720 | 2309 | 4920 | 746E | 7265 | 616E | 206C | 7355 | 0D65 |
| 0000001740 | 540A | 3231 | 5F33 | 4353 | 5F52 | 4957 | 5444 | 2048 |
| 0000001760 | 0909 | 203D | 3436 | 0930 | 2309 | 5320 | 7263 | 6565 |
| 0000002000 | 206E | 6957 | 7464 | 2068 | 6E69 | 7020 | 7869 | 6C65 |
| 0000002020 | 0D73 | 540A | 3231 | 5F33 | 4353 | 5F52 | 4548 | 4749 |
| 0000002040 | 5448 | 0920 | 203D | 3834 | 0930 | 2309 | 5320 | 7263 |
| 0000002060 | 6565 | 206E | 6548 | 6769 | 7468 | 6920 | 206E | 6970 |
| 0000002100 | 6578 | 736C | 0A0D | 0A0D | 3154 | 3332 | 475F | 5053 |
| 0000002120 | 485F | 4245 | 4E4C | 094B | 3D09 | 3120 | 0909 | 2309 |
| 0000002140 | 4820 | 726F | 7A69 | 6E6F | 6174 | 206C | 6E65 | 2064 |
| 0000002160 | 6C62 | 6E61 | 0D6B | 540A | 3231 | 5F33 | 5347 | 5F50 |
| 0000002200 | 5348 | 4C42 | 4B4E | 0909 | 203D | 3834 | 0909 | 2023 |
| 0000002220 | 6F48 | 6972 | 6F7A | 746E | 6C61 | 7320 | 6174 | 7472 |
| 0000002240 | 6220 | 616C | 6B6E | 0A0D | 3154 | 3332 | 475F | 5053 |
| 0000002260 | 485F | 5345 | 4E59 | 0943 | 3D09 | 3220 | 0934 | 2309 |
| 0000002300 | 4820 | 726F | 7A69 | 6E6F | 6174 | 206C | 6E65 | 2064 |
| 0000002320 | 7973 | 636E | 202E | 203D | 4828 | 4253 | 4E4C | 204B |
| 0000002340 | 202B | 4548 | 4C42 | 4B4E | 2029 | 202F | 0D32 | 540A |
| 0000002360 | 3231 | 5F33 | 5347 | 5F50 | 4556 | 4C42 | 4B4E | 0909 |
| 0000002400 | 203D | 3333 | 0909 | 2023 | 6556 | 7472 | 6369 | 6C61 |
| 0000002420 | 6520 | 646E | 6220 | 616C | 6B6E | 0A0D | 3154 | 3332 |
| 0000002440 | 475F | 5053 | 565F | 4253 | 4E4C | 094B | 3D09 | 3520 |
| 0000002460 | 3431 | 0909 | 2023 | 6556 | 7472 | 6369 | 6C61 | 7320 |
| 0000002500 | 6174 | 7472 | 6220 | 616C | 6B6E | 0A0D | 3154 | 3332 |
| 0000002520 | 475F | 5053 | 565F | 5345 | 4E59 | 0943 | 3D09 | 3220 |
| 0000002540 | 3436 | 0909 | 2023 | 6556 | 7472 | 6369 | 6C61 | 6520 |
| 0000002560 | 646E | 7320 | 6E79 | 2E63 | 3D20 | 2820 | 5356 | 4C42 |
| 0000002600 | 4B4E | 2B20 | 5620 | 4245 | 4E4C | 294B | 2F2D | 3220 |
| 0000002620 | 0A0D | 0A0D | 3154 | 3332 | 475F | 5053 | 545F | 4D49 |
| 0000002640 | 5245 | 0909 | 203D | 3034 | 0909 | 0A0D | 3154 | 3332 |
| 0000002660 | 465F | 4E49 | 5F45 | 4F48 | 4952 | 5F5A | 4944 | 5053 |
| 0000002700 | 3D20 | 3020 | 0A0D | 0A0D | 0A0D | 2D23 | 202D | 654B |
| 0000002720 | 6279 | 616F | 6472 | 3A20 | 0A0D | 0A0D | 3154 | 3332 |
| 0000002740 | 495F | 504E | 4B5F | 4442 | 4E5F | 4D41 | 0945 | 3D09 |
| 0000002760 | 2420 | 5428 | 3231 | 5F33 | 4553 | 5554 | 5F50 | 4150 |
| 0000003000 | 4854 | 5C29 | 705C | 7563 | 2E73 | 626B | 0964 | 2320 |
| 0000003020 | 4B20 | 4442 | 6420 | 6665 | 6E69 | 7469 | 6F69 | 206E |
| 0000003040 | 6966 | 656C | 0A0D | 3154 | 3332 | 495F | 504E | 435F |
| 0000003060 | 5041 | 5F53 | 4853 | 4649 | 5F54 | 5055 | 4550 | 2052 |
| 0000003100 | 203D | 4146 | 534C | 0D45 | 090A | 0909 | 0909 | 0909 |
| 0000003120 | 2023 | 6E49 | 7020 | 2C63 | 7020 | 6572 | 7373 | 6E69 |
| 0000003140 | 2067 | 6163 | 7370 | 732B | 6968 | 7466 | 7020 | 6F72 |
| 0000003160 | 7564 | 6563 | 2073 | 6F6C | 6577 | 6372 | 7361 | 0D65 |
| 0000003200 | 540A | 3231 | 5F33 | 4E49 | 5F50 | 4B4D | 5945 | 0953 |
| 0000003220 | 0909 | 203D | 7830 | 3130 | 5209 | 6769 | 7468 | 5C20 |
| 0000003240 | 0909 | 0909 | 2009 | 2023 | 654B | 7379 | 7320 | 6D79 |
| 0000003260 | 6F62 | 696C | 2063 | 616E | 656D | 0D73 | 090A | 0909 |
| 0000003300 | 0909 | 2009 | 3020 | 3078 | 0934 | 654C | 7466 | 0A0D |
| 0000003320 | 3154 | 3332 | 495F | 504E | 525F | 4C45 | 4145 | 4553 |
| 0000003340 | 5F44 | 4B4D | 5945 | 2053 | 203D | 0930 | 0909 | 0909 |
| 0000003360 | 2023 | 6156 | 756C | 2065 | 6877 | 6E65 | 6120 | 6C6C |
| 0000003400 | 6220 | 7475 | 6F74 | 736E | 7220 | 6C65 | 6165 | 6573 |
| 0000003420 | 0D64 | 540A | 3231 | 5F33 | 4E49 | 5F50 | 4B4D | 5945 |
| 0000003440 | 505F | 4552 | 5353 | 495F | 5F53 | 2031 | 203D | 5254 |
| 0000003460 | 4555 | 0909 | 0909 | 2023 | 2031 | 6573 | 646E | 7720 |
| 0000003500 | 6568 | 206E | 7270 | 7365 | 6573 | 2064 | 7562 | 7474 |
| 0000003520 | 6E6F | 0D2E | 0D0A | 540A | 3231 | 5F33 | 414D | 5F58 |

THU MAR 14 17:41:54 1991 MASTER.TCF PAGE 3, LINE 119

| | | | | | | | | |
|---|---|---|---|---|---|---|---|---|
| 0000003540 | 4544 | 414C | 0959 | 3D09 | 3520 | 0D30 | 0D0A | 0D0A |
| 0000003560 | 230A | 2D2D | 4D20 | 756F | 6573 | 3A20 | 0A0D | 0A0D |
| 0000003600 | 3154 | 3332 | 495F | 504E | 535F | 464F | 5754 | 5241 |
| 0000003620 | 0945 | 3D09 | 2420 | 5428 | 3231 | 5F33 | 5845 | 5F45 |
| 0000003640 | 4150 | 4854 | 5C29 | 735C | 7475 | 6966 | 656C | 682E |
| 0000003660 | 7865 | 0D09 | 540A | 3231 | 5F33 | 5347 | 5F50 | 4F53 |
| 0000003700 | 5446 | 4157 | 4552 | 0909 | 203D | 2824 | 3154 | 3332 |
| 0000003720 | 455F | 4558 | 505F | 5441 | 2948 | 5C5C | 7367 | 6D70 |
| 0000003740 | 6E6F | 382E | 0909 | 0A0D | 3154 | 3332 | 495F | 504E |
| 0000003760 | 505F | 494F | 544E | 5245 | 545F | 5059 | 2045 | 3D09 |
| 0000004000 | 7220 | 6C65 | 0909 | 0909 | 0909 | 2009 | 2023 | 6552 |
| 0000004020 | 616C | 6974 | 6576 | 2020 | 2020 | 2020 | 0A0D | 3154 |
| 0000004040 | 3332 | 495F | 504E | 505F | 494F | 544E | 5245 | 4E5F |
| 0000004060 | 4D41 | 2045 | 3D09 | 4D20 | 4349 | 4F52 | 4F53 | 5446 |
| 0000004100 | 0909 | 0909 | 0909 | 2320 | 4D20 | 6369 | 6F72 | 6F73 |
| 0000004120 | 7466 | 4D20 | 756F | 6573 | 0A0D | 3154 | 3332 | 495F |
| 0000004140 | 504E | 535F | 4143 | 454C | 465F | 4E55 | 0943 | 3D09 |
| 0000004160 | 2420 | 5428 | 3231 | 5F33 | 4144 | 5F54 | 4150 | 4854 |
| 0000004200 | 5C29 | 735C | 6163 | 656C | 732E | 6C63 | 2009 | 2023 |
| 0000004220 | 6F50 | 6E69 | 6574 | 2072 | 6373 | 6C61 | 2065 | 7566 |
| 0000004240 | 636E | 0D2E | 540A | 3231 | 5F33 | 4F4D | 5355 | 5F45 |
| 0000004260 | 5254 | 4341 | 494B | 474E | 0909 | 203D | 4E4F | 0920 |
| 0000004300 | 0909 | 0909 | 0909 | 2320 | 4E20 | 746F | 7520 | 6573 |
| 0000004320 | 2E64 | 0A0D | 0A0D | 0A0D | 2D23 | 2D2D | 2D2D | 2D2D |
| 0000004340 | 2D2D | 2D2D | 2D2D | 2D2D | 2D2D | 2D2D | 2D2D | 2D2D |
| 0000004360 | 2D2D | 4320 | 5652 | 5020 | 7261 | 6D61 | 7465 | 7265 |
| 0000004400 | 2073 | 2D2D | 2D2D | 2D2D | 2D2D | 2D2D | 2D2D | 2D2D |
| 0000004420 | 2D2D | 2D2D | 2D2D | 2D2D | 2D2D | 0D2D | 0D0A | 540A |
| 0000004440 | 3231 | 5F33 | 4854 | 4552 | 4853 | 4C4F | 0944 | 0909 |
| 0000004460 | 203D | 0930 | 0909 | 2023 | 6E49 | 7020 | 7869 | 6C65 |
| 0000004500 | 0D73 | 540A | 3231 | 5F33 | 4953 | 5F47 | 4854 | 4552 |
| 0000004520 | 4853 | 4C4F | 0944 | 3D09 | 3020 | 0909 | 2309 | 4920 |
| 0000004540 | 206E | 6572 | 7463 | 6E61 | 6C67 | 7365 | 0A0D | 3154 |
| 0000004560 | 3332 | 535F | 4154 | 4942 | 494C | 5954 | 0909 | 3D09 |
| 0000004600 | 3320 | 0909 | 2309 | 3320 | 4620 | 6172 | 656D | 2073 |
| 0000004620 | 7473 | 6261 | 6C69 | 7469 | 2E79 | 0A0D | 3154 | 3332 |
| 0000004640 | 435F | 5041 | 5554 | 4552 | 545F | 4D49 | 4F45 | 5455 |
| 0000004660 | 0920 | 203D | 3032 | 3030 | 0909 | 2023 | 2032 | 6553 |
| 0000004700 | 6F63 | 646E | 7420 | 6D69 | 6F65 | 7475 | 6620 | 726F |
| 0000004720 | 6D20 | 7369 | 616D | 6374 | 2068 | 6373 | 6572 | 6E65 |
| 0000004740 | 0D2E | 540A | 3231 | 5F33 | 5953 | 434E | 545F | 4D49 |
| 0000004760 | 4F45 | 5455 | 0920 | 3D09 | 3220 | 3030 | 0930 | 2309 |
| 0000005000 | 3220 | 5320 | 6365 | 6E6F | 7364 | 7420 | 6D69 | 6F65 |
| 0000005020 | 7475 | 6620 | 726F | 7320 | 6E79 | 6863 | 6F72 | 696E |
| 0000005040 | 617A | 6974 | 6E6F | 0D2E | 540A | 3231 | 5F33 | 4544 |
| 0000005060 | 4146 | 4C55 | 5F54 | 4954 | 454D | 0920 | 3D09 | 3320 |
| 0000005100 | 0930 | 2309 | 3320 | 2030 | 736D | 0D2E | 0D0A | 0D0A |
| 0000005120 | 0D0A | 230A | 2D20 | 2D2D | 2D2D | 2D2D | 2D2D | 2D2D |
| 0000005140 | 2D2D | 2D2D | 2D2D | 2D2D | 202D | 4350 | 6820 | 746F |
| 0000005160 | 656B | 7379 | 6120 | 646E | 7320 | 666F | 6B74 | 7965 |
| 0000005200 | 2073 | 2D2D | 2D2D | 2D2D | 2D2D | 2D2D | 2D2D | 2D2D |
| 0000005220 | 2D2D | 2D2D | 2D2D | 202D | 0A0D | 0A0D | 3154 | 3332 |
| 0000005240 | 495F | 504E | 535F | 464F | 4B54 | 5945 | 3D20 | 2209 |
| 0000005260 | 6863 | 6365 | 5F6B | 6373 | 6572 | 6E65 | 2D20 | 3020 |
| 0000005300 | 4478 | 3A41 | 7270 | 7365 | 2C73 | 3020 | 4478 | 3A41 |
| 0000005320 | 6572 | 656C | 7361 | 2265 | 0909 | 0D5C | 090A | 0909 |
| 0000005340 | 0909 | 6D22 | 6E61 | 6175 | 5F6C | 7973 | 636E | 2D20 |
| 0000005360 | 3020 | 3078 | 3A37 | 7270 | 7365 | 2C73 | 3020 | 3078 |
| 0000005400 | 3A37 | 6572 | 656C | 7361 | 2265 | 0909 | 0D5C | 090A |

THU MAR 14 17:41:54 1991 MASTER.TCF PAGE 4, LINE 178

```
0000005420  0909  0909  6322  6568  6B63  735F  7263  6565
0000005440  206E  202D  7830  3937  703A  6572  7373  202C
0000005460  7830  3937  723A  6C65  6165  6573  0D22  0D0A
0000005500  540A  3231  5F33  4E49  5F50  4F48  4B54  5945
0000005520  3D20  2209  7830  4135  703A  6572  7373  202C
0000005540  7830  4135  723A  6C65  6165  6573  0922  0909
0000005560  0909  0D09  0D0A  0D0A  230A  2D20  2D2D  2D2D
0000005600  2D2D  2D2D  2D2D  2D2D  2D2D  2D2D  2D2D  202D
0000005620  654D  6964  2074  6F63  746E  6F72  206C  6176
0000005640  6972  6261  656C  2073  2D2D  2D2D  2D2D  2D2D
0000005660  2D2D  2D2D  2D2D  2D2D  2D2D  2D2D  0D2D  0D0A
0000005700  540A  3231  5F33  5F45  4D43  303D  0A0D  0A0D
0000005720  0A0D  2023  2D2D  2D2D  2D2D  2D2D  2D2D  2D2D
0000005740  2D2D  2D2D  2D2D  2D2D  2D2D  2D2D  2D2D  4420
0000005760  2042  6E49  6574  6E72  6C61  2073  2D2D  2D2D
0000006000  2D2D  2D2D  2D2D  2D2D  2D2D  2D2D  2D2D  2D2D
0000006020  2D2D  2D2D  2D2D  0D20  0D0A  230A  2D2D  4120
0000006040  6363  6C65  7265  7461  6465  6D20  646F  2065
0000006060  6E69  6964  6163  6F74  7372  3A20  0A0D  0A0D
0000006100  3154  3332  535F  5243  5F4E  4D49  5F47  4341
0000006120  0943  203D  4146  534C  0D45  540A  3231  5F33
0000006140  4944  4646  495F  474D  415F  4343  3D09  4620
0000006160  4C41  4553  0A0D  3154  3332  535F  4E59  5F43
0000006200  4D49  5F47  4341  0943  203D  4146  534C  0D45
0000006220  540A  3231  5F33  544D  475F  5F4E  4341  0943
0000006240  3D09  4620  4C41  4553  0A0D  3154  3332  535F
0000006260  5F45  4E47  415F  4343  0909  203D  4146  534C
0000006300  0D45  540A  3231  5F33  4C54  475F  5F4E  4341
0000006320  0943  3D09  4620  4C41  4553  0A0D  0A0D  0A0D
0000006340  0A0D  2D23  2D2D  2D2D  2D2D  2D2D  202D  6F4C
0000006360  6163  206C  6374  2066  202D  6F63  746E  6961
0000006400  736E  6D20  6361  6968  656E  7320  6570  6963
0000006420  6966  2063  6170  6172  656D  6574  7372  2D20
0000006440  2D2D  2D2D  2D2D  0D2D  230A  6C20  636F  6C61
0000006460  742E  6663  2D20  6D20  7375  2074  7865  7869
0000006500  7473  6F20  206E  6E61  2079  616D  6863  6E69
0000006520  2065  7572  6E6E  6E69  2067  6554  7473  7552
0000006540  6E6E  7265  0D2E  0D0A  400A  6E69  6C63  6475
0000006560  2065  2209  6340  5C3A  6F6C  6163  2E6C  6374
0000006600  2266  0A0D
0000006604
```

THU MAR 14 17:42:50 1991 MEDIT.DLL PAGE 1, LINE 1

| | | | | | | | | |
|---|---|---|---|---|---|---|---|---|
| 0000000000 | 5A4D | 001F | 008F | 0000 | 0004 | 0000 | FFFF | 0000 |
| 0000000020 | 00B6 | 0000 | 0000 | 0000 | 0040 | 0000 | 0000 | 0000 |
| 0000000040 | 0000 | 0000 | 0000 | 0000 | 0000 | 0000 | 0000 | 0000 |
| 0000000060 | 0000 | 0000 | 0000 | 0000 | 0000 | 0000 | 0000 | 0000 |
| 0000000100 | 1F0E | 0EBA | B400 | CD09 | B821 | 4C01 | 0080 | 0000 |
| 0000000120 | 7369 | 7020 | 6F72 | 7267 | 6D61 | 6320 | 21CD | 6854 |
| 0000000140 | 2074 | 7572 | 206E | 6E69 | 4420 | 534F | 6E61 | 6F6E |
| 0000000160 | 2E65 | 0D0D | 240A | 0000 | 0000 | 0000 | 6D20 | 646F |
| 0000000200 | 454E | 0A05 | 0724 | 00EB | A222 | 22E3 | 0000 | 0000 |
| 0000000220 | 0000 | 0000 | DB12 | 0001 | 0000 | 0000 | 8006 | 0005 |
| 0000000240 | 003B | 0040 | 0068 | 0068 | 060B | 061B | 0005 | 0008 |
| 0000000260 | 0000 | 0004 | 0000 | 0001 | 0000 | 0000 | 088F | 0000 |
| 0000000300 | 008D | FC8D | 0D00 | FC8E | 1085 | 00C6 | 0000 | 0000 |
| 0000000320 | 0000 | 0000 | 0C01 | 0850 | 0000 | 0000 | 0C01 | 0100 |
| 0000000340 | 1092 | 12D5 | 0D01 | 13C0 | 4D05 | 4445 | 0C01 | 08E6 |
| 0000000360 | 450D | 425F | 5F55 | 4F4C | 4B43 | 425F | 5449 | 0000 |
| 0000000400 | 4510 | 425F | 5F55 | 4F43 | 4E55 | 5F54 | 4655 | 0001 |
| 0000000420 | 0253 | 0A00 | 5F45 | 4D43 | 415F | 4F42 | 494C | 454E |
| 0000000440 | 450C | 425F | 4F4C | 4B43 | 435F | 504F | 5452 | 0003 |
| 0000000460 | 5F45 | 5543 | 5352 | 524F | 485F | 4449 | 0459 | 0D00 |
| 0000000500 | 5F45 | 5542 | 445F | 4C45 | 5445 | 5F45 | 0545 | 1000 |
| 0000000520 | 0006 | 450F | 425F | 5F55 | 4E55 | 4F4C | 494C | 454E |
| 0000000540 | 4655 | 0007 | 4510 | 545F | 5F57 | 4944 | 4B43 | 425F |
| 0000000560 | 5243 | 4545 | 084E | 1100 | 5F45 | 5542 | 5053 | 535F |
| 0000000600 | 425F | 4655 | 4E5F | 4D41 | 0945 | 1100 | 475F | 5445 |
| 0000000620 | 475F | 5445 | 4E5F | 5845 | 5F54 | 5542 | 5F45 | 5542 |
| 0000000640 | 5F45 | 4C43 | 534F | 0B45 | 0600 | 5F45 | 0A46 | 0700 |
| 0000000660 | 000C | 4512 | 435F | 5F4D | 4553 | 5F54 | 4E49 | 5449 |
| 0000000700 | 485F | 4F4F | 0D4B | 1000 | 5F45 | 4D45 | 4157 | 5449 |
| 0000000720 | 445F | 5349 | 4C50 | 5941 | 000E | 450F | 535F | 5445 |
| 0000000740 | 4C43 | 534F | 5F45 | 4946 | 454C | 000F | 425F | 5F55 |
| 0000000760 | 5F4D | 4553 | 5F54 | 5845 | 4345 | 5455 | 4515 | 435F |
| 0000001000 | 4741 | 0010 | 450E | 495F | 5F53 | 5455 | 5F45 | 4C46 |
| 0000001020 | 4E49 | 1145 | 1800 | 5F45 | 5542 | 5845 | 4345 | 4C5F |
| 0000001040 | 4550 | 5F4E | 4554 | 5453 | 4E5F | 475F | 5445 | 4F5F |
| 0000001060 | 450F | 435F | 5F4D | 4553 | 5F54 | 4D41 | 5345 | 0012 |
| 0000001100 | 0013 | 450B | 425F | 4F4C | 4B43 | 5542 | 4646 | 5245 |
| 0000001120 | 4511 | 425F | 5F55 | 4553 | 5F54 | 445F | 4C45 | 0014 |
| 0000001140 | 454D | 0015 | 4513 | 425F | 5F55 | 5542 | 5F46 | 414E |
| 0000001160 | 4C54 | 5F45 | 4150 | 5452 | 0016 | 4553 | 5F54 | 4954 |
| 0000001200 | 4545 | 5F4E | 4552 | 5244 | 5741 | 450F | 535F | 5243 |
| 0000001220 | 5F55 | 4547 | 5F54 | 5542 | 5F46 | 0017 | 450F | 425F |
| 0000001240 | 425F | 5F55 | 4544 | 5F4C | 5453 | 4F4E | 0018 | 450C |
| 0000001260 | 5542 | 495F | 534E | 5245 | 5F54 | 1952 | 1900 | 5F45 |
| 0000001300 | 5F54 | 4F50 | 4E49 | 1A54 | 1100 | 4843 | 5241 | 415F |
| 0000001320 | 534E | 5245 | 5F54 | 494C | 454E | 5F45 | 5754 | 495F |
| 0000001340 | 4353 | 4552 | 4E45 | 555F | 4450 | 1B53 | 1600 | 5F45 |
| 0000001360 | 505F | 534F | 001C | 450D | 435F | 5441 | 5F45 | 4D43 |
| 0000001400 | 4853 | 574F | 001D | 450D | 435F | 5255 | 4F53 | 5F52 |
| 0000001420 | 4F4D | 4556 | 001E | 450D | 425F | 5255 | 4F53 | 5F52 |
| 0000001440 | 5445 | 4843 | 001F | 450E | 425F | 4655 | 555F | 474E |
| 0000001460 | 465F | 4C49 | 2045 | 1000 | 5F45 | 5F55 | 4552 | 4441 |
| 0000001500 | 5245 | 5F54 | 4843 | 5241 | 0021 | 5542 | 495F | 534E |
| 0000001520 | 4547 | 5F54 | 4944 | 5053 | 535F | 4514 | 425F | 5F55 |
| 0000001540 | 0B00 | 5F45 | 5542 | 505F | 5455 | 4154 | 5554 | 2253 |
| 0000001560 | 5F45 | 454E | 5F57 | 4D43 | 5455 | 5453 | 2352 | 1100 |
| 0000001600 | 2445 | 1600 | 5F45 | 5641 | 475F | 5445 | 4C5F | 4E49 |
| 0000001620 | 5F54 | 4E57 | 5F44 | 5641 | 4F49 | 435F | 494C | 4E45 |
| 0000001640 | 5F4D | 494C | 454E | 0026 | 4514 | 455F | 4509 | 435F |

THU MAR 14 17:42:50 1991 MEDIT.DLL PAGE 2, LINE 60

| | | | | | | | | |
|---|---|---|---|---|---|---|---|---|
| 0000001660 | 5F54 | 4944 | 5053 | 535F | 4154 | 5554 | 2753 | 1100 |
| 0000001700 | 5F45 | 5754 | 445F | 4C45 | 5445 | 5F45 | 494C | 454E |
| 0000001720 | 2853 | 0D00 | 5F45 | 5542 | 445F | 4C45 | 435F | 4148 |
| 0000001740 | 2952 | 1200 | 5F45 | 5542 | 475F | 5445 | 4C5F | 434F |
| 0000001760 | 5F4B | 5453 | 5441 | 002A | 4514 | 425F | 5F55 | 4C43 |
| 0000002000 | 534F | 5F45 | 414C | 5453 | 4C5F | 4E49 | 2B45 | 1500 |
| 0000002020 | 5F45 | 5542 | 495F | 534E | 535F | 5254 | 415F | 5F54 |
| 0000002040 | 4F50 | 4E49 | 2C54 | 0F00 | 5F45 | 5542 | 4F5F | 4550 |
| 0000002060 | 524E | 465F | 4C49 | 2D45 | 1500 | 5F45 | 5542 | 475F |
| 0000002100 | 5445 | 435F | 5255 | 4252 | 4655 | 4E5F | 4D41 | 2E45 |
| 0000002120 | 1000 | 5F45 | 4353 | 4552 | 4E45 | 525F | 4645 | 4552 |
| 0000002140 | 4853 | 002F | 4515 | 415F | 4956 | 5F4F | 5246 | 4D41 |
| 0000002160 | 5F45 | 4E57 | 5F44 | 5250 | 434F | 0030 | 4517 | 455F |
| 0000002200 | 5F4D | 4547 | 5F54 | 5845 | 4345 | 5455 | 4F49 | 5F4E |
| 0000002220 | 494C | 454E | 0031 | 450F | 425F | 5F55 | 5257 | 5449 |
| 0000002240 | 5F45 | 4946 | 454C | 0032 | 450C | 425F | 5F55 | 4944 |
| 0000002260 | 5053 | 414C | 3359 | 1000 | 5F45 | 5641 | 4F49 | 465F |
| 0000002300 | 4E4F | 5F54 | 4953 | 455A | 0034 | 450C | 425F | 5F55 |
| 0000002320 | 4E49 | 5F53 | 5453 | 3552 | 0F00 | 5F45 | 5542 | 4F5F |
| 0000002340 | 4550 | 574E | 465F | 4C49 | 3645 | 0C00 | 5F45 | 5754 |
| 0000002360 | 435F | 524C | 455F | 4C4F | 0037 | 450D | 435F | 5F4D |
| 0000002400 | 4547 | 5F54 | 494C | 454E | 0038 | 4513 | 425F | 5F55 |
| 0000002420 | 5349 | 425F | 4655 | 435F | 4148 | 474E | 4445 | 0039 |
| 0000002440 | 450D | 425F | 5F55 | 4547 | 5F54 | 494C | 454E | 003A |
| 0000002460 | 450A | 435F | 5F4D | 4E55 | 5550 | 3B54 | 1500 | 5F45 |
| 0000002500 | 4D43 | 535F | 5445 | 525F | 4C45 | 4145 | 4553 | 485F |
| 0000002520 | 4F4F | 3C4B | 1300 | 5F45 | 4F4E | 4954 | 5946 | 4E5F |
| 0000002540 | 5345 | 5F54 | 454C | 4556 | 3D4C | 0D00 | 5F45 | 4C42 |
| 0000002560 | 434F | 5F4B | 4150 | 5453 | 3E45 | 1000 | 5F45 | 5542 |
| 0000002600 | 4C5F | 4E49 | 5F45 | 454C | 474E | 4854 | 003F | 450B |
| 0000002620 | 435F | 5F4D | 5542 | 4646 | 5245 | 0040 | 450E | 435F |
| 0000002640 | 5255 | 4F53 | 5F52 | 4853 | 5041 | 4145 | 1000 | 5F45 |
| 0000002660 | 4547 | 5F54 | 4F4D | 5355 | 5F45 | 494C | 454E | 0042 |
| 0000002700 | 4509 | 525F | 5345 | 4154 | 5452 | 0043 | 4514 | 535F |
| 0000002720 | 5243 | 4545 | 5F4E | 4543 | 544E | 5245 | 4C5F | 4E49 |
| 0000002740 | 4445 | 1300 | 5F45 | 5542 | 475F | 5445 | 435F | 5255 |
| 0000002760 | 4252 | 4655 | 4E5F | 454F | 1400 | 5F45 | 5542 | 465F |
| 0000003000 | 4552 | 5F45 | 4554 | 5453 | 4E5F | 4D41 | 5345 | 0046 |
| 0000003020 | 451A | 425F | 5F55 | 4547 | 5F54 | 454E | 5458 | 4D5F |
| 0000003040 | 444F | 4649 | 4549 | 5F44 | 5542 | 4746 | 0A00 | 5F45 |
| 0000003060 | 5542 | 475F | 5445 | 4843 | 0048 | 4510 | 425F | 5F55 |
| 0000003100 | 4E55 | 4C41 | 4F4C | 5F43 | 5542 | 4946 | 1000 | 5F45 |
| 0000003120 | 5542 | 535F | 5445 | 435F | 5255 | 425F | 4655 | 004A |
| 0000003140 | 450D | 455F | 5F4D | 4553 | 5F54 | 494C | 454E | 004B |
| 0000003160 | 4508 | 435F | 5F4D | 4F50 | 4C53 | 0C00 | 5F45 | 4D43 |
| 0000003200 | 525F | 4C45 | 4145 | 4553 | 004D | 0100 | 0A00 | 1000 |
| 0000003220 | 1300 | 9E00 | A700 | AD00 | 0200 | 0001 | 4408 | 534F |
| 0000003240 | 4143 | 4C4C | 0553 | 4244 | 505F | 0249 | 4955 | 6C06 |
| 0000003260 | 6962 | 6D70 | 0D74 | 425F | 5F58 | 4544 | 5542 | 4D47 |
| 0000003300 | 444F | 0D45 | 425F | 5F58 | 4954 | 454D | 4D53 | 444F |
| 0000003320 | 0945 | 425F | 5F58 | 5F42 | 4953 | 0E47 | 425F | 5F58 |
| 0000003340 | 4544 | 5542 | 4547 | 544E | 5245 | 5F0F | 5842 | 445F |
| 0000003360 | 4245 | 4755 | 4552 | 5554 | 4E52 | 5F0E | 5842 | 565F |
| 0000003400 | 494F | 5244 | 5445 | 5255 | 0E4E | 425F | 5F58 | 4544 |
| 0000003420 | 5542 | 5047 | 4952 | 544E | 5F11 | 5842 | 445F | 4245 |
| 0000003440 | 4755 | 4156 | 4952 | 4241 | 454C | 5F0E | 5842 | 505F |
| 0000003460 | 4341 | 464B | 4C49 | 4554 | 0852 | 4956 | 434F | 4C41 |
| 0000003500 | 534C | 5005 | 574D | 4E49 | 5005 | 474D | 4950 | 560C |
| 0000003520 | 4F49 | 5341 | 4F53 | 4943 | 5441 | 0B45 | 4956 | 434F |

THU MAR 14 17:42:50 1991 MEDIT.DLL PAGE 3, LINE 119

| | | | | | | | | |
|---|---|---|---|---|---|---|---|---|
| 0000003540 | 4552 | 5441 | 5045 | 0C53 | 4956 | 444F | 5345 | 5254 |
| 0000003560 | 594F | 5350 | 5614 | 4F49 | 4553 | 4454 | 5645 | 4349 |
| 0000003600 | 4345 | 4C45 | 534C | 5A49 | 0945 | 4956 | 534F | 5445 |
| 0000003620 | 524F | 0947 | 4956 | 534F | 4F48 | 5057 | 0653 | 4D5G |
| 0000003640 | 4956 | 504F | 014D | D801 | 018B | 3D05 | F101 | 01D7 |
| 0000003660 | BFBD | 6801 | 0194 | 6CBD | 0201 | 018E | A551 | 4C01 |
| 0000003700 | 0140 | 27CA | 9601 | 0100 | 0000 | 0601 | 01D7 | D4C7 |
| 0000003720 | 5201 | 0155 | D794 | 3C01 | 01D0 | 4334 | 2101 | 01D3 |
| 0000003740 | BDE7 | 5801 | 013E | 9305 | 7D01 | 019B | 4085 | EB01 |
| 0000003760 | 017E | 5B07 | 7801 | 01A5 | B0E3 | 3A01 | 0195 | 9CB3 |
| 0000004000 | A201 | 017C | 2EA8 | 3001 | 0159 | 24D5 | 0601 | 0177 |
| 0000004020 | C5A8 | B301 | 0114 | D2C7 | 1101 | 01D5 | A5BE | 9E01 |
| 0000004040 | 0182 | 8FAF | FA01 | 0166 | 5C7B | 9B01 | 014B | 8B71 |
| 0000004060 | 0901 | 0197 | 0D3F | 3901 | 01D5 | 479F | B501 | 0123 |
| 0000004100 | 0DE1 | 0501 | 017A | 514A | 1601 | 01A6 | C428 | 4E01 |
| 0000004120 | 0170 | 6683 | 5F01 | 01CD | D74D | 8901 | 01D9 | B71D |
| 0000004140 | 1801 | 0185 | D2F4 | B501 | 0194 | B012 | AD01 | 0191 |
| 0000004160 | AF42 | 4401 | 018B | 4646 | 5F01 | 0173 | 73DA | 0801 |
| 0000004200 | 0126 | 3881 | 9701 | 01D3 | CE34 | 6101 | 00D5 | 3700 |
| 0000004220 | 654D | 6372 | 7275 | 2079 | 7865 | 6574 | 736E | 6269 |
| 0000004240 | 656C | 6320 | 7375 | 6F74 | 696D | 617A | 6C62 | 2065 |
| 0000004260 | 6573 | 666C | 6420 | 636F | 6D75 | 6E65 | 6974 | 676E |
| 0000004300 | 6520 | 6964 | 6F74 | 0072 | 0000 | 0000 | 0000 | 0000 |
| 0000004320 | 581E | 4590 | 8B55 | 1EEC | D88E | EC81 | 0000 | 5657 |
| 0000004340 | B81E | FFFF | D88E | C99A | FF00 | 8EFF | D606 | 2610 |
| 0000004360 | 06C7 | 0678 | 0000 | 468B | 8B0A | 0C56 | 068E | 10D8 |
| 0000004400 | A326 | 0000 | 8926 | 0216 | 8B00 | 0646 | 568B | 8E08 |
| 0000004420 | DA06 | 2610 | 10A3 | 2600 | 1689 | 0012 | FF26 | 1236 |
| 0000004440 | 2600 | 36FF | 0010 | 0868 | 9A80 | FFFF | 0000 | 068E |
| 0000004460 | 10DC | A326 | 000A | 8926 | 0C16 | 9A00 | 05F2 | 0073 |
| 0000004500 | C49A | 83D7 | 8E00 | D606 | 2610 | 06C7 | 0678 | 0001 |
| 0000004520 | 219A | 1922 | E900 | 0000 | 5E1F | 835F | 02ED | E58B |
| 0000004540 | 5D1F | CA4D | 0008 | 581E | 4590 | 8B55 | 1EEC | D88E |
| 0000004560 | EC81 | 0000 | 5657 | B81E | 0012 | D88E | 068E | 10DE |
| 0000004600 | FF26 | D436 | 9A08 | 09F5 | 006E | C483 | 1F02 | 5F5E |
| 0000004620 | ED83 | 8B02 | 1FE5 | 4D5D | 1ECB | 9058 | 5545 | EC8B |
| 0000004640 | 8E1E | 81D8 | 16EC | 5700 | C656 | F846 | C60F | F046 |
| 0000004660 | C601 | FA46 | C609 | EC46 | C607 | EE46 | C600 | F646 |
| 0000004700 | 6A07 | 6A00 | 6A00 | 1E04 | 4268 | 8D00 | F246 | 5016 |
| 0000004720 | 5B9A | 0001 | 8900 | EA46 | 013D | 1B00 | F7C0 | 3DD8 |
| 0000004740 | 0000 | 0375 | 34E9 | 8D00 | F846 | 5016 | 76FF | FFF4 |
| 0000004760 | F276 | 849A | 7F03 | 8301 | 08C4 | 003D | 7500 | E903 |
| 0000005000 | 0006 | FFB8 | E9FF | 0241 | 76FF | FFF4 | F276 | 999A |
| 0000005020 | 0001 | 2B00 | 89C0 | F446 | 4689 | 6AF2 | 6A00 | 6A00 |
| 0000005040 | 1E04 | 4E68 | 8D00 | F246 | 5016 | B59A | 0001 | 8900 |
| 0000005060 | EA46 | 013D | 1B00 | F7C0 | 3DD8 | 0000 | 0375 | 34E9 |
| 0000005100 | 8D00 | F046 | 5016 | 76FF | FFF4 | F276 | 849A | D903 |
| 0000005120 | 8301 | 08C4 | 003D | 7500 | E903 | 0006 | FFB8 | E9FF |
| 0000005140 | 01E7 | 76FF | FFF4 | F276 | F39A | 0001 | 2B00 | 89C0 |
| 0000005160 | F446 | 4689 | 6AF2 | 6A00 | 6A00 | 1E04 | 6568 | 8D00 |
| 0000005200 | F246 | 5016 | 0F9A | 0002 | 8900 | EA46 | 013D | 1B00 |
| 0000005220 | F7C0 | 3DD8 | 0000 | 0375 | 34E9 | 8D00 | EE46 | 5016 |
| 0000005240 | 76FF | FFF4 | F276 | 849A | 3303 | 8302 | 08C4 | 003D |
| 0000005260 | 7500 | E903 | 0006 | FFB8 | E9FF | 018D | 76FF | FFF4 |
| 0000005300 | F276 | 4D9A | 0002 | 2B00 | 89C0 | F446 | 4689 | 6AF2 |
| 0000005320 | 6A00 | 6A00 | 1E04 | 7268 | 8D00 | F246 | 5016 | 699A |
| 0000005340 | 0002 | 8900 | EA46 | 013D | 1B00 | F7C0 | 3DD8 | 0000 |
| 0000005360 | 0375 | 34E9 | 8D00 | F646 | 5016 | 76FF | FFF4 | F276 |
| 0000005400 | 849A | 8D03 | 8302 | 08C4 | 003D | 7500 | E903 | 0006 |

THU MAR 14 17:42:50 1991 MEDIT.DLL PAGE 4, LINE 178

| | | | | | | | | |
|---|---|---|---|---|---|---|---|---|
| 0000005420 | FFB8 | E9FF | 0133 | 76FF | FFF4 | F276 | A79A | 0002 |
| 0000005440 | 2B00 | 89C0 | F446 | 4689 | 6AF2 | 6A00 | 6A00 | 1E04 |
| 0000005460 | 8A68 | 8D00 | F246 | 5016 | C39A | 0002 | 8900 | EA46 |
| 0000005500 | 013D | 1B00 | F7C0 | 3DD8 | 0000 | 0375 | 34E9 | 8D00 |
| 0000005520 | FA46 | 5016 | 76FF | FFF4 | F276 | 849A | E703 | 8302 |
| 0000005540 | 08C4 | 003D | 7500 | E903 | 0006 | FFB8 | E9FF | 00D9 |
| 0000005560 | 76FF | FFF4 | F276 | 019A | 0003 | 2B00 | 89C0 | F446 |
| 0000005600 | 4689 | 6AF2 | 6A00 | 6A00 | 1E04 | 9468 | 8D00 | F246 |
| 0000005620 | 5016 | FF9A | 00FF | 8900 | EA46 | 013D | 1B00 | F7C0 |
| 0000005640 | 3DD8 | 000D | 0375 | 34E9 | 8D00 | EC46 | 5016 | 76FF |
| 0000005660 | FFF4 | F276 | 849A | B803 | 8300 | 08C4 | 003D | 7500 |
| 0000005700 | E903 | 0006 | FFB8 | E9FF | 007F | 76FF | FFF4 | F276 |
| 0000005720 | FF9A | 00FF | 2B00 | 89C0 | F446 | 4689 | 6AF2 | 6A00 |
| 0000005740 | 6A00 | 1E03 | A968 | 8D00 | FC46 | 5016 | FF9A | 00FF |
| 0000005760 | 8900 | EA46 | 013D | 1B00 | F7C0 | 3DD8 | 0000 | 0375 |
| 0000006000 | 0BE9 | 8B00 | FC46 | 068E | 10E0 | A326 | 0146 | 468A |
| 0000006020 | C0F0 | 04E0 | 4602 | 8EF8 | E206 | 2610 | 43A2 | 8E01 |
| 0000006040 | E406 | 2610 | 49A2 | 8A01 | EC46 | E0C0 | 0204 | FA46 |
| 0000006060 | 068E | 10E6 | A226 | 0141 | 468A | C0F6 | 04E0 | 4602 |
| 0000006100 | 8EEE | E806 | 2610 | 44A2 | 5E01 | 835F | 02ED | E58B |
| 0000006120 | 5D1F | CB4D | 581E | 4590 | 8B55 | 1EEC | D88E | EC81 |
| 0000006140 | 0000 | 5657 | 5EC4 | 260A | 07C6 | 1E00 | B368 | FF00 |
| 0000006160 | 0876 | 76FF | 9A06 | F52E | 03CC | C483 | 3D08 | 0000 |
| 0000006200 | 0374 | 0AE9 | C400 | 0A5E | C626 | 0007 | 22E9 | 1E02 |
| 0000006220 | B968 | FF00 | 0876 | 76FF | 9A06 | F52E | 03F0 | C483 |
| 0000006240 | 3D08 | 0000 | 0374 | 0AE9 | C400 | 0A5E | C626 | 0107 |
| 0000006260 | FEE9 | 1E01 | BE68 | FF00 | 0876 | 76FF | 9A06 | F52E |
| 0000006300 | 0414 | C483 | 3D08 | 0000 | 0374 | 0AE9 | C400 | 0A5E |
| 0000006320 | C626 | 0207 | DAE9 | 1E01 | C468 | FF00 | 0876 | 76FF |
| 0000006340 | 9A06 | F52E | 0438 | C483 | 3D08 | 0000 | 0374 | 0AE9 |
| 0000006360 | C400 | 0A5E | C626 | 0307 | B6E9 | 1E01 | C968 | FF00 |
| 0000006400 | 0876 | 76FF | 9A06 | F52E | 045C | C483 | 3D08 | 0000 |
| 0000006420 | 0374 | 0AE9 | C400 | 0A5E | C626 | 0407 | 92E9 | 1E01 |
| 0000006440 | CD68 | FF00 | 0876 | 76FF | 9A06 | F52E | 0480 | C483 |
| 0000006460 | 3D08 | 0000 | 0374 | 0AE9 | C400 | 0A5E | C626 | 0507 |
| 0000006500 | 6EE9 | 1E01 | D568 | FF00 | 0876 | 76FF | 9A06 | F52E |
| 0000006520 | 04A4 | C483 | 3D08 | 0000 | 0374 | 0AE9 | C400 | 0A5E |
| 0000006540 | C626 | 0607 | 4AE9 | 1E01 | DB68 | FF00 | 0876 | 76FF |
| 0000006560 | 9A06 | F52E | 04C8 | C483 | 3D08 | 0000 | 0374 | 0AE9 |
| 0000006600 | C400 | 0A5E | C626 | 0707 | 26E9 | 1E01 | E668 | FF00 |
| 0000006620 | 0876 | 76FF | 9A06 | F52E | 04EC | C483 | 3D08 | 0000 |
| 0000006640 | 0374 | 0AE9 | C400 | 0A5E | C626 | 0807 | 02E9 | 1E01 |
| 0000006660 | F068 | FF00 | 0876 | 76FF | 9A06 | F52E | 0510 | C483 |
| 0000006700 | 3D08 | 0000 | 0374 | 0AE9 | C400 | 0A5E | C626 | 0907 |
| 0000006720 | DEE9 | 1E00 | FB68 | FF00 | 0876 | 76FF | 9A06 | F52E |
| 0000006740 | 0534 | C483 | 3D08 | 0000 | 0374 | 0AE9 | C400 | 0A5E |
| 0000006760 | C626 | 0A07 | BAE9 | 1E00 | 0768 | FF01 | 0876 | 76FF |
| 0000007000 | 9A06 | F52E | 0558 | C483 | 3D08 | 0000 | 0374 | 0AE9 |
| 0000007020 | C400 | 0A5E | C626 | 0B07 | 96E9 | 1E00 | 1268 | FF01 |
| 0000007040 | 0876 | 76FF | 9A06 | F52E | 057C | C483 | 3D08 | 0000 |
| 0000007060 | 0374 | 0AE9 | C400 | 0A5E | C626 | 0C07 | 72E9 | 1E00 |
| 0000007100 | 1C68 | FF01 | 0876 | 76FF | 9A06 | F52E | 05A0 | C483 |
| 0000007120 | 3D08 | 0000 | 0374 | 0AE9 | C400 | 0A5E | C626 | 0D07 |
| 0000007140 | 4EE9 | 1E00 | 2A68 | FF01 | 0876 | 76FF | 9A06 | F52E |
| 0000007160 | 05C4 | C483 | 3D08 | 0000 | 0374 | 0AE9 | C400 | 0A5E |
| 0000007200 | C626 | 0E07 | 2AE9 | 1E00 | 3768 | FF01 | 0876 | 76FF |
| 0000007220 | 9A06 | F52E | 0125 | C483 | 3D08 | 0000 | 0374 | 0AE9 |
| 0000007240 | C400 | 0A5E | C626 | 0F07 | 06E9 | B800 | FFFF | 06E9 |
| 0000007260 | B800 | 0000 | 00E9 | 5E00 | 835F | 02ED | E58B | 5D1F |

THU MAR 14 17:42:50 1991 MEDIT.DLL PAGE 5, LINE 237

| | | | | | | | | |
|---|---|---|---|---|---|---|---|---|
| 0000007300 | CB4D | 581E | 4590 | 8B55 | 1EEC | D88E | EC81 | 000E |
| 0000007320 | 5657 | 3E83 | 1302 | 7400 | E903 | 02BA | 068E | 10EA |
| 0000007340 | FF26 | 0C36 | 2600 | 36FF | 000A | FF9A | 00FF | A300 |
| 0000007360 | 12FE | 1689 | 1300 | 36FF | 1300 | 36FF | 12FE | 006A |
| 0000007400 | 0B6A | 006A | 016A | 681E | 12EA | 579A | 0006 | 8900 |
| 0000007420 | FC46 | 36FF | 1300 | 36FF | 12FE | 006A | 0A6A | 006A |
| 0000007440 | 016A | 681E | 12E6 | 739A | 0006 | 8900 | FC46 | 36FF |
| 0000007460 | 1300 | 36FF | 12FE | 006A | 0D6A | 006A | 016A | 681E |
| 0000007500 | 12F2 | 8F9A | 0006 | 8900 | FA46 | 36FF | 1300 | 36FF |
| 0000007520 | 12FE | 006A | 0C6A | 006A | 016A | 681E | 12EE | FF9A |
| 0000007540 | 00FF | 8900 | FA46 | 7E83 | 00FA | 0375 | 06E9 | A100 |
| 0000007560 | 12EE | 03E9 | A100 | 12E6 | 068E | 10EC | A326 | 0006 |
| 0000007600 | 7E83 | 00FA | 0375 | 06E9 | A100 | 12F2 | 03E9 | A100 |
| 0000007620 | 12EA | 068E | 10EE | A326 | 08DE | 006A | 016A | 246A |
| 0000007640 | EE9A | 0006 | 8E00 | EC06 | 9910 | F726 | 063E | 2600 |
| 0000007660 | 2EF7 | 0006 | E2A3 | 6A12 | 6A00 | 6A01 | 9A25 | FFFF |
| 0000007700 | 0000 | 068E | 10EE | 2699 | 3EF7 | 08DE | F726 | DE2E |
| 0000007720 | 0508 | 0002 | E4A3 | A112 | 12E4 | 2699 | 3EF7 | 08DE |
| 0000007740 | 068E | 10F0 | A326 | 08DC | 068E | 10F2 | C726 | DA06 |
| 0000007760 | 8508 | 8E00 | F406 | 2610 | 36FF | 0012 | FF26 | 1036 |
| 0000010000 | 6800 | 8005 | 5A9A | 0000 | A300 | 12FA | 1689 | 12FC |
| 0000010020 | 068E | 10F0 | A126 | 08DC | 068E | 10F6 | A326 | 0014 |
| 0000010040 | E2A1 | 8E12 | EC06 | 9910 | F726 | 063E | 8E00 | F806 |
| 0000010060 | 2610 | 0EA3 | 6800 | FFFF | D468 | 8E08 | F006 | 2610 |
| 0000010100 | 36FF | 08DC | 068E | 10F2 | FF26 | DA36 | 6A08 | 6A00 |
| 0000010120 | 6A01 | 9A00 | FFFF | 0000 | 36FF | 1300 | 36FF | 12FE |
| 0000010140 | 068E | 10FA | FF26 | D436 | 9A08 | FFFF | 0000 | 681E |
| 0000010160 | 0143 | 068E | 10F2 | A126 | 08DA | 068E | 10F0 | F726 |
| 0000010200 | DC26 | 5008 | 006A | 006A | 068E | 10FA | FF26 | D436 |
| 0000010220 | 9A08 | FFFF | 0000 | 006A | 016A | 166A | DA9A | 0007 |
| 0000010240 | 6A00 | 6A00 | 6A01 | 8B04 | 9AF0 | 07F1 | 0000 | E0D1 |
| 0000010260 | C603 | A399 | 12D6 | 1689 | 12D8 | 006A | 016A | 176A |
| 0000010300 | FE9A | 0007 | 6A00 | 6A00 | 6A01 | 8B23 | 9AF0 | 0811 |
| 0000010320 | 0000 | 006A | 016A | 1E6A | F88B | 7E89 | 89F6 | F856 |
| 0000010340 | 249A | 0008 | 6A00 | 6A00 | 6A01 | 8B05 | 89F8 | F27E |
| 0000010360 | 5689 | 9AF4 | 06D1 | 0000 | E0D1 | 4603 | 03F2 | F646 |
| 0000010400 | C603 | A399 | 12DA | 1689 | 12DC | 068E | 10F4 | FF26 |
| 0000010420 | 1236 | 2600 | 36FF | 0010 | 0768 | 9A80 | 0735 | 0000 |
| 0000010440 | 068E | 10FC | A326 | 08D6 | 8926 | D816 | 8E08 | F406 |
| 0000010460 | 2610 | 36FF | 0012 | FF26 | 1036 | 6800 | 8006 | 4C9A |
| 0000010500 | 0008 | 8E00 | FE06 | 2610 | D0A3 | 2608 | 1689 | 08D2 |
| 0000010520 | 068E | 10F4 | FF26 | 1236 | 2600 | 36FF | 0010 | AF68 |
| 0000010540 | 6808 | FFFF | B59A | 0008 | A300 | 12DE | 1689 | 12E0 |
| 0000010560 | 068E | 10EA | FF26 | 0C36 | 2600 | 36FF | 000A | A868 |
| 0000010600 | 6803 | FFFF | FF9A | 00FF | A300 | 12F6 | 1689 | 12F8 |
| 0000010620 | 06C7 | 1302 | 0001 | 068E | 1100 | C726 | 0406 | 0000 |
| 0000010640 | 8E00 | 0206 | 2611 | 06C7 | 0008 | 0000 | 016A | B59A |
| 0000010660 | E823 | 6A08 | 9A01 | 08F8 | 088F | C483 | 5E02 | 835F |
| 0000010700 | 02ED | E58B | 5D1F | CB4D | 581E | 4590 | 8B55 | 1EEC |
| 0000010720 | D88E | EC81 | 0012 | 5657 | 76FF | 9A06 | 0DE1 | 08E1 |
| 0000010740 | 068E | 10F4 | FF26 | 1236 | 2600 | 36FF | 0010 | 468D |
| 0000010760 | 16EE | 9A50 | FFFF | 0000 | 068E | 10EA | FF26 | 0C36 |
| 0000011000 | 2600 | 36FF | 000A | FF9A | 00FF | A800 | 7401 | E903 |
| 0000011020 | 0020 | 068E | 1102 | FF26 | 0836 | 8E00 | 0006 | 2611 |
| 0000011040 | 36FF | 0004 | 068E | 10FA | FF26 | D436 | 9A08 | FFFF |
| 0000011060 | 0000 | 5F5E | ED83 | 8B02 | 1FE5 | 4D5D | 1ECB | 9058 |
| 0000011100 | 5545 | EC8B | 8E1E | 81D8 | 12EC | 5700 | 8356 | 023E |
| 0000011120 | 0013 | 0374 | 09E9 | B800 | 0000 | 00BA | E900 | 005A |
| 0000011140 | 689A | C694 | 8E09 | F406 | 2610 | 36FF | 0012 | FF26 |

THU MAR 14 17:42:50 1991 MEDIT.DLL PAGE 6, LINE 296

| | | | | | | | | |
|---|---|---|---|---|---|---|---|---|
| 0000011160 | 1036 | 8D00 | EE46 | 5016 | 249A | 0009 | 8300 | 10EC |
| 0000011200 | 8D1E | EE76 | FC8B | C783 | 1602 | 1607 | B91F | 0008 |
| 0000011220 | A5F3 | 9A1F | AAE7 | 09E8 | C483 | FF10 | 0876 | 76FF |
| 0000011240 | FF06 | 0A76 | 76FF | FF0E | 0C76 | 76FF | FF12 | 1076 |
| 0000011260 | FF9A | 00FF | 9A00 | 953A | 090E | 5F5E | ED83 | 8B02 |
| 0000011300 | 1FE5 | 4D5D | 1ECB | 9058 | 5545 | EC8B | 8E1E | 81D8 |
| 0000011320 | 00EC | 5700 | 6A56 | 6A00 | FF00 | 0676 | 9A9A | 0007 |
| 0000011340 | FF00 | 0676 | FF9A | 00FF | C700 | 0206 | 0013 | 5E00 |
| 0000011360 | 835F | 02ED | E58B | 5D1F | CB4D | 581E | 4590 | 8B55 |
| 0000011400 | 1EEC | D88E | EC81 | 0000 | 5657 | 76FF | FF08 | 0676 |
| 0000011420 | 006A | 006A | 681E | 1308 | FF9A | 00FF | A300 | 1318 |
| 0000011440 | 1689 | 131A | 068E | 10F0 | FF26 | DC36 | 8E08 | F206 |
| 0000011460 | 2610 | 36FF | 08DA | 006A | 068E | 10FA | FF26 | D436 |
| 0000011500 | 9A08 | FFFF | 0000 | 36FF | 131A | 36FF | 1318 | FF9A |
| 0000011520 | 00FF | 5E00 | 835F | 02ED | E58B | 5D1F | CB4D | 581E |
| 0000011540 | 4590 | 8B55 | 1EEC | D88E | EC81 | 0000 | 5657 | 5EC4 |
| 0000011560 | 2606 | 47F6 | 1801 | 0375 | 7AE9 | C400 | 065E | F626 |
| 0000011600 | 0147 | 7508 | E903 | 0056 | 006A | 016A | 046A | CE9A |
| 0000011620 | 000A | D100 | 6AE0 | 6A00 | 6A01 | 8B24 | 9AF0 | 0AE2 |
| 0000011640 | 0000 | C62B | 5EC4 | 2606 | 4789 | 6A04 | 6A00 | 6A01 |
| 0000011660 | 9A1E | 0AEF | 0000 | 006A | 016A | 256A | F08B | CD9A |
| 0000011700 | 0007 | 0300 | C4F0 | 065E | 8926 | 0277 | 5EC4 | 2606 |
| 0000011720 | 47C7 | 0006 | C400 | 065E | C726 | 0847 | 0000 | 76FF |
| 0000011740 | FF08 | 0676 | 399A | 930B | 8309 | 04C4 | 01B8 | BA00 |
| 0000011760 | 0000 | 09E9 | B800 | 0000 | 00BA | E900 | 0000 | 5F5E |
| 0000012000 | ED83 | 8B02 | 1FE5 | 4D5D | 1ECB | 9058 | 5545 | EC8B |
| 0000012020 | 8E1E | 81D8 | 12EC | 5700 | C456 | 065E | 8326 | 047F |
| 0000012040 | 7500 | E903 | 000D | 5EC4 | 2606 | 7F83 | 0002 | 0374 |
| 0000012060 | 03E9 | E900 | 00CB | 5EC4 | 2606 | 47F6 | 0401 | 0375 |
| 0000012100 | 03E9 | E900 | 00BB | 006A | 016A | 046A | 9A9A | 000B |
| 0000012120 | D100 | 03E0 | 0406 | C413 | 065E | 3B26 | 0447 | 037E |
| 0000012140 | 1BE9 | 6A00 | 6A00 | 6A01 | 9A04 | 0BB5 | 0000 | E0D1 |
| 0000012160 | 0603 | 1304 | 5EC4 | 2606 | 4789 | E904 | 0000 | 006A |
| 0000012200 | 016A | 056A | D29A | 000B | D100 | 03E0 | 0606 | C413 |
| 0000012220 | 065E | 3B26 | 0247 | 037E | 1BE9 | 6A00 | 6A00 | 6A01 |
| 0000012240 | 9A05 | 0ABF | 0000 | E0D1 | 0603 | 1306 | 5EC4 | 2606 |
| 0000012260 | 4789 | E902 | 0000 | 5EC4 | 2606 | 478B | 9908 | 4689 |
| 0000012300 | 89EE | F056 | 5EC4 | 2606 | 478B | C404 | 065E | 0326 |
| 0000012320 | 0847 | 9948 | 4689 | 89F6 | F856 | 5EC4 | 2606 | 478B |
| 0000012340 | 9906 | 4689 | 89F2 | F456 | 5EC4 | 2606 | 478B | C402 |
| 0000012360 | 065E | 0326 | 0647 | 9948 | 4689 | 89FA | FC56 | 00E9 |
| 0000012400 | 5E00 | 835F | 02ED | E58B | 5D1F | CB4D | 581E | 4590 |
| 0000012420 | 8B55 | 1EEC | D88E | EC81 | 0000 | 5657 | 76FF | FF08 |
| 0000012440 | 0676 | 4C6A | 76FF | FF0C | 0A76 | 681E | 131C | FF9A |
| 0000012460 | 00FF | FF00 | 0876 | 76FF | 6A06 | 6A00 | 1E00 | 1C68 |
| 0000012500 | 9A13 | FFFF | 0000 | 5F5E | ED83 | 8B02 | 1FE5 | 4D5D |
| 0000012520 | 1ECB | 9058 | 5545 | EC8B | 8E1E | 81D8 | 04EC | 5700 |
| 0000012540 | C456 | 065E | 8A26 | 3C47 | 0F24 | 0F3C | 0374 | 06E9 |
| 0000012560 | B800 | 0001 | 03E9 | B800 | 0000 | 4689 | C4FC | 065E |
| 0000012600 | 8326 | 3C4F | 8320 | FC7E | 7500 | E903 | 0006 | 01B8 |
| 0000012620 | E900 | 000A | 068E | 10EC | A126 | 0006 | F8D1 | 5EC4 |
| 0000012640 | 2606 | 4789 | 8304 | FC7E | 7500 | E903 | 0006 | 01B8 |
| 0000012660 | E900 | 0008 | 068E | 10EE | A126 | 08DE | 5EC4 | 2606 |
| 0000012700 | 4789 | A106 | 1304 | C499 | 065E | C88B | 8B26 | D107 |
| 0000012720 | 8BE0 | 99DA | C803 | DA13 | 76C4 | 2606 | 4C89 | 2634 |
| 0000012740 | 5C89 | A136 | 1306 | C499 | 065E | C88B | 8B26 | 0247 |
| 0000012760 | E0D1 | DA8B | 0399 | 13C8 | C4DA | 0676 | 8926 | 384C |
| 0000013000 | 8926 | 3A5C | 5F5E | ED83 | 8B02 | 1FE5 | 4D5D | 1ECB |
| 0000013020 | 9058 | 5545 | EC8B | 8E1E | 81D8 | 04EC | 5700 | 1E56 |

THU MAR 14 17:42:50 1991 MEDIT.DLL PAGE 7, LINE 355

| | | | | | | | | |
|---|---|---|---|---|---|---|---|---|
| 0000013040 | A8B8 | 8E00 | 8BD8 | 0E46 | 49E9 | FF00 | 0C76 | 76FF |
| 0000013060 | 9A0A | 0B39 | 0D91 | C483 | E904 | 004B | 76FF | FF12 |
| 0000013100 | 1076 | 76FF | FF0E | 0C76 | 76FF | FF0A | 0876 | 76FF |
| 0000013120 | FF06 | DE1E | 8912 | FC46 | 76FF | FF08 | 0676 | 819A |
| 0000013140 | 170C | 830B | 04C4 | 468B | 2BFC | E9D2 | 0035 | 16E9 |
| 0000013160 | E900 | 0013 | 082D | 7500 | E903 | FFAF | 442D | 7500 |
| 0000013200 | E903 | FFB8 | E7E9 | FFFF | 1276 | 76FF | FF10 | 0E76 |
| 0000013220 | 76FF | FF0C | 0A76 | 76FF | FF08 | 0676 | 1EFF | 12DE |
| 0000013240 | 00E9 | 1F00 | 5F5E | ED83 | 8B02 | 1FE5 | 4D5D | 0ECA |
| 0000013260 | 1E00 | 9058 | 5545 | EC8B | 8E1E | 81D8 | 14EC | 5700 |
| 0000013300 | 1E56 | 51B8 | 8E0D | 83D8 | 067E | 7500 | E903 | 0006 |
| 0000013320 | EAA1 | E912 | 0003 | F2A1 | 8E12 | EE06 | 2610 | DEA3 |
| 0000013340 | 2608 | 36FF | 08DE | 7E83 | 0006 | 0375 | 06E9 | A100 |
| 0000013360 | 12E6 | 03E9 | A100 | 12EE | 068E | 10EC | A326 | 0006 |
| 0000013400 | 8E50 | FA06 | 2610 | 36FF | 08D4 | FF9A | 00FF | 8E00 |
| 0000013420 | EC06 | 2610 | 06A1 | 8E00 | F806 | 2610 | 2EF7 | 000E |
| 0000013440 | E2A3 | A112 | 12D6 | 0603 | 12E2 | 04A3 | 8E13 | EE06 |
| 0000013460 | 2610 | DEA1 | 8E08 | F606 | 2610 | 2EF7 | 0014 | E4A3 |
| 0000013500 | A112 | 12DA | 0603 | 12E4 | 06A3 | 8E13 | F406 | 2610 |
| 0000013520 | 36FF | 0012 | FF26 | 1036 | 8D00 | EC46 | 5016 | FF9A |
| 0000013540 | 00FF | F600 | ED46 | 7508 | E903 | 002A | 468D | 16EC |
| 0000013560 | 9A50 | 0A8E | 0F5D | C483 | 8E04 | F406 | 2610 | 36FF |
| 0000013600 | 0012 | FF26 | 1036 | 8D00 | EC46 | 5016 | 016A | FF9A |
| 0000013620 | 00FF | E900 | 008F | 46C7 | 8BEC | A100 | 12D6 | 4689 |
| 0000013640 | A1F4 | 12DA | 4689 | 8BF2 | F046 | 068E | 10EC | 2699 |
| 0000013660 | 3EF7 | 0006 | F726 | 062E | 4000 | 4689 | 8BF0 | EE46 |
| 0000013700 | C88B | E0D1 | C103 | E0C1 | 0302 | 8EC1 | EE06 | 2610 |
| 0000013720 | 0E8B | 08DE | D18B | E1C1 | 0302 | D1CA | 99E1 | F9F7 |
| 0000013740 | F726 | DE2E | 0508 | 0004 | 4689 | C7EE | F446 | 0019 |
| 0000013760 | 46C7 | 3CF2 | C700 | F046 | 01F1 | 46C7 | 9AEE | 8E01 |
| 0000014000 | F406 | 2610 | 36FF | 0012 | FF26 | 1036 | 6A00 | 6A00 |
| 0000014020 | FF00 | F476 | 76FF | FFF2 | F076 | 76FF | FFEE | EC76 |
| 0000014040 | FF9A | 00FF | 8D00 | EC46 | 5016 | 399A | 640B | 830D |
| 0000014060 | 04C4 | 5E1F | 835F | 02ED | E58B | 5D1F | CA4D | 0002 |
| 0000014100 | 581E | 4590 | 8B55 | 1EEC | D88E | EC81 | 0008 | 5657 |
| 0000014120 | 46F6 | 400A | 0375 | 06E9 | B800 | 0000 | 17E9 | F605 |
| 0000014140 | 0B46 | 7520 | E903 | 0006 | 00B8 | E900 | 0508 | 46F6 |
| 0000014160 | 080B | 0375 | 18E9 | 6A00 | 9A00 | 9CB3 | 0FF8 | 006A |
| 0000014200 | 016A | 026A | FF9A | 00FF | B800 | 0000 | E7E9 | C704 |
| 0000014220 | FC46 | 0000 | 03E9 | FF00 | FC46 | 468A | 2ADC | 3BE4 |
| 0000014240 | FC46 | 0377 | 8FE9 | C704 | F846 | 0000 | 46F6 | 020A |
| 0000014260 | 0375 | 4CE9 | C702 | F846 | 0001 | 468B | E908 | 0013 |
| 0000014300 | 23E9 | 6A00 | 9A00 | B97A | 101F | C483 | E902 | 0016 |
| 0000014320 | 13E9 | 2D00 | 0009 | 0373 | E8E9 | 2DFF | 0003 | 0377 |
| 0000014340 | DDE9 | E9FF | FFDD | 468B | E908 | 01F0 | 7C9A | 2C91 |
| 0000014360 | 3D10 | 0000 | 0375 | 08E9 | 9A00 | 8BAE | 0EA4 | 75E9 |
| 0000014400 | 8E04 | 0406 | 2611 | 1E6B | 087E | 8E1E | 0606 | 2611 |
| 0000014420 | 878B | 00A4 | 068E | 1102 | 0326 | 0806 | 3D00 | 0000 |
| 0000014440 | 0374 | 12E9 | 8E00 | 0006 | 2611 | 3E83 | 0004 | 7400 |
| 0000014460 | E903 | 0003 | CAE9 | FF01 | 1276 | 76FF | 6A10 | 6A7A |
| 0000014500 | 6A01 | 6A02 | 6A15 | 9A00 | 108D | 0000 | 76FF | FF12 |
| 0000014520 | 1076 | 7A6A | 016A | 026A | 1B6A | 006A | 5F9A | 000C |
| 0000014540 | E900 | 019D | 7C9A | A491 | 3D10 | 0000 | 0375 | 08E9 |
| 0000014560 | 9A00 | 8BAE | 10B8 | FDE9 | 8303 | 4A3E | 0001 | 0374 |
| 0000014600 | 0AE9 | 6A00 | 9A08 | 9CB3 | 0FAC | 66E9 | 8E00 | F206 |
| 0000014620 | 2610 | DAA1 | 4808 | 068E | 1100 | 3B26 | 0406 | 7700 |
| 0000014640 | E903 | 0007 | 206A | 079A | 975B | 8E10 | 0006 | 2611 |
| 0000014660 | 04A1 | 8900 | FC46 | 03E9 | FF00 | FC46 | 468B | 8EFC |
| 0000014700 | 0806 | 2B11 | 26D2 | 36F7 | 01EA | FA83 | 7500 | E903 |

THU MAR 14 17:42:50 1991  MEDIT.DLL  PAGE 8, LINE 414

| | | | | | | | | |
|---|---|---|---|---|---|---|---|---|
| 0000014720 | 0021 | 068E | 10F2 | A126 | 08DA | 8E48 | 0006 | 2611 |
| 0000014740 | 063B | 0004 | 0377 | 07E9 | 6A00 | 9A20 | 5B07 | 112B |
| 0000014760 | C6E9 | E9FF | 010B | 096A | B39A | 339C | E911 | 0101 |
| 0000015000 | 7C9A | 4091 | 3D11 | 0000 | 0375 | 08E9 | 9A00 | 8BAE |
| 0000015020 | 117A | 61E9 | 8303 | 4A3E | 0001 | 0375 | 30E9 | 6A00 |
| 0000015040 | 8E0A | 0406 | 2611 | 1E6B | 087E | 8E1E | 0606 | 2611 |
| 0000015060 | 878B | 00A4 | 068E | 1102 | 0326 | 0806 | 5000 | 068E |
| 0000015100 | 1100 | FF26 | 0436 | 9A00 | 5930 | 11AA | 30E9 | 8E00 |
| 0000015120 | 0006 | 2611 | 36FF | 0004 | 068E | 1104 | 6B26 | 7E1E |
| 0000015140 | 1E08 | 068E | 1106 | 8B26 | A487 | 8E00 | 0206 | 2611 |
| 0000015160 | 0603 | 0008 | 6A50 | 9A0A | 5E94 | 11B4 | C483 | 6A06 |
| 0000015200 | 9A03 | 9CB3 | 1246 | 068E | 10F8 | A126 | 000E | 068E |
| 0000015220 | 1100 | 3926 | 0406 | 7300 | E903 | 0027 | 068E | 10F4 |
| 0000015240 | FF26 | 1236 | 2600 | 36FF | 0010 | 326A | 068E | 10FC |
| 0000015260 | FF26 | D836 | 2608 | 36FF | 08D6 | 096A | 006A | 789A |
| 0000015300 | 0010 | 8E00 | 0006 | 2611 | D6C7 | 0004 | 0000 | 30E9 |
| 0000015320 | C700 | F846 | 0000 | 28E9 | E900 | 0025 | 052D | 7500 |
| 0000015340 | E903 | FE08 | 7548 | E903 | FE7A | 7548 | E903 | FF06 |
| 0000015360 | 7548 | E903 | FF0A | 162D | 7500 | E903 | FF02 | D0E9 |
| 0000015400 | 83FF | F87E | 7400 | E903 | 00DB | 46F6 | 010A | 0375 |
| 0000015420 | D2E9 | 9A00 | 917C | 1253 | 003D | 7500 | E903 | 0008 |
| 0000015440 | AE9A | 5D8B | E912 | 024E | 006A | 7A9A | 99B9 | 8312 |
| 0000015460 | 02C4 | 3E83 | 014A | 7500 | E903 | 0035 | 468A | 5006 |
| 0000015500 | 068E | 1104 | 6B26 | 7E1E | 1E08 | 068E | 1106 | 8B26 |
| 0000015520 | A487 | 8E00 | 0206 | 2611 | 0603 | 0008 | 8E50 | 0006 |
| 0000015540 | 2611 | 36FF | 0004 | 309A | CE59 | 8912 | FA46 | 35E9 |
| 0000015560 | 8E00 | 0006 | 2611 | 36FF | 0004 | 068E | 1104 | 6B26 |
| 0000015600 | 7E1E | 1E08 | 068E | 1106 | 8B26 | A487 | 8E00 | 0206 |
| 0000015620 | 2611 | 0603 | 0008 | 8A50 | 0646 | 9A50 | 5E94 | 12E7 |
| 0000015640 | C483 | 8906 | FA46 | 7E83 | 00FA | 0374 | 20E9 | 8D00 |
| 0000015660 | 0646 | 5016 | 6C9A | FAA2 | 8312 | 04C4 | 46F6 | 020B |
| 0000015700 | 0374 | 07E9 | 6A00 | 9A00 | 9CB3 | 1337 | 11E9 | B800 |
| 0000015720 | FFFF | 4689 | 3DFA | 0000 | 0375 | 03E9 | E900 | 0156 |
| 0000015740 | 46C7 | 01F8 | 8300 | F87E | 7400 | E903 | 0145 | 46F6 |
| 0000015760 | 020A | 0375 | 3CE9 | C701 | F846 | 0001 | 468B | E908 |
| 0000016000 | 0108 | 016A | B39A | 419C | E913 | 0127 | 006A | B39A |
| 0000016020 | 4B9C | E913 | 011D | 026A | B39A | 559C | E913 | 0113 |
| 0000016040 | 036A | B39A | 5F9C | E913 | 0109 | 046A | B39A | D99C |
| 0000016060 | E910 | 00FF | 056A | B39A | 739C | E913 | 00F5 | 066A |
| 0000016100 | B39A | 7D9C | E913 | 00EB | 076A | B39A | 859C | E913 |
| 0000016120 | 00E1 | 7C9A | 9291 | 3D13 | 0000 | 0375 | 08E9 | 9A00 |
| 0000016140 | 8BAE | 13AA | 0FE9 | 8301 | 4A3E | 0101 | C01B | D8F7 |
| 0000016160 | 4AA3 | FF01 | 4A36 | 9A01 | 94B5 | 13B2 | B4F9 | 9A00 |
| 0000016200 | 917C | 13BF | 003D | 7500 | E903 | 0008 | AE9A | F78B |
| 0000016220 | E913 | 00E2 | 3E83 | 014A | 7500 | E903 | 002E | 068E |
| 0000016240 | 1104 | 6B26 | 7E1E | 1E08 | 068E | 1106 | 8B26 | A487 |
| 0000016260 | 8E00 | 0206 | 2611 | 0603 | 0008 | 8E50 | 0006 | 2611 |
| 0000016300 | 36FF | 0004 | 9E9A | 2782 | E914 | 0030 | 068E | 1100 |
| 0000016320 | FF26 | 0436 | 8E00 | 0406 | 2611 | 1E6B | 087E | 8E1E |
| 0000016340 | 0606 | 2611 | 878B | 00A4 | 068E | 1102 | 0326 | 0806 |
| 0000016360 | 5000 | 206A | 949A | 1E5E | 8311 | 06C4 | 34E9 | C700 |
| 0000016400 | F846 | 0000 | 2CE9 | E900 | 0029 | 112D | 3D00 | 000A |
| 0000016420 | 0376 | EAE9 | D1FF | 93E0 | FF2E | 4DA7 | 5A14 | 6413 |
| 0000016440 | 7813 | 6E13 | 3213 | 4613 | 3C13 | 5013 | 2F13 | 8214 |
| 0000016460 | AF13 | E913 | FB61 | 068E | 10EA | FF26 | 0C36 | 2600 |
| 0000016500 | 36FF | 000A | 379A | 0009 | A800 | 7401 | E903 | 0020 |
| 0000016520 | 068E | 1102 | FF26 | 0836 | 8E00 | 0006 | 2611 | 36FF |
| 0000016540 | 0004 | 068E | 10FA | FF26 | D436 | 9A08 | 095E | 0000 |
| 0000016560 | 00B8 | E900 | 0000 | 5F5E | ED83 | 8B02 | 1FE5 | 4D5D |

THU MAR 14 17:42:50 1991 MEDIT.DLL PAGE 9, LINE 473

| | | | | | | | | |
|---|---|---|---|---|---|---|---|---|
| 0000016600 | 0ECA | 1E00 | 9058 | 5545 | EC8B | 8E1E | 81D8 | 08EC |
| 0000016620 | 5700 | 1E56 | F3B8 | 8E0D | 8BD8 | 0E46 | 81E9 | 8B0A |
| 0000016640 | 0A46 | 38E9 | FF00 | FC36 | FF12 | FA36 | 9A12 | C371 |
| 0000016660 | 152A | C483 | B804 | 0000 | 00BA | E900 | 0B08 | 76FF |
| 0000016700 | FF12 | 1076 | 76FF | FF0E | 0C76 | 76FF | FF0A | 0876 |
| 0000016720 | 76FF | FF06 | F61E | E912 | 0AEC | 0BE9 | 2D00 | 05DC |
| 0000016740 | 0375 | C0E9 | E9FF | FFD6 | D2E9 | 8B0A | 0A46 | 62E9 |
| 0000016760 | FF00 | 1276 | 76FF | 9A10 | B370 | 153D | C483 | 2B04 |
| 0000017000 | E9D2 | 0AC2 | 76FF | FF12 | 1076 | DD9A | 50B6 | 8315 |
| 0000017020 | 04C4 | D22B | AFE9 | FF0A | 1276 | 76FF | 9A10 | B7E4 |
| 0000017040 | 155F | C483 | 2B04 | E9D2 | 0A9C | 006A | 7A9A | A3B9 |
| 0000017060 | 8315 | 02C4 | 76FF | FF12 | 1076 | 76FF | FF0E | 0C76 |
| 0000017100 | 76FF | FF0A | 0876 | 76FF | FF06 | F61E | E912 | 0A76 |
| 0000017120 | 17E9 | 2D00 | 05DD | 0375 | 96E9 | 48FF | 0375 | B6E9 |
| 0000017140 | 48FF | 0375 | 9DE9 | E9FF | FFC0 | 76FF | FF12 | 1076 |
| 0000017160 | 2A9A | AE0A | 8315 | 04C4 | 42E9 | 9A0A | 917C | 15CF |
| 0000017200 | 003D | 7500 | E903 | 0012 | 681E | 014C | FF9A | 00FF |
| 0000017220 | B800 | 0000 | 00BA | E900 | 0A2C | 006A | 7A9A | F3B9 |
| 0000017240 | 8315 | 02C4 | 76FF | FF12 | 1076 | 76FF | FF0E | 0C76 |
| 0000017260 | 76FF | FF0A | 0876 | 76FF | FF06 | F61E | E912 | 0A06 |
| 0000017300 | 7C9A | 6991 | 3D13 | 0000 | 0375 | 27E9 | 6A00 | 6A00 |
| 0000017320 | 6A01 | 9A02 | 0FB5 | 0000 | 76FF | FF12 | 1076 | 76FF |
| 0000017340 | FF0E | 0C76 | 76FF | FF0A | 0876 | 76FF | FF06 | F61E |
| 0000017360 | E912 | 09D2 | 06C7 | 01CE | 0001 | 468B | 8E0C | EE06 |
| 0000017400 | 9910 | F726 | DE3E | 8E08 | F606 | 2610 | 062B | 0014 |
| 0000017420 | D8F7 | 8E48 | 0406 | 2611 | 1E6B | 087E | 8E1E | 0606 |
| 0000017440 | 2611 | 8F8B | 00A0 | 068E | 1104 | 6B26 | 7E1E | 1E08 |
| 0000017460 | 068E | 1106 | 2B26 | A48F | 2B00 | 1BC8 | 23D2 | 03CA |
| 0000017500 | 8EC8 | 0206 | 2611 | 0E89 | 0008 | 068E | 1104 | 6B26 |
| 0000017520 | 7E1E | 1E08 | 068E | 1106 | 8B26 | A487 | 8E00 | 0206 |
| 0000017540 | 2611 | 0603 | 0008 | 9A50 | 8518 | 16E5 | C88B | 468B |
| 0000017560 | 8E0A | EC06 | 9910 | F726 | 063E | 8E00 | 0406 | 2611 |
| 0000017600 | 1E6B | 087E | 8E1E | 0606 | 2611 | 8703 | 00A6 | C13B |
| 0000017620 | 0373 | 25E9 | 8E00 | 0406 | 2611 | 1E6B | 087E | 8E1E |
| 0000017640 | 0606 | 2611 | 878B | 00A4 | 068E | 1102 | 0326 | 0806 |
| 0000017660 | 5000 | 189A | A985 | E917 | 0020 | 468B | 8E0A | EC06 |
| 0000017700 | 9910 | F726 | 063E | 8E00 | 0406 | 2611 | 1E6B | 087E |
| 0000017720 | 8E1E | 0606 | 2611 | 8703 | 00A6 | 068E | 1100 | A326 |
| 0000017740 | 0004 | 068E | 10EA | FF26 | 0C36 | 2600 | 36FF | 000A |
| 0000017760 | 759A | 0014 | A800 | 7401 | E903 | 0020 | 068E | 1102 |
| 0000020000 | FF26 | 0836 | 8E00 | 0006 | 2611 | 36FF | 0004 | 068E |
| 0000020020 | 10FA | FF26 | D436 | 9A08 | 149C | 0000 | 468B | 8E0A |
| 0000020040 | EC06 | 9910 | F726 | 063E | A300 | 136A | 468B | 8E0C |
| 0000020060 | EE06 | 9910 | F726 | DE3E | 8E08 | F606 | 2610 | 062B |
| 0000020100 | 0014 | D8F7 | A348 | 136C | 068E | 1104 | 6B26 | 7E1E |
| 0000020120 | 1E08 | 068E | 1106 | 8B26 | A487 | A300 | 1364 | 068E |
| 0000020140 | 1104 | 6B26 | 7E1E | 1E08 | 068E | 1106 | 8B26 | A687 |
| 0000020160 | A300 | 1370 | 006A | 7A9A | CDB9 | 8317 | 02C4 | 76FF |
| 0000020200 | FF12 | 1076 | 76FF | FF0E | 0C76 | 76FF | FF0A | 0876 |
| 0000020220 | 76FF | FF06 | F61E | E912 | 082C | 7C9A | E091 | 3D14 |
| 0000020240 | 0000 | 0375 | 1CE9 | FF00 | 1276 | 76FF | FF10 | 0E76 |
| 0000020260 | 76FF | FF0C | 0A76 | 76FF | FF08 | 0676 | 1EFF | 12F6 |
| 0000020300 | 03E9 | 8308 | CE3E | 0001 | 0375 | 03E9 | C702 | CE06 |
| 0000020320 | 0001 | 8300 | D03E | 0001 | 0375 | 21E9 | 8E00 | 0A06 |
| 0000020340 | 2611 | 36FF | 0002 | FF26 | 0036 | FF00 | 1276 | 76FF |
| 0000020360 | 6A10 | 9A00 | FFFF | 0000 | 06C7 | 01D0 | 0000 | 468B |
| 0000020400 | 8E0A | EC06 | 9910 | F726 | 063E | 3B00 | 6A06 | 7413 |
| 0000020420 | E903 | 0135 | 468B | 8E0C | EE06 | 9910 | F726 | DE3E |
| 0000020440 | 8E08 | F606 | 2610 | 062B | 0014 | D8F7 | 062B | 136C |

THU MAR 14 17:42:50 1991 MEDIT.DLL PAGE 10, LINE 532

| | | | | | | | | |
|---|---|---|---|---|---|---|---|---|
| 0000020460 | 7448 | E903 | 0113 | 068E | 1104 | 6B26 | 7E1E | 1E08 |
| 0000020500 | 068E | 1106 | 6CA1 | 2613 | 8739 | 00A0 | 037D | F5E9 |
| 0000020520 | 8B00 | 0C46 | 068E | 10EE | 2699 | 3EF7 | 08DE | 068E |
| 0000020540 | 10F6 | 2B26 | 1406 | F700 | 48D8 | 068E | 1104 | 6B26 |
| 0000020560 | 7E1E | 1E08 | 068E | 1106 | 8B26 | A08F | 8E00 | 0406 |
| 0000020600 | 2611 | 1E6B | 087E | 8E1E | 0606 | 2611 | 8F2B | 00A4 |
| 0000020620 | C82B | D21B | CA23 | C803 | 068E | 1102 | 8926 | 080E |
| 0000020640 | 8E00 | 0406 | 2611 | 1E6B | 087E | 8E1E | 0606 | 2611 |
| 0000020660 | 878B | 00A4 | 068E | 1102 | 0326 | 0806 | 5000 | 189A |
| 0000020700 | 3C85 | 8B19 | 68C8 | 0A46 | 068E | 10EC | 2699 | 3EF7 |
| 0000020720 | 0006 | 068E | 1104 | 6B26 | 7E1E | 1E08 | 068E | 1106 |
| 0000020740 | 0326 | A687 | 3B00 | 73C1 | E903 | 0025 | 068E | 1104 |
| 0000020760 | 6B26 | 7E1E | 1E08 | 068E | 1106 | 8B26 | A487 | 8E00 |
| 0000021000 | 0206 | 2611 | 0603 | 0008 | 9A50 | 8518 | 19AA | 20E9 |
| 0000021020 | 8B00 | 0A46 | 068E | 10EC | 2699 | 3EF7 | 0006 | 068E |
| 0000021040 | 1104 | 6B26 | 7E1E | 1E08 | 068E | 1106 | 0326 | A687 |
| 0000021060 | 8E00 | 0006 | 2611 | 04A3 | 6A00 | 6A00 | 6A01 | 6A00 |
| 0000021100 | 9A00 | FFFF | 0000 | 36E9 | 8B00 | 0C46 | 068E | 10EE |
| 0000021120 | 2699 | 3EF7 | 08DE | 068E | 10F6 | 2B26 | 1406 | F700 |
| 0000021140 | 48D8 | 8B50 | 0A46 | 068E | 10EC | 2699 | 3EF7 | 0006 |
| 0000021160 | FF50 | 1276 | 76FF | 9A10 | B275 | 19E0 | C483 | 8B08 |
| 0000021200 | 0C46 | 068E | 10EE | 2699 | 3EF7 | 08DE | 068E | 10F6 |
| 0000021220 | 2B26 | 1406 | F700 | 48D8 | 8B50 | 0A46 | 068E | 10EC |
| 0000021240 | 2699 | 3EF7 | 0006 | FF50 | 1276 | 76FF | 9A10 | B2FA |
| 0000021260 | 169A | C483 | 8E08 | 0C06 | 2611 | 36FF | 08E2 | D19A |
| 0000021300 | FBD5 | 8319 | 02C4 | 016A | 169A | F1D4 | 8318 | 02C4 |
| 0000021320 | 76FF | FF12 | 1076 | 76FF | FF0E | 0C76 | 76FF | FF0A |
| 0000021340 | 0876 | 76FF | FF06 | F61E | E912 | 05DA | 3E83 | 01CE |
| 0000021360 | 7500 | E903 | 02F5 | 468B | 8E0C | EE06 | 9910 | F726 |
| 0000021400 | DE3E | 8E08 | F606 | 2610 | 062B | 0014 | D8F7 | 8948 |
| 0000021420 | FA46 | 468B | 8E0A | EC06 | 9910 | F726 | 063E | 8900 |
| 0000021440 | F846 | 068E | 1104 | 6B26 | 7E1E | 1E08 | 068E | 1106 |
| 0000021460 | 8B26 | A487 | 0300 | FA46 | 9A50 | 8518 | 19F1 | 4689 |
| 0000021500 | 8EFC | 0E06 | 2611 | 3E83 | 08A4 | 7500 | E903 | 0251 |
| 0000021520 | 068E | 10F6 | A126 | 0014 | 3B48 | FA46 | 037C | 6AE9 |
| 0000021540 | 8300 | D03E | 0001 | 0374 | 36E9 | C700 | D006 | 0101 |
| 0000021560 | 8B00 | FA46 | 68A3 | 8B13 | F846 | 6EA3 | C713 | 6206 |
| 0000021600 | 0213 | 8E00 | 0A06 | 2611 | 36FF | 0002 | FF26 | 0036 |
| 0000021620 | FF00 | 1276 | 76FF | 6A10 | 6800 | 00FA | 409A | 001B |
| 0000021640 | 8E00 | F406 | 2610 | 36FF | 0012 | FF26 | 1036 | 6A00 |
| 0000021660 | 8E31 | FE06 | 2610 | 36FF | 08D2 | FF26 | D036 | 6A08 |
| 0000021700 | 6A02 | 9A00 | 1B67 | 0000 | BFE9 | 8301 | FA7E | 7C00 |
| 0000021720 | E903 | 006A | 3E83 | 01D0 | 7400 | E903 | 0036 | 06C7 |
| 0000021740 | 01D0 | 0001 | 468B | A3FA | 1368 | 468B | A3F8 | 136E |
| 0000021760 | 06C7 | 1362 | 0001 | 068E | 110A | FF26 | 0236 | 2600 |
| 0000022000 | 36FF | 0000 | 76FF | FF12 | 1076 | 006A | FA68 | 9A00 |
| 0000022020 | FFFF | 0000 | 068E | 10F4 | FF26 | 1236 | 2600 | 36FF |
| 0000022040 | 0010 | 316A | 068E | 10FE | FF26 | D236 | 2608 | 36FF |
| 0000022060 | 08D0 | 016A | 006A | EF9A | 0011 | E900 | 014C | 06C7 |
| 0000022100 | 1362 | 0000 | 068E | 10F8 | A126 | 000E | 3B48 | F846 |
| 0000022120 | 037C | 6AE9 | 8300 | D03E | 0001 | 0374 | 36E9 | C700 |
| 0000022140 | D006 | 0101 | 8B00 | FA46 | 68A3 | 8B13 | F846 | 6EA3 |
| 0000022160 | C713 | 6606 | 0213 | 8E00 | 0A06 | 2611 | 36FF | 0002 |
| 0000022200 | FF26 | 0036 | FF00 | 1276 | 76FF | 6A10 | 6800 | 00FA |
| 0000022220 | 5B9A | 001C | 8E00 | F406 | 2610 | 36FF | 0012 | FF26 |
| 0000022240 | 1036 | 6A00 | 8E32 | FC06 | 2610 | 36FF | 08D8 | FF26 |
| 0000022260 | D636 | 6A08 | 6A02 | 9A00 | 1C82 | 0000 | CBE9 | 8300 |
| 0000022300 | F87E | 7E00 | E903 | 0091 | 068E | 1104 | 6B26 | 7E1E |
| 0000022320 | 1E08 | 068E | 1106 | 8B26 | A687 | 2B00 | F846 | 4603 |

THU MAR 14 17:42:50 1991 MEDIT.DLL PAGE 11, LINE 591

| | | | | | | | | |
|---|---|---|---|---|---|---|---|---|
| 0000022340 | 8EFC | F806 | 2610 | 063B | 000E | 0373 | 6AE9 | 8300 |
| 0000022360 | D03E | 0001 | 0374 | 36E9 | C700 | D006 | 0101 | 8B00 |
| 0000022400 | FA46 | 68A3 | 8B13 | F846 | 6EA3 | C713 | 6606 | 0113 |
| 0000022420 | 8E00 | 0A06 | 2611 | 36FF | 0002 | FF26 | 0036 | FF00 |
| 0000022440 | 1276 | 76FF | 6A10 | 6800 | 00FA | CD9A | 001A | 8E00 |
| 0000022460 | F406 | 2610 | 36FF | 0012 | FF26 | 1036 | 6A00 | 8E32 |
| 0000022500 | FC06 | 2610 | 36FF | 08D8 | FF26 | D636 | 6A08 | 6A01 |
| 0000022520 | 9A00 | 1AF4 | 0000 | 31E9 | C700 | 6606 | 0013 | 8300 |
| 0000022540 | D03E | 0001 | 0375 | 21E9 | 8E00 | 0A06 | 2611 | 36FF |
| 0000022560 | 0002 | FF26 | 0036 | FF00 | 1276 | 76FF | 6A10 | 9A00 |
| 0000022600 | 1824 | 0000 | 06C7 | 01D0 | 0000 | 76FF | FFFA | F876 |
| 0000022620 | 76FF | FF12 | 1076 | 759A | 02B2 | 831D | 08C4 | 4AE9 |
| 0000022640 | 8B00 | F846 | 0639 | 136A | 0374 | 0CE9 | 8B00 | FA46 |
| 0000022660 | 0639 | 136C | 0375 | 32E9 | FF00 | 7036 | FF13 | 6436 |
| 0000022700 | FF13 | 6C36 | FF13 | 6A36 | FF13 | 1276 | 76FF | 9A10 |
| 0000022720 | B14C | 1D16 | C483 | FF0C | FA76 | 76FF | FFF8 | 1276 |
| 0000022740 | 76FF | 9A10 | B275 | 1A6C | C483 | 6A08 | 6A00 | 6A01 |
| 0000022760 | 6A00 | 9A01 | FFFF | 0000 | 013D | 1B00 | 25C0 | FFFE |
| 0000023000 | 0305 | 5000 | 006A | FF9A | 00FF | 5200 | 9A50 | FFFF |
| 0000023020 | 0000 | 00B8 | BA00 | 0000 | ABE9 | 8302 | D03E | 0001 |
| 0000023040 | 0375 | 8AE9 | 8300 | 623E | 0013 | 0375 | 2AE9 | 8E00 |
| 0000023060 | F406 | 2610 | 36FF | 0012 | FF26 | 1036 | 6A00 | 8E31 |
| 0000023100 | FE06 | 2610 | 33FF | 08D2 | FF26 | D036 | A108 | 1362 |
| 0000023120 | C92B | 5150 | B99A | 001D | 8300 | 663E | 0013 | 0375 |
| 0000023140 | 2AE9 | 8E00 | F406 | 2610 | 36FF | 0012 | FF26 | 1036 |
| 0000023160 | 6A00 | 8E32 | FC06 | 2610 | 36FF | 08D8 | FF26 | D636 |
| 0000023200 | A108 | 1366 | C92B | 5150 | E89A | 001B | B800 | 0000 |
| 0000023220 | 66A3 | A313 | 1362 | 36FF | 1368 | 36FF | 136E | 76FF |
| 0000023240 | FF12 | 1076 | 759A | F7B2 | 831D | 08C4 | 0EE9 | FF02 |
| 0000023260 | 1276 | 76FF | FF10 | 0E76 | 76FF | FF0C | 0A76 | 76FF |
| 0000023300 | FF08 | 0676 | 709A | 160F | 2B1E | E9D2 | 01F8 | 76FF |
| 0000023320 | FF08 | 0676 | 76FF | FF0C | 0A76 | 76FF | FF0E | 1276 |
| 0000023340 | 76FF | 9A10 | 096D | 1E29 | C483 | E90E | 01D8 | 016A |
| 0000023360 | 76FF | FF06 | 0876 | 549A | 3CA7 | 831E | 06C4 | BCE9 |
| 0000023400 | 6A01 | FF00 | 0676 | 76FF | 9A08 | A754 | 1E56 | C483 |
| 0000023420 | E906 | 01A9 | A6E9 | FF01 | 0C76 | 76FF | FF0A | 1276 |
| 0000023440 | 76FF | 9A10 | 0C3C | 1E67 | C483 | E908 | 018F | 76FF |
| 0000023460 | FF0C | 0A76 | 8E9A | C90A | 831C | 04C4 | 7EE9 | 8301 |
| 0000023500 | 463E | 0001 | 0375 | 4EE9 | 8E00 | 0406 | 2611 | 7EA1 |
| 0000023520 | 8E08 | 0C06 | 2611 | 0639 | 08E0 | 0374 | 38E9 | 2600 |
| 0000023540 | 3E83 | 08E0 | 7500 | E903 | 002D | 681E | 0143 | 016A |
| 0000023560 | 468B | 8E0C | 0406 | 2611 | 1E6B | 087E | 8E1E | 0606 |
| 0000023600 | 2611 | 872B | 00A4 | 6A50 | 8E00 | FA06 | 2610 | 36FF |
| 0000023620 | 08D4 | 1B9A | 001F | 8300 | 463E | 0001 | 0375 | 4EE9 |
| 0000023640 | 8E00 | 0406 | 2611 | 7EA1 | 8E08 | 0C06 | 2611 | 0639 |
| 0000023660 | 08E0 | 0374 | 38E9 | 2600 | 3E83 | 08E0 | 7500 | E903 |
| 0000023700 | 002D | 681E | 0140 | 016A | 468B | 8E0A | 0406 | 2611 |
| 0000023720 | 1E6B | 087E | 8E1E | 0606 | 2611 | 872B | 00A4 | 6A50 |
| 0000023740 | 8E00 | FA06 | 2610 | 36FF | 08D4 | C29A | 0007 | B800 |
| 0000023760 | 0000 | 00BA | E900 | 00CE | 00B8 | BA00 | 0000 | C5E9 |
| 0000024000 | FF00 | 1276 | 76FF | FF10 | 0E76 | 76FF | FF0C | 0A76 |
| 0000024020 | 76FF | FF08 | 0676 | 1EFF | 12F6 | A9E9 | E900 | 009D |
| 0000024040 | 463D | 7500 | E903 | FF06 | 0376 | 47E9 | 3D00 | 0024 |
| 0000024060 | 0375 | E6E9 | 76FD | E903 | 001B | 072D | 7500 | E903 |
| 0000024100 | FE8C | 192D | 7500 | E903 | F5A1 | 032D | 7500 | E903 |
| 0000024120 | F618 | ACE9 | 2DFF | 0031 | 0375 | A4E9 | 48FE | 0375 |
| 0000024140 | 8BE9 | 48FE | 0375 | 36E9 | 2DF5 | 0012 | 0375 | A6E9 |
| 0000024160 | E9FE | FF8D | 723D | 7500 | E903 | F81E | 0376 | 19E9 |
| 0000024200 | 2D00 | 004F | 0375 | 8BE9 | 2DFE | 0021 | 0375 | 5BE9 |

THU MAR 14 17:42:50 1991 MEDIT.DLL PAGE 12, LINE 650

| | | | | | | | | |
|---|---|---|---|---|---|---|---|---|
| 0000024220 | 48FA | 0375 | 29E9 | E9F6 | FF67 | 742D | 7500 | E903 |
| 0000024240 | F5D9 | 062D | 7500 | E903 | FE05 | 8B2D | 750F | E903 |
| 0000024260 | FF46 | 052D | 7500 | E903 | FE85 | 44E9 | B8FF | 0000 |
| 0000024300 | 00BA | E900 | 0000 | 5E1F | 835F | 02ED | E58B | 5D1F |
| 0000024320 | CA4D | 000E | 581E | 4590 | 8B55 | 1EEC | D88E | EC81 |
| 0000024340 | 000E | 5657 | 3E83 | 026C | 7400 | E903 | 0006 | 00B8 |
| 0000024360 | E900 | 01F2 | 46C7 | 00FC | 8B00 | 0646 | 568B | 8908 |
| 0000024400 | F646 | 5689 | C7F8 | FA46 | 0000 | 03E9 | FF00 | FA46 |
| 0000024420 | 7E81 | 84FA | 7200 | E903 | 004A | 5EC4 | FFF6 | F646 |
| 0000024440 | 8A26 | 9807 | 28E9 | FF00 | FC46 | 46C7 | 84FA | E900 |
| 0000024460 | 002F | 46FF | 8BFC | FC46 | D22B | 36F7 | 01EA | FA83 |
| 0000024500 | 7400 | E903 | FFEC | 18E9 | FF00 | FC46 | 12E9 | 0B00 |
| 0000024520 | 75C0 | E903 | FFD1 | 092D | 7500 | E903 | FFD4 | E8E9 |
| 0000024540 | E9FF | FFA9 | 068E | 1110 | 6B26 | 7E1E | 1E08 | 068E |
| 0000024560 | 1112 | 468B | 26FC | 8739 | 00A2 | 0372 | 16E9 | 8B00 |
| 0000024600 | FC46 | 068E | 1110 | 6B26 | 7E1E | 1E08 | 068E | 1112 |
| 0000024620 | 8926 | A287 | 8E00 | 1006 | 2611 | 1E6B | 087E | 8E1E |
| 0000024640 | 1206 | 2611 | 9FC4 | 00AE | 768B | 8B0A | D1C6 | 03E6 |
| 0000024660 | D1F0 | 26E6 | 408B | 2602 | 000B | 0374 | 63E9 | FF00 |
| 0000024700 | FC76 | F49A | 7DF1 | 8321 | 02C4 | 068E | 1110 | 6B26 |
| 0000024720 | 7E1E | 1E08 | 068E | 1112 | C426 | AE9F | 8B00 | 0A76 |
| 0000024740 | CE8B | E6D1 | F103 | E6D1 | 8926 | 2600 | 5089 | 8E02 |
| 0000024760 | 1006 | 2611 | 1E6B | 087E | 8E1E | 1206 | 2611 | 9FC4 |
| 0000025000 | 00AE | 768B | 8B0A | D1C6 | 03E6 | D1F0 | 26E6 | 408B |
| 0000025020 | 2602 | 000B | 0374 | 06E9 | B800 | FFFF | C7E9 | E900 |
| 0000025040 | 0085 | 76FF | 8EFC | 1006 | 2611 | 1E6B | 087E | 8E1E |
| 0000025060 | 1206 | 2611 | 9FC4 | 00AE | 768B | 8B0A | D1C6 | 03E6 |
| 0000025100 | D1F0 | 26E6 | 70FF | 2602 | 30FF | FE9A | 05F8 | 8322 |
| 0000025120 | 06C4 | 068E | 1110 | 6B26 | 7E1E | 1E08 | 068E | 1112 |
| 0000025140 | C426 | AE9F | 8B00 | 0A76 | CE8B | E6D1 | F103 | E6D1 |
| 0000025160 | 8926 | 2600 | 5089 | 8E02 | 1006 | 2611 | 1E6B | 087E |
| 0000025200 | 8E1E | 1206 | 2611 | 9FC4 | 00AE | 768B | 8B0A | D1C6 |
| 0000025220 | 03E6 | D1F0 | 26E6 | 408B | 2602 | 000B | 0374 | 06E9 |
| 0000025240 | B800 | FFFF | 3FE9 | FF00 | 0876 | 76FF | 8E06 | 1006 |
| 0000025260 | 2611 | 1E6B | 087E | 8E1E | 1206 | 2611 | 9FC4 | 00AE |
| 0000025300 | 768B | 8B0A | D1C6 | 03E6 | D1F0 | 26E6 | 70FF | 2602 |
| 0000025320 | 30FF | F89A | D7F4 | 831D | 08C4 | 06C7 | 026C | 0000 |
| 0000025340 | 00B8 | E900 | 0000 | 5F5E | ED83 | 8B02 | 1FE5 | 4D5D |
| 0000025360 | 1ECB | 9058 | 5545 | EC8B | 8E1E | 81D8 | 26EC | 5700 |
| 0000025400 | C756 | FA46 | 0270 | 5E8C | C7FC | F246 | 0101 | C02B |
| 0000025420 | 4689 | 89E4 | E246 | 068E | 1114 | 8326 | FF3E | 00FF |
| 0000025440 | 0375 | 1DE9 | FF00 | E636 | FF01 | E436 | 8D01 | DA46 |
| 0000025460 | 5016 | FF9A | 00FF | 8300 | 08C4 | 003D | 7400 | E903 |
| 0000025500 | 000F | 068E | 1116 | 8326 | FF3E | 00FF | 0375 | 3BE9 |
| 0000025520 | 1E00 | 7468 | 8D02 | E646 | 5016 | 468D | 16DA | 8D50 |
| 0000025540 | F646 | 5016 | BF68 | 1E00 | 7E68 | FF02 | E236 | FF01 |
| 0000025560 | E036 | FF01 | E636 | FF01 | E436 | 9A01 | FFFF | 0000 |
| 0000025600 | C483 | 891E | F646 | 5689 | E9F8 | 0008 | C02B | 4689 |
| 0000025620 | 89F8 | F646 | 068E | 1118 | FF26 | 1236 | 2600 | 36FF |
| 0000025640 | 0010 | 506A | 681E | 01EC | FF9A | 00FF | C700 | F446 |
| 0000025660 | 0000 | 03E9 | FF00 | F446 | 7E83 | 32F4 | 0372 | 17E9 |
| 0000025700 | 8E00 | 1206 | 6B11 | F45E | 2B1E | 26C0 | 8789 | 009E |
| 0000025720 | 8926 | 9C87 | E900 | FFDD | 006A | 468D | 16F4 | 6A50 |
| 0000025740 | 6A00 | 1E00 | 7868 | 9A02 | 293D | 232B | C483 | C70E |
| 0000025760 | 6E06 | 0102 | FF00 | F476 | 819A | F538 | 8E20 | 1406 |
| 0000026000 | 2611 | 3E83 | 224D | 7500 | E903 | 0009 | 7E83 | FEDE |
| 0000026020 | 0374 | 0FE9 | 8E00 | 1606 | 2611 | 3E83 | 2279 | 7500 |
| 0000026040 | E903 | 0050 | 46C7 | 00E0 | FF00 | E476 | 76FF | 8DE2 |
| 0000026060 | E046 | 5016 | 76FF | FFF2 | FC76 | 76FF | 8DFA | E64E |

THU MAR 14 17:42:50 1991 MEDIT.DLL PAGE 13, LINE 709

| | | | | | | | | |
|---|---|---|---|---|---|---|---|---|
| 0000026100 | 5116 | 4E8D | 16F6 | 8D51 | DA4E | 5116 | 681E | 027E |
| 0000026120 | D068 | FF00 | E236 | FF01 | E036 | FF01 | E636 | FF01 |
| 0000026140 | E436 | 9A01 | FFFF | 0000 | C483 | 8B28 | E046 | 09E9 |
| 0000026160 | E900 | 0006 | 00B8 | E900 | 0000 | 5F5E | ED83 | 8B02 |
| 0000026200 | 1FE5 | 4D5D | 1ECB | 9058 | 5545 | EC8B | 8E1E | 81D8 |
| 0000026220 | 24EC | 5700 | 1E56 | C5B8 | 8E14 | C7D8 | FA46 | 028B |
| 0000026240 | 5E8C | C7FC | F446 | 0000 | C02B | 4689 | 89E6 | E446 |
| 0000026260 | 068E | 1114 | 8326 | 6B3E | 0024 | 0375 | 1DE9 | FF00 |
| 0000026300 | E636 | FF01 | E436 | 8D01 | DC46 | 5016 | 639A | 0022 |
| 0000026320 | 8300 | 08C4 | 003D | 7400 | E903 | 000F | 068E | 1116 |
| 0000026340 | 8326 | 833E | 0024 | 0375 | 3BE9 | 1E00 | 8C68 | 8D02 |
| 0000026360 | E846 | 5016 | 468D | 16DC | 8D50 | F646 | 5016 | E568 |
| 0000026400 | 1E00 | 9068 | FF02 | E236 | FF01 | E036 | FF01 | E636 |
| 0000026420 | FF01 | E436 | 9A01 | 22AC | 0000 | C483 | 891E | F646 |
| 0000026440 | 5689 | E9F8 | 0008 | C02B | 4689 | 89F8 | F646 | 468B |
| 0000026460 | A306 | 1372 | 068E | 1114 | 8326 | 343E | 0023 | 0375 |
| 0000026500 | 09E9 | 8300 | E07E | 74FE | E903 | 000F | 068E | 1116 |
| 0000026520 | 8326 | 4C3E | 0023 | 0375 | 39E9 | 8D00 | E846 | 5016 |
| 0000026540 | 468D | 16F6 | 8D50 | DC46 | 5016 | 681E | 0290 | EE68 |
| 0000026560 | FF00 | E236 | FF01 | E036 | FF01 | E636 | FF01 | E436 |
| 0000026600 | 9A01 | FFFF | 0000 | C483 | C71A | E246 | 0000 | 06E9 |
| 0000026620 | E900 | 0003 | 00E9 | 1F00 | 5F5E | ED83 | 8B02 | 1FE5 |
| 0000026640 | 4D5D | 02CA | 1E00 | 9058 | 5545 | EC8B | 8E1E | 81D8 |
| 0000026660 | 24EC | 5700 | 1E56 | C7B8 | 8E23 | C7D8 | FA46 | 029D |
| 0000026700 | 5E8C | C7FC | F446 | 010D | C02B | 4689 | 89E6 | E446 |
| 0000026720 | 068E | 1114 | 8326 | 853E | 0025 | 0375 | 1DE9 | FF00 |
| 0000026740 | E636 | FF01 | E436 | 8D01 | DC46 | 5016 | FD9A | 0023 |
| 0000026760 | 8300 | 08C4 | 003D | 7400 | E903 | 000F | 068E | 1116 |
| 0000027000 | 8326 | 9D3E | 0025 | 0375 | 3BE9 | 1E00 | A268 | 8D02 |
| 0000027020 | E846 | 5016 | 468D | 16DC | 8D50 | F646 | 5016 | 0268 |
| 0000027040 | 1E01 | A868 | FF02 | E236 | FF01 | E036 | FF01 | E636 |
| 0000027060 | FF01 | E436 | 9A01 | 2446 | 0000 | C483 | 891E | F646 |
| 0000027100 | 5689 | E9F8 | 0008 | C02B | 4689 | 89F8 | F646 | 068E |
| 0000027120 | 1114 | 8326 | E73E | 0023 | 0375 | 09E9 | 8300 | E07E |
| 0000027140 | 74FE | E903 | 000F | 068E | 1116 | 8326 | 133E | 0024 |
| 0000027160 | 0375 | 51E9 | A100 | 1372 | 4689 | FFE2 | E676 | 76FF |
| 0000027200 | 8DE4 | E246 | 5016 | 76FF | FFF4 | FC76 | 76FF | 8DFA |
| 0000027220 | E84E | 5116 | 4E8D | 16F6 | 8D51 | DC4E | 5116 | 681E |
| 0000027240 | 02A8 | 0368 | FF01 | E236 | FF01 | E036 | FF01 | E636 |
| 0000027260 | FF01 | E436 | 9A01 | 2394 | 0000 | C483 | 8B28 | E246 |
| 0000027300 | 09E9 | E900 | 0006 | 72A1 | E913 | 0000 | 5E1F | 835F |
| 0000027320 | 02ED | E58B | 5D1F | CB4D | 581E | 4590 | 8B55 | 1EEC |
| 0000027340 | D88E | EC81 | 0024 | 5657 | B81E | 24E7 | D88E | 46C7 |
| 0000027360 | BDFA | 8C02 | FC5E | 46C7 | 00F4 | 2B00 | 89C0 | E646 |
| 0000027400 | 4689 | 8EE4 | 1406 | 2611 | 3E83 | 2507 | 7500 | E903 |
| 0000027420 | 001D | 36FF | 01E6 | 36FF | 01E4 | 468D | 16DC | 9A50 |
| 0000027440 | 251D | 0000 | C483 | 3D08 | 0000 | 0374 | 0FE9 | 8E00 |
| 0000027460 | 1606 | 2611 | 3E83 | 2533 | 7500 | E903 | 003B | 681E |
| 0000027500 | 02C1 | 468D | 16E8 | 8D50 | DC46 | 5016 | 468D | 16F6 |
| 0000027520 | 6B50 | 011C | 681E | 02C6 | 36FF | 01E2 | 36FF | 01E0 |
| 0000027540 | 36FF | 01E6 | 36FF | 01E4 | 669A | 0025 | 8300 | 1EC4 |
| 0000027560 | 4689 | 89F6 | F856 | 08E9 | 2B00 | 89C0 | F846 | 4689 |
| 0000027600 | 8EF6 | 1206 | 6B11 | 065E | 261E | BF83 | 00A0 | 7700 |
| 0000027620 | E903 | 0035 | 5E6B | 1E06 | FF26 | A08F | 6B00 | 065E |
| 0000027640 | 261E | 9F8B | 00A0 | C38B | E3D1 | D803 | E3D1 | 766B |
| 0000027660 | 1E06 | C426 | AEB4 | 2600 | 70FF | 2602 | 30FF | FE9A |
| 0000027700 | 0EF1 | 8327 | 04C4 | B8E9 | 8EFF | 1206 | 6B11 | 065E |
| 0000027720 | 261E | B7FF | 00B0 | FF26 | AEB7 | 9A00 | F1FE | 2728 |
| 0000027740 | C483 | 8E04 | 1206 | 6B11 | 065E | 261E | B7FF | 009E |

THU MAR 14 17:42:50 1991 MEDIT.DLL PAGE 14, LINE 768

| | | | | | | | | |
|---|---|---|---|---|---|---|---|---|
| 0000027760 | FF26 | 9CB7 | 9A00 | F1FE | 231A | C483 | 8E04 | 1206 |
| 0000030000 | 6B11 | 065E | 2B1E | 26C0 | 8789 | 009E | 8926 | 9C87 |
| 0000030020 | 8E00 | 1A06 | 8B11 | 0646 | 3926 | DC06 | 7408 | E903 |
| 0000030040 | 0007 | C726 | DC06 | FF08 | 8EFF | 1406 | 2611 | 3E83 |
| 0000030060 | 263A | 7500 | E903 | 0009 | 7E83 | FEE0 | 0374 | 0FE9 |
| 0000030100 | 8E00 | 1606 | 2611 | 3E83 | 2666 | 7500 | E903 | 0039 |
| 0000030120 | 468D | 16E8 | 8D50 | F646 | 5016 | 468D | 16DC | 1E50 |
| 0000030140 | C668 | 6802 | 0129 | 36FF | 01E2 | 36FF | 01E0 | 36FF |
| 0000030160 | 01E6 | 36FF | 01E4 | B29A | 0024 | 8300 | 1AC4 | 46C7 |
| 0000030200 | 00E2 | E900 | 0006 | 03E9 | E900 | 0000 | 5E1F | 835F |
| 0000030220 | 02ED | E58B | 5D1F | CA4D | 0002 | 581E | 4590 | 8B55 |
| 0000030240 | 1EEC | D88E | EC81 | 0026 | 5657 | B81E | 261A | D88E |
| 0000030260 | 46C7 | D7FA | 8C02 | FC5E | 46C7 | 09F2 | 2B01 | 89C0 |
| 0000030300 | E446 | 4689 | 8EE2 | 1406 | 2611 | 3E83 | 28BA | 7500 |
| 0000030320 | E903 | 001D | 36FF | 01E6 | 36FF | 01E4 | 468D | 16DA |
| 0000030340 | 9A50 | 2650 | 0000 | C483 | 3D08 | 0000 | 0374 | 0FE9 |
| 0000030360 | 8E00 | 1606 | 2611 | 3E83 | 28D2 | 7500 | E903 | 003B |
| 0000030400 | 681E | 02DE | 468D | 16E6 | 8D50 | DA46 | 5016 | 468D |
| 0000030420 | 16F6 | 6850 | 013E | 681E | 02E6 | 36FF | 01E2 | 36FF |
| 0000030440 | 01E0 | 36FF | 01E6 | 36FF | 01E4 | 999A | 0026 | 8300 |
| 0000030460 | 1EC4 | 4689 | 89F6 | F856 | 08E9 | 2B00 | 89C0 | F846 |
| 0000030500 | 4689 | 8EF6 | 1006 | 2611 | 7EA1 | 4008 | 4689 | E9F4 |
| 0000030520 | 0003 | 46FF | 8EF4 | 1006 | 8B11 | F446 | 3926 | 7E06 |
| 0000030540 | 7508 | E903 | 001D | 068E | 1112 | 5E6B | 1EF4 | 8B26 |
| 0000030560 | 9E87 | 2600 | 870B | 009C | 0375 | 03E9 | E900 | 0003 |
| 0000030600 | CFE9 | 8EFF | 1406 | 2611 | 3E83 | 2760 | 7500 | E903 |
| 0000030620 | 0009 | 7E83 | FEDE | 0374 | 0FE9 | 8E00 | 1606 | 2611 |
| 0000030640 | 3E83 | 2778 | 7500 | E903 | 0051 | 468B | 89F4 | E046 |
| 0000030660 | 76FF | FFE4 | E276 | 468D | 16E0 | FF50 | F276 | 76FF |
| 0000030700 | FFFC | FA76 | 4E8D | 16E6 | 8D51 | F64E | 5116 | 4E8D |
| 0000030720 | 16DA | 1E51 | E668 | 6802 | 0145 | 36FF | 01E2 | 36FF |
| 0000030740 | 01E0 | 36FF | 01E6 | 36FF | 01E4 | E69A | 0025 | 8300 |
| 0000030760 | 28C4 | 468B | E9E0 | 0009 | 06E9 | 8B00 | F446 | 00E9 |
| 0000031000 | 1F00 | 5F5E | ED83 | 8B02 | 1FE5 | 4D5D | 1ECB | 9058 |
| 0000031020 | 5545 | EC8B | 8E1E | 81D8 | 26EC | 5700 | C756 | FA46 |
| 0000031040 | 02F8 | 5E8C | C7FC | F246 | 0101 | C02B | 4689 | 89E4 |
| 0000031060 | E246 | 068E | 1114 | 8326 | FD3E | 0029 | 0375 | 1DE9 |
| 0000031100 | FF00 | E636 | FF01 | E436 | 8D01 | DA46 | 5016 | 129A |
| 0000031120 | 0028 | 8300 | 08C4 | 003D | 7400 | E903 | 000F | 068E |
| 0000031140 | 1116 | 8326 | 153E | 002A | 0375 | 3BE9 | 1E00 | FC68 |
| 0000031160 | 8D02 | E646 | 5016 | 468D | 16DA | 8D50 | F646 | 5016 |
| 0000031200 | 5768 | 1E01 | 0068 | FF03 | E236 | FF01 | E036 | FF01 |
| 0000031220 | E636 | FF01 | E436 | 9AD1 | 285B | 0000 | C483 | 891E |
| 0000031240 | F646 | 5689 | E9F8 | 0008 | C02B | 4689 | 89F8 | F646 |
| 0000031260 | 468B | 0B08 | 0646 | 0375 | 0BE9 | 8B00 | 0846 | 460B |
| 0000031300 | 7406 | E903 | 007D | 068E | 1114 | 8326 | E63E | 002A |
| 0000031320 | 0375 | 09E9 | 8300 | DE7E | 74FE | E903 | 000F | 068E |
| 0000031340 | 1116 | 8326 | FE3E | 002A | 0375 | 50E9 | C700 | E046 |
| 0000031360 | 0013 | 76FF | FFE4 | E276 | 468D | 16E0 | FF50 | F276 |
| 0000031400 | 76FF | FFFC | FA76 | 4E8D | 16E6 | 8D51 | F64E | 5116 |
| 0000031420 | 4E8D | 16DA | 1E51 | 0068 | 6803 | 015B | 36FF | 01E2 |
| 0000031440 | 36FF | 01E0 | 36FF | 01E6 | 36FF | 01E4 | 469A | 002B |
| 0000031460 | 8300 | 28C4 | 468B | E9E0 | 0433 | 06E9 | B800 | 0013 |
| 0000031500 | 2AE9 | C7D4 | F446 | 0032 | 7E83 | 0012 | 0375 | DBE9 |
| 0000031520 | C700 | F446 | 0000 | 03E9 | FF00 | F446 | 7E83 | 32F4 |
| 0000031540 | 0372 | 41E9 | 8E00 | 1206 | 6B11 | F45E | 261E | 878B |
| 0000031560 | 009E | 0B26 | 9C87 | 7500 | E903 | 0027 | 76FF | FF08 |
| 0000031600 | 0676 | 5E6B | 1EF4 | FF26 | 9EB7 | 2600 | B7FF | 009C |
| 0000031620 | 2E9A | 1BF5 | 832C | 08C4 | 003D | 7400 | E903 | 0003 |

THU MAR 14 17:42:50 1991 MEDIT.DLL PAGE 15, LINE 827

| | | | | | | | | |
|---|---|---|---|---|---|---|---|---|
| 0000031640 | 03E9 | E900 | FFB3 | 7E83 | 32F4 | 0372 | 7DE9 | 8E00 |
| 0000031660 | 1406 | 2611 | 3E83 | 2B9D | 7500 | E903 | 0009 | 7E83 |
| 0000031700 | FEDE | 0374 | 0FE9 | 8E00 | 1606 | 2611 | 3E83 | 2BB5 |
| 0000031720 | 7500 | E903 | 0050 | 46C7 | 11E0 | FF00 | E476 | 76FF |
| 0000031740 | 8DE2 | E046 | 5016 | 76FF | FFF2 | FC76 | 76FF | 8DFA |
| 0000031760 | E64E | 5116 | 4E8D | 16F6 | 8D51 | DA4E | 5116 | 681E |
| 0000032000 | 0300 | 6568 | FF01 | E236 | FF01 | E036 | FF01 | E636 |
| 0000032020 | FF01 | E436 | 9A01 | 2BFD | 0000 | C483 | 8B28 | E046 |
| 0000032040 | 4AE9 | E903 | 0006 | 11B8 | E900 | 0341 | 46C7 | 00F4 |
| 0000032060 | E900 | 0003 | 46FF | 83F4 | F47E | 7232 | E903 | 001D |
| 0000032100 | 068E | 1112 | 5E6B | 1EF4 | 8B26 | 9E87 | 2600 | 870B |
| 0000032120 | 009C | 0374 | 03E9 | E900 | 0003 | D7E9 | 83FF | F47E |
| 0000032140 | 7432 | E903 | 007D | 068E | 1114 | 8326 | 4C3E | 002C |
| 0000032160 | 0375 | 09E9 | 8300 | DE7E | 74FE | E903 | 000F | 068E |
| 0000032200 | 1116 | 8326 | 643E | 002C | 0375 | 50E9 | C700 | E046 |
| 0000032220 | 0384 | 76FF | FFE4 | E276 | 468D | 16E0 | FF50 | F276 |
| 0000032240 | 76FF | FFFC | FA76 | 4E8D | 16E6 | 8D51 | F64E | 5116 |
| 0000032260 | 4E8D | 16DA | 1E51 | 0068 | 6803 | 016E | 36FF | 01E2 |
| 0000032300 | 36FF | 01E0 | 36FF | 01E6 | 36FF | 01E4 | AC9A | 002C |
| 0000032320 | 8300 | 28C4 | 468B | E9E0 | 0293 | 06E9 | B800 | 0384 |
| 0000032340 | 8AE9 | 6A02 | 6806 | 0100 | D09A | CBF9 | 832C | 04C4 |
| 0000032360 | 068E | 1112 | 5E6B | 1EF4 | 8926 | AE87 | 2600 | 9789 |
| 0000032400 | 00B0 | 5E6B | 1EF4 | 8B26 | B087 | 2600 | 870B | 00AE |
| 0000032420 | 0374 | 7DE9 | 8E00 | 1406 | 2611 | 3E83 | 27FC | 7500 |
| 0000032440 | E903 | 0009 | 7E83 | FEDE | 0374 | 0FE9 | 8E00 | 1606 |
| 0000032460 | 2611 | 3E83 | 2828 | 7500 | E903 | 0050 | 46C7 | 07E0 |
| 0000032500 | FF00 | E476 | 76FF | 8DE2 | E046 | 5016 | 76FF | FFF2 |
| 0000032520 | FC76 | 76FF | 8DFA | E64E | 5116 | 4E8D | 16F6 | 8D51 |
| 0000032540 | DA4E | 5116 | 681E | 0300 | 7168 | FF01 | E236 | FF01 |
| 0000032560 | E036 | FF01 | E636 | FF01 | E436 | 9A01 | 291B | 0000 |
| 0000032600 | C483 | 8B28 | E046 | E4E9 | E901 | 0006 | 07B8 | E900 |
| 0000032620 | 01DB | 76FF | FF08 | 0676 | 589A | D5F5 | 832C | 04C4 |
| 0000032640 | 5040 | F49A | F1F1 | 8326 | 02C4 | 068E | 1112 | 5E6B |
| 0000032660 | 1EF4 | 8926 | 9C87 | 2600 | 9789 | 009E | 5E6B | 1EF4 |
| 0000032700 | 8B26 | 9E87 | 2600 | 870B | 009C | 0374 | 7DE9 | 8E00 |
| 0000032720 | 1406 | 2611 | 3E83 | 2E27 | 7500 | E903 | 0009 | 7E83 |
| 0000032740 | FEDE | 0374 | 0FE9 | 8E00 | 1606 | 2611 | 3E83 | 2E3F |
| 0000032760 | 7500 | E903 | 0050 | 46C7 | 07E0 | FF00 | E476 | 76FF |
| 0000033000 | 8DE2 | E046 | 5016 | 76FF | FFF2 | FC76 | 76FF | 8DFA |
| 0000033020 | E64E | 5116 | 4E8D | 16F6 | 8D51 | DA4E | 5116 | 681E |
| 0000033040 | 0300 | 7368 | FF01 | E236 | FF01 | E036 | FF01 | E636 |
| 0000033060 | FF01 | E436 | 9A01 | 2E87 | 0000 | C483 | 8B28 | E046 |
| 0000033100 | 2AE9 | E901 | 0006 | 07B8 | E900 | 0121 | 76FF | FF08 |
| 0000033120 | 0676 | 068E | 1112 | 5E6B | 1EF4 | FF26 | 9EB7 | 2600 |
| 0000033140 | B7FF | 009C | F89A | C3F4 | 832A | 08C4 | 068E | 1112 |
| 0000033160 | 5E6B | 1EF4 | C726 | A087 | 0000 | 6B00 | F45E | 261E |
| 0000033200 | 87C7 | 00A2 | 0000 | 5E6B | 1EF4 | C726 | A487 | 0000 |
| 0000033220 | 6B00 | F45E | 261E | 87C7 | 00A6 | 0000 | 5E6B | 1EF4 |
| 0000033240 | C726 | A887 | 0000 | 6B00 | F45E | 261E | 87C7 | 00AA |
| 0000033260 | 0000 | 5E6B | 1EF4 | C726 | AC87 | 0000 | 6B00 | F45E |
| 0000033300 | 261E | 87C7 | 00B6 | 0100 | 468B | 8B0A | 0C56 | 5E6B |
| 0000033320 | 1EF4 | 8926 | B287 | 2600 | 9789 | 00B4 | 5E6B | 1EF4 |
| 0000033340 | C726 | B887 | 0000 | 8B00 | F446 | 5EC4 | 260E | 0789 |
| 0000033360 | 068E | 1114 | 8326 | 693E | 0029 | 0375 | 09E9 | 8300 |
| 0000033400 | DE7E | 74FE | E903 | 000F | 068E | 1116 | 8326 | 953E |
| 0000033420 | 0029 | 0375 | 50E9 | C700 | E046 | 0000 | 76FF | FFE4 |
| 0000033440 | E276 | 468D | 16E0 | FF50 | F276 | 76FF | FFFC | FA76 |
| 0000033460 | 4E8D | 16E6 | 8D51 | F64E | 5116 | 4E8D | 16DA | 1E51 |
| 0000033500 | 0068 | 6803 | 0181 | 36FF | 01E2 | 36FF | 01E0 | 36FF |

THU MAR 14 17:42:50 1991 MEDIT.DLL PAGE 16, LINE 886

| | | | | | | | | |
|---|---|---|---|---|---|---|---|---|
| 0000033520 | 01E6 | 36FF | 01E4 | 5D9A | 002A | 8300 | 28C4 | 468B |
| 0000033540 | E9E0 | 0009 | 06E9 | B800 | 0000 | 00E9 | 5E00 | 835F |
| 0000033560 | 02ED | E58B | 5D1F | CB4D | 581E | 4590 | 8B55 | 1EEC |
| 0000033600 | D88E | EC81 | 00B0 | 5657 | B81E | 27DC | D88E | 46C7 |
| 0000033620 | 0BFA | 8C03 | FC5E | 86C7 | FF6E | 0101 | C02B | 8689 |
| 0000033640 | FF60 | 8689 | FF5E | 068E | 1114 | 8326 | 063E | 002D |
| 0000033660 | 0375 | 1EE9 | FF00 | E636 | FF01 | E436 | 8D01 | 5686 |
| 0000033700 | 16FF | 9A50 | 297F | 0000 | C483 | 3D08 | 0000 | 0374 |
| 0000033720 | 0FE9 | 8E00 | 1606 | 2611 | 3E83 | 2D1E | 7500 | E903 |
| 0000033740 | 0040 | 681E | 030F | 868D | FF62 | 5016 | 868D | FF56 |
| 0000033760 | 5016 | 868D | FF72 | 5016 | 9668 | 1E01 | 1468 | FF03 |
| 0000034000 | E236 | FF01 | E036 | FF01 | E636 | FF01 | E436 | 9A01 |
| 0000034020 | 29C8 | 0000 | C483 | 891E | 7286 | 89FF | 7496 | E9FF |
| 0000034040 | 000A | C02B | 8689 | FF74 | 8689 | FF72 | 86C7 | FF70 |
| 0000034060 | 0000 | 068E | 1110 | A126 | 087E | 8689 | FF52 | 72A1 |
| 0000034100 | 8913 | 5486 | 8EFF | 1406 | 2611 | 3E83 | 3034 | 7500 |
| 0000034120 | E903 | 000A | BE83 | FF5A | 74FE | E903 | 000F | 068E |
| 0000034140 | 1116 | 8326 | 4D3E | 0030 | 0375 | 62E9 | FF00 | 0676 |
| 0000034160 | C39A | 0531 | 8330 | 02C4 | 8689 | FF5C | B6FF | FF60 |
| 0000034200 | B6FF | FF5E | 868D | FF5C | 5016 | B6FF | FF6E | 76FF |
| 0000034220 | FFFC | FA76 | 8E8D | FF62 | 5116 | 8E8D | FF72 | 5116 |
| 0000034240 | 8E8D | FF56 | 5116 | 681E | 0314 | A668 | FF01 | E236 |
| 0000034260 | FF01 | E036 | FF01 | E636 | FF01 | E436 | 9A01 | 309D |
| 0000034300 | 0000 | C483 | 8B28 | 5C86 | E9FF | 01B9 | 0EE9 | FF00 |
| 0000034320 | 0676 | C39A | 1231 | 8330 | 02C4 | A8E9 | 6A01 | 9A00 |
| 0000034340 | 23B5 | 301A | 76FF | 9A06 | 3881 | 302B | 003D | 7500 |
| 0000034360 | E903 | 0090 | B6FF | FF54 | B59A | D223 | 8E30 | 1406 |
| 0000034400 | 2611 | 3E83 | 2EDD | 7500 | E903 | 000A | BE83 | FF5A |
| 0000034420 | 74FE | E903 | 000F | 068E | 1116 | 8326 | 0A3E | 002F |
| 0000034440 | 0375 | 59E9 | C700 | 5C86 | FFFF | FFFF | 60B6 | FFFF |
| 0000034460 | 5EB6 | 8DFF | 5C86 | 16FF | FF50 | 6EB6 | FFFF | FC76 |
| 0000034500 | 76FF | 8DFA | 628E | 16FF | 8D51 | 728E | 16FF | 8D51 |
| 0000034520 | 568E | 16FF | 1E51 | 1468 | 6803 | 01AF | 36FF | 01E2 |
| 0000034540 | 36FF | 01E0 | 36FF | 01E6 | 36FF | 01E4 | 669A | 002D |
| 0000034560 | 8300 | 28C4 | 868B | FF5C | 0AE9 | E901 | 0006 | FFB8 |
| 0000034600 | E9FF | 0101 | 068E | 1112 | 5E6B | 1E06 | FF26 | B4B7 |
| 0000034620 | 2600 | B7FF | 00B2 | 8468 | 8D00 | 7686 | 16FF | 9A50 |
| 0000034640 | F746 | 30F2 | C483 | 0B0A | 75D0 | E903 | 0019 | 868B |
| 0000034660 | FF70 | 86FF | FF70 | 6A50 | 8D00 | 7686 | 16FF | 9A50 |
| 0000034700 | 7A05 | 30FE | BDE9 | FFFF | 54B6 | 9AFF | 23B5 | 3106 |
| 0000034720 | 76FF | 9A06 | 7225 | 3118 | C483 | 8302 | 723E | 0013 |
| 0000034740 | 0375 | 19E9 | 9A00 | AC6C | 2D97 | 068E | 111C | 8326 |
| 0000034760 | 163E | 0000 | 0374 | 05E9 | 9A00 | 9B7D | 2FA3 | 068E |
| 0000035000 | 1114 | 8326 | 7C3E | 002F | 0375 | 0AE9 | 8300 | 5ABE |
| 0000035020 | FEFF | 0374 | 0FE9 | 8E00 | 1606 | 2611 | 3E83 | 2F95 |
| 0000035040 | 7500 | E903 | 0059 | 86C7 | FF5C | 0000 | B6FF | FF60 |
| 0000035060 | B6FF | FF5E | 868D | FF5C | 5016 | B6FF | FF6E | 76FF |
| 0000035100 | FFFC | FA76 | 8E8D | FF62 | 5116 | 8E8D | FF72 | 5116 |
| 0000035120 | 8E8D | FF56 | 5116 | 681E | 0314 | C268 | FF01 | E236 |
| 0000035140 | FF01 | E036 | FF01 | E636 | FF01 | E436 | 9A01 | 2FEE |
| 0000035160 | 0000 | C483 | 8B28 | 5C86 | E9FF | 0009 | 06E9 | B800 |
| 0000035200 | 0000 | 00E9 | 1F00 | 5F5E | ED83 | 8B02 | 1FE5 | 4D5D |
| 0000035220 | 02CA | 1E00 | 9058 | 5545 | EC8B | 8E1E | 81D8 | C6EC |
| 0000035240 | 5700 | C756 | FA46 | 0323 | 5E8C | C7FC | 6686 | 01FF |
| 0000035260 | 2B01 | 89C0 | 5086 | 89FF | 4E86 | 8EFF | 1406 | 2611 |
| 0000035300 | 3E83 | 32B7 | 7500 | E903 | 001E | 36FF | 01E6 | 36FF |
| 0000035320 | 01E4 | 868D | FF42 | 5016 | F49A | 002E | 8300 | 08C4 |
| 0000035340 | 003D | 7400 | E903 | 000F | 068E | 1116 | 8326 | D03E |
| 0000035360 | 0032 | 0375 | 40E9 | 1E00 | 2768 | 8D03 | 5886 | 16FF |

THU MAR 14 17:42:50 1991 MEDIT.DLL PAGE 17, LINE 945

| | | | | | | | | |
|---|---|---|---|---|---|---|---|---|
| 0000035400 | 8D50 | 4286 | 16FF | 8D50 | 7286 | 16FF | 6850 | 01DA |
| 0000035420 | 681E | 032C | 75FF | 01E2 | 36FF | 01E0 | 36FF | 01E6 |
| 0000035440 | 36FF | 01E4 | 409A | 002F | 8300 | 1EC4 | 8689 | FF72 |
| 0000035460 | 9689 | FF74 | 0AE9 | 2B00 | 89C0 | 7486 | 89FF | 7286 |
| 0000035500 | C7FF | 6A86 | 00FF | 8E00 | 1006 | 2611 | 7EA1 | 8908 |
| 0000035520 | 3E86 | A1FF | 1372 | 8689 | FF40 | 86C7 | FF6C | 0004 |
| 0000035540 | 006A | B59A | 9D23 | FF32 | 0676 | 819A | AE38 | 3D32 |
| 0000035560 | 0000 | 0375 | 90E9 | FF00 | 40B6 | 9AFF | 23B5 | 3361 |
| 0000035600 | 068E | 1114 | 8326 | AB3E | 0033 | 0375 | 0AE9 | 8300 |
| 0000035620 | 46BE | FEFF | 0374 | 0FE9 | 8E00 | 1606 | 2611 | 3E83 |
| 0000035640 | 33C4 | 7500 | E903 | 0059 | 86C7 | FF48 | 0005 | B6FF |
| 0000035660 | FF50 | B6FF | FF4E | 868D | FF48 | 5016 | B6FF | FF66 |
| 0000035700 | 76FF | FFFC | FA76 | 8E8D | FF58 | 5116 | 8E8D | FF72 |
| 0000035720 | 5116 | 8E8D | FF42 | 5116 | 681E | 032C | F468 | FF01 |
| 0000035740 | E236 | FF01 | E036 | FF01 | E636 | FF01 | E436 | 9A01 |
| 0000035760 | 3414 | 0000 | C483 | 8B28 | 4886 | E9FF | 0548 | 06E9 |
| 0000036000 | B800 | 0005 | 3FE9 | C705 | 5286 | 00FF | C700 | 5486 |
| 0000036020 | 00FF | 8E00 | 1206 | 6B11 | 065E | 261E | B7FF | 00B4 |
| 0000036040 | FF26 | B2B7 | 6800 | 0084 | 868D | FF76 | 5016 | 469A |
| 0000036060 | 65F7 | 8334 | 0AC4 | D00B | 0375 | 3AE9 | 8E04 | 1006 |
| 0000036100 | 2611 | 1E6B | 087E | 8E1E | 1206 | 2611 | 878B | 00B6 |
| 0000036120 | 3B48 | 5286 | 76FF | E903 | 0219 | 068E | 1110 | 6B26 |
| 0000036140 | 7E1E | 1E08 | 068E | 1112 | 8126 | A0BF | 0000 | 7710 |
| 0000036160 | E903 | 0087 | 068E | 1114 | 8326 | 863E | 0034 | 0375 |
| 0000036200 | 0AE9 | 8300 | 46BE | FEFF | 0374 | 0FE9 | 8E00 | 1606 |
| 0000036220 | 2611 | 3E83 | 349F | 7500 | E903 | 0059 | 86C7 | FF48 |
| 0000036240 | 0007 | B6FF | FF50 | B6FF | FF4E | 868D | FF48 | 5016 |
| 0000036260 | B6FF | FF66 | 76FF | FFFC | FA76 | 8E8D | FF58 | 5116 |
| 0000036300 | 8E8D | FF72 | 5116 | 8E8D | FF42 | 5116 | 681E | 032C |
| 0000036320 | 0068 | FF02 | E236 | FF01 | E036 | FF01 | E636 | FF01 |
| 0000036340 | E436 | 9A01 | 34EF | 0000 | C483 | 8B28 | 4886 | E9FF |
| 0000036360 | 0454 | 06E9 | B800 | 0007 | 4BE9 | 8E04 | 1006 | 2611 |
| 0000036400 | 1E6B | 087E | 8E1E | 1206 | 2611 | 878B | 00B6 | 0005 |
| 0000036420 | 8B01 | D1C8 | 03E0 | D1C1 | 50E0 | 068E | 1110 | 6B26 |
| 0000036440 | 7E1E | 1E08 | 068E | 1112 | FF26 | B0B7 | 2600 | B7FF |
| 0000036460 | 00AE | FE9A | 2CF8 | 8331 | 06C4 | 8689 | FF4A | 9689 |
| 0000036500 | FF4C | 868B | FF4C | 860B | FF4A | 0374 | 87E9 | 8E00 |
| 0000036520 | 1406 | 2611 | 3E83 | 3135 | 7500 | E903 | 000A | BE83 |
| 0000036540 | FF46 | 74FE | E903 | 000F | 068E | 1116 | 8326 | 4E3E |
| 0000036560 | 0031 | 0375 | 59E9 | C700 | 4886 | 07FF | FF00 | 50B6 |
| 0000036600 | FFFF | 4EB6 | 8DFF | 4886 | 16FF | FF50 | 66B6 | FFFF |
| 0000036620 | FC76 | 76FF | 8DFA | 588E | 16FF | 8D51 | 728E | 16FF |
| 0000036640 | 8D51 | 428E | 16FF | 1E51 | 2C68 | 6803 | 0206 | 36FF |
| 0000036660 | 01E2 | 36FF | 01E0 | 36FF | 01E6 | 36FF | 01E4 | 9E9A |
| 0000036700 | 0031 | 8300 | 28C4 | 868B | FF48 | 79E9 | E903 | 0006 |
| 0000036720 | 07B8 | E900 | 0370 | 868B | FF4A | 968B | FF4C | 068E |
| 0000036740 | 1110 | 6B26 | 7E1E | 1E08 | 068E | 1112 | 8926 | AE87 |
| 0000036760 | 2600 | 9789 | 00B0 | 068E | 1110 | 6B26 | 7E1E | 1E08 |
| 0000037000 | 068E | 1112 | 8B26 | B687 | 8900 | 5686 | E9FF | 0004 |
| 0000037020 | 86FF | FF56 | 068E | 1110 | 6B26 | 7E1E | 1E08 | 068E |
| 0000037040 | 1112 | 8B26 | B687 | 0500 | 0100 | 863B | FF56 | 0377 |
| 0000037060 | 2BE9 | 8E00 | 1006 | 2611 | 1E6B | 087E | 8E1E | 1206 |
| 0000037100 | 2611 | 9FC4 | 00AE | B68B | FF56 | C68B | E6D1 | F003 |
| 0000037120 | E6D1 | C02B | 8926 | 0240 | 8926 | E900 | FFB2 | 068E |
| 0000037140 | 1110 | 6B26 | 7E1E | 1E08 | 068E | 1112 | 8126 | B687 |
| 0000037160 | 0000 | 8D01 | 7686 | 16FF | 9A50 | F558 | 35C1 | C483 |
| 0000037200 | 8B04 | C6F0 | 7582 | 00FF | 868D | FF76 | 5016 | 589A |
| 0000037220 | D9F5 | 8335 | 04C4 | 843D | 7600 | E903 | 0092 | 096A |
| 0000037240 | 868D | FF76 | 5016 | 249A | 16FA | 8336 | 06C4 | 8689 |

THU MAR 14 17:42:50 1991 MEDIT.DLL PAGE 18, LINE 1004

| | | | | | | | | |
|---|---|---|---|---|---|---|---|---|
| 0000037260 | FF6E | 9689 | FF70 | D00B | 0375 | 73E9 | 8B00 | 6E86 |
| 0000037300 | 8DFF | 768E | 2BFF | 89C1 | 6886 | 8BFF | 6886 | 99FF |
| 0000037320 | BEF7 | FF6C | F740 | 6CAE | 2BFF | 6886 | 89FF | 6486 |
| 0000037340 | 16FF | 9A51 | F558 | 3642 | C483 | 8B04 | 2BF0 | 6EB6 |
| 0000037360 | 8DFF | 7682 | 50FF | 868B | FF6E | 968B | FF70 | 5240 |
| 0000037400 | 8B50 | 6E86 | 8BFF | 7096 | 03FF | 6486 | 52FF | 9A50 |
| 0000037420 | FA52 | 3658 | C483 | FF0A | 64B6 | 6AFF | FF20 | 70B6 |
| 0000037440 | FFFF | 6EB6 | 9AFF | FB1C | 3669 | C483 | E908 | FF58 |
| 0000037460 | 868D | FF76 | 5016 | 589A | 95F5 | 8332 | 04C4 | 8940 |
| 0000037500 | 3C86 | 8BFF | 5486 | 39FF | 3C86 | 7FFF | E903 | 0008 |
| 0000037520 | 868B | FF3C | 8689 | FF54 | B6FF | FF3C | F49A | 9BF1 |
| 0000037540 | 8337 | 02C4 | 068E | 1110 | 6B26 | 7E1E | 1E08 | 068E |
| 0000037560 | 1112 | C426 | AE9F | 8B00 | 52B6 | 8BFF | D1CE | 03E6 |
| 0000037600 | D1F1 | 26E6 | 0089 | 8926 | 0250 | 068E | 1110 | 6B26 |
| 0000037620 | 7E1E | 1E08 | 068E | 1112 | C426 | AE9F | 8B00 | 52B6 |
| 0000037640 | 8BFF | D1C6 | u3E6 | D1F0 | 26E6 | 408B | 2602 | 000B |
| 0000037660 | 0374 | 87E9 | 8E00 | 1406 | 2611 | 3E83 | 37F6 | 7500 |
| 0000037700 | E903 | 000A | BE83 | FF46 | 74FE | E903 | 000F | 068E |
| 0000037720 | 1116 | 8326 | 0F3E | 0038 | 0375 | 59E9 | C700 | 4886 |
| 0000037740 | 07FF | FF00 | 50B6 | FFFF | 4EB6 | 8DFF | 4886 | 16FF |
| 0000037760 | FF50 | 66B6 | FFFF | FC76 | 76FF | 8DFA | 588E | 16FF |
| 0000040000 | 8D51 | 728E | 16FF | 8D51 | 428E | 16FF | 1E51 | 2C68 |
| 0000040020 | 6803 | 0228 | 36FF | 01E2 | 36FF | 01E0 | 36FF | 01E6 |
| 0000040040 | 36FF | 01E4 | 5F9A | 0038 | 8300 | 28C4 | 868B | FF48 |
| 0000040060 | 13E9 | E901 | 0006 | 07B8 | E900 | 010A | 868D | FF76 |
| 0000040100 | 5016 | 068E | 1110 | 6B26 | 7E1E | 1E08 | 068E | 1112 |
| 0000040120 | C426 | AE9F | 8B00 | 52B6 | 8BFF | D1C6 | 03E6 | D1F0 |
| 0000040140 | 26E6 | 70FF | 2602 | 30FF | F89A | E2F4 | 8337 | 08C4 |
| 0000040160 | 86FF | FF52 | 9CE9 | 8BFB | 5286 | 8EFF | 1006 | 2611 |
| 0000040200 | 1E6B | 087E | 8E1E | 1206 | 2611 | 8789 | 00A0 | 868B |
| 0000040220 | FF54 | 068E | 1110 | 6B26 | 7E1E | 1E08 | 068E | 1112 |
| 0000040240 | 8926 | A2B7 | C700 | E806 | FF01 | FFFF | 40B6 | 9AFF |
| 0000040260 | 23B5 | 37EA | 76FF | 9A06 | 7225 | 35AC | C483 | 8E02 |
| 0000040300 | 1406 | 2611 | 3E83 | 31F2 | 7500 | E903 | 000A | BE83 |
| 0000040320 | FF46 | 74FE | E903 | 000F | 068E | 1116 | 8326 | 1F3E |
| 0000040340 | 0032 | 0375 | 59E9 | C700 | 4886 | 00FF | FF00 | 50B6 |
| 0000040360 | FFFF | 4EB6 | 8DFF | 4886 | 16FF | FF50 | 66B6 | FFFF |
| 0000040400 | FC76 | 76FF | 8DFA | 588E | 16FF | 8D51 | 728E | 16FF |
| 0000040420 | 8D51 | 428E | 16FF | 1E51 | 2C68 | 6803 | 0239 | 36FF |
| 0000040440 | 01E2 | 36FF | 01ED | 36FF | 01E6 | 36FF | 01E4 | 209A |
| 0000040460 | 0033 | 8300 | 28C4 | 868B | FF48 | 09E9 | E900 | 0006 |
| 0000040500 | 00B8 | E900 | 0000 | 5F5E | ED83 | 8B02 | 1FE5 | 4D5D |
| 0000040520 | 1ECB | 9058 | 5545 | EC8B | 8E1E | 81D8 | 2EEC | 5700 |
| 0000040540 | 1E56 | BAB8 | 8E2E | C7D8 | FA46 | 033F | 5E8C | C7FC |
| 0000040560 | EA46 | 0101 | C02B | 4689 | 89DC | DA46 | 068E | 1114 |
| 0000040600 | 8326 | 3A3E | 0039 | 0375 | 1DE9 | FF00 | E636 | FF01 |
| 0000040620 | E436 | 8D01 | D246 | 5016 | 099A | 0032 | 8300 | 08C4 |
| 0000040640 | 003D | 7400 | E903 | 000F | 068E | 1116 | 8326 | 523E |
| 0000040660 | 0039 | 0375 | 3BE9 | 1E00 | 4368 | 8D03 | DE46 | 5016 |
| 0000040700 | 468D | 16D2 | 8D50 | EC46 | 5016 | 5068 | 1E02 | 4A68 |
| 0000040720 | FF03 | E236 | FF01 | E036 | FF01 | E636 | FF01 | E436 |
| 0000040740 | 9A01 | 3255 | 0000 | C483 | 891E | EC46 | 5689 | E9EE |
| 0000040760 | 0008 | C02B | 4689 | 89EE | EC46 | 7E83 | 3206 | 0377 |
| 0000041000 | 7DE9 | 8E00 | 1406 | 2611 | 3E83 | 36EC | 7500 | E903 |
| 0000041020 | 0009 | 7E83 | FED6 | 0374 | 0FE9 | 8E00 | 1606 | 2611 |
| 0000041040 | 3E83 | 3705 | 7500 | E903 | 0050 | 46C7 | FFD8 | FFFF |
| 0000041060 | DC76 | 76FF | 8DDA | D846 | 5016 | 76FF | FFEA | FC76 |
| 0000041100 | 76FF | 8DFA | DE4E | 5116 | 4E8D | 16EC | 8D51 | D24E |
| 0000041120 | 5116 | 681E | 034A | 5568 | FF02 | E236 | FF01 | E036 |

THU MAR 14 17:42:50 1991 MEDIT.DLL PAGE 19, LINE 1063

| | | | | | | | | |
|---|---|---|---|---|---|---|---|---|
| 0000041140 | FF01 | E636 | FF01 | E436 | 9A01 | 3755 | 0000 | C483 |
| 0000041160 | 8B28 | D846 | 78E9 | E901 | 0006 | FFB8 | E9FF | 016F |
| 0000041200 | 068E | 111E | A126 | 0008 | 068E | 1110 | 6B26 | 7E1E |
| 0000041220 | 1E08 | 068E | 1112 | 8926 | A887 | 8E00 | 2006 | 2611 |
| 0000041240 | 04A1 | 8E00 | 1006 | 2611 | 1E6B | 087E | 8E1E | 1206 |
| 0000041260 | 2611 | 8789 | 00AA | 7E83 | 0006 | 0374 | 08E9 | FF00 |
| 0000041300 | 0676 | D89A | 378B | 8B3A | 0646 | 068E | 1110 | A326 |
| 0000041320 | 087E | 6B26 | 7E1E | 1E08 | 068E | 1112 | 8B26 | A887 |
| 0000041340 | 8E00 | 1E06 | 2611 | 08A3 | 8E00 | 1006 | 2611 | 1E6B |
| 0000041360 | 087E | 8E1E | 1206 | 2611 | 878B | 00AA | 068E | 1120 |
| 0000041400 | A326 | 0004 | 8E9A | 5CB0 | C73A | E806 | FF01 | 6AFF |
| 0000041420 | 8E01 | 1006 | 2611 | 1E6B | 087E | 8E1E | 1206 | 2611 |
| 0000041440 | B7FF | 009E | FF26 | 9CB7 | 9A00 | 9305 | 3A7D | 068E |
| 0000041460 | 1110 | 6B26 | 7E1E | 1E08 | 068E | 1112 | FF26 | A0B7 |
| 0000041500 | 1E00 | 4768 | 8D03 | F046 | 5016 | DC9A | 8CF7 | 833A |
| 0000041520 | 0AC4 | 026A | 468D | 16F0 | 9A50 | 9305 | 3A9B | 3E83 |
| 0000041540 | 1372 | 7500 | E903 | 000A | 6C9A | A0AC | 9A3A | 9B7D |
| 0000041560 | 368F | 068E | 1114 | 8326 | B33E | 0038 | 0375 | 09E9 |
| 0000041600 | 8300 | D67E | 74FE | E903 | 000F | 068E | 1116 | 8326 |
| 0000041620 | DF3E | 0038 | 0375 | 50E9 | C700 | D846 | 0000 | 76FF |
| 0000041640 | FFDC | DA76 | 468D | 16D8 | FF50 | EA76 | 76FF | FFFC |
| 0000041660 | FA76 | 4E8D | 16DE | 8D51 | EC4E | 5116 | 4E8D | 16D2 |
| 0000041700 | 1E51 | 4A68 | 6803 | 0274 | 36FF | 01E2 | 36FF | 01E0 |
| 0000041720 | 36FF | 01E6 | 36FF | 01E4 | 9A9A | 0039 | 8300 | 28C4 |
| 0000041740 | 468B | E9D8 | 0009 | 06E9 | B800 | 0000 | 00E9 | 1F00 |
| 0000041760 | 5F5E | ED83 | 8B02 | 1FE5 | 4D5D | 02CA | 1E00 | 9058 |
| 0000042000 | 5545 | EC8B | 8E1E | 81D8 | 24EC | 5700 | C756 | FA46 |
| 0000042020 | 035B | 5E8C | C7FC | F446 | 0101 | C02B | 4689 | 89E6 |
| 0000042040 | E446 | 068E | 1114 | 8326 | E03E | 003B | 0375 | 1DE9 |
| 0000042060 | FF00 | E636 | FF01 | E436 | 8D01 | DC46 | 5016 | C99A |
| 0000042100 | 0038 | 8300 | 08C4 | 003D | 7400 | E903 | 000F | 068E |
| 0000042120 | 1116 | 8326 | F83E | 003B | 0375 | 3BE9 | 1E00 | 5F68 |
| 0000042140 | 8D03 | E846 | 5016 | 468D | 16DC | 8D50 | F646 | 5016 |
| 0000042160 | 8968 | 1E02 | 6468 | FF03 | E236 | FF01 | E036 | FF01 |
| 0000042200 | E636 | FF01 | E436 | 9A01 | 3912 | 0000 | C483 | 891E |
| 0000042220 | F646 | 5689 | E9F8 | 0008 | C02B | 4689 | 89F8 | F646 |
| 0000042240 | 7E83 | 320A | 0377 | 7DE9 | 8E00 | 1406 | 2611 | 3E83 |
| 0000042260 | 3C84 | 7500 | E903 | 0009 | 7E83 | FEE0 | 0374 | 0FE9 |
| 0000042300 | 8E00 | 1606 | 2611 | 3E83 | 3C9C | 7500 | E903 | 0050 |
| 0000042320 | 46C7 | FFE2 | FFFF | E676 | 76FF | 8DE4 | E246 | 5016 |
| 0000042340 | 76FF | FFF4 | FC76 | 76FF | 8DFA | E84E | 5116 | 4E8D |
| 0000042360 | 16F6 | 8D51 | DC4E | 5116 | 681E | 0364 | 8B68 | FF02 |
| 0000042400 | E236 | FF01 | E036 | FF01 | E636 | FF01 | E436 | 9A01 |
| 0000042420 | 3CE4 | 0000 | C483 | 8B28 | E246 | ADE9 | E900 | 0006 |
| 0000042440 | FFB8 | E9FF | 00A4 | 068E | 1112 | 5E6B | 1E0A | 8B26 |
| 0000042460 | A087 | C400 | 065E | 8926 | 8E07 | 1206 | 6B11 | 0A5E |
| 0000042500 | 261E | 878B | 00A2 | 5EC4 | 2606 | 4789 | 8E02 | 1406 |
| 0000042520 | 2611 | 3E83 | 3AA9 | 7500 | E903 | 0009 | 7E83 | FEE0 |
| 0000042540 | 0374 | 0FE9 | 8E00 | 1606 | 2611 | 3E83 | 3AC1 | 7500 |
| 0000042560 | E903 | 0050 | 46C7 | 00E2 | FF00 | E676 | 76FF | 8DE4 |
| 0000042600 | E246 | 5016 | 76FF | FFF4 | FC76 | 76FF | 8DFA | E84E |
| 0000042620 | 5116 | 4E8D | 16F6 | 8D51 | DC4E | 5116 | 681E | 0364 |
| 0000042640 | 8E68 | FF02 | E236 | FF01 | E036 | FF01 | E636 | FF01 |
| 0000042660 | E436 | 9A01 | 3B09 | 0000 | C483 | 8B28 | E246 | 09E9 |
| 0000042700 | E900 | 0006 | 00B8 | E900 | 0000 | 5F5E | ED83 | 8B02 |
| 0000042720 | 1FE5 | 4D5D | 1ECB | 9058 | 5545 | EC8B | 8E1E | 81D8 |
| 0000042740 | 24EC | 5700 | 1E56 | 93B8 | 8E38 | C7D8 | FA46 | 0377 |
| 0000042760 | 5E8C | C7FC | F446 | 0109 | C02B | 4689 | 89E6 | E446 |
| 0000043000 | 068E | 1114 | 8326 | B53E | 003D | 0375 | 1DE9 | FF00 |

THU MAR 14 17:42:50 1991 MEDIT.DLL PAGE 20, LINE 1122

| | | | | | | | | |
|---|---|---|---|---|---|---|---|---|
| 0000043020 | E636 | FF01 | E436 | 8D01 | DC46 | 5016 | 6F9A | 003B |
| 0000043040 | 8300 | 08C4 | 003D | 7400 | E903 | 000F | 068E | 1116 |
| 0000043060 | 8326 | CD3E | 003D | 0375 | 3BE9 | 1E00 | 7E68 | 8D03 |
| 0000043100 | E846 | 5016 | 468D | 16DC | 8D50 | F646 | 5016 | A568 |
| 0000043120 | 1E02 | 8668 | FF03 | E236 | FF01 | E036 | FF01 | E636 |
| 0000043140 | FF01 | E436 | 9A01 | 3BB8 | 0000 | C483 | 891E | F646 |
| 0000043160 | 5689 | E9F8 | 0008 | C02B | 4689 | 89F8 | F646 | 068E |
| 0000043200 | 1114 | 8326 | 593E | 003B | 0375 | 09E9 | 830D | E07E |
| 0000043220 | 74FE | E903 | 000F | 068E | 1116 | 8326 | 853E | 003B |
| 0000043240 | 0375 | 61E9 | 8E00 | 1006 | 2611 | 1E6B | 087E | 8E1E |
| 0000043260 | 1206 | 2611 | 878B | 00AD | 4689 | FFE2 | E676 | 76FF |
| 0000043300 | 8DE4 | E246 | 5016 | 76FF | FFF4 | FC76 | 76FF | 8DFA |
| 0000043320 | E84E | 5116 | 4E8D | 16F6 | 8D51 | DC4E | 5116 | 681E |
| 0000043340 | 0386 | A668 | FF02 | E236 | FF01 | E036 | FF01 | E636 |
| 0000043360 | FF01 | E436 | 9A01 | 3C40 | 0000 | C483 | 8B28 | E246 |
| 0000043400 | 19E9 | E900 | 0016 | 068E | 1110 | 6B26 | 7E1E | 1E08 |
| 0000043420 | 068E | 1112 | 8B26 | A087 | E900 | 0000 | 5E1F | 835F |
| 0000043440 | 02ED | E58B | 5D1F | CB4D | 581E | 4590 | 8B55 | 1EEC |
| 0000043460 | D88E | EC81 | 0024 | 5657 | B81E | 3D17 | D88E | 46C7 |
| 0000043500 | 97FA | 8C03 | FC5E | 46C7 | 00F4 | 2B00 | 89C0 | E646 |
| 0000043520 | 4689 | 8EE4 | 1406 | 2611 | 3E83 | 3F5F | 7500 | E903 |
| 0000043540 | 001D | 36FF | 01E6 | 36FF | 01E4 | 468D | 16DC | 9A50 |
| 0000043560 | 3D4D | 0000 | C483 | 3D08 | 0000 | 0374 | 0FE9 | 8E00 |
| 0000043600 | 1606 | 2611 | 3E83 | 3F77 | 7500 | E903 | 003B | 681E |
| 0000043620 | 039B | 468D | 16E8 | 8D50 | DC46 | 5016 | 468D | 16F6 |
| 0000043640 | 6850 | 02BC | 681E | 03A0 | 36FF | 01E2 | 36FF | 01E0 |
| 0000043660 | 36FF | 01E6 | 36FF | 01E4 | 969A | 003D | 8300 | 1EC4 |
| 0000043700 | 4689 | 89F6 | F856 | 08E9 | 2B00 | 89C0 | F846 | 4689 |
| 0000043720 | 8EF6 | 1206 | 6B11 | 0A5E | 261E | B7FF | 009E | FF26 |
| 0000043740 | 9CB7 | 9A00 | F1FE | 3F24 | C483 | FF04 | 0876 | 76FF |
| 0000043760 | 9A06 | F558 | 3F2E | C483 | 4004 | 9A50 | F1F4 | 3FD6 |
| 0000044000 | C483 | 8E02 | 1206 | 6B11 | 0A5E | 261E | 8789 | 009C |
| 0000044020 | 8926 | 9E97 | 6B00 | 0A5E | 261E | 878B | 009E | 0B26 |
| 0000044040 | 9C87 | 7400 | E903 | 0063 | 068E | 1114 | 8326 | 373E |
| 0000044060 | 003D | 0375 | 09E9 | 8300 | E07E | 74FE | E903 | 000F |
| 0000044100 | 068E | 1116 | 8326 | 633E | 003D | 0375 | 39E9 | 8D00 |
| 0000044120 | E846 | 5016 | 468D | 16F6 | 8D50 | DC46 | 5016 | 681E |
| 0000044140 | 03A0 | C068 | FF02 | E236 | FF01 | E036 | FF01 | E636 |
| 0000044160 | FF01 | E436 | 9A01 | 27A7 | 0000 | C483 | C71A | E246 |
| 0000044200 | 0000 | 89E9 | E900 | 0003 | 83E9 | FF00 | 0876 | 76FF |
| 0000044220 | 8E06 | 1206 | 6B11 | DA5E | 261E | B7FF | 009E | FF26 |
| 0000044240 | 9CB7 | 9A00 | F4F8 | 39F5 | C483 | 8E08 | 1406 | 2611 |
| 0000044260 | 3E83 | 3E8A | 7500 | E903 | 0009 | 7E83 | FEE0 | 0374 |
| 0000044300 | 0FE9 | 8E00 | 1606 | 2611 | 3E83 | 3EB6 | 7500 | E903 |
| 0000044320 | 0039 | 468D | 16E8 | 8D50 | F646 | 5016 | 468D | 16DC |
| 0000044340 | 1E50 | A068 | 6803 | 02C2 | 36FF | 01E2 | 36FF | 01E0 |
| 0000044360 | 36FF | 01E6 | 36FF | 01E4 | A69A | 003F | 8300 | 1AC4 |
| 0000044400 | 46C7 | 00E2 | E900 | 0006 | 03E9 | E900 | 0000 | 5E1F |
| 0000044420 | 835F | 02ED | E58B | 5D1F | CA4D | 0006 | 581E | 4590 |
| 0000044440 | 8B55 | 1EEC | D88E | EC81 | 0000 | 5657 | B81E | 3E6A |
| 0000044460 | D88E | 068E | 1112 | 5E6B | 1E06 | 8B26 | 9C87 | 2600 |
| 0000044500 | 978B | 009E | 00E9 | 1F00 | 5F5E | ED83 | 8B02 | 1FE5 |
| 0000044520 | 4D5D | 02CA | 1E00 | 9058 | 5545 | EC8B | 8E1E | 81D8 |
| 0000044540 | 26EC | 5700 | 1E56 | 5EB8 | 8E40 | C7D8 | FA46 | 0302 |
| 0000044560 | 5E8C | C7FC | F246 | 0101 | C02B | 4689 | 89E4 | E246 |
| 0000044600 | 068E | 1114 | 8326 | 4C3E | 0041 | 0375 | 1DE9 | FF00 |
| 0000044620 | E636 | FF01 | E436 | 8D01 | DA46 | 5016 | A09A | 003E |
| 0000044640 | 8300 | 08C4 | 003D | 7400 | E903 | 000F | 068E | 1116 |
| 0000044660 | 8326 | 643E | 0041 | 0375 | 3BE9 | 1ED0 | B668 | 8D03 |

THU MAR 14 17:42:50 1991 MEDIT.DLL PAGE 21, LINE 1181

| | | | | | | | | |
|---|---|---|---|---|---|---|---|---|
| 0000044700 | E646 | 5016 | 468D | 16DA | 8D50 | F646 | 5016 | EB68 |
| 0000044720 | 1E02 | BA68 | FF03 | E236 | FF01 | E036 | FF01 | E636 |
| 0000044740 | FF01 | E436 | 9A01 | 3EE9 | 0000 | C483 | 891E | F646 |
| 0000044760 | 5689 | E9F8 | 0008 | C02B | 4689 | 89F8 | F646 | 468B |
| 0000045000 | 0B0C | 0A46 | 0375 | 0CE9 | C400 | 0A5E | 8026 | 003F |
| 0000045020 | 0374 | 7DE9 | 8E00 | 1406 | 2611 | 3E83 | 4227 | 7500 |
| 0000045040 | E903 | 0009 | 7E83 | FEDE | 0374 | 0FE9 | 8E00 | 1606 |
| 0000045060 | 2611 | 3E83 | 423F | 7500 | E903 | 0050 | 46C7 | FFE0 |
| 0000045100 | FFFF | E476 | 76FF | 8DE2 | E046 | 5016 | 76FF | FFF2 |
| 0000045120 | FC76 | 76FF | 8DFA | E64E | 5116 | 4E8D | 16F6 | 8D51 |
| 0000045140 | DA4E | 5116 | 681E | 03BA | EF68 | FF02 | E236 | FF01 |
| 0000045160 | E036 | FF01 | E636 | FF01 | E436 | 9A01 | 4287 | 0000 |
| 0000045200 | C483 | 8B28 | E046 | 6DE9 | E901 | 0006 | FFB8 | E9FF |
| 0000045220 | 0164 | 46C7 | 00F4 | E900 | 0003 | 46FF | 83F4 | F47E |
| 0000045240 | 7232 | E903 | 0041 | 068E | 1112 | 5E6B | 1EF4 | 8B26 |
| 0000045260 | 9E87 | 2600 | 870B | 009C | 0375 | 27E9 | FF00 | 0C76 |
| 0000045300 | 76FF | 6B0A | F45E | 261E | B7FF | 009E | FF26 | 9CB7 |
| 0000045320 | 9A00 | F52E | 3F16 | C483 | 3D08 | 0000 | 0374 | 03E9 |
| 0000045340 | E900 | 0003 | B3E9 | 83FF | F47E | 7432 | E903 | 0080 |
| 0000045360 | 068E | 1114 | 8326 | B03E | 0042 | 0375 | 09E9 | 8300 |
| 0000045400 | DE7E | 74FE | E903 | 000F | 068E | 1116 | 8326 | C83E |
| 0000045420 | 0042 | 0375 | 50E9 | C700 | E046 | 0001 | 76FF | FFE4 |
| 0000045440 | E276 | 468D | 16E0 | FF50 | F276 | 76FF | FFFC | FA76 |
| 0000045460 | 4E8D | 16E6 | 8D51 | F64E | 5116 | 4E8D | 16DA | 1E51 |
| 0000045500 | BA68 | 6803 | 02F8 | 36FF | 01E2 | 36FF | 01E0 | 36FF |
| 0000045520 | 01E6 | 36FF | 01E4 | 109A | 0043 | 8300 | 28C4 | 468B |
| 0000045540 | E9E0 | 0092 | 06E9 | B800 | 0001 | 89E9 | E900 | 0086 |
| 0000045560 | 468B | C4F4 | 065E | 8926 | 8E07 | 1406 | 2611 | 3E83 |
| 0000045600 | 3FE2 | 7500 | E903 | 0009 | 7E83 | FEDE | 0374 | 0FE9 |
| 0000045620 | 8E00 | 1606 | 2611 | 3E83 | 3FFA | 7500 | E903 | 0050 |
| 0000045640 | 46C7 | 00E0 | FF00 | E476 | 76FF | 8DE2 | E046 | 5016 |
| 0000045660 | 76FF | FFF2 | FC76 | 76FF | 8DFA | E64E | 5116 | 4E8D |
| 0000045700 | 16F6 | 8D51 | DA4E | 5116 | 681E | D3BA | FC68 | FF02 |
| 0000045720 | E236 | FF01 | E036 | FF01 | E636 | FF01 | E436 | 9A01 |
| 0000045740 | 3E26 | 0000 | C483 | 8B28 | E046 | 09E9 | E900 | 0006 |
| 0000045760 | 00B8 | E900 | 0000 | 5E1F | 835F | 02ED | E58B | 5D1F |
| 0000046000 | CA4D | 0008 | 581E | 4590 | 8B55 | 1EEC | D88E | EC81 |
| 0000046020 | 0026 | 5657 | B81E | 4097 | D88E | 46C7 | CAFA | 8C03 |
| 0000046040 | FC5E | 46C7 | 01F2 | 2B01 | 89C0 | E446 | 4689 | 8EE2 |
| 0000046060 | 1406 | 2611 | 3E83 | 4409 | 7500 | E903 | 001D | 36FF |
| 0000046100 | 01E6 | 36FF | 01E4 | 468D | 16DA | 9A50 | 40CD | 0000 |
| 0000046120 | C483 | 3D08 | 0000 | 0374 | 0FE9 | 8E00 | 1606 | 261J |
| 0000046140 | 3E83 | 4421 | 7500 | E903 | 003B | 681E | 03CE | 468D |
| 0000046160 | 16E6 | 8D50 | DA46 | 5016 | 468D | 16F6 | 6850 | 0318 |
| 0000046200 | 681E | 03D2 | 36FF | 01E2 | 36FF | 01E0 | 36FF | 01E6 |
| 0000046220 | 36FF | 01E4 | 169A | 0041 | 8300 | 1EC4 | 4689 | 89F6 |
| 0000046240 | F856 | 08E9 | 2B00 | 89C0 | F846 | 4689 | 6AF6 | 6A04 |
| 0000046260 | 9A32 | F9D0 | 44C5 | C483 | C404 | 065E | 8926 | 2607 |
| 0000046300 | 5789 | C402 | 065E | 8B26 | 0247 | 0B26 | 7407 | E903 |
| 0000046320 | 007D | 068E | 1114 | 8326 | 0C3E | 0045 | 0375 | 09E9 |
| 0000046340 | 8300 | DE7E | 74FE | E903 | 000F | 068E | 1116 | 8326 |
| 0000046360 | 243E | 0045 | 0375 | 50E9 | C700 | E046 | 0007 | 76FF |
| 0000046400 | FFE4 | E276 | 468D | 16E0 | FF50 | F276 | 76FF | FFFC |
| 0000046420 | FA76 | 4E8D | 16E6 | 8D51 | F64E | 5116 | 4E8D | 16DA |
| 0000046440 | 1E51 | D268 | 6803 | 031D | 36FF | 01E2 | 36FF | 01E0 |
| 0000046460 | 36FF | 01E6 | 36FF | 01E4 | 6C9A | 0045 | 8300 | 28C4 |
| 0000046500 | 468B | E9E0 | 01C2 | 06E9 | B800 | 0007 | B9E9 | C401 |
| 0000046520 | 0A5E | C726 | 0007 | C700 | F446 | 0000 | 03E9 | FF00 |
| 0000046540 | F446 | 7E83 | 32F4 | 0372 | 20E9 | 8E01 | 1206 | 6B11 |

THU MAR 14 17:42:50 1991 MEDIT.DLL PAGE 22, LINE 1240

| | | | | | | | | |
|---|---|---|---|---|---|---|---|---|
| 0000046560 | F45E | 261E | 878B | 009E | 0B26 | 9C87 | 7500 | E903 |
| 0000046600 | 0106 | 016A | 5E6B | 1EF4 | FF26 | 9EB7 | 2600 | B7FF |
| 0000046620 | 009C | 589A | CFF5 | 8344 | 04C4 | 5040 | D09A | ADF9 |
| 0000046640 | 8345 | 04C4 | 5EC4 | 260A | 1F8B | E3C1 | C402 | 0676 |
| 0000046660 | C426 | 2634 | 0089 | 8926 | 0250 | 5EC4 | 260A | 1F8B |
| 0000046700 | E3C1 | C402 | 0676 | C426 | 2634 | 408B | 2602 | 000B |
| 0000046720 | 0374 | 7DE9 | 8E00 | 1406 | 2611 | 3E83 | 45C2 | 7500 |
| 0000046740 | E903 | 0009 | 7E83 | FEDE | 0374 | 0FE9 | 8E00 | 1606 |
| 0000046760 | 2611 | 3E83 | 45DA | 7500 | E903 | 0050 | 46C7 | 07E0 |
| 0000047000 | FF00 | E476 | 76FF | 8DE2 | E046 | 5016 | 76FF | FFF2 |
| 0000047020 | FC76 | 76FF | 8DFA | E64E | 5116 | 4E8D | 16F6 | 8D51 |
| 0000047040 | DA4E | 5116 | 681E | 03D2 | 2568 | FF03 | E236 | FF01 |
| 0000047060 | E036 | FF01 | E636 | FF01 | E436 | 9A01 | 4622 | 0000 |
| 0000047100 | C483 | 8B28 | E046 | BFE9 | E900 | 0006 | 07B8 | E900 |
| 0000047120 | 00B6 | 068E | 1112 | 5E6B | 1EF4 | FF26 | 9EB7 | 2600 |
| 0000047140 | B7FF | 009C | 5EC4 | 260A | 1F8B | E3C1 | C402 | 0676 |
| 0000047160 | C426 | 2634 | 70FF | 2602 | 30FF | F89A | 04F4 | 8342 |
| 0000047200 | 08C4 | 5EC4 | 260A | 07FF | D4E9 | 8EFE | 1406 | 2611 |
| 0000047220 | 3E83 | 40B7 | 7500 | E903 | 0009 | 7E83 | FEDE | 0374 |
| 0000047240 | 0FE9 | 8E00 | 1606 | 2611 | 3E83 | 40E3 | 7500 | E903 |
| 0000047260 | 0050 | 46C7 | 00ED | FF00 | E476 | 76FF | 8DE2 | E046 |
| 0000047300 | 5016 | 76FF | FFF2 | FC76 | 76FF | 8DFA | E64E | 5116 |
| 0000047320 | 4E8D | 16F6 | 8D51 | DA4E | 5116 | 681E | 03D2 | 2A68 |
| 0000047340 | FF03 | E236 | FF01 | E036 | FF01 | E636 | FF01 | E436 |
| 0000047360 | 9A01 | 41AC | 0000 | C483 | 8B28 | E046 | 09E9 | E900 |
| 0000047400 | 0006 | 00B8 | E900 | 0000 | 5E1F | 835F | 02ED | E58B |
| 0000047420 | 5D1F | CA4D | 0008 | 581E | 4590 | 8B55 | 1EEC | D88E |
| 0000047440 | EC81 | 0026 | 5657 | B81E | 4346 | D88E | 46C7 | EBFA |
| 0000047460 | 8C03 | FC5E | 46C7 | 01F2 | 2B01 | 89C0 | E446 | 4689 |
| 0000047500 | 8EE2 | 1406 | 2611 | 3E83 | 4735 | 7500 | E903 | 001D |
| 0000047520 | 36FF | 01E6 | 36FF | 01E4 | 468D | 16DA | 9A50 | 437C |
| 0000047540 | 0000 | C483 | 3D08 | 0000 | 0374 | 0FE9 | 8E00 | 1606 |
| 0000047560 | 2611 | 3E83 | 474D | 7500 | E903 | 003B | 681E | 03EF |
| 0000047600 | 468D | 16E6 | 8D50 | DA46 | 5016 | 468D | 16F6 | 6850 |
| 0000047620 | 0341 | 681E | 03F4 | 36FF | 01E2 | 36FF | 01ED | 36FF |
| 0000047640 | 01E6 | 36FF | 01E4 | C59A | 0043 | 8300 | 1EC4 | 4689 |
| 0000047660 | 89F6 | F856 | 08E9 | 2B00 | 89C0 | F846 | 4689 | C7F6 |
| 0000047700 | F446 | 0000 | 03E9 | FF00 | F446 | 468B | 39F4 | 0A46 |
| 0000047720 | 0377 | 1BE9 | 8B00 | F45E | E3C1 | C402 | 0676 | FF26 |
| 0000047740 | 0270 | FF26 | 9A30 | F1FE | 4729 | C483 | E904 | FFD7 |
| 0000047760 | 76FF | FF08 | 0676 | FE9A | E4F1 | 8343 | 04C4 | 068E |
| 0000050000 | 1114 | 8326 | 663E | 0043 | 0375 | 09E9 | 8300 | DE7E |
| 0000050020 | 74FE | E903 | 000F | 068E | 1116 | 8326 | 923E | 0043 |
| 0000050040 | 0375 | 39E9 | 8D00 | E646 | 5016 | 468D | 16F6 | 8D50 |
| 0000050060 | DA46 | 5016 | 681E | 03F4 | 4A68 | FF03 | E236 | FF01 |
| 0000050100 | E036 | FF01 | E636 | FF01 | E436 | 9A01 | 4029 | 0000 |
| 0000050120 | C483 | C71A | E046 | 0000 | 06E9 | E900 | 0003 | 00E9 |
| 0000050140 | 1F00 | 5F5E | ED83 | 8B02 | 1FE5 | 4D5D | 06CA | 1E00 |
| 0000050160 | 9058 | 5545 | EC8B | 8E1E | 81D8 | 26EC | 5700 | 1E56 |
| 0000050200 | 58B8 | 8E46 | C7D8 | FA46 | 040D | 5E8C | C7FC | F246 |
| 0000050220 | 0101 | C02B | 4689 | 89E4 | E246 | 068E | 1114 | 8326 |
| 0000050240 | 583E | 0048 | 0375 | 1DE9 | FF00 | E636 | FF01 | E436 |
| 0000050260 | 8D01 | DA46 | 5016 | 8E9A | 0046 | 8300 | 08C4 | 003D |
| 0000050300 | 7400 | E903 | 000F | 068E | 1116 | 8326 | 703E | 0048 |
| 0000050320 | 0375 | 3BE9 | 1E00 | 1168 | 8D04 | E646 | 5016 | 468D |
| 0000050340 | 16DA | 8D50 | F646 | 5016 | 6368 | 1E03 | 1C68 | FF04 |
| 0000050360 | E236 | FF01 | E036 | FF01 | E636 | FF01 | E436 | 9A01 |
| 0000050400 | 46D7 | 0000 | C483 | 891E | F646 | 5689 | E9F8 | 0008 |
| 0000050420 | C02B | 4689 | 89F8 | F646 | 7E83 | 3206 | 0377 | 7DE9 |

THU MAR 14 17:42:50 1991 MEDIT.DLL PAGE 23, LINE 1299

| | | | | | | | | |
|---|---|---|---|---|---|---|---|---|
| 0000050440 | 8E00 | 1406 | 2611 | 3E83 | 4678 | 7500 | E903 | 0009 |
| 0000050460 | 7E83 | FEDE | 0374 | 0FE9 | 8E00 | 1606 | 2611 | 3E83 |
| 0000050500 | 46A4 | 7500 | E903 | 0050 | 46C7 | 13E0 | FF00 | E476 |
| 0000050520 | 76FF | 8DE2 | E046 | 5016 | 76FF | FFF2 | FC76 | 76FF |
| 0000050540 | 8DFA | E64E | 5116 | 4E8D | 16F6 | 8D51 | DA4E | 5116 |
| 0000050560 | 681E | 041C | 6868 | FF03 | E236 | FF01 | E036 | FF01 |
| 0000050600 | E636 | FF01 | E436 | 9A01 | 4469 | 0000 | C483 | 8B28 |
| 0000050620 | E046 | C8E9 | E902 | 0006 | 13B8 | E900 | 02BF | 068E |
| 0000050640 | 1110 | 468B | 2606 | 0639 | 087E | 0374 | 1CE9 | 8300 |
| 0000050660 | 6C3E | 0002 | 0375 | 12E9 | FF00 | E836 | 6801 | 0766 |
| 0000050700 | 1868 | 9A00 | 2004 | 4718 | C483 | C706 | F446 | 0000 |
| 0000050720 | 03E9 | FF00 | F446 | 068E | 1112 | 5E6B | 1E06 | 468B |
| 0000050740 | 26F4 | 8739 | 00A0 | 0373 | EAE9 | 6B01 | 065E | 261E |
| 0000050760 | 9FC4 | 00AE | 768B | 8BF4 | D1C6 | 03E6 | D1F0 | 26E6 |
| 0000051000 | 408B | 2602 | 000B | 0375 | 0CE9 | 8E01 | 1206 | 6B11 |
| 0000051020 | 065E | 8B1E | F446 | 3926 | A087 | 7400 | E903 | 0032 |
| 0000051040 | 5E6B | 1E06 | C426 | AE9F | 8B00 | F476 | C68B | E6D1 |
| 0000051060 | F003 | E6D1 | FF26 | 0270 | FF26 | 1E30 | 1568 | 9A04 |
| 0000051100 | F52E | 49BA | C483 | 3D08 | 0000 | 0374 | 03E9 | E900 |
| 0000051120 | 0183 | 068E | 1112 | 5E6B | 1E06 | C426 | AE9F | 8B00 |
| 0000051140 | F476 | C68B | E6D1 | F003 | E6D1 | FF26 | 0270 | FF26 |
| 0000051160 | 1E30 | 1668 | 6B04 | 065E | 8E1E | 1206 | 2611 | B7FF |
| 0000051200 | 00B4 | FF26 | B2B7 | 9A00 | E170 | 4A78 | C483 | 3D0C |
| 0000051220 | 0000 | 037C | 7DE9 | 8E00 | 1406 | 2611 | 3E83 | 4A8C |
| 0000051240 | 7500 | E903 | 0009 | 7E83 | FEDE | 0374 | 0FE9 | 8E00 |
| 0000051260 | 1606 | 2611 | 3E83 | 4AA4 | 7500 | E903 | 0050 | 46C7 |
| 0000051300 | 0BE0 | FF00 | E476 | 76FF | 8DE2 | E046 | 5016 | 76FF |
| 0000051320 | FFF2 | FC76 | 76FF | 8DFA | E64E | 5116 | 4E8D | 16F6 |
| 0000051340 | 8D51 | DA4E | 5116 | 681E | 041C | 8068 | FF03 | E236 |
| 0000051360 | FF01 | E036 | FF01 | E636 | FF01 | E436 | 9A01 | 4AEC |
| 0000051400 | 0000 | C483 | 8B28 | E046 | 52E9 | E901 | 0006 | 0BB8 |
| 0000051420 | E900 | 0149 | BBE9 | 8E00 | 1206 | 6B11 | 065E | 8B1E |
| 0000051440 | F446 | 3926 | A087 | 7400 | E903 | 0003 | A6E9 | 1E00 |
| 0000051460 | 1A68 | 8E04 | 1206 | 6B11 | 065E | 261E | B7FF | 00B4 |
| 0000051500 | FF26 | B2B7 | 9A00 | E170 | 4B0B | C483 | 3D08 | 0000 |
| 0000051520 | 037C | 7DE9 | 8E00 | 1406 | 2611 | 3E83 | 4B17 | 7500 |
| 0000051540 | E903 | 0009 | 7E83 | FEDE | 0374 | 0FE9 | 8E00 | 1606 |
| 0000051560 | 2611 | 3E83 | 4B2F | 7500 | E903 | 0050 | 46C7 | 0BE0 |
| 0000051600 | FF00 | E476 | 76FF | 8DE2 | E046 | 5016 | 76FF | FFF2 |
| 0000051620 | FC76 | 76FF | 8DFA | E64E | 5116 | 4E8D | 16F6 | 8D51 |
| 0000051640 | DA4E | 5116 | 681E | 041C | 8568 | FF03 | E236 | FF01 |
| 0000051660 | E036 | FF01 | E636 | FF01 | E436 | 9A01 | 4B77 | 0000 |
| 0000051700 | C483 | 8B28 | E046 | 94E9 | E900 | 0006 | 0BB8 | E900 |
| 0000051720 | 008B | FEE9 | FFFD | 0676 | 259A | F672 | 8348 | 02C4 |
| 0000051740 | 068E | 1114 | 8326 | D13E | 0047 | 0375 | 09E9 | 8300 |
| 0000051760 | DE7E | 74FE | E903 | 000F | 068E | 1116 | 8326 | FD3E |
| 0000052000 | 0047 | 0375 | 50E9 | C700 | E046 | 0000 | 76FF | FFE4 |
| 0000052020 | E276 | 468D | 16E0 | FF50 | F276 | 76FF | FFFC | FA76 |
| 0000052040 | 4E8D | 16E6 | 8D51 | F64E | 5116 | 4E8D | 16DA | 1E51 |
| 0000052060 | 1C68 | 6804 | 0389 | 36FF | 01E2 | 36FF | 01E0 | 36FF |
| 0000052100 | 01E6 | 36FF | 01E4 | B89A | 0048 | 8300 | 28C4 | 468B |
| 0000052120 | E9ED | 0009 | 06E9 | B800 | 0000 | 00E9 | 1F00 | 5F5E |
| 0000052140 | ED83 | 8B02 | 1FE5 | 4D5D | 02CA | 1E00 | 9058 | 5545 |
| 0000052160 | EC8B | 8E1E | 81D8 | 32EC | 5700 | 1E56 | B1B8 | 8E47 |
| 0000052200 | C7D8 | F646 | 042C | 5E8C | C7F8 | EA46 | 0101 | C02B |
| 0000052220 | 4689 | 89DA | D846 | 068E | 1114 | 8326 | 563E | 004C |
| 0000052240 | 0375 | 1DE9 | FF00 | E636 | FF01 | E436 | 8D01 | CE46 |
| 0000052260 | 5016 | E79A | 0047 | 8300 | 08C4 | 003D | 7400 | E903 |
| 0000052300 | 000F | 068E | 1116 | 8326 | 6E3E | 004C | 0375 | 3BE9 |

THU MAR 14 17:42:50 1991 MEDIT.DLL PAGE 24, LINE 1358

| | | | | | | | | |
|---|---|---|---|---|---|---|---|---|
| 0000052320 | 1E00 | 3068 | 8D04 | DC46 | 5016 | 468D | 16CE | 8D50 |
| 0000052340 | EE46 | 5016 | 9E68 | 1E03 | 3668 | FF04 | E236 | FF01 |
| 0000052360 | E036 | FF01 | E636 | FF01 | E436 | 9A01 | 4830 | 0000 |
| 0000052400 | C483 | 891E | EE46 | 5689 | E9F0 | 0008 | C02B | 4689 |
| 0000052420 | 89F0 | EE46 | 468B | 0B10 | 0E46 | 0374 | 7DE9 | 8E00 |
| 0000052440 | 1406 | 2611 | 3E83 | 4CEE | 7500 | E903 | 0009 | 7E83 |
| 0000052460 | FED2 | 0374 | 0FE9 | 8E00 | 1606 | 2611 | 3E83 | 4D06 |
| 0000052500 | 7500 | E903 | 0050 | 46C7 | 13D4 | FF00 | DA76 | 76FF |
| 0000052520 | 8DD8 | D446 | 5016 | 76FF | FFEA | F876 | 76FF | 8DF6 |
| 0000052540 | DC4E | 5116 | 4E8D | 16EE | 8D51 | CE4E | 5116 | 681E |
| 0000052560 | 0436 | A668 | FF03 | E236 | FF01 | E036 | FF01 | E636 |
| 0000052600 | FF01 | E436 | 9A01 | 4D4F | 0000 | C483 | 8B28 | D446 |
| 0000052620 | 79E9 | E904 | 0006 | 13B8 | E900 | 0470 | 76FF | FF10 |
| 0000052640 | 0E76 | 468D | 16EC | 9A50 | 4085 | 4F4C | 4689 | 3DE8 |
| 0000052660 | 0000 | 037C | 7EE9 | 8E00 | 1406 | 2611 | 3E83 | 4D7E |
| 0000052700 | 7500 | E903 | 0009 | 7E83 | FED2 | 0374 | 0FE9 | 8E00 |
| 0000052720 | 1606 | 2611 | 3E83 | 4D96 | 7500 | E903 | 0051 | 468B |
| 0000052740 | 89E8 | D446 | 76FF | FFDA | D876 | 468D | 16D4 | FF50 |
| 0000052760 | EA76 | 76FF | FFF8 | F676 | 4E8D | 16DC | 8D51 | EE4E |
| 0000053000 | 5116 | 4E8D | 16CE | 1E51 | 3668 | 6804 | 03A8 | 36FF |
| 0000053020 | 01E2 | 36FF | 01E0 | 36FF | 01E6 | 36FF | 01E4 | DE9A |
| 0000053040 | 004D | 8300 | 28C4 | 468B | E9D4 | 03E0 | 06E9 | 8B00 |
| 0000053060 | E846 | D7E9 | 8303 | E87E | 7400 | E903 | 0086 | 468B |
| 0000053100 | C4EC | 065E | 8926 | 8E07 | 1406 | 2611 | 3E83 | 4E27 |
| 0000053120 | 7500 | E903 | 0009 | 7E83 | FED2 | 0374 | 0FE9 | 8E00 |
| 0000053140 | 1606 | 2611 | 3E83 | 4E3F | 7500 | E903 | 0050 | 46C7 |
| 0000053160 | 11D4 | FF00 | DA76 | 76FF | 8DD8 | D446 | 5016 | 76FF |
| 0000053200 | FFEA | F876 | 76FF | 8DF6 | DC4E | 5116 | 4E8D | 16EE |
| 0000053220 | 8D51 | CE4E | 5116 | 681E | 0436 | AD68 | FF03 | E236 |
| 0000053240 | FF01 | E036 | FF01 | E636 | FF01 | E436 | 9A01 | 4E88 |
| 0000053260 | 0000 | C483 | 8B28 | D446 | 51E9 | E903 | 0006 | 11B8 |
| 0000053300 | E900 | 0348 | 468B | 0B0C | 0A46 | 0374 | 9FE9 | FF00 |
| 0000053320 | 1076 | 76FF | 8D0E | 0A46 | 5016 | FF9A | 00FF | 8900 |
| 0000053340 | D646 | 013D | 1B00 | 40C0 | 003D | 7500 | E903 | 007E |
| 0000053360 | 068E | 1114 | 8326 | C83E | 004E | 0375 | 09E9 | 8300 |
| 0000053400 | D27E | 74FE | E903 | 000F | 068E | 1116 | 8326 | E03E |
| 0000053420 | 004E | 0375 | 51E9 | 8B00 | D646 | 4689 | FFD4 | DA76 |
| 0000053440 | 76FF | 8DD8 | D446 | 5016 | 76FF | FFEA | F876 | 76FF |
| 0000053460 | 8DF6 | DC4E | 5116 | 4E8D | 16EE | 8D51 | CE4E | 5116 |
| 0000053500 | 681E | 0436 | B468 | FF03 | E236 | FF01 | E036 | FF01 |
| 0000053520 | E636 | FF01 | E436 | 9A01 | 4F29 | 0000 | C483 | 8B28 |
| 0000053540 | D446 | A7E9 | E902 | 0006 | 468B | E9D6 | 029E | 76FF |
| 0000053560 | FF0C | 0A76 | 006A | 468D | 16FA | 9A5D | FFFF | 0000 |
| 0000053600 | 4689 | 3DD6 | 0001 | C01B | 3D40 | 0000 | 0375 | 7EE9 |
| 0000053620 | 8E00 | 1406 | 2611 | 3E83 | 49CE | 7500 | E903 | 0009 |
| 0000053640 | 7E83 | FED2 | 0374 | 0FE9 | 8E00 | 1606 | 2611 | 3E83 |
| 0000053660 | 49E6 | 7500 | E903 | 0051 | 468B | 89D6 | D446 | 76FF |
| 0000053700 | FFDA | D876 | 468D | 16D4 | FF50 | EA76 | 76FF | FFF8 |
| 0000053720 | F676 | 4E8D | 16DC | 8D51 | EE4E | 5116 | 4E8D | 16CE |
| 0000053740 | 1E51 | 3668 | 6804 | 03B8 | 36FF | 01E2 | 36FF | 01E0 |
| 0000053760 | 36FF | 01E6 | 36FF | 01E4 | 2E9A | 004A | 8300 | 28C4 |
| 0000054000 | 468B | E9D4 | 0206 | 06E9 | 8B00 | D646 | FDE9 | 1E01 |
| 0000054020 | 3468 | FF04 | FC76 | 76FF | 9AFA | E158 | 4972 | C483 |
| 0000054040 | 8908 | F246 | 5689 | 0BF4 | 74D0 | E903 | 007D | 068E |
| 0000054060 | 1114 | 8326 | 273E | 0050 | 0375 | 09E9 | 8300 | D27E |
| 0000054100 | 74FE | E903 | 000F | 068E | 1116 | 8326 | 3F3E | 0050 |
| 0000054120 | 0375 | 50E9 | C700 | D446 | 0008 | 76FF | FFDA | D876 |
| 0000054140 | 468D | 16D4 | FF50 | EA76 | 76FF | FFF8 | F676 | 4E8D |
| 0000054160 | 16DC | 8D51 | EE4E | 5116 | 4E8D | 16CE | 1E51 | 3668 |

THU MAR 14 17:42:50 1991 MEDIT.DLL PAGE 25, LINE 1417

| | | | | | | | | |
|---|---|---|---|---|---|---|---|---|
| 0000054200 | 6804 | 03BB | 36FF | 01E2 | 36FF | 01E0 | 36FF | 01E6 |
| 0000054220 | 36FF | 01E4 | 889A | 0050 | 8300 | 28C4 | 468B | E9D4 |
| 0000054240 | 016A | 06E9 | B800 | 0008 | 61E9 | FF01 | FC76 | 76FF |
| 0000054260 | 9AFA | 013F | 0000 | 006A | 468D | 16EC | FF50 | F476 |
| 0000054300 | 76FF | FFF2 | 1076 | 76FF | 9A0E | 293D | 501B | C483 |
| 0000054320 | 890E | D646 | 013D | 1B00 | 40C0 | 003D | 7500 | E903 |
| 0000054340 | 008C | 76FF | FFF4 | F276 | 049A | DAE0 | 834C | 04C4 |
| 0000054360 | 068E | 1114 | C326 | C63E | 0050 | 0375 | 09E9 | 8300 |
| 0000054400 | D27E | 74FE | E903 | 000F | 068E | 1116 | 8326 | DE3E |
| 0000054420 | 0050 | 0375 | 51E9 | 8B00 | D646 | 4689 | FFD4 | DA76 |
| 0000054440 | 76FF | 8DD8 | D446 | 5016 | 76FF | FFEA | F876 | 76FF |
| 0000054460 | 8DF6 | DC4E | 5116 | 4E8D | 16EE | 8D51 | CE4E | 5116 |
| 0000054500 | 681E | 0436 | C268 | FF03 | E236 | FF01 | E036 | FF01 |
| 0000054520 | E636 | FF01 | E436 | 9A01 | 5126 | 0000 | C483 | 8B28 |
| 0000054540 | D446 | A7E9 | E900 | 0006 | 468B | E9D6 | 009E | 468B |
| 0000054560 | 8BF2 | F456 | D68E | 1112 | 5E6B | 1EEC | 8926 | B287 |
| 0000054600 | 2600 | 9789 | 00B4 | 468B | C4EC | 065E | 8926 | 8E07 |
| 0000054620 | 1406 | 2611 | 3E83 | 4BCD | 7500 | E903 | 0009 | 7E83 |
| 0000054640 | FED2 | 0374 | 0FE9 | 8E00 | 1606 | 2611 | 3E83 | 4BF9 |
| 0000054660 | 7500 | E903 | 0050 | 46C7 | 00D4 | FF00 | DA76 | 76FF |
| 0000054700 | 8DD8 | D446 | 5016 | 76FF | FFEA | F876 | 76FF | 8DF6 |
| 0000054720 | DC4E | 5116 | 4E8D | 16EE | 8D51 | CE4E | 5116 | 681E |
| 0000054740 | D436 | C868 | FF03 | E236 | FF01 | E036 | FF01 | E636 |
| 0000054760 | FF01 | E436 | 9A01 | 4CB6 | 0000 | C483 | 8B28 | D446 |
| 0000055000 | 09E9 | E900 | 0006 | 00B8 | E900 | 0000 | 5E1F | 835F |
| 0000055020 | 02ED | E58B | 5D1F | CA4D | 000C | 581E | 4590 | 8B55 |
| 0000055040 | 1EEC | D88E | EC81 | 0032 | 5657 | B81E | 4BAD | D88E |
| 0000055060 | 46C7 | 46F6 | 8C04 | F85E | 46C7 | 01EA | 2B01 | 89C0 |
| 0000055100 | DA46 | 4689 | 8ED8 | 1406 | 2611 | 3E83 | 523E | 7500 |
| 0000055120 | E903 | 001D | 36FF | 01E6 | 36FF | 01E4 | 468D | 16CE |
| 0000055140 | 9A50 | 4BE3 | 0000 | C483 | 3D08 | 0000 | 0374 | 0FE9 |
| 0000055160 | 8E00 | 1606 | 2611 | 3E83 | 5256 | 7500 | E903 | 003B |
| 0000055200 | 681E | 044A | 468D | 16DC | 8D50 | CE46 | 5016 | 468D |
| 0000055220 | 16EE | 6850 | 03DD | 681E | 0450 | 36FF | 01E2 | 36FF |
| 0000055240 | 01E0 | 36FF | 01E6 | 36FF | 01E4 | 2C9A | 004C | 8300 |
| 0000055260 | 1EC4 | 4689 | 89EE | F056 | 08E9 | 2B00 | 89C0 | F046 |
| 0000055300 | 4689 | 8BEE | 1046 | 460B | 740E | E903 | 001E | 068E |
| 0000055320 | 1110 | 6B26 | 7E1E | 1E08 | 068E | 1112 | 8B26 | 9C87 |
| 0000055340 | 2600 | 978B | 009E | 4689 | 890E | 1056 | 76FF | FF10 |
| 0000055360 | 0E76 | 468D | 16EC | 9A50 | 4085 | 5415 | 4689 | 3DE8 |
| 0000055400 | 0000 | 0375 | 7DE9 | 8E00 | 1406 | 2611 | 3E83 | 52F0 |
| 0000055420 | 7500 | E903 | 0009 | 7E83 | FED2 | 0374 | 0FE9 | 8E00 |
| 0000055440 | 1606 | 2611 | 3E83 | 5308 | 7500 | E903 | 0050 | 46C7 |
| 0000055460 | 13D4 | FF00 | DA76 | 76FF | 8DD8 | D446 | 5016 | 76FF |
| 0000055500 | FFEA | F876 | 76FF | 8DF6 | DC4E | 5116 | 4E8D | 16EE |
| 0000055520 | 8D51 | CE4E | 5116 | 681E | 0450 | E768 | FF03 | E236 |
| 0000055540 | FF01 | E036 | FF01 | E636 | FF01 | E436 | 9A01 | 5351 |
| 0000055560 | 0000 | C483 | 8B28 | D446 | 99E9 | E902 | 0006 | 13B8 |
| 0000055600 | E900 | 0290 | 468B | C4EC | 065E | 8926 | 8B07 | 0C46 |
| 0000055620 | 460B | 740A | E903 | 009F | 76FF | FF10 | 0E76 | 468D |
| 0000055640 | 160A | 9A50 | 4E0B | 0000 | 4689 | 3DD6 | 0001 | C01B |
| 0000055660 | 3D40 | 0000 | 0375 | 7EE9 | 8E00 | 1406 | 2611 | 3E83 |
| 0000055700 | 5391 | 7500 | E903 | 0009 | 7E83 | FED2 | 0374 | 0FE9 |
| 0000055720 | 8E00 | 1606 | 2611 | 3E83 | 53A9 | 7500 | E903 | 0051 |
| 0000055740 | 468B | 89D6 | D446 | 76FF | FFDA | D876 | 468D | 16D4 |
| 0000055760 | FF50 | EA76 | 76FF | FFF8 | F676 | 4E8D | 16DC | 8D51 |
| 0000056000 | EE4E | 5116 | 4E8D | 16CE | 1E51 | 5068 | 6804 | 03EF |
| 0000056020 | 36FF | 01E2 | 36FF | 01E0 | 36FF | 01E6 | 36FF | 01E4 |
| 0000056040 | F29A | 0053 | 8300 | 28C4 | 468B | E9D4 | 01E6 | 06E9 |

THU MAR 14 17:42:50 1991 MEDIT.DLL PAGE 26, LINE 1476

| | | | | | | | | |
|---|---|---|---|---|---|---|---|---|
| 0000056060 | 8B00 | D646 | DDE9 | FF01 | 0C76 | 76FF | 6A0A | 8D02 |
| 0000056100 | FA46 | 5016 | AC9A | 004E | 8900 | D646 | 013D | 1B00 |
| 0000056120 | 40C0 | 003D | 7500 | E903 | 007E | 068E | 1114 | 8326 |
| 0000056140 | 2E3E | 0054 | 0375 | 09E9 | 8300 | D27E | 74FE | E903 |
| 0000056160 | 000F | 068E | 1116 | 8326 | 463E | 0054 | 0375 | 51E9 |
| 0000056200 | 8B00 | D646 | 4689 | FFD4 | DA76 | 76FF | 8DD8 | D446 |
| 0000056220 | 5016 | 76FF | FFEA | F876 | 76FF | 8DF6 | DC4E | 5116 |
| 0000056240 | 4E8D | 16EE | 8D51 | CE4E | 5116 | 681E | 0450 | F36S |
| 0000056260 | FF03 | E236 | FF01 | E036 | FF01 | E636 | FF01 | E436 |
| 0000056300 | 9A01 | 548E | 0000 | C483 | 8B28 | D446 | 45E9 | E901 |
| 0000056320 | 0006 | 468B | E9D6 | 013C | 681E | 044E | 76FF | FFFC |
| 0000056340 | FA76 | 589A | FCE1 | 834F | 08C4 | 4689 | 89F2 | F456 |
| 0000056360 | D00B | 0374 | 7DE9 | 8E00 | 1406 | 2611 | 3E83 | 4F65 |
| 0000056400 | 7500 | E903 | 0009 | 7E83 | FED2 | 0374 | 0FE9 | 8E00 |
| 0000056420 | 1606 | 2611 | 3E83 | 4F7D | 7500 | E903 | 0050 | 46C7 |
| 0000056440 | 08D4 | FF00 | DA76 | 76FF | 8DD8 | D446 | 5016 | 76FF |
| 0000056460 | FFEA | F876 | 76FF | 8DF6 | DC4E | 5116 | 4E8D | 16EE |
| 0000056500 | 8D51 | CE4E | 5116 | 681E | 0450 | F668 | FF03 | E236 |
| 0000056520 | FF01 | E036 | FF01 | E636 | FF01 | E436 | 9A01 | 4FC5 |
| 0000056540 | 0000 | C483 | 8B28 | D446 | A9E9 | E900 | 0006 | 08B8 |
| 0000056560 | E900 | 00A0 | 76FF | FFFC | FA76 | E29A | 004F | 8B00 |
| 0000056600 | F246 | 5686 | 8EF4 | 1206 | 6B11 | EC5E | 261E | 8789 |
| 0000056620 | 00B2 | 8926 | B497 | 8E00 | 1406 | 2611 | 3E83 | 517C |
| 0000056640 | 7500 | E903 | 0009 | 7E83 | FED2 | 0374 | 0FE9 | 8E00 |
| 0000056660 | 1606 | 2611 | 3E83 | 51A8 | 7500 | E903 | 0050 | 46C7 |
| 0000056700 | 00D4 | FF00 | DA76 | 76FF | 8DD8 | D446 | 5016 | 76FF |
| 0000056720 | FFEA | F876 | 76FF | 8DF6 | DC4E | 5116 | 4E8D | 16EE |
| 0000056740 | 8D51 | CE4E | 5116 | 681E | 0450 | F968 | FF03 | E236 |
| 0000056760 | FF01 | E036 | FF01 | E636 | FF01 | E436 | 9A01 | 529E |
| 0000057000 | 0000 | C483 | 8B28 | D446 | 09E9 | E900 | 0006 | 00B8 |
| 0000057020 | E900 | 0000 | 5E1F | 835F | 02ED | E58B | 5D1F | CA4D |
| 0000057040 | 000C | 581E | 4590 | 8B55 | 1EEC | D88E | EC81 | 0026 |
| 0000057060 | 5657 | B81E | 515C | D88E | 46C7 | 60FA | 8C04 | FC5E |
| 0000057100 | 46C7 | 01F4 | 2B01 | 89C0 | E446 | 4689 | 8EE2 | 1406 |
| 0000057120 | 2611 | 3E83 | 5622 | 7500 | E903 | 001D | 36FF | 01E6 |
| 0000057140 | 36FF | 01E4 | 468D | 16DA | 9A50 | 5192 | 0000 | C483 |
| 0000057160 | 3D08 | 0000 | 0374 | 0FE9 | 8E00 | 1606 | 2611 | 3E83 |
| 0000057200 | 563A | 7500 | E903 | 003B | 681E | 0464 | 468D | 16E6 |
| 0000057220 | 8D50 | DA46 | 5016 | 468D | 16F6 | 6850 | 040E | 681E |
| 0000057240 | 0468 | 36FF | 01E2 | 36FF | 01E0 | 36FF | 01E6 | 36FF |
| 0000057260 | 01E4 | DB9A | 0051 | 8300 | 1EC4 | 4689 | 89F6 | F856 |
| 0000057300 | 08E9 | 2B00 | 89C0 | F846 | 4689 | 83F6 | 067E | 7632 |
| 0000057320 | E903 | 0017 | 068E | 1112 | 5E6B | 1E06 | 8B26 | B487 |
| 0000057340 | 2600 | 870B | 00B2 | 0374 | 7DE9 | 8E00 | 1406 | 2611 |
| 0000057360 | 3E83 | 56C4 | 7500 | E903 | 0009 | 7E83 | FEDE | 0374 |
| 0000057400 | 0FE9 | 8E00 | 1606 | 2611 | 3E83 | 56DC | 7500 | E903 |
| 0000057420 | 0050 | 46C7 | 13E0 | FF00 | E476 | 76FF | 8DE2 | E046 |
| 0000057440 | 5016 | 76FF | FFF4 | FC76 | 76FF | 8DFA | E64E | 5116 |
| 0000057460 | 4E8D | 16F6 | 8D51 | DA4E | 5116 | 681E | 0468 | 1268 |
| 0000057500 | FF04 | E236 | FF01 | E036 | FF01 | E636 | FF01 | E436 |
| 0000057520 | 9A01 | 5724 | 0000 | C483 | 8B28 | E046 | 3CE9 | E901 |
| 0000057540 | 0006 | 13B8 | E900 | 0133 | 068E | 1112 | 5E6B | 1E06 |
| 0000057560 | FF26 | B4B7 | 2600 | B7FF | 00B2 | 049A | 2AE0 | 8352 |
| 0000057600 | 04C4 | 4689 | 3DF2 | 0000 | 0375 | 7DE9 | 8E00 | 1406 |
| 0000057620 | 2611 | 3E83 | 5755 | 7500 | E903 | 0009 | 7E83 | FEDE |
| 0000057640 | 0374 | 0FE9 | 8E00 | 1606 | 2611 | 3E83 | 576D | 7500 |
| 0000057660 | E903 | 0050 | 46C7 | 09E0 | FF00 | E476 | 76FF | 8DE2 |
| 0000057700 | E046 | 5016 | 76FF | FFF4 | FC76 | 76FF | 8DFA | E64E |
| 0000057720 | 5116 | 4E8D | 16F6 | 8D51 | DA4E | 5116 | 681E | 0468 |

THU MAR 14 17:42:50 1991 MEDIT.DLL PAGE 27, LINE 1535

| | | | | | | | | |
|---|---|---|---|---|---|---|---|---|
| 0000057740 | 1568 | FF04 | E236 | FF01 | E036 | FF01 | E636 | FF01 |
| 0000057760 | E436 | 9A01 | 57B5 | 0000 | C483 | 8B28 | E046 | 9AE9 |
| 0000060000 | E900 | 0006 | 09B8 | E900 | 0091 | 068E | 1112 | 5E6B |
| 0000060020 | 1E06 | C02B | 8926 | B487 | 2600 | 8789 | 00B2 | D68E |
| 0000060040 | 1114 | 8326 | CE3E | 0054 | 0375 | 09E9 | 8300 | DE7E |
| 0000060060 | 74FE | E903 | 000F | 068E | 1116 | 8326 | E63E | 0054 |
| 0000060100 | 0375 | 50E9 | C700 | E046 | 0000 | 76FF | FFE4 | E276 |
| 0000060120 | 468D | 16E0 | FF50 | F476 | 76FF | FFFC | FA76 | 4E8D |
| 0000060140 | 16E6 | 8D51 | F64E | 5116 | 4E8D | 16DA | 1E51 | 6868 |
| 0000060160 | 6804 | 0419 | 36FF | 01E2 | 36FF | 01E0 | 36FF | 01E6 |
| 0000060200 | 36FF | 01E4 | 2E9A | 0055 | 8300 | 28C4 | 468B | E9E0 |
| 0000060220 | 0009 | 06E9 | B800 | 0000 | 00E9 | 1F00 | 5F5E | ED83 |
| 0000060240 | 8B02 | 1FE5 | 4D5D | 02CA | 1E00 | 9058 | 5545 | EC8B |
| 0000060260 | 8E1E | 81D8 | 28EC | 5700 | C756 | FA46 | 0478 | 5E8C |
| 0000060300 | C7FC | F446 | 0000 | C02B | 4689 | 89E2 | E046 | 068E |
| 0000060320 | 1114 | 8326 | 843E | 0055 | 0375 | 1DE9 | FF00 | E636 |
| 0000060340 | FF01 | E436 | 8D01 | D846 | 5016 | 9A9A | 0055 | 8300 |
| 0000060360 | 08C4 | 003D | 7400 | E903 | 000F | 068E | 1116 | 8326 |
| 0000060400 | B03E | 0055 | 0375 | 3BE9 | 1E00 | 7C68 | 8D04 | E846 |
| 0000060420 | 5016 | 468D | 16D8 | 8D50 | F646 | 5016 | 2668 | 1E04 |
| 0000060440 | 8068 | FF04 | E236 | FF01 | E036 | FF01 | E636 | FF01 |
| 0000060460 | E436 | 9A01 | 55E3 | 0000 | C483 | 891E | F646 | 5689 |
| 0000060500 | E9F8 | 0008 | C02B | 4689 | 89F8 | F646 | 468B | A306 |
| 0000060520 | 01E8 | 36FF | 01E8 | 068E | 1110 | FF26 | 7E36 | 9A08 |
| 0000060540 | 6683 | 58B0 | 4689 | 89E4 | E656 | D00B | 0375 | 17E9 |
| 0000060560 | FF00 | E676 | 76FF | 68E4 | 48EE | 1868 | 9A00 | F4F8 |
| 0000060600 | 56AD | C483 | E908 | 000A | 068E | 1122 | C626 | 1806 |
| 0000060620 | 0000 | 068E | 1114 | 8326 | 053E | 0058 | 0375 | 09E9 |
| 0000060640 | 8300 | DC7E | 74FE | E903 | 000F | 068E | 1116 | 8326 |
| 0000060660 | 313E | 0058 | 0375 | 39E9 | 8D00 | E846 | 5016 | 468D |
| 0000060700 | 16F6 | 8D50 | D846 | 5016 | 681E | 0480 | 2E68 | FF04 |
| 0000060720 | E236 | FF01 | E036 | FF01 | E636 | FF01 | E436 | 9A01 |
| 0000060740 | 477C | 0000 | C483 | C71A | DE46 | 0000 | 06E9 | E900 |
| 0000060760 | 0003 | 00E9 | 5E00 | 835F | 02ED | E58B | 5D1F | CB4D |
| 0000061000 | 581E | 459C | 6B55 | 1EEC | D88E | EC81 | 000A | 5657 |
| 0000061020 | B81E | 5564 | D88E | E8A1 | 3901 | 0846 | 0375 | 27E9 |
| 0000061040 | 8300 | E83E | FF01 | 0375 | 12E9 | FF00 | E836 | 6801 |
| 0000061060 | 5979 | 1868 | 9A00 | 2004 | 5973 | C483 | FF06 | 0876 |
| 0000061100 | D99A | 8157 | 8359 | 02C4 | 8F68 | 6859 | 0018 | 589A |
| 0000061120 | 97F5 | 8359 | 04C4 | 463B | 7206 | E903 | 003F | DD68 |
| 0000061140 | 6859 | 0018 | 589A | E5F5 | 8359 | 04C4 | 4689 | E9FA |
| 0000061160 | 0003 | 46FF | 8BFA | 0646 | 4639 | 7CFA | E903 | 0010 |
| 0000061200 | 068E | 1122 | 5E8B | 26FA | 87C6 | 0018 | E920 | FFE2 |
| 0000061220 | 068E | 1122 | 5E8B | 2606 | 87C6 | 0018 | 8000 | 0A7E |
| 0000061240 | 740A | E903 | 001C | 76FF | FF06 | 0876 | F368 | 6859 |
| 0000061260 | 0018 | 5C9A | ED61 | 8359 | 08C4 | 6C9A | FBAC | E959 |
| 0000061300 | 00D6 | 4068 | 685A | 0018 | 589A | A8F5 | 835A | 04C4 |
| 0000061320 | 4689 | 8BFC | 0646 | 4639 | 72FC | E903 | 0000 | 7E81 |
| 0000061340 | 83FC | 7D00 | E903 | 001C | 681E | 0491 | 2068 | 9A41 |
| 0000061360 | FFFF | 0000 | 068E | 1122 | C626 | 9B06 | 0000 | FFB8 |
| 0000061400 | E9FF | 00C5 | 468B | 05FC | 0018 | 4689 | C7F6 | F846 |
| 0000061420 | 5AA0 | 468B | 2BFC | 0646 | 4689 | E9FA | 0006 | 4EFF |
| 0000061440 | FFF6 | FA4E | 7E83 | 00FA | 037D | 10E9 | C400 | F65E |
| 0000061460 | 8A26 | C407 | F65E | 8826 | 0147 | E1E9 | 8AFF | 0A46 |
| 0000061500 | 068E | 1122 | 5E8B | 2606 | 8788 | 0018 | 3E83 | 1372 |
| 0000061520 | 7500 | E903 | 0042 | 006A | E8A1 | 8E01 | 1006 | 2611 |
| 0000061540 | 1E6B | 087E | 8E1E | 1206 | 2611 | 872B | 00A4 | 6850 |
| 0000061560 | 58A8 | 1868 | 9A00 | A32D | 5892 | C483 | 8E08 | 2406 |
| 0000061600 | 8B11 | 0846 | 3926 | DA06 | 7408 | E903 | 000A | 016A |

```
THU MAR 14 17:42:50 1991  MEDIT.DLL  PAGE 28, LINE 1594

0000061620  169A  EED4  835A  02C4  01B8  A300  026C  068E
0000061640  1110  6B26  7E1E  1E08  068E  1112  8926  AC87
0000061660  FF00  E836  6801  5960  1868  9A00  2004  5968
0000061700  C483  B806  0000  00E9  1F00  5F5E  ED83  8B02
0000061720  1FE5  4D5D  06CA  1E00  9058  5545  EC8B  8E1E
0000061740  81D8  24EC  5700  1E56  42B8  8E59  C7D8  FA46
0000061760  04E7  5E8C  C7FC  F446  0000  C02B  4689  89E6
0000062000  E446  068E  1114  8326  113E  005C  0375  1DE9
0000062020  FF00  E636  FF01  E436  8D01  DC46  5016  1B9A
0000062040  0058  8300  08C4  003D  7400  E903  000F  068E
0000062060  1116  8326  293E  005C  0375  3BE9  1E00  EB68
0000062100  8D04  E846  5016  468D  16DC  8D50  F646  5016
0000062120  8D68  1E04  F068  FF04  E236  FF01  E036  FF01
0000062140  E636  FF01  E436  9A01  5864  0000  C483  891E
0000062160  F646  5689  E9F8  0008  C02B  4689  89F8  F646
0000062200  468A  5006  068E  1110  6B26  7E1E  1E08  068E
0000062220  1112  8B26  A487  8E00  1E06  2611  0603  0008
0000062240  8E50  2006  2611  36FF  0004  309A  0859  805C
0000062260  067E  740A  E903  0014  068E  111E  FF26  0806
0000062300  8E00  2006  2611  06C7  0004  0000  068E  1120
0000062320  FF26  0406  9A00  B08E  5AC3  068E  1114  8326
0000062340  C93E  0058  0375  09E9  8300  E07E  74FE  E903
0000062360  000F  068E  1116  8326  E13E  0058  0375  39E9
0000062400  8D00  E846  5016  468D  16F6  8D50  DC46  5016
0000062420  681E  04F0  9568  FF04  E236  FF01  E036  FF01
0000062440  E636  FF01  E436  9A01  5910  0000  C483  C71A
0000062460  E246  0000  06E9  E900  0003  00E9  1F00  5F5E
0000062500  ED83  8B02  1FE5  4D5D  02CA  1E00  9058  5545
0000062520  EC8B  8E1E  81D8  2EEC  5700  1E56  19B8  8E5B
0000062540  C7D8  FA46  050A  5E8C  C7FC  F246  0000  C02B
0000062560  4689  89DC  DA46  068E  1114  8326  393E  005B
0000062600  0375  1DE9  FF00  E636  FF01  E436  8D01  D246
0000062620  5016  4F9A  005B  8300  08C4  003D  7400  E903
0000062640  000F  068E  1116  8326  653E  005B  0375  3BE9
0000062660  1E00  0E68  8D05  E446  5016  468D  16D2  8D50
0000062700  F646  5016  A968  1E04  1268  FF05  E236  FF01
0000062720  E036  FF01  E636  FF01  E436  9A01  5B98  0000
0000062740  C483  891E  F646  5689  E9F8  0008  C02B  4689
0000062760  89F8  F646  46C7  00DE  C700  F046  0000  068E
0000063000  1120  A126  0004  4689  8EF4  1006  2611  1E6B
0000063020  087E  8E1E  1206  2611  878B  00A4  068E  111E
0000063040  0326  0806  5000  068E  1120  FF26  0436  FF00
0000063060  0876  76FF  9A06  7A05  5BDD  468B  8B06  0856
0000063100  4689  89E0  E256  03E9  FF00  E046  5EC4  26E0
0000063120  3F80  7500  E903  0062  5EC4  26E0  3F80  740A
0000063140  E903  0050  46C7  00F4  FF00  F046  068E  111E
0000063160  A126  0008  4603  8EF0  2606  2611  063B  0014
0000063200  C373  2CE9  8E00  2806  2611  36FF  000C  FF26
0000063220  0A36  6A00  8E31  2A06  2611  36FF  08D2  FF26
0000063240  D036  6A08  6A02  9A00  1D85  0000  46C7  01DE
0000063260  E900  0003  46FF  E9F4  FF8F  7E83  00DE  0375
0000063300  14E9  8E00  2606  2611  14A1  4800  068E  111E
0000063320  A326  0008  0CE9  8B00  F046  068E  111E  0126
0000063340  0806  8B00  F446  068E  1120  A326  0004  8E9A
0000063360  68B0  8E5D  1406  2611  3E83  5CAD  7500  E903
0000063400  0009  7E83  FED6  0374  0FE9  8E00  1606  2611
0000063420  3E83  5CD9  7500  E903  0039  468D  16E4  8D50
0000063440  F646  5016  468D  16D2  1E50  1268  6805  04CE
0000063460  36FF  01E2  36FF  01E0  36FF  01E6  36FF  01E4
```

THU MAR 14 17:42:50 1991 MEDIT.DLL PAGE 29, LINE 1653

| | | | | | | | | | |
|---|---|---|---|---|---|---|---|---|---|
| 0000063500 | 589A | 005C | 8300 | 1AC4 | 46C7 | 00D8 | E900 | 0006 |
| 0000063520 | 03E9 | E900 | 0000 | 5E1F | 835F | 02ED | E58B | 5D1F |
| 0000063540 | CA4D | 0004 | 581E | 4590 | 8B55 | 1EEC | D88E | EC81 |
| 0000063560 | 0026 | 5657 | 46C7 | 28FA | 8C05 | FC5E | 46C7 | 01F2 |
| 0000063600 | 2B01 | 89C0 | E446 | 4689 | 8EE2 | 1406 | 2611 | 3E83 |
| 0000063620 | 5F5E | 7500 | E903 | 001D | 36FF | 01E6 | 36FF | 01E4 |
| 0000063640 | 468D | 16DA | 9A50 | 5CC3 | 0000 | C483 | 3D08 | 0000 |
| 0000063660 | 0374 | 0FE9 | 8E00 | 1606 | 2611 | 3E83 | 5F76 | 7500 |
| 0000063700 | E903 | 003B | 681E | 052C | 468D | 16E6 | 8D50 | DA46 |
| 0000063720 | 5016 | 468D | 16F6 | 6850 | 04E6 | 681E | 0586 | 36FF |
| 0000063740 | 01E2 | 36FF | 01E0 | 36FF | 01E6 | 36FF | 01E4 | 0C9A |
| 0000063760 | 005D | 8300 | 1EC4 | 4689 | 89F6 | F856 | 08E9 | 2B00 |
| 0000064000 | 89C0 | F846 | 4689 | 81F6 | 0A7E | 0083 | 0373 | 93E9 |
| 0000064020 | 1E00 | 3068 | 6805 | 4120 | 209A | 005A | 8E00 | 2206 |
| 0000064040 | 2611 | 06C6 | 009B | 8E00 | 1406 | 2611 | 3E83 | 5E2A |
| 0000064060 | 7500 | E903 | 0009 | 7E83 | FEDE | 0374 | 0FE9 | 8E00 |
| 0000064100 | 1606 | 2611 | 3E83 | 5E42 | 7500 | E903 | 0050 | 46C7 |
| 0000064120 | FFE0 | FFFF | E476 | 76FF | 8DE2 | E046 | 5016 | 76FF |
| 0000064140 | FFF2 | FC76 | 76FF | 8DFA | E64E | 5116 | 4E8D | 16F6 |
| 0000064160 | 8D51 | DA4E | 5116 | 681E | 0586 | EF68 | FF04 | E236 |
| 0000064200 | FF01 | E036 | FF01 | E636 | FF01 | E436 | 9A01 | 5682 |
| 0000064220 | 0000 | C483 | 8B28 | E046 | 86E9 | E901 | 0006 | FFB8 |
| 0000064240 | E9FF | 017D | 468B | 3908 | E806 | 7501 | E903 | 0027 |
| 0000064260 | 3E83 | 01E8 | 75FF | E903 | 0012 | 36FF | 01E8 | 0868 |
| 0000064300 | 6860 | 0018 | 049A | 0220 | 8360 | 06C4 | 76FF | 9A08 |
| 0000064320 | 57D9 | 6010 | C483 | 6802 | 601E | 1868 | 9A00 | F558 |
| 0000064340 | 6026 | C483 | 3B04 | 0A46 | 0372 | 3FE9 | 6800 | 5AE6 |
| 0000064360 | 1868 | 9A00 | F558 | 6089 | C483 | 8904 | F446 | 03E9 |
| 0000064400 | FF00 | F446 | 468B | 39F4 | 0A46 | 0377 | 10E9 | 8E00 |
| 0000064420 | 2206 | 8B11 | F45E | C626 | 1887 | 2000 | E2E9 | 8EFF |
| 0000064440 | 2206 | 8B11 | 0A5E | C626 | 1987 | 0000 | 7E80 | 0A06 |
| 0000064460 | 0375 | 6FE9 | 8A00 | 0646 | 068E | 1122 | 5E8B | 260A |
| 0000064500 | 8788 | 0018 | 3E83 | 1372 | 7500 | E903 | 002B | 468B |
| 0000064520 | 050A | 0018 | 5006 | 6C9A | 21A2 | 835E | 04C4 | 068E |
| 0000064540 | 1124 | 468B | 2608 | 0639 | 08DA | 0374 | 0AE9 | 6A00 |
| 0000064560 | 9A01 | D416 | 60CF | C483 | B802 | 0001 | 6CA3 | 8E02 |
| 0000064600 | 1006 | 2611 | 1E6B | 087E | 8E1E | 1206 | 2611 | 8789 |
| 0000064620 | 00AC | 36FF | 01E8 | EF68 | 685F | 0018 | 049A | F720 |
| 0000064640 | 835F | 06C4 | 068E | 1114 | 8326 | C03E | 005E | 0375 |
| 0000064660 | 09E9 | 8300 | DE7E | 74FE | E903 | 000F | 068E | 1116 |
| 0000064700 | 8326 | EC3E | 005E | 0375 | 50E9 | C700 | E046 | 0000 |
| 0000064720 | 76FF | FFE4 | E276 | 468D | 16E0 | FF50 | F276 | 76FF |
| 0000064740 | FFFC | FA76 | 4E8D | 16E6 | 8D51 | F64E | 5116 | 4E8D |
| 0000064760 | 16DA | 1E51 | 8668 | 6805 | 050E | 36FF | 01E2 | 36FF |
| 0000065000 | 01ED | 36FF | 01E6 | 36FF | 01E4 | BE9A | 005F | 8300 |
| 0000065020 | 28C4 | 468B | E9E0 | 0009 | 06E9 | B800 | 0000 | 00E9 |
| 0000065040 | 5E00 | 835F | 02ED | E58B | 5D1F | CB4D | 581E | 4590 |
| 0000065060 | 8B55 | 1EEC | D88E | EC81 | 0026 | 5657 | 46C7 | 95FA |
| 0000065100 | 8C05 | FC5E | 46C7 | 01F4 | 2B01 | 89C0 | E446 | 4689 |
| 0000065120 | 8EE2 | 1406 | 2611 | 3E83 | 6206 | 7500 | E903 | 001D |
| 0000065140 | 36FF | 01E6 | 36FF | 01E4 | 468D | 16DA | 9A50 | 5ED6 |
| 0000065160 | 0000 | C483 | 3D08 | 0000 | 0374 | 0FE9 | 8E00 | 1606 |
| 0000065200 | 2611 | 3E83 | 63E6 | 7500 | E903 | 003B | 681E | 0599 |
| 0000065220 | 468D | 16E8 | 8D50 | DA46 | 5016 | 468D | 16F6 | 6850 |
| 0000065240 | 051C | 681E | 05CC | 36FF | 01E2 | 36FF | 01E0 | 36FF |
| 0000065260 | 01E6 | 36FF | 01E4 | 1F9A | 005F | 8300 | 1EC4 | 4689 |
| 0000065300 | 89F6 | F856 | 08E9 | 2B00 | 89C0 | F846 | 4689 | 8EF6 |
| 0000065320 | 1406 | 2611 | 3E83 | 6266 | 7500 | E903 | 0051 | 7E83 |
| 0000065340 | FEDE | 0375 | 48E9 | FF00 | 0C76 | 76FF | FF0A | 0876 |

THU MAR 14 17:42:50 1991 MEDIT.DLL PAGE 30, LINE 1712

| | | | | | | | | |
|---|---|---|---|---|---|---|---|---|
| 0000065360 | 76FF | 1E06 | 9D68 | 8D05 | E846 | 5016 | 468D | 16F6 |
| 0000065400 | 8D50 | DA46 | 5016 | 681E | 05CC | 1F68 | FF05 | E236 |
| 0000065420 | FF01 | E036 | FF01 | E636 | FF01 | E436 | 1E01 | BB68 |
| 0000065440 | 6805 | FFFF | FF68 | 9AFF | FFFF | 0000 | C483 | 8E2E |
| 0000065460 | 1406 | 2611 | 3E83 | 62B9 | 7500 | E903 | 0044 | 7E83 |
| 0000065500 | FEDE | 0375 | 3BE9 | FF00 | 0876 | 76FF | 1E06 | C268 |
| 0000065520 | 8D05 | E846 | 5016 | 468D | 16F6 | 8D50 | DA46 | 5016 |
| 0000065540 | 681E | 05CC | 2068 | FF05 | E236 | FF01 | E036 | FF01 |
| 0000065560 | E636 | FF01 | E436 | 6801 | 0106 | FB9A | 0062 | 8300 |
| 0000065600 | 24C4 | 068E | 1114 | 8326 | CE3E | 0063 | 0375 | 41E9 |
| 0000065620 | 8300 | DE7E | 75FE | E903 | 0038 | 76FF | 1E0C | C668 |
| 0000065640 | 8D05 | E846 | 5016 | 468D | 16F6 | 8D50 | DA46 | 5016 |
| 0000065660 | 681E | 05CC | 2068 | FF05 | E236 | FF01 | E036 | FF01 |
| 0000065700 | E636 | FF01 | E436 | 6801 | 0101 | FF9A | 00FF | 8300 |
| 0000065720 | 22C4 | 76FF | 9A0A | 67A1 | 633B | C483 | C402 | 065E |
| 0000065740 | 768B | 260C | 008A | 4688 | 80E6 | E67E | 7500 | E903 |
| 0000065760 | 0028 | 06C7 | 026C | 0001 | 468B | 400A | 8B50 | 0646 |
| 0000066000 | 568B | 0308 | 0C46 | 5052 | 049A | 5C20 | 8363 | 06C4 |
| 0000066020 | 5EC4 | 8B06 | 0C76 | C626 | 0000 | 06C7 | 026C | 0001 |
| 0000066040 | 76FF | FF0A | 0876 | 76FF | 9A06 | 2004 | 6388 | C483 |
| 0000066060 | 8306 | 723E | 0013 | 0375 | 4AE9 | 8B00 | 0A46 | 068E |
| 0000066100 | 1110 | 6B26 | 7E1E | 1E08 | 068E | 1112 | 2B26 | A487 |
| 0000066120 | 5000 | 76FF | 9A0C | A616 | 63A6 | 468B | 8E0A | 1006 |
| 0000066140 | 2611 | 1E6B | 087E | 8E1E | 1206 | 2611 | 872B | 00A4 |
| 0000066160 | 6A50 | 9A01 | A578 | 63B0 | 468B | 400A | 9A50 | A41B |
| 0000066200 | 63B8 | C483 | 9A02 | AC6C | 63C2 | 468B | 400A | 9A50 |
| 0000066220 | 57D9 | 60A4 | C483 | 8E02 | 1406 | 2611 | 3E83 | 60DB |
| 0000066240 | 7500 | E903 | 0009 | 7E83 | FEDE | 0374 | 0FE9 | 8E00 |
| 0000066260 | 1606 | 2611 | 3E83 | 60F3 | 7500 | E903 | 0050 | 46C7 |
| 0000066300 | 00E0 | FF00 | E476 | 76FF | 8DE2 | E046 | 5016 | 76FF |
| 0000066320 | FFF4 | FC76 | 76FF | 8DFA | E84E | 5116 | 4E8D | 16F6 |
| 0000066340 | 8D51 | DA4E | 5116 | 681E | 05CC | 3A68 | FF05 | E236 |
| 0000066360 | FF01 | E036 | FF01 | E636 | FF01 | E436 | 9A01 | 613B |
| 0000066400 | 0000 | C483 | 8B28 | E046 | 09E9 | E900 | 0006 | 00B8 |
| 0000066420 | E900 | 0000 | 5F5E | ED83 | 8B02 | 1FE5 | 4D5D | 1ECB |
| 0000066440 | 9058 | 5545 | EC8B | 8E1E | 81D8 | 2AEC | 5700 | C756 |
| 0000066460 | FA46 | 05DA | 5E8C | C7FC | F246 | 0101 | C02B | 4689 |
| 0000066500 | 89E0 | DE46 | 068E | 1114 | 8326 | 413E | 0065 | 0375 |
| 0000066520 | 1DE9 | FF00 | E636 | FF01 | E436 | 8D01 | D646 | 5016 |
| 0000066540 | 9E9A | 0061 | 8300 | 08C4 | 003D | 7400 | E903 | 000F |
| 0000066560 | 068E | 1116 | 8326 | 593E | 0065 | 0375 | 3BE9 | 1E00 |
| 0000066600 | DE68 | 8D05 | E646 | 5016 | 468D | 16D6 | 8D50 | F646 |
| 0000066620 | 5016 | 4768 | 1E05 | E268 | FF05 | E236 | FF01 | E036 |
| 0000066640 | FF01 | E636 | FF01 | E436 | 9A01 | 61E7 | 0000 | C483 |
| 0000066660 | 891E | F646 | 5689 | E9F8 | 0008 | C02B | 4689 | 89F8 |
| 0000066700 | F646 | E8A1 | 4001 | 8E50 | 1006 | 2611 | 36FF | 087E |
| 0000066720 | 839A | 1366 | 8965 | E246 | 5689 | A1E4 | 01E8 | 5040 |
| 0000066740 | 189A | 2A85 | 8965 | F446 | 7E83 | 00F4 | 037D | 19E9 |
| 0000066760 | 6800 | 65CC | 1868 | 9A00 | F558 | 65D4 | C483 | 0304 |
| 0000067000 | F446 | 843D | 7700 | E903 | 0080 | 068E | 1114 | 8326 |
| 0000067020 | 023E | 0066 | 0375 | 09E9 | 8300 | DA7E | 74FE | E903 |
| 0000067040 | 000F | 068E | 1116 | 8326 | 1A3E | 0066 | 0375 | 50E9 |
| 0000067060 | C700 | DC46 | FFFF | 76FF | FFE0 | DE76 | 468D | 16DC |
| 0000067100 | FF50 | F276 | 76FF | FFFC | FA76 | 4E8D | 16E6 | 8D51 |
| 0000067120 | F64E | 5116 | 4E8D | 16D6 | 1E51 | E268 | 6805 | 0550 |
| 0000067140 | 36FF | 01E2 | 36FF | 01E0 | 36FF | 01E6 | 36FF | 01E4 |
| 0000067160 | 629A | 0066 | 8300 | 28C4 | 468B | E9DC | 00CA | 06E9 |
| 0000067200 | B800 | FFFF | C1E9 | E900 | 0041 | 468B | 0BE4 | E246 |
| 0000067220 | 0375 | 14E9 | FF00 | E476 | 76FF | 68E2 | 65E4 | 1868 |

THU MAR 14 17:42:50 1991 MEDIT.DLL PAGE 31, LINE 1771

| | | | | | | | | |
|---|---|---|---|---|---|---|---|---|
| 0000067240 | 9A00 | F4B2 | 65EC | C483 | C708 | 6C06 | 0102 | FF00 |
| 0000067260 | E836 | 6801 | 60C7 | 1868 | 9A00 | 2004 | 65F9 | C483 |
| 0000067300 | A106 | 01E8 | 5040 | BD9A | 086C | 8E63 | 1406 | 2611 |
| 0000067320 | 3E83 | 6188 | 7500 | E903 | 0009 | 7E83 | FEDA | 0374 |
| 0000067340 | 0FE9 | 8E00 | 1606 | 2611 | 3E83 | 61B4 | 7500 | E903 |
| 0000067360 | 0050 | 46C7 | 00DC | FF00 | E076 | 76FF | 8DDE | DC46 |
| 0000067400 | 5016 | 76FF | FFF2 | FC76 | 76FF | 8DFA | E64E | 5116 |
| 0000067420 | 4E8D | 16F6 | 8D51 | D64E | 5116 | 681E | D5E2 | 5968 |
| 0000067440 | FF05 | E236 | FF01 | E036 | FF01 | E636 | FF01 | E436 |
| 0000067460 | 9A01 | 642E | 0000 | C483 | 8B28 | DC46 | 09E9 | E900 |
| 0000067500 | 0006 | 00B8 | E900 | 0000 | 5F5E | ED83 | 8B02 | 1FE5 |
| 0000067520 | 4D5D | 1ECB | 9058 | 5545 | EC8B | 8E1E | 81D8 | 00EC |
| 0000067540 | 5700 | 1E56 | 8DB8 | 8E5C | 8ED8 | 1206 | 6B11 | 065E |
| 0000067560 | 8B1E | 0846 | 3926 | A087 | 7300 | E903 | 0013 | 5E6B |
| 0000067600 | 1E06 | 8B26 | B087 | 2600 | 870B | 00AE | 0374 | 09E9 |
| 0000067620 | B800 | 0000 | 00BA | E900 | 0022 | 068E | 1112 | 5E6B |
| 0000067640 | 1E06 | C426 | AE9F | 8B00 | 0876 | C68B | E6D1 | F003 |
| 0000067660 | E6D1 | 8B26 | 2600 | 508B | E902 | 0000 | 5E1F | 835F |
| 0000067700 | 02ED | E58B | 5D1F | CA4D | 0004 | 581E | 4590 | 8B55 |
| 0000067720 | 1EEC | D88E | EC81 | 0006 | 5657 | B81E | 6695 | D88E |
| 0000067740 | 068E | 1110 | 6B26 | 7E1E | 1E08 | 068E | 1112 | 8B26 |
| 0000067760 | A09F | 8B00 | D1C3 | 03E3 | D1D8 | 8EE3 | 1006 | 2611 |
| 0000070000 | 366B | 087E | 8E1E | 1206 | 2611 | B4C4 | 00AE | 8B26 |
| 0000070020 | 2600 | 508B | 8902 | FA46 | 5689 | FFFC | E836 | 6801 |
| 0000070040 | 6522 | 1868 | 9A00 | 2004 | 678A | C483 | 8B06 | FC46 |
| 0000070060 | 460B | 75FA | E903 | 0027 | 5EC4 | 26FA | 3F80 | 7500 |
| 0000070100 | E903 | 001B | 068E | 1110 | 6B26 | 7E1E | 1E08 | 068E |
| 0000070120 | 1112 | FF26 | A0B7 | 9A00 | 67A1 | 6503 | C483 | B802 |
| 0000070140 | 0000 | 00E9 | 1F00 | 5F5E | ED83 | 8B02 | 1FE5 | 4D5D |
| 0000070160 | 1ECB | 9058 | 5545 | EC8B | 8E1E | 81D8 | 36EC | 5700 |
| 0000070200 | C756 | FA46 | 05F0 | 5E8C | C7FC | E246 | 0101 | C02B |
| 0000070220 | 4689 | 89D4 | D246 | 068E | 1114 | 8326 | 4B3E | 0068 |
| 0000070240 | 0375 | 1DE9 | FF00 | E636 | FF01 | E436 | 8D01 | CA46 |
| 0000070260 | 5016 | 919A | 0064 | 8300 | 08C4 | 003D | 7400 | E903 |
| 0000070300 | 000F | 068E | 1116 | 8326 | F93E | 0068 | 0375 | 3BE9 |
| 0000070320 | 1E00 | F468 | 8D05 | D646 | 5016 | 468D | 16CA | 8D50 |
| 0000070340 | EA46 | 5016 | AC68 | 1E05 | 0068 | FF06 | E236 | FF01 |
| 0000070360 | E036 | FF01 | E636 | FF01 | E436 | 9A01 | 64DA | 0000 |
| 0000070400 | C483 | 891E | EA46 | 5689 | E9EC | 0008 | C02B | 4689 |
| 0000070420 | 89EC | EA46 | 068E | 1114 | 8326 | E13E | 0068 | 0375 |
| 0000070440 | 41E9 | 8300 | CE7E | 75FE | E903 | 0038 | 76FF | 1E06 |
| 0000070460 | F868 | 8D05 | D646 | 5016 | 468D | 16EA | 8D50 | CA46 |
| 0000070500 | 5016 | 681E | 0600 | B268 | FF05 | E236 | FF01 | E036 |
| 0000070520 | FF01 | E636 | FF01 | E436 | 6801 | 0109 | AB9A | 0062 |
| 0000070540 | 8300 | 22C4 | 068E | 1110 | 6B26 | 7E1E | 1E08 | 068E |
| 0000070560 | 1112 | 8B26 | B687 | 4800 | 068E | 1110 | 6B26 | 7E1E |
| 0000070600 | 1E08 | 068E | 1112 | 3B26 | A087 | 7600 | E903 | 01FA |
| 0000070620 | 068E | 1110 | 6B26 | 7E1E | 1E08 | 068E | 1112 | 8126 |
| 0000070640 | A0BF | 0000 | 7710 | E903 | 007D | 068E | 1114 | 8326 |
| 0000070660 | AA3E | 0069 | 0375 | 09E9 | 8300 | CE7E | 74FE | E903 |
| 0000070700 | 000F | 068E | 1116 | 8326 | C23E | 0069 | 0375 | 50E9 |
| 0000070720 | C700 | D046 | 0007 | 76FF | FFD4 | D276 | 468D | 16D0 |
| 0000070740 | FF50 | E276 | 76FF | FFFC | FA76 | 4E8D | 16D6 | 8D51 |
| 0000070760 | EA4E | 5116 | 4E8D | 16CA | 1E51 | 0068 | 6806 | 05B8 |
| 0000071000 | 36FF | 01E2 | 36FF | 01E0 | 36FF | 01E6 | 36FF | 01E4 |
| 0000071020 | 0A9A | 006A | 8300 | 28C4 | 468B | E9D0 | 0364 | 06E9 |
| 0000071040 | B800 | 0007 | 5BE9 | 8E03 | 1006 | 2611 | 1E6B | 087E |
| 0000071060 | 8E1E | 1206 | 2611 | 878B | 00B6 | 0005 | 8B01 | D1C8 |
| 0000071100 | 03E0 | D1C1 | 50E0 | 068E | 1110 | 6B26 | 7E1E | 1E08 |

THU MAR 14 17:42:50 1991 MEDIT.DLL PAGE 32, LINE 1830

| | | | | | | | | |
|---|---|---|---|---|---|---|---|---|
| 0000071120 | 068E | 1112 | FF26 | B0B7 | 2600 | B7FF | 00AE | FE9A |
| 0000071140 | 58F8 | 8367 | 06C4 | 4689 | 89E6 | E856 | D00B | 0374 |
| 0000071160 | 80E9 | 8E00 | 1406 | 2611 | 3E83 | 647B | 7500 | E903 |
| 0000071200 | 0009 | 7E83 | FECE | 0374 | 0FE9 | 8E00 | 1606 | 2611 |
| 0000071220 | 3E83 | 64A7 | 7500 | E903 | 0050 | 46C7 | 07D0 | FF00 |
| 0000071240 | D476 | 76FF | 8DD2 | D046 | 5016 | 76FF | FFE2 | FC76 |
| 0000071260 | 76FF | 8DFA | D64E | 5116 | 4E8D | 16EA | 8D51 | CA4E |
| 0000071300 | 5116 | 681E | 0600 | BB68 | FF05 | E236 | FF01 | E036 |
| 0000071320 | FF01 | E636 | FF01 | E436 | 9A01 | 65A1 | 0000 | C483 |
| 0000071340 | 8B28 | D046 | 9BE9 | E902 | 0006 | 07B8 | E900 | 0292 |
| 0000071360 | 97E9 | 8B00 | E646 | 568B | 8EE8 | 1006 | 2611 | 1E6B |
| 0000071400 | 087E | 8E1E | 1206 | 2611 | 8789 | 00AE | 8926 | B097 |
| 0000071420 | 8E00 | 1006 | 2611 | 1E6B | 087E | 8E1E | 1206 | 2611 |
| 0000071440 | 878B | 00B6 | 4689 | E9E4 | 0003 | 46FF | 8EE4 | 1006 |
| 0000071460 | 2611 | 1E6B | 087E | 8E1E | 1206 | 2611 | 878B | 00B6 |
| 0000071500 | 0005 | 3B01 | E446 | 0377 | 2AE9 | 8E00 | 1006 | 2611 |
| 0000071520 | 1E6B | 087E | 8E1E | 1206 | 2611 | 9FC4 | 00AE | 768B |
| 0000071540 | 8BE4 | D1C6 | 03E6 | D1F0 | 2BE6 | 26C0 | 4089 | 2602 |
| 0000071560 | 0089 | B5E9 | 8EFF | 1006 | 2611 | 1E6B | 087E | 8E1E |
| 0000071600 | 1206 | 2611 | 8781 | 00B6 | 0100 | 068E | 1110 | 6B26 |
| 0000071620 | 7E1E | 1E08 | 068E | 1112 | 8B26 | A087 | 8900 | EE46 |
| 0000071640 | 03E9 | FF00 | EE4E | 468B | 4006 | 463B | 72EE | E903 |
| 0000071660 | 0050 | 068E | 1110 | 6B26 | 7E1E | 1E08 | 068E | 1112 |
| 0000071700 | C426 | AE9F | 8D00 | FA5F | 768B | 8BEE | D1C6 | 03E6 |
| 0000071720 | D1F0 | 26E6 | 008B | 8B26 | 0250 | 068E | 1110 | 6B26 |
| 0000071740 | 7E1E | 1E08 | 068E | 1112 | C426 | AE9F | 8B00 | EE76 |
| 0000071760 | CE8B | E6D1 | F103 | E6D1 | 8926 | 2600 | 5089 | E902 |
| 0000072000 | FFA1 | 5E8B | 8B06 | D1C3 | 03E3 | D1D8 | 8EE3 | 1006 |
| 0000072020 | 2611 | 366B | 087E | 8E1E | 1206 | 2611 | B4C4 | 00AE |
| 0000072040 | C02B | 8926 | 0840 | 8926 | 0640 | 068E | 1110 | 6B26 |
| 0000072060 | 7E1E | 1E08 | 068E | 1112 | FF26 | A087 | 8E00 | 1006 |
| 0000072100 | 2611 | 7EA1 | 8E08 | 1A06 | 2611 | 0639 | 08DC | 0374 |
| 0000072120 | 16E9 | 8E00 | 2406 | 8B11 | 0646 | 3926 | DA06 | 7708 |
| 0000072140 | E903 | 0005 | FF26 | DA06 | 8E08 | 1006 | 2611 | 7EA1 |
| 0000072160 | 8E08 | 2C06 | 2611 | 0639 | 08E0 | 0374 | 33E9 | 8B00 |
| 0000072200 | 0646 | 2640 | 0639 | 08E2 | 0372 | 08E9 | 9A00 | D561 |
| 0000072220 | 6BDD | 1DE9 | 8E00 | 2C06 | 2611 | 3E83 | 08E2 | 75FF |
| 0000072240 | E903 | 000E | A126 | 08E2 | 5040 | D19A | EFD5 | 836B |
| 0000072260 | 02C4 | 3E83 | 1372 | 7500 | E903 | 0049 | 6C9A | 03AC |
| 0000072300 | 8E6C | 1C06 | 2611 | 3E83 | 0016 | 7400 | E903 | 0005 |
| 0000072320 | 099A | 2497 | 8E6C | 1006 | 2611 | 1E6B | 087E | 8E1E |
| 0000072340 | 1206 | 2611 | B7FF | 00A0 | 681E | 05FC | 468D | 16F0 |
| 0000072360 | 9A50 | F7DC | 6C33 | C483 | 6A0A | 8D02 | F046 | 5016 |
| 0000072400 | 059A | 9193 | 8E69 | 1406 | 2611 | 3E83 | 67CD | 7500 |
| 0000072420 | E903 | 0009 | 7E83 | FECE | 0374 | 0FE9 | 8E00 | 1606 |
| 0000072440 | 2611 | 3E83 | 67F9 | 7500 | E903 | 0050 | 46C7 | 00D0 |
| 0000072460 | FF00 | D476 | 76FF | 8DD2 | D046 | 5016 | 76FF | FFE2 |
| 0000072500 | FC76 | 76FF | 8DFA | D64E | 5116 | 4E8D | 16EA | 8D51 |
| 0000072520 | CA4E | 5116 | 681E | D600 | EB68 | FF05 | E236 | FF01 |
| 0000072540 | E036 | FF01 | E636 | FF01 | E436 | 9A01 | 6941 | 0000 |
| 0000072560 | C483 | 8B28 | D046 | 09E9 | E900 | 0006 | 00B8 | E900 |
| 0000072600 | 0000 | 5F5E | ED83 | 8B02 | 1FE5 | 4D5D | 1ECB | 9058 |
| 0000072620 | 5545 | EC8B | 8E1E | 81D8 | 30EC | 5700 | 1E56 | 0CB8 |
| 0000072640 | 8E67 | C7D8 | FA46 | 060E | 5E8C | C7FC | E846 | 0101 |
| 0000072660 | C02B | 4689 | 89DA | D846 | 068E | 1114 | 8326 | A13E |
| 0000072700 | 006D | 0375 | 1DE9 | FF00 | E636 | FF01 | E436 | 8D01 |
| 0000072720 | D046 | 5016 | E39A | 0067 | 8300 | 08C4 | 003D | 7400 |
| 0000072740 | E903 | 000F | 068E | 1116 | 8326 | B93E | 006D | 0375 |
| 0000072760 | 3BE9 | 1E00 | 1268 | 8D06 | DC46 | 5016 | 468D | 16D0 |

THU MAR 14 17:42:50 1991 MEDIT.DLL PAGE 33, LINE 1889

| | | | | | | | | |
|---|---|---|---|---|---|---|---|---|
| 0000073000 | 8D50 | EA46 | 5016 | FF68 | 1E05 | 1A68 | FF06 | E236 |
| 0000073020 | FF01 | E036 | FF01 | E636 | FF01 | E436 | 9A01 | 682C |
| 0000073040 | 0000 | C483 | 891E | EA46 | 5689 | E9EC | 0008 | C02B |
| 0000073060 | 4689 | 89EC | EA46 | 068E | 1110 | 6B26 | 7E1E | 1E08 |
| 0000073100 | 068E | 1112 | 468B | 2606 | 8739 | 00A0 | 0373 | 19E9 |
| 0000073120 | 8E00 | 1006 | 2611 | 1E6B | 087E | 8E1E | 1206 | 2611 |
| 0000073140 | BF83 | 00A0 | 7400 | E903 | 007D | 068E | 1114 | 8326 |
| 0000073160 | 3C3E | 006C | 0375 | 09E9 | 8300 | D47E | 74FE | E903 |
| 0000073200 | 000F | 068E | 1116 | 8326 | 543E | 006C | 0375 | 50E9 |
| 0000073220 | C700 | D646 | FFFF | 76FF | FFDA | D876 | 468D | 16D6 |
| 0000073240 | FF50 | E876 | 76FF | FFFC | FA76 | 4E8D | 16DC | 8D51 |
| 0000073260 | EA4E | 5116 | 4E8D | 16D0 | 1E51 | 1A68 | 6806 | 0607 |
| 0000073300 | 36FF | 01E2 | 36FF | 01E0 | 36FF | 01E6 | 36FF | 01E4 |
| 0000073320 | 9C9A | 006C | 5300 | 28C4 | 468B | E9D6 | 0232 | 06E9 |
| 0000073340 | B800 | FFFF | 29E9 | 8E02 | 1006 | 2611 | 1E6B | 087E |
| 0000073360 | 8E1E | 1206 | 2611 | 9FC4 | 00AE | 768B | 8B06 | D1C6 |
| 0000073400 | 03E6 | D1F0 | 26E6 | 70FF | 2602 | 30FF | FE9A | 5BF1 |
| 0000073420 | 836F | 04C4 | 468B | 8906 | EE46 | 03E9 | FF00 | EE46 |
| 0000073440 | 068E | 1110 | 6B26 | 7E1E | 1E08 | 068E | 1112 | 468B |
| 0000073460 | 26EE | 8739 | 00A0 | 0377 | 4EE9 | 8B00 | EE5E | C38B |
| 0000073500 | E3D1 | D803 | E3D1 | 068E | 1110 | 6B26 | 7E36 | 1E08 |
| 0000073520 | 068E | 1112 | C426 | AEB4 | 2600 | 408B | 2606 | 508B |
| 0000073540 | 8E08 | 1006 | 2611 | 1E6B | 087E | 8E1E | 1206 | 2611 |
| 0000073560 | 9FC4 | 00AE | 768B | 8BEE | D1CE | 03E6 | D1F1 | 26E6 |
| 0000073600 | 0089 | 8926 | 0250 | 94E9 | 8EFF | 1006 | 2611 | 1E6B |
| 0000073620 | 087E | 8E1E | 1206 | 2611 | 9F8B | 00A0 | C38B | E3D1 |
| 0000073640 | D803 | E3D1 | 068E | 1110 | 6B26 | 7E36 | 1E08 | 068E |
| 0000073660 | 1112 | C426 | AEB4 | 2B00 | 26C0 | 4089 | 2602 | 0089 |
| 0000073700 | 068E | 1110 | 6B26 | 7E1E | 1E08 | 068E | 1112 | FF26 |
| 0000073720 | A08F | 8E00 | 1006 | 2611 | 7EA1 | 8E08 | 1A06 | 2611 |
| 0000073740 | 0639 | 08DC | 0374 | 16E9 | 8E00 | 2406 | 8B11 | 0646 |
| 0000073760 | 3926 | DA06 | 7708 | E903 | 0005 | FF26 | DA0E | 8E08 |
| 0000074000 | 1006 | 2611 | 7EA1 | 8E08 | 2C06 | 2611 | 0639 | 08E0 |
| 0000074020 | 0374 | 1BE9 | 8B00 | 0646 | 3926 | E206 | 7708 | E903 |
| 0000074040 | 000E | A126 | 08E2 | 5048 | D19A | C0D5 | 836B | 02C4 |
| 0000074060 | 068E | 1110 | 6B26 | 7E1E | 1E08 | 068E | 1112 | C726 |
| 0000074100 | AC87 | 0100 | 8300 | 723E | 0013 | 0375 | 44E9 | FF00 |
| 0000074120 | 0676 | 016A | BE9A | 8CA5 | 9A6F | 9587 | 6F91 | 6C9A |
| 0000074140 | B2AC | 8E6F | 1006 | 2611 | 1E6B | 087E | 8E1E | 1206 |
| 0000074160 | 2611 | B7FF | 00A0 | 681E | 0616 | 468D | 16F0 | 9A50 |
| 0000074200 | F7DC | 6FC1 | C483 | 6A0A | 8D02 | F046 | 5016 | 059A |
| 0000074220 | 3F93 | 8E6E | 1406 | 2611 | 3E83 | 6CEF | 7500 | E903 |
| 0000074240 | 0009 | 7E83 | FED4 | 0374 | 0FE9 | 8E00 | 1606 | 2611 |
| 0000074260 | 3E83 | 6D1B | 7500 | E903 | 0050 | 46C7 | 00D6 | FF00 |
| 0000074300 | DA76 | 76FF | 8DD8 | D646 | 5016 | 76FF | FFE8 | FC76 |
| 0000074320 | 76FF | 8DFA | DC4E | 5116 | 4E8D | 16EA | 8D51 | D04E |
| 0000074340 | 5116 | 681E | 061A | 2B68 | FF06 | E236 | FF01 | E036 |
| 0000074360 | FF01 | E636 | FF01 | E436 | 9A01 | 6E01 | 0000 | C483 |
| 0000074400 | 8B28 | D646 | 09E9 | E900 | 0006 | 00B8 | E900 | 0000 |
| 0000074420 | 5E1F | 835F | 02ED | E58B | 5D1F | CA4D | 0002 | 581E |
| 0000074440 | 4590 | 8B55 | 1EEC | D88E | EC81 | 0024 | 5657 | B81E |
| 0000074460 | 6CCF | D88E | 46C7 | 29FA | 8C06 | FC5E | 46C7 | 01F4 |
| 0000074500 | 2B01 | 89C0 | E646 | 4689 | 8EE4 | 1406 | 2611 | 3E83 |
| 0000074520 | 7107 | 7500 | E903 | 001D | 36FF | 01E6 | 36FF | 01E4 |
| 0000074540 | 468D | 16DC | 9A50 | 6D05 | 0000 | C483 | 3D08 | 0000 |
| 0000074560 | 0374 | 0FE9 | 8E00 | 1606 | 2611 | 3E83 | 711F | 7500 |
| 0000074600 | E903 | 003B | 681E | 062D | 468D | 16E8 | 8D50 | DC46 |
| 0000074620 | 5016 | 468D | 16F6 | 6850 | 0641 | 681E | 0632 | 36FF |
| 0000074640 | 01E2 | 36FF | 01E0 | 36FF | 01E6 | 36FF | 01E4 | 4E9A |

THU MAR 14 17:42:50 1991 MEDIT.DLL PAGE 34, LINE 1948

| | | | | | | | | |
|---|---|---|---|---|---|---|---|---|
| 0000074660 | 006D | 8300 | 1EC4 | 4689 | 89F6 | F856 | 08E9 | 2B00 |
| 0000074700 | 89C0 | F846 | 4689 | 83F6 | 067E | 7732 | E903 | 007D |
| 0000074720 | 068E | 1114 | 8326 | 843E | 0071 | 0375 | 09E9 | 8300 |
| 0000074740 | E07E | 74FE | E903 | 000F | 068E | 1116 | 8326 | 9C3E |
| 0000074760 | 0071 | 0375 | 50E9 | C700 | E246 | FFFF | 76FF | FFE6 |
| 0000075000 | E476 | 468D | 16E2 | FF50 | F476 | 76FF | FFFC | FA76 |
| 0000075020 | 4E8D | 16E8 | 8D51 | F64E | 5116 | 4E8D | 16DC | 1E51 |
| 0000075040 | 3268 | 6806 | 0643 | 36FF | 01E2 | 36FF | 01E0 | 36FF |
| 0000075060 | 01E6 | 36FF | 01E4 | F39A | 0071 | 8300 | 28C4 | 468B |
| 0000075100 | E9E2 | 00A3 | 06E9 | B800 | FFFF | 9AE9 | 8E00 | 1406 |
| 0000075120 | 2611 | 3E83 | 6FCA | 7500 | E903 | 0009 | 7E83 | FEE0 |
| 0000075140 | 0374 | 0FE9 | 8E00 | 1606 | 2611 | 3E83 | 6FE2 | 7500 |
| 0000075160 | E903 | 005F | 068E | 1112 | 5E6B | 1E06 | 8326 | ACBF |
| 0000075200 | 0100 | C01B | 8940 | E246 | 76FF | FFE6 | E476 | 468D |
| 0000075220 | 16E2 | FF50 | F476 | 76FF | FFFC | FA76 | 4E8D | 16E8 |
| 0000075240 | 8D51 | F64E | 5116 | 4E8D | 16DC | 1E51 | 3268 | 6806 |
| 0000075260 | 0645 | 36FF | 01E2 | 36FF | 01E0 | 36FF | 01E6 | 36FF |
| 0000075300 | 01E4 | 2A9A | 0070 | 8300 | 28C4 | 468B | E9E2 | 0017 |
| 0000075320 | 14E9 | 8E00 | 1206 | 6B11 | 065E | 261E | BF83 | 00AC |
| 0000075340 | 1B01 | 40C0 | 00E9 | 1F00 | 5F5E | ED83 | 8B02 | 1FE5 |
| 0000075360 | 4D5D | 02CA | 1E00 | 9058 | 5545 | EC8B | 8E1E | 81D8 |
| 0000075400 | 24EC | 5700 | C756 | FA46 | 0641 | 5E8C | C7FC | F446 |
| 0000075420 | 0101 | C02B | 4689 | 89E6 | E446 | 068E | 1114 | 8326 |
| 0000075440 | DE3E | 0072 | 0375 | 1DE9 | FF00 | E636 | FF01 | E436 |
| 0000075460 | 8D01 | DC46 | 5016 | 969A | 0070 | 8300 | 08C4 | 003D |
| 0000075500 | 7400 | E903 | 000F | 068E | 1116 | 8326 | F63E | 0072 |
| 0000075520 | 0375 | 3BE9 | 1500 | 4568 | 8D06 | E846 | 5016 | 468D |
| 0000075540 | 16DC | 8D50 | F646 | 5016 | 5168 | 1E06 | 4A68 | FF06 |
| 0000075560 | E236 | FF01 | E036 | FF01 | E636 | FF01 | E436 | 9A01 |
| 0000075600 | 70DF | 0000 | C483 | 891E | F646 | 5689 | E9F8 | 0008 |
| 0000075620 | C02B | 4689 | 89F8 | F646 | 068E | 1112 | 5E6B | 1E06 |
| 0000075640 | C726 | AC87 | 0000 | 8E00 | 1406 | 2611 | 3E83 | 7080 |
| 0000075660 | 7500 | E903 | 0009 | 7E83 | FEE0 | 0374 | 0FE9 | 8E00 |
| 0000075700 | 1606 | 2611 | 3E83 | 70AC | 7500 | E903 | 0050 | 46C7 |
| 0000075720 | 00E2 | FF00 | E676 | 76FF | 8DE4 | E246 | 5016 | 76FF |
| 0000075740 | FFF4 | FC76 | 76FF | 8DFA | E84E | 5116 | 4E8D | 16F6 |
| 0000075760 | 8D51 | DC4E | 5116 | 681E | 064A | 5468 | FF06 | E236 |
| 0000076000 | FF01 | E036 | FF01 | E636 | FF01 | E436 | 9A01 | 7167 |
| 0000076020 | 0000 | C483 | 8B28 | E246 | 09E9 | E900 | 0006 | 00B8 |
| 0000076040 | E900 | 0000 | 5F5E | ED83 | 8B02 | 1FE5 | 4D5D | 1ECB |
| 0000076060 | 9058 | 5545 | EC8B | 8E1E | 81D8 | 04EC | 5700 | 1E56 |
| 0000076100 | 60B8 | 8E70 | C4D8 | 065E | 8B26 | 4007 | 4689 | E9FC |
| 0000076120 | 0003 | 46FF | 83FC | FC7E | 7232 | E903 | 0038 | 068E |
| 0000076140 | 1112 | 5E6B | 1EFC | 8B26 | 9E87 | 2600 | 870B | 009C |
| 0000076160 | 0375 | 1EE9 | 6B00 | FC5E | 261E | BF83 | 00AC | 7500 |
| 0000076200 | E903 | 000F | 468B | C4FC | 065E | 8926 | B807 | 0000 |
| 0000076220 | 09E9 | E900 | FFBC | 0FB8 | E900 | 0000 | 5E1F | 835F |
| 0000076240 | 02ED | E58B | 5D1F | CA4D | 0004 | 581E | 4590 | 8B55 |
| 0000076260 | 1EEC | D88E | EC81 | 0024 | 5657 | B81E | 7371 | D88E |
| 0000076300 | 46C7 | 56FA | 8C06 | FC5E | 46C7 | 01F4 | 2B01 | 89C0 |
| 0000076320 | E646 | 4689 | 8EE4 | 1406 | 2611 | 3E83 | 748A | 7500 |
| 0000076340 | E903 | 001D | 36FF | 01E6 | 36FF | 01E4 | 468D | 16DC |
| 0000076360 | 9A50 | 7267 | 0000 | C483 | 3D08 | 0000 | 0374 | 0FE9 |
| 0000076400 | 8E00 | 1606 | 2611 | 3E83 | 759B | 7500 | E903 | 003B |
| 0000076420 | 681E | 065A | 468D | 16E8 | 8D50 | DC46 | 5016 | 468D |
| 0000076440 | 16F6 | 6850 | 0685 | 681E | 066A | 36FF | 01E2 | 36FF |
| 0000076460 | 01E0 | 36FF | 01E6 | 36FF | 01E4 | B09A | 0072 | 8300 |
| 0000076500 | 1EC4 | 4689 | 89F6 | F856 | 08E9 | 2B00 | 89C0 | F846 |
| 0000076520 | 4689 | 8EF6 | 1406 | 2611 | 3E83 | 74DA | 7500 | E903 |

THU MAR 14 17:42:50 1991 MEDIT.DLL PAGE 35, LINE 2007

| | | | | | | | | | |
|---|---|---|---|---|---|---|---|---|---|
| 0000076540 | 0041 | 7E83 | FEE0 | 0375 | 38E9 | FF00 | 0C76 | 681E |
| 0000076560 | 065E | 468D | 16E8 | 8D50 | F646 | 5016 | 468D | 16DC |
| 0000076600 | 1E50 | 6A68 | 6806 | 0686 | 36FF | 01E2 | 36FF | 01E0 |
| 0000076620 | 36FF | 01E6 | 36FF | 01E4 | 0168 | 9A01 | 751C | 0000 |
| 0000076640 | C483 | 8E22 | 1406 | 2611 | 3E83 | 7583 | 7500 | E903 |
| 0000076660 | 0041 | 7E83 | FEE0 | 0375 | 38E9 | FF00 | 0A76 | 681E |
| 0000076700 | 0662 | 468D | 16E8 | 8D50 | F646 | 5016 | 468D | 16DC |
| 0000076720 | 1E50 | 6A68 | 6806 | 0686 | 36FF | 01E2 | 36FF | 01E0 |
| 0000076740 | 36FF | 01E6 | 36FF | 01E4 | 0168 | 9A01 | 7674 | 0000 |
| 0000076760 | C483 | C422 | 065E | C626 | 0007 | 468B | 390C | E806 |
| 0000077000 | 7401 | E903 | 0011 | 76FF | 680C | 6750 | 1868 | 9A00 |
| 0000077020 | 2004 | 756F | C483 | 8E06 | 1006 | 2611 | 1E6B | 087E |
| 0000077040 | 8E1E | 1206 | 2611 | 9FC4 | 00AE | 768B | 8B0C | D1C6 |
| 0000077060 | 03E6 | D1F0 | 26E6 | 70FF | 2602 | 30FF | 589A | 87F5 |
| 0000077100 | 836F | 04C4 | 463B | 720A | E903 | 007D | 068E | 1114 |
| 0000077120 | 8326 | 2D3E | 0076 | 0375 | 09E9 | 8300 | E07E | 74FE |
| 0000077140 | E903 | 000F | 068E | 1116 | 8326 | 9A3E | 0076 | 0375 |
| 0000077160 | 50E9 | C700 | E246 | FFFF | 76FF | FFE6 | E476 | 468D |
| 0000077200 | 16E2 | FF50 | F476 | 76FF | FFFC | FA76 | 4E8D | 16E8 |
| 0000077220 | 8D51 | F64E | 5116 | 4E8D | 16DC | 1E51 | 6A68 | 6806 |
| 0000077240 | 068B | 36FF | 01E2 | 36FF | 01E0 | 36FF | 01E6 | 36FF |
| 0000077260 | 01E4 | E29A | 0076 | 8300 | 28C4 | 468B | E9E2 | 0108 |
| 0000077300 | 06E9 | B800 | FFFF | FFE9 | 8E00 | 1006 | 2611 | 1E6B |
| 0000077320 | 087E | 8E1E | 1206 | 2611 | 9FC4 | 00AE | 768B | 8B0C |
| 0000077340 | D1C6 | 03E6 | D1F0 | 26E6 | 18C4 | 768B | 260A | 008A |
| 0000077360 | 5EC4 | 2606 | 0788 | 068E | 1114 | 8326 | 823E | 0076 |
| 0000077400 | 0375 | 46[illegible]9 | 8300 | E07E | 75FE | E903 | 003D | 5EC4 |
| 0000077420 | 2606 | 078A | 5098 | 681E | 0666 | 468D | 16E8 | 8D50 |
| 0000077440 | F646 | 5016 | 468D | 16DC | 1E50 | 6A68 | 6806 | 068D |
| 0000077460 | 36FF | 01E2 | 36FF | 01E0 | 36FF | 01E6 | 36FF | 01E4 |
| 0000077500 | 0268 | 9A01 | 688D | 0000 | C483 | 8E22 | 1406 | 2611 |
| 0000077520 | 3E83 | 7251 | 7500 | E903 | 0009 | 7E83 | FEE0 | 0374 |
| 0000077540 | 0FE9 | 8E00 | 1606 | 2611 | 3E83 | 727D | 7500 | E903 |
| 0000077560 | 0050 | 46C7 | 00E2 | FF00 | E676 | 76FF | 8DE4 | E246 |
| 0000077600 | 5016 | 76FF | FFF4 | FC76 | 76FF | 8DFA | E84E | 5116 |
| 0000077620 | 4E8D | 16F6 | 8D51 | DC4E | 5116 | 681E | 066A | 8E68 |
| 0000077640 | FF06 | E236 | FF01 | E036 | FF01 | E636 | FF01 | E436 |
| 0000077660 | 9A01 | 733E | 0000 | C483 | 8B28 | E246 | 09E9 | E900 |
| 0000077700 | 0006 | 00B8 | E900 | 0000 | 5E1F | 835F | 02ED | E58B |
| 0000077720 | 5D1F | CA4D | 0008 | 581E | 4590 | 8B55 | 1EEC | D88E |
| 0000077740 | EC81 | 002A | 5657 | B81E | 73EC | D88E | 46C7 | 73FA |
| 0000077760 | 8C06 | FC5E | 46C7 | 01F4 | 2B01 | 89C0 | E646 | 4689 |
| 0000100000 | 8EE4 | 1406 | 2611 | 3E83 | 77B6 | 7500 | E903 | 001D |
| 0000100020 | 36FF | 01E6 | 36FF | 01E4 | 468D | 16DC | 9A50 | 7422 |
| 0000100040 | 0000 | C483 | 3D08 | 0000 | 0374 | 0FE9 | 8E00 | 1606 |
| 0000100060 | 2611 | 3E83 | 78CC | 7500 | E903 | 003B | 681E | 0677 |
| 0000100100 | 468D | 16E8 | 8D50 | DC46 | 5016 | 468D | 16F6 | 6850 |
| 0000100120 | 06A4 | 681E | 0688 | 36FF | 01E2 | 36FF | 01E0 | 36FF |
| 0000100140 | 01E6 | 36FF | 01E4 | 6B9A | 0074 | 8300 | 1EC4 | 4689 |
| 0000100160 | 89F6 | F856 | 08E9 | 2B00 | 89C0 | F846 | 4689 | 8EF6 |
| 0000100200 | 1406 | 2611 | 3E83 | 7806 | 7500 | E903 | 0041 | 7E83 |
| 0000100220 | FEE0 | 0375 | 38E9 | FF00 | 0C76 | 681E | 067B | 468D |
| 0000100240 | 16E8 | 8D50 | F646 | 5016 | 468D | 16DC | 1E50 | 8868 |
| 0000100260 | 6806 | 06A5 | 36FF | 01E2 | 36FF | 01E0 | 36FF | 01E6 |
| 0000100300 | 36FF | 01E4 | 0168 | 9A01 | 7848 | 0000 | C483 | 8E22 |
| 0000100320 | 1406 | 2611 | 3E83 | 7856 | 7500 | E903 | 0041 | 7E83 |
| 0000100340 | FEE0 | 0375 | 38E9 | FF00 | 0A76 | 681E | 067F | 468D |
| 0000100360 | 16E8 | 8D50 | F646 | 5016 | 468D | 16DC | 1E50 | 8868 |
| 0000100400 | 6806 | 06A5 | 36FF | 01E2 | 36FF | 01E0 | 36FF | 01E6 |

THU MAR 14 17:42:50 1991 MEDIT.DLL PAGE 36, LINE 2066

| | | | | | | | | |
|---|---|---|---|---|---|---|---|---|
| 0000100420 | 36FF | 01E4 | 0168 | 9A01 | 789B | 0000 | C483 | 8E22 |
| 0000100440 | 1406 | 2611 | 3E83 | 78B4 | 7500 | E903 | 0044 | 7E83 |
| 0000100460 | FEE0 | 0375 | 3BE9 | FF00 | 0876 | 76FF | 1E06 | 8368 |
| 0000100500 | 8D06 | E846 | 5016 | 468D | 16F6 | 8D50 | DC46 | 5016 |
| 0000100520 | 681E | 0688 | A568 | FF06 | E236 | FF01 | E036 | FF01 |
| 0000100540 | E636 | FF01 | E436 | 6801 | 0106 | CC9A | 0074 | 8300 |
| 0000100560 | 24C4 | 468B | 0B08 | 0646 | 0374 | 7DE9 | 8E00 | 1406 |
| 0000100600 | 2611 | 3E83 | 7981 | 7500 | E903 | 0009 | 7E83 | FEE0 |
| 0000100620 | 0374 | 0FE9 | 8E00 | 1606 | 2611 | 3E83 | 7999 | 7500 |
| 0000100640 | E903 | 0050 | 46C7 | FFE2 | FFFF | E676 | 76FF | 8DE4 |
| 0000100660 | E246 | 5016 | 76FF | FFF4 | FC76 | 76FF | 8DFA | E84E |
| 0000100700 | 5116 | 4E8D | 16F6 | 8D51 | DC4E | 5116 | 681E | 0688 |
| 0000100720 | A768 | FF06 | E236 | FF01 | E036 | FF01 | E636 | FF01 |
| 0000100740 | E436 | 9A01 | 79E1 | 0000 | C483 | 8B28 | E246 | D6E9 |
| 0000100760 | E900 | 0006 | FFB8 | E9FF | 00CD | 5EC4 | 2606 | 3F80 |
| 0000101000 | 7500 | E903 | 0044 | 5EC4 | 2606 | 3F80 | 740A | E903 |
| 0000101020 | 000E | 46FF | C70C | 0A46 | 0000 | 46FF | E906 | 0027 |
| 0000101040 | 468B | FF0A | 0A46 | FF50 | 0C76 | 5EC4 | FF06 | 0646 |
| 0000101060 | 8A26 | 5007 | 949A | 425E | 8375 | 06C4 | 003D | 7500 |
| 0000101100 | E903 | 0003 | 03E9 | E900 | FFB0 | 068E | 1114 | 8326 |
| 0000101120 | 0C3E | 0074 | 0375 | 09E9 | 8300 | E07E | 74FE | E903 |
| 0000101140 | 000F | 068E | 1116 | 8326 | 383E | 0074 | 0375 | 50E9 |
| 0000101160 | C700 | E246 | 0000 | 76FF | FFE6 | E476 | 468D | 16E2 |
| 0000101200 | FF50 | F476 | 76FF | FFFC | FA76 | 4E8D | 16E8 | 8D51 |
| 0000101220 | F64E | 5116 | 4E8D | 16DC | 1E51 | 8868 | 6806 | 06B5 |
| 0000101240 | 36FF | 01E2 | 36FF | 01E0 | 36FF | 01E6 | 36FF | 01E4 |
| 0000101260 | E39A | 0075 | 8300 | 28C4 | 468B | E9E2 | 0009 | 06E9 |
| 0000101300 | B800 | 0000 | 00E9 | 1F00 | 5F5E | ED83 | 8B02 | 1FE5 |
| 0000101320 | 4D5D | 08CA | 1E00 | 9058 | 5545 | EC8B | 8E1E | 81D8 |
| 0000101340 | 2CEC | 5700 | 1E56 | 18B8 | 8E77 | C7D8 | FA46 | 0692 |
| 0000101360 | 5E8C | C7FC | F246 | 0101 | C02B | 4689 | 89E4 | E246 |
| 0000101400 | 068E | 1114 | 8326 | C63E | 007A | 0375 | 1DE9 | FF00 |
| 0000101420 | E636 | FF01 | E436 | 8D01 | DA46 | 5016 | 4E9A | 0077 |
| 0000101440 | 8300 | 08C4 | 003D | 7400 | E903 | 000F | 068E | 1116 |
| 0000101460 | 8326 | DE3E | 007A | 0375 | 3BE9 | 1E00 | 9668 | 8D06 |
| 0000101500 | E646 | 5016 | 468D | 16DA | 8D50 | F646 | 5016 | CB68 |
| 0000101520 | 1E06 | 9A68 | FF06 | E236 | FF01 | E036 | FF01 | E636 |
| 0000101540 | FF01 | E436 | 9A01 | 7797 | 0000 | C483 | 891E | F646 |
| 0000101560 | 5689 | E9F8 | 0008 | C02B | 4689 | 89F8 | F646 | 72A1 |
| 0000101600 | 8913 | F446 | 468B | 0B08 | 0646 | 0374 | 7DE9 | 8E00 |
| 0000101620 | 1406 | 2611 | 3E83 | 7C1E | 7500 | E903 | 0009 | 7E83 |
| 0000101640 | FEDE | 0374 | 0FE9 | 8E00 | 1606 | 2611 | 3E83 | 7C36 |
| 0000101660 | 7500 | E903 | 0050 | 46C7 | FFE0 | FFFF | E476 | 76FF |
| 0000101700 | 8DE2 | E046 | 5016 | 76FF | FFF2 | FC76 | 76FF | 8DFA |
| 0000101720 | E64E | 5116 | 4E8D | 16F6 | 8D51 | DA4E | 5116 | 681E |
| 0000101740 | 069A | CF68 | FF06 | E236 | FF01 | E036 | FF01 | E636 |
| 0000101760 | FF01 | E436 | 9A01 | 7C7E | 0000 | C483 | 8B28 | E046 |
| 0000102000 | 61E9 | E901 | 0006 | FFB8 | E9FF | 0158 | 76FF | 9A0C |
| 0000102020 | 57D9 | 7B96 | C483 | C702 | 7206 | 0013 | C400 | 065E |
| 0000102040 | 8026 | 003F | 0375 | 91E9 | C400 | 065E | 8026 | 0A3F |
| 0000102060 | 0374 | 5EE9 | 8300 | F47E | 7500 | E903 | 002D | 06C7 |
| 0000102100 | 1372 | 0001 | 006A | E8A1 | 8E01 | 1006 | 2611 | 1E6B |
| 0000102120 | 087E | 8E1E | 1206 | 2611 | 872B | 00A4 | 6850 | 7BA2 |
| 0000102140 | 1868 | 9A00 | A32D | 7BAA | C483 | FF08 | 0A76 | 76FF |
| 0000102160 | 680C | 7C0A | 1868 | 9A00 | 615C | 7BDA | C483 | C708 |
| 0000102200 | 7206 | 0013 | FF00 | 0C46 | 46C7 | 000A | FF00 | 0646 |
| 0000102220 | 24E9 | C400 | 065E | 46FF | 2606 | 078A | FF50 | 0C76 |
| 0000102240 | 468B | FF0A | 0A46 | 9A50 | 5930 | 7C12 | 003D | 7500 |
| 0000102260 | E903 | 0003 | 03E9 | E900 | FF63 | 468B | A3F4 | 1372 |

THU MAR 14 17:42:50 1991 MEDIT.DLL PAGE 37, LINE 2125

| | | | | | | | | |
|---|---|---|---|---|---|---|---|---|
| 0000102300 | 006A | E8A1 | 8E01 | 1006 | 2611 | 1E6B | 087E | 8E1E |
| 0000102320 | 1206 | 2611 | 872B | 00A4 | 6850 | 753A | 1868 | 9A00 |
| 0000102340 | A32D | 7967 | C483 | 8E08 | 1406 | 2611 | 3E83 | 7738 |
| 0000102360 | 7500 | E903 | 0009 | 7E83 | FEDE | 0374 | 0FE9 | 8E00 |
| 0000102400 | 1606 | 2611 | 3E83 | 7764 | 7500 | E903 | 0050 | 46C7 |
| 0000102420 | 00E0 | FF00 | E476 | 76FF | 8DE2 | E046 | 5016 | 76FF |
| 0000102440 | FFF2 | FC76 | 76FF | 8DFA | E64E | 5116 | 4E8D | 16F6 |
| 0000102460 | 8D51 | DA4E | 5116 | 681E | 069A | EA68 | FF06 | E236 |
| 0000102500 | FF01 | E036 | FF01 | E636 | FF01 | E436 | 9A01 | 7914 |
| 0000102520 | 0000 | C483 | 8B28 | E046 | 09E9 | E900 | 0006 | 00B8 |
| 0000102540 | E900 | 0000 | 5E1F | 835F | 02ED | E58B | 5D1F | CA4D |
| 0000102560 | 0008 | 581E | 4590 | 8B55 | 1EEC | D88E | EC81 | 0024 |
| 0000102600 | 5657 | B81E | 7A17 | D88E | 46C7 | A5FA | 8C06 | FC5E |
| 0000102620 | 46C7 | 01F4 | 2B01 | 89C0 | E646 | 4689 | 8EE4 | 1406 |
| 0000102640 | 2611 | 3E83 | 7D6A | 7500 | E903 | 001D | 36FF | 01E6 |
| 0000102660 | 36FF | 01E4 | 468D | 16DC | 9A50 | 7A4D | 0000 | C483 |
| 0000102700 | 3D08 | 0000 | 0374 | 0FE9 | 8E00 | 1606 | 2611 | 3E83 |
| 0000102720 | 7D82 | 7500 | E903 | 003B | 681E | 06A9 | 468D | 16E8 |
| 0000102740 | 8D50 | DC46 | 5016 | 468D | 16F6 | 6850 | 0700 | 681E |
| 0000102760 | 06AE | 36FF | 01E2 | 36FF | 01ED | 36FF | 01E6 | 36FF |
| 0000103000 | 01E4 | 969A | 007A | 8300 | 1EC4 | 4689 | 89F6 | F856 |
| 0000103020 | 08E9 | 2B00 | 89C0 | F846 | 4689 | C4F6 | 0A5E | 8326 |
| 0000103040 | 003F | 0374 | 89E9 | C400 | 0E5E | 8326 | 003F | 0374 |
| 0000103060 | 7DE9 | 8E00 | 1406 | 2611 | 3E83 | 7E67 | 7500 | E903 |
| 0000103100 | 0009 | 7E83 | FEE0 | 0374 | 0FE9 | 8E00 | 1606 | 2611 |
| 0000103120 | 3E83 | 7E7F | 7500 | E903 | 0050 | 46C7 | FFE2 | FFFF |
| 0000103140 | E676 | 76FF | 8DE4 | E246 | 5016 | 76FF | FFF4 | FC76 |
| 0000103160 | 76FF | 8DFA | E84E | 5116 | 4E8D | 16F6 | 8D51 | DC4E |
| 0000103200 | 5116 | 681E | 06AE | 0368 | FF07 | E236 | FF01 | E036 |
| 0000103220 | FF01 | E636 | FF01 | E436 | 9A01 | 7EC7 | 0000 | C483 |
| 0000103240 | 8B28 | E246 | 06E9 | E901 | 0006 | FFB8 | E9FF | 00FD |
| 0000103260 | 5EC4 | 260A | 3F83 | 7400 | E903 | 003D | 6E83 | 020E |
| 0000103300 | 5EC4 | 260E | 378B | C68B | E6D1 | F003 | E6D1 | 068E |
| 0000103320 | 1110 | 6B26 | 7E1E | 1E08 | 068E | 1112 | C426 | AE9F |
| 0000103340 | 2600 | 70FF | 2602 | 30FF | 589A | 42F5 | 837B | 04C4 |
| 0000103360 | 5EC4 | 260A | 0789 | 04E9 | 8300 | 0A6E | C402 | 0A5E |
| 0000103400 | 8B26 | C437 | 0E5E | 8B26 | 8B3F | D1C7 | 03E7 | D1F8 |
| 0000103420 | 8EE7 | 1006 | 2611 | 1E6B | 087E | 8E1E | 1206 | 2611 |
| 0000103440 | 9FC4 | 00AE | C426 | 2619 | 008A | 5EC4 | 2606 | 0788 |
| 0000103460 | 068E | 1114 | 8326 | 373E | 007A | 0375 | 09E9 | 8300 |
| 0000103500 | E07E | 74FE | E903 | 000F | 068E | 1116 | 8326 | 633E |
| 0000103520 | 007A | 0375 | 50E9 | C700 | E246 | 0000 | 76FF | FFE6 |
| 0000103540 | E476 | 468D | 16E2 | FF50 | F476 | 76FF | FFFC | FA76 |
| 0000103560 | 4E8D | 16E8 | 8D51 | F64E | 5116 | 4E8D | 16DC | 1E51 |
| 0000103600 | AE68 | 6806 | 070D | 36FF | 01E2 | 36FF | 01E0 | 36FF |
| 0000103620 | 01E6 | 36FF | 01E4 | 269A | 007B | 8300 | 28C4 | 468B |
| 0000103640 | E9E2 | 0009 | 06E9 | B800 | 0000 | 00E9 | 1F00 | 5F5E |
| 0000103660 | CD83 | 8B02 | 1FE5 | 4D5D | 0CCA | 1E00 | 9058 | 5545 |
| 0000103700 | EC8B | 8E1E | 81D8 | 28EC | 5700 | 1E56 | B4B8 | 8E7C |
| 0000103720 | C7D8 | FA46 | 06B9 | 5E8C | C7FC | F046 | 0101 | C02B |
| 0000103740 | 4689 | 89E2 | E046 | 068E | 1114 | 8326 | 9B3E | 007F |
| 0000103760 | 0375 | 1DE9 | FF00 | E636 | FF01 | E436 | 8D01 | D846 |
| 0000104000 | 5016 | EA9A | 007C | 8300 | 08C4 | 003D | 7400 | E903 |
| 0000104020 | 000F | 068E | 1116 | 8326 | 003E | 007D | 0375 | 3BE9 |
| 0000104040 | 1E00 | BD68 | 8D06 | E446 | 5016 | 468D | 16D8 | 8D50 |
| 0000104060 | F646 | 5016 | 2468 | 1E07 | D468 | FF06 | E236 | FF01 |
| 0000104100 | E036 | FF01 | E636 | FF01 | E436 | 9A01 | 7D33 | 0000 |
| 0000104120 | C483 | 891E | F646 | 5689 | E9F8 | 0008 | C02B | 4689 |
| 0000104140 | 89F8 | F646 | 068E | 1114 | 8326 | EB3E | 007F | 0375 |

THU MAR 14 17:42:50 1991 MEDIT.DLL PAGE 38, LINE 2184

| | | | | | | | | |
|---|---|---|---|---|---|---|---|---|
| 0000104160 | 41E9 | 8300 | DC7E | 75FE | E903 | 0038 | 76FF | 1E0A |
| 0000104200 | C168 | 8D06 | E446 | 5016 | 468D | 16F6 | 8D50 | D846 |
| 0000104220 | 5016 | 681E | 06D4 | 2768 | FF07 | E236 | FF01 | E036 |
| 0000104240 | FF01 | E636 | FF01 | E436 | 6801 | 0101 | 2D9A | 0080 |
| 0000104260 | 8300 | 22C4 | 068E | 1114 | 8326 | 3B3E | 0080 | 0375 |
| 0000104300 | 41E9 | 8300 | DC7E | 75FE | E903 | 0038 | 76FF | 1E08 |
| 0000104320 | C668 | 8D06 | E446 | 5016 | 468D | 16F6 | 8D50 | D846 |
| 0000104340 | 5016 | 681E | 06D4 | 2768 | FF07 | E236 | FF01 | E036 |
| 0000104360 | FF01 | E636 | FF01 | E436 | 6801 | 01C1 | 7D9A | 0080 |
| 0000104400 | 8300 | 22C4 | 068E | 1114 | 8326 | D43E | 007C | 0375 |
| 0000104420 | 41E9 | 8300 | DC7E | 75FE | E903 | 0038 | 76FF | 1E06 |
| 0000104440 | CD68 | 8D06 | E446 | 5016 | 468D | 16F6 | 8D50 | D846 |
| 0000104460 | 5016 | 681E | 06D4 | 2768 | FF07 | E236 | FF01 | E036 |
| 0000104500 | FF01 | E636 | FF01 | E436 | 6801 | 0101 | F89A | 0077 |
| 0000104520 | 8300 | 22C4 | E8A1 | 3901 | 0A46 | 0375 | 1DE9 | FF00 |
| 0000104540 | E836 | 6801 | 80AD | 1868 | 9A00 | 2004 | 80A7 | C483 |
| 0000104560 | FF06 | 0A76 | D99A | B557 | 8380 | 02C4 | 8E68 | 687B |
| 0000104600 | 0018 | 589A | CBF5 | 8380 | 04C4 | 4689 | 8BF4 | F446 |
| 0000104620 | 4639 | 7D08 | E903 | 0008 | 4F9A | 1B64 | E97E | 008C |
| 0000104640 | 46C7 | 00F2 | E900 | 0003 | 46FF | 8BF2 | F446 | 462B |
| 0000104660 | 2B06 | 0846 | 463B | 7FF2 | E903 | 0020 | 068E | 1122 |
| 0000104700 | 5E8B | 0308 | F25E | 5E03 | 2606 | 878A | 0018 | 5E8B |
| 0000104720 | 0308 | F25E | 8826 | 1887 | E900 | FFCC | 468B | 2BF4 |
| 0000104740 | 0646 | 4689 | E9F2 | 0003 | 46FF | 8BF2 | F246 | 4639 |
| 0000104760 | 7FF4 | E903 | 0010 | 068E | 1122 | 5E8B | 26F2 | 87C6 |
| 0000105000 | 0018 | E920 | FFE2 | 068E | 1122 | 5E8B | 2BF4 | 065E |
| 0000105020 | C626 | 1887 | 0000 | 06C7 | 026C | 0001 | 36FF | 01E8 |
| 0000105040 | 6806 | 0018 | 049A | 9720 | 8381 | 06C4 | 068E | 1110 |
| 0000105060 | 6B26 | 7E1E | 1E08 | 068E | 1112 | C726 | AC87 | 0100 |
| 0000105100 | 8E00 | 1006 | 2611 | 1E6B | 087E | 8E1E | 1206 | 8B11 |
| 0000105120 | F446 | 3926 | A287 | 7400 | E903 | 0010 | 468B | 2BF4 |
| 0000105140 | 0646 | 5040 | 7F9A | C884 | 8381 | 02C4 | 3E83 | 1372 |
| 0000105160 | 7500 | E903 | 006D | 006A | E8A1 | 8E01 | 1006 | 2611 |
| 0000105200 | 1E6B | 087E | 8E1E | 1206 | 2611 | 872B | 00A4 | 6850 |
| 0000105220 | 81E5 | 1868 | 9A00 | A32D | 81ED | C483 | A108 | 01E8 |
| 0000105240 | 068E | 1110 | 6B26 | 7E1E | 1E08 | 068E | 1112 | 2B26 |
| 0000105260 | A487 | 5000 | 9468 | 6880 | 0018 | 589A | F6F5 | 8381 |
| 0000105300 | 04C4 | 9A50 | A616 | 820E | 068E | 1124 | 468B | 260A |
| 0000105320 | 0639 | 08DA | 0374 | 0AE9 | 6A00 | 9A01 | D416 | 809C |
| 0000105340 | C483 | 8E02 | 1406 | 2611 | 3E83 | 7F1D | 7500 | E903 |
| 0000105360 | 0009 | 7E83 | FEDC | 0374 | 0FE9 | 8E00 | 1606 | 2611 |
| 0000105400 | 3E83 | 7F49 | 7500 | E903 | 0050 | 46C7 | 00DE | FF00 |
| 0000105420 | E276 | 76FF | 8DE0 | DE46 | 5016 | 76FF | FFF0 | FC76 |
| 0000105440 | 76FF | 8DFA | E44E | 5116 | 4E8D | 16F6 | 8D51 | D84E |
| 0000105460 | 5116 | 681E | 06D4 | 5068 | FF07 | E236 | FF01 | E036 |
| 0000105500 | FF01 | E636 | FF01 | E436 | 9A01 | 7DCA | 0000 | C483 |
| 0000105520 | 8B28 | DE46 | 09E9 | E900 | 0006 | 00B8 | E900 | 0000 |
| 0000105540 | 5E1F | 835F | 02ED | E58B | 5D1F | CA4D | 0006 | 581E |
| 0000105560 | 4590 | 8B55 | 1EEC | D88E | EC81 | 0024 | 5657 | B81E |
| 0000105600 | 7EFD | D88E | 46C7 | DFFA | 8C06 | FC5E | 46C7 | 01F4 |
| 0000105620 | 2B01 | 89C0 | E646 | 4689 | 8EE4 | 1406 | 2611 | 3E83 |
| 0000105640 | 834E | 7500 | E903 | 001D | 36FF | 01E6 | 36FF | 01E4 |
| 0000105660 | 468D | 16DC | 9A50 | 7F33 | 0000 | C483 | 3D08 | 0000 |
| 0000105700 | 0374 | 0FE9 | 8E00 | 1606 | 2611 | 3E83 | 8413 | 7500 |
| 0000105720 | E903 | 003B | 681E | 06E3 | 468D | 16E8 | 8D50 | DC46 |
| 0000105740 | 5016 | 468D | 16F6 | 6850 | 0766 | 681E | 06F4 | 36FF |
| 0000105760 | 01E2 | 36FF | 01E0 | 36FF | 01E6 | 36FF | 01E4 | 7C9A |
| 0000106000 | 007F | 8300 | 1EC4 | 4689 | 89F6 | F856 | 08E9 | 2B00 |
| 0000106020 | 89C0 | F846 | 4689 | 8EF6 | 1406 | 2611 | 3E83 | 839E |

THU MAR 14 17:42:50 1991 MEDIT.DLL PAGE 39, LINE 2243

| | | | | | | | | |
|---|---|---|---|---|---|---|---|---|
| 0000106040 | 7500 | E903 | 0041 | 7E83 | FEE0 | 0375 | 38E9 | FF00 |
| 0000106060 | 0876 | 681E | 06E7 | 468D | 16E8 | 8D50 | F646 | 5016 |
| 0000106100 | 468D | 16DC | 1E50 | F468 | 6806 | 0767 | 36FF | 01E2 |
| 0000106120 | 36FF | 01E0 | 36FF | 01E6 | 36FF | 01E4 | 0168 | 9A01 |
| 0000106140 | 83E0 | 0000 | C483 | 8E22 | 1406 | 2611 | 3E83 | 83FB |
| 0000106160 | 7500 | E903 | 0041 | 7E83 | FEE0 | 0375 | 38E9 | FF00 |
| 0000106200 | 0676 | 681E | 06EC | 468D | 16E8 | 8D50 | F646 | 5016 |
| 0000106220 | 468D | 16DC | 1E50 | F468 | 6806 | 0767 | 36FF | 01E2 |
| 0000106240 | 36FF | 01E0 | 36FF | 01E6 | 36FF | 01E4 | 0168 | 9A01 |
| 0000106260 | 7FDD | 0000 | C483 | FF22 | 0876 | 76FF | 6A06 | 9A01 |
| 0000106300 | 7EEB | 8157 | 068E | 1114 | 8326 | 1A3E | 0082 | 0375 |
| 0000106320 | 09E9 | 8300 | E07E | 74FE | E903 | 000F | 068E | 1116 |
| 0000106340 | 8326 | 323E | 0082 | 0375 | 50E9 | C700 | E246 | 0000 |
| 0000106360 | 76FF | FFE6 | E476 | 468D | 16E2 | FF50 | F476 | 76FF |
| 0000106400 | FFFC | FA76 | 4E8D | 16E8 | 8D51 | F64E | 5116 | 4E8D |
| 0000106420 | 16DC | 1E51 | F468 | 6806 | 0769 | 36FF | 01E2 | 36FF |
| 0000106440 | 01E0 | 36FF | 01E6 | 36FF | 01E4 | 7A9A | 0082 | 8300 |
| 0000106460 | 28C4 | 468B | E9E2 | 0009 | 06E9 | B800 | 0000 | 00E9 |
| 0000106500 | 1F00 | 5F5E | ED83 | 8B02 | 1FE5 | 4D5D | 04CA | 1E00 |
| 0000106520 | 9058 | 5545 | EC8B | 8E1E | 81D8 | 06EC | 5700 | C756 |
| 0000106540 | FC46 | 0000 | 03E9 | FF00 | FC46 | 068E | 1110 | 6B26 |
| 0000106560 | 7E1E | 1E08 | 068E | 1112 | 468B | 26FC | 8739 | 00A0 |
| 0000106600 | 0373 | 42E9 | 8E00 | 1006 | 2611 | 1E6B | 087E | 8E1E |
| 0000106620 | 1206 | 2611 | 9FC4 | 00AE | 768B | 8BFC | D1C6 | 03E6 |
| 0000106640 | D1F0 | 26E6 | 70FF | 2602 | 30FF | 589A | F2F5 | 8383 |
| 0000106660 | 04C4 | 8940 | FA46 | 463B | 7F06 | E903 | 0006 | 468B |
| 0000106700 | 89FA | 0646 | A0E9 | 8BFF | 0646 | 068E | 1110 | 6B26 |
| 0000106720 | 7E1E | 1E08 | 068E | 1112 | 8926 | A287 | 5E00 | 835F |
| 0000106740 | 02ED | E58B | 5D1F | CB4D | 581E | 4590 | 8B55 | 1EEC |
| 0000106760 | D88E | EC81 | 0024 | 5657 | B81E | 82B0 | D88E | 46C7 |
| 0000107000 | 00FA | 8C07 | FC5E | 46C7 | 01F4 | 2B01 | 89C0 | E646 |
| 0000107020 | 4689 | 8EE4 | 1406 | 2611 | 3E83 | 85C8 | 7500 | E903 |
| 0000107040 | 001D | 36FF | 01E6 | 36FF | 01E4 | 468D | 16DC | 9A50 |
| 0000107060 | 82E6 | 0000 | C483 | 3D08 | 0000 | 0374 | 0FE9 | 8E00 |
| 0000107100 | 1606 | 2611 | 3E83 | 864B | 7500 | E903 | 003B | 681E |
| 0000107120 | 0704 | 468D | 16E8 | 8D50 | DC46 | 5016 | 468D | 16F6 |
| 0000107140 | 6850 | 0792 | 681E | 070E | 36FF | 01E2 | 36FF | 01E0 |
| 0000107160 | 36FF | 01E6 | 36FF | 01E4 | 2F9A | 0083 | 8300 | 1EC4 |
| 0000107200 | 4689 | 89F6 | F856 | 08E9 | 2B00 | 89C0 | F846 | 4689 |
| 0000107220 | 8EF6 | 1406 | 2611 | 3E83 | 8633 | 7500 | E903 | 0041 |
| 0000107240 | 7E83 | FEED | 0375 | 38E9 | FF00 | 0676 | 681E | 0708 |
| 0000107260 | 468D | 16E8 | 8D50 | F646 | 5016 | 468D | 16DC | 1E50 |
| 0000107300 | 0E68 | 6807 | 0793 | 36FF | 01E2 | 36FF | 01E0 | 36FF |
| 0000107320 | 01E6 | 36FF | 01E4 | 0168 | 9A01 | 8390 | 0000 | C483 |
| 0000107340 | 8E22 | 1006 | 2611 | 1E6B | 087E | 8E1E | 1206 | 8B11 |
| 0000107360 | 0646 | 3926 | A087 | 7200 | E903 | 0080 | 068E | 1114 |
| 0000107400 | 8326 | 053E | 0087 | 0375 | 09E9 | 8300 | E07E | 74FE |
| 0000107420 | E903 | 000F | 068E | 1116 | 8326 | 1D3E | 0087 | 0375 |
| 0000107440 | 50E9 | C700 | E246 | FFFF | 76FF | FFE6 | E476 | 468D |
| 0000107460 | 16E2 | FF50 | F476 | 76FF | FFFC | FA76 | 4E8D | 16E8 |
| 0000107500 | 8D51 | F64E | 5116 | 4E8D | 16DC | 1E51 | 0E68 | 6807 |
| 0000107520 | 0795 | 36FF | 01E2 | 36FF | 01E0 | 36FF | 01E6 | 36FF |
| 0000107540 | 01E4 | 659A | 0087 | 8300 | 28C4 | 468B | E9E2 | 01B0 |
| 0000107560 | 06E9 | B800 | FFFF | A7E9 | E901 | 01A4 | 468B | 3906 |
| 0000107600 | E806 | 7401 | E903 | 001C | 3E83 | 026C | 7500 | E903 |
| 0000107620 | 0012 | 36FF | 01E8 | C068 | 6881 | 0018 | 049A | CD20 |
| 0000107640 | 8387 | 06C4 | 068E | 1110 | 6B26 | 7E1E | 1E08 | 068E |
| 0000107660 | 1112 | C426 | AE9F | 8B00 | 0676 | C68B | E6D1 | F003 |
| 0000107700 | E6D1 | 8B26 | 0240 | 0B26 | 7400 | E903 | 0080 | U68E |

THU MAR 14 17:42:50 1991 MEDIT.DLL PAGE 40, LINE 2302

| | | | | | | | | |
|---|---|---|---|---|---|---|---|---|
| 0000107720 | 1114 | 8326 | 853E | 0087 | 0375 | 09E9 | 8300 | E07E |
| 0000107740 | 74FE | E903 | 000F | 068E | 1116 | 8326 | 9D3E | 0087 |
| 0000107760 | 0375 | 50E9 | C700 | E246 | 0000 | 76FF | FFE6 | E476 |
| 0000110000 | 468D | 16E2 | FF50 | F476 | 76FF | FFFC | FA76 | 4E8D |
| 0000110020 | 16E8 | 8D51 | F64E | 5116 | 4E8D | 16DC | 1E51 | 0E68 |
| 0000110040 | 6807 | 079B | 36FF | 01E2 | 36FF | 01E0 | 36FF | 01E6 |
| 0000110060 | 36FF | 01E4 | 109A | 0088 | 8300 | 28C4 | 468B | E9E2 |
| 0000110100 | 00DE | 06E9 | B800 | 0000 | D5E9 | E900 | 00D2 | 068E |
| 0000110120 | 1114 | 8326 | D03E | 0082 | 0375 | 09E9 | 8300 | E07E |
| 0000110140 | 74FE | E903 | 000F | 068E | 1116 | 8326 | FC3E | 0082 |
| 0000110160 | 0375 | 7BE9 | 8E00 | 1006 | 2611 | 1E6B | 087E | 8E1E |
| 0000110200 | 1206 | 2611 | 9FC4 | 00AE | 768B | 8B06 | D1C6 | 03E6 |
| 0000110220 | D1F0 | 26E6 | 70FF | 2602 | 30FF | 589A | 48F5 | 8388 |
| 0000110240 | 04C4 | 4689 | FFE2 | E676 | 76FF | 8DE4 | E246 | 5016 |
| 0000110260 | 76FF | FFF4 | FC76 | 76FF | 8DFA | E84E | 5116 | 4E8D |
| 0000110300 | 16F6 | 8D51 | DC4E | 5116 | 681E | 070E | 9D68 | FF07 |
| 0000110320 | E236 | FF01 | E036 | FF01 | E636 | FF01 | E436 | 9A01 |
| 0000110340 | 845B | 0000 | C483 | 8B28 | E246 | 33E9 | E900 | 0030 |
| 0000110360 | 068E | 1110 | 6B26 | 7E1E | 1E08 | 068E | 1112 | C426 |
| 0000110400 | AE9F | 8B00 | 0676 | C68B | E6D1 | F003 | E6D1 | FF26 |
| 0000110420 | 0270 | FF26 | 9A30 | F558 | 84DD | C483 | E904 | 0000 |
| 0000110440 | 5E1F | 835F | 02ED | E58B | 5D1F | CA4D | 0002 | 581E |
| 0000110460 | 4590 | 8B55 | 1EEC | D88E | EC81 | 0024 | 5657 | 46C7 |
| 0000110500 | 1DFA | 8C07 | FC5E | 46C7 | 08F4 | 2B01 | 89C0 | E646 |
| 0000110520 | 4689 | 8EE4 | 1406 | 2611 | 3E83 | 8917 | 7500 | E903 |
| 0000110540 | 001D | 36FF | 01E6 | 36FF | 01E4 | 468D | 16DC | 9A50 |
| 0000110560 | 8560 | 0000 | C483 | 3D08 | 0000 | 0374 | 0FE9 | 8E00 |
| 0000110600 | 1606 | 2611 | 3E83 | 892F | 7500 | E903 | 003B | 681E |
| 0000110620 | 0723 | 468D | 16E8 | 8D50 | DC46 | 5016 | 468D | 16F6 |
| 0000110640 | 6850 | 07B4 | 681E | 072A | 36FF | 01E2 | 36FF | 01E0 |
| 0000110660 | 36FF | 01E6 | 36FF | 01E4 | A99A | 0085 | 8300 | 1EC4 |
| 0000110700 | 4689 | 89F6 | F856 | 08E9 | 2B00 | 89C0 | F846 | 4689 |
| 0000110720 | 83F6 | 067E | 7210 | E903 | 0086 | 468B | A306 | 01EA |
| 0000110740 | 068E | 1114 | 8326 | 973E | 0089 | 0375 | 09E9 | 8300 |
| 0000110760 | E07E | 74FE | E903 | 000F | 068E | 1116 | 8326 | AF3E |
| 0000111000 | 0089 | 0375 | 50E9 | C700 | E246 | 0000 | 76FF | FFE6 |
| 0000111020 | E476 | 468D | 16E2 | FF50 | F476 | 76FF | FFFC | FA76 |
| 0000111040 | 4E8D | 16E8 | 8D51 | F64E | 5116 | 4E8D | 16DC | 1E51 |
| 0000111060 | 2A68 | 6807 | 07B7 | 36FF | 01E2 | 36FF | 01E0 | 36FF |
| 0000111100 | 01E6 | 36FF | 01E4 | F79A | 0089 | 8300 | 28C4 | 468B |
| 0000111120 | E9E2 | 0089 | 06E9 | B800 | 0000 | 80E9 | E900 | 007D |
| 0000111140 | 068E | 1114 | 8326 | 4A3E | 0085 | 0375 | 09E9 | 8300 |
| 0000111160 | E07E | 74FE | E903 | 000F | 068E | 1116 | 8326 | 763E |
| 0000111200 | 0085 | 0375 | 50E9 | C700 | E246 | FFFF | 76FF | FFE6 |
| 0000111220 | E476 | 468D | 16E2 | FF50 | F476 | 76FF | FFFC | FA76 |
| 0000111240 | 4E8D | 16E8 | 8D51 | F64E | 5116 | 4E8D | 16DC | 1E51 |
| 0000111260 | 2A68 | 6807 | 07BA | 36FF | 01E2 | 36FF | 01E0 | 36FF |
| 0000111300 | 01E6 | 36FF | 01E4 | 939A | 0086 | 8300 | 28C4 | 468B |
| 0000111320 | E9E2 | 0009 | 06E9 | B800 | FFFF | 00E9 | 5E00 | 835F |
| 0000111340 | 02ED | E58B | 5D1F | CB4D | 581E | 4590 | 8B55 | 1EEC |
| 0000111360 | D88E | EC81 | 0024 | 5657 | 46C7 | 37FA | 8C07 | FC5E |
| 0000111400 | 46C7 | 09F4 | 2B01 | 89C0 | E646 | 4689 | 8EE4 | 1406 |
| 0000111420 | 2611 | 3E83 | 8AC2 | 7500 | E903 | 001D | 36FF | 01E6 |
| 0000111440 | 36FF | 01E4 | 468D | 16DC | 9A50 | 88A0 | 0000 | C483 |
| 0000111460 | 3D08 | 0000 | 0374 | 0FE9 | 8E00 | 1606 | 2611 | 3E83 |
| 0000111500 | 8ADA | 7500 | E903 | 003B | 681E | 073E | 468D | 16E8 |
| 0000111520 | 8D50 | DC46 | 5016 | 468D | 16F6 | 6850 | 07CE | 681E |
| 0000111540 | 0746 | 36FF | 01E2 | 36FF | 01E0 | 36FF | 01E6 | 36FF |
| 0000111560 | 01E4 | E99A | 0088 | 8300 | 1EC4 | 4689 | 89F6 | F856 |

THU MAR 14 17:42:50 1991 MEDIT.DLL PAGE 41, LINE 2361

| | | | | | | | | |
|---|---|---|---|---|---|---|---|---|
| 0000111600 | 08E9 | 2B00 | 89C0 | F846 | 4689 | 8EF6 | 1406 | 2611 |
| 0000111620 | 3E83 | 888A | 7500 | E903 | 0009 | 7E83 | FEE0 | 0374 |
| 0000111640 | 0FE9 | 8E00 | 1606 | 2611 | 3E83 | 88B6 | 7500 | E903 |
| 0000111660 | 0051 | EAA1 | 8901 | E246 | 76FF | FFE6 | E476 | 468D |
| 0000111700 | 16E2 | FF50 | F476 | 76FF | FFFC | FA76 | 4E8D | 16E8 |
| 0000111720 | 8D51 | F64E | 5116 | 4E8D | 16DC | 1E51 | 4668 | 6807 |
| 0000111740 | 07CF | 36FF | 01E2 | 36FF | 01E0 | 36FF | 01E6 | 36FF |
| 0000111760 | 01E4 | 779A | 0089 | 8300 | 28C4 | 468B | E9E2 | 0009 |
| 0000112000 | 06E9 | A100 | 01EA | 00E9 | 5E00 | 835F | 02ED | E58B |
| 0000112020 | 5D1F | CB4D | 581E | 4590 | 8B55 | 1EEC | D88E | EC81 |
| 0000112040 | 0000 | 5657 | B81E | 852A | D88E | 068E | 1110 | A126 |
| 0000112060 | 087E | 00E9 | 1F00 | 5F5E | ED83 | 8B02 | 1FE5 | 4D5D |
| 0000112100 | 1ECB | 9058 | 5545 | EC8B | 8E1E | 81D8 | 00EC | 5700 |
| 0000112120 | 1E56 | 56B8 | 8E8B | 8ED8 | 1006 | 2611 | 1E6B | 087E |
| 0000112140 | 8E1E | 1206 | 2611 | 878B | 009C | 8B26 | 9E97 | E900 |
| 0000112160 | 0000 | 5E1F | 835F | 02ED | E58B | 5D1F | CB4D | 581E |
| 0000112200 | 4590 | 8B55 | 1EEC | D88E | EC81 | 0000 | 5657 | 681E |
| 0000112220 | 0753 | BD9A | 0015 | B800 | FFFF | 00E9 | 5E00 | 835F |
| 0000112240 | 02ED | E58B | 5D1F | CB4D | 581E | 4590 | 8B55 | 1EEC |
| 0000112260 | D88E | EC81 | 0J24 | 5657 | B81E | 8B83 | D88E | 46C7 |
| 0000112300 | BCFA | 8C07 | FC5E | 46C7 | 01F4 | 2B01 | 89C0 | E646 |
| 0000112320 | 4689 | 8EE4 | 1406 | 2611 | 3E83 | 8C88 | 7500 | E903 |
| 0000112340 | 001D | 36FF | 01E6 | 36FF | 01E4 | 468D | 16DC | 9A50 |
| 0000112360 | 8A5A | 0000 | C483 | 3D08 | 0000 | 0374 | 0FE9 | 8E00 |
| 0000112400 | 1606 | 2611 | 3E83 | 8D00 | 7500 | E903 | 003B | 681E |
| 0000112420 | 07C0 | 468D | 16E8 | 8D50 | DC46 | 5016 | 468D | 16F6 |
| 0000112440 | 6850 | 0827 | 681E | 07DE | 36FF | 01E2 | 36FF | 01E0 |
| 0000112460 | 36FF | 01E6 | 36FF | 01E4 | A39A | 008A | 8300 | 1EC4 |
| 0000112500 | 4689 | 89F6 | F856 | 08E9 | 2B00 | 89C0 | F846 | 4689 |
| 0000112520 | 8EF6 | 1406 | 2611 | 3E83 | 8CE8 | 7500 | E903 | 0048 |
| 0000112540 | 7E83 | FEE0 | 0375 | 3FE9 | FF00 | 0676 | 681E | 07C4 |
| 0000112560 | 468D | 16E8 | 8D50 | F646 | 5016 | 468D | 16DC | 1E50 |
| 0000112600 | DE68 | 6807 | 0828 | 36FF | 01E2 | 36FF | 01E0 | 36FF |
| 0000112620 | 01E6 | 36FF | 01E4 | 681E | 07D6 | 5268 | 6862 | 6255 |
| 0000112640 | 589A | 0062 | 8300 | 28C4 | 7E83 | 0006 | 037C | 7DE9 |
| 0000112660 | 8E00 | 1406 | 2611 | 3E83 | 8D7E | 7500 | E903 | 0009 |
| 0000112700 | 7E83 | FEE0 | 0374 | 0FE9 | 8E00 | 1606 | 2611 | 3E83 |
| 0000112720 | 8D96 | 7500 | E903 | 0050 | 46C7 | FFE2 | FFFF | E676 |
| 0000112740 | 76FF | 8DE4 | E246 | 5016 | 76FF | FFF4 | FC76 | 76FF |
| 0000112760 | 8DFA | E84E | 5116 | 4E8D | 16F6 | 8D51 | DC4E | 5116 |
| 0000113000 | 681E | 07DE | 2B68 | FF08 | E236 | FF01 | E036 | FF01 |
| 0000113020 | E636 | FF01 | E436 | 9A01 | 8DDE | 0000 | C483 | 8B28 |
| 0000113040 | E246 | 9FE9 | E900 | 0006 | FFB8 | E9FF | 0096 | 068E |
| 0000113060 | 1112 | 5E6B | 1E06 | C726 | B887 | 0100 | 6A00 | 9A00 |
| 0000113100 | C40D | 86CF | C483 | 8E02 | 1406 | 2611 | 3E83 | 8A44 |
| 0000113120 | 7500 | E903 | 0009 | 7E83 | FEE0 | 0374 | 0FE9 | 8E00 |
| 0000113140 | 1606 | 2611 | 3E83 | 8A70 | 7500 | E903 | 0050 | 46C7 |
| 0000113160 | 00E2 | FF00 | E676 | 76FF | 8DE4 | E246 | 5016 | 76FF |
| 0000113200 | FFF4 | FC76 | 76FF | 8DFA | E84E | 51)6 | 4E8D | 16F6 |
| 0000113220 | 8D51 | DC4E | 5116 | 681E | 07DE | 2F68 | FF08 | E236 |
| 0000113240 | FF01 | E036 | FF01 | E636 | FF01 | E436 | 9A01 | 8B23 |
| 0000113260 | 0000 | C483 | 8B28 | E246 | 09E9 | E900 | 0006 | 00B8 |
| 0000113300 | E900 | 0000 | 5E1F | 835F | 02ED | E58B | 5D1F | CA4D |
| 0000113320 | 0002 | 581E | 4590 | 8B55 | 1EEC | D88E | EC81 | 0024 |
| 0000113340 | 5657 | B81E | 8BEA | D88E | 46C7 | ECFA | 8C07 | FC5E |
| 0000113360 | 46C7 | 01F4 | 2B01 | 89C0 | E646 | 4689 | 8EE4 | 1406 |
| 0000113400 | 2611 | 3E83 | 8EB2 | 7500 | E903 | 001D | 36FF | 01E6 |
| 0000113420 | 36FF | 01E4 | 468D | 16DC | 9A50 | 8C20 | 0000 | C483 |
| 0000113440 | 3D08 | 0000 | 0374 | 0FE9 | 8E00 | 1606 | 2611 | 3E83 |

THU MAR 14 17:42:50 1991 MEDIT.DLL PAGE 42, LINE 2420

| | | | | | | | | |
|---|---|---|---|---|---|---|---|---|
| 0000113460 | 8F2A | 7500 | E903 | 003B | 681E | 07F0 | 468D | 16E8 |
| 0000113500 | 8D50 | DC46 | 5016 | 468D | 16F6 | 6850 | 084C | 681E |
| 0000113520 | 0810 | 36FF | 01E2 | 36FF | 01E0 | 36FF | 01E6 | 36FF |
| 0000113540 | 01E4 | 699A | 008C | 8300 | 1EC4 | 4689 | 89F6 | F856 |
| 0000113560 | 08E9 | 2B00 | 89C0 | F846 | 4689 | 8EF6 | 1406 | 2611 |
| 0000113600 | 3E83 | 8F12 | 7500 | E903 | 0048 | 7E83 | FEE0 | 0375 |
| 0000113620 | 3FE9 | FF00 | 0676 | 681E | 07F4 | 468D | 16E8 | 8D50 |
| 0000113640 | F646 | 5016 | 468D | 16DC | 1E50 | 1068 | 6808 | 084D |
| 0000113660 | 36FF | 01E2 | 36FF | 01E0 | 36FF | 01E6 | 36FF | 01E4 |
| 0000113700 | 681E | 0808 | CB68 | 688C | 8CCE | D19A | 008C | 8300 |
| 0000113720 | 28C4 | 7E83 | 0006 | 037C | 7DE9 | 8E00 | 1406 | 2611 |
| 0000113740 | 3E83 | 8C0A | 7500 | E903 | 0009 | 7E83 | FEE0 | 0374 |
| 0000113760 | 0FE9 | 8E00 | 1606 | 2611 | 3E83 | 8C36 | 7500 | E903 |
| 0000114000 | 0050 | 46C7 | FFE2 | FFFF | E676 | 76FF | 8DE4 | E246 |
| 0000114020 | 5016 | 76FF | FFF4 | FC76 | 76FF | 8DFA | E84E | 5116 |
| 0000114040 | 4E8D | 16F6 | 8D51 | DC4E | 5116 | 681E | 0810 | 5068 |
| 0000114060 | FF08 | E236 | FF01 | E036 | FF01 | E636 | FF01 | E436 |
| 0000114100 | 9A01 | 8D48 | 0000 | C483 | 8B28 | E246 | 22E9 | E900 |
| 0000114120 | 0006 | FFB8 | E9FF | 0019 | 068E | 1112 | 5E6B | 1E06 |
| 0000114140 | C726 | B887 | 0000 | 6A00 | 9A01 | C40D | 8D72 | C483 |
| 0000114160 | 1F02 | 5F5E | ED83 | 8B02 | 1FE5 | 4D5D | 02CA | 1E00 |
| 0000114200 | 9058 | 5545 | EC8B | 8E1E | 81D8 | 24EC | 5700 | 1E56 |
| 0000114220 | 14B8 | 8E8E | C7D8 | FA46 | 0820 | 5E8C | C7FC | F446 |
| 0000114240 | 0101 | C02B | 4689 | 89E6 | E446 | 068E | 1114 | 8326 |
| 0000114260 | 683E | 0090 | 0375 | 1DE9 | FF00 | E636 | FF01 | E436 |
| 0000114300 | 8D01 | DC46 | 5016 | 4A9A | 008E | 8300 | 08C4 | 003D |
| 0000114320 | 7400 | E903 | 000F | 068E | 1116 | 8326 | 803E | 0090 |
| 0000114340 | 0375 | 3BE9 | 1E00 | 2468 | 8D08 | E846 | 5016 | 468D |
| 0000114360 | 16DC | 8D50 | F646 | 5016 | 6E68 | 1E08 | 2868 | FF08 |
| 0000114400 | E236 | FF01 | E036 | FF01 | E636 | FF01 | E436 | 9A01 |
| 0000114420 | 8E93 | 0000 | C483 | 891E | F646 | 5689 | E9F8 | 0008 |
| 0000114440 | C02B | 4689 | 89F8 | F646 | 7E83 | 000A | 037C | 7DE9 |
| 0000114460 | 8E00 | 1406 | 2611 | 3E83 | 90F8 | 7500 | E903 | 0009 |
| 0000114500 | 7E83 | FEE0 | 0374 | 0FE9 | 8E00 | 1606 | 2611 | 3E83 |
| 0000114520 | 9110 | 7500 | E903 | 0050 | 46C7 | FFE2 | FFFF | E676 |
| 0000114540 | 76FF | 8DE4 | E246 | 5016 | 76FF | FFF4 | FC76 | 76FF |
| 0000114560 | 8DFA | E84E | 5116 | 4E8D | 16F6 | 8D51 | DC4E | 5116 |
| 0000114600 | 681E | 0828 | 7168 | FF08 | E236 | FF01 | E036 | FF01 |
| 0000114620 | E636 | FF01 | E436 | 9A01 | 9158 | 0000 | C483 | 8B28 |
| 0000114640 | E246 | 99E9 | E900 | 0006 | FFB8 | E9FF | 0090 | 068E |
| 0000114660 | 1112 | 5E6B | 1E0A | 8B26 | B887 | C400 | 065E | 8926 |
| 0000114700 | 8E07 | 1406 | 2611 | 3E83 | 8E34 | 7500 | E903 | 0009 |
| 0000114720 | 7E83 | FEE0 | 0374 | 0FE9 | 8E00 | 1606 | 2611 | 3E83 |
| 0000114740 | 8E60 | 7500 | E903 | 0050 | 46C7 | 00E2 | FF00 | E676 |
| 0000114760 | 76FF | 8DE4 | E246 | 5016 | 76FF | FFF4 | FC76 | 76FF |
| 0000115000 | 8DFA | E84E | 5116 | 4E8D | 16F6 | 8D51 | DC4E | 5116 |
| 0000115020 | 681E | 0828 | 7568 | FF08 | E236 | FF01 | E036 | FF01 |
| 0000115040 | E636 | FF01 | E436 | 9A01 | 8F72 | 0000 | C483 | 8B28 |
| 0000115060 | E246 | 09E9 | E900 | 0006 | 00B8 | E900 | 0000 | 5E1F |
| 0000115100 | 835F | 02ED | E58B | 5D1F | CA4D | 0006 | 581E | 4590 |
| 0000115120 | 8B55 | 1EEC | D88E | EC81 | 0000 | 5657 | 068E | 1110 |
| 0000115140 | 6B26 | 7E1E | 1E08 | 068E | 1112 | 8B26 | B887 | E900 |
| 0000115160 | 0000 | 5F5E | ED83 | 8B02 | 1FE5 | 4D5D | 1ECB | 9058 |
| 0000115200 | 5545 | EC8B | 8E1E | 81D8 | 26EC | 5700 | 1E56 | C1B8 |
| 0000115220 | 8E8F | C7D8 | FA46 | 083B | 5E8C | C7FC | F246 | 0101 |
| 0000115240 | C02B | 4689 | 89E4 | E246 | 068E | 1114 | 8326 | 833E |
| 0000115260 | 0092 | 0375 | 1DE9 | FF00 | E636 | FF01 | E436 | 8D01 |
| 0000115300 | DA46 | 5016 | F79A | 008F | 8300 | 08C4 | 003D | 7400 |
| 0000115320 | E903 | 000F | 068E | 1116 | 8326 | 9B3E | 0092 | 0375 |

THU MAR 14 17:42:50 1991 MEDIT.DLL PAGE 43, LINE 2479

| | | | | | | | | |
|---|---|---|---|---|---|---|---|---|
| 0000115340 | 3BE9 | 1E00 | 3F68 | 8D08 | E646 | 5016 | 468D | 16DA |
| 0000115360 | 8D50 | F646 | 5016 | A968 | 1E08 | 4468 | FF08 | E236 |
| 0000115400 | FF01 | E036 | FF01 | E636 | FF01 | E436 | 9A01 | 9040 |
| 0000115420 | 0000 | C483 | 891E | F646 | 5689 | E9F8 | 0008 | C02B |
| 0000115440 | 4689 | 89F8 | F646 | 46C7 | 00F4 | E900 | 0003 | 46FF |
| 0000115460 | 83F4 | F47E | 7C32 | E903 | 0012 | 068E | 1112 | 5E6B |
| 0000115500 | 1EF4 | C726 | B887 | 0000 | E900 | FFE2 | 068E | 1114 |
| 0000115520 | 8326 | E13E | 008F | 0375 | 09E9 | 8300 | DE7E | 74FE |
| 0000115540 | E903 | 000F | 068E | 1116 | 8326 | 0D3E | 0090 | 0375 |
| 0000115560 | 50E9 | C700 | E046 | 0001 | 76FF | FFE4 | E276 | 468D |
| 0000115600 | 16E0 | FF50 | F276 | 76FF | FFFC | FA76 | 4E8D | 16E6 |
| 0000115620 | 8D51 | F64E | 5116 | 4E8D | 16DA | 1E51 | 4468 | 6808 |
| 0000115640 | 08B0 | 36FF | 01E2 | 36FF | 01E0 | 36FF | 01E6 | 36FF |
| 0000115660 | 01E4 | C89A | 0090 | 8300 | 28C4 | 468B | E9E0 | 0009 |
| 0000115700 | 06E9 | B800 | 0001 | 00E9 | 1F00 | 5F5E | ED83 | 8B02 |
| 0000115720 | 1FE5 | 4D5D | 1ECB | 9058 | 5545 | EC8B | 8E1E | 81D8 |
| 0000115740 | 60EC | 5700 | 1E56 | BFB8 | 8E91 | C7D8 | A046 | 0000 |
| 0000115760 | 46C7 | FFA2 | C700 | A646 | BFFF | 46C7 | 7FA8 | C700 |
| 0000116000 | FA46 | FF6A | 46C7 | 6AFC | 8300 | 0A7E | 7403 | E903 |
| 0000116020 | 009D | 681E | 084E | 76FF | FF08 | 0676 | 2E9A | 8DF5 |
| 0000116040 | 8393 | 08C4 | 003D | 7400 | E903 | 0024 | 006A | 016A |
| 0000116060 | 006A | 006A | 006A | 026A | FF6A | E96A | 006A | 016A |
| 0000116100 | 468D | 16A0 | 9A50 | 93B4 | 0000 | 4689 | E9A4 | 005F |
| 0000116120 | 681E | 0855 | 76FF | FF08 | 0676 | 2E9A | 9CF5 | 838F |
| 0000116140 | 08C4 | 003D | 7400 | E903 | 0024 | 006A | 016A | 006A |
| 0000116160 | 006A | 006A | 026A | FF6A | E96A | 006A | 016A | 468D |
| 0000116200 | 16FA | 9A50 | FFFF | 0000 | 4689 | E9A4 | 0021 | 006A |
| 0000116220 | 016A | 006A | 006A | 006A | 026A | FF6A | E96A | 006A |
| 0000116240 | 016A | 468D | 16A6 | 9A50 | 9376 | 0000 | 4689 | 6AA4 |
| 0000116260 | FF1F | 0876 | 76FF | 8B06 | 0A46 | E0C1 | 0505 | 01EC |
| 0000116300 | 501E | 709A | 36F5 | 8394 | 0AC4 | 5E8B | C10A | 05E3 |
| 0000116320 | 87C6 | 020B | 8300 | 723E | 0013 | 0375 | 44E9 | 1E00 |
| 0000116340 | 4C68 | 8E02 | 1006 | 2611 | 1E6B | 087E | 8E1E | 1206 |
| 0000116360 | 2611 | B7FF | 00A0 | 681E | 020C | 681E | 085C | 468D |
| 0000116400 | 16AA | 9A50 | F7DC | 934F | C483 | 8E12 | 1806 | 2611 |
| 0000116420 | 36FF | 0012 | FF26 | 1036 | 8D00 | AA46 | 5016 | FF9A |
| 0000116440 | 00FF | B800 | 0000 | 00E9 | 1F00 | 5F5E | ED83 | 8B02 |
| 0000116460 | 1FE5 | 4D5D | 06CA | 0000 | 581E | 4590 | 8B55 | 1EEC |
| 0000116500 | D88E | EC81 | 000A | 5657 | B81E | 9317 | D88E | 468D |
| 0000116520 | 16F6 | 8E50 | 2E06 | 2611 | 36FF | 08D4 | FF9A | 00FF |
| 0000116540 | C700 | FC46 | FFFF | 468D | 16F6 | 8E50 | 2E06 | 2611 |
| 0000116560 | 36FF | 08D4 | FF9A | 00FF | 1F00 | 5F5E | ED83 | 8B02 |
| 0000116600 | 1FE5 | 4D5D | 1ECB | 9058 | 5545 | EC8B | 8E1E | 81D8 |
| 0000116620 | 0AEC | 5700 | 1E56 | 7AB8 | 8E94 | 8DD8 | F646 | 5016 |
| 0000116640 | 068E | 112E | FF26 | D436 | 9A08 | 948D | 0000 | 7E83 |
| 0000116660 | 0006 | 0375 | 1CE9 | C700 | FA46 | 0000 | 068E | 1130 |
| 0000116700 | A126 | 08DE | 8948 | F646 | A126 | 08DE | 8948 | F846 |
| 0000116720 | 16E9 | C700 | FA46 | 0000 | 46C7 | 00F6 | 8E00 | 3006 |
| 0000116740 | 2611 | DEA1 | 4808 | 4689 | 8DF8 | F646 | 5016 | 068E |
| 0000116760 | 112E | FF26 | D436 | 9A08 | 94A5 | 0000 | 5E1F | 835F |
| 0000117000 | 02ED | E58B | 5D1F | CA4D | 0002 | 581E | 4590 | 8B55 |
| 0000117020 | 1EEC | D88E | EC81 | 000A | 5657 | B81E | 94C7 | D88E |
| 0000117040 | 468D | 16F6 | 8E50 | 2E06 | 2611 | 36FF | 08D4 | DA9A |
| 0000117060 | 0094 | C700 | FC46 | 0001 | 468D | 16F6 | 8E50 | 2E06 |
| 0000117100 | 2611 | 36FF | 08D4 | 289A | 0095 | 1F00 | 5F5E | ED83 |
| 0000117120 | 8B02 | 1FE5 | 4D5D | 1ECB | 9058 | 5545 | EC8B | 8E1E |
| 0000117140 | 81D8 | 08EC | 5700 | 8E56 | 3206 | 2611 | 1E6B | 087E |
| 0000117160 | 8E1E | 3406 | 2611 | 878B | 00A4 | 068E | 1136 | 0326 |
| 0000117200 | 1406 | 4800 | 8E50 | 3206 | 2611 | 36FF | 087E | 839A |

THU MAR 14 17:42:50 1991 MEDIT.DLL PAGE 44, LINE 2538

| | | | | | | | | |
|---|---|---|---|---|---|---|---|---|
| 0000117220 | DD66 | 8995 | FA46 | 5689 | 8BFC | FC46 | 460B | 75FA |
| 0000117240 | E903 | 0061 | 76FF | FFFC | FA76 | 589A | F5F5 | 8393 |
| 0000117260 | 04C4 | 068E | 1138 | 3B26 | DA06 | 7308 | E903 | 000B |
| 0000117300 | 068E | 1138 | A126 | 08DA | 0EE9 | FF00 | FC76 | 76FF |
| 0000117320 | 9AFA | F558 | 95C1 | C483 | 8904 | F846 | 76FF | FFFC |
| 0000117340 | FA76 | 76FF | 8EF8 | 3606 | 2611 | 14A1 | 4800 | 6A50 |
| 0000117360 | 6800 | 954C | 4368 | 8E01 | 2E06 | 2611 | 36FF | 08D4 |
| 0000117400 | FF9A | 00FF | 8E00 | 3A06 | 2611 | E2A1 | 8E08 | 3606 |
| 0000117420 | 2611 | 062B | 0014 | FF3D | 74FF | E903 | 0067 | 068E |
| 0000117440 | 113C | 8326 | 463E | 0001 | 0375 | 58E9 | 8E00 | 3206 |
| 0000117460 | 2611 | 7EA1 | 8E08 | 3A06 | 2611 | 0639 | 08E0 | 0374 |
| 0000117500 | 42E9 | 2600 | 3E83 | 08E0 | 7500 | E903 | 0037 | 2268 |
| 0000117520 | 6896 | 0140 | 016A | A126 | 08E2 | 068E | 1132 | 6B26 |
| 0000117540 | 7E1E | 1E08 | 068E | 1134 | 2B26 | A487 | 5000 | 068E |
| 0000117560 | 113A | FF26 | E436 | 8E08 | 2E06 | 2611 | 36FF | 08D4 |
| 0000117600 | C39A | 001E | 5E00 | 835F | 02ED | E58B | 5D1F | CB4D |
| 0000117620 | 581E | 4590 | 8B55 | 1EEC | D88E | EC81 | 0000 | 5657 |
| 0000117640 | 468B | 2B06 | 7406 | 1B13 | 23C9 | 03C1 | 7406 | 5013 |
| 0000117660 | 468B | 2B08 | 7606 | 1B13 | 23C9 | 03C1 | 7606 | 5013 |
| 0000117700 | 068E | 112E | FF26 | D436 | 9A08 | FFFF | 0000 | 5F5E |
| 0000117720 | ED83 | 8B02 | 1FE5 | 4D5D | 1ECB | 9058 | 5545 | EC8B |
| 0000117740 | 8E1E | 81D8 | 06EC | 5700 | 1E56 | 7FB8 | 8E96 | 8ED8 |
| 0000117760 | 3206 | 2611 | 1E6B | 087E | 8E1E | 3406 | 2611 | 878B |
| 0000120000 | 00A6 | 062B | 0882 | 4689 | 6AFA | 8E00 | 3206 | 2611 |
| 0000120020 | 1E6B | 087E | 8E1E | 3406 | 2611 | B7FF | 00A6 | C08C |
| 0000120040 | 068E | 112E | FF26 | D436 | 9A08 | 96FA | 0000 | 068E |
| 0000120060 | 1132 | 6B26 | 7E1E | 1E08 | 068E | 1134 | 8B26 | A487 |
| 0000120100 | 2B00 | 8006 | 8908 | FC46 | 7E83 | 00FC | 0374 | 03E9 |
| 0000120120 | E900 | 01AB | 468B | 99FC | C233 | C22B | 068E | 1136 |
| 0000120140 | 3926 | 1406 | 7700 | E903 | 0143 | 7E83 | 00FC | 037C |
| 0000120160 | 48E9 | 6A00 | 6A00 | 6A00 | 6AFF | 8BFF | FC46 | D8F7 |
| 0000120200 | 6850 | 97F7 | 4868 | 8E01 | 2E06 | 2611 | 36FF | 08D4 |
| 0000120220 | FF9A | 00FF | 6A00 | 8B00 | FC46 | D8F7 | 8E50 | 3206 |
| 0000120240 | 2611 | 1E6B | 087E | 8E1E | 3406 | 2611 | B7FF | 00A4 |
| 0000120260 | 3B9A | 3C99 | 8398 | 06C4 | 56E9 | 6A00 | 6A00 | 6A00 |
| 0000120300 | 6AFF | FFFF | FC76 | 1B68 | 6897 | 0148 | 068E | 112E |
| 0000120320 | FF26 | D436 | 9A08 | FFFF | 0000 | 068E | 1136 | A126 |
| 0000120340 | 0014 | 462B | 50FC | 76FF | 8EFC | 3206 | 2611 | 1E6B |
| 0000120360 | 087E | 8E1E | 3406 | 2611 | 878B | 00A4 | 068E | 1136 |
| 0000120400 | 0326 | 1406 | 2B00 | FC46 | 9A50 | 993B | 9604 | C483 |
| 0000120420 | 8E06 | 3E06 | 2611 | 3E83 | 08A6 | 7500 | E903 | 000A |
| 0000120440 | 016A | 7A9A | E3B9 | 8397 | 02C4 | 068E | 1140 | 8326 |
| 0000120460 | A43E | 0008 | 0374 | 71E9 | 6A00 | 9A01 | D416 | 98E0 |
| 0000120500 | C483 | 8E02 | 3C06 | 2611 | 3E83 | 0146 | 7500 | E903 |
| 0000120520 | 0058 | 068E | 1132 | A126 | 087E | 068E | 113A | 3926 |
| 0000120540 | E006 | 7408 | E903 | 0042 | 8326 | E03E | 0008 | 0375 |
| 0000120560 | 37E9 | 6800 | 97B2 | 4068 | 6A01 | 2601 | E2A1 | 8E08 |
| 0000120600 | 3206 | 2611 | 1E6B | 087E | 8E1E | 3406 | 2611 | 872B |
| 0000120620 | 00A4 | 8E50 | 3A06 | 2611 | 36FF | 08E4 | 068E | 112E |
| 0000120640 | FF26 | D436 | 9A08 | 96B1 | 0000 | 05E9 | 9A00 | 9B7D |
| 0000120660 | 9855 | 068E | 1132 | 6B26 | 7E1E | 1E08 | 068E | 1134 |
| 0000120700 | 8B26 | A487 | A300 | 0880 | 068E | 1132 | 6B26 | 7E1E |
| 0000120720 | 1E08 | 068E | 1134 | 8B26 | A687 | A300 | 0882 | 068E |
| 0000120740 | 1132 | 6B26 | 7E1E | 1E08 | 068E | 1134 | 8326 | B8BF |
| 0000120760 | 0100 | C01B | D8F7 | 9A50 | C40D | 986E | C483 | 1F02 |
| 0000121000 | 5F5E | ED83 | 8B02 | 1FE5 | 4D5D | 1ECB | 9058 | 5545 |
| 0000121020 | EC8B | 8E1E | 81D8 | 0CEC | 5700 | 8B56 | 0A46 | 4689 |
| 0000121040 | E9F8 | 0003 | 46FF | 8BF8 | 0A46 | 4603 | 3B08 | F846 |
| 0000121060 | 0377 | 51E9 | FF01 | 0676 | 46FF | 8E06 | 3206 | 2611 |

THU MAR 14 17:42:50 1991 MEDIT.DLL PAGE 45, LINE 2597

| | | | | | | | | |
|---|---|---|---|---|---|---|---|---|
| 0000121100 | 36FF | 087E | 839A | 9366 | 8999 | FA46 | 5689 | 8BFC |
| 0000121120 | FC46 | 460B | 75FA | E903 | 00D5 | 76FF | FFFC | FA76 |
| 0000121140 | 589A | BAF5 | 8399 | 04C4 | 068E | 1138 | 3B26 | DA06 |
| 0000121160 | 7308 | E903 | 000B | 068E | 1138 | A126 | 08DA | 0EE9 |
| 0000121200 | FF00 | FC76 | 76FF | 9AFA | F558 | 9A66 | C483 | 8904 |
| 0000121220 | F446 | 76FF | FFFC | FA76 | 76FF | FFF4 | F876 | 006A |
| 0000121240 | 2668 | 689A | 0143 | 068E | 112E | FF26 | D436 | 9A08 |
| 0000121260 | 9AAF | 0000 | 068E | 113A | 468B | 26F8 | 0639 | 08E2 |
| 0000121300 | 0374 | 67E9 | 8E00 | 3C06 | 2611 | 3E83 | 0146 | 7500 |
| 0000121320 | E903 | 0058 | 068E | 1132 | A126 | 087E | 068E | 113A |
| 0000121340 | 3926 | E006 | 7408 | E903 | 0042 | 8326 | E03E | 0008 |
| 0000121360 | 0375 | 37E9 | 6800 | 9AA0 | 4068 | 6A01 | 2601 | E2A1 |
| 0000121400 | 8E08 | 3206 | 2611 | 1E6B | 087E | 8E1E | 3406 | 2611 |
| 0000121420 | 872B | 00A4 | 8E50 | 3A06 | 2611 | 36FF | 08E4 | 068E |
| 0000121440 | 112E | FF26 | D436 | 9A08 | 9B6E | 0000 | 54E9 | 1E00 |
| 0000121460 | 8468 | 9A08 | F558 | 9A8B | C483 | 8E04 | 3806 | 2611 |
| 0000121500 | 063B | 08DA | 0373 | 0BE9 | 8E00 | 3806 | 2611 | DAA1 |
| 0000121520 | E908 | 000C | 681E | 0886 | 589A | 2AF5 | 8399 | 04C4 |
| 0000121540 | 4689 | 1EF4 | 8868 | FF08 | F476 | 76FF | 6AF8 | 6800 |
| 0000121560 | 9B43 | 4368 | 8E01 | 2E06 | 2611 | 36FF | 08D4 | 319A |
| 0000121600 | 0096 | E900 | FE9E | 068E | 1132 | A126 | 087E | 068E |
| 0000121620 | 113A | 3926 | E006 | 7408 | E903 | 00A6 | A126 | 08E2 |
| 0000121640 | 068E | 1132 | 6B26 | 7E1E | 1E08 | 068E | 1134 | 3926 |
| 0000121660 | A487 | 7600 | E903 | 008A | 068E | 1132 | 6B26 | 7E1E |
| 0000121700 | 1E08 | 068E | 1134 | 8B26 | A487 | 8E00 | 3606 | 2611 |
| 0000121720 | 0603 | 0014 | 068E | 113A | 3B26 | E206 | 7708 | E903 |
| 0000121740 | 0060 | 068E | 113C | 8326 | 463E | 0001 | 0375 | 51E9 |
| 0000121760 | 8E00 | 3206 | 2611 | 7EA1 | 8E08 | 3A06 | 2611 | 0639 |
| 0000122000 | 08E0 | 0374 | 3BE9 | 2600 | 3E83 | 08E0 | 7500 | E903 |
| 0000122020 | 0030 | A468 | 6898 | 0140 | 016A | A126 | 08E2 | 068E |
| 0000122040 | 1132 | 6B26 | 7E1E | 1E08 | 068E | 1134 | 2B26 | A487 |
| 0000122060 | 5000 | 006A | 068E | 112E | FF26 | D436 | 9A08 | 98D6 |
| 0000122100 | 0000 | 5F5E | ED83 | 8B02 | 1FE5 | 4D5D | 1ECB | 9058 |
| 0000122120 | 5545 | EC8B | 8E1E | 81D8 | 00EC | 5700 | 1E56 | 9EB8 |
| 0000122140 | 8E9B | 6AD8 | 6A00 | 6A00 | 6AFF | 6AFF | 68FF | 9C57 |
| 0000122160 | 4868 | 8E01 | 2E06 | 2611 | 36FF | 08D4 | 069A | 0098 |
| 0000122200 | 6A00 | 8E00 | 3606 | 2611 | 36FF | 0014 | 068E | 1132 |
| 0000122220 | 6B26 | 7E1E | 1E08 | 068E | 1134 | FF26 | A4B7 | 9A00 |
| 0000122240 | 993B | 9C17 | C483 | 8E06 | 3206 | 2611 | 1E6B | 087E |
| 0000122260 | 8E1E | 3406 | 2611 | 878B | 00A4 | 80A3 | 8E08 | 3206 |
| 0000122300 | 2611 | 1E6B | 087E | 8E1E | 3406 | 2611 | 878B | 00A6 |
| 0000122320 | 82A3 | 8E08 | 3E06 | 2611 | 3E83 | 08A6 | 7500 | E903 |
| 0000122340 | 000A | 016A | 7A9A | 21B9 | 839C | 02C4 | 016A | 169A |
| 0000122360 | A2D4 | 839C | 02C4 | 068E | 113C | 8326 | 463E | 0001 |
| 0000122400 | 0375 | 51E9 | 8E00 | 3206 | 2611 | 7EA1 | 8E08 | 3A06 |
| 0000122420 | 2611 | 0639 | 08E0 | 0374 | 3BE9 | 2600 | 3E83 | 08E0 |
| 0000122440 | 7500 | E903 | 0030 | D168 | 6899 | 0140 | 016A | A126 |
| 0000122460 | 08E2 | 068E | 1132 | 6B26 | 7E1E | 1E08 | 068E | 1134 |
| 0000122500 | 2B26 | A487 | 5000 | 006A | 068E | 112E | FF26 | D436 |
| 0000122520 | 9A08 | 9A58 | 0000 | 068E | 1132 | 6B26 | 7E1E | 1E08 |
| 0000122540 | 068E | 1134 | 8326 | B8BF | 0100 | C01B | D8F7 | 9A50 |
| 0000122560 | C40D | 9977 | C483 | 1F02 | 5F5E | ED83 | 8B02 | 1FE5 |
| 0000122600 | 4D5D | 1ECB | 9058 | 5545 | EC8B | 8E1E | 81D8 | 06EC |
| 0000122620 | 5700 | 1E56 | 8FB8 | 8E9B | 8ED8 | 3206 | 2611 | 1E6B |
| 0000122640 | 087E | 8E1E | 3406 | 2611 | 878B | 00A4 | 068E | 1142 |
| 0000122660 | 0326 | 0806 | 5000 | 189A | F185 | 899C | FC46 | 7C9A |
| 0000122700 | D291 | 3D9B | 0000 | 0375 | 0EE9 | 6A00 | 6A00 | 6A01 |
| 0000122720 | 9A02 | 1604 | 0000 | 55E9 | 8B05 | 0646 | 24E9 | 8E05 |
| 0000122740 | 4406 | 8B11 | FC46 | 3926 | 0406 | 7300 | E903 | 0003 |

THU MAR 14 17:42:50 1991 MEDIT.DLL PAGE 46, LINE 2656

| | | | | | | | | |
|---|---|---|---|---|---|---|---|---|
| 0000122760 | 36E9 | 8E05 | 4406 | 2611 | 06FF | 0004 | 068E | 1138 |
| 0000123000 | 8B26 | DA0E | 8E08 | 4406 | 2611 | 04A1 | 2B00 | F7D2 |
| 0000123020 | 26F1 | 1689 | 0004 | 068E | 1146 | A126 | 000E | 068E |
| 0000123040 | 1144 | 3926 | 0406 | 7300 | E903 | 0027 | 068E | 1148 |
| 0000123060 | FF26 | 1236 | 2600 | 36FF | 0010 | 326A | 068E | 114A |
| 0000123100 | FF26 | D836 | 2608 | 36FF | 08D6 | 026A | 006A | D89A |
| 0000123120 | 005D | 8E00 | 4406 | 2611 | 3E83 | 0004 | 7400 | E903 |
| 0000123140 | 0066 | 068E | 1142 | FF26 | 0806 | 8E00 | 3606 | 2611 |
| 0000123160 | 0E8B | 0014 | 068E | 1142 | A126 | 0008 | D22B | F1F7 |
| 0000123200 | 8926 | 0816 | 2600 | 3E83 | 0008 | 7400 | E903 | 0038 |
| 0000123220 | 068E | 1148 | FF26 | 1236 | 2600 | 36FF | 0010 | 316A |
| 0000123240 | 068E | 114C | FF26 | D236 | 2608 | 36FF | 08D0 | 026A |
| 0000123260 | 006A | 549A | 009E | 8E00 | 3606 | 2611 | 14A1 | 4800 |
| 0000123300 | 068E | 1142 | A326 | 0008 | 5EE9 | 8E04 | 4406 | 2611 |
| 0000123320 | 3E83 | 0004 | 7700 | E903 | 0051 | FF26 | 040E | 8E00 |
| 0000123340 | 3206 | 2611 | 1E6B | 087E | 8E1E | 3406 | 2611 | 878B |
| 0000123360 | 00A6 | 068E | 1144 | 2B26 | 0406 | 4800 | 0374 | 27E9 |
| 0000123400 | 8E00 | 4806 | 2611 | 36FF | 0012 | FF26 | 1036 | 6A00 |
| 0000123420 | 8E32 | 4A06 | 2611 | 36FF | 08D8 | FF26 | D636 | 6A08 |
| 0000123440 | 6A01 | 9A00 | 9EA6 | 0000 | 74E9 | 8E00 | 4206 | 2611 |
| 0000123460 | 3E83 | 0008 | 7400 | E903 | 004A | 068E | 1132 | 6B26 |
| 0000123500 | 7E1E | 1E08 | 068E | 1134 | 8326 | A4BF | 0000 | 0377 |
| 0000123520 | 31E9 | 8E00 | 4806 | 2611 | 36FF | 0012 | FF26 | 1036 |
| 0000123540 | 6A00 | 8E31 | 4C06 | 2611 | 36FF | 08D2 | FF26 | D036 |
| 0000123560 | 6A08 | 6A01 | 9A00 | 9D7F | 0000 | 076A | B39A | CD9C |
| 0000123600 | E99E | 001B | 068E | 1142 | 8326 | 083E | 0000 | 0377 |
| 0000123620 | 0CE9 | 2600 | 0EFF | 0008 | 076A | B39A | 499C | E9A1 |
| 0000123640 | 0387 | 068E | 1132 | 6B26 | 7E1E | 1E08 | 068E | 1134 |
| 0000123660 | 8B26 | A487 | 8E00 | 4206 | 2611 | 0603 | 0008 | 068E |
| 0000123700 | 1132 | 6B26 | 7E1E | 1E08 | 068E | 1134 | 3B26 | A087 |
| 0000123720 | 7300 | E903 | 0003 | 50E9 | 8E03 | 4206 | 2611 | 06FF |
| 0000123740 | 0008 | 068E | 1136 | 8B26 | 140E | 8E00 | 4206 | 2611 |
| 0000123760 | 08A1 | 2B00 | F7D2 | 26F1 | 1689 | 0008 | 8326 | 083E |
| 0000124000 | 0000 | 0374 | 63E9 | 8E00 | 3206 | 2611 | 1E6B | 087E |
| 0000124020 | 8E1E | 3406 | 2611 | 878B | 00A4 | 068E | 1132 | 6B26 |
| 0000124040 | 7E1E | 1E08 | 068E | 1134 | 3926 | A087 | 7700 | E903 |
| 0000124060 | 0038 | 068E | 1148 | FF26 | 1236 | 2600 | 36FF | 0010 |
| 0000124100 | 316A | 068E | 114C | FF26 | D236 | 2608 | 36FF | 08D0 |
| 0000124120 | 026A | 006A | E89A | 009F | 8E00 | 3606 | 2611 | 14A1 |
| 0000124140 | 4800 | 068E | 1142 | A326 | 0008 | BCE9 | 8E02 | 4206 |
| 0000124160 | 2611 | 3E83 | 0008 | 7400 | E903 | 0043 | 068E | 1132 |
| 0000124200 | 6B26 | 7E1E | 1E08 | 068E | 1134 | 8326 | A4BF | 0000 |
| 0000124220 | 0377 | 2AE9 | 8E00 | 4806 | 2611 | 36FF | 0012 | FF26 |
| 0000124240 | 1036 | 6A00 | 8E31 | 4C06 | 2611 | 36FF | 08D2 | FF26 |
| 0000124260 | D036 | 6A08 | 6A01 | 9A00 | A043 | 0000 | 2EE9 | 8E00 |
| 0000124300 | 4206 | 2611 | 3E83 | 0008 | 7700 | E903 | 001F | FF26 |
| 0000124320 | 080E | 8E00 | 3606 | 2611 | 0E8B | 0014 | 068E | 1142 |
| 0000124340 | A126 | 0005 | D22B | F1F7 | 8926 | 0816 | E900 | 0239 |
| 0000124360 | 068E | 1148 | FF26 | 1236 | 2600 | 36FF | 0010 | 316A |
| 0000124400 | 068E | 114C | FF26 | D236 | 2608 | 36FF | 08D0 | 036A |
| 0000124420 | 006A | 6D9A | 00A0 | E900 | 020F | 068E | 1148 | FF26 |
| 0000124440 | 1236 | 2600 | 36FF | 0010 | 316A | 068E | 114C | FF26 |
| 0000124460 | D236 | 2608 | 36FF | 08D0 | 046A | 006A | B09A | 00A0 |
| 0000124500 | E900 | 01E5 | 068E | 1132 | 6B26 | 7E1E | 1E08 | 068E |
| 0000124520 | 1134 | 8326 | A6BF | 0000 | 0375 | 27E9 | 8E00 | 4806 |
| 0000124540 | 2611 | 36FF | 0012 | FF26 | 1036 | 6A00 | 8E32 | 4A06 |
| 0000124560 | 2611 | 36FF | 08D8 | FF26 | D636 | 6A08 | 6A09 | 9A00 |
| 0000124600 | A12F | 0000 | 068E | 1144 | C726 | 0406 | 0000 | E900 |
| 0000124620 | 0197 | 068E | 1132 | 6B26 | 7E1E | 1E08 | 068E | 1134 |

THU MAR 14 17:42:50 1991 MEDIT.DLL PAGE 47, LINE 2715

| | | | | | | | | |
|---|---|---|---|---|---|---|---|---|
| 0000124640 | 8B26 | A687 | 8E00 | 4606 | 2611 | 0603 | 000E | 463B |
| 0000124660 | 73FC | E903 | 001B | 068E | 1132 | 6B26 | 7E1E | 1E08 |
| 0000124700 | 068E | 1134 | 468B | 26FC | 8739 | 00A6 | 0377 | 35E9 |
| 0000124720 | 8B00 | FC46 | 068E | 1144 | A326 | 0004 | 068E | 1148 |
| 0000124740 | FF26 | 1236 | 2600 | 36FF | 0010 | 326A | 068E | 114A |
| 0000124760 | FF26 | D836 | 2608 | 36FF | 08D6 | 086A | 006A | E39A |
| 0000125000 | 009D | E900 | 000B | 468B | 8EFC | 4406 | 2611 | 04A3 |
| 0000125020 | E900 | 0115 | 006A | B39A | E99C | 8E9C | 4406 | 2611 |
| 0000125040 | 04A1 | 8900 | FA46 | 03E9 | FF00 | FA46 | 468B | 8EFA |
| 0000125060 | 4E06 | 2B11 | 26D2 | 36F7 | 01EA | FA83 | 7500 | E903 |
| 0000125100 | 000A | 006A | B39A | 849C | E9A1 | FFDD | DAE9 | 6A00 |
| 0000125120 | 9A01 | 9CB3 | A1B2 | 068E | 1144 | A126 | 0004 | 4689 |
| 0000125140 | E9FA | 0003 | 4EFF | 8BFA | FA46 | 068E | 114E | D22B |
| 0000125160 | F726 | EA36 | 8301 | 00FA | 0375 | DAE9 | 6A00 | 9A01 |
| 0000125200 | 9CB3 | A25C | DDE9 | E9FF | 009F | 00B8 | 8E00 | 4206 |
| 0000125220 | 2611 | 08A3 | 8E00 | 3206 | 2611 | 1E6B | 087E | 8E1E |
| 0000125240 | 3406 | 2611 | 8789 | 00A4 | 00B8 | 8E00 | 4406 | 2611 |
| 0000125260 | 04A3 | 8E00 | 3206 | 2611 | 1E6B | 087E | 8E1E | 3406 |
| 0000125300 | 2611 | 8789 | 00A6 | 068E | 1132 | 6B26 | 7E1E | 1E08 |
| 0000125320 | 068E | 1134 | FF26 | A4B7 | 8C00 | 8EC0 | 3206 | 2611 |
| 0000125340 | 1E6B | 087E | 8E1E | 26C0 | B7FF | 00A6 | 068E | 112E |
| 0000125360 | FF26 | D436 | 9A08 | 975A | 0000 | 2CE9 | E900 | 0029 |
| 0000125400 | 26E9 | 3D00 | 000A | 0376 | F2E9 | D1FF | 93E0 | FF2E |
| 0000125420 | 43A7 | 0FA2 | FB9D | 9D9D | D29F | 209E | 4AAD | 74A0 |
| 0000125440 | C2A0 | 44A0 | 7FA1 | BAA1 | 9AA1 | AC6C | 9EAF | 5E1F |
| 0000125460 | 835F | 02ED | E58B | 5D1F | CA4D | 0002 | 581E | 4590 |
| 0000125500 | 8B55 | 1EEC | D88E | EC81 | 0006 | 5657 | 068E | 1142 |
| 0000125520 | A126 | 0008 | 068E | 113A | 3926 | E206 | 7408 | E903 |
| 0000125540 | 001F | A126 | 08E4 | 068E | 1144 | 3926 | 0406 | 7400 |
| 0000125560 | E903 | 000D | 46C7 | 40FA | C701 | FC46 | 9CC5 | 43E9 |
| 0000125600 | 8E00 | 4206 | 2611 | 08A1 | 8E00 | 5006 | 2611 | 0639 |
| 0000125620 | 08DA | 0374 | 23E9 | 8E00 | 3206 | 2611 | 7EA1 | 8E08 |
| 0000125640 | 5206 | 2611 | 0639 | 08DC | 0374 | 0DE9 | C700 | FA46 |
| 0000125660 | 0141 | 46C7 | F2FC | E9A2 | 000A | 46C7 | 43FA | C701 |
| 0000125700 | FC46 | A2AC | 76FF | FF08 | 0676 | 016A | 068E | 1142 |
| 0000125720 | FF26 | 0836 | 8E00 | 4406 | 2611 | 36FF | 0004 | 76FF |
| 0000125740 | FFFC | FA76 | 068E | 112E | FF26 | D436 | 9A08 | 99E0 |
| 0000125760 | 0000 | 5F5E | ED83 | 8B02 | 1FE5 | 4D5D | 1ECB | 9058 |
| 0000126000 | 5545 | EC8B | 8E1E | 81D8 | 04EC | 5700 | FF56 | 0876 |
| 0000126020 | 76FF | 9A06 | F558 | A36D | C483 | 8E04 | 3806 | 2611 |
| 0000126040 | 063B | 08DA | 0373 | 0BE9 | 8E00 | 3806 | 2611 | DAA1 |
| 0000126060 | E908 | 000E | 76FF | FF08 | 0676 | 589A | 77F5 | 83A1 |
| 0000126100 | 04C4 | 4689 | FFFC | 0876 | 76FF | FF06 | FC76 | 76FF |
| 0000126120 | FF0A | 0C76 | DA68 | 68A3 | 0143 | 068E | 112E | FF26 |
| 0000126140 | D436 | 9A08 | A31E | 0000 | 068E | 113A | 468B | 260A |
| 0000126160 | 0639 | 08E2 | 0374 | 67E9 | 8E00 | 3C06 | 2611 | 3E83 |
| 0000126200 | 0146 | 7500 | E903 | 0058 | 068E | 1132 | A126 | 087E |
| 0000126220 | 068E | 113A | 3926 | E006 | 7408 | E903 | 0042 | 8326 |
| 0000126240 | E03E | 0008 | 0375 | 37E9 | 6800 | A2E5 | 4068 | 6A01 |
| 0000126260 | 2601 | E2A1 | 8E08 | 3206 | 2611 | 1E6B | 087E | 8E1E |
| 0000126300 | 3406 | 2611 | 872B | 00A4 | 8E50 | 3A06 | 2611 | 36FF |
| 0000126320 | 08E4 | 068E | 112E | FF26 | D436 | 9A08 | 9C82 | 0000 |
| 0000126340 | 5F5E | ED83 | 8B02 | 1FE5 | 4D5D | 1ECB | 9058 | 5545 |
| 0000126360 | EC8B | 8E1E | 81D8 | 08EC | 5700 | FF56 | 0676 | 068E |
| 0000126400 | 1132 | FF26 | 7E36 | 9A08 | 6683 | A456 | 4689 | 89FA |
| 0000126420 | FC56 | 468B | 0BFC | FA46 | 0375 | F9E9 | FF00 | FC76 |
| 0000126440 | 76FF | 9AFA | F558 | A47D | C483 | 8E04 | 3806 | 2611 |
| 0000126460 | 063B | 08DA | 0373 | 0BE9 | 8E00 | 3806 | 2611 | DAA1 |
| 0000126500 | E908 | 000E | 76FF | FFFC | FA76 | 589A | 46F5 | 83A3 |

THU MAR 14 17:42:50 1991 MEDIT.DLL PAGE 48, LINE 2774

| | | | | | | | | |
|---|---|---|---|---|---|---|---|---|
| 0000126520 | 04C4 | 4689 | FFF8 | FC76 | 76FF | FFFA | F876 | 468B |
| 0000126540 | 8E06 | 3206 | 2611 | 1E6B | 087E | 8E1E | 3406 | 2611 |
| 0000126560 | 872B | 00A4 | 6A50 | 6800 | A510 | 4368 | 8E01 | 2E06 |
| 0000126600 | 2611 | 36FF | 08D4 | 949A | 00A3 | 8B00 | 0646 | 068E |
| 0000126620 | 1132 | 6B26 | 7E1E | 1E08 | 068E | 1134 | 2B26 | A487 |
| 0000126640 | 8E00 | 3A06 | 2611 | 063B | 08E2 | 0374 | 67E9 | 8E00 |
| 0000126660 | 3C06 | 2611 | 3E83 | 0146 | 7500 | E903 | 0058 | 068E |
| 0000126700 | 1132 | A126 | 087E | 068E | 113A | 3926 | E006 | 7408 |
| 0000126720 | E903 | 0042 | 8326 | E03E | 0008 | 0375 | 37E9 | 6800 |
| 0000126740 | A385 | 4068 | 6A01 | 2601 | E2A1 | 8E08 | 3206 | 2611 |
| 0000126760 | 1E6B | 087E | 8E1E | 3406 | 2611 | 872B | 00A4 | 8E50 |
| 0000127000 | 3A06 | 2611 | 36FF | 08E4 | 068E | 112E | FF26 | D436 |
| 0000127020 | 9A08 | A40C | 0000 | 5F5E | ED83 | 8B02 | 1FE5 | 4D5D |
| 0000127040 | 1ECB | 9058 | 5545 | EC8B | 8E1E | 81D8 | 00EC | 5700 |
| 0000127060 | 1E56 | A8B8 | 8EA4 | 9AD8 | 9709 | A43A | 5E1F | 835F |
| 0000127100 | 02ED | E58B | 5D1F | CB4D | 581E | 4590 | 8B55 | 1EEC |
| 0000127120 | D88E | EC81 | 0000 | 5657 | B81E | A563 | D88E | 468B |
| 0000127140 | 4008 | 6A50 | 6A00 | 6AFF | FFFF | 0676 | 8A68 | 68A5 |
| 0000127160 | 0148 | 068E | 112E | FF26 | D436 | 9A08 | 97C1 | 0000 |
| 0000127200 | 5E1F | 835F | 02ED | E58B | 5D1F | CA4D | 0004 | 581E |
| 0000127220 | 4590 | 8B55 | 1EEC | D88E | EC81 | 0000 | 5657 | B81E |
| 0000127240 | A59D | D88E | 468B | 8E08 | 3206 | 2611 | 1E6B | 087E |
| 0000127260 | 8E1E | 3406 | 2611 | 872B | 00A4 | 6A50 | 6A00 | 6AFF |
| 0000127300 | FFFF | 0676 | D068 | 68A5 | 0148 | 068E | 112E | FF26 |
| 0000127320 | D436 | 9A08 | 9BAD | 0000 | 5E1F | 835F | 02ED | E58B |
| 0000127340 | 5D1F | CA4D | 0004 | 581E | 4590 | 8B55 | 1EEC | D88E |
| 0000127360 | EC81 | 000A | 5657 | B81E | A5F5 | D88E | 46C6 | 20FC |
| 0000127400 | 068E | 1150 | A126 | 08DA | 068E | 1132 | 6B26 | 7E1E |
| 0000127420 | 1E08 | 068E | 1134 | 2B26 | A487 | 3B00 | 0846 | 0374 |
| 0000127440 | 23E9 | 8E00 | 3206 | 2611 | 7EA1 | 8E08 | 5206 | 2611 |
| 0000127460 | 0639 | 08DC | 0374 | 0DE9 | C700 | F646 | 0141 | 46C7 |
| 0000127500 | 7EF8 | E9A6 | 000A | 46C7 | 43F6 | C701 | F846 | A710 |
| 0000127520 | 468B | 8906 | FA46 | 03E9 | FF00 | FA46 | 068E | 1138 |
| 0000127540 | 468B | 26FA | 0639 | 08DA | 0377 | 24E9 | 8D00 | FC46 |
| 0000127560 | 5016 | 016A | 76FF | FF08 | FA76 | 76FF | FFF8 | F676 |
| 0000127600 | 068E | 112E | FF26 | D436 | 9A08 | A4B7 | 0000 | C8E9 |
| 0000127620 | 8EFF | 3A06 | 8B11 | 0846 | 3926 | E206 | 7408 | E903 |
| 0000127640 | 0074 | 468B | 2606 | 0639 | 08E4 | 0373 | 67E9 | 8E00 |
| 0000127660 | 3C06 | 2611 | 3E83 | 0146 | 7500 | E903 | 0058 | 068E |
| 0000127700 | 1132 | A126 | 087E | 068E | 113A | 3926 | E006 | 7408 |
| 0000127720 | E903 | 0042 | 8326 | E03E | 0008 | 0375 | 37E9 | 6800 |
| 0000127740 | A628 | 4068 | 6A01 | 2601 | E2A1 | 8E08 | 3206 | 2611 |
| 0000127760 | 1E6B | 087E | 8E1E | 3406 | 2611 | 872B | 00A4 | 8E50 |
| 0000130000 | 3A06 | 2611 | 36FF | 08E4 | 068E | 112E | FF26 | D436 |
| 0000130020 | 9A08 | A542 | 0000 | 5E1F | 835F | 02ED | E58B | 5D1F |
| 0000130040 | CA4D | 0004 | 581E | 4590 | 8B55 | 1EEC | D88E | EC81 |
| 0000130060 | 0000 | 5657 | 6C9A | 6AAC | 83A5 | 0A7E | 7500 | E903 |
| 0000130100 | 01FF | 468B | E906 | 0196 | 068E | 1132 | 6B26 | 7E1E |
| 0000130120 | 1E08 | 068E | 1134 | 8B26 | A687 | 4800 | 003D | 7C00 |
| 0000130140 | E903 | 0003 | 00B8 | 8E00 | 3206 | 2611 | 1E6B | 087E |
| 0000130160 | 8E1E | 3406 | 2611 | 8789 | 00A6 | 84E9 | 8E01 | 3206 |
| 0000130200 | 2611 | 1E6B | 087E | 8E1E | 3406 | 2611 | 878B | 00A6 |
| 0000130220 | 3B40 | 7606 | 7F13 | E903 | 0003 | 76A1 | 8E13 | 3206 |
| 0000130240 | 2611 | 1E6B | 087E | 8E1E | 3406 | 2611 | 8789 | 00A6 |
| 0000130260 | 4EE9 | 8E01 | 3206 | 2611 | 1E6B | 087E | 8E1E | 3406 |
| 0000130300 | 2611 | 878B | 00A6 | 068E | 1146 | 2B26 | 0E06 | 3D00 |
| 0000130320 | 0000 | 037C | 03E9 | B800 | 0000 | 068E | 1132 | 6B26 |
| 0000130340 | 7E1E | 1E08 | 068E | 1134 | 8926 | A687 | E900 | 0111 |
| 0000130360 | 068E | 1132 | 6B26 | 7E1E | 1E08 | 068E | 1134 | 8B26 |

THU MAR 14 17:42:50 1991 MEDIT.DLL PAGE 49, LINE 2833

| | | | | | | | | |
|---|---|---|---|---|---|---|---|---|
| 0000130400 | A687 | 8E00 | 4606 | 2611 | 0603 | 000E | 063B | 1376 |
| 0000130420 | 037F | 03E9 | A100 | 1376 | 068E | 1132 | 6B26 | 7E1E |
| 0000130440 | 1E08 | 068E | 1134 | 8926 | A687 | E900 | 00D3 | 068E |
| 0000130460 | 1132 | 6B26 | 7E1E | 1E08 | 068E | 1134 | C726 | A687 |
| 0000130500 | 0000 | E900 | 00BB | 068E | 1132 | 6B26 | 7E1E | 1E08 |
| 0000130520 | 068E | 1134 | 8B26 | A487 | 8E00 | 4206 | 2611 | 0603 |
| 0000130540 | 0008 | 9A50 | 8518 | A8CA | 068E | 1146 | 2B26 | 0E06 |
| 0000130560 | 4000 | 003D | 7F00 | E903 | 002F | 068E | 1132 | 6B26 |
| 0000130600 | 7E1E | 1E08 | 068E | 1134 | 8B26 | A487 | 8E00 | 4206 |
| 0000130620 | 2611 | 0603 | 0008 | 9A50 | 8518 | AADA | 068E | 1146 |
| 0000130640 | 2B26 | 0E06 | 4000 | 03E9 | B800 | 0000 | 068E | 1132 |
| 0000130660 | 6B26 | 7E1E | 1E08 | 068E | 1134 | 8926 | A687 | E90n |
| 0000130700 | 003F | 468B | 8E08 | 3206 | 2611 | 1E6B | 087E | 8E1E |
| 0000130720 | 3406 | 2611 | 8789 | 00A6 | 26E9 | E900 | 0023 | 3D48 |
| 0000130740 | 0008 | 0376 | F1E9 | D1FF | 93E0 | FF2E | 1FA7 | 78A9 |
| 0000130760 | ADA7 | E3A7 | 20A7 | F2A8 | 08A8 | 08A9 | 76A9 | 5EA8 |
| 0000131000 | 83A8 | 067E | 7505 | E903 | 0034 | 068E | 114A | FF26 |
| 0000131020 | D836 | 2608 | 36FF | 08D6 | A068 | 8E01 | 3206 | 2611 |
| 0000131040 | 1E6B | 087E | 8E1E | 3406 | 2611 | 878B | 00A6 | D22B |
| 0000131060 | 5052 | 76A1 | 2B13 | 50C9 | 9A51 | AAD3 | 0000 | 66E9 |
| 0000131100 | 8B01 | 0646 | 02E9 | 8E01 | 3206 | 2611 | 1E6B | 087E |
| 0000131120 | 8E1E | 3406 | 2611 | 878B | 00A4 | 3D48 | 0000 | 037C |
| 0000131140 | 03E9 | B800 | 0000 | 068E | 1132 | 6B26 | 7E1E | 1E08 |
| 0000131160 | 068E | 1134 | 8926 | A487 | E900 | 00EE | 066E | 1132 |
| 0000131200 | 6B26 | 7E1E | 1E08 | 068E | 1134 | 8B26 | A487 | 4000 |
| 0000131220 | 063B | 1374 | 037F | 03E9 | A100 | 1374 | 068E | 1132 |
| 0000131240 | 6B26 | 7E1E | 1E08 | 068E | 1134 | 8926 | A487 | E900 |
| 0000131260 | 00B8 | 068E | 1132 | 6B26 | 7E1E | 1E08 | 068E | 1134 |
| 0000131300 | 8B26 | A487 | 8E00 | 3606 | 2611 | 062B | 0014 | 003D |
| 0000131320 | 7C00 | E903 | 0003 | 00B8 | 8E00 | 3206 | 2611 | 1E6B |
| 0000131340 | 087E | 8E1E | 3406 | 2611 | 8789 | 00A4 | 7BE9 | 8E00 |
| 0000131360 | 3206 | 2611 | 1E6B | 087E | 8E1E | 3406 | 2611 | 878B |
| 0000131400 | 00A4 | 068E | 1136 | 0326 | 1406 | 3B00 | 7406 | 7F13 |
| 0000131420 | E903 | 0003 | 74A1 | 8E13 | 3206 | 2611 | 1E6B | 087E |
| 0000131440 | 8E1E | 3406 | 2611 | 8789 | 00A4 | 3DE9 | 8B00 | 0846 |
| 0000131460 | 068E | 1132 | 6B26 | 7E1E | 1E08 | 068E | 1134 | 8926 |
| 0000131500 | A487 | E900 | 0024 | 21E9 | 4800 | 0375 | F8E9 | 48FE |
| 0000131520 | 0375 | 27E9 | 48FF | 0375 | 57E9 | 48FF | 0375 | 8EE9 |
| 0000131540 | 48FF | 0375 | C6E9 | E9FF | FFD9 | 7E83 | 0506 | 0375 |
| 0000131560 | 34E9 | 8E00 | 4C06 | 2611 | 36FF | 08D2 | FF26 | D036 |
| 0000131600 | 6808 | 01A0 | 068E | 1132 | 6B26 | 7E1E | 1E08 | 068E |
| 0000131620 | 1134 | 8B26 | A487 | 2B00 | 52D2 | A150 | 1374 | C92B |
| 0000131640 | 5150 | FF9A | 00FF | 9A00 | 9709 | A767 | 5F5E | ED83 |
| 0000131660 | 8B02 | 1FE5 | 4D5D | 1ECB | 9058 | 5545 | EC8B | 8E1E |
| 0000131700 | 81D8 | 00EC | 5700 | 8E56 | 4806 | 2611 | 36FF | 0012 |
| 0000131720 | FF26 | 1036 | 8D00 | 0646 | 5016 | 016A | FF9A | 00FF |
| 0000131740 | 8E00 | 5406 | 2611 | 3E83 | 0006 | 7500 | E903 | 0042 |
| 0000131760 | 068E | 1154 | A126 | 0006 | 5299 | 8B50 | 0E46 | 568B |
| 0000132000 | 2B10 | 0646 | 561B | 0508 | 0001 | D283 | 5200 | 9A50 |
| 0000132020 | FBF4 | AB9E | FA83 | 7E00 | E903 | 0013 | 037D | 08E9 |
| 0000132040 | 3D00 | 0000 | 0372 | 06E9 | BA00 | 0000 | 00B8 | E900 |
| 0000132060 | 0003 | 00B8 | 8E00 | 4606 | 2611 | 0EA3 | 8E00 | 3006 |
| 0000132100 | 2611 | 3E83 | 08DE | 7500 | E903 | 0042 | 068E | 1130 |
| 0000132120 | A126 | 08DE | 5299 | 8B50 | 1246 | 568B | 2B14 | 0A46 |
| 0000132140 | 561B | 050C | 0001 | D283 | 5200 | 9A50 | FBF4 | A896 |
| 0000132160 | FA83 | 7E00 | E903 | 0013 | 037D | 08E9 | 3D00 | 0000 |
| 0000132200 | 0372 | 06E9 | BA00 | 0000 | 00B8 | E900 | 0003 | 00B8 |
| 0000132220 | 8E00 | 3606 | 2611 | 14A3 | 8E00 | 5606 | 2611 | 3E83 |
| 0000132240 | 0678 | 7500 | E903 | 0005 | 6C9A | 42AC | 8EAB | 5806 |

THU MAR 14 17:42:50 1991 MEDIT.DLL PAGE 50, LINE 2892

| | | | | | | | | |
|---|---|---|---|---|---|---|---|---|
| 0000132260 | 2611 | 3E83 | 0016 | 7400 | E903 | 0005 | 7D9A | DB9B |
| 0000132300 | 5EAB | 835F | 02ED | E58B | 5D1F | CB4D | 581E | 4590 |
| 0000132320 | 8B55 | 1EEC | D88E | EC81 | 0000 | 5657 | 7E83 | 0006 |
| 0000132340 | 0375 | 3FE9 | FF00 | 0A76 | 76FF | 6A08 | 9A01 | AC5D |
| 0000132360 | 0000 | 76FF | FF0A | 0876 | A068 | C401 | 0C5E | 8B26 |
| 0000132400 | 2B07 | 1046 | C91B | C123 | 4603 | C410 | 0C5E | 8926 |
| 0000132420 | 2B07 | 52D2 | 8B50 | 1046 | C92B | 5150 | 6A9A | 00A9 |
| 0000132440 | E900 | 000D | 76FF | FF0A | 0876 | 006A | FF9A | 00FF |
| 0000132460 | 5E00 | 835F | 02ED | E58B | 5D1F | CB4D | 581E | 4590 |
| 0000132500 | 8B55 | 1EEC | D88E | EC81 | 000A | 5657 | 7CA1 | 890B |
| 0000132520 | FA46 | 7EA1 | 8908 | FC46 | 068E | 1132 | 6B26 | 7E1E |
| 0000132540 | 1E08 | 068E | 1134 | 8B26 | A687 | 8900 | F646 | 068E |
| 0000132560 | 1132 | 6B26 | 7E1E | 1E08 | 068E | 1134 | 8B26 | A487 |
| 0000132600 | 8900 | F846 | 068E | 1158 | C726 | 1606 | 0000 | 8E00 |
| 0000132620 | 5606 | 2611 | 3E83 | 0678 | 7400 | E903 | 0003 | 66E9 |
| 0000132640 | 8E02 | 3206 | 2611 | 1E6B | 087E | 8E1E | 3406 | 2611 |
| 0000132660 | 878B | 00A2 | 068E | 1146 | 2B26 | 0E06 | 3D00 | 0000 |
| 0000132700 | 037C | 03E9 | B800 | 0000 | 76A3 | 3D13 | 0000 | 0377 |
| 0000132720 | 06E9 | B800 | 0001 | 03E9 | B800 | 0000 | 7CA3 | 8E08 |
| 0000132740 | 3206 | 2611 | 1E6B | 087E | 8E1E | 3406 | 2611 | 878B |
| 0000132760 | 00A0 | 068E | 1136 | 2B26 | 1406 | 4000 | 003D | 7C00 |
| 0000133000 | E903 | 0003 | 00B8 | A300 | 1374 | 003D | 7700 | E903 |
| 0000133020 | 0006 | 01B8 | E900 | 0003 | 00B8 | A300 | 087E | 068E |
| 0000133040 | 1132 | 6B26 | 7E1E | 1E08 | 068E | 1134 | 8B26 | A687 |
| 0000133060 | 2B00 | 7606 | 1B13 | 23C9 | 03C1 | 7606 | 8E13 | 3206 |
| 0000133100 | 2611 | 1E6B | 087E | 8E1E | 3406 | 2611 | 8789 | 00A6 |
| 0000133120 | 068E | 1132 | 6B26 | 7E1E | 1E08 | 068E | 1134 | 8B26 |
| 0000133140 | A487 | 2B00 | 7406 | 1B13 | 23C9 | 03C1 | 7406 | 8E13 |
| 0000133160 | 3206 | 2611 | 1E6B | 087E | 8E1E | 3406 | 2611 | 8789 |
| 0000133200 | 00A4 | 468B | 39FA | 7C06 | 7408 | E903 | 0025 | 068E |
| 0000133220 | 1132 | 6B26 | 7E1E | 1E08 | 068E | 1134 | 468B | 26F6 |
| 0000133240 | 8739 | 00A6 | 0374 | 0AE9 | 8300 | 7C3E | 0008 | 0375 |
| 0000133260 | 2FE9 | FF00 | 7636 | 8E13 | 3206 | 2611 | 066B | 087E |
| 0000133300 | 051E | 00A6 | C768 | 5086 | 068E | 114A | FF26 | D836 |
| 0000133320 | 2608 | 36FF | 08D6 | 36FF | 087C | FC9A | EFAB | 83AB |
| 0000133340 | 0CC4 | 468B | 39FC | 7E06 | 7408 | E903 | 0025 | 068E |
| 0000133360 | 1132 | 6B26 | 7E1E | 1E08 | 068E | 1134 | 468B | 26F8 |
| 0000133400 | 8739 | 00A4 | 0374 | 0AE9 | 8300 | 7E3E | 0008 | 0375 |
| 0000133420 | 2FE9 | FF00 | 7436 | 8E13 | 3206 | 2611 | 066B | 087E |
| 0000133440 | 051E | 00A4 | F568 | 50AD | 068E | 114C | FF26 | D236 |
| 0000133460 | 2608 | 36FF | 08D0 | 36FF | 087E | FC9A | D1AB | 83AE |
| 0000133500 | 0CC4 | 3E83 | 087E | 7400 | E903 | 0009 | 7E83 | 00FC |
| 0000133520 | 0374 | 49E9 | 8300 | 7C3E | 0008 | 0374 | 09E9 | 8300 |
| 0000133540 | FA7E | 7400 | E903 | 0036 | 068E | 1132 | 6B26 | 7E1E |
| 0000133560 | 1E08 | 068E | 1134 | 468B | 26F6 | 8739 | 00A6 | 0374 |
| 0000133600 | 1BE9 | 8E00 | 3206 | 2611 | 1E6B | 087E | 8E1E | 3406 |
| 0000133620 | 8B11 | F846 | 3926 | A487 | 7500 | E903 | 0069 | 099A |
| 0000133640 | 0D97 | 8EAE | 5806 | 2611 | 06C7 | 0016 | 0001 | 468B |
| 0000133660 | 8EF8 | 3206 | 2611 | 1E6B | 087E | 8E1E | 3406 | 2611 |
| 0000133700 | 872B | 00A4 | 068E | 1142 | 0126 | 0806 | 8E00 | 5A06 |
| 0000133720 | 2611 | 36FF | 000C | FF26 | 0A36 | 9A00 | 1721 | 0000 |
| 0000133740 | 01A8 | 0374 | 20E9 | 8E00 | 4206 | 2611 | 36FF | 0008 |
| 0000133760 | 068E | 1144 | FF26 | 0436 | 8E00 | 2E06 | 2611 | 36FF |
| 0000134000 | 08D4 | 489A | 0017 | 5E00 | 835F | 02ED | E58B | 5D1F |
| 0000134020 | CB4D | 581E | 4590 | 8B55 | 1EEC | D88E | EC81 | 0000 |
| 0000134040 | 5657 | B81E | A671 | D88E | 468B | 8E06 | 3206 | 2611 |
| 0000134060 | 1E6B | 087E | 8E1E | 3406 | 2611 | 872B | 00A4 | 068E |
| 0000134100 | 1136 | 3B26 | 1406 | 7200 | E903 | 0006 | 00B8 | E900 |
| 0000134120 | 0082 | 068E | 1136 | A126 | 0014 | E8D1 | 462B | F706 |

THU MAR 14 17:42:50 1991 MEDIT.DLL PAGE 51, LINE 2951

| | | | | | | | | |
|---|---|---|---|---|---|---|---|---|
| 0000134140 | 3DD8 | 0000 | 037C | 03E9 | B800 | 0000 | 068E | 1132 |
| 0000134160 | 6B26 | 7E1E | 1E08 | 068E | 1134 | 8926 | A487 | 8E00 |
| 0000134200 | 3206 | 2611 | 1E6B | 087E | 8E1E | 3406 | 2611 | 87C7 |
| 0000134220 | 00A6 | 0000 | 6C9A | FCAC | 8EAF | 4C06 | 2611 | 36FF |
| 0000134240 | 08D2 | FF26 | D036 | 6808 | 01A1 | 468B | 2B06 | 52D2 |
| 0000134260 | 6A50 | 6A00 | 9A00 | AC4D | 0000 | 068E | 1158 | 8326 |
| 0000134300 | 163E | 0000 | 0374 | 05E9 | 9A00 | 9709 | AE6D | 00B8 |
| 0000134320 | E900 | 0000 | 5E1F | 835F | 02ED | E58B | 5D1F | CA4D |
| 0000134340 | 0002 | 581E | 4590 | 8B55 | 1EEC | D88E | EC81 | 0000 |
| 0000134360 | 5657 | B81E | AF54 | D88E | 468B | 8E14 | 3006 | 9911 |
| 0000134400 | F726 | DE3E | 8E08 | 3206 | 2611 | 1E6B | 087E | 8E1E |
| 0000134420 | 3406 | 2611 | 872B | 00A4 | D8F7 | 068E | 1136 | 0326 |
| 0000134440 | 1406 | 4800 | 5EC4 | 260A | 0789 | 468B | 8E12 | 5406 |
| 0000134460 | 9911 | F726 | 063E | 8E00 | 3206 | 2611 | 1E6B | 087E |
| 0000134500 | 8E1E | 3406 | 2611 | 8703 | 00A6 | 5EC4 | 2606 | 0789 |
| 0000134520 | 5E1F | 835F | 02ED | E58B | 5D1F | CA4D | 0016 | 581E |
| 0000134540 | 4590 | 8B55 | 1EEC | D88E | EC81 | 0000 | 5657 | 068E |
| 0000134560 | I15A | FF26 | 0C36 | 2600 | 36FF | 000A | 0C9A | 00AF |
| 0000134600 | A800 | 7401 | E903 | 0020 | 068E | 1142 | FF26 | 0836 |
| 0000134620 | 8E00 | 4406 | 2611 | 36FF | 0004 | 068E | 112E | FF26 |
| 0000134640 | D436 | 9A08 | AF33 | 0000 | 5F5E | ED83 | 8B02 | 1FE5 |
| 0000134660 | 4D5D | 1ECB | 9058 | 5545 | EC8B | 8E1E | 81D8 | 0DEC |
| 0000134700 | 5700 | 1E56 | 24B8 | 8EB0 | 8ED8 | 3A06 | 2611 | E2A1 |
| 0000134720 | 8E08 | 3206 | 2611 | 1E6B | 087E | 8E1E | 3406 | 2611 |
| 0000134740 | 872B | 00A4 | 068E | 115C | 3B26 | 3E06 | 7501 | E903 |
| 0000134760 | 001D | 068E | 115A | FF26 | 0C36 | 2600 | 36FF | 000A |
| 0000135000 | 236A | 006A | 006A | 006A | 006A | E69A | 00AF | 1F00 |
| 0000135020 | 5F5E | ED83 | 8B02 | 1FE5 | 4D5D | 00CB | 581E | 4590 |
| 0000135040 | 8B55 | 1EEC | D88E | EC81 | 0000 | 5657 | 468B | A30E |
| 0000135060 | 1384 | 468B | A310 | 1378 | 006A | 016A | 76FF | FF08 |
| 0000135100 | 0676 | 729A | 0019 | C700 | 9006 | 0113 | C700 | A406 |
| 0000135120 | 0108 | 9A00 | 66FA | AFC7 | 068E | 115E | 6B26 | 7E1E |
| 0000135140 | 1E08 | 068E | 1160 | 8B26 | A087 | 8B00 | 0C4E | 0E03 |
| 0000135160 | 1384 | C12B | D21B | C223 | C103 | 98A3 | FF13 | 9836 |
| 0000135200 | 9A13 | 8518 | B1CB | 0E8B | 1378 | 4E03 | 3B0A | 7DC8 |
| 0000135220 | E903 | 000C | 36FF | 1398 | 189A | 2585 | E9B2 | 0006 |
| 0000135240 | 78A1 | 0313 | 0A46 | 96A3 | 8E13 | 5E06 | 2611 | 1E6B |
| 0000135260 | 087E | 8E1E | 6006 | A111 | 1398 | 3926 | A087 | 7400 |
| 0000135300 | E903 | 005C | 068E | 115E | 6B26 | 7E1E | 1E08 | 068E |
| 0000135320 | 1160 | 8326 | A0BF | 0000 | 037F | 43E9 | 8E00 | 5E06 |
| 0000135340 | 2611 | 1E6B | 087E | 8E1E | 6006 | 2611 | 878B | 00A0 |
| 0000135360 | 5048 | 189A | 4885 | 3BB2 | 9606 | 7E13 | E903 | 0020 |
| 0000135400 | 068E | 115E | 6B26 | 7E1E | 1E08 | 068E | 1160 | 8B26 |
| 0000135420 | A087 | 4800 | 9A50 | 8518 | B25F | 96A3 | E913 | 0000 |
| 0000135440 | 76FF | FF0C | 0A76 | 76FF | FF08 | 0676 | 629A | 86BA |
| 0000135460 | 83B1 | 08C4 | 00B8 | E900 | 0000 | 5F5E | ED83 | 8B02 |
| 0000135500 | 1FE5 | 4D5D | 1ECB | 9058 | 5545 | EC8B | 8E1E | 81D8 |
| 0000135520 | 00EC | 5700 | 8E56 | 6206 | 2611 | 0EA1 | 3B00 | 0A46 |
| 0000135540 | 037F | 03E9 | 8B00 | 0A46 | 003D | 7C00 | E903 | 0003 |
| 0000135560 | 00BB | 8900 | 0A46 | 7E83 | 000C | 037C | 0DE9 | C700 |
| 0000135600 | 0C46 | 0000 | 46C7 | 000A | E900 | 0019 | 068E | 1164 |
| 0000135620 | A126 | 0014 | 3B48 | 0C46 | 037C | 08E9 | 2600 | 14A1 |
| 0000135640 | 4800 | 4685 | FF0C | 0C76 | 76FF | FF0A | 0876 | 76FF |
| 0000135660 | 9A06 | BA62 | B1B4 | C483 | B808 | 0000 | 00E9 | 5E00 |
| 0000135700 | 835F | 02ED | E58B | 5D1F | CB4D | 581E | 4590 | 8B55 |
| 0000135720 | 1EEC | D88E | EC81 | 0000 | 5657 | 3E83 | 1390 | 7500 |
| 0000135740 | E903 | 004B | 006A | 016A | 006A | 006A | 739A | 00B1 |
| 0000135760 | C700 | 9006 | 0013 | C700 | A606 | 0108 | 8E00 | 5E06 |
| 0000136000 | 2611 | 1E6B | 087E | 8E1E | 6006 | 2611 | 878B | 00A6 |

THU MAR 14 17:42:50 1991 MEDIT.DLL PAGE 52, LINE 3010

| | | | | | | | | |
|---|---|---|---|---|---|---|---|---|
| 0000136020 | 92A3 | 8E13 | 5E06 | 2611 | 1E6B | 087E | 8E1E | 6006 |
| 0000136040 | 2611 | 878B | 00A4 | 94A3 | C713 | A406 | 0008 | B800 |
| 0000136060 | 0001 | 00E9 | 5E00 | 835F | 02ED | E58B | 5D1F | CB4D |
| 0000136100 | 581E | 4590 | 8B55 | 1EEC | D88E | EC81 | 0030 | 5657 |
| 0000136120 | 46C7 | A8FA | 8C08 | FC5E | 46C7 | 01E8 | 2B01 | 89C0 |
| 0000136140 | DA46 | 4689 | 8ED8 | 6606 | 2611 | 3E83 | 91DF | 7500 |
| 0000136160 | E903 | 001D | 36FF | 08A2 | 36FF | 08A0 | 468D | 16D0 |
| 0000136200 | 9A50 | 91F5 | 0000 | C483 | 3D08 | 0000 | 0374 | 0FE9 |
| 0000136220 | 8E00 | 6806 | 2611 | 3E83 | B441 | 7500 | E903 | 003B |
| 0000136240 | 681E | 08AC | 468D | 16DC | 8D50 | D046 | 5016 | 468D |
| 0000136260 | 16EC | 6850 | 00DF | 681E | 08B4 | 36FF | 089E | 36FF |
| 0000136300 | 089C | 36FF | 08A2 | 36FF | 08A0 | 3E9A | 0092 | 8300 |
| 0000136320 | 1EC4 | 4689 | 89EC | EE56 | 08E9 | 2B00 | 89C0 | EE46 |
| 0000136340 | 4689 | C7EC | EA46 | 0000 | 3E83 | 08A6 | 7400 | E903 |
| 0000136360 | 007D | 068E | 1166 | 8326 | 9C3E | 00B3 | 0375 | 09E9 |
| 0000136400 | 8300 | D47E | 74FE | E903 | 000F | 068E | 1168 | 8326 |
| 0000136420 | 0B3E | 0092 | 0375 | 50E9 | C700 | D646 | 0000 | 76FF |
| 0000136440 | FFDA | D876 | 468D | 16D6 | FF50 | E876 | 76FF | FFFC |
| 0000136460 | FA76 | 4E8D | 16DC | 8D51 | EC4E | 5116 | 4E8D | 16D0 |
| 0000136500 | 1E51 | B468 | 6808 | 00E4 | 36FF | 089E | 36FF | 089C |
| 0000136520 | 36FF | 08A2 | 36FF | 08A0 | E39A | 0092 | 8300 | 28C4 |
| 0000136540 | 468B | E9D6 | 023C | 06E9 | B800 | 0000 | 33E9 | A102 |
| 0000136560 | 13A4 | 062B | 13A0 | 9A50 | FBC8 | B4D1 | C483 | 3D02 |
| 0000136600 | 0005 | 037F | 07E9 | 6A00 | 9A01 | FFFF | 0000 | 36FF |
| 0000136620 | 13A0 | 36FF | 139E | 36FF | 13A4 | 36FF | 13A2 | BD9A |
| 0000136640 | D8BF | 6AB4 | 9A00 | 23B5 | B4ED | 36FF | 13A0 | 36FF |
| 0000136660 | 139E | 36FF | 13A4 | 36FF | 13A2 | E79A | F4BD | 6AB4 |
| 0000136700 | 9A01 | 23B5 | B2E4 | 84A1 | 3913 | 9406 | 7513 | E903 |
| 0000136720 | 0019 | 84A1 | 8E13 | 5E06 | 2611 | 1E6B | 087E | 8E1E |
| 0000136740 | 6006 | 2611 | 8789 | 00A4 | 16E9 | A100 | 1394 | 068E |
| 0000136760 | 115E | 6B26 | 7E1E | 1E08 | 068E | 1160 | 8926 | A487 |
| 0000137000 | A100 | 1392 | 0639 | 1378 | 0375 | 1EE9 | A100 | 1378 |
| 0000137020 | 068E | 115E | 6B26 | 7E1E | 1E08 | 068E | 1160 | 8926 |
| 0000137040 | A6B7 | C700 | EA46 | 0001 | 16E9 | A100 | 1392 | 068E |
| 0000137060 | 115E | 6B26 | 7E1E | 1E08 | 068E | 1160 | 8926 | A6B7 |
| 0000137100 | A100 | 139E | 068E | 116A | A326 | 0004 | A0A1 | 8E13 |
| 0000137120 | 5E06 | 2611 | 1E6B | 087E | 8E1E | 6006 | 2611 | 872B |
| 0000137140 | 00A4 | 068E | 116C | A326 | 0008 | 068E | 116E | FF26 |
| 0000137160 | 0C36 | 2600 | 36FF | 000A | AD9A | 00B0 | A800 | 7401 |
| 0000137200 | E903 | 0020 | 068E | 116C | FF26 | 0836 | 8E00 | 6A06 |
| 0000137220 | 2611 | 36FF | 0004 | 068E | 1170 | FF26 | D436 | 9A08 |
| 0000137240 | B0D4 | 0000 | 068E | 1172 | C726 | E806 | FF01 | 9AFF |
| 0000137260 | AC6C | B4AA | 068E | 1174 | 8326 | 163E | 0000 | 0374 |
| 0000137300 | 26E9 | 8300 | EA7E | 7500 | E903 | 001D | 068E | 115E |
| 0000137320 | 6B26 | 7E1E | 1E08 | 068E | 1160 | FF26 | A6B7 | 6A00 |
| 0000137340 | 9A00 | 96C0 | B61C | C483 | 9A04 | 9B7D | B63D | 068E |
| 0000137360 | 115E | 6B26 | 7E1E | 1E08 | 068E | 1160 | FF26 | A0B7 |
| 0000137400 | 1E00 | B068 | 8D08 | F046 | 5016 | DC9A | 4CF7 | 83B6 |
| 0000137420 | 0AC4 | 026A | 468D | 16F0 | 9A50 | 9305 | B5E2 | 006A |
| 0000137440 | BA9A | 00B4 | 8E00 | 6606 | 2611 | 3E83 | B429 | 7500 |
| 0000137460 | E903 | 0009 | 7E83 | FED4 | 0374 | 0FE9 | 8E00 | 6806 |
| 0000137500 | 2611 | 3E83 | B3C8 | 7500 | E903 | 0050 | 46C7 | 01D6 |
| 0000137520 | FF00 | DA76 | 76FF | 8DD8 | D646 | 5016 | 76FF | FFE8 |
| 0000137540 | FC76 | 76FF | 8DFA | DC4E | 5116 | 4E8D | 16EC | 8D51 |
| 0000137560 | DD4E | 5116 | 681E | 08B4 | 1968 | FF01 | 9E36 | FF08 |
| 0000137600 | 9C36 | FF08 | A236 | FF08 | A036 | 9A08 | B489 | 0000 |
| 0000137620 | C483 | 8B28 | D646 | 09E9 | E900 | 0006 | 01B8 | E900 |
| 0000137640 | 0000 | 5F5E | ED83 | 8B02 | 1FE5 | 4D5D | 1ECB | 9058 |
| 0000137660 | 5545 | EC8B | 8E1E | 81D8 | 00EC | 5700 | 8356 | A63E |

THU MAR 14 17:42:50 1991 MEDIT.DLL PAGE 53, LINE 3069

| | | | | | | | | |
|---|---|---|---|---|---|---|---|---|
| 0000137700 | 0008 | 0375 | 15E9 | FF00 | A036 | FF13 | 9E36 | FF13 |
| 0000137720 | A436 | FF13 | A236 | 9A13 | BFBD | B614 | 00B8 | E900 |
| 0000137740 | 0000 | 5F5E | ED83 | 8B02 | 1FE5 | 4D5D | 1ECB | 9058 |
| 0000137760 | 5545 | EC8B | 8E1E | 81D8 | 06EC | 5700 | 1E56 | F5B8 |
| 0000140000 | 8EB0 | 8ED8 | 7606 | 2611 | 36FF | 0002 | FF26 | 0036 |
| 0000140020 | 9A00 | FFFF | 0000 | 068E | 1176 | FF26 | 0236 | 2600 |
| 0000140040 | 36FF | 0000 | 016A | FF9A | 00FF | A300 | 138E | 3E83 |
| 0000140060 | 138E | 7500 | E903 | 0057 | 8EA1 | 2B13 | 89C9 | 8A0E |
| 0000140100 | A313 | 138C | 4E89 | 89FA | FC46 | 068E | 115E | 6B26 |
| 0000140120 | 7E1E | 1E08 | 068E | 1160 | 8B26 | A487 | 8E00 | 6C06 |
| 0000140140 | 2611 | 0603 | 0008 | 8E50 | 5E06 | 2611 | 1E6B | 087E |
| 0000140160 | 8E1E | 6006 | 2611 | 878B | 00A6 | 068E | 116A | 0326 |
| 0000140200 | 0406 | 5000 | 76FF | FFFC | FA76 | 059A | 0A7A | 8EB7 |
| 0000140220 | 7606 | 2611 | 36FF | 0002 | FF26 | 0036 | 9A00 | FFFF |
| 0000140240 | 0000 | 00B8 | E900 | 0000 | 5E1F | 835F | 02ED | E58B |
| 0000140260 | 5D1F | CB4D | 581E | 4590 | 8B55 | 1EEC | D88E | EC81 |
| 0000140300 | 0014 | 5657 | A2A1 | 2B13 | 9E06 | 8913 | FC46 | A4A1 |
| 0000140320 | 2B13 | A006 | 8913 | F046 | 068E | 116A | A126 | 0004 |
| 0000140340 | 96A3 | 8E13 | 5E06 | 2611 | 1E6B | 087E | 8E1E | 6006 |
| 0000140360 | 2611 | 878B | 00A4 | 068E | 116C | 0326 | 0806 | A300 |
| 0000140400 | 1398 | 068E | 1176 | FF26 | 0236 | 2600 | 36FF | 0000 |
| 0000140420 | 429A | 00B7 | 8E00 | 7606 | 2611 | 36FF | 0002 | FF26 |
| 0000140440 | 0036 | 6A00 | 9A01 | B757 | 0000 | 8EA3 | 8313 | 8E3E |
| 0000140460 | 0013 | 0375 | E8E9 | A100 | 138E | C92B | 0E89 | 138A |
| 0000140500 | 8CA3 | 8913 | EC4E | 4689 | 6AEE | 9A01 | BD39 | B888 |
| 0000140520 | C483 | 6A02 | 9A00 | 23B5 | B890 | 76FF | 9AF0 | FBC8 |
| 0000140540 | B8B5 | C483 | 3D02 | 0005 | 037F | 07E9 | 6A00 | 9A01 |
| 0000140560 | B651 | 0000 | 36FF | 1398 | 36FF | 1396 | 76FF | FFEE |
| 0000140600 | EC76 | 059A | BC7A | 6AB8 | 9A01 | 23B5 | B8FB | 98A1 |
| 0000140620 | 8E13 | 5E06 | 2611 | 1E6B | 087E | 8E1E | 6006 | 2611 |
| 0000140640 | 872B | 00A4 | 4603 | 50F0 | 96A1 | 8E13 | 5E06 | 2611 |
| 0000140660 | 1E6B | 087E | 8E1E | 6006 | 2611 | 872B | 00A6 | 4603 |
| 0000140700 | 50FC | 76FF | FF08 | 0676 | 629A | 09BA | 83B9 | 08C4 |
| 0000140720 | 06C7 | 08A6 | 0001 | 6C9A | 1DAC | 8EB9 | 7406 | 2611 |
| 0000140740 | 3E83 | 0016 | 7400 | E903 | 0005 | 7D9A | 3E9B | 8EB9 |
| 0000140760 | 5E06 | 2611 | 1E6B | 087E | 8E1E | 6006 | 2611 | B7FF |
| 0000141000 | 00A0 | 681E | 08BF | 468D | 16F2 | 9A50 | F7DC | B94D |
| 0000141020 | C483 | 6A0A | 8D02 | F246 | 5016 | 059A | BD93 | 8EB7 |
| 0000141040 | 7606 | 2611 | 36FF | 0002 | FF26 | 0036 | 9A00 | B7CE |
| 0000141060 | 0000 | 006A | A09A | 00B8 | B800 | 0000 | 00E9 | 5E00 |
| 0000141100 | 835F | 02ED | E58B | 5D1F | CB4D | 581E | 4590 | 8B55 |
| 0000141120 | 1EEC | D88E | EC81 | 0006 | 5657 | 7E83 | 0006 | 0375 |
| 0000141140 | 09E9 | B800 | 0144 | A0BA | E9B9 | 0006 | 43B8 | BA01 |
| 0000141160 | B72F | 4689 | 89FA | FC56 | 3E83 | 08A6 | 7400 | E903 |
| 0000141200 | 0003 | A2E9 | A100 | 139E | 80A3 | A113 | 13A0 | 068E |
| 0000141220 | 115E | 6B26 | 7E1E | 1E08 | 068E | 1160 | 2B26 | A487 |
| 0000141240 | 3D00 | 0000 | 037C | 03E9 | B800 | 0000 | 82A3 | A113 |
| 0000141260 | 13A2 | 86A3 | A113 | 13A4 | 068E | 115E | 6B26 | 7E1E |
| 0000141300 | 1E08 | 068E | 1160 | 2B26 | A487 | 8E00 | 7806 | 2611 |
| 0000141320 | 0E8B | 08DC | 3B49 | 7FC1 | E903 | 0002 | C18B | 88A3 |
| 0000141340 | 8313 | 883E | 0013 | 037D | 36E9 | FF00 | FC76 | 76FF |
| 0000141360 | A1FA | 1388 | 062B | 1382 | 068E | 117A | F726 | DA26 |
| 0000141400 | 2B08 | 8006 | 0313 | 8606 | 4013 | FF50 | 8236 | FF13 |
| 0000141420 | 8036 | 8E13 | 7006 | 2611 | 36FF | 08D4 | 429A | 00A7 |
| 0000141440 | 8B00 | 0646 | A6A3 | 5E08 | 835F | 02ED | E58B | 5D1F |
| 0000141460 | CB4D | 581E | 4590 | 8B55 | 1EEC | D88E | EC81 | 0000 |
| 0000141500 | 5657 | 068E | 115E | 6B26 | 7E1E | 1E08 | 068E | 1160 |
| 0000141520 | 8326 | A0BF | 0000 | 0374 | 09E9 | C700 | 9C06 | 0013 |
| 0000141540 | E900 | 0035 | 068E | 115E | 6B26 | 7E1E | 1E08 | 068E |

THU MAR 14 17:42:50 1991 MEDIT.DLL PAGE 54, LINE 3128

| | | | | | | | | |
|---|---|---|---|---|---|---|---|---|
| 0000141560 | 1160 | 8B26 | A487 | 0300 | 0C46 | 068E | 115E | 6B26 |
| 0000141600 | 7E1E | 1E08 | 068E | 1160 | 8B26 | A08F | 4900 | C12B |
| 0000141620 | D21B | C223 | C103 | 9CA3 | FF13 | 9C36 | 9A13 | 8518 |
| 0000141640 | BAF6 | 068E | 115E | 6B26 | 7E1E | 1E08 | 068E | 1160 |
| 0000141660 | 8B26 | A68F | 0300 | 0A4E | C83B | 0373 | 0CE9 | FF00 |
| 0000141700 | 9C36 | 9A13 | 8518 | B87E | 16E9 | 8E00 | 5E06 | 2611 |
| 0000141720 | 1E6B | 087E | 8E1E | 6006 | 2611 | 878B | 00A6 | 4603 |
| 0000141740 | A30A | 139A | 98A1 | 3913 | 9C06 | 7E13 | E903 | 0018 |
| 0000141760 | 96A1 | 3913 | 9A06 | 7F13 | E903 | 0083 | 98A1 | 3913 |
| 0000142000 | 9C06 | 7413 | E903 | 0077 | 96A1 | A313 | 139E | 98A1 |
| 0000142020 | A313 | 13A0 | 9AA1 | A313 | 13A2 | 9CA1 | A313 | 13A4 |
| 0000142040 | 9EA1 | A313 | 1380 | 98A1 | 8E13 | 5E06 | 2611 | 1E6B |
| 0000142060 | 087E | 8E1E | 6006 | 2611 | 872B | 00A4 | 003D | 7C00 |
| 0000142100 | E903 | 0003 | 00B8 | A300 | 1382 | A2A1 | A313 | 1386 |
| 0000142120 | 9CA1 | 8E13 | 5E06 | 2611 | 1E6B | 087E | 8E1E | 6006 |
| 0000142140 | 2611 | 872B | 00A4 | 068E | 1178 | 8B26 | DC0E | 4908 |
| 0000142160 | C13B | 037F | 02E9 | 8B00 | A3C1 | 1388 | 74E9 | A100 |
| 0000142200 | 139A | 9EA3 | A113 | 139C | A0A3 | A113 | 1396 | A2A3 |
| 0000142220 | A113 | 1398 | A4A3 | A113 | 139E | 80A3 | A113 | 13A0 |
| 0000142240 | 068E | 115E | 6B26 | 7E1E | 1E08 | 068E | 1160 | 2B26 |
| 0000142260 | A487 | 3D00 | 0000 | 037C | 03E9 | B800 | 0000 | 82A3 |
| 0000142300 | A113 | 13A2 | 86A3 | A113 | 13A4 | 068E | 115E | 6B26 |
| 0000142320 | 7E1E | 1E08 | 068E | 1160 | 2B26 | A487 | 8E00 | 7806 |
| 0000142340 | 2611 | 0E8B | 08DC | 3B49 | 7FC1 | E903 | 0002 | C18B |
| 0000142360 | 88A3 | A113 | 13A0 | 068E | 115E | 6B26 | 7E1E | 1E08 |
| 0000142400 | 068E | 1160 | 2B26 | A487 | 3D00 | 0000 | 037C | 06E9 |
| 0000142420 | C700 | 8006 | 0013 | A100 | 13A4 | 068E | 115E | 6B26 |
| 0000142440 | 7E1E | 1E08 | 068E | 1160 | 2B26 | A487 | 8E00 | 6406 |
| 0000142460 | 2611 | 0E8B | 0014 | 3B49 | 77C1 | E903 | 000B | 068E |
| 0000142500 | 1162 | A126 | 000E | 86A3 | 6813 | BCBB | 4368 | 8E01 |
| 0000142520 | 7A06 | 2611 | DAA1 | F708 | 8226 | 0313 | 8006 | 5013 |
| 0000142540 | 006A | 006A | 068E | 1170 | FF26 | D436 | 9A08 | BCEC |
| 0000142560 | 0000 | 80A1 | 3913 | 8606 | 7E13 | E903 | 000C | 82A1 |
| 0000142600 | 3913 | 8806 | 7F13 | E903 | 0036 | F168 | 68BC | 0144 |
| 0000142620 | 88A1 | 2B13 | 8206 | 8E13 | 7A06 | 2611 | 26F7 | 08DA |
| 0000142640 | 062B | 1380 | 0603 | 1386 | 5040 | 36FF | 1382 | 36FF |
| 0000142660 | 1380 | 068E | 1170 | FF26 | D436 | 9A08 | BD24 | 0000 |
| 0000142700 | 9768 | 68B9 | 0143 | 068E | 1178 | A126 | 08DC | 062B |
| 0000142720 | 1388 | 068E | 117A | F726 | DA26 | 2B08 | 8606 | 4813 |
| 0000142740 | FF50 | 8836 | A113 | 1386 | 5040 | 068E | 1170 | FF26 |
| 0000142760 | D436 | 9A08 | BA4D | 0000 | 00B8 | E900 | 0000 | 5F5E |
| 0000143000 | ED83 | 8B02 | 1FE5 | 4D5D | 1ECB | 9058 | 5545 | EC8B |
| 0000143020 | 8E1E | 81D8 | 00EC | 5700 | 8356 | A63E | 0008 | 0374 |
| 0000143040 | 06E9 | B800 | 0000 | 83E9 | A100 | 139E | 80A3 | A113 |
| 0000143060 | 13A0 | 062B | 1384 | 003D | 7C00 | E903 | 0003 | 00B8 |
| 0000143100 | A300 | 1382 | A2A1 | A313 | 1386 | 068E | 1178 | A126 |
| 0000143120 | 08DC | 8B48 | A40E | 2B13 | 940E | 3B13 | 7FC1 | E903 |
| 0000143140 | 0002 | C18B | 88A3 | 8313 | 067E | 7500 | E903 | 0036 |
| 0000143160 | 7A68 | 68BC | 0143 | 88A1 | 2B13 | 8206 | 8E13 | 7A06 |
| 0000143200 | 2611 | 26F7 | 08DA | 062B | 1380 | 0603 | 1386 | 5040 |
| 0000143220 | 36FF | 1382 | 36FF | 1380 | 068E | 1170 | FF26 | D436 |
| 0000143240 | 9A08 | BC9E | 0000 | 06C7 | 08A6 | 0000 | 5F5E | ED83 |
| 0000143260 | 8B02 | 1FE5 | 4D5D | 1ECB | 9058 | 5545 | EC8B | 8E1E |
| 0000143300 | 81D8 | 08EC | 5700 | 1E56 | A1B8 | 8EBD | FFD8 | 0876 |
| 0000143320 | 189A | 0E85 | 89BE | FA46 | 76FF | 9A0C | 8518 | BE25 |
| 0000143340 | 4689 | 8EF8 | 7206 | 2611 | 36FF | 01E8 | 5568 | 68AE |
| 0000143360 | 0018 | 049A | 6820 | 83BE | 06C4 | 468B | 3B06 | FA46 |
| 0000143400 | 037F | 03E9 | 8B00 | FA46 | 4689 | 8B06 | 0A46 | 463B |
| 0000143420 | 7FF8 | E903 | 0003 | 468B | 89F8 | 0A46 | 468B | 390C |

THU MAR 14 17:42:50 1991 MEDIT.DLL PAGE 55, LINE 3187

| | | | | | | | | |
|---|---|---|---|---|---|---|---|---|
| 0000143440 | 0846 | 037F | 7FE9 | 8B00 | FA46 | 4639 | 7406 | E903 |
| 0000143460 | 000B | 76FF | 9A08 | 6CBD | BE7A | 0FE9 | FF00 | 0876 |
| 0000143500 | 006A | 468B | 4006 | 9A50 | 7EEB | BE9D | 46C7 | 01FC |
| 0000143520 | E900 | 0003 | 46FF | 8BFC | 0846 | 462B | 3B0C | FC46 |
| 0000143540 | 037F | 0DE9 | 8B00 | 0C46 | 5040 | BD9A | B16C | E9BE |
| 0000143560 | FFE2 | 7E83 | 000A | 0374 | 0BE9 | FF00 | 0C76 | BD9A |
| 0000143600 | C66C | E9BE | 001D | 76FF | FF0C | 0A76 | 468B | 2BF8 |
| 0000143620 | 0A46 | 9A50 | 7EEB | BED1 | 76FF | FF0C | F876 | 9E9A |
| 0000143640 | F182 | E9BE | 004B | 468B | 39FA | 0646 | 0374 | 2DE9 |
| 0000143660 | FF00 | 0C76 | 76FF | 8B0A | 0646 | 462B | 500A | EB9A |
| 0000143700 | 097E | 8BBF | 0A46 | 4639 | 7F06 | E903 | 000D | 76FF |
| 0000143720 | FF0C | 0676 | 006A | EB9A | 1F7E | E9BF | 0013 | 76FF |
| 0000143740 | FF0C | 0A76 | 468B | 2B06 | 0A46 | 5040 | EB9A | 267E |
| 0000143760 | 6ABF | 9A01 | BD39 | BAD0 | C483 | B802 | 0000 | 00E9 |
| 0000144000 | 1F00 | 5F5E | ED83 | 8B02 | 1FE5 | 4D5D | 08CA | 1E00 |
| 0000144020 | 9058 | 5545 | EC8B | 8E1E | 81D8 | 0AEC | 5700 | FF56 |
| 0000144040 | 0876 | 189A | 8D85 | 2BBF | 0646 | 8940 | FC46 | 468B |
| 0000144060 | 3908 | 0C46 | 0374 | 06E9 | 8B00 | FC46 | 43E9 | 8B00 |
| 0000144100 | 0846 | 8940 | FA46 | 03E9 | FF00 | FA46 | 468B | 390C |
| 0000144120 | FA46 | 037C | 1BE9 | FF00 | FA76 | 189A | 9985 | 40BF |
| 0000144140 | 4689 | FFF6 | FA76 | 189A | 0385 | 40BE | 4601 | E9FC |
| 0000144160 | FFD7 | 468B | 03FC | 0A46 | 8940 | F846 | 468B | E9F8 |
| 0000144200 | 0000 | 5F5E | ED83 | 8B02 | 1FE5 | 4D5D | 1ECB | 9058 |
| 0000144220 | 5545 | EC8B | 8E1E | 81D8 | 12EC | 5700 | 1E56 | F9B8 |
| 0000144240 | 8EBD | C7D8 | EE46 | 0000 | 76FF | 9A0C | 8518 | BFE9 |
| 0000144260 | 4689 | FFF4 | 0876 | 189A | 5585 | 89BF | FA46 | 468B |
| 0000144300 | 3B06 | FA46 | 037F | 03E9 | 8B00 | FA46 | 4689 | 8B06 |
| 0000144320 | 0A46 | 463B | 7FF4 | E903 | 0003 | 468B | 89F4 | 0A46 |
| 0000144340 | 76FF | FF08 | 0676 | 76FF | FF0C | 0A76 | 3F9A | BBBF |
| 0000144360 | 83C0 | 08C4 | 0205 | 5000 | 681E | 138E | 016A | FF9A |
| 0000144400 | 00FF | A100 | 138E | C92B | 0E89 | 138A | 8CA3 | 8913 |
| 0000144420 | F04E | 4689 | 89F2 | F64E | 4689 | 8BF8 | 0C46 | 4639 |
| 0000144440 | 7408 | E903 | 00A2 | 068E | 115E | 6B26 | 7E1E | 1E08 |
| 0000144460 | 068E | 1160 | C426 | AE9F | 8B00 | 0C76 | C68B | E6D1 |
| 0000144500 | F003 | E6D1 | 8B26 | 0240 | 0B26 | 7500 | E903 | 0049 |
| 0000144520 | 468B | 2B06 | 0A46 | 5040 | 068E | 115E | 6B26 | 7E1E |
| 0000144540 | 1E08 | 068E | 1160 | C426 | AE9F | 8B00 | 0C76 | C68B |
| 0000144560 | E6D1 | F003 | E6D1 | 8B26 | 2600 | 508B | 0302 | 0A46 |
| 0000144600 | 5052 | 76FF | FFF2 | F076 | 709A | 5DF5 | 83C1 | 0AC4 |
| 0000144620 | 468B | 2B06 | 0A46 | 4601 | FFF0 | F046 | 468B | 39FA |
| 0000144640 | 0646 | 0374 | 17E9 | FF00 | F04E | 5EC4 | 26F0 | 07C6 |
| 0000144660 | FF0A | F046 | 5EC4 | 26F0 | 07C6 | E900 | 0007 | 5EC4 |
| 0000144700 | 26F0 | 07C6 | E900 | 01CB | 068E | 115E | 6B26 | 7E1E |
| 0000144720 | 1E08 | 068E | 1160 | C426 | AE9F | 8B00 | 0C76 | C68B |
| 0000144740 | E6D1 | F003 | E6D1 | 8B26 | 0240 | 0B26 | 7500 | E903 |
| 0000144760 | 0049 | 468B | 2BF4 | 0A46 | 5040 | 068E | 115E | 6B26 |
| 0000145000 | 7E1E | 1E08 | 068E | 1160 | C426 | AE9F | 8B00 | 0C76 |
| 0000145020 | C68B | E6D1 | F003 | E6D1 | 8B26 | 2600 | 508B | 0302 |
| 0000145040 | 0A46 | 5052 | 76FF | FFF2 | F076 | 709A | EFF5 | 83C1 |
| 0000145060 | 0AC4 | 468B | 2BF4 | 0A46 | 4601 | C4F0 | F05E | 46FF |
| 0000145100 | 26F0 | 07C6 | 8B0A | F446 | 462B | 400A | 4601 | 8BEE |
| 0000145120 | 0C46 | 8940 | FC46 | 03E9 | FF00 | FC46 | 468B | 39FC |
| 0000145140 | 0846 | 037F | 8FE9 | 8E00 | 5E06 | 2611 | 1E6B | 087E |
| 0000145160 | 8E1E | 6006 | 2611 | 9FC4 | 00AE | 768B | 8BFC | D1C6 |
| 0000145200 | 03E6 | D1F0 | 26E6 | 408B | 2602 | 000B | 0375 | 55E9 |
| 0000145220 | 8E00 | 5E06 | 2611 | 1E6B | 087E | 8E1E | 6006 | 2611 |
| 0000145240 | 9FC4 | 00AE | 768B | 8BFC | D1C6 | 03E6 | D1F0 | 26E6 |
| 0000145260 | 70FF | 2602 | 30FF | 76FF | FFF2 | F076 | F89A | FDF4 |
| 0000145300 | 83C1 | 08C4 | 76FF | FFF2 | F076 | 589A | 0EF5 | 83C2 |

THU MAR 14 17:42:50 1991 MEDIT.DLL PAGE 56, LINE 3246

| | | | | | | | | |
|---|---|---|---|---|---|---|---|---|
| 0000145320 | 04C4 | 4601 | FFEE | F276 | 76FF | 9AF0 | F558 | C283 |
| 0000145340 | C483 | 0104 | F046 | 5EC4 | FFF0 | F046 | C626 | 0A07 |
| 0000145360 | 46FF | E9EE | FF63 | 068E | 115E | 6B26 | 7E1E | 1E08 |
| 0000145400 | 068E | 1160 | C426 | AE9F | 8B00 | 0876 | C68B | E6D1 |
| 0000145420 | F003 | E6D1 | 8B26 | 0240 | 0B26 | 7500 | E903 | 0044 |
| 0000145440 | 468B | 4006 | 8E50 | 5E06 | 2611 | 1E6B | 087E | 8E1E |
| 0000145460 | 6006 | 2611 | 9FC4 | 00AE | 768B | 8B08 | D1C6 | 03E6 |
| 0000145500 | D1F0 | 26E6 | 70FF | 2602 | 30FF | 76FF | FFF2 | F076 |
| 0000145520 | 709A | DEF5 | 83BF | 0AC4 | 468B | 0106 | F046 | 468B |
| 0000145540 | 0106 | EE46 | 46FF | FFF0 | EE46 | 468B | 39FA | 0646 |
| 0000145560 | 0374 | 17E9 | FF00 | F04E | 5EC4 | 26F0 | 07C6 | FF0A |
| 0000145600 | F046 | 5EC4 | 26F0 | 07C6 | E900 | 0007 | 5EC4 | 26F0 |
| 0000145620 | 07C6 | 8E00 | 7606 | 2611 | 36FF | 0002 | FF26 | 0036 |
| 0000145640 | 9A00 | B841 | 0000 | 068E | 1176 | FF26 | 0236 | 2600 |
| 0000145660 | 36FF | 0000 | FF9A | 00FF | 8E00 | 7606 | 2611 | 36FF |
| 0000145700 | 0002 | FF26 | 0036 | 6A00 | FF00 | 8E36 | 6A13 | 6801 |
| 0000145720 | 0100 | FF9A | 00FF | 8E00 | 7606 | 2511 | 36FF | 0002 |
| 0000145740 | FF26 | 0036 | 9A00 | B95E | 0000 | 00B8 | E900 | 0000 |
| 0000145760 | 5E1F | 835F | 02ED | E58B | 5D1F | CA4D | 0008 | 581E |
| 0000146000 | 4590 | 8B55 | 1EEC | D88E | EC81 | 0000 | 5657 | A6A1 |
| 0000146020 | C408 | 065E | 8926 | 8E07 | 7606 | 2611 | 36FF | 0002 |
| 0000146040 | FF26 | 0036 | 6A00 | 1E01 | 7A68 | 9A13 | FFFF | 0000 |
| 0000146060 | 5EC4 | 260A | 0789 | 5F5E | ED83 | 8B02 | 1FE5 | 4D5D |
| 0000146100 | 1ECB | 9058 | 5545 | EC8B | 8E1E | 81D8 | 06EC | 5700 |
| 0000146120 | 8D56 | FA46 | 5016 | 468D | 16FC | 9A50 | C32E | C01F |
| 0000146140 | C483 | FF08 | 0876 | 76FF | 6806 | 0192 | 016A | DD68 |
| 0000146160 | 8305 | FC7E | 1B01 | 25C0 | 4000 | 00B9 | 8B40 | 52D0 |
| 0000146200 | 9A51 | 9F85 | 000D | 76FF | FF08 | 0676 | 9268 | 6A01 |
| 0000146220 | 6801 | 05DF | 7E83 | 01FC | C01B | 0025 | B940 | 4000 |
| 0000146240 | D08B | 5152 | F89A | 00C3 | FF00 | 0876 | 76FF | 6806 |
| 0000146260 | 0192 | 016A | DE68 | 8305 | FA7E | 1B01 | 25C0 | 4000 |
| 0000146300 | 00B9 | 8B40 | 52D0 | 9A51 | C3B2 | 0000 | 00B8 | E900 |
| 0000146320 | 0000 | 5F5E | ED83 | 8B02 | 1FE5 | 4D5D | 1ECB | 9058 |
| 0000146340 | 5545 | EC8B | 8E1E | 81D8 | 00EC | 5700 | 5E56 | 835F |
| 0000146360 | 02ED | E58B | 5D1F | CB4D | 581E | 4590 | 8B55 | 1EEC |
| 0000146400 | D88E | EC81 | 0004 | 5657 | B81E | BFCF | D88E | 068E |
| 0000146420 | 117C | FF26 | E836 | 6801 | BE1D | 1868 | 9A00 | 2004 |
| 0000146440 | C458 | C483 | 9A06 | CA98 | C38E | 3E83 | 08E6 | 7500 |
| 0000146460 | E903 | 0006 | FFB8 | E9FF | 0130 | 068E | 117E | 8B26 |
| 0000146500 | E21E | 8B08 | D1C3 | 03E3 | D1D8 | 8EE3 | 8006 | 2611 |
| 0000146520 | 366B | 087E | 8E1E | 8206 | 2611 | B4C4 | 00AE | 8B26 |
| 0000146540 | FC40 | 0B26 | FA40 | 0374 | 15E9 | 1E00 | CF68 | FF08 |
| 0000146560 | 0A76 | 76FF | 9AD8 | F4F8 | C4DF | C483 | E908 | 00E4 |
| 0000146600 | 068E | 117E | 8B26 | E21E | 8B08 | D1C3 | 03E3 | D1D8 |
| 0000146620 | 8EE3 | 8006 | 2611 | 366B | 087E | 8E1E | 8206 | 2611 |
| 0000146640 | B4C4 | 00AE | FF26 | FC70 | FF26 | FA70 | 589A | 27F5 |
| 0000146660 | 83C5 | 04C4 | 4689 | 8BFC | 0646 | 4639 | 7CFC | E903 |
| 0000146700 | 0052 | 068E | 117E | 8B26 | E21E | 8BU8 | D1C3 | 03E3 |
| 0000146720 | D1D8 | 8EE3 | 8006 | 2611 | 366B | 087E | 8E1E | 8206 |
| 0000146740 | 2611 | B4C4 | 00AE | FF26 | FC70 | FF26 | FA70 | 76FF |
| 0000146760 | FF0A | 0876 | F89A | 84F4 | 83C5 | D8C4 | 5EC4 | 8B08 |
| 0000147000 | FC76 | C626 | 0A00 | 5E8B | C4FC | 0876 | C626 | 0140 |
| 0000147020 | E900 | 0050 | 468B | 8906 | FC46 | 468B | 4806 | 8E50 |
| 0000147040 | 7E06 | 2611 | 1E8B | 08E2 | C38B | E3D1 | D803 | E3D1 |
| 0000147060 | 068E | 1180 | 6B26 | 7E36 | 1E08 | 068E | 1182 | C426 |
| 0000147100 | AEB4 | 2600 | 70FF | 26FC | 70FF | FFFA | 0A76 | 76FF |
| 0000147120 | 9A08 | F570 | C450 | C483 | 8B0A | 065E | 76C4 | 2608 |
| 0000147140 | 40C6 | 00FF | 00B8 | E900 | 0000 | 5E1F | 835F | 02ED |
| 0000147160 | E58B | 5D1F | CA4D | 0006 | 581E | 4590 | 8B55 | 1EEC |

THU MAR 14 17:42:50 1991 MEDIT.DLL PAGE 57, LINE 3305

| | | | | | | | | |
|---|---|---|---|---|---|---|---|---|
| 0000147200 | D88E | EC81 | 0028 | 5657 | B81E | C43A | D88E | 46C7 |
| 0000147220 | EEFA | 8C08 | FC5E | 46C7 | 01F2 | 2B01 | 89C0 | E246 |
| 0000147240 | 4689 | 8EE0 | 8406 | 2611 | 3E83 | B65C | 7500 | E903 |
| 0000147260 | 001D | 36FF | 08D8 | 36FF | 08D6 | 468D | 16D8 | 9A50 |
| 0000147300 | B3B2 | 0000 | C483 | 3D08 | 0000 | 0374 | 0FE9 | 8E00 |
| 0000147320 | 8606 | 2611 | 3E83 | C6EC | 7500 | E903 | 003B | 681E |
| 0000147340 | 08F2 | 468D | 16E4 | 8D50 | D846 | 5016 | 468D | 16F6 |
| 0000147360 | 6850 | 00B0 | 681E | 0938 | 36FF | 08D4 | 36FF | 08D2 |
| 0000147400 | 36FF | 08D8 | 36FF | 08D6 | FB9A | 00B3 | 8300 | 1EC4 |
| 0000147420 | 4689 | 89F6 | F856 | 08E9 | 2B00 | 89C0 | F846 | 4689 |
| 0000147440 | 8EF6 | 7C06 | 2611 | 36FF | 01E8 | 4868 | 68C4 | 0018 |
| 0000147460 | 049A | 6B20 | 83C6 | 06C4 | 989A | ECCA | 89C8 | F446 |
| 0000147500 | 7E83 | FEF4 | 0374 | D4E9 | 8E00 | 8406 | 2611 | 3E83 |
| 0000147520 | C6D4 | 7500 | E903 | 0045 | 7E83 | FEDC | 0375 | 3CE9 |
| 0000147540 | 1E00 | F668 | 8D08 | E446 | 5016 | 468D | 16F6 | 8D50 |
| 0000147560 | D846 | 5016 | 681E | 0938 | B968 | FF00 | D436 | FF08 |
| 0000147600 | D236 | FF08 | D836 | FF08 | D636 | 1E08 | 0B68 | 6809 |
| 0000147620 | C79D | A068 | 9AC7 | C7A3 | 0000 | C483 | 8E26 | 8406 |
| 0000147640 | 2611 | 3E83 | C75D | 7500 | E903 | 0009 | 7E83 | FEDC |
| 0000147660 | 0374 | 0FE9 | 8E00 | 8606 | 2611 | 3E83 | C7C9 | 7500 |
| 0000147700 | E903 | 0050 | 46C7 | FEDE | FFFF | E276 | 76FF | 8DE0 |
| 0000147720 | DE46 | 5016 | 76FF | FFF2 | FC76 | 76FF | 8DFA | E44E |
| 0000147740 | 5116 | 4E8D | 16F6 | 8D51 | D84E | 5116 | 681E | 0938 |
| 0000147760 | BA68 | FF00 | D436 | FF08 | D236 | FF08 | D836 | FF08 |
| 0000150000 | D636 | 9A08 | C811 | 0000 | C483 | 8B28 | DE46 | 49E9 |
| 0000150020 | E903 | 0006 | FEB8 | E9FF | 0340 | DAE9 | 8300 | F47E |
| 0000150040 | 74FC | E903 | 00D1 | 068E | 1184 | 8326 | B13E | 00C7 |
| 0000150060 | 0375 | 45E9 | 8300 | DC7E | 75FE | E903 | 003C | 681E |
| 0000150100 | 0913 | 468D | 16E4 | 8D50 | F646 | 5016 | 468D | 16D8 |
| 0000150120 | 1E50 | 3868 | 6809 | 00BC | 36FF | 08D4 | 36FF | 08D2 |
| 0000150140 | 36FF | 08D8 | 36FF | 08D6 | 681E | 092D | F568 | 688E |
| 0000150160 | 8EF8 | FB9A | 008E | 8300 | 26C4 | 068E | 1184 | 8326 |
| 0000150200 | 383E | 00C8 | 0375 | 09E9 | 8300 | DC7E | 74FE | E903 |
| 0000150220 | 000F | 068E | 1186 | 8326 | 503E | 00C8 | 0375 | 50E9 |
| 0000150240 | C700 | DE46 | FFFC | 76FF | FFE2 | E076 | 468D | 16DE |
| 0000150260 | FF50 | F276 | 76FF | FFFC | FA76 | 4E8D | 16E4 | 8D51 |
| 0000150300 | F64E | 5116 | 4E8D | 16D8 | 1E51 | 3868 | 6809 | 00BD |
| 0000150320 | 36FF | 08D4 | 36FF | 08D2 | 36FF | 08D8 | 36FF | 08D6 |
| 0000150340 | 989A | 00C8 | 8300 | 28C4 | 468B | E9DE | 026C | 06E9 |
| 0000150360 | B800 | FFFC | 63E9 | 8302 | E63E | 0008 | 0375 | 7DE9 |
| 0000150400 | 8E00 | 8406 | 2611 | 3E83 | C5DA | 7500 | E903 | 0009 |
| 0000150420 | 7E83 | FEDC | 0374 | 0FE9 | 8E00 | 8606 | 2611 | 3E83 |
| 0000150440 | B674 | 7500 | E903 | 0050 | 46C7 | FFDE | FFFF | E276 |
| 0000150460 | 76FF | 8DE0 | DE46 | 5016 | 76FF | FFF2 | FC76 | 76FF |
| 0000150500 | 8DFA | E44E | 5116 | 4E8D | 16F6 | 8D51 | D84E | 5116 |
| 0000150520 | 681E | 0938 | C268 | FF00 | D436 | FF08 | D236 | FF08 |
| 0000150540 | D836 | FF08 | D636 | 9A08 | B6BC | 0000 | C483 | 8B28 |
| 0000150560 | DE46 | E5E9 | E901 | 0006 | FFB8 | E9FF | 01DC | 068E |
| 0000150600 | 117E | 8B26 | E21E | 8B08 | D1C3 | 03E3 | D1D8 | 8EE3 |
| 0000150620 | 8006 | 2611 | 366B | 087E | 8E1E | 8206 | 2611 | B4C4 |
| 0000150640 | 00AE | 8B26 | FC40 | 0B26 | FA40 | 0374 | 15E9 | 1E00 |
| 0000150660 | 3568 | FF09 | 1076 | 76FF | 9A0E | F4F8 | C923 | C483 |
| 0000150700 | E908 | 00E4 | 068E | 117E | 8B26 | E21E | 8B08 | D1C3 |
| 0000150720 | 03E3 | D1D8 | 8EE3 | 8006 | 2611 | 366B | 087E | 8E1E |
| 0000150740 | 8206 | 2611 | B4C4 | 00AE | FF26 | FC70 | FF26 | FA70 |
| 0000150760 | 589A | 6BF5 | 83C9 | 04C4 | 4689 | 8BF0 | F046 | 4639 |
| 0000151000 | 7F12 | E903 | 0052 | 068E | 117E | 8B26 | E21E | 8B08 |
| 0000151020 | D1C3 | 03E3 | D1D8 | 8EE3 | 8006 | 2611 | 366B | 087E |
| 0000151040 | 8E1E | 8206 | 2611 | B4C4 | 00AE | FF26 | FC70 | FF26 |

THU MAR 14 17:42:50 1991 MEDIT.DLL PAGE 58, LINE 3364

| | | | | | | | | |
|---|---|---|---|---|---|---|---|---|
| 0000151060 | FA70 | 76FF | FF10 | 0E76 | F89A | A8F4 | 83C4 | 08C4 |
| 0000151100 | 5EC4 | 8B0E | F076 | C626 | 0A00 | 5E8B | C4F0 | 0E76 |
| 0000151120 | C626 | 0140 | E900 | 0050 | 468B | 8912 | F046 | 468B |
| 0000151140 | 4812 | 8E50 | 7E06 | 2611 | 1E8B | 08E2 | C33B | E3D1 |
| 0000151160 | D803 | E3D1 | 068E | 1180 | 6B26 | 7E36 | 1E08 | 068E |
| 0000151200 | 1182 | C426 | AEB4 | 2600 | 70FF | 26FC | 70FF | FFFA |
| 0000151220 | 1076 | 76FF | 9A0E | F570 | CA08 | C483 | 8B0A | 125E |
| 0000151240 | 76C4 | 260E | 40C6 | 00FF | 068E | 117E | A126 | 08E2 |
| 0000151260 | C448 | 065E | 8926 | 8E07 | 8006 | 2611 | 1E6B | 087E |
| 0000151300 | 8E1E | 8206 | 2611 | B7FF | 009E | FF26 | 9CB7 | FF00 |
| 0000151320 | 0C76 | 76FF | 9A0A | F4F8 | C663 | C483 | 8E08 | 8406 |
| 0000151340 | 2611 | 3E83 | C680 | 7500 | E903 | 0009 | 7E83 | FEDC |
| 0000151360 | 0374 | 0FE9 | 8E00 | 8606 | 2611 | 3E83 | C606 | 7500 |
| 0000151400 | E903 | 0050 | 46C7 | 00DE | FF00 | E276 | 76FF | 8DE0 |
| 0000151420 | DE46 | 5016 | 76FF | FFF2 | FC76 | 76FF | 8DFA | E44E |
| 0000151440 | 5116 | 4E8D | 16F6 | 8D51 | D84E | 5116 | 681E | 0938 |
| 0000151460 | DE68 | FF00 | D436 | FF08 | D236 | FF08 | D836 | FF08 |
| 0000151500 | D636 | 9A08 | C734 | 0000 | C483 | 8B28 | DE46 | 09E9 |
| 0000151520 | E900 | 0006 | 00B8 | E900 | 0000 | 5E1F | 835F | 02ED |
| 0000151540 | E58B | 5D1F | CA4D | 000E | 581E | 4590 | 8B55 | 1EEC |
| 0000151560 | D88E | EC81 | 0024 | 5657 | 46C7 | 4AFA | 8C09 | FC5E |
| 0000151600 | 46C7 | 01F4 | 2B01 | 89C0 | E646 | 4689 | 8EE4 | 8406 |
| 0000151620 | 2611 | 3E83 | CB6C | 7500 | E903 | 001D | 36FF | 08D8 |
| 0000151640 | 36FF | 08D6 | 468D | 16DC | 9A50 | C5F0 | 0000 | C483 |
| 0000151660 | 3D08 | 0000 | 0374 | 0FE9 | 8E00 | 8606 | 2611 | 3E83 |
| 0000151700 | CB84 | 7500 | E903 | 003B | 681E | 094E | 468D | 16E8 |
| 0000151720 | 8D50 | DC46 | 5016 | 468D | 16F6 | 6850 | 00FC | 681E |
| 0000151740 | 0952 | 36FF | 08D4 | 36FF | 08D2 | 36FF | 08D8 | 36FF |
| 0000151760 | 08D6 | 399A | 00C6 | 8300 | 1EC4 | 4689 | 89F6 | F856 |
| 0000152000 | 08E9 | 2B00 | 89C0 | F846 | 4689 | 8EF6 | 7E06 | 2611 |
| 0000152020 | E2A1 | 8E08 | 8006 | 2611 | 1E6B | 087E | 8E1E | 8206 |
| 0000152040 | 2611 | 8739 | 00A0 | 0376 | 1CE9 | 8301 | EC3E | 0008 |
| 0000152060 | 037F | 7DE9 | 8E00 | 8406 | 2611 | 3E83 | CA14 | 7500 |
| 0000152100 | E903 | 0009 | 7E83 | FEE0 | 0374 | 0FE9 | 8E00 | 8606 |
| 0000152120 | 2611 | 3E83 | CA2C | 7500 | E903 | 0050 | 46C7 | FCE2 |
| 0000152140 | FFFF | E676 | 76FF | 8DE4 | E246 | 5016 | 76FF | FFF4 |
| 0000152160 | FC76 | 76FF | 8DFA | E84E | 5116 | 4E8D | 16F6 | 8D51 |
| 0000152200 | DC4E | 5116 | 681E | 0952 | 0068 | FF01 | D436 | FF08 |
| 0000152220 | D236 | FF08 | D836 | FF08 | D636 | 9A08 | CA74 | 0000 |
| 0000152240 | C483 | 8B28 | E246 | 37E9 | E901 | 0006 | FCB8 | E9FF |
| 0000152260 | 012E | 1B9A | 8ECD | 83CC | EA3E | 0008 | 0375 | 83E9 |
| 0000152300 | C700 | EA06 | 0008 | 8E00 | 8406 | 2611 | 3E83 | CC9A |
| 0000152320 | 7500 | E903 | 0009 | 7E83 | FEE0 | 0374 | 0FE9 | 8E00 |
| 0000152340 | 8606 | 2611 | 3E83 | CCB2 | 7500 | E903 | 0050 | 46C7 |
| 0000152360 | FEE2 | FFFF | E376 | 76FF | 8DE4 | E246 | 5016 | 76FF |
| 0000152400 | FFF4 | FC76 | 76FF | 8DFA | E84E | 5116 | 4E8D | 16F6 |
| 0000152420 | 8D51 | DC4E | 5116 | 681E | 0952 | 0668 | FF01 | D436 |
| 0000152440 | FF08 | D236 | FF08 | D836 | FF08 | D636 | 9A08 | CCFA |
| 0000152460 | 0000 | C483 | 8B28 | E246 | A5E9 | E900 | 0006 | FEB8 |
| 0000152500 | E9FF | 009C | C4E9 | 83FE | E63E | 0008 | 0374 | 12E9 |
| 0000152520 | 8E00 | 7E06 | 2611 | E2A1 | 4008 | 9A50 | D5D1 | C9C8 |
| 0000152540 | C483 | 8E02 | 8406 | 2611 | 3E83 | CAC4 | 7500 | E903 |
| 0000152560 | 0009 | 7E83 | FEE0 | 0374 | 0FE9 | 8E00 | 8606 | 2611 |
| 0000152600 | 3E83 | CAF0 | 7500 | E903 | 0050 | 46C7 | 00E2 | FF00 |
| 0000152620 | E676 | 76FF | 8DE4 | E246 | 5016 | 76FF | FFF4 | FC76 |
| 0000152640 | 76FF | 8DFA | E84E | 5116 | 4E8D | 16F6 | 8D51 | DC4E |
| 0000152660 | 5116 | 681E | 0952 | 0C68 | FF01 | D436 | FF08 | D236 |
| 0000152700 | FF08 | D836 | FF08 | D636 | 9A08 | CBCC | 0000 | C483 |
| 0000152720 | 8B28 | E246 | 09E9 | E900 | 0006 | 00B8 | E900 | 0000 |

THU MAR 14 17:42:50 1991 MEDIT.DLL PAGE 59, LINE 3423

| | | | | | | | | |
|---|---|---|---|---|---|---|---|---|
| 0000152740 | 5F5E | ED83 | 8B02 | 1FE5 | 4D5D | 1ECB | 9058 | 5545 |
| 0000152760 | EC8B | 8E1E | 81D8 | 00EC | 5700 | A156 | 13AC | 060B |
| 0000153000 | 13AA | 0375 | 04E9 | FF00 | AA1E | C713 | E406 | 0108 |
| 0000153020 | 1E00 | E068 | 6A08 | 6AFF | 9AFF | FFFF | 0000 | 00B8 |
| 0000153040 | E900 | 0000 | 5F5E | ED83 | 8B02 | 1FE5 | 4D5D | 1ECB |
| 0000153060 | 9058 | 5545 | EC8B | 8E1E | 81D8 | 00EC | 5700 | 1E56 |
| 0000153100 | BAB8 | 8EC5 | 8ED8 | 7E06 | 2611 | 3E83 | 08E4 | 7400 |
| 0000153120 | E903 | 0014 | 8326 | E23E | 0008 | 0374 | 09E9 | B800 |
| 0000153140 | FFFF | 91E9 | E900 | 0057 | 068E | 117E | 8326 | E43E |
| 0000153160 | 0008 | 0374 | 3FE9 | 2600 | 0EFF | 08E2 | 8B26 | E236 |
| 0000153200 | 8E08 | 8006 | 2611 | 1E6B | 087E | 8E1E | 8206 | 2611 |
| 0000153220 | 9FC4 | 00AE | C68B | E6D1 | F003 | E6D1 | FF26 | 0270 |
| 0000153240 | FF26 | 9A30 | F558 | CE24 | C483 | 8E04 | 7E06 | 2611 |
| 0000153260 | E4A3 | E908 | 0009 | 068E | 117E | FF26 | E40E | 8E08 |
| 0000153300 | 7E06 | 2611 | 368B | 08E4 | 468A | 2606 | 3E8B | 08E2 |
| 0000153320 | CF8B | E7D1 | F903 | E7D1 | 068E | 1180 | 6B26 | 7E1E |
| 0000153340 | 1E08 | 068E | 1182 | C426 | AE9F | 2600 | 19C4 | 8826 |
| 0000153360 | 9A00 | D561 | CBE5 | 5E1F | 835F | 02ED | E58B | 5D1F |
| 0000153400 | CA4D | 0002 | 581E | 4590 | 8B55 | 1EEC | D88E | EC81 |
| 0000153420 | 0000 | 5657 | B81E | CD71 | D88E | 068E | 1180 | A126 |
| 0000153440 | 087E | 068E | 117E | A326 | 08E0 | 068E | 1180 | 6B26 |
| 0000153460 | 7E1E | 1E08 | 068E | 1182 | 468B | 2608 | 8739 | 00A0 |
| 0000153500 | 0372 | 06E9 | B800 | FFFF | 1FE9 | FF00 | 0876 | A89A |
| 0000153520 | 8FCE | 83CE | 02C4 | 4689 | FF08 | 0876 | D19A | D6D5 |
| 0000153540 | 83CD | 02C4 | 00B8 | E900 | 0000 | 5E1F | 835F | 02ED |
| 0000153560 | E58B | 5D1F | CA4D | 0004 | 581E | 4590 | 8B55 | 1EEC |
| 0000153600 | D88E | EC81 | 0028 | 5657 | 46C7 | 5DFA | 8C09 | FC5E |
| 0000153620 | 46C7 | 01F0 | 2B01 | 89C0 | E246 | 4689 | 8EE0 | 8406 |
| 0000153640 | 2611 | 3E83 | CFBA | 7500 | E903 | 001D | 36FF | 08D8 |
| 0000153660 | 36FF | 08D6 | 468D | 16D8 | 9A50 | CADA | 0000 | C483 |
| 0000153700 | 3D08 | 0000 | 0374 | 0FE9 | 8E00 | 8606 | 2611 | 3E83 |
| 0000153720 | CFD2 | 7500 | E903 | 003B | 681E | 0961 | 468D | 16E4 |
| 0000153740 | 8D50 | D846 | 5016 | 468D | 16F2 | 6850 | 0173 | 681E |
| 0000153760 | 0966 | 36FF | 08D4 | 36FF | 08D2 | 36FF | 08D8 | 36FF |
| 0000154000 | 08D6 | 239A | 00CB | 8300 | 1EC4 | 4689 | 89F2 | F456 |
| 0000154020 | 08E9 | 2B00 | 89C0 | F446 | 4689 | FFF2 | 0676 | 449A |
| 0000154040 | 578B | 50CF | 839A | 6F66 | 89CF | F646 | 5689 | 0BF8 |
| 0000154060 | 75D0 | E903 | 001C | 76FF | FFF8 | F676 | 3C9A | 81D0 |
| 0000154100 | 3DCE | 0000 | 0375 | 03E9 | E900 | 0006 | 46FF | E906 |
| 0000154120 | FFC9 | 068E | 1180 | 6B26 | 7E1E | 1E08 | 068E | 1182 |
| 0000154140 | 468B | 2606 | 8739 | 00A0 | 0372 | 16E9 | 8E00 | 8006 |
| 0000154160 | 2611 | 1E6B | 087E | 8E1E | 8206 | 2611 | 878B | 00A0 |
| 0000154200 | 4689 | 8E06 | 8406 | 2611 | 3E83 | CBFE | 7500 | E903 |
| 0000154220 | 0009 | 7E83 | FEDC | 0374 | 0FE9 | 8E00 | 8606 | 2611 |
| 0000154240 | 3E83 | CC16 | 7500 | E903 | 0051 | 468B | 8906 | DE46 |
| 0000154260 | 76FF | FFE2 | E076 | 468D | 16DE | FF50 | F076 | 76FF |
| 0000154300 | FFFC | FA76 | 4E8D | 16E4 | 8D51 | F24E | 5116 | 4E8D |
| 0000154320 | 16D8 | 1E51 | 6668 | 6809 | 0184 | 36FF | 08D4 | 36FF |
| 0000154340 | 08D2 | 36FF | 08D8 | 36FF | 08D6 | 5E9A | 00CC | 8300 |
| 0000154360 | 28C4 | 468B | E9DE | 0009 | 06E9 | 8B00 | 0646 | 00E9 |
| 0000154400 | 5E00 | 835F | 02ED | E58B | 5D1F | CB4D | 581E | 4590 |
| 0000154420 | 8B55 | 1EEC | D88E | EC81 | 0028 | 5657 | B81E | CE46 |
| 0000154440 | D88E | 46C7 | 78F6 | 8C09 | F85E | 46C7 | 0DF0 | 2B01 |
| 0000154460 | 89C0 | E246 | 4689 | 8EE0 | 8406 | 2611 | 3E83 | CED4 |
| 0000154500 | 7500 | E903 | 001D | 36FF | 08D8 | 36FF | 08D6 | 468D |
| 0000154520 | 16D8 | 9A50 | CEEA | 0000 | C483 | 3D08 | 0000 | 0374 |
| 0000154540 | 0FE9 | 8E00 | 8606 | 2611 | 3E83 | CFC0 | 7500 | E903 |
| 0000154560 | 003B | 681E | 097D | 468D | 16E4 | 8D50 | D846 | 5016 |
| 0000154600 | 468D | 16F2 | 6850 | 0193 | 681E | 0982 | 36FF | 08D4 |

THU MAR 14 17:42:50 1991 MEDIT.DLL PAGE 60, LINE 3482

| | | | | | | | | |
|---|---|---|---|---|---|---|---|---|
| 0000154620 | 36FF | 08D2 | 36FF | 08D8 | 36FF | 08D6 | 339A | 00CF |
| 0000154640 | 8300 | 1EC4 | 4689 | 89F2 | F456 | 08E9 | 2B00 | 89C0 |
| 0000154660 | F446 | 4689 | 8BF2 | 0646 | 568B | 8908 | FA46 | 5689 |
| 0000154700 | E9FC | 0003 | 46FF | C4FA | FA5E | 8026 | 003F | 0375 |
| 0000154720 | 27E9 | C400 | FA5E | 8026 | 203F | 0375 | 18E9 | C400 |
| 0000154740 | FA5E | 8026 | 093F | 0375 | 0CE9 | C400 | FA5E | 8026 |
| 0000154760 | 0A3F | 0374 | 03E9 | E900 | FFCA | 5EC4 | 26FA | 3F80 |
| 0000155000 | 7400 | E903 | 007D | 068E | 1184 | 8326 | C63E | 00D1 |
| 0000155020 | 0375 | 09E9 | 8300 | DC7E | 74FE | E903 | 000F | 068E |
| 0000155040 | 1186 | 8326 | DE3E | 00D1 | 0375 | 50E9 | C700 | DE46 |
| 0000155060 | 0000 | 76FF | FFE2 | E076 | 468D | 16DE | FF50 | F076 |
| 0000155100 | 76FF | FFF8 | F676 | 4E8D | 16E4 | 8D51 | F24E | 5116 |
| 0000155120 | 4E8D | 16D8 | 1E51 | 8268 | 6809 | 019A | 36FF | 08D4 |
| 0000155140 | 36FF | 08D2 | 36FF | 08D8 | 36FF | 08D6 | 269A | 00D2 |
| 0000155160 | 8300 | 28C4 | 468B | E9DE | 010F | 06E9 | B800 | 0000 |
| 0000155200 | 06E9 | C401 | FA5E | 8026 | 233F | 0374 | 7DE9 | 8E00 |
| 0000155220 | 8406 | 2611 | 3E83 | D243 | 7500 | E903 | 0009 | 7E83 |
| 0000155240 | FEDC | 0374 | 0FE9 | 8E00 | 8606 | 2611 | 3E83 | D25B |
| 0000155260 | 7500 | E903 | 0050 | 46C7 | 00DE | FF00 | E276 | 76FF |
| 0000155300 | 8DE0 | DE46 | 5016 | 76FF | FFF0 | F876 | 76FF | 8DF6 |
| 0000155320 | E44E | 5116 | 4E8D | 16F2 | 8D51 | D84E | 5116 | 681E |
| 0000155340 | 0982 | 9D68 | FF01 | D436 | FF08 | D236 | FF08 | D836 |
| 0000155360 | FF08 | D636 | 9A08 | D2A3 | 0000 | C483 | 8B28 | DE46 |
| 0000155400 | 86E9 | E900 | 0006 | 00B8 | E900 | 007D | 068E | 1184 |
| 0000155420 | 8326 | 6E3E | 00D0 | 0375 | 09E9 | 8300 | DC7E | 74FE |
| 0000155440 | E903 | 000F | 068E | 1186 | 8326 | 9A3E | 00D0 | 0375 |
| 0000155460 | 50E9 | C700 | DE46 | 0001 | 76FF | FFE2 | E076 | 468D |
| 0000155500 | 16DE | FF50 | F076 | 76FF | FFF8 | F676 | 4E8D | 16E4 |
| 0000155520 | 8D51 | F24E | 5116 | 4E8D | 16D8 | 1E51 | 8268 | 6809 |
| 0000155540 | 019F | 36FF | 08D4 | 36FF | 08D2 | 36FF | 08D8 | 36FF |
| 0000155560 | 08D6 | 1B9A | 00D0 | 8300 | 28C4 | 468B | E9DE | 0009 |
| 0000155600 | 06E9 | B800 | 0001 | 00E9 | 1F00 | 5F5E | ED83 | 8B02 |
| 0000155620 | 1FE5 | 4D5D | 04CA | 1E00 | 9058 | 5545 | EC8B | 8E1E |
| 0000155640 | 81D8 | 00EC | 5700 | 1E56 | 4EB8 | 8ED0 | 8ED8 | 7E06 |
| 0000155660 | 2611 | E2A1 | E908 | 0000 | 5E1F | 835F | 02ED | E58B |
| 0000155700 | 5D1F | CB4D | 581E | 4590 | 8B55 | 1EEC | D88E | EC81 |
| 0000155720 | 0000 | 5657 | B81E | D2D9 | D88E | 068E | 117E | A126 |
| 0000155740 | 08E0 | 00E9 | 1F00 | 5F5E | ED83 | 8B02 | 1FE5 | 4D5D |
| 0000155760 | 1ECB | 9058 | 5545 | EC8B | 8E1E | 81D8 | 00EC | 5700 |
| 0000156000 | 1E56 | 06B8 | 8ED3 | 83D8 | 067E | 7732 | E903 | 0006 |
| 0000156020 | FFB8 | E9FF | 0011 | 468B | 8E06 | 7E06 | 2611 | E0A3 |
| 0000156040 | B808 | 0000 | 00E9 | 1F00 | 5F5E | ED83 | 8B02 | 1FE5 |
| 0000156060 | 4D5D | 02CA | 1E00 | 9058 | 5545 | EC8B | 8E1E | 81D8 |
| 0000156100 | 00EC | 5700 | C756 | E606 | 0108 | C700 | E806 | 0108 |
| 0000156120 | 9A00 | D561 | CF51 | 00B8 | E900 | 0000 | 5F5E | ED83 |
| 0000156140 | 8B02 | 1FE5 | 4D5D | 1ECB | 9058 | 5545 | EC8B | 8E1E |
| 0000156160 | 81D8 | 00EC | 5700 | 1E56 | 33B8 | 8ED3 | 68D8 | D3A9 |
| 0000156200 | 4368 | 8E01 | 8806 | 2611 | 36FF | 08DA | DAA1 | 8E08 |
| 0000156220 | 8206 | 6B11 | DC1E | 1E08 | 2B26 | A487 | 5000 | 006A |
| 0000156240 | 068E | 118A | FF26 | D436 | 9A08 | BDD2 | 0000 | 068E |
| 0000156260 | 1180 | A126 | 087E | DCA3 | 8B08 | 0646 | DAA3 | FF08 |
| 0000156300 | DA36 | 9A08 | AF42 | D3FD | 016A | 169A | 84D4 | 83D3 |
| 0000156320 | 02C4 | 00B8 | E900 | 0000 | 5E1F | 835F | 02ED | E58B |
| 0000156340 | 5D1F | CA4D | 0002 | 581E | 4590 | 8B55 | 1EEC | D88E |
| 0000156360 | EC81 | 0000 | 5657 | 068E | 1180 | DCA1 | 2608 | D639 |
| 0000156400 | 087E | 0374 | 0AE9 | 8300 | DE3E | 0008 | 0374 | 03E9 |
| 0000156420 | E900 | 0078 | 7E83 | 0106 | 0374 | 39E9 | 6800 | D487 |
| 0000156440 | 4168 | 8E01 | 8806 | 2611 | 36FF | 08DA | DAA1 | 8E08 |
| 0000156460 | 8006 | 2611 | 1E6B | 087E | 8E1E | 8206 | 2611 | 872B |

THU MAR 14 17:42:50 1991 MEDIT.DLL PAGE 61, LINE 3541

| | | | | | | | | |
|---|---|---|---|---|---|---|---|---|
| 0000156500 | 00A4 | 6A50 | 8E00 | 8A06 | 2611 | 36FF | 08D4 | B89A |
| 0000156520 | 00D4 | E900 | 0036 | AE68 | 68D3 | 0143 | 068E | 1188 |
| 0000156540 | FF26 | DA36 | A108 | 08DA | 068E | 1180 | 6B26 | 7E1E |
| 0000156560 | 1E08 | 068E | 1182 | 2B26 | A487 | 5000 | 006A | 068E |
| 0000156600 | 118A | FF26 | D436 | 9A08 | D3DA | 0000 | 5F5E | ED83 |
| 0000156620 | 8B02 | 1FE5 | 4D5D | 1ECB | 9058 | 5545 | EC8B | 8E1E |
| 0000156640 | 81D8 | 00EC | 5700 | 1E56 | 4EB8 | 8ED4 | 8BD8 | 0646 |
| 0000156660 | DEA3 | B808 | 0000 | 1AE9 | FF00 | DA36 | 9A08 | AF42 |
| 0000156700 | D4F8 | 76FF | 9A06 | D416 | D3F6 | C483 | B802 | 0000 |
| 0000156720 | 00E9 | 1F00 | 5F5E | ED83 | 8B02 | 1FE5 | 4D5D | 02CA |
| 0000156740 | 1E00 | 9058 | 5545 | EC8B | 8E1E | 81D8 | 00EC | 5700 |
| 0000156760 | 1E56 | D9B8 | 8ED4 | A1D8 | 08DE | 00E9 | 1F00 | 5F5E |
| 0000157000 | ED83 | 8B02 | 1FE5 | 4D5D | 1ECB | 9058 | 5545 | EC8B |
| 0000157020 | 8E1E | 81D8 | 00EC | 5700 | 1E56 | 23B8 | 8ED5 | A1D8 |
| 0000157040 | 08DA | 00E9 | 1F00 | 5F5E | ED83 | 8B02 | 1FE5 | 4D5D |
| 0000157060 | 1ECB | 9058 | 5545 | EC8B | 8E1E | 81D8 | 00EC | 5700 |
| 0000157100 | 1E56 | 4BB8 | 8ED5 | 83D8 | E43E | 0008 | 0375 | 3EE9 |
| 0000157120 | A100 | 13A8 | 060B | 13A6 | 0375 | 04E9 | FF00 | A61E |
| 0000157140 | 8313 | E83E | 0008 | 0374 | 15E9 | 8E00 | 7E06 | 2611 |
| 0000157160 | E2A1 | 4008 | 9A50 | D5D1 | D4F0 | C483 | E902 | 000F |
| 0000157200 | 06C7 | 08E4 | 0000 | 681E | 08E0 | FF9A | 00FF | B800 |
| 0000157220 | 0000 | 00E9 | 1F00 | 5F5E | ED83 | 8B02 | 1FE5 | 4D5D |
| 0000157240 | 1ECB | 9058 | 5545 | EC8B | 8E1E | 81D8 | 04EC | 5700 |
| 0000157260 | 8E56 | 7E06 | 2611 | E2A1 | A308 | 13AE | AEA1 | 8E13 |
| 0000157300 | 8006 | 2611 | 1E6B | 087E | 8E1E | 8206 | 2611 | 872B |
| 0000157320 | 00A4 | 4689 | 83FC | FC7E | 7D00 | E903 | 005C | 068E |
| 0000157340 | 118C | A126 | 0014 | 3B48 | FC46 | 037F | 4BE9 | 8E00 |
| 0000157360 | 8E06 | 2611 | 3E83 | 0146 | 7500 | E903 | 003C | 068E |
| 0000157400 | 1180 | A126 | 087E | 068E | 117E | 3926 | E006 | 7408 |
| 0000157420 | E903 | 0026 | 8326 | E03E | 0008 | 0375 | 1BE9 | 6800 |
| 0000157440 | D6E1 | 4368 | 6A01 | FF01 | FC76 | 006A | 068E | 118A |
| 0000157460 | FF26 | D436 | 9A08 | D6F7 | 0000 | 468B | 8E06 | 7E06 |
| 0000157500 | 2611 | E2A3 | 2608 | 06C7 | 08E4 | 0000 | A126 | 08E2 |
| 0000157520 | 068E | 1180 | 6B26 | 7E1E | 1E08 | 068E | 1182 | 2B26 |
| 0000157540 | A487 | 8900 | FC46 | 7E83 | 00FC | 037D | 5CE9 | 8E00 |
| 0000157560 | 8C06 | 2611 | 14A1 | 4800 | 463B | 7FFC | E903 | 004B |
| 0000157600 | 068E | 118E | 8326 | 463E | 0001 | 0375 | 3CE9 | 8E00 |
| 0000157620 | 8006 | 2611 | 7EA1 | 8E08 | 7E06 | 2611 | 0639 | 08E0 |
| 0000157640 | 0374 | 26E9 | 2600 | 3E83 | 08E0 | 7500 | E903 | 001B |
| 0000157660 | 7368 | 68D5 | 0140 | 016A | 76FF | 6AFC | 8E00 | 8A06 |
| 0000157700 | 2611 | 36FF | 08D4 | 7F9A | 00D4 | 5E00 | 835F | 02ED |
| 0000157720 | E58B | 5D1F | CB4D | 581E | 4590 | 8B55 | 1EEC | D88E |
| 0000157740 | EC81 | 0006 | 5657 | B81E | D650 | D88E | AAA1 | 8B13 |
| 0000157760 | AC16 | 8913 | FA46 | 5689 | 8BFC | 0646 | 568B | A308 |
| 0000160000 | 13AA | 1689 | 13AC | 468B | 8BFA | FC56 | 00E9 | 1F00 |
| 0000160020 | 5F5E | ED83 | 8B02 | 1FE5 | 4D5D | 04CA | 1E00 | 9058 |
| 0000160040 | 5545 | EC8B | 8E1E | 81D8 | 06EC | 5700 | 1E56 | 18B8 |
| 0000160060 | 8ED7 | A1D8 | 13A6 | 168B | 13A8 | 4689 | 89FA | FC56 |
| 0000160100 | 468B | 8B06 | 0856 | A6A3 | 8913 | A816 | 8B13 | FA46 |
| 0000160120 | 568B | E9FC | 0000 | 5E1F | 835F | 02ED | E58B | 5D1F |
| 0000160140 | CA4D | 0004 | 581E | 4590 | 8B55 | 1EEC | D88E | EC81 |
| 0000160160 | 0000 | 5657 | B81E | D75F | D88E | 468B | A306 | 08E8 |
| 0000160200 | 00B8 | E900 | 0000 | 5E1F | 835F | 02ED | E58B | 5D1F |
| 0000160220 | CA4D | 0002 | 581E | 4590 | 8B55 | 1EEC | D88E | EC81 |
| 0000160240 | 0000 | 5657 | 068E | 117E | C726 | E206 | 0008 | 2600 |
| 0000160260 | 06C7 | 08E4 | 0000 | 5F5E | ED83 | 8B02 | 1FE5 | 4D5D |
| 0000160300 | 1ECB | 9058 | 5545 | EC8B | 8E1E | 81D8 | 24EC | 5700 |
| 0000160320 | 1E56 | A6B8 | 8ED7 | C7D8 | FA46 | 0991 | 5E8C | C7FC |
| 0000160340 | F446 | 0000 | C02B | 4689 | 89E6 | E446 | 068E | 1184 |

THU MAR 14 17:42:50 1991 MEDIT.DLL PAGE 62, LINE 3600

| | | | | | | | | |
|---|---|---|---|---|---|---|---|---|
| 0000160360 | 8326 | A73E | 00D8 | 0375 | 1DE9 | FF00 | D836 | FF08 |
| 0000160400 | D636 | 8D08 | DC46 | 5016 | 849A | 00D0 | 8300 | 08C4 |
| 0000160420 | 003D | 7400 | E903 | 000F | 068E | 1186 | 8326 | 393E |
| 0000160440 | 00D9 | 0375 | 3BE9 | 1E00 | 9568 | 8D09 | E846 | 5016 |
| 0000160460 | 468D | 16DC | 8D50 | F646 | 5016 | 3368 | 1E03 | AE68 |
| 0000160500 | FF09 | D436 | FF08 | D236 | FF08 | D836 | FF08 | D636 |
| 0000160520 | 9A08 | D0CD | 0000 | C483 | 891E | F646 | 5689 | E9F8 |
| 0000160540 | 0008 | C02B | 4689 | 89F8 | F646 | 06C7 | 08EA | 0001 |
| 0000160560 | 068E | 1184 | 8326 | 213E | 00D9 | 0375 | 4BE9 | 8300 |
| 0000160600 | E07E | 75FE | E903 | 0042 | C79A | FDD2 | 50D8 | 681E |
| 0000160620 | 0999 | 468D | 16E8 | 8D50 | F646 | 5016 | 468D | 16DC |
| 0000160640 | 1E50 | AE68 | 6809 | 0336 | 36FF | 08D4 | 36FF | 08D2 |
| 0000160660 | 36FF | 08D8 | 36FF | 08D6 | 681E | 09A6 | C068 | 68C6 |
| 0000160700 | C6C3 | C69A | 00C6 | 8300 | 28C4 | C79A | 03D2 | 50D9 |
| 0000160720 | 979A | DAD3 | 6AD9 | 9A01 | D4C7 | D918 | 068E | 1180 |
| 0000160740 | FF26 | 7E36 | 9A08 | 8E02 | D5A8 | 068E | 1184 | 8326 |
| 0000160760 | 3D3E | 00D1 | 0375 | 09E9 | 8300 | E07E | 74FE | E903 |
| 0000161000 | 000F | 068E | 1186 | 8326 | 553E | 00D1 | 0375 | 39E9 |
| 0000161020 | 8D00 | E846 | 5016 | 468D | 16F6 | 8D50 | DC46 | 5016 |
| 0000161040 | 681E | 09AE | 4368 | FF03 | D436 | FF08 | D236 | FF08 |
| 0000161060 | D836 | FF08 | D636 | 9A08 | 5E71 | 0000 | C483 | C71A |
| 0000161100 | E246 | 0000 | 06E9 | E900 | 0003 | 00E9 | 1F00 | 5F5E |
| 0000161120 | ED83 | 8B02 | 1FE5 | 4D5D | 1ECB | 9058 | 5545 | EC8B |
| 0000161140 | 8E1E | 81D8 | 24EC | 5700 | 1E56 | 03B8 | 8ED8 | C7D8 |
| 0000161160 | FA46 | 09B9 | 5E8C | C7FC | F446 | 0000 | C02B | 4689 |
| 0000161200 | 89E6 | E446 | 068E | 1184 | 8326 | 233E | 00D8 | 0375 |
| 0000161220 | 1DE9 | FF00 | D836 | FF08 | D636 | 8D08 | DC46 | 5016 |
| 0000161240 | 399A | 00D8 | 8300 | 08C4 | 003D | 7400 | E903 | 000F |
| 0000161260 | 068E | 1186 | 8326 | 4F3E | 00D8 | 0375 | 3BE9 | 1E00 |
| 0000161300 | BD68 | 8D09 | E846 | 5016 | 468D | 16DC | 8D50 | F646 |
| 0000161320 | 5016 | 5F68 | 1E03 | E268 | FF09 | D436 | FF08 | D236 |
| 0000161340 | FF08 | D836 | FF08 | D636 | 9A08 | D882 | 0000 | C483 |
| 0000161360 | 891E | F646 | 5689 | E9F8 | 0008 | C02B | 4689 | 89F8 |
| 0000161400 | F646 | 468B | A306 | 08EC | 068E | 1184 | 8326 | 973E |
| 0000161420 | 00DA | 0375 | 49E9 | 8300 | E07E | 75FE | E903 | 0040 |
| 0000161440 | 36FF | 08EC | 681E | 09C1 | 468D | 16E8 | 8D50 | F646 |
| 0000161460 | 5016 | 468D | 16DC | 1E50 | E268 | 6809 | 0362 | 36FF |
| 0000161500 | 08D4 | 36FF | 08D2 | 36FF | 08D8 | 36FF | 08D6 | 681E |
| 0000161520 | 09D9 | ED68 | 68D8 | D8F0 | F39A | 00D8 | 8300 | 28C4 |
| 0000161540 | 068E | 1184 | 8326 | BB3E | 00D9 | 0375 | 09E9 | 8300 |
| 0000161560 | E07E | 74FE | E903 | 000F | 068E | 1186 | 8326 | E73E |
| 0000161600 | 00D9 | 0375 | 39E9 | 8D00 | E846 | 5016 | 468D | 16F6 |
| 0000161620 | 8D50 | DC46 | 5016 | 681E | 09E2 | 6368 | FF03 | D436 |
| 0000161640 | FF08 | D236 | FF08 | D836 | FF08 | D636 | 9A08 | D968 |
| 0000161660 | 0000 | C483 | C71A | E246 | 0000 | 06E9 | E900 | 0003 |
| 0000161700 | 00E9 | 1F00 | 5F5E | ED83 | 8B02 | 1FE5 | 4D5D | 02CA |
| 0000161720 | 0000 | 0000 | 0000 | 0000 | 0000 | 0000 | 0000 | 0000 |
| 0000161740 | 0000 | 8B55 | 1EEC | FA68 | 1E09 | FE68 | 9A09 | FFFF |
| 0000161760 | 0000 | 068E | 09FA | A126 | 0015 | 3AA3 | BB0A | 0A04 |
| 0000162000 | 1F8C | C5BE | 8313 | FEE6 | 1E56 | FF9A | 00FF | 0B00 |
| 0000162020 | 74C0 | 3304 | EBC0 | 893A | 0477 | 894E | 0236 | 830A |
| 0000162040 | 03EE | 04C7 | 0001 | 7789 | 8906 | 0877 | C683 | C702 |
| 0000162060 | FE04 | 89FF | 0A77 | 681E | 09F8 | 681E | 09F6 | FF9A |
| 0000162100 | 00FF | E800 | 0020 | D69A | BBDD | E8D8 | 0066 | 01B8 |
| 0000162120 | 5D00 | 50CB | 949A | 79DD | 9ADB | DF0E | DB87 | FF68 |
| 0000162140 | 9A00 | DC9D | DB8C | BB1E | 000D | FF33 | 068E | 09F8 |
| 0000162160 | FFB9 | 267F | 3D80 | 7500 | 4701 | 8026 | 003D | 3174 |
| 0000162200 | 18BE | 8B0A | 8BD1 | F3CB | 8BA6 | 74CA | 3308 | F2C0 |
| 0000162220 | 74AE | EBE7 | 061C | 071E | F78B | BF1F | 0A3F | 2CAC |

THU MAR 14 17:42:50 1991 MEDIT.DLL PAGE 63, LINE 3659

| | | | | | | | | |
|---|---|---|---|---|---|---|---|---|
| 0000162240 | 7241 | C00E | 04E0 | AC92 | 412C | 0572 | C20A | EBAA |
| 0000162260 | 1FED | 00C3 | 02BB | 5200 | D48B | A780 | 0A3F | 50B7 |
| 0000162300 | C48B | 1653 | 1650 | 9A52 | FFFF | 0000 | C00B | 7558 |
| 0000162320 | B110 | 3C40 | 7401 | 3C06 | 7502 | B106 | 0808 | 3F8F |
| 0000162340 | 4B0A | D679 | E85A | 0026 | D2BE | BF10 | 10D2 | 5FE8 |
| 0000162360 | BE01 | 10D2 | D2BF | E810 | 0156 | D2B8 | 3D10 | 10D6 |
| 0000162400 | 0B74 | 016A | 680E | DC6F | FF9A | 00FF | C300 | 0E8B |
| 0000162420 | 10C8 | 2AE3 | 06C4 | 10CA | C28C | DB33 | 1EFF | 10C6 |
| 0000162440 | 0373 | 61E9 | 8E01 | FE06 | 2609 | 1E8B | 0006 | 754B |
| 0000162460 | C40D | CE06 | 8C10 | BBC2 | 0003 | 1EFF | 10C6 | B8C3 |
| 0000162500 | D99B | D88E | 4FA1 | 0B0C | 75C0 | 0E10 | C0A1 | 0B10 |
| 0000162520 | 75C0 | E805 | 001F | 03EB | 24E8 | 6A00 | 6A03 | 6A00 |
| 0000162540 | 9A00 | DC39 | 0000 | 8B55 | 33EC | EBC9 | 551A | EC8B |
| 0000162560 | 01B9 | EB00 | 5512 | EC8B | 5756 | 00B9 | EB01 | 5508 |
| 0000162600 | EC8B | 5756 | 01B9 | E801 | 004B | 0A51 | 75C9 | BE12 |
| 0000162620 | 13BC | BCBF | E813 | 00B8 | D2BE | BF10 | 10D6 | AFE8 |
| 0000162640 | BE00 | 10D6 | D6BF | E810 | 00A6 | D6BE | BF10 | 10D6 |
| 0000162660 | 9DE8 | E800 | 008C | 0A58 | 75E4 | C713 | 4F06 | 010C |
| 0000162700 | B800 | 0001 | 8A50 | 0646 | 9A50 | FFFF | 0000 | 4EE8 |
| 0000162720 | 5F00 | 5D5E | 55CB | EC8B | 0D6A | 55E8 | 8319 | 02C4 |
| 0000162740 | 068E | 09FE | 8B26 | 061E | 4B00 | 168B | 0C51 | FA83 |
| 0000162760 | 75FF | 8904 | 511E | 390C | 511E | 9F0C | 0D6A | 5BE8 |
| 0000163000 | 8319 | 02C4 | 749E | 6A0A | E80E | 1906 | C483 | EB02 |
| 0000163020 | 3BC7 | 74D3 | 6A08 | E80E | 1918 | C483 | 5D02 | 55C3 |
| 0000163040 | EC8B | 0D6A | 0BE8 | 8319 | 02C4 | 06C7 | 0C51 | FFFF |
| 0000163060 | 0D6A | 27E8 | 8319 | 02C4 | 0E6A | 1FE8 | 8319 | 02C4 |
| 0000163100 | C35D | 0E8B | 10C8 | 07E3 | 02BB | FF00 | C61E | C310 |
| 0000163120 | F73B | 0E73 | EF83 | 8B04 | 0B05 | 0245 | F274 | 1DFF |
| 0000163140 | EEEB | 00C3 | 8B55 | B8EC | 00FC | 0E50 | 6FE8 | 8301 |
| 0000163160 | 563E | 000C | 0474 | 1EFF | 0C54 | FFB8 | 5000 | E80E |
| 0000163200 | 015C | E58B | CB5D | 02B8 | E900 | FDC7 | 5A59 | DC8B |
| 0000163220 | D82B | 0B72 | FB81 | 0200 | 0572 | E38B | 5152 | 52CB |
| 0000163240 | 3351 | E9C0 | FDAD | 14C8 | 0000 | 5657 | FF2B | F78B |
| 0000163260 | 3639 | 09F8 | 0375 | F0E9 | A100 | 09F8 | C92B | 4E89 |
| 0000163300 | 89F4 | F646 | 4E89 | 89F8 | FA46 | DC6A | 76FF | FFFA |
| 0000163320 | F876 | 681E | 0A18 | 9A9A | 4AF5 | 83DE | 0AC4 | C00B |
| 0000163340 | 1A74 | 8146 | FFFE | 767F | E903 | 00BD | 5EC4 | FFF8 |
| 0000163360 | F846 | 8026 | 003F | EA75 | EB47 | 900D | 5EC4 | FFF8 |
| 0000163400 | F846 | 8026 | 003F | F475 | 5E8B | 26F8 | 3F80 | 7500 |
| 0000163420 | 8DB9 | 0145 | 6A50 | 9A04 | F9D0 | DE59 | C483 | 8904 |
| 0000163440 | F046 | 5689 | 56F2 | F49A | 8FF1 | 83DE | 02C4 | 4689 |
| 0000163460 | 89FC | FE56 | 468B | 0BF2 | F046 | 6D74 | C28B | 460B |
| 0000163500 | 74FC | 8B66 | F046 | 568B | A3F2 | 0C45 | 1689 | 0C47 |
| 0000163520 | DC6A | 76FF | FFF6 | F476 | 681E | 0A18 | 9A9A | 94F5 |
| 0000163540 | 83DB | 0AC4 | C00B | 2C74 | 468B | 8BFC | FE56 | 5EC4 |
| 0000163560 | 83F0 | F046 | 2604 | 0789 | 8926 | 0257 | 5EC4 | FFF4 |
| 0000163600 | F446 | 8A26 | C407 | FC5E | 46FF | 26FC | 0788 | C00A |
| 0000163620 | 0E74 | E8EB | 5EC4 | FFF4 | F446 | 8026 | 003F | F475 |
| 0000163640 | 5EC4 | 26F4 | 3F80 | 7500 | 5EA7 | C95F | 90CB | 8B55 |
| 0000163660 | 56EC | B857 | DC70 | D88E | C08E | 568B | BE06 | 1198 |
| 0000163700 | 3BAD | 74C2 | 4010 | 7496 | 970C | C033 | FFB9 | F2FF |
| 0000163720 | 8BAE | EBF7 | 96EB | 5E5F | E58B | CA5D | 0002 | 8B55 |
| 0000163740 | 57EC | 76FF | 0E06 | C5E8 | 0BFF | 74C0 | 921F | FA8B |
| 0000163760 | C033 | FFB9 | F2FF | F7AE | 49D1 | 8B50 | BBC4 | 0002 |
| 0000164000 | 1E53 | 5152 | 5016 | FF9A | 00FF | 5B00 | 8B5F | 5DE5 |
| 0000164020 | 02CA | 0000 | 1601 | 0202 | 0203 | 1804 | 0D05 | 0906 |
| 0000164040 | 0C07 | 0C08 | 0C09 | 070A | 080B | 160C | 160D | 020F |
| 0000164060 | 0D10 | 1211 | 0212 | 0235 | 0D41 | 0243 | 0D52 | 0D53 |
| 0000164100 | 0D57 | 0B59 | 0D6C | 206D | 1C70 | 0972 | 1606 | 0A80 |

THU MAR 14 17:42:50 1991 MEDIT.DLL PAGE 64, LINE 3718

| | | | | | | | | |
|---|---|---|---|---|---|---|---|---|
| 0000164120 | 0A81 | 0982 | 0D84 | 0BA4 | 02CE | 0BD7 | 0D00 | 1608 |
| 0000164140 | 8B52 | E8D8 | 1736 | 8E93 | 5AC2 | 8926 | 0247 | 8926 |
| 0000164160 | B817 | FFFF | 8B99 | 5DE5 | E8CB | 0008 | FFB8 | 99FF |
| 0000164200 | E58B | CB5D | D88B | 13E8 | 9317 | C28E | 8926 | 0247 |
| 0000164220 | BB53 | DF44 | 24B9 | 0A00 | 75E4 | 2E1B | 073A | 1674 |
| 0000164240 | 4343 | F7E2 | 133C | 0472 | 243C | 0A76 | 3C43 | 72BC |
| 0000164260 | 3C04 | 76CA | 4301 | 8A2E | 0147 | 5B98 | 8926 | C307 |
| 0000164300 | 8B55 | BBEC | 0002 | 05EB | 8B55 | 33EC | E8DB | 16CC |
| 0000164320 | C303 | CB5D | 04C8 | 0000 | 46C7 | FFFC | C4FF | 065E |
| 0000164340 | F626 | 0A47 | 7440 | 2607 | 47C6 | 000A | 2CEB | C38B |
| 0000164360 | 622D | B90C | 000C | F799 | 89F9 | FE46 | E850 | 15E2 |
| 0000164400 | C483 | FF02 | 0876 | 76FF | 9A06 | E050 | E06A | C483 |
| 0000164420 | 8904 | FC46 | 76FF | E8FE | 15D4 | 468B | C9FC | 90CB |
| 0000164440 | 10C8 | 0000 | 5657 | FFBF | 8BFF | 0676 | 44F6 | 830A |
| 0000164460 | 0375 | 97E9 | 1E00 | 9A56 | E5C8 | E08F | C483 | 8B04 |
| 0000164500 | 8BF8 | 81DE | 62EB | 8B0C | 4687 | 890E | FA46 | 561E |
| 0000164520 | C9E8 | 8302 | 04C4 | 448A | 2A0B | 50E4 | 229A | AAEC |
| 0000164540 | 83E0 | 02C4 | C00B | 617C | 7E83 | 00FA | 5E74 | 681E |
| 0000164560 | 0C5C | 468D | 16F0 | 9A50 | F4F8 | EDCA | C483 | 8D08 |
| 0000164600 | F246 | 4689 | 8CFC | FE56 | 7E80 | 5CF0 | 1474 | 681E |
| 0000164620 | 0C5E | 468D | 16F0 | 9A50 | F4B2 | E0E3 | C483 | EB08 |
| 0000164640 | 9004 | 4EFF | 6AFC | FF0A | FE76 | 76FF | FFFC | FA76 |
| 0000164660 | D69A | F0F5 | 83E0 | 08C4 | 468D | 16F0 | 9A50 | FBD6 |
| 0000164700 | DE09 | C483 | C304 | 74C0 | BF03 | FFFF | 44C6 | 000A |
| 0000164720 | C78B | 5F5E | CBC9 | 08C8 | 0000 | AA9A | 34EB | 89E1 |
| 0000164740 | FC46 | 5689 | 0BFE | 75D0 | 2B05 | 99C0 | 37EB | 76FF |
| 0000164760 | 50FE | 76FF | FF0E | 0C76 | 76FF | FF0A | 0876 | 76FF |
| 0000165000 | 9A06 | E3D0 | E16C | C483 | 890E | F846 | 5689 | 8BFA |
| 0000165020 | FC46 | 622D | B90C | 000C | F799 | 50F9 | CFE8 | 8B14 |
| 0000165040 | F846 | 568B | C9FA | 90CB | 8B55 | 6AEC | FF40 | 0C76 |
| 0000165060 | 76FF | FF0A | 0876 | 76FF | 9A06 | E106 | E03C | CBC9 |
| 0000165100 | 08C8 | 0000 | 5657 | 768B | 8B06 | 2DC6 | 0C62 | 0CB9 |
| 0000165120 | 9900 | F9F7 | 4689 | 50FA | 87E8 | 8314 | 02C4 | 561E |
| 0000165140 | 2FE8 | 8303 | 04C4 | F88B | 468D | 160E | FF50 | 0C76 |
| 0000165160 | 76FF | 1E0A | 9A56 | E6C0 | E10D | C483 | 890C | F846 |
| 0000165200 | 561E | E857 | 0384 | C483 | FF06 | FA76 | 5FE8 | 8314 |
| 0000165220 | 02C4 | 468B | 5EF8 | C95F | 90CB | 8B55 | 56EC | 8B57 |
| 0000165240 | 0676 | 448A | A80A | 7483 | A85F | 7540 | A85B | 7502 |
| 0000165260 | 0C48 | 8801 | 0A44 | FE8B | EF81 | 0C62 | C781 | 0E42 |
| 0000165300 | 0CA8 | 0D75 | 05F6 | 7501 | 1E08 | E856 | 0186 | C483 |
| 0000165320 | 8B04 | 0644 | 0489 | 75FF | FF02 | 0874 | 3350 | 8ADB |
| 0000165340 | 0B5C | 0E53 | A1E8 | 830C | 08C4 | C00B | 1174 | FF3D |
| 0000165360 | 75FF | 801A | 0A4C | EB20 | 800A | 0A4C | EB20 | 8009 |
| 0000165400 | 0A4C | C710 | 0444 | 0000 | FFB8 | EBFF | 8A25 | 3FBF |
| 0000165420 | 800A | 82E7 | FF80 | 7582 | 8A0B | 0A7C | C7F6 | 7582 |
| 0000165440 | 8003 | 200D | 894B | 0444 | 1CC4 | C033 | 8A26 | 4307 |
| 0000165460 | 1C89 | 5E5F | CB5D | 8B55 | 56EC | 8B57 | 0876 | 448A |
| 0000165500 | A80A | 7482 | A864 | 7540 | C760 | 0444 | 0000 | 01A8 |
| 0000165520 | 0B74 | 10A8 | 5374 | 4C8B | 8906 | 240C | 0CFE | 2402 |
| 0000165540 | 88EF | 0A44 | FE8B | EF81 | 0C62 | C781 | 0E42 | DB33 |
| 0000165560 | 5C8A | A80B | 7508 | A84B | 7504 | F618 | 0105 | 4275 |
| 0000165600 | FE81 | 0C6E | 0674 | FE81 | 0C7A | 2675 | 87F6 | 0A3F |
| 0000165620 | 7440 | B91F | 0001 | 1651 | 7E8D | 5706 | 0E53 | 4FE8 |
| 0000165640 | 830D | 08C4 | 01B9 | EB00 | B846 | FFFF | 4C80 | 200A |
| 0000165660 | 65EB | 1E53 | E856 | 009C | C483 | 5B04 | 44F6 | 080A |
| 0000165700 | D174 | 0C8B | 548B | 2B06 | 42CA | 1489 | 558B | 4A02 |
| 0000165720 | 5489 | E304 | 5125 | FF51 | 0874 | 74FF | 5306 | E80E |
| 0000165740 | 0D0E | C483 | 5908 | 7CC4 | 8B06 | 0656 | 8826 | 3B15 |
| 0000165760 | 75C1 | 33B6 | 8AC0 | 0646 | 1DEB | C033 | 87F6 | 0A3F |

THU MAR 14 17:42:50 1991 MEDIT.DLL PAGE 65, LINE 3777

| | | | | | | | | |
|---|---|---|---|---|---|---|---|---|
| 0000166000 | 7420 | B9E3 | 0002 | 5051 | 5350 | E80E | 092E | C483 |
| 0000166020 | 3308 | 8BC0 | EBC8 | 5FCF | 5D5E | 00CB | 8B55 | 56EC |
| 0000166040 | 768B | 8A04 | 0A44 | 83A8 | 2674 | 08A8 | 2274 | 74FF |
| 0000166060 | FF08 | 0674 | FE9A | A8F1 | 83E1 | 04C4 | 6480 | F70A |
| 0000166100 | C033 | 4489 | 8906 | 0844 | 0489 | 4489 | 8902 | 0444 |
| 0000166120 | 5D5E | 00C3 | 8B55 | 56EC | 768B | B804 | 0200 | 9A50 |
| 0000166140 | F1F4 | E367 | 8B59 | 81DE | 62EB | 810C | 42C3 | 0B0E |
| 0000166160 | 74D2 | 800B | 0A4C | C708 | 0247 | 0200 | 0EEB | 4C80 |
| 0000166200 | 040A | 47C7 | 0102 | 8C00 | 8DDA | 0147 | 5489 | 8902 |
| 0000166220 | 8904 | 0854 | 4489 | C706 | 0444 | 0000 | 5D5E | 00C3 |
| 0000166240 | 08C8 | 0000 | 5657 | 5EC4 | 260A | 078A | 3D98 | 0077 |
| 0000166260 | 4874 | 0877 | 612C | 4C74 | 112C | 0674 | C02B | E999 |
| 0000166300 | 00CC | F62B | 46C6 | 01FC | 46C7 | 01FE | FF00 | 0A46 |
| 0000166320 | 5EC4 | 260A | 3F80 | 7400 | 835B | FE7E | 7400 | 2655 |
| 0000166340 | 078A | 3D98 | 0074 | 3474 | 0877 | 2B2C | 1C74 | 372C |
| 0000166360 | 3674 | 46C7 | 00FE | EB00 | 90D4 | 01BE | C603 | FC46 |
| 0000166400 | EB02 | 90C5 | 09BE | EB01 | 90F4 | C6F7 | 0002 | E275 |
| 0000166420 | CE83 | 8302 | FEE6 | 46C6 | 80FC | B1EB | C6F7 | C000 |
| 0000166440 | D075 | CE81 | 4000 | A5EB | C6F7 | C000 | C475 | CE81 |
| 0000166460 | 8000 | 99EB | A468 | FF01 | 0E76 | FF56 | 0876 | 76FF |
| 0000166500 | 9A06 | ECDA | E392 | C483 | 890A | FA46 | C00B | 037D |
| 0000166520 | 69E9 | FFFF | 6006 | 8B0C | 107E | C78B | 622D | 050C |
| 0000166540 | 0E42 | 4689 | 8AF8 | FC46 | 4588 | 8B0A | F85E | 07C6 |
| 0000166560 | 2B00 | 89C0 | 0445 | 4789 | 8904 | 0245 | 0589 | 4589 |
| 0000166600 | 8908 | 0645 | 468A | 88FA | 0B45 | C78B | DA8C | 5F5E |
| 0000166620 | CBC9 | 8B55 | 56EC | 8B57 | 0476 | 26BB | 8110 | 6EFE |
| 0000166640 | 740C | BB09 | 102A | FE81 | 0C7A | 5875 | FE8B | EF81 |
| 0000166660 | 0C62 | C781 | 0E42 | 44F6 | DC0A | 4875 | 05F6 | 7501 |
| 0000166700 | 8B43 | 8B07 | 0257 | C88B | CA0B | 2174 | 4489 | 8906 |
| 0000166720 | 0854 | 0489 | 5489 | C702 | 0444 | 0200 | 45C7 | 0002 |
| 0000166740 | 8002 | 0A4C | C602 | 1105 | 01B8 | EB00 | 5319 | 00B8 |
| 0000166760 | 5002 | F49A | 74F1 | 5BE4 | 0B5B | 74D2 | 8907 | 8907 |
| 0000167000 | 0257 | C8EB | C033 | 5E5F | C35D | 8B55 | 56EC | 8B57 |
| 0000167020 | 0676 | FE8B | EF81 | 0C62 | C781 | 0E42 | 05F6 | 7410 |
| 0000167040 | 332D | 8ADB | 0B5C | 87F6 | 0A3F | 7440 | 1E21 | 0E56 |
| 0000167060 | 65E8 | 8300 | 04C4 | 7E83 | 0004 | 1274 | C033 | 0588 |
| 0000167100 | 4589 | 8902 | 8904 | 0244 | 4489 | 8906 | 0844 | 5E5F |
| 0000167120 | C35D | 04C6 | 0000 | 468B | 0B08 | 0646 | 0875 | 006A |
| 0000167140 | A7E8 | EB00 | 9031 | 468B | 2D06 | 0C62 | 0CB9 | 9900 |
| 0000167160 | F9F7 | 4689 | 50FC | 69E8 | 8310 | 02C4 | 76FF | FF08 |
| 0000167200 | 0676 | C89A | 0CE5 | 83E6 | 04C4 | 4689 | FFFE | FC76 |
| 0000167220 | 5BE8 | 8B10 | FE46 | CBC9 | 02C8 | 0000 | 5657 | FF2B |
| 0000167240 | 768B | 8A06 | 0A44 | C88B | 0324 | 023C | 3F75 | C1F6 |
| 0000167260 | 7508 | 8B0D | 81DE | 62EB | F60C | 4287 | 010E | 2D74 |
| 0000167300 | 048B | 442B | 8906 | FE46 | C00B | 217E | FF50 | 0874 |
| 0000167320 | 74FF | 8A06 | 0B4C | ED2A | 9A51 | F020 | E689 | C483 |
| 0000167340 | 3908 | FE46 | 0774 | 4C80 | 200A | FFBF | 8BFF | 0644 |
| 0000167360 | 548B | 8908 | 8904 | 0254 | 44C7 | 0004 | 8B00 | 5EC7 |
| 0000167400 | C95F | 90CB | 016A | 01E8 | CB00 | 04C8 | 0000 | 5657 |
| 0000167420 | 62BE | 2B0C | 89FF | FE7E | 026A | 15E8 | 8310 | 02C4 |
| 0000167440 | 11EB | 46C7 | FFFE | FFFF | FC76 | C1E8 | 830F | 02C4 |
| 0000167460 | C683 | 390C | 2236 | 7210 | 8B2B | 2DC6 | 0C62 | 0CB9 |
| 0000167500 | 9900 | F9F7 | 4689 | 50FC | 97E8 | 830F | 02C4 | 44F6 |
| 0000167520 | 830A | D374 | 561E | C89A | 25E5 | 83E5 | 04C4 | 7440 |
| 0000167540 | 47C1 | C3EB | 026A | F3E8 | 830F | 02C4 | 7E83 | 0104 |
| 0000167560 | 0475 | C78B | 03EB | 468B | 5EFE | C95F | 02C2 | 9000 |
| 0000167600 | E718 | E723 | E739 | E76D | E799 | E7A1 | E7CA | E7FC |
| 0000167620 | 8B55 | B8EC | 0171 | E80E | F6F2 | 5756 | C033 | 4689 |
| 0000167640 | 88F8 | FB46 | 76C4 | 260A | 89AC | 0A76 | 4688 | 0AFE |

THU MAR 14 17:42:50 1991 MEDIT.DLL PAGE 66, LINE 3836

| | | | | | | | | |
|---|---|---|---|---|---|---|---|---|
| 0000167660 | 74C0 | 8306 | F87E | 7D00 | 8B06 | F846 | B5E9 | BB04 |
| 0000167700 | 102E | 202C | 583C | 0577 | 24D7 | EB0F | B002 | B100 |
| 0000167720 | D203 | 02E0 | FB46 | FED7 | D2C1 | 88E8 | FB46 | 8B98 |
| 0000167740 | D1D8 | 2EE3 | A7FF | E6B0 | 568A | B9FE | 0001 | 36E8 |
| 0000167760 | EB04 | 33B1 | 89C0 | F046 | 4689 | 89F6 | EE46 | 46C7 |
| 0000170000 | 20FC | 4800 | 4689 | EBF4 | 8A9B | FE46 | 2D3C | 0675 |
| 0000170020 | 4E80 | 04FC | 8EEB | 2B3C | 0675 | 4E80 | 01FC | 84EB |
| 0000170040 | 203C | 0775 | 4E80 | 02FC | 79E9 | 3CFF | 7523 | 8007 |
| 0000170060 | FC4E | E980 | FF6E | 4E80 | 08FC | 67E9 | 8AFF | FE4E |
| 0000170100 | F980 | 752A | E80F | 035C | C00B | 1779 | D8F7 | 4E80 |
| 0000170120 | 04FC | 0FEB | E980 | 3230 | 8BED | F646 | 0ABB | F700 |
| 0000170140 | 03E3 | 89C1 | F646 | 3BE9 | C7FF | F446 | 0000 | 33E9 |
| 0000170160 | 8AFF | FE4E | F980 | 752A | E80C | 0328 | C00B | 1479 |
| 0000170200 | FFB8 | EBFF | 800F | 30E9 | ED32 | 468B | BBF4 | 000A |
| 0000170220 | E3F7 | C103 | 4689 | E9F4 | FF0A | 468A | 3CFE | 756C |
| 0000170240 | 8006 | FC4E | EB10 | 3C22 | 7546 | 8006 | FC4E | EB20 |
| 0000170260 | 3C18 | 754E | 8006 | FD4E | EB10 | 3C0E | 754C | 8006 |
| 0000170300 | FD4E | EB04 | 8004 | FD4E | E908 | FED8 | 468A | 3CFE |
| 0000170320 | 7564 | E903 | 0194 | 693C | 0375 | 8DE9 | 3C01 | 7575 |
| 0000170340 | E903 | 018A | 583C | 0375 | 89E9 | 3C01 | 7578 | E903 |
| 0000170360 | 0188 | 6F3C | 0375 | A2E9 | 3C01 | 7463 | 3C1A | 7473 |
| 0000170400 | 3C27 | 746E | 3C51 | 7470 | 3C60 | 7445 | 3C07 | 7447 |
| 0000170420 | E903 | 00BB | B5E9 | E800 | 028A | BE8D | FE8F | 0716 |
| 0000170440 | 4FAA | 01B9 | E900 | 01F1 | 90E8 | 0B02 | 75FF | 8C12 |
| 0000170460 | 0BC0 | 75C0 | 1E0C | BF07 | 1087 | 0E8B | 108D | D8E9 |
| 0000170500 | 5701 | 4E8B | E3F4 | 3207 | F2C0 | 75AE | 4F01 | 2B59 |
| 0000170520 | 87F9 | E9CF | 01C3 | 62E8 | 8B02 | F846 | F6AB | FC46 |
| 0000170540 | 7410 | 3303 | ABC0 | 3BE9 | F6FE | FC46 | 7530 | E805 |
| 0000170560 | 0232 | 39EB | 36E8 | F602 | FD46 | 7518 | C630 | FF46 |
| 0000170600 | B907 | 0010 | 0716 | 3352 | 8DD2 | 97BE | BEFE | 0004 |
| 0000170620 | B0E8 | B902 | 0010 | BE8D | FE92 | 3358 | BED2 | 0004 |
| 0000170640 | A0E8 | C602 | 9386 | 3AFE | 09B9 | EB00 | C618 | FF46 |
| 0000170660 | B907 | 0010 | 0716 | D233 | BE8D | FE92 | 04BE | E800 |
| 0000170700 | 0281 | 04B9 | 8D00 | 8FBE | E9FE | 014D | 46FF | 80EE |
| 0000170720 | FC4E | 8A40 | FE46 | 200C | 8B98 | 83F0 | F47E | 7F00 |
| 0000170740 | 7413 | C707 | F446 | 0006 | 0AEB | 673D | 7500 | C705 |
| 0000170760 | F446 | 0001 | BE8D | FE8F | 76FF | FFEE | F476 | 1656 |
| 0000171000 | FF57 | 1076 | 76FF | F60E | FD46 | 7404 | FF0A | B61E |
| 0000171020 | 8310 | 0E46 | EB0A | FF08 | A21E | 8310 | 0E46 | 8308 |
| 0000171040 | 0EC4 | 46F6 | 80FC | 0F74 | 7E83 | 00F4 | 0975 | 5716 |
| 0000171060 | 1EFF | 10AE | C483 | 8304 | 67FE | 1075 | 46F7 | 80FC |
| 0000171100 | 7500 | 1609 | FF57 | A61E | 8310 | 04C4 | 0716 | 8026 |
| 0000171120 | 2D3D | 0575 | 8047 | FD4E | B901 | FFFF | B057 | F200 |
| 0000171140 | 4FAE | 2B59 | 87F9 | E9CF | 00AF | 4E80 | 40FC | 46C6 |
| 0000171160 | 0AFA | 35EB | 46C6 | 07FF | 04EB | 46C6 | 27FF | 46F6 |
| 0000171200 | 80FC | 1174 | 46C7 | 02F0 | C600 | F246 | B230 | 0251 |
| 0000171220 | FF56 | 5688 | C6F3 | FA46 | EB10 | F60E | FC46 | 7480 |
| 0000171240 | 8004 | FD4E | C602 | FA46 | F608 | FC46 | 7410 | E805 |
| 0000171260 | 00FB | 0EEB | EDE8 | F600 | FC46 | 7440 | 9903 | 02EB |
| 0000171300 | D233 | 46F6 | 40FC | 0F74 | D20B | 0B7D | 4E80 | 01FD |
| 0000171320 | D8F7 | D283 | 7700 | 83DA | F47E | 7D00 | C707 | F446 |
| 0000171340 | 0001 | 04EB | 6680 | F7FC | D88B | DA0B | 0575 | 46C7 |
| 0000171360 | 00F0 | 8D00 | EB7E | 0716 | 4E8A | 32FA | 8BED | F476 |
| 0000171400 | 40E8 | F601 | FD46 | 7402 | E30E | 2606 | 3D80 | 7430 |
| 0000171420 | 4F06 | C626 | 3005 | EB41 | F600 | FC46 | 7440 | F631 |
| 0000171440 | FD46 | 7401 | C60B | F246 | C72D | F046 | 0001 | 20EB |
| 0000171460 | 46F6 | 01FC | 0B74 | 46C6 | 2BF2 | 46C7 | 01F0 | EB00 |
| 0000171500 | F60F | FC46 | 7402 | C609 | F246 | C720 | F046 | 0001 |
| 0000171520 | 468B | 2BF6 | 2BC1 | F046 | 027D | C033 | 5706 | F651 |

THU MAR 14 17:42:50 1991 MEDIT.DLL PAGE 67, LINE 3895

| | | | | | | | | |
|---|---|---|---|---|---|---|---|---|
| 0000171540 | FC46 | 750C | 8B07 | B2C8 | E820 | 00BB | 1650 | 8D07 |
| 0000171560 | F27E | 4E8B | E8F0 | 0091 | F658 | FC46 | 7408 | F60D |
| 0000171600 | FC46 | 7504 | 8B07 | B2C8 | E830 | 009B | 5F59 | 5007 |
| 0000171620 | 76E8 | 5800 | 46F6 | 04FC | 0774 | C88B | 20B2 | 86E8 |
| 0000171640 | E900 | FC00 | 76C4 | 260E | 89AD | 0E76 | C4C3 | 0E76 |
| 0000171660 | AD26 | D08B | AD26 | 8992 | 0E76 | F6C3 | FC46 | 7420 |
| 0000171700 | E808 | FFE9 | C28E | F88B | E8C3 | FFD8 | F88B | C00B |
| 0000171720 | 0375 | C08E | 1EC3 | C307 | 0698 | C457 | 065E | FF26 |
| 0000171740 | 044F | 1078 | 8B26 | 263F | 07FF | 8E26 | 0247 | 33AA |
| 0000171760 | 5FC0 | C307 | 5251 | 5306 | 0E50 | 39E8 | 83F7 | 06C4 |
| 0000172000 | 595A | FF3D | 75FF | EBE8 | E3E8 | 8B1B | 01F7 | F84E |
| 0000172020 | 3357 | 26FF | E8AC | FFC0 | F80B | F7E2 | FF0B | 745F |
| 0000172040 | C705 | F846 | FFFF | E3C3 | 0119 | F84E | 3357 | 8AFF |
| 0000172060 | E8C2 | FFA4 | F80B | F7E2 | FF0B | 745F | C705 | F846 |
| 0000172100 | FFFF | FDC3 | 9357 | F60B | 0A7F | DB0B | 0675 | D20B |
| 0000172120 | 0275 | 1AEB | 3392 | F7D2 | 93F1 | F1F7 | 8792 | 04D3 |
| 0000172140 | 3C30 | 7639 | 0203 | FF46 | 8BAA | 4EC2 | D8EB | 2B59 |
| 0000172160 | 47CF | C3FC | 5E5F | E58B | CB5D | 06C8 | 0000 | BE56 |
| 0000172200 | 0C62 | C02B | 4689 | 89FC | FA46 | 026A | A3E8 | 830A |
| 0000172220 | 02C4 | 0CEB | 76FF | E8FE | 0A54 | C483 | 8302 | 0CC6 |
| 0000172240 | 3639 | 1022 | 3B72 | C68B | 622D | B90C | 000C | F799 |
| 0000172260 | 89F9 | FE46 | E850 | 0A2A | C483 | F602 | 0A44 | 7583 |
| 0000172300 | C7D3 | 0444 | 0000 | 44C6 | 000A | C02B | 4489 | 8908 |
| 0000172320 | 0644 | 4489 | 8902 | C604 | 0B44 | 89FF | FA76 | 5E8C |
| 0000172340 | 6AFC | E802 | 0A76 | C483 | 8B02 | FA46 | 568B | 5EFC |
| 0000172360 | CBC9 | 8B55 | 8BEC | 065E | 1E3B | 0A3D | 1272 | 09BA |
| 0000172400 | 3300 | E9C0 | F35A | E853 | 09FC | C483 | E902 | F369 |
| 0000172420 | E853 | 09E6 | C483 | 5302 | FF9A | 00FF | 8500 | 75C0 |
| 0000172440 | C6E5 | 3F87 | 000A | E853 | 09DC | C483 | 8B02 | 5DE5 |
| 0000172460 | 00CB | 8B55 | 83EC | 02EC | C033 | 09EB | 8B55 | 83EC |
| 0000172500 | 02EC | FFB8 | 89FF | FE46 | 5E8B | 3B06 | 3D1E | 720A |
| 0000172520 | BA19 | 0009 | C033 | 07E9 | 8BF3 | FE4E | C90B | 0774 |
| 0000172540 | E853 | 09A2 | C483 | E902 | F30F | C00B | 0774 | E853 |
| 0000172560 | 0988 | C483 | 8302 | 04EC | CC8B | FF53 | 0A76 | 76FF |
| 0000172600 | FF08 | 0C76 | 5116 | FF9A | 00FF | 5900 | 855A | 75C0 |
| 0000172620 | 80C8 | 3FA7 | FD0A | 468B | 0BFE | 74C0 | 5307 | 65E8 |
| 0000172640 | 8309 | 02C4 | 8B91 | 5DE5 | 00CB | 8B55 | 83EC | 0EEC |
| 0000172660 | 7E8A | 8B0C | 0E46 | 4689 | EB0C | 5508 | EC8B | EC83 |
| 0000172700 | B70E | FF40 | 0876 | 76FF | 1606 | 568D | 52FE | 8D16 |
| 0000172720 | F856 | 3352 | 52D2 | 8B52 | 0C4E | 99E8 | 8B01 | 0A46 |
| 0000172740 | 00A9 | 7401 | 8008 | 10CA | 00A9 | 7504 | A92A | 0200 |
| 0000172760 | 2274 | CA80 | 5002 | 468D | FFFE | 0876 | 76FF | 1606 |
| 0000173000 | 3350 | 50C0 | 9A50 | FFFF | 0000 | C085 | 7558 | 8B08 |
| 0000173020 | FE4E | 03EB | CA80 | 5101 | 2552 | 0003 | C70A | 3350 |
| 0000173040 | 50C0 | 9A50 | FFFF | 0000 | C00B | 1674 | 6E3D | 7500 |
| 0000173060 | F60E | F0C2 | 02BA | 7400 | BA03 | 0011 | 21E9 | E9F2 |
| 0000173100 | 009D | 468B | 3BFE | 3D06 | 720A | 500D | 499A | 00EC |
| 0000173120 | BA00 | 0018 | C033 | E4EB | E850 | 089E | C483 | 8B02 |
| 0000173140 | 50D0 | 8D16 | F45E | 1653 | 468D | 50F8 | F89A | 00DB |
| 0000173160 | 0B00 | 75C0 | 8B61 | 0A46 | C933 | 00A9 | 7580 | A90E |
| 0000173200 | 4000 | 0775 | 06F6 | 1091 | 7580 | B102 | 8880 | F24C |
| 0000173220 | 468A | 3CF4 | 7501 | C607 | F446 | E940 | 008F | 023C |
| 0000173240 | 0775 | 46C6 | 08F4 | 84E9 | 3200 | 88C0 | F446 | C90A |
| 0000173260 | F474 | 46F7 | 020A | 7400 | 5274 | FFB9 | 51FF | B951 |
| 0000173300 | 0002 | 1651 | 468D | 50FA | B79A | 00EC | 0B00 | 74C0 |
| 0000173320 | 3D15 | 0083 | 0C74 | 76FF | E8FE | 082A | C483 | E902 |
| 0000173340 | F197 | C033 | 47EB | 1652 | 468D | 50F6 | 01B8 | 5000 |
| 0000173360 | 8D16 | F846 | 9A50 | FFFF | 0000 | C00B | 1B75 | 4639 |
| 0000173400 | 74F8 | 802A | F67E | 751A | 5210 | 76FF | FFFC | FA76 |

THU MAR 14 17:42:50 1991 MEDIT.DLL PAGE 68, LINE 3954

| | | | | | | | | |
|---|---|---|---|---|---|---|---|---|
| 0000173420 | FF9A | 00FF | 0B00 | 75C0 | 52BD | C033 | 5050 | 1650 |
| 0000173440 | 468D | 50FA | F99A | 00ED | 0B00 | 75C0 | 8AA9 | F44E |
| 0000173460 | C1F6 | 7548 | FF28 | 0876 | 76FF | 1606 | 468D | 50F8 |
| 0000173500 | C033 | 5050 | 369A | 00ED | F700 | F846 | 0001 | 0374 |
| 0000173520 | C980 | F710 | 0A46 | 0008 | 0374 | C980 | 0A20 | F24E |
| 0000173540 | C980 | 8B01 | 8BC2 | 88D8 | 3F8F | 530A | 97E8 | 8307 |
| 0000173560 | 02C4 | E58B | CB5D | 38A1 | F70A | 23D0 | 33C1 | A8C9 |
| 0000173600 | 7580 | 8003 | 01C9 | 00C3 | 8B55 | 83EC | 08EC | C033 |
| 0000173620 | 5E8B | 3B06 | 3D1E | 730A | 534D | 5DE8 | 8307 | 02C4 |
| 0000173640 | 4E8B | E30C | F647 | 3F87 | 020A | 4075 | 3357 | 8BD2 |
| 0000173660 | 0C4E | 7EC4 | F608 | 3F87 | 080A | 1074 | 878A | 0B3F |
| 0000173700 | 0A3C | 0874 | 42AA | C649 | 3F87 | DA0B | 0653 | 5157 |
| 0000173720 | 468D | 16FA | 9A50 | EE26 | 0000 | 0B5F | 74C0 | 530F |
| 0000173740 | 23E8 | 8307 | 02C4 | 09BA | E900 | F074 | 4AEB | 468B |
| 0000173760 | 03FA | F6C2 | 3F87 | 800A | 3E74 | A780 | 0A3F | 56FB |
| 0000174000 | 1E57 | C507 | 0876 | FE8B | C88B | 28E3 | 0DB4 | 3C80 |
| 0000174020 | 750A | 2606 | 8F80 | 0A3F | AC04 | C43A | 2574 | 1A3C |
| 0000174040 | 0875 | 8026 | 3F8F | 020A | 05EB | 0588 | E247 | 8BEA |
| 0000174060 | 2BC7 | 0846 | 1F06 | 5E5F | E853 | 06CA | C483 | 8B02 |
| 0000174100 | 5DE5 | 83CB | 01F9 | 0774 | 3C80 | 740A | EBE0 | 26DB |
| 0000174120 | 87F6 | 0A3F | 7440 | 0B2B | 75DB | 5323 | 468D | 16F9 |
| 0000174140 | 5150 | 468D | 16FA | 9A50 | EF06 | 0000 | C085 | 0E74 |
| 0000174160 | 1F06 | 5E5F | E853 | 068E | C483 | E902 | EFFB | 0AB0 |
| 0000174200 | A8EB | 46C6 | 00F9 | 8D53 | F946 | 5016 | 8D51 | FA46 |
| 0000174220 | 5016 | 989A | 00EF | 0B00 | 75C0 | F7D5 | FA46 | FFFF |
| 0000174240 | 3674 | 7E83 | 010C | 3574 | F626 | 3F87 | 080A | 1C75 |
| 0000174260 | B853 | FFFF | 5050 | D8F7 | 8D50 | FC46 | 5016 | 559A |
| 0000174300 | D0EE | 8000 | F97E | 750A | E90F | FF61 | 468A | 26F9 |
| 0000174320 | 8788 | 0B3F | 0A3C | 0274 | 0DB0 | 4DE9 | 80FF | F97E |
| 0000174340 | 750A | EBC5 | 0099 | 8B55 | 83EC | 0EEC | C033 | 09EB |
| 0000174360 | 8B55 | 83EC | 0EEC | FFB8 | 89FF | F246 | 5E8B | 3B06 |
| 0000174400 | 3D1E | 720A | BA08 | 0009 | C033 | 53E9 | 0BEF | 74C0 |
| 0000174420 | 5307 | E5E8 | 8305 | 02C4 | 87F6 | 0A3F | 7420 | 5312 |
| 0000174440 | C933 | 5151 | 4141 | 8D51 | F446 | 5016 | EF9A | 00EF |
| 0000174460 | F600 | 3F87 | 800A | 6674 | 5E8C | 8EFA | 0A46 | 56C5 |
| 0000174500 | 3308 | 89C0 | FE46 | 4689 | FCFC | 5657 | FA8B | F28B |
| 0000174520 | 6689 | 8BF8 | 0C4E | 28E3 | 0AB0 | AEF2 | 3B75 | EC83 |
| 0000174540 | 8B02 | BADC | 0080 | E22B | D48B | FA8B | 0716 | 4E8B |
| 0000174560 | AC0C | 0A3C | 0D74 | FB3B | 1A74 | E2AA | E8F4 | 0038 |
| 0000174600 | AFE9 | B000 | 3B0D | 75FB | E803 | 002C | B0AA | FF0A |
| 0000174620 | FC46 | E2EB | 21E8 | EB00 | 5EE1 | 8E5F | FA5E | C8E9 |
| 0000174640 | 8B00 | F246 | C00B | 0974 | 76FF | E806 | 0558 | C483 |
| 0000174660 | B802 | FFFC | E80E | ECD4 | 5350 | 1E51 | 1F06 | CF8B |
| 0000174700 | CA2B | 21E3 | 8B51 | D65E | 1E53 | 5152 | 468D | 16F4 |
| 0000174720 | 9A50 | DF37 | 0000 | 0B59 | 75C0 | 8B11 | F45E | 5E01 |
| 0000174740 | 3BFE | 72D9 | 1F07 | 5B59 | 8B58 | C3FA | 831F | 08C4 |
| 0000174760 | 7E83 | D0FE | 3C75 | C00B | 1874 | 6D3D | 7400 | 3D0D |
| 0000175000 | 0001 | 09BA | 7500 | BA08 | 001C | 03EB | 20BA | F900 |
| 0000175020 | 26EB | 5E8E | F6FA | 3F87 | 400A | 0E74 | 5E8E | 8B0A |
| 0000175040 | 085E | 3F80 | 751A | F803 | 0EEB | 1CBA | 3300 | F9C0 |
| 0000175060 | 06EB | 468B | 2BFE | FC46 | 668B | 5EF8 | 8E5F | FA5E |
| 0000175100 | 1472 | 5E8B | 0BF2 | 74DB | FF09 | 0676 | B7E8 | 8304 |
| 0000175120 | 02C4 | E58B | CB5D | 5E8B | 0BF2 | 74DB | FF09 | 0676 |
| 0000175140 | A3E8 | 8304 | 02C4 | F7E9 | 8BED | 0C4E | C90B | 0475 |
| 0000175160 | C18B | CEEB | C51E | 0856 | 1E53 | 5152 | 468D | 16F4 |
| 0000175200 | 9A50 | F102 | 0000 | 071E | 0B1F | 74C0 | 3D17 | 006D |
| 0000175220 | 0D74 | 013D | BA00 | 0009 | BC75 | 1CBA | EB00 | BAB7 |
| 0000175240 | 0020 | B2EB | 468B | 0BF4 | 75C0 | F697 | 3F87 | 400A |
| 0000175260 | 0A74 | DA8B | 8026 | 1A3F | 0275 | 86EB | 1CBA | 3300 |

THU MAR 14 17:42:50 1991 MEDIT.DLL PAGE 69, LINE 4013

| | | | | | | | | |
|---|---|---|---|---|---|---|---|---|
| 0000175300 | EBC0 | 0093 | 1BEA | B5F2 | EAE5 | F23A | F1F7 | 08EA |
| 0000175320 | FCF2 | EAF1 | F208 | F201 | 8B55 | 56EC | 76C4 | 8C06 |
| 0000175340 | E3C1 | 2605 | 4C80 | 01FE | 5D5E | 55CB | EC8B | 096A |
| 0000175360 | 3FE8 | 8304 | 02C4 | 76FF | 0E06 | 0DE8 | 5B00 | 096A |
| 0000175400 | 59E8 | 8304 | 02C4 | E58B | CB5D | 8B55 | 56EC | 8B57 |
| 0000175420 | 064E | F983 | 77E8 | 1E69 | 94A1 | 0B10 | 74C0 | BF48 |
| 0000175440 | F322 | 368B | 109C | 1EC5 | 1096 | 561E | FF57 | 5FD7 |
| 0000175460 | 735E | 8C2B | C5DA | 0C5F | D63B | EF75 | 1F58 | C41E |
| 0000175500 | 9636 | 2610 | 748B | C512 | 921E | 8C10 | 3BDA | 75D0 |
| 0000175520 | 1FD9 | 811E | 9EFF | 74F3 | BF0E | F39E | C4EB | 815E |
| 0000175540 | 22FF | 74F3 | EB0F | 070A | BF06 | 1092 | E1E8 | 7201 |
| 0000175560 | E80E | 007E | 891F | 9816 | 8910 | 961E | EB10 | 1F04 |
| 0000175600 | C033 | 5F99 | 5D5E | 00CB | 5706 | F88B | FB03 | 7F89 |
| 0000175620 | 4F04 | 2D4F | 0016 | 778D | C714 | FE05 | 89FF | 0A7F |
| 0000175640 | 8948 | 8C04 | 8B1F | 8CC6 | 8EDA | 8DC2 | 067F | ABFC |
| 0000175660 | 47AB | 3347 | ABC0 | ABAB | 5FAB | C307 | 8B26 | 0245 |
| 0000175700 | C00B | 0975 | 8C26 | 025D | 8926 | EB1D | 0614 | C426 |
| 0000175720 | 0875 | 8C26 | 0E5C | 8926 | 0C5C | 478C | 8912 | 1077 |
| 0000175740 | 2607 | 5D8C | 260A | 5D89 | 2608 | 5D8C | 2606 | 5D89 |
| 0000175760 | C304 | 8041 | FEE1 | FC53 | 778B | 8B08 | 0A5F | FF33 |
| 0000176000 | 23EB | C38B | A85B | 7501 | 5342 | 778B | 8B06 | 085F |
| 0000176020 | DE3B | 3674 | 334B | EBFF | 900C | 548D | 3BFE | 73D3 |
| 0000176040 | 03E1 | 72F0 | AD23 | 01A8 | F074 | FE8B | 3B48 | 73C1 |
| 0000176060 | 0323 | 72F0 | 8B13 | ADD0 | 01A8 | DE74 | C203 | 0205 |
| 0000176100 | 8B00 | 89F7 | FE44 | E4EB | C08B | 8B5B | 0647 | 4789 |
| 0000176120 | F908 | 19EB | 895B | FE4C | 0974 | F903 | C12B | 8948 |
| 0000176140 | 2B05 | 03F9 | 89F9 | 087F | C68B | DA8C | C3F8 | 5751 |
| 0000176160 | 47F6 | 0102 | 6674 | B7E8 | 8B00 | 8BFE | A804 | 7401 |
| 0000176200 | 2B03 | 49C8 | 4141 | 778B | 0B04 | 74F6 | 034F | 73CE |
| 0000176220 | 3309 | BAC0 | FFF0 | 33E3 | 42EB | E4B8 | 8EDE | 26C0 |
| 0000176240 | A0A1 | 3D10 | 2000 | 1674 | 00BA | 3B80 | 72D0 | D106 |
| 0000176260 | 75EA | EBF8 | 8322 | 08FA | 1D72 | E2D1 | C28B | 8B48 |
| 0000176300 | 03D0 | 73C1 | 3302 | F7C0 | 23D2 | 52C2 | 2EE8 | 5A00 |
| 0000176320 | 0D73 | FA83 | 74F0 | B805 | 0010 | E2EB | EBF9 | 8B1B |
| 0000176340 | 2BD0 | 0457 | 4789 | 8904 | 087F | 778B | 4A0A | 1489 |
| 0000176360 | 0342 | C7F2 | FE04 | 89FF | 0A77 | 595F | 8BC3 | F6D0 |
| 0000176400 | 0247 | 7404 | 4A0F | 778B | 4E04 | D63B | 0572 | 5739 |
| 0000176420 | 73FE | 4218 | 1E50 | 3B9A | 00DB | 0B00 | 75C0 | 8B0F |
| 0000176440 | F6C2 | 0247 | 7404 | 4A04 | 5789 | F8FE | 01EB | C3F9 |
| 0000176460 | 8B57 | 0877 | 773B | 750A | 8B03 | 0677 | 3DAD | FFFE |
| 0000176500 | 0874 | FE8B | FE24 | F003 | F2EB | 4F4F | F78B | C35F |
| 0000176520 | D18B | C283 | 8027 | F0E2 | 8B50 | 52C4 | 5016 | C033 |
| 0000176540 | 9A50 | C02F | 0000 | 0B1F | 75C0 | 3314 | 26DB | 458B |
| 0000176560 | 890C | 0247 | C28B | 0FE8 | E8FE | FE40 | EBF8 | F901 |
| 0000176600 | 00C3 | 8B55 | 8BEC | 8BD7 | 1EDE | 7EC4 | 3306 | B9C0 |
| 0000176620 | FFFF | AEF2 | 758D | C4FF | 0A7E | FFB9 | F2FF | F7AE |
| 0000176640 | 2BD1 | 8CF9 | 8EC0 | 8ED8 | 0846 | FE87 | 468B | F706 |
| 0000176660 | 01C6 | 7400 | A402 | D149 | F3E9 | 13A5 | F3C9 | 8BA4 |
| 0000176700 | 8BF3 | 1FFA | C28C | CB5D | 8B55 | 8BEC | 8BD7 | 1EDE |
| 0000176720 | 76C5 | 8B0A | 8CFE | 8ED8 | 33C0 | B9C0 | FFFF | AEF2 |
| 0000176740 | D1F7 | 7EC4 | 8B06 | A8C7 | 7401 | A402 | D149 | F3E9 |
| 0000176760 | 13A5 | F3C9 | 8BA4 | 8BF3 | 1FFA | C28C | CB5D | 8B55 |
| 0000177000 | 8BEC | 8BD7 | 1EDE | 76C5 | C406 | 0A7E | C033 | FFB9 |
| 0000177020 | F2FF | F7AE | 2BD1 | F3F9 | 74A6 | 1B05 | 1DC0 | FFFF |
| 0000177040 | 8B1F | 8BF3 | 5DFA | 00CB | 8B55 | 8BEC | C4D7 | 067E |
| 0000177060 | C033 | FFB9 | F2FF | F7AE | 49D1 | 8B91 | 5DFA | 00CB |
| 0000177100 | 8B55 | 57EC | 1E56 | 7EC4 | C506 | 0A76 | DF8B | 4E8B |
| 0000177120 | E30E | AC0C | C00A | 0374 | E2AA | 32F8 | F3C0 | 8BAA |
| 0000177140 | 8CC3 | 1FC2 | 5F5E | E58B | CB5D | 8B55 | 57EC | 1E56 |

THU MAR 14 17:42:50 1991 MEDIT.DLL PAGE 70, LINE 4072

| | | | | | | | | |
|---|---|---|---|---|---|---|---|---|
| 0000177160 | 4E8B | E30E | 8B27 | C4D9 | 067E | F78B | C033 | AEF2 |
| 0000177200 | D9F7 | CB03 | FE8B | 76C5 | F30A | 8AA6 | FF44 | C933 |
| 0000177220 | 3A26 | FF45 | C477 | 0474 | 4949 | D1F7 | C18B | 5E1F |
| 0000177240 | 8B5F | 5DE5 | 00CB | 8B55 | 56EC | B357 | 8B01 | 0C4E |
| 0000177260 | 468B | 3306 | 83D2 | 0AF9 | 0175 | 1E99 | 7EC5 | E908 |
| 0000177300 | 057F | 8B55 | 53EC | 8B51 | 0646 | 568B | 8B08 | 0C5E |
| 0000177320 | FFB9 | D3FF | D3EA | 2BEB | 0A46 | D31B | 5B59 | CA5D |
| 0000177340 | 0008 | 8B55 | 50EC | 468B | 0504 | 0014 | 4BEB | 8B55 |
| 0000177360 | 50EC | 468B | 0504 | 0014 | 69EB | 8B55 | 50EC | 468B |
| 0000177400 | 0504 | 0114 | 33EB | 8B55 | 50EC | 468B | 0504 | 0114 |
| 0000177420 | 51EB | 8B55 | 50EC | 468B | C104 | 02E0 | FF68 | 50FF |
| 0000177440 | FF6A | FF6A | FF9A | 00FF | 0B00 | 75C0 | 5829 | E58B |
| 0000177460 | C35D | 8B55 | 50EC | 468B | FF04 | C006 | C110 | 02E0 |
| 0000177500 | 4D68 | 50F6 | FF6A | FF6A | FF9A | 00FF | 0B00 | 75C0 |
| 0000177520 | 5805 | E58B | C35D | 11B8 | E900 | E4F7 | 8B55 | 50EC |
| 0000177540 | 468B | C104 | 02E0 | 7168 | 50F6 | BB9A | 00D5 | 0B00 |
| 0000177560 | 75C0 | FFE3 | C00E | 5810 | E58B | C35D | 8B55 | FFEC |
| 0000177600 | 0676 | ADE8 | 83FF | 02C4 | E58B | CB5D | 8B55 | FFEC |
| 0000177620 | 0676 | C7E8 | 83FF | 02C4 | E58B | CB5D | 068E | 09FE |
| 0000177640 | A126 | 0006 | 3B48 | C206 | 7710 | C107 | 06E0 | FFBA |
| 0000177660 | C3FF | 5357 | 6A51 | E80F | FF78 | C483 | 3B02 | C206 |
| 0000177700 | 7610 | 8B40 | 05D8 | 0004 | FC25 | 8BFF | C1C8 | 06E0 |
| 0000177720 | DFBA | 50F6 | 9A52 | F447 | 0000 | C00B | 3275 | 8B49 |
| 0000177740 | 87F9 | C23E | 2B10 | 51CF | C147 | 06E7 | E1C1 | 5705 |
| 0000177760 | C28E | ABF3 | 595F | C726 | 0445 | 0200 | C783 | E240 |
| 0000200000 | 8BF5 | 6AC3 | E80F | FF54 | C483 | 5902 | 5F5B | 9BEB |
| 0000200020 | 10B8 | E900 | E43D | 8B55 | 56EC | 8B57 | 0C5E | C38B |
| 0000200040 | 622D | 990C | 0CB9 | F700 | 50F1 | E850 | FEB4 | C483 |
| 0000200060 | 8B02 | 0A56 | D20B | 547E | C44A | 067E | D20B | 5674 |
| 0000200100 | 4F8B | E304 | 3B20 | 76CA | 8B02 | 1ECA | 37C5 | 0AB4 |
| 0000200120 | 9051 | AAAC | C43A | FAE0 | 1F58 | 3789 | 3374 | 4729 |
| 0000200140 | 2B04 | EBD0 | 06D7 | 5253 | 531E | E80E | EA2C | C483 |
| 0000200160 | 5A04 | 075B | FF3D | 74FF | AA08 | 0A3C | 1874 | EB4A |
| 0000200200 | 3BBB | 067E | 0674 | 47F6 | 200A | 0A74 | C033 | EB99 |
| 0000200220 | 2B0E | 29C1 | 0447 | C033 | 8BAA | 0646 | 568B | 5B08 |
| 0000200240 | E853 | FE4A | C483 | 5F02 | 5D5E | 00CB | 04C8 | 0000 |
| 0000200260 | 5657 | 126A | 7BE8 | 83FE | 02C4 | 06C6 | 13BA | 8B42 |
| 0000200300 | 0646 | 568B | A308 | 13B6 | 1689 | 13B8 | B0BE | 8913 |
| 0000200320 | 8904 | 0254 | 06C7 | 13B4 | 7FFF | 468D | 160E | FF50 |
| 0000200340 | 0C76 | 76FF | 1E0A | 9A56 | E6C0 | F83D | C483 | 8B0C |
| 0000200360 | FFF8 | B40E | 7813 | C40F | B01E | FF13 | B006 | 2613 |
| 0000200400 | 07C6 | EB00 | 900D | 561E | 006A | 669A | 06E2 | 83F2 |
| 0000200420 | 06C4 | 126A | 45E8 | 83FE | 02C4 | C78B | 5F5E | CBC9 |
| 0000200440 | 8B55 | 6AEC | E809 | FE0A | C483 | FF02 | 0A76 | 76FF |
| 0000200460 | FF08 | 0676 | E80E | 000F | C483 | 6A06 | E809 | FE1C |
| 0000200500 | C483 | 8B02 | 5DE5 | 55CB | EC8B | 5756 | 8B1E | 0656 |
| 0000200520 | F28B | 468B | 8B08 | 0A4E | D00B | 5374 | 59E3 | DF8C |
| 0000200540 | 92BB | 5110 | 67E8 | 5901 | 5B72 | 74FF | 51FE | 67E8 |
| 0000200560 | 5900 | 0B72 | C68B | DA8C | 6480 | FEFE | EB59 | 1E49 |
| 0000200600 | 8E53 | 51DF | E80E | F982 | 5B59 | 591F | E180 | 57FE |
| 0000200620 | F88B | C20B | 7458 | 8E2B | FCC2 | 5706 | 561E | E9D1 |
| 0000200640 | A5F3 | D88E | E80E | F930 | C483 | 5804 | EB5A | 5119 |
| 0000200660 | E80E | F956 | EB59 | 5011 | 0E56 | 1BE8 | 83F9 | 04C4 |
| 0000200700 | 03EB | 13E8 | 3300 | 99C0 | 5F1F | 5D5E | 00CB | 50EA |
| 0000200720 | 1AF8 | EAF8 | F877 | F901 | 8B55 | 83EC | 02EC | 5756 |
| 0000200740 | C7FC | FE46 | 0000 | 7441 | 8005 | FEE1 | 01EB | 4E49 |
| 0000200760 | 8B4E | ADFE | 2450 | 89FE | 8B05 | 3BD0 | 73D1 | 0368 |
| 0000201000 | 72F0 | AD5A | 01A8 | 0874 | D003 | 8942 | 4815 | EBEB |
| 0000201020 | FE3D | 75FF | F641 | 0247 | 7401 | 8D3B | 0445 | C103 |

THU MAR 14 17:42:50 1991 MEDIT.DLL PAGE 71, LINE 4131

| | | | | | | | | |
|---|---|---|---|---|---|---|---|---|
| 0000201040 | 0773 | 46C7 | 01FE | 2B00 | FFC8 | 3B05 | 087F | 0373 |
| 0000201060 | 7F89 | 5208 | E856 | FA36 | 5A5E | 1173 | 46C7 | 01FE |
| 0000201100 | 8300 | 10F9 | 1072 | E9D1 | D183 | EB00 | FFE6 | 8D0D |
| 0000201120 | 0275 | C28B | A5EB | 01B8 | 4E00 | EB4E | 5A23 | EBF9 |
| 0000201140 | 4639 | 0346 | EBF1 | 8B19 | FE46 | F78B | F374 | C00B |
| 0000201160 | 0E75 | 0D89 | 4646 | F103 | E372 | D12B | 894A | 4A14 |
| 0000201200 | 9159 | 0125 | 8300 | FE25 | 0509 | 578B | 3B08 | 73FA |
| 0000201220 | 3B07 | 76F2 | 8903 | 087F | D9F7 | 5E5F | E58B | C35D |
| 0000201240 | 8B55 | 57EC | 468B | F706 | 0866 | 0573 | C033 | EB99 |
| 0000201260 | 501A | F49A | 06F1 | 59F9 | D88B | DA0B | 0D74 | 8B50 |
| 0000201300 | 8EF8 | 33C2 | 41C0 | E9D1 | ABF3 | 5F58 | CB5D | 473B |
| 0000201320 | 7506 | C5D5 | 045F | 19EB | 531E | 1FC5 | D8EB | 1F5B |
| 0000201340 | EBF9 | C50F | 0C5F | D98C | F4E3 | C13B | F575 | C483 |
| 0000201360 | F804 | 00C3 | 8B55 | 57EC | 7EC4 | 8B06 | 33DF | B9C0 |
| 0000201400 | FFFF | AEF2 | F741 | 8AD9 | 0A46 | FB8B | AEF2 | 264F |
| 0000201420 | 0538 | 0474 | FF33 | C78E | C78B | C28C | 8B5F | 5DE5 |
| 0000201440 | 00CB | 8B55 | 8BEC | 0E4E | 571E | 0B56 | 75C9 | E903 |
| 0000201460 | 00AF | 76C5 | C40A | 067E | 561E | 5706 | F29A | E5F5 |
| 0000201500 | 8BF9 | 0E4E | D20B | 5778 | C12B | DA83 | 7300 | 4950 |
| 0000201520 | F103 | 0773 | D88C | FF05 | 8EFF | 03D8 | 73F9 | 8C07 |
| 0000201540 | 05C0 | FA87 | C08E | 8B41 | 48C1 | C72B | DB1B | C323 |
| 0000201560 | C703 | C62B | DB1B | C323 | C603 | 9140 | C12B | F3FD |
| 0000201600 | FCA4 | E391 | 835C | FFFE | 0775 | D88C | 922D | 8EFA |
| 0000201620 | 83D8 | FFFF | D175 | C08C | BD2D | 8EFA | EBC0 | 8BC8 |
| 0000201640 | 48C1 | D78B | D2F7 | C22B | DB1B | C323 | C203 | D68B |
| 0000201660 | D2F7 | C22B | DB1B | C323 | C203 | 9140 | C12B | E9D1 |
| 0000201700 | A5F3 | C913 | A4F3 | E391 | 0B18 | 75F6 | 8C07 | 05D8 |
| 0000201720 | FAC9 | D88E | FF0B | C775 | C08C | 0005 | 8EFB | EBC0 |
| 0000201740 | 8BBE | 0646 | 568B | 5E08 | 1F5F | CB5D | 8B55 | 8BEC |
| 0000201760 | 0C4E | 38E3 | C457 | 067E | D78B | DAF7 | 0C74 | D12B |
| 0000202000 | DB1B | D323 | D103 | D187 | D12B | 468B | 8A0A | D1E0 |
| 0000202020 | F3E9 | 13AB | F3C9 | 87AA | E3D1 | 8C10 | 81C3 | 0BC3 |
| 0000202040 | 8EFB | D1C3 | F3E9 | 13AB | F3C9 | 5FAA | 468B | 8B06 |
| 0000202060 | 0856 | CB5D | 4E8B | 8B0E | 0646 | 568B | 1E08 | 7EC5 |
| 0000202100 | 570A | 071E | 93FC | C00A | 1374 | F983 | 750A | 0B0E |
| 0000202120 | 79D2 | B00A | AA2D | DBF7 | D283 | F700 | 8BDA | 92F7 |
| 0000202140 | D233 | C00B | 0274 | F1F7 | F793 | 92F1 | D387 | 3004 |
| 0000202160 | 393C | 0276 | 2704 | 8BAA | 0BC2 | 75C3 | 88E2 | 4F05 |
| 0000202200 | 86AC | 8805 | FF44 | 448D | 3B01 | 72C7 | 8CF2 | 58DA |
| 0000202220 | 5F1F | 8B5E | 5DE5 | 00CB | 8B55 | 8BEC | 0646 | 3399 |
| 0000202240 | 2BC2 | C9C2 | 90CB | 8B55 | FFEC | 0876 | 76FF | 3306 |
| 0000202260 | 50C0 | 9A50 | FFFF | 0000 | C085 | 0374 | BAE9 | 8BE3 |
| 0000202300 | 5DE5 | 00CB | 8B55 | 57EC | 5356 | FF33 | 468B | 0B08 |
| 0000202320 | 7DC0 | 4711 | 568B | F706 | F7D8 | 1DDA | 0000 | 4689 |
| 0000202340 | 8908 | 0656 | 468B | 0B0C | 7DC0 | 4711 | 568B | F70A |
| 0000202360 | F7D8 | 1DDA | 0000 | 4689 | 890C | 0A56 | C00B | 1575 |
| 0000202400 | 4E8B | 8B0A | 0846 | D233 | F1F7 | D88B | 468B | F706 |
| 0000202420 | 8BF1 | EBD3 | 8B38 | 8BD8 | DA4E | 568B | 8B08 | 0646 |
| 0000202440 | EBD1 | D9D1 | EAD1 | D8D1 | DB0B | F475 | F1F7 | F08B |
| 0000202460 | 66F7 | 910C | 468B | F70A | 03E6 | 72D1 | 3B0C | 0856 |
| 0000202500 | 0777 | 0672 | 463B | 7606 | 4E01 | D233 | 4F96 | 0775 |
| 0000202520 | DAF7 | D8F7 | DA83 | 5B00 | 5F5E | CA5D | 5D08 | 0300 |
| 0000202540 | 7501 | 0253 | 7000 | 0300 | 3B02 | 050E | D900 | 0200 |
| 0000202560 | 6F00 | 01FA | 0000 | 0300 | C101 | 061B | 5400 | 0300 |
| 0000202600 | B001 | 061C | 5500 | 0200 | 0100 | 02F7 | 0000 | 0300 |
| 0000202620 | 3701 | 061D | 5B00 | 0300 | 3E01 | 061D | 5C00 | 0200 |
| 0000202640 | 9700 | 03F6 | 0000 | 0300 | FA01 | 01DC | 0500 | 0300 |
| 0000202660 | 8902 | 04DA | 6E00 | 0300 | 9201 | 01DC | 0700 | 0200 |
| 0000202700 | 5B00 | 04C6 | 0000 | 0300 | 1E01 | 01DB | 0800 | 0300 |

THU MAR 14 17:42:50 1991  MEDIT.DLL  PAGE 72, LINE 4190

```
0000202720  C301  01EF  8900  0300  B201  01F1  8A00  0200
0000202740  CB00  05F3  0000  0300  7901  01F6  8C00  0300
0000202760  9B01  01F6  8D00  0300  2602  05A2  EE00  0300
0000203000  5501  01F6  8E00  0500  3F02  04DA  1A00  0300
0000203020  4A01  01CD  1400  0300  0A02  0486  7D00  0300
0000203040  D201  06C2  6F00  0300  7202  050A  F800  0300
0000203060  1601  06C3  7000  0300  E501  06C2  7100  0300
0000203100  0301  06C3  7400  0300  5601  06B8  7500  0300
0000203120  5C01  06C3  7700  0500  0101  01F6  8700  0500
0000203140  AF02  04DA  2800  0500  4F01  01FB  8800  0300
0000203160  9201  01F4  2200  0300  4901  035F  1500  0300
0000203200  2401  031D  1600  0300  0601  01F7  2600  0300
0000203220  D102  04D9  8F00  0300  0401  05A6  0700  0300
0000203240  C301  038B  1900  0300  AB01  0254  2500  0500
0000203260  8602  04DA  3600  0300  D001  05B5  0F00  0300
0000203300  6501  03B9  1F00  0300  5101  060F  0800  0300
0000203320  BF01  060E  0900  0300  8F01  060E  0A00  0300
0000203340  0201  069D  8A00  0300  1E01  06AC  0B00  0300
0000203360  1D01  0203  2C00  0300  3B01  0706  0600  0300
0000203400  D401  0252  2E00  0300  0D01  06AB  8F00  0300
0000203420  4F01  0694  1000  0300  D901  0622  1100  0300
0000203440  6601  05D6  1A00  0300  5D01  01F0  3A00  0300
0000203460  6F01  0608  1300  0300  5F01  0595  1B00  0300
0000203500  7D01  01ED  3B00  0300  E401  01FB  3C00  0300
0000203520  7D01  060B  9500  0200  8302  04DA  3600  0300
0000203540  0101  0201  3700  0300  D801  0693  9700  0300
0000203560  7701  0595  2000  0300  A901  0609  1A00  0300
0000203600  7201  060C  9A00  0300  4101  01EE  4400  0300
0000203620  5401  01ED  4600  0500  B200  0108  B300  0314
0000203640  7501  01EE  4300  0300  9501  0608  2500  0300
0000203660  9D01  01ED  4D00  0300  AC01  05A5  2F00  0300
0000203700  BA01  05A6  3000  0300  1B01  0606  2900  0300
0000203720  0D02  050A  B300  0300  4901  060A  2D00  0300
0000203740  E101  0809  1E00  0300  7F01  060A  2E00  0500
0000203760  9200  0108  3F00  030D  1A02  04DA  4000  0300
0000204000  6F01  01DB  5B00  0300  8402  0507  C000  0300
0000204020  A901  06B5  3C00  0300  D501  06C3  3D00  0300
0000204040  9D02  04D1  4F00  0300  1502  050A  CC00  0300
0000204060  3B01  06B1  4500  0300  1D01  06B3  4B00  0300
0000204100  DE02  04DA  5F00  0000  0000  0000  0000  0000
0000204120  0000  0000  0200  0000  0000  0000  0000  0000
0000204140  0000  0000  0000  0000  0000  0000  0000  0000
*
0000204220  0000  0000  0200  0000  0000  0000  0000  0000
0000204240  0000  0000  0000  0000  0000  0000  0000  0000
*
0000204320  0000  0000  0200  0000  0000  0000  0000  0000
0000204340  0000  0000  0000  0000  0000  0000  0000  0000
*
0000204420  0000  0000  0200  0000  0000  0000  0000  0000
0000204440  0000  0000  0000  0000  534D  5220  6E75  542D
0000204460  6D69  2065  694C  7262  7261  2079  202D  6F43
0000204500  7970  6972  6867  2074  6328  2029  3931  3039
0000204520  202C  694D  7263  736F  666F  2074  6F43  7072
0000204540  0018  3154  3332  455F  545F  5845  0054  3154
0000204560  3332  455F  545F  5845  5F54  4142  4B43  5247
0000204600  554F  444E  5400  3231  5F33  5F45  4C42  434F
0000204620  004B  3154  3332  455F  425F  4F4C  4B43  425F
0000204640  4341  474B  4F52  4E55  0044  3154  3332  455F
```

THU MAR 14 17:42:50 1991 MEDIT.DLL PAGE 73, LINE 4249

```
0000204660  455F  004D  3154  3332  455F  455F  5F4D  4142
0000204700  4B43  5247  554F  444E  5400  3231  5F33  5F45
0000204720  4D43  6200  616C  6B63  6200  756C  0065  7267
0000204740  6565  006E  7963  6E61  7200  6465  6D00  6761
0000204760  6E65  6174  6200  6F72  6E77  6C00  6769  7468
0000205000  672D  6172  0079  6164  6B72  672D  6172  0079
0000205020  696C  6867  2D74  6C62  6575  6C00  6769  7468
0000205040  672D  6572  6E65  6C00  6769  7468  632D  6179
0000205060  006E  696C  6867  2D74  6572  0064  696C  6867
0000205100  2D74  616D  6567  746E  0061  696C  6867  2D74
0000205120  6579  6C6C  776F  7700  6968  6574  0000  0000
0000205140  792A  1F48  0070  0001  1F20  0001  6854  7369
0000205160  6220  6675  6566  2072  7369  6120  7020  7261
0000205200  2074  666F  6120  206E  6361  6974  6576  630A
0000205220  6C61  206C  6863  6961  2E6E  740A  206F  7262
0000205240  6165  206B  6874  2065  6863  6961  206E  6E61
0000205260  2064  6863  6E61  6567  650A  6578  7563  6974
0000205300  6E6F  7420  206F  7469  202C  6863  6F6F  6573
0000205320  2720  6241  726F  2774  660A  6F72  206D  6874
0000205340  2065  6552  6C70  7961  6D20  6E65  0075  0000
0000205360  0000  7562  2E66  0063  656D  6964  2E74  0070
0000205400  01D2  01E6  01D8  1124  FFFF  0004  0000  0000
0000205420  0000  0000  0000  0000  0000  0000  0000  0000
*
0000205620  6E69  0074  6E69  0074  616D  6E69  0000  5F65
0000205640  7562  695F  696E  0074  6E69  0074  6E69  0074
0000205660  5F65  7562  645F  7369  6C70  7961  4200  4F4F
0000205700  004C  4F42  4C4F  0000  5F65  7562  675F  7465
0000205720  645F  7369  5F70  7473  7461  7375  6900  746E
0000205740  6900  746E  0000  5F65  7562  755F  616E  6C6C
0000205760  636F  625F  6675  5500  4853  524F  0054  5355
0000206000  4F48  5452  0000  5F65  7562  675F  7465  6E5F
0000206020  7865  5F74  7562  0066  6E69  0074  6E69  0074
0000206040  7263  6165  6574  625F  6675  6900  746E  6900
0000206060  746E  0000  5F65  7562  725F  6165  5F64  6966
0000206100  656C  6900  746E  6900  746E  0000  656E  5F77
0000206120  5F65  7562  725F  6165  5F64  6966  656C  6900
0000206140  746E  6900  746E  2500  0064  5F65  7562  735F
0000206160  7465  635F  7275  625F  6675  6900  746E  6900
0000206200  746E  0000  5F65  7562  675F  7465  665F  6C69
0000206220  5F65  6164  6174  5500  4853  524F  0054  5355
0000206240  4F48  5452  0000  5F65  7562  635F  756F  746E
0000206260  6C5F  6E69  7365  6900  746E  6900  746E  0000
0000206300  5F65  7562  735F  7465  625F  6675  6E5F  6D61
0000206320  0065  6E69  0074  6E69  0074  5F65  7562  675F
0000206340  7465  625F  6675  6E5F  006F  6E69  0074  6E69
0000206360  0074  5F65  7562  675F  7465  6F5F  6570  5F6E
0000206400  6574  7473  6E5F  6D61  7365  6900  746E  6900
0000206420  746E  0000  5F65  7562  675F  7465  6F5F  6570
0000206440  5F6E  6574  7473  6E5F  6D61  7365  6900  746E
0000206460  6900  746E  0000  7325  000A  000A  5F65  7562
0000206500  775F  6972  6574  665F  6C69  0065  6E69  0074
0000206520  6E69  0074  0072  5F65  7562  6F5F  6570  726E
0000206540  665F  6C69  0065  6E69  0074  6E69  0074  0077
0000206560  5F65  7562  6F5F  6570  776E  665F  6C69  0065
0000206600  6E69  0074  6E69  0074  5F65  7562  635F  6F6C
0000206620  6573  665F  6C69  0065  6E69  0074  6E69  0074
0000206640  7562  695F  696E  5F74  6465  7469  625F  6675
0000206660  5300  4F54  2050  202D  6F59  2075  6168  6576
```

THU MAR 14 17:42:50 1991 MEDIT.DLL PAGE 74, LINE 4308

| | | | | | | | | |
|---|---|---|---|---|---|---|---|---|
| 0000206700 | 7220 | 6165 | 6863 | 6465 | 7420 | 6568 | 6D20 | 7861 |
| 0000206720 | 6D69 | 6D75 | 6C20 | 6E69 | 2065 | 656C | 676E | 6874 |
| 0000206740 | 0A20 | 200A | 6C50 | 6165 | 6573 | 2720 | 7563 | 2074 |
| 0000206760 | 6162 | 6B63 | 2027 | 202D | 4B4F | 7420 | 206F | 6F63 |
| 0000207000 | 746E | 6E69 | 6575 | 6900 | 746E | 6900 | 746E | 0000 |
| 0000207020 | 5F65 | 7562 | 695F | 736E | 7265 | 5F74 | 6863 | 7261 |
| 0000207040 | 615F | 5F74 | 6F70 | 6E69 | 0074 | 6E69 | 0074 | 6E69 |
| 0000207060 | 0074 | 5F65 | 7562 | 695F | 736E | 735F | 7274 | 615F |
| 0000207100 | 5F74 | 6F70 | 6E69 | 0074 | 6E69 | 0074 | 6E69 | 0074 |
| 0000207120 | 5453 | 504F | 2D20 | 5920 | 756F | 6820 | 7661 | 2065 |
| 0000207140 | 6572 | 6361 | 6568 | 2064 | 6874 | 2065 | 616D | 6978 |
| 0000207160 | 756D | 206D | 696C | 656E | 6C20 | 6E65 | 7467 | 2068 |
| 0000207200 | 0A0A | 5020 | 656C | 7361 | 2065 | 6327 | 7475 | 6220 |
| 0000207220 | 6361 | 276B | 2D20 | 4F20 | 204B | 6F74 | 6320 | 6E6F |
| 0000207240 | 6974 | 756E | 0065 | 7562 | 755F | 6470 | 7461 | 5F65 |
| 0000207260 | 6863 | 7261 | 6900 | 746E | 6900 | 746E | 2000 | 7473 |
| 0000207300 | 3D72 | 2520 | 2073 | 696C | 656E | 3D20 | 2520 | 2064 |
| 0000207320 | 666F | 7366 | 2074 | 203D | 6425 | 6200 | 615F | 6772 |
| 0000207340 | 0073 | 7473 | 0072 | 666F | 7366 | 0074 | 7562 | 735F |
| 0000207360 | 6C70 | 7469 | 6C5F | 6E69 | 0065 | 6E69 | 0074 | 6E69 |
| 0000207400 | 0074 | 7562 | 755F | 696E | 6E6F | 6C5F | 6E69 | 0065 |
| 0000207420 | 6E69 | 0074 | 6E69 | 0074 | 6F70 | 0073 | 6425 | 0000 |
| 0000207440 | 5F65 | 7562 | 615F | 6464 | 6C5F | 6E69 | 0065 | 6E69 |
| 0000207460 | 0074 | 6E69 | 0074 | 6425 | 0000 | 7562 | 645F | 6C65 |
| 0000207500 | 7465 | 5F65 | 696C | 656E | 6900 | 746E | 6900 | 746E |
| 0000207520 | 0000 | 7369 | 625F | 6675 | 635F | 6168 | 676E | 6465 |
| 0000207540 | 6900 | 746E | 6900 | 746E | 0000 | 7562 | 5F66 | 7075 |
| 0000207560 | 6164 | 6574 | 0064 | 6E69 | 0074 | 6E69 | 0074 | 6F72 |
| 0000207600 | 0077 | 6F63 | 006C | 632A | 0068 | 7562 | 675F | 7465 |
| 0000207620 | 6863 | 6900 | 746E | 6900 | 746E | 7200 | 776F | 6300 |
| 0000207640 | 6C6F | 7300 | 7274 | 0000 | 7562 | 705F | 7475 | 7473 |
| 0000207660 | 0072 | 6E69 | 0074 | 6E69 | 0074 | 7562 | 695F | 736E |
| 0000207700 | 735F | 7274 | 6900 | 746E | 6900 | 746E | 0000 | 7562 |
| 0000207720 | 755F | 676E | 7465 | 6863 | 6900 | 746E | 6900 | 746E |
| 0000207740 | 6C00 | 6E69 | 0065 | 666F | 7366 | 7465 | 6C00 | 6E65 |
| 0000207760 | 7467 | 0068 | 7562 | 645F | 6C65 | 735F | 7274 | 6900 |
| 0000210000 | 746E | 6900 | 746E | 6C00 | 6E69 | 0065 | 666F | 7366 |
| 0000210020 | 7465 | 0000 | 7562 | 645F | 6C65 | 635F | 6168 | 0072 |
| 0000210040 | 6E69 | 0074 | 6E69 | 0074 | 696C | 656E | 0000 | 7562 |
| 0000210060 | 6C5F | 6E69 | 5F65 | 656C | 676E | 6874 | 7300 | 6F68 |
| 0000210100 | 7472 | 7300 | 6F68 | 7472 | 0000 | 5F65 | 7562 | 645F |
| 0000210120 | 6665 | 745F | 6261 | 5500 | 4853 | 524F | 0054 | 5355 |
| 0000210140 | 4F48 | 5452 | 0000 | 5F65 | 7562 | 675F | 7465 | 745F |
| 0000210160 | 6261 | 4500 | 6964 | 6974 | 676E | 6420 | 7369 | 6261 |
| 0000210200 | 656C | 2064 | 6E69 | 7420 | 6968 | 2073 | 7562 | 6666 |
| 0000210220 | 7265 | 2D20 | 0A20 | 6E41 | 6120 | 7463 | 7669 | 2065 |
| 0000210240 | 6163 | 6C6C | 6320 | 6168 | 6E69 | 6520 | 6978 | 7473 |
| 0000210260 | 2073 | 726F | 6120 | 630A | 6D6F | 6F70 | 6E75 | 2064 |
| 0000210300 | 7473 | 7461 | 6D65 | 6E65 | 2074 | 7369 | 6220 | 6965 |
| 0000210320 | 676E | 6520 | 6578 | 7563 | 6574 | 0064 | 6E69 | 0074 |
| 0000210340 | 6E69 | 0074 | 6F4C | 6B63 | 6E69 | 2067 | 7562 | 6666 |
| 0000210360 | 7265 | 2520 | 0064 | 5F62 | 7261 | 7367 | 0000 | 5F65 |
| 0000210400 | 7562 | 6C5F | 636F | 5F6B | 7562 | 0066 | 6E69 | 0074 |
| 0000210420 | 6E69 | 0074 | 6E55 | 6F6C | 6B63 | 6E69 | 2067 | 7562 |
| 0000210440 | 6666 | 7265 | 2520 | 0064 | 5F62 | 7261 | 7367 | 0000 |
| 0000210460 | 5F65 | 7562 | 755F | 6C6E | 636F | 5F6B | 7562 | 0066 |
| 0000210500 | 6E69 | 0074 | 6E69 | 0074 | 5F65 | 7562 | 675F | 7465 |
| 0000210520 | 6C5F | 636F | 5F6B | 7473 | 7461 | 6900 | 746E | 6900 |
| 0000210540 | 746E | 0000 | 5F65 | 6572 | 7473 | 7261 | 0074 | 6552 |

```
THU MAR 14 17:42:50 1991  MEDIT.DLL  PAGE 75  LINE 4367

0000210560  6F63  6472  5600  7265  6669  0079  6554  7473
0000210600  4D20  6E61  6761  7265  2020  5B20  7325  202C
0000210620  6425  205D  2020  255B  5D73  0000  0001  0001
0000210640  0000  0000  0020  0020  0020  7774  635F  696C
0000210660  2E70  0063  656D  6964  2E74  0070  088A  08A2
0000210700  0894  1172  0000  0000  6E69  0074  6E69  0074
0000210720  6425  0000  5F65  6C63  7069  635F  7475  2500
0000210740  0064  6D63  632E  6D00  6465  7469  702E  0A00
0000210760  0000  08C2  08D8  08C7  118E  FFFF  FFFF  0001
0000211000  0000  0000  0000  0000  0001  0000  0000  6E69
0000211020  0074  6E69  0074  6567  6C74  6E69  2065  6261
0000211040  726F  6974  676E  2E20  2E2E  6200  645F  6265
0000211060  6775  4500  646E  6F20  2066  6574  7473  6320
0000211100  7361  2065  6572  6361  6568  2064  6200  645F
0000211120  6265  6775  0A00  0000  5F65  656E  5F77  6D63
0000211140  675F  7465  6C5F  6E69  0065  6E69  0074  6E69
0000211160  0074  6D63  615F  7664  6E61  6563  6900  746E
0000211200  6900  746E  0000  6D63  665F  6E69  5F64  656E
0000211220  7478  735F  6D74  0074  4F42  4C4F  4200  4F4F
0000211240  004C  5F65  7369  655F  6578  5F63  696C  656E
0000211260  6900  746E  6900  746E  6300  206D  696C  656E
0000211300  3D20  2520  0064  5F62  6564  7562  0067  5F65
0000211320  6D63  615F  6F62  7472  6900  746E  6900  746E
0000211340  4E00  7365  6974  676E  6C20  7665  6C65  7320
0000211360  7465  7420  206F  6425  6200  645F  6265  6775
0000211400  0000  5F65  6F6E  6974  7966  6E5F  7365  5F74
0000211420  656C  6576  006C  0000  0000  0000  0006  0000
0000211440  13C0  13BF  0000  0005  0000  0000  0000  0000
0000211460  0000  0000  0000  0000  435F  465F  4C49  5F45
0000211500  4E49  4F46  003D  0001  FFFF  0000  0000  0000
0000211520  0000  0000  0000  0000  0000  0000  0001  8101
0000211540  8181  0000  0000  0000  0000  0000  0000  0000
0000211560  0000  0000  0000  0000  0000  0000  0000  0000
*
0000212120  0000  0000  0000  0000  0000  0000  0000  0A00
0000212140  0A0A  0A0A  0A0A  0A0A  0A0A  0A0A  0A0A  0A0A
*
0000212520  0A0A  0A0A  0A0A  0A0A  0A0A  0A0A  0A0A  000A
0000212540  0000  0000  0000  0000  0000  0000  0000  0000
0000212560  FF00  00FF  0000  0000  FFFF  FFFF  005C  005C
0000212600  0000  067E  0C6A  0000  067E  118C  0001  0000
0000212620  0000  0000  0000  0000  0102  0000  0000  0000
0000212640  0000  0000  0202  0000  0000  0000  0000  0000
0000212660  0000  0000  0000  0000  0000  0000  0000  0000
*
0000213540  0000  0001  0200  0000  0000  0000  0000  0000
0000213560  0000  0000  0000  0000  0000  0000  0000  0000
*
0000214500  0000  0E36  08D4  0000  0000  0000  0000  0006
0000214520  0600  0100  0000  0010  0603  0600  1002  4504
0000214540  4545  0505  0505  3505  0030  0050  0000  2000
0000214560  3020  5850  0807  3000  3030  5057  0007  2000
0000214600  0020  0000  0000  6008  6060  6060  0060  7000
0000214620  7870  7878  0878  0807  0000  0007  0808  0008
0000214640  0800  0800  0000  2808  756E  6C6C  0629  0000
0000214660  0000  0000  0000  0000  0000  0000  0000  0003
0000214700  2000  DDB6  10D4  DDB6  10A4  DDB6  10A8  DDB6
0000214720  10AC  DDB6  10B0  DDB6  10B4  0000  0000  0101
0000214740  0000  0003  0000  0000  0000  0000  0000  0000
```

THU MAR 14 17:42:50 1991 MEDIT.DLL PAGE 76, LINE 4426

| | | | | | | | | |
|---|---|---|---|---|---|---|---|---|
| 0000214760 | 0000 | E634 | FFFF | FFFF | 10D6 | 10D8 | 10DA | 10DC |
| 0000215000 | FFFF | 10E0 | 10E2 | 10E4 | 10E6 | 10DE | 10EA | 10EC |
| 0000215020 | 10EE | 10F0 | 10F2 | 10F4 | 10F6 | 10F8 | 10FA | 10FC |
| 0000215040 | 10FE | 1100 | 1102 | 1104 | 10E8 | 1106 | 110A | 1108 |
| 0000215060 | 110C | 1110 | FFFF | FFFF | 1112 | 110E | 1118 | 111C |
| 0000215100 | 111E | 1120 | 111A | 1122 | 1126 | 1128 | 112A | 112C |
| 0000215120 | 112E | 1130 | 1132 | 1134 | 1136 | 1138 | 01E2 | 113C |
| 0000215140 | 113E | 113A | 1142 | 1144 | 1146 | 1148 | 114A | 1140 |
| 0000215160 | 114E | 1150 | 114C | 1154 | 1156 | 1158 | 1152 | 115A |
| 0000215200 | 115E | 1160 | 1162 | 1114 | 1116 | 1164 | 116A | 116C |
| 0000215220 | 116E | 115C | 1170 | 1174 | 1176 | 1178 | 089E | 117A |
| 0000215240 | 117E | 1180 | 1166 | 1168 | 1182 | 1188 | 118A | 117C |
| 0000215260 | 3C3C | 4D4E | 4753 | 3E3E | 0000 | 3652 | 3030 | 0D30 |
| 0000215300 | 2D0A | 7320 | 6174 | 6B63 | 6F20 | 6576 | 6672 | 6F6C |
| 0000215320 | 0D77 | 000A | 0003 | 3652 | 3030 | 0D33 | 2D0A | 6920 |
| 0000215340 | 746E | 6765 | 7265 | 6420 | 7669 | 6469 | 2065 | 7962 |
| 0000215360 | 3020 | 0A0D | 0800 | 5200 | 3036 | 3830 | 0A0D | 202D |
| 0000215400 | 6F6E | 2074 | 6E65 | 756F | 6867 | 7320 | 6170 | 6563 |
| 0000215420 | 6620 | 726F | 6120 | 6772 | 6D75 | 6E65 | 7374 | 0A0D |
| 0000215440 | 0900 | 5200 | 3036 | 3930 | 0A0D | 202D | 6F6E | 2074 |
| 0000215460 | 6E65 | 756F | 6867 | 7320 | 6170 | 6563 | 6620 | 726F |
| 0000215500 | 6520 | 766E | 7269 | 6E6F | 656D | 746E | 0A0D | FC00 |
| 0000215520 | 0D00 | 000A | 00FF | 7572 | 2D6E | 6974 | 656D | 6520 |
| 0000215540 | 7272 | 726F | 0020 | 0002 | 3652 | 3030 | 0D32 | 2D0A |
| 0000215560 | 6620 | 6F6C | 7461 | 6E69 | 2D67 | 6F70 | 6E69 | 2074 |
| 0000215600 | 7573 | 7070 | 726F | 2074 | 6F6E | 2074 | 6F6C | 6461 |
| 0000215620 | 6465 | 0A0D | 1100 | 5200 | 3036 | 3731 | 0A0D | 202D |
| 0000215640 | 6E75 | 7865 | 6570 | 7463 | 6465 | 6D20 | 6C75 | 6974 |
| 0000215660 | 6874 | 6572 | 6461 | 6C20 | 636F | 206B | 7265 | 6F72 |
| 0000215700 | 0D72 | 000A | 0010 | 3652 | 3130 | 0D36 | 2D0A | 6E20 |
| 0000215720 | 746F | 6520 | 6F6E | 6775 | 2068 | 7073 | 6361 | 2065 |
| 0000215740 | 6F66 | 2072 | 6874 | 6572 | 6461 | 6420 | 7461 | 0D61 |
| 0000215760 | 000A | FFFF | 05FF | 0200 | B800 | 0110 | 0000 | 0200 |
| 0000216000 | 6400 | 040C | 0000 | 0200 | 2400 | 0510 | 0000 | 0200 |
| 0000216020 | 8402 | 0411 | 1A00 | 0200 | 8602 | 0411 | 2800 | 4E00 |
| 0000216040 | 3042 | 1E32 | 0113 | 0100 | 0000 | F200 | 0005 | 0000 |
| 0000216060 | 0100 | 0F00 | 2E2E | 6F5C | 6A62 | 655C | 6964 | 2E74 |
| 0000216100 | 626F | 016A | F200 | 1205 | 001A | 0000 | 0100 | 0F00 |
| 0000216120 | 2E2E | 6F5C | 6A62 | 615C | 6976 | 2E6F | 626F | 016A |
| 0000216140 | 0400 | 6320 | 0074 | 0000 | 0100 | 0E00 | 2E2E | 6F5C |
| 0000216160 | 6A62 | 625C | 6675 | 6F2E | 6A62 | 0001 | 9468 | 1CE3 |
| 0000216200 | 0000 | 0000 | 0001 | 2E11 | 5C2E | 626F | 5C6A | 6373 |
| 0000216220 | 6572 | 6E65 | 6F2E | 6A62 | 0001 | B14C | 12DC | 0000 |
| 0000216240 | 0000 | 0001 | 2E12 | 5C2E | 626F | 5C6A | 7774 | 635F |
| 0000216260 | 696C | 2E70 | 626F | 016A | 2800 | D9C4 | 0016 | 0000 |
| 0000216300 | 0100 | 0D00 | 2E2E | 6F5C | 6A62 | 635C | 2E6D | 626F |
| 0000216320 | 016A | 1200 | D1DB | 0000 | 0100 | 0100 | 0B00 | 6C64 |
| 0000216340 | 5C6C | 7363 | 2E75 | 7361 | 016D | E400 | AFDB | 0001 |
| 0000216360 | 0100 | 0100 | 0E00 | 6C64 | 5C6C | 7363 | 6475 | 7461 |
| 0000216400 | 612E | 6D73 | 0001 | DD94 | 0022 | 0000 | 0001 | 0001 |
| 0000216420 | 6F0F | 3273 | 635C | 7472 | 6D30 | 6773 | 612E | 6D73 |
| 0000216440 | 0001 | DDB6 | 0006 | 0000 | 0001 | 0001 | 630A | 7472 |
| 0000216460 | 6630 | 2E70 | 7361 | 016D | BC00 | 1ADD | 0000 | 0100 |
| 0000216500 | 0100 | 0A00 | 6863 | 736B | 6B74 | 612E | 6D73 | 0001 |
| 0000216520 | DDD6 | 0108 | 0000 | 0001 | 0001 | 640D | 6C6C | 735C |
| 0000216540 | 7465 | 6E65 | 7076 | 632E | 0001 | DEDE | 0065 | 0000 |
| 0000216560 | 0001 | 0001 | 6F0F | 3273 | 6E5C | 736D | 6867 | 7264 |
| 0000216600 | 612E | 6D73 | 0001 | DF44 | 00C0 | 0000 | 0001 | 0001 |
| 0000216620 | 6F0E | 3273 | 645C | 736F | 6572 | 2E74 | 7361 | 016D |

THU MAR 14 17:42:50 1991 MEDIT.DLL PAGE 77, LINE 4485

| | | | | | | | | |
|---|---|---|---|---|---|---|---|---|
| 0000216640 | 0400 | 02E0 | 0001 | 0100 | 0100 | 0800 | 6366 | 6F6C |
| 0000216660 | 6573 | 632E | 0001 | E106 | 006A | 0000 | 0001 | 0001 |
| 0000216700 | 6607 | 706F | 6E65 | 632E | 0001 | E170 | 005A | 0000 |
| 0000216720 | 0001 | 0001 | 6609 | 7270 | 6E69 | 6674 | 632E | 0000 |
| 0000216740 | 0000 | 0000 | 0000 | 0001 | 0000 | 5F0B | 6663 | 756C |
| 0000216760 | 6873 | 612E | 6D73 | 0000 | 0000 | 0000 | 0000 | 0001 |
| 0000217000 | 0000 | 5F07 | 6966 | 656C | 632E | 0001 | E1CA | 009C |
| 0000217020 | 0000 | 0001 | 0001 | 5F0B | 6966 | 626C | 6675 | 612E |
| 0000217040 | 6D73 | 0001 | E266 | 00E5 | 0000 | 0001 | 0001 | 5F0B |
| 0000217060 | 6C66 | 6273 | 6675 | 612E | 6D73 | 0001 | E34C | 0037 |
| 0000217100 | 0000 | 0001 | 0001 | 5F0C | 7266 | 6565 | 7562 | 2E66 |
| 0000217120 | 7361 | 016D | 8400 | 4BE3 | 0000 | 0100 | 0100 | 0B00 |
| 0000217140 | 675F | 7465 | 7562 | 2E66 | 7361 | 016D | D000 | F2E3 |
| 0000217160 | 0000 | 0100 | 0100 | 0700 | 6F5F | 6570 | 2E6E | 0163 |
| 0000217200 | C200 | C0E4 | 0000 | 0100 | 0100 | 0B00 | 735F | 7466 |
| 0000217220 | 7562 | 2E66 | 7361 | 016D | 8200 | 2EE5 | 0001 | 0100 |
| 0000217240 | 0100 | 0800 | 6666 | 756C | 6873 | 632E | 0001 | E6B0 |
| 0000217260 | 04FA | 0000 | 0001 | 0001 | 6F0A | 7475 | 7570 | 2E74 |
| 0000217300 | 7361 | 016D | AA00 | 78EB | 0000 | 0100 | 0100 | 0800 |
| 0000217320 | 7473 | 6572 | 6D61 | 632E | 0001 | EC22 | 003F | 0000 |
| 0000217340 | 0001 | 0001 | 6F0D | 3273 | 635C | 6F6C | 6573 | 612E |
| 0000217360 | 6D73 | 0001 | EC62 | 0077 | 0000 | 0001 | 0001 | 6F0D |
| 0000217400 | 3273 | 6C5C | 6573 | 6B65 | 612E | 6D73 | 0001 | ECDA |
| 0000217420 | 01DD | 0000 | 0001 | 0001 | 6F0C | 3273 | 6F5C | 6570 |
| 0000217440 | 2E6E | 7361 | 016D | B800 | 5DEE | 0001 | 0100 | 0100 |
| 0000217460 | 0C00 | 736F | 5C32 | 6572 | 6461 | 612E | 6D73 | 0001 |
| 0000217500 | F016 | 01DD | 0000 | 0001 | 0001 | 7709 | 6972 | 6574 |
| 0000217520 | 612E | 6D73 | 0000 | 0000 | 0000 | 0000 | 0001 | 0000 |
| 0000217540 | 740B | 7478 | 6F6D | 6564 | 612E | 6D73 | 0001 | F1F4 |
| 0000217560 | 000A | 0000 | 0001 | 0001 | 6D0A | 6C61 | 6F6C | 2E63 |
| 0000217600 | 7361 | 016D | FE00 | 0AF1 | 0000 | 0100 | 0100 | 0800 |
| 0000217620 | 7266 | 6565 | 612E | 6D73 | 0001 | F208 | 00AF | 0000 |
| 0000217640 | 0001 | 0001 | 660B | 616D | 6C6C | 636F | 612E | 6D73 |
| 0000217660 | 0000 | 0000 | 0000 | 0000 | 0001 | 0000 | 6609 | 6164 |
| 0000217700 | 6174 | 612E | 6D73 | 0001 | F2B8 | 0034 | 0000 | 0001 |
| 0000217720 | 0001 | 690B | 696E | 7374 | 6765 | 612E | 6D73 | 0001 |
| 0000217740 | F2EC | 0036 | 0000 | 0001 | 0001 | 6C0B | 6E69 | 736B |
| 0000217760 | 6765 | 612E | 6D73 | 0001 | F322 | 007C | 0000 | 0001 |
| 0000220000 | 0001 | 730C | 6165 | 6372 | 7368 | 2E67 | 7361 | 016D |
| 0000220020 | 9E00 | E2F3 | 0000 | 0100 | 0100 | 0B00 | 7267 | 776F |
| 0000220040 | 6573 | 2E67 | 7361 | 016D | 8000 | 31F4 | 0000 | 0100 |
| 0000220060 | 0100 | 0A00 | 656E | 7377 | 6765 | 612E | 6D73 | 0001 |
| 0000220100 | F4B2 | 0046 | 0000 | 0001 | 0001 | 730A | 7274 | 6163 |
| 0000220120 | 2E74 | 7361 | 016D | F800 | 36F4 | 0000 | 0100 | 0100 |
| 0000220140 | 0A00 | 7473 | 6372 | 7970 | 612E | 6D73 | 0001 | F52E |
| 0000220160 | 0029 | 0000 | 0001 | 0001 | 730A | 7274 | 6D63 | 2E70 |
| 0000220200 | 7361 | 016D | 5800 | 17F5 | 0000 | 0100 | 0100 | 0A00 |
| 0000220220 | 7473 | 6C72 | 6E65 | 612E | 6D73 | 0001 | F570 | 002A |
| 0000220240 | 0000 | 0001 | 0001 | 730B | 7274 | 636E | 7970 | 612E |
| 0000220260 | 6D73 | 0001 | F59A | 003B | 0000 | 0001 | 0001 | 730B |
| 0000220300 | 7274 | 636E | 706D | 612E | 6D73 | 0001 | F5D6 | 001C |
| 0000220320 | 0000 | 0001 | 0001 | 6908 | 6F74 | 2E61 | 7361 | 006D |
| 0000220340 | 0000 | 0000 | 0000 | 0100 | 0000 | 0C00 | 6D63 | 7369 |
| 0000220360 | 6463 | 7461 | 612E | 6D73 | 0001 | F5F2 | 0020 | 0000 |
| 0000220400 | 0001 | 0001 | 6F0D | 3273 | 685C | 6964 | 6666 | 612E |
| 0000220420 | 6D73 | 0001 | F612 | 00BA | 0000 | 0001 | 0001 | 6F0D |
| 0000220440 | 3273 | 6D5C | 6F6C | 6B63 | 612E | 6D73 | 0001 | F6CC |
| 0000220460 | 007A | 0000 | 0001 | 0001 | 6410 | 6C6C | 745C | 6469 |
| 0000220500 | 6174 | 6C62 | 2E65 | 7361 | 016D | 4600 | 95F7 | 0000 |

THU MAR 14 17:42:50 1991 MEDIT.DLL PAGE 78, LINE 4544

| | | | | | | | | |
|---|---|---|---|---|---|---|---|---|
| 0000220520 | 0100 | 0100 | 0900 | 6766 | 7465 | 2E73 | 7361 | 016D |
| 0000220540 | DC00 | 74F7 | 0000 | 0100 | 0100 | 0900 | 7073 | 6972 |
| 0000220560 | 746E | 2E66 | 0163 | 5000 | ADF8 | 0000 | 0100 | 0100 |
| 0000220600 | 0C00 | 7266 | 6165 | 6C6C | 636F | 612E | 6D73 | 0001 |
| 0000220620 | F8FE | 000A | 0000 | 0001 | 0001 | 720B | 6165 | 6C6C |
| 0000220640 | 636F | 612E | 6D73 | 0001 | F908 | 00C8 | 0000 | 0001 |
| 0000220660 | 0001 | 720A | 7365 | 7A69 | 2E65 | 7361 | 016D | D000 |
| 0000220700 | 2EF9 | 0000 | 0100 | 0100 | 0A00 | 6163 | 6C6C | 636F |
| 0000220720 | 612E | 6D73 | 0001 | F9FE | 0025 | 0000 | 0001 | 0001 |
| 0000220740 | 660B | 6E69 | 7364 | 6765 | 612E | 6D73 | 0001 | FA24 |
| 0000220760 | 002D | 0000 | 0001 | 0001 | 730A | 7274 | 6863 | 2E72 |
| 0000221000 | 7361 | 016D | 5200 | CAFA | 0000 | 0100 | 0100 | 0B00 |
| 0000221020 | 6D68 | 6D65 | 7063 | 2E79 | 7361 | 016D | 1C00 | 48FB |
| 0000221040 | 0000 | 0100 | 0100 | 0B00 | 6D68 | 6D65 | 6573 | 2E74 |
| 0000221060 | 7361 | 016D | 6400 | 63FB | 0000 | 0100 | 0100 | 0800 |
| 0000221100 | 7478 | 616F | 612E | 6D73 | 0001 | FBC8 | 000E | 0000 |
| 0000221120 | 0001 | 0001 | 6105 | 7362 | 632E | 0001 | FBD6 | 001D |
| 0000221140 | 0000 | 0001 | 0001 | 6F0E | 3273 | 755C | 6C6E | 6E69 |
| 0000221160 | 2E6B | 7361 | 016D | F400 | 9AFB | 0000 | 0100 | 0100 |
| 0000221200 | 0800 | 646C | 7669 | 612E | 6D73 | 000A | 0004 | 00C0 |
| 0000221220 | 5F0E | 5F65 | 7768 | 646E | 635F | 696C | 6E65 | 1074 |
| 0000221240 | 0400 | C000 | 0D00 | 655F | 685F | 6E77 | 5F64 | 7266 |
| 0000221260 | 6D61 | 0065 | 0400 | C000 | 0400 | 685F | 6261 | 0678 |
| 0000221300 | 0004 | 0085 | 5F1A | 5F65 | 6E69 | 7469 | 6169 | 696C |
| 0000221320 | 617A | 6974 | 6E6F | 635F | 6D6F | 6C70 | 7465 | 8065 |
| 0000221340 | 0408 | 5200 | 0906 | 735F | 5F7A | 6974 | 6C74 | 0065 |
| 0000221360 | 0100 | 5E00 | 0606 | 5F45 | 4E49 | 5449 | 0096 | 0001 |
| 0000221400 | 065F | 4507 | 435F | 4F4C | 4553 | 0384 | 0001 | 0668 |
| 0000221420 | 5F10 | 5F65 | 6F63 | 6F6C | 5F72 | 6F74 | 615F | 7474 |
| 0000221440 | D472 | 0408 | 8500 | 0500 | 685F | 7076 | D673 | 0408 |
| 0000221460 | C000 | 0F00 | 655F | 685F | 6E77 | 5F64 | 6F68 | 7A72 |
| 0000221500 | 735F | D062 | 0408 | C000 | 0F00 | 655F | 685F | 6E77 |
| 0000221520 | 5F64 | 6576 | 7472 | 735F | 0E62 | 0400 | 8500 | 0C00 |
| 0000221540 | 635F | 5F78 | 6977 | 5F6E | 6973 | 657A | 0014 | 0004 |
| 0000221560 | 0085 | 5F0C | 7963 | 775F | 6E69 | 735F | 7A69 | DC65 |
| 0000221600 | 0408 | 8500 | 0B00 | 635F | 5F79 | 7370 | 735F | 7A69 |
| 0000221620 | DA65 | 0408 | 8500 | 0B0D | 635F | 5F78 | 7370 | 735F |
| 0000221640 | 7A69 | 0665 | 0400 | 8100 | 0B00 | 635F | 6168 | 5F72 |
| 0000221660 | 6977 | 7464 | DE68 | 0408 | 8100 | 0C00 | 635F | 6168 |
| 0000221700 | 5F72 | 6568 | 6769 | 7468 | 096D | 0001 | 06B1 | 5F0C |
| 0000221720 | 5F65 | 7661 | 6F69 | 735F | 7A69 | F565 | 0109 | B300 |
| 0000221740 | 0D06 | 655F | 615F | 6976 | 5F6F | 6C63 | 736F | 2A65 |
| 0000221760 | 010A | B500 | 0D06 | 655F | 615F | 6976 | 5F6F | 6170 |
| 0000222000 | 6E69 | 8E74 | 010A | B700 | 0E06 | 655F | 615F | 6976 |
| 0000222020 | 5F6F | 696D | 6D6E | 7861 | 0B39 | 0001 | 06B9 | 5F18 |
| 0000222040 | 5F65 | 7661 | 6F69 | 615F | 6A64 | 7375 | 5F74 | 7266 |
| 0000222060 | 6D61 | 5F65 | 6F70 | 3C73 | 010C | BB00 | 1306 | 655F |
| 0000222100 | 615F | 6976 | 5F6F | 7274 | 6361 | 5F6B | 7266 | 6D61 |
| 0000222120 | 8165 | 010C | BD00 | 1806 | 655F | 615F | 6976 | 5F6F |
| 0000222140 | 7571 | 7265 | 5F79 | 7274 | 6361 | 5F6B | 6E69 | 6F66 |
| 0000222160 | 0D3F | 0001 | 06BF | 4515 | 415F | 4956 | 5F4F | 5246 |
| 0000222200 | 4D41 | 5F45 | 4E57 | 5F44 | 5250 | 434F | 14B3 | 0001 |
| 0000222220 | 06C6 | 4516 | 415F | 4956 | 5F4F | 4C43 | 4549 | 544E |
| 0000222240 | 575F | 444E | 505F | 4F52 | 3E43 | 0501 | 8500 | 0B00 |
| 0000222260 | 6F5F | 646C | 635F | 5F6D | 6F72 | E177 | 010D | C100 |
| 0000222300 | 1006 | 5F45 | 5641 | 4F49 | 465F | 4E4F | 5F54 | 4953 |
| 0000222320 | 455A | 0140 | 0005 | 0084 | 5F08 | 6D63 | 615F | 7474 |
| 0000222340 | 4172 | 0501 | 8400 | 0800 | 655F | 5F6D | 7461 | 7274 |
| 0000222360 | 0142 | 0005 | 0084 | 5F0D | 6D63 | 6C5F | 6E69 | 5F65 |

THU MAR 14 17:42:50 1991 MEDIT.DLL PAGE 79, LINE 4603

| | | | | | | | | |
|---|---|---|---|---|---|---|---|---|
| 0000222400 | 7461 | 7274 | 0143 | 0005 | 0084 | 5F09 | 6564 | 5F66 |
| 0000222420 | 7461 | 7274 | 0144 | 0005 | 0084 | 5F09 | 6573 | 5F74 |
| 0000222440 | 7461 | 7274 | 0146 | 0005 | 0085 | 5F0B | 6964 | 7073 |
| 0000222460 | 616C | 5F79 | 6D63 | 0148 | 0005 | 0689 | 5F0A | 6976 |
| 0000222500 | 5F6F | 6C62 | 6E61 | F26B | 0105 | AD00 | 0C06 | 655F |
| 0000222520 | 615F | 6976 | 5F6F | 6E69 | 7469 | 08F8 | 0001 | 06AF |
| 0000222540 | 5F0F | 5F65 | 7661 | 6F69 | 735F | 6174 | 7472 | 7075 |
| 0000222560 | 087E | 0004 | 0085 | 5F0B | 7563 | 5F72 | 7562 | 5F66 |
| 0000222600 | 6F6E | 009C | 0004 | 0863 | 5F0A | 7562 | 5F66 | 6174 |
| 0000222620 | 6C62 | 1865 | 0400 | 6400 | 0A08 | 655F | 6964 | 5F74 |
| 0000222640 | 696C | 656E | 5B07 | 0001 | 08D9 | 4519 | 425F | 5F55 |
| 0000222660 | 4E49 | 4553 | 5452 | 435F | 4148 | 5F52 | 5441 | 505F |
| 0000222700 | 494F | 544E | 5C7B | 0001 | 08DD | 4515 | 425F | 5F55 |
| 0000222720 | 4E49 | 5F53 | 5453 | 5F52 | 5441 | 505F | 494F | 544E |
| 0000222740 | 6683 | 0001 | 08E9 | 450D | 425F | 5F55 | 4547 | 5F54 |
| 0000222760 | 494C | 454E | 66FA | 0001 | 08EA | 4514 | 425F | 5F55 |
| 0000223000 | 4C43 | 534F | 5F45 | 414C | 5453 | 4C5F | 4E49 | BD45 |
| 0000223020 | 016C | EE00 | 1008 | 5F45 | 5542 | 445F | 4C45 | 5445 |
| 0000223040 | 5F45 | 494C | 454E | 704E | 0001 | 08F0 | 4513 | 425F |
| 0000223060 | 5F55 | 5349 | 425F | 4655 | 435F | 4148 | 474E | 4445 |
| 0000223100 | 735F | 0001 | 08F5 | 451A | 425F | 5F55 | 4547 | 5F54 |
| 0000223120 | 454E | 5458 | 4D5F | 444F | 4649 | 4549 | 5F44 | 5542 |
| 0000223140 | DA46 | 0173 | F700 | 0A08 | 5F45 | 5542 | 475F | 5445 |
| 0000223160 | 4843 | 01E8 | 0005 | 0081 | 5F0D | 6465 | 7469 | 6C5F |
| 0000223200 | 6E69 | 5F65 | 6F6E | 7706 | 0001 | 08FB | 450B | 425F |
| 0000223220 | 5F55 | 5550 | 5354 | 5254 | 01EA | 0005 | 0085 | 5F06 |
| 0000223240 | 5F65 | 6174 | B562 | 0123 | 9E00 | 0C08 | 5F45 | 5542 |
| 0000223260 | 445F | 5349 | 4C50 | 5941 | 7A05 | 0001 | 08FD | 450C |
| 0000223300 | 425F | 5F55 | 4E49 | 5F53 | 5453 | D552 | 0124 | A000 |
| 0000223320 | 1408 | 5F45 | 5542 | 475F | 5445 | 445F | 5349 | 5F50 |
| 0000223340 | 5453 | 5441 | 5355 | 2004 | 0001 | 0895 | 5F11 | 5F65 |
| 0000223360 | 7562 | 755F | 6470 | 7461 | 5F65 | 696C | 656E | 2221 |
| 0000223400 | 0001 | 0896 | 5F0A | 5F65 | 7562 | 695F | 696E | 0874 |
| 0000223420 | 0126 | A400 | 1008 | 5F45 | 5542 | 555F | 414E | 4C4C |
| 0000223440 | 434F | 425F | 4655 | 31C3 | 0001 | 08B4 | 5F13 | 656E |
| 0000223460 | 5F77 | 5F65 | 7562 | 725F | 6165 | 5F64 | 6966 | 656C |
| 0000223500 | 27CA | 0001 | 08A7 | 4511 | 425F | 5F55 | 4547 | 5F54 |
| 0000223520 | 454E | 5458 | 425F | 4655 | 7CA2 | 0001 | 08FF | 450D |
| 0000223540 | 425F | 4655 | 555F | 474E | 5445 | 4843 | 2EA8 | 0001 |
| 0000223560 | 08B0 | 450E | 425F | 5F55 | 4552 | 4441 | 465F | 4C49 |
| 0000223600 | 2D45 | 013B | BB00 | 1308 | 655F | 625F | 5F75 | 6567 |
| 0000223620 | 5F74 | 6966 | 656C | 645F | 7461 | 8161 | 0138 | B800 |
| 0000223640 | 1008 | 5F45 | 5542 | 535F | 5445 | 435F | 5255 | 425F |
| 0000223660 | 4655 | 7EEB | 0001 | 0901 | 450C | 425F | 5F55 | 4544 |
| 0000223700 | 5F4C | 5453 | 0552 | 013D | BC00 | 1008 | 5F45 | 5542 |
| 0000223720 | 435F | 554F | 544E | 4C5F | 4E49 | 5345 | 5E94 | 0001 |
| 0000223740 | 08E1 | 5F11 | 5F65 | 7562 | 755F | 6470 | 7461 | 5F65 |
| 0000223760 | 6863 | 7261 | 829E | 0001 | 0903 | 450D | 425F | 5F55 |
| 0000224000 | 4544 | 5F4C | 4843 | 5241 | 3E58 | 0001 | 08BE | 4511 |
| 0000224020 | 425F | 5F55 | 4553 | 5F54 | 5542 | 5F46 | 414E | 454D |
| 0000224040 | 67A1 | 0001 | 08EC | 5F0E | 5F65 | 7562 | 615F | 6464 |
| 0000224060 | 6C5F | 6E69 | 1865 | 0185 | 0700 | 1009 | 5F45 | 5542 |
| 0000224100 | 4C5F | 4E49 | 5F45 | 454C | 474E | 4854 | 404C | 0001 |
| 0000224120 | 08C0 | 4511 | 425F | 5F55 | 4547 | 5F54 | 5542 | 5F46 |
| 0000224140 | 414E | 454D | 8B44 | 0001 | 090B | 4513 | 425F | 5F55 |
| 0000224160 | 4547 | 5F54 | 5543 | 5252 | 5542 | 5F46 | 4F4E | 885E |
| 0000224200 | 0001 | 0909 | 5F0D | 5F65 | 7562 | 645F | 6665 | 745F |
| 0000224220 | 6261 | 8B71 | 0001 | 090C | 4515 | 425F | 5F55 | 4547 |
| 0000224240 | 5F54 | 5543 | 5252 | 5542 | 5F46 | 414E | 454D | 8A18 |

THU MAR 14 17:42:50 1991 MEDIT.DLL PAGE 80, LINE 4662

| | | | | | | | | |
|---|---|---|---|---|---|---|---|---|
| 0000224260 | 0001 | 090A | 5F0D | 5F65 | 7562 | 675F | 7465 | 745F |
| 0000224300 | 6261 | 8BAE | 0001 | 090D | 5F10 | 5F65 | 6261 | 726F |
| 0000224320 | 5F74 | 6465 | 7469 | 6E69 | 8567 | 0140 | C200 | 0F08 |
| 0000224340 | 5F45 | 5542 | 475F | 5445 | 425F | 4655 | 4E5F | 7C4F |
| 0000224360 | 0191 | 1600 | 0E09 | 655F | 695F | 5F73 | 6F6C | 6B63 |
| 0000224400 | 735F | 7465 | 8BD8 | 0001 | 0910 | 450D | 425F | 5F55 |
| 0000224420 | 4F4C | 4B43 | 425F | 4655 | 8E02 | 0001 | 0912 | 450F |
| 0000224440 | 425F | 5F55 | 4E55 | 4F4C | 4B43 | 425F | 4655 | 4334 |
| 0000224460 | 0001 | 08C5 | 4518 | 425F | 5F55 | 4547 | 5F54 | 504F |
| 0000224500 | 4E45 | 545F | 5345 | 5F54 | 414E | 454D | AF53 | 018F |
| 0000224520 | 1500 | 1209 | 5F45 | 5542 | 475F | 5445 | 4C5F | 434F |
| 0000224540 | 5F4B | 5453 | 5441 | 4646 | 0001 | 08C9 | 4514 | 425F |
| 0000224560 | 5F55 | 5246 | 4545 | 545F | 5345 | 5F54 | 414E | 454D |
| 0000224600 | AD53 | 0191 | 1700 | 0909 | 5F45 | 4552 | 5453 | 5241 |
| 0000224620 | 9F54 | 0147 | CB00 | 0F08 | 5F45 | 5542 | 575F | 4952 |
| 0000224640 | 4554 | 465F | 4C49 | 0545 | 0193 | 1900 | 1309 | 5F45 |
| 0000224660 | 5542 | 535F | 5445 | 545F | 5449 | 454C | 505F | 5241 |
| 0000224700 | 9B54 | 014B | CE00 | 0F08 | 5F45 | 5542 | 4F5F | 4550 |
| 0000224720 | 524E | 465F | 4C49 | 4A45 | 0151 | D000 | 0F08 | 5F45 |
| 0000224740 | 5542 | 4F5F | 4550 | 574E | 465F | 4C49 | 5245 | 0155 |
| 0000224760 | D200 | 0F08 | 5F45 | 5542 | 435F | 4F4C | 4553 | 465F |
| 0000225000 | 4C49 | 3045 | 0159 | D600 | 1008 | 5F45 | 5542 | 495F |
| 0000225020 | 534E | 5245 | 5F54 | 4843 | 5241 | 067A | 0004 | 0646 |
| 0000225040 | 5F04 | 6373 | 0472 | 0400 | 8500 | 0800 | 785F | 7543 |
| 0000225060 | 7372 | 726F | 0008 | 0004 | 0085 | 5F08 | 4379 | 7275 |
| 0000225100 | 6F73 | 1672 | 0400 | 8500 | 0A00 | 725F | 6665 | 6572 |
| 0000225120 | 6873 | 6465 | A26C | 0001 | 0692 | 5F0F | 5F65 | 7774 |
| 0000225140 | 645F | 7369 | 5F70 | 6863 | 7261 | A32D | 0001 | 0694 |
| 0000225160 | 5F0F | 5F65 | 7774 | 645F | 7369 | 5F70 | 696C | 656E |
| 0000225200 | A41B | 0001 | 0696 | 5F18 | 5F65 | 7774 | 645F | 7369 |
| 0000225220 | 5F70 | 696C | 656E | 665F | 6F72 | 5F6D | 7562 | 5466 |
| 0000225240 | 01A7 | 9F00 | 1006 | 655F | 735F | 7263 | 6565 | 5F6E |
| 0000225260 | 6373 | 6F72 | 6C6C | AAE7 | 0001 | 06A1 | 5F15 | 5F65 |
| 0000225300 | 7075 | 6164 | 6574 | 735F | 7263 | 6C6F | 5F6C | 6162 |
| 0000225320 | 7372 | AC6C | 0001 | 06A4 | 5F16 | 5F65 | 6373 | 6572 |
| 0000225340 | 6E65 | 635F | 6368 | 6B63 | 735F | 7263 | 6C6F | 8E6C |
| 0000225360 | 01B0 | AA00 | 1706 | 755F | 6470 | 7461 | 5F65 | 7563 |
| 0000225400 | 7372 | 726F | 705F | 736F | 7469 | 6F69 | 686E | 0194 |
| 0000225420 | 8300 | 0D06 | 5F45 | 5543 | 5352 | 524F | 485F | 4449 |
| 0000225440 | B545 | 0194 | 8500 | 0E06 | 5F45 | 5543 | 5352 | 524F |
| 0000225460 | 535F | 4148 | 4550 | 953A | 0001 | 0686 | 450D | 435F |
| 0000225500 | 5255 | 4F53 | 5F52 | 4853 | 574F | 9709 | 0001 | 068A |
| 0000225520 | 4510 | 535F | 5243 | 4545 | 5F4E | 4552 | 5246 | 5345 |
| 0000225540 | 7D48 | 019B | 8E00 | 0F06 | 5F45 | 4353 | 4552 | 4E45 |
| 0000225560 | 525F | 4445 | 4152 | B357 | 019C | 9000 | 0D06 | 5F45 |
| 0000225600 | 5543 | 5352 | 524F | 4D5F | 564F | 5145 | 01A5 | 9700 |
| 0000225620 | 1006 | 5F45 | 5754 | 445F | 5349 | 5F50 | 4353 | 4552 |
| 0000225640 | 4E45 | A578 | 0001 | 0699 | 4511 | 545F | 5F57 | 4E49 |
| 0000225660 | 4553 | 5452 | 4C5F | 4E49 | 5345 | A5BE | 0001 | 069B |
| 0000225700 | 4511 | 545F | 5F57 | 4544 | 454C | 4554 | 4C5F | 4E49 |
| 0000225720 | 5345 | A616 | 0001 | 069D | 450C | 545F | 5F57 | 4C43 |
| 0000225740 | 5F52 | 4F45 | 424C | 01AF | A600 | 1406 | 5F45 | 4353 |
| 0000225760 | 4552 | 4E45 | 435F | 4E45 | 4554 | 5F52 | 494C | 454E |
| 0000226000 | B012 | 0001 | 06A8 | 4510 | 475F | 5445 | 4D5F | 554F |
| 0000226020 | 4553 | 4C5F | 4E49 | E345 | 01B0 | AB00 | 1606 | 5F45 |
| 0000226040 | 4353 | 4552 | 4E45 | 555F | 4450 | 5441 | 5F45 | 4D43 |
| 0000226060 | 505F | 534F | 9587 | 0001 | 0687 | 5F1B | 5F65 | 7774 |
| 0000226100 | 645F | 7369 | 5F70 | 616C | 7473 | 735F | 7263 | 6565 |
| 0000226120 | 5F6E | 696C | 656E | 96C0 | 0001 | 0689 | 5F16 | 5F65 |

THU MAR 14 17:42:50 1991 MEDIT.DLL PAGE 81, LINE 4721

| | | | | | | | | |
|---|---|---|---|---|---|---|---|---|
| 0000226140 | 6373 | 6572 | 6E65 | 735F | 6968 | 7466 | 6F5F | 6972 |
| 0000226160 | 6967 | 3B6E | 0199 | 8C00 | 1006 | 655F | 735F | 7263 |
| 0000226200 | 6565 | 5F6E | 7075 | 6164 | 6574 | 08A6 | 0005 | 0085 |
| 0000226220 | 5F12 | 5F65 | 6176 | 696C | 5F64 | 6C62 | 636F | 5F6B |
| 0000226240 | 6C66 | 4C67 | 01B1 | D500 | 0E06 | 655F | 625F | 6F6C |
| 0000226260 | 6B63 | 735F | 6174 | 7472 | B275 | 0001 | 06D7 | 5F14 |
| 0000226300 | 5F65 | 6C62 | 636F | 5F6B | 7075 | 6164 | 6574 | 735F |
| 0000226320 | 7A69 | FA65 | 01B2 | D900 | 0C06 | 655F | 625F | 6F6C |
| 0000226340 | 6B63 | 655F | 646E | B370 | 0001 | 06DB | 5F0B | 5F65 |
| 0000226360 | 6C63 | 7069 | 635F | 7475 | B6DD | 0001 | 06E4 | 5F0C |
| 0000226400 | 5F65 | 6C63 | 7069 | 635F | 706F | E479 | 01B7 | E700 |
| 0000226420 | 0D06 | 655F | 635F | 696C | 5F70 | 6170 | 7473 | 7A65 |
| 0000226440 | 01B9 | E900 | 0E06 | 655F | 625F | 6F6C | 6B63 | 705F |
| 0000226460 | 6961 | 746E | C32E | 0001 | 06F5 | 5F0D | 5F65 | 6C63 |
| 0000226500 | 7069 | 735F | 6174 | 6574 | C371 | 0001 | 06F7 | 5F11 |
| 0000226520 | 5F65 | 6C63 | 7069 | 695F | 696E | 5F74 | 656D | 756E |
| 0000226540 | C40D | 0001 | 06F9 | 5F15 | 6573 | 5F74 | 6465 | 7469 |
| 0000226560 | 6D5F | 6E65 | 5F75 | 7473 | 7461 | 7375 | B71D | 0001 |
| 0000226600 | 06E5 | 450D | 425F | 4F4C | 4B43 | 505F | 5341 | 4554 |
| 0000226620 | BDE7 | 0001 | 06EF | 450B | 425F | 4F4C | 4B43 | 445F |
| 0000226640 | 4C45 | BFBD | 0001 | 06F3 | 450C | 425F | 4F4C | 4B43 |
| 0000226660 | 435F | 504F | A459 | 0508 | 8500 | 0800 | 655F | 6D5F |
| 0000226700 | 7261 | 5F6B | 6C66 | E067 | 0408 | B300 | 0306 | 635F |
| 0000226720 | DA6D | 0508 | 8500 | 0F00 | 655F | 6578 | 7563 | 6974 |
| 0000226740 | 6E6F | 6C5F | 6E69 | DC65 | 0508 | 8500 | 0A00 | 655F |
| 0000226760 | 5F6D | 7562 | 5F66 | 6F6E | CEA8 | 0001 | 06FD | 5F12 |
| 0000227000 | 6D63 | 665F | 6E69 | 5F64 | 656E | 7478 | 735F | 6D74 |
| 0000227020 | 6574 | 01D3 | 0600 | 0907 | 635F | 5F6D | 6C63 | 736F |
| 0000227040 | 1665 | 01D4 | 0A00 | 0807 | 655F | 5F6D | 6873 | 776F |
| 0000227060 | D5D1 | 0001 | 0711 | 5F0A | 6D63 | 755F | 6470 | 7461 |
| 0000227100 | C465 | 01D7 | 1800 | 0807 | 635F | 5F6D | 6E69 | 7469 |
| 0000227120 | C428 | 0001 | 06E9 | 450D | 435F | 5F4D | 4547 | 5F54 |
| 0000227140 | 494C | 454E | C5A8 | 0001 | 06EC | 4511 | 4E5F | 5745 |
| 0000227160 | 435F | 5F4D | 4547 | 5F54 | 494C | 454E | CD5F | 0001 |
| 0000227200 | 06F9 | 450A | 435F | 5F4D | 4E55 | 5550 | 3454 | 01CE |
| 0000227220 | F800 | 0806 | 5F45 | 4D43 | 505F | 534F | D03C | 0001 |
| 0000227240 | 06FF | 450E | 495F | 5F53 | 5845 | 4345 | 4C5F | 4E49 |
| 0000227260 | C745 | 01D2 | 0200 | 0907 | 5F45 | 4D43 | 4C5F | 4E49 |
| 0000227300 | F445 | 01D2 | 0300 | 0B07 | 5F45 | 4D43 | 425F | 4655 |
| 0000227320 | 4546 | 2152 | 01D3 | 0500 | 0F07 | 5F45 | 4D43 | 535F |
| 0000227340 | 5445 | 425F | 4655 | 4546 | 9752 | 01D3 | 0800 | 0D07 |
| 0000227360 | 5F45 | 4D45 | 535F | 5445 | 4C5F | 4E49 | C745 | 01D4 |
| 0000227400 | 0C00 | 1007 | 5F45 | 4D45 | 535F | 5445 | 445F | 5349 |
| 0000227420 | 4C50 | 5941 | D511 | 0001 | 070D | 4514 | 455F | 5F4D |
| 0000227440 | 4547 | 5F54 | 4944 | 5053 | 535F | 4154 | 5554 | 3953 |
| 0000227460 | 01D5 | 0E00 | 1707 | 5F45 | 4D45 | 475F | 5445 | 455F |
| 0000227500 | 4558 | 5543 | 4954 | 4E4F | 4C5F | 4E49 | 6145 | 01D5 |
| 0000227520 | 0F00 | 0C07 | 5F45 | 4D43 | 525F | 4C45 | 4145 | 4553 |
| 0000227540 | D706 | 0001 | ^713 | 4512 | 435F | 5F4D | 4553 | 5F54 |
| 0000227560 | 4157 | 5449 | 485F | 4F4F | 4D4B | 01D7 | 1500 | 1507 |
| 0000227600 | 5F45 | 4D43 | 535F | 5445 | 525F | 4C45 | 4145 | 4553 |
| 0000227620 | 485F | 4F4F | 944B | 01D7 | 1700 | 1507 | 5F45 | 4D43 |
| 0000227640 | 535F | 5445 | 455F | 4558 | 5543 | 4554 | 465F | 414C |
| 0000227660 | F147 | 01D7 | 1900 | 0A07 | 5F45 | 4D43 | 415F | 4F42 |
| 0000227700 | 5452 | D989 | 0001 | 071C | 4513 | 4E5F | 544F | 4649 |
| 0000227720 | 5F59 | 454E | 5453 | 4C5F | 5645 | 4C45 | 12D6 | 0005 |
| 0000227740 | 0000 | 5F06 | 6465 | 7461 | C061 | 0513 | 0000 | 0400 |
| 0000227760 | 655F | 646E | DB12 | 0001 | 0000 | 4306 | 495F | 494E |
| 0000230000 | 0454 | 050A | 0000 | 0C00 | 5F5F | 686E | 6165 | 5F70 |

THU MAR 14 17:42:50 1991 MEDIT.DLL PAGE 82, LINE 4780

| | | | | | | | | |
|---|---|---|---|---|---|---|---|---|
| 0000230020 | 6564 | 6373 | 13C0 | 0005 | 0000 | 5FDC | 7473 | 6361 |
| 0000230040 | 626B | 746F | 6F74 | 2A6D | 050A | 0000 | 0C00 | 5F5F |
| 0000230060 | 615F | 4244 | 7773 | 6670 | 676C | 09F6 | 0005 | 0000 |
| 0000230100 | 5F08 | 615F | 6D63 | 6C64 | 286E | 050A | 0000 | 0800 |
| 0000230120 | 5F5F | 7361 | 6765 | 6968 | 0A26 | 0005 | 0000 | 5F08 |
| 0000230140 | 615F | 6573 | 6C67 | 026F | 050A | 0000 | 0800 | 5F5F |
| 0000230160 | 7361 | 7A69 | 7364 | 0A00 | 0005 | 0000 | 5F08 | 615F |
| 0000230200 | 6F74 | 7370 | 1870 | 050A | 0000 | 0900 | 5F5F | 6361 |
| 0000230220 | 6966 | 666E | D66F | 00D6 | 0100 | 0900 | 5F5F | 4461 |
| 0000230240 | 7542 | 6573 | F864 | 0509 | 0000 | 0900 | 5F5F | 6561 |
| 0000230260 | 766E | 6573 | FC67 | 0509 | 0000 | 0A00 | 5F5F | 6874 |
| 0000230300 | 6572 | 6461 | 6469 | 09FA | 0005 | 0000 | 5F0A | 675F |
| 0000230320 | 6E69 | 6F66 | 6573 | D667 | 00D6 | 0100 | 0A00 | 5F5F |
| 0000230340 | 4461 | 6442 | 736F | 7077 | 09FE | 0005 | 0000 | 5F0A |
| 0000230360 | 6C5F | 6E69 | 6F66 | 6573 | 7667 | 0098 | 0100 | 0A00 |
| 0000230400 | 5F5F | 6361 | 7472 | 7375 | 6465 | 0A2C | 0005 | 0000 |
| 0000230420 | 5F0B | 5F5F | 4461 | 7242 | 6574 | 7272 | DB83 | 0001 |
| 0000230440 | 0000 | 5F0B | 615F | 736D | 5F67 | 7865 | 7469 | 0A3A |
| 0000230460 | 0005 | 0000 | 5F0B | 6F5F | 7673 | 7265 | 6973 | 6E6F |
| 0000230500 | DC9D | 0001 | 0000 | 5F06 | 655F | 6978 | 4F74 | 01DD |
| 0000230520 | 0000 | 0C00 | 5F5F | 6E75 | 6F6C | 6B63 | 7865 | 7469 |
| 0000230540 | 0C4D | 0005 | 0000 | 5F07 | 635F | 6968 | 646C | 0A3D |
| 0000230560 | 0005 | 0000 | 5F07 | 6E5F | 6966 | 656C | DBE4 | 0001 |
| 0000230600 | 0000 | 5F07 | 635F | 6E69 | 7469 | 0C3F | 0005 | 0000 |
| 0000230620 | 5F07 | 5F5F | 7261 | 6367 | DCA5 | 0001 | 0000 | 5F07 |
| 0000230640 | 635F | 7865 | 7469 | 0A3A | 0005 | 0000 | 5F0D | 645F |
| 0000230660 | 736F | 6576 | 6D72 | 6A61 | 726F | 0C41 | 0005 | 0000 |
| 0000230700 | 5F07 | 5F5F | 7261 | 7667 | 0A3B | 0005 | 0000 | 5F0D |
| 0000230720 | 645F | 736F | 6576 | 6D72 | 6E69 | 726F | 0B3F | 0005 |
| 0000230740 | 0000 | 5F08 | 705F | 7069 | 6365 | 4568 | 050C | 0000 |
| 0000230760 | 0800 | 655F | 766E | 7269 | 6E6F | 0A3F | 0005 | 0000 |
| 0000231000 | 5F08 | 6F5F | 6673 | 6C69 | 3C65 | 050A | 0000 | 0800 |
| 0000231020 | 5F5F | 736F | 6F6D | 6564 | DC3E | 0001 | 0000 | 5F08 |
| 0000231040 | 695F | 696E | 6674 | C670 | 0510 | 0000 | 0800 | 5F5F |
| 0000231060 | 7066 | 6E69 | 7469 | DD72 | 0001 | 0000 | 5F08 | 745F |
| 0000231100 | 7265 | 666D | 4970 | 050C | 0000 | 0800 | 5F5F | 6770 |
| 0000231120 | 706D | 7274 | DCAF | 0001 | 0000 | 5F08 | 635F | 655F |
| 0000231140 | 6978 | 3C74 | 050A | 0000 | 0900 | 5F5F | 6F64 | 6D73 |
| 0000231160 | 646F | 3A65 | 050A | 0000 | 0900 | 5F5F | 736F | 616D |
| 0000231200 | 6F6A | 3B72 | 050A | 0000 | 0900 | 5F5F | 736F | 696D |
| 0000231220 | 6F6E | 4F72 | 050C | 0000 | 0A00 | 5F5F | 7865 | 7469 |
| 0000231240 | 6F64 | 656E | DD05 | 0001 | 0000 | 5F0A | 6C5F | 636F |
| 0000231260 | 656B | 6978 | 3874 | 050A | 0000 | 0A00 | 5F5F | 6D75 |
| 0000231300 | 7361 | 766B | 6C61 | DD72 | 0001 | 0000 | 5F0A | 635F |
| 0000231320 | 6574 | 6D72 | 7573 | 5162 | 050C | 0000 | 0A00 | 5F5F |
| 0000231340 | 7865 | 7469 | 745F | 6469 | 0A2E | 0005 | 0000 | 5F05 |
| 0000231360 | 665F | 6361 | DC96 | 0001 | 0000 | 5F05 | 7865 | 7469 |
| 0000231400 | DD94 | 0001 | 0000 | 5F0E | 465F | 5F46 | 534D | 4247 |
| 0000231420 | 4E41 | 454E | 5452 | 050C | 0000 | 0900 | 5F5F | 6461 |
| 0000231440 | 6762 | 736D | 7667 | 0098 | 0100 | 0900 | 5F5F | 6361 |
| 0000231460 | 7472 | 736D | B667 | 01DD | 0000 | 0800 | 5F5F | 7066 |
| 0000231500 | 7274 | 7061 | 0C58 | 0005 | 0000 | 5F0C | 615F | 6C61 |
| 0000231520 | 7374 | 6B74 | 766F | BC72 | 01DD | 0000 | 0800 | 5F5F |
| 0000231540 | 6863 | 736B | 6B74 | DDBC | 0001 | 0000 | 5F0A | 615F |
| 0000231560 | 6346 | 6B68 | 7473 | D66B | 01DD | 0000 | 0900 | 5F5F |
| 0000231600 | 6573 | 6574 | 766E | DE70 | 01DE | 0000 | 0B00 | 5F5F |
| 0000231620 | 4D4E | 4753 | 545F | 5845 | 0E54 | 01DF | 0000 | 0C00 |
| 0000231640 | 5F5F | 4D4E | 4753 | 575F | 4952 | 4554 | DFF0 | 0001 |
| 0000231660 | 0000 | 5F0B | 5F5F | 6F64 | 6573 | 7272 | 6F6E | DFF8 |

THU MAR 14 17:42:50 1991 MEDIT.DLL PAGE 83, LINE 4839

| | | | | | | | | |
|---|---|---|---|---|---|---|---|---|
| 0000231700 | 0001 | 0000 | 5F07 | 655F | 7272 | 6F6E | DFA9 | 0001 |
| 0000231720 | 0000 | 5F08 | 645F | 736F | 6572 | 9074 | 01DF | 0000 |
| 0000231740 | 0900 | 5F5F | 6F64 | 7273 | 7465 | 5066 | 01E0 | 0000 |
| 0000231760 | 0B00 | 5F5F | 6366 | 6F6C | 6573 | 6C5F | 046B | 01E0 |
| 0000232000 | 0000 | 0700 | 665F | 6C63 | 736F | 0665 | 01E1 | 0000 |
| 0000232020 | 0800 | 5F5F | 7366 | 706F | 6E65 | E158 | 0001 | 0000 |
| 0000232040 | 5F06 | 6F66 | 6570 | 706E | 01E1 | 0000 | 0800 | 665F |
| 0000232060 | 7270 | 6E69 | 6674 | 0C60 | 0005 | 0000 | 5F08 | 635F |
| 0000232100 | 6C66 | 7375 | 7E68 | 0406 | 0000 | 0700 | 5F5F | 7562 |
| 0000232120 | 6966 | 626E | 050C | 0000 | 0500 | 5F5F | 6F69 | 4262 |
| 0000232140 | 050E | 0000 | 0600 | 5F5F | 6F69 | 3262 | 1022 | 0005 |
| 0000232160 | 00C0 | 5F09 | 6C5F | 7361 | 6974 | 626F | E1CA | 0001 |
| 0000232200 | 0000 | 5F08 | 665F | 6C69 | 7562 | 6666 | 01E2 | 0000 |
| 0000232220 | 0800 | 5F5F | 6C66 | 6273 | 6675 | E34C | 0001 | 0000 |
| 0000232240 | 5F09 | 665F | 6572 | 6265 | 6675 | E384 | 0001 | 0000 |
| 0000232260 | 5F08 | 675F | 7465 | 7562 | D066 | 01E3 | 0000 | 0A00 |
| 0000232300 | 5F5F | 706F | 6E65 | 6966 | 656C | E53A | 0001 | 0000 |
| 0000232320 | 5F07 | 665F | 6274 | 6675 | E4C2 | 0001 | 0000 | 5F07 |
| 0000232340 | 735F | 6274 | 6675 | E5C8 | 0001 | 0000 | 5F0B | 665F |
| 0000232360 | 6C66 | 7375 | 5F68 | 6B6C | E582 | 0001 | 0000 | 5F07 |
| 0000232400 | 6666 | 756C | 6873 | E634 | 0001 | 0000 | 5F09 | 6C66 |
| 0000232420 | 7375 | 6168 | 6C6C | E6C0 | 0001 | 0000 | 5F08 | 6F5F |
| 0000232440 | 7475 | 7570 | AA74 | 01EB | 0000 | 0B00 | 5F5F | 6567 |
| 0000232460 | 7374 | 7274 | 6165 | 226D | 01EC | 0000 | 0600 | 635F |
| 0000232500 | 6F6C | 6573 | EC6C | 0001 | 0000 | 5F06 | 736C | 6565 |
| 0000232520 | 626B | 01EC | 0000 | 0A00 | 5F5F | 736C | 6565 | 5F6B |
| 0000232540 | 6B6C | ECDA | 0001 | 0000 | 5F06 | 6F73 | 6570 | EB6E |
| 0000232560 | 01EC | 0000 | 0500 | 6F5F | 6570 | A66E | 01EE | 0000 |
| 0000232600 | 1100 | 5F5F | 5863 | 4E45 | 5849 | 6F74 | 4F44 | 6D53 |
| 0000232620 | 646F | B865 | 01EE | 0000 | 0500 | 725F | 6165 | 2064 |
| 0000232640 | 01F0 | 0000 | 0600 | 775F | 6972 | 6574 | F016 | 0001 |
| 0000232660 | 0000 | 5F0A | 775F | 6972 | 6574 | 6C5F | 906B | 0510 |
| 0000232700 | 0000 | 0700 | 5F5F | 6D66 | 646F | 9065 | 0510 | 0000 |
| 0000232720 | 0800 | 5F5F | 6F69 | 6F6D | 6564 | F1F4 | 0001 | 0000 |
| 0000232740 | 5F07 | 616D | 6C6C | 636F | F1F9 | 0001 | 0000 | 5F0A |
| 0000232760 | 616D | 6C6C | 636F | 6C5F | 036B | 01F2 | 0000 | 0800 |
| 0000233000 | 665F | 6572 | 5F65 | 6B6C | F1FE | 0001 | 0000 | 5F05 |
| 0000233020 | 7266 | 6565 | F23A | 0001 | 0000 | 5F0C | 665F | 616D |
| 0000233040 | 6C6C | 636F | 6C5F | 086B | 01F2 | 0000 | 0700 | 5F5F |
| 0000233060 | 6666 | 6572 | 1B65 | 01F2 | 0000 | 0900 | 5F5F | 6D66 |
| 0000233100 | 6C61 | 6F6C | 0863 | 01F2 | 0000 | 0A00 | 5F5F | 6666 |
| 0000233120 | 6572 | 5F65 | 6B6C | 1092 | 0005 | 0000 | 5F07 | 665F |
| 0000233140 | 6568 | 7061 | F2B8 | 0001 | 0000 | 5F09 | 695F | 696E |
| 0000233160 | 7374 | 6765 | F2EC | 0001 | 0000 | 5F09 | 6C5F | 6E69 |
| 0000233200 | 736B | 6765 | F322 | 0001 | 0000 | 5F0B | 735F | 6165 |
| 0000233220 | 6372 | 7368 | 6765 | F42D | 0001 | 0000 | 5F08 | 695F |
| 0000233240 | 636E | 6573 | 9E67 | 01F3 | 0000 | 0900 | 5F5F | 7267 |
| 0000233260 | 776F | 6573 | 6067 | 01F4 | 0000 | 0A00 | 5F5F | 6966 |
| 0000233300 | 646E | 616C | 7473 | 10A0 | 0005 | 0000 | 5F0A | 615F |
| 0000233320 | 626D | 6B6C | 6973 | 807A | 01F4 | 0000 | 0800 | 5F5F |
| 0000233340 | 656E | 7377 | 6765 | F4B2 | 0001 | 0000 | 5F07 | 7473 |
| 0000233360 | 6372 | 7461 | F4F8 | 0001 | 0000 | 5F07 | 7473 | 6372 |
| 0000233400 | 7970 | F52E | 0001 | 0000 | 5F07 | 7473 | 6372 | 706D |
| 0000233420 | F558 | 0001 | 0000 | 5F07 | 7473 | 6C72 | 6E65 | F570 |
| 0000233440 | 0001 | 0000 | 5F08 | 7473 | 6E72 | 7063 | 9A79 | 01F5 |
| 0000233460 | 0000 | 0800 | 735F | 7274 | 636E | 706D | F5D6 | 0001 |
| 0000233500 | 0000 | 5F05 | 7469 | 616F | 10A2 | 0005 | 0000 | 5F0D |
| 0000233520 | 635F | 6C66 | 6374 | 7476 | 745F | 6261 | 10BE | 0005 |
| 0000233540 | 0000 | 5F08 | 615F | 6973 | 657A | BF43 | 0510 | 0000 |

THU MAR 14 17:42:50 1991 MEDIT.DLL PAGE 84, LINE 4898

```
0000233560  0800  5F5F  7361  7A69  4465  10BC  0005  0000
0000233600  5F0B  735F  6769  6E69  6F74  6666  10BA  0005
0000233620  0000  5F0B  735F  6769  6E69  7374  6765  F5F2
0000233640  0001  0000  5F0A  615F  6146  6468  6669  6266
0000233660  01F6  0000  0600  5F5F  6F6C  6B63  F6AC  0001
0000233700  0000  5F07  6C5F  636F  666B  F636  0001  0000
0000233720  5F0D  755F  6C6E  636F  5F6B  6966  656C  F612
0000233740  0001  0000  5F0D  6C5F  636F  5F6B  7473  6572
0000233760  6D61  F68C  0001  0000  5F08  755F  6C6E  636F
0000234000  C06B  0510  0000  0900  5F5F  6F6C  6B63  6E63
0000234020  BC74  01F6  0000  0900  5F5F  6E75  6F6C  6B63
0000234040  1E66  01F6  0000  0F00  5F5F  6E75  6F6C  6B63
0000234060  735F  7274  6165  426D  01F6  0000  0A00  5F5F
0000234100  6177  7469  6F6C  6B63  F62A  0001  0000  5F0B
0000234120  6C5F  636F  5F6B  6966  656C  F6CC  0001  0000
0000234140  5F0B  675F  7465  6974  7464  6261  10C2  0005
0000234160  0000  5F0B  745F  6469  6174  6D62  7861  F746
0000234200  0001  0000  5F06  6766  7465  DC73  01F7  0000
0000234220  0800  735F  7270  6E69  6674  F877  0001  0000
0000234240  5F0D  665F  6572  6C61  6F6C  5F63  6B6C  F850
0000234260  0001  0000  5F0A  665F  6572  6C61  6F6C  FE63
0000234300  01F8  0000  0800  725F  6165  6C6C  636F  F903
0000234320  0001  0000  5F0B  6572  6C61  6F6C  5F63  6B6C
0000234340  F908  0001  0000  5F08  725F  7365  7A69  D065
0000234360  01F9  0000  0700  635F  6C61  6F6C  FE63  01F9
0000234400  0000  0900  5F5F  6966  646E  6573  2467  01FA
0000234420  0000  0700  735F  7274  6863  5272  01FA  0000
0000234440  0800  6D5F  6D65  6F6D  6576  FB1C  0001  0000
0000234460  5F07  656D  736D  7465  FB71  0001  0000  5F07
0000234500  635F  7478  616F  FB64  0001  0000  5F0A  635F
0000234520  746C  616F  7573  C862  01FB  0000  0400  615F
0000234540  7362  FBD6  0001  0000  5F07  6572  6F6D  6576
0000234560  FBD6  0001  0000  5F07  6E75  696C  6B6E  FBF4
0000234600  0001  0000  5F08  615F  6C46  6964  0176  000A
0000234620  8075  8183  6400  8300  0201  0101  8000  0101
0000234640  8000  0101  8000  0101  8000  0101  8000  0101
*
0000242420  8000  0101  8000  0101  8000  0A01  7500  8380
0000242440  0081  0064  0183  0102  0001  0180  0001  0180
0000242460  0001  0180  0001  0180  0001  0180  0001  0180
*
0000245200  0001  0180  0001  0180  0001  0180  0005  1078
0000245220  8083  0100  0001  0180  0001  0180  0001  0180
0000245240  0001  0180  0001  0180  0001  0180  0001  0180
*
0000245340  0001  0180  0001  0180  0001  0180  0007  8578
0000245360  0280  8083  0100  0001  0180  0001  0180  0001
0000245400  0180  0001  0180  0001  0180  0001  0180  0001
0000245420  0180  0001  0180  0001  0180  0001  0180  0007
0000245440  837F  00C0  C083  0100  000A  8075  8183  7300
0000245460  8302  065D  0A01  7500  8380  0200  0073  0183
0000245500  0102  000A  8075  8183  6400  8300  0201  0501
0000245520  7800  8360  0080  0701  7800  B885  8300  0080
0000245540  0501  7800  8368  0080  0701  7800  C085  8300
0000245560  0080  0501  7800  8350  0080  0701  7800  A885
0000245600  8300  0080  0701  7F00  C083  8300  00C4  0A01
0000245620  7500  8380  0081  0264  6783  0106  0005  3078
0000245640  8083  0100  0005  2878  8083  0100  0005  2078
0000245660  8083  0100  0005  4078  8083  0100  0005  5878
```

```
THU MAR 14 17:42:50 1991  MEDIT.DLL  PAGE 85, LINE 4957

0000245700  8083  0100  0005  7078  8083  0100  000A  8075
0000245720  8183  6400  8300  0201  0101  8000  0101  8000
0000245740  0101  8000  0101  8000  0101  8000  0101  8000
0000245760  0101  8000  1301  7900  0240  0983  8302  020A
0000246000  0782  505F  494F  544E  694C  0701  7F00  8283
0000246020  8300  0082  0901  7F00  0182  0078  0182  0479
0000246040  0101  8000  0101  8000  0101  8000  0101  8000
0000246060  0101  8000  0101  8000  1401  7900  8085  0400
0000246100  1283  8302  0213  0682  525F  4345  4C54  0169
0000246120  000D  837F  0082  8283  8300  0082  8283  0100
0000246140  0023  827F  7805  654C  7466  8200  7907  6F42
0000246160  7474  6D6F  8204  7806  6952  6867  0874  0482
0000246200  5479  706F  010C  0001  0180  0001  0180  0001
0000246220  0180  0001  0180  0001  0180  0001  0180  0001
*
0000247740  0180  0001  0180  0001  0180  0007  737A  EE83
0000247760  8202  0100  000A  8075  C083  7300  8304  02EF
0000250000  0D01  7F00  C083  8300  0085  C083  8300  00C0
0000250020  0101  8000  0101  8000  0101  8000  0101  8000
*
0000250300  0101  8000  0101  8000  0101  8000  1201  7900
0000250320  9085  0700  2083  8303  0321  0482  535F  5057
0000250340  0169  0016  837F  0085  8183  8300  0081  8183
0000250360  8300  0081  C083  8300  00C0  3201  7F00  0282
0000250400  7366  8200  6302  0279  0282  7863  8204  7901
0000250420  8206  7801  8208  6810  6E77  4964  736E  7265
0000250440  4274  6865  6E69  0A64  0482  7768  646E  010E
0000250460  0001  0180  0001  0180  0001  0180  0007  737A
0000250500  IF83  8203  0100  0001  0180  0001  0180  0001
0000250520  0180  0001  0180  0001  0180  0001  0180  0001
*
0000252200  0180  0018  8579  0230  830F  03F6  F783  8203
0000252220  5F0A  5254  4341  494B  464E  694F  2E01  7F00
0000252240  8183  8300  0081  8183  8300  0081  8183  8300
0000252260  0081  1183  8302  0211  0883  8302  0208  8583
0000252300  8300  0085  8583  8300  0085  8583  0100  00AB
0000252320  827F  6308  4278  726F  6564  0072  0882  7963
0000252340  6F42  6472  7265  8202  6306  4778  6972  0464
0000252360  0682  7963  7247  6469  8206  630A  4B78  7965
0000252400  6F62  7261  0864  0A82  7963  654B  6279  616F
0000252420  6472  820A  7208  6C63  7254  6361  0C6B  0B82
0000252440  6372  426C  756F  646E  7261  1C79  0F82  7470
0000252460  4D6C  6E69  7254  6361  536B  7A69  2C65  0F82
0000252500  7470  4D6C  7861  7254  6361  536B  7A69  3465
0000252520  0282  7366  823C  6306  4C78  6665  3E74  0882
0000252540  7963  6F42  7474  6D6F  8240  6307  5278  6769
0000252560  7468  8242  6305  5479  706F  0144  0001  0180
0000252600  0007  737A  F583  8203  0100  0001  0180  0001
0000252620  0180  0001  0180  0001  0180  0001  0180  0001
*
0000254340  0180  0001  0180  0001  0180  0001  0180  0012
0000254360  6079  8305  04D4  D583  8204  5F06  6F69  7562
0000254400  6966  1001  7F00  C083  8300  0081  C083  8300
0000254420  0080  8083  0100  0027  827F  5F04  7470  0072
0000254440  0482  635F  746E  8204  5F05  6162  6573  8206
0000254460  5F05  6C66  6761  820A  5F05  6966  656C  010B
0000254500  0001  0180  0007  737A  D383  8204  0100  0001
0000254520  0180  0001  0180  0001  0180  0001  0180  0001
*
```

THU MAR 14 17:42:50 1991 MEDIT.DLL PAGE 86, LINE 5016

```
0000257620  0180  0001  0180  0010  2079  8302  066B  6C83
0000257640  8206  5F04  5542  6946  0701  7F00  8583  8300
0000257660  0085  1D01  7F00  0B82  6F6E  6F5F  5F66  696C
0000257700  656E  0073  0B82  696C  656E  6C5F  6E65  7467
0000257720  0268  1301  7900  0230  6E83  8306  066F  0782
0000257740  6C5F  6E69  5F65  6974  0701  7F00  C083  8300
0000257760  0085  1701  7F00  0882  7473  5F72  696C  656E
0000260000  8200  7308  7274  615F  7474  0472  1001  7900
0000260020  0220  7183  8306  0672  0482  535F  5243  0169
0000260040  0007  837F  0085  8583  0100  000D  827F  7203
0000260060  776F  8200  6303  6C6F  0102  0012  2079  8302
0000260100  0674  7583  8206  5F06  7563  5F72  6974  0701
0000260120  7F00  8583  8300  0085  0D01  7F00  0382  6F72
0000260140  0077  0382  6F63  026C  1101  7900  0330  7783
0000260160  8306  0678  0382  635F  5F6D  6974  0A01  7F00
0000260200  8583  8300  0085  8583  0100  0016  827F  6206
0000260220  6675  6E5F  006F  0382  6F72  0277  0382  6F63
0000260240  046C  1501  7900  F085  0900  7B83  8306  067C
0000260260  0782  625F  6675  6566  6972  0701  7A00  8373
0000260300  066D  0082  1C01  7F00  C083  8300  066A  7083
0000260320  8306  0673  8583  8300  067A  D783  8304  0085
0000260340  8183  0100  004F  827F  6E04  6D61  0065  0882
0000260360  696C  656E  625F  6675  8204  7307  7263  625F
0000260400  6675  8208  6306  7275  6F73  0C72  0782  6863
0000260420  6E61  6567  1064  0782  7562  5F66  7470  1272
0000260440  0482  6966  656C  8216  7304  7A69  1A65  0482
0000260460  6F6C  6B63  011C  0007  8578  2EE0  7983  0106
0000260500  0001  0180  0001  0180  0001  0180  0001  0180
*
0000260540  0001  0180  0001  0180  0001  0180  0005  1078
0000260560  8083  0100  0001  0180  0001  0180  0001  0180
0000260600  0001  0180  0001  0180  0001  0180  0001  0180
*
0000261000  000A  8075  0083  6402  8300  0201  0401  7F00
0000261020  8583  0100  000A  8075  0083  6402  8301  06AE
0000261040  0D01  7F00  C083  8300  0085  C083  8300  00C0
0000261060  0A01  7500  8380  00C0  0464  B083  0106  0004
0000261100  837F  0085  0A01  7500  8380  0200  0164  B283
0000261120  0106  0004  837F  00C0  0A01  7500  8380  0200
0000261140  0164  B483  0106  0004  837F  0325  0A01  7500
0000261160  8380  00C0  0164  B683  0106  0004  837F  0325
0000261200  0A01  7500  8380  0200  0164  B883  0106  0007
0000261220  837F  00C0  C083  0100  000A  8075  0083  6402
0000261240  8302  06BA  0401  7F00  F983  0103  000A  8075
0000261260  0083  6402  8301  06BC  0D01  7F00  C083  8300
0000261300  0085  C083  8300  00C0  0A01  7500  8380  00C0
0000261320  0473  BE83  0106  0004  837F  0085  0A01  7500
0000261340  8380  0200  0173  C083  0106  000D  837F  00C0
0000261360  8583  8300  00C0  C083  0100  000A  8075  8183
0000261400  7300  8304  06C2  0101  8000  0D01  7F00  C083
0000261420  8300  0085  C083  8300  00C0  0A01  7500  8380
0000261440  00C0  0473  C583  0106  0001  0180  0007  8578
0000261460  0410  8083  0100  000A  8075  8183  6400  8300
0000261500  0201  0101  8000  0101  8000  0101  8000  0101
0000261520  8000  0101  8000  0101  8000  0101  8000  0101
*
0000261720  8000  0101  8000  0101  8000  0501  7800  8368
0000261740  0080  0101  8000  0101  8000  0101  8000  0101
0000261760  8000  0701  7800  0085  8301  0080  0101  8000
```

THU MAR 14 17:42:50 1991 MEDIT.DLL PAGE 87, LINE 5075

```
0000262000  0101  8000  0101  8000  0101  8000  0101  8000
*
0000262260  0101  8000  0501  7800  8360  0080  0101  8000
0000262300  0101  8000  0101  8000  0101  8000  0101  8000
*
0000270120  0701  7A00  8373  00C0  0082  0101  8000  0101
0000270140  8000  0101  8000  0101  8000  0101  8000  0101
*
0000270220  8000  0101  8000  0101  8000  0101  8000  0701
0000270240  7800  8085  8300  0080  0101  8000  0101  8000
0000270260  0101  8000  0101  8000  0101  8000  0101  8000
*
0000271700  0101  8000  1201  7900  0560  1C83  8306  061D
0000271720  0682  695F  626F  6675  0169  0010  837F  00C0
0000271740  8183  8300  00C0  8083  8300  0080  2701  7F00
0000271760  0482  705F  7274  8200  5F04  6E63  0474  0582
0000272000  625F  7361  0665  0582  665F  616C  0A67  0582
0000272020  665F  6C69  0B65  0101  8000  0701  7A00  8373
0000272040  061B  0082  0101  8000  0101  8000  0101  8000
0000272060  0101  8000  0101  8000  0101  8000  0101  8000
*
0000272640  0101  8000  0101  8000  0A01  7500  8380  0081
0000272660  0164  8283  0106  0004  837F  0085  0101  8000
0000272700  0101  8000  0101  8000  0101  8000  0101  8000
*
0000273020  0101  8000  0101  8000  0701  7A00  8373  069B
0000273040  0082  0A01  7500  8380  0081  0064  0183  0102
0000273060  0001  0180  0001  0180  0001  0180  0001  0180
*
0000273260  0001  0180  0001  0180  000A  8075  0083  6402
0000273300  8301  06BF  0401  7F00  8183  0100  0001  0180
0000273320  0001  0180  0001  0180  0001  0180  0001  0180
*
0000274760  0001  0180  0001  0180  0001  0180  0016  3079
0000275000  8303  078D  8E83  8207  280A  6E75  6174  6767
0000275020  6465  6929  0A01  7F00  8183  8300  0081  8183
0000275040  0100  001C  827F  7006  6361  5F6B  0068  0682
0000275060  6966  656C  685F  8202  6606  6E75  5F63  0468
0000275100  0101  8000  0101  8000  0101  8000  0101  8000
*
0000275300  0101  8000  0101  8000  0501  7800  8330  0080
0000275320  0501  7800  8340  0080  0101  8000  0101  8000
0000275340  0101  8000  0101  8000  0101  8000  0101  8000
*
0000276160  0701  7A00  8373  0541  0082  0101  8000  0101
0000276200  8000  0101  8000  0101  8000  0101  8000  0101
*
0000276520  8000  1001  7900  0220  5183  8308  0852  0482
0000276540  425F  4655  0169  0007  837F  0085  8583  0100
0000276560  001D  827F  6E0B  5F6F  666F  6C5F  6E69  7365
0000276600  8200  6C0B  6E69  5F65  656C  676E  6874  0102
0000276620  0013  3079  8302  0854  5583  8208  5F07  696C
0000276640  656E  745F  0169  0007  837F  00C0  8583  0100
0000276660  0017  827F  7308  7274  6C5F  6E69  0065  0882
0000276700  7473  5F72  7461  7274  0104  0010  2079  8302
0000276720  0857  5883  8208  5F04  4353  6952  0701  7F00
0000276740  8583  8300  0085  0D01  7F00  0382  6F72  0077
0000276760  0382  6F63  026C  1201  7900  0220  5A83  8308
0000277000  085B  0682  635F  7275  745F  0169  0007  837F
```

```
THU MAR 14 17:42:50 1991  MEDIT.DLL  PAGE 88, LINE 5134

0000277020  0085 8583 0100 000D 827F 7203 776F 8200
0000277040  6303 6C6F 0102 0011 3079 8303 085D 5E83
0000277060  8208 5F05 6D63 745F 0169 000A 837F 0085
0000277100  8583 8300 0085 1601 7F00 0682 7562 5F66
0000277120  6F6E 8200 7203 776F 8202 6303 6C6F 0104
0000277140  0015 8579 00F0 8309 0861 6283 8208 5F07
0000277160  7562 6666 7265 0169 0007 737A 5383 8208
0000277200  0100 001C 837F 00C0 5083 8308 0856 5983
0000277220  8308 0085 6083 8308 061F 8583 8300 0081
0000277240  4F01 7F00 0482 616E 656D 8200 6C08 6E69
0000277260  5F65 7562 0466 0782 6373 5F72 7562 0866
0000277300  0682 7563 7372 726F 820C 6307 6168 676E
0000277320  6465 8210 6207 6675 705F 7274 8212 6604
0000277340  6C69 1665 0482 6973 657A 821A 6C04 636F
0000277360  1C6B 0701 7800 E085 832E 085F 0701 7800
0000277400  2085 8304 0080 0101 8000 0101 8000 0701
0000277420  7A00 8373 0850 0082 0101 8000 0101 8000
0000277440  0101 8000 0101 8000 0101 8000 0101 8000
*
0000277600  0101 8000 0701 7800 8085 8302 0080 0101
0000277620  8000 0101 8000 0101 8000 0101 8000 0101
*
0000277660  8000 0101 8000 0701 7800 0085 8304 022C
0000277700  0501 7800 8308 008D 0A01 7500 8380 0081
0000277720  0464 9183 0108 000D 837F 00C0 1F83 8306
0000277740  00C5 8583 0100 000A 8075 8183 6400 8303
0000277760  0893 0A01 7F00 C083 8300 0081 8183 0100
0000300000  0007 837F 00C0 8183 0100 000A 8075 8183
0000300020  6400 8302 0894 0A01 7500 8380 0081 0064
0000300040  0183 0102 0001 0180 0001 0180 0005 5078
0000300060  8083 0100 0005 2078 8083 0100 0005 6078
0000300100  8283 0100 0005 2878 8083 0100 0004 837F
0000300120  0085 0A01 7500 8380 0200 0173 9D83 0108
0000300140  0001 0180 000A 8075 8583 7300 8300 0201
0000300160  0101 8000 0701 7800 A885 8300 0080 0401
0000300200  7F00 8583 0100 000A 8075 0083 7302 8301
0000300220  08A3 0101 8000 0701 7800 8885 8300 0080
0000300240  0A01 7500 8380 0085 0073 0183 0102 0007
0000300260  8578 0090 8083 0100 0007 8578 0090 8083
0000300300  0100 0005 3878 8083 0100 000D 837F 00C0
0000300320  1F83 8306 00C5 8583 0100 000A 8075 8183
0000300340  6400 8304 08AB 0101 8000 0501 7800 8358
0000300360  0080 0401 7F00 8583 0100 000A 8075 8183
0000300400  7300 8301 08AF 0101 8000 0501 7800 8378
0000300420  0080 0401 7F00 8583 0100 000A 8075 8183
0000300440  6400 8301 08B3 0101 8000 0701 7800 9885
0000300460  8300 0080 0401 7F00 8583 0100 000A 8075
0000300500  8183 7300 8301 08B7 0501 7800 8318 0080
0000300520  0701 7F00 6783 8308 0085 0A01 7500 8380
0000300540  0081 0264 BA83 0108 000A 8075 8583 7300
0000300560  8300 0201 0701 7F00 8583 8300 00C0 0A01
0000300600  7500 8380 0200 0273 BD83 0108 0004 837F
0000300620  0085 0A01 7500 8380 00C0 0173 BF83 0108
0000300640  0007 837F 00C0 C583 0100 000A 8075 8183
0000300660  7300 8302 08C1 0101 8000 0701 7F00 C583
0000300700  8300 0819 0A01 7500 8380 0081 0273 C483
0000300720  0108 0001 0180 0007 8578 00C8 8083 0100
0000300740  0007 837F 0085 4183 0105 000A 8075 0083
0000300760  7302 8302 08C8 0401 7F00 8583 0100 000A
```

THU MAR 14 17:42:50 1991 MEDIT.DLL PAGE 89, LINE 5193

| | | | | | | | | |
|---|---|---|---|---|---|---|---|---|
| 0000301000 | 8075 | 8183 | 7300 | 8301 | 08CA | 0501 | 7800 | 8310 |
| 0000301020 | 0080 | 0A01 | 7F00 | C083 | 8300 | 0086 | C583 | 0100 |
| 0000301040 | 000A | 8075 | 8183 | 7300 | 8303 | 08CD | 0A01 | 7F00 |
| 0000301060 | C083 | 8300 | 0086 | C583 | 0100 | 000A | 8075 | 8183 |
| 0000301100 | 7300 | 8303 | 08CF | 0401 | 7F00 | 8583 | 0100 | 000A |
| 0000301120 | 8075 | 8183 | 7300 | 8301 | 08D1 | 0401 | 7F00 | 8583 |
| 0000301140 | 0100 | 000A | 8075 | 0083 | 6402 | 8301 | 08D3 | 0A01 |
| 0000301160 | 7F00 | 8083 | 8300 | 0085 | 8583 | 0100 | 000A | 8075 |
| 0000301200 | 8183 | 7300 | 8303 | 08D5 | 0701 | 7800 | B085 | 8302 |
| 0000301220 | 0080 | 0401 | 7F00 | 8083 | 0100 | 000A | 8075 | 0083 |
| 0000301240 | 7302 | 8301 | 08D8 | 0101 | 8000 | 0701 | 7800 | D085 |
| 0000301260 | 8300 | 0080 | 0401 | 7F00 | C083 | 0100 | 000A | 8075 |
| 0000301300 | 0083 | 7302 | 8301 | 08DC | 0101 | 8000 | 0701 | 7800 |
| 0000301320 | B085 | 8300 | 0080 | 0A01 | 7F00 | 8083 | 8300 | 0085 |
| 0000301340 | 8583 | 0100 | 000A | 8075 | 8183 | 6400 | 8303 | 08E0 |
| 0000301360 | 0A01 | 7F00 | C083 | 8300 | 0081 | 8183 | 0100 | 000A |
| 0000301400 | 8075 | 8183 | 6400 | 8303 | 08E2 | 0101 | 8000 | 0501 |
| 0000301420 | 7800 | 8370 | 0080 | 0701 | 7800 | F085 | 8300 | 0080 |
| 0000301440 | 0A01 | 7500 | 8380 | 0081 | 0064 | 0183 | 0102 | 0007 |
| 0000301460 | 837F | 0085 | 8583 | 0100 | 000A | 8075 | C083 | 7300 |
| 0000301500 | 8302 | 08E8 | 0A01 | 7500 | 8380 | 0081 | 0073 | 0183 |
| 0000301520 | 0102 | 0004 | 837F | 0085 | 0A01 | 7500 | 8380 | 0081 |
| 0000301540 | 0164 | EB83 | 0108 | 0004 | 837F | 0085 | 0A01 | 7500 |
| 0000301560 | 8380 | 0081 | 0173 | ED83 | 0108 | 0004 | 837F | 0085 |
| 0000301600 | 0A01 | 7500 | 8380 | 0081 | 0173 | EF83 | 0108 | 0004 |
| 0000301620 | 837F | 0085 | 0A01 | 7500 | 8380 | 0081 | 0164 | F183 |
| 0000301640 | 0108 | 0001 | 0180 | 0004 | 837F | 00C5 | 0A01 | 7500 |
| 0000301660 | 8380 | 0081 | 0173 | F483 | 0108 | 000A | 837F | 0085 |
| 0000301700 | 8583 | 8300 | 00C0 | 0A01 | 7500 | 8380 | 0081 | 0373 |
| 0000301720 | F683 | 0108 | 0001 | 0180 | 0005 | 4878 | 8083 | 0100 |
| 0000301740 | 000A | 837F | 0081 | 8183 | 8300 | 00C0 | 0A01 | 7500 |
| 0000301760 | 8380 | 0081 | 0373 | FA83 | 0108 | 000A | 837F | 0081 |
| 0000302000 | 8183 | 8300 | 00C0 | 0A01 | 7500 | 8380 | 0081 | 0373 |
| 0000302020 | FC83 | 0108 | 000A | 837F | 00C1 | C183 | 8300 | 00C0 |
| 0000302040 | 0A01 | 7500 | 8380 | 0081 | 0373 | FE83 | 0108 | 000A |
| 0000302060 | 837F | 0081 | 8183 | 8300 | 0081 | 0A01 | 7500 | 8380 |
| 0000302100 | 0081 | 0373 | 0083 | 0109 | 0007 | 837F | 0081 | 8183 |
| 0000302120 | 0100 | 000A | 8075 | 8183 | 7300 | 8302 | 0902 | 0401 |
| 0000302140 | 7F00 | 8183 | 0100 | 000A | 8075 | 0083 | 6402 | 8301 |
| 0000302160 | 0904 | 0401 | 7F00 | 8583 | 0100 | 000A | 8075 | 8183 |
| 0000302200 | 7300 | 8301 | 0906 | 0401 | 7F00 | 8583 | 0100 | 000A |
| 0000302220 | 8075 | 8183 | 6400 | 8301 | 0908 | 0A01 | 7500 | 838u |
| 0000302240 | 0085 | 0064 | 0183 | 0102 | 000A | 8075 | 8583 | 7300 |
| 0000302260 | 8300 | 0201 | 0A01 | 7500 | 8380 | 00C0 | 0073 | 0183 |
| 0000302300 | 0102 | 000A | 8075 | 8183 | 6400 | 8300 | 0201 | 0701 |
| 0000302320 | 7800 | 4885 | 8303 | 0080 | 0401 | 7F00 | 8183 | 0100 |
| 0000302340 | 000A | 8075 | 8183 | 7300 | 8301 | 090F | 0401 | 7F00 |
| 0000302360 | 8183 | 0100 | 000A | 8075 | 8183 | 7300 | 8301 | 0911 |
| 0000302400 | 0701 | 7800 | A085 | 8300 | 0080 | 0701 | 7F00 | 8183 |
| 0000302420 | 8300 | 00C1 | 0A01 | 7500 | 8380 | 0081 | 0273 | 1483 |
| 0000302440 | 0109 | 000A | 8075 | 8583 | 6400 | 8300 | 0201 | 0A01 |
| 0000302460 | 7500 | 8380 | 0081 | 0073 | 0183 | 0102 | 0007 | 837F |
| 0000302500 | 0081 | C083 | 0100 | 000A | 8075 | 8183 | 7300 | 8302 |
| 0000302520 | 0918 | 0701 | 7800 | F885 | 8300 | 0080 | 0A01 | 7500 |
| 0000302540 | 8380 | 0081 | 0064 | 0183 | 0102 | 0001 | 0180 | 0001 |
| 0000302560 | 0180 | 0001 | 0180 | 0001 | 0180 | 0001 | 0180 | 0001 |
| * | | | | | | | | |
| 0000302640 | 0180 | 0001 | 0180 | 0001 | 0180 | 0014 | 8579 | 0080 |
| 0000302660 | 8304 | 0212 | 1383 | 8202 | 5F06 | 4552 | 5443 | 694C |

```
THU MAR 14 17:42:50 1991  MEDIT.DLL  PAGE 90, LINE 5252

0000302700  0D01  7F00  8283  8300  0082  8283  8300  0082
0000302720  2301  7F00  0582  4C78  6665  0074  0782  4279
0000302740  746F  6F74  046D  0682  5278  6769  7468  8208
0000302760  7904  6F54  0C70  0101  8000  0101  8000  0101
0000303000  8000  0101  8000  0101  8000  0101  8000  0101
*
0000304100  8000  0101  8000  1A01  7900  0440  A983  8302
0000304120  02AA  0E82  565F  4F49  5543  5352  524F  4E49
0000304140  4F46  0169  000D  837F  0085  8583  8300  0085
0000304160  8583  0100  001D  827F  7906  7453  7261  0074
0000304200  0482  4563  646E  8202  6302  0478  0482  7461
0000304220  7274  0106  0001  0180  0001  0180  0001  0180
0000304240  0001  0180  0001  0180  0001  0180  0001  0180
*
0000310460  0001  0180  0012  6079  8305  04D4  D583  8204
0000310500  5F06  6F69  7562  6966  1001  7F00  C083  8300
0000310520  0081  C083  8300  0080  8083  0100  0027  827F
0000310540  5F04  7470  0072  0482  635F  746E  8204  5F05
0000310560  6162  6573  8206  5F05  6C66  6761  820A  5F05
0000310600  6966  656C  010B  0001  0180  0007  737A  D383
0000310620  8204  0100  0001  0180  0001  0180  0001  0180
0000310640  0001  0180  0001  0180  0001  0180  0001  0180
*
0000313460  0001  0180  0010  2079  8302  0641  4283  8206
0000313500  5F04  5542  6946  0701  7F00  8583  8300  0085
0000313520  1D01  7F00  0B82  6F6E  6F5F  5F66  696C  656E
0000313540  0073  0B82  696C  656E  6C5F  6E65  7467  0268
0000313560  1301  7900  0230  4483  8306  0645  0782  6C5F
0000313600  6E69  5F65  6974  0701  7F00  C083  8300  0085
0000313620  1701  7F00  0882  7473  5F72  696C  656E  8200
0000313640  7308  7274  615F  7474  0472  1001  7900  0220
0000313660  4783  8306  0648  0482  535F  5243  0169  0007
0000313700  837F  0085  8583  0100  000D  827F  7203  776F
0000313720  8200  6303  6C6F  0102  0012  2079  8302  064A
0000313740  4B83  8206  5F06  7563  5F72  6974  0701  7F00
0000313760  8583  8300  0085  0D01  7F00  0382  6F72  0077
0000314000  0382  6F63  026C  1101  7900  0330  4D83  8306
0000314020  064E  0582  635F  5F6D  6974  0A01  7F00  8583
0000314040  8300  0085  8583  0100  0016  827F  6206  6675
0000314060  6E5F  006F  0382  6F72  0277  0382  6F63  046C
0000314100  1501  7900  F085  0900  5183  8306  0652  0782
0000314120  625F  6675  6566  6972  0701  7A00  8373  0643
0000314140  0082  1C01  7F00  C083  8300  0640  4683  8306
0000314160  0649  8583  8300  0650  D783  8304  0085  8183
0000314200  0100  004F  827F  6E04  6D61  0065  0882  696C
0000314220  656E  625F  6675  8204  7307  7263  625F  6675
0000314240  8208  6306  7275  6F73  0C72  0782  6863  6E61
0000314260  6567  1064  0782  7562  5F66  7470  1272  0482
0000314300  6966  656C  8216  7304  7A69  1A65  0482  6F6C
0000314320  6B63  011C  0007  8578  2EE0  4F83  0106  0001
0000314340  0180  0001  0180  0001  0180  0001  0180  0001
*
0000314400  0180  0001  0180  0001  0180  0005  1078  8083
0000314420  0100  0001  0180  0001  0180  0001  0180  0001
0000314440  0180  0001  0180  0001  0180  0001  0180  0001
*
0000314620  0180  0001  0180  0001  0180  0001  0180  000A
0000314640  8075  0083  7302  8300  0201  0401  7F00  8583
0000314660  0100  000A  8075  0083  7302  8301  0684  0A01
```

THU MAR 14 17:42:50 1991 MEDIT.DLL PAGE 91, LINE 5311

```
0000314700  7500  8380  0200  0073  0183  0102  000A  8075
0000314720  0083  6402  8300  0201  0701  7F00  8583  8300
0000314740  0085  0A01  7500  8380  0200  0264  8883  0106
0000314760  000A  8075  0083  7302  8300  0201  0A01  7F00
0000315000  8583  8300  0085  8583  0100  000A  8075  0083
0000315020  6402  8303  068B  0501  7800  8310  0080  0A01
0000315040  7500  8380  0200  0073  0183  0102  0004  837F
0000315060  0081  0A01  7500  8380  0200  0173  8F83  0106
0000315100  0004  837F  00C0  0A01  7500  8380  0200  0164
0000315120  9183  0106  000A  837F  00C0  8583  8300  0085
0000315140  0A01  7500  8380  0200  0364  9383  0106  0004
0000315160  837F  0081  0A01  7500  8380  0200  0164  9583
0000315200  0106  000A  8075  0083  7302  8300  0201  0701
0000315220  7F00  8183  8300  0081  0A01  7500  8380  0200
0000315240  0273  9883  0106  0007  837F  0081  8183  0100
0000315260  000A  8075  0083  7302  8302  069A  0701  7F00
0000315300  8583  8300  0085  0A01  7500  8380  0200  0273
0000315320  9C83  0106  000A  837F  0085  8583  8300  0085
0000315340  0A01  7500  8380  0200  0364  9E83  0106  0004
0000315360  837F  0211  0A01  7500  8380  0200  0164  A083
0000315400  0106  000D  837F  0085  C083  8300  00C5  8583
0000315420  0100  000A  8075  0083  6402  8304  06A2  0A01
0000315440  7500  8380  0200  0064  0183  0102  0004  837F
0000315460  0085  0A01  7500  8380  0081  0173  A583  0106
0000315500  0013  837F  00C0  8583  8300  00C0  C083  8300
0000315520  00C5  C583  0100  000A  8075  0083  7302  8306
0000315540  06A7  0101  8000  0A01  7500  8380  0200  0064
0000315560  0183  0102  000A  8075  0083  7302  8300  0201
0000315600  0A01  7500  8380  0081  0064  0183  0102  0001
0000315620  0180  0001  0180  0001  0180  0001  0180  0001
*
0000323320  0180  0001  0180  0012  6079  8305  04D4  D583
0000323340  8204  5F06  6F69  7562  6966  1001  7F00  C083
0000323360  8300  0081  C083  8300  0080  8083  0100  0027
0000323400  827F  5F04  7470  0072  0482  635F  746E  8204
0000323420  5F05  6162  6573  8206  5F05  6C66  6761  820A
0000323440  5F05  6966  656C  010B  0001  0180  0007  737A
0000323460  D383  8204  0100  0001  0180  0001  0180  0001
0000323500  0180  0001  0180  0001  0180  0001  0180  0001
*
0000324300  0180  0001  0180  0001  0180  0007  737A  3E83
0000324320  8205  0100  000A  8075  8183  6400  8300  0201
0000324340  0101  8000  0101  8000  0101  8000  0101  8000
*
0000325420  1601  7900  0330  CC83  8305  05CD  0A82  7528
0000325440  746E  6761  6567  2964  0169  000A  837F  0081
0000325460  8183  8300  0081  1C01  7F00  0682  6170  6B63
0000325500  685F  8200  6606  6C69  5F65  0268  0682  7566
0000325520  636E  685F  0104  0001  0180  0001  0180  0001
0000325540  0180  0001  0180  0001  0180  0001  0180  0001
*
0000325720  0180  0001  0180  0001  0180  0001  0180  0005
0000325740  5078  8083  0100  0005  4078  8083  0100  0001
0000325760  0180  0001  0180  0001  0180  0001  0180  0001
*
0000327140  0180  0001  0180  0001  0180  0010  2079  8302
0000327160  0692  9383  8206  5F04  5542  6946  0701  7F00
0000327200  8583  8300  0085  1D01  7F00  0B82  6F6E  6F5F
0000327220  5F66  696C  656E  0073  0B82  696C  656E  6C5F
```

THU MAR 14 17:42:50 1991 MEDIT.DLL PAGE 92, LINE 5370

```
0000327240  6E65  7467  0268  1301  7900  0230  9583  8306
0000327260  0696  0782  6C5F  6E69  5F65  6974  0701  7F00
0000327300  C083  8300  0085  1701  7F00  0882  7473  5F72
0000327320  696C  656E  8200  7308  7274  615F  7474  0472
0000327340  1001  7900  0220  9883  8306  0699  0482  535F
0000327360  5243  0169  0007  837F  0085  8583  0100  000D
0000327400  827F  7203  776F  8200  6303  6C6F  0102  0012
0000327420  2079  8302  069B  9C83  8206  5F06  7563  5F72
0000327440  6974  0701  7F00  8583  8300  0085  0D01  7F00
0000327460  0382  6F72  0077  0382  6F63  026C  0101  8000
0000327500  0101  8000  0101  8000  1501  7900  F085  0900
0000327520  A283  8306  06A3  0782  625F  6675  6566  6972
0000327540  0701  7A00  8373  0694  0082  1C01  7F00  C083
0000327560  8300  0691  9783  8306  069A  8583  8300  06A1
0000327600  D783  8304  0085  8183  0100  004F  827F  6E04
0000327620  6D61  0065  0882  696C  656E  625F  6675  8204
0000327640  7307  7263  625F  6675  8208  6306  7275  6F73
0000327660  0C72  0782  6863  6E61  6567  1064  0782  7562
0000327700  5F66  7470  1272  0482  6966  656C  8216  7304
0000327720  7A69  1A65  0482  6F6C  6B63  011C  0007  8578
0000327740  2EE0  A083  0106  0007  8578  0420  8083  0100
0000327760  0001  0180  0001  0180  000A  8075  8183  6400
0000330000  8301  06A9  0401  7F00  8583  0100  0001  0180
0000330020  0001  0180  0001  0180  0001  0180  0001  0180
*
0000330220  0001  0180  000A  8075  8183  6400  8303  06CD
0000330240  0A01  7F00  C083  8300  0085  8583  0100  0001
0000330260  0180  0001  0180  0001  0180  0001  0180  0001
0000330300  0180  0001  0180  0010  837F  00C0  8583  8300
0000330320  0085  8183  8300  0081  0A01  7500  8380  0081
0000330340  0564  D483  0106  000A  837F  00C0  8583  8300
0000330360  0085  0A01  7500  8380  0081  0364  D683  0106
0000330400  000A  837F  00C0  8583  8300  0085  0A01  7500
0000330420  8380  0081  0364  D883  0106  0004  837F  00C0
0000330440  0A01  7500  8380  0081  0164  DA83  0106  0001
0000330460  0180  0001  0180  0005  5878  8083  0100  0005
0000330500  2078  8083  0100  0005  6078  8283  0100  0005
0000330520  5078  8083  0100  0005  1878  8083  0100  0004
0000330540  837F  00C0  0A01  7500  8380  0081  0164  E383
0000330560  0106  000A  8075  8183  7300  8300  0201  0401
0000330600  7F00  C083  0100  000A  8075  8183  6400  8301
0000330620  06E6  0401  7F00  8583  0100  000A  8075  0083
0000330640  6402  8301  06E8  0A01  7F00  C083  8300  0085
0000330660  8583  0100  000A  8075  8183  6400  8303  06EA
0000330700  0401  7F00  8583  0100  000A  8075  8183  6400
0000330720  8301  06EC  0D01  7F00  8183  8300  0081  8183
0000330740  8300  0081  0A01  7500  8380  0081  0473  EE83
0000330760  0106  000D  837F  0081  8183  8300  0081  8183
0000331000  0100  000A  8075  8583  6400  8304  06F0  0D01
0000331020  7F00  8183  8300  0081  8183  8300  0081  0A01
0000331040  7500  8380  0081  0473  F283  0106  0007  837F
0000331060  00C5  C583  0100  000A  8075  0083  6402  8302
0000331100  06F4  0401  7F00  C083  0100  000A  8075  8183
0000331120  6400  8301  06F6  0401  7F00  8583  0100  000A
0000331140  8075  0083  6402  8301  06F8  0A01  7500  8380
0000331160  0081  0064  0183  0102  0001  0180  0012  6079
0000331200  8305  0203  0483  8202  5F06  6F69  7562  6966
0000331220  1001  7F00  C083  8300  0081  C083  8300  0080
0000331240  8083  0100  0027  827F  5F04  7470  0072  0482
```

```
THU MAR 14 17:42:50 1991  MEDIT.DLL  PAGE 93, LINE 5429

0000331260  635F  746E  8204  5F05  6162  6573  8206  5F05
0000331300  6C66  6761  820A  5F05  6966  656C  010B  0001
0000331320  0180  0007  737A  0283  8202  0100  0001  0180
0000331340  0001  0180  0001  0180  0001  0180  0001  0180
*
0000331400  000A  8075  8183  6400  8300  0201  0101  8000
0000331420  0101  8000  0101  8000  0101  8000  0101  8000
*
0000331740  0701  7A00  8373  0247  0082  0A01  7500  8380
0000331760  0081  0064  0183  0102  0001  0180  0001  0180
0000332000  0001  0180  0001  0180  0001  0180  0001  0180
*
0000337200  0007  737A  EB83  8204  0100  000A  8075  8183
0000337220  7300  8300  0201  0101  8000  0101  8000  0101
0000337240  8000  0101  8000  0101  8000  0101  8000  0101
*
0000340560  8000  0101  8000  1601  7900  0330  A583  8305
0000340600  05A6  0A82  7528  746E  6761  6567  2964  0169
0000340620  000A  837F  0081  8183  8300  0081  1C01  7F00
0000340640  0682  6170  6B63  685F  8200  6606  6C69  5F65
0000340660  0268  0682  7566  636E  685F  0104  0001  0180
0000340700  0001  0180  0001  0180  0001  0180  0001  0180
*
0000341100  0001  0180  0005  2878  8083  0100  0005  4078
0000341120  8083  0100  0001  0180  0001  0180  0001  0180
0000341140  0001  0180  0001  0180  0001  0180  0001  0180
*
0000342640  0001  0180  0001  0180  0007  737A  A183  8206
0000342660  0100  000A  8075  8183  7300  8300  0201  0101
0000342700  8000  0101  8000  0101  8000  0101  8000  0101
0000342720  8000  1001  7900  0220  A883  8306  06A9  0482
0000342740  425F  4655  0169  0007  837F  0085  8583  0100
0000342760  001D  827F  6E0B  5F6F  666F  6C5F  6E69  7365
0000343000  8200  6C0B  6E69  5F65  656C  676E  6874  0102
0000343020  0013  3079  8302  06AB  AC83  8206  5F07  696C
0000343040  656E  745F  0169  0007  837F  00C0  8583  0100
0000343060  0017  827F  7308  7274  6C5F  6E69  0065  0882
0000343100  7473  5F72  7461  7274  0104  0010  2079  8302
0000343120  06AE  AF83  8206  5F04  4353  6952  0701  7F00
0000343140  8583  8300  0085  0D01  7F00  0382  6F72  0077
0000343160  0382  6F63  026C  1201  7900  0220  B183  8306
0000343200  06B2  0682  635F  7275  745F  0169  0007  837F
0000343220  0085  8583  0100  000D  827F  7203  776F  8200
0000343240  6303  6C6F  0102  0011  3079  8303  06B4  B583
0000343260  8206  5F05  6D63  745F  0169  000A  837F  0085
0000343300  8583  8300  0085  1601  7F00  0682  7562  5F66
0000343320  6F6E  8200  7203  776F  8202  6303  6C6F  0104
0000343340  0015  8579  00F0  8309  06B8  B983  8206  5F07
0000343360  7562  6666  7265  0169  0007  737A  AA83  8206
0000343400  0100  001C  837F  00C0  A783  8306  06AD  B083
0000343420  8306  0085  B783  8306  0206  8583  8300  0081
0000343440  4F01  7F00  0482  616E  656D  8200  6C08  6E69
0000343460  5F65  7562  0466  0782  6373  5F72  7562  0866
0000343500  0682  7563  7372  726F  820C  6307  6168  676E
0000343520  6465  8210  6207  6675  705F  7274  8212  6604
0000343540  6C69  1665  0482  6973  657A  821A  6C04  636F
0000343560  1C6B  0701  7800  E085  832E  06B6  0701  7800
0000343600  2085  8304  0080  0101  8000  0101  8000  0101
0000343620  8000  0101  8000  0101  8000  0101  8000  0101
```

THU MAR 14 17:42:50 1991 MEDIT.DLL PAGE 94, LINE 5488

*

| | | | | | | | | |
|---|---|---|---|---|---|---|---|---|
| 0000344060 | 8000 | 0101 | 8000 | 0701 | 7F00 | C083 | 8300 | 0081 |
| 0000344100 | 0A01 | 7500 | 8380 | 0081 | 0273 | E883 | 0106 | 0005 |
| 0000344120 | 1078 | 8083 | 0100 | 000D | 837F | 0081 | C083 | 8300 |
| 0000344140 | 00C0 | C183 | 0100 | 000A | 8075 | 8183 | 7300 | 8304 |
| 0000344160 | 06EB | 0101 | 8000 | 0101 | 8000 | 0701 | 7800 | 9085 |
| 0000344200 | 8300 | 0080 | 0501 | 7800 | 8320 | 0080 | 0501 | 780P |
| 0000344220 | 8360 | 0082 | 0701 | 7800 | A885 | 8300 | 0080 | 0701 |
| 0000344240 | 7800 | D085 | 8300 | 0080 | 0A01 | 7500 | 8380 | 0081 |
| 0000344260 | 0064 | 0183 | 0102 | 0001 | 0180 | 0005 | 5878 | 8083 |
| 0000344300 | 0100 | 000A | 8075 | 8183 | 6400 | 8300 | 0201 | 0401 |
| 0000344320 | 7F00 | 8083 | 0100 | 000A | 8075 | 8183 | 7300 | 8301 |
| 0000344340 | 06F8 | 0701 | 7F00 | 8583 | 8300 | 0085 | 0A01 | 7500 |
| 0000344360 | 8380 | 0081 | 0273 | FA83 | 0106 | 0004 | 837F | 0081 |
| 0000344400 | 0A01 | 7500 | 8380 | 0081 | 0164 | FC83 | 0106 | 0004 |
| 0000344420 | 837F | 00C0 | 0A01 | 7500 | 8380 | 0085 | 0173 | FE83 |
| 0000344440 | 0106 | 0001 | 0180 | 0005 | 7878 | 8083 | 0100 | 000A |
| 0000344460 | 8075 | 8183 | 7300 | 8300 | 0201 | 0A01 | 7500 | 8380 |
| 0000344500 | 0085 | 0073 | 0183 | 0102 | 0004 | 837F | 0065 | 0A01 |
| 0000344520 | 7500 | 8380 | 0081 | 0173 | 0483 | 0107 | 000A | 8075 |
| 0000344540 | 8183 | 640C | 6300 | 0201 | 0401 | 7F00 | 8183 | 0100 |
| 0000344560 | 000A | 8075 | 8183 | 7300 | 8301 | 0707 | 0401 | 7F00 |
| 0000344600 | 8583 | 0100 | 000A | 8075 | 0083 | 6402 | 8301 | 0709 |
| 0000344620 | 0401 | 7F00 | 8583 | 0100 | 000A | 8075 | 8183 | 7300 |
| 0000344640 | 8301 | 070B | 0A01 | 7500 | 8380 | 0085 | 0073 | 0183 |
| 0000344660 | 0102 | 000A | 8075 | 8183 | 7300 | 8300 | 0201 | 0A01 |
| 0000344700 | 7500 | 8380 | 0081 | 0073 | 0183 | 0102 | 0004 | 837F |
| 0000344720 | 0085 | 0A01 | 7500 | 8380 | 0200 | 0164 | 1083 | 0107 |
| 0000344740 | 0004 | 837F | 04EA | 0A01 | 7500 | 8380 | 06A0 | 0173 |
| 0000344760 | 1283 | 0107 | 0004 | 837F | 04EA | 0A01 | 7500 | 8380 |
| 0000345000 | 06A0 | 0173 | 1483 | 0107 | 0004 | 837F | 0085 | 0A01 |
| 0000345020 | 7500 | 8380 | 0081 | 0173 | 1683 | 0107 | 000A | 8075 |
| 0000345040 | 0083 | 6402 | 8300 | 0201 | 0A01 | 7500 | 8380 | 0200 |
| 0000345060 | 0073 | 0183 | 0102 | 0005 | 6878 | 8083 | 0100 | 0004 |
| 0000345100 | 837F | 0081 | 0A01 | 7500 | 8380 | 0200 | 0173 | 1B83 |
| 0000345120 | 0107 | 0001 | 0180 | 0007 | 8578 | 00A0 | 8083 | 0100 |
| 0000345140 | 0007 | 8578 | 00C0 | 8083 | 0500 | 0111 | 0000 | 1500 |
| 0000345160 | 0001 | 5E00 | 9606 | 1600 | 8800 | 0000 | 0400 | 6506 |
| 0000345200 | 695F | 696E | 0A74 | 0A04 | C000 | 0400 | 6870 | 6261 |
| 0000345220 | 0411 | 0006 | 00C0 | 700B | 7768 | 646E | 665F | 6172 |
| 0000345240 | 656D | 0201 | 0116 | 0096 | 065F | 0033 | 0016 | 0027 |
| 0000345260 | 0000 | 0704 | 5F65 | 6C63 | 736F | 0165 | 1A02 | C901 |
| 0000345300 | 6000 | BB06 | 1002 | B000 | 0002 | 0400 | 630B | 6C6F |
| 0000345320 | 726F | 5F73 | 6E69 | 7469 | 040F | FFF2 | 00C0 | 6309 |
| 0000345340 | 6C6F | 726F | 735F | 7274 | 0408 | FFF8 | 0084 | 6302 |
| 0000345360 | 086F | F004 | 84FF | 0200 | 6762 | 0408 | FFFA | 0084 |
| 0000345400 | 6502 | 0A6D | EC04 | 84FF | 0400 | 6D65 | 6762 | 040B |
| 0000345420 | FFEE | 0084 | 6205 | 6F6C | 6B63 | 040D | FFF6 | 0084 |
| 0000345440 | 6207 | 6F6C | 6B63 | 6762 | 040A | FFEA | 0081 | 7304 |
| 0000345460 | 6174 | 0C74 | FC04 | 85FF | 0600 | 6D74 | 5F70 | 6D63 |
| 0000345500 | 0201 | 011E | 0384 | 0668 | 026E | 0010 | 0263 | 0000 |
| 0000345520 | 0F04 | 5F65 | 6F63 | 6F6C | 5F72 | 6F74 | 615F | 7474 |
| 0000345540 | 0B72 | 0604 | C000 | 0500 | 6F63 | 6F6C | 0A72 | 0A04 |
| 0000345560 | C400 | 0400 | 7461 | 7274 | 0201 | 0D05 | 0000 | 001A |
| 0000345600 | 050C | 08D4 | 0004 | 0085 | 6804 | 7076 | 1573 | 0A05 |
| 0000345620 | 0400 | C000 | 0D00 | 5F65 | 7768 | 646E | 635F | 696C |
| 0000345640 | 6E65 | 1474 | 1005 | 0400 | C000 | 0C00 | 5F65 | 7768 |
| 0000345660 | 646E | 665F | 6172 | 656D | 050F | 0141 | 0005 | 0084 |
| 0000345700 | 6507 | 5F6D | 7461 | 7274 | 0510 | 0143 | 0005 | 0084 |

THU MAR 14 17:42:50 1991 MEDIT.DLL PAGE 95, LINE 5547

| | | | | | | | | |
|---|---|---|---|---|---|---|---|---|
| 0000345720 | 6408 | 6665 | 615F | 7474 | 1072 | 4405 | 0501 | 8400 |
| 0000345740 | 0800 | 6573 | 5F74 | 7461 | 7274 | 0512 | 0146 | 0005 |
| 0000345760 | 0085 | 640A | 7369 | 6C70 | 7961 | 635F | 116D | 4805 |
| 0000346000 | 0501 | 3B00 | 0906 | 6976 | 5F6F | 6C62 | 6E61 | 0B6B |
| 0000346020 | 0005 | 0400 | C000 | 0300 | 6168 | 2162 | 7805 | 0406 |
| 0000346040 | 8500 | 1900 | 5F65 | 6E69 | 7469 | 6169 | 696C | 617A |
| 0000346060 | 6974 | 6E6F | 635F | 6D6F | 6C70 | 7465 | 1065 | 8005 |
| 0000346100 | 0408 | 5200 | 0806 | 7A73 | 745F | 7469 | 656C | 1105 |
| 0000346120 | 0001 | 0000 | 011A | 05F2 | 06AD | 0306 | 0010 | 02FB |
| 0000346140 | 0000 | 0B04 | 5F65 | 7661 | 6F69 | 695F | 696E | 0974 |
| 0000346160 | FC04 | 85FF | 0300 | 6572 | 0A73 | FA04 | 85FF | 0400 |
| 0000346200 | 7273 | 7365 | 0201 | 011D | 08F8 | 06AF | 0075 | 0010 |
| 0000346220 | 006A | 0000 | 0E04 | 5F65 | 7661 | 6F69 | 735F | 6174 |
| 0000346240 | 7472 | 7075 | 0410 | 0006 | 0085 | 660A | 614C | 6772 |
| 0000346260 | 4665 | 6E6F | 0F74 | EE04 | 11FF | 0902 | 6372 | 5F6C |
| 0000346300 | 7266 | 6D61 | 0165 | 1A02 | 6D01 | B109 | 8806 | 1000 |
| 0000346320 | 7D00 | 0000 | 0400 | 650B | 615F | 6976 | 5F6F | 6973 |
| 0000346340 | 657A | 040A | 0006 | 00C0 | 6804 | 6E77 | 0964 | 0A04 |
| 0000346360 | 8500 | 0300 | 736D | 0967 | 0C04 | C000 | 0300 | 706D |
| 0000346400 | 0931 | 1004 | C000 | 0300 | 706D | 0F32 | EE04 | 11FF |
| 0000346420 | 0902 | 6372 | 5F6C | 7266 | 6D61 | 0165 | 1B02 | F501 |
| 0000346440 | B309 | 3506 | 1000 | 2A00 | 0000 | 0400 | 650C | 615F |
| 0000346460 | 6976 | 5F6F | 6C63 | 736F | 0A65 | 0604 | 8500 | 0400 |
| 0000346500 | 7668 | 7370 | 0201 | 011B | 0A2A | 06B5 | 0064 | 0010 |
| 0000346520 | 0059 | 0000 | 0C04 | 5F65 | 7661 | 6F69 | 705F | 6961 |
| 0000346540 | 746E | 040A | 0006 | 00C0 | 6804 | 6E77 | 0B64 | 1805 |
| 0000346560 | 0513 | C000 | 0300 | 7068 | 0B73 | 0805 | 0513 | 1100 |
| 0000346600 | 0302 | 6372 | 016C | 1C02 | 8E01 | B70A | AB06 | 1000 |
| 0000346620 | A000 | 0000 | 0400 | 650D | 615F | 6976 | 5F6F | 696D |
| 0000346640 | 6D6E | 7861 | 040A | 0006 | 0325 | 7004 | 7773 | 0170 |
| 0000346660 | 2602 | 3901 | B90B | 0306 | 1001 | F800 | 0000 | 0400 |
| 0000346700 | 6517 | 615F | 6976 | 5F6F | 6461 | 756A | 7473 | 665F |
| 0000346720 | 6172 | 656D | 705F | 736F | 040A | 0006 | 0325 | 7004 |
| 0000346740 | 7773 | 0F70 | EE04 | 11FF | 0902 | 6372 | 5F6C | 7266 |
| 0000346760 | 6D61 | 0165 | 2102 | 3C01 | BB0C | 4506 | 1000 | 3A00 |
| 0000347000 | 0000 | 0400 | 6512 | 615F | 6976 | 5F6F | 7274 | 6361 |
| 0000347020 | 5F6B | 7266 | 6D61 | 0A65 | 0604 | C000 | 0400 | 7768 |
| 0000347040 | 646E | 0411 | 000A | 00C0 | 740B | 6172 | 6B63 | 665F |
| 0000347060 | 616C | 7367 | 0512 | 131C | 0005 | 03F5 | 740A | 6172 |
| 0000347100 | 6B63 | 695F | 666E | 016F | 2602 | 8101 | BD0C | BE06 |
| 0000347120 | 1000 | B300 | 0000 | 0400 | 6517 | 615F | 6976 | 5F6F |
| 0000347140 | 7571 | 7265 | 5F79 | 7274 | 6361 | 5F6B | 6E69 | 6F66 |
| 0000347160 | 0409 | 0006 | 03F9 | 7003 | 6974 | 040C | FFFC | 0085 |
| 0000347200 | 6606 | 6D5F | 766F | 0165 | 2402 | 3F01 | BF0D | A206 |
| 0000347220 | 1600 | 9400 | 0000 | 0400 | 6515 | 615F | 6976 | 5F6F |
| 0000347240 | 7266 | 6D61 | 5F65 | 6E77 | 5F64 | 7270 | 636F | 040A |
| 0000347260 | 0010 | 00C0 | 6804 | 6E77 | 0964 | 0E04 | 8500 | 0300 |
| 0000347300 | 736D | 0967 | 0A04 | C000 | 0300 | 706D | 0931 | 0604 |
| 0000347320 | C000 | 0300 | 706D | 0832 | FC04 | 85FF | 0200 | 6372 |
| 0000347340 | 0201 | 011F | 0DE1 | 06C1 | 018F | 0016 | 0181 | 0000 |
| 0000347360 | 1004 | 5F65 | 7661 | 6F69 | 665F | 6E6F | 5F74 | 6973 |
| 0000347400 | 657A | 0410 | 0006 | 0085 | 660A | 614C | 6772 | 4665 |
| 0000347420 | 6E6F | 0974 | EC04 | 1FFF | 0303 | 7773 | 0170 | 1802 |
| 0000347440 | 7001 | C30F | 4306 | 1005 | 3600 | 0005 | 0400 | 6109 |
| 0000347460 | 6976 | 5F6F | 6863 | 7261 | 040A | 0010 | 00C0 | 6804 |
| 0000347500 | 6E77 | 0964 | 0E04 | 8500 | 0300 | 736D | 0967 | 0A04 |
| 0000347520 | C000 | 0300 | 706D | 0931 | 0604 | C000 | 0300 | 706D |
| 0000347540 | 1032 | F804 | 85FF | 0A00 | 5066 | 6F72 | 6563 | 7373 |
| 0000347560 | 6465 | 0409 | FFFA | 0081 | 7203 | 7365 | 0407 | FFFC |

THU MAR 14 17:42:50 1991 MEDIT.DLL PAGE 96, LINE 5606

| | | | | | | | | |
|---|---|---|---|---|---|---|---|---|
| 0000347600 | 0085 | 6901 | 0513 | 014A | 0005 | 0085 | 660B | 6E49 |
| 0000347620 | 6573 | 7472 | 6F4D | 6564 | 0201 | 0125 | 14B3 | 06C6 |
| 0000347640 | 0B51 | 0016 | 0B43 | 0000 | 1604 | 5F65 | 7661 | 6F69 |
| 0000347660 | 635F | 696C | 6E65 | 5F74 | 6E77 | 5F64 | 7270 | 636F |
| 0000347700 | 040A | 0010 | 00C0 | 6804 | 6E77 | 0964 | 0E04 | 8500 |
| 0000347720 | 0300 | 736D | 0967 | 0A04 | C000 | 0300 | 706D | 0931 |
| 0000347740 | 0604 | C000 | 0300 | 706D | 1832 | 6A05 | 0513 | 8100 |
| 0000347760 | 1000 | 5F78 | 6877 | 6E65 | 625F | 7475 | 5F31 | 6F64 |
| 0000350000 | 6E77 | 0518 | 136C | 0005 | 0081 | 7910 | 775F | 6568 |
| 0000350020 | 5F6E | 7562 | 3174 | 645F | 776F | 1B6E | 7005 | 0513 |
| 0000350040 | 8100 | 1300 | 656C | 7466 | 775F | 6568 | 5F6E | 7562 |
| 0000350060 | 3174 | 645F | 776F | 1A6E | 6405 | 0513 | 8100 | 1200 |
| 0000350100 | 6F74 | 5F70 | 6877 | 6E65 | 625F | 7475 | 5F31 | 6F64 |
| 0000350120 | 6E77 | 0515 | 1362 | 0005 | 0081 | 740D | 6D69 | 7265 |
| 0000350140 | 565F | 6373 | 6F72 | 6C6C | 0515 | 1366 | 0005 | 0081 |
| 0000350160 | 740D | 6D69 | 7265 | 485F | 6373 | 6F72 | 6C6C | 0512 |
| 0000350200 | 1368 | 0005 | 0081 | 740A | 6D69 | 7265 | 6C5F | 6E69 |
| 0000350220 | 1165 | 6E05 | 0513 | 8100 | 0900 | 6974 | 656D | 5F72 |
| 0000350240 | 6F63 | 116C | D005 | 0501 | 8500 | 0900 | 6974 | 656D |
| 0000350260 | 5F72 | 6C66 | 1467 | CE05 | 0501 | 8500 | 0C00 | 4266 |
| 0000350300 | 7475 | 6F74 | 316E | 6F44 | 6E77 | 0005 | 1A26 | 02F5 |
| 0000350320 | 040A | FFFA | 0081 | 6C04 | 6E69 | 0965 | F804 | 81FF |
| 0000350340 | 0300 | 6F63 | 166C | FC04 | 81FF | 1000 | 6874 | 7369 |
| 0000350360 | 6C5F | 6E69 | 5F65 | 656C | 676E | 6874 | 0201 | 0201 |
| 0000350400 | 0512 | 08A4 | 0005 | 0085 | 650A | 6D5F | 7261 | 5F6B |
| 0000350420 | 6C66 | 0567 | 000D | 1A00 | 1200 | 7E05 | 0408 | 8500 |
| 0000350440 | 0A00 | 7563 | 5F72 | 7562 | 5F66 | 6F6E | 0511 | 009C |
| 0000350460 | 0004 | 067D | 6209 | 6675 | 745F | 6261 | 656C | 050D |
| 0000350500 | 01EA | 0005 | 0085 | 6505 | 745F | 6261 | 050F | 0004 |
| 0000350520 | 0004 | 0085 | 7807 | 7543 | 7372 | 726F | 050F | 0008 |
| 0000350540 | 0004 | 0085 | 7907 | 7543 | 7372 | 726F | 050B | 12FE |
| 0000350560 | 0005 | 00C0 | 6803 | 6364 | 0511 | 12FA | 0005 | 00C0 |
| 0000350600 | 6809 | 6E77 | 5F64 | 656D | 756E | 050C | 08D4 | 0004 |
| 0000350620 | 0085 | 6804 | 7076 | 1473 | F605 | 0512 | ED00 | 0C02 |
| 0000350640 | 6670 | 4F6E | 646C | 6C43 | 6569 | 746E | 0513 | 12DE |
| 0000350660 | 0005 | 02ED | 700B | 6E66 | 6C4F | 4664 | 6172 | 656D |
| 0000350700 | 0516 | 08D6 | 0004 | 00C0 | 650E | 685F | 6E77 | 5F64 |
| 0000350720 | 6F68 | 7A72 | 735F | 1062 | F205 | 0512 | 8200 | 0800 |
| 0000350740 | 536C | 616D | 6C6C | 7448 | 0516 | 08D0 | 0004 | 00C0 |
| 0000350760 | 650E | 685F | 6E77 | 5F64 | 6576 | 7472 | 735F | 1062 |
| 0000351000 | EE05 | 0512 | 8200 | 0800 | 536C | 616D | 6C6C | 6457 |
| 0000351020 | 0515 | 000A | 0004 | 00C0 | 650D | 685F | 6E77 | 5F64 |
| 0000351040 | 6C63 | 6569 | 746E | 0510 | 12EA | 0005 | 0082 | 6C08 |
| 0000351060 | 614C | 6772 | 4865 | 1474 | 1005 | 0400 | C000 | 0C00 |
| 0000351100 | 5F65 | 7768 | 646E | 665F | 6172 | 656D | 0510 | 12E6 |
| 0000351120 | 0005 | 0082 | 6C08 | 614C | 6772 | 5765 | 1364 | 0E05 |
| 0000351140 | 0400 | 8500 | 0B00 | 7863 | 775F | 6E69 | 735F | 7A69 |
| 0000351160 | 1265 | D605 | 0512 | 8200 | 0A00 | 7863 | 6F43 | 736E |
| 0000351200 | 6174 | 746E | 0513 | 0014 | 0004 | 0085 | 630B | 5F79 |
| 0000351220 | 6977 | 5F6E | 6973 | 657A | 0512 | 12DA | 0005 | 0082 |
| 0000351240 | 630A | 4379 | 6E6F | 7473 | 6E61 | 1274 | DC05 | 0408 |
| 0000351260 | 8500 | 0A00 | 7963 | 705F | 5F73 | 6973 | 657A | 0512 |
| 0000351300 | 08DA | 0004 | 0085 | 630A | 5F78 | 7370 | 735F | 7A69 |
| 0000351320 | 1265 | 0405 | 0513 | 8100 | 0A00 | 7863 | 614D | 4678 |
| 0000351340 | 6172 | 656D | 0512 | 1306 | 0005 | 0081 | 630A | 4D79 |
| 0000351360 | 7861 | 7246 | 6D61 | 1265 | 0605 | 0400 | 8100 | 0A00 |
| 0000351400 | 6863 | 7261 | 775F | 6469 | 6874 | 0513 | 08DE | 0004 |
| 0000351420 | 0081 | 630B | 6168 | 5F72 | 6568 | 6769 | 7468 | 0513 |
| 0000351440 | 12E2 | 0005 | 0081 | 630B | 4D78 | 7861 | 6C43 | 6569 |

THU MAR 14 17:42:50 1991 MEDIT.DLL PAGE 97, LINE 5665

| | | | | | | | | |
|---|---|---|---|---|---|---|---|---|
| 0000351460 | 746E | 0512 | 013E | 0005 | 0085 | 6F0A | 646C | 635F |
| 0000351500 | 5F6D | 6F72 | 1377 | E405 | 0512 | 8100 | 0B00 | 7963 |
| 0000351520 | 614D | 4378 | 696C | 6E65 | 0F74 | 4005 | 0501 | 8400 |
| 0000351540 | 0700 | 6D63 | 615F | 7474 | 1272 | 0205 | 0513 | 8500 |
| 0000351560 | 0A00 | 4366 | 6572 | 7461 | 6465 | 5350 | 050F | 0141 |
| 0000351600 | 0005 | 0084 | 6507 | 5F6D | 7461 | 7274 | 050A | 08E0 |
| 0000351620 | 0004 | 0676 | 6302 | 146D | 4205 | 0501 | 8400 | 0C00 |
| 0000351640 | 6D63 | 6C5F | 6E69 | 5F65 | 7461 | 7274 | 0510 | 0143 |
| 0000351660 | 0005 | 0084 | 6408 | 6665 | 615F | 7474 | 1072 | 4405 |
| 0000351700 | 0501 | 8400 | 0800 | 6573 | 5F74 | 7461 | 7274 | 0512 |
| 0000351720 | 0146 | 0005 | 0085 | 640A | 7369 | 6C70 | 7961 | 635F |
| 0000351740 | 116D | 4805 | 0501 | 8900 | 0906 | 6976 | 5F6F | 6C62 |
| 0000351760 | 6E61 | 0B6B | 0005 | 0400 | C000 | 0300 | 6168 | 0562 |
| 0000352000 | 0111 | 0000 | 1F00 | 0401 | 9520 | 1D08 | 1002 | 1200 |
| 0000352020 | 0002 | 0400 | 6510 | 625F | 5F75 | 7075 | 6164 | 6574 |
| 0000352040 | 6C5F | 6E69 | 0D65 | 0604 | C000 | 0700 | 7A73 | 6C5F |
| 0000352060 | 6E69 | 0D65 | 0A04 | 8100 | 0700 | 696C | 656E | 6E5F |
| 0000352100 | 076F | FA04 | 85FF | 0100 | 0E69 | FC04 | 85FF | 0800 |
| 0000352120 | 696C | 656E | 705F | 736F | 0409 | FFF6 | 00C0 | 7003 |
| 0000352140 | 6863 | 0201 | 0118 | 2221 | 0896 | 0194 | 0010 | 0189 |
| 0000352160 | 0000 | 0904 | 5F65 | 7562 | 695F | 696E | 0C74 | FA04 |
| 0000352200 | C0FF | 0600 | 5F5F | 7974 | 6570 | 040F | FFF2 | 0085 |
| 0000352220 | 5F09 | 625F | 5F78 | 7974 | 6570 | 040D | FFE2 | 069A |
| 0000352240 | 5F07 | 705F | 6972 | 746E | 040B | FFDA | 078C | 5F05 |
| 0000352260 | 6C5F | 6C76 | 040D | FFE6 | 089B | 5F07 | 635F | 6F6C |
| 0000352300 | 6B63 | 040D | FFF6 | 00C0 | 5F07 | 735F | 6174 | 6B63 |
| 0000352320 | 040E | FFE0 | 0081 | 5F08 | 725F | 7465 | 6176 | 0C6C |
| 0000352340 | F404 | 85FF | 0600 | 7562 | 5F66 | 6F6E | 050E | 027E |
| 0000352360 | 0005 | 0899 | 5F06 | 665F | 6E75 | 0163 | 1B02 | B501 |
| 0000352400 | 9E23 | 2008 | 1601 | 1200 | 0001 | 0400 | 650C | 625F |
| 0000352420 | 5F75 | 6964 | 7073 | 616C | 0B79 | 0604 | 8500 | 0500 |
| 0000352440 | 6E6F | 666F | 0C66 | FA04 | C0FF | 0600 | 5F5F | 7974 |
| 0000352460 | 6570 | 040F | FFF4 | 0085 | 5F09 | 625F | 5F78 | 7974 |
| 0000352500 | 6570 | 040D | FFE4 | 069A | 5F07 | 705F | 6972 | 746E |
| 0000352520 | 040B | FFDC | 078C | 5F05 | 6C5F | 6C76 | 040D | FFE8 |
| 0000352540 | 089B | 5F07 | 635F | 6F6C | 6B63 | 040D | FFF6 | 00C0 |
| 0000352560 | 5F07 | 735F | 6174 | 6B63 | 040E | FFE2 | 0081 | 5F08 |
| 0000352600 | 725F | 7465 | 6176 | 0E6C | 9005 | 0502 | 2700 | 0602 |
| 0000352620 | 5F5F | 7566 | 636E | 0201 | 0123 | 24D5 | 08A0 | 0133 |
| 0000352640 | 0016 | 0127 | 0000 | 1404 | 5F65 | 7562 | 675F | 7465 |
| 0000352660 | 645F | 7369 | 5F70 | 7473 | 7461 | 7375 | 040C | FFFA |
| 0000352700 | 00C0 | 5F06 | 745F | 7079 | 0F65 | F404 | 85FF | 0900 |
| 0000352720 | 5F5F | 7862 | 745F | 7079 | 0D65 | E404 | 9AFF | 0706 |
| 0000352740 | 5F5F | 7270 | 6E69 | 0B74 | DC04 | 8CFF | 0507 | 5F5F |
| 0000352760 | 766C | 0D6C | E804 | 9BFF | 0708 | 5F5F | 6C63 | 636F |
| 0000353000 | 0D6B | F604 | C0FF | 0700 | 5F5F | 7473 | 6361 | 0E6B |
| 0000353020 | E204 | 85FF | 0800 | 5F5F | 6572 | 7674 | 6C61 | 050E |
| 0000353040 | 02A8 | 0005 | 08A2 | 5F06 | 665F | 6E75 | 0163 | 1F02 |
| 0000353060 | 0801 | A426 | C208 | 1601 | B400 | 0001 | 0400 | 6510 |
| 0000353100 | 625F | 5F75 | 6E75 | 6C61 | 6F6C | 5F63 | 7562 | 0C66 |
| 0000353120 | 0604 | 8500 | 0600 | 7562 | 5F66 | 6F6E | 040C | FFFA |
| 0000353140 | 00C0 | 5F06 | 745F | 7079 | 0F65 | F404 | 85FF | 0900 |
| 0000353160 | 5F5F | 7862 | 745F | 7079 | 0D65 | E404 | 9AFF | 0706 |
| 0000353200 | 5F5F | 7270 | 6E69 | 0B74 | DC04 | 8CFF | 0507 | 5F5F |
| 0000353220 | 766C | 0D6C | E804 | 9BFF | 0708 | 5F5F | 6C63 | 636F |
| 0000353240 | 0D6B | F604 | C0FF | 0700 | 5F5F | 7473 | 6361 | 0E6B |
| 0000353260 | E204 | 81FF | 0800 | 5F5F | 6572 | 7674 | 6C61 | 050E |
| 0000353300 | 02C6 | 0005 | 08A6 | 5F06 | 665F | 6E75 | 0163 | 2002 |
| 0000353320 | CA01 | A727 | 7308 | 1601 | 6700 | 0001 | 0400 | 6511 |

THU MAR 14 17:42:50 1991 MEDIT.DLL PAGE 98, LINE 5724

| | | | | | | | | |
|---|---|---|---|---|---|---|---|---|
| 0000353340 | 625F | 5F75 | 6567 | 5F74 | 656E | 7478 | 625F | 6675 |
| 0000353360 | 040C | FFFA | 00C0 | 5F06 | 745F | 7079 | 0F65 | F204 |
| 0000353400 | 85FF | 0900 | 5F5F | 7862 | 745F | 7079 | 0D65 | E204 |
| 0000353420 | 9AFF | 0706 | 5F5F | 7270 | 6E69 | 0B74 | DA04 | 8CFF |
| 0000353440 | 0507 | 5F5F | 766C | 0D6C | E604 | 9BFF | 0708 | 5F5F |
| 0000353460 | 6C63 | 636F | 0D6B | F604 | C0FF | 0700 | 5F5F | 7473 |
| 0000353500 | 6361 | 0E6B | E004 | 85FF | 0800 | 5F5F | 6572 | 7674 |
| 0000353520 | 6C61 | 040C | FFF4 | 0085 | 6206 | 6675 | 6E5F | 0E6F |
| 0000353540 | E605 | 0502 | A900 | 0608 | 5F5F | 7566 | 636E | 0201 |
| 0000353560 | 0119 | 293D | 08AC | 056B | 0010 | 0560 | 0000 | 0A04 |
| 0000353600 | 7263 | 6165 | 6574 | 625F | 6675 | 040E | 0006 | 00C0 |
| 0000353620 | 6208 | 6675 | 6E5F | 6D61 | 0B65 | 0A04 | 1F00 | 0506 |
| 0000353640 | 6670 | 6C69 | 0D65 | 0E04 | C500 | 0700 | 7562 | 5F66 |
| 0000353660 | 656E | 1377 | 1204 | 8500 | 0D00 | 6863 | 6365 | 5F6B |
| 0000353700 | 6F64 | 6275 | 656C | 0C73 | FA04 | C0FF | 0600 | 5F5F |
| 0000353720 | 7974 | 6570 | 040F | FFF2 | 0085 | 5F09 | 625F | 5F78 |
| 0000353740 | 7974 | 6570 | 040D | FFE2 | 069A | 5F07 | 705F | 6972 |
| 0000353760 | 746E | 040B | FFDA | 078C | 5F05 | 6C5F | 6C76 | 040D |
| 0000354000 | FFE6 | 089B | 5F07 | 635F | 6F6C | 6B63 | 040D | FFF6 |
| 0000354020 | 00C0 | 5F07 | 735F | 6174 | 6B63 | 040E | FFE0 | 0081 |
| 0000354040 | 5F08 | 725F | 7465 | 6176 | 0C6C | F404 | 85FF | 0600 |
| 0000354060 | 7562 | 5F66 | 6F6E | 050E | 0300 | 0005 | 08AE | 5F06 |
| 0000354100 | 665F | 6E75 | 0163 | 1D02 | A801 | B02E | 1B08 | 1603 |
| 0000354120 | 0D00 | 0003 | 0400 | 650E | 625F | 5F75 | 6572 | 6461 |
| 0000354140 | 665F | 6C69 | 0C65 | 0604 | 8500 | 0600 | 7562 | 5F66 |
| 0000354160 | 6F6E | 040C | FFFA | 00C0 | 5F06 | 745F | 7079 | 0F65 |
| 0000354200 | 6E04 | 85FF | 0900 | 5F5F | 7862 | 745F | 7079 | 0D65 |
| 0000354220 | 5E04 | 9AFF | 0706 | 5F5F | 7270 | 6E69 | 0B74 | 5604 |
| 0000354240 | 8CFF | 0507 | 5F5F | 766C | 0D6C | 6204 | 9BFF | 0708 |
| 0000354260 | 5F5F | 6C63 | 636F | 0D6B | 7204 | C0FF | 0700 | 5F5F |
| 0000354300 | 7473 | 6361 | 0E6B | 5C04 | 81FF | 0800 | 5F5F | 6572 |
| 0000354320 | 7674 | 6C61 | 040D | FF76 | 0864 | 7307 | 5F7A | 696C |
| 0000354340 | 656E | 0409 | FF70 | 0085 | 7203 | 776F | 0411 | FF52 |
| 0000354360 | 0085 | 740B | 6D65 | 5F70 | 7562 | 5F66 | 6F6E | 040F |
| 0000354400 | FF54 | 0085 | 7309 | 7661 | 5F65 | 6964 | 7073 | 050E |
| 0000354420 | 0314 | 0005 | 08B2 | 5F06 | 665F | 6E75 | 0163 | 2102 |
| 0000354440 | C301 | B431 | BE08 | 1006 | B300 | 0006 | 0400 | 6E12 |
| 0000354460 | 7765 | 655F | 625F | 5F75 | 6572 | 6461 | 665F | 6C69 |
| 0000354500 | 0C65 | 0604 | 8500 | 0600 | 7562 | 5F66 | 6F6E | 040D |
| 0000354520 | FF76 | 0864 | 7307 | 5F7A | 696C | 656E | 0409 | FF6A |
| 0000354540 | 0085 | 7203 | 776F | 0411 | FF3E | 0085 | 740B | 6D65 |
| 0000354560 | 5F70 | 7562 | 5F66 | 6F6E | 040F | FF40 | 0085 | 7309 |
| 0000354600 | 7661 | 5F65 | 6964 | 7073 | 040D | FF6E | 00C0 | 7007 |
| 0000354620 | 745F | 6261 | 705F | 0410 | FF6C | 0081 | 740A | 6261 |
| 0000354640 | 655F | 7078 | 6E61 | 1164 | 5204 | 85FF | 0B00 | 6F6E |
| 0000354660 | 6F5F | 5F66 | 696C | 656E | 1273 | 5404 | 81FF | 0C00 |
| 0000354700 | 616D | 5F78 | 696C | 656E | 6C5F | 6E65 | 0409 | FF3C |
| 0000354720 | 0081 | 6C03 | 6E65 | 040B | FF4A | 0860 | 6205 | 6675 |
| 0000354740 | 705F | 0407 | FF68 | 0081 | 6901 | 0407 | FF64 | 0081 |
| 0000354760 | 6A01 | 0407 | FF56 | 0085 | 6B01 | 040C | FFFA | 00C0 |
| 0000355000 | 5F06 | 745F | 7079 | 0F65 | 6604 | 85FF | 0900 | 5F5F |
| 0000355020 | 7862 | 745F | 7079 | 0D65 | 4E04 | 9AFF | 0706 | 5F5F |
| 0000355040 | 7270 | 6E69 | 0B74 | 4204 | 8CFF | 0507 | 5F5F | 766C |
| 0000355060 | 0D6C | 5804 | 9BFF | 0708 | 5F5F | 6C63 | 636F | 0D6B |
| 0000355100 | 7204 | C0FF | 0700 | 5F5F | 7473 | 6361 | 0E6B | 4804 |
| 0000355120 | 81FF | 0800 | 5F5F | 6572 | 7674 | 6C61 | 050E | 032C |
| 0000355140 | 0005 | 08B6 | 5F06 | 665F | 6E75 | 0163 | 1F02 | 8101 |
| 0000355160 | B838 | AC08 | 1602 | 9E00 | 0002 | 0400 | 6510 | 625F |
| 0000355200 | 5F75 | 6573 | 5F74 | 7563 | 5F72 | 7562 | 0C66 | 0604 |

THU MAR 14 17:42:50 1991 MEDIT.DLL PAGE 99, LINE 5783

| | | | | | | | | |
|---|---|---|---|---|---|---|---|---|
| 0000355220 | 8500 | 0600 | 7562 | 5F66 | 6F6E | 040C | FFFA | 00C0 |
| 0000355240 | 5F06 | 745F | 7079 | 0F65 | EA04 | 85FF | 0900 | 5F5F |
| 0000355260 | 7862 | 745F | 7079 | 0D65 | DA04 | 9AFF | 0706 | 5F5F |
| 0000355300 | 7270 | 6E69 | 0B74 | D204 | 8CFF | 0507 | 5F5F | 766C |
| 0000355320 | 0D6C | DE04 | 9BFF | 0708 | 5F5F | 6C63 | 636F | 0D6B |
| 0000355340 | EC04 | C0FF | 0700 | 5F5F | 7473 | 6361 | 0E6B | D804 |
| 0000355360 | 81FF | 0800 | 5F5F | 6572 | 7674 | 6C61 | 0410 | FFF0 |
| 0000355400 | 0899 | 6C0A | 6E69 | 6365 | 746E | 735F | 0E74 | 4A05 |
| 0000355420 | 0503 | A600 | 0608 | 5F5F | 7566 | 636E | 0201 | 0121 |
| 0000355440 | 3B2D | 08BB | 01D8 | 0010 | 01CD | 0000 | 1204 | 5F65 |
| 0000355460 | 7562 | 675F | 7465 | 665F | 6C69 | 5F65 | 6164 | 6174 |
| 0000355500 | 0409 | 0006 | 0867 | 6203 | 6675 | 040C | 000A | 0085 |
| 0000355520 | 6206 | 6675 | 6E5F | 0C6F | FA04 | C0FF | 0600 | 5F5F |
| 0000355540 | 7974 | 6570 | 040F | FFF4 | 0085 | 5F09 | 625F | 5F78 |
| 0000355560 | 7974 | 6570 | 040D | FFE4 | 069A | 5F07 | 705F | 6972 |
| 0000355600 | 746E | 040B | FFDC | 078C | 5F05 | 6C5F | 6C76 | 040D |
| 0000355620 | FFE8 | 089B | 5F07 | 635F | 6F6C | 6B63 | 040D | FFF6 |
| 0000355640 | 00C0 | 5F07 | 735F | 6174 | 6B63 | 040E | FFE2 | 0081 |
| 0000355660 | 5F08 | 725F | 7465 | 6176 | 0E6C | 6405 | 0503 | B600 |
| 0000355700 | 0608 | 5F5F | 7566 | 636E | 0201 | 011F | 3D05 | 08BC |
| 0000355720 | 0153 | 0016 | 0147 | 0000 | 1004 | 5F65 | 7562 | 635F |
| 0000355740 | 756F | 746E | 6C5F | 6E69 | 7365 | 040B | FFDC | 078C |
| 0000355760 | 5F05 | 6C5F | 6C76 | 040D | FFE8 | 089B | 5F07 | 635F |
| 0000356000 | 6F6C | 6B63 | 040D | FFF6 | 00C0 | 5F07 | 735F | 6174 |
| 0000356020 | 6B63 | 040E | FFE2 | 0085 | 5F08 | 725F | 7465 | 6176 |
| 0000356040 | 0C6C | FA04 | C0FF | 0600 | 5F5F | 7974 | 6570 | 040F |
| 0000356060 | FFF4 | 0085 | 5F09 | 625F | 5F78 | 7974 | 6570 | 040D |
| 0000356100 | FFE4 | 069A | 5F07 | 705F | 6972 | 746E | 050E | 0386 |
| 0000356120 | 0005 | 08A6 | 5F06 | 665F | 6E75 | 0163 | 2002 | 5801 |
| 0000356140 | BE3E | F408 | 1601 | E600 | 0001 | 0400 | 6511 | 625F |
| 0000356160 | 5F75 | 6573 | 5F74 | 7562 | 5F66 | 616E | 656D | 040C |
| 0000356200 | 000A | 0085 | 6206 | 6675 | 6E5F | 0B6F | 0604 | C000 |
| 0000356220 | 0500 | 6E66 | 6D61 | 0C65 | FA04 | C0FF | 0600 | 5F5F |
| 0000356240 | 7974 | 6570 | 040F | FFF4 | 0085 | 5F09 | 625F | 5F78 |
| 0000356260 | 7974 | 6570 | 040D | FFE4 | 069A | 5F07 | 705F | 6972 |
| 0000356300 | 746E | 040B | FFDC | 078C | 5F05 | 6C5F | 6C76 | 040D |
| 0000356320 | FFE8 | 089B | 5F07 | 635F | 6F6C | 6B63 | 040D | FFF6 |
| 0000356340 | 00C0 | 5F07 | 735F | 6174 | 6B63 | 040E | FFE2 | 0081 |
| 0000356360 | 5F08 | 725F | 7465 | 6176 | 0E6C | A005 | 0503 | A900 |
| 0000356400 | 0608 | 5F5F | 7566 | 636E | 0201 | 0120 | 404C | 08C0 |
| 0000356420 | 0039 | 0016 | 002B | 0000 | 1104 | 5F65 | 7562 | 675F |
| 0000356440 | 7465 | 625F | 6675 | 6E5F | 6D61 | 0C65 | 0604 | 8500 |
| 0000356460 | 0600 | 7562 | 5F66 | 6F6E | 0201 | 011E | 4085 | 08C2 |
| 0000356500 | 02AF | 0016 | 02A1 | 0000 | 0F04 | 5F65 | 7562 | 675F |
| 0000356520 | 7465 | 625F | 6675 | 6E5F | 0A6F | 0A04 | C000 | 0400 |
| 0000356540 | 616E | 656D | 040D | 0006 | 00C5 | 6207 | 6675 | 6E5F |
| 0000356560 | 6D75 | 040C | FFFA | 00C0 | 5F06 | 745F | 7079 | 0F65 |
| 0000356600 | F204 | 85FF | 0900 | 5F5F | 7862 | 745F | 7079 | 0D65 |
| 0000356620 | E204 | 9AFF | 0706 | 5F5F | 7270 | 6E69 | 0B74 | DA04 |
| 0000356640 | 8CFF | 0507 | 5F5F | 766C | 0D6C | E604 | 9BFF | 0708 |
| 0000356660 | 5F5F | 6C63 | 636F | 0D6B | F604 | C0FF | 0700 | 5F5F |
| 0000356700 | 7473 | 6361 | 0E6B | E004 | 81FF | 0800 | 5F5F | 6572 |
| 0000356720 | 7674 | 6C61 | 040C | FFF4 | 0085 | 6206 | 6675 | 6E5F |
| 0000356740 | 0E6F | BA05 | 0503 | 5300 | 0605 | 5F5F | 7566 | 636E |
| 0000356760 | 0201 | 0127 | 4334 | 08C5 | 0312 | 0016 | 0304 | 0000 |
| 0000357000 | 1804 | 5F65 | 7562 | 675F | 7465 | 6F5F | 6570 | 5F6E |
| 0000357020 | 6574 | 7473 | 6E5F | 6D61 | 7365 | 040A | 000A | 00C5 |
| 0000357040 | 6204 | 6675 | 0A63 | 0604 | 1900 | 0408 | 7562 | 7666 |
| 0000357060 | 040C | FFFA | 00C0 | 5F06 | 745F | 7079 | 0F65 | F204 |

THU MAR 14 17:42:50 1991 MEDIT.DLL PAGE 100, LINE 5842

| | | | | | | | | |
|---|---|---|---|---|---|---|---|---|
| 0000357100 | 85FF | 0900 | 5F5F | 7862 | 745F | 7079 | 0D65 | E204 |
| 0000357120 | 9AFF | 0706 | 5F5F | 7270 | 6E69 | 0B74 | DA04 | 8CFF |
| 0000357140 | 0507 | 5F5F | 766C | 0D6C | E604 | 9BFF | 0708 | 5F5F |
| 0000357160 | 6C63 | 636F | 0D6B | F604 | C0FF | 0700 | 5F5F | 7473 |
| 0000357200 | 6361 | 0E6B | E004 | 81FF | 0800 | 5F5F | 6572 | 7674 |
| 0000357220 | 6C61 | 040C | FFF4 | 0085 | 6206 | 6675 | 6E5F | 0E6F |
| 0000357240 | D205 | 0503 | C700 | 0608 | 5F5F | 7566 | 636E | 0201 |
| 0000357260 | 0123 | 4646 | 08C9 | 0159 | 0016 | 014B | 0000 | 1404 |
| 0000357300 | 5F65 | 7562 | 665F | 6572 | 5F65 | 6574 | 7473 | 6E5F |
| 0000357320 | 6D61 | 7365 | 040A | 000A | 0085 | 6204 | 6675 | 0A63 |
| 0000357340 | 0604 | 4100 | 0405 | 7562 | 7666 | 040C | FFFA | 00C0 |
| 0000357360 | 5F06 | 745F | 7079 | 0F65 | F204 | 85FF | 0900 | 5F5F |
| 0000357400 | 7862 | 745F | 7079 | 0D65 | E204 | 9AFF | 0706 | 5F5F |
| 0000357420 | 7270 | 6E69 | 0B74 | DA04 | 8CFF | 0507 | 5F5F | 766C |
| 0000357440 | 0D6C | E604 | 9BFF | 0708 | 5F5F | 6C63 | 636F | 0D6B |
| 0000357460 | F604 | C0FF | 0700 | 5F5F | 7473 | 6361 | 0E6B | E004 |
| 0000357500 | 81FF | 0800 | 5F5F | 6572 | 7674 | 6C61 | 040C | FFF4 |
| 0000357520 | 0085 | 6206 | 6675 | 6E5F | 0E6F | F405 | 0503 | C700 |
| 0000357540 | 0608 | 5F5F | 7566 | 636E | 0201 | 011E | 479F | 08CB |
| 0000357560 | 03FC | 0016 | 03EE | 0000 | 0F04 | 5F65 | 7562 | 775F |
| 0000357600 | 6972 | 6574 | 665F | 6C69 | 0C65 | 0604 | 8500 | 0600 |
| 0000357620 | 7562 | 5F66 | 6F6E | 040C | FFFA | 00C0 | 5F06 | 745F |
| 0000357640 | 7079 | 0F65 | F204 | 85FF | 0900 | 5F5F | 7862 | 745F |
| 0000357660 | 7079 | 0D65 | E204 | 9AFF | 0706 | 5F5F | 7270 | 6E69 |
| 0000357700 | 0B74 | DA04 | 8CFF | 0507 | 5F5F | 766C | 0D6C | E604 |
| 0000357720 | 9BFF | 0708 | 5F5F | 6C63 | 636F | 0D6B | F604 | C0FF |
| 0000357740 | 0700 | 5F5F | 7473 | 6361 | 0E6B | E004 | 81FF | 0800 |
| 0000357760 | 5F5F | 6572 | 7674 | 6C61 | 0407 | FFF4 | 0085 | 6901 |
| 0000360000 | 050E | 041C | 0005 | 0553 | 5F06 | 665F | 6E75 | 0163 |
| 0000360020 | 1E02 | 9B01 | CE4B | AF08 | 1605 | A100 | 0005 | 0400 |
| 0000360040 | 650F | 625F | 5F75 | 706F | 6E65 | 5F72 | 6966 | 656C |
| 0000360060 | 040F | 000E | 00C0 | 7409 | 7365 | 5F74 | 616E | 656D |
| 0000360100 | 040D | 000A | 0086 | 7407 | 7365 | 5F74 | 6469 | 040D |
| 0000360120 | 0006 | 00C5 | 6207 | 6675 | 6E5F | 6D75 | 040C | FFF6 |
| 0000360140 | 00C0 | 5F06 | 745F | 7079 | 0F65 | EA04 | 85FF | 0900 |
| 0000360160 | 5F5F | 7862 | 745F | 7079 | 0D65 | D804 | 9AFF | 0706 |
| 0000360200 | 5F5F | 7270 | 6E69 | 0B74 | CE04 | 8CFF | 0507 | 5F5F |
| 0000360220 | 766C | 0D6C | DC04 | 9BFF | 0708 | 5F5F | 6C63 | 636F |
| 0000360240 | 0D6B | EE04 | C0FF | 0700 | 5F5F | 7473 | 6361 | 0E6B |
| 0000360260 | D404 | 81FF | 0800 | 5F5F | 6572 | 7674 | 6C61 | 040C |
| 0000360300 | FFEC | 0085 | 6206 | 6675 | 6E5F | 096F | E804 | 81FF |
| 0000360320 | 0300 | 6572 | 0873 | F204 | 1FFF | 0206 | 6E66 | 040A |
| 0000360340 | FFD6 | 0081 | 7304 | 6174 | 0F74 | FA04 | C0FF | 0900 |
| 0000360360 | 6966 | 656C | 6E5F | 6D61 | 0E65 | 3605 | 0504 | 5300 |
| 0000360400 | 0605 | 5F5F | 7566 | 636E | 0201 | 011E | 514A | 08D0 |
| 0000360420 | 0408 | 0016 | 03FA | 0000 | 0F04 | 5F65 | 7562 | 6F5F |
| 0000360440 | 6570 | 776E | 665F | 6C69 | 0F65 | 0E04 | C000 | 0900 |
| 0000360460 | 6574 | 7473 | 6E5F | 6D61 | 0D65 | 0A04 | 8600 | 0700 |
| 0000360500 | 6574 | 7473 | 695F | 0D64 | 0604 | C500 | 0700 | 7562 |
| 0000360520 | 5F66 | 756E | 0C6D | F604 | C0FF | 0600 | 5F5F | 7974 |
| 0000360540 | 6570 | 040F | FFEA | 0085 | 5F09 | 625F | 5F78 | 7974 |
| 0000360560 | 6570 | 040D | FFD8 | 069A | 5F07 | 705F | 6972 | 746E |
| 0000360600 | 040B | FFCE | 078C | 5F05 | 6C5F | 6C76 | 040D | FFDC |
| 0000360620 | 089B | 5F07 | 635F | 6F6C | 6B63 | 040D | FFEE | 00C0 |
| 0000360640 | 5F07 | 735F | 6174 | 6B63 | 040E | FFD4 | 0081 | 5F08 |
| 0000360660 | 725F | 7465 | 6176 | 0C6C | EC04 | 85FF | 0600 | 7562 |
| 0000360700 | 5F66 | 6F6E | 0409 | FFE8 | 0081 | 7203 | 7365 | 040F |
| 0000360720 | FFFA | 00C0 | 6609 | 6C69 | 5F65 | 616E | 656D | 0408 |
| 0000360740 | FFF2 | 061F | 6602 | 0A6E | D604 | 81FF | 0400 | 7473 |

THU MAR 14 17:42:50 1991 MEDIT.DLL PAGE 101, LINE 5901

| | | | | | | | | |
|---|---|---|---|---|---|---|---|---|
| 0000360760 | 7461 | 050E | 0450 | 0005 | 0553 | 5F06 | 665F | 6E75 |
| 0000361000 | 0163 | 1E02 | 5201 | D255 | 8708 | 1602 | 7900 | 0002 |
| 0000361020 | 0400 | 650F | 625F | 5F75 | 6C63 | 736F | 5F65 | 6966 |
| 0000361040 | 656C | 040C | 0006 | 0085 | 6206 | 6675 | 6E5F | 0C6F |
| 0000361060 | FA04 | C0FF | 0600 | 5F5F | 7974 | 6570 | 040F | FFF4 |
| 0000361100 | 0085 | 5F09 | 625F | 5F78 | 7974 | 6570 | 040D | FFE2 |
| 0000361120 | 069A | 5F07 | 705F | 6972 | 746E | 040B | FFDA | 078C |
| 0000361140 | 5F05 | 6C5F | 6C76 | 040D | FFE6 | 089B | 5F07 | 635F |
| 0000361160 | 6F6C | 6B63 | 040D | FFF6 | 00C0 | 5F07 | 735F | 6174 |
| 0000361200 | 6B63 | 040E | FFE0 | 0081 | 5F08 | 725F | 7465 | 6176 |
| 0000361220 | 096C | F204 | 81FF | 0300 | 6572 | 0E73 | 6805 | 0504 |
| 0000361240 | 5300 | 0605 | 5F5F | 7566 | 636E | 0201 | 011F | 57D9 |
| 0000361260 | 08D4 | 0157 | [illegible] | 014C | 0000 | 1004 | 7562 | 695F |
| 0000361300 | 696E | 5F74 | 6465 | 7469 | 625F | 6675 | 040A | 0006 |
| 0000361320 | 0085 | 6C04 | 6E69 | 0C65 | FA04 | C0FF | 0600 | 5F5F |
| 0000361340 | 7974 | 6570 | 040F | FFF4 | 0085 | 5F09 | 625F | 5F78 |
| 0000361360 | 7974 | 6570 | 040D | FFE0 | 069A | 5F07 | 705F | 6972 |
| 0000361400 | 746E | 040B | FFD8 | 078C | 5F05 | 6C5F | 6C76 | 040D |
| 0000361420 | FFE8 | 089B | 5F07 | 635F | 6F6C | 6B63 | 040D | FFF6 |
| 0000361440 | 00C0 | 5F07 | 735F | 6174 | 6B63 | 040E | FFDE | 0081 |
| 0000361460 | 5F08 | 725F | 7465 | 6176 | 096C | E404 | C0FF | 0300 |
| 0000361500 | 6370 | 0E68 | 8005 | 0504 | A600 | 0608 | 5F5F | 7566 |
| 0000361520 | 636E | 0201 | 011F | 5930 | 08D6 | 01D7 | 0016 | 01C9 |
| 0000361540 | 0000 | 1004 | 5F65 | 7562 | 695F | 736E | 7265 | 5F74 |
| 0000361560 | 6863 | 7261 | 0408 | 000A | 0080 | 6302 | 0A6B | 0804 |
| 0000361600 | 8500 | 0400 | 696C | 656E | 040C | 0006 | 0085 | 6F06 |
| 0000361620 | 6666 | 6573 | 0974 | F604 | C0FF | 0300 | 6370 | 0D68 |
| 0000361640 | FC04 | 81FF | 0700 | 7563 | 5F72 | 656C | 076E | FA04 |
| 0000361660 | 81FF | 0100 | 0169 | 2802 | 0701 | D95B | 7408 | 1601 |
| 0000361700 | 6600 | 0001 | 0400 | 6519 | 625F | 5F75 | 6E69 | 6573 |
| 0000361720 | 7472 | 635F | 6168 | 5F72 | 7461 | 705F | 696F | 746E |
| 0000361740 | 0407 | 0006 | 0080 | 6301 | 040C | FFFA | 00C0 | 5F06 |
| 0000361760 | 745F | 7079 | 0F65 | F404 | 85FF | 0900 | 5F5F | 7862 |
| 0000362000 | 745F | 7079 | 0D65 | E404 | 9AFF | 0706 | 5F5F | 7270 |
| 0000362020 | 6E69 | 0B74 | DC04 | 8CFF | 0507 | 5F5F | 766C | 0D6C |
| 0000362040 | E804 | 9BFF | 0708 | 5F5F | 6C63 | 636F | 0D6B | F604 |
| 0000362060 | C0FF | 0700 | 5F5F | 7473 | 6361 | 0E6B | E204 | 81FF |
| 0000362100 | 0800 | 5F5F | 6572 | 7674 | 6C61 | 050E | 04F0 | 0005 |
| 0000362120 | 08DB | 5F06 | 665F | 6E75 | 0163 | 2402 | 7B01 | DD5C |
| 0000362140 | 1908 | 1602 | 0B00 | 0002 | 0400 | 6515 | 625F | 5F75 |
| 0000362160 | 6E69 | 5F73 | 7473 | 5F72 | 7461 | 705F | 696F | 746E |
| 0000362200 | 0409 | 0006 | 00C0 | 7303 | 7274 | 040C | FFFA | 00C0 |
| 0000362220 | 5F06 | 745F | 7079 | 0F65 | F204 | 85FF | 0900 | 5F5F |
| 0000362240 | 7862 | 745F | 7079 | 0D65 | DA04 | 9AFF | 0706 | 5F5F |
| 0000362260 | 7270 | 6E69 | 0B74 | D204 | 8CFF | 0507 | 5F5F | 766C |
| 0000362300 | 0D6C | E404 | 9BFF | 0708 | 5F5F | 6C63 | 636F | 0D6B |
| 0000362320 | F604 | C0FF | 0700 | 5F5F | 7473 | 6361 | 0E6B | D804 |
| 0000362340 | 81FF | 0800 | 5F5F | 6572 | 7674 | 6C61 | 0414 | FFDE |
| 0000362360 | 0085 | 790E | 7543 | 7372 | 726F | 625F | 746F | 6F74 |
| 0000362400 | 076D | F004 | 85FF | 0100 | 076A | F404 | 85FF | 0100 |
| 0000362420 | 0869 | E004 | C0FF | 0200 | 6863 | 050E | 0512 | 0005 |
| 0000362440 | 08DF | 5F06 | 665F | 6E75 | 0163 | 1F02 | 9401 | E15E |
| 0000362460 | C808 | 1002 | BD00 | 0002 | 0400 | 6510 | 625F | 5F75 |
| 0000362500 | 7075 | 6164 | 6574 | 635F | 6168 | 0872 | 0604 | 8000 |
| 0000362520 | 0200 | 6863 | 040A | 0008 | 0085 | 6C04 | 6E69 | 0C65 |
| 0000362540 | 0A04 | 8500 | 0600 | 666F | 7366 | 7465 | 040C | FFFA |
| 0000362560 | 00C0 | 5F06 | 745F | 7079 | 0F65 | F204 | 85FF | 0900 |
| 0000362600 | 5F5F | 7862 | 745F | 7079 | 0D65 | E204 | 9AFF | 0706 |
| 0000362620 | 5F5F | 7270 | 6E69 | 0B74 | DA04 | 8CFF | 0507 | 5F5F |

THU MAR 14 17:42:50 1991 MEDIT.DLL PAGE 102, LINE 5960

| | | | | | | | | |
|---|---|---|---|---|---|---|---|---|
| 0000362640 | 766C | 0D6C | E604 | 9BFF | 0708 | 5F5F | 6C63 | 636F |
| 0000362660 | 0D6B | F604 | C0FF | 0700 | 5F5F | 7473 | 6361 | 0E6B |
| 0000362700 | E004 | 81FF | 0800 | 5F5F | 6572 | 7674 | 6C61 | 0407 |
| 0000362720 | FFF4 | 0085 | 6901 | 050E | 0586 | 0005 | 08B2 | 5F06 |
| 0000362740 | 665F | 6E75 | 0163 | 1C02 | 5C01 | E361 | F308 | 1002 |
| 0000362760 | E800 | 0002 | 0400 | 620D | 5F75 | 7073 | 696C | 5F74 |
| 0000363000 | 696C | 656E | 0409 | 0006 | 00C0 | 7303 | 7274 | 040A |
| 0000363020 | 000A | 0081 | 6C04 | 6E69 | 0B65 | 0C04 | 8100 | 0500 |
| 0000363040 | 666F | 7366 | 0C74 | FA04 | C0FF | 0600 | 5F5F | 7974 |
| 0000363060 | 6570 | 040F | FFF4 | 0085 | 5F09 | 625F | 5F78 | 7974 |
| 0000363100 | 6570 | 040D | FFE2 | 069A | 5F07 | 705F | 6972 | 746E |
| 0000363120 | 040B | FFDA | 078C | 5F05 | 6C5F | 6C76 | 040D | FFE8 |
| 0000363140 | 089B | 5F07 | 635F | 6F6C | 6B63 | 040D | FFF6 | 00C0 |
| 0000363160 | 5F07 | 735F | 6174 | 6B63 | 040E | FFE0 | 0081 | 5F08 |
| 0000363200 | 725F | 7465 | 6176 | 086C | E604 | 80FF | 0200 | 6863 |
| 0000363220 | 050E | 05CC | 0005 | 08E5 | 5F06 | 665F | 6E75 | 0163 |
| 0000363240 | 1C02 | 4F01 | E764 | 3408 | 1002 | 2900 | 0002 | 0400 |
| 0000363260 | 620D | 5F75 | 6E75 | 6F69 | 5F6E | 696C | 656E | 040C |
| 0000363300 | FFFA | 00C0 | 5F06 | 745F | 7079 | 0F65 | F204 | 85FF |
| 0000363320 | 0900 | 5F5F | 7862 | 745F | 7079 | 0D65 | DE04 | 9AFF |
| 0000363340 | 0706 | 5F5F | 7270 | 6E69 | 0B74 | D604 | 8CFF | 0507 |
| 0000363360 | 5F5F | 766C | 0D6C | E604 | 9BFF | 0708 | 5F5F | 6C63 |
| 0000363400 | 636F | 0D6B | F604 | C0FF | 0700 | 5F5F | 7473 | 6361 |
| 0000363420 | 0E6B | DC04 | 81FF | 0800 | 5F5F | 6572 | 7674 | 6C61 |
| 0000363440 | 0409 | FFE2 | 00C0 | 7003 | 6863 | 0411 | FFF4 | 0081 |
| 0000363460 | 6C0B | 6E69 | 5F65 | 656C | 676E | 6874 | 050E | 05E2 |
| 0000363500 | 0005 | 08E5 | 5F06 | 665F | 6E75 | 0163 | 1C02 | 8301 |
| 0000363520 | E966 | 7708 | 1600 | 6900 | 0000 | 0400 | 650D | 625F |
| 0000363540 | 5F75 | 6567 | 5F74 | 696C | 656E | 040A | 0008 | 0085 |
| 0000363560 | 6C04 | 6E69 | 0C65 | 0604 | 8500 | 0600 | 7562 | 5F66 |
| 0000363600 | 6F6E | 0201 | 0123 | 66FA | 08EA | 00A7 | 0016 | 009B |
| 0000363620 | 0000 | 1404 | 5F65 | 7562 | 635F | 6F6C | 6573 | 6C5F |
| 0000363640 | 7361 | 5F74 | 696C | 656E | 040F | FFFA | 00C0 | 6C09 |
| 0000363660 | 7361 | 5F74 | 696C | 656E | 0201 | 011C | 67A1 | 08EC |
| 0000363700 | 051C | 0010 | 0511 | 0000 | 0D04 | 5F65 | 7562 | 615F |
| 0000363720 | 6464 | 6C5F | 6E69 | 0965 | 0604 | 8500 | 0300 | 6F70 |
| 0000363740 | 0C73 | FA04 | C0FF | 0600 | 5F5F | 7974 | 6570 | 040F |
| 0000363760 | FFE2 | 0085 | 5F09 | 625F | 5F78 | 7974 | 6570 | 040D |
| 0000364000 | FFD2 | 069A | 5F07 | 705F | 6972 | 746E | 040B | FFCA |
| 0000364020 | 078C | 5F05 | 6C5F | 6C76 | 040D | FFD6 | 089B | 5F07 |
| 0000364040 | 635F | 6F6C | 6B63 | 040D | FFEA | 00C0 | 5F07 | 735F |
| 0000364060 | 6174 | 6B63 | 040E | FFD0 | 0081 | 5F08 | 725F | 7465 |
| 0000364100 | 6176 | 076C | EE04 | 85FF | 0100 | 0773 | E404 | 85FF |
| 0000364120 | 0100 | 0969 | E604 | 60FF | 0308 | 7470 | 1072 | F004 |
| 0000364140 | 99FF | 0A08 | 696C | 656E | 6E63 | 5F74 | 7473 | 050E |
| 0000364160 | 0600 | 0005 | 08E5 | 5F06 | 665F | 6E75 | 0163 | 1F02 |
| 0000364200 | BD01 | EE6C | 9108 | 1603 | 8300 | 0003 | 0400 | 6510 |
| 0000364220 | 625F | 5F75 | 6564 | 656C | 6574 | 6C5F | 6E69 | 0A65 |
| 0000364240 | 0604 | 8500 | 0400 | 696C | 656E | 040C | FFFA | 00C0 |
| 0000364260 | 5F06 | 745F | 7079 | 0F65 | E804 | 85FF | 0900 | 5F5F |
| 0000364300 | 7862 | 745F | 7079 | 0D65 | D804 | 9AFF | 0706 | 5F5F |
| 0000364320 | 7270 | 6E69 | 0B74 | D004 | 8CFF | 0507 | 5F5F | 766C |
| 0000364340 | 0D6C | DC04 | 9BFF | 0708 | 5F5F | 6C63 | 636F | 0D6B |
| 0000364360 | EA04 | C0FF | 0700 | 5F5F | 7473 | 6361 | 0E6B | D604 |
| 0000364400 | 81FF | 0800 | 5F5F | 6572 | 7674 | 6C61 | 0407 | FFEE |
| 0000364420 | 0085 | 7301 | 0410 | FFF0 | 0899 | 6C0A | 6E69 | 6365 |
| 0000364440 | 746E | 735F | 0E74 | 1A05 | 0506 | B200 | 0608 | 5F5F |
| 0000364460 | 7566 | 636E | 0201 | 0122 | 704E | 08F0 | 01D7 | 0016 |
| 0000364500 | 01C9 | 0000 | 1304 | 5F65 | 7562 | 695F | 5F73 | 7562 |

THU MAR 14 17:42:50 1991 MEDIT.DLL PAGE 103, LINE 6019

| | | | | | | | | |
|---|---|---|---|---|---|---|---|---|
| 0000364520 | 5F66 | 6863 | 6E61 | 6567 | 0C64 | 0604 | 8500 | 0600 |
| 0000364540 | 7562 | 5F66 | 6F6E | 040C | FFFA | 00C0 | 5F06 | 745F |
| 0000364560 | 7079 | 0F65 | F404 | 85FF | 0900 | 5F5F | 7862 | 745F |
| 0000364600 | 7079 | 0D65 | E404 | 9AFF | 0706 | 5F5F | 7270 | 6E69 |
| 0000364620 | 0B74 | DC04 | 8CFF | 0507 | 5F5F | 766C | 0D6C | E804 |
| 0000364640 | 9BFF | 0708 | 5F5F | 6C63 | 636F | 0D6B | F604 | C0FF |
| 0000364660 | 0700 | 5F5F | 7473 | 6361 | 0E6B | E204 | 81FF | 0800 |
| 0000364700 | 5F5F | 6572 | 7674 | 6C61 | 050E | 0632 | 0005 | 08B2 |
| 0000364720 | 5F06 | 665F | 6E75 | 0163 | 1A02 | 2501 | F272 | 3A08 |
| 0000364740 | 1001 | 2F00 | 0001 | 0400 | 620B | 6675 | 755F | 6470 |
| 0000364760 | 7461 | 6465 | 040C | 0006 | 0085 | 6206 | 6675 | 6E5F |
| 0000365000 | 0C6F | FA04 | C0FF | 0600 | 5F5F | 7974 | 6570 | 040F |
| 0000365020 | FFF4 | 0085 | 5F09 | 625F | 5F78 | 7974 | 6570 | 040D |
| 0000365040 | FFE4 | 069A | 5F07 | 705F | 6972 | 746E | 040B | FFDC |
| 0000365060 | 078C | 5F05 | 6C5F | 6C76 | 040D | FFE8 | 089B | 5F07 |
| 0000365100 | 635F | 6F6C | 6B63 | 040D | FFF6 | 00C0 | 5F07 | 735F |
| 0000365120 | 6174 | 6B63 | 040E | FFE2 | 0081 | 5F08 | 725F | 7465 |
| 0000365140 | 6176 | 0E6C | 4A05 | 0506 | 5B00 | 0602 | 5F5F | 7566 |
| 0000365160 | 636E | 0201 | 0129 | 735F | 08F5 | 007B | 0016 | 006D |
| 0000365200 | 0000 | 1A04 | 5F65 | 7562 | 675F | 7465 | 6E5F | 7865 |
| 0000365220 | 5F74 | 6F6D | 6964 | 6966 | 6465 | 625F | 6675 | 040E |
| 0000365240 | 0006 | 00C5 | 6208 | 6675 | 6E5F | 5F6F | 0C70 | FC04 |
| 0000365260 | 85FF | 0600 | 7562 | 5F66 | 6F6E | 0201 | 0119 | 73DA |
| 0000365300 | 08F7 | 032C | 0016 | 031E | 0000 | 0A04 | 5F65 | 7562 |
| 0000365320 | 675F | 7465 | 6863 | 0409 | 000C | 0085 | 7203 | 776F |
| 0000365340 | 0409 | 000A | 0085 | 6303 | 6C6F | 0408 | 0006 | 00C0 |
| 0000365360 | 6302 | 0C68 | FA04 | C0FF | 0600 | 5F5F | 7974 | 6570 |
| 0000365400 | 040F | FFF4 | 0085 | 5F09 | 625F | 5F78 | 7974 | 6570 |
| 0000365420 | 040D | FFE4 | 069A | 5F07 | 705F | 6972 | 746E | 040B |
| 0000365440 | FFDC | 078C | 5F05 | 6C5F | 6C76 | 040D | FFE8 | 089B |
| 0000365460 | 5F07 | 635F | 6F6C | 6B63 | 040D | FFF6 | 00C0 | 5F07 |
| 0000365500 | 735F | 6174 | 6B63 | 040E | FFE2 | 0081 | 5F08 | 725F |
| 0000365520 | 7465 | 6176 | 0E6C | 6A05 | 0506 | F900 | 0608 | 5F5F |
| 0000365540 | 7566 | 636E | 0201 | 011A | 7706 | 08FB | 02FF | 0016 |
| 0000365560 | 02F1 | 0000 | 0B04 | 5F65 | 7562 | 705F | 7475 | 7473 |
| 0000365600 | 0972 | 0C04 | 8100 | 0300 | 6F72 | 0977 | 0A04 | 8100 |
| 0000365620 | 0300 | 6F63 | 096C | 0604 | C000 | 0300 | 7473 | 0C72 |
| 0000365640 | FA04 | C0FF | 0600 | 5F5F | 7974 | 6570 | 040F | FFF4 |
| 0000365660 | 0085 | 5F09 | 625F | 5F78 | 7974 | 6570 | 040D | FFE4 |
| 0000365700 | 069A | 5F07 | 705F | 6972 | 746E | 040B | FFDC | 078C |
| 0000365720 | 5F05 | 6C5F | 6C76 | 040D | FFE8 | 089B | 5F07 | 635F |
| 0000365740 | 6F6C | 6B63 | 040D | FFF6 | 00C0 | 5F07 | 735F | 6174 |
| 0000365760 | 6B63 | 040E | FFE2 | 0081 | 5F08 | 725F | 7465 | 6176 |
| 0000366000 | 0E6C | 8805 | 0506 | 9900 | 0608 | 5F5F | 7566 | 636E |
| 0000366020 | 0201 | 011B | 7A05 | 08FD | 029D | 0016 | 028F | 0000 |
| 0000366040 | 0C04 | 5F65 | 7562 | 695F | 736E | 735F | 7274 | 0409 |
| 0000366060 | 000C | 0081 | 7203 | 776F | 0409 | 000A | 0081 | 6303 |
| 0000366100 | 6C6F | 0409 | 0006 | 00C0 | 7303 | 7274 | 040D | FFF6 |
| 0000366120 | 00C0 | 5F07 | 735F | 6174 | 6B63 | 040E | FFE0 | 0081 |
| 0000366140 | 5F08 | 725F | 7465 | 6176 | 136C | F404 | 85FF | 0D00 |
| 0000366160 | 6C6F | 5F64 | 6964 | 7073 | 665F | 616C | 0C67 | FA04 |
| 0000366200 | C0FF | 0600 | 5F5F | 7974 | 6570 | 040F | FFF2 | 0085 |
| 0000366220 | 5F09 | 625F | 5F78 | 7974 | 6570 | 040D | FFE2 | 069A |
| 0000366240 | 5F07 | 705F | 6972 | 746E | 040B | FFDA | 078C | 5F05 |
| 0000366260 | 6C5F | 6C76 | 040D | FFE6 | 089B | 5F07 | 635F | 6F6C |
| 0000366300 | 6B63 | 050E | 069A | 0005 | 08AE | 5F06 | 665F | 6E75 |
| 0000366320 | 0163 | 1C02 | A201 | FF7C | 4908 | 1602 | 3B00 | 0002 |
| 0000366340 | 0400 | 650D | 625F | 6675 | 755F | 676E | 7465 | 6863 |
| 0000366360 | 0409 | 000E | 00C1 | 7203 | 776F | 0409 | 000A | 00C1 |

THU MAR 14 17:42:50 1991 MEDIT.DLL PAGE 104, LINE 6078

| | | | | | | | | |
|---|---|---|---|---|---|---|---|---|
| 0000366400 | 6303 | 6C6F | 0408 | 0006 | 00C0 | 6302 | 0C68 | FA04 |
| 0000366420 | C0FF | 0600 | 5F5F | 7974 | 6570 | 040F | FFF4 | 0085 |
| 0000366440 | 5F09 | 625F | 5F78 | 7974 | 6570 | 040D | FFE4 | 069A |
| 0000366460 | 5F07 | 705F | 6972 | 746E | 040B | FFDC | 078C | 5F05 |
| 0000366500 | 6C5F | 6C76 | 040D | FFE8 | 089B | 5F07 | 635F | 6F6C |
| 0000366520 | 6B63 | 040D | FFF6 | 00C0 | 5F07 | 735F | 6174 | 6B63 |
| 0000366540 | 040E | FFE2 | 0081 | 5F08 | 725F | 7465 | 6176 | 0E6C |
| 0000366560 | AE05 | 0506 | AE00 | 0608 | 5F5F | 7566 | 636E | 0201 |
| 0000366600 | 011B | 7EEB | 0901 | 03B3 | 0016 | 03A5 | 0000 | 0C04 |
| 0000366620 | 5F65 | 7562 | 645F | 6C65 | 735F | 7274 | 040A | 000A |
| 0000366640 | 0081 | 6C04 | 6E69 | 0C65 | 0804 | 8100 | 0600 | 666F |
| 0000366660 | 7366 | 7465 | 040C | 0006 | 0081 | 6C06 | 6E65 | 7467 |
| 0000366700 | 0F68 | F004 | 85FF | 0900 | 5F5F | 7862 | 745F | 7079 |
| 0000366720 | 0D65 | E004 | 9AFF | 0706 | 5F5F | 7270 | 6E69 | 0B74 |
| 0000366740 | D804 | 8CFF | 0507 | 5F5F | 766C | 0D6C | E404 | 9BFF |
| 0000366760 | 0708 | 5F5F | 6C63 | 636F | 0D6B | F604 | C0FF | 070D |
| 0000367000 | 5F5F | 7473 | 6361 | 0E6B | DE04 | 81FF | 0800 | 5F5F |
| 0000367020 | 6572 | 7674 | 6C61 | 0407 | FFF2 | 0081 | 6901 | 0411 |
| 0000367040 | FFF4 | 0081 | 6C0B | 6E69 | 5F65 | 656C | 676E | 6874 |
| 0000367060 | 040C | FFFA | 00C0 | 5F06 | 745F | 7079 | 0E65 | D405 |
| 0000367100 | 0506 | AE00 | 0608 | 5F5F | 7566 | 636E | 0201 | 011C |
| 0000367120 | 829E | 0903 | 01E1 | 0016 | 01D3 | 0000 | 0D04 | 5F65 |
| 0000367140 | 7562 | 645F | 6C65 | 635F | 6168 | 0A72 | 0804 | 8100 |
| 0000367160 | 0400 | 696C | 656E | 040C | 0006 | 0081 | 6F06 | 6666 |
| 0000367200 | 6573 | 0C74 | FA04 | C0FF | 0600 | 5F5F | 7974 | 6570 |
| 0000367220 | 040F | FFF4 | 0085 | 5F09 | 625F | 5F78 | 7974 | 6570 |
| 0000367240 | 040D | FFE4 | 069A | 5F07 | 705F | 6972 | 746E | 040B |
| 0000367260 | FFDC | 078C | 5F05 | 6C5F | 6C76 | 040D | FFE8 | 089B |
| 0000367300 | 5F07 | 635F | 6F6C | 6B63 | 040D | FFF6 | 00C0 | 5F07 |
| 0000367320 | 735F | 6174 | 6B63 | 040E | FFE2 | 0081 | 5F08 | 725F |
| 0000367340 | 7465 | 6176 | 0E6C | F405 | 0506 | 5B00 | 0602 | 5F5F |
| 0000367360 | 7566 | 636E | 0201 | 0128 | 847F | 0905 | 0099 | 0010 |
| 0000367400 | 008E | 0000 | 1904 | 7562 | 755F | 6470 | 7461 | 5F65 |
| 0000367420 | 616D | 5F78 | 696C | 656E | 6C5F | 6E65 | 7467 | 1068 |
| 0000367440 | 0604 | 8100 | 0A00 | 656E | 5F77 | 656C | 676E | 6874 |
| 0000367460 | 0407 | FFFC | 0085 | 6901 | 0409 | FFFA | 0081 | 6C03 |
| 0000367500 | 6E65 | 0201 | 011F | 8518 | 0907 | 0346 | 0016 | 0338 |
| 0000367520 | 0000 | 1004 | 5F65 | 7562 | 6C5F | 6E69 | 5F65 | 656C |
| 0000367540 | 676E | 6874 | 040A | 0006 | 0085 | 6C04 | 6E69 | 0C65 |
| 0000367560 | FA04 | C0FF | 0600 | 5F5F | 7974 | 6570 | 040F | FFF4 |
| 0000367600 | 0085 | 5F09 | 625F | 5F78 | 7974 | 6570 | 040D | FFE4 |
| 0000367620 | 069A | 5F07 | 705F | 6972 | 746E | 040B | FFDC | 078C |
| 0000367640 | 5F05 | 6C5F | 6C76 | 040D | FFE8 | 089B | 5F07 | 635F |
| 0000367660 | 6F6C | 6B63 | 040D | FFF6 | 00C0 | 5F07 | 735F | 6174 |
| 0000367700 | 6B63 | 040E | FFE2 | 0081 | 5F08 | 725F | 7465 | 6176 |
| 0000367720 | 0E6C | 0E05 | 0507 | B200 | 0608 | 5F5F | 7566 | 636E |
| 0000367740 | 0201 | 011B | 885E | 0909 | 01BA | 0010 | 01AF | 0000 |
| 0000367760 | 0C04 | 5F65 | 7562 | 645F | 6665 | 745F | 6261 | 040A |
| 0000370000 | 0006 | 0085 | 6904 | 6174 | 0C62 | FA04 | C0FF | 0600 |
| 0000370020 | 5F5F | 7974 | 6570 | 040F | FFF4 | 0085 | 5F09 | 625F |
| 0000370040 | 5F78 | 7974 | 6570 | 040D | FFE4 | 069A | 5F07 | 705F |
| 0000370060 | 6972 | 746E | 040B | FFDC | 078C | 5F05 | 6C5F | 6C76 |
| 0000370100 | 040D | FFE8 | 089B | 5F07 | 635F | 6F6C | 6B63 | 040D |
| 0000370120 | FFF6 | 00C0 | 5F07 | 735F | 6174 | 6B63 | 040E | FFE2 |
| 0000370140 | 0081 | 5F08 | 725F | 7465 | 6176 | 0E6C | 2A05 | 0507 |
| 0000370160 | 2700 | 0602 | 5F5F | 7566 | 636E | 0201 | 011B | 8A18 |
| 0000370200 | 090A | 012C | 0010 | 0121 | 0000 | 0C04 | 5F65 | 7562 |
| 0000370220 | 675F | 7465 | 745F | 6261 | 040C | FFFA | 00C0 | 5F06 |
| 0000370240 | 745F | 7079 | 0F65 | F404 | 85FF | 0900 | 5F5F | 7862 |

THU MAR 14 17:42:50 1991 MEDIT.DLL PAGE 105, LINE 6137

| | | | | | | | | |
|---|---|---|---|---|---|---|---|---|
| 0000370260 | 745F | 7079 | 0D65 | E404 | 9AFF | 0706 | 5F5F | 7270 |
| 0000370300 | 6E69 | 0B74 | DC04 | 8CFF | 0507 | 5F5F | 766C | 0D6C |
| 0000370320 | E804 | 9BFF | 0708 | 5F5F | 6C63 | 636F | 0D6B | F604 |
| 0000370340 | C0FF | 0700 | 5F5F | 7473 | 6361 | 0E6B | E204 | 85FF |
| 0000370360 | 0800 | 5F5F | 6572 | 7674 | 6C61 | 050E | 0746 | 0005 |
| 0000370400 | 0227 | 5F06 | 665F | 6E75 | 0163 | 2202 | 4401 | 0B8B |
| 0000370420 | 2D09 | 1600 | 2100 | 0000 | 0400 | 6513 | 625F | 5F75 |
| 0000370440 | 6567 | 5F74 | 7563 | 7272 | 7562 | 5F66 | 6F6E | 0201 |
| 0000370460 | 0124 | 8B71 | 090C | 003D | 0016 | 0031 | 0000 | 1504 |
| 0000370500 | 5F65 | 7562 | 675F | 7465 | 635F | 7275 | 6272 | 6675 |
| 0000370520 | 6E5F | 6D61 | 0165 | 1E02 | AE01 | 0D8B | 2A09 | 1000 |
| 0000370540 | 1F00 | 0000 | 0400 | 650F | 615F | 6F62 | 7472 | 655F |
| 0000370560 | 6964 | 6974 | 676E | 0201 | 011C | 8BD8 | 0910 | 022A |
| 0000370600 | 0016 | 021C | 0000 | 0D04 | 5F65 | 7562 | 6C5F | 636F |
| 0000370620 | 5F6B | 7562 | 0C66 | 0604 | 8100 | 0600 | 7562 | 5F66 |
| 0000370640 | 6F6E | 040C | FFFA | 00C0 | 5F06 | 745F | 7079 | 0F65 |
| 0000370660 | F404 | 85FF | 0900 | 5F5F | 7862 | 745F | 7079 | 0D65 |
| 0000370700 | E404 | 9AFF | 0706 | 5F5F | 7270 | 6E69 | 0B74 | DC04 |
| 0000370720 | 8CFF | 0507 | 5F5F | 766C | 0D6C | E804 | 9BFF | 0708 |
| 0000370740 | 5F5F | 6C63 | 636F | 0D6B | F604 | C0FF | 0700 | 5F5F |
| 0000370760 | 7473 | 6361 | 0E6B | E204 | 81FF | 0800 | 5F5F | 6572 |
| 0000371000 | 7674 | 6C61 | 050E | 07DE | 0005 | 08E5 | 5F06 | 665F |
| 0000371020 | 6E75 | 0163 | 1E02 | 0201 | 128E | AD09 | 1601 | 9F00 |
| 0000371040 | 0001 | 0400 | 650F | 625F | 5F75 | 6E75 | 6F6C | 6B63 |
| 0000371060 | 625F | 6675 | 040C | 0006 | 0081 | 6206 | 6675 | 6E5F |
| 0000371100 | 0D6F | E404 | 9AFF | 0706 | 5F5F | 7270 | 6E69 | 0B74 |
| 0000371120 | DC04 | 8CFF | 0507 | 5F5F | 766C | 0D6C | E804 | 9BFF |
| 0000371140 | 0708 | 5F5F | 6C63 | 636F | 0D6B | F604 | C0FF | 0700 |
| 0000371160 | 5F5F | 7473 | 6361 | 0E6B | E204 | 81FF | 0800 | 5F5F |
| 0000371200 | 6572 | 7674 | 6C61 | 040C | FFFA | 00C0 | 5F06 | 745F |
| 0000371220 | 7079 | 0F65 | F404 | 85FF | 0900 | 5F5F | 7862 | 745F |
| 0000371240 | 7079 | 0E65 | 1005 | 0508 | 5300 | 0605 | 5F5F | 7566 |
| 0000371260 | 636E | 0201 | 0121 | 8FAF | 0915 | 01CD | 0016 | 01BF |
| 0000371300 | 0000 | 1204 | 5F65 | 7562 | 675F | 7465 | 6C5F | 636F |
| 0000371320 | 5F6B | 7473 | 7461 | 040C | 000A | 0081 | 6206 | 6675 |
| 0000371340 | 6E5F | 0B6F | 0604 | C100 | 0500 | 736C | 6174 | 0C74 |
| 0000371360 | FA04 | C0FF | 0600 | 5F5F | 7974 | 6570 | 040F | FFF4 |
| 0000371400 | 0085 | 5F09 | 625F | 5F78 | 7974 | 6570 | 040D | FFE4 |
| 0000371420 | 069A | 5F07 | 705F | 6972 | 746E | 040B | FFDC | 078C |
| 0000371440 | 5F05 | 6C5F | 6C76 | 040D | FFE8 | 089B | 5F07 | 635F |
| 0000371460 | 6F6C | 6B63 | 040D | FFF6 | 00C0 | 5F07 | 735F | 6174 |
| 0000371500 | 6B63 | 04DE | FFE2 | 0081 | 5F08 | 725F | 7465 | 6176 |
| 0000371520 | 0E6C | 2805 | 0508 | B600 | 0608 | 5F5F | 7566 | 636E |
| 0000371540 | 0201 | 011C | 917C | 0916 | 0031 | 0010 | 0026 | 0000 |
| 0000371560 | 0D04 | 5F65 | 7369 | 6C5F | 636F | 5F6B | 6573 | 0174 |
| 0000371600 | 1802 | AD01 | 1791 | 5809 | 1601 | 4C00 | 0001 | 0400 |
| 0000371620 | 6509 | 725F | 7365 | 6174 | 7472 | 040C | FFFA | 00C0 |
| 0000371640 | 5F06 | 745F | 7079 | 0F65 | F204 | 85FF | 0900 | 5F5F |
| 0000371660 | 7862 | 745F | 7079 | 0D65 | E204 | 9AFF | 0706 | 5F5F |
| 0000371700 | 7270 | 6E69 | 0B74 | DA04 | 8CFF | 0507 | 5F5F | 766C |
| 0000371720 | 0D6C | E604 | 9BFF | 0708 | 5F5F | 6C63 | 636F | 0D6B |
| 0000371740 | F604 | C0FF | 0700 | 5F5F | 7473 | 6361 | 0E6B | E004 |
| 0000371760 | 81FF | 0800 | 5F5F | 6572 | 7674 | 6C61 | 0407 | FFF4 |
| 0000372000 | 0081 | 6901 | 050E | 0844 | 0005 | 0899 | 5F06 | 665F |
| 0000372020 | 6E75 | 0163 | 2202 | 0501 | 1993 | 6209 | 1601 | 5400 |
| 0000372040 | 0001 | 0400 | 6513 | 625F | 5F75 | 6573 | 5F74 | 6974 |
| 0000372060 | 6C74 | 5F65 | 6170 | 7472 | 0410 | 000A | 0081 | 740A |
| 0000372100 | 7469 | 656C | 705F | 7261 | 0B74 | 0604 | C000 | 0500 |
| 0000372120 | 6176 | 756C | 0F65 | AA04 | 83FF | 0908 | 6974 | 6C74 |

THU MAR 14 17:42:50 1991 MEDIT.DLL PAGE 106, LINE 6196

| | | | | | | | | |
|---|---|---|---|---|---|---|---|---|
| 0000372140 | 5F65 | 7473 | 1272 | A004 | 82FF | 0C00 | 6572 | 6F63 |
| 0000372160 | 6472 | 635F | 6C6F | 726F | 0412 | FFA6 | 0082 | 720C |
| 0000372200 | 7065 | 616C | 5F79 | 6F63 | 6F6C | 1272 | FA04 | 82FF |
| 0000372220 | 0C00 | 6576 | 6972 | 7966 | 635F | 6C6F | 726F | 040A |
| 0000372240 | FFA4 | 0081 | 7304 | 6174 | 0174 | 0502 | 000D | 1A00 |
| 0000372260 | 1200 | 7E05 | 0408 | 8500 | 0AD0 | 7563 | 5F72 | 7562 |
| 0000372300 | 5F66 | 6F6E | 0511 | 009C | 0004 | 0863 | 6209 | 6675 |
| 0000372320 | 745F | 6261 | 656C | 0514 | 01E8 | 0005 | 0081 | 650C |
| 0000372340 | 6964 | 5F74 | 696C | 656E | 6E5F | 116F | 1805 | 0400 |
| 0000372360 | 6400 | 0908 | 6465 | 7469 | 6C5F | 6E69 | 0D65 | EA05 |
| 0000372400 | 0501 | 8500 | 0500 | 5F65 | 6174 | 0F62 | E005 | 0501 |
| 0000372420 | C000 | 0700 | 5F42 | 4678 | 6C69 | 0F65 | E405 | 0501 |
| 0000372440 | C000 | 0700 | 5F42 | 5078 | 6361 | 0F6B | 0405 | 0400 |
| 0000372460 | 8500 | 0700 | 4378 | 7275 | 6F73 | 0F72 | 0805 | 0400 |
| 0000372500 | 8500 | 0700 | 4379 | 7275 | 6F73 | 1172 | 1605 | 0400 |
| 0000372520 | 8500 | 0900 | 6572 | 7266 | 7365 | 6568 | 1464 | 0005 |
| 0000372540 | 0000 | 8100 | 0C00 | 7842 | 445F | 6265 | 6775 | 6F4D |
| 0000372560 | 6564 | 0514 | 0000 | 0000 | 0081 | 420C | 5F78 | 6954 |
| 0000372600 | 656D | 4D73 | 646F | 1165 | EC05 | 0501 | 8E00 | 0908 |
| 0000372620 | 7563 | 5F72 | 6974 | 6C74 | 1065 | 0005 | 0000 | 8100 |
| 0000372640 | 0800 | 7842 | 425F | 735F | 6769 | 0514 | 026C | 0005 |
| 0000372660 | 0085 | 6C0C | 6E69 | 5F65 | 6863 | 6E61 | 6567 | 1164 |
| 0000372700 | 7205 | 0513 | 8500 | 0900 | 6964 | 7073 | 665F | 616C |
| 0000372720 | 1767 | 6E05 | 0502 | 8500 | 0F00 | 7562 | 5F66 | 6E69 |
| 0000372740 | 7469 | 6169 | 696C | 657A | 1664 | D005 | 0408 | C000 |
| 0000372760 | 0E00 | 5F65 | 7768 | 646E | 765F | 7265 | 5F74 | 6273 |
| 0000373000 | 0515 | 000A | 0004 | 00C0 | 650D | 685F | 6E77 | 5F64 |
| 0000373020 | 6C63 | 6569 | 746E | 0514 | 0010 | 0004 | 00C0 | 650C |
| 0000373040 | 685F | 6E77 | 5F64 | 7266 | 6D61 | 1365 | 1405 | 0400 |
| 0000373060 | 8500 | 0B00 | 7963 | 775F | 6E69 | 735F | 7A69 | 0A65 |
| 0000373100 | E005 | 0408 | 5C00 | 0208 | 6D63 | 0516 | 08DA | 0005 |
| 0000373120 | 0085 | 650E | 6578 | 7563 | 6974 | 6E6F | 6C5F | 6E69 |
| 0000373140 | 1165 | DC05 | 0508 | 8500 | 0900 | 6D65 | 625F | 6675 |
| 0000373160 | 6E5F | 056F | 0111 | 0000 | 1C00 | 6801 | 8394 | 4D06 |
| 0000373200 | 1600 | 4100 | 0000 | 0400 | 650D | 635F | 7275 | 6F73 |
| 0000373220 | 5F72 | 6968 | 6564 | 0409 | FFF6 | 02A8 | 7603 | 6963 |
| 0000373240 | 0201 | 011D | 94B5 | 0685 | 0085 | 0016 | 0077 | 0000 |
| 0000373260 | 0E04 | 5F65 | 7563 | 7372 | 726F | 735F | 6168 | 6570 |
| 0000373300 | 040A | 0006 | 0085 | 7404 | 7079 | 0965 | F604 | A8FF |
| 0000373320 | 0302 | 6376 | 0169 | 1C02 | 3A01 | 8695 | 4D06 | 1600 |
| 0000373340 | 4100 | 0000 | 0400 | 650D | 635F | 7275 | 6F73 | 5F72 |
| 0000373360 | 6873 | 776F | 0409 | FFF6 | 02A8 | 7603 | 6963 | 0201 |
| 0000373400 | 0129 | 9587 | 0687 | 0139 | 0010 | 012E | 0000 | 1A04 |
| 0000373420 | 5F65 | 7774 | 645F | 7369 | 5F70 | 616C | 7473 | 735F |
| 0000373440 | 7263 | 6565 | 5F6E | 696C | 656E | 0409 | FFFA | 00C0 |
| 0000373460 | 7003 | 6863 | 0201 | 0124 | 96C0 | 0689 | 0049 | 0010 |
| 0000373500 | 003E | 0000 | 1504 | 5F65 | 6373 | 6572 | 6E65 | 735F |
| 0000373520 | 6968 | 7466 | 6F5F | 6972 | 6967 | 096E | 0604 | 8500 |
| 0000373540 | 0300 | 6F74 | 0A70 | 0804 | 8500 | 0400 | 656C | 7466 |
| 0000373560 | 0201 | 011F | 9709 | 068A | 0232 | 0016 | 0226 | 0000 |
| 0000373600 | 1004 | 5F65 | 6373 | 6572 | 6E65 | 725F | 6665 | 6572 |
| 0000373620 | 6873 | 040C | FFFC | 0081 | 5606 | 6564 | 746C | 0C61 |
| 0000373640 | FA04 | 81FF | 0600 | 6448 | 6C65 | 6174 | 0201 | 011E |
| 0000373660 | 993B | 068C | 0242 | 0010 | 0237 | 0000 | 0F04 | 5F65 |
| 0000373700 | 6373 | 6572 | 6E65 | 755F | 6470 | 7461 | 0A65 | 0604 |
| 0000373720 | 8500 | 0400 | 696C | 656E | 040C | 0008 | 0085 | 6E06 |
| 0000373740 | 6D75 | 6562 | 0B72 | 0A04 | 8500 | 0500 | 7473 | 7261 |
| 0000373760 | 0774 | F804 | 85FF | 0100 | 0D69 | FA04 | C0FF | 0700 |
| 0000374000 | 7A73 | 6C5F | 6E69 | 0165 | 1E02 | 7D01 | 8E9B | 3606 |

THU MAR 14 17:42:50 1991 MEDIT.DLL PAGE 107, LINE 6255

| | | | | | | | | |
|---|---|---|---|---|---|---|---|---|
| 0000374020 | 1601 | 2A00 | 0001 | 0400 | 650F | 735F | 7263 | 6565 |
| 0000374040 | 5F6E | 6572 | 7264 | 7761 | 0201 | 011C | 9CB3 | 0690 |
| 0000374060 | 05B9 | 0016 | 05AB | 0000 | 0D04 | 5F65 | 7563 | 7372 |
| 0000374100 | 726F | 6D5F | 766F | 0965 | 0604 | 8100 | 0300 | 6964 |
| 0000374120 | 0772 | FA04 | 81FF | 0100 | 1669 | FC04 | 85FF | 1000 |
| 0000374140 | 6874 | 7369 | 6C5F | 6E69 | 5F65 | 656C | 676E | 6874 |
| 0000374160 | 0201 | 011D | A26C | 0692 | 00C1 | 0010 | 00B6 | 0000 |
| 0000374200 | 0E04 | 5F65 | 7774 | 645F | 7369 | 5F70 | 6863 | 7261 |
| 0000374220 | 0408 | 0006 | 00C0 | 6302 | 0A68 | FA04 | C4FF | 0400 |
| 0000374240 | 7461 | 7274 | 0201 | 011D | A32D | 0694 | 00EE | 0010 |
| 0000374260 | 00E3 | 0000 | 0E04 | 5F65 | 7774 | 645F | 7369 | 5F70 |
| 0000374300 | 696C | 656E | 0409 | 0006 | 00C0 | 7303 | 7274 | 0409 |
| 0000374320 | 000A | 0085 | 7203 | 776F | 0409 | 000C | 0085 | 6303 |
| 0000374340 | 6C6F | 0201 | 0126 | A41B | 0696 | 0136 | 0010 | 012B |
| 0000374360 | 0000 | 1704 | 5F65 | 7774 | 645F | 7369 | 5F70 | 696C |
| 0000374400 | 656E | 665F | 6F72 | 5F6D | 7562 | 0A66 | 0604 | 8100 |
| 0000374420 | 0400 | 696C | 656E | 040E | FFFA | 00C0 | 7308 | 7274 |
| 0000374440 | 6C5F | 6E69 | 0165 | 1F02 | 5101 | 97A5 | 2706 | 1600 |
| 0000374460 | 1B00 | 0000 | 0400 | 6510 | 745F | 5F77 | 6964 | 7073 |
| 0000374500 | 735F | 7263 | 6565 | 016E | 2002 | 7801 | 99A5 | 4606 |
| 0000374520 | 1600 | 3800 | 0000 | 0400 | 6511 | 745F | 5F77 | 6E69 |
| 0000374540 | 6573 | 7472 | 6C5F | 6E69 | 7365 | 0409 | 0008 | 0081 |
| 0000374560 | 7203 | 776F | 0409 | 0006 | 0081 | 6E03 | 6D75 | 0201 |
| 0000374600 | 0120 | A5BE | 069B | 0058 | 0016 | 004A | 0000 | 1104 |
| 0000374620 | 5F65 | 7774 | 645F | 6C65 | 7465 | 5F65 | 696C | 656E |
| 0000374640 | 0A73 | 0804 | 8100 | 0400 | 696C | 656E | 0409 | 0006 |
| 0000374660 | 0081 | 6E03 | 6D75 | 0201 | 011B | A616 | 069D | 013E |
| 0000374700 | 0016 | 0130 | 0000 | 0C04 | 5F65 | 7774 | 635F | 726C |
| 0000374720 | 655F | 6C6F | 0409 | 0008 | 0085 | 7203 | 776F | 0409 |
| 0000374740 | 0006 | 0085 | 6303 | 6C6F | 040B | FFFC | 0080 | 6205 |
| 0000374760 | 616C | 6B6E | 0407 | FFFA | 0085 | 6901 | 040A | FFF6 |
| 0000375000 | 00C4 | 6104 | 7474 | 0172 | 1E02 | 5401 | 9FA7 | 9306 |
| 0000375020 | 1003 | 8800 | 0003 | 0400 | 650F | 735F | 7263 | 6565 |
| 0000375040 | 5F6E | 6373 | 6F72 | 6C6C | 0410 | 0006 | 0085 | 730A |
| 0000375060 | 5F62 | 6F63 | 6D6D | 6E61 | 0E64 | 0804 | 8500 | 0800 |
| 0000375100 | 6F70 | 6973 | 6974 | 6E6F | 0410 | 000A | 0085 | 680A |
| 0000375120 | 726F | 7A69 | 6E6F | 6174 | 016C | 2302 | E701 | A1AA |
| 0000375140 | 1506 | 1001 | 0A00 | 0001 | 0400 | 6514 | 755F | 6470 |
| 0000375160 | 7461 | 5F65 | 6373 | 6F72 | 6C6C | 625F | 7261 | 1073 |
| 0000375200 | 0604 | 1100 | 0A02 | 6372 | 5F6C | 6C63 | 6569 | 746E |
| 0000375220 | 0201 | 0119 | ABFC | 06A3 | 0070 | 0010 | 0065 | 0000 |
| 0000375240 | 0A04 | 6966 | 5F78 | 6373 | 6F72 | 6C6C | 040B | 0006 |
| 0000375260 | 0085 | 6605 | 654E | 6465 | 040A | 0008 | 00C0 | 6804 |
| 0000375300 | 6E77 | 0B64 | 0C04 | C500 | 0500 | 6970 | 6F50 | 0A73 |
| 0000375320 | 1004 | 8500 | 0400 | 4D69 | 7861 | 0201 | 0124 | AC6C |
| 0000375340 | 06A4 | 02D6 | 0010 | 02CB | 0000 | 1504 | 5F65 | 6373 |
| 0000375360 | 6572 | 6E65 | 635F | 6568 | 6B63 | 735F | 7263 | 6C6F |
| 0000375400 | 0D6C | FA04 | 85FF | 0700 | 6C6F | 6864 | 726F | 0D7A |
| 0000375420 | FC04 | 85FF | 0700 | 6C6F | 7664 | 7265 | 0C74 | F604 |
| 0000375440 | 85FF | 0600 | 6C6F | 6364 | 6C6F | 040C | FFF8 | 0085 |
| 0000375460 | 6F06 | 646C | 6F72 | 0177 | 2302 | 4201 | A6AF | D006 |
| 0000375500 | 1600 | C200 | 0000 | 0400 | 6514 | 735F | 7263 | 6565 |
| 0000375520 | 5F6E | 6563 | 746E | 7265 | 6C5F | 6E69 | 0A65 | 0604 |
| 0000375540 | 8500 | 0400 | 696C | 656E | 0201 | 011F | B012 | 06A8 |
| 0000375560 | 007C | 0016 | 006E | 0000 | 1004 | 5F65 | 6567 | 5F74 |
| 0000375600 | 6F6D | 7375 | 5F65 | 696C | 656E | 040A | 0018 | 00C0 |
| 0000375620 | 6804 | 6E77 | 0964 | 1604 | 8500 | 0300 | 736D | 0967 |
| 0000375640 | 1204 | C000 | 0300 | 706D | 0931 | 0E04 | C000 | 0300 |
| 0000375660 | 706D | 0A32 | 0A04 | C500 | 0400 | 696C | 656E | 0409 |

THU MAR 14 17:42:50 1991 MEDIT.DLL PAGE 108, LINE 6314

| | | | | | | | | |
|---|---|---|---|---|---|---|---|---|
| 0000375700 | 0006 | 00C5 | 6303 | 6C6F | 0201 | 0125 | B08E | 06AA |
| 0000375720 | 0055 | 0010 | 004A | 0000 | 1604 | 7075 | 6164 | 6574 |
| 0000375740 | 635F | 7275 | 6F73 | 5F72 | 6F70 | 6973 | 6974 | 6E6F |
| 0000375760 | 0201 | 0125 | B0E3 | 06AB | 0068 | 0016 | 005C | 0000 |
| 0000376000 | 1604 | 5F65 | 6373 | 6572 | 6E65 | 755F | 6470 | 7461 |
| 0000376020 | 5F65 | 6D63 | 705F | 736F | 0201 | 0510 | 1376 | 0005 |
| 0000376040 | 0085 | 6D08 | 7861 | 685F | 726F | 107A | 7405 | 0513 |
| 0000376060 | 8500 | 0800 | 616D | 5F78 | 6576 | 7472 | 050C | 08D4 |
| 0000376100 | 0004 | 0085 | 6804 | 7076 | 1173 | 7C05 | 0508 | 8500 |
| 0000376120 | 0900 | 4E66 | 6565 | 4864 | 726F | 167A | D605 | 0408 |
| 0000376140 | C000 | 0E00 | 5F65 | 7768 | 646E | 685F | 726F | 5F7A |
| 0000376160 | 6273 | 0511 | 087E | 0005 | 0085 | 6609 | 654E | 6465 |
| 0000376200 | 6556 | 7472 | 0516 | 08D0 | 0004 | 00C0 | 650E | 685F |
| 0000376220 | 6E77 | 5F64 | 6576 | 7472 | 735F | 1362 | 8005 | 0508 |
| 0000376240 | 8100 | 0B00 | 6C6F | 5F64 | 6373 | 5F72 | 6F72 | 1577 |
| 0000376260 | 0A05 | 0400 | C000 | 0D00 | 5F65 | 7768 | 646E | 635F |
| 0000376300 | 696C | 6E65 | 1374 | 8205 | 0508 | 8100 | 0B00 | 6C6F |
| 0000376320 | 5F64 | 6373 | 5F72 | 6F63 | 146C | 1005 | 0400 | C000 |
| 0000376340 | 0C00 | 5F65 | 7768 | 646E | 665F | 6172 | 656D | 0D05 |
| 0000376360 | 0000 | 001A | 0513 | 000E | 0004 | 0085 | 630B | 5F78 |
| 0000376400 | 6977 | 5F6E | 6973 | 657A | 0513 | 0014 | 0004 | 0085 |
| 0000376420 | 630B | 5F79 | 6977 | 5F6E | 6973 | 657A | 0512 | 08DA |
| 0000376440 | 0004 | 0085 | 630A | 5F78 | 7370 | 735F | 7A69 | 1265 |
| 0000376460 | 0605 | 0400 | 8100 | 0A00 | 6863 | 7261 | 775F | 6469 |
| 0000376500 | 6874 | 0513 | 08DE | 0004 | 0081 | 630B | 6168 | 5F72 |
| 0000376520 | 6568 | 6769 | 7468 | 0512 | 013E | 0005 | 0085 | 6F0A |
| 0000376540 | 646C | 635F | 5F6D | 6F72 | 0F77 | 4005 | 0501 | 8400 |
| 0000376560 | 0700 | 6D63 | 615F | 7474 | 0F72 | 4105 | 0501 | 8400 |
| 0000376600 | 0700 | 6D65 | 615F | 7474 | 0A72 | E005 | 0408 | 4C00 |
| 0000376620 | 0206 | 6D63 | 0516 | 08DA | 0005 | 0085 | 650E | 6578 |
| 0000376640 | 7563 | 6974 | 6E6F | 6C5F | 6E69 | 1065 | 4305 | 0501 |
| 0000376660 | 8400 | 0800 | 6564 | 5F66 | 7461 | 7274 | 0511 | 08DC |
| 0000376700 | 0005 | 0085 | 6509 | 5F6D | 7562 | 5F66 | 6F6E | 0512 |
| 0000376720 | 0146 | 0005 | 0085 | 640A | 7369 | 6C70 | 7961 | 635F |
| 0000376740 | 116D | 4805 | 0501 | 5F00 | 0906 | 6976 | 5F6F | 6C62 |
| 0000376760 | 6E61 | 216B | 7805 | 0406 | 8500 | 1900 | 5F65 | 6E69 |
| 0000377000 | 7469 | 6169 | 696C | 617A | 6974 | 6E6F | 635F | 6D6F |
| 0000377020 | 6C70 | 7465 | 1265 | A405 | 0508 | 8500 | 0A00 | 5F65 |
| 0000377040 | 616D | 6B72 | 665F | 676C | 0519 | 08A6 | 0005 | 0085 |
| 0000377060 | 6511 | 765F | 6C61 | 6469 | 625F | 6F6C | 6B63 | 665F |
| 0000377100 | 676C | 0512 | 087E | 0004 | 0085 | 630A | 7275 | 625F |
| 0000377120 | 6675 | 6E5F | 116F | 9C05 | 0400 | 5300 | 0906 | 7562 |
| 0000377140 | 5F66 | 6174 | 6C62 | 0D65 | EA05 | 0501 | 8500 | 0500 |
| 0000377160 | 5F65 | 6174 | 0B62 | 7A05 | 0406 | 4600 | 0306 | 6373 |
| 0000377200 | 0F72 | 0405 | 0400 | 8500 | 0700 | 4378 | 7275 | 6F73 |
| 0000377220 | 0F72 | 0805 | 0400 | 8500 | 0700 | 4379 | 7275 | 6F73 |
| 0000377240 | 1172 | 1605 | 0400 | 8500 | 0900 | 6572 | 7266 | 7365 |
| 0000377260 | 6568 | 0564 | 0111 | 0000 | 1C00 | 4C01 | D5B1 | 2906 |
| 0000377300 | 1001 | 1E00 | 0001 | 0400 | 650D | 625F | 6F6C | 6B63 |
| 0000377320 | 735F | 6174 | 7472 | 040A | 0006 | 00C0 | 6804 | 6E77 |
| 0000377340 | 0764 | 0A04 | 8500 | 0100 | 0778 | 0C04 | 8500 | 0100 |
| 0000377360 | 1079 | 0E04 | 8100 | 0A00 | 6F74 | 5F70 | 6F63 | 6E72 |
| 0000377400 | 7265 | 0411 | 0010 | 0081 | 6C0B | 6665 | 5F74 | 6F63 |
| 0000377420 | 6E72 | 7265 | 0201 | 0122 | B275 | 06D7 | 0085 | 0010 |
| 0000377440 | 007A | 0000 | 1304 | 5F65 | 6C62 | 636F | 5F6B | 7075 |
| 0000377460 | 6164 | 6574 | 735F | 7A69 | 0A65 | 0604 | C000 | 0400 |
| 0000377500 | 7768 | 646E | 0407 | 000A | 0085 | 7801 | 0407 | 000C |
| 0000377520 | 0085 | 7901 | 0201 | 011A | B2FA | 06D9 | 0076 | 0010 |
| 0000377540 | 006B | 0000 | 0B04 | 5F65 | 6C62 | 636F | 5F6B | 6E65 |

THU MAR 14 17:42:50 1991 MEDIT.DLL PAGE 109, LINE 6373

| | | | | | | | | |
|---|---|---|---|---|---|---|---|---|
| 0000377560 | 0A64 | 0604 | C000 | 0400 | 7768 | 646E | 0407 | 000A |
| 0000377600 | 0085 | 7801 | 0407 | 000C | 0085 | 7901 | 0201 | 0119 |
| 0000377620 | B370 | 06DB | 036D | 0010 | 0362 | 0000 | 0A04 | 5F65 |
| 0000377640 | 6C63 | 7069 | 635F | 7475 | 040A | 0006 | 00C0 | 6804 |
| 0000377660 | 6E77 | 0C64 | FA04 | C0FF | 0600 | 5F5F | 7974 | 6570 |
| 0000377700 | 040F | FFE8 | 0085 | 5F09 | 625F | 5F78 | 7974 | 657U |
| 0000377720 | 040D | FFD8 | 053D | 5F07 | 705F | 6972 | 746E | 040B |
| 0000377740 | FFD0 | 05CB | 5F05 | 6C5F | 6C76 | 040D | FFDC | 06E0 |
| 0000377760 | 5F07 | 635F | 6F6C | 6B63 | 040D | FFEC | 00C0 | 5F07 |
| 0000400000 | 735F | 6174 | 6B63 | 040E | FFD6 | 0081 | 5F08 | 725F |
| 0000400020 | 7465 | 6176 | 0A6C | EA04 | 85FF | 0400 | 6964 | 6666 |
| 0000400040 | 0410 | FFF0 | 06E1 | 6C0A | 6E69 | 6365 | 746E | 735F |
| 0000400060 | 0E74 | B405 | 0508 | DE00 | 0606 | 5F5F | 7566 | 636E |
| 0000400100 | 0201 | 011A | B6DD | 06E4 | 0040 | 0010 | 0035 | 0000 |
| 0000400120 | 0B04 | 5F65 | 6C63 | 7069 | 635F | 706F | 0A79 | 0604 |
| 0000400140 | C000 | 0400 | 7768 | 646E | 0201 | 011C | B71D | 06E5 |
| 0000400160 | 00C7 | 0016 | 00BB | 0000 | 0D04 | 5F65 | 6C62 | 636F |
| 0000400200 | 5F6B | 6170 | 7473 | 0965 | FA04 | C0FF | 0300 | 6370 |
| 0000400220 | 0168 | 1802 | E401 | E7B7 | 9606 | 1001 | 8B00 | 0001 |
| 0000400240 | 0400 | 650C | 635F | 696C | 5F70 | 6170 | 7473 | 0A65 |
| 0000400260 | 0604 | C000 | 0400 | 7768 | 646E | 040B | FFF0 | 0081 |
| 0000400300 | 6C05 | 6E69 | 7365 | 0410 | FFF2 | 06E1 | 6C0A | 6E69 |
| 0000400320 | 6365 | 746E | 735F | 0974 | EC04 | C0FF | 0300 | 6370 |
| 0000400340 | 0A68 | FC04 | 81FF | 0400 | 6F63 | 736C | 0201 | 011C |
| 0000400360 | B97A | 06E9 | 00E8 | 0010 | 00DD | 0000 | 0D04 | 5F65 |
| 0000400400 | 6C62 | 636F | 5F6B | 6170 | 6E69 | 0A74 | 0604 | 8500 |
| 0000400420 | 0400 | 7264 | 7761 | 040A | FFFA | 00C4 | 6104 | 7474 |
| 0000400440 | 0172 | 1802 | 6201 | EBBA | D706 | 1002 | CC00 | 0002 |
| 0000400460 | 0400 | 6209 | 6F6C | 6B63 | 735F | 7465 | 040A | 0006 |
| 0000400500 | 00C0 | 6804 | 6E77 | 0764 | 0A04 | 8500 | 0100 | 0778 |
| 0000400520 | 0C04 | 8500 | 0100 | 0179 | 1A02 | 3901 | EDBD | AEU6 |
| 0000400540 | 1000 | A300 | 0000 | 0400 | 620B | 6F6C | 6B63 | 635F |
| 0000400560 | 656C | 7261 | 040B | 0006 | 0085 | 6505 | 6172 | 6573 |
| 0000400600 | 0201 | 011A | BDE7 | 06EF | 0158 | 0016 | 014A | 0000 |
| 0000400620 | 0B04 | 5F65 | 6C62 | 636F | 5F6B | 6564 | 106C | 0C04 |
| 0000400640 | 8100 | 0A00 | 6966 | 7372 | 5F74 | 696C | 656E | 0410 |
| 0000400660 | 000A | 0081 | 660A | 7269 | 7473 | 635F | 6168 | 0F72 |
| 0000400700 | 0804 | 8100 | 0900 | 616C | 7473 | 6C5F | 6E69 | 0F65 |
| 0000400720 | 0604 | 8100 | 0900 | 616C | 7473 | 635F | 6168 | 0772 |
| 0000400740 | FC04 | 81FF | 0100 | 1173 | FA04 | 81FF | 0B00 | 616C |
| 0000400760 | 7473 | 6C5F | 6E65 | 7467 | 1268 | F804 | 81FF | 0C00 |
| 0000401000 | 6966 | 7372 | 5F74 | 656C | 676E | 6874 | 0201 | 011B |
| 0000401020 | BF3F | 06F1 | 007E | 0010 | 0073 | 0000 | 0C04 | 6C62 |
| 0000401040 | 636F | 5F6B | 656C | 676E | 6874 | 040D | 0006 | 0081 |
| 0000401060 | 7807 | 625F | 6765 | 6E69 | 040D | 0008 | 0081 | 7907 |
| 0000401100 | 625F | 6765 | 6E69 | 040B | 000A | 0081 | 7805 | 655F |
| 0000401120 | 646E | 040B | 000C | 0081 | 7905 | 655F | 646E | 0407 |
| 0000401140 | FFFA | 0081 | 6901 | 0409 | FFF8 | 0081 | 7203 | 7365 |
| 0000401160 | 040D | FFFC | 0085 | 6207 | 656C | 676E | 6874 | 040F |
| 0000401200 | FFF6 | 0085 | 6909 | 6F64 | 656C | 676E | 6874 | 0201 |
| 0000401220 | 011B | BFBD | 06F3 | 0371 | 0016 | 0363 | 0000 | 0C04 |
| 0000401240 | 5F65 | 6C62 | 636F | 5F6B | 6F63 | 7970 | 0410 | 000C |
| 0000401260 | 0081 | 660A | 7269 | 7473 | 6C5F | 6E69 | 1065 | 0A04 |
| 0000401300 | 8100 | 0A00 | 6966 | 7372 | 5F74 | 6863 | 7261 | 040F |
| 0000401320 | 0008 | 0081 | 6C09 | 7361 | 5F74 | 696C | 656E | 040F |
| 0000401340 | 0006 | 0081 | 6C09 | 7361 | 5F74 | 6863 | 7261 | 0407 |
| 0000401360 | FFFC | 0081 | 7301 | 0409 | FFF0 | 00C0 | 7003 | 6863 |
| 0000401400 | 040C | FFF6 | 00C0 | 6906 | 6F64 | 6370 | 0C68 | EE04 |
| 0000401420 | 81FF | 0600 | 6469 | 746F | 706D | 0412 | FFF4 | 0081 |

THU MAR 14 17:42:50 1991 MEDIT.DLL PAGE 110, LINE 6432

| | | | | | | | | |
|---|---|---|---|---|---|---|---|---|
| 0000401440 | 660C | 7269 | 7473 | 6C5F | 6E65 | 7467 | 1168 | FA04 |
| 0000401460 | 81FF | 0B00 | 616C | 7473 | 6C5F | 6E65 | 7467 | 0168 |
| 0000401500 | 1B02 | 2E01 | F5C3 | 4306 | 1000 | 3800 | 0000 | 0400 |
| 0000401520 | 650C | 635F | 696C | 5F70 | 7473 | 7461 | 0C65 | 0604 |
| 0000401540 | C500 | 0600 | 5666 | 6C61 | 6469 | 040B | 000A | 00C5 |
| 0000401560 | 6605 | 7546 | 6C6C | 0201 | 011F | C371 | 06F7 | 009C |
| 0000401600 | 0010 | 0091 | 0000 | 1004 | 5F65 | 6C63 | 7069 | 695F |
| 0000401620 | 696E | 5F74 | 656D | 756E | 040F | 0006 | 00C0 | 6809 |
| 0000401640 | 6E77 | 5F64 | 656D | 756E | 0411 | FFFC | 0085 | 660B |
| 0000401660 | 6156 | 696C | 4264 | 6F6C | 6B63 | 0411 | FFFA | 0085 |
| 0000401700 | 660B | 6C43 | 7069 | 7453 | 7461 | 7375 | 0201 | 0123 |
| 0000401720 | C40D | 06F9 | 001B | 0010 | 0010 | 0000 | 1404 | 6573 |
| 0000401740 | 5F74 | 6465 | 7469 | 6D5F | 6E65 | 5F75 | 7473 | 7461 |
| 0000401760 | 7375 | 040A | 0006 | 0085 | 7304 | 6174 | 0174 | 1902 |
| 0000402000 | A605 | 0508 | 8500 | 1100 | 5F65 | 6176 | 696C | 5F64 |
| 0000402020 | 6C62 | 636F | 5F6B | 6C66 | 0567 | 000D | 1A00 | 1200 |
| 0000402040 | 7E05 | 0408 | 8500 | 0A00 | 7563 | 5F72 | 7562 | 5F66 |
| 0000402060 | 6F6E | 0511 | 009C | 0004 | 06A4 | 6209 | 6675 | 745F |
| 0000402100 | 6261 | 656C | 0514 | 01E8 | 0005 | 0081 | 650C | 6964 |
| 0000402120 | 5F74 | 696C | 656E | 6E5F | 116F | 1805 | 0400 | A500 |
| 0000402140 | 0906 | 6465 | 7469 | 6C5F | 6E69 | 0F65 | 9C05 | 0508 |
| 0000402160 | C000 | 0700 | 5F42 | 4678 | 6C69 | 0F65 | A005 | 0508 |
| 0000402200 | C000 | 0700 | 5F42 | 5078 | 6361 | 0F6B | 0405 | 0400 |
| 0000402220 | 8500 | 0700 | 4378 | 7275 | 6F73 | 0F72 | 0805 | 0400 |
| 0000402240 | 8500 | 0700 | 4379 | 7275 | 6F73 | 1172 | 1605 | 0400 |
| 0000402260 | 8500 | 0900 | 6572 | 7266 | 7365 | 6568 | 1464 | 0005 |
| 0000402300 | 0000 | 8100 | 0C00 | 7842 | 445F | 6265 | 6775 | 6F4D |
| 0000402320 | 6564 | 0510 | 1390 | 0005 | 0085 | 6608 | 6143 | 7470 |
| 0000402340 | 7275 | 1465 | 0005 | 0000 | 8100 | 0C00 | 7842 | 545F |
| 0000402360 | 6D69 | 7365 | 6F4D | 6564 | 0511 | 1396 | 0005 | 0081 |
| 0000402400 | 7809 | 6C42 | 636F | 426B | 6765 | 05CC | 08D4 | 0004 |
| 0000402420 | 0085 | 6804 | 7076 | 1173 | 9805 | 0513 | 8100 | 0900 |
| 0000402440 | 4279 | 6F6C | 6B63 | 6542 | 1167 | 9A05 | 0513 | 8100 |
| 0000402460 | 0900 | 4278 | 6F6C | 6B63 | 6E45 | 1164 | 9C05 | 0513 |
| 0000402500 | 8100 | 0900 | 4279 | 6F6C | 6B63 | 6E45 | 1564 | 0A05 |
| 0000402520 | 0400 | C000 | 0D00 | 5F65 | 7768 | 646E | 635F | 696C |
| 0000402540 | 6E65 | 1174 | 9E05 | 0513 | 8100 | 0900 | 5F78 | 7562 |
| 0000402560 | 5F66 | 6562 | 1167 | A205 | 0513 | 8100 | 0900 | 5F78 |
| 0000402600 | 7562 | 5F66 | 6E65 | 1364 | 0E05 | 0400 | 8500 | 0B00 |
| 0000402620 | 7863 | 775F | 6E69 | 735F | 7A69 | 1165 | A005 | 0513 |
| 0000402640 | 8100 | 0900 | 5F79 | 7562 | 5F66 | 6562 | 1367 | 1405 |
| 0000402660 | 0400 | 8500 | 0B00 | 7963 | 775F | 6E69 | 735F | 7A69 |
| 0000402700 | 1165 | A405 | 0513 | 8100 | 0900 | 5F79 | 7562 | 5F66 |
| 0000402720 | 6E65 | 1264 | DC05 | 0408 | 8500 | 0A00 | 7963 | 705F |
| 0000402740 | 5F73 | 6973 | 657A | 0515 | 1378 | 0005 | 0081 | 730D |
| 0000402760 | 6174 | 7472 | 735F | 7263 | 635F | 6C6F | 0512 | 08DA |
| 0000403000 | 0004 | 0085 | 630A | 5F78 | 7370 | 735F | 7A69 | 1565 |
| 0000403020 | 0405 | 0513 | 8100 | 0D00 | 7473 | 7261 | 5F74 | 6373 |
| 0000403040 | 5F72 | 6F72 | 1377 | 9205 | 0513 | 8100 | 0B00 | 6E65 |
| 0000403060 | 5F64 | 6373 | 5F72 | 6F63 | 136C | 9405 | 0513 | 8100 |
| 0000403100 | 0B00 | 6E65 | 5F64 | 6373 | 5F72 | 6F72 | 0C77 | 8005 |
| 0000403120 | 0513 | 8100 | 0400 | 4278 | 6765 | 050C | 1382 | 0005 |
| 0000403140 | 0081 | 7904 | 6542 | 0C67 | 8605 | 0513 | 8100 | 0400 |
| 0000403160 | 4578 | 646E | 050C | 1388 | 0005 | 0081 | 7904 | 6E45 |
| 0000403200 | 1064 | 4305 | 0501 | 8400 | 0800 | 6564 | 5F66 | 7461 |
| 0000403220 | 7274 | 050F | 137C | 0005 | 00C0 | 7007 | 6863 | 6554 |
| 0000403240 | 7478 | 0510 | 0144 | 0005 | 0084 | 7308 | 7465 | 615F |
| 0000403260 | 7474 | 1372 | 8A05 | 0513 | C000 | 0B00 | 6370 | 4368 |
| 0000403300 | 696C | 5470 | 7865 | 1374 | 8E05 | 0513 | 8500 | 0B00 |

THU MAR 14 17:42:50 1991 MEDIT.DLL PAGE 111, LINE 6491

| | | | | | | | | |
|---|---|---|---|---|---|---|---|---|
| 0000403320 | 6573 | 436C | 696C | 5470 | 7865 | 0F74 | 7A05 | 0513 |
| 0000403340 | 8500 | 0700 | 7375 | 4966 | 666E | 0B6F | 0005 | 0400 |
| 0000403360 | C000 | 0300 | 6168 | 1262 | A405 | 0508 | 8500 | 0A00 |
| 0000403400 | 5F65 | 616D | 6B72 | 665F | 676C | 1105 | 0001 | 0000 |
| 0000403420 | 011C | C428 | 06E9 | 0180 | 0016 | 0172 | 0000 | 0D04 |
| 0000403440 | 5F65 | 6D63 | 675F | 7465 | 6C5F | 6E69 | 0965 | 0804 |
| 0000403460 | C000 | 0300 | 7562 | 0966 | 0604 | 8100 | 0300 | 656C |
| 0000403500 | 0D6E | FC04 | 81FF | 0700 | 6F63 | 7970 | 656C | 016E |
| 0000403520 | 2002 | A801 | ECC5 | F006 | 1604 | E200 | 0004 | 0400 |
| 0000403540 | 6511 | 6E5F | 7765 | 635F | 5F6D | 6567 | 5F74 | 696C |
| 0000403560 | 656E | 0409 | 0012 | 0081 | 6C03 | 6E65 | 040A | 000E |
| 0000403600 | 00C0 | 6C04 | 6E69 | 0D65 | 0A04 | C000 | 0700 | 7562 |
| 0000403620 | 6E66 | 6D61 | 0D65 | 0604 | C100 | 0700 | 696C | 656E |
| 0000403640 | 756E | 0C6D | FA04 | C0FF | 0600 | 5F5F | 7974 | 6570 |
| 0000403660 | 040F | FFF2 | 0085 | 5F09 | 625F | 5F78 | 7974 | 6570 |
| 0000403700 | 040D | FFE0 | 0246 | 5F07 | 705F | 6972 | 746E | 040B |
| 0000403720 | FFD8 | 05A4 | 5F05 | 6C5F | 6C76 | 040D | FFE4 | 06F1 |
| 0000403740 | 5F07 | 635F | 6F6C | 6B63 | 040D | FFF6 | 00C0 | 5F07 |
| 0000403760 | 735F | 6174 | 6B63 | 040E | FFDE | 0081 | 5F08 | 725F |
| 0000404000 | 7465 | 6176 | 0D6C | F004 | 81FF | 0700 | 6F63 | 7970 |
| 0000404020 | 656C | 086E | F404 | 81FF | 0200 | 6372 | 050E | 0938 |
| 0000404040 | 0005 | 06EF | 5F06 | 665F | 6E75 | 0163 | 1902 | 9801 |
| 0000404060 | F4CA | 8306 | 1002 | 7800 | 0002 | 0400 | 630A | 5F6D |
| 0000404100 | 6461 | 6176 | 636E | 0C65 | FA04 | C0FF | 0600 | 5F5F |
| 0000404120 | 7974 | 6570 | 040F | FFF4 | 0085 | 5F09 | 625F | 5F78 |
| 0000404140 | 7974 | 6570 | 040D | FFE4 | 0246 | 5F07 | 705F | 6972 |
| 0000404160 | 746E | 040B | FFDC | 05A4 | 5F05 | 6C5F | 6C76 | 040D |
| 0000404200 | FFE8 | 06F1 | 5F07 | 635F | 6F6C | 6B63 | 040D | FFF6 |
| 0000404220 | 00C0 | 5F07 | 735F | 6174 | 6B63 | 040E | FFE2 | 0081 |
| 0000404240 | 5F08 | 725F | 7465 | 6176 | 0E6C | 5205 | 0509 | F600 |
| 0000404260 | 0606 | 5F5F | 7566 | 636E | 0201 | 0116 | CD1B | 06F7 |
| 0000404300 | 0044 | 0010 | 0039 | 0000 | 0704 | 6D63 | 775F | 6961 |
| 0000404320 | 0174 | 1902 | 5F01 | F9CD | D506 | 1600 | C700 | 0000 |
| 0000404340 | 0400 | 650A | 635F | 5F6D | 6E75 | 7570 | 0874 | 0604 |
| 0000404360 | 8000 | 0200 | 6863 | 0201 | 0117 | CE34 | 06FB | 0074 |
| 0000404400 | 0016 | 0066 | 0000 | 0804 | 5F65 | 6D63 | 705F | 736F |
| 0000404420 | 0409 | 0008 | 0085 | 7203 | 776F | 0409 | 0006 | 0085 |
| 0000404440 | 6303 | 6C6F | 0201 | 0120 | CEA8 | 06FD | 0194 | 0010 |
| 0000404460 | 0189 | 0000 | 1104 | 6D63 | 665F | 6E69 | 5F64 | 656E |
| 0000404500 | 7478 | 735F | 6D74 | 0A74 | 0604 | 8100 | 0400 | 696C |
| 0000404520 | 656E | 0407 | FFF6 | 00C0 | 7301 | 040C | FFFA | 00C0 |
| 0000404540 | 5F06 | 745F | 7079 | 0F65 | F004 | 85FF | 0900 | 5F5F |
| 0000404560 | 7862 | 745F | 7079 | 0D65 | E004 | 46FF | 0702 | 5F5F |
| 0000404600 | 7270 | 6E69 | 0B74 | D804 | A4FF | 0505 | 5F5F | 766C |
| 0000404620 | 0D6C | E404 | F1FF | 0706 | 5F5F | 6C63 | 636F | 0D6B |
| 0000404640 | F204 | C0FF | 0700 | 5F5F | 7473 | 6361 | 0E6B | DE04 |
| 0000404660 | 81FF | 0800 | 5F5F | 6572 | 7674 | 6C61 | 050E | 0966 |
| 0000404700 | 0005 | 06EF | 5F06 | 665F | 6E75 | 0163 | 1D02 | 3C01 |
| 0000404720 | FFD0 | 8B06 | 1602 | 7D00 | 0002 | 0400 | 650E | 695F |
| 0000404740 | 5F73 | 7865 | 6365 | 6C5F | 6E69 | 0A65 | 0604 | C000 |
| 0000404760 | 0400 | 696C | 656E | 040C | FFF6 | 00C0 | 5F06 | 745F |
| 0000405000 | 7079 | 0F65 | F004 | 85FF | 0900 | 5F5F | 7862 | 745F |
| 0000405020 | 7079 | 0D65 | E004 | 46FF | 0702 | 5F5F | 7270 | 6E69 |
| 0000405040 | 0B74 | D804 | A4FF | 0505 | 5F5F | 766C | 0D6C | E404 |
| 0000405060 | F1FF | 0706 | 5F5F | 6C63 | 636F | 0D6B | F204 | C0FF |
| 0000405100 | 0700 | 5F5F | 7473 | 6361 | 0E6B | DE04 | 85FF | 0800 |
| 0000405120 | 5F5F | 6572 | 7674 | 6C61 | 0407 | FFFA | 00C0 | 7001 |
| 0000405140 | 050E | 0982 | 0005 | 0701 | 5F06 | 665F | 6E75 | 0163 |
| 0000405160 | 1802 | C701 | 02D2 | 2D07 | 1600 | 2100 | 0000 | 0400 |

THU MAR 14 17:42:50 1991 MEDIT.DLL PAGE 112, LINE 6550

| | | | | | | | | |
|---|---|---|---|---|---|---|---|---|
| 0000405200 | 6509 | 635F | 5F6D | 696C | 656E | 0201 | 011A | D2F4 |
| 0000405220 | 0703 | 002D | 0016 | 0021 | 0000 | 0B04 | 5F65 | 6D63 |
| 0000405240 | 625F | 6675 | 6566 | 0172 | 1E02 | 2101 | 05D3 | 4407 |
| 0000405260 | 1600 | 3600 | 0000 | 0400 | 650F | 635F | 5F6D | 6573 |
| 0000405300 | 5F74 | 7562 | 6666 | 7265 | 040C | 0006 | 0085 | 6206 |
| 0000405320 | 6675 | 6E5F | 016F | 1702 | 6501 | 06D3 | 3207 | 1000 |
| 0000405340 | 2700 | 0000 | 0400 | 6308 | 5F6D | 6C63 | 736F | 0165 |
| 0000405360 | 1C02 | 9701 | 08D3 | 7F07 | 1600 | 7100 | 0000 | 0400 |
| 0000405400 | 650D | 655F | 5F6D | 6573 | 5F74 | 696C | 656E | 040A |
| 0000405420 | 0006 | 0081 | 6C04 | 6E69 | 0165 | 1602 | 1601 | 0AD4 |
| 0000405440 | B107 | 1000 | A600 | 0000 | 0400 | 6507 | 5F6D | 6873 |
| 0000405460 | 776F | 040B | 0006 | 0085 | 6F05 | 6F6E | 6666 | 0201 |
| 0000405500 | 011F | D4C7 | 070C | 004A | 0016 | 003C | 0000 | 1004 |
| 0000405520 | 5F65 | 6D65 | 735F | 7465 | 645F | 7369 | 6C70 | 7961 |
| 0000405540 | 040B | 0006 | 0085 | 6F05 | 6F6E | 6666 | 0201 | 0123 |
| 0000405560 | D511 | 070D | 0028 | 0016 | 001C | 0000 | 1404 | 5F65 |
| 0000405600 | 6D65 | 675F | 7465 | 645F | 7369 | 5F70 | 7473 | 7461 |
| 0000405620 | 7375 | 0201 | 0126 | D539 | 070E | 0028 | 0016 | 001C |
| 0000405640 | 0000 | 1704 | 5F65 | 6D65 | 675F | 7465 | 655F | 6578 |
| 0000405660 | 7563 | 6974 | 6E6F | 6C5F | 6E69 | 0165 | 1B02 | 6101 |
| 0000405700 | 0FD5 | 7007 | 1600 | 6400 | 0000 | 0400 | 650C | 635F |
| 0000405720 | 5F6D | 6572 | 656C | 7361 | 0165 | 1802 | D101 | 11D5 |
| 0000405740 | 3507 | 1001 | 2A00 | 0001 | 0400 | 6309 | 5F6D | 7075 |
| 0000405760 | 6164 | 6574 | 040C | 0006 | 0085 | 6E06 | 7765 | 635F |
| 0000406000 | 0C6D | FC04 | 81FF | 0600 | 6373 | 5F72 | 6D63 | 0201 |
| 0000406020 | 0121 | D706 | 0713 | 0047 | 0016 | 0039 | 0000 | 1204 |
| 0000406040 | 5F65 | 6D63 | 735F | 7465 | 775F | 6961 | 5F74 | 6F68 |
| 0000406060 | 6B6F | 040A | 0006 | 04EA | 6804 | 6F6F | 0E6B | FA04 |
| 0000406100 | EAFF | 0804 | 6C6F | 5F64 | 6F68 | 6B6F | 0201 | 0124 |
| 0000406120 | D74D | 0715 | 0047 | 0016 | 0039 | 0000 | 1504 | 5F65 |
| 0000406140 | 6D63 | 735F | 7465 | 725F | 6C65 | 6165 | 6573 | 685F |
| 0000406160 | 6F6F | 0A6B | 0604 | EA00 | 0404 | 6F68 | 6B6F | 040E |
| 0000406200 | FFFA | 04EA | 6F08 | 646C | 685F | 6F6F | 016B | 2402 |
| 0000406220 | 9401 | 17D7 | 3007 | 1600 | 2200 | 0000 | 0400 | 6515 |
| 0000406240 | 635F | 5F6D | 6573 | 5F74 | 7865 | 6365 | 7475 | 5F65 |
| 0000406260 | 6C66 | 6761 | 040B | 0006 | 0085 | 6F05 | 6F6E | 6666 |
| 0000406300 | 0201 | 0116 | D7C4 | 0718 | 002D | 0010 | 0022 | 0000 |
| 0000406320 | 0704 | 6D63 | 695F | 696E | 0174 | 1902 | F101 | 19D7 |
| 0000406340 | 9807 | 1601 | 8C00 | 0001 | 0400 | 650A | 635F | 5F6D |
| 0000406360 | 6261 | 726F | 0C74 | FA04 | C0FF | 0600 | 5F5F | 7974 |
| 0000406400 | 6570 | 040F | FFF4 | 0085 | 5F09 | 625F | 5F78 | 7974 |
| 0000406420 | 6570 | 040D | FFE4 | 0246 | 5F07 | 705F | 6972 | 746E |
| 0000406440 | 040B | FFDC | 05A4 | 5F05 | 6C5F | 6C76 | 040D | FFE8 |
| 0000406460 | 06F1 | 5F07 | 635F | 6F6C | 6B63 | 040D | FFF6 | 00C0 |
| 0000406500 | 5F07 | 735F | 6174 | 6B63 | 040E | FFE2 | 0081 | 5F08 |
| 0000406520 | 725F | 7465 | 6176 | 0E6C | AE05 | 0509 | F600 | 0606 |
| 0000406540 | 5F5F | 7566 | 636E | 0201 | 0122 | D989 | 071C | 0178 |
| 0000406560 | 0016 | 016A | 0000 | 1304 | 5F65 | 6F6E | 6974 | 7966 |
| 0000406600 | 6E5F | 7365 | 5F74 | 656C | 6576 | 0B6C | 0604 | 8100 |
| 0000406620 | 0500 | 656C | 6576 | 0C6C | FA04 | C0FF | 0600 | 5F5F |
| 0000406640 | 7974 | 6570 | 040F | FFF4 | 0085 | 5F09 | 625F | 5F78 |
| 0000406660 | 7974 | 6570 | 040D | FFE4 | 0246 | 5F07 | 705F | 6972 |
| 0000406700 | 746E | 040B | FFDC | 05A4 | 5F05 | 6C5F | 6C76 | 040D |
| 0000406720 | FFE8 | 06F1 | 5F07 | 635F | 6F6C | 6B63 | 040D | FFF6 |
| 0000406740 | 00C0 | 5F07 | 735F | 6174 | 6B63 | 040E | FFE2 | 0081 |
| 0000406760 | 5F08 | 725F | 7465 | 6176 | 0E6C | E205 | 0509 | 1E00 |
| 0000407000 | 0607 | 5F5F | 7566 | 636E | 0201 | 0510 | 0143 | 0005 |
| 0000407020 | 0084 | 6408 | 6665 | 615F | 7474 | 1672 | DA05 | 0508 |
| 0000407040 | 8500 | 0E00 | 7365 | 6365 | 7475 | 6F69 | 5F6E | 696C |

THU MAR 14 17:42:50 1991 MEDIT.DLL PAGE 113, LINE 6609

| | | | | | | | | |
|---|---|---|---|---|---|---|---|---|
| 0000407060 | 656E | 0511 | 08DC | 0005 | 0085 | 6509 | 5F6D | 7562 |
| 0000407100 | 5F66 | 6F6E | 0512 | 0146 | 0005 | 0085 | 640A | 7369 |
| 0000407120 | 6C70 | 7961 | 635F | 056D | 000D | 1A00 | 1200 | 7E05 |
| 0000407140 | 0408 | 8500 | 0A00 | 7563 | 5F72 | 7562 | 5F66 | 6F6E |
| 0000407160 | 0511 | 009C | 0004 | 06BA | 6209 | 6675 | 745F | 6261 |
| 0000407200 | 656C | 0514 | 01E8 | 0005 | 0081 | 650C | 6964 | 5F74 |
| 0000407220 | 696C | 656E | 6E5F | 116F | 1805 | 0400 | BB00 | 0906 |
| 0000407240 | 6465 | 7469 | 6C5F | 6E69 | 0F65 | D205 | 0508 | C000 |
| 0000407260 | 0700 | 5F42 | 4678 | 6C69 | 0F65 | D605 | 0508 | C000 |
| 0000407300 | 0700 | 5F42 | 5078 | 6361 | 166B | DE05 | 0508 | 8500 |
| 0000407320 | 0E00 | 6D65 | 645F | 7369 | 5F70 | 7473 | 7461 | 7375 |
| 0000407340 | 0513 | 08E0 | 0005 | 0086 | 630B | 5F6D | 6177 | 7469 |
| 0000407360 | 735F | 6D65 | 050C | 08D4 | 0004 | 0085 | 6804 | 7076 |
| 0000407400 | 1473 | E405 | 0508 | 8500 | 0C00 | 6D63 | 775F | 6961 |
| 0000407420 | 5F74 | 6C66 | 6761 | 0513 | 08E6 | 0005 | 0085 | 630B |
| 0000407440 | 5F6D | 6E65 | 5F64 | 6C66 | 6761 | 0514 | 13AA | 0005 |
| 0000407460 | 04EA | 630C | 5F6D | 6177 | 7469 | 685F | 6F6F | 176B |
| 0000407500 | A605 | 0513 | EA00 | 0F04 | 6D63 | 725F | 6C65 | 6165 |
| 0000407520 | 6573 | 685F | 6F6F | 176B | E805 | 0508 | 8500 | 0F00 |
| 0000407540 | 6D63 | 655F | 6578 | 7563 | 6574 | 665F | 616C | 0E67 |
| 0000407560 | AE05 | 0513 | 8500 | 0600 | 6C6F | 5F64 | 6D63 | 0513 |
| 0000407600 | 0014 | 0004 | 0085 | 630B | 5F79 | 6977 | 5F6E | 6973 |
| 0000407620 | 657A | 0517 | 08EA | 0005 | 0085 | 650F | 6964 | 5F74 |
| 0000407640 | 6261 | 726F | 5F74 | 6C66 | 6761 | 0517 | 08EC | 0005 |
| 0000407660 | 0081 | 650F | 6964 | 5F74 | 656E | 7473 | 6C5F | 7665 |
| 0000407700 | 6C65 | 0512 | 08DA | 0004 | 0085 | 630A | 5F78 | 7370 |
| 0000407720 | 735F | 7A69 | 1465 | 0005 | 0000 | 8100 | 0C00 | 7842 |
| 0000407740 | 445F | 6265 | 6775 | 6F4D | 6564 | 0514 | 0000 | 0000 |
| 0000407760 | 0081 | 420C | 5F78 | 6954 | 656D | 4D73 | 646F | 0F65 |
| 0000410000 | 4005 | 0501 | 8400 | 0700 | 6D63 | 615F | 7474 | 0F72 |
| 0000410020 | 4105 | 0501 | 8400 | 0700 | 6D65 | 615F | 7474 | 1072 |
| 0000410040 | 0005 | 0000 | 8100 | 0800 | 7842 | 425F | 735F | 6769 |
| 0000410060 | 050A | 08E0 | 0004 | 06B3 | 6302 | 066D | 6465 | 7469 |
| 0000410100 | 632E | 0001 | 0058 | 004C | 0000 | 004D | 0016 | 004E |
| 0000410120 | 001B | 004F | 0026 | 0050 | 0039 | 0051 | 004C | 0053 |
| 0000410140 | 006B | 0054 | 0070 | 0055 | 0075 | 0056 | 0080 | 0057 |
| 0000410160 | 0088 | 006E | 0096 | 006F | 00AC | 0070 | 00BD | 007D |
| 0000410200 | 00C9 | 0086 | 00D9 | 0087 | 00DD | 0088 | 00E1 | 0089 |
| 0000410220 | 00E5 | 008A | 00E9 | 008B | 00ED | 008D | 00F1 | 0090 |
| 0000410240 | 0117 | 0091 | 0132 | 0092 | 0138 | 0095 | 014B | 0098 |
| 0000410260 | 0171 | 0099 | 018C | 009A | 0192 | 009D | 01A5 | 00A0 |
| 0000410300 | 01CB | 00A1 | 01E6 | 00A2 | 01EC | 00A5 | 01FF | 00A8 |
| 0000410320 | 0225 | 00A9 | 0240 | 00AA | 0246 | 00AD | 0259 | 00B0 |
| 0000410340 | 027F | 00B1 | 029A | 00B2 | 02A0 | 00B5 | 02B3 | 00B8 |
| 0000410360 | 02D9 | 00B9 | 02F4 | 00BA | 02FA | 00BD | 030D | 00C0 |
| 0000410400 | 0333 | 00C3 | 033E | 00C4 | 0357 | 00C5 | 0368 | 00C6 |
| 0000410420 | 0379 | 00DE | 0384 | 00DF | 0394 | 00E1 | 039B | 00E2 |
| 0000410440 | 03B5 | 00E3 | 03BC | 00E4 | 03D9 | 00E5 | 03E0 | 00E6 |
| 0000410460 | 03FD | 00E7 | 0404 | 00E8 | 0421 | 00E9 | 0428 | 00EA |
| 0000410500 | 0445 | 00EB | 044C | 00EC | 0469 | 00ED | 0470 | 00EE |
| 0000410520 | 048D | 00EF | 0494 | 00F0 | 04B1 | 00F1 | 04B8 | 00F2 |
| 0000410540 | 04D5 | 00F3 | 04DC | 00F4 | 04F9 | 00F5 | 0500 | 00F6 |
| 0000410560 | 051D | 00F7 | 0524 | 00F8 | 0541 | 00F9 | 0548 | 00FA |
| 0000410600 | 0565 | 00FB | 056C | 00FC | 0589 | 00FD | 0590 | 00FE |
| 0000410620 | 05AD | 00FF | 05B4 | 0100 | 05D1 | 0101 | 05D8 | 0103 |
| 0000410640 | 05E1 | 0104 | 05E7 | 6106 | 6976 | 2E6F | 0163 | 6E00 |
| 0000410660 | 7301 | F200 | 7D05 | 0200 | 7E06 | 0C00 | 7F06 | 2600 |
| 0000410700 | 8006 | 4200 | 8106 | 5E00 | 8206 | 7A00 | 8406 | 9600 |
| 0000410720 | 8506 | B000 | 8806 | CA00 | 8A06 | E700 | 8C06 | 0700 |

THU MAR 14 17:42:50 1991 MEDIT.DLL PAGE 114, LINE 6668

| | | | | | | | | |
|---|---|---|---|---|---|---|---|---|
| 0000410740 | 8D07 | 1800 | 8F07 | 2300 | 9007 | 4000 | 9107 | 5000 |
| 0000410760 | 9507 | 6500 | 9607 | 8800 | 9707 | 9E00 | 9C07 | C600 |
| 0000411000 | 9E07 | EA00 | A207 | 3A00 | A308 | 5D00 | A808 | 8000 |
| 0000411020 | AA08 | A000 | AB08 | C000 | B008 | C600 | B108 | D100 |
| 0000411040 | B208 | DC00 | B308 | E300 | B908 | ED00 | CB08 | F800 |
| 0000411060 | D108 | 0800 | D209 | 1000 | D309 | 2800 | D409 | 6200 |
| 0000411100 | E909 | 6D00 | EF09 | 7D00 | F009 | 8700 | F409 | 9000 |
| 0000411120 | F509 | 9500 | F609 | AD00 | FC09 | CB00 | FD09 | E500 |
| 0000411140 | FE09 | EA00 | 1009 | F501 | 1709 | 0501 | 180A | 1101 |
| 0000411160 | 190A | 1901 | 1A0A | 1F01 | 2C0A | 2A01 | 340A | 3A01 |
| 0000411200 | 360A | 5401 | 370A | 7601 | 380A | 8301 | 4A0A | 8E01 |
| 0000411220 | 4E0A | 9E01 | 500A | AB01 | 550A | B801 | 560A | DB01 |
| 0000411240 | 570A | FC01 | 580A | 0501 | 5D0B | 0E01 | 5E0B | 1C01 |
| 0000411260 | 600B | 2501 | 610B | 2E01 | 730B | 3901 | 7A0B | 4901 |
| 0000411300 | 7B0B | 6301 | 7C0B | 6601 | 7D0B | 7301 | 810B | 7601 |
| 0000411320 | 820B | AE01 | 860B | E601 | 870B | F401 | 880B | 0A01 |
| 0000411340 | 890C | 1801 | 8B0C | 2E01 | 8C0C | 3101 | 9F0C | 3C01 |
| 0000411360 | A70C | 4C01 | A80C | 6301 | A90C | 7601 | BB0C | 8101 |
| 0000411400 | CB0C | 9101 | CC0C | AD01 | CD0C | B501 | CE0C | D501 |
| 0000411420 | D30C | F301 | D40C | 1301 | D50D | 3401 | ED0D | 3F01 |
| 0000411440 | F00D | 5501 | F20D | 5B01 | F30D | 6901 | F60D | 6C01 |
| 0000411460 | F70D | 8801 | F80D | 9601 | FA0D | 9E01 | FB0D | A101 |
| 0000411500 | FC0D | B701 | FD0D | D301 | 100D | E102 | 160D | F702 |
| 0000411520 | 1B0D | 3F02 | 1C0E | 5302 | 1D0E | 5D02 | 1E0E | 7102 |
| 0000411540 | 220E | 7B02 | 230E | 9302 | 250E | 9C02 | 260E | A902 |
| 0000411560 | 280E | C302 | 2A0E | C602 | 2B0E | CB02 | 2C0E | D102 |
| 0000411600 | 2D0E | D702 | 2E0E | ED02 | 350E | 1B02 | 360F | 2002 |
| 0000411620 | 370F | 2502 | 380F | 2A02 | 3A0F | 2F02 | 3C0F | 5502 |
| 0000411640 | 3E0F | 6202 | 4B0F | 7002 | 520F | 8002 | 530F | 8902 |
| 0000411660 | 550F | 8F02 | 560F | 9802 | 580F | 9E02 | 5A0F | A702 |
| 0000411700 | 5B0F | AE02 | 5C0F | B902 | 5F0F | BF02 | 610F | D702 |
| 0000411720 | 670F | DC02 | 690F | E502 | 6C0F | EA02 | 720F | FD02 |
| 0000411740 | 740F | F302 | 750F | FD02 | 760F | 0002 | 7A10 | 1602 |
| 0000411760 | 8110 | 1C02 | 8210 | 2902 | 8410 | 3102 | 8510 | 6402 |
| 0000412000 | 8810 | 6702 | 8C10 | 7C02 | 8D10 | 9102 | 9410 | 9402 |
| 0000412020 | 9510 | A102 | 9710 | A902 | 9810 | B302 | 9910 | BA02 |
| 0000412040 | 9B10 | BD02 | 9C10 | D402 | 9D10 | DB02 | 9E10 | 0202 |
| 0000412060 | 9F11 | 1902 | A011 | 2002 | A111 | 2302 | A811 | 2602 |
| 0000412100 | A911 | 2D02 | B011 | 3002 | B111 | 3D02 | B311 | 4502 |
| 0000412120 | B411 | 4F02 | B511 | 7C02 | B611 | 7F02 | B811 | AF02 |
| 0000412140 | B911 | B602 | BA11 | CC02 | BB11 | F302 | BC11 | FE02 |
| 0000412160 | BF11 | 0102 | C012 | 0602 | C112 | 0902 | C812 | 3102 |
| 0000412200 | CA12 | 4302 | CB12 | 5002 | CF12 | 5802 | D112 | 6202 |
| 0000412220 | D312 | 6C02 | D412 | 9E02 | D612 | A102 | D812 | D602 |
| 0000412240 | DA12 | DF02 | DC12 | EC02 | DD12 | F502 | DE12 | FC02 |
| 0000412260 | DF12 | FF02 | E012 | 0D02 | E213 | 1002 | EA13 | 1502 |
| 0000412300 | EC13 | 2702 | EE13 | 2C02 | F513 | 3202 | F613 | 3902 |
| 0000412320 | F913 | 3C02 | FA13 | 4302 | FD13 | 4602 | FE13 | 4D02 |
| 0000412340 | 0113 | 5003 | 0213 | 5703 | 0513 | 5A03 | 0613 | 6103 |
| 0000412360 | 0913 | 6403 | 0A13 | 6B03 | 0D13 | 6E03 | 0E13 | 7503 |
| 0000412400 | 1113 | 7803 | 1213 | 7F03 | 1913 | 8203 | 1A13 | 8F03 |
| 0000412420 | 1B13 | 9703 | 1C13 | A303 | 1D13 | AC03 | 2413 | AF03 |
| 0000412440 | 2513 | BC03 | 2713 | C403 | 2813 | CE03 | 2913 | F903 |
| 0000412460 | 2A13 | FC03 | 2C13 | 2C03 | 2F14 | 2F03 | 3014 | 3403 |
| 0000412500 | 3114 | 3703 | 3314 | 6303 | 3514 | 6603 | 3714 | A003 |
| 0000412520 | 3814 | A603 | 4F14 | B303 | 5E14 | C903 | 6114 | CF03 |
| 0000412540 | 6414 | D503 | 6514 | E503 | 6814 | EE03 | 6914 | 0A03 |
| 0000412560 | 6A15 | 1803 | 6D15 | 1B03 | 7015 | 2103 | 7415 | 3403 |
| 0000412600 | 7715 | 4703 | 7A15 | 5A03 | 7B15 | 6403 | 7D15 | 8003 |

THU MAR 14 17:42:50 19⁰! MEDIT.DLL PAGE 115, LINE 6727

| | | | | | | | | |
|---|---|---|---|---|---|---|---|---|
| 0000412620 | 8215 | 9A03 | 8315 | A803 | 8715 | AB03 | 8E15 | B803 |
| 0000412640 | 8F15 | C103 | 9115 | CA03 | 9215 | D403 | 9515 | F003 |
| 0000412660 | 9715 | FD03 | 9815 | 0803 | 9A16 | 2403 | 9B16 | 2A03 |
| 0000412700 | 9D16 | 7A03 | 9F16 | 1203 | A017 | 4C03 | A117 | 5C03 |
| 0000412720 | A217 | 7803 | A317 | 8E03 | A417 | A403 | A517 | AE03 |
| 0000412740 | A917 | CA03 | AA17 | D703 | AB17 | F303 | AD17 | FD03 |
| 0000412760 | AE17 | 0303 | B018 | 0D03 | B118 | 2803 | B818 | 2E03 |
| 0000413000 | BA18 | 6603 | BC18 | 8103 | C018 | D103 | C218 | 6903 |
| 0000413020 | C419 | 7603 | C819 | 7903 | CB19 | AF03 | CC19 | E503 |
| 0000413040 | CD19 | F603 | CF19 | 0003 | D31A | 1C03 | D61A | 2603 |
| 0000413060 | D71A | 4203 | D81A | 5203 | D91A | 7103 | DB1A | 8003 |
| 0000413100 | DD1A | 9103 | DF1A | 9B03 | E01A | A103 | E11A | A703 |
| 0000413120 | E21A | AD03 | E31A | B303 | E51A | D103 | E71A | F803 |
| 0000413140 | E81A | FB03 | EA1A | 0403 | EC1B | 0E03 | ED1B | 1403 |
| 0000413160 | EE1B | 1A03 | EF1B | 2003 | F01B | 2603 | F21B | 4403 |
| 0000413200 | F41B | 6B03 | F61B | 6E03 | F71B | 7403 | F91B | 8503 |
| 0000413220 | FB1B | 8F03 | FC1B | 9503 | FD1B | 9B03 | FE1B | A103 |
| 0000413240 | FF1B | A703 | 011B | C504 | 031B | EC04 | 061B | EF04 |
| 0000413260 | 081B | 1F04 | 0A1C | 2904 | 0B1C | 2F04 | 0C1C | 3504 |
| 0000413300 | 0D1C | 3B04 | 0E1C | 4104 | 101C | 5F04 | 121C | 8604 |
| 0000413320 | 141C | 8904 | 151C | 8F04 | 171C | 9904 | 181C | B404 |
| 0000413340 | 1C1C | BA04 | 1E1C | CE04 | 211C | D104 | 271C | E904 |
| 0000413360 | 281C | 0704 | 2F1D | 1B04 | 301D | 4204 | 361D | 4B04 |
| 0000413400 | 381D | 5504 | 391D | 5F04 | 3A1D | 8904 | 3B1D | 9304 |
| 0000413420 | 3C1D | BD04 | 3D1D | C604 | 3E1D | DC04 | 421D | DF04 |
| 0000413440 | 461D | FE04 | 4B1D | 1E04 | 4C1E | 2E04 | 501E | 3104 |
| 0000413460 | 511E | 4104 | 541E | 4404 | 571E | 4704 | 581E | 5B04 |
| 0000413500 | 5B1E | 5E04 | 5C1E | 6C04 | 5F1E | 6F04 | 601E | C704 |
| 0000413520 | 611E | 1F04 | 651F | 2804 | 671F | 3104 | 681F | 4D04 |
| 0000413540 | 691F | ED04 | 6A1F | F604 | 051F | 7562 | 2E66 | 0163 |
| 0000413560 | DF00 | 7D02 | 0400 | 8520 | 1400 | 8620 | 1E00 | 8820 |
| 0000413600 | 2400 | 8920 | 2900 | 8A20 | 3500 | 8B20 | 4A00 | 8D20 |
| 0000413620 | 5700 | 8E20 | 5F00 | 9120 | 6200 | 9220 | 6500 | 9320 |
| 0000413640 | 7600 | 9620 | 7900 | 9720 | 7C00 | 9920 | 9100 | 9B20 |
| 0000413660 | 9400 | 9C20 | AF00 | 9D20 | C500 | 9F20 | EF00 | A020 |
| 0000413700 | 4900 | A221 | 4F00 | A521 | 5200 | A621 | D100 | A921 |
| 0000413720 | D700 | AB21 | 0A00 | AD22 | 1000 | AE22 | 1600 | BE22 |
| 0000413740 | 2100 | BF22 | 3100 | C222 | C400 | C622 | DD00 | C722 |
| 0000413760 | F100 | C922 | 0800 | CA23 | 1F00 | CB23 | 2500 | D023 |
| 0000414000 | 2D00 | D123 | AA00 | E423 | B500 | E523 | CB00 | E623 |
| 0000414020 | 5E00 | EE24 | 6400 | EF24 | C700 | 0124 | D501 | 0224 |
| 0000414040 | EB01 | 0324 | 7E01 | 0425 | FC01 | 1B25 | 0801 | 1C26 |
| 0000414060 | 1E01 | 1E26 | B101 | 1F26 | C401 | 2026 | F901 | 2226 |
| 0000414100 | 1301 | 2327 | 2D01 | 2627 | 4101 | 2727 | 5201 | 2927 |
| 0000414120 | 5901 | 2A27 | BC01 | 3D27 | CA01 | 3E27 | E001 | 4027 |
| 0000414140 | 7301 | 4228 | 9601 | 4328 | AD01 | 4428 | B001 | 4528 |
| 0000414160 | B301 | 4728 | 3101 | 5629 | 3D01 | 5729 | 4D01 | 5A29 |
| 0000414200 | E001 | 5B29 | F601 | 5D29 | 7301 | 5E2A | 7801 | 5F2A |
| 0000414220 | 8101 | 612A | 9501 | 622A | D001 | 632A | D301 | 642A |
| 0000414240 | D601 | 652A | DF01 | 682A | 5C01 | 6A2B | 7001 | 6B2B |
| 0000414260 | 8701 | 6C2B | 8A01 | 6D2B | 8D01 | 6E2B | 9601 | 702B |
| 0000414300 | 1301 | 712C | 4501 | 722C | C201 | 732C | FF01 | 742C |
| 0000414320 | 7C01 | 752D | 9C01 | 762D | AB01 | 772D | B601 | 782D |
| 0000414340 | C101 | 792D | CC01 | 7A2D | D701 | 7B2D | E201 | 7C2D |
| 0000414360 | ED01 | 7D2D | F801 | 7E2D | 0C01 | 7F2E | 1701 | 812E |
| 0000414400 | 2001 | 822E | 9D01 | 952E | A801 | 962E | BE01 | 9D2E |
| 0000414420 | 5C01 | 9E2F | 6201 | 9F2F | 6E01 | A62F | 7501 | AB2F |
| 0000414440 | 0D01 | AC30 | 1401 | AE30 | 2401 | AF30 | 2D01 | B430 |
| 0000414460 | B401 | B630 | DE01 | B730 | F401 | B930 | F701 | BB30 |

THU MAR 14 17:42:50 1991 MEDIT.DLL PAGE 116, LINE 6786

| | | | | | | | | |
|---|---|---|---|---|---|---|---|---|
| 0000414500 | 0001 | BC31 | 0B01 | BE31 | 1501 | BF31 | 1A01 | C031 |
| 0000414520 | 2901 | C231 | 2E01 | C431 | B501 | D931 | C301 | DA31 |
| 0000414540 | D301 | E031 | 7101 | E132 | 7701 | E232 | 8301 | E532 |
| 0000414560 | 8A01 | F032 | 9001 | F132 | 9701 | F332 | A701 | F432 |
| 0000414600 | B001 | F832 | 3701 | F933 | 3D01 | FB33 | 4301 | FD33 |
| 0000414620 | 6D01 | FF33 | 8A01 | 0033 | A402 | 0333 | 2B02 | 0534 |
| 0000414640 | 7202 | 0634 | 7F02 | 0834 | 0602 | 0A35 | 2602 | 0C35 |
| 0000414660 | 6302 | 0E35 | 8B02 | 0F35 | 8E02 | 1235 | A302 | 1535 |
| 0000414700 | B802 | 1735 | ED02 | 1835 | FB02 | 1C35 | 1102 | 1D36 |
| 0000414720 | 4702 | 1E36 | 5D02 | 2036 | 6002 | 2236 | 7302 | 2336 |
| 0000414740 | 8002 | 2536 | 8802 | 2736 | BA02 | 2836 | E502 | 2A36 |
| 0000414760 | 6C02 | 2C37 | A002 | 2D37 | A402 | 3037 | A702 | 3137 |
| 0000415000 | BE02 | 3337 | D502 | 3537 | DB02 | 3737 | E402 | 3937 |
| 0000415020 | EF02 | 3B37 | 7602 | 4F38 | 8102 | 5038 | 9702 | 5438 |
| 0000415040 | 2A02 | 5539 | 3302 | 5839 | B002 | 5939 | CB02 | 5C39 |
| 0000415060 | E602 | 5D39 | EF02 | 5F39 | F702 | 6139 | 0202 | 623A |
| 0000415100 | 1902 | 633A | 3402 | 663A | 3902 | 6A3A | 3F02 | 6B3A |
| 0000415120 | 5E02 | 6C3A | 8202 | 6E3A | 8E02 | 6F3A | 9802 | 713A |
| 0000415140 | 9D02 | 743A | A202 | 753A | 1F02 | 883B | 2D02 | 893B |
| 0000415160 | 3D02 | 8A3B | D002 | 8B3B | D902 | 8C3B | 5602 | 8D3C |
| 0000415200 | 6902 | 8E3C | 7D02 | 8F3C | FA02 | A43C | 0502 | A53D |
| 0000415220 | 1B02 | A63D | AE02 | A73D | 4C02 | BB3E | 5802 | BC3E |
| 0000415240 | 6E02 | BE3E | 0102 | BF3F | 1B02 | C03F | 5802 | C13F |
| 0000415260 | BB02 | C23F | DB02 | C33F | 3E02 | D540 | 4C02 | D640 |
| 0000415300 | 6202 | D740 | 7702 | EA40 | 8502 | EB40 | 9B02 | EE40 |
| 0000415320 | 2E02 | EF41 | 4502 | F141 | C202 | F341 | D602 | F441 |
| 0000415340 | 1102 | F542 | 1402 | F742 | 1702 | F842 | 2002 | F942 |
| 0000415360 | 9D02 | FB42 | A002 | FC42 | A902 | FF42 | 2602 | 1743 |
| 0000415400 | 3403 | 1843 | 4A03 | 1B43 | DD03 | 1C43 | F303 | 1D43 |
| 0000415420 | 0203 | 1F44 | 7F03 | 2044 | 8703 | 2144 | 9B03 | 2344 |
| 0000415440 | B203 | 2444 | EA03 | 2544 | 0503 | 2645 | 8203 | 2745 |
| 0000415460 | B203 | 2945 | B803 | 2A45 | BB03 | 2B45 | 3803 | 4046 |
| 0000415500 | 4603 | 4146 | 5C03 | 4546 | EF03 | 4646 | 0503 | 4747 |
| 0000415520 | 1D03 | 4847 | 2003 | 4A47 | 2E03 | 4B47 | 9103 | 6247 |
| 0000415540 | 9F03 | 6347 | B503 | 6747 | 4803 | 6848 | 5103 | 6D48 |
| 0000415560 | CE03 | 6F48 | DF03 | 7048 | E903 | 7848 | FB03 | 7A48 |
| 0000415600 | 1B03 | 7D49 | 3B03 | 7E49 | 7F03 | 7F49 | 8203 | 8049 |
| 0000415620 | C703 | 8149 | 4403 | 824A | 4703 | 834A | 5C03 | 844A |
| 0000415640 | 5F03 | 854A | 8503 | 874A | 0203 | 884B | 0503 | 894B |
| 0000415660 | 1003 | 8A4B | 8D03 | 9D4B | 9B03 | 9E4B | B103 | A54B |
| 0000415700 | 4403 | A64C | 4F03 | A74C | CC03 | A84C | E703 | AA4C |
| 0000415720 | 6503 | AC4D | 6E03 | AD4D | 7703 | B24D | F403 | B34D |
| 0000415740 | FF03 | B44D | 2003 | B64E | 9E03 | B84E | C103 | BA4E |
| 0000415760 | 3F03 | BB4F | 5E03 | BD4F | DB03 | BF4F | E603 | C14F |
| 0000416000 | 1203 | C250 | 2003 | C550 | 9E03 | C650 | B603 | C850 |
| 0000416020 | BF03 | C950 | 3C03 | DC51 | 4A03 | DD51 | 6003 | E451 |
| 0000416040 | F303 | E551 | FE03 | E651 | 1C03 | E752 | 3703 | E952 |
| 0000416060 | B403 | ED52 | BD03 | EE52 | C803 | EF52 | E903 | F152 |
| 0000416100 | 6703 | F353 | 8A03 | F553 | 0803 | F654 | 2703 | F754 |
| 0000416120 | A403 | F854 | AF03 | F954 | C703 | FA54 | 4403 | 0D55 |
| 0000416140 | 5204 | 0E55 | 6804 | 1155 | FB04 | 1255 | 1B04 | 1456 |
| 0000416160 | 9804 | 1556 | BD04 | 1756 | 3A04 | 1957 | 4E04 | 1A57 |
| 0000416200 | CB04 | 2557 | D904 | 2657 | E904 | 2957 | 7C04 | 2A58 |
| 0000416220 | 8204 | 2B58 | A104 | 2C58 | B504 | 2D58 | B804 | 2E58 |
| 0000416240 | C204 | 2F58 | 2504 | 4359 | 3004 | 4959 | 4604 | 4B59 |
| 0000416260 | 5104 | 4C59 | 5B04 | 4E59 | 6D04 | 5059 | 7804 | 5259 |
| 0000416300 | 8E04 | 5359 | B004 | 5459 | C004 | 5659 | CD04 | 5859 |
| 0000416320 | D604 | 5959 | EA04 | 5A59 | EF04 | 5B59 | F204 | 5C59 |
| 0000416340 | 0304 | 5F5A | 0E04 | 625A | 1804 | 635A | 2404 | 645A |

THU MAR 14 17:42:50 1991 MEDIT.DLL PAGE 117, LINE 6845

| | | | | | | | | |
|---|---|---|---|---|---|---|---|---|
| 0000416360 | 2E04 | 6A5A | 3404 | 6C5A | 5D04 | 6D5A | 6A04 | 6F5A |
| 0000416400 | 6D04 | 705A | 7C04 | 715A | 8604 | 725A | AD04 | 735A |
| 0000416420 | BE04 | 765A | C804 | 785A | E104 | 795A | F304 | 7A5A |
| 0000416440 | F904 | 8C5A | 0704 | 8D5B | 1D04 | 8E5B | B004 | 8F5B |
| 0000416460 | DF04 | 905B | E804 | 915B | F104 | 935B | FC04 | 945B |
| 0000416500 | 0504 | 955C | 0A04 | 965C | 6D04 | A85C | 7B04 | A95C |
| 0000416520 | 9104 | AA5C | 2404 | AB5D | 2904 | AD5D | 3904 | B15D |
| 0000416540 | 6A04 | B25D | 8804 | B35D | 9404 | B45D | 9904 | B55D |
| 0000416560 | 9C04 | B85D | B504 | B95D | DC04 | BB5D | E104 | BC5D |
| 0000416600 | E404 | C65D | E704 | C85D | EA04 | C95D | F304 | CA5D |
| 0000416620 | 0404 | CB5E | 0704 | CC5E | 1304 | CD5E | 1E04 | CE5E |
| 0000416640 | 2304 | CF5E | 8604 | E55E | 9404 | E65E | A404 | EA5E |
| 0000416660 | 3704 | ED5F | 4104 | EE5F | 4D04 | EF5F | 5704 | F15F |
| 0000416700 | D404 | F45F | E004 | F55F | EA04 | F75F | FC04 | FA5F |
| 0000416720 | 0704 | FC60 | 1D04 | FD60 | 3F04 | FE60 | 4F04 | 0160 |
| 0000416740 | 5C05 | 0360 | 6505 | 0460 | 7405 | 0560 | 7E05 | 0660 |
| 0000416760 | 8E05 | 0760 | 9F05 | 0A60 | A905 | 0C60 | C205 | 0E60 |
| 0000417000 | D405 | 0F60 | 5105 | 1B61 | 5C05 | 1C61 | 6C05 | 1F61 |
| 0000417020 | FF05 | 2061 | 5F05 | 2262 | 0205 | 2363 | 0D05 | 2563 |
| 0000417040 | 1905 | 2763 | 2205 | 2863 | 2805 | 2963 | 4005 | 2C63 |
| 0000417060 | 4A05 | 2D63 | 5005 | 2F63 | 6105 | 3263 | 6B05 | 3363 |
| 0000417100 | 8A05 | 3463 | A805 | 3763 | B505 | 3863 | BA05 | 3A63 |
| 0000417120 | C705 | 3B63 | 4405 | 4664 | 4F05 | 4764 | 5F05 | 4C64 |
| 0000417140 | F205 | 4D64 | 0B05 | 4F65 | 1805 | 5065 | 3A05 | 5165 |
| 0000417160 | B705 | 5365 | [illegible] | 5465 | C505 | 5565 | D905 | 5665 |
| 0000417200 | DF05 | 5765 | F105 | 5965 | FB05 | 5A65 | 7805 | 6F66 |
| 0000417220 | 8305 | 7A66 | 9905 | 7C66 | C105 | 7E66 | CA05 | 7F66 |
| 0000417240 | EC05 | 9166 | FA05 | 9266 | 1005 | 9467 | 4B05 | 9567 |
| 0000417260 | 5D05 | 9667 | 7405 | 9767 | 8F05 | 9867 | 9505 | AB67 |
| 0000417300 | A105 | AC67 | B105 | B267 | 4405 | B668 | 9405 | B768 |
| 0000417320 | C005 | B868 | DA05 | BA68 | 5705 | BB69 | A305 | BC69 |
| 0000417340 | 2005 | BD6A | 2305 | BE6A | 4105 | BF6A | 7B05 | C16A |
| 0000417360 | A205 | C26A | A505 | C86A | BA05 | C96A | E205 | CB6A |
| 0000417400 | 3205 | CD6B | 5A05 | D36B | 6D05 | D46B | 8305 | D56B |
| 0000417420 | 9405 | D96B | 9905 | DA6B | AF05 | DC6B | BD05 | DD6B |
| 0000417440 | C205 | DE6B | C505 | DF6B | D405 | E26B | E205 | E46B |
| 0000417460 | EC05 | E56B | F105 | E66B | 0005 | E76C | 0505 | E86C |
| 0000417500 | 2905 | EB6C | 3505 | EC6C | B205 | FE6C | BD05 | FF6C |
| 0000417520 | D305 | 056C | 6606 | 076D | 9A06 | 0A6D | 1706 | 0C6E |
| 0000417540 | 4406 | 0D6E | 6B06 | 0F6E | B906 | 106E | F006 | 176E |
| 0000417560 | 0306 | 186F | 1906 | 196F | 2A06 | 1C6F | 2F06 | 1D6F |
| 0000417600 | 4506 | 1E6F | 5206 | 216F | 6006 | 236F | 7506 | 256F |
| 0000417620 | 7F06 | 266F | 8906 | 276F | 8E06 | 286F | 9306 | 296F |
| 0000417640 | B706 | 2B6F | C306 | 2C6F | 4006 | 4070 | 4E06 | 4170 |
| 0000417660 | 6406 | 4270 | F706 | 4370 | 0006 | 4571 | 7D06 | 4671 |
| 0000417700 | 1706 | 5072 | 2506 | 5172 | 3506 | 5372 | C806 | 5472 |
| 0000417720 | D706 | 5572 | 5406 | 6773 | 5F06 | 6A73 | 7506 | 6B73 |
| 0000417740 | 0E06 | 6C73 | B406 | 6D73 | BD06 | 6F73 | C306 | 7073 |
| 0000417760 | CC06 | 8473 | DA06 | 8573 | F006 | 8673 | 8306 | 8774 |
| 0000420000 | 2306 | 8875 | 2A06 | 8975 | 3606 | 8A75 | 4706 | 8B75 |
| 0000420020 | 7C06 | 8C75 | F906 | 8D75 | 2606 | 8E76 | 7B06 | 8F76 |
| 0000420040 | F806 | A376 | 0606 | A477 | 1C06 | A577 | AF06 | A677 |
| 0000420060 | A206 | A778 | AD06 | A978 | 2A06 | AB79 | 3606 | AD79 |
| 0000420100 | 4206 | AE79 | 4506 | AF79 | 4A06 | B179 | 4D06 | B279 |
| 0000420120 | 5006 | B379 | 7406 | B479 | 7706 | B579 | 7A06 | B679 |
| 0000420140 | F706 | CA79 | 0506 | CB7A | 1B06 | CC7A | AE06 | CE7A |
| 0000420160 | B406 | CF7A | BF06 | D17A | 3C06 | D37B | 4706 | D47B |
| 0000420200 | 4D06 | D67B | 5906 | D87B | 6506 | D97B | 6E06 | DA7B |
| 0000420220 | 7406 | DC7B | 9B06 | DD7B | AF06 | DF7B | B506 | E07B |

THU MAR 14 17:42:50 1991 MEDIT.DLL PAGE 118, LINE 6904

| | | | | | | | | |
|---|---|---|---|---|---|---|---|---|
| 0000420240 | B806 | E17B | BD06 | E47B | C006 | E57B | C306 | E67B |
| 0000420260 | E406 | E77B | E706 | E87B | EA06 | E97B | F006 | EA7B |
| 0000420300 | 1706 | EB7C | 9406 | FF7C | A206 | 007C | B807 | 027C |
| 0000420320 | 4B07 | 037D | 6307 | 057D | E007 | 067D | EC07 | 077D |
| 0000420340 | F007 | 097D | 2607 | 0A7E | 2907 | 0C7E | 2D07 | 0D7E |
| 0000420360 | 6007 | 0F7E | DD07 | 237E | EB07 | 247E | 0107 | 277F |
| 0000420400 | 9407 | 2A7F | 8407 | 2C80 | 8F07 | 2D80 | A107 | 2F80 |
| 0000420420 | AC07 | 3080 | BD07 | 3180 | C807 | 3280 | CD07 | 3480 |
| 0000420440 | D007 | 3580 | EC07 | 3980 | 0C07 | 3A81 | 2607 | 3D81 |
| 0000420460 | 3607 | 3E81 | 4607 | 3F81 | 4C07 | 4281 | 5C07 | 4481 |
| 0000420500 | 7107 | 4581 | 8C07 | 4781 | 9C07 | 4981 | A607 | 4B81 |
| 0000420520 | CD07 | 4C81 | F807 | 4D81 | 0907 | 5082 | 1307 | 5282 |
| 0000420540 | 9007 | 6582 | 9E07 | 6682 | B407 | 6782 | 4707 | 6883 |
| 0000420560 | E707 | 6983 | F407 | 6A83 | 7107 | 7584 | 7F07 | 7984 |
| 0000420600 | 8F07 | 7A84 | B507 | 7B84 | EE07 | 7C84 | F407 | 7D84 |
| 0000420620 | F707 | 7F84 | 0D07 | 9185 | 1807 | 9285 | 2E07 | 9385 |
| 0000420640 | C107 | 9485 | 1107 | 9586 | 2C07 | 9686 | A907 | 9886 |
| 0000420660 | AC07 | 9986 | C207 | 9A86 | D407 | 9B86 | FE07 | 9C86 |
| 0000420700 | 7B07 | 9D87 | 7E07 | 9F87 | 5007 | B388 | 5E07 | B488 |
| 0000420720 | 6E07 | B588 | 0107 | B689 | 0A07 | B789 | 1007 | B989 |
| 0000420740 | 8D07 | BA89 | 9007 | BB89 | 0D07 | CD8A | 1807 | CE8A |
| 0000420760 | 2807 | CF8A | BB07 | D08A | 3907 | E28B | 4407 | E38B |
| 0000421000 | 5A07 | E48B | 6507 | EC8B | 7107 | ED8B | 8707 | EE8B |
| 0000421020 | A207 | 048B | AE08 | 098B | BE08 | 0A8B | C708 | 0B8B |
| 0000421040 | CD08 | 268B | D808 | 278B | EE08 | 288B | 8108 | 2A8C |
| 0000421060 | D808 | 2B8C | E108 | 2D8C | 5E08 | 2E8D | 6D08 | 2F8D |
| 0000421100 | 7708 | 308D | F408 | 4B8D | 0208 | 4C8E | 1808 | 4D8E |
| 0000421120 | AB08 | 4F8E | 0208 | 508F | 0B08 | 528F | 8808 | 538F |
| 0000421140 | 9708 | 548F | A108 | 6D8F | AF08 | 6E8F | C508 | 708F |
| 0000421160 | 5808 | 7190 | 6108 | 7390 | DE08 | 7590 | F108 | 7790 |
| 0000421200 | 6E08 | 8D91 | 7C08 | 9091 | 8C08 | 9191 | A208 | A891 |
| 0000421220 | AD08 | A991 | C308 | AD91 | 5608 | AE92 | 6A08 | B092 |
| 0000421240 | 7C08 | B292 | F908 | C592 | 0508 | C793 | 1B08 | C893 |
| 0000421260 | 2508 | C993 | 2F08 | CD93 | 3908 | CE93 | 4208 | D093 |
| 0000421300 | 5C08 | D293 | 7D08 | D493 | 9A08 | D593 | BB08 | DD93 |
| 0000421320 | BE08 | DF93 | DF08 | E093 | FA08 | E293 | 0508 | E794 |
| 0000421340 | 0F08 | E994 | 3B08 | EC94 | 5308 | ED94 | 5908 | 0894 |
| 0000421360 | 6373 | 6572 | 6E65 | 632E | 0001 | 0121 | 0059 | 9468 |
| 0000421400 | 005C | 947E | 005D | 9491 | 005E | 9496 | 0060 | 94A9 |
| 0000421420 | 0076 | 94B5 | 0079 | 94CB | 007A | 94DE | 007D | 94E7 |
| 0000421440 | 007E | 94EC | 007F | 94F8 | 0081 | 9500 | 0084 | 9503 |
| 0000421460 | 0085 | 9508 | 0086 | 950D | 0089 | 9519 | 008B | 952C |
| 0000421500 | 00A1 | 953A | 00A4 | 9550 | 00A5 | 9563 | 00A6 | 9568 |
| 0000421520 | 00A8 | 957B | 00BA | 9587 | 00BD | 9597 | 00BE | 95C9 |
| 0000421540 | 00BF | 95D4 | 00C0 | 9635 | 00C1 | 964E | 00C2 | 96B5 |
| 0000421560 | 00D9 | 96C0 | 00DA | 96D0 | 00DB | 96FE | 00EE | 9709 |
| 0000421600 | 00F5 | 971F | 00FD | 9739 | 00FF | 975E | 0100 | 9778 |
| 0000421620 | 0101 | 9781 | 0105 | 9784 | 0106 | 979A | 0107 | 97A3 |
| 0000421640 | 0108 | 97C5 | 0109 | 97E8 | 010A | 97EB | 010C | 980A |
| 0000421660 | 010F | 9841 | 0110 | 9850 | 0111 | 985A | 0112 | 9869 |
| 0000421700 | 0113 | 9873 | 0115 | 98DA | 0116 | 98DD | 0118 | 98E2 |
| 0000421720 | 0119 | 98F8 | 011A | 990E | 011C | 992F | 0133 | 993B |
| 0000421740 | 013B | 994B | 013D | 9965 | 013E | 997F | 013F | 998A |
| 0000421760 | 0140 | 99E4 | 0141 | 99F5 | 0143 | 9A5C | 0144 | 9A5F |
| 0000422000 | 0148 | 9AB3 | 014A | 9AB6 | 014B | 9B12 | 014C | 9B72 |
| 0000422020 | 015E | 9B7D | 0162 | 9B93 | 0163 | 9BB1 | 0164 | 9BD7 |
| 0000422040 | 0165 | 9BED | 0166 | 9C03 | 0167 | 9C12 | 0168 | 9C1C |
| 0000422060 | 0169 | 9C26 | 016B | 9C86 | 016C | 9CA7 | 017F | 9CB3 |
| 0000422100 | 0181 | 9CC9 | 0183 | 9CEE | 0185 | 9CFB | 0186 | 9D06 |

THU MAR 14 17:42:50 1991 MEDIT.DLL PAGE 119, LINE 6963

| | | | | | | | | |
|---|---|---|---|---|---|---|---|---|
| 0000422120 | 0188 | 9D09 | 018C | 9D0F | 018D | 9D20 | 018F | 9D23 |
| 0000422140 | 0190 | 9D46 | 0191 | 9D5C | 0194 | 9D83 | 0196 | 9D92 |
| 0000422160 | 0197 | 9DB5 | 0198 | 9DC0 | 0199 | 9DE7 | 019C | 9DF8 |
| 0000422200 | 01B4 | 9DFB | 01B5 | 9E0A | 01B6 | 9E0F | 01B7 | 9E31 |
| 0000422220 | 01BA | 9E58 | 01BB | 9E5B | 01BC | 9E83 | 01BE | 9EAA |
| 0000422240 | 01C0 | 9EB1 | 01C1 | 9EB4 | 01C2 | 9EC3 | 01C4 | 9EC8 |
| 0000422260 | 01C9 | 9ECF | 01CD | 9ED2 | 01CE | 9F06 | 01D0 | 9F09 |
| 0000422300 | 01D2 | 9F2C | 01D4 | 9F62 | 01D5 | 9F89 | 01D7 | 9F9A |
| 0000422320 | 01DB | 9F9D | 01DD | 9FC5 | 01DF | 9FEC | 01E0 | 9FEF |
| 0000422340 | 01E1 | 9FFE | 01E3 | A01D | 01E7 | A020 | 01E8 | A047 |
| 0000422360 | 01EC | A04A | 01ED | A071 | 01F9 | A074 | 01FA | A08D |
| 0000422400 | 01FB | A0B4 | 01FC | A0BF | 0201 | A0C2 | 0203 | A101 |
| 0000422420 | 0204 | A10C | 0205 | A133 | 0206 | A136 | 0207 | A141 |
| 0000422440 | 020A | A144 | 020B | A14B | 020C | A172 | 020D | A17C |
| 0000422460 | 020F | A17F | 0210 | A186 | 0211 | A1AD | 0212 | A1B7 |
| 0000422500 | 0215 | A1BA | 0216 | A1D8 | 021B | A1F6 | 021C | A22A |
| 0000422520 | 021E | A22D | 0220 | A230 | 0221 | A259 | 0223 | A25E |
| 0000422540 | 0235 | A26C | 0237 | A27C | 0238 | A2A4 | 0239 | A2AE |
| 0000422560 | 023A | A2DD | 023B | A2E7 | 023C | A2EA | 023E | A2F4 |
| 0000422600 | 0240 | A322 | 0255 | A32D | 0256 | A33D | 0257 | A398 |
| 0000422620 | 0258 | A3A9 | 0259 | A410 | 026B | A41B | 026D | A42B |
| 0000422640 | 026E | A442 | 026F | A44D | 0270 | A4BB | 0271 | A4DF |
| 0000422660 | 0273 | A546 | 0285 | A551 | 0286 | A567 | 0287 | A56C |
| 0000422700 | 029A | A578 | 029B | A58E | 029C | A5B0 | 02B0 | A5BE |
| 0000422720 | 02B1 | A5D4 | 02B2 | A608 | 02C5 | A616 | 02C6 | A62C |
| 0000422740 | 02CB | A630 | 02CC | A669 | 02CD | A673 | 02CE | A676 |
| 0000422760 | 02CF | A680 | 02D0 | A69D | 02D1 | A6C1 | 02D2 | A6DF |
| 0000423000 | 02D3 | A746 | 02E6 | A754 | 02F0 | A764 | 02F1 | A769 |
| 0000423020 | 02F2 | A772 | 02F4 | A778 | 02F5 | A7AA | 02F7 | A7AD |
| 0000423040 | 02F9 | A7E0 | 02FB | A7E3 | 02FC | A81D | 02FE | A820 |
| 0000423060 | 0300 | A85B | 0302 | A85E | 0303 | A873 | 0305 | A876 |
| 0000423100 | 0308 | A8EF | 030A | A8F2 | 030C | A908 | 030D | A90B |
| 0000423120 | 030E | A931 | 030F | A93A | 0311 | A96E | 0312 | A971 |
| 0000423140 | 0314 | A977 | 0316 | A9AC | 0317 | A9DF | 0319 | A9E2 |
| 0000423160 | 031B | AA1F | 031E | AA5D | 031F | AA73 | 0320 | AA76 |
| 0000423200 | 0321 | AA9A | 0322 | AAA3 | 0324 | AAD7 | 0325 | AADC |
| 0000423220 | 0339 | AAE7 | 0344 | AAF7 | 0346 | AB11 | 0347 | AB6D |
| 0000423240 | 0348 | ABC9 | 0349 | ABD8 | 034E | ABDD | 034F | ABEC |
| 0000423260 | 0351 | ABF1 | 035E | ABFC | 0363 | AC0C | 0365 | AC15 |
| 0000423300 | 0366 | AC22 | 0368 | AC51 | 0369 | AC54 | 036A | AC61 |
| 0000423320 | 037C | AC6C | 037D | AC7C | 037E | AC82 | 037F | AC88 |
| 0000423340 | 0380 | AC9E | 0382 | ACB4 | 0383 | ACBF | 0384 | ACCE |
| 0000423360 | 0387 | ACD1 | 038A | AD0F | 038C | AD4E | 038D | AD80 |
| 0000423400 | 038F | ADB2 | 0391 | ADE3 | 0392 | AE12 | 0394 | AE43 |
| 0000423420 | 0399 | AE72 | 039A | AECE | 039B | AED3 | 039C | AEDE |
| 0000423440 | 039E | AEFD | 03A1 | AF37 | 03B7 | AF42 | 03B8 | AF58 |
| 0000423460 | 03B9 | AF7C | 03BA | AF82 | 03BB | AFAF | 03BC | AFC4 |
| 0000423500 | 03C0 | AFC9 | 03C1 | AFEA | 03C2 | AFF9 | 03C4 | AFFE |
| 0000423520 | 03C7 | B004 | 03DF | B012 | 03E0 | B028 | 03E1 | B05A |
| 0000423540 | 03E3 | B080 | 03F5 | B08E | 03F6 | B09E | 03F7 | B0D8 |
| 0000423560 | 0409 | B0E3 | 040A | B0F9 | 040B | B122 | 040C | B13F |
| 0000423600 | 7409 | 5F77 | 6C63 | 7069 | 632E | 0001 | 010A | 0075 |
| 0000423620 | B14C | 0077 | B15C | 0078 | B162 | 007A | B168 | 007B |
| 0000423640 | B177 | 007C | B17D | 007E | B183 | 0080 | B188 | 0081 |
| 0000423660 | B1AD | 0084 | B1D9 | 0085 | B20D | 0087 | B250 | 0089 |
| 0000423700 | B264 | 008B | B26A | 00A1 | B275 | 00A2 | B285 | 00A3 |
| 0000423720 | B2A6 | 00A4 | B2AF | 00A5 | B2B4 | 00A6 | B2B9 | 00A7 |
| 0000423740 | B2BC | 00A8 | B2CD | 00A9 | B2D5 | 00AA | B2E9 | 00AB |
| 0000423760 | B2EF | 00BF | B2FA | 00C0 | B30A | 00C1 | B314 | 00C2 |

THU MAR 14 17:42:50 1991 MEDIT.DLL PAGE 120, LINE 7022

| | | | | | | | | |
|---|---|---|---|---|---|---|---|---|
| 0000424000 | B321 | 00C3 | B327 | 00C4 | B32D | 00C5 | B343 | 00C6 |
| 0000424020 | B359 | 00C8 | B35F | 00C9 | B365 | 00DE | B370 | 00DF |
| 0000424040 | B380 | 00E0 | B413 | 00E3 | B418 | 00E4 | B422 | 00ED |
| 0000424060 | B49F | 00EE | B4B7 | 00F0 | B4BE | 00F1 | B4D3 | 00F2 |
| 0000424100 | B4DA | 00F3 | B4EF | 00F9 | B4F6 | 00FA | B502 | 00FB |
| 0000424120 | B518 | 00FC | B51B | 00FE | B531 | 00FF | B53D | 0100 |
| 0000424140 | B553 | 0102 | B558 | 0103 | B55B | 0105 | B571 | 0106 |
| 0000424160 | B57C | 0107 | B59A | 010D | B5D4 | 010F | B5DF | 0110 |
| 0000424200 | B5E4 | 0111 | B5FC | 0112 | B619 | 0114 | B61E | 0115 |
| 0000424220 | B642 | 0117 | B64E | 0119 | B655 | 011A | B6D2 | 012C |
| 0000424240 | B6DD | 012D | B6ED | 012F | B6F7 | 0132 | B70C | 0133 |
| 0000424260 | B712 | 014A | B71D | 014E | B733 | 0150 | B746 | 0152 |
| 0000424300 | B75E | 0154 | B768 | 0155 | B77A | 0157 | B7BF | 0159 |
| 0000424320 | B7D2 | 015A | B7D8 | 0170 | B7E4 | 0172 | B7F4 | 0173 |
| 0000424340 | B7FE | 0176 | B808 | 0177 | B813 | 0179 | B832 | 017A |
| 0000424360 | B845 | 017C | B85D | 017E | B867 | 017F | B879 | 0180 |
| 0000424400 | B883 | 0181 | B88A | 0182 | B89D | 0183 | B8A4 | 0184 |
| 0000424420 | B8B7 | 0187 | B8BE | 0188 | B900 | 0189 | B906 | 018A |
| 0000424440 | B90B | 018B | B91A | 018C | B91F | 018D | B943 | 018F |
| 0000424460 | B94F | 0191 | B962 | 0193 | B969 | 0194 | B96F | 01A7 |
| 0000424500 | B97A | 01A8 | B98A | 01AA | B9A8 | 01AB | B9B2 | 01AD |
| 0000424520 | B9B5 | 01AE | B9BB | 01AF | B9DF | 01B0 | B9E5 | 01B3 |
| 0000424540 | BA11 | 01B6 | BA1B | 01B7 | BA51 | 01B8 | BA57 | 01C2 |
| 0000424560 | BA62 | 01C4 | BA72 | 01C5 | BA8B | 01C6 | BA91 | 01C7 |
| 0000424600 | BA94 | 01C8 | BAC9 | 01CB | BB14 | 01CD | BB38 | 01CE |
| 0000424620 | BB3E | 01CF | BB44 | 01D0 | BB4A | 01D1 | BB50 | 01D2 |
| 0000424640 | BB56 | 01D3 | BB7A | 01D4 | BB80 | 01D7 | BBAC | 01D9 |
| 0000424660 | BBAF | 01DA | BBB5 | 01DB | BBBB | 01DC | BBC1 | 01DD |
| 0000424700 | BBC7 | 01DE | BBCD | 01DF | BBF1 | 01E0 | BBF7 | 01E4 |
| 0000424720 | BC23 | 01E5 | BC41 | 01E6 | BC47 | 01E7 | BC6E | 01EA |
| 0000424740 | BC79 | 01EB | BCA2 | 01EE | BCBA | 01F2 | BCF0 | 01F3 |
| 0000424760 | BD28 | 01F4 | BD2E | 01FB | BD39 | 01FC | BD49 | 01FD |
| 0000425000 | BD53 | 01FF | BD59 | 0200 | BD5F | 0201 | BD74 | 0202 |
| 0000425020 | BD7A | 0204 | BD97 | 0207 | BDA0 | 0208 | BDD6 | 0209 |
| 0000425040 | BDDC | 0221 | BDE7 | 0223 | BDFD | 0224 | BE08 | 0226 |
| 0000425060 | BE13 | 0229 | BE2A | 022A | BE3B | 022C | BE4C | 022E |
| 0000425100 | BE57 | 022F | BE62 | 0230 | BE6A | 0231 | BE6D | 0233 |
| 0000425120 | BE7C | 0234 | BE95 | 0236 | BEA2 | 0237 | BEAB | 0238 |
| 0000425140 | BEB3 | 0239 | BEB6 | 023A | BEC8 | 023D | BED3 | 023F |
| 0000425160 | BED6 | 0240 | BEE1 | 0241 | BEF3 | 0242 | BEFE | 0244 |
| 0000425200 | BF0B | 0245 | BFDE | 0248 | BF21 | 024A | BF2B | 024B |
| 0000425220 | BF31 | 0258 | BF3F | 025B | BF4F | 025E | BF5E | 025F |
| 0000425240 | BF69 | 0262 | BF6F | 0263 | BF87 | 0264 | BF93 | 0265 |
| 0000425260 | BF9F | 0266 | BFA2 | 0267 | BFAC | 0268 | BFB2 | 027F |
| 0000425300 | BFBD | 0283 | BFD3 | 0284 | BFD8 | 0285 | BFE3 | 0288 |
| 0000425320 | BFEE | 0289 | BFFF | 028E | C010 | 0290 | C033 | 0294 |
| 0000425340 | C04B | 0295 | C056 | 0298 | C080 | 0299 | C0C0 | 029B |
| 0000425360 | C0C9 | 029C | C0CC | 029D | C0D7 | 029E | C0E1 | 02A0 |
| 0000425400 | C0EB | 02A1 | C0EE | 02A2 | C0F5 | 02A4 | C0F8 | 02A7 |
| 0000425420 | C122 | 02A8 | C162 | 02AA | C16B | 02AB | C175 | 02AE |
| 0000425440 | C17F | 02AF | C197 | 02B1 | C1C1 | 02B2 | C1F4 | 02B3 |
| 0000425460 | C205 | 02B5 | C216 | 02B6 | C220 | 02B7 | C223 | 02BA |
| 0000425500 | C226 | 02BC | C250 | 02BD | C288 | 02BE | C28E | 02C0 |
| 0000425520 | C294 | 02C1 | C297 | 02C2 | C29A | 02C3 | C2A5 | 02C4 |
| 0000425540 | C2AF | 02C6 | C2B9 | 02C7 | C2BC | 02CC | C2C3 | 02CD |
| 0000425560 | C2D6 | 02CF | C2E9 | 02D0 | C307 | 02D1 | C31A | 02D3 |
| 0000425600 | C320 | 02E7 | C32E | 02E8 | C33E | 02E9 | C347 | 02EA |
| 0000425620 | C366 | 02FE | C371 | 0302 | C381 | 0306 | C393 | 030B |
| 0000425640 | C3B6 | 0310 | C3D9 | 0312 | C3FC | 0313 | C402 | 032D |

THU MAR 14 17:42:50 1991 MEDIT.DLL PAGE 121, LINE 7081

| | | | | | | | | |
|---|---|---|---|---|---|---|---|---|
| 0000425660 | C40D | 0333 | C41D | 6304 | 2E6D | 0163 | D300 | 6900 |
| 0000425700 | 2800 | 6CC4 | 3E00 | 6EC4 | 5500 | 70C4 | 5A00 | 71C4 |
| 0000425720 | 6400 | 74C4 | 6A00 | 75C4 | 9B00 | 76C4 | AD00 | 79C4 |
| 0000425740 | B000 | 7BC4 | E700 | 7DC4 | F200 | 7EC4 | 2C00 | 7FC5 |
| 0000425760 | 3600 | 82C5 | 4100 | 84C5 | 4400 | 85C5 | 4A00 | 86C5 |
| 0000426000 | 8900 | 8AC5 | 9400 | 8BC5 | 9A00 | AFC5 | A800 | B0C5 |
| 0000426020 | BE00 | B5C5 | 5100 | B7C6 | 6800 | B8C6 | 7000 | B9C6 |
| 0000426040 | 7900 | BAC6 | CD00 | BBC6 | 4A00 | BCC7 | 5600 | BDC7 |
| 0000426060 | AA00 | C1C7 | 2700 | C2C8 | 3100 | C6C8 | AE00 | C7C8 |
| 0000426100 | DF00 | C8C8 | F100 | CBC8 | F400 | CDC8 | 2B00 | CFC9 |
| 0000426120 | 3600 | D0C9 | 7000 | D1C9 | 7A00 | D4C9 | 8500 | D6C9 |
| 0000426140 | 8800 | D7C9 | 8E00 | D8C9 | CD00 | DBC9 | D800 | DCC9 |
| 0000426160 | E700 | DEC9 | 0D00 | DFCA | 8A00 | FBCA | 9800 | FCCA |
| 0000426200 | A800 | FECA | 3B00 | FFCB | 5B00 | 00CB | 6501 | 03CB |
| 0000426220 | E201 | 04CB | E701 | 05CB | F101 | 06CB | F701 | 08CB |
| 0000426240 | 7401 | 09CC | 7701 | 0ACC | 8101 | 0CCC | 9301 | 0DCC |
| 0000426260 | 1001 | 17CD | 1B01 | 18CD | 2B01 | 19CD | 3701 | 1ACD |
| 0000426300 | 3B01 | 1BCD | 4101 | 1CCD | 4E01 | 1DCD | 5401 | 2FCD |
| 0000426320 | 5F01 | 30CD | 7501 | 31CD | 8F01 | 32CD | 9501 | 33CD |
| 0000426340 | 9801 | 34CD | A701 | 36CD | AC01 | 38CD | E301 | 39CD |
| 0000426360 | E601 | 3ACD | EF01 | 3BCD | 2101 | 3DCE | 2601 | 56CE |
| 0000426400 | 3401 | 57CE | 4A01 | 59CE | 5A01 | 5ACE | 7501 | 5FCE |
| 0000426420 | 7B01 | 62CE | 8901 | 67CE | 9401 | 68CE | 9A01 | 72CE |
| 0000426440 | A801 | 73CE | B801 | 76CE | 4B01 | 77CF | 6601 | 78CF |
| 0000426460 | 7901 | 79CF | 7C01 | 7ACF | 7F01 | 7FCF | 8201 | 80CF |
| 0000426500 | 9D01 | 84CF | B301 | 85CF | 3101 | 92D0 | 3C01 | 93D0 |
| 0000426520 | 5201 | 96D0 | E501 | 97D0 | 2701 | 99D1 | 2A01 | 9AD1 |
| 0000426540 | 3601 | 9CD1 | B301 | 9DD1 | BF01 | 9FD1 | 3C01 | A1D2 |
| 0000426560 | B901 | B6D2 | C701 | B7D2 | DD01 | B8D2 | E801 | CBD2 |
| 0000426600 | F401 | CCD2 | 0A01 | CDD3 | 1501 | E1D3 | 2101 | E2D3 |
| 0000426620 | 3701 | E3D3 | 4001 | E4D3 | 4601 | E5D3 | 5101 | E6D3 |
| 0000426640 | 5701 | F9D3 | 6501 | FAD3 | 7501 | FBD3 | 7B01 | FCD3 |
| 0000426660 | 8101 | FDD3 | 8601 | FED3 | 8C01 | 11D3 | 9702 | 14D3 |
| 0000426700 | AD02 | 15D3 | DE02 | 16D3 | E902 | 17D3 | EF02 | 18D3 |
| 0000426720 | F802 | 19D3 | 0202 | 1AD4 | 0802 | 2DD4 | 1602 | 31D4 |
| 0000426740 | 2602 | 32D4 | 4102 | 34D4 | 4402 | 35D4 | 4D02 | 36D4 |
| 0000426760 | 8302 | 37D4 | 8602 | 39D4 | BC02 | 4CD4 | C702 | 4DD4 |
| 0000427000 | DD02 | 4ED4 | E302 | 50D4 | E902 | 51D4 | F202 | 52D4 |
| 0000427020 | FD02 | 53D4 | 0302 | 65D5 | 1102 | 66D5 | 2702 | 67D5 |
| 0000427040 | 2D02 | 79D5 | 3902 | 7AD5 | 4F02 | 7BD5 | 5502 | 8ED5 |
| 0000427060 | 6102 | 90D5 | 7702 | 92D5 | 8102 | 93D5 | 8D02 | 94D5 |
| 0000427100 | 9102 | 95D5 | 9B02 | 96D5 | AD02 | 97D5 | B002 | 98D5 |
| 0000427120 | B602 | 9CD5 | BF02 | 9ED5 | C502 | AFD5 | D102 | B1D5 |
| 0000427140 | E102 | B2D5 | EC02 | B4D5 | 0502 | B5D6 | 1F02 | B7D6 |
| 0000427160 | 6A02 | B8D6 | 7502 | BAD6 | 7C02 | BBD6 | 9602 | BCD6 |
| 0000427200 | B002 | C2D6 | FB02 | D4D6 | 0602 | D5D7 | 1C02 | D6D7 |
| 0000427220 | 2902 | D7D7 | 3602 | D8D7 | 3F02 | EBD7 | 4D02 | ECD7 |
| 0000427240 | 6302 | EDD7 | 7002 | EED7 | 7D02 | EFD7 | 8602 | 00D7 |
| 0000427260 | 9403 | 01D7 | AA03 | 02D7 | B003 | 03D7 | B603 | 14D7 |
| 0000427300 | C403 | 15D7 | D403 | 16D7 | DF03 | 17D7 | E603 | 32D7 |
| 0000427320 | F103 | 33D7 | 0703 | 34D8 | 9A03 | 36D8 | A003 | 40D8 |
| 0000427340 | FA03 | 41D8 | 0503 | 42D9 | 0C03 | 43D9 | 1A03 | 44D9 |
| 0000427360 | 7D03 | 5ED9 | 8903 | 5FD9 | 9F03 | 61D9 | 3203 | 62DA |
| 0000427400 | 3803 | 63DA | 9003 | 64DA | F303 | 00DA | 6C0C | 696C |
| 0000427420 | 6362 | 6C64 | 2E6C | 696C | 0962 | 6264 | 705F | 2E69 |
| 0000427440 | 696C | 0662 | 6975 | 6C2E | 6269 | 6C0A | 6962 | 6D70 |
| 0000427460 | 2E74 | 696C | 0762 | 736F | 2E32 | 696C | 9B62 | 0100 |
| 0000427500 | 0101 | 0800 | 0000 | 1C00 | 0200 | 0101 | 6B00 | 0006 |
| 0000427520 | 9700 | 0300 | 0101 | 6E00 | 001D | 3E00 | 0412 | 0101 |

THU MAR 14 17:42:50 1991 MEDIT.DLL PAGE 122, LINE 7140

| | | | | | | | | |
|---|---|---|---|---|---|---|---|---|
| 0000427540 | 4A00 | 00AE | E500 | 0901 | 0101 | 1C00 | 00F4 | 6B00 |
| 0000427560 | 0101 | 0201 | 2400 | 0000 | 1C00 | 0200 | 0201 | 0200 |
| 0000427600 | 0007 | 4F00 | 0302 | 0201 | AC00 | 002F | 6A00 | 0417 |
| 0000427620 | 0201 | 2F00 | 00B0 | B100 | 0907 | 0201 | 8700 | 00F5 |
| 0000427640 | C300 | 0105 | 0301 | 4000 | 0000 | 1B00 | 0200 | 0301 |
| 0000427660 | 5100 | 0009 | AA00 | 0304 | 0301 | 1600 | 0047 | 2700 |
| 0000427700 | 0422 | 0301 | E000 | 00B7 | 7400 | 0922 | 0301 | 4A00 |
| 0000427720 | 00FB | 8600 | 010B | 0401 | 5B00 | 0000 | 1E00 | 0200 |
| 0000427740 | 0401 | FB00 | 000D | 7000 | 0302 | 0401 | 3D00 | 0069 |
| 0000427760 | 2400 | 0416 | 0401 | 5400 | 00DA | 4000 | 0908 | 0401 |
| 0000430000 | D000 | 0106 | 9100 | 0104 | 0501 | 7900 | 0000 | 1F00 |
| 0000430020 | 0200 | 0501 | 6B00 | 0010 | 3D00 | 0301 | 0501 | 6100 |
| 0000430040 | 007F | EA00 | 0416 | 0501 | 9400 | 00E2 | 5700 | 0908 |
| 0000430060 | 0501 | 6100 | 010B | 3600 | 0104 | 0601 | 9800 | 0000 |
| 0000430100 | 1A00 | 0200 | 0601 | A800 | 0011 | 1500 | 0302 | 0601 |
| 0000430120 | 4B00 | 0096 | FF00 | 0417 | 0601 | EB00 | 00EA | 3100 |
| 0000430140 | 0909 | 0601 | 9700 | 010F | 5500 | 0103 | 0701 | B200 |
| 0000430160 | 0000 | 1800 | 0200 | 0701 | BD00 | 0013 | 5200 | 0101 |
| 0000430200 | 0801 | CA00 | 0000 | 1B00 | 0200 | 0801 | 0F00 | 0015 |
| 0000430220 | D200 | 0101 | 0901 | E500 | 0000 | 1C00 | 0200 | 0901 |
| 0000430240 | E100 | 0016 | 3500 | 0100 | 0A01 | 0100 | 0001 | 1700 |
| 0000430260 | 0200 | 0A01 | 1600 | 0017 | 0F00 | 0100 | 0B01 | 1800 |
| 0000430300 | 0001 | 1700 | 0200 | 0B01 | 2500 | 0017 | 3300 | 0100 |
| 0000430320 | 0C01 | 2F00 | 0001 | 1A00 | 0200 | 0C01 | 5800 | 0017 |
| 0000430340 | 1000 | 0100 | 0D01 | 4900 | 0001 | 1C00 | 0200 | 0D01 |
| 0000430360 | 6800 | 0017 | 2500 | 0100 | 0E01 | 6500 | 0001 | 1B00 |
| 0000430400 | 0200 | 0E01 | 8D00 | 0017 | 3F00 | 0100 | 0F01 | 8000 |
| 0000430420 | 0001 | 1500 | 0200 | 0F01 | CC00 | 0017 | 2000 | 0100 |
| 0000430440 | 1001 | 9500 | 0001 | 1400 | 0200 | 1001 | EC00 | 0017 |
| 0000430460 | 1C00 | 0100 | 1101 | A900 | 0001 | 1600 | 0200 | 1101 |
| 0000430500 | 0800 | 0018 | 0F00 | 0100 | 1201 | BF00 | 0001 | 1800 |
| 0000430520 | 0200 | 1201 | 1700 | 0018 | 0F00 | 0100 | 1301 | D700 |
| 0000430540 | 0001 | 1400 | 0200 | 1301 | 2600 | 0018 | 3700 | 0100 |
| 0000430560 | 1401 | EB00 | 0001 | 1800 | 0200 | 1401 | 5D00 | 0018 |
| 0000430600 | 0F00 | 0100 | 1501 | 0300 | 0002 | 1800 | 0200 | 1501 |
| 0000430620 | 6C00 | 0018 | 0F00 | 0100 | 1601 | 1B00 | 0002 | 1900 |
| 0000430640 | 0200 | 1601 | 7B00 | 0018 | 1000 | 0100 | 1701 | 3400 |
| 0000430660 | 0002 | 1800 | 0200 | 1701 | 8B00 | 0018 | 0F00 | 0100 |
| 0000430700 | 1801 | 4C00 | 0002 | 1400 | 0200 | 1801 | 9A00 | 0018 |
| 0000430720 | 1100 | 0100 | 1901 | 6000 | 0002 | 1800 | 0200 | 1901 |
| 0000430740 | AB00 | 0018 | 1C00 | 0100 | 1A01 | 7800 | 0002 | 1500 |
| 0000430760 | 0200 | 1A01 | C700 | 0018 | 3000 | 0100 | 1B01 | 8D00 |
| 0000431000 | 0002 | 1700 | 0200 | 1B01 | F700 | 0018 | 0F00 | 0100 |
| 0000431020 | 1C01 | A400 | 0002 | 1500 | 0200 | 1C01 | 0600 | 0019 |
| 0000431040 | 1200 | 0100 | 1D01 | B900 | 0002 | 1A00 | 0200 | 1D01 |
| 0000431060 | 1800 | 0019 | 0D00 | 0100 | 1E01 | D300 | 0002 | 1A00 |
| 0000431100 | 0200 | 1E01 | 2500 | 0019 | 1E00 | 0100 | 1F01 | ED00 |
| 0000431120 | 0002 | 1900 | 0200 | 1F01 | 4300 | 0019 | 3100 | 0100 |
| 0000431140 | 2001 | 0600 | 0003 | 1900 | 0200 | 2001 | 7400 | 0019 |
| 0000431160 | 0C00 | 0100 | 2101 | 1F00 | 0003 | 1600 | 0200 | 2101 |
| 0000431200 | 8000 | 0019 | 1E00 | 0100 | 2201 | 3500 | 0003 | 1800 |
| 0000431220 | 0200 | 2201 | 9E00 | 0019 | 1D00 | 0100 | 2301 | 4D00 |
| 0000431240 | 0003 | 1700 | 0200 | 2301 | BB00 | 0019 | 1F00 | 0100 |
| 0000431260 | 2401 | 6400 | 0003 | 1500 | 0200 | 2401 | DA00 | 0019 |
| 0000431300 | 1B00 | 0100 | 2501 | 7900 | 0003 | 1800 | 0200 | 2501 |
| 0000431320 | F500 | 0019 | 4200 | 0100 | 2601 | 9100 | 0003 | 1600 |
| 0000431340 | 0200 | 2601 | 3700 | 001A | 0E00 | 0100 | 2701 | A700 |
| 0000431360 | 0003 | 1800 | 0200 | 2701 | 4500 | 001A | 1000 | 0100 |
| 0000431400 | 2801 | BF00 | 0003 | 1800 | 0200 | 2801 | 5500 | 001A |

THU MAR 14 17:42:50 1991 MEDIT.DLL PAGE 123, LINE 7199

| | | | | | | | | |
|---|---|---|---|---|---|---|---|---|
| 0000431420 | 1000 | 0100 | 2901 | D700 | 0003 | 1900 | 0200 | 2901 |
| 0000431440 | 6500 | 001A | 1200 | 0100 | 2A01 | F000 | 0003 | 1800 |
| 0000431460 | 0200 | 2A01 | 7700 | 001A | 4100 | 0100 | 2B01 | 0800 |
| 0000431500 | 0004 | 1700 | C200 | 2B01 | B800 | 001A | 0F00 | 0100 |
| 0000431520 | 2C01 | 1F00 | 0004 | 1700 | 0200 | 2C01 | C700 | 001A |
| 0000431540 | 0E00 | 0100 | 2D01 | 3600 | 0004 | 1700 | 0200 | 2D01 |
| 0000431560 | D500 | 001A | 0E00 | 0100 | 2E01 | 4D00 | 0004 | 1700 |
| 0000431600 | 0200 | 2E01 | E300 | 001A | 0E00 | 0100 | 2F01 | 6400 |
| 0000431620 | 0004 | 1700 | 0200 | 2F01 | F100 | 001A | 0E00 | 0100 |
| 0000431640 | 3001 | 7B00 | 0004 | 1800 | 0200 | 3001 | FF00 | 001A |
| 0000431660 | 0F00 | 0100 | 3101 | 9300 | 0004 | 1800 | 0200 | 3101 |
| 0000431700 | 0E00 | 001B | 0F00 | 0100 | 3201 | AB00 | 0004 | 1500 |
| 0000431720 | 0200 | 3201 | 1D00 | 001B | 0C00 | 0100 | 3301 | C000 |
| 0000431740 | 0004 | 1900 | 0200 | 3301 | 2900 | 001B | 5600 | 0100 |
| 0000431760 | 3401 | D900 | 0004 | 1A00 | 0200 | 3401 | 7F00 | 001B |
| 0000432000 | 1100 | 0100 | 3701 | F300 | 0004 | 1A00 | 0200 | 3701 |
| 0000432020 | 9000 | 001B | AB00 | 0100 | 3801 | 0D00 | 0005 | 1D00 |
| 0000432040 | 0200 | 3801 | 3B00 | 001C | 2400 | 0100 | 3901 | 2A00 |
| 0000432060 | 0005 | 1600 | 0200 | 3901 | 5F00 | 001C | 0D00 | 0100 |
| 0000432100 | 3A01 | 4000 | 0005 | 1600 | 0200 | 3A01 | 6C00 | 001C |
| 0000432120 | 0F00 | 0100 | 3B01 | 5600 | 0005 | 1900 | 0200 | 3B01 |
| 0000432140 | 7B00 | 001C | 2500 | 0100 | 3C01 | 6F00 | 0005 | 1800 |
| 0000432160 | 0200 | 3C01 | A000 | 001C | 2100 | 0100 | 3D01 | 8700 |
| 0000432200 | 0005 | 1700 | 0200 | 3D01 | C100 | 001C | 0F00 | 0100 |
| 0000432220 | 3E01 | 9E00 | 0005 | 1700 | 0200 | 3E01 | D000 | 001C |
| 0000432240 | 0E00 | 0100 | 3F01 | B500 | 0005 | 1800 | 0200 | 3F01 |
| 0000432260 | DE00 | 001C | 1000 | 0100 | 4001 | CD00 | 0005 | 1700 |
| 0000432300 | 0200 | 4001 | EE00 | 001C | 0E00 | 0100 | 4101 | E400 |
| 0000432320 | 0005 | 1800 | 0200 | 4101 | FC00 | 001C | 0F00 | 0100 |
| 0000432340 | 4201 | FC00 | 0005 | 1800 | 0200 | 4201 | 0B00 | 001D |
| 0000432360 | DE00 | 0100 | 4301 | 1400 | 0006 | 1500 | 0200 | 4301 |
| 0000432400 | 1900 | 001D | 1F00 | 0100 | 4401 | 2900 | 0006 | 1200 |
| 0000432420 | 0200 | 4401 | 3800 | 001D | 0B00 | 0100 | 4501 | 3B00 |
| 0000432440 | 0006 | 1B00 | 0200 | 4501 | 4300 | 001D | 1C00 | 0100 |
| 0000432460 | 4601 | 5600 | 0006 | 1500 | 0200 | 4601 | 5F00 | 001D |
| 0000432500 | 0F00 | 0600 | 0001 | EC00 | 0112 | 3200 | 4E00 | 3042 |
| 0000432520 | 3632 | 0119 | 0000 | | | | | |
| 0000432525 | | | | | | | | |

THU MAR 14 17:43:36 1991 METAPHOR.LUT PAGE 1, LINE 1

| | | | | | | | | |
|---|---|---|---|---|---|---|---|---|
| 0000000000 | 2023 | 2D2D | 2D2D | 2D2D | 2D2D | 2D2D | 2D2D | 2D2D |
| 0000000020 | 2D2D | 2D2D | 2D2D | 2D2D | 2D2D | 4D20 | 7465 | 7061 |
| 0000000040 | 6F68 | 2072 | 6F4C | 6B6F | 7075 | 5420 | 6261 | 656C |
| 0000000060 | 2D20 | 2D2D | 2D2D | 2D2D | 2D2D | 2D2D | 2D2D | 2D2D |
| 0000000100 | 2D2D | 2D2D | 2D2D | 2D2D | 2D2D | 0A0D | 0A0D | 3063 |
| 0000000120 | 3D20 | 3020 | 0A0D | 3163 | 3D20 | 3720 | 0D36 | 630A |
| 0000000140 | 2032 | 203D | 3431 | 0D30 | 630A | 2033 | 203D | 3032 |
| 0000000160 | 0D30 | 630A | 2034 | 203D | 3532 | 0D32 | 0D0A | 540A |
| 0000000200 | 3231 | 5F33 | 5347 | 5F50 | 554C | 2054 | 203D | 0D5C |
| 0000000220 | 090A | 3209 | 3535 | 3209 | 3535 | 3209 | 3535 | 5C09 |
| 0000000240 | 2309 | 3020 | 202C | 6877 | 7469 | 0D65 | 090A | 3009 |
| 0000000260 | 3009 | 3009 | 5C09 | 2309 | 3120 | 202C | 6C62 | 6361 |
| 0000000300 | 0D6B | 090A | 3109 | 3038 | 3109 | 3030 | 3009 | 5C09 |
| 0000000320 | 2309 | 3220 | 202C | 7262 | 6369 | 0D6B | 090A | 3109 |
| 0000000340 | 3832 | 3109 | 3832 | 3109 | 3832 | 5C09 | 2309 | 3320 |
| 0000000360 | 202C | 7267 | 7961 | 0A0D | 0909 | 0930 | 3431 | 0934 |
| 0000000400 | 0930 | 095C | 2023 | 2C34 | 6420 | 7261 | 206B | 7267 |
| 0000000420 | 6565 | 0D6E | 090A | 3209 | 3535 | 3009 | 3009 | 5C09 |
| 0000000440 | 2309 | 3520 | 202C | 6572 | 0D64 | 090A | 3209 | 3633 |
| 0000000460 | 3209 | 3633 | 3209 | 3633 | 5C09 | 2309 | 362D | 202C |
| 0000000500 | 6576 | 766C | 7465 | 6720 | 6172 | 0D79 | 090A | 3209 |
| 0000000520 | 3231 | 3209 | 3231 | 3209 | 3231 | 5C09 | 2309 | 3720 |
| 0000000540 | 202C | 696C | 6867 | 2074 | 7267 | 7965 | 0A0D | 0909 |
| 0000000560 | 3532 | 0935 | 3532 | 0935 | 0930 | 095C | 2023 | 2C38 |
| 0000000600 | 7920 | 6C65 | 6F6C | 0D77 | 090A | 3209 | 3535 | 3209 |
| 0000000620 | 3832 | 3109 | 3030 | 5C09 | 2309 | 3920 | 202C | 756D |
| 0000000640 | 7473 | 7261 | 0D64 | 090A | 3209 | 3231 | 3209 | 3233 |
| 0000000660 | 3209 | 3034 | 5C09 | 2309 | 3120 | 2C30 | 7320 | 796B |
| 0000000700 | 6220 | 756C | 0D65 | 090A | 3009 | 3009 | 3109 | 3832 |
| 0000000720 | 5C09 | 2309 | 3120 | 2C31 | 6420 | 7261 | 206B | 6C62 |
| 0000000740 | 6575 | 0A0D | 0909 | 0930 | 0930 | 3232 | 0938 | 095C |
| 0000000760 | 2023 | 3231 | 202C | 736D | 2067 | 6C62 | 6575 | 0A0D |
| 0000001000 | 0909 | 3631 | 0934 | 3032 | 0938 | 3232 | 0930 | 095C |
| 0000001020 | 2023 | 3331 | 202C | 696D | 2064 | 6C62 | 6575 | 0A0D |
| 0000001040 | 0909 | 3232 | 0938 | 3831 | 0930 | 3831 | 0930 | 095C |
| 0000001060 | 2023 | 3431 | 202C | 696C | 6867 | 2074 | 7262 | 6369 |
| 0000001100 | 0D6B | 090A | 3109 | 3030 | 3009 | 3009 | 5C09 | 2309 |
| 0000001120 | 3120 | 2C35 | 6420 | 7261 | 206B | 6572 | 0D64 | 090A |
| 0000001140 | 2409 | 6328 | 2932 | 2409 | 6328 | 2930 | 2409 | 6328 |
| 0000001160 | 2930 | 5C09 | 2309 | 3120 | 2C36 | 3120 | 322F | 7220 |
| 0000001200 | 6465 | 0A0D | 0909 | 2824 | 3363 | 0929 | 2824 | 3063 |
| 0000001220 | 0929 | 2824 | 3063 | 0929 | 095C | 2023 | 3731 | 202C |
| 0000001240 | 2F33 | 2034 | 6572 | 0D64 | 090A | 2409 | 6328 | 2930 |
| 0000001260 | 2409 | 6328 | 2930 | 2409 | 6328 | 2931 | 5C09 | 0A0D |
| 0000001300 | 0909 | 2824 | 3163 | 0929 | 2824 | 3063 | 0929 | 2824 |
| 0000001320 | 3163 | 0929 | 0D5C | 090A | 2409 | 6328 | 2932 | 2409 |
| 0000001340 | 6328 | 2930 | 2409 | 6328 | 2931 | 5C09 | 2309 | 3220 |
| 0000001360 | 0D30 | 090A | 2409 | 6328 | 2933 | 2409 | 6328 | 2930 |
| 0000001400 | 2409 | 6328 | 2931 | 5C09 | 0A0D | 0909 | 2824 | 3463 |
| 0000001420 | 0929 | 2824 | 3063 | 0929 | 2824 | 3163 | 0929 | 0D5C |
| 0000001440 | 090A | 2409 | 6328 | 2930 | 2409 | 6328 | 2930 | 2409 |
| 0000001460 | 6328 | 2932 | 5C09 | 0A0D | 0909 | 2824 | 3163 | 0929 |
| 0000001500 | 2824 | 3063 | 0929 | 2824 | 3263 | 0929 | 0D5C | 090A |
| 0000001520 | 2409 | 6328 | 2932 | 2409 | 6328 | 2930 | 2409 | 6328 |
| 0000001540 | 2932 | 5C09 | 2309 | 3220 | 0D35 | 090A | 2409 | 6328 |
| 0000001560 | 2933 | 2409 | 6328 | 2930 | 2409 | 6328 | 2932 | 5C09 |
| 0000001600 | 0A0D | 0909 | 2824 | 3463 | 0929 | 2824 | 3063 | 0929 |
| 0000001620 | 2824 | 3263 | 0929 | 0D5C | 090A | 2409 | 6328 | 2931 |
| 0000001640 | 2409 | 6328 | 2930 | 2409 | 6328 | 2933 | 5C09 | 0A0D |

THU MAR 14 17:43:36 1991 METAPHOR.LUT PAGE 2, LINE 60

| | | | | | | | | |
|---|---|---|---|---|---|---|---|---|
| 0000001660 | 0909 | 2824 | 3263 | 0929 | 2824 | 3063 | 0929 | 2824 |
| 0000001700 | 3363 | 0929 | 0D5C | 090A | 2409 | 6328 | 2933 | 2409 |
| 0000001720 | 6328 | 2930 | 2409 | 6328 | 2933 | 5C09 | 2309 | 3320 |
| 0000001740 | 0D30 | 090A | 2409 | 6328 | 2934 | 2409 | 6328 | 2930 |
| 0000001760 | 2409 | 6328 | 2933 | 5C09 | 0A0D | 0909 | 2824 | 3063 |
| 0000002000 | 0929 | 2824 | 3063 | 0929 | 2824 | 3463 | 0929 | 0D5C |
| 0000002020 | 090A | 2409 | 6328 | 2931 | 2409 | 6328 | 2930 | 2409 |
| 0000002040 | 6328 | 2934 | 5C09 | 0A0D | 0909 | 2824 | 3263 | 0929 |
| 0000002060 | 2824 | 3063 | 0929 | 2824 | 3463 | 0929 | 0D5C | 090A |
| 0000002100 | 2409 | 6328 | 2933 | 2409 | 6328 | 2930 | 2409 | 6328 |
| 0000002120 | 2934 | 5C09 | 2309 | 3320 | 0D35 | 090A | 2409 | 6328 |
| 0000002140 | 2934 | 2409 | 6328 | 2930 | 2409 | 6328 | 2934 | 5C09 |
| 0000002160 | 0A0D | 0909 | 2824 | 3063 | 0929 | 2824 | 3163 | 0929 |
| 0000002200 | 2824 | 3063 | 0929 | 0D5C | 090A | 2409 | 6328 | 2931 |
| 0000002220 | 2409 | 6328 | 2931 | 2409 | 6328 | 2930 | 5C09 | 0A0D |
| 0000002240 | 0909 | 2824 | 3363 | 0929 | 2824 | 3163 | 0929 | 2824 |
| 0000002260 | 3063 | 0929 | 0D5C | 090A | 2409 | 6328 | 2934 | 2409 |
| 0000002300 | 6328 | 2931 | 2409 | 6328 | 2930 | 5C09 | 2309 | 3420 |
| 0000002320 | 0D30 | 090A | 2409 | 6328 | 2930 | 2409 | 6328 | 2931 |
| 0000002340 | 2409 | 6328 | 2931 | 5C09 | 0A0D | 0909 | 2824 | 3163 |
| 0000002360 | 0929 | 2824 | 3163 | 0929 | 2824 | 3163 | 0929 | 0D5C |
| 0000002400 | 090A | 2409 | 6328 | 2932 | 2409 | 6328 | 2931 | 2409 |
| 0000002420 | 6328 | 2931 | 5C09 | 0A0D | 0909 | 2824 | 3363 | 0929 |
| 0000002440 | 2824 | 3163 | 0929 | 2824 | 3163 | 0929 | 0D5C | 090A |
| 0000002460 | 2409 | 6328 | 2934 | 2409 | 6328 | 2931 | 2409 | 6328 |
| 0000002500 | 2931 | 5C09 | 2309 | 3420 | 0D35 | 090A | 2409 | 6328 |
| 0000002520 | 2930 | 2409 | 6328 | 2931 | 2409 | 6328 | 2932 | 5C09 |
| 0000002540 | 0A0D | 0909 | 2824 | 3163 | 0929 | 2824 | 3163 | 0929 |
| 0000002560 | 2824 | 3263 | 0929 | 0D5C | 090A | 2409 | 6328 | 2932 |
| 0000002600 | 2409 | 6328 | 2931 | 2409 | 6328 | 2932 | 5C09 | 0A0D |
| 0000002620 | 0909 | 2824 | 3363 | 0929 | 2824 | 3163 | 0929 | 2824 |
| 0000002640 | 3263 | 0929 | 0D5C | 090A | 2409 | 6328 | 2934 | 2409 |
| 0000002660 | 6328 | 2931 | 2409 | 6328 | 2932 | 5C09 | 2309 | 3520 |
| 0000002700 | 0D30 | 090A | 2409 | 6328 | 2930 | 2409 | 6328 | 2931 |
| 0000002720 | 2409 | 6328 | 2933 | 5C09 | 0A0D | 0909 | 2824 | 3163 |
| 0000002740 | 0929 | 2824 | 3163 | 0929 | 2824 | 3363 | 0929 | 0D5C |
| 0000002760 | 090A | 2409 | 6328 | 2932 | 2409 | 6328 | 2931 | 2409 |
| 0000003000 | 6328 | 2933 | 5C09 | 0A0D | 0909 | 2824 | 3363 | 0929 |
| 0000003020 | 2824 | 3163 | 0929 | 2824 | 3363 | 0929 | 0D5C | 090A |
| 0000003040 | 2409 | 6328 | 2934 | 2409 | 6328 | 2931 | 2409 | 6328 |
| 0000003060 | 2933 | 5C09 | 2309 | 3520 | 0D35 | 090A | 2409 | 6328 |
| 0000003100 | 2930 | 2409 | 6328 | 2931 | 2409 | 6328 | 2934 | 5C09 |
| 0000003120 | 0A0D | 0909 | 2824 | 3163 | 0929 | 2824 | 3163 | 0929 |
| 0000003140 | 2824 | 3463 | 0929 | 0D5C | 090A | 2409 | 6328 | 2932 |
| 0000003160 | 2409 | 6328 | 2931 | 2409 | 6328 | 2934 | 5C09 | 0A0D |
| 0000003200 | 0909 | 2824 | 3363 | 0929 | 2824 | 3163 | 0929 | 2824 |
| 0000003220 | 3463 | 0929 | 0D5C | 090A | 2409 | 6328 | 2934 | 2409 |
| 0000003240 | 6328 | 2931 | 2409 | 6328 | 2934 | 5C09 | 2309 | 3620 |
| 0000003260 | 0D30 | 090A | 2409 | 6328 | 2930 | 2409 | 6328 | 2932 |
| 0000003300 | 2409 | 6328 | 2930 | 5C09 | 0A0D | 0909 | 2824 | 3163 |
| 0000003320 | 0929 | 2824 | 3263 | 0929 | 2824 | 3063 | 0929 | 0D5C |
| 0000003340 | 090A | 2409 | 6328 | 2932 | 2409 | 6328 | 2932 | 2409 |
| 0000003360 | 6328 | 2930 | 5C09 | 0A0D | 0909 | 2824 | 3363 | 0929 |
| 0000003400 | 2824 | 3263 | 0929 | 2824 | 3063 | 0929 | 0D5C | 090A |
| 0000003420 | 2409 | 6328 | 2934 | 2409 | 6328 | 2932 | 2409 | 6328 |
| 0000003440 | 2930 | 5C09 | 2309 | 3620 | 0D35 | 090A | 2409 | 6328 |
| 0000003460 | 2930 | 2409 | 6328 | 2932 | 2409 | 6328 | 2931 | 5C09 |
| 0000003500 | 0A0D | 0909 | 2824 | 3163 | 0929 | 2824 | 3263 | 0929 |
| 0000003520 | 2824 | 3163 | 0929 | 0D5C | 090A | 2409 | 6328 | 2932 |

THU MAR 14 17:43:36 1991 METAPHOR.LUT PAGE 3, LINE 119

| | | | | | | | | |
|---|---|---|---|---|---|---|---|---|
| 0000003540 | 2409 | 6328 | 2932 | 2409 | 6328 | 2931 | 5C09 | 0A0D |
| 0000003560 | 0909 | 2824 | 3363 | 0929 | 2824 | 3263 | 0929 | 2824 |
| 0000003600 | 3163 | 0929 | 0D5C | 090A | 2409 | 6328 | 2934 | 2409 |
| 0000003620 | 6328 | 2932 | 2409 | 6328 | 2931 | 5C09 | 2309 | 3720 |
| 0000003640 | 0D30 | 090A | 2409 | 6328 | 2930 | 2409 | 6328 | 2932 |
| 0000003660 | 2409 | 6328 | 2932 | 5C09 | 0A0D | 0909 | 2824 | 3163 |
| 0000003700 | 0929 | 2824 | 3263 | 0929 | 2824 | 3263 | 0929 | 095C |
| 0000003720 | 2023 | 696C | 6867 | 2074 | 7267 | 7961 | 0A0D | 0909 |
| 0000003740 | 2824 | 3263 | 0929 | 2824 | 3263 | 0929 | 2824 | 3263 |
| 0000003760 | 0929 | 0D5C | 090A | 2409 | 6328 | 2934 | 2409 | 6328 |
| 0000004000 | 2932 | 2409 | 6328 | 2932 | 5C09 | 0A0D | 0909 | 2824 |
| 0000004020 | 3063 | 0929 | 2824 | 3263 | 0929 | 2824 | 3363 | 0929 |
| 0000004040 | 095C | 2023 | 3537 | 0A0D | 0909 | 2824 | 3163 | 0929 |
| 0000004060 | 2824 | 3263 | 0929 | 2824 | 3363 | 0929 | 0D5C | 090A |
| 0000004100 | 2409 | 6328 | 2932 | 2409 | 6328 | 2932 | 2409 | 6328 |
| 0000004120 | 2933 | 5C09 | 0A0D | 0909 | 2824 | 3363 | 0929 | 2824 |
| 0000004140 | 3263 | 0929 | 2824 | 3363 | 0929 | 0D5C | 090A | 2409 |
| 0000004160 | 6328 | 2934 | 2409 | 6328 | 2932 | 2409 | 6328 | 2933 |
| 0000004200 | 5C09 | 0A0D | 0909 | 2824 | 3063 | 0929 | 2824 | 3263 |
| 0000004220 | 0929 | 2824 | 3463 | 0929 | 095C | 2023 | 3038 | 0A0D |
| 0000004240 | 0909 | 2824 | 3163 | 0929 | 2824 | 3263 | 0929 | 2824 |
| 0000004260 | 3463 | 0929 | 0D5C | 090A | 2409 | 6328 | 2932 | 2409 |
| 0000004300 | 6328 | 2932 | 2409 | 6328 | 2934 | 5C09 | 0A0D | 0909 |
| 0000004320 | 2824 | 3363 | 0929 | 2824 | 3263 | 0929 | 2824 | 3463 |
| 0000004340 | 0929 | 0D5C | 090A | 2409 | 6328 | 2934 | 2409 | 6328 |
| 0000004360 | 2932 | 2409 | 6328 | 2934 | 5C09 | 0A0D | 0909 | 2824 |
| 0000004400 | 3063 | 0929 | 2824 | 3363 | 0929 | 2824 | 3063 | 0929 |
| 0000004420 | 095C | 2023 | 3538 | 0A0D | 0909 | 2824 | 3163 | 0929 |
| 0000004440 | 2824 | 3363 | 0929 | 2824 | 3063 | 0929 | 0D5C | 090A |
| 0000004460 | 2409 | 6328 | 2932 | 2409 | 6328 | 2933 | 2409 | 6328 |
| 0000004500 | 2930 | 5C09 | 0A0D | 0909 | 2824 | 3363 | 0929 | 2824 |
| 0000004520 | 3363 | 0929 | 2824 | 3063 | 0929 | 0D5C | 090A | 2409 |
| 0000004540 | 6328 | 2934 | 2409 | 6328 | 2933 | 2409 | 6328 | 2930 |
| 0000004560 | 5C09 | 0A0D | 0909 | 2824 | 3063 | 0929 | 2824 | 3363 |
| 0000004600 | 0929 | 2824 | 3163 | 0929 | 095C | 2023 | 3039 | 0A0D |
| 0000004620 | 0909 | 2824 | 3163 | 0929 | 2824 | 3363 | 0929 | 2824 |
| 0000004640 | 3163 | 0929 | 0D5C | 090A | 2409 | 6328 | 2932 | 2409 |
| 0000004660 | 6328 | 2933 | 2409 | 6328 | 2931 | 5C09 | 0A0D | 0909 |
| 0000004700 | 2824 | 3363 | 0929 | 2824 | 3363 | 0929 | 2824 | 3163 |
| 0000004720 | 0929 | 0D5C | 090A | 2409 | 6328 | 2930 | 2409 | 6328 |
| 0000004740 | 2933 | 2409 | 6328 | 2932 | 5C09 | 0A0D | 0909 | 2824 |
| 0000004760 | 3163 | 0929 | 2824 | 3363 | 0929 | 2824 | 3263 | 0929 |
| 0000005000 | 095C | 2023 | 3539 | 0A0D | 0909 | 2824 | 3263 | 0929 |
| 0000005020 | 2824 | 3363 | 0929 | 2824 | 3263 | 0929 | 0D5C | 090A |
| 0000005040 | 2409 | 6328 | 2933 | 2409 | 6328 | 2933 | 2409 | 6328 |
| 0000005060 | 2932 | 5C09 | 0A0D | 0909 | 2824 | 3463 | 0929 | 2824 |
| 0000005100 | 3363 | 0929 | 2824 | 3263 | 0929 | 0D5C | 090A | 2409 |
| 0000005120 | 6328 | 2930 | 2409 | 6328 | 2933 | 2409 | 6328 | 2933 |
| 0000005140 | 5C09 | 0A0D | 0909 | 2824 | 3163 | 0929 | 2824 | 3363 |
| 0000005160 | 0929 | 2824 | 3363 | 0929 | 095C | 2023 | 3031 | 0D30 |
| 0000005200 | 090A | 2409 | 6328 | 2932 | 2409 | 6328 | 2933 | 2409 |
| 0000005220 | 6328 | 2933 | 5C09 | 0A0D | 0909 | 2824 | 3363 | 0929 |
| 0000005240 | 2824 | 3363 | 0929 | 2824 | 3363 | 0929 | 0D5C | 090A |
| 0000005260 | 2409 | 6328 | 2934 | 2409 | 6328 | 2933 | 2409 | 6328 |
| 0000005300 | 2933 | 5C09 | 0A0D | 0909 | 2824 | 3063 | 0929 | 2824 |
| 0000005320 | 3363 | 0929 | 2824 | 3463 | 0929 | 0D5C | 090A | 2409 |
| 0000005340 | 6328 | 2931 | 2409 | 6328 | 2933 | 2409 | 6328 | 2934 |
| 0000005360 | 5C09 | 2309 | 3120 | 3530 | 0A0D | 0909 | 2824 | 3263 |
| 0000005400 | 0929 | 2824 | 3363 | 0929 | 2824 | 3463 | 0929 | 0D5C |

THU MAR 14 17:43:36 1991 METAPHOR.LUT PAGE 4, LINE 178

| | | | | | | | | |
|---|---|---|---|---|---|---|---|---|
| 0000005420 | 090A | 2409 | 6328 | 2933 | 2409 | 6328 | 2933 | 2409 |
| 0000005440 | 6328 | 2934 | 5C09 | 0A0D | 0909 | 2824 | 3463 | 0929 |
| 0000005460 | 2824 | 3363 | 0929 | 2824 | 3463 | 0929 | 0D5C | 090A |
| 0000005500 | 2409 | 6328 | 2930 | 2409 | 6328 | 2934 | 2409 | 6328 |
| 0000005520 | 2930 | 5C09 | 0A0D | 0909 | 2824 | 3163 | 0929 | 2824 |
| 0000005540 | 3463 | 0929 | 2824 | 3063 | 0929 | 095C | 2023 | 3131 |
| 0000005560 | 0D30 | 090A | 2409 | 6328 | 2932 | 2409 | 6328 | 2934 |
| 0000005600 | 2409 | 6328 | 2930 | 5C09 | 0A0D | 0909 | 2824 | 3363 |
| 0000005620 | 0929 | 2824 | 3463 | 0929 | 2824 | 3063 | 0929 | 0D5C |
| 0000005640 | 090A | 2409 | 6328 | 2930 | 2409 | 6328 | 2934 | 2409 |
| 0000005660 | 6328 | 2931 | 5C09 | 0A0D | 0909 | 2824 | 3163 | 0929 |
| 0000005700 | 2824 | 3463 | 0929 | 2824 | 3163 | 0929 | 0D5C | 090A |
| 0000005720 | 2409 | 6328 | 2932 | 2409 | 6328 | 2934 | 2409 | 6328 |
| 0000005740 | 2931 | 5C09 | 2309 | 3120 | 3531 | 0A0D | 0909 | 2824 |
| 0000005760 | 3363 | 0929 | 2824 | 3463 | 0929 | 2824 | 3163 | 0929 |
| 0000006000 | 0D5C | 090A | 2409 | 6328 | 2934 | 2409 | 6328 | 2934 |
| 0000006020 | 2409 | 6328 | 2931 | 5C09 | 0A0D | 0909 | 2824 | 3063 |
| 0000006040 | 0929 | 2824 | 3463 | 0929 | 2824 | 3263 | 0929 | 0D5C |
| 0000006060 | 090A | 2409 | 6328 | 2931 | 2409 | 6328 | 2934 | 2409 |
| 0000006100 | 6328 | 2932 | 5C09 | 0A0D | 0909 | 2824 | 3263 | 0929 |
| 0000006120 | 2824 | 3463 | 0929 | 2824 | 3263 | 0929 | 095C | 2023 |
| 0000006140 | 3231 | 0D30 | 090A | 2409 | 6328 | 2933 | 2409 | 6328 |
| 0000006160 | 2934 | 2409 | 6328 | 2932 | 5C09 | 0A0D | 0909 | 2824 |
| 0000006200 | 3463 | 0929 | 2824 | 3463 | 0929 | 2824 | 3263 | 0929 |
| 0000006220 | 0D5C | 090A | 2409 | 6328 | 2930 | 2409 | 6328 | 2934 |
| 0000006240 | 2409 | 6328 | 2933 | 5C09 | 0A0D | 0909 | 2824 | 3163 |
| 0000006260 | 0929 | 2824 | 3463 | 0929 | 2824 | 3363 | 0929 | 0D5C |
| 0000006300 | 090A | 2409 | 6328 | 2932 | 2409 | 6328 | 2934 | 2409 |
| 0000006320 | 6328 | 2933 | 5C09 | 2309 | 3120 | 3532 | 0A0D | 0909 |
| 0000006340 | 2824 | 3363 | 0929 | 2824 | 3463 | 0929 | 2824 | 3363 |
| 0000006360 | 0929 | 0D5C | 090A | 2409 | 6328 | 2934 | 2409 | 6328 |
| 0000006400 | 2934 | 2409 | 6328 | 2933 | 5C09 | 0A0D | 0909 | 2824 |
| 0000006420 | 3063 | 0929 | 2824 | 3463 | 0929 | 2824 | 3463 | 0929 |
| 0000006440 | 0D5C | 090A | 2409 | 6328 | 2931 | 2409 | 6328 | 2934 |
| 0000006460 | 2409 | 6328 | 2934 | 5C09 | 0A0D | 0909 | 2824 | 3263 |
| 0000006500 | 0929 | 2824 | 3463 | 0929 | 2824 | 3463 | 0929 | 095C |
| 0000006520 | 2023 | 3331 | 0D30 | 090A | 2409 | 6328 | 2933 | 2409 |
| 0000006540 | 6328 | 2934 | 2409 | 6328 | 2934 | 5C09 | 2309 | 4E20 |
| 0000006560 | 776F | 2D20 | 3620 | 2D34 | 7267 | 7961 | 6C20 | 6E69 |
| 0000006600 | 0D65 | 090A | 3409 | 3409 | 3409 | 5C09 | 0A0D | 0909 |
| 0000006620 | 0938 | 0938 | 0938 | 0D5C | 090A | 3109 | 3233 | 3109 |
| 0000006640 | 3233 | 3109 | 3233 | 5C09 | 0A0D | 0909 | 3231 | 3109 |
| 0000006660 | 0932 | 3231 | 5C09 | 2309 | 3120 | 3533 | 0A0D | 0909 |
| 0000006700 | 3331 | 0936 | 3331 | 0936 | 3331 | 0936 | 0D5C | 090A |
| 0000006720 | 3109 | 0936 | 3631 | 3109 | 0936 | 0D5C | 090A | 3109 |
| 0000006740 | 3034 | 3109 | 3034 | 3109 | 3034 | 5C09 | 0A0D | 0909 |
| 0000006760 | 3431 | 0934 | 3431 | 0934 | 3431 | 0934 | 0D5C | 090A |
| 0000007000 | 3209 | 0930 | 3032 | 3209 | 0930 | 095C | 2023 | 3431 |
| 0000007020 | 0D30 | 090A | 3109 | 3834 | 3109 | 3834 | 3109 | 3834 |
| 0000007040 | 5C09 | 0A0D | 0909 | 3432 | 3209 | 0934 | 3432 | 5C09 |
| 0000007060 | 0A0D | 0909 | 3531 | 0932 | 3531 | 0932 | 3531 | 0932 |
| 0000007100 | 0D5C | 090A | 3209 | 0938 | 3832 | 3209 | 0938 | 0D5C |
| 0000007120 | 090A | 3109 | 3635 | 3109 | 3635 | 3109 | 3635 | 5C09 |
| 0000007140 | 2309 | 3120 | 3534 | 0A0D | 0909 | 3233 | 3309 | 0932 |
| 0000007160 | 3233 | 5C09 | 0A0D | 0909 | 3631 | 0930 | 3631 | 0930 |
| 0000007200 | 3631 | 0930 | 0D5C | 090A | 3309 | 0936 | 3633 | 3309 |
| 0000007220 | 0936 | 0D5C | 090A | 3109 | 3436 | 3109 | 3436 | 3109 |
| 0000007240 | 3436 | 5C09 | 0A0D | 0909 | 3034 | 3409 | 0930 | 3034 |
| 0000007260 | 5C09 | 2309 | 3120 | 3035 | 0A0D | 0909 | 3631 | 0938 |

THU MAR 14 17:43:36 1991 METAPHOR.LUT PAGE 5, LINE 237

| | | | | | | | | |
|---|---|---|---|---|---|---|---|---|
| 0000007300 | 3631 | 0938 | 3631 | 0938 | 0D5C | 090A | 3409 | 0934 |
| 0000007320 | 3434 | 3409 | 0934 | 0D5C | 090A | 3109 | 3237 | 3109 |
| 0000007340 | 3237 | 3109 | 3237 | 5C09 | 0A0D | 0909 | 3834 | 3409 |
| 0000007360 | 0938 | 3834 | 5C09 | 0A0D | 0909 | 3731 | 0936 | 3731 |
| 0000007400 | 0936 | 3731 | 0936 | 095C | 2023 | 3531 | 0D35 | 090A |
| 0000007420 | 3509 | 0932 | 3235 | 3509 | 0932 | 0D5C | 090A | 3109 |
| 0000007440 | 3038 | 3109 | 3038 | 3109 | 3038 | 5C09 | 0A0D | 0909 |
| 0000007460 | 3635 | 3509 | 0936 | 3635 | 5C09 | 0A0D | 0909 | 3831 |
| 0000007500 | 0934 | 3831 | 0934 | 3831 | 0934 | 0D5C | 090A | 3609 |
| 0000007520 | 0930 | 3036 | 3609 | 0930 | 095C | 2023 | 3631 | 0D30 |
| 0000007540 | 090A | 3109 | 3838 | 3109 | 3838 | 3109 | 3838 | 5C09 |
| 0000007560 | 0A0D | 0909 | 3436 | 3609 | 0934 | 3436 | 5C09 | 0A0D |
| 0000007600 | 0909 | 3931 | 0932 | 3931 | 0932 | 3931 | 0932 | 0D5C |
| 0000007620 | 090A | 3609 | 0938 | 3836 | 3609 | 0938 | 0D5C | 090A |
| 0000007640 | 3109 | 3639 | 3109 | 3639 | 3109 | 3639 | 5C09 | 2309 |
| 0000007660 | 3120 | 3536 | 0A0D | 0909 | 3237 | 3709 | 0932 | 3237 |
| 0000007700 | 5C09 | 0A0D | 0909 | 3032 | 0930 | 3032 | 0930 | 3032 |
| 0000007720 | 0930 | 0D5C | 090A | 3709 | 0936 | 3637 | 3709 | 0936 |
| 0000007740 | 0D5C | 090A | 3209 | 3430 | 3209 | 3430 | 3209 | 3430 |
| 0000007760 | 5C09 | 0A0D | 0909 | 3032 | 0938 | 3032 | 0938 | 3032 |
| 0000010000 | 0938 | 095C | 2023 | 3731 | 0D30 | 090A | 3809 | 0930 |
| 0000010020 | 3038 | 3809 | 0930 | 0D5C | 090A | 3809 | 0934 | 3438 |
| 0000010040 | 3809 | 0934 | 0D5C | 090A | 3209 | 3631 | 3209 | 3631 |
| 0000010060 | 3209 | 3631 | 5C09 | 0A0D | 0909 | 3838 | 3809 | 0938 |
| 0000010100 | 3838 | 5C09 | 0A0D | 0909 | 3232 | 0930 | 3232 | 0930 |
| 0000010120 | 3232 | 0930 | 095C | 2023 | 3731 | 0D35 | 090A | 3909 |
| 0000010140 | 0932 | 3239 | 3909 | 0932 | 0D5C | 090A | 3209 | 3432 |
| 0000010160 | 3209 | 3432 | 3209 | 3432 | 5C09 | 0A0D | 0909 | 3639 |
| 0000010200 | 3909 | 0936 | 3639 | 5C09 | 0A0D | 0909 | 3232 | 0938 |
| 0000010220 | 3232 | 0938 | 3232 | 0938 | 0D5C | 090A | 3109 | 3030 |
| 0000010240 | 3109 | 3030 | 3109 | 3030 | 5C09 | 2309 | 3120 | 3038 |
| 0000010260 | 0A0D | 0909 | 3332 | 0932 | 3332 | 0932 | 3332 | 0932 |
| 0000010300 | 0D5C | 090A | 3109 | 3430 | 3109 | 3430 | 3109 | 3430 |
| 0000010320 | 5C09 | 0A0D | 0909 | 3031 | 0938 | 3031 | 0938 | 3031 |
| 0000010340 | 0938 | 0D5C | 090A | 3209 | 3034 | 3209 | 3034 | 3209 |
| 0000010360 | 3034 | 5C09 | 0A0D | 0909 | 3131 | 0932 | 3131 | 0932 |
| 0000010400 | 3131 | 0932 | 095C | 2023 | 3831 | 0D35 | 090A | 3209 |
| 0000010420 | 3434 | 3209 | 3434 | 3209 | 3434 | 5C09 | 0A0D | 0909 |
| 0000010440 | 3131 | 0936 | 3131 | 0936 | 3131 | 0936 | 0D5C | 090A |
| 0000010460 | 3209 | 3834 | 3209 | 3834 | 3209 | 3834 | 5C09 | 0A0D |
| 0000010500 | 0909 | 3231 | 0930 | 3231 | 0930 | 3231 | 0930 | 0D5C |
| 0000010520 | 090A | 3109 | 3432 | 3109 | 3432 | 3109 | 3432 | 5C09 |
| 0000010540 | 2309 | 3120 | 3039 | 0A0D | 0909 | 2824 | 3063 | 0929 |
| 0000010560 | 2824 | 3063 | 0929 | 2824 | 3063 | 0929 | 0D5C | 090A |
| 0000010600 | 2409 | 6328 | 2934 | 2409 | 6328 | 2934 | 2409 | 6328 |
| 0000010620 | 2934 | 5C09 | 0A0D | 0909 | 2824 | 3063 | 0929 | 2824 |
| 0000010640 | 3063 | 0929 | 2824 | 3063 | 0929 | 0D5C | 090A | 2409 |
| 0000010660 | 6328 | 2934 | 2409 | 6328 | 2934 | 2409 | 6328 | 2934 |
| 0000010700 | 5C09 | 0A0D | 0909 | 2824 | 3063 | 0929 | 2824 | 3063 |
| 0000010720 | 0929 | 2824 | 3063 | 0929 | 095C | 2023 | 3931 | 0D35 |
| 0000010740 | 090A | 2409 | 6328 | 2934 | 2409 | 6328 | 2934 | 2409 |
| 0000010760 | 6328 | 2934 | 5C09 | 0A0D | 0909 | 2824 | 3063 | 0929 |
| 0000011000 | 2824 | 3063 | 0929 | 2824 | 3063 | 0929 | 0D5C | 090A |
| 0000011020 | 2409 | 6328 | 2934 | 2409 | 6328 | 2934 | 2409 | 6328 |
| 0000011040 | 2934 | 5C09 | 0A0D | 0909 | 2824 | 3063 | 0929 | 2824 |
| 0000011060 | 3063 | 0929 | 2824 | 3063 | 0929 | 0D5C | 090A | 2409 |
| 0000011100 | 6328 | 2934 | 2409 | 6328 | 2934 | 2409 | 6328 | 2934 |
| 0000011120 | 5C09 | 2309 | 3220 | 3030 | 0A0D | 0909 | 2824 | 3063 |
| 0000011140 | 0929 | 2824 | 3063 | 0929 | 2824 | 3063 | 0929 | 0D5C |

THU MAR 14 17:43:36 1991 METAPHOR.LUT PAGE 6, LINE 296

| | | | | | | | | |
|---|---|---|---|---|---|---|---|---|
| 0000011160 | 090A | 2409 | 6328 | 2934 | 2409 | 6328 | 2934 | 2409 |
| 0000011200 | 6328 | 2934 | 5C09 | 0A0D | 0909 | 2824 | 3063 | 0929 |
| 0000011220 | 2824 | 3063 | 0929 | 2824 | 3063 | 0929 | 0D5C | 090A |
| 0000011240 | 2409 | 6328 | 2934 | 2409 | 6328 | 2934 | 2409 | 6328 |
| 0000011260 | 2934 | 5C09 | 0D09 | 090A | 2409 | 6328 | 2930 | 2409 |
| 0000011300 | 6328 | 2930 | 2409 | 6328 | 2930 | 5C09 | 2309 | 3220 |
| 0000011320 | 3530 | 0A0D | 0909 | 2824 | 3463 | 0929 | 2824 | 3463 |
| 0000011340 | 0929 | 2824 | 3463 | 0929 | 0D5C | 090A | 2409 | 6328 |
| 0000011360 | 2930 | 2409 | 6328 | 2930 | 2409 | 6328 | 2930 | 5C09 |
| 0000011400 | 0A0D | 0909 | 2824 | 3463 | 0929 | 2824 | 3463 | 0929 |
| 0000011420 | 2824 | 3463 | 0929 | 0D5C | 090A | 2409 | 6328 | 2930 |
| 0000011440 | 2409 | 6328 | 2930 | 2409 | 6328 | 2930 | 5C09 | 0A0D |
| 0000011460 | 0909 | 2824 | 3463 | 0929 | 2824 | 3463 | 0929 | 2824 |
| 0000011500 | 3463 | 0929 | 095C | 2023 | 3132 | 0D30 | 090A | 2409 |
| 0000011520 | 6328 | 2930 | 2409 | 6328 | 2930 | 2409 | 6328 | 2930 |
| 0000011540 | 5C09 | 0A0D | 0909 | 2824 | 3463 | 0929 | 2824 | 3463 |
| 0000011560 | 0929 | 2824 | 3463 | 0929 | 0D5C | 090A | 2409 | 6328 |
| 0000011600 | 2930 | 2409 | 6328 | 2930 | 2409 | 6328 | 2930 | 5C09 |
| 0000011620 | 0A0D | 0909 | 2824 | 3463 | 0929 | 2824 | 3463 | 0929 |
| 0000011640 | 2824 | 3463 | 0929 | 095C | 0A0D | 0909 | 2824 | 3063 |
| 0000011660 | 0929 | 2824 | 3063 | 0929 | 2824 | 3063 | 0929 | 095C |
| 0000011700 | 2023 | 3132 | 0D35 | 090A | 2409 | 6328 | 2934 | 2409 |
| 0000011720 | 6328 | 2934 | 2409 | 6328 | 2934 | 5C09 | 0A0D | 0909 |
| 0000011740 | 2824 | 3063 | 0929 | 2824 | 3063 | 0929 | 2824 | 3063 |
| 0000011760 | 0929 | 0D5C | 090A | 2409 | 6328 | 2934 | 2409 | 6328 |
| 0000012000 | 2934 | 2409 | 6328 | 2934 | 5C09 | 0A0D | 0909 | 2824 |
| 0000012020 | 3063 | 0929 | 2824 | 3063 | 0929 | 2824 | 3063 | 0929 |
| 0000012040 | 0D5C | 090A | 2409 | 6328 | 2934 | 2409 | 6328 | 2934 |
| 0000012060 | 2409 | 6328 | 2934 | 5C09 | 2309 | 3220 | 3032 | 0A0D |
| 0000012100 | 0909 | 2824 | 3063 | 0929 | 2824 | 3063 | 0929 | 2824 |
| 0000012120 | 3063 | 0929 | 0D5C | 090A | 2409 | 6328 | 2934 | 2409 |
| 0000012140 | 6328 | 2934 | 2409 | 6328 | 2934 | 5C09 | 0A0D | 0909 |
| 0000012160 | 2824 | 3063 | 0929 | 2824 | 3063 | 0929 | 2824 | 3063 |
| 0000012200 | 0929 | 0D5C | 090A | 2409 | 6328 | 2934 | 2409 | 6328 |
| 0000012220 | 2934 | 2409 | 6328 | 2934 | 5C09 | 0A0D | 0909 | 2824 |
| 0000012240 | 3063 | 0929 | 2824 | 3063 | 0929 | 2824 | 3063 | 0929 |
| 0000012260 | 095C | 2023 | 3232 | 0D35 | 090A | 2409 | 6328 | 2934 |
| 0000012300 | 2409 | 6328 | 2934 | 2409 | 6328 | 2934 | 5C09 | 0A0D |
| 0000012320 | 0909 | 2824 | 3063 | 0929 | 2824 | 3063 | 0929 | 2824 |
| 0000012340 | 3063 | 0929 | 0D5C | 090A | 2409 | 6328 | 2934 | 2409 |
| 0000012360 | 6328 | 2934 | 2409 | 6328 | 2934 | 5C09 | 0A0D | 0909 |
| 0000012400 | 2824 | 3063 | 0929 | 2824 | 3063 | 0929 | 2824 | 3063 |
| 0000012420 | 0929 | 0D5C | 090A | 2409 | 6328 | 2934 | 2409 | 6328 |
| 0000012440 | 2934 | 2409 | 6328 | 2934 | 5C09 | 2309 | 3220 | 3033 |
| 0000012460 | 0A0D | 0909 | 2824 | 3063 | 0929 | 2824 | 3063 | 0929 |
| 0000012500 | 2824 | 3063 | 0929 | 0D5C | 090A | 2409 | 6328 | 2934 |
| 0000012520 | 2409 | 6328 | 2934 | 2409 | 6328 | 2934 | 5C09 | 0A0D |
| 0000012540 | 0909 | 2824 | 3063 | 0929 | 2824 | 3063 | 0929 | 2824 |
| 0000012560 | 3063 | 0929 | 0D5C | 090A | 2409 | 6328 | 2934 | 2409 |
| 0000012600 | 6328 | 2934 | 2409 | 6328 | 2934 | 5C09 | 0A0D | 0909 |
| 0000012620 | 2824 | 3063 | 0929 | 2824 | 3063 | 0929 | 2824 | 3063 |
| 0000012640 | 0929 | 095C | 2023 | 3332 | 0D35 | 090A | 2409 | 6328 |
| 0000012660 | 2934 | 2409 | 6328 | 2934 | 2409 | 6328 | 2934 | 5C09 |
| 0000012700 | 0A0D | 0909 | 2824 | 3063 | 0929 | 2824 | 3063 | 0929 |
| 0000012720 | 2824 | 3063 | 0929 | 0D5C | 090A | 2409 | 6328 | 2934 |
| 0000012740 | 2409 | 6328 | 2934 | 2409 | 6328 | 2934 | 5C09 | 0A0D |
| 0000012760 | 0909 | 2824 | 3063 | 0929 | 2824 | 3063 | 0929 | 2824 |
| 0000013000 | 3063 | 0929 | 0D5C | 090A | 2409 | 6328 | 2934 | 2409 |
| 0000013020 | 6328 | 2934 | 2409 | 6328 | 2934 | 5C09 | 2309 | 3220 |

THU MAR 14 17:43:36 1991 METAPHOR.LUT PAGE 7, LINE 355

| | | | | | | | | |
|---|---|---|---|---|---|---|---|---|
| 0000013040 | 3034 | 0A0D | 0909 | 2824 | 3063 | 0929 | 2824 | 3063 |
| 0000013060 | 0929 | 2824 | 3063 | 0929 | 0D5C | 090A | 3809 | 0932 |
| 0000013100 | 3231 | 0930 | 3036 | 5C09 | 2309 | 6D20 | 7369 | 2063 |
| 0000013120 | 3432 | 0D32 | 090A | 3209 | 3231 | 3109 | 3037 | 3209 |
| 0000013140 | 3231 | 5C09 | 2309 | 6D20 | 7369 | 2063 | 3432 | 0D33 |
| 0000013160 | 090A | 3809 | 0932 | 3036 | 3109 | 3032 | 5C09 | 2309 |
| 0000013200 | 6D20 | 7369 | 2063 | 3432 | 0D34 | 090A | 3109 | 3037 |
| 0000013220 | 3209 | 3231 | 3209 | 3231 | 5C09 | 2309 | 6D20 | 7369 |
| 0000013240 | 2063 | 3432 | 0D35 | 090A | 3109 | 3032 | 3609 | 0930 |
| 0000013260 | 3238 | 5C09 | 2309 | 6D20 | 7369 | 2063 | 3432 | 0D36 |
| 0000013300 | 090A | 3209 | 3231 | 3209 | 3231 | 3109 | 3037 | 5C09 |
| 0000013320 | 2309 | 6D20 | 7369 | 2063 | 3432 | 0D37 | 090A | 3109 |
| 0000013340 | 3031 | 3109 | 3031 | 3509 | 0936 | 095C | 2023 | 696D |
| 0000013360 | 6373 | 3220 | 3834 | 0A0D | 0909 | 3635 | 3109 | 3031 |
| 0000013400 | 3109 | 3031 | 5C09 | 2309 | 6D20 | 7369 | 2063 | 3432 |
| 0000013420 | 0D39 | 090A | 3109 | 3031 | 3509 | 0936 | 3131 | 0930 |
| 0000013440 | 095C | 2023 | 696D | 6373 | 3220 | 3035 | 0A0D | 0909 |
| 0000013460 | 3134 | 3409 | 0931 | 3232 | 5C09 | 2309 | 6D20 | 7369 |
| 0000013500 | 2063 | 3532 | 0D31 | 090A | 3209 | 0932 | 3134 | 3409 |
| 0000013520 | 0931 | 095C | 2023 | 696D | 6373 | 3220 | 3235 | 0A0D |
| 0000013540 | 0909 | 3134 | 3209 | 0932 | 3134 | 5C09 | 2309 | 6D20 |
| 0000013560 | 7369 | 2063 | 3532 | 0D33 | 090A | 2409 | 6328 | 2930 |
| 0000013600 | 2409 | 6328 | 2930 | 2409 | 6328 | 2930 | 5C09 | 2309 |
| 0000013620 | 7420 | 6F6F | 206C | 6977 | 646E | 776F | 6620 | 726F |
| 0000013640 | 6765 | 6F72 | 6E75 | 0D64 | 090A | 2409 | 6328 | 2934 |
| 0000013660 | 2409 | 6328 | 2934 | 2409 | 6328 | 2934 | 0909 | 2023 |
| 0000013700 | 6F74 | 6C6F | 7720 | 6E69 | 6F64 | 2077 | 6162 | 6B63 |
| 0000013720 | 7267 | 756F | 646E | 0A0D | 0A0D | 0A0D | 3154 | 3332 |
| 0000013740 | 495F | 4F43 | 5F4E | 4F43 | 4F4C | 5255 | 2053 | 203D |
| 0000013760 | 3531 | 0935 | 095C | 2023 | 6373 | 6572 | 6E65 | 6220 |
| 0000014000 | 6361 | 676B | 6F72 | 6E75 | 0964 | 202D | 6164 | 6B72 |
| 0000014020 | 6720 | 6572 | 0D79 | 090A | 0909 | 0909 | 0936 | 095C |
| 0000014040 | 2023 | 6369 | 6E6F | 6220 | 6361 | 676B | 6F72 | 6E75 |
| 0000014060 | 0964 | 202D | 6576 | 766C | 7465 | 6720 | 6572 | 0D79 |
| 0000014100 | 090A | 0909 | 0909 | 0935 | 2309 | 6820 | 746F | 7020 |
| 0000014120 | 696F | 746E | 6320 | 6F72 | 7373 | 2D09 | 7220 | 6465 |
| 0000014140 | 0A0D | 0A0D | 0A0D | | | | | |
| 0000014146 | | | | | | | | |

THU MAR 14 17:43:44 1991 PCUS.KBD PAGE 1, LINE 1

| | | | | | | | | |
|---|---|---|---|---|---|---|---|---|
| 0000000000 | 7830 | 4530 | 6020 | 0909 | 4F4E | 4D52 | 4C41 | 3009 |
| 0000000020 | 7E09 | 0909 | 0D30 | 300A | 3178 | 2036 | 0931 | 4E09 |
| 0000000040 | 524F | 414D | 094C | 0930 | 0921 | 3009 | 0A0D | 7830 |
| 0000000060 | 4531 | 3220 | 0909 | 4F4E | 4D52 | 4C41 | 3009 | 4009 |
| 0000000100 | 0909 | 0D30 | 300A | 3278 | 2036 | 0933 | 4E09 | 524F |
| 0000000120 | 414D | 094C | 0930 | 0923 | 3009 | 0A0D | 7830 | 3532 |
| 0000000140 | 3420 | 0909 | 4F4E | 4D52 | 4C41 | 3009 | 2409 | 0909 |
| 0000000160 | 0D30 | 300A | 3278 | 2045 | 0935 | 4E09 | 524F | 414D |
| 0000000200 | 094C | 0930 | 0925 | 3009 | 0A0D | 7830 | 3633 | 3620 |
| 0000000220 | 0909 | 4F4E | 4D52 | 4C41 | 3009 | 5E09 | 0909 | 0D30 |
| 0000000240 | 300A | 3378 | 2044 | 0937 | 4E09 | 524F | 414D | 094C |
| 0000000260 | 0930 | 0926 | 3009 | 0A0D | 7830 | 4533 | 3820 | 0909 |
| 0000000300 | 4F4E | 4D52 | 4C41 | 3009 | 2A09 | 0909 | 0D30 | 300A |
| 0000000320 | 3478 | 2036 | 0939 | 4E09 | 524F | 414D | 094C | 0930 |
| 0000000340 | 0928 | 3009 | 0A0D | 7830 | 3534 | 3020 | 0909 | 4F4E |
| 0000000360 | 4D52 | 4C41 | 3009 | 2909 | 0909 | 0D30 | 300A | 3478 |
| 0000000400 | 2045 | 092D | 4E09 | 524F | 414D | 094C | 0930 | 095F |
| 0000000420 | 3009 | 0A0D | 7830 | 3535 | 3D20 | 0909 | 4F4E | 4D52 |
| 0000000440 | 4C41 | 3009 | 2B09 | 0909 | 0D30 | 300A | 3578 | 2044 |
| 0000000460 | 095C | 4E09 | 524F | 414D | 094C | 0930 | 097C | 3009 |
| 0000000500 | 0A0D | 7830 | 3636 | 4220 | 0953 | 4E09 | 524F | 414D |
| 0000000520 | 094C | 0930 | 5342 | 0909 | 0D30 | 300A | 3078 | 2044 |
| 0000000540 | 6154 | 0962 | 4F4E | 4D52 | 4C41 | 3009 | 4209 | 6361 |
| 0000000560 | 546B | 6261 | 3009 | 0A0D | 7830 | 3531 | 7120 | 0909 |
| 0000000600 | 4F4E | 4D52 | 4C41 | 3009 | 5109 | 0909 | 0D31 | 300A |
| 0000000620 | 3178 | 2044 | 0977 | 4E09 | 524F | 414D | 094C | 0930 |
| 0000000640 | 0957 | 3109 | 0A0D | 7830 | 3432 | 6520 | 0909 | 4F4E |
| 0000000660 | 4D52 | 4C41 | 3009 | 4509 | 0909 | 0D31 | 300A | 3278 |
| 0000000700 | 2044 | 0972 | 4E09 | 524F | 414D | 094C | 0930 | 0952 |
| 0000000720 | 3109 | 0A0D | 7830 | 4332 | 7420 | 0909 | 4F4E | 4D52 |
| 0000000740 | 4C41 | 3009 | 5409 | 0909 | 0D31 | 300A | 3378 | 2035 |
| 0000000760 | 0979 | 4E09 | 524F | 414D | 094C | 0930 | 0959 | 3109 |
| 0000001000 | 0A0D | 7830 | 4333 | 7520 | 0909 | 4F4E | 4D52 | 4C41 |
| 0000001020 | 3009 | 5509 | 0909 | 0D31 | 300A | 3478 | 2033 | 0969 |
| 0000001040 | 4E09 | 524F | 414D | 094C | 0930 | 0949 | 3109 | 0A0D |
| 0000001060 | 7830 | 3434 | 6F20 | 0909 | 4F4E | 4D52 | 4C41 | 3009 |
| 0000001100 | 4F09 | 0909 | 0D31 | 300A | 3478 | 2044 | 0970 | 4E09 |
| 0000001120 | 524F | 414D | 094C | 0930 | 0950 | 3109 | 0A0D | 7830 |
| 0000001140 | 3435 | 5B20 | 0909 | 4F4E | 4D52 | 4C41 | 3009 | 7B09 |
| 0000001160 | 0909 | 0D30 | 300A | 3578 | 2042 | 095D | 4E09 | 524F |
| 0000001200 | 414D | 094C | 0930 | 097D | 3009 | 0A0D | 7830 | 3431 |
| 0000001220 | 4320 | 7274 | 096C | 4553 | 0951 | 3009 | 5309 | 435F |
| 0000001240 | 7274 | 096C | 0D30 | 300A | 3178 | 2043 | 0961 | 4E09 |
| 0000001260 | 524F | 414D | 094C | 0930 | 0941 | 3109 | 0A0D | 7830 |
| 0000001300 | 4231 | 7320 | 0909 | 4F4E | 4D52 | 4C41 | 3009 | 5309 |
| 0000001320 | 0909 | 0D31 | 300A | 3278 | 2033 | 0964 | 4E09 | 524F |
| 0000001340 | 414D | 094C | 0930 | 0944 | 3109 | 0A0D | 7830 | 4232 |
| 0000001360 | 6620 | 0909 | 4F4E | 4D52 | 4C41 | 3009 | 4609 | 0909 |
| 0000001400 | 0D31 | 300A | 3378 | 2034 | 0967 | 4E09 | 524F | 414D |
| 0000001420 | 094C | 0930 | 0947 | 3109 | 0A0D | 7830 | 3333 | 6820 |
| 0000001440 | 0909 | 4F4E | 4D52 | 4C41 | 3009 | 4809 | 0909 | 0D31 |
| 0000001460 | 300A | 3378 | 2042 | 096A | 4E09 | 524F | 414D | 094C |
| 0000001500 | 0930 | 094A | 3109 | 0A0D | 7830 | 3234 | 6B20 | 0909 |
| 0000001520 | 4F4E | 4D52 | 4C41 | 3009 | 4B09 | 0909 | 0D31 | 300A |
| 0000001540 | 3478 | 2042 | 096C | 4E09 | 524F | 414D | 094C | 0930 |
| 0000001560 | 094C | 3109 | 0A0D | 7830 | 4334 | 3B20 | 0909 | 4F4E |
| 0000001600 | 4D52 | 4C41 | 3009 | 3A09 | 0909 | 0D30 | 300A | 3578 |
| 0000001620 | 2032 | 0927 | 4E09 | 524F | 414D | 094C | 0930 | 0922 |
| 0000001640 | 3009 | 0A0D | 7830 | 4135 | 4320 | 0952 | 4E09 | 524F |

THU MAR 14 17:43:44 1991 PCUS.KBD PAGE 2, LINE 60

| | | | | | | | | |
|---|---|---|---|---|---|---|---|---|
| 0000001660 | 414D | 094C | 0931 | 5F53 | 5243 | 3009 | 0A0D | 7830 |
| 0000001700 | 3231 | 5320 | 6968 | 7466 | 5309 | 4948 | 5446 | 3009 |
| 0000001720 | 5309 | 6968 | 7466 | 3009 | 0A0D | 7830 | 4131 | 7A20 |
| 0000001740 | 0909 | 4F4E | 4D52 | 4C41 | 3009 | 5A09 | 0909 | 0D31 |
| 0000001760 | 300A | 3278 | 2032 | 0978 | 4E09 | 524F | 414D | 094C |
| 0000002000 | 0930 | 0958 | 3109 | 0A0D | 7830 | 3132 | 6320 | 0909 |
| 0000002020 | 4F4E | 4D52 | 4C41 | 3009 | 4309 | 0909 | 0D31 | 300A |
| 0000002040 | 3278 | 2041 | 0976 | 4E09 | 524F | 414D | 094C | 0930 |
| 0000002060 | 0956 | 3109 | 0A0D | 7830 | 3233 | 6220 | 0909 | 4F4E |
| 0000002100 | 4D52 | 4C41 | 3009 | 4209 | 0909 | 0D31 | 300A | 3376 |
| 0000002120 | 2031 | 096E | 4E09 | 524F | 414D | 094C | 0930 | 094E |
| 0000002140 | 3109 | 0A0D | 7830 | 4133 | 6D20 | 0909 | 4F4E | 4D52 |
| 0000002160 | 4C41 | 3009 | 4D09 | 0909 | 0D31 | 300A | 3478 | 2031 |
| 0000002200 | 092C | 4E09 | 524F | 414D | 094C | 0930 | 093C | 3009 |
| 0000002220 | 0A0D | 7830 | 3934 | 2E20 | 0909 | 4F4E | 4D52 | 4C41 |
| 0000002240 | 3009 | 3E09 | 0909 | 0D30 | 300A | 3478 | 2041 | 092F |
| 0000002260 | 4E09 | 524F | 414D | 094C | 0930 | 093F | 3009 | 0A0D |
| 0000002300 | 7830 | 3935 | 5320 | 6968 | 7466 | 5309 | 4948 | 5446 |
| 0000002320 | 3009 | 5309 | 6968 | 7466 | 3009 | 0A0D | 7830 | 3131 |
| 0000002340 | 4120 | 746C | 5309 | 5145 | 0909 | 0930 | 5F53 | 6C41 |
| 0000002360 | 0974 | 0D30 | 300A | 3278 | 2039 | 735C | 0909 | 4F4E |
| 0000002400 | 4D52 | 4C41 | 3009 | 5C09 | 0973 | 3009 | 0A0D | 7830 |
| 0000002420 | 3835 | 4320 | 094C | 4309 | 5041 | 4C53 | 434F | 094B |
| 0000002440 | 0930 | 4C43 | 3009 | 0A0D | 7830 | 3630 | 4620 | 0932 |
| 0000002460 | 4E09 | 524F | 414D | 094C | 0930 | 5F53 | 3246 | 3009 |
| 0000002500 | 0A0D | 7830 | 4330 | 4620 | 0934 | 4E09 | 524F | 414D |
| 0000002520 | 094C | 0930 | 5F53 | 3446 | 3009 | 0A0D | 7830 | 4230 |
| 0000002540 | 4620 | 0936 | 4E09 | 524F | 414D | 094C | 0930 | 5F53 |
| 0000002560 | 3646 | 3009 | 0A0D | 7830 | 4130 | 4620 | 0938 | 4E09 |
| 0000002600 | 524F | 414D | 094C | 0930 | 5F53 | 3846 | 3009 | 0A0D |
| 0000002620 | 7830 | 3930 | 4620 | 3031 | 4E09 | 524F | 414D | 094C |
| 0000002640 | 0930 | 5F53 | 3146 | 0930 | 0D30 | 300A | 3078 | 2035 |
| 0000002660 | 3146 | 0909 | 4F4E | 4D52 | 4C41 | 3009 | 5309 | 465F |
| 0000002700 | 0931 | 0D30 | 300A | 3078 | 2034 | 3346 | 0909 | 4F4E |
| 0000002720 | 4D52 | 4C41 | 3009 | 5309 | 465F | 0933 | 0D30 | 300A |
| 0000002740 | 3078 | 2033 | 3546 | 0909 | 4F4E | 4D52 | 4C41 | 3009 |
| 0000002760 | 5309 | 465F | 0935 | 0D30 | 300A | 3878 | 2033 | 3746 |
| 0000003000 | 0909 | 4F4E | 4D52 | 4C41 | 3009 | 5309 | 465F | 0937 |
| 0000003020 | 0D30 | 300A | 3078 | 2031 | 3946 | 0909 | 4F4E | 4D52 |
| 0000003040 | 4C41 | 3009 | 5309 | 465F | 0939 | 0D30 | 300A | 3778 |
| 0000003060 | 2036 | 7345 | 0963 | 4F4E | 4D52 | 4C41 | 3009 | 5309 |
| 0000003100 | 455F | 6373 | 3009 | 0A0D | 7830 | 4336 | 4B20 | 3750 |
| 0000003120 | 4E09 | 524F | 414D | 094C | 0930 | 5F53 | 504B | 0937 |
| 0000003140 | 0D30 | 300A | 3678 | 2042 | 504B | 0934 | 4F4E | 4D52 |
| 0000003160 | 4C41 | 3009 | 5309 | 4B5F | 3450 | 3009 | 0A0D | 7830 |
| 0000003200 | 3936 | 4B20 | 3150 | 4E09 | 524F | 414D | 094C | 0930 |
| 0000003220 | 5F53 | 504B | 0931 | 0D30 | 300A | 3778 | 2037 | 754E |
| 0000003240 | 4C6D | 636F | 096B | 4F4E | 4D52 | 4C41 | 3009 | 5309 |
| 0000003260 | 4E5F | 6D75 | 6F4C | 6B63 | 3009 | 0A0D | 7830 | 3537 |
| 0000003300 | 4B20 | 3850 | 0909 | 4F4E | 4D52 | 4C41 | 3009 | 5309 |
| 0000003320 | 4B5F | 3850 | 0909 | 0D30 | 300A | 3778 | 2033 | 504B |
| 0000003340 | 0935 | 4E09 | 524F | 414D | 094C | 0930 | 5F53 | 504B |
| 0000003360 | 0935 | 3009 | 0A0D | 7830 | 3237 | 4B20 | 3250 | 0909 |
| 0000003400 | 4F4E | 4D52 | 4C41 | 3009 | 5309 | 4B5F | 3250 | 0909 |
| 0000003420 | 0D30 | 300A | 3778 | 2030 | 6E49 | 0973 | 4E09 | 524F |
| 0000003440 | 414D | 094C | 0930 | 5F53 | 6E49 | 0973 | 3009 | 0A0D |
| 0000003460 | 7830 | 4537 | 5320 | 7263 | 4C6C | 636F | 096B | 4F4E |
| 0000003500 | 4D52 | 4C41 | 3009 | 5309 | 535F | 7263 | 4C6C | 636F |
| 0000003520 | 096B | 0D30 | 300A | 3778 | 2044 | 504B | 0939 | 4E09 |

THU MAR 14 17:43:44 1991 PCUS.KBD PAGE 3, LINE 119

| | | | | | | | | |
|---|---|---|---|---|---|---|---|---|
| 0000003540 | 524F | 414D | 094C | 0930 | 5F53 | 504B | 0939 | 3009 |
| 0000003560 | 0A0D | 7830 | 3437 | 4B20 | 3650 | 0909 | 4F4E | 4D52 |
| 0000003600 | 4C41 | 3009 | 5309 | 4B5F | 3650 | 0909 | 0D30 | 300A |
| 0000003620 | 3778 | 2041 | 504B | 0933 | 4E09 | 524F | 414D | 094C |
| 0000003640 | 0930 | 5F53 | 504B | 0933 | 3009 | 0A0D | 7830 | 3137 |
| 0000003660 | 4420 | 6C65 | 0909 | 4F4E | 4D52 | 4C41 | 3009 | 5309 |
| 0000003700 | 445F | 6C65 | 0909 | 0D30 | 300A | 3878 | 2034 | 7953 |
| 0000003720 | 0973 | 4E09 | 524F | 414D | 094C | 0930 | 5F53 | 7953 |
| 0000003740 | 0973 | 3009 | 2309 | 5820 | 2054 | 6E6F | 796C | 0A0D |
| 0000003760 | 7830 | 4337 | 4B20 | 6D50 | 6C75 | 0974 | 4E09 | 524F |
| 0000004000 | 414D | 094C | 0930 | 5F53 | 504B | 756D | 746C | 3009 |
| 0000004020 | 2309 | 5820 | 3A54 | 5020 | 7472 | 6373 | 0D72 | 300A |
| 0000004040 | 3778 | 2042 | 504B | 696D | 756E | 0973 | 4F4E | 4D52 |
| 0000004060 | 4C41 | 3009 | 5309 | 4B5F | 6D50 | 6E69 | 7375 | 3009 |
| 0000004100 | 0A0D | 7830 | 3937 | 4B20 | 7050 | 756C | 0973 | 4E09 |
| 0000004120 | 524F | 414D | 094C | 0930 | 5F53 | 504B | 6C70 | 7375 |
| 0000004140 | 3009 | 0A0D | 0A0D | 7830 | 3837 | 4620 | 3131 | 4E09 |
| 0000004160 | 524F | 414D | 094C | 0930 | 5F53 | 3146 | 0931 | 0D30 |
| 0000004200 | 300A | 3078 | 2037 | 3146 | 0932 | 4F4E | 4D52 | 4C41 |
| 0000004220 | 3009 | 5309 | 465F | 3231 | 3009 | 0A0D | 0A0D | 2023 |
| 0000004240 | 7053 | 6365 | 6169 | 206C | 5441 | 6320 | 6168 | 6172 |
| 0000004260 | 7463 | 7265 | 0D73 | 0D0A | 300A | 3978 | 2032 | 4C4E |
| 0000004300 | 535F | 6968 | 7466 | 4E09 | 524F | 414D | 094C | 093n |
| 0000004320 | 4C4E | 535F | 6968 | 7466 | 3009 | 0A0D | 0A0D | 7830 |
| 0000004340 | 3439 | 4320 | 7274 | 096C | 4553 | 0951 | 3009 | 5309 |
| 0000004360 | 435F | 7274 | 096C | 0909 | 0D30 | 300A | 3978 | 2031 |
| 0000004400 | 6C41 | 0974 | 4553 | 0951 | 3009 | 5309 | 415F | 746C |
| 0000004420 | 0909 | 3009 | 0A0D | 7830 | 4346 | 5020 | 7472 | 6353 |
| 0000004440 | 0972 | 4F4E | 4D52 | 4C41 | 3009 | 5309 | 505F | 7472 |
| 0000004460 | 6353 | 0972 | 3009 | 0A0D | 7830 | 3746 | 5020 | 7561 |
| 0000004500 | 6573 | 4E09 | 524F | 414D | 094C | 0930 | 5F53 | 6150 |
| 0000004520 | 7375 | 0965 | 0909 | 0D30 | 300A | 4678 | 2030 | 6E49 |
| 0000004540 | 6573 | 7472 | 4E09 | 524F | 414D | 094C | 0930 | 5F53 |
| 0000004560 | 6E49 | 6573 | 7472 | 0909 | 0D30 | 300A | 4578 | 2043 |
| 0000004600 | 6F48 | 656D | 4E09 | 524F | 414D | 094C | 0930 | 5F53 |
| 0000004620 | 6F48 | 656D | 0909 | 3009 | 0A0D | 7830 | 4446 | 5020 |
| 0000004640 | 6761 | 5565 | 0970 | 4F4E | 4D52 | 4C41 | 3009 | 5309 |
| 0000004660 | 505F | 6761 | 5565 | 0970 | 3009 | 0A0D | 7830 | 3146 |
| 0000004700 | 4420 | 6C65 | 7465 | 0965 | 4F4E | 4D52 | 4C41 | 3009 |
| 0000004720 | 5309 | 445F | 6C65 | 7465 | 0965 | 3009 | 0A0D | 7830 |
| 0000004740 | 3945 | 4520 | 646E | 4E09 | 524F | 414D | 094C | 0930 |
| 0000004760 | 5F53 | 6E45 | 0964 | 0909 | 0D30 | 300A | 4678 | 2041 |
| 0000005000 | 6150 | 6567 | 6E44 | 4E09 | 524F | 414D | 094C | 0930 |
| 0000005020 | 5F53 | 6150 | 6567 | 7055 | 0909 | 0D30 | 300A | 4678 |
| 0000005040 | 2035 | 7055 | 0909 | 4F4E | 4D52 | 4C41 | 3009 | 5309 |
| 0000005060 | 555F | 0970 | 0909 | 0D30 | 300A | 4578 | 2042 | 654C |
| 0000005100 | 7466 | 4E09 | 524F | 414D | 094C | 0930 | 5F53 | 654C |
| 0000005120 | 7466 | 0909 | 3009 | 0A0D | 7830 | 3246 | 4420 | 776F |
| 0000005140 | 096E | 4F4E | 4D52 | 4C41 | 3009 | 5309 | 445F | 776F |
| 0000005160 | 096E | 0909 | 0D30 | 300A | 4678 | 2034 | 6952 | 6867 |
| 0000005200 | 0974 | 4F4E | 4D52 | 4C41 | 3009 | 5309 | 525F | 6769 |
| 0000005220 | 7468 | 0909 | 3009 | 0A0D | 7830 | 4143 | 2F20 | 0909 |
| 0000005240 | 4F4E | 4D52 | 4C41 | 3009 | 2F09 | 0909 | 0909 | 0D30 |
| 0000005260 | 300A | 4478 | 2041 | 6E45 | 6574 | 0972 | 4F4E | 4D52 |
| 0000005300 | 4C41 | 3109 | 5309 | 455F | 746E | 7265 | 0909 | 3009 |
| 0000005320 | 0A0D | | | | | | | |
| 0000005322 | | | | | | | | |

THU MAR 14 17:44:14 1991 PR.DLL PAGE 1, LINE 1

| | | | | | | | | |
|---|---|---|---|---|---|---|---|---|
| 0000000000 | 5A4D | 0105 | 0047 | 0000 | 0004 | 0000 | FFFF | 0000 |
| 0000000020 | 00B6 | 0000 | 0000 | 0000 | 0040 | 0000 | 0000 | 0000 |
| 0000000040 | 0000 | 0000 | 0000 | 0000 | 0000 | 0000 | 0000 | 0000 |
| 0000000060 | 0000 | 0000 | 0000 | 0000 | 0000 | 0000 | 0080 | 0000 |
| 0000000100 | 1F0E | 0EBA | B400 | CD09 | B821 | 4C01 | 21CD | 6854 |
| 0000000120 | 7369 | 7020 | 6F72 | 7267 | 6D61 | 6320 | 6E61 | 6F6E |
| 0000000140 | 2074 | 7572 | 206E | 6E69 | 4420 | 534F | 6D20 | 646F |
| 0000000160 | 2E65 | 0D0D | 240A | 0000 | 0000 | 0000 | 0000 | 0000 |
| 0000000200 | 454E | 0A05 | 019D | 001C | 5362 | 15AE | 8006 | 0005 |
| 0000000220 | 0000 | 0000 | 390C | 0001 | 0000 | 0000 | 0005 | 0007 |
| 0000000240 | 0031 | 0040 | 0068 | 0068 | 00F6 | 0104 | 0239 | 0000 |
| 0000000260 | 0000 | 0004 | 0000 | 0001 | 0000 | 0000 | 0000 | 0000 |
| 0000000300 | 0027 | 6F13 | 0D00 | 6F14 | 0734 | 00C6 | 0C01 | 0100 |
| 0000000320 | 0000 | 0000 | 0C01 | 0850 | 0000 | 0000 | 0C01 | 0200 |
| 0000000340 | 0741 | 18CB | 0D01 | 37CD | 5002 | 0052 | 0900 | 5F50 |
| 0000000360 | 5F52 | 5645 | 4E45 | 0154 | 0D00 | 5F50 | 4554 | 4D52 |
| 0000000400 | 525F | 5045 | 524F | 0254 | 1000 | 5F50 | 4955 | 4D5F |
| 0000000420 | 4B41 | 5F45 | 4552 | 4F50 | 5452 | 0003 | 500F | 465F |
| 0000000440 | 4552 | 5F45 | 4552 | 5F50 | 494C | 5453 | 0004 | 5010 |
| 0000000460 | 5F55 | 5052 | 5452 | 445F | 474C | 505F | 4F52 | 0543 |
| 0000000500 | 0F00 | 5F50 | 5F51 | 5543 | 5252 | 525F | 5045 | 495F |
| 0000000520 | 0644 | 0E00 | 5F50 | 5453 | 5241 | 5F54 | 4552 | 4F50 |
| 0000000540 | 5452 | 0007 | 500E | 475F | 5445 | 525F | 5045 | 4C5F |
| 0000000560 | 5349 | 0854 | 0000 | 0001 | 000A | 0010 | 0089 | 008F |
| 0000000600 | 0092 | 0095 | 0800 | 4F44 | 4353 | 4C41 | 534C | 5005 |
| 0000000620 | 574D | 4E49 | 6C06 | 6962 | 6D70 | 0D74 | 425F | 5F58 |
| 0000000640 | 4544 | 5542 | 4D47 | 444F | 0D45 | 425F | 5F58 | 4954 |
| 0000000660 | 454D | 4D53 | 444F | 0945 | 425F | 5F58 | 5F42 | 4953 |
| 0000000700 | 0E47 | 425F | 5F58 | 4544 | 5542 | 4547 | 544E | 5245 |
| 0000000720 | 5F0F | 5842 | 445F | 4245 | 4755 | 4552 | 5554 | 4E52 |
| 0000000740 | 5F0E | 5842 | 565F | 494F | 5244 | 5445 | 5255 | 0E4E |
| 0000000760 | 425F | 5F58 | 4544 | 5542 | 5047 | 4952 | 544E | 5F0E |
| 0000001000 | 5842 | 505F | 4341 | 464B | 4C49 | 4554 | 0552 | 4244 |
| 0000001020 | 505F | 0249 | 4955 | 4902 | 0348 | 5953 | 0853 | 0101 |
| 0000001040 | 03BC | 0F01 | 0102 | 0B5A | BE01 | 0109 | 1DDA | F301 |
| 0000001060 | 0109 | 0000 | DC01 | 0005 | 2D00 | 6552 | 6F70 | 7472 |
| 0000001100 | 6C20 | 6269 | 6172 | 7972 | 2820 | 2943 | 4D20 | 7265 |
| 0000001120 | 7563 | 7972 | 4920 | 746E | 7265 | 6341 | 6974 | 6576 |
| 0000001140 | 202C | 3931 | 3039 | 0020 | 0000 | 0000 | 0000 | 0000 |
| 0000001160 | 581E | 4590 | 8B55 | 1EEC | D88E | EC81 | 002A | 5657 |
| 0000001200 | B81E | FFFF | D88E | 46C7 | 4EFA | 8C00 | FC5E | 46C7 |
| 0000001220 | 01F0 | 2B01 | 89C0 | E246 | 4689 | 8EE0 | 7406 | 2617 |
| 0000001240 | 3E83 | FFFF | 7500 | E903 | 001D | 36FF | 0062 | 36FF |
| 0000001260 | 0060 | 468D | 16D8 | 9A50 | FFFF | 0000 | C483 | 3D08 |
| 0000001300 | 0000 | 0374 | 0FE9 | 8E00 | 7606 | 2617 | 3E83 | 01A3 |
| 0000001320 | 7500 | E903 | 003A | 681E | 0055 | 468D | 16E4 | 8D50 |
| 0000001340 | D846 | 5016 | 468D | 16F4 | 6A50 | 1E56 | 6868 | FF00 |
| 0000001360 | 5E36 | FF00 | 5C36 | FF00 | 6236 | FF00 | 6036 | 9A00 |
| 0000001400 | FFFF | 0000 | C483 | 891E | F446 | 5689 | E9F6 | 0008 |
| 0000001420 | C02B | 4689 | 89F6 | F446 | 46C7 | 00F2 | 8B00 | 1C46 |
| 0000001440 | 460B | 751A | E903 | 000C | 5EC4 | 261A | 3F80 | 7400 |
| 0000001460 | E903 | 0008 | 46C7 | 14F2 | E900 | 009B | 46C7 | 01D6 |
| 0000001500 | 8D00 | F846 | 5016 | 76FF | FF18 | 1676 | 76FF | FF1C |
| 0000001520 | 1A76 | 026A | 459A | 2511 | 8301 | 0EC4 | 4689 | 83F2 |
| 0000001540 | F27E | 7410 | E903 | 0035 | 46C7 | 00D6 | 8D00 | F846 |
| 0000001560 | 5016 | 76FF | FF0C | 0A76 | 76FF | FF10 | 0E76 | 76FF |
| 0000001600 | FF14 | 1276 | 76FF | FF18 | 1676 | 76FF | FF1C | 1A76 |
| 0000001620 | 026A | 769A | 3F0D | 8301 | 1AC4 | 46B9 | 83F2 | F27E |
| 0000001640 | 7400 | E903 | 0011 | 76FF | FFD6 | F876 | CA9A | 6213 |

THU MAR 14 17:44:14 1991 PR.DLL PAGE 2, LINE 60

| | | | | | | | | |
|---|---|---|---|---|---|---|---|---|
| 0000001660 | 8301 | 04C4 | 4689 | 83F2 | F27E | 7400 | E903 | 0017 |
| 0000001700 | 76FF | FF18 | 1676 | 76FF | FF1C | 1A76 | 76FF | 9AF8 |
| 0000001720 | 148D | FFFF | C483 | 830A | F27E | 7400 | E903 | 0014 |
| 0000001740 | 468B | 0B08 | 0646 | 0375 | 09E9 | 8B00 | F846 | 5EC4 |
| 0000001760 | 2606 | 0789 | 068E | 1774 | 8326 | 323E | 0000 | 0375 |
| 0000002000 | 09E9 | 8300 | DC7E | 74FE | E903 | 000F | 068E | 1776 |
| 0000002020 | 8326 | FF3E | 00FF | 0375 | 50E9 | 8B00 | F246 | 4689 |
| 0000002040 | FFDE | E276 | 76FF | 8DE0 | DE46 | 5016 | 76FF | FFF0 |
| 0000002060 | FC76 | 76FF | 8DFA | E44E | 5116 | 4E8D | 16F4 | 8D51 |
| 0000002100 | D84E | 5116 | 681E | 0068 | 7E6A | 36FF | 005E | 36FF |
| 0000002120 | 005C | 36FF | 0062 | 36FF | 0060 | FF9A | 00FF | 8300 |
| 0000002140 | 28C4 | 468B | E9DE | 0009 | 06E9 | 8B00 | F246 | 00E9 |
| 0000002160 | 1F00 | 5F5E | ED83 | 8B02 | 1FE5 | 4D5D | 18CA | 1E00 |
| 0000002200 | 9058 | 5545 | EC8B | 8E1E | 81D8 | 28EC | 5700 | 1E56 |
| 0000002220 | 12B8 | 8E00 | C7D8 | FA46 | 0077 | 5E8C | C7FC | F046 |
| 0000002240 | 0101 | C02B | 4689 | 89E2 | E046 | 068E | 1774 | 8326 |
| 0000002260 | 373E | 0003 | 0375 | 1DE9 | FF00 | 6236 | FF00 | 6036 |
| 0000002300 | 8D00 | D846 | 5016 | 489A | 0000 | 8300 | 08C4 | 003D |
| 0000002320 | 7400 | E903 | 000F | 068E | 1776 | 8326 | 4F3E | 0003 |
| 0000002340 | 0375 | 3BE9 | 1E00 | 7E68 | 8D00 | E446 | 5016 | 468D |
| 0000002360 | 16D8 | 8D50 | F646 | 5016 | A668 | 1E00 | 8668 | FF00 |
| 0000002400 | 5E36 | FF00 | 5C36 | FF00 | 6236 | FF00 | 6036 | 9A00 |
| 0000002420 | 0090 | 0000 | C483 | 891E | F646 | 5689 | E9F8 | 0008 |
| 0000002440 | C02B | 4689 | 89F8 | F646 | 46C7 | 00F4 | 8B00 | 0C46 |
| 0000002460 | 4689 | 83F2 | F27E | 7400 | E903 | 0008 | ED9A | 0314 |
| 0000002500 | 8903 | F246 | 7E83 | 00F2 | 037E | 11E9 | 8300 | F27E |
| 0000002520 | 75FF | E903 | 0008 | 46C7 | 0FF4 | E900 | 0042 | 7E83 |
| 0000002540 | FFF2 | 0374 | 17E9 | FF00 | 0876 | 76FF | FF06 | 0A76 |
| 0000002560 | 869A | 1D17 | 8303 | 06C4 | 4689 | E9F4 | 0022 | 76FF |
| 0000002600 | FF08 | 0676 | 76FF | FF0A | F276 | 0D9A | 2818 | 8303 |
| 0000002620 | 08C4 | 76FF | 9AF2 | 153E | 00E7 | C483 | 8902 | F446 |
| 0000002640 | 068E | 1774 | 8326 | 8B3E | 0001 | 0375 | 09E9 | 8300 |
| 0000002660 | DC7E | 74FE | E903 | 000F | 068E | 1776 | 8326 | 5E3E |
| 0000002700 | 0000 | 0375 | 51E9 | 8B00 | F446 | 4689 | FFDE | E276 |
| 0000002720 | 76FF | 8DE0 | DE46 | 5016 | 76FF | FFF0 | FC76 | 76FF |
| 0000002740 | 8DFA | E44E | 5116 | 4E8D | 16F6 | 8D51 | D84E | 5116 |
| 0000002760 | 681E | 0086 | C268 | FF00 | 5E36 | FF00 | 5C36 | FF00 |
| 0000003000 | 6236 | FF00 | 6036 | 9A00 | 01EB | 0000 | C483 | 8B28 |
| 0000003020 | DE46 | 09E9 | E900 | 0006 | 468B | E9F4 | 0000 | 5E1F |
| 000000304D | 835F | 02ED | E58B | 5D1F | CA4D | 0008 | 581E | 4590 |
| 0000003060 | 8B55 | 1EEC | D88E | EC81 | 002E | 5657 | B81E | 0221 |
| 0000003100 | D88E | 46C7 | 94F6 | 8C00 | F85E | 46C7 | 01EC | 2B01 |
| 0000003120 | 89C0 | DC46 | 4689 | 8EDA | 7406 | 2617 | 3E83 | 0471 |
| 0000003140 | 7500 | E903 | 001D | 36FF | 0062 | 36FF | 0060 | 468D |
| 0000003160 | 16D2 | 9A50 | 0257 | 0000 | C483 | 3D08 | 0000 | 0374 |
| 0000003200 | 0FE9 | 8E00 | 7606 | 2617 | 3E83 | 026D | 7500 | E903 |
| 0000003220 | 003B | 681E | 009B | 468D | I6E0 | 8D50 | D246 | 5016 |
| 0000003240 | 468D | 16F2 | 6850 | 00E8 | 681E | 00C0 | 36FF | 005E |
| 0000003260 | 36FF | 005C | 36FF | 0062 | 36FF | 0060 | A09A | 0002 |
| 0000003300 | 8300 | 1EC4 | 4689 | 89F2 | F456 | 08E9 | 2B00 | 89C0 |
| 0000003320 | F446 | 4689 | C7F2 | F046 | 0000 | 068E | 1774 | 8326 |
| 0000003340 | 413E | 0002 | 0375 | 4BE9 | 8300 | D67E | 75FE | E903 |
| 0000003360 | 0042 | 76FF | FF14 | 1676 | 681E | 00A2 | 468D | 16E0 |
| 0000003400 | 8D50 | F246 | 5016 | 468D | 16D2 | 1E50 | C068 | 6800 |
| 0000003420 | 00F1 | 36FF | 005E | 36FF | 005C | 36FF | 0062 | 36FF |
| 0000003440 | 0060 | 681E | 00B8 | FF68 | 68FF | FFFF | FF9A | 00FF |
| 0000003460 | 8300 | 2AC4 | 681E | 0064 | 006A | 8868 | 9A13 | FFFF |
| 0000003500 | 0000 | 4689 | 83DE | DE7E | 7500 | E903 | 0008 | 46C7 |
| 0000003520 | 86F0 | E904 | 0061 | 468B | 8918 | EE46 | 7E83 | 00EE |

THU MAR 14 17:44:14 1991 PR.DLL PAGE 3, LINE 119

| | | | | | | | | |
|---|---|---|---|---|---|---|---|---|
| 0000003540 | 0374 | 08E9 | 9A00 | 14ED | 0516 | 4689 | 83EE | EE7E |
| 0000003560 | 7E00 | E903 | 0008 | 46C7 | 0FF0 | E900 | 0039 | 468D |
| 0000003600 | 16FA | 9A50 | 6810 | 0542 | C483 | FFD4 | 0876 | 76FF |
| 0000003620 | FFD6 | FC76 | 76FF | FFFA | 0A76 | 76FF | FF0E | 0C76 |
| 0000003640 | 76FF | FF12 | 1076 | 76FF | FF14 | 16¯6 | 76FF | 9AEE |
| 0000003660 | 1670 | 02CF | C483 | 1E18 | 6468 | 9A00 | FFFF | 0000 |
| 0000003700 | 068E | 1774 | 8326 | EE3E | 0003 | 0375 | 09E9 | 8300 |
| 0000003720 | D67E | 74FE | E903 | 000F | 068E | 1776 | 8326 | 1A3E |
| 0000003740 | 0004 | 0375 | 51E9 | 8B00 | F046 | 4689 | FFD8 | DC76 |
| 0000003760 | 76FF | 8DDA | D846 | 5016 | 76FF | FFEC | F876 | 76FF |
| 0000004000 | 8DF6 | E04E | 5116 | 4E8D | 16F2 | 8D51 | D24E | 5116 |
| 0000004020 | 681E | 00C0 | 1068 | FF01 | 5E36 | FF00 | 5C36 | FF00 |
| 0000004040 | 6236 | FF00 | 6036 | 9A00 | 0398 | 0000 | C483 | 8B28 |
| 0000004060 | D846 | 09E9 | E900 | 0006 | 468B | E9F0 | 0000 | 5E1F |
| 0000004100 | 835F | 02ED | E58B | 5D1F | CA4D | 0014 | 581E | 4590 |
| 0000004120 | 8B55 | 1EEC | D88E | EC81 | 01BC | 5657 | B81E | 03CE |
| 0000004140 | D88E | 86C7 | FEFA | 00CA | 9E8C | FEFC | 86C7 | FE64 |
| 0000004160 | 0101 | C02B | 8689 | FE56 | 8689 | FE54 | 068E | 1774 |
| 0000004200 | 8326 | 483E | 0007 | 0375 | 1EE9 | FF00 | 6236 | FF00 |
| 0000004220 | 6036 | 8D00 | 4486 | 16FE | 9A50 | 0404 | 0000 | C483 |
| 0000004240 | 3D08 | 0000 | 0374 | 0FE9 | 8E00 | 7606 | 2617 | 3E83 |
| 0000004260 | 0944 | 7500 | E903 | 0040 | 681E | 00D1 | 868D | FE58 |
| 0000004300 | 5016 | 868D | FE44 | 5016 | 868D | FEF2 | 5016 | 2B68 |
| 0000004320 | 1E01 | 2C68 | FF01 | 5E36 | FF00 | 5C36 | FF00 | 6236 |
| 0000004340 | FF00 | 6036 | 9A00 | 044D | 0000 | C483 | 891E | F286 |
| 0000004360 | 89FE | F496 | E9FE | 000A | C02B | 8689 | FEF4 | 8689 |
| 0000004400 | FEF2 | 86C7 | FEF0 | 0000 | 76FF | FF14 | 1276 | 76FF |
| 0000004420 | FF10 | 0E76 | 868D | FEF6 | 5016 | FF9A | 00FF | 8900 |
| 0000004440 | F086 | 83FE | F0BE | 00FE | 0375 | 09E9 | C700 | F086 |
| 0000004460 | 01FE | E900 | 01D8 | 9EC4 | FEF6 | FF26 | 4A77 | FF26 |
| 0000004500 | 4877 | 681E | 00D8 | 868D | FEFE | 5016 | 7E9A | F162 |
| 0000004520 | 8306 | 0CC4 | 681E | 00E6 | 868D | FEFE | 5016 | 529A |
| 0000004540 | 2E3F | 8307 | 08C4 | 8689 | FEEC | 9689 | FEEE | 868B |
| 0000004560 | FEEE | 860B | FEEC | 0374 | 09E9 | C700 | F086 | 08FE |
| 0000004600 | E900 | 018A | 86C7 | FE66 | 0000 | B6FF | FEEE | B6FF |
| 0000004620 | FEEC | 8468 | 8D00 | 6886 | 16FE | 9A50 | 610A | 07A8 |
| 0000004640 | C483 | 0B0A | 75D0 | E903 | 0007 | 86FF | FE66 | D9E9 |
| 0000004660 | 8EFF | 7406 | 2617 | 3E83 | 08A5 | 7500 | E903 | 004D |
| 0000004700 | BE83 | FE48 | 75FE | E903 | 0043 | B6FF | FE66 | 681E |
| 0000004720 | 00E8 | 868D | FE58 | 5016 | 868D | FEF2 | 5016 | 868D |
| 0000004740 | FE44 | 5016 | 681E | 012C | 4F68 | FF01 | 5E36 | FF00 |
| 0000004760 | 5C36 | FF00 | 6236 | FF00 | 6036 | 1E00 | F268 | 6800 |
| 0000005000 | 08F1 | F468 | 9A08 | 08F7 | 0000 | C483 | FF28 | EEB6 |
| 0000005020 | FFFE | ECB6 | 9AFE | 621C | 07B7 | C483 | FF04 | 66B6 |
| 0000005040 | 68FE | 012A | 4E9A | F463 | 8307 | 04C4 | 8689 | FE50 |
| 0000005060 | 9689 | FE52 | 868B | FE52 | 860B | FE50 | 0374 | D9E9 |
| 0000005100 | C700 | F086 | 07FE | E900 | 00B4 | 86C7 | FE66 | 0000 |
| 0000005120 | B6FF | FEEE | B6FF | FEEC | 8468 | 8D00 | 6886 | 16FE |
| 0000005140 | 9A50 | 610A | 0882 | C483 | 0B0A | 75D0 | E903 | 008E |
| 0000005160 | 8669 | FE66 | 012A | 8603 | FE50 | 968B | FE52 | 2605 |
| 0000005200 | 5201 | 8D50 | 4C86 | 16FE | 6950 | 6686 | 2AFE | 0301 |
| 0000005220 | 5086 | 8BFE | 5296 | 05FE | 0124 | 5052 | 8669 | FE66 |
| 0000005240 | 012A | 8603 | FE50 | 968B | FE52 | 2405 | 5200 | 6950 |
| 0000005260 | 6686 | 2AFE | 0301 | 5086 | 8BFE | 5296 | 05FE | 0004 |
| 0000005300 | 5052 | 8669 | FE66 | 012A | 86D3 | FE50 | 968B | FE52 |
| 0000005320 | 0205 | 5200 | 6950 | 6686 | 2AFE | 0301 | 5086 | 8BFE |
| 0000005340 | 5296 | 52FE | 1E50 | FA68 | 8D00 | 6886 | 16FE | 9A50 |
| 0000005360 | 62F2 | 0899 | C483 | FF24 | 6686 | E9FE | FF52 | B6FF |
| 0000005400 | FEEE | B6FF | FEEC | FE9A | F83D | 8304 | 04C4 | 068E |

THU MAR 14 17:44:14 1991 PR.DLL PAGE 4, LINE 178

| | | | | | | | | |
|---|---|---|---|---|---|---|---|---|
| 0000005420 | 1774 | 8326 | 2B3E | 0009 | 0375 | 51E9 | 8300 | 48BE |
| 0000005440 | FEFE | 0375 | 47E9 | FF00 | 66B6 | FFFE | F0B6 | 1EFE |
| 0000005460 | 1268 | 8D01 | 5886 | 16FE | 8D50 | F286 | 16FE | 8D50 |
| 0000005500 | 4486 | 16FE | 1E50 | 2C68 | 6801 | 016E | 36FF | 005E |
| 0000005520 | 36FF | 005C | 36FF | 0062 | 36FF | 0060 | 681E | 0124 |
| 0000005540 | B768 | 6804 | 04BA | BD9A | 0004 | 8300 | 2AC4 | BE83 |
| 0000005560 | FEF0 | 7400 | E903 | 001C | 868B | FE50 | 968B | FE52 |
| 0000005600 | 5EC4 | 2606 | 0789 | 8926 | 0257 | 868B | FE66 | 5EC4 |
| 0000005620 | 260A | 0789 | 068E | 1774 | 8326 | 573E | 0005 | 0375 |
| 0000005640 | 0AE9 | 8300 | 48BE | FEFE | 0374 | 0FE9 | 8E00 | 7606 |
| 0000005660 | 2617 | 3E83 | 056F | 7500 | E903 | 005D | 868B | FEF0 |
| 0000005700 | 8689 | FE4A | B6FF | FE56 | B6FF | FE54 | 868D | FE4A |
| 0000005720 | 5016 | B6FF | FE64 | B6FF | FEFC | B6FF | FEFA | BE8D |
| 0000005740 | FE58 | 5116 | 8E8D | FEF2 | 5116 | 8E8D | FE44 | 5116 |
| 0000005760 | 681E | 012C | 7568 | FF01 | 5E36 | FF00 | 5C36 | FF00 |
| 0000006000 | 6236 | FF00 | 6036 | 9A00 | 05B8 | 0000 | C483 | 8B28 |
| 0000006020 | 4A86 | E9FE | 000A | 07E9 | 8B00 | F086 | E9FE | 0000 |
| 0000006040 | 5E1F | 835F | 02ED | E58B | 5D1F | CA4D | 0010 | 581E |
| 0000006060 | 4590 | 8B55 | 1EEC | D88E | EC81 | 0000 | 5657 | B81E |
| 0000006100 | 05EE | D88E | 76FF | FF08 | 0676 | 9E9A | DF5A | 8306 |
| 0000006120 | 04C4 | 00E9 | 1F00 | 5F5E | ED83 | 8B02 | 1FE5 | 4D5D |
| 0000006140 | 04CA | 1E00 | 9058 | 5545 | EC8B | 8E1E | 81D8 | 28EC |
| 0000006160 | 5700 | 1E56 | D0B8 | 8E09 | C7D8 | FA46 | 013B | 5E8C |
| 0000006200 | C7FC | F046 | 0101 | C02B | 4689 | 89E2 | E046 | 068E |
| 0000006220 | 1774 | 8326 | D53E | 000A | 0375 | 1DE9 | FF00 | 6236 |
| 0000006240 | FF00 | 6036 | 8D0D | D846 | 5016 | 2A9A | 0006 | 8300 |
| 0000006260 | 08C4 | 003D | 7400 | E903 | 000F | 068E | 1776 | 8326 |
| 0000006300 | ED3E | 000A | 0375 | 3BE9 | 1E00 | 4268 | 8D01 | E446 |
| 0000006320 | 5016 | 468D | 16D8 | 8D50 | F446 | 5016 | A468 | 1E01 |
| 0000006340 | 4A68 | FF01 | 5E36 | FF00 | 5C36 | FF00 | 6236 | FF00 |
| 0000006360 | 6036 | 9A00 | 0676 | 0000 | C483 | 891E | F446 | 5689 |
| 0000006400 | E9F6 | 0008 | C02B | 4689 | 89F6 | F446 | 46C7 | 00F2 |
| 0000006420 | 9A00 | 14ED | 09DD | 4689 | 83F8 | F87E | 7E00 | E903 |
| 0000006440 | 0008 | 46C7 | 10F2 | E900 | 0014 | 468B | 0B08 | 0646 |
| 0000006460 | 0375 | 09E9 | 8B00 | F846 | 5EC4 | 2606 | 0789 | 068E |
| 0000006500 | 1774 | 8326 | 133E | 0006 | 0375 | 09E9 | 8300 | DC7E |
| 0000006520 | 74FE | E903 | 000F | 068E | 1776 | 8326 | 403E | 0006 |
| 0000006540 | 0375 | 51E9 | 8B00 | F246 | 4689 | FFDE | E276 | 76FF |
| 0000006560 | 8DE0 | DE46 | 5016 | 76FF | FFF0 | FC76 | 76FF | 8DFA |
| 0000006600 | E44E | 5116 | 4E8D | 16F4 | 8D51 | D84E | 5116 | 681E |
| 0000006620 | 014A | B568 | FF01 | 5E36 | FF00 | 5C36 | FF00 | 6236 |
| 0000006640 | FF00 | 6036 | 9A00 | 0998 | 0000 | C483 | 8B28 | DE46 |
| 0000006660 | D9E9 | E900 | 0006 | 468B | E9F2 | 0000 | 5E1F | 835F |
| 0000006700 | 02ED | E58B | 5D1F | CA4D | 0004 | 581E | 4590 | 8B55 |
| 0000006720 | 1EEC | D88E | EC81 | 04FE | 5657 | B81E | 0A05 | D88E |
| 0000006740 | 46C7 | 5AFA | 8C01 | FC5E | 86C7 | FB1A | 0101 | C02B |
| 0000006760 | 8689 | FBDC | 8689 | FBDA | 068E | 1774 | 8326 | 1B3E |
| 0000007000 | 000C | 0375 | 1EE9 | FF00 | 6236 | FF00 | 6036 | 8D00 |
| 0000007020 | 0286 | 16FB | 9A50 | 0A3B | 0000 | C483 | 3D08 | 0000 |
| 0000007040 | 0374 | 0FE9 | 8E00 | 7606 | 2617 | 3E83 | 0CFD | 7500 |
| 0000007060 | E903 | 0040 | 681E | 0161 | 868D | FB0E | 5016 | 868D |
| 0000007100 | FB02 | 5016 | 868D | FB22 | 5016 | D868 | 1E01 | 8268 |
| 0000007120 | FF01 | 5E36 | FF00 | 5C36 | FF00 | 6236 | FF00 | 6036 |
| 0000007140 | 9A00 | 0A84 | 0000 | C483 | 891E | 2286 | 89FB | 2496 |
| 0000007160 | E9FB | 000A | C02B | 8689 | FB24 | 8689 | FB22 | 86C7 |
| 0000007200 | FB20 | 0000 | 068E | 1774 | 8326 | E43E | 000C | 0375 |
| 0000007220 | 4FE9 | 8300 | 06BE | FEFB | 0375 | 45E9 | FF00 | 0876 |
| 0000007240 | 76FF | 1E06 | 6868 | 8D01 | 0E86 | 16FB | 8D50 | 2286 |
| 0000007260 | 16FB | 8D50 | 0286 | 16FB | 1E50 | 8268 | 6801 | 01E1 |

THU MAR 14 17:44:14 1991 PR.DLL PAGE 5, LINE 237

| | | | | | | | | |
|---|---|---|---|---|---|---|---|---|
| 0000007300 | 36FF | 005E | 36FF | 005C | 36FF | 0062 | 36FF | 0060 |
| 0000007320 | 681E | 017B | 9068 | 6807 | 0793 | 969A | 0007 | 8300 |
| 0000007340 | 2AC4 | 76FF | FF08 | 0676 | 868D | FB26 | 5016 | 069A |
| 0000007360 | 8F24 | 830C | 08C4 | 868D | FB26 | 5016 | 1C9A | A81C |
| 0000007400 | 830C | 04C4 | 8689 | FB20 | BE83 | FB20 | 7500 | E903 |
| 0000007420 | 003B | 7E68 | 9A04 | 3753 | 0AA4 | C483 | 6A02 | 6A01 |
| 0000007440 | 6A64 | 8D00 | 1C86 | 16FB | 9A50 | FFFF | 0000 | 8689 |
| 0000007460 | FB20 | BE83 | FB20 | 7400 | E903 | 0011 | B6FF | FB1E |
| 0000007500 | B6FF | FB1C | FF9A | 00FF | 8900 | 2086 | 8EFB | 7406 |
| 0000007520 | 2617 | 3E83 | 0A25 | 7500 | E903 | 000A | BE83 | FB06 |
| 0000007540 | 74FE | E903 | 000F | 068E | 1776 | 8326 | 513E | 000A |
| 0000007560 | 0375 | 5BE9 | 8B00 | 2086 | 89FB | 0886 | FFFB | 0CB6 |
| 0000007600 | FFFB | 0AB6 | 8DFB | 0886 | 16FB | FF50 | 1AB6 | FFFB |
| 0000007620 | FC76 | 76FF | 8DFA | 0E8E | 16FB | 8D51 | 228E | 16FB |
| 0000007640 | 8D51 | 028E | 16FB | 1E51 | 8268 | 6801 | 01F3 | 36FF |
| 0000007660 | 005E | 36FF | 005C | 36FF | 0062 | 36FF | 0060 | 369A |
| 0000007700 | 000B | 8300 | 28C4 | 868B | FB08 | 0AE9 | E900 | 0007 |
| 0000007720 | 868B | FB20 | 00E9 | 1F00 | 5F5E | ED83 | 8B02 | 1FE5 |
| 0000007740 | 4D5D | 04CA | 0000 | 581E | 4590 | 8B55 | 1EEC | D88E |
| 0000007760 | EC81 | 0132 | 5657 | 46C7 | A2FA | 8C01 | FC5E | 86C7 |
| 0000010000 | FEEA | 0101 | C02B | 8689 | FEDC | 8689 | FEDA | 068E |
| 0000010020 | 1778 | 8326 | 8F3E | 000B | 0375 | 1EE9 | FF00 | CE36 |
| 0000010040 | FF01 | CC36 | 8D01 | D286 | 16FE | 9A50 | 0BA6 | 0000 |
| 0000010060 | C483 | 3D08 | 0000 | 0374 | 0FE9 | 8E00 | 7A06 | 2617 |
| 0000010100 | 3E83 | 10D0 | 7500 | E903 | 003F | 681E | 01A9 | 868D |
| 0000010120 | FEDE | 5016 | 868D | FED2 | 5016 | 868D | FEF0 | 5016 |
| 0000010140 | 696A | 681E | 02D8 | 36FF | 01CA | 36FF | 01C8 | 36FF |
| 0000010160 | 01CE | 36FF | 01CC | F29A | 000B | 8300 | 1EC4 | 8689 |
| 0000010200 | FEF0 | 9689 | FEF2 | 0AE9 | 2B00 | 89C0 | F286 | 89FE |
| 0000010220 | F086 | C7FE | EE86 | 00FE | 8300 | D63E | 0002 | 0375 |
| 0000010240 | 2CE9 | C700 | EC86 | 00FE | E900 | 0004 | 86FF | FEEC |
| 0000010260 | BE83 | FEEC | 7C0A | E903 | 000F | 9E69 | FEEC | 025A |
| 0000010300 | 87C7 | 18CC | 0001 | E3E9 | C7FF | D606 | 0002 | 8300 |
| 0000010320 | D23E | 0901 | 037D | 09E9 | C700 | EE86 | 7FFE | E904 |
| 0000010340 | 003A | 86C7 | FEF4 | 0001 | 04E9 | FF00 | F486 | 83FE |
| 0000010360 | F4BE | 0AFE | 037C | 13E9 | 6900 | F49E | 5AFE | 8302 |
| 0000010400 | CCBF | 0018 | 0374 | 03E9 | E900 | FFDF | BE83 | FEF4 |
| 0000010420 | 7D0A | E903 | 0006 | 86C7 | FEEE | 0001 | BE83 | FEEE |
| 0000010440 | 7400 | E903 | 01DB | 468B | 0B0E | 0C46 | 0374 | 1BE9 |
| 0000010460 | FF00 | 0A76 | 76FF | 1E08 | B068 | 8D01 | F686 | 16FE |
| 0000010500 | 9A50 | 627E | 0EF5 | C483 | E90C | 001E | 76FF | FF0E |
| 0000010520 | 0C76 | 76FF | FF0A | 0876 | 681E | 01B6 | 868D | FEF6 |
| 0000010540 | 5016 | 7E9A | 7C62 | 830F | 10C4 | 868D | FEF6 | 5016 |
| 0000010560 | 76FF | FF12 | 1076 | 468D | 16F6 | 9A50 | 06AB | 0000 |
| 0000010600 | 8689 | FEEE | BE83 | FEEE | 7400 | E903 | 0173 | 06FF |
| 0000010620 | 01D2 | 9E69 | FEF4 | 025A | 87C7 | 18CC | 0000 | D2A1 |
| 0000010640 | 6901 | F49E | 5AFE | 8902 | CE87 | 8B18 | 0646 | 9E69 |
| 0000010660 | FEF4 | 025A | 8789 | 18D0 | 9E69 | FEF4 | 025A | C02B |
| 0000010700 | 8789 | 19F6 | 8789 | 19F4 | 9E69 | FEF4 | 025A | C02B |
| 0000010720 | 8789 | 19FA | 8789 | 19F8 | 76FF | FF0A | 0876 | 8669 |
| 0000010740 | FEF4 | 025A | D205 | 1E18 | 9A50 | 5D98 | 0F93 | C483 |
| 0000010760 | 1E08 | BC68 | 6901 | F486 | 5AFE | 0502 | 18D2 | 501E |
| 0000011000 | 529A | B75D | 830F | 08C4 | 468B | 0B0E | 0C46 | 0375 |
| 0000011020 | 1CE9 | FF00 | 0E76 | 76FF | 690C | F486 | 5AFE | 0502 |
| 0000011040 | 19D2 | 501E | 989A | E35D | 830F | 08C4 | 0BE9 | 6900 |
| 0000011060 | F49E | 5AFE | C602 | D287 | 0019 | 5EC4 | 26F6 | 77FF |
| 0000011100 | 264A | 77FF | 6948 | F486 | 5AFE | 0502 | 1A26 | 501E |
| 0000011120 | 989A | 265D | 8310 | 08C4 | 76FF | FFF8 | F676 | FF9A |
| 0000011140 | 00FF | 2B00 | 89C0 | F846 | 4689 | 69F6 | F49E | 5AFE |

THU MAR 14 17:44:14 1991 PR.DLL PAGE 6, LINE 296

| | | | | | | | | |
|---|---|---|---|---|---|---|---|---|
| 0000011160 | C702 | 1C87 | 001A | 6900 | F49E | 5AFE | C702 | 1E87 |
| 0000011200 | 001A | 6900 | F49E | 5AFE | C702 | 2087 | 001A | 1E00 |
| 0000011220 | C068 | 9A01 | 5F30 | 1056 | C483 | 8904 | CE86 | 89FE |
| 0000011240 | D096 | 8BFE | D086 | 0BFE | CE86 | 75FE | E903 | 001B |
| 0000011260 | B6FF | FED0 | B6FF | FECE | 8669 | FEF4 | 025A | FC05 |
| 0000011300 | 1E19 | 9A50 | 5D98 | 0C81 | C483 | 8B08 | 1646 | 460B |
| 0000011320 | 7514 | E903 | 0010 | 5EC4 | 2614 | 078A | 9E69 | FEF4 |
| 0000011340 | 025A | 8788 | 19F2 | 468B | 0B1A | 1846 | 0375 | 10E9 |
| 0000011360 | C400 | 185E | 8A26 | 6907 | F49E | 5AFE | 8802 | F387 |
| 0000011400 | 8319 | EEBE | 00FE | 0374 | 15E9 | 8B00 | 1E46 | 460B |
| 0000011420 | 751C | E903 | 000A | 868B | FEF4 | 5EC4 | 261C | 0789 |
| 0000011440 | 068E | 1778 | 8326 | A53E | 000D | 0375 | 0AE9 | 8300 |
| 0000011460 | D6BE | FEFE | 0374 | 0FE9 | 8E00 | 7A06 | 2617 | 3E83 |
| 0000011500 | 0BBC | 7500 | E903 | 005B | 868B | FEEE | 8689 | FED8 |
| 0000011520 | B6FF | FEDC | B6FF | FEDA | 868D | FED8 | 5016 | B6FF |
| 0000011540 | FEEA | 76FF | FFFC | FA76 | 8E8D | FEDE | 5116 | 8E8D |
| 0000011560 | FEF0 | 5116 | 8E8D | FED2 | 5116 | 681E | 02D8 | C268 |
| 0000011600 | FF00 | CA36 | FF01 | C836 | FF01 | CE36 | FF01 | CC36 |
| 0000011620 | 9A01 | 0D4F | 0000 | C483 | 8B28 | D886 | E9FE | 000A |
| 0000011640 | 07E9 | 8B00 | EE86 | E9FE | 0000 | 5F5E | ED83 | 8B02 |
| 0000011660 | 1FE5 | 4D5D | 1ECB | 9058 | 5545 | EC8B | 8E1E | 81D8 |
| 0000011700 | 4EEC | 5700 | C756 | FA46 | 02E6 | 5E8C | C7FC | CE46 |
| 0000011720 | 0101 | C02B | 4689 | 89C0 | BE46 | 068E | 1778 | 8326 |
| 0000011740 | B73E | 0010 | 0375 | 1DE9 | FF00 | CE36 | FF01 | CC36 |
| 0000011760 | 8D01 | B646 | 5016 | BC9A | 000D | 8300 | 08C4 | 003D |
| 0000012000 | 7400 | E903 | 000F | 068E | 177A | 8326 | D23E | 000D |
| 0000012020 | 0375 | 3BE9 | 1E00 | ED68 | 8D02 | C246 | 5016 | 468D |
| 0000012040 | 16B6 | 8D50 | F246 | 5016 | DD68 | 1E00 | F668 | FF02 |
| 0000012060 | CA36 | FF01 | C836 | FF01 | CE36 | FF01 | CC36 | 9A01 |
| 0000012100 | 0E07 | 0000 | C483 | 891E | F246 | 5689 | E9F4 | 0008 |
| 0000012120 | C02B | 4689 | 89F4 | F246 | 46C7 | 00F0 | 8300 | D23E |
| 0000012140 | 0001 | 037E | 08E9 | C700 | F046 | 0010 | 25E9 | C701 |
| 0000012160 | F846 | 0000 | 468B | 0B0E | 0C46 | 0375 | 09E9 | 8B00 |
| 0000012200 | 0C46 | 568B | E90E | 0005 | F4B8 | 8C02 | 52DA | 8D50 |
| 0000012220 | D046 | 5016 | 989A | 7C5D | 8312 | 08C4 | 46C7 | 01F6 |
| 0000012240 | E900 | 0003 | 46FF | 83F6 | F87E | 7400 | E903 | 0070 |
| 0000012260 | 7E83 | 0AF6 | 037C | 67E9 | 6900 | F65E | 025A | BF83 |
| 0000012300 | 18CC | 7400 | E903 | 0055 | 5E69 | 5AF6 | 8B02 | 0646 |
| 0000012320 | 8739 | 18D0 | 0374 | 44E9 | FF00 | 0A76 | 76FF | 6908 |
| 0000012340 | F646 | 025A | D205 | 1E18 | 9A50 | 5DCE | 129B | C483 |
| 0000012360 | 3D08 | 0000 | 0374 | 24E9 | 8D00 | D046 | 5016 | 4669 |
| 0000012400 | 5AF6 | 0502 | 19D2 | 501E | CE9A | EF5D | 8312 | 08C4 |
| 0000012420 | 003D | 7400 | E903 | 0005 | 46C7 | 01F8 | E900 | FF84 |
| 0000012440 | 7E83 | 00F8 | 0374 | 08E9 | C700 | F046 | 0010 | 63E9 |
| 0000012460 | 8300 | D43E | 0001 | 0375 | 29E9 | 6900 | D41E | 5A01 |
| 0000012500 | 8B02 | 2487 | 0B1A | 2287 | 751A | E903 | 0016 | 1E69 |
| 0000012520 | 01D4 | 025A | B7FF | 1A24 | B7FF | 1A22 | FE9A | 1F3D |
| 0000012540 | 8313 | 04C4 | 7E83 | 00F6 | 0375 | 27E9 | 6900 | F65E |
| 0000012560 | 025A | 878B | 1A24 | 870B | 1A22 | 0375 | 15E9 | 6900 |
| 0000012600 | F65E | 025A | B7FF | 1A24 | B7FF | 1A22 | FE9A | D43D |
| 0000012620 | 830E | 04C4 | 7E83 | 00F0 | 0374 | 14E9 | 8B00 | 1246 |
| 0000012640 | 460B | 7510 | E903 | 0009 | 468B | C4F6 | 105E | 8926 |
| 0000012660 | 8E07 | 7806 | 2617 | 3E83 | 1171 | 7500 | E903 | 0009 |
| 0000012700 | 7E83 | FEBA | 0374 | 0FE9 | 8E00 | 7A06 | 2617 | 3E83 |
| 0000012720 | 119D | 7500 | E903 | 0051 | 468B | 89F0 | BC46 | 76FF |
| 0000012740 | FFC0 | BE76 | 468D | 16BC | FF50 | CE76 | 76FF | FFFC |
| 0000012760 | FA76 | 4E8D | 16C2 | 8D51 | F24E | 5116 | 4E8D | 16B6 |
| 0000013000 | 1E51 | F668 | 6802 | 010F | 36FF | 01CA | 36FF | 01C8 |
| 0000013020 | 36FF | 01CE | 36FF | 01CC | 229A | 0011 | 8300 | 28C4 |

THU MAR 14 17:44:14 1991 PR.DLL PAGE 7, LINE 355

| | | | | | | | | |
|---|---|---|---|---|---|---|---|---|
| 0000013040 | 468B | E9BC | 0009 | 06E9 | 8B00 | F046 | 00E9 | 5E00 |
| 0000013060 | 835F | 02ED | E58B | 5D1F | CB4D | 581E | 4590 | 8B55 |
| 0000013100 | 1EEC | D88E | EC81 | 0108 | 5657 | 86C7 | FEFC | 0000 |
| 0000013120 | 4669 | 5A06 | 0502 | 1A26 | 501E | 681E | 0302 | 868D |
| 0000013140 | FEFE | 5016 | 7E9A | 0562 | 8314 | 0CC4 | 868D | FEFE |
| 0000013160 | 5016 | 509A | 216C | 8314 | 04C4 | 4669 | 5A06 | 0502 |
| 0000013200 | 1A26 | 501E | 681E | 0310 | 868D | FEFE | 5016 | 7E9A |
| 0000013220 | 4362 | 8314 | 0CC4 | 7E83 | 0008 | 0375 | 06E9 | B800 |
| 0000013240 | 031E | 03E9 | B800 | 0320 | 501E | 868D | FEFE | 5016 |
| 0000013260 | 529A | 273F | 8312 | 08C4 | 8689 | FEF8 | 9689 | FEFA |
| 0000013300 | 868B | FEFA | 860B | FEF8 | 0374 | 09E9 | C700 | FC86 |
| 0000013320 | 08FE | E900 | 0015 | 868B | FEF8 | 968B | FEFA | 5E69 |
| 0000013340 | 5A06 | 8902 | 2287 | 891A | 2497 | 8B1A | FC86 | E9FE |
| 0000013360 | 0000 | 5F5E | ED83 | 8B02 | 1FE5 | 4D5D | 1ECB | 9058 |
| 0000013400 | 5545 | EC8B | 8E1E | 81D8 | 00EC | 5700 | 8B56 | 0646 |
| 0000013420 | D4A3 | 8B01 | 0E46 | 460B | 740C | E903 | 0015 | 76FF |
| 0000013440 | FF0A | 0876 | 681E | 01D6 | 989A | DA5D | 8314 | 08C4 |
| 0000013460 | 1CE9 | FF00 | 0E76 | 76FF | FF0C | 0A76 | 76FF | 1E08 |
| 0000013500 | 2268 | 1E03 | D668 | 9A01 | 627E | 13F7 | C483 | E910 |
| 0000013520 | 0000 | 5F5E | ED83 | 8B02 | 1FE5 | 4D5D | 1ECB | 9058 |
| 0000013540 | 5545 | EC8B | 8E1E | 81D8 | 00EC | 5700 | A156 | 01D4 |
| 0000013560 | 00E9 | 5E00 | 835F | 02ED | E58B | 5D1F | CB4D | 581E |
| 0000013600 | 4590 | 8B55 | 1EEC | D88E | EC81 | 0000 | 5657 | 681E |
| 0000013620 | 01D6 | 76FF | FF08 | 0676 | 989A | BB5D | 8314 | 08C4 |
| 0000013640 | 00E9 | 5E00 | 835F | 02ED | E58B | 5D1F | CB4D | 581E |
| 0000013660 | 4590 | 8B55 | 1EEC | D88E | EC81 | 0008 | 5657 | 46C7 |
| 0000013700 | 00FA | 8300 | 067E | 7F00 | E903 | 0009 | 7E83 | 0A06 |
| 0000013720 | 037F | 08E9 | C700 | FA46 | 0013 | 9EE9 | 6900 | 065E |
| 0000013740 | 025A | 87C7 | 19CC | 0001 | 0EFF | 01D2 | D2A1 | 2B01 |
| 0000013760 | D406 | 4001 | 0374 | 82E9 | C700 | D406 | 0001 | 8300 |
| 0000014000 | D23E | 0001 | 0375 | 72E9 | C700 | FC46 | 0000 | 46C7 |
| 0000014020 | 01F8 | E900 | 0003 | 46FF | 83F8 | F87E | 7C0A | E903 |
| 0000014040 | 0039 | 7E83 | 00FC | 0374 | 30E9 | 6900 | F85E | 025A |
| 0000014060 | BF83 | 18CC | 7400 | E903 | 0019 | 5E69 | 5AF8 | A102 |
| 0000014100 | 01D2 | 8739 | 18CE | 0375 | 08E9 | C700 | FC46 | 0001 |
| 0000014120 | 05E9 | C700 | FC46 | 0000 | BBE9 | 83FF | FC7E | 7500 |
| 0000014140 | E903 | 0009 | 7E83 | DAF8 | 037D | 08E9 | C700 | FA46 |
| 0000014160 | 0001 | 06E9 | 8B00 | F846 | D4A3 | 8B01 | FA46 | 00E9 |
| 0000014200 | 5E00 | 835F | 02ED | E58B | 5D1F | CB4D | 581E | 4590 |
| 0000014220 | 8B55 | 1EEC | D88E | EC81 | 0004 | 5657 | 46C7 | 00FC |
| 0000014240 | 8300 | 067E | 7E0A | E903 | 0022 | 5E69 | 5A06 | 8302 |
| 0000014260 | CCBF | 0018 | 0374 | 13E9 | 6900 | 065E | 025A | 878B |
| 0000014300 | 19F4 | 978B | 19F6 | 0CE9 | E900 | 0009 | 00B8 | BA00 |
| 0000014320 | 0000 | 00E9 | 5E00 | 835F | 02ED | E58B | 5D1F | CB4D |
| 0000014340 | 581E | 4590 | 8B55 | 1EEC | D88E | EC81 | 0008 | 5657 |
| 0000014360 | 46C7 | 00FA | C700 | FC46 | 0001 | 468B | 8908 | F846 |
| 0000014400 | 468B | 8B16 | 1856 | 5E69 | 5A06 | 8902 | F887 | 8919 |
| 0000014420 | FA97 | 8B19 | 0846 | 7DE9 | 6900 | 065E | 025A | 878B |
| 0000014440 | 19F6 | 870B | 19F4 | 0374 | 26E9 | 8B00 | 1646 | 568B |
| 0000014460 | 6918 | 065E | 025A | 8789 | 19F4 | 9789 | 19F6 | 468B |
| 0000014500 | 8B16 | 1856 | 5E69 | 5A06 | 8902 | F887 | 8919 | FA97 |
| 0000014520 | E919 | 005F | 5E69 | 5A06 | FF02 | 1C87 | 831A | 0A7E |
| 0000014540 | 7501 | E903 | 000C | 5E69 | 5A06 | FF02 | 1E87 | E91A |
| 0000014560 | 000F | 3E83 | 01D0 | 7501 | E903 | 0005 | 46C7 | 00FC |
| 0000014600 | E900 | 002F | 5E69 | 5A06 | FF02 | 2087 | E91A | 0023 |
| 0000014620 | 20E9 | E900 | 001D | 7548 | E903 | FF7D | 4848 | 0375 |
| 0000014640 | 76E9 | 48FF | 7548 | E903 | FFAA | 7548 | E903 | FFD4 |
| 0000014660 | DDE9 | 83FF | FC7E | 7500 | E903 | 002C | 76FF | FF1C |
| 0000014700 | 1A76 | 76FF | FF18 | 1676 | 76FF | FF14 | 1276 | 76FF |

THU MAR 14 17:44:14 1991 PR.DLL PAGE 8, LINE 414

| | | | | | | | | |
|---|---|---|---|---|---|---|---|---|
| 0000014720 | FF10 | 0E76 | 76FF | FF0C | 0A76 | 76FF | FFF8 | 0676 |
| 0000014740 | 2D9A | 2B1A | 8315 | 18C4 | 00E9 | 5E00 | 835F | 02ED |
| 0000014760 | E58B | 5D1F | CB4D | 581E | 4590 | 8B55 | 1EEC | D88E |
| 0000015000 | EC81 | 0008 | 5657 | 46C7 | 00FC | 8300 | D23E | 0001 |
| 0000015020 | 037F | 57E9 | C700 | FA46 | 0001 | 03E9 | FF00 | FA46 |
| 0000015040 | 7E83 | 0AFA | 037C | 43E9 | 6900 | FA5E | 025A | BF83 |
| 0000015060 | 18CC | 7400 | E903 | 0031 | 76FF | FF0A | 0876 | 76FF |
| 0000015100 | FF06 | FA76 | 0D9A | E218 | 8317 | 08C4 | 76FF | 9AFA |
| 0000015120 | 153E | 1773 | C483 | 8902 | F846 | 7E83 | 00F8 | 0375 |
| 0000015140 | 06E9 | 8B00 | F846 | 4689 | E9FC | FFB1 | 468B | E9FC |
| 0000015160 | 0000 | 5F5E | ED83 | 8B02 | 1FE5 | 4D5D | 1ECB | 9058 |
| 0000015200 | 5545 | EC8B | 8E1E | 81D8 | 04EC | 5701 | C756 | FC46 |
| 0000015220 | 0000 | 5E69 | 5A06 | 8B02 | 2487 | 0B1A | 2287 | 751A |
| 0000015240 | E903 | 0015 | 5E69 | 5A06 | FF02 | 24B7 | FF1A | 22B7 |
| 0000015260 | 9A1A | 3DFE | 1860 | C483 | 6904 | 0646 | 025A | 2605 |
| 0000015300 | 1E1A | 1E50 | 2868 | 8D03 | FC86 | 16FE | 9A50 | 627E |
| 0000015320 | 187A | C483 | FF0C | 0C76 | 76FF | FF0A | 0876 | 76FF |
| 0000015340 | 8D06 | FC86 | 16FE | 9A50 | 1893 | 17D7 | C483 | 890C |
| 0000015360 | FC46 | 468B | E9FC | 0000 | 5F5E | ED83 | 8B02 | 1FE5 |
| 0000015400 | 4D5D | 1ECB | 9058 | 5545 | EC8B | 8E1E | 81D8 | 08EC |
| 0000015420 | 5700 | C756 | FC46 | 0000 | 681E | 0336 | 76FF | FF08 |
| 0000015440 | 0676 | 529A | EA3F | 8318 | 08C4 | 4689 | 89F8 | FA56 |
| 0000015460 | 468B | 0BFA | F846 | 0374 | 08E9 | C700 | FC46 | 0008 |
| 0000015500 | 49E9 | 6901 | 0A46 | 025A | D205 | 1E18 | 1E50 | 3868 |
| 0000015520 | FF03 | FA76 | 76FF | 9AF8 | 3F6A | 1906 | C483 | 690C |
| 0000015540 | 0A46 | 025A | D205 | 1E19 | 1E50 | 3D68 | FF03 | FA76 |
| 0000015560 | 76FF | 9AF8 | 3F6A | 1925 | C483 | 690C | 0A5E | 025A |
| 0000015600 | B7FF | 19F6 | B7FF | 19F4 | 681E | 0342 | 76FF | FFFA |
| 0000015620 | F876 | 6A9A | 413F | 8319 | 0CC4 | 4669 | 5A0A | 0502 |
| 0000015640 | 19FC | 501E | 681E | 0348 | 76FF | FFFA | F876 | 6A9A |
| 0000015660 | 603F | 8319 | 0CC4 | 468B | 0B10 | 0E46 | 0375 | 17E9 |
| 0000015700 | FF00 | FA76 | 76FF | FFF8 | 1076 | 76FF | 9A0E | 61A0 |
| 0000015720 | 1975 | C483 | E908 | 0012 | 76FF | FFFA | F876 | 681E |
| 0000015740 | 034D | A09A | 8A61 | 8319 | 08C4 | 76FF | 1E0C | 4F68 |
| 0000015760 | FF03 | FA76 | 76FF | 9AF8 | 3F6A | 19A5 | C483 | 690A |
| 0000016000 | 0A5E | 025A | B7FF | 1A1C | 681E | 0354 | 76FF | FFFA |
| 0000016020 | F876 | 6A9A | C03F | 8319 | 0AC4 | 5E69 | 5A0A | FF02 |
| 0000016040 | 1EB7 | 1E1A | 5968 | FF03 | FA76 | 76FF | 9AF8 | 3F6A |
| 0000016060 | 19DB | C483 | 690A | 0A5E | 025A | B7FF | 1A20 | 681E |
| 0000016100 | 035E | 76FF | FFFA | F876 | 6A9A | 093F | 831A | 0AC4 |
| 0000016120 | 5E69 | 5A0A | 8B02 | F887 | 8B19 | FA97 | 6919 | 0A5E |
| 0000016140 | 025A | 872B | 19F4 | 971B | 19F6 | 5052 | 681E | 0363 |
| 0000016160 | 76FF | FFFA | F876 | 6A9A | 173F | 831A | 0CC4 | 76FF |
| 0000016200 | FFFA | F876 | FE9A | 443D | 8318 | 04C4 | 468B | E9FC |
| 0000016220 | 0000 | 5F5E | ED83 | 8B02 | 1FE5 | 4D5D | 1ECB | 9058 |
| 0000016240 | 5545 | EC8B | 8E1E | 81D8 | 0AEC | 5700 | 8356 | 087E |
| 0000016260 | 7F14 | E903 | 0005 | 46C7 | 1408 | 8300 | 0A7E | 7F13 |
| 0000016300 | E903 | 0005 | 46C7 | 130A | 8B00 | 1246 | 460B | 7410 |
| 0000016320 | E903 | 0008 | 69B8 | 8C03 | E9DA | 0006 | 468B | 8B10 |
| 0000016340 | 1256 | 4689 | 89FA | FC56 | 76FF | FF1C | 1A76 | 76FF |
| 0000016360 | FF18 | 1676 | 76FF | FF14 | FC76 | 76FF | 8BFA | 0E46 |
| 0000016400 | 460B | 740C | E903 | 0008 | 6EB8 | 8C03 | E9DA | 0006 |
| 0000016420 | 468B | 8B0C | 0E56 | 5052 | 76FF | FF0A | 0876 | 681E |
| 0000016440 | 0373 | 5E69 | 5A06 | FF02 | 24B7 | FF1A | 22B7 | 9A1A |
| 0000016460 | 3F6A | 1AD7 | C483 | 691E | 065E | 025A | B7FF | 1A24 |
| 0000016500 | B7FF | 1A22 | 4E9A | B545 | 8318 | 04C4 | 00E9 | 5E00 |
| 0000016520 | 835F | 02ED | E58B | 5D1F | CB4D | 581E | 4590 | 8B55 |
| 0000016540 | 1EEC | D88E | EC81 | 010C | 5657 | 46C7 | 00FC | 2B00 |
| 0000016560 | 89C0 | FA86 | 89FE | F886 | FFFE | 0876 | 76FF | 8D06 |

THU MAR 14 17:44:14 1991 PR.DLL PAGE 9, LINE 473

| | | | | | | | | |
|---|---|---|---|---|---|---|---|---|
| 0000016600 | F486 | 16FE | 9A50 | FFFF | 0000 | 4689 | 83FC | FC7E |
| 0000016620 | 7400 | E903 | 007A | 868A | FEF7 | E42A | 293D | 7400 |
| 0000016640 | E903 | 001B | 76FF | FF08 | 0676 | 681E | 038B | 868D |
| 0000016660 | FEFC | 5016 | 7E9A | 5E62 | 831B | 0CC4 | 14E9 | FF00 |
| 0000016700 | 0876 | 76FF | 8D06 | FC86 | 16FE | 9A50 | 5D98 | 1BC5 |
| 0000016720 | C483 | 8D08 | FC86 | 16FE | 8D50 | F486 | 16FE | 9A50 |
| 0000016740 | 1B16 | 0000 | 4689 | 83FC | FC7E | 7400 | E903 | 0020 |
| 0000016760 | C02B | 8689 | FEFA | 8689 | FEF8 | B6FF | FEF6 | B6FF |
| 0000017000 | FEF4 | 868D | FEF8 | 5016 | FF9A | 00FF | 8900 | FC46 |
| 0000017020 | 7E83 | 00FC | 0374 | 3EE9 | 8B00 | 0C46 | 460B | 750A |
| 0000017040 | E903 | 0016 | B6FF | FEFA | B6FF | FEF8 | 76FF | FF0C |
| 0000017060 | 0A76 | 989A | C25D | 831A | 08C4 | 468B | 0B10 | 0E46 |
| 0000017100 | 0375 | 12E9 | 8B00 | F486 | 8BFE | F696 | C4FE | 0E5E |
| 0000017120 | 8926 | 2607 | 5789 | 8B02 | FA86 | 0BFE | F886 | 75FE |
| 0000017140 | E903 | 0017 | B6FF | FEFA | B6FF | FEF8 | EF9A | 000F |
| 0000017160 | 2B00 | 89C0 | FA86 | 89FE | F886 | 8BFE | FC46 | 00E9 |
| 0000017200 | 5E00 | 835F | 02ED | E58B | 5D1F | CB4D | 581E | 4590 |
| 0000017220 | 8B55 | 1EEC | D88E | EC81 | 002C | 5657 | 46C7 | 9FFA |
| 0000017240 | 8C03 | FC5E | 46C7 | 01EC | 2B01 | 89C0 | DE46 | 4689 |
| 0000017260 | 8EDC | 7C06 | 2617 | 3E83 | 1348 | 7500 | E903 | 001D |
| 0000017300 | 36FF | 03B4 | 36FF | 03B2 | 468D | 16D4 | 9A50 | 1187 |
| 0000017320 | 0000 | C483 | 3D0B | 0000 | 0374 | 0FE9 | 8E00 | 7E06 |
| 0000017340 | 2617 | 3E83 | 1D71 | 7500 | E903 | 003A | 681E | 03A6 |
| 0000017360 | 468D | 16E0 | 8D50 | D446 | 5016 | 468D | 16F2 | 6A50 |
| 0000017400 | 1E52 | B668 | FF03 | B036 | FF03 | AE36 | FF03 | B436 |
| 0000017420 | FF03 | B236 | 9A03 | 11D0 | 0000 | C483 | 891E | F246 |
| 0000017440 | 5689 | E9F4 | 0008 | C02B | 4689 | 89F4 | F246 | 46C7 |
| 0000017460 | 00F0 | 8D00 | EE46 | 5016 | FF9A | 00FF | 8900 | F046 |
| 0000017500 | 7E83 | 00F0 | 0374 | 0DE9 | 8D00 | F646 | 5016 | FF9A |
| 0000017520 | 00FF | 8900 | F046 | 7E83 | 00F0 | 0374 | 63E9 | C700 |
| 0000017540 | AA06 | B232 | 8C32 | AC1E | 6832 | 04D4 | 76FF | FF08 |
| 0000017560 | 0676 | 36FF | 32AC | 36FF | 32AA | 469A | 266B | 831D |
| 0000017600 | 0AC4 | 1EC4 | 32AA | C726 | 0807 | 6A07 | 6A00 | FF01 |
| 0000017620 | F876 | 76FF | 68F6 | 1B47 | FF68 | FFFF | EE76 | 0868 |
| 0000017640 | 6A07 | 6A00 | 9A00 | FFFF | 0000 | AEA3 | 8932 | B016 |
| 0000017660 | A132 | 32B0 | 060B | 32AE | 0374 | 05E9 | C700 | F046 |
| 0000017700 | 047E | 068E | 177C | 8326 | 483E | 001C | 0375 | 09E9 |
| 0000017720 | 8300 | D87E | 74FE | E903 | 000F | 068E | 177E | 8326 |
| 0000017740 | 603E | 0013 | 0375 | 50E9 | 8B00 | F046 | 4689 | FFDA |
| 0000017760 | DE76 | 76FF | 8DDC | DA46 | 5016 | 76FF | FFEC | FC76 |
| 0000020000 | 76FF | 8DFA | E04E | 5116 | 4E8D | 16F2 | 8D51 | D44E |
| 0000020020 | 5116 | 681E | 03B6 | 6D6A | 36FF | 03B0 | 36FF | 03AE |
| 0000020040 | 36FF | 03B4 | 36FF | 03B2 | A99A | 0013 | 8300 | 28C4 |
| 0000020060 | 468B | E9DA | 0009 | 06E9 | 8B00 | F046 | 00E9 | 5E00 |
| 0000020100 | 835F | 02ED | E58B | 5D1F | CB4D | 581E | 4590 | 8B55 |
| 0000020120 | 1EEC | D88E | EC81 | 0006 | 5657 | B81E | 0B6C | D88E |
| 0000020140 | 46C7 | 00FC | C700 | FA46 | 0000 | 468B | E90E | 01C6 |
| 0000020160 | 76FF | FF12 | 1076 | 0A68 | 6807 | 0143 | 006A | 506A |
| 0000020200 | 006A | 006A | 2E9A | 001E | FF00 | 1276 | 76FF | 6810 |
| 0000020220 | 070C | 4368 | 6A01 | 6A00 | 6A50 | 6A00 | 9A00 | 1F41 |
| 0000020240 | 0000 | 46C7 | 01FA | 8B00 | 1046 | 568B | A312 | 32AE |
| 0000020260 | 1689 | 32B0 | 36FF | 32AC | 36FF | 32AA | 189A | 6220 |
| 0000020300 | 831E | 04C4 | 36FF | 32AC | 36FF | 32AA | 76FF | 9AFA |
| 0000020320 | 2677 | 1F08 | C483 | B806 | 0000 | 00BA | E900 | 019A |
| 0000020340 | 006A | 016A | 76FF | FF12 | 1076 | 631E | 03C2 | AAA1 |
| 0000020360 | 8B32 | AC16 | C532 | 0002 | 5052 | 006A | 206A | FF9A |
| 0000020400 | 00FF | B800 | 0000 | 00BA | E900 | 016E | 468B | E90A |
| 0000020420 | 0030 | 1EC4 | 32AA | C726 | D287 | 0304 | E900 | 0039 |
| 0000020440 | 1EC4 | 32AA | C726 | D287 | 0504 | E900 | 002B | 1EC4 |

THU MAR 14 17:44:14 1991 PR.DLL PAGE 10, LINE 532

| | | | | | | | | |
|---|---|---|---|---|---|---|---|---|
| 0000020460 | 32AA | C726 | D287 | 0404 | E900 | 001D | 1AE9 | E900 |
| 0000020500 | 0017 | 132D | 7507 | E903 | FFC8 | 7548 | E903 | FFD0 |
| 0000020520 | 7548 | E903 | FFD8 | E3E9 | B8FF | 0000 | 00BA | E900 |
| 0000020540 | 0118 | 468B | E90A | 0084 | 46C7 | 02FA | FF00 | AC36 |
| 0000020560 | FF32 | AA36 | 9A32 | 2388 | 1F1B | C483 | FF04 | AC36 |
| 0000020600 | FF32 | AA36 | FF32 | FA76 | 779A | 5B26 | 831F | 06C4 |
| 0000020620 | 4689 | 81FC | FC7E | 3039 | 0374 | 18E9 | FF00 | 1276 |
| 0000020640 | 76FF | 6A10 | 6801 | 0120 | 006A | 006A | 006A | 006A |
| 0000020660 | FF9A | 00FF | B800 | 0000 | 00BA | E900 | 00BC | 36FF |
| 0000020700 | 32AC | 36FF | 32AA | 036A | 779A | 0D26 | 831D | 06C4 |
| 0000020720 | 76FF | FF12 | 1076 | 006A | FF9A | 00FF | B800 | 0000 |
| 0000020740 | 00BA | E900 | 0094 | 12E9 | E900 | 000F | 7548 | E903 |
| 0000020760 | FF76 | 7548 | E903 | FFC6 | EBE9 | 81FF | 0A7E | 8004 |
| 0000021000 | 0374 | 28E9 | FF00 | AC36 | FF32 | AA36 | 6A32 | 9A03 |
| 0000021020 | 2677 | 1E4F | C483 | FF06 | 1276 | 76FF | 6A10 | 9A00 |
| 0000021040 | 1F69 | 0000 | 00B8 | BA00 | 0000 | 4DE9 | E900 | 002D |
| 0000021060 | 2AE9 | E900 | 0027 | 202D | 7500 | E903 | FF24 | 7548 |
| 0000021100 | E903 | FFB7 | 7548 | E903 | FE96 | 0E2D | 7500 | E903 |
| 0000021120 | FEBA | 0B2D | 7500 | E903 | FE16 | D3E9 | FFFF | 1276 |
| 0000021140 | 76FF | FF10 | 0E76 | 76FF | FF0C | 0A76 | 76FF | FF08 |
| 0000021160 | 0676 | FF9A | 00FF | E900 | 0000 | 5E1F | 835F | 02ED |
| 0000021200 | E58B | 5D1F | CA4D | 000E | 581E | 4590 | 8B55 | 1EEC |
| 0000021220 | D88E | EC81 | 0024 | 5657 | 46C7 | DBFA | 8C03 | FC5E |
| 0000021240 | 46C7 | 00F4 | 2B00 | 89C0 | E646 | 4689 | 8EE4 | 7C06 |
| 0000021260 | 2617 | 3E83 | 21DC | 7500 | E903 | 001D | 36FF | 03B4 |
| 0000021300 | 36FF | 03B2 | 468D | 16DC | 9A50 | 1C5E | 0000 | C483 |
| 0000021320 | 3D08 | 0000 | 0374 | 0FE9 | 8E00 | 7E06 | 2617 | 3E83 |
| 0000021340 | 21F4 | 7500 | E903 | 003B | 681E | 03DF | 468D | 16E8 |
| 0000021360 | 8D50 | DC46 | 5016 | 468D | 16F6 | 6850 | 010F | 681E |
| 0000021400 | 03E4 | 36FF | 03B0 | 36FF | 03AE | 36FF | 03B4 | 36FF |
| 0000021420 | 03B2 | A69A | 001C | 8300 | 1EC4 | 4689 | 89F6 | F856 |
| 0000021440 | 08E9 | 2B00 | 89C0 | F846 | 4689 | FFF6 | B036 | FF32 |
| 0000021460 | AE36 | 8B32 | 0646 | 568B | 0508 | 0002 | 5052 | FF9A |
| 0000021500 | 00FF | FF00 | B036 | FF32 | AE36 | 6832 | 0709 | 468B |
| 0000021520 | 8B06 | 0856 | 5205 | 5200 | 9A50 | 2105 | 0000 | 36FF |
| 0000021540 | 32B0 | 36FF | 32AE | 0A68 | 8B07 | 0646 | 568B | 0508 |
| 0000021560 | 00A2 | 5052 | 209A | 0021 | FF00 | B036 | FF32 | AE36 |
| 0000021600 | 6832 | 070B | 468B | 8B06 | 0856 | A205 | 5201 | 9A50 |
| 0000021620 | 213B | 0000 | 36FF | 32B0 | 36FF | 32AE | 0C68 | 8B07 |
| 0000021640 | 0646 | 568B | 0508 | 01F2 | 5052 | FF9A | 00FF | FF00 |
| 0000021660 | B036 | FF32 | AE36 | 6832 | 0713 | 2568 | C401 | 065E |
| 0000021700 | 8326 | D2BF | 0304 | 0374 | 06E9 | B800 | 0001 | 03E9 |
| 0000021720 | B800 | 0000 | D22B | 5052 | 006A | 006A | 9F9A | 0021 |
| 0000021740 | FF00 | B036 | FF32 | AE36 | 6832 | 0714 | 2568 | C401 |
| 0000021760 | 065E | 8326 | D2BF | 0504 | 0374 | 06E9 | B800 | 0001 |
| 0000022000 | 03E9 | B800 | 0000 | D22B | 5052 | 006A | 006A | D19A |
| 0000022020 | 0021 | FF00 | B036 | FF32 | AE36 | 6832 | 0715 | 2568 |
| 0000022040 | C401 | 065E | 8326 | D2BF | 0404 | 0374 | 06E9 | B800 |
| 0000022060 | 0001 | 03E9 | B800 | 0000 | D22B | 5052 | 006A | 006A |
| 0000022100 | 159A | 001E | 8E00 | 7C06 | 2617 | 3E83 | 1D59 | 7500 |
| 0000022120 | E903 | 0009 | 7E83 | FEE0 | 0374 | 0FE9 | 8E00 | 7E06 |
| 0000022140 | 2617 | 3E83 | 1C74 | 7500 | E903 | 0039 | 468D | 16E8 |
| 0000022160 | 8D50 | F646 | 5016 | 468D | 16DC | 1E50 | E468 | 6803 |
| 0000022200 | 012B | 36FF | 03B0 | 36FF | 03AE | 36FF | 03B4 | 36FF |
| 0000022220 | 03B2 | FF9A | 00FF | 8300 | 1AC4 | 46C7 | 00E2 | E900 |
| 0000022240 | 0006 | 03E9 | E900 | 0000 | 5F5E | ED83 | 8B02 | 1FE5 |
| 0000022260 | 4D5D | 1ECB | 9058 | 5545 | EC8B | 8E1E | 81D8 | 26EC |
| 0000022300 | 5700 | C756 | FA46 | 03F3 | 5E8C | C7FC | F446 | 0101 |
| 0000022320 | C02B | 4689 | 89E4 | E246 | 068E | 177C | 8326 | 063E |

THU MAR 14 17:44:14 1991 PR.DLL PAGE 11, LINE 591

| | | | | | | | | |
|---|---|---|---|---|---|---|---|---|
| 0000022340 | 0023 | 0375 | 1DE9 | FF00 | B436 | FF03 | B236 | 8D03 |
| 0000022360 | DA46 | 5016 | 5A9A | 0020 | 8300 | 08C4 | 003D | 7400 |
| 0000022400 | E903 | 000F | 068E | 177E | 8326 | 1E3E | 0023 | 0375 |
| 0000022420 | 3BE9 | 1E00 | F768 | 8D03 | E846 | 5016 | 468D | 16DA |
| 0000022440 | 8D50 | F646 | 5016 | 4168 | 1E01 | FC68 | FF03 | B036 |
| 0000022460 | FF03 | AE36 | FF03 | B436 | FF03 | B236 | 9A03 | 20A3 |
| 0000022500 | 0000 | C483 | 891E | F646 | 5689 | E9F8 | 0008 | C02B |
| 0000022520 | 4689 | 89F8 | F646 | 36FF | 32B0 | 36FF | 32AE | 76FF |
| 0000022540 | FF06 | 0A76 | 76FF | 9A08 | 20EA | 0000 | 4689 | 8EE6 |
| 0000022560 | 7C06 | 2617 | 3E83 | 2044 | 7500 | E903 | 0009 | 7E83 |
| 0000022600 | FEDE | 0374 | 0FE9 | 8E00 | 7E06 | 2617 | 3E83 | 2070 |
| 0000022620 | 7500 | E903 | 0051 | 468B | 89E6 | E046 | 76FF | FFE4 |
| 0000022640 | E276 | 468D | 16E0 | FF50 | F476 | 76FF | FFFC | FA76 |
| 0000022660 | 4E8D | 16E8 | 8D51 | F64E | 5116 | 4E8D | 16DA | 1E51 |
| 0000022700 | FC68 | 6803 | 0148 | 36FF | 03B0 | 36FF | 03AE | 36FF |
| 0000022720 | 03B4 | 36FF | 03B2 | B99A | 001D | 8300 | 28C4 | 468B |
| 0000022740 | E9E0 | 0009 | 06E9 | 8B00 | E646 | 00E9 | 5E00 | 835F |
| 0000022760 | 02ED | E58B | 5D1F | CB4D | 581E | 4590 | 8B55 | 1EEC |
| 0000023000 | D88E | EC81 | 0000 | 5657 | 36FF | 32B0 | 36FF | 32AE |
| 0000023020 | 0A68 | 6A07 | 8B50 | 0646 | 568B | 0508 | 00A2 | 5052 |
| 0000023040 | CE9A | 0023 | FF00 | B036 | FF32 | AE36 | 6832 | 070C |
| 0000023060 | 506A | 468B | 8B06 | 0856 | F205 | 5201 | 9A50 | FFFF |
| 0000023100 | 0000 | 00E9 | 5E00 | 835F | 02ED | E58B | 5D1F | CB4D |
| 0000023120 | 581E | 4590 | 8B55 | 1EEC | D88E | EC81 | 0000 | 5657 |
| 0000023140 | AEA1 | 8B32 | B016 | E932 | 0000 | 5F5E | ED83 | 8B02 |
| 0000023160 | 1FE5 | 4D5D | 00CB | 581E | 4590 | 8B55 | 1EEC | D88E |
| 0000023200 | EC81 | 0126 | 5657 | 06C7 | 3786 | 0454 | 1E8C | 3788 |
| 0000023220 | 868D | FEFE | 5016 | 0E9A | 3115 | 8324 | D4C4 | ED9A |
| 0000023240 | 4F14 | 3D24 | 0000 | 037E | 36E9 | 8B00 | DC46 | 460B |
| 0000023260 | 750A | E903 | 0044 | 76FF | FF0C | 0A76 | F89A | 645D |
| 0000023300 | 8324 | 04C4 | 8D50 | FE86 | 16FE | FF50 | 0C76 | 76FF |
| 0000023320 | 9A0A | 5E3A | 2482 | C483 | 3D0A | 0000 | 0374 | 19E9 |
| 0000023340 | 8D00 | FE86 | 16FE | FF50 | 8836 | FF37 | 8636 | 9A37 |
| 0000023360 | 5D98 | 24A6 | C483 | E908 | 0021 | 468B | 0B0C | 0A46 |
| 0000023400 | 0375 | 16E9 | 8D00 | FE86 | 16FE | FF50 | 8836 | FF37 |
| 0000023420 | 8636 | 9A37 | 5D98 | 24C1 | C483 | C408 | 861E | 2637 |
| 0000023440 | BF80 | 0200 | 7400 | E903 | 007D | 681E | 041A | 309A |
| 0000023460 | D15F | 8324 | 04C4 | 5052 | 868D | FEDC | 5016 | 989A |
| 0000023500 | DF5D | 8324 | 08C4 | 868A | FEDC | 5098 | 1A9A | 0D5F |
| 0000023520 | 8325 | 02C4 | 8688 | FEDC | 86C7 | FEFC | 0001 | B68B |
| 0000023540 | FEFC | 86FF | FEFC | BA80 | FEDC | 7500 | E903 | 001D |
| 0000023560 | B68B | FEFC | 828A | FEDB | 5098 | F89A | 325E | 8325 |
| 0000023600 | 02C4 | B68B | FEFC | 8288 | FEDB | D1E9 | 8DFF | DC86 |
| 0000023620 | 16FE | A150 | 3786 | 168B | 3788 | 0005 | 5202 | 9A50 |
| 0000023640 | 5D98 | 2549 | C483 | 1E08 | 2268 | 8B04 | 0646 | 568B |
| 0000023660 | 0508 | 0002 | 5052 | 989A | 605D | 8325 | 08C4 | 681E |
| 0000023700 | 042A | 468B | 8B06 | 0856 | 5205 | 5200 | 9A50 | 5D98 |
| 0000023720 | 257B | C483 | FF08 | 8836 | FF37 | 8636 | 8B37 | 0646 |
| 0000023740 | 568B | 0508 | 00A2 | 5052 | 989A | 925D | 8325 | D8C4 |
| 0000023760 | 681E | 0430 | 468B | 8B06 | 0856 | A205 | 5201 | 9A50 |
| 0000024000 | 5D98 | 25B1 | C483 | A108 | 3786 | 168B | 3788 | 0005 |
| 0000024020 | 5201 | 8B50 | 0646 | 568B | 0508 | 01F2 | 5052 | 989A |
| 0000024040 | C85D | 8325 | 08C4 | 681E | 043D | 468B | 8B06 | 0856 |
| 000002406D | F205 | 5202 | 9A50 | 5D98 | 25E7 | C483 | A108 | 3786 |
| 0000024100 | 168B | 3788 | 0005 | 5202 | 8B50 | 0646 | 568B | 0508 |
| 0000024120 | 0342 | 5052 | 989A | FE5D | 8325 | 08C4 | 681E | 0443 |
| 0000024140 | 468B | 8B06 | 0856 | 9205 | 5203 | 9A50 | 5D98 | 261D |
| 0000024160 | C483 | A108 | 3786 | 168B | 3788 | 5005 | 5202 | 8B50 |
| 0000024200 | 0646 | 568B | 0508 | 03E2 | 5052 | 989A | 345D | 8326 |

THU MAR 14 17:44:14 1991 PR.DLL PAGE 12, LINE 650

| | | | | | | | | |
|---|---|---|---|---|---|---|---|---|
| 0000024220 | 08C4 | 681E | 0447 | 468B | 8B06 | 0856 | 3205 | 5204 |
| 0000024240 | 9A50 | 5D98 | 2653 | C483 | A108 | 3786 | 168B | 3788 |
| 0000024260 | A005 | 5202 | 8B50 | 0646 | 568B | 0508 | 0482 | 5052 |
| 0000024300 | 989A | A25D | 831F | 08C4 | 1EC4 | 3786 | 8B26 | F087 |
| 0000024320 | C402 | 065E | 8926 | D287 | E904 | 0000 | 5F5E | ED83 |
| 0000024340 | 8B02 | 1FE5 | 4D5D | 1ECB | 9058 | 5545 | EC8B | 8E1E |
| 0000024360 | 81D8 | FCEC | 5702 | C756 | 9646 | 0A7A | 5E8C | C798 |
| 0000024400 | 8486 | 01FD | 2B01 | 89C0 | 1286 | 89FD | 1086 | 8EFD |
| 0000024420 | 8006 | 2617 | 3E83 | 226F | 7500 | E903 | 001E | 36FF |
| 0000024440 | 0452 | 36FF | 0450 | 868D | FD08 | 5016 | 859A | 0022 |
| 0000024460 | 8300 | 08C4 | 003D | 7400 | E903 | 000F | 068E | 1782 |
| 0000024500 | 8326 | 9B3E | 0022 | 0375 | 40E9 | 1E00 | 8168 | 8D0A |
| 0000024520 | 1486 | 16FD | 8D50 | 0886 | 16FD | 8D50 | 8C86 | 16FE |
| 0000024540 | 6850 | 0105 | 681E | 0ADE | 36FF | 044E | 36FF | 044C |
| 0000024560 | 36FF | 0452 | 36FF | 0450 | CE9A | 0022 | 8300 | 1EC4 |
| 0000024600 | 8689 | FE8C | 9689 | FE8E | 0AE9 | 2B00 | 89C0 | 8E86 |
| 0000024620 | 89FE | 8C86 | C7FE | 8A86 | 00FE | 8E00 | 8006 | 2617 |
| 0000024640 | 3E83 | 26A6 | 7500 | E903 | 004C | BE83 | FDDC | 75FE |
| 0000024660 | E903 | 0042 | 76FF | 1E06 | 8868 | 8D0A | 1486 | 16FD |
| 0000024700 | 8D50 | 8C86 | 16FE | 8D50 | 0886 | 16FD | 1E50 | DE68 |
| 0000024720 | 680A | 0114 | 36FF | 044E | 36FF | 044C | 36FF | 0452 |
| 0000024740 | 36FF | 0450 | 681E | 0A94 | 6568 | 680C | 0C68 | 6B9A |
| 0000024760 | 000C | 8300 | 28C4 | 468B | E906 | 035B | 6DE9 | 6A03 |
| 0000025000 | 9A01 | FFFF | 0000 | 5EC4 | 2608 | BF80 | 00A2 | 7400 |
| 0000025020 | E903 | 0009 | 86C7 | FE8A | 0480 | A9E9 | 8B00 | 0846 |
| 0000025040 | 568B | 050A | 00A2 | 5052 | 868D | FD04 | 5016 | 709A |
| 0000025060 | 001B | 8900 | 8A86 | 83FE | 8ABE | 00FE | 0374 | 85E9 |
| 0000025100 | 8A00 | 0786 | 2AFD | E9E4 | 0069 | 5EC4 | 2608 | BF83 |
| 0000025120 | 04D2 | 7503 | E903 | 0009 | 86C7 | FE8A | 0485 | 22E9 |
| 0000025140 | C700 | 9446 | 0001 | 468B | 8B08 | 0A56 | A205 | 5200 |
| 0000025160 | 1E50 | 9B68 | 8D0A | 9086 | 16FE | 9A50 | 627E | 282F |
| 0000025200 | C483 | E90C | 0040 | 46C7 | 0394 | 8B00 | 0846 | 568B |
| 0000025220 | 050A | 00A2 | 5052 | 868D | FE90 | 5016 | 989A | 295D |
| 0000025240 | 8324 | 08C4 | 1FE9 | C700 | 8A86 | 81FE | E904 | 0016 |
| 0000025260 | 13E9 | 2D00 | 0029 | 0375 | 8FE9 | 2DFF | 0003 | 0375 |
| 0000025300 | C3E9 | E9FF | FFE1 | BE83 | FE8A | 7400 | E903 | 0191 |
| 0000025320 | 5EC4 | 2608 | BF80 | 01F2 | 7400 | E903 | 0042 | 868D |
| 0000025340 | FE90 | 5016 | 006A | 006A | 468D | 1690 | 9A50 | 0F0C |
| 0000025360 | 0000 | 8689 | FE8A | BE83 | FE8A | 7400 | E903 | 001D |
| 0000025400 | 5EC4 | 2690 | 77FF | 264A | 77FF | 1E48 | A168 | 8D0A |
| 0000025420 | 8686 | 16FD | 9A50 | 627E | 28C4 | C483 | E90C | 0019 |
| 0000025440 | 468B | 8B08 | 0A56 | F205 | 5201 | 8D50 | 8686 | 16FD |
| 0000025460 | 9A50 | 5D98 | 290E | C483 | 8308 | 8ABE | 00FE | 0374 |
| 0000025500 | 1EE9 | 8B01 | 0846 | 568B | 050A | 0482 | 5052 | 468B |
| 0000025520 | 8B08 | 0A56 | E205 | 5203 | 8B50 | 0846 | 568B | 050A |
| 0000025540 | 0342 | 5052 | 868D | FD86 | 5016 | 5EC4 | 2608 | B7FF |
| 0000025560 | 04D2 | 76FF | 8D94 | 9086 | 16FE | 9A50 | 2BB2 | 2938 |
| 0000025600 | C483 | 8918 | 8A86 | 83FE | 8ABE | 00FE | 0374 | B4E9 |
| 0000025620 | C400 | 085E | 8B26 | D287 | E904 | 0046 | 681E | 0AAF |
| 0000025640 | 468D | 169A | 9A50 | 5D98 | 294C | C483 | E908 | 0049 |
| 0000025660 | 681E | 0AB9 | 468D | 169A | 9A50 | 5D98 | 2960 | C483 |
| 0000025700 | E908 | 0035 | 681E | 0AC6 | 468D | 169A | 9A50 | 5D98 |
| 0000025720 | 29A6 | C483 | E908 | 0021 | 46C6 | 009A | 1AE9 | E900 |
| 0000025740 | 0017 | 032D | 7500 | E903 | FFB2 | 7548 | E903 | FFC0 |
| 0000025760 | 7548 | E903 | FFCE | DFE9 | 8DFF | 9A46 | 5016 | 468B |
| 0000026000 | 8B08 | 0A56 | A205 | 5200 | 1E50 | CD68 | 8D0A | 2086 |
| 0000026020 | 16FD | 9A50 | 627E | 29EC | C483 | 9A10 | 29FC | 0000 |
| 0000026040 | 868D | FD86 | 5016 | 868D | FD20 | 5016 | FF9A | 00FF |
| 0000026060 | 8900 | 8A86 | 83FE | 8ABE | 05FE | 0374 | 06E9 | C700 |

THU MAR 14 17:44:14 1991 PR.DLL PAGE 13, LINE 709

| | | | | | | | | |
|---|---|---|---|---|---|---|---|---|
| 0000026100 | 8A86 | 39FE | C430 | 085E | 8026 | F2BF | 0001 | 0374 |
| 0000026120 | 0EE9 | 8D00 | 8686 | 16FD | 9A50 | 6C50 | 2A16 | C483 |
| 0000026140 | 6A04 | 9A00 | 2792 | 0000 | 01E9 | 9A01 | FFFF | 0000 |
| 0000026160 | 468B | 8B08 | 0A56 | A205 | 5200 | FF50 | 8836 | FF37 |
| 0000026200 | 8636 | 9A37 | 5D98 | 2A35 | C483 | 8B08 | 0846 | 568B |
| 0000026220 | 050A | 01F2 | 5052 | 86A1 | 8B37 | 8816 | 0537 | 0100 |
| 0000026240 | 5052 | 989A | 545D | 832A | 08C4 | 468B | 8B08 | 0A56 |
| 0000026260 | 4205 | 5203 | A150 | 3786 | 168B | 3788 | 0005 | 5202 |
| 0000026300 | 9A50 | 5D98 | 2A73 | C483 | 8B08 | 0846 | 568B | 050A |
| 0000026320 | 03E2 | 5052 | 86A1 | 8B37 | 8816 | 0537 | 0250 | 5052 |
| 0000026340 | 989A | 925D | 832A | 08C4 | 468B | 8B08 | 0A56 | 8205 |
| 0000026360 | 5204 | A150 | 3786 | 168B | 3788 | A005 | 5202 | 9A50 |
| 0000026400 | 5D98 | 2B18 | C483 | C408 | 085E | 8B26 | D287 | C404 |
| 0000026420 | 861E | 2637 | 8789 | 02F0 | 016A | 646A | 006A | 868D |
| 0000026440 | FE86 | 5016 | BA9A | 000C | 8900 | 8A86 | 83FE | 8ABE |
| 0000026460 | 00FE | 0374 | 11E9 | FF00 | 88B6 | FFFE | 86B6 | 9AFE |
| 0000026500 | 0CD5 | 0000 | 8689 | FE8A | 21E9 | C700 | 8A86 | 18FE |
| 0000026520 | E900 | 0018 | 15E9 | 4800 | 0375 | 9FE9 | 48FC | 0375 |
| 0000026540 | 9CE9 | 48FC | 0375 | 02E9 | E9FF | FFDF | BE81 | FE8A |
| 0000026560 | 3039 | 0375 | 16E9 | 8300 | 8ABE | 00FE | 0375 | 0CE9 |
| 0000026600 | FF00 | 8AB6 | 9AFE | 3753 | 280E | C483 | 8E02 | 8006 |
| 0000026620 | 2617 | 3E83 | 2732 | 7500 | E903 | 000A | BE83 | FD0C |
| 0000026640 | 74FE | E903 | 000F | D68E | 1782 | 8326 | D33E | 0026 |
| 0000026660 | 0375 | 5BE9 | 8B00 | 8A86 | 89FE | 0E86 | FFFD | 12B6 |
| 0000026700 | FFFD | 10B6 | 8DFD | 0E86 | 16FD | FF50 | 84B6 | FFFD |
| 0000026720 | 9876 | 76FF | 8D96 | 148E | 16FD | 8D51 | 8C8E | 16FE |
| 0000026740 | 8D51 | 088E | 16FD | 1E51 | DE68 | 680A | 01A5 | 36FF |
| 0000026760 | 044E | 36FF | 044C | 36FF | 0452 | 36FF | 0450 | 679A |
| 0000027000 | 0023 | 8300 | 28C4 | 868B | FD0E | 0AE9 | E900 | 0007 |
| 0000027020 | 868B | FE8A | 00E9 | 5E00 | 835F | 02ED | E58B | 5D1F |
| 0000027040 | CB4D | 581E | 4590 | 8B55 | 1EEC | D88E | EC81 | 0118 |
| 0000027060 | 5657 | 86C7 | FEF4 | 0000 | 681E | 0AE5 | 76FF | FF10 |
| 0000027100 | 0E76 | 529A | 343F | 832C | 08C4 | 8689 | FEE8 | 9689 |
| 0000027120 | FEEA | 868B | FEEA | 860B | FEE8 | 0374 | 09E9 | C700 |
| 0000027140 | F486 | 87FE | E904 | 019E | 76FF | FF08 | 0676 | 006A |
| 0000027160 | 006A | 868D | FEFA | 5016 | 7E9A | 0028 | 890D | F486 |
| 0000027200 | 83FE | F4BE | 00FE | 0374 | 7BE9 | C401 | FA9E | 26FE |
| 0000027220 | 77FF | 264A | 77FF | 1E48 | E768 | 8D0A | FE86 | 16FE |
| 0000027240 | 9A50 | 627E | 2C46 | C483 | 1E0C | F568 | 8D0A | FE86 |
| 0000027260 | 16FE | 9A50 | 3F52 | 2C6C | C483 | 8908 | F686 | 89FE |
| 0000027300 | F896 | C4FE | FA9E | 26FE | 77FF | 264A | 77FF | 1E48 |
| 0000027320 | F768 | 8D0A | FE86 | 16FE | 9A50 | 627E | 2C7E | C483 |
| 0000027340 | 1E0C | 0568 | 8D0B | FE86 | 16FE | 9A50 | 3F52 | 2CE7 |
| 0000027360 | C483 | 8908 | F086 | 89FE | F296 | 8BFE | F286 | 0BFE |
| 0000027400 | F086 | 74FE | E903 | 0009 | 86C7 | FEF4 | 0484 | 9EE9 |
| 0000027420 | 8B00 | F886 | 0BFE | F686 | 75FE | E903 | 0041 | 868D |
| 0000027440 | FEEC | 5016 | 76FF | FF1C | 1A76 | 76FF | FF18 | 1676 |
| 0000027460 | 76FF | FF14 | 1276 | 76FF | FF0C | 0A76 | B6FF | FEEA |
| 0000027500 | B6FF | FEE8 | B6FF | FEF2 | B6FF | FEF0 | B6FF | FEF8 |
| 0000027520 | B6FF | FEF6 | A89A | F22D | 832C | 20C4 | 16E9 | 9A00 |
| 0000027540 | 14ED | 2CF8 | 9A50 | 161C | 2D3A | C483 | 8902 | EC86 |
| 0000027560 | 89FE | EE96 | 8BFE | F886 | 0BFE | F686 | 75FE | E903 |
| 0000027600 | 0006 | 01B8 | E900 | 0003 | 00B8 | 5000 | B6FF | FEEE |
| 0000027620 | B6FF | FEEC | B6FF | FEEA | B6FF | FEE8 | 76FF | FF0C |
| 0000027640 | F2B6 | FFFE | F0B6 | 9AFE | 333D | 2D57 | C483 | 8B10 |
| 0000027660 | F886 | 0BFE | F686 | 75FE | E903 | 0010 | B6FF | FEF8 |
| 0000027700 | B6FF | FEF6 | FE9A | 743D | 832D | 04C4 | 868B | FEF2 |
| 0000027720 | 860B | FEF0 | 0375 | 10E9 | FF00 | F2B6 | FFFE | F0B6 |
| 0000027740 | 9AFE | 3DFE | 2D91 | C483 | 8B04 | EA86 | 0BFE | E886 |

THU MAR 14 17:44:14 1991 PR.DLL PAGE 14, LINE 768

| | | | | | | | | |
|---|---|---|---|---|---|---|---|---|
| 0000027760 | 75FE | E903 | 0010 | B6FF | FEEA | B6FF | FEE8 | FE9A |
| 0000030000 | A83D | 8328 | 04C4 | 868B | FEF4 | 00E9 | 5E00 | 835F |
| 0000030020 | 02ED | E58B | 5D1F | CB4D | 581E | 4590 | 8B55 | 1EEC |
| 0000030040 | D88E | EC81 | 01E4 | 5657 | 76FF | FF1C | 1A76 | 681E |
| 0000030060 | 0B07 | 76FF | FF10 | 0E76 | 6A9A | E33F | 832D | 0CC4 |
| 0000030100 | 76FF | FF18 | 1676 | 681E | 0B12 | 76FF | FF10 | 0E76 |
| 0000030120 | 6A9A | FB3F | 832D | 0CC4 | 76FF | FF20 | 1E76 | 681E |
| 0000030140 | 0B1D | 76FF | FF10 | 0E76 | 6A9A | 093F | 832E | 0CC4 |
| 0000030160 | 868D | FE2C | 5016 | 109A | 1768 | 832E | 04C4 | 868D |
| 0000030200 | FE2C | 5016 | 189A | 2B65 | 832E | 04C4 | 5052 | 681E |
| 0000030220 | 0B28 | 76FF | FF10 | 0E76 | 6A9A | 423F | 832E | 0CC4 |
| 0000030240 | 468B | E914 | 0046 | 681E | 0B33 | 468D | 16EA | 9A50 |
| 0000030260 | 5D98 | 2E56 | C483 | E908 | 0049 | 681E | 0B3D | 468D |
| 0000030300 | 16EA | 9A50 | 5D98 | 2E6A | C483 | E908 | 0035 | 681E |
| 0000030320 | 0B4A | 468D | 16EA | 9A50 | 5D98 | 2EA5 | C483 | E908 |
| 0000030340 | 0021 | 46C6 | 00EA | 1AE9 | E900 | 0017 | 032D | 7500 |
| 0000030360 | E903 | FFB2 | 7548 | E903 | FFC0 | 7548 | E903 | FFCE |
| 0000030400 | DFE9 | 8DFF | EA46 | 5016 | 681E | 0B51 | 76FF | FF10 |
| 0000030420 | 0E76 | 6A9A | B23F | 832E | 0CC4 | 468D | 16EA | 9A50 |
| 0000030440 | 5DF8 | 2EC2 | C483 | 5004 | 2D6A | 468D | 16EA | 9A50 |
| 0000030460 | 6BA4 | 2ED9 | C483 | 8D08 | EA46 | 5016 | 681E | 0B70 |
| 0000030500 | 76FF | FF1C | 0E76 | 6A9A | F03F | 832E | 0CC4 | 76FF |
| 0000030520 | FF08 | 0676 | 8468 | 8D00 | 3286 | 16FE | 9A50 | 610A |
| 0000030540 | 2F08 | C483 | 8D0A | E686 | 16FE | 1E50 | 8F68 | 8D0B |
| 0000030560 | 328E | 16FE | 9A51 | 62F2 | 2F16 | C483 | 8D0C | E686 |
| 0000030600 | 16FE | 9A50 | 5DF8 | 2F32 | C483 | 3D04 | 0003 | 0377 |
| 0000030620 | 41E9 | 6A00 | 1E03 | 9268 | 8D0B | E686 | 16FE | 9A50 |
| 0000030640 | 5DF8 | 2F42 | C483 | 8B04 | 8DF0 | E382 | 16FE | 9A50 |
| 0000030660 | 5E3A | 2F58 | C483 | 3D0A | 0000 | 0374 | 15E9 | 8D00 |
| 0000030700 | E686 | 16FE | 9A5D | 5DF8 | 2F77 | C483 | 8B04 | C6F0 |
| 0000030720 | E382 | 00FE | 868D | FEE6 | 5016 | 681E | 0B96 | 76FF |
| 0000030740 | FF10 | 0E76 | 6A9A | 8E3F | 832F | 0CC4 | 76FF | FF08 |
| 0000030760 | 0676 | 8468 | 8D00 | 3286 | 16FE | 9A50 | 610A | 2BD5 |
| 0000031000 | C483 | 830A | 127E | 7403 | E903 | 0018 | 868D | FE32 |
| 0000031020 | 5016 | 681E | 0BA8 | 76FF | FF10 | 0E76 | 6A9A | C63F |
| 0000031040 | 832F | 0CC4 | 76FF | FF08 | 0676 | 8468 | 8D00 | 3286 |
| 0000031060 | 16FE | 9A50 | 610A | 2FDE | C483 | 8D0A | 2086 | 16FE |
| 0000031100 | 1E50 | C068 | 8D0B | 328E | 16FE | 9A51 | 62F2 | 2FEC |
| 0000031120 | C483 | 8D0C | 2086 | 16FE | 9A50 | 6518 | 3000 | C483 |
| 0000031140 | 5204 | 1E50 | C468 | FF0B | 1076 | 76FF | 9A0E | 3F6A |
| 0000031160 | 3017 | C483 | FF0C | 0876 | 76FF | 6806 | 0084 | 868D |
| 0000031200 | FE32 | 5016 | 0A9A | 2561 | 8330 | 0AC4 | 868A | FE32 |
| 0000031220 | 5098 | 1A9A | 535F | 8330 | 02C4 | 8688 | FE32 | 86C7 |
| 0000031240 | FE30 | 0001 | B68B | FE30 | 86FF | FE30 | BA80 | FE32 |
| 0000031260 | 7500 | E903 | 001D | B68B | FE30 | 828A | FE31 | 5098 |
| 0000031300 | F89A | 765E | 8330 | 02C4 | B68B | FE30 | 8288 | FE31 |
| 0000031320 | D1E9 | 8DFF | 3286 | 16FE | 1E50 | D268 | FF0B | 1076 |
| 0000031340 | 76FF | 9A0E | 3F6A | 308D | C483 | FF0C | 0876 | 76FF |
| 0000031360 | 6806 | 0084 | 868D | FE32 | 5016 | 0A9A | 9F61 | 8330 |
| 0000031400 | 0AC4 | 681E | 0BE8 | 76FF | FF10 | 0E76 | 6A9A | B33F |
| 0000031420 | 8330 | 08C4 | 76FF | FF10 | 0E76 | 868D | FE32 | 5016 |
| 0000031440 | A09A | C561 | 8330 | 08C4 | 681E | 0BF9 | 76FF | FF10 |
| 0000031460 | 0E76 | 6A9A | D73F | 8330 | 08C4 | 681E | 0C07 | 76FF |
| 0000031500 | FF10 | 0E76 | 6A9A | EE3F | 8330 | 08C4 | 76FF | FF08 |
| 0000031520 | 0676 | 8468 | 8D00 | 3286 | 16FE | 9A50 | 610A | 3106 |
| 0000031540 | C483 | 8D0A | 1E86 | 16FE | 1E50 | 1368 | 8D0C | 328E |
| 0000031560 | 16FE | 9A51 | 62F2 | 3122 | C483 | 6B0C | 1E86 | 14FE |
| 0000031600 | EA05 | 1E08 | 1E50 | 1668 | FF0C | 1076 | 76FF | 9A0E |
| 0000031620 | 3F6A | 3139 | C483 | FF0C | 0876 | 76FF | 6806 | 0084 |

THU MAR 14 17:44:14 1991 PR.DLL PAGE 15, LINE 827

| | | | | | | | | |
|---|---|---|---|---|---|---|---|---|
| 0000031640 | 868D | FE32 | 5016 | 0A9A | 5161 | 8331 | 0AC4 | 868D |
| 0000031660 | FE32 | 5016 | 681E | 0C35 | 76FF | FF10 | 0E76 | 6A9A |
| 0000031700 | 683F | 8331 | 0CC4 | 76FF | FF08 | 0676 | 8468 | 8D00 |
| 0000031720 | 3286 | 16FE | 9A50 | 610A | 3189 | C483 | 830A | 127E |
| 0000031740 | 7403 | E903 | 0133 | 868D | FE32 | 5016 | 681E | 0C5C |
| 0000031760 | 76FF | FF10 | 0E76 | 6A9A | B03F | 8331 | 0CC4 | 86C7 |
| 0000032000 | FEE4 | 0000 | BE83 | FEE4 | 7400 | E903 | 008A | 76FF |
| 0000032020 | FF0C | 0A76 | 8468 | 8D00 | 3286 | 16FE | 9A50 | 610A |
| 0000032040 | 31F2 | C483 | 0B0A | 75D0 | E903 | 006C | 868D | FE24 |
| 0000032060 | 5016 | 468D | 16E6 | 8D50 | C086 | 16FE | 8D50 | E686 |
| 0000032100 | 16FE | 8D50 | C486 | 16FE | 8D50 | 1E86 | 16FE | 8D50 |
| 0000032120 | C28E | 16FE | 1E51 | 8268 | 8D0C | 3296 | 16FE | 9A52 |
| 0000032140 | 62F2 | 3269 | C483 | 8324 | C2BE | 05FE | 0374 | 0AE9 |
| 0000032160 | 8300 | 1EBE | 01FE | 0374 | 14E9 | 8300 | C2BE | 12FE |
| 0000032200 | 0375 | 0AE9 | 8300 | C2BE | 11FE | 0374 | 06E9 | C700 |
| 0000032220 | E486 | 01FE | E900 | FF6C | BE83 | FEE4 | 7500 | E903 |
| 0000032240 | 0057 | 868D | FE32 | 5016 | 681E | 0C9A | 468B | 8BE6 |
| 0000032260 | E856 | 862B | FE20 | 961B | FE22 | 5052 | B6FF | FEC0 |
| 0000032300 | 868D | FEE6 | 5016 | 868D | FEC4 | 5016 | B6FF | FE1E |
| 0000032320 | B6FF | FEC2 | 006A | 2B9A | 8135 | 8332 | 1CC4 | 868D |
| 0000032340 | FE38 | 5016 | 681E | 0CB5 | 76FF | FF10 | 0E76 | 6A9A |
| 0000032360 | 963F | 8332 | 0CC4 | 12E9 | 1E00 | CE68 | FF0C | 1076 |
| 0000032400 | 76FF | 9A0E | 3F6A | 32A4 | C483 | FF08 | 0C76 | 76FF |
| 0000032420 | 9A0A | 621C | 32BB | C483 | FF04 | 0876 | 76FF | 6806 |
| 0000032440 | 0084 | 868D | FE32 | 5016 | 0A9A | D261 | 8332 | 0AC4 |
| 0000032460 | 76FF | FF08 | 0676 | 8468 | 8D00 | 3286 | 16FE | 9A50 |
| 0000032500 | 610A | 32EA | C483 | 8D0A | 2886 | 16FE | 1E50 | E768 |
| 0000032520 | 8D0C | 328E | 16FE | 9A51 | 62F2 | 3300 | C483 | 8D0C |
| 0000032540 | B686 | 16FE | FF50 | 2AB6 | FFFE | 28B6 | 9AFE | 36A8 |
| 0000032560 | 3318 | C483 | 8D08 | B686 | 16FE | 1E50 | EB68 | FF0C |
| 0000032600 | 1076 | 76FF | 9A0E | 3F6A | 2DCB | C483 | 8B0C | 2086 |
| 0000032620 | 8BFE | 2296 | C4FE | 225E | 8926 | 2607 | 5789 | E902 |
| 0000032640 | 0000 | 5F5E | ED83 | 8B02 | 1FE5 | 4D5D | 1ECB | 9058 |
| 0000032660 | 5545 | EC8B | 8E1E | 81D8 | B8EC | 5701 | 8356 | 147E |
| 0000032700 | 7400 | E903 | 0036 | 681E | 0D0C | 76FF | FF0E | 0C76 |
| 0000032720 | 6A9A | 753F | 8333 | 08C4 | 681E | 0D31 | 76FF | FF0E |
| 0000032740 | 0C76 | 6A9A | 873F | 8333 | 08C4 | 681E | 0D59 | 76FF |
| 0000032760 | FF0E | 0C76 | 6A9A | 993F | 8333 | 08C4 | 681E | 0D86 |
| 0000033000 | 76FF | FF0E | 0C76 | 6A9A | AB3F | 8333 | 08C4 | 681E |
| 0000033020 | 0DA7 | 76FF | FF0E | 0C76 | 6A9A | BD3F | 8333 | 08C4 |
| 0000033040 | 681E | 0DC7 | 76FF | FF0E | 0C76 | 6A9A | CF3F | 8333 |
| 0000033060 | 08C4 | 681E | 0E15 | 76FF | FF0E | 0C76 | 6A9A | AF3F |
| 0000033100 | 832F | 08C4 | 86C7 | FED4 | 0000 | 76FF | FF08 | 0676 |
| 0000033120 | 8468 | 8D00 | 5086 | 16FE | 9A50 | 610A | 342E | C483 |
| 0000033140 | 0B0A | 75D0 | E903 | 0125 | 868D | FE4C | 5016 | 468D |
| 0000033160 | 16FA | 8D50 | D686 | 16FE | 8D50 | FA86 | 16FE | 8D50 |
| 0000033200 | DA86 | 16FE | 8D50 | 4886 | 16FE | 8D50 | D886 | 16FE |
| 0000033220 | 1E50 | 6568 | 8D0E | 5086 | 16FE | 9A50 | 62F2 | 3501 |
| 0000033240 | C483 | C724 | 4A86 | 00FE | 8B00 | 0A46 | 5CE9 | C700 |
| 0000033260 | 4A86 | 01FE | E900 | 0074 | BE83 | FE48 | 7501 | E903 |
| 0000033300 | 0006 | 86C7 | FE4A | 0001 | 61E9 | 8300 | D8BE | 05FE |
| 0000033320 | 0374 | 10E9 | 8300 | 48BE | 01FE | 0375 | 06E9 | C700 |
| 0000033340 | 4A86 | 01FE | E900 | 0044 | BE83 | FED8 | 7504 | E903 |
| 0000033360 | 000A | BE83 | FED8 | 7405 | E903 | 0006 | 86C7 | FE4A |
| 0000033400 | 0001 | 27E9 | E900 | 0024 | 21E9 | 4800 | 0375 | 9EE9 |
| 0000033420 | 48FF | 0375 | A1E9 | 48FF | 0375 | 92E9 | 48FF | 0375 |
| 0000033440 | A8E9 | 48FF | 0375 | BFE9 | E9FF | FFD9 | BE83 | FE4A |
| 0000033460 | 7500 | E903 | 0054 | 86FF | FED4 | 868D | FE50 | 5016 |
| 0000033500 | 681E | 0E7D | 4E8B | 8BFA | FC56 | 4E2B | 1B10 | 1256 |

THU MAR 14 17:44:14 1991 PR.DLL PAGE 16, LINE 886

| | | | | | | | | |
|---|---|---|---|---|---|---|---|---|
| 0000033520 | 5152 | B6FF | FED6 | 8E8D | FEFA | 5116 | 8E8D | FEDA |
| 0000033540 | 5116 | B6FF | FE48 | B6FF | FED8 | B6FF | FED4 | 2B9A |
| 0000033560 | 1535 | 8335 | 1CC4 | 76FF | FF0E | 0C76 | 868D | FE50 |
| 0000033600 | 5016 | A09A | 6361 | 8333 | 08C4 | BDE9 | E9FE | 0000 |
| 0000033620 | 5F5E | ED83 | 8B02 | 1FE5 | 4D5D | 1ECB | 9058 | 5545 |
| 0000033640 | EC8B | 8E1E | 81D8 | 1CEC | 5700 | 8356 | 087E | 7F14 |
| 0000033660 | E903 | 0005 | 46C7 | 1408 | 8300 | 0A7E | 7F13 | E903 |
| 0000033700 | 0005 | 46C7 | 130A | FF00 | 1276 | 76FF | 9A10 | 5DF8 |
| 0000033720 | 357C | C483 | 3D04 | 0003 | 0377 | 4BE9 | 6A00 | 1E03 |
| 0000033740 | 9F68 | FF0E | 1276 | 76FF | 9A10 | 5DF8 | 358F | C483 |
| 0000033760 | 0304 | 1046 | 568B | 2D12 | 0003 | 5052 | 3A9A | A55E |
| 0000034000 | 8335 | 0AC4 | 003D | 7400 | E903 | 001C | 76FF | FF12 |
| 0000034020 | 1076 | F89A | C35D | 8335 | 04C4 | 4689 | 8BE4 | E45E |
| 0000034040 | 76C4 | 2610 | 40C6 | 00FD | 5C6A | 76FF | FF12 | 1076 |
| 0000034060 | 189A | E46B | 8335 | 06C4 | 4689 | 89E6 | E856 | 468B |
| 0000034100 | 0BE8 | E646 | 0374 | 16E9 | 6A00 | FF3A | 1276 | 76FF |
| 0000034120 | 9A10 | 6B18 | 3624 | C483 | 8906 | E646 | 5689 | 8BE8 |
| 0000034140 | E846 | 460B | 75E6 | E903 | 0006 | 46FF | E9E6 | 000C |
| 0000034160 | 468B | 8B10 | 1256 | 4689 | 89E6 | E856 | 7E83 | 0014 |
| 0000034200 | 0377 | 17E9 | FF00 | 1476 | 681E | 0EA3 | 468D | 16F4 |
| 0000034220 | 9A50 | 627E | 3638 | C483 | E90A | 0011 | 681E | 0EA6 |
| 0000034240 | 468D | 16F4 | 9A50 | 5D98 | 364B | C483 | 8D08 | EA46 |
| 0000034260 | 5016 | 76FF | FF18 | 1676 | A89A | 9536 | 8336 | 08C4 |
| 0000034300 | 468B | 0B1C | 1A46 | 0375 | 3FE9 | 8D00 | EA46 | 5016 |
| 0000034320 | 468D | 16F4 | FF50 | E876 | 76FF | FFE6 | 0E76 | 76FF |
| 0000034340 | 6B0C | 0A46 | 0514 | 08EA | 501E | 466B | 1408 | 4605 |
| 0000034360 | 1E07 | FF50 | 0676 | 76FF | FF1C | 1A76 | 76FF | FF20 |
| 0000034400 | 1E76 | 7E9A | EC62 | 8333 | 22C4 | 00E9 | 5E00 | 835F |
| 0000034420 | 02ED | E58B | 5D1F | CB4D | 581E | 4590 | 8B55 | 1EEC |
| 0000034440 | D88E | EC81 | 000E | 5657 | 006A | 1068 | FF0E | 0876 |
| 0000034460 | 76FF | 9A06 | 6CD2 | 36E0 | 4689 | 89F6 | F856 | 006A |
| 0000034500 | 3C6A | FF6A | F068 | FFF1 | F876 | 76FF | 9AF6 | 6D6C |
| 0000034520 | 36ED | 4603 | 1306 | 0856 | 5052 | D29A | 066C | 8937 |
| 0000034540 | F246 | 5689 | 6AF4 | 6A00 | 6A3C | 6AFF | FFC4 | F876 |
| 0000034560 | 76FF | 9AF6 | 6D6C | 3713 | 462B | 1BF2 | F456 | 5052 |
| 0000034600 | 6C9A | 606D | 0335 | 0646 | 5613 | 8908 | FA46 | 5689 |
| 0000034620 | FFFC | FC76 | 76FF | FFFA | F476 | 76FF | FFF2 | F876 |
| 0000034640 | 76FF | 1EF6 | AA68 | FF0E | 0C76 | 76FF | 9A0A | 627E |
| 0000034660 | 36C6 | C483 | E914 | 0000 | 5F5E | ED83 | 8B02 | 1FE5 |
| 0000034700 | 4D5D | 1ECB | 9058 | 5545 | EC8B | 8E1E | 81D8 | 2CEC |
| 0000034720 | 5700 | C756 | FA46 | 0EBC | 5E8C | C7FC | EE46 | 0101 |
| 0000034740 | C02B | 4689 | 89E0 | DE46 | 068E | 1780 | 8326 | 073E |
| 0000034760 | 0038 | 0375 | 1DE9 | FF00 | 5236 | FF04 | 5036 | 8D04 |
| 0000035000 | D646 | 5016 | BD9A | 0026 | 8300 | 08C4 | 003D | 7400 |
| 0000035020 | E903 | 000F | 068E | 1782 | 8326 | 923E | 0038 | 0375 |
| 0000035040 | 3BE9 | 1E00 | C368 | 8D0E | E246 | 5016 | 468D | 16D6 |
| 0000035060 | 8D50 | F246 | 5016 | 9668 | 1E03 | DE68 | FF0E | 4E36 |
| 0000035100 | FF04 | 4C36 | FF04 | 5236 | FF04 | 5036 | 9A04 | 2709 |
| 0000035120 | 0000 | C483 | 891E | F246 | 5689 | E9F4 | 0008 | C02B |
| 0000035140 | 4689 | 89F4 | F246 | 46C7 | 01D4 | C700 | F046 | 0000 |
| 0000035160 | 068E | 1780 | 8326 | 7A3E | 0038 | 0375 | 48E9 | 8300 |
| 0000035200 | DA7E | 75FE | E903 | 003F | 76FF | 1E06 | CA68 | 8D0E |
| 0000035220 | E246 | 5016 | 468D | 16F2 | 8D50 | D646 | 5016 | 681E |
| 0000035240 | 0EDE | 9E68 | FF03 | 4E36 | FF04 | 4C36 | FF04 | 5236 |
| 0000035260 | FF04 | 5036 | 1E04 | D768 | 680E | 2779 | 7C68 | 9A27 |
| 0000035300 | 277F | 0000 | C483 | 9A28 | 23E0 | 3740 | 4689 | 89F6 |
| 0000035320 | F856 | 76FF | FFF8 | F676 | 76FF | 9A06 | FFFF | 0000 |
| 0000035340 | 4689 | 8EF0 | 8006 | 2617 | 3E83 | 2B24 | 7500 | E903 |
| 0000035360 | 0009 | 7E83 | FEDA | 0374 | 0FE9 | 8E00 | 8206 | 2617 |

THU MAR 14 17:44:14 1991 PR.DLL PAGE 17, LINE 945

| | | | | | | | | |
|---|---|---|---|---|---|---|---|---|
| 0000035400 | 3E83 | 2B3D | 7500 | E903 | 0051 | 468B | 89F0 | DC46 |
| 0000035420 | 76FF | FFE0 | DE76 | 468D | 16DC | FF50 | EE76 | 76FF |
| 0000035440 | FFFC | FA76 | 4E8D | 16E2 | 8D51 | F24E | 5116 | 4E8D |
| 0000035460 | 16D6 | 1E51 | DE68 | 680E | 03A5 | 36FF | 044E | 36FF |
| 0000035500 | 044C | 36FF | 0452 | 36FF | 0450 | 8F9A | 002B | 8300 |
| 0000035520 | 28C4 | 468B | E9DC | 0009 | 06E9 | 8B00 | F046 | 00E9 |
| 0000035540 | 5E00 | 835F | 02ED | E58B | 5D1F | CB4D | 0000 | 0000 |
| 0000035560 | 0000 | 0000 | 0000 | 0000 | 0000 | 0000 | 8B55 | 1EEC |
| 0000035600 | F268 | 1E0E | F668 | 9A0E | FFFF | 0000 | 068E | 0EF2 |
| 0000035620 | A126 | 0015 | 32A3 | BB0F | 0EFC | 1F8C | C5BE | 8337 |
| 0000035640 | FEE6 | 1E56 | FF9A | 00FF | 0B00 | 74C0 | 3304 | EBC0 |
| 0000035660 | 893A | 0477 | 894E | FA36 | 830E | 03EE | 04C7 | 0001 |
| 0000035700 | 7789 | 8906 | 0877 | C683 | C702 | FE04 | 89FF | 0A77 |
| 0000035720 | 681E | 0EF0 | 681E | 0EEE | FF9A | 00FF | E800 | 0020 |
| 0000035740 | D09A | 5A3B | E838 | 0066 | 01B8 | 5D00 | 50CB | 8E9A |
| 0000035760 | 733B | 9A39 | 3D08 | 3981 | FF68 | 9A00 | 3A97 | 3986 |
| 0000036000 | BB1E | 000D | FF33 | 068E | 0EF0 | FFB9 | 267F | 3D80 |
| 0000036020 | 7500 | 4701 | 8026 | 003D | 3174 | 10BE | 8B0F | 8BD1 |
| 0000036040 | F3CB | 8BA6 | 74CA | 3308 | F2C0 | 74AE | EBE7 | 061C |
| 0000036060 | 071E | F78B | BF1F | 0F37 | 2CAC | 7241 | C00E | 04E0 |
| 0000036100 | AC92 | 412C | 0572 | C20A | EBAA | 1FED | 00C3 | 02BB |
| 0000036120 | 5200 | D48B | A780 | 0F37 | 50B7 | C48B | 1653 | 1650 |
| 0000036140 | 9A52 | FFFF | 0000 | C00B | 7558 | B110 | 3C40 | 7401 |
| 0000036160 | 3C06 | 7502 | B106 | 0808 | 378F | 4B0F | D679 | E85A |
| 0000036200 | 0026 | 70BE | BF17 | 1770 | 5FE8 | BE01 | 1770 | 70BF |
| 0000036220 | E817 | 0156 | 70B8 | 3D17 | 1774 | 0B74 | 016A | 680E |
| 0000036240 | 3A69 | FF9A | 00FF | C300 | 0E8B | 1766 | 2AE3 | 06C4 |
| 0000036260 | 1768 | C28C | DB33 | 1EFF | 1764 | 0373 | 61E9 | 8E01 |
| 0000036300 | F606 | 260E | 1E8B | 0006 | 754B | C40D | 6C06 | 8C17 |
| 0000036320 | BBC2 | 0003 | 1EFF | 1764 | B8C3 | 1DEC | D88E | 47A1 |
| 0000036340 | 0B11 | 75C0 | 0E10 | C2A1 | 0B16 | 75C0 | E805 | 001F |
| 0000036360 | 03EB | 24E8 | 6A00 | 6A03 | 6A00 | 9A00 | 3A33 | 0000 |
| 0000036400 | 8B55 | 33EC | EBC9 | 551A | EC8B | 01B9 | EB00 | 5512 |
| 0000036420 | EC8B | 5756 | 00B9 | EB01 | 5508 | EC8B | 5756 | 01B9 |
| 0000036440 | E801 | 004B | 0A51 | 75C9 | BE12 | 37BE | BEBF | E837 |
| 0000036460 | 00B8 | 70BE | BF17 | 1774 | AFE8 | BE00 | 1774 | 74BF |
| 0000036500 | E817 | 00A6 | 74BE | BF17 | 1774 | 9DE8 | E800 | 008C |
| 0000036520 | 0A58 | 75E4 | C713 | 4706 | 0111 | B800 | 0001 | 8A50 |
| 0000036540 | 0646 | 9A50 | FFFF | 0000 | 4EE8 | 5F00 | 5D5E | 55CB |
| 0000036560 | EC8B | 0D6A | 1FE8 | 8325 | 02C4 | 068E | 0EF6 | 8B26 |
| 0000036600 | 061E | 4B00 | 168B | 1149 | FA83 | 75FF | 8904 | 491E |
| 0000036620 | 3911 | 491E | 9F11 | 0D6A | 25E8 | 8325 | 02C4 | 749E |
| 0000036640 | 6A0A | E80E | 24D0 | C483 | EB02 | 3BC7 | 74D3 | 6A08 |
| 0000036660 | E80E | 24E2 | C483 | 5D02 | 55C3 | EC8B | 0D6A | D5E8 |
| 0000036700 | 8324 | 02C4 | 06C7 | 1149 | FFFF | 0D6A | F1E8 | 8324 |
| 0000036720 | 02C4 | 0E6A | E9E8 | 8324 | 02C4 | C35D | 0E8B | 1766 |
| 0000036740 | 07E3 | 02BB | FF00 | 641E | C317 | F73B | 0E73 | EF83 |
| 0000036760 | 8B04 | 0B05 | 0245 | F274 | 1DFF | EEEB | 00C3 | 8B55 |
| 0000037000 | B8EC | 00FC | 0E50 | 6FE8 | 8301 | 4E3E | 0011 | 0474 |
| 0000037020 | 1EFF | 114C | FFB8 | 5000 | E80E | 015C | E58B | CB5D |
| 0000037040 | 02B8 | E900 | FDC7 | 5A59 | DC8B | D82B | 0B72 | FB81 |
| 0000037060 | 0200 | 0572 | E38B | 5152 | 52CB | 3351 | E9C0 | FDAD |
| 0000037100 | 14C8 | 0000 | 5657 | FF2B | F78B | 3639 | 0EF0 | 0375 |
| 0000037120 | F0E9 | A100 | 0EF0 | C92B | 4E89 | 89F4 | F646 | 4E89 |
| 0000037140 | 89F8 | FA46 | 0C6A | 76FF | FFFA | F876 | 681E | 0F10 |
| 0000037160 | 3A9A | 445E | 833C | 0AC4 | C00B | 1A74 | 8146 | FFFE |
| 0000037200 | 767F | E903 | 00BD | 5EC4 | FFF8 | F846 | 8026 | 003F |
| 0000037220 | EA75 | EB47 | 900D | 5EC4 | FFF8 | F846 | 8026 | 003F |
| 0000037240 | F475 | 5E8B | 26F8 | 3F80 | 7500 | 8DB9 | 0145 | 6A50 |

THU MAR 14 17:44:14 1991 PR.DLL PAGE 18, LINE 1004

| | | | | | | | | |
|---|---|---|---|---|---|---|---|---|
| 0000037260 | 9A04 | 634E | 3C53 | C483 | 8904 | F046 | 5689 | 56F2 |
| 0000037300 | 949A | 895A | 833C | 02C4 | 4689 | 89FC | FE56 | 468B |
| 0000037320 | 0BF2 | F046 | 6D74 | C28B | 460B | 74FC | 8B66 | F046 |
| 0000037340 | 568B | A3F2 | 113D | 1689 | 113F | 0C6A | 76FF | FFF6 |
| 0000037360 | F476 | 681E | 0F10 | 3A9A | 8E5E | 8339 | 0AC4 | C00B |
| 0000037400 | 2C74 | 468B | 8BFC | FE56 | 5EC4 | 83F0 | F046 | 2604 |
| 0000037420 | 0789 | 8926 | 0257 | 5EC4 | FFF4 | F446 | 8A26 | C407 |
| 0000037440 | FC5E | 46FF | 26FC | 0788 | C00A | 0E74 | E8EB | 5EC4 |
| 0000037460 | FFF4 | F446 | 8026 | 003F | F475 | 5EC4 | 26F4 | 3F80 |
| 0000037500 | 7500 | 5EA7 | C95F | 90CB | 8B55 | 56EC | B857 | 3A6A |
| 0000037520 | D88E | C08E | 568B | BE06 | 178E | 3BAD | 74C2 | 4010 |
| 0000037540 | 7496 | 970C | C033 | FFB9 | F2FF | 8BAE | EBF7 | 96EB |
| 0000037560 | 5E5F | E58B | CA5D | 0002 | 8B55 | 57EC | 76FF | 0E06 |
| 0000037600 | C5E8 | 0BFF | 74C0 | 921F | FA8B | C033 | FFB9 | F2FF |
| 0000037620 | F7AE | 49D1 | 8B50 | BBC4 | 0002 | 1E53 | 5152 | 5016 |
| 0000037640 | FF9A | 00FF | 5B00 | 8B5F | 5DE5 | 02CA | 0000 | 1601 |
| 0000037660 | 0202 | 0203 | 1804 | 0D05 | 0906 | 0C07 | 0C08 | 0C09 |
| 0000037700 | 070A | 080B | 160C | 160D | 020F | 0D10 | 1211 | 0212 |
| 0000037720 | 0235 | 0D41 | 0243 | 0D52 | 0D53 | 0D57 | 0B59 | 0D6C |
| 0000037740 | 206D | 1C70 | 0972 | 1606 | 0A80 | 0A81 | 0982 | 0D84 |
| 0000037760 | 0BA4 | 02CE | 0BD7 | 0D00 | 1608 | 8B52 | E8D8 | 2300 |
| 0000040000 | 8E93 | 5AC2 | 8926 | 0247 | 8926 | B817 | FFFF | 8B99 |
| 0000040020 | 5DE5 | E8CB | 0008 | FFB8 | 99FF | E58B | CB5D | D88B |
| 0000040040 | DDE8 | 9322 | C28E | 8926 | 0247 | BB53 | 3D3E | 24B9 |
| 0000040060 | 0A00 | 75E4 | 2E1B | 073A | 1674 | 4343 | F7E2 | 133C |
| 0000040100 | 0472 | 243C | 0A76 | 3C43 | 72BC | 3C04 | 76CA | 4301 |
| 0000040120 | 8A2E | 0147 | 5B98 | 8926 | C307 | 8B55 | BBEC | 0002 |
| 0000040140 | 05EB | 8B55 | 33EC | E8DB | 2296 | C303 | CB5D | 04C8 |
| 0000040160 | 0000 | 46C7 | FFFC | C4FF | 065E | F626 | 0A47 | 7440 |
| 0000040200 | 2607 | 47C6 | 000A | 2CEB | C38B | 5A2D | B911 | 000C |
| 0000040220 | F799 | 89F9 | FE46 | E850 | 21AC | C483 | FF02 | 0876 |
| 0000040240 | 76FF | 9A06 | 3E4A | 3E64 | C483 | 8904 | FC46 | 76FF |
| 0000040260 | E8FE | 219E | 468B | C9FC | 90CB | 10C8 | 0000 | 5657 |
| 0000040300 | FFBF | 8BFF | 0676 | 44F6 | 830A | 0375 | 97E9 | 1E00 |
| 0000040320 | 9A56 | 4594 | 3E89 | C483 | 8B04 | 8BF8 | 81DE | 5AEB |
| 0000040340 | 8B11 | 3E87 | 8913 | FA46 | 561E | 9BE8 | 8304 | 04C4 |
| 0000040360 | 448A | 2A0B | 50E4 | C29A | A454 | 833E | 02C4 | C00B |
| 0000040400 | 617C | 7E83 | 00FA | 5E74 | 681E | 1154 | 468D | 16F0 |
| 0000040420 | 9A50 | 5D98 | 3EC4 | C483 | 8D08 | F246 | 4689 | 8CFC |
| 0000040440 | FE56 | 7E80 | 5CF0 | 1474 | 681E | 1156 | 468D | 16F0 |
| 0000040460 | 9A50 | 5D52 | 3EDD | C483 | EB08 | 9004 | 4EFF | 6AFC |
| 0000040500 | FF0A | FE76 | 76FF | FFFC | FA76 | D09A | EA5E | 833E |
| 0000040520 | 08C4 | 468D | 16F0 | 9A50 | 6C50 | 3C03 | C483 | 0B04 |
| 0000040540 | 74C0 | BF03 | FFFF | 44C6 | 000A | C78B | 5F5E | CBC9 |
| 0000040560 | 08C8 | 0000 | A09A | 2E53 | 893F | FC46 | 5689 | 0BFE |
| 0000040600 | 75D0 | 2B05 | 99C0 | 37EB | 76FF | 50FE | 76FF | FF0E |
| 0000040620 | 0C76 | 76FF | FF0A | 0876 | 76FF | 9A06 | 439C | 3F66 |
| 0000040640 | C483 | 890E | F846 | 5689 | 8BFA | FC46 | 5A2D | B911 |
| 0000040660 | 000C | F799 | 50F9 | 99E8 | 8B20 | F846 | 568B | C9FA |
| 0000040700 | 90CB | 8B55 | 6AEC | FF40 | 0C76 | 76FF | FF0A | 0876 |
| 0000040720 | 76FF | 9A06 | 3F00 | 3E36 | CBC9 | 08C8 | 0000 | 5657 |
| 0000040740 | 768B | 8B06 | 2DC6 | 115A | 0CB9 | 9900 | F9F7 | 4689 |
| 0000040760 | 50FA | 51E8 | 8320 | 02C4 | 561E | 01E8 | 8305 | 04C4 |
| 0000041000 | F88B | 468D | 160E | FF50 | 0C76 | 76FF | 1E0A | 9A56 |
| 0000041020 | 4EB6 | 3F07 | C483 | 890C | F846 | 561E | E857 | 0556 |
| 0000041040 | C483 | FF06 | FA76 | 29E8 | 8320 | 02C4 | 468B | 5EF8 |
| 0000041060 | C95F | 90CB | 8B55 | 8BEC | 0E46 | 5A2D | 9911 | 0CB9 |
| 0000041100 | F700 | 50F1 | FFE8 | 831F | 02C4 | FF50 | 1076 | 76FF |
| 0000041120 | FF0E | 0C76 | 76FF | FF0A | 0876 | 76FF | 0E06 | 0DE8 |

THU MAR 14 17:44:14 1991 PR.DLL PAGE 19, LINE 1063

| | | | | | | | | |
|---|---|---|---|---|---|---|---|---|
| 0000041140 | 8300 | 0CC4 | 535B | E9E8 | 831F | 02C4 | CB5D | 8B55 |
| 0000041160 | 83EC | 04EC | 5756 | 468B | F70A | 0C66 | C88B | CA0B |
| 0000041200 | 6174 | 4689 | 89FC | FE56 | 5EC4 | 8B06 | 0E76 | D20B |
| 0000041220 | 1F75 | FF3D | 74FF | 8B1A | 03CB | 72C8 | 5014 | 5253 |
| 0000041240 | C88B | 6AE8 | 8B00 | 5AC8 | 585B | C12B | DA83 | EB00 |
| 0000041260 | 833C | 01FB | 0577 | 00B9 | EB80 | 8B04 | F7CB | 51D9 |
| 0000041300 | 5350 | E852 | 0049 | C88B | 5B5A | 5F58 | C12B | DA83 |
| 0000041320 | 3B00 | 72CF | 0318 | 73D9 | 8CDC | 81C1 | FFC1 | 8EFF |
| 0000041340 | EBC1 | EB02 | 8B24 | 0BC8 | 75CA | EBA3 | 8B00 | 0BC8 |
| 0000041360 | 74CA | 8B13 | FC4E | C82B | C18B | 4E8B | 1BFE | 8BCA |
| 0000041400 | F7D1 | 0A76 | 03EB | 468B | 5F0C | 8B5E | 5DE5 | 55CB |
| 0000041420 | EC8B | EC83 | 8904 | FE4E | 3ABF | 8B13 | 2DC6 | 115A |
| 0000041440 | F803 | 44F6 | 0C0A | 0575 | 05F6 | 7401 | 8B05 | 0245 |
| 0000041460 | 03EB | 00B8 | 8902 | FC46 | 44F6 | D80A | 0575 | 05F6 |
| 0000041500 | 7401 | 8B36 | 0444 | C00B | 2F74 | C13B | 0276 | C18B |
| 0000041520 | 5350 | 0651 | 0650 | FF53 | 0274 | 34FF | E80E | 2A56 |
| 0000041540 | C483 | 070A | 5B59 | 2B58 | 29C8 | 0444 | D803 | 0401 |
| 0000041560 | 00EB | C90B | C275 | 83E9 | 3B00 | FC4E | 5072 | 44F6 |
| 0000041600 | 080A | 0575 | 05F6 | 7401 | 5313 | 0651 | 561E | E80E |
| 0000041620 | 0472 | C483 | 0704 | 5B59 | C00B | 6075 | D233 | C18B |
| 0000041640 | 76F7 | 8BFC | 2BC1 | 50C2 | 5153 | 5006 | 5306 | C033 |
| 0000041660 | 448A | 500B | E80E | 1778 | C483 | 0708 | 5B59 | 3D5A |
| 0000041700 | FFFF | 3474 | C82B | C23B | 2E75 | D803 | A4EB | C033 |
| 0000041720 | 8A26 | 5307 | 0651 | 561E | 0E50 | C5E8 | 8300 | 06C4 |
| 0000041740 | 5907 | 3D5B | FFFF | 1474 | 4943 | 458B | 0B02 | 75C0 |
| 0000041760 | 4001 | 4689 | E9FC | FF7A | 4C80 | 200A | 468B | 2BFE |
| 0000042000 | 8BC1 | 5DE5 | 00C3 | 8B55 | 56EC | 8B57 | 0676 | 448A |
| 0000042020 | A80A | 7483 | A85F | 7540 | A85B | 7502 | 0C48 | 8801 |
| 0000042040 | 0A44 | FE8B | EF81 | 115A | C781 | 133A | 0CA8 | 0D75 |
| 0000042060 | 05F6 | 7501 | 1E08 | E856 | 0186 | C483 | 8B04 | 0644 |
| 0000042100 | 0489 | 75FF | FF02 | 0874 | 3350 | 8ADB | 0B5C | 0E53 |
| 0000042120 | 75E8 | 8315 | 08C4 | C00B | 1174 | FF3D | 75FF | 801A |
| 0000042140 | 0A4C | EB20 | 800A | 0A4C | EB20 | 8009 | 0A4C | C710 |
| 0000042160 | 0444 | 0000 | FFB8 | EBFF | 8A25 | 37BF | 800F | 82E7 |
| 0000042200 | FF80 | 7582 | 8A0B | 0A7C | C7F6 | 7582 | 8003 | 200D |
| 0000042220 | 8948 | 0444 | 1CC4 | C033 | 8A26 | 4307 | 1C89 | 5E5F |
| 0000042240 | CB5D | 8B55 | 56EC | 8B57 | 0876 | 448A | A80A | 7482 |
| 0000042260 | A864 | 7540 | C760 | D444 | 0000 | 01A8 | 0B74 | 10A8 |
| 0000042300 | 5374 | 4C8B | 8906 | 240C | 0CFE | 2402 | 88EF | 0A44 |
| 0000042320 | FE8B | EF81 | 115A | C781 | 133A | DB33 | 5C8A | A80B |
| 0000042340 | 7508 | A84B | 7504 | F618 | 0105 | 4275 | FE81 | 1166 |
| 0000042360 | 0674 | FE81 | 1172 | 2675 | 87F6 | 0F37 | 7440 | B91F |
| 0000042400 | 0001 | 1651 | 7E8D | 5706 | 0E53 | 23E8 | 8316 | 08C4 |
| 0000042420 | 01B9 | EB00 | B846 | FFFF | 4C80 | 200A | 65EB | 1E53 |
| 0000042440 | E856 | 009C | C483 | 5B04 | 44F6 | D80A | D174 | 0C8B |
| 0000042460 | 548B | 2B06 | 42CA | 1489 | 558B | 4A02 | 5489 | E304 |
| 0000042500 | 5125 | FF51 | 0874 | 74FF | 5306 | E80E | 15E2 | C483 |
| 0000042520 | 5908 | 7CC4 | 8B06 | 0656 | 8826 | 3B15 | 75C1 | 33B6 |
| 0000042540 | 8AC0 | 0646 | 1DEB | C033 | 87F6 | 0F37 | 7420 | B9E3 |
| 0000042560 | 0002 | 5051 | 5350 | E80E | 1202 | C483 | 3308 | 8BC0 |
| 0000042600 | EBC8 | 5FCF | 5D5E | 00CB | 8B55 | 56EC | 768B | 8A04 |
| 0000042620 | 0A44 | 83A8 | 2674 | 08A8 | 2274 | 74FF | FF08 | 0674 |
| 0000042640 | 9E9A | A25A | 833F | 04C4 | 6480 | F70A | C033 | 4489 |
| 0000042660 | 8906 | 0844 | 0489 | 4489 | 8902 | 0444 | 5D5E | 00C3 |
| 0000042700 | 8B55 | 56EC | 768B | B804 | 0200 | 9A50 | 5A94 | 4333 |
| 0000042720 | 8B59 | 81DE | 5AEB | 8111 | 3AC3 | 0B13 | 74D2 | 800B |
| 0000042740 | 0A4C | C708 | 0247 | 0200 | 0EEB | 4C80 | 040A | 47C7 |
| 0000042760 | 0102 | 8C00 | 8DDA | 0147 | 5489 | 8902 | 8904 | 0854 |
| 0000043000 | 4489 | C706 | 0444 | 0000 | 5D5E | 00C3 | 08C8 | 0000 |

THU MAR 14 17:44:14 1991 PR.DLL PAGE 20, LINE 1122

| | | | | | | | | |
|---|---|---|---|---|---|---|---|---|
| 0000043020 | 5657 | 5EC4 | 260A | 078A | 3D98 | 0077 | 4874 | 0877 |
| 0000043040 | 612C | 4C74 | 112C | 0674 | C02B | E999 | 00CC | F62B |
| 0000043060 | 46C6 | 01FC | 46C7 | 01FE | FF00 | 0A46 | 5EC4 | 260A |
| 0000043100 | 3F80 | 7400 | 835B | FE7E | 7400 | 2655 | 078A | 3D98 |
| 0000043120 | 0074 | 3474 | 0877 | 2B2C | 1C74 | 372C | 3674 | 46C7 |
| 0000043140 | 00FE | EB00 | 90D4 | 01BE | C603 | FC46 | EB02 | 90C5 |
| 0000043160 | 09BE | EB01 | 90F4 | C6F7 | 0002 | E275 | CE83 | 8302 |
| 0000043200 | FEE6 | 46C6 | 80FC | B1EB | C6F7 | C000 | D075 | CE81 |
| 0000043220 | 4000 | A5EB | C6F7 | C000 | C475 | CE81 | 8000 | 99EB |
| 0000043240 | A468 | FF01 | 0E76 | FF56 | 0876 | 76FF | 9A06 | 557A |
| 0000043260 | 435E | C483 | 890A | FA46 | C00B | 037D | 69E9 | FFFF |
| 0000043300 | 5806 | 8B11 | 107E | C78B | 5A2D | 0511 | 133A | 4689 |
| 0000043320 | 8AF8 | FC46 | 4588 | 8B0A | F85E | 07C6 | 2B00 | 89C0 |
| 0000043340 | 0445 | 4789 | 8904 | 0245 | 0589 | 4589 | 8908 | 0645 |
| 0000043360 | 468A | 88FA | 0B45 | C78B | DA8C | 5F5E | CBC9 | 8B55 |
| 0000043400 | 56EC | 8B57 | 0476 | 1EBB | 8115 | 66FE | 7411 | BB09 |
| 0000043420 | 1522 | FE81 | 1172 | 5875 | FE8B | EF81 | 115A | C781 |
| 0000043440 | 133A | 44F6 | 0C0A | 4875 | 05F6 | 7501 | 8B43 | 8B07 |
| 0000043460 | 0257 | C88B | CA0B | 2174 | 4489 | 8906 | 0854 | 0489 |
| 0000043500 | 5489 | C702 | 0444 | 0200 | 45C7 | 0002 | 8002 | 0A4C |
| 0000043520 | C602 | 1105 | 01B8 | EB00 | 5319 | 00B8 | 5002 | 949A |
| 0000043540 | 405A | 5B44 | 0B5B | 74D2 | 8907 | 8907 | 0257 | C8EB |
| 0000043560 | C033 | 5E5F | C35D | 8B55 | 56EC | 8B57 | 0676 | FE8B |
| 0000043600 | EF81 | 115A | C781 | 133A | 05F6 | 7410 | 332D | 8ADB |
| 0000043620 | 0B5C | 87F6 | 0F37 | 7440 | 1E21 | 0E56 | 65E8 | 8300 |
| 0000043640 | 04C4 | 7E83 | 0004 | 1274 | C033 | 0588 | 4589 | 8902 |
| 0000043660 | 8904 | 0244 | 4489 | 8906 | 0844 | 5E5F | C35D | 04C8 |
| 0000043700 | 0000 | 468B | 0B08 | 0646 | 0875 | 006A | A7E8 | EB00 |
| 0000043720 | 9031 | 468B | 2D06 | 115A | 0CB9 | 9900 | F9F7 | 4689 |
| 0000043740 | 50FC | 61E8 | 831A | 02C4 | 76FF | FF08 | 0676 | 949A |
| 0000043760 | D845 | 8345 | 04C4 | 4689 | FFFE | FC76 | 53E8 | 8B1A |
| 0000044000 | FE46 | CBC9 | 02C8 | 0000 | 5657 | FF2B | 768B | 8A06 |
| 0000044020 | 0A44 | C88B | 0324 | 023C | 3F75 | C1F6 | 7508 | 8B0D |
| 0000044040 | 81DE | 5AEB | F611 | 3A87 | 0113 | 2D74 | 048B | 442B |
| 0000044060 | 8906 | FE46 | C00B | 217E | FF50 | 0874 | 74FF | 8A06 |
| 0000044100 | 0B4C | ED2A | 9A51 | 58C0 | 4655 | C483 | 3908 | FE46 |
| 0000044120 | 0774 | 4C80 | 200A | FFBF | 8BFF | 0644 | 548B | 8908 |
| 0000044140 | 8904 | 0254 | 44C7 | 0004 | 8B00 | 5EC7 | C95F | 90CB |
| 0000044160 | 016A | 01E8 | CB00 | 04C8 | 0000 | 5657 | 5ABE | 2B11 |
| 0000044200 | 89FF | FE7E | 026A | 0DE8 | 831A | 02C4 | 11EB | 46C7 |
| 0000044220 | FFFE | FFFF | FC76 | B9E8 | 8319 | 02C4 | C683 | 390C |
| 0000044240 | 1A36 | 7215 | 8B2B | 2DC6 | 115A | 0CB9 | 9900 | F9F7 |
| 0000044260 | 4689 | 50FC | 8FE8 | 8319 | 02C4 | 44F6 | 830A | D374 |
| 0000044300 | 561E | 949A | F145 | 8344 | 04C4 | 7440 | 47C1 | C3EB |
| 0000044320 | 026A | EBE8 | 8319 | 02C4 | 7E83 | 0104 | 0475 | C78B |
| 0000044340 | 03EB | 468B | 5EFE | C95F | 02C2 | 9000 | 8B55 | B8EC |
| 0000044360 | 01B4 | B69A | 363B | 5748 | C656 | B846 | 2B00 | 89C0 |
| 0000044400 | E846 | 4689 | C4C6 | 0A5E | 8026 | 003F | 0375 | 5FE9 |
| 0000044420 | 2607 | 1F8A | FF2A | 87F6 | 15C1 | 7408 | FF2D | E84E |
| 0000044440 | 468D | 16E8 | FF50 | 0876 | 76FF | E806 | 07C6 | FF50 |
| 0000044460 | 0876 | 76FF | E806 | 07A0 | 46FF | C40A | 0A5E | 8A26 |
| 0000044500 | 2A1F | F6FF | C187 | 0815 | EE75 | 5E8B | 260A | 3F80 |
| 0000044520 | 7425 | E903 | 06F2 | 46C6 | 00C0 | C02A | 4688 | 88FC |
| 0000044540 | B646 | 4688 | 88F2 | F646 | 4688 | 88EE | 5286 | 2BFE |
| 0000044560 | 89C0 | EA46 | 4689 | 89BA | FE46 | 4689 | 89C4 | C246 |
| 0000044600 | 68EB | 9090 | 46FF | C40A | 0A5E | 8A26 | 2A07 | 8BE4 |
| 0000044620 | F6F8 | C185 | 0415 | 1A74 | 46FF | 8BBA | FE46 | C88B |
| 0000044640 | E0C1 | 0302 | D1C1 | 03E0 | 2DC7 | 0030 | 4689 | EBFE |
| 0000044660 | 9039 | 6C3D | 7400 | 771C | 3C2D | 744C | 7F13 | 2C1F |

THU MAR 14 17:44:14 1991 PR.DLL PAGE 21, LINE 1181

| | | | | | | | | |
|---|---|---|---|---|---|---|---|---|
| 0000044700 | 742A | 2C15 | 741C | EB23 | 901D | 46FE | EBFC | 901B |
| 0000044720 | 46FE | FEF6 | F646 | 12EB | 46FE | EBEE | 900D | 4E2C |
| 0000044740 | 0874 | 1A2C | E474 | 86FE | FE52 | BE80 | FE52 | 7400 |
| 0000044760 | 8093 | EE7E | 7500 | C414 | 0E5E | 4683 | 040E | 8B26 |
| 0000045000 | 2607 | 578B | 8902 | F846 | 5689 | C6FA | 5286 | 00FE |
| 0000045020 | 5EC4 | 260A | 078A | 200C | E42A | F88B | FF83 | 746E |
| 0000045040 | 8329 | 63FF | 1674 | FF83 | 747B | 8D11 | E846 | 5016 |
| 0000045060 | 76FF | FF08 | 0676 | BBE8 | EB06 | 900D | 46FF | FFE8 |
| 0000045100 | 0876 | 76FF | E806 | 0662 | F08B | 7E83 | 00BA | 0974 |
| 0000045120 | 7E83 | 00FE | 0375 | 83E9 | 8B05 | E9C7 | 05A0 | 7E83 |
| 0000045140 | 00BA | 0675 | 46FF | FFBA | FE46 | 46C7 | 2CBC | 8C15 |
| 0000045160 | BE5E | 23EB | 46C7 | 26BC | EB15 | 90F4 | 46FF | C40A |
| 0000045200 | 0A5E | 5E89 | 8CBC | BE46 | 8026 | 5E3F | 0C75 | 478D |
| 0000045220 | 8901 | BC46 | [illegible]58C | FEBE | B64E | 206A | 006A | 468D |
| 0000045240 | 16C8 | 9A50 | 6BA4 | 4581 | C483 | 8308 | 7BFF | 0374 |
| 0000045260 | A9E9 | C400 | BC5E | 8026 | 5D3F | 0374 | 9DE9 | C600 |
| 0000045300 | C046 | FF5D | BC46 | 46C6 | 20D3 | 8FE9 | 9000 | 8A26 |
| 0000045320 | 8807 | F446 | 46FF | 3CBC | 752D | 800F | C07E | 7400 |
| 0000045340 | 8B09 | BC5E | 8026 | 5D3F | 1E75 | 5E8A | 88F4 | C05E |
| 0000045360 | 01B0 | CB8A | E180 | C007 | 03EB | FF2A | 568D | 03C8 |
| 0000045400 | D2DA | 36E0 | 0708 | 54EB | 46FF | 26BC | 078A | 4688 |
| 0000045420 | 3AF4 | C046 | 0676 | 4688 | EBF0 | 900D | 468A | 88C0 |
| 0000045440 | F046 | 468A | 88F4 | C046 | 468A | 88C0 | F446 | 1CEB |
| 0000045460 | 5E8A | B0F4 | 8A01 | 80CB | 07E1 | EBC0 | 2A03 | 8DFF |
| 0000045500 | C856 | DA03 | E0D2 | 0836 | FE07 | F446 | 468A | 98F0 |
| 0000045520 | 4E8A | 2AF4 | 3BED | 7DC1 | 88D7 | C06E | 5EC4 | 26BC |
| 0000045540 | 3F80 | 745D | E903 | FF66 | 8026 | 003F | 0375 | FFE9 |
| 0000045560 | 8304 | 7BFF | 0A75 | C38B | C28C | 4689 | 890A | 0C56 |
| 0000045600 | 468B | 8BF8 | FA56 | 8689 | FE54 | 9689 | FE56 | 7E83 |
| 0000045620 | 00BA | 0A74 | 468B | FFFE | FE4E | C00B | 4E74 | FE83 |
| 0000045640 | 74FF | 8B49 | C1DE | 03FB | 468D | 03C8 | 36D8 | 078A |
| 0000045660 | 4632 | 98B6 | 01BA | 8B00 | 8BCE | 80D9 | 07E1 | E2D3 |
| 0000045700 | C285 | 2874 | 7E80 | 00EE | 0E75 | C68B | 5EC4 | FFF8 |
| 0000045720 | F846 | 8826 | EB07 | 9005 | 86FF | FE54 | 46FF | FFE8 |
| 0000045740 | 0876 | 76FF | E806 | 04C2 | F08B | A2EB | 4EFF | 56E8 |
| 0000045760 | 76FF | FF08 | 0676 | DFE8 | 8B04 | F846 | 568B | 39FA |
| 0000046000 | 5486 | 75FE | 3909 | 5696 | 75FE | E903 | 0462 | 7E80 |
| 0000046020 | 00EE | 0374 | 29E9 | FF04 | C646 | FF83 | 7563 | E903 |
| 0000046040 | 041E | C28E | D88B | C626 | 0007 | 13E9 | 9004 | 64BF |
| 0000046060 | 8300 | 2DFE | 0675 | 46FE | EBF2 | 9006 | FE83 | 752B |
| 0000046100 | FF1F | FE4E | 0C75 | 7E83 | 00BA | 0674 | 86FE | FE52 |
| 0000046120 | 0EEB | 46FF | FFE8 | 0876 | 76FF | E806 | 044C | F08B |
| 0000046140 | FE83 | 7430 | E903 | 0155 | 46FF | FFE8 | 0876 | 76FF |
| 0000046160 | E806 | 0436 | F08B | 783C | 0474 | 583C | 1475 | 46FF |
| 0000046200 | FFE8 | 0876 | 76FF | E806 | 0420 | F08B | 78BF | E900 |
| 0000046220 | 012B | 46FF | 83EA | 78FF | 0674 | 6FBF | E900 | 011D |
| 0000046240 | 4EFF | 56E8 | 76FF | FF08 | 0676 | 2BE8 | BE04 | 0030 |
| 0000046260 | 0AE9 | 9001 | 7E80 | 00FC | 0675 | 46FE | BFF6 | 0046 |
| 0000046300 | FE83 | 752D | FE05 | F246 | 08EB | FE83 | 742B | E903 |
| 0000046320 | 00EB | 4EFF | 74FE | E903 | 0095 | 7E83 | 00BA | 0375 |
| 0000046340 | 8CE9 | FE00 | 5286 | E9FE | 00D3 | FF83 | 7478 | 830D |
| 0000046360 | 70FF | 0874 | FF83 | 7446 | E903 | 0084 | 84F6 | 15C1 |
| 0000046400 | 7480 | 6A15 | 8D04 | C246 | 5016 | B29A | 2B6C | 564B |
| 0000046420 | 79E8 | 8B03 | EBF0 | 9036 | FF83 | 7546 | 832C | EA7E |
| 0000046440 | 7400 | 8326 | 3AFE | 1C75 | 468B | 89C2 | EC46 | C02B |
| 0000046460 | 4689 | 89C4 | C246 | 46C7 | FFEA | BFFF | 0070 | 30BE |
| 0000046500 | EB00 | 900A | 46C7 | 00EA | FE00 | 5286 | 80FE | 52BE |
| 0000046520 | 00FE | 5C75 | 46FF | 8DEA | D044 | 0199 | C246 | 5611 |
| 0000046540 | 83C4 | BA7E | 7400 | FF08 | FE4E | 0375 | 74E9 | FFFF |

THU MAR 14 17:44:14 1991 PR.DLL PAGE 22, LINE 1240

| | | | | | | | | |
|---|---|---|---|---|---|---|---|---|
| 0000046560 | E846 | 76FF | FF08 | 0676 | 2FE8 | 8B03 | EBF0 | 903E |
| 0000046600 | 84F6 | 15C1 | 7404 | 83C2 | 6FFF | 1475 | FE83 | 7D38 |
| 0000046620 | 6AB8 | 8D03 | C246 | 5016 | B29A | 3C6C | EB4B | 90AE |
| 0000046640 | 006A | 0A6A | 468D | 16C2 | 9A50 | 6C6E | 4685 | 9DEB |
| 0000046660 | 4EFF | 56E8 | 76FF | FF08 | 0676 | 1BE8 | 8003 | 52BE |
| 0000046700 | 00FE | 0375 | 23E9 | 83FF | 70FF | 0F75 | 7E80 | 00F6 |
| 0000046720 | 0974 | 468B | 8BEC | C24E | 4689 | 80C4 | F27E | 7400 |
| 0000046740 | F70A | C25E | 5683 | 00C4 | 5EF7 | 83C4 | 46FF | 0575 |
| 0000046760 | 46C7 | 00EA | 8300 | EA7E | 7500 | E903 | 0272 | 7E80 |
| 0000047000 | 00EE | 0374 | 39E9 | FF02 | C646 | 7E80 | 00F6 | 1474 |
| 0000047020 | 468B | 8BC2 | C456 | 5EC4 | 26F8 | 0789 | 8926 | 0257 |
| 0000047040 | 1DE9 | 9002 | 468B | C4C2 | F85E | 8926 | E907 | 0210 |
| 0000047060 | 468B | 99E8 | 4689 | 89C2 | C456 | CEEB | 868D | FE58 |
| 0000047100 | 4689 | 8CBC | BE56 | FE83 | 752D | 8B13 | 36D8 | 07C6 |
| 0000047120 | 8D2D | 5986 | 89FE | BC46 | 568C | EBBE | 9006 | FE83 |
| 0000047140 | 752B | FF11 | FE4E | 46FF | FFE8 | 0876 | 76FF | E806 |
| 0000047160 | 0238 | F08B | 7E83 | 00BA | 0774 | 7E81 | 5DFE | 7E01 |
| 0000047200 | C72D | FE46 | 015D | 26EB | 468B | FFFE | FE4E | C00B |
| 0000047220 | 2374 | 46FF | 8BEA | C4C6 | BC5E | 46FF | 26BC | 0788 |
| 0000047240 | 46FF | FFE8 | 0876 | 76FF | E806 | 01FE | F08B | 84F6 |
| 0000047260 | 15C1 | 7504 | 83D3 | 2EFE | 4375 | 468B | FFFE | FE4E |
| 0000047300 | C00B | 3974 | 5EC4 | FFBC | BC46 | C626 | 2E07 | 18EB |
| 0000047320 | 468B | FFFE | FE4E | C00B | 2374 | 46FF | 8BEA | C4C6 |
| 0000047340 | BC5E | 46FF | 26BC | 0788 | 46FF | FFE8 | 0876 | 76FF |
| 0000047360 | E806 | 01B6 | F08B | 84F6 | 15C1 | 7504 | 83D3 | EA7E |
| 0000047400 | 7500 | E903 | 0081 | C68B | 653C | 0474 | 453C | 7775 |
| 0000047420 | 468B | FFFE | FE4E | C00B | 6D74 | 5EC4 | FFBC | BC46 |
| 0000047440 | C626 | 6507 | 46FF | FFE8 | 0876 | 76FF | E806 | 017A |
| 0000047460 | F08B | FE83 | 752D | C40F | BC5E | 46FF | 26BC | 07C6 |
| 0000047500 | EB2D | 9008 | 9090 | FE83 | 752B | 8B35 | FE46 | 4EFF |
| 0000047520 | 0BFE | 75C0 | FF1D | FE46 | 26EB | 468B | FFFE | FE4E |
| 0000047540 | C00B | 2374 | 46FF | 8BEA | C4C6 | BC5E | 46FF | 26BC |
| 0000047560 | 0788 | 46FF | FFE8 | 0876 | 76FF | E806 | 012C | F08B |
| 0000047600 | 84F6 | 15C1 | 7504 | FFD3 | E84E | FF56 | 0876 | 76FF |
| 0000047620 | E806 | 0144 | 7E83 | 00EA | 0375 | D3E9 | 8000 | EE7E |
| 0000047640 | 7400 | E903 | 009A | 46FF | C4C6 | BC5E | C626 | 0007 |
| 0000047660 | 868D | FE58 | 5016 | 76FF | FFFA | F876 | 468A | 98F6 |
| 0000047700 | 8E50 | 8406 | 2617 | 1EFF | 15AA | C483 | EB0A | 9071 |
| 0000047720 | 5EC4 | 260A | 078A | E42A | C63B | 1274 | 4EFF | 56E8 |
| 0000047740 | 76FF | FF08 | 0676 | EFE8 | E900 | 0084 | 9090 | 4EFE |
| 0000047760 | 80B8 | EE7E | 7500 | 8349 | 0E6E | EB04 | 9043 | 632D |
| 0000050000 | 3D00 | 0018 | CA77 | E0D1 | 2E93 | A7FF | 4D9E | 47EE |
| 0000050020 | 4A50 | 4BCC | 4BCC | 4BCC | 4D60 | 49BE | 4D60 | 4D60 |
| 0000050040 | 4D60 | 4D60 | 4BC0 | 4A50 | 4A44 | 4D60 | 4D60 | 4804 |
| 0000050060 | 4D60 | 4A50 | 4D60 | 4D60 | 49C1 | 4D60 | 4D60 | 480C |
| 0000050100 | 46FE | FFB8 | 0A46 | 20EB | 46FF | FFE8 | 0876 | 76FF |
| 0000050120 | E806 | 0056 | F08B | 5EC4 | FF0A | 0A46 | 8A26 | 2A07 |
| 0000050140 | 3BE4 | 74F0 | E903 | FF74 | FE83 | 74FF | E903 | F895 |
| 0000050160 | FE83 | 75FF | 830C | C67E | 7500 | 8006 | B87E | 7400 |
| 0000050200 | 8B05 | C646 | 02EB | C68B | 5F5E | CBC9 | 8B55 | 8BEC |
| 0000050220 | 045E | 87F6 | 15C1 | 7404 | 8B05 | EBC3 | 9008 | C38B |
| 0000050240 | DF24 | 072D | C900 | 02C2 | 9000 | 04C8 | 0000 | 5EC4 |
| 0000050260 | 2604 | 4FFF | 7804 | 2615 | 078B | 8B26 | 0257 | FF26 |
| 0000050300 | 8B07 | 8ED8 | 26C2 | 078A | E42A | 07EB | 5306 | 969A |
| 0000050320 | 7D41 | C94E | 04C2 | 9000 | 8B55 | 83EC | 087E | 74FF |
| 0000050340 | FF0E | 0676 | 76FF | FF04 | 0876 | 589A | 9D54 | C94A |
| 0000050360 | 06C2 | 9000 | 8B55 | 56EC | 5EC4 | 26C8 | 07FF | 76FF |
| 0000050400 | FF06 | 0476 | A3E8 | 8BFF | F6F0 | C184 | 0815 | E875 |
| 0000050420 | C95E | 08C2 | 9000 | 4F0E | 4F19 | 4F2F | 4F63 | 4F8F |

THU MAR 14 17:44:14 1991 PR.DLL PAGE 23, LINE 1299

| | | | | | | | | |
|---|---|---|---|---|---|---|---|---|
| 0000050440 | 4F97 | 4FC0 | 4FF2 | 8B55 | B8EC | 0171 | E80E | ECF6 |
| 0000050460 | 5756 | C033 | 4689 | 88F8 | FB46 | 76C4 | 260A | 89AC |
| 0000050500 | 0A76 | 4688 | 0AFE | 74C0 | 8306 | F87E | 7D00 | 8B06 |
| 0000050520 | F846 | B5E9 | BB04 | 152E | 202C | 583C | 0577 | 24D7 |
| 0000050540 | EB0F | B002 | B100 | D203 | 02E0 | FB46 | FED7 | D2C1 |
| 0000050560 | 88E8 | FB46 | 8B98 | D1D8 | 2EE3 | A7FF | 4EA6 | 568A |
| 0000050600 | B9FE | 0001 | 36E8 | EB04 | 33B1 | 89C0 | F046 | 4689 |
| 0000050620 | 89F6 | EE46 | 46C7 | 20FC | 4800 | 4689 | EBF4 | 8A9B |
| 0000050640 | FE46 | 2D3C | 0675 | 4E80 | 04FC | 8EEB | 2B3C | 0675 |
| 0000050660 | 4E80 | 01FC | 84EB | 203C | 0775 | 4E80 | 02FC | 79E9 |
| 0000050700 | 3CFF | 7523 | 8007 | FC4E | E980 | FF6E | 4E80 | 08FC |
| 0000050720 | 67E9 | 8AFF | FE4E | F980 | 752A | E80F | 035C | C00B |
| 0000050740 | 1779 | D8F7 | 4E80 | 04FC | 0FEB | E980 | 3230 | 8BED |
| 0000050760 | F646 | 0ABB | F700 | 03E3 | 89C1 | F646 | 3BE9 | C7FF |
| 0000051000 | F446 | 0000 | 33E9 | 8AFF | FE4E | F980 | 752A | E80C |
| 0000051020 | 0328 | C00B | 1479 | FFB8 | EBFF | 800F | 30E9 | ED32 |
| 0000051040 | 468B | BBF4 | 000A | E3F7 | C103 | 4689 | E9F4 | FF0A |
| 0000051060 | 468A | 3CFE | 756C | 8006 | FC4E | EB10 | 3C22 | 7546 |
| 0000051100 | 8006 | FC4E | EB20 | 3C18 | 754E | 8006 | FD4E | EB10 |
| 0000051120 | 3C0E | 754C | 8006 | FD4E | EB04 | 8004 | FD4E | E908 |
| 0000051140 | FED8 | 468A | 3CFE | 7564 | E903 | 0194 | 693C | 0375 |
| 0000051160 | 8DE9 | 3C01 | 7575 | E903 | 018A | 583C | 0375 | 89E9 |
| 0000051200 | 3C01 | 7578 | E903 | 0188 | 6F3C | 0375 | A2E9 | 3C01 |
| 0000051220 | 7463 | 3C1A | 7473 | 3C27 | 746E | 3C51 | 7470 | 3C60 |
| 0000051240 | 7445 | 3C07 | 7447 | E903 | 00BB | B5E9 | E800 | 028A |
| 0000051260 | BE8D | FE8F | 0716 | 4FAA | 01B9 | E900 | 01F1 | 90E8 |
| 0000051300 | 0B02 | 75FF | 8C12 | 0BC0 | 75C0 | 1E0C | BF07 | 1587 |
| 0000051320 | 0E8B | 158D | D8E9 | 5701 | 4E8B | E3F4 | 3207 | F2Cu |
| 0000051340 | 75AE | 4F01 | 2B59 | 87F9 | E9CF | 01C3 | 62E8 | 8B02 |
| 0000051360 | F846 | F6AB | FC46 | 7410 | 3303 | ABC0 | 3BE9 | F6FE |
| 0000051400 | FC46 | 7530 | E805 | 0232 | 39EB | 36E8 | F602 | FD46 |
| 0000051420 | 7518 | C630 | FF46 | B907 | 0010 | D716 | 3352 | 8DD2 |
| 0000051440 | 97BE | BEFE | 0004 | B0E8 | B902 | 0010 | BE8D | FE92 |
| 0000051460 | 3358 | BED2 | 0004 | A0E8 | C602 | 9386 | 3AFE | 09B9 |
| 0000051500 | EB00 | C618 | FF46 | B907 | 0010 | 0716 | D233 | BE8D |
| 0000051520 | FE92 | 04BE | E800 | 0281 | 04B9 | 8D00 | 8FBE | E9FE |
| 0000051540 | 014D | 46FF | 80EE | FC4E | 8A40 | FE46 | 200C | 8B98 |
| 0000051560 | 83F0 | F47E | 7F00 | 7413 | C707 | F446 | 0006 | 0AEB |
| 0000051600 | 673D | 7500 | C705 | F446 | 0001 | BE8D | FE8F | 76FF |
| 0000051620 | FFEE | F476 | 1656 | FF57 | 1076 | 76FF | F60E | FD46 |
| 0000051640 | 7404 | FF0A | 551E | 8315 | 0E46 | EB0A | FF08 | A21E |
| 0000051660 | 8315 | 0E46 | 8308 | 0EC4 | 46F6 | 80FC | 0F74 | 7E83 |
| 0000051700 | 00F4 | 0975 | 5716 | 1EFF | 15AE | C483 | 8304 | 67FE |
| 0000051720 | 1075 | 46F7 | 80FC | 7500 | 1609 | FF57 | A61E | 8315 |
| 0000051740 | 04C4 | 0716 | 8026 | 2D3D | 0575 | 8047 | FD4E | B901 |
| 0000051760 | FFFF | B057 | F200 | 4FAE | 2B59 | 87F9 | E9CF | 00AF |
| 0000052000 | 4E80 | 40FC | 46C6 | 0AFA | 35EB | 46C6 | 07FF | 04EB |
| 0000052020 | 46C6 | 27FF | 46F6 | 80FC | 1174 | 46C7 | 02F0 | C600 |
| 0000052040 | F246 | B230 | 0251 | FF56 | 5688 | C6F3 | FA46 | EB10 |
| 0000052060 | F60E | FC46 | 7480 | 8004 | FD4E | C602 | FA46 | F608 |
| 0000052100 | FC46 | 7410 | E805 | 00FB | 0EEB | EDE8 | F600 | FC46 |
| 0000052120 | 7440 | 9903 | 02EB | D233 | 46F6 | 40FC | 0F74 | D20B |
| 0000052140 | 0B7D | 4E80 | 01FD | D8F7 | D283 | F700 | 83DA | F4/E |
| 0000052160 | 7D00 | C707 | F446 | 0001 | 04EB | 6680 | F7FC | D88B |
| 0000052200 | DA0B | 0575 | 46C7 | 00F0 | 8D00 | EB7E | 0716 | 4E8A |
| 0000052220 | 32FA | 8BED | F476 | 40E8 | F601 | FD46 | 7402 | E30E |
| 0000052240 | 2606 | 3D80 | 7430 | 4F06 | C626 | 3005 | EB41 | F600 |
| 0000052260 | FC46 | 7440 | F631 | FD46 | 7401 | C60B | F246 | C72D |
| 0000052300 | F046 | 0001 | 20EB | 46F6 | 01FC | 0B74 | 46C6 | 2BF2 |

THU MAR 14 17:44:14 1991 PR.DLL PAGE 24, LINE 1358

| | | | | | | | | |
|---|---|---|---|---|---|---|---|---|
| 0000052320 | 46C7 | 01F0 | EB00 | F60F | FC46 | 7402 | C609 | F246 |
| 0000052340 | C720 | F046 | 0001 | 468B | 2BF6 | 2BC1 | F046 | 027D |
| 0000052360 | C033 | 5706 | F651 | FC46 | 750C | 8B07 | B2C8 | E820 |
| 0000052400 | 00BB | 1650 | 8D07 | F27E | 4E8B | E8F0 | 0091 | F658 |
| 0000052420 | FC46 | 7408 | F60D | FC46 | 7504 | 8B07 | B2C8 | E830 |
| 0000052440 | 009B | 5F59 | 5007 | 76E8 | 5800 | 46F6 | 04FC | 0774 |
| 0000052460 | C88B | 20B2 | 86E8 | E900 | FC00 | 76C4 | 260E | 89AD |
| 0000052500 | 0E76 | C4C3 | 0E76 | AD26 | D08B | AD26 | 8992 | 0E76 |
| 0000052520 | F6C3 | FC46 | 7420 | E808 | FFE9 | C28E | F88B | E8C3 |
| 0000052540 | FFD8 | F88B | C00B | 0375 | C08E | 1EC3 | C307 | 0698 |
| 0000052560 | C457 | 065E | FF26 | 044F | 1078 | 8B26 | 263F | 07FF |
| 0000052600 | 8E26 | 0247 | 33AA | 5FC0 | C307 | 5251 | 5306 | 0E50 |
| 0000052620 | 0FE8 | 83EF | 06C4 | 595A | FF3D | 75FF | EBE8 | E3E8 |
| 0000052640 | 8B1B | 01F7 | F84E | 3357 | 26FF | E8AC | FFC0 | F80B |
| 0000052660 | F7E2 | FF0B | 745F | C705 | F846 | FFFF | E3C3 | 0119 |
| 0000052700 | F84E | 3357 | 8AFF | E8C2 | FFA4 | F80B | F7E2 | FF0B |
| 0000052720 | 745F | C705 | F846 | FFFF | FDC3 | 9357 | F60B | 0A7F |
| 0000052740 | DB0B | 0675 | D20B | 0275 | 1AEB | 3392 | F7D2 | 93F1 |
| 0000052760 | F1F7 | 8792 | 04D3 | 3C30 | 7639 | 0203 | FF46 | 8BAA |
| 0000053000 | 4EC2 | D8EB | 2B59 | 47CF | C3FC | 5E5F | E58B | CB5D |
| 0000053020 | 06C8 | 0000 | BE56 | 115A | C02B | 4689 | 89FC | FA46 |
| 0000053040 | 026A | 71E8 | 830C | 02C4 | 0CEB | 76FF | E8FE | 0C22 |
| 0000053060 | C483 | 8302 | 0CC6 | 3639 | 151A | 3B72 | C68B | 5A2D |
| 0000053100 | B911 | 000C | F799 | 89F9 | FE46 | E850 | 0BF8 | C483 |
| 0000053120 | F602 | 0A44 | 7583 | C7D3 | 0444 | 0000 | 44C6 | 000A |
| 0000053140 | C02B | 4489 | 8908 | 0644 | 4489 | 8902 | C604 | 0B44 |
| 0000053160 | 89FF | FA76 | 5E8C | 6AFC | E802 | 0C44 | C483 | 8B02 |
| 0000053200 | FA46 | 568B | 5EFC | CBC9 | 04C8 | 0000 | 8B56 | 0676 |
| 0000053220 | 468B | 2D08 | 115A | 0CB9 | 9900 | F9F7 | 4689 | 50FE |
| 0000053240 | A3E8 | 830B | 02C4 | 76FF | FF0A | 0876 | 9A56 | 5458 |
| 0000053260 | 4E61 | C483 | 8906 | FC46 | 76FF | E8FE | 0B94 | C483 |
| 0000053300 | 8B02 | FC46 | C95E | 90CB | 8B55 | 57EC | 8B56 | 0676 |
| 0000053320 | 7E8B | 8308 | FFFE | 1274 | 45F6 | 010A | 1275 | 45F6 |
| 0000053340 | 800A | 0674 | 45F6 | 020A | 0674 | FFB8 | EBFF | 903E |
| 0000053360 | 458B | 0B08 | 0645 | 0875 | 571E | C3E8 | 83EE | 04C4 |
| 0000053400 | 058B | 558B | 3902 | 0645 | 0D75 | 5539 | 7508 | 8308 |
| 0000053420 | 047D | 7500 | FFD5 | FF05 | 0445 | C68B | 0DFF | 1DC4 |
| 0000053440 | 8826 | 8007 | 0A65 | 80EF | 0A4D | 2A01 | 5EE4 | C95F |
| 0000053460 | 90CB | 8B55 | 8BEC | 065E | 1E3B | 0F35 | 1272 | 09BA |
| 0000053500 | 3300 | E9C0 | E8B4 | E853 | 0B20 | C483 | E902 | E8C3 |
| 0000053520 | E853 | 0B0A | C483 | 5302 | FF9A | 00FF | 8500 | 75C0 |
| 0000053540 | C6E5 | 3787 | 000F | E853 | 0B00 | C483 | 8B02 | 5DE5 |
| 0000053560 | 00CB | 8B55 | 83EC | 02EC | C033 | 09EB | 8B55 | 83EC |
| 0000053600 | 02EC | FFB8 | 89FF | FE46 | 5E8B | 3B06 | 351E | 720F |
| 0000053620 | BA19 | 0009 | C033 | 61E9 | 8BE8 | FE4E | C90B | 0774 |
| 0000053640 | E853 | 0AC6 | C483 | E902 | E869 | C00B | 0774 | E853 |
| 0000053660 | 0AAC | C483 | 8302 | 04EC | CC8B | FF53 | 0A76 | 76FF |
| 0000053700 | FF08 | 0C76 | 5116 | FF9A | 00FF | 5900 | 855A | 75C0 |
| 0000053720 | 80C8 | 37A7 | FD0F | 468B | 0BFE | 74C0 | 5307 | 89E8 |
| 0000053740 | 830A | 02C4 | 8B91 | 5DE5 | 00CB | 8B55 | 83EC | 0EEC |
| 0000053760 | 7E8A | 8B0C | 0E46 | 4689 | EB0C | 5508 | EC8B | EC83 |
| 0000054000 | B70E | FF40 | 0876 | 76FF | 1606 | 568D | 52FE | 8D16 |
| 0000054020 | F856 | 3352 | 52D2 | 8B52 | 0C4E | 99E8 | 8B01 | 0A46 |
| 0000054040 | 00A9 | 7401 | 8008 | 10CA | 00A9 | 7504 | A92A | 0200 |
| 0000054060 | 2274 | CA80 | 5002 | 468D | FFFE | 0876 | 76FF | 1606 |
| 0000054100 | 3350 | 50C0 | 9A50 | FFFF | 0000 | C085 | 7558 | 8B08 |
| 0000054120 | FE4E | 03EB | CA80 | 5101 | 2552 | 0003 | C70A | 3350 |
| 0000054140 | 50C0 | 9A50 | FFFF | 0000 | C00B | 1674 | 6E3D | 7500 |
| 0000054160 | F60E | F0C2 | 02BA | 7400 | BA03 | 0011 | 7BE9 | E9E7 |

THU MAR 14 17:44:14 1991 PR.DLL PAGE 25, LINE 1417

| | | | | | | | | |
|---|---|---|---|---|---|---|---|---|
| 0000054200 | 009D | 468B | 3BFE | 3506 | 720F | 500D | E99A | 0054 |
| 0000054220 | BA00 | 0018 | C033 | E4EB | E850 | 09C2 | C483 | 8B02 |
| 0000054240 | 50D0 | 8D16 | F45E | 1653 | 468D | 50F8 | F29A | 0039 |
| 0000054260 | 0B00 | 75C0 | 8B61 | 0A46 | C933 | 00A9 | 7580 | A90E |
| 0000054300 | 4000 | 0775 | 06F6 | 1591 | 7580 | B102 | 8880 | F24E |
| 0000054320 | 468A | 3CF4 | 7501 | C607 | F446 | E940 | 008F | 023C |
| 0000054340 | 0775 | 46C6 | 08F4 | 84E9 | 3200 | 88C0 | F446 | C90A |
| 0000054360 | F474 | 46F7 | 020A | 7400 | 5274 | FFB9 | 51FF | B951 |
| 0000054400 | 0002 | 1651 | 468D | 50FA | 579A | 0055 | 0B00 | 74C0 |
| 0000054420 | 3D15 | 0083 | 0C74 | 76FF | E8FE | 094E | C483 | E902 |
| 0000054440 | E6F1 | C033 | 47EB | 1652 | 468D | 50F6 | 01B8 | 5000 |
| 0000054460 | 8D16 | F846 | 9A50 | FFFF | 0000 | C00B | 1B75 | 4639 |
| 0000054500 | 74F8 | 802A | F67E | 751A | 5210 | 76FF | FFFC | FA76 |
| 0000054520 | FF9A | 00FF | 0B00 | 75C0 | 52BD | C033 | 5050 | 1650 |
| 0000054540 | 468D | 50FA | 999A | 0056 | 0B00 | 75C0 | 8AA9 | F44E |
| 0000054560 | C1F6 | 7548 | FF28 | 0876 | 76FF | 1606 | 468D | 50F8 |
| 0000054600 | C033 | 5050 | D69A | 0055 | F700 | F846 | 0001 | 0374 |
| 0000054620 | C980 | F710 | 0A46 | 0008 | 0374 | C980 | 0A20 | F24E |
| 0000054640 | C980 | 8B01 | 8BC2 | 88D8 | 378F | 530F | BBE8 | 8308 |
| 0000054660 | 02C4 | E58B | CB5D | 30A1 | F70F | 23D0 | 33C1 | A8C9 |
| 0000054700 | 7580 | 8003 | 01C9 | 00C3 | 8B55 | 83EC | 08EC | C033 |
| 0000054720 | 5E8B | 3B06 | 351E | 730F | 534D | 81E8 | 8308 | 02C4 |
| 0000054740 | 4E8B | E30C | F647 | 3787 | 020F | 4075 | 3357 | 8BD2 |
| 0000054760 | 0C4E | 7EC4 | F608 | 3787 | 080F | 1074 | 878A | 1037 |
| 0000055000 | 0A3C | 0874 | 42AA | C649 | 3787 | 0A10 | 0653 | 5157 |
| 0000055020 | 468D | 16FA | 9A50 | 56C6 | 0000 | 0B5F | 74C0 | 530F |
| 0000055040 | 47E8 | 8308 | 02C4 | 09BA | E900 | E5CE | 4AEB | 468B |
| 0000055060 | 03FA | F6C2 | 3787 | 800F | 3E74 | A780 | 0F37 | 56FB |
| 0000055100 | 1E57 | C507 | 0876 | FE8B | C88B | 28E3 | 0DB4 | 3C80 |
| 0000055120 | 750A | 2606 | 8F80 | 0F37 | AC04 | C43A | 2574 | 1A3C |
| 0000055140 | 0875 | 8026 | 378F | 020F | 05EB | 0588 | E247 | 8BEA |
| 0000055160 | 2BC7 | 0846 | 1F06 | 5E5F | E853 | 07EE | C483 | 8B02 |
| 0000055200 | 5DE5 | 83CB | 01F9 | 0774 | 3C80 | 740A | EBE0 | 26DB |
| 0000055220 | 87F6 | 0F37 | 7440 | 0B2B | 75DB | 5323 | 468D | 16F9 |
| 0000055240 | 5150 | 468D | 16FA | 9A50 | 57A6 | 0000 | C085 | 0E74 |
| 0000055260 | 1F06 | 5E5F | E853 | 07B2 | C483 | E902 | E555 | 0AB0 |
| 0000055300 | A8EB | 46C6 | 00F9 | 8D53 | F946 | 5016 | 8D51 | FA46 |
| 0000055320 | 5016 | 389A | 0058 | 0B00 | 75C0 | F7D5 | FA46 | FFFF |
| 0000055340 | 3674 | 7E83 | 010C | 3574 | F626 | 3787 | 080F | 1C75 |
| 0000055360 | B853 | FFFF | 5050 | D8F7 | 8D50 | FC46 | 5016 | F59A |
| 0000055400 | 0056 | 8000 | F97E | 750A | E90F | FF61 | 468A | 26F9 |
| 0000055420 | 8788 | 1037 | 0A3C | 0274 | 0DB0 | 4DE9 | 80FF | F97E |
| 0000055440 | 750A | EBC5 | 0099 | 8B55 | 83EC | 0EEC | C033 | 09EB |
| 0000055460 | 8B55 | 83EC | 0EEC | FFB8 | 89FF | F246 | 5E8B | 3B06 |
| 0000055500 | 351E | 720F | BA08 | 0009 | C033 | ADE9 | 0BE4 | 74C0 |
| 0000055520 | 5307 | 09EB | 8307 | 02C4 | 87F6 | 0F37 | 7420 | 5312 |
| 0000055540 | C933 | 5151 | 4141 | 8D51 | F446 | 5016 | 8F9A | 0058 |
| 0000055560 | F600 | 3787 | 800F | 6674 | 5E8C | 8EFA | 0A46 | 56C5 |
| 0000055600 | 3308 | 89C0 | FE46 | 4689 | FCFC | 5657 | FA8B | F28B |
| 0000055620 | 6689 | 8BF8 | 0C4E | 28E3 | 0AB0 | AEF2 | 3B75 | EC83 |
| 0000055640 | 8B02 | BADC | 0080 | E22B | D48B | FA8B | 0716 | 4E8B |
| 0000055660 | AC0C | 0A3C | 0D74 | FB3B | 1A74 | E2AA | E8F4 | 0038 |
| 0000055700 | AFE9 | B000 | 3B0D | 75FB | E803 | 002C | B0AA | FF0A |
| 0000055720 | FC46 | E2EB | 21E8 | EB00 | 5EE1 | 8E5F | FA5E | C8E9 |
| 0000055740 | 8B00 | F246 | C00B | 0974 | 76FF | E806 | 067C | C483 |
| 0000055760 | B802 | FFFC | E80E | E22E | 5350 | 1E51 | 1F06 | CF8B |
| 0000056000 | CA2B | 21E3 | 8B51 | 065E | 1E53 | 5152 | 468D | 16F4 |
| 0000056020 | 9A50 | 3D31 | 0000 | 0B59 | 75C0 | 8B11 | F45E | 5E01 |
| 0000056040 | 3BFE | 72D9 | 1F07 | 5B59 | 8B58 | C3FA | 831F | 08C4 |

THU MAR 14 17:44:14 1991 PR.DLL PAGE 26, LINE 1476

| | | | | | | | | |
|---|---|---|---|---|---|---|---|---|
| 0000056060 | 7E83 | 00FE | 3C75 | C00B | 1874 | 6D3D | 7400 | 3D0D |
| 0000056100 | 0001 | 09BA | 7500 | BA08 | 001C | 03EB | 20BA | F900 |
| 0000056120 | 26EB | 5E8E | F6FA | 3787 | 400F | 0E74 | 5E8E | 8B0A |
| 0000056140 | 085E | 3F80 | 751A | F803 | 0EEB | 1CBA | 3300 | F9C0 |
| 0000056160 | 06EB | 468B | 2BFE | FC46 | 668B | 5EF8 | 8E5F | FA5E |
| 0000056200 | 1472 | 5E8B | 0BF2 | 74DB | FF09 | 0676 | DBE8 | 8305 |
| 0000056220 | 02C4 | E58B | CB5D | 5E8B | 0BF2 | 74DB | FF09 | 0676 |
| 0000056240 | C7E8 | 8305 | 02C4 | 51E9 | 8BE3 | 0C4E | C90B | 0475 |
| 0000056260 | C18B | CEEB | C51E | 0856 | 1E53 | 5152 | 468D | 16F4 |
| 0000056300 | 9A50 | 59A2 | 0000 | 071E | 0B1F | 74C0 | 3D17 | 006D |
| 0000056320 | 0D74 | 013D | BA00 | 0009 | BC75 | 1CBA | EB00 | BAB7 |
| 0000056340 | 0020 | B2EB | 468B | 0BF4 | 75C0 | F697 | 3787 | 400F |
| 0000056360 | 0A74 | DA8B | 8026 | 1A3F | 0275 | 86EB | 1CBA | 3300 |
| 0000056400 | EBC0 | 0093 | BBEA | 405A | EA54 | 5ADA | 5A97 | A8EA |
| 0000056420 | 9C5A | EA5A | 5AA8 | 5AA1 | 8B55 | 56EC | 76C4 | 8C06 |
| 0000056440 | E3C1 | 2605 | 4C80 | 01FE | 5D5E | 55CB | EC8B | 096A |
| 0000056460 | 63E8 | 8305 | 02C4 | 76FF | 0E06 | 0DE8 | 5B00 | 096A |
| 0000056500 | 7DE8 | 8305 | 02C4 | E58B | CB5D | 8B55 | 56EC | 8B57 |
| 0000056520 | 064E | F983 | 77E8 | 1E69 | 94A1 | 0B15 | 74C0 | BF48 |
| 0000056540 | 5BC2 | 368B | 159C | 1EC5 | 1596 | 561E | FF57 | 5FD7 |
| 0000056560 | 735E | 8C2B | C5DA | 0C5F | D63B | EF75 | 1F58 | C41E |
| 0000056600 | 9636 | 2615 | 748B | C512 | 921E | 8C15 | 3BDA | 75D0 |
| 0000056620 | 1FD9 | 811E | 3EFF | 745C | BF0E | 5C3E | C4EB | 815E |
| 0000056640 | C2FF | 745B | EB0F | 070A | BF06 | 1592 | E1E8 | 7201 |
| 0000056660 | E80E | 007E | 891F | 9816 | 8915 | 961E | EB15 | 1F04 |
| 0000056700 | C033 | 5F99 | 5D5E | 00CB | 5706 | F88B | FB03 | 7F89 |
| 0000056720 | 4F04 | 2D4F | 0016 | 778D | C714 | FE05 | 89FF | 0A7F |
| 0000056740 | 8948 | 8C04 | 8B1F | 8CC6 | 8EDA | 8DC2 | 067F | ABFC |
| 0000056760 | 47AB | 3347 | ABC0 | ABAB | 5FAB | C307 | 8B26 | 0245 |
| 0000057000 | C00B | 0975 | 8C26 | 025D | 8926 | EB1D | 0614 | C426 |
| 0000057020 | 0875 | 8C26 | 0E5C | 8926 | 0C5C | 478C | 8912 | 1077 |
| 0000057040 | 2607 | 5D8C | 260A | 5D89 | 2608 | 5D8C | 2606 | 5D89 |
| 0000057060 | C304 | 8041 | FEE1 | FC53 | 778B | 8B08 | 0A5F | FF33 |
| 0000057100 | 23EB | C38B | A85B | 7501 | 5342 | 778B | 8B06 | 085F |
| 0000057120 | DE3B | 3674 | 334B | EBFF | 900C | 548D | 3BFE | 73D3 |
| 0000057140 | 03E1 | 72F0 | AD23 | 01A8 | F074 | FE8B | 3B48 | 73C1 |
| 0000057160 | 0323 | 72F0 | 8B13 | ADD0 | 01A8 | DE74 | C203 | 0205 |
| 0000057200 | 8B00 | 89F7 | FE44 | E4EB | C08B | 8B5B | 0647 | 4789 |
| 0000057220 | F908 | 19EB | 895B | FE4C | 0974 | F903 | C12B | 8948 |
| 0000057240 | 2B05 | 03F9 | 89F9 | 087F | C68B | DA8C | C3F8 | 5751 |
| 0000057260 | 47F6 | 0102 | 6674 | B7E8 | 8B00 | 8BFE | A804 | 7401 |
| 0000057300 | 2B03 | 49C8 | 4141 | 778B | 0B04 | 74F6 | 034F | 73CE |
| 0000057320 | 3309 | BAC0 | FFF0 | 33E3 | 42EB | DEB8 | 8E3C | 26C0 |
| 0000057340 | A0A1 | 3D15 | 2000 | 1674 | 00BA | 3B80 | 72D0 | D106 |
| 0000057360 | 75EA | EBF8 | 8322 | 08FA | 1D72 | E2D1 | C28B | 8B48 |
| 0000057400 | 03D0 | 73C1 | 3302 | F7C0 | 23D2 | 52C2 | 2EE8 | 5A00 |
| 0000057420 | 0D73 | FA83 | 74F0 | B805 | 0010 | E2EB | EBF9 | 8B1B |
| 0000057440 | 2BD0 | 0457 | 4789 | 8904 | 087F | 778B | 4A0A | 1489 |
| 0000057460 | 0342 | C7F2 | FE04 | 89FF | 0A77 | 595F | 8BC3 | F6D0 |
| 0000057500 | 0247 | 7404 | 4A0F | 778B | 4E04 | D63B | 0572 | 5739 |
| 0000057520 | 73FE | 4218 | 1E50 | 359A | 0039 | 0B00 | 75C0 | 8B0F |
| 0000057540 | F6C2 | 0247 | 7404 | 4A04 | 5789 | F8FE | 01EB | C3F9 |
| 0000057560 | 8B57 | 0877 | 773B | 750A | 8B03 | 0677 | 3DAD | FFFE |
| 0000057600 | 0874 | FE8B | FE24 | F003 | F2EB | 4F4F | F78B | C35F |
| 0000057620 | D18B | C283 | 8027 | F0E2 | 8B50 | 52C4 | 5016 | C033 |
| 0000057640 | 9A50 | FFFF | 0000 | 0B1F | 75C0 | 3314 | 26DB | 458B |
| 0000057660 | 890C | 0247 | C28B | 0FE8 | E8FE | FE40 | EBF8 | F901 |
| 0000057700 | 00C3 | 8B55 | 8BEC | 8BD7 | 1EDE | 7EC4 | 3306 | B9C0 |
| 0000057720 | FFFF | AEF2 | 758D | C4FF | 0A7E | FFB9 | F2FF | F7AE |

THU MAR 14 17:44:14 1991 PR.DLL PAGE 27, LINE 1535

| | | | | | | | | |
|---|---|---|---|---|---|---|---|---|
| 0000057740 | 2BD1 | 8CF9 | 8EC0 | 8ED8 | 0846 | FE87 | 468B | F706 |
| 0000057760 | 01C6 | 7400 | A402 | D149 | F3E9 | 13A5 | F3C9 | 8BA4 |
| 0000060000 | 8BF3 | 1FFA | C28C | CB5D | 8B55 | 8BEC | 8BD7 | 1EDE |
| 0000060020 | 76C5 | 8B0A | 8CFE | 8ED8 | 33C0 | B9C0 | FFFF | AEF2 |
| 0000060040 | D1F7 | 7EC4 | 8B06 | A8C7 | 7401 | A402 | D149 | F3E9 |
| 0000060060 | 13A5 | F3C9 | 8BA4 | 8BF3 | 1FFA | C28C | CB5D | 8B55 |
| 0000060100 | 8BEC | 8BD7 | 1EDE | 76C5 | C406 | 0A7E | C033 | FFB9 |
| 0000060120 | F2FF | F7AE | 2BD1 | F3F9 | 74A6 | 1B05 | 1DC0 | FFFF |
| 0000060140 | 8B1F | 8BF3 | 5DFA | 00CB | 8B55 | 8BEC | C4D7 | 067E |
| 0000060160 | C033 | FFB9 | F2FF | F7AE | 49D1 | 8B91 | 5DFA | 00CB |
| 0000060200 | 8B55 | 57EC | 1E56 | 7EC4 | C506 | 0A76 | DF8B | 4E8B |
| 0000060220 | E30E | AC0C | C00A | 0374 | E2AA | 32F8 | F3C0 | 8BAA |
| 0000060240 | 8CC3 | 1FC2 | 5F5E | E58B | CB5D | 8B55 | 57EC | 1E56 |
| 0000060260 | 4E8B | E30E | 8B27 | C4D9 | 067E | F78B | C033 | AEF2 |
| 0000060300 | D9F7 | CB03 | FE8B | 76C5 | F30A | 8AA6 | FF44 | C933 |
| 0000060320 | 3A26 | FF45 | 0477 | 0474 | 4949 | D1F7 | C18B | 5E1F |
| 0000060340 | 8B5F | 5DE5 | 00CB | 01E9 | 0000 | 8B55 | 57EC | 1E56 |
| 0000060360 | 76C5 | 3306 | 99C0 | DB33 | 3CAC | 7420 | 3CFB | 7409 |
| 0000060400 | 50F7 | 2D3C | 0474 | 2B3C | 0175 | 3CAC | 7739 | 2C1F |
| 0000060420 | 7230 | D11B | D1E3 | 8BD2 | 8BCB | D1FA | D1E3 | D1D2 |
| 0000060440 | D1E3 | 03D2 | 13D9 | 03D7 | 83D8 | 00D2 | DCEB | 3C58 |
| 0000060460 | 932D | 0775 | D8F7 | D283 | F700 | 1FDA | 5F5E | CB5D |
| 0000060500 | 8B55 | 56EC | B357 | 8B01 | 0C4E | 466B | 3306 | 83D2 |
| 0000060520 | 0AF9 | 0175 | 1E99 | 7EC5 | E908 | 0D0D | 8B55 | 8BEC |
| 0000060540 | 0646 | 2005 | C900 | 90CB | 8B55 | 8BEC | 065E | 87F6 |
| 0000060560 | 15C1 | 7401 | 8D05 | 2047 | 02EB | C38B | CBC9 | 8B55 |
| 0000060600 | 8BEC | 0646 | 202D | C900 | 90CB | 8B55 | 8BEC | 065E |
| 0000060620 | 87F6 | 15C1 | 7402 | 8D05 | E047 | 02EB | C38B | CBC9 |
| 0000060640 | 04C8 | 0000 | A156 | 113D | 168B | 113F | 4689 | 89FC |
| 0000060660 | FE56 | 0C6A | DFE8 | 8300 | 02C4 | 468B | 0BFE | FC46 |
| 0000060700 | 7674 | 468B | 0B08 | 0646 | 6E74 | 76FF | FF08 | 0676 |
| 0000060720 | F89A | 805D | 835F | 04C4 | F08B | 5EC4 | 26FC | 478B |
| 0000060740 | 2602 | 070B | 5274 | FF26 | 0277 | FF26 | 9A37 | 5DF8 |
| 0000060760 | 5FA1 | C483 | 3B04 | 7EC6 | C439 | FC5E | C426 | 261F |
| 0000061000 | 3880 | 753D | 562D | 76FF | FF08 | 0676 | 5306 | 3A9A |
| 0000061020 | A65E | 835A | 0AC4 | C00B | 1875 | 0C6A | A1E8 | 8300 |
| 0000061040 | 02C4 | 5EC4 | 26FC | 078B | 8B26 | 0257 | C603 | EB40 |
| 0000061060 | 9012 | 4683 | 04FC | A2EB | 0C6A | 83E8 | 8300 | 02C4 |
| 0000061100 | C02B | 5E99 | CBC9 | 8B55 | 50EC | 468B | 0504 | 0014 |
| 0000061120 | 4BEB | 8B55 | 50EC | 468B | 0504 | 0014 | 69EB | 8B55 |
| 0000061140 | 50EC | 468B | 0504 | 0114 | 33EB | 8B55 | 50EC | 468B |
| 0000061160 | 0504 | 0114 | 51EB | 8B55 | 50EC | 468B | C104 | 02E0 |
| 0000061200 | FF68 | 50FF | FF6A | FF6A | FF9A | 00FF | 0B00 | 75C0 |
| 0000061220 | 5829 | E58B | C35D | 8B55 | 50EC | 468B | FF04 | C206 |
| 0000061240 | C116 | 02E0 | 1168 | 5060 | FF6A | FF6A | CE9A | 0004 |
| 0000061260 | 0B00 | 75C0 | 5805 | E58B | C35D | 11B8 | E900 | D92D |
| 0000061300 | 8B55 | 50EC | 468B | C104 | 02E0 | 3568 | 5060 | 4C9A |
| 0000061320 | 0005 | 0800 | 75C0 | FFE3 | C20E | 5816 | E58B | C35D |
| 0000061340 | 8B55 | FFEC | 0676 | ADE8 | 83FF | 02C4 | E58B | CB5D |
| 0000061360 | 8B55 | FFEC | 0676 | C7E8 | 83FF | 02C4 | E58B | CB5D |
| 0000061400 | 068E | 0EF6 | A126 | 0006 | 3B48 | C406 | 7716 | C107 |
| 0000061420 | 06E0 | FFBA | C3FF | 5357 | 6A51 | E80F | FF78 | C483 |
| 0000061440 | 3B02 | C406 | 7616 | 8B40 | 05D8 | 0004 | FC25 | 8BFF |
| 0000061460 | C1C8 | 06E0 | A3BA | 5060 | 9A52 | 5CE7 | 0000 | C00B |
| 0000061500 | 3275 | 8B49 | 87F9 | C43E | 2B16 | 51CF | C147 | 06E7 |
| 0000061520 | E1C1 | 5705 | C28E | ABF3 | 595F | C726 | 0445 | 0200 |
| 0000061540 | C783 | E240 | 8BF5 | 6AC3 | E80F | FF54 | C483 | 5902 |
| 0000061560 | 5F5B | 9BEB | 10B8 | E900 | D873 | 8B55 | 56EC | 8B57 |
| 0000061600 | 0C5E | C38B | 5A2D | 9911 | 0CB9 | F700 | 50F1 | E850 |

THU MAR 14 17:44:14 1991 PR.DLL PAGE 28, LINE 1594

| | | | | | | | | |
|---|---|---|---|---|---|---|---|---|
| 0000061620 | FEB4 | C483 | 8B02 | 0A56 | D20B | 547E | C44A | 067E |
| 0000061640 | D20B | 5674 | 4F8B | E304 | 3B20 | 76CA | 8B02 | 1ECA |
| 0000061660 | 37C5 | 0AB4 | 9051 | AAAC | C43A | FAE0 | 1F58 | 3789 |
| 0000061700 | 3374 | 4729 | 2B04 | EBD0 | 06D7 | 5253 | 531E | E80E |
| 0000061720 | E034 | C483 | 5A04 | 075B | FF3D | 74FF | AA08 | 0A3C |
| 0000061740 | 1874 | EB4A | 3BBB | 067E | 0674 | 47F6 | 200A | 0A74 |
| 0000061760 | C033 | EB95 | 280E | 29C1 | 0447 | C033 | 8BAA | 0646 |
| 0000062000 | 568B | 5B08 | E853 | FE4A | C483 | 5F02 | 5D5E | 00CB |
| 0000062020 | 04C8 | 0000 | 5657 | 76FF | FF08 | 0676 | F89A | EC5D |
| 0000062040 | 8361 | 04C4 | F88B | 468B | 2D0A | 115A | 0CB9 | 9900 |
| 0000062060 | F9F7 | 4689 | 50FC | 0DE8 | 83FE | 02C4 | 76FF | FF0C |
| 0000062100 | 0A76 | B9E8 | 83E2 | 04C4 | F08B | 76FF | FF0C | 0A76 |
| 0000062120 | 6A57 | FF01 | 0876 | 76FF | 9A06 | 3FFE | 5F63 | C483 |
| 0000062140 | 890C | FE46 | 76FF | FF0C | 0A76 | E856 | E308 | C483 |
| 0000062160 | FF06 | FC76 | DBE8 | 83FD | 02C4 | 7E39 | 75FE | 2B05 |
| 0000062200 | EBC0 | 9004 | FFB8 | 5EFF | C95F | 90CB | 02C8 | 0000 |
| 0000062220 | 5657 | 768B | 8A06 | 0B44 | E42A | F88B | C68B | 5A2D |
| 0000062240 | B911 | 000C | F799 | 89F9 | FE46 | E850 | FD98 | C483 |
| 0000062260 | 1E02 | 9A56 | 4594 | 626C | C483 | 8004 | 37A5 | FD0F |
| 0000062300 | 6480 | CF0A | 44F6 | 800A | 0874 | 448A | 240A | 88FC |
| 0000062320 | 0A44 | 006A | 006A | 006A | 9A57 | 550C | 61AF | C483 |
| 0000062340 | FF08 | FE76 | 6BE8 | 83FD | 02C4 | 5F5E | CBC9 | 04C8 |
| 0000062360 | 0000 | 5657 | 126A | 9DE8 | 83FD | 02C4 | 06C6 | 3794 |
| 0000062400 | 8B42 | 0646 | 568B | A308 | 3790 | 1689 | 3792 | 8ABE |
| 0000062420 | 8937 | 8904 | 0254 | 06C7 | 378E | 7FFF | 468D | 160E |
| 0000062440 | FF50 | 0C76 | 76FF | 1E0A | 9A56 | 4EB6 | 62DF | C483 |
| 0000062460 | 8B0C | FFF8 | 8E0E | 7837 | C40F | 8A1E | FF37 | 8A06 |
| 0000062500 | 2637 | 07C6 | EB00 | 900D | 561E | 006A | 329A | 4642 |
| 0000062520 | 8362 | 06C4 | 126A | 67E8 | 83FD | 02C4 | C78B | 5F5E |
| 0000062540 | CBC9 | 04C8 | 0000 | 5657 | 116A | 29E8 | 83FD | 02C4 |
| 0000062560 | 06C6 | 37A0 | 8B49 | 0646 | 568B | A308 | 379C | 1689 |
| 0000062600 | 379E | 96BE | 8937 | 8904 | 0254 | 5052 | F89A | 395D |
| 0000062620 | 8363 | 04C4 | 9AA3 | 8D37 | 0E46 | 5016 | 76FF | FF0C |
| 0000062640 | 0A76 | 681E | 3796 | 7C9A | BC46 | 8362 | 0CC4 | F88B |
| 0000062660 | 116A | 0BE8 | 83FD | 02C4 | C78B | 5F5E | CBC9 | 8B55 |
| 0000062700 | 57EC | 468B | F706 | 0866 | 0573 | C033 | EB99 | 501A |
| 0000062720 | 949A | 1F5A | 5963 | D88B | DA0B | 0D74 | 8B50 | 8EF8 |
| 0000062740 | 33C2 | 41C0 | E9D1 | ABF3 | 5F58 | CB5D | 8B55 | 56EC |
| 0000062760 | 768B | 8B04 | B9C6 | 000A | F799 | 04F9 | C430 | 065E |
| 0000063000 | 46FF | 2606 | 0788 | C68B | F799 | 80F9 | 30C2 | 5E8B |
| 0000063020 | FF06 | 0646 | 8826 | 8B17 | 0646 | C28C | C95E | 06C2 |
| 0000063040 | 9000 | 12C8 | 0000 | E856 | FCD6 | C28E | D88B | 5E89 |
| 0000063060 | 8CF2 | F446 | 8B26 | 1A47 | 0B26 | 1847 | 2E75 | 1A6A |
| 0000063100 | 949A | 635A | 8363 | 02C4 | 5EC4 | 26F2 | 4789 | 2618 |
| 0000063120 | 5789 | 8B1A | 26C2 | 470B | 7518 | C70B | EE46 | 37A2 |
| 0000063140 | 5E8C | EBF0 | 9015 | 8B26 | 1847 | 08EB | 8B26 | 1847 |
| 0000063160 | 8B26 | 1A57 | 4689 | 89EE | F056 | 468B | 8BEE | F056 |
| 0000063200 | 4689 | 89F6 | F856 | 5EC4 | 2606 | 478B | 8B0C | D1C8 |
| 0000063220 | 03E0 | 89C1 | FA46 | 8B26 | 0847 | C88B | E0D1 | C103 |
| 0000063240 | 4689 | C7FC | FE46 | 0000 | 768B | 8BFE | FA5E | 808A |
| 0000063260 | 1726 | 5EC4 | 26EE | 0788 | 5E8B | 8AFC | 3C80 | 8B17 |
| 0000063300 | EE5E | 8826 | 0447 | 46FF | FFFE | EE46 | 7E83 | 03FE |
| 0000063320 | D67C | 5E8B | 83EE | EE46 | 2604 | 07C6 | 8B20 | EE5E |
| 0000063340 | 46FF | 26EE | 07C6 | 0620 | 76FF | C4EE | 065E | FF26 |
| 0000063360 | 0677 | F7E8 | 8EFE | 8BC2 | 26D8 | 07C6 | 8D20 | 0147 |
| 0000063400 | 5006 | 5EC4 | 2606 | 77FF | E804 | FEE0 | C28E | D88B |
| 0000063420 | C626 | 3A07 | 478D | 0601 | C450 | 065E | FF26 | 0277 |
| 0000063440 | C9E8 | 8EFE | 8BC2 | 26D8 | 07C6 | 8D3A | 0147 | 5006 |
| 0000063460 | 5EC4 | 2606 | 37FF | B3E8 | 8EFE | 8BC2 | 26D8 | 07C6 |

THU MAR 14 17:44:14 1991 PR.DLL PAGE 29, LINE 1653

| | | | | | | | | |
|---|---|---|---|---|---|---|---|---|
| 0000063500 | 8D20 | 0147 | 5006 | 5EC4 | 2606 | 478B | B90A | 0064 |
| 0000063520 | D88B | F799 | 05F9 | 0013 | 8B50 | E8F3 | FE8E | 5052 |
| 0000063540 | 64B9 | 8B00 | 99C6 | F9F7 | E852 | FE80 | C28E | D88B |
| 0000063560 | C626 | 0A07 | 8943 | EE5E | 468C | 26F0 | 07C6 | 8B00 |
| 0000063600 | F646 | 568B | 5EF8 | CBC9 | 04C8 | 0000 | 76FF | FF08 |
| 0000063620 | 0676 | 8C9A | 3867 | 8365 | 04C4 | 5689 | 0BFE | 74D0 |
| 0000063640 | FF0F | FE76 | 9A50 | 63B2 | 63D3 | C483 | EB04 | 9004 |
| 0000063660 | C02B | C999 | 90CB | 14C8 | 0000 | 5657 | 5EC4 | 2606 |
| 0000063700 | 7F81 | CE02 | 7712 | 720F | 2607 | 3F81 | A600 | 0673 |
| 0000063720 | C02B | E999 | 0222 | 27E8 | 8EFB | 8BC2 | 89D8 | F45E |
| 0000063740 | 468C | 26F6 | 478B | 261E | 470B | 751C | 6A2D | 9A12 |
| 0000063760 | 5A94 | 65CB | C483 | C402 | F45E | 8926 | 1C47 | 8926 |
| 0000064000 | 1E57 | C28B | 0B26 | 1C47 | 0A75 | 46C7 | FAF8 | 8C16 |
| 0000064020 | FA5E | 14EB | 8B26 | 1C47 | 08EB | 8B26 | 1C47 | 8B26 |
| 0000064040 | 1E57 | 4689 | 89F8 | FA56 | E168 | 6801 | 3380 | 5EC4 |
| 0000064060 | 2606 | 77FF | 2602 | 37FF | AA9A | E96E | 6A65 | 68FE |
| 0000064100 | AE80 | E168 | 6801 | 3380 | 5EC4 | 2606 | 77FF | 2602 |
| 0000064120 | 37FF | F08B | FA8B | 4A9A | 0F6E | C466 | F85E | 8926 |
| 0000064140 | 0A47 | 9940 | C233 | C22B | F8C1 | 3302 | 2BC2 | 8BC2 |
| 0000064160 | 8BCE | 6AF0 | 5300 | 4E89 | 89EC | EE7E | 6C9A | AF6D |
| 0000064200 | 0366 | EC46 | D713 | 4689 | 89FC | FE56 | 468E | 83FA |
| 0000064220 | FE7E | 7D00 | 812D | FC46 | 3380 | 5681 | E1FE | 8B01 |
| 0000064240 | F85E | 8B26 | 0A47 | B940 | 0004 | F799 | 0BF9 | 75D2 |
| 0000064260 | 810A | FC46 | 5180 | 5683 | 01FE | 264E | 4FFF | EB0A |
| 0000064300 | 90CE | 5EC4 | 26F8 | 4781 | B20A | 2607 | 478B | B90A |
| 0000064320 | 0004 | D88B | F799 | 0BF9 | 75D2 | 8B25 | B9C3 | 0064 |
| 0000064340 | F799 | 0BF9 | 75D2 | 8B11 | F85E | 8B26 | 0A47 | 90B9 |
| 0000064360 | 9901 | F9F7 | D20B | 0875 | 46C7 | C6F0 | EB16 | 9006 |
| 0000064400 | 46C7 | E0F0 | 8C16 | F25E | 5E8B | 26F8 | 6F81 | 6C0A |
| 0000064420 | 6A07 | 6801 | 5180 | 76FF | FFFE | FC76 | D29A | C56C |
| 0000064440 | C466 | F85E | 8926 | 0E47 | 016A | 8068 | 8D51 | FC46 |
| 0000064460 | 5016 | 909A | 216C | C467 | F85E | C726 | 0847 | 0001 |
| 0000064500 | 07EB | 5EC4 | 26F8 | 47FF | C408 | F85E | 8B26 | 0E47 |
| 0000064520 | 8B26 | 085F | E3D1 | 7EC4 | 26F0 | 0139 | E47C | 5EC4 |
| 0000064540 | 26F8 | 4FFF | 2608 | 5F8B | C408 | F87E | 8B26 | 0E45 |
| 0000064560 | E3D1 | 7EC4 | 8BF0 | 26C8 | 012B | 5EC4 | 26F8 | 4789 |
| 0000064600 | 6A06 | 6800 | 0E10 | 76FF | FFFE | FC76 | F98B | D29A |
| 0000064620 | 3B6C | C467 | F85E | 8926 | 0447 | 006A | 3C6A | 006A |
| 0000064640 | 1068 | 8D0E | FC46 | 5016 | 909A | 486C | 5267 | 8950 |
| 0000064660 | EC46 | 5689 | 9AEE | 6CD2 | 675E | 5EC4 | 26F8 | 4789 |
| 0000064700 | 6A02 | 6A00 | FF3C | EE76 | 76FF | 9AEC | 6D9E | 6525 |
| 0000064720 | 5EC4 | 26F8 | 0789 | 6926 | 0A47 | 016D | C703 | C603 |
| 0000064740 | CA2D | B963 | 0007 | D22B | F1F7 | 8926 | 0C57 | C726 |
| 0000064760 | 1047 | 0000 | C38B | C28C | 5F5E | CBC9 | 08C8 | 0000 |
| 0000065000 | 5A9A | B568 | C467 | 065E | 8B26 | 2607 | 578B | 2B02 |
| 0000065020 | 1806 | 1B17 | 1A16 | 8917 | FC46 | 5689 | 8DFE | FC46 |
| 0000065040 | 5016 | 469A | D865 | 8367 | 04C4 | 4689 | 89F8 | FA56 |
| 0000065060 | D00B | 0675 | C02B | EB99 | 9044 | 3E83 | 171C | 7400 |
| 0000065100 | FF36 | FA76 | 9A50 | 6954 | 67F2 | C483 | 0B04 | 74C0 |
| 0000065120 | 8126 | FC46 | 0E10 | 5683 | 00FE | 468D | 16FC | 9A50 |
| 0000065140 | 6546 | 6582 | C483 | 8E04 | 8BC2 | 89D8 | F85E | 468C |
| 0000065160 | 26FA | 47C7 | 0110 | 8B00 | F846 | 568B | C9FA | 90CB |
| 0000065200 | 8B55 | 83EC | 0CEC | 468D | 16F4 | 9A50 | FFFF | 0000 |
| 0000065220 | 00B4 | 468A | 50F6 | 468A | 50F5 | 468A | 50F4 | 468A |
| 0000065240 | 50F8 | 468A | 50F9 | 468B | 2DFA | 07BC | 9A50 | 6A22 |
| 0000065260 | 6793 | C483 | 830C | 087E | 7400 | C40A | 065E | 8926 |
| 0000065300 | 0257 | 8926 | 8B07 | 5DE5 | 00CB | 0B6A | C7E8 | 83F7 |
| 0000065320 | 02C4 | 3E83 | 37BC | 7500 | E807 | 0022 | 06FF | 37BC |
| 0000065340 | 0B6A | DBE8 | 83F7 | 02C4 | 90CB | 0B6A | A7E8 | 83F7 |

THU MAR 14 17:44:14 1991 PR.DLL PAGE 30, LINE 1712

| | | | | | | | | |
|---|---|---|---|---|---|---|---|---|
| 0000065360 | 02C4 | 09E8 | 6A00 | E80B | F7C6 | C483 | CB02 | 04C8 |
| 0000065400 | 0000 | 1E56 | 0C68 | 9A17 | 5F30 | 68C7 | C483 | 8904 |
| 0000065420 | FC46 | 5689 | 0BFE | 75D0 | E903 | 00A4 | 5EC4 | 26FC |
| 0000065440 | 3F80 | 7500 | E903 | 0098 | 036A | 5006 | 36FF | 1720 |
| 0000065460 | 36FF | 171E | 109A | DE5E | 8368 | 0AC4 | 006A | 1068 |
| 0000065500 | 830E | FC46 | FF03 | FE76 | 76FF | 9AFC | 5E76 | 68E8 |
| 0000065520 | C483 | 5204 | 9A50 | 6D6C | 6933 | 18A3 | 8917 | 1A16 |
| 0000065540 | 2B17 | 8EF6 | FE46 | 5E8B | 26FC | 3880 | 7400 | 261A |
| 0000065560 | 008A | C88B | 8B98 | F6D8 | C187 | 0415 | 0575 | F980 |
| 0000065600 | 752D | 4606 | FE83 | 7C03 | 8BDD | FC5E | 8026 | 0038 |
| 0000065620 | 1874 | 036A | DE03 | 5306 | 36FF | 1724 | 36FF | 1722 |
| 0000065640 | 109A | 405E | 8368 | 0AC4 | 08EB | 1EC4 | 1722 | C626 |
| 0000065660 | 0007 | 1EC4 | 1722 | 8026 | 013F | C01B | A340 | 171C |
| 0000065700 | C95E | 90C3 | 04C8 | 0000 | C456 | 065E | 8326 | 087F |
| 0000065720 | 7D03 | E903 | 00B6 | 8326 | 087F | 7E09 | E903 | 00AC |
| 0000065740 | 8326 | 087F | 7E03 | 260A | 7F83 | 0908 | 037D | 81E9 |
| 0000065760 | 2600 | 778B | 810A | 6CC6 | 8107 | C2FE | 7E07 | 2617 |
| 0000066000 | 7F83 | 0308 | 1075 | 8B26 | 085F | E3D1 | 878B | 16ED |
| 0000066020 | 0705 | EB00 | 900B | 8B26 | 085F | E3D1 | 878B | 16E2 |
| 0000066040 | 4689 | F7FC | 03C6 | 7500 | FF03 | FC46 | 5E8B | 2606 |
| 0000066060 | 778B | 830A | 46EE | 448D | 9901 | C233 | C22B | F8C1 |
| 0000066100 | 3302 | 2BC2 | 69C2 | 6DCE | 0301 | 03C1 | FC46 | 0405 |
| 0000066120 | B900 | 0007 | F799 | 2BF9 | FC56 | DAF7 | 8326 | 087F |
| 0000066140 | 7503 | 2615 | 573B | 7C0E | 7509 | 2621 | 7F83 | 0204 |
| 0000066160 | 1A7C | 01B8 | EB00 | 9017 | 5EC4 | 8B06 | 26C2 | 4739 |
| 0000066200 | 7C0E | 75EF | 2607 | 7F83 | 0104 | E67C | C02B | C95E |
| 0000066220 | 90CB | 16C8 | 0000 | 5657 | 768B | 6A06 | 6801 | 5180 |
| 0000066240 | 448D | 9903 | C233 | C22B | F8C1 | 3302 | 2BC2 | 99C2 |
| 0000066260 | 5052 | 6C9A | 746D | 896A | EA46 | 5689 | 8BEC | 085E |
| 0000066300 | E3D1 | BF8B | 16DE | C68B | 04B9 | 9900 | F9F7 | D20B |
| 0000066320 | 0775 | 7E83 | 0208 | 017E | 8B47 | 0A46 | C703 | 4689 |
| 0000066340 | 9AFC | 685A | 6A97 | 006A | 3C6A | 006A | 3C6A | 006A |
| 0000066360 | 186A | C669 | 016D | 4603 | 030A | 99C7 | 4405 | 830E |
| 0000066400 | 00D2 | 5052 | 6C9A | AA6D | 8B6A | 8BC8 | 0C46 | DA8B |
| 0000066420 | 0399 | 13C1 | 52D3 | 9A50 | 6D6C | 6ABD | C88B | 468B |
| 0000066440 | 8B0E | 99DA | C103 | D313 | 5052 | 6C9A | FB6D | 8B6A |
| 0000066460 | 8BC8 | 1046 | DA8B | 0399 | 13C1 | 03D3 | 1806 | 1317 |
| 0000066500 | 1A16 | 0117 | EA46 | 5611 | 8DEC | 5044 | 4689 | 8BF8 |
| 0000066520 | 0846 | 8948 | F646 | 468B | 890C | F246 | 3E83 | 171C |
| 0000066540 | 7400 | 8D1A | EE46 | 5016 | 549A | 9A69 | 8368 | 04C4 |
| 0000066560 | C00B | 0974 | 6E81 | 10EA | 830E | EC5E | 8B00 | EA46 |
| 0000066600 | 568B | 5EEC | C95F | 90CB | 8B55 | 57EC | 7EC4 | 3306 |
| 0000066620 | B9C0 | FFFF | AEF2 | F741 | 4FD9 | 468A | FD0A | AEF2 |
| 0000066640 | 2647 | 0538 | 0674 | C033 | D08B | 04EB | C78B | C28C |
| 0000066660 | 5FFC | E58B | CB5D | 8B55 | 8BEC | 0E4E | 571E | E356 |
| 0000066700 | C548 | 0A76 | 7EC4 | 8B06 | 48C1 | D78B | D2F7 | C22B |
| 0000066720 | DB1B | C323 | C203 | D68B | D2F7 | C22B | DB1B | C323 |
| 0000066740 | C203 | 9140 | C12B | E9D1 | A5F3 | C913 | A4F3 | E391 |
| 0000066760 | 0B18 | 75F6 | 8C07 | 05D8 | 406D | D88E | FF0B | C775 |
| 0000067000 | C08C | 8805 | 8E6B | EBC0 | 8BBE | 0646 | 568B | 5E08 |
| 0000067020 | 1F5F | CB5D | 8B55 | 8BEC | 0C4E | 38E3 | C457 | 067E |
| 0000067040 | D78B | DAF7 | 0C74 | D12B | DB1B | D323 | D103 | D187 |
| 0000067060 | D12B | 468B | 8A0A | D1E0 | F3E9 | 13AB | F3C9 | 87AA |
| 0000067100 | E3D1 | 8C10 | 81C3 | 93C3 | 8E6B | D1C3 | F3E9 | 13AB |
| 0000067120 | F3C9 | 5FAA | 468B | 8B06 | 0856 | CB5D | 4E8B | 8B0E |
| 0000067140 | 0646 | 568B | 1E08 | 7EC5 | 570A | 071E | 93FC | C00A |
| 0000067160 | 1374 | F983 | 750A | 0B0E | 79D2 | B00A | AA2D | DBF7 |
| 0000067200 | D283 | F700 | 8BDA | 92F7 | D233 | C00B | 0274 | F1F7 |
| 0000067220 | F793 | 92F1 | D387 | 3004 | 393C | 0276 | 2704 | 8BAA |

THU MAR 14 17:44:14 1991 PR.DLL PAGE 31, LINE 1771

| | | | | | | | | |
|---|---|---|---|---|---|---|---|---|
| 0000067240 | 0BC2 | 75C3 | 88E2 | 4F05 | 86AC | 8805 | FF44 | 448D |
| 0000067260 | 3B01 | 72C7 | 8CF2 | 58DA | 5F1F | 8B5E | 5DE5 | 00CB |
| 0000067300 | 8B55 | FFEC | 0876 | 76FF | 3306 | 50C0 | 9A50 | FFFF |
| 0000067320 | 0000 | C085 | 0374 | 3AE9 | 8BD1 | 5DE5 | 00CB | 8B55 |
| 0000067340 | 1EEC | C553 | 065E | 76FF | FF0C | 0A76 | 77FF | FF02 |
| 0000067360 | 0E37 | E7E8 | 8900 | 8907 | 0257 | 1F5B | CA5D | 0008 |
| 0000067400 | 8B55 | 1EEC | C553 | 065E | 76FF | FF0C | 0A76 | 77FF |
| 0000067420 | FF02 | 0E37 | F7E8 | 8900 | 0257 | 0789 | 1F5B | CA5D |
| 0000067440 | 0008 | 8B55 | 1EEC | C553 | 065E | 078B | 578B | 8B02 |
| 0000067460 | 0A4E | E80E | 0178 | 0789 | 5789 | 5B02 | 5D1F | 06CA |
| 0000067500 | 0000 | 8B55 | 57EC | 5356 | FF33 | 468B | 0B08 | 7DC0 |
| 0000067520 | 4711 | 568B | F706 | F7D8 | 1DDA | 0000 | 4689 | 8908 |
| 0000067540 | 0656 | 468B | 0B0C | 7DC0 | 4711 | 568B | F70A | F7D8 |
| 0000067560 | 1DDA | 0000 | 4689 | 890C | 0A56 | C00B | 1575 | 4E8B |
| 0000067600 | 8B0A | 0846 | D233 | F1F7 | D88B | 468B | F706 | 8BF1 |
| 0000067620 | EBD3 | 8B38 | 8BD8 | 0A4E | 568B | 8B08 | 0646 | EBD1 |
| 0000067640 | D9D1 | EAD1 | D8D1 | DB0B | F475 | F1F7 | F08B | 66F7 |
| 0000067660 | 910C | 468B | F70A | 03E6 | 72D1 | 3B0C | 0856 | 0777 |
| 0000067700 | 0672 | 463B | 7606 | 4E01 | D233 | 4F96 | 0775 | DAF7 |
| 0000067720 | D8F7 | DA83 | 5B00 | 5F5E | CA5D | 0008 | 8B55 | 8BEC |
| 0000067740 | 0846 | 4E8B | 0B0C | 8BC8 | 0A4E | 0975 | 468B | F706 |
| 0000067760 | 5DE1 | 08CA | 5300 | E1F7 | D88B | 468B | F706 | 0C66 |
| 0000070000 | D803 | 468B | F706 | 03E1 | 5BD3 | CA5D | 0008 | 8B55 |
| 0000070020 | 53EC | 3357 | 8BFF | 0846 | C00B | 117D | 8B47 | 0656 |
| 0000070040 | D8F7 | DAF7 | 001D | 8900 | 0846 | 5689 | 8B06 | 0C46 |
| 0000070060 | C00B | 107D | 568B | F70A | F7D8 | 1DDA | 0000 | 4689 |
| 0000070100 | 890C | 0A56 | C00B | 1875 | 4E8B | 8B0A | 0846 | D233 |
| 0000070120 | F1F7 | 468B | F706 | 8BF1 | 33C2 | 4FD2 | 4379 | 48EB |
| 0000070140 | D88B | 4E8B | 8B0A | 0856 | 4688 | D106 | D1EB | D1D9 |
| 0000070160 | D1EA | 0BD8 | 75DB | F7F4 | 8BF1 | F7C8 | 0C66 | F791 |
| 0000070200 | 0A66 | D103 | 0C72 | 563B | 7708 | 7207 | 3B0B | 0646 |
| 0000070220 | 0676 | 462B | 1B0A | 0C56 | 462B | 1B06 | 0856 | 794F |
| 0000070240 | F707 | F7DA | 83D8 | 00DA | 5B5F | CA5D | 0008 | ED32 |
| 0000070260 | 06E3 | E0D1 | D2D1 | FAE2 | 00CB | 8B55 | 53EC | 8B56 |
| 0000070300 | 0C46 | C00B | 1575 | 4E8B | 8B0A | 0846 | D233 | F1F7 |
| 0000070320 | D88B | 468B | F706 | 8BF1 | EBD3 | 8B38 | 8BC8 | 0A5E |
| 0000070340 | 568B | 8B08 | 0646 | E9D1 | DBD1 | EAD1 | D8D1 | C90B |
| 0000070360 | F475 | F3F7 | F08B | 66F7 | 910C | 468B | F70A | 03E6 |
| 0000070400 | 72D1 | 3B0C | 0856 | 0777 | 0672 | 463B | 7606 | 4E01 |
| 0000070420 | D233 | 5E96 | 5D5B | 08CA | 0000 | 8B55 | 53EC | 468B |
| 0000070440 | 0B0C | 75C0 | 8B15 | 0A4E | 468B | 3308 | F7D2 | 8BF1 |
| 0000070460 | 0646 | F1F7 | C28B | D233 | 45EB | C88B | 5E8B | 8B0A |
| 0000070500 | 0856 | 468B | D106 | D1E9 | D1DB | D1EA | 0BD8 | 75C9 |
| 0000070520 | F7F4 | 8BF3 | F7C8 | 0C66 | F791 | 0A66 | D103 | 0C72 |
| 0000070540 | 563B | 7708 | 7207 | 3B0B | 0646 | 0676 | 462B | 1B0A |
| 0000070560 | 0C56 | 462B | 1B06 | 0856 | DAF7 | D3F7 | DA83 | 5B00 |
| 0000070600 | CA5D | 3608 | 0300 | 5002 | 0338 | 6B00 | 0200 | 4500 |
| 0000070620 | 016A | 0000 | 0500 | AB02 | 0337 | 2500 | 0200 | C500 |
| 0000070640 | 0260 | 0000 | 0300 | 3601 | 021D | 7A00 | 0200 | 5B00 |
| 0000070660 | 0360 | 0000 | 0300 | F401 | 013A | 0500 | 0300 | B001 |
| 0000070700 | 021F | 7E00 | 0300 | 6D01 | 0221 | 7F00 | 0300 | 8C01 |
| 0000070720 | 013A | 0700 | 0300 | 1801 | 0139 | 0800 | 0300 | 6301 |
| 0000070740 | 0158 | 8900 | 0300 | 9502 | 0337 | 7A00 | 0300 | 5201 |
| 0000070760 | 015A | 8A00 | 0500 | 4D02 | 0338 | 3300 | 0200 | 6B00 |
| 0000071000 | 055C | 0000 | 0300 | 3D01 | 0160 | 8C00 | 0300 | 5F01 |
| 0000071020 | 0160 | 8D00 | 0300 | F801 | 0222 | 8600 | 0300 | 1901 |
| 0000071040 | 0160 | 8E00 | 0300 | B101 | 0223 | 8700 | 0300 | 8F01 |
| 0000071060 | 021E | 8B00 | 0300 | CF01 | 0220 | 1000 | 0500 | D701 |
| 0000071100 | 016B | 8800 | 0300 | 1C01 | 0168 | 2100 | 0300 | 3201 |

THU MAR 14 17:44:14 1991 PR.DLL PAGE 32, LINE 1830

```
0000071120  015D  2200  0300  DF01  051C  0400  0300  CA01
0000071140  0160  2600  0300  6C01  0538  0700  0300  D001
0000071160  062A  0500  0300  0901  042C  1900  0300  BD01
0000071200  0729  0300  0300  AC01  0729  0400  0200  4A02
0000071220  0338  3300  0300  FD01  0158  3A00  0300  0301
0000071240  0220  B300  0300  1D01  0156  3B00  0300  B501
0000071260  062A  1400  0300  C901  051C  1C00  0300  5E01
0000071300  016C  3C00  0300  FD01  041B  2500  0300  F401
0000071320  0529  1F00  0300  E101  0156  4400  0300  BF01
0000071340  0427  2E00  0300  F401  0155  4600  0300  1501
0000071360  0157  4B00  0300  DE02  0337  3D00  0300  3D01
0000071400  0156  4D00  0300  6901  0139  5B00  0300  DB02
0000071420  0338  4C00  0300  2302  0322  5C00  0500  7F02
0000071440  0337  1700  0300  9901  041B  5800  0500  2900
0000071460  011D  DA00  001D  0000  0000  0000  0000  0000
0000071500  0000  0000  0200  0000  0000  0000  0000  0000
0000071520  0000  0000  0000  0000  0000  0000  0000  0000
*
0000071600  0000  0000  0200  0000  0000  0000  0000  0000
0000071620  0000  0000  0000  0000  0000  0000  0000  0000
*
0000071700  0000  0000  0200  0000  0000  0000  0000  0000
0000071720  0000  0000  0000  0000  0000  0000  0000  0000
*
0000072000  0000  0000  0200  0000  0000  0000  0000  0000
0000072020  0000  0000  0000  0000  534D  5220  6E75  542D
0000072040  6D69  2065  694C  7262  7261  2079  202D  6F43
0000072060  7970  6972  6867  2074  6328  2029  3931  3039
0000072100  202C  694D  7263  736F  666F  2074  6F43  7072
0000072120  0018  5F70  6669  632E  7000  2E72  0070  5F47
0000072140  5745  545F  4700  455F  5F57  0054  0042  0062
0000072160  0049  FFFF  0000  0000  5F70  7473  7261  5F74
0000072200  6572  6F70  7472  4700  455F  5F57  0054  5F47
0000072220  5745  545F  0000  5F70  6574  6D72  725F  7065
0000072240  726F  0074  5F47  5745  545F  4700  455F  5F57
0000072260  0054  7665  6E65  3D74  2520  3B64  7220  7365
0000072300  6C75  3D74  2520  0064  5F62  7261  7367  0000
0000072320  5F70  5F72  7665  6E65  0074  5F47  5745  545F
0000072340  4700  455F  5F57  0054  7325  5F5C  5F74  6572
0000072360  2E70  7665  0065  0072  6F63  6E75  3D74  2520
0000072400  0064  5F62  6564  7562  0067  6425  2520  2064
0000072420  7325  2520  2073  6425  2520  646C  2520  646C
0000072440  000A  6372  203D  6425  203B  6F63  6E75  3D74
0000072460  2520  0064  5F62  6564  7562  0067  5F70  6567
0000072500  5F74  6572  5F70  696C  7473  4700  455F  5F57
0000072520  0054  5F47  5745  545F  0000  5F70  5F71  7563
0000072540  7272  725F  7065  695F  0064  5F47  5745  545F
0000072560  4700  455F  5F57  0054  6574  7473  665F  6C75
0000072600  5F6C  616E  656D  203D  7325  6200  615F  6772
0000072620  0073  5F70  6975  6D5F  6B61  5F65  6572  6F70
0000072640  7472  0000  7070  725F  7065  632E  7000  2E72
0000072660  0070  5F47  5745  545F  4700  455F  5F57  0054
0000072700  7325  545C  0050  7325  255C  0073  545C  0050
0000072720  4F4C  4E47  4D41  0045  0194  01CE  019D  005E
0000072740  0001  0000  0000  0000  0000  0000  0000  0000
0000072760  0000  0000  0000  0000  0000  0000  0000  0000
*
0000073340  0000  0000  0000  0001  7070  615F  6464  725F
0000073360  7065  695F  0064  5F47  5745  545F  4700  455F
```

THU MAR 14 17:44:14 1991  PR.DLL  PAGE 33, LINE 1889

| | | | | | | | | |
|---|---|---|---|---|---|---|---|---|
| 0000073400 | 5F57 | 0054 | 0000 | 7070 | 665F | 6E69 | 5F64 | 6572 |
| 0000073420 | 0070 | 7325 | 5F5C | 5F74 | 6572 | 2E70 | 6468 | 0072 |
| 0000073440 | 7325 | 5F5C | 5F74 | 6572 | 2E70 | 7665 | 0065 | 0061 |
| 0000073460 | 0077 | 7325 | 255C | 0073 | 7325 | 5F5C | 5F74 | 6572 |
| 0000073500 | 2E70 | 6468 | 0072 | 0077 | 7325 | 0A20 | 2500 | 2073 |
| 0000073520 | 000A | 6C25 | 2064 | 000A | 7325 | 0A20 | 0A00 | 2500 |
| 0000073540 | 2064 | 000A | 6425 | 0A20 | 2500 | 2064 | 000A | 6425 |
| 0000073560 | 0A20 | 2500 | 646C | 0A20 | 2000 | 2D2D | 002D | 2D20 |
| 0000073600 | 2D2D | 2500 | 2064 | 6425 | 2520 | 2073 | 7325 | 2520 |
| 0000073620 | 2064 | 6C25 | 2064 | 6C25 | 0A64 | 2500 | 5C73 | 5054 |
| 0000073640 | 0000 | 7070 | 755F | 2E69 | 0063 | 7270 | 702E | 4700 |
| 0000073660 | 455F | 5F57 | 0054 | 5F47 | 5745 | 545F | 0000 | 0392 |
| 0000073700 | 03B4 | 039A | 01CA | 7570 | 725F | 7270 | 5F74 | 6C64 |
| 0000073720 | 0067 | 6548 | 706C | 6E20 | 746F | 7920 | 7465 | 6920 |
| 0000073740 | 706D | 656C | 656D | 746E | 6465 | 6900 | 746E | 6900 |
| 0000073760 | 746E | 0000 | 5F70 | 5F75 | 7277 | 7469 | 5F65 | 6F66 |
| 0000074000 | 6D72 | 6900 | 746E | 6900 | 746E | 0000 | 5F70 | 5F75 |
| 0000074020 | 7277 | 7469 | 5F65 | 6E65 | 7274 | 0079 | 7070 | 645F |
| 0000074040 | 676C | 632E | 7000 | 2E72 | 0070 | 4F4C | 4E47 | 4D41 |
| 0000074060 | 0045 | 6552 | 6F70 | 7472 | 0073 | 614E | 656D | 003A |
| 0000074100 | 754F | 7074 | 7475 | 4620 | 6C69 | 3A65 | 4600 | 6F72 |
| 0000074120 | 3A6D | 5400 | 3A6F | 4300 | 3A43 | 0000 | 040C | 0452 |
| 0000074140 | 0415 | 03B0 | 0000 | 0000 | 0000 | 0000 | 0000 | 0000 |
| 0000074160 | 0000 | 0000 | 0000 | 0000 | 0000 | 0000 | 0000 | 0000 |
| * | | | | | | | | |
| 0000075520 | 0000 | 0000 | 0003 | 2D2D | 002D | 0000 | 0000 | 0000 |
| 0000075540 | 0000 | 0000 | 0000 | 0000 | 0000 | 7473 | 7261 | 2D74 |
| 0000075560 | 7572 | 006E | 0000 | 0000 | 0000 | 0000 | 0000 | 7473 |
| 0000075600 | 706F | 722D | 6E75 | 0000 | 0000 | 0000 | 0000 | 0000 |
| 0000075620 | 0000 | 6C66 | 776F | 632D | 6168 | 676E | 0065 | 0000 |
| 0000075640 | 0000 | 0000 | 0000 | 6373 | 2D72 | 6163 | 7470 | 7275 |
| 0000075660 | 0065 | 0000 | 0000 | 0000 | 0000 | 6373 | 2D72 | 6576 |
| 0000075700 | 6972 | 7966 | 0000 | 0000 | 0000 | 0000 | 0000 | 7361 |
| 0000075720 | 6E79 | 0063 | 0000 | 0000 | 0000 | 0000 | 0000 | 0000 |
| 0000075740 | 0000 | 6163 | 6C6C | 742D | 7365 | 0074 | 0000 | 0000 |
| 0000075760 | 0000 | 0000 | 0000 | 6163 | 6C6C | 542D | 0050 | 0000 |
| 0000076000 | 0000 | 0000 | 0000 | 0000 | 0000 | 6163 | 6C6C | 542D |
| 0000076020 | 0043 | 0000 | 0000 | 0000 | 0000 | 0000 | 0000 | 6163 |
| 0000076040 | 6C6C | 662D | 6E75 | 0063 | 0000 | 0000 | 0000 | 0000 |
| 0000076060 | 0000 | 6572 | 7574 | 6E72 | 0000 | 0000 | 0000 | 0000 |
| 0000076100 | 0000 | 0000 | 0000 | 5054 | 722D | 7465 | 7275 | 006E |
| 0000076120 | 0000 | 0000 | 0000 | 0000 | 0000 | 4354 | 722D | 7465 |
| 0000076140 | 7275 | 006E | 0000 | 0000 | 0000 | 0000 | 0000 | 7566 |
| 0000076160 | 636E | 722D | 7465 | 7275 | 006E | 0000 | 0000 | 0000 |
| 0000076200 | 0000 | 6573 | 2D74 | 6966 | 746C | 7265 | 0000 | 0000 |
| 0000076220 | 0000 | 0000 | 0000 | 6572 | 6573 | 2D74 | 6966 | 746C |
| 0000076240 | 7265 | 0000 | 0000 | 0000 | 0000 | 5553 | 2D54 | 7265 |
| 0000076260 | 6F72 | 0072 | 0000 | 0000 | 0000 | 0000 | 0000 | 3154 |
| 0000076300 | 3332 | 652D | 7272 | 726F | 0000 | 0000 | 0000 | 0000 |
| 0000076320 | 0000 | 6E69 | 6574 | 6E72 | 6C61 | 0000 | 0000 | 0000 |
| 0000076340 | 0000 | 0000 | 0000 | 6E75 | 6E6B | 776F | 006E | 0000 |
| 0000076360 | 0000 | 0000 | 0000 | 0000 | 0000 | 2D2D | 002D | 0000 |
| 0000076400 | 0000 | 0000 | 0000 | 0000 | 0000 | 0000 | 0000 | 4B4F |
| 0000076420 | 0000 | 0000 | 0000 | 0000 | 0000 | 0000 | 0000 | 0000 |
| 0000076440 | 0000 | 7572 | 006E | 0000 | 0000 | 0000 | 0000 | 0000 |
| 0000076460 | 0000 | 0000 | 0000 | 7473 | 706F | 0000 | 0000 | 0000 |
| 0000076500 | 0000 | 0000 | 0000 | 0000 | 0000 | 6E65 | 2D64 | 666F |
| 0000076520 | 742D | 7365 | 0074 | 0000 | 0000 | 0000 | 0000 | 6F63 |
| 0000076540 | 746E | 6E69 | 6575 | 0000 | 0000 | 0000 | 0000 | 0000 |

THU MAR 14 17:44:14 1991 PR.DLL PAGE 34, LINE 1948

| | | | | | | | | |
|---|---|---|---|---|---|---|---|---|
| 0000076560 | 0000 | 6E61 | 6D69 | 7461 | 0065 | 0000 | 0000 | 0000 |
| 0000076600 | 0000 | 0000 | 0000 | 7473 | 7065 | 0000 | 0000 | 0000 |
| 0000076620 | 0000 | 0000 | 0000 | 0000 | 0000 | 7473 | 7065 | 692D |
| 0000076640 | 746E | 006F | 0000 | 0000 | 0000 | 0000 | 0000 | 6170 |
| 0000076660 | 7375 | 0065 | 0000 | 0000 | 0000 | 0000 | 0000 | 0000 |
| 0000076700 | 0000 | 7375 | 7265 | 612D | 6F62 | 7472 | 0000 | 0000 |
| 0000076720 | 0000 | 0000 | 0000 | 3154 | 3332 | 732D | 6F74 | 0070 |
| 0000076740 | 0000 | 0000 | 0000 | 0000 | 0000 | 7973 | 746E | 7861 |
| 0000076760 | 652D | 7272 | 726F | 0000 | 0000 | 0000 | 0000 | 696D |
| 0000077000 | 6D73 | 7461 | 6863 | 0000 | 0000 | 0000 | 0000 | 0000 |
| 0000077020 | 0000 | 6F6E | 722D | 7365 | 6F70 | 736E | 0065 | 0000 |
| 0000077040 | 0000 | 0000 | 0000 | 6F6E | 732D | 6174 | 6962 | 696C |
| 0000077060 | 7974 | 0000 | 0000 | 0000 | 0000 | 7973 | 636E | 652D |
| 0000077100 | 7272 | 726F | 0000 | 0000 | 0000 | 0000 | 0000 | 7274 |
| 0000077120 | 6361 | 2D6B | 7265 | 6F72 | 0072 | 0000 | 0000 | 0000 |
| 0000077140 | 0000 | 6F6E | 2D74 | 6F66 | 6E75 | 0064 | 0000 | 0000 |
| 0000077160 | 0000 | 0000 | 0000 | 6E75 | 6E6B | 776F | 006E | 0000 |
| 0000077200 | 0000 | 0000 | 0000 | 0000 | 0000 | 5F47 | 5745 | 545F |
| 0000077220 | 4700 | 455F | 5F57 | 0054 | 706F | 635F | 646F | 3D65 |
| 0000077240 | 2520 | 0064 | 5F62 | 7261 | 7367 | 2500 | 5C73 | 5054 |
| 0000077260 | 2500 | 5C73 | 745F | 725F | 7065 | 742E | 706D | 4500 |
| 0000077300 | 6578 | 7563 | 6974 | 6E6F | 5600 | 7265 | 6669 | 6369 |
| 0000077320 | 7461 | 6F69 | 006E | 6D49 | 6761 | 7365 | 2500 | 2073 |
| 0000077340 | 2D20 | 2020 | 7325 | 5220 | 7065 | 726F | 0074 | 7570 |
| 0000077360 | 645F | 676C | 7700 | 2500 | 5C73 | 745F | 725F | 7065 |
| 0000077400 | 682E | 7264 | 7200 | 2500 | 5C73 | 745F | 725F | 7065 |
| 0000077420 | 652E | 6576 | 7200 | 0A00 | 5409 | 3A6F | 0909 | 7325 |
| 0000077440 | 000A | 4609 | 6F72 | 3A6D | 2509 | 0A73 | 0900 | 4343 |
| 0000077460 | 093A | 2509 | 0A73 | 000A | 4409 | 7461 | 3A65 | 2509 |
| 0000077500 | 0A73 | 4500 | 6578 | 7563 | 6974 | 6E6F | 5600 | 7265 |
| 0000077520 | 6669 | 6369 | 7461 | 6F69 | 006E | 6D49 | 6761 | 7365 |
| 0000077540 | 0A00 | 090A | 5309 | 6275 | 656A | 7463 | 203A | 2020 |
| 0000077560 | 6554 | 7473 | 2520 | 2073 | 6552 | 6F70 | 7472 | 000A |
| 0000077600 | 0909 | 2D2D | 2D2D | 2D2D | 2D2D | 2D2D | 2D2D | 2D2D |
| 0000077620 | 2D2D | 7325 | 2D2D | 2D2D | 2D2D | 0A2D | 0A0A | 2500 |
| 0000077640 | 0073 | 545C | 0050 | 6554 | 7473 | 6E20 | 6D61 | 3A65 |
| 0000077660 | 0909 | 0909 | 7325 | 000A | 6554 | 7473 | 5220 | 7365 |
| 0000077700 | 6C75 | 7374 | 6E20 | 6D61 | 3A65 | 0909 | 7325 | 000A |
| 0000077720 | 6C25 | 0064 | 6144 | 6574 | 093A | 0909 | 0909 | 7325 |
| 0000077740 | 000A | 704F | 7265 | 7461 | 726F | 6E20 | 6D61 | 3A65 |
| 0000077760 | 0909 | 2509 | 0A73 | 000A | 704F | 7265 | 7461 | 726F |
| 0000100000 | 6E20 | 746F | 7365 | 0A3A | 0A00 | 0A0A | 5309 | 6D75 |
| 0000100020 | 616D | 7972 | 0A3A | 0900 | 2D2D | 2D2D | 2D2D | 2D2D |
| 0000100040 | 0A0A | 2500 | 0064 | 0909 | 7250 | 636F | 7365 | 2073 |
| 0000100060 | 6574 | 6D72 | 6E69 | 7461 | 6F69 | 3A6E | 0909 | 0909 |
| 0000100100 | 7325 | 0A0A | 0900 | 5409 | 746F | 6C61 | 6E20 | 6D75 |
| 0000100120 | 6562 | 2072 | 666F | 6320 | 6568 | 6B63 | 6465 | 7320 |
| 0000100140 | 7263 | 6565 | 736E | 093A | 7325 | 000A | 0909 | 754E |
| 0000100160 | 626D | 7265 | 6F20 | 2066 | 6564 | 6574 | 7463 | 6465 |
| 0000100200 | 6D20 | 7369 | 616D | 6374 | 6568 | 3A73 | 0909 | 7325 |
| 0000100220 | 000A | 6425 | 2520 | 2064 | 7325 | 2520 | 2073 | 6425 |
| 0000100240 | 2520 | 646C | 2520 | 646C | 000A | 2D25 | 6436 | 7325 |
| 0000100260 | 2520 | 2073 | 7325 | 2520 | 2073 | 2028 | 7325 | 2920 |
| 0000100300 | 2520 | 0A73 | 0900 | 4609 | 7269 | 7473 | 6D20 | 7369 |
| 0000100320 | 616D | 6374 | 3A68 | 090A | 0909 | 7325 | 000A | 0909 |
| 0000100340 | 6946 | 7372 | 2074 | 696D | 6D73 | 7461 | 6863 | 203A |
| 0000100360 | 6F4E | 656E | 0A0A | 2500 | 646C | 0900 | 5009 | 6F72 |
| 0000100400 | 6563 | 7373 | 6420 | 7275 | 7461 | 6F69 | 206E | 6974 |
| 0000100420 | 656D | 093A | 0909 | 2509 | 0A73 | 000A | 090A | 6F4E |

THU MAR 14 17:44:14 1991 PR.DLL PAGE 35, LINE 2007

| | | | | | | | | |
|---|---|---|---|---|---|---|---|---|
| 0000100440 | 6574 | 093A | 6854 | 2065 | 6572 | 6F70 | 7472 | 6920 |
| 0000100460 | 2073 | 6F6E | 2074 | 6F63 | 706D | 656C | 6574 | 0A2E |
| 0000100500 | 0900 | 0909 | 6854 | 2065 | 6568 | 6461 | 7265 | 7320 |
| 0000100520 | 6365 | 6974 | 6E6F | 6920 | 2073 | 6F6E | 2074 | 7270 |
| 0000100540 | 646F | 6375 | 6465 | 0A2C | 0900 | 0909 | 7361 | 7420 |
| 0000100560 | 6568 | 7420 | 7365 | 2074 | 7369 | 7020 | 6F72 | 6162 |
| 0000100600 | 6C62 | 2079 | 7473 | 6C69 | 206C | 7865 | 6365 | 7475 |
| 0000100620 | 6E69 | 2E67 | 000A | 0A0A | 4409 | 7465 | 6961 | 656C |
| 0000100640 | 2064 | 6552 | 7573 | 746C | 2073 | 6544 | 6373 | 6972 |
| 0000100660 | 7470 | 6F69 | 0A6E | 0900 | 2D2D | 2D2D | 2D2D | 2D2D |
| 0000100700 | 2D2D | 2D2D | 2D2D | 2D2D | 2D2D | 2D2D | 2D2D | 2D2D |
| 0000100720 | 2D2D | 2D2D | 0A0A | 2000 | 2023 | 2020 | 2020 | 7645 |
| 0000100740 | 6E65 | 2074 | 2020 | 2020 | 2020 | 2020 | 6552 | 7573 |
| 0000100760 | 746C | 2020 | 2020 | 2020 | 2020 | 614E | 656D | 2020 |
| 0000101000 | 2020 | 2020 | 2020 | 2020 | 6554 | 7473 | 2020 | 2020 |
| 0000101020 | 2020 | 2020 | 4C20 | 6E69 | 2065 | 2020 | 6954 | 656D |
| 0000101040 | 2020 | 0A20 | 2D00 | 2D2D | 202D | 2D20 | 2D2D | 2D2D |
| 0000101060 | 2D2D | 2D2D | 2D2D | 202D | 2D20 | 2D2D | 2D2D | 2D2D |
| 0000101100 | 2D2D | 2D2D | 202D | 2D20 | 2D2D | 2D2D | 2D2D | 2D2D |
| 0000101120 | 2D2D | 202D | 2D20 | 2D2D | 2D2D | 2D2D | 2D2D | 2D2D |
| 0000101140 | 202D | 2D20 | 2D2D | 2D2D | 2020 | 2D2D | 2D2D | 2D2D |
| 0000101160 | 2D2D | 0A0A | 2500 | 2064 | 6425 | 2520 | 2073 | 7325 |
| 0000101200 | 2520 | 2064 | 6C25 | 2064 | 6C25 | 0A64 | 2500 | 362D |
| 0000101220 | 2564 | 312D | 7334 | 2D25 | 3431 | 2573 | 312D | 7334 |
| 0000101240 | 2D25 | 3431 | 2573 | 352D | 2073 | 2520 | 0A73 | 5C00 |
| 0000101260 | 5054 | 2500 | 0064 | 2D2D | 002D | 3025 | 6C32 | 3A64 |
| 0000101300 | 3025 | 6C32 | 3A64 | 3025 | 6C32 | 0064 | 5F47 | 5745 |
| 0000101320 | 545F | 4700 | 455F | 5F57 | 0054 | 7265 | 5F72 | 6F63 |
| 0000101340 | 6564 | 203D | 6425 | 6200 | 615F | 6772 | 0073 | 7570 |
| 0000101360 | 645F | 7369 | 5F70 | 7265 | 5F72 | 736D | 0067 | 0000 |
| 0000101400 | 0000 | 0000 | 0006 | 0000 | 37C0 | 37BF | 0000 | 0005 |
| 0000101420 | 0000 | 0000 | 0000 | 0000 | 0000 | 0000 | 0000 | 0000 |
| 0000101440 | 435F | 465F | 4C49 | 5F45 | 4E49 | 4F46 | 003D | 0001 |
| 0000101460 | FFFF | 0000 | 0000 | 0000 | 0000 | 0000 | 0000 | 0000 |
| 0000101500 | 0000 | 0000 | 0001 | 8101 | 8181 | 0000 | 0000 | 0000 |
| 0000101520 | 0000 | 0000 | 0000 | 0000 | 0000 | 0000 | 0000 | 0000 |
| * | | | | | | | | |
| 0000102100 | 0000 | 0000 | 0000 | 0A00 | 0A0A | 0A0A | 0A0A | 0A0A |
| 0000102120 | 0A0A | 0A0A | 0A0A | 0A0A | 0A0A | 0A0A | 0A0A | 0A0A |
| * | | | | | | | | |
| 0000102500 | 0A0A | 0A0A | 0A0A | 000A | 0000 | 0000 | 0000 | 0000 |
| 0000102520 | 0000 | 0000 | 0000 | 0000 | FF00 | 00FF | 0000 | 0000 |
| 0000102540 | FFFF | FFFF | 005C | 005C | 0000 | 0000 | 1162 | 0000 |
| 0000102560 | 0000 | FFFF | 0001 | 0000 | 0000 | 0000 | 0000 | 0000 |
| 0000102600 | 0102 | 0000 | 0000 | 0000 | 0000 | 0000 | 0202 | 0000 |
| 0000102620 | 0000 | 0000 | 0000 | 0000 | 0000 | 0000 | 0000 | 0000 |
| * | | | | | | | | |
| 0000103500 | 0000 | 0000 | 0000 | 0000 | 0000 | 0001 | 0200 | 0000 |
| 0000103520 | 0000 | 0000 | 0000 | 0000 | 0000 | 0000 | 0000 | 0000 |
| * | | | | | | | | |
| 0000104440 | 0000 | 0000 | 0000 | 0000 | 0000 | 132E | 044E | 0000 |
| 0000104460 | 0000 | 0000 | 0000 | 0920 | 0D2D | 005D | 005D | 0006 |
| 0000104500 | 0600 | 0100 | 0000 | 0010 | 0603 | 0600 | 1002 | 4504 |
| 0000104520 | 4545 | 0505 | 0505 | 3505 | 0030 | 0050 | 0000 | 2000 |
| 0000104540 | 3020 | 5850 | 0807 | 3000 | 3030 | 5057 | 0007 | 2000 |
| 0000104560 | 0020 | 0000 | 0000 | 6008 | 6060 | 6060 | 0060 | 7000 |
| 0000104600 | 7870 | 7878 | 0878 | 0807 | 0000 | 0007 | 0808 | 0008 |
| 0000104620 | 0800 | 0800 | 0000 | 2808 | 756E | 6C6C | 0629 | 0000 |
| 0000104640 | 0000 | 0000 | 0000 | 0000 | 0000 | 0000 | 0000 | 0003 |

THU MAR 14 17:44:14 1991 PR.DLL PAGE 36, LINE 2066

| | | | | | | | | |
|---|---|---|---|---|---|---|---|---|
| 0000104660 | 2000 | 3BB0 | 1772 | 3BB0 | 15A4 | 3BB0 | 15A8 | 3BB0 |
| 0000104700 | 15AC | 3BB0 | 15B0 | 3BB0 | 15B4 | 0000 | 0000 | 0101 |
| 0000104720 | 2000 | 2020 | 2020 | 2020 | 2020 | 2828 | 2828 | 2028 |
| 0000104740 | 2020 | 2020 | 2020 | 2020 | 2020 | 2020 | 2020 | 2020 |
| 0000104760 | 4820 | 1010 | 1010 | 1010 | 1010 | 1010 | 1010 | 1010 |
| 0000105000 | 8410 | 8484 | 8484 | 8484 | 8484 | 1084 | 1010 | 1010 |
| 0000105020 | 1010 | 8181 | 8181 | 8181 | 0101 | 0101 | 0101 | 0101 |
| 0000105040 | 0101 | 0101 | 0101 | 0101 | 0101 | 0101 | 1010 | 1010 |
| 0000105060 | 1010 | 8282 | 8282 | 8282 | 0202 | 0202 | 0202 | 0202 |
| 0000105100 | 0202 | 0202 | 0202 | 0202 | 0202 | 0202 | 1010 | 1010 |
| 0000105120 | 0020 | 0000 | 0000 | 0000 | 0000 | 0000 | 0000 | 0000 |
| 0000105140 | 0000 | 0000 | 0000 | 0000 | 0000 | 0000 | 0000 | 0000 |
| * | | | | | | | | |
| 0000105320 | 0000 | 0000 | 0003 | FFFF | 001E | 003B | 005A | 0078 |
| 0000105340 | 0097 | 00B5 | 00D4 | 00F3 | 0111 | 0130 | 014E | 016D |
| 0000105360 | FFFF | 001E | 003A | 0059 | 0077 | 0096 | 00B4 | 00D3 |
| 0000105400 | 00F2 | 0110 | 012F | 014D | 016C | 0000 | 0000 | 0000 |
| 0000105420 | 0000 | 0000 | 0000 | 0000 | 0000 | 0000 | 5A54 | 0000 |
| 0000105440 | 5350 | 0054 | 4450 | 0054 | 7080 | 0000 | 0001 | 1710 |
| 0000105460 | 1724 | 1714 | 1784 | 7553 | 4D6E | 6E6F | 7554 | 5765 |
| 0000105500 | 6465 | 6854 | 4675 | 6972 | 6153 | 0074 | 614A | 466E |
| 0000105520 | 6265 | 614D | 4172 | 7270 | 614D | 4A79 | 6E75 | 754A |
| 0000105540 | 416C | 6775 | 6553 | 4F70 | 7463 | 6F4E | 4476 | 6365 |
| 0000105560 | 0000 | 0000 | 0000 | 0000 | 0000 | 0000 | 0000 | 0000 |
| 0000105600 | 4600 | FFFF | FFFF | FFFF | 1774 | 1776 | 1778 | 177A |
| 0000105620 | 177C | 177E | 151C | 3C3C | 4D4E | 4753 | 3E3E | 0000 |
| 0000105640 | 3652 | 3030 | 0D30 | 2D0A | 7320 | 6174 | 6B63 | 6F20 |
| 0000105660 | 6576 | 6672 | 6F6C | 0D77 | 000A | 0003 | 3652 | 3030 |
| 0000105700 | 0D33 | 2D0A | 6920 | 746E | 6765 | 7265 | 6420 | 7669 |
| 0000105720 | 6469 | 2065 | 7962 | 3020 | 0A0D | 0800 | 5200 | 3036 |
| 0000105740 | 3830 | 0A0D | 202D | 6F6E | 2074 | 6E65 | 756F | 6867 |
| 0000105760 | 7320 | 6170 | 6563 | 6620 | 726F | 6120 | 6772 | 6D75 |
| 0000106000 | 6E65 | 7374 | 0A0D | 0900 | 5200 | 3036 | 3930 | 0A0D |
| 0000106020 | 202D | 6F6E | 2074 | 6E65 | 756F | 6867 | 7320 | 6170 |
| 0000106040 | 6563 | 6620 | 726F | 6520 | 766E | 7269 | 6E6F | 656D |
| 0000106060 | 746E | 0A0D | FC00 | 0D00 | 000A | 00FF | 7572 | 2D6E |
| 0000106100 | 6974 | 656D | 6520 | 7272 | 726F | 0020 | 0002 | 3652 |
| 0000106120 | 3030 | 0D32 | 2D0A | 6620 | 6F6C | 7461 | 6E69 | 2D67 |
| 0000106140 | 6F70 | 6E69 | 2074 | 7573 | 7070 | 726F | 2074 | 6F6E |
| 0000106160 | 2074 | 6F6C | 6461 | 6465 | 0A0D | 1100 | 5200 | 3036 |
| 0000106200 | 3731 | 0A0D | 202D | 6E75 | 7865 | 6570 | 7463 | 6465 |
| 0000106220 | 6D20 | 6C75 | 6974 | 6874 | 6572 | 6461 | 6C20 | 636F |
| 0000106240 | 206B | 7265 | 6F72 | 0D72 | 000A | 0010 | 3652 | 3130 |
| 0000106260 | 0D36 | 2D0A | 6E20 | 746F | 6520 | 6F6E | 6775 | 2068 |
| 0000106300 | 7073 | 6361 | 2065 | 6F66 | 2072 | 6874 | 6572 | 6461 |
| 0000106320 | 6420 | 7461 | 0D61 | 000A | FFFF | 05FF | 0200 | B800 |
| 0000106340 | 0115 | 0000 | 0200 | 5C00 | 0411 | 0000 | 0200 | 2000 |
| 0000106360 | 0517 | 0000 | 0200 | 8002 | 0317 | 1700 | 0200 | 8202 |
| 0000106400 | 0317 | 2500 | 4E00 | 3042 | EC32 | 0082 | 0100 | 0000 |
| 0000106420 | 7500 | 000D | 0000 | 0100 | 1900 | 745C | 3231 | 5C33 |
| 0000106440 | 7061 | 5C70 | 7270 | 6F5C | 6A62 | 705C | 695F | 2E66 |
| 0000106460 | 626F | 016A | 7600 | A60D | 000E | 0000 | 0100 | 1B00 |
| 0000106500 | 745C | 3231 | 5C33 | 7061 | 5C70 | 7270 | 6F5C | 6A62 |
| 0000106520 | 705C | 5F70 | 6572 | 2E70 | 626F | 016A | 1C00 | E91C |
| 0000106540 | 0007 | 0000 | 0100 | 1A00 | 745C | 3231 | 5C33 | 7061 |
| 0000106560 | 5C70 | 7270 | 6F5C | 6A62 | 705C | 5F70 | 6975 | 6F2E |
| 0000106600 | 6A62 | 0001 | 2406 | 14F6 | 0000 | 0000 | 0001 | 5C1B |
| 0000106620 | 3174 | 3332 | 615C | 7070 | 705C | 5C72 | 626F | 5C6A |
| 0000106640 | 7070 | 645F | 676C | 6F2E | 6A62 | 0001 | 390C | 00D1 |

THU MAR 14 17:44:14 1991 PR.DLL PAGE 37, LINE 2125

| | | | | | | | | |
|---|---|---|---|---|---|---|---|---|
| 0000106660 | 0000 | 0001 | 0001 | 640B | 6C6C | 635C | 7573 | 612E |
| 0000106700 | 6D73 | 0001 | 39DE | 01AF | 0000 | 0001 | 0001 | 640E |
| 0000106720 | 6C6C | 635C | 7573 | 6164 | 2E74 | 7361 | 016D | 8E00 |
| 0000106740 | 223B | 0000 | 0100 | 0100 | 0F00 | 736F | 5C32 | 7263 |
| 0000106760 | 3074 | 736D | 2E67 | 7361 | 016D | B000 | 063B | 0000 |
| 0000107000 | 0100 | 0100 | 0A00 | 7263 | 3074 | 7066 | 612E | 6D73 |
| 0000107020 | 0001 | 3BB6 | 001A | 0000 | 0001 | 0001 | 630A | 6B68 |
| 0000107040 | 7473 | 2E6B | 7361 | 016D | D000 | 083B | 0001 | 0100 |
| 0000107060 | 0100 | 0D00 | 6C64 | 5C6C | 6573 | 6574 | 766E | 2E70 |
| 0000107100 | 0163 | D800 | 653C | 0000 | 0100 | 0100 | 0F00 | 736F |
| 0000107120 | 5C32 | 6D6E | 6773 | 6468 | 2E72 | 7361 | 016D | 3E00 |
| 0000107140 | C03D | 0000 | 0100 | 0100 | 0E00 | 736F | 5C32 | 6F64 |
| 0000107160 | 7273 | 7465 | 612E | 6D73 | 0001 | 3DFE | 0102 | 000U |
| 0000107200 | 0001 | 0001 | 6608 | 6C63 | 736F | 2E65 | 0163 | 0000 |
| 0000107220 | 6A3F | 0000 | 0100 | 0100 | 0700 | 6F66 | 6570 | 2E6E |
| 0000107240 | 0163 | 6A00 | 5A3F | 0000 | 0100 | 0100 | 0900 | 7066 |
| 0000107260 | 6972 | 746E | 2E66 | 0163 | C400 | D13F | 0001 | 0100 |
| 0000107300 | 0100 | 0A00 | 7766 | 6972 | 6574 | 612E | 6D73 | 0000 |
| 0000107320 | 0000 | 0000 | 0000 | 0001 | 0000 | 5F0B | 6663 | 756C |
| 0000107340 | 6873 | 612E | 6D73 | 0000 | 0000 | 0000 | 0000 | 0001 |
| 0000107360 | 0000 | 5F07 | 6966 | 656C | 632E | 0001 | 4196 | 009C |
| 0000107400 | 0000 | 0001 | 0001 | 5F0B | 6966 | 626C | 6675 | 612E |
| 0000107420 | 6D73 | 0001 | 4232 | 00E5 | 0000 | 0001 | 0001 | 5F0B |
| 0000107440 | 6C66 | 6273 | 6675 | 612E | 6D73 | 0001 | 4318 | 0037 |
| 0000107460 | 0000 | 0001 | 0001 | 5F0C | 7266 | 6565 | 7562 | 2E66 |
| 0000107500 | 7361 | 016D | 5300 | 4B43 | 0000 | 0100 | 0100 | 0B0D |
| 0000107520 | 675F | 7465 | 7562 | 2E66 | 7361 | 016D | 9C00 | F243 |
| 0000107540 | 0000 | 0100 | 0100 | 0700 | 6F5F | 6570 | 2E6E | 0163 |
| 0000107560 | 8E00 | C044 | 0000 | 0100 | 0100 | 0B00 | 735F | 7466 |
| 0000107600 | 7562 | 2E66 | 7361 | 016D | 4E00 | 2E45 | 0001 | 0100 |
| 0000107620 | 0100 | 0800 | 6666 | 756C | 6873 | 632E | 0001 | 467C |
| 0000107640 | 082A | 0000 | 0001 | 0001 | 6907 | 706E | 7475 | 632E |
| 0000107660 | 0001 | 4EA6 | 04FA | 0000 | 0001 | 0001 | 6F0A | 7475 |
| 0000107700 | 7570 | 2E74 | 7361 | 016D | A000 | 7853 | 0000 | 0100 |
| 0000107720 | 0100 | 0800 | 7473 | 6572 | 6D61 | 632E | 0001 | 5418 |
| 0000107740 | 00AA | 0000 | 0001 | 0001 | 7508 | 676E | 7465 | 2E63 |
| 0000107760 | 0163 | C200 | 3F54 | 0000 | 0100 | 0100 | 0D00 | 736F |
| 0000110000 | 5C32 | 6C63 | 736F | 2E65 | 7361 | 016D | 0200 | 7755 |
| 0000110020 | 0000 | 0100 | 0100 | 0D00 | 736F | 5C32 | 736C | 6565 |
| 0000110040 | 2E6B | 7361 | 016D | 7A00 | DD55 | 0001 | 0100 | 0100 |
| 0000110060 | 0C00 | 736F | 5C32 | 706F | 6E65 | 612E | 6D73 | 0001 |
| 0000110100 | 5758 | 015D | 0000 | 0001 | 0001 | 6F0C | 3273 | 725C |
| 0000110120 | 6165 | 2E64 | 7361 | 016D | B600 | DD58 | 0001 | 0100 |
| 0000110140 | 0100 | 0900 | 7277 | 7469 | 2E65 | 7361 | 006D | 0000 |
| 0000110160 | 0000 | 0000 | 0100 | 0000 | 0B00 | 7874 | 6D74 | 646F |
| 0000110200 | 2E65 | 7361 | 016D | 9400 | 0A5A | 0000 | 0100 | 0100 |
| 0000110220 | 0A00 | 616D | 6C6C | 636F | 612E | 6D73 | 0001 | 5A9E |
| 0000110240 | 000A | 0000 | 0001 | 0001 | 6608 | 6572 | 2E65 | 7361 |
| 0000110260 | 016D | A800 | AF5A | 0000 | 0100 | 0100 | 0B00 | 6D66 |
| 0000110300 | 6C61 | 6F6C | 2E63 | 7361 | 006D | 0000 | 0000 | 0000 |
| 0000110320 | 0100 | 0000 | 0900 | 6466 | 7461 | 2E61 | 7361 | 016D |
| 0000110340 | 5800 | 345B | 0000 | 0100 | 0100 | 0B00 | 6E69 | 7469 |
| 0000110360 | 6573 | 2E67 | 7361 | 016D | 8C00 | 365B | 0000 | 0100 |
| 0000110400 | 0100 | 0B00 | 696C | 6B6E | 6573 | 2E67 | 7361 | 016D |
| 0000110420 | C200 | 7C5B | 0000 | 0100 | 0100 | 0C00 | 6573 | 7261 |
| 0000110440 | 6863 | 6773 | 612E | 6D73 | 0001 | 5C3E | 00E2 | 0000 |
| 0000110460 | 0001 | 0001 | 670B | 6F72 | 7377 | 6765 | 612E | 6D73 |
| 0000110500 | 0001 | 5D20 | 0031 | 0000 | 0001 | 0001 | 6E0A | 7765 |
| 0000110520 | 6573 | 2E67 | 7361 | 016D | 5200 | 465D | 0000 | 0100 |

THU MAR 14 17:44:14 1991 PR.DLL PAGE 38, LINE 2184

| | | | | | | | | |
|---|---|---|---|---|---|---|---|---|
| 0000110540 | 0100 | 0A00 | 7473 | 6372 | 7461 | 612E | 6D73 | 0001 |
| 0000110560 | 5D98 | 0036 | 0000 | 0001 | 0001 | 730A | 7274 | 7063 |
| 0000110600 | 2E79 | 7361 | 016D | CE00 | 295D | 0000 | 0100 | 0100 |
| 0000110620 | 0A00 | 7473 | 6372 | 706D | 612E | 6D73 | 0001 | 5DF8 |
| 0000110640 | 0017 | 0000 | 0001 | 0001 | 730A | 7274 | 656C | 2E6E |
| 0000110660 | 7361 | 016D | 1000 | 2A5E | 0000 | 0100 | 0100 | 0B00 |
| 0000110700 | 7473 | 6E72 | 7063 | 2E79 | 7361 | 016D | 3A00 | 3B5E |
| 0000110720 | 0000 | 0100 | 0100 | 0B00 | 7473 | 6E72 | 6D63 | 2E70 |
| 0000110740 | 7361 | 016D | 7600 | 035E | 0000 | 0100 | 0100 | 0800 |
| 0000110760 | 7461 | 6C6F | 612E | 6D73 | 0001 | 5E7A | 0056 | 0000 |
| 0000111000 | 0001 | 0001 | 6108 | 6F74 | 2E78 | 7361 | 016D | D000 |
| 0000111020 | 1C5E | 0000 | 0100 | 0100 | 0800 | 7469 | 616F | 612E |
| 0000111040 | 6D73 | 0001 | 5EEC | 0022 | 0000 | 0001 | 0001 | 7409 |
| 0000111060 | 6C6F | 776F | 7265 | 632E | 0001 | 5F0E | 0022 | 0000 |
| 0000111100 | 0001 | 0001 | 7409 | 756F | 7070 | 7265 | 632E | 0000 |
| 0000111120 | 0000 | 0000 | 0000 | 0001 | 0000 | 630C | 696D | 6373 |
| 0000111140 | 6164 | 2E74 | 7361 | 006D | 0000 | 0000 | 0000 | 0100 |
| 0000111160 | 0000 | 0900 | 7463 | 7079 | 2E65 | 7361 | 016D | 3000 |
| 0000111200 | A65F | 0000 | 0100 | 0100 | 0800 | 6567 | 6574 | 766E |
| 0000111220 | 632E | 0001 | 5FD6 | 00BA | 0000 | 0001 | 0001 | 6F0D |
| 0000111240 | 3273 | 6D5C | 6F6C | 6B63 | 612E | 6D73 | 0001 | 6090 |
| 0000111260 | 007A | 0000 | 0001 | 0001 | 6410 | 6C6C | 745C | 6469 |
| 0000111300 | 6174 | 6C62 | 2E65 | 7361 | 016D | 0A00 | 9561 | 0000 |
| 0000111320 | 0100 | 0100 | 0900 | 6766 | 7465 | 2E73 | 7361 | 016D |
| 0000111340 | A000 | 7C61 | 0000 | 0100 | 0100 | 0700 | 7066 | 7475 |
| 0000111360 | 2E73 | 0163 | 1C00 | 6262 | 0000 | 0100 | 0100 | 0800 |
| 0000111400 | 6572 | 6977 | 646E | 632E | 0001 | 627E | 0074 | 0000 |
| 0000111420 | 0001 | 0001 | 7309 | 7270 | 6E69 | 6674 | 632E | 0001 |
| 0000111440 | 62F2 | 005C | 0000 | 0001 | 0001 | 7308 | 6373 | 6E61 |
| 0000111460 | 2E66 | 0163 | 4E00 | 2E63 | 0000 | 0100 | 0100 | 0A00 |
| 0000111500 | 6163 | 6C6C | 636F | 612E | 6D73 | 0001 | 637C | 019C |
| 0000111520 | 0000 | 0001 | 0001 | 6109 | 6373 | 6974 | 656D | 632E |
| 0000111540 | 0001 | 6518 | 002E | 0000 | 0001 | 0001 | 6307 | 6974 |
| 0000111560 | 656D | 632E | 0000 | 0000 | 0000 | 0000 | 0001 | 0000 |
| 0000111600 | 6406 | 7961 | 2E73 | 0163 | 4600 | 4665 | 0002 | 0100 |
| 0000111620 | 0100 | 0800 | 6D67 | 6974 | 656D | 632E | 0001 | 678C |
| 0000111640 | 0084 | 0000 | 0001 | 0001 | 6C0A | 636F | 6C61 | 6974 |
| 0000111660 | 2E6D | 0163 | 1000 | 4968 | 0000 | 0100 | 0100 | 0C00 |
| 0000111700 | 736F | 5C32 | 6974 | 656D | 612E | 6D73 | 0001 | 685A |
| 0000111720 | 01C8 | 0000 | 0001 | 0001 | 7407 | 737A | 7465 | 632E |
| 0000111740 | 0000 | 0000 | 0000 | 0000 | 0001 | 0000 | 7409 | 6D69 |
| 0000111760 | 7365 | 7465 | 632E | 0001 | 6A22 | 00F6 | 0000 | 0001 |
| 0000112000 | 0001 | 640A | 6F74 | 7478 | 6D69 | 2E65 | 0163 | 1800 |
| 0000112020 | 2E6B | 0000 | 0100 | 0100 | 0B00 | 7473 | 7272 | 6863 |
| 0000112040 | 2E72 | 7361 | 016D | 4600 | 5E6B | 0000 | 0100 | 0100 |
| 0000112060 | 0B00 | 6D68 | 6D65 | 7063 | 2E79 | 7361 | 016D | A400 |
| 0000112100 | 486B | 0000 | 0100 | 0100 | 0B00 | 6D68 | 6D65 | 6573 |
| 0000112120 | 2E74 | 7361 | 016D | EC00 | 636B | 0000 | 0100 | 0100 |
| 0000112140 | 0800 | 7478 | 616F | 612E | 6D73 | 0001 | 6C50 | 001D |
| 0000112160 | 0000 | 0001 | 0001 | 6F0E | 3273 | 755C | 6C6E | 6E69 |
| 0000112200 | 2E6B | 7361 | 016D | 6E00 | 226C | 0000 | 0100 | 0100 |
| 0000112220 | 0900 | 6C61 | 756D | 2E6C | 7361 | 016D | 9000 | 226C |
| 0000112240 | 0000 | 0100 | 0100 | 0900 | 6C61 | 6572 | 2E6D | 7361 |
| 0000112260 | 016D | B200 | 1F6C | 0000 | 0100 | 0100 | 0900 | 6C61 |
| 0000112300 | 6873 | 2E6C | 7361 | 016D | D200 | 9A6C | 0000 | 0100 |
| 0000112320 | 0100 | 0800 | 646C | 7669 | 612E | 6D73 | 0001 | 6D6C |
| 0000112340 | 0032 | 0000 | 0001 | 0001 | 6C08 | 756D | 2E6C | 7361 |
| 0000112360 | 016D | 9E00 | A06D | 0000 | 0100 | 0100 | 0800 | 726C |
| 0000112400 | 6D65 | 612E | 6D73 | 0001 | 6E3E | 000B | 0000 | 0001 |

THU MAR 14 17:44:14 1991 PR.DLL PAGE 39, LINE 2243

| | | | | | | | | |
|---|---|---|---|---|---|---|---|---|
| 0000112420 | 0001 | 6C08 | 6873 | 2E6C | 7361 | 016D | 4A00 | 5F6E |
| 0000112440 | 0000 | 0100 | 0100 | 0900 | 6C75 | 6964 | 2E76 | 7361 |
| 0000112460 | 016D | AA00 | 6A6E | 0000 | 0100 | 0100 | 0900 | 6C75 |
| 0000112500 | 6572 | 2E6D | 7361 | BE6D | 0109 | 5C00 | 0F05 | 5F50 |
| 0000112520 | 5246 | 4545 | 525F | 5045 | 4C5F | 5349 | F354 | 0109 |
| 0000112540 | 5E00 | 0F05 | 5F50 | 5F51 | 5543 | 5252 | 525F | 5045 |
| 0000112560 | 495F | 5A44 | 010B | 6200 | 1005 | 5F50 | 4955 | 4D5F |
| 0000112600 | 4B41 | 5F45 | 4552 | 4F50 | 5452 | 0000 | 0001 | 0546 |
| 0000112620 | 500E | 535F | 4154 | 5452 | 525F | 5045 | 524F | 0F54 |
| 0000112640 | 0102 | 4C00 | 0D05 | 5F50 | 4554 | 4D52 | 525F | 5045 |
| 0000112660 | 524F | BC54 | 0103 | 5000 | 0905 | 5F50 | 5F52 | 5645 |
| 0000112700 | 4E45 | DC54 | 0105 | 5500 | 0E05 | 5F50 | 4547 | 5F54 |
| 0000112720 | 4552 | 5F50 | 494C | 5453 | 1786 | 0001 | 04F5 | 5F14 |
| 0000112740 | 7070 | 745F | 7265 | 5F6D | 6C61 | 5F6C | 6572 | 6F70 |
| 0000112760 | 7472 | 0D73 | 0118 | F700 | 0F04 | 705F | 5F70 | 6574 |
| 0000113000 | 6D72 | 725F | 7065 | 726F | 9374 | 0118 | F900 | 0C04 |
| 0000113020 | 705F | 5F70 | 5F77 | 6568 | 6461 | 7265 | 1A2D | 0001 |
| 0000113040 | 04FB | 5F0B | 7070 | 775F | 655F | 6576 | 746E | 1AEA |
| 0000113060 | 0001 | 04FE | 5F11 | 7070 | 675F | 7465 | 665F | 6C75 |
| 0000113100 | 5F6C | 616E | 656D | 01D0 | 0005 | 0085 | 5F0C | 6572 |
| 0000113120 | 5F70 | 656C | 6576 | 5F6C | D273 | 0501 | 8100 | 1500 |
| 0000113140 | 6E5F | 666F | 6F5F | 6570 | 656E | 5F64 | 6572 | 6F70 |
| 0000113160 | 7472 | 5F73 | D473 | 0501 | 8100 | 0E00 | 635F | 7275 |
| 0000113200 | 5F72 | 6572 | 5F70 | 6469 | 735F | 01D6 | 0005 | 04AC |
| 0000113220 | 5F15 | 616C | 7473 | 725F | 7065 | 745F | 7365 | 5F74 |
| 0000113240 | 616E | 656D | 735F | 02D6 | 0005 | 0085 | 5F0A | 6966 |
| 0000113260 | 7372 | 5F74 | 5F66 | 7673 | 010D | DA00 | 0E04 | 705F |
| 0000113300 | 5F70 | 6461 | 5F64 | 6572 | 5F70 | 6469 | 1145 | 0001 |
| 0000113320 | 04E4 | 5F0C | 7070 | 665F | 6E69 | 5F64 | 6572 | CA70 |
| 0000113340 | 0113 | E700 | 1104 | 705F | 5F70 | 6573 | 5F74 | 6572 |
| 0000113360 | 5F70 | 6966 | 656C | 8D73 | 0114 | EA00 | 1004 | 705F |
| 0000113400 | 5F70 | 6573 | 5F74 | 7563 | 7272 | 725F | 7065 | 14ED |
| 0000113420 | 0001 | 04EB | 5F11 | 7070 | 715F | 635F | 7275 | 5F72 |
| 0000113440 | 6572 | 5F70 | 6469 | 150E | 0001 | 04ED | 5F18 | 7070 |
| 0000113460 | 715F | 6C5F | 7361 | 5F74 | 6572 | 5F70 | 6574 | 7473 |
| 0000113500 | 6E5F | 6D61 | 3E65 | 0115 | EF00 | 1104 | 705F | 5F70 |
| 0000113520 | 6572 | 6F6D | 6576 | 725F | 7065 | 695F | 1C64 | 0116 |
| 0000113540 | F100 | 1004 | 705F | 5F70 | 5F71 | 7473 | 7261 | 5F74 |
| 0000113560 | 6974 | 656D | 1670 | 0001 | 04F3 | 5F09 | 7070 | 655F |
| 0000113600 | 6576 | 746E | 1C1C | 0001 | 0600 | 5F0C | 7570 | 725F |
| 0000113620 | 7270 | 5F74 | 6C64 | DA67 | 011D | 0800 | 1006 | 5550 |
| 0000113640 | 525F | 5250 | 5F54 | 4C44 | 5F47 | 5250 | 434F | 2018 |
| 0000113660 | 0001 | 060C | 5F0F | 5F70 | 5F75 | 7277 | 7469 | 5F65 |
| 0000113700 | 6F66 | 6D72 | 2243 | 0001 | 0611 | 5F10 | 5F70 | 5F75 |
| 0000113720 | 7277 | 7469 | 5F65 | 6E65 | 7274 | E079 | 0123 | 1600 |
| 0000113740 | 0C06 | 705F | 5F75 | 6567 | 5F74 | 7768 | 646E | 2406 |
| 0000113760 | 0001 | 0590 | 5F0D | 7570 | 695F | 696E | 5F74 | 6F66 |
| 0000114000 | 6D72 | 2677 | 0001 | 0592 | 5F07 | 7570 | 645F | 676C |
| 0000114020 | 36A8 | 0001 | 05B4 | 5F0F | 7570 | 745F | 6D69 | 5F65 |
| 0000114040 | 6F74 | 735F | 7274 | 3753 | 0001 | 05B6 | 5F10 | 7570 |
| 0000114060 | 645F | 7369 | 5F70 | 7265 | 5F72 | 736D | CC67 | 0518 |
| 0000114100 | 0000 | 0600 | 655F | 6164 | 6174 | 37C0 | 0005 | 0000 |
| 0000114120 | 5F04 | 6E65 | 0C64 | 0139 | 0000 | 0600 | 5F43 | 4E49 |
| 0000114140 | 5449 | 0EFC | 0005 | 0000 | 5F0C | 6E5F | 6568 | 7061 |
| 0000114160 | 645F | 7365 | C063 | 0537 | 0000 | 0C00 | 735F | 6174 |
| 0000114200 | 6B63 | 6F62 | 7474 | 6D6F | 0F22 | 0005 | 0000 | 5F0C |
| 0000114220 | 5F5F | 4461 | 7342 | 7077 | 6C66 | EE67 | 050E | 0000 |
| 0000114240 | 0800 | 5F5F | 6361 | 646D | 6E6C | 0F20 | 0005 | 0000 |
| 0000114260 | 5F08 | 615F | 6573 | 6867 | 1E69 | 050F | 0000 | 0800 |

THU MAR 14 17:44:14 1991 PR.DLL PAGE 40, LINE 2302

| | | | | | | | | |
|---|---|---|---|---|---|---|---|---|
| 0000114300 | 5F5F | 7361 | 6765 | 6F6C | 0EFA | 0005 | 0000 | 5F08 |
| 0000114320 | 615F | 6973 | 647A | F873 | 050E | 0000 | 0800 | 5F5F |
| 0000114340 | 7461 | 706F | 7073 | 0F10 | 0005 | 0000 | 5F09 | 615F |
| 0000114360 | 6663 | 6E69 | 6F66 | D6D6 | 0000 | 0001 | 5F09 | 615F |
| 0000114400 | 4244 | 7375 | 6465 | 0EF0 | 0005 | 0000 | 5F09 | 615F |
| 0000114420 | 6E65 | 7376 | 6765 | 0EF4 | 0005 | 0000 | 5F0A | 745F |
| 0000114440 | 7268 | 6165 | 6964 | F264 | 050E | 0000 | 0A00 | 5F5F |
| 0000114460 | 6967 | 666E | 736F | 6765 | D6D6 | 0000 | 0001 | 5F0A |
| 0000114500 | 615F | 4244 | 6F64 | 7773 | F670 | 050E | 0000 | 0A00 |
| 0000114520 | 5F5F | 696C | 666E | 736F | 6765 | 9876 | 0000 | 0001 |
| 0000114540 | 5F0A | 615F | 7263 | 7574 | 6573 | 2464 | 050F | 0000 |
| 0000114560 | 0B00 | 5F5F | 615F | 4244 | 7472 | 7265 | 7D72 | 0139 |
| 0000114600 | 0000 | 0B00 | 5F5F | 6D61 | 6773 | 655F | 6978 | 3274 |
| 0000114620 | 050F | 0000 | 0B00 | 5F5F | 736F | 6576 | 7372 | 6F69 |
| 0000114640 | 976E | 013A | 0000 | 0600 | 5F5F | 7865 | 7469 | 3B49 |
| 0000114660 | 0001 | 0000 | 5F0C | 755F | 6C6E | 636F | 656B | 6978 |
| 0000114700 | 4574 | 0511 | 0000 | 0700 | 5F5F | 6863 | 6C69 | 3564 |
| 0000114720 | 050F | 0000 | 0700 | 5F5F | 666E | 6C69 | DE65 | 0139 |
| 0000114740 | 0000 | 0700 | 5F5F | 6963 | 696E | 3774 | 0511 | 0000 |
| 0000114760 | 0700 | 5F5F | 615F | 6772 | 9F63 | 013A | 0000 | 0700 |
| 0000115000 | 5F5F | 6563 | 6978 | 3274 | 050F | 0000 | 0D00 | 5F5F |
| 0000115020 | 6F64 | 7673 | 7265 | 616D | 6F6A | 3972 | 0511 | 0000 |
| 0000115040 | 0700 | 5F5F | 615F | 6772 | 3376 | 050F | 0000 | 0D00 |
| 0000115060 | 5F5F | 6F64 | 7673 | 7265 | 696D | 6F6E | 3772 | 0510 |
| 0000115100 | 0000 | 0800 | 5F5F | 6970 | 6570 | 6863 | 113D | 0005 |
| 0000115120 | 0000 | 5F08 | 6E65 | 6976 | 6F72 | 376E | 050F | 0000 |
| 0000115140 | 0800 | 5F5F | 736F | 6966 | 656C | 0F34 | 0005 | 0000 |
| 0000115160 | 5F08 | 6F5F | 6D73 | 646F | 3865 | 013A | 0000 | 0800 |
| 0000115200 | 5F5F | 6E69 | 7469 | 7066 | 1764 | 0005 | 0000 | 5F08 |
| 0000115220 | 665F | 6970 | 696E | 6C74 | 013B | 0000 | 0800 | 5F5F |
| 0000115240 | 6574 | 6D72 | 7066 | 1141 | 0005 | 0000 | 5F08 | 705F |
| 0000115260 | 6D67 | 7470 | A972 | 013A | 0000 | 0800 | 5F5F | 5F63 |
| 0000115300 | 7865 | 7469 | 0F34 | 0005 | 0000 | 5F09 | 645F | 736F |
| 0000115320 | 6F6D | 6564 | 0F32 | 0005 | 0000 | 5F09 | 6F5F | 6D73 |
| 0000115340 | 6A61 | 726F | 0F33 | 0005 | 0000 | 5F09 | 6F5F | 6D73 |
| 0000115360 | 6E69 | 726F | 1147 | 0005 | 0000 | 5F0A | 655F | 6978 |
| 0000115400 | 6474 | 6E6F | FF65 | 013A | 0000 | 0A00 | 5F5F | 6F6C |
| 0000115420 | 6B63 | 7865 | 7469 | 0F30 | 0005 | 0000 | 5F0A | 755F |
| 0000115440 | 616D | 6B73 | 6176 | 6C6C | 013B | 0000 | 0A00 | 5F5F |
| 0000115460 | 7463 | 7265 | 736D | 6275 | 1149 | 0005 | 0000 | 5F0A |
| 0000115500 | 655F | 6978 | 5F74 | 6974 | 2664 | 050F | 0000 | 0500 |
| 0000115520 | 5F5F | 6166 | 9063 | 013A | 0000 | 0500 | 655F | 6978 |
| 0000115540 | 8E74 | 013B | 0000 | 0E00 | 5F5F | 4646 | 4D5F | 4753 |
| 0000115560 | 4142 | 4E4E | 5245 | 114C | 0005 | 0000 | 5F09 | 615F |
| 0000115600 | 6264 | 6D67 | 6773 | 9876 | 0000 | 0001 | 5F09 | 615F |
| 0000115620 | 7263 | 6D74 | 6773 | 3BB0 | 0001 | 0000 | 5F08 | 665F |
| 0000115640 | 7470 | 6172 | 5070 | 0511 | 0000 | 0C00 | 5F5F | 6161 |
| 0000115660 | 746C | 7473 | 6F6B | 7276 | 3BB6 | 0001 | 0000 | 5F08 |
| 0000115700 | 635F | 6B68 | 7473 | B66B | 013B | 0000 | 0A00 | 5F5F |
| 0000115720 | 4661 | 6863 | 736B | 6B74 | 3BD0 | 0001 | 0000 | 5F09 |
| 0000115740 | 735F | 7465 | 6E65 | 7076 | 3CD8 | 0001 | 0000 | 5F0B |
| 0000115760 | 4E5F | 534D | 5F47 | 4554 | 5458 | 3D08 | 0001 | 0000 |
| 0000116000 | 5F0C | 4E5F | 534D | 5F47 | 5257 | 5449 | EA45 | 013D |
| 0000116020 | 0000 | 0B00 | 5F5F | 645F | 736F | 7265 | 6E72 | F26F |
| 0000116040 | 013D | 0000 | 0700 | 5F5F | 7265 | 6E72 | A36F | 013D |
| 0000116060 | 0000 | 0800 | 5F5F | 6F64 | 7273 | 7465 | 3D8A | 0001 |
| 0000116100 | 0000 | 5F09 | 645F | 736F | 6572 | 6674 | 3E4A | 0001 |
| 0000116120 | 0000 | 5F0B | 665F | 6C63 | 736F | 5F65 | 6B6C | 3DFE |
| 0000116140 | 0001 | 0000 | 5F07 | 6366 | 6F6C | 6573 | 3F00 | 0001 |

THU MAR 14 17:44:14 1991 PR.DLL PAGE 41, LINE 2361

| | | | | | | | | |
|---|---|---|---|---|---|---|---|---|
| 0000116160 | 0000 | 5F08 | 665F | 6F73 | 6570 | 526E | 013F | 0000 |
| 0000116200 | 0600 | 665F | 706F | 6E65 | 3F6A | 0001 | 0000 | 5F08 |
| 0000116220 | 7066 | 6972 | 746E | C466 | 013F | 0000 | 0700 | 665F |
| 0000116240 | 7277 | 7469 | FE65 | 013F | 0000 | 0B00 | 5F5F | 7766 |
| 0000116260 | 6972 | 6574 | 6C5F | 586B | 0511 | 0000 | 0800 | 5F5F |
| 0000116300 | 6663 | 756C | 6873 | 0000 | 0004 | 0000 | 5F07 | 625F |
| 0000116320 | 6675 | 6E69 | 115A | 0005 | 0000 | 5F05 | 695F | 626F |
| 0000116340 | 133A | 0005 | 0000 | 5F06 | 695F | 626F | 1A32 | 0515 |
| 0000116360 | 0000 | 0900 | 5F5F | 616C | 7473 | 6F69 | 9662 | 0141 |
| 0000116400 | 0000 | 0800 | 5F5F | 6966 | 626C | 6675 | 4232 | 0001 |
| 0000116420 | 0000 | 5F08 | 665F | 736C | 7562 | 1866 | 0143 | 0000 |
| 0000116440 | 0900 | 5F5F | 7266 | 6565 | 7562 | 5066 | 0143 | 0000 |
| 0000116460 | 0800 | 5F5F | 6567 | 6274 | 6675 | 439C | 0001 | 0000 |
| 0000116500 | 5F0A | 6F5F | 6570 | 666E | 6C69 | 0665 | 0145 | 0000 |
| 0000116520 | 0700 | 5F5F | 7466 | 7562 | 8E66 | 0144 | 0000 | 0700 |
| 0000116540 | 5F5F | 7473 | 7562 | 9466 | 0145 | 0000 | 0B00 | 5F5F |
| 0000116560 | 6666 | 756C | 6873 | 6C5F | 4E6B | 0145 | 0000 | 0700 |
| 0000116600 | 665F | 6C66 | 7375 | 0068 | 0146 | 0000 | 0900 | 665F |
| 0000116620 | 756C | 6873 | 6C61 | 7C6C | 0146 | 0000 | 0700 | 5F5F |
| 0000116640 | 6E69 | 7570 | B674 | 014E | 0000 | 0800 | 5F5F | 756F |
| 0000116660 | 7074 | 7475 | 53A0 | 0001 | 0000 | 5F0B | 675F | 7465 |
| 0000116700 | 7473 | 6572 | 6D61 | 5418 | 0001 | 0000 | 5F07 | 6E75 |
| 0000116720 | 6567 | 6374 | 5458 | 0001 | 0000 | 5F0B | 755F | 676E |
| 0000116740 | 7465 | 5F63 | 6B6C | 54C2 | 0001 | 0000 | 5F06 | 6C63 |
| 0000116760 | 736F | 0C65 | 0155 | 0000 | 0600 | 6C5F | 6573 | 6B65 |
| 0000117000 | 5502 | 0001 | 0000 | 5F0A | 6C5F | 6573 | 6B65 | 6C5F |
| 0000117020 | 7A6B | 0155 | 0000 | 0600 | 735F | 706F | 6E65 | 558B |
| 0000117040 | 0001 | 0000 | 5F05 | 706F | 6E65 | 5746 | 0001 | 0000 |
| 0000117060 | 5F11 | 635F | 4558 | 494E | 7458 | 446F | 534F | 6F6D |
| 0000117100 | 6564 | 5758 | 0001 | 0000 | 5F05 | 6572 | 6461 | 58C0 |
| 0000117120 | 0001 | 0000 | 5F06 | 7277 | 7469 | B665 | 0158 | 0000 |
| 0000117140 | 0A00 | 5F5F | 7277 | 7469 | 5F65 | 6B6C | 1590 | 0005 |
| 0000117160 | 0000 | 5F07 | 665F | 6F6D | 6564 | 1590 | 0005 | 0000 |
| 0000117200 | 5F08 | 695F | 6D6F | 646F | 9465 | 015A | 0000 | 0700 |
| 0000117220 | 6D5F | 6C61 | 6F6C | 9963 | 015A | 0000 | 0A00 | 6D5F |
| 0000117240 | 6C61 | 6F6C | 5F63 | 6B6C | 5AA3 | 0001 | 0000 | 5F08 |
| 0000117260 | 7266 | 6565 | 6C5F | 9E6B | 015A | 0000 | 0500 | 665F |
| 0000117300 | 6572 | DA65 | 015A | 0000 | 0C00 | 5F5F | 6D66 | 6C61 |
| 0000117320 | 6F6C | 5F63 | 6B6C | 5AA8 | 0001 | 0000 | 5F07 | 665F |
| 0000117340 | 7266 | 6565 | 5ABB | 0001 | 0000 | 5F09 | 665F | 616D |
| 0000117360 | 6C6C | 636F | 5AA8 | 0001 | 0000 | 5F0A | 665F | 7266 |
| 0000117400 | 6565 | 6C5F | 926B | 0515 | 0000 | 0700 | 5F5F | 6866 |
| 0000117420 | 6165 | 5870 | 015B | 0000 | 0900 | 5F5F | 6E69 | 7469 |
| 0000117440 | 6573 | 8C67 | 015B | 0000 | 0900 | 5F5F | 696C | 6B6E |
| 0000117460 | 6573 | C267 | 015B | 0000 | 0B00 | 5F5F | 6573 | 7261 |
| 0000117500 | 6863 | 6573 | CD67 | 015C | 0000 | 0800 | 5F5F | 6E69 |
| 0000117520 | 7363 | 6765 | 5C3E | 0001 | 0000 | 5F09 | 675F | 6F72 |
| 0000117540 | 7377 | 6765 | 5D00 | 0001 | 0000 | 5F0A | 665F | 6E69 |
| 0000117560 | 6C64 | 7361 | A074 | 0515 | 0000 | 0A00 | 5F5F | 6D61 |
| 0000117600 | 6C62 | 736B | 7A69 | 5D20 | 0001 | 0000 | 5F08 | 6E5F |
| 0000117620 | 7765 | 6573 | 5267 | 015D | 0000 | 0700 | 735F | 7274 |
| 0000117640 | 6163 | 9874 | 015D | 0000 | 0700 | 735F | 7274 | 7063 |
| 0000117660 | CE79 | 015D | 0000 | 0700 | 735F | 7274 | 6D63 | F870 |
| 0000117700 | 015D | 0000 | 0700 | 735F | 7274 | 656C | 106E | 015E |
| 0000117720 | 0000 | 0800 | 735F | 7274 | 636E | 7970 | 5E3A | 0001 |
| 0000117740 | 0000 | 5F08 | 7473 | 6E72 | 6D63 | 7670 | 015E | 0000 |
| 0000117760 | 0500 | 615F | 6F74 | 7A6C | 015E | 0000 | 0700 | 5F5F |
| 0000120000 | 6163 | 6F74 | D078 | 015E | 0000 | 0500 | 695F | 6F74 |
| 0000120020 | F861 | 015E | 0000 | 0800 | 745F | 6C6F | 776F | 7265 |

THU MAR 14 17:44:14 1991 PR.DLL PAGE 42, LINE 2420

| | | | | | | | | |
|---|---|---|---|---|---|---|---|---|
| 0000120040 | 5EEC | 0001 | 0000 | 5F09 | 745F | 6C6F | 776F | 7265 |
| 0000120060 | 5F1A | 0001 | 0000 | 5F08 | 6F74 | 7075 | 6570 | 0E72 |
| 0000120100 | 015F | 0000 | 0900 | 5F5F | 6F74 | 7075 | 6570 | A272 |
| 0000120120 | 0515 | 0000 | 0D00 | 5F5F | 6663 | 746C | 7663 | 5F74 |
| 0000120140 | 6174 | BE62 | 0515 | 0000 | 0800 | 5F5F | 7361 | 7A69 |
| 0000120160 | 4365 | 15BF | 0005 | 0000 | 5F08 | 615F | 6973 | 657A |
| 0000120200 | BC44 | 0515 | 0000 | 0B00 | 5F5F | 6973 | 6967 | 746E |
| 0000120220 | 666F | BA66 | 0515 | 0000 | 0B00 | 5F5F | 6973 | 6967 |
| 0000120240 | 746E | 6573 | C067 | 0515 | 0000 | 0700 | 5F5F | 7463 |
| 0000120260 | 7079 | C065 | 0515 | 0000 | 0800 | 5F5F | 7463 | 7079 |
| 0000120300 | 5F65 | 5F30 | 0001 | 0000 | 5F07 | 6567 | 6574 | 766E |
| 0000120320 | 6026 | 0001 | 0000 | 5F06 | 6C5F | 636F | 706B | 0160 |
| 0000120340 | 0000 | 0700 | 5F5F | 6F6C | 6B63 | FA66 | 015F | 0000 |
| 0000120360 | 0D00 | 5F5F | 6E75 | 6F6C | 6B63 | 665F | 6C69 | D665 |
| 0000120400 | 015F | 0000 | 0D00 | 5F5F | 6F6C | 6B63 | 735F | 7274 |
| 0000120420 | 6165 | 506D | 0160 | 0000 | 0800 | 5F5F | 6E75 | 6F6C |
| 0000120440 | 6B63 | 16C2 | 0005 | 0000 | 5F09 | 6C5F | 636F | 636B |
| 0000120460 | 746E | 6080 | 0001 | 0000 | 5F09 | 755F | 6C6E | 636F |
| 0000120500 | 666B | 5FE2 | 0001 | 0000 | 5F0F | 755F | 6C6E | 636F |
| 0000120520 | 5F6B | 7473 | 6572 | 6D61 | 6006 | 0001 | 0000 | 5F0A |
| 0000120540 | 775F | 6961 | 6C74 | 636F | EE6B | 015F | 0000 | 0B00 |
| 0000120560 | 5F5F | 6F6C | 6B63 | 665F | 6C69 | 9065 | 0160 | 0000 |
| 0000120600 | 0B00 | 5F5F | 6567 | 7474 | 6469 | 6174 | C462 | 0516 |
| 0000120620 | 0000 | 0B00 | 5F5F | 6974 | 7464 | 6261 | 616D | 0A78 |
| 0000120640 | 0161 | 0000 | 0600 | 665F | 6567 | 7374 | 61A0 | 0001 |
| 0000120660 | 0000 | 5F06 | 7066 | 7475 | 1C73 | 0162 | 0000 | 0700 |
| 0000120700 | 725F | 7765 | 6E69 | 7E64 | 0162 | 0000 | 0800 | 735F |
| 0000120720 | 7270 | 6E69 | 6674 | 62F2 | 0001 | 0000 | 5F07 | 7373 |
| 0000120740 | 6163 | 666E | 634E | 0001 | 0000 | 5F07 | 6163 | 6C6C |
| 0000120760 | 636F | 63B2 | 0001 | 0000 | 5F08 | 7361 | 7463 | 6D69 |
| 0000121000 | 1865 | 0165 | 0000 | 0600 | 635F | 6974 | 656D | 16E0 |
| 0000121020 | 0005 | 0000 | 5F06 | 645F | 7961 | C673 | 0516 | 0000 |
| 0000121040 | 0800 | 5F5F | 706C | 6164 | 7379 | 6546 | 0001 | 0000 |
| 0000121060 | 5F07 | 6D67 | 6974 | 656D | 678C | 0001 | 0000 | 5F0A |
| 0000121100 | 6F6C | 6163 | 746C | 6D69 | 1065 | 0168 | 0000 | 0500 |
| 0000121120 | 745F | 6D69 | 7A65 | 0168 | 0000 | 0600 | 745F | 737A |
| 0000121140 | 7465 | 6954 | 0001 | 0000 | 5F09 | 695F | 6973 | 646E |
| 0000121160 | 7473 | 6B5A | 0001 | 0000 | 5F08 | 5F5F | 7A74 | 6573 |
| 0000121200 | 1C74 | 0517 | 0000 | 0900 | 645F | 7961 | 696C | 6867 |
| 0000121220 | 1874 | 0517 | 0000 | 0900 | 745F | 6D69 | 7A65 | 6E6F |
| 0000121240 | 1E65 | 0517 | 0000 | 0700 | 745F | 6E7A | 6D61 | 2665 |
| 0000121260 | 0517 | 0000 | 0900 | 5F5F | 645F | 616E | 656D | 3C73 |
| 0000121300 | 0517 | 0000 | 0900 | 5F5F | 6D5F | 616E | 656D | 2273 |
| 0000121320 | 016A | 0000 | 0A00 | 5F5F | 7464 | 786F | 6974 | 656D |
| 0000121340 | 6B18 | 0001 | 0000 | 5F08 | 7473 | 7272 | 6863 | 4672 |
| 0000121360 | 016B | 0000 | 0700 | 6D5F | 6D65 | 7063 | A479 | 016B |
| 0000121400 | 0000 | 0700 | 6D5F | 6D65 | 6573 | F974 | 016B | 0000 |
| 0000121420 | 0700 | 5F5F | 7863 | 6F74 | EC61 | 016B | 0000 | 0A00 |
| 0000121440 | 5F5F | 6C63 | 6F74 | 7361 | 6275 | 6C50 | 0001 | 0000 |
| 0000121460 | 5F07 | 6572 | 6F6D | 6576 | 6C50 | 0001 | 0000 | 5F07 |
| 0000121500 | 6E75 | 696C | 6B6E | 6C6E | 0001 | 0000 | 5F0A | 615F |
| 0000121520 | 4646 | 6C61 | 756D | 6E6C | 016C | 0000 | 0800 | 5F5F |
| 0000121540 | 4661 | 6146 | 6C75 | 756D | 906C | 016C | 0000 | 0A00 |
| 0000121560 | 5F5F | 4661 | 6146 | 726C | 6D65 | 6CB2 | 0001 | 0000 |
| 0000121600 | 5F0A | 615F | 4646 | 6C61 | 6873 | D26C | 016C | 0000 |
| 0000121620 | 0800 | 5F5F | 4661 | 646C | 7669 | 6D6C | 0001 | 0000 |
| 0000121640 | 5F08 | 615F | 6C46 | 756D | 6C6C | 016D | 0000 | 0900 |
| 0000121660 | 5F5F | 4661 | 6C75 | 756D | 9E6C | 016D | 0000 | 0800 |
| 0000121700 | 5F5F | 4661 | 726C | 6D65 | 6E3E | 0001 | 0000 | 5F08 |

```
THU MAR 14 17:44:14 1991  PR.DLL  PAGE 43, LINE 2479

0000121720  615F  6C46  6873  4A6C  016E  0000  0900  5F5F
0000121740  4661  6C75  6964  AA76  016E  0000  0900  5F5F
0000121760  4661  6C75  6572  016D  000A  8075  8183  6400
0000122000  8300  0201  0101  8000  1601  7900  0330  0383
0000122020  8302  0204  0A82  7528  746E  6761  6567  2964
0000122040  0169  000A  837F  0081  8183  8300  0081  1C01
0000122060  7F00  0682  6170  6B63  685F  8200  6606  6C69
0000122100  5F65  0268  0682  7566  636E  685F  0104  0001
0000122120  0180  0001  0180  0001  0180  0001  0180  0001
*
0000122320  0180  0001  0180  0001  0180  0005  3878  8083
0000122340  0100  0005  2878  8083  0100  0001  0180  0001
0000122360  0180  0001  0180  0001  0180  0001  0180  0001
*
0000122620  0180  0007  8578  0100  8083  0100  0001  0180
0000122640  0001  0180  0001  0180  0001  0180  0001  0180
*
0000125140  0001  0180  0001  0180  0001  0180  0007  737A
0000125160  8A83  8203  0100  000A  8075  8183  6400  8300
0000125200  0201  0101  8000  0101  8000  0101  8000  0101
0000125220  8000  0101  8000  0101  8000  0101  8000  0101
*
0000125740  8000  0101  8000  0101  8000  1201  7900  0560
0000125760  E683  8303  03E7  0682  695F  626F  6675  0169
0000126000  0010  837F  00C0  8183  8300  00C0  8083  8300
0000126020  0080  2701  7F00  0482  705F  7274  8200  5F04
0000126040  6E63  0474  0582  625F  7361  0665  0582  665F
0000126060  616C  0A67  0582  665F  6C69  0B65  0101  8000
0000126100  0701  7A00  8373  03E5  0082  0101  8000  0101
0000126120  8000  0101  8000  0101  8000  0101  8000  0101
*
0000127360  8000  0101  8000  0101  8000  0101  8000  1801
0000127400  7900  6085  0502  9883  8304  0499  0A82  7528
0000127420  746E  6761  6567  2964  0169  0010  837F  0086
0000127440  5483  8302  0082  5483  8302  00C0  2E01  7F00
0000127460  0282  6469  8200  6E04  6D61  0465  0A82  6974
0000127500  656D  735F  6174  706D  8224  6F05  6E77  7265
0000127520  8228  7009  7968  5F73  6170  6874  0148  0001
0000127540  0180  0001  0180  0001  0180  0001  0180  0001
*
0000127640  0180  0001  0180  0007  737A  9783  8204  0100
0000127660  0001  0180  0001  0180  0001  0180  0001  0180
*
0000130120  0001  0180  0001  0180  0001  0180  001B  2079
0000130140  8309  04D9  DA83  8204  690F  755F  6D5F  6773
0000130160  705F  7261  6D61  745F  0169  001C  837F  0081
0000130200  8583  8300  0082  8683  8300  0088  8083  8300
0000130220  0084  C083  8300  00C0  6A01  7F00  0982  5F69
0000130240  5F75  6873  726F  0074  0A82  5F69  5F75  7375
0000130260  6F68  7472  8200  6908  755F  6C5F  6E6F  0067
0000130300  0982  5F69  5F75  6C75  6E6F  0067  0982  5F69
0000130320  5F75  6C66  616F  0074  0882  5F69  5F75  6863
0000130340  7261  8200  6909  755F  755F  6863  7261  8200
0000130360  6907  755F  735F  7274  8200  6909  755F  625F
0000130400  6F6C  6B63  0100  0019  3079  8302  04DC  DD83
0000130420  8204  690D  6D5F  6773  705F  7261  6D61  745F
0000130440  0169  0007  837F  0085  D883  0104  0010  827F
0000130460  7404  7079  0065  0582  6176  756C  0265  0101
0000130500  8000  1C01  7900  9085  0900  E083  8304  04E1
```

```
THU MAR 14 17:44:14 1991  PR.DLL  PAGE 44, LINE 2538

0000130520  0E82  5F69  736D  5F67  6568  6461  7265  745F
0000130540  0169  001C  837F  0081  8183  8300  0085  8583
0000130560  8300  0084  8583  8300  0085  8183  8300  0085
0000130600  4701  7F00  0482  5F71  6469  8200  7306  756F
0000130620  6372  0265  0382  6970  0464  0382  6974  0664
0000130640  0482  6572  7073  8208  7208  7365  5F70  6974
0000130660  0A64  0782  706F  635F  646F  0C65  0482  7974
0000130700  6570  820E  7304  7A69  1065  1501  7900  C085
0000130720  0200  E483  8304  04E5  0782  5F69  736D  5F67
0000130740  6974  0501  7800  8330  04DB  0701  7F00  DF83
0000130760  8304  04E3  1701  7F00  0682  6568  6461  7265
0000131000  8200  700A  7261  6D61  6C5F  7369  1274  0101
0000131020  8000  0101  8000  0101  8000  0701  7A00  8373
0000131040  04E2  0082  0101  8000  0101  8000  0101  8000
0000131060  0101  8000  0101  8000  0101  8000  0101  8000
*
0000131220  1B01  7900  5085  0609  0783  8305  0508  0D82
0000131240  705F  725F  7065  6E5F  646F  5F65  6974  0701
0000131260  7800  0085  8308  0080  1301  7F00  8183  8300
0000131300  0081  5483  8302  0506  8583  8300  0082  3601
0000131320  7F00  0582  7665  6E65  0074  0682  6572  7573
0000131340  746C  8202  6E04  6D61  0465  0482  6574  7473
0000131360  8224  6C07  6E69  5F65  6F6E  2485  8201  7005
0000131400  7261  6D61  2685  0101  0001  0180  0001  0180
0000131420  0001  0180  0001  0180  0001  0180  0001  0180
0000131440  0001  0180  0007  737A  1183  8205  0100  0007
0000131460  737A  0583  8205  0100  0001  0180  0001  0180
0000131500  0001  0180  0001  0180  0001  0180  0001  0180
*
0000131640  0001  0180  0007  8578  0280  8083  0100  0001
0000131660  0180  0001  0180  0001  0180  0017  8579  26A0
0000131700  830D  0532  3383  8205  5F09  5F72  6F66  6D72
0000131720  745F  0169  0028  837F  0085  2D83  8305  052D
0000131740  0683  8305  052D  0683  8305  052D  2D83  8305
0000131760  052D  2D83  8305  052D  2D83  8305  0085  8401
0000132000  7F00  0282  6469  8200  7405  7469  656C  8202
0000132020  6E0A  6D61  5F65  6974  6C74  5265  0482  616E
0000132040  656D  A285  8200  6F09  7475  745F  7469  656C
0000132060  A285  8201  6F03  7475  F285  8201  660A  6F72
0000132100  5F6D  6974  6C74  8565  02F2  0482  7266  6D6F
0000132120  4285  8203  7408  5F6F  6974  6C74  8565  0392
0000132140  0282  6F74  E285  8203  6308  5F63  6974  6C74
0000132160  8565  0432  0282  6363  8285  8204  6C05  7665
0000132200  6C65  D285  0104  0001  0180  0001  0180  0001
0000132220  0180  0001  0180  0001  0180  0001  0180  0001
*
0000132300  0180  0001  0180  0001  0180  0013  837F  00C0
0000132320  C083  8300  0086  C083  8300  00C0  C183  0100
0000132340  000A  8075  8183  7300  8306  0545  0101  8000
0000132360  0101  8000  0501  7800  8378  0080  0501  7800
0000132400  8360  0082  0A01  7F00  8183  8300  0081  C083
0000132420  0100  000A  8075  8183  7300  8303  054B  0501
0000132440  7800  8370  0080  0501  7800  8370  0080  1601
0000132460  7F00  8183  8300  0081  8183  8300  00C0  C083
0000132500  8300  0085  8283  0100  000A  8075  8183  7300
0000132520  8307  054F  0501  7800  8350  0080  0501  7800
0000132540  8350  0080  0701  7800  B085  8300  0080  0D01
0000132560  7F00  C083  8300  0086  C183  8300  0510  0A01
0000132600  7500  8380  0081  0473  5483  0105  0007  8578
```

```
THU MAR 14 17:44:14 1991  PR.DLL  PAGE 45, LINE 2597

0000132620  0420  8083  0100  0005  1078  8083  0100  0005
0000132640  4078  8083  0100  0007  8578  00C0  8083  0100
0000132660  0007  8578  0090  8083  0100  0004  837F  0511
0000132700  0A01  7500  8380  0200  0173  5B83  0105  0004
0000132720  837F  00C1  0A01  7500  8380  0081  0173  5D83
0000132740  0105  0001  0180  0007  8578  0080  8083  0100
0000132760  0004  837F  00C0  0A01  7500  8380  0081  0173
0000133000  6183  0105  0001  0180  0007  8578  0088  8083
0000133020  0100  0007  8578  0098  8083  0100  000A  8075
0000133040  8183  6400  8300  0201  0101  8000  1601  7900
0000133060  0330  0383  8302  0204  0A82  7528  746E  6761
0000133100  6567  2964  0169  000A  837F  0081  8183  8300
0000133120  0081  1C01  7F00  0682  6170  6B63  685F  8200
0000133140  6606  6C69  5F65  0268  0682  7566  636E  685F
0000133160  0104  0001  0180  0001  0180  0001  0180  0001
0000133200  0180  0001  0180  0001  0180  0001  0180  0001
*
0000133360  0180  0001  0180  0001  0180  0001  0180  0005
0000133400  4878  8083  0100  0005  2878  8083  0100  0001
0000133420  0180  0001  0180  0001  0180  0001  0180  0001
*
0000133660  0180  0001  0180  0007  8578  0100  8083  0100
0000133700  0001  0180  0001  0180  0001  0180  0001  0180
*
0000134160  0001  0180  0001  0180  0005  6078  8083  0100
0000134200  0001  0180  0001  0180  0001  0180  0001  0180
*
0000136060  0001  0180  0007  737A  7283  8203  0100  000A
0000136100  8075  8183  6400  8300  0201  0101  8000  0101
0000136120  8000  0101  8000  0101  8000  0101  8000  0101
*
0000136660  8000  1201  7900  0560  CE83  8303  03CF  0682
0000136700  695F  626F  6675  0169  0010  837F  00C0  8183
0000136720  8300  00C0  8083  8300  0080  2701  7F00  0482
0000136740  705F  7274  8200  5F04  6E63  0474  0582  625F
0000136760  7361  0665  0582  665F  616C  0A67  0582  665F
0000137000  6C69  0B65  0101  8000  0701  7A00  8373  03CD
0000137020  0082  0101  8000  0101  8000  0101  8000  0101
0000137040  8000  0101  8000  0101  8000  0101  8000  0101
*
0000140300  8000  0101  8000  1801  7900  6085  0502  8083
0000140320  8304  0481  0A82  7528  746E  6761  6567  2964
0000140340  0169  0010  837F  0086  5483  8302  0082  5483
0000140360  8302  00C0  2E01  7F00  0282  6469  8200  6E04
0000140400  6D61  0465  0A82  6974  656D  735F  6174  706D
0000140420  8224  6F05  6E77  7265  8228  7009  7968  5F73
0000140440  6170  6874  0148  0001  0180  0001  0180  0001
0000140460  0180  0001  0180  0001  0180  0001  0180  0001
*
0000140540  0180  0001  0180  0001  0180  0001  0180  0007
0000140560  737A  7F83  8204  0100  0001  0180  0001  0180
0000140600  0001  0180  0001  0180  0001  0180  0001  0180
*
0000140720  0001  0180  0007  8578  0800  8083  0100  0001
0000140740  0180  0001  0180  0001  0180  0001  0180  0001
*
0000141160  0180  0001  0180  0001  0180  0005  0878  8083
0000141200  0100  001A  8579  12D0  830F  04D6  D783  8204
0000141220  5F0C  6572  5F70  6174  6C62  5F65  6973  2E01
```

THU MAR 14 17:44:14 1991 PR.DLL PAGE 46, LINE 2656

```
0000141240  7F00  8583  8300  0081  8183  8300  04AC  5483
0000141260  8302  0080  8083  8300  0082  8283  8300  0254
0000141300  8583  8300  0085  8583  8300  03D1  AC83  0104
0000141320  00B4  827F  6505  706D  7974  8200  6E04  7365
0000141340  0274  0482  7974  6570  8204  7409  7365  5F74
0000141360  616E  656D  8206  7407  5F72  616E  656D  0685
0000141400  8201  650B  6578  5F63  6170  6172  736D  2685
0000141420  8201  760A  7265  705F  7261  6D61  8573  0127
0000141440  0A82  7473  7261  5F74  6974  656D  2885  8201
0000141460  7409  7265  5F6D  6974  656D  2C85  8201  6F0D
0000141500  6570  6172  6F74  5F72  616E  656D  3085  8201
0000141520  7607  7265  735F  7263  5085  8201  6408  6669
0000141540  5F66  6373  8572  0152  0582  7361  6E79  8563
0000141560  0154  0282  7066  5685  8201  6408  7269  6E5F
0000141600  6D61  8565  015A  0701  7800  F085  83CE  04D5
0000141620  1601  7F00  8183  8300  00C0  C083  8300  0086
0000141640  C083  8300  00C0  C183  0100  000A  8075  8183
0000141660  6400  8307  04D9  0101  8000  0501  7800  8370
0000141700  0080  0501  7800  8370  0080  0501  7800  8338
0000141720  0080  0501  7800  8360  0082  0501  7800  8330
0000141740  0080  0501  7800  8320  0080  0501  7800  8340
0000141760  0080  0D01  7F00  8183  8300  00C0  C083  8300
0000142000  00C1  0A01  7500  8380  0081  0464  E383  0104
0000142020  0001  0180  0007  837F  0081  8583  0100  000A
0000142040  8075  8183  6400  8302  04E6  0501  7800  8310
0000142060  0080  0A01  7F00  8183  8300  00C0  C083  0100
0000142100  000A  8075  0083  6402  8303  04E9  0A01  7500
0000142120  8380  0081  0064  0183  0102  0004  837F  00C0
0000142140  0A01  7500  8380  0200  0164  EC83  0104  0004
0000142160  837F  0081  0A01  7500  8380  0081  0164  EE83
0000142200  0104  0004  837F  0081  0A01  7500  8380  0082
0000142220  0164  F083  0104  0019  837F  0081  8183  830C
0000142240  0081  C083  8300  00C0  8583  8300  0082  8283
0000142260  0100  000A  8075  0083  6402  8308  04F2  0701
0000142300  7F00  8183  8300  00C0  0A01  7500  8380  0081
0000142320  0264  F483  0104  000A  837F  0081  8183  8300
0000142340  00C0  0A01  7500  8380  0081  0364  F683  0104
0000142360  000D  837F  00C0  8183  8300  0081  C083  0100
0000142400  000A  8075  8183  6400  8304  04F8  1901  7F00
0000142420  8183  8300  0081  8183  8300  00C0  C083  8300
0000142440  0085  8283  8300  C082  0A01  7500  8380  0200
0000142460  0864  FA83  0104  0007  8578  00C0  8083  0100
0000142500  000A  837F  00C0  C083  8300  00C6  0A01  7500
0000142520  8380  0081  0364  FD83  0104  000A  8075  8183
0000142540  6400  8300  0201  0101  8000  1601  7900  0330
0000142560  0383  8302  0204  0A82  7528  746E  6761  6567
0000142600  2964  0169  000A  837F  0081  8183  8300  0081
0000142620  1C01  7F00  0682  6170  6B63  685F  8200  6606
0000142640  6C69  5F65  0268  0682  7566  636E  685F  0104
0000142660  0001  0180  0001  0180  0001  0180  0001  0180
*
0000143060  0001  0180  0001  0180  0001  0180  0005  4078
0000143100  8083  0100  0005  2878  8083  0100  0001  0180
0000143120  0001  0180  0001  0180  0001  0180  0001  0180
*
0000143660  0005  6078  8083  0100  0001  0180  0001  0180
0000143700  0001  0180  0001  0180  0001  0180  0001  0180
*
0000152360  0001  0180  0007  8578  0800  8083  0100  0001
```

```
THU MAR 14 17:44:14 1991  PR.DLL  PAGE 47, LINE 2715

0000152400  0180  0001  0180  0001  0180  0001  0180  0001
*
0000152520  0180  0007  8578  0280  8083  0100  0001  0180
0000152540  0001  0180  0001  0180  0017  8579  26A0  830D
0000152560  05EE  EF83  8205  5F09  5F72  6F66  6D72  745F
0000152600  0169  0028  837F  0085  E983  8305  05E9  D383
0000152620  8305  05E9  D383  8305  05E9  E983  8305  05E9
0000152640  E983  8305  05E9  E983  8305  0085  8401  7F00
0000152660  0282  6469  8200  7405  7469  656C  8202  6E0A
0000152700  6D61  5F65  6974  6C74  5265  0482  616E  656D
0000152720  A285  8200  6F09  7475  745F  7469  656C  A285
0000152740  8201  6F03  7475  F285  8201  660A  6F72  5F6D
0000152760  6974  6C74  8565  02F2  0482  7266  6D6F  4285
0000153000  8203  7408  5F6F  6974  6C74  8565  0392  0282
0000153020  6F74  E285  8203  6308  5F63  6974  6C74  8565
0000153040  0432  0282  6363  8285  8204  6C05  7665  6C65
0000153060  D285  0104  0001  0180  0007  737A  ED83  8205
0000153100  0100  0001  0180  0001  0180  000A  8075  0083
0000153120  6402  8301  05F5  0401  7F00  F183  0105  0001
0000153140  0180  0001  0180  0001  0180  0001  0180  0001
*
0000153200  0180  0004  837F  05F1  0A01  7500  8380  0081
0000153220  0164  FF83  0105  0001  0180  0001  0180  0005
0000153240  3878  8083  0100  0007  737A  0583  8206  0100
0000153260  000A  8075  8183  6400  8300  0201  0501  7800
0000153300  8360  0082  0D01  7F00  C083  8300  0085  C083
0000153320  8300  00C0  0A01  7500  8380  00C0  0473  0783
0000153340  0106  0007  8578  00C8  8083  0100  0001  0180
0000153360  0004  837F  05F1  0A01  7500  8380  0200  0164
0000153400  0B83  0106  0001  0180  0005  7878  8083  0100
0000153420  0005  2078  8083  0100  0007  837F  0085  C083
0000153440  0100  000A  8075  8183  6400  8302  0610  0101
0000153460  8000  0701  7800  8085  8300  0080  0401  7F00
0000153500  F183  0105  000A  8075  0083  6402  8301  0614
0000153520  0A01  7500  8380  00C0  0064  0183  0102  000A
0000153540  8075  8183  6400  8300  0201  0101  8000  1601
0000153560  7900  0330  0383  8302  0204  0A82  7528  746E
0000153600  6761  6567  2964  0169  000A  837F  0081  8183
0000153620  8300  0081  1C01  7F00  0682  6170  6B63  685F
0000153640  8200  6606  6C69  5F65  0268  0682  7566  636E
0000153660  685F  0104  0001  0180  0001  0180  0001  0180
0000153700  0001  0180  0001  0180  0001  0180  0001  0180
*
0000154100  0005  4878  8083  0100  0005  2878  8083  0100
0000154120  0001  0180  0001  0180  0001  0180  0001  0180
*
0000154360  0001  0180  0001  0180  0007  8578  0100  8083
0000154400  0100  0001  0180  0001  0180  0001  0180  0001
0000154420  0180  0001  0180  0001  0180  0001  0180  0001
*
0000156760  0180  0001  0180  0001  0180  0001  0180  0007
0000157000  737A  9583  8203  0100  000A  8075  8183  6400
0000157020  8300  0201  0101  8000  0101  8000  0101  8000
0000157040  0101  8000  0101  8000  0101  8000  0101  8000
*
0000157560  0101  8000  1201  7900  0560  EF83  8303  03F0
0000157600  0682  695F  626F  6675  0169  0010  837F  00C0
0000157620  8183  8300  00C0  8083  8300  0080  2701  7F00
0000157640  0482  705F  7274  8200  5F04  6E63  0474  0582
```

THU MAR 14 17:44:14 1991 PR.DLL PAGE 48, LINE 2774

```
0000157660  625F 7361 0665 0582 665F 616C 0A67 0582
0000157700  665F 6C69 0B65 0101 8000 0701 7A00 8373
0000157720  03EE 0082 0101 8000 0101 8000 0101 8000
0000157740  0101 8000 0101 8000 0101 8000 0101 8000
*
0000161200  0101 8000 0101 8000 1801 7900 6085 0502
0000161220  A183 8304 04A2 0A82 7528 746E 6761 6567
0000161240  2964 0169 0010 837F 0086 5483 8302 0082
0000161260  5483 8302 00C0 2E01 7F00 0282 6469 8200
0000161300  6E04 6D61 0465 0A82 6974 656D 735F 6174
0000161320  706D 8224 6F05 6E77 7265 8228 7009 7968
0000161340  5F73 6170 6874 0148 0001 0180 0001 0180
0000161360  0001 0180 0001 0180 0001 0180 0001 0180
*
0000161460  0007 737A A083 8204 0100 0001 0180 0001
0000161500  0180 0001 0180 0001 0180 0001 0180 0001
*
0000161600  0180 0001 0180 0001 0180 001B 2079 8309
0000161620  04CB CC83 8204 690F 755F 6D5F 6773 705F
0000161640  7261 6D61 745F 0169 001C 837F 0081 8583
0000161660  8300 0082 8683 8300 0088 8083 8300 0084
0000161700  C083 8300 00C0 6A01 7F00 0982 5F69 5F75
0000161720  6873 726F 0074 0A82 5F69 5F75 7375 6F68
0000161740  7472 8200 6908 755F 6C5F 6E6F 0067 0982
0000161760  5F69 5F75 6C75 6E6F 0067 0982 5F69 5F75
0000162000  6C66 616F 0074 0882 5F69 5F75 6863 7261
0000162020  8200 6909 755F 755F 6863 7261 8200 6907
0000162040  755F 735F 7274 8200 6909 755F 625F 6F6C
0000162060  6B63 0100 0019 3079 8302 04CE CF83 8204
0000162100  690D 6D5F 6773 705F 7261 6D61 745F 0169
0000162120  0007 837F 0085 CA83 0104 0010 827F 7404
0000162140  7079 0065 0582 6176 756C 0265 0101 8000
0000162160  1C01 7900 9085 0900 D283 8304 04D3 0E82
0000162200  5F69 736D 5F67 6568 6461 7265 745F 0169
0000162220  001C 837F 0081 8183 8300 0085 8583 8300
0000162240  0084 8583 8300 0085 8183 8300 0085 4701
0000162260  7F00 0482 5F71 6469 8200 7306 756F 6372
0000162300  0265 0382 6970 0464 0382 6974 0664 0482
0000162320  6572 7073 8208 7208 7365 5F70 6974 0A64
0000162340  0782 706F 635F 646F 0C65 0482 7974 6570
0000162360  820E 7304 7A69 1065 1501 7900 C085 0200
0000162400  D683 8304 04D7 0782 5F69 736D 5F67 6974
0000162420  0501 7800 8330 04CD 0701 7F00 D183 8304
0000162440  04D5 1701 7F00 0682 6568 6461 7265 8200
0000162460  700A 7261 6D61 6C5F 7369 1274 0101 8000
0000162500  0101 8000 0101 8000 0701 7A00 8373 04D4
0000162520  0082 0101 8000 0101 8000 0101 8000 0101
0000162540  8000 0101 8000 0101 8000 0101 8000 0101
*
0000163220  8000 0101 8000 0101 8000 0101 8000 0701
0000163240  7800 2085 8303 0080 0101 8000 0101 8000
0000163260  0101 8000 0101 8000 0101 8000 0101 8000
*
0000163320  0101 8000 0101 8000 0701 7800 0085 8308
0000163340  0080 0101 8000 0101 8000 0101 8000 0101
0000163360  8000 0101 8000 0101 8000 0101 8000 0101
*
0000163560  8000 0101 8000 1701 7900 9085 0617 6483
0000163600  8305 0565 0982 705F 6C5F 7361 5F74 6974
```

THU MAR 14 17:44:14 1991 PR.DLL PAGE 49, LINE 2833

| | | | | | | | | |
|---|---|---|---|---|---|---|---|---|
| 0000163620 | 0701 | 7800 | 8085 | 8302 | 0080 | 1301 | 7F00 | 3C83 |
| 0000163640 | 8305 | 053C | 6383 | 8305 | 0563 | 6383 | 8305 | 0085 |
| 0000163660 | 3101 | 7F00 | 0482 | 616E | 656D | 8200 | 6F03 | 7475 |
| 0000163700 | 0085 | 8201 | 6604 | 6F72 | 856D | 0200 | 0282 | 6F74 |
| 0000163720 | 5085 | 8202 | 6302 | 8563 | 02A0 | 0582 | 656C | 6576 |
| 0000163740 | 856C | 02F0 | 0101 | 8000 | 1701 | 7900 | A085 | 0D26 |
| 0000163760 | 6883 | 8305 | 0569 | 0982 | 725F | 665F | 726F | 5F6D |
| 0000164000 | 6974 | 2801 | 7F00 | 8583 | 8300 | 0563 | 6383 | 8305 |
| 0000164020 | 053C | 6383 | 8305 | 053C | 6383 | 8305 | 0563 | 6383 |
| 0000164040 | 8305 | 0563 | 6383 | 8305 | 0563 | 8583 | 0100 | 0084 |
| 0000164060 | 827F | 6902 | 0064 | 0582 | 6974 | 6C74 | 0265 | 0A82 |
| 0000164100 | 616E | 656D | 745F | 7469 | 656C | 8252 | 6E04 | 6D61 |
| 0000164120 | 8565 | 00A2 | 0982 | 756F | 5F74 | 6974 | 6C74 | 8565 |
| 0000164140 | 01A2 | 0382 | 756F | 8574 | 01F2 | 0A82 | 7266 | 6D6F |
| 0000164160 | 745F | 7469 | 656C | F285 | 8202 | 6604 | 6F72 | 856D |
| 0000164200 | 0342 | 0882 | 6F74 | 745F | 7469 | 656C | 9285 | 8203 |
| 0000164220 | 7402 | 856F | 03E2 | 0882 | 6363 | 745F | 7469 | 656C |
| 0000164240 | 3285 | 8204 | 6302 | 8563 | 0482 | 0582 | 656C | 6576 |
| 0000164260 | 856C | 04D2 | 0101 | 8000 | 0701 | 7A00 | 8373 | 0567 |
| 0000164300 | 0082 | 0101 | 8000 | 0101 | 8000 | 0101 | 8000 | 0101 |
| 0000164320 | 8000 | 0101 | 8000 | 0101 | 8000 | 0101 | 8000 | 0101 |
| * | | | | | | | | |
| 0000164360 | 8000 | 0101 | 8000 | 0101 | 8000 | 0701 | 7A00 | 8373 |
| 0000164400 | 0562 | 0082 | 0701 | 7800 | 2085 | 830D | 057C | 0701 |
| 0000164420 | 7800 | A085 | 8300 | 0080 | 0501 | 7800 | 8320 | 0080 |
| 0000164440 | 0501 | 7800 | 8350 | 0080 | 0501 | 7800 | 8360 | 0080 |
| 0000164460 | 0501 | 7800 | 8358 | 0080 | 0501 | 7800 | 8330 | 0080 |
| 0000164500 | 0501 | 7800 | 8340 | 0080 | 0501 | 7800 | 8338 | 0080 |
| 0000164520 | 0501 | 7800 | 8368 | 0080 | 0701 | 7800 | 8085 | 830C |
| 0000164540 | 057C | 0501 | 7800 | 8318 | 0080 | 0A01 | 7500 | 8380 |
| 0000164560 | 0081 | 0764 | 8883 | 0105 | 0016 | 837F | 00C0 | 8583 |
| 0000164600 | 8300 | 0085 | C083 | 8300 | 00C0 | C083 | 8300 | 00C0 |
| 0000164620 | 0A01 | 7500 | 8380 | 0200 | 0964 | 8A83 | 0105 | 001C |
| 0000164640 | 837F | 03F2 | F283 | 8303 | 03F2 | 8583 | 8300 | 0085 |
| 0000164660 | C083 | 8300 | 00C0 | C083 | 8300 | 00C2 | 0A01 | 7500 |
| 0000164700 | 8380 | 0200 | 0564 | 8C83 | 0105 | 0010 | 837F | 03F2 |
| 0000164720 | 8583 | 8300 | 03F2 | 8283 | 8300 | 0085 | 0A01 | 7500 |
| 0000164740 | 8380 | 0200 | 0964 | 8E83 | 0105 | 001C | 837F | 0085 |
| 0000164760 | 8183 | 8300 | 0081 | C083 | 8300 | 00C0 | 8583 | 8300 |
| 0000165000 | 0082 | C083 | 8300 | 00C0 | 0701 | 7F00 | 6B83 | 8305 |
| 0000165020 | 00C0 | 0A01 | 7500 | 8380 | 0200 | 0264 | 8F83 | 0105 |
| 0000165040 | 0007 | 837F | 0085 | 6B83 | 0105 | 000A | 8075 | 8183 |
| 0000165060 | 6400 | 8302 | 0591 | 0101 | 8000 | 0501 | 7800 | 8338 |
| 0000165100 | 0080 | 0501 | 7800 | 8360 | 0082 | 0501 | 7800 | 8370 |
| 0000165120 | 0080 | 0701 | 7800 | 8885 | 8300 | 0080 | 1601 | 7F00 |
| 0000165140 | C083 | 8300 | 0085 | 8583 | 8300 | 00C0 | C083 | 8300 |
| 0000165160 | 00C0 | C083 | 0100 | 000A | 8075 | 8183 | 6400 | 8307 |
| 0000165200 | 0598 | 0501 | 7800 | 8310 | 0080 | 1C01 | 7F00 | F283 |
| 0000165220 | 8303 | 03F2 | F283 | 8303 | 0085 | 8583 | 8300 | 00C0 |
| 0000165240 | C083 | 8300 | 00C0 | C283 | 0100 | 000A | 8075 | 0083 |
| 0000165260 | 6402 | 8309 | 059B | 0701 | 7800 | 2085 | 8304 | 0080 |
| 0000165300 | 0501 | 7800 | 8350 | 0080 | 0701 | 7800 | F885 | 8300 |
| 0000165320 | 0080 | 0701 | 7800 | 9085 | 8300 | 0080 | 0701 | 7800 |
| 0000165340 | C085 | 8300 | 0080 | 0701 | 7800 | B085 | 8300 | 0080 |
| 0000165360 | 0701 | 7800 | 3885 | 8301 | 0080 | 0701 | 7800 | 3085 |
| 0000165400 | 8301 | 0080 | 0701 | 7800 | D885 | 8300 | 0080 | 0701 |
| 0000165420 | 7800 | C885 | 8300 | 0080 | 0701 | 7800 | 0885 | 8301 |
| 0000165440 | 0080 | 1001 | 7F00 | F283 | 8303 | 0085 | F283 | 8303 |
| 0000165460 | 0082 | 8583 | 0100 | 000A | 8075 | 0083 | 6402 | 8305 |

THU MAR 14 17:44:14 19›1 PR.DLL PAGE 50, LINE 2892

| | | | | | | | | |
|---|---|---|---|---|---|---|---|---|
| 0000165500 | 05A8 | 0701 | 7800 | 2885 | 8301 | 0080 | 0701 | 7800 |
| 0000165520 | 4085 | 8301 | 0080 | 0701 | 7800 | 6885 | 8301 | 0080 |
| 0000165540 | 0701 | 7800 | 0085 | 8301 | 0080 | 0701 | 7800 | 7085 |
| 0000165560 | 8302 | 0080 | 0701 | 7800 | 8085 | 8302 | 0080 | 0701 |
| 0000165600 | 7800 | 1085 | 8301 | 0080 | 1C01 | 7F00 | 8583 | 8300 |
| 0000165620 | 0081 | 8183 | 8300 | 00C0 | C083 | 8300 | 0085 | 8283 |
| 0000165640 | 8300 | 00C0 | C083 | 0100 | 000A | 8075 | 0083 | 6402 |
| 0000165660 | 8309 | 05B1 | 0701 | 7F00 | 8283 | 8300 | 00C0 | 0A01 |
| 0000165700 | 7500 | 8380 | 0200 | 0264 | B383 | 0105 | 0004 | 837F |
| 0000165720 | 0081 | 0A01 | 7500 | 8380 | 0081 | 0164 | B583 | 0105 |
| 0000165740 | 0001 | 0180 | 0007 | 8578 | 0080 | 8083 | 0500 | 0111 |
| 0000165760 | 0000 | 1D00 | 0001 | 4600 | 0F05 | 1602 | 0100 | 0002 |
| 0000166000 | 0400 | 700E | 735F | 6174 | 7472 | 725F | 7065 | 726F |
| 0000166020 | 1674 | 1A04 | C000 | 1000 | 6574 | 7473 | 665F | 6C75 |
| 0000166040 | 5F6C | 616E | 656D | 705F | 040F | 0016 | 00C0 | 7409 |
| 0000166060 | 5F72 | 616E | 656D | 705F | 040F | 0012 | 0086 | 6409 |
| 0000166100 | 5F62 | 626F | 5F6A | 6469 | 0413 | 000E | 00C0 | 650D |
| 0000166120 | 6578 | 5F63 | 6170 | 6172 | 736D | 705F | 0412 | 000A |
| 0000166140 | 00C0 | 760C | 7265 | 705F | 7261 | 6D61 | 5F73 | 0E70 |
| 0000166160 | 0604 | C100 | 0800 | 6572 | 5F70 | 6469 | 705F | 040C |
| 0000166200 | FFFA | 00C0 | 5F06 | 745F | 7079 | 0F65 | F004 | 85FF |
| 0000166220 | 0900 | 5F5F | 7862 | 745F | 7079 | 0D65 | E004 | 89FF |
| 0000166240 | 0703 | 5F5F | 7270 | 6E69 | 0B74 | D804 | 02FF | 0502 |
| 0000166260 | 5F5F | 766C | 0D6C | E404 | 4AFF | 0705 | 5F5F | 6C63 |
| 0000166300 | 636F | 0D6B | F404 | C0FF | 0700 | 5F5F | 7473 | 6361 |
| 0000166320 | 0E6B | DE04 | 81FF | 0800 | 5F5F | 6572 | 7674 | 6C61 |
| 0000166340 | 040C | FFF8 | 0081 | 7206 | 7065 | 695F | 0E64 | D604 |
| 0000166360 | 85FF | 0800 | 7061 | 6570 | 646E | 665F | 0408 | FFF2 |
| 0000166400 | 0081 | 7202 | 0E63 | 6805 | 0500 | 4900 | 0605 | 5F5F |
| 0000166420 | 7566 | 636E | 0201 | 011C | 020F | 054C | 01AD | 0016 |
| 0000166440 | 019F | 0000 | 0D04 | 5F70 | 6574 | 6D72 | 725F | 7065 |
| 0000166460 | 726F | 0C74 | 0C04 | 8100 | 0600 | 6572 | 5F70 | 6469 |
| 0000166500 | 040C | 000A | 0081 | 7206 | 7365 | 6C75 | 0F74 | 0604 |
| 0000166520 | C000 | 0900 | 6F6E | 6574 | 5F73 | 7874 | 0C74 | FA04 |
| 0000166540 | C0FF | 0600 | 5F5F | 7974 | 6570 | 040F | FFF0 | 0085 |
| 0000166560 | 5F09 | 625F | 5F78 | 7974 | 6570 | 040D | FFE0 | 0389 |
| 0000166600 | 5F07 | 705F | 6972 | 746E | 040B | FFD8 | 0202 | 5F05 |
| 0000166620 | 6C5F | 6C76 | 040D | FFE4 | 054A | 5F07 | 635F | 6F6C |
| 0000166640 | 6B63 | 040D | FFF6 | 00C0 | 5F07 | 735F | 6174 | 6B63 |
| 0000166660 | 040E | FFDE | 0081 | 5F08 | 725F | 7465 | 6176 | 0D6C |
| 0000166700 | F204 | 81FF | 0700 | 7563 | 7272 | 695F | 0864 | F404 |
| 0000166720 | 81FF | 0200 | 6372 | 050E | 0086 | 0005 | 054E | 5F06 |
| 0000166740 | 665F | 6E75 | 0163 | 1802 | BC01 | 5003 | 2005 | 1602 |
| 0000166760 | 1200 | 0002 | 0400 | 7009 | 725F | 655F | 6576 | 746E |
| 0000167000 | 040C | 0018 | 0081 | 7206 | 7065 | 695F | 0B64 | 1604 |
| 0000167020 | 8100 | 0500 | 7665 | 6E65 | 0C74 | 1404 | 8100 | 0600 |
| 0000167040 | 6572 | 7573 | 746C | 040C | 0010 | 00C0 | 6E06 | 6D61 |
| 0000167060 | 5F65 | 1670 | 0C04 | C000 | 1000 | 6574 | 7473 | 665F |
| 0000167100 | 6C75 | 5F6C | 616E | 656D | 705F | 040D | 000A | 0085 |
| 0000167120 | 6C07 | 6E69 | 5F65 | 6F6E | 040B | 0006 | 0082 | 7005 |
| 0000167140 | 7261 | 6D61 | 040C | FFF6 | 00C0 | 5F06 | 745F | 7079 |
| 0000167160 | 0F65 | EC04 | 85FF | 0900 | 5F5F | 7862 | 745F | 7079 |
| 0000167200 | 0D65 | DA04 | 89FF | 0703 | 5F5F | 7270 | 6E69 | 0B74 |
| 0000167220 | D204 | 02FF | 0502 | 5F5F | 766C | 0D6C | E004 | 4AFF |
| 0000167240 | 0705 | 5F5F | 6C63 | 636F | 0D6B | F204 | C0FF | 0700 |
| 0000167260 | 5F5F | 7473 | 6361 | 0E6B | D804 | 81FF | 0800 | 5F5F |
| 0000167300 | 6572 | 7674 | 6C61 | 040D | FFEE | 0081 | 6307 | 7275 |
| 0000167320 | 5F72 | 6469 | 0410 | FFFA | 0082 | 650A | 6576 | 746E |
| 0000167340 | 745F | 6D69 | 0965 | DE04 | 85FF | 0300 | 7266 | 0863 |

THU MAR 14 17:44:14 1991 PR.DLL PAGE 51, LINE 2951

| | | | | | | | | |
|---|---|---|---|---|---|---|---|---|
| 0000167360 | F004 | 81FF | 0200 | 6372 | 050E | 00C0 | 0005 | 0552 |
| 0000167400 | 5F06 | 665F | 6E75 | 0163 | 1D02 | DC01 | 5505 | E205 |
| 0000167420 | 1603 | D400 | 0003 | 0400 | 700E | 675F | 7465 | 725F |
| 0000167440 | 7065 | 6C5F | 7369 | 1674 | 1204 | C000 | 1000 | 6574 |
| 0000167460 | 7473 | 665F | 6C75 | 5F6C | 616E | 656D | 705F | 040F |
| 0000167500 | 000E | 0086 | 6409 | 5F62 | 626F | 5F6A | 6469 | 0411 |
| 0000167520 | 000A | 00C1 | 720B | 7065 | 635F | 756F | 746E | 705F |
| 0000167540 | 0410 | 0006 | 0510 | 720A | 7065 | 6C5F | 7369 | 5F74 |
| 0000167560 | 0C70 | FA04 | C0FE | 0600 | 5F5F | 7974 | 6570 | 040F |
| 0000167600 | FE64 | 0085 | 5F09 | 625F | 5F78 | 7974 | 6570 | 040D |
| 0000167620 | FE54 | 0389 | 5F07 | 705F | 6972 | 746E | 040B | FE44 |
| 0000167640 | 0202 | 5F05 | 6C5F | 6C76 | 040D | FE58 | 054A | 5F07 |
| 0000167660 | 635F | 6F6C | 6B63 | 040D | FEF2 | 00C0 | 5F07 | 735F |
| 0000167700 | 6174 | 6B63 | 040E | FE4A | 0081 | 5F08 | 725F | 7465 |
| 0000167720 | 6176 | 106C | F604 | ACFE | 0A04 | 626F | 5F6A | 6164 |
| 0000167740 | 6174 | 705F | 040F | FEFE | 0506 | 6609 | 6C69 | 5F65 |
| 0000167760 | 616E | 656D | 0408 | FEEC | 03E9 | 6602 | 0B70 | 4C04 |
| 0000170000 | 82FE | 0500 | 7564 | 6D6D | 0A79 | 6804 | 56FE | 0405 |
| 0000170020 | 696C | 656E | 040A | FE50 | 0511 | 6C04 | 7369 | 0B74 |
| 0000170040 | 6604 | 81FE | 0500 | 6F63 | 6E75 | 0874 | F004 | 81FE |
| 0000170060 | 0200 | 6372 | 050E | 012C | 0005 | 0549 | 5F06 | 665F |
| 0000170100 | 6E75 | 0163 | 1E02 | BE01 | 5C09 | 3505 | 1600 | 2700 |
| 0000170120 | 0000 | 0400 | 700F | 665F | 6572 | 5F65 | 6572 | 5F70 |
| 0000170140 | 696C | 7473 | 040E | 0006 | 0511 | 7208 | 7065 | 6C5F |
| 0000170160 | 7369 | 0174 | 1E02 | F301 | 5E09 | 6705 | 1601 | 5900 |
| 0000170200 | 0001 | 0400 | 700F | 715F | 635F | 7275 | 5F72 | 6572 |
| 0000170220 | 5F70 | 6469 | 040E | 0006 | 00C1 | 7208 | 7065 | 695F |
| 0000170240 | 5F64 | 0F70 | F004 | 85FF | 0900 | 5F5F | 7862 | 745F |
| 0000170260 | 7079 | 0D65 | E004 | 89FF | 0703 | 5F5F | 7270 | 6E69 |
| 0000170300 | 0B74 | D804 | 02FF | 0502 | 5F5F | 766C | 0D6C | E404 |
| 0000170320 | 4AFF | 0705 | 5F5F | 6C63 | 636F | 0D6B | F404 | C0FF |
| 0000170340 | 0700 | 5F5F | 7473 | 6361 | 0E6B | DE04 | 81FF | 0800 |
| 0000170360 | 5F5F | 6572 | 7674 | 6C61 | 040C | FFF8 | 0081 | 7206 |
| 0000170400 | 7065 | 695F | 0864 | F204 | 81FF | 0200 | 6372 | 040C |
| 0000170420 | FFFA | 00C0 | 5F06 | 745F | 7079 | 0E65 | 4A05 | 0501 |
| 0000170440 | 6000 | 0605 | 5F5F | 7566 | 636E | 0201 | 011F | 0B5A |
| 0000170460 | 0562 | 021B | 0016 | 020D | 0000 | 1004 | 5F70 | 6975 |
| 0000170500 | 6D5F | 6B61 | 5F65 | 6572 | 6F70 | 7472 | 0416 | 0006 |
| 0000170520 | 00C0 | 7410 | 7365 | 5F74 | 7566 | 6C6C | 6E5F | 6D61 |
| 0000170540 | 5F65 | 0C70 | FA04 | C0FF | 0600 | 5F5F | 7974 | 6570 |
| 0000170560 | 040F | FB1A | 0085 | 5F09 | 625F | 5F78 | 7974 | 6570 |
| 0000170600 | 040D | FB0A | 0389 | 5F07 | 705F | 6972 | 746E | 040B |
| 0000170620 | FB02 | 0202 | 5F05 | 6C5F | 6C76 | 040D | FB0E | 054A |
| 0000170640 | 5F07 | 635F | 6F6C | 6B63 | 040D | FB22 | 00C0 | 5F07 |
| 0000170660 | 735F | 6174 | 6B63 | 040E | FB08 | 0081 | 5F08 | 725F |
| 0000170700 | 7465 | 6176 | 0A6C | 2604 | 31FB | 0405 | 6F66 | 6D72 |
| 0000170720 | 040B | FB1C | 04E9 | 6D05 | 6773 | 705F | 0408 | FB20 |
| 0000170740 | 0081 | 7202 | 0E63 | 8205 | 0501 | 6400 | 0605 | 5F5F |
| 0000170760 | 7566 | 636E | 0201 | 0D05 | 0000 | 001A | 050F | 005C |
| 0000171000 | 0005 | 00C0 | 4207 | 785F | 6946 | 656C | 050F | 0060 |
| 0000171020 | 0005 | 00C0 | 4207 | 785F | 6150 | 6B63 | 0514 | 0064 |
| 0000171040 | 0005 | 0086 | 630C | 6972 | 6974 | 5F63 | 6573 | 5F6D |
| 0000171060 | 1473 | 0005 | 0000 | 8100 | 0C00 | 7842 | 445F | 6265 |
| 0000171100 | 6775 | 6F4D | 6564 | 0514 | 0000 | 0000 | 0081 | 420C |
| 0000171120 | 5F78 | 6954 | 656D | 4D73 | 646F | 1065 | 0005 | 0000 |
| 0000171140 | 8100 | 0800 | 7842 | 425F | 735F | 6769 | 1105 | 0001 |
| 0000171160 | 0000 | 011C | 0D76 | 04DA | 03CF | 0010 | 03C4 | 0000 |
| 0000171200 | 0D04 | 7070 | 615F | 6464 | 725F | 7065 | 695F | 0E64 |
| 0000171220 | 0604 | 8100 | 0800 | 6572 | 5F70 | 7974 | 6570 | 0411 |

THU MAR 14 17:44:14 1991 PR.DLL PAGE 52, LINE 3010

| | | | | | | | | |
|---|---|---|---|---|---|---|---|---|
| 0000171240 | 0008 | 00C0 | 740B | 7365 | 5F74 | 616E | 656D | 705F |
| 0000171260 | 040F | 000C | 00C0 | 7409 | 5F72 | 616E | 656D | 705F |
| 0000171300 | 040F | 0010 | 0086 | 6409 | 5F62 | 626F | 5F6A | 6469 |
| 0000171320 | 0413 | 0014 | 00C0 | 650D | 6578 | 5F63 | 6170 | 6172 |
| 0000171340 | 736D | 705F | 0412 | 0018 | 00C0 | 760C | 7265 | 705F |
| 0000171360 | 7261 | 6D61 | 5F73 | 0E70 | 1C04 | C100 | 0800 | 6572 |
| 0000171400 | 5F70 | 6469 | 705F | 040C | FFFA | 00C0 | 5F06 | 745F |
| 0000171420 | 7079 | 0F65 | EA04 | 85FE | 0900 | 5F5F | 7862 | 745F |
| 0000171440 | 7079 | 0D65 | DA04 | 71FE | 0703 | 5F5F | 7270 | 6E69 |
| 0000171460 | 0B74 | D204 | 02FE | 0502 | 5F5F | 766C | 0D6C | DE04 |
| 0000171500 | DFFE | 0704 | 5F5F | 6C63 | 636F | 0D6B | F004 | COFC |
| 0000171520 | 0700 | 5F5F | 7473 | 6361 | 0E6B | D804 | 81FE | 0800 |
| 0000171540 | 5F5F | 6572 | 7674 | 6C61 | 040C | FEF4 | 0081 | 7206 |
| 0000171560 | 7065 | 695F | 0F64 | F604 | ACFE | 0904 | 7566 | 6C6C |
| 0000171600 | 6E5F | 6D61 | 1065 | F604 | 94FF | 0A04 | 626F | 5F6A |
| 0000171620 | 6164 | 6174 | 705F | 040F | FECE | 00C0 | 6F09 | 5F70 |
| 0000171640 | 616E | 656D | 705F | 0407 | FEEC | 0081 | 6901 | 0408 |
| 0000171660 | FEEE | 0081 | 7202 | 0E63 | D805 | 0502 | DD00 | 0604 |
| 0000171700 | 5F5F | 7566 | 636E | 0201 | 011A | 1145 | 04E4 | 0285 |
| 0000171720 | 0010 | 027A | 0000 | 0B04 | 7070 | 665F | 6E69 | 5F64 |
| 0000171740 | 6572 | 0E70 | 0604 | 8100 | 0800 | 6572 | 5F70 | 7974 |
| 0000171760 | 6570 | 0411 | 0008 | 00C0 | 740B | 7365 | 5F74 | 616E |
| 0000172000 | 656D | 705F | 040F | 000C | 00C0 | 7409 | 5F72 | 616E |
| 0000172020 | 656D | 705F | 040E | 0010 | 00C1 | 7208 | 7065 | 695F |
| 0000172040 | 5F64 | 0C70 | FA04 | COFF | 0600 | 5F5F | 7974 | 6570 |
| 0000172060 | 040F | FFCE | 0085 | 5F09 | 625F | 5F78 | 7974 | 6570 |
| 0000172100 | 040D | FFBE | 0371 | 5F07 | 705F | 6972 | 746E | 040B |
| 0000172120 | FFB6 | 0202 | 5F05 | 6C5F | 6C76 | 040D | FFC2 | 04DF |
| 0000172140 | 5F07 | 635F | 6F6C | 6B63 | 040D | FFF2 | 00C0 | 5F07 |
| 0000172160 | 735F | 6174 | 6B63 | 040E | FFBC | 0081 | 5F08 | 725F |
| 0000172200 | 7465 | 6176 | 0D6C | D004 | 54FF | 0702 | 7274 | 6E5F |
| 0000172220 | 6D61 | 0C65 | F604 | 81FF | 0600 | 6572 | 5F70 | 6469 |
| 0000172240 | 040D | FFF8 | 0085 | 6607 | 756F | 646E | 665F | 0408 |
| 0000172260 | FFF0 | 0081 | 7202 | 0E63 | F605 | 0502 | 8300 | 0602 |
| 0000172300 | 5F5F | 7566 | 636E | 0201 | 011F | 13CA | 04E7 | 00C3 |
| 0000172320 | 0010 | 00B8 | 0000 | 1004 | 7070 | 735F | 7465 | 725F |
| 0000172340 | 7065 | 665F | 6C69 | 7365 | 040C | 0006 | 0081 | 7206 |
| 0000172360 | 7065 | 695F | 0E64 | 0804 | 8500 | 0800 | 7061 | 6570 |
| 0000172400 | 646E | 665F | 0408 | FEF8 | 03D1 | 6602 | 0870 | FC04 |
| 0000172420 | 81FE | 0200 | 6372 | 040F | FEFE | 04AC | 6609 | 6C69 |
| 0000172440 | 5F65 | 616E | 656D | 0201 | 011E | 148D | 04EA | 0060 |
| 0000172460 | 0010 | 0055 | 0000 | 0F04 | 7070 | 735F | 7465 | 635F |
| 0000172500 | 7275 | 5F72 | 6572 | 0C70 | 0604 | 8100 | 0600 | 6572 |
| 0000172520 | 5F70 | 6469 | 0416 | 0008 | 00C0 | 7410 | 7365 | 5F74 |
| 0000172540 | 7566 | 6C6C | 6E5F | 6D61 | 5F65 | 0F70 | 0C04 | C000 |
| 0000172560 | 0900 | 7274 | 6E5F | 6D61 | 5F65 | 0170 | IF02 | ED01 |
| 0000172600 | EB14 | 2104 | 1000 | 1600 | 0000 | 0400 | 7010 | 5F70 |
| 0000172620 | 5F71 | 7563 | 7272 | 725F | 7065 | 695F | 0164 | 2602 |
| 0000172640 | 0E01 | ED15 | 3004 | 1000 | 2500 | 0000 | 0400 | 7017 |
| 0000172660 | 5F70 | 5F71 | 616C | 7473 | 725F | 7065 | 745F | 7365 |
| 0000172700 | 5F74 | 616E | 656D | 040F | 0006 | 00C0 | 7409 | 7365 |
| 0000172720 | 5F74 | 616E | 656D | 0201 | 011F | 153E | 04EF | 00DE |
| 0000172740 | 0010 | 00D3 | 0000 | 1004 | 7070 | 725F | 6D65 | 766F |
| 0000172760 | 5F65 | 6572 | 5F70 | 6469 | 040C | 0006 | 0081 | 7206 |
| 0000173000 | 7065 | 695F | 0D64 | FC04 | 85FF | 0700 | 6F66 | 6E75 |
| 0000173020 | 5F64 | 0766 | F804 | 81FF | 0100 | 0869 | FA04 | 81FF |
| 0000173040 | 0200 | 6372 | 0201 | 011E | 161C | 04F1 | 0054 | 0010 |
| 0000173060 | 0049 | 0000 | 0F04 | 7070 | 715F | 735F | 6174 | 7472 |
| 0000173100 | 745F | 6D69 | 0C65 | 0604 | 8100 | 0600 | 6572 | 5F70 |

THU MAR 14 17:44:14 1991 PR.DLL PAGE 53, LINE 3069

| | | | | | | | | |
|---|---|---|---|---|---|---|---|---|
| 0000173120 | 6469 | 0408 | FFFC | 0081 | 7202 | D163 | 1702 | 7001 |
| 0000173140 | F316 | 1604 | 1001 | 0B00 | 0001 | 0400 | 7008 | 5F70 |
| 0000173160 | 7665 | 6E65 | 0C74 | 0604 | 8100 | 0600 | 6572 | 5F70 |
| 0000173200 | 6469 | 040B | 0008 | 0081 | 6505 | 6576 | 746E | 040C |
| 0000173220 | 000A | 0081 | 7206 | 7365 | 6C75 | 0C74 | 0C04 | C000 |
| 0000173240 | 0600 | 616E | 656D | 705F | 0411 | 0010 | 00C0 | 740B |
| 0000173260 | 7365 | 5F74 | 616E | 656D | 705F | 040D | 0014 | 0085 |
| 0000173300 | 6C07 | 6E69 | 5F65 | 6F6E | 0410 | 0016 | 0082 | 650A |
| 0000173320 | 6576 | 746E | 745F | 6D69 | 0B65 | 1A04 | 8200 | 0500 |
| 0000173340 | 6170 | 6172 | 0E6D | FC04 | 85FF | 0800 | 6572 | 5F70 |
| 0000173360 | 6C66 | 6761 | 040E | FFF8 | 0081 | 6908 | 5F6E | 7665 |
| 0000173400 | 6E65 | 0874 | FA04 | 81FF | 0200 | 6372 | 0201 | 0122 |
| 0000173420 | 1786 | 04F5 | 0087 | 0010 | 007C | 0000 | 1304 | 7070 |
| 0000173440 | 745F | 7265 | 5F6D | 6C61 | 5F6C | 6572 | 6F70 | 7472 |
| 0000173460 | 0C73 | 0604 | 8100 | 0600 | 6572 | 7573 | 746C | 040F |
| 0000173500 | 0008 | 00C0 | 6E09 | 746F | 7365 | 745F | 7478 | 0409 |
| 0000173520 | FFF8 | 0081 | 6903 | 6372 | 0407 | FFFA | 0081 | 6901 |
| 0000173540 | 0408 | FFFC | 0081 | 7202 | 0163 | 1D02 | 0D01 | F718 |
| 0000173560 | 8604 | 1000 | 7B00 | 0000 | 0400 | 700E | 5F70 | 6574 |
| 0000173600 | 6D72 | 725F | 7065 | 726F | 0C74 | 0604 | 8100 | 0600 |
| 0000173620 | 6572 | 5F70 | 6469 | 040C | 0008 | 0081 | 7206 | 7365 |
| 0000173640 | 6C75 | 0F74 | 0A04 | C000 | 0900 | 6F6E | 6574 | 5F73 |
| 0000173660 | 7874 | 1174 | FC04 | ACFE | 0B04 | 6568 | 6461 | 7265 |
| 0000173700 | 665F | 6C69 | 0865 | FC04 | 81FF | 0200 | 6372 | 0201 |
| 0000173720 | 011A | 1893 | 04F9 | 019A | 0010 | 018F | 0000 | 0B04 |
| 0000173740 | 7070 | 775F | 685F | 6165 | 6564 | 0F72 | 0604 | C000 |
| 0000173760 | 0900 | 6966 | 656C | 6E5F | 6D61 | 0C65 | 0A04 | 8100 |
| 0000174000 | 0600 | 6572 | 5F70 | 6469 | 040C | 000C | 0081 | 7206 |
| 0000174020 | 7365 | 6C75 | 0F74 | 0E04 | C000 | 0900 | 6F6E | 6574 |
| 0000174040 | 5F73 | 7874 | 0874 | F804 | D1FF | 0203 | 7066 | 0408 |
| 0000174060 | FFFC | 0081 | 7202 | 0163 | 1902 | 2D01 | FB1A | BD04 |
| 0000174100 | 1000 | B200 | 0000 | 0400 | 700A | 5F70 | 5F77 | 7665 |
| 0000174120 | 6E65 | 0C74 | 0604 | 8100 | 0600 | 6572 | 5F70 | 6469 |
| 0000174140 | 040B | 0008 | 0081 | 6505 | 6576 | 746E | 040C | 000A |
| 0000174160 | 0081 | 7206 | 7365 | 6C75 | 0C74 | 0C04 | C000 | 0600 |
| 0000174200 | 616E | 656D | 705F | 0411 | 0010 | 00C0 | 740B | 7365 |
| 0000174220 | 5F74 | 616E | 656D | 705F | 040D | 0014 | 0085 | 6C07 |
| 0000174240 | 6E69 | 5F65 | 6F6E | 0410 | 0016 | 0082 | 650A | 6576 |
| 0000174260 | 746E | 745F | 6D69 | 0B65 | 1A04 | 8200 | 0500 | 6170 |
| 0000174300 | 6172 | 016D | 1F02 | EA01 | FE1A | 3204 | 1001 | 2700 |
| 0000174320 | 0001 | 0400 | 7010 | 5F70 | 6567 | 5F74 | 7566 | 6C6C |
| 0000174340 | 6E5F | 6D61 | 1165 | 0604 | C000 | 0B00 | 6574 | 7473 |
| 0000174360 | 6E5F | 6D61 | 5F65 | 1170 | 0A04 | C000 | 0B00 | 7566 |
| 0000174400 | 6C6C | 6E5F | 6D61 | 5F65 | 0F70 | 0E04 | C600 | 0900 |
| 0000174420 | 6574 | 7473 | 695F | 5F64 | 0870 | F404 | 86FE | 0200 |
| 0000174440 | 6469 | 040F | FEFC | 04AC | 7409 | 6D65 | 5F70 | 616E |
| 0000174460 | 656D | 0414 | FEF8 | 00C0 | 640E | 5F62 | 7566 | 6C6C |
| 0000174500 | 6E5F | 6D61 | 5F65 | 0870 | FC04 | 81FF | 0200 | 6372 |
| 0000174520 | 0201 | 0D05 | 0000 | 001A | 0513 | 01D0 | 0005 | 0085 |
| 0000174540 | 720B | 7065 | 6C5F | 7665 | 6C65 | 735F | 051C | 01D2 |
| 0000174560 | 0005 | 0081 | 6E14 | 666F | 6F5F | 6570 | 656E | 5F64 |
| 0000174600 | 6572 | 6F70 | 7472 | 5F73 | 0F73 | C805 | 0501 | C000 |
| 0000174620 | 0700 | 5F42 | 4678 | 6C69 | 1565 | D405 | 0501 | 8100 |
| 0000174640 | 0D00 | 7563 | 7272 | 725F | 7065 | 695F | 5F64 | 1C73 |
| 0000174660 | D605 | 0501 | AC00 | 1404 | 616C | 7473 | 725F | 7065 |
| 0000174700 | 745F | 7365 | 5F74 | 616E | 656D | 735F | 050F | 01CC |
| 0000174720 | 0005 | 00C0 | 4207 | 785F | 6150 | 6B63 | 0511 | 02D6 |
| 0000174740 | 0005 | 0085 | 6609 | 7269 | 7473 | 665F | 735F | 0513 |
| 0000174760 | 18CC | 0005 | 04D8 | 720B | 7065 | 745F | 6261 | 656C |

THU MAR 14 17:44:14 1991 PR.DLL PAGE 54, LINE 3128

| | | | | | | | | |
|---|---|---|---|---|---|---|---|---|
| 0000175000 | 735F | 0514 | 0000 | 0000 | 0081 | 420C | 5F78 | 6544 |
| 0000175020 | 7562 | 4D67 | 646F | 1465 | 0005 | 0000 | 8100 | 0C00 |
| 0000175040 | 7842 | 545F | 6D69 | 7365 | 6F4D | 6564 | 1105 | 0001 |
| 0000175060 | 0000 | 011A | 1C1C | 0600 | 01BE | 0010 | 01B3 | 0000 |
| 0000175100 | 0B04 | 7570 | 725F | 7270 | 5F74 | 6C64 | 0C67 | 0604 |
| 0000175120 | F100 | 0605 | 6F66 | 6D72 | 705F | 040C | FFFA | 00C0 |
| 0000175140 | 5F06 | 745F | 7079 | 0F65 | EC04 | 85FF | 0900 | 5F5F |
| 0000175160 | 7862 | 745F | 7079 | 0D65 | DC04 | 04FF | 0706 | 5F5F |
| 0000175200 | 7270 | 6E69 | 0B74 | D404 | 02FF | 0502 | 5F5F | 766C |
| 0000175220 | 0D6C | E004 | 06FF | 0706 | 5F5F | 6C63 | 636F | 0D6B |
| 0000175240 | F204 | C0FF | 0700 | 5F5F | 7473 | 6361 | 0E6B | DA04 |
| 0000175260 | 81FF | 0800 | 5F5F | 6572 | 7674 | 6C61 | 040A | FFEE |
| 0000175300 | 0085 | 6804 | 6F6D | 0A64 | F604 | C0FF | 0400 | 7768 |
| 0000175320 | 646E | 0408 | FFF0 | 0081 | 7202 | 0E63 | B605 | 0503 |
| 0000175340 | 8300 | 0602 | 5F5F | 7566 | 636E | 0201 | 011F | 1DDA |
| 0000175360 | 0608 | 023E | 0016 | 0230 | 0000 | 1004 | 7570 | 725F |
| 0000175400 | 7270 | 5F74 | 6C64 | 5F67 | 7270 | 636F | 040A | 0010 |
| 0000175420 | 00C0 | 6804 | 6E77 | 0964 | 0E04 | 8500 | 0300 | 736D |
| 0000175440 | 0967 | 0A04 | C000 | 0300 | 706D | 0931 | 0604 | C000 |
| 0000175460 | 0300 | 706D | 0D32 | FA04 | 85FF | 0700 | 706F | 635F |
| 0000175500 | 646F | 0865 | FC04 | 81FF | 0200 | 6372 | 0201 | 011D |
| 0000175520 | 2018 | 060C | 022B | 0010 | 0220 | 0000 | 0E04 | 5F70 |
| 0000175540 | 5F75 | 7277 | 7469 | 5F65 | 6F66 | 6D72 | 040C | 0006 |
| 0000175560 | 05F1 | 6606 | 726F | 5F6D | 0C70 | FA04 | C0FF | 0600 |
| 0000175600 | 5F5F | 7974 | 6570 | 040F | FFF4 | 0085 | 5F09 | 625F |
| 0000175620 | 5F78 | 7974 | 6570 | 040D | FFE4 | 0604 | 5F07 | 705F |
| 0000175640 | 6972 | 746E | 040B | FFDC | 0202 | 5F05 | 6C5F | 6C76 |
| 0000175660 | 040D | FFE8 | 0606 | 5F07 | 635F | 6F6C | 6B63 | 040D |
| 0000175700 | FFF6 | 00C0 | 5F07 | 735F | 6174 | 6B63 | 040E | FFE2 |
| 0000175720 | 0081 | 5F08 | 725F | 7465 | 6176 | 0E6C | E405 | 0503 |
| 0000175740 | 0E00 | 0606 | 5F5F | 7566 | 636E | 0201 | 011E | 2243 |
| 0000175760 | 0611 | 0145 | 0010 | 013A | 0000 | 0F04 | 5F70 | 5F75 |
| 0000176000 | 7277 | 7469 | 5F65 | 6E65 | 7274 | 0E79 | 0604 | 8500 |
| 0000176020 | 0800 | 6966 | 6C65 | 5F64 | 6469 | 040A | 0008 | 00C0 |
| 0000176040 | 7404 | 7865 | 0C74 | FA04 | C0FF | 0600 | 5F5F | 7974 |
| 0000176060 | 6570 | 040F | FFF4 | 0085 | 5F09 | 625F | 5F78 | 7974 |
| 0000176100 | 6570 | 040D | FFE2 | 0604 | 5F07 | 705F | 6972 | 746E |
| 0000176120 | 040B | FFDA | 0202 | 5F05 | 6C5F | 6C76 | 040D | FFE8 |
| 0000176140 | 0606 | 5F07 | 635F | 6F6C | 6B63 | 040D | FFF6 | 00C0 |
| 0000176160 | 5F07 | 735F | 6174 | 6B63 | 040E | FFE0 | 0081 | 5F08 |
| 0000176200 | 725F | 7465 | 6176 | 096C | E604 | 85FF | 0300 | 7266 |
| 0000176220 | 0E63 | FC05 | 0503 | 1300 | 0606 | 5F5F | 7566 | 636E |
| 0000176240 | 0201 | 011F | 2388 | 0615 | 0058 | 0010 | 004D | 0000 |
| 0000176260 | 1004 | 7570 | 675F | 7465 | 665F | 726F | 5F6D | 6E69 |
| 0000176300 | 6F66 | 040C | 0006 | 05F1 | 6606 | 726F | 5F6D | 0170 |
| 0000176320 | 1A02 | E001 | 1623 | 2506 | 1000 | 1A00 | 0000 | 0400 |
| 0000176340 | 700B | 5F75 | 6567 | 5F74 | 7768 | 646E | 0201 | 0D05 |
| 0000176360 | 0000 | 001A | 050F | 03AE | 0005 | 00C0 | 4207 | 785F |
| 0000176400 | 6946 | 656C | 050F | 03B2 | 0005 | 00C0 | 4207 | 785F |
| 0000176420 | 6150 | 6B63 | 0514 | 0000 | 0000 | 0081 | 420C | 5F78 |
| 0000176440 | 6544 | 7562 | 4D67 | 646F | 1465 | 0005 | 0000 | 8100 |
| 0000176460 | 0C00 | 7842 | 545F | 6D69 | 7365 | 6F4D | 6564 | 050E |
| 0000176500 | 32B2 | 0005 | 05ED | 6606 | 726F | 5F6D | 1073 | AA05 |
| 0000176520 | 0532 | F100 | 0805 | 6F66 | 6D72 | 705F | 735F | 050E |
| 0000176540 | 32AE | 0005 | 00C0 | 6806 | 6E77 | 5F64 | 0573 | 0111 |
| 0000176560 | 0000 | 1B00 | 0601 | 9024 | 7105 | 1002 | 6600 | 0002 |
| 0000176600 | 0400 | 700C | 5F75 | 6E69 | 7469 | 665F | 726F | 0C6D |
| 0000176620 | 0604 | 6B00 | 0605 | 6F66 | 6D72 | 705F | 040C | 000A |
| 0000176640 | 00C0 | 6E06 | 6D61 | 5F65 | 0F70 | FE04 | 3CFE | 0905 |

THU MAR 14 17:44:14 1991 PR.DLL PAGE 55, LINE 3187

| | | | | | | | | |
|---|---|---|---|---|---|---|---|---|
| 0000176660 | 6574 | 7473 | 6E5F | 6D61 | 0D65 | DC04 | 54FE | 0702 |
| 0000176700 | 706F | 6E5F | 6D61 | 0765 | FC04 | 81FE | 0100 | 0169 |
| 0000176720 | 1502 | 7701 | 9226 | 3B05 | 1005 | 3000 | 0005 | 0400 |
| 0000176740 | 7006 | 5F75 | 6C64 | 0D67 | 0604 | 8500 | 0700 | 706F |
| 0000176760 | 635F | 646F | 0C65 | 0804 | 6B00 | 0605 | 6F66 | 6D72 |
| 0000177000 | 705F | 040C | FF96 | 00C0 | 5F06 | 745F | 7079 | 0F65 |
| 0000177020 | 8404 | 85FD | 0900 | 5F5F | 7862 | 745F | 7079 | 0D65 |
| 0000177040 | 1004 | 94FD | 0703 | 5F5F | 7270 | 6E69 | 0B74 | 0804 |
| 0000177060 | 02FD | 0502 | 5F5F | 766C | 0D6C | 1404 | 95FD | 0705 |
| 0000177100 | 5F5F | 6C63 | 636F | 0D6B | 8C04 | C0FE | 0700 | 5F5F |
| 0000177120 | 7473 | 6361 | 0E6B | 0E04 | 81FD | 0800 | 5F5F | 6572 |
| 0000177140 | 7674 | 6C61 | 0408 | FD04 | 0086 | 6902 | 0F64 | 9004 |
| 0000177160 | 3CFE | 0905 | 7566 | 6C6C | 6E5F | 6D61 | 1065 | 9004 |
| 0000177200 | B5FF | 0A04 | 626F | 5F6A | 6164 | 6174 | 705F | 0413 |
| 0000177220 | FD86 | 053C | 6F0D | 7475 | 665F | 6C69 | 5F65 | 616E |
| 0000177240 | 656D | 040C | FF94 | 0085 | 7306 | 756F | 6372 | 0F65 |
| 0000177260 | 9A04 | 2FFF | 0905 | 656C | 6576 | 5F6C | 7473 | 0F72 |
| 0000177300 | 2004 | 2FFD | 0905 | 6974 | 6C74 | 5F65 | 7473 | 0B72 |
| 0000177320 | 8604 | DBFE | 0504 | 736D | 5F67 | 0870 | 8A04 | 81FE |
| 0000177340 | 0200 | 6372 | 050E | 0ADE | 0005 | 0594 | 5F06 | 665F |
| 0000177360 | 6E75 | 0163 | 1D02 | B201 | 992B | F605 | 1001 | EB00 |
| 0000177400 | 0001 | 0400 | 700E | 5F75 | 616D | 656B | 725F | 7065 |
| 0000177420 | 726F | 0C74 | 0604 | C000 | 0600 | 616E | 656D | 705F |
| 0000177440 | 040C | 000A | 0085 | 7306 | 756F | 6372 | 0B65 | 0C04 |
| 0000177460 | 8500 | 0500 | 656C | 6576 | 0B6C | 0E04 | C000 | 0500 |
| 0000177500 | 756F | 5F74 | 0C70 | 1204 | C000 | 0600 | 7266 | 6D6F |
| 0000177520 | 705F | 040A | 0016 | 00C0 | 7404 | 5F6F | 0A70 | 1A04 |
| 0000177540 | C000 | 0400 | 6363 | 705F | 040F | FEFE | 053C | 6609 |
| 0000177560 | 6C69 | 5F65 | 616E | 656D | 040C | FEF6 | 03F2 | 6806 |
| 0000177600 | 7264 | 665F | 0C70 | F004 | F2FE | 0603 | 7665 | 5F65 |
| 0000177620 | 7066 | 040C | FEE8 | 03F2 | 6F06 | 7475 | 665F | 1070 |
| 0000177640 | FA04 | B5FE | 0A04 | 626F | 5F6A | 6164 | 6174 | 705F |
| 0000177660 | 0410 | FEEC | 0082 | 730A | 6174 | 7472 | 745F | 6D69 |
| 0000177700 | 0865 | F404 | 81FE | 0200 | 6372 | 0201 | 011A | 2DA8 |
| 0000177720 | 059C | 0595 | 0010 | 058A | 0000 | 0B04 | 7570 | 775F |
| 0000177740 | 685F | 6165 | 6564 | 0C72 | 0604 | F200 | 0603 | 6468 |
| 0000177760 | 5F72 | 7066 | 040C | 000A | 03F2 | 6506 | 6576 | 665F |
| 0000200000 | 0C70 | 0E04 | F200 | 0603 | 756F | 5F74 | 7066 | 040C |
| 0000200020 | 0012 | 0085 | 7306 | 756F | 6372 | 0F65 | 1404 | 8500 |
| 0000200040 | 0900 | 6572 | 5F70 | 656C | 6576 | 0C6C | 1604 | C000 |
| 0000200060 | 0600 | 7266 | 6D6F | 705F | 040A | 001A | 00C0 | 7404 |
| 0000200100 | 5F6F | 0A70 | 1E04 | C000 | 0400 | 6363 | 705F | 0412 |
| 0000200120 | 0022 | 00C2 | 730C | 6174 | 7472 | 745F | 6D69 | 5F65 |
| 0000200140 | 0B70 | C204 | 81FE | 0500 | 7665 | 6E65 | 0C74 | 1E04 |
| 0000200160 | 81FE | 0600 | 6572 | 7573 | 746C | 040A | FEC4 | 0254 |
| 0000200200 | 6E04 | 6D61 | 0A65 | E604 | 3CFE | 0405 | 6574 | 7473 |
| 0000200220 | 040D | FEC0 | 0085 | 6C07 | 6E69 | 5F65 | 6F6E | 0410 |
| 0000200240 | FE20 | 0082 | 730A | 6174 | 7472 | 745F | 6D69 | 1065 |
| 0000200260 | E604 | 82FF | 0A00 | 7665 | 6E65 | 5F74 | 6974 | 656D |
| 0000200300 | 040B | FE24 | 0082 | 6405 | 6D75 | 796D | 040B | FE2C |
| 0000200320 | 0082 | 6C05 | 6974 | 656D | 040A | FE32 | 059D | 6C04 |
| 0000200340 | 6E69 | 0F65 | EA04 | 7CFF | 0905 | 656C | 6576 | 5F6C |
| 0000200360 | 7473 | 0D72 | E404 | 85FE | 0700 | 6F66 | 6E75 | 5F64 |
| 0000200400 | 1266 | 2804 | 82FE | 0C00 | 6C65 | 7061 | 6573 | 5F64 |
| 0000200420 | 6974 | 656D | 040E | FEB6 | 059E | 7408 | 6D69 | 5F65 |
| 0000200440 | 7473 | 0772 | 3004 | 81FE | 0100 | 0169 | 1C02 | 3D01 |
| 0000200460 | A933 | EE05 | 1001 | E300 | 0001 | 0400 | 700D | 5F75 |
| 0000200500 | 5F77 | 6564 | 6174 | 6C69 | 6465 | 040C | 0006 | 03F2 |
| 0000200520 | 6506 | 6576 | 665F | 0F70 | 0A04 | 8500 | 0900 | 6572 |

THU MAR 14 17:44:14 1991 PR.DLL PAGE 56, LINE 3246

| | | | | | | | | |
|---|---|---|---|---|---|---|---|---|
| 0000200540 | 5F70 | 656C | 6576 | 0C6C | 0C04 | F200 | 0603 | 756F |
| 0000200560 | 5F74 | 7066 | 0410 | 0010 | 0082 | 730A | 6174 | 7472 |
| 0000200600 | 745F | 6D69 | 0C65 | 1404 | 8500 | 0600 | 6574 | 6D72 |
| 0000200620 | 665F | 040E | FE4A | 0085 | 6108 | 7070 | 6E65 | 5F64 |
| 0000200640 | 0C66 | D404 | 85FE | 0600 | 6573 | 5F71 | 6F6E | 040A |
| 0000200660 | FE50 | 059D | 6C04 | 6E69 | 0B65 | D804 | 81FE | 0500 |
| 0000200700 | 7665 | 6E65 | 0C74 | 4804 | 81FE | 0600 | 6572 | 7573 |
| 0000200720 | 746C | 040A | FEDA | 0254 | 6E04 | 6D61 | 0A65 | FA04 |
| 0000200740 | 3CFE | 0405 | 6574 | 7473 | 040D | FED6 | 0085 | 6C07 |
| 0000200760 | 6E69 | 5F65 | 6F6E | 0410 | FFFA | 0082 | 650A | 6576 |
| 0000201000 | 746E | 745F | 6D69 | 0B65 | 4C04 | 82FE | 0500 | 7564 |
| 0000201020 | 6D6D | 0179 | 1B02 | 2B01 | B235 | 7D05 | 1001 | 7200 |
| 0000201040 | 0001 | 0400 | 700C | 5F75 | 7665 | 6E65 | 5F74 | 7874 |
| 0000201060 | 0C74 | 0604 | 8500 | 0600 | 6573 | 5F71 | 6F6E | 040B |
| 0000201100 | 0008 | 0081 | 6505 | 6576 | 746E | 040C | 000A | 0081 |
| 0000201120 | 7206 | 7365 | 6C75 | 0C74 | 0C04 | C000 | 0600 | 616E |
| 0000201140 | 656D | 705F | 0411 | 0010 | 00C0 | 740B | 7365 | 5F74 |
| 0000201160 | 616E | 656D | 705F | 040D | 0014 | 0085 | 6C07 | 6E69 |
| 0000201200 | 5F65 | 6F6E | 0412 | 0016 | 0082 | 650C | 616C | 7370 |
| 0000201220 | 6465 | 745F | 6D69 | 0E65 | 1A04 | C000 | 0800 | 6F66 |
| 0000201240 | 6D72 | 7461 | 705F | 040C | 001E | 00C0 | 6C06 | 6E69 |
| 0000201260 | 5F65 | 0E70 | F404 | 9EFF | 0805 | 696C | 656E | 735F |
| 0000201300 | 7274 | 0414 | FFE6 | 00C0 | 700E | 6972 | 6176 | 6574 |
| 0000201320 | 6E5F | 6D61 | 5F65 | 0E70 | EA04 | 9EFF | 0805 | 6974 |
| 0000201340 | 656D | 735F | 7274 | 0201 | 011D | 36A8 | 05B4 | 00AB |
| 0000201360 | 0010 | 00A0 | 0000 | 0E04 | 7570 | 745F | 6D69 | 5F65 |
| 0000201400 | 6F74 | 735F | 7274 | 0412 | 0006 | 0082 | 650C | 616C |
| 0000201420 | 7370 | 6465 | 745F | 6D69 | 1065 | 0A04 | C000 | 0A00 |
| 0000201440 | 6974 | 656D | 735F | 7274 | 705F | 0407 | FFF6 | 0082 |
| 0000201460 | 6801 | 0407 | FFF2 | 0082 | 6D01 | 0407 | FFFA | 0082 |
| 0000201500 | 7301 | 0201 | 011E | 3753 | 05B6 | 01A9 | 0010 | 019E |
| 0000201520 | 0000 | 0F04 | 7570 | 645F | 7369 | 5F70 | 7265 | 5F72 |
| 0000201540 | 736D | 0E67 | 0604 | 8100 | 0800 | 7265 | 5F72 | 6F63 |
| 0000201560 | 6564 | 040C | FFFA | 00C0 | 5F06 | 745F | 7079 | 0F65 |
| 0000201600 | EE04 | 85FF | 0900 | 5F5F | 7862 | 745F | 7079 | 0D65 |
| 0000201620 | DE04 | 94FF | 0703 | 5F5F | 7270 | 6E69 | 0B74 | D604 |
| 0000201640 | 02FF | 0502 | 5F5F | 766C | 0D6C | E204 | 95FF | 0705 |
| 0000201660 | 5F5F | 6C63 | 636F | 0D6B | F204 | C0FF | 0700 | 5F5F |
| 0000201700 | 7473 | 6361 | 0E6B | DC04 | 81FF | 0800 | 5F5F | 6572 |
| 0000201720 | 7674 | 6C61 | 040A | FFF6 | 00C0 | 6804 | 6E77 | 0964 |
| 0000201740 | D404 | 81FF | 0300 | 7269 | 0863 | F004 | 81FF | 0200 |
| 0000201760 | 6372 | 050E | 0EDE | 0005 | 05B8 | 5F06 | 665F | 6E75 |
| 0000202000 | 0163 | 0502 | 000D | 1A00 | 0F00 | 4C05 | 0504 | C000 |
| 0000202020 | 0700 | 5F42 | 4678 | 6C69 | 0F65 | 5005 | 0504 | C000 |
| 0000202040 | 0700 | 5F42 | 5078 | 6361 | 0E6B | 5405 | 0504 | 6200 |
| 0000202060 | 0605 | 616C | 7473 | 735F | 0510 | 3786 | 0005 | 057A |
| 0000202100 | 6C08 | 7361 | 5F74 | 5F70 | 1473 | 4605 | 0507 | 7B00 |
| 0000202120 | 0C05 | 5055 | 455F | 4556 | 544E | 545F | 5458 | 0515 |
| 0000202140 | 08EA | 0005 | 0585 | 500D | 5F50 | 4552 | 5553 | 544C |
| 0000202160 | 545F | 5458 | 0514 | 0000 | 0000 | 0081 | 420C | 5F78 |
| 0000202200 | 6544 | 7562 | 4D67 | 646F | 1465 | 0005 | 0000 | 8100 |
| 0000202220 | 0C00 | 7842 | 545F | 6D69 | 7365 | 6F4D | 6564 | 0510 |
| 0000202240 | 0000 | 0000 | 0081 | 4208 | 5F78 | 5F42 | 6973 | 0667 |
| 0000202260 | 5F70 | 6669 | 632E | 0001 | 0073 | 0055 | 0000 | 0056 |
| 0000202300 | 0016 | 005B | 00A8 | 0060 | 00AD | 0061 | 00C4 | 0063 |
| 0000202320 | 00C9 | 0065 | 00CC | 0068 | 00D1 | 006A | 00EF | 006C |
| 0000202340 | 00F8 | 0071 | 00FD | 0074 | 012D | 0075 | 0136 | 0077 |
| 0000202360 | 0147 | 0078 | 0150 | 007B | 0167 | 007C | 017B | 007E |
| 0000202400 | 0184 | 007F | 0201 | 00A5 | 020F | 00A6 | 0225 | 00AA |

THU MAR 14 17:44:14 1991 PR.DLL PAGE 57, LINE 3305

| | | | | | | | | |
|---|---|---|---|---|---|---|---|---|
| 0000202420 | 02B8 | 00AF | 02BD | 00B1 | 02C3 | 00B2 | 02CC | 00B4 |
| 0000202440 | 02D4 | 00B5 | 02E6 | 00B7 | 02EB | 00B9 | 02EE | 00BA |
| 0000202460 | 02F7 | 00BC | 030B | 00BE | 030E | 00BF | 0322 | 00C2 |
| 0000202500 | 0330 | 00C3 | 03AE | 00E7 | 03BC | 00E8 | 03D2 | 00EE |
| 0000202520 | 0465 | 00F1 | 046A | 00F4 | 04C4 | 00F6 | 04D5 | 00F7 |
| 0000202540 | 04DE | 00F9 | 04E3 | 00FC | 04E6 | 00FE | 04EC | 00FF |
| 0000202560 | 04F5 | 0101 | 04FD | 0102 | 0506 | 0104 | 050B | 0107 |
| 0000202600 | 050E | 010A | 051B | 010E | 0547 | 0110 | 0550 | 0111 |
| 0000202620 | 05CE | 012A | 05DC | 012B | 05F2 | 0135 | 0692 | 013A |
| 0000202640 | 0698 | 013C | 06B3 | 013D | 06BD | 013F | 06C3 | 0142 |
| 0000202660 | 06C6 | 0143 | 06E4 | 0145 | 06FE | 0146 | 070B | 0148 |
| 0000202700 | 0711 | 014B | 0714 | 014C | 071A | 014D | 073A | 014F |
| 0000202720 | 0741 | 0151 | 079D | 0154 | 07AD | 0156 | 07C4 | 0157 |
| 0000202740 | 07D1 | 0159 | 07D7 | 015B | 07DA | 015C | 07E0 | 0166 |
| 0000202760 | 0800 | 0168 | 0887 | 0169 | 088B | 016B | 088E | 016E |
| 0000203000 | 089E | 0170 | 08FE | 0172 | 0908 | 0173 | 091A | 0175 |
| 0000203020 | 0924 | 0176 | 09BD | 0189 | 09BE | 018B | 09D4 | 018D |
| 0000203040 | 09E2 | 018E | 09E5 | 01A3 | 09F3 | 01A4 | 0A09 | 01A8 |
| 0000203060 | 0A9C | 01AC | 0AA1 | 01AE | 0AA9 | 01AF | 0AB2 | 01B1 |
| 0000203100 | 0AB7 | 01B2 | 0ABA | 01B3 | 0AC5 | 01B5 | 0ACE | 01B6 |
| 0000203120 | 0B4C | 01D7 | 0B5A | 01D8 | 0B70 | 01DD | 0C0E | 01E1 |
| 0000203140 | 0C14 | 01E4 | 0C72 | 01E6 | 0C86 | 01E8 | 0C98 | 01EA |
| 0000203160 | 0CA2 | 01ED | 0CAD | 01EF | 0CC2 | 01F0 | 0CCC | 01F3 |
| 0000203200 | 0CDD | 01F4 | 0D67 | 7008 | 5F70 | 6572 | 2E70 | 0163 |
| 0000203220 | DE00 | 6800 | 7600 | 690D | 8600 | 710D | 2300 | 760E |
| 0000203240 | 2900 | 780E | 3300 | 790E | 4A00 | 7B0E | 5900 | 7F0E |
| 0000203260 | 5F00 | 800E | 6900 | 820E | 6F00 | 860E | 7200 | 880E |
| 0000203300 | 9C00 | 890E | A600 | 8C0E | AC00 | 8F0E | B600 | 900E |
| 0000203320 | C100 | 920E | D900 | 930E | DC00 | 950E | FA00 | 970E |
| 0000203340 | 1400 | 990F | 1E00 | 9B0F | 2200 | 9C0F | 2E00 | 9D0F |
| 0000203360 | 3B00 | 9E0F | 4800 | 9F0F | 5800 | A10F | 6800 | A20F |
| 0000203400 | 8100 | A40F | 9800 | A50F | A300 | A60F | BC00 | A70F |
| 0000203420 | BF00 | AA0F | CA00 | AB0F | E800 | AD0F | FB00 | AE0F |
| 0000203440 | 0700 | AF10 | 1300 | B210 | 1F00 | B410 | 3300 | B510 |
| 0000203460 | 4000 | B710 | 5800 | B810 | 6600 | BA10 | 7600 | BB10 |
| 0000203500 | 8100 | BF10 | 9100 | C010 | A600 | C210 | B000 | C310 |
| 0000203520 | 3A00 | DC11 | 4500 | DD11 | 5500 | E311 | E800 | E711 |
| 0000203540 | ED00 | E811 | F700 | EA11 | FC00 | EC11 | FF00 | EE11 |
| 0000203560 | 0400 | F212 | 2C00 | F812 | 4900 | FA12 | A800 | FB12 |
| 0000203600 | AD00 | FC12 | B000 | FD12 | B900 | FF12 | BE00 | 0312 |
| 0000203620 | C101 | 0412 | DE01 | 0712 | F401 | 0812 | 0F01 | 0C13 |
| 0000203640 | 2401 | 0D13 | 3801 | 0F13 | 4101 | 1013 | BF01 | 2513 |
| 0000203660 | CA01 | 2913 | DA01 | 3213 | E001 | 3413 | FC01 | 3813 |
| 0000203700 | 0A01 | 3A14 | 2601 | 3C14 | 5001 | 3D14 | 5D01 | 3F14 |
| 0000203720 | 6301 | 4014 | 6601 | 4214 | 7B01 | 4314 | 8201 | 5A14 |
| 0000203740 | 8D01 | 5C14 | 9D01 | 5E14 | A301 | 5F14 | AE01 | 6114 |
| 0000203760 | C001 | 6314 | C301 | 6514 | DF01 | 6614 | E201 | 7B14 |
| 0000204000 | ED01 | 7D14 | FD01 | 7E14 | 0301 | 9415 | 0E01 | 9615 |
| 0000204020 | 1E01 | 9815 | 3001 | 9915 | 3301 | AC15 | 3E01 | B015 |
| 0000204040 | 4E01 | B315 | 5301 | B415 | 6501 | B615 | 6A01 | B815 |
| 0000204060 | 6D01 | BA15 | 7801 | BD15 | 7C01 | BF15 | 8901 | C115 |
| 0000204100 | 8F01 | C315 | 9901 | C615 | 9E01 | C915 | BB01 | CB15 |
| 0000204120 | EB01 | CC15 | FD01 | CE15 | 0201 | CF16 | 0501 | D416 |
| 0000204140 | 0B01 | D516 | 1101 | E916 | 1C01 | EA16 | 2C01 | ED16 |
| 0000204160 | 3101 | EE16 | 4901 | F016 | 5901 | F116 | 5C01 | F216 |
| 0000204200 | 6501 | 0F16 | 7002 | 1216 | 8002 | 1816 | 8502 | 1916 |
| 0000204220 | 8A02 | 1C16 | 9002 | 1E16 | A302 | 2316 | A902 | 2516 |
| 0000204240 | BB02 | 2616 | CE02 | 2916 | E102 | 2D16 | E402 | 2F16 |
| 0000204260 | ED02 | 3016 | F602 | 3216 | FF02 | 3316 | 0202 | 3417 |

THU MAR 14 17:44:14 1991 PR.DLL PAGE 58, LINE 3364

| | | | | | | | | |
|---|---|---|---|---|---|---|---|---|
| 0000204300 | 0C02 | 3617 | 1102 | 3A17 | 1402 | 3C17 | 1D02 | 4017 |
| 0000204320 | 2002 | 4117 | 2302 | 4217 | 4302 | 4417 | 4C02 | 4617 |
| 0000204340 | 7802 | 4717 | 7B02 | 5C17 | 8602 | 6017 | 9602 | 6617 |
| 0000204360 | 9B02 | 6817 | A502 | 6A17 | B902 | 6C17 | C802 | 6D17 |
| 0000204400 | DC02 | 7017 | EA02 | 7117 | F302 | 7317 | F902 | 7517 |
| 0000204420 | FC02 | 7617 | 0202 | 8B18 | 0D02 | 8E18 | 1D02 | 9318 |
| 0000204440 | 2202 | 9418 | 3402 | 9618 | 4902 | 9918 | 6502 | 9B18 |
| 0000204460 | 8202 | 9C18 | 8802 | B218 | 9302 | B518 | A302 | BA18 |
| 0000204500 | A802 | BC18 | C002 | BD18 | CB02 | BF18 | D002 | C118 |
| 0000204520 | D302 | C218 | EF02 | C318 | 0B02 | C419 | 2A02 | C619 |
| 0000204540 | 4602 | C719 | 5102 | C819 | 6502 | C919 | 6802 | CB19 |
| 0000204560 | 7A02 | CC19 | 8F02 | CD19 | AA02 | CE19 | C502 | D119 |
| 0000204600 | E002 | D319 | 0E02 | D61A | 1C02 | D71A | 2202 | F41A |
| 0000204620 | 2D02 | F81A | 3D02 | F91A | 4602 | FB1A | 4B02 | FC1A |
| 0000204640 | 5402 | 051A | 5903 | 061A | C703 | 081A | DC03 | 091A |
| 0000204660 | DF03 | 1F1A | EA03 | 241A | FA03 | 281A | FF03 | 2A1A |
| 0000204700 | 0903 | 2C1B | 1D03 | 2E1B | 2603 | 2F1B | 3403 | 311B |
| 0000204720 | 4C03 | 321B | 4F03 | 341B | 6303 | 361B | 7703 | 381B |
| 0000204740 | 8003 | 391B | 8A03 | 3C1B | A003 | 3E1B | A903 | 3F1B |
| 0000204760 | B403 | 411B | CA03 | 421B | D503 | 441B | E703 | 451B |
| 0000205000 | F403 | 471B | 0B03 | 481C | 1103 | 071C | 7070 | 755F |
| 0000205020 | 2E69 | 0163 | 5400 | 5100 | 1C00 | 521C | 2C00 | 571C |
| 0000205040 | BE00 | 5B1C | C300 | 5D1C | D000 | 5E1C | D900 | 601C |
| 0000205060 | E600 | 621C | EF00 | 631C | F900 | 641C | 1200 | 671D |
| 0000205100 | 1B00 | 691D | 4100 | 6A1D | 4D00 | 6D1D | 5200 | 6E1D |
| 0000205120 | CF00 | 831D | DA00 | 861D | F000 | 8A1D | F500 | 8C1D |
| 0000205140 | FA00 | 911D | 0000 | 931E | 1900 | 9D1E | 3200 | 9F1E |
| 0000205160 | 3700 | A11E | 4400 | A31E | 5400 | A51E | 6700 | AC1E |
| 0000205200 | 7000 | AE1E | 9300 | B31E | 9C00 | B61E | A200 | B81E |
| 0000205220 | AD00 | BB1E | B000 | BD1E | BB00 | C01E | BE00 | C21E |
| 0000205240 | C900 | C61E | CC00 | C71E | CF00 | C91E | E900 | CD1E |
| 0000205260 | F200 | D11E | F800 | D31E | FD00 | D41E | 0D00 | D51F |
| 0000205300 | 2300 | D71F | 2D00 | DA1F | 4500 | DE1F | 4E00 | DF1F |
| 0000205320 | 6000 | E11F | 6D00 | E51F | 7600 | E61F | 7900 | E91F |
| 0000205340 | 8B00 | EB1F | 9500 | EC1F | A700 | EE1F | B400 | F11F |
| 0000205360 | BD00 | F51F | C000 | F61F | C300 | F71F | ED00 | F81F |
| 0000205400 | 0A00 | 0E20 | 1801 | 0F20 | 2801 | 1320 | BB01 | 1520 |
| 0000205420 | D301 | 1620 | EE01 | 1820 | 0901 | 1921 | 2401 | 2521 |
| 0000205440 | 3F01 | 2721 | 7101 | 2921 | A301 | 2B21 | D501 | 2C21 |
| 0000205460 | 3801 | 4022 | 4301 | 4122 | 5301 | 4622 | E601 | 4822 |
| 0000205500 | FF01 | 4922 | 7D01 | 5423 | 8801 | 5923 | 9801 | 5C23 |
| 0000205520 | B501 | 6723 | D201 | 6823 | D501 | 7C23 | E001 | 7E23 |
| 0000205540 | F001 | 7F23 | FA01 | 0823 | 7070 | 645F | 676C | 632E |
| 0000205560 | 0001 | 010F | 00BE | 2406 | 00C4 | 2416 | 00CA | 2420 |
| 0000205600 | 00CE | 242E | 00CF | 2471 | 00D1 | 2487 | 00D2 | 248A |
| 0000205620 | 00D3 | 2495 | 00D5 | 24AB | 00D7 | 24BA | 00D9 | 24D6 |
| 0000205640 | 00DA | 24E8 | 00DB | 24EE | 00DC | 2500 | 00DE | 251D |
| 0000205660 | 00E1 | 2537 | 00E2 | 254E | 00E3 | 2565 | 00E4 | 2580 |
| 0000205700 | 00E5 | 2597 | 00E6 | 25B6 | 00E7 | 25CD | 00E8 | 25EC |
| 0000205720 | 00E9 | 2603 | 00EA | 2622 | 00EB | 2639 | 00ED | 2658 |
| 0000205740 | 00EF | 2669 | 00F0 | 266C | 0104 | 2677 | 0105 | 2687 |
| 0000205760 | 0110 | 2725 | 0114 | 272B | 0116 | 2786 | 011A | 278C |
| 0000206000 | 011F | 278F | 0121 | 2796 | 0122 | 27A4 | 0124 | 27AA |
| 0000206020 | 0127 | 27AD | 0129 | 27C7 | 012B | 27D1 | 012F | 27DA |
| 0000206040 | 0130 | 27E8 | 0132 | 27EE | 0134 | 27F1 | 0136 | 27F6 |
| 0000206060 | 0139 | 2813 | 013C | 2816 | 013D | 281B | 013F | 2834 |
| 0000206100 | 0142 | 2837 | 0144 | 283D | 0145 | 2840 | 0148 | 2856 |
| 0000206120 | 014B | 2860 | 014F | 286E | 0151 | 2886 | 0153 | 2890 |
| 0000206140 | 0155 | 28AD | 0156 | 28B0 | 0158 | 28C9 | 015F | 28D3 |

THU MAR 14 17:44:14 1991 PR.DLL PAGE 59, LINE 3423

| | | | | | | | | |
|---|---|---|---|---|---|---|---|---|
| 0000206160 | 0161 | 2917 | 0163 | 2921 | 0166 | 292C | 0167 | 293D |
| 0000206200 | 016A | 2940 | 016B | 2951 | 016E | 2954 | 016F | 2965 |
| 0000206220 | 0172 | 2968 | 0173 | 296C | 0174 | 296F | 0176 | 2989 |
| 0000206240 | 0178 | 29AB | 0179 | 29B0 | 017A | 29C5 | 017B | 29CF |
| 0000206260 | 017D | 29D5 | 017E | 29E3 | 0182 | 29F1 | 0184 | 29F8 |
| 0000206300 | 0189 | 29FB | 018C | 2A00 | 018D | 2A1B | 018E | 2A3A |
| 0000206320 | 018F | 2A59 | 0190 | 2A78 | 0191 | 2A97 | 0195 | 2AA8 |
| 0000206340 | 0197 | 2ABD | 0198 | 2AC7 | 019A | 2AD8 | 019E | 2ADB |
| 0000206360 | 01A0 | 2AE1 | 01A1 | 2AE4 | 01A2 | 2AFC | 01A3 | 2B11 |
| 0000206400 | 01A5 | 2B1D | 01A6 | 2BA7 | 01C0 | 2BB2 | 01C8 | 2BC2 |
| 0000206420 | 01CD | 2BC8 | 01CF | 2BE2 | 01D0 | 2BEF | 01D2 | 2BF5 |
| 0000206440 | 01D5 | 2BF8 | 01D7 | 2C11 | 01DA | 2C1B | 01DB | 2C39 |
| 0000206460 | 01DE | 2C53 | 01DF | 2C71 | 01E1 | 2C8B | 01E2 | 2C98 |
| 0000206500 | 01E4 | 2C9E | 01E7 | 2CA1 | 01E9 | 2CAE | 01EB | 2CEC |
| 0000206520 | 01ED | 2CEF | 01F1 | 2D05 | 01F3 | 2D3F | 01F4 | 2D4C |
| 0000206540 | 01F5 | 2D5C | 01F6 | 2D69 | 01F7 | 2D79 | 01F8 | 2D86 |
| 0000206560 | 01FC | 2D96 | 01FD | 2D9D | 0219 | 2DA8 | 022D | 2DB8 |
| 0000206600 | 022E | 2DD0 | 022F | 2DE8 | 0231 | 2E00 | 0232 | 2E0E |
| 0000206620 | 0234 | 2E30 | 0237 | 2E36 | 0238 | 2E47 | 023B | 2E4A |
| 0000206640 | 023C | 2E5B | 023F | 2E5E | 0240 | 2E6F | 0243 | 2E72 |
| 0000206660 | 0244 | 2E76 | 0245 | 2E79 | 0246 | 2E93 | 0247 | 2EAA |
| 0000206700 | 0249 | 2EC7 | 024B | 2EDE | 024D | 2EF5 | 0250 | 2F0D |
| 0000206720 | 0251 | 2F4F | 0253 | 2F64 | 0255 | 2F7C | 0256 | 2F93 |
| 0000206740 | 0257 | 2F9C | 0259 | 2FB4 | 025A | 2FCB | 025B | 2FE3 |
| 0000206760 | 025D | 3005 | 025E | 301C | 025F | 302E | 0260 | 3034 |
| 0000207000 | 0261 | 3046 | 0262 | 3063 | 0264 | 307B | 0265 | 3092 |
| 0000207020 | 0266 | 30A4 | 0268 | 30B8 | 0269 | 30CA | 026B | 30DC |
| 0000207040 | 026C | 30F3 | 026E | 310B | 0270 | 3127 | 0271 | 313E |
| 0000207060 | 0273 | 3156 | 0274 | 316D | 0277 | 3176 | 0279 | 318E |
| 0000207100 | 027C | 3194 | 027F | 31BC | 0283 | 31F7 | 0285 | 321F |
| 0000207120 | 0286 | 3225 | 0287 | 3228 | 028C | 3232 | 028D | 326E |
| 0000207140 | 028F | 3286 | 0290 | 3289 | 0292 | 329B | 0295 | 32A9 |
| 0000207160 | 0299 | 32C0 | 029A | 32D7 | 029B | 32EF | 029D | 3305 |
| 0000207200 | 02A4 | 331D | 02A6 | 332F | 02A7 | 3332 | 02C1 | 333D |
| 0000207220 | 02D0 | 334D | 02D2 | 3356 | 02D3 | 3368 | 02D5 | 337A |
| 0000207240 | 02D9 | 338C | 02DA | 339E | 02DC | 33B0 | 02DE | 33C2 |
| 0000207260 | 02E1 | 33D4 | 02E3 | 33DA | 02E7 | 33F8 | 02E9 | 3433 |
| 0000207300 | 02EB | 3439 | 02F0 | 343F | 02F2 | 3445 | 02F6 | 3448 |
| 0000207320 | 02F7 | 3452 | 02F9 | 3458 | 02FE | 345B | 02FF | 346F |
| 0000207340 | 0301 | 3475 | 0306 | 3478 | 0307 | 348C | 0309 | 3492 |
| 0000207360 | 030D | 3495 | 030E | 3498 | 030F | 34BC | 0311 | 34C6 |
| 0000207400 | 0315 | 34CA | 0316 | 3506 | 0318 | 351A | 031A | 351D |
| 0000207420 | 031B | 3520 | 0336 | 352B | 033F | 353B | 0340 | 3544 |
| 0000207440 | 0342 | 3549 | 0343 | 3552 | 0348 | 3557 | 0349 | 359C |
| 0000207460 | 034B | 35B8 | 034C | 35CE | 034D | 35D9 | 034E | 35EF |
| 0000207500 | 034F | 35FA | 0350 | 35FD | 0351 | 3600 | 0353 | 360C |
| 0000207520 | 0354 | 3615 | 0356 | 3629 | 0357 | 362C | 0359 | 363D |
| 0000207540 | 035B | 3650 | 0361 | 365B | 0363 | 369A | 0364 | 369D |
| 0000207560 | 0377 | 36A8 | 037B | 36B8 | 037C | 36CE | 037D | 36F5 |
| 0000207600 | 037F | 3721 | 0381 | 3745 | 0382 | 3748 | 0395 | 3753 |
| 0000207620 | 0396 | 3763 | 0399 | 37F6 | 039B | 37FB | 039E | 3800 |
| 0000207640 | 03A1 | 3857 | 03A3 | 3862 | 03A5 | 3873 | 03A6 | 38F1 |
| 0000207660 | 0C00 | 6C6C | 6269 | 6463 | 6C6C | 6C2E | 6269 | 6F07 |
| 0000207700 | 3273 | 6C2E | 6269 | 6C0A | 6962 | 6D70 | 2E74 | 696C |
| 0000207720 | 0962 | 6264 | 705F | 2E69 | 696C | 0662 | 6975 | 6C2E |
| 0000207740 | 6269 | 6906 | 2E68 | 696C | 0762 | 7973 | 2E73 | 696C |
| 0000207760 | BF62 | 0100 | 0101 | 0800 | 0000 | 2600 | 0200 | 0101 |
| 0000210000 | 4200 | 0008 | 9100 | 0300 | 0101 | F200 | 0016 | 2400 |
| 0000210020 | 0412 | 0101 | E800 | 005E | 7F00 | 0906 | 0101 | AA00 |

THU MAR 14 17:44:14 1991 PR.DLL PAGE 60, LINE 3482

| | | | | | | | | |
|---|---|---|---|---|---|---|---|---|
| 0000210040 | 0077 | D700 | 0101 | 0201 | 2E00 | 0000 | 2800 | 0200 |
| 0000210060 | 0201 | D300 | 0008 | AC00 | 0301 | 0201 | 1600 | 0029 |
| 0000210100 | 3E00 | 040F | 0201 | 6700 | 0065 | C000 | 0907 | 0201 |
| 0000210120 | 8100 | 0079 | 8500 | 0103 | 0301 | 5600 | 0000 | 2700 |
| 0000210140 | 0200 | 0301 | 7F00 | 000A | 6A00 | 0300 | 0301 | 5400 |
| 0000210160 | 0038 | 0400 | 0412 | 0301 | 2700 | 006D | 4100 | 0903 |
| 0000210200 | 0301 | 0600 | 007D | 5C00 | 0101 | 0401 | 7D00 | 0000 |
| 0000210220 | 2800 | 0200 | 0401 | E900 | 000A | 4F00 | 0300 | 0401 |
| 0000210240 | 5800 | 004A | 9000 | 0414 | 0401 | 6800 | 0070 | 4200 |
| 0000210260 | 0907 | 0401 | 6200 | 007E | 4900 | 0104 | 0501 | A500 |
| 0000210300 | 0000 | 1800 | 0200 | 0501 | 3800 | 000B | 5200 | 0101 |
| 0000210320 | 0601 | BD00 | 0000 | 1B00 | 0200 | 0601 | 8A00 | 000C |
| 0000210340 | D200 | 0101 | 0701 | D800 | 0000 | 1C00 | 0200 | 0701 |
| 0000210360 | 5C00 | 000E | 3500 | 0100 | 0801 | F400 | 0000 | 1700 |
| 0000210400 | 0200 | 0801 | 9100 | 000E | 0F00 | 0100 | 0901 | 0B00 |
| 0000210420 | 0001 | 1700 | 0200 | 0901 | A000 | 000E | 3300 | 0100 |
| 0000210440 | 0A01 | 2200 | 0001 | 1A00 | 0200 | 0A01 | D300 | 000E |
| 0000210460 | 1000 | 0100 | 0B01 | 3C00 | 0001 | 1C00 | 0200 | 0B01 |
| 0000210500 | E300 | 000E | 2500 | 0100 | 0C01 | 5800 | 0001 | 1B00 |
| 0000210520 | 0200 | 0C01 | 0800 | 000F | 3F00 | 0100 | 0D01 | 7300 |
| 0000210540 | 0001 | 1500 | 0200 | 0D01 | 4700 | 000F | 2000 | 0100 |
| 0000210560 | 0E01 | 8800 | 0001 | 1400 | 0200 | 0E01 | 6700 | 000F |
| 0000210600 | 1C00 | 0100 | 0F01 | 9C00 | 0001 | 1600 | 0200 | 0F01 |
| 0000210620 | 8300 | 000F | 0F00 | 0100 | 1001 | B200 | 0001 | 1700 |
| 0000210640 | 0200 | 1001 | 9200 | 000F | 2000 | 0100 | 1101 | C900 |
| 0000210660 | 0001 | 1800 | 0200 | 1101 | B200 | 000F | 0F00 | 0100 |
| 0000210700 | 1201 | E100 | 0001 | 1400 | 0200 | 1201 | C100 | 000F |
| 0000210720 | 3700 | 0100 | 1301 | F500 | 0001 | 1800 | 0200 | 1301 |
| 0000210740 | F800 | 000F | 0F00 | 0100 | 1401 | 0DC0 | 0002 | 1800 |
| 0000210760 | 0200 | 1401 | 0700 | 0010 | 0F00 | 0100 | 1501 | 2500 |
| 0000211000 | 0002 | 1900 | 0200 | 1501 | 1600 | 0010 | 1000 | 0100 |
| 0000211020 | 1601 | 3E00 | 0002 | 1800 | 0200 | 1601 | 2600 | 0010 |
| 0000211040 | 0F00 | 0100 | 1701 | 5600 | 0002 | 1400 | 0200 | 1701 |
| 0000211060 | 3500 | 0010 | 1100 | 0100 | 1801 | 6A00 | 0002 | 1800 |
| 0000211100 | 0200 | 1801 | 4600 | 0010 | 1C00 | 0100 | 1901 | 8200 |
| 0000211120 | 0002 | 1500 | 0200 | 1901 | 6200 | 0010 | 3000 | 0100 |
| 0000211140 | 1A01 | 9700 | 0002 | 1400 | 0200 | 1A01 | 9200 | 0010 |
| 0000211160 | 0E00 | 0100 | 1B01 | AB00 | 0002 | 1700 | 0200 | 1B01 |
| 0000211200 | A000 | 0010 | 0F00 | 0100 | 1C01 | C200 | 0002 | 1500 |
| 0000211220 | 0200 | 1C01 | AF00 | 0010 | 1200 | 0100 | 1D01 | D700 |
| 0000211240 | 0002 | 1500 | 0200 | 1D01 | C100 | 0010 | 2000 | 0100 |
| 0000211260 | 1E01 | EC00 | 0002 | 1A00 | 0200 | 1E01 | E100 | 0010 |
| 0000211300 | 0D00 | 0100 | 1F01 | 0600 | 0003 | 1A00 | 0200 | 1F01 |
| 0000211320 | EE00 | 0010 | 1E00 | 0100 | 2001 | 2000 | 0003 | 1900 |
| 0000211340 | 0200 | 2001 | 0C00 | 0011 | 3100 | 0100 | 2101 | 3900 |
| 0000211360 | 0003 | 1900 | 0200 | 2101 | 3D00 | 0011 | 0C00 | 0100 |
| 0000211400 | 2201 | 5200 | 0003 | 1600 | 0200 | 2201 | 4900 | 0011 |
| 0000211420 | 1E00 | 0100 | 2301 | 6800 | 0003 | 1800 | 0200 | 2301 |
| 0000211440 | 6700 | 0011 | 1D00 | 0100 | 2401 | 8000 | 0003 | 1700 |
| 0000211460 | 0200 | 2401 | 8400 | 0011 | 1F00 | 0100 | 2501 | 9700 |
| 0000211500 | 0003 | 1500 | 0200 | 2501 | A300 | 0011 | 1800 | 0100 |
| 0000211520 | 2601 | AC00 | 0003 | 1800 | 0200 | 2601 | BE00 | 0011 |
| 0000211540 | 4200 | 0100 | 2701 | C400 | 0003 | 1600 | 0200 | 2701 |
| 0000211560 | 0000 | 0012 | 0E00 | 0100 | 2801 | DA00 | 0003 | 1800 |
| 0000211600 | 0200 | 2801 | 0E00 | 0012 | 1000 | 0100 | 2901 | F200 |
| 0000211620 | 0003 | 1800 | 0200 | 2901 | 1E00 | 0012 | 1000 | 0100 |
| 0000211640 | 2A01 | 0A00 | 0004 | 1900 | 0200 | 2A01 | 2E00 | 0012 |
| 0000211660 | 1200 | 0100 | 2B01 | 2300 | 0004 | 1800 | 0200 | 2B01 |
| 0000211700 | 4000 | 0012 | 4100 | 0100 | 2C01 | 3B00 | 0004 | 1700 |

THU MAR 14 17:44:14 1991 PR.DLL PAGE 61, LINE 3541

| | | | | | | | | | |
|---|---|---|---|---|---|---|---|---|---|
| 0000211720 | 0200 | 2C01 | 8100 | 0012 | 0F00 | 0100 | 2D01 | 5200 |
| 0000211740 | 0004 | 1700 | 0200 | 2D01 | 9000 | 0012 | 0E00 | 0100 |
| 0000211760 | 2E01 | 6900 | 0004 | 1700 | 0200 | 2E01 | 9E00 | 0012 |
| 0000212000 | 0E00 | 0100 | 2F01 | 8000 | 0004 | 1700 | 0200 | 2F01 |
| 0000212020 | AC00 | 0012 | 0E00 | 0100 | 3001 | 9700 | 0004 | 1700 |
| 0000212040 | 0200 | 3001 | BA00 | 0012 | 0E00 | 0100 | 3101 | AE00 |
| 0000212060 | 0004 | 1800 | 0200 | 3101 | C800 | 0012 | 0F00 | 0100 |
| 0000212100 | 3201 | C600 | 0004 | 1800 | 0200 | 3201 | D700 | 0012 |
| 0000212120 | 0F00 | 0100 | 3301 | DE00 | 0004 | 1500 | 0200 | 3301 |
| 0000212140 | E600 | 0012 | 0C00 | 0100 | 3401 | F300 | 0004 | 1500 |
| 0000212160 | 0200 | 3401 | F200 | 0012 | 0E00 | 0100 | 3501 | 0800 |
| 0000212200 | 0005 | 1500 | 0200 | 3501 | 0000 | 0013 | 0C00 | 0100 |
| 0000212220 | 3601 | 1D00 | 0005 | 1600 | 0200 | 3601 | 0C00 | 0013 |
| 0000212240 | 1F00 | 0100 | 3701 | 3300 | 0005 | 1600 | 0200 | 3701 |
| 0000212260 | 2B00 | 0013 | 1F00 | 0100 | 3801 | 4900 | 0005 | 1900 |
| 0000212300 | 0200 | 3801 | 4A00 | 0013 | 5600 | 0100 | 3901 | 6200 |
| 0000212320 | 0005 | 1600 | 0200 | 3901 | A000 | 0013 | 1D00 | 0100 |
| 0000212340 | 3A01 | 7800 | 0005 | 1500 | 0200 | 3A01 | BD00 | 0013 |
| 0000212360 | 0E00 | 0100 | 3C01 | 8D00 | 0005 | 1A00 | 0200 | 3C01 |
| 0000212400 | CB00 | 0013 | AB00 | 0100 | 3D01 | A700 | 0005 | 1D00 |
| 0000212420 | 0200 | 3D01 | 7600 | 0014 | 2400 | 0100 | 3E01 | C400 |
| 0000212440 | 0005 | 1600 | 0200 | 3E01 | 9A00 | 0014 | 0D00 | 0100 |
| 0000212460 | 3F01 | DA00 | 0005 | 1400 | 0200 | 3F01 | A700 | 0014 |
| 0000212500 | 0D00 | 0100 | 4001 | EE00 | 0005 | 1500 | 0200 | 4001 |
| 0000212520 | B400 | 0014 | 0E00 | 0100 | 4101 | 0300 | 0006 | 1600 |
| 0000212540 | 0200 | 4101 | C200 | 0014 | 0F00 | 0100 | 4201 | 1900 |
| 0000212560 | 0006 | 1500 | 0200 | 4201 | D100 | 0014 | 0E00 | 0100 |
| 0000212600 | 4301 | 2E00 | 0006 | 1700 | 0200 | 4301 | DF00 | 0014 |
| 0000212620 | 0E00 | 0100 | 4401 | 4500 | 0006 | 1600 | 0200 | 4401 |
| 0000212640 | ED00 | 0014 | 0F00 | 0100 | 4501 | 5B00 | 0006 | 1400 |
| 0000212660 | 0200 | 4501 | FC00 | 0014 | 0D00 | 0100 | 4601 | 6F00 |
| 0000212700 | 0006 | 1300 | 0200 | 4601 | 0900 | 0015 | 1C00 | 0100 |
| 0000212720 | 4701 | 8200 | 0006 | 1500 | 0200 | 4701 | 2500 | 0015 |
| 0000212740 | 0E00 | 0100 | 4801 | 9700 | 0006 | 1700 | 0200 | 4801 |
| 0000212760 | 3300 | 0015 | 1100 | 0100 | 4901 | AE00 | 0006 | 1900 |
| 0000213000 | 0200 | 4901 | 4400 | 0015 | 0C00 | 0100 | 4A01 | C700 |
| 0000213020 | 0006 | 1400 | 0200 | 4A01 | 5000 | 0015 | 2C00 | 0100 |
| 0000213040 | 4B01 | DB00 | 0006 | 1600 | 0200 | 4B01 | 7C00 | 0015 |
| 0000213060 | 4E00 | 0100 | 4C01 | F100 | 0006 | 1700 | 0200 | 4C01 |
| 0000213100 | CA00 | 0015 | 1100 | 0100 | 4D01 | 0800 | 0007 | 1800 |
| 0000213120 | 0200 | 4D01 | DB00 | 0015 | 0F00 | 0100 | 4E01 | 2000 |
| 0000213140 | 0007 | 1800 | 0200 | 4E01 | EA00 | 0015 | 0E00 | 0100 |
| 0000213160 | 4F01 | 3800 | 0007 | 1800 | 0200 | 4F01 | F800 | 0015 |
| 0000213200 | 0E00 | 010C | 5001 | 5000 | 0007 | 1500 | 0200 | 5001 |
| 0000213220 | 0600 | 0016 | 1F00 | 0100 | 5101 | 6500 | 0007 | 1B00 |
| 0000213240 | 0200 | 5101 | 2500 | 0016 | 1C00 | 0100 | 5201 | 8000 |
| 0000213260 | 0007 | 1600 | 0200 | 5201 | 4100 | 0016 | 2300 | 0100 |
| 0000213300 | 5301 | 9600 | 0007 | 1600 | 0200 | 5301 | 6400 | 0016 |
| 0000213320 | 1100 | 0100 | 5401 | AC00 | 0007 | 1600 | 0200 | 5401 |
| 0000213340 | 7500 | 0016 | 1100 | 0100 | 5501 | C200 | 0007 | 1500 |
| 0000213360 | 0200 | 5501 | 8600 | 0016 | 0F00 | 0100 | 5601 | D700 |
| 0000213400 | 0007 | 1500 | 0200 | 5601 | 9500 | 0016 | 1F00 | 0100 |
| 0000213420 | 5701 | EC00 | 0007 | 1500 | 0200 | 5701 | B400 | 0016 |
| 0000213440 | 0F00 | 0100 | 5801 | 0100 | 0008 | 1500 | 0200 | 5801 |
| 0000213460 | C300 | 0016 | 0F00 | 0100 | 5901 | 1600 | 0008 | 1600 |
| 0000213500 | 0200 | 5901 | D200 | 0016 | 1000 | 0100 | 5A01 | 2C00 |
| 0000213520 | 0008 | 1600 | 0200 | 5A01 | E200 | 0016 | 1000 | 0600 |
| 0000213540 | 0001 | AB00 | 0082 | 4100 | 4E00 | 3042 | 6C32 | 008A |
| 0000213560 | 0000 | | | | | | | |

THU MAR 14 17:44:14 1991 PR.DLL PAGE 62, LINE 3600

0000213561

THU MAR 14 17:44:34 1991 PS2.SCL PAGE 1, LINE 1

| | | | | | | | | |
|---|---|---|---|---|---|---|---|---|
| 0000000000 | 6574 | 706D | 4D20 | 756F | 6573 | 7320 | 6163 | 656C |
| 0000000020 | 6620 | 6E75 | 0D63 | 300A | 0D20 | 300A | 3020 | 0A0D |
| 0000000040 | 2031 | 0D30 | 310A | 3120 | 0A0D | 2032 | 0D31 | 330A |
| 0000000060 | 3220 | 0A0D | 2034 | 0D32 | 310A | 2030 | 0D36 | 310A |
| 0000000100 | 2032 | 0D37 | 310A | 2034 | 0D38 | 310A | 2035 | 0D39 |
| 0000000120 | 310A | 2037 | 3031 | 0A0D | 3833 | 3220 | 0D32 | 340A |
| 0000000140 | 2032 | 3432 | 0A0D | 3634 | 3220 | 0D36 | 340A | 2039 |
| 0000000160 | 3832 | 0A0D | 3335 | 3320 | 0D30 | 350A | 2036 | 3233 |
| 0000000200 | 0A0D | 3036 | 3320 | 0D34 | 360A | 2033 | 3633 | 0A0D |
| 0000000220 | 3736 | 3320 | 0D38 | 370A | 2030 | 3034 | 0A0D | 3437 |
| 0000000240 | 3420 | 0D32 | 370A | 2038 | 3434 | 0A0D | 3138 | 3420 |
| 0000000260 | 0D36 | 380A | 2035 | 3834 | 0A0D | 3838 | 3520 | 0D30 |
| 0000000300 | 390A | 2032 | 3235 | 0A0D | 3539 | 3520 | 0D34 | 390A |
| 0000000320 | 2039 | 3635 | 0A0D | 3031 | 2032 | 3835 | 0A0D | 3031 |
| 0000000340 | 2036 | 3036 | 0A0D | 3131 | 2030 | 3236 | 0A0D | 3131 |
| 0000000360 | 2033 | 3436 | 0A0D | 3131 | 2037 | 3636 | 0A0D | 3231 |
| 0000000400 | 2030 | 3836 | 0A0D | 3231 | 2034 | 3037 | 0A0D | 3231 |
| 0000000420 | 2037 | 3237 | 0A0D | 3331 | 2031 | 3437 | 0A0D | 3331 |
| 0000000440 | 2034 | 3637 | 0A0D | 3331 | 2038 | 3837 | 0A0D | 3431 |
| 0000000460 | 2032 | 3038 | 0A0D | 3431 | 2035 | 3238 | 0A0D | 3431 |
| 0000000500 | 2039 | 3438 | 0A0D | 3531 | 2032 | 3638 | 0A0D | 3531 |
| 0000000520 | 2036 | 3838 | 0A0D | 3531 | 2039 | 3039 | 0A0D | 3631 |
| 0000000540 | 2033 | 3239 | 0A0D | 3631 | 2036 | 3439 | 0A0D | 3731 |
| 0000000560 | 2030 | 3639 | 0A0D | 3731 | 2034 | 3839 | 0A0D | 3731 |
| 0000000600 | 2037 | 3031 | 0D30 | 310A | 3138 | 3120 | 3230 | 0A0D |
| 0000000620 | 3831 | 2034 | 3031 | 0D34 | 310A | 3838 | 3120 | 3630 |
| 0000000640 | 0A0D | 3931 | 2031 | 3031 | 0D38 | 310A | 3539 | 3120 |
| 0000000660 | 3031 | 0A0D | 3931 | 2038 | 3131 | 0D32 | 320A | 3230 |
| 0000000700 | 3120 | 3431 | 0A0D | 3032 | 2036 | 3131 | 0D36 | 320A |
| 0000000720 | 3930 | 3120 | 3831 | 0A0D | 3132 | 2033 | 3231 | 0D30 |
| 0000000740 | 320A | 3631 | 3120 | 3232 | 0A0D | 3232 | 2030 | 3231 |
| 0000000760 | 0D34 | 320A | 3332 | 3120 | 3632 | 0A0D | 3232 | 2037 |
| 0000001000 | 3231 | 0D38 | 320A | 3033 | 3120 | 3033 | 0A0D | 3332 |
| 0000001020 | 2034 | 3331 | 0D32 | 320A | 3833 | 3120 | 3433 | 0A0D |
| 0000001040 | 3332 | 2031 | 3331 | 0D35 | 320A | 3534 | 3120 | 3833 |
| 0000001060 | 0A0D | 3432 | 2038 | 3431 | 0D30 | 320A | 3235 | 3120 |
| 0000001100 | 3234 | 0A0D | 3532 | 2035 | 3431 | 0D34 | 320A | 3935 |
| 0000001120 | 3120 | 3634 | 0A0D | 3632 | 2032 | 3431 | 0D38 | 320A |
| 0000001140 | 3636 | 3120 | 3035 | 0A0D | 3732 | 2030 | 3531 | 0D32 |
| 0000001160 | 320A | 3337 | 3120 | 3435 | 0A0D | 3732 | 2037 | 3531 |
| 0000001200 | 0D36 | 320A | 3038 | 3120 | 3835 | 0A0D | 3832 | 2034 |
| 0000001220 | 3631 | 0D30 | 320A | 3738 | 3120 | 3236 | 0A0D | 3932 |
| 0000001240 | 2031 | 3631 | 0D34 | 320A | 3439 | 3120 | 3636 | 0A0D |
| 0000001260 | 3932 | 2034 | 3631 | 0D36 | 330A | 3230 | 3120 | 3037 |
| 0000001300 | 0A0D | 3033 | 2035 | 3731 | 0D32 | 330A | 3930 | 3120 |
| 0000001320 | 3437 | 0A0D | 3133 | 2032 | 3731 | 0D36 | 330A | 3631 |
| 0000001340 | 3120 | 3837 | 0A0D | 3133 | 2039 | 3831 | 0D30 | 330A |
| 0000001360 | 3332 | 3120 | 3238 | 0A0D | 3233 | 2036 | 3831 | 0D34 |
| 0000001400 | 330A | 3033 | 3120 | 3638 | 0A0D | 3333 | 2034 | 3831 |
| 0000001420 | 0D38 | 330A | 3733 | 3120 | 3039 | 0A0D | 3433 | 2031 |
| 0000001440 | 3931 | 0D32 | 330A | 3434 | 3120 | 3439 | 0A0D | 3433 |
| 0000001460 | 2038 | 3931 | 0D36 | 330A | 3135 | 3120 | 3839 | 0A0D |
| 0000001500 | 3533 | 2035 | 3032 | 0D30 | 330A | 3835 | 3220 | 3230 |
| 0000001520 | 0A0D | 3633 | 2032 | 3032 | 0D34 | 330A | 3636 | 3220 |
| 0000001540 | 3630 | 0A0D | 3633 | 2039 | 3032 | 0D38 | 330A | 3337 |
| 0000001560 | 3220 | 3031 | 0A0D | 3733 | 2036 | 3132 | 0D32 | 330A |
| 0000001600 | 3038 | 3220 | 3431 | 0A0D | 3833 | 2033 | 3132 | 0D35 |
| 0000001620 | 330A | 3738 | 3220 | 3831 | 0A0D | 3933 | 2030 | 3232 |
| 0000001640 | 0D30 | 330A | 3439 | 3220 | 3232 | 0A0D | 3933 | 2038 |

THU MAR 14 17:44:34 1991 PS2.SCL PAGE 2, LINE 60

```
0000001660  3232  0D34  340A  3130  3220  3632  0A0D  3034
0000001700  2035  3232  0D38  340A  3830  3220  3033  0A0D
0000001720  3134  2032  3332  0D32  340A  3531  3220  3433
0000001740  0A0D  3134  2039  3332  0D36  340A  3232  3220
0000001760  3833  0A0D  3234  2036  3432  0D30  340A  3033
0000002000  3220  3234  0A0D  3334  2033  3432  0D34  340A
0000002020  3733  3220  3634  0A0D  3434  2030  3432  0D38
0000002040  340A  3434  3220  3035  0A0D  3434  2037  3532
0000002060  0D32  340A  3135  3220  3435  0A0D
0000002074
```

THU MAR 14 17:44:38 1991 PSUK.KBD PAGE 1, LINE 1

| | | | | | | | | |
|---|---|---|---|---|---|---|---|---|
| 0000000000 | 0D23 | 230A | 5520 | 204B | 656B | 6279 | 616F | 6472 |
| 0000000020 | 2820 | 6F66 | 2072 | 654D | 6174 | 6870 | 726F | 0D29 |
| 0000000040 | 230A | 0A0D | 2023 | 6944 | 6666 | 7265 | 6E65 | 6563 |
| 0000000060 | 6620 | 6F72 | 206D | 6370 | 7375 | 6B2E | 6462 | 0D3A |
| 0000000100 | 230A | 3120 | 2029 | 7449 | 7327 | 6120 | 7320 | 6174 |
| 0000000120 | 646E | 7261 | 2064 | 4B55 | 6B20 | 7965 | 6F62 | 7261 |
| 0000000140 | 2064 | 7728 | 7469 | 2068 | 6874 | 2065 | 7865 | 6563 |
| 0000000160 | 7470 | 6F69 | 206E | 666F | 5C20 | 207C | 656B | 2979 |
| 0000000200 | 0A0D | 2023 | 2932 | 4920 | 2074 | 7375 | 7365 | 6E20 |
| 0000000220 | 7765 | 4120 | 2054 | 6F63 | 6564 | 2073 | 6E28 | 206F |
| 0000000240 | 7830 | 2E45 | 6F20 | 2072 | 7830 | 2E46 | 6320 | 646F |
| 0000000260 | 7365 | 0D29 | 230A | 0A0D | 0A0D | 7830 | 4530 | 6020 |
| 0000000300 | 0909 | 4F4E | 4D52 | 4C41 | 3009 | 4609 | 6172 | 656D |
| 0000000320 | 3009 | 2309 | 4920 | 206E | 7473 | 6E61 | 6164 | 6472 |
| 0000000340 | 5520 | 3A4B | 5C20 | 0D7C | 300A | 3178 | 2036 | 0931 |
| 0000000360 | 4E09 | 524F | 414D | 094C | 0930 | 0921 | 3009 | 0A0D |
| 0000000400 | 7830 | 4531 | 3220 | 0909 | 4F4E | 4D52 | 4C41 | 3009 |
| 0000000420 | 2209 | 0909 | 0930 | 2023 | 5355 | 203A | 2032 | 0D40 |
| 0000000440 | 300A | 3278 | 2036 | 0933 | 4E09 | 524F | 414D | 094C |
| 0000000460 | 0930 | 6F50 | 6E75 | 0964 | 0930 | 2023 | 5355 | 203A |
| 0000000500 | 2033 | 0D23 | 300A | 3278 | 2035 | 0934 | 4E09 | 524F |
| 0000000520 | 414D | 094C | 0930 | 0924 | 3009 | 0A0D | 7830 | 4532 |
| 0000000540 | 3520 | 0909 | 4F4E | 4D52 | 4C41 | 3009 | 2509 | 0909 |
| 0000000560 | 0D30 | 300A | 3378 | 2036 | 0936 | 4E09 | 524F | 414D |
| 0000000600 | 094C | 0930 | 095E | 3009 | 0A0D | 7830 | 4433 | 3720 |
| 0000000620 | 0909 | 4F4E | 4D52 | 4C41 | 3009 | 2609 | 0909 | 0D30 |
| 0000000640 | 300A | 3378 | 2045 | 0938 | 4E09 | 524F | 414D | 094C |
| 0000000660 | 0930 | 092A | 3009 | 0A0D | 7830 | 3634 | 3920 | 0909 |
| 0000000700 | 4F4E | 4D52 | 4C41 | 3009 | 2809 | 0909 | 0D30 | 300A |
| 0000000720 | 3478 | 2035 | 0930 | 4E09 | 524F | 414D | 094C | 0930 |
| 0000000740 | 0929 | 3009 | 0A0D | 7830 | 4534 | 2D20 | 0909 | 4F4E |
| 0000000760 | 4D52 | 4C41 | 3009 | 5F09 | 0909 | 0D30 | 300A | 3578 |
| 0000001000 | 2035 | 093D | 4E09 | 524F | 414D | 094C | 0930 | 092B |
| 0000001020 | 3009 | 0A0D | 7830 | 4335 | 2320 | 0909 | 4F4E | 4D52 |
| 0000001040 | 4C41 | 3009 | 7E09 | 0909 | 0930 | 2023 | 5355 | 203A |
| 0000001060 | 205C | 207C | 202E | 6749 | 6F6E | 6572 | 2064 | 7962 |
| 0000001100 | 4D20 | 7465 | 7061 | 6F68 | 0D72 | 300A | 3678 | 2036 |
| 0000001120 | 5342 | 0909 | 4F4E | 4D52 | 4C41 | 3009 | 4209 | 0953 |
| 0000001140 | 3009 | 0A0D | 7830 | 4430 | 5420 | 6261 | 4E09 | 524F |
| 0000001160 | 414D | 094C | 0930 | 6142 | 6B63 | 6154 | 0962 | 0D30 |
| 0000001200 | 300A | 3178 | 2035 | 0971 | 4E09 | 524F | 414D | 094C |
| 0000001220 | 0930 | 0951 | 3109 | 0A0D | 7830 | 4431 | 7720 | 0909 |
| 0000001240 | 4F4E | 4D52 | 4C41 | 3009 | 5709 | 0909 | 0D31 | 300A |
| 0000001260 | 3278 | 2034 | 0965 | 4E09 | 524F | 414D | 094C | 0930 |
| 0000001300 | 0945 | 3109 | 0A0D | 7830 | 4432 | 7220 | 0909 | 4F4E |
| 0000001320 | 4D52 | 4C41 | 3009 | 5209 | 0909 | 0D31 | 300A | 3278 |
| 0000001340 | 2043 | 0974 | 4E09 | 524F | 414D | 094C | 0930 | 0954 |
| 0000001360 | 3109 | 0A0D | 7830 | 3533 | 7920 | 0909 | 4F4E | 4D52 |
| 0000001400 | 4C41 | 3009 | 5909 | 0909 | 0D31 | 300A | 3378 | 2043 |
| 0000001420 | 0975 | 4E09 | 524F | 414D | 094C | 0930 | 0955 | 3109 |
| 0000001440 | 0A0D | 7830 | 3334 | 6920 | 0909 | 4F4E | 4D52 | 4C41 |
| 0000001460 | 3009 | 4909 | 0909 | 0D31 | 300A | 3478 | 2034 | 096F |
| 0000001500 | 4E09 | 524F | 414D | 094C | 0930 | 094F | 3109 | 0A0D |
| 0000001520 | 7830 | 4434 | 7020 | 0909 | 4F4E | 4D52 | 4C41 | 3009 |
| 0000001540 | 5009 | 0909 | 0D31 | 300A | 3578 | 2034 | 095B | 4E09 |
| 0000001560 | 524F | 414D | 094C | 0930 | 097B | 3009 | 0A0D | 7830 |
| 0000001600 | 4235 | 5D20 | 0909 | 4F4E | 4D52 | 4C41 | 3009 | 7D09 |
| 0000001620 | 0909 | 0D30 | 300A | 3178 | 2031 | 7443 | 6C72 | 5309 |
| 0000001640 | 5145 | 0909 | 0930 | 5F53 | 7443 | 6C72 | 3009 | 0A0D |

THU MAR 14 17:44:38 1991 PSUK.KBD PAGE 2, LINE 60

| | | | | | | | | |
|---|---|---|---|---|---|---|---|---|
| 0000001660 | 7830 | 4331 | 6120 | 0909 | 4F4E | 4D52 | 4C41 | 3009 |
| 0000001700 | 4109 | 0909 | 0D31 | 300A | 3178 | 2042 | 0973 | 4E09 |
| 0000001720 | 524F | 414D | 094C | 0930 | 0953 | 3109 | 0A0D | 7830 |
| 0000001740 | 3332 | 6420 | 0909 | 4F4E | 4D52 | 4C41 | 3009 | 4409 |
| 0000001760 | 0909 | 0D31 | 300A | 3278 | 2042 | 0966 | 4E09 | 524F |
| 0000002000 | 414D | 094C | 0930 | 0946 | 3109 | 0A0D | 7830 | 3433 |
| 0000002020 | 6720 | 0909 | 4F4E | 4D52 | 4C41 | 3009 | 4709 | 0909 |
| 0000002040 | 0D31 | 300A | 3378 | 2033 | 0968 | 4E09 | 524F | 414D |
| 0000002060 | 094C | 0930 | 0948 | 3109 | 0A0D | 7830 | 4233 | 6A20 |
| 0000002100 | 0909 | 4F4E | 4D52 | 4C41 | 3009 | 4A09 | 0909 | 0D31 |
| 0000002120 | 300A | 3478 | 2032 | 096B | 4E09 | 524F | 414D | 094C |
| 0000002140 | 0930 | 094B | 3109 | 0A0D | 7830 | 4234 | 6C20 | 0909 |
| 0000002160 | 4F4E | 4D52 | 4C41 | 3009 | 4C09 | 0909 | 0D31 | 300A |
| 0000002200 | 3478 | 2043 | 093B | 4E09 | 524F | 414D | 094C | 0930 |
| 0000002220 | 093A | 3009 | 0A0D | 7830 | 3235 | 2720 | 0909 | 4F4E |
| 0000002240 | 4D52 | 4C41 | 3009 | 4009 | 0909 | 0930 | 2023 | 5355 |
| 0000002260 | 203A | 2027 | 0D22 | 300A | 3578 | 2041 | 5243 | 0909 |
| 0000002300 | 4F4E | 4D52 | 4C41 | 3109 | 5309 | 435F | 0952 | 0D30 |
| 0000002320 | 300A | 3178 | 2032 | 6853 | 6669 | 0974 | 4853 | 4649 |
| 0000002340 | 0954 | 0930 | 6853 | 6669 | 0974 | 0D30 | 300A | 3178 |
| 0000002360 | 2041 | 097A | 4E09 | 524F | 414D | 094C | 0930 | 095A |
| 0000002400 | 3109 | 0A0D | 7830 | 3232 | 7820 | 0909 | 4F4E | 4D52 |
| 0000002420 | 4C41 | 3009 | 5809 | 0909 | 0D31 | 300A | 3278 | 2031 |
| 0000002440 | 0963 | 4E09 | 524F | 414D | 094C | 0930 | 0943 | 3109 |
| 0000002460 | 0A0D | 7830 | 4132 | 7620 | 0909 | 4F4E | 4D52 | 4C41 |
| 0000002500 | 3009 | 5609 | 0909 | 0D31 | 300A | 3378 | 2032 | 0962 |
| 0000002520 | 4E09 | 524F | 414D | 094C | 0930 | 0942 | 3109 | 0A0D |
| 0000002540 | 7830 | 3133 | 6E20 | 0909 | 4F4E | 4D52 | 4C41 | 3009 |
| 0000002560 | 4E09 | 0909 | 0D31 | 300A | 3378 | 2041 | 096D | 4E09 |
| 0000002600 | 524F | 414D | 094C | 0930 | 094D | 3109 | 0A0D | 7830 |
| 0000002620 | 3134 | 2C20 | 0909 | 4F4E | 4D52 | 4C41 | 3009 | 3C09 |
| 0000002640 | 0909 | 0D30 | 300A | 3478 | 2039 | 092E | 4E09 | 524F |
| 0000002660 | 414D | 094C | 0930 | 093E | 3009 | 0A0D | 7830 | 4134 |
| 0000002700 | 2F20 | 0909 | 4F4E | 4D52 | 4C41 | 3009 | 3F09 | 0909 |
| 0000002720 | 0D30 | 300A | 3578 | 2039 | 6853 | 6669 | 0974 | 4853 |
| 0000002740 | 4649 | 0954 | 0930 | 6853 | 6669 | 0974 | 0D30 | 300A |
| 0000002760 | 3178 | 2039 | 6C41 | 0974 | 4553 | 0951 | 3009 | 5309 |
| 0000003000 | 415F | 746C | 3009 | 0A0D | 7830 | 3932 | 5C20 | 0973 |
| 0000003020 | 4E09 | 524F | 414D | 094C | 0930 | 735C | 0909 | 0D30 |
| 0000003040 | 300A | 3178 | 2034 | 4C43 | 0909 | 4143 | 5350 | 4F4C |
| 0000003060 | 4B43 | 3009 | 4309 | 094C | 0D30 | 300A | 3078 | 2046 |
| 0000003100 | 3246 | 0909 | 4F4E | 4D52 | 4C41 | 3009 | 5309 | 465F |
| 0000003120 | 0932 | 0D30 | 300A | 3178 | 2046 | 3446 | 0909 | 4F4E |
| 0000003140 | 4D52 | 4C41 | 3009 | 5309 | 465F | 0934 | 0D30 | 300A |
| 0000003160 | 3278 | 2046 | 3646 | 0909 | 4F4E | 4D52 | 4C41 | 3009 |
| 0000003200 | 5309 | 465F | 0936 | 0D30 | 300A | 3378 | 2046 | 3846 |
| 0000003220 | 0909 | 4F4E | 4D52 | 4C41 | 3009 | 5309 | 465F | 0938 |
| 0000003240 | 0D30 | 300A | 3478 | 2046 | 3146 | 0930 | 4F4E | 4D52 |
| 0000003260 | 4C41 | 3009 | 5309 | 465F | 3031 | 3009 | 0A0D | 7830 |
| 0000003300 | 3730 | 4620 | 0931 | 4E09 | 524F | 414D | 094C | 0930 |
| 0000003320 | 5F53 | 3146 | 3009 | 0A0D | 7830 | 3731 | 4620 | 0933 |
| 0000003340 | 4E09 | 524F | 414D | 094C | 0930 | 5F53 | 3346 | 3009 |
| 0000003360 | 0A0D | 7830 | 3732 | 4620 | 0935 | 4E09 | 524F | 414D |
| 0000003400 | 094C | 0930 | 5F53 | 3546 | 3009 | 0A0D | 7830 | 3733 |
| 0000003420 | 4620 | 0937 | 4E09 | 524F | 414D | 094C | 0930 | 5F53 |
| 0000003440 | 3746 | 3009 | 0A0D | 7830 | 3734 | 4620 | 0939 | 4E09 |
| 0000003460 | 524F | 414D | 094C | 0930 | 5F53 | 3946 | 3009 | 0A0D |
| 0000003500 | 7830 | 3830 | 4520 | 6373 | 4E09 | 524F | 414D | 094C |
| 0000003520 | 0930 | 5F53 | 7345 | 0963 | 0D30 | 300A | 3678 | 2043 |

THU MAR 14 17:44:38 1991 PSUK.KBD PAGE 3, LINE 119

| | | | | | | | | |
|---|---|---|---|---|---|---|---|---|
| 0000003540 | 504B | 0937 | 4F4E | 4D52 | 4C41 | 3009 | 5309 | 4B5F |
| 0000003560 | 3750 | 3009 | 0A0D | 7830 | 4236 | 4B20 | 3450 | 4E09 |
| 0000003600 | 524F | 414D | 094C | 0930 | 5F53 | 504B | 0934 | 0D30 |
| 0000003620 | 300A | 3678 | 2039 | 504B | 0931 | 4F4E | 4D52 | 4C41 |
| 0000003640 | 3009 | 5309 | 4B5F | 3150 | 3009 | 0A0D | 7830 | 3637 |
| 0000003660 | 4E20 | 6D75 | 6F4C | 6B63 | 4E09 | 524F | 414D | 094C |
| 0000003700 | 0930 | 5F53 | 754E | 4C6D | 636F | 096B | 0D30 | 300A |
| 0000003720 | 3778 | 2035 | 504B | 0938 | 4E09 | 524F | 414D | 094C |
| 0000003740 | 0930 | 5F53 | 504B | 0938 | 3009 | 0A0D | 7830 | 3337 |
| 0000003760 | 4B20 | 3550 | 0909 | 4F4E | 4D52 | 4C41 | 3009 | 5309 |
| 0000004000 | 4B5F | 3550 | 0909 | 0D30 | 300A | 3778 | 2032 | 504B |
| 0000004020 | 0932 | 4E09 | 524F | 414D | 094C | 0930 | 5F53 | 504B |
| 0000004040 | 0932 | 3009 | 0A0D | 7830 | 3037 | 4B20 | 3050 | 0909 |
| 0000004060 | 4F4E | 4D52 | 4C41 | 3009 | 5309 | 4B5F | 3050 | 0909 |
| 0000004100 | 0D30 | 300A | 3578 | 2046 | 6353 | 6C72 | 6F4C | 6B63 |
| 0000004120 | 4E09 | 524F | 414D | 094C | 0930 | 5F53 | 6353 | 6C72 |
| 0000004140 | 6F4C | 6B63 | 3009 | 0A0D | 7830 | 4437 | 4B20 | 3950 |
| 0000004160 | 0909 | 4F4E | 4D52 | 4C41 | 3009 | 5309 | 4B5F | 3950 |
| 0000004200 | 0909 | 0D30 | 300A | 3778 | 2034 | 504B | 0936 | 4E09 |
| 0000004220 | 524F | 414D | 094C | 0930 | 5F53 | 504B | 0936 | 3009 |
| 0000004240 | 0A0D | 7830 | 4137 | 4B20 | 3350 | 0909 | 4F4E | 4D52 |
| 0000004260 | 4C41 | 3009 | 5309 | 4B5F | 3350 | 0909 | 0D30 | 300A |
| 0000004300 | 3778 | 2031 | 504B | 6F64 | 0974 | 4E09 | 524F | 414D |
| 0000004320 | 094C | 0930 | 5F53 | 504B | 6F64 | 0974 | 3009 | 0A0D |
| 0000004340 | 2023 | 7830 | 3438 | 5320 | 7379 | 0909 | 4F4E | 4D52 |
| 0000004360 | 4C41 | 3009 | 5309 | 535F | 7379 | 0909 | 0930 | 2023 |
| 0000004400 | 5458 | 6F20 | 6C6E | 0D79 | 300A | 3778 | 2045 | 504B |
| 0000004420 | 756D | 746C | 0909 | 4F4E | 4D52 | 4C41 | 3009 | 5309 |
| 0000004440 | 4B5F | 6D50 | 6C75 | 0974 | 0930 | 2023 | 5458 | 203A |
| 0000004460 | 7250 | 7374 | 7263 | 0A0D | 7830 | 3438 | 4B20 | 6D50 |
| 0000004500 | 6E69 | 7375 | 4E09 | 524F | 414D | 094C | 0930 | 5F53 |
| 0000004520 | 504B | 696D | 756E | 0973 | 0D30 | 300A | 3778 | 2043 |
| 0000004540 | 504B | 6C70 | 7375 | 0909 | 4F4E | 4D52 | 4C41 | 3009 |
| 0000004560 | 5309 | 4B5F | 7050 | 756C | 0973 | 0D30 | 300A | 3778 |
| 0000004600 | 2037 | 504B | 6C73 | 7361 | 0968 | 4F4E | 4D52 | 4C41 |
| 0000004620 | 3009 | 5309 | 4B5F | 7350 | 616C | 6873 | 3009 | 0A0D |
| 0000004640 | 0A0D | 7830 | 3635 | 4620 | 3131 | 4E09 | 524F | 414D |
| 0000004660 | 094C | 0930 | 5F53 | 3146 | 0931 | 0D30 | 300A | 3578 |
| 0000004700 | 2045 | 3146 | 0932 | 4F4E | 4D52 | 4C41 | 3009 | 5309 |
| 0000004720 | 465F | 3231 | 3009 | 0A0D | 0A0D | 2023 | 7053 | 6365 |
| 0000004740 | 6169 | 206C | 5441 | 6320 | 6168 | 6172 | 7463 | 7265 |
| 0000004760 | 0D73 | 0D0A | 300A | 3978 | 2032 | 4C4E | 535F | 6968 |
| 0000005000 | 7466 | 4E09 | 524F | 414D | 094C | 0930 | 4C4E | 535F |
| 0000005020 | 6968 | 7466 | 3009 | 0A0D | 0A0D | 7830 | 3835 | 4320 |
| 0000005040 | 7274 | 096C | 4553 | 0951 | 3009 | 5309 | 435F | 7274 |
| 0000005060 | 096C | 0909 | 0D30 | 300A | 3378 | 2039 | 6C41 | 0974 |
| 0000005100 | 4553 | 0951 | 3009 | 5309 | 415F | 746C | 0909 | 3009 |
| 0000005120 | 0A0D | 7830 | 3735 | 5020 | 7472 | 6353 | 0972 | 4F4E |
| 0000005140 | 4D52 | 4C41 | 3009 | 5309 | 505F | 7472 | 6353 | 0972 |
| 0000005160 | 3009 | 0A0D | 7830 | 3236 | 5020 | 7561 | 6573 | 4E09 |
| 0000005200 | 524F | 414D | 094C | 0930 | 5F53 | 6150 | 7375 | 0965 |
| 0000005220 | 0909 | 0D30 | 300A | 3678 | 2037 | 6E49 | 6573 | 7472 |
| 0000005240 | 4E09 | 524F | 414D | 094C | 0930 | 5F53 | 6E49 | 6573 |
| 0000005260 | 7472 | 0909 | 0D30 | 300A | 3678 | 2045 | 6F48 | 656D |
| 0000005300 | 4E09 | 524F | 414D | 094C | 0930 | 5F53 | 6F48 | 656D |
| 0000005320 | 0909 | 3009 | 0A0D | 7830 | 4636 | 5020 | 6761 | 5565 |
| 0000005340 | 0970 | 4F4E | 4D52 | 4C41 | 3009 | 5309 | 505F | 6761 |
| 0000005360 | 5565 | 0970 | 3009 | 0A0D | 7830 | 3436 | 4420 | 6C65 |
| 0000005400 | 7465 | 0965 | 4F4E | 4D52 | 4C41 | 3009 | 5309 | 445F |

THU MAR 14 17:44:38 1991 PSUK.KBD PAGE 4, LINE 178

| | | | | | | | | |
|---|---|---|---|---|---|---|---|---|
| 0000005420 | 6C65 | 7465 | 0965 | 3009 | 0A0D | 7830 | 3536 | 4520 |
| 0000005440 | 646E | 4E09 | 524F | 414D | 094C | 0930 | 5F53 | 6E45 |
| 0000005460 | 0964 | 0909 | 0D30 | 300A | 3678 | 2044 | 6150 | 6567 |
| 0000005500 | 6E44 | 4E09 | 524F | 414D | 094C | 0930 | 5F53 | 6150 |
| 0000005520 | 6567 | 7055 | 0909 | 0D30 | 300A | 3678 | 2033 | 7055 |
| 0000005540 | 0909 | 4F4E | 4D52 | 4C41 | 3009 | 5309 | 555F | 0970 |
| 0000005560 | 0909 | 0D30 | 300A | 3678 | 2031 | 654C | 7466 | 4E09 |
| 0000005600 | 524F | 414D | 094C | 0930 | 5F53 | 654C | 7466 | 0909 |
| 0000005620 | 3009 | 0A0D | 7830 | 3036 | 4420 | 776F | 096E | 4F4E |
| 0000005640 | 4D52 | 4C41 | 3009 | 5309 | 445F | 776F | 096E | 0909 |
| 0000005660 | 0D30 | 300A | 3678 | 2041 | 6952 | 6867 | 0974 | 4F4E |
| 0000005700 | 4D52 | 4C41 | 3009 | 5309 | 525F | 6769 | 7468 | 0909 |
| 0000005720 | 3009 | 0A0D | 7830 | 3937 | 4520 | 746E | 7265 | 4E09 |
| 0000005740 | 524F | 414D | 094C | 0931 | 5F53 | 6E45 | 6574 | 0972 |
| 0000005760 | 0909 | 0D30 | 300A | | | | | |
| 0000005765 | | | | | | | | |

THU MAR 14 17:44:44 1991 PSUS.KBD PAGE 1, LINE 1

| | | | | | | | | |
|---|---|---|---|---|---|---|---|---|
| 0000000000 | 7830 | 4530 | 6020 | 0909 | 4F4E | 4D52 | 4C41 | 3009 |
| 0000000020 | 7E09 | 0909 | 0D30 | 300A | 3178 | 2036 | 0931 | 4E09 |
| 0000000040 | 524F | 414D | 094C | 0930 | 0921 | 3009 | 0A0D | 7830 |
| 0000000060 | 4531 | 3220 | 0909 | 4F4E | 4D52 | 4C41 | 3009 | 4009 |
| 0000000100 | 0909 | 0D30 | 300A | 3278 | 2036 | 0933 | 4E09 | 524F |
| 0000000120 | 414D | 094C | 0930 | 0923 | 3009 | 0A0D | 7830 | 3532 |
| 0000000140 | 3420 | 0909 | 4F4E | 4D52 | 4C41 | 3009 | 2409 | 0909 |
| 0000000160 | 0D30 | 300A | 3278 | 2045 | 0935 | 4E09 | 524F | 414D |
| 000000D200 | 094C | 0930 | 0925 | 3009 | 0A0D | 7830 | 3633 | 3620 |
| 0000000220 | 0909 | 4F4E | 4D52 | 4C41 | 3009 | 5E09 | 0909 | 0D30 |
| 0000000240 | 300A | 3378 | 2044 | 0937 | 4E09 | 524F | 414D | 094C |
| 0000000260 | 0930 | 0926 | 3009 | 0A0D | 7830 | 4533 | 3820 | 0909 |
| 0000000300 | 4F4E | 4D52 | 4C41 | 3009 | 2A09 | 0909 | 0D30 | 300A |
| 0000000320 | 3478 | 2036 | 0939 | 4E09 | 524F | 414D | 094C | 0930 |
| 0000000340 | 0928 | 3009 | 0A0D | 7830 | 3534 | 3020 | 0909 | 4F4E |
| 0000000360 | 4D52 | 4C41 | 3009 | 2909 | 0909 | 0D30 | 300A | 3478 |
| 0000000400 | 2045 | 092D | 4E09 | 524F | 414D | 094C | 0930 | 095F |
| 0000000420 | 3009 | 0A0D | 7830 | 3535 | 3D20 | 0909 | 4F4E | 4D52 |
| 0000000440 | 4C41 | 3009 | 2B09 | 0909 | 0D30 | 300A | 3578 | 2043 |
| 0000000460 | 095C | 4E09 | 524F | 414D | 094C | 0930 | 097C | 3009 |
| 0000000500 | 0A0D | 7830 | 3636 | 4220 | 0953 | 4E09 | 524F | 414D |
| 0000000520 | 094C | 0930 | 5342 | 0909 | 0D30 | 300A | 3078 | 2044 |
| 0000000540 | 6154 | 0962 | 4F4E | 4D52 | 4C41 | 3009 | 4209 | 6361 |
| 0000000560 | 546B | 6261 | 3009 | 0A0D | 7830 | 3531 | 7120 | 0909 |
| 0000000600 | 4F4E | 4D52 | 4C41 | 3009 | 5109 | 0909 | 0D31 | 300A |
| 0000000620 | 3178 | 2044 | 0977 | 4E09 | 524F | 414D | 094C | 0930 |
| 0000000640 | 0957 | 3109 | 0A0D | 7830 | 3432 | 6520 | 0909 | 4F4E |
| 0000000660 | 4D52 | 4C41 | 3009 | 4509 | 0909 | 0D31 | 300A | 3278 |
| 0000000700 | 2044 | 0972 | 4E09 | 524F | 414D | 094C | 0930 | 0952 |
| 0000000720 | 3109 | 0A0D | 7830 | 4332 | 7420 | 0909 | 4F4E | 4D52 |
| 0000000740 | 4C41 | 3009 | 5409 | 0909 | 0D31 | 300A | 3378 | 2035 |
| 0000000760 | 0979 | 4E09 | 524F | 414D | 094C | 0930 | 0959 | 3109 |
| 0000001000 | 0A0D | 7830 | 4333 | 7520 | 0909 | 4F4E | 4D52 | 4C41 |
| 0000001020 | 3009 | 5509 | 0909 | 0D31 | 300A | 3478 | 2033 | 0969 |
| 0000001040 | 4E09 | 524F | 414D | 094C | 0930 | 0949 | 3109 | 0A0D |
| 0000001060 | 7830 | 3434 | 6F20 | 0909 | 4F4E | 4D52 | 4C41 | 3009 |
| 0000001100 | 4F09 | 0909 | 0D31 | 300A | 3478 | 2044 | 0970 | 4E09 |
| 0000001120 | 524F | 414D | 094C | 0930 | 0950 | 3109 | 0A0D | 7830 |
| 0000001140 | 3435 | 5B20 | 0909 | 4F4E | 4D52 | 4C41 | 3009 | 7B09 |
| 0000001160 | 0909 | 0D30 | 300A | 3578 | 2042 | 095D | 4E09 | 524F |
| 0000001200 | 414D | 094C | 0930 | 097D | 3009 | 0A0D | 7830 | 3131 |
| 0000001220 | 4320 | 7274 | 096C | 4553 | 0951 | 3009 | 5309 | 435F |
| 0000001240 | 7274 | 096C | 0D30 | 300A | 3178 | 2043 | 0961 | 4E09 |
| 0000001260 | 524F | 414D | 094C | 0930 | 0941 | 3109 | 0A0D | 7830 |
| 0000001300 | 4231 | 7320 | 0909 | 4F4E | 4D52 | 4C41 | 3009 | 5309 |
| 0000001320 | 0909 | 0D31 | 300A | 3278 | 2033 | 0964 | 4E09 | 524F |
| 0000001340 | 414D | 094C | 0930 | 0944 | 3109 | 0A0D | 7830 | 4232 |
| 0000001360 | 6620 | 0909 | 4F4E | 4D52 | 4C41 | 3009 | 4609 | 0909 |
| 0000001400 | 0D31 | 300A | 3378 | 2034 | 0967 | 4E09 | 524F | 414D |
| 0000001420 | 094C | 0930 | 0947 | 3109 | 0A0D | 7830 | 3333 | 6820 |
| 0000001440 | 0909 | 4F4E | 4D52 | 4C41 | 3009 | 4809 | 0909 | 0D31 |
| 0000001460 | 300A | 3378 | 2042 | 096A | 4E09 | 524F | 414D | 094C |
| 0000001500 | 0930 | 094A | 3109 | 0A0D | 7830 | 3234 | 6B20 | 0909 |
| 0000001520 | 4F4E | 4D52 | 4C41 | 3009 | 4B09 | 0909 | 0D31 | 300A |
| 0000001540 | 3478 | 2042 | 096C | 4E09 | 524F | 414D | 094C | 0930 |
| 0000001560 | 094C | 3109 | 0A0D | 7830 | 4334 | 3B20 | 0909 | 4F4E |
| 0000001600 | 4D52 | 4C41 | 3009 | 3A09 | 0909 | 0D30 | 300A | 3578 |
| 0000001620 | 2032 | 0927 | 4E09 | 524F | 414D | 094C | 0930 | 0922 |
| 0000001640 | 3009 | 0A0D | 7830 | 4135 | 4320 | 0952 | 4E09 | 524F |

THU MAR 14 17:44:44 1991 PSUS.KBD PAGE 2, LINE 60

| | | | | | | | | |
|---|---|---|---|---|---|---|---|---|
| 0000001660 | 414D | 094C | 0931 | 5F53 | 5243 | 3009 | 0A0D | 7830 |
| 0000001700 | 3231 | 5320 | 6968 | 7466 | 5309 | 4948 | 5446 | 3009 |
| 0000001720 | 5309 | 6968 | 7466 | 3009 | 0A0D | 7830 | 4131 | 7A20 |
| 0000001740 | 0909 | 4F4E | 4D52 | 4C41 | 3009 | 5A09 | 0909 | 0D31 |
| 0000001760 | 300A | 3278 | 2032 | 0978 | 4E09 | 524F | 414D | 094C |
| 0000002000 | 0930 | 0958 | 3109 | 0A0D | 7830 | 3132 | 6320 | 0909 |
| 0000002020 | 4F4E | 4D52 | 4C41 | 3009 | 4309 | 0909 | 0D31 | 300A |
| 0000002040 | 3278 | 2041 | 0976 | 4E09 | 524F | 414D | 094C | 0930 |
| 0000002060 | 0956 | 3109 | 0A0D | 7830 | 3233 | 6220 | 0909 | 4F4E |
| 0000002100 | 4D52 | 4C41 | 3009 | 4209 | 0909 | 0D31 | 300A | 3378 |
| 0000002120 | 2031 | 096E | 4E09 | 524F | 414D | 094C | 0930 | 094E |
| 0000002140 | 3109 | 0A0D | 7830 | 4133 | 6D20 | 0909 | 4F4E | 4D52 |
| 0000002160 | 4C41 | 3009 | 4D09 | 0909 | 0D31 | 300A | 3478 | 2031 |
| 0000002200 | 092C | 4E09 | 524F | 414D | 094C | 0930 | 093C | 3009 |
| 0000002220 | 0A0D | 7830 | 3934 | 2E20 | 0909 | 4F4E | 4D52 | 4C41 |
| 0000002240 | 3009 | 3E09 | 0909 | 0D30 | 300A | 3478 | 2041 | 092F |
| 0000002260 | 4E09 | 524F | 414D | 094C | 0930 | 093F | 3009 | 0A0D |
| 0000002300 | 7830 | 3935 | 5320 | 6968 | 7466 | 5309 | 4948 | 5446 |
| 0000002320 | 3009 | 5309 | 6968 | 7466 | 3009 | 0A0D | 7830 | 3931 |
| 0000002340 | 4120 | 746C | 5309 | 5145 | 0909 | 0930 | 5F53 | 6C41 |
| 0000002360 | 0974 | 0D30 | 300A | 3278 | 2039 | 735C | 0909 | 4F4E |
| 0000002400 | 4D52 | 4C41 | 3009 | 5C09 | 0973 | 3009 | 0A0D | 7830 |
| 0000002420 | 3835 | 4320 | 094C | 4309 | 5041 | 4C53 | 434F | 094B |
| 0000002440 | 0930 | 4C43 | 3009 | 0A0D | 7830 | 4630 | 4620 | 0932 |
| 0000002460 | 4E09 | 524F | 414D | 094C | 0930 | 5F53 | 3246 | 3009 |
| 0000002500 | 0A0D | 7830 | 4631 | 4620 | 0934 | 4E09 | 524F | 414D |
| 0000002520 | 094C | 0930 | 5F53 | 3446 | 3009 | 0A0D | 7830 | 4632 |
| 0000002540 | 4620 | 0936 | 4E09 | 524F | 414D | 094C | 0930 | 5F53 |
| 0000002560 | 3646 | 3009 | 0A0D | 7830 | 4633 | 4620 | 0938 | 4E09 |
| 0000002600 | 524F | 414D | 094C | 0930 | 5F53 | 3846 | 3009 | 0A0D |
| 0000002620 | 7830 | 4634 | 4620 | 3031 | 4E09 | 524F | 414D | 094C |
| 0000002640 | 0930 | 5F53 | 3146 | 0930 | 0D30 | 300A | 3078 | 2037 |
| 0000002660 | 3146 | 0909 | 4F4E | 4D52 | 4C41 | 3009 | 5309 | 465F |
| 0000002700 | 0931 | 0D30 | 300A | 3178 | 2037 | 3346 | 0909 | 4F4E |
| 0000002720 | 4D52 | 4C41 | 3009 | 5309 | 465F | 0933 | 0D30 | 300A |
| 0000002740 | 3278 | 2037 | 3546 | 0909 | 4F4E | 4D52 | 4C41 | 3009 |
| 0000002760 | 5309 | 465F | 0935 | 0D30 | 300A | 3378 | 2037 | 3746 |
| 0000003000 | 0909 | 4F4E | 4D52 | 4C41 | 3009 | 5309 | 465F | 0937 |
| 0000003020 | 0D30 | 300A | 3478 | 2037 | 3946 | 0909 | 4F4E | 4D52 |
| 0000003040 | 4C41 | 3009 | 5309 | 465F | 0939 | 0D30 | 300A | 3078 |
| 0000003060 | 2038 | 7345 | 0963 | 4F4E | 4D52 | 4C41 | 3009 | 5309 |
| 0000003100 | 455F | 6373 | 3009 | 0A0D | 7830 | 4336 | 4B20 | 3750 |
| 0000003120 | 4E09 | 524F | 414D | 094C | 0930 | 5F53 | 504B | 0937 |
| 0000003140 | 0D30 | 300A | 3678 | 2042 | 504B | 0934 | 4F4E | 4D52 |
| 0000003160 | 4C41 | 3009 | 5309 | 4B5F | 3450 | 3009 | 0A0D | 7830 |
| 0000003200 | 3936 | 4B20 | 3150 | 4E09 | 524F | 414D | 094C | 0930 |
| 0000003220 | 5F53 | 504B | 0931 | 0D30 | 300A | 3778 | 2037 | 754E |
| 0000003240 | 4C6D | 636F | 096B | 4F4E | 4D52 | 4C41 | 3009 | 5309 |
| 0000003260 | 4E5F | 6D75 | 6F4C | 6B63 | 3009 | 0A0D | 7830 | 3537 |
| 0000003300 | 4B20 | 3850 | 0909 | 4F4E | 4D52 | 4C41 | 3009 | 5309 |
| 0000003320 | 4B5F | 3850 | 0909 | 0D30 | 300A | 3778 | 2033 | 504B |
| 0000003340 | 0935 | 4E09 | 524F | 414D | 094C | 0930 | 5F53 | 504B |
| 0000003360 | 0935 | 3009 | 0A0D | 7830 | 3237 | 4B20 | 3250 | 0909 |
| 0000003400 | 4F4E | 4D52 | 4C41 | 3009 | 5309 | 4B5F | 3250 | 0909 |
| 0000003420 | 0D30 | 300A | 3778 | 2030 | 6E49 | 0973 | 4E09 | 524F |
| 0000003440 | 414D | 094C | 0930 | 5F53 | 6E49 | 0973 | 3009 | 0A0D |
| 0000003460 | 7830 | 4635 | 5320 | 7263 | 4C6C | 636F | 096B | 4F4E |
| 0000003500 | 4D52 | 4C41 | 3009 | 5309 | 535F | 7263 | 4C6C | 636F |
| 0000003520 | 096B | 0D30 | 300A | 3778 | 2044 | 504B | 0939 | 4E09 |

THU MAR 14 17:44:44 1991 PSUS.KBD PAGE 3, LINE 119

| | | | | | | | | |
|---|---|---|---|---|---|---|---|---|
| 0000003540 | 524F | 414D | 094C | 0930 | 5F53 | 504B | 0939 | 3009 |
| 0000003560 | 0A0D | 7830 | 3437 | 4B20 | 3650 | 0909 | 4F4E | 4D52 |
| 0000003600 | 4C41 | 3009 | 5309 | 4B5F | 3650 | 0909 | 0D30 | 300A |
| 0000003620 | 3778 | 2041 | 504B | 0933 | 4E09 | 524F | 414D | 094C |
| 0000003640 | 0930 | 5F53 | 504B | 0933 | 3009 | 0AUD | 7830 | 3137 |
| 0000003660 | 4420 | 6C65 | 0909 | 4F4E | 4D52 | 4C41 | 3009 | 5309 |
| 0000003700 | 445F | 6C65 | 0909 | 0D30 | 230A | 3020 | 3878 | 2034 |
| 0000003720 | 7953 | 0973 | 4E09 | 524F | 414D | 094C | 0930 | 5F53 |
| 0000003740 | 7953 | 0973 | 3009 | 2309 | 5820 | 2054 | 6E6F | 796C |
| 0000003760 | 0A0D | 7830 | 4337 | 4B20 | 6D50 | 6C75 | 0974 | 4E09 |
| 0000004000 | 524F | 414D | 094C | 0930 | 5F53 | 504B | 756D | 746C |
| 0000004020 | 3009 | 2309 | 5820 | 3A54 | 5020 | 7472 | 6373 | 0D72 |
| 0000004040 | 300A | 3878 | 2034 | 504B | 696D | 756E | 0973 | 4F4E |
| 0000004060 | 4D52 | 4C41 | 3009 | 5309 | 4B5F | 6D50 | 6E69 | 7375 |
| 0000004100 | 3009 | 0A0D | 7830 | 3937 | 4B20 | 7050 | 756C | 0973 |
| 0000004120 | 4E09 | 524F | 414D | 094C | 0930 | 5F53 | 504B | 6C70 |
| 0000004140 | 7375 | 3009 | 0A0D | 0A0D | 7830 | 3635 | 4620 | 3131 |
| 0000004160 | 4E09 | 524F | 414D | 094C | 0930 | 5F53 | 3146 | 0931 |
| 0000004200 | 0D30 | 300A | 3578 | 2045 | 3146 | 0932 | 4F4E | 4D52 |
| 0000004220 | 4C41 | 3009 | 5309 | 465F | 3231 | 3009 | 0A0D | 0A0D |
| 0000004240 | 2023 | 7053 | 6365 | 6169 | 206C | 5441 | 6320 | 6168 |
| 0000004260 | 6172 | 7463 | 7265 | 0D73 | 0D0A | 300A | 3978 | 2032 |
| 0000004300 | 4C4E | 535F | 6968 | 7466 | 4E09 | 524F | 414D | 094C |
| 0000004320 | 0930 | 4C4E | 535F | 6968 | 7466 | 3009 | 0A0D | 0A0D |
| 0000004340 | 7830 | 3835 | 4320 | 7274 | 096C | 4553 | 0951 | 3009 |
| 0000004360 | 5309 | 435F | 7274 | 096C | 0909 | 0D30 | 300A | 3778 |
| 0000004400 | 2045 | 6C41 | 0974 | 4553 | 0951 | 3009 | 5309 | 415F |
| 0000004420 | 746C | 0909 | 3009 | 0A0D | 7830 | 3735 | 5020 | 7472 |
| 0000004440 | 6353 | 0972 | 4F4E | 4D52 | 4C41 | 3009 | 5309 | 505F |
| 0000004460 | 7472 | 6353 | 0972 | 3009 | 0A0D | 7830 | 3236 | 5020 |
| 0000004500 | 7561 | 6573 | 4E09 | 524F | 414D | 094C | 0930 | 5F53 |
| 0000004520 | 6150 | 7375 | 0965 | 0909 | 0D30 | 300A | 3678 | 2037 |
| 0000004540 | 6E49 | 6573 | 7472 | 4E09 | 524F | 414D | 094C | 0930 |
| 0000004560 | 5F53 | 6E49 | 6573 | 7472 | 0909 | 0D30 | 300A | 3678 |
| 0000004600 | 2045 | 6F48 | 656D | 4E09 | 524F | 414D | 094C | 0930 |
| 0000004620 | 5F53 | 6F48 | 656D | 0909 | 3009 | 0A0D | 7830 | 4636 |
| 0000004640 | 5020 | 6761 | 5565 | 0970 | 4F4E | 4D52 | 4C41 | 3009 |
| 0000004660 | 5309 | 505F | 6761 | 5565 | 0970 | 3009 | 0A0D | 7830 |
| 0000004700 | 3436 | 4420 | 6C65 | 7465 | 0965 | 4F4E | 4D52 | 4C41 |
| 0000004720 | 3009 | 5309 | 445F | 6C65 | 7465 | 0965 | 3009 | 0A0D |
| 0000004740 | 7830 | 3536 | 4520 | 646E | 4E09 | 524F | 414D | 094C |
| 0000004760 | 0930 | 5F53 | 6E45 | 0964 | 0909 | 0D30 | 300A | 3678 |
| 0000005000 | 2044 | 6150 | 6567 | 6E44 | 4E09 | 524F | 414D | 094C |
| 0000005020 | 0930 | 5F53 | 6150 | 6567 | 7055 | 0909 | 0D30 | 300A |
| 0000005040 | 3678 | 2033 | 7055 | 0909 | 4F4E | 4D52 | 4C41 | 3009 |
| 0000005060 | 5309 | 555F | 0970 | 0909 | 0D30 | 300A | 3678 | 2031 |
| 0000005100 | 654C | 7466 | 4E09 | 524F | 414D | 094C | 0930 | 5F53 |
| 0000005120 | 654C | 7466 | 0909 | 3009 | 0A0D | 7830 | 3036 | 4420 |
| 0000005140 | 776F | 096E | 4F4E | 4D52 | 4C41 | 3009 | 5309 | 445F |
| 0000005160 | 776F | 096E | 0909 | 0D30 | 300A | 3678 | 2041 | 6952 |
| 0000005200 | 6867 | 0974 | 4F4E | 4D52 | 4C41 | 3009 | 5309 | 525F |
| 0000005220 | 6769 | 7468 | 0909 | 3009 | 0A0D | 7830 | 3737 | 2F20 |
| 0000005240 | 0909 | 4F4E | 4D52 | 4C41 | 3009 | 2F09 | 0909 | 0909 |
| 0000005260 | 0D30 | 300A | 4478 | 2041 | 6E45 | 6574 | 0972 | 4F4E |
| 0000005300 | 4D52 | 4C41 | 3109 | 5309 | 455F | 746E | 7265 | 0909 |
| 0000005320 | 3009 | 0A0D | | | | | | |
| 0000005324 | | | | | | | | |

THU MAR 14 17:45:10 1991 RV.DLL PAGE 1, LINE 1

| | | | | | | | | |
|---|---|---|---|---|---|---|---|---|
| 0000000000 | 5A4D | 018D | 0040 | 0000 | 0004 | 0000 | FFFF | 0000 |
| 0000000020 | 00B6 | 0000 | 0000 | 0000 | 0040 | 0000 | 0000 | 0000 |
| 0000000040 | 0000 | 0000 | 0000 | 0000 | 0000 | 0000 | 0000 | 0000 |
| 0000000060 | 0000 | 0000 | 0000 | 0000 | 0000 | 0000 | 0080 | 0000 |
| 0000000100 | 1F0E | 0EBA | B400 | CD09 | B821 | 4C01 | 21CD | 6854 |
| 0000000120 | 7369 | 7020 | 6F72 | 7267 | 6D61 | 6320 | 6E61 | 6F6E |
| 0000000140 | 2074 | 7572 | 206E | 6E69 | 4420 | 534F | 6D20 | 646F |
| 0000000160 | 2E65 | 0D0D | 240A | 0000 | 0000 | 0000 | 0000 | 0000 |
| 0000000200 | 454E | 0A05 | 0146 | 000A | 5A1C | EA48 | 8006 | 0005 |
| 0000000220 | 0000 | 0000 | 44A4 | 0001 | 0000 | 0000 | 0005 | 0008 |
| 0000000240 | 0031 | 0040 | 0068 | 0068 | 0097 | 00A7 | 01D0 | 0000 |
| 0000000260 | 0000 | 0004 | 0000 | 0001 | 0000 | 0000 | 0000 | 0000 |
| 0000000300 | 0021 | 650B | 0D00 | 650C | 068E | 00C6 | 0C01 | 0100 |
| 0000000320 | 0000 | 0000 | 0C01 | 0850 | 0000 | 0000 | 0C01 | 0200 |
| 0000000340 | 069B | 15B3 | 0D01 | 1900 | 5202 | 0056 | 1200 | 5252 |
| 0000000360 | 555F | 445F | 5349 | 5F50 | 4C44 | 5F47 | 5250 | 434F |
| 0000000400 | 0001 | 5211 | 445F | 5349 | 4C50 | 5941 | 535F | 5243 |
| 0000000420 | 4545 | 534E | 0002 | 0100 | 0A00 | 1000 | 8900 | 8F00 |
| 0000000440 | 9200 | 9500 | 9C00 | 0000 | 4408 | 534F | 4143 | 4C4C |
| 0000000460 | 0553 | 4D50 | 4957 | 064E | 626C | 7069 | 746D | 5F0D |
| 0000000500 | 5842 | 445F | 4245 | 4755 | 4F4D | 4544 | 5F0D | 5842 |
| 0000000520 | 545F | 4D49 | 5345 | 4F4D | 4544 | 5F09 | 5842 | 425F |
| 0000000540 | 535F | 4749 | 5F0E | 5842 | 445F | 4245 | 4755 | 4E45 |
| 0000000560 | 4554 | 0F52 | 425F | 5F58 | 4544 | 5542 | 5247 | 5445 |
| 0000000600 | 5255 | 0E4E | 425F | 5F58 | 4F56 | 4449 | 4552 | 5554 |
| 0000000620 | 4E52 | 5F0E | 5842 | 445F | 4245 | 4755 | 5250 | 4E49 |
| 0000000640 | 0E54 | 425F | 5F58 | 4150 | 4B43 | 4946 | 544C | 5245 |
| 0000000660 | 4405 | 5F42 | 4950 | 5502 | 0249 | 4849 | 6306 | 7672 |
| 0000000700 | 695F | 0266 | 5250 | 0102 | 4201 | 013B | 0000 | 0000 |
| 0000000720 | 522D | 7065 | 726F | 2074 | 696C | 7262 | 7261 | 2079 |
| 0000000740 | 4328 | 2029 | 654D | 6372 | 7275 | 2079 | 6E49 | 6574 |
| 0000000760 | 4172 | 7463 | 7669 | 2C65 | 3120 | 3939 | 2030 | 0000 |
| 0000001000 | 0000 | 0000 | 0000 | 0000 | 0000 | 0000 | 0000 | 0000 |
| 0000001020 | 581E | 4590 | 8B55 | 1EEC | D88E | EC81 | 0348 | 5657 |
| 0000001040 | B81E | FFFF | D88E | 46C7 | 4FFA | 8C00 | FC5E | 86C7 |
| 0000001060 | FCD0 | 0101 | C02B | 8689 | FCC2 | 8689 | FCC0 | 068E |
| 0000001100 | 145C | 8326 | FF3E | 00FF | 0375 | 1EE9 | FF00 | 8636 |
| 0000001120 | FF00 | 8436 | 8D00 | B886 | 16FC | 9A50 | FFFF | 0000 |
| 0000001140 | C483 | 3D08 | 0000 | 0374 | 0FE9 | 8E00 | 5E06 | 2614 |
| 0000001160 | 3E83 | 01B7 | 7500 | E903 | 003F | 681E | 0056 | 868D |
| 0000001200 | FCC4 | 5016 | 868D | FCB8 | 5016 | 868D | FCD8 | 5016 |
| 0000001220 | 3F6A | 681E | 0088 | 36FF | 0082 | 36FF | 0080 | 36FF |
| 0000001240 | 0086 | 36FF | 0084 | FF9A | 00FF | 8300 | 1EC4 | 8689 |
| 0000001260 | FCD8 | 9689 | FCDA | 0AE9 | 2B00 | 89C0 | DA86 | 89FC |
| 0000001300 | D886 | C7FC | D686 | 00FC | 8E00 | 5C06 | 2614 | 3E83 |
| 0000001320 | 019E | 7500 | E903 | 0054 | BE83 | FCBC | 75FE | E903 |
| 0000001340 | 004A | 76FF | FF08 | 0676 | 76FF | FF0C | 0A76 | 681E |
| 0000001360 | 005D | 868D | FCC4 | 5016 | 868D | FCD8 | 5016 | 868D |
| 0000001400 | FCB8 | 5016 | 681E | 0088 | 496A | 36FF | 0082 | 36FF |
| 0000001420 | 0080 | 36FF | 0086 | 36FF | 0084 | 681E | 0078 | FF68 |
| 0000001440 | 68FF | FFFF | FF9A | 00FF | 8300 | 2EC4 | 868D | FCDC |
| 0000001460 | 4689 | 8CF6 | F856 | 76FF | FFF8 | F676 | 76FF | FF08 |
| 0000001500 | 0676 | 76FF | FF0C | 0A76 | 2E9A | 4902 | 8301 | 0CC4 |
| 0000001520 | 76FF | FFF8 | F676 | 849A | 6239 | 8301 | 04C4 | 8689 |
| 0000001540 | FCD6 | BE83 | FCD6 | 7500 | E903 | 003B | 1A68 | 9A04 |
| 0000001560 | 37DB | FFFF | C483 | 6A02 | 6A01 | 6A64 | 8D00 | D286 |
| 0000001600 | 16FC | 9A50 | FFFF | 0000 | 8689 | FCD6 | BE83 | FCD6 |
| 0000001620 | 7400 | E903 | 0011 | B6FF | FCD4 | B6FF | FCD2 | FF9A |
| 0000001640 | 00FF | 8900 | D686 | 8EFC | 5C06 | 2614 | 3E83 | 0035 |

THU MAR 14 17:45:10 1991 RV.DLL PAGE 2, LINE 60

| | | | | | | | | |
|---|---|---|---|---|---|---|---|---|
| 0000001660 | 7500 | E903 | 000A | BE83 | FCBC | 74FE | E903 | 000F |
| 0000001700 | 068E | 145E | 0326 | FF3E | 00FF | 0375 | 5AE9 | 8B00 |
| 0000001720 | D686 | 89FC | BE86 | FFFC | C2B6 | FFFC | C0B6 | 8DFC |
| 0000001740 | BE86 | 16FC | FF50 | D0B6 | FFFC | FC76 | 76FF | 8DFA |
| 0000001760 | C48E | 16FC | 8D51 | D88E | 16FC | 8D51 | B88E | 16FC |
| 0000002000 | 1E51 | 8868 | 6A00 | FF5C | 8236 | FF00 | 8036 | FF00 |
| 0000002020 | 8636 | FF00 | 8436 | 9A00 | FFFF | 0000 | C483 | 8B28 |
| 0000002040 | BE86 | E9FC | 000A | 07E9 | 8B00 | D686 | E9FC | 0000 |
| 0000002060 | 5E1F | 835F | 02ED | E58B | 5D1F | CA4D | 0008 | 581E |
| 0000002100 | 4590 | 8B55 | 1EEC | D88E | EC81 | 0000 | 5657 | 06C7 |
| 0000002120 | 15BC | 00E2 | 1E8C | 15BE | 06C6 | 05EE | 8B00 | 0846 |
| 0000002140 | 460B | 7506 | E903 | 001E | 5EC4 | 2606 | 3F80 | 7500 |
| 0000002160 | E903 | 0012 | 76FF | FF08 | 0676 | 681E | 05EE | D29A |
| 0000002200 | 9F60 | 8302 | 08C4 | 06C6 | 06EE | 8B00 | 0C46 | 460B |
| 0000002220 | 750A | E903 | 001E | 5EC4 | 260A | 3F80 | 7500 | E903 |
| 0000002240 | 0012 | 76FF | FF0C | 0A76 | 681E | 06EE | D29A | 3860 |
| 0000002260 | 8303 | 08C4 | 1EC4 | 15BC | C626 | 0007 | 1EC4 | 15BC |
| 0000002300 | C626 | 0487 | 0001 | 1EC4 | 15BC | C626 | 0A87 | 0004 |
| 0000002320 | 1EC4 | 15BC | C02B | 8926 | 0287 | 2601 | 8789 | 0100 |
| 0000002340 | 1EC4 | 15BC | C02B | 8926 | 0687 | 2602 | 8789 | 0204 |
| 0000002360 | 1EC4 | 15BC | C626 | 0887 | 0002 | 1EC4 | 15BC | C626 |
| 0000002400 | 0887 | 0003 | 1EC4 | 15BC | C726 | 0887 | 0004 | C700 |
| 0000002420 | EE06 | 0007 | C700 | F006 | 0007 | 8000 | EE3E | 0106 |
| 0000002440 | C01B | C440 | BC1E | 2615 | 8789 | 050A | 1EC4 | 15BC |
| 0000002460 | C626 | 0887 | 0003 | 681E | 00A8 | 468B | 8B0E | 1056 |
| 0000002500 | 0205 | 5200 | 9A50 | 60D2 | 034F | C483 | 1E08 | B868 |
| 0000002520 | 8B00 | 0E46 | 568B | 0510 | 0066 | 5052 | D29A | 6660 |
| 0000002540 | 8303 | 08C4 | 681E | 05EE | 468B | 8B0E | 1056 | CA05 |
| 0000002560 | 5200 | 9A50 | 60D2 | 037D | C483 | 1E08 | C368 | 8B00 |
| 0000002600 | 0E46 | 568B | 0510 | 01CA | 5052 | D29A | 9460 | 8303 |
| 0000002620 | 08C4 | 681E | 06EE | 468B | 8B0E | 1056 | 2E05 | 5202 |
| 0000002640 | 9A50 | 60D2 | 03AB | C483 | 1E08 | CC68 | 8B00 | 0E46 |
| 0000002660 | 568B | 0510 | 024E | 5052 | D29A | C260 | 8303 | 08C4 |
| 0000002700 | 681E | 00D9 | 468B | 8B0E | 1056 | B205 | 5202 | 9A50 |
| 0000002720 | 60D2 | 013B | C483 | C408 | 0E5E | C726 | 1687 | 0103 |
| 0000002740 | C400 | 0E5E | C726 | 1887 | 0103 | 2B00 | A3C0 | 15B6 |
| 0000002760 | B4A3 | 2B15 | A3C0 | 15BA | B8A3 | E915 | 0000 | 5F5E |
| 0000003000 | ED83 | 8B02 | 1FE5 | 4D5D | 1ECB | 9058 | 5545 | EC8B |
| 0000003020 | 8E1E | 81D8 | A6EC | 5703 | C756 | FA86 | FEFE | 8C07 |
| 0000003040 | FC9E | C7FE | C486 | 01FC | 2B01 | 89C0 | B486 | 89FC |
| 0000003060 | B286 | 8EFC | 6006 | 2614 | 3E83 | 00C0 | 7500 | E903 |
| 0000003100 | 001E | 36FF | 00E0 | 36FF | 00DE | 868D | FCAA | 5016 |
| 0000003120 | 4C9A | 0000 | 8300 | 08C4 | 003D | 7400 | E903 | 000F |
| 0000003140 | 068E | 1462 | 8326 | 623E | 0000 | 0375 | 40E9 | 1E00 |
| 0000003160 | 0568 | 8D08 | B886 | 16FC | 8D50 | AA86 | 16FC | 8D50 |
| 0000003200 | F486 | 16FD | 6850 | 00B2 | 681E | 08D8 | 36FF | 00DC |
| 0000003220 | 36FF | 00DA | 36FF | 00E0 | 36FF | 00DE | 979A | 0000 |
| 0000003240 | 8300 | 1EC4 | 8689 | FDF4 | 9689 | FDF6 | 0AE9 | 2B00 |
| 0000003260 | 89C0 | F686 | 89FD | F486 | C7FD | F286 | 00FD | 8E00 |
| 0000003300 | 6006 | 2614 | 3E83 | 042A | 7500 | E903 | 004C | BE83 |
| 0000003320 | FCAE | 75FE | E903 | 0042 | 76FF | 1E06 | 0C68 | 8D08 |
| 0000003340 | B886 | 16FC | 8D50 | F486 | 16FD | 8D50 | AA86 | 16FC |
| 0000003360 | 1E50 | D868 | 6808 | 00C6 | 36FF | 00DC | 36FF | 00DA |
| 0000003400 | 36FF | 00E0 | 36FF | 00DE | 681E | 0818 | 0F68 | 6801 |
| 0000003420 | 0112 | 159A | 0001 | 8300 | 28C4 | 86C7 | FEF8 | 0000 |
| 0000003440 | 5EC4 | 2608 | BF80 | 02B2 | 7500 | E903 | 0037 | 868D |
| 0000003460 | FCD2 | 5016 | 681E | 081F | 4E8B | 8B08 | 0A56 | C181 |
| 0000003500 | 02B2 | 5152 | 2E9A | 5063 | 8305 | 0CC4 | 868D | FCD2 |
| 0000003520 | 5016 | 468B | 8B08 | 0A56 | B205 | 5202 | 9A50 | 60D2 |

THU MAR 14 17:45:10 1991 RV.DLL PAGE 3, LINE 119

| | | | | | | | | |
|---|---|---|---|---|---|---|---|---|
| 0000003540 | 058E | C483 | 8308 | 067E | 7501 | E903 | 05D2 | 7E83 |
| 0000003560 | 0A06 | 0375 | C9E9 | C405 | 085E | 8026 | CABF | 0000 |
| 0000003600 | 0374 | 09E9 | C700 | F286 | 1FFD | E904 | 0022 | 5C6A |
| 0000003620 | 468B | 8B08 | 0A56 | 2E05 | 5202 | 9A50 | 63B8 | 05E9 |
| 0000003640 | C483 | 0B06 | 75D0 | E903 | 0006 | 86C7 | FDF2 | 0422 |
| 0000003660 | BE83 | FDF2 | 7400 | E903 | 04DD | 016A | FF9A | 00FF |
| 0000003700 | C400 | 085E | 8026 | 2EBF | 0102 | C01B | 8940 | B686 |
| 0000003720 | C4FC | BC1E | 8B15 | B686 | 26FC | 8739 | 050A | 0374 |
| 0000003740 | 54E9 | 8B00 | 0846 | 568B | 050A | 00CA | 5052 | 36FF |
| 0000003760 | 15BE | 36FF | 15BC | 089A | 1A61 | 8306 | 08C4 | 003D |
| 0000004000 | 7400 | E903 | 0031 | BE83 | FCB6 | 7500 | E903 | 0487 |
| 0000004020 | 468B | 8B08 | 0A56 | 2E05 | 5202 | A150 | 15BC | 168B |
| 0000004040 | 15BE | 0405 | 5201 | 9A50 | 6108 | 0271 | C483 | 3D08 |
| 0000004060 | 0000 | 0375 | 60E9 | 8E04 | 6006 | 2614 | 3E83 | 08B2 |
| 0000004100 | 7500 | E903 | 0049 | BE83 | FCAE | 75FE | E903 | 003F |
| 0000004120 | 681E | 0822 | 868D | FCB8 | 5016 | 868D | FDF4 | 5016 |
| 0000004140 | 868D | FCAA | 5016 | 681E | 08D8 | EB68 | FF00 | DC36 |
| 0000004160 | FF00 | DA36 | FF00 | E036 | FF00 | DE36 | 1E00 | 2F68 |
| 0000004200 | 6808 | 08FE | 0168 | 9A09 | 0904 | 0000 | C483 | 8B26 |
| 0000004220 | 0846 | 568B | 050A | 00CA | 5052 | 36FF | 15BE | 36FF |
| 0000004240 | 15BC | D29A | B460 | 8306 | 08C4 | 468B | 8B08 | 0A56 |
| 0000004260 | 2E05 | 5202 | A150 | 15BC | 168B | 15BE | 0405 | 5201 |
| 0000004300 | 9A50 | 60D2 | 0741 | C483 | C408 | BC1E | 2615 | 87C7 |
| 0000004320 | 0408 | 0000 | 868B | FCB6 | 1EC4 | 15BC | 8926 | 0A87 |
| 0000004340 | C705 | F206 | 0007 | C700 | F406 | 0007 | C700 | F886 |
| 0000004360 | 01FE | C400 | BC1E | 2615 | 878B | 0206 | 0B26 | 0487 |
| 0000004400 | 7502 | E903 | 0025 | 1EC4 | 15BC | FF26 | 06B7 | 2602 |
| 0000004420 | B7FF | 0204 | 006A | FF9A | 00FF | C400 | BC1E | 2B15 |
| 0000004440 | 26C0 | 8789 | 0206 | 8926 | 0487 | C402 | 085E | 8026 |
| 0000004460 | 2EBF | 0002 | 0374 | 20E9 | 8B00 | 0846 | 568B | 050A |
| 0000004500 | 00CA | 5052 | 681E | 0837 | 868D | FCF2 | 5016 | BA9A |
| 0000004520 | 6C62 | 8307 | 0CC4 | 28E9 | 8B00 | 0846 | 568B | 050A |
| 0000004540 | 022E | 5052 | 468B | 8B08 | 0A56 | CA05 | 5200 | 1E50 |
| 0000004560 | 3D68 | 8D08 | F286 | 16FC | 9A50 | 62BA | 07D2 | C483 |
| 0000004600 | 2B10 | 89C0 | CC86 | 89FC | CA86 | 8DFC | F286 | 16FC |
| 0000004620 | 8D50 | 6286 | 16FC | 9A50 | FFFF | 0000 | 8689 | FDF2 |
| 0000004640 | BE83 | FDF2 | 7400 | E903 | 0017 | B6FF | FC64 | B6FF |
| 0000004660 | FC62 | 868D | FCCA | 5016 | FF9A | 00FF | 8900 | F286 |
| 0000004700 | 83FD | F2BE | 00FD | 0374 | 20E9 | 6A00 | 6A00 | FF00 |
| 0000004720 | 64B6 | FFFC | 62B6 | FFFC | CCB6 | FFFC | CAB6 | 9AFC |
| 0000004740 | 1D12 | 0829 | C483 | 890C | F286 | 83FD | F2BE | 00FD |
| 0000004760 | 0374 | 7EE9 | 8302 | B6BE | 00FC | 0375 | 19E9 | 8B00 |
| 0000005000 | 6286 | 8BFC | 6496 | C4FC | BC1E | 2615 | 8789 | 0204 |
| 0000005020 | 8926 | 0697 | E902 | 0016 | 868B | FC62 | 968B | FC64 |
| 0000005040 | 1EC4 | 15BC | 8926 | 0087 | 2601 | 9789 | 0102 | 36FF |
| 0000005060 | 15B6 | 36FF | 15B4 | 1E9A | 395E | 8308 | 04C4 | 36FF |
| 0000005100 | 15BA | 36FF | 15B8 | 1E9A | 785E | 8308 | 04C4 | C02B |
| 0000005120 | B6A3 | A315 | 15B4 | C02B | BAA3 | A315 | 15B8 | 06C7 |
| 0000005140 | 07F6 | 0000 | 06C7 | 07FA | 0000 | 06C7 | 07F8 | 0000 |
| 0000005160 | 468B | 8B08 | 0A56 | CA05 | 5200 | 1E50 | 4368 | 8D08 |
| 0000005200 | F886 | 16FD | 9A50 | 62BA | 08A2 | C483 | 1E0C | B468 |
| 0000005220 | 1E15 | FA68 | FF07 | B6B6 | 8DFC | F886 | 16FD | FF50 |
| 0000005240 | 64B6 | FFFC | 62B6 | FFFC | CCB6 | FFFC | CAB6 | 9AFC |
| 0000005260 | 2037 | 0975 | C483 | 8916 | F286 | 8EFD | 6006 | 2614 |
| 0000005300 | 3E83 | 09D0 | 7500 | E903 | 0051 | BE83 | FCAE | 75FE |
| 0000005320 | E903 | 0047 | 36FF | 07FA | B6FF | FDF2 | 681E | 0849 |
| 0000005340 | 868D | FCB8 | 5016 | 868D | FDF4 | 5016 | 868D | FCAA |
| 0000005360 | 5016 | 681E | 08D8 | 2768 | FF01 | DC36 | FF00 | DA36 |
| 0000005400 | FF00 | E036 | FF00 | DE36 | 1E00 | 6168 | 6808 | 04FD |

THU MAR 14 17:45:10 1991 RV.DLL PAGE 4, LINE 178

| | | | | | | | | |
|---|---|---|---|---|---|---|---|---|
| 0000005420 | 0068 | 9A05 | 0503 | 0000 | C483 | 832A | F2BE | 00FD |
| 0000005440 | 0374 | 14E9 | C701 | C686 | 00FC | E900 | 0004 | 86FF |
| 0000005460 | FCC6 | FAA1 | 3907 | C686 | 7CFC | E903 | 0016 | 868B |
| 0000005500 | FCB6 | B669 | FCC6 | 0132 | 1EC4 | 15B4 | 8926 | 2A80 |
| 0000005520 | E901 | FFDA | BE83 | FCB6 | 7500 | E903 | 0045 | 681E |
| 0000005540 | 15B8 | 681E | 07F8 | 36FF | 15B6 | 36FF | 15B4 | 36FF |
| 0000005560 | 07FA | B6FF | FC64 | B6FF | FC62 | B6FF | FCCC | B6FF |
| 0000005600 | FCCA | 0B9A | AE26 | 8309 | 16C4 | 8689 | FDF2 | BE83 |
| 0000005620 | FDF2 | 1B01 | F7C0 | A3D8 | 07F2 | 86C7 | FDF2 | 0000 |
| 0000005640 | 36E9 | 1E00 | B868 | 1E15 | F868 | FF07 | 64B6 | FFFC |
| 0000005660 | 62B6 | FFFC | CCB6 | FFFC | CAB6 | 9AFC | 2B2A | 0537 |
| 0000005700 | C483 | 8910 | F286 | 83FD | F2BE | 01FD | C01B | D8F7 |
| 0000005720 | F4A3 | C707 | F286 | 00FD | 8E00 | 6006 | 2614 | 3E83 |
| 0000005740 | 04B6 | 7500 | E903 | 0051 | BE83 | FCAE | 75FE | E903 |
| 0000005760 | 0047 | 36FF | 07F8 | B6FF | FDF2 | 681E | 0869 | 868D |
| 0000006000 | FCB8 | 5016 | 868D | FDF4 | 5016 | 868D | FCAA | 5016 |
| 0000006020 | 681E | 08D8 | 4668 | FF01 | DC36 | FF00 | DA36 | FF00 |
| 0000006040 | E036 | FF00 | DE36 | 1E00 | 8168 | 6808 | 0672 | 7568 |
| 0000006060 | 9A06 | 0678 | 0000 | C483 | 832A | F2BE | 00FD | 0374 |
| 0000006100 | 30E9 | 8300 | B6BE | 00FC | 0375 | 26E9 | 6A00 | FF06 |
| 0000006120 | CCB6 | FFFC | CAB6 | 9AFC | 1E94 | 0695 | C483 | 8906 |
| 0000006140 | F286 | 83FD | F2BE | 00FD | 0374 | 06E9 | C700 | F006 |
| 0000006160 | 0107 | 8B00 | CC86 | 0BFC | CA86 | 75FC | E903 | 0017 |
| 0000006200 | B6FF | FCCC | B6FF | FCCA | FF9A | 00FF | 2B00 | 89C0 |
| 0000006220 | CC86 | 89FC | CA86 | 83FC | F2BE | 00FD | 0374 | 9FE9 |
| 0000006240 | C400 | 085E | 8326 | 18BF | 0003 | 0375 | 37E9 | 8300 |
| 0000006260 | B6BE | 00FC | 0375 | 13E9 | 8300 | F23E | 0007 | 0374 |
| 0000006300 | 09E9 | C700 | F286 | 25FD | E904 | 001A | BE83 | FCB6 |
| 0000006320 | 7400 | E903 | 0010 | 3E83 | 07F4 | 7400 | E903 | 0006 |
| 0000006340 | 86C7 | FDF2 | 0426 | BE83 | FDF2 | 7400 | E903 | 0050 |
| 0000006360 | 5EC4 | 2608 | BF83 | 0318 | 7500 | E903 | 0006 | F8A1 |
| 0000006400 | E907 | 0003 | FAA1 | A307 | 07F6 | 5EC4 | 2608 | BF83 |
| 0000006420 | 0318 | 7500 | E903 | 000A | B8A1 | 8B15 | BA16 | E915 |
| 0000006440 | 0007 | B4A1 | 8B15 | B616 | A315 | 15C0 | 1689 | 15C2 |
| 0000006460 | 3E83 | 07F6 | 7400 | E903 | 0006 | 86C7 | FDF2 | 041E |
| 0000006500 | BE83 | FDF2 | 7400 | E903 | 04BF | 468B | E906 | 0494 |
| 0000006520 | 1EC4 | 15BC | C626 | 0887 | 0003 | ACE9 | 8304 | 067E |
| 0000006540 | 7405 | E903 | 0006 | 00B8 | E900 | 0004 | F6A1 | 4807 |
| 0000006560 | 8689 | FCC8 | 92E9 | C404 | BC1E | 2615 | 878B | 0408 |
| 0000006600 | 8689 | FCC8 | 5EC4 | 2608 | BF80 | 02B2 | 7400 | E903 |
| 0000006620 | 0019 | 7E83 | 0706 | 0374 | 06E9 | A100 | 07F6 | 03E9 |
| 0000006640 | B800 | FFFF | 8689 | FCC8 | 50E9 | A100 | 15BC | 168B |
| 0000006660 | 15BE | 0805 | 5202 | 8B50 | 0846 | 568B | 050A | 02B2 |
| 0000006700 | 5052 | 089A | E261 | 830B | 08C4 | 003D | 7500 | E903 |
| 0000006720 | 0029 | 868D | FCC8 | 5016 | 36FF | 07F6 | 36FF | 15C2 |
| 0000006740 | 36FF | 15C0 | 468B | 8B08 | 0A56 | B205 | 5202 | 9A50 |
| 0000006760 | 3198 | 0C87 | C483 | 890E | F286 | 83FD | F2BE | 00FD |
| 0000007000 | 0374 | 4FE9 | 8300 | 067E | 7407 | E903 | 0013 | BE83 |
| 0000007020 | FCC8 | 7400 | E903 | 0009 | 86C7 | FDF2 | 042B | 33E9 |
| 0000007040 | 8300 | 067E | 7408 | E903 | 0016 | F6A1 | 2B07 | C886 |
| 0000007060 | 48FC | 0374 | 09E9 | C700 | F286 | 2CFD | E904 | 0014 |
| 0000007100 | 7E83 | 0706 | 0374 | 07E9 | FF00 | C88E | E9FC | 0004 |
| 0000007120 | 86FF | FCC8 | B2E9 | C703 | C886 | 00FC | C700 | F886 |
| 0000007140 | 01FE | E900 | 03A3 | 5EC4 | 2608 | BF80 | 02B2 | 7400 |
| 0000007160 | E903 | 0009 | 86C7 | FCC8 | 0000 | 60E9 | A100 | 15BC |
| 0000007200 | 168B | 15BE | 0805 | 5202 | 8B50 | 0846 | 568B | 050A |
| 0000007220 | 02B2 | 5052 | 089A | C461 | 830C | 08C4 | 003D | 7400 |
| 0000007240 | E903 | 0010 | 1EC4 | 15BC | 8B26 | 0887 | 8904 | C886 |
| 0000007260 | E9FC | 0029 | 868D | FCC8 | 5016 | 36FF | 07F6 | 36FF |

THU MAR 14 17:45:10 1991 RV.DLL PAGE 5, LINE 237

| | | | | | | | | |
|---|---|---|---|---|---|---|---|---|
| 0000007300 | 15C2 | 36FF | 15C0 | 468B | 8B08 | 0A56 | B205 | 5202 |
| 0000007320 | 9A50 | 3198 | 0CEA | C483 | 890E | F286 | E9FD | 0329 |
| 0000007340 | BCA1 | 8B15 | BE16 | 0515 | 0208 | 5052 | 468B | 8B08 |
| 0000007360 | 0A56 | B205 | 5202 | 9A50 | 6108 | 0D27 | C483 | 3D08 |
| 0000007400 | 0000 | 0374 | 10E9 | C400 | BC1E | 2615 | 878B | 0408 |
| 0000007420 | 8689 | FCC8 | 29E9 | 8D00 | C886 | 16FC | FF50 | F636 |
| 0000007440 | FF07 | C236 | FF15 | C036 | 8B15 | 0846 | 568B | 050A |
| 0000007460 | 02B2 | 5052 | 989A | 4A31 | 830A | 0EC4 | 8689 | FDF2 |
| 0000007500 | BE83 | FDF2 | 7400 | E903 | 0117 | 8669 | FCC8 | 0132 |
| 0000007520 | 0603 | 15C0 | 168B | 15C2 | 5052 | 868D | FC66 | 5016 |
| 0000007540 | D29A | 7160 | 830D | 08C4 | 8669 | FCC8 | 0132 | 0603 |
| 0000007560 | 15C0 | 168B | 15C2 | 5052 | 868D | FC86 | 5016 | D29A |
| 0000007600 | 1A60 | 830F | 08C4 | B669 | FCC8 | 0132 | 1EC4 | 15C0 |
| 0000007620 | 8B26 | 2040 | 8B26 | 2250 | 8689 | FCA6 | 9689 | FCA8 |
| 0000007640 | C02B | 8689 | FC60 | 8689 | FC5E | 406A | 868D | FC66 |
| 0000007660 | 5016 | 446A | 868D | FC5E | 5016 | 7A9A | 000E | 8900 |
| 0000007700 | F286 | 83FD | F2BE | 00FD | 0374 | 76E9 | C400 | 5E9E |
| 0000007720 | 26FC | 7F83 | 0014 | 0375 | 68E9 | C400 | 5E9E | 26FC |
| 0000007740 | 478B | 8914 | F286 | 8EFD | 6006 | 2614 | 3E83 | 1025 |
| 0000007760 | 7500 | E903 | 004D | BE83 | FCAE | 75FE | E903 | 0043 |
| 0000010000 | B6FF | FDF2 | 681E | 0889 | 868D | FCB8 | 5016 | 868D |
| 0000010020 | FDF4 | 5016 | 868D | FCAA | 5016 | 681E | 08D8 | DF68 |
| 0000010040 | FF01 | DC36 | FF00 | DA36 | FF00 | E036 | FF00 | DE36 |
| 0000010060 | 1E00 | B068 | 6808 | 1079 | 7C68 | 9A10 | 107F | 0000 |
| 0000010100 | C483 | 8328 | F2BE | 00FD | 0374 | 0EE9 | C400 | 5E9E |
| 0000010120 | 26FC | 7F83 | 0014 | 0375 | 06E9 | C700 | F286 | 1DFD |
| 0000010140 | FF04 | 60B6 | FFFC | 5EB6 | 9AFC | 0EA9 | 0000 | 98E9 |
| 0000010160 | 2B01 | 89C0 | 6086 | 89FC | 5E86 | 6AFC | 6A3F | 6A00 |
| 0000010200 | 6A00 | 8D00 | 5E86 | 16FC | 9A50 | FFFF | 0000 | 8689 |
| 0000010220 | FDF2 | BE83 | FDF2 | 7400 | E903 | 000E | 9EC4 | FC5E |
| 0000010240 | 8326 | 147F | 7500 | E903 | 0006 | 86C7 | FDF2 | 041C |
| 0000010260 | B6FF | FC60 | B6FF | FC5E | FF9A | 00FF | C400 | BC1E |
| 0000010300 | 2615 | 878B | 0102 | 0B26 | 0087 | 7501 | E903 | 0015 |
| 0000010320 | 1EC4 | 15BC | FF26 | 02B7 | 2601 | B7FF | 0100 | 006A |
| 0000010340 | F99A | 000E | C400 | BC1E | 2615 | 878B | 0206 | 0B26 |
| 0000010360 | 0487 | 7502 | E903 | 0015 | 1EC4 | 15BC | FF26 | 06B7 |
| 0000010400 | 2602 | B7FF | 0204 | 006A | 079A | 0007 | 8000 | EE3E |
| 0000010420 | 0005 | 0375 | 56E9 | 8300 | EE3E | 0007 | 0375 | 0EE9 |
| 0000010440 | 6A00 | 1E05 | EE68 | 9A05 | 1E94 | 0F48 | C483 | 8306 |
| 0000010460 | F03E | 0007 | 0375 | 34E9 | 8000 | EE3E | 0006 | 0375 |
| 0000010500 | 2AE9 | 1E00 | EE68 | 1E06 | EE68 | 1E05 | B868 | 8D08 |
| 0000010520 | FE86 | 16FE | 9A50 | 62BA | 0F58 | C483 | 6A10 | 8D06 |
| 0000010540 | FE86 | 16FE | 9A50 | 1E94 | 0F74 | C483 | A106 | 15B6 |
| 0000010560 | 060B | 15B4 | 0375 | 10E9 | FF00 | B636 | FF15 | B436 |
| 0000010600 | 9A15 | 5E1E | 0F90 | C483 | A104 | 15BA | 060B | 15B8 |
| 0000010620 | 0375 | 10E9 | FF00 | BA36 | FF15 | B836 | 9A15 | 5E1E |
| 0000010640 | 10C1 | C483 | 6A04 | 6A01 | 6A64 | 8D00 | CE86 | 16FC |
| 0000010660 | 9A50 | 0174 | 0000 | 8689 | FDF2 | BE83 | FDF2 | 7400 |
| 0000010700 | E903 | 0011 | B6FF | FCD0 | B6FF | FCCE | 8F9A | 0001 |
| 0000010720 | 8900 | F286 | E9FD | 0031 | 86C7 | FDF2 | 0018 | 28E9 |
| 0000010740 | E900 | 0025 | 3D48 | 0009 | 0376 | EBE9 | D1FF | 93E0 |
| 0000010760 | FF2E | E5A7 | 400F | 560B | D00C | 470C | 4D0C | 4D0B |
| 0000011000 | 670B | 670B | C80B | 610F | 830E | F2BE | 00FD | 0374 |
| 0000011020 | 53E9 | 8302 | 067E | 7503 | E903 | 024A | 7E83 | 0106 |
| 0000011040 | 0375 | 41E9 | 8302 | 067E | 750A | E903 | 0238 | 068E |
| 0000011060 | 1460 | 8326 | 2E3E | 0006 | 0375 | 59E9 | 8300 | AEBE |
| 0000011100 | FEFC | 0375 | 4FE9 | 6900 | C886 | 32FC | 0301 | C006 |
| 0000011120 | 8B15 | C216 | 5215 | 1E50 | BE68 | 8D08 | B886 | 16FC |
| 0000011140 | 8D50 | F486 | 16FD | 8D50 | AA86 | 16FC | 1E50 | D868 |

THU MAR 14 17:45:10 1991 RV.DLL PAGE 6, LINE 296

| | | | | | | | | |
|---|---|---|---|---|---|---|---|---|
| 0000011160 | 6808 | 021D | 36FF | 00DC | 36FF | 00DA | 36FF | 00E0 |
| 0000011200 | 36FF | 00DE | 681E | 08CF | 1C68 | 680A | DA1F | 229A |
| 0000011220 | 000A | 8300 | 2AC4 | BE83 | FEF8 | 7400 | E903 | 0044 |
| 0000011240 | 1EC4 | 15BC | 868B | FCC8 | 3926 | 0887 | 7404 | E903 |
| 0000011260 | 002C | 8669 | FCC8 | 0132 | 0603 | 15C0 | 168B | 15C2 |
| 0000011300 | 5052 | BCA1 | 8B15 | BE16 | 0515 | 0308 | 5052 | 089A |
| 0000011320 | B561 | 830B | 08C4 | 003D | 7500 | E903 | 0006 | 86C7 |
| 0000011340 | FEF8 | 0001 | B669 | FCC8 | 0132 | 1EC4 | 15C0 | 8326 |
| 0000011360 | 2AB8 | 0001 | 0375 | 1EE9 | 6900 | C8B6 | 32FC | C401 |
| 0000011400 | C01E | 2615 | B883 | 012C | 7400 | E903 | 0009 | 86C7 |
| 0000011420 | FC5C | 0001 | 06E9 | C700 | 5C86 | 00FC | 6900 | C8B6 |
| 0000011440 | 32FC | C401 | C01E | 2615 | B0FF | 012A | B6FF | FC5C |
| 0000011460 | B669 | FCC8 | 0132 | 1EC4 | 15C0 | 8326 | 2CB8 | 0101 |
| 0000011500 | C01B | D8F7 | 9A50 | 428B | 11A2 | C483 | C406 | 085E |
| 0000011520 | 8026 | 2EBF | 0002 | 0375 | 63E9 | 6900 | C8B6 | 32FC |
| 0000011540 | C401 | C01E | 2615 | B883 | 012A | 7500 | E903 | 004E |
| 0000011560 | B669 | FCC8 | 0132 | 1EC4 | 15C0 | 8326 | 2CB8 | 0001 |
| 0000011600 | 0375 | 06E9 | B800 | 0003 | 08E9 | C400 | 085E | 8B26 |
| 0000011620 | 1687 | 8903 | 5A86 | FFFC | F8B6 | FFFE | 5AB6 | FFFC |
| 0000011640 | C8B6 | FFFC | F636 | FF07 | C236 | FF15 | C036 | 9A15 |
| 0000011660 | 1313 | 11CB | C483 | 890C | F286 | E9FD | 0026 | BE83 |
| 0000011700 | FEF8 | 7500 | E903 | 001C | B6FF | FCC8 | 36FF | 07F6 |
| 0000011720 | 36FF | 15C2 | 36FF | 15C0 | C79A | FD18 | 8311 | 08C4 |
| 0000011740 | 8689 | FDF2 | BE83 | FDF2 | 7400 | E903 | 0024 | 8669 |
| 0000011760 | FCC8 | 0132 | 0603 | 15C0 | 168B | 15C2 | 5052 | BCA1 |
| 0000012000 | 8B15 | BE16 | 0515 | 0308 | 5052 | D29A | 2060 | 8312 |
| 0000012020 | 08C4 | 8669 | FCC8 | 0132 | 0603 | 15C0 | 168B | 15C2 |
| 0000012040 | 5052 | 468B | 8B08 | 0A56 | B205 | 5202 | 9A50 | 60D2 |
| 0000012060 | 1244 | C483 | 6908 | C886 | 32FC | 0301 | C006 | 8B15 |
| 0000012100 | C216 | 5215 | A150 | 15BC | 168B | 15BE | 0805 | 5202 |
| 0000012120 | 9A50 | 60D2 | 0D53 | C483 | 8B08 | C886 | C4FC | BC1E |
| 0000012140 | 2615 | 8789 | 0408 | 7E83 | 0A06 | 0375 | 07E9 | 6A00 |
| 0000012160 | 9A00 | 05AD | 0000 | BE83 | FDF2 | 7500 | E903 | 000C |
| 0000012200 | B6FF | FDF2 | DB9A | 3837 | 8311 | 02C4 | 068E | 1460 |
| 0000012220 | 8326 | DE3E | 000D | 0375 | 0AE9 | 8300 | AEBE | FEFC |
| 0000012240 | 0374 | 0FE9 | 8E00 | 6206 | 2614 | 3E83 | 0457 | 7500 |
| 0000012260 | E903 | 005D | 868B | FDF2 | 8689 | FCB0 | B6FF | FCB4 |
| 0000012300 | B6FF | FCB2 | 868D | FCB0 | 5016 | B6FF | FCC4 | B6FF |
| 0000012320 | FEFC | B6FF | FEFA | 8E8D | FCB8 | 5116 | 8E8D | FDF4 |
| 0000012340 | 5116 | 8E8D | FCAA | 5116 | 681E | 08D8 | 4B68 | FF02 |
| 0000012360 | DC36 | FF00 | DA36 | FF00 | E036 | FF00 | DE36 | 9A00 |
| 0000012400 | 0208 | 0000 | C483 | 8B28 | B086 | E9FC | 000A | 07E2 |
| 0000012420 | 8B00 | F286 | E9FD | 0000 | 5F5E | ED83 | 8B02 | 1FE5 |
| 0000012440 | 4D5D | 1ECB | 9058 | 5545 | EC8B | 8E1E | 81D8 | 50EC |
| 0000012460 | 5703 | C756 | FA46 | 08DF | 5E8C | C7FC | CC86 | 01FE |
| 0000012500 | 2B01 | 89C0 | 0A86 | 89FE | 0886 | 8EFE | 6006 | 2614 |
| 0000012520 | 3E83 | 13C8 | 7500 | E903 | 001E | 36FF | 00E0 | 36FF |
| 0000012540 | 00DE | 868D | FE00 | 5016 | 419A | 0004 | 8300 | 08C4 |
| 0000012560 | 003D | 7400 | E903 | 000F | 068E | 1462 | 8326 | 9C3E |
| 0000012600 | 0012 | 0375 | 3DE9 | 1E00 | E668 | 8D08 | 0C86 | 16FE |
| 0000012620 | 8D50 | 0086 | 16FE | 8D50 | F246 | 5016 | 6D68 | 1E02 |
| 0000012640 | BE68 | FF09 | DC36 | FF00 | DA36 | FF00 | E036 | FF00 |
| 0000012660 | DE36 | 9A00 | 048D | 0000 | C483 | 891E | F246 | 5689 |
| 0000012700 | E9F4 | 0008 | C02B | 4689 | 89F4 | F246 | 46C7 | 00F0 |
| 0000012720 | 8E00 | 6006 | 2614 | 3E83 | 1283 | 7500 | E903 | 0051 |
| 0000012740 | BE83 | FE04 | 75FE | E903 | 0047 | 76FF | FF10 | 0E76 |
| 0000012760 | 76FF | 1E0C | ED68 | 8D08 | 0C86 | 16FE | 8D50 | F246 |
| 0000013000 | 5016 | 868D | FE00 | 5016 | 681E | 09BE | 8168 | FF02 |
| 0000013020 | DC36 | FF00 | DA36 | FF00 | E036 | FF00 | DE36 | 1E00 |

THU MAR 14 17:45:10 1991 RV.DLL PAGE 7, LINE 355

| | | | | | | | | |
|---|---|---|---|---|---|---|---|---|
| 0000013040 | 1768 | 6809 | 0E26 | 2968 | 9A0E | 0E2C | 0000 | C483 |
| 0000013060 | 832C | 107E | 7500 | E903 | 034B | 4669 | 320C | 0301 |
| 0000013100 | 0646 | 568B | 5208 | 8D50 | CE86 | 16FE | 9A50 | 60D2 |
| 0000013120 | 1454 | C483 | 8D08 | CE86 | 16FE | 8D50 | BC8E | 16FD |
| 0000013140 | 9A51 | 60D2 | 1468 | C483 | 8D08 | CE86 | 16FE | 8D50 |
| 0000013160 | DC86 | 16FD | 9A50 | 60D2 | 14DA | C483 | 6908 | 0C76 |
| 0000013200 | 0132 | 5EC4 | 2606 | 408B | 2620 | 508B | 8922 | FC86 |
| 0000013220 | 89FD | FE96 | 69FD | 0C46 | 0132 | 4603 | 8B06 | 0856 |
| 0000013240 | 2405 | 8900 | B686 | 89FC | B896 | 69FC | 0C76 | 0132 |
| 0000013260 | 5EC4 | 2606 | 808B | 0128 | 4689 | C4F6 | B69E | 26FC |
| 0000013300 | 3F80 | 7500 | E903 | 00E8 | 7E83 | 00F6 | 0377 | DFE9 |
| 0000013320 | 8D00 | F846 | 5016 | 468D | 16EE | FF50 | 0C76 | 76FF |
| 0000013340 | FF0A | 0876 | 76FF | 9A06 | 3338 | 14F0 | C483 | FF10 |
| 0000013360 | B8B6 | FFFC | B6B6 | 8DFC | BA86 | 16FC | 9A50 | 60D2 |
| 0000013400 | 14FE | C483 | 8D08 | BA86 | 16FC | 9A50 | 6132 | 151A |
| 0000013420 | C483 | 3D04 | 0003 | 0377 | 41E9 | 6A00 | 1E03 | 1E68 |
| 0000013440 | 8D09 | BA86 | 16FC | 9A50 | 6132 | 152A | C483 | 8B04 |
| 0000013460 | 8DF0 | B782 | 16FC | 9A50 | 614A | 1540 | C483 | 3D0A |
| 0000013500 | 0000 | 0374 | 15E9 | 8D00 | BA86 | 16FC | 9A50 | 6132 |
| 0000013520 | 1574 | C483 | 8B04 | C6F0 | B782 | 00FC | 7E83 | 01EE |
| 0000013540 | 037F | 27E9 | FF00 | F676 | 868D | FCBA | 5016 | 76FF |
| 0000013560 | 8DF8 | CE86 | 16FE | 1E50 | 2268 | 8D09 | EE86 | 16FE |
| 0000013600 | 9A50 | 62BA | 1598 | C483 | E914 | 0021 | 76FF | 8DF6 |
| 0000013620 | BA86 | 16FC | 8D50 | CE86 | 16FE | 1E50 | 3B68 | 8D09 |
| 0000013640 | EE86 | 16FE | 9A50 | 62BA | 15B3 | C483 | E912 | 0018 |
| 0000013660 | 868D | FECE | 5016 | 681E | 0950 | 868D | FEEE | 5016 |
| 0000013700 | BA9A | C162 | 8315 | 0CC4 | 868D | FEEE | 5016 | 469A |
| 0000013720 | EA41 | 8315 | 04C4 | 9EC4 | FCB6 | 8026 | 003F | 0375 |
| 0000013740 | 6CE9 | FF00 | B8B6 | FFFC | B6B6 | A1FC | 15BC | 168B |
| 0000013760 | 15BE | 0A05 | 5204 | 9A50 | 6108 | 1604 | C483 | 3D08 |
| 0000014000 | 0000 | 0375 | 48E9 | 6A00 | FF05 | B8B6 | FFFC | B6B6 |
| 0000014020 | 9AFC | 1E94 | 162C | C483 | 8906 | F046 | 7E83 | 00F0 |
| 0000014040 | 0374 | 25E9 | FF00 | B8B6 | FFFC | B6B6 | A1FC | 15BC |
| 0000014060 | 168B | 15BE | 0A05 | 5204 | 9A50 | 60D2 | 16B8 | C483 |
| 0000014100 | C708 | EE06 | 0107 | E900 | 0005 | 46C7 | 08F0 | 8300 |
| 0000014120 | F07E | 7400 | E903 | 012D | 7669 | 320C | C401 | 065E |
| 0000014140 | FF26 | 26B0 | 2601 | B0FF | 0124 | 006A | 006A | 786A |
| 0000014160 | 7669 | 320C | C401 | 065E | FF26 | 2270 | FF26 | 2070 |
| 0000014200 | 868D | FE18 | 5016 | FF9A | 00FF | 8900 | BA86 | 83FD |
| 0000014220 | BABE | 00FD | 0374 | 34E9 | 8B00 | 6886 | 8BFE | 6A96 |
| 0000014240 | 69FE | 0C76 | 0132 | 5EC4 | 2606 | 9039 | 0130 | 037E |
| 0000014260 | 1AE9 | 7D00 | E903 | 000A | 3926 | 2E80 | 7601 | E903 |
| 0000014300 | 000B | 2D68 | 9A04 | 37DB | 1277 | C483 | 2B02 | 89C0 |
| 0000014320 | B486 | 89FC | B286 | 6AFC | 8D3A | BCB6 | 16FD | 6A50 |
| 0000014340 | 8D44 | B286 | 16FC | 9A50 | 1798 | 0000 | 4689 | 83F0 |
| 0000014360 | F07E | 7400 | E903 | 0073 | 9EC4 | FCB2 | 8326 | 147F |
| 0000014400 | 7500 | E903 | 0065 | 9EC4 | FCB2 | 8B26 | 1447 | 4689 |
| 0000014420 | 8EF0 | 6006 | 2614 | 3E83 | 1342 | 7500 | E903 | 004B |
| 0000014440 | BE83 | FE04 | 75FE | E903 | 0041 | 76FF | 1EF0 | 5C68 |
| 0000014460 | 8D09 | 0C86 | 16FE | 8D50 | F246 | 5016 | 868D | FE00 |
| 0000014500 | 5016 | 681E | 09BE | C968 | FF02 | DC36 | FF00 | DA36 |
| 0000014520 | FF00 | E036 | FF00 | DE36 | 1E00 | 8268 | 6809 | 1414 |
| 0000014540 | 1768 | 9A14 | 141A | 0000 | C483 | 8328 | F07E | F501 |
| 0000014560 | C01B | 1B25 | 8904 | F046 | B6FF | FCB4 | B6FF | FCB2 |
| 0000014600 | 5A9A | 000E | 8300 | F07E | 7400 | E903 | 00B7 | C02B |
| 0000014620 | 8689 | FCB4 | 8689 | FCB2 | 396A | 468D | 160E | 6A50 |
| 0000014640 | 8D02 | B286 | 16FC | 9A50 | 0DAB | 0000 | 4689 | 83F0 |
| 0000014660 | F07E | 7400 | E903 | 0073 | 9EC4 | FCB2 | 8326 | 147F |
| 0000014700 | 7500 | E903 | 0065 | 9EC4 | FCB2 | 8B26 | 1447 | 4689 |

THU MAR 14 17:45:10 1991 RV.DLL PAGE 8, LINE 414

| | | | | | | | | |
|---|---|---|---|---|---|---|---|---|
| 0000014720 | 8EF0 | 6006 | 2614 | 3E83 | 183C | 7500 | E903 | 004B |
| 0000014740 | BE83 | FE04 | 75FE | E903 | 0041 | 76FF | 1EF0 | 8A68 |
| 0000014760 | 8D09 | 0C86 | 16FE | 8D50 | F246 | 5016 | 868D | FE00 |
| 0000015000 | 5016 | 681E | 09BE | DA68 | FF02 | DC36 | FF00 | DA36 |
| 0000015020 | FF00 | E036 | FF00 | DE36 | 1E00 | B668 | 6809 | 174E |
| 0000015040 | 5168 | 9A17 | 1754 | 0000 | C483 | 8328 | F07E | F501 |
| 0000015060 | C01B | 1B25 | 8904 | F046 | B6FF | FCB4 | B6FF | FCB2 |
| 0000015100 | 719A | 0017 | 8E00 | 6006 | 2614 | 3E83 | 1708 | 7500 |
| 0000015120 | E903 | 000A | BE83 | FE04 | 74FE | E903 | 000F | 068E |
| 0000015140 | 1462 | 8326 | 6F3E | 0013 | 0375 | 59F9 | 8B00 | F046 |
| 0000015160 | 8689 | FE06 | B6FF | FE0A | B6FF | FE08 | 868D | FE06 |
| 0000015200 | 5016 | B6FF | FECC | 76FF | FFFC | FA76 | 8E8D | FE0C |
| 0000015220 | 5116 | 4E8D | 16F2 | 8D51 | 008E | 16FE | 1E51 | BE68 |
| 0000015240 | 6809 | 02E1 | 36FF | 00DC | 36FF | 00DA | 36FF | 00E0 |
| 0000015260 | 36FF | 00DE | F09A | 0012 | 8300 | 28C4 | 868B | FE06 |
| 0000015300 | 09E9 | E900 | 0006 | 468B | E9F0 | 0000 | 5F5E | ED83 |
| 0000015320 | 8B02 | 1FE5 | 4D5D | 1ECB | 9058 | 5545 | EC8B | 8E1E |
| 0000015340 | 81D8 | B8EC | 5702 | C756 | FA46 | 09CB | 5E8C | C7FC |
| 0000015360 | CC86 | 01FE | 2B01 | 89C0 | BE86 | 89FE | BC86 | 8EFE |
| 0000015400 | 6006 | 2614 | 3E83 | 197C | 7500 | E903 | 001E | 36FF |
| 0000015420 | 00E0 | 36FF | 00DE | 868D | FEB4 | 5016 | 599A | 0013 |
| 0000015440 | 8300 | 08C4 | 003D | 7400 | E903 | 000F | 068E | 1462 |
| 0000015460 | 8326 | 553E | 0018 | 0375 | 3DE9 | 1E00 | D268 | 8D09 |
| 0000015500 | C086 | 16FE | 8D50 | B486 | 16FE | 8D50 | F246 | 5016 |
| 0000015520 | FA68 | 1E02 | 5668 | FF0A | DC36 | FF00 | DA36 | FF00 |
| 0000015540 | E036 | FF00 | DE36 | 9A00 | 13A4 | 0000 | C483 | 891E |
| 0000015560 | F246 | 5689 | E9F4 | 0008 | C02B | 4689 | 89F4 | F246 |
| 0000015600 | 46C7 | 00F0 | 8E00 | 6006 | 2614 | 3E83 | 1C12 | 7500 |
| 0000015620 | E903 | 004B | BE83 | FEB8 | 75FE | E903 | 0041 | 76FF |
| 0000015640 | 1E0C | D968 | 8D09 | C086 | 16FE | 8D50 | F246 | 5016 |
| 0000015660 | 868D | FEB4 | 5016 | 681E | 0A56 | 0B68 | FF03 | DC36 |
| 0000015700 | FF00 | DA36 | FF00 | E036 | FF00 | DE36 | 1E00 | E368 |
| 0000015720 | 6809 | 1C58 | 5B68 | 9A1C | 1C5E | 0000 | C483 | 6928 |
| 0000015740 | 0C46 | 0132 | 4603 | 8B06 | 0856 | 5052 | 868D | FECE |
| 0000015760 | 5016 | D29A | FF60 | 8319 | 08C4 | 86C7 | FE52 | 0001 |
| 0000016000 | 868D | FECE | 5016 | 868D | FE54 | 5016 | D29A | 5960 |
| 0000016020 | 831A | 08C4 | 4669 | 320C | 0301 | 0646 | 568B | 0508 |
| 0000016040 | 0024 | 8689 | FD4E | 9689 | FD50 | 7669 | 320C | C401 |
| 0000016060 | 065E | 8B26 | 2880 | 8901 | F646 | 9EC4 | FD4E | 8026 |
| 0000016100 | 003F | 0375 | E8E9 | 8300 | F67E | 7700 | E903 | 00DF |
| 0000016120 | 468D | 16F8 | 8D50 | EE46 | 5016 | 76FF | FF0C | 0A76 |
| 0000016140 | 76FF | FF08 | 0676 | 389A | 6F33 | 831A | 10C4 | B6FF |
| 0000016160 | FD50 | B6FF | FD4E | 868D | FD52 | 5016 | D29A | 7D60 |
| 0000016200 | 831A | 08C4 | 868D | FD52 | 5016 | 329A | 9961 | 831A |
| 0000016220 | 04C4 | 033D | 7700 | E903 | 0041 | 036A | 681E | 09EA |
| 0000016240 | 868D | FD52 | 5016 | 329A | A961 | 831A | 04C4 | F08B |
| 0000016260 | 828D | FD4F | 5016 | 4A9A | BF61 | 831A | 0AC4 | 003D |
| 0000016300 | 7400 | E903 | 0015 | 868D | FD52 | 5016 | 329A | F361 |
| 0000016320 | 831A | 04C4 | F08B | 82C6 | FD4F | 8300 | EE7E | 7F01 |
| 0000016340 | E903 | 0027 | 76FF | 8DF6 | 5286 | 16FD | FF50 | F876 |
| 0000016360 | 868D | FECE | 5016 | 681E | 09EE | 868D | FEEE | 5016 |
| 0000016400 | BA9A | 1762 | 831B | 14C4 | 21E9 | FF00 | F676 | 868D |
| 0000016420 | FD52 | 5016 | 868D | FECE | 5016 | 681E | 0A07 | 868D |
| 0000016440 | FEEE | 5016 | BA9A | 3262 | 831B | 12C4 | 18E9 | 8D00 |
| 0000016460 | CE86 | 16FE | 1E50 | 1C68 | 8D0A | EE86 | 16FE | 9A50 |
| 0000016500 | 62BA | 1B40 | C483 | 8D0C | EE86 | 16FE | 9A50 | 4146 |
| 0000016520 | 1B69 | C483 | C404 | 4E9E | 26FD | 3F80 | 7500 | E903 |
| 0000016540 | 006C | B6FF | FD50 | B6FF | FD4E | BCA1 | 8B15 | BE16 |
| 0000016560 | 0515 | 040A | 5052 | 089A | 8361 | 831B | 08C4 | 003D |

THU MAR 14 17:45:10 1991 RV.DLL PAGE 9, LINE 473

| | | | | | | | | |
|---|---|---|---|---|---|---|---|---|
| 0000016600 | 7500 | E903 | 0048 | 056A | B6FF | FD50 | B6FF | FD4E |
| 0000016620 | 949A | AB1E | 831B | 06C4 | 4689 | 83F0 | F07E | 7400 |
| 0000016640 | E903 | 0025 | B6FF | FD50 | B6FF | FD4E | BCA1 | 8B15 |
| 0000016660 | BE16 | 0515 | 040A | 5052 | D29A | 4060 | 8314 | 08C4 |
| 0000016700 | 06C7 | 07EE | 0001 | 05E9 | C700 | F046 | 0008 | 7E83 |
| 0000016720 | 00F0 | 0374 | B8E9 | 2B00 | 89C0 | 4C86 | 89FD | 4A86 |
| 0000016740 | 6AFD | 8D38 | 5286 | 16FE | 6A50 | 8D62 | 4A86 | 16FD |
| 0000016760 | 9A50 | 16D8 | 0000 | 4689 | 83F0 | F07E | 7400 | E903 |
| 0000017000 | 0073 | 9EC4 | FD4A | 8326 | 147F | 7500 | E903 | 0065 |
| 0000017020 | 9EC4 | FD4A | 8B26 | 1447 | 4689 | 8EF0 | 6006 | 2614 |
| 0000017040 | 3E83 | 1C86 | 7500 | E903 | 004B | BE83 | FEB8 | 75FE |
| 0000017060 | E903 | 0041 | 76FF | 1EF0 | 2868 | 8D0A | C086 | 16FE |
| 0000017100 | 8D50 | F246 | 5016 | 868D | FEB4 | 5016 | 681E | 0A56 |
| 0000017120 | 4468 | FF03 | DC36 | FF00 | DA36 | FF00 | E036 | FF00 |
| 0000017140 | DE36 | 1E00 | 4E68 | 680A | 180E | 1168 | 9A18 | 1814 |
| 0000017160 | 0000 | C483 | 8328 | F07E | F501 | C01B | 1B25 | 8904 |
| 0000017200 | F046 | B6FF | FD4C | B6FF | FD4A | 319A | 0018 | 8E00 |
| 0000017220 | 6006 | 2614 | 3E83 | 17C8 | 7500 | E903 | 000A | BE83 |
| 0000017240 | FEB8 | 74FE | E903 | 000F | 068E | 1462 | 8326 | 233E |
| 0000017260 | 0019 | 0375 | 59E9 | 8B00 | F046 | 8689 | FEBA | B6FF |
| 0000017300 | FEBE | B6FF | FEBC | 868D | FEBA | 5016 | B6FF | FECC |
| 0000017320 | 76FF | FFFC | FA76 | 8E8D | FEC0 | 5116 | 4E8D | 16F2 |
| 0000017340 | 8D51 | B48E | 16FE | 1E51 | 5668 | 680A | 034B | 36FF |
| 0000017360 | 00DC | 36FF | 00DA | 36FF | 00E0 | 36FF | 00DE | A59A |
| 0000017400 | 0018 | 8300 | 28C4 | 868B | FEBA | 09E9 | E900 | 0006 |
| 0000017420 | 468B | E9F0 | 0000 | 5F5E | ED83 | 8B02 | 1FE5 | 4D5D |
| 0000017440 | 00CB | 581E | 4590 | 8B55 | 1EEC | D88E | EC81 | 002A |
| 0000017460 | 5657 | 46C7 | 73FA | 8C0A | FC5E | 46C7 | 01F2 | 2B01 |
| 0000017500 | 89C0 | E446 | 4689 | 8EE2 | 6406 | 2614 | 3E83 | 18F6 |
| 0000017520 | 7500 | E903 | 001D | 36FF | 0A88 | 36FF | 0A86 | 468D |
| 0000017540 | 16DA | 9A50 | 190D | 0000 | C483 | 3D08 | 0000 | 0374 |
| 0000017560 | 0FE9 | 8E00 | 6606 | 2614 | 3E83 | 1E2B | 7500 | E903 |
| 0000017600 | 003A | 681E | 0A7A | 468D | 16E6 | 8D50 | DA46 | 5016 |
| 0000017620 | 468D | 16F6 | 6A50 | 1E53 | 8E68 | FF0A | [illegible]36 | FF0A |
| 0000017640 | 8236 | FF0A | 8836 | FF0A | 8636 | 9A0A | 1958 | 0000 |
| 0000017660 | C483 | 891E | F646 | 5689 | E9F8 | 0008 | C02B | 4689 |
| 0000017700 | 89F8 | F646 | 46C7 | 00F4 | 8B00 | 0A46 | 568B | 890C |
| 0000017720 | D646 | 5689 | FFD8 | 0876 | 76FF | 8D06 | D646 | 5016 |
| 0000017740 | 006A | 006A | 006A | 006A | FF9A | 00FF | 8900 | F446 |
| 0000017760 | 7E83 | 00F4 | 0375 | 08E9 | C700 | F446 | 0420 | 1BE9 |
| 0000020000 | 8B00 | 1046 | 460B | 750E | E903 | 0010 | 468B | 8BD6 |
| 0000020020 | D856 | 5EC4 | 260E | 0789 | 8926 | 0257 | 068E | 1464 |
| 0000020040 | 8326 | 3E3E | 001D | 0375 | 09E9 | 8300 | DE7E | 74FE |
| 0000020060 | E903 | 000F | 068E | 1466 | 8326 | 9F3E | 001C | 0375 |
| 0000020100 | 50E9 | 8B00 | F446 | 4689 | FFE0 | E476 | 76FF | 8DE2 |
| 0000020120 | E046 | 5016 | 76FF | FFF2 | FC76 | 76FF | 8DFA | E64E |
| 0000020140 | 5116 | 4E8D | 16F6 | 8D51 | DA4E | 5116 | 681E | 0A8E |
| 0000020160 | 696A | 36FF | 0A84 | 36FF | 0A82 | 36FF | 0A88 | 36FF |
| 0000020200 | 0A86 | EF9A | 001C | 8300 | 28C4 | 468B | E9E0 | 0009 |
| 0000020220 | 06E9 | 8B00 | F446 | 00E9 | 5E00 | 835F | 02ED | E58B |
| 0000020240 | 5D1F | CB4D | 581E | 4590 | 8B55 | 1EEC | D88E | EC81 |
| 0000020260 | 002A | 5657 | 46C7 | 9BFA | 8C0A | FC5E | 46C7 | 01F2 |
| 0000020300 | 2B01 | 89C0 | E446 | 4689 | 8EE2 | 6406 | 2614 | 3E83 |
| 0000020320 | 1FB5 | 7500 | E903 | 001D | 36FF | 0A88 | 36FF | 0A86 |
| 0000020340 | 468D | 16DA | 9A50 | 1D54 | 0000 | C483 | 3D08 | 0000 |
| 0000020360 | 0374 | 0FE9 | 8E00 | 6606 | 2614 | 3E83 | 1FCD | 7500 |
| 0000020400 | E903 | 003A | 681E | 0AA2 | 468D | 16E6 | 8D50 | DA46 |
| 0000020420 | 5016 | 468D | 16F6 | 6A50 | 1E7F | AA68 | FF0A | 8436 |
| 0000020440 | FF0A | 8236 | FF0A | 8836 | FF0A | 8636 | 9A0A | 1D9C |

THU MAR 14 17:45:10 1991 RV.DLL PAGE 10, LINE 532

| | | | | | | | | |
|---|---|---|---|---|---|---|---|---|
| 0000020460 | 0000 | C483 | 891E | F646 | 5689 | E9F8 | 0008 | C02B |
| 0000020500 | 4689 | 89F8 | F646 | 46C7 | 00F4 | 8B00 | 0846 | 460B |
| 0000020520 | 7506 | E903 | 000C | 5EC4 | 2606 | 3F80 | 7400 | E903 |
| 0000020540 | 0008 | 46C7 | 13F4 | E900 | 0054 | C02B | 4689 | 89D8 |
| 0000020560 | D646 | 76FF | FF0A | 0876 | 76FF | FF06 | 0876 | 76FF |
| 0000020600 | 9A06 | 6132 | 19E5 | C483 | 4004 | 8D50 | D646 | 5016 |
| 0000020620 | E29A | 001B | 8900 | F446 | 7E83 | 00F4 | 0374 | 0DE9 |
| 0000020640 | C400 | D65E | 8326 | 147F | 7500 | E903 | 0005 | 46C7 |
| 0000020660 | 01F4 | FF00 | D876 | 76FF | 9AD6 | 1C7B | 0000 | 068E |
| 0000020700 | 1464 | 8326 | 133E | 001E | 0375 | 09E9 | 8300 | DE7E |
| 0000020720 | 74FE | E903 | 000F | 068E | 1466 | 8326 | 6A3E | 001D |
| 0000020740 | 0375 | 51E9 | 8B00 | F446 | 4689 | FFE0 | E476 | 76FF |
| 0000020760 | 8DE2 | E046 | 5016 | 76FF | FFF2 | FC76 | 76FF | 8DFA |
| 0000021000 | E64E | 5116 | 4E8D | 16F6 | 8D51 | DA4E | 5116 | 681E |
| 0000021020 | 0AAA | 9668 | FF00 | 8436 | FF0A | 8236 | FF0A | 8836 |
| 0000021040 | FF0A | 8636 | 9A0A | 1E73 | 0000 | C483 | 8B28 | E046 |
| 0000021060 | 09E9 | E900 | 0006 | 468B | E9F4 | 0000 | 5F5E | ED83 |
| 0000021100 | 8B02 | 1FE5 | 4D5D | 1ECB | 9058 | 5545 | EC8B | 8E1E |
| 0000021120 | 81D8 | F8EC | 5701 | C756 | F646 | 0AB6 | 5E8C | C7F8 |
| 0000021140 | DE86 | 01FE | 2B01 | 89C0 | 1886 | 89FE | 1686 | 8EFE |
| 0000021160 | 6406 | 2614 | 3E83 | 1EC0 | 7500 | E903 | 001E | 36FF |
| 0000021200 | 0A88 | 36FF | DA86 | 868D | FE0E | 5016 | D69A | 001E |
| 0000021220 | 8300 | 08C4 | 003D | 7400 | E903 | 000F | 068E | 1466 |
| 0000021240 | 8326 | EC3E | 001E | 0375 | 3DE9 | 1E00 | BD68 | 8D0A |
| 0000021260 | 1E86 | 16FE | 8D50 | 0E86 | 16FE | 8D50 | EE46 | 5016 |
| 0000021300 | B068 | 1E00 | D668 | FF0A | 8436 | FF0A | 8236 | FF0A |
| 0000021320 | 8836 | FF0A | 8636 | 9A0A | 1F1E | 0000 | C483 | 891E |
| 0000021340 | EE46 | 5689 | E9F0 | 0008 | C02B | 4689 | 89F0 | EE46 |
| 0000021360 | 46C7 | 00EC | 2B00 | 89C0 | 1C86 | 89FE | 1A86 | FFFE |
| 0000021400 | 0C76 | 76FF | 6A0A | 6A78 | 8D03 | E086 | 16FE | 8D50 |
| 0000021420 | 1A86 | 16FE | 9A50 | FFFF | 0000 | 4689 | 83EC | EC7E |
| 0000021440 | 7500 | E903 | 0016 | 7E81 | BCEC | 7401 | E903 | 0006 |
| 0000021460 | 00B8 | E900 | 0003 | 01B8 | 8900 | EC46 | 7E83 | 00EC |
| 0000021500 | 0374 | C6E9 | FF03 | E0B6 | 68FE | 0132 | 8A9A | 7563 |
| 0000021520 | 8321 | 04C4 | 4689 | 89F2 | F456 | 468B | 0BF4 | F246 |
| 0000021540 | 0374 | 08E9 | C700 | EC46 | 0007 | 7AE9 | 8303 | 127E |
| 0000021560 | 7400 | E903 | 0017 | 76FF | FF08 | 0676 | 868D | FEE8 |
| 0000021600 | 5016 | D29A | B860 | 8321 | 08C4 | 9EE9 | FF00 | 1076 |
| 0000021620 | 76FF | 8D0E | FA46 | 5016 | 889A | 0007 | 8900 | 0C86 |
| 0000021640 | 83FE | 0CBE | 00FE | 0375 | 25E9 | 8B00 | FC46 | 460B |
| 0000021660 | 74FA | E903 | 0003 | 00E9 | FF00 | 1076 | 76FF | 8D0E |
| 0000021700 | E886 | 16FE | 9A50 | 60D2 | 21F8 | C483 | E908 | 005B |
| 0000021720 | 76FF | FFFC | FA76 | 468D | 16E8 | 9A50 | 07A9 | 0000 |
| 0000021740 | 8689 | FE0C | BE83 | FE0C | 7400 | E903 | 0009 | 468B |
| 0000021760 | 8BE8 | EA56 | 06E9 | 8B00 | 0E46 | 568B | 5210 | 8D50 |
| 0000022000 | E886 | 16FE | 9A50 | 60D2 | 1F74 | C483 | 8B08 | EA46 |
| 0000022020 | 460B | 75E8 | E903 | 0013 | 76FF | FFEA | E876 | 799A |
| 0000022040 | 000A | 2B00 | 89C0 | EA46 | 4689 | C7E8 | E286 | 00FE |
| 0000022060 | E900 | 0004 | 86FF | FEE2 | 7E83 | 00EC | 0374 | 83E9 |
| 0000022100 | 8B02 | E086 | 39FE | E286 | 7CFE | E903 | 0276 | 76FF |
| 0000022120 | FF0C | 0A76 | 006A | 006A | 786A | 9E6B | FEE2 | C424 |
| 0000022140 | 1AB6 | 26FE | 70FF | 2602 | 30FF | 868D | FE2A | 5016 |
| 0000022160 | 779A | 0016 | 8900 | EC46 | 7E83 | 00EC | 0374 | 40E9 |
| 0000022200 | 6B02 | E286 | 24FE | 8603 | FE1A | 968B | FE1C | 0405 |
| 0000022220 | 5200 | 6950 | E286 | 32FE | 0301 | F246 | 568B | 52F4 |
| 0000022240 | 9A50 | 60D2 | 235F | C483 | 6B08 | E29E | 24FE | B6C4 |
| 0000022260 | FE1A | 8B26 | 2600 | 508B | 6902 | E2B6 | 32FE | C401 |
| 0000022300 | F25E | 8926 | 2040 | 8926 | 2250 | 868B | FE74 | B669 |
| 0000022320 | FEE2 | 0132 | 5EC4 | 26F2 | 8089 | 0128 | 868B | FE70 |

THU MAR 14 17:45:10 1991 RV.DLL PAGE 11, LINE 591

| | | | | | | | | |
|---|---|---|---|---|---|---|---|---|
| 0000022340 | 860B | FE6E | 0374 | 2EE9 | 8300 | 127E | 7500 | E903 |
| 0000022360 | 0009 | 468B | 8BFA | FC56 | 06E9 | 8B00 | 0A46 | 568B |
| 0000022400 | 690C | E2B6 | 32FE | C401 | F25E | 8926 | 2480 | 2601 |
| 0000022420 | 9089 | 0126 | 1BE9 | 8B00 | 6E86 | 8BFE | 7096 | 69FE |
| 0000022440 | E2B6 | 32FE | C401 | F25E | 8926 | 2480 | 2601 | 9089 |
| 0000022460 | 0126 | 468B | 8BFA | FC56 | B669 | FEE2 | 0132 | 5EC4 |
| 0000022500 | 26F2 | 8039 | 0124 | 0374 | 2CE9 | 2600 | 9039 | 0126 |
| 0000022520 | 0374 | 22E9 | 8D00 | E886 | 16FE | 6950 | E286 | 32FE |
| 0000022540 | 0301 | F246 | 568B | 05F4 | 0024 | 5052 | D29A | B960 |
| 0000022560 | 8323 | 08C4 | 8CE9 | 2B00 | 89C0 | E686 | 89FE | E486 |
| 0000022600 | 69FE | E2B6 | 32FE | C401 | F25E | FF26 | 26B0 | 2601 |
| 0000022620 | B0FF | 0124 | 868D | FEE4 | 5016 | CC9A | 0021 | 8900 |
| 0000022640 | 0C86 | 83FE | 0CBE | 00FE | 0374 | 24E9 | FF00 | E6B6 |
| 0000022660 | FFFE | E4B6 | 69FE | E286 | 32FE | 0301 | F246 | 568B |
| 0000022700 | 05F4 | 0024 | 5052 | D29A | 2460 | 8324 | 08C4 | 0EE9 |
| 0000022720 | 6900 | E2B6 | 32FE | C401 | F25E | C626 | 2440 | 8B00 |
| 0000022740 | E686 | 0BFE | E486 | 75FE | E903 | 0017 | B6FF | FEE6 |
| 0000022760 | B6FF | FEE4 | ED9A | 0024 | 2B00 | 89C0 | E686 | 89FE |
| 0000023000 | E486 | 83FE | 127E | 7500 | E903 | 003E | 8669 | FEE2 |
| 0000023020 | 0132 | 4603 | 8BF2 | F456 | 5052 | 006A | 006A | B669 |
| 0000023040 | FEE2 | 0132 | 5EC4 | 26F2 | B0FF | 0126 | FF26 | 24B0 |
| 0000023060 | 9A01 | 2F90 | 213F | C483 | 690C | E2B6 | 32FE | C401 |
| 0000023100 | F25E | 8926 | 2C80 | E901 | 005C | 868B | FE86 | 64B9 |
| 0000023120 | 9900 | F9F7 | 0AB9 | 9900 | F9F7 | FA83 | 7500 | E903 |
| 0000023140 | 0034 | 868B | FE86 | F799 | 83F9 | 00FA | 0374 | 25E9 |
| 0000023160 | 8B00 | 8686 | 99FE | F9F7 | F799 | 83F9 | 00FA | 0374 |
| 0000023200 | 13E9 | 6900 | E2B6 | 32FE | C401 | F25E | C726 | 2C80 |
| 0000023220 | 0101 | E900 | 0010 | B669 | FEE2 | 0132 | 5EC4 | 26F2 |
| 0000023240 | 80C7 | 012C | 0000 | 868B | FE7A | 968B | FE7C | B669 |
| 0000023260 | FEE2 | 0132 | 5EC4 | 26F2 | 8089 | 012E | 8926 | 3090 |
| 0000023300 | E901 | FD70 | 8CA1 | 0B0A | 8A06 | 750A | E903 | 000F |
| 0000023320 | 36FF | 0A8C | 36FF | 0A8A | 006A | D19A | 000E | 2B00 |
| 0000023340 | A3C0 | 0A8C | 8AA3 | 8B0A | 1C86 | 0BFE | 1A86 | 75FE |
| 0000023360 | E903 | 0017 | B6FF | FE1C | B6FF | FE1A | 0F9A | 0022 |
| 0000023400 | 2B00 | 89C0 | 1C86 | 89FE | 1A86 | 83FE | EC7E | 7400 |
| 0000023420 | E903 | 0075 | 468B | 8BF2 | F456 | 5EC4 | 2618 | 0789 |
| 0000023440 | 8926 | 0257 | 868B | FEE0 | 5EC4 | 2614 | 0789 | 068E |
| 0000023460 | 1464 | 8326 | 803E | 0025 | 0375 | 4CE9 | 8300 | 12BE |
| 0000023500 | FEFE | 0375 | 42E9 | FF00 | E0B6 | 1EFE | C468 | 8D0A |
| 0000023520 | 1E86 | 16FE | 8D50 | EE46 | 5016 | 868D | FE0E | 5016 |
| 0000023540 | 681E | 0AD6 | 3768 | FF01 | 8436 | FF0A | 8236 | FF0A |
| 0000023560 | 8836 | FF0A | 8636 | 1E0A | CE68 | 680A | 19C2 | C568 |
| 0000023600 | 9A19 | 19C8 | 0000 | C483 | 8E28 | 6406 | 2614 | 3E83 |
| 0000023620 | 2066 | 7500 | E903 | 000A | BE83 | FE12 | 74FE | E903 |
| 0000023640 | 000F | 068E | 1466 | 8326 | 933E | 0020 | 0375 | 59E9 |
| 0000023660 | 8B00 | EC46 | 8689 | FE14 | B6FF | FE18 | B6FF | FE16 |
| 0000023700 | 868D | FE14 | 5016 | B6FF | FEDE | 76FF | FFF8 | F676 |
| 0000023720 | 8E8D | FE1E | 5116 | 4E8D | 16EE | 8D51 | 0E8E | 16FE |
| 0000023740 | 1E51 | D668 | 680A | 0139 | 36FF | 0A84 | 36FF | 0A82 |
| 0000023760 | 36FF | 0A88 | 36FF | 0A86 | 169A | 0020 | 8300 | 28C4 |
| 0000024000 | 868B | FE14 | 09E9 | E900 | 0006 | 468B | E9EC | 0000 |
| 0000024020 | 5F5E | ED83 | 8B02 | 1FE5 | 4D5D | 1ECB | 9058 | 5545 |
| 0000024040 | EC8B | 8E1E | 81D8 | 42EC | 5700 | C756 | F846 | 0AE7 |
| 0000024060 | 5E8C | C7FA | E246 | 0101 | C02B | 4689 | 89CC | CA46 |
| 0000024100 | 068E | 1464 | 8326 | 253E | 0025 | 0375 | 1DE9 | FF00 |
| 0000024120 | 8836 | FF0A | 8636 | 8D0A | C246 | 5016 | 7D9A | 0020 |
| 0000024140 | 8300 | 08C4 | 003D | 7400 | E903 | 000F | 068E | 1466 |
| 0000024160 | 8326 | 993E | 0025 | 0375 | 3BE9 | 1E00 | EE68 | 8D0A |
| 0000024200 | D446 | 5016 | 468D | 16C2 | 8D50 | EC46 | 5016 | 5468 |

THU MAR 14 17:45:10 1991 RV.DLL PAGE 12, LINE 650

| | | | | | | | | |
|---|---|---|---|---|---|---|---|---|
| 0000024220 | 1E01 | 1268 | FF0B | 8436 | FF0A | 8236 | FF0A | 8836 |
| 0000024240 | FF0A | 8636 | 9A0A | 20C8 | 0000 | C483 | 891E | EC46 |
| 0000024260 | 5689 | E9EE | 0008 | C02B | 4689 | 89EE | EC46 | 46C7 |
| 0000024300 | 00EA | FF00 | 0876 | 76FF | FF06 | 0C76 | 76FF | 8D0A |
| 0000024320 | BE46 | 5016 | 468D | 16F4 | 9A50 | FFFF | 0000 | 4689 |
| 0000024340 | 83EA | EA7E | 7400 | E903 | 034E | 46C7 | 00FC | C700 |
| 0000024360 | E446 | 0000 | 03E9 | FF00 | E446 | 468B | 39BE | E446 |
| 0000024400 | 037C | 28E9 | 6900 | E45E | 012A | 76C4 | 26F4 | 3883 |
| 0000024420 | 7504 | E903 | 0011 | 5E69 | 2AE4 | C401 | F476 | 8326 |
| 0000024440 | 0538 | 0374 | 03E9 | FFD0 | FC46 | CAE9 | FFFF | FC76 |
| 0000024460 | 3268 | 9A01 | 638A | 2294 | C483 | 8904 | F046 | 5689 |
| 0000024500 | 8BF2 | F246 | 460B | 74F0 | E903 | 0008 | 46C7 | 07EA |
| 0000024520 | E900 | 02CE | C02B | 4689 | 89D0 | CE46 | 46C7 | FFE0 |
| 0000024540 | C7FF | D246 | FFFF | 46C7 | 00E4 | E900 | 0003 | 46FF |
| 0000024560 | 8BE4 | BE46 | 4639 | 7CE4 | E903 | 0283 | 5E69 | 2AE4 |
| 0000024600 | C401 | F476 | 8326 | 0438 | 0375 | 11E9 | 6900 | E45E |
| 0000024620 | 012A | 76C4 | 26F4 | 3883 | 7405 | E903 | 025E | 46FF |
| 0000024640 | 69E0 | E446 | 012A | 4603 | 8BF4 | F656 | 0405 | 5200 |
| 0000024660 | 6950 | E046 | 0132 | 4603 | 8BF0 | F256 | 5052 | D29A |
| 0000024700 | CD60 | 8327 | 08C4 | 681E | 0AF5 | 4669 | 2AE4 | 0301 |
| 0000024720 | F446 | 568B | 05F6 | 0024 | 5052 | 329A | E761 | 8327 |
| 0000024740 | 04C4 | 4E69 | 2AE4 | 0301 | 03C1 | F446 | 568B | 05F6 |
| 0000024760 | 0021 | 5052 | 089A | 1761 | 8328 | D8C4 | 003D | 7400 |
| 0000025000 | E903 | 002B | 4669 | 2AE4 | 0301 | F446 | 568B | 05F6 |
| 0000025020 | 0024 | 5052 | 4669 | 32E0 | 0301 | F046 | 568B | 05F2 |
| 0000025040 | 0024 | 5052 | D29A | 4660 | 8328 | 08C4 | 2CE9 | 6900 |
| 0000025060 | E446 | 012A | 4603 | 8BF4 | F656 | 2405 | 5200 | 1E50 |
| 0000025100 | F968 | 690A | E046 | 0132 | 4603 | 8BF0 | F256 | 2405 |
| 0000025120 | 5200 | 9A50 | 62BA | 2973 | C483 | 690C | E476 | 012A |
| 0000025140 | 5EC4 | 26F4 | 808B | 0124 | 7669 | 32E0 | C401 | F05E |
| 0000025160 | 8926 | 2880 | 6901 | E076 | 0132 | 5EC4 | 2BF0 | 26C0 |
| 0000025200 | 8089 | 0130 | 8926 | 2E80 | 6901 | E476 | 012A | 5EC4 |
| 0000025220 | 26F4 | 7883 | 0D02 | 0374 | 06E9 | B800 | 0001 | 03E9 |
| 0000025240 | B800 | 0000 | 7669 | 32E0 | C401 | F05E | 8926 | 2A80 |
| 0000025260 | 6901 | E076 | 0132 | 5EC4 | 26F0 | B883 | 012A | 7500 |
| 0000025300 | E903 | 0088 | 46FF | 69D2 | D276 | 0132 | 5EC4 | 2610 |
| 0000025320 | 408B | 2620 | 508B | 6922 | E076 | 0132 | 5EC4 | 26F0 |
| 0000025340 | 4089 | 2620 | 5089 | 6922 | D276 | 0132 | 5EC4 | 2610 |
| 0000025360 | 808B | 0124 | 8B26 | 2690 | 6901 | E076 | 0132 | 5EC4 |
| 0000025400 | 26F0 | 8089 | 0124 | 8926 | 2690 | 6901 | D276 | 0132 |
| 0000025420 | 5EC4 | 2610 | 808B | 012C | 7669 | 32E0 | C401 | F05E |
| 0000025440 | 8926 | 2C80 | 6901 | D276 | 0132 | 5EC4 | 2610 | 808B |
| 0000025460 | 012E | 8B26 | 3090 | 6901 | E076 | 0132 | 5EC4 | 26F0 |
| 0000025500 | 8089 | 012E | 8926 | 3090 | E901 | 00B0 | 468B | 0BD0 |
| 0000025520 | CE46 | 0375 | 39E9 | 8300 | E07E | 7F00 | E903 | 0030 |
| 0000025540 | 4669 | 32E0 | 0301 | F046 | 568B | 05F2 | 0024 | 5052 |
| 0000025560 | 4669 | 32E0 | 0301 | F046 | 568B | 2DF2 | 010E | 5052 |
| 0000025600 | 089A | DA61 | 8329 | 08C4 | 003D | 7500 | E903 | 003D |
| 0000025620 | 4669 | 32E0 | 0301 | F046 | 568B | 05F2 | 0024 | 5052 |
| 0000025640 | 468D | 16E6 | 9A50 | 2189 | 0000 | 4689 | 83C0 | C07E |
| 0000025660 | 7500 | E903 | 000B | C02B | 4689 | 89D0 | CE46 | 0CE9 |
| 0000025700 | 8B00 | E646 | 568B | 89E8 | CE46 | 5689 | 69D0 | E446 |
| 0000025720 | 012A | 4603 | 8BF4 | F656 | 0405 | 5200 | 6A50 | 6A00 |
| 0000025740 | FF00 | D076 | 76FF | 9ACE | 2F90 | 2726 | C483 | 690C |
| 0000025760 | E076 | 0132 | 5EC4 | 26F0 | 8089 | 012C | 6FE9 | A1FD |
| 0000026000 | 0A8C | 060B | 0A8A | 0375 | 0FE9 | FF00 | 8C36 | FF0A |
| 0000026020 | 8A36 | 6A0A | 9A00 | 24CB | 0000 | C02B | 8CA3 | A30A |
| 0000026040 | 0A8A | 468B | 0BF6 | F446 | 0375 | 0BE9 | FF00 | F676 |
| 0000026060 | 76FF | 9AF4 | FFFF | 0000 | 7E83 | 00EA | 0374 | 70E9 |

THU MAR 14 17:45:10 1991 RV.DLL PAGE 13, LINE 709

| | | | | | | | | |
|---|---|---|---|---|---|---|---|---|
| 0000026100 | 8B00 | F046 | 568B | C4F2 | 185E | 8926 | 2607 | 5789 |
| 0000026120 | 8B02 | FC46 | 5EC4 | 2614 | 0789 | 068E | 1464 | 8326 |
| 0000026140 | A83E | 002A | 0375 | 48E9 | 8300 | C67E | 75FE | E903 |
| 0000026160 | 003F | 76FF | 1EFC | FF68 | 8D0A | D446 | 5016 | 468D |
| 0000026200 | 16EC | 8D50 | C246 | 5016 | 681E | 0B12 | CA68 | FF01 |
| 0000026220 | 8436 | FF0A | 8236 | FF0A | 8836 | FF0A | 8636 | 1E0A |
| 0000026240 | 0968 | 680B | 256C | 6F68 | 9A25 | 2572 | 0000 | C483 |
| 0000026260 | 8E28 | 6406 | 2614 | 3E83 | 2637 | 7500 | E903 | 0009 |
| 0000026300 | 7E83 | FEC6 | 0374 | 0FE9 | 8E00 | 6606 | 2614 | 3E83 |
| 0000026320 | 2663 | 7500 | E903 | 0051 | 468B | 89EA | C846 | 76FF |
| 0000026340 | FFCC | CA76 | 468D | 16C8 | FF50 | E276 | 76FF | FFFA |
| 0000026360 | F876 | 4E8D | 16D4 | 8D51 | EC4E | 5116 | 4E8D | 16C2 |
| 0000026400 | 1E51 | 1268 | 680B | 01CC | 36FF | 0A84 | 36FF | 0A82 |
| 0000026420 | 36FF | 0A88 | 36FF | 0A86 | E99A | 0025 | 8300 | 28C4 |
| 0000026440 | 468B | E9C8 | 0009 | 06E9 | 8B00 | EA46 | 00E9 | 5E00 |
| 0000026460 | 835F | 02ED | E58B | 5D1F | CB4D | 581E | 4590 | 8B55 |
| 0000026500 | 1EEC | D88E | EC81 | 0040 | 5657 | 46C7 | 29F8 | 8C0B |
| 0000026520 | FA5E | 46C7 | 01E2 | 2B01 | 89C0 | CE46 | 4689 | 8ECC |
| 0000026540 | 6406 | 2614 | 3E83 | 2A51 | 7500 | E903 | 001D | 36FF |
| 0000026560 | 0A88 | 36FF | 0A86 | 468D | 16C4 | 9A50 | 264D | 0000 |
| 0000026600 | C483 | 3D08 | 0000 | 0374 | 0FE9 | 8E00 | 6606 | 2614 |
| 0000026620 | 3E83 | 2AC0 | 7500 | E903 | 003B | 681E | 0B30 | 468D |
| 0000026640 | 16D4 | 8D50 | C446 | 5016 | 468D | 16EC | 6850 | 01E5 |
| 0000026660 | 681E | 0B54 | 36FF | 0A84 | 36FF | 0A82 | 36FF | 0A88 |
| 0000026700 | 36FF | 0A86 | 969A | 0026 | 8300 | 1EC4 | 4689 | 89EC |
| 0000026720 | EE56 | 08E9 | 2B00 | 89C0 | EE46 | 4689 | C7EC | EA46 |
| 0000026740 | 0000 | 76FF | FF08 | 0676 | 76FF | FF0C | 0A76 | 468D |
| 0000026760 | 16C0 | 8D50 | F446 | 5016 | CA9A | 0026 | 8900 | EA46 |
| 0000027000 | 7E83 | 00EA | 0374 | 95E9 | C702 | FC46 | 0000 | 46C7 |
| 0000027020 | 00E4 | E900 | 0003 | 46FF | 8BE4 | E446 | 4639 | 7FC0 |
| 0000027040 | E903 | 0028 | 5E69 | 2AE4 | C401 | F476 | 8326 | 0438 |
| 0000027060 | 0375 | 11E9 | 6900 | E45E | 012A | 76C4 | 26F4 | 3883 |
| 0000027100 | 7405 | E903 | 0003 | 46FF | E9FC | FFCA | 76FF | 68FC |
| 0000027120 | 0132 | 8A9A | B163 | 8327 | 04C4 | 4689 | 89F0 | F256 |
| 0000027140 | 468B | 0BF2 | F046 | 0374 | 08E9 | C700 | EA46 | 0007 |
| 0000027160 | 15E9 | 2B02 | 89C0 | D246 | 4689 | C7D0 | E046 | FFFF |
| 0000027200 | 46C7 | 00E4 | E900 | 0003 | 46FF | 8BE4 | E446 | 4639 |
| 0000027220 | 7FC0 | E903 | 01CF | 5E69 | 2AE4 | C401 | F476 | 8326 |
| 0000027240 | 0438 | 0375 | 11E9 | 6900 | E45E | 012A | 76C4 | 26F4 |
| 0000027260 | 3883 | 7405 | E903 | 01AA | 46FF | 69E0 | E076 | 0132 |
| 0000027300 | 5EC4 | 26F0 | 80C7 | 012A | 0000 | 4669 | 2AE4 | 0301 |
| 0000027320 | F446 | 568B | 05F6 | 0004 | 5052 | 4669 | 32E0 | 0301 |
| 0000027340 | F046 | 568B | 52F2 | 9A50 | 60D2 | 2CF6 | C483 | 1E08 |
| 0000027360 | 3768 | 690B | E446 | 012A | 4603 | 8BF4 | F656 | 2405 |
| 0000027400 | 5200 | 9A50 | 6132 | 2D10 | C483 | 6904 | E44E | 012A |
| 0000027420 | C103 | 4603 | 8BF4 | F656 | 2105 | 5200 | 9A50 | 6108 |
| 0000027440 | 2D40 | C483 | 3D0B | 0000 | 0374 | 2BE9 | 6900 | E446 |
| 0000027460 | 012A | 4603 | 8BF4 | F656 | 2405 | 5200 | 6950 | E046 |
| 0000027500 | 0132 | 4603 | 8BF0 | F256 | 2405 | 5200 | 9A50 | 60D2 |
| 0000027520 | 2D6F | C483 | E908 | 002C | 4669 | 2AE4 | 0301 | F446 |
| 0000027540 | 568B | 05F6 | 0024 | 5052 | 681E | 0B3B | 4669 | 32E0 |
| 0000027560 | 0301 | F046 | 568B | 05F2 | 0024 | 5052 | BA9A | C562 |
| 0000027600 | 832D | 0CC4 | 7669 | 2AE4 | C401 | F45E | 8B26 | 2480 |
| 0000027620 | 6901 | E076 | 0132 | 5EC4 | 26F0 | 8089 | 0128 | 468B |
| 0000027640 | 0BD2 | D046 | 0375 | 39E9 | 8300 | E07E | 7F00 | E903 |
| 0000027660 | 0030 | 4669 | 32E0 | 0301 | F046 | 568B | 05F2 | 0024 |
| 0000027700 | 5052 | 4669 | 32E0 | 0301 | F046 | 568B | 2DF2 | 010E |
| 0000027720 | 5052 | 089A | 2C61 | 832E | 08C4 | 003D | 7500 | E903 |
| 0000027740 | 003D | 4669 | 32E0 | 0301 | F046 | 568B | 05F2 | 0024 |

THU MAR 14 17:45:10 1991 RV.DLL PAGE 14, LINE 768

| | | | | | | | | |
|---|---|---|---|---|---|---|---|---|
| 0000027760 | 5052 | 468D | 16E6 | 9A50 | 2996 | 0000 | 4689 | 83C2 |
| 0000030000 | C27E | 7500 | E903 | 000B | C02B | 4689 | 89D2 | D046 |
| 0000030020 | 0CE9 | 8B00 | E646 | 568B | 89E8 | D046 | 5689 | 69D2 |
| 0000030040 | E446 | 012A | 4603 | 8BF4 | F656 | 0405 | 5200 | 6A50 |
| 0000030060 | 6A00 | FF00 | D276 | 76FF | 9AD0 | 2F90 | 2C45 | C483 |
| 0000030100 | 690C | E076 | 0132 | 5EC4 | 26F0 | 8089 | 012C | 7669 |
| 0000030120 | 32E0 | C401 | F05E | C02B | 8926 | 3080 | 2601 | 8089 |
| 0000030140 | 012E | 23E9 | A1FE | 0A8C | 060B | 0A8A | 0375 | 0FE9 |
| 0000030160 | FF00 | 8C36 | FF0A | 8A36 | 6A0A | 9A00 | 2A06 | 0000 |
| 0000030200 | C02B | 8CA3 | A30A | 0A8A | 468B | 0BF6 | F446 | 0375 |
| 0000030220 | 0BE9 | FF00 | F676 | 76FF | 9AF4 | 2A24 | 0000 | 7E83 |
| 0000030240 | 00EA | 0374 | 70E9 | 8B00 | F046 | 568B | C4F2 | 125E |
| 0000030260 | 8926 | 2607 | 5789 | 8B02 | FC46 | 5EC4 | 260E | 0789 |
| 0000030300 | 068E | 1464 | 8326 | 0E3E | 002F | 0375 | 48E9 | 8300 |
| 0000030320 | C87E | 75FE | E903 | 003F | 76FF | 1EFC | 4168 | 8D0B |
| 0000030340 | D446 | 5016 | 468D | 16EC | 8D50 | C446 | 5016 | 681E |
| 0000030360 | 0B54 | 4968 | FF02 | 8436 | FF0A | 8236 | FF0A | 8836 |
| 0000030400 | FF0A | 8636 | 1E0A | 4B68 | 680B | 2A94 | 9768 | 9A2A |
| 0000030420 | 2A9A | 0000 | C483 | 8E28 | 6406 | 2614 | 3E83 | 2B56 |
| 0000030440 | 7500 | E903 | 0009 | 7E83 | FEC8 | 0374 | 0FE9 | 8E00 |
| 0000030460 | 6606 | 2614 | 3E83 | 2B82 | 7500 | E903 | 0051 | 468B |
| 0000030500 | 89EA | CA46 | 76FF | FFCE | CC76 | 468D | 16CA | FF50 |
| 0000030520 | E276 | 76FF | FFFA | F876 | 4E8D | 16D4 | 8D51 | EC4E |
| 0000030540 | 5116 | 4E8D | 16C4 | 1E51 | 5468 | 680B | 024B | 36FF |
| 0000030560 | 0A84 | 36FF | 0A82 | 36FF | 0A88 | 36FF | 0A86 | 099A |
| 0000030600 | 002B | 8300 | 28C4 | 468B | E9CA | 0009 | 06E9 | 8B00 |
| 0000030620 | EA46 | 00E9 | 5E00 | 835F | 02ED | E58B | 5D1F | CB4D |
| 0000030640 | 581E | 4590 | 8B55 | 1EEC | D88E | EC81 | 00B8 | 5657 |
| 0000030660 | 8AA1 | 8B0A | 8C16 | 390A | 0646 | 0374 | 08E9 | 3900 |
| 0000030700 | 0856 | 0375 | 39E9 | A100 | 0A8C | 060B | 0A8A | 0375 |
| 0000030720 | 0FE9 | FF00 | 8C36 | FF0A | 8A36 | 6A0A | 9A00 | 2E6C |
| 0000030740 | 0000 | C02B | 8CA3 | A30A | 0A8A | 681E | 0A8A | 76FF |
| 0000030760 | FF08 | 0676 | 006A | 006A | 129A | DA1D | 832C | 0CC4 |
| 0000031000 | 76FF | FF08 | 0676 | 76FF | FF10 | 0E76 | 786A | 76FF |
| 0000031020 | FF0C | 0A76 | 868D | FF4A | 5016 | 619A | 0022 | 8900 |
| 0000031040 | 4886 | 83FF | 48BE | 00FF | 0374 | 45E9 | 8B00 | A646 |
| 0000031060 | 64B9 | 9900 | F9F7 | 0AB9 | 9900 | F9F7 | FA83 | 7500 |
| 0000031100 | E903 | 0025 | 468B | 99A6 | F9F7 | FA83 | 7400 | E903 |
| 0000031120 | 0017 | 468B | 99A6 | F9F7 | F799 | 83F9 | 00FA | 0374 |
| 0000031140 | 06E9 | B800 | 0001 | 03E9 | B800 | 0000 | 09E9 | E900 |
| 0000031160 | 0006 | 00B8 | E900 | 0000 | 5F5E | ED83 | 8B02 | 1FE5 |
| 0000031200 | 4D5D | 1ECB | 9058 | 5545 | EC8B | 8E1E | 81D8 | 0EEC |
| 0000031220 | 5701 | C756 | FA46 | 0000 | C02B | 8689 | FEF8 | 8689 |
| 0000031240 | FEF6 | 7E83 | 000A | 0375 | 1BE9 | FF00 | 0876 | 76FF |
| 0000031260 | 1E06 | 6E68 | 8D0B | FA86 | 16FE | 9A50 | 62BA | 30C5 |
| 0000031300 | C483 | E90C | 0014 | 76FF | FF08 | 0676 | 868D | FEFA |
| 0000031320 | 5016 | D29A | EB60 | 832F | 08C4 | 868D | FEFA | 5016 |
| 0000031340 | 868D | FEF2 | 5016 | E89A | 002D | 8900 | FA46 | 7E83 |
| 0000031360 | 00FA | 0374 | 21E9 | 8B00 | 0E46 | 460B | 750C | E903 |
| 0000031400 | 0016 | B6FF | FEF4 | B6FF | FEF2 | 868D | FEF6 | 5016 |
| 0000031420 | 8B9A | 0023 | 8900 | FA46 | 7E83 | 00FA | 0374 | 52E9 |
| 0000031440 | 8B00 | 0E46 | 460B | 750C | E903 | 0016 | B6FF | FEF8 |
| 0000031460 | B6FF | FEF6 | 76FF | FF0E | 0C76 | D29A | AE60 | 8330 |
| 0000031500 | 08C4 | 468B | 0B12 | 1046 | 0375 | 12E9 | 8B00 | F286 |
| 0000031520 | 8BFE | F496 | C4FE | 105E | 8926 | 2607 | 5789 | 8B02 |
| 0000031540 | 1646 | 460B | 7514 | E903 | 0009 | 468B | C4FC | 145E |
| 0000031560 | 8926 | 8B07 | F886 | 0BFE | F686 | 75FE | E903 | 0017 |
| 0000031600 | B6FF | FEF8 | B6FF | FEF6 | E59A | 0023 | 2B00 | 89C0 |
| 0000031620 | F886 | 89FE | F686 | 8BFE | FA46 | 00E9 | 5E00 | 835F |

THU MAR 14 17:45:10 1991 RV.DLL PAGE 15, LINE 827

| | | | | | | | | |
|---|---|---|---|---|---|---|---|---|
| 0000031640 | 02ED | E58B | 5D1F | CB4D | 581E | 4590 | 8B55 | 1EEC |
| 0000031660 | D88E | EC81 | 0028 | 5657 | 46C7 | 74FA | 8C0B | FC5E |
| 0000031700 | 46C7 | 01F0 | 2B01 | 89C0 | E246 | 4669 | 8EE0 | 6406 |
| 0000031720 | 2614 | 3E83 | 32B6 | 7500 | E903 | 001D | 36FF | 0A88 |
| 0000031740 | 36FF | 0A86 | 468D | 16D8 | 9A50 | 2B6C | 0000 | C483 |
| 0000031760 | 3D08 | 0000 | 0374 | 0FE9 | 8E00 | 6606 | 2614 | 3E83 |
| 0000032000 | 32CE | 7500 | E903 | 003B | 681E | 0B7B | 468D | 16E4 |
| 0000032020 | 8D50 | D846 | 5016 | 468D | 16F6 | 6850 | 02C2 | 681E |
| 0000032040 | 0B82 | 36FF | 0A84 | 36FF | 0A82 | 36FF | 0A88 | 36FF |
| 0000032060 | 0A86 | B59A | 002B | 8300 | 1EC4 | 4689 | 89F6 | F856 |
| 0000032100 | 08E9 | 2B00 | 89C0 | F846 | 4689 | C7F6 | F446 | 0000 |
| 0000032120 | 5EC4 | 2606 | 3F80 | 7400 | E903 | 0008 | 46C7 | 27F4 |
| 0000032140 | E904 | 0049 | 46C7 | 00F2 | 8B00 | F246 | 4639 | 7F0E |
| 0000032160 | E903 | 0029 | 4669 | 32F2 | 0301 | 0A46 | 568B | 520C |
| 0000032200 | FF50 | 0876 | 76FF | 9A06 | 6108 | 312D | C483 | 3D08 |
| 0000032220 | 0000 | 0375 | 06E9 | FF00 | F246 | CCE9 | 8BFF | F246 |
| 0000032240 | 4639 | 7E0E | E903 | 0005 | 46C7 | 28F4 | 8304 | F47E |
| 0000032260 | 7400 | E903 | 0009 | 468B | C4F2 | 105E | 8926 | 8E07 |
| 0000032300 | 6406 | 2614 | 3E83 | 2EB7 | 7500 | E903 | 0009 | 7E83 |
| 0000032320 | FEDC | 0374 | 0FE9 | 8E00 | 6606 | 2614 | 3E83 | 2F26 |
| 0000032340 | 7500 | E903 | 0051 | 468B | 89F4 | DE46 | 76FF | FFE2 |
| 0000032360 | E076 | 468D | 16DE | FF50 | F076 | 76FF | FFFC | FA76 |
| 0000032400 | 4E8D | 16E4 | 8D51 | F64E | 5116 | 4E8D | 16D8 | 1E51 |
| 0000032420 | 8268 | 680B | 02DB | 36FF | 0A84 | 36FF | 0A82 | 36FF |
| 0000032440 | 0A88 | 36FF | 0A86 | 6F9A | 002F | 8300 | 28C4 | 468B |
| 0000032460 | E9DE | 0009 | 06E9 | 8B00 | F446 | 00E9 | 5E00 | 835F |
| 0000032500 | 02ED | E58B | 5D1F | CB4D | 581E | 4590 | 8B55 | 1EEC |
| 0000032520 | D88E | EC81 | 002C | 5657 | 46C7 | 90FA | 8C0B | FC5E |
| 0000032540 | 46C7 | 01EC | 2B01 | 89C0 | DE46 | 4689 | 8EDC | 6406 |
| 0000032560 | 2614 | 3E83 | 34C0 | 7500 | E903 | 001D | 36FF | 0A88 |
| 0000032600 | 36FF | 0A86 | 468D | 16D4 | 9A50 | 31DA | 0000 | C483 |
| 0000032620 | 3D08 | 0000 | 0374 | 0FE9 | 8E00 | 6606 | 2614 | 3E83 |
| 0000032640 | 34D8 | 7500 | E903 | 003B | 681E | 0B97 | 468D | 16E0 |
| 0000032660 | 8D50 | D446 | 5016 | 468D | 16F4 | 6850 | 02EC | 681E |
| 0000032700 | 0B9E | 36FF | 0A84 | 36FF | 0A82 | 36FF | 0A88 | 36FF |
| 0000032720 | 0A86 | 239A | 0032 | 8300 | 1EC4 | 4689 | 89F4 | F656 |
| 0000032740 | 08E9 | 2B00 | 89C0 | F646 | 4689 | C7F4 | F246 | 0000 |
| 0000032760 | 7E83 | 000C | 037D | 0BE9 | 8B00 | 0A46 | 4639 | 7D0C |
| 0000033000 | E903 | 0008 | 46C7 | 13F2 | E900 | 008C | 46C7 | 00F0 |
| 0000033020 | C700 | EE46 | 0000 | 03E9 | FF00 | EE46 | 468B | 390A |
| 0000033040 | EE46 | 037C | 71E9 | 6900 | EE46 | 0132 | 4603 | 8B06 |
| 0000033060 | 0856 | 5052 | 4669 | 320C | 0301 | 0646 | 568B | 5208 |
| 0000033100 | 9A50 | 6108 | 3464 | C483 | 3D08 | 0000 | 0374 | 44E9 |
| 0000033120 | 6900 | EE46 | 0132 | 4603 | 8B06 | 0856 | 2405 | 5200 |
| 0000033140 | 6950 | 0C46 | 0132 | 4603 | 8B06 | 0856 | 2405 | 5200 |
| 0000033160 | 9A50 | 6108 | 327A | C483 | 3D08 | 0000 | 0374 | 14E9 |
| 0000033200 | FF00 | F046 | 468B | 390C | EE46 | 0374 | 06E9 | 8B00 |
| 0000033220 | F046 | 4689 | E9F8 | FF81 | 7E83 | 00F2 | 0374 | 28E9 |
| 0000033240 | 8B00 | 1046 | 460B | 750E | E903 | 0009 | 468B | C4F0 |
| 0000033260 | 0E5E | 8926 | 8B07 | 1446 | 460B | 7512 | E903 | 0009 |
| 0000033300 | 468B | C4F8 | 125E | 8926 | 8E07 | 6406 | 2614 | 3E83 |
| 0000033320 | 31C4 | 7500 | E903 | 0009 | 7E83 | FED8 | 0374 | 0FE9 |
| 0000033340 | 8E00 | 6606 | 2614 | 3E83 | 31F0 | 7500 | E903 | 0051 |
| 0000033360 | 468B | 89F2 | DA46 | 76FF | FFDE | DC76 | 468D | 16DA |
| 0000033400 | FF50 | EC76 | 76FF | FFFC | FA76 | 4E8D | 16E0 | 8D51 |
| 0000033420 | F44E | 5116 | 4E8D | 16D4 | 1E51 | 9E68 | 680B | 0314 |
| 0000033440 | 36FF | 0A84 | 36FF | 0A82 | 36FF | 0A88 | 36FF | 0A86 |
| 0000033460 | 179A | 0033 | 8300 | 28C4 | 468B | E9DA | 0009 | 06E9 |
| 0000033500 | 8B00 | F246 | 00E9 | 5E00 | 835F | 02ED | E58B | 5D1F |

THU MAR 14 17:45:10 1991 RV.DLL PAGE 16, LINE 886

| | | | | | | | | |
|---|---|---|---|---|---|---|---|---|
| 0000033520 | CB4D | 581E | 4590 | 8B55 | 1EEC | D88E | EC81 | 0030 |
| 0000033540 | 5657 | 46C7 | ADF8 | 8C0B | FA5E | 46C7 | 01E8 | 2B01 |
| 0000033560 | 89C0 | DA46 | 4689 | 8ED8 | 6406 | 2614 | 3E83 | 3364 |
| 0000033600 | 7500 | E903 | 001D | 36FF | 0A88 | 36FF | 0A86 | 468D |
| 0000033620 | 16D0 | 9A50 | 337A | 0000 | C483 | 3D08 | 0000 | 0374 |
| 0000033640 | 0FE9 | 8E00 | 6606 | 2614 | 3E83 | 3390 | 7500 | E903 |
| 0000033660 | 003B | 681E | 0BB4 | 468D | 16DC | 8D50 | D046 | 5016 |
| 0000033700 | 468D | 16F0 | 6850 | 0327 | 681E | 0BBC | 36FF | 0A84 |
| 0000033720 | 36FF | 0A82 | 36FF | 0A88 | 36FF | 0A86 | C39A | 0033 |
| 0000033740 | 8300 | 1EC4 | 4689 | 89F0 | F256 | 08E9 | 2B00 | 89C0 |
| 0000033760 | F246 | 4689 | C7F0 | EE46 | 0000 | 7E83 | 000C | 037D |
| 0000034000 | 0BE9 | 8B00 | 0A46 | 4639 | 7D0C | E903 | 0008 | 46C7 |
| 0000034020 | 13EE | E900 | 00F3 | 46C7 | 00EC | C700 | EA46 | 0000 |
| 0000034040 | 03E9 | FF00 | EA46 | 468B | 390A | EA46 | 037C | 41E9 |
| 0000034060 | 6900 | EA46 | 0132 | 4603 | 8B06 | 0856 | 5052 | 4669 |
| 0000034100 | 320C | 0301 | 0646 | 568B | 5208 | 9A50 | 6108 | 3691 |
| 0000034120 | C483 | 3D08 | 0000 | 0374 | 14E9 | FF00 | EC46 | 468B |
| 0000034140 | 390C | EA46 | 0374 | 06E9 | 8B00 | EC46 | 4689 | E9F4 |
| 0000034160 | FFB1 | 468B | 890C | EA46 | 7E83 | 00EA | 037F | 33E9 |
| 0000034200 | 6900 | EA46 | 0132 | 4603 | 8B06 | 0856 | 322D | 5201 |
| 0000034220 | 6950 | 0C46 | 0132 | 4603 | 8B06 | 0856 | 5052 | 089A |
| 0000034240 | E361 | 8336 | 08C4 | 003D | 7400 | E903 | 0006 | 4EFF |
| 0000034260 | E9EA | FFC4 | 468B | 2B0C | EA46 | 8940 | FC46 | 468B |
| 0000034300 | 89FC | F646 | 468B | 400C | 4689 | 8BEA | 0A46 | 4639 |
| 0000034320 | 7CEA | E903 | 0033 | 4669 | 32EA | 0301 | 0646 | 568B |
| 0000034340 | 5208 | 6950 | 0C46 | 0132 | 4603 | 8B06 | 0856 | 5052 |
| 0000034360 | 089A | 3461 | 8334 | 08C4 | 003D | 7400 | E903 | 0009 |
| 0000034400 | 46FF | FFF6 | EA46 | C2E9 | 83FF | EE7E | 7400 | E903 |
| 0000034420 | 0050 | 468B | 0B10 | 0E46 | 0375 | 09E9 | 8B00 | EC46 |
| 0000034440 | 5EC4 | 260E | 0789 | 468B | 0B14 | 1246 | 0375 | 09E9 |
| 0000034460 | 8B00 | F446 | 5EC4 | 2612 | 0789 | 468B | 0B18 | 1646 |
| 0000034500 | 0375 | 09E9 | 8B00 | F646 | 5EC4 | 2616 | 0789 | 46BB |
| 0000034520 | 0B1C | 1A46 | 0375 | 09E9 | 8B00 | FC46 | 5EC4 | 261A |
| 0000034540 | 0789 | 068E | 1464 | 8326 | 6E3E | 0035 | 0375 | 09E9 |
| 0000034560 | 8300 | D47E | 74FE | E903 | 000F | 068E | 1466 | 8326 |
| 0000034600 | 9A3E | 0035 | 0375 | 51E9 | 8B00 | EE46 | 4689 | FFD6 |
| 0000034620 | DA76 | 76FF | 8DD8 | D646 | 5016 | 76FF | FFE8 | FA76 |
| 0000034640 | 76FF | 8DF8 | DC4E | 5116 | 4E8D | 16F0 | 8D51 | D04E |
| 0000034660 | 5116 | 681E | 0BBC | 6868 | FF03 | 8436 | FF0A | 8236 |
| 0000034700 | FF0A | 8836 | FF0A | 8636 | 9A0A | 3521 | 0000 | C483 |
| 0000034720 | 8B28 | D646 | 09E9 | E900 | 0006 | 468B | E9EE | 0000 |
| 0000034740 | 5F5E | ED83 | 8B02 | 1FE5 | 4D5D | 1ECB | 9058 | 5545 |
| 0000034760 | EC8B | 8E1E | 81D8 | 2CEC | 5700 | C756 | FA46 | 0BC9 |
| 0000035000 | 5E8C | C7FC | EE46 | 0101 | C02B | 4689 | 89E0 | DE46 |
| 0000035020 | 068E | 1464 | 8326 | 8F3E | 0038 | 0375 | 1DE9 | FF00 |
| 0000035040 | 8836 | FF0A | 8636 | 8D0A | D646 | 5016 | 849A | 0035 |
| 0000035060 | 8300 | 08C4 | 003D | 7400 | E903 | 000F | 068E | 1466 |
| 0000035100 | 8326 | 1A3E | 0039 | 0375 | 3BE9 | 1E00 | D068 | 8D0B |
| 0000035120 | E246 | 5016 | 468D | 16D6 | 8D50 | F246 | 5016 | 7568 |
| 0000035140 | 1E03 | EC68 | FF0B | 8436 | FF0A | 8236 | FF0A | 8836 |
| 0000035160 | FF0A | 8636 | 9A0A | 35CD | 0000 | C483 | 891E | F246 |
| 0000035200 | 5689 | E9F4 | 0008 | C02B | 4689 | 89F4 | F246 | 46C7 |
| 0000035220 | 01D4 | C700 | F046 | 0000 | 068E | 1464 | 8326 | 023E |
| 0000035240 | 0039 | 0375 | 48E9 | 8300 | DA7E | 75FE | E903 | 003F |
| 0000035260 | 76FF | 1E06 | D768 | 8D0B | E246 | 5016 | 468D | 16F2 |
| 0000035300 | 8D50 | D646 | 5016 | 681E | 0BEC | 7D68 | FF03 | 8436 |
| 0000035320 | FF0A | 8236 | FF0A | 8836 | FF0A | 8636 | 1E0A | E468 |
| 0000035340 | 680B | 2EFA | FD68 | 9A2E | 2F00 | 0000 | C483 | 9A28 |
| 0000035360 | 446F | 363E | 4689 | 89F6 | F856 | 76FF | FFF8 | F676 |

THU MAR 14 17:45:10 1991 RV.DLL PAGE 17, LINE 945

| | | | | | | | | |
|---|---|---|---|---|---|---|---|---|
| 0000035400 | 76FF | 9A06 | FFFF | 0000 | 4689 | 8EF0 | 6406 | 2614 |
| 0000035420 | 3E83 | 3759 | 7500 | E903 | 0009 | 7E83 | FEDA | 0374 |
| 0000035440 | 0FE9 | 8E00 | 6606 | 2614 | 3E83 | 3771 | 7500 | E903 |
| 0000035460 | 0051 | 468B | 89F0 | DC46 | 76FF | FFE0 | DE76 | 468D |
| 0000035500 | 16DC | FF50 | EE76 | 76FF | FFFC | FA76 | 4E8D | 16E2 |
| 0000035520 | 8D51 | F24E | 5116 | 4E8D | 16D6 | 1E51 | EC68 | 680B |
| 0000035540 | 0384 | 36FF | 0A84 | 36FF | 0A82 | 36FF | 0A88 | 36FF |
| 0000035560 | 0A86 | BA9A | 0037 | 8300 | 28C4 | 468B | E9DC | 0009 |
| 0000035600 | 06E9 | 8B00 | F046 | 00E9 | 5E00 | 835F | 02ED | E58B |
| 0000035620 | 5D1F | CB4D | 581E | 4590 | 8B55 | 1EEC | D88E | EC81 |
| 0000035640 | 002C | 5657 | 46C7 | 09FA | 8C0C | FC5E | 46C7 | 01EC |
| 0000035660 | 2B01 | 89C0 | DE46 | 4689 | 8EDC | 6806 | 2614 | 3E83 |
| 0000035700 | 3807 | 7500 | E903 | 001D | 36FF | 0C1E | 36FF | 0C1C |
| 0000035720 | 468D | 16D4 | 9A50 | 381D | 0000 | C483 | 3D08 | 0000 |
| 0000035740 | 0374 | 0FE9 | 8E00 | 6A06 | 2614 | 3E83 | 3AD9 | 7500 |
| 0000035760 | E903 | 003A | 681E | 0C10 | 468D | 16E0 | 8D50 | D446 |
| 0000036000 | 5016 | 468D | 16F2 | 6A50 | 1E4F | 2668 | FF0C | 1A36 |
| 0000036020 | FF0C | 1836 | FF0C | 1E36 | FF0C | 1C36 | 9A0C | 3866 |
| 0000036040 | 0000 | C483 | 891E | F246 | 5689 | E9F4 | 0008 | C02B |
| 0000036060 | 4689 | 89F4 | F246 | 46C7 | 00F0 | 8D00 | EE46 | 5016 |
| 0000036100 | FF9A | 00FF | 8900 | F046 | 7E83 | 00F0 | 0374 | 0DE9 |
| 0000036120 | 8D00 | F646 | 5016 | FF9A | 00FF | 8900 | F046 | 7E83 |
| 0000036140 | 00F0 | 0374 | 63E9 | C700 | C406 | CC15 | 8C15 | C61E |
| 0000036160 | 6815 | 031A | 76FF | FF08 | 0676 | 36FF | 15C6 | 36FF |
| 0000036200 | 15C4 | E69A | 8E63 | 833A | 0AC4 | 1EC4 | 15C4 | C726 |
| 0000036220 | 4C07 | 6A04 | 6A00 | FF01 | F876 | 76FF | 68F6 | 38E2 |
| 0000036240 | FF68 | FFFF | EE76 | 4C68 | 6A04 | 6A00 | 9A00 | FFFF |
| 0000036260 | 0000 | C8A3 | 8915 | CA16 | A115 | 15CA | 060B | 15C8 |
| 0000036300 | 0374 | 05E9 | C700 | F046 | 041A | 068E | 1468 | 8326 |
| 0000036320 | B03E | 0039 | 0375 | 09E9 | 8300 | D87E | 74FE | E903 |
| 0000036340 | 000F | 068E | 146A | 8326 | 333E | 0038 | 0375 | 50E9 |
| 0000036360 | 8B00 | F046 | 4689 | FFDA | DE76 | 76FF | 8DDC | DA46 |
| 0000036400 | 5016 | 76FF | FFEC | FC76 | 76FF | 8DFA | E04E | 5116 |
| 0000036420 | 4E8D | 16F2 | 8D51 | D44E | 5116 | 681E | 0C26 | 6A6A |
| 0000036440 | 36FF | 0C1A | 36FF | 0C18 | 36FF | 0C1E | 36FF | 0C1C |
| 0000036460 | 639A | 0039 | 8300 | 28C4 | 468B | E9DA | 0009 | 06E9 |
| 0000036500 | 8B00 | F046 | 00E9 | 5E00 | 835F | 02ED | E58B | 5D1F |
| 0000036520 | CB4D | 581E | 4590 | 8B55 | 1EEC | D88E | EC81 | 0004 |
| 0000036540 | 5657 | B81E | 0012 | D88E | 46C7 | 00FC | 8B00 | 0E46 |
| 0000036560 | EAE9 | FF02 | 1276 | 76FF | 6810 | 044E | 4368 | 6A01 |
| 0000036600 | 6800 | 00FF | 006A | 006A | 939A | 003B | FF00 | 1276 |
| 0000036620 | 76FF | 6810 | 0450 | 4368 | 6A01 | 6800 | 00FF | 006A |
| 0000036640 | 006A | AC9A | 003B | FF00 | 1276 | 76FF | 6810 | 0452 |
| 0000036660 | 4368 | 6A01 | 6A0D | 6A63 | 6A00 | 9A00 | FFFF | 0000 |
| 0000036700 | 46C7 | 01FC | 8B00 | 1046 | 568B | A312 | 15C8 | 1689 |
| 0000036720 | 15CA | 36FF | 15C6 | 36FF | 15C4 | 9A9A | E03E | 833B |
| 0000036740 | 04C4 | 36FF | 15C6 | 36FF | 15C4 | 76FF | 9AFC | 03F9 |
| 0000036760 | 3C58 | C483 | B806 | 0000 | 00BA | E900 | 029E | 006A |
| 0000037000 | 016A | 76FF | FF12 | 1076 | 681E | 0C34 | C4A1 | 8B15 |
| 0000037020 | C616 | 0515 | 0002 | 5052 | 006A | 206A | FF9A | 00FF |
| 0000037040 | B800 | 0000 | 00BA | E900 | 0272 | 468B | E90A | 00F0 |
| 0000037060 | 7E81 | 550A | 7404 | E903 | 0006 | 01B8 | E900 | 0003 |
| 0000037100 | 00B8 | C400 | C41E | 2615 | 8789 | 0318 | 46C7 | 04FC |
| 0000037120 | E900 | 00F1 | 1EC4 | 15C4 | C726 | 1687 | 0103 | 6A00 |
| 0000037140 | 6A01 | 6A01 | 9A01 | 428B | 3C66 | C483 | 6A06 | 6A00 |
| 0000037160 | 6A00 | 9A01 | 4309 | 3C7A | C483 | FF06 | 2436 | FF0C |
| 0000037200 | 2236 | FF0C | 2036 | 9A0C | 428B | 3C9B | C483 | C706 |
| 0000037220 | FC46 | 0002 | AEE9 | C400 | C41E | 2615 | 87C7 | 0316 |
| 0000037240 | 0002 | 016A | 016A | 016A | 8B9A | A942 | 833C | 06C4 |

THU MAR 14 17:45:10 1991 RV.DLL PAGE 18, LINE 1004

| | | | | | | | | |
|---|---|---|---|---|---|---|---|---|
| 0000037260 | 006A | 016A | 006A | 099A | BD43 | 833C | 06C4 | 36FF |
| 0000037300 | 0C24 | 36FF | 0C22 | 36FF | 0C20 | 8B9A | DE42 | 833C |
| 0000037320 | 06C4 | 46C7 | 02FC | E900 | 006B | 1EC4 | 15C4 | C726 |
| 0000037340 | 1687 | 0303 | 6A00 | 6A01 | 6A01 | 9A01 | 428B | 3CEC |
| 0000037360 | C483 | 6A06 | 6A01 | 6A00 | 9A00 | 4309 | 3D00 | C483 |
| 0000037400 | FF06 | 2436 | FF0C | 2236 | FF0C | 2036 | 9A0C | 428B |
| 0000037420 | 3A75 | C483 | C706 | FC46 | 0002 | 28E9 | E900 | 0025 |
| 0000037440 | 542D | 3D04 | 0008 | 0376 | 1AE9 | D100 | 93E0 | FF2E |
| 0000037460 | 23A7 | 203D | 203C | 353C | 353D | 353D | 353D | 443D |
| 0000037500 | 873C | CA3C | 833C | FC7E | 7500 | E903 | 002C | 36FF |
| 0000037520 | 15C6 | 36FF | 15C4 | F89A | 5C43 | 833D | 04C4 | 36FF |
| 0000037540 | 15C6 | 36FF | 15C4 | 76FF | 9AFC | 03F9 | 3DB6 | C483 |
| 0000037560 | B806 | 0000 | 00BA | E900 | 0122 | 02E9 | 8B01 | 0A46 |
| 0000037600 | 6BE9 | C70C | FC46 | 0005 | A0E9 | C700 | FC46 | 0006 |
| 0000037620 | 98E9 | C700 | FC46 | 0008 | 90E9 | C700 | FC46 | 0007 |
| 0000037640 | 88E9 | C700 | FC46 | 0003 | 80E9 | C700 | FC46 | 0002 |
| 0000037660 | 78E9 | C700 | FC46 | 000A | 36FF | 15C6 | 36FF | 15C4 |
| 0000037700 | 76FF | 9AFC | 03F9 | 3E26 | C483 | FF06 | 1276 | 76FF |
| 0000037720 | 6A10 | 9A00 | FFFF | 0000 | 006A | 629A | 0012 | B800 |
| 0000037740 | 0000 | 00BA | E900 | 00B4 | 40E9 | E900 | 003D | 573D |
| 0000037760 | 7504 | E903 | FF95 | 0376 | 17E9 | 4800 | 0375 | AAE9 |
| 0000040000 | 48FF | 0375 | ACE9 | 2DFF | 0454 | 0375 | 74E9 | E9FF |
| 0000040020 | FFD6 | 582D | 7504 | E903 | FF81 | 7548 | E903 | FF73 |
| 0000040040 | 042D | 7500 | E903 | FF7B | BDE9 | FFFF | C636 | FF15 |
| 0000040060 | C436 | 9A15 | 43F8 | 3E39 | C483 | FF04 | C636 | FF15 |
| 0000040100 | C436 | FF15 | FC76 | F99A | CD03 | 833B | 06C4 | 00B8 |
| 0000040120 | BA00 | 0000 | 45E9 | E900 | 0025 | 22E9 | 2D00 | 0020 |
| 0000040140 | 0375 | 18E9 | 48FF | 7548 | E903 | FD92 | 0E2D | 7500 |
| 0000040160 | E903 | FDB6 | 0B2D | 7500 | E903 | FCF7 | D8E9 | FFFF |
| 0000040200 | 1276 | 76FF | FF10 | 0E76 | 76FF | FF0C | 0A76 | 76FF |
| 0000040220 | FF08 | 0676 | FF9A | 00FF | E900 | 0000 | 5E1F | 835F |
| 0000040240 | 02ED | E58B | 5D1F | CA4D | 000E | 581E | 4590 | 8B55 |
| 0000040260 | 1EEC | D88E | EC81 | 0024 | 5657 | 46C7 | 4DFA | 8C0C |
| 0000040300 | FC5E | 46C7 | 00F4 | 2B00 | 89C0 | E646 | 4689 | 8EE4 |
| 0000040320 | 6806 | 2614 | 3E83 | 40DF | 7500 | E903 | 001D | 36FF |
| 0000040340 | 0C1E | 36FF | 0C1C | 468D | 16DC | 9A50 | 39C6 | 0000 |
| 0000040360 | C483 | 3D08 | 0000 | 0374 | 0FE9 | 8E00 | 6A06 | 2614 |
| 0000040400 | 3E83 | 40F7 | 7500 | E903 | 003B | 681E | 0C51 | 468D |
| 0000040420 | 16E8 | 8D50 | DC46 | 5016 | 468D | 16F6 | 6850 | 0130 |
| 0000040440 | 681E | 0C56 | 36FF | 0C1A | 36FF | 0C18 | 36FF | 0C1E |
| 0000040460 | 36FF | 0C1C | 0E9A | 003A | 8300 | 1EC4 | 4689 | 89F6 |
| 0000040500 | F856 | 08E9 | 2B00 | 89C0 | F846 | 4689 | FFF6 | CA36 |
| 0000040520 | FF15 | C836 | 8B15 | 0646 | 568B | 0508 | 0002 | 5052 |
| 0000040540 | FF9A | 00FF | FF00 | CA36 | FF15 | C836 | 6815 | 044D |
| 0000040560 | 468B | 8B06 | 0856 | 6605 | 5200 | 9A50 | 3F87 | 0000 |
| 0000040600 | 36FF | 15CA | 36FF | 15C8 | 4E68 | 8B04 | 0646 | 568B |
| 0000040620 | 0508 | 00CA | 5052 | A29A | 003F | FF00 | CA36 | FF15 |
| 0000040640 | C836 | 6815 | 044F | 468B | 8B06 | 0856 | CA05 | 5201 |
| 0000040660 | 9A50 | 3FBD | 0000 | 36FF | 15CA | 36FF | 15C8 | 5068 |
| 0000040700 | 8B04 | 0646 | 568B | 0508 | 022E | 5052 | D89A | 003F |
| 0000040720 | FF00 | CA36 | FF15 | C836 | 6815 | 0451 | 468B | 8B06 |
| 0000040740 | 0856 | 4E05 | 5202 | 9A50 | 3FF3 | 0000 | 36FF | 15CA |
| 0000040760 | 36FF | 15C8 | 5268 | 8B04 | 0646 | 568B | 0508 | 02B2 |
| 0000041000 | 5052 | FF9A | 00FF | FF00 | CA36 | FF15 | C836 | 6815 |
| 0000041020 | 045A | 2568 | C401 | 065E | 8326 | 16BF | 0103 | 0374 |
| 0000041040 | 06E9 | B800 | 0001 | 03E9 | B800 | 0000 | D22B | 5052 |
| 0000041060 | 006A | 006A | 579A | 0040 | FF00 | CA36 | FF15 | C836 |
| 0000041100 | 6815 | 045B | 2568 | C401 | 065E | 8326 | 16BF | 0203 |
| 0000041120 | 0374 | 06E9 | B800 | 0001 | 03E9 | B800 | 0000 | D22B |

THU MAR 14 17:45:10 1991 RV.DLL PAGE 19, LINE 1063

| | | | | | | | | |
|---|---|---|---|---|---|---|---|---|
| 0000041140 | 5052 | 006A | 006A | 899A | 0040 | FF00 | CA36 | FF15 |
| 0000041160 | C836 | 6815 | 045C | 2568 | C401 | 065E | 8326 | 16BF |
| 0000041200 | 0303 | 0374 | 06E9 | B800 | 0001 | 03E9 | B800 | 0000 |
| 0000041220 | D22B | 5052 | 006A | 006A | AC9A | 0040 | FF00 | CA36 |
| 0000041240 | FF15 | C836 | 6815 | 0455 | 2568 | C401 | 065E | 8B26 |
| 0000041260 | 1887 | 2B03 | 52D2 | 6A50 | 6A00 | 9A00 | 40D4 | 0000 |
| 0000041300 | 36FF | 15CA | 36FF | 15C8 | 5468 | 6804 | 0125 | 5EC4 |
| 0000041320 | 2606 | BF83 | 0318 | 1B01 | F7C0 | 2BD8 | 52D2 | 6A50 |
| 0000041340 | 6A00 | 9A00 | 3B79 | 0000 | 068E | 1468 | 8326 | C13E |
| 0000041360 | 003A | 0375 | 09E9 | 8300 | E07E | 74FE | E903 | 000F |
| 0000041400 | 068E | 146A | 8326 | DC3E | 0039 | 0375 | 39E9 | 8D00 |
| 0000041420 | E846 | 5016 | 468D | 16F6 | 8D50 | DC46 | 5016 | 681E |
| 0000041440 | 0C56 | 4E68 | FF01 | 1A36 | FF0C | 1836 | FF0C | 1E36 |
| 0000041460 | FF0C | 1C36 | 9A0C | FFFF | 0000 | C483 | C71A | E246 |
| 0000041500 | 0000 | 06E9 | E900 | 0003 | 00E9 | 5E00 | 835F | 02ED |
| 0000041520 | E58B | 5D1F | CB4D | 581E | 4590 | 8B55 | 1EEC | D88E |
| 0000041540 | EC81 | 0026 | 5657 | 46C7 | 66FA | 8C0C | FC5E | 46C7 |
| 0000041560 | 00F4 | 2B00 | 89C0 | E646 | 4689 | 8EE4 | 6806 | 2614 |
| 0000041600 | 3E83 | 4224 | 7500 | E903 | 001D | 36FF | 0C1E | 36FF |
| 0000041620 | 0C1C | 468D | 16DA | 9A50 | 3EDC | 0000 | C483 | 3D08 |
| 0000041640 | 0000 | 0374 | 0FE9 | 8E00 | 6A06 | 2614 | 3E83 | 423C |
| 0000041660 | 7500 | E903 | 003B | 681E | 0C6A | 468D | 16E8 | 8D50 |
| 0000041700 | DA46 | 5016 | 468D | 16F6 | 6850 | 0163 | 681E | 0C6E |
| 0000041720 | 36FF | 0C1A | 36FF | 0C18 | 36FF | 0C1E | 36FF | 0C1C |
| 0000041740 | 259A | 003F | 8300 | 1EC4 | 4689 | 89F6 | F856 | 08E9 |
| 0000041760 | 2B00 | 89C0 | F846 | 4689 | FFF6 | CA36 | FF15 | C836 |
| 0000042000 | 6815 | 0452 | 76FF | FF08 | 0676 | 6C9A | 003F | 8900 |
| 0000042020 | E246 | 36FF | 15CA | 36FF | 15C8 | 5268 | 6804 | 0140 |
| 0000042040 | 006A | 006A | 006A | 006A | 259A | 0040 | 8E00 | 6806 |
| 0000042060 | 2614 | 3E83 | 3EC6 | 7500 | E903 | 0009 | 7E83 | FEDE |
| 0000042100 | 0374 | 0FE9 | 8E00 | 6A06 | 2614 | 3E83 | 3EF2 | 7500 |
| 0000042120 | E903 | 0039 | 468D | 16E8 | 8D50 | F646 | 5016 | 468D |
| 0000042140 | 16DA | 1E50 | 6E68 | 680C | 016B | 36FF | 0C1A | 36FF |
| 0000042160 | 0C18 | 36FF | 0C1E | 36FF | 0C1C | 269A | 0041 | 8300 |
| 0000042200 | 1AC4 | 46C7 | 00E0 | E900 | 0006 | 03E9 | E900 | 0000 |
| 0000042220 | 5F5E | ED83 | 8B02 | 1FE5 | 4D5D | 1ECB | 9058 | 5545 |
| 0000042240 | EC8B | 8E1E | 81D8 | 00EC | 5700 | 8B56 | 0646 | 20A3 |
| 0000042260 | 8B0C | 0846 | 22A3 | 8B0C | 0A46 | 24A3 | FF0C | CA36 |
| 0000042300 | FF15 | C836 | 6815 | 045A | D39A | 0042 | 5200 | FF50 |
| 0000042320 | 0676 | DD9A | 0042 | FF00 | CA36 | FF15 | C836 | 6815 |
| 0000042340 | 045B | ED9A | 0042 | 5200 | FF50 | 0876 | F79A | 0042 |
| 0000042360 | FF00 | CA36 | FF15 | C836 | 6815 | 045C | FF9A | 00FF |
| 0000042400 | 5200 | FF50 | 0A76 | FF9A | 00FF | E900 | 0000 | 5F5E |
| 0000042420 | ED83 | 8B02 | 1FE5 | 4D5D | 1ECB | 9058 | 5545 | EC8B |
| 0000042440 | 8E1E | 81D8 | 00EC | 5700 | FF56 | CA36 | FF15 | C836 |
| 0000042460 | 6815 | 045A | 2568 | 8B01 | 0646 | D22B | 5052 | 006A |
| 0000042500 | 006A | 519A | 0043 | FF00 | CA36 | FF15 | C836 | 6815 |
| 0000042520 | 045B | 2568 | 8B01 | 0846 | D22B | 5052 | 006A | 006A |
| 0000042540 | 6F9A | 0043 | FF00 | CA36 | FF15 | C836 | 6815 | 045C |
| 0000042560 | 2568 | 8B01 | 0A46 | D22B | 5052 | 006A | 006A | 199A |
| 0000042600 | 0042 | E900 | 0000 | 5F5E | ED83 | 8B02 | 1FE5 | 4D5D |
| 0000042620 | 1ECB | 9058 | 5545 | EC8B | 8E1E | 81D8 | 00EC | 5700 |
| 0000042640 | 8356 | 067E | 7400 | E903 | 0036 | 36FF | 15CA | 36FF |
| 0000042660 | 15C8 | 5468 | 6804 | 0125 | 006A | 006A | 006A | 006A |
| 0000042700 | CC9A | 0043 | FF00 | CA36 | FF15 | C836 | 6815 | 0455 |
| 0000042720 | 2568 | 6A01 | 6A00 | 6A01 | 6A00 | 9A00 | 4333 | 0000 |
| 0000042740 | 36FF | 15CA | 36FF | 15C8 | 5468 | 9A04 | 42B9 | 0000 |
| 0000042760 | 5052 | 76FF | 9A06 | 42C3 | 0000 | 00E9 | 5E00 | 835F |
| 0000043000 | 02ED | E58B | 5D1F | CB4D | 581E | 4590 | 8B55 | 1EEC |

THU MAR 14 17:45:10 1991 RV.DLL PAGE 20, LINE 1122

| | | | | | | | | |
|---|---|---|---|---|---|---|---|---|
| 0000043020 | D88E | EC81 | 0000 | 5657 | 36FF | 15CA | 36FF | 15C8 |
| 0000043040 | 4E68 | 6804 | 00FF | 468B | 8B06 | 0856 | CA05 | 5200 |
| 0000043060 | 9A50 | 4440 | 0000 | 36FF | 15CA | 36FF | 15C8 | 5068 |
| 0000043100 | 6804 | 00FF | 468B | 8B06 | 0856 | 2E05 | 5202 | 9A50 |
| 0000043120 | 445D | 0000 | 36FF | 15CA | 36FF | 15C8 | 5268 | 6A04 |
| 0000043140 | 8B1F | 0646 | 568B | 0508 | 02B2 | 5052 | FF9A | 00FF |
| 0000043160 | E900 | 0000 | 5F5E | ED83 | 8B02 | 1FE5 | 4D5D | 1ECB |
| 0000043200 | 9058 | 5545 | EC8B | 8E1E | 81D8 | 00EC | 5700 | A156 |
| 0000043220 | 15C8 | 168B | 15CA | 00E9 | 5E00 | 835F | 02ED | E58B |
| 0000043240 | 5D1F | CB4D | 0000 | 0000 | 0000 | 0000 | 0000 | 0000 |
| 0000043260 | 0000 | 0000 | 8B55 | 1EEC | 8468 | 1E0C | 8868 | 9A0C |
| 0000043300 | FFFF | 0000 | 068E | 0C84 | A126 | 0015 | C4A3 | BB0C |
| 0000043320 | 0C8E | 1F8C | 05BE | 8319 | FEE6 | 1E56 | FF9A | 00FF |
| 0000043340 | 0B00 | 74C0 | 3304 | EBC0 | 893A | 0477 | 894E | 8C36 |
| 0000043360 | 830C | 03EE | 04C7 | 0001 | 7789 | 8906 | 0877 | C683 |
| 0000043400 | C702 | FE04 | 89FF | 0A77 | 681E | 0C82 | 681E | 0C80 |
| 0000043420 | FF9A | 00FF | E800 | 0020 | 689A | 4947 | E83D | 0066 |
| 0000043440 | 01B8 | 5D00 | 50CB | 269A | 0B47 | 9A45 | 48A0 | 4519 |
| 0000043460 | FF68 | 9A00 | 462F | 451E | BB1E | 000D | FF33 | 068E |
| 0000043500 | 0C82 | FFB9 | 267F | 3D80 | 7500 | 4701 | 8026 | 003D |
| 0000043520 | 3174 | A2BE | 8B0C | 8BD1 | F3CB | 8BA6 | 74CA | 3308 |
| 0000043540 | F2C0 | 74AE | EBE7 | 061C | 071E | F78B | BF1F | 0CC9 |
| 0000043560 | 2CAC | 7241 | C00E | 04E0 | AC92 | 412C | 0572 | C20A |
| 0000043600 | EBAA | 1FED | 00C3 | 02BB | 5200 | D48B | A780 | 0CC9 |
| 0000043620 | 50B7 | C48B | 1653 | 1650 | 9A52 | FFFF | 0000 | C00B |
| 0000043640 | 7558 | B110 | 3C40 | 7401 | 3C06 | 7502 | B106 | 0808 |
| 0000043660 | C98F | 4B0C | D679 | E85A | 0026 | 58BE | BF14 | 145C |
| 0000043700 | 5FE8 | BE01 | 1458 | 58BF | E814 | 0156 | 58B8 | 3D14 |
| 0000043720 | 145C | 0B74 | 016A | 680E | 4601 | FF9A | 00FF | C300 |
| 0000043740 | 0E8B | 144E | 2AE3 | 06C4 | 1450 | C28C | DB33 | 1EFF |
| 0000043760 | 144C | 0373 | 61E9 | 8E01 | 8806 | 260C | 1E8B | 0006 |
| 0000044000 | 754B | C40D | 5406 | 8C14 | BBC2 | 0003 | 1EFF | 144C |
| 0000044020 | B8C3 | 3B54 | D88E | D9A1 | 0B0E | 75C0 | 0E10 | 46A1 |
| 0000044040 | 0B14 | 75C0 | E805 | 001F | 03EB | 24E8 | 6A00 | 6A03 |
| 0000044060 | 6A00 | 9A00 | 45CB | 0000 | 8B55 | 33EC | EBC9 | 551A |
| 0000044100 | EC8B | 01B9 | EB00 | 5512 | EC8B | 5756 | 00B9 | EB01 |
| 0000044120 | 5508 | EC8B | 5756 | 01B9 | E801 | 004B | 0A51 | 75C9 |
| 0000044140 | BE12 | 18FE | FEBF | E818 | 00B8 | 58BE | BF14 | 145C |
| 0000044160 | AFE8 | BE00 | 145C | 5CBF | E814 | 00A6 | 5CBE | BF14 |
| 0000044200 | 145C | 9DE8 | F800 | 008C | 0A58 | 75E4 | C713 | D906 |
| 0000044220 | 010E | B800 | 0001 | 8A50 | 0646 | 9A50 | FFFF | 0000 |
| 0000044240 | 4EE8 | 5F00 | 5D5E | 55CB | EC8B | 0D6A | 37E8 | 831B |
| 0000044260 | 02C4 | 068E | 0C88 | 8B26 | 061E | 4B00 | 168B | 0EDB |
| 0000044300 | FA83 | 75FF | 8904 | DB1E | 390E | DB1E | 9F0E | 0D6A |
| 0000044320 | 3DE8 | 831B | 02C4 | 749E | 6A0A | E80E | 1AE8 | C483 |
| 0000044340 | EB02 | 3BC7 | 74D3 | 6A08 | E80E | 1AFA | C483 | 5D02 |
| 0000044360 | 55C3 | EC8B | 0D6A | EDE8 | 831A | 02C4 | 06C7 | 0EDB |
| 0000044400 | FFFF | 0D6A | 09E8 | 831B | 02C4 | 0E6A | 01E8 | 831B |
| 0000044420 | 02C4 | C35D | 0E8B | 144E | 07E3 | 02BB | FF00 | 4C1E |
| 0000044440 | C314 | F73B | 0E73 | EF83 | 8B04 | 0B05 | 0245 | F274 |
| 0000044460 | 1DFF | EEEB | 00C3 | 8B55 | B8EC | 00FC | 0E50 | 6FE8 |
| 0000044500 | 8301 | E03E | 000E | 0474 | 1EFF | 0EDE | FFB8 | 5000 |
| 0000044520 | E80E | 015C | E58B | CB5D | 02B8 | E900 | FDC7 | 5A59 |
| 0000044540 | DC8B | D82B | 0B72 | FB81 | 0200 | 0572 | E38B | 5152 |
| 0000044560 | 52CB | 3351 | E9C0 | FDAD | 14C8 | 0000 | 5657 | FF2B |
| 0000044600 | F78B | 3639 | 0C82 | 0375 | F0E9 | A100 | 0C82 | C92B |
| 0000044620 | 4E89 | 89F4 | F646 | 4E89 | 89F8 | FA46 | 0C6A | 76FF |
| 0000044640 | FFFA | F876 | 681E | 0CA2 | 4A9A | DC61 | 8347 | 0AC4 |
| 0000044660 | C00B | 1A74 | 8146 | FFFE | 767F | E903 | 00BD | 5EC4 |

THU MAR 14 17:45:10 1991 RV.DLL PAGE 21, LINE 1181

| | | | | | | | | |
|---|---|---|---|---|---|---|---|---|
| 0000044700 | FFF8 | F846 | 8026 | 003F | EA75 | EB47 | 900D | 5EC4 |
| 0000044720 | FFF8 | F846 | 8026 | 003F | F475 | 5E8B | 26F8 | 3F80 |
| 0000044740 | 7500 | 8DB9 | 0145 | 6A50 | 9A04 | 638A | 47EB | C483 |
| 0000044760 | 8904 | F046 | 5689 | 56F2 | 149A | 215E | 8348 | 02C4 |
| 0000045000 | 4689 | 89FC | FE56 | 468B | 0BF2 | F046 | 6D74 | C28B |
| 0000045020 | 460B | 74FC | 8B66 | F046 | 568B | A3F2 | 0ECF | 1689 |
| 0000045040 | 0ED1 | 0C6A | 76FF | FFF6 | F476 | 681E | 0CA2 | 4A9A |
| 0000045060 | 2661 | 8345 | 0AC4 | C00B | 2C74 | 468B | 8BFC | FE56 |
| 0000045100 | 5EC4 | 83F0 | F046 | 2604 | 0789 | 8926 | 0257 | 5EC4 |
| 0000045120 | FFF4 | F446 | 8A26 | C407 | FC5E | 46FF | 26FC | 0788 |
| 0000045140 | C00A | 0E74 | E8EB | 5EC4 | FFF4 | F446 | 8026 | 003F |
| 0000045160 | F475 | 5EC4 | 26F4 | 3F80 | 7500 | 5EA7 | C95F | 90CB |
| 0000045200 | 8B55 | 56EC | B857 | 4602 | D88E | C08E | 568B | BE06 |
| 0000045220 | 1476 | 3BAD | 74C2 | 4010 | 7496 | 970C | C033 | FFB9 |
| 0000045240 | F2FF | 8BAE | EBF7 | 96EB | 5E5F | E58B | CA5D | 0002 |
| 0000045260 | 8B55 | 57EC | 76FF | 0E06 | C5E8 | 0BFF | 74C0 | 921F |
| 0000045300 | FA8B | C033 | FFB9 | F2FF | F7AE | 49D1 | 8B50 | BBC4 |
| 0000045320 | 0002 | 1E53 | 5152 | 5016 | FF9A | 00FF | 5B00 | 8B5F |
| 0000045340 | 5DE5 | 02CA | 0000 | 1601 | 0202 | 0203 | 1804 | 0D05 |
| 0000045360 | 0906 | 0C07 | 0C08 | 0C09 | 070A | 080B | 160C | 160D |
| 0000045400 | 020F | 0D10 | 1211 | 0212 | 0235 | 0D41 | 0243 | 0D52 |
| 0000045420 | 0D53 | 0D57 | 0B59 | 0D6C | 206D | 1C70 | 0972 | 1606 |
| 0000045440 | 0A80 | 0A81 | 0982 | 0D84 | 0BA4 | 02CE | 0BD7 | 0D00 |
| 0000045460 | 1608 | 8B52 | E8D8 | 1918 | 8E93 | 5AC2 | 8926 | 0247 |
| 0000045500 | 8926 | B817 | FFFF | 8B99 | 5DE5 | E8CB | 0008 | FFB8 |
| 0000045520 | 99FF | E58B | CB5D | D88B | F5E8 | 931B | C28E | 8926 |
| 0000045540 | 0247 | BB53 | 48D6 | 24B9 | 0A00 | 75E4 | 2E1B | 073A |
| 0000045560 | 1674 | 4343 | F7E2 | 133C | 0472 | 243C | 0A76 | 3C43 |
| 0000045600 | 72BC | 3C04 | 76CA | 4301 | 8A2E | 0147 | 5B98 | 8926 |
| 0000045620 | C307 | 8B55 | BBEC | 0002 | 05EB | 8B55 | 33EC | E8DB |
| 0000045640 | 18AE | C303 | CB5D | 8B55 | 56EC | 8B57 | 0676 | 448A |
| 0000045660 | A80A | 7483 | A85F | 7540 | A85B | 7502 | 0C48 | 8801 |
| 0000045700 | 0A44 | FE8B | EF81 | 0EE8 | C781 | 10C8 | 0CA8 | 0D75 |
| 0000045720 | 05F6 | 7501 | 1E08 | E856 | 014E | C483 | 8B04 | 0644 |
| 0000045740 | 0489 | 75FF | FF02 | 0874 | 3350 | 8ADB | 0B5C | 0E53 |
| 0000045760 | F5E8 | 8310 | 08C4 | C00B | 1174 | FF3D | 75FF | 801A |
| 0000046000 | 0A4C | EB20 | 800A | 0A4C | EB20 | 8009 | 0A4C | C710 |
| 0000046020 | 0444 | 0000 | FFB8 | EBFF | 8A25 | C9BF | 800C | 82E7 |
| 0000046040 | FF80 | 7582 | 8A0B | 0A7C | C7F6 | 7582 | 8003 | 200D |
| 0000046060 | 8948 | 0444 | 1CC4 | C033 | 8A26 | 4307 | 1C89 | 5E5F |
| 0000046100 | CB5D | 8B55 | 56EC | 8B57 | 0876 | 448A | A80A | 7482 |
| 0000046120 | A864 | 7540 | C760 | 0444 | 0000 | 01A8 | 0B74 | 10A8 |
| 0000046140 | 5374 | 4C8B | 8906 | 240C | 0CFE | 2402 | 88EF | 0A44 |
| 0000046160 | FE8B | EF81 | 0EE8 | C781 | 10C8 | DB33 | 5C8A | A80B |
| 0000046200 | 7508 | A84B | 7504 | F618 | 0105 | 4275 | FE81 | 0EF4 |
| 0000046220 | 0674 | FE81 | 0F00 | 2675 | 87F6 | 0CC9 | 7440 | B91F |
| 0000046240 | 0001 | 1651 | 7E8D | 5706 | 0E53 | A3E8 | 8311 | 08C4 |
| 0000046260 | 01B9 | EB00 | B846 | FFFF | 4C80 | 200A | 65EB | 1E53 |
| 0000046300 | E856 | 0064 | C483 | 5B04 | 44F6 | 080A | D174 | 0C8B |
| 0000046320 | 548B | 2B06 | 42CA | 1489 | 558B | 4A02 | 5489 | E304 |
| 0000046340 | 5125 | FF51 | 0874 | 74FF | 5306 | E80E | 1162 | C483 |
| 0000046360 | 5908 | 7CC4 | 8B06 | 0656 | 8826 | 3B15 | 75C1 | 33B6 |
| 0000046400 | 8AC0 | 0646 | 1DEB | C033 | 87F6 | 0CC9 | 7420 | B9E3 |
| 0000046420 | 0002 | 5051 | 3350 | E80E | 0F60 | C483 | 3308 | 8BC0 |
| 0000046440 | EBC8 | 5FCF | 5D5E | 00CB | 8B55 | 56EC | 768B | B804 |
| 0000046460 | 0200 | 9A50 | 5E14 | 479B | 8B59 | 81DE | E8EB | 810E |
| 0000046500 | C8C3 | 0B10 | 74D2 | 800B | 0A4C | C708 | 0247 | 0200 |
| 0000046520 | 0EEB | 4C80 | 040A | 47C7 | 0102 | 8C00 | 8DDA | 0147 |
| 0000046540 | 5489 | 8902 | 8904 | 0854 | 4489 | C706 | 0444 | 0000 |

THU MAR 14 17:45:10 1991 RV.DLL PAGE 22, LINE 1240

| | | | | | | | | |
|---|---|---|---|---|---|---|---|---|
| 0000046560 | 5D5E | 00C3 | 04C8 | 0000 | 468B | 0B08 | 0646 | 0875 |
| 0000046600 | 006A | A7E8 | EB00 | 9031 | 468B | 2D06 | 0EE8 | 0CB9 |
| 0000046620 | 9900 | F9F7 | 4689 | 50FC | FBE8 | 8315 | 02C4 | 76FF |
| 0000046640 | FF08 | 0676 | AA9A | EE4B | 834B | 04C4 | 4689 | FFFE |
| 0000046660 | FC76 | EDE8 | 8B15 | FE46 | CBC9 | 02C8 | 0000 | 5657 |
| 0000046700 | FF2B | 768B | 8A06 | 0A44 | C88B | 0324 | 023C | 3F75 |
| 0000046720 | C1F6 | 7508 | 8B0D | 81DE | E8EB | F60E | C887 | 0110 |
| 0000046740 | 2D74 | 048B | 442B | 8906 | FE46 | C00B | 217E | FF50 |
| 0000046760 | 0874 | 74FF | 8A06 | 0B4C | ED2A | 9A51 | 5C40 | 4C6B |
| 0000047000 | C483 | 3908 | FE46 | 0774 | 4C80 | 200A | FFBF | 8BFF |
| 0000047020 | 0644 | 548B | 8908 | 8904 | 0254 | 44C7 | 0004 | 8B00 |
| 0000047040 | 5EC7 | C95F | 90CB | 016A | 01E8 | CB00 | 04C8 | 0000 |
| 0000047060 | 5657 | E8BE | 2B0E | 89FF | FE7E | 026A | A7E8 | 8315 |
| 0000047100 | 02C4 | 11EB | 46C7 | FFFE | FFFF | FC76 | 53E8 | 8315 |
| 0000047120 | 02C4 | C683 | 390C | A836 | 7212 | 8B2B | 2DC6 | 0EE8 |
| 0000047140 | 0CB9 | 9900 | F9F7 | 4689 | 50FC | 29E8 | 8315 | 02C4 |
| 0000047160 | 44F6 | 830A | D374 | 561E | AA9A | 264B | 834B | 04C4 |
| 0000047200 | 7440 | 47C1 | C3EB | 026A | 85E8 | 8315 | 02C4 | 7E83 |
| 0000047220 | 0104 | 0475 | C78B | 03EB | 468B | 5EFE | C95F | 02C2 |
| 0000047240 | 9000 | 8B55 | B8EC | 01B4 | 4E9A | 4C47 | 574E | C656 |
| 0000047260 | B846 | 2B00 | 89C0 | E846 | 4689 | C4C6 | 0A5E | 8026 |
| 0000047300 | 003F | 0375 | 5FE9 | 2607 | 1F8A | FF2A | 87F6 | 1345 |
| 0000047320 | 7408 | FF2D | E84E | 468D | 16E8 | FF50 | 0876 | 76FF |
| 0000047340 | E806 | 07C6 | FF50 | 0876 | 76FF | E806 | 07A0 | 46FF |
| 0000047360 | C40A | 0A5E | 8A26 | 2A1F | F6FF | 4587 | 0813 | EE75 |
| 0000047400 | 5E8B | 260A | 3F80 | 7425 | E903 | 06F2 | 46C6 | 00C0 |
| 0000047420 | C02A | 4688 | 88FC | B646 | 4688 | 88F2 | F646 | 4688 |
| 0000047440 | 88EE | 5286 | 2BFE | 89C0 | EA46 | 4689 | 89BA | FE46 |
| 0000047460 | 4689 | 89C4 | C246 | 68EB | 9090 | 46FF | C40A | 0A5E |
| 0000047500 | 8A26 | 2A07 | 8BE4 | F6F8 | 4585 | 0413 | 1A74 | 46FF |
| 0000047520 | 8BBA | FE46 | C88B | E0C1 | 0302 | D1C1 | 03E0 | 2DC7 |
| 0000047540 | 0030 | 4689 | EBFE | 9039 | 6C3D | 7400 | 771C | 3C2D |
| 0000047560 | 744C | 7F13 | 2C1F | 742A | 2C15 | 741C | EB23 | 901D |
| 0000047600 | 46FE | EBFC | 901B | 46FE | FEF6 | F646 | 12EB | 46FE |
| 0000047620 | EBEE | 900D | 4E2C | 0874 | 1A2C | E474 | 86FE | FE52 |
| 0000047640 | BE80 | FE52 | 7400 | 8093 | EE7E | 7500 | C414 | 0E5E |
| 0000047660 | 4683 | 040E | 8B26 | 2607 | 578B | 8902 | F846 | 5689 |
| 0000047700 | C6FA | 5286 | 00FE | 5EC4 | 260A | 078A | 200C | E42A |
| 0000047720 | F88B | FF83 | 746E | 8329 | 63FF | 1674 | FF83 | 747B |
| 0000047740 | 8D11 | E846 | 5016 | 76FF | FF08 | 0676 | BBE8 | EB06 |
| 0000047760 | 900D | 46FF | FFE8 | 0876 | 76FF | E806 | 0662 | F08B |
| 0000050000 | 7E83 | 00BA | 0974 | 7E83 | 00FE | 0375 | 83E9 | 8B05 |
| 0000050020 | E9C7 | 05A0 | 7E83 | 00BA | 0675 | 46FF | FFBA | FE46 |
| 0000050040 | 46C7 | B2BC | 8C12 | BE5E | 23EB | 46C7 | ACBC | EB12 |
| 0000050060 | 90F4 | 46FF | C40A | 0A5E | 5E89 | 8CBC | BE46 | 8026 |
| 0000050100 | 5E3F | 0C75 | 478D | 8901 | BC46 | 468C | FEBE | B64E |
| 0000050120 | 206A | 006A | 468D | 16C8 | 9A50 | 6444 | 4B97 | C483 |
| 0000050140 | 8308 | 7BFF | 0374 | A9E9 | C400 | BC5E | 8026 | 5D3F |
| 0000050160 | 0374 | 9DE9 | C600 | C046 | FF5D | BC46 | 46C6 | 20D3 |
| 0000050200 | 8FE9 | 9000 | 8A26 | 8807 | F446 | 46FF | 3CBC | 752D |
| 0000050220 | 800F | C07E | 7400 | 8B09 | BC5E | 8026 | 5D3F | 1E75 |
| 0000050240 | 5E8A | 88F4 | C05E | 01B0 | CB8A | E180 | C007 | 03EB |
| 0000050260 | FF2A | 568D | 03C8 | D2DA | 36E0 | 0708 | 54EB | 46FF |
| 0000050300 | 26BC | 078A | 4688 | 3AF4 | C046 | 0676 | 4688 | EBF0 |
| 0000050320 | 900D | 468A | 88C0 | F046 | 468A | 88F4 | C046 | 468A |
| 0000050340 | 88C0 | F446 | 1CEB | 5E8A | B0F4 | 8A01 | 80CB | 07E1 |
| 0000050360 | EBC0 | 2A03 | 8DFF | C856 | DA03 | E0D2 | 0836 | FE07 |
| 0000050400 | F446 | 468A | 98F0 | 4E8A | 2AF4 | 3BED | 7DC1 | 88D7 |
| 0000050420 | C06E | 5EC4 | 26BC | 3F80 | 745D | E903 | FF66 | 8026 |

THU MAR 14 17:45:10 1991 RV.DLL PAGE 23, LINE 1299

| | | | | | | | | |
|---|---|---|---|---|---|---|---|---|
| 0000050440 | 003F | 0375 | FFE9 | 8304 | 7BFF | 0A75 | C38B | C28C |
| 0000050460 | 4689 | 890A | 0C56 | 468B | 8BF8 | FA56 | 8689 | FE54 |
| 0000050500 | 9689 | FE56 | 7E83 | 00BA | 0A74 | 468B | FFFE | FE4E |
| 0000050520 | C00B | 4E74 | FE83 | 74FF | 8B49 | C1DE | 03FB | 468D |
| 0000050540 | 03C8 | 36D8 | 078A | 4632 | 98B6 | 01BA | 8B00 | 8BCE |
| 0000050560 | 80D9 | 07E1 | E2D3 | C285 | 2874 | 7E80 | 00EE | 0E75 |
| 0000050600 | C68B | 5EC4 | FFF8 | F846 | 8826 | EB07 | 9005 | 86FF |
| 0000050620 | FE54 | 46FF | FFE8 | 0876 | 76FF | E806 | 04C2 | F08B |
| 0000050640 | A2EB | 4EFF | 56E8 | 76FF | FF08 | 0676 | DFE8 | 8B04 |
| 0000050660 | F846 | 568B | 39FA | 5486 | 75FE | 3909 | 5696 | 75FE |
| 0000050700 | E903 | 0462 | 7E80 | 00EE | 0374 | 29E9 | FF04 | C646 |
| 0000050720 | FF83 | 7563 | E903 | 041E | C28E | D88B | C626 | 0007 |
| 0000050740 | 13E9 | 9004 | 64BF | 8300 | 2DFE | 0675 | 46FE | EBF2 |
| 0000050760 | 9006 | FE83 | 752B | FF1F | FE4E | 0C75 | 7E83 | 00BA |
| 0000051000 | 0674 | 86FE | FE52 | 0EEB | 46FF | FFE8 | 0876 | 76FF |
| 0000051020 | E806 | 044C | F08B | FE83 | 7430 | E903 | 0155 | 46FF |
| 0000051040 | FFE8 | 0876 | 76FF | E806 | 0436 | F08B | 783C | 0474 |
| 0000051060 | 583C | 1475 | 46FF | FFE8 | 0876 | 76FF | E806 | 0420 |
| 0000051100 | F08B | 78BF | E900 | 012B | 46FF | 83EA | 78FF | 0674 |
| 0000051120 | 6FBF | E900 | 011D | 4EFF | 56E8 | 76FF | FF08 | 0676 |
| 0000051140 | 2BE8 | BE04 | 0030 | 0AE9 | 9001 | 7E80 | 00FC | 0675 |
| 0000051160 | 46FE | BFF6 | 0046 | FE83 | 752D | FE05 | F246 | 08EB |
| 0000051200 | FE83 | 742B | E903 | 00EB | 4EFF | 74FE | E903 | 0095 |
| 0000051220 | 7E83 | 00BA | 0375 | 8CE9 | FE00 | 5286 | E9FE | 00D3 |
| 0000051240 | FF83 | 7478 | 830D | 70FF | 0874 | FF83 | 7446 | E903 |
| 0000051260 | 0084 | 84F6 | 1345 | 7480 | 6A15 | 8D04 | C246 | 5016 |
| 0000051300 | AE9A | 4164 | 5651 | 79E8 | 8B03 | EBF0 | 9036 | FF83 |
| 0000051320 | 7546 | 832C | EA7E | 7400 | 8326 | 3AFE | 1C75 | 468B |
| 0000051340 | 89C2 | EC46 | C02B | 4689 | 89C4 | C246 | 46C7 | FFEA |
| 0000051360 | BFFF | 0070 | 30BE | EB00 | 900A | 46C7 | 00EA | FE00 |
| 0000051400 | 5286 | 80FE | 52BE | 00FE | 5C75 | 46FF | 8DEA | D044 |
| 0000051420 | 0199 | C246 | 5611 | 83C4 | BA7E | 7400 | FF08 | FE4E |
| 0000051440 | 0375 | 74E9 | FFFF | E846 | 76FF | FF08 | 0676 | 2FE8 |
| 0000051460 | 8B03 | EBF0 | 903E | 84F6 | 1345 | 7404 | 83C2 | 6FFF |
| 0000051500 | 1475 | FE83 | 7D38 | 6AB8 | 8D03 | C246 | 5016 | AE9A |
| 0000051520 | 5264 | EB51 | 90AE | 006A | 0A6A | 468D | 16C2 | 9A50 |
| 0000051540 | 648C | 4C9B | 9DEB | 4EFF | 56E8 | 76FF | FF08 | 0676 |
| 0000051560 | 1BE8 | 8003 | 52BE | 00FE | 0375 | 23E9 | 83FF | 70FF |
| 0000051600 | 0F75 | 7E80 | 00F6 | 0974 | 468B | 8BEC | C24E | 4689 |
| 0000051620 | 80C4 | F27E | 7400 | F70A | C25E | 5683 | 00C4 | 5EF7 |
| 0000051640 | 83C4 | 46FF | 0575 | 46C7 | 00EA | 8300 | EA7E | 7500 |
| 0000051660 | E903 | 0272 | 7E80 | 00EE | 0374 | 39E9 | FF02 | C646 |
| 0000051700 | 7E80 | 00F6 | 1474 | 468B | 8BC2 | C456 | 5EC4 | 26F8 |
| 0000051720 | 0789 | 8926 | 0257 | 1DE9 | 9002 | 468B | C4C2 | F85E |
| 0000051740 | 8926 | E907 | 0210 | 468B | 99E8 | 4689 | 89C2 | C456 |
| 0000051760 | CEEB | 868D | FE58 | 4689 | 8CBC | BE56 | FE83 | 752D |
| 0000052000 | 8B13 | 36D8 | 07C6 | 8D2D | 5986 | 89FE | BC46 | 568C |
| 0000052020 | EBBE | 9006 | FE83 | 752B | FF11 | FE4E | 46FF | FFE8 |
| 0000052040 | 0876 | 76FF | E806 | 0238 | F08B | 7E83 | 00BA | 0774 |
| 0000052060 | 7E81 | 5DFE | 7E01 | C72D | FE46 | 015D | 26EB | 468B |
| 0000052100 | FFFE | FE4E | C00B | 2374 | 46FF | 8BEA | C4C6 | BC5E |
| 0000052120 | 46FF | 26BC | 0788 | 46FF | FFE8 | 0876 | 76FF | E806 |
| 0000052140 | 01FE | F08B | 84F6 | 1345 | 7504 | 83D3 | 2EFE | 4375 |
| 0000052160 | 468B | FFFE | FE4E | C00B | 3974 | 5EC4 | FFBC | BC46 |
| 0000052200 | C626 | 2E07 | 18EB | 468B | FFFE | FE4E | C00B | 2374 |
| 0000052220 | 46FF | 8BEA | C4C6 | BC5E | 46FF | 26BC | 0788 | 46FF |
| 0000052240 | FFE8 | 0876 | 76FF | E806 | 01B6 | F08B | 84F6 | 1345 |
| 0000052260 | 7504 | 83D3 | EA7E | 7500 | E903 | 0081 | C68B | 653C |
| 0000052300 | 0474 | 453C | 7775 | 468B | FFFE | FE4E | C00B | 6D74 |

THU MAR 14 17:45:10 1991 RV.DLL PAGE 24, LINE 1358

| | | | | | | | | |
|---|---|---|---|---|---|---|---|---|
| 0000052320 | 5EC4 | FFBC | BC46 | C626 | 6507 | 46FF | FFE8 | 0876 |
| 0000052340 | 76FF | E806 | 017A | F08B | FE83 | 752D | C40F | BC5E |
| 0000052360 | 46FF | 26BC | 07C6 | EB2D | 9008 | 9090 | FE83 | 752B |
| 0000052400 | 8B35 | FE46 | 4EFF | 0BFE | 75C0 | FF1D | FE46 | 26EB |
| 0000052420 | 468B | FFFE | FE4E | C00B | 2374 | 46FF | 8BEA | C4C6 |
| 0000052440 | BC5E | 46FF | 26BC | 0788 | 46FF | FFE8 | 0876 | 76FF |
| 0000052460 | E806 | 012C | F08B | 84F6 | 1345 | 7504 | FFD3 | E84E |
| 0000052500 | FF56 | 0876 | 76FF | E806 | 0144 | 7E83 | 00EA | 0375 |
| 0000052520 | D3E9 | 8000 | EE7E | 7400 | E903 | 009A | 46FF | C4C6 |
| 0000052540 | BC5E | C626 | 0007 | 868D | FE58 | 5016 | 76FF | FFFA |
| 0000052560 | F876 | 468A | 98F6 | 8E50 | 6C06 | 2614 | 1EFF | 132E |
| 0000052600 | C483 | EB0A | 9071 | 5EC4 | 260A | 078A | E42A | C63B |
| 0000052620 | 1274 | 4EFF | 56E8 | 76FF | FF08 | 0676 | EFE8 | E900 |
| 0000052640 | 0084 | 9090 | 4EFE | 80B8 | EE7E | 7500 | 8349 | 0E6E |
| 0000052660 | EB04 | 9043 | 632D | 3D00 | 0018 | CA77 | E0D1 | 2E93 |
| 0000052700 | A7FF | 53B4 | 4E04 | 5066 | 51E2 | 51E2 | 51E2 | 5376 |
| 0000052720 | 4FD4 | 5376 | 5376 | 5376 | 5376 | 51D6 | 5066 | 505A |
| 0000052740 | 5376 | 5376 | 4E1A | 5376 | 5066 | 5376 | 5376 | 4FD7 |
| 0000052760 | 5376 | 5376 | 4E22 | 46FE | FFB8 | 0A46 | 20EB | 46FF |
| 0000053000 | FFE8 | 0876 | 76FF | E806 | 0056 | F08B | 5EC4 | FF0A |
| 0000053020 | 0A46 | 8A26 | 2A07 | 3BE4 | 74F0 | E903 | FF74 | FE83 |
| 0000053040 | 74FF | E903 | F895 | FE83 | 75FF | 830C | C67E | 7500 |
| 0000053060 | 8006 | B87E | 7400 | 8B05 | C646 | 02EB | C68B | 5F5E |
| 0000053100 | CBC9 | 8B55 | 8BEC | 045E | 87F6 | 1345 | 7404 | 8B05 |
| 0000053120 | EBC3 | 9008 | C38B | DF24 | 072D | C900 | 02C2 | 9000 |
| 0000053140 | 04C8 | 0000 | 5EC4 | 2604 | 4FFF | 7804 | 2615 | 078B |
| 0000053160 | 8B26 | 0257 | FF26 | 8B07 | 8ED8 | 26C2 | 078A | E42A |
| 0000053200 | 07EB | 5306 | 969A | 9349 | C954 | 04C2 | 900D | 8B55 |
| 0000053220 | 83EC | 087E | 74FF | FF0E | 0676 | 76FF | FF04 | 0876 |
| 0000053240 | F69A | B359 | C950 | 06C2 | 9000 | 8B55 | 56EC | 5EC4 |
| 0000053260 | 2608 | 07FF | 76FF | FFD6 | 0476 | A3E8 | 8BFF | F6F0 |
| 0000053300 | 4584 | 0813 | E875 | C95E | 08C2 | 9000 | 5524 | 552F |
| 0000053320 | 5545 | 5579 | 55A5 | 55AD | 55D6 | 5608 | 8B55 | B8EC |
| 0000053340 | 0171 | E80E | F278 | 5756 | C033 | 4689 | 88F8 | FB46 |
| 0000053360 | 76C4 | 260A | 89AC | 0A76 | 4688 | 0AFE | 74C0 | 8306 |
| 0000053400 | F87E | 7D00 | 8B06 | F846 | B5E9 | BB04 | 12B4 | 202C |
| 0000053420 | 583C | 0577 | 24D7 | EB0F | B002 | B100 | D203 | 02E0 |
| 0000053440 | FB46 | FED7 | D2C1 | 88E8 | FB46 | 8B98 | D1D8 | 2EE3 |
| 0000053460 | A7FF | 54BC | 568A | B9FE | 0001 | 36E8 | EB04 | 33B1 |
| 0000053500 | 89C0 | F046 | 4689 | 89F6 | EE46 | 46C7 | 20FC | 4800 |
| 0000053520 | 4689 | EBF4 | 8A9B | FE46 | 2D3C | 0675 | 4E80 | 04FC |
| 0000053540 | 8EEB | 2B3C | 0675 | 4E80 | 01FC | 84EB | 203C | 0775 |
| 0000053560 | 4E80 | 02FC | 79E9 | 3CFF | 7523 | 8007 | FC4E | E980 |
| 0000053600 | FF6E | 4E80 | 08FC | 67E9 | 8AFF | FE4E | F980 | 752A |
| 0000053620 | E80F | 035C | C00B | 1779 | D8F7 | 4E80 | 04FC | 0FEB |
| 0000053640 | E980 | 3230 | 8BED | F646 | 0ABB | F700 | 03E3 | 89C1 |
| 0000053660 | F646 | 3BE9 | C7FF | F446 | 0000 | 33E9 | 8AFF | FE4E |
| 0000053700 | F980 | 752A | E80C | 0328 | C00B | 1479 | FFB8 | EBFF |
| 0000053720 | 800F | 30E9 | ED32 | 468B | BBF4 | 000A | E3F7 | C103 |
| 0000053740 | 4689 | E9F4 | FF0A | 468A | 3CFE | 756C | 8006 | FC4E |
| 0000053760 | EB10 | 3C22 | 7546 | 8006 | FC4E | EB20 | 3C18 | 754E |
| 0000054000 | 8006 | FD4E | EB10 | 3C0E | 754C | 8006 | FD4E | EB04 |
| 0000054020 | 8004 | FD4E | E908 | FED8 | 468A | 3CFE | 7564 | E903 |
| 0000054040 | 0194 | 693C | 0375 | 8DE9 | 3C01 | 7575 | E903 | 018A |
| 0000054060 | 583C | 0375 | 89E9 | 3C01 | 7578 | E903 | 0188 | 6F3C |
| 0000054100 | 0375 | A2E9 | 3C01 | 7463 | 3C1A | 7473 | 3C27 | 746E |
| 0000054120 | 3C51 | 7470 | 3C60 | 7445 | 3C07 | 7447 | E903 | 00BB |
| 0000054140 | B5E9 | E800 | 028A | BE8D | FE8F | 0716 | 4FAA | 01B9 |
| 0000054160 | E900 | 01F1 | 90E8 | 0B02 | 75FF | 8C12 | 0BC0 | 75C0 |

THU MAR 14 17:45:10 1991 RV.DLL PAGE 25, LINE 1417

| | | | | | | | | |
|---|---|---|---|---|---|---|---|---|
| 0000054200 | 1E0C | BF07 | 130D | 0E8B | 1313 | D8E9 | 5701 | 4E8B |
| 0000054220 | E3F4 | 3207 | F2C0 | 75AE | 4F01 | 2B59 | 87F9 | E9CF |
| 0000054240 | 01C3 | 62E8 | 8B02 | F846 | F6AB | FC46 | 7410 | 3303 |
| 0000054260 | ABC0 | 3BE9 | F6FE | FC46 | 7530 | E805 | 0232 | 39EB |
| 0000054300 | 36E8 | F602 | FD46 | 7518 | C630 | FF46 | B907 | 0010 |
| 0000054320 | 0716 | 3352 | C0D2 | 97BE | BEFE | 0004 | B0E8 | B902 |
| 0000054340 | 0010 | BE8D | FE92 | 3358 | BED2 | 0004 | A0E8 | C602 |
| 0000054360 | 9386 | 3AFE | 09B9 | EB00 | C618 | FF46 | B907 | 0010 |
| 0000054400 | 0716 | D233 | BE8D | FE92 | 04BE | E800 | 0281 | 04B9 |
| 0000054420 | 8D00 | 8FBE | E9FE | 014D | 46FF | 80EE | FC4E | 8A40 |
| 0000054440 | FE46 | 200C | 8B98 | 83F0 | F47E | 7F00 | 7413 | C707 |
| 0000054460 | F446 | 0006 | 0AEB | 673D | 7500 | C705 | F446 | 0001 |
| 0000054500 | BE8D | FE8F | 76FF | FFEE | F476 | 1656 | FF57 | 1076 |
| 0000054520 | 76FF | F60E | FD46 | 7404 | FF0A | 3A1E | 8313 | 0E46 |
| 0000054540 | EB0A | FF08 | 261E | 8313 | 0E46 | 8308 | 0EC4 | 46F6 |
| 0000054560 | 80FC | 0F74 | 7E83 | 00F4 | 0975 | 5716 | 1EFF | 1332 |
| 0000054600 | C483 | 8304 | 67FE | 1075 | 46F7 | 80FC | 7500 | 1609 |
| 0000054620 | FF57 | 2A1E | 8313 | 04C4 | 0716 | 8026 | 2D3D | 0575 |
| 0000054640 | 8047 | FD4E | B901 | FFFF | B057 | F200 | 4FAE | 2B59 |
| 0000054660 | 87F9 | E9CF | 00AF | 4E80 | 40FC | 46C6 | 0AFA | 35EB |
| 0000054700 | 46C6 | 07FF | 04EB | 46C6 | 27FF | 46F6 | 80FC | 1174 |
| 0000054720 | 46C7 | 02F0 | C600 | F246 | B230 | 0251 | FF56 | 5688 |
| 0000054740 | C6F3 | FA46 | EB10 | F60E | FC46 | 7480 | 8004 | FD4E |
| 0000054760 | C602 | FA46 | F608 | FC46 | 7410 | E805 | 00FB | 0EEB |
| 0000055000 | EDE8 | F600 | FC46 | 7440 | 9903 | 02EB | D233 | 46F6 |
| 0000055020 | 40FC | 0F74 | D20B | 0B7D | 4E80 | 01FD | D8F7 | D283 |
| 0000055040 | F700 | 83DA | F47E | 7D00 | C707 | F446 | 0001 | 04EB |
| 0000055060 | 6680 | F7FC | D88B | DA0B | 0575 | 46C7 | 00F0 | 8D00 |
| 0000055100 | EB7E | 0716 | 4E8A | 32FA | 8BED | F476 | 40E8 | F601 |
| 0000055120 | FD46 | 7402 | E30E | 2606 | 3D80 | 7430 | 4F06 | C626 |
| 0000055140 | 3005 | EB41 | F600 | FC46 | 7440 | F631 | FD46 | 7401 |
| 0000055160 | C60B | F246 | C72D | F046 | 0001 | 20EB | 46F6 | 01FC |
| 0000055200 | 0B74 | 46C6 | 2BF2 | 46C7 | 01F0 | EB00 | F60F | FC46 |
| 0000055220 | 7402 | C609 | F246 | C720 | F046 | 0001 | 468B | 2BF6 |
| 0000055240 | 2BC1 | F046 | 027D | C033 | 5706 | F651 | FC46 | 750C |
| 0000055260 | 8B07 | B2C8 | E820 | 00BB | 1650 | 8D07 | F27E | 4E8B |
| 0000055300 | E8F0 | 0091 | F658 | FC46 | 7408 | F60D | FC46 | 7504 |
| 0000055320 | 8B07 | B2C8 | E830 | 009B | 5F59 | 5007 | 76E8 | 5800 |
| 0000055340 | 46F6 | 04FC | 0774 | C88B | 20B2 | 86E8 | E900 | FC00 |
| 0000055360 | 76C4 | 260E | 89AD | 0E76 | C4C3 | 0E76 | AD26 | D08B |
| 0000055400 | AD26 | 8992 | 0E76 | F6C3 | FC46 | 7420 | E808 | FFE9 |
| 0000055420 | C28E | F88B | E8C3 | FFD8 | F88B | C00B | 0375 | C08E |
| 0000055440 | 1EC3 | C307 | 0698 | C457 | 065E | FF26 | 044F | 1078 |
| 0000055460 | 8B26 | 263F | 07FF | 8E26 | 0247 | 33AA | 5FC0 | C307 |
| 0000055500 | 5251 | 5306 | 0E50 | F9E8 | 83F0 | 06C4 | 595A | FF3D |
| 0000055520 | 75FF | EBE8 | E3E8 | 8B1B | 01F7 | F84E | 3357 | 26FF |
| 0000055540 | E8AC | FFC0 | F80B | F7E2 | FF0B | 745F | C705 | F846 |
| 0000055560 | FFFF | E3C3 | 0119 | F84E | 3357 | 8AFF | E8C2 | FFA4 |
| 0000055600 | F80B | F7E2 | FF0B | 745F | C705 | F846 | FFFF | FDC3 |
| 0000055620 | 9357 | F60B | 0A7F | DB0B | 0675 | D20B | 0275 | 1AEB |
| 0000055640 | 3392 | F7D2 | 93F1 | F1F7 | 8792 | 04D3 | 3C30 | 7639 |
| 0000055660 | 0203 | FF46 | 8BAA | 4EC2 | D8EB | 2B59 | 47CF | C3FC |
| 0000055700 | 5E5F | E58B | CB5D | 04C8 | 0000 | 8B56 | 0676 | 468B |
| 0000055720 | 2D08 | 0EE8 | 0CB9 | 9900 | F9F7 | 4689 | 50FE | B5E8 |
| 0000055740 | 8307 | 02C4 | 76FF | FF0A | 0876 | 9A56 | 59F6 | 5477 |
| 0000055760 | C483 | 8906 | FC46 | 76FF | E8FE | 07A6 | C483 | 8B02 |
| 0000056000 | FC46 | C95E | 90CB | 8B55 | 57EC | 8B56 | 0676 | 7E8B |
| 0000056020 | 8308 | FFFE | 1274 | 45F6 | 010A | 1275 | 45F6 | 800A |
| 0000056040 | 0674 | 45F6 | 020A | 0674 | FFB8 | EBFF | 903E | 458B |

THU MAR 14 17:45:10 1991 RV.DLL PAGE 26, LINE 1476

| | | | | | | | | |
|---|---|---|---|---|---|---|---|---|
| 0000056060 | 0B08 | 0645 | 0875 | 571E | EDE8 | 83F0 | 04C4 | 058B |
| 0000056100 | 558B | 3902 | 0645 | 0D75 | 5539 | 7508 | 8308 | 047D |
| 0000056120 | 7500 | FFD5 | FF05 | 0445 | C68B | 0DFF | 1DC4 | 8826 |
| 0000056140 | 8007 | 0A65 | 80EF | 0A4D | 2A01 | 5EE4 | C95F | 90CB |
| 0000056160 | 8B55 | 83EC | 02EC | C033 | 09EB | 8B55 | 83EC | 02EC |
| 0000056200 | FFB8 | 89FF | FE46 | 5E8B | 3B06 | C71E | 720C | BA12 |
| 0000056220 | 0009 | C033 | 9BE9 | 8BEE | FE4E | C90B | 0774 | E853 |
| 0000056240 | 0718 | C483 | E902 | EEA3 | C00B | 0774 | E853 | 06FE |
| 0000056260 | C483 | 8302 | 04EC | CC8B | FF53 | 0A76 | 76FF | FF08 |
| 0000056300 | 0C76 | 5116 | FF9A | 00FF | 5900 | 855A | 75C0 | 80C8 |
| 0000056320 | C9A7 | FD0C | 468B | 0BFE | 74C0 | 5307 | DBE8 | 8306 |
| 0000056340 | 02C4 | 8B91 | 5DE5 | 00CB | 8B55 | 83EC | 08EC | C033 |
| 0000056360 | 5E8B | 3B06 | C71E | 730C | 534D | B1E8 | 8306 | 02C4 |
| 0000056400 | 4E8B | E30C | F647 | C987 | 020C | 4075 | 3357 | 8BD2 |
| 0000056420 | 0C4E | 7EC4 | F608 | C987 | 080C | 1074 | 878A | 0DC9 |
| 0000056440 | 0A3C | 0874 | 42AA | C649 | C987 | 0A0D | 0653 | 5157 |
| 0000056460 | 468D | 16FA | 9A50 | FFFF | 0000 | 0B5F | 74C0 | 530F |
| 0000056500 | 77E8 | 8306 | 02C4 | 09BA | E900 | EDE6 | 4AEB | 468B |
| 0000056520 | 03FA | F6C2 | C987 | 800C | 3E74 | A780 | 0CC9 | 56FB |
| 0000056540 | 1E57 | C507 | 0876 | FE8B | C88B | 28E3 | 0DB4 | 3C80 |
| 0000056560 | 750A | 2606 | 8F80 | 0CC9 | AC04 | C43A | 2574 | 1A3C |
| 0000056600 | 0875 | 8026 | C98F | 020C | 05EB | 0588 | E247 | 8BEA |
| 0000056620 | 2BC7 | 0846 | 1F06 | 5E5F | E853 | 061E | C483 | 8B02 |
| 0000056640 | 5DE5 | 83CB | 01F9 | 0774 | 3C80 | 740A | EBE0 | 26DB |
| 0000056660 | 87F6 | 0CC9 | 7440 | 0B2B | 75DB | 5323 | 468D | 16F9 |
| 0000056700 | 5150 | 468D | 16FA | 9A50 | 5B26 | 0000 | C085 | 0E74 |
| 0000056720 | 1F06 | 5E5F | E853 | 05E2 | C483 | E902 | ED6D | 0AB0 |
| 0000056740 | A8EB | 46C6 | 00F9 | 8D53 | F946 | 5016 | 8D51 | FA46 |
| 0000056760 | 5016 | B89A | 005B | 0B00 | 75C0 | F7D5 | FA46 | FFFF |
| 0000057000 | 3674 | 7E83 | 010C | 3574 | F626 | C987 | 080C | 1C75 |
| 0000057020 | B853 | FFFF | 5050 | D8F7 | 8D50 | FC46 | 5016 | B59A |
| 0000057040 | 005A | 8000 | F97E | 750A | E90F | FF61 | 468A | 26F9 |
| 0000057060 | 8788 | 0DC9 | 0A3C | 0274 | 0DB0 | 4DE9 | 80FF | F97E |
| 0000057100 | 750A | EBC5 | 0099 | 8B55 | 83EC | 0EEC | C033 | 09EB |
| 0000057120 | 8B55 | 83EC | 0EEC | FFB8 | 89FF | F246 | 5E8B | 3B06 |
| 0000057140 | C71E | 720C | BA08 | 0009 | C033 | C5E9 | 0BEC | 74C0 |
| 0000057160 | 5307 | 39E8 | 8305 | 02C4 | 87F6 | 0CC9 | 7420 | 5312 |
| 0000057200 | C933 | 5151 | 4141 | 8D51 | F446 | 5016 | 0F9A | 005C |
| 0000057220 | F600 | C987 | 800C | 6674 | 5E8C | 8EFA | 0A46 | 56C5 |
| 0000057240 | 3308 | 89C0 | FE46 | 4689 | FCFC | 5657 | FA8B | F28B |
| 0000057260 | 6689 | 8BF8 | 0C4E | 28E3 | 0ABD | AEF2 | 3B75 | EC83 |
| 0000057300 | 8B02 | BADC | 0080 | E22B | D48B | FA8B | 0716 | 4E8B |
| 0000057320 | AC0C | 0A3C | 0D74 | FB3B | 1A74 | E2AA | E8F4 | 0038 |
| 0000057340 | AFE9 | B000 | 3B0D | 75FB | E803 | 002C | B0AA | FF0A |
| 0000057360 | FC46 | E2EB | 21E8 | EB00 | 5EE1 | 8E5F | FA5E | C8E9 |
| 0000057400 | 8B00 | F246 | C00B | 0974 | 76FF | E806 | 04AC | C483 |
| 0000057420 | B802 | FFFC | E80E | EA46 | 5350 | 1E51 | 1F06 | CF8B |
| 0000057440 | CA2B | 21E3 | 8B51 | 065E | 1E53 | 5152 | 468D | 16F4 |
| 0000057460 | 9A50 | 48C9 | 0000 | 0B59 | 75C0 | 8B11 | F45E | 5E01 |
| 0000057500 | 3BFE | 72D9 | 1F07 | 5B59 | 8B58 | C3FA | 831F | 08C4 |
| 0000057520 | 7E83 | 00FE | 3C75 | C00B | 1874 | 6D3D | 7400 | 3D0D |
| 0000057540 | 0001 | 09BA | 7500 | BA08 | 001C | 03EB | 20BA | F900 |
| 0000057560 | 26EB | 5E8E | F6FA | C987 | 400C | 0E74 | 5E8E | 8B0A |
| 0000057600 | 085E | 3F80 | 751A | F803 | 0EEB | 1CBA | 3300 | F9C0 |
| 0000057620 | 06EB | 468B | 2BFE | FC46 | 668B | 5EF8 | 8E5F | FA5E |
| 0000057640 | 1472 | 5E8B | 0BF2 | 74DB | FF09 | 0676 | 0BE8 | 8304 |
| 0000057660 | 02C4 | E58B | CB5D | 5E8B | 0BF2 | 74DB | FF09 | 0676 |
| 0000057700 | F7E8 | 8303 | 02C4 | 69E9 | 8BEB | 0C4E | C90B | 0475 |
| 0000057720 | C18B | CEEB | C51E | 0856 | 1E53 | 5152 | 468D | 16F4 |

THU MAR 14 17:45:10 1991 RV.DLL PAGE 27, LINE 1535

| | | | | | | | | |
|---|---|---|---|---|---|---|---|---|
| 0000057740 | 9A50 | 5D22 | 0000 | 071E | 0B1F | 74C0 | 3D17 | 006D |
| 0000057760 | 0D74 | 013D | BA00 | 0009 | BC75 | 1CBA | EB00 | BAB7 |
| 0000060000 | 0020 | B2EB | 468B | 0BF4 | 75C0 | F697 | C987 | 400C |
| 0000060020 | DA74 | DA8B | 8026 | 1A3F | 0275 | 86EB | 1CBA | 3300 |
| 0000060040 | EBC0 | 0093 | 3BEA | DE5E | EA59 | 5E5A | 5E17 | 28EA |
| 0000060060 | 1C5E | EA5E | 5E28 | 5E21 | 8B55 | 56EC | 76C4 | 8C06 |
| 0000060100 | E3C1 | 2605 | 4C80 | 01FE | 5D5E | 55CB | EC8B | 096A |
| 0000060120 | 93E8 | 8303 | 02C4 | 76FF | 0E06 | 0DE8 | 5B00 | 096A |
| 0000060140 | ADE8 | 8303 | 02C4 | E58B | CB5D | 8B55 | 56EC | 8B57 |
| 0000060160 | 064E | F983 | 77E8 | 1E69 | 18A1 | 0B13 | 74C0 | BF48 |
| 0000060200 | 5F42 | 368B | 1320 | 1EC5 | 131A | 561E | FF57 | 5FD7 |
| 0000060220 | 735E | 8C2B | C5DA | 0C5F | D63B | EF75 | 1F58 | C41E |
| 0000060240 | 1A36 | 2613 | 748B | C512 | 161E | 8C13 | 3BDA | 75D0 |
| 0000060260 | 1FD9 | 811E | BEFF | 745F | BF0E | 5FBE | C4EB | 815E |
| 0000060300 | 42FF | 745F | EB0F | 070A | BF06 | 1316 | E1E8 | 7201 |
| 0000060320 | E80E | 007E | 891F | 1C16 | 8913 | 1A1E | EB13 | 1F04 |
| 0000060340 | C033 | 5F99 | 5D5E | 00CB | 5706 | F88B | FB03 | 7F89 |
| 0000060360 | 4F04 | 2D4F | 0016 | 778D | C714 | FE05 | 89FF | 0A7F |
| 0000060400 | 8948 | 8C04 | 8B1F | 8CC6 | 8EDA | 8DC2 | 067F | ABFC |
| 0000060420 | 47AB | 3347 | ABC0 | ABAB | 5FAB | C307 | 8B26 | 0245 |
| 0000060440 | C00B | 0975 | 8C26 | 025D | 8926 | EB1D | 0614 | C426 |
| 0000060460 | 0875 | 8C26 | 0E5C | 8926 | 0C5C | 478C | 8912 | 1077 |
| 0000060500 | 2607 | 5D8C | 260A | 5D89 | 2608 | 5D8C | 2606 | 5D89 |
| 0000060520 | C304 | 8041 | FEE1 | FC53 | 778B | 8B08 | 0A5F | FF33 |
| 0000060540 | 23EB | C38B | A85B | 7501 | 5342 | 778B | 8B06 | 085F |
| 0000060560 | DE3B | 3674 | 334B | EBFF | 900C | 548D | 3BFE | 73D3 |
| 0000060600 | 03E1 | 72F0 | AD23 | 01A8 | F074 | FE8B | 3B48 | 73C1 |
| 0000060620 | 0323 | 72F0 | 8B13 | ADD0 | 01A8 | DE74 | C203 | 0205 |
| 0000060640 | 8B00 | 89F7 | FE44 | E4EB | C08B | 8B5B | 0647 | 4789 |
| 0000060660 | F908 | 19EB | 895B | FE4C | 0974 | F903 | C12B | 8948 |
| 0000060700 | 2B05 | 03F9 | 89F9 | 087F | C68B | DA8C | C3F8 | 5751 |
| 0000060720 | 47F6 | 0102 | 6674 | B7E8 | 8B00 | 8BFE | A804 | 7401 |
| 0000060740 | 2B03 | 49C8 | 4141 | 778B | 0B04 | 74F6 | 034F | 73CE |
| 0000060760 | 3309 | BAC0 | FFF0 | 33E3 | 42EB | 76B8 | 8E48 | 26C0 |
| 0000061000 | 24A1 | 3D13 | 2000 | 1674 | 00BA | 3B80 | 72D0 | D106 |
| 0000061020 | 75EA | EBF8 | 8322 | 08FA | 1D72 | E2D1 | C28B | 8B48 |
| 0000061040 | 03D0 | 73C1 | 3302 | F7C0 | 23D2 | 52C2 | 2EE8 | 5A00 |
| 0000061060 | 0D73 | FA83 | 74F0 | B805 | 0010 | E2EB | EBF9 | 8B1B |
| 0000061100 | 2BD0 | 0457 | 4789 | 8904 | 087F | 778B | 4A0A | 1489 |
| 0000061120 | 0342 | C7F2 | FE04 | 89FF | 0A77 | 595F | 8BC3 | F6D0 |
| 0000061140 | 0247 | 7404 | 4A0F | 778B | 4E04 | D63B | 0572 | 5739 |
| 0000061160 | 73FE | 4218 | 1E50 | CD9A | 0044 | 0B00 | 75C0 | 8B0F |
| 0000061200 | F6C2 | 0247 | 7404 | 4A04 | 5789 | F8FE | 01EB | C3F9 |
| 0000061220 | 8B57 | 0877 | 773B | 750A | 8B03 | 0677 | 3DAD | FFFE |
| 0000061240 | 0874 | FE8B | FE24 | F003 | F2EB | 4F4F | F78B | C35F |
| 0000061260 | D18B | C283 | 8027 | F0E2 | 8B50 | 52C4 | 5016 | C033 |
| 0000061300 | 9A50 | FFFF | 0000 | 0B1F | 75C0 | 3314 | 26DB | 458B |
| 0000061320 | 890C | 0247 | C28B | 0FE8 | E8FE | FE40 | EBF8 | F901 |
| 0000061340 | 00C3 | 8B55 | 8BEC | 8BD7 | 1EDE | 76C5 | 8B0A | 8CFE |
| 0000061360 | 8ED8 | 33C0 | B9C0 | FFFF | AEF2 | D1F7 | 7EC4 | 8B06 |
| 0000061400 | A8C7 | 7401 | A402 | D149 | F3E9 | 13A5 | F3C9 | 8BA4 |
| 0000061420 | 8BF3 | 1FFA | C28C | CB5D | 8B55 | 8BEC | 8BD7 | 1EDE |
| 0000061440 | 76C5 | C406 | 0A7E | C033 | FFB9 | F2FF | F7AE | 2BD1 |
| 0000061460 | F3F9 | 74A6 | 1B05 | 1DC0 | FFFF | 8B1F | 8BF3 | 5DFA |
| 0000061500 | 00CB | 8B55 | 8BEC | C4D7 | 067E | C033 | FFB9 | F2FF |
| 0000061520 | F7AE | 49D1 | 8B91 | 5DFA | 00CB | 8B55 | 57EC | 1E56 |
| 0000061540 | 4E8B | E30E | 8B27 | C4D9 | 067E | F78B | C033 | AEF2 |
| 0000061560 | D9F7 | CB03 | FE8B | 76C5 | F30A | 8AA6 | FF44 | C933 |
| 0000061600 | 3A26 | FF45 | 0477 | 0474 | 4949 | D1F7 | C18B | 5E1F |

THU MAR 14 17:45:10 1991 RV.DLL PAGE 28, LINE 1594

| | | | | | | | | |
|---|---|---|---|---|---|---|---|---|
| 0000061620 | 8B5F | 5DE5 | 00CB | 8B55 | 50EC | 468B | 0504 | 0014 |
| 0000061640 | 4BEB | 8B55 | 50EC | 468B | 0504 | 0014 | 69EB | 8B55 |
| 0000061660 | 50EC | 468B | 0504 | 0114 | 33EB | 8B55 | 50EC | 468B |
| 0000061700 | 0504 | 0114 | 51EB | 8B55 | 50EC | 468B | C104 | 02E0 |
| 0000061720 | FF68 | 50FF | FF6A | FF6A | FF9A | 00FF | 0B00 | 75C0 |
| 0000061740 | 5829 | E58B | C35D | 8B55 | 50EC | 468B | FF04 | 4606 |
| 0000061760 | C114 | 02E0 | C168 | 5061 | FF6A | FF6A | FF9A | 00FF |
| 0000062000 | 0B00 | 75C0 | 5805 | E58B | C35D | 11B8 | E900 | E315 |
| 0000062020 | 8B55 | 50EC | 468B | C104 | 02E0 | E568 | 5061 | FF9A |
| 0000062040 | 00FF | 0B00 | 75C0 | FFE3 | 460E | 5814 | E58B | C35D |
| 0000062060 | 8B55 | FFEC | 0676 | ADE8 | 83FF | 02C4 | E58B | CB5D |
| 0000062100 | 8B55 | FFEC | 0676 | C7E8 | 83FF | 02C4 | E58B | CB5D |
| 0000062120 | 068E | 0C88 | A126 | 0006 | 3B48 | 4806 | 7714 | C107 |
| 0000062140 | 06E0 | FFBA | C3FF | 5357 | 6A51 | E80F | FF78 | C483 |
| 0000062160 | 3B02 | 4806 | 7614 | 8B40 | 05D8 | 0004 | FC25 | 8BFF |
| 0000062200 | C1C8 | 06E0 | 53BA | 5062 | 9A52 | 6067 | 0000 | C00B |
| 0000062220 | 3275 | 8B49 | 87F9 | 483E | 2B14 | 51CF | C147 | 06E7 |
| 0000062240 | E1C1 | 5705 | C28E | ABF3 | 595F | C726 | 0445 | 0200 |
| 0000062260 | C783 | E240 | 8BF5 | 6AC3 | E80F | FF54 | C483 | 5902 |
| 0000062300 | 5F5B | 9BEB | 10B8 | E900 | E25B | 04C8 | 0000 | 5657 |
| 0000062320 | 126A | 11E8 | 83FF | 02C4 | D6C6 | 18F0 | 8B42 | 0646 |
| 0000062340 | 568B | A308 | 18EC | 1689 | 18EE | E6BE | 8918 | 8904 |
| 0000062360 | 0254 | 06C7 | 18EA | 7FFF | 468D | 160E | FF50 | 0C76 |
| 0000062400 | 76FF | 1E0A | 9A56 | 54CC | 631B | C483 | 8B0C | FFF8 |
| 0000062420 | EA0E | 7818 | C40F | E61E | FF18 | E606 | 2618 | 07C6 |
| 0000062440 | EB00 | 900D | 561E | 006A | 329A | 264A | 835E | 06C4 |
| 0000062460 | 126A | DBE8 | 83FE | 02C4 | C78B | 5F5E | CBC9 | 04C8 |
| 0000062500 | 0000 | 5657 | 116A | 9DE8 | 83FE | 02C4 | 06C6 | 18FC |
| 0000062520 | 8B49 | 0646 | 568B | A308 | 18F8 | 1689 | 18FA | F2BE |
| 0000062540 | 8918 | 8904 | 0254 | 5052 | 329A | 7561 | 8363 | 04C4 |
| 0000062560 | F6A3 | 8D18 | 0E46 | 5016 | 76FF | FF0C | 0A76 | 681E |
| 0000062600 | 18F2 | 929A | F84C | 8362 | 0CC4 | F88B | 116A | 7FE8 |
| 0000062620 | 83FE | 02C4 | C78B | 5F5E | CBC9 | 8B55 | 57EC | 468B |
| 0000062640 | F706 | 0866 | 0573 | C033 | EB99 | 501A | 149A | 5B5E |
| 0000062660 | 5963 | D88B | DA0B | 0D74 | 8B50 | 8EF8 | 33C2 | 41C0 |
| 0000062700 | E9D1 | ABF3 | 5F58 | CB5D | 8B55 | 57EC | 7EC4 | 8B06 |
| 0000062720 | 33DF | B9C0 | FFFF | AEF2 | F741 | 8AD9 | 0A46 | FB8B |
| 0000062740 | AEF2 | 264F | 0538 | 0474 | FF33 | C78E | C78B | C28C |
| 0000062760 | 8B5F | 5DE5 | 00CB | 8B55 | 8BEC | 0E4E | 571E | E356 |
| 0000063000 | C548 | 0A76 | 7EC4 | 8B06 | 48C1 | D78B | D2F7 | C22B |
| 0000063020 | DB1B | C323 | C203 | D68B | D2F7 | C22B | DB1B | C323 |
| 0000063040 | C203 | 9140 | C12B | E9D1 | A5F3 | C913 | A4F3 | E391 |
| 0000063060 | 0B18 | 75F6 | 8C07 | 05D8 | FFFF | D88E | FF0B | C775 |
| 0000063100 | C08C | 2805 | 8E64 | EBC0 | 8BBE | 0646 | 568B | 5E08 |
| 0000063120 | 1F5F | CB5D | 8B55 | 8BEC | 0C4E | 38E3 | C457 | 067E |
| 0000063140 | D78B | DAF7 | 0C74 | D12B | DB1B | D323 | D103 | D187 |
| 0000063160 | D12B | 468B | 8A0A | D1E0 | F3E9 | 13AB | F3C9 | 87AA |
| 0000063200 | E3D1 | 8C1D | 81C3 | 33C3 | 8E64 | D1C3 | F3E9 | 13AB |
| 0000063220 | F3C9 | 5FAA | 468B | 8B06 | 0856 | CB5D | 8B55 | 1EEC |
| 0000063240 | C553 | 065E | 76FF | FF0C | 0A76 | 77FF | FF02 | 0E37 |
| 0000063260 | 2BE8 | 8900 | 8907 | 0257 | 1F5B | CA5D | 0008 | 8B55 |
| 0000063300 | 1EEC | C553 | 065E | 078B | 578B | 8B02 | 0A4E | E80E |
| 0000063320 | 003E | 0789 | 5789 | 5B02 | 5D1F | 06CA | 0000 | 8B55 |
| 0000063340 | 8BEC | 0846 | 4E8B | 0B0C | 8BC8 | 0A4E | 0975 | 468B |
| 0000063360 | F706 | 5DE1 | 08CA | 5300 | E1F7 | D88B | 468B | F706 |
| 0000063400 | 0C66 | D803 | 468B | F706 | 03E1 | 5BD3 | CA5D | 0008 |
| 0000063420 | ED32 | 06E3 | E0D1 | D2D1 | FAE2 | 37CB | 0300 | D802 |
| 0000063440 | 0338 | 6B00 | 0200 | 9F00 | 0163 | 0000 | 0500 | 9E02 |
| 0000063460 | 0341 | 2500 | 0200 | 7500 | 0262 | 0000 | 0300 | 9E01 |

THU MAR 14 17:45:10 1991 RV.DLL PAGE 29, LINE 1653

```
0000063500  023A  7A00  0200  0B00  0362  0000  0300  8C01
0000063520  0146  0500  0300  C401  023D  7E00  0300  B101
0000063540  0243  7F00  0300  2401  0146  0700  0300  B001
0000063560  0144  0800  0300  E301  015B  8900  0300  8802
0000063600  0341  7A00  0300  D201  015D  8A00  0500  D502
0000063620  0338  3300  0200  EB00  055F  0000  0300  ED01
0000063640  0161  8C00  0300  0F01  0162  8D00  0300  FB01
0000063660  0241  8600  0300  C901  0161  8E00  0300  2201
0000063700  0244  8700  0300  0D01  023C  8B00  0300  E601
0000063720  0243  0B00  0300  5101  023F  1000  0300  DC01
0000063740  0243  1300  0500  7701  0164  8800  0300  B201
0000063760  0160  2200  0300  4701  053A  0400  0300  0B01
0000064000  0430  0D00  0300  7A01  0162  2600  0300  F401
0000064020  0538  0700  0300  BD01  060F  0500  0300  8101
0000064040  071F  0200  0200  D202  0338  3300  0300  AA01
0000064060  061F  0F00  0300  7D01  015C  3A00  0300  8501
0000064100  023E  B300  0300  A201  060F  1400  0300  8A01
0000064120  082E  0400  0300  3101  053A  1C00  0300  7901
0000064140  0431  2500  0300  CB01  053D  1F00  0300  E901
0000064160  082B  0800  0300  D701  0430  2E00  0300  D102
0000064200  0341  3D00  0300  8A01  0145  4D00  0500  9100
0000064220  013A  4200  033B  0101  0145  5B00  0300  2102
0000064240  033B  4C00  0300  CE01  042F  4600  0300  6B02
0000064260  0342  5C00  0300  0601  0421  5600  0500  7202
0000064300  0341  1700  0300  D901  041D  5700  0300  0101
0000064320  0431  5800  0000  0000  0000  0000  0000  0000
0000064340  0000  0000  0200  0000  0000  0000  0000  0000
0000064360  0000  0000  0000  0000  0000  0000  0000  0000
*
0000064440  0000  0000  0200  0000  0000  0000  0000  0000
0000064460  0000  0000  0000  0000  0000  0000  0000  0000
*
0000064540  0000  0000  0200  0000  0000  0000  0000  0000
0000064560  0000  0000  0000  0000  0000  0000  0000  0000
*
0000064640  0000  0000  0200  0000  0000  0000  0000  0000
0000064660  0000  0000  0000  0000  534D  5220  6E75  542D
0000064700  6D69  2065  694C  7262  7261  2079  202D  6F43
0000064720  7970  6972  6867  2074  6328  2029  3931  3039
0000064740  202C  694D  7263  736F  666F  2074  6F43  7072
0000064760  0018  5F72  6572  2E76  0063  7672  702E  4700
0000065000  455F  5F57  0054  5F47  5745  545F  7400  7365
0000065020  5F74  616E  656D  203D  7325  203B  7274  6E5F
0000065040  6D61  3D65  2520  0073  5F62  7261  7367  0000
0000065060  0042  0086  004A  FFFF  5F72  6964  7073  616C
0000065100  5F79  6373  6572  6E65  0073  7272  725F  7665
0000065120  632E  7200  2E76  0070  6944  7073  616C  2079
0000065140  6353  6572  6E65  0073  6554  7473  6E20  6D61
0000065160  3A65  5400  2052  616E  656D  003A  6353  6572
0000065200  6E65  6E20  6D61  3A65  0000  009A  00E0  00A3
0000065220  0082  0000  0000  0000  0000  0000  0000  0000
0000065240  0000  0000  0000  0000  0000  0000  0000  0000
*
0000070640  0000  0000  0000  0000  0000  0000  0001  5F47
0000070660  5745  545F  4700  455F  5F57  0054  706F  635F
0000070700  646F  3D65  2520  0064  5F62  7261  7367  2500
0000070720  0073  6574  7473  6320  6168  676E  6465  6200
0000070740  645F  6265  6775  2500  5C73  5054  2500  5C73
0000070760  7325  2500  5C73  5054  7200  3D63  2520  3B64
```

THU MAR 14 17:45:10 1991 RV.DLL PAGE 30, LINE 1712

| | | | | | | | | |
|---|---|---|---|---|---|---|---|---|
| 0000071000 | 6920 | 676D | 635F | 756F | 746E | 735F | 203D | 6425 |
| 0000071020 | 6200 | 645F | 6265 | 6775 | 7200 | 3D63 | 2520 | 3B64 |
| 0000071040 | 7220 | 7065 | 635F | 756F | 746E | 735F | 203D | 6425 |
| 0000071060 | 6200 | 645F | 6265 | 6775 | 4300 | 5652 | 7220 | 7365 |
| 0000071100 | 6F70 | 736E | 2065 | 7266 | 6D6F | 4320 | 5F4D | 5055 |
| 0000071120 | 4144 | 4554 | 535F | 5243 | 4545 | 3D4E | 2520 | 0064 |
| 0000071140 | 5F62 | 6564 | 7562 | 0067 | 7325 | 255C | 0073 | 656E |
| 0000071160 | 2077 | 6373 | 2072 | 616E | 656D | 203D | 7325 | 6200 |
| 0000071200 | 645F | 6265 | 6775 | 0000 | 7272 | 645F | 676C | 4700 |
| 0000071220 | 455F | 5F57 | 0054 | 5F47 | 5745 | 545F | 6900 | 646E |
| 0000071240 | 7865 | 203D | 6425 | 203B | 6373 | 5F72 | 7974 | 6570 |
| 0000071260 | 203D | 6425 | 203B | 6F66 | 6372 | 5F65 | 6964 | 7073 |
| 0000071300 | 665F | 203D | 6425 | 6200 | 615F | 6772 | 0073 | 545C |
| 0000071320 | 0050 | 7325 | 2020 | 2020 | 2523 | 2064 | 2028 | 7325 |
| 0000071340 | 2020 | 205B | 6425 | 5D20 | 2920 | 2500 | 2073 | 2020 |
| 0000071360 | 2820 | 2520 | 2073 | 5B20 | 2520 | 2064 | 205D | 0029 |
| 0000071400 | 7325 | 2020 | 2020 | 2028 | 203F | 0029 | 5243 | 2056 |
| 0000071420 | 6572 | 7073 | 6E6F | 6573 | 6620 | 6F72 | 206D | 4D43 |
| 0000071440 | 445F | 5349 | 4C50 | 5941 | 445F | 4649 | 3D46 | 2520 |
| 0000071460 | 0064 | 5F62 | 6564 | 7562 | 0067 | 5243 | 2056 | 6572 |
| 0000071500 | 7073 | 6E6F | 6573 | 6620 | 6F72 | 206D | 4D43 | 445F |
| 0000071520 | 5349 | 4C50 | 5941 | 4E5F | 5845 | 5F54 | 4D49 | 4741 |
| 0000071540 | 3D45 | 2520 | 0064 | 5F62 | 6564 | 7562 | 0067 | 7272 |
| 0000071560 | 645F | 7369 | 5F70 | 6964 | 6666 | 4700 | 455F | 5F57 |
| 0000071600 | 0054 | 5F47 | 5745 | 545F | 6900 | 646E | 7865 | 203D |
| 0000071620 | 6425 | 6200 | 615F | 6772 | 0073 | 545C | 0050 | 7325 |
| 0000071640 | 2020 | 2020 | 2523 | 2064 | 2028 | 7325 | 2020 | 205B |
| 0000071660 | 6425 | 5D20 | 2920 | 2500 | 2073 | 2020 | 2820 | 2520 |
| 0000071700 | 2073 | 5B20 | 2520 | 2064 | 205D | 0029 | 7325 | 2020 |
| 0000071720 | 2020 | 2028 | 203F | 0029 | 5243 | 2056 | 6572 | 7073 |
| 0000071740 | 6E6F | 6573 | 6620 | 6F72 | 206D | 4D43 | 445F | 5349 |
| 0000071760 | 4C50 | 5941 | 4D5F | 4C55 | 3D54 | 2520 | 0064 | 5F62 |
| 0000072000 | 6564 | 7562 | 0067 | 7272 | 645F | 7369 | 5F70 | 6D69 |
| 0000072020 | 6761 | 0065 | 7272 | 6D5F | 7369 | 2E63 | 0063 | 7672 |
| 0000072040 | 702E | 4700 | 455F | 5F57 | 0054 | 5F47 | 5745 | 545F |
| 0000072060 | 0000 | 0A64 | 0A88 | 0A6E | 00DC | 0000 | 0000 | 7272 |
| 0000072100 | 6F5F | 6570 | 5F6E | 6574 | 7473 | 4700 | 455F | 5F57 |
| 0000072120 | 0054 | 5F47 | 5745 | 545F | 0000 | 7272 | 635F | 7672 |
| 0000072140 | 6F5F | 6570 | 006E | 5F47 | 5745 | 545F | 4700 | 455F |
| 0000072160 | 5F57 | 0054 | 6F63 | 6E75 | 3D74 | 2520 | 0064 | 5F62 |
| 0000072200 | 6564 | 7562 | 0067 | 7272 | 645F | 5F62 | 6D69 | 6761 |
| 0000072220 | 5F65 | 696C | 7473 | 4700 | 455F | 5F57 | 0054 | 5F47 |
| 0000072240 | 5745 | 545F | 5C00 | 5054 | 2500 | 5C73 | 5054 | 6300 |
| 0000072260 | 756F | 746E | 203D | 6425 | 6200 | 645F | 6265 | 6775 |
| 0000072300 | 0000 | 7272 | 725F | 7065 | 645F | 6669 | 5F66 | 6D69 |
| 0000072320 | 6761 | 5F65 | 696C | 7473 | 4700 | 455F | 5F57 | 0054 |
| 0000072340 | 5F47 | -5745 | 545F | 5C00 | 5054 | 2500 | 5C73 | 5054 |
| 0000072360 | 6300 | 756F | 746E | 203D | 6425 | 6200 | 645F | 6265 |
| 0000072400 | 6775 | 0000 | 7272 | 725F | 7065 | 655F | 7078 | 695F |
| 0000072420 | 616D | 6567 | 6C5F | 7369 | 0074 | 0000 | 0000 | 7325 |
| 0000072440 | 545C | 0050 | 5F47 | 5745 | 545F | 4700 | 455F | 5F57 |
| 0000072460 | 0054 | 7272 | 715F | 735F | 7263 | 6E5F | 6D61 | 0065 |
| 0000072500 | 5F47 | 5745 | 545F | 4700 | 455F | 5F57 | 0054 | 7272 |
| 0000072520 | 715F | 695F | 676D | 695F | 646E | 7865 | 4700 | 455F |
| 0000072540 | 5F57 | 0054 | 5F47 | 5745 | 545F | 0000 | 7272 | 715F |
| 0000072560 | 735F | 7263 | 735F | 7165 | 4700 | 455F | 5F57 | 0054 |
| 0000072600 | 5F47 | 5745 | 545F | 6500 | 7272 | 635F | 646F | 3D65 |
| 0000072620 | 2520 | 0064 | 5F62 | 7261 | 7367 | 0000 | 7272 | 645F |
| 0000072640 | 7369 | 5F70 | 7265 | 5F72 | 736D | 0067 | 7272 | 755F |

```
THU MAR 14 17:45:10 1991  RV.DLL  PAGE 31, LINE 1771

0000072660  2E69  0063  7672  702E  4700  455F  5F57  0054
0000072700  5F47  5745  545F  0000  0BFC  0C1E  0C04  0A84
0000072720  0001  0001  0001  7272  755F  645F  7369  5F70
0000072740  6C64  0067  6548  706C  6E20  746F  7920  7465
0000072760  6920  706D  656C  656D  746E  6465  6900  746E
0000073000  6900  746E  0000  7272  755F  775F  6972  6574
0000073020  665F  726F  006D  6E69  0074  6E69  0074  7272
0000073040  755F  775F  6972  6574  655F  746E  7972  0000
0000073060  0000  0000  0000  0006  0000  1900  18FF  0000
0000073100  0005  0000  0000  0000  0000  0000  0000  0000
0000073120  0000  435F  465F  4C49  5F45  4E49  4F46  003D
0000073140  0001  FFFF  0000  0000  0000  0000  0000  0000
0000073160  0000  0000  0000  0001  8101  8181  0000  0000
0000073200  0000  0000  0000  0000  0000  0000  0000  0000
*
0000073560  0000  0000  0000  0000  0A00  0A0A  0A0A  0A0A
0000073600  0A0A  0A0A  0A0A  0A0A  0A0A  0A0A  0A0A  0A0A
*
0000074160  0A0A  0A0A  0A0A  0A0A  000A  0000  0000  0000
0000074200  0000  0000  0000  0000  0000  FF00  00FF  0000
0000074220  0000  FFFF  FFFF  0000  0000  0EF0  0000  0000
0000074240  FFFF  0001  0000  0000  0000  0000  0000  0102
0000074260  0000  0000  0000  0000  0000  0202  0000  0000
0000074300  0000  0000  0000  0000  0000  0000  0000  0000
*
0000075160  0000  0000  0000  0000  0001  0200  0000  0000
0000075200  0000  0000  0000  0000  0000  0000  0000  0000
*
0000076120  0000  0000  0000  0000  10BC  0C1A  0920  0D2D
0000076140  005D  005D  0006  0600  0100  0000  0010  0603
0000076160  0600  1002  4504  4545  0505  0505  3505  0030
0000076200  0050  0000  2000  3020  5850  0807  3000  3030
0000076220  5057  0007  2000  0020  0000  0000  6008  6060
0000076240  6060  0060  7000  7870  7878  0878  0807  0000
0000076260  0007  0808  0008  0800  0800  0000  2808  756E
0000076300  6C6C  0629  0000  0000  0000  0000  0000  0000
0000076320  0000  0003  2000  4748  145A  4748  1328  4748
0000076340  132C  4748  1330  4748  1334  4748  1338  0000
0000076360  0000  0101  2000  2020  2020  2020  2020  2828
0000076400  2828  2028  2020  2020  2020  2020  2020  2020
0000076420  2020  2020  4820  1010  1010  1010  1010  1010
0000076440  1010  1010  8410  8484  8484  8484  8484  1084
0000076460  1010  1010  1010  8181  8181  8181  0101  0101
0000076500  0101  0101  0101  0101  0101  0101  0101  0101
0000076520  1010  1010  1010  8282  8282  8282  0202  0202
0000076540  0202  0202  0202  0202  0202  0202  0202  0202
0000076560  1010  1010  0020  0000  0000  0000  0000  0000
0000076600  0000  0000  0000  0000  0000  0000  0000  0000
*
0000076760  0000  0000  0000  0000  0003  0000  0000  0000
0000077000  0000  0000  0000  0000  4C16  FFFF  FFFF  FFFF
0000077020  145C  145E  1460  1462  1464  1466  12AA  3C3C
0000077040  4D4E  4753  3E3E  0000  3652  3030  0D30  2D0A
0000077060  7320  6174  6B63  6F20  6576  6672  6F6C  0D77
0000077100  000A  0003  3652  3030  0D33  2D0A  6920  746E
0000077120  6765  7265  6420  7669  6469  2065  7962  3020
0000077140  0A0D  0800  5200  3036  3830  0A0D  202D  6F6E
0000077160  2074  6E65  756F  6867  7320  6170  6563  6620
0000077200  726F  6120  6772  6D75  6E65  7374  0A0D  0900
```

THU MAR 14 17:45:10 1991 RV.DLL PAGE 32, LINE 1830

| | | | | | | | | |
|---|---|---|---|---|---|---|---|---|
| 0000077220 | 5200 | 3036 | 3930 | 0A0D | 202D | 6F6E | 2074 | 6E65 |
| 0000077240 | 756F | 6867 | 7320 | 6170 | 6563 | 6620 | 726F | 6520 |
| 0000077260 | 766E | 7269 | 6E6F | 656D | 746E | 0A0D | FC00 | 0D00 |
| 0000077300 | 000A | 00FF | 7572 | 2D6E | 6974 | 656D | 6520 | 7272 |
| 0000077320 | 726F | 0020 | 0002 | 3652 | 3030 | 0D32 | 2D0A | 6620 |
| 0000077340 | 6F6C | 7461 | 6E69 | 2D67 | 6F70 | 6E69 | 2074 | 7573 |
| 0000077360 | 7070 | 726F | 2074 | 6F6E | 2074 | 6F6C | 6461 | 6465 |
| 0000077400 | 0A0D | 1100 | 5200 | 3036 | 3731 | 0A0D | 202D | 6E75 |
| 0000077420 | 7865 | 6570 | 7463 | 6465 | 6D20 | 6C75 | 6974 | 6874 |
| 0000077440 | 6572 | 6461 | 6C20 | 636F | 206B | 7265 | 6F72 | 0D72 |
| 0000077460 | 000A | 0010 | 3652 | 3130 | 0D36 | 2D0A | 6E20 | 746F |
| 0000077500 | 6520 | 6F6E | 6775 | 2068 | 7073 | 6361 | 2065 | 6F66 |
| 0000077520 | 2072 | 6874 | 6572 | 6461 | 6420 | 7461 | 0D61 | 000A |
| 0000077540 | FFFF | 05FF | 0200 | 3C00 | 0113 | 0000 | 0200 | EA00 |
| 0000077560 | 040E | 0000 | 0200 | 6C00 | 0514 | 0000 | 0200 | 6802 |
| 0000077600 | 0314 | 1700 | 0200 | 6A02 | 0314 | 2500 | 4E00 | 3042 |
| 0000077620 | 8D32 | 007B | 0100 | 0000 | 2E00 | 0002 | 0000 | 0100 |
| 0000077640 | 1A00 | 745C | 3231 | 5C33 | 7061 | 5C70 | 7672 | 6F5C |
| 0000077660 | 6A62 | 725C | 725F | 7665 | 6F2E | 6A62 | 0001 | 022E |
| 0000077700 | 1AE3 | 0000 | 0000 | 0001 | 5C1B | 3174 | 3332 | 615C |
| 0000077720 | 7070 | 725C | 5C76 | 626F | 5C6A | 7272 | 725F | 7665 |
| 0000077740 | 6F2E | 6A62 | 0001 | 1D12 | 1C72 | 0000 | 0000 | 0001 |
| 0000077760 | 5C1C | 3174 | 3332 | 615C | 7070 | 725C | 5C76 | 626F |
| 0000100000 | 5C6A | 7272 | 6D5F | 7369 | 2E63 | 626F | 016A | 8400 |
| 0000100020 | 1039 | 000B | 0000 | 0100 | 1A00 | 745C | 3231 | 5C33 |
| 0000100040 | 7061 | 5C70 | 7672 | 6F5C | 6A62 | 725C | 5F72 | 6975 |
| 0000100060 | 6F2E | 6A62 | 0001 | 44A4 | 00D1 | 0000 | 0001 | 0001 |
| 0000100100 | 640B | 6C6C | 635C | 7573 | 612E | 6D73 | 0001 | 4576 |
| 0000100120 | 01AF | 0000 | 0001 | 0001 | 640E | 6C6C | 635C | 7573 |
| 0000100140 | 6164 | 2E74 | 7361 | 016D | 2600 | 2247 | 0000 | 0100 |
| 0000100160 | 0100 | 0F00 | 736F | 5C32 | 7263 | 3074 | 736D | 2E67 |
| 0000100200 | 7361 | 016D | 4800 | 0647 | 0000 | 0100 | 0100 | 0A00 |
| 0000100220 | 7263 | 3074 | 7066 | 612E | 6D73 | 0001 | 474E | 001A |
| 0000100240 | 0000 | 0001 | 0001 | 630A | 6B68 | 7473 | 2E6B | 7361 |
| 0000100260 | 016D | 6800 | 0847 | 0001 | 0100 | 0100 | 0D00 | 6C64 |
| 0000100300 | 5C6C | 6573 | 6574 | 766E | 2E70 | 0163 | 7000 | 6548 |
| 0000100320 | 0000 | 0100 | 0100 | 0F00 | 736F | 5C32 | 6D6E | 6773 |
| 0000100340 | 6468 | 2E72 | 7361 | 016D | D600 | C048 | 0000 | 0100 |
| 0000100360 | 0100 | 0E00 | 736F | 5C32 | 6F64 | 7273 | 7465 | 612E |
| 0000100400 | 6D73 | 0000 | 0000 | 0000 | 0000 | 0001 | 0000 | 5F0B |
| 0000100420 | 6663 | 756C | 6873 | 612E | 6D73 | 0000 | 0000 | 0000 |
| 0000100440 | 0000 | 0001 | 0000 | 5F07 | 6966 | 656C | 632E | 0001 |
| 0000100460 | 4996 | 009C | 0000 | 0001 | 0001 | 5F0B | 6966 | 626C |
| 0000100500 | 6675 | 612E | 6D73 | 0001 | 4A32 | 00E5 | 0000 | 0001 |
| 0000100520 | 0001 | 5F0B | 6C66 | 6273 | 6675 | 612E | 6D73 | 0001 |
| 0000100540 | 4B18 | 004B | 0000 | 0001 | 0001 | 5F0B | 6567 | 6274 |
| 0000100560 | 6675 | 612E | 6D73 | 0001 | 4B64 | 012E | 0000 | 0001 |
| 0000100600 | 0001 | 6608 | 6C66 | 7375 | 2E68 | 0163 | 9200 | 2A4C |
| 0000100620 | 0008 | 0100 | 0100 | 0700 | 6E69 | 7570 | 2E74 | 0163 |
| 0000100640 | BC00 | FA54 | 0004 | 0100 | 0100 | 0A00 | 756F | 7074 |
| 0000100660 | 7475 | 612E | 6D73 | 0001 | 59B6 | 00AA | 0000 | 0001 |
| 0000100700 | 0001 | 7508 | 676E | 7465 | 2E63 | 0163 | 6000 | 775A |
| 0000100720 | 0000 | 0100 | 0100 | 0D00 | 736F | 5C32 | 736C | 6565 |
| 0000100740 | 2E6B | 7361 | 016D | D800 | 5D5A | 0001 | 0100 | 0100 |
| 0000100760 | 0C00 | 736F | 5C32 | 6572 | 6461 | 612E | 6D73 | 0001 |
| 0000101000 | 5C36 | 01DD | 0000 | 0001 | 0001 | 7709 | 6972 | 6574 |
| 0000101020 | 612E | 6D73 | 0001 | 5E14 | 000A | 0000 | 0001 | 0001 |
| 0000101040 | 6D0A | 6C61 | 6F6C | 2E63 | 7361 | 016D | 1E00 | 0A5E |
| 0000101060 | 0000 | 0100 | 0100 | 0800 | 7266 | 6565 | 612E | 6D73 |

THU MAR 14 17:45:10 1991 RV.DLL PAGE 33, LINE 1889

| | | | | | | | | |
|---|---|---|---|---|---|---|---|---|
| 0000101100 | 0001 | 5E28 | 00AF | 0000 | 0001 | 0001 | 660B | 616D |
| 0000101120 | 6C6C | 636F | 612E | 6D73 | 0000 | 0000 | 0000 | 0000 |
| 0000101140 | 0001 | 0000 | 6609 | 6164 | 6174 | 612E | 6D73 | 0001 |
| 0000101160 | 5ED8 | 0034 | 0000 | 0001 | 0001 | 690B | 696E | 7374 |
| 0000101200 | 6765 | 612E | 6D73 | 0001 | 5F0C | 0036 | 0000 | 0001 |
| 0000101220 | 0001 | 6C0B | 6E69 | 736B | 6765 | 612E | 6D73 | 0001 |
| 0000101240 | 5F42 | 007C | 0000 | 0001 | 0001 | 730C | 6165 | 6372 |
| 0000101260 | 7368 | 2E67 | 7361 | 016D | BE00 | E25F | 0000 | 0100 |
| 0000101300 | 0100 | 0B00 | 7267 | 776F | 6573 | 2E67 | 7361 | 016D |
| 0000101320 | A000 | 3160 | 0000 | 0100 | 0100 | 0A00 | 656E | 7377 |
| 0000101340 | 6765 | 612E | 6D73 | 0001 | 60D2 | 0J36 | 0000 | 0001 |
| 0000101360 | 0001 | 730A | 7274 | 7063 | 2E79 | 7361 | 016D | 0800 |
| 0000101400 | 2961 | 0000 | 0100 | 0100 | 0A00 | 7473 | 6372 | 706D |
| 0000101420 | 612E | 6D73 | 0001 | 6132 | 0017 | 0000 | 0001 | 0001 |
| 0000101440 | 730A | 7274 | 656C | 2E6E | 7361 | 016D | 4A00 | 3B61 |
| 0000101460 | 0000 | 0100 | 0100 | 0B00 | 7473 | 6E72 | 6D63 | 2E70 |
| 0000101500 | 7361 | 006D | 0000 | 0000 | 0000 | 0100 | 0000 | 0C00 |
| 0000101520 | 6D63 | 7369 | 6463 | 7461 | 612E | 6D73 | 0000 | 0000 |
| 0000101540 | 0000 | 0000 | 0001 | 0000 | 6309 | 7974 | 6570 | 612E |
| 0000101560 | 6D73 | 0001 | 6186 | 00BA | 0000 | 0001 | 0001 | 6F0D |
| 0000101600 | 3273 | 6D5C | 6F6C | 6B63 | 612E | 6D73 | 0001 | 6240 |
| 0000101620 | 007A | 0000 | 0001 | 0001 | 6410 | 6C6C | 745C | 6469 |
| 0000101640 | 6174 | 6C62 | 2E65 | 7361 | 016D | BA00 | 7462 | 0000 |
| 0000101660 | 0100 | 0100 | 0900 | 7073 | 6972 | 746E | 2E66 | 0163 |
| 0000101700 | 2E00 | 5C63 | 0000 | 0100 | 0100 | 0800 | 7373 | 6163 |
| 0000101720 | 666E | 632E | 0001 | 638A | 002E | 0000 | 0001 | 0001 |
| 0000101740 | 630A | 6C61 | 6F6C | 2E63 | 7361 | 016D | B800 | 2D63 |
| 0000101760 | 0000 | 0100 | 0100 | 0A00 | 7473 | 6372 | 7268 | 612E |
| 0000102000 | 6D73 | 0001 | 63E6 | 005E | 0000 | 0001 | 0001 | 680B |
| 0000102020 | 656D | 636D | 7970 | 612E | 6D73 | 0001 | 6444 | 0048 |
| 0000102040 | 0000 | 0001 | 0001 | 680B | 656D | 736D | 7465 | 612E |
| 0000102060 | 6D73 | 0001 | 648C | 0022 | 0000 | 0001 | 0001 | 6109 |
| 0000102100 | 6D6C | 6C75 | 612E | 6D73 | 0001 | 64AE | 001F | 0000 |
| 0000102120 | 0001 | 0001 | 6109 | 736C | 6C68 | 612E | 6D73 | 0001 |
| 0000102140 | 64CE | 0032 | 0000 | 0001 | 0001 | 6C08 | 756D | 2E6C |
| 0000102160 | 7361 | 016D | 0000 | 0B65 | 0000 | 0100 | 0100 | 0800 |
| 0000102200 | 736C | 6C68 | 612E | 6D73 | 0000 | 0001 | 042F | 5211 |
| 0000102220 | 445F | 5349 | 4C50 | 5941 | 535F | 5243 | 4545 | 534E |
| 0000102240 | 022E | 0001 | 05EC | 5F08 | 7272 | 695F | 696E | F974 |
| 0000102260 | 0103 | F100 | 0705 | 725F | 5F72 | 6C64 | 1367 | 0113 |
| 0000102300 | FE00 | 0D05 | 725F | 5F72 | 6964 | 7073 | 645F | 6669 |
| 0000102320 | C766 | 0118 | 0600 | 0E06 | 725F | 5F72 | 6964 | 7073 |
| 0000102340 | 695F | 616D | 6567 | 1E94 | 0001 | 05BC | 5F0C | 7272 |
| 0000102360 | 635F | 7672 | 6F5F | 6570 | 376E | 0120 | BF00 | 1105 |
| 0000102400 | 725F | 5F72 | 6264 | 695F | 616D | 6567 | 6C5F | 7369 |
| 0000102420 | 0B74 | 0126 | C400 | 1705 | 725F | 5F72 | 6572 | 5F70 |
| 0000102440 | 6964 | 6666 | 695F | 616D | 6567 | 6C5F | 7369 | 2A74 |
| 0000102460 | 012B | CA00 | 1605 | 725F | 5F72 | 6572 | 5F70 | 7865 |
| 0000102500 | 5F70 | 6D69 | 6761 | 5F65 | 696C | 7473 | 3073 | 0001 |
| 0000102520 | 05D0 | 5F13 | 7272 | 675F | 7465 | 745F | 7365 | 5F74 |
| 0000102540 | 6170 | 6172 | 736D | 3198 | 0001 | 05D2 | 5F0E | 7272 |
| 0000102560 | 715F | 735F | 7263 | 6E5F | 6D61 | 3865 | 0133 | D600 |
| 0000102600 | 0F05 | 725F | 5F72 | 5F71 | 6D69 | 5F67 | 6E69 | 6564 |
| 0000102620 | 4278 | 0135 | DA00 | 0D05 | 725F | 5F72 | 5F71 | 6373 |
| 0000102640 | 5F72 | 6573 | DB71 | 0137 | DC00 | 1005 | 725F | 5F72 |
| 0000102660 | 6964 | 7073 | 655F | 7272 | 6D5F | 6773 | 1D12 | 0001 |
| 0000102700 | 05B4 | 5F0D | 7272 | 6F5F | 6570 | 5F6E | 6574 | 7473 |
| 0000102720 | 3984 | 0001 | 05A3 | 5F0E | 7272 | 755F | 645F | 7369 |
| 0000102740 | 5F70 | 6C64 | 4267 | 013B | AC00 | 1205 | 5252 | 555F |

THU MAR 14 17:45:10 1991 RV.DLL PAGE 34, LINE 1948

| | | | | | | | | |
|---|---|---|---|---|---|---|---|---|
| 0000102760 | 445F | 5349 | 5F50 | 4C44 | 5F47 | 5250 | 434F | 3E9A |
| 0000103000 | 0001 | 05B0 | 5F10 | 7272 | 755F | 775F | 6972 | 6574 |
| 0000103020 | 665F | 726F | 466D | 0141 | B500 | 1105 | 725F | 5F72 |
| 0000103040 | 5F75 | 7277 | 7469 | 5F65 | 6E65 | 7274 | 8B79 | 0142 |
| 0000103060 | B900 | 1105 | 725F | 5F72 | 5F75 | 7974 | 6570 | 655F |
| 0000103100 | 616E | 6C62 | 0965 | 0143 | BB00 | 1005 | 725F | 5F72 |
| 0000103120 | 5F75 | 7974 | 6570 | 635F | 6568 | 6B63 | 4381 | 0001 |
| 0000103140 | 05BD | 5F13 | 7272 | 755F | 655F | 616E | 6C62 | 5F65 |
| 0000103160 | 6573 | 656C | 7463 | 446F | 0001 | 05C0 | 5F0E | 7272 |
| 0000103200 | 755F | 675F | 7465 | 685F | 6E77 | 2064 | 050C | 8500 |
| 0000103220 | 0800 | 655F | 7078 | 665F | 735F | 0C22 | 0005 | 0085 |
| 0000103240 | 5F08 | 6361 | 5F74 | 5F66 | 2473 | 050C | 8500 | 080C |
| 0000103260 | 645F | 6669 | 665F | 735F | 15B4 | 0005 | 0000 | 5F06 |
| 0000103300 | 6465 | 7461 | 0061 | 0519 | 0000 | 0400 | 655F | 646E |
| 0000103320 | 44A4 | 0001 | 0000 | 4306 | 495F | 494E | 8E54 | 050C |
| 0000103340 | 0000 | 0C00 | 5F5F | 686E | 6165 | 5F70 | 6564 | 6373 |
| 0000103360 | 1900 | 0005 | 0000 | 5F0C | 7473 | 6361 | 626B | 746F |
| 0000103400 | 6F74 | B46D | 050C | 0000 | 0C00 | 5F5F | 615F | 4244 |
| 0000103420 | 7773 | 6670 | 676C | 0C80 | 0005 | 0000 | 5F08 | 615F |
| 0000103440 | 6D63 | 6C64 | B26E | 050C | 0000 | 0800 | 5F5F | 7361 |
| 0000103460 | 6765 | 6968 | 0CB0 | 0005 | 0000 | 5F08 | 615F | 6573 |
| 0000103500 | 6C67 | 8C6F | 050C | 0000 | 0800 | 5F5F | 7361 | 7A69 |
| 0000103520 | 7364 | 0C8A | 0005 | 0000 | 5F08 | 615F | 6F74 | 7370 |
| 0000103540 | A270 | 050C | 0000 | 0900 | 5F5F | 6361 | 6966 | 666E |
| 0000103560 | D66F | 00D6 | 0100 | 0900 | 5F5F | 4461 | 7542 | 6573 |
| 0000103600 | 8264 | 050C | 0000 | 0900 | 5F5F | 6561 | 766E | 6573 |
| 0000103620 | 8667 | 050C | 0000 | 0A00 | 5F5F | 6874 | 6572 | 6461 |
| 0000103640 | 6469 | 0C84 | 0005 | 0000 | 5F0A | 675F | 6E69 | 6F66 |
| 0000103660 | 6573 | D667 | 00D6 | 0100 | 0A00 | 5F5F | 4461 | 6442 |
| 0000103700 | 736F | 7077 | 0C88 | 0005 | 0000 | 5F0A | 6C5F | 6E69 |
| 0000103720 | 6F66 | 6573 | 7667 | 0098 | 0100 | 0A00 | 5F5F | 6361 |
| 0000103740 | 7472 | 7375 | 6465 | 0CB6 | 0005 | 0000 | 5F0B | 5F5F |
| 0000103760 | 4461 | 7242 | 6574 | 7272 | 4515 | 0001 | 0000 | 5F0B |
| 0000104000 | 615F | 736D | 5F67 | 7865 | 7469 | 0CC4 | 0005 | 0000 |
| 0000104020 | 5F0B | 6F5F | 7673 | 7265 | 6973 | 6E6F | 462F | 0001 |
| 0000104040 | 0000 | 5F06 | 655F | 6978 | E174 | 0146 | 0000 | 0C00 |
| 0000104060 | 5F5F | 6E75 | 6F6C | 6B63 | 7865 | 7469 | 0ED7 | 0005 |
| 0000104100 | 0000 | 5F07 | 635F | 6968 | 646C | 0CC7 | 0005 | 0000 |
| 0000104120 | 5F07 | 6E5F | 6966 | 656C | 4576 | 0001 | 0000 | 5F07 |
| 0000104140 | 635F | 6E69 | 7469 | 0EC9 | 0005 | 0000 | 5F07 | 5F5F |
| 0000104160 | 7261 | 6367 | 4637 | 0001 | 0000 | 5F07 | 635F | 7865 |
| 0000104200 | 7469 | 0CC4 | 0005 | 0000 | 5F0D | 645F | 736F | 6576 |
| 0000104220 | 6D72 | 6A61 | 726F | 0ECB | 0005 | 0000 | 5F07 | 5F5F |
| 0000104240 | 7261 | 7667 | 0CC5 | 0005 | 0000 | 5F0D | 645F | 736F |
| 0000104260 | 6576 | 6D72 | 6E69 | 726F | 0DC9 | 0005 | 0000 | 5F08 |
| 0000104300 | 705F | 7069 | 6365 | CF68 | 050E | 0000 | 0800 | 655F |
| 0000104320 | 766E | 7269 | 6E6F | 0CC9 | 0005 | 0000 | 5F08 | 6F5F |
| 0000104340 | 6673 | 6C69 | C665 | 050C | 0000 | 0800 | 5F5F | 736F |
| 0000104360 | 6F6D | 6564 | 45D0 | 0001 | 0000 | 5F08 | 695F | 696E |
| 0000104400 | 6674 | 4C70 | 0514 | 0000 | 0800 | 5F5F | 7066 | 6E69 |
| 0000104420 | 7469 | 4704 | 0001 | 0000 | 5F08 | 745F | 7265 | 666D |
| 0000104440 | D370 | 050E | 0000 | 0800 | 5F5F | 6770 | 706D | 7274 |
| 0000104460 | 4641 | 00D1 | 0000 | 5F08 | 635F | 655F | 6978 | C674 |
| 0000104500 | 050C | 0000 | 0900 | 5F5F | 6F64 | 6D73 | 646F | C465 |
| 0000104520 | 050C | 0000 | 0900 | 5F5F | 736F | 616D | 6F6A | C572 |
| 0000104540 | 050C | 0000 | 0900 | 5F5F | 736F | 696D | 6F6E | D972 |
| 0000104560 | 050E | 0000 | 0A00 | 5F5F | 7865 | 7469 | 6F64 | 656E |
| 0000104600 | 4697 | 0001 | 0000 | 5F0A | 6C5F | 636F | 656B | 6978 |
| 0000104620 | C274 | 050C | 0000 | 0A00 | 5F5F | 6D75 | 7361 | 766B |

THU MAR 14 17:45:10 1991 RV.DLL PAGE 35, LINE 2007

| | | | | | | | | |
|---|---|---|---|---|---|---|---|---|
| 0000104640 | 6C61 | 4704 | 0001 | 0000 | 5F0A | 635F | 6574 | 6D72 |
| 0000104660 | 7573 | DB62 | 050E | 0000 | 0A00 | 5F5F | 7865 | 7469 |
| 0000104700 | 745F | 6469 | 0CB8 | 0005 | 0000 | 5F05 | 665F | 6361 |
| 0000104720 | 4628 | 0001 | 0000 | 5F05 | 7865 | 7469 | 4726 | 0001 |
| 0000104740 | 0000 | 5F0E | 465F | 5F46 | 534D | 4247 | 4E41 | 454E |
| 0000104760 | DE52 | 050E | 0000 | 0900 | 5F5F | 6461 | 6762 | 736D |
| 0000105000 | 7667 | 0098 | 0100 | 0900 | 5F5F | 6361 | 7472 | 736D |
| 0000105020 | 4867 | 0147 | 0000 | 0800 | 5F5F | 7066 | 7274 | 7061 |
| 0000105040 | 0EE2 | 0005 | 0000 | 5F0C | 615F | 6C61 | 7374 | 6B74 |
| 0000105060 | 766F | 4E72 | 0147 | 0000 | 0800 | 5F5F | 6863 | 736B |
| 0000105100 | 6B74 | 474E | 0001 | 0000 | 5F0A | 615F | 6346 | 6B68 |
| 0000105120 | 7473 | 686B | 0147 | 0000 | 0900 | 5F5F | 6573 | 6574 |
| 0000105140 | 766E | 7070 | 0148 | 0000 | 0B00 | 5F5F | 4D4E | 4753 |
| 0000105160 | 545F | 5845 | A054 | 0148 | 0000 | 0C00 | 5F5F | 4D4E |
| 0000105200 | 4753 | 575F | 4952 | 4554 | 4982 | 0001 | 0000 | 5F0B |
| 0000105220 | 5F5F | 6F64 | 6573 | 7272 | 6F6E | 498A | 0001 | 0000 |
| 0000105240 | 5F07 | 655F | 7272 | 6F6E | 493B | 0001 | 0000 | 5F08 |
| 0000105260 | 645F | 736F | 6572 | 2274 | 0149 | 0000 | 0900 | 5F5F |
| 0000105300 | 6F64 | 7273 | 7465 | E666 | 050E | 0000 | 0800 | 5F5F |
| 0000105320 | 6663 | 756C | 6873 | 0000 | 0004 | 0000 | 5F07 | 625F |
| 0000105340 | 6675 | 6E69 | 0EE8 | 0005 | 0000 | 5F05 | 695F | 626F |
| 0000105360 | 10C8 | 0005 | 0000 | 5F06 | 695F | 626F | A832 | 0512 |
| 0000105400 | 0000 | 0900 | 5F5F | 616C | 7473 | 6F69 | 9662 | 0149 |
| 0000105420 | 0000 | 0800 | 5F5F | 6966 | 626C | 6675 | 4A32 | 0001 |
| 0000105440 | 0000 | 5F08 | 665F | 736C | 7562 | 1866 | 014B | 0000 |
| 0000105460 | 0800 | 5F5F | 6567 | 6274 | 6675 | 4BAA | 0001 | 0000 |
| 0000105500 | 5F0B | 665F | 6C66 | 7375 | 5F68 | 6B6C | 4B64 | 0001 |
| 0000105520 | 0000 | 5F07 | 6666 | 756C | 6873 | 4C16 | 0001 | 0000 |
| 0000105540 | 5F09 | 6C66 | 7375 | 6168 | 6C6C | 4C92 | 0001 | 0000 |
| 0000105560 | 5F07 | 695F | 706E | 7475 | 54CC | 0001 | 0000 | 5F08 |
| 0000105600 | 6F5F | 7475 | 7570 | B674 | 0159 | 0000 | 0700 | 755F |
| 0000105620 | 676E | 7465 | F663 | 0159 | 0000 | 0B00 | 5F5F | 6E75 |
| 0000105640 | 6567 | 6374 | 6C5F | 6A6B | 015A | 0000 | 0600 | 6C5F |
| 0000105660 | 6573 | 6B65 | 5A60 | 0001 | 0000 | 5F0A | 6C5F | 6573 |
| 0000105700 | 6B65 | 6C5F | D86B | 015A | 0000 | 0500 | 725F | 6165 |
| 0000105720 | 4064 | 015C | 0000 | 0600 | 775F | 6972 | 6574 | 5C36 |
| 0000105740 | 0001 | 0000 | 5F0A | 775F | 6972 | 6574 | 6C5F | 146B |
| 0000105760 | 015E | 0000 | 0700 | 6D5F | 6C61 | 6F6C | 1963 | 015E |
| 0000106000 | 0000 | 0A00 | 6D5F | 6C61 | 6F6C | 5F63 | 6B6C | 5E23 |
| 0000106020 | 0001 | 0000 | 5F08 | 7266 | 6565 | 6C5F | 1E6B | 015E |
| 0000106040 | 0000 | 0500 | 665F | 6572 | 5A65 | 015E | 0000 | 0C00 |
| 0000106060 | 5F5F | 6D66 | 6C61 | 6F6C | 5F63 | 6B6C | 5E28 | 0001 |
| 0000106100 | 0000 | 5F07 | 665F | 7266 | 6565 | 5E3B | 0001 | 0000 |
| 0000106120 | 5F09 | 665F | 616D | 6C6C | 636F | 5E28 | 0001 | 0000 |
| 0000106140 | 5F0A | 665F | 7266 | 6565 | 6C5F | 166B | 0513 | 0000 |
| 0000106160 | 0700 | 5F5F | 6866 | 6165 | D870 | 015E | 0000 | 0900 |
| 0000106200 | 5F5F | 6E69 | 7469 | 6573 | DC67 | 015F | 0000 | 0900 |
| 0000106220 | 5F5F | 696C | 6B6E | 6573 | 4267 | 015F | 0000 | 0B00 |
| 0000106240 | 5F5F | 6573 | 7261 | 6863 | 6573 | 4D67 | 0160 | 0000 |
| 0000106260 | 0800 | 5F5F | 6E69 | 7363 | 6765 | 5FBE | 0001 | 0000 |
| 0000106300 | 5F09 | 675F | 6F72 | 7377 | 6765 | 6080 | 0001 | 0000 |
| 0000106320 | 5F0A | 665F | 6E69 | 6C64 | 7361 | 2474 | 0513 | 0000 |
| 0000106340 | 0A00 | 5F5F | 6D61 | 6C62 | 736B | 7A69 | 60A0 | 0001 |
| 0000106360 | 0000 | 5F08 | 6E5F | 7765 | 6573 | D267 | 0160 | 0000 |
| 0000106400 | 0700 | 735F | 7274 | 7063 | 0879 | 0161 | 0000 | 0700 |
| 0000106420 | 735F | 7274 | 6D63 | 3270 | 0161 | 0000 | 0700 | 735F |
| 0000106440 | 7274 | 656C | 4A6E | 0161 | 0000 | 0800 | 735F | 7274 |
| 0000106460 | 636E | 706D | 1326 | 0005 | 0000 | 5F0D | 635F | 6C66 |
| 0000106500 | 6374 | 7476 | 745F | 6261 | 1342 | 0005 | 0000 | 5F08 |

```
THU MAR 14 17:45:10 1991  RV.DLL  PAGE 36, LINE 2066

0000106520  615F  6973  657A  4343  0513  0000  0800  5F5F
0000106540  7361  7A69  4465  1340  0005  0000  5F0B  735F
0000106560  6769  6E69  6F74  6666  133E  0005  0000  5F0B
0000106600  735F  6769  6E69  7374  6765  1344  0005  0000
0000106620  5F07  635F  7974  6570  1344  0005  0000  5F08
0000106640  635F  7974  6570  D65F  0161  0000  0600  5F5F
0000106660  6F6C  6B63  6220  0001  0000  5F07  6C5F  636F
0000106700  666B  61AA  0001  0000  5F0D  755F  6C6E  636F
0000106720  5F6B  6966  656C  6186  0001  0000  5F0D  6C5F
0000106740  636F  5F6B  7473  6572  6D61  6200  0001  0000
0000106760  5F08  755F  6C6E  636F  466B  0514  0000  0900
0000107000  5F5F  6F6C  6B63  6E63  3074  0162  0000  0900
0000107020  5F5F  6E75  6F6C  6B63  9266  0161  0000  0F00
0000107040  5F5F  6E75  6F6C  6B63  735F  7274  6165  B66D
0000107060  0161  0000  0A00  5F5F  6177  7469  6F6C  6B63
0000107100  619E  0001  0000  5F0B  6C5F  636F  5F6B  6966
0000107120  656C  6240  0001  0000  5F0B  675F  7465  6974
0000107140  7464  6261  1448  0005  0000  5F0B  745F  6469
0000107160  6174  6D62  7861  62BA  0001  0000  5F08  7073
0000107200  6972  746E  2E66  0163  0000  0700  735F  6373
0000107220  6E61  8A66  0163  0000  0700  635F  6C61  6F6C
0000107240  B863  0163  0000  0700  735F  7274  6863  E672
0000107260  0163  0000  0700  6D5F  6D65  7063  4479  0164
0000107300  0000  0700  6D5F  6D65  6573  8C74  0164  0000
0000107320  0A00  5F5F  4661  6146  6D6C  6C75  648C  0001
0000107340  0000  5F0B  615F  4646  7561  6D6C  6C75  64AE
0000107360  0001  0000  5F0A  615F  4646  6C61  6873  CE6C
0000107400  0164  0000  0800  5F5F  4661  6D6C  6C75  64CE
0000107420  0001  0000  5F09  615F  7546  6D6C  6C75  6500
0000107440  0001  0000  5F08  615F  6C46  6873  016C  0001
0000107460  0180  0001  0180  0016  3079  8303  0203  0483
0000107500  8202  280A  6E75  6174  6767  6465  6929  0A01
0000107520  7F00  8183  8300  0081  8183  0100  001C  827F
0000107540  7006  6361  5F6B  0068  0682  6966  656C  685F
0000107560  8202  6606  6E75  5F63  0468  0101  8000  0101
0000107600  8000  0101  8000  0101  8000  0101  8000  0101
*
0000110000  8000  0101  8000  0501  7800  8340  0080  0501
0000110020  7800  8328  0080  0101  8000  0101  8000  0101
0000110040  8000  0101  8000  0101  8000  0101  8000  0101
*
0000110260  8000  0101  8000  0101  8000  0101  8000  0701
0000110300  7800  0085  8301  0080  0101  8000  0101  8000
0000110320  0101  8000  0101  8000  0101  8000  0101  8000
*
0000113060  0101  8000  0701  7800  2085  8303  0080  0101
0000113100  8000  0101  8000  0101  8000  0101  8000  0101
*
0000113220  8000  0101  8000  1B01  7900  0920  C883  8303
0000113240  03C9  0F82  5F69  5F75  736D  5F67  6170  6172
0000113260  5F6D  6974  1C01  7F00  8183  8300  0085  8283
0000113300  8300  0086  8383  8300  0080  8483  8300  00CD
0000113320  C083  0100  006A  827F  6909  755F  735F  6F68
0000113340  7472  8200  690A  755F  755F  6873  726F  0074
0000113360  0882  5F69  5F75  6F6C  676E  8200  6909  755F
0000113400  755F  6F6C  676E  8200  6909  755F  665F  6F6C
0000113420  7461  8200  6908  755F  635F  6168  0072  0982
0000113440  5F69  5F75  6375  6168  0072  0782  5F69  5F75
0000113460  7473  0072  0982  5F69  5F75  6C62  636F  006B
```

THU MAR 14 17:45:10 1991 RV.DLL PAGE 37, LINE 2125

| | | | | | | | | |
|---|---|---|---|---|---|---|---|---|
| 0000113500 | 1901 | 7900 | 0230 | CB83 | 8303 | 03CC | 0D82 | 5F69 |
| 0000113520 | 736D | 5F67 | 6170 | 6172 | 5F6D | 6974 | 0701 | 7F00 |
| 0000113540 | 8583 | 8300 | 03C7 | 1001 | 7F00 | 0482 | 7974 | 6570 |
| 0000113560 | 8200 | 7605 | 6C61 | 6575 | 0102 | 0001 | 0180 | 001C |
| 0000113600 | 8579 | 0090 | 8309 | 03CF | D083 | 8203 | 690E | 6D5F |
| 0000113620 | 6773 | 685F | 6165 | 6564 | 5F72 | 6974 | 1C01 | 7F00 |
| 0000113640 | 8183 | 8300 | 0081 | 8583 | 8300 | 0085 | 8483 | 8300 |
| 0000113660 | 0085 | 8583 | 8300 | 0081 | 8583 | 0100 | 0047 | 827F |
| 0000113700 | 7104 | 695F | 0064 | 0682 | 6F73 | 7275 | 6563 | 8202 |
| 0000113720 | 7003 | 6469 | 8204 | 7403 | 6469 | 8206 | 7204 | 7365 |
| 0000113740 | 0870 | 0882 | 6572 | 7073 | 745F | 6469 | 820A | 6F07 |
| 0000113760 | 5F70 | 6F63 | 6564 | 820C | 7404 | 7079 | 0E65 | 0482 |
| 0000114000 | 6973 | 657A | 0110 | 0015 | 8579 | 00C0 | 8302 | 03D3 |
| 0000114020 | D483 | 8203 | 6907 | 6D5F | 6773 | 745F | 0169 | 0005 |
| 0000114040 | 3078 | CA83 | 0103 | 0007 | 837F | 03CE | D283 | 0103 |
| 0000114060 | 0017 | 827F | 6806 | 6165 | 6564 | 0072 | 0A82 | 6170 |
| 0000114100 | 6172 | 5F6D | 696C | 7473 | 0112 | 0001 | 0180 | 0001 |
| 0000114120 | 0180 | 0001 | 0180 | 0007 | 737A | D183 | 8203 | 0100 |
| 0000114140 | 0001 | 0180 | 0001 | 0180 | 0001 | 0180 | 0001 | 0180 |
| * | | | | | | | | |
| 0000114320 | 0001 | 0180 | 0007 | 8578 | 0800 | 8083 | 0100 | 0001 |
| 0000114340 | 0180 | 0001 | 0180 | 0001 | 0180 | 0017 | 8579 | 18D0 |
| 0000114360 | 830A | 03FB | FC83 | 8203 | 5F09 | 5F72 | 6F66 | 6D72 |
| 0000114400 | 745F | 0169 | 001F | 837F | 0085 | B083 | 8303 | 03B0 |
| 0000114420 | F683 | 8303 | 03B0 | 5483 | 8302 | 03B0 | B083 | 8303 |
| 0000114440 | 0085 | 8583 | 0100 | 0067 | 827F | 6902 | 0064 | 0582 |
| 0000114460 | 6974 | 6C74 | 0265 | 0A82 | 6574 | 7473 | 745F | 7469 |
| 0000114500 | 656C | 8266 | 7404 | 7365 | 8574 | 00CA | 0882 | 7274 |
| 0000114520 | 745F | 7469 | 656C | CA85 | 8201 | 7402 | 8572 | 022E |
| 0000114540 | 0A82 | 616E | 656D | 745F | 7469 | 656C | 4E85 | 8202 |
| 0000114560 | 6E04 | 6D61 | 8565 | 02B2 | 0882 | 6373 | 5F72 | 7974 |
| 0000114600 | 6570 | 1685 | 8203 | 6105 | 6C6C | 665F | 1885 | 0103 |
| 0000114620 | 0001 | 0180 | 0001 | 0180 | 0001 | 0180 | 0001 | 0180 |
| 0000114640 | 0001 | 0180 | 0007 | 737A | FA83 | 8203 | 0100 | 0001 |
| 0000114660 | 0180 | 0001 | 0180 | 0001 | 0180 | 0001 | 0180 | 0001 |
| * | | | | | | | | |
| 0000115120 | 0180 | 0001 | 0180 | 0001 | 0180 | 0007 | 837F | 00C0 |
| 0000115140 | C083 | 0100 | 000A | 8075 | 8183 | 7300 | 8302 | 042E |
| 0000115160 | 0101 | 8000 | 0101 | 8000 | 0701 | 7800 | 9085 | 8300 |
| 0000115200 | 0080 | 0501 | 7800 | 8338 | 0080 | 0701 | 7A00 | 8373 |
| 0000115220 | 0435 | 0082 | 0A01 | 7500 | 8380 | 0081 | 0064 | 0183 |
| 0000115240 | 0102 | 0005 | 6078 | 8283 | 0100 | 0007 | 8578 | 00D8 |
| 0000115260 | 8083 | 0100 | 000A | 8075 | 8183 | 6400 | 8300 | 0201 |
| 0000115300 | 0101 | 8000 | 1601 | 7900 | 0330 | 0383 | 8302 | 0204 |
| 0000115320 | 0A82 | 7528 | 746E | 6761 | 6567 | 2964 | 0169 | 000A |
| 0000115340 | 837F | 0081 | 8183 | 8300 | 0081 | 1C01 | 7F00 | 0682 |
| 0000115360 | 6170 | 6B63 | 685F | 8200 | 6606 | 6C69 | 5F65 | 0268 |
| 0000115400 | 0682 | 7566 | 636E | 685F | 0104 | 0001 | 0180 | 0001 |
| 0000115420 | 0180 | 0001 | 0180 | 0001 | 0180 | 0001 | 0180 | 0001 |
| * | | | | | | | | |
| 0000115620 | 0180 | 0001 | 0180 | 0005 | 4878 | 8083 | 0100 | 0005 |
| 0000115640 | 2878 | 8083 | 0100 | 0001 | 0180 | 0001 | 0180 | 0001 |
| 0000115660 | 0180 | 0001 | 0180 | 0001 | 0180 | 0001 | 0180 | 0001 |
| * | | | | | | | | |
| 0000116060 | 0180 | 0001 | 0180 | 0001 | 0180 | 0005 | 6878 | 8083 |
| 0000116100 | 0100 | 0001 | 0180 | 0001 | 0180 | 0001 | 0180 | 0001 |
| 0000116120 | 0180 | 0007 | 8578 | 0100 | 8083 | 0100 | 0001 | 0180 |
| 0000116140 | 0001 | 0180 | 0001 | 0180 | 0001 | 0180 | 0001 | 0180 |
| * | | | | | | | | |

THU MAR 14 17:45:10 1991 RV.DLL PAGE 38, LINE 2184

```
0000120620  0001  0180  0001  0180  0001  0180  0007  737A
0000120640  A683  8203  0100  000A  8075  8183  6400  8300
0000120660  0201  0101  8000  0101  8000  0101  8000  0101
0000120700  8000  0101  8000  0101  8000  0101  8000  0101
*
0000121760  8000  0101  8000  1601  7900  0220  3983  8304
0000122000  043A  0A82  7528  746E  6761  6567  2964  0169
0000122020  0007  837F  0081  8183  0100  0009  827F  7801
0000122040  8200  7901  0102  0001  0180  0001  0180  0001
0000122060  0180  0001  0180  0001  0180  0001  0180  0001
*
0000122720  0180  0001  0180  0001  0180  0007  8578  0320
0000122740  8083  0100  0001  0180  0001  0180  0001  0180
0000122760  0001  0180  0001  0180  0001  0180  0001  0180
*
0000123040  0001  0180  0001  0180  0001  0180  0016  3079
0000123060  8303  04BC  BD83  8204  280A  6E75  6174  6767
0000123100  6465  6929  0A01  7F00  8583  8300  0085  8583
0000123120  0100  001A  827F  7705  6469  6874  8200  6806
0000123140  6965  6867  0274  0582  6564  7470  0468  1801
0000123160  7900  4085  0801  C083  8304  04C1  0A82  7528
0000123200  746E  6761  6567  2964  0169  0007  8578  0080
0000123220  8483  0100  0019  837F  0081  BB83  8304  0085
0000123240  8583  8300  00C4  8283  8300  00E4  BF83  0104
0000123260  005A  827F  7206  7065  6572  0073  0682  6964
0000123300  656D  736E  8202  6410  7461  5F61  616C  6579
0000123320  5F72  6564  7470  0868  0882  6973  5F67  6973
0000123340  657A  820A  7307  6769  705F  7274  820C  6209
0000123360  6D74  5F70  6973  657A  8210  6208  6D74  5F70
0000123400  7470  1472  0582  7073  7261  1865  0101  8000
0000123420  1801  7900  A085  0C05  C583  8304  04C6  0A82
0000123440  7528  746E  6761  6567  2964  0169  0007  8578
0000123460  0180  8483  0100  0025  837F  0086  5483  8302
0000123500  0254  8683  8300  0081  8583  8300  0086  8283
0000123520  8300  0086  3883  8304  04BE  C483  0104  007E
0000123540  827F  6902  0064  0482  616E  656D  8204  6609
0000123560  6C69  5F65  616E  656D  8224  6509  7078  745F
0000123600  5F63  6469  8244  7404  7079  4865  0C32  6572
0000123620  5F66  696C  656E  6E5F  6D75  824A  7209  6665
0000123640  745F  5F63  6469  824C  740A  6D69  5F65  7473
0000123660  6D61  5070  0682  6F61  5F69  6469  8254  6C08
0000123700  636F  7461  6F69  586E  0982  7462  706D  695F
0000123720  666E  5C6F  0582  7073  7261  8565  0084  0101
0000123740  8000  0101  8000  0101  8000  0101  8000  0101
*
0000124260  8000  0101  8000  0101  8000  0101  8000  1B01
0000124300  7900  0920  0083  8305  0501  0F82  5F69  5F75
0000124320  736D  5F67  6170  6172  5F6D  6974  1C01  7F00
0000124340  8183  8300  0085  8283  8300  0086  8883  8300
0000124360  0080  8483  8300  00C0  C083  0100  006A  827F
0000124400  6909  755F  735F  6F68  7472  8200  690A  755F
0000124420  755F  6873  726F  0074  0882  5F69  5F75  6F6C
0000124440  676E  8200  6909  755F  755F  6F6C  676E  8200
0000124460  6909  755F  665F  6F6C  7461  8200  6908  755F
0000124500  635F  6168  0072  0982  5F69  5F75  6375  6168
0000124520  0072  0782  5F69  5F75  7473  0072  0982  5F69
0000124540  5F75  6C62  636F  006B  1901  7900  0230  0383
0000124560  8305  0504  0D82  5F69  736D  5F67  6170  6172
0000124600  5F6D  6974  0701  7F00  8583  8300  04FF  1001
```

THU MAR 14 17:45:10 1991 RV.DLL PAGE 39, LINE 2243

```
0000124620  7F00  0482  7974  6570  8200  7605  6C61  6575
0000124640  0102  0001  0180  001C  8579  0090  8309  0507
0000124660  0883  8205  690E  6D5F  6773  685F  6165  6564
0000124700  5F72  6974  1C01  7F00  8183  8300  0081  8583
0000124720  8300  0085  8483  8300  0085  8583  8300  0081
0000124740  8583  0100  0047  827F  7104  695F  0064  0682
0000124760  6F73  7275  6563  8202  7003  6469  8204  7403
0000125000  6469  8206  7204  7365  0870  0882  6572  7073
0000125020  745F  6469  820A  6F07  5F70  6F63  6564  820C
0000125040  7404  7079  0E65  0482  6973  657A  0110  0015
0000125060  8579  00C0  8302  050B  0C83  8205  6907  6D5F
0000125100  6773  745F  0169  0005  3078  0283  0105  0007
0000125120  837F  0506  0A83  0105  0017  827F  6806  6165
0000125140  6564  0072  0A82  6170  6172  5F6D  696C  7473
0000125160  0112  0001  0180  0001  0180  0001  0180  0007
0000125200  737A  0983  8205  0100  0001  0180  0001  0180
0000125220  0001  0180  0001  0180  0001  0180  0001  0180
*
0000125720  0007  8578  0800  8083  0100  0001  0180  0001
0000125740  0180  0001  0180  0001  0180  0001  0180  0001
*
0000126220  0180  0001  0180  0001  0180  0001  0180  0018
0000126240  8579  0220  8303  0596  9783  8205  280A  6E75
0000126260  6174  6767  6465  6929  0A01  7F00  5483  8302
0000126300  0254  8683  0100  001A  827F  6905  616D  6567
0000126320  8200  6404  6669  2066  0782  6964  6666  695F
0000126340  4064  1801  7900  1085  0203  9A83  8305  059B
0000126360  0A82  7528  746E  6761  6567  2964  0169  0007
0000126400  8578  0300  5483  0102  0007  837F  0085  9983
0000126420  0105  0024  827F  6E0E  6D75  6F5F  5F66  6373
0000126440  6572  6E65  0073  0F82  6D69  6761  5F65  616E
0000126460  656D  6C5F  7369  0274  0101  8000  0101  8000
0000126500  0101  8000  0101  8000  0101  8000  0101  8000
*
0000126620  0101  8000  0101  8000  0101  8000  1701  7900
0000126640  6085  0928  B683  8305  05B7  0982  725F  6C5F
0000126660  7361  5F74  6974  1C01  7F00  6383  8305  0086
0000126700  6383  8305  0086  6383  8305  0563  8183  8300
0000126720  0563  8583  0100  0057  827F  7404  7365  0074
0000126740  0782  6574  7473  695F  8564  0100  0282  7274
0000126760  0485  8201  7405  5F72  6469  0485  8202  6E04
0000127000  6D61  8565  0208  0482  6964  7073  0885  8203
0000127020  6905  646E  7865  0885  8204  6308  7672  745F
0000127040  7365  8574  040A  0482  7274  665F  0A85  0105
0000127060  0001  0180  0017  8579  18D0  830A  05BA  BB83
0000127100  8205  5F09  5F72  6F66  6D72  745F  0169  001F
0000127120  837F  0085  A883  8304  04A8  6383  8305  04A8
0000127140  5483  8302  04A8  A883  8304  0085  8583  0100
0000127160  0067  827F  6902  0064  0582  6974  6C74  0265
0000127200  0A82  6574  7473  745F  7469  656C  8266  7404
0000127220  7365  8574  00CA  0882  7274  745F  7469  656C
0000127240  CA85  8201  7402  8572  022E  0A82  616E  656D
0000127260  745F  7469  656C  4E85  8202  6E04  6D61  8565
0000127300  02B2  0882  6373  5F72  7974  6570  1685  8203
0000127320  6105  6C6C  665F  1885  0103  0001  0180  001B
0000127340  8579  0990  8308  05BE  BF83  8205  5F0D  5F72
0000127360  6373  5F72  6F6E  6564  745F  0169  0019  837F
0000127400  0254  8683  8300  0563  8683  8300  0081  8583
0000127420  8300  0085  8283  0100  0052  827F  6E04  6D61
```

THU MAR 14 17:45:10 1991 RV.DLL PAGE 40, LINE 2302

```
0000127440  0065  0782  616E  656D  695F  2064  0482  6574
0000127460  7473  8224  7407  7365  5F74  6469  2485  8201
0000127500  6C07  6E69  5F65  6F6E  2885  82C1  6D05  7369
0000127520  665F  2A85  8201  6509  7078  735F  6769  665F
0000127540  2C85  8201  7404  6D69  8565  012E  0101  8000
0000127560  0701  7A00  8373  05B9  0082  0101  8000  0101
0000127600  8000  0101  8000  0101  8000  0701  7A00  8373
0000127620  05BD  0082  0101  8000  0101  8000  0101  8000
0000127640  0101  8000  0101  8000  0101  8000  0101  8000
*
0000130020  0101  8000  0101  8000  0101  8000  0501  7800
0000130040  8308  0080  0701  7A00  8373  05B5  0082  0A01
0000130060  7F00  C083  8300  00C0  C183  0105  000A  8075
0000130100  0083  6402  8303  05EB  0701  7800  8085  8300
0000130120  0080  0501  7800  8358  0080  0501  7800  8368
0000130140  0080  0701  7F00  8583  8300  05C1  0A01  7500
0000130160  8380  0081  0264  F083  0105  0001  0180  0005
0000130200  3878  8083  0100  0005  3878  8083  0100  0005
0000130220  6078  8283  0100  0005  6078  8083  0100  0005
0000130240  1878  8083  0100  0005  4078  8083  0100  0005
0000130260  3078  8083  0100  0007  8578  00C0  8083  0100
0000130300  0007  8578  0138  8083  0100  0007  8578  0088
0000130320  8083  0100  0010  837F  05C6  8183  8300  0081
0000130340  8183  8300  0085  0A01  7500  8380  0081  0564
0000130360  FD83  0105  0007  8578  0150  8083  0100  0005
0000130400  2078  8083  0100  0007  8578  00C8  8083  0100
0000130420  0007  8578  00A8  8083  0100  0007  8578  0130
0000130440  8083  0100  0007  8578  0160  8083  0100  000A
0000130460  837F  05C6  8183  8300  0081  0A01  7500  8380
0000130500  0081  0364  0583  0106  0001  0180  0005  7078
0000130520  8083  0100  0005  5078  8083  0100  0001  0180
0000130540  0001  0180  0016  3079  8303  0203  0483  8202
0000130560  280A  6E75  6174  6767  6465  6929  0A01  7F00
0000130600  8183  8300  0081  8183  0100  001C  827F  7006
0000130620  6361  5F6B  0068  0682  6966  656C  685F  8202
0000130640  6606  6E75  5F63  0468  0101  8000  0101  8000
0000130660  0101  8000  0101  8000  0101  8000  0101  8000
*
0000131060  0101  8000  0501  7800  8350  0080  0501  7800
0000131100  8328  0080  0101  8000  0101  8000  0101  8000
0000131120  0101  8000  0101  8000  0101  8000  0101  8000
*
0000131320  0101  8000  0101  8000  0501  7800  8368  0080
0000131340  0101  8000  0101  8000  0101  8000  0101  8000
0000131360  0701  7800  0085  8301  0080  0101  8000  0101
0000131400  8000  0101  8000  0101  8000  0101  8000  0101
*
0000131660  8000  0501  7800  8360  0080  0101  8000  0101
0000131700  8000  0101  8000  0101  8000  0101  8000  0101
*
0000135000  8000  0101  8000  0101  8000  1601  7900  0220
0000135020  1983  8304  041A  0A82  7528  746E  6761  6567
0000135040  2964  0169  0007  837F  0081  8183  0100  0009
0000135060  827F  7801  8200  7901  0102  0001  0180  0001
0000135100  0180  0001  0180  0001  0180  0001  0180  0001
*
0000135200  0180  0001  0180  0001  0180  0001  0180  0018
0000135220  8579  0120  8302  0431  3283  8204  280A  6E75
0000135240  6174  6767  6465  6929  0701  7F00  8683  8300
```

```
THU MAR 14 17:45:10 1991  RV.DLL  PAGE 41, LINE 2361

0000135260  0254  1501  7F00  0682  626F  5F6A  6469  8200
0000135300  6F08  6A62  6E5F  6D61  0465  0101  8000  0101
0000135320  8000  0101  8000  0101  8000  0101  8000  0101
*
0000135700  8000  0101  8000  0101  8000  0101  8000  0701
0000135720  7A00  8373  0430  0082  0101  8000  0101  8000
0000135740  0101  8000  0101  8000  0101  8000  0101  8000
0000135760  1601  7900  0330  7C83  8304  047D  0A82  7528
0000136000  746E  6761  6567  2964  0169  000A  837F  0085
0000136020  8583  8300  0085  1A01  7F00  0582  6977  7464
0000136040  0068  0682  6568  6769  7468  8202  6405  7065
0000136060  6874  0104  0018  8579  0140  8308  0480  8183
0000136100  8204  280A  6E75  6174  6767  6465  6929  0701
0000136120  7800  8085  8300  0084  1901  7F00  8183  8300
0000136140  047B  8583  8300  0085  C483  8300  0082  E483
0000136160  8300  047F  5A01  7F00  0682  6572  7270  7365
0000136200  8200  6406  6D69  6E65  0273  1082  6164  6174
0000136220  6C5F  7961  7265  645F  7065  6874  8208  7308
0000136240  6769  735F  7A69  0A65  0782  6973  5F67  7470
0000136260  0C72  0982  7462  706D  735F  7A69  1065  0882
0000136300  7462  706D  705F  7274  8214  7305  6170  6572
0000136320  0118  0001  0180  0018  8579  05A0  830C  0485
0000136340  8683  8204  280A  6E75  6174  6767  6465  6929
0000136360  0701  7800  8085  8301  0084  2501  7F00  8683
0000136400  8300  0254  5483  8302  0086  8183  8300  0085
0000136420  8683  8300  0082  8683  8300  0418  7E83  8304
0000136440  0484  7E01  7F00  0282  6469  8200  6E04  6D61
0000136460  0465  0982  6966  656C  6E5F  6D61  2465  0982
0000136500  7865  5F70  6374  695F  4464  0482  7974  6570
0000136520  8248  720C  6665  6C5F  6E69  5F65  756E  4A6D
0000136540  0982  6572  5F66  6374  695F  4C64  0A82  6974
0000136560  656D  735F  6174  706D  8250  6106  696F  695F
0000136600  5464  0882  6F6C  6163  6974  6E6F  8258  6209
0000136620  6D74  5F70  6E69  6F66  825C  7305  6170  6572
0000136640  8485  0100  0001  0180  0001  0180  0001  0180
0000136660  0001  0180  0001  0180  0001  0180  0001  0180
*
0000137200  0001  0180  001B  2079  8309  04C0  C183  8204
0000137220  690F  755F  6D5F  6773  705F  7261  6D61  745F
0000137240  0169  001C  837F  0081  8583  8300  0082  8683
0000137260  8300  0088  8083  8300  0084  C083  8300  00C0
0000137300  6A01  7F00  0982  5F69  5F75  6873  726F  0074
0000137320  0A82  5F69  5F75  7375  6F68  7472  8200  6908
0000137340  755F  6C5F  6E6F  0067  0982  5F69  5F75  6C75
0000137360  6E6F  0067  0982  5F69  5F75  6C66  616F  0074
0000137400  0882  5F69  5F75  6863  7261  8200  6909  755F
0000137420  755F  6863  7261  8200  6907  755F  735F  7274
0000137440  8200  6909  755F  625F  6F6C  6B63  0100  0019
0000137460  3079  8302  04C3  C483  8204  690D  6D5F  6773
0000137500  705F  7261  6D61  745F  0169  0007  837F  0085
0000137520  BF83  0104  0010  827F  7404  7079  0065  0582
0000137540  6176  756C  0265  0101  8000  1C01  7900  9085
0000137560  0900  C783  8304  04C8  0E82  5F69  736D  5F67
0000137600  6568  6461  7265  745F  0169  001C  837F  0081
0000137620  8183  8300  0085  8583  8300  0084  8583  8300
0000137640  0085  8183  8300  0085  4701  7F00  0482  5F71
0000137660  6469  8200  7306  756F  6372  0265  0382  6970
0000137700  0464  0382  6974  0664  0482  6572  7073  8208
0000137720  7208  7365  5F70  6974  0A64  0782  706F  635F
```

THU MAR 14 17:45:10 1991 RV.DLL PAGE 42, LINE 2420

```
0000137740  646F  0C65  0482  7974  6570  820E  7304  7A69
0000137760  1065  1501  7900  C085  0200  CB83  8304  04CC
0000140000  0782  5F69  736D  5F67  6974  0501  7800  8330
0000140020  04C2  0701  7F00  C683  8304  04CA  1701  7F00
0000140040  0682  6568  6461  7265  8200  700A  7261  6D61
0000140060  6C5F  7369  1274  0101  8000  0101  8000  0101
0000140100  8000  0701  7A00  8373  04C9  0082  0101  8000
0000140120  0101  8000  0101  8000  0101  8000  0101  8000
*
0000140620  0101  8000  0701  7800  0085  8308  0080  0101
0000140640  8000  0101  8000  0101  8000  0101  8000  0101
*
0000141260  8000  0101  8000  1B01  7900  5085  0609  6B83
0000141300  8305  056C  0D82  705F  725F  7065  6E5F  646F
0000141320  5F65  6974  1301  7F00  8183  8300  0081  5483
0000141340  8302  0523  8583  8300  0082  3601  7F00  0582
0000141360  7665  6E65  0074  0682  6572  7573  746C  8202
0000141400  6E04  6D61  0465  0482  6574  7473  8224  6C07
0000141420  6E69  5F65  6F6E  2485  8201  7005  7261  6D61
0000141440  2685  0101  0001  0180  0001  0180  0001  0180
0000141460  0001  0180  0001  0180  0001  0180  0001  0180
0000141500  0001  0180  0007  737A  6A83  8205  0100  0001
0000141520  0180  0001  0180  0001  0180  0001  0180  0001
*
0000141600  0180  001B  8579  0990  8308  0584  8583  8205
0000141620  5F0D  5F72  6373  5F72  6F6E  6564  745F  0169
0000141640  0019  837F  0254  8683  8300  0523  8683  8300
0000141660  0081  8583  8300  0085  8283  0100  0052  827F
0000141700  6E04  6D61  0065  0782  616E  656D  695F  2064
0000141720  0482  6574  7473  8224  7407  7365  5F74  6469
0000141740  2485  8201  6C07  6E69  5F65  6F6E  2885  8201
0000141760  6D05  7369  665F  2A85  8201  6509  7078  735F
0000142000  6769  665F  2C85  8201  7404  6D69  8565  012E
0000142020  0101  8000  0101  8000  0101  8000  0101  8000
0000142040  0101  8000  0101  8000  0701  7A00  8373  0583
0000142060  0082  0101  8000  0101  8000  0101  8000  0101
0000142100  8000  0101  8000  0101  8000  0101  8000  0101
0000142120  8000  0701  7A00  8373  058C  0082  0101  8000
0000142140  0101  8000  0101  8000  0101  8000  0101  8000
*
0000142300  0101  8000  0101  8000  0A01  7500  8380  0085
0000142320  0364  B283  0105  000A  837F  0086  8683  8300
0000142340  00C0  0A01  7F00  C083  8300  0086  C683  0100
0000142360  000A  8075  8183  6400  8303  05B3  0101  8000
0000142400  0501  7800  8368  0080  0501  7800  8338  0080
0000142420  0701  7A00  8373  05B9  0082  0A01  7500  8380
0000142440  0081  0064  0183  0102  0005  6078  8283  0100
0000142460  0007  837F  00C0  8583  0100  000A  8075  8183
0000142500  6400  8302  05BB  0101  8000  1301  7F00  C083
0000142520  8300  0086  C083  8300  0085  C183  8300  0595
0000142540  0A01  7500  8380  0081  0664  BE83  0105  0001
0000142560  0180  0007  8578  0088  8083  0100  0005  4078
0000142600  8083  0100  0013  837F  00C0  8683  8300  0081
0000142620  8C83  8305  00C1  9583  0105  000A  8075  8183
0000142640  6400  8306  05C3  0101  8000  0701  7800  B885
0000142660  8300  0080  0501  7800  8320  0080  0501  7800
0000142700  8330  0080  0D01  7F00  C083  8300  0086  C183
0000142720  8300  0595  0A01  7500  8380  0081  0464  C983
0000142740  0105  0001  0180  0007  8578  00B0  8083  0100
```

```
THU MAR 14 17:45:10 1991  RV.DLL  PAGE 43, LINE 2479

0000142760  000A  837F  0086  8683  8300  00C0  0A01  7500
0000143000  8380  0085  0364  CD83  0105  0010  837F  00C0
0000143020  8583  8300  00C0  C683  8300  00C1  0A01  7500
0000143040  8380  0081  0564  CF83  0105  000D  837F  00C0
0000143060  8C83  8305  0081  C183  0100  000A  8075  8183
0000143100  6400  8304  05D1  0101  8000  0501  7800  8370
0000143120  0080  1301  7F00  8C83  8305  0081  8183  8300
0000143140  00C1  C183  8300  0000  0A01  7500  8380  0081
0000143160  0664  D583  0105  0001  0180  0005  7878  8083
0000143200  0100  0016  837F  058C  8183  8300  0081  C183
0000143220  8300  00C1  C183  8300  00C1  0A01  7500  8380
0000143240  0081  0764  D983  0105  0004  837F  0081  0A01
0000143260  7500  8380  0081  0164  DB83  0105  0001  0180
0000143300  0007  8578  0080  8083  0100  000A  8075  8183
0000143320  6400  8300  0201  0101  8000  1601  7900  0330
0000143340  0383  8302  0204  0A82  7528  746E  6761  6567
0000143360  2964  0169  000A  837F  0081  8183  8300  0081
0000143400  1C01  7F00  0682  6170  6B63  685F  8200  6606
0000143420  6C69  5F65  0268  0682  7566  636E  685F  0104
0000143440  0001  0180  0001  0180  0001  0180  0001  0180
*
0000143640  0001  0180  0001  0180  0001  0180  0005  4078
0000143660  8083  0100  0005  2878  8083  0100  0001  0180
0000143700  0001  0180  0001  0180  0001  0180  0001  0180
*
0000144140  0001  0180  0007  8578  0100  8083  0100  0001
0000144160  0180  0001  0180  0001  0180  0001  0180  0001
*
0000152260  0180  0001  0180  0001  0180  0001  0180  0007
0000152300  8578  0800  8083  0100  0001  0180  0001  0180
0000152320  0001  0180  0017  8579  18D0  830A  056F  7083
0000152340  8205  5F09  5F72  6F66  6D72  745F  0169  0007
0000152360  8578  0320  8083  0100  001F  837F  0085  6E83
0000152400  8305  056E  6983  8305  056E  5483  8302  056E
0000152420  6E83  8305  0085  8583  0100  0067  827F  6902
0000152440  0064  0582  6974  6C74  0265  0A82  6574  7473
0000152460  745F  7469  656C  8266  7404  7365  8574  00CA
0000152500  0882  7274  745F  7469  656C  CA85  8201  7402
0000152520  8572  022E  0A82  616E  656D  745F  7469  656C
0000152540  4E85  8202  6E04  6D61  8565  02B2  0882  6373
0000152560  5F72  7974  6570  1685  8203  6105  6C6C  665F
0000152600  1885  0103  0001  0180  0001  0180  0001  0180
0000152620  0001  0180  0001  0180  0007  737A  6D83  8205
0000152640  0100  0001  0180  0001  0180  0001  0180  0001
0000152660  0180  0001  0180  0001  0180  0001  0180  0001
*
0000153040  0180  0001  0180  0001  0180  000A  8075  0083
0000153060  6402  8301  059A  0401  7F00  7683  0105  0001
0000153100  0180  0001  0180  0001  0180  0001  0180  0001
0000153120  0180  0001  0180  0001  0180  0004  837F  0576
0000153140  0A01  7500  8380  0081  0164  A283  0105  0001
0000153160  0180  0001  0180  0005  7078  8083  0100  0005
0000153200  3878  8083  0100  0007  737A  A983  8205  0100
0000153220  000A  8075  8183  6400  8300  0201  0501  7800
0000153240  8360  0082  0D01  7F00  C083  8300  0085  C083
0000153260  8300  00C0  0A01  7500  8380  00C0  0473  AB83
0000153300  0105  0007  8578  00C8  8083  0100  0001  0180
0000153320  0004  837F  0576  0A01  7500  8380  0200  0164
0000153340  AF83  0105  0001  0180  0007  8578  0080  8083
```

THU MAR 14 17:45:10 1991 RV.DLL PAGE 44, LINE 2538

| | | | | | | | | |
|---|---|---|---|---|---|---|---|---|
| 0000153360 | 0100 | 0005 | 2078 | 8083 | 0100 | 0004 | 837F | 00C0 |
| 0000153400 | 0A01 | 7500 | 8380 | 0200 | 0164 | B483 | 0105 | 0001 |
| 0000153420 | 0180 | 0007 | 8578 | 0088 | 8083 | 0100 | 000A | 837F |
| 0000153440 | 0085 | 8583 | 8300 | 0085 | 0A01 | 7500 | 8380 | 0200 |
| 0000153460 | 0364 | B883 | 0105 | 000A | 837F | 0085 | 8583 | 8300 |
| 0000153500 | 0085 | 0A01 | 7500 | 8380 | 0200 | 0364 | BA83 | 0105 |
| 0000153520 | 0004 | 837F | 0085 | 0A01 | 7500 | 8380 | 0200 | 0164 |
| 0000153540 | BC83 | 0105 | 0004 | 837F | 0576 | 0A01 | 7500 | 8380 |
| 0000153560 | 0200 | 0164 | BE83 | 0105 | 000A | 8075 | C083 | 6400 |
| 0000153600 | 8300 | 0201 | 1105 | 0001 | 0000 | 0120 | 0000 | 042F |
| 0000153620 | 022E | 0016 | 0220 | 0000 | 1104 | 5F72 | 6964 | 7073 |
| 0000153640 | 616C | 5F79 | 6373 | 6572 | 6E65 | 1673 | 0A04 | C000 |
| 0000153660 | 1000 | 6574 | 7473 | 665F | 6C75 | 5F6C | 616E | 656D |
| 0000153700 | 705F | 040F | 0006 | 00C0 | 7409 | 5F72 | 616E | 656D |
| 0000153720 | 705F | 040C | FFFA | 00C0 | 5F06 | 745F | 7079 | 0F65 |
| 0000153740 | D004 | 85FC | 0900 | 5F5F | 7862 | 745F | 7079 | 0D65 |
| 0000153760 | C004 | 34FC | 0704 | 5F5F | 7270 | 6E69 | 0B74 | B804 |
| 0000154000 | 02FC | 0502 | 5F5F | 766C | 0D6C | C404 | 36FC | 0704 |
| 0000154020 | 5F5F | 6C63 | 636F | 0D6B | D804 | C0FC | 0700 | 5F5F |
| 0000154040 | 7473 | 6361 | 0E6B | BE04 | 81FC | 0800 | 5F5F | 6572 |
| 0000154060 | 7674 | 6C61 | 040A | FCDC | 03FA | 6604 | 726F | 0C6D |
| 0000154100 | F604 | 02FF | 0604 | 6F66 | 6D72 | 705F | 040B | FCD2 |
| 0000154120 | 03D8 | 6D05 | 6773 | 705F | 0408 | FCD6 | 0081 | 7202 |
| 0000154140 | 0E63 | 8805 | 0500 | 3200 | 0604 | 5F5F | 7566 | 636E |
| 0000154160 | 0201 | 0D05 | 0000 | 001A | 050F | 0080 | 0005 | 00C0 |
| 0000154200 | 4207 | 785F | 6946 | 656C | 050F | 0084 | 0005 | 00C0 |
| 0000154220 | 4207 | 785F | 6150 | 6B63 | 0514 | 0000 | 0000 | 0081 |
| 0000154240 | 420C | 5F78 | 6544 | 7562 | 4D67 | 646F | 1465 | 0005 |
| 0000154260 | 0000 | 8100 | 0C00 | 7842 | 545F | 6D69 | 7365 | 6F4D |
| 0000154300 | 6564 | 0510 | 0000 | 0000 | 0081 | 4208 | 5F78 | 5F42 |
| 0000154320 | 6973 | 0567 | 0111 | 0000 | 1600 | 2E01 | EC02 | CB05 |
| 0000154340 | 1001 | C000 | 0001 | 0400 | 7207 | 5F72 | 6E69 | 7469 |
| 0000154360 | 0416 | 0006 | 00C0 | 7410 | 7365 | 5F74 | 7566 | 6C6C |
| 0000154400 | 6E5F | 6D61 | 5F65 | 0F70 | 0A04 | C000 | 0900 | 7274 |
| 0000154420 | 6E5F | 6D61 | 5F65 | 0C70 | 0E04 | C100 | 0605 | 6F66 |
| 0000154440 | 6D72 | 705F | 0201 | 0115 | 03F9 | 05F1 | 0F1A | 0010 |
| 0000154460 | 0F0F | 0000 | 0604 | 7272 | 645F | 676C | 040D | 0006 |
| 0000154500 | 0085 | 6F07 | 5F70 | 6F63 | 6564 | 040C | 0008 | 05C1 |
| 0000154520 | 6606 | 726F | 5F6D | 0C70 | FA04 | C0FE | 0600 | 5F5F |
| 0000154540 | 7974 | 6570 | 040F | FCC4 | 0085 | 5F09 | 625F | 5F78 |
| 0000154560 | 7974 | 6570 | 040D | FCB2 | 03A5 | 5F07 | 705F | 6972 |
| 0000154600 | 746E | 040B | FCAA | 0202 | 5F05 | 6C5F | 6C76 | 040D |
| 0000154620 | FCB8 | 05F5 | 5F07 | 635F | 6F6C | 6B63 | 040D | FDF4 |
| 0000154640 | 00C0 | 5F07 | 735F | 6174 | 6B63 | 040E | FCB0 | 0081 |
| 0000154660 | 5F08 | 725F | 7465 | 6176 | 086C | 6204 | 86FC | 0200 |
| 0000154700 | 6469 | 0412 | FCF2 | 0563 | 640C | 5F62 | 6574 | 7473 |
| 0000154720 | 6E5F | 6D61 | 1465 | CA04 | C0FC | 0E00 | 6264 | 665F |
| 0000154740 | 6C75 | 5F6C | 616E | 656D | 705F | 0414 | FDF8 | 0563 |
| 0000154760 | 6D0E | 6961 | 5F6E | 6574 | 7473 | 6E5F | 6D61 | 0F65 |
| 0000155000 | FE04 | 63FE | 0905 | 6574 | 7473 | 6E5F | 6D61 | 0A65 |
| 0000155020 | B604 | 85FC | 0400 | 7274 | 665F | 040B | FCC8 | 0081 |
| 0000155040 | 6905 | 646E | 7865 | 0410 | FC5E | 0510 | 720A | 7365 |
| 0000155060 | 5F70 | 736D | 5F67 | 1270 | F804 | 85FE | 0C00 | 6F66 |
| 0000155100 | 6372 | 5F65 | 6964 | 7073 | 665F | 0409 | FC66 | 0595 |
| 0000155120 | 6203 | 6675 | 040B | FCCE | 0510 | 6D05 | 6773 | 705F |
| 0000155140 | 040A | FCD2 | 0254 | 7404 | 6D65 | 0770 | C604 | 81FC |
| 0000155160 | 0100 | 0869 | F204 | 81FD | 0200 | 6372 | 050E | 08D8 |
| 0000155200 | 0005 | 05F4 | 5F06 | 665F | 6E75 | 0163 | 1B02 | 1301 |
| 0000155220 | FE13 | B405 | 1005 | A900 | 0005 | 0400 | 720C | 5F72 |

THU MAR 14 17:45:10 1991 RV.DLL PAGE 45, LINE 2597

| | | | | | | | | |
|---|---|---|---|---|---|---|---|---|
| 0000155240 | 6964 | 7073 | 645F | 6669 | 1066 | 0604 | C600 | 0A05 |
| 0000155260 | 6373 | 5F72 | 696C | 7473 | 705F | 040F | 000A | 0081 |
| 0000155300 | 7309 | 7263 | 635F | 756F | 746E | 040B | 000C | 0081 |
| 0000155320 | 6905 | 646E | 7865 | 040E | 000E | 0081 | 7308 | 7263 |
| 0000155340 | 745F | 7079 | 1265 | 1004 | 8500 | 0C00 | 6F66 | 6372 |
| 0000155360 | 5F65 | 6964 | 7073 | 665F | 040C | FFFA | 00C0 | 5F06 |
| 0000155400 | 745F | 7079 | 0F65 | CC04 | 85FE | 0900 | 5F5F | 7862 |
| 0000155420 | 745F | 7079 | 0D65 | 0804 | A5FE | 0703 | 5F5F | 7270 |
| 0000155440 | 6E69 | 0B74 | 0004 | 02FE | 0502 | 5F5F | 766C | 0D6C |
| 0000155460 | 0C04 | F5FE | 0705 | 5F5F | 6C63 | 636F | 0D6B | F204 |
| 0000155500 | C0FF | 0700 | 5F5F | 7473 | 6361 | 0E6B | 0604 | 81FE |
| 0000155520 | 0800 | 5F5F | 6572 | 7674 | 6C61 | 0409 | FDBC | 0595 |
| 0000155540 | 6203 | 6675 | 0410 | FCB2 | 0510 | 720A | 7365 | 5F70 |
| 0000155560 | 736D | 5F67 | 0E70 | CE04 | 54FE | 0802 | 6373 | 5F72 |
| 0000155600 | 616E | 656D | 0411 | FCB6 | 00C0 | 740B | 7365 | 5F74 |
| 0000155620 | 616E | 656D | 705F | 040D | FFF6 | 0085 | 6C07 | 6E69 |
| 0000155640 | 5F65 | 6F6E | 040D | FEEE | 0563 | 7307 | 7263 | 745F |
| 0000155660 | 7478 | 040E | FCBA | 0563 | 7408 | 7365 | 5F74 | 7874 |
| 0000155700 | 0F74 | F804 | 81FF | 0900 | 6D69 | 5F67 | 6E69 | 6564 |
| 0000155720 | 0F78 | EE04 | 81FF | 0900 | 6D69 | 5F67 | 6F63 | 6E75 |
| 0000155740 | 0D74 | 1804 | C3FE | 0704 | 6D69 | 5F67 | 6468 | 0972 |
| 0000155760 | BA04 | 81FD | 0300 | 7269 | 0863 | F004 | 81FF | 0200 |
| 0000156000 | 6372 | 050E | 09BE | 0005 | 024F | 5F06 | 665F | 6E75 |
| 0000156020 | 0163 | 1C02 | C701 | 0618 | 4A06 | 1004 | 3F00 | 0004 |
| 0000156040 | 0400 | 720D | 5F72 | 6964 | 7073 | 695F | 616D | 6567 |
| 0000156060 | 0410 | 0006 | 05C6 | 730A | 7263 | 6C5F | 7369 | 5F74 |
| 0000156100 | 0F70 | 0A04 | 8100 | 0900 | 6373 | 5F72 | 6F63 | 6E75 |
| 0000156120 | 0B74 | 0C04 | 8100 | 0500 | 6E69 | 6564 | 0C78 | FA04 |
| 0000156140 | C0FF | 0600 | 5F5F | 7974 | 6570 | 040F | FECC | 0085 |
| 0000156160 | 5F09 | 625F | 5F78 | 7974 | 6570 | 040D | FEBC | 03A5 |
| 0000156200 | 5F07 | 705F | 6972 | 746E | 040B | FEB4 | 0202 | 5F05 |
| 0000156220 | 6C5F | 6C76 | 040D | FEC0 | 05F5 | 5F07 | 635F | 6F6C |
| 0000156240 | 6B63 | 040D | FFF2 | 00C0 | 5F07 | 735F | 6174 | 6B63 |
| 0000156260 | 040E | FEBA | 0081 | 5F08 | 725F | 7465 | 6176 | 096C |
| 0000156300 | 5204 | 98FE | 0305 | 7562 | 1066 | 4A04 | 10FD | 0A05 |
| 0000156320 | 6572 | 7073 | 6D5F | 6773 | 705F | 040E | FECE | 0254 |
| 0000156340 | 7308 | 7263 | 6E5F | 6D61 | 1165 | 4E04 | C0FD | 0B00 |
| 0000156360 | 6574 | 7473 | 6E5F | 6D61 | 5F65 | 0D70 | F604 | 85FF |
| 0000156400 | 0700 | 696C | 656E | 6E5F | 0F6F | EE04 | 81FF | 0900 |
| 0000156420 | 6D69 | 5F67 | 6F63 | 6E75 | 0F74 | F804 | 81FF | 0900 |
| 0000156440 | 6D69 | 5F67 | 6E69 | 6564 | 0D78 | EE04 | 63FE | 0705 |
| 0000156460 | 6373 | 5F72 | 7874 | 0E74 | 5204 | 63FD | 0805 | 6574 |
| 0000156500 | 7473 | 745F | 7478 | 0408 | FFF0 | 0081 | 7202 | 0E63 |
| 0000156520 | 5605 | 050A | 0800 | 0606 | 5F5F | 7566 | 636E | 0201 |
| 0000156540 | 0512 | 15B4 | 0005 | 05C6 | 690A | 676D | 6C5F | 7369 |
| 0000156560 | 5F74 | 1373 | FA05 | 0507 | 8100 | 0B00 | 6D69 | 5F67 |
| 0000156600 | 6F63 | 6E75 | 5F74 | 1273 | FC05 | 0507 | 8500 | 0A00 |
| 0000156620 | 656E | 5F77 | 696C | 7473 | 665F | 0D05 | 0000 | 001A |
| 0000156640 | 050F | 00DA | 0005 | 00C0 | 4207 | 785F | 6946 | 656C |
| 0000156660 | 050F | 00DE | 0005 | 00C0 | 4207 | 785F | 6150 | 6B63 |
| 0000156700 | 0514 | 0000 | 0000 | 0081 | 420C | 5F78 | 6544 | 7562 |
| 0000156720 | 4D67 | 646F | 1465 | 0005 | 0000 | 8100 | 0C00 | 7842 |
| 0000156740 | 545F | 6D69 | 7365 | 6F4D | 6564 | 0510 | 0000 | 0000 |
| 0000156760 | 0081 | 4208 | 5F78 | 5F42 | 6973 | 0E67 | E205 | 0500 |
| 0000157000 | B500 | 0605 | 616C | 7473 | 735F | 0510 | 15BC | 0005 |
| 0000157020 | 05EA | 6C08 | 7361 | 5F74 | 5F70 | 1273 | EE05 | 0505 |
| 0000157040 | 6300 | 0A05 | 726F | 5F67 | 6574 | 7473 | 735F | 0510 |
| 0000157060 | 06EE | 0005 | 0563 | 6F08 | 6772 | 745F | 5F72 | 1473 |
| 0000157100 | EE05 | 0507 | 8500 | 0C00 | 7263 | 5F76 | 6574 | 7473 |

THU MAR 14 17:45:10 1991 RV.DLL PAGE 46, LINE 2656

| | | | | | | | | |
|---|---|---|---|---|---|---|---|---|
| 0000157120 | 665F | 735F | 0512 | 07F0 | 0005 | 0085 | 630A | 7672 |
| 0000157140 | 745F | 5F72 | 5F66 | 1473 | F205 | 0507 | 8500 | 0C00 |
| 0000157160 | 6964 | 6666 | 725F | 7065 | 665F | 735F | 0513 | 07F4 |
| 0000157200 | 0005 | 0085 | 650B | 7078 | 725F | 7065 | 665F | 735F |
| 0000157220 | 050E | 15C0 | 0005 | 05C6 | 6C06 | 7369 | 5F74 | 0F73 |
| 0000157240 | F605 | 0507 | 8100 | 0700 | 6F63 | 6E75 | 5F74 | 1273 |
| 0000157260 | B805 | 0515 | C600 | 0A05 | 6572 | 5F70 | 696C | 7473 |
| 0000157300 | 735F | 0513 | 07F8 | 0005 | 0081 | 720B | 7065 | 635F |
| 0000157320 | 756F | 746E | 735F | 1105 | 0001 | 0000 | 011B | 1D12 |
| 0000157340 | 05B4 | 0182 | 0010 | 0177 | 0000 | 0C04 | 7272 | 6F5F |
| 0000157360 | 6570 | 5F6E | 6574 | 7473 | 0419 | 0006 | 00C0 | 6413 |
| 0000157400 | 5F62 | 7566 | 6C6C | 745F | 7365 | 5F74 | 616E | 656D |
| 0000157420 | 705F | 040D | 000A | 0086 | 7407 | 7365 | 5F74 | 6469 |
| 0000157440 | 040A | 000E | 00C6 | 6904 | 5F64 | 0C70 | FA04 | C0FF |
| 0000157460 | 0600 | 5F5F | 7974 | 6570 | 040F | FFF2 | 0085 | 5F09 |
| 0000157500 | 625F | 5F78 | 7974 | 6570 | 040D | FFE2 | 05B8 | 5F07 |
| 0000157520 | 705F | 6972 | 746E | 040B | FFDA | 0202 | 5F05 | 6C5F |
| 0000157540 | 6C76 | 040D | FFE6 | 05BA | 5F07 | 635F | 6F6C | 6B63 |
| 0000157560 | 040D | FFF6 | 00C0 | 5F07 | 735F | 6174 | 6B63 | 040E |
| 0000157600 | FFE0 | 0081 | 5F08 | 725F | 7465 | 6176 | 086C | D604 |
| 0000157620 | 86FF | 0200 | 6469 | 0408 | FFF4 | 0081 | 7202 | 0E63 |
| 0000157640 | 8E05 | 050A | 4F00 | 0602 | 5F5F | 7566 | 636E | 0201 |
| 0000157660 | 011A | 1E94 | 05BC | 01A3 | 0010 | 0198 | 0000 | 0B04 |
| 0000157700 | 7272 | 635F | 7672 | 6F5F | 6570 | 116E | 0604 | C000 |
| 0000157720 | 0B00 | 6574 | 7473 | 6E5F | 6D61 | 5F65 | 1270 | 0A04 |
| 0000157740 | 8500 | 0C00 | 6F63 | 6D6D | 6E61 | 5F64 | 7974 | 6570 |
| 0000157760 | 040C | FFFA | 00C0 | 5F06 | 745F | 7079 | 0F65 | F204 |
| 0000160000 | 85FF | 0900 | 5F5F | 7862 | 745F | 7079 | 0D65 | E204 |
| 0000160020 | B8FF | 0705 | 5F5F | 7270 | 6E69 | 0B74 | DA04 | 02FF |
| 0000160040 | 0502 | 5F5F | 766C | 0D6C | E604 | BAFF | 0705 | 5F5F |
| 0000160060 | 6C63 | 636F | 0D6B | F604 | C0FF | 0700 | 5F5F | 7473 |
| 0000160100 | 6361 | 0E6B | E004 | 81FF | 0800 | 5F5F | 6572 | 7674 |
| 0000160120 | 6C61 | 0410 | FFD6 | 04D0 | 720A | 7365 | 5F70 | 736D |
| 0000160140 | 5F67 | 0870 | F404 | 81FF | 0200 | 6372 | 050E | 0AAA |
| 0000160160 | 0005 | 0283 | 5F06 | 665F | 6E75 | 0163 | 1F02 | 3701 |
| 0000160200 | BF20 | D405 | 1005 | C900 | 0005 | 0400 | 7210 | 5F72 |
| 0000160220 | 6264 | 695F | 616D | 6567 | 6C5F | 7369 | 1674 | 0604 |
| 0000160240 | C000 | 1000 | 7566 | 6C6C | 745F | 7365 | 5F74 | 616E |
| 0000160260 | 656D | 705F | 040D | 000A | 0086 | 7407 | 7365 | 5F74 |
| 0000160300 | 6469 | 0416 | 000E | 00C0 | 6D10 | 6961 | 5F6E | 6574 |
| 0000160320 | 7473 | 6E5F | 6D61 | 5F65 | 0A70 | 1204 | 8500 | 0400 |
| 0000160340 | 7274 | 665F | 0411 | 0014 | 00C1 | 730B | 7263 | 635F |
| 0000160360 | 756F | 746E | 705F | 0410 | 0018 | 0595 | 730A | 7263 |
| 0000160400 | 6C5F | 7369 | 5F74 | 0C70 | F604 | C0FF | 0600 | 5F5F |
| 0000160420 | 7974 | 6570 | 040F | FEDE | 0085 | 5F09 | 625F | 5F78 |
| 0000160440 | 7974 | 6570 | 040D | FE16 | 05B8 | 5F07 | 705F | 6972 |
| 0000160460 | 746E | 040B | FE0E | 0202 | 5F05 | 6C5F | 6C76 | 040D |
| 0000160500 | FE1E | 05BA | 5F07 | 635F | 6F6C | 6B63 | 040D | FFEE |
| 0000160520 | 00C0 | 5F07 | 735F | 6174 | 6B63 | 040E | FE14 | 0081 |
| 0000160540 | 5F08 | 725F | 7465 | 6176 | 0C6C | 1A04 | 74FE | 0604 |
| 0000160560 | 696C | 7473 | 705F | 040B | FEE0 | 0081 | 6305 | 756F |
| 0000160600 | 746E | 040E | FFF2 | 058C | 7308 | 7263 | 6C5F | 7369 |
| 0000160620 | 0D74 | 2A04 | 83FE | 0704 | 6D69 | 5F67 | 6468 | 1472 |
| 0000160640 | E404 | C0FE | 0E00 | 6264 | 665F | 6C75 | 5F6C | 616E |
| 0000160660 | 656D | 705F | 0412 | FFFA | 0086 | 6D0C | 6961 | 5F6E |
| 0000160700 | 6574 | 7473 | 695F | 1464 | E804 | 23FE | 0E05 | 7566 |
| 0000160720 | 6C6C | 6D5F | 6961 | 5F6E | 616E | 656D | 0411 | FFE8 |
| 0000160740 | 00C0 | 740B | 6D65 | 5F70 | 616E | 656D | 705F | 0409 |
| 0000160760 | FEDC | 0081 | 6903 | 6372 | 0407 | FEE2 | 0081 | 6901 |

THU MAR 14 17:45:10 1991 RV.DLL PAGE 47, LINE 2715

| | | | | | | | | |
|---|---|---|---|---|---|---|---|---|
| 0000161000 | 0408 | FFEC | 0081 | 7202 | 0E63 | D605 | 050A | C100 |
| 0000161020 | 0605 | 5F5F | 7566 | 636E | 0201 | 0125 | 260B | 05C4 |
| 0000161040 | 051F | 0010 | 0514 | 0000 | 1604 | 7272 | 725F | 7065 |
| 0000161060 | 645F | 6669 | 5F66 | 6D69 | 6761 | 5F65 | 696C | 7473 |
| 0000161100 | 0416 | 0006 | 00C0 | 6610 | 6C75 | 5F6C | 6574 | 7473 |
| 0000161120 | 6E5F | 6D61 | 5F65 | 0D70 | 0A04 | 8600 | 0700 | 6574 |
| 0000161140 | 7473 | 695F | 0F64 | 0E04 | 8100 | 0900 | 6D69 | 5F67 |
| 0000161160 | 6F63 | 6E75 | 1074 | 1004 | 8C00 | 0A05 | 6D69 | 5F67 |
| 0000161200 | 696C | 7473 | 705F | 0411 | 0014 | 00C1 | 730B | 7263 |
| 0000161220 | 635F | 756F | 746E | 705F | 0410 | 0018 | 0595 | 730A |
| 0000161240 | 7263 | 6C5F | 7369 | 5F74 | 0C70 | F804 | C0FF | 0600 |
| 0000161260 | 5F5F | 7974 | 6570 | 040F | FFE2 | 0085 | 5F09 | 625F |
| 0000161300 | 5F78 | 7974 | 6570 | 040D | FFCA | 05B8 | 5F07 | 705F |
| 0000161320 | 6972 | 746E | 040B | FFC2 | 0202 | 5F05 | 6C5F | 6C76 |
| 0000161340 | 040D | FFD4 | 05BA | 5F07 | 635F | 6F6C | 6B63 | 040D |
| 0000161360 | FFEC | 00C0 | 5F07 | 735F | 6174 | 6B63 | 040E | FFC8 |
| 0000161400 | 0081 | 5F08 | 725F | 7465 | 6176 | 0F6C | BE04 | 81FF |
| 0000161420 | 0900 | 6572 | 5F70 | 6F63 | 6E75 | 1074 | F404 | 75FF |
| 0000161440 | 0A05 | 6572 | 5F70 | 696C | 7473 | 705F | 040E | FFF0 |
| 0000161460 | 058C | 7308 | 7263 | 6C5F | 7369 | 0F74 | FC04 | 81FF |
| 0000161500 | 0900 | 6373 | 5F72 | 6F63 | 6E75 | 1174 | E604 | 86FF |
| 0000161520 | 0B00 | 7865 | 5F70 | 6574 | 7473 | 695F | 1664 | CE04 |
| 0000161540 | 86FF | 1000 | 616C | 7473 | 655F | 7078 | 745F | 7365 |
| 0000161560 | 5F74 | 6469 | 0409 | FFC0 | 0081 | 6903 | 6372 | 0407 |
| 0000161600 | FFE4 | 0081 | 6901 | 0407 | FFE0 | 0081 | 6A01 | 0407 |
| 0000161620 | FFD2 | 0081 | 6B01 | 0408 | FFEA | 0081 | 7202 | 0E63 |
| 0000161640 | 1205 | 050B | C600 | 0605 | 5F5F | 7566 | 636E | 0201 |
| 0000161660 | 0124 | 2B2A | 05CA | 0466 | 0010 | 045B | 0000 | 1504 |
| 0000161700 | 7272 | 725F | 7065 | 655F | 7078 | 695F | 616D | 6567 |
| 0000161720 | 6C5F | 7369 | 1674 | 0604 | C000 | 1000 | 7566 | 6C6C |
| 0000161740 | 745F | 7365 | 5F74 | 616E | 656D | 705F | 040D | 000A |
| 0000161760 | 0086 | 7407 | 7365 | 5F74 | 6469 | 0411 | 000E | 00C1 |
| 0000162000 | 730B | 7263 | 635F | 756F | 746E | 705F | 0410 | 0012 |
| 0000162020 | 0595 | 730A | 7263 | 6C5F | 7369 | 5F74 | 0C70 | F804 |
| 0000162040 | C0FF | 0600 | 5F5F | 7974 | 6570 | 040F | FFE2 | 0085 |
| 0000162060 | 5F09 | 625F | 5F78 | 7974 | 6570 | 040D | FFCC | 05B8 |
| 0000162100 | 5F07 | 705F | 6972 | 746E | 040B | FFC4 | 0202 | 5F05 |
| 0000162120 | 6C5F | 6C76 | 040D | FFD4 | 05BA | 5F07 | 635F | 6F6C |
| 0000162140 | 6B63 | 040D | FFEC | 00C0 | 5F07 | 735F | 6174 | 6B63 |
| 0000162160 | 040E | FFCA | 0081 | 5F08 | 725F | 7465 | 6176 | 0F6C |
| 0000162200 | C004 | 81FF | 0900 | 6572 | 5F70 | 6F63 | 6E75 | 1074 |
| 0000162220 | F404 | 75FF | 0A05 | 6572 | 5F70 | 696C | 7473 | 705F |
| 0000162240 | 040E | FFF0 | 058C | 7308 | 7263 | 6C5F | 7369 | 0F74 |
| 0000162260 | FC04 | 81FF | 0900 | 6373 | 5F72 | 6F63 | 6E75 | 1174 |
| 0000162300 | E604 | 86FF | 0B00 | 7865 | 5F70 | 6574 | 7473 | 695F |
| 0000162320 | 1664 | D004 | 86FF | 1000 | 616C | 7473 | 655F | 7078 |
| 0000162340 | 745F | 7365 | 5F74 | 6469 | 0409 | FFC2 | 0081 | 6903 |
| 0000162360 | 6372 | 0407 | FFE4 | 0081 | 6901 | 0407 | FFE0 | 0081 |
| 0000162400 | 6A01 | 0408 | FFEA | 0081 | 7202 | 0E63 | 5405 | 050B |
| 0000162420 | CC00 | 0605 | 5F5F | 7566 | 636E | 0201 | 011B | 2F90 |
| 0000162440 | 05CE | 00E3 | 0010 | 00D8 | 0000 | 0C04 | 7272 | 675F |
| 0000162460 | 7465 | 735F | 6769 | 665F | 040D | 0006 | 0086 | 7407 |
| 0000162500 | 7365 | 5F74 | 6469 | 040C | 000A | 0086 | 6906 | 676D |
| 0000162520 | 695F | 0E64 | 0E04 | C000 | 0800 | 6D69 | 5F67 | 616E |
| 0000162540 | 656D | 040D | FF4A | 0483 | 6907 | 676D | 685F | 7264 |
| 0000162560 | 0409 | FF48 | 0081 | 6903 | 6372 | 0516 | 0B6A | 0005 |
| 0000162600 | 0086 | 6C0E | 7361 | 5F74 | 706F | 6E65 | 6465 | 695F |
| 0000162620 | 0164 | 2102 | 7301 | D030 | 2505 | 1001 | 1A00 | 0001 |
| 0000162640 | 0400 | 7212 | 5F72 | 6567 | 5F74 | 6574 | 7473 | 705F |

THU MAR 14 17:45:10 1991 RV.DLL PAGE 48, LINE 2774

| | | | | | | | | |
|---|---|---|---|---|---|---|---|---|
| 0000162660 | 7261 | 6D61 | 1173 | 0604 | C000 | 0B00 | 6574 | 7473 |
| 0000162700 | 6E5F | 6D61 | 5F65 | 0C70 | 0A04 | 8500 | 0600 | 6574 |
| 0000162720 | 7473 | 665F | 0411 | 000C | 00C0 | 660B | 6C75 | 5F6C |
| 0000162740 | 616E | 656D | 705F | 040F | 0010 | 00C6 | 7409 | 7365 |
| 0000162760 | 5F74 | 6469 | 705F | 0411 | 0014 | 00C1 | 740B | 7365 |
| 0000163000 | 5F74 | 7974 | 6570 | 705F | 0408 | FEF2 | 0086 | 6902 |
| 0000163020 | 0A64 | FC04 | 81FF | 0400 | 7974 | 6570 | 040F | FEFA |
| 0000163040 | 0523 | 7409 | 6D65 | 5F70 | 616E | 656D | 0414 | FEF6 |
| 0000163060 | 00C0 | 640E | 5F62 | 7566 | 6C6C | 6E5F | 6D61 | 5F65 |
| 0000163100 | 0870 | FA04 | 81FF | 0200 | 6372 | 0201 | 011C | 3198 |
| 0000163120 | 05D2 | 01A0 | 0010 | 0195 | 0000 | 0D04 | 7272 | 715F |
| 0000163140 | 735F | 7263 | 6E5F | 6D61 | 1065 | 0604 | C000 | 0A00 |
| 0000163160 | 6373 | 5F72 | 616E | 656D | 705F | 0410 | 000A | 058C |
| 0000163200 | 730A | 7263 | 6C5F | 7369 | 5F74 | 0F70 | 0E04 | 8100 |
| 0000163220 | 0900 | 6373 | 5F72 | 6F63 | 6E75 | 0D74 | 1004 | C100 |
| 0000163240 | 0700 | 6E69 | 6564 | 5F78 | 0C70 | FA04 | C0FF | 0600 |
| 0000163260 | 5F5F | 7974 | 6570 | 040F | FFF0 | 0085 | 5F09 | 625F |
| 0000163300 | 5F78 | 7974 | 6570 | 040D | FFE0 | 05B8 | 5F07 | 705F |
| 0000163320 | 6972 | 746E | 040B | FFD8 | 0202 | 5F05 | 6C5F | 6C76 |
| 0000163340 | 040D | FFE4 | 05BA | 5F07 | 635F | 6F6C | 6B63 | 040D |
| 0000163360 | FFF6 | 00C0 | 5F07 | 735F | 6174 | 6B63 | 040E | FFDE |
| 0000163400 | 0081 | 5F08 | 725F | 7465 | 6176 | 0B6C | F204 | 81FF |
| 0000163420 | 0500 | 6E69 | 6564 | 0878 | F404 | 81FF | 0200 | 6372 |
| 0000163440 | 050E | 0B82 | 0005 | 05D4 | 5F06 | 665F | 6E75 | 0163 |
| 0000163460 | 1D02 | 3801 | D633 | 0A05 | 1002 | FF00 | 0001 | 0400 |
| 0000163500 | 720E | 5F72 | 5F71 | 6D69 | 5F67 | 6E69 | 6564 | 1078 |
| 0000163520 | 0604 | 8C00 | 0A05 | 6373 | 5F72 | 696C | 7473 | 705F |
| 0000163540 | 040F | 000A | 0081 | 7309 | 7263 | 635F | 756F | 746E |
| 0000163560 | 040B | 000C | 0081 | 6905 | 646E | 7865 | 0411 | 000E |
| 0000163600 | 00C1 | 690B | 676D | 635F | 756F | 746E | 705F | 0411 |
| 0000163620 | 0012 | 00C1 | 690B | 676D | 695F | 646E | 7865 | 705F |
| 0000163640 | 040F | FFEC | 0085 | 5F09 | 625F | 5F78 | 7974 | 6570 |
| 0000163660 | 040D | FFDC | 05B8 | 5F07 | 705F | 6972 | 746E | 040B |
| 0000163700 | FFD4 | 0202 | 5F05 | 6C5F | 6C76 | 040D | FFE0 | 05BA |
| 0000163720 | 5F07 | 635F | 6F6C | 6B63 | 040D | FFF4 | 00C0 | 5F07 |
| 0000163740 | 735F | 6174 | 6B63 | 040E | FFDA | 0081 | 5F08 | 725F |
| 0000163760 | 7465 | 6176 | 0F6C | F004 | 81FF | 0900 | 6D69 | 5F67 |
| 0000164000 | 6F63 | 6E75 | 0F74 | F804 | 81FF | 0900 | 6D69 | 5F67 |
| 0000164020 | 6E69 | 6564 | 0778 | EE04 | 81FF | 0100 | 0869 | F204 |
| 0000164040 | 81FF | 0200 | 6372 | 040C | FFFA | 00C0 | 5F06 | 745F |
| 0000164060 | 7079 | 0E65 | 9E05 | 050B | D800 | 0605 | 5F5F | 7566 |
| 0000164100 | 636E | 0201 | 011B | 3542 | 05DA | 0299 | 0010 | 028E |
| 0000164120 | 0000 | 0C04 | 7272 | 715F | 735F | 7263 | 735F | 7165 |
| 0000164140 | 0410 | 0006 | 058C | 730A | 7263 | 6C5F | 7369 | 5F74 |
| 0000164160 | 0F70 | 0A04 | 8100 | 0900 | 6373 | 5F72 | 6F63 | 6E75 |
| 0000164200 | 0B74 | 0C04 | 8100 | 0500 | 6E69 | 6564 | 1178 | 0E04 |
| 0000164220 | C100 | 0B00 | 6D69 | 5F67 | 6F63 | 6E75 | 5F74 | 1170 |
| 0000164240 | 1204 | C100 | 0B00 | 6D69 | 5F67 | 6E69 | 6564 | 5F78 |
| 0000164260 | 1170 | 1604 | C100 | 0B00 | 6573 | 5F71 | 6F63 | 6E75 |
| 0000164300 | 5F74 | 1170 | 1A04 | C100 | 0B00 | 6573 | 5F71 | 6E69 |
| 0000164320 | 6564 | 5F78 | 0C70 | F804 | C0FF | 0600 | 5F5F | 7974 |
| 0000164340 | 6570 | 040F | FFE8 | 0085 | 5F09 | 625F | 5F78 | 7974 |
| 0000164360 | 6570 | 040D | FFD8 | 05B8 | 5F07 | 705F | 6972 | 746E |
| 0000164400 | 040B | FFD0 | 0202 | 5F05 | 6C5F | 6C76 | 040D | FFDC |
| 0000164420 | 05BA | 5F07 | 635F | 6F6C | 6B63 | 040D | FFF0 | 00C0 |
| 0000164440 | 5F07 | 735F | 6174 | 6B63 | 040E | FFD6 | 0081 | 5F08 |
| 0000164460 | 725F | 7465 | 6176 | 0F6C | EC04 | 81FF | 0900 | 6D69 |
| 0000164500 | 5F67 | 6F63 | 6E75 | 0F74 | F404 | 81FF | 0900 | 6D69 |
| 0000164520 | 5F67 | 6E69 | 6564 | 0F78 | F604 | 81FF | 0900 | 6573 |

THU MAR 14 17:45:10 1991 RV.DLL PAGE 49, LINE 2833

| | | | | | | | | |
|---|---|---|---|---|---|---|---|---|
| 0000164540 | 5F71 | 6F63 | 6E75 | 0F74 | FC04 | 81FF | 0900 | 6573 |
| 0000164560 | 5F71 | 6E69 | 6564 | 0778 | EA04 | 81FF | 0100 | 0869 |
| 0000164600 | EE04 | 81FF | 0200 | 6372 | 050E | 0BBC | 0005 | 024F |
| 0000164620 | 5F06 | 665F | 6E75 | 0163 | 1E02 | DB01 | DC37 | A905 |
| 0000164640 | 1001 | 9E00 | 0001 | 0400 | 720F | 5F72 | 6964 | 7073 |
| 0000164660 | 655F | 7272 | 6D5F | 6773 | 040E | 0006 | 0081 | 6508 |
| 0000164700 | 7272 | 635F | 646F | 0C65 | FA04 | C0FF | 0600 | 5F5F |
| 0000164720 | 7974 | 6570 | 040F | FFEE | 0085 | 5F09 | 625F | 5F78 |
| 0000164740 | 7974 | 6570 | 040D | FFDE | 0588 | 5F07 | 705F | 6972 |
| 0000164760 | 746E | 040B | FFD6 | 0202 | 5F05 | 6C5F | 6C76 | 040D |
| 0000165000 | FFE2 | 05BA | 5F07 | 635F | 6F6C | 6B63 | 040D | FFF2 |
| 0000165020 | 00C0 | 5F07 | 735F | 6174 | 6B63 | 040E | FFDC | 0081 |
| 0000165040 | 5F08 | 725F | 7465 | 6176 | 0A6C | F604 | C0FF | 0400 |
| 0000165060 | 7768 | 646E | 0409 | FFD4 | 0081 | 6903 | 6372 | 0408 |
| 0000165100 | FFF0 | 0081 | 7202 | 0E63 | EC05 | 050B | DE00 | 0605 |
| 0000165120 | 5F5F | 7566 | 636E | 0201 | 0518 | 0A8A | 0005 | 0086 |
| 0000165140 | 6C10 | 7361 | 5F74 | 706F | 6E65 | 6465 | 695F | 5F64 |
| 0000165160 | 0573 | 000D | 1A00 | 0F00 | 8205 | 050A | C000 | 0700 |
| 0000165200 | 5F42 | 4678 | 6C69 | 0F65 | 8605 | 050A | C000 | 0700 |
| 0000165220 | 5F42 | 5078 | 6361 | 146B | 0005 | 0000 | 8100 | 0C00 |
| 0000165240 | 7842 | 445F | 6265 | 6775 | 6F4D | 6564 | 0514 | 0000 |
| 0000165260 | 0000 | 0081 | 420C | 5F78 | 6954 | 656D | 4D73 | 646F |
| 0000165300 | 1065 | 0005 | 0000 | 8100 | 0800 | 7842 | 425F | 735F |
| 0000165320 | 6769 | 1105 | 0001 | 0000 | 011C | 3984 | 05A3 | 01BE |
| 0000165340 | 0010 | 01B3 | 0000 | 0D04 | 7272 | 755F | 645F | 7369 |
| 0000165360 | 5F70 | 6C64 | 0C67 | 0604 | 7600 | 0605 | 6F66 | 6D72 |
| 0000165400 | 705F | 040A | FFF6 | 00C0 | 6804 | 6E77 | 0864 | F004 |
| 0000165420 | 81FF | 0200 | 6372 | 040C | FFFA | 00C0 | 5F06 | 745F |
| 0000165440 | 7079 | 0F65 | EC04 | 85FF | 0900 | 5F5F | 7862 | 745F |
| 0000165460 | 7079 | 0D65 | DC04 | A8FF | 0705 | 5F5F | 7270 | 6E69 |
| 0000165500 | 0B74 | D404 | 02FF | 0502 | 5F5F | 766C | 0D6C | E004 |
| 0000165520 | AAFF | 0705 | 5F5F | 6C63 | 636F | 0D6B | F204 | C0FF |
| 0000165540 | 0700 | 5F5F | 7473 | 6361 | 0E6B | DA04 | 81FF | 0800 |
| 0000165560 | 5F5F | 6572 | 7674 | 6C61 | 040A | FFEE | 0085 | 6804 |
| 0000165600 | 6F6D | 0E64 | 2605 | 050C | A600 | 0605 | 5F5F | 7566 |
| 0000165620 | 636E | 0201 | 0121 | 3B42 | 05AC | 0358 | 0016 | 034A |
| 0000165640 | 0000 | 1204 | 7272 | 755F | 645F | 7369 | 5F70 | 6C64 |
| 0000165660 | 5F67 | 7270 | 636F | 040A | 0010 | 00C0 | 6804 | 6E77 |
| 0000165700 | 0964 | 0E04 | 8500 | 0300 | 736D | 0967 | 0A04 | C000 |
| 0000165720 | 0300 | 706D | 0931 | 0604 | C000 | 0300 | 706D | 0D32 |
| 0000165740 | FC04 | 85FF | 0700 | 706F | 635F | 646F | 0165 | 1E02 |
| 0000165760 | 9A01 | B03E | AC05 | 1002 | A100 | 0002 | 0400 | 720F |
| 0000166000 | 5F72 | 5F75 | 7277 | 7469 | 5F65 | 6F66 | 6D72 | 040C |
| 0000166020 | 0006 | 0576 | 6606 | 726F | 5F6D | 0C70 | FA04 | C0FF |
| 0000166040 | 0600 | 5F5F | 7974 | 6570 | 040F | FFF4 | 0085 | 5F09 |
| 0000166060 | 625F | 5F78 | 7974 | 6570 | 040D | FFE4 | 05A8 | 5F07 |
| 0000166100 | 705F | 6972 | 746E | 040B | FFDC | 0202 | 5F05 | 6C5F |
| 0000166120 | 6C76 | 040D | FFE8 | 05AA | 5F07 | 635F | 6F6C | 6B63 |
| 0000166140 | 040D | FFF6 | 00C0 | 5F07 | 735F | 6174 | 6B63 | 040E |
| 0000166160 | FFE2 | 0081 | 5F08 | 725F | 7465 | 6176 | 0E6C | 5605 |
| 0000166200 | 050C | B200 | 0605 | 5F5F | 7566 | 636E | 0201 | 011F |
| 0000166220 | 4146 | 05B5 | 0145 | 0010 | 013A | 0000 | 1004 | 7272 |
| 0000166240 | 755F | 775F | 6972 | 6574 | 655F | 746E | 7972 | 040A |
| 0000166260 | 0006 | 00C0 | 6E04 | 6D61 | 0C65 | FA04 | C0FF | 0600 |
| 0000166300 | 5F5F | 7974 | 6570 | 040F | FFF4 | 0085 | 5F09 | 625F |
| 0000166320 | 5F78 | 7974 | 6570 | 040D | FFE4 | 05A8 | 5F07 | 705F |
| 0000166340 | 6972 | 746E | 040B | FFDA | 0202 | 5F05 | 6C5F | 6C76 |
| 0000166360 | 040D | FFE8 | 05AA | 5F07 | 635F | 6F6C | 6B63 | 040D |
| 0000166400 | FFF6 | 00C0 | 5F07 | 735F | 6174 | 6B63 | 040E | FFE0 |

THU MAR 14 17:45:10 1991 RV.DLL PAGE 50, LINE 2892

| | | | | | | | | |
|---|---|---|---|---|---|---|---|---|
| 0000166420 | 0081 | 5F08 | 725F | 7465 | 6176 | 0A6C | E204 | 85FF |
| 0000166440 | 0400 | 7262 | 7365 | 050E | 0C6E | 0005 | 05B7 | 5F06 |
| 0000166460 | 665F | 6E75 | 0163 | 1F02 | 8B01 | B942 | 7E05 | 1000 |
| 0000166500 | 7300 | 0000 | 0400 | 7210 | 5F72 | 5F75 | 7974 | 6570 |
| 0000166520 | 655F | 616E | 6C62 | 0B65 | 0604 | 8500 | 0500 | 7865 |
| 0000166540 | 5F70 | 0B66 | 0804 | 8500 | 0500 | 6361 | 5F74 | 0B66 |
| 0000166560 | 0A04 | 8500 | 0500 | 6964 | 5F66 | 0166 | 1E02 | 0901 |
| 0000166600 | BB43 | 7805 | 1000 | 6D00 | 0000 | 0400 | 720F | 5F72 |
| 0000166620 | 5F75 | 7974 | 6570 | 635F | 6568 | 6B63 | 040B | 0006 |
| 0000166640 | 0085 | 6505 | 7078 | 665F | 040B | 0008 | 0085 | 6105 |
| 0000166660 | 7463 | 665F | 040B | 000A | 0085 | 6405 | 6669 | 665F |
| 0000166700 | 0201 | 0121 | 4381 | 05BD | 0077 | 0010 | 006C | 0000 |
| 0000166720 | 1204 | 7272 | 755F | 655F | 616E | 6C62 | 5F65 | 6573 |
| 0000166740 | 656C | 7463 | 040A | 0006 | 0085 | 6604 | 616C | 0167 |
| 0000166760 | 2102 | F801 | BF43 | 7705 | 1000 | 6C00 | 0000 | 0400 |
| 0000167000 | 7212 | 5F72 | 5F75 | 6567 | 5F74 | 6F66 | 6D72 | 695F |
| 0000167020 | 666E | 0C6F | 0604 | 7600 | 0605 | 6F66 | 6D72 | 705F |
| 0000167040 | 0201 | 011C | 446F | 05C0 | 0025 | 0010 | 001A | 0000 |
| 0000167060 | 0D04 | 7272 | 755F | 675F | 7465 | 685F | 6E77 | 0164 |
| 0000167100 | 0502 | 000D | 1A00 | 0F00 | 1805 | 050C | C000 | 0700 |
| 0000167120 | 5F42 | 4678 | 6C69 | 0F65 | 1C05 | 050C | C000 | 0700 |
| 0000167140 | 5F42 | 5078 | 6361 | 146B | 0005 | 0000 | 8100 | 0C00 |
| 0000167160 | 7842 | 445F | 6265 | 6775 | 6F4D | 6564 | 0514 | 0000 |
| 0000167200 | 0000 | 0081 | 420C | 5F78 | 6954 | 656D | 4D73 | 646F |
| 0000167220 | 0E65 | CC05 | 0515 | 6D00 | 0605 | 6F66 | 6D72 | 735F |
| 0000167240 | 0510 | 15C4 | 0005 | 0576 | 6608 | 726F | 5F6D | 5F70 |
| 0000167260 | 0E73 | C805 | 0515 | C000 | 0600 | 7768 | 646E | 735F |
| 0000167300 | 050F | 0C20 | 0005 | 0085 | 6507 | 7078 | 665F | 735F |
| 0000167320 | 050F | 0C22 | 0005 | 0085 | 6107 | 7463 | 665F | 735F |
| 0000167340 | 050F | 0C24 | 0005 | 0085 | 6407 | 6669 | 665F | 735F |
| 0000167360 | 7207 | 725F | 7665 | 632E | 0001 | 000E | 003E | 0000 |
| 0000167400 | 003F | 0016 | 0045 | 00B3 | 0049 | 00B9 | 004B | 011C |
| 0000167420 | 004E | 0126 | 004F | 0140 | 0051 | 0152 | 0053 | 015C |
| 0000167440 | 0056 | 0167 | 0058 | 017C | 0059 | 0186 | 005C | 0197 |
| 0000167460 | 005D | 0220 | 7208 | 5F72 | 6572 | 2E76 | 0163 | 2E00 |
| 0000167500 | 7101 | 2E00 | 7402 | 3E00 | 7602 | 4800 | 7702 | 4D00 |
| 0000167520 | 7802 | 6400 | 7A02 | 7600 | 7B02 | 7B00 | 7C02 | 9200 |
| 0000167540 | 7E02 | A400 | 7F02 | AC00 | 8002 | B600 | 8202 | C000 |
| 0000167560 | 8302 | D000 | 8402 | E000 | 8502 | EA00 | 8602 | F400 |
| 0000167600 | 8702 | FF00 | 8802 | 0500 | 8903 | 0B00 | 8B03 | 1C00 |
| 0000167620 | 8E03 | 2600 | 8F03 | 3D00 | 9003 | 5400 | 9103 | 6B00 |
| 0000167640 | 9203 | 8200 | 9303 | 9900 | 9403 | B000 | 9503 | C700 |
| 0000167660 | 9603 | D100 | 9803 | DB00 | 9903 | E300 | 9B03 | EB00 |
| 0000167700 | 9C03 | EE00 | B103 | F900 | B203 | 0900 | C204 | A900 |
| 0000167720 | C604 | AF00 | C804 | 0A00 | CB05 | 1000 | CD05 | 1E00 |
| 0000167740 | CE05 | 3C00 | D105 | 5500 | D305 | 6700 | D405 | 7500 |
| 0000167760 | D605 | 7B00 | D705 | 7E00 | D805 | 9A00 | DF05 | A000 |
| 0000170000 | E105 | AA00 | E305 | B100 | E905 | C100 | EB05 | 2700 |
| 0000170020 | EE06 | 7F00 | EF06 | 9A00 | F006 | B900 | F106 | C400 |
| 0000170040 | F206 | D100 | F306 | D700 | F506 | DD00 | F706 | E300 |
| 0000170060 | F906 | F600 | FA06 | 0B00 | FD07 | 1B00 | FF07 | 2900 |
| 0000170100 | 0107 | 4601 | 0407 | 4901 | 0607 | 7101 | 0807 | 7B01 |
| 0000170120 | 0A07 | 9001 | 0B07 | 9A01 | 0D07 | B101 | 0E07 | BB01 |
| 0000170140 | 1007 | DB01 | 1207 | E501 | 1307 | EF01 | 1507 | 0501 |
| 0000170160 | 1608 | 0801 | 1808 | 1E01 | 1908 | 2E01 | 1A08 | 3E01 |
| 0000170200 | 1B08 | 4601 | 1C08 | 4E01 | 1D08 | 5401 | 1E08 | 5A01 |
| 0000170220 | 2208 | 6001 | 2508 | 7D01 | 2708 | AB01 | 2908 | 0B01 |
| 0000170240 | 2C09 | 1501 | 2D09 | 2E01 | 3009 | 4401 | 3709 | 4E01 |
| 0000170260 | 3909 | 7E01 | 3A09 | 8A01 | 3C09 | 9001 | 4109 | 9301 |

THU MAR 14 17:45:10 1991 RV.DLL PAGE 51, LINE 2951

| | | | | | | | | |
|---|---|---|---|---|---|---|---|---|
| 0000170300 | 4309 | B701 | 4409 | C301 | 4609 | C901 | 4809 | 2901 |
| 0000170320 | 4B0A | 3D01 | 4D0A | 5301 | 4E0A | 5D01 | 510A | 6301 |
| 0000170340 | 520A | 7001 | 550A | 8701 | 570A | 9101 | 590A | 9F01 |
| 0000170360 | 5A0A | B301 | 5C0A | B901 | 5D0A | BC01 | 5E0A | D001 |
| 0000170400 | 600A | D601 | 630A | E001 | 650A | FA01 | 670A | 2001 |
| 0000170420 | 680B | 2A01 | 6C0B | 3001 | 6D0B | 3A01 | 710B | 4001 |
| 0000170440 | 730B | 4A01 | 790B | 4D01 | 7B0B | 6401 | 800B | 6701 |
| 0000170460 | 850B | 7401 | 860B | 8201 | 880B | 9801 | 8A0B | 9B01 |
| 0000170500 | 8D0B | C201 | 8F0B | EB01 | 910B | F501 | 920B | 0801 |
| 0000170520 | 940C | 0E01 | 960C | 1101 | 970C | 2701 | 990C | 2D01 |
| 0000170540 | 9B0C | 3001 | 9E0C | 4401 | AC0C | 4701 | AD0C | 4D01 |
| 0000170560 | AF0C | 5301 | B30C | 5601 | B40C | 6401 | B60C | 6A01 |
| 0000170600 | B80C | 6D01 | B90C | 9401 | BB0C | A101 | BE0C | A401 |
| 0000170620 | C00C | CD01 | C50C | D001 | C60C | F701 | C80C | 0401 |
| 0000170640 | CB0D | 0701 | CD0D | 3001 | D10D | 3A01 | D30D | 5801 |
| 0000170660 | D50D | 7601 | D70D | 9001 | D90D | 9A01 | DC0D | B301 |
| 0000170700 | DE0D | CB01 | DF0D | D701 | E20D | 3301 | E30E | 4B01 |
| 0000170720 | E50E | 5101 | E70E | 5E01 | EB0E | 6101 | EC0E | 6B01 |
| 0000170740 | EE0E | 8201 | EF0E | 9A01 | F10E | A001 | F40E | AD01 |
| 0000170760 | F50E | C001 | F70E | D501 | F80E | E801 | FA0E | FD01 |
| 0000171000 | FC0E | 0701 | FD0F | 1101 | FF0F | 1F01 | 010F | 3302 |
| 0000171020 | 020F | 4D02 | 060F | 5D02 | 070F | 6902 | 080F | 7902 |
| 0000171040 | 090F | 8502 | 0D0F | 9502 | 0F0F | AA02 | 100F | B402 |
| 0000171060 | 120F | C502 | 160F | C802 | 180F | CE02 | 190F | D102 |
| 0000171100 | 1B0F | F902 | 1D0F | 1E02 | 2210 | 8602 | 2310 | CE02 |
| 0000171120 | 2E10 | D402 | 3110 | 3D02 | 3711 | 6002 | 3911 | AB02 |
| 0000171140 | 3A11 | AE02 | 3B11 | B802 | 3D11 | D402 | 3F11 | DE02 |
| 0000171160 | 4111 | 0202 | 4212 | 2502 | 4312 | 4902 | 4512 | 5602 |
| 0000171200 | 4612 | 5F02 | 4812 | 6602 | 4912 | 7002 | 4B12 | 7C02 |
| 0000171220 | 4C12 | 0802 | 6C13 | 1302 | 6D13 | 2302 | 7B13 | BC02 |
| 0000171240 | 8013 | C102 | 8313 | 2102 | 8514 | 2A02 | 8614 | 4502 |
| 0000171260 | 8714 | 5902 | 8814 | 6D02 | 8A14 | 8502 | 8B14 | 9B02 |
| 0000171300 | 8D14 | AB02 | 9014 | C102 | 9314 | DF02 | 9614 | F502 |
| 0000171320 | 9714 | 3702 | 9915 | 4C02 | 9B15 | 5502 | 9D15 | 7902 |
| 0000171340 | 9F15 | 7C02 | A115 | 9D02 | A215 | A002 | A415 | B802 |
| 0000171360 | A715 | C602 | A915 | F702 | AB15 | 0C02 | AD16 | 1502 |
| 0000171400 | AE16 | 3102 | B016 | 3702 | B116 | 3A02 | B416 | 3F02 |
| 0000171420 | BB16 | 4802 | BF16 | 7F02 | C016 | B202 | C216 | BD02 |
| 0000171440 | C416 | C702 | C616 | DF02 | C816 | F602 | C916 | 0102 |
| 0000171460 | CB17 | 5B02 | CD17 | 6802 | D017 | 7502 | D217 | 7E02 |
| 0000171500 | D417 | 8802 | D617 | 9F02 | D817 | B602 | D917 | C102 |
| 0000171520 | DC17 | 1B02 | DE18 | 2802 | E118 | 3502 | E218 | BC02 |
| 0000171540 | F918 | C702 | FA18 | D702 | 0618 | 7003 | 0B19 | 7503 |
| 0000171560 | 0D19 | CF03 | 0E19 | EA03 | 0F19 | F003 | 1119 | 0403 |
| 0000171600 | 121A | 1A03 | 141A | 2A03 | 171A | 4003 | 1A1A | 5E03 |
| 0000171620 | 1D1A | 7403 | 1E1A | B603 | 201A | CB03 | 221A | D403 |
| 0000171640 | 241A | F803 | 261A | FB03 | 281A | 1C03 | 291B | 1F03 |
| 0000171660 | 2B1B | 3703 | 2E1B | 4503 | 301B | 7603 | 321B | 8B03 |
| 0000171700 | 341B | 9403 | 351B | B003 | 371B | B603 | 381B | B903 |
| 0000171720 | 3B1B | BE03 | 3D1B | C703 | 3F1B | D103 | 411B | E903 |
| 0000171740 | 431B | 0003 | 441C | 0B03 | 461C | 6503 | 481C | 7203 |
| 0000171760 | 4B1C | 7F03 | 4C1C | 0603 | 091D | 7272 | 6D5F | 7369 |
| 0000172000 | 2E63 | 0163 | 2700 | 5201 | 1200 | 531D | 2200 | 571D |
| 0000172020 | B400 | 5C1D | B900 | 601D | C500 | 621D | E000 | 631D |
| 0000172040 | E900 | 651D | EE00 | 661D | F100 | 671D | FC00 | 691D |
| 0000172060 | 0C00 | 6A1E | 8900 | 7E1E | 9400 | 7F1E | A400 | 831E |
| 0000172100 | 3600 | 871F | 3B00 | 881F | 5200 | 8A1F | 5700 | 8C1F |
| 0000172120 | 5A00 | 8F1F | 6200 | 911F | 8800 | 921F | 9E00 | 941F |
| 0000172140 | A300 | 961F | AE00 | 971F | 2C00 | AF20 | 3700 | B020 |

THU MAR 14 17:45:10 1991 RV.DLL PAGE 52, LINE 3010

| | | | | | | | | |
|---|---|---|---|---|---|---|---|---|
| 0000172160 | 4700 | BD20 | E000 | C120 | E500 | C320 | EF00 | C520 |
| 0000172200 | 0D00 | C621 | 1600 | C821 | 2C00 | CA21 | 3500 | CC21 |
| 0000172220 | 4A00 | CD21 | 5500 | CF21 | 5A00 | D121 | 5D00 | D221 |
| 0000172240 | 6600 | D421 | 7A00 | D721 | 7D00 | D921 | 9100 | DB21 |
| 0000172260 | 9B00 | DC21 | A900 | DF21 | BD00 | E221 | C000 | E521 |
| 0000172300 | D400 | E721 | FD00 | E821 | 0800 | EC22 | 1B00 | F222 |
| 0000172320 | 3E00 | F422 | 6800 | F722 | 7100 | F922 | 9900 | FB22 |
| 0000172340 | BA00 | FD22 | CC00 | FF22 | D900 | 0122 | 0401 | 0323 |
| 0000172360 | 0701 | 0523 | 2201 | 0723 | 4501 | 0923 | 6401 | 0B23 |
| 0000172400 | 6701 | 0F23 | 7101 | 1123 | 9301 | 1323 | 9D01 | 1523 |
| 0000172420 | BE01 | 1623 | C101 | 1823 | CF01 | 1923 | DC01 | 1C23 |
| 0000172440 | F301 | 2123 | FC01 | 2323 | 3701 | 2524 | 3A01 | 2824 |
| 0000172460 | 9601 | 2A24 | B101 | 2B24 | B401 | 2C24 | C001 | 2E24 |
| 0000172500 | CF01 | 3024 | D701 | 3124 | E401 | 3324 | FB01 | 3524 |
| 0000172520 | 0401 | 3625 | 1401 | 3725 | 1E01 | 3925 | 7901 | 3A25 |
| 0000172540 | 0001 | 5326 | 0B01 | 5426 | 1B01 | 5F26 | AE01 | 6526 |
| 0000172560 | B301 | 6726 | D101 | 6A26 | DA01 | 6B26 | DF01 | 6D26 |
| 0000172600 | F501 | 6F26 | 1701 | 7127 | 1A01 | 7327 | 3101 | 7427 |
| 0000172620 | 3C01 | 7627 | 4101 | 7827 | 4401 | 7927 | 4C01 | 7A27 |
| 0000172640 | 5101 | 7C27 | 5601 | 8027 | 6C01 | 8227 | 8E01 | 8427 |
| 0000172660 | 9101 | 8927 | B601 | 8B27 | F401 | 8D27 | 1C01 | 8F28 |
| 0000172700 | 1F01 | 9228 | 4B01 | 9328 | 6501 | 9828 | 7901 | 9A28 |
| 0000172720 | A101 | 9C28 | B401 | 9E28 | B701 | A028 | D701 | A228 |
| 0000172740 | FB01 | A428 | 1501 | A629 | 3901 | AB29 | 3C01 | AF29 |
| 0000172760 | 8001 | B129 | 9D01 | B229 | A601 | B429 | AE01 | B529 |
| 0000173000 | B101 | BB29 | BD01 | BE29 | EC01 | BF29 | FB01 | C129 |
| 0000173020 | 0A01 | C32A | 1201 | C42A | 1D01 | C62A | 2801 | C82A |
| 0000173040 | 3101 | C92A | 4101 | CA2A | 4A01 | CC2A | A101 | CD2A |
| 0000173060 | 1F01 | E42B | 2A01 | E52B | 3A01 | F02B | CD01 | F62B |
| 0000173100 | D201 | F82B | F001 | FB2B | F901 | FC2B | FE01 | FE2B |
| 0000173120 | 1401 | 002C | 3602 | 022C | 3902 | 042C | 5002 | 052C |
| 0000173140 | 5B02 | 072C | 6002 | 092C | 6302 | 0A2C | 6B02 | 0C2C |
| 0000173160 | 7002 | 112C | 8602 | 132C | A802 | 142C | AB02 | 162C |
| 0000173200 | BA02 | 1B2C | DF02 | 1D2C | 1D02 | 1F2D | 4502 | 212D |
| 0000173220 | 4802 | 242D | 7402 | 282D | 8E02 | 2C2D | D202 | 2E2D |
| 0000173240 | EF02 | 2F2D | F802 | 312D | 0002 | 322E | 0302 | 382E |
| 0000173260 | 0F02 | 3A2E | 3E02 | 3C2E | 5202 | 3D2E | 5502 | 3E2E |
| 0000173300 | 6102 | 402E | 7002 | 422E | 7802 | 432E | 8302 | 452E |
| 0000173320 | 8E02 | 472E | 9702 | 482E | A702 | 492E | B002 | 4B2E |
| 0000173340 | 0702 | 4C2F | 8502 | 5A2F | 9002 | 622F | A002 | 642F |
| 0000173360 | B702 | 652F | C302 | 662F | D202 | 672F | DA02 | 6D2F |
| 0000173400 | F002 | 6F2F | 1302 | 7030 | 1D02 | 7230 | 5F02 | 7330 |
| 0000173420 | 6202 | 7430 | 6802 | 8D30 | 7302 | 9330 | 8302 | 9730 |
| 0000173440 | 8802 | 9930 | 9202 | 9A30 | 9B02 | 9C30 | B302 | 9D30 |
| 0000173460 | B602 | 9F30 | CA02 | A130 | DE02 | A230 | F202 | A430 |
| 0000173500 | 0802 | A631 | 1102 | A731 | 1C02 | A931 | 3202 | AA31 |
| 0000173520 | 3D02 | AC31 | 4F02 | AD31 | 5A02 | AF31 | 6302 | B031 |
| 0000173540 | 7002 | B231 | 8702 | B331 | 8D02 | C131 | 9802 | C231 |
| 0000173560 | A802 | C631 | 3B02 | CA32 | 4002 | CB32 | 4C02 | CD32 |
| 0000173600 | 5102 | CF32 | 5402 | D232 | 5902 | D332 | 8702 | D532 |
| 0000173620 | 8D02 | D632 | 9802 | D832 | 9D02 | D932 | A602 | DB32 |
| 0000173640 | AF02 | DC32 | 2D02 | EB33 | 3802 | EC33 | 4802 | F233 |
| 0000173660 | DB02 | F633 | E002 | F733 | F402 | F933 | F902 | FC33 |
| 0000173700 | FC02 | FE33 | 0102 | 0334 | 1703 | 0534 | 7103 | 0734 |
| 0000173720 | 7403 | 0834 | 7F03 | 0A34 | 8503 | 0C34 | 8803 | 0E34 |
| 0000173740 | 9103 | 0F34 | 9C03 | 1034 | A503 | 1134 | B003 | 1434 |
| 0000173760 | B903 | 1534 | 3703 | 2635 | 4203 | 2735 | 5203 | 2F35 |
| 0000174000 | E503 | 3335 | EA03 | 3435 | FE03 | 3635 | 0303 | 3936 |
| 0000174020 | 0603 | 3B36 | 0B03 | 3E36 | 2103 | 4036 | 4B03 | 4236 |

THU MAR 14 17:45:10 1991 RV.DLL PAGE 53, LINE 3069

| | | | | | | | | |
|---|---|---|---|---|---|---|---|---|
| 0000174040 | 4E03 | 4336 | 5903 | 4536 | 5F03 | 4836 | 6203 | 4B36 |
| 0000174060 | 6803 | 4C36 | 9E03 | 4E36 | A403 | 5036 | AE03 | 5236 |
| 0000174100 | B403 | 5636 | BB03 | 5836 | F003 | 5936 | F303 | 5A36 |
| 0000174120 | F603 | 5C36 | F903 | 5E36 | 0203 | 5F37 | 0D03 | 6037 |
| 0000174140 | 1603 | 6137 | 2103 | 6237 | 2A03 | 6337 | 3503 | 6437 |
| 0000174160 | 3E03 | 6537 | 4903 | 6837 | 5203 | 6937 | D003 | 7437 |
| 0000174200 | DB03 | 7537 | EB03 | 7837 | 7E03 | 7A38 | 8303 | 7D38 |
| 0000174220 | 8803 | 8038 | DF03 | 8238 | EA03 | 8438 | FB03 | 8538 |
| 0000174240 | 7903 | 0739 | 7272 | 755F | 2E69 | 0163 | 8800 | 4E00 |
| 0000174260 | 8400 | 4F39 | 9400 | 5439 | 2600 | 583A | 2B00 | 5A3A |
| 0000174300 | 3800 | 5B3A | 4100 | 5D3A | 4E00 | 5F3A | 5700 | 603A |
| 0000174320 | 6100 | 613A | 7A00 | 643A | 8300 | 663A | A900 | 673A |
| 0000174340 | B500 | 6A3A | BA00 | 6B3A | 3700 | 803B | 4200 | 853B |
| 0000174360 | 5800 | 873B | 5D00 | 8C3B | 6300 | 8E3B | 7D00 | 903B |
| 0000174400 | 9700 | 923B | B000 | 943B | B500 | 963B | C200 | 983B |
| 0000174420 | D200 | 9A3B | E500 | A03B | EE00 | A23B | 1100 | A63C |
| 0000174440 | 1A00 | AC3C | 2000 | AE3C | 3C00 | B03C | 4100 | B43C |
| 0000174460 | 4400 | B63C | 4F00 | B73C | 5D00 | B83C | 6B00 | BA3C |
| 0000174500 | 7F00 | BC3C | 8400 | C03C | 8700 | C23C | 9200 | C33C |
| 0000174520 | A000 | C43C | AE00 | C63C | C200 | C83C | C700 | CC3C |
| 0000174540 | CA00 | CE3C | D500 | CF3C | E300 | D03C | F100 | D23C |
| 0000174560 | 0500 | D43D | 0A00 | D53D | 0D00 | D63D | 3500 | D83D |
| 0000174600 | 3E00 | D93D | 4E00 | DB3D | 6100 | DD3D | 6A00 | E13D |
| 0000174620 | 6D00 | E43D | 7300 | E63D | 7800 | EA3D | 7B00 | EC3D |
| 0000174640 | 8000 | F03D | 8300 | F23D | 8800 | F53D | 8B00 | F73D |
| 0000174660 | 9000 | FA3D | 9300 | FC3D | 9800 | FF3D | 9B00 | 013D |
| 0000174700 | A001 | 043D | A301 | 053D | A801 | 063D | BB01 | 073D |
| 0000174720 | C801 | 093D | CF01 | 0D3D | D801 | 0E3D | DB01 | 103D |
| 0000174740 | 1B01 | 113E | 2B01 | 133E | 3E01 | 163E | 4701 | 173E |
| 0000174760 | 4A01 | 183E | 6F01 | 193E | 8C01 | 2F3E | 9A01 | 303E |
| 0000175000 | AA01 | 343E | 3D01 | 363F | 5501 | 383F | 7001 | 3A3F |
| 0000175020 | 8B01 | 3C3F | A601 | 3E3F | C101 | 403F | DC01 | 433F |
| 0000175040 | F701 | 453F | 2901 | 4740 | 5B01 | 4A40 | 8D01 | 4C40 |
| 0000175060 | B001 | 4E40 | D801 | 4F40 | 3B01 | 6241 | 4601 | 6341 |
| 0000175100 | 5601 | 6741 | E901 | 6A41 | 0201 | 6B42 | 1D01 | 6C42 |
| 0000175120 | 8001 | 8142 | 8B01 | 8442 | 9B01 | 8542 | A101 | 8642 |
| 0000175140 | A701 | 8842 | AD01 | 8942 | C701 | 8A42 | E101 | 8C42 |
| 0000175160 | FB01 | 8D42 | FE01 | A342 | 0901 | A843 | 1901 | AA43 |
| 0000175200 | 3701 | AC43 | 5501 | AE43 | 7301 | AF43 | 7601 | C343 |
| 0000175220 | 8101 | C743 | 9101 | CA43 | 9A01 | CC43 | B501 | CE43 |
| 0000175240 | D001 | D043 | EA01 | D143 | ED01 | DC43 | F801 | E143 |
| 0000175260 | 0801 | E444 | 2601 | E744 | 4401 | E944 | 6101 | EA44 |
| 0000175300 | 6401 | FE44 | 6F01 | 0044 | 7F02 | 0144 | 8902 | 0044 |
| 0000175320 | 6C0C | 696C | 6362 | 6C64 | 2E6C | 696C | 0762 | 736F |
| 0000175340 | 2E32 | 696C | 0A62 | 626C | 7069 | 746D | 6C2E | 6269 |
| 0000175360 | 6409 | 5F62 | 6970 | 6C2E | 6269 | 7506 | 2E69 | 696C |
| 0000175400 | 0662 | 6869 | 6C2E | 6269 | 630A | 7672 | 695F | 2E66 |
| 0000175420 | 696C | 0662 | 7270 | 6C2E | 6269 | 0073 | 0101 | 0001 |
| 0000175440 | 0008 | 0000 | 0027 | 0102 | 0001 | 04FB | 0000 | 0018 |
| 0000175460 | 0103 | 0001 | 0FA0 | 0000 | 0B86 | 0104 | 0001 | 57F7 |
| 0000175500 | 0000 | 014F | 0109 | 0001 | 6F63 | 0000 | 0044 | 0101 |
| 0000175520 | 0002 | 002F | 0000 | 0028 | 0102 | 0002 | 0513 | 0000 |
| 0000175540 | 0046 | 0103 | 0002 | 1B26 | 0000 | 16A8 | 0104 | 0002 |
| 0000175560 | 5946 | 0000 | 0603 | 0109 | 0002 | 6FA7 | 0000 | 04C5 |
| 0000175600 | 0101 | 0003 | 0057 | 0000 | 0029 | 0102 | 0003 | 0559 |
| 0000175620 | 0000 | 00EA | 0103 | 0003 | 31CE | 0000 | 156E | 0104 |
| 0000175640 | 0003 | 5F49 | 0000 | 0BFC | 0109 | 0003 | 746C | 0000 |
| 0000175660 | 04AA | 0101 | 0004 | 0080 | 0000 | 0027 | 0102 | 0004 |
| 0000175700 | 0643 | 0000 | 00E8 | 0103 | 0004 | 473C | 0000 | 10BB |

THU MAR 14 17:45:10 1991 RV.DLL PAGE 54, LINE 3128

| | | | | | | | | |
|---|---|---|---|---|---|---|---|---|
| 0000175720 | 0104 | 0004 | 6B45 | 0000 | 041E | 0109 | 0004 | 7916 |
| 0000175740 | 0000 | 022C | 0101 | 0005 | 00A7 | 0000 | 0018 | 0102 |
| 0000175760 | 0005 | 072B | 0000 | 0152 | 0101 | 0006 | 00BF | 0000 |
| 0000176000 | 001B | 0102 | 0006 | 087D | 0000 | 01D2 | 0101 | 0007 |
| 0000176020 | 00DA | 0000 | 001C | 0102 | 0007 | 0A4F | 0000 | 0035 |
| 0000176040 | 0101 | 0008 | 00F6 | 0000 | 0017 | 0102 | 0008 | 0A84 |
| 0000176060 | 0000 | 000F | 0101 | 0009 | 010D | 0000 | 0017 | 0102 |
| 0000176100 | 0009 | 0A93 | 0000 | 0033 | 0101 | 000A | 0124 | 0000 |
| 0000176120 | 001A | 0102 | 000A | 0AC6 | 0000 | 0010 | 0101 | 000B |
| 0000176140 | 013E | 0000 | 001C | 0102 | 000B | 0AD6 | 0000 | 0025 |
| 0000176160 | 0101 | 000C | 015A | 0000 | 001B | 0102 | 000C | 0AFB |
| 0000176200 | 0000 | 003F | 0101 | 000D | 0175 | 0000 | 0018 | 0102 |
| 0000176220 | 000D | 0B3A | 0000 | 000F | 0101 | 000E | 018D | 0000 |
| 0000176240 | 0014 | 0102 | 000E | 0B49 | 0000 | 0037 | 0101 | 000F |
| 0000176260 | 01A1 | 0000 | 0018 | 0102 | 000F | 0B80 | 0000 | 000F |
| 0000176300 | 0101 | 0010 | 01B9 | 0000 | 0018 | 0102 | 0010 | 0B8F |
| 0000176320 | 0000 | 000F | 0101 | 0011 | 01D1 | 0000 | 0018 | 0102 |
| 0000176340 | 0011 | 0B9E | 0000 | 000F | 0101 | 0012 | 01E9 | 0000 |
| 0000176360 | 0015 | 0102 | 0012 | 0BAD | 0000 | 0030 | 0101 | 0013 |
| 0000176400 | 01FE | 0000 | 0014 | 0102 | 0013 | 0BDD | 0000 | 000E |
| 0000176420 | 0101 | 0014 | 0212 | 0000 | 0017 | 0102 | 0014 | 0BEB |
| 0000176440 | 0000 | 000F | 0101 | 0015 | 0229 | 0000 | 0015 | 0102 |
| 0000176460 | 0015 | 0BFA | 0000 | 0020 | 0101 | 0016 | 023E | 0000 |
| 0000176500 | 001A | 0102 | 0016 | 0C1A | 0000 | 001E | 0101 | 0017 |
| 0000176520 | 0258 | 0000 | 0019 | 0102 | 0017 | 0C38 | 0000 | 000C |
| 0000176540 | 0101 | 0018 | 0271 | 0000 | 0016 | 0102 | 0018 | 0C44 |
| 0000176560 | 0000 | 001E | 0101 | 0019 | 0287 | 0000 | 0017 | 0102 |
| 0000176600 | 0019 | 0C62 | 0000 | 001F | 0101 | 001A | 029E | 0000 |
| 0000176620 | 0015 | 0102 | 001A | 0C81 | 0000 | 001B | 0101 | 001B |
| 0000176640 | 02B3 | 0000 | 0018 | 0102 | 001B | 0C9C | 0000 | 0042 |
| 0000176660 | 0101 | 001C | 02CB | 0000 | 0016 | 0102 | 001C | 0CDE |
| 0000176700 | 0000 | 000E | 0101 | 001D | 02E1 | 0000 | 0018 | 0102 |
| 0000176720 | 001D | 0CEC | 0000 | 0010 | 0101 | 001E | 02F9 | 0000 |
| 0000176740 | 0018 | 0102 | 001E | 0CFC | 0000 | 0010 | 0101 | 001F |
| 0000176760 | 0311 | 0000 | 0019 | 0102 | 001F | 0D0C | 0000 | 0012 |
| 0000177000 | 0101 | 0020 | 032A | 0000 | 0018 | 0102 | 0020 | 0D1E |
| 0000177020 | 0000 | 0041 | 0101 | 0021 | 0342 | 0000 | 0017 | 0102 |
| 0000177040 | 0021 | 0D5F | 0000 | 000F | 0101 | 0022 | 0359 | 0000 |
| 0000177060 | 0017 | 0102 | 0022 | 0D6E | 0000 | 000E | 0101 | 0023 |
| 0000177100 | 0370 | 0000 | 0017 | 0102 | 0023 | 0D7C | 0000 | 000E |
| 0000177120 | 0101 | 0024 | 0387 | 0000 | 0017 | 0102 | 0024 | 0D8A |
| 0000177140 | 0000 | 000E | 0101 | 0025 | 039E | 0000 | 0018 | 0102 |
| 0000177160 | 0025 | 0D98 | 0000 | 000F | 0101 | 0026 | 03B6 | 0000 |
| 0000177200 | 0019 | 0102 | 0026 | 0DA7 | 0000 | 0056 | 0101 | 0027 |
| 0000177220 | 03CF | 0000 | 0016 | 0102 | 0027 | 0DFD | 0000 | 001D |
| 0000177240 | 0101 | 0029 | 03E5 | 0000 | 001A | 0102 | 0029 | 0E1A |
| 0000177260 | 0000 | 00AB | 0101 | 002A | 03FF | 0000 | 001D | 0102 |
| 0000177300 | 002A | 0EC5 | 0000 | 0024 | 0101 | 002B | 041C | 0000 |
| 0000177320 | 0016 | 0102 | 002B | 0EE9 | 0000 | 000F | 0101 | 002C |
| 0000177340 | 0432 | 0000 | 0015 | 0102 | 002C | 0EF8 | 0000 | 000E |
| 0000177360 | 0101 | 002D | 0447 | 0000 | 0017 | 0102 | 002D | 0F06 |
| 0000177400 | 0000 | 000E | 0101 | 002E | 045E | 0000 | 0017 | 0102 |
| 0000177420 | 002E | 0F14 | 0000 | 000E | 0101 | 002F | 0475 | 0000 |
| 0000177440 | 0018 | 0102 | 002F | 0F22 | 0000 | 000E | 0101 | 0030 |
| 0000177460 | 048D | 0000 | 0018 | 0102 | 0030 | 0F30 | 0000 | 000E |
| 0000177500 | 0101 | 0031 | 04A5 | 0000 | 0016 | 0102 | 0031 | 0F3E |
| 0000177520 | 0000 | 0023 | 0101 | 0032 | 04BB | 0000 | 0016 | 0102 |
| 0000177540 | 0032 | 0F61 | 0000 | 0011 | 0101 | 0033 | 04D1 | 0000 |
| 0000177560 | 0015 | 0102 | 0033 | 0F72 | 0000 | 001F | 0101 | 0034 |

```
THU MAR 14 17:45:10 1991  RV.DLL  PAGE 55, LINE 3187

0000177600  04E6  0000  0015  0102  0034  0F91  0000  000F
0000177620  0106  0000  7B42  0000  004B  424E  3230  8015
0000177640  0000
0000177642
```

THU MAR 14 17:45:28 1991 SCITEX.KBD PAGE 1, LINE 1

```
0000000000  0A0D  0923  654B  6279  616F  6472  6420  6665
0000000020  6E69  7469  6F69  206E  6F66  2072  6353  7469
0000000040  7865  5020  6972  6D73  2061  7973  7473  6D65
0000000060  0A0D  0A0D  7830  3546  5320  6968  7466  5309
0000000100  4948  5446  3009  5309  6968  7466  3009  0A0D
0000000120  7830  3646  4320  7274  096C  4553  0951  3009
0000000140  5309  435F  7274  096C  0D30  0D0A  230A  4D20
0000000160  6961  206E  656B  7079  6461  202C  696C  656E
0000000200  6220  2079  696C  656E  0A0D  0A0D  7830  4333
0000000220  6020  0909  4F4E  4D52  4C41  3009  7E09  0909
0000000240  0D30  300A  3278  2043  0931  4E09  524F  414D
0000000260  094C  0930  0921  3009  0A0D  7830  3135  3220
0000000300  0909  4F4E  4D52  4C41  3009  4009  0909  0D30
0000000320  300A  3478  2034  0933  4E09  524F  414D  094C
0000000340  0930  0923  3009  0A0D  7830  3534  3420  0909
0000000360  4F4E  4D52  4C41  3009  2409  0909  0D30  300A
0000000400  3478  2036  0935  4E09  524F  414D  094C  0930
0000000420  0925  3009  0A0D  7830  3734  3620  0909  4F4E
0000000440  4D52  4C41  3009  5E09  0909  0D30  300A  3478
0000000460  2030  0937  4E09  524F  414D  094C  0930  0926
0000000500  3009  0A0D  7830  3031  3820  0909  4F4E  4D52
0000000520  4C41  3009  2A09  0909  0D30  300A  3178  2037
0000000540  0939  4E09  524F  414D  094C  0930  0928  3009
0000000560  0A0D  7830  3631  3020  0909  4F4E  4D52  4C41
0000000600  3009  2909  0909  0D30  300A  3178  2035  092D
0000000620  4E09  524F  414D  094C  0930  095F  3009  0A0D
0000000640  7830  3431  3D20  0909  4F4E  4D52  4C41  3009
0000000660  2B09  0909  0D30  300A  3178  2033  5342  0909
0000000700  4F4E  4D52  4C41  3009  4209  0953  3009  0A0D
0000000720  0A0D  7830  3934  5420  6261  4E09  524F  414D
0000000740  094C  0930  6142  6B63  6154  0962  0D30  300A
0000000760  3478  2041  0971  4E09  524F  414D  094C  0930
0000001000  0951  3109  0A0D  7830  4234  7720  0909  4F4E
0000001020  4D52  4C41  3009  5709  0909  0D31  300A  3478
0000001040  2043  0965  4E09  524F  414D  094C  0930  0945
0000001060  3109  0A0D  7830  4434  7220  0909  4F4E  4D52
0000001100  4C41  3009  5209  0909  0D31  300A  3478  2045
0000001120  0974  4E09  524F  414D  094C  0930  0954  3109
0000001140  0A0D  7830  4634  7920  0909  4F4E  4D52  4C41
0000001160  3009  5909  0909  0D31  300A  3478  2038  0975
0000001200  4E09  524F  414D  094C  0930  0955  3109  0A0D
0000001220  7830  3831  6920  0909  4F4E  4D52  4C41  3009
0000001240  4909  0909  0D31  300A  3178  2046  096F  4E09
0000001260  524F  414D  094C  0930  094F  3109  0A0D  7830
0000001300  4531  7020  0909  4F4E  4D52  4C41  3009  5009
0000001320  0909  0D31  300A  3178  2044  095B  4E09  524F
0000001340  414D  094C  0930  097B  3009  0A0D  7830  4331
0000001360  5D20  0909  4F4E  4D52  4C41  3009  7D09  0909
0000001400  0D30  300A  3178  2042  095C  4E09  524F  414D
0000001420  094C  0930  097C  3009  0A0D  0A0D  7830  3335
0000001440  6120  0909  4F4E  4D52  4C41  3009  4109  0909
0000001460  0D31  300A  3578  2034  0973  4E09  524F  414D
0000001500  094C  0930  0953  3109  0A0D  7830  3535  6420
0000001520  0909  4F4E  4D52  4C41  3009  4409  0909  0D31
0000001540  300A  3578  2036  0966  4E09  524F  414D  094C
0000001560  0930  0946  3109  0A0D  7830  3933  6720  0909
0000001600  4F4E  4D52  4C41  3009  4709  0909  0D31  300A
0000001620  3578  2030  0968  4E09  524F  414D  094C  0930
0000001640  0948  3109  0A0D  7830  3032  6A20  0909  4F4E
```

THU MAR 14 17:45:28 1991 SCITEX.KBD PAGE 2, LINE 60

| | | | | | | | | |
|---|---|---|---|---|---|---|---|---|
| 0000001660 | 4D52 | 4C41 | 3009 | 4A09 | 0909 | 0D31 | 300A | 3278 |
| 0000001700 | 2037 | 096B | 4E09 | 524F | 414D | 094C | 0930 | 094B |
| 0000001720 | 3109 | 0A0D | 7830 | 3632 | 6C20 | 0909 | 4F4E | 4D52 |
| 0000001740 | 4C41 | 3009 | 4C09 | 0909 | 0D31 | 300A | 3278 | 2035 |
| 0000001760 | 093B | 4E09 | 524F | 414D | 094C | 0930 | 093A | 3009 |
| 0000002000 | 0A0D | 7830 | 3432 | 2720 | 0909 | 4F4E | 4D52 | 4C41 |
| 0000002020 | 3009 | 2209 | 0909 | 0D30 | 300A | 3278 | 2033 | 5243 |
| 0000002040 | 0909 | 4F4E | 4D52 | 4C41 | 3109 | 5309 | 435F | 0952 |
| 0000002060 | 0D30 | 0D0A | 300A | 3778 | 2031 | 7345 | 0963 | 4F4E |
| 0000002100 | 4D52 | 4C41 | 3009 | 4409 | 6C65 | 0909 | 0D30 | 300A |
| 0000002120 | 3778 | 2033 | 097A | 4E09 | 524F | 414D | 094C | 0930 |
| 0000002140 | 095A | 3109 | 0A0D | 7830 | 3437 | 7820 | 0909 | 4F4E |
| 0000002160 | 4D52 | 4C41 | 3009 | 5809 | 0909 | 0D31 | 300A | 3778 |
| 0000002200 | 2035 | 0963 | 4E09 | 524F | 414D | 094C | 0930 | 0943 |
| 0000002220 | 3109 | 0A0D | 7830 | 3637 | 7620 | 0909 | 4F4E | 4D52 |
| 0000002240 | 4C41 | 3009 | 5609 | 0909 | 0D31 | 300A | 3778 | 2037 |
| 0000002260 | 0962 | 4E09 | 524F | 414D | 094C | 0930 | 0942 | 3109 |
| 0000002300 | 0A0D | 7830 | 3037 | 6E20 | 0909 | 4F4E | 4D52 | 4C41 |
| 0000002320 | 3009 | 4E09 | 0909 | 0D31 | 300A | 3278 | 2038 | 096D |
| 0000002340 | 4E09 | 524F | 414D | 094C | 0930 | 094D | 3109 | 0A0D |
| 0000002360 | 7830 | 4632 | 2C20 | 0909 | 4F4E | 4D52 | 4C41 | 3009 |
| 0000002400 | 3C09 | 0909 | 0D30 | 300A | 3278 | 2045 | 092E | 4E09 |
| 0000002420 | 524F | 414D | 094C | 0930 | 093E | 3009 | 0A0D | 7830 |
| 0000002440 | 4432 | 2F20 | 0909 | 4F4E | 4D52 | 4C41 | 3009 | 3F09 |
| 0000002460 | 0909 | 0D30 | 0D0A | 300A | 3778 | 2032 | 6E45 | 6574 |
| 0000002500 | 0972 | 4F4E | 4D52 | 4C41 | 3009 | 5009 | 6972 | 746E |
| 0000002520 | 3009 | 0A0D | 7830 | 3633 | 4520 | 7478 | 6843 | 4E09 |
| 0000002540 | 524F | 414D | 094C | 0930 | 7845 | 4374 | 0968 | 0D30 |
| 0000002560 | 300A | 3378 | 2037 | 735C | 0909 | 4F4E | 4D52 | 4C41 |
| 0000002600 | 3009 | 5CD9 | U973 | 3009 | 0A0D | 7830 | 3533 | 4520 |
| 0000002620 | 7478 | 6843 | 4E09 | 524F | 414D | 094C | 0930 | 7845 |
| 0000002640 | 4374 | 0968 | 0D30 | 0D0A | 230A | 2220 | 6857 | 7469 |
| 0000002660 | 2265 | 4520 | 6964 | 6974 | 676E | 6B20 | 7965 | 0D73 |
| 0000002700 | 0D0A | 300A | 3178 | 2032 | 6E49 | 4C73 | 6E69 | 0965 |
| 0000002720 | 4F4E | 4D52 | 4C41 | 3009 | 5309 | 495F | 736E | 694C |
| 0000002740 | 656E | 2020 | 3009 | 0A0D | 7830 | 3131 | 4420 | 6C65 |
| 0000002760 | 694C | 656E | 4E09 | 524F | 414D | 094C | 0930 | 5F53 |
| 0000003000 | 6544 | 4C6C | 6E69 | 2065 | 0920 | 0D30 | 300A | 3178 |
| 0000003020 | 2041 | 6E49 | 4373 | 6168 | 0972 | 4F4E | 4D52 | 4C41 |
| 0000003040 | 3009 | 5309 | 495F | 736E | 6843 | 7261 | 2020 | 3009 |
| 0000003060 | 0A0D | 7830 | 3931 | 4420 | 6C65 | 6843 | 7261 | 4E09 |
| 0000003100 | 524F | 414D | 094C | 0930 | 5F53 | 6544 | 436C | 6168 |
| 0000003120 | 2072 | 0920 | 0D30 | 300A | 3278 | 2032 | 6F48 | 656D |
| 0000003140 | 2020 | 0920 | 4F4E | 4D52 | 4C41 | 3009 | 5309 | 485F |
| 0000003160 | 6D6F | 2065 | 0920 | 0D30 | 300A | 3278 | 2031 | 7250 |
| 0000003200 | 7665 | 2020 | 0920 | 4F4E | 4D52 | 4C41 | 3009 | 5309 |
| 0000003220 | 505F | 6572 | 2076 | 0920 | 0D30 | 300A | 3278 | 2042 |
| 0000003240 | 6553 | 656C | 7463 | 0920 | 4F4E | 4D52 | 4C41 | 3009 |
| 0000003260 | 5309 | 535F | 6C65 | 6365 | 0974 | 0D30 | 300A | 3278 |
| 0000003300 | 2039 | 654E | 7478 | 2020 | 0920 | 4F4E | 4D52 | 4C41 |
| 0000003320 | 3009 | 5309 | 4E5F | 7865 | 2074 | 0920 | 0D30 | 300A |
| 0000003340 | 3278 | 2041 | 7055 | 0909 | 4E09 | 524F | 414D | 094C |
| 0000003360 | 0930 | 5F53 | 7055 | 0909 | 0D30 | 300A | 3378 | 2033 |
| 0000003400 | 654C | 7466 | 0909 | 4F4E | 4D52 | 4C41 | 3009 | 5309 |
| 0000003420 | 4C5F | 6665 | 0974 | 3009 | 0A0D | 7830 | 3233 | 4420 |
| 0000003440 | 776F | 096E | 4E09 | 524F | 414D | 094C | 0930 | 5F53 |
| 0000003460 | 6F44 | 6E77 | 0909 | 0D30 | 300A | 3378 | 2031 | 6952 |
| 0000003500 | 6867 | 0974 | 4E09 | 524F | 414D | 094C | 0930 | 5F53 |
| 0000003520 | 6952 | 6867 | 0974 | 3009 | 0A0D | 0ACD | 2023 | 7546 |

THU MAR 14 17:45:28 1991 SCITEX.KBD PAGE 3, LINE 119

| | | | | | | | | |
|---|---|---|---|---|---|---|---|---|
| 0000003540 | 636E | 6974 | 6E6F | 6B20 | 7965 | 2073 | 7428 | 706F |
| 0000003560 | 6C20 | 6E69 | 2965 | 0A0D | 0A0D | 7830 | 3735 | 4220 |
| 0000003600 | 6572 | 6B61 | 2020 | 4F4E | 4D52 | 4C41 | 3009 | 5209 |
| 0000003620 | 7365 | 7465 | 2020 | 3020 | 0A0D | 7830 | 4133 | 5320 |
| 0000003640 | 6F74 | 2070 | 2020 | 4F4E | 4D52 | 4C41 | 3009 | 5309 |
| 0000003660 | 535F | 6F74 | 2070 | 3020 | 0A0D | 7830 | 4433 | 4620 |
| 0000003700 | 0931 | 4E09 | 524F | 414D | 094C | 0930 | 5F53 | 3146 |
| 0000003720 | 3009 | 0A0D | 7830 | 4533 | 4620 | 0932 | 4E09 | 524F |
| 0000003740 | 414D | 094C | 0930 | 5F53 | 3246 | 3009 | 0A0D | 7830 |
| 0000003760 | 4633 | 4620 | 0933 | 4E09 | 524F | 414D | 094C | 0930 |
| 0000004000 | 5F53 | 3346 | 3009 | 0A0D | 7830 | 3833 | 4620 | 0934 |
| 0000004020 | 4E09 | 524F | 414D | 094C | 0930 | 5F53 | 3446 | 3009 |
| 0000004040 | 0A0D | 7830 | 3830 | 4D20 | 6E65 | 2075 | 2020 | 4F4E |
| 0000004060 | 4D52 | 4C41 | 3009 | 5309 | 4D5F | 6E65 | 2075 | 3020 |
| 0000004100 | 0A0D | 7830 | 4630 | 5320 | 7379 | 6574 | 206D | 4F4E |
| 0000004120 | 4D52 | 4C41 | 3009 | 5309 | 555F | 6573 | 2072 | 3020 |
| 0000004140 | 0A0D | 7830 | 4530 | 4620 | 2035 | 4E09 | 524F | 414D |
| 0000004160 | 094C | 0930 | 5F53 | 3546 | 3009 | 0A0D | 7830 | 4430 |
| 0000004200 | 4620 | 0936 | 4E09 | 524F | 414D | 094C | 0930 | 5F53 |
| 0000004220 | 3646 | 3009 | 0A0D | 7830 | 4330 | 4620 | 0937 | 4E09 |
| 0000004240 | 524F | 414D | 094C | 0930 | 5F53 | 3746 | 3009 | 0A0D |
| 0000004260 | 7830 | 4230 | 4620 | 0938 | 4E09 | 524F | 414D | 094C |
| 0000004300 | 0930 | 5F53 | 3846 | 3009 | 0A0D | 7830 | 4130 | 4320 |
| 0000004320 | 726C | 694C | 656E | 4E09 | 524F | 414D | 094C | 0930 |
| 0000004340 | 5F53 | 6C43 | 4C72 | 6E69 | 0965 | 0D30 | 300A | 3078 |
| 0000004360 | 2039 | 6C43 | 4472 | 7369 | 2070 | 2020 | 4E20 | 524F |
| 0000004400 | 414D | 094C | 0930 | 5F53 | 6C43 | 4472 | 7369 | 0970 |
| 0000004420 | 0D30 | 300A | 3678 | 2046 | 6D45 | 7470 | 3179 | 4E20 |
| 0000004440 | 524F | 414D | 094C | 0930 | 5F53 | 6D45 | 7470 | 3179 |
| 0000004460 | 3009 | 0A0D | 7830 | 4436 | 4520 | 706D | 7974 | 2032 |
| 0000004500 | 4F4E | 4D52 | 4C41 | 3009 | 5309 | 455F | 706D | 7974 |
| 0000004520 | 0932 | 0D30 | 300A | 3678 | 2042 | 6D45 | 7470 | 3379 |
| 0000004540 | 4E20 | 524F | 414D | 094C | 0930 | 5F53 | 6D45 | 7470 |
| 0000004560 | 3379 | 3009 | 0A0D | 7830 | 3936 | 4520 | 706D | 7974 |
| 0000004600 | 2034 | 4F4E | 4D52 | 4C41 | 3009 | 5309 | 455F | 706D |
| 0000004620 | 7974 | 0934 | 0D30 | 0D0A | 230A | 4B20 | 7965 | 6170 |
| 0000004640 | 0D64 | 0D0A | 300A | 3678 | 2037 | 504B | 756D | 746C |
| 0000004660 | 0909 | 4F4E | 4D52 | 4C41 | 3009 | 5309 | 4B5F | 6D50 |
| 0000004700 | 6C75 | 0974 | 0D30 | 300A | 3678 | 2035 | 504B | 6964 |
| 0000004720 | 0976 | 4E09 | 524F | 414D | 094C | 0930 | 5F53 | 504B |
| 0000004740 | 6964 | 0976 | 3009 | 0A0D | 7830 | 3336 | 4B20 | 6D50 |
| 0000004760 | 6E69 | 7375 | 4E09 | 524F | 414D | 094C | 0930 | 5F53 |
| 0000005000 | 504B | 696D | 756E | 0973 | 0D30 | 300A | 3678 | 2031 |
| 0000005020 | 504B | 6C70 | 7375 | 0909 | 4F4E | 4D52 | 4C41 | 3009 |
| 0000005040 | 5309 | 4B5F | 7050 | 756C | 0973 | 0D30 | 300A | 3578 |
| 0000005060 | 2046 | 504B | 0937 | 4E09 | 524F | 414D | 094C | 0930 |
| 0000005100 | 5F53 | 504B | 0937 | 3009 | 0A0D | 7830 | 4435 | 4B20 |
| 0000005120 | 3850 | 0909 | 4F4E | 4D52 | 4C41 | 3009 | 5309 | 4B5F |
| 0000005140 | 3850 | 0909 | 0D30 | 300A | 3578 | 2042 | 504B | 0939 |
| 0000005160 | 4E09 | 524F | 414D | 094C | 0930 | 5F53 | 504B | 0939 |
| 0000005200 | 3009 | 0A0D | 7830 | 3935 | 4B20 | 6550 | 746E | 7265 |
| 0000005220 | 4E09 | 524F | 414D | 094C | 0931 | 5F53 | 504B | 6E65 |
| 0000005240 | 6574 | 0972 | 0D30 | 300A | 3578 | 2045 | 504B | 0934 |
| 0000005260 | 4E09 | 524F | 414D | 094C | 0930 | 5F53 | 504B | 0934 |
| 0000005300 | 3009 | 0A0D | 7830 | 4335 | 4B20 | 3550 | 0909 | 4F4E |
| 0000005320 | 4D52 | 4C41 | 3009 | 5309 | 4B5F | 3550 | 0909 | 0D30 |
| 0000005340 | 300A | 3578 | 2041 | 504B | 0936 | 4E09 | 524F | 414D |
| 0000005360 | 094C | 0930 | 5F53 | 504B | 0936 | 3009 | 0A0D | 7830 |
| 0000005400 | 3835 | 4B20 | 6350 | 6D6F | 616D | 4E09 | 524F | 414D |

THU MAR 14 17:45:28 1991 SCITEX.KBD PAGE 4, LINE 178

```
0000005420  094C  0930  5F53  504B  6F63  6D6D  0961  0D30
0000005440  300A  3678  2036  504B  0931  4E09  524F  414D
0000005460  094C  0930  5F53  504B  0931  3009  0A0D  7830
0000005500  3436  4B20  3250  0909  4F4E  4D52  4C41  3009
0000005520  5309  4B5F  3250  0909  0D30  300A  3678  2032
0000005540  504B  0933  4E09  524F  414D  094C  0930  5F53
0000005560  504B  0933  3009  0A0D  7830  3036  4B20  7450
0000005600  6261  0909  4F4E  4D52  4C41  3009  5309  4B5F
0000005620  7450  6261  0909  0D30  300A  3678  2045  504B
0000005640  0930  4E09  524F  414D  094C  0930  5F53  504B
0000005660  0930  3009  0A0D  7830  4136  4B20  6450  746F
0000005700  0909  4F4E  4D52  4C41  3009  5309  4B5F  6450
0000005720  746F  0909  0D30  410A
0000005727
```

THU MAR 14 17:45:52 1991 SETUP.DLL PAGE 1, LINE 1

| | | | | | | | | |
|---|---|---|---|---|---|---|---|---|
| 0000000000 | 5A4D | 01AF | 0037 | 0000 | 0004 | 0000 | FFFF | 0000 |
| 0000000020 | 00B6 | 0000 | 0000 | 0000 | 0040 | 0000 | 0000 | 0000 |
| 0000000040 | 0000 | 0000 | 0000 | 0000 | 0000 | 0000 | 0000 | 0000 |
| 0000000060 | 0000 | 0000 | 0000 | 0000 | 0000 | 0000 | 0080 | 0000 |
| 0000000100 | 1F0E | 0EBA | B400 | CD09 | B821 | 4C01 | 21CD | 6854 |
| 0000000120 | 7369 | 7020 | 6F72 | 7267 | 6D61 | 6320 | 6E61 | 6F6E |
| 0000000140 | 2074 | 7572 | 206E | 6E69 | 4420 | 534F | 6D20 | 646F |
| 0000000160 | 2E65 | 0D0D | 240A | 0000 | 0000 | 0000 | 0000 | 0000 |
| 0000000200 | 454E | 0A05 | 0234 | 0031 | C9FF | FCED | 8006 | 0005 |
| 0000000220 | 0000 | 0000 | 3270 | 0001 | 0000 | 0000 | 0005 | 0007 |
| 0000000240 | 000D | 0040 | 0068 | 0068 | 018A | 0198 | 02E5 | 0000 |
| 0000000260 | 0000 | 0004 | 0000 | 0001 | 0000 | 0000 | 0000 | 0000 |
| 0000000300 | 0030 | 5A95 | 0D00 | 5A96 | 05F5 | 00C6 | 0C01 | 0100 |
| 0000000320 | 0000 | 0000 | 0C01 | 0850 | 0000 | 0000 | 0C01 | 0200 |
| 0000000340 | 0602 | 0D65 | 0D01 | 4120 | 7305 | 7465 | 7075 | 0000 |
| 0000000360 | 4B0F | 5F42 | 4547 | 5F54 | 454B | 5F59 | 5441 | 5254 |
| 0000000400 | 0001 | 4C06 | 495F | 4F43 | 024E | 1100 | 424B | 475F |
| 0000000420 | 5445 | 535F | 4948 | 5446 | 435F | 444F | 0345 | 0D00 |
| 0000000440 | 424B | 495F | 494E | 5F54 | 4154 | 4C42 | 0445 | 1000 |
| 0000000460 | 424B | 475F | 5445 | 4D5F | 454B | 5F59 | 5441 | 5254 |
| 0000000500 | 0005 | 4BDF | 5F42 | 4547 | 5F54 | 454B | 5F59 | 4F43 |
| 0000000520 | 4544 | 0006 | 4B12 | 5F42 | 5F51 | 5543 | 5252 | 4E45 |
| 0000000540 | 5F54 | 4154 | 4C42 | 0745 | 1000 | 424B | 475F | 5445 |
| 0000000560 | 4D5F | 454B | 5F59 | 4F43 | 4544 | 0008 | 4B0D | 5F42 |
| 0000000600 | 4F4D | 4944 | 5946 | 4B5F | 5945 | 0009 | 4B14 | 5F42 |
| 0000000620 | 4553 | 5F54 | 5543 | 5252 | 4E45 | 5F54 | 4154 | 4C42 |
| 0000000640 | 0A45 | 1900 | 424B | 475F | 5445 | 4B5F | 5945 | 545F |
| 0000000660 | 5059 | 5F45 | 5246 | 4D4F | 4E5F | 4D41 | 0B45 | 0D00 |
| 0000000700 | 424B | 525F | 4D45 | 564F | 5F45 | 454B | 0C59 | 1400 |
| 0000000720 | 5F4C | 4955 | 495F | 4F43 | 5F4E | 454C | 5241 | 5F4E |
| 0000000740 | 4F46 | 4D52 | 000D | 4C0D | 5F4C | 5F55 | 4C44 | 5F47 |
| 0000000760 | 5250 | 434F | 000E | 4B10 | 5F42 | 4547 | 5F54 | 4142 |
| 0000001000 | 4553 | 435F | 444F | 0F45 | 0000 | 0001 | 000A | 0010 |
| 0000001020 | 0089 | 008F | 0092 | 0095 | 0800 | 4F44 | 4353 | 4C41 |
| 0000001040 | 534C | 5005 | 574D | 4E49 | 6C06 | 6962 | 6D70 | 0D74 |
| 0000001060 | 425F | 5F58 | 4544 | 5542 | 4D47 | 444F | 0D45 | 425F |
| 0000001100 | 5F58 | 4954 | 454D | 4D53 | 444F | 0945 | 425F | 5F58 |
| 0000001120 | 5F42 | 4953 | 0E47 | 425F | 5F58 | 4544 | 5542 | 4547 |
| 0000001140 | 544E | 5245 | 5F0F | 5842 | 445F | 4245 | 4755 | 4552 |
| 0000001160 | 5554 | 4E52 | 5F0E | 5842 | 565F | 494F | 5244 | 5445 |
| 0000001200 | 5255 | 0E4E | 425F | 5F58 | 4544 | 5542 | 5047 | 4952 |
| 0000001220 | 544E | 5F0E | 5842 | 505F | 4341 | 464B | 4C49 | 4554 |
| 0000001240 | 0552 | 4244 | 505F | 0249 | 4955 | 4902 | 0648 | 7263 |
| 0000001260 | 5F76 | 6669 | 010F | 1E01 | 0107 | 0DAD | 5801 | 0109 |
| 0000001300 | 0000 | D001 | 010A | 07B0 | 2701 | 0105 | 0B45 | 5301 |
| 0000001320 | 0105 | 04F6 | 0201 | 010A | 0691 | E401 | 010B | 2059 |
| 0000001340 | 8201 | 0008 | 0900 | 6573 | 7574 | 2070 | 4C44 | 004C |
| 0000001360 | 0000 | 0000 | 0000 | 0000 | 0000 | 0000 | 0000 | 0000 |
| 0000001400 | 581E | 4590 | 8B55 | 1EEC | D88E | EC81 | 0192 | 5657 |
| 0000001420 | B81E | FFFF | D88E | 46C7 | 4FF8 | 8C00 | FA5E | 86C7 |
| 0000001440 | FF38 | 0101 | C02B | 8689 | FED2 | 8689 | FED0 | 068E |
| 0000001460 | 0C0A | 8326 | FF3E | 00FF | 0375 | 1EE9 | FF00 | 8E36 |
| 0000001500 | FF00 | 8C36 | 8D00 | C686 | 16FE | 9A50 | FFFF | 0000 |
| 0000001520 | C483 | 3D08 | 0000 | 0374 | 0FE9 | 8E00 | 0C06 | 260C |
| 0000001540 | 3E83 | FFFF | 7500 | E903 | 003C | 681E | 0056 | 868D |
| 0000001560 | FEDA | 5016 | 868D | FEC6 | 5016 | 468D | 16EE | 6A50 |
| 0000001600 | 1E5B | C668 | FF00 | 8A36 | FF00 | 8836 | FF00 | 8E36 |
| 0000001620 | FF00 | 8C36 | 9A00 | FFFF | 0000 | C483 | 891E | EE46 |
| 0000001640 | 5689 | E9F0 | 0008 | C02B | 4689 | 89F0 | EE46 | 46C7 |

THU MAR 14 17:45:52 1991 SETUP.DLL PAGE 2, LINE 60

| | | | | | | | | |
|---|---|---|---|---|---|---|---|---|
| 0000001660 | 00DE | 2B00 | 89C0 | F646 | 4689 | C7F4 | EC46 | 0000 |
| 0000001700 | 681E | 005D | 76FF | FF14 | 1276 | B69A | F538 | 8300 |
| 0000001720 | 08C4 | 8689 | FE6E | 9689 | FE70 | 868B | FE70 | 860B |
| 0000001740 | FE6E | 0374 | 08E9 | C700 | EC46 | 0008 | 25E9 | 6800 |
| 0000001760 | 3200 | 0C9A | 6851 | 8301 | 02C4 | 8689 | FED4 | 9689 |
| 0000002000 | FED6 | 868B | FED6 | 860B | FED4 | 0374 | 05E9 | C700 |
| 0000002020 | EC46 | 0007 | 7E83 | 00EC | 0374 | 52E9 | C702 | F246 |
| 0000002040 | 0000 | 86C7 | FED8 | 0000 | 46C7 | 00FC | C700 | 8A46 |
| 0000002060 | 0000 | 03E9 | FF00 | 8A46 | 7E81 | 008A | 7C01 | E903 |
| 0000002100 | 0011 | 766B | 328A | 9EC4 | FED4 | C726 | 1640 | 0000 |
| 0000002120 | E2E9 | FFFF | F246 | B6FF | FE70 | B6FF | FE6E | 506A |
| 0000002140 | 468D | 168C | 9A50 | 5614 | 01BC | C483 | 890A | E046 |
| 0000002160 | 5689 | 8BE2 | E246 | 460B | 74E0 | E903 | 001A | 9EC4 |
| 0000002200 | FE6E | 8A26 | 0A47 | 2024 | 013C | C01B | 1525 | 0500 |
| 0000002220 | 000C | 4689 | E9EC | 016C | 7E80 | 238C | 0375 | 63E9 |
| 0000002240 | 8001 | 8C7E | 750A | E903 | 015A | 868D | FE72 | 5016 |
| 0000002260 | 681E | 005F | 468D | 168C | 9A50 | 571E | 023D | C483 |
| 0000002300 | 890C | C486 | 83FE | C4BE | 01FE | 0375 | 08E9 | C700 |
| 0000002320 | EC46 | 0023 | 2DE9 | 8301 | 72BE | 00FE | 0373 | 0BE9 |
| 0000002340 | 8100 | 72BE | FFFE | 7700 | E903 | 0008 | 46C7 | 22EC |
| 0000002360 | E900 | 0110 | B66B | FE72 | C432 | D49E | 26FE | 7883 |
| 0000002400 | 0016 | 0375 | 08E9 | C700 | EC46 | 0024 | F5E9 | 8D00 |
| 0000002420 | CE86 | 16FE | 8D50 | 7486 | 16FE | 8D50 | E846 | 5016 |
| 0000002440 | 868D | FEE6 | 5016 | 868D | FF3A | 5016 | 468D | 16EA |
| 0000002460 | 1E50 | 6268 | 8D00 | 8C46 | 5016 | 1E9A | 6557 | 8302 |
| 0000002500 | 20C4 | 8689 | FEC4 | BE83 | FEC4 | 7506 | E903 | 0008 |
| 0000002520 | 46C7 | 23EC | E900 | 00A0 | 681E | 006F | 868D | FF3A |
| 0000002540 | 5016 | 469A | 7F54 | 8302 | 08C4 | 003D | 7400 | E903 |
| 0000002560 | 0012 | 681E | 0072 | 868D | FF3A | 5016 | 109A | 9154 |
| 0000002600 | 8302 | 08C4 | 681E | 0074 | 868D | FE74 | 5016 | 469A |
| 0000002620 | AB54 | 8302 | 08C4 | 003D | 7400 | E903 | 0012 | 681E |
| 0000002640 | 0077 | 868D | FE74 | 5016 | 109A | BF54 | 8302 | 08C4 |
| 0000002660 | 868D | FEE6 | 5016 | 868D | FF36 | 5016 | 029A | F30A |
| 0000002700 | 8902 | EC46 | 7E83 | 00EC | 0374 | 2BE9 | FF00 | D6B6 |
| 0000002720 | FFFE | D4B6 | FFFE | 72B6 | 8DFE | 3A86 | 16FF | FF50 |
| 0000002740 | 36B6 | FFFF | E876 | 868D | FE74 | 5016 | B6FF | FECE |
| 0000002760 | 539A | FF05 | 89FF | EC46 | 7E83 | 00EC | 0374 | 03E9 |
| 0000003000 | FF00 | FC46 | 7E83 | 00EC | 0375 | 1DE9 | 8300 | EC7E |
| 0000003020 | 7521 | E903 | 0014 | BE83 | FED8 | 7400 | E903 | 000A |
| 0000003040 | 468B | 89F2 | D886 | E9FE | 0000 | 7E83 | 21EC | 0375 |
| 0000003060 | 09E9 | 8300 | EC7E | 740C | E903 | FE17 | 868B | FED4 |
| 0000003100 | 968B | FED6 | 5EC4 | 260E | 0789 | 8926 | 0257 | 868B |
| 0000003120 | FED8 | 5EC4 | 260A | 0789 | 468B | C4FC | 065E | 8926 |
| 0000003140 | 8307 | EC7E | 7421 | E903 | 0005 | 46C7 | 00EC | C700 |
| 0000003160 | 8A46 | 0000 | 03E9 | FF00 | 8A46 | 7E81 | 008A | 7C01 |
| 0000003200 | E903 | 000D | 5E6B | 328A | 87C7 | 0D7C | 0000 | E6E9 |
| 0000003220 | 6AFF | 6A00 | 1E00 | 7968 | 8D00 | DE46 | 5016 | 468D |
| 0000003240 | 16F4 | 9A50 | FFFF | 0000 | 46C7 | 008A | E900 | 0004 |
| 0000003260 | 4683 | 028A | 468B | 398A | DE46 | 037F | 77E9 | 6A00 |
| 0000003300 | 8D00 | E446 | 5016 | 5E8B | C18A | 02E3 | 76C4 | 26F4 |
| 0000003320 | 70FF | 2602 | 30FF | BE9A | 2E58 | 8304 | 0AC4 | 8689 |
| 0000003340 | FE72 | 5E8B | C18A | 02E3 | 76C4 | 8BF4 | E446 | 568B |
| 0000003360 | 26E6 | 0039 | 0374 | 0CE9 | 2600 | 5039 | 7402 | E903 |
| 0000003400 | 0003 | ABE9 | 6BFF | 729E | 32FE | 87C7 | 0D7C | 0001 |
| 0000003420 | 768B | C18A | 02E6 | 5EC4 | 26F4 | 70FF | 2606 | 70FF |
| 0000003440 | 6B04 | 7286 | 32FE | 6605 | 1E0D | 9A50 | 5410 | 045C |
| 0000003460 | C483 | E908 | FF7A | 76FF | FFDE | F676 | 76FF | 9AF4 |
| 0000003500 | FFFF | 0000 | 868B | FE70 | 860B | FE6E | 0375 | 10E9 |
| 0000003520 | FF00 | 70B6 | FFFE | 6EB6 | 9AFE | 3762 | 00CD | C483 |

THU MAR 14 17:45:52 1991 SETUP.DLL PAGE 3, LINE 119

| | | | | | | | | |
|---|---|---|---|---|---|---|---|---|
| 0000003540 | 8E04 | 0A06 | 260C | 3E83 | 0035 | 7500 | E903 | 000A |
| 0000003560 | BE83 | FECA | 74FE | E903 | 000F | 068E | 0C0C | 8326 |
| 0000003600 | 623E | 0000 | 0375 | 59E9 | 8B00 | EC46 | 8689 | FECC |
| 0000003620 | B6FF | FED2 | B6FF | FED0 | 868D | FECC | 5016 | B6FF |
| 0000003640 | FF38 | 76FF | FFFA | F876 | 8E8D | FEDA | 5116 | 4E8D |
| 0000003660 | 16EE | 8D51 | C68E | 16FE | 1E51 | C668 | 6800 | 00F2 |
| 0000003700 | 36FF | 008A | 36FF | 0088 | 36FF | 008E | 36FF | 008C |
| 0000003720 | FF9A | 00FF | 8300 | 28C4 | 868B | FECC | 09E9 | E900 |
| 0000003740 | 0006 | 468B | E9EC | 0000 | 5E1F | 835F | 02ED | E58B |
| 0000003760 | 5D1F | CA4D | 0010 | 581E | 4590 | 8B55 | 1EEC | D88E |
| 0000004000 | EC81 | 0000 | 5657 | B81E | 0012 | D88E | 468B | 8B06 |
| 0000004020 | 0856 | 90A3 | 8900 | 9216 | 1F00 | 5F5E | ED83 | 8B02 |
| 0000004040 | 1FE5 | 4D5D | 04CA | 1E00 | 9058 | 5545 | EC8B | 8E1E |
| 0000004060 | 81D8 | 00EC | 5700 | 1E56 | 08B8 | 8E05 | A1D8 | 0090 |
| 0000004100 | 168B | 0092 | 00E9 | 1F00 | 5F5E | ED83 | 8B02 | 1FE5 |
| 0000004120 | 4D5D | 1ECB | 9058 | 5545 | EC8B | 8E1E | 81D8 | 04EC |
| 0000004140 | 5700 | 1E56 | 39B8 | 8E05 | C7D8 | FC46 | 0000 | 7E83 |
| 0000004160 | 0014 | 0373 | 0AE9 | 8100 | 147E | 00FF | 0377 | 08E9 |
| 0000004200 | C700 | FC46 | 0013 | F4E9 | 8B00 | 1846 | 460B | 7416 |
| 0000004220 | E903 | 0008 | 46C7 | 0FFC | E900 | 00E1 | 76FF | FF12 |
| 0000004240 | 1076 | 709A | DF54 | 8305 | 04C4 | 143D | 7600 | E903 |
| 0000004260 | 004C | 7E83 | 000E | 037F | 43E9 | 8300 | 0E7E | 7C05 |
| 0000004300 | E903 | 003A | 7E83 | 010C | 0375 | 09E9 | 8300 | 0C7E |
| 0000004320 | 7400 | E903 | 0028 | 76FF | FF0A | 0876 | 709A | 3154 |
| 0000004340 | 8306 | 04C4 | 143D | 7600 | E903 | 0012 | 7E83 | 0106 |
| 0000004360 | 0375 | 11E9 | 8300 | 067E | 7500 | E903 | 0008 | 46C7 |
| 0000004400 | 13FC | E900 | 0077 | 766B | 3214 | 5EC4 | 2616 | 7883 |
| 0000004420 | 0016 | 0375 | 05E9 | C700 | FC46 | 0024 | 76FF | FF12 |
| 0000004440 | 1076 | 466B | 3214 | 4603 | 8B16 | 1856 | 5052 | 109A |
| 0000004460 | 6A54 | 8306 | 08C4 | 468B | 6B0E | 1476 | C432 | 165E |
| 0000004500 | 8926 | 1640 | 468B | 6B0C | 1476 | C432 | 165E | 8926 |
| 0000004520 | 1840 | 76FF | FF0A | 0876 | 466B | 3214 | 4603 | 8B16 |
| 0000004540 | 1856 | 1A05 | 5200 | 9A50 | 5410 | 03D9 | C483 | 8B08 |
| 0000004560 | 0646 | 766B | 3214 | 5EC4 | 2616 | 4089 | 8B30 | FC46 |
| 0000004600 | 00E9 | 1F00 | 5F5E | ED83 | 8B02 | 1FE5 | 4D5D | 14CA |
| 0000004620 | 1E00 | 9058 | 5545 | EC8B | 8E1E | 81D8 | 04EC | 5700 |
| 0000004640 | 1E56 | 65B8 | 8E05 | C7D8 | FC46 | 0000 | 7E80 | 0006 |
| 0000004660 | 0373 | 09E9 | 8000 | 067E | 77FF | E903 | 0008 | 46C7 |
| 0000004700 | 13FC | E900 | 0044 | 92A1 | 0B00 | 9006 | 7400 | E903 |
| 0000004720 | 0008 | 46C7 | 0FFC | E900 | 0030 | 468A | 2A06 | 6BE4 |
| 0000004740 | 32F0 | 1EC4 | 0090 | 8326 | 1678 | 7400 | E903 | 0008 |
| 0000004760 | 46C7 | 10FC | E900 | 0012 | 468A | 2A06 | 6BE4 | 32F0 |
| 0000005000 | 1EC4 | 0090 | C726 | 1640 | 0000 | 468B | E9FC | 0000 |
| 0000005020 | 5E1F | 835F | 02ED | E58B | 5D1F | CA4D | 0002 | 581E |
| 0000005040 | 4590 | 8B55 | 1EEC | D88E | EC81 | 0004 | 5657 | B81E |
| 0000005060 | 06A3 | D88E | 46C7 | 00FC | 8000 | 0A7E | 7300 | E903 |
| 0000005100 | 0009 | 7E80 | FF0A | 0377 | 08E9 | C700 | FC46 | 0013 |
| 0000005120 | 49E9 | A100 | 0092 | 060B | 0090 | 0374 | 08E9 | C700 |
| 0000005140 | FC46 | 000F | 35E9 | 8A00 | 0A46 | E42A | F06B | C432 |
| 0000005160 | 901E | 2600 | 7883 | 0016 | 0374 | 08E9 | C700 | FC46 |
| 0000005200 | 0010 | 17E9 | B000 | F632 | 0A66 | 0603 | 0090 | 168B |
| 0000005220 | 0092 | 5EC4 | 2606 | 0789 | 8926 | 0257 | 468B | E9FC |
| 0000005240 | 0000 | 5E1F | 835F | 02ED | E58B | 5D1F | CA4D | 0006 |
| 0000005260 | 581E | 4590 | 8B55 | 1EEC | D88E | EC81 | 0008 | 5657 |
| 0000005300 | B81E | 0730 | D88E | 46C7 | 00FA | A100 | 0092 | 060B |
| 0000005320 | 0090 | 0374 | 08E9 | C700 | FA46 | 000F | 7DE9 | C700 |
| 0000005340 | FA46 | 0010 | 46C7 | 00F8 | E900 | 0003 | 46FF | 83F8 |
| 0000005360 | FA7E | 7410 | E903 | 0064 | 7E81 | 00F8 | 7C01 | E903 |
| 0000005400 | 005A | 766B | 32F8 | 1EC4 | 0090 | 8326 | 1678 | 7500 |

THU MAR 14 17:45:52 1991 SETUP.DLL PAGE 4, LINE 178

| | | | | | | | | |
|---|---|---|---|---|---|---|---|---|
| 0000005420 | E903 | 0045 | 5EC4 | 260A | 078A | 5E6B | 32F8 | 36C4 |
| 0000005440 | 0090 | 3826 | 7400 | E903 | 002F | 76FF | FFDC | 0A76 |
| 0000005460 | 466B | 32F8 | 0603 | 0090 | 168B | 0092 | 5052 | 469A |
| 0000005500 | A554 | 8305 | 08C4 | 003D | 7400 | E903 | 000B | 46C7 |
| 0000005520 | 00FA | 8A00 | F846 | 4688 | E9FC | FF90 | 7E83 | 00FA |
| 0000005540 | 0374 | 09E9 | 8A00 | FC46 | 5EC4 | 2606 | 0788 | 468B |
| 0000005560 | E9FA | 0000 | 5E1F | 835F | 02ED | E58B | 5D1F | CA4D |
| 0000005600 | 0008 | 581E | 4590 | 8B55 | 1EEC | D88E | EC81 | 0008 |
| 0000005620 | 5657 | B81E | u7C2 | D88E | 46C7 | 00FA | A100 | 0092 |
| 0000005640 | 060B | 0090 | 0374 | 08E9 | C700 | FA46 | 000F | 81E9 |
| 0000005660 | C700 | FA46 | 0010 | 46C7 | 00F8 | E900 | 0003 | 46FF |
| 0000005700 | 83F8 | FA7E | 7410 | E903 | 0068 | 7E81 | 00F8 | 7C01 |
| 0000005720 | E903 | 005E | 766B | 32F8 | 1EC4 | 0090 | 8326 | 1678 |
| 0000005740 | 7500 | E903 | 0049 | 5EC4 | 260A | 078A | 766B | 32F8 |
| 0000005760 | 1EC4 | 0090 | 3826 | 1A40 | 0374 | 32E9 | FF00 | 0C76 |
| 0000006000 | 76FF | 6B0A | F846 | 0332 | 9006 | 8B00 | 9216 | 0500 |
| 0000006020 | 001A | 5052 | 469A | 4154 | 8308 | 08C4 | 003D | 7400 |
| 0000006040 | E903 | 000B | 46C7 | 00FA | 8A00 | F846 | 4688 | E9FC |
| 0000006060 | FF8C | 7E83 | 00FA | 0374 | 09E9 | 8A00 | FC46 | 5EC4 |
| 0000006100 | 2606 | 0788 | 468B | E9FA | 0000 | 5E1F | 835F | 02ED |
| 0000006120 | E58B | 5D1F | CA4D | 0008 | 581E | 4590 | 8B55 | 1EEC |
| 0000006140 | D88E | EC81 | 0008 | 5657 | B81E | 0894 | D88E | 46C7 |
| 0000006160 | 00FA | A100 | 0092 | 060B | 0090 | 0374 | 08E9 | C700 |
| 0000006200 | FA46 | 000F | 55E9 | C700 | FA46 | 0010 | 46C7 | 00F8 |
| 0000006220 | E900 | 0003 | 46FF | 83F8 | FA7E | 7410 | E903 | 003C |
| 0000006240 | 7E81 | 00F8 | 7C01 | E903 | 0032 | 766B | 32F8 | 1EC4 |
| 0000006260 | 0090 | 8326 | 1678 | 7500 | E903 | 001D | 766B | 32F8 |
| 0000006300 | 1EC4 | 0090 | 8326 | 1678 | 7403 | E903 | 000B | 46C7 |
| 0000006320 | 00FA | 8A00 | F846 | 4688 | E9FC | FFB8 | 7E83 | 00FA |
| 0000006340 | 0374 | 09E9 | 8A00 | FC46 | 5EC4 | 2606 | 0788 | 468B |
| 0000006360 | E9FA | 0000 | 5E1F | 835F | 02ED | E58B | 5D1F | CA4D |
| 0000006400 | 0004 | 581E | 4590 | 8B55 | 1EEC | D88E | EC81 | 0006 |
| 0000006420 | 5657 | B81E | 096A | D88E | 46C7 | 00FA | 1E00 | D468 |
| 0000006440 | FF00 | 0C76 | 76FF | 9A0A | 5446 | 0A4C | C483 | 3D08 |
| 0000006460 | 0000 | 0374 | 08E9 | C700 | FC46 | 0001 | 6BE9 | 1E00 |
| 0000006500 | DB68 | FF00 | 0C76 | 76FF | 9A0A | 5446 | 0A6E | C483 |
| 0000006520 | 3D08 | 0000 | 0374 | 08E9 | C700 | FC46 | 0002 | 49E9 |
| 0000006540 | 1E00 | DF68 | FF00 | 0C76 | 76FF | 9A0A | 5446 | 0A90 |
| 0000006560 | C483 | 3D08 | 0000 | 0374 | 08E9 | C700 | FC46 | 0003 |
| 0000006600 | 27E9 | 1E00 | E568 | FF00 | 0C76 | 76FF | 9A0A | 5446 |
| 0000006620 | 0917 | C483 | 3D08 | 0000 | 0374 | 08E9 | C700 | FC46 |
| 0000006640 | 0004 | 05E9 | C700 | FA46 | 0023 | 7E83 | 00FA | 0374 |
| 0000006660 | 09E9 | 8B00 | FC46 | 5EC4 | 2606 | 0789 | 468B | E9FA |
| 0000006700 | 0000 | 5E1F | 835F | 02ED | E58B | 5D1F | CA4D | 0008 |
| 0000006720 | 581E | 4590 | 8B55 | 1EEC | D88E | EC81 | 0004 | 5657 |
| 0000006740 | B81E | 0A14 | D88E | 46C7 | 00FC | 8000 | 0A7E | 7300 |
| 0000006760 | E903 | 0009 | 7E80 | FF0A | 0377 | 08E9 | C700 | FC46 |
| 0000007000 | 0013 | 2CE9 | 8A00 | 0A46 | E42A | D86B | 8332 | 7CBF |
| 0000007020 | 000D | 0374 | 08E9 | C700 | FC46 | 0010 | 12E9 | B000 |
| 0000007040 | F632 | 0A66 | 66D5 | C40D | 065E | 8926 | 2607 | 5F8C |
| 0000007060 | 8B02 | FC46 | 00E9 | 1F00 | 5F5E | ED83 | 8B02 | 1FE5 |
| 0000007100 | 4D5D | D6CA | 1E00 | 9058 | 5545 | EC8B | 8E1E | 81D8 |
| 0000007120 | 08EC | 5700 | 1E56 | E2B8 | 8E0A | C7D8 | FA46 | 0000 |
| 0000007140 | 46C7 | 10FA | C700 | F846 | 0000 | 03E9 | FF00 | F846 |
| 0000007160 | 7E83 | 10FA | 0374 | 45E9 | 8100 | F87E | 0100 | 037C |
| 0000007200 | 3BE9 | 6B00 | F85E | 8332 | 7CBF | 000D | 0375 | 2AE9 |
| 0000007220 | FF00 | 0C76 | 76FF | 6B0A | F846 | 0532 | 0D66 | 501E |
| 0000007240 | 469A | 2A54 | 830A | 08C4 | 003D | 7400 | E903 | 000B |
| 0000007260 | 46C7 | 00FA | 8A00 | F846 | 4688 | E9FC | FFAF | 7E83 |

THU MAR 14 17:45:52 1991 SETUP.DLL PAGE 5, LINE 237

| | | | | | | | | |
|---|---|---|---|---|---|---|---|---|
| 0000007300 | 00FA | 0374 | 09E9 | 8A00 | FC46 | 5EC4 | 2606 | 0788 |
| 0000007320 | 468B | E9FA | 0000 | 5E1F | 835F | 02ED | E58B | 5D1F |
| 0000007340 | CA4D | 0008 | 581E | 4590 | 8B55 | 1EEC | D88E | EC81 |
| 0000007360 | 01C2 | 5657 | B81E | 0B57 | D88E | 46C7 | FDFA | 8C00 |
| 0000007400 | FC5E | 86C7 | FE56 | 0101 | C02B | 8689 | FE48 | 8689 |
| 0000007420 | FE46 | 068E | 0C0E | 8326 | 683E | 0004 | 0375 | 1EE9 |
| 0000007440 | FF00 | 1236 | FF01 | 1036 | 8D01 | 3E86 | 16FE | 9A50 |
| 0000007460 | 004C | 0000 | C483 | 3D08 | 0000 | 0374 | 0FE9 | 8E00 |
| 0000007500 | 1006 | 260C | 3E83 | 0D36 | 7500 | E903 | 003F | 681E |
| 0000007520 | 0104 | 868D | FE4A | 5016 | 868D | FE3E | 5016 | 868D |
| 0000007540 | FE5E | 5016 | 506A | 681E | 0114 | 36FF | 010E | 36FF |
| 0000007560 | 010C | 36FF | 0112 | 36FF | 0110 | 969A | 0000 | 8300 |
| 0000007600 | 1EC4 | 8689 | FE5E | 9689 | FE60 | 0AE9 | 2B00 | 89C0 |
| 0000007620 | 6086 | 89FE | 5E86 | C7FE | 5C86 | 00FE | 6A00 | 6800 |
| 0000007640 | 00D2 | 819A | B91D | 830C | 04C4 | 76FF | FF08 | 0676 |
| 0000007660 | 868D | FE62 | 5016 | 369A | C70F | 830C | 08C4 | 868D |
| 0000007700 | FE62 | 5016 | A09A | E11E | 830C | 04C4 | 8689 | FE5C |
| 0000007720 | BE83 | FE5C | 7500 | E903 | 003C | B6FF | FE5C | BC9A |
| 0000007740 | A330 | 830B | 02C4 | 016A | 646A | 006A | 868D | FE58 |
| 0000007760 | 5016 | FF9A | 00FF | 8900 | 5C86 | 83FE | 5CRE | 00FE |
| 0000010000 | 0374 | 11E9 | FF00 | 5AB6 | FFFE | 53B6 | 9AFE | FFFF |
| 0000010020 | 0000 | 8689 | FE5C | 068E | 0C0E | 8326 | 193E | 000C |
| 0000010040 | 0375 | 0AE9 | 8300 | 42BE | FEFE | 0374 | 0FE9 | 8E00 |
| 0000010060 | 1006 | 260C | 3E83 | 0481 | 7500 | E903 | 005A | 868B |
| 0000010100 | FE5C | 8689 | FE44 | B6FF | FE48 | B6FF | FE46 | 868D |
| 0000010120 | FE44 | 5016 | B6FF | FE56 | 76FF | FFFC | FA76 | 8E8D |
| 0000010140 | FE4A | 5116 | 8E8D | FE5E | 5116 | 8E8D | FE3E | 5116 |
| 0000010160 | 681E | 0114 | 6C6A | 36FF | 010E | 36FF | 010C | 36FF |
| 0000010200 | 0112 | 36FF | 0110 | D19A | 0004 | 8300 | 28C4 | 868B |
| 0000010220 | FE44 | 0AE9 | E900 | 0007 | 868B | FE5C | 00E9 | 1F00 |
| 0000010240 | 5F5E | ED83 | 8B02 | 1FE5 | 4D5D | 04CA | 1E00 | 9058 |
| 0000010260 | 5545 | EC8B | 8E1E | 81D8 | 26EC | 5700 | 1E56 | F6B8 |
| 0000010300 | 8E0B | C7D8 | FA46 | 0129 | 5E8C | C7FC | F246 | 0101 |
| 0000010320 | C02B | 4689 | 89E4 | E246 | 068E | 0C0E | 8326 | B03E |
| 0000010340 | 000E | 0375 | 1DE9 | FF00 | 1236 | FF01 | 1036 | 8D01 |
| 0000010360 | DA46 | 5016 | 309A | 000C | 8300 | 08C4 | 003D | 7400 |
| 0000010400 | E903 | 000F | 068E | 0C10 | 8326 | C83E | 000E | 0375 |
| 0000010420 | 3BE9 | 1E00 | 3068 | 8D01 | E646 | 5016 | 468D | 16DA |
| 0000010440 | 8D50 | F646 | 5016 | 8268 | 1E00 | 3868 | FF01 | 0E36 |
| 0000010460 | FF01 | 0C36 | FF01 | 1236 | FF01 | 1036 | 9A01 | 0C7B |
| 0000010500 | 0000 | C483 | 891E | F646 | 5689 | E9F8 | 0008 | C02B |
| 0000010520 | 4689 | 89F8 | F646 | 46C7 | 00F4 | C400 | 065E | 8B26 |
| 0000010540 | 0C47 | 33E9 | C400 | 065E | FF26 | 1477 | 199A | 8516 |
| 0000010560 | 830E | 02C4 | 32E9 | 8B00 | 0646 | 568B | 0508 | 0012 |
| 0000010600 | 5052 | 659A | A517 | 830C | 04C4 | 1CE9 | C700 | F446 |
| 0000010620 | 0013 | 14E9 | E900 | 0011 | 462D | 7500 | E903 | FFC5 |
| 0000010640 | 7548 | E903 | FFD1 | E4E9 | 8EFF | 0E06 | 260C | 3E83 |
| 0000010660 | 0D1D | 7500 | E903 | 0009 | 7E83 | FEDE | 0374 | 0FE9 |
| 0000010700 | 8E00 | 1006 | 260C | 3E83 | 0C46 | 7500 | E903 | 0051 |
| 0000010720 | 468B | 89F4 | E046 | 76FF | FFE4 | E276 | 468D | 16E0 |
| 0000010740 | FF50 | F276 | 76FF | FFFC | FA76 | 4E8D | 16E6 | 8D51 |
| 0000010760 | F64E | 5116 | 4E8D | 16DA | 1E51 | 3868 | 6801 | 009E |
| 0000011000 | 36FF | 010E | 36FF | 010C | 36FF | 0112 | 36FF | 0110 |
| 0000011020 | 879A | 000D | 8300 | 28C4 | 468B | E9E0 | 0009 | 06E9 |
| 0000011040 | 8B00 | F446 | 00E9 | 1F00 | 5F5E | ED83 | 8B02 | 1FE5 |
| 0000011060 | 4D5D | 04CA | 0000 | 581E | 4590 | 8B55 | 1EEC | D88E |
| 0000011100 | EC81 | 0024 | 5657 | 46C7 | 52FA | 8C01 | FC5E | 46C7 |
| 0000011120 | 00F4 | 2B00 | 89C0 | E646 | 4689 | 8EE4 | 1206 | 260C |
| 0000011140 | 3E83 | 0DDF | 7500 | E903 | 001D | 36FF | 017C | 36FF |

THU MAR 14 17:45:52 1991 SETUP.DLL PAGE 6, LINE 296

| | | | | | | | | |
|---|---|---|---|---|---|---|---|---|
| 0000011160 | 017A | 468D | 16DC | 9A50 | 0DF5 | 0000 | C483 | 3D08 |
| 0000011200 | 0000 | 0374 | 0FE9 | 8E00 | 1406 | 260C | 3E83 | 1050 |
| 0000011220 | 7500 | E903 | 003A | 681E | 0156 | 468D | 16E8 | 8D50 |
| 0000011240 | DC46 | 5016 | 468D | 16F6 | 6A50 | 1E4E | 9E68 | FF01 |
| 0000011260 | 7836 | FF01 | 7636 | FF01 | 7C36 | FF01 | 7A36 | 9A01 |
| 0000011300 | 0E3E | 0000 | C483 | 891E | F646 | 5689 | E9F8 | 0008 |
| 0000011320 | C02B | 4689 | 89F8 | F646 | 681E | 015A | 468B | 8B06 |
| 0000011340 | 0856 | 0205 | 5200 | 9A50 | 5410 | 1001 | C483 | 1E08 |
| 0000011360 | 6868 | 8B01 | 0646 | 568B | 0508 | 0066 | 5052 | 109A |
| 0000011400 | 6F54 | 830E | 08C4 | 5EC4 | 2606 | 87C6 | 00CA | C400 |
| 0000011420 | 065E | C726 | 2E87 | 0301 | C400 | 065E | C726 | 3087 |
| 0000011440 | 0101 | C400 | 065E | C626 | 3487 | 0001 | 06C6 | 017E |
| 0000011460 | 8E00 | 1206 | 260C | 3E83 | 0F62 | 7500 | E903 | 0009 |
| 0000011500 | 7E83 | FEE0 | 0374 | 0FE9 | 8E00 | 1406 | 260C | 3E83 |
| 0000011520 | 0E0B | 7500 | E903 | 0038 | 468D | 16E8 | 8D50 | F646 |
| 0000011540 | 5016 | 468D | 16DC | 1E50 | 9E68 | 6A01 | FF5D | 7836 |
| 0000011560 | FF01 | 7636 | FF01 | 7C36 | FF01 | 7A36 | 9A01 | FFFF |
| 0000011600 | 0000 | C483 | C71A | E246 | 0000 | 06E9 | E900 | 0003 |
| 0000011620 | 00E9 | 5E0D | 835F | 02ED | E58B | 5D1F | CB4D | 581E |
| 0000011640 | 4590 | 8B55 | 1EEC | D88E | EC81 | 005A | 5657 | 46C7 |
| 0000011660 | ABFA | 8C01 | FC5E | 46C7 | 01EC | 2B01 | 89C0 | DE46 |
| 0000011700 | 4689 | 8EDC | 1206 | 260C | 3E83 | 114C | 7500 | E903 |
| 0000011720 | 001D | 36FF | 017C | 36FF | 017A | 468D | 16D4 | 9A50 |
| 0000011740 | 0F78 | 0000 | C483 | 3D08 | 0000 | 0374 | 0FE9 | 8E00 |
| 0000011760 | 1406 | 260C | 3E83 | 0F8E | 7500 | E903 | 003A | 681E |
| 0000012000 | 01B2 | 468D | 16E0 | 8D50 | D446 | 5016 | 468D | 16F6 |
| 0000012020 | 6A50 | 1E73 | D668 | FF01 | 7836 | FF01 | 7636 | FF01 |
| 0000012040 | 7C36 | FF01 | 7A36 | 9A01 | 0FC0 | 0000 | C483 | 891E |
| 0000012060 | F646 | 5689 | E9F8 | 0008 | C02B | 4689 | 89F8 | F646 |
| 0000012100 | 46C7 | 00F4 | 8E00 | 1206 | 260C | 3E83 | 1038 | 7500 |
| 0000012120 | E903 | 0052 | 7E83 | FED8 | 0375 | 49E9 | 8B00 | 0846 |
| 0000012140 | 568B | 050A | 00CA | 5052 | 76FF | 1E06 | B968 | 8D01 |
| 0000012160 | E046 | 5016 | 468D | 16F6 | 8D50 | D446 | 5016 | 681E |
| 0000012200 | 01D6 | 7E6A | 36FF | 0178 | 36FF | 0176 | 36FF | 017C |
| 0000012220 | 36FF | 017A | 681E | 01CF | FF68 | 68FF | FFFF | FF9A |
| 0000012240 | 00FF | 830C | 2CC4 | 46C7 | 00F4 | 8D00 | A646 | 4689 |
| 0000012260 | 8CD0 | D256 | 468B | E906 | 0396 | 76FF | FF0A | 0876 |
| 0000012300 | 979A | CF23 | 8311 | 04C4 | 016A | 006A | 479A | 0727 |
| 0000012320 | 8312 | 04C4 | 9CE9 | C403 | 085E | 8026 | CABF | 0000 |
| 0000012340 | 0374 | 08E9 | C700 | F446 | 04B5 | 22E9 | FF00 | 0A76 |
| 0000012360 | 76FF | FF08 | D276 | 76FF | 8BD0 | 0846 | 568B | 050A |
| 0000012400 | 00CA | 5052 | 7E9A | 331B | 8312 | 0CC4 | 4689 | 83F4 |
| 0000012420 | F47E | 7500 | E903 | 0028 | 7E83 | 10F4 | 0374 | 59E9 |
| 0000012440 | 8B00 | 0846 | 568B | 050A | 00CA | 5052 | 681E | 017E |
| 0000012460 | 469A | A054 | 8312 | 08C4 | 003D | 7400 | E903 | 003A |
| 0000012500 | 468B | E906 | 001B | 46C7 | 01EE | E900 | 0029 | 46C7 |
| 0000012520 | 02EE | E900 | 0021 | 46C7 | 03EE | E900 | 0019 | 16E9 |
| 0000012540 | 4800 | 7548 | E903 | FFDE | 7548 | E903 | FFE0 | 7548 |
| 0000012560 | E903 | FFE2 | 00E9 | E900 | 0038 | 7E83 | 10F4 | 0374 |
| 0000012600 | 2FE9 | 8300 | 067E | 7402 | E903 | 0021 | 46C7 | 00F4 |
| 0000012620 | FF00 | D276 | 76FF | FFD0 | 0A76 | 76FF | 9A08 | 1A24 |
| 0000012640 | 12C9 | C483 | C708 | EE46 | 0001 | 05E9 | C700 | F446 |
| 0000012660 | 04BA | 7E83 | 00F4 | 0374 | 51E9 | FF00 | D276 | 76FF |
| 0000012700 | FFD0 | EE76 | 416A | A19A | EC2C | 8312 | 08C4 | 4689 |
| 0000012720 | 83F4 | F47E | 7400 | E903 | 0032 | 468B | 8B08 | 0A56 |
| 0000012740 | CA05 | 5200 | 1E50 | 7E68 | 9A01 | 5410 | 12FA | C483 |
| 0000012760 | FF08 | 0A76 | 76FF | 9A08 | 2397 | 1307 | C483 | 6A04 |
| 0000013000 | FF00 | 0676 | 479A | EA27 | 830F | 04C4 | 64E9 | C402 |
| 0000013020 | 085E | 8026 | CABF | 0000 | 0374 | 08E9 | C700 | F446 |

THU MAR 14 17:45:52 1991 SETUP.DLL PAGE 7, LINE 355

| | | | | | | | | |
|---|---|---|---|---|---|---|---|---|
| 0000013040 | 04B5 | 22E9 | FF00 | 0A76 | 76FF | FF08 | D276 | 76FF |
| 0000013060 | 8BD0 | 0846 | 568B | 050A | 00CA | 5052 | 7E9A | 6B1B |
| 0000013100 | 8313 | 0CC4 | 4689 | 83F4 | F47E | 7500 | E903 | 0028 |
| 0000013120 | 7E83 | 10F4 | 0374 | 62E9 | 8B00 | 0846 | 568B | 050A |
| 0000013140 | 00CA | 5052 | 681E | 017E | 469A | 8554 | 8313 | 08C4 |
| 0000013160 | 003D | 7400 | E903 | 0043 | 76FF | FFD2 | D076 | 006A |
| 0000013200 | 426A | A19A | A82C | 8313 | 08C4 | 4689 | 83F4 | F47E |
| 0000013220 | 7400 | E903 | 0025 | 468B | 8B08 | 0A56 | CA05 | 5200 |
| 0000013240 | 1E50 | 7E68 | 9A01 | 5410 | 13B6 | C483 | FF08 | 0A76 |
| 0000013260 | 76FF | 9A08 | 2397 | 13DA | C483 | E904 | 01B5 | 3E80 |
| 0000013300 | 017E | 7500 | E903 | 0027 | 468B | 8B08 | 0A56 | CA05 |
| 0000013320 | 5200 | 1E50 | 7E68 | 9A01 | 5446 | 13FE | C483 | 3D08 |
| 0000013340 | 0000 | 0375 | 08E9 | C700 | F446 | 04BB | 48E9 | FF00 |
| 0000013360 | D276 | 76FF | FFD0 | 0A76 | 76FF | 9A08 | 1A24 | 1410 |
| 0000013400 | C483 | FF08 | D276 | 76FF | 6AD0 | 6A00 | 9A43 | 2CA1 |
| 0000013420 | 1432 | C483 | 8908 | F446 | 7E83 | 00F4 | 0375 | 08E9 |
| 0000013440 | C700 | F446 | 04B7 | 0EE9 | FF00 | 0A76 | 76FF | 9A08 |
| 0000013460 | 2397 | 145F | C483 | E904 | 0139 | 5EC4 | 2608 | BF80 |
| 0000013500 | 00CA | 7400 | E903 | 0008 | 46C7 | B5F4 | E904 | 004F |
| 0000013520 | 76FF | FFD2 | D076 | 76FF | FF0A | 0876 | 249A | 711A |
| 0000013540 | 8314 | 08C4 | 76FF | FFD2 | D076 | 006A | 446A | A19A |
| 0000013560 | C32C | 8314 | 08C4 | 36FF | 3F68 | 36FF | 3F66 | 468B |
| 0000013600 | 8B08 | 0A56 | CA05 | 5200 | 9A50 | FFFF | 0000 | 4689 |
| 0000013620 | 83F4 | F47E | 7500 | E903 | 0005 | 46C7 | B8F4 | E904 |
| 0000013640 | 00D1 | 3E80 | 017E | 7400 | E903 | 0008 | 46C7 | B4F4 |
| 0000013660 | E904 | 004C | 76FF | FFD2 | D076 | 76FF | FF0A | 0876 |
| 0000013700 | 249A | D51A | 8314 | 08C4 | 76FF | FFD2 | D076 | 006A |
| 0000013720 | 456A | A19A | FB2C | 8314 | 08C4 | 4689 | 83F4 | F47E |
| 0000013740 | 7500 | E903 | 0008 | 46C7 | B9F4 | E904 | 0012 | 06C6 |
| 0000013760 | 017E | 6A00 | FF01 | 0676 | 479A | 1027 | 8315 | 04C4 |
| 0000014000 | 70E9 | FF00 | D276 | 76FF | 6AD0 | 6A04 | 9A41 | 2CA1 |
| 0000014020 | 158B | C483 | 8908 | F446 | 016A | 646A | 006A | 468D |
| 0000014040 | 16F0 | 9A50 | 0CF3 | 0000 | 4689 | 83F4 | F47E | 7400 |
| 0000014060 | E903 | 000E | 76FF | FFF2 | F076 | 0E9A | 000D | 8900 |
| 0000014100 | F446 | 2EE9 | C700 | F446 | 0018 | 26E9 | E900 | 0023 |
| 0000014120 | 3D48 | 0008 | 0376 | ECE9 | D1FF | 93E0 | FF2E | 61A7 |
| 0000014140 | BA15 | D711 | D711 | D711 | 0F11 | BE13 | A213 | 3A14 |
| 0000014160 | 0314 | 8315 | F47E | 7500 | E903 | 0014 | 7E83 | 04F4 |
| 0000014200 | 0375 | 0BE9 | FF00 | F476 | BC9A | C330 | 8311 | 02C4 |
| 0000014220 | 068E | 0C12 | 8326 | CA3E | 0010 | 0375 | 09E9 | 8300 |
| 0000014240 | D87E | 74FE | E903 | 000F | 068E | 0C14 | 8326 | F63E |
| 0000014260 | 0010 | 0375 | 51E9 | 8B00 | F446 | 4689 | FFDA | DE76 |
| 0000014300 | 76FF | 8DDC | DA46 | 5016 | 76FF | FFEC | FC76 | 76FF |
| 0000014320 | 8DFA | E04E | 5116 | 4E8D | 16F6 | 8D51 | D44E | 5116 |
| 0000014340 | 681E | 01D6 | 3568 | FF01 | 7836 | FF01 | 7636 | FF01 |
| 0000014360 | 7C36 | FF01 | 7A36 | 9A01 | 0F11 | 0000 | C483 | 8B28 |
| 0000014400 | DA46 | 09E9 | E900 | 0006 | 468B | E9F4 | 0000 | 5F5E |
| 0000014420 | ED83 | 8B02 | 1FE5 | 4D5D | 1ECB | 9058 | 5545 | EC8B |
| 0000014440 | 8E1E | 81D8 | 33EC | 5700 | C756 | FA46 | 01DD | 5E8C |
| 0000014460 | C7FC | 9046 | 0000 | C02B | 4689 | 8982 | 8046 | 068E |
| 0000014500 | 0C12 | 8326 | 973E | 0015 | 0375 | 1EE9 | FF00 | 7C36 |
| 0000014520 | FF01 | 7A36 | 8D01 | 7886 | 16FF | 9A50 | 10E0 | 0000 |
| 0000014540 | C483 | 3D08 | 0000 | 0374 | 0FE9 | 8E00 | 1406 | 260C |
| 0000014560 | 3E83 | 15AF | 7500 | E903 | 003C | 681E | 01E1 | 468D |
| 0000014600 | 1684 | 8D50 | 7886 | 16FF | 8D50 | F646 | 5016 | 4A68 |
| 0000014620 | 1E01 | FA68 | FF01 | 7836 | FF01 | 7636 | FF01 | 7C36 |
| 0000014640 | FF01 | 7A36 | 9A01 | 1128 | 0000 | C483 | 891E | F646 |
| 0000014660 | 5689 | E9F8 | 0008 | C02B | 4689 | 89F8 | F646 | 06C6 |
| 0000014700 | 017E | 6A00 | 6A01 | 9A00 | 2747 | 16E2 | C483 | FF04 |

THU MAR 14 17:45:52 1991 SETUP.DLL PAGE 8, LINE 414

| | | | | | | | | |
|---|---|---|---|---|---|---|---|---|
| 0000014720 | 0676 | 681E | 01E5 | 681E | 01F2 | 468D | 1692 | 9A50 |
| 0000014740 | 56AA | 16EF | C483 | 8D0E | 9246 | 5016 | 659A | 3F17 |
| 0000014760 | 8313 | 04C4 | 068E | 0C12 | 8326 | 453E | 0016 | 0375 |
| 0000015000 | 0AE9 | 8300 | 7CBE | FEFF | 0374 | 0FE9 | 8E00 | 1406 |
| 0000015020 | 260C | 3E83 | 1672 | 7500 | E903 | 003B | 468D | 1684 |
| 0000015040 | 8D50 | F646 | 5016 | 868D | FF78 | 5016 | 681E | 01FA |
| 0000015060 | 5768 | FF01 | 7836 | FF01 | 7636 | FF01 | 7C36 | FF01 |
| 0000015100 | 7A36 | 9A01 | 107E | 0000 | C483 | C71A | 7E86 | 00FF |
| 0000015120 | E900 | 0006 | 03E9 | E900 | 0000 | 5F5E | ED83 | 8B02 |
| 0000015140 | 1FE5 | 4D5D | 1ECB | 9058 | 5545 | EC8B | 8E1E | 81D8 |
| 0000015160 | 28EC | 5700 | C756 | FA46 | 0209 | 5E8C | C7FC | F046 |
| 0000015200 | 0000 | C02B | 4689 | 89E2 | E046 | 068E | 0C12 | 8326 |
| 0000015220 | 413E | 0018 | 0375 | 1DE9 | FF00 | 7C36 | FF01 | 7A36 |
| 0000015240 | 8D01 | D846 | 5016 | 5C9A | 0016 | 8300 | 08C4 | 003D |
| 0000015260 | 7400 | E903 | 000F | 068E | 0C14 | 8326 | 593E | 0018 |
| 0000015300 | 0375 | 3BE9 | 1E00 | 0D68 | 8D02 | E446 | 5016 | 468D |
| 0000015320 | 16D8 | 8D50 | F246 | 5016 | 6D68 | 1E01 | 1268 | FF02 |
| 0000015340 | 7836 | FF01 | 7636 | FF01 | 7C36 | FF01 | 7A36 | 9A01 |
| 0000015360 | 16A6 | 0000 | C483 | 891E | F246 | 5689 | E9F4 | 0008 |
| 0000015400 | C02B | 4689 | 89F4 | F246 | 749A | 2723 | 8918 | F646 |
| 0000015420 | 5689 | FFF8 | 0876 | 76FF | 8B06 | F646 | 568B | 05F8 |
| 0000015440 | 0134 | 5052 | 109A | 3554 | 8318 | 08C4 | 76FF | FFFB |
| 0000015460 | F676 | 979A | CA23 | 8316 | 04C4 | 068E | 0C12 | 8326 |
| 0000015500 | FB3E | 0016 | 0375 | 09E9 | 8300 | DC7E | 74FE | E903 |
| 0000015520 | 000F | 068E | 0C14 | 8326 | 143E | 0017 | 0375 | 39E9 |
| 0000015540 | 8D00 | E446 | 5016 | 468D | 16F2 | 8D50 | D846 | 5016 |
| 0000015560 | 681E | 0212 | 7768 | FF01 | 7836 | FF01 | 7636 | FF01 |
| 0000015600 | 7C36 | FF01 | 7A36 | 9A01 | 1744 | 0000 | C483 | C71A |
| 0000015620 | DE46 | 0000 | 06E9 | E900 | 0003 | 00E9 | 5E00 | 835F |
| 0000015640 | 02ED | E58B | 5D1F | CB4D | 581E | 4590 | 8B55 | 1EEC |
| 0000015660 | D88E | EC81 | 0024 | 5657 | 46C7 | 1EFA | 8C02 | FC5E |
| 0000015700 | 46C7 | 00F4 | 2B00 | 89C0 | E646 | 4689 | 8EE4 | 1206 |
| 0000015720 | 260C | 3E83 | 19BD | 7500 | E903 | 001D | 36FF | 017C |
| 0000015740 | 36FF | 017A | 468D | 16DC | 9A50 | 17A7 | 0000 | C483 |
| 0000015760 | 3D08 | 0000 | 0374 | 0FE9 | 8E00 | 1406 | 260C | 3E83 |
| 0000016000 | 19D5 | 7500 | E903 | 003B | 681E | 0222 | 468D | 16E8 |
| 0000016020 | 8D50 | DC46 | 5016 | 468D | 16F6 | 6850 | 018E | 681E |
| 0000016040 | 0226 | 36FF | 0178 | 36FF | 0176 | 36FF | 017C | 36FF |
| 0000016060 | 017A | F09A | 0017 | 8300 | 1EC4 | 4689 | 89F6 | F856 |
| 0000016100 | 08E9 | 2B00 | 89C0 | F846 | 4689 | 8BF6 | 0846 | 460B |
| 0000016120 | 7406 | E903 | 0020 | 5EC4 | 260A | 87C6 | 00CA | C400 |
| 0000016140 | 0A5E | C726 | 2E87 | 0301 | C400 | 0A5E | C726 | 3087 |
| 0000016160 | 0101 | E900 | 0037 | 76FF | FF08 | 0676 | 468B | 8B0A |
| 0000016200 | 0C56 | CA05 | 5200 | 9A50 | 5410 | 180B | C483 | C408 |
| 0000016220 | 065E | 8B26 | 2447 | 5EC4 | 260A | 8789 | 012E | 5EC4 |
| 0000016240 | 2606 | 478B | C426 | 0A5E | 8926 | 3087 | C401 | 0A5E |
| 0000016260 | C626 | 3487 | 0001 | 068E | 0C12 | 8326 | 913E | 0017 |
| 0000016300 | 0375 | 09E9 | 8300 | E07E | 74FE | E903 | 000F | 068E |
| 0000016320 | 0C14 | 8326 | BD3E | 0017 | 0375 | 39E9 | 8D00 | E846 |
| 0000016340 | 5016 | 468D | 16F6 | 8D50 | DC46 | 5016 | 681E | 0226 |
| 0000016360 | A168 | FF01 | 7836 | FF01 | 7636 | FF01 | 7C36 | FF01 |
| 0000016400 | 7A36 | 9A01 | 1888 | 0000 | C483 | C71A | E246 | 0000 |
| 0000016420 | 06E9 | E900 | 0003 | 00E9 | 5E00 | 835F | 02ED | E58B |
| 0000016440 | 5D1F | CB4D | 581E | 4590 | 8B55 | 1EEC | D88E | EC81 |
| 0000016460 | 0024 | 5657 | 46C7 | 32FA | 8C02 | FC5E | 46C7 | 00F4 |
| 0000016500 | 2B00 | 89C0 | E646 | 4689 | 8EE4 | 1206 | 260C | 3E83 |
| 0000016520 | 1B17 | 7500 | E903 | 001D | 36FF | 017C | 36FF | 017A |
| 0000016540 | 468D | 16DC | 9A50 | 18EA | 0000 | C483 | 3D08 | 0000 |
| 0000016560 | 0374 | 0FE9 | 8E00 | 1406 | 260C | 3E83 | 1B2F | 7500 |

THU MAR 14 17:45:52 1991 SETUP.DLL PAGE 9, LINE 473

| | | | | | | | | |
|---|---|---|---|---|---|---|---|---|
| 0000016600 | E903 | 003B | 681E | 0236 | 468D | 16E8 | 8D50 | DC46 |
| 0000016620 | 5016 | 468D | 16F6 | 6850 | 01B8 | 681E | 023A | 36FF |
| 0000016640 | 0178 | 36FF | 0176 | 36FF | 017C | 36FF | 017A | 339A |
| 0000016660 | 0019 | 8300 | 1EC4 | 4689 | 89F6 | F856 | 08E9 | 2B00 |
| 0000016700 | 89C0 | F846 | 4689 | A1F6 | 3F66 | 168B | 3F68 | 5EC4 |
| 0000016720 | 260A | 4789 | 2620 | 5789 | 8B22 | 0646 | 568B | 0508 |
| 0000016740 | 00CA | 5052 | 76FF | FF0C | 0A76 | 109A | 8A54 | 8319 |
| 0000016760 | 08C4 | 5EC4 | 2606 | 878B | 012E | 5EC4 | 260A | 4789 |
| 0000017000 | C424 | 065E | 8B26 | 3087 | C401 | 0A5E | 8926 | 2647 |
| 0000017020 | 068E | 0C12 | 8326 | D43E | 0018 | 0375 | 09E9 | 8300 |
| 0000017040 | E07E | 74FE | E903 | 000F | 068E | 0C14 | 8326 | 003E |
| 0000017060 | 0019 | 0375 | 39E9 | 8D00 | E846 | 5016 | 468D | 16F6 |
| 0000017100 | 8D50 | DC46 | 5016 | 681E | 023A | C168 | FF01 | 7836 |
| 0000017120 | FF01 | 7636 | FF01 | 7C36 | FF01 | 7A36 | 9A01 | 1A04 |
| 0000017140 | 0000 | C483 | C71A | E246 | 0000 | 06E9 | E900 | 0003 |
| 0000017160 | 00E9 | 5E00 | 835F | 02ED | E58B | 5D1F | CB4D | 581E |
| 0000017200 | 4590 | 8B55 | 1EEC | D88E | EC81 | 00D2 | 5657 | 46C7 |
| 0000017220 | 46FA | 8C02 | FC5E | 86C7 | FF46 | 0000 | C02B | 8689 |
| 0000017240 | FF38 | 8689 | FF36 | 068E | 0C12 | 8326 | F63E | 001C |
| 0000017260 | 0375 | 1EE9 | FF00 | 7C36 | FF01 | 7A36 | 8D01 | 2E86 |
| 0000017300 | 16FF | 9A50 | 1A66 | 0000 | C483 | 3D08 | 0000 | 0374 |
| 0000017320 | 0FE9 | 8E00 | 1406 | 260C | 3E83 | 1D0F | 7500 | E903 |
| 0000017340 | 003D | 681E | 024A | 868D | FF3A | 5016 | 868D | FF2E |
| 0000017360 | 5016 | 468D | 16F6 | 6850 | 01D9 | 681E | 024E | 36FF |
| 0000017400 | 0178 | 36FF | 0176 | 36FF | 017C | 36FF | 017A | AF9A |
| 0000017420 | 001A | 8300 | 1EC4 | 4689 | 89F6 | F856 | 08E9 | 2B00 |
| 0000017440 | 89C0 | F846 | 4689 | C7F6 | F446 | 0000 | 36FF | 3F68 |
| 0000017460 | 36FF | 3F66 | 76FF | FF08 | 0676 | 868D | FF48 | 5016 |
| 0000017500 | FF9A | 00FF | 8900 | F446 | 7E83 | 00F4 | 0374 | 8FE9 |
| 0000017520 | 8B00 | 0C46 | 460B | 750A | E903 | 003C | 66A1 | 8B3F |
| 0000017540 | 6816 | C43F | 0A5E | 8926 | 2047 | 8926 | 2257 | 868D |
| 0000017560 | FF4C | 5016 | 76FF | FF0C | 0A76 | 109A | B754 | 831C |
| 0000017600 | 08C4 | 868B | FF70 | 5EC4 | 260A | 4789 | 8B24 | 7286 |
| 0000017620 | C4FF | 0A5E | 8926 | 2647 | 468B | 0B10 | 0E46 | 0375 |
| 0000017640 | 3AE9 | 8D00 | 4C86 | 16FF | 8B50 | 0E46 | 568B | 0510 |
| 0000017660 | 00CA | 5052 | 109A | ED54 | 831A | 08C4 | 868B | FF70 |
| 0000017700 | 5EC4 | 260E | 8789 | 012E | 868B | FF72 | 5EC4 | 260E |
| 0000017720 | 8789 | 0130 | 5EC4 | 260E | 87C6 | 0134 | E900 | 000F |
| 0000017740 | 7E81 | ABF4 | 7401 | E903 | 0005 | 46C7 | 10F4 | 8E00 |
| 0000017760 | 1206 | 260C | 3E83 | 1A50 | 7500 | E903 | 000A | DE83 |
| 0000020000 | FF32 | 74FE | E903 | 000F | 068E | 0C14 | 8326 | 7C3E |
| 0000020020 | 001A | 0375 | 59E9 | 8B00 | F446 | 8689 | FF34 | B6FF |
| 0000020040 | FF38 | B6FF | FF36 | 868D | FF34 | 5016 | B6FF | FF46 |
| 0000020060 | 76FF | FFFC | FA76 | 8E8D | FF3A | 5116 | 4E8D | 16F6 |
| 0000020100 | 8D51 | 2E8E | 16FF | 1E51 | 4E68 | 6802 | 01F9 | 36FF |
| 0000020120 | 0178 | 36FF | 0176 | 36FF | 017C | 36FF | 017A | F89A |
| 0000020140 | 0015 | 8300 | 28C4 | 868B | FF34 | 09E9 | E900 | 0006 |
| 0000020160 | 468B | E9F4 | 0000 | 5F5E | ED83 | 8B02 | 1FE5 | 4D5D |
| 0000020200 | 1ECB | 9058 | 5545 | EC8B | 8E1E | 81D8 | 24EC | 5700 |
| 0000020220 | C756 | FA46 | 0258 | 5E8C | C7FC | F446 | 0000 | C02B |
| 0000020240 | 4689 | 89E6 | E446 | 068E | 0C12 | 8326 | 383E | 001E |
| 0000020260 | 0375 | 1DE9 | FF00 | 7C36 | FF01 | 7A36 | 8D01 | DC46 |
| 0000020300 | 5016 | C49A | 001B | 8300 | 08C4 | 003D | 7400 | E903 |
| 0000020320 | 000F | 068E | 0C14 | 8326 | 503E | 001E | 0375 | 3BE9 |
| 0000020340 | 1E00 | 5C68 | 8D02 | E846 | 5016 | 468D | 16DC | 8D50 |
| 0000020360 | F646 | 5016 | 0F68 | 1E02 | 6068 | FF02 | 7836 | FF01 |
| 0000020400 | 7636 | FF01 | 7C36 | FF01 | 7A36 | 9A01 | 1C0F | 0000 |
| 0000020420 | C483 | 891E | F646 | 5689 | E9F8 | 0008 | C02B | 4689 |
| 0000020440 | 89F8 | F646 | 468B | 8B06 | 0856 | 66A3 | 893F | 6816 |

THU MAR 14 17:45:52 1991 SETUP.DLL PAGE 10, LINE 532

| | | | | | | | | |
|---|---|---|---|---|---|---|---|---|
| 0000020460 | 8E3F | 1206 | 260C | 3E83 | 1BAD | 7500 | E903 | 0009 |
| 0000020500 | 7E83 | FEE0 | 0374 | 0FE9 | 8E00 | 1406 | 260C | 3E83 |
| 0000020520 | 1BDA | 7500 | E903 | 0039 | 468D | 16E8 | 8D50 | F646 |
| 0000020540 | 5016 | 468D | 16DC | 1E50 | 6068 | 6802 | 0214 | 36FF |
| 0000020560 | 0178 | 36FF | 0176 | 36FF | 017C | 36FF | 017A | 5E9A |
| 0000020600 | 001B | 8300 | 1AC4 | 46C7 | 00E2 | E900 | 0006 | 03E9 |
| 0000020620 | E900 | 0000 | 5F5E | ED83 | 8B02 | 1FE5 | 4D5D | 00CB |
| 0000020640 | 581E | 4590 | 8B55 | 1EEC | D88E | EC81 | 002C | 5657 |
| 0000020660 | 46C7 | 86FA | 8C02 | FC5E | 46C7 | 01EC | 2B01 | 89C0 |
| 0000020700 | DE46 | 4689 | 8EDC | 1606 | 260C | 3E83 | 1DAD | 7500 |
| 0000020720 | E903 | 001D | 36FF | 029A | 36FF | 0298 | 468D | 16D4 |
| 0000020740 | 9A50 | 1DC3 | 0000 | C483 | 3D08 | 0000 | 0374 | 0FE9 |
| 0000020760 | 8E00 | 1806 | 260C | 3E83 | 1FF0 | 7500 | E903 | 003A |
| 0000021000 | 681E | 028D | 468D | 16E0 | 8D50 | D446 | 5016 | 468D |
| 0000021020 | 16F2 | 6A50 | 1E53 | A068 | FF02 | 9636 | FF02 | 9436 |
| 0000021040 | FF02 | 9A36 | FF02 | 9836 | 9A02 | 1E0C | 0000 | C483 |
| 0000021060 | 891E | F246 | 5689 | E9F4 | 0008 | C02B | 4689 | 89F4 |
| 0000021100 | F246 | 46C7 | 00F0 | 8D00 | EE46 | 5016 | FF9A | 00FF |
| 0000021120 | 8900 | F046 | 7E83 | 00F0 | 0374 | 0DE9 | 8D00 | F646 |
| 0000021140 | 5016 | FF9A | 00FF | 8900 | F046 | 7E83 | 00F0 | 0374 |
| 0000021160 | 5EE9 | C400 | 065E | C726 | 6C07 | 6807 | 0198 | 76FF |
| 0000021200 | FF08 | 0676 | 681E | 3F6E | A89A | A557 | 831F | 0AC4 |
| 0000021220 | 06C7 | 3F6A | 3F6E | 1E8C | 3F6C | 006A | 016A | 76FF |
| 0000021240 | FFF8 | F676 | 7D68 | 681C | FFFF | 76FF | 68EE | 076C |
| 0000021260 | 006A | 006A | FF9A | 00FF | A300 | 029C | 1689 | 029E |
| 0000021300 | 9EA1 | 0B02 | 9C06 | 7402 | E903 | 0005 | 46C7 | B0F0 |
| 0000021320 | 8E04 | 1606 | 260C | 3E83 | 1ECC | 7500 | E903 | 0009 |
| 0000021340 | 7E83 | FED8 | 0374 | 0FE9 | 8E00 | 1806 | 260C | 3E83 |
| 0000021360 | 1DD9 | 7500 | E903 | 0050 | 468B | 89F0 | DA46 | 76FF |
| 0000021400 | FFDE | DC76 | 468D | 16DA | FF50 | EC76 | 76FF | FFFC |
| 0000021420 | FA76 | 4E8D | 16E0 | 8D51 | F24E | 5116 | 4E8D | 16D4 |
| 0000021440 | 1E51 | A068 | 6A02 | FF6E | 9636 | FF02 | 9436 | FF02 |
| 0000021460 | 9A36 | FF02 | 9836 | 9A02 | 1D5F | 0000 | C483 | 8B28 |
| 0000021500 | DA46 | 09E9 | E900 | 0006 | 468B | E9F0 | 0000 | 5F5E |
| 0000021520 | ED83 | 8B02 | 1FE5 | 4D5D | 1ECB | 9058 | 5545 | EC8B |
| 0000021540 | 8E1E | 81D8 | 08EC | 5700 | 1E56 | BFB8 | 8E0D | 8BD8 |
| 0000021560 | 0E46 | ADE9 | FF02 | 1276 | 76FF | 6810 | 076E | 4368 |
| 0000021600 | 6A01 | 6A00 | 6A63 | 6A00 | 9A00 | 20A3 | 0000 | 76FF |
| 0000021620 | FF12 | 1076 | 7868 | 6807 | 0143 | 006A | 636A | 006A |
| 0000021640 | 006A | FF9A | 00FF | 8B00 | 1046 | 568B | A312 | 029C |
| 0000021660 | 1689 | 029E | 6AA1 | 8B3F | 6C16 | 053F | 0002 | D00B |
| 0000021700 | 0375 | 1AE9 | FF00 | 1276 | 76FF | A110 | 3F6A | 168B |
| 0000021720 | 3F6C | 0205 | 5200 | 9A50 | FFFF | 0000 | 4689 | A1FA |
| 0000021740 | 3F6A | 168B | 3F6C | 6605 | 0B00 | 75D0 | E903 | 001D |
| 0000021760 | 76FF | FF12 | 1076 | 6D68 | A107 | 3F6A | 168B | 3F6C |
| 0000022000 | 6605 | 5200 | 9A50 | FFFF | 0000 | 4689 | FFFA | 6C36 |
| 0000022020 | FF3F | 6A36 | 6A3F | 9A01 | 109E | 1F8B | C483 | B806 |
| 0000022040 | 0000 | 00BA | E900 | 023E | 006A | 016A | 76FF | FF12 |
| 0000022060 | 1076 | 681E | 02AE | 6AA1 | 8B3F | 6C16 | 053F | 0002 |
| 0000022100 | 5052 | 006A | 206A | FF9A | 00FF | B800 | 0000 | 00BA |
| 0000022120 | E900 | 0212 | 468B | E90A | 0060 | 1EC4 | 3F6A | C726 |
| 0000022140 | 2E87 | 0101 | E900 | 0071 | 1EC4 | 3F6A | C726 | 2E87 |
| 0000022160 | 0201 | E900 | 0063 | 1EC4 | 3F6A | C726 | 2E87 | 0301 |
| 0000022200 | E900 | 0055 | 1EC4 | 3F6A | C726 | 3087 | 0101 | E900 |
| 0000022220 | 0047 | 1EC4 | 3F6A | C726 | 3087 | 0201 | E900 | 0039 |
| 0000022240 | 1EC4 | 3F6A | C726 | 3087 | 0301 | E900 | 002B | 00B8 |
| 0000022260 | BA00 | 0000 | AFE9 | E901 | 001F | 6F2D | 3D07 | 0005 |
| 0000022300 | 0376 | E9E9 | D1FF | 93E0 | FF2E | CDA7 | 5A21 | 6821 |
| 0000022320 | 7621 | 8421 | 9221 | A021 | B821 | 0000 | 00BA | E900 |

THU MAR 14 17:45:52 1991 SETUP.DLL PAGE 11, LINE 591

| | | | | | | | | |
|---|---|---|---|---|---|---|---|---|
| 0000022340 | 0184 | 468B | E90A | 0089 | 46C7 | 02FC | E900 | 00C5 |
| 0000022360 | 46C7 | 03FC | E900 | 00BD | 46C7 | 04FC | E900 | 00B5 |
| 0000022400 | 46C7 | 05FC | E900 | 00AD | 46C7 | 06FC | E900 | 00A5 |
| 0000022420 | 46C7 | 07FC | E900 | 009D | 46C7 | 08FC | E900 | 0095 |
| 0000022440 | 36FF | 3F6C | 36FF | 3F6A | 096A | 9E9A | C910 | 8322 |
| 0000022460 | 06C4 | 4689 | 83F8 | F87E | 7400 | E903 | 0024 | 76FF |
| 0000022500 | FF12 | 1076 | 006A | 0F9A | 0023 | FF00 | 1276 | 76FF |
| 0000022520 | 9A10 | FFFF | 0000 | 00B8 | BA00 | 0000 | 07E9 | E901 |
| 0000022540 | 0009 | 00B8 | BA00 | 0000 | FBE9 | E900 | 0047 | 44E9 |
| 0000022560 | 3D00 | 0779 | 0375 | 87E9 | 76FF | E903 | 0018 | 4848 |
| 0000022600 | 0375 | 9BE9 | 2DFF | 0774 | 0375 | 63E9 | 48FF | 0375 |
| 0000022620 | 65E9 | E9FF | FFD5 | 7A2D | 7507 | E903 | FF6A | 7548 |
| 0000022640 | E903 | FF74 | 7548 | E903 | FF66 | 032D | 7500 | E903 |
| 0000022660 | FF36 | B6E9 | 83FF | FC7E | 7509 | E903 | 0023 | 36FF |
| 0000022700 | 3F6C | 36FF | 3F6A | 4D9A | DC29 | 8322 | 04C4 | 36FF |
| 0000022720 | 3F6C | 36FF | 3F6A | 76FF | 9AFC | 109E | 2301 | C483 |
| 0000022740 | B806 | 0000 | 00BA | E900 | 007C | 7E81 | 040A | 7480 |
| 0000022760 | E903 | 0028 | 36FF | 3F6C | 36FF | 3F6A | 096A | 9E9A |
| 0000023000 | 1A10 | 8321 | 06C4 | 76FF | FF12 | 1076 | 006A | FF9A |
| 0000023020 | 00FF | B800 | 0000 | 00BA | E900 | 004A | 2AE9 | E900 |
| 0000023040 | 0027 | 202D | 7500 | E903 | FEB8 | 7548 | E903 | FFBA |
| 0000023060 | 7548 | E903 | FDF2 | 0E2D | 7500 | E903 | FE16 | 0B2D |
| 0000023100 | 7500 | E903 | FD2F | D3E9 | FFFF | 1276 | 76FF | FF10 |
| 0000023120 | 0E76 | 76FF | FF0C | 0A76 | 76FF | FF08 | 0676 | FF9A |
| 0000023140 | 00FF | E900 | 0000 | 5E1F | 835F | 02ED | E58B | 5D1F |
| 0000023160 | CA4D | 000E | 581E | 4590 | 8B55 | 1EEC | D88E | EC81 |
| 0000023200 | 0000 | 5657 | 6EB8 | 8C3F | E9DA | 0000 | 5F5E | ED83 |
| 0000023220 | 8B02 | 1FE5 | 4D5D | 1ECB | 9058 | 5545 | EC8B | 8E1E |
| 0000023240 | 81D8 | 24EC | 5700 | C756 | FA46 | 02C7 | 5E8C | C7FC |
| 0000023260 | F446 | 0000 | C02B | 4689 | 89E6 | E446 | 068E | 0C16 |
| 0000023300 | 8326 | B93E | 0025 | 0375 | 1DE9 | FF00 | 9A36 | FF02 |
| 0000023320 | 9836 | 8D02 | DC46 | 5016 | E29A | 001E | 8300 | 08C4 |
| 0000023340 | 003D | 7400 | E903 | 000F | 068E | 0C18 | 8326 | D13E |
| 0000023360 | 0025 | 0375 | 3BE9 | 1E00 | CB68 | 8D02 | E846 | 5016 |
| 0000023400 | 468D | 16DC | 8D50 | F646 | 5016 | 5968 | 1E01 | D068 |
| 0000023420 | FF02 | 9636 | FF02 | 9436 | FF02 | 9A36 | FF02 | 9836 |
| 0000023440 | 9A02 | 1F2A | 0000 | C483 | 891E | F646 | 5689 | E9F8 |
| 0000023460 | 0008 | C02B | 4689 | 89F8 | F646 | 468B | 8B06 | 0856 |
| 0000023500 | BF1E | 3F6E | F08B | 071E | DA8E | CCB9 | F300 | 1FA5 |
| 0000023520 | 36FF | 029E | 36FF | 029C | 6E68 | 8B07 | 0646 | 568B |
| 0000023540 | 0508 | 00CA | 5052 | AE9A | 0025 | FF00 | 9E36 | FF02 |
| 0000023560 | 9C36 | 6802 | 076F | 2568 | C401 | 065E | 8326 | 2EBF |
| 0000023600 | 0101 | 0374 | 06E9 | B800 | 0001 | 03E9 | B800 | 0000 |
| 0000023620 | D22B | 5052 | 006A | 006A | CB9A | 0024 | FF00 | 9E36 |
| 0000023640 | FF02 | 9C36 | 6802 | 0770 | 2568 | C401 | 065E | 8326 |
| 0000023660 | 2EBF | 0201 | 0374 | 06E9 | B800 | 0001 | 03E9 | B800 |
| 0000023700 | 0000 | D22B | 5052 | 006A | 006A | FD9A | 0024 | FF00 |
| 0000023720 | 9E36 | FF02 | 9C36 | 6802 | 0771 | 2568 | C401 | 065E |
| 0000023740 | 8326 | 2EBF | 0301 | 0374 | 06E9 | B800 | 0001 | 03E9 |
| 0000023760 | B800 | 0000 | D22B | 5052 | 006A | 006A | 2F9A | 0025 |
| 0000024000 | FF00 | 9E36 | FF02 | 9C36 | 6802 | 0772 | 2568 | C401 |
| 0000024020 | 065E | 8326 | 30BF | 0101 | 0374 | 06E9 | B800 | 0001 |
| 0000024040 | 03E9 | B800 | 0000 | D22B | 5052 | 006A | 006A | 619A |
| 0000024060 | 0025 | FF00 | 9E36 | FF02 | 9C36 | 6802 | 0773 | 2568 |
| 0000024100 | C401 | 065E | 8326 | 30BF | 0201 | 0374 | 06E9 | B800 |
| 0000024120 | 0001 | 03E9 | B800 | 0000 | D22B | 5052 | 006A | 006A |
| 0000024140 | 939A | 0025 | FF00 | 9E36 | FF02 | 9C36 | 6802 | 0774 |
| 0000024160 | 2568 | C401 | 065E | 8326 | 30BF | 0301 | 0374 | 06E9 |
| 0000024200 | B800 | 0001 | 03E9 | B800 | 0000 | D22B | 5052 | 006A |

THU MAR 14 17:45:52 1991 SETUP.DLL PAGE 12, LINE 650

| | | | | | | | | |
|---|---|---|---|---|---|---|---|---|
| 0000024220 | 006A | 8A9A | 0020 | FF00 | 9E36 | FF02 | 9C36 | 6802 |
| 0000024240 | 0778 | 468B | 8B06 | 0856 | 3405 | 5201 | 9A50 | 2106 |
| 0000024260 | 0000 | 068E | 0C16 | 8326 | D83E | 001F | 0375 | 09E9 |
| 0000024300 | 8300 | E07E | 74FE | E903 | 000F | 068E | 0C18 | 8326 |
| 0000024320 | F83E | 001E | 0375 | 39E9 | 8D00 | E846 | 5016 | 468D |
| 0000024340 | 16F6 | 8D50 | DC46 | 5016 | 681E | 02D0 | 7268 | FF01 |
| 0000024360 | 9636 | FF02 | 9436 | FF02 | 9A36 | FF02 | 9836 | 9A02 |
| 0000024400 | 1E7F | 0000 | C483 | C71A | E246 | 0000 | 06E9 | E900 |
| 0000024420 | 0003 | 00E9 | 5E00 | 835F | 02ED | E58B | 5D1F | CB4D |
| 0000024440 | 581E | 4590 | 8B55 | 1EEC | D88E | EC81 | 0024 | 5657 |
| 0000024460 | 46C7 | E1FA | 8C02 | FC5E | 46C7 | 00F4 | 2B00 | 89C0 |
| 0000024500 | E646 | 4689 | 8EE4 | 1606 | 260C | 3E83 | 2650 | 7500 |
| 0000024520 | E903 | 001D | 36FF | 029A | 36FF | 0298 | 468D | 16DC |
| 0000024540 | 9A50 | 23D9 | 0000 | C483 | 3D08 | 0000 | 0374 | 0FE9 |
| 0000024560 | 8E00 | 1806 | 260C | 3E83 | 26F8 | 7500 | E903 | 003B |
| 0000024600 | 681E | 02E5 | 468D | 16E8 | 8D50 | DC46 | 5016 | 468D |
| 0000024620 | 16F6 | 6850 | 0187 | 681E | 02EA | 36FF | 0296 | 36FF |
| 0000024640 | 0294 | 36FF | 029A | 36FF | 0298 | 229A | 0024 | 8300 |
| 0000024660 | 1EC4 | 4689 | 89F6 | F856 | 08E9 | 2B00 | 89C0 | F846 |
| 0000024700 | 4689 | FFF6 | 9E36 | FF02 | 9C36 | 6802 | 0778 | 76FF |
| 0000024720 | FF08 | 0676 | 679A | 0024 | 8E00 | 1606 | 260C | 3E83 |
| 0000024740 | 23C3 | 7500 | E903 | 0009 | 7E83 | FEE0 | 0374 | 0FE9 |
| 0000024760 | 8E00 | 1806 | 260C | 3E83 | 23EF | 7500 | E903 | 0039 |
| 0000025000 | 468D | 16E8 | 8D50 | F646 | 5016 | 468D | 16DC | 1E50 |
| 0000025020 | EA68 | 6802 | 018D | 36FF | 0296 | 36FF | 0294 | 36FF |
| 0000025040 | 029A | 36FF | 0298 | 009A | 0026 | 8300 | 1AC4 | 46C7 |
| 0000025060 | 00E2 | E900 | 0006 | 03E9 | E900 | 0000 | 5F5E | ED83 |
| 0000025100 | 8B02 | 1FE5 | 4D5D | 1ECB | 9058 | 5545 | EC8B | 8E1E |
| 0000025120 | 81D8 | 08EC | 5700 | FF56 | 9E36 | FF02 | 9C36 | 6802 |
| 0000025140 | 077C | FF9A | 00FF | 5200 | 8350 | 087E | 1B01 | F7C0 |
| 0000025160 | 50D8 | FF9A | 00FF | FF00 | 9E36 | FF02 | 9C36 | 6802 |
| 0000025200 | 076E | 9D9A | 0027 | 5200 | FF50 | 0876 | A79A | 0027 |
| 0000025220 | FF00 | 9E36 | FF02 | 9C36 | 6802 | 076F | B79A | 0027 |
| 0000025240 | 5200 | FF50 | 0876 | C19A | 0027 | FF00 | 9E36 | FF02 |
| 0000025260 | 9C36 | 6802 | 0770 | D19A | 0027 | 5200 | FF50 | 0876 |
| 0000025300 | DB9A | 0027 | FF00 | 9E36 | FF02 | 9C36 | 6802 | 0771 |
| 0000025320 | EB9A | 0027 | 5200 | FF50 | 0876 | F59A | 0027 | FF00 |
| 0000025340 | 9E36 | FF02 | 9C36 | 6802 | 0772 | 059A | 0028 | 5200 |
| 0000025360 | FF50 | 0876 | 0F9A | 0028 | FF00 | 9E36 | FF02 | 9C36 |
| 0000025400 | 6802 | 0773 | 1F9A | 0028 | 5200 | FF50 | 0876 | 299A |
| 0000025420 | 0028 | FF00 | 9E36 | FF02 | 9C36 | 6802 | 0774 | 399A |
| 0000025440 | 0028 | 5200 | FF50 | 0876 | 439A | 0028 | FF00 | 9E36 |
| 0000025460 | FF02 | 9C36 | 6802 | 0779 | 539A | 0028 | 5200 | FF50 |
| 0000025500 | 0876 | 5D9A | 0028 | FF00 | 9E36 | FF02 | 9C36 | 6802 |
| 0000025520 | 077A | 6D9A | 0028 | 5200 | FF50 | 0876 | 779A | 0028 |
| 0000025540 | FF00 | 9E36 | FF02 | 9C36 | 6802 | 077B | 869A | 0028 |
| 0000025560 | 5200 | FF50 | 0876 | 909A | 0028 | FF00 | 9E36 | FF02 |
| 0000025600 | 9C36 | 6A02 | 9A01 | 28A0 | 0000 | 5052 | 76FF | 9A08 |
| 0000025620 | 28C9 | 0000 | 36FF | 029E | 36FF | 029C | 7F68 | 9A07 |
| 0000025640 | 28D9 | 0000 | 5052 | 7E83 | 0008 | 0375 | 06E9 | B800 |
| 0000025660 | 0001 | 12E9 | 8300 | 067E | 7402 | E903 | 0006 | 01B8 |
| 0000025700 | E900 | 0003 | 00B8 | 5000 | 029A | 0029 | FF00 | 9E36 |
| 0000025720 | FF02 | 9C36 | 6802 | 0776 | 129A | 0029 | 5200 | 8350 |
| 0000025740 | 087E | 7500 | E903 | 0006 | 01B8 | E900 | 0012 | 7E83 |
| 0000025760 | 0306 | 0374 | 06E9 | B800 | 0001 | 03E9 | B800 | 0000 |
| 0000026000 | 9A50 | 293B | 0000 | 36FF | 029E | 36FF | 029C | 7768 |
| 0000026020 | 9A07 | 2763 | 0000 | 5052 | 7E83 | 0008 | 0375 | 06E9 |
| 0000026040 | B800 | 0001 | 12E9 | 8300 | 067E | 7404 | E903 | 0006 |
| 0000026060 | 01B8 | E900 | 0003 | 00B8 | 5000 | 739A | 0027 | E900 |

THU MAR 14 17:45:52 1991 SETUP.DLL PAGE 13, LINE 709

| | | | | | | | | |
|---|---|---|---|---|---|---|---|---|
| 0000026100 | 0000 | 5F5E | ED83 | 8B02 | 1FE5 | 4D5D | 1ECB | 9058 |
| 0000026120 | 5545 | EC8B | 8E1E | 81D8 | 28EC | 5700 | C756 | FA46 |
| 0000026140 | 02F5 | 5E8C | C7FC | F246 | 0101 | C02B | 4689 | 89E2 |
| 0000026160 | E046 | 068E | 0C16 | 8326 | 2E3E | 002A | 0375 | 1DE9 |
| 0000026200 | FF00 | 9A36 | FF02 | 9836 | 8D02 | D846 | 5016 | 629A |
| 0000026220 | 0026 | 8300 | 08C4 | 003D | 7400 | E903 | 000F | 068E |
| 0000026240 | 0C18 | 8326 | 463E | 002A | 0375 | 3BE9 | 1E00 | FC68 |
| 0000026260 | 8D02 | E646 | 5016 | 468D | 16D8 | 8D50 | F646 | 5016 |
| 0000026300 | C768 | 1E01 | 0468 | FF03 | 9636 | FF02 | 9436 | FF02 |
| 0000026320 | 9A36 | FF02 | 9836 | 9A02 | 26AB | 0000 | C483 | 891E |
| 0000026340 | F646 | 5689 | E9F8 | 0008 | C02B | 4689 | 89F8 | F646 |
| 0000026360 | 46C7 | 00F4 | FF00 | 9E36 | FF02 | 9C36 | 6802 | 076E |
| 0000026400 | 1F6A | 468B | 8B06 | 0856 | CA05 | 5200 | 9A50 | FFFF |
| 0000026420 | 0000 | 4689 | 83E4 | E47E | 7400 | E903 | 0009 | 5EC4 |
| 0000026440 | 2606 | 87C6 | 00CA | 8E00 | 1606 | 260C | 3E83 | 264C |
| 0000026460 | 7500 | E903 | 0009 | 7E83 | FEDC | 0374 | 0FE9 | 8E00 |
| 0000026500 | 1806 | 260C | 3E83 | 2678 | 7500 | E903 | 0051 | 468B |
| 0000026520 | 89F4 | DE46 | 76FF | FFE2 | E076 | 468D | 16DE | FF50 |
| 0000026540 | F276 | 76FF | FFFC | FA76 | 4E8D | 16E6 | 8D51 | F64E |
| 0000026560 | 5116 | 4E8D | 16D8 | 1E51 | 0468 | 6803 | 01D6 | 36FF |
| 0000026600 | 0296 | 36FF | 0294 | 36FF | 029A | 36FF | 0298 | 389A |
| 0000026620 | 0020 | 8300 | 28C4 | 468B | E9DE | 0009 | 06E9 | 8B00 |
| 0000026640 | F446 | 00E9 | 5E00 | 835F | 02ED | E58B | 5D1F | CB4D |
| 0000026660 | 581E | 4590 | 8B55 | 1EEC | D88E | EC81 | 0000 | 5657 |
| 0000026700 | 9CA1 | 8B02 | 9E16 | E902 | 0000 | 5F5E | ED83 | 8B02 |
| 0000026720 | 1FE5 | 4D5D | 00CB | 581E | 4590 | 8B55 | 1EEC | D88E |
| 0000026740 | EC81 | 0028 | 5657 | 46C7 | 2AFA | 8C03 | FC5E | 46C7 |
| 0000026760 | 01F2 | 2B01 | 39C0 | E446 | 4689 | 8EE2 | 1A06 | 260C |
| 0000027000 | 3E83 | 2979 | 7500 | E903 | 001D | 36FF | 038C | 36FF |
| 0000027020 | 038A | 468D | 16DA | 9A50 | 298F | 0000 | C483 | 3D08 |
| 0000027040 | 0000 | 0374 | 0FE9 | 8E00 | 1C06 | 260C | 3E83 | 2C38 |
| 0000027060 | 7500 | E903 | 003A | 681E | 0331 | 468D | 16E6 | 8D50 |
| 0000027100 | DA46 | 5016 | 468D | 16F6 | 6A50 | 1E49 | 8E68 | FF03 |
| 0000027120 | 8836 | FF03 | 8636 | FF03 | 8C36 | FF03 | 8A36 | 9A03 |
| 0000027140 | 29D8 | 0000 | C483 | 891E | F646 | 5689 | E9F8 | 0008 |
| 0000027160 | C02B | 4689 | 89F8 | F646 | 46C7 | 00F4 | 8300 | 0A7E |
| 0000027200 | 7500 | E903 | 0021 | 7E83 | 000C | 0375 | 18E9 | FF00 |
| 0000027220 | 0876 | 76FF | 6A06 | 6A00 | 9A43 | 2CA1 | 2BAA | C483 |
| 0000027240 | 8908 | F446 | 72E9 | 9A00 | 2AB0 | 2BE0 | 5052 | 7E83 |
| 0000027260 | 000A | 0375 | 06E9 | B800 | 0338 | 03E9 | B800 | 0360 |
| 0000027300 | 501E | 1568 | 9A41 | FFFF | 0000 | 4689 | 8BD8 | D846 |
| 0000027320 | 2EE9 | FF00 | 0876 | 76FF | 6A06 | 6A00 | 9A43 | 2CA1 |
| 0000027340 | 222D | C483 | 8908 | F446 | 2EE9 | E900 | 002B | 46C7 |
| 0000027360 | 04F4 | E900 | 0023 | 46C7 | 01F4 | E900 | 001B | 18E9 |
| 0000027400 | 4800 | 7548 | E903 | FFE6 | 042D | 7500 | E903 | FFC3 |
| 0000027420 | 7548 | E903 | FFD5 | DDE9 | 8EFF | 1A06 | 260C | 3E83 |
| 0000027440 | 2B02 | 7500 | E903 | 0009 | 7E83 | FEDE | 0374 | 0FE9 |
| 0000027460 | 8E00 | 1C06 | 260C | 3E83 | 29A5 | 7500 | E903 | 0050 |
| 0000027500 | 468B | 89F4 | E046 | 76FF | FFE4 | E276 | 468D | 16E0 |
| 0000027520 | FF50 | F276 | 76FF | FFFC | FA76 | 4E8D | 16E6 | 8D51 |
| 0000027540 | F64E | 5116 | 4E8D | 16DA | 1E51 | 8E68 | 6A03 | FF78 |
| 0000027560 | 8836 | FF03 | 8636 | FF03 | 8C36 | FF03 | 8A36 | 9A03 |
| 0000027600 | 2A8F | 0000 | C483 | 8B28 | E046 | 09E9 | E900 | 0006 |
| 0000027620 | 468B | E9F4 | 0000 | 5F5E | ED83 | 8B02 | 1FE5 | 4D5D |
| 0000027640 | 1ECB | 9058 | 5545 | EC8B | 8E1E | 81D8 | 2AEC | 5700 |
| 0000027660 | C756 | FA46 | 039A | 5E8C | C7FC | F246 | 0101 | C02B |
| 0000027700 | 4689 | 89E4 | E246 | 068E | 0C1A | 8326 | 853E | 002D |
| 0000027720 | 0375 | 1DE9 | FF00 | 8C36 | FF03 | 8A36 | 8D03 | DA46 |
| 0000027740 | 5016 | 189A | 002B | 8300 | 08C4 | 003D | 7400 | E903 |

THU MAR 14 17:45:52 1991 SETUP.DLL PAGE 14, LINE 768

```
0000027760  000F  068E  0C1C  8326  9D3E  002D  0375  3BE9
0000030000  1E00  A168  8D03  E646  5016  468D  16DA  8D50
0000030020  F646  5016  8F68  1E00  A868  FF03  8836  FF03
0000030040  8636  FF03  8C36  FF03  8A36  9A03  2B60  0000
0000030060  C483  891E  F646  5689  E9F8  0008  C02B  4689
0000030100  89F8  F646  46C7  00F4  8B00  0846  5EC4  260A
0000030120  4789  FF28  0676  76FF  FF0C  0A76  2A6A  468D
0000030140  16D6  9A50  FFFF  0000  4689  83F4  F47E  7400
0000030160  E903  000A  5EC4  26D6  478B  8914  F446  068E
0000030200  0C1A  8326  203E  002C  0375  09E9  8300  DE7E
0000030220  74FE  E903  000F  068E  0C1C  8326  2E3E  002B
0000030240  0375  51E9  8B00  F446  4689  FFE0  E476  76FF
0000030260  8DE2  E046  5016  76FF  FFF2  FC76  76FF  8DFA
0000030300  E64E  5116  4E8D  16F6  8D51  DA4E  5116  681E
0000030320  03A8  A068  FF00  8836  FF03  8636  FF03  8C36
0000030340  FF03  8A36  9A03  2C80  0000  C483  8B28  E046
0000030360  09E9  E900  0006  468B  E9F4  0000  5F5E  ED83
0000030400  8B02  1FE5  4D5D  1ECB  9058  5545  EC8B  8E1E
0000030420  81D8  2AEC  5700  C756  FA46  03B8  5E8C  C7FC
0000030440  F246  0101  C02B  4689  89E4  E246  068E  0C1A
0000030460  8326  E03E  002E  0375  1DE9  FF00  8C36  FF03
0000030500  8A36  8D03  DA46  5016  E39A  002C  8300  08C4
0000030520  003D  7400  E903  000F  068E  0C1C  8326  F83E
0000030540  002E  0375  3BE9  1E00  BF68  8D03  E646  5016
0000030560  468D  16DA  8D50  F646  5016  B768  1E00  C668
0000030600  FF03  8836  FF03  8636  FF03  8C36  FF03  8A36
0000030620  9A03  2D2C  0000  C483  891E  F646  5689  E9F8
0000030640  0008  C02B  4689  89F8  F646  46C7  00F4  FF0C
0000030660  0676  468D  1608  6A50  8D02  D646  5016  649A
0000030700  002D  8900  F446  7E83  00F4  0374  0AE9  C400
0000030720  D65E  8B26  1447  4689  8EF4  1A06  260C  3E83
0000030740  2CCD  7500  E903  0009  7E83  FEDE  0374  0FE9
0000030760  8E00  1C06  260C  3E83  2CF9  7500  E903  0051
0000031000  468B  89F4  E046  76FF  FFE4  E276  468D  16E0
0000031020  FF50  F276  76FF  FFFC  FA76  4E8D  16E6  8D51
0000031040  F64E  5116  4E8D  16DA  1E51  C668  6803  00C7
0000031060  36FF  0388  36FF  0386  36FF  038C  36FF  038A
0000031100  E69A  002D  8300  28C4  468B  E9E0  0009  06E9
0000031120  8B00  F446  00E9  5E00  835F  02ED  E58B  5D1F
0000031140  CB4D  581E  4590  8B55  1EEC  D88E  EC81  002A
0000031160  5657  46C7  D7FA  8C03  FC5E  46C7  01F2  2B01
0000031200  89C0  E446  4689  8EE2  1A06  260C  3E83  303A
0000031220  7500  E903  001D  36FF  038C  36FF  038A  468D
0000031240  16DA  9A50  2E49  0000  C483  3D08  0000  0374
0000031260  0FE9  8E00  1C06  260C  3E83  3052  7500  E903
0000031300  003B  681E  03DE  468D  16E6  8D50  DA46  5016
0000031320  468D  16F6  6850  00DD  681E  03E6  36FF  0388
0000031340  36FF  0386  36FF  038C  36FF  038A  929A  002E
0000031360  8300  1EC4  4689  89F6  F856  08E9  2B00  89C0
0000031400  F846  4689  C7F6  F446  0000  76FF  6A06  6A00
0000031420  6A00  8D00  D646  5016  BF9A  002E  8900  F446
0000031440  7E83  00F4  0374  0AE9  C400  D65E  8B26  1447
0000031460  4689  8EF4  1A06  260C  3E83  2E33  7500  E903
0000031500  0009  7E83  FEDE  0374  0FE9  8E00  1C06  260C
0000031520  3E83  2E5F  7500  E903  0051  468B  89F4  E046
0000031540  76FF  FFE4  E276  468D  16E0  FF50  F276  76FF
0000031560  FFFC  FA76  4E8D  16E6  8D51  F64E  5116  4E8D
0000031600  16DA  1E51  E668  6803  00EA  36FF  0388  36FF
0000031620  0386  36FF  038C  36FF  038A  419A  002F  8300
```

THU MAR 14 17:45:52 1991 SETUP.DLL PAGE 15, LINE 827

| | | | | | | | | |
|---|---|---|---|---|---|---|---|---|
| 0000031640 | 28C4 | 468B | E9E0 | 0009 | 06E9 | 8B00 | F446 | 00E9 |
| 0000031660 | 5E00 | 835F | 02ED | E58B | 5D1F | CB4D | 581E | 4590 |
| 0000031700 | 8B55 | 1EEC | D88E | EC81 | 002A | 5657 | 46C7 | F5FA |
| 0000031720 | 8C03 | FC5E | 46C7 | 01EE | 2B01 | 89C0 | E046 | 4689 |
| 0000031740 | 8EDE | 1A06 | 260C | 3E83 | 316B | 7500 | E903 | 001D |
| 0000031760 | 36FF | 038C | 36FF | 038A | 468D | 16D6 | 9A50 | 2FA4 |
| 0000032000 | 0000 | C483 | 3D08 | 0000 | 0374 | 0FE9 | 8E00 | 1C06 |
| 0000032020 | 260C | 3E83 | 31F6 | 7500 | E903 | 003B | 681E | 03FC |
| 0000032040 | 468D | 16E2 | 8D50 | D646 | 5016 | 468D | 16F2 | 6850 |
| 0000032060 | 00F7 | 681E | 0418 | 36FF | 0388 | 36FF | 0386 | 36FF |
| 0000032100 | 038C | 36FF | 038A | ED9A | 002F | 8300 | 1EC4 | 4689 |
| 0000032120 | 89F2 | F456 | 08E9 | 2B00 | 89C0 | F446 | 4689 | C7F2 |
| 0000032140 | F046 | 0000 | 068E | 0C1A | 8326 | DE3E | 0031 | 0375 |
| 0000032160 | 48E9 | 8300 | DA7E | 75FE | E903 | 003F | 76FF | 1E06 |
| 0000032200 | 0368 | 8D04 | E246 | 5016 | 468D | 16F2 | 8D50 | D646 |
| 0000032220 | 5016 | 681E | 0418 | FE68 | FF00 | 8836 | FF03 | 8636 |
| 0000032240 | FF03 | 8C36 | FF03 | 8A36 | 1E03 | 1068 | 6804 | 1199 |
| 0000032260 | 9C68 | 9A11 | 119F | 0000 | C483 | 9A28 | 2AB0 | 2B9C |
| 0000032300 | 4689 | 89F6 | F856 | 76FF | FFF8 | F676 | 76FF | 9A06 |
| 0000032320 | FFFF | 0000 | 4689 | 8EF0 | 1A06 | 260C | 3E83 | 2F8E |
| 0000032340 | 7500 | E903 | 0009 | 7E83 | FEDA | 0374 | 0FE9 | 8E00 |
| 0000032360 | 1C06 | 260C | 3E83 | 2FBA | 7500 | E903 | 0051 | 468B |
| 0000032400 | 89F0 | DC46 | 76FF | FFE0 | DE76 | 468D | 16DC | FF50 |
| 0000032420 | EE76 | 76FF | FFFC | FA76 | 4E8D | 16E2 | 8D51 | F24E |
| 0000032440 | 5116 | 4E8D | 16D6 | 1E51 | 1868 | 6804 | 0104 | 36FF |
| 0000032460 | 0388 | 36FF | 0386 | 36FF | 038C | 36FF | 038A | 9B9A |
| 0000032500 | 0030 | 8300 | 28C4 | 468B | E9DC | 0009 | 06E9 | 8B00 |
| 0000032520 | F046 | 00E9 | 5E00 | 835F | 02ED | E58B | 5D1F | CB4D |
| 0000032540 | 0000 | 0000 | 0000 | 0000 | 0000 | 0000 | 0000 | 0000 |
| 0000032560 | 8B55 | 1EEC | 2C68 | 1E04 | 3068 | 9A04 | FFFF | 0000 |
| 0000032600 | 068E | 042C | A126 | 0015 | 6CA3 | BB04 | 0436 | 1F8C |
| 0000032620 | 25BE | 8341 | FEE6 | 1E56 | FF9A | 00FF | 0B00 | 74C0 |
| 0000032640 | 3304 | EBC0 | 893A | 0477 | B94E | 3436 | 8304 | 03EE |
| 0000032660 | 04C7 | 0001 | 7789 | 8906 | 0877 | C683 | C702 | FE04 |
| 0000032700 | 89FF | 0A77 | 681E | 042A | 681E | 0428 | FF9A | 00FF |
| 0000032720 | E800 | 0020 | 349A | BE35 | E831 | 0066 | 01B8 | 5D00 |
| 0000032740 | 5DCB | F29A | D734 | 9A32 | 366C | 32E5 | FF68 | 9A00 |
| 0000032760 | 33FB | 32EA | BB1E | 000D | FF33 | 068E | 042A | FFB9 |
| 0000033000 | 267F | 3D80 | 7500 | 4701 | 8026 | 003D | 3174 | 4ABE |
| 0000033020 | 8B04 | 8BD1 | F3CB | 8BA6 | 74CA | 3308 | F2C0 | 74AE |
| 0000033040 | EBE7 | 061C | 071E | F78B | BF1F | 0471 | 2CAC | 7241 |
| 0000033060 | C00E | 04E0 | AC92 | 412C | 0572 | C20A | EBAA | 1FED |
| 0000033100 | 00C3 | 02BB | 5200 | D48B | A780 | 0471 | 50B7 | C48B |
| 0000033120 | 1653 | 1650 | 9A52 | FFFF | 0000 | C00B | 7558 | B110 |
| 0000033140 | 3C40 | 7401 | 3C06 | 7502 | B106 | 0808 | 718F | 4B04 |
| 0000033160 | D679 | E85A | 0026 | 06BE | BF0C | 0C06 | 5FE8 | BE01 |
| 0000033200 | 0C06 | 06BF | E80C | 0156 | 06B8 | 3D0C | 0C0A | 0B74 |
| 0000033220 | 016A | 680E | 33CD | FF9A | 00FF | C300 | 0E8B | 0BFC |
| 0000033240 | 2AE3 | 06C4 | 0BFE | C28C | DB33 | 1EFF | 0BFA | 0373 |
| 0000033260 | 61E9 | 8E01 | 3006 | 2604 | 1E8B | 0006 | 754B | C40D |
| 0000033300 | 0206 | 8C0C | BBC2 | 0003 | 1EFF | 0BFA | B8C3 | 206B |
| 0000033320 | D88E | 81A1 | 0B06 | 75C0 | 0E10 | F4A1 | 0B0B | 75C0 |
| 0000033340 | E805 | 001F | 03EB | 24E8 | 6A00 | 6A03 | 6A00 | 9A00 |
| 0000033360 | 3397 | 0000 | 8B55 | 33EC | EBC9 | 551A | EC8B | 01B9 |
| 0000033400 | EB00 | 5512 | EC8B | 5756 | 00B9 | EB01 | 5508 | EC8B |
| 0000033420 | 5756 | 01B9 | E801 | 004B | 0A51 | 75C9 | BE12 | 411E |
| 0000033440 | 1EBF | E841 | 00B8 | 06BE | BF0C | 0C0A | AFE8 | BE00 |
| 0000033460 | 0C0A | 0ABF | E80C | 00A6 | 0ABE | BF0C | 0C0A | 9DE8 |
| 0000033500 | E800 | 008C | 0A58 | 75E4 | C713 | 8106 | 0106 | B800 |

THU MAR 14 17:45:52 1991 SETUP.DLL PAGE 16, LINE 886

| | | | | | | | | |
|---|---|---|---|---|---|---|---|---|
| 0000033520 | 0001 | 8A50 | 0646 | 9A50 | FFFF | 0000 | 4EE8 | 5F00 |
| 0000033540 | 5D5E | 55CB | EC8B | 0D6A | C5E8 | 8320 | 02C4 | 068E |
| 0000033560 | 0430 | 8B26 | 061E | 4B00 | 168B | 0683 | FA83 | 75FF |
| 0000033600 | 8904 | 831E | 3906 | 831E | 9F06 | 0D6A | CBE8 | 8320 |
| 0000033620 | 02C4 | 749E | 6A0A | E80E | 2076 | C483 | EB02 | 3BC7 |
| 0000033640 | 74D3 | 6A08 | E80E | 2088 | C483 | 5D02 | 55C3 | EC8B |
| 0000033660 | 0D6A | 7BE8 | 8320 | 02C4 | 06C7 | 0683 | FFFF | 0D6A |
| 0000033700 | 97E8 | 8320 | 02C4 | 0E6A | 8FE8 | 8320 | 02C4 | C35D |
| 0000033720 | 0E8B | 0BFC | 07E3 | 02BB | FF00 | FA1E | C30B | F73B |
| 0000033740 | 0E73 | EF83 | 8B04 | 0B05 | 0245 | F274 | 1DFF | EEEB |
| 0000033760 | 00C3 | 8B55 | B8EC | 00FC | 0E50 | 6FEB | 8301 | 883E |
| 0000034000 | 0006 | 0474 | 1EFF | 0686 | FFB8 | 5000 | E80E | 015C |
| 0000034020 | E58B | CB5D | 02B8 | E900 | FDC7 | 5A59 | DC8B | D82B |
| 0000034040 | 0B72 | FB81 | 0200 | 0572 | E38B | 5152 | 52CB | 3351 |
| 0000034060 | E9C0 | FDAD | 14C8 | 0000 | 5657 | FF2B | F78B | 3639 |
| 0000034100 | 042A | 0375 | F0E9 | A100 | 042A | C92B | 4E89 | 89F4 |
| 0000034120 | F646 | 4E89 | 89F8 | FA46 | 0C6A | 76FF | FFFA | F876 |
| 0000034140 | 681E | 044A | 889A | A854 | 8335 | 0AC4 | C00B | 1A74 |
| 0000034160 | 8146 | FFFE | 767F | E903 | 00BD | 5EC4 | FFF8 | F846 |
| 0000034200 | 8026 | 003F | EA75 | EB47 | 900D | 5EC4 | FFF8 | F846 |
| 0000034220 | 8026 | 003F | F475 | 5E8B | 26F8 | 3F80 | 7500 | 8DB9 |
| 0000034240 | 0145 | 6A50 | 9A04 | 577A | 35B7 | C483 | 8904 | F046 |
| 0000034260 | 5689 | 56F2 | 0C9A | ED51 | 8335 | 02C4 | 4689 | 89FC |
| 0000034300 | FE56 | 468B | 0BF2 | F046 | 6D74 | C28B | 460B | 74FC |
| 0000034320 | 8B66 | F046 | 568B | A3F2 | 0677 | 1689 | 0679 | 0C6A |
| 0000034340 | 76FF | FFF6 | F476 | 681E | 044A | 889A | F254 | 8332 |
| 0000034360 | 0AC4 | C00B | 2C74 | 468B | 8BFC | FE56 | 5EC4 | 83F0 |
| 0000034400 | F046 | 2604 | 0789 | 8926 | 0257 | 5EC4 | FFF4 | F446 |
| 0000034420 | 8A26 | C407 | FC5E | 46FF | 26FC | 0788 | C00A | 0E74 |
| 0000034440 | E8EB | 5EC4 | FFF4 | F446 | 8026 | 003F | F475 | 5EC4 |
| 0000034460 | 26F4 | 3F80 | 7500 | 5EA7 | C95F | 90CB | 8B55 | 56EC |
| 0000034500 | B857 | 33CE | D88E | C08E | 568B | BE06 | 0C28 | 3BAD |
| 0000034520 | 74C2 | 4010 | 7496 | 970C | C033 | FFB9 | F2FF | 8BAE |
| 0000034540 | EBF7 | 96EB | 5E5F | E58B | CA5D | 0002 | 8B55 | 57EC |
| 0000034560 | 76FF | 0E06 | C5E8 | 0BFF | 74C0 | 921F | FA8B | C033 |
| 0000034600 | FFB9 | F2FF | F7AE | 49D1 | 8B50 | BBC4 | 0002 | 1E53 |
| 0000034620 | 5152 | 5016 | FF9A | 00FF | 5B00 | 8B5F | 5DE5 | 02CA |
| 0000034640 | 0000 | 1601 | 0202 | 0203 | 1804 | 0D05 | 0906 | 0C07 |
| 0000034660 | 0C08 | 0C09 | 070A | 080B | 160C | 160D | 020F | 0D10 |
| 0000034700 | 1211 | 0212 | 0235 | 0D41 | 0243 | 0D52 | 0D53 | 0D57 |
| 0000034720 | 0B59 | 0D6C | 206D | 1C70 | 0972 | 1606 | 0A80 | 0A81 |
| 0000034740 | 0982 | 0D84 | 0BA4 | 02CE | 0BD7 | 0D00 | 1608 | 8B52 |
| 0000034760 | E8D8 | 1EA6 | 8E93 | 5AC2 | 8926 | 0247 | 8926 | B817 |
| 0000035000 | FFFF | 8B99 | 5DE5 | E8CB | 0008 | FFB8 | 99FF | E58B |
| 0000035020 | CB5D | D88B | 83E8 | 931E | C28E | 8926 | 0247 | BB53 |
| 0000035040 | 36A2 | 24B9 | 0A00 | 75E4 | 2E1B | 073A | 1674 | 4343 |
| 0000035060 | F7E2 | 133C | 0472 | 243C | 0A76 | 3C43 | 72BC | 3C04 |
| 0000035100 | 76CA | 4301 | 8A2E | 0147 | 5B98 | 8926 | C307 | 8B55 |
| 0000035120 | BBEC | 0002 | 05EB | 8B55 | 33EC | E8DB | 1E3C | C303 |
| 0000035140 | CB5D | 04C8 | 0000 | 46C7 | FFFC | C4FF | 065E | F626 |
| 0000035160 | 0A47 | 7440 | 2607 | 47C6 | 000A | 2CEB | C38B | 942D |
| 0000035200 | B906 | 000C | F799 | 89F9 | FE46 | E850 | 1D52 | C483 |
| 0000035220 | FF02 | 0876 | 76FF | 9A06 | 37AE | 37C8 | C483 | 8904 |
| 0000035240 | FC46 | 76FF | E8FE | 1D44 | 468B | C9FC | 90CB | 10C8 |
| 0000035260 | 0000 | 5657 | FFBF | 8BFF | 0676 | 44F6 | 830A | 0375 |
| 0000035300 | 97E9 | 1E00 | 9A56 | 3C0C | 37ED | C483 | 8B04 | 8BF8 |
| 0000035320 | 81DE | 94EB | 8B06 | 7887 | 8908 | FA46 | 561E | 6FE8 |
| 0000035340 | 8302 | 04C4 | 448A | 2A0B | 50E4 | 3A9A | 084B | 8338 |
| 0000035360 | 02C4 | C00B | 617C | 7E83 | 00FA | 5E74 | 681E | 068E |

THU MAR 14 17:45:52 1991 SETUP.DLL PAGE 17, LINE 945

| | | | | | | | | |
|---|---|---|---|---|---|---|---|---|
| 0000035400 | 468D | 16F0 | 9A50 | 5410 | 3828 | C483 | 8D08 | F246 |
| 0000035420 | 4689 | 8CFC | FE56 | 7E80 | 5CF0 | 1474 | 681E | 0690 |
| 0000035440 | 468D | 16F0 | 9A50 | 53CA | 3841 | C483 | EB08 | 9004 |
| 0000035460 | 4EFF | 6AFC | FFDA | FE76 | 76FF | FFFC | FA76 | C49A |
| 0000035500 | 4E54 | 8338 | 08C4 | 468D | 16F0 | 9A50 | 59F8 | 3567 |
| 0000035520 | C483 | 0B04 | 74C0 | BF03 | FFFF | 44C6 | 000A | C78B |
| 0000035540 | 5F5E | CBC9 | 08C8 | 0000 | 189A | 924A | 8938 | FC46 |
| 0000035560 | 5689 | 0BFE | 75D0 | 2B05 | 99C0 | 37EB | 76FF | 50FE |
| 0000035600 | 76FF | FF0E | 0C76 | 76FF | FF0A | 0876 | 76FF | 9A06 |
| 0000035620 | 3AD4 | 38CA | C483 | 890E | F846 | 5689 | 8BFA | FC46 |
| 0000035640 | 942D | B906 | 000C | F799 | 50F9 | 3FE8 | 8B1C | F846 |
| 0000035660 | 568B | C9FA | 90CB | 8B55 | 6AEC | FF40 | 0C76 | 76FF |
| 0000035700 | FF0A | 0876 | 76FF | 9A06 | 3864 | 379A | CBC9 | 8B55 |
| 0000035720 | 56EC | 8B57 | 0676 | 448A | A80A | 7483 | A85F | 7540 |
| 0000035740 | A85B | 7502 | 0C48 | 8801 | 0A44 | FE8B | EF81 | 0694 |
| 0000035760 | C781 | 0874 | 0CA8 | 0D75 | 05F6 | 7501 | 1E08 | E856 |
| 0000036000 | 0186 | C483 | 8B04 | 0644 | 0489 | 75FF | FF02 | 0874 |
| 0000036020 | 3350 | 8ADB | 0B5C | 0E53 | B5E8 | 8314 | 08C4 | C00B |
| 0000036040 | 1174 | FF3D | 75FF | 801A | 0A4C | EB20 | 800A | 0A4C |
| 0000036060 | EB20 | 8009 | 0A4C | C710 | 0444 | 0000 | FFB8 | EBFF |
| 0000036100 | 8A25 | 71BF | 8004 | 82E7 | FF80 | 7582 | 8A0B | 0A7C |
| 0000036120 | C7F6 | 7582 | 8003 | 200D | 8948 | 0444 | 1CC4 | C033 |
| 0000036140 | 8A26 | 4307 | 1C89 | 5E5F | CB5D | 8B55 | 56EC | 8B57 |
| 0000036160 | 0876 | 448A | A80A | 7482 | A864 | 7540 | C760 | 0444 |
| 0000036200 | 0000 | 01A8 | 0B74 | 10A8 | 5374 | 4C8B | 8906 | 240C |
| 0000036220 | 0CFE | 2402 | 88EF | 0A44 | FE8B | EF81 | 0694 | C781 |
| 0000036240 | 0874 | DB33 | 5C8A | A80B | 7508 | A84B | 7504 | F618 |
| 0000036260 | 0105 | 4275 | FE81 | 06A0 | 0674 | FE81 | 06AC | 2675 |
| 0000036300 | 87F6 | 0471 | 7440 | B91F | 0001 | 1651 | 7E8D | 5706 |
| 0000036320 | 0E53 | 63E8 | 8315 | 08C4 | 01B9 | EB00 | B846 | FFFF |
| 0000036340 | 4C80 | 200A | 65EB | 1E53 | E856 | 009C | C483 | 5B04 |
| 0000036360 | 44F6 | 080A | D174 | 0C8B | 548B | 2B06 | 42CA | 1489 |
| 0000036400 | 558B | 4A02 | 5489 | E304 | 5125 | FF51 | 0874 | 74FF |
| 0000036420 | 5306 | E80E | 1522 | C483 | 5908 | 7CC4 | 8B06 | 0656 |
| 0000036440 | 8826 | 3B15 | 75C1 | 33B6 | 8AC0 | 0646 | 1DEB | C033 |
| 0000036460 | 87F6 | 0471 | 7420 | B9E3 | 0002 | 5051 | 5350 | E80E |
| 0000036500 | 1142 | C483 | 3308 | 8BC0 | EBC8 | 5FCF | 5D5E | 00CB |
| 0000036520 | 8B55 | 56EC | 768B | 8A04 | 0A44 | 83A8 | 2674 | 08A8 |
| 0000036540 | 2274 | 74FF | FF08 | 0674 | 169A | 6B51 | 8338 | 04C4 |
| 0000036560 | 6480 | F70A | C033 | 4489 | 8906 | 0844 | 0489 | 4489 |
| 0000036600 | 8902 | 0444 | 5D5E | 00C3 | 8B55 | 56EC | 768B | B804 |
| 0000036620 | 0200 | 9A50 | 510C | 3A6B | 8B59 | 81DE | 94EB | 8106 |
| 0000036640 | 74C3 | 0B08 | 74D2 | 800B | 0A4C | C708 | 0247 | 0200 |
| 0000036660 | 0EEB | 4C80 | 040A | 47C7 | 0102 | 8C00 | 8DDA | 0147 |
| 0000036700 | 5489 | 8902 | 8904 | 0854 | 4489 | C706 | 0444 | 0000 |
| 0000036720 | 5D5E | 00C3 | 08C8 | 0000 | 5657 | 5EC4 | 260A | 078A |
| 0000036740 | 3D98 | 0077 | 4874 | 0877 | 612C | 4C74 | 112C | 0674 |
| 0000036760 | C02B | E999 | 00CC | F62B | 46C6 | 01FC | 46C7 | 01FE |
| 0000037000 | FF00 | DA46 | 5EC4 | 260A | 3F80 | 7400 | 835B | FE7E |
| 0000037020 | 7400 | 2655 | 078A | 3D98 | 0074 | 3474 | 0877 | 2B2C |
| 0000037040 | 1C74 | 372C | 3674 | 46C7 | 00FE | EB00 | 90D4 | 01BE |
| 0000037060 | C603 | FC46 | EB02 | 90C5 | 09BE | EB01 | 90F4 | C6F7 |
| 0000037100 | 0002 | E275 | CE83 | 8302 | FEE6 | 46C6 | 80FC | B1EB |
| 0000037120 | C6F7 | C000 | D075 | CE81 | 4000 | A5EB | C6F7 | C000 |
| 0000037140 | C475 | CE81 | 8000 | 99EB | A468 | FF01 | 0E76 | FF56 |
| 0000037160 | 0876 | 76FF | 9A06 | 4BF2 | 3A96 | C483 | 890A | FA46 |
| 0000037200 | C00B | 037D | 69E9 | FFFF | 9206 | 8B06 | 107E | C78B |
| 0000037220 | 942D | 0506 | 0874 | 4689 | 8AF8 | FC46 | 4588 | 8B0A |
| 0000037240 | F85E | 07C6 | 2B00 | 89C0 | 0445 | 4789 | 8904 | 0245 |

THU MAR 14 17:45:52 1991 SETUP.DLL PAGE 18, LINE 1004

| | | | | | | | | |
|---|---|---|---|---|---|---|---|---|
| 0000037260 | 0589 | 4589 | 8908 | 0645 | 468A | 88FA | 0B45 | C78B |
| 0000037300 | DA8C | 5F5E | CBC9 | 04C8 | 0000 | 468B | 0B08 | 0646 |
| 0000037320 | 0875 | 006A | A7E8 | EB00 | 9031 | 468B | 2D06 | 0694 |
| 0000037340 | 0CB9 | 9900 | F9F7 | 4689 | 50FC | F3E8 | 8318 | 02C4 |
| 0000037360 | 76FF | FF08 | 0676 | 0C9A | 503C | 833C | 04C4 | 4689 |
| 0000037400 | FFFE | FC76 | E5E8 | 8B18 | FE46 | CBC9 | 02C8 | 0000 |
| 0000037420 | 5657 | FF2B | 768B | 8A06 | 0A44 | C88B | 0324 | 023C |
| 0000037440 | 3F75 | C1F6 | 7508 | 8B0D | 81DE | 94EB | F606 | 7487 |
| 0000037460 | 0108 | 2D74 | 048B | 442B | 8906 | FE46 | C00B | 217E |
| 0000037500 | FF50 | 0874 | 74FF | 8A06 | 0B4C | ED2A | 9A51 | 4F38 |
| 0000037520 | 3CCD | C483 | 3908 | FE46 | 0774 | 4C80 | 200A | FFBF |
| 0000037540 | 8BFF | 0644 | 548B | 8908 | 8904 | 0254 | 44C7 | 0004 |
| 0000037560 | 8B0D | 5EC7 | C95F | 90CB | 016A | 01E8 | CB00 | 04C8 |
| 0000037600 | 0000 | 5657 | 94BE | 2B06 | 89FF | FE7E | 026A | 9FE8 |
| 0000037620 | 8318 | 02C4 | 11EB | 46C7 | FFFE | FFFF | FC76 | 4BE8 |
| 0000037640 | 8318 | 02C4 | C683 | 390C | 5436 | 720A | 8B2B | 2DC6 |
| 0000037660 | 0694 | 0CB9 | 9900 | F9F7 | 4689 | 50FC | 21E8 | 8318 |
| 0000037700 | 02C4 | 44F6 | 830A | D374 | 561E | 0C9A | 783C | 833B |
| 0000037720 | 04C4 | 7440 | 47C1 | C3EB | 026A | 7DE8 | 8318 | 02C4 |
| 0000037740 | 7E83 | 0104 | 0475 | C78B | 03EB | 468B | 5EFE | C95F |
| 0000037760 | 02C2 | 9000 | 8B55 | B8EC | 01B4 | 1A9A | AE35 | 573E |
| 0000040000 | C656 | B846 | 2B00 | 89C0 | E846 | 4689 | C4C6 | 0A5E |
| 0000040020 | 8026 | 003F | 0375 | 5FE9 | 2607 | 1F8A | FF2A | 87F6 |
| 0000040040 | 0AF3 | 7408 | FF2D | E84E | 468D | 16E8 | FF50 | 0876 |
| 0000040060 | 76FF | E806 | 07C6 | FF50 | 0876 | 76FF | E806 | 07A0 |
| 0000040100 | 46FF | C40A | 0A5E | 8A26 | 2A1F | F6FF | F387 | 080A |
| 0000040120 | EE75 | 5E8B | 260A | 3F80 | 7425 | E903 | 06F2 | 46C6 |
| 0000040140 | 00C0 | C02A | 4688 | 88FC | B646 | 4688 | 88F2 | F646 |
| 0000040160 | 4688 | 88EE | 5286 | 2BFE | 89C0 | EA46 | 4689 | 89BA |
| 0000040200 | FE46 | 4689 | 89C4 | C246 | 68EB | 9090 | 46FF | C40A |
| 0000040220 | 0A5E | 8A26 | 2A07 | 8BE4 | F6F8 | F385 | 040A | 1A74 |
| 0000040240 | 46FF | 8BBA | FE46 | C88B | E0C1 | 0302 | D1C1 | 03E0 |
| 0000040260 | 2DC7 | 0030 | 4689 | EBFE | 9039 | 6C3D | 7400 | 771C |
| 0000040300 | 3C2D | 744C | 7F13 | 2C1F | 742A | 2C15 | 741C | EB23 |
| 0000040320 | 901D | 46FE | EBFC | 901B | 46FE | FEF6 | F646 | 12EB |
| 0000040340 | 46FE | EBEE | 900D | 4E2C | 0874 | 1A2C | E474 | 86FE |
| 0000040360 | FE52 | BE80 | FE52 | 7400 | 8093 | EE7E | 7500 | C414 |
| 0000040400 | 0E5E | 4683 | 040E | 8B26 | 2607 | 578B | 8902 | F846 |
| 0000040420 | 5689 | C6FA | 5286 | 00FE | 5EC4 | 260A | 078A | 200C |
| 0000040440 | E42A | F88B | FF83 | 746E | 8329 | 63FF | 1674 | FF83 |
| 0000040460 | 747B | 8D11 | E846 | 5016 | 76FF | FF08 | 0676 | BBE8 |
| 0000040500 | EB06 | 900D | 46FF | FFE8 | 0876 | 76FF | E806 | 0662 |
| 0000040520 | F08B | 7E83 | 00BA | 0974 | 7E83 | 00FE | 0375 | 83E9 |
| 0000040540 | 8B05 | E9C7 | 05A0 | 7E83 | 00BA | 0675 | 46FF | FFBA |
| 0000040560 | FE46 | 46C7 | 5EBC | 8C0A | BE5E | 23EB | 46C7 | 58BC |
| 0000040600 | EB0A | 90F4 | 46FF | C40A | 0A5E | 5E89 | 8CBC | BE46 |
| 0000040620 | 8026 | 5E3F | 0C75 | 478D | 8901 | BC46 | 468C | FEBE |
| 0000040640 | B64E | 206A | 006A | 468D | 16C8 | 9A50 | 5806 | 3BF9 |
| 0000040660 | C483 | 8308 | 7BFF | 0374 | A9E9 | C400 | BC5E | 8026 |
| 0000040700 | 5D3F | 0374 | 9DE9 | C600 | C046 | FF5D | BC46 | 46C6 |
| 0000040720 | 20D3 | 8FE9 | 9000 | 8A26 | 8807 | F446 | 46FF | 3CBC |
| 0000040740 | 752D | 800F | C07E | 7400 | 8B09 | BC5E | 8026 | 5D3F |
| 0000040760 | 1E75 | 5E8A | 88F4 | C05E | 01B0 | CB8A | E180 | C007 |
| 0000041000 | 03EB | FF2A | 568D | 03C8 | D2DA | 36E0 | 0708 | 54EB |
| 0000041020 | 46FF | 26BC | 078A | 4688 | 3AF4 | C046 | 0676 | 4688 |
| 0000041040 | EBF0 | 900D | 468A | 88C0 | F046 | 468A | 88F4 | C046 |
| 0000041060 | 468A | 88C0 | F446 | 1CEB | 5E8A | B0F4 | 8A01 | 80CB |
| 0000041100 | 07E1 | EBC0 | 2A03 | 8DFF | C856 | DA03 | E0D2 | 0836 |
| 0000041120 | FE07 | F446 | 468A | 98F0 | 4E8A | 2AF4 | 3BED | 7DC1 |

THU MAR 14 17:45:52 1991 SETUP.DLL PAGE 19, LINE 1063

| | | | | | | | | |
|---|---|---|---|---|---|---|---|---|
| 0000041140 | 88D7 | C06E | 5EC4 | 26BC | 3F80 | 745D | E903 | FF66 |
| 0000041160 | 8026 | 003F | 0375 | FFE9 | 8304 | 7BFF | 0A75 | C38B |
| 0000041200 | C28C | 4689 | 890A | 0C56 | 468B | 8BF8 | FA56 | 8689 |
| 0000041220 | FE54 | 9689 | FE56 | 7E83 | 00BA | 0A74 | 468B | FFFE |
| 0000041240 | FE4E | C00B | 4E74 | FE83 | 74FF | 8B49 | C1DE | 03FB |
| 0000041260 | 468D | 03C8 | 36D8 | 078A | 4632 | 93D6 | 01BA | 8B00 |
| 0000041300 | 8BCE | 80D9 | ?7E1 | E2D3 | C285 | 2874 | 7E80 | 00EE |
| 0000041320 | 0E75 | C68B | 5EC4 | FFF8 | F846 | 8826 | EB07 | 9005 |
| 0000041340 | 86FF | FE54 | 46FF | FFE8 | 0876 | 76FF | E806 | 04C2 |
| 0000041360 | F08B | A2EB | 4EFF | 56E8 | 76FF | FF08 | 0676 | DFE8 |
| 0000041400 | 8B04 | F846 | 568B | 39FA | 5486 | 75FE | 3909 | 5696 |
| 0000041420 | 75FE | E903 | 0462 | 7E80 | 00EE | 0374 | 29E9 | FF04 |
| 0000041440 | C646 | FF83 | 7563 | E903 | 041E | C28E | D88B | C626 |
| 0000041460 | 0007 | 13E9 | 9004 | 64BF | 8300 | 2DFE | 0675 | 46FE |
| 0000041500 | EBF2 | 9006 | FE83 | 752B | FF1F | FE4E | 0C75 | 7E83 |
| 0000041520 | 00BA | 0674 | 86FE | FE52 | 0EEB | 46FF | FFE8 | 0876 |
| 0000041540 | 76FF | E806 | 044C | F08B | FE83 | 7430 | E903 | 0155 |
| 0000041560 | 46FF | FFE8 | 0876 | 76FF | E806 | 0436 | F08B | 783C |
| 0000041600 | 0474 | 583C | 1475 | 46FF | FFE8 | 0876 | 76FF | E806 |
| 0000041620 | 0420 | F08B | 78BF | E900 | 012B | 46FF | 83EA | 78FF |
| 0000041640 | 0674 | 6FBF | E900 | 011D | 4EFF | 56E8 | 76FF | FF08 |
| 0000041660 | 0676 | 2BE8 | BE04 | 0030 | 0AE9 | 9001 | 7E80 | 00FC |
| 0000041700 | 0675 | 46FE | BFF6 | 0046 | FE83 | 752D | FE05 | F246 |
| 0000041720 | 08EB | FE83 | 742B | E903 | 00EB | 4EFF | 74FE | E903 |
| 0000041740 | 0095 | 7E83 | 00BA | 0375 | 8CE9 | FE00 | 5286 | E9FE |
| 0000041760 | 00D3 | FF83 | 7478 | 830D | 70FF | 0874 | FF83 | 7446 |
| 0000042000 | E903 | 0084 | 84F6 | 0AF3 | 7480 | 6A15 | 8D04 | C246 |
| 0000042020 | 5016 | 389A | A35A | 5641 | 79E8 | 8B03 | EBFD | 9036 |
| 0000042040 | FF83 | 7546 | 832C | EA7E | 7400 | 8326 | 3AFE | 1C75 |
| 0000042060 | 468B | 89C2 | EC46 | C02B | 4689 | 89C4 | C246 | 46C7 |
| 0000042100 | FFEA | BFFF | 0070 | 30BE | EB00 | 900A | 46C7 | 00EA |
| 0000042120 | FE00 | 5286 | 80FE | 52BE | 00FE | 5C75 | 46FF | 8DEA |
| 0000042140 | D044 | 0199 | C246 | 5611 | 83C4 | BA7E | 7400 | FF08 |
| 0000042160 | FE4E | 0375 | 74E9 | FFFF | E846 | 76FF | FF08 | 0676 |
| 0000042200 | 2FE8 | 8B03 | EBF0 | 903E | 84F6 | 0AF3 | 7404 | 83C2 |
| 0000042220 | 6FFF | 1475 | FE83 | 7D38 | 6AB8 | 8D03 | C246 | 5016 |
| 0000042240 | 389A | B45A | EB41 | 90AE | 006A | 0A6A | 468D | 16C2 |
| 0000042260 | 9A50 | 5A16 | 3CFD | 9DEB | 4EFF | 56E8 | 76FF | FF08 |
| 0000042300 | 0676 | 1BE8 | 8003 | 52BE | 00FE | 0375 | 23E9 | 83FF |
| 0000042320 | 70FF | 0F75 | 7E80 | 00F6 | 0974 | 468B | 8BEC | C24E |
| 0000042340 | 4689 | 80C4 | F27E | 7400 | F70A | C25E | 5683 | 00C4 |
| 0000042360 | 5EF7 | 83C4 | 46FF | 0575 | 46C7 | 00EA | 8300 | EA7E |
| 0000042400 | 7500 | E903 | 0272 | 7E80 | 00EE | 0374 | 39E9 | FF02 |
| 0000042420 | C646 | 7E80 | 00F6 | 1474 | 468B | 8BC2 | C456 | 5EC4 |
| 0000042440 | 26F8 | 0789 | 8926 | 0257 | 1DE9 | 9002 | 468B | C4C2 |
| 0000042460 | F85E | 8926 | E907 | 0210 | 468B | 99E8 | 4689 | 89C2 |
| 0000042500 | C456 | CEEB | 868D | FE58 | 4689 | 8CBC | BE56 | FE83 |
| 0000042520 | 752D | 8B13 | 36D8 | 07C6 | 8D2D | 5986 | 89FE | BC46 |
| 0000042540 | 568C | EBBE | 9006 | FE83 | 752B | FF11 | FE4E | 46FF |
| 0000042560 | FFE8 | 0876 | 76FF | E806 | 0238 | F08B | 7E83 | 00BA |
| 0000042600 | 0774 | 7E81 | 5DFE | 7E01 | C72D | FE46 | 015D | 26EB |
| 0000042620 | 468B | FFFE | FE4E | C00B | 2374 | 46FF | 8BEA | C4C6 |
| 0000042640 | BC5E | 46FF | 26BC | 0788 | 46FF | FFE8 | 0876 | 76FF |
| 0000042660 | E806 | 01FE | F08B | 84F6 | 0AF3 | 7504 | 83D3 | 2EFE |
| 0000042700 | 4375 | 468B | FFFE | FE4E | C00B | 3974 | 5EC4 | FFBC |
| 0000042720 | BC46 | C626 | 2E07 | 18EB | 468B | FFFE | FE4E | C00B |
| 0000042740 | 2374 | 46FF | 8BEA | C4C6 | BC5E | 46FF | 26BC | 0788 |
| 0000042760 | 46FF | FFE8 | 0876 | 76FF | E806 | 01B6 | F08B | 84F6 |
| 0000043000 | 0AF3 | 7504 | 83D3 | EA7E | 7500 | E903 | 0081 | C68B |

THU MAR 14 17:45:52 1991 SETUP.DLL PAGE 20, LINE 1122

| | | | | | | | | |
|---|---|---|---|---|---|---|---|---|
| 0000043020 | 653C | 0474 | 453C | 7775 | 468B | FFFE | FE4E | C00B |
| 0000043040 | 6D74 | 5EC4 | FFBC | BC46 | C626 | 6507 | 46FF | FFE8 |
| 0000043060 | 0876 | 76FF | E806 | 017A | F08B | FE83 | 752D | C40F |
| 0000043100 | BC5E | 46FF | 26BC | 07C6 | EB2D | 9008 | 9090 | FE83 |
| 0000043120 | 752B | 8B35 | FE46 | 4EFF | 0BFE | 75C0 | FF1D | FE46 |
| 0000043140 | 26EB | 468B | FFFE | FE4E | C00B | 2374 | 46FF | 8BEA |
| 0000043160 | C4C6 | BC5E | 46FF | 26BC | 0788 | 46FF | FFE8 | 0876 |
| 0000043200 | 76FF | E806 | 012C | F08B | 84F6 | 0AF3 | 7504 | FFD3 |
| 0000043220 | E84E | FF56 | 0876 | 76FF | E806 | 0144 | 7E83 | 00EA |
| 0000043240 | 0375 | D3E9 | 8000 | EE7E | 7400 | E903 | 009A | 46FF |
| 0000043260 | C4C6 | BC5E | C626 | 0007 | 868D | FE58 | 5016 | 76FF |
| 0000043300 | FFFA | F876 | 468A | 98F6 | 8E50 | 1E06 | 260C | 1EFF |
| 0000043320 | 0ADC | C483 | EB0A | 9071 | 5EC4 | 260A | 078A | E42A |
| 0000043340 | C63B | 1274 | 4EFF | 56E8 | 76FF | FF08 | 0676 | EFE8 |
| 0000043360 | E900 | 0084 | 9090 | 4EFE | 80B8 | EE7E | 7500 | 8349 |
| 0000043400 | 0E6E | EB04 | 9043 | 632D | 3D00 | 0018 | CA77 | E0D1 |
| 0000043420 | 2E93 | A7FF | 4416 | 3E66 | 40C8 | 4244 | 4244 | 4244 |
| 0000043440 | 43D8 | 4036 | 43D8 | 43D8 | 43D8 | 43D8 | 4238 | 40C8 |
| 0000043460 | 40BC | 43D8 | 43D8 | 3E7C | 43D8 | 40C8 | 43D8 | 43D8 |
| 0000043500 | 4039 | 43D8 | 43D8 | 3E84 | 46FE | FFB8 | 0A46 | 20EB |
| 0000043520 | 46FF | FFE8 | 0876 | 76FF | E806 | 0056 | F08B | 5EC4 |
| 0000043540 | FF0A | 0A46 | 8A26 | 2A07 | 3BE4 | 74F0 | E903 | FF74 |
| 0000043560 | FE83 | 74FF | E903 | F895 | FE83 | 75FF | 830C | C67E |
| 0000043600 | 7500 | 8006 | B87E | 7400 | 8B05 | C646 | 02EB | C68B |
| 0000043620 | 5F5E | CBC9 | 8B55 | 8BEC | 045E | 87F6 | 0AF3 | 7404 |
| 0000043640 | 8B05 | EBC3 | 9008 | C38B | DF24 | 072D | C900 | 02C2 |
| 0000043660 | 9000 | 04C8 | 0000 | 5EC4 | 2604 | 4FFF | 7804 | 2615 |
| 0000043700 | 078B | 8B26 | 0257 | FF26 | 8B07 | 8ED8 | 26C2 | 078A |
| 0000043720 | E42A | 07EB | 5306 | CE9A | F538 | C944 | 04C2 | 9000 |
| 0000043740 | 8B55 | 83EC | 087E | 74FF | FF0E | 0676 | 76FF | FF04 |
| 0000043760 | 0876 | D09A | 154A | C941 | 06C2 | 9000 | 8B55 | 56EC |
| 0000044000 | 5EC4 | 2608 | 07FF | 76FF | FF06 | 0476 | A3E8 | 8BFF |
| 0000044020 | F6F0 | F384 | 080A | E875 | C95E | 08C2 | 9000 | 4586 |
| 0000044040 | 4591 | 45A7 | 45DB | 4607 | 460F | 4638 | 466A | 8B55 |
| 0000044060 | B8EC | 0171 | E80E | EFE2 | 5756 | C033 | 4689 | 88F8 |
| 0000044100 | FB46 | 76C4 | 260A | 89AC | 0A76 | 4688 | 0AFE | 74C0 |
| 0000044120 | 8306 | F87E | 7D00 | 8B06 | F846 | B5E9 | BB04 | 0A60 |
| 0000044140 | 202C | 583C | 0577 | 24D7 | EB0F | B002 | B100 | D203 |
| 0000044160 | 02E0 | FB46 | FED7 | D2C1 | 88E8 | FB46 | 8B98 | D1D8 |
| 0000044200 | 2EE3 | A7FF | 451E | 568A | B9FE | 0001 | 36E8 | EB04 |
| 0000044220 | 33B1 | 89C0 | F046 | 4689 | 89F6 | EE46 | 46C7 | 20FC |
| 0000044240 | 4800 | 4689 | EBF4 | 8A9B | FE46 | 2D3C | 0675 | 4E80 |
| 0000044260 | 04FC | 8EEB | 2B3C | 0675 | 4E80 | 01FC | 84EB | 203C |
| 0000044300 | 0775 | 4E80 | 02FC | 79E9 | 3CFF | 7523 | 8007 | FC4E |
| 0000044320 | E980 | FF6E | 4E80 | 08FC | 67E9 | 8AFF | FE4E | F980 |
| 0000044340 | 752A | E80F | 035C | C00B | 1779 | D8F7 | 4E80 | 04FC |
| 0000044360 | 0FEB | E980 | 3230 | 8BED | F646 | 0ABB | F700 | 03E3 |
| 0000044400 | 89C1 | F646 | 3BE9 | C7FF | F446 | 0000 | 33E9 | 8AFF |
| 0000044420 | FE4E | F980 | 752A | E80C | 0328 | C00B | 1479 | FFB8 |
| 0000044440 | EBFF | 800F | 30E9 | ED32 | 468B | BBF4 | 000A | E3F7 |
| 0000044460 | C103 | 4689 | E9F4 | FF0A | 468A | 3CFE | 756C | 8006 |
| 0000044500 | FC4E | EB10 | 3C22 | 7546 | 8006 | FC4E | EB20 | 3C18 |
| 0000044520 | 754E | 8006 | FD4E | EB10 | 3C0E | 754C | 8006 | FD4E |
| 0000044540 | EB04 | 8004 | FD4E | E908 | FED8 | 468A | 3CFE | 7564 |
| 0000044560 | E903 | 0194 | 693C | 0375 | 8DE9 | 3C01 | 7575 | E903 |
| 0000044600 | 018A | 583C | 0375 | 89E9 | 3C01 | 7578 | E903 | 0188 |
| 0000044620 | 6F3C | 0375 | A2E9 | 3C01 | 7463 | 3C1A | 7473 | 3C27 |
| 0000044640 | 746E | 3C51 | 7470 | 3C60 | 7445 | 3C07 | 7447 | E903 |
| 0000044660 | 00BB | B5E9 | E800 | 028A | BE8D | FE8F | 0716 | 4FAA |

THU MAR 14 17:45:52 1991 SETUP.DLL PAGE 21, LINE 1181

| | | | | | | | | |
|---|---|---|---|---|---|---|---|---|
| 0000044700 | 01B9 | E900 | 01F1 | 90E8 | 0B02 | 75FF | 8C12 | 0BC0 |
| 0000044720 | 75C0 | 1E0C | BF07 | 0AB9 | 0E8B | 0ABF | D8E9 | 5701 |
| 0000044740 | 4E8B | E3F4 | 3207 | F2C0 | 75AE | 4F01 | 2B59 | 87F9 |
| 0000044760 | E9CF | 01C3 | 62E8 | 8B02 | F846 | F6AB | FC46 | 7410 |
| 0000045000 | 3303 | ABC0 | 3BE9 | F6FE | FC46 | 7530 | E805 | 0232 |
| 0000045020 | 39EB | 36E8 | F602 | FD46 | 7518 | C630 | FF46 | B907 |
| 0000045040 | 0010 | 0716 | 3352 | 8DD2 | 97BE | BEFE | 0004 | B0E8 |
| 0000045060 | B902 | 0010 | BE8D | FE92 | 3358 | BED2 | 0004 | A0E8 |
| 0000045100 | C602 | 9386 | 3AFE | 09B9 | EB00 | C618 | FF46 | B907 |
| 0000045120 | 0010 | 0716 | D233 | BE8D | FE92 | 04BE | E800 | 0281 |
| 0000045140 | 04B9 | 8D00 | 8FBE | E9FE | 014D | 46FF | 80EE | FC4E |
| 0000045160 | 8A40 | FE46 | 200C | 8B98 | 83F0 | F47E | 7F00 | 7413 |
| 0000045200 | C707 | F446 | 0006 | 0AEB | 673D | 7500 | C705 | F446 |
| 0000045220 | 0001 | BE8D | FE8F | 76FF | FFEE | F476 | 1656 | FF57 |
| 0000045240 | 1076 | 76FF | F60E | FD46 | 7404 | FF0A | E81E | 830A |
| 0000045260 | 0E46 | EB0A | FF08 | D41E | 830A | 0E46 | 8308 | 0EC4 |
| 0000045300 | 46F6 | 80FC | 0F74 | 7E83 | 00F4 | 0975 | 5716 | 1EFF |
| 0000045320 | 0AE0 | C483 | 8304 | 67FE | 1075 | 46F7 | 80FC | 7500 |
| 0000045340 | 1609 | FF57 | D81E | 830A | 04C4 | 0716 | 8026 | 2D3D |
| 0000045360 | 0575 | 8047 | FD4E | B901 | FFFF | B057 | F200 | 4FAE |
| 0000045400 | 2B59 | 87F9 | E9CF | 00AF | 4E80 | 40FC | 46C6 | 0AFA |
| 0000045420 | 35EB | 46C6 | 07FF | 04EB | 46C6 | 27FF | 46F6 | 80FC |
| 0000045440 | 1174 | 46C7 | 02F0 | C600 | F246 | B230 | 0251 | FF56 |
| 0000045460 | 5688 | C6F3 | FA46 | EB10 | F60E | FC46 | 7480 | 8004 |
| 0000045500 | FD4E | C602 | FA46 | F608 | FC46 | 7410 | E805 | 00FB |
| 0000045520 | 0EEB | EDE8 | F600 | FC46 | 7440 | 9903 | 02EB | D233 |
| 0000045540 | 46F6 | 40FC | 0F74 | D20B | 0B7D | 4E80 | 01FD | D8F7 |
| 0000045560 | D283 | F700 | 83DA | F47E | 7D00 | C707 | F446 | 0001 |
| 0000045600 | 04EB | 6680 | F7FC | D88B | DA0B | 0575 | 46C7 | 00F0 |
| 0000045620 | 8D00 | EB7E | 0716 | 4E8A | 32FA | 8BED | F476 | 40E8 |
| 0000045640 | F601 | FD46 | 7402 | E30E | 2606 | 3D80 | 7430 | 4F06 |
| 0000045660 | C626 | 3005 | EB41 | F600 | FC46 | 7440 | F631 | FD46 |
| 0000045700 | 7401 | C60B | F246 | C72D | F046 | 0001 | 20EB | 46F6 |
| 0000045720 | 01FC | 0B74 | 46C6 | 2BF2 | 46C7 | 01F0 | EB00 | F60F |
| 0000045740 | FC46 | 7402 | C609 | F246 | C720 | F046 | 0001 | 468B |
| 0000045760 | 2BF6 | 2BC1 | F046 | 027D | C033 | 5706 | F651 | FC46 |
| 0000046000 | 750C | 8B07 | B2C8 | E820 | 00BB | 1650 | 8D07 | F27E |
| 0000046020 | 4E8B | E8F0 | 0091 | F658 | FC46 | 7408 | F60D | FC46 |
| 0000046040 | 7504 | 8B07 | B2C8 | E830 | 009B | 5F59 | 5007 | 76E8 |
| 0000046060 | 5800 | 46F6 | 04FC | 0774 | C88B | 20B2 | 86E8 | E900 |
| 0000046100 | FC00 | 76C4 | 260E | 89AD | 0E76 | C4C3 | 0E76 | AD26 |
| 0000046120 | D08B | AD26 | 8992 | 0E76 | F6C3 | FC46 | 742D | E808 |
| 0000046140 | FFE9 | C28E | F88B | E8C3 | FFD8 | F88B | C00B | 0375 |
| 0000046160 | C08E | 1EC3 | C307 | 0698 | C457 | 065E | FF26 | 044F |
| 0000046200 | 1078 | 8B26 | 263F | 07FF | 8E26 | 0247 | 33AA | 5FC0 |
| 0000046220 | C307 | 5251 | 5306 | 0E50 | CFE8 | 83EF | 06C4 | 595A |
| 0000046240 | FF3D | 75FF | EBE8 | E3E8 | 8B1B | 01F7 | F84E | 3357 |
| 0000046260 | 26FF | E8AC | FFC0 | F80B | F7E2 | FF0B | 745F | C705 |
| 0000046300 | F846 | FFFF | E3C3 | 0119 | F84E | 3357 | 8AFF | E8C2 |
| 0000046320 | FFA4 | F80B | F7E2 | FF0B | 745F | C705 | F846 | FFFF |
| 0000046340 | FDC3 | 9357 | F60B | 0A7F | DB0B | 0675 | D20B | 0275 |
| 0000046360 | 1AEB | 3392 | F7D2 | 93F1 | F1F7 | 8792 | 04D3 | 3C30 |
| 0000046400 | 7639 | 0203 | FF46 | 8BAA | 4EC2 | D8EB | 2B59 | 47CF |
| 0000046420 | C3FC | 5E5F | E58B | CB5D | 06C8 | 0000 | BE56 | 0694 |
| 0000046440 | C02B | 4689 | 89FC | FA46 | 026A | 03E8 | 830B | 02C4 |
| 0000046460 | 0CEB | 76FF | E8FE | 0AB4 | C483 | 8302 | 0CC6 | 3639 |
| 0000046500 | 0A54 | 3B72 | C68B | 942D | B906 | 000C | F799 | 89F9 |
| 0000046520 | FE46 | E850 | 0A8A | C483 | F602 | 0A44 | 7583 | C7D3 |
| 0000046540 | 0444 | 0000 | 44C6 | 000A | C02B | 4489 | 8908 | 0644 |

THU MAR 14 17:45:52 1991 SETUP.DLL PAGE 22, LINE 1240

| | | | | | | | | |
|---|---|---|---|---|---|---|---|---|
| 0000046560 | 4489 | 8902 | C604 | 0B44 | 89FF | FA76 | 5E8C | 6AFC |
| 0000046600 | E802 | 0AD6 | C483 | 8B02 | FA46 | 568B | 5EFC | CBC9 |
| 0000046620 | 04C8 | 0000 | 8B56 | 0676 | 468B | 2D08 | 0694 | 0CB9 |
| 0000046640 | 9900 | F9F7 | 4689 | 50FE | 35E8 | 830A | 02C4 | 76FF |
| 0000046660 | FF0A | 0876 | 9A56 | 4AD0 | 44D9 | C483 | 8906 | FC46 |
| 0000046700 | 76FF | E8FE | 0A26 | C483 | 8B02 | FC46 | C95E | 90CB |
| 0000046720 | 8B55 | 57EC | 8B56 | 0676 | 7E8B | 8308 | FFFE | 1274 |
| 0000046740 | 45F6 | 010A | 1275 | 45F6 | 800A | 0674 | 45F6 | 020A |
| 0000046760 | 0674 | FFB8 | EBFF | 903E | 458B | 0B08 | 0645 | 0875 |
| 0000047000 | 571E | 83E8 | 83EF | 04C4 | 058B | 558B | 3902 | 0645 |
| 0000047020 | 0D75 | 5539 | 7508 | 8308 | 047D | 7500 | FFD5 | FF05 |
| 0000047040 | 0445 | C68B | 0DFF | 1DC4 | 8826 | 8007 | 0A65 | 80EF |
| 0000047060 | 0A4D | 2A01 | 5EE4 | C95F | 90CB | 8B55 | 8BEC | 065E |
| 0000047100 | 1E3B | 046F | 1272 | 09BA | 3300 | E9C0 | EBA0 | E853 |
| 0000047120 | 09B2 | C483 | E902 | EBAF | E853 | 099C | C483 | 5302 |
| 0000047140 | FF9A | 00FF | 8500 | 75C0 | C6E5 | 7187 | 0004 | E853 |
| 0000047160 | 0992 | C483 | 8B02 | 5DE5 | 00CB | 8B55 | 83EC | 02EC |
| 0000047200 | C033 | 09EB | 8B55 | 83EC | 02EC | FFBB | 89FF | FE46 |
| 0000047220 | 5E8B | 3B06 | 6F1E | 7204 | BA19 | 0009 | C033 | 4DE9 |
| 0000047240 | 8BEB | FE4E | C90B | 0774 | E853 | 0958 | C483 | E902 |
| 0000047260 | EB55 | C00B | 0774 | E853 | 093E | C483 | 8302 | 04EC |
| 0000047300 | CC8B | FF53 | 0A76 | 76FF | FF08 | 0C76 | 5116 | FF9A |
| 0000047320 | 00FF | 5900 | 855A | 75C0 | 80C8 | 71A7 | FD04 | 468B |
| 0000047340 | 0BFE | 74C0 | 5307 | 1BE8 | 8309 | 02C4 | 8B91 | 5DE5 |
| 0000047360 | 00CB | 8B55 | 83EC | 0EEC | 7E8A | 8B0C | 0E46 | 4689 |
| 0000047400 | EB0C | 5508 | EC8B | EC83 | B70E | FF40 | 0876 | 76FF |
| 0000047420 | 1606 | 568D | 52FE | 8D16 | F856 | 3352 | 52D2 | 8B52 |
| 0000047440 | 0C4E | 99E8 | 8B01 | 0A46 | 00A9 | 7401 | 8008 | 10CA |
| 0000047460 | 00A9 | 7504 | A92A | 0200 | 2274 | CA80 | 5002 | 468D |
| 0000047500 | FFFE | 0876 | 76FF | 1606 | 3350 | 50C0 | 9A50 | FFFF |
| 0000047520 | 0000 | C085 | 7558 | 8B08 | FE4E | 03EB | CA80 | 5101 |
| 0000047540 | 2552 | 0003 | C70A | 3350 | 50C0 | 9A50 | FFFF | 0000 |
| 0000047560 | C00B | 1674 | 6E3D | 7500 | F60E | F0C2 | 02BA | 7400 |
| 0000047600 | BA03 | 0011 | 67E9 | E9EA | 009D | 468B | 3BFE | 6F06 |
| 0000047620 | 7204 | 500D | 619A | 004B | BA00 | 0018 | C033 | E4EB |
| 0000047640 | E850 | 0854 | C483 | 8B02 | 50D0 | 8D16 | F45E | 1653 |
| 0000047660 | 468D | 50F8 | 569A | 0033 | 0B00 | 75C0 | 8B61 | 0A46 |
| 0000047700 | C933 | 00A9 | 7580 | A90E | 4000 | 0775 | 06F6 | 0AC3 |
| 0000047720 | 7580 | B102 | 8880 | F24E | 468A | 3CF4 | 7501 | C607 |
| 0000047740 | F446 | E940 | 008F | 023C | 0775 | 46C6 | 08F4 | 84E9 |
| 0000047760 | 3200 | 88C0 | F446 | C90A | F474 | 46F7 | 020A | 7400 |
| 0000050000 | 5274 | FFB9 | 51FF | B951 | 0002 | 1651 | 468D | 50FA |
| 0000050020 | CF9A | 004B | 0B00 | 74C0 | 3D15 | 0083 | 0C74 | 76FF |
| 0000050040 | E8FE | 07E0 | C483 | E902 | E9DD | C033 | 47EB | 1652 |
| 0000050060 | 468D | 50F6 | 01B8 | 5000 | 8D16 | F846 | 9A50 | FFFF |
| 0000050100 | 0000 | C00B | 1B75 | 4639 | 74F8 | 802A | F67E | 751A |
| 0000050120 | 5210 | 76FF | FFFC | FA76 | FF9A | 00FF | 0B00 | 75C0 |
| 0000050140 | 52BD | C033 | 5050 | 1650 | 468D | 50FA | 119A | 004D |
| 0000050160 | 0800 | 75C0 | 8AA9 | F44E | C1F6 | 7548 | FF28 | 0876 |
| 0000050200 | 76FF | 1606 | 468D | 50F8 | C033 | 5050 | 4E9A | 004C |
| 0000050220 | F700 | F846 | 0001 | 0374 | C980 | F710 | 0A46 | 0008 |
| 0000050240 | 0374 | C980 | 0A20 | F24E | C980 | 8B01 | 8BC2 | 88D8 |
| 0000050260 | 718F | 5304 | 4DE8 | 8307 | 02C4 | E58B | CB5D | 6AA1 |
| 0000050300 | F704 | 23D0 | 33C1 | A8C9 | 7580 | 8003 | 01C9 | 00C3 |
| 0000050320 | 8B55 | 83EC | 08EC | C033 | 5E8B | 3B06 | 6F1E | 7304 |
| 0000050340 | 534D | 13E8 | 8307 | 02C4 | 4E8B | E30C | F647 | 7187 |
| 0000050360 | 0204 | 4075 | 3357 | 8BD2 | 0C4E | 7EC4 | F608 | 7187 |
| 0000050400 | 0804 | 1074 | 878A | 0571 | 0A3C | 0874 | 42AA | C649 |
| 0000050420 | 7187 | 0A05 | 0653 | 5157 | 468D | 16FA | 9A50 | 4D3E |

THU MAR 14 17:45:52 1991 SETUP.DLL PAGE 23, LINE 1299

| | | | | | | | | |
|---|---|---|---|---|---|---|---|---|
| 0000050440 | 0000 | 0B5F | 74C0 | 530F | D9E8 | 8306 | 02C4 | 09BA |
| 0000050460 | E900 | E8BA | 4AEB | 468B | 03FA | F6C2 | 7187 | 8004 |
| 0000050500 | 3E74 | A780 | 0471 | 56FB | 1E57 | C507 | 0876 | FE8B |
| 0000050520 | C88B | 28E3 | 0DB4 | 3C80 | 750A | 2606 | 8F80 | 0471 |
| 0000050540 | AC04 | C43A | 2574 | 1A3C | 0875 | 8026 | 718F | 0204 |
| 0000050560 | 05EB | 0588 | E247 | 8BEA | 2BC7 | 0846 | 1F06 | 5E5F |
| 0000050600 | E853 | 0680 | C483 | 8B02 | 5DE5 | 83CB | 01F9 | 0774 |
| 0000050620 | 3C80 | 740A | EBE0 | 26DB | 87F6 | 0471 | 7440 | 0B2B |
| 0000050640 | 75DB | 5323 | 468D | 16F9 | 5150 | 468D | 16FA | 9A50 |
| 0000050660 | 4E1E | 0000 | C085 | 0E74 | 1F06 | 5E5F | E853 | 0644 |
| 0000050700 | C483 | E902 | E841 | 0AB0 | A8EB | 46C6 | 00F9 | 8D53 |
| 0000050720 | F946 | 5016 | 8D51 | FA46 | 5016 | B09A | 004E | 0B00 |
| 0000050740 | 75C0 | F7D5 | FA46 | FFFF | 3674 | 7E83 | 010C | 3574 |
| 0000050760 | F626 | 7187 | 0804 | 1C75 | B853 | FFFF | 5050 | D8F7 |
| 0000051000 | 8D50 | FC46 | 5016 | 6D9A | 004D | 8000 | F97E | 750A |
| 0000051020 | E90F | FF61 | 468A | 26F9 | 8788 | 0571 | 0A3C | 0274 |
| 0000051040 | 0DB0 | 4DE9 | 80FF | F97E | 750A | EBC5 | 0099 | 8B55 |
| 0000051060 | 83EC | 0EEC | C033 | 09EB | 8B55 | 83EC | 0EEC | FFB8 |
| 0000051100 | 89FF | F246 | 5E8B | 3B06 | 6F1E | 7204 | BA08 | 0009 |
| 0000051120 | C033 | 99E9 | 0BE7 | 74C0 | 5307 | 9BE8 | 8305 | 02C4 |
| 0000051140 | 87F6 | 0471 | 7420 | 5312 | C933 | 5151 | 4141 | 8D51 |
| 0000051160 | F446 | 5016 | 079A | 004F | F600 | 7187 | 8004 | 6674 |
| 0000051200 | 5E8C | 8EFA | 0A46 | 56C5 | 3308 | 89C0 | FE46 | 4689 |
| 0000051220 | FCFC | 5657 | FA8B | F28B | 6689 | 8BF8 | 0C4E | 28E3 |
| 0000051240 | 0AB0 | AEF2 | 3B75 | EC83 | 8B02 | BADC | 0080 | E22B |
| 0000051260 | D48B | FA8B | 0716 | 4E8B | AC0C | 0A3C | 0D74 | FB3B |
| 0000051300 | 1A74 | E2AA | E8F4 | 0038 | AFE9 | B000 | 3B0D | 75FB |
| 0000051320 | E803 | 002C | B0AA | FF0A | FC46 | E2EB | 21E8 | EB00 |
| 0000051340 | 5EE1 | 8E5F | FA5E | C8E9 | 8B00 | F246 | C00B | 0974 |
| 0000051360 | 76FF | E806 | 050E | C483 | B802 | FFFC | E80E | E51A |
| 0000051400 | 5350 | 1E51 | 1F06 | CF8B | CA2B | 21E3 | 8B51 | 065E |
| 0000051420 | 1E53 | 5152 | 468D | 16F4 | 9A50 | 3695 | 0000 | 0B59 |
| 0000051440 | 75C0 | 8B11 | F45E | 5E01 | 3BFE | 72D9 | 1F07 | 5B59 |
| 0000051460 | 8B58 | C3FA | 831F | 08C4 | 7E83 | 00FE | 3C75 | C00B |
| 0000051500 | 1874 | 6D3D | 7400 | 3D0D | 0001 | 09BA | 7500 | BA08 |
| 0000051520 | 001C | 03EB | 20BA | F900 | 26EB | 5E8E | F6FA | 7187 |
| 0000051540 | 4004 | 0E74 | 5E8E | 8B0A | 085E | 3F80 | 751A | F803 |
| 0000051560 | 0EEB | 1CBA | 3300 | F9C0 | 06EB | 468B | 2BFE | FC46 |
| 0000051600 | 668B | 5EF8 | 8E5F | FA5E | 1472 | 5E8B | 0BF2 | 74DB |
| 0000051620 | FF09 | 0676 | 6DE8 | 8304 | 02C4 | E58B | CB5D | 5E8B |
| 0000051640 | 0BF2 | 74DB | FF09 | 0676 | 59E8 | 8304 | 02C4 | 3DE9 |
| 0000051660 | 8BE6 | 0C4E | C90B | 0475 | C18B | CEEB | C51E | 0856 |
| 0000051700 | 1E53 | 5152 | 468D | 16F4 | 9A50 | 501A | 0000 | 071E |
| 0000051720 | 0B1F | 74C0 | 3D17 | 006D | 0D74 | 013D | BA00 | 0009 |
| 0000051740 | BC75 | 1CBA | EB00 | BAB7 | 0020 | B2EB | 468B | 0BF4 |
| 0000051760 | 75C0 | F697 | 7187 | 4004 | 0A74 | DA8B | 8026 | 1A3F |
| 0000052000 | 0275 | 86EB | 1CBA | 3300 | EBC0 | 0093 | 33EA | B851 |
| 0000052020 | EA4A | 5152 | 510F | 20EA | 1451 | EA51 | 5120 | 5119 |
| 0000052040 | 8B55 | 56EC | 76C4 | 8C06 | E3C1 | 2605 | 4C80 | 01FE |
| 0000052060 | 5D5E | 55CB | EC8B | 096A | F5E8 | 8303 | 02C4 | 76FF |
| 0000052100 | 0E06 | 0DE8 | 5B00 | 096A | 0FE8 | 8304 | 02C4 | E58B |
| 0000052120 | CB5D | 8B55 | 56EC | 8B57 | 064E | F983 | 77E8 | 1E69 |
| 0000052140 | C6A1 | 0B0A | 74C0 | BF48 | 523A | 368B | 0ACE | 1EC5 |
| 0000052160 | 0AC8 | 561E | FF57 | 5FD7 | 735E | 8C2B | C5DA | 0C5F |
| 0000052200 | D63B | EF75 | 1F58 | C41E | C836 | 260A | 748B | C512 |
| 0000052220 | C41E | 8C0A | 3BDA | 75D0 | 1FD9 | 811E | B6FF | 7452 |
| 0000052240 | BF0E | 52B6 | C4EB | 815E | 3AFF | 7452 | EB0F | 070A |
| 0000052260 | BF06 | 0AC4 | E1E8 | 7201 | E80E | 007E | 891F | CA16 |
| 0000052300 | 890A | C81E | EB0A | 1F04 | C033 | 5F99 | 5D5E | 00CB |

THU MAR 14 17:45:52 1991 SETUP.DLL PAGE 24, LINE 1358

| | | | | | | | | |
|---|---|---|---|---|---|---|---|---|
| 0000052320 | 5706 | F88B | FB03 | 7F89 | 4F04 | 2D4F | 0016 | 778D |
| 0000052340 | C714 | FE05 | 89FF | 0A7F | 8948 | 8C04 | 8B1F | 8CC6 |
| 0000052360 | 8EDA | 8DC2 | 067F | ABFC | 47AB | 3347 | ABC0 | ABAB |
| 0000052400 | 5FAB | C307 | 8B26 | 0245 | C00B | 0975 | 8C26 | 025D |
| 0000052420 | 8926 | EB1D | 0614 | C426 | 0875 | 8C26 | 0E5C | 8926 |
| 0000052440 | 0C5C | 478C | 8912 | 1077 | 2607 | 5D8C | 260A | 5D89 |
| 0000052460 | 2608 | 5D8C | 2606 | 5D89 | C304 | 8041 | FEE1 | FC53 |
| 0000052500 | 778B | 8B08 | 0A5F | FF33 | 23EB | C38B | A85B | 7501 |
| 0000052520 | 5342 | 778B | 8B06 | 085F | DE3B | 3674 | 334B | EBFF |
| 0000052540 | 900C | 548D | 3BFE | 73D3 | 03E1 | 72F0 | AD23 | 01A8 |
| 0000052560 | F074 | FE8B | 3B48 | 73C1 | 0323 | 72F0 | 8B13 | ADD0 |
| 0000052600 | 01A8 | DE74 | C203 | 0205 | 8B00 | 89F7 | FE44 | E4EB |
| 0000052620 | C08B | 8B5B | 0647 | 4789 | F908 | 19EB | 895B | FE4C |
| 0000052640 | 0974 | F903 | C12B | 8948 | 2B05 | 03F9 | 89F9 | 087F |
| 0000052660 | C68B | DA8C | C3F8 | 5751 | 47F6 | 0102 | 6674 | B7E8 |
| 0000052700 | 8B00 | 8BFE | A804 | 7401 | 2B03 | 49C8 | 4141 | 778B |
| 0000052720 | 0B04 | 74F6 | 034F | 73CE | 3309 | BAC0 | FFF0 | 33E3 |
| 0000052740 | 42EB | 42B8 | 8E36 | 26C0 | D2A1 | 3D0A | 2000 | 1674 |
| 0000052760 | 00BA | 3B80 | 72D0 | D106 | 75EA | EBF8 | 8322 | 08FA |
| 0000053000 | 1D72 | E2D1 | C28B | 8B48 | 03D0 | 73C1 | 3302 | F7C0 |
| 0000053020 | 23D2 | 52C2 | 2EE8 | 5A00 | 0D73 | FA83 | 74F0 | B805 |
| 0000053040 | 0010 | E2EB | EBF9 | 8B1B | 2BD0 | 0457 | 4789 | 8904 |
| 0000053060 | 087F | 778B | 4A0A | 1489 | 0342 | C7F2 | FE04 | 89FF |
| 0000053100 | 0A77 | 595F | 8BC3 | F6D0 | 0247 | 7404 | 4A0F | 778B |
| 0000053120 | 4E04 | D63B | 0572 | 5739 | 73FE | 4218 | 1E50 | 999A |
| 0000053140 | 0032 | 0B00 | 75C0 | 8B0F | F6C2 | 0247 | 7404 | 4A04 |
| 0000053160 | 5789 | F8FE | 01EB | C3F9 | 8B57 | 0877 | 773B | 750A |
| 0000053200 | 8B03 | 0677 | 3DAD | FFFE | 0874 | FE8B | FE24 | F003 |
| 0000053220 | F2EB | 4F4F | F78B | C35F | D18B | C283 | 8027 | F0E2 |
| 0000053240 | 8B50 | 52C4 | 5016 | C033 | 9A50 | FFFF | 0000 | 0B1F |
| 0000053260 | 75C0 | 3314 | 26DB | 458B | 890C | 0247 | C28B | 0FE8 |
| 0000053300 | E8FE | FE40 | EBF8 | F901 | 00C3 | 8B55 | 8BEC | 8BD7 |
| 0000053320 | 1EDE | 7EC4 | 3306 | B9C0 | FFFF | AEF2 | 758D | C4FF |
| 0000053340 | 0A7E | FFB9 | F2FF | F7AE | 2BD1 | 8CF9 | 8EC0 | 8ED8 |
| 0000053360 | 0846 | FE87 | 468B | F706 | 01C6 | 7400 | A402 | D149 |
| 0000053400 | F3E9 | 13A5 | F3C9 | 8BA4 | 8BF3 | 1FFA | C28C | CB5D |
| 0000053420 | 8B55 | 8BEC | 8BD7 | 1EDE | 76C5 | 8B0A | 8CFE | 8ED8 |
| 0000053440 | 33C0 | B9C0 | FFFF | AEF2 | D1F7 | 7EC4 | 8B06 | A8C7 |
| 0000053460 | 7401 | A402 | D149 | F3E9 | 13A5 | F3C9 | 8BA4 | 8BF3 |
| 0000053500 | 1FFA | C28C | CB5D | 8B55 | 8BEC | 8BD7 | 1EDE | 76C5 |
| 0000053520 | C406 | 0A7E | C033 | FFB9 | F2FF | F7AE | 2BD1 | F3F9 |
| 0000053540 | 74A6 | 1B05 | 1DC0 | FFFF | 8B1F | 8BF3 | 5DFA | 00CB |
| 0000053560 | 8B55 | 8BEC | C4D7 | 067E | C033 | FFB9 | F2FF | F7AE |
| 0000053600 | 49D1 | 8B91 | 5DFA | 00CB | 8B55 | 57EC | 1E56 | 4E8B |
| 0000053620 | E30E | 8B27 | C4D9 | 067E | F78B | C033 | AEF2 | D9F7 |
| 0000053640 | CB03 | FE8B | 76C5 | F30A | 8AA6 | FF44 | C933 | 3A26 |
| 0000053660 | FF45 | 0477 | 0474 | 4949 | D1F7 | C18B | 5E1F | 8B5F |
| 0000053700 | 5DE5 | 00CB | 8B55 | 56EC | B357 | 8B01 | 0C4E | 468B |
| 0000053720 | 3306 | 83D2 | 0AF9 | 0175 | 1E99 | 7EC5 | E908 | 037B |
| 0000053740 | 8B55 | 50EC | 468B | 0504 | 0014 | 4BEB | 8B55 | 50EC |
| 0000053760 | 468B | 0504 | 0014 | 69EB | 8B55 | 50EC | 468B | 0504 |
| 0000054000 | 0114 | 33EB | 8B55 | 50EC | 468B | 0504 | 0114 | 51EB |
| 0000054020 | 8B55 | 50EC | 468B | C104 | 02E0 | FF68 | 50FF | FF6A |
| 0000054040 | FF6A | FF9A | 00FF | 0B00 | 75C0 | 5829 | E58B | C35D |
| 0000054060 | 8B55 | 50EC | 468B | FF04 | F406 | C10B | 02E0 | 1B68 |
| 0000054100 | 5055 | FF6A | FF6A | FF9A | 00FF | 0B00 | 75C0 | 5805 |
| 0000054120 | E58B | C35D | 11B8 | E900 | DD87 | 8B55 | 50EC | 468B |
| 0000054140 | C104 | 02E0 | 3F68 | 5055 | FF9A | 00FF | 0B00 | 75C0 |
| 0000054160 | FFE3 | F40E | 580B | E58B | C35D | 8B55 | FFEC | 0676 |

THU MAR 14 17:45:52 1991 SETUP.DLL PAGE 25, LINE 1417

| | | | | | | | | |
|---|---|---|---|---|---|---|---|---|
| 0000054200 | ADE8 | 83FF | 02C4 | E58B | CB5D | 8B55 | FFEC | 0676 |
| 0000054220 | C7E8 | 83FF | 02C4 | E58B | CB5D | 068E | 0430 | A126 |
| 0000054240 | 0006 | 3B48 | F606 | 770B | C107 | 06E0 | FFBA | C3FF |
| 0000054260 | 5357 | 6A51 | E80F | FF78 | C483 | 3B02 | F606 | 760B |
| 0000054300 | 8B40 | 05D8 | 0004 | FC25 | 8BFF | C1C8 | 06E0 | ADBA |
| 0000054320 | 5055 | 9A52 | 535F | 0000 | C00B | 3275 | 8B49 | 87F9 |
| 0000054340 | F63E | 2B0B | 51CF | C147 | 06E7 | E1C1 | 5705 | C28E |
| 0000054360 | ABF3 | 595F | C726 | 0445 | 0200 | C783 | E240 | 8BF5 |
| 0000054400 | 6AC3 | E80F | FF54 | C483 | 5902 | 5F5B | 9BEB | 10B8 |
| 0000054420 | E900 | DCCD | 8B55 | 56EC | 8B57 | 0C5E | C38B | 942D |
| 0000054440 | 9906 | 0CB9 | F700 | 50F1 | E850 | FEB4 | C483 | 8B02 |
| 0000054460 | 0A56 | D20B | 547E | C44A | 067E | D20B | 5674 | 4F8B |
| 0000054500 | E304 | 3B20 | 76CA | 8B02 | 1ECA | 37C5 | DAB4 | 9051 |
| 0000054520 | AAAC | C43A | FAE0 | 1F58 | 3789 | 3374 | 4729 | 2B04 |
| 0000054540 | EBD0 | 06D7 | 5253 | 531E | E80E | E262 | C483 | 5A04 |
| 0000054560 | 075B | FF3D | 74FF | AA08 | 0A3C | 1874 | EB4A | 3BBB |
| 0000054600 | 067E | 0674 | 47F6 | 200A | 0A74 | C033 | EB99 | 2B0E |
| 0000054620 | 29C1 | 0447 | C033 | 8BAA | 0646 | 568B | 5B08 | E853 |
| 0000054640 | FE4A | C483 | 5F02 | 5D5E | 00CB | 04C8 | 0000 | 5657 |
| 0000054660 | 126A | 7BE8 | 83FE | 02C4 | 06C6 | 4110 | 8B42 | 0646 |
| 0000054700 | 568B | A308 | 410C | 1689 | 410E | 06BE | 8941 | 8904 |
| 0000054720 | 0254 | 06C7 | 410A | 7FFF | 468D | 160E | FF50 | 0C76 |
| 0000054740 | 76FF | 1E0A | 9A56 | 452E | 570B | C483 | 8B0C | FFF8 |
| 0000054760 | 0A0E | 7841 | C40F | 061E | FF41 | 0606 | 2641 | 07C6 |
| 0000055000 | EB00 | 900D | 561E | 006A | 6A9A | 1E39 | 8351 | 06C4 |
| 0000055020 | 126A | 45E8 | 83FE | 02C4 | C78B | 5F5E | CBC9 | 04C8 |
| 0000055040 | 0000 | 5657 | 116A | 07E8 | 83FE | 02C4 | 06C6 | 411C |
| 0000055060 | 8B49 | 0646 | 568B | A308 | 4118 | 1689 | 411A | 12BE |
| 0000055100 | 8941 | 8904 | 0254 | 5052 | 709A | 6554 | 8357 | 04C4 |
| 0000055120 | 16A3 | 8D41 | 0E46 | 5016 | 76FF | FF0C | 0A76 | 681E |
| 0000055140 | 4112 | F49A | E83C | 8356 | 0CC4 | F88B | 116A | E9E8 |
| 0000055160 | 83FD | 02C4 | C78B | 5F5E | CBC9 | 8B55 | 57EC | 468B |
| 0000055200 | F706 | 0866 | 0573 | C033 | EB99 | 501A | 0C9A | 4B51 |
| 0000055220 | 5957 | D88B | DA0B | 0D74 | 8B50 | 8EF8 | 33C2 | 41C0 |
| 0000055240 | E9D1 | ABF3 | 5F58 | CB5D | 8B55 | 8BEC | 0E4E | 571E |
| 0000055260 | E356 | C548 | 0A76 | 7EC4 | 8B06 | 48C1 | D78B | D2F7 |
| 0000055300 | C22B | DB1B | C323 | C203 | D68B | D2F7 | C22B | DB1B |
| 0000055320 | C323 | C203 | 9140 | C12B | E9D1 | A5F3 | C913 | A4F3 |
| 0000055340 | E391 | 0B18 | 75F6 | 8C07 | 05D8 | FFFF | D88E | FF0B |
| 0000055360 | C775 | C08C | EA05 | 8E57 | EBC0 | 8BBE | 0646 | 568B |
| 0000055400 | 5E08 | 1F5F | CB5D | 8B55 | 8BEC | 0C4E | 38E3 | C457 |
| 0000055420 | 067E | D78B | DAF7 | 0C74 | D12B | DB1B | D323 | D103 |
| 0000055440 | D187 | D12B | 468B | 8A0A | D1E0 | F3E9 | 13AB | F3C9 |
| 0000055460 | 87AA | E3D1 | 8C10 | 81C3 | F5C3 | 8E57 | D1C3 | F3E9 |
| 0000055500 | 13AB | F3C9 | 5FAA | 468B | 8B06 | 0856 | CB5D | 4E8B |
| 0000055520 | 8B0E | 0646 | 568B | 1E08 | 7EC5 | 570A | 071E | 93FC |
| 0000055540 | C00A | 1374 | F983 | 750A | 0B0E | 79D2 | B00A | AA2D |
| 0000055560 | DBF7 | D283 | F700 | 8BDA | 92F7 | D233 | C00B | 0274 |
| 0000055600 | F1F7 | F793 | 92F1 | D387 | 3004 | 393C | 0276 | 2704 |
| 0000055620 | 8BAA | 0BC2 | 75C3 | 88E2 | 4F05 | 86AC | 8805 | FF44 |
| 0000055640 | 448D | 3B01 | 72C7 | 8CF2 | 58DA | 5F1F | 8B5E | 5DE5 |
| 0000055660 | 00CB | 8B55 | 83EC | 02EC | 5756 | 01B2 | 0AEB | 8B55 |
| 0000055700 | 83EC | 02EC | 5756 | D232 | 5688 | C4FF | 0676 | AC26 |
| 0000055720 | 203C | FA74 | 0D3C | 0677 | 093C | D272 | F0EB | 2B3C |
| 0000055740 | 0874 | 2D3C | 0675 | 4E80 | 02FF | AC26 | 4E8B | E30E |
| 0000055760 | 830D | 01F9 | 0574 | F983 | 7624 | E91E | 0099 | 0AB9 |
| 0000056000 | 3C00 | 7530 | 2614 | 3C80 | 7478 | 260B | 3C80 | 7458 |
| 0000056020 | B905 | 0008 | 03EB | 10B9 | 8900 | 0E4E | F983 | 7510 |
| 0000056040 | 3C13 | 7530 | 260F | 3C80 | 7478 | 2606 | 3C80 | 7558 |

THU MAR 14 17:45:52 1991 SETUP.DLL PAGE 26, LINE 1476

```
0000056060  4603  AC26  D233  DB33  A3E8  7200  8B63  0E4E
0000056100  C13B  5C73  4E80  08FF  F88B  C28B  E1F7  0473
0000056120  4E80  04FF  8B50  F7C3  59E1  D103  0473  4E80
0000056140  04FF  C703  D283  7300  8004  FF4E  8B04  26D8
0000056160  EBAC  06C5  23E8  8BFC  8ED8  26C2  07C7  0022
0000056200  BA07  7FFF  FFBB  F6FF  FF46  7401  812A  00CA
0000056220  8080  FF66  EBFD  8B20  0676  DB33  D233  17EB
0000056240  F64E  FF46  7408  F6F0  FF46  7504  F6C6  FF46
0000056260  7501  0B04  78D2  8CBC  C4C0  0A7E  C18C  CF0B
0000056300  0774  8926  0245  8926  8B35  F6C3  FF46  7402
0000056320  F707  83D8  00D2  DAF7  5E5F  E58B  CB5D  613C
0000056340  0272  DF24  302C  0D72  0A3C  0872  113C  0572
0000056360  072C  243C  98F5  00C3  8B55  FFEC  0876  76FF
0000056400  3306  50C0  9A50  FFFF  0000  C085  0374  F6E9
0000056420  8BDC  5DE5  00CB  8B55  1EEC  C553  065E  76FF
0000056440  FF0C  0A76  77FF  FF02  0E37  2BE8  8900  8907
0000056460  0257  1F5B  CA5D  0008  8B55  1EEC  C553  065E
0000056500  078B  578B  8B02  0A4E  E80E  003E  0789  5789
0000056520  5B02  5D1F  06CA  0000  8B55  8BEC  0846  4E8B
0000056540  0B0C  8BC8  0A4E  0975  468B  F706  5DE1  08CA
0000056560  5300  E1F7  D88B  468B  F706  0C66  D803  468B
0000056600  F706  03E1  5BD3  CA5D  0008  ED32  06E3  E0D1
0000056620  D2D1  FAE2  37CB  0300  B402  0331  6B00  0200
0000056640  8F00  0157  0000  0500  1402  0331  2500  0200
0000056660  CF00  0255  0000  0300  B501  021F  7A00  0200
0000056700  6500  0355  0000  0300  5801  0134  0500  0300
0000056720  4701  0222  7E00  0300  9901  0224  7F00  0300
0000056740  F001  0133  0700  0300  7C01  0132  0800  0300
0000056760  DB01  014E  8900  0300  FE02  0330  7A00  0300
0000057000  CA01  0150  8A00  0500  B102  0331  3300  0300
0000057020  E300  0552  0000  0300  4701  0155  8C00  0200
0000057040  6901  0155  8D00  0300  D501  0226  8600  0300
0000057060  2301  0155  8E00  0300  5201  0222  0700  0300
0000057100  0E01  022A  8700  0300  4701  0221  8B00  0300
0000057120  8D01  0227  0B00  0300  D801  0220  1000  0300
0000057140  8301  0227  1300  0300  4101  041C  0800  0500
0000057160  3901  0158  8800  0300  AA01  0153  2200  0300
0000057200  6301  051F  0400  0300  D401  0155  2600  0300
0000057220  D001  0531  0700  0300  3B01  0615  0500  0300
0000057240  1901  0730  0200  0300  C601  052B  1300  0200
0000057260  AE02  0331  3300  0300  7501  014F  3A00  0300
0000057300  5F01  0223  B300  0300  9501  014C  3B00  0300
0000057320  2401  0615  1400  0300  4D01  051F  1C00  0300
0000057340  0601  015A  3C00  0300  5901  014D  4400  0300
0000057360  6C01  014C  4600  0300  8D01  014D  4B00  0300
0000057400  4702  0331  3D00  0300  B501  014C  4D00  0300
0000057420  A401  0403  4300  0300  CD01  0132  5B00  0300
0000057440  3F02  0332  4C00  0300  4001  0404  5100  0300
0000057460  2702  0327  5C00  0500  E802  0330  1700  0300
0000057500  A800  011F  5900  0320  8A01  0414  5F00  0500
0000057520  0000  0000  0200  0000  0000  0000  0000  0000
0000057540  0000  0000  0000  0000  0000  0000  0000  0000
*
0000057620  0000  0000  0200  0000  0000  0000  0000  0000
0000057640  0000  0000  0000  0000  0000  0000  0000  0000
*
0000057720  0000  0000  0200  0000  0000  0000  0000  0000
0000057740  0000  0000  0000  0000  0000  0000  0000  0000
*
```

THU MAR 14 17:45:52 1991 SETUP.DLL PAGE 27, LINE 1535

| | | | | | | | | |
|---|---|---|---|---|---|---|---|---|
| 0000060020 | 0000 | 0000 | 0200 | 0000 | 0000 | 0000 | 0000 | 0000 |
| 0000060040 | 0000 | 0000 | 0000 | 0000 | 534D | 5220 | 6E75 | 542D |
| 0000060060 | 6D69 | 2065 | 694C | 7262 | 7261 | 2079 | 202D | 6F43 |
| 0000060100 | 7970 | 6972 | 6867 | 2074 | 6328 | 2029 | 3931 | 3039 |
| 0000060120 | 202C | 694D | 7263 | 736F | 666F | 2074 | 6F43 | 7072 |
| 0000060140 | 0018 | 626B | 632E | 7300 | 7465 | 7075 | 702E | 4700 |
| 0000060160 | 455F | 5F57 | 0054 | 5F47 | 5745 | 545F | 7200 | 2500 |
| 0000060200 | 0069 | 6925 | 7325 | 7325 | 6425 | 7325 | 6425 | 5C00 |
| 0000060220 | 0073 | 0020 | 735C | 2000 | 5400 | 3231 | 5F33 | 4E49 |
| 0000060240 | 5F50 | 4B4D | 5945 | 0053 | 0042 | 008E | 0047 | FFFF |
| 0000060260 | 0000 | 0000 | 0000 | 0000 | 0000 | 0000 | 0000 | 0000 |
| * | | | | | | | | |
| 0000060340 | 0000 | 0000 | 0000 | 626B | 695F | 696E | 5F74 | 6174 |
| 0000060360 | 6C62 | 0065 | 4F4E | 4D52 | 4C41 | 5300 | 5145 | 5300 |
| 0000060400 | 4948 | 5446 | 4300 | 5041 | 4C53 | 434F | 004B | 5F6C |
| 0000060420 | 6669 | 632E | 7300 | 7465 | 7075 | 702E | 4700 | 455F |
| 0000060440 | 5F57 | 0054 | 5F47 | 5745 | 545F | 0000 | 00EE | 0112 |
| 0000060460 | 00F5 | 008A | 5F6C | 6975 | 695F | 6F63 | 5F6E | 656C |
| 0000060500 | 7261 | 5F6E | 6F66 | 6D72 | 4700 | 455F | 5F57 | 0054 |
| 0000060520 | 5F47 | 5745 | 545F | 0000 | 5F6C | 6369 | 6E6F | 0000 |
| 0000060540 | 6C6C | 695F | 6F63 | 2E6E | 0063 | 6573 | 7574 | 2E70 |
| 0000060560 | 0070 | 6E69 | 0074 | 6E69 | 0074 | 654C | 7261 | 206E |
| 0000060600 | 6F50 | 6E69 | 6574 | 0072 | 6F50 | 6E69 | 6574 | 2072 |
| 0000060620 | 616E | 656D | 003A | 0140 | 017C | 014A | 010E | 0000 |
| 0000060640 | 0000 | 0000 | 0000 | 0000 | 0000 | 0000 | 0000 | 0000 |
| 0000060660 | 0000 | 0000 | 0000 | 0000 | 0000 | 0000 | 0000 | 6C6C |
| 0000060700 | 695F | 696E | 5F74 | 6F66 | 6D72 | 4700 | 455F | 5F57 |
| 0000060720 | 0054 | 5F47 | 5745 | 545F | 6F00 | 5F70 | 6F63 | 6564 |
| 0000060740 | 203D | 6425 | 203B | 616E | 656D | 203D | 7325 | 6200 |
| 0000060760 | 615F | 6772 | 0073 | 6C6C | 645F | 676C | 6900 | 746E |
| 0000061000 | 6900 | 746E | 4E00 | 7765 | 7120 | 6175 | 696C | 7974 |
| 0000061020 | 003A | 7325 | 2520 | 2E64 | 0000 | 6C6C | 6C5F | 6165 |
| 0000061040 | 6E72 | 655F | 646E | 6465 | 6900 | 746E | 6900 | 746E |
| 0000061060 | 0000 | 6C6C | 665F | 726F | 5F6D | 736D | 0067 | 6E69 |
| 0000061100 | 0074 | 6E69 | 0074 | 6C6C | 735F | 7465 | 665F | 726F |
| 0000061120 | 006D | 6E69 | 0074 | 6E69 | 0074 | 6C6C | 735F | 7465 |
| 0000061140 | 695F | 6F63 | 006E | 6E69 | 0074 | 6E69 | 0074 | 6C6C |
| 0000061160 | 645F | 5F62 | 6573 | 0074 | 6E69 | 0074 | 6E69 | 0074 |
| 0000061200 | 6C6C | 735F | 7465 | 695F | 6F63 | 5F6E | 696C | 5F62 |
| 0000061220 | 6469 | 0000 | 756C | 695F | 6F63 | 2E6E | 0063 | 6573 |
| 0000061240 | 7574 | 2E70 | 0070 | 5F47 | 5745 | 545F | 4700 | 455F |
| 0000061260 | 5F57 | 0054 | 0274 | 029A | 027E | 0178 | 0000 | 0000 |
| 0000061300 | 6C6C | 755F | 645F | 7369 | 5F70 | 6C64 | 0067 | 6548 |
| 0000061320 | 706C | 6E20 | 746F | 7920 | 7465 | 6920 | 706D | 656C |
| 0000061340 | 656D | 746E | 6465 | 6900 | 746E | 6900 | 746E | 0000 |
| 0000061360 | 6C6C | 755F | 775F | 695F | 6F63 | 5F6E | 6F66 | 6D72 |
| 0000061400 | 6900 | 746E | 6900 | 746E | 0000 | 6C6C | 755F | 775F |
| 0000061420 | 6D5F | 6773 | 4700 | 455F | 5F57 | 0054 | 5F47 | 5745 |
| 0000061440 | 545F | 0000 | 6C6C | 755F | 675F | 7465 | 665F | 726F |
| 0000061460 | 5F6D | 6E69 | 6F66 | 0000 | 6C6C | 6D5F | 7369 | 2E63 |
| 0000061500 | 0063 | 6573 | 7574 | 2E70 | 0070 | 5F47 | 5745 | 545F |
| 0000061520 | 4700 | 455F | 5F57 | 0054 | 6F50 | 6E69 | 6574 | 2072 |
| 0000061540 | 6177 | 2073 | 6F6E | 2074 | 6F6D | 6964 | 6966 | 6465 |
| 0000061560 | 202E | 6153 | 6576 | 6120 | 796E | 6F68 | 2077 | 003F |
| 0000061600 | 6F50 | 6E69 | 6574 | 2072 | 6177 | 2073 | 6F6D | 6964 |
| 0000061620 | 6966 | 6465 | 202E | 6153 | 6576 | 6320 | 6168 | 676E |
| 0000061640 | 7365 | 3F20 | 0000 | 0318 | 038C | 0322 | 0296 | 6C6C |
| 0000061660 | 735F | 7661 | 5F65 | 736D | 0067 | 5F47 | 5745 | 545F |
| 0000061700 | 4700 | 455F | 5F57 | 0054 | 6C6C | 635F | 7672 | 695F |

```
THU MAR 14 17:45:52 1991  SETUP.DLL  PAGE 28, LINE 1594

0000061720  6F63  5F6E  736D  0067  5F47  5745  545F  4700
0000061740  455F  5F57  0054  6C6C  635F  7672  705F  7261
0000061760  6D61  6D5F  6773  4700  455F  5F57  0054  5F47
0000062000  5745  545F  0000  6C6C  635F  7672  635F  646D
0000062020  6D5F  6773  4700  455F  5F57  0054  5F47  5745
0000062040  545F  6500  7272  635F  646F  3D65  2520  0064
0000062060  5F62  7261  7367  0000  6C6C  645F  7369  5F70
0000062100  7265  5F72  736D  0067  0000  0000  0000  0006
0000062120  0000  4120  411F  0000  0005  0000  0000  0000
0000062140  0000  0000  0000  0000  0000  435F  465F  4C49
0000062160  5F45  4E49  4F46  003D  0001  FFFF  0000  0000
0000062200  0000  0000  0000  0000  0000  0000  0000  0001
0000062220  8101  8181  0000  0000  0000  0000  0000  0000
0000062240  0000  0000  0000  0000  0000  0000  0000  0000
*
0000062620  0A00  0A0A  0A0A  0A0A  0A0A  0A0A  0A0A  0A0A
0000062640  0A0A  0A0A  0A0A  0A0A  0A0A  0A0A  0A0A  0A0A
*
0000063220  000A  0000  0000  0000  0000  0000  0000  0000
0000063240  0000  FF00  00FF  0000  0000  FFFF  FFFF  005C
0000063260  005C  0000  0000  069C  0000  0000  FFFF  0001
0000063300  0000  0000  0000  0000  0000  0102  0000  0000
0000063320  0000  0000  0000  0202  0000  0000  0000  0000
0000063340  0000  0000  0000  0000  0000  0000  0000  0000
*
0000064220  0000  0000  0001  0200  0000  0000  0000  0000
0000064240  0000  0006  0000  0000  0000  0000  0000  0000
*
0000065160  0000  0000  0868  0388  0920  0D2D  005D  005D
0000065200  0006  0600  0100  0000  0010  0603  0600  1002
0000065220  4504  4545  0505  0505  3505  0030  0050  0000
0000065240  2000  3020  5850  0807  3000  3030  5057  0007
0000065260  2000  0020  0000  0000  6008  6060  6060  0060
0000065300  7000  7870  7878  0878  0807  0000  0007  0808
0000065320  0008  0800  0800  0000  2808  756E  6C6C  0629
0000065340  0000  0000  0000  0000  0000  0000  0000  0000
0000065360  0003  2000  3514  0C08  3514  0AD6  3514  0ADA
0000065400  3514  0ADE  3514  0AE2  3514  0AE6  0000  0000
0000065420  0101  2000  2020  2020  2020  2020  2828  2828
0000065440  2028  2020  2020  2020  2020  2020  2020  2020
0000065460  2020  4820  1010  1010  1010  1010  1010  1010
0000065500  1010  8410  8484  8484  8484  8484  1084  1010
0000065520  1010  1010  8181  8181  8181  0101  0101  0101
0000065540  0101  0101  0101  0101  0101  0101  0101  1010
0000065560  1010  1010  8282  8282  8282  0202  0202  0202
0000065600  0202  0202  0202  0202  0202  0202  0202  1010
0000065620  1010  0020  0000  0000  0000  0000  0000  0000
0000065640  0000  0000  0000  0000  0000  0000  0000  0000
*
0000066020  0000  0000  0000  0003  0000  0000  0000  0000
0000066040  0000  0000  0000  3C78  FFFF  FFFF  FFFF  0C0A
0000066060  0C0C  0C0E  0C10  0C12  0C14  0C16  0C18  0A56
0000066100  3C3C  4D4E  4753  3E3E  0000  3652  3030  0D30
0000066120  2D0A  7320  6174  6B63  6F20  6576  6672  6F6C
0000066140  0D77  000A  0003  3652  3030  0D33  2D0A  6920
0000066160  746E  6765  7265  6420  7669  6469  2065  7962
0000066200  3020  0A0D  0800  5200  3036  3830  0A0D  202D
0000066220  6F6E  2074  6E65  756F  6867  7320  6170  6563
0000066240  6620  726F  6120  6772  6D75  6E65  7374  0A0D
```

THU MAR 14 17:45:52 1991 SETUP.DLL PAGE 29, LINE 1653

| | | | | | | | | |
|---|---|---|---|---|---|---|---|---|
| 0000066260 | 0900 | 5200 | 3036 | 3930 | 0A0D | 202D | 6F6E | 2074 |
| 0000066300 | 6E65 | 756F | 6867 | 7320 | 6170 | 6563 | 6620 | 726F |
| 0000066320 | 6520 | 766E | 7269 | 6E6F | 656D | 746E | 0A0D | FC00 |
| 0000066340 | 0D00 | 000A | 00FF | 7572 | 2D6E | 6974 | 656D | 6520 |
| 0000066360 | 7272 | 726F | 0020 | 0002 | 3652 | 3030 | 0D32 | 2D0A |
| 0000066400 | 6620 | 6F6C | 7461 | 6E69 | 2D67 | 6F70 | 6E69 | 2074 |
| 0000066420 | 7573 | 7070 | 726F | 2074 | 6F6E | 2074 | 6F6C | 6461 |
| 0000066440 | 6465 | 0A0D | 1100 | 5200 | 3036 | 3731 | 0A0D | 202D |
| 0000066460 | 6E75 | 7865 | 6570 | 7463 | 6465 | 6D20 | 6C75 | 6974 |
| 0000066500 | 6874 | 6572 | 6461 | 6C20 | 636F | 206B | 7265 | 6F72 |
| 0000066520 | 0D72 | 000A | 0010 | 3652 | 3130 | 0D36 | 2D0A | 6E20 |
| 0000066540 | 746F | 6520 | 6F6E | 6775 | 2068 | 7073 | 6361 | 2065 |
| 0000066560 | 6F66 | 2072 | 6874 | 6572 | 6461 | 6420 | 7461 | 0D61 |
| 0000066600 | 000A | FFFF | 05FF | 0200 | EA00 | 010A | 0000 | 0200 |
| 0000066620 | 9600 | 0406 | 0000 | 0200 | 1E00 | 050C | 0000 | 0200 |
| 0000066640 | 1A02 | 030C | 1700 | 0200 | 1C02 | 030C | 2500 | 4E00 |
| 0000066660 | 3042 | 1732 | 0091 | 0100 | 0000 | E400 | 000B | 0000 |
| 0000066700 | 0100 | 1A00 | 745C | 3231 | 5C33 | 7061 | 5C70 | 6573 |
| 0000066720 | 7574 | 5C70 | 626F | 5C6A | 626B | 6F2E | 6A62 | 0001 |
| 0000066740 | 0BE4 | 0351 | 0000 | 0000 | 0001 | 5C1C | 3174 | 3332 |
| 0000066760 | 615C | 7070 | 735C | 7465 | 7075 | 6F5C | 6A62 | 6C5C |
| 0000067000 | 695F | 2E66 | 626F | 016A | 3600 | 690F | 000F | 0000 |
| 0000067020 | 0100 | 1F00 | 745C | 3231 | 5C33 | 7061 | 5C70 | 6573 |
| 0000067040 | 7574 | 5C70 | 626F | 5C6A | 6C6C | 695F | 6F63 | 2E6E |
| 0000067060 | 626F | 016A | A000 | 351E | 000C | 0000 | 0100 | 1F00 |
| 0000067100 | 745C | 3231 | 5C33 | 7061 | 5C70 | 6573 | 7574 | 5C70 |
| 0000067120 | 626F | 5C6A | 756C | 695F | 6F63 | 2E6E | 626F | 016A |
| 0000067140 | D600 | 8A2A | 0007 | 0000 | 0100 | 1F00 | 745C | 3231 |
| 0000067160 | 5C33 | 7061 | 5C70 | 6573 | 7574 | 5C70 | 626F | 5C6A |
| 0000067200 | 6C6C | 6D5F | 7369 | 2E63 | 626F | 016A | 7000 | D132 |
| 0000067220 | 0000 | 0100 | 0100 | 0B00 | 6C64 | 5C6C | 7363 | 2E75 |
| 0000067240 | 7361 | 016D | 4200 | AF33 | 0001 | 0100 | 0100 | 0E00 |
| 0000067260 | 6C64 | 5C6C | 7363 | 6475 | 7461 | 612E | 6D73 | 0001 |
| 0000067300 | 34F2 | 0022 | 0000 | 0001 | 0001 | 6F0F | 3273 | 635C |
| 0000067320 | 7472 | 6D30 | 6773 | 612E | 6D73 | 0001 | 3514 | 0006 |
| 0000067340 | 0000 | 0001 | 0001 | 630A | 7472 | 6630 | 2E70 | 7361 |
| 0000067360 | 016D | 1A00 | 1A35 | 0000 | 0100 | 0100 | 0A00 | 6863 |
| 0000067400 | 736B | 6B74 | 612E | 6D73 | 0001 | 3534 | 0108 | 0000 |
| 0000067420 | 0001 | 0001 | 640D | 6C6C | 735C | 7465 | 6E65 | 7076 |
| 0000067440 | 632E | 0001 | 553C | 0065 | 0000 | 0001 | 0001 | 6F0F |
| 0000067460 | 3273 | 6E5C | 736D | 6867 | 7264 | 612E | 6D73 | 0001 |
| 0000067500 | 36A2 | 00C0 | 0000 | 0001 | 0001 | 6F0E | 3273 | 645C |
| 0000067520 | 736F | 6572 | 2E74 | 7361 | 016D | 6200 | 0237 | 0001 |
| 0000067540 | 0100 | 0100 | 0800 | 6366 | 6F6C | 6573 | 632E | 0001 |
| 0000067560 | 3864 | 006A | 0000 | 0001 | 0001 | 6607 | 706F | 6E65 |
| 0000067600 | 632E | 0000 | 0000 | 000D | 0000 | 0001 | 0000 | 5F0B |
| 0000067620 | 6663 | 756C | 6873 | 612E | 6D73 | 0000 | 0000 | 0000 |
| 0000067640 | 0000 | 0001 | 0000 | 5F07 | 6966 | 656C | 632E | 0001 |
| 0000067660 | 38CE | 009C | 0000 | 0001 | 0001 | 5F0B | 6966 | 626C |
| 0000067700 | 6675 | 612E | 6D73 | 0001 | 396A | 00E5 | 0000 | 0001 |
| 0000067720 | 0001 | 5F0B | 6C66 | 6273 | 6675 | 612E | 6D73 | 0001 |
| 0000067740 | 3A50 | 0037 | 0000 | 0001 | 0001 | 5F0C | 7266 | 6565 |
| 0000067760 | 7562 | 2E66 | 7361 | 016D | 8800 | 4B3A | 0000 | 0100 |
| 0000070000 | 0100 | 0B00 | 675F | 7465 | 7562 | 2E66 | 7361 | 016D |
| 0000070020 | D400 | F23A | 0000 | 0100 | 0100 | 0700 | 6F5F | 6570 |
| 0000070040 | 2E6E | 0163 | C600 | 2E3B | 0001 | 0100 | 0100 | 0800 |
| 0000070060 | 6666 | 756C | 6873 | 632E | 0001 | 3CF4 | 082A | 0000 |
| 0000070100 | 0001 | 0001 | 6907 | 706E | 7475 | 632E | 0001 | 451E |
| 0000070120 | 04FA | 0000 | 0001 | 0001 | 6F0A | 7475 | 7570 | 2E74 |

THU MAR 14 17:45:52 1991 SETUP.DLL PAGE 30, LINE 1712

| | | | | | | | | |
|---|---|---|---|---|---|---|---|---|
| 0000070140 | 7361 | 016D | 1800 | 784A | 0000 | 0100 | 0100 | 0800 |
| 0000070160 | 7473 | 6572 | 6D61 | 632E | 0001 | 4A90 | 00AA | 0000 |
| 0000070200 | 0001 | 0001 | 7508 | 676E | 7465 | 2E63 | 0163 | 3A00 |
| 0000070220 | 3F4B | 0000 | 0100 | 0100 | 0D00 | 736F | 5C32 | 6C63 |
| 0000070240 | 736F | 2E65 | 7361 | 016D | 7A00 | 774B | 0000 | 0100 |
| 0000070260 | 0100 | 0D00 | 736F | 5C32 | 736C | 6565 | 2E6B | 7361 |
| 0000070300 | 016D | F200 | DD4B | 0001 | 0100 | 0100 | 0C00 | 736F |
| 0000070320 | 5C32 | 706F | 6E65 | 612E | 6D73 | 0001 | 4DD0 | 015D |
| 0000070340 | 0000 | 0001 | 0001 | 6F0C | 3273 | 725C | 6165 | 2E64 |
| 0000070360 | 7361 | 016D | 2E00 | DD4F | 0001 | 0100 | 0100 | 0900 |
| 0000070400 | 7277 | 7469 | 2E65 | 7361 | 006D | 0000 | 0000 | 0000 |
| 0000070420 | 0100 | 0000 | 0B00 | 7874 | 6D74 | 646F | 2E65 | 7361 |
| 0000070440 | 016D | 0C00 | 0A51 | 0000 | 0100 | 0100 | 0A00 | 616D |
| 0000070460 | 6C6C | 636F | 612E | 6D73 | 0001 | 5116 | 000A | 0000 |
| 0000070500 | 0001 | 0001 | 6608 | 6572 | 2E65 | 7361 | 016D | 2000 |
| 0000070520 | AF51 | 0000 | 0100 | 0100 | 0B00 | 6D66 | 6C61 | 6F6C |
| 0000070540 | 2E63 | 7361 | 006D | 0000 | 0000 | 0000 | 0100 | 0000 |
| 0000070560 | 0900 | 6466 | 7461 | 2E61 | 7361 | 016D | D000 | 3451 |
| 0000070600 | 0000 | 0100 | 0100 | 0B00 | 6E69 | 7469 | 6573 | 2E67 |
| 0000070620 | 7361 | 016D | 0400 | 3652 | 0000 | 0100 | 0100 | 0B00 |
| 0000070640 | 696C | 6B6E | 6573 | 2E67 | 7361 | 016D | 3A00 | 7C52 |
| 0000070660 | 0000 | 0100 | 0100 | 0C00 | 6573 | 7261 | 6863 | 6773 |
| 0000070700 | 612E | 6D73 | 0001 | 52B6 | 00E2 | 0000 | 0001 | 0001 |
| 0000070720 | 670B | 6F72 | 7377 | 6765 | 612E | 6D73 | 0001 | 5398 |
| 0000070740 | 0031 | 0000 | 0001 | 0001 | 6E0A | 7765 | 6573 | 2E67 |
| 0000070760 | 7361 | 016D | CA00 | 4653 | 0000 | 0100 | 0100 | 0A00 |
| 0000071000 | 7473 | 6372 | 7461 | 612E | 6D73 | 0001 | 5410 | 0036 |
| 0000071020 | 0000 | 0001 | 0001 | 730A | 7274 | 7063 | 2E79 | 7361 |
| 0000071040 | 016D | 4600 | 2954 | 0000 | 0100 | 0100 | 0A00 | 7473 |
| 0000071060 | 6372 | 706D | 612E | 6D73 | 0001 | 5470 | 0017 | 0000 |
| 0000071100 | 0001 | 0001 | 730A | 7274 | 656C | 2E6E | 7361 | 016D |
| 0000071120 | 8800 | 3B54 | 0000 | 0100 | 0100 | 0B00 | 7473 | 6E72 |
| 0000071140 | 6D63 | 2E70 | 7361 | 016D | C400 | 1C54 | 0000 | 0100 |
| 0000071160 | 0100 | 0800 | 7469 | 616F | 612E | 6D73 | 0000 | 0000 |
| 0000071200 | 0000 | 0000 | 0001 | 0000 | 630C | 696D | 6373 | 6164 |
| 0000071220 | 2E74 | 7361 | 006D | 0000 | 0000 | 0000 | 0100 | 0000 |
| 0000071240 | 0900 | 7463 | 7079 | 2E65 | 7361 | 016D | E000 | BA54 |
| 0000071260 | 0000 | 0100 | 0100 | 0D00 | 736F | 5C32 | 6C6D | 636F |
| 0000071300 | 2E6B | 7361 | 016D | 9A00 | 7A55 | 0000 | 0100 | 0100 |
| 0000071320 | 1000 | 6C64 | 5C6C | 6974 | 7464 | 6261 | 656C | 612E |
| 0000071340 | 6D73 | 0001 | 5614 | 0095 | 0000 | 0001 | 0001 | 6609 |
| 0000071360 | 6567 | 7374 | 612E | 6D73 | 0001 | 56AA | 0074 | 0000 |
| 0000071400 | 0001 | 0001 | 7309 | 7270 | 6E69 | 6674 | 632E | 0001 |
| 0000071420 | 571E | 005C | 0000 | 0001 | 0001 | 7308 | 6373 | 6E61 |
| 0000071440 | 2E66 | 0163 | 7A00 | 2E57 | 0000 | 0100 | 0100 | 0A00 |
| 0000071460 | 6163 | 6C6C | 636F | 612E | 6D73 | 0001 | 57A8 | 005E |
| 0000071500 | 0000 | 0001 | 0001 | 680B | 656D | 636D | 7970 | 612E |
| 0000071520 | 6D73 | 0001 | 5806 | 0048 | 0000 | 0001 | 0001 | 680B |
| 0000071540 | 656D | 736D | 7465 | 612E | 6D73 | 0001 | 584E | 0063 |
| 0000071560 | 0000 | 0001 | 0001 | 7808 | 6F74 | 2E61 | 7361 | 016D |
| 0000071600 | B200 | 4558 | 0001 | 0100 | 0100 | 0A00 | 7473 | 7472 |
| 0000071620 | 6C6F | 612E | 6D73 | 0001 | 59F8 | 001D | 0000 | 0001 |
| 0000071640 | 0001 | 6F0E | 3273 | 755C | 6C6E | 6E69 | 2E6B | 7361 |
| 0000071660 | 016D | 1600 | 225A | 0000 | 0100 | 0100 | 0900 | 6C61 |
| 0000071700 | 756D | 2E6C | 7361 | 016D | 3800 | 1F5A | 0000 | 0100 |
| 0000071720 | 0100 | 0900 | 6C61 | 6873 | 2E6C | 7361 | 016D | 5800 |
| 0000071740 | 325A | 0000 | 0100 | 0100 | 0800 | 6D6C | 6C75 | 612E |
| 0000071760 | 6D73 | 0001 | 5A8A | 000B | 0000 | 0001 | 0001 | 6C08 |
| 0000072000 | 6873 | 2E6C | 7361 | 006D | 0100 | CB00 | 0D04 | 424B |

THU MAR 14 17:45:52 1991 SETUP.DLL PAGE 31, LINE 1771

| | | | | | | | | |
|---|---|---|---|---|---|---|---|---|
| 0000072020 | 495F | 494E | 5F54 | 4154 | 4C42 | F645 | 0104 | D800 |
| 0000072040 | 1404 | 424B | 535F | 5445 | 435F | 5255 | 4552 | 544E |
| 0000072060 | 545F | 4241 | 454C | 0527 | 0001 | 04D9 | 4B12 | 5F42 |
| 0000072100 | 5F51 | 5543 | 5252 | 4E45 | 5F54 | 4154 | 4C42 | 5345 |
| 0000072120 | 0105 | DB00 | 0D04 | 424B | 4D5F | 444F | 4649 | 5F59 |
| 0000072140 | 454B | 9159 | 0106 | DD00 | 0D04 | 424B | 525F | 4D45 |
| 0000072160 | 564F | 5F45 | 454B | 1E59 | 0107 | DF00 | 0F04 | 424B |
| 0000072200 | 475F | 5445 | 4B5F | 5945 | 415F | 5454 | 8052 | 0107 |
| 0000072220 | E100 | 0F04 | 424B | 475F | 5445 | 4B5F | 5945 | 435F |
| 0000072240 | 444F | 8245 | 0108 | E300 | 1004 | 424B | 475F | 5445 |
| 0000072260 | 425F | 5341 | 5F45 | 4F43 | 4544 | 0958 | 0001 | 04E5 |
| 0000072300 | 4B11 | 5F42 | 4547 | 5F54 | 4853 | 4649 | 5F54 | 4F43 |
| 0000072320 | 4544 | 0A02 | 0001 | 04E7 | 4B19 | 5F42 | 4547 | 5F54 |
| 0000072340 | 454B | 5F59 | 5954 | 4550 | 465F | 4F52 | 5F4D | 414E |
| 0000072360 | 454D | 0AD0 | 0001 | 04EC | 4B10 | 5F42 | 4547 | 5F54 |
| 0000072400 | 4B4D | 5945 | 415F | 5454 | 4552 | 010B | EE00 | 1004 |
| 0000072420 | 424B | 475F | 5445 | 4D5F | 454B | 5F59 | 4F43 | 4544 |
| 0000072440 | 0BE4 | 0001 | 05D0 | 4C14 | 555F | 5F49 | 4349 | 4E4F |
| 0000072460 | 4C5F | 4145 | 4E52 | 465F | 524F | AD4D | 010D | D600 |
| 0000072500 | 0605 | 5F4C | 4349 | 4E4F | 0F36 | 0001 | 06CF | 5F0D |
| 0000072520 | 6C6C | 695F | 696E | 5F74 | 6F66 | 6D72 | 109E | 0001 |
| 0000072540 | 06D8 | 5F07 | 6C6C | 645F | 676C | 1619 | 0001 | 06DD |
| 0000072560 | 5F0F | 6C6C | 6C5F | 6165 | 6E72 | 655F | 646E | 6465 |
| 0000072600 | 1765 | 0001 | 06E1 | 5F0C | 6C6C | 665F | 726F | 5F6D |
| 0000072620 | 736D | A867 | 0118 | E400 | 0C06 | 6C5F | 5F6C | 6573 |
| 0000072640 | 5F74 | 6F66 | 6D72 | 1A24 | 0001 | 06E6 | 5FUC | 6C6C |
| 0000072660 | 735F | 7465 | 695F | 6F63 | 7E6E | 011B | E800 | 0A06 |
| 0000072700 | 6C5F | 5F6C | 6264 | 735F | 7465 | 1D81 | 0001 | 06EB |
| 0000072720 | 5F13 | 6C6C | 735F | 7465 | 695F | 6F63 | 5F6E | 696C |
| 0000072740 | 5F62 | 6469 | 1EA0 | 0001 | 06D3 | 5F0E | 6C6C | 755F |
| 0000072760 | 645F | 7369 | 5F70 | 6C64 | 5967 | 0120 | DA00 | 0D06 |
| 0000073000 | 4C4C | 555F | 445F | 474C | 505F | 4F52 | 7443 | 0123 |
| 0000073020 | DD00 | 0C06 | 6C5F | 5F6C | 5F71 | 6F66 | 6D72 | 705F |
| 0000073040 | 2397 | 0001 | 06DF | 5F11 | 6C6C | 755F | 775F | 695F |
| 0000073060 | 6F63 | 5F6E | 6F66 | 6D72 | 2620 | 0001 | 06E4 | 5F0B |
| 0000073100 | 6C6C | 755F | 775F | 6D5F | 6773 | 2747 | 0001 | 06E8 |
| 0000073120 | 5F0C | 6C6C | 755F | 655F | 616E | 6C62 | 8065 | 012A |
| 0000073140 | ED00 | 0E06 | 6C5F | 5F6C | 5F75 | 6567 | 5F74 | 7768 |
| 0000073160 | 646E | 2E07 | 0001 | 055E | 5F11 | 6C6C | 635F | 7672 |
| 0000073200 | 705F | 7261 | 6D61 | 6D5F | 6773 | 2F62 | 0001 | 0562 |
| 0000073220 | 5F0F | 6C6C | 635F | 7672 | 635F | 646D | 6D5F | 6773 |
| 0000073240 | 30BC | 0001 | 0566 | 5F10 | 6C6C | 645F | 7369 | 5F70 |
| 0000073260 | 7265 | 5F72 | 736D | D667 | 012A | 5000 | 0C05 | 6C5F |
| 0000073300 | 5F6C | 6173 | 6576 | 6D5F | 6773 | 2CA1 | 0001 | 055A |
| 0000073320 | 5F10 | 6C6C | 635F | 7672 | 695F | 6F63 | 5F6E | 736D |
| 0000073340 | 6667 | 050D | 0000 | 0600 | 655F | 6164 | 6174 | 4120 |
| 0000073360 | 0005 | 0000 | 5F04 | 6E65 | 7064 | 0132 | 0000 | 0600 |
| 0000073400 | 5F43 | 4E49 | 5449 | 0436 | 0005 | 0000 | 5F0C | 6E5F |
| 0000073420 | 6568 | 7061 | 645F | 7365 | 2063 | 0541 | 0000 | 0C00 |
| 0000073440 | 735F | 6174 | 6B63 | 6F62 | 7474 | 6D6F | 045C | 0005 |
| 0000073460 | 0000 | 5F0C | 5F5F | 4461 | 7342 | 7077 | 6C66 | 2867 |
| 0000073500 | 0504 | 0000 | 0800 | 5F5F | 6361 | 646D | 6E6C | 045A |
| 0000073520 | 0005 | 0000 | 5F08 | 615F | 6573 | 6867 | 5869 | 0504 |
| 0000073540 | 0000 | 0800 | 5F5F | 7361 | 6765 | 6F6C | 0434 | 0005 |
| 0000073560 | 0000 | 5F08 | 615F | 6973 | 647A | 3273 | 0504 | 0000 |
| 0000073600 | 0800 | 5F5F | 7461 | 706F | 7073 | 044A | 0005 | 0000 |
| 0000073620 | 5F09 | 615F | 6663 | 6E69 | 6F66 | D6D6 | 0000 | 0001 |
| 0000073640 | 5F09 | 615F | 4244 | 7375 | 6465 | 042A | 0005 | 0000 |
| 0000073660 | 5F09 | 615F | 6E65 | 7376 | 6765 | 042E | 0005 | 0000 |

THU MAR 14 17:45:52 1991 SETUP.DLL PAGE 32, LINE 1830

| | | | | | | | | |
|---|---|---|---|---|---|---|---|---|
| 0000073700 | 5F0A | 745F | 7268 | 6165 | 6964 | 2C64 | 0504 | 0000 |
| 0000073720 | 0A00 | 5F5F | 6967 | 666E | 736F | 6765 | D6D6 | 0000 |
| 0000073740 | 0001 | 5F0A | 615F | 4244 | 6F64 | 7773 | 3070 | 0504 |
| 0000073760 | 0000 | 0A00 | 5F5F | 696C | 666E | 736F | 6765 | 9876 |
| 0000074000 | 0000 | 0001 | 5F0A | 615F | 7263 | 7574 | 6573 | 5E64 |
| 0000074020 | 0504 | 0000 | 0B00 | 5F5F | 615F | 4244 | 7472 | 7265 |
| 0000074040 | E172 | 0132 | 0000 | 0B00 | 5F5F | 6D61 | 6773 | 655F |
| 0000074060 | 6978 | 6C74 | 0504 | 0000 | 0B00 | 5F5F | 736F | 6576 |
| 0000074100 | 7372 | 6F69 | FB6E | 0133 | 0000 | 0600 | 5F5F | 7865 |
| 0000074120 | 7469 | 34AD | 0001 | 0000 | 5F0C | 755F | 6C6E | 636F |
| 0000074140 | 656B | 6978 | 7F74 | 0506 | 0000 | 0700 | 5F5F | 6863 |
| 0000074160 | 6C69 | 6F64 | 0504 | 0000 | 0700 | 5F5F | 666E | 6C69 |
| 0000074200 | 4265 | 0133 | 0000 | 0700 | 5F5F | 6963 | 696E | 7174 |
| 0000074220 | 0506 | 0000 | 0700 | 5F5F | 615F | 6772 | 0363 | 0134 |
| 0000074240 | 0000 | 0700 | 5F5F | 6563 | 6978 | 6C74 | 0504 | 0000 |
| 0000074260 | 0D00 | 5F5F | 6F64 | 7673 | 7265 | 616D | 6F6A | 7372 |
| 0000074300 | 0506 | 0000 | 0700 | 5F5F | 615F | 6772 | 6D76 | 0504 |
| 0000074320 | 0000 | 0D00 | 5F5F | 6F64 | 7673 | 7265 | 696D | 6F6E |
| 0000074340 | 7172 | 0505 | 0000 | 0800 | 5F5F | 6970 | 6570 | 6863 |
| 0000074360 | 0677 | 0005 | 0000 | 5F08 | 6E65 | 6976 | 6F72 | 716E |
| 0000074400 | 0504 | 0000 | 0800 | 5F5F | 736F | 6966 | 656C | 046E |
| 0000074420 | 0005 | 0000 | 5F08 | 6F5F | 6D73 | 646F | 9C65 | 0133 |
| 0000074440 | 0000 | 0800 | 5F5F | 6E69 | 7469 | 7066 | 0BFA | 0005 |
| 0000074460 | 0000 | 5F08 | 665F | 6970 | 696E | D074 | 0134 | 0000 |
| 0000074500 | 0800 | 5F5F | 6574 | 6D72 | 7066 | 067B | 0005 | 0000 |
| 0000074520 | 5F08 | 705F | 6D67 | 7470 | 0D72 | 0134 | 0000 | 0800 |
| 0000074540 | 5F5F | 5F63 | 7865 | 7469 | 046E | 0005 | 0000 | 5F09 |
| 0000074560 | 645F | 736F | 6F6D | 6564 | 046C | 0005 | 0000 | 5F09 |
| 0000074600 | 6F5F | 6D73 | 6A61 | 726F | 046D | 0005 | 0000 | 5F09 |
| 0000074620 | 6F5F | 6D73 | 6E69 | 726F | 0681 | 0005 | 0000 | 5F0A |
| 0000074640 | 655F | 6978 | 6474 | 6E6F | 6365 | 0134 | 0000 | 0A00 |
| 0000074660 | 5F5F | 6F6C | 6B63 | 7865 | 7469 | 046A | 0005 | 0000 |
| 0000074700 | 5F0A | 755F | 616D | 6B73 | 6176 | D06C | 0134 | 0000 |
| 0000074720 | 0A00 | 5F5F | 7463 | 7265 | 736D | 6275 | 0683 | 0005 |
| 0000074740 | 0000 | 5F0A | 655F | 6978 | 5F74 | 6974 | 6064 | 0504 |
| 0000074760 | 0000 | 0500 | 5F5F | 6166 | F463 | 0133 | 0000 | 0500 |
| 0000075000 | 655F | 6978 | F274 | 0134 | 0000 | 0E00 | 5F5F | 4646 |
| 0000075020 | 4D5F | 4753 | 4142 | 4E4E | 5245 | 0686 | 0005 | 0000 |
| 0000075040 | 5F09 | 615F | 6264 | 6D67 | 6773 | 9876 | 0000 | 0001 |
| 0000075060 | 5F09 | 615F | 7263 | 6D74 | 6773 | 3514 | 0001 | 0000 |
| 0000075100 | 5F08 | 665F | 7470 | 6172 | 8A7D | 0506 | 0000 | 0C00 |
| 0000075120 | 5F5F | 6161 | 746C | 7473 | 6F6B | 7276 | 351A | 0001 |
| 0000075140 | 0000 | 5F08 | 635F | 6B68 | 7473 | 1A6B | 0135 | 0000 |
| 0000075160 | 0A00 | 5F5F | 4661 | 6863 | 736B | 6B74 | 3534 | 0001 |
| 0000075200 | 0000 | 5F09 | 735F | 7465 | 6E65 | 7076 | 363C | 0001 |
| 0000075220 | 0000 | 5F0B | 4E5F | 534D | 5F47 | 4554 | 5458 | 366C |
| 0000075240 | 0001 | 0000 | 5F0C | 4E5F | 534D | 5F47 | 5257 | 5449 |
| 0000075260 | 4E45 | 0137 | 0000 | 0B00 | 5F5F | 645F | 736F | 7265 |
| 0000075300 | 6E72 | 566F | 0137 | 0000 | 0700 | 5F5F | 7265 | 6E72 |
| 0000075320 | 076F | 0137 | 0000 | 0800 | 5F5F | 6F64 | 7273 | 7465 |
| 0000075340 | 36EE | 0001 | 0000 | 5F09 | 645F | 736F | 6572 | 6674 |
| 0000075360 | 37AE | 0001 | 0000 | 5F0B | 665F | 6C63 | 736F | 5F65 |
| 0000075400 | 6B6C | 3762 | 0001 | 0000 | 5F07 | 6366 | 6F6C | 6573 |
| 0000075420 | 3864 | 0001 | 0000 | 5F08 | 665F | 6F73 | 6570 | B66E |
| 0000075440 | 0138 | 0000 | 0600 | 665F | 706F | 6E65 | 0692 | 0005 |
| 0000075460 | 0000 | 5F08 | 635F | 6C66 | 7375 | 0068 | 0400 | 0000 |
| 0000075500 | 0700 | 5F5F | 7562 | 6966 | 946E | 0506 | 0000 | 0500 |
| 0000075520 | 5F5F | 6F69 | 7462 | 0508 | 0000 | 0600 | 5F5F | 6F69 |
| 0000075540 | 3262 | 0A54 | 0005 | 0000 | 5F09 | 6C5F | 7361 | 6974 |

THU MAR 14 17:45:52 1991 SETUP.DLL PAGE 33, LINE 1889

| | | | | | | | | |
|---|---|---|---|---|---|---|---|---|
| 0000075560 | 626F | 38CE | 0001 | 0000 | 5F08 | 665F | 6C69 | 7562 |
| 0000075600 | 6A66 | 0139 | 0000 | 0800 | 5F5F | 6C66 | 6273 | 6675 |
| 0000075620 | 3A50 | 0001 | 0000 | 5F09 | 665F | 6572 | 6265 | 6675 |
| 0000075640 | 3A88 | 0001 | 0000 | 5F08 | 675F | 7465 | 7562 | D466 |
| 0000075660 | 013A | 0000 | 0A00 | 5F5F | 706F | 6E65 | 6966 | 656C |
| 0000075700 | 3C0C | 0001 | 0000 | 5F0B | 665F | 6C66 | 7375 | 5F68 |
| 0000075720 | 6B6C | 3BC6 | 0001 | 0000 | 5F07 | 6666 | 756C | 6873 |
| 0000075740 | 3C78 | 0001 | 0000 | 5F09 | 6C66 | 7375 | 6168 | 6C6C |
| 0000075760 | 3CF4 | 0001 | 0000 | 5F07 | 695F | 706E | 7475 | 452E |
| 0000076000 | 0001 | 0000 | 5F08 | 6F5F | 7475 | 7570 | 1874 | 014A |
| 0000076020 | 0000 | 0B00 | 5F5F | 6567 | 7374 | 7274 | 6165 | 906D |
| 0000076040 | 014A | 0000 | 0700 | 755F | 676E | 7465 | D063 | 014A |
| 0000076060 | 0000 | 0B00 | 5F5F | 6E75 | 6567 | 6374 | 6C5F | 3A6B |
| 0000076100 | 014B | 0000 | 0600 | 635F | 6F6C | 6573 | 4B84 | 0001 |
| 0000076120 | 0000 | 5F06 | 736C | 6565 | 7A6B | 014B | 0000 | 0A00 |
| 0000076140 | 5F5F | 736C | 6565 | 5F6B | 6B6C | 4BF2 | 0001 | 0000 |
| 0000076160 | 5F06 | 6F73 | 6570 | 036E | 014C | 0000 | 0500 | 6F5F |
| 0000076200 | 6570 | BE6E | 014D | 0000 | 1100 | 5F5F | 5863 | 4E45 |
| 0000076220 | 5849 | 6F74 | 4F44 | 6D53 | 646F | D065 | 014D | 0000 |
| 0000076240 | 0500 | 725F | 6165 | 3864 | 014F | 0000 | 0600 | 775F |
| 0000076260 | 6972 | 6574 | 4F2E | 0001 | 0000 | 5F0A | 775F | 6972 |
| 0000076300 | 6574 | 6C5F | C26B | 050A | 0000 | 0700 | 5F5F | 6D66 |
| 0000076320 | 646F | C265 | 050A | 0000 | 0800 | 5F5F | 6F69 | 6F6D |
| 0000076340 | 6564 | 510C | 0001 | 0000 | 5F07 | 616D | 6C6C | 636F |
| 0000076360 | 5111 | 0001 | 0000 | 5F0A | 616D | 6C6C | 636F | 6C5F |
| 0000076400 | 1B6B | 0151 | 0000 | 0800 | 665F | 6572 | 5F65 | 6B6C |
| 0000076420 | 5116 | 0001 | 0000 | 5F05 | 7266 | 6565 | 5152 | 0001 |
| 0000076440 | 0000 | 5F0C | 665F | 616D | 6C6C | 636F | 6C5F | 206B |
| 0000076460 | 0151 | 0000 | 0700 | 5F5F | 6666 | 6572 | 3365 | 0151 |
| 0000076500 | 0000 | 0900 | 5F5F | 6D66 | 6C61 | 6F6C | 2063 | 0151 |
| 0000076520 | 0000 | 0A00 | 5F5F | 6666 | 6572 | 5F65 | 6B6C | 0AC4 |
| 0000076540 | 0005 | 0000 | 5F07 | 665F | 6568 | 7061 | 51D0 | 0001 |
| 0000076560 | 0000 | 5F09 | 695F | 696E | 7374 | 6765 | 5204 | 0001 |
| 0000076600 | 0000 | 5F09 | 6C5F | 6E69 | 736B | 6765 | 523A | 0001 |
| 0000076620 | 0000 | 5F0B | 735F | 6165 | 6372 | 7368 | 6765 | 5345 |
| 0000076640 | 0001 | 0000 | 5F08 | 695F | 636E | 6573 | B667 | 0152 |
| 0000076660 | 0000 | 0900 | 5F5F | 7267 | 776F | 6573 | 7867 | 0153 |
| 0000076700 | 0000 | 0A00 | 5F5F | 6966 | 646E | 616C | 7473 | 0AD2 |
| 0000076720 | 0005 | 0000 | 5F0A | 615F | 626D | 6B6C | 6973 | 987A |
| 0000076740 | 0153 | 0000 | 0800 | 5F5F | 656E | 7377 | 6765 | 53CA |
| 0000076760 | 0001 | 0000 | 5F07 | 7473 | 6372 | 7461 | 5410 | 0001 |
| 0000077000 | 0000 | 5F07 | 7473 | 6372 | 7970 | 5446 | 0001 | 0000 |
| 0000077020 | 5F07 | 7473 | 6372 | 706D | 5470 | 0001 | 0000 | 5F07 |
| 0000077040 | 7473 | 6C72 | 6E65 | 5488 | 0001 | 0000 | 5F08 | 7473 |
| 0000077060 | 6E72 | 6D63 | C470 | 0154 | 0000 | 0500 | 695F | 6F74 |
| 0000077100 | D461 | 050A | 0000 | 0D00 | 5F5F | 6663 | 746C | 7663 |
| 0000077120 | 5F74 | 6174 | F062 | 050A | 0000 | 0800 | 5F5F | 7361 |
| 0000077140 | 7A69 | 4365 | 0AF1 | 0005 | 0000 | 5F08 | 615F | 6973 |
| 0000077160 | 657A | EE44 | 050A | 0000 | 0B00 | 5F5F | 6973 | 6967 |
| 0000077200 | 746E | 666F | EC66 | 050A | 0000 | 0B00 | 5F5F | 6973 |
| 0000077220 | 6967 | 746E | 6573 | F267 | 050A | 0000 | 0700 | 5F5F |
| 0000077240 | 7463 | 7079 | F265 | 050A | 0000 | 0800 | 5F5F | 7463 |
| 0000077260 | 7079 | 5F65 | 5530 | 0001 | 0000 | 5F06 | 6C5F | 636F |
| 0000077300 | 7A6B | 0155 | 0000 | 0700 | 5F5F | 6F6C | 6B63 | 0466 |
| 0000077320 | 0155 | 0000 | 0D00 | 5F5F | 6E75 | 6F6C | 6B63 | 665F |
| 0000077340 | 6C69 | E065 | 0154 | 0000 | 0D00 | 5F5F | 6F6C | 6B63 |
| 0000077360 | 735F | 7274 | 6165 | 5A6D | 0155 | 0000 | 0800 | 5F5F |
| 0000077400 | 6E75 | 6F6C | 6B63 | 0BF4 | 0005 | 0000 | 5F09 | 6C5F |
| 0000077420 | 636F | 636B | 746E | 558A | 0001 | 0000 | 5F09 | 755F |

```
THU MAR 14 17:45:52 1991  SETUP.DLL  PAGE 34, LINE 1948

0000077440  6C6E  636F  666B  54EC  0001  0000  5F0F  755F
0000077460  6C6E  636F  5F6B  7473  6572  6D61  5510  0001
0000077500  0000  5F0A  775F  6961  6C74  636F  F86B  0154
0000077520  0000  0B00  5F5F  6F6C  6B63  665F  6C69  9A65
0000077540  0155  0000  0B00  5F5F  6567  7474  6469  6174
0000077560  F662  050E  U000  0B00  5F5F  6974  7464  6261
0000077600  616D  1478  0156  0000  0600  665F  6567  7374
0000077620  56AA  0001  0000  5F08  7073  6972  746E  1E66
0000077640  0157  0000  0700  735F  6373  6E61  7A66  0157
0000077660  0000  0700  635F  6C61  6F6C  A863  0157  0000
0000077700  0700  6D5F  6D65  7063  0679  0158  0000  0700
0000077720  6D5F  6D65  6573  5B74  0158  0000  0700  5F5F
0000077740  7863  6F74  4E61  0158  0000  0A00  5F5F  6C63
0000077760  6F74  7361  6275  58BE  0001  0000  5F07  7473
0000100000  7472  6C6F  58B2  0001  0000  5F08  7473  7472
0000100020  756F  F86C  0159  0000  0700  725F  6D65  766F
0000100040  F865  0159  0000  0700  755F  6C6E  6E69  166B
0000100060  015A  0000  0A00  5F5F  4661  6146  6D6C  6C75
0000100100  5A16  0001  0000  5F0B  615F  4646  7561  6D6C
0000100120  6C75  5A38  0001  0000  5F0A  615F  4646  6C61
0000100140  6873  586C  015A  0000  0800  5F5F  4661  6D6C
0000100160  6C75  5A58  0001  0000  5F09  615F  7546  6D6C
0000100200  6C75  5A8A  0001  0000  5F08  615F  6C46  6873
0000100220  016C  000A  8075  8183  6400  8300  0201  0101
0000100240  8000  1601  7900  0330  0383  8302  0204  0A82
0000100260  7528  746E  6761  6567  2964  0169  000A  837F
0000100300  0081  8183  8300  0081  1C01  7F00  0682  6170
0000100320  6B63  685F  8200  6606  6C69  5F65  0268  0682
0000100340  7566  636E  685F  0104  0007  737A  C083  8200
0000100360  0100  0001  0180  0001  0180  0001  0180  0001
0000100400  0180  0001  0180  0001  0180  0001  0180  0001
*
0000100560  0180  0001  0180  0001  0180  0005  2878  8083
0000100600  0100  0005  4078  8083  0100  0007  737A  2B83
0000100620  8202  0100  000A  8075  8183  6400  8300  0201
0000100640  0101  8000  0101  8000  0101  8000  0101  8000
*
0000101400  0101  8000  0101  8000  1201  7900  0560  8783
0000101420  8302  0288  0682  695F  626F  6675  0169  0010
0000101440  837F  00C0  8183  8300  00C0  8083  8300  0080
0000101460  2701  7F00  0482  705F  7274  8200  5F04  6E63
0000101500  0474  0582  625F  7361  0665  0582  665F  616C
0000101520  0A67  0582  665F  6C69  0B65  0101  8000  0701
0000101540  7A00  8373  0286  0082  0101  8000  0101  8000
0000101560  0101  8000  0101  8000  0101  8000  0101  8000
*
0000105740  1801  7900  9085  0501  AB83  8304  04AC  0A82
0000105760  7528  746E  6761  6567  2964  0169  0007  8578
0000106000  00A8  8083  0100  0010  837F  04AA  8183  8300
0000106020  0085  AA83  8304  0085  2A01  7F00  0482  616E
0000106040  656D  8200  7404  7079  1665  0982  6573  6170
0000106060  6172  6F74  1872  0582  6873  6669  1A74  0482
0000106100  6163  7370  0130  0001  0180  001A  8679  9000
0000106120  0001  8301  04B0  B183  8204  280A  6E75  6174
0000106140  6767  6465  6929  0901  7800  0086  0190  8300
0000106160  04A9  0401  7F00  AF83  0104  000C  827F  6B08
0000106200  5F62  6174  6C62  0065  0101  8000  0701  7A00
0000106220  8373  04B4  0082  0701  7A00  8373  04AE  0082
0000106240  0101  8000  0101  8000  0101  8000  0101  8000
```

THU MAR 14 17:45:52 1991  SETUP.DLL  PAGE 35, LINE 2007

```
0000106260  0101  8000  0701  7A00  8373  04AE  0082  0101
0000106300  8000  0101  8000  0101  8000  0101  8000  0701
0000106320  7A00  8373  04C0  0082  0701  7A00  8373  04A9
0000106340  0082  0101  8000  0101  8000  0101  8000  0101
0000106360  8000  0101  8000  0101  8000  0101  8000  0101
0000106400  8000  0101  8000  0D01  7F00  C083  8300  04B3
0000106420  C583  8300  00C5  0A01  7500  8380  0081  0473
0000106440  CA83  0104  0001  0180  0001  0180  0005  7078
0000106460  8083  0100  0005  3878  8083  0100  0005  6078
0000106500  8283  0100  0007  8578  0290  8083  0100  0007
0000106520  8578  0280  8083  0100  0005  1078  8083  0100
0000106540  0005  1878  8083  0100  0005  6878  8083  0100
0000106560  0005  7878  8083  0100  0004  837F  04B4  0A01
0000106600  7500  8380  0200  0173  D783  0104  000A  8075
0000106620  BA83  7304  8300  0201  1601  7F00  B483  8304
0000106640  0085  C083  8300  0081  8583  8300  00C0  8583
0000106660  0100  000A  8075  8183  7300  8307  04DA  0401
0000106700  7F00  8483  0100  000A  8075  8183  7300  8301
0000106720  04DC  0701  7F00  8483  8300  04BF  0A01  7500
0000106740  8380  0081  0273  DE83  0104  0007  837F  00C0
0000106760  C483  0100  000A  8075  8183  7300  8302  04E0
0000107000  0701  7F00  C083  8300  00C4  0A01  7500  8380
0000107020  0081  0273  E283  0104  0004  837F  00C4  0A01
0000107040  7500  8380  0081  0173  E483  0104  0007  837F
0000107060  00C0  C583  0100  000A  8075  8183  7300  8302
0000107100  04E6  0501  7800  8320  0080  0501  7800  8330
0000107120  0080  0501  7800  8348  0080  0701  7F00  8483
0000107140  8300  04BF  0A01  7500  8380  0081  0273  EB83
0000107160  0104  0007  837F  00C0  C483  0100  000A  8075
0000107200  8183  7300  8302  04ED  0101  8000  0101  8000
0000107220  1601  7900  0330  0383  8302  0204  0A82  7528
0000107240  746E  6761  6567  2964  0169  000A  837F  0081
0000107260  8183  8300  0081  1C01  7F00  0682  6170  6B63
0000107300  685F  8200  6606  6C69  5F65  0268  0682  7566
0000107320  636E  685F  0104  0001  0180  0001  0180  0001
0000107340  0180  0001  0180  0001  0180  0001  0180  0001
*
0000107540  0180  0005  3878  8083  0100  0005  4078  8083
0000107560  0100  0001  0180  0001  0180  0001  0180  0001
0000107600  0180  0001  0180  0001  0180  0001  0180  0001
*
0000112200  0180  0001  0180  0001  0180  0001  0180  0007
0000112220  737A  7283  8203  0100  000A  8075  8183  6400
0000112240  8300  0201  0101  8000  0101  8000  0101  8000
0000112260  0101  8000  0101  8000  0101  8000  0101  8000
*
0000115260  0101  8000  0101  8000  0101  8000  1B01  7900
0000115300  0920  FA83  8304  04FB  0F82  5F69  5F75  736D
0000115320  5F67  6170  6172  5F6D  6974  1C01  7F00  8183
0000115340  8300  0085  8283  8300  0086  8883  8300  0080
0000115360  8483  8300  00C0  C083  0100  006A  827F  6909
0000115400  755F  735F  6F68  7472  8200  690A  755F  755F
0000115420  6873  726F  0074  0882  5F69  5F75  6F6C  676E
0000115440  8200  6909  755F  755F  6F6C  676E  8200  6909
0000115460  755F  665F  6F6C  7461  8200  6908  755F  635F
0000115500  6168  0072  0982  5F69  5F75  6375  6168  0072
0000115520  0782  5F69  5F75  7473  0072  0982  5F69  5F75
0000115540  6C62  636F  006B  1901  7900  0230  FD83  8304
0000115560  04FE  0D82  5F69  736D  5F67  6170  6172  5F6D
```

THU MAR 14 17:45:52 1991 SETUP.DLL PAGE 36, LINE 2066

```
0000115600  6974  0701  7F00  8583  8300  04F9  1001  7F00
0000115620  0482  7974  6570  8200  7605  6C61  6575  0102
0000115640  0001  0180  001C  8579  0090  8309  0501  0283
0000115660  8205  690E  6D5F  6773  685F  6165  6564  5F72
0000115700  6974  1C01  7F00  8183  8300  0081  8583  8300
0000115720  0085  8483  8300  0085  8583  8300  0081  8583
0000115740  0100  0047  827F  7104  695F  0064  0682  6F73
0000115760  7275  6563  8202  7003  6469  8204  7403  6469
0000116000  8206  7204  7365  0870  0882  6572  7073  745F
0000116020  6469  820A  6F07  5F70  6F63  6564  820C  7404
0000116040  7079  0E65  0482  6973  657A  0110  0015  8579
0000116060  00C0  8302  0505  0683  8205  6907  6D5F  6773
0000116100  745F  0169  0005  3078  FC83  0104  0007  837F
0000116120  0500  0483  0105  0017  827F  6806  6165  6564
0000116140  0072  0A82  6170  6172  5F6D  696C  7473  0112
0000116160  0001  0180  0001  0180  0001  0180  0007  737A
0000116200  0383  8205  0100  0001  0180  0001  0180  0001
0000116220  0180  0001  0180  0001  0180  0001  0180  0001
*
0000117300  0180  0001  0180  0007  8578  0320  8083  0100
0000117320  0001  0180  0001  0180  0001  0180  0001  0180
*
0000117400  0001  0180  0001  0180  001C  8579  0CC0  8308
0000117420  05AB  AC83  8205  5F0E  5F6C  6369  6E6F  665F
0000117440  726F  5F6D  6974  1901  7F00  8583  8300  059B
0000117460  9B83  8305  059B  8183  8300  0081  8183  8300
0000117500  059B  5001  7F00  0282  6469  8200  7405  7469
0000117520  656C  8202  6E0A  6D61  5F65  6974  6C74  6665
0000117540  0482  616E  656D  CA85  8200  6305  616C  7373
0000117560  2E85  8201  7305  7974  656C  3085  8201  7107
0000117600  6175  696C  7974  3285  8201  6D07  6773  735F
0000117620  7274  3485  0101  0001  0180  0001  0180  0001
0000117640  0180  0001  0180  0001  0180  0001  0180  0001
*
0000120020  0180  0001  0180  0001  0180  0001  0180  0004
0000120040  837F  00C0  0A01  7500  8380  0081  0173  CF83
0000120060  0105  0001  0180  0001  0180  0007  8578  00A8
0000120100  8083  0100  0005  6078  8283  0100  0004  837F
0000120120  050A  0A01  7500  8380  0081  0173  D583  0105
0000120140  0005  3878  8083  0100  000A  8075  8183  6400
0000120160  8300  0201  0101  8000  1601  7900  0330  0383
0000120200  8302  0204  0A82  7528  746E  6761  6567  2964
0000120220  0169  000A  837F  0081  8183  8300  0081  1C01
0000120240  7F00  0682  6170  6B63  685F  8200  6606  6C69
0000120260  5F65  0268  0682  7566  636E  685F  0104  0001
0000120300  0180  0001  0180  0001  0180  0001  0180  0001
*
0000120500  0180  0001  0180  0001  0180  0005  5078  8083
0000120520  0100  0005  4078  8083  0100  0001  0180  0001
0000120540  0180  0001  0180  0001  0180  0001  0180  0001
*
0000120740  0180  0001  0180  0001  0180  0001  0180  0005
0000120760  6878  8083  0100  0001  0180  0001  0180  0001
0000121000  0180  0001  0180  0007  8578  0100  8083  0100
0000121020  0001  0180  0001  0180  0001  0180  0001  0180
*
0000121300  0001  0180  0001  0180  0005  6078  8083  0100
0000121320  0001  0180  0001  0180  0001  0180  0001  0180
*
```

THU MAR 14 17:45:52 1991 SETUP.DLL PAGE 37, LINE 2125

```
0000127040  0001  0180  0001  0180  0001  0180  0016  2079
0000127060  8302  055C  5D83  8205  280A  6E75  6174  6767
0000127100  6465  6929  0701  7F00  8183  8300  0081  0901
0000127120  7F00  0182  0078  0182  0279  0101  8000  0101
0000127140  8000  0101  8000  0101  8000  0101  8000  0101
*
0000127460  8000  0101  8000  0101  8000  1601  7900  0330
0000127500  9783  8305  0598  0A82  7528  746E  6761  6567
0000127520  2964  0169  000A  837F  0085  8583  8300  0085
0000127540  1A01  7F00  0582  6977  7464  0068  0682  6568
0000127560  6769  7468  8202  6405  7065  6874  0104  0018
0000127600  8579  0140  8308  059B  9C83  8205  280A  6E75
0000127620  6174  6767  6465  6929  0701  7800  8085  8300
0000127640  0084  1901  7F00  8183  8300  0596  8583  8300
0000127660  0085  C483  8300  0082  E483  8300  059A  5A01
0000127700  7F00  0682  6572  7270  7365  8200  6406  6D69
0000127720  6E65  0273  1082  6164  6174  6C5F  7961  7265
0000127740  645F  7065  6874  8208  7308  6769  735F  7A69
0000127760  0A65  0782  6973  5F67  7470  0C72  0982  7462
0000130000  706D  735F  7A69  1065  0882  7462  706D  705F
0000130020  7274  8214  7305  6170  6572  0118  0001  0180
0000130040  0001  0180  0001  0180  0001  0180  0001  0180
*
0000130420  0018  8579  056D  830F  05DC  DD83  8205  280A
0000130440  6E75  6174  6767  6465  6929  0701  7800  0085
0000130460  8302  0084  2E01  7F00  8683  8300  0254  8283
0000130500  8300  0081  8183  8300  055B  8583  8300  0085
0000130520  9983  8305  00C4  C483  8300  0081  8583  8300
0000130540  00C4  DB83  0105  00A8  827F  6902  0064  0482
0000130560  616E  656D  8204  740A  6D69  5F65  7473  6D61
0000130600  2470  0582  6C63  7361  2873  0582  7473  6C79
0000130620  2A65  0982  6F68  5F74  6F70  6E69  2C74  0B87
0000130640  7068  785F  645F  6665  6E69  3065  0B82  7068
0000130660  795F  645F  6665  6E69  3265  0982  7462  706D
0000130700  695F  666E  346F  0782  6D69  5F67  7470  5C72
0000130720  0882  616D  6B73  705F  7274  8260  7107  6175
0000130740  696C  7974  8264  640F  7365  7263  7069  6F74
0000130760  5F72  6973  657A  8266  640E  7365  7263  7069
0000131000  6F74  5F72  7470  6872  0582  7073  7261  6C65
0000131020  0101  8000  0101  8000  0101  8000  0101  8000
*
0000131140  0101  8000  0101  8000  0101  8000  1B01  7900
0000131160  0920  F683  8305  05F7  0F82  5F69  5F75  736D
0000131200  5F67  6170  6172  5F6D  6974  1C01  7F00  8183
0000131220  8300  0085  8283  8300  0086  8883  8300  0080
0000131240  8483  830C  00C0  C083  0100  006A  827F  6909
0000131260  755F  735F  6F68  7472  8200  690A  755F  755F
0000131300  6873  726F  0074  0882  5F69  5F75  6F6C  676E
0000131320  8200  6909  755F  755F  6F6C  676E  8200  6909
0000131340  755F  665F  6F6C  7461  8200  6908  755F  635F
0000131360  6168  0072  0982  5F69  5F75  6375  6168  0072
0000131400  0782  5F69  5F75  7473  0072  0982  5F69  5F75
0000131420  6C62  636F  006B  1901  7900  0230  F983  8305
0000131440  05FA  0D82  5F69  736D  5F67  6170  6172  5F6D
0000131460  6974  0701  7F00  8583  8300  05F5  1001  7F00
0000131500  0482  7974  6570  8200  7605  6C61  6575  0102
0000131520  0001  0180  001C  8579  0090  8309  05FD  FE83
0000131540  8205  690E  6D5F  6773  685F  6165  6564  5F72
0000131560  6974  1C01  7F00  8183  8300  0081  8583  8300
```

```
THU MAR 14 17:45:52 1991  SETUP.DLL  PAGE 38, LINE 2184

0000131600  0085  8483  8300  0085  8583  8300  0081  8583
0000131620  0100  0047  827F  7104  695F  0064  0682  6F73
0000131640  7275  6563  8202  7003  6469  8204  7403  6469
0000131660  8206  7204  7365  0870  0882  6572  7073  745F
0000131700  6469  820A  6F07  5F70  6F63  6564  820C  7404
0000131720  7079  0E65  0482  6973  657A  0110  0015  8579
0000131740  00C0  8302  0601  0283  8206  6907  6D5F  6773
0000131760  745F  0169  0005  3078  F883  0105  0007  837F
0000132000  05FC  0083  0106  0017  827F  6806  6165  6564
0000132020  0072  0A82  6170  6172  5F6D  696C  7473  0112
0000132040  0001  0180  0001  0180  0001  0180  0007  737A
0000132060  FF83  8205  0100  0001  0180  0001  0180  0001
0000132100  0180  0001  0180  0001  0180  0001  0180  0001
*
0000133160  0180  0001  0180  0007  8578  0320  8083  0100
0000133200  0001  0180  0001  0180  0001  0180  0001  0180
*
0000133240  0001  0180  0001  0180  0018  8579  0150  8305
0000133260  06A3  A483  8206  280A  6E75  6174  6767  6465
0000133300  6929  1001  7F00  5483  8302  0086  8183  8300
0000133320  0081  8183  0100  002B  827F  6E04  6D61  0065
0000133340  0682  696C  5F62  6469  8220  6305  616C  7373
0000133360  8224  7305  7974  656C  8226  6F07  5F70  6F63
0000133400  6564  0128  0001  0180  001C  8579  0CC0  8308
0000133420  06A7  A883  8206  5F0E  5F6C  6369  6E6F  665F
0000133440  726F  5F6D  6974  1901  7F00  8583  8300  0697
0000133460  9783  8306  0697  8183  8300  0081  8183  8300
0000133500  0697  5001  7F00  0282  6469  8200  7405  7469
0000133520  656C  8202  6E0A  6D61  5F65  6974  6C74  6665
0000133540  0482  616E  656D  CA85  8200  6305  616C  7373
0000133560  2E85  8201  7305  7974  656C  3085  8201  7107
0000133600  6175  696C  7974  3285  8201  6D07  6773  735F
0000133620  7274  3485  0101  0001  0180  0007  737A  A683
0000133640  8206  0100  0001  0180  0001  0180  0001  0180
0000133660  0001  0180  0001  0180  0001  0180  0001  0180
0000133700  0001  0180  0007  737A  A283  8206  0100  0001
0000133720  0180  0001  0180  0001  0180  0001  0180  0001
*
0000134060  0180  0001  0180  0007  837F  06AA  C083  0100
0000134100  000A  8075  0083  6402  8302  06CE  0101  8000
0000134120  0501  7800  8368  0080  0501  7800  8320  0080
0000134140  0701  7A00  8373  06D4  0082  0A01  7500  8380
0000134160  0081  0064  0183  0102  0005  6078  8283  0100
0000134200  0005  7078  8083  0100  0007  837F  0085  AA83
0000134220  0106  000A  8075  8183  6400  8302  06D7  0501
0000134240  7800  8338  0080  0501  7800  8338  0080  0701
0000134260  7800  B085  8300  0080  0401  7F00  8583  0100
0000134300  000A  8075  0083  6402  8301  06DC  0101  8000
0000134320  0501  7800  8378  0080  0401  7F00  C083  0100
0000134340  000A  8075  0083  6402  8301  06E0  0101  8000
0000134360  0701  7F00  B383  8306  06AA  0A01  7500  8380
0000134400  0200  0264  E383  0106  0007  837F  06AA  B383
0000134420  0106  000A  8075  0083  6402  8302  06E5  0A01
0000134440  7F00  C083  8300  06B3  AA83  0106  000A  8075
0000134460  8183  6400  8303  06E7  0501  7800  8350  0080
0000134500  0701  7F00  8683  8300  0000  0A01  7500  8380
0000134520  0200  0264  EA83  0106  0001  0180  0007  8578
0000134540  0098  8083  0100  000A  8075  8183  6400  8300
0000134560  0201  0101  8000  1601  7900  0330  0383  8302
```

THU MAR 14 17:45:52 1991 SETUP.DLL PAGE 39, LINE 2243

```
0000134600  0204  0A82  7528  746E  6761  6567  2964  0169
0000134620  000A  837F  0081  8183  8300  0081  1C01  7F00
0000134640  0682  6170  6B63  685F  8200  6606  6C69  5F65
0000134660  0268  0682  7566  636E  685F  0104  0001  0180
0000134700  0001  0180  0001  0180  0001  0180  0001  0180
*
0000135100  0001  0180  0001  0180  0005  5078  8083  0100
0000135120  0005  4078  8083  0100  0001  0180  0001  0180
0000135140  0001  0180  0001  0180  0001  0180  0001  0180
*
0000142600  0001  0180  0007  737A  F683  8204  0100  000A
0000142620  8075  8183  6400  8300  0201  0101  8000  0101
0000142640  8000  0101  8000  0101  8000  0101  8000  0101
*
0000146140  8000  0101  8000  0101  8000  0101  8000  1C01
0000146160  7900  C085  080C  AE83  8306  06AF  0E82  6C5F
0000146200  695F  6F63  5F6E  6F66  6D72  745F  0169  0007
0000146220  8578  0320  8083  0100  0019  837F  0085  AD83
0000146240  8306  06AD  AD83  8306  0081  8183  8300  0081
0000146260  AD83  0106  0050  827F  6902  0064  0582  6974
0000146300  6C74  0265  0A82  616E  656D  745F  7469  656C
0000146320  8266  6E04  6D61  8565  00CA  0582  6C63  7361
0000146340  8573  012E  0582  7473  6C79  8565  0130  0782
0000146360  7571  6C61  7469  8579  0132  0782  736D  5F67
0000146400  7473  8572  0134  0101  8000  0701  7A00  8373
0000146420  06AC  0082  0101  8000  0101  8000  0101  8000
0000146440  0101  8000  0101  8000  0101  8000  0101  8000
*
0000146540  0101  8000  0701  7A00  8373  06AC  0082  0101
0000146560  8000  0101  8000  0101  8000  0101  8000  0101
*
0000146620  8000  0101  8000  0101  8000  0401  7F00  B183
0000146640  0106  000A  8075  8183  6400  8301  06D2  0101
0000146660  8000  0101  8000  0501  7800  8370  0080  0501
0000146700  7800  8338  0080  0501  7800  8360  0082  0D01
0000146720  7F00  C083  8300  0085  C083  8300  00C0  0A01
0000146740  7500  8380  00C0  0473  D983  0106  0007  8578
0000146760  00C8  8083  0100  0001  0180  000A  8075  C683
0000147000  6406  8300  0201  0401  7F00  B183  0106  000A
0000147020  8075  0083  6402  8301  06DE  0101  8000  0701
0000147040  7800  8885  8300  0080  0501  7800  8320  0080
0000147060  0401  7F00  C083  0100  000A  8075  0083  6402
0000147100  8301  06E3  0101  8000  0501  7800  8358  0080
0000147120  0701  7F00  8583  8300  0085  0A01  7500  8380
0000147140  0200  0264  E783  0106  0004  837F  06B1  0A01
0000147160  7500  8380  0081  0164  E983  0106  0001  0180
0000147200  0007  8578  0098  8083  0100  000A  8075  C083
0000147220  6400  8300  0201  0101  8000  0101  8000  1601
0000147240  7900  0330  0383  8302  0204  0A82  7528  746E
0000147260  6761  6567  2964  0169  000A  837F  0081  8183
0000147300  8300  0081  1C01  7F00  0682  6170  6B63  685F
0000147320  8200  6606  6C69  5F65  0268  0682  7566  636E
0000147340  685F  0104  0001  0180  0001  0180  0001  0180
0000147360  0001  0180  0001  0180  0001  0180  0001  0180
*
0000147560  0005  5078  8083  0100  0005  4078  8083  0100
0000147600  0001  0180  0001  0180  0001  0180  0001  0180
*
0000150040  0001  0180  0001  0180  0007  8578  0100  8083
```

THU MAR 14 17:45:52 1991 SETUP.DLL PAGE 40, LINE 2302

```
0000150060  0100  0001  0180  0001  0180  0001  0180  0001
0000150100  0180  0001  0180  0001  0180  0001  0180  0001
*
0000150340  0180  0001  0180  0001  0180  0005  6078  8083
0000150360  0100  0001  0180  0001  0180  0001  0180  0001
0000150400  0180  0001  0180  0001  0180  0001  0180  0001
*
0000154260  0180  0001  0180  0001  0180  0001  0180  001B
0000154300  2079  8309  0478  7983  8204  690F  755F  6D5F
0000154320  6773  705F  7261  6D61  745F  0169  001C  837F
0000154340  0081  8583  8300  0082  8683  8300  0088  8083
0000154360  8300  0084  C083  8300  00C0  6A01  7F00  0982
0000154400  5F69  5F75  6873  726F  0074  0A82  5F69  5F75
0000154420  7375  6F68  7472  8200  6908  755F  6C5F  6E6F
0000154440  0067  0982  5F69  5F75  6C75  6E6F  0067  0982
0000154460  5F69  5F75  6C66  616F  0074  0882  5F69  5F75
0000154500  6863  7261  8200  6909  755F  755F  6863  7261
0000154520  8200  6907  755F  735F  7274  8200  6909  755F
0000154540  625F  6F6C  6B63  0100  0019  3079  8302  047B
0000154560  7C83  8204  690D  6D5F  6773  705F  7261  6D61
0000154600  745F  0169  0007  837F  0085  7783  0104  0010
0000154620  827F  7404  7079  0065  0582  6176  756C  0265
0000154640  0101  8000  1C01  7900  9085  0900  7F83  8304
0000154660  0480  0E82  5F69  736D  5F67  6568  6461  7265
0000154700  745F  0169  001C  837F  0081  8183  8300  0085
0000154720  8583  8300  0084  8583  8300  0085  8183  8300
0000154740  0085  4701  7F00  0482  5F71  6469  8200  7306
0000154760  756F  6372  0265  0382  6970  0464  0382  6974
0000155000  0664  0482  6572  7073  8208  7208  7365  5F70
0000155020  6974  0A64  0782  706F  635F  646F  0C65  0482
0000155040  7974  6570  820E  7304  7A69  1065  1501  7900
0000155060  C085  0200  8383  8304  0484  0782  5F69  736D
0000155100  5F67  6974  0501  7800  8330  047A  0701  7F00
0000155120  7E83  8304  0482  1701  7F00  0682  6568  6461
0000155140  7265  8200  700A  7261  6D61  6C5F  7369  1274
0000155160  0101  8000  0101  8000  0101  8000  0701  7A00
0000155200  8373  0481  0082  0101  8000  0101  8000  0101
0000155220  8000  0101  8000  0101  8000  0101  8000  0101
*
0000156300  8000  0101  8000  1801  7900  5085  0501  1A83
0000156320  8305  051B  0A82  7528  746E  6761  6567  2964
0000156340  0169  0010  837F  0254  8683  8300  0081  8183
0000156360  8300  0081  2B01  7F00  0482  616E  656D  8200
0000156400  6C06  6269  695F  2064  0582  6C63  7361  2473
0000156420  0582  7473  6C79  2665  0782  706F  635F  646F
0000156440  2865  0101  8000  0101  8000  0101  8000  0101
0000156460  8000  0101  8000  0101  8000  0101  8000  0101
*
0000156600  8000  0101  8000  0701  7A00  8373  0519  0082
0000156620  0101  8000  0101  8000  0101  8000  0101  8000
*
0000156760  0101  8000  0A01  7F00  3583  8305  0085  8583
0000157000  0100  000A  8075  8183  6400  8303  054F  0101
0000157020  8000  0101  8000  0501  7800  8338  0080  0701
0000157040  7A00  8373  0555  0082  0A01  7500  8380  0081
0000157060  0064  0183  0102  0005  6078  8283  0100  0007
0000157100  8578  0140  8083  0100  0007  8578  0128  8083
0000157120  0100  000A  837F  0081  8583  8300  0535  0A01
0000157140  7500  8380  0081  0364  5983  0105  0001  0180
```

THU MAR 14 17:45:52 19?) SETUP.DLL PAGE 41, LINE 2361

| | | | | | | | | |
|---|---|---|---|---|---|---|---|---|
| 0000157160 | 0007 | 8578 | 0080 | 8083 | 0100 | 0007 | 837F | 0081 |
| 0000157200 | 8183 | 0100 | 000A | 8075 | 8183 | 6400 | 8302 | 055D |
| 0000157220 | 0101 | 8000 | 0701 | 7800 | 8885 | 8300 | 0080 | 0401 |
| 0000157240 | 7F00 | 8183 | 0100 | 000A | 8075 | 8183 | 6400 | 8301 |
| 0000157260 | 0561 | 0101 | 8000 | 0501 | 7800 | 8378 | 0080 | 0401 |
| 0000157300 | 7F00 | 8183 | 0100 | 000A | 8075 | 8183 | 6400 | 8301 |
| 0000157320 | 0565 | 0501 | 7800 | 8368 | 0080 | 1105 | 0001 | 0000 |
| 0000157340 | 011C | 0000 | 04CB | 04F6 | 0016 | 04E8 | 0000 | 0D04 |
| 0000157360 | 626B | 695F | 696E | 5F74 | 6174 | 6C62 | 0F65 | 1204 |
| 0000157400 | C000 | 0900 | 6966 | 656C | 6E5F | 6D61 | 1065 | 0E04 |
| 0000157420 | B300 | 0A04 | 626B | 745F | 6261 | 656C | 705F | 0417 |
| 0000157440 | 000A | 00C5 | 6611 | 7269 | 7473 | 655F | 7272 | 6C5F |
| 0000157460 | 6E69 | 5F65 | 6F6E | 0411 | 0006 | 00C5 | 760B | 6C61 |
| 0000157500 | 6469 | 635F | 756F | 746E | 040F | FF38 | 0085 | 5F09 |
| 0000157520 | 625F | 5F78 | 7974 | 6570 | 040D | FED0 | 022A | 5F07 |
| 0000157540 | 705F | 6972 | 746E | 040B | FEC6 | 0202 | 5F05 | 6C5F |
| 0000157560 | 6C76 | 040D | FEDA | 04D0 | 5F07 | 635F | 6F6C | 6B63 |
| 0000157600 | 040D | FFEE | 00C0 | 5F07 | 735F | 6174 | 6B63 | 040E |
| 0000157620 | FECC | 0081 | 5F08 | 725F | 7465 | 6176 | 126C | D404 |
| 0000157640 | B4FE | 0C04 | 5F69 | 626B | 745F | 6261 | 656C | 705F |
| 0000157660 | 040C | FE6E | 028A | 6606 | 6C69 | 5F65 | 0A70 | 8C04 |
| 0000157700 | D1FF | 0404 | 696C | 656E | 040C | FFED | 00C0 | 6C06 |
| 0000157720 | 6E69 | 5F65 | 0D70 | F204 | 85FF | 0700 | 696C | 656E |
| 0000157740 | 6E5F | 0E6F | 7204 | 85FE | 0800 | 6E65 | 7274 | 5F79 |
| 0000157760 | 6F6E | 040E | FF3A | 04D2 | 6B08 | 7965 | 6E5F | 6D61 |
| 0000160000 | 1365 | E604 | D2FE | 0D04 | 656B | 5F79 | 7974 | 6570 |
| 0000160020 | 6E5F | 6D61 | 0E65 | 3604 | 85FF | 0800 | 656B | 5F79 |
| 0000160040 | 7974 | 6570 | 0411 | FFE8 | 0085 | 730B | 7065 | 7261 |
| 0000160060 | 7461 | 726F | 665F | 0410 | FE74 | 04D2 | 730A | 6968 |
| 0000160100 | 7466 | 6E5F | 6D61 | 0C65 | CE04 | 85FE | 0600 | 6163 |
| 0000160120 | 7370 | 665F | 0419 | FED8 | 0085 | 6913 | 665F | 7269 |
| 0000160140 | 7473 | 655F | 7272 | 6C5F | 6E69 | 5F65 | 6F6E | 0413 |
| 0000160160 | FFFC | 0085 | 690D | 765F | 6C61 | 6469 | 635F | 756F |
| 0000160200 | 746E | 0409 | FEC4 | 0081 | 6903 | 6372 | 040C | FFEA |
| 0000160220 | 0085 | 6906 | 7564 | 6D6D | 0779 | 8A04 | 81FF | 0100 |
| 0000160240 | 0F69 | DE04 | 81FF | 0900 | 6B6D | 7965 | 5F73 | 756E |
| 0000160260 | 0F6D | F404 | 05FF | 0902 | 6B6D | 7965 | 5F73 | 7473 |
| 0000160300 | 0A72 | E404 | C0FF | 0400 | 6E65 | 7064 | 0408 | FFEC |
| 0000160320 | 0081 | 7202 | 0C63 | F804 | C0FF | 0600 | 5F5F | 7974 |
| 0000160340 | 6570 | 050E | 00C6 | 0005 | 04CE | 5F06 | 665F | 6E75 |
| 0000160360 | 0163 | 2302 | F601 | D804 | 3104 | 1600 | 2300 | 0000 |
| 0000160400 | 0400 | 6B14 | 5F62 | 6573 | 5F74 | 7563 | 7272 | 6E65 |
| 0000160420 | 5F74 | 6174 | 6C62 | 1065 | 0604 | B400 | 0A04 | 626B |
| 0000160440 | 745F | 6261 | 656C | 705F | 0201 | 0121 | 0527 | 04D9 |
| 0000160460 | 002C | 0016 | 0020 | 0000 | 1204 | 626B | 715F | 635F |
| 0000160500 | 7275 | 6572 | 746E | 745F | 6261 | 656C | 0201 | 011C |
| 0000160520 | 0553 | 04DB | 013E | 0016 | 0130 | 0000 | 0D04 | 626B |
| 0000160540 | 6D5F | 646F | 6669 | 5F79 | 656B | 1079 | 1604 | B400 |
| 0000160560 | 0A04 | 626B | 745F | 6261 | 656C | 705F | 040E | 0014 |
| 0000160600 | 0085 | 6508 | 746E | 7972 | 6E5F | 0E6F | 1004 | C000 |
| 0000160620 | 0800 | 656B | 5F79 | 616E | 656D | 040E | 000E | 0081 |
| 0000160640 | 6B08 | 7965 | 745F | 7079 | 1165 | 0C04 | 8500 | 0B00 |
| 0000160660 | 6573 | 6170 | 6172 | 6F74 | 5F72 | 1066 | 0804 | C000 |
| 0000160700 | 0A00 | 6873 | 6669 | 5F74 | 616E | 656D | 040C | 0006 |
| 0000160720 | 0085 | 6306 | 7061 | 5F73 | 0866 | FC04 | 81FF | 0200 |
| 0000160740 | 6372 | 0201 | 011C | 0691 | 04DD | 008D | 0016 | 007F |
| 0000160760 | 0000 | 0D04 | 626B | 725F | 6D65 | 766F | 5F65 | 656B |
| 0000161000 | 0979 | 0604 | 8400 | 0300 | 656B | 0879 | FC04 | 81FF |
| 0000161020 | 0200 | 6372 | 0201 | 011E | 071E | 04DF | 0092 | 0016 |

THU MAR 14 17:45:52 1991 SETUP.DLL PAGE 42, LINE 2420

| | | | | | | | | |
|---|---|---|---|---|---|---|---|---|
| 0000161040 | 0084 | 0000 | 0F04 | 626B | 675F | 7465 | 6B5F | 7965 |
| 0000161060 | 615F | 7474 | 0972 | 0A04 | 8400 | 0300 | 656B | 0A79 |
| 0000161100 | 0604 | BF00 | 0404 | 7461 | 7274 | 0408 | FFFC | 0081 |
| 0000161120 | 7202 | 0163 | 1E02 | B001 | E107 | D204 | 1600 | C400 |
| 0000161140 | 0000 | 0400 | 6B0F | 5F62 | 6567 | 5F74 | 656B | 5F79 |
| 0000161160 | 6F63 | 6564 | 040C | 000A | 00C0 | 6E06 | 6D61 | 5F65 |
| 0000161200 | 0C70 | 0604 | C400 | 0600 | 6F63 | 6564 | 705F | 0408 |
| 0000161220 | FFFA | 0081 | 7202 | 0C63 | FC04 | 84FF | 0600 | 5F69 |
| 0000161240 | 6F63 | 6564 | 0407 | FFF8 | 0081 | 6901 | 0201 | 011F |
| 0000161260 | 0882 | 04E3 | 00D6 | 0016 | 00C8 | 0000 | 1004 | 626B |
| 0000161300 | 675F | 7465 | 625F | 7361 | 5F65 | 6F63 | 6564 | 040C |
| 0000161320 | 000A | 00CG | 6E06 | 6D61 | 5F65 | 0C70 | 0604 | C400 |
| 0000161340 | 0600 | 6F63 | 6564 | 705F | 040C | FFFC | 0084 | 6906 |
| 0000161360 | 635F | 646F | 0765 | F804 | 81FF | 0100 | 0869 | FA04 |
| 0000161400 | 81FF | 0200 | 6372 | 0201 | 0120 | 0958 | 04E5 | 00AA |
| 0000161420 | 0016 | 009C | 0000 | 1104 | 626B | 675F | 7465 | 735F |
| 0000161440 | 6968 | 7466 | 635F | 646F | 0C65 | 0604 | C400 | 0600 |
| 0000161460 | 6F63 | 6564 | 705F | 040C | FFFC | 0084 | 6906 | 635F |
| 0000161500 | 646F | 0765 | F804 | 81FF | 0100 | 0869 | FA04 | 81FF |
| 0000161520 | 0200 | 6372 | 0201 | 0128 | 0A02 | 04E7 | 00CE | 0016 |
| 0000161540 | 00C0 | 0000 | 1904 | 626B | 675F | 7465 | 6B5F | 7965 |
| 0000161560 | 745F | 7079 | 5F65 | 7266 | 6D6F | 6E5F | 6D61 | 1565 |
| 0000161600 | 0A04 | C000 | 0F00 | 656B | 5F79 | 7974 | 6570 | 6E5F |
| 0000161620 | 6D61 | 5F65 | 1070 | 0604 | C500 | 0A00 | 656B | 5F79 |
| 0000161640 | 7974 | 6570 | 705F | 0410 | FFFC | 0085 | 690A | 6B5F |
| 0000161660 | 7965 | 745F | 7079 | 0865 | FA04 | 81FF | 0200 | 6372 |
| 0000161700 | 0201 | 011F | 0AD0 | 04EC | 0075 | 0016 | 0067 | 0000 |
| 0000161720 | 1004 | 626B | 675F | 7465 | 6D5F | 656B | 5F79 | 7461 |
| 0000161740 | 7274 | 040A | 000A | 0084 | 6D04 | 656B | 0A79 | 0604 |
| 0000161760 | BF00 | 0404 | 7461 | 7274 | 0408 | FFFC | 0081 | 7202 |
| 0000162000 | 0163 | 1F02 | 4501 | EE0B | 9F04 | 1600 | 9100 | 0000 |
| 0000162020 | 0400 | 6B10 | 5F62 | 6567 | 5F74 | 6B6D | 7965 | 635F |
| 0000162040 | 646F | 0C65 | 0A04 | C000 | 0600 | 616E | 656D | 705F |
| 0000162060 | 040C | 0006 | 00C4 | 6306 | 646F | 5F65 | 0770 | F804 |
| 0000162100 | 81FF | 0100 | 0869 | FA04 | 81FF | 0200 | 6372 | 040C |
| 0000162120 | FFFC | 0084 | 6906 | 635F | 646F | 0165 | 0502 | 000D |
| 0000162140 | 1A00 | 0F00 | 8805 | 0500 | C000 | 0700 | 5F42 | 4678 |
| 0000162160 | 6C69 | 0F65 | 8C05 | 0500 | C000 | 0700 | 5F42 | 5078 |
| 0000162200 | 6361 | 146B | 0005 | 0000 | 8100 | 0C00 | 7842 | 445F |
| 0000162220 | 6265 | 6775 | 6F4D | 6564 | 0514 | 0000 | 0000 | 0081 |
| 0000162240 | 420C | 5F78 | 6954 | 656D | 4D73 | 646F | 1465 | 9005 |
| 0000162260 | 0500 | B400 | 0C04 | 626B | 745F | 6261 | 656C | 705F |
| 0000162300 | 735F | 0513 | 0D66 | 0005 | 04AF | 6D0B | 656B | 7379 |
| 0000162320 | 745F | 6261 | 656C | 0511 | 0094 | 0005 | 04A9 | 6D09 |
| 0000162340 | 656B | 5F79 | 7461 | 7274 | 1105 | 0001 | 0000 | 0123 |
| 0000162360 | 0BE4 | 05D0 | 01C9 | 0016 | 01BB | 0000 | 1404 | 5F6C |
| 0000162400 | 6975 | 695F | 6F63 | 5F6E | 656C | 7261 | 5F6E | 6F66 |
| 0000162420 | 6D72 | 0411 | 0006 | 00C0 | 740B | 7365 | 5F74 | 616E |
| 0000162440 | 656D | 705F | 040C | FFFA | 00C0 | 5F06 | 745F | 7079 |
| 0000162460 | 0F65 | 5604 | 85FE | 0900 | 5F5F | 7862 | 745F | 7079 |
| 0000162500 | 0D65 | 4604 | 71FE | 0703 | 5F5F | 7270 | 6E69 | 0B74 |
| 0000162520 | 3E04 | 02FE | 0502 | 5F5F | 766C | 0D6C | 4A04 | D4FE |
| 0000162540 | 0705 | 5F5F | 6C63 | 636F | 0D6B | 5E04 | C0FE | 0700 |
| 0000162560 | 5F5F | 7473 | 6361 | 0E6B | 4404 | 81FE | 0800 | 5F5F |
| 0000162600 | 6572 | 7674 | 6C61 | 040A | FE62 | 05AA | 6604 | 726F |
| 0000162620 | 0B6D | 5804 | 0AFE | 0505 | 736D | 5F67 | 0870 | 5C04 |
| 0000162640 | 81FE | 0200 | 6372 | 050E | 0114 | 0005 | 05D3 | 5F06 |
| 0000162660 | 665F | 6E75 | 0163 | 1502 | AD01 | D60D | 8805 | 1601 |
| 0000162700 | 7A00 | 0001 | 0400 | 6C06 | 695F | 6F63 | 0B6E | 0604 |

THU MAR 14 17:45:52 1991 SETUP.DLL PAGE 43, LINE 2479

| | | | | | | | | |
|---|---|---|---|---|---|---|---|---|
| 0000162720 | 0A00 | 0505 | 736D | 5F67 | 0C70 | FA04 | C0FF | 0600 |
| 0000162740 | 5F5F | 7974 | 6570 | 040F | FFF2 | 0085 | 5F09 | 625F |
| 0000162760 | 5F78 | 7974 | 6570 | 040D | FFE2 | 0371 | 5F07 | 705F |
| 0000163000 | 6972 | 746E | 040B | FFDA | 0202 | 5F05 | 6C5F | 6C76 |
| 0000163020 | 040D | FFE6 | 05D4 | 5F07 | 635F | 6F6C | 6B63 | 040D |
| 0000163040 | FFF6 | 00C0 | 5F07 | 735F | 6174 | 6B63 | 040E | FFE0 |
| 0000163060 | 0081 | 5F08 | 725F | 7465 | 6176 | 086C | F404 | 81FF |
| 0000163100 | 0200 | 6372 | 050E | 0138 | 0005 | 05D7 | 5F06 | 665F |
| 0000163120 | 6E75 | 0163 | 0502 | 000D | 1A00 | 0F00 | 0C05 | 0501 |
| 0000163140 | C000 | 0700 | 5F42 | 4678 | 6C69 | 0F65 | 1005 | 0501 |
| 0000163160 | C000 | 0700 | 5F42 | 5078 | 6361 | 146B | 0005 | 0000 |
| 0000163200 | 8100 | 0C00 | 7842 | 445F | 6265 | 6775 | 6F4D | 6564 |
| 0000163220 | 0514 | 0000 | 0000 | 0081 | 420C | 5F78 | 6954 | 656D |
| 0000163240 | 4D73 | 646F | 0565 | 0111 | 0000 | 1B00 | 3601 | CF0F |
| 0000163260 | 6806 | 1001 | 5D00 | 0001 | 0400 | 6C0C | 5F6C | 6E69 |
| 0000163300 | 7469 | 665F | 726F | 0C6D | 0604 | AA00 | 0606 | 6F66 |
| 0000163320 | 6D72 | 705F | 0411 | 000A | 00C0 | 740B | 7365 | 5F74 |
| 0000163340 | 616E | 656D | 705F | 040C | FFFA | 00C0 | 5F06 | 745F |
| 0000163360 | 7079 | 0F65 | F404 | 85FF | 0900 | 5F5F | 7862 | 745F |
| 0000163400 | 7079 | 0D65 | E404 | D3FF | 0706 | 5F5F | 7270 | 6E69 |
| 0000163420 | 0B74 | DC04 | 02FF | 0502 | 5F5F | 766C | 0D6C | E804 |
| 0000163440 | D5FF | 0706 | 5F5F | 6C63 | 636F | 0D6B | F604 | C0FF |
| 0000163460 | 0700 | 5F5F | 7473 | 6361 | 0E6B | E204 | 81FF | 0800 |
| 0000163500 | 5F5F | 6572 | 7674 | 6C61 | 050E | 019E | 0005 | 024F |
| 0000163520 | 5F06 | 665F | 6E75 | 0163 | 1502 | 9E01 | D810 | 7B06 |
| 0000163540 | 1005 | 7000 | 0005 | 0400 | 6C06 | 5F6C | 6C64 | 0D67 |
| 0000163560 | 0604 | 8500 | 0700 | 706F | 635F | 646F | 0C65 | 0804 |
| 0000163600 | AA00 | 0606 | 6F66 | 6D72 | 705F | 040D | FFE0 | 06D5 |
| 0000163620 | 5F07 | 635F | 6F6C | 6B63 | 040D | FFF6 | 00C0 | 5F07 |
| 0000163640 | 735F | 6174 | 6B63 | 040E | FFDA | 0081 | 5F08 | 725F |
| 0000163660 | 7465 | 6176 | 0E6C | A604 | A2FF | 0806 | 6369 | 6E6F |
| 0000163700 | 6D5F | 6773 | 0410 | FFD0 | 06B3 | 690A | 6F63 | 5F6E |
| 0000163720 | 736D | 5F67 | 0C70 | EE04 | 81FF | 0600 | 7263 | 5F76 |
| 0000163740 | 706F | 040B | FFF0 | 0606 | 6D05 | 6773 | 705F | 0408 |
| 0000163760 | FFF4 | 0081 | 7202 | 0C63 | FA04 | C0FF | 0600 | 5F5F |
| 0000164000 | 7974 | 6570 | 040F | FFEC | 0085 | 5F09 | 625F | 5F78 |
| 0000164020 | 7974 | 6570 | 040D | FFDC | 06D3 | 5F07 | 705F | 6972 |
| 0000164040 | 746E | 040B | FFD4 | 0202 | 5F05 | 6C5F | 6C76 | 050E |
| 0000164060 | 01D6 | 0005 | 06DA | 5F06 | 665F | 6E75 | 0163 | 1D02 |
| 0000164100 | 1901 | DD16 | 4C06 | 1001 | 4100 | 0001 | 0400 | 6C0E |
| 0000164120 | 5F6C | 656C | 7261 | 5F6E | 6E65 | 6564 | 0D64 | 0604 |
| 0000164140 | 8500 | 0700 | 7571 | 6C61 | 7469 | 0C79 | FA04 | C0FF |
| 0000164160 | 0600 | 5F5F | 7974 | 6570 | 040F | FF90 | 0085 | 5F09 |
| 0000164200 | 625F | 5F78 | 7974 | 6570 | 040D | FF80 | 06D3 | 5F07 |
| 0000164220 | 705F | 6972 | 746E | 040B | FF78 | 0202 | 5F05 | 6C5F |
| 0000164240 | 6C76 | 040D | FF84 | 06D5 | 5F07 | 635F | 6F6C | 6B63 |
| 0000164260 | 040D | FFF6 | 00C0 | 5F07 | 735F | 6174 | 6B63 | 040E |
| 0000164300 | FF7E | 0081 | 5F08 | 725F | 7465 | 6176 | 096C | 9204 |
| 0000164320 | 97FF | 0306 | 736D | 0E67 | FA05 | 0501 | DF00 | 0606 |
| 0000164340 | 5F5F | 7566 | 636E | 0201 | 011A | 1765 | 06E1 | 0143 |
| 0000164360 | 0010 | 0138 | 0000 | 0B04 | 6C6C | 665F | 726F | 5F6D |
| 0000164400 | 736D | 0967 | 0604 | C000 | 0300 | 736D | 0C67 | FA04 |
| 0000164420 | C0FF | 0600 | 5F5F | 7974 | 6570 | 040F | FFF0 | 0085 |
| 0000164440 | 5F09 | 625F | 5F78 | 7974 | 6570 | 040D | FFE0 | 06D3 |
| 0000164460 | 5F07 | 705F | 6972 | 746E | 040B | FFD8 | 0202 | 5F05 |
| 0000164500 | 6C5F | 6C76 | 040D | FFE4 | 06D5 | 5F07 | 635F | 6F6C |
| 0000164520 | 6B63 | 040D | FFF2 | 00C0 | 5F07 | 735F | 6174 | 6B63 |
| 0000164540 | 040E | FFDE | 0081 | 5F08 | 725F | 7465 | 6176 | 0C6C |
| 0000164560 | F604 | AAFF | 0606 | 6F66 | 6D72 | 705F | 050E | 0212 |

THU MAR 14 17:45:52 1991 SETUP.DLL PAGE 44, LINE 2538

| | | | | | | | | |
|---|---|---|---|---|---|---|---|---|
| 0000164600 | 0005 | 0283 | 5F06 | 665F | 6E75 | 0163 | 1A02 | A801 |
| 0000164620 | E418 | 7C06 | 1001 | 7100 | 0001 | 0400 | 6C0B | 5F6C |
| 0000164640 | 6573 | 5F74 | 6F66 | 6D72 | 0410 | 0006 | 06B3 | 690A |
| 0000164660 | 6F63 | 5F6E | 736D | 5F67 | 0C70 | 0A04 | AA00 | 0606 |
| 0000164700 | 6F66 | 6D72 | 705F | 040C | FFFA | 00C0 | 5F06 | 745F |
| 0000164720 | 7079 | 0F65 | F404 | 85FF | 0900 | 5F5F | 7862 | 745F |
| 0000164740 | 7079 | 0D65 | E404 | D3FF | 0706 | 5F5F | 7270 | 6E69 |
| 0000164760 | 0B74 | DC04 | 02FF | 0502 | 5F5F | 766C | 0D6C | E804 |
| 0000165000 | D5FF | 0706 | 5F5F | 6C63 | 636F | 0D6B | F604 | C0FF |
| 0000165020 | 0700 | 5F5F | 7473 | 6361 | 0E6B | E204 | 81FF | 0800 |
| 0000165040 | 5F5F | 6572 | 7674 | 6C61 | 050E | 0226 | 0005 | 0283 |
| 0000165060 | 5FG6 | 665F | 6E75 | 0163 | 1A02 | 2401 | E61A | 5A06 |
| 0000165100 | 1001 | 4F00 | 0001 | 0400 | 6C0B | 5F6C | 6573 | 5F74 |
| 0000165120 | 6369 | 6E6F | 040C | 0006 | 06AA | 6606 | 726F | 5F6D |
| 0000165140 | 1070 | 0A04 | B300 | 0A06 | 6369 | 6E6F | 6D5F | 6773 |
| 0000165160 | 705F | 040C | FFFA | 00C0 | 5F06 | 745F | 7079 | 0F65 |
| 0000165200 | F404 | 85FF | 0900 | 5F5F | 7862 | 745F | 7079 | 0D65 |
| 0000165220 | E404 | D3FF | 0706 | 5F5F | 7270 | 6E69 | 0B74 | DC04 |
| 0000165240 | 02FF | 0502 | 5F5F | 766C | 0D6C | E804 | D5FF | 0706 |
| 0000165260 | 5F5F | 6C63 | 636F | 0D6B | F604 | C0FF | 0700 | 5F5F |
| 0000165300 | 7473 | 6361 | 0E6B | E204 | 81FF | 0800 | 5F5F | 6572 |
| 0000165320 | 7674 | 6C61 | 050E | 023A | 0005 | 0283 | 5F06 | 665F |
| 0000165340 | 6E75 | 0163 | 1802 | 7E01 | E81B | 0306 | 1002 | F800 |
| 0000165360 | 0001 | 0400 | 6C09 | 5F6C | 6264 | 735F | 7465 | 040A |
| 0000165400 | 0006 | 00C0 | 6E04 | 6D61 | 1065 | 0A04 | B300 | 0A06 |
| 0000165420 | 6369 | 6E6F | 6D5F | 6773 | 705F | 040C | 000E | 06AA |
| 0000165440 | 6606 | 726F | 5F6D | 0C70 | FA04 | C0FF | 0600 | 5F5F |
| 0000165460 | 7974 | 6570 | 040F | FF46 | 0085 | 5F09 | 625F | 5F78 |
| 0000165500 | 7974 | 6570 | 040D | FF36 | 06D3 | 5F07 | 705F | 6972 |
| 0000165520 | 746E | 040B | FF2E | 0202 | 5F05 | 6C5F | 6C76 | 040D |
| 0000165540 | FF3A | 06D5 | 5F07 | 635F | 6F6C | 6B63 | 040D | FFF6 |
| 0000165560 | 00C0 | 5F07 | 735F | 6174 | 6B63 | 040E | FF34 | 0081 |
| 0000165600 | 5F08 | 725F | 7465 | 6176 | 0E6C | 4804 | DAFF | 0805 |
| 0000165620 | 6369 | 6E6F | 685F | 7264 | 0408 | FFF4 | 0081 | 7202 |
| 0000165640 | 0E63 | 4E05 | 0502 | E900 | 0606 | 5F5F | 7566 | 636E |
| 0000165660 | 0201 | 0121 | 1D81 | 06EB | 011E | 0010 | 0113 | 0000 |
| 0000165700 | 1204 | 6C6C | 735F | 7465 | 695F | 6F63 | 5F6E | 696C |
| 0000165720 | 5F62 | 6469 | 040C | 0006 | 0086 | 6C06 | 6269 | 695F |
| 0000165740 | 0C64 | FA04 | C0FF | 0600 | 5F5F | 7974 | 6570 | 040F |
| 0000165760 | FFF4 | 0085 | 5F09 | 625F | 5F78 | 7974 | 6570 | 040D |
| 0000166000 | FFE4 | 06D3 | 5F07 | 705F | 6972 | 746E | 040B | FFDC |
| 0000166020 | 0202 | 5F05 | 6C5F | 6C76 | 040D | FFE8 | 06D5 | 5F07 |
| 0000166040 | 635F | 6F6C | 6B63 | 040D | FFF6 | 00C0 | 5F07 | 735F |
| 0000166060 | 6174 | 6B63 | 040E | FFE2 | 0081 | 5F08 | 725F | 7465 |
| 0000166100 | 6176 | 0E6C | 6005 | 0502 | ED00 | 0606 | 5F5F | 7566 |
| 0000166120 | 636E | 0201 | 0D05 | 0000 | 001A | 050F | 0176 | 0005 |
| 0000166140 | 00C0 | 4207 | 785F | 6946 | 656C | 050F | 017A | 0005 |
| 0000166160 | 00C0 | 4207 | 785F | 6150 | 6B63 | 0510 | 3F66 | 0005 |
| 0000166200 | 0086 | 6C08 | 6269 | 695F | 5F64 | 1373 | 7E05 | 0501 |
| 0000166220 | 5400 | 0B02 | 616C | 7473 | 6E5F | 6D61 | 5F65 | 1473 |
| 0000166240 | 0005 | 0000 | 8100 | 0C00 | 7842 | 445F | 6265 | 6775 |
| 0000166260 | 6F4D | 6564 | 0514 | 0000 | 0000 | 0081 | 420C | 5F78 |
| 0000166300 | 6954 | 656D | 4D73 | 646F | 1065 | 0005 | 0000 | 8100 |
| 0000166320 | 0800 | 7842 | 425F | 735F | 6769 | 1105 | 0001 | 0000 |
| 0000166340 | 011C | 1EA0 | 06D3 | 01B9 | 0010 | 01AE | 0000 | 0D04 |
| 0000166360 | 6C6C | 755F | 645F | 7369 | 5F70 | 6C64 | 0C67 | 0604 |
| 0000166400 | B100 | 0606 | 6F66 | 6D72 | 705F | 040C | FFFA | 00C0 |
| 0000166420 | 5F06 | 745F | 7079 | 0F65 | EC04 | 85FF | 0900 | 5F5F |
| 0000166440 | 7862 | 745F | 7079 | 0D65 | DC04 | F5FF | 0704 | 5F5F |

THU MAR 14 17:45:52 1991 SETUP.DLL PAGE 45, LINE 2597

| | | | | | | | | |
|---|---|---|---|---|---|---|---|---|
| 0000166460 | 7270 | 6E69 | 0B74 | D404 | 02FF | 0502 | 5F5F | 766C |
| 0000166500 | 0D6C | E004 | D8FF | 0706 | 5F5F | 6C63 | 636F | 0D6B |
| 0000166520 | F204 | C0FF | 0700 | 5F5F | 7473 | 6361 | 0E6B | DA04 |
| 0000166540 | 81FF | 0800 | 5F5F | 6572 | 7674 | 6C61 | 040A | FFEE |
| 0000166560 | 0085 | 6804 | 6F6D | 0A64 | F604 | C0FF | 0400 | 7768 |
| 0000166600 | 646E | 0408 | FFF0 | 0081 | 7202 | 0E63 | A005 | 0502 |
| 0000166620 | D600 | 0606 | 5F5F | 7566 | 636E | 0201 | 011C | 2059 |
| 0000166640 | 06DA | 031B | 0016 | 030D | 0000 | 0D04 | 6C6C | 755F |
| 0000166660 | 645F | 676C | 705F | 6F72 | 0A63 | 1004 | C000 | 0400 |
| 0000166700 | 7768 | 646E | 0409 | 000E | 0085 | 6D03 | 6773 | 0409 |
| 0000166720 | 000A | 00C0 | 6D03 | 3170 | 0409 | 0006 | 00C0 | 6D03 |
| 0000166740 | 3270 | 040D | FFFC | 0085 | 6F07 | 5F70 | 6F63 | 6564 |
| 0000166760 | 040B | FFFA | 0081 | 6505 | 7272 | 726F | 0409 | FFF8 |
| 0000167000 | 0081 | 6903 | 6372 | 0201 | 011A | 2374 | 06DD | 0023 |
| 0000167020 | 0010 | 0018 | 0000 | 0B04 | 6C6C | 715F | 665F | 726F |
| 0000167040 | 5F6D | 0170 | 1F02 | 9701 | DF23 | 8906 | 1002 | 7E00 |
| 0000167060 | 0002 | 0400 | 6C10 | 5F6C | 5F75 | 5F77 | 6369 | 6E6F |
| 0000167100 | 665F | 726F | 0C6D | 0604 | B100 | 0606 | 6F66 | 6D72 |
| 0000167120 | 705F | 040C | FFFA | 00C0 | 5F06 | 745F | 7079 | 0F65 |
| 0000167140 | F404 | 85FF | 0900 | 5F5F | 7862 | 745F | 7079 | 0D65 |
| 0000167160 | E404 | F5FF | 0704 | 5F5F | 7270 | 6E69 | 0B74 | DC04 |
| 0000167200 | 02FF | 0502 | 5F5F | 766C | 0D6C | E804 | D8FF | 0706 |
| 0000167220 | 5F5F | 6C63 | 636F | 0D6B | F604 | C0FF | 0700 | 5F5F |
| 0000167240 | 7473 | 6361 | 0E6B | E204 | 81FF | 0800 | 5F5F | 6572 |
| 0000167260 | 7674 | 6C61 | 050E | 02D0 | 0005 | 06E1 | 5F06 | 665F |
| 0000167300 | 6E75 | 0163 | 1902 | 2001 | E426 | 2706 | 1001 | 1C00 |
| 0000167320 | 0001 | 0400 | 6CDA | 5F6C | 5F75 | 5F77 | 736D | 0B67 |
| 0000167340 | 0604 | C000 | 0500 | 736D | 5F67 | 0C70 | FA04 | C0FF |
| 0000167360 | 0600 | 5F5F | 7974 | 6570 | 040F | FFF4 | 0085 | 5F09 |
| 0000167400 | 625F | 5F78 | 7974 | 6570 | 040D | FFE4 | 04F5 | 5F07 |
| 0000167420 | 705F | 6972 | 746E | 040B | FFDC | 0202 | 5F05 | 6C5F |
| 0000167440 | 6C76 | 040D | FFE8 | 06D8 | 5F07 | 635F | 6F6C | 6B63 |
| 0000167460 | 040D | FFF6 | 00C0 | 5F07 | 735F | 6174 | 6B63 | 040E |
| 0000167500 | FFE2 | 0081 | 5F08 | 725F | 7465 | 6176 | 0E6C | EA05 |
| 0000167520 | 0502 | E600 | 0606 | 5F5F | 7566 | 636E | 0201 | 011A |
| 0000167540 | 2747 | 06E8 | 0206 | 0010 | 01FB | 0000 | 0B04 | 6C6C |
| 0000167560 | 755F | 655F | 616E | 6C62 | 0D65 | 0604 | 8500 | 0700 |
| 0000167600 | 706F | 635F | 646F | 0A65 | 0804 | 8500 | 0400 | 6C6F |
| 0000167620 | 6761 | 0201 | 0121 | 294D | 06EA | 0163 | 0010 | 0158 |
| 0000167640 | 0000 | 1204 | 6C6C | 755F | 675F | 7465 | 665F | 726F |
| 0000167660 | 5F6D | 6E69 | 6F66 | 040C | 0006 | 06B1 | 6606 | 726F |
| 0000167700 | 5F6D | 0C70 | FA04 | C0FF | 0600 | 5F5F | 7974 | 6570 |
| 0000167720 | 040F | FFF2 | 0085 | 5F09 | 625F | 5F78 | 7974 | 6570 |
| 0000167740 | 040D | FFE0 | 04F5 | 5F07 | 705F | 6972 | 746E | 040B |
| 0000167760 | FFD8 | 0202 | 5F05 | 6C5F | 6C76 | 040D | FFE6 | 06D8 |
| 0000170000 | 5F07 | 635F | 6F6C | 6B63 | 040D | FFF6 | 00C0 | 5F07 |
| 0000170020 | 735F | 6174 | 6B63 | 040E | FFDE | 0081 | 5F08 | 725F |
| 0000170040 | 7465 | 6176 | 096C | E404 | 85FF | 0300 | 7266 | 0863 |
| 0000170060 | F404 | 81FF | 0200 | 6372 | 050E | 0304 | 0005 | 06EC |
| 0000170100 | 5F06 | 665F | 6E75 | 0163 | 1C02 | B001 | ED2A | 2506 |
| 0000170120 | 1000 | 1A00 | 0000 | 0400 | 6C0D | 5F6C | 5F75 | 6567 |
| 0000170140 | 5F74 | 7768 | 646E | 0201 | 0D05 | 0000 | 001A | 050E |
| 0000170160 | 3F6E | 0005 | 06AC | 6606 | 726F | 5F6D | 1073 | 6A05 |
| 0000170200 | 053F | B100 | 0806 | 6F66 | 6D72 | 705F | 735F | 050E |
| 0000170220 | 029C | 0005 | 00C0 | 6806 | 6E77 | 5F64 | 0F73 | 9405 |
| 0000170240 | 0502 | C000 | 0700 | 5F42 | 4678 | 6C69 | 0F65 | 9805 |
| 0000170260 | 0502 | C000 | 0700 | 5F42 | 5078 | 6361 | 146B | 0005 |
| 0000170300 | 0000 | 8100 | 0C00 | 7842 | 445F | 6265 | 6775 | 6F4D |
| 0000170320 | 6564 | 0514 | 0000 | 0000 | 0081 | 420C | 5F78 | 6954 |

THU MAR 14 17:45:52 1991 SETUP.DLL PAGE 46, LINE 2656

| | | | | | | | | |
|---|---|---|---|---|---|---|---|---|
| 0000170340 | 656D | 4D73 | 646F | 0565 | 0111 | 0000 | 1A00 | D601 |
| 0000170360 | 502A | CB05 | 1001 | C000 | 0001 | 0400 | 6C0B | 5F6C |
| 0000170400 | 6173 | 6576 | 6D5F | 6773 | 0410 | 0006 | 0535 | 690A |
| 0000170420 | 6F63 | 5F6E | 736D | 5F67 | 1470 | 0A04 | 8500 | 0E00 |
| 0000170440 | 6173 | 6576 | 725F | 7165 | 6575 | 7473 | 665F | 0410 |
| 0000170460 | 000C | 0085 | 6D0A | 646F | 6669 | 6569 | 5F64 | 0C66 |
| 0000170500 | FA04 | C0FF | 0600 | 5F5F | 7974 | 6570 | 040F | FFF2 |
| 0000170520 | 0085 | 5F09 | 625F | 5F78 | 7974 | 6570 | 040D | FFE2 |
| 0000170540 | 0554 | 5F07 | 705F | 6972 | 746E | 040B | FFDA | 0202 |
| 0000170560 | 5F05 | 6C5F | 6C76 | 040D | FFE6 | 0556 | 5F07 | 635F |
| 0000170600 | 6F6C | 6B63 | 040D | FFF6 | 00C0 | 5F07 | 735F | 6174 |
| 0000170620 | 6B63 | 040E | FFE0 | 0081 | 5F08 | 725F | 7465 | 6176 |
| 0000170640 | 096C | D804 | 81FF | 0300 | 7269 | 0863 | F404 | 81FF |
| 0000170660 | 0200 | 6372 | 050E | 038E | 0005 | 0283 | 5F06 | 665F |
| 0000170700 | 6E75 | 0163 | 1E02 | A101 | 5A2C | 6605 | 1001 | 5B00 |
| 0000170720 | 0001 | 0400 | 6C0F | 5F6C | 7263 | 5F76 | 6369 | 6E6F |
| 0000170740 | 6D5F | 6773 | 040D | 0006 | 0081 | 6307 | 6D6F | 616D |
| 0000170760 | 646E | 040D | 0008 | 0085 | 6F07 | 5F70 | 6F63 | 6564 |
| 0000171000 | 0410 | 000A | 0535 | 690A | 6F63 | 5F6E | 736D | 5F67 |
| 0000171020 | 0C70 | FA04 | C0FF | 0600 | 5F5F | 7974 | 6570 | 040F |
| 0000171040 | FFF2 | 0085 | 5F09 | 625F | 5F78 | 7974 | 6570 | 040D |
| 0000171060 | FFE2 | 0554 | 5F07 | 705F | 6972 | 746E | 040B | FFDA |
| 0000171100 | 0202 | 5F05 | 6C5F | 6C76 | 040D | FFE6 | 0556 | 5F07 |
| 0000171120 | 635F | 6F6C | 6B63 | 040D | FFF6 | 00C0 | 5F07 | 735F |
| 0000171140 | 6174 | 6B63 | 040E | FFE0 | 0081 | 5F08 | 725F | 7465 |
| 0000171160 | 6176 | 106C | D604 | 88FF | 0A04 | 6572 | 7073 | 6D5F |
| 0000171200 | 6773 | 705F | 0408 | FFF4 | 0081 | 7202 | 0E63 | A805 |
| 0000171220 | 0503 | 5C00 | 0605 | 5F5F | 7566 | 636E | 0201 | 011F |
| 0000171240 | 2E07 | 055E | 015B | 0010 | 0150 | 0000 | 1004 | 6C6C |
| 0000171260 | 635F | 7672 | 705F | 7261 | 6D61 | 6D5F | 6773 | 040D |
| 0000171300 | 0006 | 0081 | 6307 | 6D6F | 616D | 646E | 040B | 0008 |
| 0000171320 | 0081 | 7005 | 7261 | 6D61 | 040C | FFFA | 00C0 | 5F06 |
| 0000171340 | 745F | 7079 | 0F65 | F204 | 85FF | 0900 | 5F5F | 7862 |
| 0000171360 | 745F | 7079 | 0D65 | E204 | 54FF | 0705 | 5F5F | 7270 |
| 0000171400 | 6E69 | 0B74 | DA04 | 02FF | 0502 | 5F5F | 766C | 0D6C |
| 0000171420 | E604 | 56FF | 0705 | 5F5F | 6C63 | 636F | 0D6B | F604 |
| 0000171440 | C0FF | 0700 | 5F5F | 7473 | 6361 | 0E6B | E004 | 81FF |
| 0000171460 | 0800 | 5F5F | 6572 | 7674 | 6C61 | 0410 | FFD6 | 0488 |
| 0000171500 | 720A | 7365 | 5F70 | 736D | 5F67 | 0870 | F404 | 81FF |
| 0000171520 | 0200 | 6372 | 050E | 03C6 | 0005 | 0560 | 5F06 | 665F |
| 0000171540 | 6E75 | 0163 | 1D02 | 6201 | 622F | 5A05 | 1001 | 4F00 |
| 0000171560 | 0001 | 0400 | 6C0E | 5F6C | 7263 | 5F76 | 6D63 | 5F64 |
| 0000171600 | 736D | 0D67 | 0604 | 8100 | 0700 | 6F63 | 6D6D | 6E61 |
| 0000171620 | 0C64 | FA04 | C0FF | 0600 | 5F5F | 7974 | 6570 | 040F |
| 0000171640 | FFF2 | 0085 | 5F09 | 625F | 5F78 | 7974 | 6570 | 040D |
| 0000171660 | FFE2 | 0554 | 5F07 | 705F | 6972 | 746E | 040B | FFDA |
| 0000171700 | 0202 | 5F05 | 6C5F | 6C76 | 040D | FFE6 | 0556 | 5F07 |
| 0000171720 | 635F | 6F6C | 6B63 | 040D | FFF6 | 00C0 | 5F07 | 735F |
| 0000171740 | 6174 | 6B63 | 040E | FFE0 | 0081 | 5F08 | 725F | 7465 |
| 0000171760 | 6176 | 106C | D604 | 88FF | 0A04 | 6572 | 7073 | 6D5F |
| 0000172000 | 6773 | 705F | 0408 | FFF4 | 0081 | 7202 | 0E63 | E605 |
| 0000172020 | 0503 | 6400 | 0605 | 5F5F | 7566 | 636E | 0201 | 011E |
| 0000172040 | 30BC | 0566 | 01A4 | 0010 | 0199 | 0000 | 0F04 | 6C6C |
| 0000172060 | 645F | 7369 | 5F70 | 7265 | 5F72 | 736D | 0E67 | 0604 |
| 0000172100 | 8100 | 0800 | 7265 | 5F72 | 6F63 | 6564 | 040C | FFFA |
| 0000172120 | 00C0 | 5F06 | 745F | 7079 | 0F65 | EE04 | 85FF | 0900 |
| 0000172140 | 5F5F | 7862 | 745F | 7079 | 0D65 | DE04 | 54FF | 0705 |
| 0000172160 | 5F5F | 7270 | 6E69 | 0B74 | D604 | 02FF | 0502 | 5F5F |
| 0000172200 | 766C | 0D6C | E204 | 56FF | 0705 | 5F5F | 6C63 | 636F |

THU MAR 14 17:45:52 1991 SETUP.DLL PAGE 47, LINE 2715

| | | | | | | | | |
|---|---|---|---|---|---|---|---|---|
| 0000172220 | 0D6B | F204 | C0FF | 0700 | 5F5F | 7473 | 6361 | 0E6B |
| 0000172240 | DC04 | 81FF | 0800 | 5F5F | 6572 | 7674 | 6C61 | 040A |
| 0000172260 | FFF6 | 00C0 | 6804 | 6E77 | 0864 | F004 | 81FF | 0200 |
| 0000172300 | 6372 | 050E | 0418 | 0005 | 055C | 5F06 | 665F | 6E75 |
| 0000172320 | 0163 | 0502 | 000D | 1A00 | 0F00 | 8605 | 0503 | C000 |
| 0000172340 | 0700 | 5F42 | 4678 | 6C69 | 0F65 | 8A05 | 0503 | C000 |
| 0000172360 | 0700 | 5F42 | 5078 | 6361 | 146B | 00U5 | 0000 | 8100 |
| 0000172400 | 0C00 | 7842 | 445F | 6265 | 6775 | 6F4D | 6564 | 0514 |
| 0000172420 | 0000 | 0000 | 0081 | 420C | 5F78 | 6954 | 656D | 4D73 |
| 0000172440 | 646F | 1065 | 0005 | 0000 | 8100 | 0800 | 7842 | 425F |
| 0000172460 | 735F | 6769 | 6B04 | 2E62 | 0163 | D300 | 5A00 | 0000 |
| 0000172500 | 5B00 | 1600 | 7000 | AE00 | 7100 | B300 | 7400 | BB00 |
| 0000172520 | 7900 | C000 | 7B00 | DA00 | 7C00 | E700 | 7E00 | EC00 |
| 0000172540 | 8000 | EF00 | 8200 | 0200 | 8301 | 0F00 | 8501 | 1400 |
| 0000172560 | 8701 | 1D00 | 8801 | 2200 | 8901 | 2800 | 8B01 | 2D00 |
| 0000172600 | 8C01 | 4200 | 9001 | 5300 | 9201 | 5600 | 9401 | 7300 |
| 0000172620 | 9501 | 7E00 | 9701 | 9500 | 9901 | 9800 | 9B01 | AA00 |
| 0000172640 | 9D01 | C500 | 9E01 | CF00 | A001 | D400 | A101 | D700 |
| 0000172660 | A201 | EC00 | A401 | F100 | A601 | F400 | A701 | 0700 |
| 0000172700 | A902 | 0C00 | B102 | 0F00 | B402 | 4600 | B502 | 5000 |
| 0000172720 | B702 | 5500 | B902 | 5800 | BA02 | 7200 | BC02 | 8400 |
| 0000172740 | BD02 | 9E00 | C002 | B000 | C202 | C400 | C602 | CD00 |
| 0000172760 | C902 | F800 | CA02 | 0100 | CD03 | 0400 | CF03 | 1600 |
| 0000173000 | D103 | 2A00 | D303 | 3C00 | D403 | 4E00 | D503 | 5800 |
| 0000173020 | D703 | 6100 | D803 | 6A00 | DD03 | 6F00 | DE03 | 8400 |
| 0000173040 | E103 | 9100 | E303 | A800 | E403 | BF00 | E703 | E200 |
| 0000173060 | E803 | 0200 | EA04 | 0500 | EB04 | 1000 | EC04 | 3300 |
| 0000173100 | ED04 | 3600 | EF04 | 4400 | F004 | 5100 | F204 | 6100 |
| 0000173120 | F304 | E800 | 0604 | F601 | 0804 | 0C01 | 0A05 | 1901 |
| 0000173140 | 1E05 | 2701 | 2105 | 3D01 | 2305 | 4701 | 3C05 | 5301 |
| 0000173160 | 3D05 | 6901 | 4105 | 6E01 | 4205 | 8101 | 4405 | 8601 |
| 0000173200 | 4505 | 8901 | 4605 | 9401 | 4805 | 9901 | 4E05 | 9C01 |
| 0000173220 | 5005 | FE01 | 5205 | 0301 | 5406 | 0601 | 5506 | 1701 |
| 0000173240 | 5806 | 1C01 | 5906 | 3601 | 5A06 | 4401 | 5C06 | 5201 |
| 0000173260 | 5D06 | 6F01 | 6006 | 7D01 | 6106 | 8301 | 7506 | 9101 |
| 0000173300 | 7606 | A701 | 7906 | AC01 | 7A06 | BE01 | 7C06 | C301 |
| 0000173320 | 7D06 | C601 | 7E06 | D201 | 8006 | D701 | 8106 | DA01 |
| 0000173340 | 8206 | F001 | 8406 | F501 | 8506 | F801 | 8706 | 0A01 |
| 0000173360 | 8807 | 1001 | 9C07 | 1E01 | 9D07 | 3401 | A007 | 3901 |
| 0000173400 | A107 | 4B01 | A307 | 5001 | A407 | 5301 | A507 | 5F01 |
| 0000173420 | A707 | 6401 | A807 | 6701 | A907 | 7D01 | AB07 | 8201 |
| 0000173440 | AC07 | 8501 | AE07 | 9C01 | AF07 | A201 | C207 | B001 |
| 0000173460 | C607 | C601 | CA07 | CB01 | CB07 | D701 | CD07 | DC01 |
| 0000173500 | CF07 | DF01 | D107 | E401 | D507 | 0201 | D708 | 4E01 |
| 0000173520 | D808 | 5301 | DA08 | 5901 | DC08 | 5C01 | DD08 | 6501 |
| 0000173540 | DF08 | 6E01 | E008 | 7401 | F908 | 8201 | FD08 | 9801 |
| 0000173560 | 0108 | 9D02 | 0208 | A902 | 0408 | AE02 | 0608 | B102 |
| 0000173600 | 0808 | B602 | 0C08 | D402 | 0E08 | 2402 | 0F09 | 2902 |
| 0000173620 | 1109 | 2F02 | 1309 | 3202 | 1409 | 3B02 | 1609 | 4402 |
| 0000173640 | 1709 | 4A02 | 2A09 | 5802 | 2E09 | 6E02 | 3209 | 7302 |
| 0000173660 | 3309 | 7F02 | 3509 | 8402 | 3709 | 8702 | 3909 | 8C02 |
| 0000173700 | 3C09 | AA02 | 3E09 | CE02 | 3F09 | D302 | 4109 | D902 |
| 0000173720 | 4309 | DC02 | 4409 | E502 | 4609 | EE02 | 4709 | F402 |
| 0000173740 | 5C09 | 0202 | 5F0A | 1802 | 630A | 1D02 | 640A | 3702 |
| 0000173760 | 660A | 3C02 | 670A | 3F02 | 680A | 5902 | 6A0A | 5E02 |
| 0000174000 | 6B0A | 6102 | 6C0A | 7B02 | 6E0A | 8002 | 6F0A | 8302 |
| 0000174020 | 700A | 9D02 | 720A | A202 | 730A | A502 | 750A | AA02 |
| 0000174040 | 760A | B302 | 780A | BC02 | 790A | C202 | 8D0A | D002 |
| 0000174060 | 8E0A | E602 | 910A | EB02 | 920A | FD02 | 940A | 0202 |

THU MAR 14 17:45:52 1991 SETUP.DLL PAGE 48, LINE 2774

| | | | | | | | | |
|---|---|---|---|---|---|---|---|---|
| 0000174100 | 950B | 0502 | 960B | 1702 | 980B | 1C02 | 990B | 1F02 |
| 0000174120 | 9B0B | 3102 | A80B | 3702 | BB0B | 4502 | BF0B | 5B02 |
| 0000174140 | C20B | 6002 | C40B | 6502 | C70B | 8302 | C90B | B002 |
| 0000174160 | CA0B | B502 | CC0B | BB02 | CD0B | BE02 | CE0B | C702 |
| 0000174200 | D00B | D002 | E00B | D602 | 060B | 5F6C | 6669 | 632E |
| 0000174220 | 0001 | 001A | 004F | 0BE4 | 0050 | 0BFA | 0055 | 0C97 |
| 0000174240 | 005B | 0C9D | 005D | 0CAA | 0060 | 0CBE | 0062 | 0CD0 |
| 0000174260 | 0064 | 0CDA | 0067 | 0CE6 | 0069 | 0CFB | 006A | 0D05 |
| 0000174300 | 006C | 0D16 | 006D | 0D9F | 0081 | 0DAD | 0082 | 0DC3 |
| 0000174320 | 0085 | 0E56 | 0089 | 0E5B | 008D | 0E65 | 008F | 0E74 |
| 0000174340 | 0093 | 0E77 | 0095 | 0E8A | 0099 | 0E8D | 009B | 0E92 |
| 0000174360 | 009C | 0E95 | 009E | 0EA9 | 009F | 0F27 | 6C09 | 5F6C |
| 0000174400 | 6369 | 6E6F | 632E | 0001 | 00A2 | 004D | 0F36 | 004E |
| 0000174420 | 0F46 | 0053 | 0FD8 | 0054 | 0FEF | 0055 | 1006 | 0056 |
| 0000174440 | 100F | 0057 | 1019 | 0058 | 1023 | 005B | 102C | 005D |
| 0000174460 | 1031 | 005E | 1093 | 0072 | 109E | 0073 | 10AE | 007A |
| 0000174500 | 1140 | 007E | 1145 | 0080 | 11A6 | 0082 | 11AB | 0084 |
| 0000174520 | 11B4 | 0088 | 11BA | 0089 | 11C8 | 008B | 11D4 | 0092 |
| 0000174540 | 11D7 | 0093 | 11E5 | 0095 | 11EA | 0096 | 11ED | 009A |
| 0000174560 | 120F | 009C | 1240 | 009F | 1246 | 00A0 | 124B | 00A3 |
| 0000174600 | 124E | 00A4 | 1253 | 00A7 | 1256 | 00A8 | 125B | 00A9 |
| 0000174620 | 125E | 00AB | 1277 | 00AC | 127A | 00AE | 1283 | 00B1 |
| 0000174640 | 128C | 00B2 | 1291 | 00B3 | 12A5 | 00B5 | 12AA | 00B6 |
| 0000174660 | 12AD | 00B8 | 12B2 | 00BA | 12BB | 00BC | 12D1 | 00BE |
| 0000174700 | 12DA | 00BF | 12F1 | 00C0 | 12FF | 00C4 | 130C | 00C9 |
| 0000174720 | 130F | 00CA | 131D | 00CC | 1322 | 00CD | 1325 | 00D1 |
| 0000174740 | 1347 | 00D3 | 1378 | 00D5 | 138D | 00D7 | 1396 | 00D8 |
| 0000174760 | 13AD | 00DC | 13BB | 00E2 | 13BE | 00E3 | 13E7 | 00E5 |
| 0000175000 | 13EC | 00E7 | 13EF | 00E9 | 1403 | 00EB | 1418 | 00EC |
| 0000175020 | 1421 | 00EE | 1426 | 00EF | 1429 | 00F2 | 1437 | 00F7 |
| 0000175040 | 143A | 00F8 | 1448 | 00FA | 144D | 00FC | 1450 | 00FD |
| 0000175060 | 1464 | 00FF | 1476 | 0101 | 1491 | 0102 | 149A | 0104 |
| 0000175100 | 149F | 0109 | 14A2 | 010A | 14AC | 010C | 14B1 | 010E |
| 0000175120 | 14B4 | 0110 | 14C8 | 0112 | 14DD | 0113 | 14E6 | 0115 |
| 0000175140 | 14EB | 0117 | 14EE | 0118 | 14F3 | 011C | 1500 | 0121 |
| 0000175160 | 1503 | 0124 | 1518 | 0126 | 152B | 0127 | 1534 | 0129 |
| 0000175200 | 1542 | 012E | 1545 | 0130 | 154A | 0131 | 154D | 0132 |
| 0000175220 | 1573 | 0133 | 1585 | 0135 | 1590 | 0136 | 160E | 0149 |
| 0000175240 | 1619 | 014A | 1629 | 0150 | 16BE | 0152 | 16C3 | 0154 |
| 0000175260 | 16CF | 0155 | 16E7 | 0157 | 16F4 | 0158 | 175A | 016C |
| 0000175300 | 1765 | 016D | 1775 | 0173 | 1808 | 0174 | 1813 | 0175 |
| 0000175320 | 182C | 0177 | 183A | 0178 | 189D | 018D | 18A8 | 018E |
| 0000175340 | 18B8 | 0193 | 194B | 0195 | 1956 | 0196 | 195F | 0197 |
| 0000175360 | 1969 | 0199 | 1973 | 019B | 1976 | 019C | 198F | 019D |
| 0000175400 | 199E | 019F | 19AD | 01A1 | 19B6 | 01A2 | 1A19 | 01B7 |
| 0000175420 | 1A24 | 01B8 | 1A34 | 01BC | 1AC7 | 01BD | 1AD9 | 01BE |
| 0000175440 | 1AF2 | 01BF | 1B01 | 01C1 | 1B10 | 01C2 | 1B73 | 01D8 |
| 0000175460 | 1B7E | 01D9 | 1B8E | 01DD | 1C27 | 01E1 | 1C2C | 01E3 |
| 0000175500 | 1C48 | 01E5 | 1C51 | 01E7 | 1C5C | 01E9 | 1C6E | 01EA |
| 0000175520 | 1C82 | 01EB | 1C8D | 01ED | 1C98 | 01EF | 1CA3 | 01F0 |
| 0000175540 | 1CBC | 01F1 | 1CC8 | 01F2 | 1CD4 | 01F5 | 1CDD | 01F6 |
| 0000175560 | 1CE0 | 01F7 | 1CEA | 01F9 | 1CEF | 01FA | 1D76 | 020E |
| 0000175600 | 1D81 | 020F | 1D91 | 0212 | 1E24 | 0214 | 1E31 | 0215 |
| 0000175620 | 1E94 | 6C09 | 5F75 | 6369 | 6E6F | 632E | 0001 | 0082 |
| 0000175640 | 0052 | 1EA0 | 0053 | 1EB0 | 0058 | 1F42 | 005C | 1F47 |
| 0000175660 | 005E | 1F54 | 005F | 1F5D | 0061 | 1F6A | 0063 | 1F73 |
| 0000175700 | 0065 | 1F7B | 0066 | 1F90 | 0069 | 1F9A | 006B | 1FC0 |
| 0000175720 | 006C | 1FCC | 006E | 1FD1 | 006F | 204E | 0084 | 2059 |
| 0000175740 | 008B | 206F | 008F | 2075 | 0091 | 208E | 0093 | 20A7 |

THU MAR 14 17:45:52 1991 SETUP.DLL PAGE 49, LINE 2833

| | | | | | | | | |
|---|---|---|---|---|---|---|---|---|
| 0000175760 | 0095 | 20B4 | 0096 | 20C5 | 0098 | 20DF | 009A | 20F0 |
| 0000176000 | 009C | 210D | 009E | 211F | 00A3 | 2128 | 00A5 | 214B |
| 0000176020 | 00A9 | 2154 | 00AC | 215A | 00AE | 2165 | 00B2 | 2168 |
| 0000176040 | 00B4 | 2173 | 00B7 | 2176 | 00B9 | 2181 | 00BC | 2184 |
| 0000176060 | 00BE | 218F | 00C1 | 2192 | 00C3 | 219D | 00C6 | 21A0 |
| 0000176100 | 00C8 | 21AB | 00CC | 21AE | 00CD | 21B7 | 00CF | 21D9 |
| 0000176120 | 00D4 | 21E2 | 00D8 | 21E8 | 00DA | 21ED | 00DE | 21F0 |
| 0000176140 | 00E0 | 21F5 | 00E4 | 21F8 | 00E6 | 21FD | 00EA | 2200 |
| 0000176160 | 00EC | 2205 | 00F0 | 2208 | 00F2 | 220D | 00F6 | 2210 |
| 0000176200 | 00F8 | 2215 | 00FC | 2218 | 00FE | 221D | 0102 | 2220 |
| 0000176220 | 0104 | 2235 | 0106 | 223E | 0107 | 224B | 0109 | 2256 |
| 0000176240 | 010B | 225F | 010C | 2262 | 010F | 226B | 0110 | 226E |
| 0000176260 | 0111 | 22B5 | 0113 | 22BE | 0115 | 22CE | 011D | 22E1 |
| 0000176300 | 0121 | 22EA | 0123 | 22F4 | 0124 | 2306 | 0126 | 2313 |
| 0000176320 | 012A | 231C | 012B | 231F | 012C | 2349 | 012D | 2366 |
| 0000176340 | 0141 | 2374 | 0144 | 2384 | 0145 | 238C | 0158 | 2397 |
| 0000176360 | 0159 | 23A7 | 015D | 243A | 015F | 2450 | 0162 | 246B |
| 0000176400 | 0164 | 249D | 0166 | 24CF | 0169 | 2501 | 016B | 2533 |
| 0000176420 | 016D | 2565 | 016F | 2597 | 0172 | 25B2 | 0173 | 2615 |
| 0000176440 | 0186 | 2620 | 0187 | 2630 | 018B | 26C3 | 018D | 26D9 |
| 0000176460 | 018E | 273C | 01A2 | 2747 | 01A5 | 2757 | 01A7 | 2777 |
| 0000176500 | 01A8 | 2791 | 01A9 | 27AB | 01AA | 27C5 | 01AB | 27DF |
| 0000176520 | 01AC | 27F9 | 01AD | 2813 | 01AE | 282D | 01AF | 2847 |
| 0000176540 | 01B0 | 2861 | 01B1 | 287B | 01B4 | 2894 | 01B6 | 28CD |
| 0000176560 | 01B8 | 2906 | 01BA | 293F | 01BB | 2942 | 01C6 | 294D |
| 0000176600 | 01C7 | 295D | 01CB | 29F0 | 01D1 | 29F5 | 01D3 | 2A15 |
| 0000176620 | 01D4 | 2A1E | 01D6 | 2A27 | 01D7 | 2AA5 | 01EB | 2AB0 |
| 0000176640 | 01ED | 2AC0 | 01EE | 2ACA | 6C09 | 5F6C | 696D | 6373 |
| 0000176660 | 632E | 0001 | 0033 | 0048 | 2AD6 | 0049 | 2AE6 | 004D |
| 0000176700 | 2B78 | 0051 | 2B7D | 0052 | 2B8F | 0054 | 2BA4 | 005C |
| 0000176720 | 2BA7 | 005E | 2BCD | 0063 | 2BD3 | 0065 | 2BE8 | 0069 |
| 0000176740 | 2BEB | 006D | 2BEE | 006F | 2BF3 | 0073 | 2BF6 | 0075 |
| 0000176760 | 2BFB | 0076 | 2BFE | 0078 | 2C19 | 0079 | 2C96 | 008E |
| 0000177000 | 2CA1 | 008F | 2CB1 | 0093 | 2D44 | 0098 | 2D49 | 009B |
| 0000177020 | 2D53 | 009D | 2D6B | 009E | 2D74 | 00A0 | 2D7E | 00A1 |
| 0000177040 | 2DFC | 00B6 | 2E07 | 00B7 | 2E17 | 00BB | 2EAA | 00C1 |
| 0000177060 | 2EAF | 00C4 | 2EC6 | 00C5 | 2ECF | 00C7 | 2ED9 | 00C8 |
| 0000177100 | 2F57 | 00DC | 2F62 | 00DD | 2F72 | 00E1 | 3005 | 00E5 |
| 0000177120 | 300A | 00E7 | 3020 | 00E8 | 3029 | 00EA | 3033 | 00EB |
| 0000177140 | 30B1 | 00F6 | 30BC | 00F7 | 30CC | 00FB | 315F | 00FE |
| 0000177160 | 3164 | 0100 | 31BB | 0102 | 31C6 | 0104 | 31D7 | 0105 |
| 0000177200 | 3255 | 0C00 | 6C6C | 6269 | 6463 | 6C6C | 6C2E | 6269 |
| 0000177220 | 6F07 | 3273 | 6C2E | 6269 | 6C0A | 6962 | 6D70 | 2E74 |
| 0000177240 | 696C | 0962 | 6264 | 705F | 2E69 | 696C | 0662 | 6975 |
| 0000177260 | 6C2E | 6269 | 6906 | 2E68 | 696C | 0A62 | 7263 | 5F76 |
| 0000177300 | 6669 | 6C2E | 6269 | 0092 | 0101 | 0001 | 0008 | 0000 |
| 0000177320 | 0027 | 0102 | 0001 | 0658 | 0000 | 0119 | 0103 | 0001 |
| 0000177340 | 12E2 | 0000 | 0DF7 | 0104 | 0001 | 712B | 0000 | 060E |
| 0000177360 | 0109 | 0001 | 8785 | 0000 | 0355 | 0101 | 0002 | 002F |
| 0000177400 | 0000 | 0029 | 0102 | 0002 | 0771 | 0000 | 0028 | 0103 |
| 0000177420 | 0002 | 20D9 | 0000 | 11DF | 0104 | 0002 | 7739 | 0000 |
| 0000177440 | 01BD | 0109 | 0002 | 8ADA | 0000 | 0073 | 0101 | 0003 |
| 0000177460 | 0058 | 0000 | 002C | 0102 | 0003 | 0799 | 0000 | 009C |
| 0000177500 | 0103 | 0003 | 32B8 | 0000 | 18FE | 0104 | 0003 | 78F6 |
| 0000177520 | 0000 | 0635 | 0109 | 0003 | 8B4D | 0000 | 0296 | 0101 |
| 0000177540 | 0004 | 0084 | 0000 | 002C | 0102 | 0004 | 0835 | 0000 |
| 0000177560 | 008E | 0103 | 0004 | 4BB6 | 0000 | 1531 | 0104 | 0004 |
| 0000177600 | 7F2B | 0000 | 040D | 0109 | 0004 | 8DE3 | 0000 | 0216 |
| 0000177620 | 0101 | 0005 | 00B0 | 0000 | 002C | 0102 | 0005 | 08C3 |

THU MAR 14 17:45:52 1991 SETUP.DLL PAGE 50, LINE 2892

| | | | | | | | | |
|---|---|---|---|---|---|---|---|---|---|
| 0000177640 | 0000 | 006F | 0103 | 0005 | 60E7 | 0000 | 1044 | 0104 |
| 0000177660 | 0005 | 8338 | 0000 | 044D | 0109 | 0005 | 8FF9 | 0000 |
| 0000177700 | 00DA | 0101 | 0006 | 00DC | 0000 | 0018 | 0102 | 0006 |
| 0000177720 | 0932 | 0000 | 0152 | 0101 | 0007 | 00F4 | 0000 | 0015 |
| 0000177740 | 0102 | 0007 | 0A84 | 0000 | 01D2 | 0101 | 0008 | 010F |
| 0000177760 | 0000 | 001C | 0102 | 0008 | 0C56 | 0000 | 0035 | 0101 |
| 0000200000 | 0009 | 012B | 0000 | 0017 | 0102 | 0009 | 0C8B | 0000 |
| 0000200020 | 000F | 0101 | 000A | 0142 | 0000 | 0017 | 0102 | 000A |
| 0000200040 | 0C9A | 0000 | 0033 | 0101 | 000B | 0159 | 0000 | 001A |
| 0000200060 | 0102 | 000B | 0CCD | 0000 | 0010 | 0101 | 000C | 0173 |
| 0000200100 | 0000 | 001C | 0102 | 000C | 0CDD | 0000 | 0025 | 0101 |
| 0000200120 | 000D | 018F | 0000 | 001B | 0102 | 000D | 0D02 | 0000 |
| 0000200140 | 003F | 0101 | 000E | 01AA | 0000 | 0015 | 0102 | 000E |
| 0000200160 | 0D41 | 0000 | 0020 | 0101 | 000F | 01BF | 0000 | 0014 |
| 0000200200 | 0102 | 000F | 0D61 | 0000 | 001C | 0101 | 0010 | 01D3 |
| 0000200220 | 0000 | 0018 | 0102 | 0010 | 0D7D | 00C0 | 000F | 0101 |
| 0000200240 | 0011 | 01EB | 0000 | 0014 | 0102 | 0011 | 0D8C | 0000 |
| 0000200260 | 0037 | 0101 | 0012 | 01FF | 0000 | 0018 | 0102 | 0012 |
| 0000200300 | 0DC3 | 0000 | 000F | 0101 | 0013 | 0217 | 0000 | 0018 |
| 0000200320 | 0102 | 0013 | 0DD2 | 0000 | 000F | 0101 | 0014 | 022F |
| 0000200340 | 0000 | 0019 | 0102 | 0014 | 0DE1 | 0000 | 0010 | 0101 |
| 0000200360 | 0015 | 0248 | 0000 | 0018 | 0102 | 0015 | 0DF1 | 0000 |
| 0000200400 | 000F | 0101 | 0016 | 0260 | 0000 | 0014 | 0102 | 0016 |
| 0000200420 | 0E00 | 0000 | 0011 | 0101 | 0017 | 0274 | 0000 | 0015 |
| 0000200440 | 0102 | 0017 | 0E11 | 0000 | 0030 | 0101 | 0018 | 0289 |
| 0000200460 | 0000 | 0014 | 0102 | 0018 | 0E41 | 0000 | 000E | 0101 |
| 0000200500 | 0019 | 029D | 0000 | 0017 | 0102 | 0019 | 0E4F | 0000 |
| 0000200520 | 000F | 0101 | 001A | 02B4 | 0000 | 0015 | 0102 | 001A |
| 0000200540 | 0E5E | 0000 | 0012 | 0101 | 001B | 02C9 | 0000 | 0015 |
| 0000200560 | 0102 | 001B | 0E70 | 0000 | 0020 | 0101 | 001C | 02DE |
| 0000200600 | 0000 | 001A | 0102 | 001C | 0E90 | 0000 | 000D | 0101 |
| 0000200620 | 001D | 02F8 | 0000 | 001A | 0102 | 001D | 0E9D | 0000 |
| 0000200640 | 001E | 0101 | 001E | 0312 | 0000 | 0019 | 0102 | 001E |
| 0000200660 | 0EBB | 0000 | 0031 | 0101 | 001F | 032B | 0000 | 0019 |
| 0000200700 | 0102 | 001F | 0EEC | 0000 | 000C | 0101 | 0020 | 0344 |
| 0000200720 | 0000 | 0016 | 0102 | 0020 | 0EF8 | 0000 | 001E | 0101 |
| 0000200740 | 0021 | 035A | 0000 | 0018 | 0102 | 0021 | 0F16 | 0000 |
| 0000200760 | 001D | 0101 | 0022 | 0372 | 0000 | 0017 | 0102 | 0022 |
| 0000201000 | 0F33 | 0000 | 001F | 0101 | 0023 | 0389 | 0000 | 0015 |
| 0000201020 | 0102 | 0023 | 0F52 | 0000 | 001B | 0101 | 0024 | 039E |
| 0000201040 | 0000 | 0018 | 0102 | 0024 | 0F6D | 0000 | 0042 | 0101 |
| 0000201060 | 0025 | 03B6 | 0000 | 0016 | 0102 | 0025 | 0FAF | 0000 |
| 0000201100 | 000E | 0101 | 0026 | 03CC | 0000 | 0018 | 0102 | 0026 |
| 0000201120 | 0FBD | 0000 | 0010 | 0101 | 0027 | 03E4 | 0000 | 0018 |
| 0000201140 | 0102 | 0027 | 0FCD | 0000 | 0010 | 0101 | 0028 | 03FC |
| 0000201160 | 0000 | 0019 | 0102 | 0028 | 0FDD | 0000 | 0012 | 0101 |
| 0000201200 | 0029 | 0415 | 0000 | 0018 | 0102 | 0029 | 0FEF | 0000 |
| 0000201220 | 0041 | 0101 | 002A | 042D | 0000 | 0017 | 0102 | 002A |
| 0000201240 | 1030 | 0000 | 000F | 0101 | 002B | 0444 | 0000 | 0017 |
| 0000201260 | 0102 | 002B | 103F | 0000 | 000E | 0101 | 002C | 045B |
| 0000201300 | 0000 | 0017 | 0102 | 002C | 104D | 0000 | 000E | 0101 |
| 0000201320 | 002D | 0472 | 0000 | 0017 | 0102 | 002D | 105B | 0000 |
| 0000201340 | 000E | 0101 | 002E | 0489 | 0000 | 0017 | 0102 | 002E |
| 0000201360 | 1069 | 0000 | 000E | 0101 | 002F | 04A0 | 0000 | 0018 |
| 0000201400 | 0102 | 002F | 1077 | 0000 | 000F | 0101 | 0030 | 04B8 |
| 0000201420 | 0000 | 0015 | 0102 | 0030 | 1086 | 0000 | 000C | 0101 |
| 0000201440 | 0031 | 04CD | 0000 | 0019 | 0102 | 0031 | 1092 | 0000 |
| 0000201460 | 0056 | 0101 | 0032 | 04E6 | 0000 | 0016 | 0102 | 0032 |
| 0000201500 | 10E8 | 0000 | 001D | 0101 | 0034 | 04FC | 0000 | 001A |

THU MAR 14 17:45:52 1991 SETUP.DLL PAGE 51, LINE 2951

```
0000201520  0102  0034  1105  0000  00AB  0101  0035  0516
0000201540  0000  001D  0102  0035  11B0  0000  0024  0101
0000201560  0036  0533  0000  0016  0102  0036  11D4  0000
0000201600  000D  0101  0037  0549  0000  0016  0102  0037
0000201620  11E1  0000  000F  0101  0038  055F  0000  0015
0000201640  0102  0038  11F0  0000  000E  0101  0039  0574
0000201660  0000  0017  0102  0039  11FE  0000  000E  0101
0000201700  003A  058B  0000  0018  0102  003A  120C  0000
0000201720  000E  0101  003B  05A3  0000  0018  0102  003B
0000201740  121A  0000  000E  0101  003C  05BB  0000  0015
0000201760  0102  003C  1228  0000  001F  0101  003D  05D0
0000202000  00G0  0017  0102  003D  1247  0000  001D  0101
0000202020  003E  05E7  0000  001B  0102  003E  1264  0000
0000202040  001C  0101  003F  0602  0000  0016  0102  003F
0000202060  1280  0000  0023  0101  0040  0618  0000  0016
0000202100  0102  0040  12A3  0000  0011  0101  0041  062E
0000202120  0000  0015  0102  0041  12B4  0000  001F  010J
0000202140  0042  0643  0000  0015  0102  0042  12D3  0000
0000202160  000F  0106  0000  90D3  0000  0044  424E  3230
0000202200  96D5  0000
0000202204
```

THU MAR 14 17:46:30 1991 SUTFILE.HEX PAGE 1, LINE 1

| | | | | | | | | |
|---|---|---|---|---|---|---|---|---|
| 0000000000 | 313A | 3830 | 3536 | 3032 | 4530 | 3734 | 3038 | 3730 |
| 0000000020 | 3039 | 3134 | 3832 | 3435 | 3739 | 3842 | 3830 | 4142 |
| 0000000040 | 3738 | 3244 | 3733 | 3243 | 4630 | 0D35 | 3A0A | 3031 |
| 0000000060 | 3638 | 3236 | 3030 | 4237 | 3642 | 4338 | 3338 | 4438 |
| 0000000100 | 3238 | 4245 | 3046 | 4437 | 3232 | 4337 | 3032 | 4237 |
| 0000000120 | 3030 | 4338 | 3338 | 3931 | 0A0D | 313A | 3830 | 3736 |
| 0000000140 | 3032 | 3830 | 3844 | 4532 | 4642 | 3730 | 3244 | 3732 |
| 0000000160 | 3243 | 3730 | 3142 | 3838 | 3843 | 3833 | 3844 | 4532 |
| 0000000200 | 4642 | 3430 | 0D37 | 3A0A | 3031 | 3638 | 3238 | 3030 |
| 0000000220 | 4237 | 3831 | 3039 | 3045 | 3431 | 4245 | 3046 | 4237 |
| 0000000240 | 3031 | 3039 | 3045 | 3331 | 4245 | 3046 | 3244 | 3039 |
| 0000000260 | 4241 | 0A0D | 313A | 3830 | 3936 | 3032 | 4330 | 3932 |
| 0000000300 | 4430 | 3832 | 4445 | 3832 | 4343 | 3832 | 4341 | 3832 |
| 0000000320 | 3738 | 3542 | 3835 | 3842 | 3039 | 3832 | 4335 | 0D37 |
| 0000000340 | 3A0A | 3031 | 3638 | 3241 | 3030 | 3839 | 3445 | 3837 |
| 0000000360 | 3030 | 3937 | 3430 | 3231 | 3538 | 3934 | 4237 | 3038 |
| 0000000400 | 4238 | 3841 | 4237 | 3630 | 3039 | 3833 | 0A0D | 313A |
| 0000000420 | 3830 | 4236 | 3032 | 4530 | 3030 | 4544 | 4642 | 3730 |
| 0000000440 | 3144 | 3732 | 3243 | 3730 | 3042 | 3836 | 3843 | 3833 |
| 0000000460 | 3844 | 4532 | 4642 | 3430 | 0D42 | 3A0A | 3031 | 3638 |
| 0000000500 | 3243 | 3030 | 3039 | 3030 | 3030 | 3231 | 3041 | 3935 |
| 0000000520 | 4237 | 3030 | 3039 | 3045 | 4330 | 4245 | 3046 | 4237 |
| 0000000540 | 3030 | 3039 | 3033 | 0A0D | 313A | 3830 | 4436 | 3032 |
| 0000000560 | 4530 | 3030 | 4545 | 4642 | 3730 | 3042 | 3930 | 4530 |
| 0000000600 | 3130 | 4538 | 4642 | 3730 | 3042 | 3930 | 4530 | 3130 |
| 0000000620 | 4631 | 0D35 | 3A0A | 3031 | 3638 | 3245 | 3030 | 4245 |
| 0000000640 | 3046 | 4237 | 3030 | 3039 | 3045 | 3031 | 4245 | 3046 |
| 0000000660 | 4237 | 3030 | 3039 | 3045 | 4630 | 4245 | 3046 | 3230 |
| 0000000700 | 0A0D | 313A | 3830 | 4636 | 3032 | 3730 | 3042 | 3830 |
| 0000000720 | 3842 | 3742 | 3042 | 3830 | 3842 | 3744 | 4544 | 3731 |
| 0000000740 | 3043 | 3746 | 3042 | 3830 | 3843 | 4533 | 0D31 | 3A0A |
| 0000000760 | 3031 | 3738 | 3230 | 3030 | 4438 | 3238 | 4245 | 3046 |
| 0000001000 | 4237 | 3030 | 3039 | 3045 | 3332 | 4245 | 3046 | 4237 |
| 0000001020 | 3030 | 4137 | 3030 | 3039 | 4630 | 0A0D | 313A | 3830 |
| 0000001040 | 3137 | 3032 | 4530 | 3230 | 4535 | 4641 | 4530 | 4142 |
| 0000001060 | 4633 | 3730 | 3042 | 3730 | 3041 | 3938 | 4530 | 3030 |
| 0000001100 | 4541 | 4641 | 4130 | 0D39 | 3A0A | 3031 | 3738 | 3232 |
| 0000001120 | 3030 | 4245 | 3341 | 3046 | 4437 | 4545 | 4337 | 4630 |
| 0000001140 | 4237 | 3030 | 4338 | 3338 | 4438 | 3238 | 4245 | 3046 |
| 0000001160 | 4437 | 3245 | 0A0D | 313A | 3830 | 3337 | 3032 | 4530 |
| 0000001200 | 3746 | 3043 | 3746 | 3042 | 3830 | 3843 | 3833 | 3844 |
| 0000001220 | 4532 | 4642 | 3730 | 4544 | 3743 | 3043 | 3746 | 4442 |
| 0000001240 | 0D41 | 3A0A | 3031 | 3738 | 3234 | 3030 | 3030 | 4338 |
| 0000001260 | 3338 | 4438 | 3238 | 4245 | 3046 | 4437 | 4445 | 4337 |
| 0000001300 | 4630 | 4237 | 3030 | 4338 | 3338 | 4438 | 3232 | 0A0D |
| 0000001320 | 313A | 3830 | 3537 | 3032 | 3830 | 4532 | 4642 | 3730 |
| 0000001340 | 4644 | 3732 | 3043 | 3746 | 3042 | 3830 | 3843 | 3833 |
| 0000001360 | 3844 | 4532 | 4642 | 3730 | 4344 | 0D46 | 3A0A | 3031 |
| 0000001400 | 3738 | 3236 | 3030 | 3346 | 4337 | 4630 | 4237 | 3830 |
| 0000001420 | 4338 | 3338 | 4438 | 3238 | 4245 | 3046 | 4437 | 3046 |
| 0000001440 | 4337 | 4630 | 4237 | 4139 | 0A0D | 313A | 3830 | 3737 |
| 0000001460 | 3032 | 3030 | 3830 | 3843 | 3833 | 3844 | 4532 | 4642 |
| 0000001500 | 3730 | 4644 | 3731 | 3043 | 3746 | 3042 | 3838 | 3843 |
| 0000001520 | 3833 | 4544 | 0D36 | 3A0A | 3031 | 3738 | 3238 | 3030 |
| 0000001540 | 3238 | 4245 | 3046 | 4437 | 3245 | 4337 | 4630 | 4237 |
| 0000001560 | 3535 | 4338 | 3338 | 4438 | 3238 | 4245 | 3046 | 4237 |
| 0000001600 | 4335 | 0A0D | 313A | 3830 | 3937 | 3032 | 3830 | 3846 |
| 0000001620 | 4142 | 3038 | 3832 | 3935 | 4538 | 3734 | 3038 | 3730 |
| 0000001640 | 3139 | 3135 | 3832 | 3435 | 3739 | 4642 | 4243 | 0D35 |

THU MAR 14 17:46:30 1991 SUTFILE.HEX PAGE 2, LINE 60

| | | | | | | | | |
|---|---|---|---|---|---|---|---|---|
| 0000001660 | 3A0A | 3031 | 3738 | 3241 | 3030 | 4137 | 4630 | 4138 |
| 0000001700 | 3338 | 4238 | 3238 | 3045 | 4246 | 3231 | 3438 | 3438 |
| 0000001720 | 3738 | 3943 | 3031 | 3838 | 4132 | 4431 | 0A0D | 313A |
| 0000001740 | 3830 | 4237 | 3032 | 3130 | 3831 | 3838 | 3130 | 3834 |
| 0000001760 | 3438 | 3131 | 3835 | 3038 | 3143 | 3836 | 3938 | 3137 |
| 0000002000 | 3838 | 4138 | 3145 | 3739 | 0D43 | 3A0A | 3031 | 3738 |
| 0000002020 | 3243 | 3030 | 3838 | 3543 | 3032 | 3030 | 3030 | 4438 |
| 0000002040 | 4442 | 4237 | 3030 | 3437 | 3430 | 4632 | 3546 | 3238 |
| 0000002060 | 3445 | 4533 | 3533 | 0A0D | 313A | 3830 | 4437 | 3032 |
| 0000002100 | 4630 | 3835 | 4533 | 4642 | 3730 | 4542 | 3732 | 3041 |
| 0000002120 | 3846 | 3841 | 3833 | 3842 | 4532 | 4630 | 3842 | 3042 |
| 0000002140 | 4435 | 0D39 | 3A0A | 3031 | 3738 | 3245 | 3030 | 4237 |
| 0000002160 | 3535 | 4445 | 4236 | 3036 | 3230 | 3038 | 4345 | 4437 |
| 0000002200 | 3245 | 4337 | 4630 | 4237 | 3030 | 4338 | 3338 | 4431 |
| 0000002220 | 0A0D | 313A | 3830 | 4637 | 3032 | 3830 | 3844 | 4532 |
| 0000002240 | 4642 | 3730 | 4644 | 3745 | 3043 | 3746 | 3042 | 3831 |
| 0000002260 | 3843 | 3833 | 3844 | 4532 | 4642 | 3130 | 0D32 | 3A0A |
| 0000002300 | 3031 | 3838 | 3230 | 3030 | 4237 | 3130 | 3039 | 3045 |
| 0000002320 | 3432 | 4245 | 3046 | 3230 | 4538 | 3734 | 4237 | 3030 |
| 0000002340 | 3437 | 3430 | 4632 | 3546 | 4438 | 0A0D | 313A | 3830 |
| 0000002360 | 3138 | 3032 | 3830 | 4532 | 3334 | 4645 | 3835 | 4533 |
| 0000002400 | 4642 | 3730 | 3144 | 3730 | 3042 | 3746 | 4541 | 3830 |
| 0000002420 | 3841 | 3833 | 3542 | 0D36 | 3A0A | 3031 | 3838 | 3232 |
| 0000002440 | 3030 | 3238 | 3045 | 4434 | 3046 | 4246 | 3230 | 4538 |
| 0000002460 | 3734 | 4237 | 3030 | 3437 | 3430 | 4632 | 3546 | 3238 |
| 0000002500 | 3445 | 3835 | 0A0D | 313A | 3830 | 3338 | 3032 | 3330 |
| 0000002520 | 4645 | 3835 | 4533 | 4642 | 3730 | 4642 | 3946 | 4530 |
| 0000002540 | 3030 | 4543 | 4642 | 3030 | 3832 | 3445 | 3737 | 3842 |
| 0000002560 | 0D32 | 3A0A | 3031 | 3838 | 3234 | 3030 | 3030 | 3437 |
| 0000002600 | 3430 | 4632 | 3546 | 3238 | 3445 | 4533 | 3546 | 3338 |
| 0000002620 | 4245 | 3046 | 4237 | 3245 | 4137 | 4630 | 4441 | 0A0D |
| 0000002640 | 313A | 3830 | 3538 | 3032 | 3830 | 3841 | 3833 | 3842 |
| 0000002660 | 4532 | 4630 | 3842 | 3042 | 3735 | 3542 | 4535 | 3644 |
| 0000002700 | 3642 | 3030 | 3832 | 4530 | 3943 | 0D42 | 3A0A | 3031 |
| 0000002720 | 3838 | 3236 | 3030 | 4437 | 3245 | 4337 | 4630 | 4237 |
| 0000002740 | 3030 | 4338 | 3338 | 4438 | 3238 | 4245 | 3046 | 4437 |
| 0000002760 | 4546 | 4337 | 4630 | 3241 | 0A0D | 313A | 3830 | 3738 |
| 0000003000 | 3032 | 3930 | 4530 | 3230 | 4534 | 4630 | 3842 | 3843 |
| 0000003020 | 3833 | 3844 | 4532 | 4642 | 3030 | 3832 | 3445 | 3737 |
| 0000003040 | 3042 | 3330 | 0D43 | 3A0A | 3031 | 3838 | 3238 | 3030 |
| 0000003060 | 3437 | 3430 | 4632 | 3546 | 3238 | 3445 | 4533 | 3546 |
| 0000003100 | 3338 | 4245 | 3046 | 4237 | 4646 | 3039 | 3045 | 4530 |
| 0000003120 | 4235 | 0A0D | 313A | 3830 | 3938 | 3032 | 4530 | 4642 |
| 0000003140 | 3030 | 3832 | 3445 | 3737 | 3042 | 3730 | 3034 | 3236 |
| 0000003160 | 4646 | 3835 | 4532 | 3334 | 4645 | 3835 | 4633 | 0D31 |
| 0000003200 | 3A0A | 3031 | 3838 | 3241 | 3030 | 4245 | 3046 | 4237 |
| 0000003220 | 4646 | 3039 | 3045 | 3031 | 4245 | 3046 | 3230 | 4538 |
| 0000003240 | 3734 | 4237 | 3030 | 3437 | 3430 | 4334 | 0A0D | 313A |
| 0000003260 | 3830 | 4238 | 3032 | 3230 | 4646 | 3835 | 4532 | 3334 |
| 0000003300 | 4645 | 3835 | 4533 | 4642 | 3730 | 3042 | 3930 | 4530 |
| 0000003320 | 3130 | 4530 | 4642 | 4330 | 0D35 | 3A0A | 3031 | 3838 |
| 0000003340 | 3243 | 3030 | 3230 | 4538 | 3734 | 4237 | 3030 | 3437 |
| 0000003360 | 3430 | 4632 | 3546 | 3238 | 3445 | 4533 | 3546 | 3338 |
| 0000003400 | 4245 | 3046 | 3143 | 0A0D | 313A | 3830 | 4438 | 3032 |
| 0000003420 | 3730 | 4542 | 3743 | 3041 | 3846 | 3841 | 3833 | 3842 |
| 0000003440 | 4532 | 4630 | 3742 | 3041 | 3830 | 3042 | 3835 | 3041 |
| 0000003460 | 3134 | 0D39 | 3A0A | 3031 | 3838 | 3245 | 3030 | 4237 |
| 0000003500 | 4445 | 4137 | 4630 | 4138 | 3338 | 4238 | 3238 | 3045 |
| 0000003520 | 4246 | 4137 | 3030 | 3231 | 3538 | 3944 | 4238 | 4232 |

THU MAR 14 17:46:30 1991 SUTFILE.HEX PAGE 3, LINE 119

| | | | | | | | | |
|---|---|---|---|---|---|---|---|---|
| 0000003540 | 0A0D | 313A | 3830 | 4638 | 3032 | 3030 | 3835 | 3041 |
| 0000003560 | 3734 | 3042 | 3138 | 3832 | 4432 | 3143 | 3832 | 4535 |
| 0000003600 | 4545 | 3242 | 4644 | 4542 | 3341 | 3343 | 0D32 | 3A0A |
| 0000003620 | 3031 | 3938 | 3230 | 3030 | 4146 | 3039 | 3045 | 3932 |
| 0000003640 | 4145 | 3046 | 4245 | 3341 | 3046 | 4237 | 4545 | 4137 |
| 0000003660 | 4630 | 4138 | 3338 | 4238 | 3046 | 0A0D | 313A | 3830 |
| 0000003700 | 3139 | 3032 | 3830 | 4532 | 4630 | 3742 | 3041 | 3830 |
| 0000003720 | 3042 | 3835 | 3041 | 3734 | 4542 | 3746 | 3041 | 3846 |
| 0000003740 | 3841 | 3833 | 4442 | 0D35 | 3A0A | 3031 | 3938 | 3232 |
| 0000003760 | 3030 | 3238 | 3045 | 4246 | 4137 | 3030 | 3231 | 3538 |
| 0000004000 | 3944 | 4238 | 3530 | 4138 | 3430 | 4237 | 3830 | 3231 |
| 0000004020 | 3238 | 3943 | 0A0D | 313A | 3830 | 3339 | 3032 | 4430 |
| 0000004040 | 3143 | 3832 | 4535 | 4545 | 3242 | 4644 | 4542 | 3341 |
| 0000004060 | 4643 | 3941 | 4530 | 3230 | 4537 | 4641 | 4530 | 3442 |
| 0000004100 | 0D35 | 3A0A | 3031 | 3938 | 3234 | 3030 | 3341 | 3046 |
| 0000004120 | 4237 | 4432 | 4137 | 3045 | 3039 | 3845 | 4432 | 4145 |
| 0000004140 | 3046 | 4245 | 3341 | 3046 | 3039 | 3045 | 3332 | 0A0D |
| 0000004160 | 313A | 3830 | 3539 | 3032 | 3230 | 4537 | 4630 | 4143 |
| 0000004200 | 4533 | 4630 | 3944 | 4530 | 3230 | 4539 | 4630 | 4141 |
| 0000004220 | 4533 | 4630 | 4542 | 3644 | 3442 | 0D39 | 3A0A | 3031 |
| 0000004240 | 3938 | 3236 | 3030 | 3037 | 3230 | 4345 | 4136 | 3037 |
| 0000004260 | 3330 | 3230 | 4438 | 4630 | 3039 | 3045 | 3732 | 3045 |
| 0000004300 | 4146 | 3341 | 3045 | 3833 | 0A0D | 313A | 3830 | 3739 |
| 0000004320 | 3032 | 4630 | 3842 | 3841 | 3833 | 3842 | 4532 | 4630 |
| 0000004340 | 3842 | 3042 | 3735 | 4142 | 4538 | 3644 | 3642 | 3030 |
| 0000004360 | 3732 | 3234 | 0D34 | 3A0A | 3031 | 3938 | 3238 | 3030 |
| 0000004400 | 4646 | 3430 | 3037 | 3330 | 3230 | 4238 | 3034 | 4241 |
| 0000004420 | 4238 | 4238 | 3530 | 3445 | 4146 | 4246 | 4346 | 3231 |
| 0000004440 | 3546 | 0A0D | 313A | 3830 | 3939 | 3032 | 3830 | 4535 |
| 0000004460 | 4130 | 3842 | 3844 | 3042 | 4535 | 4634 | 4641 | 4642 |
| 0000004500 | 3143 | 3832 | 4533 | 3139 | 3832 | 4535 | 4430 | 0D45 |
| 0000004520 | 3A0A | 3031 | 3938 | 3241 | 3030 | 4237 | 3145 | 4137 |
| 0000004540 | 4630 | 4138 | 3338 | 4238 | 3238 | 3045 | 4246 | 4238 |
| 0000004560 | 3530 | 4237 | 3830 | 4245 | 4432 | 3043 | 0A0D | 313A |
| 0000004600 | 3830 | 4239 | 3032 | 4630 | 3142 | 3832 | 3233 | 3139 |
| 0000004620 | 3832 | 4535 | 3730 | 3142 | 3130 | 3832 | 3233 | 3139 |
| 0000004640 | 3832 | 4233 | 3037 | 4537 | 0D39 | 3A0A | 3031 | 3938 |
| 0000004660 | 3243 | 3030 | 3030 | 3039 | 3045 | 3732 | 3045 | 4346 |
| 0000004700 | 3341 | 3045 | 4446 | 4237 | 3130 | 4137 | 3030 | 4245 |
| 0000004720 | 4432 | 4246 | 3941 | 0A0D | 313A | 3830 | 4439 | 3032 |
| 0000004740 | 4530 | 3341 | 4643 | 3841 | 3841 | 3833 | 3842 | 4532 |
| 0000004760 | 4630 | 3842 | 3042 | 4535 | 4634 | 4641 | 4642 | 3143 |
| 0000005000 | 3032 | 0D39 | 3A0A | 3031 | 3938 | 3245 | 3030 | 3538 |
| 0000005020 | 3045 | 3039 | 3045 | 3732 | 3045 | 4346 | 3341 | 3045 |
| 0000005040 | 4446 | 4237 | 3230 | 4137 | 3030 | 4245 | 4432 | 4531 |
| 0000005060 | 0A0D | 313A | 3830 | 4639 | 3032 | 4630 | 4542 | 3341 |
| 0000005100 | 4643 | 3841 | 3042 | 3835 | 3041 | 3734 | 4642 | 3746 |
| 0000005120 | 3041 | 4537 | 3542 | 4644 | 4542 | 3141 | 0D34 | 3A0A |
| 0000005140 | 3031 | 4138 | 3230 | 3030 | 4335 | 4146 | 4138 | 3338 |
| 0000005160 | 4238 | 3238 | 3045 | 4246 | 4238 | 3530 | 3445 | 4146 |
| 0000005200 | 4246 | 4346 | 3231 | 3338 | 4631 | 0A0D | 313A | 3830 |
| 0000005220 | 3141 | 3032 | 4530 | 3139 | 3832 | 4535 | 3930 | 4530 |
| 0000005240 | 3230 | 4537 | 4630 | 4143 | 4533 | 4630 | 3744 | 3042 |
| 0000005260 | 3733 | 3041 | 3030 | 0D39 | 3A0A | 3031 | 4138 | 3232 |
| 0000005300 | 3030 | 4245 | 4432 | 4246 | 4145 | 4333 | 4146 | 4238 |
| 0000005320 | 3530 | 4138 | 3430 | 4237 | 4646 | 4137 | 3730 | 4245 |
| 0000005340 | 4435 | 3042 | 0A0D | 313A | 3830 | 3341 | 3032 | 4630 |
| 0000005360 | 4542 | 3541 | 4643 | 3841 | 3841 | 3833 | 3842 | 4532 |
| 0000005400 | 4630 | 3842 | 3042 | 3735 | 3042 | 4538 | 3242 | 4444 |

THU MAR 14 17:46:30 1991 SUTFILE.HEX PAGE 4, LINE 178

| | | | | | | | | |
|---|---|---|---|---|---|---|---|---|
| 0000005420 | 0D39 | 3A0A | 3031 | 4138 | 3234 | 3030 | 4246 | 3231 |
| 0000005440 | 3338 | 3932 | 3231 | 3538 | 3045 | 4237 | 3031 | 3231 |
| 0000005460 | 3338 | 3932 | 3231 | 3338 | 3742 | 4230 | 3435 | 0A0D |
| 0000005500 | 313A | 3830 | 3541 | 3032 | 3030 | 3130 | 3832 | 3833 |
| 0000005520 | 3034 | 3042 | 3130 | 3832 | 4535 | 3130 | 3832 | 3833 |
| 0000005540 | 3034 | 3042 | 3130 | 3832 | 4234 | 0D46 | 3A0A | 3031 |
| 0000005560 | 4138 | 3236 | 3030 | 3430 | 3231 | 3338 | 3742 | 4630 |
| 0000005600 | 3030 | 4237 | 4432 | 4137 | 3845 | 3231 | 3238 | 4331 |
| 0000005620 | 3230 | 4238 | 3530 | 3935 | 0A0D | 313A | 3830 | 3741 |
| 0000005640 | 3032 | 3830 | 3041 | 3734 | 4142 | 3838 | 3843 | 3833 |
| 0000005660 | 3844 | 4532 | 4642 | 3730 | 3242 | 3744 | 4541 | 3138 |
| 0000005700 | 3832 | 4132 | 0D43 | 3A0A | 3031 | 4138 | 3238 | 3030 |
| 0000005720 | 4331 | 3230 | 3231 | 3538 | 3244 | 3231 | 3338 | 3438 |
| 0000005740 | 4430 | 3030 | 4438 | 3330 | 3231 | 3538 | 4545 | 3231 |
| 0000005760 | 3031 | 0A0D | 313A | 3830 | 3941 | 3032 | 3830 | 4435 |
| 0000006000 | 3839 | 3042 | 3735 | 4642 | 4546 | 3542 | 4644 | 3142 |
| 0000006020 | 3832 | 4535 | 3845 | 3843 | 3833 | 3844 | 3832 | 0D36 |
| 0000006040 | 3A0A | 3031 | 4138 | 3241 | 3030 | 4245 | 3046 | 4237 |
| 0000006060 | 4432 | 4137 | 3845 | 3231 | 3238 | 4331 | 3230 | 3231 |
| 0000006100 | 3538 | 3244 | 3231 | 3338 | 3438 | 4241 | 0A0D | 313A |
| 0000006120 | 3830 | 4241 | 3032 | 3030 | 3044 | 3130 | 3832 | 4535 |
| 0000006140 | 3730 | 3042 | 3138 | 3832 | 4632 | 3837 | 3044 | 3133 |
| 0000006160 | 3832 | 4535 | 3145 | 4632 | 0D42 | 3A0A | 3031 | 4138 |
| 0000006200 | 3243 | 3030 | 3538 | 3944 | 4238 | 3530 | 4237 | 4646 |
| 0000006220 | 4245 | 4435 | 4246 | 3231 | 3538 | 4545 | 4338 | 3338 |
| 0000006240 | 4438 | 3238 | 3635 | 0A0D | 313A | 3830 | 4441 | 3032 |
| 0000006260 | 4530 | 4642 | 3730 | 3242 | 3744 | 4541 | 3138 | 3832 |
| 0000006300 | 3132 | 3043 | 3132 | 3832 | 4435 | 3132 | 3832 | 3833 |
| 0000006320 | 3734 | 0D42 | 3A0A | 3031 | 4138 | 3245 | 3030 | 4430 |
| 0000006340 | 3030 | 3231 | 3538 | 3045 | 4237 | 3031 | 3231 | 3238 |
| 0000006360 | 3746 | 4438 | 3330 | 3231 | 3538 | 4545 | 3231 | 3343 |
| 0000006400 | 0A0D | 313A | 3830 | 4641 | 3032 | 3830 | 4435 | 3839 |
| 0000006420 | 3042 | 3735 | 4642 | 4546 | 3542 | 4644 | 3142 | 3832 |
| 0000006440 | 4535 | 3845 | 3843 | 3833 | 3844 | 3232 | 0D36 | 3A0A |
| 0000006460 | 3031 | 4238 | 3230 | 3030 | 4245 | 3046 | 3039 | 3045 |
| 0000006500 | 3732 | 3045 | 4346 | 3341 | 3045 | 4446 | 4237 | 3430 |
| 0000006520 | 4137 | 3030 | 4245 | 4432 | 3438 | 0A0D | 313A | 3830 |
| 0000006540 | 3142 | 3032 | 4630 | 4542 | 3341 | 4643 | 3841 | 3042 |
| 0000006560 | 3835 | 3041 | 3734 | 4642 | 3746 | 3041 | 4537 | 3542 |
| 0000006600 | 4644 | 4542 | 4641 | 0D32 | 3A0A | 3031 | 4238 | 3232 |
| 0000006620 | 3030 | 4335 | 4146 | 3039 | 3045 | 3732 | 4145 | 3046 |
| 0000006640 | 4245 | 3341 | 3046 | 4237 | 3430 | 4137 | 3030 | 3437 |
| 0000006660 | 3331 | 4537 | 0A0D | 313A | 3830 | 3342 | 3032 | 3230 |
| 0000006700 | 4646 | 3835 | 4532 | 3334 | 4645 | 3835 | 4533 | 4641 |
| 0000006720 | 4530 | 4142 | 4633 | 3830 | 3130 | 3732 | 3042 | 3830 |
| 0000006740 | 0D45 | 3A0A | 3031 | 4238 | 3234 | 3030 | 4137 | 3030 |
| 0000006760 | 3437 | 3331 | 4632 | 3546 | 3238 | 3445 | 4533 | 3546 |
| 0000007000 | 3338 | 4145 | 3046 | 4245 | 3341 | 3046 | 4138 | 0A0D |
| 0000007020 | 313A | 3830 | 3542 | 3032 | 3930 | 4530 | 3230 | 4537 |
| 0000007040 | 4630 | 4143 | 4533 | 4630 | 3944 | 4530 | 3230 | 4539 |
| 0000007060 | 4630 | 4141 | 4533 | 4630 | 3242 | 0D46 | 3A0A | 3031 |
| 0000007100 | 4238 | 3236 | 3030 | 3231 | 3038 | 4538 | 3037 | 3330 |
| 0000007120 | 3230 | 4338 | 3237 | 3039 | 3045 | 3732 | 3045 | 4146 |
| 0000007140 | 3341 | 3045 | 4246 | 3138 | 0A0D | 313A | 3830 | 3742 |
| 0000007160 | 3032 | 3730 | 3034 | 3235 | 4646 | 3835 | 4532 | 3334 |
| 0000007200 | 4645 | 3835 | 4533 | 4641 | 4530 | 4142 | 4633 | 3730 |
| 0000007220 | 3034 | 3635 | 0D39 | 3A0A | 3031 | 4238 | 3238 | 3030 |
| 0000007240 | 4632 | 3546 | 3238 | 3445 | 4533 | 3546 | 3338 | 3045 |
| 0000007260 | 4346 | 3341 | 3045 | 4446 | 4237 | 3030 | 4137 | 3830 |

THU MAR 14 17:46:30 1991 SUTFILE.HEX PAGE 5, LINE 237

| | | | | | | | | |
|---|---|---|---|---|---|---|---|---|
| 0000007300 | 4134 | 0A0D | 313A | 3830 | 3942 | 3032 | 3130 | 3832 |
| 0000007320 | 4330 | 3634 | 3330 | 3733 | 3242 | 3744 | 4541 | 3138 |
| 0000007340 | 3832 | 3132 | 3043 | 3832 | 3042 | 3835 | 3141 | 0D34 |
| 0000007360 | 3A0A | 3031 | 4238 | 3241 | 3030 | 3430 | 3437 | 3530 |
| 0000007400 | 4632 | 3546 | 3238 | 3445 | 4533 | 3546 | 3338 | 3045 |
| 0000007420 | 4146 | 3341 | 3045 | 4246 | 4138 | 3432 | 0A0D | 313A |
| 0000007440 | 3830 | 4242 | 3032 | 3830 | 3833 | 3842 | 4532 | 4630 |
| 0000007460 | 3842 | 3843 | 3833 | 3844 | 4532 | 4642 | 3730 | 3034 |
| 0000007500 | 3235 | 4646 | 4542 | 4334 | 0D38 | 3A0A | 3031 | 4238 |
| 0000007520 | 3243 | 3030 | 4533 | 4146 | 3231 | 3238 | 4331 | 3230 |
| 0000007540 | 3038 | 3642 | 4237 | 3030 | 4137 | 3030 | 3437 | 3530 |
| 0000007560 | 4632 | 3546 | 3146 | 0A0D | 313A | 3830 | 4442 | 3032 |
| 0000007600 | 3830 | 4532 | 3334 | 4645 | 3835 | 4533 | 4641 | 4530 |
| 0000007620 | 4142 | 4633 | 3730 | 3034 | 3235 | 4646 | 3835 | 4532 |
| 0000007640 | 3134 | 0D43 | 3A0A | 3031 | 4238 | 3245 | 3030 | 4533 |
| 0000007660 | 3546 | 3338 | 3045 | 4346 | 3341 | 3045 | 4446 | 3039 |
| 0000007700 | 3045 | 3932 | 3045 | 4146 | 3341 | 3045 | 4246 | 3038 |
| 0000007720 | 0A0D | 313A | 3830 | 4642 | 3032 | 3130 | 3832 | 4330 |
| 0000007740 | 3634 | 3330 | 3733 | 3242 | 3744 | 4541 | 3138 | 3832 |
| 0000007760 | 3132 | 3043 | 3832 | 3042 | 3835 | 4241 | 0D34 | 3A0A |
| 0000010000 | 3031 | 4338 | 3230 | 3030 | 3430 | 3437 | 3530 | 4632 |
| 0000010020 | 3546 | 3238 | 3445 | 4533 | 3546 | 3338 | 3045 | 4146 |
| 0000010040 | 3341 | 3045 | 4246 | 4138 | 3343 | 0A0D | 313A | 3830 |
| 0000010060 | 3143 | 3032 | 3830 | 3833 | 3842 | 4532 | 4630 | 3842 |
| 0000010100 | 3843 | 3833 | 3844 | 4532 | 4642 | 3730 | 3034 | 3235 |
| 0000010120 | 4646 | 4542 | 3634 | 0D37 | 3A0A | 3031 | 4338 | 3232 |
| 0000010140 | 3030 | 4533 | 4146 | 3231 | 3238 | 4331 | 3230 | 3038 |
| 0000010160 | 3242 | 3039 | 3045 | 3932 | 3045 | 4346 | 3341 | 3045 |
| 0000010200 | 4446 | 3133 | 0A0D | 313A | 3830 | 3343 | 3032 | 3730 |
| 0000010220 | 3042 | 3730 | 3041 | 4538 | 3242 | 4644 | 4542 | 3341 |
| 0000010240 | 4643 | 3841 | 3042 | 3835 | 3041 | 3934 | 4530 | 3730 |
| 0000010260 | 0D34 | 3A0A | 3031 | 4338 | 3234 | 3030 | 3732 | 3045 |
| 0000010300 | 4146 | 3341 | 3045 | 4246 | 3343 | 4445 | 4239 | 4246 |
| 0000010320 | 4345 | 4139 | 4146 | 4238 | 3530 | 4138 | 3343 | 0A0D |
| 0000010340 | 313A | 3830 | 3543 | 3032 | 3030 | 3734 | 3134 | 3233 |
| 0000010360 | 4646 | 3835 | 4532 | 3334 | 4645 | 3835 | 4533 | 4630 |
| 0000010400 | 4141 | 4533 | 4630 | 4542 | 3042 | 0D34 | 3A0A | 3031 |
| 0000010420 | 4338 | 3236 | 3030 | 4432 | 4246 | 4145 | 4333 | 4146 |
| 0000010440 | 3039 | 3045 | 4232 | 4145 | 3046 | 4245 | 3341 | 3046 |
| 0000010460 | 3230 | 4438 | 4430 | 4232 | 0A0D | 313A | 3830 | 3743 |
| 0000010500 | 3032 | 3930 | 4530 | 3230 | 4537 | 4630 | 4141 | 4533 |
| 0000010520 | 4630 | 3742 | 3034 | 3235 | 4646 | 3835 | 4532 | 3334 |
| 0000010540 | 4645 | 4335 | 0D44 | 3A0A | 3031 | 4338 | 3238 | 3030 |
| 0000010560 | 3338 | 4145 | 3046 | 4245 | 3341 | 3046 | 3437 | 3530 |
| 0000010600 | 4632 | 3546 | 3238 | 3445 | 4533 | 3546 | 3338 | 3045 |
| 0000010620 | 4536 | 0A0D | 313A | 3830 | 3943 | 3032 | 4630 | 4143 |
| 0000010640 | 4533 | 4630 | 3944 | 4530 | 3230 | 4539 | 4630 | 4141 |
| 0000010660 | 4533 | 4630 | 3142 | 3832 | 4330 | 3634 | 4130 | 0D46 |
| 0000010700 | 3A0A | 3031 | 4338 | 3241 | 3030 | 3333 | 4237 | 4432 |
| 0000010720 | 4137 | 3845 | 3231 | 3238 | 4331 | 3230 | 4238 | 3530 |
| 0000010740 | 4138 | 3430 | 3437 | 3530 | 4632 | 4430 | 0A0D | 313A |
| 0000010760 | 3830 | 4243 | 3032 | 4630 | 3835 | 4532 | 3334 | 4645 |
| 0000011000 | 3835 | 4533 | 4630 | 4141 | 4533 | 4630 | 3842 | 3841 |
| 0000011020 | 3833 | 3842 | 4532 | 3430 | 0D46 | 3A0A | 3031 | 4338 |
| 0000011040 | 3243 | 3030 | 4246 | 4338 | 3338 | 4438 | 3238 | 4245 |
| 0000011060 | 3046 | 3437 | 3530 | 4632 | 4246 | 3445 | 4533 | 4146 |
| 0000011100 | 3231 | 3238 | 4235 | 0A0D | 313A | 3830 | 4443 | 3032 |
| 0000011120 | 3130 | 3043 | 3832 | 4230 | 3932 | 4530 | 3230 | 4539 |
| 0000011140 | 4630 | 4143 | 4533 | 4630 | 3944 | 4530 | 3230 | 4537 |

THU MAR 14 17:46:30 1991 SUTFILE.HEX PAGE 6, LINE 296

| | | | | | | | | |
|---|---|---|---|---|---|---|---|---|
| 0000011160 | 4430 | 0D36 | 3A0A | 3031 | 4338 | 3245 | 3030 | 4146 |
| 0000011200 | 3341 | 3045 | 4246 | 3343 | 4445 | 4239 | 4246 | 4345 |
| 0000011220 | 4139 | 4146 | 4238 | 3530 | 4138 | 3430 | 3437 | 3242 |
| 0000011240 | 0A0D | 313A | 3830 | 4643 | 3032 | 3130 | 3233 | 4646 |
| 0000011260 | 3835 | 4532 | 3334 | 4645 | 3835 | 4533 | 4630 | 4141 |
| 0000011300 | 4533 | 4630 | 4542 | 3242 | 4644 | 4242 | 0D34 | 3A0A |
| 0000011320 | 3031 | 4438 | 3230 | 3030 | 4145 | 4333 | 4146 | 3039 |
| 0000011340 | 3045 | 4232 | 4145 | 3046 | 4245 | 3341 | 3046 | 3038 |
| 0000011360 | 4330 | 4237 | 3030 | 4137 | 4443 | 0A0D | 313A | 3830 |
| 0000011400 | 3144 | 3032 | 3030 | 3930 | 4530 | 3230 | 4542 | 4641 |
| 0000011420 | 4530 | 4142 | 4633 | 3730 | 4544 | 3743 | 3043 | 3746 |
| 0000011440 | 3042 | 3830 | 3643 | 0D33 | 3A0A | 3031 | 4438 | 3232 |
| 0000011460 | 3030 | 3338 | 4438 | 3238 | 4245 | 3046 | 4437 | 4445 |
| 0000011500 | 4337 | 4630 | 4237 | 3030 | 4338 | 3338 | 4438 | 3238 |
| 0000011520 | 4245 | 4235 | 0A0D | 313A | 3830 | 3344 | 3032 | 4630 |
| 0000011540 | 3730 | 4544 | 3745 | 3043 | 3746 | 3042 | 3830 | 3843 |
| 0000011560 | 3833 | 3844 | 4532 | 4642 | 3730 | 4544 | 3746 | 4543 |
| 0000011600 | 0D46 | 3A0A | 3031 | 4438 | 3234 | 3030 | 4630 | 4237 |
| 0000011620 | 3030 | 4338 | 3338 | 4438 | 3238 | 4245 | 3046 | 4237 |
| 0000011640 | 3030 | 4137 | 3030 | 3039 | 3045 | 3532 | 3431 | 0A0D |
| 0000011660 | 313A | 3830 | 3544 | 3032 | 4530 | 4641 | 4530 | 4142 |
| 0000011700 | 4633 | 3730 | 4642 | 3946 | 4530 | 3130 | 4532 | 4642 |
| 0000011720 | 3730 | 3042 | 3930 | 4530 | 4630 | 0D37 | 3A0A | 3031 |
| 0000011740 | 4438 | 3236 | 3030 | 3031 | 4245 | 3046 | 4237 | 3030 |
| 0000011760 | 3039 | 3045 | 4330 | 4245 | 3046 | 4237 | 3030 | 3039 |
| 0000012000 | 3045 | 4630 | 4245 | 4635 | 0A0D | 313A | 3830 | 3744 |
| 0000012020 | 3032 | 4630 | 3730 | 3042 | 3830 | 3842 | 3742 | 3042 |
| 0000012040 | 3830 | 3842 | 3744 | 4544 | 3731 | 3043 | 3746 | 3042 |
| 0000012060 | 3830 | 4543 | 0D44 | 3A0A | 3031 | 4438 | 3238 | 3030 |
| 0000012100 | 3338 | 4438 | 3238 | 4245 | 3046 | 4237 | 3245 | 4137 |
| 0000012120 | 4630 | 4138 | 3338 | 4238 | 3238 | 3045 | 4246 | 4238 |
| 0000012140 | 4530 | 0A0D | 313A | 3830 | 3944 | 3032 | 3030 | 3735 |
| 0000012160 | 3542 | 4535 | 3644 | 3642 | 3030 | 3832 | 4530 | 3743 |
| 0000012200 | 4544 | 3732 | 3043 | 3746 | 3042 | 3830 | 4543 | 0D35 |
| 0000012220 | 3A0A | 3031 | 4438 | 3241 | 3030 | 3338 | 4438 | 3238 |
| 0000012240 | 4245 | 3046 | 4437 | 4546 | 4337 | 4630 | 4237 | 4530 |
| 0000012260 | 4338 | 3338 | 4438 | 3238 | 4245 | 4342 | 0A0D | 313A |
| 0000012300 | 3830 | 4244 | 3032 | 4630 | 3730 | 3042 | 3945 | 4530 |
| 0000012320 | 3230 | 4534 | 4642 | 3030 | 3832 | 3445 | 3737 | 3034 |
| 0000012340 | 3234 | 4646 | 3835 | 4432 | 0D34 | 3A0A | 3031 | 4438 |
| 0000012360 | 3243 | 3030 | 3445 | 4533 | 3546 | 3338 | 3045 | 3036 |
| 0000012400 | 4333 | 4237 | 3245 | 4137 | 4630 | 4138 | 3338 | 4238 |
| 0000012420 | 3238 | 3045 | 4241 | 0A0D | 313A | 3830 | 4444 | 3032 |
| 0000012440 | 4630 | 3842 | 3042 | 3735 | 3542 | 4535 | 3644 | 3642 |
| 0000012460 | 3030 | 3832 | 4530 | 3743 | 4544 | 3732 | 3043 | 3746 |
| 0000012500 | 4142 | 0D42 | 3A0A | 3031 | 4438 | 3245 | 3030 | 3030 |
| 0000012520 | 4338 | 3338 | 4438 | 3238 | 4245 | 3046 | 4437 | 4546 |
| 0000012540 | 4337 | 4630 | 4237 | 3430 | 4338 | 3338 | 4438 | 3736 |
| 0000012560 | 0A0D | 313A | 3830 | 4644 | 3032 | 3830 | 4532 | 4642 |
| 0000012600 | 3730 | 3042 | 3934 | 4530 | 3230 | 4534 | 4642 | 3730 |
| 0000012620 | 4642 | 3946 | 4530 | 3030 | 4545 | 3442 | 0D33 | 3A0A |
| 0000012640 | 3031 | 4538 | 3230 | 3030 | 3046 | 3038 | 3034 | 4237 |
| 0000012660 | 4646 | 3437 | 3430 | 4632 | 3546 | 3238 | 3445 | 4533 |
| 0000012700 | 3546 | 3338 | 4245 | 3046 | 3341 | 0A0D | 313A | 3830 |
| 0000012720 | 3145 | 3032 | 3730 | 4542 | 3732 | 3041 | 3846 | 3841 |
| 0000012740 | 3833 | 3842 | 4532 | 4630 | 3842 | 3042 | 3735 | 3542 |
| 0000012760 | 4535 | 3644 | 4242 | 0D44 | 3A0A | 3031 | 4538 | 3232 |
| 0000013000 | 3030 | 3036 | 3230 | 3038 | 4345 | 4437 | 3245 | 4337 |
| 0000013020 | 4630 | 4237 | 3030 | 4338 | 3338 | 4438 | 3238 | 4245 |

THU MAR 14 17:46:30 1991 SUTFILE.HEX PAGE 7, LINE 355

| | | | | | | | | |
|---|---|---|---|---|---|---|---|---|
| 0000013040 | 3046 | 3431 | 0A0D | 313A | 3830 | 3345 | 3032 | 3730 |
| 0000013060 | 4644 | 3745 | 3043 | 3746 | 3042 | 3833 | 3843 | 3833 |
| 0000013100 | 3844 | 4532 | 4642 | 3730 | 3042 | 3933 | 4530 | 4330 |
| 0000013120 | 0D35 | 3A0A | 3031 | 4538 | 3234 | 3030 | 3432 | 4245 |
| 0000013140 | 3046 | 3038 | 3030 | 3230 | 3538 | 3839 | 3445 | 3637 |
| 0000013160 | 3030 | 3937 | 3530 | 3231 | 3538 | 3934 | 3843 | 0A0D |
| 0000013200 | 313A | 3830 | 3545 | 3032 | 3730 | 4642 | 3734 | 3041 |
| 0000013220 | 3846 | 3042 | 3835 | 3041 | 4134 | 3842 | 3842 | 3843 |
| 0000013240 | 3833 | 3844 | 4532 | 4642 | 4330 | 0D42 | 3A0A | 3031 |
| 0000013260 | 4538 | 3236 | 3030 | 4237 | 3546 | 4137 | 4630 | 4236 |
| 0000013300 | 3530 | 4138 | 3430 | 4241 | 4438 | 4338 | 3338 | 4438 |
| 0000013320 | 3238 | 4245 | 3046 | 3842 | 0A0D | 313A | 3830 | 3745 |
| 0000013340 | 3032 | 4130 | 3842 | 3842 | 3042 | 4135 | 3842 | 4544 |
| 0000013360 | 3242 | 4644 | 3842 | 3042 | 3735 | 4542 | 3731 | 3041 |
| 0000013400 | 3846 | 4541 | 0D30 | 3A0A | 3031 | 4538 | 3238 | 3030 |
| 0000013420 | 3338 | 4238 | 3238 | 3045 | 4246 | 3231 | 3538 | 4243 |
| 0000013440 | 4238 | 3530 | 4237 | 3830 | 4245 | 4432 | 4246 | 3231 |
| 0000013460 | 4244 | 0A0D | 313A | 3830 | 3945 | 3032 | 3830 | 4535 |
| 0000013500 | 3737 | 3043 | 3130 | 3832 | 4432 | 3143 | 3832 | 4335 |
| 0000013520 | 3734 | 3144 | 3930 | 4530 | 3130 | 4535 | 3230 | 0D42 |
| 0000013540 | 3A0A | 3031 | 4538 | 3241 | 3030 | 4246 | 3343 | 4445 |
| 0000013560 | 4239 | 4246 | 3231 | 3538 | 3745 | 3231 | 3538 | 4243 |
| 0000013600 | 4238 | 3530 | 3039 | 3045 | 3631 | 3938 | 0A0D | 313A |
| 0000013620 | 3830 | 4245 | 3032 | 4530 | 4630 | 4342 | 4533 | 3944 |
| 0000013640 | 4642 | 3142 | 3832 | 4535 | 3737 | 3043 | 3130 | 3832 |
| 0000013660 | 4432 | 3143 | 3832 | 3835 | 0D45 | 3A0A | 3031 | 4538 |
| 0000013700 | 3243 | 3030 | 3443 | 4437 | 3830 | 3039 | 3045 | 3731 |
| 0000013720 | 3045 | 4246 | 3343 | 4445 | 4239 | 4246 | 3231 | 3538 |
| 0000013740 | 3745 | 4337 | 3542 | 0A0D | 313A | 3830 | 4445 | 3032 |
| 0000013760 | 3030 | 3130 | 3832 | 4432 | 3843 | 3042 | 3735 | 3142 |
| 0000014000 | 3730 | 3043 | 3130 | 3832 | 4432 | 3743 | 3034 | 3234 |
| 0000014020 | 3746 | 0D32 | 3A0A | 3031 | 4538 | 3245 | 3030 | 3546 |
| 0000014040 | 3238 | 3445 | 4533 | 3546 | 3338 | 4245 | 3046 | 4437 |
| 0000014060 | 3646 | 4337 | 4630 | 3437 | 3430 | 4632 | 3546 | 4146 |
| 0000014100 | 0A0D | 313A | 3830 | 4645 | 3032 | 3830 | 4532 | 3334 |
| 0000014120 | 4645 | 3835 | 4533 | 4630 | 3142 | 3832 | 4435 | 3839 |
| 0000014140 | 3042 | 3735 | 4642 | 4546 | 3542 | 4244 | 0D37 | 3A0A |
| 0000014160 | 3031 | 4638 | 3230 | 3030 | 4246 | 3231 | 3538 | 4545 |
| 0000014200 | 4338 | 3338 | 4438 | 3238 | 4245 | 3046 | 4437 | 3746 |
| 0000014220 | 4337 | 4630 | 3437 | 3430 | 4636 | 0A0D | 313A | 3830 |
| 0000014240 | 3146 | 3032 | 3230 | 4646 | 3835 | 4532 | 3334 | 4645 |
| 0000014260 | 3835 | 4533 | 4630 | 3142 | 3832 | 4435 | 3839 | 3042 |
| 0000014300 | 3735 | 3042 | 4238 | 0D31 | 3A0A | 3031 | 4638 | 3232 |
| 0000014320 | 3030 | 4337 | 3030 | 3231 | 3238 | 3143 | 3231 | 3538 |
| 0000014340 | 4545 | 4338 | 3338 | 4438 | 3238 | 4245 | 3046 | 3230 |
| 0000014360 | 3538 | 3936 | 0A0D | 313A | 3830 | 3346 | 3032 | 3930 |
| 0000014400 | 4538 | 3734 | 3038 | 3730 | 3039 | 3134 | 3832 | 3435 |
| 0000014420 | 3739 | 4542 | 3732 | 3041 | 3846 | 3841 | 3833 | 3642 |
| 0000014440 | 0D30 | 3A0A | 3031 | 4638 | 3234 | 3030 | 3238 | 3045 |
| 0000014460 | 4246 | 4238 | 3530 | 4237 | 3535 | 4445 | 4236 | 3036 |
| 0000014500 | 3230 | 3038 | 4345 | 4437 | 3245 | 4337 | 3136 | 0A0D |
| 0000014520 | 313A | 3830 | 3546 | 3032 | 3030 | 3746 | 3042 | 3830 |
| 0000014540 | 3843 | 3833 | 3844 | 4532 | 4642 | 3730 | 4644 | 3745 |
| 0000014560 | 3043 | 3746 | 3042 | 3831 | 3743 | 0D45 | 3A0A | 3031 |
| 0000014600 | 4638 | 3236 | 3030 | 3338 | 4438 | 3238 | 4245 | 3046 |
| 0000014620 | 4237 | 3130 | 3039 | 3045 | 3432 | 4245 | 3046 | 3039 |
| 0000014640 | 3045 | 4530 | 3045 | 3934 | 0A0D | 313A | 3830 | 3746 |
| 0000014660 | 3032 | 3630 | 3030 | 3033 | 3932 | 4530 | 3946 | 4530 |
| 0000014700 | 3030 | 4546 | 4630 | 3142 | 3832 | 3834 | 3834 | 3946 |

THU MAR 14 17:46:30 1991 SUTFILE.HEX PAGE 8, LINE 414

| | | | | | | | | |
|---|---|---|---|---|---|---|---|---|
| 0000014720 | 3045 | 3632 | 0D38 | 3A0A | 3031 | 4638 | 3238 | 3030 |
| 0000014740 | 4638 | 3542 | 3430 | 4638 | 4539 | 3630 | 3039 | 4132 |
| 0000014760 | 3031 | 4638 | 4539 | 3231 | 3039 | 4132 | 3431 | 3039 |
| 0000015000 | 4446 | 0A0D | 313A | 3830 | 3946 | 3032 | 3130 | 3234 |
| 0000015020 | 3830 | 3946 | 3245 | 3932 | 3230 | 3341 | 3030 | 3030 |
| 0000015040 | 3930 | 3430 | 3730 | 4644 | 3744 | 3042 | 3846 | 0D45 |
| 0000015060 | 3A0A | 3031 | 4638 | 3241 | 3030 | 4137 | 3045 | 4138 |
| 0000015100 | 3338 | 4238 | 3238 | 3045 | 4435 | 3046 | 4246 | 3039 |
| 0000015120 | 3030 | 3030 | 3231 | 4641 | 4134 | 3838 | 0A0D | 313A |
| 0000015140 | 3830 | 4246 | 3032 | 3030 | 3932 | 3430 | 3932 | 4530 |
| 0000015160 | 3338 | 4534 | 4630 | 4342 | 3030 | 3733 | 3044 | 3130 |
| 0000015200 | 3832 | 3531 | 4430 | 3630 | 0D31 | 3A0A | 3031 | 4638 |
| 0000015220 | 3243 | 3030 | 3330 | 3037 | 3830 | 3039 | 3030 | 3030 |
| 0000015240 | 3231 | 3942 | 3531 | 3038 | 3733 | 3043 | 3330 | 4437 |
| 0000015260 | 3130 | 3231 | 4141 | 0A0D | 313A | 3830 | 4446 | 3032 |
| 0000015300 | 3830 | 3531 | 4430 | 3030 | 3733 | 3030 | 3938 | 3030 |
| 0000015320 | 3030 | 3130 | 4232 | 4144 | 3844 | 3230 | 4334 | 3030 |
| 0000015340 | 3033 | 0D30 | 3A0A | 3031 | 4638 | 3245 | 3030 | 4437 |
| 0000015360 | 3230 | 3231 | 3138 | 3035 | 3044 | 3330 | 3037 | 3830 |
| 0000015400 | 3039 | 3030 | 3030 | 3231 | 4142 | 3437 | 3038 | 3238 |
| 0000015420 | 0A0D | 313A | 3830 | 4646 | 3032 | 3130 | 3731 | 3044 |
| 0000015440 | 3133 | 3832 | 3531 | 3730 | 3030 | 3938 | 3030 | 3030 |
| 0000015460 | 3130 | 4232 | 3143 | 3844 | 3030 | 3832 | 0D36 | 3A0A |
| 0000015500 | 3031 | 3039 | 3230 | 3030 | 3038 | 3030 | 4437 | 4246 |
| 0000015520 | 4237 | 4630 | 4137 | 3045 | 4138 | 3338 | 4238 | 3238 |
| 0000015540 | 3045 | 4435 | 3046 | 4246 | 3034 | 0A0D | 313A | 3930 |
| 0000015560 | 3130 | 3032 | 3830 | 3230 | 3745 | 4444 | 3746 | 3042 |
| 0000015600 | 3746 | 4541 | 3830 | 3841 | 3833 | 3842 | 4532 | 3530 |
| 0000015620 | 4644 | 4630 | 3142 | 0D45 | 3A0A | 3031 | 3039 | 3232 |
| 0000015640 | 3030 | 3039 | 3030 | 3030 | 3231 | 4143 | 3833 | 3038 |
| 0000015660 | 3831 | 4437 | 4645 | 4237 | 4630 | 4137 | 3045 | 4138 |
| 0000015700 | 3338 | 3541 | 0A0D | 313A | 3930 | 3330 | 3032 | 3830 |
| 0000015720 | 3842 | 4532 | 3530 | 4644 | 4630 | 3942 | 3030 | 3030 |
| 0000015740 | 3130 | 4232 | 4645 | 3835 | 3030 | 3832 | 3030 | 4130 |
| 0000015760 | 0D32 | 3A0A | 3031 | 3039 | 3234 | 3030 | 3039 | 3030 |
| 0000016000 | 3030 | 3231 | 4439 | 3331 | 3039 | 3045 | 3131 | 3045 |
| 0000016020 | 3037 | 333C | 5230 | 3039 | 4443 | 3039 | 3930 | 0A0D |
| 0000016040 | 313A | 3930 | 3530 | 3032 | 4530 | 3030 | 4543 | 3730 |
| 0000016060 | 3730 | 3736 | 3042 | 3930 | 4530 | 3130 | 4531 | 4642 |
| 0000016100 | 3730 | 4544 | 3743 | 3043 | 3946 | 0D31 | 3A0A | 3031 |
| 0000016120 | 3039 | 3236 | 3030 | 4237 | 3030 | 4338 | 3338 | 4438 |
| 0000016140 | 3238 | 4245 | 3046 | 4437 | 4445 | 4337 | 4630 | 4237 |
| 0000016160 | 3030 | 4338 | 3338 | 4230 | 0A0D | 313A | 3930 | 3730 |
| 0000016200 | 3032 | 3830 | 3844 | 4532 | 4642 | 3730 | 4544 | 3745 |
| 0000016220 | 3043 | 3746 | 3042 | 3830 | 3843 | 3833 | 3844 | 4532 |
| 0000016240 | 4642 | 3930 | 0D41 | 3A0A | 3031 | 3039 | 3238 | 3030 |
| 0000016260 | 4437 | 4645 | 4337 | 4630 | 4237 | 3030 | 4338 | 3338 |
| 0000016300 | 4438 | 3238 | 4245 | 3046 | 4237 | 3030 | 4137 | 3030 |
| 0000016320 | 4537 | 0A0D | 313A | 3930 | 3930 | 3032 | 3930 | 4530 |
| 0000016340 | 3230 | 4535 | 4641 | 4530 | 4142 | 4633 | 3730 | 4542 |
| 0000016360 | 3732 | 3041 | 3846 | 3841 | 3833 | 3842 | 4532 | 0D31 |
| 0000016400 | 3A0A | 3031 | 3039 | 3241 | 3030 | 3045 | 4246 | 4238 |
| 0000016420 | 3530 | 4237 | 3535 | 4445 | 4236 | 3036 | 3230 | 3038 |
| 0000016440 | 4345 | 4437 | 3245 | 4337 | 4630 | 3337 | 0A0D | 313A |
| 0000016460 | 3930 | 4230 | 3032 | 3730 | 3042 | 3830 | 3843 | 3833 |
| 0000016500 | 3844 | 4532 | 4642 | 3730 | 4644 | 3745 | 3043 | 3746 |
| 0000016520 | 3042 | 3844 | 3843 | 3933 | 0D44 | 3A0A | 3031 | 3039 |
| 0000016540 | 3243 | 3030 | 4438 | 3238 | 4245 | 3046 | 4237 | 4430 |
| 0000016560 | 3039 | 3045 | 3432 | 4245 | 3046 | 3039 | 3045 | 3630 |

THU MAR 14 17:46:30 1991 SUTFILE.HEX PAGE 9, LINE 473

| | | | | | | | | |
|---|---|---|---|---|---|---|---|---|
| 0000016600 | 3045 | 3037 | 3746 | 0A0D | 313A | 3930 | 4430 | 3032 |
| 0000016620 | 3130 | 3932 | 4530 | 3030 | 4543 | 3630 | 3030 | 3943 |
| 0000016640 | 4530 | 3130 | 4530 | 3730 | 3030 | 3936 | 3030 | 3030 |
| 0000016660 | 3430 | 0D45 | 3A0A | 3031 | 3039 | 3245 | 3030 | 3231 |
| 0000016700 | 3039 | 3246 | 4237 | 3030 | 3039 | 3045 | 3231 | 4245 |
| 0000016720 | 3046 | 3230 | 4638 | 4536 | 3230 | 3538 | 3839 | 3446 |
| 0000016740 | 0A0D | 313A | 3930 | 4630 | 3032 | 4530 | 3734 | 3038 |
| 0000016760 | 3730 | 3039 | 3137 | 3832 | 3435 | 3739 | 3242 | 3735 |
| 0000017000 | 4541 | 3130 | 3832 | 3132 | 3043 | 3032 | 0D36 | 3A0A |
| 0000017020 | 3031 | 3139 | 3230 | 3030 | 4138 | 3338 | 4238 | 3238 |
| 0000017040 | 3045 | 4246 | 4137 | 3030 | 3231 | 3438 | 3334 | 3141 |
| 0000017060 | 3030 | 3531 | 3030 | 4239 | 3443 | 0A0D | 313A | 3930 |
| 0000017100 | 3131 | 3032 | 3730 | 3932 | 3331 | 3946 | 3931 | 3939 |
| 0000017120 | 4534 | 3943 | 3334 | 3938 | 3034 | 3934 | 4634 | 3936 |
| 0000017140 | 4631 | 3933 | 3532 | 0D44 | 3A0A | 3031 | 3139 | 3232 |
| 0000017160 | 3030 | 4238 | 4239 | 3237 | 4239 | 3237 | 3539 | 3030 |
| 0000017200 | 3439 | 3239 | 3539 | 3038 | 3539 | 3144 | 3639 | 3232 |
| 0000017220 | 3639 | 3431 | 0A0D | 313A | 3930 | 3331 | 3032 | 3830 |
| 0000017240 | 3932 | 4239 | 3939 | 3541 | 3939 | 4441 | 3945 | 4536 |
| 0000017260 | 3945 | 3937 | 3936 | 3538 | 3946 | 4530 | 3030 | 4344 |
| 0000017300 | 0D39 | 3A0A | 3031 | 3139 | 3234 | 3030 | 3045 | 4446 |
| 0000017320 | 4237 | 3630 | 4445 | 4236 | 3036 | 3230 | 3437 | 4646 |
| 0000017340 | 3430 | 3036 | 3631 | 3039 | 3045 | 3831 | 3039 | 0A0D |
| 0000017360 | 313A | 3930 | 3531 | 3032 | 4530 | 3730 | 3130 | 4130 |
| 0000017400 | 3842 | 3842 | 3042 | 3935 | 4530 | 3130 | 4533 | 4630 |
| 0000017420 | 3142 | 3832 | 4430 | 3642 | 4230 | 0D43 | 3A0A | 3031 |
| 0000017440 | 3139 | 3236 | 3030 | 3230 | 3038 | 3046 | 4237 | 3030 |
| 0000017460 | 3039 | 3045 | 3831 | 4245 | 3046 | 4237 | 3030 | 4238 |
| 0000017500 | 4238 | 4237 | 3030 | 3141 | 0A0D | 313A | 3930 | 3731 |
| 0000017520 | 3032 | 3830 | 3842 | 3744 | 4544 | 3731 | 3043 | 3746 |
| 0000017540 | 3042 | 3830 | 3843 | 3833 | 3844 | 4532 | 4642 | 3730 |
| 0000017560 | 3242 | 4435 | 0D38 | 3A0A | 3031 | 3139 | 3238 | 3030 |
| 0000017600 | 4137 | 3045 | 3039 | 3030 | 3230 | 3231 | 3941 | 3141 |
| 0000017620 | 3039 | 3030 | 3030 | 3231 | 4239 | 3143 | 3039 | 3030 |
| 0000017640 | 3730 | 0A0D | 313A | 3930 | 3931 | 3032 | 3030 | 3130 |
| 0000017660 | 3932 | 3144 | 3033 | 3932 | 4242 | 3945 | 4530 | 3030 |
| 0000017700 | 4544 | 4630 | 3744 | 3042 | 4536 | 3644 | 3742 | 0D44 |
| 0000017720 | 3A0A | 3031 | 3139 | 3241 | 3030 | 3036 | 3230 | 3437 |
| 0000017740 | 4646 | 3430 | 3036 | 3631 | 3039 | 3045 | 3831 | 3045 |
| 0000017760 | 3037 | 3031 | 4241 | 4238 | 4238 | 3543 | 0A0D | 313A |
| 0000020000 | 3930 | 4231 | 3032 | 3030 | 3935 | 4530 | 3130 | 4533 |
| 0000020020 | 4630 | 3142 | 3832 | 4430 | 3642 | 3030 | 3832 | 4630 |
| 0000020040 | 3730 | 3042 | 3930 | 3030 | 0D30 | 3A0A | 3031 | 3139 |
| 0000020060 | 3243 | 3030 | 3045 | 3831 | 4245 | 3046 | 4237 | 3030 |
| 0000020100 | 4238 | 4238 | 4237 | 3030 | 4238 | 4438 | 4437 | 3145 |
| 0000020120 | 4337 | 4630 | 4442 | 0A0D | 313A | 3930 | 4431 | 3032 |
| 0000020140 | 3730 | 3042 | 3830 | 3843 | 3833 | 3844 | 4532 | 4642 |
| 0000020160 | 3730 | 3242 | 3735 | 4541 | 3930 | 3030 | 3030 | 3132 |
| 0000020200 | 3732 | 0D42 | 3A0A | 3031 | 3139 | 3245 | 3030 | 4241 |
| 0000020220 | 3530 | 3039 | 3930 | 3030 | 3231 | 4239 | 3143 | 3039 |
| 0000020240 | 3030 | 3030 | 3231 | 4439 | 3331 | 3230 | 4239 | 3045 |
| 0000020260 | 0A0D | 313A | 3930 | 4631 | 3032 | 4230 | 3745 | 3242 |
| 0000020300 | 3735 | 4541 | 3130 | 3832 | 3132 | 3043 | 3832 | 3841 |
| 0000020320 | 3833 | 3842 | 4532 | 4630 | 3742 | 3934 | 0D41 | 3A0A |
| 0000020340 | 3031 | 3239 | 3230 | 3030 | 3430 | 4632 | 3546 | 3238 |
| 0000020360 | 3445 | 4533 | 3546 | 3338 | 4245 | 3046 | 4437 | 4646 |
| 0000020400 | 4337 | 3730 | 4237 | 3532 | 4539 | 0A0D | 313A | 3930 |
| 0000020420 | 3132 | 3032 | 3730 | 4541 | 3830 | 3841 | 3833 | 3842 |
| 0000020440 | 4532 | 3530 | 4643 | 4630 | 4141 | 4533 | 3530 | 4644 |

THU MAR 14 17:46:30 1991 SUTFILE.HEX PAGE 10, LINE 532

| | | | | | | | | |
|---|---|---|---|---|---|---|---|---|
| 0000020460 | 4630 | 4542 | 3035 | 0D32 | 3A0A | 3031 | 3239 | 3232 |
| 0000020500 | 3030 | 4438 | 3037 | 4233 | 4237 | 3145 | 4137 | 4630 |
| 0000020520 | 4138 | 3338 | 4238 | 3238 | 3045 | 3037 | 3033 | 4241 |
| 0000020540 | 4238 | 4634 | 0A0D | 313A | 3930 | 3332 | 3032 | 3830 |
| 0000020560 | 3042 | 3735 | 3034 | 3234 | 4646 | 3835 | 4532 | 3334 |
| 0000020600 | 4645 | 3835 | 4533 | 4630 | 3142 | 3832 | 4430 | 3942 |
| 0000020620 | 0D43 | 3A0A | 3031 | 3239 | 3234 | 3030 | 3036 | 4331 |
| 0000020640 | 3039 | 3045 | 4530 | 3045 | 3036 | 3230 | 3038 | 3431 |
| 0000020660 | 4241 | 4238 | 4238 | 3530 | 3437 | 3430 | 4530 | 0A0D |
| 0000020700 | 313A | 3930 | 3532 | 3032 | 3230 | 4646 | 3835 | 4532 |
| 0000020720 | 3334 | 4645 | 3835 | 4533 | 4630 | 3142 | 3832 | 4430 |
| 0000020740 | 3742 | 4530 | 3934 | 3030 | 4130 | 0D30 | 3A0A | 3031 |
| 0000020760 | 3239 | 3236 | 3030 | 3030 | 3231 | 4239 | 3143 | 3039 |
| 0000021000 | 3030 | 3030 | 3231 | 4439 | 3331 | 3437 | 3430 | 4632 |
| 0000021020 | 3546 | 3238 | 3445 | 4133 | 0A0D | 313A | 3930 | 3732 |
| 0000021040 | 3032 | 3330 | 4645 | 3835 | 4533 | 4630 | 3944 | 4530 |
| 0000021060 | 3130 | 4533 | 4630 | 3142 | 3832 | 3031 | 3642 | 3030 |
| 0000021100 | 3737 | 3742 | 0D42 | 3A0A | 3031 | 3239 | 3238 | 3030 |
| 0000021120 | 4646 | 3039 | 3045 | 3831 | 4245 | 3046 | 3230 | 4239 |
| 0000021140 | 4542 | 4237 | 3532 | 4137 | 3045 | 3231 | 3238 | 4331 |
| 0000021160 | 3537 | 0A0D | 313A | 3930 | 3932 | 3032 | 3030 | 3832 |
| 0000021200 | 3841 | 3833 | 3842 | 4532 | 4630 | 3742 | 3034 | 3234 |
| 0000021220 | 4646 | 3835 | 4532 | 3334 | 4645 | 3835 | 3133 | 0D44 |
| 0000021240 | 3A0A | 3031 | 3239 | 3241 | 3030 | 4245 | 3046 | 4437 |
| 0000021260 | 4646 | 4337 | 3730 | 4237 | 3532 | 4137 | 3045 | 4138 |
| 0000021300 | 3338 | 4238 | 3238 | 3045 | 4335 | 3239 | 0A0D | 313A |
| 0000021320 | 3930 | 4232 | 3032 | 4630 | 4630 | 4141 | 4533 | 3530 |
| 0000021340 | 4644 | 4630 | 3742 | 3242 | 3735 | 4541 | 3130 | 3832 |
| 0000021360 | 3132 | 3043 | 3832 | 4341 | 0D31 | 3A0A | 3031 | 3239 |
| 0000021400 | 3243 | 3030 | 3338 | 4238 | 3238 | 3045 | 4246 | 3437 |
| 0000021420 | 3530 | 4632 | 3546 | 3238 | 3445 | 4533 | 3546 | 3338 |
| 0000021440 | 4245 | 3046 | 4439 | 0A0D | 313A | 3930 | 4432 | 3032 |
| 0000021460 | 3730 | 3242 | 3735 | 4541 | 3130 | 3832 | 3132 | 3043 |
| 0000021500 | 3832 | 3841 | 3833 | 3842 | 4532 | 4630 | 3742 | 3034 |
| 0000021520 | 3736 | 0D31 | 3A0A | 3031 | 3239 | 3245 | 3030 | 4632 |
| 0000021540 | 3546 | 3238 | 3445 | 4533 | 3546 | 3338 | 4245 | 3046 |
| 0000021560 | 4437 | 4646 | 4337 | 3730 | 4237 | 3532 | 4137 | 3834 |
| 0000021600 | 0A0D | 313A | 3930 | 4632 | 3032 | 4530 | 3830 | 3841 |
| 0000021620 | 3833 | 3842 | 4532 | 3530 | 4643 | 4630 | 4141 | 4533 |
| 0000021640 | 3530 | 4644 | 4630 | 4142 | 3842 | 3442 | 0D42 | 3A0A |
| 0000021660 | 3031 | 3339 | 3230 | 3030 | 4238 | 3530 | 3437 | 3430 |
| 0000021700 | 4632 | 3546 | 3238 | 3445 | 4533 | 3546 | 3338 | 3045 |
| 0000021720 | 4246 | 3231 | 3038 | 4244 | 4243 | 0A0D | 313A | 3930 |
| 0000021740 | 3133 | 3032 | 3630 | 3330 | 4138 | 3842 | 3844 | 3042 |
| 0000021760 | 3735 | 3034 | 3235 | 4646 | 3835 | 4532 | 3334 | 4645 |
| 0000022000 | 3835 | 4533 | 3530 | 0D32 | 3A0A | 3031 | 3339 | 3232 |
| 0000022020 | 3030 | 4246 | 4445 | 4236 | 3036 | 3230 | 3437 | 4646 |
| 0000022040 | 3430 | 3036 | 3032 | 4237 | 3145 | 4137 | 4630 | 4138 |
| 0000022060 | 3338 | 4439 | 0A0D | 313A | 3930 | 3333 | 3032 | 3830 |
| 0000022100 | 3842 | 4532 | 4630 | 3842 | 3042 | 3735 | 3034 | 3236 |
| 0000022120 | 4646 | 3835 | 4532 | 3334 | 4645 | 3835 | 4533 | 3130 |
| 0000022140 | 0D39 | 3A0A | 3031 | 3339 | 3234 | 3030 | 4246 | 4445 |
| 0000022160 | 4236 | 3036 | 3230 | 3437 | 4646 | 3430 | 3037 | 3035 |
| 0000022200 | 4241 | 4438 | 4238 | 3530 | 3437 | 3530 | 4545 | 0A0D |
| 0000022220 | 313A | 3930 | 3533 | 3032 | 3230 | 4646 | 3835 | 4532 |
| 0000022240 | 3334 | 4645 | 3835 | 4533 | 4630 | 3142 | 3832 | 3431 |
| 0000022260 | 3630 | 3230 | 3730 | 4542 | 3431 | 0D31 | 3A0A | 3031 |
| 0000022300 | 3339 | 3236 | 3030 | 4137 | 4630 | 4138 | 3338 | 4238 |
| 0000022320 | 3238 | 3045 | 4246 | 4238 | 3530 | 3437 | 3630 | 4632 |

THU MAR 14 17:46:30 1991 SUTFILE.HEX PAGE 11, LINE 591

| | | | | | | | | |
|---|---|---|---|---|---|---|---|---|
| 0000022340 | 3546 | 3238 | 3445 | 3945 | 0A0D | 313A | 3930 | 3733 |
| 0000022360 | 3032 | 3330 | 4645 | 3835 | 4533 | 4630 | 4542 | 3644 |
| 0000022400 | 3642 | 3030 | 3732 | 4634 | 3046 | 3734 | 3130 | 3743 |
| 0000022420 | 4542 | 3431 | 0D31 | 3A0A | 3031 | 3339 | 3238 | 3030 |
| 0000022440 | 4137 | 4630 | 4138 | 3338 | 4238 | 3238 | 3045 | 4246 |
| 0000022460 | 4238 | 3530 | 3437 | 3630 | 4632 | 3546 | 3238 | 3445 |
| 0000022500 | 3943 | 0A0D | 313A | 3930 | 3933 | 3032 | 3330 | 4645 |
| 0000022520 | 3835 | 4533 | 4630 | 3142 | 3832 | 3431 | 3630 | 3530 |
| 0000022540 | 3932 | 4530 | 3030 | 4545 | 3730 | 3030 | 4536 | 0D31 |
| 0000022560 | 3A0A | 3031 | 3339 | 3241 | 3030 | 3039 | 3045 | 3231 |
| 0000022600 | 3045 | 3036 | 3230 | 3038 | 3434 | 4237 | 3145 | 4137 |
| 0000022620 | 4630 | 4138 | 3338 | 4238 | 3238 | 3433 | 0A0D | 313A |
| 0000022640 | 3930 | 4233 | 3032 | 4530 | 4630 | 3842 | 3042 | 3735 |
| 0000022660 | 3034 | 3236 | 4646 | 3835 | 4532 | 3334 | 4645 | 3835 |
| 0000022700 | 4533 | 4630 | 3142 | 3932 | 0D39 | 3A0A | 3031 | 3339 |
| 0000022720 | 3243 | 3030 | 3038 | 4244 | 3037 | 3644 | 4241 | 4438 |
| 0000022740 | 4238 | 3530 | 3437 | 3530 | 4632 | 3546 | 3238 | 3445 |
| 0000022760 | 4533 | 3546 | 4346 | 0A0D | 313A | 3930 | 4433 | 3032 |
| 0000023000 | 3830 | 4533 | 4630 | 3142 | 3832 | 4430 | 3742 | 4330 |
| 0000023020 | 4132 | 3842 | 3842 | 3042 | 3735 | 3034 | 3234 | 4646 |
| 0000023040 | 3235 | 0D43 | 3A0A | 3031 | 3339 | 3245 | 3030 | 3238 |
| 0000023060 | 3445 | 4533 | 3546 | 3338 | 3045 | 4246 | 3231 | 3038 |
| 0000023100 | 4244 | 3037 | 4541 | 3039 | 3030 | 3030 | 3231 | 3735 |
| 0000023120 | 0A0D | 313A | 3930 | 4633 | 3032 | 3930 | 4342 | 3931 |
| 0000023140 | 3030 | 3030 | 3130 | 3932 | 3144 | 3733 | 4642 | 3946 |
| 0000023160 | 4530 | 3130 | 4538 | 4642 | 3030 | 4432 | 0D45 | 3A0A |
| 0000023200 | 3031 | 3439 | 3230 | 3030 | 4239 | 4542 | 4237 | 3030 |
| 0000023220 | 3039 | 3045 | 3831 | 4245 | 3046 | 4237 | 3030 | 4238 |
| 0000023240 | 4238 | 4237 | 3030 | 4238 | 4338 | 0A0D | 313A | 3930 |
| 0000023260 | 3134 | 3032 | 3830 | 3744 | 4544 | 3731 | 3043 | 3746 |
| 0000023300 | 3042 | 3830 | 3843 | 3833 | 3844 | 4532 | 4642 | 3730 |
| 0000023320 | 3242 | 3735 | 3441 | 0D36 | 3A0A | 3031 | 3439 | 3232 |
| 0000023340 | 3030 | 3045 | 3039 | 3030 | 3230 | 3231 | 3243 | 4136 |
| 0000023360 | 3039 | 3030 | 3030 | 3231 | 4239 | 3143 | 3039 | 3030 |
| 0000023400 | 3030 | 4346 | 0A0D | 313A | 3930 | 3334 | 3032 | 3130 |
| 0000023420 | 3932 | 3144 | 3033 | 3932 | 4242 | 3945 | 4530 | 3030 |
| 0000023440 | 4544 | 4630 | 3744 | 3042 | 4536 | 3644 | 3642 | 3730 |
| 0000023460 | 0D41 | 3A0A | 3031 | 3439 | 3234 | 3030 | 3230 | 3437 |
| 0000023500 | 4646 | 3430 | 3036 | 3631 | 3039 | 3045 | 3831 | 3045 |
| 0000023520 | 3037 | 3031 | 4241 | 4238 | 4238 | 3530 | 4437 | 0A0D |
| 0000023540 | 313A | 3930 | 3534 | 3032 | 3930 | 4530 | 3130 | 4533 |
| 0000023560 | 4630 | 3142 | 3832 | 4430 | 3642 | 3030 | 3832 | 4630 |
| 0000023600 | 3730 | 3042 | 3930 | 4530 | 3830 | 0D32 | 3A0A | 3031 |
| 0000023620 | 3439 | 3236 | 3030 | 3831 | 4245 | 3046 | 4237 | 3030 |
| 0000023640 | 4238 | 4238 | 4237 | 3030 | 4238 | 4438 | 4437 | 3145 |
| 0000023660 | 4337 | 4630 | 4237 | 4637 | 0A0D | 313A | 3930 | 3734 |
| 0000023700 | 3032 | 3030 | 3830 | 3843 | 3833 | 3844 | 4532 | 4642 |
| 0000023720 | 3730 | 3242 | 3735 | 4541 | 3930 | 3030 | 3030 | 3132 |
| 0000023740 | 4332 | 3835 | 0D45 | 3A0A | 3031 | 3439 | 3238 | 3030 |
| 0000023760 | 4645 | 3039 | 3030 | 3030 | 3231 | 4239 | 3143 | 3039 |
| 0000024000 | 3030 | 3030 | 3231 | 4439 | 3331 | 3230 | 4239 | 4542 |
| 0000024020 | 3034 | 0A0D | 313A | 3930 | 3934 | 3032 | 3930 | 4530 |
| 0000024040 | 3030 | 4544 | 4630 | 3744 | 3042 | 4536 | 3644 | 3642 |
| 0000024060 | 3030 | 3732 | 4634 | 3046 | 3634 | 3130 | 3436 | 0D38 |
| 0000024100 | 3A0A | 3031 | 3439 | 3241 | 3030 | 3039 | 3045 | 3831 |
| 0000024120 | 3045 | 3037 | 3031 | 4241 | 4238 | 4238 | 3530 | 3039 |
| 0000024140 | 3045 | 3331 | 3045 | 4246 | 3231 | 4339 | 0A0D | 313A |
| 0000024160 | 3930 | 4234 | 3032 | 3830 | 4430 | 3642 | 3030 | 3832 |
| 0000024200 | 4630 | 3730 | 3042 | 3930 | 4530 | 3130 | 4538 | 4642 |

THU MAR 14 17:46:30 1991 SUTFILE.HEX PAGE 12, LINE 650

| | | | | | | | | |
|---|---|---|---|---|---|---|---|---|
| 0000024220 | 3730 | 3042 | 3830 | 3942 | 0D39 | 3A0A | 3031 | 3439 |
| 0000024240 | 3243 | 3030 | 4238 | 4237 | 3030 | 4238 | 4438 | 4437 |
| 0000024260 | 3145 | 4337 | 4630 | 4237 | 3030 | 4338 | 3338 | 4438 |
| 0000024300 | 3238 | 4245 | 4630 | 0A0D | 313A | 3930 | 4434 | 3032 |
| 0000024320 | 4630 | 3730 | 3242 | 3735 | 4541 | 3930 | 3030 | 3030 |
| 0000024340 | 3132 | 4332 | 3441 | 3933 | 3030 | 3030 | 3130 | 3932 |
| 0000024360 | 4242 | 0D32 | 3A0A | 3031 | 3439 | 3245 | 3030 | 3143 |
| 0000024400 | 3039 | 3030 | 3030 | 3231 | 4439 | 3331 | 3230 | 4239 |
| 0000024420 | 4542 | 4237 | 3030 | 3039 | 3045 | 3831 | 4245 | 4531 |
| 0000024440 | 0A0D | 313A | 3930 | 4634 | 3032 | 4630 | 3030 | 3932 |
| 0000024460 | 4242 | 3745 | 3042 | 3930 | 4530 | 3130 | 4538 | 4642 |
| 0000024500 | 3030 | 3932 | 4242 | 3745 | 3042 | 3630 | 0D42 | 3A0A |
| 0000024520 | 3031 | 3539 | 3230 | 3030 | 3039 | 3045 | 3831 | 4245 |
| 0000024540 | 3046 | 4237 | 3030 | 4238 | 4238 | 4237 | 3030 | 4238 |
| 0000024560 | 4438 | 4437 | 3145 | 4337 | 3846 | 0A0D | 313A | 3930 |
| 0000024600 | 3135 | 3032 | 3030 | 3746 | 3042 | 3830 | 3843 | 3833 |
| 0000024620 | 3844 | 4532 | 4642 | 3730 | 4542 | 3732 | 3041 | 3846 |
| 0000024640 | 3841 | 3833 | 3442 | 0D38 | 3A0A | 3031 | 3539 | 3232 |
| 0000024660 | 3030 | 3238 | 3045 | 4246 | 4238 | 3530 | 4237 | 3535 |
| 0000024700 | 4445 | 4236 | 3036 | 3230 | 3038 | 4345 | 4437 | 3245 |
| 0000024720 | 4337 | 4237 | 0A0D | 313A | 3930 | 3335 | 3032 | 3030 |
| 0000024740 | 3746 | 3042 | 3830 | 3843 | 3833 | 3844 | 4532 | 4642 |
| 0000024760 | 3730 | 4644 | 3745 | 3043 | 3746 | 3042 | 3839 | 3943 |
| 0000025000 | 0D30 | 3A0A | 3031 | 3539 | 3234 | 3030 | 3338 | 4438 |
| 0000025020 | 3238 | 4245 | 3046 | 4237 | 3930 | 3039 | 3045 | 3432 |
| 0000025040 | 4245 | 3046 | 4237 | 3532 | 4137 | 3045 | 4642 | 0A0D |
| 0000025060 | 313A | 3930 | 3535 | 3032 | 3130 | 3832 | 3132 | 3043 |
| 0000025100 | 3832 | 3841 | 3833 | 3842 | 4532 | 4630 | 3742 | 4644 |
| 0000025120 | 3746 | 3043 | 3737 | 3242 | 4335 | 0D33 | 3A0A | 3031 |
| 0000025140 | 3539 | 3236 | 3030 | 4137 | 3045 | 4138 | 3338 | 4238 |
| 0000025160 | 3238 | 3045 | 4335 | 3046 | 4146 | 3341 | 3045 | 4435 |
| 0000025200 | 3046 | 4246 | 3039 | 3430 | 0A0D | 313A | 3930 | 3735 |
| 0000025220 | 3032 | 3030 | 3030 | 3130 | 3932 | 4342 | 3931 | 3030 |
| 0000025240 | 3030 | 3130 | 3932 | 3144 | 3033 | 3932 | 4242 | 3745 |
| 0000025260 | 3042 | 3530 | 0D33 | 3A0A | 3031 | 3539 | 3238 | 3030 |
| 0000025300 | 3039 | 3045 | 3831 | 4245 | 3046 | 4237 | 3030 | 4238 |
| 0000025320 | 4238 | 4237 | 3030 | 4238 | 4438 | 4437 | 3145 | 4337 |
| 0000025340 | 3837 | 0A0D | 313A | 3930 | 3935 | 3032 | 3030 | 3746 |
| 0000025360 | 3042 | 3830 | 3843 | 3833 | 3844 | 4532 | 4642 | 3730 |
| 0000025400 | 3242 | 3735 | 4541 | 3130 | 3832 | 3132 | 3943 | 0D43 |
| 0000025420 | 3A0A | 3031 | 3539 | 3241 | 3030 | 3230 | 4138 | 3338 |
| 0000025440 | 4238 | 3238 | 3045 | 4246 | 4437 | 4646 | 4337 | 3730 |
| 0000025460 | 4237 | 3532 | 4137 | 3045 | 4138 | 4633 | 0A0D | 313A |
| 0000025500 | 3930 | 4235 | 3032 | 3830 | 3833 | 3842 | 4532 | 3530 |
| 0000025520 | 4643 | 4630 | 4141 | 4533 | 3530 | 4644 | 4630 | 4342 |
| 0000025540 | 3932 | 4433 | 3932 | 3636 | 0D42 | 3A0A | 3031 | 3539 |
| 0000025560 | 3243 | 3030 | 3039 | 3030 | 3030 | 3231 | 4239 | 3143 |
| 0000025600 | 3039 | 3030 | 3030 | 3231 | 4439 | 3331 | 3230 | 4239 |
| 0000025620 | 4542 | 4237 | 3337 | 0A0D | 313A | 3930 | 4435 | 3032 |
| 0000025640 | 3030 | 3930 | 4530 | 3130 | 4538 | 4642 | 3730 | 3042 |
| 0000025660 | 3830 | 3842 | 3742 | 3042 | 3830 | 3842 | 3744 | 4544 |
| 0000025700 | 4131 | 0D34 | 3A0A | 3031 | 3539 | 3245 | 3030 | 4337 |
| 0000025720 | 4630 | 4237 | 3030 | 4338 | 3338 | 4438 | 3238 | 4245 |
| 0000025740 | 3046 | 4237 | 3532 | 4137 | 3045 | 3231 | 3238 | 4345 |
| 0000025760 | 0A0D | 313A | 3930 | 4635 | 3032 | 3130 | 3043 | 3832 |
| 0000026000 | 3841 | 3833 | 3842 | 4532 | 4630 | 3742 | 4644 | 3746 |
| 0000026020 | 3043 | 3737 | 3242 | 3735 | 4541 | 3530 | 0D44 | 3A0A |
| 0000026040 | 3031 | 3639 | 3230 | 3030 | 4138 | 3338 | 4238 | 3238 |
| 0000026060 | 3045 | 4335 | 3046 | 4146 | 3341 | 3045 | 4435 | 3046 |

THU MAR 14 17:46:30 1991 SUTFILE.HEX PAGE 13, LINE 709

| | | | | | | | | |
|---|---|---|---|---|---|---|---|---|
| 0000026100 | 4246 | 3244 | 3339 | 3244 | 3631 | 0A0D | 313A | 3930 |
| 0000026120 | 3136 | 3032 | 3930 | 3936 | 3030 | 3030 | 3130 | 3932 |
| 0000026140 | 4342 | 3931 | 3030 | 3030 | 3130 | 3932 | 3144 | 3033 |
| 0000026160 | 3932 | 4242 | 3045 | 0D37 | 3A0A | 3031 | 3639 | 3232 |
| 0000026200 | 3030 | 4237 | 3030 | 3039 | 3045 | 3831 | 4245 | 3046 |
| 0000026220 | 4237 | 3030 | 4238 | 4238 | 4237 | 3030 | 4238 | 4438 |
| 0000026240 | 4437 | 3942 | 0A0D | 313A | 3930 | 3336 | 3032 | 4530 |
| 0000026260 | 3731 | 3043 | 3746 | 3042 | 3830 | 3843 | 3833 | 3844 |
| 0000026300 | 4532 | 4642 | 3730 | 3242 | 3735 | 4541 | 3130 | 3332 |
| 0000026320 | 0D43 | 3A0A | 3031 | 3639 | 3234 | 3030 | 3238 | 4331 |
| 0000026340 | 3230 | 4138 | 3338 | 4238 | 3238 | 3045 | 4246 | 4437 |
| 0000026360 | 4646 | 4337 | 3730 | 4237 | 3532 | 4137 | 4136 | 0A0D |
| 0000026400 | 313A | 3930 | 3536 | 3032 | 4530 | 3830 | 3841 | 3833 |
| 0000026420 | 3842 | 4532 | 3530 | 4643 | 4630 | 4141 | 4533 | 3530 |
| 0000026440 | 4644 | 4630 | 3742 | 3144 | 3832 | 0D45 | 3A0A | 3031 |
| 0000026460 | 3639 | 3236 | 3030 | 4337 | 3032 | 4237 | 3630 | 4338 |
| 0000026500 | 3338 | 4438 | 3238 | 4245 | 3046 | 4237 | 3630 | 3039 |
| 0000026520 | 3045 | 4430 | 4245 | 3946 | 0A0D | 313A | 3930 | 3736 |
| 0000026540 | 3032 | 4630 | 3930 | 3030 | 3030 | 3130 | 3932 | 4342 |
| 0000026560 | 3931 | 3030 | 3030 | 3130 | 3932 | 3144 | 3033 | 3932 |
| 0000026600 | 4242 | 3445 | 0D44 | 3A0A | 3031 | 3639 | 3238 | 3030 |
| 0000026620 | 4237 | 3030 | 3039 | 3045 | 3831 | 4245 | 3046 | 4237 |
| 0000026640 | 3030 | 4238 | 4238 | 4237 | 3030 | 4238 | 4438 | 4437 |
| 0000026660 | 3935 | 0A0D | 313A | 3930 | 3936 | 3032 | 4530 | 3731 |
| 0000026700 | 3043 | 3746 | 3042 | 3830 | 3843 | 3833 | 3844 | 4532 |
| 0000026720 | 4642 | 3730 | 3242 | 3735 | 4541 | 3130 | 4432 | 0D43 |
| 0000026740 | 3A0A | 3031 | 3639 | 3241 | 3030 | 3238 | 4331 | 3230 |
| 0000026760 | 4138 | 3338 | 4238 | 3238 | 3045 | 4246 | 4437 | 4646 |
| 0000027000 | 4337 | 3730 | 4237 | 3532 | 4137 | 4130 | 0A0D | 313A |
| 0000027020 | 3930 | 4236 | 3032 | 4530 | 3830 | 3841 | 3833 | 3842 |
| 0000027040 | 4532 | 3530 | 4643 | 4630 | 4141 | 4533 | 3530 | 4644 |
| 0000027060 | 4630 | 3742 | 3044 | 3332 | 0D45 | 3A0A | 3031 | 3639 |
| 0000027100 | 3243 | 3030 | 4337 | 3032 | 4237 | 3530 | 4338 | 3338 |
| 0000027120 | 4438 | 3238 | 4245 | 3046 | 4437 | 3231 | 4337 | 3032 |
| 0000027140 | 4237 | 3530 | 3844 | 0A0D | 313A | 3930 | 4436 | 3032 |
| 0000027160 | 3830 | 3843 | 3833 | 3844 | 4532 | 4642 | 3730 | 3042 |
| 0000027200 | 3935 | 4530 | 3030 | 4544 | 4642 | 3930 | 3030 | 3030 |
| 0000027220 | 3230 | 0D37 | 3A0A | 3031 | 3639 | 3245 | 3030 | 3231 |
| 0000027240 | 4239 | 3143 | 3039 | 3030 | 3030 | 3231 | 4439 | 3331 |
| 0000027260 | 3230 | 4239 | 4542 | 4237 | 3030 | 3039 | 3045 | 3237 |
| 0000027300 | 0A0D | 313A | 3930 | 4636 | 3032 | 3130 | 4538 | 4642 |
| 0000027320 | 3730 | 3042 | 3830 | 3842 | 3742 | 3042 | 3830 | 3842 |
| 0000027340 | 3744 | 4544 | 3731 | 3043 | 3746 | 4542 | 0D44 | 3A0A |
| 0000027360 | 3031 | 3739 | 3230 | 3030 | 3030 | 4338 | 3338 | 4438 |
| 0000027400 | 3238 | 4245 | 3046 | 4237 | 3532 | 4137 | 3045 | 3231 |
| 0000027420 | 3238 | 4331 | 3230 | 4138 | 3832 | 0A0D | 313A | 3930 |
| 0000027440 | 3137 | 3032 | 3830 | 3833 | 3842 | 4532 | 4630 | 3742 |
| 0000027460 | 4644 | 3746 | 3043 | 3737 | 3242 | 3735 | 4541 | 3830 |
| 0000027500 | 3841 | 3833 | 3442 | 0D42 | 3A0A | 3031 | 3739 | 3232 |
| 0000027520 | 3030 | 3238 | 3045 | 4335 | 3046 | 4146 | 3341 | 3045 |
| 0000027540 | 4435 | 3046 | 4246 | 3039 | 3845 | 3433 | 3045 | 4446 |
| 0000027560 | 4237 | 3043 | 0A0D | 313A | 3930 | 3337 | 3032 | 3030 |
| 0000027600 | 4534 | 3644 | 3642 | 3030 | 3732 | 4634 | 3046 | 3634 |
| 0000027620 | 3430 | 3731 | 4542 | 3732 | 3041 | 3846 | 3841 | 3533 |
| 0000027640 | 0D45 | 3A0A | 3031 | 3739 | 3234 | 3030 | 4238 | 3238 |
| 0000027660 | 3045 | 4246 | 4238 | 3530 | 4237 | 3535 | 4445 | 4236 |
| 0000027700 | 3036 | 3230 | 3038 | 4345 | 4437 | 3245 | 4134 | 0A0D |
| 0000027720 | 313A | 3930 | 3537 | 3032 | 3730 | 3043 | 3746 | 3042 |
| 0000027740 | 3830 | 3843 | 3833 | 3844 | 4532 | 4642 | 3730 | 4644 |

THU MAR 14 17:46:30 1991 SUTFILE.HEX PAGE 14, LINE 768

| | | | | | | | | |
|---|---|---|---|---|---|---|---|---|
| 0000027760 | 3746 | 3043 | 3746 | 3042 | 3830 | 0D36 | 3A0A | 3031 |
| 0000030000 | 3739 | 3236 | 3030 | 4338 | 3338 | 4438 | 3238 | 4245 |
| 0000030020 | 3046 | 4437 | 4546 | 4337 | 4630 | 4237 | 4230 | 4338 |
| 0000030040 | 3338 | 4438 | 3238 | 3435 | 0A0D | 313A | 3930 | 3737 |
| 0000030060 | 3032 | 4530 | 4642 | 3730 | 3042 | 3942 | 4530 | 3230 |
| 0000030100 | 4534 | 4642 | 3830 | 3030 | 3741 | 3042 | 3731 | 3041 |
| 0000030120 | 3930 | 3030 | 0D37 | 3A0A | 3031 | 3739 | 3238 | 3030 |
| 0000030140 | 3030 | 3230 | 3231 | 4341 | 4544 | 3039 | 3030 | 3030 |
| 0000030160 | 3231 | 4239 | 3143 | 3039 | 3030 | 3030 | 3231 | 4439 |
| 0000030200 | 4346 | 0A0D | 313A | 3930 | 3937 | 3032 | 3130 | 3033 |
| 0000030220 | 3932 | 4242 | 3745 | 3042 | 3930 | 4530 | 3130 | 4538 |
| 0000030240 | 4642 | 3730 | 3042 | 3830 | 3842 | 3742 | 3642 | 0D46 |
| 0000030260 | 3A0A | 3031 | 3739 | 3241 | 3030 | 3030 | 4238 | 4438 |
| 0000030300 | 4437 | 3145 | 4337 | 4630 | 4237 | 3030 | 4338 | 3338 |
| 0000030320 | 4438 | 3238 | 4245 | 3046 | 3039 | 3242 | 0A0D | 313A |
| 0000030340 | 3930 | 4237 | 3032 | 4530 | 3338 | 4534 | 4630 | 3744 |
| 0000030360 | 3042 | 4534 | 3644 | 3642 | 3030 | 3732 | 4634 | 3046 |
| 0000030400 | 3634 | 3530 | 3738 | 4342 | 0D42 | 3A0A | 3031 | 3739 |
| 0000030420 | 3243 | 3030 | 3532 | 4137 | 3045 | 3231 | 3238 | 4331 |
| 0000030440 | 3230 | 4138 | 3338 | 4238 | 3238 | 3045 | 4246 | 4437 |
| 0000030460 | 4646 | 4337 | 3937 | 0A0D | 313A | 3930 | 4437 | 3032 |
| 0000030500 | 3030 | 3737 | 3242 | 3735 | 4541 | 3830 | 3841 | 3833 |
| 0000030520 | 3842 | 4532 | 3530 | 4643 | 4630 | 4141 | 4533 | 3530 |
| 0000030540 | 3644 | 0D36 | 3A0A | 3031 | 3739 | 3245 | 3030 | 3046 |
| 0000030560 | 4246 | 4237 | 3245 | 4137 | 4630 | 4138 | 3338 | 4238 |
| 0000030600 | 3238 | 3045 | 4246 | 4238 | 3530 | 4237 | 3535 | 3135 |
| 0000030620 | 0A0D | 313A | 3930 | 4637 | 3032 | 4530 | 3644 | 3642 |
| 0000030640 | 3030 | 3832 | 4530 | 3743 | 4544 | 3732 | 3043 | 3746 |
| 0000030660 | 3042 | 3830 | 3843 | 3833 | 3844 | 4232 | 0D45 | 3A0A |
| 0000030700 | 3031 | 3839 | 3230 | 3030 | 4245 | 3046 | 4437 | 4546 |
| 0000030720 | 4337 | 4630 | 4237 | 4330 | 4338 | 3338 | 4438 | 3238 |
| 0000030740 | 4245 | 3046 | 4237 | 4330 | 4536 | 0A0D | 313A | 3930 |
| 0000030760 | 3138 | 3032 | 3930 | 4530 | 3230 | 4534 | 4642 | 3830 |
| 0000031000 | 3330 | 3737 | 3144 | 3732 | 3243 | 3730 | 3042 | 3835 |
| 0000031020 | 3843 | 3833 | 4444 | 0D39 | 3A0A | 3031 | 3839 | 3232 |
| 0000031040 | 3030 | 3238 | 4245 | 3046 | 4237 | 3532 | 4137 | 3045 |
| 0000031060 | 3231 | 3238 | 4331 | 3230 | 4138 | 3338 | 4238 | 3238 |
| 0000031100 | 3045 | 3333 | 0A0D | 313A | 3930 | 3338 | 3032 | 4630 |
| 0000031120 | 3742 | 3041 | 3930 | 3030 | 3030 | 3132 | 4132 | 3044 |
| 0000031140 | 3734 | 4644 | 3746 | 3043 | 3737 | 3242 | 3735 | 3441 |
| 0000031160 | 0D33 | 3A0A | 3031 | 3839 | 3234 | 3030 | 3045 | 4138 |
| 0000031200 | 3338 | 4238 | 3238 | 3045 | 4335 | 3046 | 4146 | 3341 |
| 0000031220 | 3045 | 4435 | 3046 | 4246 | 3039 | 3030 | 4239 | 0A0D |
| 0000031240 | 313A | 3930 | 3538 | 3032 | 3030 | 3130 | 3932 | 4342 |
| 0000031260 | 3931 | 3030 | 3030 | 3130 | 3932 | 3144 | 3033 | 3932 |
| 0000031300 | 4242 | 3745 | 3042 | 3930 | 4530 | 0D30 | 3A0A | 3031 |
| 0000031320 | 3839 | 3236 | 3030 | 3045 | 3831 | 4245 | 3046 | 4237 |
| 0000031340 | 3030 | 4238 | 4238 | 4237 | 3030 | 4238 | 4438 | 4437 |
| 0000031360 | 3145 | 4337 | 4630 | 3631 | 0A0D | 313A | 3930 | 3738 |
| 0000031400 | 3032 | 3730 | 3042 | 3830 | 3843 | 3833 | 3844 | 4532 |
| 0000031420 | 4642 | 3730 | 3242 | 3735 | 4541 | 3130 | 3832 | 3132 |
| 0000031440 | 3043 | 4332 | 0D36 | 3A0A | 3031 | 3839 | 3238 | 3030 |
| 0000031460 | 4138 | 3338 | 4238 | 3238 | 3045 | 4246 | 4437 | 4646 |
| 0000031500 | 4337 | 3730 | 4237 | 3532 | 4137 | 3045 | 4138 | 3338 |
| 0000031520 | 4244 | 0A0D | 313A | 3930 | 3938 | 3032 | 3830 | 3842 |
| 0000031540 | 4532 | 3530 | 4643 | 4630 | 4141 | 4533 | 3530 | 4644 |
| 0000031560 | 4630 | 3942 | 4530 | 3230 | 4542 | 4630 | 3543 | 0D31 |
| 0000031600 | 3A0A | 3031 | 3839 | 3241 | 3030 | 3341 | 3045 | 4446 |
| 0000031620 | 4237 | 3030 | 4137 | 3030 | 3231 | 3038 | 4538 | 3037 |

THU MAR 14 17:46:30 1991 SUTFILE.HEX PAGE 15, LINE 827

| | | | | | | | | |
|---|---|---|---|---|---|---|---|---|
| 0000031640 | 3330 | 3230 | 3939 | 4336 | 4237 | 4332 | 0A0D | 313A |
| 0000031660 | 3930 | 4238 | 3032 | 3030 | 3730 | 3041 | 3930 | 4530 |
| 0000031700 | 3230 | 4539 | 4641 | 4530 | 4142 | 4633 | 3730 | 3242 |
| 0000031720 | 3744 | 4541 | 3930 | 4130 | 0D39 | 3A0A | 3031 | 3839 |
| 0000031740 | 3243 | 3030 | 3845 | 4432 | 4145 | 3046 | 4245 | 3341 |
| 0000031760 | 3046 | 4237 | 3030 | 4137 | 3030 | 3437 | 3430 | 4632 |
| 0000032000 | 3546 | 3238 | 3631 | 0A0D | 313A | 3930 | 4438 | 3032 |
| 0000032020 | 4530 | 3334 | 4645 | 3835 | 4533 | 4641 | 4530 | 4142 |
| 0000032040 | 4633 | 3730 | 3034 | 3234 | 4646 | 3835 | 4532 | 3334 |
| 0000032060 | 3545 | 0D34 | 3A0A | 3031 | 3839 | 3245 | 3030 | 3546 |
| 0000032100 | 3338 | 3045 | 4346 | 3341 | 3045 | 4446 | 3039 | 3045 |
| 0000032120 | 4232 | 3045 | 4146 | 3341 | 3045 | 4246 | 3231 | 4439 |
| 0000032140 | 0A0D | 313A | 3930 | 4638 | 3032 | 3830 | 4330 | 3634 |
| 0000032160 | 3230 | 3744 | 3242 | 3739 | 4541 | 3130 | 3832 | 3132 |
| 0000032200 | 3043 | 3832 | 3042 | 3835 | 3041 | 4334 | 0D37 | 3A0A |
| 0000032220 | 3031 | 3939 | 3230 | 3030 | 4237 | 4432 | 4137 | 3845 |
| 0000032240 | 3231 | 3238 | 4331 | 3230 | 4138 | 3338 | 4238 | 3238 |
| 0000032260 | 3045 | 4246 | 4338 | 3338 | 3539 | 0A0D | 313A | 3930 |
| 0000032300 | 3139 | 3032 | 3830 | 3844 | 4532 | 4642 | 3730 | 3034 |
| 0000032320 | 3234 | 4646 | 4542 | 3334 | 4645 | 3141 | 3832 | 3132 |
| 0000032340 | 3043 | 3832 | 3630 | 0D42 | 3A0A | 3031 | 3939 | 3232 |
| 0000032360 | 3030 | 3842 | 4437 | 4345 | 4337 | 4630 | 3039 | 3045 |
| 0000032400 | 4232 | 3045 | 4146 | 3341 | 3045 | 4246 | 3231 | 3538 |
| 0000032420 | 3944 | 3632 | 0A0D | 313A | 3930 | 3339 | 3032 | 3830 |
| 0000032440 | 3042 | 3735 | 4642 | 4546 | 3542 | 4644 | 3142 | 3832 |
| 0000032460 | 4535 | 3845 | 3843 | 3833 | 3844 | 4532 | 4642 | 3530 |
| 0000032500 | 0D41 | 3A0A | 3031 | 3939 | 3234 | 3030 | 4437 | 4445 |
| 0000032520 | 4337 | 4630 | 3039 | 3045 | 4232 | 3045 | 4146 | 3341 |
| 0000032540 | 3045 | 4246 | 3231 | 3538 | 3944 | 4238 | 3233 | 0A0D |
| 0000032560 | 313A | 3930 | 3539 | 3032 | 3030 | 3835 | 3041 | 3734 |
| 0000032600 | 3042 | 3138 | 3832 | 3932 | 3145 | 3832 | 4535 | 3845 |
| 0000032620 | 3843 | 3833 | 3844 | 4532 | 3242 | 0D46 | 3A0A | 3031 |
| 0000032640 | 3939 | 3236 | 3030 | 3046 | 4237 | 4646 | 3039 | 3045 |
| 0000032660 | 4330 | 4245 | 3046 | 3038 | 4631 | 4437 | 4345 | 4337 |
| 0000032700 | 4630 | 4237 | 3030 | 3632 | 0A0D | 313A | 3930 | 3739 |
| 0000032720 | 3032 | 3830 | 3843 | 3833 | 3844 | 4532 | 4642 | 3730 |
| 0000032740 | 4544 | 3744 | 3043 | 3746 | 3042 | 3830 | 3843 | 3833 |
| 0000032760 | 3844 | 3532 | 0D45 | 3A0A | 3031 | 3939 | 3238 | 3030 |
| 0000033000 | 4245 | 3046 | 4237 | 3030 | 3039 | 3045 | 4330 | 4245 |
| 0000033020 | 3046 | 4437 | 4545 | 4337 | 4630 | 4237 | 3030 | 4338 |
| 0000033040 | 4232 | 0A0D | 313A | 3930 | 3939 | 3032 | 3830 | 3833 |
| 0000033060 | 3844 | 4532 | 4642 | 3730 | 4544 | 3746 | 3043 | 3746 |
| 0000033100 | 3042 | 3830 | 3843 | 3833 | 3844 | 4532 | 4442 | 0D44 |
| 0000033120 | 3A0A | 3031 | 3939 | 3241 | 3030 | 3046 | 4237 | 3030 |
| 0000033140 | 4137 | 3030 | 3039 | 3045 | 3532 | 4145 | 3046 | 4245 |
| 0000033160 | 3341 | 3046 | 4237 | 4646 | 3039 | 3944 | 0A0D | 313A |
| 0000033200 | 3930 | 4239 | 3032 | 4530 | 3130 | 4531 | 4642 | 3030 |
| 0000033220 | 3932 | 4242 | 3745 | 3042 | 3930 | 4530 | 3130 | 4538 |
| 0000033240 | 4642 | 3730 | 3042 | 3230 | 0D35 | 3A0A | 3031 | 3939 |
| 0000033260 | 3243 | 3030 | 4238 | 4238 | 4237 | 3030 | 4238 | 4438 |
| 0000033300 | 4437 | 3145 | 4337 | 4630 | 4237 | 3030 | 4338 | 3338 |
| 0000033320 | 4438 | 3238 | 4136 | 0A0D | 313A | 3930 | 4439 | 3032 |
| 0000033340 | 4530 | 4642 | 3730 | 3242 | 3735 | 4541 | 3130 | 3832 |
| 0000033360 | 3132 | 3043 | 3832 | 3841 | 3833 | 3842 | 4532 | 4630 |
| 0000033400 | 3042 | 0D39 | 3A0A | 3031 | 3939 | 3245 | 3030 | 3039 |
| 0000033420 | 3045 | 3431 | 4245 | 3046 | 4437 | 4646 | 4337 | 3730 |
| 0000033440 | 4237 | 3532 | 4137 | 3045 | 4138 | 3338 | 4238 | 3538 |
| 0000033460 | 0A0D | 313A | 3930 | 4639 | 3032 | 3830 | 4532 | 3530 |
| 0000033500 | 4643 | 4630 | 4141 | 4533 | 3530 | 4644 | 4630 | 3742 |

THU MAR 14 17:46:30 1991 SUTFILE.HEX PAGE 16, LINE 886

| | | | | | | | | |
|---|---|---|---|---|---|---|---|---|
| 0000033520 | 3244 | 3732 | 3243 | 3730 | 3042 | 3330 | 0D43 | 3A0A |
| 0000033540 | 3031 | 4139 | 3230 | 3030 | 4338 | 3338 | 4438 | 3238 |
| 0000033560 | 4245 | 3046 | 4437 | 3232 | 4337 | 3032 | 3039 | 3045 |
| 0000033600 | 3431 | 3045 | 4246 | 4338 | 3533 | 0A0D | 313A | 3930 |
| 0000033620 | 3141 | 3032 | 3830 | 3833 | 3844 | 4532 | 4642 | 3730 |
| 0000033640 | 4542 | 3732 | 3041 | 3846 | 3841 | 3833 | 3842 | 4532 |
| 0000033660 | 4630 | 3842 | 3742 | 0D31 | 3A0A | 3031 | 4139 | 3232 |
| 0000033700 | 3030 | 3530 | 4237 | 3535 | 4445 | 4236 | 3036 | 3230 |
| 0000033720 | 3038 | 4345 | 4437 | 3245 | 4337 | 4630 | 4237 | 3030 |
| 0000033740 | 4338 | 3834 | 0A0D | 313A | 3930 | 3341 | 3032 | 3830 |
| 0000033760 | 3833 | 3844 | 4532 | 4642 | 3730 | 4644 | 3745 | 3043 |
| 0000034000 | 3746 | 3042 | 3841 | 3843 | 3833 | 3844 | 4532 | 3242 |
| 0000034020 | 0D33 | 3A0A | 3031 | 4139 | 3234 | 3030 | 3046 | 4237 |
| 0000034040 | 4130 | 3039 | 3045 | 3432 | 4245 | 3046 | 3039 | 3030 |
| 0000034060 | 3030 | 3231 | 4239 | 3143 | 3039 | 3030 | 3241 | 0A0D |
| 0000034100 | 313A | 3930 | 3541 | 3032 | 3030 | 3130 | 3932 | 3144 |
| 0000034120 | 3033 | 3932 | 4242 | 3745 | 3042 | 3930 | 4530 | 3130 |
| 0000034140 | 4538 | 4642 | 3730 | 3042 | 3830 | 0D45 | 3A0A | 3031 |
| 0000034160 | 4139 | 3236 | 3030 | 4238 | 4238 | 4237 | 3030 | 4238 |
| 0000034200 | 4438 | 4437 | 3145 | 4337 | 4630 | 4237 | 3030 | 4338 |
| 0000034220 | 3338 | 4438 | 3238 | 3943 | 0A0D | 313A | 3930 | 3741 |
| 0000034240 | 3032 | 4530 | 4642 | 3730 | 3242 | 3735 | 4541 | 3130 |
| 0000034260 | 3832 | 3132 | 3043 | 3832 | 3841 | 3833 | 3842 | 4532 |
| 0000034300 | 4630 | 3642 | 0D38 | 3A0A | 3031 | 4139 | 3238 | 3030 |
| 0000034320 | 3039 | 3045 | 3331 | 4245 | 3046 | 4437 | 4646 | 4337 |
| 0000034340 | 3730 | 4237 | 3532 | 4137 | 3045 | 4138 | 3338 | 4238 |
| 0000034360 | 3545 | 0A0D | 313A | 3930 | 3941 | 3032 | 3830 | 4532 |
| 0000034400 | 3530 | 4643 | 4630 | 4141 | 4533 | 3530 | 4644 | 4630 |
| 0000034420 | 3742 | 4542 | 3732 | 3041 | 3846 | 3841 | 3533 | 0D45 |
| 0000034440 | 3A0A | 3031 | 4139 | 3241 | 3030 | 4238 | 3238 | 3045 |
| 0000034460 | 4246 | 4238 | 3530 | 4237 | 3535 | 4445 | 4236 | 3036 |
| 0000034500 | 3230 | 3038 | 4345 | 4437 | 3245 | 3745 | 0A0D | 313A |
| 0000034520 | 3930 | 4241 | 3032 | 3730 | 3043 | 3746 | 3042 | 3830 |
| 0000034540 | 3843 | 3833 | 3844 | 4532 | 4642 | 3730 | 4644 | 3745 |
| 0000034560 | 3043 | 3746 | 3042 | 3141 | 0D41 | 3A0A | 3031 | 4139 |
| 0000034600 | 3243 | 3030 | 4338 | 3338 | 4438 | 3238 | 4245 | 3046 |
| 0000034620 | 4237 | 4130 | 3039 | 3045 | 3432 | 4245 | 3046 | 3039 |
| 0000034640 | 3030 | 3030 | 3731 | 0A0D | 313A | 3930 | 4441 | 3032 |
| 0000034660 | 3130 | 3932 | 4342 | 3931 | 3030 | 3030 | 3130 | 3932 |
| 0000034700 | 3144 | 3033 | 3932 | 4242 | 3745 | 3042 | 3930 | 4530 |
| 0000034720 | 3730 | 0D45 | 3A0A | 3031 | 4139 | 3245 | 3030 | 3831 |
| 0000034740 | 4245 | 3046 | 4237 | 3030 | 4238 | 4238 | 4237 | 3030 |
| 0000034760 | 4238 | 4438 | 4437 | 3145 | 4337 | 4630 | 4237 | 3946 |
| 0000035000 | 0A0D | 313A | 3930 | 4641 | 3032 | 3030 | 3830 | 3843 |
| 0000035020 | 3833 | 3844 | 4532 | 4642 | 3730 | 3242 | 3735 | 4541 |
| 0000035040 | 3130 | 3832 | 3132 | 3043 | 3832 | 3341 | 0D35 | 3A0A |
| 0000035060 | 3031 | 4239 | 3230 | 3030 | 3338 | 4238 | 3238 | 3045 |
| 0000035100 | 4246 | 3039 | 3845 | 3433 | 4245 | 3046 | 4437 | 4646 |
| 0000035120 | 4337 | 3730 | 4237 | 3532 | 3243 | 0A0D | 313A | 3930 |
| 0000035140 | 3142 | 3032 | 3730 | 4541 | 3830 | 3841 | 3833 | 3842 |
| 0000035160 | 4532 | 3530 | 4643 | 4630 | 4141 | 4533 | 3530 | 4644 |
| 0000035200 | 4630 | 4442 | 3032 | 0D43 | 3A0A | 3031 | 4239 | 3232 |
| 0000035220 | 3030 | 3039 | 3243 | 3039 | 3039 | 3030 | 3030 | 3231 |
| 0000035240 | 4641 | 3535 | 3039 | 3030 | 3030 | 3231 | 3141 | 4235 |
| 0000035260 | 4237 | 3239 | 0A0D | 313A | 3930 | 3342 | 3032 | 4530 |
| 0000035300 | 3732 | 3041 | 3846 | 3841 | 3833 | 3842 | 4532 | 4630 |
| 0000035320 | 3842 | 3042 | 3735 | 3542 | 4535 | 3644 | 3642 | 4130 |
| 0000035340 | 0D42 | 3A0A | 3031 | 4239 | 3234 | 3030 | 3230 | 3038 |
| 0000035360 | 4345 | 4437 | 3245 | 4337 | 4630 | 4237 | 3030 | 4338 |

THU MAR 14 17:46:30 1991 SUTFILE.HEX PAGE 17, LINE 945

| | | | | | | | | |
|---|---|---|---|---|---|---|---|---|
| 0000035400 | 3338 | 4438 | 3238 | 4245 | 3046 | 4437 | 4143 | 0A0D |
| 0000035420 | 313A | 3930 | 3542 | 3032 | 4630 | 3745 | 3043 | 3746 |
| 0000035440 | 3042 | 3841 | 3843 | 3833 | 3844 | 4532 | 4642 | 3730 |
| 0000035460 | 3042 | 3941 | 4530 | 3230 | 4534 | 0D33 | 3A0A | 3031 |
| 0000035500 | 4239 | 3236 | 3030 | 4245 | 3046 | 3039 | 3030 | 3030 |
| 0000035520 | 3231 | 4239 | 3143 | 3039 | 3030 | 3030 | 3231 | 4439 |
| 0000035540 | 3331 | 3038 | 4334 | 4346 | 0A0D | 313A | 3930 | 3742 |
| 0000035560 | 3032 | 3930 | 4530 | 3030 | 4530 | 3630 | 3330 | 3735 |
| 0000035600 | 4542 | 3732 | 3041 | 3846 | 3841 | 3833 | 3842 | 4532 |
| 0000035620 | 4630 | 3242 | 0D33 | 3A0A | 3031 | 4239 | 3238 | 3030 |
| 0000035640 | 4238 | 3530 | 4237 | 3535 | 4445 | 4236 | 3036 | 3230 |
| 0000035660 | 3038 | 4345 | 4437 | 3245 | 4337 | 4630 | 4237 | 3030 |
| 0000035700 | 3845 | 0A0D | 313A | 3930 | 3942 | 3032 | 3830 | 3843 |
| 0000035720 | 3833 | 3844 | 4532 | 4642 | 3730 | 4644 | 3745 | 3043 |
| 0000035740 | 3746 | 3042 | 3837 | 3843 | 3833 | 3844 | 3232 | 0D34 |
| 0000035760 | 3A0A | 3031 | 4239 | 3241 | 3030 | 4245 | 3046 | 4237 |
| 0000036000 | 4646 | 3039 | 3045 | 4530 | 4245 | 3046 | 3038 | 4630 |
| 0000036020 | 4237 | 4646 | 3039 | 3045 | 3030 | 4338 | 0A0D | 313A |
| 0000036040 | 3930 | 4242 | 3032 | 4530 | 4642 | 3730 | 3242 | 3735 |
| 0000036060 | 4541 | 3130 | 3832 | 3232 | 3032 | 3832 | 3030 | 3030 |
| 0000036100 | 3832 | 3935 | 4538 | 3934 | 0D33 | 3A0A | 3031 | 4239 |
| 0000036120 | 3243 | 3030 | 3837 | 3030 | 3937 | 3530 | 3231 | 3538 |
| 0000036140 | 3934 | 3039 | 3045 | 3532 | 3045 | 4346 | 3341 | 3045 |
| 0000036160 | 4446 | 4237 | 3135 | 0A0D | 313A | 3930 | 4442 | 3032 |
| 0000036200 | 3030 | 3138 | 3832 | 3932 | 3745 | 3034 | 3234 | 4646 |
| 0000036220 | 3835 | 4532 | 3334 | 4645 | 3835 | 4533 | 4642 | 3730 |
| 0000036240 | 3344 | 0D39 | 3A0A | 3031 | 4239 | 3245 | 3030 | 4545 |
| 0000036260 | 4337 | 4630 | 3039 | 3045 | 3532 | 3045 | 4146 | 3341 |
| 0000036300 | 3045 | 4246 | 3231 | 3538 | 3944 | 4238 | 3530 | 4430 |
| 0000036320 | 0A0D | 313A | 3930 | 4642 | 3032 | 3730 | 4642 | 4546 |
| 0000036340 | 3542 | 4644 | 3142 | 3832 | 4535 | 3845 | 3843 | 3833 |
| 0000036360 | 3844 | 4532 | 4642 | 3730 | 4544 | 4246 | 0D43 | 3A0A |
| 0000036400 | 3031 | 4339 | 3230 | 3030 | 4337 | 4630 | 3437 | 3430 |
| 0000036420 | 4632 | 3546 | 3238 | 3445 | 4533 | 3546 | 3338 | 3045 |
| 0000036440 | 4246 | 4338 | 3338 | 4438 | 3839 | 0A0D | 313A | 3930 |
| 0000036460 | 3143 | 3032 | 3830 | 4532 | 4642 | 3730 | 4544 | 3745 |
| 0000036500 | 3043 | 3946 | 4530 | 3230 | 4535 | 4630 | 4141 | 4533 |
| 0000036520 | 4630 | 3142 | 4632 | 0D30 | 3A0A | 3031 | 4339 | 3232 |
| 0000036540 | 3030 | 3538 | 3944 | 4238 | 3530 | 4237 | 4646 | 4245 |
| 0000036560 | 4435 | 4246 | 3231 | 3538 | 4545 | 4338 | 3338 | 4438 |
| 0000036600 | 3238 | 3445 | 0A0D | 313A | 3930 | 3343 | 3032 | 4530 |
| 0000036620 | 4642 | 3730 | 4544 | 3746 | 3043 | 3746 | 3034 | 3234 |
| 0000036640 | 4646 | 3835 | 4532 | 3334 | 4645 | 3835 | 4533 | 4230 |
| 0000036660 | 0D38 | 3A0A | 3031 | 4339 | 3234 | 3030 | 4246 | 4338 |
| 0000036700 | 3338 | 4438 | 3238 | 4245 | 3046 | 3230 | 3538 | 3839 |
| 0000036720 | 3445 | 3837 | 3030 | 3937 | 3430 | 3231 | 3431 | 0A0D |
| 0000036740 | 313A | 3930 | 3543 | 3032 | 3830 | 3435 | 3939 | 4530 |
| 0000036760 | 3030 | 4541 | 4630 | 4141 | 4533 | 4630 | 3042 | 3832 |
| 0000037000 | 3935 | 3738 | 3034 | 3732 | 3538 | 0D35 | 3A0A | 3031 |
| 0000037020 | 4339 | 3236 | 3030 | 3030 | 3937 | 3530 | 3231 | 3538 |
| 0000037040 | 3934 | 3437 | 3530 | 4632 | 3546 | 3238 | 3445 | 4533 |
| 0000037060 | 3546 | 3338 | 3045 | 4246 | 0A0D | 313A | 3930 | 3743 |
| 0000037100 | 3032 | 4630 | 4141 | 4533 | 4630 | 3942 | 4530 | 3030 |
| 0000037120 | 4541 | 4641 | 4530 | 4142 | 4633 | 3730 | 3034 | 3235 |
| 0000037140 | 4646 | 4635 | 0D42 | 3A0A | 3031 | 4339 | 3238 | 3030 |
| 0000037160 | 3238 | 3445 | 4533 | 3546 | 3338 | 3045 | 4346 | 3341 |
| 0000037200 | 3045 | 4446 | 4237 | 3830 | 3231 | 3238 | 4539 | 3437 |
| 0000037220 | 3133 | 0A0D | 313A | 3930 | 3943 | 3032 | 3030 | 3234 |
| 0000037240 | 4646 | 3835 | 4532 | 3334 | 4645 | 3835 | 4533 | 4642 |

THU MAR 14 17:46:30 1991 SUTFILE.HEX PAGE 18, LINE 1004

| | | | | | | | | |
|---|---|---|---|---|---|---|---|---|
| 0000037260 | 3730 | 4644 | 3730 | 3043 | 3746 | 3034 | 3335 | 0D32 |
| 0000037300 | 3A0A | 3031 | 4339 | 3241 | 3030 | 4632 | 3546 | 3238 |
| 0000037320 | 3445 | 4533 | 3546 | 3338 | 3045 | 4146 | 3341 | 3045 |
| 0000037340 | 4246 | 3231 | 3538 | 3944 | 4238 | 4631 | 0A0D | 313A |
| 0000037360 | 3930 | 4243 | 3032 | 3030 | 3735 | 4642 | 4546 | 3542 |
| 0000037400 | 4644 | 3142 | 3832 | 4535 | 3845 | 3843 | 3833 | 3844 |
| 0000037420 | 4532 | 4642 | 3730 | 4544 | 0D35 | 3A0A | 3031 | 4339 |
| 0000037440 | 3243 | 3030 | 3146 | 4337 | 4630 | 3437 | 3430 | 4632 |
| 0000037460 | 3546 | 3238 | 3445 | 4533 | 3546 | 3338 | 3045 | 4246 |
| 0000037500 | 4338 | 3338 | 3437 | 0A0D | 313A | 3930 | 4443 | 3032 |
| 0000037520 | 3830 | 3844 | 4532 | 4642 | 3730 | 4644 | 3730 | 3043 |
| 0000037540 | 3746 | 3034 | 3235 | 4646 | 3835 | 4532 | 3334 | 4645 |
| 0000037560 | 3635 | 0D41 | 3A0A | 3031 | 4339 | 3245 | 3030 | 3338 |
| 0000037600 | 3045 | 4146 | 3341 | 3045 | 4246 | 3231 | 3538 | 3944 |
| 0000037620 | 4238 | 3530 | 4237 | 4646 | 4245 | 4435 | 4246 | 4144 |
| 0000037640 | 0A0D | 313A | 3930 | 4643 | 3032 | 3130 | 3832 | 4535 |
| 0000037660 | 3845 | 3843 | 3833 | 3844 | 4532 | 4642 | 3730 | 4644 |
| 0000037700 | 3731 | 3043 | 3746 | 3034 | 3234 | 3446 | 0D34 | 3A0A |
| 0000037720 | 3031 | 4439 | 3230 | 3030 | 3546 | 3238 | 3445 | 4533 |
| 0000037740 | 3546 | 3338 | 3045 | 4246 | 4338 | 3338 | 4438 | 3238 |
| 0000037760 | 4245 | 3046 | 3230 | 3538 | 3545 | 0A0D | 313A | 3930 |
| 0000040000 | 3144 | 3032 | 3930 | 4538 | 3734 | 3038 | 3730 | 3039 |
| 0000040020 | 3138 | 3832 | 3435 | 3739 | 4542 | 3743 | 3041 | 3846 |
| 0000040040 | 3841 | 3833 | 3642 | 0D34 | 3A0A | 3031 | 4439 | 3232 |
| 0000040060 | 3030 | 3238 | 3045 | 4246 | 3437 | 3430 | 4632 | 3546 |
| 0000040100 | 3238 | 3445 | 4533 | 3546 | 3338 | 4245 | 3046 | 4237 |
| 0000040120 | 4445 | 3944 | 0A0D | 313A | 3930 | 3344 | 3032 | 3730 |
| 0000040140 | 3041 | 3846 | 3841 | 3833 | 3842 | 4532 | 4630 | 3742 |
| 0000040160 | 3034 | 3235 | 4646 | 3835 | 4532 | 3334 | 4645 | 3635 |
| 0000040200 | 0D44 | 3A0A | 3031 | 4439 | 3234 | 3030 | 3338 | 4245 |
| 0000040220 | 3046 | 4237 | 4345 | 4137 | 4630 | 4138 | 3338 | 4238 |
| 0000040240 | 3238 | 3045 | 4246 | 3437 | 3630 | 4632 | 3532 | 0A0D |
| 0000040260 | 313A | 3930 | 3544 | 3032 | 4630 | 3835 | 4532 | 3334 |
| 0000040300 | 4645 | 3835 | 4533 | 4642 | 3730 | 4542 | 3744 | 3041 |
| 0000040320 | 3846 | 3841 | 3833 | 3842 | 3032 | 0D41 | 3A0A | 3031 |
| 0000040340 | 4439 | 3236 | 3030 | 3045 | 4246 | 3437 | 3730 | 4632 |
| 0000040360 | 3546 | 3238 | 3445 | 4533 | 3546 | 3338 | 4245 | 3046 |
| 0000040400 | 3437 | 3430 | 4632 | 3944 | 0A0D | 313A | 3930 | 3744 |
| 0000040420 | 3032 | 4630 | 3835 | 4532 | 3334 | 4645 | 3835 | 4533 |
| 0000040440 | 4630 | 3744 | 3034 | 3236 | 4646 | 3835 | 4532 | 3334 |
| 0000040460 | 4645 | 4235 | 0D43 | 3A0A | 3031 | 4439 | 3238 | 3030 |
| 0000040500 | 3338 | 3045 | 4246 | 4445 | 4236 | 3037 | 4131 | 3437 |
| 0000040520 | 3530 | 4632 | 3546 | 3238 | 3445 | 4533 | 3546 | 3338 |
| 0000040540 | 3844 | 0A0D | 313A | 3930 | 3944 | 3032 | 4530 | 4630 |
| 0000040560 | 3744 | 3034 | 3237 | 4646 | 3835 | 4532 | 3334 | 4645 |
| 0000040600 | 3835 | 4533 | 4630 | 4542 | 3644 | 3642 | 3930 | 0D36 |
| 0000040620 | 3A0A | 3031 | 4439 | 3241 | 3030 | 4132 | 4237 | 4345 |
| 0000040640 | 4137 | 4630 | 4138 | 3338 | 4238 | 3238 | 3045 | 4246 |
| 0000040660 | 3437 | 3430 | 4632 | 3546 | 3238 | 3438 | 0A0D | 313A |
| 0000040700 | 3930 | 4244 | 3032 | 4530 | 3334 | 4645 | 3835 | 4533 |
| 0000040720 | 4642 | 3730 | 4542 | 3744 | 3041 | 3846 | 3841 | 3833 |
| 0000040740 | 3842 | 4532 | 4630 | 3442 | 0D36 | 3A0A | 3031 | 4439 |
| 0000040760 | 3243 | 3030 | 3437 | 3530 | 4632 | 3546 | 3238 | 3445 |
| 0000041000 | 4533 | 3546 | 3338 | 4245 | 3046 | 3039 | 3045 | 3532 |
| 0000041020 | 3045 | 4346 | 4338 | 0A0D | 313A | 3930 | 4444 | 3032 |
| 0000041040 | 4130 | 4533 | 4630 | 3744 | 4642 | 3746 | 3041 | 4530 |
| 0000041060 | 3542 | 4644 | 4542 | 3541 | 4643 | 3841 | 3042 | 3835 |
| 0000041100 | 3741 | 0D30 | 3A0A | 3031 | 4439 | 3245 | 3030 | 3430 |
| 0000041120 | 3437 | 3430 | 4632 | 3546 | 3238 | 3445 | 4533 | 3546 |

THU MAR 14 17:46:30 1991 SUTFILE.HEX PAGE 19, LINE 1063

| | | | | | | | | |
|---|---|---|---|---|---|---|---|---|
| 0000041140 | 3338 | 3045 | 4246 | 4137 | 3030 | 4445 | 4236 | 3830 |
| 0000041160 | 0A0D | 313A | 3930 | 4644 | 3032 | 3730 | 3030 | 4532 |
| 0000041200 | 3643 | 3641 | 3030 | 3732 | 4634 | 3046 | 3634 | 3330 |
| 0000041220 | 3934 | 4530 | 3230 | 4535 | 4630 | 4243 | 0D42 | 3A0A |
| 0000041240 | 3031 | 4539 | 3230 | 3030 | 3341 | 3045 | 4446 | 4237 |
| 0000041260 | 3830 | 3231 | 3238 | 4539 | 4238 | 3530 | 4138 | 3430 |
| 0000041300 | 3437 | 3530 | 4632 | 3546 | 3036 | 0A0D | 313A | 3930 |
| 0000041320 | 3145 | 3032 | 3830 | 4532 | 3334 | 4645 | 3835 | 4533 |
| 0000041340 | 4630 | 3742 | 3041 | 4530 | 3644 | 3742 | 3030 | 4532 |
| 0000041360 | 3643 | 3641 | 3430 | 0D46 | 3A0A | 3031 | 4539 | 3232 |
| 0000041400 | 3030 | 3230 | 3437 | 4646 | 3430 | 3036 | 3930 | 4237 |
| 0000041420 | 3030 | 3039 | 3045 | 4330 | 4245 | 3046 | 3038 | 3730 |
| 0000041440 | 4237 | 4137 | 0A0D | 313A | 3930 | 3345 | 3032 | 4630 |
| 0000041460 | 3946 | 4530 | 3030 | 4543 | 4642 | 3030 | 3832 | 3935 |
| 0000041500 | 3738 | 3034 | 3732 | 3038 | 3730 | 3039 | 3143 | 3232 |
| 0000041520 | 0D36 | 3A0A | 3031 | 4539 | 3234 | 3030 | 3538 | 3934 |
| 0000041540 | 4237 | 3246 | 4137 | 4630 | 4138 | 3338 | 4238 | 3238 |
| 0000041560 | 3045 | 4246 | 4137 | 3030 | 3437 | 3430 | 3536 | 0A0D |
| 0000041600 | 313A | 3930 | 3545 | 3032 | 3230 | 4646 | 3835 | 4532 |
| 0000041620 | 3334 | 4645 | 3835 | 4533 | 4641 | 4530 | 4142 | 4633 |
| 0000041640 | 3730 | 4642 | 3733 | 3041 | 3746 | 0D31 | 3A0A | 3031 |
| 0000041660 | 4539 | 3236 | 3030 | 4138 | 3338 | 4238 | 3238 | 3045 |
| 0000041700 | 4246 | 4137 | 3030 | 3437 | 3630 | 4632 | 3546 | 3238 |
| 0000041720 | 3445 | 4533 | 3546 | 4134 | 0A0D | 313A | 3930 | 3745 |
| 0000041740 | 3032 | 3830 | 4533 | 4641 | 4530 | 4142 | 4633 | 3730 |
| 0000041760 | 4642 | 3732 | 3041 | 3846 | 3841 | 3833 | 3842 | 4532 |
| 0000042000 | 4630 | 3142 | 0D41 | 3A0A | 3031 | 4539 | 3238 | 3030 |
| 0000042020 | 4137 | 3030 | 3437 | 3830 | 4632 | 3546 | 3238 | 3445 |
| 0000042040 | 4533 | 3546 | 3338 | 4145 | 3046 | 4245 | 3341 | 3046 |
| 0000042060 | 3234 | 0A0D | 313A | 3930 | 3945 | 3032 | 3730 | 4642 |
| 0000042100 | 3733 | 3D41 | 3846 | 3841 | 3833 | 3842 | 4532 | 4630 |
| 0000042120 | 3742 | 3041 | 3730 | 3034 | 3241 | 4646 | 4235 | 0D38 |
| 0000042140 | 3A0A | 3031 | 4539 | 3241 | 3030 | 3238 | 3445 | 4533 |
| 0000042160 | 3546 | 3338 | 4145 | 3046 | 4245 | 3341 | 3046 | 3437 |
| 0000042200 | 3430 | 4632 | 3546 | 3238 | 3445 | 4133 | 0A0D | 313A |
| 0000042220 | 3930 | 4245 | 3032 | 3330 | 4645 | 3835 | 4533 | 4630 |
| 0000042240 | 4143 | 4533 | 4630 | 3744 | 3034 | 3238 | 4646 | 3835 |
| 0000042260 | 4532 | 3334 | 4645 | 3535 | 0D35 | 3A0A | 3031 | 4539 |
| 0000042300 | 3243 | 3030 | 3338 | 3045 | 4146 | 3341 | 3045 | 4246 |
| 0000042320 | 4445 | 4236 | 3037 | 3230 | 4345 | 4136 | 3037 | 3432 |
| 0000042340 | 3437 | 3630 | 3738 | 0A0D | 313A | 3930 | 4445 | 3032 |
| 0000042360 | 3230 | 4646 | 3835 | 4532 | 3334 | 4645 | 3835 | 4533 |
| 0000042400 | 4630 | 4143 | 4533 | 4630 | 3744 | 3034 | 3241 | 4646 |
| 0000042420 | 3435 | 0D32 | 3A0A | 3031 | 4539 | 3245 | 3030 | 3238 |
| 0000042440 | 3445 | 4533 | 3546 | 3338 | 3045 | 4146 | 3341 | 3045 |
| 0000042460 | 4246 | 4445 | 4236 | 3037 | 3230 | 4345 | 4136 | 4344 |
| 0000042500 | 0A0D | 313A | 3930 | 4645 | 3032 | 3630 | 3330 | 3734 |
| 0000042520 | 4642 | 3732 | 3041 | 3846 | 3841 | 3833 | 3842 | 4532 |
| 0000042540 | 4630 | 3742 | 3041 | 3730 | 3034 | 4534 | 0D46 | 3A0A |
| 0000042560 | 3031 | 4639 | 3230 | 3030 | 4632 | 3546 | 3238 | 3445 |
| 0000042600 | 4533 | 3546 | 3338 | 4145 | 3046 | 4245 | 3341 | 3046 |
| 0000042620 | 4237 | 3346 | 4137 | 4630 | 3043 | 0A0D | 313A | 3930 |
| 0000042640 | 3146 | 3032 | 3830 | 3841 | 3833 | 3842 | 4532 | 4630 |
| 0000042660 | 3742 | 3041 | 3730 | 3034 | 3236 | 4646 | 3835 | 4532 |
| 0000042700 | 3334 | 4645 | 3935 | 0D39 | 3A0A | 3031 | 4639 | 3232 |
| 0000042720 | 3030 | 3338 | 4145 | 3046 | 4245 | 3341 | 3046 | 3437 |
| 0000042740 | 3630 | 4632 | 3546 | 3238 | 3445 | 4533 | 3546 | 3338 |
| 0000042760 | 3045 | 4142 | 0A0D | 313A | 3930 | 3346 | 3032 | 4630 |
| 0000043000 | 4143 | 4533 | 4630 | 3744 | 3042 | 3138 | 3832 | 4432 |

THU MAR 14 17:46:30 1991 SUTFILE.HEX PAGE 20, LINE 1122

| | | | | | | | | |
|---|---|---|---|---|---|---|---|---|
| 0000043020 | 3843 | 3042 | 3835 | 3041 | 3734 | 3034 | 3234 | 4546 |
| 0000043040 | 0D42 | 3A0A | 3031 | 4639 | 3234 | 3030 | 3546 | 3238 |
| 0000043060 | 3445 | 4533 | 3546 | 3338 | 3045 | 4146 | 3341 | 3045 |
| 0000043100 | 4246 | 4245 | 4434 | 4246 | 4145 | 4334 | 4433 | 0A0D |
| 0000043120 | 313A | 3930 | 3546 | 3032 | 4630 | 3741 | 3034 | 3234 |
| 0000043140 | 4646 | 3835 | 4532 | 3334 | 4645 | 3835 | 4533 | 4641 |
| 0000043160 | 4530 | 4142 | 4633 | 3730 | 3834 | 0D31 | 3A0A | 3031 |
| 0000043200 | 4639 | 3236 | 3030 | 3430 | 4632 | 3546 | 3238 | 3445 |
| 0000043220 | 4533 | 3546 | 3338 | 3045 | 4346 | 3341 | 3045 | 4446 |
| 0000043240 | 3437 | 4330 | 4632 | 3041 | 0A0D | 313A | 3930 | 3746 |
| 0000043260 | 3032 | 4630 | 3835 | 4532 | 3334 | 4645 | 3835 | 4533 |
| 0000043300 | 4630 | 4141 | 4533 | 4630 | 4542 | 3644 | 3742 | 3030 |
| 0000043320 | 4532 | 4343 | 0D30 | 3A0A | 3031 | 4639 | 3238 | 3030 |
| 0000043340 | 4136 | 3036 | 3230 | 3437 | 4646 | 3430 | 3037 | 3733 |
| 0000043360 | 3437 | 4330 | 4632 | 3546 | 3238 | 3445 | 4533 | 3546 |
| 0000043400 | 3841 | 0A0D | 313A | 3930 | 3946 | 3032 | 3830 | 4533 |
| 0000043420 | 4630 | 4143 | 4533 | 4630 | 3744 | 4542 | 3730 | 3041 |
| 0000043440 | 4537 | 3242 | 4644 | 4542 | 3341 | 4643 | 4441 | 0D31 |
| 0000043460 | 3A0A | 3031 | 4639 | 3241 | 3030 | 4238 | 3530 | 4138 |
| 0000043500 | 3430 | 3437 | 3430 | 4632 | 3546 | 3238 | 3445 | 4533 |
| 0000043520 | 3546 | 3338 | 3045 | 4146 | 3341 | 4335 | 0A0D | 313A |
| 0000043540 | 3930 | 4246 | 3032 | 4530 | 4630 | 4542 | 3644 | 3742 |
| 0000043560 | 3030 | 4532 | 3643 | 3641 | 3030 | 3732 | 4634 | 3046 |
| 0000043600 | 3634 | 3330 | 3733 | 4242 | 0D44 | 3A0A | 3031 | 4639 |
| 0000043620 | 3243 | 3030 | 3245 | 4137 | 4630 | 4138 | 3338 | 4238 |
| 0000043640 | 3238 | 3045 | 4246 | 4238 | 3530 | 4237 | 3535 | 4445 |
| 0000043660 | 4236 | 3036 | 3731 | 0A0D | 313A | 3930 | 4446 | 3032 |
| 0000043700 | 3030 | 3832 | 4530 | 3743 | 4544 | 3732 | 3043 | 3746 |
| 0000043720 | 3042 | 3830 | 3843 | 3833 | 3844 | 4532 | 4642 | 3730 |
| 0000043740 | 3344 | 0D36 | 3A0A | 3031 | 4639 | 3245 | 3030 | 4546 |
| 0000043760 | 4337 | 4630 | 4237 | 3230 | 4338 | 3338 | 4438 | 3238 |
| 0000044000 | 4245 | 3046 | 4237 | 3230 | 3039 | 3045 | 3432 | 4635 |
| 0000044020 | 0A0D | 313A | 3930 | 4646 | 3032 | 4530 | 4642 | 3030 |
| 0000044040 | 3832 | 3935 | 3738 | 3034 | 3732 | 3038 | 3730 | 3039 |
| 0000044060 | 3134 | 3832 | 3435 | 3739 | 3034 | 4135 | 0D31 | 3A0A |
| 0000044100 | 3031 | 3041 | 3230 | 3030 | 4632 | 3546 | 3238 | 3445 |
| 0000044120 | 4533 | 3546 | 3338 | 3045 | 4246 | 3039 | 3045 | 3432 |
| 0000044140 | 4245 | 3046 | 3230 | 3538 | 4433 | 0A0D | 313A | 4130 |
| 0000044160 | 3130 | 3032 | 3930 | 4538 | 3734 | 3038 | 3730 | 3039 |
| 0000044200 | 3134 | 3832 | 3435 | 3739 | 3144 | 3732 | 3243 | 3930 |
| 0000044220 | 4530 | 3030 | 3444 | 0D35 | 3A0A | 4230 | 3041 | 3232 |
| 0000044240 | 3030 | 3045 | 4246 | 4338 | 3338 | 4438 | 3238 | 4245 |
| 0000044260 | 3046 | 3230 | 3538 | 3839 | 3034 | 0A0D | 303A | 4331 |
| 0000044300 | 3541 | 3042 | 3030 | 4430 | 0D41 | 3A0A | 3031 | 3041 |
| 0000044320 | 4432 | 3030 | 3445 | 3837 | 3030 | 3937 | 3430 | 3231 |
| 0000044340 | 3538 | 3934 | 3244 | 3339 | 3244 | 3639 | 3039 | 3030 |
| 0000044360 | 3030 | 3231 | 4246 | 0A0D | 313A | 4130 | 3330 | 3044 |
| 0000044400 | 3830 | 3536 | 3932 | 3030 | 3030 | 3130 | 4132 | 3531 |
| 0000044420 | 3942 | 3030 | 3030 | 3130 | 4132 | 3546 | 3935 | 3030 |
| 0000044440 | 3630 | 0D37 | 3A0A | 3031 | 3041 | 4434 | 3030 | 3030 |
| 0000044460 | 3231 | 3638 | 3341 | 3039 | 3030 | 3030 | 3231 | 4638 |
| 0000044500 | 3333 | 3038 | 3246 | 3445 | 3837 | 3030 | 3937 | 4431 |
| 0000044520 | 0A0D | 313A | 4130 | 3530 | 3044 | 3030 | 3134 | 3832 |
| 0000044540 | 3435 | 3939 | 3030 | 3030 | 3130 | 4132 | 3632 | 3945 |
| 0000044560 | 3030 | 3030 | 3130 | 4232 | 3131 | 4546 | 0D42 | 3A0A |
| 0000044600 | 3031 | 3041 | 4436 | 3030 | 3230 | 3538 | 3839 | 3445 |
| 0000044620 | 3837 | 3030 | 3937 | 3630 | 3231 | 3538 | 3934 | 3032 |
| 0000044640 | 3239 | 4230 | 3244 | 3739 | 3345 | 0A0D | 313A | 4130 |
| 0000044660 | 3730 | 3044 | 3930 | 3030 | 3030 | 3130 | 3832 | 3445 |

THU MAR 14 17:46:30 1991 SUTFILE.HEX PAGE 21, LINE 1181

| | | | | | | | | |
|---|---|---|---|---|---|---|---|---|
| 0000044700 | 3041 | 4132 | 3531 | 3738 | 3042 | 3732 | 3241 | 3830 |
| 0000044720 | 3841 | 3833 | 4142 | 0D46 | 3A0A | 3031 | 3041 | 4438 |
| 0000044740 | 3030 | 3238 | 3045 | 4246 | 3437 | 3430 | 4632 | 3546 |
| 0000044760 | 3238 | 3445 | 4533 | 3546 | 3338 | 4245 | 3046 | 3437 |
| 0000045000 | 3430 | 4235 | 0A0D | 313A | 4130 | 3930 | 3044 | 3230 |
| 0000045020 | 4646 | 3835 | 4532 | 3334 | 4645 | 3835 | 4533 | 3730 |
| 0000045040 | 3030 | 3033 | 4132 | 3131 | 3743 | 3034 | 3234 | 4246 |
| 0000045060 | 0D41 | 3A0A | 3031 | 3041 | 4441 | 3030 | 3546 | 3238 |
| 0000045100 | 3445 | 4533 | 3546 | 3338 | 3045 | 4446 | 4337 | 3030 |
| 0000045120 | 4237 | 3230 | 4137 | 3030 | 4245 | 4435 | 4146 | 0A0D |
| 0000045140 | 313A | 4130 | 4230 | 3044 | 4630 | 4542 | 3541 | 3443 |
| 0000045160 | 3642 | 3530 | 3931 | 4530 | 3338 | 4534 | 4630 | 4342 |
| 0000045200 | 3030 | 3733 | 3044 | 3130 | 3732 | 0D44 | 3A0A | 3031 |
| 0000045220 | 3041 | 4443 | 3030 | 3138 | 3035 | 3044 | 3330 | 3037 |
| 0000045240 | 3830 | 3039 | 3030 | 3030 | 3231 | 3142 | 3046 | 3038 |
| 0000045260 | 3733 | 3043 | 3330 | 4141 | 0A0D | 313A | 4130 | 4430 |
| 0000045300 | 3044 | 3730 | 3044 | 3131 | 3832 | 3531 | 4430 | 3030 |
| 0000045320 | 3733 | 3030 | 3938 | 3030 | 3030 | 3130 | 4232 | 4237 |
| 0000045340 | 3836 | 3330 | 0D38 | 3A0A | 3031 | 3041 | 4445 | 3030 |
| 0000045360 | 3432 | 3043 | 3330 | 4437 | 3230 | 3231 | 3138 | 3035 |
| 0000045400 | 3044 | 3330 | 3037 | 3830 | 3039 | 3030 | 3030 | 3231 |
| 0000045420 | 4432 | 0A0D | 313A | 4130 | 4630 | 3044 | 4230 | 4333 |
| 0000045440 | 3846 | 3130 | 3731 | 3044 | 3133 | 3832 | 3531 | 3730 |
| 0000045460 | 3030 | 3938 | 3030 | 3030 | 3130 | 4232 | 3036 | 0D44 |
| 0000045500 | 3A0A | 3031 | 3141 | 4430 | 3030 | 4239 | 3038 | 3230 |
| 0000045520 | 3038 | 3030 | 3038 | 3630 | 3039 | 3030 | 3030 | 3231 |
| 0000045540 | 3943 | 4242 | 3038 | 4333 | 4237 | 3243 | 0A0D | 313A |
| 0000045560 | 4130 | 3131 | 3044 | 3130 | 3732 | 3241 | 3830 | 3841 |
| 0000045600 | 3833 | 3842 | 4532 | 4630 | 3742 | 3034 | 3234 | 4646 |
| 0000045620 | 3835 | 4532 | 3334 | 3545 | 0D31 | 3A0A | 3031 | 3141 |
| 0000045640 | 4432 | 3030 | 3546 | 3338 | 4245 | 3046 | 3437 | 3430 |
| 0000045660 | 4632 | 3546 | 3238 | 3445 | 4533 | 3546 | 3338 | 3045 |
| 0000045700 | 4446 | 4337 | 4542 | 0A0D | 313A | 4130 | 3331 | 3044 |
| 0000045720 | 3030 | 3730 | 3042 | 3732 | 3041 | 4530 | 3542 | 4644 |
| 0000045740 | 4542 | 3541 | 3443 | 3642 | 3030 | 3938 | 3030 | 3030 |
| 0000045760 | 3430 | 0D46 | 3A0A | 4530 | 3141 | 4434 | 3030 | 3231 |
| 0000046000 | 3241 | 4138 | 3038 | 3630 | 3039 | 3030 | 3030 | 3231 |
| 0000046020 | 3541 | 3444 | 3230 | 3538 | 3839 | 3630 | 0A0D | 313A |
| 0000046040 | 4130 | 3531 | 3042 | 4530 | 3734 | 3038 | 3730 | 3039 |
| 0000046060 | 3134 | 3832 | 3435 | 4339 | 3932 | 4434 | 3932 | 3734 |
| 0000046100 | 3144 | 3735 | 3243 | 3530 | 0D31 | 3A0A | 3031 | 3141 |
| 0000046120 | 4236 | 3030 | 4237 | 3030 | 4338 | 3338 | 4438 | 3238 |
| 0000046140 | 4245 | 3046 | 4437 | 3431 | 4337 | 3032 | 4237 | 3036 |
| 0000046160 | 4338 | 3338 | 3935 | 0A0D | 313A | 4130 | 3731 | 3042 |
| 0000046200 | 3830 | 3844 | 4532 | 4642 | 3730 | 3144 | 3744 | 3243 |
| 0000046220 | 3730 | 4342 | 3841 | 3843 | 3833 | 3844 | 4532 | 4642 |
| 0000046240 | 3730 | 0D36 | 3A0A | 3031 | 3141 | 4238 | 3030 | 4437 |
| 0000046260 | 3131 | 4337 | 3032 | 4237 | 4644 | 4338 | 3338 | 4438 |
| 0000046300 | 3238 | 4245 | 3046 | 4437 | 3931 | 4337 | 3032 | 3531 |
| 0000046320 | 0A0D | 313A | 4130 | 3931 | 3042 | 3730 | 4442 | 3844 |
| 0000046340 | 3843 | 3833 | 3844 | 4532 | 4642 | 3730 | 3144 | 3736 |
| 0000046360 | 3243 | 3730 | 3042 | 3830 | 3843 | 4133 | 0D41 | 3A0A |
| 0000046400 | 3031 | 3141 | 4241 | 3030 | 4438 | 3238 | 4245 | 3046 |
| 0000046420 | 4437 | 3731 | 4337 | 3032 | 4237 | 3830 | 4338 | 3338 |
| 0000046440 | 4438 | 3238 | 4245 | 3046 | 4530 | 0A0D | 313A | 4130 |
| 0000046460 | 4231 | 3042 | 3730 | 3144 | 3735 | 3243 | 3730 | 3042 |
| 0000046500 | 3830 | 3843 | 3833 | 3844 | 4532 | 4642 | 3730 | 3142 |
| 0000046520 | 3745 | 3241 | 4230 | 0D46 | 3A0A | 3031 | 3141 | 4243 |
| 0000046540 | 3030 | 4138 | 3338 | 4238 | 3238 | 3045 | 4246 | 4437 |

THU MAR 14 17:46:30 1991 SUTFILE.HEX PAGE 22, LINE 1240

| | | | | | | | | |
|---|---|---|---|---|---|---|---|---|
| 0000046560 | 3031 | 4337 | 3032 | 4237 | 3738 | 4338 | 3338 | 4438 |
| 0000046600 | 3238 | 3634 | 0A0D | 313A | 4130 | 4431 | 3042 | 4530 |
| 0000046620 | 4642 | 3730 | 3144 | 3730 | 3243 | 3730 | 3042 | 3837 |
| 0000046640 | 3843 | 3833 | 3844 | 4532 | 4642 | 3730 | 3144 | 3638 |
| 0000046660 | 0D30 | 3A0A | 3031 | 3141 | 4245 | 3030 | 4337 | 3032 |
| 0000046700 | 4237 | 3738 | 4338 | 3338 | 4438 | 3238 | 4245 | 3046 |
| 0000046720 | 4437 | 3831 | 4337 | 3032 | 4237 | 3730 | 4131 | 0A0D |
| 0000046740 | 313A | 4130 | 4631 | 3042 | 3830 | 3843 | 3833 | 3844 |
| 0000046760 | 4532 | 4642 | 3730 | 3144 | 3732 | 3243 | 3730 | 3042 |
| 0000047000 | 3835 | 3843 | 3833 | 3844 | 3932 | 0D32 | 3A0A | 3031 |
| 0000047020 | 3241 | 4230 | 3030 | 4245 | 3046 | 4437 | 4131 | 4337 |
| 0000047040 | 3032 | 4237 | 3530 | 4338 | 3338 | 4438 | 3238 | 4245 |
| 0000047060 | 3046 | 4437 | 3531 | 4132 | 0A0D | 313A | 4130 | 3132 |
| 0000047100 | 3042 | 3730 | 3243 | 3730 | 3242 | 3832 | 3843 | 3833 |
| 0000047120 | 3844 | 4532 | 4642 | 3730 | 3244 | 3733 | 3243 | 3730 |
| 0000047140 | 3142 | 3334 | 0D36 | 3A0A | 3031 | 3241 | 4232 | 3030 |
| 0000047160 | 4338 | 3338 | 4438 | 3238 | 4245 | 3046 | 4437 | 3032 |
| 0000047200 | 4337 | 3032 | 4237 | 4130 | 4338 | 3338 | 4438 | 3238 |
| 0000047220 | 4534 | 0A0D | 313A | 4130 | 3332 | 3042 | 4530 | 4642 |
| 0000047240 | 3730 | 3244 | 3733 | 3243 | 3730 | 3742 | 3832 | 3843 |
| 0000047260 | 3833 | 3844 | 4532 | 4642 | 3730 | 3244 | 3731 | 0D38 |
| 0000047300 | 3A0A | 3031 | 3241 | 4234 | 3030 | 4337 | 3032 | 4237 |
| 0000047320 | 3030 | 4338 | 3338 | 4438 | 3238 | 4245 | 3046 | 4437 |
| 0000047340 | 3132 | 4337 | 3032 | 4237 | 3430 | 4133 | 0A0D | 313A |
| 0000047360 | 4130 | 3532 | 3042 | 3830 | 3843 | 3833 | 3844 | 4532 |
| 0000047400 | 4642 | 3730 | 3042 | 3730 | 3041 | 3930 | 3030 | 3030 |
| 0000047420 | 3132 | 4132 | 3445 | 3641 | 0D39 | 3A0A | 3031 | 3241 |
| 0000047440 | 4236 | 3030 | 3230 | 3538 | 3839 | 3445 | 3837 | 3030 |
| 0000047460 | 3937 | 3430 | 3231 | 3538 | 3934 | 4237 | 3030 | 3039 |
| 0000047500 | 3845 | 3233 | 3645 | 0A0D | 313A | 4130 | 3732 | 3042 |
| 0000047520 | 4530 | 4642 | 3730 | 4642 | 3734 | 3041 | 3930 | 3030 |
| 0000047540 | 3030 | 3132 | 4132 | 3445 | 3041 | 3832 | 3935 | 4538 |
| 0000047560 | 3734 | 0D30 | 3A0A | 3031 | 3241 | 4238 | 3030 | 3837 |
| 0000047600 | 3030 | 3937 | 3630 | 3231 | 3538 | 3934 | 4437 | 4531 |
| 0000047620 | 4337 | 3032 | 4237 | 3031 | 4338 | 3338 | 4438 | 4538 |
| 0000047640 | 0A0D | 313A | 4130 | 3932 | 3042 | 3830 | 4532 | 4642 |
| 0000047660 | 3930 | 3030 | 3030 | 3130 | 4332 | 3241 | 3738 | 3034 |
| 0000047700 | 3235 | 4646 | 3835 | 4532 | 3334 | 3845 | 0D31 | 3A0A |
| 0000047720 | 3031 | 3241 | 4241 | 3030 | 3546 | 3338 | 4245 | 3046 |
| 0000047740 | 4237 | 3331 | 4137 | 3032 | 4138 | 3338 | 4238 | 3238 |
| 0000047760 | 3045 | 4246 | 3437 | 3430 | 4242 | 0A0D | 313A | 4130 |
| 0000050000 | 4232 | 3042 | 3230 | 4646 | 3835 | 4532 | 3334 | 4645 |
| 0000050020 | 3835 | 4533 | 4642 | 3730 | 3034 | 3235 | 4646 | 3835 |
| 0000050040 | 4532 | 3334 | 3345 | 0D37 | 3A0A | 3031 | 3241 | 4243 |
| 0000050060 | 3030 | 3546 | 3338 | 3045 | 3037 | 3630 | 3039 | 3030 |
| 0000050100 | 3030 | 3231 | 4542 | 3546 | 4437 | 4631 | 4337 | 3032 |
| 0000050120 | 4237 | 4441 | 0A0D | 313A | 4130 | 4432 | 3042 | 3130 |
| 0000050140 | 3830 | 3843 | 3833 | 3844 | 4532 | 4642 | 3730 | 3034 |
| 0000050160 | 3234 | 4646 | 3835 | 4532 | 3334 | 4645 | 3835 | 4233 |
| 0000050200 | 0D32 | 3A0A | 3031 | 3241 | 4245 | 3030 | 3045 | 4246 |
| 0000050220 | 3231 | 3438 | 3438 | 3341 | 3231 | 3030 | 3341 | 3832 |
| 0000050240 | 4141 | 3341 | 4439 | 3045 | 3341 | 3641 | 4244 | 0A0D |
| 0000050260 | 313A | 4130 | 4632 | 3042 | 4530 | 4131 | 3133 | 4532 |
| 0000050300 | 4145 | 3433 | 4634 | 4130 | 3433 | 4645 | 4141 | 3233 |
| 0000050320 | 4638 | 4143 | 3133 | 4632 | 3944 | 0D34 | 3A0A | 3031 |
| 0000050340 | 3341 | 4230 | 3030 | 3341 | 4537 | 4546 | 3030 | 3030 |
| 0000050360 | 3341 | 4641 | 3437 | 3430 | 4632 | 3546 | 3238 | 3445 |
| 0000050400 | 4533 | 3546 | 3338 | 3931 | 0A0D | 313A | 4130 | 3133 |
| 0000050420 | 3042 | 4530 | 4630 | 3742 | 3041 | 3930 | 3030 | 3030 |

THU MAR 14 17:46:30 1991 SUTFILE.HEX PAGE 23, LINE 1299

| | | | | | | | | |
|---|---|---|---|---|---|---|---|---|
| 0000050440 | 3132 | 4132 | 3445 | 3041 | 4132 | 4333 | 3934 | 3030 |
| 0000050460 | 3030 | 3430 | 0D38 | 3A0A | 3031 | 3341 | 4232 | 3030 |
| 0000050500 | 3231 | 3041 | 3331 | 3437 | 3430 | 4632 | 3546 | 3238 |
| 0000050520 | 3445 | 4533 | 3546 | 3338 | 3045 | 4246 | 4137 | 3030 |
| 0000050540 | 3035 | 0A0D | 313A | 4130 | 3333 | 3042 | 3930 | 3030 |
| 0000050560 | 3030 | 3132 | 4132 | 3445 | 3041 | 4132 | 4333 | 3734 |
| 0000050600 | 4642 | 3946 | 4530 | 3030 | 4534 | 4642 | 3430 | 0D34 |
| 0000050620 | 3A0A | 3031 | 3341 | 4234 | 3030 | 3230 | 3341 | 3443 |
| 0000050640 | 3039 | 3845 | 4632 | 3045 | 4446 | 4237 | 4646 | 4445 |
| 0000050660 | 4236 | 3036 | 3630 | 3039 | 3030 | 4434 | 0A0D | 313A |
| 0000050700 | 4130 | 3533 | 3042 | 3030 | 3130 | 4132 | 3130 | 3933 |
| 0000050720 | 4530 | 3338 | 4532 | 3630 | 3130 | 3737 | 3042 | 3732 |
| 0000050740 | 3041 | 3930 | 3030 | 4130 | 0D35 | 3A0A | 3031 | 3341 |
| 0000050760 | 4236 | 3030 | 3230 | 3231 | 4641 | 3930 | 3039 | 3845 |
| 0000051000 | 3033 | 3045 | 4246 | 4137 | 3030 | 3039 | 3030 | 3230 |
| 0000051020 | 3231 | 3841 | 4443 | 0A0D | 313A | 4130 | 3733 | 3042 |
| 0000051040 | 4230 | 3845 | 3430 | 3936 | 3030 | 3030 | 3130 | 4132 |
| 0000051060 | 3130 | 3733 | 3042 | 3732 | 3041 | 3930 | 3030 | 3030 |
| 0000051100 | 3732 | 0D30 | 3A0A | 3031 | 3341 | 4238 | 3030 | 3231 |
| 0000051120 | 4641 | 3930 | 3039 | 3845 | 4632 | 3045 | 4246 | 4137 |
| 0000051140 | 3030 | 3039 | 3030 | 3230 | 3231 | 3841 | 4542 | 3246 |
| 0000051160 | 0A0D | 313A | 4130 | 3933 | 3042 | 3830 | 3230 | 3737 |
| 0000051200 | 4642 | 3946 | 4530 | 3030 | 4531 | 4642 | 3830 | 3130 |
| 0000051220 | 3745 | 4642 | 3946 | 4530 | 3030 | 4232 | 0D42 | 3A0A |
| 0000051240 | 3031 | 3341 | 4241 | 3030 | 4245 | 3046 | 3038 | 3531 |
| 0000051260 | 3437 | 3430 | 4632 | 3546 | 3238 | 3445 | 4533 | 3546 |
| 0000051300 | 3338 | 3045 | 4246 | 4137 | 3532 | 0A0D | 313A | 4130 |
| 0000051320 | 4233 | 3042 | 3030 | 3930 | 3030 | 3030 | 3132 | 4132 |
| 0000051340 | 4333 | 3837 | 3030 | 3030 | 3832 | 3935 | 3738 | 3034 |
| 0000051360 | 3732 | 3038 | 4630 | 0D37 | 3A0A | 3031 | 3341 | 4243 |
| 0000051400 | 3030 | 3937 | 3830 | 3231 | 3538 | 3934 | 3039 | 3030 |
| 0000051420 | 3030 | 3231 | 4339 | 4334 | 3437 | 3430 | 4632 | 3546 |
| 0000051440 | 3238 | 3937 | 0A0D | 313A | 4130 | 4433 | 3042 | 4530 |
| 0000051460 | 3334 | 4645 | 3835 | 4533 | 4641 | 4530 | 4142 | 4633 |
| 0000051500 | 3730 | 3034 | 3234 | 4646 | 3835 | 4532 | 3334 | 3445 |
| 0000051520 | 0D30 | 3A0A | 3031 | 3341 | 4245 | 3030 | 3546 | 3338 |
| 0000051540 | 3045 | 4146 | 3341 | 3045 | 4246 | 3437 | 3630 | 4632 |
| 0000051560 | 3546 | 3238 | 3445 | 4533 | 3546 | 3338 | 3844 | 0A0D |
| 0000051600 | 313A | 4130 | 4633 | 3042 | 4530 | 4641 | 4530 | 4142 |
| 0000051620 | 4633 | 3930 | 4530 | 3030 | 4531 | 3630 | 3130 | 3738 |
| 0000051640 | 3844 | 3730 | 3034 | 3239 | 3846 | 0D38 | 3A0A | 3031 |
| 0000051660 | 3441 | 4230 | 3030 | 4246 | 3445 | 4533 | 4146 | 4138 |
| 0000051700 | 3338 | 4238 | 3238 | 3045 | 4432 | 3046 | 4246 | 4237 |
| 0000051720 | 3030 | 3039 | 3045 | 4432 | 0A0D | 313A | 4130 | 3134 |
| 0000051740 | 3042 | 3030 | 4531 | 4642 | 3930 | 4530 | 3030 | 4534 |
| 0000051760 | 3630 | 3030 | 3033 | 4132 | 4334 | 3930 | 4530 | 3030 |
| 0000052000 | 4532 | 4530 | 0D36 | 3A0A | 3031 | 3441 | 4232 | 3030 |
| 0000052020 | 3036 | 3931 | 3437 | 3930 | 4632 | 3546 | 3238 | 3445 |
| 0000052040 | 4533 | 3546 | 3338 | 3045 | 4446 | 4237 | 3431 | 4445 |
| 0000052060 | 3239 | 0A0D | 313A | 4130 | 3334 | 3042 | 3630 | 3642 |
| 0000052100 | 3030 | 3732 | 4634 | 3046 | 3634 | 3030 | 3033 | 4132 |
| 0000052120 | 4435 | 3931 | 4530 | 3030 | 4532 | 3630 | 3430 | 0D30 |
| 0000052140 | 3A0A | 3031 | 3441 | 4234 | 3030 | 3131 | 4437 | 3038 |
| 0000052160 | 3437 | 3930 | 4632 | 4246 | 3445 | 4533 | 4146 | 4138 |
| 0000052200 | 3338 | 4238 | 3238 | 3045 | 4432 | 3930 | 0A0D | 313A |
| 0000052220 | 4130 | 3534 | 3042 | 4630 | 4630 | 3742 | 3034 | 3234 |
| 0000052240 | 4646 | 4542 | 3334 | 4645 | 3141 | 3832 | 3132 | 3043 |
| 0000052260 | 3832 | 3042 | 3835 | 3741 | 0D43 | 3A0A | 3031 | 3441 |
| 0000052300 | 4236 | 3030 | 3430 | 4237 | 3141 | 4338 | 3338 | 4438 |

THU MAR 14 17:46:30 1991 SUTFILE.HEX PAGE 24, LINE 1358

| | | | | | | | | |
|---|---|---|---|---|---|---|---|---|
| 0000052320 | 3238 | 4245 | 3046 | 3437 | 3430 | 4632 | 4246 | 3445 |
| 0000052340 | 4533 | 4146 | 4130 | 0A0D | 313A | 4130 | 3734 | 3042 |
| 0000052360 | 3130 | 3832 | 3132 | 3043 | 3832 | 3042 | 3835 | 3041 |
| 0000052400 | 3734 | 3034 | 3239 | 4646 | 3835 | 4532 | 3334 | 4645 |
| 0000052420 | 4335 | 0D37 | 3A0A | 3031 | 3441 | 4238 | 3030 | 3338 |
| 0000052440 | 3045 | 4246 | 4338 | 3338 | 4438 | 3238 | 4245 | 3046 |
| 0000052460 | 3437 | 3430 | 4632 | 3546 | 3238 | 3445 | 4533 | 4132 |
| 0000052500 | 0A0D | 313A | 4130 | 3934 | 3042 | 4630 | 3835 | 4533 |
| 0000052520 | 4630 | 4143 | 4533 | 4630 | 3744 | 4442 | 3746 | 3041 |
| 0000052540 | 3146 | 3832 | 3830 | 3645 | 3130 | 3632 | 0D38 | 3A0A |
| 0000052560 | 3031 | 3441 | 4241 | 3030 | 4237 | 3030 | 4137 | 3830 |
| 0000052600 | 3437 | 3430 | 4632 | 3546 | 3238 | 3445 | 4533 | 3546 |
| 0000052620 | 3338 | 4145 | 3046 | 4245 | 3732 | 0A0D | 313A | 4130 |
| 0000052640 | 4234 | 3042 | 4130 | 4633 | 3030 | 4132 | 4135 | 3939 |
| 0000052660 | 4530 | 3030 | 4532 | 3730 | 3630 | 3741 | 3034 | 3234 |
| 0000052700 | 4646 | 4542 | 4634 | 0D43 | 3A0A | 3031 | 3441 | 4243 |
| 0000052720 | 3030 | 4533 | 4146 | 3231 | 3238 | 4331 | 3230 | 4238 |
| 0000052740 | 3530 | 4138 | 3430 | 4237 | 3241 | 4338 | 3338 | 4438 |
| 0000052760 | 3238 | 4533 | 0A0D | 313A | 4130 | 4434 | 3042 | 4530 |
| 0000053000 | 4642 | 3730 | 3034 | 3234 | 4646 | 4542 | 3334 | 4645 |
| 0000053020 | 3141 | 3832 | 3132 | 3043 | 3832 | 3042 | 3835 | 3041 |
| 0000053040 | 0D43 | 3A0A | 3031 | 3441 | 4245 | 3030 | 3430 | 3437 |
| 0000053060 | 3930 | 4632 | 3546 | 3238 | 3445 | 4533 | 3546 | 3338 |
| 0000053100 | 3045 | 4246 | 4338 | 3338 | 4438 | 3238 | 3741 | 0A0D |
| 0000053120 | 313A | 4130 | 4634 | 3042 | 4530 | 4642 | 3730 | 3034 |
| 0000053140 | 3234 | 4646 | 3835 | 4532 | 3334 | 4645 | 3835 | 4533 |
| 0000053160 | 4630 | 4143 | 4533 | 4630 | 3644 | 0D32 | 3A0A | 3031 |
| 0000053200 | 3541 | 4230 | 3030 | 4237 | 4644 | 4137 | 4630 | 3231 |
| 0000053220 | 3038 | 4538 | 3036 | 3231 | 4237 | 3030 | 4137 | 3830 |
| 0000053240 | 3437 | 3430 | 4632 | 3732 | 0A0D | 313A | 4130 | 3135 |
| 0000053260 | 3042 | 4630 | 3835 | 4532 | 3334 | 4645 | 3835 | 4533 |
| 0000053300 | 4641 | 4530 | 4142 | 4633 | 3730 | 3042 | 3930 | 4530 |
| 0000053320 | 3030 | 4434 | 0D38 | 3A0A | 3031 | 3541 | 4232 | 3030 |
| 0000053340 | 4245 | 3046 | 3230 | 3541 | 3941 | 3437 | 3930 | 4632 |
| 0000053360 | 3546 | 3238 | 3445 | 4533 | 3546 | 3338 | 3045 | 4446 |
| 0000053400 | 4235 | 0A0D | 313A | 4130 | 3335 | 3042 | 3730 | 3742 |
| 0000053420 | 4537 | 3644 | 3642 | 3030 | 3033 | 4132 | 4435 | 3731 |
| 0000053440 | 3034 | 3234 | 4646 | 4542 | 3334 | 4645 | 3241 | 0D44 |
| 0000053460 | 3A0A | 3031 | 3541 | 4234 | 3030 | 3231 | 3238 | 4331 |
| 0000053500 | 3230 | 4238 | 3530 | 4138 | 3430 | 4237 | 3241 | 4338 |
| 0000053520 | 3338 | 4438 | 3238 | 4245 | 3046 | 4131 | 0A0D | 313A |
| 0000053540 | 4130 | 3535 | 3042 | 3730 | 3034 | 3234 | 4646 | 4542 |
| 0000053560 | 3334 | 4645 | 3141 | 3832 | 3132 | 3043 | 3832 | 3042 |
| 0000053600 | 3835 | 3041 | 3734 | 4542 | 0D37 | 3A0A | 3031 | 3541 |
| 0000053620 | 4236 | 3030 | 3746 | 4338 | 3338 | 4438 | 3238 | 4245 |
| 0000053640 | 3046 | 3437 | 3430 | 4632 | 3546 | 3238 | 3445 | 4533 |
| 0000053660 | 3546 | 3338 | 3833 | 0A0D | 313A | 4130 | 3735 | 3042 |
| 0000053700 | 4530 | 4630 | 4143 | 4533 | 4630 | 3744 | 4442 | 3746 |
| 0000053720 | 3041 | 3146 | 3832 | 3830 | 3645 | 3130 | 3732 | 3042 |
| 0000053740 | 3830 | 0D34 | 3A0A | 3031 | 3541 | 4238 | 3030 | 4137 |
| 0000053760 | 3830 | 3437 | 3430 | 4632 | 3546 | 3238 | 3445 | 4533 |
| 0000054000 | 3546 | 3338 | 4145 | 3046 | 4245 | 3341 | 3046 | 4532 |
| 0000054020 | 0A0D | 313A | 4130 | 3935 | 3042 | 3730 | 3042 | 3930 |
| 0000054040 | 4530 | 3030 | 4532 | 4642 | 3730 | 3042 | 3930 | 4530 |
| 0000054060 | 3030 | 4534 | 4642 | 3730 | 3034 | 4134 | 0D36 | 3A0A |
| 0000054100 | 3031 | 3541 | 4241 | 3030 | 4632 | 3546 | 3238 | 3445 |
| 0000054120 | 4533 | 3546 | 3338 | 3045 | 4146 | 3341 | 3045 | 4246 |
| 0000054140 | 3039 | 3030 | 3230 | 3231 | 3436 | 0A0D | 313A | 4130 |
| 0000054160 | 4235 | 3042 | 3930 | 3543 | 3746 | 3034 | 3236 | 4646 |

THU MAR 14 17:46:30 1991 SUTFILE.HEX PAGE 25, LINE 1417

| | | | | | | | | |
|---|---|---|---|---|---|---|---|---|
| 0000054200 | 3835 | 4532 | 3334 | 4645 | 3835 | 4533 | 4630 | 4141 |
| 0000054220 | 4533 | 4630 | 3842 | 0D33 | 3A0A | 3031 | 3541 | 4243 |
| 0000054240 | 3030 | 3039 | 3030 | 3230 | 3231 | 4539 | 4233 | 3230 |
| 0000054260 | 3538 | 3839 | 3445 | 3837 | 3030 | 3937 | 3630 | 3231 |
| 0000054300 | 3538 | 3237 | 0A0D | 313A | 4130 | 4435 | 3042 | 3430 |
| 0000054320 | 3739 | 3142 | 3742 | 3241 | 3830 | 3841 | 3833 | 3842 |
| 0000054340 | 4532 | 4630 | 3742 | 3034 | 3235 | 4646 | 3835 | 4532 |
| 0000054360 | 0D33 | 3A0A | 3031 | 3541 | 4245 | 3030 | 3445 | 4533 |
| 0000054400 | 3546 | 3338 | 4245 | 3046 | 3243 | 3439 | 3244 | 3439 |
| 0000054420 | 3437 | 3530 | 4632 | 3546 | 3238 | 3445 | 4332 | 0A0D |
| 0000054440 | 313A | 4130 | 4635 | 3042 | 3330 | 4645 | 3835 | 4533 |
| 0000054460 | 4630 | 4342 | 3030 | 3733 | 4644 | 3145 | 3832 | 3531 |
| 0000054500 | 4430 | 3030 | 3733 | 3130 | 3430 | 0D42 | 3A0A | 3031 |
| 0000054520 | 3641 | 4230 | 3030 | 3039 | 3845 | 3133 | 3045 | 4246 |
| 0000054540 | 4137 | 3030 | 3039 | 3030 | 3230 | 3231 | 4541 | 4134 |
| 0000054560 | 3230 | 3841 | 4242 | 3034 | 0A0D | 313A | 4130 | 3136 |
| 0000054600 | 3042 | 3730 | 4544 | 3145 | 3832 | 3531 | 3730 | 3030 |
| 0000054620 | 3744 | 4542 | 3745 | 3041 | 3930 | 3030 | 3030 | 3132 |
| 0000054640 | 4132 | 3245 | 0D46 | 3A0A | 3031 | 3641 | 4232 | 3030 |
| 0000054660 | 4134 | 3230 | 3841 | 4242 | 3437 | 3530 | 4632 | 3546 |
| 0000054700 | 3238 | 3445 | 4533 | 3546 | 3338 | 3045 | 4446 | 4237 |
| 0000054720 | 4635 | 0A0D | 313A | 4130 | 3336 | 3042 | 4530 | 3143 |
| 0000054740 | 3832 | 4130 | 3639 | 3430 | 3739 | 4642 | 3741 | 3041 |
| 0000054760 | 3930 | 3030 | 3030 | 3132 | 4132 | 3445 | 4241 | 0D34 |
| 0000055000 | 3A0A | 3031 | 3641 | 4234 | 3030 | 3437 | 3530 | 4632 |
| 0000055020 | 3546 | 3238 | 3445 | 4533 | 3546 | 3338 | 3045 | 4246 |
| 0000055040 | 3039 | 3845 | 4632 | 4245 | 3046 | 3945 | 0A0D | 313A |
| 0000055060 | 4130 | 3536 | 3042 | 3730 | 3034 | 3235 | 4646 | 3835 |
| 0000055100 | 4532 | 3334 | 4645 | 3835 | 4533 | 4630 | 3744 | 4542 |
| 0000055120 | 4544 | 3644 | 3642 | 3330 | 0D39 | 3A0A | 3031 | 3641 |
| 0000055140 | 4236 | 3030 | 4531 | 3437 | 3530 | 4632 | 3546 | 3238 |
| 0000055160 | 3445 | 4533 | 3546 | 3338 | 3045 | 4446 | 4237 | 3346 |
| 0000055200 | 4445 | 4236 | 3536 | 0A0D | 313A | 4130 | 3736 | 3042 |
| 0000055220 | 3630 | 3030 | 3944 | 4530 | 3238 | 4546 | 4630 | 3742 |
| 0000055240 | 3041 | 3930 | 3030 | 3030 | 3132 | 4132 | 4238 | 3745 |
| 0000055260 | 4534 | 0D38 | 3A0A | 3031 | 3641 | 4238 | 3030 | 3530 |
| 0000055300 | 4632 | 3546 | 3238 | 3445 | 4533 | 3546 | 3338 | 3045 |
| 0000055320 | 4446 | 4237 | 3038 | 3231 | 3038 | 4244 | 3037 | 3543 |
| 0000055340 | 0A0D | 313A | 4130 | 3936 | 3042 | 3030 | 3033 | 4132 |
| 0000055360 | 4238 | 3739 | 4642 | 3741 | 3041 | 3930 | 3030 | 3030 |
| 0000055400 | 3132 | 4132 | 3445 | 3741 | 3034 | 3435 | 0D35 | 3A0A |
| 0000055420 | 3031 | 3641 | 4241 | 3030 | 4632 | 3546 | 3238 | 3445 |
| 0000055440 | 4533 | 3546 | 3338 | 3045 | 4246 | 3039 | 3845 | 3033 |
| 0000055460 | 4245 | 3046 | 3039 | 3045 | 3139 | 0A0D | 313A | 4130 |
| 0000055500 | 4236 | 3042 | 3030 | 4535 | 3730 | 3130 | 3930 | 4530 |
| 0000055520 | 3238 | 4546 | 4630 | 3742 | 3041 | 3930 | 3030 | 3030 |
| 0000055540 | 3132 | 4132 | 4538 | 0D32 | 3A0A | 3031 | 3641 | 4243 |
| 0000055560 | 3030 | 4542 | 3230 | 3841 | 3942 | 4237 | 3030 | 3437 |
| 0000055600 | 3430 | 4632 | 3546 | 3238 | 3445 | 4533 | 3546 | 3338 |
| 0000055620 | 4245 | 3034 | 0A0D | 313A | 4130 | 4436 | 3042 | 4630 |
| 0000055640 | 3730 | 3034 | 3234 | 4646 | 3835 | 4532 | 3334 | 4645 |
| 0000055660 | 3835 | 4533 | 4630 | 3744 | 3042 | 3141 | 3832 | 4430 |
| 0000055700 | 0D33 | 3A0A | 3031 | 3641 | 4245 | 3030 | 4244 | 3036 |
| 0000055720 | 4430 | 3437 | 3430 | 4632 | 4246 | 3445 | 4533 | 4146 |
| 0000055740 | 3231 | 3238 | 4331 | 3130 | 3038 | 3145 | 3734 | 0A0D |
| 0000055760 | 313A | 4130 | 4636 | 3042 | 3730 | 4642 | 3730 | 3041 |
| 0000056000 | 3930 | 3030 | 3030 | 3132 | 4132 | 3445 | 3941 | 4530 |
| 0000056020 | 3030 | 4535 | 4630 | 3742 | 3041 | 0D34 | 3A0A | 3031 |
| 0000056040 | 3741 | 4230 | 3030 | 3030 | 3231 | 3438 | 3334 | 3130 |

THU MAR 14 17:46:30 1991 SUTFILE.HEX PAGE 26, LINE 1476

| | | | | | | | | |
|---|---|---|---|---|---|---|---|---|
| 0000056060 | 3030 | 3530 | 3030 | 3841 | 3742 | 3741 | 3132 | 3741 |
| 0000056100 | 3436 | 3741 | 4442 | 3943 | 0A0D | 313A | 4130 | 3137 |
| 0000056120 | 3042 | 4130 | 4637 | 4143 | 3338 | 4142 | 3738 | 3739 |
| 0000056140 | 3542 | 3738 | 3041 | 3930 | 3030 | 3030 | 3132 | 4132 |
| 0000056160 | 3445 | 3941 | 0D45 | 3A0A | 3031 | 3741 | 4232 | 3030 |
| 0000056200 | 4237 | 3030 | 3437 | 3430 | 4632 | 3546 | 3238 | 3445 |
| 0000056220 | 4533 | 3546 | 3338 | 4245 | 3046 | 3437 | 3430 | 4632 |
| 0000056240 | 3936 | 0A0D | 313A | 4130 | 3337 | 3042 | 4630 | 3835 |
| 0000056260 | 4532 | 3334 | 4645 | 3835 | 4533 | 4630 | 3744 | 3042 |
| 0000056300 | 3141 | 3832 | 4430 | 3642 | 3030 | 3744 | 3434 | 0D44 |
| 0000056320 | 3A0A | 3031 | 3741 | 4234 | 3030 | 3430 | 4632 | 4246 |
| 0000056340 | 3445 | 4533 | 4146 | 3231 | 3238 | 4331 | 3130 | 3038 |
| 0000056360 | 3145 | 4237 | 3230 | 4137 | 3030 | 4241 | 0A0D | 313A |
| 0000056400 | 4130 | 3537 | 3042 | 3930 | 3030 | 3030 | 3132 | 4132 |
| 0000056420 | 4443 | 3045 | 4132 | 4238 | 3739 | 3042 | 3930 | 4530 |
| 0000056440 | 3030 | 4535 | 4642 | 3930 | 0D32 | 3A0A | 3031 | 3741 |
| 0000056460 | 4236 | 3030 | 4237 | 3835 | 4137 | 3030 | 3039 | 3030 |
| 0000056500 | 3230 | 3231 | 4541 | 4134 | 4237 | 3245 | 4137 | 4630 |
| 0000056520 | 4138 | 3338 | 3230 | 0A0D | 313A | 4130 | 3737 | 3042 |
| 0000056540 | 3830 | 3842 | 4532 | 4630 | 3842 | 3042 | 3735 | 3542 |
| 0000056560 | 4535 | 3644 | 3642 | 3030 | 3832 | 4530 | 3743 | 4544 |
| 0000056600 | 3032 | 0D31 | 3A0A | 3031 | 3741 | 4238 | 3030 | 4337 |
| 0000056620 | 4630 | 4237 | 3030 | 4338 | 3338 | 4438 | 3238 | 4245 |
| 0000056640 | 3046 | 4437 | 4646 | 4337 | 4630 | 3039 | 3845 | 3034 |
| 0000056660 | 0A0D | 313A | 4130 | 3937 | 3042 | 3330 | 4530 | 4630 |
| 0000056700 | 3842 | 3843 | 3833 | 3844 | 4532 | 4642 | 3730 | 4644 |
| 0000056720 | 3745 | 3043 | 3746 | 3042 | 3842 | 3943 | 0D32 | 3A0A |
| 0000056740 | 3031 | 3741 | 4241 | 3030 | 3338 | 4438 | 3238 | 4245 |
| 0000056760 | 3046 | 4237 | 4230 | 4137 | 3030 | 3039 | 3030 | 3230 |
| 0000057000 | 3231 | 4639 | 3746 | 3230 | 3546 | 0A0D | 313A | 4130 |
| 0000057020 | 4237 | 3042 | 4130 | 4238 | 3739 | 3542 | 3738 | 3041 |
| 0000057040 | 3930 | 3030 | 3030 | 3132 | 4132 | 3445 | 3741 | 3042 |
| 0000057060 | 3730 | 3034 | 3534 | 0D31 | 3A0A | 3031 | 3741 | 4243 |
| 0000057100 | 3030 | 4632 | 3546 | 3238 | 3445 | 4533 | 3546 | 3338 |
| 0000057120 | 4245 | 3046 | 3437 | 3430 | 4632 | 3546 | 3238 | 3445 |
| 0000057140 | 4533 | 3332 | 0A0D | 313A | 4130 | 4437 | 3042 | 4630 |
| 0000057160 | 3835 | 4533 | 4630 | 3744 | 3042 | 3141 | 3832 | 4430 |
| 0000057200 | 3642 | 3030 | 3744 | 3034 | 3234 | 4646 | 4542 | 3334 |
| 0000057220 | 0D34 | 3A0A | 3031 | 3741 | 4245 | 3030 | 4533 | 4146 |
| 0000057240 | 3231 | 3238 | 4331 | 3130 | 3038 | 3145 | 3039 | 3030 |
| 0000057260 | 3030 | 3231 | 4441 | 4132 | 3230 | 3841 | 3146 | 0A0D |
| 0000057300 | 313A | 4130 | 4637 | 3042 | 4230 | 3739 | 3742 | 3737 |
| 0000057320 | 3041 | 3930 | 3030 | 3030 | 3132 | 4132 | 3445 | 3741 |
| 0000057340 | 3042 | 3730 | 3034 | 3234 | 3646 | 0D42 | 3A0A | 3031 |
| 0000057360 | 3841 | 4230 | 3030 | 3546 | 3238 | 3445 | 4533 | 3546 |
| 0000057400 | 3338 | 4245 | 3046 | 3437 | 3430 | 4632 | 3546 | 3238 |
| 0000057420 | 3445 | 4533 | 3546 | 4331 | 0A0D | 313A | 4130 | 3138 |
| 0000057440 | 3042 | 3830 | 4533 | 4630 | 3744 | 3042 | 3141 | 3832 |
| 0000057460 | 4430 | 3642 | 3030 | 3744 | 3034 | 3234 | 4646 | 4542 |
| 0000057500 | 3334 | 4145 | 0D41 | 3A0A | 3031 | 3841 | 4232 | 3030 |
| 0000057520 | 4146 | 3231 | 3238 | 4331 | 3130 | 3038 | 3145 | 3039 |
| 0000057540 | 3030 | 3030 | 3231 | 4441 | 4132 | 3230 | 3841 | 3942 |
| 0000057560 | 3533 | 0A0D | 313A | 4130 | 3338 | 3042 | 3730 | 3742 |
| 0000057600 | 3745 | 3041 | 3930 | 3030 | 3030 | 3132 | 4132 | 3445 |
| 0000057620 | 3741 | 3042 | 3730 | 3034 | 3234 | 4646 | 4535 | 0D37 |
| 0000057640 | 3A0A | 3031 | 3841 | 4234 | 3030 | 3238 | 3445 | 4533 |
| 0000057660 | 3546 | 3338 | 4245 | 3046 | 3437 | 3430 | 4632 | 3546 |
| 0000057700 | 3238 | 3445 | 4533 | 3546 | 3338 | 4534 | 0A0D | 313A |
| 0000057720 | 4130 | 3538 | 3042 | 4530 | 4630 | 3744 | 3042 | 3141 |

THU MAR 14 17:46:30 1991 SUTFILE.HEX PAGE 27, LINE 1535

| | | | | | | | | |
|---|---|---|---|---|---|---|---|---|
| 0000057740 | 3832 | 4430 | 3642 | 3030 | 3744 | 3034 | 3234 | 4646 |
| 0000057760 | 4542 | 3334 | 4645 | 4641 | 0D33 | 3A0A | 3031 | 3841 |
| 0000060000 | 4236 | 3030 | 3231 | 3238 | 4331 | 3130 | 3038 | 3145 |
| 0000060020 | 3039 | 3030 | 3030 | 3231 | 4441 | 4132 | 3038 | 3034 |
| 0000060040 | 4237 | 3835 | 4642 | 0A0D | 313A | 4130 | 3738 | 3042 |
| 0000060060 | 3730 | 3041 | 3930 | 3030 | 3030 | 3132 | 4132 | 3445 |
| 0000060100 | 3741 | 3042 | 3730 | 3034 | 3234 | 4646 | 3835 | 4532 |
| 0000060120 | 3334 | 0D41 | 3A0A | 3031 | 3841 | 4238 | 3030 | 4533 |
| 0000060140 | 3546 | 3338 | 4245 | 3046 | 3437 | 3430 | 4632 | 3546 |
| 0000060160 | 3238 | 3445 | 4533 | 3546 | 3338 | 3045 | 4446 | 3739 |
| 0000060200 | 0A0D | 313A | 4130 | 3938 | 3042 | 3730 | 3042 | 3141 |
| 0000060220 | 3832 | 4430 | 3642 | 3030 | 3744 | 3034 | 3234 | 4646 |
| 0000060240 | 4542 | 3334 | 4645 | 3141 | 3832 | 4632 | 0D43 | 3A0A |
| 0000060260 | 3031 | 3841 | 4241 | 3030 | 4331 | 3130 | 3038 | 3145 |
| 0000060300 | 3039 | 3030 | 3030 | 3231 | 4441 | 4132 | 3038 | 3230 |
| 0000060320 | 3038 | 3030 | 3038 | 3030 | 3432 | 0A0D | 313A | 4130 |
| 0000060340 | 4238 | 3042 | 3030 | 3832 | 3935 | 3738 | 3034 | 3732 |
| 0000060360 | 3038 | 3730 | 3039 | 3134 | 3832 | 3435 | 3739 | 3842 |
| 0000060400 | 3830 | 4142 | 4638 | 0D35 | 3A0A | 3031 | 3841 | 4243 |
| 0000060420 | 3030 | 4437 | 4531 | 4337 | 3032 | 4237 | 3031 | 4338 |
| 0000060440 | 3338 | 4438 | 3238 | 4245 | 3046 | 4437 | 3231 | 4337 |
| 0000060460 | 3032 | 3739 | 0A0D | 313A | 4130 | 4438 | 3042 | 3730 |
| 0000060500 | 3042 | 3836 | 3843 | 3833 | 3844 | 4532 | 4642 | 3730 |
| 0000060520 | 3144 | 3745 | 3243 | 3730 | 3242 | 3830 | 3843 | 3133 |
| 0000060540 | 0D32 | 3A0A | 3031 | 3841 | 4245 | 3030 | 4438 | 3238 |
| 0000060560 | 4245 | 3046 | 4437 | 3331 | 4337 | 3032 | 3437 | 3530 |
| 0000060600 | 4632 | 3546 | 3238 | 3445 | 4533 | 3546 | 3131 | 0A0D |
| 0000060620 | 313A | 4130 | 4638 | 3042 | 3830 | 4533 | 4630 | 3842 |
| 0000060640 | 3843 | 3833 | 3844 | 4532 | 4642 | 3730 | 3144 | 3746 |
| 0000060660 | 3243 | 3730 | 3142 | 3830 | 4143 | 0D37 | 3A0A | 3031 |
| 0000060700 | 3941 | 4230 | 3030 | 3338 | 4438 | 3238 | 4245 | 3046 |
| 0000060720 | 4437 | 4531 | 4337 | 3032 | 4237 | 3031 | 4338 | 3338 |
| 0000060740 | 4438 | 3238 | 4245 | 3430 | 0A0D | 313A | 4130 | 3139 |
| 0000060760 | 3042 | 4630 | 3730 | 3144 | 3746 | 3243 | 3730 | 3142 |
| 0000061000 | 3830 | 3843 | 3833 | 3844 | 4532 | 4642 | 3730 | 3144 |
| 0000061020 | 3746 | 3643 | 0D38 | 3A0A | 3031 | 3941 | 4232 | 3030 |
| 0000061040 | 3032 | 4237 | 3032 | 4338 | 3338 | 4438 | 3238 | 4245 |
| 0000061060 | 3046 | 4237 | 4638 | 4238 | 3841 | 4237 | 3131 | 4137 |
| 0000061100 | 3532 | 0A0D | 313A | 4130 | 3339 | 3042 | 3230 | 3830 |
| 0000061120 | 3841 | 3833 | 3842 | 4532 | 4630 | 3742 | 3041 | 3830 |
| 0000061140 | 3042 | 3835 | 3041 | 3734 | 3042 | 3738 | 3641 | 0D32 |
| 0000061160 | 3A0A | 3031 | 3941 | 4234 | 3030 | 3030 | 4245 | 4435 |
| 0000061200 | 4246 | 4145 | 4335 | 4234 | 3037 | 3230 | 3038 | 3245 |
| 0000061220 | 4437 | 3231 | 4337 | 3032 | 4237 | 4541 | 0A0D | 313A |
| 0000061240 | 4130 | 3539 | 3042 | 3030 | 3835 | 3843 | 3833 | 3844 |
| 0000061260 | 4532 | 4642 | 3730 | 3034 | 3235 | 4646 | 3835 | 4532 |
| 0000061300 | 3334 | 4645 | 3835 | 3333 | 0D35 | 3A0A | 3031 | 3941 |
| 0000061320 | 4236 | 3030 | 3045 | 4446 | 4237 | 4445 | 4445 | 4236 |
| 0000061340 | 3036 | 3230 | 3437 | 4646 | 3430 | 3037 | 3631 | 3437 |
| 0000061360 | 3530 | 4632 | 3833 | 0A0D | 313A | 4130 | 3739 | 3042 |
| 0000061400 | 4630 | 3835 | 4532 | 3334 | 4645 | 3835 | 4533 | 4630 |
| 0000061420 | 3744 | 4642 | 4533 | 3644 | 3642 | 3030 | 3732 | 4634 |
| 0000061440 | 3446 | 0D33 | 3A0A | 3031 | 3941 | 4238 | 3030 | 3430 |
| 0000061460 | 3036 | 3930 | 4237 | 4646 | 3039 | 3845 | 3233 | 4245 |
| 0000061500 | 3046 | 3038 | 3730 | 4237 | 3030 | 3039 | 3845 | 3644 |
| 0000061520 | 0A0D | 313A | 4130 | 3939 | 3042 | 3330 | 4532 | 4642 |
| 0000061540 | 3030 | 3832 | 3935 | 3738 | 3034 | 3732 | 3038 | 3730 |
| 0000061560 | 3039 | 3136 | 3832 | 3435 | 3739 | 4234 | 0D46 | 3A0A |
| 0000061600 | 3031 | 3941 | 4241 | 3030 | 3630 | 4632 | 3546 | 3238 |

THU MAR 14 17:46:30 1991 SUTFILE.HEX PAGE 28, LINE 1594

| | | | | | | | | |
|---|---|---|---|---|---|---|---|---|
| 0000061620 | 3445 | 4533 | 3546 | 3338 | 3045 | 4146 | 3341 | 3045 |
| 0000061640 | 4246 | 3231 | 3238 | 4331 | 4534 | 0A0D | 313A | 4130 |
| 0000061660 | 4239 | 3042 | 3030 | 3832 | 3841 | 3833 | 3842 | 4532 |
| 0000061700 | 4630 | 3742 | 3034 | 3234 | 4646 | 3835 | 4532 | 3334 |
| 0000061720 | 4645 | 3835 | 4433 | 0D44 | 3A0A | 3031 | 3941 | 4243 |
| 0000061740 | 3030 | 4245 | 3046 | 3437 | 3630 | 4632 | 3546 | 3238 |
| 0000061760 | 3445 | 4533 | 3546 | 3338 | 3045 | 4146 | 3341 | 3045 |
| 0000062000 | 4246 | 4638 | 0A0D | 313A | 4130 | 4439 | 3042 | 3830 |
| 0000062020 | 3841 | 3833 | 3842 | 4532 | 4630 | 4141 | 4533 | 4630 |
| 0000062040 | 3842 | 3042 | 3835 | 3041 | 3734 | 4642 | 3746 | 4541 |
| 0000062060 | 0D38 | 3A0A | 3031 | 3941 | 4245 | 3030 | 3730 | 4245 |
| 0000062100 | 4435 | 4246 | 4145 | 4335 | 4146 | 4238 | 3530 | 4138 |
| 0000062120 | 3430 | 3437 | 3630 | 4632 | 3546 | 3238 | 3439 | 0A0D |
| 0000062140 | 313A | 4130 | 4639 | 3042 | 4530 | 3334 | 4645 | 3835 |
| 0000062160 | 4533 | 4630 | 4141 | 4533 | 4630 | 3842 | 3841 | 3833 |
| 0000062200 | 3842 | 4532 | 4643 | 4630 | 3641 | 0D41 | 3A0A | 3031 |
| 0000062220 | 4141 | 4230 | 3030 | 4445 | 3341 | 3046 | 4246 | 3437 |
| 0000062240 | 3430 | 4632 | 3546 | 3238 | 3445 | 4533 | 3546 | 3338 |
| 0000062260 | 3045 | 4446 | 4237 | 3042 | 0A0D | 313A | 4130 | 3141 |
| 0000062300 | 3042 | 3830 | 3146 | 3832 | 4130 | 3739 | 3030 | 3033 |
| 0000062320 | 4132 | 4541 | 3746 | 3844 | 3730 | 3034 | 3234 | 4646 |
| 0000062340 | 4542 | 4434 | 0D30 | 3A0A | 3031 | 4141 | 4232 | 3030 |
| 0000062360 | 4533 | 4146 | 4138 | 3338 | 4238 | 3238 | 3045 | 4432 |
| 0000062400 | 3046 | 4246 | 3437 | 3430 | 4632 | 3546 | 3238 | 3445 |
| 0000062420 | 4643 | 0A0D | 313A | 4130 | 3341 | 3042 | 3330 | 4645 |
| 0000062440 | 3835 | 4533 | 4630 | 3744 | 3742 | 4537 | 3644 | 3642 |
| 0000062460 | 3030 | 3732 | 4634 | 3046 | 3634 | 3630 | 3845 | 0D37 |
| 0000062500 | 3A0A | 3031 | 4141 | 4234 | 3030 | 4237 | 3145 | 4137 |
| 0000062520 | 3030 | 3039 | 3030 | 3230 | 3231 | 4541 | 4134 | 4237 |
| 0000062540 | 3030 | 3437 | 3530 | 4632 | 3546 | 3137 | 0A0D | 313A |
| 0000062560 | 4130 | 3541 | 3042 | 3830 | 4532 | 3334 | 4645 | 3835 |
| 0000062600 | 4533 | 4642 | 3730 | 3034 | 3235 | 4646 | 3835 | 4532 |
| 0000062620 | 3334 | 4645 | 3835 | 3333 | 0D42 | 3A0A | 3031 | 4141 |
| 0000062640 | 4236 | 3030 | 3045 | 4446 | 4237 | 3630 | 3231 | 3038 |
| 0000062660 | 4244 | 3036 | 4430 | 3437 | 3530 | 4632 | 4246 | 3445 |
| 0000062700 | 4533 | 4146 | 3445 | 0A0D | 313A | 4130 | 3741 | 3042 |
| 0000062720 | 3130 | 3832 | 3132 | 3043 | 3831 | 4530 | 3731 | 3142 |
| 0000062740 | 3734 | 3041 | 3930 | 3030 | 3030 | 3132 | 4132 | 3445 |
| 0000062760 | 3141 | 0D34 | 3A0A | 3031 | 4141 | 4238 | 3030 | 4237 |
| 0000063000 | 3030 | 3437 | 3530 | 4632 | 3546 | 3238 | 3445 | 4533 |
| 0000063020 | 3546 | 3338 | 4245 | 3046 | 3437 | 3530 | 4632 | 3430 |
| 0000063040 | 0A0D | 313A | 4130 | 3941 | 3042 | 4630 | 3835 | 4532 |
| 0000063060 | 3334 | 4645 | 3835 | 4533 | 4630 | 3744 | 3042 | 3136 |
| 0000063100 | 3832 | 4430 | 3642 | 3030 | 3744 | 4534 | 0D45 | 3A0A |
| 0000063120 | 3031 | 4141 | 4241 | 3030 | 3530 | 4632 | 4246 | 3445 |
| 0000063140 | 4533 | 4146 | 3231 | 3238 | 4331 | 3130 | 3038 | 3145 |
| 0000063160 | 3038 | 3633 | 4237 | 3045 | 4432 | 0A0D | 313A | 4130 |
| 0000063200 | 4241 | 3042 | 3730 | 3041 | 3930 | 3030 | 3030 | 3132 |
| 0000063220 | 4132 | 3445 | 3741 | 3042 | 3730 | 3034 | 3235 | 4646 |
| 0000063240 | 3835 | 4532 | 4634 | 0D37 | 3A0A | 3031 | 4141 | 4243 |
| 0000063260 | 3030 | 4533 | 3546 | 3338 | 4245 | 3046 | 3437 | 3530 |
| 0000063300 | 4632 | 3546 | 3238 | 3445 | 4533 | 3546 | 3338 | 3045 |
| 0000063320 | 4446 | 3435 | 0A0D | 313A | 4130 | 4441 | 3042 | 3730 |
| 0000063340 | 3042 | 3141 | 3832 | 4430 | 3642 | 3030 | 3744 | 3034 |
| 0000063360 | 3235 | 4646 | 4542 | 3334 | 4645 | 3141 | 3832 | 4232 |
| 0000063400 | 0D39 | 3A0A | 3031 | 4141 | 4245 | 3030 | 4331 | 3130 |
| 0000063420 | 3038 | 3145 | 3437 | 3430 | 4632 | 3546 | 3238 | 3445 |
| 0000063440 | 4533 | 3546 | 3338 | 3045 | 4246 | 4137 | 3044 | 0A0D |
| 0000063460 | 313A | 4130 | 4641 | 3042 | 3030 | 3930 | 3030 | 3030 |

THU MAR 14 17:46:30 1991 SUTFILE.HEX PAGE 29, LINE 1653

| | | | | | | | | |
|---|---|---|---|---|---|---|---|---|
| 0000063500 | 3132 | 4132 | 3445 | 3041 | 3832 | 3935 | 3738 | 3034 |
| 0000063520 | 3732 | 3038 | 3730 | 3039 | 3236 | 0D33 | 3A0A | 3031 |
| 0000063540 | 4241 | 4230 | 3030 | 3231 | 3538 | 3934 | 3437 | 3630 |
| 0000063560 | 4632 | 3546 | 3238 | 3445 | 4533 | 3546 | 3338 | 3045 |
| 0000063600 | 4146 | 3341 | 3045 | 3334 | 0A0D | 313A | 4130 | 3142 |
| 0000063620 | 3042 | 4630 | 3142 | 3832 | 3132 | 3043 | 3832 | 3841 |
| 0000063640 | 3833 | 3842 | 4532 | 4630 | 3742 | 3034 | 3234 | 4646 |
| 0000063660 | 3835 | 3632 | 0D41 | 3A0A | 3031 | 4241 | 4232 | 3030 |
| 0000063700 | 3445 | 4533 | 3546 | 3338 | 4245 | 3046 | 3437 | 3630 |
| 0000063720 | 4632 | 3546 | 3238 | 3445 | 4533 | 3546 | 3338 | 3045 |
| 0000063740 | 4230 | 0A0D | 313A | 4130 | 3342 | 3042 | 4630 | 4141 |
| 0000063760 | 4533 | 4630 | 3842 | 3841 | 3833 | 3842 | 4532 | 4630 |
| 0000064000 | 4141 | 4533 | 4630 | 3842 | 3042 | 3335 | 3041 | 0D36 |
| 0000064020 | 3A0A | 3031 | 4241 | 4234 | 3030 | 3430 | 4237 | 4646 |
| 0000064040 | 4137 | 3730 | 4245 | 4435 | 4246 | 4145 | 4335 | 4146 |
| 0000064060 | 4238 | 3530 | 4138 | 3430 | 3437 | 3645 | 0A0D | 313A |
| 0000064100 | 4130 | 3542 | 3042 | 3030 | 3236 | 4646 | 3835 | 4532 |
| 0000064120 | 3334 | 4645 | 3835 | 4533 | 4630 | 4141 | 4533 | 4630 |
| 0000064140 | 3842 | 3841 | 3833 | 4242 | 0D34 | 3A0A | 3031 | 4241 |
| 0000064160 | 4236 | 3030 | 3238 | 4345 | 3046 | 4146 | 4445 | 3341 |
| 0000064200 | 3046 | 4246 | 3437 | 3430 | 4632 | 3546 | 3238 | 3445 |
| 0000064220 | 4533 | 3546 | 3244 | 0A0D | 313A | 4130 | 3742 | 3042 |
| 0000064240 | 3830 | 4533 | 4630 | 3744 | 3842 | 3146 | 3832 | 4130 |
| 0000064260 | 3739 | 3030 | 3033 | 4132 | 3843 | 3743 | 3844 | 3730 |
| 0000064300 | 3034 | 0D37 | 3A0A | 3031 | 4241 | 4238 | 3030 | 3430 |
| 0000064320 | 4632 | 4246 | 3445 | 4533 | 4146 | 4138 | 3338 | 4238 |
| 0000064340 | 3238 | 3045 | 4432 | 3046 | 4246 | 3437 | 3430 | 3645 |
| 0000064360 | 0A0D | 313A | 4130 | 3942 | 3042 | 3230 | 4646 | 3835 |
| 0000064400 | 4532 | 3334 | 4645 | 3835 | 4533 | 4630 | 3744 | 3742 |
| 0000064420 | 4537 | 3644 | 3642 | 3030 | 3732 | 3634 | 0D44 | 3A0A |
| 0000064440 | 3031 | 4241 | 4241 | 3030 | 4646 | 3430 | 3037 | 3330 |
| 0000064460 | 3230 | 4341 | 3635 | 4237 | 3145 | 4137 | 3030 | 3039 |
| 0000064500 | 3030 | 3230 | 3231 | 4541 | 3846 | 0A0D | 313A | 4130 |
| 0000064520 | 4242 | 3042 | 3430 | 3741 | 3042 | 3730 | 3034 | 3235 |
| 0000064540 | 4646 | 3835 | 4532 | 3334 | 4645 | 3835 | 4533 | 4642 |
| 0000064560 | 3730 | 3034 | 4235 | 0D38 | 3A0A | 3031 | 4241 | 4243 |
| 0000064600 | 3030 | 4632 | 3546 | 3238 | 3445 | 4533 | 3546 | 3338 |
| 0000064620 | 3045 | 4446 | 4237 | 3630 | 3231 | 3038 | 4244 | 3036 |
| 0000064640 | 4430 | 3230 | 0A0D | 313A | 4130 | 4442 | 3042 | 3730 |
| 0000064660 | 3034 | 3235 | 4646 | 4542 | 3334 | 4645 | 3141 | 3832 |
| 0000064700 | 3132 | 3043 | 3831 | 4530 | 3731 | 4642 | 3730 | 4241 |
| 0000064720 | 0D34 | 3A0A | 3031 | 4241 | 4245 | 3030 | 3030 | 3039 |
| 0000064740 | 3030 | 3230 | 3231 | 4541 | 4134 | 4237 | 3030 | 3437 |
| 0000064760 | 3530 | 4632 | 3546 | 3238 | 3445 | 4533 | 3230 | 0A0D |
| 0000065000 | 313A | 4130 | 4642 | 3042 | 4630 | 3835 | 4533 | 4642 |
| 0000065020 | 3730 | 3034 | 3235 | 4646 | 3835 | 4532 | 3334 | 4645 |
| 0000065040 | 3835 | 4533 | 4630 | 3744 | 4542 | 0D36 | 3A0A | 3031 |
| 0000065060 | 4341 | 4230 | 3030 | 3630 | 3231 | 3038 | 4244 | 3036 |
| 0000065100 | 4430 | 3437 | 3530 | 4632 | 4246 | 3445 | 4533 | 4146 |
| 0000065120 | 3231 | 3238 | 4331 | 4145 | 0A0D | 313A | 4130 | 3143 |
| 0000065140 | 3042 | 3030 | 3831 | 4530 | 3731 | 3142 | 3734 | 3041 |
| 0000065160 | 3930 | 3030 | 3030 | 3132 | 4132 | 3445 | 3741 | 3042 |
| 0000065200 | 3730 | 3334 | 0D33 | 3A0A | 3031 | 4341 | 4232 | 3030 |
| 0000065220 | 3530 | 4632 | 3546 | 3238 | 3445 | 4533 | 3546 | 3338 |
| 0000065240 | 4245 | 3046 | 3437 | 3530 | 4632 | 3546 | 3238 | 3445 |
| 0000065260 | 3646 | 0A0D | 313A | 4130 | 3343 | 3042 | 3330 | 4645 |
| 0000065300 | 3835 | 4533 | 4630 | 3744 | 3042 | 3136 | 3832 | 4430 |
| 0000065320 | 3642 | 3030 | 3744 | 3034 | 3235 | 4646 | 3742 | 0D38 |
| 0000065340 | 3A0A | 3031 | 4341 | 4234 | 3030 | 3445 | 4533 | 4146 |

THU MAR 14 17:46:30 1991 SUTFILE.HEX PAGE 30, LINE 1712

| | | | | | | | | |
|---|---|---|---|---|---|---|---|---|
| 0000065360 | 3231 | 3238 | 4331 | 3130 | 3038 | 3145 | 3038 | 3633 |
| 0000065400 | 4237 | 3045 | 4137 | 3030 | 3039 | 3042 | 0A0D | 313A |
| 0000065420 | 4130 | 3543 | 3042 | 3030 | 3030 | 3132 | 4132 | 3445 |
| 0000065440 | 3741 | 3042 | 3730 | 3034 | 3235 | 4646 | 3835 | 4532 |
| 0000065460 | 3334 | 4645 | 3835 | 4133 | 0D39 | 3A0A | 3031 | 4341 |
| 0000065500 | 4236 | 3030 | 4245 | 3046 | 3437 | 3530 | 4632 | 3546 |
| 0000065520 | 3238 | 3445 | 4533 | 3546 | 3338 | 3045 | 4446 | 4237 |
| 0000065540 | 4130 | 3231 | 3144 | 0A0D | 313A | 4130 | 3743 | 3042 |
| 0000065560 | 3830 | 4430 | 3642 | 3030 | 3744 | 3034 | 3235 | 4646 |
| 0000065600 | 4542 | 3334 | 4645 | 3141 | 3832 | 3132 | 3043 | 3831 |
| 0000065620 | 3130 | 0D31 | 3A0A | 3031 | 4341 | 4238 | 3030 | 3145 |
| 0000065640 | 4237 | 3046 | 4137 | 3030 | 3039 | 3030 | 3230 | 3231 |
| 0000065660 | 4541 | 4134 | 3039 | 3045 | 3330 | 3045 | 3037 | 3439 |
| 0000065700 | 0A0D | 313A | 4130 | 3943 | 3042 | 3330 | 3746 | 3042 |
| 0000065720 | 3730 | 3034 | 3235 | 4646 | 3835 | 4532 | 3334 | 4645 |
| 0000065740 | 3835 | 4533 | 4642 | 3730 | 3034 | 4535 | 0D32 | 3A0A |
| 0000065760 | 3031 | 4341 | 4241 | 3030 | 4632 | 3546 | 3238 | 3445 |
| 0000066000 | 4533 | 3546 | 3338 | 3045 | 4446 | 4237 | 3530 | 3231 |
| 0000066020 | 3038 | 4244 | 3036 | 4430 | 3232 | 0A0D | 313A | 4130 |
| 0000066040 | 4243 | 3042 | 3730 | 3034 | 3235 | 4646 | 4542 | 3334 |
| 0000066060 | 4645 | 3141 | 3832 | 3132 | 3043 | 3831 | 4530 | 3731 |
| 0000066100 | 3034 | 3234 | 3146 | 0D31 | 3A0A | 3031 | 4341 | 4243 |
| 0000066120 | 3030 | 3546 | 3238 | 3445 | 4533 | 3546 | 3338 | 3045 |
| 0000066140 | 4246 | 4137 | 3030 | 3039 | 3030 | 3230 | 3231 | 4541 |
| 0000066160 | 4134 | 3737 | 0A0D | 313A | 4130 | 4443 | 3042 | 3030 |
| 0000066200 | 3832 | 3935 | 3738 | 3034 | 3732 | 3038 | 3730 | 3039 |
| 0000066220 | 3134 | 3832 | 3435 | 3739 | 3034 | 3235 | 4646 | 3635 |
| 0000066240 | 0D32 | 3A0A | 3031 | 4341 | 4245 | 3030 | 3238 | 3445 |
| 0000066260 | 4533 | 3546 | 3338 | 3045 | 4246 | 3039 | 3045 | 3530 |
| 0000066300 | 4245 | 3046 | 4237 | 3835 | 4137 | 3030 | 3543 | 0A0D |
| 0000066320 | 313A | 4130 | 4643 | 3042 | 3930 | 3030 | 3030 | 3132 |
| 0000066340 | 4132 | 3445 | 3041 | 3832 | 3935 | 3738 | 3034 | 3732 |
| 0000066360 | 3038 | 3730 | 3039 | 3134 | 3132 | 0D31 | 3A0A | 3031 |
| 0000066400 | 4441 | 4230 | 3030 | 3538 | 3934 | 3437 | 3530 | 4632 |
| 0000066420 | 3546 | 3238 | 3445 | 4533 | 3546 | 3338 | 3045 | 4246 |
| 0000066440 | 3039 | 3845 | 3333 | 4232 | 0A0D | 313A | 4130 | 3144 |
| 0000066460 | 3042 | 4530 | 4642 | 3730 | 3042 | 3733 | 3041 | 3930 |
| 0000066500 | 3030 | 3030 | 3132 | 4132 | 4443 | 3045 | 3832 | 3935 |
| 0000066520 | 4538 | 3234 | 0D34 | 3A0A | 3031 | 4441 | 4232 | 3030 |
| 0000066540 | 3837 | 3030 | 3937 | 3430 | 3231 | 3538 | 3934 | 3039 |
| 0000066560 | 3845 | 3033 | 3045 | 4446 | 4337 | 3030 | 4237 | 3130 |
| 0000066600 | 3643 | 0A0D | 313A | 4130 | 3344 | 3042 | 3730 | 3041 |
| 0000066620 | 4530 | 3542 | 4644 | 4542 | 3541 | 4643 | 3141 | 3832 |
| 0000066640 | 4435 | 3932 | 4530 | 3338 | 4533 | 4630 | 3144 | 0D41 |
| 0000066660 | 3A0A | 3031 | 4441 | 4234 | 3030 | 4337 | 3030 | 4237 |
| 0000066700 | 3130 | 4137 | 3030 | 4245 | 4435 | 4246 | 4145 | 4335 |
| 0000066720 | 4146 | 3231 | 3538 | 4545 | 4445 | 3139 | 0A0D | 313A |
| 0000066740 | 4130 | 3544 | 3042 | 3630 | 3742 | 3030 | 4532 | 3643 |
| 0000066760 | 3641 | 3130 | 3734 | 3042 | 3935 | 4530 | 3030 | 4535 |
| 0000067000 | 4642 | 3730 | 3742 | 3745 | 0D38 | 3A0A | 3031 | 4441 |
| 0000067020 | 4236 | 3030 | 4137 | 3030 | 3039 | 3030 | 3230 | 3231 |
| 0000067040 | 4541 | 4134 | 3230 | 4541 | 3734 | 3039 | 3845 | 3033 |
| 0000067060 | 3045 | 4446 | 3634 | 0A0D | 313A | 4130 | 3744 | 3042 |
| 0000067100 | 3730 | 3043 | 3730 | 3042 | 3732 | 3041 | 4530 | 3542 |
| 0000067120 | 4644 | 4542 | 3541 | 4643 | 3141 | 3832 | 4435 | 3932 |
| 0000067140 | 4430 | 0D39 | 3A0A | 3031 | 4441 | 4238 | 3030 | 3845 |
| 0000067160 | 3333 | 3045 | 4446 | 4337 | 3030 | 4237 | 3230 | 4137 |
| 0000067200 | 3030 | 4245 | 4435 | 4246 | 4145 | 4335 | 4146 | 4143 |
| 0000067220 | 0A0D | 313A | 4130 | 3944 | 3042 | 3130 | 3832 | 4535 |

THU MAR 14 17:46:30 1991 SUTFILE.HEX PAGE 31, LINE 1771

| | | | | | | | | |
|---|---|---|---|---|---|---|---|---|
| 0000067240 | 4545 | 3644 | 3742 | 3030 | 4532 | 3643 | 3641 | 3130 |
| 0000067260 | 3734 | 3042 | 3934 | 4530 | 3030 | 3935 | 0D42 | 3A0A |
| 0000067300 | 3031 | 4441 | 4241 | 3030 | 4245 | 3046 | 4237 | 3737 |
| 0000067320 | 4137 | 3030 | 3039 | 3030 | 3230 | 3231 | 4541 | 4134 |
| 0000067340 | 3230 | 4541 | 3734 | 3039 | 4532 | 0A0D | 313A | 4130 |
| 0000067360 | 4244 | 3042 | 4530 | 3338 | 4530 | 4630 | 3744 | 3043 |
| 0000067400 | 3730 | 3042 | 3734 | 3041 | 4530 | 3542 | 4644 | 4542 |
| 0000067420 | 3541 | 4643 | 3941 | 0D42 | 3A0A | 3031 | 4441 | 4243 |
| 0000067440 | 3030 | 3231 | 3538 | 3244 | 3039 | 3845 | 3333 | 3045 |
| 0000067460 | 4446 | 4337 | 3030 | 4237 | 3430 | 4137 | 3030 | 4245 |
| 0000067500 | 4435 | 4143 | 0A0D | 313A | 4130 | 4444 | 3042 | 4630 |
| 0000067520 | 4542 | 3541 | 4643 | 3141 | 3832 | 4535 | 4545 | 3644 |
| 0000067540 | 3742 | 3030 | 4532 | 3643 | 3641 | 3130 | 3733 | 3942 |
| 0000067560 | 0D41 | 3A0A | 3031 | 4441 | 4245 | 3030 | 3630 | 3039 |
| 0000067600 | 3045 | 3530 | 4245 | 3046 | 4237 | 3835 | 4137 | 3030 |
| 0000067620 | 3039 | 3030 | 3230 | 3231 | 4541 | 4134 | 3931 | 0A0D |
| 0000067640 | 313A | 4130 | 4644 | 3042 | 3830 | 3430 | 3741 | 3042 |
| 0000067660 | 3930 | 4530 | 3030 | 4535 | 4642 | 3930 | 4530 | 3238 |
| 0000067700 | 4546 | 4630 | 3742 | 3041 | 4230 | 0D37 | 3A0A | 3031 |
| 0000067720 | 4541 | 4230 | 3030 | 3039 | 3030 | 3230 | 3231 | 3841 |
| 0000067740 | 4542 | 4237 | 3245 | 4137 | 4630 | 4138 | 3338 | 4238 |
| 0000067760 | 3238 | 3045 | 4246 | 3235 | 0A0D | 313A | 4130 | 3145 |
| 0000070000 | 3042 | 3830 | 3042 | 3735 | 3542 | 4535 | 3644 | 3642 |
| 0000070020 | 3030 | 3832 | 4530 | 3743 | 4544 | 3732 | 3043 | 3746 |
| 0000070040 | 3042 | 3330 | 0D43 | 3A0A | 3031 | 4541 | 4232 | 3030 |
| 0000070060 | 4338 | 3338 | 4438 | 3238 | 4245 | 3046 | 4437 | 4546 |
| 0000070100 | 4337 | 4630 | 4237 | 4330 | 4338 | 3338 | 4438 | 3238 |
| 0000070120 | 3337 | 0A0D | 313A | 4130 | 3345 | 3042 | 4530 | 4642 |
| 0000070140 | 3730 | 3042 | 3743 | 3041 | 3930 | 3030 | 3030 | 3132 |
| 0000070160 | 3932 | 4646 | 3037 | 3832 | 3935 | 3738 | 3534 | 0D45 |
| 0000070200 | 3A0A | 3031 | 4541 | 4234 | 3030 | 3230 | 3837 | 3030 |
| 0000070220 | 3937 | 3530 | 3231 | 3538 | 3934 | 4237 | 3931 | 4137 |
| 0000070240 | 3032 | 4138 | 3338 | 4238 | 3238 | 3744 | 0A0D | 313A |
| 0000070260 | 4130 | 3545 | 3042 | 4530 | 4630 | 3742 | 3041 | 3830 |
| 0000070300 | 3042 | 3835 | 3041 | 3734 | 3042 | 3734 | 3041 | 4530 |
| 0000070320 | 3542 | 4644 | 4542 | 3441 | 0D45 | 3A0A | 3031 | 4541 |
| 0000070340 | 4236 | 3030 | 4335 | 4234 | 3036 | 3445 | 4237 | 3038 |
| 0000070360 | 4238 | 3841 | 4437 | 4131 | 4337 | 3032 | 4237 | 3630 |
| 0000070400 | 4338 | 3338 | 4246 | 0A0D | 313A | 4130 | 3745 | 3042 |
| 0000070420 | 3830 | 3844 | 4532 | 4642 | 3730 | 3144 | 3742 | 3243 |
| 0000070440 | 3730 | 3034 | 3236 | 4646 | 3835 | 4532 | 3334 | 4645 |
| 0000070460 | 3735 | 0D32 | 3A0A | 3031 | 4541 | 4238 | 3030 | 3338 |
| 0000070500 | 3045 | 4246 | 4338 | 3338 | 4438 | 3238 | 4245 | 3046 |
| 0000070520 | 3437 | 3630 | 4632 | 3546 | 3238 | 3445 | 4533 | 4531 |
| 0000070540 | 0A0D | 313A | 4130 | 3945 | 3042 | 4630 | 3835 | 4533 |
| 0000070560 | 4630 | 3942 | 4530 | 3338 | 4531 | 4642 | 4430 | 3932 |
| 0000070600 | 3735 | 3842 | 3846 | 4142 | 3738 | 4242 | 0D31 | 3A0A |
| 0000070620 | 3031 | 4541 | 4241 | 3030 | 3931 | 4137 | 3032 | 4138 |
| 0000070640 | 3338 | 4238 | 3238 | 3045 | 4246 | 4137 | 3030 | 4238 |
| 0000070660 | 3530 | 4138 | 3430 | 4237 | 4344 | 0A0D | 313A | 4130 |
| 0000070700 | 4245 | 3042 | 3030 | 3738 | 3041 | 4530 | 3542 | 4644 |
| 0000070720 | 4542 | 3541 | 3443 | 3742 | 3030 | 3832 | 4530 | 3732 |
| 0000070740 | 3042 | 3730 | 3634 | 0D45 | 3A0A | 3031 | 4541 | 4243 |
| 0000070760 | 3030 | 3430 | 4632 | 3546 | 3238 | 3445 | 4533 | 3546 |
| 0000071000 | 3338 | 4245 | 3046 | 3437 | 3430 | 4632 | 3546 | 3238 |
| 0000071020 | 3445 | 3635 | 0A0D | 313A | 4130 | 4445 | 3042 | 3330 |
| 0000071040 | 4645 | 3835 | 4533 | 4630 | 3744 | 3042 | 3131 | 3832 |
| 0000071060 | 4430 | 3642 | 3030 | 3744 | 3034 | 3234 | 4646 | 4442 |
| 0000071100 | 0D43 | 3A0A | 3031 | 4541 | 4245 | 3030 | 3445 | 4533 |

THU MAR 14 17:46:30 1991 SUTFILE.HEX PAGE 32, LINE 1830

| | | | | | | | | |
|---|---|---|---|---|---|---|---|---|
| 0000071120 | 4146 | 3231 | 3238 | 4331 | 3130 | 3038 | 3145 | 3243 |
| 0000071140 | 3539 | 3243 | 3439 | 3244 | 3439 | 4437 | 3939 | 0A0D |
| 0000071160 | 313A | 4130 | 4645 | 3042 | 3130 | 3741 | 3243 | 3730 |
| 0000071200 | 3042 | 3835 | 3843 | 3833 | 3844 | 4532 | 4642 | 3030 |
| 0000071220 | 3832 | 3935 | 3738 | 3034 | 3832 | 0D33 | 3A0A | 3031 |
| 0000071240 | 4641 | 4230 | 3030 | 3837 | 3030 | 3937 | 3530 | 3231 |
| 0000071260 | 3538 | 3934 | 4237 | 3030 | 3437 | 3430 | 4632 | 3546 |
| 0000071300 | 3238 | 3445 | 4533 | 3541 | 0A0D | 313A | 4130 | 3146 |
| 0000071320 | 3042 | 4630 | 3835 | 4533 | 4642 | 3730 | 3034 | 3234 |
| 0000071340 | 4646 | 3835 | 4532 | 3334 | 4645 | 3835 | 4533 | 4630 |
| 0000071360 | 3744 | 4334 | 0D41 | 3A0A | 3031 | 4641 | 4232 | 3030 |
| 0000071400 | 3630 | 4632 | 3546 | 3238 | 3445 | 4533 | 3546 | 3338 |
| 0000071420 | 3045 | 4246 | 3231 | 3038 | 4244 | 3036 | 4430 | 3437 |
| 0000071440 | 3741 | 0A0D | 313A | 4130 | 3346 | 3042 | 3030 | 3234 |
| 0000071460 | 4646 | 4542 | 3334 | 4645 | 3141 | 3832 | 3132 | 3043 |
| 0000071500 | 3831 | 4430 | 3038 | 3832 | 3935 | 4538 | 4234 | 0D30 |
| 0000071520 | 3A0A | 4130 | 4641 | 4234 | 3030 | 3837 | 3030 | 3937 |
| 0000071540 | 3430 | 3231 | 3538 | 3934 | 3230 | 3538 | 3839 | 3830 |
| 0000071560 | 0A0D | 303A | 4335 | 3541 | 3043 | 3030 | 3030 | 3030 |
| 0000071600 | 3030 | 3030 | 4430 | 0D35 | 3A0A | 3031 | 4641 | 3535 |
| 0000071620 | 3030 | 3445 | 3837 | 3030 | 3937 | 3430 | 3231 | 3538 |
| 0000071640 | 3934 | 4437 | 3530 | 4337 | 3032 | 4237 | 3030 | 4338 |
| 0000071660 | 3338 | 4238 | 0A0D | 313A | 4130 | 3646 | 3035 | 3830 |
| 0000071700 | 3844 | 4532 | 4642 | 3730 | 3044 | 3734 | 3243 | 3730 |
| 0000071720 | 3642 | 3830 | 3843 | 3833 | 3844 | 4532 | 4642 | 3030 |
| 0000071740 | 0D31 | 3A0A | 3031 | 4641 | 3537 | 3030 | 4437 | 3130 |
| 0000071760 | 4337 | 3032 | 4237 | 4444 | 4338 | 3338 | 4438 | 3238 |
| 0000072000 | 4245 | 3046 | 4437 | 3930 | 4337 | 3032 | 4633 | 0A0D |
| 0000072020 | 313A | 4130 | 3846 | 3035 | 3730 | 4442 | 3844 | 3843 |
| 0000072040 | 3833 | 3844 | 4532 | 4642 | 3730 | 3044 | 3736 | 3243 |
| 0000072060 | 3730 | 3042 | 3830 | 3843 | 4333 | 0D32 | 3A0A | 3031 |
| 0000072100 | 4641 | 3539 | 3030 | 4438 | 3238 | 4245 | 3046 | 3039 |
| 0000072120 | 3845 | 3433 | 3045 | 4246 | 4137 | 3030 | 3231 | 3438 |
| 0000072140 | 3334 | 3030 | 3030 | 3845 | 0A0D | 313A | 4130 | 4146 |
| 0000072160 | 3035 | 3030 | 3034 | 4230 | 4530 | 4143 | 4246 | 4133 |
| 0000072200 | 4646 | 4232 | 3330 | 4231 | 3730 | 4230 | 4130 | 3745 |
| 0000072220 | 3044 | 3137 | 0D36 | 3A0A | 3031 | 4641 | 3542 | 3030 |
| 0000072240 | 4337 | 3032 | 4237 | 3035 | 4338 | 3338 | 4438 | 3238 |
| 0000072260 | 4245 | 3046 | 4437 | 3030 | 4337 | 3032 | 4237 | 3339 |
| 0000072300 | 3530 | 0A0D | 313A | 4130 | 4346 | 3035 | 3830 | 3843 |
| 0000072320 | 3833 | 3844 | 4532 | 4642 | 3730 | 3044 | 3738 | 3243 |
| 0000072340 | 3730 | 3942 | 3833 | 3843 | 3833 | 3844 | 3332 | 0D36 |
| 0000072360 | 3A0A | 3031 | 4641 | 3544 | 3030 | 4245 | 3046 | 4437 |
| 0000072400 | 3030 | 4337 | 3032 | 4237 | 3730 | 4338 | 3338 | 4438 |
| 0000072420 | 3238 | 4245 | 3046 | 4437 | 3830 | 3837 | 0A0D | 313A |
| 0000072440 | 4130 | 4546 | 3035 | 3730 | 3243 | 3730 | 3042 | 3837 |
| 0000072460 | 3843 | 3833 | 3844 | 4532 | 4642 | 3030 | 4232 | 4530 |
| 0000072500 | 3745 | 3044 | 3737 | 4143 | 0D35 | 3A0A | 3031 | 4641 |
| 0000072520 | 3546 | 3030 | 3032 | 4237 | 3035 | 4338 | 3338 | 4438 |
| 0000072540 | 3238 | 4245 | 3046 | 4437 | 3030 | 4337 | 3032 | 4237 |
| 0000072560 | 3338 | 4338 | 3543 | 0A0D | 313A | 4230 | 3030 | 3035 |
| 0000072600 | 3830 | 3833 | 3844 | 4532 | 4642 | 3730 | 3044 | 3738 |
| 0000072620 | 3243 | 3730 | 3842 | 3833 | 3843 | 3833 | 3844 | 4532 |
| 0000072640 | 4142 | 0D36 | 3A0A | 3031 | 3042 | 3531 | 3030 | 3046 |
| 0000072660 | 4437 | 3030 | 4337 | 3032 | 4237 | 3730 | 4338 | 3338 |
| 0000072700 | 4438 | 3238 | 4245 | 3046 | 4437 | 3830 | 4337 | 3641 |
| 0000072720 | 0A0D | 313A | 4230 | 3230 | 3035 | 3230 | 3730 | 3042 |
| 0000072740 | 3837 | 3843 | 3833 | 3844 | 4532 | 4642 | 3030 | 4232 |
| 0000072760 | 4530 | 3745 | 3044 | 3737 | 3243 | 4330 | 0D30 | 3A0A |

THU MAR 14 17:46:30 1991 SUTFILE.HEX PAGE 33, LINE 1889

| | | | | | | | | |
|---|---|---|---|---|---|---|---|---|
| 0000073000 | 3031 | 3042 | 3533 | 3030 | 4237 | 3035 | 4338 | 3338 |
| 0000073020 | 4438 | 3238 | 4245 | 3046 | 4437 | 3030 | 4337 | 3032 |
| 0000073040 | 4237 | 3239 | 4338 | 3338 | 3231 | 0A0D | 313A | 4230 |
| 0000073060 | 3430 | 3035 | 3830 | 3844 | 4532 | 4642 | 3730 | 3044 |
| 0000073100 | 3738 | 3243 | 3730 | 3942 | 3832 | 3843 | 3833 | 3844 |
| 0000073120 | 4532 | 4642 | 4530 | 0D41 | 3A0A | 3031 | 3042 | 3535 |
| 0000073140 | 3030 | 4437 | 3030 | 4337 | 3032 | 4237 | 3730 | 4338 |
| 0000073160 | 3338 | 4438 | 3238 | 4245 | 3046 | 4437 | 3830 | 4337 |
| 0000073200 | 3032 | 3633 | 0A0D | 313A | 4230 | 3630 | 3035 | 3730 |
| 0000073220 | 3042 | 3837 | 3843 | 3833 | 3844 | 4532 | 4642 | 3030 |
| 0000073240 | 4232 | 4530 | 3745 | 3044 | 3737 | 3243 | 3730 | 3242 |
| 0000073260 | 0D35 | 3A0A | 3031 | 3042 | 3537 | 3030 | 3730 | 4338 |
| 0000073300 | 3338 | 4438 | 3238 | 4245 | 3046 | 4437 | 3030 | 4337 |
| 0000073320 | 3032 | 4237 | 3738 | 4338 | 3338 | 4438 | 3431 | 0A0D |
| 0000073340 | 313A | 4230 | 3830 | 3035 | 3830 | 4532 | 4642 | 3730 |
| 0000073360 | 3044 | 3738 | 3243 | 3730 | 3842 | 3837 | 3843 | 3833 |
| 0000073400 | 3844 | 4532 | 4642 | 3730 | 4344 | 0D35 | 3A0A | 3031 |
| 0000073420 | 3042 | 3539 | 3030 | 3030 | 4337 | 3032 | 4237 | 4630 |
| 0000073440 | 4338 | 3338 | 4438 | 3238 | 4245 | 3046 | 4437 | 3830 |
| 0000073460 | 4337 | 3032 | 4237 | 3046 | 0A0D | 313A | 4230 | 4130 |
| 0000073500 | 3035 | 3030 | 3846 | 3843 | 3833 | 3844 | 4532 | 4642 |
| 0000073520 | 3830 | 3430 | 3730 | 3044 | 3737 | 3243 | 3730 | 3042 |
| 0000073540 | 3841 | 4143 | 0D32 | 3A0A | 3031 | 3042 | 3542 | 3030 |
| 0000073560 | 3338 | 4438 | 3238 | 4245 | 3046 | 4437 | 3030 | 4337 |
| 0000073600 | 3032 | 4237 | 3339 | 4338 | 3338 | 4438 | 3238 | 4245 |
| 0000073620 | 4545 | 0A0D | 313A | 4230 | 4330 | 3035 | 4630 | 3730 |
| 0000073640 | 3044 | 3738 | 3243 | 3730 | 3942 | 3833 | 3843 | 3833 |
| 0000073660 | 3844 | 4532 | 4642 | 3730 | 3044 | 3730 | 3643 | 0D41 |
| 0000073700 | 3A0A | 3031 | 3042 | 3544 | 3030 | 3032 | 4237 | 3730 |
| 0000073720 | 4338 | 3338 | 4438 | 3238 | 4245 | 3046 | 4437 | 3830 |
| 0000073740 | 4337 | 3032 | 4237 | 3730 | 4338 | 3141 | 0A0D | 313A |
| 0000073760 | 4230 | 4530 | 3035 | 3830 | 3833 | 3844 | 4532 | 4642 |
| 0000074000 | 3830 | 3030 | 3832 | 3030 | 3730 | 3042 | 3745 | 3241 |
| 0000074020 | 3830 | 3841 | 3833 | 3342 | 0D31 | 3A0A | 3031 | 3042 |
| 0000074040 | 3546 | 3030 | 3238 | 3045 | 4246 | 4437 | 3230 | 4337 |
| 0000074060 | 3032 | 4237 | 3530 | 4338 | 3338 | 4438 | 3238 | 4245 |
| 0000074100 | 3046 | 4437 | 4444 | 0A0D | 313A | 4230 | 3031 | 3035 |
| 0000074120 | 3030 | 3741 | 3243 | 3730 | 3042 | 3835 | 3843 | 3833 |
| 0000074140 | 3844 | 4532 | 4642 | 3730 | 3044 | 3735 | 3243 | 3730 |
| 0000074160 | 3842 | 0D32 | 3A0A | 3031 | 3142 | 3531 | 3030 | 3232 |
| 0000074200 | 4338 | 3338 | 4438 | 3238 | 4245 | 3046 | 3230 | 3538 |
| 0000074220 | 3839 | 3445 | 3837 | 3030 | 3937 | 3630 | 3231 | 3330 |
| 0000074240 | 0A0D | 313A | 4230 | 3231 | 3035 | 3830 | 3435 | 3939 |
| 0000074260 | 4530 | 3030 | 4537 | 3630 | 3230 | 3742 | 3042 | 3730 |
| 0000074300 | 3041 | 3730 | 3034 | 3234 | 4646 | 4435 | 0D39 | 3A0A |
| 0000074320 | 3031 | 3142 | 3533 | 3030 | 3238 | 3445 | 4533 | 3546 |
| 0000074340 | 3338 | 4145 | 3046 | 4245 | 3341 | 3046 | 4437 | 3030 |
| 0000074360 | 4337 | 3030 | 4237 | 3030 | 3232 | 0A0D | 313A | 4230 |
| 0000074400 | 3431 | 3035 | 3830 | 3843 | 3833 | 3844 | 4532 | 4642 |
| 0000074420 | 3730 | 3034 | 3234 | 4646 | 4542 | 3334 | 4645 | 3941 |
| 0000074440 | 3030 | 3030 | 4232 | 0D31 | 3A0A | 3031 | 3142 | 3535 |
| 0000074460 | 3030 | 3231 | 3543 | 4645 | 4237 | 3030 | 3039 | 3045 |
| 0000074500 | 3730 | 4245 | 3046 | 3039 | 3845 | 3433 | 3045 | 4246 |
| 0000074520 | 3043 | 3031 | 0A0D | 313A | 4230 | 3631 | 3035 | 3030 |
| 0000074540 | 3733 | 3044 | 3130 | 3832 | 3531 | 4430 | 3030 | 3733 |
| 0000074560 | 3030 | 3739 | 3842 | 3937 | 4530 | 3438 | 4532 | 3842 |
| 0000074600 | 0D34 | 3A0A | 3031 | 3142 | 3537 | 3030 | 3046 | 3038 |
| 0000074620 | 4133 | 3043 | 3330 | 4437 | 3130 | 3231 | 3138 | 3035 |
| 0000074640 | 3044 | 3330 | 3037 | 3930 | 4237 | 3839 | 4439 | 0A0D |

THU MAR 14 17:46:30 1991 SUTFILE.HEX PAGE 34, LINE 1948

| | | | | | | | | |
|---|---|---|---|---|---|---|---|---|
| 0000074660 | 313A | 4230 | 3831 | 3035 | 3930 | 4530 | 3438 | 4532 |
| 0000074700 | 4642 | 3830 | 3230 | 4336 | 3030 | 3733 | 3044 | 3132 |
| 0000074720 | 3832 | 3531 | 4430 | 3030 | 3833 | 0D37 | 3A0A | 3031 |
| 0000074740 | 3142 | 3539 | 3030 | 3037 | 3930 | 4237 | 3043 | 3039 |
| 0000074760 | 3845 | 3234 | 4245 | 3046 | 3038 | 3231 | 4437 | 3330 |
| 0000075000 | 3231 | 3138 | 3035 | 4336 | 0A0D | 313A | 4230 | 4131 |
| 0000075020 | 3035 | 3730 | 3030 | 3739 | 3042 | 3930 | 4530 | 3438 |
| 0000075040 | 4532 | 4642 | 3830 | 3030 | 3832 | 3030 | 3730 | 3042 |
| 0000075060 | 3930 | 3030 | 0D34 | 3A0A | 3031 | 3142 | 3542 | 3030 |
| 0000075100 | 3845 | 3035 | 4245 | 3046 | 4237 | 3030 | 3039 | 3045 |
| 0000075120 | 3630 | 4245 | 3046 | 4237 | 4646 | 3039 | 3845 | 3334 |
| 0000075140 | 3637 | 0A0D | 313A | 4230 | 4331 | 3035 | 4530 | 4642 |
| 0000075160 | 3730 | 3042 | 3930 | 4530 | 3338 | 4535 | 4642 | 3730 |
| 0000075200 | 3042 | 3930 | 4530 | 3438 | 4531 | 4642 | 3830 | 0D44 |
| 0000075220 | 3A0A | 3031 | 3142 | 3544 | 3030 | 4237 | 3030 | 4137 |
| 0000075240 | 3030 | 3039 | 3845 | 4334 | 4145 | 3046 | 4245 | 3341 |
| 0000075260 | 3046 | 4237 | 3030 | 4137 | 3030 | 3436 | 0A0D | 313A |
| 0000075300 | 4230 | 4531 | 3035 | 3930 | 4530 | 3438 | 4545 | 4641 |
| 0000075320 | 4530 | 4142 | 4633 | 3030 | 3832 | 3935 | 4538 | 3734 |
| 0000075340 | 3038 | 3730 | 3039 | 3435 | 0D33 | 3A0A | 3031 | 3142 |
| 0000075360 | 3546 | 3030 | 3231 | 3538 | 3934 | 4237 | 3330 | 4137 |
| 0000075400 | 3032 | 4138 | 3338 | 4238 | 3238 | 3045 | 4246 | 3437 |
| 0000075420 | 3430 | 4632 | 3642 | 0A0D | 313A | 4230 | 3032 | 3035 |
| 0000075440 | 4630 | 3835 | 4532 | 3334 | 4645 | 3835 | 4533 | 4642 |
| 0000075460 | 3930 | 4530 | 3338 | 4535 | 3730 | 3530 | 3742 | 3034 |
| 0000075500 | 3734 | 0D44 | 3A0A | 3031 | 3242 | 3531 | 3030 | 4632 |
| 0000075520 | 3546 | 3238 | 3445 | 4533 | 3546 | 3338 | 3045 | 4446 |
| 0000075540 | 4337 | 3030 | 4237 | 3846 | 4137 | 3030 | 4245 | 3842 |
| 0000075560 | 0A0D | 313A | 4230 | 3232 | 3035 | 3530 | 4644 | 4542 |
| 0000075600 | 3541 | 4643 | 3841 | 3042 | 3835 | 3041 | 3734 | 3842 |
| 0000075620 | 3730 | 3041 | 4530 | 3642 | 4644 | 3942 | 0D42 | 3A0A |
| 0000075640 | 3031 | 3242 | 3533 | 3030 | 4145 | 4336 | 4234 | 3036 |
| 0000075660 | 3433 | 4237 | 3930 | 4137 | 3032 | 4138 | 3338 | 4238 |
| 0000075700 | 3238 | 3045 | 4246 | 4137 | 3734 | 0A0D | 313A | 4230 |
| 0000075720 | 3432 | 3035 | 3030 | 3830 | 3042 | 3835 | 3041 | 3734 |
| 0000075740 | 3042 | 3734 | 3041 | 4530 | 3542 | 4644 | 4542 | 3541 |
| 0000075760 | 3443 | 3642 | 4130 | 0D45 | 3A0A | 3031 | 3242 | 3535 |
| 0000076000 | 3030 | 3445 | 4437 | 4230 | 4337 | 3032 | 3437 | 3430 |
| 0000076020 | 4632 | 3546 | 3238 | 3445 | 4533 | 3546 | 3338 | 3045 |
| 0000076040 | 4246 | 4534 | 0A0D | 313A | 4230 | 3632 | 3035 | 3830 |
| 0000076060 | 3843 | 3833 | 3844 | 4532 | 4642 | 3030 | 4232 | 4333 |
| 0000076100 | 3943 | 4530 | 3030 | 4544 | 4630 | 3744 | 3042 | 3835 |
| 0000076120 | 0D35 | 3A0A | 3031 | 3242 | 3537 | 3030 | 4445 | 4236 |
| 0000076140 | 3036 | 3230 | 3437 | 4646 | 3430 | 3037 | 3330 | 3230 |
| 0000076160 | 3342 | 4343 | 3437 | 3430 | 4632 | 3546 | 3830 | 0A0D |
| 0000076200 | 313A | 4230 | 3832 | 3035 | 3830 | 4532 | 3334 | 4645 |
| 0000076220 | 3835 | 4533 | 4630 | 3744 | 3342 | 3736 | 4541 | 3138 |
| 0000076240 | 3832 | 4335 | 3842 | 3042 | 4235 | 0D42 | 3A0A | 3031 |
| 0000076260 | 3242 | 3539 | 3030 | 4138 | 3430 | 3039 | 3845 | 3533 |
| 0000076300 | 3045 | 4246 | 3430 | 3046 | 4137 | 3030 | 4245 | 4432 |
| 0000076320 | 4246 | 4145 | 4333 | 4345 | 0A0D | 313A | 4230 | 4132 |
| 0000076340 | 3035 | 4630 | 3141 | 3832 | 4535 | 3837 | 3841 | 3833 |
| 0000076360 | 3842 | 4532 | 4644 | 4630 | 3942 | 4530 | 3338 | 4535 |
| 0000076400 | 4630 | 4144 | 0D35 | 3A0A | 3031 | 3242 | 3542 | 3030 |
| 0000076420 | 4237 | 3530 | 4445 | 4236 | 3036 | 3230 | 3437 | 4646 |
| 0000076440 | 3430 | 3037 | 3330 | 3230 | 3342 | 4343 | 3039 | 3845 |
| 0000076460 | 4336 | 0A0D | 313A | 4230 | 4332 | 3035 | 3330 | 4537 |
| 0000076500 | 4630 | 3744 | 3043 | 3730 | 3842 | 3730 | 3041 | 4530 |
| 0000076520 | 3542 | 4644 | 4542 | 3541 | 3443 | 3642 | 3430 | 0D30 |

THU MAR 14 17:46:30 1991 SUTFILE.HEX PAGE 35, LINE 2007

| | | | | | | | | |
|---|---|---|---|---|---|---|---|---|
| 0000076540 | 3A0A | 3031 | 3242 | 3544 | 3030 | 4231 | 3039 | 3845 |
| 0000076560 | 3733 | 3045 | 4446 | 4337 | 3030 | 4237 | 3030 | 4137 |
| 0000076600 | 4646 | 4245 | 4434 | 4246 | 4145 | 3533 | 0A0D | 313A |
| 0000076620 | 4230 | 4532 | 3035 | 3430 | 4643 | 3941 | 4530 | 3438 |
| 0000076640 | 4534 | 4641 | 4530 | 4142 | 4633 | 3830 | 3030 | 3946 |
| 0000076660 | 4530 | 3338 | 4537 | 4530 | 0D31 | 3A0A | 3031 | 3242 |
| 0000076700 | 3546 | 3030 | 4246 | 4137 | 3030 | 3039 | 3845 | 3434 |
| 0000076720 | 4145 | 3046 | 4245 | 3341 | 3046 | 3039 | 3845 | 3933 |
| 0000076740 | 3045 | 4446 | 3233 | 0A0D | 313A | 4230 | 3033 | 3035 |
| 0000076760 | 3730 | 3043 | 3730 | 3842 | 3730 | 3041 | 4530 | 3542 |
| 0000077000 | 4644 | 4542 | 3541 | 3443 | 3642 | 3130 | 3942 | 4530 |
| 0000077020 | 3838 | 0D30 | 3A0A | 3031 | 3342 | 3531 | 3030 | 3933 |
| 0000077040 | 3045 | 4446 | 4337 | 3030 | 4237 | 3030 | 4137 | 4646 |
| 0000077060 | 4245 | 4434 | 4246 | 4145 | 4334 | 4146 | 3039 | 4641 |
| 0000077100 | 0A0D | 313A | 4230 | 3233 | 3035 | 4530 | 3438 | 4536 |
| 0000077120 | 4641 | 4530 | 4142 | 4633 | 3830 | 3030 | 3946 | 4530 |
| 0000077140 | 3338 | 4539 | 4630 | 3742 | 3041 | 4630 | 0D44 | 3A0A |
| 0000077160 | 3031 | 3342 | 3533 | 3030 | 3039 | 3845 | 3634 | 4145 |
| 0000077200 | 3046 | 4245 | 3341 | 3046 | 3039 | 3845 | 3833 | 3045 |
| 0000077220 | 4446 | 4337 | 3030 | 4237 | 4536 | 0A0D | 313A | 4230 |
| 0000077240 | 3433 | 3035 | 3830 | 3730 | 3041 | 4530 | 3542 | 4644 |
| 0000077260 | 4542 | 3541 | 3443 | 3642 | 3130 | 3942 | 4530 | 3338 |
| 0000077300 | 4538 | 4630 | 3244 | 0D32 | 3A0A | 3031 | 3342 | 3535 |
| 0000077320 | 3030 | 4337 | 3030 | 4237 | 3030 | 4137 | 4646 | 4245 |
| 0000077340 | 4434 | 4246 | 4145 | 4334 | 4146 | 3039 | 3845 | 3834 |
| 0000077360 | 4145 | 4236 | 0A0D | 313A | 4230 | 3633 | 3035 | 4630 |
| 0000077400 | 4530 | 4142 | 4633 | 3830 | 3030 | 3946 | 4530 | 3338 |
| 0000077420 | 4538 | 4630 | 3742 | 3041 | 3930 | 4530 | 3438 | 3138 |
| 0000077440 | 0D36 | 3A0A | 3031 | 3342 | 3537 | 3030 | 4145 | 3046 |
| 0000077460 | 4245 | 3341 | 3046 | 3039 | 3845 | 4133 | 3045 | 4446 |
| 0000077500 | 4337 | 3030 | 4237 | 3038 | 4137 | 3030 | 3046 | 0A0D |
| 0000077520 | 313A | 4230 | 3833 | 3035 | 4530 | 3542 | 4644 | 4542 |
| 0000077540 | 3541 | 3443 | 3642 | 3130 | 3942 | 4530 | 3338 | 4541 |
| 0000077560 | 4630 | 3744 | 3043 | 3730 | 4542 | 0D33 | 3A0A | 3031 |
| 0000077600 | 3342 | 3539 | 3030 | 3030 | 4137 | 4646 | 4245 | 4434 |
| 0000077620 | 4246 | 4145 | 4334 | 4146 | 3039 | 3845 | 4134 | 4145 |
| 0000077640 | 3046 | 4245 | 3341 | 3241 | 0A0D | 313A | 4230 | 4133 |
| 0000077660 | 3035 | 4630 | 3830 | 3030 | 3946 | 4530 | 3338 | 4541 |
| 0000077700 | 4630 | 3742 | 3041 | 3930 | 4530 | 3438 | 4541 | 4641 |
| 0000077720 | 4530 | 3842 | 0D42 | 3A0A | 3031 | 3342 | 3542 | 3030 |
| 0000077740 | 3341 | 3046 | 4437 | 3430 | 4237 | 4630 | 4137 | 3045 |
| 0000077760 | 4138 | 3338 | 4238 | 3238 | 3045 | 4434 | 3046 | 4246 |
| 0000100000 | 4535 | 0A0D | 313A | 4230 | 4333 | 3035 | 3730 | 3042 |
| 0000100020 | 3930 | 4530 | 3338 | 4535 | 4642 | 3030 | 3832 | 3935 |
| 0000100040 | 4538 | 3734 | 3038 | 3730 | 3039 | 3135 | 3632 | 0D41 |
| 0000100060 | 3A0A | 3031 | 3342 | 3544 | 3030 | 3538 | 3934 | 4237 |
| 0000100100 | 3330 | 4137 | 3032 | 4138 | 3338 | 4238 | 3238 | 3045 |
| 0000100120 | 4246 | 3437 | 3430 | 4632 | 3546 | 3146 | 0A0D | 313A |
| 0000100140 | 4230 | 4533 | 3035 | 3830 | 4532 | 3334 | 4645 | 3835 |
| 0000100160 | 4533 | 4642 | 3730 | 3034 | 3234 | 4646 | 3835 | 4532 |
| 0000100200 | 3334 | 4645 | 3835 | 4133 | 0D39 | 3A0A | 3031 | 3342 |
| 0000100220 | 3546 | 3030 | 3045 | 4446 | 4237 | 4434 | 4445 | 4236 |
| 0000100240 | 3036 | 3230 | 3437 | 4646 | 3430 | 3037 | 4332 | 3437 |
| 0000100260 | 3430 | 4632 | 4632 | 0A0D | 313A | 4230 | 3034 | 3035 |
| 0000100300 | 4630 | 3835 | 4532 | 3334 | 4645 | 3835 | 4533 | 4630 |
| 0000100320 | 3744 | 3742 | 4545 | 3644 | 3642 | 3030 | 3732 | 4634 |
| 0000100340 | 3246 | 0D33 | 3A0A | 3031 | 3442 | 3531 | 3030 | 3430 |
| 0000100360 | 3037 | 3631 | 3437 | 3430 | 4632 | 3546 | 3238 | 3445 |
| 0000100400 | 4533 | 3546 | 3338 | 3045 | 4446 | 4237 | 4637 | 4530 |

THU MAR 14 17:46:30 1991 SUTFILE.HEX PAGE 36, LINE 2066

| | | | | | | | | |
|---|---|---|---|---|---|---|---|---|
| 0000100420 | 0A0D | 313A | 4230 | 3234 | 3035 | 4530 | 3644 | 3642 |
| 0000100440 | 3030 | 3732 | 4634 | 3046 | 3634 | 3330 | 3744 | 3042 |
| 0000100460 | 3930 | 4530 | 3338 | 4535 | 4642 | 3430 | 0D36 | 3A0A |
| 0000100500 | 3031 | 3442 | 3533 | 3030 | 4237 | 3930 | 4137 | 3032 |
| 0000100520 | 4138 | 3338 | 4238 | 3238 | 3045 | 4246 | 4137 | 3030 |
| 0000100540 | 4238 | 3530 | 4138 | 3430 | 4335 | 0A0D | 313A | 4230 |
| 0000100560 | 3434 | 3035 | 3730 | 3042 | 3734 | 3041 | 4530 | 3542 |
| 0000100600 | 4644 | 4542 | 3541 | 3443 | 3742 | 3030 | 3832 | 4530 |
| 0000100620 | 3732 | 3044 | 4342 | 0D45 | 3A0A | 3031 | 3442 | 3535 |
| 0000100640 | 3030 | 4337 | 3032 | 3437 | 3430 | 4632 | 3546 | 3238 |
| 0000100660 | 3445 | 4533 | 3546 | 3338 | 3045 | 4246 | 4338 | 3338 |
| 0000100700 | 4438 | 4331 | 0A0D | 313A | 4230 | 3634 | 3035 | 3830 |
| 0000100720 | 4532 | 4642 | 3030 | 4232 | 3936 | 3938 | 4530 | 3338 |
| 0000100740 | 4535 | 3730 | 3130 | 3743 | 3034 | 3234 | 4646 | 3735 |
| 0000100760 | 0D35 | 3A0A | 3031 | 3442 | 3537 | 3030 | 3238 | 3445 |
| 0000101000 | 4533 | 3546 | 3338 | 3045 | 4446 | 4337 | 3030 | 4237 |
| 0000101020 | 3043 | 4137 | 3030 | 4245 | 4435 | 4246 | 4135 | 0A0D |
| 0000101040 | 313A | 4230 | 3834 | 3035 | 4530 | 3541 | 3443 | 3742 |
| 0000101060 | 3030 | 3033 | 4232 | 3936 | 3738 | 3034 | 3234 | 4646 |
| 0000101100 | 3835 | 4532 | 3334 | 4645 | 3235 | 0D45 | 3A0A | 3031 |
| 0000101120 | 3442 | 3539 | 3030 | 3338 | 3045 | 4446 | 4237 | 3633 |
| 0000101140 | 4137 | 3845 | 3231 | 3538 | 4243 | 4238 | 3530 | 4138 |
| 0000101160 | 3430 | 3039 | 3845 | 4333 | 0A0D | 313A | 4230 | 4134 |
| 0000101200 | 3035 | 3330 | 4535 | 4630 | 3042 | 4634 | 3730 | 3041 |
| 0000101220 | 4530 | 3242 | 4644 | 4542 | 3341 | 4643 | 3141 | 3832 |
| 0000101240 | 4535 | 3637 | 0D38 | 3A0A | 3031 | 3442 | 3542 | 3030 |
| 0000101260 | 4138 | 3338 | 4238 | 3238 | 4445 | 3046 | 4246 | 3039 |
| 0000101300 | 3845 | 3633 | 3045 | 4446 | 4237 | 3634 | 4445 | 4236 |
| 0000101320 | 3146 | 0A0D | 313A | 4230 | 4334 | 3035 | 3630 | 3030 |
| 0000101340 | 3732 | 4634 | 3046 | 3734 | 3130 | 3930 | 4530 | 3338 |
| 0000101360 | 4536 | 4630 | 3744 | 3442 | 4532 | 3644 | 3742 | 0D45 |
| 0000101400 | 3A0A | 3031 | 3442 | 3544 | 3030 | 3036 | 3230 | 3437 |
| 0000101420 | 4646 | 3430 | 3036 | 4636 | 4237 | 4646 | 3039 | 3045 |
| 0000101440 | 3630 | 4245 | 3046 | 4237 | 3930 | 3037 | 0A0D | 313A |
| 0000101460 | 4230 | 4534 | 3035 | 3730 | 3241 | 3830 | 3841 | 3833 |
| 0000101500 | 3842 | 4532 | 4630 | 3742 | 3041 | 3830 | 3042 | 3835 |
| 0000101520 | 3041 | 3734 | 3042 | 4234 | 0D31 | 3A0A | 3031 | 3442 |
| 0000101540 | 3546 | 3030 | 4137 | 3030 | 4245 | 4435 | 4246 | 4145 |
| 0000101560 | 4335 | 4234 | 3036 | 3445 | 4437 | 4230 | 4337 | 3032 |
| 0000101600 | 4237 | 3533 | 3145 | 0A0D | 313A | 4230 | 3035 | 3035 |
| 0000101620 | 3730 | 4541 | 3138 | 3832 | 4435 | 3839 | 3042 | 3835 |
| 0000101640 | 3041 | 3934 | 4530 | 3338 | 4535 | 4630 | 3742 | 3041 |
| 0000101660 | 3430 | 0D34 | 3A0A | 3031 | 3542 | 3531 | 3030 | 4245 |
| 0000101700 | 4432 | 4246 | 4145 | 4333 | 4146 | 3231 | 3538 | 4545 |
| 0000101720 | 4138 | 3338 | 4238 | 3238 | 3045 | 4246 | 4338 | 4445 |
| 0000101740 | 0A0D | 313A | 4230 | 3235 | 3035 | 3830 | 3833 | 3844 |
| 0000101760 | 4532 | 4642 | 3930 | 4530 | 3338 | 4535 | 4630 | 3744 |
| 0000102000 | 3042 | 4533 | 3644 | 3642 | 3030 | 4532 | 0D37 | 3A0A |
| 0000102020 | 3031 | 3542 | 3533 | 3030 | 3437 | 4646 | 3430 | 3036 |
| 0000102040 | 4530 | 4237 | 3030 | 3039 | 3045 | 3630 | 4245 | 3046 |
| 0000102060 | 4237 | 3030 | 3039 | 3845 | 3236 | 0A0D | 313A | 4230 |
| 0000102100 | 3435 | 3035 | 3330 | 4535 | 4642 | 3030 | 4232 | 3936 |
| 0000102120 | 3938 | 4530 | 3338 | 4535 | 4630 | 3744 | 3042 | 4533 |
| 0000102140 | 3644 | 3642 | 4430 | 0D36 | 3A0A | 3031 | 3542 | 3535 |
| 0000102160 | 3030 | 3230 | 3437 | 4646 | 3430 | 3037 | 3330 | 3230 |
| 0000102200 | 3642 | 3839 | 4237 | 3030 | 3039 | 3845 | 3533 | 4245 |
| 0000102220 | 3046 | 3741 | 0A0D | 313A | 4230 | 3635 | 3035 | 3930 |
| 0000102240 | 4530 | 3030 | 4544 | 4630 | 3744 | 3042 | 4535 | 3644 |
| 0000102260 | 3642 | 3030 | 3732 | 4634 | 3046 | 3734 | 3030 | 3533 |

THU MAR 14 17:46:30 1991 SUTFILE.HEX PAGE 37, LINE 2125

| | | | | | | | | |
|---|---|---|---|---|---|---|---|---|
| 0000102300 | 0D38 | 3A0A | 3031 | 3542 | 3537 | 3030 | 3230 | 3642 |
| 0000102320 | 3839 | 3039 | 3845 | 3633 | 3045 | 4446 | 4337 | 3030 |
| 0000102340 | 4237 | 3230 | 4137 | 3030 | 4245 | 4435 | 3033 | 0A0D |
| 0000102360 | 313A | 4230 | 3835 | 3035 | 4630 | 4542 | 3541 | 3443 |
| 0000102400 | 3642 | 3330 | 3935 | 4530 | 3338 | 4536 | 4630 | 3744 |
| 0000102420 | 3043 | 3730 | 3042 | 3136 | 4632 | 0D42 | 3A0A | 3031 |
| 0000102440 | 3542 | 3539 | 3030 | 3238 | 4344 | 4238 | 3530 | 4138 |
| 0000102460 | 3430 | 3039 | 3845 | 3733 | 3045 | 4246 | 4137 | 3030 |
| 0000102500 | 4245 | 4434 | 4246 | 3346 | 0A0D | 313A | 4230 | 4135 |
| 0000102520 | 3035 | 4530 | 3441 | 4643 | 3841 | 3042 | 3835 | 3041 |
| 0000102540 | 3734 | 3042 | 3730 | 4641 | 4546 | 3442 | 4644 | 4542 |
| 0000102560 | 3441 | 4543 | 0D42 | 3A0A | 3031 | 3542 | 3542 | 3030 |
| 0000102600 | 4146 | 3039 | 3845 | 3434 | 4145 | 3046 | 4245 | 3341 |
| 0000102620 | 3046 | 3038 | 3333 | 3039 | 3845 | 3633 | 3045 | 4446 |
| 0000102640 | 4133 | 0A0D | 313A | 4230 | 4335 | 3035 | 3730 | 3043 |
| 0000102660 | 3730 | 3042 | 3136 | 3832 | 4432 | 3843 | 3042 | 3835 |
| 0000102700 | 3041 | 3934 | 4530 | 3338 | 4537 | 4630 | 3642 | 0D31 |
| 0000102720 | 3A0A | 3031 | 3542 | 3544 | 3030 | 4137 | 3030 | 4245 |
| 0000102740 | 4434 | 4246 | 4145 | 4334 | 4146 | 4238 | 3530 | 4138 |
| 0000102760 | 3430 | 4237 | 4646 | 4137 | 3030 | 3737 | 0A0D | 313A |
| 0000103000 | 4230 | 4535 | 3035 | 4530 | 3542 | 4644 | 4542 | 3541 |
| 0000103020 | 4643 | 3941 | 4530 | 3438 | 4534 | 4641 | 4530 | 4142 |
| 0000103040 | 4633 | 3930 | 4530 | 3438 | 0D37 | 3A0A | 3031 | 3542 |
| 0000103060 | 3546 | 3030 | 3633 | 3045 | 4446 | 4337 | 3030 | 4237 |
| 0000103100 | 3830 | 4137 | 3030 | 4245 | 4435 | 4246 | 4145 | 4335 |
| 0000103120 | 4234 | 3036 | 3638 | 0A0D | 313A | 4230 | 3036 | 3035 |
| 0000103140 | 3430 | 3933 | 4530 | 3338 | 4536 | 4630 | 3744 | 3043 |
| 0000103160 | 3730 | 3042 | 3743 | 3041 | 4530 | 3542 | 4644 | 4542 |
| 0000103200 | 4241 | 0D44 | 3A0A | 3031 | 3642 | 3531 | 3030 | 4335 |
| 0000103220 | 4146 | 4238 | 3530 | 4138 | 3430 | 4237 | 3430 | 3231 |
| 0000103240 | 3238 | 4344 | 4238 | 3530 | 4138 | 3430 | 3039 | 3431 |
| 0000103260 | 0A0D | 313A | 4230 | 3236 | 3035 | 4530 | 3338 | 4538 |
| 0000103300 | 4630 | 3742 | 3041 | 4530 | 3442 | 4644 | 4542 | 3441 |
| 0000103320 | 4643 | 3841 | 3042 | 3835 | 3041 | 3134 | 0D46 | 3A0A |
| 0000103340 | 3031 | 3642 | 3533 | 3030 | 4237 | 3030 | 4137 | 4646 |
| 0000103360 | 4245 | 4434 | 4246 | 4145 | 4334 | 4146 | 3039 | 3845 |
| 0000103400 | 3834 | 4145 | 3046 | 4245 | 3932 | 0A0D | 313A | 4230 |
| 0000103420 | 3436 | 3035 | 4130 | 4633 | 3830 | 3430 | 3931 | 4530 |
| 0000103440 | 3338 | 4536 | 4630 | 3744 | 3043 | 3730 | 3042 | 3743 |
| 0000103460 | 3041 | 4530 | 4142 | 0D45 | 3A0A | 3031 | 3642 | 3535 |
| 0000103500 | 3030 | 4435 | 4246 | 4145 | 4335 | 4146 | 4238 | 3530 |
| 0000103520 | 4138 | 3430 | 4237 | 3430 | 3231 | 3238 | 4344 | 4238 |
| 0000103540 | 3530 | 3042 | 0A0D | 313A | 4230 | 3636 | 3035 | 3830 |
| 0000103560 | 3041 | 3934 | 4530 | 3338 | 4538 | 4630 | 3742 | 3041 |
| 0000103600 | 4530 | 3442 | 4644 | 4542 | 3441 | 4643 | 3841 | 3542 |
| 0000103620 | 0D34 | 3A0A | 3031 | 3642 | 3537 | 3030 | 3530 | 4138 |
| 0000103640 | 3430 | 4237 | 4646 | 4137 | 3030 | 4245 | 4435 | 4246 |
| 0000103660 | 4145 | 4335 | 4146 | 3039 | 3845 | 3834 | 4246 | 0A0D |
| 0000103700 | 313A | 4230 | 3836 | 3035 | 4530 | 4641 | 4530 | 4142 |
| 0000103720 | 4633 | 3730 | 3044 | 3734 | 3042 | 3746 | 4541 | 3830 |
| 0000103740 | 3841 | 3833 | 3842 | 4532 | 4630 | 0D45 | 3A0A | 3031 |
| 0000103760 | 3642 | 3539 | 3030 | 4434 | 3046 | 4246 | 3230 | 3538 |
| 0000104000 | 3839 | 3445 | 3837 | 3030 | 3937 | 3530 | 3231 | 3538 |
| 0000104020 | 3934 | 4237 | 3330 | 3631 | 0A0D | 313A | 4230 | 4136 |
| 0000104040 | 3035 | 3730 | 3241 | 3830 | 3841 | 3833 | 3842 | 4532 |
| 0000104060 | 4630 | 3742 | 3034 | 3234 | 4646 | 3835 | 4532 | 3334 |
| 0000104100 | 4645 | 4435 | 0D31 | 3A0A | 3031 | 3642 | 3542 | 3030 |
| 0000104120 | 3338 | 4245 | 3046 | 3039 | 3045 | 4430 | 3045 | 4446 |
| 0000104140 | 4237 | 3530 | 4445 | 4236 | 3036 | 3230 | 3437 | 4646 |

THU MAR 14 17:46:30 1991 SUTFILE.HEX PAGE 38, LINE 2184

| | | | | | | | | |
|---|---|---|---|---|---|---|---|---|
| 0000104160 | 3032 | 0A0D | 313A | 4230 | 4336 | 3035 | 3030 | 3734 |
| 0000104200 | 3030 | 3033 | 4232 | 4237 | 3733 | 3034 | 3234 | 4646 |
| 0000104220 | 3835 | 4532 | 3334 | 4645 | 3835 | 4533 | 4630 | 0D41 |
| 0000104240 | 3A0A | 3031 | 3642 | 3544 | 3030 | 4446 | 4237 | 3633 |
| 0000104260 | 4137 | 3845 | 3231 | 3538 | 4243 | 4238 | 3530 | 4138 |
| 0000104300 | 3430 | 3039 | 3845 | 3533 | 3045 | 3834 | 0A0D | 313A |
| 0000104320 | 4230 | 4536 | 3035 | 4630 | 3042 | 4634 | 3730 | 3041 |
| 0000104340 | 4530 | 3242 | 4644 | 4542 | 3341 | 4643 | 3141 | 3832 |
| 0000104360 | 4535 | 3837 | 3841 | 3233 | 0D45 | 3A0A | 3031 | 3642 |
| 0000104400 | 3546 | 3030 | 4238 | 3238 | 4445 | 3046 | 4246 | 3039 |
| 0000104420 | 3845 | 3533 | 3045 | 4446 | 4237 | 3330 | 4445 | 4236 |
| 0000104440 | 3036 | 3230 | 4539 | 0A0D | 313A | 4230 | 3037 | 3035 |
| 0000104460 | 3730 | 4634 | 3046 | 3734 | 3030 | 3033 | 4232 | 4237 |
| 0000104500 | 3933 | 4530 | 3338 | 4537 | 4630 | 3744 | 3043 | 3730 |
| 0000104520 | 3542 | 0D42 | 3A0A | 3031 | 3742 | 3531 | 3030 | 3038 |
| 0000104540 | 4137 | 3030 | 4245 | 4435 | 4246 | 4145 | 4335 | 4234 |
| 0000104560 | 3036 | 4231 | 3039 | 3845 | 3733 | 3045 | 4446 | 4634 |
| 0000104600 | 0A0D | 313A | 4230 | 3237 | 3035 | 3730 | 3043 | 3730 |
| 0000104620 | 3042 | 3730 | 4641 | 4546 | 3442 | 4644 | 4542 | 3441 |
| 0000104640 | 4643 | 3941 | 4530 | 3438 | 4534 | 3941 | 0D42 | 3A0A |
| 0000104660 | 3031 | 3742 | 3533 | 3030 | 3046 | 4245 | 3341 | 3046 |
| 0000104700 | 3038 | 4630 | 3039 | 3845 | 3733 | 3045 | 4246 | 4137 |
| 0000104720 | 3030 | 3039 | 3845 | 3434 | 3734 | 0A0D | 313A | 4230 |
| 0000104740 | 3437 | 3035 | 4530 | 4641 | 4530 | 4142 | 4633 | 3930 |
| 0000104760 | 4530 | 3338 | 4538 | 4630 | 3744 | 3043 | 3730 | 3842 |
| 0000105000 | 3730 | 3041 | 3130 | 0D45 | 3A0A | 3031 | 3742 | 3535 |
| 0000105020 | 3030 | 4245 | 4435 | 4246 | 4145 | 4335 | 4234 | 3036 |
| 0000105040 | 4231 | 3039 | 3845 | 3833 | 3045 | 4446 | 4337 | 3030 |
| 0000105060 | 4237 | 3131 | 0A0D | 313A | 4230 | 3637 | 3035 | 3030 |
| 0000105100 | 3730 | 4641 | 4546 | 3442 | 4644 | 4542 | 3441 | 4643 |
| 0000105120 | 3941 | 4530 | 3438 | 4538 | 4641 | 4530 | 4142 | 4433 |
| 0000105140 | 0D30 | 3A0A | 3031 | 3742 | 3537 | 3030 | 3046 | 3038 |
| 0000105160 | 4630 | 3039 | 3845 | 3833 | 3045 | 4246 | 4137 | 3030 |
| 0000105200 | 3039 | 3845 | 3834 | 4145 | 3046 | 4245 | 4242 | 0A0D |
| 0000105220 | 313A | 4230 | 3837 | 3035 | 4130 | 4633 | 3930 | 4530 |
| 0000105240 | 3438 | 4538 | 4630 | 4141 | 4533 | 4630 | 4342 | 4533 |
| 0000105260 | 3934 | 4642 | 4542 | 3934 | 3441 | 0D45 | 3A0A | 3031 |
| 0000105300 | 3742 | 3539 | 3030 | 4146 | 3039 | 3845 | 3834 | 4145 |
| 0000105320 | 3046 | 4245 | 3341 | 3046 | 4237 | 3030 | 3039 | 3845 |
| 0000105340 | 3533 | 4245 | 3046 | 4638 | 0A0D | 313A | 4230 | 4137 |
| 0000105360 | 3035 | 3730 | 3044 | 3734 | 3042 | 3746 | 4541 | 3830 |
| 0000105400 | 3841 | 3833 | 3842 | 4532 | 3430 | 4644 | 4630 | 3042 |
| 0000105420 | 3832 | 3735 | 0D36 | 3A0A | 3031 | 3742 | 3542 | 3030 |
| 0000105440 | 3839 | 3445 | 3837 | 3030 | 3937 | 3530 | 3231 | 3538 |
| 0000105460 | 3934 | 4237 | 3330 | 4137 | 3032 | 4138 | 3338 | 4238 |
| 0000105500 | 3238 | 0A0D | 313A | 4230 | 4337 | 3035 | 3830 | 4532 |
| 0000105520 | 4630 | 3742 | 3034 | 3234 | 4646 | 3835 | 4532 | 3334 |
| 0000105540 | 4645 | 3835 | 4533 | 4642 | 3930 | 4530 | 3038 | 0D43 |
| 0000105560 | 3A0A | 3031 | 3742 | 3544 | 3030 | 3533 | 3045 | 3037 |
| 0000105600 | 4235 | 3437 | 3430 | 4632 | 3546 | 3238 | 3445 | 4533 |
| 0000105620 | 3546 | 3338 | 3045 | 4446 | 4337 | 3337 | 0A0D | 313A |
| 0000105640 | 4230 | 4537 | 3035 | 3030 | 3730 | 4542 | 3730 | 3041 |
| 0000105660 | 4530 | 3542 | 4644 | 4542 | 3541 | 4643 | 3841 | 3042 |
| 0000105700 | 3835 | 3041 | 3734 | 3642 | 0D33 | 3A0A | 3031 | 3742 |
| 0000105720 | 3546 | 3030 | 3038 | 4137 | 3030 | 4245 | 4436 | 4246 |
| 0000105740 | 4145 | 4336 | 4234 | 3036 | 3433 | 4237 | 3930 | 4137 |
| 0000105760 | 3032 | 4138 | 4131 | 0A0D | 313A | 4230 | 3038 | 3035 |
| 0000106000 | 3830 | 3833 | 3842 | 4532 | 4630 | 3742 | 3041 | 3830 |
| 0000106020 | 3042 | 3835 | 3041 | 3734 | 3042 | 3734 | 3041 | 4530 |

THU MAR 14 17:46:30 1991  SUTFILE.HEX  PAGE 39, LINE 2243

| | | | | | | | | |
|---|---|---|---|---|---|---|---|---|
| 0000106040 | 3442 | 0D43 | 3A0A | 3031 | 3842 | 3531 | 3030 | 4435 |
| 0000106060 | 4246 | 4145 | 4335 | 4234 | 3036 | 3445 | 4437 | 4230 |
| 0000106100 | 4337 | 3032 | 3437 | 3430 | 4632 | 3546 | 3238 | 3442 |
| 0000106120 | 0A0D | 313A | 4230 | 3238 | 3035 | 4530 | 3334 | 4645 |
| 0000106140 | 3835 | 4533 | 4630 | 3842 | 3843 | 3833 | 3844 | 4532 |
| 0000106160 | 4642 | 3030 | 4232 | 3139 | 3932 | 3430 | 0D38 | 3A0A |
| 0000106200 | 3031 | 3842 | 3533 | 3030 | 3045 | 4430 | 3045 | 4446 |
| 0000106220 | 4237 | 3530 | 4445 | 4236 | 3036 | 3230 | 3437 | 4646 |
| 0000106240 | 3430 | 3037 | 3330 | 3230 | 3331 | 0A0D | 313A | 4230 |
| 0000106260 | 3438 | 3035 | 4230 | 3139 | 3732 | 3034 | 3234 | 4646 |
| 0000106300 | 3835 | 4532 | 3334 | 4645 | 3835 | 4533 | 4630 | 3744 |
| 0000106320 | 3342 | 3736 | 3641 | 0D38 | 3A0A | 3031 | 3842 | 3535 |
| 0000106340 | 3030 | 3845 | 3231 | 3538 | 4243 | 4238 | 3530 | 4138 |
| 0000106360 | 3430 | 3039 | 3845 | 3533 | 3045 | 4246 | 3430 | 3046 |
| 0000106400 | 4137 | 3538 | 0A0D | 313A | 4230 | 3638 | 3035 | 3030 |
| 0000106420 | 4530 | 3242 | 4644 | 4542 | 3341 | 4643 | 3141 | 3832 |
| 0000106440 | 4535 | 3837 | 3841 | 3833 | 3842 | 4532 | 4644 | 3230 |
| 0000106460 | 0D42 | 3A0A | 3031 | 3842 | 3537 | 3030 | 4246 | 3039 |
| 0000106500 | 3845 | 3533 | 3045 | 4446 | 4237 | 3330 | 4445 | 4236 |
| 0000106520 | 3036 | 3230 | 3437 | 4646 | 3430 | 3037 | 4631 | 0A0D |
| 0000106540 | 313A | 4230 | 3838 | 3035 | 3030 | 3033 | 4232 | 3139 |
| 0000106560 | 3932 | 4530 | 3338 | 4536 | 4630 | 3744 | 3043 | 3730 |
| 0000106600 | 3142 | 3730 | 3041 | 4530 | 4542 | 0D43 | 3A0A | 3031 |
| 0000106620 | 3842 | 3539 | 3030 | 4435 | 4246 | 4145 | 4335 | 4234 |
| 0000106640 | 3036 | 3131 | 3039 | 3845 | 3733 | 3045 | 4246 | 4137 |
| 0000106660 | 3030 | 3039 | 3845 | 4443 | 0A0D | 313A | 4230 | 4138 |
| 0000106700 | 3035 | 3430 | 4534 | 4641 | 4530 | 4142 | 4633 | 3830 |
| 0000106720 | 3130 | 3936 | 4530 | 3338 | 4537 | 4630 | 3742 | 3041 |
| 0000106740 | 4330 | 3933 | 0D41 | 3A0A | 3031 | 3842 | 3542 | 3030 |
| 0000106760 | 3445 | 4239 | 4246 | 3445 | 4139 | 4146 | 3039 | 3845 |
| 0000107000 | 3434 | 4145 | 3046 | 4245 | 3341 | 3046 | 3039 | 3845 |
| 0000107020 | 3530 | 0A0D | 313A | 4230 | 4338 | 3035 | 3330 | 4536 |
| 0000107040 | 4630 | 3744 | 3043 | 3730 | 3042 | 3738 | 3041 | 4530 |
| 0000107060 | 3542 | 4644 | 4542 | 3541 | 3443 | 3642 | 4230 | 0D33 |
| 0000107100 | 3A0A | 3031 | 3842 | 3544 | 3030 | 3131 | 3039 | 3845 |
| 0000107120 | 3833 | 3045 | 4246 | 4137 | 3030 | 3039 | 3845 | 3834 |
| 0000107140 | 4145 | 3046 | 4245 | 3341 | 3046 | 3533 | 0A0D | 313A |
| 0000107160 | 4230 | 4538 | 3035 | 3830 | 3130 | 3936 | 4530 | 3338 |
| 0000107200 | 4538 | 4630 | 3742 | 3041 | 4330 | 4533 | 3934 | 4642 |
| 0000107220 | 4542 | 3934 | 4641 | 3041 | 0D33 | 3A0A | 3031 | 3842 |
| 0000107240 | 3546 | 3030 | 3039 | 3845 | 3834 | 4145 | 3046 | 4245 |
| 0000107260 | 3341 | 3046 | 4437 | 3430 | 4237 | 4630 | 4137 | 3045 |
| 0000107300 | 4138 | 3338 | 3942 | 0A0D | 313A | 4230 | 3039 | 3035 |
| 0000107320 | 3830 | 3842 | 4532 | 3430 | 4644 | 4630 | 3742 | 3042 |
| 0000107340 | 3930 | 4530 | 3338 | 4535 | 4642 | 3030 | 3832 | 3935 |
| 0000107360 | 4538 | 0D42 | 3A0A | 3031 | 3942 | 3531 | 3030 | 3445 |
| 0000107400 | 3837 | 303C | 3937 | 3630 | 3231 | 3538 | 3934 | 3039 |
| 0000107420 | 3845 | 3434 | 3045 | 4346 | 3341 | 3045 | 4446 | 4634 |
| 0000107440 | 0A0D | 313A | 4230 | 3239 | 3035 | 3930 | 4530 | 3438 |
| 0000107460 | 4536 | 4630 | 4141 | 4533 | 4630 | 4542 | 3242 | 4644 |
| 0000107500 | 4542 | 3341 | 4643 | 3841 | 3042 | 3335 | 0D39 | 3A0A |
| 0000107520 | 3031 | 3942 | 3533 | 3030 | 4138 | 3430 | 3039 | 3845 |
| 0000107540 | 4334 | 3045 | 4146 | 3341 | 3045 | 4246 | 4245 | 4432 |
| 0000107560 | 4246 | 4145 | 4333 | 4146 | 3532 | 0A0D | 313A | 4230 |
| 0000107600 | 3439 | 3035 | 3930 | 4530 | 3438 | 4543 | 4641 | 4530 |
| 0000107620 | 4142 | 4633 | 3930 | 4530 | 3438 | 4538 | 4630 | 4143 |
| 0000107640 | 4533 | 4630 | 4244 | 0D41 | 3A0A | 3031 | 3942 | 3535 |
| 0000107660 | 3030 | 3039 | 3845 | 4134 | 3045 | 4146 | 3341 | 3045 |
| 0000107700 | 4246 | 4245 | 4432 | 4246 | 4145 | 4333 | 4146 | 4238 |

THU MAR 14 17:46:30 1991 SUTFILE.HEX PAGE 40, LINE 2302

| | | | | | | | | |
|---|---|---|---|---|---|---|---|---|
| 0000107720 | 3530 | 3530 | 0A0D | 313A | 4230 | 3639 | 3035 | 3830 |
| 0000107740 | 3041 | 3934 | 4530 | 3438 | 4545 | 4630 | 4141 | 4533 |
| 0000107760 | 4630 | 4542 | 3242 | 4644 | 4542 | 3341 | 4643 | 4641 |
| 0000110000 | 0D33 | 3A0A | 3031 | 3942 | 3537 | 3030 | 3039 | 3845 |
| 0000110020 | 4534 | 4145 | 3046 | 4245 | 3341 | 3046 | 3039 | 3845 |
| 0000110040 | 3633 | 3045 | 4246 | 4137 | 3030 | 4245 | 3642 | 0A0D |
| 0000110060 | 313A | 4230 | 3839 | 3035 | 4630 | 4634 | 4542 | 4641 |
| 0000110100 | 4634 | 3841 | 3042 | 3835 | 3041 | 3734 | 3042 | 3737 |
| 0000110120 | 3041 | 4530 | 3542 | 4644 | 3842 | 0D45 | 3A0A | 3031 |
| 0000110140 | 3942 | 3539 | 3030 | 4145 | 4335 | 4146 | 4238 | 3530 |
| 0000110160 | 4138 | 3430 | 3039 | 3045 | 3730 | 3045 | 4246 | 4137 |
| 0000110200 | 3030 | 4245 | 4436 | 3032 | 0A0D | 313A | 4230 | 4139 |
| 0000110220 | 3035 | 4630 | 4542 | 3641 | 3443 | 3642 | 3330 | 3945 |
| 0000110240 | 4530 | 3438 | 4543 | 4630 | 4141 | 4533 | 3430 | 3741 |
| 0000110260 | 3030 | 3741 | 0D33 | 3A0A | 3031 | 3942 | 3542 | 3030 |
| 0000110300 | 3039 | 3845 | 4534 | 3045 | 4146 | 3341 | 3045 | 4134 |
| 0000110320 | 3036 | 3630 | 3039 | 3030 | 3030 | 3231 | 4642 | 3332 |
| 0000110340 | 4232 | 0A0D | 313A | 4230 | 4339 | 3035 | 3930 | 4530 |
| 0000110360 | 3338 | 4536 | 4630 | 4542 | 4642 | 4634 | 3842 | 3042 |
| 0000110400 | 3735 | 3042 | 4537 | 3542 | 4644 | 3942 | 3230 | 0D41 |
| 0000110420 | 3A0A | 3031 | 3942 | 3544 | 3030 | 3045 | 3730 | 4245 |
| 0000110440 | 3046 | 3039 | 3045 | 3730 | 3045 | 4246 | 4137 | 3030 |
| 0000110460 | 3039 | 3030 | 3230 | 3231 | 3143 | 4636 | 0A0D | 313A |
| 0000110500 | 4230 | 4539 | 3035 | 3930 | 3046 | 4232 | 3741 | 3931 |
| 0000110520 | 4530 | 3438 | 4533 | 3730 | 3030 | 3033 | 4232 | 3741 |
| 0000110540 | 3931 | 3030 | 3030 | 4230 | 0D42 | 3A0A | 3031 | 3942 |
| 0000110560 | 3546 | 3030 | 3231 | 4339 | 4334 | 3437 | 3430 | 4632 |
| 0000110600 | 3546 | 3238 | 3445 | 4533 | 3546 | 3338 | 4145 | 3046 |
| 0000110620 | 4245 | 3341 | 3832 | 0A0D | 313A | 4230 | 3041 | 3035 |
| 0000110640 | 4630 | 3730 | 3034 | 3234 | 4646 | 3835 | 4532 | 3334 |
| 0000110660 | 4645 | 3835 | 4533 | 4630 | 4143 | 4533 | 4630 | 3744 |
| 0000110700 | 4242 | 0D32 | 3A0A | 3031 | 4142 | 3531 | 3030 | 4646 |
| 0000110720 | 4137 | 3030 | 4245 | 4435 | 4246 | 4145 | 4335 | 4146 |
| 0000110740 | 4238 | 3530 | 4138 | 3430 | 4237 | 3246 | 4137 | 3032 |
| 0000110760 | 0A0D | 313A | 4230 | 3241 | 3035 | 3030 | 3846 | 3841 |
| 0000111000 | 3833 | 3842 | 4532 | 4630 | 3742 | 3041 | 4530 | 3644 |
| 0000111020 | 3742 | 3030 | 4532 | 3643 | 3641 | 3130 | 0D33 | 3A0A |
| 0000111040 | 3031 | 4142 | 3533 | 3030 | 3230 | 3437 | 4646 | 3430 |
| 0000111060 | 3036 | 3633 | 3437 | 3430 | 4632 | 3546 | 3238 | 3445 |
| 0000111100 | 4533 | 3546 | 3338 | 3045 | 4135 | 0A0D | 313A | 4230 |
| 0000111120 | 3441 | 3035 | 4630 | 4143 | 4533 | 4630 | 3744 | 3042 |
| 0000111140 | 3138 | 3832 | 3932 | 3845 | 3042 | 3835 | 3041 | 3734 |
| 0000111160 | 4642 | 3733 | 4241 | 0D41 | 3A0A | 3031 | 4142 | 3535 |
| 0000111200 | 3030 | 4630 | 4138 | 3338 | 4238 | 3238 | 3045 | 4246 |
| 0000111220 | 4137 | 3030 | 4445 | 4236 | 3037 | 3230 | 4345 | 4136 |
| 0000111240 | 3036 | 3345 | 0A0D | 313A | 4230 | 3641 | 3035 | 3030 |
| 0000111260 | 3732 | 4634 | 3046 | 3634 | 3030 | 3936 | 3030 | 3030 |
| 0000111300 | 3130 | 4232 | 3246 | 3033 | 3832 | 3935 | 4538 | 3634 |
| 0000111320 | 0D42 | 3A0A | 3031 | 4142 | 3537 | 3030 | 3837 | 3030 |
| 0000111340 | 3937 | 3730 | 3231 | 3538 | 3934 | 3039 | 3045 | 3830 |
| 0000111360 | 3045 | 4346 | 3341 | 3045 | 4446 | 4237 | 4139 | 0A0D |
| 0000111400 | 313A | 4230 | 3841 | 3035 | 3030 | 3734 | 3041 | 3130 |
| 0000111420 | 3832 | 4330 | 3634 | 3430 | 3941 | 4530 | 3438 | 4534 |
| 0000111440 | 4630 | 4143 | 4533 | 4630 | 3144 | 0D42 | 3A0A | 3031 |
| 0000111460 | 4142 | 3539 | 3030 | 4237 | 4334 | 4137 | 3845 | 3043 |
| 0000111500 | 3230 | 3043 | 3330 | 4138 | 3338 | 4238 | 3238 | 3341 |
| 0000111520 | 3045 | 4432 | 4246 | 4532 | 0A0D | 313A | 4230 | 4141 |
| 0000111540 | 3035 | 4630 | 4430 | 3830 | 4432 | 3830 | 4533 | 3330 |
| 0000111560 | 4643 | 4630 | 3941 | 4530 | 3438 | 4538 | 4630 | 4143 |

THU MAR 14 17:46:30 1991 SUTFILE.HEX PAGE 41, LINE 2361

| | | | | | | | | |
|---|---|---|---|---|---|---|---|---|
| 0000111600 | 4533 | 4430 | 0D37 | 3A0A | 3031 | 4142 | 3542 | 3030 |
| 0000111620 | 4446 | 4237 | 4534 | 4137 | 3845 | 3043 | 3230 | 3043 |
| 0000111640 | 3330 | 4138 | 3338 | 4238 | 3238 | 3341 | 3045 | 4432 |
| 0000111660 | 4130 | 0A0D | 313A | 4230 | 4341 | 3035 | 4630 | 4642 |
| 0000111700 | 4430 | 3830 | 4432 | 3830 | 4533 | 3330 | 4643 | 4630 |
| 0000111720 | 3741 | 3042 | 3738 | 4541 | 3130 | 3832 | 3632 | 0D41 |
| 0000111740 | 3A0A | 3031 | 4142 | 3544 | 3030 | 4331 | 3230 | 3039 |
| 0000111760 | 3845 | 3633 | 3045 | 4446 | 4337 | 3030 | 4237 | 3033 |
| 0000112000 | 4137 | 3030 | 4245 | 4435 | 4246 | 3444 | 0A0D | 313A |
| 0000112020 | 4230 | 4541 | 3035 | 4530 | 3541 | 4643 | 3841 | 3042 |
| 0000112040 | 3835 | 3041 | 3934 | 4530 | 3030 | 4537 | 4630 | 3742 |
| 0000112060 | 3041 | 4530 | 3642 | 4344 | 0D46 | 3A0A | 3031 | 4142 |
| 0000112100 | 3546 | 3030 | 4246 | 4145 | 4336 | 4234 | 3037 | 3330 |
| 0000112120 | 3230 | 4242 | 3239 | 3039 | 3845 | 4334 | 3045 | 4146 |
| 0000112140 | 3341 | 3045 | 3243 | 0A0D | 313A | 4230 | 3042 | 3035 |
| 0000112160 | 3430 | 3741 | 3030 | 3941 | 4530 | 3438 | 4545 | 4630 |
| 0000112200 | 4141 | 4533 | 3430 | 3641 | 3030 | 3936 | 3030 | 3030 |
| 0000112220 | 3030 | 0D39 | 3A0A | 3031 | 4242 | 3531 | 3030 | 3231 |
| 0000112240 | 4642 | 3332 | 3039 | 3845 | 3633 | 3045 | 4446 | 4237 |
| 0000112260 | 3033 | 4245 | 4435 | 4246 | 3039 | 3045 | 3730 | 4333 |
| 0000112300 | 0A0D | 313A | 4230 | 3242 | 3035 | 4530 | 4642 | 3730 |
| 0000112320 | 3042 | 3730 | 3034 | 3234 | 4646 | 3835 | 4532 | 3334 |
| 0000112340 | 4645 | 3835 | 4533 | 4642 | 3930 | 3930 | 0D37 | 3A0A |
| 0000112360 | 3031 | 4242 | 3533 | 3030 | 3045 | 3730 | 3045 | 4446 |
| 0000112400 | 4337 | 3030 | 4237 | 3032 | 4137 | 3030 | 4245 | 4435 |
| 0000112420 | 4246 | 4145 | 4335 | 4234 | 3744 | 0A0D | 313A | 4230 |
| 0000112440 | 3442 | 3035 | 3630 | 3130 | 3731 | 3044 | 3734 | 3034 |
| 0000112460 | 3234 | 4646 | 4542 | 3334 | 4645 | 3841 | 3841 | 3833 |
| 0000112500 | 3842 | 4532 | 3430 | 0D36 | 3A0A | 3031 | 4242 | 3535 |
| 0000112520 | 3030 | 4434 | 3046 | 4246 | 3039 | 3045 | 3730 | 3045 |
| 0000112540 | 4446 | 4337 | 3030 | 4237 | 3031 | 4137 | 3030 | 4245 |
| 0000112560 | 4435 | 4238 | 0A0D | 313A | 4230 | 3642 | 3035 | 4630 |
| 0000112600 | 4542 | 3541 | 3443 | 3642 | 3130 | 3731 | 3044 | 3731 |
| 0000112620 | 3034 | 3234 | 4646 | 4542 | 3334 | 4645 | 3841 | 3041 |
| 0000112640 | 0D44 | 3A0A | 3031 | 4242 | 3537 | 3030 | 3338 | 4238 |
| 0000112660 | 3238 | 3045 | 4434 | 3046 | 4246 | 3437 | 3430 | 4632 |
| 0000112700 | 3546 | 3238 | 3445 | 4533 | 3546 | 3338 | 3036 | 0A0D |
| 0000112720 | 313A | 4230 | 3842 | 3035 | 4530 | 4630 | 3742 | 3041 |
| 0000112740 | 3930 | 3030 | 3030 | 3132 | 4332 | 3931 | 3046 | 4232 |
| 0000112760 | 3143 | 3941 | 4530 | 3438 | 4333 | 0D34 | 3A0A | 3031 |
| 0000113000 | 4242 | 3539 | 3030 | 3045 | 3037 | 3330 | 3230 | 4342 |
| 0000113020 | 4131 | 3039 | 3030 | 3030 | 3231 | 4339 | 4334 | 3437 |
| 0000113040 | 3530 | 4632 | 3546 | 4534 | 0A0D | 313A | 4230 | 4142 |
| 0000113060 | 3035 | 3830 | 4532 | 3334 | 4645 | 3835 | 4533 | 4641 |
| 0000113100 | 4530 | 4142 | 4633 | 3730 | 3034 | 3235 | 4646 | 3835 |
| 0000113120 | 4532 | 3134 | 0D39 | 3A0A | 3031 | 4242 | 3542 | 3030 |
| 0000113140 | 4533 | 3546 | 3338 | 3045 | 4346 | 3341 | 3045 | 4446 |
| 0000113160 | 4237 | 4646 | 4137 | 3030 | 4245 | 4435 | 4246 | 4145 |
| 0000113200 | 4434 | 0A0D | 313A | 4230 | 4342 | 3035 | 3530 | 4643 |
| 0000113220 | 3841 | 3042 | 3835 | 3041 | 3734 | 4642 | 3732 | 3041 |
| 0000113240 | 3846 | 3841 | 3833 | 3842 | 4532 | 4630 | 3142 | 0D31 |
| 0000113260 | 3A0A | 3031 | 4242 | 3544 | 3030 | 4137 | 3030 | 4445 |
| 0000113300 | 4236 | 3037 | 3230 | 4345 | 4136 | 3036 | 3230 | 3437 |
| 0000113320 | 4646 | 3430 | 3036 | 3633 | 3437 | 3345 | 0A0D | 313A |
| 0000113340 | 4230 | 4542 | 3035 | 3030 | 3235 | 4646 | 3835 | 4532 |
| 0000113360 | 3334 | 4645 | 3835 | 4533 | 4630 | 4143 | 4533 | 4630 |
| 0000113400 | 3744 | 3042 | 3138 | 3132 | 0D41 | 3A0A | 3031 | 4242 |
| 0000113420 | 3546 | 3030 | 3238 | 4539 | 4238 | 3530 | 4138 | 3430 |
| 0000113440 | 4237 | 3346 | 4137 | 4630 | 4138 | 3338 | 4238 | 3238 |

THU MAR 14 17:46:30 1991 SUTFILE.HEX PAGE 42, LINE 2420

| | | | | | | | | |
|---|---|---|---|---|---|---|---|---|
| 0000113460 | 3045 | 4246 | 3631 | 0A0D | 313A | 4230 | 3043 | 3035 |
| 0000113500 | 3730 | 3041 | 4530 | 3644 | 3742 | 3030 | 4532 | 3643 |
| 0000113520 | 3641 | 3030 | 3732 | 4634 | 3046 | 3634 | 3030 | 3936 |
| 0000113540 | 4330 | 0D36 | 3A0A | 3031 | 4342 | 3531 | 3030 | 3030 |
| 0000113560 | 3030 | 3231 | 4642 | 3332 | 3230 | 3538 | 3839 | 3445 |
| 0000113600 | 3837 | 3030 | 3937 | 3730 | 3231 | 3538 | 3934 | 3035 |
| 0000113620 | 0A0D | 313A | 4230 | 3243 | 3035 | 3930 | 4530 | 3438 |
| 0000113640 | 4534 | 4630 | 4143 | 4533 | 4630 | 3744 | 3442 | 3743 |
| 0000113660 | 4541 | 4338 | 3030 | 4332 | 3030 | 3433 | 0D39 | 3A0A |
| 0000113700 | 3031 | 4342 | 3533 | 3030 | 4138 | 3338 | 4238 | 3238 |
| 0000113720 | 3341 | 3045 | 4432 | 4246 | 3046 | 3044 | 3238 | 3044 |
| 0000113740 | 3338 | 3045 | 4333 | 3046 | 3939 | 0A0D | 313A | 4230 |
| 0000113760 | 3443 | 3035 | 4630 | 3941 | 4530 | 3438 | 4538 | 4630 |
| 0000114000 | 4143 | 4533 | 4630 | 3744 | 3442 | 3745 | 4541 | 4338 |
| 0000114020 | 3030 | 4332 | 3230 | 0D43 | 3A0A | 3031 | 4342 | 3535 |
| 0000114040 | 3030 | 3330 | 4138 | 3338 | 4238 | 3238 | 3341 | 3045 |
| 0000114060 | 4432 | 4246 | 3046 | 3044 | 3238 | 3044 | 3338 | 3045 |
| 0000114100 | 4333 | 3636 | 0A0D | 313A | 4230 | 3643 | 3035 | 4630 |
| 0000114120 | 4630 | 3941 | 4530 | 3338 | 4536 | 4630 | 3744 | 3043 |
| 0000114140 | 3730 | 3042 | 3733 | 3041 | 4530 | 3542 | 4644 | 4142 |
| 0000114160 | 0D33 | 3A0A | 3031 | 4342 | 3537 | 3030 | 4145 | 4335 |
| 0000114200 | 4146 | 4238 | 3530 | 4138 | 3430 | 3039 | 3045 | 3730 |
| 0000114220 | 3045 | 4246 | 4137 | 3030 | 4445 | 4236 | 4433 | 0A0D |
| 0000114240 | 313A | 4230 | 3843 | 3035 | 3730 | 3030 | 4532 | 3643 |
| 0000114260 | 3741 | 3030 | 3033 | 4232 | 3244 | 3932 | 4530 | 3438 |
| 0000114300 | 4543 | 4630 | 4141 | 4533 | 3730 | 0D32 | 3A0A | 3031 |
| 0000114320 | 4342 | 3539 | 3030 | 4134 | 3037 | 4130 | 3039 | 3845 |
| 0000114340 | 4534 | 3045 | 4146 | 3341 | 3045 | 4134 | 3036 | 3630 |
| 0000114360 | 3039 | 3030 | 3030 | 3837 | 0A0D | 313A | 4230 | 4143 |
| 0000114400 | 3035 | 3130 | 4232 | 3246 | 3933 | 4530 | 3338 | 4536 |
| 0000114420 | 4630 | 3744 | 3042 | 4533 | 3542 | 4644 | 3942 | 4530 |
| 0000114440 | 3030 | 4437 | 0D38 | 3A0A | 3031 | 4342 | 3542 | 3030 |
| 0000114460 | 4245 | 3046 | 4237 | 3030 | 3437 | 3430 | 4632 | 3546 |
| 0000114500 | 3238 | 3445 | 4533 | 3546 | 3338 | 4245 | 3046 | 3039 |
| 0000114520 | 3630 | 0A0D | 313A | 4230 | 4343 | 3035 | 4530 | 3030 |
| 0000114540 | 4537 | 4630 | 3744 | 3043 | 3730 | 3042 | 3731 | 3041 |
| 0000114560 | 4530 | 3542 | 4644 | 4542 | 3541 | 3443 | 3642 | 0D35 |
| 0000114600 | 3A0A | 3031 | 4342 | 3544 | 3030 | 3036 | 3131 | 4437 |
| 0000114620 | 3430 | 3437 | 3430 | 4632 | 4246 | 3445 | 4533 | 4146 |
| 0000114640 | 4138 | 3338 | 4238 | 3238 | 3045 | 3542 | 0A0D | 313A |
| 0000114660 | 4230 | 4543 | 3035 | 3430 | 4644 | 4630 | 3942 | 4530 |
| 0000114700 | 3030 | 4537 | 4630 | 3744 | 3043 | 3730 | 3042 | 3732 |
| 0000114720 | 3041 | 4530 | 3542 | 3044 | 0D38 | 3A0A | 3031 | 4342 |
| 0000114740 | 3546 | 3030 | 4246 | 4145 | 4335 | 4234 | 3036 | 3131 |
| 0000114760 | 4437 | 3130 | 3437 | 3430 | 4632 | 4246 | 3445 | 4533 |
| 0000115000 | 4146 | 4138 | 4337 | 0A0D | 313A | 4230 | 3044 | 3035 |
| 0000115020 | 3830 | 3833 | 3842 | 4532 | 3430 | 4644 | 4630 | 3742 |
| 0000115040 | 3034 | 3234 | 4646 | 3835 | 4532 | 3334 | 4645 | 3835 |
| 0000115060 | 4333 | 0D45 | 3A0A | 3031 | 4442 | 3531 | 3030 | 3045 |
| 0000115100 | 4246 | 4137 | 3030 | 3039 | 3030 | 3230 | 3231 | 3143 |
| 0000115120 | 4639 | 3230 | 4442 | 4141 | 3039 | 3845 | 3334 | 3141 |
| 0000115140 | 0A0D | 313A | 4230 | 3244 | 3035 | 4530 | 3730 | 3030 |
| 0000115160 | 3033 | 4232 | 4144 | 3941 | 3030 | 3030 | 3130 | 3932 |
| 0000115200 | 3443 | 3743 | 3034 | 3235 | 4646 | 3235 | 0D42 | 3A0A |
| 0000115220 | 3031 | 4442 | 3533 | 3030 | 3238 | 3445 | 4533 | 3546 |
| 0000115240 | 3338 | 4145 | 3046 | 4245 | 3341 | 3046 | 3437 | 3530 |
| 0000115260 | 4632 | 3546 | 3238 | 3445 | 3738 | 0A0D | 313A | 4230 |
| 0000115300 | 3444 | 3035 | 3330 | 4645 | 3835 | 4533 | 4630 | 4143 |
| 0000115320 | 4533 | 4630 | 3744 | 4642 | 3746 | 3041 | 4530 | 3542 |

THU MAR 14 17:46:30 1991 SUTFILE.HEX PAGE 43, LINE 2479

| | | | | | | | | |
|---|---|---|---|---|---|---|---|---|
| 0000115340 | 4644 | 4542 | 4241 | 0D42 | 3A0A | 3031 | 4442 | 3535 |
| 0000115360 | 3030 | 4335 | 4146 | 4238 | 3530 | 4138 | 3430 | 4237 |
| 0000115400 | 3246 | 4137 | 4630 | 4138 | 3338 | 4238 | 3238 | 3045 |
| 0000115420 | 4246 | 4637 | 0A0D | 313A | 4230 | 3644 | 3035 | 3730 |
| 0000115440 | 3041 | 4530 | 3644 | 3742 | 3030 | 4532 | 3643 | 3641 |
| 0000115460 | 3030 | 3732 | 4634 | 3046 | 3634 | 3330 | 3736 | 3534 |
| 0000115500 | 0D31 | 3A0A | 3031 | 4442 | 3537 | 3030 | 3530 | 4632 |
| 0000115520 | 3546 | 3238 | 3445 | 4533 | 3546 | 3338 | 3045 | 4346 |
| 0000115540 | 3341 | 3045 | 4446 | 4237 | 3830 | 3231 | 3838 | 0A0D |
| 0000115560 | 313A | 4230 | 3844 | 3035 | 3830 | 3932 | 3845 | 3042 |
| 0000115600 | 3835 | 3041 | 3734 | 4642 | 3733 | 3041 | 3846 | 3841 |
| 0000115620 | 3833 | 3842 | 4532 | 4630 | 3842 | 0D34 | 3A0A | 3031 |
| 0000115640 | 4442 | 3539 | 3030 | 4137 | 3030 | 4445 | 4236 | 3037 |
| 0000115660 | 3230 | 4345 | 4136 | 3036 | 3230 | 3437 | 4646 | 3430 |
| 0000115700 | 3036 | 3630 | 3039 | 3533 | 0A0D | 313A | 4230 | 4144 |
| 0000115720 | 3035 | 3030 | 3030 | 3130 | 4232 | 3246 | 3033 | 3832 |
| 0000115740 | 3935 | 4538 | 3734 | 3038 | 3730 | 3039 | 3137 | 3832 |
| 0000115760 | 3435 | 4239 | 0D46 | 3A0A | 3031 | 4442 | 3542 | 3030 |
| 0000116000 | 3039 | 3845 | 3434 | 3045 | 4346 | 3341 | 3045 | 4446 |
| 0000116020 | 4237 | 4334 | 4137 | 3845 | 3043 | 3230 | 3043 | 3330 |
| 0000116040 | 3842 | 0A0D | 313A | 4230 | 4344 | 3035 | 3830 | 3841 |
| 0000116060 | 3833 | 3842 | 4132 | 4533 | 3230 | 4644 | 4642 | 4430 |
| 0000116100 | 3830 | 4432 | 3830 | 4533 | 3330 | 4643 | 3030 | 0D38 |
| 0000116120 | 3A0A | 3031 | 4442 | 3544 | 3030 | 4146 | 3039 | 3845 |
| 0000116140 | 3834 | 3045 | 4346 | 3341 | 3045 | 4446 | 4237 | 4534 |
| 0000116160 | 4137 | 3845 | 3043 | 3230 | 3043 | 4239 | 0A0D | 313A |
| 0000116200 | 4230 | 4544 | 3035 | 3030 | 3833 | 3841 | 3833 | 3842 |
| 0000116220 | 4132 | 4533 | 3230 | 4644 | 4642 | 4430 | 3830 | 4432 |
| 0000116240 | 3830 | 4533 | 3330 | 4443 | 0D35 | 3A0A | 3031 | 4442 |
| 0000116260 | 3546 | 3030 | 3046 | 4146 | 3039 | 3845 | 3633 | 3045 |
| 0000116300 | 4446 | 4337 | 3030 | 4237 | 3730 | 4137 | 3030 | 4245 |
| 0000116320 | 4435 | 4246 | 4530 | 0A0D | 313A | 4230 | 3045 | 3035 |
| 0000116340 | 4530 | 3541 | 4643 | 3841 | 3042 | 3835 | 3041 | 3934 |
| 0000116360 | 4530 | 3030 | 4537 | 4630 | 3742 | 3041 | 4530 | 3642 |
| 0000116400 | 4144 | 0D42 | 3A0A | 3031 | 4542 | 3531 | 3030 | 4246 |
| 0000116420 | 4145 | 4336 | 4234 | 3036 | 4634 | 3039 | 3845 | 4334 |
| 0000116440 | 3045 | 4146 | 3341 | 3045 | 4134 | 3037 | 4130 | 4445 |
| 0000116460 | 0A0D | 313A | 4230 | 3245 | 3035 | 3930 | 4530 | 3438 |
| 0000116500 | 4545 | 4630 | 4141 | 4533 | 3430 | 3641 | 3030 | 3936 |
| 0000116520 | 3030 | 3030 | 3130 | 4232 | 3246 | 4233 | 0D36 | 3A0A |
| 0000116540 | 3031 | 4542 | 3533 | 3030 | 3039 | 3845 | 3633 | 3045 |
| 0000116560 | 4446 | 4237 | 3730 | 4245 | 4435 | 4246 | 3039 | 3045 |
| 0000116600 | 3730 | 4245 | 3046 | 3039 | 4243 | 0A0D | 313A | 4230 |
| 0000116620 | 3445 | 3035 | 4530 | 3030 | 4537 | 4630 | 3742 | 3034 |
| 0000116640 | 3234 | 4646 | 3835 | 4532 | 3334 | 4645 | 3835 | 4533 |
| 0000116660 | 4642 | 3730 | 3234 | 0D34 | 3A0A | 3031 | 4542 | 3535 |
| 0000116700 | 3030 | 3430 | 4632 | 3546 | 3238 | 3445 | 4533 | 3546 |
| 0000116720 | 3338 | 3045 | 4246 | 4137 | 3030 | 3039 | 3030 | 3230 |
| 0000116740 | 3231 | 3041 | 0A0D | 313A | 4230 | 3645 | 3035 | 4330 |
| 0000116760 | 3931 | 3046 | 4232 | 4645 | 3932 | 4530 | 3438 | 4533 |
| 0000117000 | 3730 | 3030 | 3033 | 4232 | 4645 | 3932 | 3030 | 3630 |
| 0000117020 | 0D42 | 3A0A | 3031 | 4542 | 3537 | 3030 | 3030 | 3231 |
| 0000117040 | 4339 | 4334 | 3437 | 3530 | 4632 | 3546 | 3238 | 3445 |
| 0000117060 | 4533 | 3546 | 3338 | 4145 | 3046 | 4245 | 3534 | 0A0D |
| 0000117100 | 313A | 4230 | 3845 | 3035 | 4130 | 4633 | 3730 | 3034 |
| 0000117120 | 3235 | 4646 | 3835 | 4532 | 3334 | 4645 | 3835 | 4533 |
| 0000117140 | 4630 | 4143 | 4533 | 4630 | 3044 | 0D35 | 3A0A | 3031 |
| 0000117160 | 4542 | 3539 | 3030 | 4237 | 4646 | 4137 | 3030 | 4245 |
| 0000117200 | 4435 | 4246 | 4145 | 4335 | 4146 | 4238 | 3530 | 4138 |

THU MAR 14 17:46:30 1991 SUTFILE.HEX PAGE 44, LINE 2538

| | | | | | | | | |
|---|---|---|---|---|---|---|---|---|
| 0000117220 | 3430 | 4237 | 3246 | 4239 | 0A0D | 313A | 4230 | 4145 |
| 0000117240 | 3035 | 3730 | 3041 | 3846 | 3841 | 3833 | 3842 | 4532 |
| 0000117260 | 4630 | 3742 | 3041 | 4530 | 3644 | 3742 | 3030 | 4532 |
| 0000117300 | 3643 | 3741 | 0D35 | 3A0A | 3031 | 4542 | 3542 | 3030 |
| 0000117320 | 3036 | 3230 | 3437 | 4646 | 3430 | 3036 | 3633 | 3437 |
| 0000117340 | 3530 | 4632 | 3546 | 3238 | 3445 | 4533 | 3546 | 3338 |
| 0000117360 | 3535 | 0A0D | 313A | 4230 | 4345 | 3035 | 4530 | 4630 |
| 0000117400 | 4143 | 4533 | 4630 | 3744 | 3042 | 3138 | 3832 | 3932 |
| 0000117420 | 3845 | 3042 | 3835 | 3041 | 3734 | 4642 | 4433 | 0D30 |
| 0000117440 | 3A0A | 3031 | 4542 | 3544 | 3030 | 4137 | 4630 | 4138 |
| 0000117460 | 3338 | 4238 | 3238 | 3045 | 4246 | 4137 | 3030 | 4445 |
| 0000117500 | 4236 | 3037 | 3230 | 4345 | 4136 | 3534 | 0A0D | 313A |
| 0000117520 | 4230 | 4545 | 3035 | 3630 | 3030 | 3732 | 4634 | 3046 |
| 0000117540 | 3634 | 3030 | 3936 | 3030 | 3030 | 3130 | 4232 | 3246 |
| 0000117560 | 3033 | 3832 | 3935 | 3638 | 0D42 | 3A0A | 3031 | 4542 |
| 0000117600 | 3546 | 3030 | 3445 | 3837 | 3030 | 3937 | 3430 | 3231 |
| 0000117620 | 3538 | 3934 | 3039 | 3845 | 4334 | 3045 | 4146 | 3341 |
| 0000117640 | 3045 | 4134 | 3931 | 0A0D | 313A | 4230 | 3046 | 3035 |
| 0000117660 | 3730 | 3030 | 3941 | 4530 | 3438 | 4545 | 4630 | 4141 |
| 0000117700 | 4533 | 3430 | 3641 | 3030 | 3938 | 3030 | 3030 | 3130 |
| 0000117720 | 3332 | 0D42 | 3A0A | 3031 | 4642 | 3531 | 3030 | 4642 |
| 0000117740 | 3332 | 3038 | 3730 | 4237 | 4646 | 3039 | 3845 | 3334 |
| 0000117760 | 4245 | 3046 | 3230 | 3538 | 3839 | 3445 | 3837 | 3832 |
| 0000120000 | 0A0D | 313A | 4230 | 3246 | 3035 | 3030 | 3730 | 3039 |
| 0000120020 | 3139 | 3832 | 3435 | 3739 | 3042 | 3730 | 3041 | 3930 |
| 0000120040 | 4530 | 3030 | 4538 | 4641 | 4530 | 3742 | 0D38 | 3A0A |
| 0000120060 | 3031 | 4642 | 3533 | 3030 | 3341 | 3046 | 3039 | 3030 |
| 0000120100 | 3030 | 3231 | 4339 | 4334 | 3437 | 3430 | 4632 | 3546 |
| 0000120120 | 3238 | 3445 | 4533 | 3546 | 4141 | 0A0D | 313A | 4230 |
| 0000120140 | 3446 | 3035 | 3830 | 4533 | 4641 | 4530 | 4142 | 4633 |
| 0000120160 | 3730 | 3034 | 3234 | 4646 | 3835 | 4532 | 3334 | 4645 |
| 0000120200 | 3835 | 4533 | 3730 | 0D39 | 3A0A | 3031 | 4642 | 3535 |
| 0000120220 | 3030 | 4146 | 3341 | 3045 | 4246 | 3437 | 3630 | 4632 |
| 0000120240 | 3546 | 3238 | 3445 | 4533 | 3546 | 3338 | 4145 | 3046 |
| 0000120260 | 4245 | 3545 | 0A0D | 313A | 4230 | 3646 | 3035 | 4130 |
| 0000120300 | 4633 | 3730 | 3034 | 3234 | 4646 | 4542 | 3334 | 4645 |
| 0000120320 | 3141 | 3832 | 3132 | 3043 | 3832 | 3042 | 3835 | 4141 |
| 0000120340 | 0D46 | 3A0A | 3031 | 4642 | 3537 | 3030 | 3430 | 4237 |
| 0000120360 | 3541 | 4338 | 3338 | 4438 | 3238 | 4245 | 3046 | 3039 |
| 0000120400 | 3845 | 3433 | 3045 | 4246 | 3043 | 3330 | 3535 | 0A0D |
| 0000120420 | 313A | 4230 | 3846 | 3035 | 3730 | 3044 | 3131 | 3832 |
| 0000120440 | 4430 | 4442 | 3030 | 3733 | 3130 | 3937 | 4530 | 3030 |
| 0000120460 | 4537 | 4630 | 3744 | 3842 | 3130 | 0D38 | 3A0A | 3031 |
| 0000120500 | 4642 | 3539 | 3030 | 4245 | 4434 | 4246 | 3437 | 3830 |
| 0000120520 | 4632 | 3546 | 3238 | 3445 | 4533 | 3546 | 3338 | 4245 |
| 0000120540 | 3046 | 3038 | 4433 | 3531 | 0A0D | 313A | 4230 | 4146 |
| 0000120560 | 3035 | 4330 | 3030 | 3733 | 3044 | 3132 | 3832 | 3531 |
| 0000120600 | 4430 | 3030 | 3733 | 3130 | 3937 | 4530 | 3030 | 4537 |
| 0000120620 | 4630 | 4244 | 0D39 | 3A0A | 3031 | 4642 | 3542 | 3030 |
| 0000120640 | 4237 | 3043 | 4245 | 4434 | 4246 | 3437 | 3830 | 4632 |
| 0000120660 | 3546 | 3238 | 3445 | 4533 | 3546 | 3338 | 4245 | 3046 |
| 0000120700 | 3737 | 0A0D | 313A | 4230 | 4346 | 3035 | 3830 | 3130 |
| 0000120720 | 3742 | 3044 | 3133 | 3832 | 3531 | 3730 | 3130 | 3932 |
| 0000120740 | 4530 | 3030 | 4537 | 4630 | 3742 | 3034 | 3138 | 0D45 |
| 0000120760 | 3A0A | 3031 | 4642 | 3544 | 3030 | 4632 | 3546 | 3238 |
| 0000121000 | 3445 | 4533 | 3546 | 3338 | 4245 | 3046 | 3038 | 3230 |
| 0000121020 | 3038 | 3030 | 3437 | 3430 | 4632 | 3839 | 0A0D | 313A |
| 0000121040 | 4230 | 4546 | 3035 | 4630 | 4542 | 3334 | 4645 | 3141 |
| 0000121060 | 3832 | 3132 | 3043 | 3832 | 3042 | 3835 | 3041 | 3734 |

THU MAR 14 17:46:30 1991 SUTFILE.HEX PAGE 45, LINE 2597

| | | | | | | | | |
|---|---|---|---|---|---|---|---|---|
| 0000121100 | 3034 | 3238 | 4646 | 4335 | 0D35 | 3A0A | 3031 | 4642 |
| 0000121120 | 3546 | 3030 | 3238 | 3445 | 4533 | 3546 | 3338 | 3045 |
| 0000121140 | 4246 | 4338 | 3338 | 4438 | 3238 | 4245 | 3046 | 4437 |
| 0000121160 | 3030 | 4337 | 3335 | 0A0D | 313A | 4330 | 3030 | 3035 |
| 0000121200 | 3030 | 3730 | 3034 | 3238 | 4646 | 3835 | 4532 | 3334 |
| 0000121220 | 4645 | 3835 | 4533 | 4630 | 3842 | 3843 | 3833 | 3844 |
| 0000121240 | 3732 | 0D36 | 3A0A | 3031 | 3043 | 3531 | 3030 | 4245 |
| 0000121260 | 3046 | 3437 | 3430 | 4632 | 3546 | 3238 | 3445 | 4533 |
| 0000121300 | 3546 | 3338 | 3045 | 4346 | 3341 | 3045 | 4446 | 4332 |
| 0000121320 | 0A0D | 313A | 4330 | 3230 | 3035 | 3730 | 4442 | 3746 |
| 0000121340 | 3041 | 3146 | 3832 | 3830 | 3645 | 3130 | 3732 | 3042 |
| 0000121360 | 3730 | 3041 | 3738 | 3034 | 3234 | 4646 | 0D32 | 3A0A |
| 0000121400 | 3031 | 3043 | 3533 | 3030 | 3546 | 3238 | 3445 | 4533 |
| 0000121420 | 3546 | 3338 | 4145 | 3046 | 4245 | 3341 | 3046 | 3039 |
| 0000121440 | 3845 | 4334 | 3045 | 4346 | 3246 | 0A0D | 313A | 4330 |
| 0000121460 | 3430 | 3035 | 4130 | 4533 | 4630 | 3744 | 3042 | 3730 |
| 0000121500 | 3041 | 3130 | 3832 | 4630 | 3633 | 3230 | 3931 | 4530 |
| 0000121520 | 3438 | 4543 | 4330 | 0D43 | 3A0A | 3031 | 3043 | 3535 |
| 0000121540 | 3030 | 4346 | 3341 | 3045 | 4446 | 4237 | 4637 | 4137 |
| 0000121560 | 3030 | 3231 | 3138 | 3432 | 3036 | 4130 | 3039 | 3845 |
| 0000121600 | 4334 | 3630 | 0A0D | 313A | 4330 | 3630 | 3035 | 4530 |
| 0000121620 | 4630 | 4141 | 4533 | 4630 | 3842 | 3030 | 3734 | 3742 |
| 0000121640 | 3746 | 3041 | 3830 | 3130 | 3946 | 4530 | 3438 | 3143 |
| 0000121660 | 0D38 | 3A0A | 3031 | 3043 | 3537 | 3030 | 3045 | 4346 |
| 0000121700 | 3341 | 3045 | 4446 | 4237 | 3038 | 4137 | 4646 | 3231 |
| 0000121720 | 3138 | 4630 | 3036 | 4130 | 3039 | 3845 | 3736 | 0A0D |
| 0000121740 | 313A | 4330 | 3830 | 3035 | 3430 | 4543 | 4630 | 4141 |
| 0000121760 | 4533 | 4630 | 3842 | 3030 | 3734 | 3842 | 3730 | 4641 |
| 0000122000 | 3946 | 4530 | 3438 | 4543 | 3641 | 0D31 | 3A0A | 3031 |
| 0000122020 | 3043 | 3539 | 3030 | 3046 | 4245 | 3341 | 3046 | 3437 |
| 0000122040 | 3430 | 4632 | 4246 | 3445 | 4533 | 4146 | 3231 | 3238 |
| 0000122060 | 4331 | 3230 | 4238 | 3233 | 0A0D | 313A | 4330 | 4130 |
| 0000122100 | 3035 | 3030 | 3835 | 3041 | 3934 | 4530 | 3438 | 4543 |
| 0000122120 | 4630 | 4141 | 4533 | 4630 | 3842 | 3843 | 3833 | 3844 |
| 0000122140 | 4532 | 4442 | 0D33 | 3A0A | 3031 | 3043 | 3542 | 3030 |
| 0000122160 | 3046 | 3039 | 3845 | 4534 | 3045 | 4346 | 3341 | 3045 |
| 0000122200 | 4446 | 4237 | 3030 | 4137 | 3030 | 3231 | 3038 | 3346 |
| 0000122220 | 4645 | 0A0D | 313A | 4330 | 4330 | 3035 | 3630 | 3230 |
| 0000122240 | 3931 | 4530 | 3438 | 4545 | 4630 | 4143 | 4533 | 4630 |
| 0000122260 | 3744 | 3742 | 3746 | 3041 | 3130 | 3832 | 4331 | 0D31 |
| 0000122300 | 3A0A | 3031 | 3043 | 3544 | 3030 | 3432 | 3036 | 4130 |
| 0000122320 | 3039 | 3845 | 4534 | 3045 | 4146 | 3341 | 3045 | 4246 |
| 0000122340 | 3038 | 3430 | 4237 | 4637 | 4137 | 3742 | 0A0D | 313A |
| 0000122360 | 4330 | 4530 | 3035 | 3030 | 3830 | 3130 | 3946 | 4530 |
| 0000122400 | 3438 | 4545 | 4630 | 4143 | 4533 | 4630 | 3744 | 3842 |
| 0000122420 | 3730 | 4641 | 3146 | 3032 | 0D34 | 3A0A | 3031 | 3043 |
| 0000122440 | 3546 | 3030 | 3138 | 4630 | 3036 | 4130 | 3039 | 3845 |
| 0000122460 | 4534 | 3045 | 4146 | 3341 | 3045 | 4246 | 3038 | 3430 |
| 0000122500 | 4237 | 3038 | 3441 | 0A0D | 313A | 4330 | 3031 | 3035 |
| 0000122520 | 3730 | 4641 | 3946 | 4530 | 3438 | 4545 | 4641 | 4530 |
| 0000122540 | 4142 | 4633 | 3730 | 3034 | 3234 | 4646 | 4542 | 3334 |
| 0000122560 | 4345 | 0D46 | 3A0A | 3031 | 3143 | 3531 | 3030 | 4146 |
| 0000122600 | 3231 | 3238 | 4331 | 3230 | 4238 | 3530 | 4138 | 3430 |
| 0000122620 | 3039 | 3845 | 4534 | 3045 | 4146 | 3341 | 3045 | 4432 |
| 0000122640 | 0A0D | 313A | 4330 | 3231 | 3035 | 4630 | 3842 | 3843 |
| 0000122660 | 3833 | 3844 | 4532 | 4642 | 3730 | 3034 | 3234 | 4646 |
| 0000122700 | 3835 | 4532 | 3334 | 4645 | 3835 | 3533 | 0D45 | 3A0A |
| 0000122720 | 3031 | 3143 | 3533 | 3030 | 3045 | 4346 | 3341 | 3045 |
| 0000122740 | 4446 | 4237 | 4644 | 4137 | 4630 | 3231 | 3038 | 4538 |

THU MAR 14 17:46:30 1991 SUTFILE.HEX PAGE 46, LINE 2656

| | | | | | | | | |
|---|---|---|---|---|---|---|---|---|
| 0000122760 | 3036 | 3231 | 4237 | 3030 | 4541 | 0A0D | 313A | 4330 |
| 0000123000 | 3431 | 3035 | 3730 | 3041 | 3738 | 3034 | 3234 | 4646 |
| 0000123020 | 3835 | 4532 | 3334 | 4645 | 3835 | 4533 | 4641 | 4530 |
| 0000123040 | 4142 | 4633 | 3530 | 0D38 | 3A0A | 3031 | 3143 | 3535 |
| 0000123060 | 3030 | 3437 | 3430 | 4632 | 3546 | 3238 | 3445 | 4533 |
| 0000123100 | 3546 | 3338 | 3045 | 4146 | 3341 | 3045 | 4246 | 3039 |
| 0000123120 | 3030 | 4133 | 0A0D | 313A | 4330 | 3631 | 3035 | 3030 |
| 0000123140 | 3132 | 3932 | 3543 | 3746 | 3034 | 3236 | 4646 | 3835 |
| 0000123160 | 4532 | 3334 | 4645 | 3835 | 4533 | 4630 | 4141 | 3833 |
| 0000123200 | 0D34 | 3A0A | 3031 | 3143 | 3537 | 3030 | 3045 | 4246 |
| 0000123220 | 3039 | 3030 | 3230 | 3231 | 4539 | 4233 | 4237 | 3030 |
| 0000123240 | 4137 | 3030 | 3039 | 3845 | 4334 | 4145 | 4642 | 0A0D |
| 0000123260 | 313A | 4330 | 3831 | 3035 | 4630 | 4530 | 4142 | 4633 |
| 0000123300 | 3730 | 3042 | 3730 | 3041 | 3930 | 4530 | 3438 | 4545 |
| 0000123320 | 4641 | 4530 | 4142 | 4633 | 3230 | 0D39 | 3A0A | 3031 |
| 0000123340 | 3143 | 3539 | 3030 | 4237 | 3030 | 3039 | 3845 | 3334 |
| 0000123360 | 4245 | 3046 | 3230 | 3538 | 3839 | 3437 | 3230 | 3837 |
| 0000123400 | 3030 | 3937 | 3830 | 4246 | 0A0D | 313A | 4330 | 4131 |
| 0000123420 | 3035 | 3130 | 3832 | 3435 | 3939 | 3030 | 3030 | 3130 |
| 0000123440 | 3932 | 3443 | 3743 | 3034 | 3234 | 4646 | 3835 | 4532 |
| 0000123460 | 3334 | 4545 | 0D30 | 3A0A | 3031 | 3143 | 3542 | 3030 |
| 0000123500 | 3546 | 3338 | 4145 | 3046 | 4245 | 3341 | 3046 | 3437 |
| 0000123520 | 3430 | 4632 | 3546 | 3238 | 3445 | 4533 | 3546 | 3338 |
| 0000123540 | 3246 | 0A0D | 313A | 4330 | 4331 | 3035 | 4530 | 4630 |
| 0000123560 | 4141 | 4533 | 4630 | 3742 | 3034 | 3236 | 4646 | 3835 |
| 0000123600 | 4532 | 3334 | 4645 | 3835 | 4533 | 4641 | 3730 | 0D45 |
| 0000123620 | 3A0A | 3031 | 3143 | 3544 | 3030 | 4245 | 3341 | 3046 |
| 0000123640 | 3437 | 3430 | 4632 | 4246 | 3445 | 4533 | 4146 | 3231 |
| 0000123660 | 3238 | 4331 | 3230 | 4238 | 3530 | 4344 | 0A0D | 313A |
| 0000123700 | 4330 | 4531 | 3035 | 3830 | 3041 | 3734 | 4142 | 3834 |
| 0000123720 | 3843 | 3833 | 3844 | 4532 | 4642 | 3730 | 3034 | 3234 |
| 0000123740 | 4646 | 4542 | 3334 | 4545 | 0D30 | 3A0A | 3031 | 3143 |
| 0000123760 | 3546 | 3030 | 4146 | 3231 | 3238 | 4331 | 3230 | 4238 |
| 0000124000 | 3530 | 4138 | 3430 | 3437 | 3930 | 4632 | 3546 | 3238 |
| 0000124020 | 3445 | 4533 | 4232 | 0A0D | 313A | 4330 | 3032 | 3035 |
| 0000124040 | 4630 | 3835 | 4533 | 4630 | 3842 | 3843 | 3833 | 3844 |
| 0000124060 | 4532 | 4642 | 3730 | 3034 | 3234 | 4646 | 3835 | 4532 |
| 0000124100 | 4434 | 0D42 | 3A0A | 3031 | 3243 | 3531 | 3030 | 4533 |
| 0000124120 | 3546 | 3338 | 3045 | 4346 | 3341 | 3045 | 4446 | 4237 |
| 0000124140 | 4644 | 4137 | 4630 | 3231 | 3038 | 4538 | 3036 | 3441 |
| 0000124160 | 0A0D | 313A | 4330 | 3232 | 3035 | 3130 | 3732 | 3042 |
| 0000124200 | 3730 | 3041 | 3738 | 3034 | 3234 | 4646 | 3835 | 4532 |
| 0000124220 | 3334 | 4645 | 3835 | 4533 | 4641 | 3630 | 0D38 | 3A0A |
| 0000124240 | 3031 | 3243 | 3533 | 3030 | 4245 | 3341 | 3046 | 3437 |
| 0000124260 | 3430 | 4632 | 3546 | 3238 | 3445 | 4533 | 3546 | 3338 |
| 0000124300 | 3045 | 4146 | 3341 | 3045 | 3636 | 0A0D | 313A | 4330 |
| 0000124320 | 3432 | 3035 | 4630 | 3942 | 3030 | 3030 | 3132 | 3932 |
| 0000124340 | 3543 | 3746 | 3034 | 3236 | 4646 | 3835 | 4532 | 3334 |
| 0000124360 | 4645 | 3835 | 3933 | 0D35 | 3A0A | 3031 | 3243 | 3535 |
| 0000124400 | 3030 | 3045 | 4146 | 3341 | 3045 | 4246 | 3039 | 3030 |
| 0000124420 | 3230 | 3231 | 4539 | 4233 | 4237 | 4646 | 3039 | 3845 |
| 0000124440 | 3334 | 4643 | 0A0D | 313A | 4330 | 3632 | 3035 | 4530 |
| 0000124460 | 4642 | 3030 | 3832 | 3935 | 3738 | 3034 | 3732 | 3038 |
| 0000124500 | 3730 | 3039 | 3139 | 3832 | 3435 | 3939 | 4530 | 3038 |
| 0000124520 | 0D37 | 3A0A | 3031 | 3243 | 3537 | 3030 | 3234 | 3045 |
| 0000124540 | 4246 | 3437 | 3530 | 4632 | 3546 | 3238 | 3445 | 4533 |
| 0000124560 | 3546 | 3338 | 4245 | 3046 | 3437 | 3930 | 4238 | 0A0D |
| 0000124600 | 313A | 4330 | 3832 | 3035 | 3230 | 4646 | 3835 | 4532 |
| 0000124620 | 3334 | 4645 | 3835 | 4533 | 4630 | 4141 | 4533 | 4630 |

THU MAR 14 17:46:30 1991 SUTFILE.HEX PAGE 47, LINE 2715

| | | | | | | | | |
|---|---|---|---|---|---|---|---|---|
| 0000124640 | 3142 | 3832 | 3132 | 3043 | 3532 | 0D46 | 3A0A | 3031 |
| 0000124660 | 3243 | 3539 | 3030 | 4437 | 4646 | 4337 | 3730 | 3437 |
| 0000124700 | 3930 | 4632 | 3546 | 3238 | 3445 | 4533 | 3546 | 3338 |
| 0000124720 | 3045 | 4146 | 3341 | 3036 | 0A0D | 313A | 4330 | 4132 |
| 0000124740 | 3035 | 4530 | 4630 | 3842 | 3841 | 3833 | 3842 | 4532 |
| 0000124760 | 3530 | 4643 | 4630 | 4141 | 4533 | 3530 | 4644 | 4630 |
| 0000125000 | 3742 | 3234 | 0D46 | 3A0A | 3031 | 3243 | 3542 | 3030 |
| 0000125020 | 3930 | 4632 | 3546 | 3238 | 3445 | 4533 | 3546 | 3338 |
| 0000125040 | 3045 | 4146 | 3341 | 3045 | 4246 | 3231 | 3238 | 4331 |
| 0000125060 | 3832 | 0A0D | 313A | 4330 | 4332 | 3035 | 3030 | 3832 |
| 0000125100 | 3841 | 3833 | 3842 | 4532 | 4630 | 3742 | 3034 | 3236 |
| 0000125120 | 4646 | 3835 | 4532 | 3334 | 4645 | 3835 | 4233 | 0D38 |
| 0000125140 | 3A0A | 3031 | 3243 | 3544 | 3030 | 4245 | 3046 | 3437 |
| 0000125160 | 3930 | 4632 | 3546 | 3238 | 3445 | 4533 | 3546 | 3338 |
| 0000125200 | 3045 | 4146 | 3341 | 3045 | 4246 | 3936 | 0A0D | 313A |
| 0000125220 | 4330 | 4532 | 3035 | 3130 | 3832 | 3132 | 3043 | 3832 |
| 0000125240 | 3841 | 3833 | 3842 | 4532 | 4630 | 3742 | 3034 | 3237 |
| 0000125260 | 4646 | 3835 | 4532 | 3934 | 0D44 | 3A0A | 3031 | 3243 |
| 0000125300 | 3546 | 3030 | 4533 | 3546 | 3338 | 4245 | 3046 | 4437 |
| 0000125320 | 4646 | 4337 | 3730 | 3437 | 3930 | 4632 | 3546 | 3238 |
| 0000125340 | 3445 | 4533 | 3436 | 0A0D | 313A | 4330 | 3033 | 3035 |
| 0000125360 | 4630 | 3835 | 4533 | 4630 | 4141 | 4533 | 4630 | 3842 |
| 0000125400 | 3841 | 3833 | 3842 | 4532 | 3530 | 4643 | 4630 | 4141 |
| 0000125420 | 3733 | 0D35 | 3A0A | 3031 | 3343 | 3531 | 3030 | 3045 |
| 0000125440 | 4435 | 3046 | 4246 | 3039 | 3845 | 3433 | 3045 | 4246 |
| 0000125460 | 3043 | 3330 | 4437 | 3130 | 3231 | 3138 | 3035 | 3534 |
| 0000125500 | 0A0D | 313A | 4330 | 3233 | 3035 | 4430 | 3030 | 3633 |
| 0000125520 | 3030 | 3033 | 4332 | 4233 | 3745 | 4544 | 3737 | 3034 |
| 0000125540 | 3235 | 4646 | 4542 | 3334 | 4645 | 3241 | 0D43 | 3A0A |
| 0000125560 | 3031 | 3343 | 3533 | 3030 | 4138 | 3338 | 4238 | 3238 |
| 0000125600 | 3045 | 4435 | 3046 | 4246 | 3437 | 3630 | 4632 | 3546 |
| 0000125620 | 3238 | 3445 | 4533 | 3546 | 4637 | 0A0D | 313A | 4330 |
| 0000125640 | 3433 | 3035 | 3830 | 4533 | 4630 | 3744 | 3742 | 3146 |
| 0000125660 | 3832 | 3431 | 3630 | 3130 | 3733 | 3144 | 3730 | 3034 |
| 0000125700 | 3235 | 4646 | 3142 | 0D38 | 3A0A | 3031 | 3343 | 3535 |
| 0000125720 | 3030 | 3445 | 4533 | 4146 | 4138 | 3338 | 4238 | 3238 |
| 0000125740 | 3045 | 4434 | 3046 | 4246 | 3038 | 4131 | 3437 | 3630 |
| 0000125760 | 4632 | 3734 | 0A0D | 313A | 4330 | 3633 | 3035 | 4630 |
| 0000126000 | 3835 | 4532 | 3334 | 4645 | 3835 | 4533 | 4630 | 4547 |
| 0000126020 | 4642 | 3034 | 4634 | 3742 | 3034 | 3236 | 4646 | 3635 |
| 0000126040 | 0D30 | 3A0A | 3031 | 3343 | 3537 | 3030 | 3238 | 3445 |
| 0000126060 | 4533 | 3546 | 3338 | 4245 | 3046 | 3437 | 3730 | 4632 |
| 0000126100 | 3546 | 3238 | 3445 | 4533 | 3546 | 3338 | 3630 | 0A0D |
| 0000126120 | 313A | 4330 | 3833 | 3035 | 4530 | 4630 | 3744 | 3742 |
| 0000126140 | 3146 | 3832 | 3431 | 3630 | 3130 | 3733 | 3044 | 3738 |
| 0000126160 | 3034 | 3235 | 4646 | 4542 | 3734 | 0D46 | 3A0A | 3031 |
| 0000126200 | 3343 | 3539 | 3030 | 4533 | 4146 | 4138 | 3338 | 4238 |
| 0000126220 | 3238 | 3045 | 4434 | 3046 | 4246 | 3038 | 4131 | 3437 |
| 0000126240 | 3730 | 4632 | 3546 | 3546 | 0A0D | 313A | 4330 | 4133 |
| 0000126260 | 3035 | 3830 | 4532 | 3334 | 4645 | 3835 | 4533 | 4630 |
| 0000126300 | 4542 | 4642 | 3034 | 4634 | 3742 | 3034 | 3237 | 4646 |
| 0000126320 | 3835 | 3932 | 0D32 | 3A0A | 3031 | 3343 | 3542 | 3030 |
| 0000126340 | 3445 | 4533 | 3546 | 3338 | 4245 | 3046 | 3230 | 3443 |
| 0000126360 | 3842 | 3043 | 3330 | 4437 | 3230 | 3231 | 3138 | 3035 |
| 0000126400 | 3036 | 0A0D | 313A | 4330 | 4333 | 3035 | 4430 | 3030 |
| 0000126420 | 3733 | 3730 | 3736 | 3034 | 3236 | 4646 | 3835 | 4532 |
| 0000126440 | 3334 | 4645 | 3835 | 4533 | 4630 | 3744 | 3942 | 0D44 |
| 0000126460 | 3A0A | 3031 | 3343 | 3544 | 3030 | 3630 | 4337 | 3030 |
| 0000126500 | 3231 | 3238 | 3143 | 4238 | 3530 | 4237 | 3330 | 4245 |

THU MAR 14 17:46:30 1991 SUTFILE.HEX PAGE 48, LINE 2774

| | | | | | | | | |
|---|---|---|---|---|---|---|---|---|
| 0000126520 | 4435 | 4246 | 3231 | 3538 | 3443 | 3544 | 0A0D | 313A |
| 0000126540 | 4330 | 4533 | 3035 | 3730 | 3034 | 3238 | 4646 | 3835 |
| 0000126560 | 4532 | 3334 | 4645 | 3835 | 4533 | 4630 | 3744 | 3042 |
| 0000126600 | 3734 | 3043 | 3130 | 4132 | 0D32 | 3A0A | 3031 | 3343 |
| 0000126620 | 3546 | 3030 | 3238 | 3143 | 3231 | 3538 | 3745 | 3231 |
| 0000126640 | 3538 | 4243 | 4238 | 3530 | 4237 | 4330 | 4245 | 4435 |
| 0000126660 | 4246 | 3231 | 3941 | 0A0D | 313A | 4330 | 3034 | 3035 |
| 0000126700 | 3830 | 4535 | 4537 | 3442 | 4644 | 3842 | 3042 | 3735 |
| 0000126720 | 3034 | 3235 | 4646 | 4542 | 3334 | 4645 | 3841 | 3841 |
| 0000126740 | 3233 | 0D43 | 3A0A | 3031 | 3443 | 3531 | 3030 | 4238 |
| 0000126760 | 3238 | 3045 | 4434 | 3046 | 4246 | 4437 | 4633 | 3437 |
| 0000127000 | 3630 | 4632 | 4246 | 3445 | 4533 | 4146 | 4138 | 4345 |
| 0000127020 | 0A0D | 313A | 4330 | 3234 | 3035 | 3830 | 3833 | 3842 |
| 0000127040 | 4532 | 3530 | 4644 | 4630 | 3742 | 3344 | 3746 | 3034 |
| 0000127060 | 3237 | 4646 | 4542 | 3334 | 4645 | 4441 | 0D32 | 3A0A |
| 0000127100 | 3031 | 3443 | 3533 | 3030 | 4138 | 3338 | 4238 | 3238 |
| 0000127120 | 3045 | 4435 | 3046 | 4246 | 3038 | 3937 | 4437 | 3330 |
| 0000127140 | 3231 | 3138 | 3035 | 3037 | 3945 | 0A0D | 313A | 4330 |
| 0000127160 | 3434 | 3035 | 3730 | 3730 | 3034 | 3237 | 4646 | 3835 |
| 0000127200 | 4532 | 3334 | 4645 | 3835 | 4533 | 4630 | 4542 | 4642 |
| 0000127220 | 3034 | 4634 | 3042 | 0D33 | 3A0A | 3031 | 3443 | 3535 |
| 0000127240 | 3030 | 3437 | 3730 | 4632 | 3546 | 3238 | 3445 | 4533 |
| 0000127260 | 3546 | 3338 | 4245 | 3046 | 3437 | 3630 | 4632 | 3546 |
| 0000127300 | 3238 | 3132 | 0A0D | 313A | 4330 | 3634 | 3035 | 4530 |
| 0000127320 | 3334 | 4645 | 3835 | 4533 | 4630 | 3744 | 3042 | 3733 |
| 0000127340 | 3043 | 3130 | 3832 | 4332 | 3831 | 3042 | 3735 | 4642 |
| 0000127360 | 0D36 | 3A0A | 3031 | 3443 | 3537 | 3030 | 3031 | 4245 |
| 0000127400 | 4435 | 4246 | 4238 | 3530 | 3437 | 3530 | 4632 | 4246 |
| 0000127420 | 3445 | 4533 | 4146 | 4138 | 3338 | 4238 | 4437 | 0A0D |
| 0000127440 | 313A | 4330 | 3834 | 3035 | 3830 | 4532 | 3430 | 4644 |
| 0000127460 | 4630 | 3742 | 3034 | 3237 | 4646 | 3835 | 4532 | 3334 |
| 0000127500 | 4645 | 3835 | 4533 | 4630 | 3744 | 0D35 | 3A0A | 3031 |
| 0000127520 | 3443 | 3539 | 3030 | 4237 | 3230 | 4337 | 3030 | 3231 |
| 0000127540 | 3238 | 3143 | 4238 | 3530 | 4237 | 3032 | 4245 | 4435 |
| 0000127560 | 4246 | 4238 | 3530 | 4234 | 0A0D | 313A | 4330 | 4134 |
| 0000127600 | 3035 | 3730 | 3034 | 3235 | 4646 | 4542 | 3334 | 4645 |
| 0000127620 | 3841 | 3841 | 3833 | 3842 | 4532 | 3430 | 4644 | 4630 |
| 0000127640 | 3842 | 3130 | 0D36 | 3A0A | 3031 | 3443 | 3542 | 3030 |
| 0000127660 | 3230 | 3038 | 3030 | 4237 | 3030 | 3437 | 3430 | 4632 |
| 0000127700 | 3546 | 3238 | 3445 | 4533 | 3546 | 3338 | 4245 | 3046 |
| 0000127720 | 3745 | 0A0D | 313A | 4330 | 4334 | 3035 | 3730 | 3034 |
| 0000127740 | 3234 | 4646 | 3835 | 4532 | 3334 | 4645 | 3835 | 4533 |
| 0000127760 | 4630 | 3744 | 3042 | 3132 | 3832 | 3431 | 3830 | 0D32 |
| 0000130000 | 3A0A | 3031 | 3443 | 3544 | 3030 | 3037 | 3330 | 3230 |
| 0000130020 | 3543 | 3938 | 4237 | 3930 | 4137 | 3032 | 4138 | 3338 |
| 0000130040 | 4238 | 3238 | 3045 | 4246 | 4137 | 3730 | 0A0D | 313A |
| 0000130060 | 4330 | 4534 | 3035 | 3030 | 3830 | 3042 | 3835 | 3041 |
| 0000130100 | 3734 | 3042 | 3734 | 3041 | 4530 | 3542 | 4644 | 4542 |
| 0000130120 | 3541 | 3443 | 3642 | 4630 | 0D43 | 3A0A | 3031 | 3443 |
| 0000130140 | 3546 | 3030 | 3445 | 3039 | 3845 | 3433 | 3045 | 4446 |
| 0000130160 | 4237 | 3330 | 4445 | 4236 | 3036 | 3230 | 3437 | 4646 |
| 0000130200 | 3430 | 3036 | 4242 | 0A0D | 313A | 4330 | 3035 | 3035 |
| 0000130220 | 3330 | 3738 | 3034 | 3234 | 4646 | 3835 | 4532 | 3334 |
| 0000130240 | 4645 | 3835 | 4533 | 3630 | 3230 | 3743 | 3042 | 3730 |
| 0000130260 | 4434 | 0D42 | 3A0A | 3031 | 3543 | 3531 | 3030 | 3830 |
| 0000130300 | 4632 | 3546 | 3238 | 3445 | 4533 | 3546 | 3338 | 4245 |
| 0000130320 | 3046 | 3437 | 3830 | 4632 | 3546 | 3238 | 3445 | 4445 |
| 0000130340 | 0A0D | 313A | 4330 | 3235 | 3035 | 3330 | 4645 | 3835 |
| 0000130360 | 4533 | 4630 | 3744 | 3042 | 3141 | 3832 | 4430 | 3642 |

THU MAR 14 17:46:30 1991 SUTFILE.HEX PAGE 49, LINE 2833

| | | | | | | | | |
|---|---|---|---|---|---|---|---|---|
| 0000130400 | 3030 | 3744 | 3034 | 3238 | 4646 | 3642 | 0D45 | 3A0A |
| 0000130420 | 3031 | 3543 | 3533 | 3030 | 3445 | 4533 | 4146 | 3231 |
| 0000130440 | 3238 | 4331 | 3130 | 3038 | 3145 | 3039 | 3045 | 3630 |
| 0000130460 | 3045 | 3036 | 3330 | 3230 | 4430 | 0A0D | 313A | 4330 |
| 0000130500 | 3435 | 3035 | 3830 | 3935 | 3738 | 3044 | 3742 | 3243 |
| 0000130520 | 3730 | 3034 | 3235 | 4646 | 4542 | 3334 | 4645 | 3141 |
| 0000130540 | 3832 | 4435 | 3739 | 0D36 | 3A0A | 3031 | 3543 | 3535 |
| 0000130560 | 3030 | 4238 | 3530 | 4138 | 3430 | 3437 | 3630 | 4632 |
| 0000130600 | 3546 | 3238 | 3445 | 4533 | 3546 | 3338 | 3045 | 4246 |
| 0000130620 | 4137 | 3941 | 0A0D | 313A | 4330 | 3635 | 3035 | 3030 |
| 0000130640 | 4530 | 3242 | 4644 | 4542 | 3341 | 4643 | 3141 | 3832 |
| 0000130660 | 4535 | 3845 | 3841 | 3833 | 3842 | 4532 | 4630 | 3142 |
| 0000130700 | 0D39 | 3A0A | 3031 | 3543 | 3537 | 3030 | 4338 | 3338 |
| 0000130720 | 4438 | 3238 | 4245 | 3046 | 3437 | 3430 | 4632 | 4246 |
| 0000130740 | 3445 | 4533 | 4146 | 3231 | 3238 | 4331 | 4634 | 0A0D |
| 0000130760 | 313A | 4330 | 3835 | 3035 | 3030 | 3031 | 4332 | 4334 |
| 0000131000 | 3935 | 4530 | 3338 | 4534 | 3730 | 3530 | 3744 | 3042 |
| 0000131020 | 3730 | 3034 | 3234 | 4646 | 4135 | 0D41 | 3A0A | 3031 |
| 0000131040 | 3543 | 3539 | 3030 | 3238 | 3445 | 4533 | 3546 | 3338 |
| 0000131060 | 4245 | 3046 | 3437 | 3430 | 4632 | 3546 | 3238 | 3445 |
| 0000131100 | 4533 | 3546 | 3338 | 3745 | 0A0D | 313A | 4330 | 4135 |
| 0000131120 | 3035 | 4530 | 4630 | 3744 | 3042 | 3131 | 3832 | 3431 |
| 0000131140 | 3630 | 3330 | 3745 | 3042 | 3739 | 3241 | 3830 | 3841 |
| 0000131160 | 3833 | 3042 | 0D36 | 3A0A | 3031 | 3543 | 3542 | 3030 |
| 0000131200 | 3238 | 3045 | 4246 | 4137 | 3030 | 4238 | 3530 | 4138 |
| 0000131220 | 3430 | 4237 | 3430 | 4137 | 3030 | 4245 | 4435 | 4246 |
| 0000131240 | 3534 | 0A0D | 313A | 4330 | 4335 | 3035 | 4530 | 3541 |
| 0000131260 | 3443 | 3642 | 4530 | 3934 | 4530 | 3030 | 4536 | 3630 |
| 0000131300 | 3030 | 3033 | 3832 | 3935 | 3738 | 3044 | 3342 | 0D31 |
| 0000131320 | 3A0A | 3031 | 3543 | 3544 | 3030 | 4337 | 3032 | 4237 |
| 0000131340 | 3030 | 4338 | 3338 | 4438 | 3238 | 4245 | 3046 | 3437 |
| 0000131360 | 3430 | 4632 | 4246 | 3445 | 4533 | 3238 | 0A0D | 313A |
| 0000131400 | 4330 | 4535 | 3035 | 4630 | 3141 | 3832 | 3132 | 3043 |
| 0000131420 | 3831 | 4230 | 3030 | 3832 | 3935 | 3738 | 3034 | 3732 |
| 0000131440 | 3038 | 3730 | 3039 | 4436 | 0D46 | 3A0A | 3031 | 3543 |
| 0000131460 | 3546 | 3030 | 3231 | 3538 | 3934 | 3437 | 3630 | 4632 |
| 0000131500 | 3546 | 3238 | 3445 | 4533 | 3546 | 3338 | 3045 | 4146 |
| 0000131520 | 3341 | 3045 | 4633 | 0A0D | 313A | 4330 | 3036 | 3035 |
| 0000131540 | 4630 | 3142 | 3832 | 3132 | 3043 | 3832 | 3841 | 3833 |
| 0000131560 | 3842 | 4532 | 4630 | 3942 | 4530 | 3438 | 4532 | 4642 |
| 0000131600 | 4530 | 0D45 | 3A0A | 3031 | 3643 | 3531 | 3030 | 4437 |
| 0000131620 | 4646 | 4337 | 3730 | 3437 | 3630 | 4632 | 3546 | 3238 |
| 0000131640 | 3445 | 4533 | 3546 | 3338 | 3045 | 4146 | 3341 | 4644 |
| 0000131660 | 0A0D | 313A | 4330 | 3236 | 3035 | 4530 | 4630 | 3842 |
| 0000131700 | 3841 | 3833 | 3842 | 4532 | 3530 | 4643 | 4630 | 4141 |
| 0000131720 | 4533 | 3530 | 4644 | 4630 | 3942 | 3830 | 0D46 | 3A0A |
| 0000131740 | 3031 | 3643 | 3533 | 3030 | 3845 | 3433 | 3045 | 4246 |
| 0000131760 | 3043 | 3330 | 4437 | 3030 | 3231 | 3138 | 3035 | 3044 |
| 0000132000 | 3330 | 3037 | 3731 | 3039 | 3146 | 0A0D | 313A | 4330 |
| 0000132020 | 3436 | 3035 | 4530 | 3438 | 4532 | 4630 | 4542 | 4642 |
| 0000132040 | 4634 | 3842 | 3042 | 3735 | 3842 | 4530 | 3442 | 4644 |
| 0000132060 | 3942 | 4530 | 4438 | 0D30 | 3A0A | 3031 | 3643 | 3535 |
| 0000132100 | 3030 | 3234 | 4245 | 3046 | 3230 | 3743 | 3035 | 3043 |
| 0000132120 | 3330 | 4437 | 3130 | 3231 | 3138 | 3035 | 3044 | 3330 |
| 0000132140 | 3037 | 3833 | 0A0D | 313A | 4330 | 3636 | 3035 | 3130 |
| 0000132160 | 3731 | 3944 | 3738 | 3442 | 3732 | 4541 | 3838 | 3841 |
| 0000132200 | 3833 | 3842 | 4532 | 3430 | 4644 | 4630 | 3042 | 3432 |
| 0000132220 | 0D43 | 3A0A | 3031 | 3643 | 3537 | 3030 | 3743 | 3035 |
| 0000132240 | 3043 | 3330 | 4437 | 3230 | 3231 | 3138 | 3035 | 3044 |

THU MAR 14 17:46:30 1991 SUTFILE.HEX PAGE 50, LINE 2892

| | | | | | | | | |
|---|---|---|---|---|---|---|---|---|
| 0000132260 | 3330 | 3037 | 3036 | 3039 | 3845 | 3234 | 4331 | 0A0D |
| 0000132300 | 313A | 4330 | 3836 | 3035 | 4530 | 4630 | 3744 | 3043 |
| 0000132320 | 3730 | 3042 | 3734 | 3041 | 4530 | 3542 | 4644 | 4542 |
| 0000132340 | 3541 | 3443 | 3642 | 3030 | 3145 | 0D31 | 3A0A | 3031 |
| 0000132360 | 3643 | 3539 | 3030 | 4437 | 3032 | 4237 | 3234 | 4137 |
| 0000132400 | 3845 | 4138 | 3:38 | 4238 | 3238 | 3045 | 4434 | 3046 |
| 0000132420 | 4246 | 3039 | 3845 | 4632 | 0A0D | 313A | 4330 | 4136 |
| 0000132440 | 3035 | 3430 | 4532 | 4630 | 3744 | 3043 | 3730 | 3042 |
| 0000132460 | 3731 | 3041 | 4530 | 3542 | 4644 | 4542 | 3541 | 3443 |
| 0000132500 | 3642 | 4330 | 0D30 | 3A0A | 3031 | 3643 | 3542 | 3030 |
| 0000132520 | 4530 | 4437 | 3031 | 4237 | 3234 | 4137 | 3845 | 4138 |
| 0000132540 | 3338 | 4238 | 3238 | 3045 | 4434 | 3046 | 4246 | 4437 |
| 0000132560 | 4330 | 0A0D | 313A | 4330 | 4336 | 3035 | 4330 | 3730 |
| 0000132600 | 3442 | 3732 | 4541 | 3838 | 3841 | 3833 | 3842 | 4532 |
| 0000132620 | 3430 | 4644 | 4630 | 3742 | 4644 | 3730 | 3642 | 0D43 |
| 0000132640 | 3A0A | 3031 | 3643 | 3544 | 3030 | 3234 | 4137 | 3845 |
| 0000132660 | 4138 | 3338 | 4238 | 3238 | 3045 | 4435 | 3046 | 4246 |
| 0000132700 | 3038 | 4536 | 4437 | 3330 | 3231 | 4645 | 0A0D | 313A |
| 0000132720 | 4330 | 4536 | 3035 | 3830 | 3531 | 3730 | 3630 | 3737 |
| 0000132740 | 3042 | 3730 | 3034 | 3234 | 4646 | 3835 | 4532 | 3334 |
| 0000132760 | 4645 | 3835 | 4533 | 3742 | 0D46 | 3A0A | 3031 | 3643 |
| 0000133000 | 3546 | 3030 | 3046 | 3039 | 3845 | 3234 | 3045 | 4446 |
| 0000133020 | 4337 | 3030 | 4237 | 3430 | 4137 | 3030 | 4245 | 4435 |
| 0000133040 | 4246 | 4145 | 4330 | 0A0D | 313A | 4330 | 3037 | 3035 |
| 0000133060 | 3530 | 3443 | 3642 | 3130 | 3731 | 3044 | 3731 | 3034 |
| 0000133100 | 3234 | 4646 | 4542 | 3334 | 4645 | 3841 | 3841 | 3833 |
| 0000133120 | 3342 | 0D38 | 3A0A | 3031 | 3743 | 3531 | 3030 | 3238 |
| 0000133140 | 3045 | 4434 | 3046 | 4246 | 3039 | 3845 | 3234 | 3045 |
| 0000133160 | 4446 | 4337 | 3030 | 4237 | 3130 | 4137 | 3030 | 3137 |
| 0000133200 | 0A0D | 313A | 4330 | 3237 | 3035 | 4530 | 3542 | 4644 |
| 0000133220 | 4542 | 3541 | 3443 | 3642 | 3130 | 3731 | 3044 | 3732 |
| 0000133240 | 3034 | 3234 | 4646 | 4542 | 3334 | 3745 | 0D43 | 3A0A |
| 0000133260 | 3031 | 3743 | 3533 | 3030 | 4146 | 4138 | 3338 | 4238 |
| 0000133300 | 3238 | 3045 | 4434 | 3046 | 4246 | 3437 | 3430 | 4632 |
| 0000133320 | 3546 | 3238 | 3445 | 4533 | 3838 | 0A0D | 313A | 4330 |
| 0000133340 | 3437 | 3035 | 4630 | 3835 | 4533 | 4630 | 3942 | 4530 |
| 0000133360 | 3438 | 4532 | 4642 | 3830 | 3030 | 3730 | 3042 | 3739 |
| 0000133400 | 3241 | 3830 | 4441 | 0D34 | 3A0A | 3031 | 3743 | 3535 |
| 0000133420 | 3030 | 3338 | 4238 | 3238 | 3045 | 4246 | 4137 | 3030 |
| 0000133440 | 4238 | 3530 | 4138 | 3430 | 4237 | 3430 | 4137 | 3030 |
| 0000133460 | 4245 | 4445 | 0A0D | 313A | 4330 | 3637 | 3035 | 3530 |
| 0000133500 | 4644 | 4542 | 3541 | 3443 | 3642 | 4530 | 3734 | 3044 |
| 0000133520 | 3742 | 3243 | 3930 | 4530 | 3438 | 4532 | 4630 | 4442 |
| 0000133540 | 0D45 | 3A0A | 3031 | 3743 | 3537 | 3030 | 4338 | 3338 |
| 0000133560 | 4438 | 3238 | 4245 | 3046 | 4237 | 3030 | 3437 | 3430 |
| 0000133600 | 4632 | 3546 | 3238 | 3445 | 4533 | 3546 | 4230 | 0A0D |
| 0000133620 | 313A | 4330 | 3837 | 3035 | 3830 | 4533 | 4642 | 3730 |
| 0000133640 | 3034 | 3234 | 4646 | 3835 | 4532 | 3334 | 4645 | 3835 |
| 0000133660 | 4533 | 4630 | 3744 | 3042 | 3331 | 0D35 | 3A0A | 3031 |
| 0000133700 | 3743 | 3539 | 3030 | 3231 | 3138 | 3034 | 3036 | 3237 |
| 0000133720 | 4237 | 3930 | 4137 | 3032 | 4138 | 3338 | 4238 | 3238 |
| 0000133740 | 3045 | 4246 | 4137 | 3236 | 0A0D | 313A | 4330 | 4137 |
| 0000133760 | 3035 | 3030 | 3830 | 3042 | 3835 | 3041 | 3734 | 3042 |
| 0000134000 | 3734 | 3041 | 4530 | 3542 | 4644 | 4542 | 3541 | 3443 |
| 0000134020 | 3642 | 3330 | 0D39 | 3A0A | 3031 | 3743 | 3542 | 3030 |
| 0000134040 | 3445 | 3039 | 3845 | 3433 | 3045 | 4446 | 4237 | 3330 |
| 0000134060 | 4445 | 4236 | 3036 | 3230 | 3437 | 4646 | 3430 | 3036 |
| 0000134100 | 3846 | 0A0D | 313A | 4330 | 4337 | 3035 | 3230 | 3743 |
| 0000134120 | 3042 | 3730 | 3034 | 3235 | 4646 | 3835 | 4532 | 3334 |

THU MAR 14 17:46:30 1991 SUTFILE.HEX PAGE 51, LINE 2951

| | | | | | | | | |
|---|---|---|---|---|---|---|---|---|
| 0000134140 | 4645 | 3835 | 4533 | 4642 | 3730 | 3034 | 4235 | 0D30 |
| 0000134160 | 3A0A | 3031 | 3743 | 3544 | 3030 | 4632 | 3546 | 3238 |
| 0000134200 | 3445 | 4533 | 3546 | 3338 | 3045 | 4446 | 4237 | 4130 |
| 0000134220 | 3231 | 3038 | 4244 | 3036 | 4430 | 3344 | 0A0D | 313A |
| 0000134240 | 4330 | 4537 | 3035 | 3730 | 3034 | 3235 | 4646 | 4542 |
| 0000134260 | 3334 | 4645 | 3141 | 3832 | 3132 | 3043 | 3831 | 4530 |
| 0000134300 | 3731 | 3044 | 3742 | 3643 | 0D46 | 3A0A | 3031 | 3743 |
| 0000134320 | 3546 | 3030 | 3032 | 4237 | 3030 | 4338 | 3338 | 4438 |
| 0000134340 | 3238 | 4245 | 3046 | 3437 | 3430 | 4632 | 4246 | 3445 |
| 0000134360 | 4533 | 4146 | 3245 | 0A0D | 313A | 4330 | 3038 | 3035 |
| 0000134400 | 3130 | 3832 | 3132 | 3043 | 3031 | 4332 | 3837 | 3938 |
| 0000134420 | 4530 | 3338 | 4534 | 3730 | 3530 | 3734 | 3042 | 3730 |
| 0000134440 | 4534 | 0D32 | 3A0A | 3031 | 3843 | 3531 | 3030 | 3430 |
| 0000134460 | 4632 | 3546 | 3238 | 3445 | 4533 | 3546 | 3338 | 4245 |
| 0000134500 | 3046 | 3437 | 3430 | 4632 | 3546 | 3238 | 3445 | 3246 |
| 0000134520 | 0A0D | 313A | 4330 | 3238 | 3035 | 3330 | 4645 | 3835 |
| 0000134540 | 4533 | 4630 | 3744 | 3042 | 3131 | 3832 | 3431 | 3630 |
| 0000134560 | 3330 | 3735 | 3042 | 3739 | 3241 | 3630 | 0D45 | 3A0A |
| 0000134600 | 3031 | 3843 | 3533 | 3030 | 4138 | 3338 | 4238 | 3238 |
| 0000134620 | 3045 | 4246 | 4137 | 3030 | 4238 | 3530 | 4138 | 3430 |
| 0000134640 | 4237 | 3430 | 4137 | 3030 | 4436 | 0A0D | 313A | 4330 |
| 0000134660 | 3438 | 3035 | 4530 | 3542 | 4644 | 4542 | 3541 | 3443 |
| 0000134700 | 3642 | 4530 | 3734 | 3044 | 3742 | 3243 | 3730 | 3042 |
| 0000134720 | 3830 | 3843 | 3133 | 0D44 | 3A0A | 3031 | 3843 | 3535 |
| 0000134740 | 3030 | 4438 | 3238 | 4245 | 3046 | 3437 | 3430 | 4632 |
| 0000134760 | 4246 | 3445 | 4533 | 4146 | 3231 | 3238 | 4331 | 3130 |
| 0000135000 | 3038 | 4146 | 0A0D | 313A | 4330 | 3638 | 3035 | 4230 |
| 0000135020 | 3039 | 3832 | 3935 | 4538 | 3734 | 3038 | 3730 | 3039 |
| 0000135040 | 3136 | 3832 | 3435 | 3739 | 3042 | 3730 | 3034 | 3334 |
| 0000135060 | 0D44 | 3A0A | 3031 | 3843 | 3537 | 3030 | 4632 | 3546 |
| 0000135100 | 3238 | 3445 | 4533 | 3546 | 3338 | 4245 | 3046 | 3437 |
| 0000135120 | 3430 | 4632 | 3546 | 3238 | 3445 | 4533 | 3835 | 0A0D |
| 0000135140 | 313A | 4330 | 3838 | 3035 | 4630 | 3835 | 4533 | 4630 |
| 0000135160 | 3744 | 3042 | 3132 | 3832 | 3431 | 3730 | 3030 | 3033 |
| 0000135200 | 4332 | 3339 | 3736 | 3042 | 3039 | 0D36 | 3A0A | 3031 |
| 0000135220 | 3843 | 3539 | 3030 | 4137 | 3032 | 4138 | 3338 | 4238 |
| 0000135240 | 3238 | 3045 | 4246 | 4137 | 3030 | 4238 | 3530 | 4138 |
| 0000135260 | 3430 | 4237 | 3430 | 4445 | 0A0D | 313A | 4330 | 4138 |
| 0000135300 | 3035 | 3730 | 3041 | 4530 | 3542 | 4644 | 4542 | 3541 |
| 0000135320 | 3443 | 3642 | 4530 | 3934 | 4530 | 3338 | 4534 | 4630 |
| 0000135340 | 3744 | 4542 | 0D44 | 3A0A | 3031 | 3843 | 3542 | 3030 |
| 0000135360 | 3330 | 4445 | 4236 | 3036 | 3230 | 3437 | 4646 | 3430 |
| 0000135400 | 3036 | 3833 | 3437 | 3430 | 4632 | 3546 | 3238 | 3445 |
| 0000135420 | 3541 | 0A0D | 313A | 4330 | 4338 | 3035 | 3330 | 4645 |
| 0000135440 | 3835 | 4[illegible]3 | 3630 | 3230 | 3743 | 3042 | 3730 | 3034 |
| 0000135460 | 3235 | 4646 | 3835 | 4532 | 3334 | 4645 | 3935 | 0D30 |
| 0000135500 | 3A0A | 3031 | 3843 | 3544 | 3030 | 3338 | 4245 | 3046 |
| 0000135520 | 3437 | 3530 | 4632 | 3546 | 3238 | 3445 | 4533 | 3546 |
| 0000135540 | 3338 | 3045 | 4446 | 4237 | 4130 | 4144 | 0A0D | 313A |
| 0000135560 | 4330 | 4538 | 3035 | 3130 | 3832 | 4430 | 3642 | 3030 |
| 0000135600 | 3744 | 3034 | 3235 | 4646 | 4542 | 3334 | 4645 | 3141 |
| 0000135620 | 3832 | 3132 | 3043 | 4631 | 0D39 | 3A0A | 3031 | 3843 |
| 0000135640 | 3546 | 3030 | 3038 | 3145 | 4437 | 4230 | 4337 | 3032 |
| 0000135660 | 4237 | 4233 | 4137 | 3845 | 3231 | 3538 | 3944 | 4238 |
| 0000135700 | 3530 | 4138 | 4330 | 0A0D | 313A | 4330 | 3039 | 3035 |
| 0000135720 | 3030 | 3734 | 3034 | 3236 | 4646 | 3835 | 4532 | 3334 |
| 0000135740 | 4645 | 3835 | 4533 | 4630 | 3742 | 3041 | 4530 | 3242 |
| 0000135760 | 4644 | 0D37 | 3A0A | 3031 | 3943 | 3531 | 3030 | 4246 |
| 0000136000 | 4145 | 4333 | 4146 | 3231 | 3538 | 4545 | 4138 | 3338 |

THU MAR 14 17:46:30 1991 SUTFILE.HEX PAGE 52, LINE 3010

| | | | | | | | | |
|---|---|---|---|---|---|---|---|---|
| 0000136020 | 4238 | 3238 | 3045 | 4246 | 4338 | 3338 | 4438 | 3145 |
| 0000136040 | 0A0D | 313A | 4330 | 3239 | 3035 | 3830 | 4532 | 4642 |
| 0000136060 | 3730 | 3034 | 3234 | 4646 | 4542 | 3334 | 4645 | 3141 |
| 0000136100 | 3832 | 3132 | 3043 | 3031 | 4332 | 3638 | 0D43 | 3A0A |
| 0000136120 | 3031 | 3943 | 3533 | 3030 | 4537 | 3039 | 3845 | 3433 |
| 0000136140 | 3045 | 3036 | 3330 | 3230 | 3943 | 3842 | 4237 | 3030 |
| 0000136160 | 3437 | 3430 | 4632 | 3546 | 4245 | 0A0D | 313A | 4330 |
| 0000136200 | 3439 | 3035 | 3830 | 4532 | 3334 | 4645 | 3835 | 4533 |
| 0000136220 | 4642 | 3730 | 3034 | 3234 | 4646 | 3835 | 4532 | 3334 |
| 0000136240 | 4645 | 3835 | 3333 | 0D33 | 3A0A | 3031 | 3943 | 3535 |
| 0000136260 | 3030 | 3045 | 4446 | 4237 | 3130 | 3231 | 3138 | 3034 |
| 0000136300 | 3036 | 4135 | 4237 | 3930 | 4137 | 3032 | 4138 | 3338 |
| 0000136320 | 4238 | 3633 | 0A0D | 313A | 4330 | 3639 | 3035 | 3830 |
| 0000136340 | 4532 | 4630 | 3742 | 3041 | 3830 | 3042 | 3835 | 3041 |
| 0000136360 | 3734 | 3042 | 3734 | 3041 | 4530 | 3542 | 4644 | 3942 |
| 0000136400 | 0D31 | 3A0A | 3031 | 3943 | 3537 | 3030 | 4145 | 4335 |
| 0000136420 | 4234 | 3036 | 3445 | 4437 | 4230 | 4337 | 3032 | 4237 |
| 0000136440 | 4533 | 4137 | 3845 | 3231 | 3538 | 3944 | 4532 | 0A0D |
| 0000136460 | 313A | 4330 | 3839 | 3035 | 3830 | 3042 | 3835 | 3041 |
| 0000136500 | 3734 | 3034 | 3236 | 4646 | 3835 | 4532 | 3334 | 4645 |
| 0000136520 | 3835 | 4533 | 4630 | 3742 | 3741 | 0D35 | 3A0A | 3031 |
| 0000136540 | 3943 | 3539 | 3030 | 3030 | 4245 | 4432 | 4246 | 4145 |
| 0000136560 | 4333 | 4146 | 3231 | 3538 | 4545 | 4138 | 3338 | 4238 |
| 0000136600 | 3238 | 3045 | 4246 | 3545 | 0A0D | 313A | 4330 | 4139 |
| 0000136620 | 3035 | 3830 | 3843 | 3833 | 3844 | 4532 | 4642 | 3730 |
| 0000136640 | 3034 | 3234 | 4646 | 4542 | 3334 | 4645 | 3141 | 3832 |
| 0000136660 | 3132 | 3143 | 0D42 | 3A0A | 3031 | 3943 | 3542 | 3030 |
| 0000136700 | 3130 | 3038 | 3439 | 3230 | 3538 | 3839 | 3445 | 3837 |
| 0000136720 | 3030 | 3937 | 3430 | 3231 | 3538 | 3934 | 4237 | 4230 |
| 0000136740 | 4646 | 0A0D | 313A | 4330 | 4339 | 3035 | 3730 | 3241 |
| 0000136760 | 3830 | 3841 | 3833 | 3842 | 4532 | 4630 | 3942 | 4530 |
| 0000137000 | 3438 | 4530 | 4642 | 3930 | 4530 | 3438 | 3830 | 0D38 |
| 0000137020 | 3A0A | 3031 | 3943 | 3544 | 3030 | 3045 | 4446 | 4237 |
| 0000137040 | 3337 | 4445 | 4236 | 3036 | 3230 | 3437 | 4646 | 3430 |
| 0000137060 | 3036 | 4330 | 4437 | 3230 | 4337 | 4645 | 0A0D | 313A |
| 0000137100 | 4330 | 4539 | 3035 | 3230 | 3730 | 3042 | 3835 | 3843 |
| 0000137120 | 3833 | 3844 | 4532 | 4642 | 3730 | 3042 | 3731 | 3241 |
| 0000137140 | 3830 | 3841 | 3833 | 4642 | 0D42 | 3A0A | 3031 | 3943 |
| 0000137160 | 3546 | 3030 | 3238 | 3045 | 4246 | 4137 | 3030 | 4238 |
| 0000137200 | 3530 | 4138 | 3430 | 4237 | 3430 | 4137 | 3030 | 4245 |
| 0000137220 | 4435 | 4246 | 3130 | 0A0D | 313A | 4330 | 3041 | 3035 |
| 0000137240 | 4530 | 3541 | 3443 | 3642 | 4530 | 3734 | 3044 | 3733 |
| 0000137260 | 3243 | 3930 | 4530 | 3438 | 4530 | 4630 | 3842 | 3843 |
| 0000137300 | 3833 | 0D45 | 3A0A | 3031 | 4143 | 3531 | 3030 | 4438 |
| 0000137320 | 3238 | 4245 | 3046 | 4437 | 4646 | 4337 | 4646 | 4237 |
| 0000137340 | 3030 | 4338 | 3338 | 4438 | 3238 | 4245 | 3046 | 4342 |
| 0000137360 | 0A0D | 313A | 4330 | 3241 | 3035 | 3030 | 3832 | 3935 |
| 0000137400 | 4538 | 3734 | 3038 | 3730 | 3039 | 3134 | 3832 | 3435 |
| 0000137420 | 3939 | 4530 | 3438 | 4533 | 4630 | 3942 | 0D33 | 3A0A |
| 0000137440 | 3031 | 4143 | 3533 | 3030 | 3230 | 3538 | 3839 | 3445 |
| 0000137460 | 3837 | 3030 | 3937 | 3430 | 3231 | 3538 | 3934 | 3230 |
| 0000137500 | 3538 | 3839 | 3437 | 3230 | 3438 | 0A0D | 313A | 4330 |
| 0000137520 | 3441 | 3035 | 3730 | 3038 | 3730 | 3039 | 3134 | 3832 |
| 0000137540 | 3435 | 3039 | 3832 | 3935 | 3738 | 3034 | 3732 | 3038 |
| 0000137560 | 3730 | 3039 | 3834 | 0D32 | 3A0A | 3630 | 4143 | 3535 |
| 0000137600 | 3030 | 3231 | 3538 | 3934 | 3230 | 3538 | 3839 | 4344 |
| 0000137620 | 0A0D | 303A | 4334 | 3641 | 3031 | 3030 | 3030 | 3030 |
| 0000137640 | 3030 | 4430 | 0D31 | 3A0A | 3031 | 3038 | 3238 | 3030 |
| 0000137660 | 4245 | 3333 | 3445 | 3539 | 3045 | 4146 | 4445 | 3333 |

THU MAR 14 17:46:30 1991 SUTFILE.HEX PAGE 53, LINE 3069

| | | | | | | | | |
|---|---|---|---|---|---|---|---|---|
| 0000137700 | 3445 | 3539 | 3045 | 4346 | 4345 | 3333 | 4145 | 4336 |
| 0000137720 | 3339 | 0A0D | 313A | 3830 | 3930 | 3032 | 3130 | 4333 |
| 0000137740 | 4530 | 3130 | 3832 | 4533 | 4430 | 4630 | 3630 | 3030 |
| 0000137760 | 3343 | 4630 | 3036 | 4132 | 4641 | 4530 | 4441 | 0D45 |
| 0000140000 | 3A0A | 3730 | 3038 | 3241 | 3030 | 3333 | 3342 | 3445 |
| 0000140020 | 4146 | 3333 | 4246 | 3232 | 3343 | 0A0D | 303A | 3846 |
| 0000140040 | 4130 | 3039 | 3730 | 3041 | 3730 | 3043 | 3130 | 3832 |
| 0000140060 | 4533 | 3630 | 3030 | 4235 | 4533 | 4634 | 3341 | 4633 |
| 0000140100 | 3242 | 3132 | 0D37 | 3A0A | 3031 | 3038 | 3842 | 3030 |
| 0000140120 | 4245 | 3333 | 3445 | 3539 | 3045 | 4146 | 4445 | 3333 |
| 0000140140 | 3445 | 3539 | 3045 | 4346 | 4345 | 3333 | 4145 | 4336 |
| 0000140160 | 4435 | 0A0D | 313A | 3830 | 4330 | 3038 | 3130 | 4333 |
| 0000140200 | 4530 | 3130 | 3832 | 4533 | 4430 | 4530 | 3330 | 4530 |
| 0000140220 | 3036 | 4631 | 4541 | 4334 | 3241 | 3533 | 3934 | 0D41 |
| 0000140240 | 3A0A | 3330 | 3038 | 3844 | 3030 | 3130 | 4246 | 3232 |
| 0000140260 | 3738 | 0A0D | 303A | 3843 | 4430 | 3042 | 3730 | 3041 |
| 0000140300 | 3730 | 3043 | 3130 | 3832 | 4533 | 4530 | 4634 | 3341 |
| 0000140320 | 4633 | 3242 | 3032 | 0D30 | 3A0A | 3031 | 3038 | 3745 |
| 0000140340 | 3030 | 4245 | 3333 | 3445 | 3539 | 3045 | 4146 | 4445 |
| 0000140360 | 3333 | 3445 | 3539 | 3045 | 4346 | 4345 | 3333 | 4145 |
| 0000140400 | 4336 | 4532 | 0A0D | 313A | 3830 | 4630 | 3037 | 3130 |
| 0000140420 | 4333 | 4530 | 3130 | 3832 | 4533 | 4430 | 4530 | 3330 |
| 0000140440 | 4530 | 3036 | 4631 | 4541 | 4334 | 4641 | 3234 | 4333 |
| 0000140460 | 0D42 | 3A0A | 3430 | 3138 | 3730 | 3030 | 3435 | 3130 |
| 0000140500 | 4246 | 3232 | 3230 | 0A0D | 303A | 3844 | 3031 | 3042 |
| 0000140520 | 3730 | 3041 | 3730 | 3043 | 3130 | 3832 | 4533 | 4530 |
| 0000140540 | 4634 | 4241 | 3333 | 4633 | 3242 | 3132 | 0D42 | 3A0A |
| 0000140560 | 3031 | 3138 | 3831 | 3030 | 4245 | 3333 | 3445 | 3539 |
| 0000140600 | 3045 | 4146 | 4445 | 3333 | 3445 | 3539 | 3045 | 4346 |
| 0000140620 | 4345 | 3333 | 4145 | 4336 | 4346 | 0A0D | 313A | 3830 |
| 0000140640 | 3231 | 3038 | 3130 | 4333 | 4530 | 3130 | 3832 | 4533 |
| 0000140660 | 4430 | 4630 | 3030 | 3642 | 3030 | 3342 | 4630 | 3036 |
| 0000140700 | 4132 | 4641 | 3230 | 0D37 | 3A0A | 3830 | 3138 | 3833 |
| 0000140720 | 3030 | 3445 | 4143 | 3333 | 3445 | 3333 | 4246 | 4245 |
| 0000140740 | 3232 | 4633 | 0A0D | 313A | 3830 | 3431 | 3030 | 3730 |
| 0000140760 | 3041 | 3730 | 3043 | 3130 | 3832 | 4533 | 3030 | 3642 |
| 0000141000 | 3030 | 4534 | 4634 | 3341 | 4633 | 4542 | 3242 | 3332 |
| 0000141020 | 0D43 | 3A0A | 4630 | 3138 | 3035 | 3030 | 4137 | 3030 |
| 0000141040 | 4337 | 3030 | 3231 | 3338 | 3045 | 3036 | 3430 | 3445 |
| 0000141060 | 4146 | 3430 | 4246 | 4245 | 3232 | 3736 | 0A0D | 313A |
| 0000141100 | 3830 | 3531 | 3046 | 4430 | 3830 | 4433 | 3830 | 3132 |
| 0000141120 | 3832 | 4531 | 3845 | 3030 | 4445 | 3830 | 4433 | 3830 |
| 0000141140 | 3132 | 3832 | 4531 | 3345 | 0D36 | 3A0A | 3031 | 3138 |
| 0000141160 | 4636 | 3030 | 3343 | 3445 | 3939 | 3946 | 3445 | 3839 |
| 0000141200 | 3846 | 3043 | 3238 | 3043 | 3338 | 4138 | 3338 | 4238 |
| 0000141220 | 3238 | 3043 | 3446 | 0A0D | 313A | 3830 | 3731 | 3046 |
| 0000141240 | 3830 | 4332 | 3830 | 3833 | 3230 | 3738 | 3038 | 3730 |
| 0000141260 | 3039 | 3831 | 3030 | 3734 | 4638 | 3746 | 4639 | 4446 |
| 0000141300 | 3430 | 0D45 | 3A0A | 3031 | 3138 | 4638 | 3030 | 3338 |
| 0000141320 | 3044 | 3238 | 3445 | 3339 | 3341 | 3043 | 3238 | 3043 |
| 0000141340 | 3338 | 4138 | 3338 | 4238 | 3238 | 3442 | 3130 | 4439 |
| 0000141360 | 0A0D | 313A | 3830 | 3931 | 3046 | 3030 | 4535 | 3230 |
| 0000141400 | 4639 | 4642 | 3230 | 4332 | 3830 | 4332 | 3830 | 4233 |
| 0000141420 | 3034 | 3132 | 4533 | 4630 | 4141 | 4533 | 0D41 | 3A0A |
| 0000141440 | 3031 | 3138 | 4641 | 3030 | 3045 | 3932 | 4246 | 4145 |
| 0000141460 | 3833 | 4146 | 3044 | 3338 | 3044 | 3238 | 3046 | 3341 |
| 0000141500 | 4245 | 3046 | 4134 | 3232 | 3132 | 0A0D | 313A | 3830 |
| 0000141520 | 4231 | 3046 | 3730 | 4635 | 3030 | 4334 | 3030 | 3730 |
| 0000141540 | 3038 | 4532 | 4630 | 3036 | 4138 | 4433 | 4635 | 4630 |

THU MAR 14 17:46:30 1991 SUTFILE.HEX PAGE 54, LINE 3128

| | | | | | | | | |
|---|---|---|---|---|---|---|---|---|
| 0000141560 | 3239 | 4639 | 4144 | 0D38 | 3A0A | 3031 | 3138 | 4643 |
| 0000141600 | 3030 | 3044 | 3030 | 4345 | 3833 | 4346 | 4245 | 3833 |
| 0000141620 | 4246 | 4145 | 3833 | 4146 | 3044 | 3338 | 3044 | 3238 |
| 0000141640 | 3537 | 4335 | 0A0D | 313A | 3830 | 4431 | 3046 | 4630 |
| 0000141660 | 3030 | 3734 | 3038 | 4532 | 4636 | 4130 | 3033 | 4438 |
| 0000141700 | 4635 | 4630 | 3439 | 3443 | 3442 | 3241 | 4532 | 4634 |
| 0000141720 | 0D43 | 3A0A | 3031 | 3138 | 4645 | 3030 | 3339 | 3846 |
| 0000141740 | 3341 | 3445 | 3339 | 3946 | 3341 | 3232 | 3044 | 3338 |
| 0000141760 | 3044 | 3238 | 3231 | 3138 | 4545 | 3038 | 3737 | 0A0D |
| 0000142000 | 313A | 3830 | 4631 | 3046 | 3030 | 4445 | 3830 | 4433 |
| 0000142020 | 3830 | 3132 | 3832 | 4531 | 4345 | 4533 | 3934 | 4639 |
| 0000142040 | 4539 | 3934 | 4638 | 4338 | 4330 | 0D46 | 3A0A | 3031 |
| 0000142060 | 3238 | 4630 | 3030 | 3238 | 3043 | 3338 | 4138 | 3338 |
| 0000142100 | 4238 | 3238 | 3043 | 3238 | 3043 | 3338 | 3038 | 4132 |
| 0000142120 | 3837 | 3030 | 3937 | 3036 | 0A0D | 313A | 3830 | 3132 |
| 0000142140 | 3046 | 3030 | 3831 | 3030 | 3734 | 4638 | 3746 | 4639 |
| 0000142160 | 4446 | 3830 | 4433 | 3830 | 4532 | 3934 | 4133 | 4333 |
| 0000142200 | 3830 | 4432 | 0D41 | 3A0A | 3031 | 3238 | 4632 | 3030 |
| 0000142220 | 3043 | 3338 | 4138 | 3338 | 4238 | 3238 | 3442 | 3130 |
| 0000142240 | 3730 | 3045 | 3932 | 3046 | 3343 | 3939 | 4246 | 3232 |
| 0000142260 | 3442 | 0A0D | 313A | 3830 | 3332 | 3046 | 4330 | 3830 |
| 0000142300 | 4332 | 3830 | 4233 | 3034 | 3132 | 4539 | 4630 | 4141 |
| 0000142320 | 4533 | 3230 | 4639 | 4542 | 3341 | 4638 | 3341 | 0D45 |
| 0000142340 | 3A0A | 3031 | 3238 | 4634 | 3030 | 3044 | 3338 | 3044 |
| 0000142360 | 3238 | 3046 | 3341 | 4245 | 3046 | 3343 | 3939 | 4246 |
| 0000142400 | 4145 | 3839 | 4146 | 4234 | 3232 | 4343 | 0A0D | 313A |
| 0000142420 | 3830 | 3532 | 3046 | 3730 | 4635 | 3030 | 4334 | 3030 |
| 0000142440 | 3730 | 3038 | 4532 | 4630 | 3036 | 4138 | 4433 | 4635 |
| 0000142460 | 4630 | 3239 | 4639 | 3044 | 0D37 | 3A0A | 3031 | 3238 |
| 0000142500 | 4636 | 3030 | 3044 | 3030 | 4345 | 3833 | 4346 | 4245 |
| 0000142520 | 3833 | 4246 | 4145 | 3833 | 4146 | 3044 | 3338 | 3044 |
| 0000142540 | 3238 | 3537 | 4242 | 0A0D | 313A | 3830 | 3732 | 3046 |
| 0000142560 | 4630 | 3030 | 4334 | 3030 | 3730 | 3038 | 4532 | 4636 |
| 0000142600 | 4130 | 3033 | 4438 | 4635 | 4630 | 4439 | 3030 | 4330 |
| 0000142620 | 4533 | 0D46 | 3A0A | 4630 | 3238 | 4638 | 3030 | 3939 |
| 0000142640 | 4446 | 4345 | 3839 | 4346 | 4245 | 3839 | 4246 | 4145 |
| 0000142660 | 3839 | 4146 | 4234 | 4334 | 4434 | 3232 | 4143 | 0A0D |
| 0000142700 | 313A | 3830 | 3932 | 3045 | 4530 | 3642 | 3130 | 3239 |
| 0000142720 | 4634 | 3531 | 3030 | 3842 | 4643 | 4530 | 3334 | 4630 |
| 0000142740 | 3037 | 3732 | 4634 | 4646 | 3041 | 0D36 | 3A0A | 3031 |
| 0000142760 | 3238 | 4541 | 3030 | 4246 | 3232 | 4345 | 3241 | 3745 |
| 0000143000 | 3331 | 4346 | 4445 | 3331 | 4446 | 4244 | 3646 | 4338 |
| 0000143020 | 3230 | 4438 | 3330 | 3333 | 0A0D | 303A | 3833 | 4232 |
| 0000143040 | 3045 | 4530 | 3441 | 3242 | 3632 | 0D36 | 3A0A | 3031 |
| 0000143060 | 3238 | 3143 | 3930 | 4245 | 3036 | 3131 | 3432 | 3046 |
| 0000143100 | 3035 | 3430 | 3445 | 4146 | 4246 | 3232 | 4345 | 3343 |
| 0000143120 | 3331 | 4346 | 4445 | 3334 | 0A0D | 303A | 3842 | 4432 |
| 0000143140 | 3031 | 3130 | 4633 | 4444 | 4642 | 3837 | 3043 | 3832 |
| 0000143160 | 3044 | 4533 | 3441 | 3242 | 3432 | 0D42 | 3A0A | 3031 |
| 0000143200 | 3238 | 4344 | 3030 | 4245 | 3036 | 3131 | 3432 | 3046 |
| 0000143220 | 3035 | 3430 | 3445 | 4146 | 4246 | 3232 | 4445 | 3343 |
| 0000143240 | 3333 | 4446 | 4345 | 3730 | 0A0D | 303A | 3842 | 4532 |
| 0000143260 | 3043 | 3330 | 4633 | 4443 | 4642 | 3837 | 3043 | 3832 |
| 0000143300 | 3044 | 4533 | 3441 | 3242 | 3132 | 0D31 | 3A0A | 3031 |
| 0000143320 | 3238 | 3746 | 3030 | 3043 | 3330 | 3231 | 3538 | 3546 |
| 0000143340 | 3044 | 3238 | 3545 | 3238 | 3036 | 3232 | 3432 | 3145 |
| 0000143360 | 3035 | 4430 | 4138 | 3130 | 0A0D | 313A | 3830 | 3033 |
| 0000143400 | 3037 | 4630 | 4530 | 3334 | 4630 | 3037 | 3732 | 4634 |
| 0000143420 | 4646 | 4641 | 4642 | 4643 | 3244 | 3732 | 3038 | 3734 |

THU MAR 14 17:46:30 1991 SUTFILE.HEX PAGE 55, LINE 3187

| | | | | | | | | |
|---|---|---|---|---|---|---|---|---|
| 0000143440 | 3039 | 4532 | 0D46 | 3A0A | 3031 | 3338 | 3731 | 3030 |
| 0000143460 | 4138 | 3046 | 3241 | 3746 | 3745 | 3331 | 3746 | 3930 |
| 0000143500 | 3844 | 4146 | 3544 | 3238 | 4645 | 4145 | 4234 | 4334 |
| 0000143520 | 3042 | 0A0D | 303A | 3832 | 3233 | 3037 | 3430 | 3244 |
| 0000143540 | 4532 | 0D35 | 3A0A | 3031 | 3338 | 3932 | 3030 | 3043 |
| 0000143560 | 3330 | 3231 | 3538 | 3546 | 3044 | 3238 | 3545 | 3238 |
| 0000143600 | 3036 | 3831 | 3432 | 3045 | 3035 | 3630 | 3445 | 3638 |
| 0000143620 | 0A0D | 313A | 3830 | 3333 | 3039 | 4630 | 4641 | 4642 |
| 0000143640 | 4643 | 3244 | 3732 | 3038 | 3734 | 3039 | 4335 | 4533 |
| 0000143660 | 3337 | 4633 | 3137 | 4439 | 4638 | 3641 | 0D42 | 3A0A |
| 0000143700 | 3830 | 3338 | 3934 | 3030 | 3544 | 3238 | 3246 | 4145 |
| 0000143720 | 4234 | 4334 | 4434 | 3232 | 3346 | 0A0D | 313A | 3830 |
| 0000143740 | 3533 | 3031 | 3730 | 3038 | 3733 | 3039 | 3831 | 3030 |
| 0000143760 | 3738 | 3039 | 3832 | 3030 | 3732 | 3039 | 3734 | 3038 |
| 0000144000 | 4432 | 3830 | 3533 | 0D38 | 3A0A | 3031 | 3338 | 3136 |
| 0000144020 | 3030 | 3044 | 3238 | 3445 | 3339 | 4232 | 3546 | 3046 |
| 0000144040 | 3341 | 3445 | 3339 | 4133 | 3038 | 3732 | 3837 | 3330 |
| 0000144060 | 3937 | 3434 | 0A0D | 313A | 3830 | 3733 | 3031 | 3030 |
| 0000144100 | 3831 | 3130 | 3734 | 3038 | 3735 | 3039 | 3831 | 3030 |
| 0000144120 | 3745 | 3039 | 3832 | 3030 | 3738 | 3038 | 3734 | 4539 |
| 0000144140 | 0D41 | 3A0A | 3031 | 3338 | 3138 | 3030 | 3230 | 3038 |
| 0000144160 | 3430 | 3937 | 3430 | 3837 | 3230 | 3044 | 3338 | 3044 |
| 0000144200 | 3238 | 3445 | 3339 | 4632 | 3546 | 3046 | 4633 | 0A0D |
| 0000144220 | 313A | 3830 | 3933 | 3031 | 4130 | 4533 | 3934 | 3333 |
| 0000144240 | 4145 | 4333 | 3830 | 4332 | 3830 | 4633 | 3835 | 3833 |
| 0000144260 | 4635 | 3830 | 3732 | 4635 | 3830 | 0D38 | 3A0A | 4330 |
| 0000144300 | 3338 | 3141 | 3030 | 3030 | 3045 | 3646 | 3234 | 3046 |
| 0000144320 | 3830 | 3341 | 3944 | 3846 | 3545 | 3046 | 3232 | 3535 |
| 0000144340 | 0A0D | 313A | 3830 | 4133 | 3044 | 3730 | 3038 | 3733 |
| 0000144360 | 3039 | 3831 | 3030 | 3738 | 3039 | 3832 | 3030 | 3732 |
| 0000144400 | 3039 | 3734 | 3038 | 4432 | 3830 | 4633 | 0D43 | 3A0A |
| 0000144420 | 3031 | 3338 | 4442 | 3030 | 3044 | 3238 | 3445 | 3339 |
| 0000144440 | 4632 | 3546 | 3046 | 3341 | 3445 | 3339 | 4533 | 3341 |
| 0000144460 | 3043 | 3238 | 3043 | 3338 | 3335 | 0A0D | 313A | 3830 |
| 0000144500 | 4333 | 3044 | 4630 | 3835 | 3833 | 4635 | 3830 | 3732 |
| 0000144520 | 4635 | 3030 | 4530 | 4636 | 4130 | 3033 | 3438 | 4632 |
| 0000144540 | 4430 | 4639 | 3438 | 0D38 | 3A0A | 3330 | 3338 | 4444 |
| 0000144560 | 3030 | 3545 | 3046 | 3232 | 3641 | 0A0D | 303A | 3839 |
| 0000144600 | 4533 | 3030 | 4530 | 4344 | 3933 | 4642 | 4542 | 3943 |
| 0000144620 | 4641 | 3441 | 3242 | 3632 | 0D31 | 3A0A | 3031 | 3338 |
| 0000144640 | 3945 | 3030 | 4538 | 3338 | 4638 | 3238 | 3837 | 3430 |
| 0000144660 | 3045 | 3043 | 3045 | 3341 | 3844 | 4146 | 3343 | 3837 |
| 0000144700 | 3430 | 3937 | 3933 | 0A0D | 303A | 3842 | 4633 | 3039 |
| 0000144720 | 3030 | 4435 | 4530 | 3330 | 4637 | 3137 | 4439 | 4638 |
| 0000144740 | 3039 | 3832 | 3336 | 4634 | 0D30 | 3A0A | 3031 | 3438 |
| 0000144760 | 3430 | 3030 | 4538 | 3338 | 4638 | 3238 | 3837 | 3430 |
| 0000145000 | 3045 | 3043 | 3045 | 3341 | 3844 | 4146 | 3343 | 3837 |
| 0000145020 | 3430 | 3937 | 4431 | 0A0D | 303A | 3842 | 3134 | 3034 |
| 0000145040 | 3030 | 4435 | 4530 | 3930 | 4637 | 3137 | 4439 | 4638 |
| 0000145060 | 3039 | 3832 | 3336 | 3734 | 0D34 | 3A0A | 3031 | 3438 |
| 0000145100 | 4631 | 3030 | 3044 | 3338 | 3044 | 3238 | 3343 | 3445 |
| 0000145120 | 3339 | 3341 | 4443 | 4439 | 4446 | 3445 | 3339 | 3341 |
| 0000145140 | 4343 | 4339 | 3245 | 0A0D | 313A | 3830 | 3234 | 3046 |
| 0000145160 | 4630 | 3943 | 4133 | 4333 | 3942 | 3742 | 3430 | 4539 |
| 0000145200 | 3934 | 4133 | 4333 | 3941 | 3741 | 3430 | 4533 | 4644 |
| 0000145220 | 4442 | 0D33 | 3A0A | 3031 | 3438 | 4633 | 3030 | 4345 |
| 0000145240 | 4146 | 3038 | 3131 | 3044 | 3338 | 3044 | 3238 | 3343 |
| 0000145260 | 3445 | 3339 | 3341 | 4243 | 4239 | 4246 | 3445 | 4645 |
| 0000145300 | 0A0D | 313A | 3830 | 3434 | 3046 | 3930 | 4133 | 4333 |

THU MAR 14 17:46:30 1991 SUTFILE.HEX PAGE 56, LINE 3246

| | | | | | | | | |
|---|---|---|---|---|---|---|---|---|
| 0000145320 | 3941 | 4641 | 3241 | 4530 | 3237 | 4339 | 4533 | 3934 |
| 0000145340 | 4133 | 3933 | 4542 | 3934 | 4133 | 4333 | 0D37 | 3A0A |
| 0000145360 | 3031 | 3438 | 4635 | 3030 | 4139 | 3032 | 3745 | 3231 |
| 0000145400 | 3341 | 3341 | 4245 | 4232 | 3035 | 3230 | 3530 | 3338 |
| 0000145420 | 3532 | 3238 | 3546 | 3238 | 3630 | 0A0D | 313A | 3830 |
| 0000145440 | 3634 | 3046 | 4530 | 3835 | 3333 | 3241 | 4641 | 3835 |
| 0000145460 | 3733 | 3034 | 3931 | 4333 | 4530 | 4530 | 3934 | 4333 |
| 0000145500 | 4530 | 3230 | 4432 | 0D38 | 3A0A | 3530 | 3438 | 4637 |
| 0000145520 | 3030 | 3341 | 3341 | 3341 | 3038 | 3146 | 4539 | 0A0D |
| 0000145540 | 313A | 3830 | 3834 | 3034 | 4430 | 3830 | 4433 | 3830 |
| 0000145560 | 4532 | 3934 | 3733 | 3030 | 3739 | 3034 | 3931 | 3733 |
| 0000145600 | 3030 | 4134 | 4133 | 3833 | 3130 | 0D31 | 3A0A | 3031 |
| 0000145620 | 3438 | 3439 | 3030 | 4230 | 3437 | 3230 | 3339 | 4236 |
| 0000145640 | 3036 | 3530 | 3341 | 3341 | 3341 | 3038 | 3845 | 3437 |
| 0000145660 | 3130 | 3339 | 3043 | 4244 | 0A0D | 303A | 3836 | 4134 |
| 0000145700 | 3034 | 4530 | 4530 | 3934 | 4333 | 4530 | 3230 | 4232 |
| 0000145720 | 0D39 | 3A0A | 3031 | 3438 | 4141 | 3030 | 3039 | 3845 |
| 0000145740 | 3135 | 4141 | 3338 | 4241 | 3238 | 3039 | 3045 | 4130 |
| 0000145760 | 3231 | 3538 | 3530 | 3039 | 4143 | 3536 | 4143 | 0A0D |
| 0000146000 | 313A | 3830 | 4234 | 3041 | 4130 | 3841 | 4133 | 3842 |
| 0000146020 | 3932 | 4330 | 3641 | 3135 | 3832 | 3135 | 3630 | 3230 |
| 0000146040 | 4343 | 3030 | 4332 | 3030 | 4533 | 0D31 | 3A0A | 3031 |
| 0000146060 | 3438 | 4143 | 3030 | 3043 | 3238 | 3043 | 3338 | 3837 |
| 0000146100 | 3230 | 3937 | 3430 | 3445 | 3339 | 3646 | 3341 | 3830 |
| 0000146120 | 3944 | 3946 | 4238 | 3142 | 0A0D | 313A | 3830 | 4434 |
| 0000146140 | 3041 | 3830 | 3832 | 3841 | 3833 | 3043 | 3832 | 3044 |
| 0000146160 | 3133 | 3832 | 3035 | 4435 | 3830 | 4433 | 3830 | 4432 |
| 0000146200 | 3030 | 4433 | 0D31 | 3A0A | 3031 | 3438 | 4145 | 3030 |
| 0000146220 | 3044 | 3230 | 3341 | 3341 | 3341 | 3341 | 3038 | 4643 |
| 0000146240 | 3231 | 3538 | 3931 | 4143 | 3536 | 4143 | 4235 | 3045 |
| 0000146260 | 3146 | 0A0D | 313A | 3830 | 4634 | 3041 | 3030 | 3130 |
| 0000146300 | 3832 | 3135 | 4339 | 3641 | 4335 | 3641 | 4535 | 3538 |
| 0000146320 | 3231 | 3132 | 3832 | 3135 | 3730 | 3030 | 4631 | 0D31 |
| 0000146340 | 3A0A | 3031 | 3538 | 4130 | 3030 | 3232 | 3445 | 3046 |
| 0000146360 | 3341 | 3038 | 3546 | 4245 | 3536 | 3238 | 3037 | 3330 |
| 0000146400 | 4145 | 3536 | 3338 | 3232 | 3044 | 4134 | 0A0D | 313A |
| 0000146420 | 3830 | 3135 | 3041 | 3830 | 4433 | 3830 | 3732 | 3038 |
| 0000146440 | 3732 | 3039 | 4536 | 3934 | 4633 | 4136 | 3033 | 4438 |
| 0000146460 | 4639 | 4339 | 3830 | 3532 | 0D37 | 3A0A | 3031 | 3538 |
| 0000146500 | 4132 | 3030 | 3043 | 3338 | 4438 | 3238 | 4338 | 3338 |
| 0000146520 | 3231 | 3538 | 3031 | 3036 | 3331 | 3445 | 3339 | 3341 |
| 0000146540 | 4441 | 3238 | 4437 | 0A0D | 303A | 3846 | 3335 | 3041 |
| 0000146560 | 4130 | 3843 | 3833 | 3846 | 3832 | 3845 | 4633 | 4130 |
| 0000146600 | 4133 | 3846 | 4132 | 3845 | 3833 | 4530 | 3234 | 3632 |
| 0000146620 | 0D36 | 3A0A | 3031 | 3538 | 3934 | 3030 | 3036 | 3931 |
| 0000146640 | 3043 | 3030 | 3043 | 3130 | 3043 | 3338 | 3043 | 3238 |
| 0000146660 | 3846 | 3435 | 3130 | 3432 | 3230 | 3946 | 3733 | 0A0D |
| 0000146700 | 313A | 3830 | 3535 | 3039 | 3130 | 3832 | 4635 | 4443 |
| 0000146720 | 3830 | 4432 | 3830 | 4433 | 3030 | 4431 | 3030 | 4530 |
| 0000146740 | 3246 | 3835 | 4632 | 4544 | 4245 | 0D38 | 3A0A | 3031 |
| 0000146760 | 3538 | 3936 | 3030 | 3533 | 3338 | 4346 | 3244 | 3746 |
| 0000147000 | 3031 | 4641 | 3230 | 3243 | 3746 | 3343 | 4645 | 3939 |
| 0000147020 | 3546 | 3238 | 4646 | 4134 | 0A0D | 313A | 3830 | 3735 |
| 0000147040 | 3039 | 4530 | 3945 | 4638 | 4645 | 3835 | 4133 | 4632 |
| 0000147060 | 3937 | 4132 | 4446 | 3030 | 4432 | 3030 | 4433 | 4530 |
| 0000147100 | 4630 | 4430 | 0D37 | 3A0A | 3031 | 3538 | 3938 | 3030 |
| 0000147120 | 3341 | 3044 | 3045 | 3046 | 3341 | 4345 | 3046 | 3341 |
| 0000147140 | 4445 | 3046 | 3043 | 3330 | 3043 | 3230 | 3232 | 4538 |
| 0000147160 | 4236 | 0A0D | 313A | 3830 | 3935 | 3039 | 3830 | 3835 |

THU MAR 14 17:46:30 1991 SUTFILE.HEX PAGE 57, LINE 3305

| | | | | | | | | |
|---|---|---|---|---|---|---|---|---|
| 0000147200 | 3846 | 4532 | 4630 | 4635 | 4130 | 4533 | 4330 | 4530 |
| 0000147220 | 4330 | 4630 | 4130 | 4433 | 3133 | 4130 | 3746 | 0D31 |
| 0000147240 | 3A0A | 3031 | 3538 | 3941 | 3030 | 3130 | 3343 | 3045 |
| 0000147260 | 4546 | 3341 | 3045 | 4646 | 3239 | 4641 | 3232 | 3044 |
| 0000147300 | 3130 | 3044 | 3030 | 3044 | 3045 | 4145 | 0A0D | 303A |
| 0000147320 | 3842 | 4235 | 3039 | 4430 | 4630 | 4330 | 3030 | 4330 |
| 0000147340 | 3030 | 4331 | 4630 | 4330 | 4530 | 3230 | 3032 | 0D34 |
| 0000147360 | 3A0A | 3730 | 3538 | 3443 | 3030 | 3837 | 3130 | 3937 |
| 0000147400 | 3330 | 3230 | 3538 | 4346 | 3833 | 0A0D | 303A | 3837 |
| 0000147420 | 4335 | 3042 | 3730 | 3038 | 3731 | 3039 | 3035 | 3832 |
| 0000147440 | 4635 | 3243 | 0D46 | 3A0A | 3730 | 3538 | 3244 | 3030 |
| 0000147460 | 3837 | 3230 | 3937 | 3230 | 3230 | 3538 | 4346 | 4132 |
| 0000147500 | 0A0D | 303A | 3837 | 4435 | 3039 | 3730 | 3038 | 3732 |
| 0000147520 | 3039 | 3034 | 3832 | 4635 | 3243 | 0D31 | 3A0A | 3730 |
| 0000147540 | 3538 | 3045 | 3030 | 3837 | 3430 | 3937 | 3230 | 3230 |
| 0000147560 | 3538 | 4346 | 4131 | 0A0D | 303A | 3837 | 4535 | 3037 |
| 0000147600 | 3730 | 3038 | 3731 | 3039 | 3035 | 3832 | 3136 | 4641 |
| 0000147620 | 0D34 | 3A0A | 3730 | 3538 | 4545 | 3030 | 3837 | 3230 |
| 0000147640 | 3937 | 3430 | 3230 | 3638 | 4131 | 4445 | 0A0D | 303A |
| 0000147660 | 3837 | 4635 | 3035 | 3730 | 3038 | 3734 | 3039 | 3032 |
| 0000147700 | 3832 | 3136 | 4541 | 0D36 | 3A0A | 3031 | 3538 | 4346 |
| 0000147720 | 3030 | 3244 | 3746 | 3031 | 4641 | 3230 | 3243 | 3746 |
| 0000147740 | 4645 | 3343 | 3839 | 4646 | 4545 | 3439 | 3030 | 4546 |
| 0000147760 | 3241 | 3143 | 0A0D | 303A | 3845 | 3036 | 3043 | 4630 |
| 0000150000 | 3937 | 4132 | 3846 | 3846 | 3832 | 3845 | 4533 | 4637 |
| 0000150020 | 4130 | 3033 | 4439 | 4638 | 3241 | 3832 | 0D46 | 3A0A |
| 0000150040 | 3031 | 3638 | 4131 | 3030 | 3043 | 3045 | 4638 | 3238 |
| 0000150060 | 4538 | 3338 | 3045 | 3746 | 3341 | 3930 | 3844 | 4146 |
| 0000150100 | 3344 | 3031 | 4641 | 3130 | 3641 | 0A0D | 303A | 3841 |
| 0000150120 | 3236 | 3041 | 4330 | 4133 | 3845 | 4133 | 3846 | 3932 |
| 0000150140 | 4132 | 4446 | 4530 | 3230 | 3032 | 0D45 | 3A0A | 3031 |
| 0000150160 | 3638 | 3433 | 3030 | 3239 | 3046 | 3244 | 3746 | 3031 |
| 0000150200 | 4641 | 3230 | 3243 | 3746 | 4645 | 3432 | 3430 | 4646 |
| 0000150220 | 4545 | 3433 | 3030 | 3933 | 0A0D | 303A | 3843 | 3436 |
| 0000150240 | 3034 | 4630 | 4145 | 4632 | 3937 | 4132 | 4146 | 4632 |
| 0000150260 | 4530 | 3444 | 3443 | 3442 | 3241 | 4432 | 0D30 | 3A0A |
| 0000150300 | 3031 | 3038 | 3032 | 3030 | 3230 | 3038 | 3332 | 3437 |
| 0000150320 | 3030 | 3241 | 3345 | 3239 | 3344 | 3241 | 3445 | 3239 |
| 0000150340 | 3444 | 3537 | 3138 | 3730 | 3436 | 0A0D | 313A | 3830 |
| 0000150360 | 3330 | 3030 | 3130 | 3832 | 4134 | 3741 | 4545 | 3741 |
| 0000150400 | 3546 | 3131 | 3832 | 3430 | 3933 | 3030 | 3030 | 3130 |
| 0000150420 | 4132 | 3230 | 3844 | 0D34 | 3A0A | 3031 | 3038 | 3034 |
| 0000150440 | 3030 | 3230 | 3638 | 3035 | 3043 | 3130 | 3043 | 3230 |
| 0000150460 | 3039 | 3738 | 3839 | 3043 | 3238 | 3043 | 3338 | 3044 |
| 0000150500 | 3130 | 3044 | 0A0D | 313A | 3830 | 3530 | 3030 | 4430 |
| 0000150520 | 3030 | 3932 | 3830 | 3030 | 3730 | 3134 | 4632 | 4130 |
| 0000150540 | 4533 | 4639 | 4130 | 4533 | 4641 | 4130 | 3733 | 4234 |
| 0000150560 | 0D38 | 3A0A | 3031 | 3038 | 3036 | 3030 | 3232 | 3046 |
| 0000150600 | 3039 | 3041 | 3037 | 3043 | 3238 | 3043 | 3338 | 3044 |
| 0000150620 | 3130 | 3044 | 3230 | 3039 | 3038 | 3430 | 3232 | 0A0D |
| 0000150640 | 313A | 3830 | 3730 | 3030 | 3730 | 3134 | 4632 | 4130 |
| 0000150660 | 4533 | 4639 | 4130 | 4533 | 4641 | 4130 | 3733 | 3234 |
| 0000150700 | 4632 | 4430 | 3030 | 4432 | 4330 | 0D36 | 3A0A | 3230 |
| 0000150720 | 3038 | 3038 | 3030 | 3130 | 3232 | 4244 | 0A0D | 303A |
| 0000150740 | 3832 | 3536 | 3030 | 3830 | 4630 | 4145 | 0D41 | 3A0A |
| 0000150760 | 3030 | 3038 | 3032 | 3130 | 4635 | 0A0D | | |
| 0000150774 | | | | | | | | |

THU MAR 14 17:46:58 1991 SYS.DLL PAGE 1, LINE 1

| | | | | | | | | |
|---|---|---|---|---|---|---|---|---|
| 0000000000 | 5A4D | 00B9 | 0022 | 0000 | 0004 | 0000 | FFFF | 0000 |
| 0000000020 | 00B6 | 0000 | 0000 | 0000 | 0040 | 0000 | 0000 | 0000 |
| 0000000040 | 0000 | 0000 | 0000 | 0000 | 0000 | 0000 | 0000 | 0000 |
| 0000000060 | 0000 | 0000 | 0000 | 0000 | 0000 | 0000 | 0080 | 0000 |
| 0000000100 | 1F0E | 0EBA | B400 | CD09 | B821 | 4C01 | 21CD | 6854 |
| 0000000120 | 7369 | 7020 | 6F72 | 7267 | 6D61 | 6320 | 6E61 | 6F6E |
| 0000000140 | 2074 | 7572 | 206E | 6E69 | 4420 | 534F | 6D20 | 646F |
| 0000000160 | 2E65 | 0D0D | 240A | 0000 | 0000 | 0000 | 0000 | 0000 |
| 0000000200 | 454E | 0A05 | 0174 | 0013 | 002A | F460 | 8006 | 0005 |
| 0000000220 | 0000 | 0000 | 14E6 | 0001 | 0000 | 0000 | 0005 | 0006 |
| 0000000240 | 0031 | 0040 | 0068 | 0068 | 00AC | 00B8 | 0207 | 0000 |
| 0000000260 | 0000 | 0004 | 0000 | 0001 | 0000 | 0000 | 0000 | 0000 |
| 0000000300 | 0024 | 344B | 0D00 | 344C | 038C | 00C6 | 0C01 | 0100 |
| 0000000320 | 0000 | 0000 | 0C01 | 0850 | 0000 | 0000 | 0C01 | 0200 |
| 0000000340 | 0399 | 08FF | 0D01 | 0960 | 5303 | 5359 | 0000 | 470A |
| 0000000360 | 4950 | 4957 | 504E | 4F52 | 0143 | 0A00 | 4956 | 574F |
| 0000000400 | 4E49 | 5250 | 434F | 0002 | 5308 | 565F | 4F49 | 4957 |
| 0000000420 | 034E | 0A00 | 5F53 | 4956 | 5F4F | 4554 | 4D52 | 0004 |
| 0000000440 | 5308 | 475F | 4950 | 4957 | 054E | 0000 | 0001 | 000A |
| 0000000460 | 005B | 0064 | 006A | 00B5 | 0800 | 4F44 | 4353 | 4C41 |
| 0000000500 | 534C | 6C06 | 6962 | 6D70 | 0D74 | 425F | 5F58 | 4544 |
| 0000000520 | 5542 | 4D47 | 444F | 0D45 | 425F | 5F58 | 4954 | 454D |
| 0000000540 | 4D53 | 444F | 0E45 | 425F | 5F58 | 4544 | 5542 | 4547 |
| 0000000560 | 544E | 5245 | 5F0F | 5842 | 445F | 4245 | 4755 | 4552 |
| 0000000600 | 5554 | 4E52 | 5F0E | 5842 | 505F | 4341 | 464B | 4C49 |
| 0000000620 | 4554 | 0852 | 4956 | 434F | 4C41 | 534C | 5005 | 574D |
| 0000000640 | 4E49 | 5005 | 474D | 4950 | 560C | 4F49 | 5341 | 4F53 |
| 0000000660 | 4943 | 5441 | 0B45 | 4956 | 434F | 4552 | 5441 | 5045 |
| 0000000700 | 0C53 | 4956 | 444F | 5345 | 5254 | 594F | 5350 | 5614 |
| 0000000720 | 4F49 | 4547 | 4454 | 5645 | 4349 | 4345 | 4C45 | 534C |
| 0000000740 | 5A49 | 0945 | 4956 | 534F | 5445 | 524F | 0647 | 4D50 |
| 0000000760 | 4956 | 504F | 0105 | 9601 | 0104 | 0F2C | 0001 | 010A |
| 0000001000 | 0EE4 | 0001 | 0000 | 2D00 | 6552 | 6F70 | 7472 | 6C20 |
| 0000001020 | 6269 | 6172 | 7972 | 2820 | 2943 | 4D20 | 7265 | 7563 |
| 0000001040 | 7972 | 4920 | 746E | 7265 | 6341 | 6974 | 6576 | 202C |
| 0000001060 | 3931 | 3039 | 0020 | 0000 | 0000 | 0000 | 0000 | 0000 |
| 0000001100 | 581E | 4590 | 8B55 | 1EEC | D88E | EC81 | 00CC | 5657 |
| 0000001120 | B81E | FFFF | D88E | 46C7 | 53F6 | 8C00 | F85E | 86C7 |
| 0000001140 | FF5E | 0101 | C02B | 8689 | FF48 | 8689 | FF46 | 068E |
| 0000001160 | 07B2 | 8326 | FF3E | 00FF | 0375 | 1EE9 | FF00 | 8236 |
| 0000001200 | FF00 | 8036 | 8D00 | 3A86 | 16FF | 9A50 | FFFF | 0000 |
| 0000001220 | C483 | 3D08 | 0000 | 0374 | 0FE9 | 8E00 | B406 | 2607 |
| 0000001240 | 3E83 | FFFF | 7500 | E903 | 003C | 681E | 005A | 868D |
| 0000001260 | FF4E | 5016 | 868D | FF3A | 5016 | 468D | 168E | 6A50 |
| 0000001300 | 1E4B | 8468 | FF00 | 7E36 | FF00 | 7C36 | FF00 | 8236 |
| 0000001320 | FF00 | 8036 | 9A00 | FFFF | 0000 | C483 | 891E | 8E46 |
| 0000001340 | 5689 | E990 | 0008 | C02B | 4689 | 8990 | 8E46 | 46C7 |
| 0000001360 | 008C | 8B00 | 0C46 | 460B | 750A | E903 | 000C | 5EC4 |
| 0000001400 | 260A | 3F80 | 7400 | E903 | 0008 | 46C7 | 148C | E900 |
| 0000001420 | 0054 | 681E | 0061 | 76FF | FF0C | 0A76 | 2C9A | 091B |
| 0000001440 | 8301 | 08C4 | 8689 | FF36 | 9689 | FF38 | 868B | FF38 |
| 0000001460 | 860B | FF36 | 0374 | 08E9 | C700 | 8C46 | 0008 | 25E9 |
| 0000001500 | 6A00 | 6804 | 0100 | 369A | 4932 | 8301 | 04C4 | 00A3 |
| 0000001520 | 8909 | 0216 | A109 | 0902 | 060B | 0900 | 0374 | 05E9 |
| 0000001540 | C700 | 8C46 | 0007 | 7E83 | 008C | 0374 | 9FE9 | C701 |
| 0000001560 | 7E86 | 00FF | C701 | 0406 | 0009 | 8300 | 8C7E | 7400 |
| 0000001600 | E903 | 017A | 686A | AE9A | 802A | 8301 | 02C4 | 8689 |
| 0000001620 | FF7A | 9689 | FF7C | 868B | FF7C | 860B | FF7A | 0374 |
| 0000001640 | 08E9 | C700 | 8C46 | 0007 | 50E9 | FF01 | 38B6 | FFFF |

THU MAR 14 17:46:58 1991 SYS.DLL PAGE 2, LINE 60

| | | | | | | | | |
|---|---|---|---|---|---|---|---|---|
| 0000001660 | 36B6 | 6AFF | FF63 | 7CB6 | FFFF | 7AB6 | 9AFF | 2FAC |
| 0000001700 | 01BB | C483 | 890A | 8846 | 5689 | 8B8A | 8A46 | 460B |
| 0000001720 | 7488 | E903 | 001A | 9EC4 | FF36 | 8A26 | 0A47 | 1024 |
| 0000001740 | 013C | C01B | EB25 | 05FF | 0021 | 4689 | E98C | 010B |
| 0000001760 | B6FF | FF7C | B6FF | FF7A | E89A | D62D | 8301 | 04C4 |
| 0000002000 | F08B | 9EC4 | FF7A | C626 | FF40 | FF00 | 7CB6 | FFFF |
| 0000002020 | 7AB6 | 9AFF | 2DE8 | 01F0 | C483 | 3D04 | 0063 | 0376 |
| 0000002040 | 68E9 | 6A00 | FF09 | 7CB6 | FFFF | 7AB6 | 9AFF | 328A |
| 0000002060 | 020D | C483 | 8906 | 8446 | 5689 | 0B86 | 75D0 | E903 |
| 0000002100 | 0049 | B6FF | FF7C | B6FF | FF7A | E89A | 312D | 8302 |
| 0000002120 | 04C4 | 462B | 0384 | 7A86 | 50FF | 468B | 8B84 | 8656 |
| 0000002140 | 5240 | 8B50 | 8446 | 568B | 0586 | 0004 | 5052 | B89A |
| 0000002160 | 4332 | 8302 | 0AC4 | 046A | 206A | 76FF | FF86 | 8476 |
| 0000002200 | 829A | 9533 | 8302 | 08C4 | 80E9 | C4FF | 7A9E | 26FF |
| 0000002220 | 47C6 | 0063 | 1E8B | 0904 | E3C1 | C402 | 0036 | 8B09 |
| 0000002240 | 7A86 | 8BFF | 7C96 | 26FF | 0089 | 8926 | 0250 | 06FF |
| 0000002260 | 0904 | 868B | FF7E | 0639 | 0904 | 0373 | 3CE9 | 8B00 |
| 0000002300 | 7E86 | 05FF | 0080 | E0C1 | 5002 | 36FF | 0902 | 36FF |
| 0000002320 | 0900 | 649A | C931 | 8302 | 06C4 | 00A3 | 8909 | 0216 |
| 0000002340 | A109 | 0902 | 060B | 0900 | 0374 | 08E9 | C700 | 8C46 |
| 0000002360 | 0007 | 06E9 | 8100 | 7E86 | 80FF | E900 | FE7D | B6FF |
| 0000002400 | FF38 | B6FF | FF36 | D89A | 1619 | 8303 | 04C4 | 7E83 |
| 0000002420 | 218C | 0374 | 05E9 | C700 | 8C46 | 0000 | 7E83 | 008C |
| 0000002440 | 0374 | 1CE9 | 6A01 | 9A00 | FFFF | 0000 | 8689 | FF4A |
| 0000002460 | 9689 | FF4C | B6FF | FF4C | B6FF | FF4A | 006A | FF9A |
| 0000002500 | 00FF | 8900 | 8046 | 5689 | FF82 | 4CB6 | FFFF | 4AB6 |
| 0000002520 | 1EFF | 6368 | 6800 | 034A | FF68 | 6AFF | 6A00 | 6A04 |
| 0000002540 | 9A00 | FFFF | 0000 | 86C7 | FF5A | 0CFB | 86C7 | FF5C |
| 0000002560 | 0000 | 76FF | FF0C | 0A76 | 76FF | FF08 | 0676 | 681E |
| 0000002600 | 006A | 468D | 1692 | 9A50 | 3042 | FFFF | C483 | 6A10 |
| 0000002620 | 6A00 | 6801 | 8000 | 006A | 868D | FF5A | 5016 | 681E |
| 0000002640 | 0074 | 468D | 1692 | 6A50 | 6A00 | 6A00 | 6A00 | 8D00 |
| 0000002660 | FA46 | 5016 | FF9A | 00FF | 8900 | 4286 | 89FF | 4496 |
| 0000002700 | FFFF | 44B6 | FFFF | 42B6 | 6AFF | 6A47 | 6A00 | 6A01 |
| 0000002720 | 6A0A | 9A00 | FFFF | 0000 | 5052 | 006A | 006A | FF9A |
| 0000002740 | 00FF | FF00 | 4CB6 | FFFF | 4AB6 | 8DFF | 6086 | 16FF |
| 0000002760 | 6A50 | 6A00 | 6A00 | 6A00 | 9A00 | FFFF | 0000 | 003D |
| 0000003000 | 7500 | E903 | 0016 | B6FF | FF4C | B6FF | FF4A | 868D |
| 0000003020 | FF60 | 5016 | FF9A | 00FF | E900 | FFC7 | B6FF | FF44 |
| 0000003040 | B6FF | FF42 | FF9A | 00FF | FF00 | 8276 | 76FF | 9A80 |
| 0000003060 | FFFF | 0000 | B6FF | FF4C | B6FF | FF4A | FF9A | 00FF |
| 0000003100 | 8E00 | B206 | 2607 | 3E83 | 0035 | 7500 | E903 | 000A |
| 0000003120 | BE83 | FF3E | 74FE | E903 | 000F | 068E | 07B4 | 8326 |
| 0000003140 | 623E | 0000 | 0375 | 59E9 | 8B00 | 8C46 | 8689 | FF40 |
| 0000003160 | B6FF | FF48 | B6FF | FF46 | 868D | FF40 | 5016 | B6FF |
| 0000003200 | FF5E | 76FF | FFF8 | F676 | 8E8D | FF4E | 5116 | 4E8D |
| 0000003220 | 168E | 8D51 | 3A8E | 16FF | 1E51 | 8468 | 6800 | 00CB |
| 0000003240 | 36FF | 007E | 36FF | 007C | 36FF | 0082 | 36FF | 0080 |
| 0000003260 | FF9A | 00FF | 8300 | 28C4 | 868B | FF40 | 09E9 | E900 |
| 0000003300 | 0006 | 468B | E98C | 0000 | 5E1F | 835F | 02ED | E58B |
| 0000003320 | 5D1F | CA4D | 0008 | 581E | 4590 | 8B55 | 1EEC | D88E |
| 0000003340 | EC81 | 00F8 | 5657 | B81E | 0012 | D88E | 468B | E90E |
| 0000003360 | 04EC | 76FF | FF12 | 1076 | FF9A | 00FF | 8900 | 0A86 |
| 0000003400 | 89FF | 0C96 | FFFF | 0CB6 | FFFF | 0AB6 | 6AFF | 6800 |
| 0000003420 | 00D0 | 868D | FF24 | 5016 | FF9A | 00FF | 8B00 | 8846 |
| 0000003440 | 14A3 | 8B09 | 9046 | 08A3 | 8B09 | 9446 | 18A3 | 8B09 |
| 0000003460 | 7486 | A3FF | 091E | B6FF | FF0C | B6FF | FF0A | FF9A |
| 0000003500 | 00FF | 6B00 | 1406 | 2609 | 0E6B | 0908 | 031C | A3C1 |
| 0000003520 | 090A | 76FF | FF12 | 1076 | 056A | 006A | 3D9A | 0005 |

THU MAR 14 17:46:58 1991 SYS.DLL PAGE 3, LINE 119

| | | | | | | | | |
|---|---|---|---|---|---|---|---|---|
| 0000003540 | 5200 | 6850 | 8007 | 479A | 0005 | A300 | 0910 | 1689 |
| 0000003560 | 0912 | 76FF | FF12 | 1076 | 056A | 006A | FF9A | 00FF |
| 0000003600 | 5200 | 6850 | 8006 | FF9A | 00FF | A300 | 090C | 1689 |
| 0000003620 | 090E | 00B8 | BA00 | 0000 | 97E9 | 8B04 | 0646 | 16A3 |
| 0000003640 | 8B09 | 0846 | 1CA3 | A109 | 090A | 062B | 0916 | 003D |
| 0000003660 | 7C00 | E903 | 0003 | 00B8 | A300 | 0906 | 20A1 | 3B09 |
| 0000003700 | 0606 | 7F09 | E903 | 0003 | 06A1 | A309 | 0920 | 36FF |
| 0000003720 | 0912 | 36FF | 0910 | A068 | A101 | 0920 | D22B | 5052 |
| 0000003740 | 06A1 | 2B09 | 50C9 | 9A51 | 05FF | 0000 | 36FF | 0912 |
| 0000003760 | 36FF | 0910 | 3E83 | 0906 | 1B01 | 40C0 | 9A50 | 0615 |
| 0000004000 | 0000 | 1CA1 | 9909 | 3EF7 | 0918 | 062B | 0904 | D8F7 |
| 0000004020 | 22A3 | A109 | 091A | 063B | 0922 | 037F | 03E9 | A100 |
| 0000004040 | 0922 | 1AA3 | FF09 | 0E36 | FF09 | 0C36 | 6809 | 01A0 |
| 0000004060 | 1AA1 | 2B09 | 52D2 | A150 | 0922 | C92B | 5150 | 0C9A |
| 0000004100 | 0007 | FF00 | 0E36 | FF09 | 0C36 | 8309 | 223E | 0109 |
| 0000004120 | C01B | 5040 | FF9A | 00FF | B800 | 0000 | 00BA | E900 |
| 0000004140 | 03D0 | 468B | E908 | 004C | 08A1 | F709 | 89D8 | 2286 |
| 0000004160 | E9FF | 0062 | 08A1 | 8909 | 2286 | E9FF | 0058 | 08A1 |
| 0000004200 | C109 | 03E0 | D8F7 | 8689 | FF22 | 49E9 | A100 | 0908 |
| 0000004220 | E0C1 | 8903 | 2286 | E9FF | 003C | 468B | 2B06 | 2006 |
| 0000004240 | 8909 | 2286 | E9FF | 002E | 86C7 | FF22 | 0000 | 25E9 |
| 0000004260 | E900 | 0022 | 7548 | E903 | FFAE | 7548 | E903 | FFB4 |
| 0000004300 | 7548 | E903 | FFB8 | 7548 | E903 | FFC1 | 4848 | 0375 |
| 0000004320 | C7E9 | E9FF | FFD2 | 06A1 | 2B09 | 2006 | 3B09 | 2286 |
| 0000004340 | 7FFF | E903 | 0004 | 868B | FF22 | 0E8B | 0920 | D9F7 |
| 0000004360 | C13B | 037C | 02E9 | 8B00 | 89C1 | 2286 | 83FF | 22BE |
| 0000004400 | 00FF | 0375 | 49E9 | 8B00 | 2286 | 01FF | 2006 | FF09 |
| 0000004420 | 1276 | 76FF | 8B10 | 2286 | F7FF | 50D8 | 006A | 006A |
| 0000004440 | 006A | 006A | 006A | 006A | 006A | 006A | 006A | 026A |
| 0000004460 | FF9A | 00FF | FF00 | 1236 | FF09 | 1036 | 6809 | 01A1 |
| 0000004500 | 20A1 | 2B09 | 52D2 | 6A50 | 6A00 | 9A00 | 039F | 0000 |
| 0000004520 | 00B8 | BA00 | 0000 | D9E9 | 8B02 | 0846 | 5CE9 | C700 |
| 0000004540 | F446 | FFFF | 75E9 | C700 | F446 | 0001 | 6DE9 | A100 |
| 0000004560 | 091C | F799 | 183E | F709 | 3DD8 | FFFF | 037F | 03E9 |
| 0000004600 | B800 | FFFF | 4689 | E9F4 | 0052 | 1CA1 | 9909 | 3EF7 |
| 0000004620 | 0918 | 013D | 7C00 | E903 | 0003 | 01B8 | 8900 | F446 |
| 0000004640 | 39E9 | 8B00 | 0646 | 062B | 091A | 4689 | E9F4 | 002C |
| 0000004660 | 46C7 | 00F4 | E900 | 0024 | 21E9 | 4800 | 0375 | 9EE9 |
| 0000004700 | 48FF | 0375 | A0E9 | 48FF | 0375 | A2E9 | 48FF | 0375 |
| 0000004720 | B7E9 | 48FF | 0375 | CAE9 | E9FF | FFD4 | 22A1 | 2B09 |
| 0000004740 | 1A06 | 3B09 | F446 | 037F | 03E9 | 8B00 | F446 | 0E8B |
| 0000004760 | 091A | D9F7 | C13B | 037C | 02E9 | 8B00 | 89C1 | F446 |
| 0000005000 | 7E83 | 00F4 | 0375 | 53E9 | 8B00 | F446 | 0601 | 091A |
| 0000005020 | 76FF | FF12 | 1076 | 006A | 18A1 | F709 | F46E | 6A50 |
| 0000005040 | 6A00 | 6A00 | 6A00 | 6A00 | 6A00 | 6A00 | 6A00 | 6A00 |
| 0000005060 | 9A02 | 06F1 | 0000 | 36FF | 090E | 36FF | 090C | A168 |
| 0000005100 | A101 | 091A | D22B | 5052 | 006A | 006A | 439A | 0008 |
| 0000005120 | FF00 | 1276 | 76FF | 9A10 | FFFF | 0000 | 00B8 | BA00 |
| 0000005140 | 0000 | CDE9 | 8B01 | 0846 | 41E9 | FF00 | 1236 | FF09 |
| 0000005160 | 1036 | FF09 | 0E76 | 76FF | FF0C | 0A76 | 76FF | FF08 |
| 0000005200 | 0676 | 629A | 0008 | E900 | 01A8 | 36FF | 090E | 36FF |
| 0000005220 | 090C | 76FF | FF0E | 0C76 | 76FF | FF0A | 0876 | 76FF |
| 0000005240 | 9A06 | 05A8 | 0000 | 89E9 | E901 | 0023 | 112D | 3D00 |
| 0000005260 | 0007 | 0376 | 18E9 | D100 | 93E0 | FF2E | 7FA7 | 4A08 |
| 0000005300 | 4A08 | 8F08 | 8F08 | 2B08 | 4A08 | 2B08 | 4A08 | E908 |
| 0000005320 | 0143 | 76FF | FF12 | 1076 | 006A | 006A | 868D | FF10 |
| 0000005340 | 5016 | FF9A | 00FF | 8900 | 0A86 | 89FF | 0C96 | FFFF |
| 0000005360 | 0CB6 | FFFF | 0AB6 | 9AFF | FFFF | 0000 | 1CA1 | 2B09 |
| 0000005400 | 1C86 | 99FF | 3EF7 | 0918 | 0603 | 091A | 003D | 7C00 |

THU MAR 14 17:46:58 1991 SYS.DLL PAGE 4, LINE 178

| | | | | | | | | |
|---|---|---|---|---|---|---|---|---|
| 0000005420 | E903 | 0003 | 00B8 | 8900 | 0886 | A1FF | 091C | 862B |
| 0000005440 | FF14 | F799 | 183E | 0309 | 1A06 | 4009 | 063B | 0904 |
| 0000005460 | 037F | 03E9 | A100 | 0904 | 8689 | FF20 | 868B | FF08 |
| 0000005500 | 8689 | FF0E | 04E9 | FF00 | 0E86 | 8BFF | 2086 | 39FF |
| 0000005520 | 0E86 | 7CFF | E903 | 006D | 08A1 | 2B09 | 2006 | 9909 |
| 0000005540 | 4689 | 89F6 | F856 | 1AA1 | 2B09 | 0E86 | 48FF | 2EF7 |
| 0000005560 | 0918 | 0603 | 091C | 0603 | 091E | 8999 | FA46 | 5689 |
| 0000005600 | FFFC | 0CB6 | FFFF | 0AB6 | 8DFF | F646 | 5016 | 9E8B |
| 0000005620 | FF0E | E3C1 | C402 | 0036 | 2609 | 70FF | 2602 | 30FF |
| 0000005640 | E89A | DF2D | 8300 | 04C4 | 006A | 8B50 | 0E9E | C1FF |
| 0000005660 | 02E3 | 36C4 | 0900 | FF26 | 0270 | FF26 | 9A30 | FFFF |
| 0000005700 | 0000 | 82E9 | FFFF | 0CB6 | FFFF | 0AB6 | 9AFF | FFFF |
| 0000005720 | 0000 | 00B8 | BA00 | 0000 | 57E9 | E900 | 0037 | 233D |
| 0000005740 | 7500 | E903 | FEEC | 0376 | 11E9 | 4800 | 0375 | 01E9 |
| 0000005760 | 2DFB | 0006 | 0375 | A2E9 | E9FB | 0019 | 312D | 7500 |
| 0000006000 | E903 | FD55 | 7548 | E903 | FC58 | 482D | 7500 | E903 |
| 0000006020 | FE53 | 00E9 | FF00 | 1276 | 76FF | FF10 | 0E76 | 76FF |
| 0000006040 | FF0C | 0A76 | 76FF | FF08 | 0676 | FF9A | 00FF | E900 |
| 0000006060 | 0000 | 5E1F | 835F | 02ED | E58B | 5D1F | CA4D | 000E |
| 0000006100 | 581E | 4590 | 8B55 | 1EEC | D88E | EC81 | 0060 | 5657 |
| 0000006120 | B81E | 04A8 | D88E | 46C7 | 9FF6 | 8C00 | F85E | 46C7 |
| 0000006140 | 01C4 | 2B01 | 89C0 | B046 | 4689 | 8EAE | B606 | 2607 |
| 0000006160 | 3E83 | 0408 | 7500 | E903 | 001D | 36FF | 00C4 | 36FF |
| 0000006200 | 00C2 | 468D | 16A6 | 9A50 | 004C | 0000 | C483 | 3D08 |
| 0000006220 | 0000 | 0374 | 0FE9 | 8E00 | B806 | 2607 | 3E83 | 0421 |
| 0000006240 | 7500 | E903 | 003A | 681E | 00A6 | 468D | 16B2 | 8D50 |
| 0000006260 | A646 | 5016 | 468D | 16F2 | 6A50 | 1E5C | CE68 | FF00 |
| 0000006300 | C036 | FF00 | BE36 | FF00 | C436 | FF00 | C236 | 9A00 |
| 0000006320 | 0096 | 0000 | C483 | 891E | F246 | 5689 | E9F4 | 0008 |
| 0000006340 | C02B | 4689 | 89F4 | F246 | 46C7 | 00F0 | A100 | 00C8 |
| 0000006360 | 060B | 00C6 | 0375 | 06E9 | B800 | 0005 | 17E9 | 8B04 |
| 0000006400 | 0C46 | 460B | 750A | E903 | 000C | 5EC4 | 260A | 3F80 |
| 0000006420 | 7400 | E903 | 0008 | 46C7 | 14F0 | E900 | 0050 | 681E |
| 0000006440 | 00AD | 76FF | FF0C | 0A76 | 2C9A | 111B | 830B | 08C4 |
| 0000006460 | 4689 | 89A2 | A456 | 468B | 0BA4 | A246 | 0374 | 08E9 |
| 0000006500 | C700 | F046 | 0008 | 25E9 | 6A00 | 6804 | 0100 | 369A |
| 0000006520 | 5032 | 830B | 04C4 | CAA3 | 8900 | CC16 | A100 | 00CC |
| 0000006540 | 060B | 00CA | 0374 | 05E9 | C700 | F046 | 0007 | 7E83 |
| 0000006560 | 00F0 | 0374 | A5E9 | C701 | E646 | 0100 | 06C7 | 092C |
| 0000006600 | 0000 | 7E83 | 00F0 | 0374 | 83E9 | 6A01 | 9A68 | 2AAE |
| 0000006620 | 0B7F | C483 | 8902 | E246 | 5689 | 8BE4 | E446 | 460B |
| 0000006640 | 74E2 | E903 | 0008 | 46C7 | 07F0 | E900 | 015D | 76FF |
| 0000006660 | FFA4 | A276 | 636A | 76FF | FFE4 | E276 | AC9A | B72F |
| 0000006700 | 830B | 0AC4 | 4689 | 89EC | EE56 | 468B | 0BEE | EC46 |
| 0000006720 | 0374 | 19E9 | C400 | A25E | 8A26 | 0A47 | 1024 | 013C |
| 0000006740 | C01B | EB25 | 05FF | 0021 | 4689 | E9F0 | 011D | 76FF |
| 0000006760 | FFE4 | E276 | E89A | CF2D | 830B | 04C4 | F08B | 5EC4 |
| 0000007000 | 26E2 | 40C6 | 00FF | 76FF | FFE4 | E276 | E89A | E72D |
| 0000007020 | 830B | 04C4 | 633D | 7600 | E903 | 0086 | 096A | 76FF |
| 0000007040 | FFE4 | E276 | 8A9A | 2432 | 830C | 06C4 | 4689 | 89E8 |
| 0000007060 | EA56 | D00B | 0375 | 69E9 | 8B00 | E846 | 462B | 89E2 |
| 0000007100 | C646 | 468B | 99C6 | C233 | C22B | F8C1 | 3302 | 2BC2 |
| 0000007120 | 40C2 | E0C1 | 2B02 | C646 | 4689 | FFC2 | E476 | 76FF |
| 0000007140 | 9AE2 | 2DE8 | 0C47 | C483 | 2B04 | E846 | 4603 | 50E2 |
| 0000007160 | 468B | 8BE8 | EA56 | 5240 | 8B50 | E846 | 568B | 03EA |
| 0000007200 | C246 | 5052 | B89A | 5A32 | 830C | 0AC4 | 76FF | 6AC2 |
| 0000007220 | FF20 | EA76 | 76FF | 9AE8 | 3382 | 0CA6 | C483 | E908 |
| 0000007240 | FF64 | 5EC4 | 26E2 | 47C6 | 0063 | 1E8B | 092C | E3C1 |
| 0000007260 | C402 | CA36 | 8B00 | E246 | 568B | 26E4 | 0089 | 8926 |

THU MAR 14 17:46:58 1991  SYS.DLL  PAGE 5, LINE 237

| | | | | | | | | |
|---|---|---|---|---|---|---|---|---|
| 0000007300 | 0250 | 06FF | 092C | 2CA1 | 3909 | E646 | 037E | 3AE9 |
| 0000007320 | 8B00 | E646 | 8005 | C100 | 02E0 | FF50 | CC36 | FF00 |
| 0000007340 | CA36 | 9A00 | 3164 | 0CD7 | C483 | A306 | 00CA | 1689 |
| 0000007360 | 00CC | CCA1 | 0B00 | CA06 | 7400 | E903 | 0008 | 46C7 |
| 0000007400 | 07F0 | E900 | 0005 | 4681 | 80E6 | E900 | FE74 | 76FF |
| 0000007420 | FFA4 | A276 | D89A | 2419 | 830D | 04C4 | 7E83 | 21F0 |
| 0000007440 | 0374 | 05E9 | C700 | F046 | 0000 | 7E83 | 00F0 | 0374 |
| 0000007460 | 65E9 | 6A01 | 9A00 | 02E8 | 0000 | 24A3 | 8909 | 2616 |
| 0000007500 | FF09 | 2636 | FF09 | 2436 | 6A09 | 9A00 | 02FF | 0000 |
| 0000007520 | 28A3 | 8909 | 2A16 | FF09 | 2636 | FF09 | 2436 | 1E09 |
| 0000007540 | AF68 | 6800 | 0963 | FF68 | 6AFF | 6A00 | 6A00 | 9A00 |
| 0000007560 | 0322 | 0000 | 46C7 | FBBE | C70C | C046 | 0000 | 006A |
| 0000007600 | 016A | 0068 | 6A80 | 8D00 | BE46 | 5016 | 681E | 00B6 |
| 0000007620 | 76FF | FF08 | 0676 | 006A | 006A | 006A | 006A | 468D |
| 0000007640 | 16FA | 9A50 | 0375 | 0000 | C6A3 | 8900 | C816 | FF00 |
| 0000007660 | C836 | FF00 | C636 | FF00 | 0876 | 76FF | 9A06 | FFFF |
| 0000007700 | 0000 | 36FF | 00C8 | 36FF | 00C6 | 476A | 006A | 016A |
| 0000007720 | 0A6A | 006A | 949A | 0003 | 5200 | 6A50 | 6A00 | 9A00 |
| 0000007740 | 080D | 0000 | 36FF | 0926 | 36FF | 0924 | 468D | 16C8 |
| 0000007760 | 6A50 | 6A00 | 6A00 | 6A00 | 9A00 | 03BA | 0000 | 003D |
| 0000010000 | 7500 | E903 | 0015 | 36FF | 0926 | 36FF | 0924 | 468D |
| 0000010020 | 16C8 | 9A50 | 03D5 | 0000 | C9E9 | FFFF | C836 | FF00 |
| 0000010040 | C636 | 9A00 | 03E5 | 0000 | 36FF | 092A | 36FF | 0928 |
| 0000010060 | F09A | 0003 | FF00 | 2636 | FFD9 | 2436 | 9A09 | 03FD |
| 0000010100 | 0000 | CCA1 | 0B00 | CA06 | 7500 | E903 | 0042 | 46C7 |
| 0000010120 | 00C6 | E900 | 0003 | 46FF | A1C6 | 092C | 4639 | 7CC6 |
| 0000010140 | E903 | 001C | 5E8B | C1C6 | 02E3 | 36C4 | 00CA | FF26 |
| 0000010160 | 0270 | FF26 | 9A30 | 2AB8 | 0E4B | C483 | E904 | FFD6 |
| 0000010200 | 36FF | 00CC | 36FF | 00CA | B89A | EB2A | 830A | 04C4 |
| 0000010220 | C02B | C8A3 | A300 | 00C6 | 068E | 07B6 | 8326 | 323E |
| 0000010240 | 000A | 0375 | 09E9 | 8300 | AA7E | 74FE | E903 | 000F |
| 0000010260 | 068E | 07B8 | 8326 | 5E3E | 000A | 0375 | 51E9 | 8B00 |
| 0000010300 | F046 | 4689 | FFAC | B076 | 76FF | 8DAE | AC46 | 5016 |
| 0000010320 | 76FF | FFC4 | F876 | 76FF | 8DF6 | B24E | 5116 | 4E8D |
| 0000010340 | 16F2 | 8D51 | A64E | 5116 | 681E | 00CE | EC68 | FF00 |
| 0000010360 | C036 | FF00 | BE36 | FF00 | C436 | FF00 | C236 | 9A00 |
| 0000010400 | 0471 | 0000 | C483 | 8B28 | AC46 | 09E9 | E900 | 0006 |
| 0000010420 | 468B | E9F0 | 0000 | 5E1F | 835F | 02ED | E58B | 5D1F |
| 0000010440 | CA4D | 0008 | 581E | 4590 | 8B55 | 1EEC | D88E | EC81 |
| 0000010460 | 0000 | 5657 | B81E | 0A12 | D88E | C8A1 | 0B00 | C606 |
| 0000010500 | 7500 | E903 | 0017 | 36FF | 00C8 | 36FF | 00C6 | 296A |
| 0000010520 | 006A | 006A | 006A | 006A | A09A | 000D | E900 | 0000 |
| 0000010540 | 5E1F | 835F | 02ED | E58B | 5D1F | CB4D | 581E | 4590 |
| 0000010560 | 8B55 | 1EEC | D88E | EC81 | 0010 | 5657 | B81E | 0EF6 |
| 0000010600 | D88E | 468B | E90E | 0428 | 06C7 | 0946 | 0000 | 06C7 |
| 0000010620 | 093E | 0000 | 76FF | FF12 | 1076 | FF9A | 00FF | 8900 |
| 0000010640 | F046 | 5689 | B8F2 | 0000 | 00BA | 8900 | FA46 | 5689 |
| 0000010660 | 89FC | F646 | 5689 | FFF8 | 2636 | FF09 | 2436 | FF09 |
| 0000010700 | F276 | 76FF | 8DF0 | F646 | 5016 | 006A | 0868 | 9A50 |
| 0000010720 | FFFF | 0000 | 42A3 | 8909 | 4416 | 1E09 | 2E68 | FF09 |
| 0000010740 | 2C36 | 6A09 | 6A63 | 6A00 | 6A01 | 9A00 | FFFF | 0000 |
| 0000010760 | 76FF | FFF2 | F076 | 36FF | 092E | FF9A | 00FF | 1E00 |
| 0000011000 | 3C68 | 1E09 | 3868 | FF09 | 2E36 | 9A09 | FFFF | 0000 |
| 0000011020 | 06C6 | 00D9 | 6AF0 | 6A00 | 6A00 | 6AFF | 6AFF | 1EFF |
| 0000011040 | D868 | FF00 | 2E36 | 9A09 | FFFF | 0000 | 46C7 | 00F4 |
| 0000011060 | E900 | 0003 | 46FF | A1F4 | 092C | 4639 | 7CF4 | E903 |
| 0000011100 | 003C | 5E8B | C1F4 | 02E3 | 36C4 | 00CA | FF26 | 0270 |
| 0000011120 | FF26 | 8B30 | F45E | E3C1 | C402 | CA36 | 2600 | 70FF |
| 0000011140 | 2602 | 30FF | E89A | 382D | 830E | 04C4 | FF50 | F476 |

THU MAR 14 17:46:58 1991 SYS.DLL PAGE 6, LINE 296

| | | | | | | | | |
|---|---|---|---|---|---|---|---|---|
| 0000011160 | 006A | 36FF | 092E | FF9A | 00FF | E900 | FFB6 | 76FF |
| 0000011200 | FF12 | 1076 | 056A | 006A | 849A | 0010 | 5200 | 6850 |
| 0000011220 | 8007 | 8E9A | 0010 | A300 | 0934 | 1689 | 0936 | 36FF |
| 0000011240 | 0936 | 36FF | 0934 | A068 | A101 | 0946 | D22B | 5052 |
| 0000011260 | 626A | 006A | B49A | 0010 | FF00 | 1276 | 76FF | 6A10 |
| 0000011300 | 6A05 | 9A00 | 051D | 0000 | 5052 | 0668 | 9A80 | 0527 |
| 0000011320 | 0000 | 30A3 | 8909 | 3216 | FF09 | 3236 | FF09 | 3036 |
| 0000011340 | 6809 | 01A0 | 3EA1 | 2B09 | 52D2 | A150 | 092C | 2B48 |
| 0000011360 | 50C9 | 9A51 | 0F19 | 0000 | 00B8 | BA00 | 0000 | 09E9 |
| 0000011400 | 8B03 | 0646 | 3AA3 | 8B09 | 0846 | 40A3 | FF09 | 1276 |
| 0000011420 | 76FF | FF10 | 0E76 | 76FF | FF0C | 0A76 | 76FF | FF08 |
| 0000011440 | 0676 | FF9A | 00FF | B800 | 0000 | 00BA | E900 | 02DA |
| 0000011460 | 468B | E908 | 002A | 0EFF | 0946 | 45E9 | FF00 | 4606 |
| 0000011500 | E909 | 003E | 2E83 | 0946 | E908 | 0036 | 0683 | 0946 |
| 0000011520 | E908 | 002E | 468B | A306 | 0946 | 25E9 | E900 | 0022 |
| 0000011540 | 754B | E903 | FFD0 | 7548 | E903 | FFD1 | 7548 | E903 |
| 0000011560 | FFD2 | 7548 | E903 | FFD4 | 4848 | 0375 | D5E9 | E9FF |
| 0000011600 | 0000 | 46A1 | 3D09 | 0062 | 037F | 03E9 | B800 | 0062 |
| 0000011620 | 003D | 7C00 | E903 | 0003 | 00B8 | A300 | 0946 | 36FF |
| 0000011640 | 0936 | 36FF | 0934 | A268 | 6A01 | 6A00 | 6A00 | 6A00 |
| 0000011660 | 9A00 | 11A7 | 0000 | 063B | 0946 | 0375 | 2CE9 | FF00 |
| 0000011700 | 3E36 | FF09 | 4636 | FF09 | 2E36 | 9A09 | 1260 | 0000 |
| 0000011720 | 36FF | 0936 | 36FF | 0934 | A168 | A101 | 0946 | D22B |
| 0000011740 | 5052 | 006A | 006A | 469A | 0012 | B800 | 0000 | 00BA |
| 0000011760 | E900 | 0216 | 468B | E908 | 0038 | 0EFF | 093E | 53E9 |
| 0000012000 | FF00 | 3E06 | E909 | 004C | 40A1 | 9909 | 3EF7 | 093C |
| 0000012020 | 0629 | 093E | 3DE9 | A100 | 0940 | F799 | 3C3E | 0109 |
| 0000012040 | 3E06 | E909 | 002E | 468B | A306 | 093E | 25E9 | E900 |
| 0000012060 | 0022 | 7548 | E903 | FFC2 | 7548 | E903 | FFC3 | 7548 |
| 0000012100 | E903 | FFC4 | 7548 | E903 | FFCD | 4848 | 0375 | D5E9 |
| 0000012120 | E9FF | 0000 | 2CA1 | 4809 | 063B | 093E | 037F | 03E9 |
| 0000012140 | A100 | 093E | 003D | 7C00 | E903 | 0003 | 00B8 | A300 |
| 0000012160 | 093E | 36FF | 0932 | 36FF | 0930 | A268 | 6A01 | 6A00 |
| 0000012200 | 6A00 | 6A00 | 9A00 | 127B | 0000 | 063B | 093E | 0375 |
| 0000012220 | 2CE9 | FF00 | 3E36 | FF09 | 4636 | FF09 | 2E36 | 9A09 |
| 0000012240 | FFFF | 0000 | 36FF | 0932 | 36FF | 0930 | A168 | A101 |
| 0000012260 | 093E | D22B | 5052 | 006A | 006A | A69A | 0012 | B800 |
| 0000012300 | 0000 | 00BA | E900 | 0142 | 468B | E908 | 0041 | 36FF |
| 0000012320 | 0936 | 36FF | 0934 | 76FF | FF0E | 0C76 | 76FF | FF0A |
| 0000012340 | 0876 | 76FF | 9A06 | 12C5 | 0000 | 1DE9 | FF01 | 3236 |
| 0000012360 | FF09 | 3036 | FF09 | 0E76 | 76FF | FF0C | 0A76 | 76FF |
| 0000012400 | FF08 | 0676 | 759A | 0010 | E900 | 00FE | 23E9 | 2D00 |
| 0000012420 | 0011 | 073D | 7600 | E903 | 0018 | E0D1 | 2E93 | A7FF |
| 0000012440 | 12E2 | 12AD | 12AD | 12F2 | 12F2 | 128E | 12AD | 128E |
| 0000012460 | 12AD | B8E9 | FF00 | 1276 | 76FF | FF10 | 4436 | FF09 |
| 0000012500 | 4236 | 6A09 | 6A00 | 9A00 | 08A3 | 0000 | 36FF | 0944 |
| 0000012520 | 36FF | 0942 | B89A | 0008 | 6A00 | 6900 | 2C06 | C609 |
| 0000012540 | 5000 | 36FF | 092E | FF9A | 00FF | FF00 | 4436 | FF09 |
| 0000012560 | 4236 | 9A09 | 098E | 0000 | 00B8 | BA00 | 0000 | 89E9 |
| 0000012600 | 6A00 | 6A00 | FF00 | 2E36 | 9A09 | 0FBB | 0000 | 36FF |
| 0000012620 | 092E | FF9A | 00FF | FF00 | 4436 | FF09 | 4236 | 9A09 |
| 0000012640 | FFFF | 0000 | 00B8 | BA00 | 0000 | 5DE9 | E900 | 003D |
| 0000012660 | 233D | 7500 | E903 | FF7D | 0376 | 17E9 | 4800 | 0375 |
| 0000012700 | C5E9 | 48FB | 0375 | B8E9 | 2DFF | 0005 | 0375 | 30E9 |
| 0000012720 | E9FD | 0019 | 312D | 7500 | E903 | FE18 | 7548 | E903 |
| 0000012740 | FD4E | 482D | 7500 | E903 | FEDE | 00E9 | FF00 | 1276 |
| 0000012760 | 76FF | FF10 | 0E76 | 76FF | FF0C | 0A76 | 76FF | FF08 |
| 0000013000 | 0676 | EB9A | 0009 | E900 | 0000 | 5E1F | 835F | 02ED |
| 0000013020 | E58B | 5D1F | CA4D | 000E | 581E | 4590 | 8B55 | 1EEC |

THU MAR 14 17:46:58 1991 SYS.DLL PAGE 7, LINE 355

| | | | | | | | | |
|---|---|---|---|---|---|---|---|---|
| 0000013040 | D88E | EC81 | 0008 | 5657 | 8D1E | F87E | 768D | 8C06 |
| 0000013060 | 8ED0 | 8CC0 | 8ED0 | A5D8 | 1FA4 | 7E80 | 80F8 | 0373 |
| 0000013100 | 04E9 | 8000 | FC4E | 8001 | F97E | 7380 | E903 | 0004 |
| 0000013120 | 4E80 | 02FC | 7E80 | 80FA | 0373 | 04E9 | 8000 | FC4E |
| 0000013140 | 8004 | F87E | 72C0 | E903 | 0012 | 7E80 | C0F9 | 0372 |
| 0000013160 | 09E9 | 8000 | FA7E | 73C0 | E903 | 0004 | 4E80 | 08FC |
| 0000013200 | 7E80 | 00FC | 0374 | 1FE9 | 8000 | F87E | 7340 | E903 |
| 0000013220 | 0016 | 7E80 | 40F9 | 0373 | 0DE9 | 8000 | FA7E | 7340 |
| 0000013240 | E903 | 0004 | 46C6 | 08FC | 468A | E9FC | 0000 | 5F5E |
| 0000013260 | ED83 | 8B02 | 1FE5 | 4D5D | 1ECB | 9058 | 5545 | EC8B |
| 0000013300 | 8E1E | 81D8 | 04EC | 5700 | 6A56 | 6A00 | 6A01 | 6AFF |
| 0000013320 | 6AEC | 6A00 | 9A00 | 14B7 | 0000 | 5052 | D89A | C013 |
| 0000013340 | 8314 | 04C4 | E0C0 | 6A04 | 6A00 | 6A01 | 6AFF | 6AEF |
| 0000013360 | 6A00 | 8900 | FC46 | FF9A | 00FF | 5200 | 9A50 | 13D8 |
| 0000013400 | 1027 | C483 | 0A04 | FC46 | 00E9 | 5E00 | 835F | 02ED |
| 0000013420 | E58B | 5D1F | CB4D | 0000 | 0000 | 0000 | 0000 | 0000 |
| 0000013440 | 0000 | 0000 | 0000 | 8B55 | 1EEC | DE68 | 1E00 | E268 |
| 0000013460 | 9A00 | FFFF | 0000 | 068E | 00DE | A126 | 0015 | 1EA3 |
| 0000013500 | BB01 | 00E8 | 1F8C | 65BE | 8309 | FEE6 | 1E56 | FF9A |
| 0000013520 | 00FF | 0B00 | 74C0 | 3304 | EBC0 | 893A | 0477 | 894E |
| 0000013540 | E636 | 8300 | 03EE | D4C7 | 0001 | 7789 | 8906 | 0877 |
| 0000013560 | C683 | C702 | FE04 | 89FF | 0A77 | 681E | 00DC | 681E |
| 0000013600 | 00DA | FF9A | 00FF | E800 | 0020 | AA9A | 9F17 | E814 |
| 0000013620 | 0066 | 01B8 | 5D00 | 50CB | 689A | 4D17 | 9A15 | 18E2 |
| 0000013640 | 155B | FF68 | 9A00 | 1671 | 1560 | BB1E | 000D | FF33 |
| 0000013660 | 068E | 00DC | FFB9 | 267F | 3D80 | 7500 | 4701 | 8026 |
| 0000013700 | 003D | 3174 | FCBE | 8B00 | 8BD1 | F3CB | 8BA6 | 74CA |
| 0000013720 | 3308 | F2C0 | 74AE | EBE7 | 061C | 071E | F78B | BF1F |
| 0000013740 | 0123 | 2CAC | 7241 | C00E | 04E0 | AC92 | 412C | 0572 |
| 0000013760 | C20A | EBAA | 1FED | 00C3 | 02BB | 5200 | D48B | A780 |
| 0000014000 | 0123 | 50B7 | C48B | 1653 | 1650 | 9A52 | FFFF | 0000 |
| 0000014020 | C00B | 7558 | B110 | 3C40 | 7401 | 3C06 | 7502 | B106 |
| 0000014040 | 0808 | 238F | 4B01 | D679 | E85A | 0026 | AEBE | BF07 |
| 0000014060 | 07AE | 5FE8 | BE01 | 07AE | AEBF | E807 | 0156 | AEB8 |
| 0000014100 | 3D07 | 07B2 | DB74 | 016A | 680E | 1643 | FF9A | 00FF |
| 0000014120 | C300 | 0E8B | 07A4 | 2AE3 | 06C4 | 07A6 | C28C | DB33 |
| 0000014140 | 1EFF | 07A2 | 0373 | 61E9 | 8E01 | E206 | 2600 | 1E8B |
| 0000014160 | 0006 | 754B | C40D | AA06 | 8C07 | BBC2 | 0003 | 1EFF |
| 0000014200 | 07A2 | B8C3 | 0F3E | D88E | 33A1 | 0B03 | 75C0 | 0E10 |
| 0000014220 | 9CA1 | 0B07 | 75C0 | E805 | 001F | 03EB | 24E8 | 6A00 |
| 0000014240 | 6A03 | 6A00 | 9A00 | 160D | 0000 | 8B55 | 33EC | EBC9 |
| 0000014260 | 551A | EC8B | 01B9 | EB00 | 5512 | EC8B | 5756 | 00B9 |
| 0000014300 | EB01 | 5508 | EC8B | 5756 | 01B9 | E801 | 004B | 0A51 |
| 0000014320 | 75C9 | BE12 | 0954 | 54BF | E809 | 00B8 | AEBE | BF07 |
| 0000014340 | 07B2 | AFE8 | BE00 | 07B2 | B2BF | E807 | 00A6 | B2BE |
| 0000014360 | BF07 | 07B2 | 9DE8 | E800 | 008C | 0A58 | 75E4 | C713 |
| 0000014400 | 3306 | 0103 | B800 | 0001 | 8A50 | 0646 | 9A50 | FFFF |
| 0000014420 | 0000 | 4EE8 | 5F00 | 5D5E | 55CB | EC8B | 0D6A | E7E8 |
| 0000014440 | 8317 | 02C4 | 068E | 00E2 | 8B26 | 061E | 4B00 | 168B |
| 0000014460 | 0335 | FA83 | 75FF | 8904 | 351E | 3903 | 351E | 9F03 |
| 0000014500 | 0D6A | EDE8 | 8317 | 02C4 | 749E | 6A0A | E80E | 1798 |
| 0000014520 | C483 | EB02 | 3BC7 | 74D3 | 6A08 | E80E | 17AA | C483 |
| 0000014540 | 5D02 | 55C3 | EC8B | 0D6A | 9DE8 | 8317 | 02C4 | 06C7 |
| 0000014560 | 0335 | FFFF | 0D6A | B9E8 | 8317 | 02C4 | 0E6A | B1E8 |
| 0000014600 | 8317 | 02C4 | C35D | 0E8B | 07A4 | 07E3 | 02BB | FF00 |
| 0000014620 | A21E | C307 | F73B | 0E73 | EF83 | 8B04 | 0B05 | 0245 |
| 0000014640 | F274 | 1DFF | EEEB | 00C3 | 8B55 | B8EC | 00FC | 0E50 |
| 0000014660 | 6FE8 | 8301 | 3A3E | 0003 | 0474 | 1EFF | 0338 | FFB8 |
| 0000014700 | 5000 | E80E | 015C | E58B | CB5D | 02B8 | E900 | FDC7 |

THU MAR 14 17:46:58 1991 SYS.DLL PAGE 8, LINE 414

| | | | | | | | | |
|---|---|---|---|---|---|---|---|---|
| 0000014720 | 5A59 | DC8B | D82B | 0B72 | FB81 | 0200 | 0572 | E38B |
| 0000014740 | 5152 | 52CB | 3351 | E9C0 | FDAD | 14C8 | 0000 | 5657 |
| 0000014760 | FF2B | F78B | 3639 | 00DC | 0375 | F0E9 | A100 | 00DC |
| 0000015000 | C92B | 4E89 | 89F4 | F646 | 4E89 | 89F8 | FA46 | 0C6A |
| 0000015020 | 76FF | FFFA | F876 | 681E | 00FC | 009A | 1E2E | 8318 |
| 0000015040 | 0AC4 | C00B | 1A74 | 8146 | FFFE | 767F | E903 | 00BD |
| 0000015060 | 5EC4 | FFF8 | F846 | 8026 | 003F | EA75 | EB47 | 900D |
| 0000015100 | 5EC4 | FFF8 | F846 | 8026 | 003F | F475 | 5E8B | 26F8 |
| 0000015120 | 3F80 | 7500 | 8DB9 | 0145 | 6A50 | 9A04 | 3236 | 182D |
| 0000015140 | C483 | 8904 | F046 | 5689 | 56F2 | AE9A | 632A | 8318 |
| 0000015160 | 02C4 | 4689 | 89FC | FE56 | 468B | 0BF2 | F046 | 6D74 |
| 0000015200 | C28B | 460B | 74FC | 8B66 | F046 | 568B | A3F2 | 0329 |
| 0000015220 | 1689 | 032B | 0C6A | 76FF | FFF6 | F476 | 681E | 00FC |
| 0000015240 | 009A | 682E | 8315 | 0AC4 | C00B | 2C74 | 468B | 8BFC |
| 0000015260 | FE56 | 5EC4 | 83F0 | F046 | 2604 | 0789 | 8926 | 0257 |
| 0000015300 | 5EC4 | FFF4 | F446 | 8A26 | C407 | FC5E | 46FF | 26FC |
| 0000015320 | 0788 | C00A | 0E74 | E8EB | 5EC4 | FFF4 | F446 | 8026 |
| 0000015340 | 003F | F475 | 5EC4 | 26F4 | 3F80 | 7500 | 5EA7 | C95F |
| 0000015360 | 90CB | 8B55 | 56EC | B857 | 1644 | D88E | C08E | 568B |
| 0000015400 | BE06 | 07C2 | 3BAD | 74C2 | 4010 | 7496 | 970C | C033 |
| 0000015420 | FFB9 | F2FF | 8BAE | EBF7 | 96EB | 5E5F | E58B | CA5D |
| 0000015440 | 0002 | 8B55 | 57EC | 76FF | 0E06 | C5E8 | 0BFF | 74C0 |
| 0000015460 | 921F | FA8B | C033 | FFB9 | F2FF | F7AE | 49D1 | 8B50 |
| 0000015500 | BBC4 | 0002 | 1E53 | 5152 | 5016 | FF9A | 00FF | 5B00 |
| 0000015520 | 8B5F | 5DE5 | 02CA | 0000 | 1601 | 0202 | 0203 | 1804 |
| 0000015540 | 0D05 | 0906 | 0C07 | 0C08 | 0C09 | 070A | 080B | 160C |
| 0000015560 | 160D | 020F | 0D10 | 1211 | 0212 | 0235 | 0D41 | 0243 |
| 0000015600 | 0D52 | 0D53 | 0D57 | 0B59 | 0D6C | 206D | 1C70 | 0972 |
| 0000015620 | 1606 | 0A80 | 0A81 | 0982 | 0D84 | 0BA4 | 02CE | 0BD7 |
| 0000015640 | 0D00 | 1608 | 8B52 | E8D8 | 15C8 | 8E93 | 5AC2 | 8926 |
| 0000015660 | 0247 | 8926 | B817 | FFFF | 8B99 | 5DE5 | E8CB | 0008 |
| 0000015700 | FFB8 | 99FF | E58B | CB5D | D88B | A5E8 | 9315 | C28E |
| 0000015720 | 8926 | 0247 | BB53 | 1918 | 24B9 | 0A00 | 75E4 | 2E1B |
| 0000015740 | 073A | 1674 | 4343 | F7E2 | 133C | 0472 | 243C | 0A76 |
| 0000015760 | 3C43 | 72BC | 3C04 | 76CA | 4301 | 8A2E | 0147 | 5B98 |
| 0000016000 | 8926 | C307 | 8B55 | BBEC | 0002 | 05EB | 8B55 | 33EC |
| 0000016020 | E8DB | 155E | C303 | CB5D | 04C8 | 0000 | 46C7 | FFFC |
| 0000016040 | C4FF | 065E | F626 | 0A47 | 7440 | 2607 | 47C6 | 000A |
| 0000016060 | 2CEB | C38B | 462D | B903 | 000C | F799 | 89F9 | FE46 |
| 0000016100 | E850 | 1474 | C483 | FF02 | 0876 | 76FF | 9A06 | 1A24 |
| 0000016120 | 1A3E | C483 | 8904 | FC46 | 76FF | E8FE | 1466 | 468B |
| 0000016140 | C9FC | 90CB | 10C8 | 0000 | 5657 | FFBF | 8BFF | 0676 |
| 0000016160 | 44F6 | 830A | 0375 | 97E9 | 1E00 | 9A56 | 1E82 | 1A63 |
| 0000016200 | C483 | 8B04 | 8BF8 | 81DE | 46EB | 8B03 | 2A87 | 8905 |
| 0000016220 | FA46 | 561E | 6FE8 | 8302 | 04C4 | 448A | 2A0B | 50E4 |
| 0000016240 | DC9A | 7E24 | 831A | 02C4 | C00B | 617C | 7E83 | 00FA |
| 0000016260 | 5E74 | 681E | 0340 | 468D | 16F0 | 9A50 | 2DB2 | 1A9E |
| 0000016300 | C483 | 8D08 | F246 | 4689 | 8CFC | FE56 | 7E80 | 5CF0 |
| 0000016320 | 1474 | 681E | 0342 | 468D | 16F0 | 9A50 | 2D6C | 1AB7 |
| 0000016340 | C483 | EB08 | 9004 | 4EFF | 6AFC | FF0A | FE76 | 76FF |
| 0000016360 | FFFC | FA76 | 3C9A | C42E | 831A | 08C4 | 468D | 16F0 |
| 0000016400 | 9A50 | 342E | 17DD | C483 | 0B04 | 74C0 | BF03 | FFFF |
| 0000016420 | 44C6 | 000A | C78B | 5F5E | CBC9 | 08C8 | 0000 | 649A |
| 0000016440 | 0824 | 891B | FC46 | 5689 | 0BFE | 75D0 | 2B05 | 99C0 |
| 0000016460 | 37EB | 76FF | 50FE | 76FF | FF0E | 0C76 | 76FF | FF0A |
| 0000016500 | 0876 | 76FF | 9A06 | 1D4A | 1B40 | C483 | 890E | F846 |
| 0000016520 | 5689 | 8BFA | FC46 | 462D | B903 | 000C | F799 | 50F9 |
| 0000016540 | 61E8 | 8B13 | F846 | 568B | C9FA | 90CB | 8B55 | 6AEC |
| 0000016560 | FF40 | 0C76 | 76FF | FF0A | 0876 | 76FF | 9A06 | 1ADA |

THU MAR 14 17:46:58 1991 SYS.DLL PAGE 9, LINE 473

| | | | | | | | | |
|---|---|---|---|---|---|---|---|---|
| 0000016600 | 1A10 | CBC9 | 8B55 | 56EC | 8B57 | 0676 | 448A | A80A |
| 0000016620 | 7483 | A85F | 754D | A85B | 7502 | 0C48 | 8801 | 0A44 |
| 0000016640 | FE8B | EF81 | 0346 | C781 | 0526 | 0CA8 | 0D75 | 05F6 |
| 0000016660 | 7501 | 1E06 | E856 | 0186 | C483 | 8B04 | 0644 | 0489 |
| 0000016700 | 75FF | FF02 | 0874 | 3350 | 8ADB | 0B5C | 0E53 | E1E8 |
| 0000016720 | 830B | 08C4 | C00B | 1174 | FF3D | 75FF | 801A | 0A4C |
| 0000016740 | EB20 | 800A | 0A4C | EB20 | 8009 | 0A4C | C710 | 0444 |
| 0000016760 | 0000 | FFB8 | EBFF | 8A25 | 23BF | 8001 | 82E7 | FF80 |
| 0000017000 | 7582 | 8A0B | 0A7C | C7F6 | 7582 | 8003 | 200D | 8948 |
| 0000017020 | 0444 | 1CC4 | C033 | 8A26 | 4307 | 1C89 | 5E5F | CB5D |
| 0000017040 | 8B55 | 56EC | 8B57 | 0876 | 448A | A80A | 7482 | A864 |
| 0000017060 | 7540 | C760 | 0444 | 0000 | 01A8 | 0B74 | 10A8 | 5374 |
| 0000017100 | 4C8B | 8906 | 240C | 0CFE | 2402 | 88EF | 0A44 | FE8B |
| 0000017120 | EF81 | 0346 | C781 | 0526 | DB33 | 5C8A | A80B | 7508 |
| 0000017140 | A84B | 7504 | F618 | 0105 | 4275 | FE81 | 0352 | 0674 |
| 0000017160 | FE81 | 035E | 2675 | 87F6 | 0123 | 7440 | B91F | 0001 |
| 0000017200 | 1651 | 7E8D | 5706 | 0E53 | 8FE8 | 830C | 08C4 | 01B9 |
| 0000017220 | EB00 | B846 | FFFF | 4C80 | 200A | 65EB | 1E53 | E856 |
| 0000017240 | 009C | C483 | 5B04 | 44F6 | 080A | D174 | 0C8B | 548B |
| 0000017260 | 2B06 | 42CA | 1489 | 558B | 4A02 | 5489 | E304 | 5125 |
| 0000017300 | FF51 | 0874 | 74FF | 5306 | E80E | 0C4E | C483 | 5908 |
| 0000017320 | 7CC4 | 8B06 | 0656 | 8826 | 3B15 | 75C1 | 33B6 | 8AC0 |
| 0000017340 | 0646 | 1DEB | C033 | 87F6 | 0123 | 7420 | B9E3 | 0002 |
| 0000017360 | 5051 | 5350 | E80E | 086E | C483 | 3308 | 8BC0 | EBC8 |
| 0000017400 | 5FCF | 5D5E | 00CB | 8B55 | 56EC | 768B | 8A04 | 0A44 |
| 0000017420 | 83A8 | 2674 | 08A8 | 2274 | 74FF | FF08 | 0674 | B89A |
| 0000017440 | E12A | 831A | 04C4 | 6480 | F70A | C033 | 4489 | 8906 |
| 0000017460 | 0844 | 0489 | 4489 | 8902 | 0444 | 5D5E | 00C3 | 8B55 |
| 0000017500 | 56EC | 768B | B804 | 0200 | 9A50 | 2AAE | 1CE1 | 8B59 |
| 0000017520 | 81DE | 46EB | 8103 | 26C3 | 0B05 | 74D2 | 800B | 0A4C |
| 0000017540 | C708 | 0247 | 0200 | 0EEB | 4C80 | 040A | 47C7 | 0102 |
| 0000017560 | 8C00 | 8DDA | 0147 | 5489 | 8902 | 8904 | 0854 | 4489 |
| 0000017600 | C706 | 0444 | 0000 | 5D5E | 00C3 | 08C8 | 0000 | 5657 |
| 0000017620 | 5EC4 | 260A | 078A | 3D98 | 0077 | 4874 | 0877 | 612C |
| 0000017640 | 4C74 | 112C | 0674 | C02B | E999 | 00CC | F62B | 46C6 |
| 0000017660 | 01FC | 46C7 | 01FE | FF00 | 0A46 | 5EC4 | 260A | 3F80 |
| 0000017700 | 7400 | 835B | FE7E | 7400 | 2655 | 078A | 3D98 | 0074 |
| 0000017720 | 3474 | 0877 | 2B2C | 1C74 | 372C | 3674 | 46C7 | 00FE |
| 0000017740 | EB00 | 90D4 | 01BE | C603 | FC46 | EB02 | 90C5 | 09BE |
| 0000017760 | EB01 | 90F4 | C6F7 | 0002 | E275 | CE83 | 8302 | FEE6 |
| 0000020000 | 46C6 | 80FC | B1EB | C6F7 | C000 | D075 | CE81 | 4000 |
| 0000020020 | A5EB | C6F7 | C000 | C475 | CE81 | 8000 | 99EB | A468 |
| 0000020040 | FF01 | 0E76 | FF56 | 0876 | 76FF | 9A06 | 2594 | 1D0C |
| 0000020060 | C483 | 890A | FA46 | C00B | 037D | 69E9 | FFFF | 4406 |
| 0000020100 | 8B03 | 107E | C78B | 462D | 0503 | 0526 | 4689 | 8AF8 |
| 0000020120 | FC46 | 4588 | 8B0A | F85E | 07C6 | 2B00 | 89C0 | 0445 |
| 0000020140 | 4789 | 8904 | 0245 | 0589 | 4589 | 8908 | 0645 | 468A |
| 0000020160 | 88FA | 0B45 | C78B | DA8C | 5F5E | CBC9 | 04C8 | 0000 |
| 0000020200 | 468B | 0B08 | 0646 | 0875 | 006A | A7E8 | EB00 | 9031 |
| 0000020220 | 468B | 2D06 | 0346 | 0CB9 | 9900 | F9F7 | 4689 | 50FC |
| 0000020240 | 15E8 | 8310 | 02C4 | 76FF | FF08 | 0676 | 829A | C61E |
| 0000020260 | 831E | 04C4 | 4689 | FFFE | FC76 | 07E8 | 8B10 | FE46 |
| 0000020300 | CBC9 | 02C8 | 0000 | 5657 | FF2B | 768B | 8A06 | 0A44 |
| 0000020320 | C88B | 0324 | 023C | 3F75 | C1F6 | 7508 | 8B0D | 81DE |
| 0000020340 | 46EB | F603 | 2687 | 0105 | 2D74 | 048B | 442B | 8906 |
| 0000020360 | FE46 | C00B | 217E | FF50 | 0874 | 74FF | 8A06 | 0B4C |
| 0000020400 | ED2A | 9A51 | 28DA | 1F43 | C483 | 3908 | FE46 | 0774 |
| 0000020420 | 4C80 | 200A | FFBF | 8BFF | 0644 | 548B | 8908 | 8904 |
| 0000020440 | 0254 | 44C7 | 0004 | 8B00 | 5EC7 | C95F | 90CB | 016A |

THU MAR 14 17:46:58 1991 SYS.DLL PAGE 10, LINE 532

| | | | | | | | | |
|---|---|---|---|---|---|---|---|---|
| 0000020460 | 01E8 | CB00 | 04C8 | 0000 | 5657 | 46BE | 2B03 | 89FF |
| 0000020500 | FE7E | 026A | C1E8 | 830F | 02C4 | 11EB | 46C7 | FFFE |
| 0000020520 | FFFF | FC76 | 6DE8 | 830F | 02C4 | C683 | 390C | 0636 |
| 0000020540 | 7207 | 8B2B | 2DC6 | 0346 | 0CB9 | 9900 | F9F7 | 4689 |
| 0000020560 | 50FC | 43E8 | 830F | 02C4 | 44F6 | 830A | D374 | 561E |
| 0000020600 | 829A | EE1E | 831D | 04C4 | 7440 | 47C1 | C3EB | 026A |
| 0000020620 | 9FE8 | 830F | 02C4 | 7E83 | 0104 | 0475 | C78B | 03EB |
| 0000020640 | 468B | 5EFE | C95F | 02C2 | 9000 | 1FD2 | 1FDD | 1FF3 |
| 0000020660 | 2027 | 2053 | 205B | 2084 | 20B6 | 8B55 | B8EC | 0171 |
| 0000020700 | E80E | F80C | 5756 | C033 | 4689 | 88F8 | FB46 | 76C4 |
| 0000020720 | 260A | 89AC | 0A76 | 4688 | 0AFE | 74C0 | 8306 | F87E |
| 0000020740 | 7D00 | 8B06 | F846 | B5E9 | BB04 | 070A | 202C | 583C |
| 0000020760 | 0577 | 24D7 | EB0F | B002 | B100 | D203 | 02E0 | FB46 |
| 0000021000 | FED7 | D2C1 | 88E8 | FB46 | 8B98 | D1D8 | 2EE3 | A7FF |
| 0000021020 | 1F6A | 568A | B9FE | 0001 | 36E8 | EB04 | 33B1 | 89C0 |
| 0000021040 | F046 | 4689 | 89F6 | EE46 | 46C7 | 20FC | 4800 | 4689 |
| 0000021060 | EBF4 | 8A9E | FC46 | 2D3C | 0675 | 4E80 | 04FC | 8EEB |
| 0000021100 | 2B3C | 0675 | 4E80 | 01FC | 84EB | 203C | 0775 | 4E80 |
| 0000021120 | 02FC | 79E9 | 3CFF | 7523 | 8007 | FC4E | E980 | FF6E |
| 0000021140 | 4E80 | 08FC | 67E9 | 8AFF | FE4E | F980 | 752A | E80F |
| 0000021160 | 035C | C00B | 1779 | D8F7 | 4E80 | 04FC | 0FEB | E980 |
| 0000021200 | 3230 | 8BED | F646 | 0ABB | F700 | 03E3 | 89C1 | F646 |
| 0000021220 | 3BE9 | C7FF | F446 | 0000 | 33E9 | 8AFF | FE4E | F980 |
| 0000021240 | 752A | E80C | 0328 | C00B | 1479 | FFB8 | EBFF | 800F |
| 0000021260 | 30E9 | ED32 | 468B | BBF4 | 000A | E3F7 | C103 | 4689 |
| 0000021300 | E9F4 | FF0A | 468A | 3CFE | 756C | 8006 | FC4E | EB10 |
| 0000021320 | 3C22 | 7546 | 8006 | FC4E | EB20 | 3C18 | 754E | 8006 |
| 0000021340 | FD4E | EB10 | 3C0E | 754C | 8006 | FD4E | EB04 | 8004 |
| 0000021360 | FD4E | E908 | FED8 | 468A | 3CFE | 7564 | E903 | 0194 |
| 0000021400 | 693C | 0375 | 8DE9 | 3C01 | 7575 | E903 | 018A | 583C |
| 0000021420 | 0375 | 89E9 | 3C01 | 7578 | E903 | 0188 | 6F3C | 0375 |
| 0000021440 | A2E9 | 3C01 | 7463 | 3C1A | 7473 | 3C27 | 746E | 3C51 |
| 0000021460 | 7470 | 3C60 | 7445 | 3C07 | 7447 | E903 | 00BB | B5E9 |
| 0000021500 | E800 | 028A | BE8D | FE8F | 0716 | 4FAA | 01B9 | E900 |
| 0000021520 | 01F1 | 90E8 | 0B02 | 75FF | 8C12 | 0BC0 | 75C0 | 1E0C |
| 0000021540 | BF07 | 0763 | 0E8B | 0769 | D8E9 | 5701 | 4E8B | E3F4 |
| 0000021560 | 3207 | F2C0 | 75AE | 4F01 | 2B59 | 87F9 | E9CF | 01C3 |
| 0000021600 | 62E8 | 8B02 | F846 | F6AB | FC46 | 7410 | 3303 | ABC0 |
| 0000021620 | 3BE9 | F6FE | FC46 | 7530 | E805 | 0232 | 39EB | 36E8 |
| 0000021640 | F602 | FD46 | 7518 | C630 | FF46 | B907 | 0010 | 0716 |
| 0000021660 | 3352 | 8DD2 | 97BE | BEFE | 0004 | B0E8 | B902 | 0010 |
| 0000021700 | BE8D | FE92 | 3358 | BED2 | 0004 | A0E8 | C602 | 9386 |
| 0000021720 | 3AFE | 09B9 | EB00 | C618 | FF46 | B907 | 0010 | 0716 |
| 0000021740 | D233 | BE8D | FE92 | 04BE | E800 | 0281 | 04B9 | 8D00 |
| 0000021760 | 8FBE | E9FE | 014D | 46FF | 80EE | FC4E | 8A40 | FE46 |
| 0000022000 | 200C | 8B98 | 83F0 | F47E | 7F00 | 7413 | C707 | F446 |
| 0000022020 | 0006 | 0AEB | 673D | 7500 | C705 | F446 | 0001 | BE8D |
| 0000022040 | FE8F | 76FF | FFEE | F476 | 1656 | FF57 | 1076 | 76FF |
| 0000022060 | F60E | FD46 | 7404 | FF0A | 921E | 8307 | 0E46 | EB0A |
| 0000022100 | FF08 | 7E1E | 8307 | 0E46 | 8308 | 0EC4 | 46F6 | 80FC |
| 0000022120 | 0F74 | 7E83 | 00F4 | 0975 | 5716 | 1EFF | 078A | C483 |
| 0000022140 | 8304 | 67FE | 1075 | 46F7 | 80FC | 7500 | 1609 | FF57 |
| 0000022160 | 821E | 8307 | 04C4 | 0716 | 8026 | 2D3D | 0575 | 8047 |
| 0000022200 | FD4E | B901 | FFFF | B057 | F200 | 4FAE | 2B59 | 87F9 |
| 0000022220 | E9CF | 00AF | 4E80 | 40FC | 46C6 | 0AFA | 35EB | 46C6 |
| 0000022240 | 07FF | 04EB | 46C6 | 27FF | 46F6 | 80FC | 1174 | 46C7 |
| 0000022260 | 02F0 | C600 | F246 | B230 | 0251 | FF56 | 5688 | C6F3 |
| 0000022300 | FA46 | EB10 | F60E | FC46 | 7480 | 8004 | FD4E | C602 |
| 0000022320 | FA46 | F608 | FC46 | 7410 | E805 | 00FB | 0EEB | EDE8 |

THU MAR 14 17:46:58 1991 SYS.DLL PAGE 11, LINE 591

| | | | | | | | | |
|---|---|---|---|---|---|---|---|---|
| 0000022340 | F600 | FC46 | 7440 | 9903 | 02EB | D233 | 46F6 | 40FC |
| 0000022360 | 0F74 | D20B | 0B7D | 4E80 | 01FD | D8F7 | D283 | F700 |
| 0000022400 | 83DA | F47E | 7D00 | C707 | F446 | 0001 | 04EB | 6680 |
| 0000022420 | F7FC | D88B | DA0B | 0575 | 46C7 | 00F0 | 8D00 | EB7E |
| 0000022440 | 0716 | 4E8A | 32FA | 8BED | F476 | 40E8 | F601 | FD46 |
| 0000022460 | 7402 | E30E | 2606 | 3D80 | 7430 | 4F06 | C626 | 3005 |
| 0000022500 | EB41 | F600 | FC46 | 7440 | F631 | FD46 | 7401 | C60B |
| 0000022520 | F246 | C72D | F046 | 0001 | 20EB | 46F6 | 01FC | 0B74 |
| 0000022540 | 46C6 | 2BF2 | 46C7 | 01F0 | EB00 | F60F | FC46 | 7402 |
| 0000022560 | C609 | F246 | C72D | F046 | 0001 | 468B | 2BF6 | 2BC1 |
| 0000022600 | F046 | 027D | C033 | 5706 | F651 | FC46 | 750C | 8B07 |
| 0000022620 | B2C8 | E820 | 00BB | 1650 | 8D07 | F27E | 4E8B | E8F0 |
| 0000022640 | 0091 | F658 | FC46 | 7408 | F60D | FC46 | 7504 | 8B07 |
| 0000022660 | B2C8 | E830 | 009B | 5F59 | 5007 | 76E8 | 5800 | 46F6 |
| 0000022700 | 04FC | 0774 | C88B | 20B2 | 86E8 | E900 | FC00 | 76C4 |
| 0000022720 | 260E | 89AD | 0E76 | C4C3 | 0E76 | AD26 | D08B | AD26 |
| 0000022740 | 8992 | 0E76 | F6C3 | FC46 | 7420 | E808 | FFE9 | C28E |
| 0000022760 | F88B | E8C3 | FFD8 | F88B | C00B | 0375 | C08E | 1EC3 |
| 0000023000 | C307 | 0698 | C457 | 065E | FF26 | 044F | 1078 | 8B26 |
| 0000023020 | 263F | 07FF | 8E26 | 0247 | 33AA | 5FC0 | C307 | 5251 |
| 0000023040 | 5306 | 0E50 | F9E8 | 83F7 | 06C4 | 595A | FF3D | 75FF |
| 0000023060 | EBE8 | E3E8 | 8B1B | 01F7 | F84E | 3357 | 26FF | E8AC |
| 0000023100 | FFC0 | F80B | F7E2 | FF0B | 745F | C705 | F846 | FFFF |
| 0000023120 | E3C3 | 0119 | F84E | 3357 | 8AFF | E8C2 | FFA4 | F80B |
| 0000023140 | F7E2 | FF0B | 745F | C705 | F846 | FFFF | FDC3 | 9357 |
| 0000023160 | F60B | 0A7F | DB0B | 0675 | D20B | 0275 | 1AEB | 3392 |
| 0000023200 | F7D2 | 93F1 | F1F7 | 8792 | 04D3 | 3C30 | 7639 | 0203 |
| 0000023220 | FF46 | 8BAA | 4EC2 | D8EB | 2B59 | 47CF | C3FC | 5E5F |
| 0000023240 | E58B | CB5D | 06C8 | 0000 | BE56 | 0346 | C02B | 4689 |
| 0000023260 | 89FC | FA46 | ?26A | 4FE8 | 830A | 02C4 | 0CEB | 76FF |
| 0000023300 | E8FE | 0A00 | C483 | 8302 | 0CC6 | 3639 | 0706 | 3B72 |
| 0000023320 | C68B | 462D | B903 | 000C | F799 | 89F9 | FE46 | E850 |
| 0000023340 | 09D6 | C483 | F602 | 0A44 | 7583 | C7D3 | 0444 | 0000 |
| 0000023360 | 44C6 | 000A | C02B | 4489 | 8908 | 0644 | 4489 | 8902 |
| 0000023400 | C604 | 0B44 | 89FF | FA76 | 5E8C | 6AFC | E802 | 0A22 |
| 0000023420 | C483 | 8B02 | FA46 | 568B | 5EFC | CBC9 | 8B55 | 8BEC |
| 0000023440 | 065E | 1E3B | 0121 | 1272 | 09BA | 3300 | E9C0 | F474 |
| 0000023460 | E853 | 09A8 | C483 | E902 | F483 | E853 | 0992 | C483 |
| 0000023500 | 5302 | FF9A | 00FF | 8500 | 75C0 | C6E5 | 2387 | 0001 |
| 0000023520 | E853 | 0988 | C483 | 8B02 | 5DE5 | 00CB | 8B55 | 83EC |
| 0000023540 | 02EC | C033 | 09EB | 8B55 | 83EC | 02EC | FFB8 | 89FF |
| 0000023560 | FE46 | 5E8B | 3B06 | 211E | 7201 | BA19 | 0009 | C033 |
| 0000023600 | 21E9 | 8BF4 | FE4E | C90B | 0774 | E853 | 094E | C483 |
| 0000023620 | E902 | F429 | C00B | 0774 | E853 | 0934 | C483 | 8302 |
| 0000023640 | 04EC | CC8B | FF53 | 0A76 | 76FF | FF08 | 0C76 | 5116 |
| 0000023660 | FF9A | 00FF | 5900 | 855A | 75C0 | 80C8 | 23A7 | FD01 |
| 0000023700 | 468B | 0BFE | 74C0 | 5307 | 11E8 | 8309 | 02C4 | 8B91 |
| 0000023720 | 5DE5 | 00CB | 8B55 | 83EC | 0EEC | 7E8A | 8B0C | 0E46 |
| 0000023740 | 4689 | EB0C | 5508 | EC8B | EC83 | B70E | FF40 | 0876 |
| 0000023760 | 76FF | 1606 | 568D | 52FE | 8D16 | F856 | 3352 | 52D2 |
| 0000024000 | 8B52 | 0C4E | 99E8 | 8B01 | 0A46 | 00A9 | 7401 | 8008 |
| 0000024020 | 10CA | 00A9 | 7504 | A92A | 0200 | 2274 | CA80 | 5002 |
| 0000024040 | 468D | FFFE | 0876 | 76FF | 1606 | 3350 | 50C0 | 9A50 |
| 0000024060 | FFFF | 0000 | C085 | 7558 | 8B08 | FE4E | 03EB | CA80 |
| 0000024100 | 5101 | 2552 | 0003 | C70A | 3350 | 50C0 | 9A50 | FFFF |
| 0000024120 | 0000 | C00B | 1674 | 6E3D | 7500 | F60E | F0C2 | 02BA |
| 0000024140 | 7400 | BA03 | 0011 | 3BE9 | E9F3 | 009D | 468B | 3BFE |
| 0000024160 | 2106 | 7201 | 500D | 039A | 0025 | BA00 | 0018 | C033 |
| 0000024200 | E4EB | E850 | 084A | C483 | 8B02 | 50D0 | 8D16 | F45E |

THU MAR 14 17:46:58 1991 SYS.DLL PAGE 12, LINE 650

| | | | | | | | | |
|---|---|---|---|---|---|---|---|---|
| 0000024220 | 1653 | 468D | 50F8 | CC9A | 0015 | 0B00 | 75C0 | 8B61 |
| 0000024240 | 0A46 | C933 | 00A9 | 7580 | A90E | 4000 | 0775 | 06F6 |
| 0000024260 | 076D | 7580 | B102 | 8880 | F24E | 468A | 3CF4 | 7501 |
| 0000024300 | C607 | F446 | E940 | 008F | 023C | 0775 | 46C6 | 08F4 |
| 0000024320 | 84E9 | 3200 | 88C0 | F446 | C90A | F474 | 46F7 | 020A |
| 0000024340 | 7400 | 5274 | FFB9 | 51FF | B951 | 0002 | 1651 | 468D |
| 0000024360 | 50FA | 719A | 0025 | 0B00 | 74C0 | 3D15 | 0083 | 0C74 |
| 0000024400 | 76FF | E8FE | 07D6 | C483 | E902 | F2B1 | C033 | 47EB |
| 0000024420 | 1652 | 468D | 50F6 | 01B8 | 5000 | 8D16 | F846 | 9A50 |
| 0000024440 | FFFF | 0000 | C00B | 1B75 | 4639 | 74F8 | 802A | F67E |
| 0000024460 | 751A | 5210 | 76FF | FFFC | FA76 | FF9A | 00FF | 0B00 |
| 0000024500 | 75C0 | 52BD | C033 | 5050 | 1650 | 468D | 50FA | B39A |
| 0000024520 | 0026 | 0B00 | 75C0 | 8AA9 | F44E | C1F6 | 7548 | FF28 |
| 0000024540 | 0876 | 76FF | 1606 | 468D | 50F8 | C033 | 5050 | F09A |
| 0000024560 | 0025 | F700 | F846 | 0001 | 0374 | C980 | F710 | 0A46 |
| 0000024600 | 0008 | 0374 | C980 | 0A20 | F24E | C980 | 8B01 | 8BC2 |
| 0000024620 | 88D8 | 238F | 5301 | 43E8 | 8307 | 02C4 | E58B | CB5D |
| 0000024640 | 1CA1 | F701 | 23D0 | 33C1 | A8C9 | 7580 | 8003 | 01C9 |
| 0000024660 | 00C3 | 8B55 | 83EC | 08EC | C033 | 5E8B | 3B06 | 211E |
| 0000024700 | 7301 | 534D | 09E8 | 8307 | 02C4 | 4E8B | E30C | F647 |
| 0000024720 | 2387 | 0201 | 4075 | 3357 | 8BD2 | 0C4E | 7EC4 | F608 |
| 0000024740 | 2387 | 0801 | 1074 | 878A | 0223 | 0A3C | 0874 | 42AA |
| 0000024760 | C649 | 2387 | 0A02 | 0653 | 5157 | 468D | 16FA | 9A50 |
| 0000025000 | 26E0 | 0000 | 0B5F | 74C0 | 530F | CFE8 | 8306 | 02C4 |
| 0000025020 | 09BA | E900 | F18E | 4AEB | 468B | 03FA | F6C2 | 2387 |
| 0000025040 | 8001 | 3E74 | A780 | 0123 | 56FB | 1E57 | C507 | 0876 |
| 0000025060 | FE8B | C88B | 28E3 | 0DB4 | 3C80 | 750A | 2606 | 8F80 |
| 0000025100 | 0123 | AC04 | C43A | 2574 | 1A3C | 0875 | 8026 | 238F |
| 0000025120 | 0201 | 05EB | 0588 | E247 | 8BEA | 2BC7 | 0846 | 1F06 |
| 0000025140 | 5E5F | E853 | 0676 | C483 | 8B02 | 5DE5 | 83CB | 01F9 |
| 0000025160 | 0774 | 3C80 | 740A | EBE0 | 26DB | 87F6 | 0123 | 7440 |
| 0000025200 | 0B2B | 75DB | 5323 | 468D | 16F9 | 5150 | 468D | 16FA |
| 0000025220 | 9A50 | 27C0 | 0000 | C085 | 0E74 | 1F06 | 5E5F | E853 |
| 0000025240 | 063A | C483 | E902 | F115 | 0AB0 | A8EB | 46C6 | 00F9 |
| 0000025260 | 8D53 | F946 | 5016 | 8D51 | FA46 | 5016 | 529A | 0028 |
| 0000025300 | 0B00 | 75C0 | F7D5 | FA46 | FFFF | 3674 | 7E83 | 010C |
| 0000025320 | 3574 | F626 | 2387 | 0801 | 1C75 | B853 | FFFF | 5050 |
| 0000025340 | D8F7 | 8D50 | FC46 | 5016 | 0F9A | 0027 | 8000 | F97E |
| 0000025360 | 750A | E90F | FF61 | 468A | 26F9 | 8788 | 0223 | 0A3C |
| 0000025400 | 0274 | 0DB0 | 4DE9 | 80FF | F97E | 750A | EBC5 | 0099 |
| 0000025420 | 8B55 | 83EC | 0EEC | C033 | 09EB | 8B55 | 83EC | 0EEC |
| 0000025440 | FFB8 | 89FF | F246 | 5E8B | 3B06 | 211E | 7201 | BA08 |
| 0000025460 | 0009 | C033 | 6DE9 | 0BF0 | 74C0 | 5307 | 91E8 | 8305 |
| 0000025500 | 02C4 | 87F6 | U123 | 7420 | 5312 | C933 | 5151 | 4141 |
| 0000025520 | 8D51 | F446 | 5016 | A99A | 0028 | F600 | 2387 | 8001 |
| 0000025540 | 6674 | 5E8C | 8EFA | 0A46 | 56C5 | 3308 | 89C0 | FE46 |
| 0000025560 | 4689 | FCFC | 5657 | FA8B | F28B | 6689 | 8BF8 | 0C4E |
| 0000025600 | 28E3 | 0AB0 | AEF2 | 3B75 | EC83 | 8B02 | BADC | 0080 |
| 0000025620 | E22B | D48B | FA8B | 0716 | 4E8B | AC0C | 0A3C | 0D74 |
| 0000025640 | FB3B | 1A74 | E2AA | E8F4 | 0038 | AFE9 | B000 | 3B0D |
| 0000025660 | 75FB | E803 | 002C | B0AA | FF0A | FC46 | E2EB | 21E8 |
| 0000025700 | EB00 | 5EE1 | 8E5F | FA5E | C8E9 | 8B00 | F246 | C00B |
| 0000025720 | 0974 | 76FF | E806 | 0504 | C483 | B802 | FFFC | E80E |
| 0000025740 | EDEE | 5350 | 1E51 | 1F06 | CF8B | CA2B | 21E3 | 8B51 |
| 0000025760 | 065E | 1E53 | 5152 | 468D | 16F4 | 9A50 | 190B | 0000 |
| 0000026000 | 0B59 | 75C0 | 8B11 | F45E | 5E01 | 3BFE | 72D9 | 1F07 |
| 0000026020 | 5B59 | 8B58 | C3FA | 831F | 08C4 | 7E83 | 00FE | 3C75 |
| 0000026040 | C00B | 1874 | 6D3D | 7400 | 3D0D | 0001 | 09BA | 7500 |
| 0000026060 | BA08 | 001C | 03EB | 20BA | F900 | 26EB | 5E8E | F6FA |

THU MAR 14 17:46:58 1991 SYS.DLL PAGE 13, LINE 709

| | | | | | | | | |
|---|---|---|---|---|---|---|---|---|
| 0000026100 | 2387 | 4001 | 0E74 | 5E8E | 8B0A | 085E | 3F80 | 751A |
| 0000026120 | F803 | 0EEB | 1CBA | 3300 | F9C0 | 06EB | 468B | 2BFE |
| 0000026140 | FC46 | 668B | 5EF8 | 8E5F | FA5E | 1472 | 5E8B | 0BF2 |
| 0000026160 | 74DB | FF09 | 0676 | 63E8 | 8304 | 02C4 | E58B | CB5D |
| 0000026200 | 5E8B | 0BF2 | 74DB | FF09 | 0676 | 4FE8 | 8304 | 02C4 |
| 0000026220 | 11E9 | 8BEF | 0C4E | C90B | 0475 | C18B | CEEB | C51E |
| 0000026240 | 0856 | 1E53 | 5152 | 468D | 16F4 | 9A50 | 29BC | 0000 |
| 0000026260 | 071E | 0B1F | 74C0 | 3D17 | 006D | 0D74 | 013D | BA00 |
| 0000026300 | 0009 | BC75 | 1CBA | EB00 | BAB7 | 0020 | B2EB | 468B |
| 0000026320 | 0BF4 | 75C0 | F697 | 2387 | 4001 | 0A74 | DA8B | 8026 |
| 0000026340 | 1A3F | 0275 | 86EB | 1CBA | 3300 | EBC0 | 0093 | D5EA |
| 0000026360 | 6F2A | EA1E | 2AF4 | 2AB1 | C2EA | B62A | EA2A | 2AC2 |
| 0000026400 | 2ABB | 8B55 | 56EC | 76C4 | 8C06 | E3C1 | 2605 | 4C80 |
| 0000026420 | 01FE | 5D5E | 55CB | EC8B | 096A | EBE8 | 8303 | 02C4 |
| 0000026440 | 76FF | 0E06 | 0DE8 | 5B00 | 096A | 05E8 | 8304 | 02C4 |
| 0000026460 | E58B | CB5D | 8B55 | 56EC | 8B57 | 064E | F933 | 77E8 |
| 0000026500 | 1E69 | 70A1 | 0B07 | 74C0 | BF48 | 2BDC | 368B | 0778 |
| 0000026520 | 1EC5 | 0772 | 561E | FF57 | 5FD7 | 735E | 8C2B | C5DA |
| 0000026540 | 0C5F | D63B | EF75 | 1F58 | C41E | 7236 | 2607 | 748B |
| 0000026560 | C512 | 6E1E | 8C07 | 3BDA | 75D0 | 1FD9 | 811E | 58FF |
| 0000026600 | 742C | BF0E | 2C58 | C4EB | 815E | DCFF | 742B | EB0F |
| 0000026620 | 070A | BF06 | 076E | E1E8 | 7201 | E80E | 0D7E | 891F |
| 0000026640 | 7416 | 8907 | 721E | EB07 | 1F04 | C033 | 5F99 | 5D5E |
| 0000026660 | 00CB | 5706 | F88B | FB03 | 7F89 | 4F04 | 2D4F | 0016 |
| 0000026700 | 778D | C714 | FE05 | 89FF | 0A7F | 8948 | 8C04 | 8B1F |
| 0000026720 | 8CC6 | 8EDA | 8DC2 | 067F | ABFC | 47AB | 3347 | ABC0 |
| 0000026740 | ABAB | 5FAB | C307 | 8B26 | 0245 | C00B | 0975 | 8C26 |
| 0000026760 | 025D | 8926 | EB1D | 0614 | C426 | 0875 | 8C26 | 0E5C |
| 0000027000 | 8926 | 0C5C | 478C | 8912 | 1077 | 2607 | 5D8C | 260A |
| 0000027020 | 5D89 | 2608 | 5D8C | 2606 | 5D89 | C304 | 8041 | FEE1 |
| 0000027040 | FC53 | 778B | 8B08 | 0A5F | FF33 | 23EB | C38B | A85B |
| 0000027060 | 7501 | 5342 | 778B | 8B06 | 085F | DE3B | 3674 | 334B |
| 0000027100 | EBFF | 900C | 548D | 3BFE | 73D3 | 03E1 | 72F0 | AD23 |
| 0000027120 | 01A8 | F074 | FE8B | 3B48 | 73C1 | 0323 | 72F0 | 8B13 |
| 0000027140 | ADD0 | 01A8 | DE74 | C203 | 0205 | 8B00 | 89F7 | FE44 |
| 0000027160 | E4EB | C08B | 8B5B | 0647 | 4789 | F908 | 19EB | 895B |
| 0000027200 | FE4C | 0974 | F903 | C12B | 8948 | 2B05 | 03F9 | 89F9 |
| 0000027220 | 087F | C68B | DA8C | C3F8 | 5751 | 47F6 | 0102 | 6674 |
| 0000027240 | B7E8 | 8B00 | 8BFE | A804 | 7401 | 2B03 | 49C8 | 4141 |
| 0000027260 | 778B | 0B04 | 74F6 | 034F | 73CE | 3309 | BAC0 | FFF0 |
| 0000027300 | 33E3 | 42EB | B8B8 | 8E18 | 26C0 | 7CA1 | 3D07 | 2000 |
| 0000027320 | 1674 | 00BA | 3B80 | 72D0 | D106 | 75EA | EBF8 | 8322 |
| 0000027340 | 08FA | 1D72 | E2D1 | C28B | 8B48 | 03D0 | 73C1 | 3302 |
| 0000027360 | F7C0 | 23D2 | 52C2 | 2EE8 | 5A00 | 0D73 | FA83 | 74F0 |
| 0000027400 | B805 | 0010 | E2EB | EBF9 | 8B1B | 2BD0 | 0457 | 4789 |
| 0000027420 | 8904 | 087F | 778B | 4A0A | 1489 | 0342 | C7F2 | FE04 |
| 0000027440 | 89FF | 0A77 | 595F | 8BC3 | F6D0 | 0247 | 7404 | 4A0F |
| 0000027460 | 778B | 4E04 | D63B | 0572 | 5739 | 73FE | 4218 | 1E50 |
| 0000027500 | 0F9A | 0015 | 0B00 | 75C0 | 8B0F | F6C2 | 0247 | 7404 |
| 0000027520 | 4A04 | 5789 | F8FE | 01EB | C3F9 | 8B57 | 0877 | 773B |
| 0000027540 | 750A | 8B03 | 0677 | 3DAD | FFFE | 0874 | FE8B | FE24 |
| 0000027560 | F003 | F2EB | 4F4F | F78B | C35F | D18B | C283 | 8027 |
| 0000027600 | F0E2 | 8B50 | 52C4 | 5016 | C033 | 9A50 | FFFF | 0000 |
| 0000027620 | 0B1F | 75C0 | 3314 | 26DB | 458B | 890C | 0247 | C28B |
| 0000027640 | 0FE8 | E8FE | FE40 | EBF8 | F901 | 00C3 | 8B55 | 8BEC |
| 0000027660 | 8BD7 | 1EDE | 7EC4 | 3306 | B9C0 | FFFF | AEF2 | 758D |
| 0000027700 | C4FF | 0A7E | FFB9 | F2FF | F7AE | 2BD1 | 8CF9 | 8EC0 |
| 0000027720 | 8ED8 | 0846 | FE87 | 468B | F706 | 01C6 | 7400 | A402 |
| 0000027740 | D149 | F3E9 | 13A5 | F3C9 | 8BA4 | 8BF3 | 1FFA | C28C |

THU MAR 14 17:46:58 1991 SYS.DLL PAGE 14, LINE 768

| | | | | | | | | |
|---|---|---|---|---|---|---|---|---|
| 0000027760 | CB5D | 8B55 | 8BEC | 8BD7 | 1EDE | 76C5 | 8B0A | 8CFE |
| 0000030000 | 8ED8 | 33C0 | B9C0 | FFFF | AEF2 | D1F7 | 7EC4 | 8B06 |
| 0000030020 | A8C7 | 7401 | A402 | D149 | F3E9 | 13A5 | F3C9 | 8BA4 |
| 0000030040 | 8BF3 | 1FFA | C28C | CB5D | 8B55 | 8BEC | C4D7 | 067E |
| 0000030060 | C033 | FFB9 | F2FF | F7AE | 49D1 | 8B91 | 5DFA | 00CB |
| 0000030100 | 8B55 | 57EC | 1E56 | 4E8B | E30E | 8B27 | C4D9 | 067E |
| 0000030120 | F78B | C033 | AEF2 | D9F7 | CB03 | FE8B | 76C5 | F30A |
| 0000030140 | 8AA6 | FF44 | C933 | 3A26 | FF45 | 0477 | 0474 | 4949 |
| 0000030160 | D1F7 | C18B | 5E1F | 8B5F | 5DE5 | 00CB | 8B55 | 56EC |
| 0000030200 | B357 | 8B01 | 0C4E | 468B | 3306 | 83D2 | 0AF9 | 0175 |
| 0000030220 | 1E99 | 7EC5 | E908 | 057F | 8B55 | 53EC | 8B51 | 0646 |
| 0000030240 | 568B | 8B08 | 0C5E | FFB9 | D3FF | D3EA | 2BEB | 0A46 |
| 0000030260 | D31B | 5B59 | CA5D | 0008 | 8B55 | 50EC | 468B | 0504 |
| 0000030300 | 0014 | 4BEB | 8B55 | 50EC | 468B | 0504 | 0014 | 69EB |
| 0000030320 | 8B55 | 50EC | 468B | 0504 | 0114 | 33EB | 8B55 | 50EC |
| 0000030340 | 468B | 0504 | 0114 | 51EB | 8B55 | 50EC | 468B | C104 |
| 0000030360 | 02E0 | FF68 | 50FF | FF6A | FF6A | FF9A | 00FF | 0B00 |
| 0000030400 | 75C0 | 5829 | E58B | C35D | 8B55 | 50EC | 468B | FF04 |
| 0000030420 | 9C06 | C107 | 02E0 | B368 | 502E | FF6A | FF6A | FF9A |
| 0000030440 | 00FF | 0B00 | 75C0 | 5805 | E58B | C35D | 11B8 | E900 |
| 0000030460 | E665 | 8B55 | 50EC | 468B | C104 | 02E0 | D768 | 502E |
| 0000030500 | FF9A | 00FF | 0B00 | 75C0 | FFE3 | 9C0E | 5807 | E58B |
| 0000030520 | C35D | 8B55 | FFEC | 0676 | ADE8 | 83FF | 02C4 | E58B |
| 0000030540 | CB5D | 8B55 | FFEC | 0676 | C7E8 | 83FF | 02C4 | E58B |
| 0000030560 | CB5D | 068E | 00E2 | A126 | 0006 | 3B48 | 9E06 | 7707 |
| 0000030600 | C107 | 06E0 | FFBA | C3FF | 5357 | 6A51 | E80F | FF78 |
| 0000030620 | C483 | 3B02 | 9E06 | 7607 | 8B40 | 05D8 | 0004 | FC25 |
| 0000030640 | 8BFF | C1C8 | 06E0 | 45BA | 502F | 9A52 | 2D01 | 0000 |
| 0000030660 | C00B | 3275 | 8B49 | 87F9 | 9E3E | 2B07 | 51CF | C147 |
| 0000030700 | 06E7 | E1C1 | 5705 | C28E | ABF3 | 595F | C726 | 0445 |
| 0000030720 | 0200 | C783 | E240 | 8BF5 | 6AC3 | E80F | FF54 | C483 |
| 0000030740 | 5902 | 5F5B | 9BEB | 10B8 | E900 | E5AB | 8B55 | 56EC |
| 0000030760 | 8B57 | 0C5E | C38B | 462D | 9903 | 0CB9 | F700 | 50F1 |
| 0000031000 | E850 | FEB4 | C483 | 8B02 | 0A56 | D20B | 547E | C44A |
| 0000031020 | 067E | D20B | 5674 | 4F8B | E304 | 3B20 | 76CA | 8B02 |
| 0000031040 | 1ECA | 37C5 | 0AB4 | 9051 | AAAC | C43A | FAE0 | 1F58 |
| 0000031060 | 3789 | 3374 | 4729 | 2B04 | EBD0 | 06D7 | 5253 | 531E |
| 0000031100 | E80E | EB40 | C483 | 5A04 | 075B | FF3D | 74FF | AA08 |
| 0000031120 | 0A3C | 1874 | EB4A | 3BBB | 067E | 0674 | 47F6 | 200A |
| 0000031140 | 0A74 | C033 | EB99 | 2B0E | 29C1 | 0447 | C033 | 8BAA |
| 0000031160 | 0646 | 568B | 5B08 | E853 | FE4A | C483 | 5F02 | 5D5E |
| 0000031200 | 00CB | 04C8 | 0000 | 5657 | 126A | 7BE8 | 83FE | 02C4 |
| 0000031220 | 06C6 | 0952 | 8B42 | 0646 | 568B | A308 | 094E | 1689 |
| 0000031240 | 0950 | 48BE | 8909 | 8904 | 0254 | 06C7 | 094C | 7FFF |
| 0000031260 | 468D | 160E | FF50 | 0C76 | 76FF | 1E0A | 9A56 | 1F7A |
| 0000031300 | 30A3 | C483 | 8B0C | FFF8 | 4C0E | 7809 | C40F | 481E |
| 0000031320 | FF09 | 4806 | 2609 | 07C6 | EB00 | 900D | 561E | 006A |
| 0000031340 | E09A | C01B | 832A | 06C4 | 126A | 45E8 | 83FE | 02C4 |
| 0000031360 | C78B | 5F5E | CBC9 | 8B55 | 6AEC | E809 | FE0A | C483 |
| 0000031400 | FF02 | 0A76 | 76FF | FF08 | 0676 | E80E | 000F | C483 |
| 0000031420 | 6A06 | E809 | FE1C | C483 | 8B02 | 5DE5 | 55CB | EC8B |
| 0000031440 | 5756 | 8B1E | 0656 | F28B | 468B | 8B08 | 0A4E | D00B |
| 0000031460 | 5374 | 59E3 | DF8C | 6EBB | 5107 | 67E8 | 5901 | 5B72 |
| 0000031500 | 74FF | 51FE | 67E8 | 5900 | 0B72 | C68B | DA8C | 6480 |
| 0000031520 | FEFE | EB59 | 1E49 | 8E53 | 51DF | E80E | F9D6 | 5B59 |
| 0000031540 | 591F | E180 | 57FE | F88B | C20B | 7458 | 8E2B | FCC2 |
| 0000031560 | 5706 | 561E | E9D1 | A5F3 | D88E | E80E | F984 | C483 |
| 0000031600 | 5804 | EB5A | 5119 | E80E | F9AA | EB59 | 5011 | 0E56 |
| 0000031620 | 6FE8 | 83F9 | 04C4 | 03EB | 13E8 | 3300 | 99C0 | 5F1F |

THU MAR 14 17:46:58 1991 SYS.DLL PAGE 15, LINE 827

| | | | | | | | | |
|---|---|---|---|---|---|---|---|---|
| 0000031640 | 5D5E | 00CB | B6EA | 8030 | EA30 | 30DD | 3167 | 8B55 |
| 0000031660 | 83EC | 02EC | 5756 | C7FC | FE46 | 0000 | 7441 | 8005 |
| 0000031700 | FEE1 | 01EB | 4E49 | 8B4E | ADFE | 2450 | 89FE | 8B05 |
| 0000031720 | 3BD0 | 73D1 | 0368 | 72F0 | AD5A | 01A8 | 0874 | D003 |
| 0000031740 | 8942 | 4815 | EBEB | FE3D | 75FF | F641 | 0247 | 7401 |
| 0000031760 | 8D3B | 0445 | C103 | 0773 | 46C7 | 01FE | 2B00 | FFC8 |
| 0000032000 | 3B05 | 087F | 0373 | 7F89 | 5208 | E856 | FA8A | 5A5E |
| 0000032020 | 1173 | 46C7 | 01FE | 8300 | 10F9 | 1072 | E9D1 | D183 |
| 0000032040 | EB00 | FFE6 | 8D0D | 0275 | C28B | A5EB | 01B8 | 4E00 |
| 0000032060 | EB4E | 5A23 | EBF9 | 4639 | 0346 | EBF1 | 8B19 | FE46 |
| 0000032100 | F78B | F374 | C00B | 0E75 | 0D89 | 4646 | F103 | E372 |
| 0000032120 | D12B | 894A | 4A14 | 9159 | 0125 | 8300 | FE25 | 0509 |
| 0000032140 | 578B | 3B08 | 73FA | 3B07 | 76F2 | 8903 | 087F | D9F7 |
| 0000032160 | 5E5F | E58B | C35D | 8B55 | 57EC | 468B | F706 | 0866 |
| 0000032200 | 0573 | C033 | EB99 | 501A | AE9A | 6C2A | 5931 | D88B |
| 0000032220 | DA0B | 0D74 | 8B50 | 8EF8 | 33C2 | 41C0 | E9D1 | ABF3 |
| 0000032240 | 5F58 | CB5D | 473B | 7506 | C505 | 045F | 19EB | 531E |
| 0000032260 | 1FC5 | 08EB | 1F5B | EBF9 | C50F | 0C5F | D98C | F4E3 |
| 0000032300 | C13B | F575 | C483 | F804 | 00C3 | 8B55 | 57EC | 7EC4 |
| 0000032320 | 8B06 | 33DF | B9C0 | FFFF | AEF2 | F741 | 8AD9 | 0A46 |
| 0000032340 | FB8B | AEF2 | 264F | 0538 | 0474 | FF33 | C78E | C78B |
| 0000032360 | C28C | 8B5F | 5DE5 | 00CB | 8B55 | 8BEC | 0E4E | 571E |
| 0000032400 | 0B56 | 75C9 | E903 | 00AF | 76C5 | C40A | 067E | 561E |
| 0000032420 | 5706 | 589A | 4B2E | 8B32 | 0E4E | D20B | 5778 | C12B |
| 0000032440 | DA83 | 7300 | 4950 | F103 | 0773 | D88C | FF05 | 8EFF |
| 0000032460 | 03D8 | 73F9 | 8C07 | 05C0 | 32ED | C08E | 8B41 | 48C1 |
| 0000032500 | C72B | DB1B | C323 | C703 | C62B | DB1B | C323 | C603 |
| 0000032520 | 9140 | C12B | F3FD | FCA4 | E391 | 835C | FFFE | 0775 |
| 0000032540 | D88C | F82D | 8E32 | 83D8 | FFFF | D175 | C08C | 232D |
| 0000032560 | 8E33 | EBC0 | 8BC8 | 48C1 | D78B | D2F7 | C22B | DB1B |
| 0000032600 | C323 | C203 | D68B | D2F7 | C22B | DB1B | C323 | C203 |
| 0000032620 | 9140 | C12B | E9D1 | A5F3 | C913 | A4F3 | E391 | 0B18 |
| 0000032640 | 75F6 | 8C07 | 05D8 | 332F | D88E | FF0B | C775 | C08C |
| 0000032660 | 6605 | 8E33 | EBC0 | 8BBE | 0646 | 568B | 5E08 | 1F5F |
| 0000032700 | CB5D | 8B55 | 8BEC | 0C4E | 38E3 | C457 | 067E | D78B |
| 0000032720 | DAF7 | 0C74 | D12B | DB1B | D323 | D103 | D187 | D12B |
| 0000032740 | 468B | 8A0A | D1E0 | F3E9 | 13AB | F3C9 | 87AA | E3D1 |
| 0000032760 | 8C10 | 81C3 | 71C3 | 8E33 | D1C3 | F3E9 | 13AB | F3C9 |
| 0000033000 | 5FAA | 468B | 8B06 | 0856 | CB5D | 4E8B | 8B0E | 0646 |
| 0000033020 | 568B | 1E08 | 7EC5 | 570A | 071E | 93FC | C00A | 1374 |
| 0000033040 | F983 | 750A | 0B0E | 79D2 | B00A | AA2D | DBF7 | D283 |
| 0000033060 | F700 | 8BDA | 92F7 | D233 | C00B | 0274 | F1F7 | F793 |
| 0000033100 | 92F1 | D387 | 3004 | 393C | 0276 | 2704 | 8BAA | 0BC2 |
| 0000033120 | 75C3 | 88E2 | 4F05 | 86AC | 8805 | FF44 | 448D | 3B01 |
| 0000033140 | 72C7 | 8CF2 | 58DA | 5F1F | 8B5E | 5DE5 | 00CB | 8B55 |
| 0000033160 | FFEC | 0876 | 76FF | 3306 | 50C0 | 9A50 | FFFF | 0000 |
| 0000033200 | C085 | 0374 | 36E9 | 8BE5 | 5DE5 | 45CB | 0200 | D500 |
| 0000033220 | 0132 | 0000 | 0300 | 4A02 | 0313 | 7000 | 0200 | 6700 |
| 0000033240 | 022F | 0000 | 0200 | FD00 | 032E | 0000 | 0300 | CE01 |
| 0000033260 | 0116 | 0500 | 0300 | 6601 | 0116 | 0700 | 0300 | F201 |
| 0000033300 | 0114 | 0800 | 0300 | 7D01 | 0128 | 8900 | 0300 | 6C01 |
| 0000033320 | 012A | 8A00 | 0200 | 8500 | 052C | 0000 | 0300 | DF01 |
| 0000033340 | 012E | 8C00 | 0300 | AC02 | 030F | 7D00 | 0300 | 0101 |
| 0000033360 | 012F | 8D00 | 0300 | F601 | 040C | F600 | 0300 | BB01 |
| 0000033400 | 012E | 8E00 | 0300 | FE01 | 040D | F700 | 0300 | E801 |
| 0000033420 | 030F | 0700 | 0300 | 5302 | 0313 | 8900 | 0300 | 3001 |
| 0000033440 | 040D | 0300 | 0300 | 3701 | 0310 | 0D00 | 0300 | E401 |
| 0000033460 | 040D | 0700 | 0500 | 6701 | 012E | 8700 | 0500 | B501 |
| 0000033500 | 0133 | 8800 | 0300 | 4C01 | 012D | 2200 | 0300 | BE01 |

```
THU MAR 14 17:46:58 1991  SYS.DLL  PAGE 16, LINE 886

0000033520  0405  0B00  0300  6401  040D  8C00  0300  CC02
0000033540  030F  9600  0300  6C01  012F  2600  0300  9001
0000033560  050F  0700  0300  7E01  040D  1000  0300  6001
0000033600  0513  0A00  0300  5301  0410  1300  0500  1900
0000033620  0103  9600  0304  1501  0513  1000  0300  9601
0000033640  0414  9800  0300  F201  0407  9900  0300  4901
0000033660  0410  1900  0300  9002  020A  2D00  0300  1701
0000033700  0129  3A00  0300  2701  0313  2B00  0300  8C02
0000033720  0311  AB00  0300  3701  0126  3B00  0300  3C01
0000033740  0134  3C00  0300  D901  0504  9F00  0300  5B01
0000033760  040F  2900  0300  B901  0404  2B00  0300  C002
0000034000  020E  3C00  0300  FF01  0404  2C00  0500  2700
0000034020  010D  2C00  030F  FB01  0126  4400  0300  0801
0000034040  0413  2D00  0300  3401  0413  2E00  0300  E301
0000034060  0610  1E00  0300  0E01  0126  4600  0500  5F02
0000034100  020E  1100  0300  C301  0413  B200  0300  2F01
0000034120  0127  4B00  0300  1801  0408  3500  0300  5701
0000034140  0126  4D00  0300  0C01  040D  3A00  0300  F101
0000034160  040D  3B00  0300  4802  020A  4C00  0300  7201
0000034200  0411  3D00  0300  7E01  0509  B500  0500  7702
0000034220  020E  1F00  0300  BA01  040D  4100  0300  4301
0000034240  0115  5B00  0300  D401  040D  4400  0300  9501
0000034260  040D  5B00  0000  0000  0000  0000  0000  0000
0000034300  0000  0000  0200  0000  0000  0000  0000  0000
0000034320  0000  0000  0000  0000  0000  0000  0000  0000
*
0000034400  0000  0000  0200  0000  0000  0000  0000  0000
0000034420  0000  0000  0000  0000  0000  0000  0000  0000
*
0000034500  0000  0000  0200  0000  0000  0000  0000  0000
0000034520  0000  0000  0000  0000  0000  0000  0000  0000
*
0000034600  0000  0000  0200  0000  0000  0000  0000  0000
0000034620  0000  0000  0000  0000  534D  5220  6E75  542D
0000034640  6D69  2065  694C  7262  7261  2079  202D  6F43
0000034660  7970  6972  6867  2074  6328  2029  3931  3039
0000034700  202C  694D  7263  736F  666F  2074  6F43  7072
0000034720  0018  5F73  7067  7769  6E69  632E  7300  7379
0000034740  702E  4700  455F  5F57  0054  5F47  5745  545F
0000034760  7200  5400  7478  6957  006E  7325  2820  2520
0000035000  2073  0029  7854  5774  6E69  0000  0042  0082
0000035020  004D  FFFF  5F73  7067  7769  6E69  0000  5F73
0000035040  6976  776F  6E69  632E  7300  7379  702E  4700
0000035060  455F  5F57  0054  5F47  5745  545F  7200  5400
0000035100  7478  6957  006E  7854  5774  6E69  0000  008E
0000035120  00C4  0099  007E  0000  0000  0000  0000  5F73
0000035140  6976  776F  6E69  0000  0020  0000  0000  0000
0000035160  0006  0000  0960  095F  0000  0005  0000  0000
0000035200  0000  0000  0000  0000  0000  0000  435F  465F
0000035220  4C49  5F45  4E49  4F46  003D  0001  FFFF  0000
0000035240  0000  0000  0000  0000  0000  0000  0000  0000
0000035260  0001  8101  8181  0000  0000  0000  0000  0000
0000035300  0000  0000  0000  0000  0000  0000  0000  0000
*
0000035660  0000  0A00  0A0A  0A0A  0A0A  0A0A  0A0A  0A0A
0000035700  0A0A  0A0A  0A0A  0A0A  0A0A  0A0A  0A0A  0A0A
*
0000036260  0A0A  000A  0000  0000  0000  0000  0000  0000
0000036300  0000  0000  FF00  00FF  0000  0000  FFFF  FFFF
```

THU MAR 14 17:46:58 1991 SYS.DLL PAGE 17, LINE 945

```
0000036320  005C  005C  0000  0000  034E  0000  0000  FFFF
0000036340  0001  0000  0000  0000  0000  0000  0102  0000
0000036360  0000  0000  0000  0000  0202  0000  0000  0000
0000036400  0000  0000  0000  0000  0000  0000  0000  0000
*
0000037260  0000  0000  0000  0001  0200  0000  0000  0000
0000037300  0000  0000  0000  0000  0000  0000  0000  0000
*
0000040220  0000  0000  0000  051A  00C0  0006  0600  0100
0000040240  0000  0010  0603  0600  1002  4504  4545  0505
0000040260  0505  3505  0030  0050  0000  2000  3020  5850
0000040300  0807  3000  3030  5057  0007  2000  0020  0000
0000040320  0000  6008  6060  6060  0060  7000  7870  7878
0000040340  0878  0807  0000  0007  0808  0008  0800  0800
0000040360  0000  2808  756E  6C6C  0629  0000  0000  0000
0000040400  0000  0000  0000  0000  0000  0003  2000  178A
0000040420  07B0  178A  0780  178A  0784  178A  0788  178A
0000040440  078C  178A  0790  0000  0000  0101  0000  0003
0000040460  0000  0000  0000  0000  0000  0000  0000  1EEE
0000040500  FFFF  FFFF  FFFF  07B2  07B4  3C3C  4D4E  4753
0000040520  3E3E  0000  3652  3030  0D30  2D0A  7320  6174
0000040540  6B63  6F20  6576  6672  6F6C  0D77  000A  0003
0000040560  3652  3030  0D33  2D0A  6920  746E  6765  7265
0000040600  6420  7669  6469  2065  7962  3020  0A0D  0800
0000040620  5200  3036  3830  0A0D  202D  6F6E  2074  6E65
0000040640  756F  6867  7320  6170  6563  6620  726F  6120
0000040660  6772  6D75  6E65  7374  0A0D  0900  5200  3036
0000040700  3930  0A0D  202D  6F6E  2074  6E65  756F  6867
0000040720  7320  6170  6563  6620  726F  6520  766E  7269
0000040740  6E6F  656D  746E  0A0D  FC00  0D00  000A  00FF
0000040760  7572  2D6E  6974  656D  6520  7272  726F  0020
0000041000  0002  3652  3030  0D32  2D0A  6620  6F6C  7461
0000041020  6E69  2D67  6F70  6E69  2074  7573  7070  726F
0000041040  2074  6F6E  2074  6F6C  6461  6465  0A0D  1100
0000041060  5200  3036  3731  0A0D  202D  6E75  7865  6570
0000041100  7463  6465  6D20  6C75  6974  6874  6572  6461
0000041120  6C20  636F  206B  7265  6F72  0D72  000A  0010
0000041140  3652  3130  0D36  2D0A  6E20  746F  6520  6F6E
0000041160  6775  2068  7073  6361  2065  6F66  2072  6874
0000041200  6572  6461  6420  7461  0D61  000A  FFFF  05FF
0000041220  0200  9400  0107  0000  0200  4800  0403  0000
0000041240  0200  0800  0507  0000  0200  B602  0207  1100
0000041260  0200  B802  0207  1F00  4E00  3042  B132  0049
0000041300  0100  0000  0000  000A  0000  0100  1E00  745C
0000041320  3231  5C33  7061  5C70  7973  5C73  626F  5C6A
0000041340  5F73  7067  7769  6E69  6F2E  6A62  0001  0A00
0000041360  0AD6  0000  0000  0001  5C1E  3174  3332  615C
0000041400  7070  735C  7379  6F5C  6A62  735C  765F  6F69
0000041420  6977  2E6E  626F  016A  E600  D114  0000  0100
0000041440  0100  0B00  6C64  5C6C  7363  2E75  7361  016D
0000041460  B800  AF15  0001  0100  0100  0E00  6C64  5C6C
0000041500  7363  6475  7461  612E  6D73  0001  1768  0022
0000041520  0000  0001  0001  6F0F  3273  635C  7472  6D30
0000041540  6773  612E  6D73  0001  178A  0006  0000  0001
0000041560  0001  630A  7472  6630  2E70  7361  016D  9000
0000041600  1A17  0000  0100  0100  0A00  6863  736B  6B74
0000041620  612E  6D73  0001  17AA  0108  0000  0001  0001
0000041640  640D  6C6C  735C  7465  6E65  7076  632E  0001
0000041660  18B2  0065  0000  0001  0001  6F0F  3273  6E5C
```

THU MAR 14 17:46:58 1991 SYS.DLL PAGE 18, LINE 1004

| | | | | | | | | |
|---|---|---|---|---|---|---|---|---|
| 0000041700 | 736D | 6867 | 7264 | 612E | 6D73 | 0001 | 1918 | 00C0 |
| 0000041720 | 0000 | 0001 | 0001 | 6F0E | 3273 | 645C | 736F | 6572 |
| 0000041740 | 2E74 | 7361 | 016D | D800 | 0219 | 0001 | 0100 | 0100 |
| 0000041760 | 0800 | 6366 | 6F6C | 6573 | 632E | 0001 | IADA | 006A |
| 0000042000 | 0000 | 0001 | 0001 | 6607 | 706F | 6E65 | 632E | 0000 |
| 0000042020 | 0000 | 0000 | 0000 | 0001 | 0000 | 5F0B | 6663 | 756C |
| 0000042040 | 6873 | 612E | 6D73 | 0000 | 0000 | 0000 | 0000 | 0001 |
| 0000042060 | 0000 | 5F07 | 6966 | 656C | 632E | 0001 | 1B44 | 009C |
| 0000042100 | 0000 | 0001 | 0001 | 5F0B | 6966 | 626C | 6675 | 612F |
| 0000042120 | 6D73 | 0001 | 1BE0 | 00E5 | 0000 | 0001 | 0001 | 5F0B |
| 0000042140 | 6C66 | 6273 | 6675 | 612E | 6D73 | 0001 | 1CC6 | 0037 |
| 0000042160 | 0000 | 0001 | 0001 | 5F0C | 7266 | 6565 | 7562 | 2E66 |
| 0000042200 | 7361 | 016D | FE00 | 4B1C | 0000 | 0100 | 0100 | 0B00 |
| 0000042220 | 675F | 7465 | 7562 | 2E66 | 7361 | 016D | 4A00 | F21D |
| 0000042240 | 0000 | 0100 | 0100 | 0700 | 6F5F | 6570 | 2E6E | 0163 |
| 0000042260 | 3C00 | 2E1E | 0001 | 0100 | 0100 | 0800 | 6666 | 756C |
| 0000042300 | 6873 | 632E | 0001 | 1F6A | 04FA | 0000 | 0001 | 0001 |
| 0000042320 | 6F0A | 7475 | 7570 | 2E74 | 7361 | 016D | 6400 | 7824 |
| 0000042340 | 0000 | 0100 | 0100 | 0800 | 7473 | 6572 | 6D61 | 632E |
| 0000042360 | 0001 | 24DC | 003F | 0000 | 0001 | 0001 | 6F0D | 3273 |
| 0000042400 | 635C | 6F6C | 6573 | 612E | 6D73 | 0001 | 251C | 0077 |
| 0000042420 | 0000 | 0001 | 0001 | 6F0D | 3273 | 6C5C | 6573 | 6B65 |
| 0000042440 | 612E | 6D73 | 0001 | 2594 | 01DD | 0000 | 0001 | 0001 |
| 0000042460 | 6F0C | 3273 | 6F5C | 6570 | 2E6E | 7361 | 016D | 7200 |
| 0000042500 | 5D27 | 0001 | 0100 | 0100 | 0C00 | 736F | 5C32 | 6572 |
| 0000042520 | 6461 | 612E | 6D73 | 0001 | 28D0 | 01DD | 0000 | 0001 |
| 0000042540 | 0001 | 7709 | 6972 | 6574 | 612E | 6D73 | 0000 | 0000 |
| 0000042560 | 0000 | 0000 | 0001 | 0000 | 740B | 7478 | 6F6D | 6564 |
| 0000042600 | 612E | 6D73 | 0001 | 2AAE | 000A | 0000 | 0001 | 0001 |
| 0000042620 | 6D0A | 6C61 | 6F6C | 2E63 | 7361 | 016D | B800 | 0A2A |
| 0000042640 | 0000 | 0100 | 0100 | 0800 | 7266 | 6565 | 612E | 6D73 |
| 0000042660 | 0001 | 2AC2 | 00AF | 0000 | 0001 | 0001 | 660B | 616D |
| 0000042700 | 6C6C | 636F | 612E | 6D73 | 0000 | 0000 | 0000 | 0000 |
| 0000042720 | 0001 | 0000 | 6609 | 6164 | 6174 | 612E | 6D73 | 0001 |
| 0000042740 | 2B72 | 0034 | 0000 | 0001 | 0001 | 690B | 696E | 7374 |
| 0000042760 | 6765 | 612E | 6D73 | 0001 | 2BA6 | 0036 | 0000 | 0001 |
| 0000043000 | 0001 | 6C0B | 6E69 | 736B | 6765 | 612E | 6D73 | 0001 |
| 0000043020 | 2BDC | 007C | 0000 | 0001 | 0001 | 730C | 6165 | 6372 |
| 0000043040 | 7368 | 2E67 | 7361 | 016D | 5800 | E22C | 0000 | 0100 |
| 0000043060 | 0100 | 0B00 | 7267 | 776F | 6573 | 2E67 | 7361 | 016D |
| 0000043100 | 3A00 | 312D | 0000 | 0100 | 0100 | 0A00 | 656E | 7377 |
| 0000043120 | 6765 | 612E | 6D73 | 0001 | 2D6C | 0046 | 0000 | 0001 |
| 0000043140 | 0001 | 730A | 7274 | 6163 | 2E74 | 7361 | 016D | B200 |
| 0000043160 | 362D | 0000 | 0100 | 0100 | 0A00 | 7473 | 6372 | 7970 |
| 0000043200 | 612E | 6D73 | 0001 | 2DE8 | 0017 | 0000 | 0001 | 0001 |
| 0000043220 | 730A | 7274 | 656C | 2E6E | 7361 | 016D | 0000 | 3B2E |
| 0000043240 | 0000 | 0100 | 0100 | 0B00 | 7473 | 6E72 | 6D63 | 2E70 |
| 0000043260 | 7361 | 016D | 3C00 | 1C2E | 0000 | 0100 | 0100 | 0800 |
| 0000043300 | 7469 | 616F | 612E | 6D73 | 0000 | 0000 | 0000 | 0000 |
| 0000043320 | 0001 | 0000 | 630C | 696D | 6373 | 6164 | 2E74 | 7361 |
| 0000043340 | 016D | 5800 | 202E | 0000 | 0100 | 0100 | 0D00 | 736F |
| 0000043360 | 5C32 | 6468 | 6669 | 2E66 | 7361 | 016D | 7800 | BA2E |
| 0000043400 | 0000 | 0100 | 0100 | 0D00 | 736F | 5C32 | 6C6D | 636F |
| 0000043420 | 2E6B | 7361 | 016D | 3200 | 7A2F | 0000 | 0100 | 0100 |
| 0000043440 | 1000 | 6C64 | 5C6C | 6974 | 7464 | 6261 | 656C | 612E |
| 0000043460 | 6D73 | 0001 | 2FAC | 0095 | 0000 | 0001 | 0001 | 6609 |
| 0000043500 | 6567 | 7374 | 612E | 6D73 | 0001 | 3042 | [illegible] | 0000 |
| 0000043520 | 0001 | 0001 | 7309 | 7270 | 6E69 | 6674 | [illegible] | 0001 |
| 0000043540 | 30B6 | 00AD | 0000 | 0001 | 0001 | 660C | [illegible] | 6C61 |

THU MAR 14 17:46:58 1991 SYS.DLL PAGE 19, LINE 1063

| | | | | | | | | |
|---|---|---|---|---|---|---|---|---|
| 0000043560 | 6F6C | 2E63 | 7361 | 016D | 6400 | 0A31 | 0000 | 0100 |
| 0000043600 | 0100 | 0B00 | 6572 | 6C61 | 6F6C | 2E63 | 7361 | 016D |
| 0000043620 | 6E00 | C831 | 0000 | 0100 | 0100 | 0A00 | 6572 | 6973 |
| 0000043640 | 657A | 612E | 6D73 | 0001 | 3236 | 002E | 0000 | 0001 |
| 0000043660 | 0001 | 630A | 6C61 | 6F6C | 2E63 | 7361 | 016D | 6400 |
| 0000043700 | 2532 | 0000 | 0100 | 0100 | 0B00 | 6966 | 646E | 6573 |
| 0000043720 | 2E67 | 7361 | 016D | 8A00 | 2D32 | 0000 | 0100 | 0100 |
| 0000043740 | 0A00 | 7473 | 6372 | 7268 | 612E | 6D73 | 0001 | 32B8 |
| 0000043760 | 00CA | 0000 | 0001 | 0001 | 680B | 656D | 636D | 7970 |
| 0000044000 | 612E | 6D73 | 0001 | 3382 | 0048 | 0000 | 0001 | 0001 |
| 0000044020 | 680B | 656D | 736D | 7465 | 612E | 6D73 | 0001 | 33CA |
| 0000044040 | 0063 | 0000 | 0001 | 0001 | 7808 | 6F74 | 2E61 | 7361 |
| 0000044060 | 016D | 2E00 | 1D34 | 0000 | 0100 | 0100 | 0E00 | 736F |
| 0000044100 | 5C32 | 6E75 | 696C | 6B6E | 612E | 6D73 | 0000 | 0001 |
| 0000044120 | 06A0 | 5308 | 475F | 4950 | 4957 | 964E | 0104 | AA00 |
| 0000044140 | 0A06 | 5047 | 5749 | 4E49 | 5250 | 434F | 0A00 | 0001 |
| 0000044160 | 0712 | 5308 | 565F | 4F49 | 4957 | E44E | 010E | 1900 |
| 0000044200 | 0A07 | 5F53 | 4956 | 5F4F | 4554 | 4D52 | 0F2C | 0001 |
| 0000044220 | 071B | 560A | 4F49 | 4957 | 504E | 4F52 | 0043 | 0509 |
| 0000044240 | 0000 | 0600 | 655F | 6164 | 6174 | 0960 | 0005 | 0000 |
| 0000044260 | 5F04 | 6E65 | E664 | 0114 | 0000 | 0600 | 5F43 | 4E49 |
| 0000044300 | 5449 | 00E8 | 0005 | 0000 | 5F0C | 6E5F | 6568 | 7061 |
| 0000044320 | 645F | 7365 | 6063 | 0509 | 0000 | 0C00 | 735F | 6174 |
| 0000044340 | 6B63 | 6F62 | 7474 | 6D6F | 010E | 0005 | 0000 | 5F0C |
| 0000044360 | 5F5F | 4461 | 7342 | 7077 | 6C66 | DA67 | 0500 | 0000 |
| 0000044400 | 0800 | 5F5F | 6361 | 646D | 6E6C | 010C | 0005 | 0000 |
| 0000044420 | 5F08 | 615F | 6573 | 6867 | 0A69 | 0501 | 0000 | 0800 |
| 0000044440 | 5F5F | 7361 | 6765 | 6F6C | 00E6 | 0005 | 0000 | 5F08 |
| 0000044460 | 615F | 6973 | 647A | E473 | 0500 | 0000 | 0800 | 5F5F |
| 0000044500 | 7461 | 706F | 7073 | 00FC | 0005 | 0000 | 5F09 | 615F |
| 0000044520 | 6663 | 6E69 | 6F66 | D6D6 | 0000 | 0001 | 5F09 | 615F |
| 0000044540 | 4244 | 7375 | 6465 | 00DC | 0005 | 0000 | 5F09 | 615F |
| 0000044560 | 6E65 | 7376 | 6765 | 00E0 | 0005 | 0000 | 5F0A | 745F |
| 0000044600 | 7268 | 6165 | 6964 | DE64 | 0500 | 0000 | 0A00 | 5F5F |
| 0000044620 | 6967 | 666E | 736F | 6765 | D6D6 | 0000 | 0001 | 5F0A |
| 0000044640 | 615F | 4244 | [illegible] | 7773 | E270 | 0500 | 0000 | 0A00 |
| 0000044660 | 5F5F | 696C | 666E | 736F | 6765 | 9876 | 0000 | 0001 |
| 0000044700 | 5F0A | 615F | 7263 | 7574 | 6573 | 1064 | 0501 | 0000 |
| 0000044720 | 0B00 | 5F5F | 615F | 4244 | 7472 | 7265 | 5772 | 0115 |
| 0000044740 | 0000 | 0B00 | 5F5F | 6D61 | 6773 | 655F | 6978 | 1E74 |
| 0000044760 | 0501 | 0000 | 0B00 | 5F5F | 736F | 6576 | 7372 | 6F69 |
| 0000045000 | 716E | 0116 | 0000 | 0600 | 5F5F | 7865 | 7469 | 1723 |
| 0000045020 | 0001 | 0000 | 5F0C | 755F | 6C6E | 636F | 656B | 6978 |
| 0000045040 | 3174 | 0503 | 0000 | 0700 | 5F5F | 6863 | 6C69 | 2164 |
| 0000045060 | 0501 | 0000 | 0700 | 5F5F | 666E | 6C69 | B865 | 0115 |
| 0000045100 | 0000 | 0700 | 5F5F | 6963 | 696E | 2374 | 0503 | 0000 |
| 0000045120 | 0700 | 5F5F | 615F | 6772 | 7963 | 0116 | 0000 | 0700 |
| 0000045140 | 5F5F | 6563 | 6978 | 1E74 | 0501 | 0000 | 0D00 | 5F5F |
| 0000045160 | 6F64 | 7673 | 7265 | 616D | 6F6A | 2572 | 0503 | 0000 |
| 0000045200 | 0700 | 5F5F | 615F | 6772 | 1F76 | 0501 | 0000 | 0D00 |
| 0000045220 | 5F5F | 6F64 | 7673 | 7265 | 696D | 6F6E | 2372 | 0502 |
| 0000045240 | 0000 | 0800 | 5F5F | 6970 | 6570 | 6863 | 0329 | 0005 |
| 0000045260 | 0000 | 5F08 | 6E65 | 6976 | 6F72 | 236E | 0501 | 0000 |
| 0000045300 | 0800 | 5F5F | 736F | 6966 | 656C | 0120 | 0005 | 0000 |
| 0000045320 | 5F08 | 6F5F | 6D73 | 646F | 1265 | 0116 | 0000 | 0800 |
| 0000045340 | 5F5F | 6E69 | 7469 | 7066 | 07A2 | 0005 | 0000 | 5F08 |
| 0000045360 | 665F | 6970 | 696E | 4674 | 0117 | 0000 | 0800 | 5F5F |
| 0000045400 | 6574 | 6D72 | 7066 | 032D | 0005 | 0000 | 5F08 | 705F |
| 0000045420 | 6D67 | 7470 | 8372 | 0116 | 0000 | 0800 | 5F5F | 5F63 |

THU MAR 14 17:46:58 1991 SYS.DLL PAGE 20, LINE 1122

| | | | | | | | | |
|---|---|---|---|---|---|---|---|---|
| 0000045440 | 7865 | 7469 | 0120 | 0005 | 0000 | 5F09 | 645F | 736F |
| 0000045460 | 6F6D | 6564 | 011E | 0005 | 0000 | 5F09 | 6F5F | 6D73 |
| 0000045500 | 6A61 | 726F | 011F | 0005 | 0000 | 5F09 | 6F5F | 6D73 |
| 0000045520 | 6E69 | 726F | 0333 | 0005 | 0000 | 5F0A | 655F | 6978 |
| 0000045540 | 6474 | 6E6F | D965 | 0116 | 0000 | 0A00 | 5F5F | 6F6C |
| 0000045560 | 6B63 | 7865 | 7469 | 011C | 0005 | 0000 | 5F0A | 755F |
| 0000045600 | 616D | 6B73 | 6176 | 466C | 0117 | 0000 | 0A00 | 5F5F |
| 0000045620 | 7463 | 7265 | 736D | 6275 | 0335 | 0005 | 0000 | 5F0A |
| 0000045640 | 655F | 6978 | 5F74 | 6974 | 1264 | 0501 | 0000 | 0500 |
| 0000045660 | 5F5F | 6166 | 6A63 | 0116 | 0000 | 0500 | 655F | 6978 |
| 0000045700 | 6874 | 0117 | 0000 | 0E00 | 5F5F | 4646 | 4D5F | 4753 |
| 0000045720 | 4142 | 4E4E | 5245 | 0338 | 0005 | 0000 | 5F09 | 615F |
| 0000045740 | 6264 | 6D67 | 6773 | 9876 | 0000 | 0001 | 5F09 | 615F |
| 0000045760 | 7263 | 6D74 | 6773 | 178A | 0001 | 0000 | 5F08 | 665F |
| 0000046000 | 7470 | 6172 | 3C70 | 0503 | 0000 | 0C00 | 5F5F | 6161 |
| 0000046020 | 746C | 7473 | 6F6B | 7276 | 1790 | 0001 | 0000 | 5F08 |
| 0000046040 | 635F | 6B68 | 7473 | 906B | 0117 | 0000 | 0A00 | 5F5F |
| 0000046060 | 4661 | 6863 | 736B | 6B74 | 17AA | 0001 | 0000 | 5F09 |
| 0000046100 | 735F | 7465 | 6E65 | 7076 | 18B2 | 0001 | 0000 | 5F0B |
| 0000046120 | 4E5F | 534D | 5F47 | 4554 | 5458 | 18E2 | 0001 | 0000 |
| 0000046140 | 5F0C | 4E5F | 534D | 5F47 | 5257 | 5449 | C445 | 0119 |
| 0000046160 | 0000 | 0B00 | 5F5F | 645F | 736F | 7265 | 6E72 | CC6F |
| 0000046200 | 0119 | 0000 | 0700 | 5F5F | 7265 | 6E72 | 7D6F | 0119 |
| 0000046220 | 0000 | 0800 | 5F5F | 6F64 | 7273 | 7465 | 1964 | 0001 |
| 0000046240 | 0000 | 5F09 | 645F | 736F | 6572 | 6674 | 1A24 | 0001 |
| 0000046260 | 0000 | 5F0B | 665F | 6C63 | 736F | 5F65 | 6B6C | 19D8 |
| 0000046300 | 0001 | 0000 | 5F07 | 6366 | 6F6C | 6573 | 1ADA | 0001 |
| 0000046320 | 0000 | 5F08 | 665F | 6F73 | 6570 | 2C6E | 011B | 0000 |
| 0000046340 | 0600 | 665F | 706F | 6E65 | 0344 | 0005 | 0000 | 5F08 |
| 0000046360 | 635F | 6C66 | 7375 | 0068 | 0400 | 0000 | 0700 | 5F5F |
| 0000046400 | 7562 | 6966 | 466E | 0503 | 0000 | 0500 | 5F5F | 6F69 |
| 0000046420 | 2662 | 0505 | 0000 | 0600 | 5F5F | 6F69 | 3262 | 0706 |
| 0000046440 | 0005 | 0000 | 5F09 | 6C5F | 7361 | 6974 | 626F | 1B44 |
| 0000046460 | 0001 | 0000 | 5F08 | 665F | 6C69 | 7562 | E066 | 011B |
| 0000046500 | 0000 | 0800 | 5F5F | 6C66 | 6273 | 6675 | 1CC6 | 0001 |
| 0000046520 | 0000 | 5F09 | 665F | 6572 | 6265 | 6675 | 1CFE | 0001 |
| 0000046540 | 0000 | 5F08 | 675F | 7465 | 7562 | 4A66 | 011D | 0000 |
| 0000046560 | 0A00 | 5F5F | 706F | 6E65 | 6966 | 656C | 1E82 | 0001 |
| 0000046600 | 0000 | 5F0B | 665F | 6C66 | 7375 | 5F68 | 6B6C | 1E3C |
| 0000046620 | 0001 | 0000 | 5F07 | 6666 | 756C | 6873 | 1EEE | 0001 |
| 0000046640 | 0000 | 5F09 | 6C66 | 7375 | 6168 | 6C6C | 1F7A | 0001 |
| 0000046660 | 0000 | 5F08 | 6F5F | 7475 | 7570 | 6474 | 0124 | 0000 |
| 0000046700 | 0B00 | 5F5F | 6567 | 7374 | 7274 | 6165 | DC6D | 0124 |
| 0000046720 | 0000 | 0600 | 635F | 6F6C | 6573 | 2526 | 0001 | 0000 |
| 0000046740 | 5F06 | 736C | 6565 | 1C6B | 0125 | 0000 | 0A00 | 5F5F |
| 0000046760 | 736C | 6565 | 5F6B | 6B6C | 2594 | 0001 | 0000 | 5F06 |
| 0000047000 | 6F73 | 6570 | A56E | 0125 | 0000 | 0500 | 6F5F | 6570 |
| 0000047020 | 606E | 0127 | 0000 | 1100 | 5F5F | 5863 | 4E45 | 5849 |
| 0000047040 | 6F74 | 4F44 | 6D53 | 646F | 7265 | 0127 | 0000 | 0500 |
| 0000047060 | 725F | 6165 | DA64 | 0128 | 0000 | 0600 | 775F | 6972 |
| 0000047100 | 6574 | 28D0 | 0001 | 0000 | 5F0A | 775F | 6972 | 6574 |
| 0000047120 | 6C5F | 6C6B | 0507 | 0000 | 0700 | 5F5F | 6D66 | 646F |
| 0000047140 | 6C65 | 0507 | 0000 | 0800 | 5F5F | 6F69 | 6F6D | 6564 |
| 0000047160 | 2AAE | 0001 | 0000 | 5F07 | 616D | 6C6C | 636F | 2AB3 |
| 0000047200 | 0001 | 0000 | 5F0A | 616D | 6C6C | 636F | 6C5F | BD6B |
| 0000047220 | 012A | 0000 | 0800 | 665F | 6572 | 5F65 | 6B6C | 2AB8 |
| 0000047240 | 0001 | 0000 | 5F05 | 7266 | 6565 | 2AF4 | 0001 | 0000 |
| 0000047260 | 5F0C | 665F | 616D | 6C6C | 636F | 6C5F | C26B | 012A |
| 0000047300 | 0000 | 0700 | 5F5F | 6666 | 6572 | D565 | 012A | 0000 |

THU MAR 14 17:46:58 1991 SYS.DLL PAGE 21, LINE 1181

```
0000047320  0900  5F5F  6D66  6C61  6F6C  C263  012A  0000
0000047340  0A00  5F5F  6666  6572  5F65  6B6C  076E  0005
0000047360  0000  5F07  665F  6568  7061  2B72  0001  0000
0000047400  5F09  695F  696E  7374  6765  2BA6  0001  0000
0000047420  5F09  6C5F  6E69  736B  6765  2BDC  0001  0000
0000047440  5F0B  735F  6165  6372  7368  6765  2CE7  0001
0000047460  0000  5F08  695F  636E  6573  5867  012C  0000
0000047500  0900  5F5F  7267  776F  6573  1A67  012D  0000
0000047520  0A00  5F5F  6966  646E  616C  7473  077C  0005
0000047540  0000  5F0A  615F  626D  6B6C  6973  3A7A  012D
0000047560  0000  0800  5F5F  656E  7377  6765  2D6C  0001
0000047600  0000  5F07  7473  6372  7461  2DB2  0001  0000
0000047620  5F07  7473  6372  7970  2DE8  0001  0000  5F07
0000047640  7473  6C72  6E65  2E00  0001  0000  5F08  7473
0000047660  6E72  6D63  3C70  012E  0000  0500  695F  6F74
0000047700  7E61  0507  0000  0D00  5F5F  6663  746C  7663
0000047720  5F74  6174  9A62  0507  0000  0800  5F5F  7361
0000047740  7A69  4365  079B  0005  0000  5F08  615F  6973
0000047760  657A  9844  0507  0000  0B00  5F5F  6973  6967
0000050000  746E  666F  9666  0507  0000  0B00  5F5F  6973
0000050020  6967  746E  6573  5867  012E  0000  0A00  5F5F
0000050040  4661  6861  6964  6666  2EC8  0001  0000  5F06
0000050060  6C5F  636F  126B  012F  0000  0700  5F5F  6F6C
0000050100  6B63  9C66  012E  0000  0D00  5F5F  6E75  6F6C
0000050120  6B63  665F  6C69  7865  012E  0000  0D00  5F5F
0000050140  6F6C  6B63  735F  7274  6165  F26D  012E  0000
0000050160  0800  5F5F  6E75  6F6C  6B63  079C  0005  0000
0000050200  5F09  6C5F  636F  636B  746E  2F22  0001  0000
0000050220  5F09  755F  6C6E  636F  666B  2E84  0001  0000
0000050240  5F0F  755F  6C6E  636F  5F6B  7473  6572  6D61
0000050260  2EA8  0001  0000  5F0A  775F  6961  6C74  636F
0000050300  906B  012E  0000  0B00  5F5F  6F6C  6B63  665F
0000050320  6C69  3265  012F  0000  0B00  5F5F  6567  7474
0000050340  6469  6174  9E62  0507  0000  0B00  5F5F  6974
0000050360  7464  6261  616D  AC78  012F  0000  0600  665F
0000050400  6567  7374  3042  0001  0000  5F08  7073  6972
0000050420  746E  DD66  0130  0000  0D00  5F5F  7266  6165
0000050440  6C6C  636F  6C5F  B66B  0130  0000  0A00  5F5F
0000050460  7266  6165  6C6C  636F  3164  0001  0000  5F08
0000050500  6572  6C61  6F6C  6963  0131  0000  0B00  725F
0000050520  6165  6C6C  636F  6C5F  6E6B  0131  0000  0800
0000050540  5F5F  6572  6973  657A  3236  0001  0000  5F07
0000050560  6163  6C6C  636F  3264  0001  0000  5F09  665F
0000050600  6E69  7364  6765  328A  0001  0000  5F07  7473
0000050620  6372  7268  32B8  0001  0000  5F08  656D  6D6D
0000050640  766F  8265  0133  0000  0700  6D5F  6D65  6573
0000050660  D774  0133  0000  0700  5F5F  7863  6F74  CA61
0000050700  0133  0000  0A00  5F5F  6C63  6F74  7361  6275
0000050720  342E  0001  0000  5F07  6572  6F6D  6576  342E
0000050740  0001  0000  5F07  6E75  696C  6B6E  0101  8000
0000050760  0101  8000  1601  7900  0330  0383  8302  0204
0000051000  0A82  7528  746E  6761  6567  2964  0169  000A
0000051020  837F  0081  8183  8300  0081  1C01  7F00  0682
0000051040  6170  6B63  685F  8200  6606  6C69  5F65  0268
0000051060  0682  7566  636E  685F  0104  0007  737A  C083
0000051100  8200  0100  0001  0180  0001  0180  0001  0180
0000051120  0001  0180  0001  0180  0001  0180  0001  0180
*
0000051300  0001  0180  0001  0180  0001  0180  0005  5878
```

THU MAR 14 17:46:58 1991 SYS.DLL PAGE 22, LINE 1240

| | | | | | | | | |
|---|---|---|---|---|---|---|---|---|
| 0000051320 | 8083 | 0100 | 0005 | 3078 | 8083 | 0100 | 0001 | 0180 |
| 0000051340 | 0001 | 0180 | 0001 | 0180 | 0001 | 0180 | 0001 | 0180 |
| 0000051360 | 0001 | 0180 | 0013 | 4079 | 8302 | 0231 | 3283 | 8202 |
| 0000051400 | 5F07 | 4F50 | 4E49 | 4C54 | 0169 | 0007 | 837F | 0082 |
| 0000051420 | 8283 | 0100 | 0009 | 827F | 7801 | 8200 | 7901 | 0104 |
| 0000051440 | 0001 | 0180 | 0001 | 0180 | 0001 | 0180 | 0001 | 0180 |
| 0000051460 | 0001 | 0180 | 0001 | 0180 | 0014 | 8579 | 0080 | 8304 |
| 0000051500 | 023A | 3B83 | 8202 | 5F06 | 4552 | 5443 | 694C | 0D01 |
| 0000051520 | 7F00 | 8283 | 8300 | 0082 | 8283 | 8300 | 0082 | 2301 |
| 0000051540 | 7F00 | 0582 | 4C78 | 6665 | 0074 | 0782 | 4279 | 746F |
| 0000051560 | 6F74 | 046D | 0682 | 5278 | 6769 | 7468 | 8208 | 7904 |
| 0000051600 | 6F54 | 0C70 | 0101 | 8000 | 0101 | 8000 | 0101 | 8000 |
| 0000051620 | 0101 | 8000 | 0101 | 8000 | 0101 | 8000 | 0101 | 8000 |
| * | | | | | | | | |
| 0000051740 | 0101 | 8000 | 0701 | 7800 | 0085 | 8301 | 0080 | 0101 |
| 0000051760 | 8000 | 0101 | 8000 | 0101 | 8000 | 0101 | 8000 | 0101 |
| * | | | | | | | | |
| 0000052040 | 8000 | 1A01 | 7900 | 8085 | 3106 | 6383 | 8302 | 0264 |
| 0000052060 | 0C82 | 465F | 4E4F | 4D54 | 5445 | 4952 | 5343 | 0169 |
| 0000052100 | 0094 | 837F | 0254 | 5483 | 8302 | 0085 | 8583 | 8300 |
| 0000052120 | 0082 | 8283 | 8300 | 0082 | 8283 | 8300 | 0082 | 8283 |
| 0000052140 | 8300 | 0082 | 8283 | 8300 | 0082 | 8283 | 8300 | 0082 |
| 0000052160 | 8283 | 8300 | 0081 | 8183 | 8300 | 0081 | 8583 | 8300 |
| 0000052200 | 0085 | 8183 | 8300 | 0081 | 8183 | 8300 | 0081 | 8183 |
| 0000052220 | 8300 | 0081 | 8183 | 8300 | 0081 | 8183 | 8300 | 0085 |
| 0000052240 | 8583 | 8300 | 0085 | 8583 | 8300 | 0082 | 8283 | 8300 |
| 0000052260 | 0082 | 8283 | 8300 | 0082 | 8283 | 8300 | 0082 | 8283 |
| 0000052300 | 8300 | 0082 | 8283 | 8300 | 0082 | 8283 | 8300 | 0081 |
| 0000052320 | 8183 | 8300 | 0082 | 3E01 | 7F03 | 0C82 | 7A73 | 6146 |
| 0000052340 | 696D | 796C | 616E | 656D | 8200 | 730A | 467A | 6361 |
| 0000052360 | 6E65 | 6D61 | 2065 | 0A82 | 6469 | 6552 | 6967 | 7473 |
| 0000052400 | 7972 | 8240 | 750A | 4373 | 646F | 5065 | 6761 | 4265 |
| 0000052420 | 0982 | 456C | 486D | 6965 | 6867 | 4474 | 0882 | 586C |
| 0000052440 | 6548 | 6769 | 7468 | 8248 | 6C0C | 614D | 4178 | 6373 |
| 0000052460 | 6E65 | 6564 | 4C72 | 0D82 | 4D6C | 7861 | 6544 | 6373 |
| 0000052500 | 6E65 | 6564 | 5072 | 1082 | 4C6C | 776F | 7265 | 6143 |
| 0000052520 | 6573 | 7341 | 6563 | 746E | 8254 | 6C11 | 6F4C | 6577 |
| 0000052540 | 4372 | 7361 | 4465 | 7365 | 6563 | 746E | 8258 | 6C10 |
| 0000052560 | 6E49 | 6574 | 6E72 | 6C61 | 654C | 6461 | 6E69 | 5C67 |
| 0000052600 | 1082 | 456C | 7478 | 7265 | 616E | 4C6C | 6165 | 6964 |
| 0000052620 | 676E | 8260 | 6C0D | 7641 | 4365 | 6168 | 5772 | 6469 |
| 0000052640 | 6874 | 8264 | 6C0B | 614D | 4378 | 6168 | 4972 | 636E |
| 0000052660 | 8268 | 6C06 | 6D45 | 6E49 | 6C63 | 0F82 | 4D6C | 7861 |
| 0000052700 | 6142 | 6573 | 696C | 656E | 7845 | 7074 | 0A82 | 4373 |
| 0000052720 | 6168 | 5372 | 6F6C | 6570 | 8274 | 730A | 6E49 | 696C |
| 0000052740 | 656E | 6944 | 7672 | 0882 | 4373 | 6168 | 5272 | 746F |
| 0000052760 | 8278 | 750D | 5773 | 6965 | 6867 | 4374 | 616C | 7373 |
| 0000053000 | 827A | 750C | 5773 | 6469 | 6874 | 6C43 | 7361 | 7C73 |
| 0000053020 | 0B82 | 5873 | 6544 | 6976 | 6563 | 6552 | 7E73 | 0B82 |
| 0000053040 | 5973 | 6544 | 6976 | 6563 | 6552 | 8573 | 0080 | 0A82 |
| 0000053060 | 4673 | 7269 | 7473 | 6843 | 7261 | 8285 | 8200 | 7309 |
| 0000053100 | 614C | 7473 | 6843 | 7261 | 8485 | 8200 | 730C | 6544 |
| 0000053120 | 6166 | 6C75 | 4374 | 6168 | 8572 | 0086 | 0A82 | 4273 |
| 0000053140 | 6572 | 6B61 | 6843 | 7261 | 8885 | 8200 | 7311 | 6F4E |
| 0000053160 | 696D | 616E | 506C | 696F | 746E | 6953 | 657A | 8A85 |
| 0000053200 | 8200 | 7311 | 694D | 696E | 756D | 506D | 696F | 746E |
| 0000053220 | 6953 | 657A | 8C85 | 8200 | 7311 | 614D | 6978 | 756D |
| 0000053240 | 506D | 696F | 746E | 6953 | 657A | 8E85 | 8200 | 6606 |
| 0000053260 | 5473 | 7079 | 8565 | 0090 | 0682 | 7366 | 6544 | 6E66 |

THU MAR 14 17:46:58 1991 SYS.DLL PAGE 23, LINE 1299

```
0000053300  9285  8200  660B  5373  6C65  6365  6974  6E6F
0000053320  9485  8200  660E  4373  7061  6261  6C69  7469
0000053340  6569  8573  0096  0F82  536C  6275  6373  6972
0000053360  7470  5358  7A69  8565  0098  0F82  536C  6275
0000053400  6373  6972  7470  5359  7A69  8565  009C  1182
0000053420  536C  6275  6373  6972  7470  4F58  6666  6573
0000053440  8574  00A0  1182  536C  6275  6373  6972  7470
0000053460  4F59  6666  6573  8574  00A4  1182  536C  7075
0000053500  7265  6373  6972  7470  5358  7A69  8565  00A8
0000053520  1182  536C  7075  7265  6373  6972  7470  5359
0000053540  7A69  8565  00AC  1382  536C  7075  7265  6373
0000053560  6972  7470  4F58  6666  6573  8574  00B0  1382
0000053600  536C  7075  7265  6373  6972  7470  4F59  6666
0000053620  6573  8574  00B4  0F82  556C  646E  7265  6373
0000053640  726F  5365  7A69  8565  00B8  1382  556C  646E
0000053660  7265  6373  726F  5065  736F  7469  6F69  856E
0000053700  00BC  0E82  536C  7274  6B69  6F65  7475  6953
0000053720  657A  C085  8200  6C12  7453  6972  656B  756F
0000053740  5074  736F  7469  6F69  856E  00C4  0D82  4B73
0000053760  7265  696E  676E  6150  7269  8573  00C8  0982
0000054000  5273  7365  7265  6576  8564  00CA  0682  4D6C
0000054020  7461  6863  CC85  0100  0001  0180  0001  0180
0000054040  0001  0180  0001  0180  0001  0180  0001  0180
*
0000055520  0001  0180  0001  0180  0001  0180  0013  8579
0000055540  00D0  8306  0337  3883  8203  5F05  4D51  4753
0000055560  0169  0013  837F  00C0  8583  8300  00C0  C083
0000055600  8300  0086  3083  0102  0027  827F  6804  6E77
0000055620  0064  0382  736D  0467  0382  706D  0631  0382
0000055640  706D  0A32  0482  6974  656D  820E  7003  6C74
0000055660  0112  0001  0180  0001  0180  0001  0180  0001
0000055700  0180  0001  0180  0001  0180  0001  0180  0001
*
0000062160  0180  0001  0180  0001  0180  0007  737A  6C83
0000062200  8205  0100  000A  8075  8183  6400  8300  0201
0000062220  0101  8000  0101  8000  0101  8000  0101  8000
*
0000062760  0101  8000  0101  8000  1201  7900  0560  C883
0000063000  8305  05C9  0682  695F  626F  6675  0169  0010
0000063020  837F  00C0  8183  8300  00C0  8083  8300  0080
0000063040  2701  7F00  0482  705F  7274  8200  5F04  6E63
0000063060  0474  0582  625F  7361  0665  0582  665F  616C
0000063100  0A67  0582  665F  6C69  0B65  0101  8000  0701
0000063120  7A00  8373  05C7  0082  0101  8000  0101  8000
0000063140  0101  8000  0101  8000  0101  8000  0101  8000
*
0000064640  0101  8000  0701  7F00  C083  8300  00C0  0A01
000006466C  7500  8380  0081  0273  9F83  0106  0001  0180
0000064700  0001  0180  0005  4878  8083  0100  0005  3878
0000064720  8083  0100  0005  6078  8283  0100  0007  8578
0000064740  0320  8083  0100  0005  1078  8083  0100  0005
0000064760  5078  8083  0100  000D  837F  00C0  8583  8300
0000065000  00C0  C083  0100  000A  8075  C083  7300  8304
0000065020  06A9  0A01  7500  8380  0081  0064  0183  0102
0000065040  0001  0180  0016  3079  8303  0203  0483  8202
0000065060  280A  6E75  6174  6767  6465  6929  0A01  7F00
0000065100  8183  8300  0081  8183  0100  001C  827F  7006
0000065120  6361  5F6B  0068  0682  6966  656C  685F  8202
0000065140  6606  6E75  5F63  0468  0701  7A00  8373  00C0
```

```
THU MAR 14 17:46:58 1991  SYS.DLL  PAGE 24, LINE 1358

0000065160  0082  0101  8000  0101  8000  0101  8000  0101
0000065200  8000  0101  8000  0101  8000  0101  8000  0101
*
0000065360  8000  0101  8000  0101  8000  0501  7800  8358
0000065400  0080  0501  7800  8330  0080  0101  8000  0101
0000065420  8000  0101  8000  0101  8000  0101  8000  0101
0000065440  8000  1301  7900  0240  3183  8302  0232  0782
0000065460  505F  494F  544E  694C  0701  7F00  8283  8300
0000065500  0082  0901  7F00  0182  0078  0182  0479  0101
0000065520  8000  0101  8000  0101  8000  0101  8000  0101
*
0000070320  8000  0101  8000  0101  8000  0101  8000  1301
0000070340  7900  D085  0600  9883  8303  0399  0582  515F
0000070360  534D  6947  1301  7F00  C083  8300  0085  C083
0000070400  8300  00C0  8683  8300  0230  2701  7F00  0482
0000070420  7768  646E  8200  6D03  6773  8204  6D03  3170
0000070440  8206  6D03  3270  820A  7404  6D69  0E65  0382
0000070460  7470  126C  0101  8000  0101  8000  0101  8000
0000070500  0101  8000  0101  8000  0101  8000  0101  8000
*
0000073100  0101  8000  1201  7900  0240  DF83  8304  04E0
0000073120  0682  535F  5A49  4C45  0169  0007  837F  0082
0000073140  8283  0100  000B  827F  6302  0078  0282  7963
0000073160  0104  0001  0180  0001  0180  0001  0180  0001
0000073200  0180  0001  0180  0001  0180  0001  0180  0001
*
0000074460  0180  0001  0180  0001  0180  0001  0180  0010
0000074500  1879  8303  0595  9683  8205  5F04  4752  6942
0000074520  0A01  7F00  8483  8300  0084  8483  0100  0019
0000074540  827F  6205  6C42  6575  8200  6206  7247  6565
0000074560  016E  0482  5262  6465  0102  0001  0180  0001
0000074600  0180  0001  0180  0001  0180  0001  0180  0001
*
0000075200  0180  0001  0180  0007  737A  DB83  8205  0100
0000075220  000A  8075  8183  6400  8300  0201  0101  8000
0000075240  0101  8000  0101  8000  0101  8000  0101  8000
*
0000076000  0101  8000  1201  7900  0560  3783  8306  0638
0000076020  0682  695F  626F  6675  0169  0010  837F  00C0
0000076040  8183  8300  00C0  8083  8300  0080  2701  7F00
0000076060  0482  705F  7274  8200  5F04  6E63  0474  0582
0000076100  625F  7361  0665  0582  665F  616C  0A67  0582
0000076120  665F  6C69  0B65  0101  8000  0701  7A00  8373
0000076140  0636  0082  0101  8000  0101  8000  0101  8000
0000076160  0101  8000  0101  8000  0101  8000  0101  8000
*
0000077660  0101  8000  0101  8000  0101  8000  0701  7F00
0000077700  C083  8300  00C0  0A01  7500  8380  0081  0273
0000077720  1183  0107  0001  0180  0001  0180  0005  4878
0000077740  8083  0100  0005  3878  8083  0100  0005  6078
0000077760  8283  0100  0005  1078  8083  0100  000A  8075
0000100000  0083  7302  8300  0201  0D01  7F00  C083  8300
0000100020  0085  C083  8300  00C0  0A01  7500  8380  00C0
0000100040  0473  1A83  0107  0005  1078  8483  0100  0001
0000100060  0180  0004  837F  0082  0A01  7500  8380  0084
0000100100  0164  1E83  0107  0001  0180  000A  8075  8483
0000100120  6400  8300  0201  1105  0001  0000  0117  0000
0000100140  06A0  0496  0016  0488  0000  0804  5F73  7067
0000100160  7769  6E69  0411  000A  00C0  660B  6C69  5F65
```

THU MAR 14 17:46:58 1991 SYS.DLL PAGE 25, LINE 1417

| | | | | | | | | |
|---|---|---|---|---|---|---|---|---|
| 0000100200 | 616E | 656D | 705F | 0411 | 0006 | 00C0 | 740B | 7469 |
| 0000100220 | 656C | 745F | 7478 | 705F | 040E | FF40 | 0081 | 5F08 |
| 0000100240 | 725F | 7465 | 6176 | 0C6C | 3604 | CBFF | 0605 | 6966 |
| 0000100260 | 656C | 705F | 040C | FF7A | 00C0 | 6C06 | 6E69 | 5F65 |
| 0000100300 | 0D70 | 8404 | C0FF | 0700 | 5F70 | 6174 | 5F62 | 0C70 |
| 0000100320 | 8804 | C0FF | 0600 | 6574 | 706D | 705F | 0415 | FF7E |
| 0000100340 | 0085 | 6E0F | 666F | 615F | 6C6C | 636F | 6C5F | 6E69 |
| 0000100360 | 7365 | 0409 | FF4A | 00C0 | 6803 | 6261 | 0409 | FF80 |
| 0000100400 | 00C0 | 6803 | 716D | 040F | FF42 | 00C0 | 6809 | 6E77 |
| 0000100420 | 4664 | 6172 | 656D | 0410 | FFFA | 00C0 | 680A | 6E77 |
| 0000100440 | 4364 | 696C | 6E65 | 0A74 | 6004 | 36FF | 0403 | 6D71 |
| 0000100460 | 6773 | 0412 | FF5A | 0086 | 660C | 466C | 6172 | 656D |
| 0000100500 | 6C46 | 6761 | 0B73 | 9204 | A6FF | 0506 | 6974 | 6C74 |
| 0000100520 | 0865 | 8C04 | 81FF | 0200 | 6372 | 040C | FFF6 | 00C0 |
| 0000100540 | 5F06 | 745F | 7079 | 0F65 | 5E04 | 85FF | 0900 | 5F5F |
| 0000100560 | 7862 | 745F | 7079 | 0D65 | 4604 | 6BFF | 0705 | 5F5F |
| 0000100600 | 7270 | 6E69 | 0B74 | 3A04 | 02FF | 0502 | 5F5F | 766C |
| 0000100620 | 0D6C | 4E04 | A5FF | 0706 | 5F5F | 6C63 | 636F | 0D6B |
| 0000100640 | 8E04 | C0FF | 0700 | 5F5F | 7473 | 6361 | 0E6B | 8405 |
| 0000100660 | 0500 | A300 | 0606 | 5F5F | 7566 | 636E | 0201 | 0119 |
| 0000100700 | 0496 | 06AA | 056A | 0016 | 055C | 0000 | 0A04 | 7067 |
| 0000100720 | 7769 | 6E69 | 7270 | 636F | 040A | 0010 | 00C0 | 6804 |
| 0000100740 | 6E77 | 0964 | 0E04 | 8500 | 0300 | 736D | 0967 | 0A04 |
| 0000100760 | C000 | 0300 | 706D | 0931 | 0604 | C000 | 0300 | 706D |
| 0000101000 | 0832 | 2404 | 62FF | 0202 | 6D66 | 0409 | FF0A | 00C0 |
| 0000101020 | 6803 | 7370 | 0409 | FFF6 | 0230 | 7003 | 6C74 | 040B |
| 0000101040 | FF0E | 0081 | 7305 | 694C | 656E | 040F | FF08 | 0081 |
| 0000101060 | 7309 | 6150 | 6E69 | 4274 | 6765 | 040F | FF20 | 0081 |
| 0000101100 | 7309 | 6150 | 6E69 | 4574 | 646E | 0411 | FF22 | 0081 |
| 0000101120 | 730B | 7348 | 7263 | 6C6F | 496C | 636E | 0411 | FFF4 |
| 0000101140 | 0081 | 730B | 7356 | 7263 | 6C6F | 496C | 636E | 0410 |
| 0000101160 | FF10 | 0239 | 720A | 6C63 | 6E49 | 6176 | 696C | 0E64 |
| 0000101200 | 1805 | 0509 | 8100 | 0600 | 7963 | 6843 | 7261 | 050E |
| 0000101220 | 091E | 0005 | 0081 | 6306 | 4479 | 7365 | 1063 | 1605 |
| 0000101240 | 0509 | 8100 | 0800 | 7863 | 6C43 | 6569 | 746E | 0510 |
| 0000101260 | 091C | 0005 | 0081 | 6308 | 4379 | 696C | 6E65 | 1374 |
| 0000101300 | 0A05 | 0509 | 8100 | 0B00 | 7863 | 6554 | 7478 | 6F54 |
| 0000101320 | 6174 | 136C | 1005 | 0509 | C000 | 0B00 | 7768 | 646E |
| 0000101340 | 7348 | 7263 | 6C6F | 136C | 0C05 | 0509 | C000 | 0B00 |
| 0000101360 | 7768 | 646E | 7356 | 7263 | 6C6F | 136C | 0605 | 0509 |
| 0000101400 | 8100 | 0B00 | 4873 | 6373 | 6F72 | 6C6C | 614D | 1378 |
| 0000101420 | 2205 | 0509 | 8100 | 0B00 | 5673 | 6373 | 6F72 | 6C6C |
| 0000101440 | 614D | 1378 | 2005 | 0509 | 8100 | 0B00 | 4873 | 6373 |
| 0000101460 | 6F72 | 6C6C | 6F50 | 1373 | 1A05 | 0509 | 8100 | 0B00 |
| 0000101500 | 5673 | 6373 | 6F72 | 6C6C | 6F50 | 0E73 | 1405 | 0509 |
| 0000101520 | 8100 | 0600 | 7863 | 6843 | 7261 | 050E | 0908 | 0005 |
| 0000101540 | 0081 | 6306 | 4378 | 7061 | 0173 | 0502 | 000D | 1A00 |
| 0000101560 | C700 | 7C03 | 0500 | C000 | 0700 | 5F42 | 4678 | 6C69 |
| 0000101600 | 0F65 | 8005 | 0500 | C000 | 0700 | 5F42 | 5078 | 6361 |
| 0000101620 | 146B | 0005 | 0000 | 8100 | 0C00 | 7842 | 445F | 6265 |
| 0000101640 | 6775 | 6F4D | 6564 | 0514 | 0000 | 0000 | 0081 | 420C |
| 0000101660 | 5F78 | 6954 | 656D | 4D73 | 646F | 1365 | 0005 | 0509 |
| 0000101700 | 0500 | 0B02 | 7874 | 5F74 | 7562 | 5F66 | 5F70 | 1173 |
| 0000101720 | 0405 | 0509 | 8500 | 0900 | 696C | 656E | 6E5F | 5F6F |
| 0000101740 | 0573 | 0111 | 0000 | 1700 | 0001 | 120A | E407 | 1604 |
| 0000101760 | D600 | 0004 | 0400 | 7308 | 765F | 6F69 | 6977 | 116E |
| 0000102000 | 0A04 | C000 | 0B00 | 6966 | 656C | 6E5F | 6D61 | 5F65 |
| 0000102020 | 1170 | 0604 | C000 | 0B00 | 6974 | 6C74 | 5F65 | 7874 |
| 0000102040 | 5F74 | 0C70 | F604 | C0FF | 0600 | 5F5F | 7974 | 6570 |

THU MAR 14 17:46:58 1991 SYS.DLL PAGE 26, LINE 1476

| | | | | | | | | |
|---|---|---|---|---|---|---|---|---|
| 0000102060 | 040F | FFC4 | 0085 | 5F09 | 625F | 5F78 | 7974 | 6570 |
| 0000102100 | 040D | FFAE | 05DA | 5F07 | 705F | 6972 | 746E | 040B |
| 0000102120 | FFA6 | 0202 | 5F05 | 6C5F | 6C76 | 040D | FFB2 | 0717 |
| 0000102140 | 5F07 | 635F | 6F6C | 6B63 | 040D | FFF2 | 00C0 | 5F07 |
| 0000102160 | 735F | 6174 | 6B63 | 040E | FFAC | 0081 | 5F08 | 725F |
| 0000102200 | 7465 | 6176 | 0C6C | A204 | 3AFF | 0606 | 6966 | 656C |
| 0000102220 | 705F | 040C | FFE2 | 00C0 | 6C06 | 6E69 | 5F65 | 0D70 |
| 0000102240 | E804 | C0FF | 0700 | 5F70 | 6174 | 5F62 | 0C70 | EC04 |
| 0000102260 | C0FF | 060D | 6574 | 706D | 705F | 0415 | FFE6 | 0081 |
| 0000102300 | 6E0F | 666F | 615F | 6C6C | 636F | 6C5F | 6E69 | 7365 |
| 0000102320 | 0410 | FFFA | 00C0 | 680A | 6E77 | 4364 | 696C | 6E65 |
| 0000102340 | 0A74 | C804 | 97FF | 0403 | 6D71 | 6773 | 0412 | FFBE |
| 0000102360 | 0086 | 660C | 466C | 6172 | 656D | 6C46 | 6761 | 0773 |
| 0000102400 | C604 | 81FF | 0100 | 0769 | C204 | 81FF | 0100 | 086A |
| 0000102420 | F004 | 81FF | 0200 | 6372 | 050E | 00CE | 0005 | 0715 |
| 0000102440 | 5F06 | 665F | 6E75 | 0163 | 1902 | E401 | 190E | 4807 |
| 0000102460 | 1600 | 3C00 | 0000 | 0400 | 730A | 765F | 6F69 | 745F |
| 0000102500 | 7265 | 016D | 1902 | 2C01 | 1B0F | AC07 | 1604 | 9E00 |
| 0000102520 | 0004 | 0400 | 760A | 6F69 | 6977 | 706E | 6F72 | 0A63 |
| 0000102540 | 1004 | C000 | 0400 | 7768 | 646E | 0409 | 000E | 0085 |
| 0000102560 | 6D03 | 6773 | 0409 | 000A | 00C0 | 6D03 | 3170 | 0409 |
| 0000102600 | 0006 | 00C0 | 6D03 | 3270 | 0409 | FFF0 | 00C0 | 6803 |
| 0000102620 | 6364 | 040A | FFF6 | 04DE | 7304 | 7A69 | 096C | F404 |
| 0000102640 | 81FF | 0300 | 6F52 | 1277 | D805 | 0500 | 1C00 | 0A07 |
| 0000102660 | 4262 | 616C | 6B6E | 6543 | 6C6C | 050C | 092E | 0005 |
| 0000102700 | 0085 | 6804 | 7076 | 1373 | 3405 | 0509 | C000 | 0B00 |
| 0000102720 | 7768 | 646E | 7348 | 7263 | 6C6F | 136C | 3005 | 0509 |
| 0000102740 | C000 | 0B00 | 7768 | 646E | 7356 | 7263 | 6C6F | 0B6C |
| 0000102760 | 4205 | 0505 | C000 | 0300 | 7068 | 1373 | 4605 | 0509 |
| 0000103000 | 8100 | 0B00 | 4873 | 6373 | 6F72 | 6C6C | 6F50 | 1373 |
| 0000103020 | 3E05 | 0509 | 8100 | 0B00 | 5673 | 6373 | 6F72 | 6C6C |
| 0000103040 | 6F50 | 0E73 | 3805 | 0509 | 8100 | D600 | 7863 | 6843 |
| 0000103060 | 7261 | 050E | 093C | 0005 | 0081 | 6306 | 4379 | 6168 |
| 0000103100 | 1072 | 3A05 | 0509 | 8100 | 0800 | 7863 | 6C43 | 6569 |
| 0000103120 | 746E | 0510 | 0940 | 0005 | 0081 | 6308 | 4379 | 696C |
| 0000103140 | 6E65 | 0174 | 1C02 | D801 | 1F13 | A107 | 1000 | 9600 |
| 0000103160 | 0000 | 0400 | 520D | 6267 | 6F54 | 6956 | 436F | 6C6F |
| 0000103200 | 726F | 040C | 0006 | 0082 | 6306 | 726C | 6752 | 0B62 |
| 0000103220 | FC04 | 84FF | 0500 | 4962 | 6772 | 0962 | F804 | 94FF |
| 0000103240 | 0305 | 6772 | 0162 | 2802 | 7901 | 2114 | 5D07 | 1000 |
| 0000103260 | 5200 | 0000 | 0400 | 4319 | 6E6F | 7473 | 7572 | 7463 |
| 0000103300 | 6544 | 6166 | 6C75 | 4174 | 7474 | 6972 | 7562 | 6574 |
| 0000103320 | 0201 | 0D05 | 0000 | 001A | 050D | 0924 | 0005 | 00C0 |
| 0000103340 | 6805 | 6261 | 735F | 050D | 0928 | 0005 | 00C0 | 6805 |
| 0000103360 | 716D | 735F | 050F | 00BE | 0005 | 00C0 | 4207 | 785F |
| 0000103400 | 6946 | 656C | 050E | 00C6 | 0005 | 00C0 | 6806 | 6E77 |
| 0000103420 | 5F64 | 1373 | CA05 | 0500 | 0500 | 0B02 | 7874 | 5F74 |
| 0000103440 | 7562 | 5F66 | 5F70 | 0F73 | C205 | 0500 | C000 | 0700 |
| 0000103460 | 5F42 | 5078 | 6361 | 116B | 2C05 | 0509 | 8100 | 0900 |
| 0000103500 | 696C | 656E | 6E5F | 5F6F | 1473 | 0005 | 0000 | 8100 |
| 0000103520 | 0C00 | 7842 | 445F | 6265 | 6775 | 6F4D | 6564 | 0514 |
| 0000103540 | 0000 | 0000 | 0081 | 420C | 5F78 | 6954 | 656D | 4D73 |
| 0000103560 | 646F | 0A65 | 5F73 | 7067 | 7769 | 6E69 | 632E | 0001 |
| 0000103600 | 008E | 004A | 0000 | 004B | 0016 | 0059 | 00AE | 005D |
| 0000103620 | 00B3 | 005E | 00CA | 0060 | 00CF | 0064 | 00D2 | 0066 |
| 0000103640 | 00EC | 0067 | 00F9 | 0069 | 00FE | 006B | 0101 | 006D |
| 0000103660 | 0115 | 006E | 0121 | 0071 | 0126 | 0073 | 012F | 0075 |
| 0000103700 | 0135 | 0077 | 013B | 007B | 0144 | 007D | 0156 | 007E |
| 0000103720 | 0163 | 0080 | 0168 | 0083 | 016B | 0085 | 018B | 0086 |

THU MAR 14 17:46:58 1991 SYS.DLL PAGE 27, LINE 1535

| | | | | | | | | |
|---|---|---|---|---|---|---|---|---|
| 0000103740 | 0196 | 0088 | 01AD | 008A | 01B0 | 008D | 01CB | 0092 |
| 0000103760 | 0202 | 0093 | 0236 | 0094 | 0248 | 0095 | 024B | 0096 |
| 0000104000 | 0254 | 0097 | 026E | 0099 | 0272 | 009D | 027F | 009F |
| 0000104020 | 02A1 | 00A0 | 02AD | 00A2 | 02B2 | 00A3 | 02B5 | 00A7 |
| 0000104040 | 02BB | 00A9 | 02BE | 00AC | 02CE | 00AD | 02D7 | 00AF |
| 0000104060 | 02DC | 00B1 | 02E5 | 00B2 | 02F4 | 00B5 | 0309 | 00B7 |
| 0000104100 | 0326 | 00BB | 0332 | 00BC | 034F | 00C2 | 0381 | 00C4 |
| 0000104120 | 03A3 | 00C5 | 03C6 | 00C7 | 03DC | 00C8 | 03E9 | 00C9 |
| 0000104140 | 03F4 | 00CB | 0401 | 00CC | 0488 | 00D8 | 0496 | 00E7 |
| 0000104160 | 04AC | 00EA | 04B2 | 00EC | 04C5 | 00EE | 04DD | 00EF |
| 0000104200 | 04E3 | 00F0 | 04E9 | 00F1 | 04EF | 00F3 | 04F6 | 00F5 |
| 0000104220 | 0503 | 00F9 | 0512 | 00FD | 0532 | 00FE | 0552 | 0101 |
| 0000104240 | 055B | 0102 | 0561 | 0104 | 0567 | 0105 | 057C | 0109 |
| 0000104260 | 058E | 010B | 05AC | 010D | 05C2 | 010E | 05D3 | 0112 |
| 0000104300 | 05E5 | 0114 | 0603 | 0115 | 0619 | 0118 | 0622 | 011B |
| 0000104320 | 0628 | 011C | 0631 | 011F | 0634 | 0120 | 063B | 0123 |
| 0000104340 | 063E | 0124 | 064A | 0127 | 064D | 0128 | 0657 | 012B |
| 0000104360 | 065A | 012C | 0665 | 012F | 0668 | 0130 | 066E | 0131 |
| 0000104400 | 0671 | 0133 | 0696 | 0136 | 06BD | 0138 | 06C7 | 013A |
| 0000104420 | 06CF | 013D | 06F5 | 013F | 0710 | 0142 | 0719 | 0145 |
| 0000104440 | 071F | 0146 | 0724 | 0149 | 0727 | 014A | 072C | 014D |
| 0000104460 | 072F | 014E | 0747 | 0151 | 074A | 0152 | 0760 | 0155 |
| 0000104500 | 0763 | 0156 | 076D | 0159 | 0770 | 015A | 0775 | 015B |
| 0000104520 | 0778 | 015D | 079C | 0160 | 07C0 | 0162 | 07C9 | 0164 |
| 0000104540 | 07D0 | 0167 | 07F6 | 0168 | 0811 | 016A | 081C | 016D |
| 0000104560 | 0825 | 0171 | 082B | 0176 | 084A | 0177 | 0869 | 0178 |
| 0000104600 | 088F | 017B | 0892 | 017C | 08AF | 017E | 08BC | 0180 |
| 0000104620 | 08DB | 0184 | 08FC | 0186 | 0918 | 0188 | 0926 | 018C |
| 0000104640 | 0941 | 018D | 0982 | 018F | 0985 | 0190 | 0992 | 0191 |
| 0000104660 | 099B | 0192 | 09D5 | 0193 | 09F2 | 730A | 765F | 6F69 |
| 0000104700 | 6977 | 2E6E | 0163 | A000 | 5B00 | 0000 | 5C0A | 1600 |
| 0000104720 | 680A | A800 | 6D0A | AD00 | 6E0A | B900 | 710A | BF00 |
| 0000104740 | 720A | D600 | 740A | DB00 | 780A | DE00 | 7A0A | F600 |
| 0000104760 | 7B0A | 0100 | 7D0B | 0600 | 7F0B | 0900 | 810B | 1D00 |
| 0000105000 | 820B | 2900 | 850B | 2E00 | 870B | 3700 | 890B | 3C00 |
| 0000105020 | 8B0B | 4200 | 8F0B | 4B00 | 910B | 5B00 | 920B | 6600 |
| 0000105040 | 940B | 6B00 | 970B | 6E00 | 990B | 8A00 | 9A0B | 9500 |
| 0000105060 | 9C0B | AB00 | 9E0B | AE00 | A10B | C600 | A30B | F900 |
| 0000105100 | A40B | 0200 | A80C | 1B00 | A90C | 4C00 | AA0C | 5F00 |
| 0000105120 | AC0C | 6200 | AD0C | 6A00 | AE0C | 8200 | B00C | 8600 |
| 0000105140 | B40C | 9100 | B60C | B200 | B70C | BE00 | B90C | C300 |
| 0000105160 | BA0C | C600 | BE0C | CB00 | C00C | CE00 | C30C | DC00 |
| 0000105200 | C40C | E500 | C60C | EA00 | C80C | F300 | C90C | 0100 |
| 0000105220 | CC0D | 1700 | CE0D | 3400 | D30D | 3E00 | D40D | 6F00 |
| 0000105240 | D80D | 8200 | DA0D | A400 | DB0D | C600 | DD0D | DB00 |
| 0000105260 | DE0D | E800 | DF0D | F500 | E10D | 0200 | E40E | 0E00 |
| 0000105300 | E50E | 2400 | E70E | 4000 | EA0E | 5000 | EC0E | 5800 |
| 0000105320 | ED0E | D600 | 000E | E401 | 030E | FA01 | 040E | 0601 |
| 0000105340 | 060F | 1D01 | 070F | 2001 | 120F | 2C01 | 1E0F | 4201 |
| 0000105360 | 210F | 4801 | 220F | 4E01 | 240F | 5401 | 260F | 6501 |
| 0000105400 | 280F | 7701 | 2A0F | 9B01 | 2B0F | B001 | 2C0F | BF01 |
| 0000105420 | 2E0F | D001 | 2F0F | D501 | 310F | EC01 | 340F | 0201 |
| 0000105440 | 3810 | 3E01 | 3C10 | 5E01 | 4010 | 7901 | 4410 | 9901 |
| 0000105460 | 4510 | B801 | 4810 | C101 | 4910 | C701 | 4B10 | CD01 |
| 0000105500 | 4D10 | E701 | 5010 | F001 | 5310 | F601 | 5410 | FA01 |
| 0000105520 | 5710 | FD01 | 5810 | 0101 | 5B11 | 0401 | 5C11 | 0901 |
| 0000105540 | 5F11 | 0C01 | 6011 | 1101 | 6311 | 1401 | 6411 | 1A01 |
| 0000105560 | 6511 | 1D01 | 6611 | 4201 | 6811 | 5E01 | 6B11 | 7F01 |
| 0000105600 | 6E11 | 9001 | 7011 | AB01 | 7311 | B401 | 7611 | BA01 |

THU MAR 14 17:46:58 1991 SYS.DLL PAGE 28, LINE 1594

| | | | | | | | | |
|---|---|---|---|---|---|---|---|---|
| 0000105620 | 7711 | BE01 | 7A11 | C101 | 7B11 | C501 | 7E11 | C801 |
| 0000105640 | 7F11 | D401 | 8211 | D701 | 8311 | E301 | 8611 | E601 |
| 0000105660 | 8711 | EC01 | 8811 | EF01 | 8911 | 1401 | 8B12 | 3201 |
| 0000105700 | 8E12 | 5301 | 9112 | 6401 | 9312 | 7F01 | 9612 | 8801 |
| 0000105720 | 9A12 | 8E01 | A012 | AD01 | A112 | CC01 | A212 | F201 |
| 0000105740 | A512 | F501 | A612 | 0C01 | A813 | 1901 | AA13 | 2B01 |
| 0000105760 | AC13 | 3801 | AF13 | 4101 | B013 | 4E01 | B113 | 5701 |
| 0000106000 | B313 | 6401 | B413 | 6D01 | B513 | AD01 | B613 | CA01 |
| 0000106020 | BD13 | D801 | C113 | E801 | C313 | FA01 | C413 | 0701 |
| 0000106040 | C514 | 1401 | C714 | 2101 | C814 | 3C01 | CB14 | 4001 |
| 0000106060 | CC14 | 6401 | CE14 | 6801 | CF14 | 6E01 | D614 | 7901 |
| 0000106100 | DA14 | 8901 | DB14 | CB01 | 0014 | 6C0C | 696C | 6362 |
| 0000106120 | 6C64 | 2E6C | 696C | 0A62 | 626C | 7069 | 746D | 6C2E |
| 0000106140 | 6269 | 6F07 | 3273 | 6C2E | 6269 | 007B | 0101 | 0001 |
| 0000106160 | 0008 | 0000 | 002B | 0102 | 0001 | 0593 | 0000 | 0020 |
| 0000106200 | 0103 | 0001 | 0F33 | 0000 | 1826 | 0104 | 0001 | 3D9D |
| 0000106220 | 0000 | 038B | 0109 | 0001 | 44BA | 0000 | 0247 | 0101 |
| 0000106240 | 0002 | 0033 | 0000 | 002B | 0102 | 0002 | 05B3 | 0000 |
| 0000106260 | 0031 | 0103 | 0002 | 2759 | 0000 | 1644 | 0104 | 0002 |
| 0000106300 | 4128 | 0000 | 0392 | 0109 | 0002 | 4701 | 0000 | 028F |
| 0000106320 | 0101 | 0003 | 005E | 0000 | 0018 | 0102 | 0003 | 05E4 |
| 0000106340 | 0000 | 0152 | 0101 | 0004 | 0076 | 0000 | 001B | 0102 |
| 0000106360 | 0004 | 0736 | 0000 | 01D2 | 0101 | 0005 | 0091 | 0000 |
| 0000106400 | 001C | 0102 | 0005 | 0908 | 0000 | 0035 | 0101 | 0006 |
| 0000106420 | 00AD | 0000 | 0017 | 0102 | 0006 | 093D | 0000 | 000F |
| 0000106440 | 0101 | 0007 | 00C4 | 0000 | 0017 | 0102 | 0007 | 094C |
| 0000106460 | 0000 | 0033 | 0101 | 0008 | 00DB | 0000 | 001A | 0102 |
| 0000106500 | 0008 | 097F | 0000 | 0010 | 0101 | 0009 | 00F5 | 0000 |
| 0000106520 | 001C | 0102 | 0009 | 098F | 0000 | 0025 | 0101 | 000A |
| 0000106540 | 0111 | 0000 | 001B | 0102 | 000A | 09B4 | 0000 | 003F |
| 0000106560 | 0101 | 000B | 012C | 0000 | 0015 | 0102 | 000B | 09F3 |
| 0000106600 | 0000 | 0020 | 0101 | 000C | 0141 | 0000 | 0014 | 0102 |
| 0000106620 | 000C | 0A13 | 0000 | 001C | 0101 | 000D | 0155 | 0000 |
| 0000106640 | 0018 | 0102 | 000D | 0A2F | 0000 | 000F | 0101 | 000E |
| 0000106660 | 016D | 0000 | 0014 | 0102 | 000E | 0A3E | 0000 | 0037 |
| 0000106700 | 0101 | 000F | 0181 | 0000 | 0018 | 0102 | 000F | 0A75 |
| 0000106720 | 0000 | 000F | 0101 | 0010 | 0199 | 0000 | 0018 | 0102 |
| 0000106740 | 0010 | 0A84 | 0000 | 000F | 0101 | 0011 | 01B1 | 0000 |
| 0000106760 | 0019 | 0102 | 0011 | 0A93 | 000D | 0010 | 0101 | 0012 |
| 0000107000 | 01CA | 0000 | 0018 | 0102 | 0012 | 0AA3 | 0000 | 000F |
| 0000107020 | 0101 | 0013 | 01E2 | 0000 | 0014 | 0102 | 0013 | 0AB2 |
| 0000107040 | 0000 | 0011 | 0101 | 0014 | 01F6 | 0000 | 0015 | 0102 |
| 0000107060 | 0014 | 0AC3 | 0000 | 0030 | 0101 | 0015 | 020B | 0000 |
| 0000107100 | 0017 | 0102 | 0015 | 0AF3 | 0000 | 000F | 0101 | 0016 |
| 0000107120 | 0222 | 0000 | 0015 | 0102 | 0016 | 0B02 | 0000 | 0012 |
| 0000107140 | 0101 | 0017 | 0237 | 0000 | 001A | 0102 | 0017 | 0B14 |
| 0000107160 | 0000 | 000D | 0101 | 0018 | 0251 | 0000 | 001A | 0102 |
| 0000107200 | 0018 | 0B21 | 0000 | 001E | 0101 | 0019 | 026B | 0000 |
| 0000107220 | 0019 | 0102 | 0019 | 0B3F | 0000 | 0031 | 0101 | 001A |
| 0000107240 | 0284 | 0000 | 0019 | 0102 | 001A | 0B70 | 0000 | 000C |
| 0000107260 | 0101 | 001B | 029D | 0000 | 0016 | 0102 | 001B | 0B7C |
| 0000107300 | 0000 | 001E | 0101 | 001C | 02B3 | 0000 | 0018 | 0102 |
| 0000107320 | 001C | 0B9A | 0000 | 001D | 0101 | 001D | 02CB | 0000 |
| 0000107340 | 0017 | 0102 | 001D | 0BB7 | 0000 | 001F | 0101 | 001E |
| 0000107360 | 02E2 | 0000 | 0015 | 0102 | 001E | 0BD6 | 0000 | 001B |
| 0000107400 | 0101 | 001F | 02F7 | 0000 | 0018 | 0102 | 001F | 0BF1 |
| 0000107420 | 0000 | 0042 | 0101 | 0020 | 030F | 0000 | 0016 | 0102 |
| 0000107440 | 0020 | 0C33 | 0000 | 000E | 0101 | 0021 | 0325 | 0000 |
| 0000107460 | 0018 | 0102 | 0021 | 0C41 | 0000 | 0010 | 0101 | 0022 |

THU MAR 14 17:46:58 1991 SYS.DLL PAGE 29, LINE 1653

| | | | | | | | | |
|---|---|---|---|---|---|---|---|---|
| 0000107500 | 033D | 0000 | 0018 | 0102 | 0022 | 0C51 | 0000 | 0010 |
| 0000107520 | 0101 | 0023 | 0355 | 0000 | 0019 | 0102 | 0023 | 0C61 |
| 0000107540 | 0000 | 0012 | 0101 | 0024 | 036E | 0000 | 0018 | 0102 |
| 0000107560 | 0024 | 0C73 | 0000 | 0041 | 0101 | 0025 | 0386 | 0000 |
| 0000107600 | 0017 | 0102 | 0025 | 0CB4 | 0000 | 000F | 0101 | 0026 |
| 0000107620 | 039D | 0000 | 0017 | 0102 | 0026 | 0CC3 | 0000 | 000E |
| 0000107640 | 0101 | 0027 | 03B4 | 0000 | 0017 | 0102 | 0027 | 0CD1 |
| 0000107660 | 0000 | 000E | 0101 | 0028 | 03CB | 0000 | 0017 | 0102 |
| 0000107700 | 0028 | 0CDF | 0000 | 000E | 0101 | 0029 | 03E2 | 0000 |
| 0000107720 | 0018 | 0102 | 0029 | 0CED | 0000 | 000F | 0101 | 002A |
| 0000107740 | 03FA | 0000 | 0015 | 0102 | 002A | 0CFC | 0000 | 000C |
| 0000107760 | 0101 | 002B | 040F | 0000 | 0019 | 0102 | 002B | 0D08 |
| 0000110000 | 0000 | 0056 | 0101 | 002C | 0428 | 0000 | 001A | 0102 |
| 0000110020 | 002C | 0D5E | 0000 | 0011 | 0101 | 002F | 0442 | 0000 |
| 0000110040 | 001A | 0102 | 002F | 0D6F | 0000 | 00AB | 0101 | 0030 |
| 0000110060 | 045C | 0000 | 001D | 0102 | 0030 | 0E1A | 0000 | 0024 |
| 0000110100 | 0101 | 0031 | 0479 | 0000 | 0016 | 0102 | 0031 | 0E3E |
| 0000110120 | 0000 | 000D | 0101 | 0032 | 048F | 0000 | 0016 | 0102 |
| 0000110140 | 0032 | 0E4B | 0000 | 000F | 0101 | 0033 | 04A5 | 0000 |
| 0000110160 | 0019 | 0102 | 0033 | 0E5A | 0000 | 0025 | 0101 | 0034 |
| 0000110200 | 04BE | 0000 | 0018 | 0102 | 0034 | 0E7F | 0000 | 0021 |
| 0000110220 | 0101 | 0035 | 04D6 | 0000 | 0017 | 0102 | 0035 | 0EA0 |
| 0000110240 | 0000 | 000F | 0101 | 0036 | 04ED | 0000 | 0017 | 0102 |
| 0000110260 | 0036 | 0EAF | 0000 | 000E | 0101 | 0037 | 0504 | 0000 |
| 0000110300 | 0018 | 0102 | 0037 | 0EBD | 0000 | 0010 | 0101 | 0038 |
| 0000110320 | 051C | 0000 | 0017 | 0102 | 0038 | 0ECD | 0000 | 000E |
| 0000110340 | 0101 | 0039 | 0533 | 0000 | 0018 | 0102 | 0039 | 0EDB |
| 0000110360 | 0000 | 000F | 0101 | 003A | 054B | 0000 | 0018 | 0102 |
| 0000110400 | 003A | 0EEA | 0000 | 000E | 0101 | 003B | 0563 | 0000 |
| 0000110420 | 0015 | 0102 | 003B | 0EF8 | 0000 | 001F | 0101 | 003C |
| 0000110440 | 0578 | 0000 | 001B | 0102 | 003C | 0F17 | 0000 | 001C |
| 0000110460 | 0106 | 0000 | 4990 | 0000 | 0021 | 424E | 3230 | 4E89 |
| 0000110500 | 0000 | | | | | | | |
| 0000110502 | | | | | | | | |

THU MAR 14 17:47:10 1991 SYSTEM.TCF PAGE 1, LINE 1

| | | | | | | | | |
|---|---|---|---|---|---|---|---|---|
| 0000000000 | 3154 | 3332 | 475F | 5053 | 485F | 5345 | 4E59 | 2043 |
| 0000000020 | 203D | 3234 | 0A0D | 3154 | 3332 | 475F | 5053 | 485F |
| 0000000040 | 4245 | 4E4C | 204B | 203D | 0D37 | 540A | 3231 | 5F33 |
| 0000000060 | 5347 | 5F50 | 5348 | 4C42 | 4B4E | 3D20 | 3720 | 0D38 |
| 0000000100 | 540A | 3231 | 5F33 | 5347 | 5F50 | 4556 | 5953 | 434E |
| 0000000120 | 3D20 | 3420 | 3830 | 0A0D | 3154 | 3332 | 475F | 5053 |
| 0000000140 | 565F | 4245 | 4E4C | 204B | 203D | 3832 | 0D20 | 540A |
| 0000000160 | 3231 | 5F33 | 5347 | 5F50 | 5356 | 4C42 | 4B4E | 3D20 |
| 0000000200 | 3720 | 3739 | 0A0D | 3154 | 3332 | 475F | 5053 | 545F |
| 0000000220 | 4D49 | 5245 | 3D20 | 3620 | 0D34 | 540A | 3231 | 5F33 |
| 0000000240 | 4946 | 454E | 485F | 524F | 5A49 | 445F | 5349 | 2050 |
| 0000000260 | 203D | 3331 | 0A0D | 3154 | 3332 | 435F | 4E48 | 5F4C |
| 0000000300 | 4F4D | 4544 | 3D20 | 3520 | 0A0D | 3154 | 3332 | 535F |
| 0000000320 | 5243 | 575F | 4449 | 4854 | 3D20 | 3120 | 3230 | 0D34 |
| 0000000340 | 540A | 3231 | 5F33 | 4353 | 5F52 | 4548 | 4749 | 5448 |
| 0000000360 | 3D20 | 3720 | 3836 | 0A0D | 3154 | 3332 | 535F | 5243 |
| 0000000400 | 445F | 5045 | 4854 | 3D20 | 3220 | 0D34 | 540A | 3231 |
| 0000000420 | 5F33 | 4353 | 5F52 | 414C | 5F59 | 4544 | 5450 | 2048 |
| 0000000440 | 203D | 0D38 | 200A | 0A0D | 3154 | 3332 | 435F | 5652 |
| 0000000460 | 445F | 4150 | 4854 | 0909 | 093D | 3A69 | 5C5C | 3174 |
| 0000000500 | 3332 | 5C5C | 6962 | 0D6E | 540A | 3231 | 5F33 | 4C47 |
| 0000000520 | 424F | 465F | 4C49 | 4554 | 5F52 | 494C | 2042 | 203D |
| 0000000540 | 3A74 | 0D2F | 540A | 3231 | 5F33 | 4C47 | 424F | 505F |
| 0000000560 | 494F | 544E | 5245 | 4C5F | 4249 | 3D20 | 7420 | 2F3A |
| 0000000600 | 0A0D | 3154 | 3332 | 495F | 504E | 535F | 464F | 5754 |
| 0000000620 | 5241 | 0945 | 093D | 6373 | 682E | 7865 | 0A0D | 3154 |
| 0000000640 | 3332 | 475F | 5053 | 535F | 464F | 5754 | 5241 | 0945 |
| 0000000660 | 093D | 7367 | 6D70 | 6E6F | 382E | 0A0D | 3154 | 3332 |
| 0000000700 | 495F | 504E | 505F | 494F | 544E | 5245 | 545F | 5059 |
| 0000000720 | 2045 | 203D | 6261 | 0D73 | 540A | 3231 | 5F33 | 4E49 |
| 0000000740 | 5F50 | 4F50 | 4E49 | 4554 | 5F52 | 414E | 454D | 3D20 |
| 0000000760 | 5320 | 4943 | 4554 | 0D58 | 540A | 3231 | 5F33 | 4E49 |
| 0000001000 | 5F50 | 4353 | 4C41 | 5F45 | 5546 | 434E | 3D09 | 7309 |
| 0000001020 | 2E63 | 6373 | 0D6C | 540A | 3231 | 5F33 | 4854 | 4552 |
| 0000001040 | 4853 | 4C4F | 0944 | 3D09 | 2020 | 3020 | 0A0D | 3154 |
| 0000001060 | 3332 | 535F | 4154 | 4942 | 494C | 5954 | 0909 | 203D |
| 0000001100 | 2020 | 0D33 | 540A | 3231 | 5F33 | 4143 | 5450 | 5255 |
| 0000001120 | 5F45 | 4954 | 454D | 554F | 2054 | 203D | 3034 | 3030 |
| 0000001140 | 0A0D | 3154 | 3332 | 535F | 4E59 | 5F43 | 4954 | 454D |
| 0000001160 | 554F | 2054 | 3D09 | 3220 | 3030 | 0D30 | 540A | 3231 |
| 0000001200 | 5F33 | 4544 | 4146 | 4C55 | 5F54 | 4954 | 454D | 3D20 |
| 0000001220 | 3120 | 0D30 | 540A | 3231 | 5F33 | 4E49 | 5F50 | 424B |
| 0000001240 | 5F44 | 414E | 454D | 3D20 | 6920 | 5C3A | 745C | 3231 |
| 0000001260 | 5C33 | 645C | 7461 | 5C5C | 6573 | 7574 | 5C70 | 735C |
| 0000001300 | 6963 | 6574 | 2E78 | 626B | 0D64 | 0D0A | 540A | 3231 |
| 0000001320 | 5F33 | 4E49 | 5F50 | 4B4D | 5945 | 0953 | 3D09 | 3020 |
| 0000001340 | 3078 | 0931 | 6F54 | 2070 | 0D5C | 090A | 0909 | 0909 |
| 0000001360 | 2020 | 7830 | 3230 | 4C09 | 6665 | 2074 | 0D5C | 090A |
| 0000001400 | 0909 | 0909 | 2020 | 7830 | 3430 | 4209 | 746F | 6F74 |
| 0000001420 | 206D | 0D5C | 090A | 0909 | 0909 | 2020 | 7830 | 3830 |
| 0000001440 | 5209 | 6769 | 7468 | 0A0D | 3154 | 3332 | 495F | 504E |
| 0000001460 | 525F | 4C45 | 4145 | 4553 | 5F44 | 4B4D | 5945 | 2053 |
| 0000001500 | 203D | 3531 | 0A0D | 3154 | 3332 | 495F | 504E | 4D5F |
| 0000001520 | 454B | 5F59 | 5250 | 5345 | 5F53 | 5349 | 315F | 3D20 |
| 0000001540 | 4620 | 4C41 | 4553 | 0A0D | 0A0D | 0A0D | 2023 | 2D2D |
| 0000001560 | 2D2D | 2D2D | 2D2D | 2D2D | 2D2D | 4320 | 6E6F | 6966 |
| 0000001600 | 7567 | 6172 | 6974 | 6E6F | 6620 | 6C69 | 2065 | 6F66 |
| 0000001620 | 2072 | 4350 | 6820 | 746F | 656B | 7379 | 6120 | 646E |
| 0000001640 | 7320 | 666F | 6B74 | 7965 | 2073 | 2D2D | 2D2D | 2D2D |

THU MAR 14 17:47:10 1991 SYSTEM.TCF PAGE 2, LINE 60

```
0000001660  2D2D  2D2D  2D2D  0A0D  0A0D  3154  3332  495F
0000001700  504E  535F  464F  4B54  5945  3D20  2209  6863
0000001720  6365  5F6B  6373  6572  6E65  2D20  3020  3778
0000001740  3A31  7270  7365  2C73  3020  3778  3A31  6572
0000001760  656C  7361  2265  0A0D  0A0D  3154  3332  495F
0000002000  504E  485F  544F  454B  2059  093D  3022  3278
0000002020  3A39  7270  7365  2C73  3020  3278  3A39  6572
0000002040  656C  7361  2265  5C20  0A0D  0909  0909  2209
0000002060  7830  4630  6D3A  756F  6573  0D22  090A  0909
0000002100  0909  0A0D  0A0D  0A0D  2023  2D2D  2D2D  2D2D
0000002120  2D2D  2D2D  2D2D  2D2D  2D2D  2D2D  2D2D  2D2D
0000002140  202D  654D  6964  2074  6F63  746E  6F72  206C
0000002160  6176  6972  6261  656C  2073  2D2D  2D2D  2D2D
0000002200  2D2D  2D2D  2D2D  2D2D  2D2D  2D2D  2D2D  2D2D
0000002220  2D2D  0A0D  0A0D  3154  3332  455F  435F  3D4D
0000002240  0D30  410A
0000002243
```

THU MAR 14 17:47:32 1991 TESTWIN.DLL PAGE 1, LINE 1

| | | | | | | | | |
|---|---|---|---|---|---|---|---|---|
| 0000000000 | 5A4D | 0061 | 0033 | 0000 | 0004 | 0000 | FFFF | 0000 |
| 0000000020 | 00B6 | 0000 | 0000 | 0000 | 0040 | 0000 | 0000 | 0000 |
| 0000000040 | 0000 | 0000 | 0000 | 0000 | 0000 | 0000 | 0000 | 0000 |
| 0000000060 | 0000 | 0000 | 0000 | 0000 | 0000 | 0000 | 0080 | 0000 |
| 0000000100 | 1F0E | 0EBA | B400 | CD09 | B821 | 4C01 | 21CD | 6854 |
| 0000000120 | 7369 | 7020 | 6F72 | 7267 | 6D61 | 6320 | 6E61 | 6F6E |
| 0000000140 | 2074 | 7572 | 206E | 6E69 | 4420 | 534F | 6D20 | 646F |
| 0000000160 | 2E65 | 0D0D | 240A | 0000 | 0000 | 0000 | 0000 | 0000 |
| 0000000200 | 454E | 0A05 | 02B8 | 004F | BDCB | 783C | 8006 | 0005 |
| 0000000220 | 0000 | 0000 | 2D9A | 0001 | 0000 | 0000 | 0005 | 0007 |
| 0000000240 | 000F | 0040 | 0068 | 0068 | 01EF | 01FD | 0387 | 0000 |
| 0000000260 | 0000 | 0004 | 0000 | 0001 | 0000 | 0000 | 0000 | 0000 |
| 0000000300 | 003A | 4BBD | 0D00 | 4BBE | 0527 | 00C6 | 0C01 | 0100 |
| 0000000320 | 0000 | 0000 | 0C01 | 0850 | 0000 | 0000 | 0C01 | 0220 |
| 0000000340 | 0534 | 10E7 | 0D01 | 1230 | 7407 | 7365 | 7774 | 6E69 |
| 0000000360 | 0000 | 540F | 5F57 | 4944 | 5053 | 414C | 5F59 | 4554 |
| 0000000400 | 5453 | 0001 | 5410 | 5F57 | 4553 | 5F54 | 454D | 554E |
| 0000000420 | 4D5F | 444F | 0245 | 0C00 | 5754 | 535F | 5641 | 5F45 |
| 0000000440 | 4554 | 5453 | 0003 | 5409 | 5F57 | 4553 | 5F54 | 4D45 |
| 0000000460 | 0004 | 540D | 5F57 | 4547 | 4354 | 4148 | 5F52 | 5441 |
| 0000000500 | 0005 | 4710 | 4E45 | 5245 | 4349 | 445F | 474C | 505F |
| 0000000520 | 4F52 | 0643 | 0A00 | 4D54 | 445F | 5349 | 5F50 | 4854 |
| 0000000540 | 0007 | 5411 | 5F57 | 4553 | 5F54 | 4F4E | 5552 | 5F4E |
| 0000000560 | 454D | 554E | 0008 | 540E | 5F57 | 4547 | 5F54 | 4D43 |
| 0000000600 | 4C5F | 4E49 | 0945 | 0A00 | 4D54 | 545F | 5F48 | 5250 |
| 0000000620 | 434F | 000A | 540D | 5F57 | 5550 | 4354 | 4148 | 5F52 |
| 0000000640 | 5441 | 000B | 5409 | 5F57 | 4946 | 494E | 4853 | 000C |
| 0000000660 | 5407 | 5F57 | 4E49 | 5449 | 000D | 540C | 5F57 | 5550 |
| 0000000700 | 5354 | 5254 | 415F | 0E54 | 1400 | 5754 | 555F | 4450 |
| 0000000720 | 5441 | 5F45 | 4143 | 4C4C | 435F | 4148 | 4E49 | 000F |
| 0000000740 | 420C | 5450 | 445F | 474C | 505F | 4F52 | 1043 | 1000 |
| 0000000760 | 5754 | 4E5F | 5745 | 545F | 5345 | 5F54 | 5250 | 434F |
| 0000001000 | 0011 | 540C | 5F57 | 5550 | 4853 | 435F | 4148 | 1252 |
| 0000001020 | 0600 | 5754 | 445F | 474C | 0013 | 540B | 5F57 | 4E57 |
| 0000001040 | 5F44 | 5250 | 434F | 0014 | 410E | 4F42 | 5455 | 445F |
| 0000001060 | 474C | 505F | 4F52 | 1543 | 0B00 | 5754 | 475F | 5445 |
| 0000001100 | 485F | 4F4D | 1644 | 0B00 | 5754 | 475F | 5445 | 485F |
| 0000001120 | 4E57 | 1744 | 0800 | 5754 | 555F | 504E | 5455 | 0018 |
| 0000001140 | 540B | 5F57 | 5550 | 4853 | 535F | 5254 | 0019 | 0100 |
| 0000001160 | 0A00 | 1000 | A500 | A800 | AE00 | B400 | 0000 | 4408 |
| 0000001200 | 534F | 4143 | 4C4C | 0553 | 4D50 | 4957 | 064E | 626C |
| 0000001220 | 7069 | 746D | 5F0D | 5842 | 415F | 5353 | 5245 | 4D54 |
| 0000001240 | 4753 | 5F0D | 5842 | 445F | 4245 | 4755 | 4F4D | 4544 |
| 0000001260 | 5F0D | 5842 | 545F | 4D49 | 5345 | 4F4D | 4544 | 5F09 |
| 0000001300 | 5842 | 425F | 535F | 4749 | 5F0E | 5842 | 445F | 4245 |
| 0000001320 | 4755 | 4E45 | 4554 | 0F52 | 425F | 5F58 | 4544 | 5542 |
| 0000001340 | 5247 | 5445 | 5255 | 0E4E | 425F | 5F58 | 4F56 | 4449 |
| 0000001360 | 4552 | 5554 | 4E52 | 5F0E | 5842 | 505F | 4341 | 464B |
| 0000001400 | 4C49 | 4554 | 0D52 | 425F | 5F58 | 5245 | 4F52 | 4D52 |
| 0000001420 | 444F | 0E45 | 425F | 5F58 | 4544 | 5542 | 4547 | 5252 |
| 0000001440 | 524F | 5502 | 0549 | 454D | 4944 | 0554 | 4244 | 505F |
| 0000001460 | 0649 | 7374 | 5F6C | 6669 | 0119 | 4501 | 0106 | 1234 |
| 0000001500 | DA01 | 0106 | 02DD | C701 | 0101 | 1BF7 | 4601 | 0124 |
| 0000001520 | 152F | B301 | 0102 | 24E9 | 1501 | 0102 | 076F | 0001 |
| 0000001540 | 0100 | 024B | 7901 | 011A | 1DF4 | A001 | 0120 | 030C |
| 0000001560 | A601 | 011B | 07B7 | 0501 | 0110 | 1198 | E401 | 0111 |
| 0000001600 | 0283 | 5C01 | 0003 | 0B00 | 6574 | 7473 | 6977 | 206E |
| 0000001620 | 4C44 | 004C | 0000 | 0000 | 0000 | 0000 | 0000 | 0000 |
| 0000001640 | 581E | 4590 | 8B55 | 1EEC | D88E | EC81 | 0028 | 5657 |

THU MAR 14 17:47:32 1991 TESTWIN.DLL PAGE 2, LINE 60

| | | | | | | | | |
|---|---|---|---|---|---|---|---|---|
| 0000001660 | B81E | FFFF | D88E | 46C7 | 51F6 | 8C00 | F85E | 46C7 |
| 0000001700 | 01F0 | 2B01 | 89C0 | E246 | 4689 | 8EE0 | 9006 | 260F |
| 0000001720 | 3E83 | FFFF | 7500 | E903 | 001D | 36FF | 0082 | 36FF |
| 0000001740 | 0080 | 468D | 16D8 | 9A50 | FFFF | 0000 | C483 | 3D08 |
| 0000001760 | 0000 | 0374 | 0FE9 | 8E00 | 9206 | 260F | 3E83 | FFFF |
| 0000002000 | 7500 | E903 | 003A | 681E | 0058 | 468D | 16E4 | 8D50 |
| 0000002020 | D846 | 5016 | 468D | 16F2 | 6A50 | 1E3E | 8468 | FF00 |
| 0000002040 | 7E36 | FF00 | 7C36 | FF00 | 8236 | FF00 | 8036 | 9A0U |
| 0000002060 | FFFF | 0000 | C483 | 891E | F246 | 5689 | E9F4 | 0008 |
| 0000002100 | C02B | 4689 | 89F4 | F246 | 468D | 16FA | 9A50 | FFFF |
| 0000002120 | 0000 | 068E | 0F94 | 8326 | CF3E | 0000 | 0375 | 5FE9 |
| 0000002140 | 8B00 | FC46 | 460B | 74FA | E903 | 0054 | 8326 | FF3E |
| 0000002160 | 00FF | 0375 | 49E9 | 1E00 | 5F68 | 8E00 | 9606 | 260F |
| 0000002200 | 36FF | 0002 | FF26 | FF36 | 8DFF | E446 | 5016 | 468D |
| 0000002220 | 16F2 | 8D50 | D846 | 5016 | 681E | 0084 | 416A | 36FF |
| 0000002240 | 007E | 36FF | 007C | 36FF | 0082 | 36FF | 0080 | 681E |
| 0000002260 | 0073 | FF68 | 68FF | FFFF | FF9A | 00FF | 8300 | 2AC4 |
| 0000002300 | 068E | 0F90 | 8326 | 323E | 0000 | 0375 | 09E9 | 8300 |
| 0000002320 | DC7E | 74FE | E903 | 000F | 068E | 0F92 | 8326 | 5E3E |
| 0000002340 | 0000 | 0375 | 5FE9 | FF00 | FC76 | 76FF | 6AFA | 6A00 |
| 0000002360 | 9A00 | 03B0 | C1B3 | C483 | 8908 | DE46 | 76FF | FFE2 |
| 0000002400 | E076 | 468D | 16DE | FF50 | F076 | 76FF | FFF8 | F676 |
| 0000002420 | 4E8D | 16E4 | 8D51 | F24E | 5116 | 4E8D | 16D8 | 1E51 |
| 0000002440 | 8468 | 6A00 | FF43 | 7E36 | FF00 | 7C36 | FF00 | 8236 |
| 0000002460 | FF00 | 8036 | 9A00 | FFFF | 0000 | C483 | 8B28 | DE46 |
| 0000002500 | 18E9 | E900 | 0015 | 76FF | FFFC | FA76 | 006A | 006A |
| 0000002520 | B09A | FF03 | 83FF | 08C4 | 00E9 | 1F00 | 5F5E | ED83 |
| 0000002540 | 8B02 | 1FE5 | 4D5D | 1ECB | 9058 | 5545 | EC8B | 8E1E |
| 0000002560 | 81D8 | 06EC | 5700 | 1E56 | 12B8 | 8E00 | FFD8 | 0876 |
| 0000002600 | 76FF | 8D06 | FA46 | 5016 | FF9A | 00FF | 8900 | FC46 |
| 0000002620 | 7E83 | 00FC | 0374 | 09E9 | 8A00 | FA46 | 08E9 | E900 |
| 0000002640 | 0005 | 00B0 | 00E9 | 1F00 | 5F5E | ED83 | 8B02 | 1FE5 |
| 0000002660 | 4D5D | 04CA | 1E00 | 9058 | 5545 | EC8B | 8E1E | 81D8 |
| 0000002700 | 00EC | 5700 | 1E56 | D9B8 | 8E01 | 8AD8 | 0A46 | FF50 |
| 0000002720 | 0876 | 76FF | 9A06 | FFFF | 0000 | 00E9 | 1F00 | 5F5E |
| 0000002740 | ED83 | 8B02 | 1FE5 | 4D5D | 06CA | 1E00 | 9058 | 5545 |
| 0000002760 | EC8B | 8E1E | 81D8 | 00EC | 5700 | 1E56 | 27B8 | 8E02 |
| 0000003000 | FFD8 | 0876 | 76FF | FF06 | 0C76 | 76FF | 9A0A | FFFF |
| 0000003020 | 0000 | 00E9 | 1F00 | 5F5E | ED83 | 8B02 | 1FE5 | 4D5D |
| 0000003040 | 08CA | 1E00 | 9058 | 5545 | EC8B | 8E1E | 81D8 | 00EC |
| 0000003060 | 5700 | 1E56 | 5DB8 | 8E02 | 8AD8 | 0646 | 9A50 | FFFF |
| 0000003100 | 0000 | 00E9 | 1F00 | 5F5E | ED83 | 8B02 | 1FE5 | 4D5D |
| 0000003120 | 02CA | 1E00 | 9058 | 5545 | EC8B | 8E1E | 81D8 | 00EC |
| 0000003140 | 5700 | 1E56 | 95B8 | 8E02 | 9AD8 | FFFF | 0000 | 00E9 |
| 0000003160 | 1F00 | 5F5E | ED83 | 8B02 | 1FE5 | 4D5D | 1ECB | 9058 |
| 0000003200 | 5545 | EC8B | 8E1E | 81D8 | 00EC | 5700 | 1E56 | C5B8 |
| 0000003220 | 8E02 | FFD8 | 0676 | FF9A | 00FF | E900 | 0000 | 5E1F |
| 0000003240 | 835F | 02ED | E58B | 5D1F | CA4D | 0002 | 581E | 4590 |
| 0000003260 | 8B55 | 1EEC | D88E | EC81 | 0000 | 5657 | B81E | 02EF |
| 0000003300 | D88E | 7E83 | 0006 | 0374 | 1AE9 | 6A00 | 9A00 | 033E |
| 0000003320 | 0000 | 468A | 5008 | 4A9A | 0003 | 6A00 | 9A01 | FFFF |
| 0000003340 | 0000 | 09E9 | 8A00 | 0846 | 9A50 | FFFF | 0000 | 5E1F |
| 0000003360 | 835F | 02ED | E58B | 5D1F | CA4D | 0004 | 581E | 4590 |
| 0000003400 | 8B55 | 1EEC | D88E | EC81 | 0000 | 5657 | B81E | 031E |
| 0000003420 | D88E | 7E83 | 0006 | 0374 | 1CE9 | 6A00 | 9A00 | 0390 |
| 0000003440 | 0000 | 76FF | FF0A | 0876 | 9E9A | 0003 | 6A00 | 9A01 |
| 0000003460 | 032E | 0000 | 0BE9 | FF00 | 0A76 | 76FF | 9A08 | FFFF |
| 0000003500 | 0000 | 5E1F | 835F | 02ED | E58B | 5D1F | CA4D | 0006 |
| 0000003520 | 581E | 4590 | 8B55 | 1EEC | D88E | EC81 | 00AA | 5657 |

THU MAR 14 17:47:32 1991 TESTWIN.DLL PAGE 3, LINE 119

| | | | | | | | | |
|---|---|---|---|---|---|---|---|---|
| 0000003540 | 868D | FF5E | 5016 | 8068 | 1E00 | 4168 | 6801 | FFFF |
| 0000003560 | 0468 | 9A00 | FFFF | 0000 | 4689 | 83DE | DE7E | 7500 |
| 0000003600 | E903 | 0006 | 08B8 | E900 | 0250 | 76FF | FF0C | 0A76 |
| 0000003620 | 681E | 0350 | 5468 | 6801 | FFFF | 006A | 046A | 006A |
| 0000003640 | FF9A | 00FF | 3D00 | 0000 | 0374 | 06E9 | B800 | 0008 |
| 0000003660 | 27E9 | C702 | 5A86 | FFFF | C7CC | 5C86 | 00FF | 6A00 |
| 0000003700 | 6A00 | 6A01 | 6A00 | 8D0F | 5A86 | 16FF | 1E50 | 5068 |
| 0000003720 | 1E03 | 5468 | 6803 | 8000 | 006A | 068E | 0F98 | FF26 |
| 0000003740 | 0436 | 6A00 | 1E01 | E868 | 9A10 | FFFF | 0000 | F0A3 |
| 0000003760 | 8911 | F216 | A111 | 11F2 | 060B | 11F0 | 0374 | 19E9 |
| 0000004000 | FFQ0 | 0C76 | 76FF | 9A0A | FFFF | 0000 | 8689 | FF56 |
| 0000004020 | 9689 | FF58 | 08B8 | E900 | 01C0 | 016A | FF9A | 00FF |
| 0000004040 | FF00 | F236 | FF11 | F036 | 1E11 | 5468 | 9A03 | FFFF |
| 0000004060 | 0000 | 36FF | 11F2 | 36FF | 11F0 | FF9A | 00FF | FF00 |
| 0000004100 | 0C76 | 76FF | FF0A | F236 | FF11 | F036 | 9A11 | FFFF |
| 0000004120 | 0000 | 36FF | 10EA | 36FF | 10E8 | FF9A | 00FF | FF00 |
| 0000004140 | F236 | FF11 | F036 | 6A11 | 9A01 | FFFF | 0000 | FF9A |
| 0000004160 | 00FF | 8E00 | 8BC2 | 26D8 | 7F83 | 000E | 0375 | 29E9 |
| 0000004200 | C700 | E446 | 2000 | 006A | 006A | 468D | 16E4 | 6850 |
| 0000004220 | 0133 | 068E | 0F9A | FF26 | 0236 | 2600 | 36FF | 0000 |
| 0000004240 | 026A | 889A | 0F10 | 8305 | 10C4 | 046A | 3C9A | 3B3C |
| 0000004260 | 8305 | 02C4 | 4689 | 89E0 | E256 | 006A | 006A | 046A |
| 0000004300 | 681E | 0144 | 468D | 16E0 | 9A50 | FFFF | 0000 | 681E |
| 0000004320 | 015A | 76FF | FFE2 | E076 | 309A | 553F | 8305 | 08C4 |
| 0000004340 | 003D | 7500 | E903 | 001A | 681E | 015E | 76FF | FFE2 |
| 0000004360 | E076 | 309A | F53F | 8305 | 08C4 | 003D | 7400 | E903 |
| 0000004400 | 0086 | 068E | 0F9A | FF26 | 0236 | 2600 | 36FF | 0000 |
| 0000004420 | 8268 | 6A01 | 6801 | 01F4 | 468D | 16EA | 9A50 | 05A1 |
| 0000004440 | 0000 | 468B | 8BF2 | F456 | 4689 | 89E6 | E856 | 76FF |
| 0000004460 | FFE8 | E676 | 8168 | 6A01 | 6801 | 01FA | 006A | 006A |
| 0000004500 | C19A | 0005 | 8E00 | 9A06 | 260F | 36FF | 0002 | FF26 |
| 0000004520 | 0036 | 6800 | 0182 | 016A | 2C68 | 8D01 | EA46 | 5016 |
| 0000004540 | E49A | 0005 | 8B00 | F246 | 568B | 89F4 | FA46 | 5689 |
| 0000004560 | FFFC | FC76 | 76FF | 68FA | 0181 | 016A | 2F68 | 6A01 |
| 0000004600 | 6A00 | 9A00 | 0615 | 0000 | 681E | 0163 | 76FF | FFE2 |
| 0000004620 | E076 | 309A | F53F | 8303 | 08C4 | 003D | 7400 | E903 |
| 0000004640 | 0017 | 76FF | FFE8 | E676 | 8168 | 6A01 | 6801 | 01F9 |
| 0000004660 | 006A | 006A | FF9A | 00FF | 8E00 | 9806 | 260F | 36FF |
| 0000004700 | 0004 | FF9A | 00FF | FF00 | EA36 | FF10 | E836 | 9A10 |
| 0000004720 | FFFF | 0000 | 00B8 | E900 | 0000 | 5F5E | ED83 | 8B02 |
| 0000004740 | 1FE5 | 4D5D | 1ECB | 9058 | 5545 | EC8B | 8E1E | 81D8 |
| 0000004760 | 06EC | 5700 | 1E56 | 6EB8 | 8E03 | FFD8 | 0C76 | 76FF |
| 0000005000 | FF0A | 0876 | 76FF | 8D06 | FC46 | 5016 | FF9A | 00FF |
| 0000005020 | 8900 | FA46 | 7E83 | 11FA | 0374 | 0BE9 | FF00 | FC76 |
| 0000005040 | C29A | 0006 | E900 | 003E | 7E83 | 01FA | C01B | 3D40 |
| 0000005060 | 0000 | 0375 | 09E9 | 8B00 | FA46 | 2FE9 | E900 | 0026 |
| 0000005100 | 006A | BA9A | 0006 | FF00 | FC76 | FF9A | 00FF | FF00 |
| 0000005120 | FC76 | FF9A | 00FF | 6A00 | 9A01 | FFFF | 0000 | 76FF |
| 0000005140 | 9AFC | FFFF | 0000 | 00B8 | E900 | 0000 | 5E1F | 835F |
| 0000005160 | 02ED | E58B | 5D1F | CA4D | 0008 | 581E | 4590 | 8B55 |
| 0000005200 | 1EEC | D88E | EC81 | 0006 | 5657 | B81E | 0657 | D88E |
| 0000005220 | 76FF | FF0C | 0A76 | 76FF | FF08 | 0676 | 468D | 16FC |
| 0000005240 | 9A50 | FFFF | 0000 | 4689 | 3DFA | 0001 | C01B | 3D40 |
| 0000005260 | 0000 | 0375 | 06E9 | 8B00 | FA46 | 44E9 | FF00 | FC76 |
| 0000005300 | FF9A | 00FF | 8900 | FA46 | 013D | 1B00 | 40C0 | 003D |
| 0000005320 | 7500 | E903 | 0006 | 468B | E9FA | 0025 | 76FF | 9AFC |
| 0000005340 | 06B3 | 0000 | 4689 | 3DFA | 0001 | C01B | 3D40 | 0000 |
| 0000005360 | 0375 | 06E9 | 8B00 | FA46 | 06E9 | B800 | 0000 | 00E9 |
| 0000005400 | 1F00 | 5F5E | ED83 | 8B02 | 1FE5 | 4D5D | 08CA | 1E00 |

THU MAR 14 17:47:32 1991 TESTWIN.DLL PAGE 4, LINE 178

| | | | | | | | | |
|---|---|---|---|---|---|---|---|---|
| 0000005420 | 9058 | 5545 | EC8B | 8E1E | 81D8 | 00EC | 5700 | 1E56 |
| 0000005440 | ECB8 | 8E06 | 9AD8 | FFFF | 0000 | 36FF | 11F2 | 36FF |
| 0000005460 | 11F0 | FF9A | 00FF | 8E00 | 9806 | 260F | 36FF | 0004 |
| 0000005500 | FF9A | 00FF | B800 | 0000 | 00E9 | 1F00 | 5F5E | ED83 |
| 0000005520 | 8B02 | 1FE5 | 4D5D | 1ECB | 9058 | 5545 | EC8B | 8E1E |
| 0000005540 | 81D8 | 10EC | 5700 | 1E56 | 81B8 | 8E07 | 8BD8 | 0E46 |
| 0000005560 | E2E9 | FF07 | 0C76 | 76FF | 8E0A | 9A06 | 260F | 36FF |
| 0000005600 | 0002 | FF26 | 0036 | 9A00 | 232D | 0824 | C483 | E908 |
| 0000005620 | 07FC | 76FF | FF12 | 1076 | 056A | 006A | FF9A | 00FF |
| 0000005640 | 5200 | 6850 | 8005 | FF9A | 00FF | 8E00 | 9A06 | 260F |
| 0000005660 | 00A3 | 2600 | 1689 | 0002 | D3E9 | 8B07 | 0A46 | 16E9 |
| 0000005700 | 9A00 | 166A | 082C | 21E9 | 9A00 | 17A2 | 0872 | 19E9 |
| 0000005720 | E900 | 0016 | 13E9 | 2D00 | 028A | 0375 | E2E9 | 2DFF |
| 0000005740 | 0064 | 0375 | E2E9 | E9FF | FFE7 | A1E9 | 6A07 | 9A07 |
| 0000005760 | 08BC | 0000 | 00B8 | BA00 | 0000 | 9AE9 | 8B07 | 0A46 |
| 0000006000 | D1E9 | FF05 | F236 | FF11 | F036 | 1E11 | F868 | 9A03 |
| 0000006020 | 1BA6 | 089D | 4689 | 83F8 | F87E | 7500 | E903 | 000B |
| 0000006040 | 006A | 681E | 0402 | B29A | 0008 | E900 | 069C | 36FF |
| 0000006060 | 11F2 | 36FF | 11F0 | 681E | 03BC | A69A | E61B | 8908 |
| 0000006100 | F846 | 7E83 | 00F8 | 0375 | 0BE9 | 6A00 | 1E01 | C668 |
| 0000006120 | 9A03 | 08FB | 0000 | 71E9 | 6A06 | 9A02 | 08C6 | 0000 |
| 0000006140 | 67E9 | 6A06 | 9A03 | 08D0 | 0000 | 5DE9 | 6A06 | 9A04 |
| 0000006160 | FFFF | 0000 | 53E9 | FF06 | F236 | FF11 | F036 | 1E11 |
| 0000006200 | 3468 | 9A04 | 1BA6 | 0911 | 4689 | 83F8 | F87E | 7500 |
| 0000006220 | E903 | 000B | 056A | 681E | 043E | 269A | 0009 | E900 |
| 0000006240 | 0628 | 36FF | 11F2 | 36FF | 11F0 | 681E | 0434 | A69A |
| 0000006260 | 051B | 8905 | F846 | 7E83 | 00F8 | 0375 | 0BE9 | 6A00 |
| 0000006300 | 1E06 | 3E68 | 9A04 | FFFF | 0000 | FDE9 | 6A05 | 6A00 |
| 0000006320 | FF01 | 1276 | 76FF | 6810 | 09A1 | FF68 | 8EFF | 9806 |
| 0000006340 | 260F | 36FF | 0004 | E768 | 6A03 | 6A00 | 9A00 | FFFF |
| 0000006360 | 0000 | D5E9 | 6A05 | 9A08 | 0962 | 0000 | CBE9 | 6A05 |
| 0000006400 | 9A09 | 096C | 0000 | C1E9 | 6A05 | 9A0A | 0976 | 0000 |
| 0000006420 | B7E9 | 6A05 | 9A0B | 0850 | 0000 | ADE9 | C705 | FA46 |
| 0000006440 | 2000 | 006A | 006A | 468D | 16FA | 6850 | 0131 | 068E |
| 0000006460 | 0F9A | FF26 | 0236 | 2600 | 36FF | 0000 | 036A | 889A |
| 0000006500 | CE10 | 8309 | 10C4 | 46F6 | 20FB | 0375 | 30E9 | 6A00 |
| 0000006520 | 6A00 | 8D00 | FA46 | 5016 | 3168 | 8E01 | 9A06 | 260F |
| 0000006540 | 36FF | 0002 | FF26 | 0036 | 6A00 | 9A04 | 1088 | 0A03 |
| 0000006560 | C483 | 6A10 | 6A0C | 9A00 | 0A0D | 0000 | 32E9 | C700 |
| 0000006600 | FA46 | 2000 | 006A | 006A | 468D | 16FA | 6850 | 0131 |
| 0000006620 | 068E | 0F9A | FF26 | 0236 | 2600 | 36FF | 0000 | 026A |
| 0000006640 | 889A | 3810 | 830A | 10C4 | 0C6A | 016A | 6F9A | 000A |
| 0000006660 | E900 | 0516 | 46C7 | 00FA | 6A20 | 6A00 | 8D00 | FA46 |
| 0000006700 | 5016 | 3268 | 8E01 | 9A06 | 260F | 36FF | 0002 | FF26 |
| 0000006720 | 0036 | 6A00 | 9A03 | 1088 | 0A65 | C483 | F610 | FB46 |
| 0000006740 | 7520 | E903 | 0030 | 006A | 006A | 468D | 16FA | 6850 |
| 0000006760 | 0132 | 068E | 0F9A | FF26 | 0236 | 2600 | 36FF | 0000 |
| 0000007000 | 046A | 889A | CA10 | 830A | 10C4 | 0D6A | 006A | A49A |
| 0000007020 | 000A | E900 | 0032 | 46C7 | 00FA | 6A20 | 6A00 | 8D00 |
| 0000007040 | FA46 | 5016 | 3268 | 8E01 | 9A06 | 260F | 36FF | 0002 |
| 0000007060 | FF26 | 0036 | 6A00 | 9A02 | 1088 | 0ACF | C483 | 6A10 |
| 0000007100 | 6A0D | 9A01 | 0B06 | 0000 | 7FE9 | C704 | FA46 | 2000 |
| 0000007120 | 006A | 006A | 468D | 16FA | 6850 | 0133 | 068E | 0F9A |
| 0000007140 | FF26 | 0236 | 2600 | 36FF | 0000 | 036A | 889A | FC10 |
| 0000007160 | 830A | 10C4 | 46F6 | 20FB | 0375 | 30E9 | 6A00 | 6A00 |
| 0000007200 | 8D00 | FA46 | 5016 | 3368 | 8E01 | 9A06 | 260F | 36FF |
| 0000007220 | 0002 | FF26 | 0036 | 6A00 | 9A04 | 1088 | 0B31 | C483 |
| 0000007240 | 6A10 | 6A0E | 9A00 | 0B3B | 0000 | 32E9 | C700 | FA46 |
| 0000007260 | 2000 | 006A | 006A | 468D | 16FA | 6850 | 0133 | 068E |

THU MAR 14 17:47:32 1991 TESTWIN.DLL PAGE 5, LINE 237

| | | | | | | | | |
|---|---|---|---|---|---|---|---|---|
| 0000007300 | 0F9A | FF26 | 0236 | 2600 | 36FF | 0000 | 026A | 889A |
| 0000007320 | 6A10 | 830B | 10C4 | 0E6A | 016A | 549A | 000B | E900 |
| 0000007340 | 03E8 | FF9A | 00FF | 3D00 | 0002 | 0374 | 0CE9 | 6A00 |
| 0000007360 | 6A0F | 9A00 | FFFF | 0000 | 5AE9 | FF00 | F236 | FF11 |
| 0000007400 | F036 | 1E11 | 7068 | 9A04 | 1BA6 | 0B80 | 4689 | 83F8 |
| 0000007420 | F87E | 7400 | E903 | 0003 | AFE9 | 6A03 | 9A1E | 3C3C |
| 0000007440 | 07EA | C483 | 8902 | F446 | 5689 | C4F6 | F45E | C726 |
| 0000007460 | 0C47 | 000F | 5EC4 | 26F4 | 47C7 | 0114 | C400 | F45E |
| 0000007500 | C726 | 1A47 | 047A | 8C26 | 1C5F | 76FF | FFF6 | F476 |
| 0000007520 | FF9A | 00FF | E900 | 0372 | 106A | C59A | 000B | E900 |
| 0000007540 | 0368 | 116A | CF9A | 000B | E900 | 035E | 126A | D99A |
| 0000007560 | 000B | E900 | 0354 | 136A | E39A | 000B | E900 | 034A |
| 0000007600 | 146A | ED9A | 000B | E900 | 0340 | 156A | F79A | 000B |
| 0000007620 | E900 | 0336 | 166A | 989A | 000C | E900 | 032C | 46C7 |
| 0000007640 | 00FA | 6A20 | 6A00 | 8D00 | FA46 | 5016 | 9768 | 8E01 |
| 0000007660 | 9A06 | 260F | 36FF | 0002 | FF26 | 0036 | 6A00 | 9A03 |
| 0000007700 | 1088 | 0C4F | C483 | F610 | FB46 | 7520 | E903 | 0030 |
| 0000007720 | 006A | 006A | 468D | 16FA | 6850 | 0197 | 068E | 0F9A |
| 0000007740 | FF26 | 0236 | 2600 | 36FF | 0000 | 046A | 889A | 8410 |
| 0000007760 | 830C | 10C4 | 176A | 006A | 8E9A | 000C | E900 | 0032 |
| 0000010000 | 46C7 | 00FA | 6A20 | 6A00 | 8D00 | FA46 | 5016 | 9768 |
| 0000010020 | 8E01 | 9A06 | 260F | 36FF | 0002 | FF26 | 0036 | 6A00 |
| 0000010040 | 9A02 | 1088 | 0CC3 | C483 | 6A10 | 6A17 | 9A01 | 0CFA |
| 0000010060 | 0000 | 95E9 | 6A02 | 9A18 | 0D39 | 0000 | 8BE9 | C702 |
| 0000010100 | FA46 | 2000 | 006A | 006A | 468D | 16FA | 6850 | 019A |
| 0000010120 | 068E | 0F9A | FF26 | 0236 | 2600 | 36FF | 0000 | 036A |
| 0000010140 | 889A | F010 | 830C | 10C4 | 46F6 | 20FB | 0375 | 30E9 |
| 0000010160 | 6A00 | 6A00 | 8D00 | FA46 | 5016 | 9A68 | 8E01 | 9A06 |
| 0000010200 | 260F | 36FF | 0002 | FF26 | 0036 | 6A00 | 9A04 | 1088 |
| 0000010220 | 0D25 | C483 | 6A10 | 6A19 | 9A00 | 0D2F | 0000 | 32E9 |
| 0000010240 | C700 | FA46 | 2000 | 006A | 006A | 468D | 16FA | 6850 |
| 0000010260 | 019A | 068E | 0F9A | FF26 | 0236 | 2600 | 36FF | 0000 |
| 0000010300 | 026A | 889A | 3810 | 8309 | 10C4 | 196A | 016A | D89A |
| 0000010320 | 0009 | E900 | 01F4 | 1A6A | 439A | 000D | E900 | 01EA |
| 0000010340 | 1B6A | 4D9A | 000D | E900 | 01E0 | 1C6A | 579A | 000D |
| 0000010360 | E900 | 01D6 | 1D6A | 619A | 000D | E900 | 01CC | 1F6A |
| 0000010400 | 6B9A | 000D | E900 | 01C2 | 1E6A | 8D9A | 000D | E900 |
| 0000010420 | 01B8 | 681E | 04B0 | 2168 | 9A41 | FFFF | 0000 | 4689 |
| 0000010440 | 83F8 | F87E | 7401 | E903 | 0007 | 216A | 589A | 0009 |
| 0000010460 | E900 | 0196 | 36FF | 11F2 | 36FF | 11F0 | 969A | 2222 |
| 0000010500 | 830C | 04C4 | 83E9 | 6A01 | 9A22 | 0BBB | 0000 | 79E9 |
| 0000010520 | 8101 | 0A7E | 028A | 0377 | 2CE9 | 8100 | 0A7E | 02BB |
| 0000010540 | 0372 | 22E9 | 8B00 | 0A46 | 8A2D | 8902 | F046 | 3E83 |
| 0000010560 | 11F4 | 7F00 | E903 | 000C | 266A | 468B | 48F0 | 9A50 |
| 0000010600 | 0C59 | 0000 | 43E9 | 8101 | 0A7E | 02EE | 0377 | 40E9 |
| 0000010620 | 8100 | 0A7E | 031F | 0372 | 36E9 | 8B00 | 0A46 | 4689 |
| 0000010640 | 8EF0 | 9A06 | 260F | 36FF | 0002 | FF26 | 0036 | 6800 |
| 0000010660 | 018B | 468B | BAF0 | 00FF | 5052 | 681E | 10F0 | 7E9A |
| 0000010700 | 0005 | 6A00 | 1E01 | F068 | 9A10 | 0887 | 0000 | F9E9 |
| 0000010720 | E900 | 00F6 | 933D | 7501 | E903 | FD9A | 0376 | 73E9 |
| 0000010740 | 3D00 | 012D | 0375 | 0CE9 | 76FB | E903 | 0023 | 652D |
| 0000010760 | 3D00 | 0007 | 0376 | 58E9 | D1FF | 93E0 | FF2E | 61A7 |
| 0000011000 | 630E | 8E08 | B908 | C308 | CD08 | D708 | 0208 | 2D09 |
| 0000011020 | 3D09 | 0131 | 0375 | 04E9 | 76FB | E903 | 0017 | 2E2D |
| 0000011040 | 7501 | E903 | FAD9 | 7548 | E903 | FADD | 7548 | E903 |
| 0000011060 | FAE1 | 1CE9 | 2DFF | 0132 | 0375 | 77E9 | 48FB | 0375 |
| 0000011100 | 08E9 | 2DFC | 005E | 0375 | 97E9 | 48FC | 0375 | 11E9 |
| 0000011120 | E9FD | FEFD | F53D | 7501 | E903 | FE7A | 0376 | 23E9 |
| 0000011140 | 2D00 | 0194 | 073D | 7600 | E903 | FEE5 | E0D1 | 2E93 |

THU MAR 14 17:47:32 1991 TESTWIN.DLL PAGE 6, LINE 296

| | | | | | | | | |
|---|---|---|---|---|---|---|---|---|
| 0000011160 | A7FF | 0ED4 | 0BE0 | 0BEA | 0BF4 | 0BFE | 0C95 | 0BCC |
| 0000011200 | 0C9F | 0BB8 | F93D | 7501 | E903 | FE72 | 0376 | 17E9 |
| 0000011220 | 2D00 | 01F6 | 0375 | 47E9 | 48FE | 0375 | 4BE9 | 48FE |
| 0000011240 | 0375 | 4FE9 | E9FE | FEA9 | FA2D | 7501 | E903 | FE58 |
| 0000011260 | 5F2D | 7500 | E903 | FE7C | 4848 | 0375 | 53E9 | 2DFE |
| 0000011300 | 0061 | 0375 | 80E9 | E9FE | FE87 | C1E9 | 6A00 | 9A01 |
| 0000011320 | 047D | 0000 | 76FF | FF12 | 1076 | 76FF | FF0E | 0C76 |
| 0000011340 | 76FF | FF0A | 0876 | 76FF | 8D06 | FC46 | 5016 | 4E8D |
| 0000011360 | 16F2 | 9A51 | FFFF | 0000 | 76FF | FFFC | F276 | FF9A |
| 0000011400 | 00FF | FF00 | FC76 | F79A | 0002 | 6A00 | 9A23 | 0DAA |
| 0000011420 | 0000 | 76FF | FF12 | 1076 | 76FF | FF0E | 0C76 | 76FF |
| 0000011440 | FF0A | 0876 | 76FF | 9A06 | 0FA8 | 0000 | 68E9 | E900 |
| 0000011460 | 005C | 76FF | FF12 | 1076 | 76FF | FF0E | 0C76 | 76FF |
| 0000011500 | FF0A | 0876 | 76FF | 9A06 | FFFF | 0000 | 48E9 | E900 |
| 0000011520 | 003C | 39E9 | 3D00 | 0029 | 0375 | 90E9 | 76F8 | E903 |
| 0000011540 | 0011 | 7548 | E903 | F82A | 1F2D | 7500 | E903 | F88D |
| 0000011560 | BFE9 | 2DFF | 0033 | 0375 | 40E9 | 2DF8 | 0041 | 0375 |
| 0000011600 | 4AE9 | 2DFF | 0F92 | 0375 | E8E9 | E9F7 | FFA4 | 00B8 |
| 0000011620 | BA00 | 0000 | 00E9 | 1F00 | 5F5E | ED83 | 8B02 | 1FE5 |
| 0000011640 | 4D5D | 0ECA | 1E00 | 9058 | 5545 | EC8B | 8E1E | 81D8 |
| 0000011660 | 00EC | 5700 | 1E56 | C9B8 | 8E07 | 8BD8 | 0E46 | 45E9 |
| 0000011700 | 8B00 | 0A46 | 16E9 | FF00 | 1276 | 76FF | 6A10 | 9A01 |
| 0000011720 | FFFF | 0000 | 0FE9 | E900 | 000C | 09E9 | 4800 | 0375 |
| 0000011740 | E4E9 | E9FF | FFF1 | 76FF | FF12 | 1076 | 76FF | FF0E |
| 0000011760 | 0C76 | 76FF | FF0A | 0876 | 76FF | 9A06 | FFFF | 0000 |
| 0000012000 | 17E9 | E900 | 000B | 202D | 7500 | E903 | FFB3 | D5E9 |
| 0000012020 | B8FF | 0000 | 00BA | E900 | 0000 | 5E1F | 835F | 02ED |
| 0000012040 | E58B | 5D1F | CA4D | 000E | 581E | 4590 | 8B55 | 1EEC |
| 0000012060 | D88E | EC81 | 0004 | 5657 | 468B | E906 | 00C7 | 76FF |
| 0000012100 | FF0A | 0B76 | 8E6B | 8B01 | 0C46 | D22B | 5052 | 76FF |
| 0000012120 | FF14 | 1276 | D79A | 0010 | E900 | 00CB | 76FF | FF0A |
| 0000012140 | 0876 | 8B68 | C401 | 0E5E | 468B | 260C | 178B | 5052 |
| 0000012160 | 76FF | FF14 | 1276 | 039A | 0011 | E900 | 00A9 | 76FF |
| 0000012200 | FF0A | 0876 | 9268 | 8B01 | 0C46 | 01BA | 5200 | C450 |
| 0000012220 | 0E5E | 8B26 | 2B07 | C4C9 | 0E5E | 0B26 | 0D0F | 0000 |
| 0000012240 | 5150 | 269A | 0011 | E900 | 007D | 76FF | FF0A | 0876 |
| 0000012260 | 9268 | 8B01 | 0C46 | 01BA | 5200 | C450 | 0E5E | 8B26 |
| 0000012300 | 2B07 | 52D2 | 9A50 | 1149 | 0000 | 5AE9 | FF00 | 0A76 |
| 0000012320 | 76FF | 6808 | 0191 | 468B | BA0C | 0001 | 5052 | 5EC4 |
| 0000012340 | 260E | 078B | D22B | 5052 | 1F9A | 000E | 8900 | FC46 |
| 0000012360 | 468B | C4FC | 0E5E | 8926 | E907 | 002B | 13B8 | E900 |
| 0000012400 | 002B | 22E9 | 0B00 | 75C0 | E903 | FF50 | 7548 | E903 |
| 0000012420 | FF2C | 7548 | E903 | FF66 | 7548 | E903 | FFAF | 7548 |
| 0000012440 | E903 | FF86 | D5E9 | B8FF | 0000 | 00E9 | 5E00 | 835F |
| 0000012460 | 02ED | E58B | 5D1F | CB4D | 581E | 4590 | 8B55 | 1EEC |
| 0000012500 | D88E | EC81 | 0000 | 5657 | B81E | 1017 | D88E | 068E |
| 0000012520 | 0F98 | 8326 | 043E | 0000 | 0375 | 13E9 | 2600 | 04A1 |
| 0000012540 | C400 | 065E | 8926 | B807 | 0000 | 09E9 | E900 | 0006 |
| 0000012560 | FFB8 | E9FF | 0000 | 5E1F | 835F | 02ED | E58B | 5D1F |
| 0000012600 | CA4D | 0004 | 581E | 4590 | 8B55 | 1EEC | D88E | EC81 |
| 0000012620 | 0000 | 5657 | B81E | 11AA | D88E | F2A1 | 0B11 | F006 |
| 0000012640 | 7511 | E903 | 001A | F0A1 | 8B11 | F216 | C411 | 065E |
| 0000012660 | 8926 | 2607 | 5789 | B802 | 0000 | 09E9 | E900 | 0006 |
| 0000012700 | FFB8 | E9FF | 0000 | 5E1F | 835F | 02ED | E58B | 5D1F |
| 0000012720 | CA4D | 0004 | 581E | 4590 | 8B55 | 1EEC | D88E | EC81 |
| 0000012740 | 002C | 5657 | B81E | 11F6 | D88E | 46C7 | 0EFA | 8C05 |
| 0000012760 | FC5E | 46C7 | 01F0 | 2B01 | 89C0 | E246 | 4689 | 8EE0 |
| 0000013000 | 9C06 | 260F | 3E83 | 0127 | 7500 | E903 | 001D | 36FF |
| 0000013020 | 016E | 36FF | 016C | 468D | 16D6 | 9A50 | 0048 | 0000 |

THU MAR 14 17:47:32 1991 TESTWIN.DLL PAGE 7, LINE 355

| | | | | | | | | |
|---|---|---|---|---|---|---|---|---|
| 0000013040 | C483 | 3D08 | 0000 | 0374 | 0FE9 | 8E00 | 9E06 | 260F |
| 0000013060 | 3E83 | 1312 | 7500 | E903 | 003B | 681E | 0515 | 468D |
| 0000013100 | 16E4 | 8D50 | D646 | 5016 | 468D | 16F6 | 6850 | 0357 |
| 0000013120 | 681E | 051C | 36FF | 016A | 36FF | 0168 | 36FF | 016E |
| 0000013140 | 36FF | 016C | 909A | 0000 | 8300 | 1EC4 | 4689 | 89F6 |
| 0000013160 | F856 | 08E9 | 2B00 | 89C0 | F846 | 4689 | C7F6 | D446 |
| 0000013200 | 0028 | 46C7 | 00F4 | 8B20 | 0646 | 0639 | 037E | 0374 |
| 0000013220 | 7DE9 | 8E00 | 9C06 | 260F | 3E83 | 14AB | 7500 | E903 |
| 0000013240 | 0009 | 7E83 | FEDA | 0374 | 0FE9 | 8E00 | 9E06 | 260F |
| 0000013260 | 3E83 | 14C3 | 7500 | E903 | 0050 | 46C7 | 00DC | FF00 |
| 0000013300 | E276 | 76FF | 8DE0 | DC46 | 5016 | 76FF | FFF0 | FC76 |
| 0000013320 | 76FF | 8DFA | E44E | 5116 | 4E8D | 16F6 | 8D51 | D64E |
| 0000013340 | 5116 | 681E | 051C | 6068 | FF03 | 6A36 | FF01 | 6836 |
| 0000013360 | FF01 | 6E36 | FF01 | 6C36 | 9A01 | 150B | 0000 | C483 |
| 0000013400 | 8B28 | DC46 | BAE9 | E901 | 0006 | 00B8 | E900 | 01B1 |
| 0000013420 | 468B | A306 | 037E | 7E83 | 0406 | 0375 | 06E9 | 8B00 |
| 0000013440 | 0646 | 7CA3 | C703 | F246 | 0000 | 03E9 | FF00 | F246 |
| 0000013460 | 468B | 39D4 | F246 | 037C | 52E9 | 8E00 | 9A06 | 260F |
| 0000013500 | 36FF | 0002 | FF26 | 0036 | 6800 | 0192 | 5E8B | 8BF2 |
| 0000013520 | D1C3 | 03E3 | C1D8 | 02E3 | 878B | 0170 | 01BA | 5200 |
| 0000013540 | 8B50 | F25E | C38B | E3D1 | D803 | E3D1 | 5E03 | D106 |
| 0000013560 | 83E3 | 72BF | 0101 | C01B | 0025 | B940 | 4000 | D08B |
| 0000013600 | 5152 | B59A | 0010 | 8900 | DE46 | A0E9 | 8BFF | 0646 |
| 0000013620 | 9CE9 | 6A00 | 6A00 | 8D00 | F446 | 5016 | 2D68 | 8E01 |
| 0000013640 | 9A06 | 260F | 36FF | 0002 | FF26 | 0036 | 6A00 | 9A02 |
| 0000013660 | 1088 | 1439 | C483 | E910 | 008A | 006A | 006A | 468D |
| 0000013700 | 16F4 | 6850 | 012D | 068E | 0F9A | FF26 | 0236 | 2600 |
| 0000013720 | 36FF | 0000 | 046A | 889A | 5D10 | 8314 | 10C4 | 006A |
| 0000013740 | 006A | 468D | 16F4 | 6850 | 0191 | 068E | 0F9A | FF26 |
| 0000013760 | 0236 | 2600 | 36FF | 0000 | 046A | 889A | 8410 | 8314 |
| 0000014000 | 10C4 | 3FE9 | 6A00 | 6A00 | 8D00 | F446 | 5016 | 9168 |
| 0000014020 | 8E01 | 9A06 | 260F | 36FF | 0002 | FF26 | 0036 | 6A00 |
| 0000014040 | 9A02 | 1088 | 0D9F | C483 | E910 | 0018 | 15E9 | 4800 |
| 0000014060 | 0375 | 5EE9 | 48FF | 0375 | 7FE9 | 48FF | 0375 | C4E9 |
| 0000014100 | E9FF | 0000 | 068E | 0F9C | 8326 | 663E | 0012 | 0375 |
| 0000014120 | 09E9 | 8300 | DA7E | 74FE | E903 | 000F | 068E | 0F9E |
| 0000014140 | 8326 | 3F3E | 0001 | 0375 | 50E9 | C700 | DC46 | 0000 |
| 0000014160 | 76FF | FFE2 | E076 | 468D | 16DC | FF50 | F076 | 76FF |
| 0000014200 | FFFC | FA76 | 4E8D | 16E4 | 8D51 | F64E | 5116 | 4E8D |
| 0000014220 | 16D6 | 1E51 | 1C68 | 6805 | 0381 | 36FF | 016A | 36FF |
| 0000014240 | 0168 | 36FF | 016E | 36FF | 016C | 969A | 0001 | 8300 |
| 0000014260 | 28C4 | 468B | E9DC | 0009 | 06E9 | B800 | 0000 | 00E9 |
| 0000014300 | 1F00 | 5F5E | ED83 | 8B02 | 1FE5 | 4D5D | 02CA | 1E00 |
| 0000014320 | 9058 | 5545 | EC8B | 8E1E | 81D8 | 24EC | 5700 | 1E56 |
| 0000014340 | 46B8 | 8E12 | C7D8 | FA46 | 052D | 5E8C | C7FC | F446 |
| 0000014360 | 0101 | C02B | 4689 | 89E6 | E446 | 068E | 0F9C | 8326 |
| 0000014400 | E83E | 0015 | 0375 | 1DE9 | FF00 | 6E36 | FF01 | 6C36 |
| 0000014420 | 8D01 | DC46 | 5016 | 7C9A | 0012 | 8300 | 08C4 | 003D |
| 0000014440 | 7400 | E903 | 000F | 068E | 0F9E | 8326 | 003E | 0016 |
| 0000014460 | 0375 | 3BE9 | 1E00 | 3468 | 8D05 | E846 | 5016 | 468D |
| 0000014500 | 16DC | 8D50 | F646 | 5016 | 9568 | 1E03 | 3C68 | FF05 |
| 0000014520 | 6A36 | FF01 | 6836 | FF01 | 6E36 | FF01 | 6C36 | 9A01 |
| 0000014540 | 12C5 | 0000 | C483 | 891E | F646 | 5689 | E9F8 | 0008 |
| 0000014560 | C02B | 4689 | 89F8 | F646 | 36FF | 037C | 349A | 1212 |
| 0000014600 | 8E14 | 9C06 | 260F | 3E83 | 12FA | 7500 | E903 | 0009 |
| 0000014620 | 7E83 | FEE0 | 0374 | 0FE9 | 8E00 | 9E06 | 260F | 3E83 |
| 0000014640 | 1292 | 7500 | E903 | 0050 | 46C7 | 00E2 | FF00 | E676 |
| 0000014660 | 76FF | 8DE4 | E246 | 5016 | 76FF | FFF4 | FC76 | 76FF |
| 0000014700 | 8DFA | E84E | 5116 | 4E8D | 16F6 | 8D51 | DC4E | 5116 |

THU MAR 14 17:47:32 1991 TESTWIN.DLL PAGE 8, LINE 414

| | | | | | | | | |
|---|---|---|---|---|---|---|---|---|
| 0000014720 | 681E | 053C | 9868 | FF03 | 6A36 | FF01 | 6836 | FF01 |
| 0000014740 | 6E36 | FF01 | 6C36 | 9A01 | 135A | 0000 | C483 | 8B28 |
| 0000014760 | E246 | 09E9 | E900 | 0006 | 00B8 | E900 | 0000 | 5E1F |
| 0000015000 | 835F | 02ED | E58B | 5D1F | CB4D | 581E | 4590 | 8B55 |
| 0000015020 | 1EEC | D88E | EC81 | 00C6 | 5657 | 86C6 | FF44 | FF00 |
| 0000015040 | F236 | FF11 | F036 | 6811 | 8005 | 079A | 0008 | 8900 |
| 0000015060 | E446 | 5689 | FFE6 | E676 | 76FF | 68E4 | 0182 | 016A |
| 0000015100 | 8A68 | 8D02 | EA46 | 5016 | DC9A | 0016 | 8B00 | F246 |
| 0000015120 | 568B | 89F4 | FA46 | 5689 | C7FC | 3C86 | 8BFF | FF02 |
| 0000015140 | FC76 | 76FF | 68FA | 0181 | 868B | FF3C | 86FF | FF3C |
| 0000015160 | C08B | 01BA | 5200 | 6A50 | 6A00 | 9A00 | 13E3 | 0000 |
| 0000015200 | D00B | 0375 | 03E9 | E900 | FFD5 | F4A1 | 8911 | 4286 |
| 0000015220 | A1FF | 10EC | 168B | 10EE | 8689 | FF3E | 9689 | FF40 |
| 0000015240 | BE83 | FF42 | 7400 | E903 | 001F | 06C7 | 056C | 028B |
| 0000015260 | 76FF | FFFC | FA76 | 8068 | 1E01 | 6668 | 1E05 | 4E68 |
| 0000015300 | 9A05 | 1790 | 0000 | 6EE9 | 8B00 | 4286 | 48FF | 4689 |
| 0000015320 | E9E8 | 0003 | 4EFF | 83E8 | E87E | 7D00 | E903 | 0057 |
| 0000015340 | 468B | 05E8 | 028B | 6CA3 | 6905 | E846 | 00CA | 8603 |
| 0000015360 | FF3E | 968B | FF40 | 6605 | 5200 | 6950 | E846 | 00CA |
| 0000015400 | 8603 | FF3E | 968B | FF40 | 5052 | 681E | 055F | 868D |
| 0000015420 | FF44 | 5016 | 0C9A | DF42 | 8315 | 10C4 | 76FF | FFFC |
| 0000015440 | FA76 | 8068 | 1E01 | 6668 | 8D05 | 4486 | 16FF | 9A50 |
| 0000015460 | 16A9 | 0000 | 9DE9 | 5EFF | 835F | 02ED | E58B | 5D1F |
| 0000015500 | CB4D | 581E | 4590 | 8B55 | 1EEC | D88E | EC81 | 0044 |
| 0000015520 | 5657 | 46C7 | 76F8 | 8C05 | FA5E | 46C7 | 00DC | 2B00 |
| 0000015540 | 89C0 | CA46 | 4689 | 8EC8 | 9C06 | 260F | 3E83 | 18DA |
| 0000015560 | 7500 | E903 | 001D | 36FF | 016E | 36FF | 016C | 468D |
| 0000015600 | 16C0 | 9A50 | 1577 | 0000 | C483 | 3D08 | 0000 | 0374 |
| 0000015620 | 0FE9 | 8E00 | 9E06 | 260F | 3E83 | 18F2 | 7500 | E903 |
| 0000015640 | 003B | 681E | 057A | 468D | 16D0 | 8D50 | C046 | 5016 |
| 0000015660 | 468D | 16F0 | 6850 | 03EA | 681E | 05A2 | 36FF | 016A |
| 0000015700 | 36FF | 0168 | 36FF | 016E | 36FF | 016C | C09A | 0015 |
| 0000015720 | 8300 | 1EC4 | 4689 | 89F0 | F256 | 08E9 | 2B00 | 89C0 |
| 0000015740 | F246 | 4689 | 8DF0 | FC46 | 5016 | 468D | 16F4 | 9A50 |
| 0000015760 | FFFF | 0000 | 068E | 0F9A | FF26 | 0236 | 2600 | 36FF |
| 0000016000 | 0000 | 8268 | 6A01 | 6801 | 02EE | 468D | 16E0 | 9A50 |
| 0000016020 | 18A0 | 0000 | 468B | 8BE8 | EA56 | 4689 | 89CC | CE56 |
| 0000016040 | 46C7 | EFBE | FF02 | CE76 | 76FF | 68CC | 0181 | 468B |
| 0000016060 | FFBE | BE46 | C08B | 01BA | 5200 | 6A50 | 6A00 | 9A00 |
| 0000016100 | 18CF | 0000 | D00B | 0375 | 03E9 | E900 | FFD7 | 7E83 |
| 0000016120 | 00FC | 0374 | 7FE9 | C700 | C206 | EF05 | FF02 | CE76 |
| 0000016140 | 76FF | 68CC | 0180 | 681E | 05BC | 681E | 057E | 739A |
| 0000016160 | 0019 | 8E00 | 9C06 | 260F | 3E83 | 198F | 7500 | E903 |
| 0000016200 | 0009 | 7E83 | FEC4 | 0374 | 0FE9 | 8E00 | 9E06 | 260F |
| 0000016220 | 3E83 | 19A7 | 7500 | E903 | 0039 | 468D | 16D0 | 8D50 |
| 0000016240 | F046 | 5016 | 468D | 16C0 | 1E50 | A268 | 6805 | 0408 |
| 0000016260 | 36FF | 016A | 36FF | 0168 | 36FF | 016E | 36FF | 016C |
| 0000016300 | D69A | 0019 | 8300 | 1AC4 | 46C7 | 00C6 | E900 | 00BB |
| 0000016320 | 03E9 | E900 | 00B5 | 46C7 | 01DE | E900 | 0003 | 46FF |
| 0000016340 | 8BDE | FC46 | 4639 | 7CDE | E903 | 002E | 468B | 05DE |
| 0000016360 | 02EF | C2A3 | FF05 | CE76 | 76FF | 68CC | 0180 | 681E |
| 0000016400 | 05BC | 5E8B | C1DE | 02E3 | 76C4 | 26F4 | 70FF | 2602 |
| 0000016420 | 30FF | 229A | 0017 | E900 | FFC4 | 76FF | FFFC | F676 |
| 0000016440 | 76FF | 9AF4 | FFFF | 0000 | 068E | 0F9C | 8326 | 613E |
| 0000016460 | 0015 | 0375 | 09E9 | 8300 | C47E | 74FE | E903 | 000F |
| 0000016500 | 068E | 0F9E | 8326 | 8D3E | 0015 | 0375 | 39E9 | 8D00 |
| 0000016520 | D046 | 5016 | 468D | 16F0 | 8D50 | C046 | 5016 | 681E |
| 0000016540 | 05A2 | 1868 | FF04 | 6A36 | FF01 | 6836 | FF01 | 6E36 |
| 0000016560 | FF01 | 6C36 | 9A01 | FFFF | 0000 | C483 | C71A | C646 |

THU MAR 14 17:47:32 1991 TESTWIN.DLL PAGE 9, LINE 473

| | | | | | | | | |
|---|---|---|---|---|---|---|---|---|
| 0000016600 | 0000 | 06E9 | E900 | 0003 | 00E9 | 5E00 | 835F | 02ED |
| 0000016620 | E58B | 5D1F | CB4D | 581E | 4590 | 8B55 | 1EEC | D88E |
| 0000016640 | EC81 | 001C | 5657 | 36FF | 11F2 | 36FF | 11F0 | 0568 |
| 0000016660 | 9A80 | 168B | 0000 | 4689 | 89E6 | E856 | 76FF | FFE8 |
| 0000016700 | E676 | 8268 | 6A01 | 6801 | 028A | 468D | 16EA | 9A50 |
| 0000016720 | 1A60 | 0000 | 468B | 8BF2 | F456 | 4689 | 89FA | FC56 |
| 0000016740 | 4681 | 8A06 | FF02 | FC76 | 76FF | 68FA | 0181 | 468B |
| 0000016760 | FF06 | 0646 | C08B | 01BA | 5200 | 6A50 | 6A00 | 9A00 |
| 0000017000 | 1870 | 0000 | D00B | 0375 | 03E9 | E900 | FFD7 | 5F5E |
| 0000017020 | ED83 | 8B02 | 1FE5 | 4D5D | 1ECB | 9058 | 5545 | EC8B |
| 0000017040 | 8E1E | 81D8 | 24EC | 5700 | 1E56 | 41B8 | 8E15 | C7D8 |
| 0000017060 | FA46 | 05CC | 5E8C | C7FC | F446 | 0000 | C02B | 4689 |
| 0000017100 | 89E6 | E446 | 068E | 0F9C | 8326 | 3C3E | 001B | 0375 |
| 0000017120 | 1DE9 | FF0C | 6E36 | FF01 | 6C36 | 8D01 | DC46 | 5016 |
| 0000017140 | E49A | 0017 | 8300 | 08C4 | 003D | 7400 | E903 | 000F |
| 0000017160 | 068E | 0F9E | 8326 | 543E | 001B | 0375 | 3BE9 | 1E00 |
| 0000017200 | D068 | 8D05 | E846 | 5016 | 468D | 16DC | 8D50 | F646 |
| 0000017220 | 5016 | 4C68 | 1E04 | D468 | FF05 | 6A36 | FF01 | 6836 |
| 0000017240 | FF01 | 6E36 | FF01 | 6C36 | 9A01 | 182D | 0000 | C483 |
| 0000017260 | 891E | F646 | 5689 | E9F8 | 0008 | C02B | 4689 | 89F8 |
| 0000017300 | F646 | 468B | A30A | 11F4 | 468B | 8B06 | 0856 | ECA3 |
| 0000017320 | 8910 | EE16 | 8E10 | 9C06 | 260F | 3E83 | 17CE | 7500 |
| 0000017340 | E903 | 0009 | 7E83 | FEE0 | 0374 | 0FE9 | 8E00 | 9E06 |
| 0000017360 | 260F | 3E83 | 17FA | 7500 | E903 | 0039 | 468D | 16E8 |
| 0000017400 | 8D50 | F646 | 5016 | 468D | 16DC | 1E50 | D468 | 6805 |
| 0000017420 | 0451 | 36FF | 016A | 36FF | 0168 | 36FF | 016E | 36FF |
| 0000017440 | 016C | 219A | 0019 | 8300 | 1AC4 | 46C7 | 00E2 | E900 |
| 0000017460 | 0006 | 03E9 | E900 | 0000 | 5E1F | 835F | 02ED | E58B |
| 0000017500 | 5D1F | CA4D | 0006 | 581E | 4590 | 8B55 | 1EEC | D88E |
| 0000017520 | EC81 | 0000 | 5657 | B81E | 1A8B | D88E | 006A | 016A |
| 0000017540 | 76FF | FF0C | 0A76 | 7768 | 6817 | FFFF | 068E | 0FA0 |
| 0000017560 | FF26 | 0436 | C400 | 065E | FF26 | FF37 | 0876 | 76FF |
| 0000017600 | 9A06 | 094E | 0000 | 00E9 | 1F00 | 5F5E | ED83 | 8B02 |
| 0000017620 | 1FE5 | 4D5D | 08CA | 1E00 | 9058 | 5545 | EC8B | 8E1E |
| 0000017640 | 81D8 | 04EC | 5700 | 1E56 | B8B8 | 8E1B | 8BD8 | 0E46 |
| 0000017660 | 68E9 | 8B01 | 0646 | 568B | A308 | 11F6 | 1689 | 11F8 |
| 0000017700 | 76FF | FF12 | 1076 | EA68 | 6803 | 0143 | 006A | 316A |
| 0000017720 | 006A | 006A | FF9A | 00FF | C400 | F61E | 2611 | 478B |
| 0000017740 | 2604 | 470B | 7502 | E903 | 001A | 76FF | FF12 | 1076 |
| 0000017760 | 1EC4 | 11F6 | FF26 | 0477 | FF26 | 0277 | 8E9A | 0004 |
| 0000020000 | 8900 | FC46 | F6A1 | 8B11 | F816 | 0511 | 000A | D00B |
| 0000020020 | 0375 | 1DE9 | FF00 | 1276 | 76FF | 6810 | 03EA | F6A1 |
| 0000020040 | 8B11 | F816 | 0511 | 000A | 5052 | B99A | 001C | 8900 |
| 0000020060 | FC46 | 1EC4 | 11F6 | 8B26 | 0847 | 0B26 | 0647 | 0375 |
| 0000020100 | 1DE9 | FF00 | 1276 | 76FF | 6810 | 03E9 | 1EC4 | 11F6 |
| 0000020120 | FF26 | 0877 | FF26 | 0677 | FF9A | 00FF | 8900 | FC46 |
| 0000020140 | 00B8 | BA00 | 0000 | D5E9 | 6A00 | 6A00 | FFD1 | 1276 |
| 0000020160 | 76FF | 1E10 | EA68 | C405 | F61E | 2611 | 77FF | 2604 |
| 0000020200 | 77FF | 6A02 | 6A00 | 9A20 | FFFF | 0000 | 00B8 | BA00 |
| 0000020220 | 0000 | A9E9 | 8B00 | 0A46 | 51E9 | FF00 | 1276 | 76FF |
| 0000020240 | 6810 | 03EA | 326A | F6A1 | 8B11 | F816 | 0511 | 000A |
| 0000020260 | 5052 | FF9A | 00FF | 8900 | FC46 | 76FF | FF12 | 1076 |
| 0000020300 | 016A | 399A | 001D | B800 | 0000 | 00BA | E90D | 006E |
| 0000020320 | 76FF | FF12 | 1076 | 006A | 309A | 0010 | B800 | 0000 |
| 0000020340 | 00BA | E900 | 0058 | 12E9 | E900 | 000F | 7548 | E903 |
| 0000020360 | FFA9 | 7548 | E903 | FFD8 | EBE9 | FFFF | 1276 | 76FF |
| 0000020400 | FF10 | 0E76 | 76FF | FF0C | 0A76 | 76FF | FF08 | 0676 |
| 0000020420 | 5C9A | 0010 | E900 | 0026 | 1AE9 | 2D00 | 0020 | 0375 |
| 0000020440 | 72E9 | 48FF | 7548 | E903 | FF3F | 192D | 7500 | E903 |

THU MAR 14 17:47:32 1991 TESTWIN.DLL PAGE 10, LINE 532

| | | | | | | | | |
|---|---|---|---|---|---|---|---|---|
| 0000020460 | FE81 | C6E9 | B8FF | 0000 | 00BA | E900 | 0000 | 5E1F |
| 0000020500 | 835F | 02ED | E58B | 5D1F | CA4D | 000E | 581E | 4590 |
| 0000020520 | 8B55 | 1EEC | D88E | EC81 | 0000 | 5657 | 006A | 016A |
| 0000020540 | 76FF | FF08 | 0676 | C768 | 681B | FFFF | 068E | 0FA0 |
| 0000020560 | FF26 | 0436 | C400 | 0A5E | FF26 | FF37 | 0C76 | 76FF |
| 0000020600 | 9A0A | 1BE2 | 0000 | 00E9 | 5E00 | 835F | 02ED | E58B |
| 0000020620 | 5D1F | CB4D | 581E | 4590 | 8B55 | 1EEC | D88E | EC81 |
| 0000020640 | 0004 | 5657 | B81E | 1C09 | D88E | 468B | E90E | 0219 |
| 0000020660 | 468B | 8B06 | 0856 | FAA3 | 8911 | FC16 | FF11 | 1276 |
| 0000020700 | 76FF | 6810 | 04B2 | 4368 | 6A01 | 6A00 | 6A31 | 6A00 |
| 0000020720 | 9AQ0 | 1EAE | 0000 | 1EC4 | 11FA | 8B26 | 0447 | 0B26 |
| 0000020740 | 0247 | 0375 | 1AE9 | FF00 | 1276 | 76FF | C410 | FA1E |
| 0000020760 | 2611 | 77FF | 2604 | 77FF | 9A02 | 1C5D | 0000 | 4689 |
| 0000021000 | C4FC | FA1E | 2611 | 478B | 2608 | 470B | 7506 | E903 |
| 0000021020 | 001D | 76FF | FF12 | 1076 | B168 | C404 | FA1E | 2611 |
| 0000021040 | 77FF | 2608 | 77FF | 9A06 | 1C8B | 0000 | 4689 | 83FC |
| 0000021060 | 5C3E | 0006 | 0375 | 19E9 | FF00 | 1276 | 76FF | 6810 |
| 0000021100 | 04B7 | 2068 | 6A01 | 6A00 | 6A00 | 6A00 | 9A00 | 1F02 |
| 0000021120 | 0000 | 00B8 | BA00 | 0000 | 92E9 | 6A01 | 6A00 | FF01 |
| 0000021140 | 1276 | 76FF | 1E10 | 0368 | C406 | FA1E | 2611 | 77FF |
| 0000021160 | 2604 | 77FF | 6A02 | 6A00 | 9A20 | 1CE8 | 0000 | 00B8 |
| 0000021200 | BA00 | 0000 | 66E9 | 8B01 | 0A46 | E1E9 | FF00 | 1276 |
| 0000021220 | 76FF | 6810 | 04B7 | 2468 | 6A01 | 6A00 | 6A00 | 6A00 |
| 0000021240 | 9A00 | 1C35 | 0000 | 5CA3 | 8306 | 5C3E | 0006 | 0375 |
| 0000021260 | 0CE9 | 6A00 | 6A17 | 9A01 | 1F24 | 0000 | 09E9 | 6A00 |
| 0000021300 | 6A17 | 9A00 | 0DE0 | 0000 | 00B8 | BA00 | 0000 | 1CE9 |
| 0000021320 | FF01 | 1276 | 76FF | 6810 | 04B1 | 681E | 061C | 5D9A |
| 0000021340 | 001F | 8900 | FC46 | 00B8 | BA00 | 0000 | FEE9 | FF00 |
| 0000021360 | 1276 | 76FF | 6810 | 04B1 | 681E | 062B | 7B9A | 001F |
| 0000021400 | 8900 | FC46 | 00B8 | BA00 | 0000 | E0E9 | FF00 | 1276 |
| 0000021420 | 76FF | 6810 | 04B1 | 681E | 063A | 999A | 001F | 8900 |
| 0000021440 | FC46 | 00B8 | BA00 | 0000 | C2E9 | FF00 | 1276 | 76FF |
| 0000021460 | 6810 | 04B1 | 681E | 064A | 889A | 001E | 8900 | FC46 |
| 0000021500 | 00B8 | BA00 | 0000 | A4E9 | B800 | 0000 | 00BA | E900 |
| 0000021520 | 009B | 76FF | FF12 | 1076 | 006A | 239A | 001D | B800 |
| 0000021540 | 0000 | 00BA | E900 | 0085 | 3EE9 | E900 | 003B | B43D |
| 0000021560 | 7504 | E903 | FF79 | 0376 | 17E9 | 4800 | 0375 | C8E9 |
| 0000021600 | 48FF | 0375 | CBE9 | 2DFF | 04B1 | 0375 | 42E9 | E9FF |
| 0000021620 | FFD6 | B52D | 7504 | E903 | FF73 | 7548 | E903 | FF8B |
| 0000021640 | 7548 | E903 | FEE7 | BFE9 | FFFF | 1276 | 76FF | FF10 |
| 0000021660 | 0E76 | 76FF | FF0C | 0A76 | 76FF | FF08 | 0676 | 719A |
| 0000021700 | 001D | E900 | 0027 | 1BE9 | 2D00 | 0022 | 0375 | 8AE9 |
| 0000021720 | 2DFE | 000E | 0375 | AEE9 | 2DFE | 000B | 0375 | CFE9 |
| 0000021740 | E9FD | FFC5 | 00B8 | BA00 | 0000 | 00E9 | 1F00 | 5F5E |
| 0000021760 | ED83 | 8B02 | 1FE5 | 4D5D | 0ECA | 1E00 | 9058 | 5545 |
| 0000022000 | EC8B | 8E1E | 81D8 | 00EC | 5700 | 6A56 | 6A00 | FF01 |
| 0000022020 | 0876 | 76FF | 6806 | 1DC7 | FF68 | 8EFF | A006 | 260F |
| 0000022040 | 36FF | 0004 | 7868 | FF05 | 0C76 | 76FF | 9A0A | 1DE2 |
| 0000022060 | 0000 | 00E9 | 5E00 | 835F | 02ED | E58B | 5D1F | CB4D |
| 0000022100 | 581E | 4590 | 8B55 | 1EEC | D88E | EC81 | 0004 | 5657 |
| 0000022120 | B81E | 1E06 | D88E | 468B | E90E | 01AF | 468B | 8B06 |
| 0000022140 | 0856 | FEA3 | 8911 | 0016 | FF12 | 1276 | 76FF | 1E10 |
| 0000022160 | 5E68 | 9A06 | 1E5A | 0000 | 003D | 7400 | E903 | 0009 |
| 0000022200 | 00B8 | BA00 | 0000 | 9EE9 | FF01 | 1276 | 76FF | 6810 |
| 0000022220 | 057C | 4368 | 6A01 | 6A00 | 6A1F | 6A00 | 9A00 | 2127 |
| 0000022240 | 0000 | D00B | 0374 | 09E9 | B800 | 0000 | 00BA | E900 |
| 0000022260 | 0175 | 76FF | FF12 | 1076 | 7A68 | 6805 | 0125 | 006A |
| 0000022300 | 016A | 006A | 006A | D59A | 0021 | E900 | 0150 | 468B |
| 0000022320 | E90A | 0105 | 1EC4 | 11FE | C726 | 0C47 | 0000 | 76FF |

THU MAR 14 17:47:32 1991 TESTWIN.DLL PAGE 11, LINE 591

| | | | | | | | | |
|---|---|---|---|---|---|---|---|---|
| 0000022340 | FF12 | 1076 | 7C68 | 9A05 | FFFF | 0000 | 4689 | 3DFC |
| 0000022360 | 0000 | 0374 | 09E9 | B800 | 0000 | 00BA | E900 | 0127 |
| 0000022400 | 468B | 40FC | 9A50 | 3C3C | 2076 | C483 | C402 | FE1E |
| 0000022420 | 2611 | 4789 | 2614 | 5789 | C416 | FE1E | 2611 | 478B |
| 0000022440 | 2616 | 470B | 7414 | E903 | 0009 | 00B8 | BA00 | 0000 |
| 0000022460 | F4E9 | FF00 | 1276 | 76FF | 6810 | 057C | 206A | 1EC4 |
| 0000022500 | 11FE | FF26 | 1677 | FF26 | 1477 | 139A | 001D | 3D00 |
| 0000022520 | 0000 | 0374 | 09E9 | B800 | 0000 | 00BA | E900 | 00C7 |
| 0000022540 | 76FF | FF12 | 1076 | 7A68 | 6805 | 0124 | 006A | 006A |
| 0000022560 | 006A | 006A | 329A | 001E | 0B00 | 75D0 | E903 | 0006 |
| 0000022600 | 29B8 | E900 | 0003 | 2BB8 | C400 | FE1E | 2611 | 4789 |
| 0000022620 | FF1A | 1276 | 76FF | 6A10 | 9A01 | 221B | 0000 | 003D |
| 0000022640 | 7400 | E903 | 0009 | 00B8 | BA00 | 0000 | 78E9 | E900 |
| 0000022660 | 0036 | 76FF | FF12 | 1076 | 006A | BB9A | 001F | 3D00 |
| 0000022700 | 0000 | 0374 | 09E9 | B800 | 0000 | 00BA | E900 | 0057 |
| 0000022720 | 15E9 | E900 | 0012 | 0FE9 | 4800 | 0375 | F5E9 | 48FE |
| 0000022740 | 0375 | CDE9 | E9FF | FFEB | 33E9 | FF00 | 1276 | 76FF |
| 0000022760 | FF10 | 0E76 | 76FF | FF0C | 0A76 | 76FF | FF08 | 0676 |
| 0000023000 | 1F9A | 0020 | E900 | 001F | 13E9 | 2D00 | 0020 | 0375 |
| 0000023020 | BBE9 | 2DFE | 001B | 0375 | 41E9 | E9FE | FFCD | 00B8 |
| 0000023040 | BA00 | 0000 | 00E9 | 1F00 | 5F5E | ED83 | 8B02 | 1FE5 |
| 0000023060 | 4D5D | 0ECA | 0000 | 581E | 4590 | 8B55 | 1EEC | D88E |
| 0000023100 | EC81 | 000E | 5657 | 681E | 068A | 468D | 16FA | 9A50 |
| 0000023120 | FFFF | 0000 | 4689 | FFF6 | FC76 | 76FF | 8DFA | F246 |
| 0000023140 | 5016 | FF9A | 00FF | 8900 | F646 | 468B | 0BF4 | F246 |
| 0000023160 | 0375 | 14E9 | 6A00 | FF32 | F476 | 76FF | 1EF2 | 9668 |
| 0000023200 | 9A06 | 3F72 | 2309 | C483 | FF0A | F476 | 76FF | 9AF2 |
| 0000023220 | FFFF | 0000 | C02B | 4689 | 89F4 | F246 | 76FF | FF08 |
| 0000023240 | 0676 | 681E | 068C | A69A | 681B | 8921 | F846 | 7E83 |
| 0000023260 | 00F8 | 0375 | 0BE9 | 6A00 | 1E20 | 9668 | 9A06 | 0E2A |
| 0000023300 | 0000 | 5F5E | ED83 | 8B02 | 1FE5 | 4D5D | 1ECB | 9058 |
| 0000023320 | 5545 | EC8B | 8E1E | 81D8 | 0EEC | 5700 | FF56 | 0876 |
| 0000023340 | 76FF | 6806 | 0191 | 016A | 666A | 006A | 0068 | 9A40 |
| 0000023360 | 1A30 | 0000 | C4F6 | 7540 | E903 | 000F | 681E | 06C8 |
| 0000023400 | FF9A | 00FF | B800 | 0000 | CFE9 | FF00 | 0C76 | 76FF |
| 0000023420 | 8D0A | FA46 | 5016 | C39A | 0022 | 8900 | F446 | 013D |
| 0000023440 | 1B00 | 40C0 | 003D | 7500 | E903 | 0006 | 468B | E9F4 |
| 0000023460 | 00A8 | 5C6A | 76FF | FFFC | FA76 | 389A | C649 | 8323 |
| 0000023500 | 06C4 | 4689 | 89F6 | F856 | D00B | 0375 | 0CE9 | C400 |
| 0000023520 | F65E | 8A26 | 8807 | F246 | 29E9 | 6A00 | FF3A | FC76 |
| 0000023540 | 76FF | 9AFA | 4938 | 22E4 | C483 | 8906 | F646 | 5689 |
| 0000023560 | 0BF8 | 75D0 | E903 | 000C | 46FF | C4F6 | F65E | 8A26 |
| 0000023600 | 8807 | F246 | 468B | 0BF8 | F646 | 0375 | 38E9 | C400 |
| 0000023620 | F65E | C626 | 0007 | 76FF | FFFC | FA76 | 006A | 006A |
| 0000023640 | FF9A | 00FF | 8900 | F446 | 013D | 1B00 | 40C0 | 003D |
| 0000023660 | 7500 | E903 | 0008 | 76FF | 9AF4 | FFFF | 0000 | 468A |
| 0000023700 | C4F2 | F65E | 8826 | 6A07 | FF01 | FC76 | 76FF | 9AFA |
| 0000023720 | 231E | 0000 | 00B8 | E900 | 0000 | 5F5E | ED83 | 8B02 |
| 0000023740 | 1FE5 | 4D5D | 00CB | 581E | 4590 | 8B55 | 1EEC | D88E |
| 0000023760 | EC81 | 000A | 5657 | B81E | 20B2 | D88E | 468D | 16F8 |
| 0000024000 | 9A50 | 1198 | 2485 | 4689 | 3DF6 | 0001 | C01B | 3D40 |
| 0000024020 | 0000 | 0375 | 06E9 | 8B00 | F646 | 5EE9 | 8D00 | FA46 |
| 0000024040 | 5016 | E49A | A411 | 3D24 | 0000 | 0375 | 0AE9 | C700 |
| 0000024060 | FA46 | 0001 | 46C7 | 00FC | 6A00 | 6A00 | FF01 | FC76 |
| 0000024100 | 76FF | 68FA | 239D | FF68 | FFFF | F876 | DC68 | FF05 |
| 0000024120 | 0876 | 76FF | 9A06 | 208E | 0000 | FF3D | 74FF | E903 |
| 0000024140 | 0006 | 05B8 | E900 | 0013 | 02A1 | 8B12 | 0416 | 8912 |
| 0000024160 | 0646 | 5689 | B808 | 0000 | 00E9 | 1F00 | 5F5E | ED83 |
| 0000024200 | 8B02 | 1FE5 | 4D5D | 04CA | 1E00 | 9058 | 5545 | EC8B |

THU MAR 14 17:47:32 1991 TESTWIN.DLL PAGE 12, LINE 650

| | | | | | | | | |
|---|---|---|---|---|---|---|---|---|
| 0000024220 | 8E1E | 81D8 | 38EC | 5700 | 1E56 | 58B8 | 8E24 | 8BD8 |
| 0000024240 | 0E46 | FDE9 | FF04 | 1276 | 76FF | 6810 | 010D | 4368 |
| 0000024260 | 6A01 | 6A00 | 6A50 | 6A00 | 9A00 | 2533 | 0000 | 76FF |
| 0000024300 | FF12 | 1076 | 0E68 | 6801 | 0143 | 006A | 506A | 006A |
| 0000024320 | 006A | 4C9A | 0025 | FF00 | 1276 | 76FF | 6810 | 0107 |
| 0000024340 | 4368 | 6A01 | 6A00 | 6A50 | 6A00 | 9A00 | 2565 | 0000 |
| 0000024360 | 76FF | FF12 | 1076 | 0868 | 6801 | 0143 | 006A | 506A |
| 0000024400 | 006A | 006A | 7E9A | 0025 | FF00 | 1276 | 76FF | 6810 |
| 0000024420 | 0109 | 4368 | 6A01 | 6A00 | 6A50 | 6A00 | 9A00 | 2597 |
| 0000024440 | 0000 | 76FF | FF12 | 1076 | 0A68 | 6801 | 0143 | 006A |
| 0000024460 | 506A | 006A | 006A | FE9A | 0020 | 8B00 | 0646 | 568B |
| 0000024500 | A308 | 1202 | 1689 | 1204 | 76FF | FF12 | 1076 | 36FF |
| 0000024520 | 1204 | 36FF | 1202 | D49A | 0020 | 3D00 | 0000 | 0374 |
| 0000024540 | 09E9 | B800 | 0000 | 00BA | E900 | 0461 | 76FF | FF12 |
| 0000024560 | 1076 | 0B68 | A101 | 1202 | 168B | 1204 | 2205 | 5200 |
| 0000024600 | 9A50 | 2617 | 0000 | 003D | 7400 | E903 | 0009 | 00B8 |
| 0000024620 | BA00 | 0000 | 36E9 | FF04 | 1276 | 76FF | 6810 | 010C |
| 0000024640 | 02A1 | 8B12 | 0416 | 0512 | 0042 | 5052 | 4A9A | A644 |
| 0000024660 | 8326 | 04C4 | 5052 | 429A | 0026 | 3D00 | 0000 | 0374 |
| 0000024700 | 09E9 | B800 | 0000 | 00BA | E900 | 0401 | 76FF | FF12 |
| 0000024720 | 1076 | 0D68 | A101 | 1202 | 168B | 1204 | 4605 | 5200 |
| 0000024740 | 9A50 | 266D | 0000 | 003D | 7400 | E903 | 0009 | 00B8 |
| 0000024760 | BA00 | 0000 | D6E9 | FF03 | 1276 | 76FF | 6810 | 010E |
| 0000025000 | 02A1 | 8B12 | 0416 | 0512 | 00AA | 5052 | 469A | 0027 |
| 0000025020 | 3D00 | 0000 | 0374 | 09E9 | B800 | 0000 | 00BA | E900 |
| 0000025040 | 03AB | 1EC4 | 1202 | 8B26 | 1087 | 2601 | 870B | 010E |
| 0000025060 | 0375 | E9E9 | C400 | 021E | 2612 | B7FF | 0110 | FF26 |
| 0000025100 | 0EB7 | 9A01 | 3F5A | 26B0 | C483 | 4004 | 9A50 | 3C3C |
| 0000025120 | 26E2 | C483 | 8902 | CC46 | 5689 | 0BCE | 74D0 | E903 |
| 0000025140 | 0009 | 00B8 | BA00 | 0000 | 62E9 | C403 | 021E | 2612 |
| 0000025160 | B7FF | 0110 | FF26 | 0EB7 | FF01 | CE76 | 76FF | 9ACC |
| 0000025200 | 3EFA | 2713 | C483 | 8B08 | CC46 | 568B | 89CE | D046 |
| 0000025220 | 5689 | C7D2 | D846 | 0107 | 03E9 | FF00 | D846 | 7E81 |
| 0000025240 | 0AD8 | 7601 | E903 | 0068 | 0A6A | 76FF | FFD2 | D076 |
| 0000025260 | 0A9A | 6449 | 8327 | 06C4 | 4689 | 89D4 | D656 | 468B |
| 0000025300 | 0BD6 | D446 | 0374 | 06E9 | E900 | 0044 | 07E9 | C400 |
| 0000025320 | D45E | C626 | 0007 | 76FF | FF12 | 1076 | 76FF | FFD8 |
| 0000025340 | D276 | 76FF | 9AD0 | 1F3F | 0000 | 003D | 7400 | E903 |
| 0000025360 | 0009 | 00B8 | BA00 | 0000 | D2E9 | FF02 | D276 | 76FF |
| 0000025400 | 9AD0 | 3F5A | 2779 | C483 | 4004 | 4601 | E9D0 | FF8R |
| 0000025420 | 76FF | FFCE | CC76 | 469A | 643C | 8324 | 04C4 | 76FF |
| 0000025440 | FF12 | 1076 | 0268 | 9A01 | 1A12 | 0000 | 4689 | 89DA |
| 0000025460 | DC56 | D00B | 0374 | 09E9 | B800 | 0000 | 00BA | E900 |
| 0000025500 | 028B | 76FF | FFDC | DA76 | 006A | FF9A | 00FF | 3D00 |
| 0000025520 | 0000 | 0374 | 09E9 | B800 | 0000 | 00BA | E900 | 026D |
| 0000025540 | 76FF | FFDC | DA76 | 6E68 | 6A01 | 6A00 | 6A00 | 6A00 |
| 0000025560 | 9A00 | 2350 | 0000 | D00B | 0374 | 09E9 | B800 | 0000 |
| 0000025600 | 00BA | E900 | 0247 | 46C7 | 00C8 | E900 | 0003 | 46FF |
| 0000025620 | C4C8 | G21E | 8B12 | C846 | 3926 | 2087 | 7F01 | E903 |
| 0000025640 | 0042 | 76FF | FFDC | DA76 | 6168 | 6A01 | 6A00 | C4FF |
| 0000025660 | 021E | 2612 | 878B | 0122 | 8B26 | 2497 | 6B01 | C84E |
| 0000025700 | 0322 | 52C1 | 9A50 | 27D2 | 0000 | 4689 | 8BCA | C846 |
| 0000025720 | 4639 | 75CA | E903 | 0009 | 00B8 | BA00 | 0000 | ECE9 |
| 0000025740 | E901 | FFAA | 76FF | FFDC | DA76 | 016A | CA9A | 0004 |
| 0000025760 | E900 | 01D0 | 006A | 016A | 76FF | FF12 | 1076 | 681E |
| 0000026000 | 0706 | 36FF | 1204 | 36FF | 1202 | 006A | 206A | DA9A |
| 0000026020 | 001E | E900 | 01AE | 468B | E90A | 008A | 76FF | FF12 |
| 0000026040 | 1076 | 0268 | 6801 | 0165 | 006A | 006A | 006A | 006A |
| 0000026060 | BB9A | 0028 | 8900 | C846 | 468B | E90C | 004E | 5CE9 |

THU MAR 14 17:47:32 1991 TESTWIN.DLL PAGE 13, LINE 709

| | | | | | | | | |
|---|---|---|---|---|---|---|---|---|
| 0000026100 | FF00 | 1276 | 76FF | 6810 | 0102 | 6868 | 8B01 | C846 |
| 0000026120 | 20BA | 5200 | 8D50 | DE46 | 5016 | 429A | 0029 | FF00 |
| 0000026140 | 1276 | 76FF | 6810 | 0103 | 468D | 16DE | 9A50 | 25E2 |
| 0000026160 | 0000 | 003D | 7400 | E903 | 0009 | 00B8 | BA00 | 0000 |
| 0000026200 | 4AE9 | E901 | 0017 | 14E9 | E900 | 0011 | 7548 | E903 |
| 0000026220 | FFAC | 042D | 7500 | E903 | FFA7 | E9E9 | E9FF | 0011 |
| 0000026240 | 0EE9 | E900 | 000B | 022D | 7501 | E903 | FF6E | EFE9 |
| 0000026260 | E9FF | 0110 | 468B | E90A | 00A2 | 76FF | FF12 | 1076 |
| 0000026300 | 006A | 3B9A | 7F2A | 8329 | 06C4 | B2E9 | FF00 | 1276 |
| 0000026320 | 76FF | 6810 | 0102 | 6568 | 6A01 | 6A00 | 6A00 | 6A00 |
| 0000026340 | 9A00 | 296D | 0000 | 4689 | 83C8 | C87E | 74FF | E903 |
| 0000026360 | 0003 | 8AE9 | FF00 | 1276 | 76FF | 6810 | 0102 | 6368 |
| 0000026400 | 8B01 | C846 | D22B | 5052 | 006A | 006A | 1A9A | 0025 |
| 0000026420 | E900 | 006B | 76FF | FF12 | 1076 | 016A | 3B9A | 902A |
| 0000026440 | 8329 | 06C4 | 58E9 | FF00 | 1276 | 76FF | 9A10 | 2B7A |
| 0000026460 | 260F | C483 | FF04 | 1276 | 76FF | 6A10 | 9A00 | 21FA |
| 0000026500 | 0000 | 003D | 7400 | E903 | 0009 | 00B8 | BA00 | 0000 |
| 0000026520 | 7AE9 | E900 | 0029 | 26E9 | E900 | 0023 | 7548 | E903 |
| 0000026540 | FFC5 | 7548 | E903 | FFCD | 022D | 7501 | E903 | FF4A |
| 0000026560 | 7548 | E903 | FF9E | 7548 | E903 | FF51 | D7E9 | E9FF |
| 0000026600 | 0042 | 76FF | FF12 | 1076 | 76FF | FF0E | 0C76 | 76FF |
| 0000026620 | FF0A | 0876 | 76FF | 9A06 | 2261 | 0000 | 2EE9 | E900 |
| 0000026640 | 0022 | 202D | 7500 | E903 | FF0A | 4848 | 0375 | 43E9 |
| 0000026660 | 2DFE | 000E | 0375 | 5DE9 | 2DFE | 000B | 0375 | E4E9 |
| 0000026700 | E9FA | FFBE | 00B8 | BA00 | 0000 | 00E9 | 1F00 | 5F5E |
| 0000026720 | ED83 | 8B02 | 1FE5 | 4D5D | 0ECA | 1E00 | 9058 | 5545 |
| 0000026740 | EC8B | 8E1E | 81D8 | 26EC | 5700 | FF56 | 0A76 | 76FF |
| 0000026760 | 6808 | 0103 | 206A | 468D | 16DE | 9A50 | 21AB | 0000 |
| 0000027000 | 003D | 7400 | E903 | 0006 | 00B8 | E900 | 0101 | 76FF |
| 0000027020 | FF0A | 0876 | 0268 | 6801 | 016B | FF6A | 046A | 468D |
| 0000027040 | 16DE | 9A50 | 2AB2 | 0000 | 4689 | 8BDA | DA46 | 2EE9 |
| 0000027060 | E900 | 003D | 05B8 | E900 | 00D5 | 76FF | FF0A | 0876 |
| 0000027100 | 0268 | 6801 | 0164 | 468B | 2BDA | 52D2 | 6A50 | 6A00 |
| 0000027120 | 9A01 | 2891 | 0000 | 00B8 | E900 | 00B3 | 12E9 | 2D00 |
| 0000027140 | FFFD | 0375 | CDE9 | 48FF | 7548 | E903 | FFC3 | C9E9 |
| 0000027160 | FFFF | 0A76 | 76FF | 6808 | 0102 | 6568 | 6A01 | 6A00 |
| 0000027200 | 6A00 | 6A00 | 9A00 | 2B1E | 0000 | 4689 | 83DA | 067E |
| 0000027220 | 7500 | E903 | 003C | 7E83 | FFDA | 0374 | 06E9 | B800 |
| 0000027240 | 0000 | 6AE9 | FF00 | 0A76 | 76FF | 6808 | 0102 | 6668 |
| 0000027260 | 8B01 | DA46 | D22B | 5052 | 468D | 16DE | 9A50 | 2B59 |
| 0000027300 | 0000 | D00B | 0374 | 06E9 | B800 | 0005 | 40E9 | E900 |
| 0000027320 | 003D | 7E83 | FFDA | 0374 | 05E9 | C700 | DA46 | FFFF |
| 0000027340 | 76FF | FF0A | 0876 | 0268 | 6801 | 0161 | 468B | 2BDA |
| 0000027360 | 52D2 | 8D50 | DE46 | 5016 | 849A | 002A | 8900 | DC46 |
| 0000027400 | 7E83 | 00DC | 037C | 06E9 | B800 | 0005 | 00E9 | 5E00 |
| 0000027420 | 835F | 02ED | E58B | 5D1F | CB4D | 581E | 4590 | 8B55 |
| 0000027440 | 1EEC | D88E | EC81 | 000C | 5657 | 76FF | FF08 | 0676 |
| 0000027460 | 0B68 | 6A01 | A11F | 1202 | 168B | 1204 | 2205 | 5200 |
| 0000027500 | 9A50 | 2BCC | 0000 | 003D | 7400 | E903 | 0006 | 05B8 |
| 0000027520 | E900 | 01CB | 76FF | FF08 | 0676 | 0D68 | 6A01 | A150 |
| 0000027540 | 1202 | 168B | 1204 | 4605 | 5200 | 9A50 | 2BF9 | 0000 |
| 0000027560 | 003D | 7400 | E903 | 0009 | 1EC4 | 1202 | C626 | 4647 |
| 0000027600 | FF00 | 0876 | 76FF | 6806 | 010E | 506A | 02A1 | 8B12 |
| 0000027620 | 0416 | 0512 | 00AA | 5052 | B39A | 002C | 3D00 | 0000 |
| 0000027640 | 0374 | 0AE9 | C400 | 021E | 2612 | 87C6 | 00AA | C700 |
| 0000027660 | FC46 | 0107 | 46C7 | 00F4 | E900 | 0003 | 46FF | 81FC |
| 0000027700 | FC7E | 010A | 0376 | 15E9 | FF00 | 0876 | 76FF | FF06 |
| 0000027720 | FC76 | 489A | 0021 | 4000 | 4601 | E9F4 | FFDE | 468B |
| 0000027740 | 40F4 | 9A50 | 3C3C | 2D05 | C483 | C402 | 021E | 2612 |

THU MAR 14 17:47:32 1991 TESTWIN.DLL PAGE 14, LINE 768

| | | | | | | | | |
|---|---|---|---|---|---|---|---|---|
| 0000027760 | 8789 | 010E | 8926 | 1097 | C401 | 021E | 2612 | 878B |
| 0000030000 | 0110 | 0B26 | 0E87 | 7401 | E903 | 0006 | 07B8 | E900 |
| 0000030020 | 010D | 1EC4 | 1202 | 8B26 | DE87 | 2601 | 978B | 0110 |
| 0000030040 | 4689 | 89F8 | FA56 | 46C7 | 07FC | C701 | F446 | 0000 |
| 0000030060 | 03E9 | FF00 | FC46 | 7E81 | 0AFC | 7601 | E903 | 002E |
| 0000030100 | 76FF | FF08 | 0676 | 76FF | 68FC | 03E8 | 76FF | FFFA |
| 0000030120 | F876 | 5C9A | 002A | 8900 | F446 | 5EC4 | 8BF8 | F476 |
| 0000030140 | C626 | 0A00 | 468B | 40F4 | 4601 | E9F8 | FFC5 | 5EC4 |
| 0000030160 | 26F8 | 07C6 | FF00 | 0876 | 76FF | 6806 | 0102 | 6068 |
| 0000030200 | 6A01 | 6A00 | 6A00 | 6A00 | 9A00 | 2D78 | 0000 | 1EC4 |
| 0000030220 | 1202 | 8926 | 2087 | C401 | 021E | 2612 | 876B | 0120 |
| 0000030240 | 5022 | 3C9A | 253C | 8329 | 02C4 | 1EC4 | 1202 | 8926 |
| 0000030260 | 2287 | 2601 | 9789 | 0124 | 1EC4 | 1202 | 8B26 | 2487 |
| 0000030300 | 2601 | 870B | 0122 | 0374 | 06E9 | B800 | 0007 | 4EE9 |
| 0000030320 | C700 | F646 | 0000 | 03E9 | FF00 | F646 | 1EC4 | 1202 |
| 0000030340 | 468B | 26F6 | 8739 | 0120 | 0377 | 32E9 | FF00 | 0876 |
| 0000030360 | 76FF | 6806 | 0102 | 6868 | 8B01 | F646 | 1FBA | 5200 |
| 0000030400 | C450 | 021E | 2612 | 878B | 0122 | 8B26 | 2497 | 6B01 |
| 0000030420 | F64E | 0322 | 52C1 | 9A50 | 2AE6 | 0000 | BAE9 | 5EFF |
| 0000030440 | 835F | 02ED | E58B | 5D1F | CB4D | 0000 | 0000 | 0000 |
| 0000030460 | 0000 | 0000 | 0000 | 0000 | 0000 | 8B55 | 1EEC | 2468 |
| 0000030500 | 1E07 | 2868 | 9A07 | FFFF | 0000 | 068E | 0724 | A126 |
| 0000030520 | 0015 | 64A3 | BB07 | 072E | 1F8C | 35BE | 8312 | FEE6 |
| 0000030540 | 1E56 | FF9A | 00FF | 0B00 | 74C0 | 3304 | EBC0 | 893A |
| 0000030560 | 0477 | 894E | 2C36 | 8307 | 03EE | 04C7 | 0001 | 7789 |
| 0000030600 | 8906 | 0877 | C683 | C702 | FE04 | 89FF | 0A77 | 681E |
| 0000030620 | 0722 | 681E | 0720 | FF9A | 00FF | E800 | 0020 | 5E9A |
| 0000030640 | 4630 | E82C | 0066 | 01B8 | 5D00 | 50CB | 1C9A | 0130 |
| 0000030660 | 9A2E | 3196 | 2E0F | FF68 | 9A00 | 2F25 | 2E14 | BB1E |
| 0000030700 | 000D | FF33 | 068E | 0722 | FFB9 | 267F | 3D80 | 7500 |
| 0000030720 | 4701 | 8026 | 003D | 3174 | 42BE | 8B07 | 8BD1 | F3CB |
| 0000030740 | 8BA6 | 74CA | 3308 | F2C0 | 74AE | EBE7 | 061C | 071E |
| 0000030760 | F78B | BF1F | 0769 | 2CAC | 7241 | C00E | 04E0 | AC92 |
| 0000031000 | 412C | 0572 | C20A | EBAA | 1FED | 00C3 | 02BB | 5200 |
| 0000031020 | D48B | A780 | 0769 | 50B7 | C48B | 1653 | 1650 | 9A52 |
| 0000031040 | FFFF | 0000 | C00B | 7558 | B110 | 3C40 | 7401 | 3C06 |
| 0000031060 | 7502 | B106 | 0808 | 698F | 4B07 | D679 | E85A | 0026 |
| 0000031100 | 8CBE | BF0F | 0F8C | 5FE8 | BE01 | 0F8C | 8CBF | E80F |
| 0000031120 | 0156 | 8CB8 | 3D0F | 0F90 | 0B74 | 016A | 680E | 2EF7 |
| 0000031140 | FF9A | 00FF | C300 | 0E8B | 0F82 | 2AE3 | 06C4 | 0F84 |
| 0000031160 | C28C | DB33 | 1EFF | 0F80 | 0373 | 61E9 | 8E01 | 2806 |
| 0000031200 | 2607 | 1E8B | 0006 | 754B | C40D | 8806 | 8C0F | BBC2 |
| 0000031220 | 0003 | 1EFF | 0F80 | B8C3 | 24FB | D88E | 79A1 | 0B09 |
| 0000031240 | 75C0 | 0E10 | DEA1 | 0B0E | 75C0 | E805 | 001F | 03EB |
| 0000031260 | 24E8 | 6A00 | 6A03 | 6A00 | 9A00 | 2EC1 | 0000 | 8B55 |
| 0000031300 | 33EC | EBC9 | 551A | EC8B | 01B9 | EB00 | 5512 | EC8B |
| 0000031320 | 5756 | 00B9 | EB01 | 5508 | EC8B | 5756 | 01B9 | E801 |
| 0000031340 | 004B | 0A51 | 75C9 | BE12 | 122E | 2EBF | E812 | 00B8 |
| 0000031360 | 8CBE | BF0F | 0F90 | AFE8 | BE00 | 0F90 | 90BF | E80F |
| 0000031400 | 00A6 | 90BE | BF0F | 0F90 | 9DE8 | E800 | 008C | 0A58 |
| 0000031420 | 75E4 | C713 | 7906 | 0109 | B800 | 0001 | 8A50 | 0646 |
| 0000031440 | 9A50 | FFFF | 0000 | 4EE8 | 5F00 | 5D5E | 55CB | EC8B |
| 0000031460 | 0D6A | 93E8 | 8311 | 02C4 | 068E | 0728 | 8B26 | 061E |
| 0000031500 | 4B00 | 168B | 097B | FA83 | 75FF | 8904 | 7B1E | 3909 |
| 0000031520 | 7B1E | 9F09 | 0D6A | 99E8 | 8311 | 02C4 | 749E | 6A0A |
| 0000031540 | E80E | 1144 | C483 | EB02 | 3BC7 | 74D3 | 6A08 | E80E |
| 0000031560 | 1156 | C483 | 5D02 | 55C3 | EC8B | 0D6A | 49E8 | 8311 |
| 0000031600 | 02C4 | 06C7 | 097B | FFFF | 0D6A | 65E8 | 8311 | 02C4 |
| 0000031620 | 0E6A | 5DE8 | 8311 | 02C4 | C35D | 0E8B | 0F82 | 07E3 |

THU MAR 14 17:47:32 1991 TESTWIN.DLL PAGE 15, LINE 827

| | | | | | | | | |
|---|---|---|---|---|---|---|---|---|
| 0000031640 | 02BB | FF00 | 801E | C30F | F73B | 0E73 | EF83 | 8B04 |
| 0000031660 | 0B05 | 0245 | F274 | 1DFF | EEEB | 00C3 | 8B55 | B8EC |
| 0000031700 | 00FC | 0E50 | 6FE8 | 8301 | 803E | 0009 | 0474 | 1EFF |
| 0000031720 | 097E | FFB8 | 5000 | E80E | 015C | E58B | CB5D | 02B8 |
| 0000031740 | E900 | FDC7 | 5A59 | DC8B | D82B | 0B72 | FB81 | 0200 |
| 0000031760 | 0572 | E38B | 5152 | 52CB | 3351 | E9C0 | FDAD | 14C8 |
| 0000032000 | 0000 | 5657 | FF2B | F78B | 3639 | 0722 | 0375 | F0E9 |
| 0000032020 | A100 | 0722 | C92B | 4E89 | 89F4 | F646 | 4E89 | 89F8 |
| 0000032040 | FA46 | 0C6A | 76FF | FFFA | F876 | 681E | 0742 | 9C9A |
| 0000032060 | D23F | 8330 | 0AC4 | C00B | 1A74 | 8146 | FFFE | 767F |
| 0000032100 | E903 | 00BD | 5EC4 | FFF8 | F846 | 8026 | 003F | EA75 |
| 0000032120 | EB47 | 900D | 5EC4 | FFF8 | F846 | 8026 | 003F | F475 |
| 0000032140 | 5E8B | 26F8 | 3F80 | 7500 | 8DB9 | 0145 | 6A5D | 9A04 |
| 0000032160 | 4280 | 30E1 | C483 | 8904 | F046 | 5689 | 56F2 | 3C9A |
| 0000032200 | 173C | 8331 | 02C4 | 4689 | 89FC | FE56 | 468B | 0BF2 |
| 0000032220 | F046 | 6D74 | C28B | 460B | 74FC | 8B66 | F046 | 568B |
| 0000032240 | A3F2 | 096F | 1689 | 0971 | 0C6A | 76FF | FFF6 | F476 |
| 0000032260 | 681E | 0742 | 9C9A | 1C3F | 832E | 0AC4 | C00B | 2C74 |
| 0000032300 | 468B | 8BFC | FE56 | 5EC4 | 83F0 | F046 | 2604 | 0789 |
| 0000032320 | 8926 | 0257 | 5EC4 | FFF4 | F446 | 8A26 | C407 | FC5E |
| 0000032340 | 46FF | 26FC | 0788 | C00A | 0E74 | E8EB | 5EC4 | FFF4 |
| 0000032360 | F446 | 8026 | 003F | F475 | 5EC4 | 26F4 | 3F80 | 7500 |
| 0000032400 | 5EA7 | C95F | 90CB | 8B55 | 56EC | B857 | 2EF8 | D88E |
| 0000032420 | C08E | 568B | BE06 | 0FAA | 3BAD | 74C2 | 4010 | 7496 |
| 0000032440 | 970C | C033 | FFB9 | F2FF | 8BAE | EBF7 | 96EB | 5E5F |
| 0000032460 | E58B | CA5D | 0002 | 8B55 | 57EC | 76FF | 0E06 | C5E8 |
| 0000032500 | 0BFF | 74C0 | 921F | FA8B | C033 | FFB9 | F2FF | F7AE |
| 0000032520 | 49D1 | 8B50 | BBC4 | 0002 | 1E53 | 5152 | 5016 | FF9A |
| 0000032540 | 00FF | 5B00 | 8B5F | 5DE5 | 02CA | 0000 | 1601 | 0202 |
| 0000032560 | 0203 | 1804 | 0D05 | 0906 | 0C07 | 0C08 | 0C09 | 070A |
| 0000032600 | 080B | 160C | 160D | 020F | 0D10 | 1211 | 0212 | 0235 |
| 0000032620 | 0D41 | 0243 | 0D52 | 0D53 | 0D57 | 0B59 | 0D6C | 206D |
| 0000032640 | 1C70 | 0972 | 1606 | 0A80 | 0A81 | 0982 | 0D84 | 0BA4 |
| 0000032660 | 02CE | 0BD7 | 0D00 | 1608 | 8B52 | E8D8 | 0F74 | 8E93 |
| 0000032700 | 5AC2 | 8926 | 0247 | 8926 | B817 | FFFF | 8B99 | 5DE5 |
| 0000032720 | E8CB | 0008 | FFB8 | 99FF | E58B | CB5D | D88B | 51E8 |
| 0000032740 | 930F | C28E | 8926 | 0247 | BB53 | 31CC | 24B9 | 0A00 |
| 0000032760 | 75E4 | 2E1B | 073A | 1674 | 4343 | F7E2 | 133C | 0472 |
| 0000033000 | 243C | 0A76 | 3C43 | 72BC | 3C04 | 76CA | 4301 | 8A2E |
| 0000033020 | 0147 | 5B98 | 8926 | C307 | 8B55 | BBEC | 0002 | 05EB |
| 0000033040 | 8B55 | 33EC | E8DB | 0F0A | C303 | CB5D | 8B55 | 56EC |
| 0000033060 | 8B57 | 0876 | 448A | A80A | 7482 | A864 | 7540 | C760 |
| 0000033100 | 0444 | 0000 | 01A8 | 0B74 | 10A8 | 5374 | 4C8B | 8906 |
| 0000033120 | 240C | 0CFE | 2402 | 88EF | 0A44 | FE8B | EF81 | 0988 |
| 0000033140 | C781 | 0B68 | DB33 | 5C8A | A80B | 7508 | A84B | 7504 |
| 0000033160 | F618 | 0105 | 4275 | FE81 | 0994 | 0674 | FE81 | 09A0 |
| 0000033200 | 2675 | 87F6 | 0769 | 7440 | B91F | 0001 | 1651 | 7E8D |
| 0000033220 | 5706 | 0E53 | 71E8 | 8307 | 08C4 | 01B9 | EB00 | B846 |
| 0000033240 | FFFF | 4C80 | 200A | 65EB | 1E53 | E856 | 0064 | C483 |
| 0000033260 | 5B04 | 44F6 | 080A | D174 | 0C8B | 548B | 2B06 | 42CA |
| 0000033300 | 1489 | 558B | 4A02 | 5489 | E304 | 5125 | FF51 | 0874 |
| 0000033320 | 74FF | 5306 | E80E | 0730 | C483 | 5908 | 7CC4 | 8B06 |
| 0000033340 | 0656 | 8826 | 3B15 | 75C1 | 33B6 | 8AC0 | 0646 | 1DEB |
| 0000033360 | C033 | 87F6 | 0769 | 7420 | B9E3 | 0002 | 5051 | 5350 |
| 0000033400 | E80E | 068C | C483 | 3308 | 8BC0 | EBC8 | 5FCF | 5D5E |
| 0000033420 | 00CB | 8B55 | 56EC | 768B | B804 | 0200 | 9A50 | 3C3C |
| 0000033440 | 3091 | 8B59 | 81DE | 88EB | 8109 | 68C3 | 0B0B | 74D2 |
| 0000033460 | 800B | 0A4C | C708 | 0247 | 0200 | 0EEB | 4C80 | 040A |
| 0000033500 | 47C7 | 0102 | 8C00 | 8DDA | 0147 | 5489 | 8902 | 8904 |

THU MAR 14 17:47:32 1991 TESTWIN.DLL PAGE 16, LINE 886

| | | | | | | | | |
|---|---|---|---|---|---|---|---|---|
| 0000033520 | 0854 | 4489 | C706 | 0444 | 0000 | 5D5E | 00C3 | 04C8 |
| 0000033540 | 0000 | 468B | 0B08 | 0646 | 0875 | 006A | A7E8 | EB00 |
| 0000033560 | 9031 | 468B | 2D06 | 0988 | 0CB9 | 9900 | F9F7 | 4689 |
| 0000033600 | 50FC | F3E8 | 830C | 02C4 | 76FF | FF08 | 0676 | 049A |
| 0000033620 | 4834 | 8334 | 04C4 | 4689 | FFFE | FC76 | E5E8 | 8B0C |
| 0000033640 | FE46 | CBC9 | 02C8 | 0000 | 5657 | FF2B | 768B | 8A06 |
| 0000033660 | 0A44 | C88B | 0324 | 023C | 3F75 | C1F6 | 7508 | 8B0D |
| 0000033700 | 81DE | 88EB | F609 | 6887 | 010B | 2D74 | 048B | 442B |
| 0000033720 | 8906 | FE46 | C00B | 217E | FF50 | 0874 | 74FF | 8A06 |
| 0000033740 | 0B4C | ED2A | 9A51 | 3A68 | 34C5 | C483 | 3908 | FE46 |
| 0000033760 | 0774 | 4C80 | 200A | FFBF | 8BFF | 0644 | 548B | 8908 |
| 0000034000 | 8904 | 0254 | 44C7 | 0004 | 8B00 | 5EC7 | C95F | 90CB |
| 0000034020 | 016A | 01E8 | CB00 | 04C8 | 0000 | 5657 | 88BE | 2B09 |
| 0000034040 | 89FF | FE7E | 026A | 9FE8 | 830C | 02C4 | 11EB | 46C7 |
| 0000034060 | FFFE | FFFF | FC76 | 4BE8 | 830C | 02C4 | C683 | 390C |
| 0000034100 | 4836 | 720D | 8B2B | 2DC6 | 0988 | 0CB9 | 9900 | F9F7 |
| 0000034120 | 4689 | 50FC | 21E8 | 830C | 02C4 | 44F6 | 830A | D374 |
| 0000034140 | 561E | 049A | 8034 | 8333 | 04C4 | 7440 | 47C1 | C3EB |
| 0000034160 | 026A | 7DE8 | 830C | 02C4 | 7E83 | 0104 | 0475 | C78B |
| 0000034200 | 03EB | 468B | 5EFE | C95F | 02C2 | 9000 | 3554 | 355F |
| 0000034220 | 3575 | 35A9 | 35D5 | 35DD | 3606 | 3638 | 8B55 | B8EC |
| 0000034240 | 0171 | E80E | FB3E | 5756 | C033 | 4689 | 88F8 | FB46 |
| 0000034260 | 76C4 | 260A | 89AC | 0A76 | 4688 | 0AFE | 74C0 | 8306 |
| 0000034300 | F87E | 7D00 | 8B06 | F846 | B5E9 | BB04 | 0D4C | 202C |
| 0000034320 | 583C | 0577 | 24D7 | EB0F | B002 | B100 | D203 | 02E0 |
| 0000034340 | FB46 | FED7 | D2C1 | 88E8 | FB46 | 8B98 | D1D8 | 2EE3 |
| 0000034360 | A7FF | 34EC | 568A | B9FE | 0001 | 36E8 | EB04 | 33B1 |
| 0000034400 | 89C0 | F046 | 4689 | 89F6 | EE46 | 46C7 | 20FC | 4800 |
| 0000034420 | 4689 | EBF4 | 8A9B | FE46 | 2D3C | 0675 | 4E80 | 04FC |
| 0000034440 | 8EEB | 2B3C | 0675 | 4E80 | 01FC | 84EB | 203C | 0775 |
| 0000034460 | 4E80 | 02FC | 79E9 | 3CFF | 7523 | 8007 | FC4E | E980 |
| 0000034500 | FF6E | 4E80 | 08FC | 67E9 | 8AFF | FE4E | F980 | 752A |
| 0000034520 | E80F | 035C | C00B | 1779 | D8F7 | 4E80 | 04FC | 0FEB |
| 0000034540 | E980 | 3230 | 8BED | F646 | 0ABB | F700 | 03E3 | 89C1 |
| 0000034560 | F646 | 3BE9 | C7FF | F446 | 0000 | 33E9 | 8AFF | FE4E |
| 0000034600 | F980 | 752A | E80C | 0328 | C00B | 1479 | FFB8 | EBFF |
| 0000034620 | 800F | 30E9 | ED32 | 468B | BBF4 | 000A | E3F7 | C103 |
| 0000034640 | 4689 | E9F4 | FF0A | 468A | 3CFE | 756C | 8006 | FC4E |
| 0000034660 | EB10 | 3C22 | 7546 | 8006 | FC4E | EB20 | 3C18 | 754E |
| 0000034700 | 8006 | FD4E | EB10 | 3C0E | 754C | 8006 | FD4E | EB04 |
| 0000034720 | 8004 | FD4E | E908 | FED8 | 468A | 3CFE | 7564 | E903 |
| 0000034740 | 0194 | 693C | 0375 | 8DE9 | 3C01 | 7575 | E903 | 018A |
| 0000034760 | 583C | 0375 | 89E9 | 3C01 | 7578 | E903 | 0188 | 6F3C |
| 0000035000 | 0375 | A2E9 | 3C01 | 7463 | 3C1A | 7473 | 3C27 | 746E |
| 0000035020 | 3C51 | 7470 | 3C60 | 7445 | 3C07 | 7447 | E903 | 00BB |
| 0000035040 | B5E9 | E800 | 028A | BE8D | FE8F | 0716 | 4FAA | 01B9 |
| 0000035060 | E900 | 01F1 | 90E8 | 0B02 | 75FF | 8C12 | 0BC0 | 75C0 |
| 0000035100 | 1E0C | BF07 | 0DA5 | 0E8B | 0DAB | D8E9 | 5701 | 4E8B |
| 0000035120 | E3F4 | 3207 | F2C0 | 75AE | 4F01 | 2B59 | 87F9 | E9CF |
| 0000035140 | 01C3 | 62E8 | 8B02 | F846 | F6AB | FC46 | 7410 | 3303 |
| 0000035160 | ABC0 | 3BE9 | F6FE | FC46 | 7530 | E805 | 0232 | 39EB |
| 0000035200 | 36E8 | F602 | FD46 | 7518 | C630 | FF46 | B907 | 0010 |
| 0000035220 | 0716 | 3352 | 8DD2 | 97BE | BEFE | 0004 | B0E8 | B902 |
| 0000035240 | 0010 | BE8D | FE92 | 3358 | BED2 | 0004 | A0E8 | C602 |
| 0000035260 | 9386 | 3AFE | 09B9 | EB00 | C618 | FF46 | B907 | 0010 |
| 0000035300 | 0716 | D233 | BE8D | FE92 | 04BE | E800 | 0281 | 04B9 |
| 0000035320 | 8D00 | 8FBE | E9FE | 014D | 46FF | 80EE | FC4E | 8A40 |
| 0000035340 | FE46 | 200C | 8B98 | 83F0 | F47E | 7F00 | 7413 | C707 |
| 0000035360 | F446 | 0006 | 0AEB | 673D | 7500 | C705 | F446 | 0001 |

THU MAR 14 17:47:32 1991 TESTWIN.DLL PAGE 17, LINE 945

| | | | | | | | | |
|---|---|---|---|---|---|---|---|---|
| 0000035400 | BE8D | FE8F | 76FF | FFEE | F476 | 1656 | FF57 | 1076 |
| 0000035420 | 76FF | F60E | FD46 | 7404 | FF0A | D21E | 830D | 0E46 |
| 0000035440 | EB0A | FF08 | BE1E | 830D | 0E46 | 8308 | 0EC4 | 46F6 |
| 0000035460 | 80FC | 0F74 | 7E83 | 00F4 | 0975 | 5716 | 1EFF | 0DCA |
| 0000035500 | C483 | 8304 | 67FE | 1075 | 46F7 | 80FC | 7500 | 1609 |
| 0000035520 | FF57 | C21E | 830D | 04C4 | 0716 | 8026 | 2D3D | 0575 |
| 0000035540 | 8047 | FD4E | B901 | FFFF | B057 | F200 | 4FAE | 2B59 |
| 0000035560 | 87F9 | E9CF | 00AF | 4E80 | 40FC | 46C6 | 0AFA | 35EB |
| 0000035600 | 46C6 | 07FF | 04EB | 46C6 | 27FF | 46F6 | 80FC | 1174 |
| 0000035620 | 46C7 | 02F0 | C600 | F246 | B230 | 0251 | FF56 | 5688 |
| 0000035640 | C6F3 | FA46 | EB10 | F60E | FC46 | 7480 | 8004 | FD4E |
| 0000035660 | C602 | FA46 | F608 | FC46 | 7410 | E805 | 00FB | 0EEB |
| 0000035700 | EDE8 | F600 | FC46 | 7440 | 9903 | 02EB | D233 | 46F6 |
| 0000035720 | 40FC | 0F74 | D20B | 0B7D | 4E80 | 01FD | D8F7 | D283 |
| 0000035740 | F700 | 83DA | F47E | 7D00 | C707 | F446 | 0001 | 04EB |
| 0000035760 | 6680 | F7FC | D88B | DA0B | 0575 | 46C7 | 00F0 | 8D00 |
| 0000036000 | EB7E | 0716 | 4E8A | 32FA | 8BED | F476 | 40E8 | F601 |
| 0000036020 | FD46 | 7402 | E30E | 2606 | 3D80 | 7430 | 4F06 | C626 |
| 0000036040 | 3005 | EB41 | F600 | FC46 | 7440 | F631 | FD46 | 7401 |
| 0000036060 | C60B | F246 | C72D | F046 | 0001 | 20EB | 46F6 | 01FC |
| 0000036100 | 0B74 | 46C6 | 2BF2 | 46C7 | 01F0 | EB00 | F60F | FC46 |
| 0000036120 | 7402 | C609 | F246 | C720 | F046 | 0001 | 468B | 2BF6 |
| 0000036140 | 2BC1 | F046 | 027D | C033 | 5706 | F651 | FC46 | 750C |
| 0000036160 | 8B07 | B2C8 | E820 | 00BB | 1650 | 8D07 | F27E | 4E8B |
| 0000036200 | E8F0 | 0091 | F658 | FC46 | 7408 | F60D | FC46 | 7504 |
| 0000036220 | 8B07 | B2C8 | E830 | 009B | 5F59 | 5007 | 76E8 | 5800 |
| 0000036240 | 46F6 | 04FC | 0774 | C88B | 20B2 | 86E8 | E900 | FC00 |
| 0000036260 | 76C4 | 260E | 89AD | 0E76 | C4C3 | 0E76 | AD26 | D08B |
| 0000036300 | AD26 | 8992 | 0E76 | F6C3 | FC46 | 7420 | E808 | FFE9 |
| 0000036320 | C28E | F88B | E8C3 | FFD8 | F88B | C00B | 0375 | C08E |
| 0000036340 | 1EC3 | C307 | 0698 | C457 | 065E | FF26 | 044F | 1078 |
| 0000036360 | 8B26 | 263F | 07FF | 8E26 | 0247 | 33AA | 5FC0 | C307 |
| 0000036400 | 5251 | 5306 | 0E50 | 23E8 | 83F9 | 06C4 | 595A | FF3D |
| 0000036420 | 75FF | EBE8 | E3E8 | 8B1B | 01F7 | F84E | 3357 | 26FF |
| 0000036440 | E8AC | FFC0 | F80B | F7E2 | FF0B | 745F | C705 | F846 |
| 0000036460 | FFFF | E3C3 | 0119 | F84E | 3357 | 8AFF | E8C2 | FFA4 |
| 0000036500 | F80B | F7E2 | FF0B | 745F | C705 | F846 | FFFF | FDC3 |
| 0000036520 | 9357 | F60B | 0A7F | DB0B | 0675 | D20B | 0275 | 1AEB |
| 0000036540 | 3392 | F7D2 | 93F1 | F1F7 | 8792 | 04D3 | 3C30 | 7639 |
| 0000036560 | 0203 | FF46 | 8BAA | 4EC2 | D8EB | 2B59 | 47CF | C3FC |
| 0000036600 | 5E5F | E58B | CB5D | 8B55 | 83EC | 02EC | C033 | 09EB |
| 0000036620 | 8B55 | 83EC | 02EC | FFB8 | 89FF | FE46 | 5E8B | 3B06 |
| 0000036640 | 671E | 7207 | BA19 | 0009 | C033 | 0BE9 | 8BF8 | FE4E |
| 0000036660 | C90B | 0774 | E853 | 06E4 | C483 | E902 | F813 | C00B |
| 0000036700 | 0774 | E853 | 06CA | C483 | 8302 | 04EC | CC8B | FF53 |
| 0000036720 | 0A76 | 76FF | FF08 | 0C76 | 5116 | FF9A | 00FF | 5900 |
| 0000036740 | 855A | 75C0 | 80C8 | 69A7 | FD07 | 468B | 0BFE | 74C0 |
| 0000036760 | 5307 | A7E8 | 8306 | 02C4 | 8B91 | 5DE5 | 00CB | 8B55 |
| 0000037000 | 83EC | 0EEC | C033 | 09EB | 8B55 | 83EC | 0EEC | FFB8 |
| 0000037020 | 89FF | F246 | 5E8B | 3B06 | 671E | 7207 | BA08 | 0009 |
| 0000037040 | C033 | 93E9 | 0BF7 | 74CD | 5307 | 63E8 | 8306 | 02C4 |
| 0000037060 | 87F6 | 0769 | 7420 | 5312 | C933 | 5151 | 4141 | 8D51 |
| 0000037100 | F446 | 5016 | 3B9A | 003A | F600 | 6987 | 8007 | 6674 |
| 0000037120 | 5E8C | 8EFA | 0A46 | 56C5 | 3308 | 89C0 | FE46 | 4689 |
| 0000037140 | FCFC | 5657 | FA8B | F28B | 6689 | 8BF8 | 0C4E | 28E3 |
| 0000037160 | 0AB0 | AEF2 | 3B75 | EC83 | 8B02 | BADC | 0080 | E22B |
| 0000037200 | D48B | FA8B | 0716 | 4E8B | AC0C | 0A3C | 0D74 | FB3B |
| 0000037220 | 1A74 | E2AA | E8F4 | 0038 | AFE9 | B000 | 3B0D | 75FB |
| 0000037240 | E803 | 002C | B0AA | FF0A | FC46 | E2EB | 21E8 | EB00 |

THU MAR 14 17:47:32 1991 TESTWIN.DLL PAGE 18, LINE 1004

| | | | | | | | | |
|---|---|---|---|---|---|---|---|---|
| 0000037260 | 5EE1 | 8E5F | FA5E | C8E9 | 8B00 | F246 | C00B | 0974 |
| 0000037300 | 76FF | E806 | 05D6 | C483 | B802 | FFFC | E80E | F514 |
| 0000037320 | 5350 | 1E51 | 1F06 | CF8B | CA2B | 21E3 | 8B51 | 065E |
| 0000037340 | 1E53 | 5152 | 468D | 16F4 | 9A50 | 31BF | 0000 | 0B59 |
| 0000037360 | 75C0 | 8B11 | F45E | 5E01 | 3BFE | 72D9 | 1F07 | 5B59 |
| 0000037400 | 8B58 | C3FA | 831F | 08C4 | 7E83 | 00FE | 3C75 | C00B |
| 0000037420 | 1874 | 6D3D | 7400 | 3D0D | 0001 | 09BA | 7500 | BA08 |
| 0000037440 | 001C | 03EB | 20BA | F900 | 26EB | 5E8E | F6FA | 6987 |
| 0000037460 | 4007 | 0E74 | 5E8E | 8B0A | 085E | 3F80 | 751A | F803 |
| 0000037500 | 0EEB | 1CBA | 3300 | F9C0 | 06EB | 468B | 2BFE | FC46 |
| 0000037520 | 668B | 5EF8 | 8E5F | FA5E | 1472 | 5E8B | 0BF2 | 74DB |
| 0000037540 | FF09 | 0676 | 35E8 | 8305 | 02C4 | E58B | CB5D | 5E8B |
| 0000037560 | 0BF2 | 74DB | FF09 | 0676 | 21E8 | 8305 | 02C4 | 37E9 |
| 0000037600 | 8BF6 | 0C4E | C90B | 0475 | C18B | CEEB | C51E | 0856 |
| 0000037620 | 1E53 | 5152 | 468D | 16F4 | 9A50 | 3B4A | 0000 | 071E |
| 0000037640 | 0B1F | 74C0 | 3D17 | 006D | 0D74 | 013D | BA00 | 0009 |
| 0000037660 | BC75 | 1CBA | EB00 | BAB7 | 0020 | B2EB | 468B | 0BF4 |
| 0000037700 | 75C0 | F697 | 6987 | 4007 | 0A74 | DA8B | 8026 | 1A3F |
| 0000037720 | 0275 | 86EB | 1CBA | 3300 | EBC0 | 0093 | 63EA | F13C |
| 0000037740 | EA33 | 3C82 | 3C3F | 50EA | 443C | EA3C | 3C50 | 3C49 |
| 0000037760 | 8B55 | 56EC | 76C4 | 8C06 | E3C1 | 2605 | 4C80 | 01FE |
| 0000040000 | 5D5E | 55CB | EC8B | 096A | BDE8 | 8304 | 02C4 | 76FF |
| 0000040020 | 0E06 | 0DE8 | 5B00 | 096A | D7E8 | 8304 | 02C4 | E58B |
| 0000040040 | CB5D | 8B55 | 56EC | 8B57 | 064E | F983 | 77E8 | 1E69 |
| 0000040060 | B0A1 | 0B0D | 74C0 | BF48 | 3D6A | 368B | 0DB8 | 1EC5 |
| 0000040100 | 0DB2 | 561E | FF57 | 5FD7 | 735E | 8C2B | C5DA | 0C5F |
| 0000040120 | D63B | EF75 | 1F58 | C41E | B236 | 260D | 748B | C512 |
| 0000040140 | AE1E | 8C0D | 3BDA | 75D0 | 1FD9 | 811E | E6FF | 743D |
| 0000040160 | BF0E | 3DE6 | C4EB | 815E | 6AFF | 743D | EB0F | 070A |
| 0000040200 | BF06 | 0DAE | E1E8 | 7201 | E80E | 007E | 891F | B416 |
| 0000040220 | 890D | B21E | EB0D | 1F04 | C033 | 5F99 | 5D5E | 00CB |
| 0000040240 | 5706 | F88B | FB03 | 7F89 | 4F04 | 2D4F | 0016 | 778D |
| 0000040260 | C714 | FE0E | 09FF | 0A7F | 8948 | 8C04 | 8B1F | 8CC6 |
| 0000040300 | 8EDA | 8DC2 | 067F | ABFC | 47AB | 3347 | ABC0 | ABAB |
| 0000040320 | 5FAB | C307 | 8B26 | 0245 | C00B | 0975 | 8C26 | 025D |
| 0000040340 | 8926 | EB1D | 0614 | C426 | 0875 | 8C26 | 0E5C | 8926 |
| 0000040360 | 0C5C | 478C | 8912 | 1077 | 2607 | 5D8C | 260A | 5D89 |
| 0000040400 | 2608 | 5D8C | 2606 | 5D89 | C304 | 8041 | FEE1 | FC53 |
| 0000040420 | 778B | 8B08 | 0A5F | FF33 | 23EB | C38B | A85B | 7501 |
| 0000040440 | 5342 | 778B | 8B06 | 085F | DE3B | 3674 | 334B | EBFF |
| 0000040460 | 900C | 548D | 3BFE | 73D3 | 03E1 | 72F0 | AD23 | 01A8 |
| 0000040500 | F074 | FE8B | 3B48 | 73C1 | 0323 | 72F0 | 8B13 | ADD0 |
| 0000040520 | 01A8 | DE74 | C203 | 0205 | 8B00 | 89F7 | FE44 | E4EB |
| 0000040540 | C08B | 8B5B | 0647 | 4789 | F908 | 19EB | 895B | FE4C |
| 0000040560 | 0974 | F903 | C12B | 8948 | 2B05 | 03F9 | 89F9 | 087F |
| 0000040600 | C68B | DA8C | C3F8 | 5751 | 47F6 | 0102 | 6674 | B7E8 |
| 0000040620 | 8B00 | 8BFE | A804 | 7401 | 2B03 | 49C8 | 4141 | 778B |
| 0000040640 | 0B04 | 74F6 | 034F | 73CE | 3309 | BAC0 | FFF0 | 33E3 |
| 0000040660 | 42EB | 6CB8 | 8E31 | 26C0 | BCA1 | 3D0D | 2000 | 1674 |
| 0000040700 | 00BA | 3B80 | 72D0 | D106 | 75EA | EBF8 | 8322 | 08FA |
| 0000040720 | 1D72 | E2D1 | C28B | 8B48 | 03D0 | 73C1 | 3302 | F7C0 |
| 0000040740 | 23D2 | 52C2 | 2EE8 | 5A00 | 0D73 | FA83 | 74F0 | B805 |
| 0000040760 | 0010 | E2EB | EBF9 | 8B1B | 2BD0 | 0457 | 4789 | 8904 |
| 0000041000 | 087F | 778B | 4A0A | 1489 | 0342 | C7F2 | FE04 | 89FF |
| 0000041020 | 0A77 | 595F | 8BC3 | F6D0 | 0247 | 7404 | 4A0F | 778B |
| 0000041040 | 4E04 | D63B | 0572 | 5739 | 73FE | 4218 | 1E50 | C39A |
| 0000041060 | 002D | 0B00 | 75C0 | 8B0F | F6C2 | 0247 | 7404 | 4A04 |
| 0000041100 | 5789 | F8FE | 01EB | C3F9 | 8B57 | 0877 | 773B | 750A |
| 0000041120 | 8B03 | 0677 | 3DAD | FFFE | 0874 | FE8B | FE24 | F003 |

THU MAR 14 17:47:32 1991 TESTWIN.DLL PAGE 19, LINE 1063

| | | | | | | | | |
|---|---|---|---|---|---|---|---|---|
| 0000041140 | F2EB | 4F4F | F78B | C35F | D18B | C283 | 8027 | F0E2 |
| 0000041160 | 8B50 | 52C4 | 5016 | C033 | 9A50 | FFFF | 0000 | 0B1F |
| 0000041200 | 75C0 | 3314 | 26DB | 458B | 890C | 0247 | C28B | 0FE8 |
| 0000041220 | E8FE | FE40 | EBF8 | F901 | 00C3 | 8B55 | 8BEC | 8BD7 |
| 0000041240 | 1EDE | 76C5 | 8B0A | 8CFE | 8ED8 | 33C0 | B9C0 | FFFF |
| 0000041260 | AEF2 | D1F7 | 7EC4 | 8B06 | A8C7 | 7401 | A402 | D149 |
| 0000041300 | F3E9 | 13A5 | F3C9 | 8BA4 | 8BF3 | 1FFA | C28C | CB5D |
| 0000041320 | 8B55 | 8BEC | 8BD7 | 1EDE | 76C5 | C406 | 0A7E | C033 |
| 0000041340 | FFB9 | F2FF | F7AE | 2BD1 | F3F9 | 74A6 | 1B05 | 1DC0 |
| 0000041360 | FFFF | 8B1F | 8BF3 | 5DFA | 00CB | 8B55 | 8BEC | C4D7 |
| 0000041400 | 067E | C033 | FFB9 | F2FF | F7AE | 49D1 | 8B91 | 5DFA |
| 0000041420 | 00CB | 8B55 | 57EC | 1E56 | 7EC4 | C506 | 0A76 | DF8B |
| 0000041440 | 4E8B | E30E | AC0C | C00A | 0374 | E2AA | 32F8 | F3C0 |
| 0000041460 | 8BAA | 8CC3 | 1FC2 | 5F5E | E58B | CB5D | 8B55 | 57EC |
| 0000041500 | 1E56 | 4E8B | E30E | 8B27 | C4D9 | 067E | F78B | C033 |
| 0000041520 | AEF2 | D9F7 | CB03 | FE8B | 76C5 | F30A | 8AA6 | FF44 |
| 0000041540 | C933 | 3A26 | FF45 | 0477 | 0474 | 4949 | D1F7 | C18B |
| 0000041560 | 5E1F | 8B5F | 5DE5 | 00CB | 01E9 | 0000 | 8B55 | 57EC |
| 0000041600 | 1E56 | 76C5 | 3306 | 99C0 | DB33 | 3CAC | 7420 | 3CFB |
| 0000041620 | 7409 | 50F7 | 2D3C | 0474 | 2B3C | 0175 | 3CAC | 7739 |
| 0000041640 | 2C1F | 7230 | D11B | D1E3 | 8BD2 | 8BCB | D1FA | D1E3 |
| 0000041660 | D1D2 | D1E3 | 03D2 | 13D9 | 03D7 | 83D8 | 00D2 | DCEB |
| 0000041700 | 3C58 | 932D | 0775 | D8F7 | D283 | F700 | 1FDA | 5F5E |
| 0000041720 | CB5D | 04C8 | 0000 | A156 | 096F | 168B | 0971 | 4689 |
| 0000041740 | 89FC | FE56 | 0C6A | DFE8 | 8300 | 02C4 | 468B | 0BFE |
| 0000041760 | FC46 | 7674 | 468B | 0B08 | 0646 | 6E74 | 76FF | FF08 |
| 0000042000 | 0676 | 5A9A | 823F | 8340 | 04C4 | F08B | 5EC4 | 26FC |
| 0000042020 | 478B | 2602 | 070B | 5274 | FF26 | 0277 | FF26 | 9A37 |
| 0000042040 | 3F5A | 40A3 | C483 | 3B04 | 7EC6 | C439 | FC5E | C426 |
| 0000042060 | 261F | 3880 | 753D | 562D | 76FF | FF08 | 0676 | 5306 |
| 0000042100 | 9C9A | 4E3F | 833C | 0AC4 | C00B | 1875 | 0C6A | A1E8 |
| 0000042120 | 8300 | 02C4 | 5EC4 | 26FC | 078B | 8B26 | 0257 | C603 |
| 0000042140 | EB40 | 9012 | 4683 | 04FC | A2EB | 0C6A | 83E8 | 8300 |
| 0000042160 | 02C4 | C02B | 5E99 | CBC9 | 8B55 | 50EC | 468B | 0504 |
| 0000042200 | 0014 | 4BEB | 8B55 | 50EC | 468B | 0504 | 0014 | 69EB |
| 0000042220 | 8B55 | 50EC | 468B | 0504 | 0114 | 33EB | 8B55 | 50EC |
| 0000042240 | 468B | 0504 | 0114 | 51EB | 8B55 | 50EC | 468B | C104 |
| 0000042260 | 02E0 | FF68 | 50FF | FF6A | FF6A | FF9A | 00FF | 0B00 |
| 0000042300 | 75C0 | 5829 | E58B | C35D | 8B55 | 50EC | 468B | FF04 |
| 0000042320 | DE06 | C10E | 02E0 | 1368 | 5041 | FF6A | FF6A | FF9A |
| 0000042340 | 00FF | 0B00 | 75C0 | 5805 | E58B | C35D | 11B8 | E900 |
| 0000042360 | ECB9 | 8B55 | 50EC | 468B | C104 | 02E0 | 3768 | 5041 |
| 0000042400 | FF9A | 00FF | 0B00 | 75C0 | FFE3 | DE0E | 580E | E58B |
| 0000042420 | C35D | 8B55 | FFEC | 0676 | ADE8 | 83FF | 02C4 | E58B |
| 0000042440 | CB5D | 8B55 | FFEC | 0676 | C7E8 | 83FF | 02C4 | E58B |
| 0000042460 | CB5D | 068E | ⁿ728 | A126 | 0006 | 3B48 | E006 | 770E |
| 0000042500 | C107 | 06E0 | FFBA | C3FF | 5357 | 6A51 | E80F | FF78 |
| 0000042520 | C483 | 3B02 | E006 | 760E | 8B40 | 05D8 | 0004 | FC25 |
| 0000042540 | 8BFF | C1C8 | 06E0 | A5BA | 5041 | 9A52 | 3E8F | 0000 |
| 0000042560 | C00B | 3275 | 8B49 | 87F9 | E03E | 2B0E | 51CF | C147 |
| 0000042600 | 06E7 | E1C1 | 5705 | C28E | ABF3 | 595F | C726 | 0445 |
| 0000042620 | 0200 | C783 | E240 | 8BF5 | 6AC3 | E80F | FF54 | C483 |
| 0000042640 | 5902 | 5F5B | 9BEB | 10B8 | E900 | EBFF | 04C8 | 0000 |
| 0000042660 | 5657 | 126A | 11E8 | 83FF | 02C4 | 06C6 | 1210 | 8B42 |
| 0000042700 | 0646 | 568B | A308 | 120C | 1689 | 120E | 06BE | 8912 |
| 0000042720 | 8904 | 0254 | 06C7 | 120A | 7FFF | 468D | 160E | FF50 |
| 0000042740 | 0C76 | 76FF | 1E0A | 9A56 | 34FC | 426D | C483 | 8B0C |
| 0000042760 | FFF8 | 0A0E | 7812 | C40F | 061E | FF12 | 0606 | 2612 |
| 0000043000 | 07C6 | EB00 | 900D | 561E | 006A | 8C9A | 6532 | 8340 |

THU MAR 14 17:47:32 1991 TESTWIN.DLL PAGE 20, LINE 1122

| | | | | | | | | |
|---|---|---|---|---|---|---|---|---|
| 0000043020 | 06C4 | 126A | DBE8 | 83FE | 02C4 | C78B | 5F5E | CBC9 |
| 0000043040 | 8B55 | 57EC | 468B | F706 | D866 | 0573 | C033 | EB99 |
| 0000043060 | 501A | 3C9A | 4A3C | 5942 | D88B | DA0B | 0D74 | 8B50 |
| 0000043100 | 8EF8 | 33C2 | 41C0 | E9D1 | ABF3 | 5F58 | CB5D | 8B55 |
| 0000043120 | 56EC | 768B | 8B04 | B9C6 | 000A | F799 | 04F9 | C430 |
| 0000043140 | 065E | 46FF | 2606 | 0788 | C68B | F799 | 80F9 | 30C2 |
| 0000043160 | 5E8B | FF06 | 0646 | 8826 | 8B17 | 0646 | C28C | C95E |
| 0000043200 | 06C2 | 9000 | 12C8 | 0000 | E856 | FEA6 | C28E | D88B |
| 0000043220 | 5E89 | 8CF2 | F446 | 8B26 | 1A47 | 0B26 | 1847 | 2E75 |
| 0000043240 | 1A6A | 3C9A | 953C | 8342 | 02C4 | 5EC4 | 26F2 | 4789 |
| 0000043260 | 2618 | 5789 | 8B1A | 26C2 | 470B | 7518 | C70B | EE46 |
| 0000043300 | 1212 | 5E8C | EBF0 | 9015 | 8B26 | 1847 | 08EB | 8B26 |
| 0000043320 | 1847 | 8B26 | 1A57 | 4689 | 89EE | F056 | 468B | 8BEE |
| 0000043340 | F056 | 4689 | 89F6 | F856 | 5EC4 | 2606 | 478B | 8B0C |
| 0000043360 | D1C8 | 03E0 | 89C1 | FA46 | 8B26 | 0847 | C88B | E0D1 |
| 0000043400 | C103 | 4689 | C7FC | FE46 | 0000 | 768B | 8BFE | FA5E |
| 0000043420 | 808A | 0F42 | 5EC4 | 26EE | 0788 | 5E8B | 8AFC | 5880 |
| 0000043440 | 8B0F | EE5E | 8826 | 0447 | 46FF | FFFE | EE46 | 7E83 |
| 0000043460 | 03FE | D67C | 5E8B | 83EE | EE46 | 2604 | 07C6 | 8B20 |
| 0000043500 | EE5E | 46FF | 26EE | 07C6 | 0620 | 76FF | C4EE | 065E |
| 0000043520 | FF26 | 0677 | F7E8 | 8EFE | 8BC2 | 26D8 | 07C6 | 8D20 |
| 0000043540 | 0147 | 5006 | 5EC4 | 2606 | 77FF | E804 | FEE0 | C28E |
| 0000043560 | D88B | C626 | 3A07 | 478D | 0601 | C450 | 065E | FF26 |
| 0000043600 | 0277 | C9E8 | 8EFE | 8BC2 | 26D8 | 07C6 | 8D3A | 0147 |
| 0000043620 | 5006 | 5EC4 | 2606 | 37FF | B3E8 | 8EFE | 8BC2 | 26D8 |
| 0000043640 | 07C6 | 8D20 | 0147 | 5006 | 5EC4 | 2606 | 478B | B90A |
| 0000043660 | 0064 | D88B | F799 | 05F9 | 0013 | 8B50 | E8F3 | FE8E |
| 0000043700 | 5052 | 64B9 | 8B00 | 99C6 | F9F7 | E852 | FE80 | C28E |
| 0000043720 | D88B | C626 | 0A07 | 8943 | EE5E | 468C | 26F0 | 07C6 |
| 0000043740 | 8B00 | F646 | 568B | 5EF8 | CBC9 | 04C8 | 0000 | 76FF |
| 0000043760 | FF08 | 0676 | BE9A | 6A46 | 8344 | 04C4 | 5689 | 0BFE |
| 0000044000 | 74D0 | FF0F | FE76 | 9A50 | 42E4 | 4305 | C483 | EB04 |
| 0000044020 | 9004 | C02B | C999 | 90CB | 14C8 | 0000 | 5657 | 5EC4 |
| 0000044040 | 2606 | 7F81 | CE02 | 7712 | 720F | 2607 | 3F81 | A600 |
| 0000044060 | 0673 | C02B | E999 | 0222 | F7E8 | 8EFC | 8BC2 | 89D8 |
| 0000044100 | F45E | 468C | 26F6 | 478B | 261E | 470B | 751C | 6A2D |
| 0000044120 | 9A12 | 3C3C | 44FD | C483 | C402 | F45E | 8926 | 1C47 |
| 0000044140 | 8926 | 1E57 | C28B | 0B26 | 1C47 | 0A75 | 46C7 | 16F8 |
| 0000044160 | 8C0F | FA5E | 14EB | 8B26 | 1C47 | 08EB | 8B26 | 1C47 |
| 0000044200 | 8B26 | 1E57 | 4689 | 89F8 | FA56 | E168 | 6801 | 3380 |
| 0000044220 | 5EC4 | 2606 | 77FF | 2602 | 37FF | 549A | 1B4B | 6A45 |
| 0000044240 | 68FE | AE80 | E168 | 6801 | 3380 | 5EC4 | 2606 | 77FF |
| 0000044260 | 2602 | 37FF | F08B | FA8B | F49A | 414A | C445 | F85E |
| 0000044300 | 8926 | 0A47 | 9940 | C233 | C22B | F8C1 | 3302 | 2BC2 |
| 0000044320 | 8BC2 | 8BCE | 6AF0 | 5600 | 4E89 | 89EC | EE7E | 229A |
| 0000044340 | E14A | 0345 | EC46 | D713 | 4689 | 89FC | FE56 | 468F |
| 0000044360 | 83FA | FE7E | 7D00 | 812D | FC46 | 3380 | 5681 | E1FE |
| 0000044400 | 8B01 | F85E | 8B26 | 0A47 | B940 | 0004 | F799 | 0BF9 |
| 0000044420 | 75D2 | 810A | FC46 | 5180 | 5683 | 01FE | 264E | 4FFF |
| 0000044440 | EB0A | 90CE | 5EC4 | 26F8 | 4781 | B20A | 2607 | 478B |
| 0000044460 | B90A | 0004 | D88B | F799 | 0BF9 | 75D2 | 8B25 | B9C3 |
| 0000044500 | 0064 | F799 | 0BF9 | 75D2 | 8B11 | F85E | 8B26 | 0A47 |
| 0000044520 | 90B9 | 9901 | F9F7 | D20B | 0875 | 46C7 | E2F0 | EB0E |
| 0000044540 | 9006 | 46C7 | FCF0 | 8C0E | F25E | 5E8B | 26F8 | 6F81 |
| 0000044560 | 6C0A | 6A07 | 6801 | 5180 | 76FF | FFFE | FC76 | 889A |
| 0000044600 | F749 | C445 | F85E | 8926 | 0E47 | 016A | 8068 | 8D51 |
| 0000044620 | FC46 | 5016 | 669A | 5349 | C446 | F85E | C726 | 0847 |
| 0000044640 | 0001 | 07EB | 5EC4 | 26F8 | 47FF | C408 | F85E | 8B26 |
| 0000044660 | 0E47 | 8B26 | 085F | E3D1 | 7EC4 | 26F0 | 0139 | E47C |

THU MAR 14 17:47:32 1991 TESTWIN.DLL PAGE 21, LINE 1181

| | | | | | | | | |
|---|---|---|---|---|---|---|---|---|
| 0000044700 | 5EC4 | 26F8 | 4FFF | 2608 | 5F8B | C4C8 | F87E | 8B26 |
| 0000044720 | 0E45 | E3D1 | 7EC4 | 8BF0 | 26C8 | 012B | 5EC4 | 26F8 |
| 0000044740 | 4789 | 6A06 | 6800 | 0E10 | 76FF | FFFE | FC76 | F98B |
| 0000044760 | 889A | 6D49 | C446 | F85E | 8926 | 0447 | 006A | 3C6A |
| 0000045000 | 006A | 1068 | 8D0E | FC46 | 5016 | 669A | 7A49 | 5246 |
| 0000045020 | 8950 | EC46 | 5689 | 9AEE | 4988 | 4690 | 5EC4 | 26F8 |
| 0000045040 | 4789 | 6A02 | 6A00 | FF3C | EE76 | 76FF | 9AEC | 4A54 |
| 0000045060 | 4457 | 5EC4 | 26F8 | 0789 | 6926 | 0A47 | 016D | C703 |
| 0000045100 | C603 | CA2D | B963 | 0007 | D22B | F1F7 | 8926 | 0C57 |
| 0000045120 | C726 | 1047 | 0000 | C38B | C28C | 5F5E | CBC9 | 08C8 |
| 0000045140 | 0000 | 429A | E747 | C446 | 065E | 8B26 | 2607 | 578B |
| 0000045160 | 2B02 | 3406 | 1B0F | 3616 | 890F | FC46 | 5689 | 8DFE |
| 0000045200 | FC46 | 5016 | 789A | 0A44 | 8347 | 04C4 | 4689 | 89F8 |
| 0000045220 | FA56 | D00B | 0675 | C02B | EB99 | 9044 | 3E83 | 0F38 |
| 0000045240 | 7400 | FF36 | FA76 | 9A50 | 483C | 4724 | C483 | 0B04 |
| 0000045260 | 74C0 | 8126 | FC46 | 0E10 | 5683 | 00FE | 468D | 16FC |
| 0000045300 | 9A50 | 4478 | 44B4 | C483 | 8E04 | 8BC2 | 89D8 | F85E |
| 0000045320 | 468C | 26FA | 47C7 | 0110 | 8B00 | F846 | 568B | C9FA |
| 0000045340 | 90CB | 0B6A | E1E8 | 83F9 | 02C4 | 3E83 | 122C | 7500 |
| 0000045360 | E807 | 0022 | 06FF | 122C | 0B6A | F5E8 | 83F9 | 02C4 |
| 0000045400 | 90CB | 0B6A | C1E8 | 83F9 | 02C4 | 09E8 | 6A00 | E80B |
| 0000045420 | F9E0 | C483 | CB02 | 04C8 | 0000 | 1E56 | 2868 | 9A0F |
| 0000045440 | 4032 | 47AF | C483 | 8904 | FC46 | 5689 | 0BFE | 75D0 |
| 0000045460 | E903 | 00A4 | 5EC4 | 26FC | 3F80 | 7500 | E903 | 0098 |
| 0000045500 | 036A | 5006 | 36FF | 0F3C | 36FF | 0F3A | 729A | C63F |
| 0000045520 | 8347 | 0AC4 | 006A | 1068 | 830E | FC46 | FF03 | FE76 |
| 0000045540 | 76FF | 9AFC | 3FD8 | 47D0 | C483 | 5204 | 9A50 | 4A22 |
| 0000045560 | 481B | 34A3 | 890F | 3616 | 2B0F | 8EF6 | FE46 | 5E8B |
| 0000045600 | 26FC | 3880 | 7400 | 261A | 008A | C88B | 8B98 | F6D8 |
| 0000045620 | DD87 | 040D | 0575 | F980 | 752D | 4606 | FE83 | 7C03 |
| 0000045640 | 8BDD | FC5E | 8026 | 0038 | 1874 | 036A | DE03 | 5306 |
| 0000045660 | 36FF | 0F40 | 36FF | 0F3E | 729A | C53F | 8346 | 0AC4 |
| 0000045700 | 08EB | 1EC4 | 0F3E | C626 | 0007 | 1EC4 | 0F3E | 8026 |
| 0000045720 | 013F | C01B | A340 | 0F38 | C95E | 90C3 | 04C8 | 0000 |
| 0000045740 | C456 | 065E | 8326 | 087F | 7D03 | E903 | 00B6 | 8326 |
| 0000045760 | 087F | 7E09 | E903 | 00AC | 8326 | 087F | 7E03 | 260A |
| 0000046000 | 7F83 | 0908 | 037D | 81E9 | 2600 | 778B | 810A | 6CC6 |
| 0000046020 | 8107 | C2FE | 7E07 | 2617 | 7F83 | 0308 | 1075 | 8B26 |
| 0000046040 | 085F | E3D1 | 878B | 0EFC | 0705 | EB00 | 900B | 8B26 |
| 0000046060 | 085F | E3D1 | 878B | 0EFE | 4689 | F7FC | 03C6 | 7500 |
| 0000046100 | FF03 | FC46 | 5E8B | 2606 | 778B | 830A | 46EE | 448D |
| 0000046120 | 9901 | C233 | C22B | F8C1 | 3302 | 2BC2 | 69C2 | 6DCE |
| 0000046140 | 0301 | 03C1 | FC46 | 0405 | B900 | 0007 | F799 | 2BF9 |
| 0000046160 | FC56 | DAF7 | 8326 | 087F | 7503 | 2615 | 573B | 7C0E |
| 0000046200 | 7509 | 2621 | 7F83 | 0204 | 1A7C | 01B8 | EB00 | 9017 |
| 0000046220 | 5EC4 | 8B06 | 26C2 | 4739 | 7C0E | 75EF | 2607 | 7F83 |
| 0000046240 | 0104 | E67C | C02B | C95E | 90CB | 8B55 | 57EC | 7EC4 |
| 0000046260 | 8B06 | 33DF | B9C0 | FFFF | AEF2 | F741 | 8AD9 | 0A46 |
| 0000046300 | FB8B | AEF2 | 264F | 0538 | 0474 | FF33 | C78E | C78B |
| 0000046320 | C28C | 8B5F | 5DE5 | 00CB | 8B55 | 57EC | 7EC4 | 3306 |
| 0000046340 | B9C0 | FFFF | AEF2 | F741 | 4FD9 | 468A | FD0A | AEF2 |
| 0000046360 | 2647 | 0538 | 0674 | C033 | D08B | 04EB | C78B | C28C |
| 0000046400 | 5FFC | E58B | CB5D | 8B55 | 1EEC | C553 | 065E | 76FF |
| 0000046420 | FF0C | 0A76 | 77FF | FF02 | 0E37 | D7E8 | 8900 | 0257 |
| 0000046440 | 0789 | 1F5B | CA5D | 0008 | 8B55 | 57EC | 5356 | FF33 |
| 0000046460 | 468B | 0B08 | 7DC0 | 4711 | 568B | F706 | F7D8 | 1DDA |
| 0000046500 | 0000 | 4689 | 8908 | 0656 | 468B | 0B0C | 7DC0 | 4711 |
| 0000046520 | 568B | F70A | F7D8 | 1DDA | 0000 | 4689 | 890C | 0A56 |
| 0000046540 | C00B | 1575 | 4E8B | 8B0A | 0846 | D233 | F1F7 | D88B |

THU MAR 14 17:47:32 1991 TESTWIN.DLL PAGE 22, LINE 1240

| | | | | | | | | |
|---|---|---|---|---|---|---|---|---|
| 0000046560 | 468B | F706 | 8BF1 | EBD3 | 8B38 | 8BD8 | 0A4E | 568B |
| 0000046600 | 8B08 | 0646 | EBD1 | D9D1 | EAD1 | D8D1 | DB0B | F475 |
| 0000046620 | F1F7 | F08B | 66F7 | 910C | 468B | F70A | 03E6 | 72D1 |
| 0000046640 | 3B0C | 0856 | 0777 | 0672 | 463B | 7606 | 4E01 | D233 |
| 0000046660 | 4F96 | 0775 | DAF7 | D8F7 | DA83 | 5B00 | 5F5E | CA5D |
| 0000046700 | 0008 | 8B55 | 8BEC | 0846 | 4E8B | 0B0C | 8BC8 | 0A4E |
| 0000046720 | 0975 | 468B | F706 | 5DE1 | 08CA | 5300 | E1F7 | D88B |
| 0000046740 | 468B | F706 | 0C66 | D803 | 468B | F706 | 03E1 | 5BD3 |
| 0000046760 | CA5D | 0008 | 8B55 | 53EC | 3357 | 8BFF | 0846 | C00B |
| 0000047000 | 117D | 8B47 | 0656 | D8F7 | DAF7 | 001D | 8900 | 0846 |
| 0000047020 | 5689 | 8B06 | 0C46 | C00B | 107D | 568B | F70A | F7D8 |
| 0000047040 | 1DDA | 0000 | 4689 | 890C | 0A56 | C00B | 1875 | 4E8B |
| 0000047060 | 8B0A | 0846 | D233 | F1F7 | 468B | F706 | 8BF1 | 33C2 |
| 0000047100 | 4FD2 | 4379 | 48EB | D88B | 4E8B | 8B0A | 0856 | 468B |
| 0000047120 | D106 | D1EB | D1D9 | D1EA | 0BD8 | 75DB | F7F4 | 8BF1 |
| 0000047140 | F7C8 | 0C66 | F791 | 0A66 | D103 | 0C72 | 563B | 7708 |
| 0000047160 | 7207 | 3B0B | 0646 | 0676 | 462B | 1B0A | 0C56 | 462B |
| 0000047200 | 1B06 | 0856 | 794F | F707 | F7DA | 83D8 | 00DA | 5B5F |
| 0000047220 | CA5D | 0008 | 8B55 | 53EC | 8B56 | 0C46 | C00B | 1575 |
| 0000047240 | 4E8B | 8B0A | 0846 | D233 | F1F7 | D88B | 468B | F706 |
| 0000047260 | 8BF1 | EBD3 | 8B38 | 8BC8 | 0A5E | 568B | 8B08 | 0646 |
| 0000047300 | E9D1 | DBD1 | EAD1 | D8D1 | C90B | F475 | F3F7 | F08B |
| 0000047320 | 66F7 | 910C | 468B | F70A | 03E6 | 72D1 | 3B0C | 0856 |
| 0000047340 | 0777 | 0672 | 463B | 7606 | 4E01 | D233 | 5E96 | 5D5B |
| 0000047360 | 08CA | 0000 | 8B55 | 53EC | 468B | 0B0C | 75C0 | 8B15 |
| 0000047400 | 0A4E | 468B | 3308 | F7D2 | 8BF1 | 0646 | F1F7 | C28B |
| 0000047420 | D233 | 45EB | C88B | 5E8B | 8B0A | 0856 | 468B | D106 |
| 0000047440 | D1E9 | D1DB | D1EA | 0BD8 | 75C9 | F7F4 | 8BF3 | F7C8 |
| 0000047460 | 0C66 | F791 | 0A66 | D103 | 0C72 | 563B | 7708 | 7207 |
| 0000047500 | 3B0B | 0646 | 0676 | 462B | 1B0A | 0C56 | 462B | 1B06 |
| 0000047520 | 0856 | DAF7 | D8F7 | DA83 | 5B00 | CA5D | 6208 | 0300 |
| 0000047540 | 8302 | 031B | 6A00 | 0300 | 6801 | 0204 | F300 | 0200 |
| 0000047560 | 8200 | 0147 | 0000 | 0500 | AB02 | 031A | 2500 | 0300 |
| 0000047600 | 7701 | 0623 | 5800 | 0200 | C700 | 0241 | 0000 | 0500 |
| 0000047620 | A700 | 0124 | E900 | 0224 | 5D00 | 0341 | 0000 | 0300 |
| 0000047640 | B601 | 0224 | 7D00 | 0300 | 8201 | 012F | 0500 | 0300 |
| 0000047660 | 9E01 | 0229 | 7E00 | 0300 | EA01 | 022C | 7F00 | 0300 |
| 0000047700 | 1A01 | 012F | 0700 | 0200 | CE00 | 0403 | 0000 | 0300 |
| 0000047720 | A601 | 012D | 0800 | 0300 | C102 | 031A | 7900 | 0300 |
| 0000047740 | FA01 | 013B | 8A00 | 0500 | D702 | 031A | 3300 | 0300 |
| 0000047760 | 0101 | 0204 | 0300 | 0200 | 1300 | 053E | 0000 | 0500 |
| 0000050000 | CA00 | 011D | F400 | 031D | 3F01 | 0141 | 8C00 | 0300 |
| 0000050020 | 6101 | 0141 | 8D00 | 0300 | CE01 | 0228 | 8600 | 0300 |
| 0000050040 | 1B01 | 0141 | 8E00 | 0300 | 9301 | 0207 | 0700 | 0500 |
| 0000050060 | CA00 | 011B | F700 | 031B | A201 | 022B | 8700 | 0300 |
| 0000050100 | 6F01 | 0228 | 8B00 | 0300 | 4A01 | 0204 | 8C00 | 0300 |
| 0000050120 | 4D01 | 0228 | 0D00 | 0300 | BB01 | 0604 | 6E00 | 0300 |
| 0000050140 | AB01 | 0227 | 0E00 | 0300 | B701 | 0225 | 1000 | 0500 |
| 0000050160 | 1602 | 0301 | 4100 | 0300 | 6E01 | 040F | 0300 | 0300 |
| 0000050200 | 8801 | 0227 | 1300 | 0500 | 3B00 | 0109 | 0500 | 0310 |
| 0000050220 | 1A01 | 0424 | 0800 | 0300 | 2301 | 0406 | 0900 | 0300 |
| 0000050240 | FD01 | 0207 | 1900 | 0300 | B101 | 040B | 0A00 | 0300 |
| 0000050260 | DA01 | 013E | 2200 | 0300 | 1801 | 041F | 0D00 | 0300 |
| 0000050300 | 1902 | 0301 | 9600 | 0300 | CC01 | 0141 | 2600 | 0300 |
| 0000050320 | 3001 | 0406 | 1100 | 0300 | 8601 | 0507 | 0B00 | 0300 |
| 0000050340 | D401 | 0103 | 2C00 | 0300 | AE01 | 0504 | 0C00 | 0300 |
| 0000050360 | 7A01 | 040D | 1500 | 0300 | A101 | 0107 | 2E00 | 0300 |
| 0000050400 | 3301 | 022C | 2600 | 0301 | 4001 | 0507 | 0F00 | 0300 |
| 0000050420 | 7E01 | 0503 | 1000 | 0300 | 6101 | 0423 | 1900 | 0300 |

```
THU MAR 14 17:47:32 1991  TESTWIN.DLL  PAGE 23, LINE 1299

0000050440  5001  0518  1200  0300  AE01  0400  1D00  0300
0000050460  CF01  0704  0600  0300  3001  040F  1F00  0500
0000050500  7900  0120  A000  0320  3701  0503  1A00  0300
0000050520  3001  0424  2200  0300  8801  020F  B200  0300
0000050540  A501  013A  3A00  0300  9B01  0404  2300  0300
0000050560  F801  0229  B300  0300  AB01  0506  2000  0300
0000050600  3601  0502  2100  0200  1302  0301  4100  0300
0000050620  2601  0228  3D00  0300  CA01  0502  2600  0300
0000050640  4301  070B  1900  0300  8901  0503  2C00  0300
0000050660  6D01  0506  2D00  0300  F001  0622  2500  0300
0000050700  8001  012E  4D00  0500  F800  0103  B700  0307
0000050720  2101  0507  3200  0300  A301  0506  3300  0300
0000050740  6E01  0502  3500  0300  0201  0507  3600  0300
0000050760  B001  0622  2E00  0300  0101  0624  2F00  0300
0000051000  0A02  031B  4B00  0300  9E01  0502  3B00  0300
0000051020  F701  012D  5B00  0300  2A01  0605  3700  0500
0000051040  B902  0300  8800  0300  5401  050F  4200  0300
0000051060  8401  0519  4600  0300  E901  0501  4800  0300
0000051100  4802  0316  5A00  0300  8101  0506  4A00  0300
0000051120  6701  050F  4B00  0300  5F01  050F  4C00  0500
0000051140  E702  0300  1700  0500  E206  0300  1700  0000
0000051160  0000  0000  0200  0000  0000  0000  0000  0000
0000051200  0000  0000  0000  0000  0000  0000  0000  0000
*
0000051260  0000  0000  0200  0000  0000  0000  0000  0000
0000051300  0000  0000  0000  0000  0000  0000  0000  0000
*
0000051360  0000  0000  0200  0000  0000  0000  0000  0000
0000051400  0000  0000  0000  0000  0000  0000  0000  0000
*
0000051460  0000  0000  0200  0000  0000  0000  0000  0000
0000051500  0000  0000  0000  0000  534D  5220  6E75  542D
0000051520  6D69  2065  694C  7262  7261  2079  202D  6F43
0000051540  7970  6972  6867  2074  6328  2029  3931  3039
0000051560  202C  694D  7263  736F  666F  2074  6F43  7072
0000051600  0018  6574  7473  6977  2E6E  0063  7774  702E
0000051620  4700  455F  5F57  0054  5F47  5745  545F  7500
0000051640  6168  2062  3D21  2820  7628  696F  2064  292A
0000051660  2930  6200  615F  7373  7265  0074  0042  0082
0000051700  004C  FFFF  7774  695F  696E  0074  7774  632E
0000051720  7400  2E77  0070  7242  6165  206B  6F50  6E69
0000051740  7374  0000  704F  6E65  5420  7365  0074  6E45
0000051760  6574  2072  6574  7473  6E20  6D61  2065  6F74
0000052000  6F20  6570  3A6E  4E00  7765  5420  7365  0074
0000052020  6E45  6574  2072  656E  2077  6574  7473  6E20
0000052040  6D61  3A65  4900  706D  726F  2F74  7845  6F70
0000052060  7472  4620  6C69  0065  6E45  6574  2072  7865
0000052100  6574  6E72  6C61  7320  7263  7069  2074  6966
0000052120  656C  6E20  6D61  3A65  5600  7265  6669  0079
0000052140  6E45  6574  2072  6576  6972  6966  6163  6974
0000052160  6E6F  7220  7365  6C75  7374  6E20  6D61  3A65
0000052200  7400  0077  3154  3332  495F  504E  505F  494F
0000052220  544E  5245  545F  5059  0045  6261  0073  6F6E
0000052240  656E  6E00  6E6F  0065  008C  016E  0091  007E
0000052260  0064  0001  0001  0001  0001  0000  0065  0001
0000052300  0000  0001  0000  0000  0066  0001  0000  0001
0000052320  0000  0000  02EE  0000  0000  0001  0000  0000
0000052340  0067  0000  0001  0001  0001  0000  0069  0000
0000052360  0000  0001  0000  0000  0068  0000  0001  0001
```

```
THU MAR 14 17:47:32 1991  TESTWIN.DLL  PAGE 24, LINE 1358

0000052400  0001  0000  006B  0000  0000  0001  0000  0000
0000052420  006A  0000  0000  0001  0000  0000  006C  0001
0000052440  0001  0001  0001  0000  05DC  0000  0000  0001
0000052460  0000  0000  05DD  0000  0000  0001  0000  0000
0000052500  05DF  0000  0000  0001  0000  0000  05DE  0000
0000052520  0000  0001  0000  0000  012C  0000  0001  0001
0000052540  0000  0000  012D  0000  0001  0001  0000  0000
0000052560  0133  0000  0001  0001  0000  0000  0132  0000
0000052600  0001  0001  0000  0000  0131  0000  0000  0001
0000052620  0000  0000  012E  0000  0001  0001  0000  0000
0000052640  012F  0000  0001  0001  0000  0000  0190  0001
0000052660  0001  0001  0001  0001  0191  0000  0000  0001
0000052700  0001  0000  019A  0000  0000  0001  0001  0000
0000052720  0192  0000  0000  0001  0001  0000  0199  0000
0000052740  0000  0001  0001  0000  0193  0000  0000  0001
0000052760  0001  0000  0194  0000  0000  0001  0001  0000
0000053000  0196  0001  0001  0001  0001  0001  0197  0000
0000053020  0000  0001  0001  0000  01F4  0001  0000  0001
0000053040  0001  0000  01F5  0001  0000  0001  0001  0000
0000053060  01F6  0001  0000  0001  0001  0000  01F7  0001
0000053100  0000  0001  0001  0000  01F9  0001  0000  0001
0000053120  0001  0000  0258  0001  0000  0001  0000  0000
0000053140  0259  0001  0000  0001  0000  0000  025B  0000
0000053160  0000  0001  0000  0000  028A  0000  0000  0001
0000053200  0001  0000  02BC  0001  0000  0001  0001  0000
0000053220  7774  0000  6554  7473  6E69  2067  3231  0033
0000053240  2A5C  2A2E  0000  6548  706C  6E20  746F  6920
0000053260  706D  656C  656D  746E  6465  002E  0000  0005
0000053300  04B0  0096  0388  00A3  016A  0000  0000  0000
0000053320  0000  0000  0000  0000  0000  0000  0000  0000
*
0000053360  0000  0000  0000  0000  0000  0000  03E8  00A4
0000053400  03C4  00AE  0384  0000  0000  0000  0000  0000
0000053420  0000  0000  0000  0000  0000  0000  0000  0000
*
0000053460  0000  0000  0000  0000  03E8  00C7  0400  00D0
0000053500  03C0  0000  0000  0000  0000  0000  0000  0000
0000053520  0000  0000  0000  0000  0000  0000  0000  0000
*
0000053560  0000  0000  03E8  00E5  043C  00F8  03FC  0000
0000053600  0000  0000  0000  0000  0000  0000  0000  0000
*
0000053660  03E8  0119  0478  0120  0438  0000  0000  0000
0000053700  0000  0000  0000  0000  0000  0000  0000  0000
*
0000053740  0000  0000  0000  0000  0000  0000  0000  0001
0000053760  6F4E  6574  203A  6C43  6165  756E  2070  6977
0000054000  206C  6572  6F6D  6576  6120  6C6C  6520  7078
0000054020  6365  6574  2064  6D69  6761  7365  6120  646E
0000054040  7420  7365  2074  6572  7573  746C  2E73  440A
0000054060  206F  6F79  2075  6177  746E  7420  206F  6F63
0000054100  746E  6E69  6575  3F20  0000  0000  0000  5F47
0000054120  5745  545F  4700  455F  5F57  0054  7774  735F
0000054140  7465  6D5F  6E65  5F75  6F6D  6564  4700  455F
0000054160  5F57  0054  5F47  5745  545F  0000  7774  735F
0000054200  7465  6E5F  726F  6E75  6D5F  6E65  0075  6143
0000054220  6C6C  4320  6168  6E69  6520  706D  7974  2500
0000054240  2073  7325  0000  FFFF  0001  0000  028A  0000
0000054260  0000  0000  0000  6E69  0074  6E69  0074  6F4E
```

```
THU MAR 14 17:47:32 1991  TESTWIN.DLL  PAGE 25, LINE 1417

0000054300  7420 7365 7374 6320 7275 6572 746E 796C
0000054320  6920 206E 6874 2065 7562 6666 7265 2E20
0000054340  0000 7774 625F 6975 646C 745F 7365 5F74
0000054360  7562 6666 7265 6C5F 7369 0074 FFFF 0001
0000054400  0000 02EE 0000 0000 0000 0000 6E69 0074
0000054420  6E69 0074 7774 755F 6470 7461 5F65 6163
0000054440  6C6C 635F 6168 6E69 0000 6548 706C 6E20
0000054460  746F 7920 7465 6920 706D 656C 656D 746E
0000054500  6465 4800 6C65 2070 6F6E 2074 6579 2074
0000054520  6D69 6C70 6D65 6E65 6574 0064 7242 6165
0000054540  206B 7461 4C20 6E69 3A65 4200 6572 6B61
0000054560  6120 2074 6554 7473 003A 7242 6165 2068
0000054600  7461 4920 706E 7475 003A 7242 6165 206B
0000054620  7461 5320 7263 6565 3A6E 0000 0000 654E
0000054640  2077 6554 7473 0000 7543 7272 6E65 2074
0000054660  6F46 646C 7265 4500 746E 7265 6620 6C6F
0000054700  6564 2072 616E 656D 003A 002E 03E8 0668
0000054720  0694 0677 0474 0000 0000 0000 0000 0000
0000054740  0000 0000 0000 0000 0000 0000 0000 0000
*
0000055000  0000 0000 0000 0000 6554 7473 6320 6E61
0000055020  6F6E 2074 6562 6F20 6570 656E 2064 6E69
0000055040  6320 7275 6572 746E 6D20 646F 2E65 5220
0000055060  7465 7275 206E 6F74 7220 7065 616C 2079
0000055100  6F6D 6564 002E 6548 706C 6E20 746F 7920
0000055120  7465 6920 706D 656C 656D 746E 6465 0000
0000055140  0000 0000 0000 0006 0000 1230 122F 0000
0000055160  0005 0000 0000 0000 0000 0000 0000 0000
0000055200  0000 435F 465F 4C49 5F45 4E49 4F46 003D
0000055220  0001 FFFF 0000 0000 0000 0000 0000 0000
0000055240  0000 0000 0000 0001 8101 8181 0000 0000
0000055260  0000 0000 0000 0000 0000 0000 0000 0000
*
0000055640  0000 0000 0000 0000 0A00 0A0A 0A0A 0A0A
0000055660  0A0A 0A0A 0A0A 0A0A 0A0A 0A0A 0A0A 0A0A
*
0000056240  0A0A 0A0A 0A0A 0A0A 000A 0000 0000 0000
0000056260  0000 0000 0000 0000 0000 FF00 00FF 0000
0000056300  0000 FFFF FFFF 0000 000C 0990 0000 000C
0000056320  0FA0 0001 0000 0000 0000 0000 0000 0102
0000056340  0000 0000 0000 0000 0000 0202 0000 0000
0000056360  0000 0000 0000 0000 0000 0000 0000 0000
*
0000057240  0000 0000 0000 0000 0001 0200 0000 0000
0000057260  0000 0000 0000 0000 0000 0000 0000 0000
*
0000060200  0000 0000 0000 0000 0B5C 0690 0006 0600
0000060220  0100 0000 0010 0603 0600 1002 4504 4545
0000060240  0505 0505 3505 0030 0050 0000 2000 3020
0000060260  5850 0807 3000 3030 5057 0007 2000 0020
0000060300  0000 0000 6008 6060 6060 0060 7000 7870
0000060320  7878 0878 0807 0000 0007 0808 0008 0800
0000060340  0800 0000 2808 756E 6C6C 0629 0000 0000
0000060360  0000 0000 0000 0000 0000 0003 2000 303E
0000060400  0F8E 303E 0DC0 303E 0DC4 303E 0DC8 303E
0000060420  0DCC 303E 0DD0 0000 0000 0101 2000 2020
0000060440  2020 2020 2020 2828 2828 2028 2020 2020
0000060460  2020 2020 2020 2020 2020 2020 4820 1010
0000060500  1010 1010 1010 1010 1010 1010 8410 8484
```

THU MAR 14 17:47:32 1991 TESTWIN.DLL PAGE 26, LINE 1476

| | | | | | | | | |
|---|---|---|---|---|---|---|---|---|
| 0000060520 | 8484 | 8484 | 8484 | 1084 | 1010 | 1010 | 1010 | 8181 |
| 0000060540 | 8181 | 8181 | 0101 | 0101 | 0101 | 0101 | 0101 | 0101 |
| 0000060560 | 0101 | 0101 | 0101 | 0101 | 1010 | 1010 | 1010 | 8282 |
| 0000060600 | 8282 | 8282 | 0202 | 0202 | 0202 | 0202 | 0202 | 0202 |
| 0000060620 | 0202 | 0202 | 0202 | 0202 | 1010 | 1010 | 0020 | 0000 |
| 0000060640 | 0000 | 0000 | 0000 | 0000 | 0000 | 0000 | 0000 | 0000 |
| * | | | | | | | | |
| 0000061040 | 0003 | FFFF | 001E | 003B | 005A | 0078 | 0097 | 00B5 |
| 0000061060 | 00D4 | 00F3 | 0111 | 0130 | 014E | 016D | FFFF | 001E |
| 0000061100 | 003A | 0059 | 0077 | 0096 | 00B4 | 00D3 | 00F2 | 0110 |
| 0000061120 | 012F | 014D | 016C | 0000 | 0000 | 0000 | 0000 | 0000 |
| 0000061140 | 0000 | 0000 | 0000 | 0000 | 5A54 | 0000 | 5350 | 0054 |
| 0000061160 | 4450 | 0054 | 7080 | 0000 | 0001 | 0F2C | 0F40 | 0F30 |
| 0000061200 | 0D4A | 7553 | 4D6E | 6E6F | 7554 | 5765 | 6465 | 6854 |
| 0000061220 | 4675 | 6972 | 6153 | 0074 | 614A | 466E | 6265 | 614D |
| 0000061240 | 4172 | 7270 | 614D | 4A79 | 6E75 | 754A | 416C | 6775 |
| 0000061260 | 6553 | 4F70 | 7463 | 6F4E | 4476 | 6365 | 0000 | 0000 |
| 0000061300 | 0000 | 0000 | 0000 | 0000 | 0000 | 0000 | 3470 | FFFF |
| 0000061320 | FFFF | FFFF | FFFF | FFFF | FFFF | 0F98 | 0F90 | 0F92 |
| 0000061340 | 0F9A | 3C3C | 4D4E | 4753 | 3E3E | 0000 | 3652 | 3030 |
| 0000061360 | 0D30 | 2D0A | 7320 | 6174 | 6B63 | 6F20 | 6576 | 6672 |
| 0000061400 | 6F6C | 0D77 | 000A | 0003 | 3652 | 3030 | 0D33 | 2D0A |
| 0000061420 | 6920 | 746E | 6765 | 7265 | 6420 | 7669 | 6469 | 2065 |
| 0000061440 | 7962 | 3020 | 0A0D | 0800 | 5200 | 3036 | 3830 | 0A0D |
| 0000061460 | 202D | 6F6E | 2074 | 6E65 | 756F | 6867 | 7320 | 6170 |
| 0000061500 | 6563 | 6620 | 726F | 6120 | 6772 | 6D75 | 6E65 | 7374 |
| 0000061520 | 0A0D | 0900 | 5200 | 3036 | 3930 | 0A0D | 202D | 6F6E |
| 0000061540 | 2074 | 6E65 | 756F | 6867 | 7320 | 6170 | 6563 | 6620 |
| 0000061560 | 726F | 6520 | 766E | 7269 | 6E6F | 656D | 746E | 0A0D |
| 0000061600 | FC00 | 0D00 | 000A | 00FF | 7572 | 2D6E | 6974 | 656D |
| 0000061620 | 6520 | 7272 | 726F | 0020 | 0002 | 3652 | 3030 | 0D32 |
| 0000061640 | 2D0A | 6620 | 6F6C | 7461 | 6E69 | 2D67 | 6F70 | 6E69 |
| 0000061660 | 2074 | 7573 | 7070 | 726F | 2074 | 6F6E | 2074 | 6F6C |
| 0000061700 | 6461 | 6465 | 0A0D | 1100 | 5200 | 3036 | 3731 | 0A0D |
| 0000061720 | 202D | 6E75 | 7865 | 6570 | 7463 | 6465 | 6D20 | 6C75 |
| 0000061740 | 6974 | 6874 | 6572 | 6461 | 6C20 | 636F | 206B | 7265 |
| 0000061760 | 6F72 | 0D72 | 000A | 0010 | 3652 | 3130 | 0D36 | 2D0A |
| 0000062000 | 6E20 | 746F | 6520 | 6F6E | 6775 | 2068 | 7073 | 6361 |
| 0000062020 | 2065 | 6F66 | 2072 | 6874 | 6572 | 6461 | 6420 | 7461 |
| 0000062040 | 0D61 | 000A | FFFF | 07FF | 0200 | D400 | 010D | 0000 |
| 0000062060 | 0200 | 8A00 | 0409 | 0000 | 0200 | 9402 | 030F | 8800 |
| 0000062100 | 0200 | 3C00 | 050F | 0000 | 0200 | 9602 | 030F | 1700 |
| 0000062120 | 0200 | 9C02 | 030F | 2500 | 0200 | 9E02 | 030F | 3300 |
| 0000062140 | 4E00 | 3042 | 9A32 | 0095 | 0100 | 0000 | B000 | 0003 |
| 0000062160 | 0000 | 0100 | 2400 | 745C | 3231 | 5C33 | 7061 | 5C70 |
| 0000062200 | 6D74 | 745C | 7365 | 7774 | 6E69 | 6F5C | 6A62 | 745C |
| 0000062220 | 7365 | 7774 | 6E69 | 6F2E | 6A62 | 0001 | 03B0 | 17F6 |
| 0000062240 | 0000 | 0000 | 0001 | 5C1F | 3174 | 3332 | 615C | 7070 |
| 0000062260 | 745C | 5C6D | 6574 | 7473 | 6977 | 5C6E | 626F | 5C6A |
| 0000062300 | 7774 | 6F2E | 6A62 | 0001 | 1BA6 | 06EF | 0000 | 0000 |
| 0000062320 | 0001 | 5C20 | 3174 | 3332 | 615C | 7070 | 745C | 5C6D |
| 0000062340 | 6574 | 7473 | 6977 | 5C6E | 626F | 5C6A | 6C64 | 2E67 |
| 0000062360 | 626F | 016A | 9600 | AF22 | 0001 | 0000 | 0100 | 2200 |
| 0000062400 | 745C | 3231 | 5C33 | 7061 | 5C70 | 6D74 | 745C | 7365 |
| 0000062420 | 7774 | 6E69 | 6F5C | 6A62 | 745C | 5F77 | 6264 | 6F2E |
| 0000062440 | 6A62 | 0001 | 2446 | 0944 | 0000 | 0000 | 0001 | 5C1F |
| 0000062460 | 3174 | 3332 | 615C | 7070 | 745C | 5C6D | 6574 | 7473 |
| 0000062500 | 6977 | 5C6E | 626F | 5C6A | 6874 | 6F2E | 6A62 | 0001 |
| 0000062520 | 2D9A | 00D1 | 0000 | 0007 | 0001 | 640B | 6C6C | 635C |

THU MAR 14 17:47:32 1991 TESTWIN.DLL PAGE 27, LINE 1535

| | | | | | | | | |
|---|---|---|---|---|---|---|---|---|
| 0000062540 | 7573 | 612E | 6D73 | 0001 | 2E6C | 01AF | 0000 | 0007 |
| 0000062560 | 0001 | 640E | 6C6C | 635C | 7573 | 6164 | 2E74 | 7361 |
| 0000062600 | 016D | 1C00 | 2230 | 0000 | 0700 | 0100 | 0F00 | 736F |
| 0000062620 | 5C32 | 7263 | 3074 | 736D | 2E67 | 7361 | 016D | 3E00 |
| 0000062640 | 0630 | 0000 | 0700 | 0100 | 0A00 | 7263 | 3074 | 7066 |
| 0000062660 | 612E | 6D73 | 0001 | 3044 | 001A | 0000 | 0007 | 0001 |
| 0000062700 | 630A | 6B68 | 7473 | 2E6B | 7361 | 016D | 5E00 | 0830 |
| 0000062720 | 0001 | 0700 | 0100 | 0D00 | 6C64 | 5C6C | 6573 | 6574 |
| 0000062740 | 766E | 2E70 | 0163 | 6600 | 6531 | 0000 | 0700 | 0100 |
| 0000062760 | 0F00 | 736F | 5C32 | 6D6E | 6773 | 6468 | 2E72 | 7361 |
| 0000063000 | 016D | CC00 | C031 | 0000 | 0700 | 0100 | 0E00 | 736F |
| 0000063020 | 5C32 | 6F64 | 7273 | 7465 | 612E | 6D73 | 0000 | 0000 |
| 0000063040 | 0000 | 0000 | 0007 | 0000 | 5F0B | 6663 | 756C | 6873 |
| 0000063060 | 612E | 6D73 | 0000 | 0000 | 0000 | 0000 | 0007 | 0000 |
| 0000063100 | 5F07 | 6966 | 656C | 632E | 0001 | 328C | 00E5 | 0000 |
| 0000063120 | 0007 | 0001 | 5F0B | 6C66 | 6273 | 6675 | 612E | 6D73 |
| 0000063140 | 0001 | 3372 | 004B | 0000 | 0007 | 0001 | 5F0B | 6567 |
| 0000063160 | 6274 | 6675 | 612E | 6D73 | 0001 | 33BE | 012E | 0000 |
| 0000063200 | 0007 | 0001 | 6608 | 6C66 | 7375 | 2E68 | 0163 | EC00 |
| 0000063220 | FA34 | 0004 | 0700 | 0100 | 0A00 | 756F | 7074 | 7475 |
| 0000063240 | 612E | 6D73 | 0001 | 39E6 | 0077 | 0000 | 0007 | 0001 |
| 0000063260 | 6F0D | 3273 | 6C5C | 6573 | 6B65 | 612E | 6D73 | 0001 |
| 0000063300 | 3A5E | 01DD | 0000 | 0007 | 0001 | 7709 | 6972 | 6574 |
| 0000063320 | 612E | 6D73 | 0001 | 3C3C | 000A | 0000 | 0007 | 0001 |
| 0000063340 | 6D0A | 6C61 | 6F6C | 2E63 | 7361 | 016D | 4600 | 0A3C |
| 0000063360 | 0000 | 0700 | 0100 | 0800 | 7266 | 6565 | 612E | 6D73 |
| 0000063400 | 0001 | 3C50 | 00AF | 0000 | 0007 | 0001 | 660B | 616D |
| 0000063420 | 6C6C | 636F | 612E | 6D73 | 0000 | 0000 | 0000 | 0000 |
| 0000063440 | 0007 | 0000 | 6609 | 6164 | 6174 | 612E | 6D73 | 0001 |
| 0000063460 | 3D00 | 0034 | 0000 | 0007 | 0001 | 690B | 696E | 7374 |
| 0000063500 | 6765 | 612E | 6D73 | 0001 | 3D34 | 0036 | 0000 | 0007 |
| 0000063520 | 0001 | 6C0B | 6E69 | 736B | 6765 | 612E | 6D73 | 0001 |
| 0000063540 | 3D6A | 007C | 0000 | 0007 | 0001 | 730C | 6165 | 6372 |
| 0000063560 | 7368 | 2E67 | 7361 | 016D | E600 | E23D | 0000 | 0700 |
| 0000063600 | 0100 | 0B00 | 7267 | 776F | 6573 | 2E67 | 7361 | 016D |
| 0000063620 | C800 | 313E | 0000 | 0700 | 0100 | 0A00 | 656E | 7377 |
| 0000063640 | 6765 | 612E | 6D73 | 0001 | 3EFA | 0036 | 0000 | 0007 |
| 0000063660 | 0001 | 730A | 7274 | 7063 | 2E79 | 7361 | 016D | 3000 |
| 0000063700 | 293F | 0000 | 0700 | 0100 | 0A00 | 7473 | 6372 | 706U |
| 0000063720 | 612E | 6D73 | 0001 | 3F5A | 0017 | 0000 | 0007 | 0001 |
| 0000063740 | 730A | 7274 | 656C | 2E6E | 7361 | 016D | 7200 | 2A3F |
| 0000063760 | 0000 | 0700 | 0100 | 0B00 | 7473 | 6E72 | 7063 | 2E79 |
| 0000064000 | 7361 | 016D | 9C00 | 3B3F | 0000 | 0700 | 0100 | 0B00 |
| 0000064020 | 7473 | 6E72 | 6D63 | 2E70 | 7361 | 016D | D800 | 033F |
| 0000064040 | 0000 | 0700 | 0100 | 0800 | 7461 | 6C6F | 612E | 6D73 |
| 0000064060 | 0001 | 3FDC | 0056 | 0000 | 0007 | 0001 | 6108 | 6F74 |
| 0000064100 | 2E78 | 7361 | 006D | 0000 | 0000 | 0000 | 0700 | 0000 |
| 0000064120 | 0C00 | 6D63 | 7369 | 6463 | 7461 | 612E | 6D73 | 0000 |
| 0000064140 | 0000 | 0000 | 0000 | 0007 | 0000 | 6309 | 7974 | 6570 |
| 0000064160 | 612E | 6D73 | 0001 | 4032 | 00A6 | 0000 | 0007 | 0001 |
| 0000064200 | 6708 | 7465 | 6E65 | 2E76 | 0163 | D300 | BA40 | 0000 |
| 0000064220 | 0700 | 0100 | [illegible]D00 | 736F | 5C32 | 6C6D | 636F | 2E6B |
| 0000064240 | 7361 | 016D | 9200 | 7A41 | 0000 | 0700 | 0100 | 1000 |
| 0000064260 | 6C64 | 5C6C | 6974 | 7464 | 6261 | 656C | 612E | 6D73 |
| 0000064300 | 0001 | 420C | 0074 | 0000 | 0007 | 0001 | 7309 | 7270 |
| 0000064320 | 6E69 | 6674 | 632E | 0001 | 4280 | 002E | 0000 | 0007 |
| 0000064340 | 0001 | 630A | 6C61 | 6F6C | 2E63 | 7361 | 016D | AE00 |
| 0000064360 | 9C42 | 0001 | 0700 | 0100 | 0900 | 7361 | 7463 | 6D69 |
| 0000064400 | 2E65 | 0163 | 4A00 | 2E44 | 0000 | 0700 | 0100 | 0700 |

THU MAR 14 17:47:32 1991 TESTWIN.DLL PAGE 28, LINE 1594

| | | | | | | | | |
|---|---|---|---|---|---|---|---|---|
| 0000064420 | 7463 | 6D69 | 2E65 | 0063 | 0000 | 0000 | 0000 | 0700 |
| 0000064440 | 0000 | 0600 | 6164 | 7379 | 632E | 0001 | 4478 | 0246 |
| 0000064460 | 0000 | 0007 | 0001 | 6708 | 746D | 6D69 | 2E65 | 0163 |
| 0000064500 | BE00 | 8446 | 0000 | 0700 | 0100 | 0A00 | 6F6C | 6163 |
| 0000064520 | 746C | 6D69 | 632E | 0001 | 4742 | 01C8 | 0000 | 0007 |
| 0000064540 | 0001 | 7407 | 737A | 7465 | 632E | 0000 | 0000 | 0000 |
| 0000064560 | 0000 | 0007 | 0000 | 7409 | 6D69 | 7365 | 7465 | 632E |
| 0000064600 | 0001 | 490A | 002D | 0000 | 0007 | 0001 | 730A | 7274 |
| 0000064620 | 6863 | 2E72 | 7361 | 016D | 3800 | 2E49 | 0000 | 0700 |
| 0000064640 | 0100 | 0B00 | 7473 | 7272 | 6863 | 2E72 | 7361 | 016D |
| 0000064660 | 6600 | 2249 | 0000 | 0700 | 0100 | 0900 | 6C61 | 6572 |
| 0000064700 | 2E6D | 7361 | 016D | 8800 | 9A49 | 0000 | 0700 | 0100 |
| 0000064720 | 0800 | 646C | 7669 | 612E | 6D73 | 0001 | 4A22 | 0032 |
| 0000064740 | 0000 | 0007 | 0001 | 6C08 | 756D | 2E6C | 7361 | 016D |
| 0000064760 | 5400 | A04A | 0000 | 0700 | 0100 | 0800 | 726C | 6D65 |
| 0000065000 | 612E | 6D73 | 0001 | 4AF4 | 005F | 0000 | 0007 | 0001 |
| 0000065020 | 7509 | 646C | 7669 | 612E | 6D73 | 0001 | 4B54 | 006A |
| 0000065040 | 0000 | 0007 | 0001 | 7509 | 726C | 6D65 | 612E | 6D73 |
| 0000065060 | 030C | 0001 | 07BC | 540C | 5F57 | 5550 | 4853 | 435F |
| 0000065100 | 4148 | 5C52 | 0103 | BE00 | 0B07 | 5754 | 505F | 5355 |
| 0000065120 | 5F48 | 5453 | 0052 | 0100 | A700 | 0707 | 5754 | 495F |
| 0000065140 | 494E | C754 | 0101 | B100 | 0D07 | 5754 | 475F | 5445 |
| 0000065160 | 4843 | 5241 | 415F | 1554 | 0102 | B300 | 0D07 | 5754 |
| 0000065200 | 505F | 5455 | 4843 | 5241 | 415F | 4B54 | 0102 | B500 |
| 0000065220 | 0C07 | 5754 | 505F | 5455 | 5453 | 5F52 | 5441 | 0283 |
| 0000065240 | 0001 | 07B7 | 5408 | 5F57 | 4E55 | 5550 | B354 | 0102 |
| 0000065260 | B800 | 0E07 | 5754 | 475F | 5445 | 435F | 5F4D | 494C |
| 0000065300 | 454E | 02DD | 0001 | 07BA | 5409 | 5F57 | 4553 | 5F54 |
| 0000065320 | 4D45 | 021A | 0004 | 0085 | 5F08 | 6876 | 665F | 6C69 |
| 0000065340 | 0465 | 0400 | 8500 | 0500 | 685F | 6F6D | 0864 | 0400 |
| 0000065360 | 2D00 | 0802 | 705F | 5F66 | 6572 | 6461 | 0210 | 0004 |
| 0000065400 | 022D | 5F09 | 6670 | 775F | 6972 | 6574 | 020C | 0004 |
| 0000065420 | 03A3 | 5F0D | 6670 | 4F6E | 646C | 6C43 | 6569 | 746E |
| 0000065440 | 021C | 0004 | 0085 | 5F08 | 6668 | 6E49 | 7570 | 1E74 |
| 0000065460 | 0402 | 8500 | 0900 | 755F | 4173 | 7463 | 6F69 | 006E |
| 0000065500 | 0400 | C000 | 0A00 | 685F | 6E77 | 5F64 | 656D | 756E |
| 0000065520 | 0214 | 0004 | 0081 | 5F09 | 4D73 | 7861 | 694C | 656E |
| 0000065540 | 0216 | 0004 | 00C0 | 5F02 | 0673 | 0400 | 8100 | 0400 |
| 0000065560 | 6D5F | 6E65 | 0366 | 0005 | 06FA | 5F08 | 7A73 | 685F |
| 0000065600 | 6C65 | B070 | 0103 | 0700 | 0907 | 775F | 6E69 | 695F |
| 0000065620 | 696E | 2F74 | 0115 | 2000 | 1107 | 5754 | 535F | 5445 |
| 0000065640 | 4E5F | 524F | 4E55 | 4D5F | 4E45 | 4555 | 0106 | 0B00 |
| 0000065660 | 0F07 | 5754 | 445F | 5349 | 4C50 | 5941 | 545F | 5345 |
| 0000065700 | DA54 | 0106 | 0D00 | 0C07 | 5754 | 535F | 5641 | 5F45 |
| 0000065720 | 4554 | 5453 | 076F | 0001 | 070E | 5409 | 5F57 | 4946 |
| 0000065740 | 494E | 4853 | 07B7 | 0001 | 0710 | 540B | 5F57 | 4E57 |
| 0000065760 | 5F44 | 5250 | 434F | 1198 | 0001 | 0718 | 540B | 5F57 |
| 0000066000 | 4547 | 5F54 | 4D48 | 444F | 1005 | 0001 | 0714 | 410E |
| 0000066020 | 4F42 | 5455 | 445F | 474C | 505F | 4F52 | E443 | 0111 |
| 0000066040 | 1A00 | 0B07 | 5754 | 475F | 5445 | 485F | 4E57 | 3444 |
| 0000066060 | 0112 | 1C00 | 1007 | 5754 | 535F | 5445 | 4D5F | 4E45 |
| 0000066100 | 5F55 | 4F4D | 4544 | 04AC | 0005 | 0081 | 5F09 | 5473 |
| 0000066120 | 706F | 694C | 656E | 04AE | 0005 | 0085 | 5F0B | 4C66 |
| 0000066140 | 7261 | 6567 | 6F46 | 746E | 1A79 | 0001 | 0730 | 5414 |
| 0000066160 | 5F57 | 5055 | 4144 | 4554 | 435F | 4C41 | 5F4C | 4843 |
| 0000066200 | 4941 | 504E | 0503 | F600 | 0906 | 735F | 5F7A | 6C63 |
| 0000066220 | 7361 | 5473 | 0503 | 5100 | 0B03 | 735F | 5F7A | 656D |
| 0000066240 | 7373 | 6761 | 6065 | 0503 | F800 | 0D06 | 735F | 5F7A |
| 0000066260 | 7865 | 6574 | 736E | 6F69 | A66E | 011B | 8100 | 0606 |

THU MAR 14 17:47:32 1991 TESTWIN.DLL PAGE 29, LINE 1653

| | | | | | | | | |
|---|---|---|---|---|---|---|---|---|
| 0000066300 | 5754 | 445F | 474C | 1BF7 | 0001 | 0683 | 4710 | 4E45 |
| 0000066320 | 5245 | 4349 | 445F | 474C | 505F | 4F52 | AC43 | 011D |
| 0000066340 | 8700 | 0806 | 625F | 7470 | 645F | 676C | 1DF4 | 0001 |
| 0000066360 | 0689 | 420C | 5450 | 445F | 474C | 505F | 4F52 | 5B43 |
| 0000066400 | 0120 | 8E00 | 1106 | 745F | 5F77 | 6964 | 7073 | 6E5F |
| 0000066420 | 7765 | 745F | 7365 | A074 | 0120 | 9000 | 1006 | 5754 |
| 0000066440 | 4E5F | 5745 | 545F | 5345 | 5F54 | 5250 | 434F | 2296 |
| 0000066460 | 0001 | 05CF | 5F12 | 7774 | 645F | 6665 | 7561 | 746C |
| 0000066500 | 665F | 6C6F | 6564 | 2D72 | 0123 | D200 | 1005 | 745F |
| 0000066520 | 5F77 | 706F | 6E65 | 745F | 7365 | 5F74 | 6469 | 2446 |
| 0000066540 | 0001 | 05EB | 540A | 5F4D | 4944 | 5053 | 545F | E948 |
| 0000066560 | 0124 | ED00 | 0A05 | 4D54 | 545F | 5F48 | 5250 | 434F |
| 0000066600 | 10E8 | 0005 | 0000 | 5F06 | 6465 | 7461 | 3061 | 0512 |
| 0000066620 | 0000 | 0400 | 655F | 646E | 2D9A | 0001 | 0000 | 4306 |
| 0000066640 | 495F | 494E | 2E54 | 0507 | 0000 | 0C00 | 5F5F | 686E |
| 0000066660 | 6165 | 5F70 | 6564 | 6373 | 1230 | 0005 | 0000 | 5F0C |
| 0000066700 | 7473 | 6361 | 626B | 746F | 6F74 | 546D | 0507 | 0000 |
| 0000066720 | 0C00 | 5F5F | 615F | 4244 | 7773 | 6670 | 676C | 0720 |
| 0000066740 | 0005 | 0000 | 5F08 | 615F | 6D63 | 6C64 | 526E | 0507 |
| 0000066760 | 0000 | 0800 | 5F5F | 7361 | 6765 | 6968 | 0750 | 0005 |
| 0000067000 | 0000 | 5F08 | 615F | 6573 | 6C67 | 2C6F | 0507 | 0000 |
| 0000067020 | 0800 | 5F5F | 7361 | 7A69 | 7364 | 072A | 0005 | 0000 |
| 0000067040 | 5F08 | 615F | 6F74 | 7370 | 4270 | 0507 | 0000 | 0900 |
| 0000067060 | 5F5F | 6361 | 6966 | 666E | D66F | 00D6 | 0100 | 0900 |
| 0000067100 | 5F5F | 4461 | 7542 | 6573 | 2264 | 0507 | 0000 | 0900 |
| 0000067120 | 5F5F | 6561 | 766E | 6573 | 2667 | 0507 | 0000 | 0A00 |
| 0000067140 | 5F5F | 6874 | 6572 | 6461 | 6469 | 0724 | 0005 | 0000 |
| 0000067160 | 5F0A | 675F | 6E69 | 6F66 | 6573 | D667 | 00D6 | 0100 |
| 0000067200 | 0A00 | 5F5F | 4461 | 6442 | 736F | 7077 | 0728 | 0005 |
| 0000067220 | 0000 | 5F0A | 6C5F | 6E69 | 6F66 | 6573 | 7667 | 0098 |
| 0000067240 | 0100 | 0A00 | 5F5F | 6361 | 7472 | 7375 | 6465 | 0756 |
| 0000067260 | 0005 | 0000 | 5F0B | 5F5F | 4461 | 7242 | 6574 | 7272 |
| 0000067300 | 2E0B | 0001 | 0000 | 5F0B | 615F | 736D | 5F67 | 7865 |
| 0000067320 | 7469 | 0764 | 0005 | 0000 | 5F0B | 6F5F | 7673 | 7265 |
| 0000067340 | 6973 | 6E6F | 2F25 | 0001 | 0000 | 5F06 | 655F | 6978 |
| 0000067360 | D774 | 012F | 0000 | 0C00 | 5F5F | 6E75 | 6F6C | 6B63 |
| 0000067400 | 7865 | 7469 | 0977 | 0005 | 0000 | 5F07 | 635F | 6968 |
| 0000067420 | 646C | 0767 | 0005 | 0000 | 5F07 | 6E5F | 6966 | 656C |
| 0000067440 | 2E6C | 0001 | 0000 | 5F07 | 635F | 6E69 | 7469 | 0969 |
| 0000067460 | 0005 | 0000 | 5F07 | 5F5F | 7261 | 6367 | 2F2D | 0001 |
| 0000067500 | 0000 | 5F07 | 635F | 7865 | 7469 | 0764 | 0005 | 0000 |
| 0000067520 | 5F0D | 645F | 736F | 6576 | 6D72 | 6A61 | 726F | 096B |
| 0000067540 | 0005 | 0000 | 5F07 | 5F5F | 7261 | 7667 | 0765 | 0005 |
| 0000067560 | 0000 | 5F0D | 645F | 736F | 6576 | 6D72 | 6E69 | 726F |
| 0000067600 | 0869 | 0005 | 0000 | 5F08 | 705F | 7069 | 6365 | 6F68 |
| 0000067620 | 0509 | 0000 | 0800 | 655F | 766E | 7269 | 6E6F | 0769 |
| 0000067640 | 0005 | 0000 | 5F08 | 6F5F | 6673 | 6C69 | 6665 | 0507 |
| 0000067660 | 0000 | 0800 | 5F5F | 736F | 6F6D | 6564 | 2EC6 | 0001 |
| 0000067700 | 0000 | 5F08 | 695F | 696E | 6674 | 8070 | 050F | 0000 |
| 0000067720 | 0800 | 5F5F | 7066 | 6E69 | 7469 | 2FFA | 0001 | 0000 |
| 0000067740 | 5F08 | 745F | 7265 | 666D | 7370 | 0509 | 0000 | 0800 |
| 0000067760 | 5F5F | 6770 | 706D | 7274 | 2F37 | 0001 | 0000 | 5F08 |
| 0000070000 | 635F | 655F | 6978 | 6674 | 0507 | 0000 | 0900 | 5F5F |
| 0000070020 | 6F64 | 6D73 | 646F | 6465 | 0507 | 0000 | 0900 | 5F5F |
| 0000070040 | 736F | 616D | 6F6A | 6572 | 0507 | 0000 | 0900 | 5F5F |
| 0000070060 | 736F | 696D | 6F6E | 7972 | 0509 | 0000 | 0A00 | 5F5F |
| 0000070100 | 7865 | 7469 | 6F64 | 656E | 2F8D | 0001 | 0000 | 5F0A |
| 0000070120 | 6C5F | 636F | 656B | 6978 | 6274 | 0507 | 0000 | 0A00 |
| 0000070140 | 5F5F | 6D75 | 7361 | 766B | 6C61 | 2FFA | 0001 | 0000 |

THU MAR 14 17:47:32 1991 TESTWIN.DLL PAGE 30, LINE 1712

| | | | | | | | | |
|---|---|---|---|---|---|---|---|---|
| 0000070160 | 5F0A | 635F | 6574 | 6D72 | 7573 | 7B62 | 0509 | 0000 |
| 0000070200 | 0A00 | 5F5F | 7865 | 7469 | 745F | 6469 | 0758 | 0005 |
| 0000070220 | 0000 | 5F05 | 665F | 6361 | 2F1E | 0001 | 0000 | 5F05 |
| 0000070240 | 7865 | 7469 | 301C | 0001 | 0000 | 5F0E | 465F | 5F46 |
| 0000070260 | 534D | 4247 | 4E41 | 454E | 7E52 | 0509 | 0000 | 0900 |
| 0000070300 | 5F5F | 6461 | 6762 | 736D | 7667 | 0098 | 0100 | 0900 |
| 0000070320 | 5F5F | 6361 | 7472 | 736D | 3E67 | 0130 | 0000 | 0800 |
| 0000070340 | 5F5F | 7066 | 7274 | 7061 | 0982 | 0005 | 0000 | 5F0C |
| 0000070360 | 615F | 6C61 | 7374 | 6B74 | 766F | 4472 | 0130 | 0000 |
| 0000070400 | 0800 | 5F5F | 6863 | 736B | 6B74 | 3044 | 0001 | 0000 |
| 0000070420 | 5F0A | 615F | 6346 | 6B68 | 7473 | 5E6B | 0130 | 0000 |
| 0000070440 | 0900 | 5F5F | 6573 | 6574 | 766E | 6670 | 0131 | 0000 |
| 0000070460 | 0B00 | 5F5F | 4D4E | 4753 | 545F | 5845 | 9654 | 0131 |
| 0000070500 | 0000 | 0C00 | 5F5F | 4D4E | 4753 | 575F | 4952 | 4554 |
| 0000070520 | 3278 | 0001 | 0000 | 5F0B | 5F5F | 6F64 | 6573 | 7272 |
| 0000070540 | 6F6E | 3280 | 0001 | 0000 | 5F07 | 655F | 7272 | 6F6E |
| 0000070560 | 3231 | 0001 | 0000 | 5F08 | 645F | 736F | 6572 | 1874 |
| 0000070600 | 0132 | 0000 | 0900 | 5F5F | 6F64 | 7273 | 7465 | 8666 |
| 0000070620 | 0509 | 0000 | 0800 | 5F5F | 6663 | 756C | 6873 | 000C |
| 0000070640 | 0004 | 0000 | 5F07 | 625F | 6675 | 6E69 | 0988 | 0005 |
| 0000070660 | 0000 | 5F05 | 695F | 626F | 0B68 | 0005 | 0000 | 5F06 |
| 0000070700 | 695F | 626F | 4832 | 050D | 0000 | 0900 | 5F5F | 616C |
| 0000070720 | 7473 | 6F69 | 8C62 | 0132 | 0000 | 0800 | 5F5F | 6C66 |
| 0000070740 | 6273 | 6675 | 3372 | 0001 | 0000 | 5F08 | 675F | 7465 |
| 0000070760 | 7562 | 0466 | 0134 | 0000 | 0B00 | 5F5F | 6666 | 756C |
| 0000071000 | 6873 | 6C5F | BE6B | 0133 | 0000 | 0700 | 665F | 6C66 |
| 0000071020 | 7375 | 7068 | 0134 | 0000 | 0900 | 665F | 756C | 6873 |
| 0000071040 | 6C61 | FC6C | 0134 | 0000 | 0800 | 5F5F | 756F | 7074 |
| 0000071060 | 7475 | 39F0 | 0001 | 0000 | 5F06 | 736C | 6565 | E66B |
| 0000071100 | 0139 | 0000 | 0A00 | 5F5F | 736C | 6565 | 5F6B | 6B6C |
| 0000071120 | 3A68 | 0001 | 0000 | 5F06 | 7277 | 7469 | 5E65 | 013A |
| 0000071140 | 0000 | 0A00 | 5F5F | 7277 | 7469 | 5F65 | 6B6C | 3C3C |
| 0000071160 | 0001 | 0000 | 5F07 | 616D | 6C6C | 636F | 3C41 | 0001 |
| 0000071200 | 0000 | 5F0A | 616D | 6C6C | 636F | 6C5F | 4B6B | 013C |
| 0000071220 | 0000 | 0800 | 665F | 6572 | 5F65 | 6B6C | 3C46 | 0001 |
| 0000071240 | 0000 | 5F05 | 7266 | 6565 | 3C82 | 0001 | 0000 | 5F0C |
| 0000071260 | 665F | 616D | 6C6C | 636F | 6C5F | 506B | 013C | 0000 |
| 0000071300 | 0700 | 5F5F | 6666 | 6572 | 6365 | 013C | 0000 | 0900 |
| 0000071320 | 5F5F | 6D66 | 6C61 | 6F6C | 5063 | 013C | 0000 | 0A00 |
| 0000071340 | 5F5F | 6666 | 6572 | 5F65 | 6B6C | 0DAE | 0005 | 0000 |
| 0000071360 | 5F07 | 665F | 6568 | 7061 | 3D00 | 0001 | 0000 | 5F09 |
| 0000071400 | 695F | 696E | 7374 | 6765 | 3D34 | 0001 | 0000 | 5F09 |
| 0000071420 | 6C5F | 6E69 | 736B | 6765 | 3D6A | 0001 | 0000 | 5F0B |
| 0000071440 | 735F | 6165 | 6372 | 7368 | 6765 | 3E75 | 0001 | 0000 |
| 0000071460 | 5F08 | 695F | 636E | 6573 | E667 | 013D | 0000 | 0900 |
| 0000071500 | 5F5F | 7267 | 776F | 6573 | A867 | 013E | 0000 | 0A00 |
| 0000071520 | 5F5F | 6966 | 646E | 616C | 7473 | 0DBC | 0005 | 0000 |
| 0000071540 | 5F0A | 615F | 626D | 6B6C | 6973 | C87A | 013E | 0000 |
| 0000071560 | 0800 | 5F5F | 656E | 7377 | 6765 | 3EFA | 0001 | 0000 |
| 0000071600 | 5F07 | 7473 | 6372 | 7970 | 3F30 | 0001 | 0000 | 5F07 |
| 0000071620 | 7473 | 6372 | 706D | 3F5A | 0001 | 0000 | 5F07 | 7473 |
| 0000071640 | 6C72 | 6E65 | 3F72 | 0001 | 0000 | 5F08 | 7473 | 6E72 |
| 0000071660 | 7063 | 9C79 | 013F | 0000 | 0800 | 735F | 7274 | 636E |
| 0000071700 | 706D | 3FD8 | 0001 | 0000 | 5F05 | 7461 | 6C6F | 3FDC |
| 0000071720 | 0001 | 0000 | 5F07 | 635F | 7461 | 786F | 0DBE | 0005 |
| 0000071740 | 0000 | 5F0D | 635F | 6C66 | 6374 | 7476 | 745F | 6261 |
| 0000071760 | 0DDA | 0005 | 0000 | 5F08 | 615F | 6973 | 657A | DB43 |
| 0000072000 | 050D | 0000 | 0800 | 5F5F | 7361 | 7A69 | 4465 | 0DD8 |
| 0000072020 | 0005 | 0000 | 5F0B | 735F | 6769 | 6E69 | 6F74 | 6666 |

THU MAR 14 17:47:32 1991 TESTWIN.DLL PAGE 31, LINE 1771

```
0000072040  0DD6  0005  0000  5F0B  735F  6769  6E69  7374
0000072060  6765  0DDC  0005  0000  5F07  635F  7974  6570
0000072100  0DDC  0005  0000  5F08  635F  7974  6570  325F
0000072120  0140  0000  0700  675F  7465  6E65  2876  0141
0000072140  0000  0600  5F5F  6F6C  6B63  4172  0001  0000
0000072160  5F07  6C5F  636F  666B  40FC  0001  0000  5F0D
0000072200  755F  6C6E  636F  5F6B  6966  656C  40D8  0001
0000072220  0000  5F0D  6C5F  636F  5F6B  7473  6572  6D61
0000072240  4152  0001  0000  5F08  755F  6C6E  636F  DE6B
0000072260  050E  0000  0900  5F5F  6F6C  6B63  6E63  8274
0000072300  0141  0000  0900  5F5F  6E75  6F6C  6B63  E466
0000072320  0140  0000  0F00  5F5F  6E75  6F6C  6B63  735F
0000072340  7274  6165  086D  0141  0000  0A00  5F5F  6177
0000072360  7469  6F6C  6B63  40F0  0001  0000  5F0B  6C5F
0000072400  636F  5F6B  6966  656C  4192  0001  0000  5F0B
0000072420  675F  7465  6974  7464  6261  0EE0  0005  0000
0000072440  5F0B  745F  6469  6174  6D62  7861  420C  0001
0000072460  0000  5F08  7073  6972  746E  8066  0142  0000
0000072500  0700  635F  6C61  6F6C  E463  0142  0000  0800
0000072520  615F  6373  6974  656D  444A  0001  0000  5F06
0000072540  7463  6D69  FC65  050E  0000  0600  5F5F  6164
0000072560  7379  0EE2  0005  0000  5F08  6C5F  6470  7961
0000072600  7873  0144  0000  0700  675F  746D  6D69  BE65
0000072620  0146  0000  0A00  6C5F  636F  6C61  6974  656D
0000072640  4762  0001  0000  5F06  7A74  6573  3C74  0148
0000072660  0000  0900  5F5F  7369  6E69  7364  4274  0147
0000072700  0000  0800  5F5F  745F  737A  7465  0F38  0005
0000072720  0000  5F09  6164  6C79  6769  7468  0F34  0005
0000072740  0000  5F09  6974  656D  6F7A  656E  0F3A  0005
0000072760  0000  5F07  7A74  616E  656D  0F42  0005  0000
0000073000  5F09  5F5F  6E64  6D61  7365  0F58  0005  0000
0000073020  5F09  5F5F  6E6D  6D61  7365  490A  0001  0000
0000073040  5F07  7473  6372  7268  4938  0001  0000  5F08
0000073060  7473  7272  6863  6672  0149  0000  0A00  5F5F
0000073100  4661  6146  726C  6D65  4988  0001  0000  5F08
0000073120  615F  6C46  6964  2276  014A  0000  0800  5F5F
0000073140  4661  6D6C  6C75  4A22  0001  0000  5F09  615F
0000073160  7546  6D6C  6C75  4A54  0001  0000  5F08  615F
0000073200  6C46  6572  F46D  014A  0000  0900  5F5F  4661
0000073220  6C75  6964  5476  014B  0000  0900  5F5F  4661
0000073240  6C75  6572  016D  000A  8075  8183  6400  8300
0000073260  0201  0101  8000  0101  8000  0101  8000  0101
0000073300  8000  0101  8000  0101  8000  0101  8000  0101
*
0000101160  8000  0501  7800  8340  0080  0101  8000  0101
0000101200  8000  0101  8000  0101  8000  0101  8000  0101
*
0000106260  8000  1601  7900  0330  8183  8307  0782  0A82
0000106300  7528  746E  6761  6567  2964  0169  000A  837F
0000106320  0081  8183  8300  0081  1C01  7F00  0682  6170
0000106340  6B63  685F  8200  6606  6C69  5F65  0268  0682
0000106360  7566  636E  685F  0104  0001  0180  0001  0180
0000106400  0001  0180  0001  0180  0001  0180  0001  0180
*
0000106600  0005  5078  8083  0100  0005  2878  8083  0100
0000106620  000A  8075  8183  7300  8300  0201  0101  8000
0000106640  0101  8000  0501  7800  8338  0080  0701  7A00
0000106660  8373  07AC  0082  0A01  7500  8380  0081  0064
0000106700  0183  0102  0005  6078  8283  0100  0005  4878
```

```
THU MAR 14 17:47:32 1991  TESTWIN.DLL  PAGE 32, LINE 1830

0000106720  8083  0100  0007  8578  00A0  8083  0100  0007
0000106740  837F  0081  8183  0100  000A  8075  8083  7300
0000106760  8302  07B0  0A01  7F00  8083  8300  0081  8183
0000107000  0100  000A  8075  8183  7300  8303  07B2  0A01
0000107020  7F00  C083  8300  0081  8183  0100  000A  8075
0000107040  8183  7300  8303  07B4  0401  7F00  8083  0100
0000107060  000A  8075  8183  7300  8301  07B6  0A01  7500
0000107100  8380  0081  0073  0183  0102  0004  837F  0081
0000107120  0A01  7500  8380  0081  0173  B983  0107  0007
0000107140  837F  0080  8583  0100  000A  8075  0083  7302
0000107160  8302  07BB  0701  7F00  C083  8300  0085  0A01
0000107200  7500  8380  0200  0273  BD83  0107  000A  8075
0000107220  8183  6400  8300  0201  0101  8000  1601  7900
0000107240  0330  0383  8302  0204  0A82  7528  746E  6761
0000107260  6567  2964  0169  000A  837F  0081  8183  8300
0000107300  0081  1C01  7F00  0682  6170  6B63  685F  8200
0000107320  6606  6C69  5F65  0268  0682  7566  636E  685F
0000107340  0104  0007  737A  C083  8200  0100  0001  0180
0000107360  0001  0180  0001  0180  0001  0180  0001  0180
*
0000107560  0001  0180  0005  2878  8083  0100  0012  6079
0000107600  8305  022A  2B83  8202  5F06  6F69  7562  6966
0000107620  1001  7F00  C083  8300  0081  C083  8300  0080
0000107640  8083  0100  0027  827F  5F04  7470  0072  0482
0000107660  635F  746E  8204  5F05  6162  6573  8206  5F05
0000107700  6C66  6761  820A  5F05  6966  656C  010B  0001
0000107720  0180  0007  737A  2983  8202  0100  0001  0180
0000107740  0001  0180  0001  0180  0001  0180  0001  0180
*
0000110340  0001  0180  0001  0180  0001  0180  000A  8075
0000110360  0083  6402  8300  0201  0101  8000  0101  8000
0000110400  0101  8000  0101  8000  0101  8000  0101  8000
*
0000110460  0101  8000  0101  8000  0101  8000  0701  7A00
0000110500  8373  0285  0082  0A01  7500  8380  0081  0064
0000110520  0183  0102  0001  0180  0001  0180  0001  0180
0000110540  0001  0180  0001  0180  0001  0180  0001  0180
*
0000112200  0005  6078  8083  0100  0001  0180  0001  0180
0000112220  0001  0180  0001  0180  0001  0180  0001  0180
*
0000112700  0001  0180  0001  0180  0001  0180  0007  737A
0000112720  A483  8203  0100  000A  8075  C083  7300  8304
0000112740  03A5  0D01  7F00  C083  8300  0085  C083  8300
0000112760  00C0  0101  8000  0101  8000  0101  8000  0101
0000113000  8000  0101  8000  0101  8000  0101  8000  0101
*
0000113220  8000  0701  7A00  8373  00C0  0082  0101  8000
0000113240  0101  8000  0101  8000  0101  8000  0101  8000
*
0000114440  0101  8000  0101  8000  1701  7900  8085  0600
0000114460  7383  8304  0474  0982  4D5F  4E45  4955  4554
0000114500  694D  1301  7F00  8183  8300  0085  8583  8300
0000114520  0085  C083  8300  0086  4001  7F00  0982  5069
0000114540  736F  7469  6F69  006E  0782  6661  7453  6C79
0000114560  0265  0B82  6661  7441  7274  6269  7475  0465
0000114600  0282  6469  8206  680B  6E77  5364  6275  654D
0000114620  756E  8208  6805  7449  6D65  010C  0001  0180
0000114640  0001  0180  0001  0180  0001  0180  0001  0180
```

THU MAR 14 17:47:32 1991 TESTWIN.DLL PAGE 33, LINE 1889

```
*
0000117560  0001  0180  0001  0180  0001  0180  0007  8578
0000117600  0800  8083  0100  0001  0180  0001  0180  0001
0000117620  0180  0001  0180  0001  0180  0001  0180  0001
*
0000120220  0180  0001  0180  0001  0180  001B  2079  8309
0000120240  0634  3583  8206  690F  755F  6D5F  6773  705F
0000120260  7261  6D61  745F  0169  001C  837F  0081  8583
0000120300  8300  0082  8683  8300  0088  8083  8300  0084
0000120320  C083  8300  00C0  6A01  7F00  0982  5F69  5F75
0000120340  6873  726F  0074  0A82  5F69  5F75  7375  6F68
0000120360  7472  8200  6908  755F  6C5F  6E6F  0067  0982
0000120400  5F69  5F75  6C75  6E6F  0067  0982  5F69  5F75
0000120420  6C66  616F  0074  0882  5F69  5F75  6863  7261
0000120440  8200  6909  755F  755F  6863  7261  8200  6907
0000120460  755F  735F  7274  8200  6909  755F  625F  6F6C
0000120500  6B63  0100  0019  3079  8302  0637  3883  8206
0000120520  690D  6D5F  6773  705F  7261  6D61  745F  0169
0000120540  0007  837F  0085  3383  0106  0010  827F  7404
0000120560  7079  0065  0582  6176  756C  0265  0101  8000
0000120600  1C01  7900  9085  0900  3B83  8306  063C  0E82
0000120620  5F69  736D  5F67  6568  6461  7265  745F  0169
0000120640  001C  837F  0081  8183  8300  0085  8583  8300
0000120660  0084  8583  8300  0085  8183  8300  0085  4701
0000120700  7F00  0482  5F71  6469  8200  7306  756F  6372
0000120720  0265  0382  6970  0464  0382  6974  0664  0482
0000120740  6572  7073  8208  7208  7365  5F70  6974  0A64
0000120760  0782  706F  635F  646F  0C65  0482  7974  6570
0000121000  820E  7304  7A69  1065  1501  7900  C085  0200
0000121020  3F83  8306  0640  0782  5F69  736D  5F67  6974
0000121040  0501  7800  8330  0636  0701  7F00  3A83  8306
0000121060  063E  1701  7F00  0682  6568  6461  7265  8200
0000121100  700A  7261  6D61  6C5F  7369  1274  0101  8000
0000121120  0101  8000  0101  8000  0701  7A00  8373  063D
0000121140  0082  0101  8000  0101  8000  0101  8000  0101
0000121160  8000  0101  8000  0101  8000  0101  8000  0101
*
0000122120  8000  0101  8000  1601  7900  5085  0406  C583
0000122140  8306  06C6  0882  7374  5F6C  6163  6C6C  0169
0000122160  0007  8578  0190  8083  0100  0007  8578  0320
0000122200  8083  0100  000D  837F  06C3  8183  8300  06C3
0000122220  C483  0106  0022  827F  6604  6C69  0065  0482
0000122240  696C  656E  8232  6306  6C61  656C  3465  0782
0000122260  6163  6C6C  7473  6672  0101  8000  0101  8000
0000122300  0101  8000  0701  7A00  8373  06C2  0082  0101
0000122320  8000  0101  8000  0101  8000  0101  8000  0101
0000122340  8000  0101  8000  1301  7900  E085  0401  D283
0000122360  8306  06D3  0582  665F  726F  696D  0D01  7F00
0000122400  8583  8300  00C0  C083  8300  06C3  1E01  7F00
0000122420  0282  6469  8200  7405  7469  656C  8202  7006
0000122440  6F72  706D  0674  0482  6164  6174  010A  0001
0000122460  0180  0001  0180  0001  0180  0001  0180  0001
*
0000122620  0180  0001  0180  0016  6079  8302  06F0  F183
0000122640  8206  280A  6E75  6174  6767  6465  6929  0501
0000122660  7800  8350  0085  0701  7F00  8183  8300  06EF
0000122700  1201  7F00  0782  7469  6D65  695F  0064  0482
0000122720  6C66  6761  0102  0001  0180  0007  8578  0F00
0000122740  EE83  0106  0001  0180  0005  1878  8083  0100
```

```
THU MAR 14 17:47:32 1991  TESTWIN.DLL  PAGE 34, LINE 1948

0000122760   0005  1878  8083  0100  0001  0180  0005  2878
0000123000   8083  0100  0007  8578  00B0  8083  0100  0007
0000123020   8578  00B0  8083  0100  0005  6878  8083  0100
0000123040   0005  0878  8083  0100  0005  5078  8083  0100
0000123060   0007  8578  00C8  8083  0100  0005  4878  8083
0000123100   0100  0007  8578  00A8  8083  0100  0007  8578
0000123120   0098  8083  0100  0007  8578  0108  8083  0100
0000123140   0005  3878  8083  0100  000A  8075  8183  640D
0000123160   8305  0705  1001  7F00  8183  8300  00C0  8183
0000123200   8300  00C1  C083  0100  0007  837F  00C0  C083
0000123220   0100  000A  8075  8183  6400  8302  0706  0701
0000123240   7800  0085  8304  0080  0501  7800  8320  0080
0000123260   0701  7F00  C083  8300  0086  0A01  7500  8380
0000123300   0081  0273  0A83  0107  0007  837F  00C0  8683
0000123320   0100  000A  8075  8183  7300  8302  070C  0A01
0000123340   7500  8380  0081  0073  0183  0102  000D  837F
0000123360   00C0  8583  8300  00C0  C083  0100  000A  8075
0000123400   C083  7300  8304  070F  0101  8000  0701  7800
0000123420   C885  8302  0080  0D01  7F00  C083  8300  0085
0000123440   C083  8300  00C0  0A01  7500  8380  00C0  0473
0000123460   1383  0107  0010  837F  0081  C083  8300  0081
C000123500   C183  8300  00C0  0A01  7500  8380  0081  0564
0000123520   1583  0107  0004  837F  00C5  0A01  7500  8380
0000123540   0081  0173  1783  0107  0004  837F  03CE  0A01
0000123560   7500  8380  0081  0173  1983  0107  0004  837F
0000123600   0081  0A01  7500  8380  0081  0173  1B83  0107
0000123620   0007  8578  0088  8083  0100  0007  8578  0088
0000123640   8083  0100  0005  6078  8283  0100  000A  8075
0000123660   8183  7300  8300  0201  0101  8000  0701  7800
0000123700   9085  8300  0080  0A01  7500  8380  0200  0064
0000123720   0183  0102  0007  8578  0500  8083  0100  0001
0000123740   0180  0005  3078  8083  0100  000A  8075  0083
0000123760   6402  8300  0201  0101  8000  0701  7800  D085
0000124000   8300  0080  0701  7800  1885  8301  0080  0401
0000124020   7F00  8583  0100  000A  8075  0083  6402  8301
0000124040   072B  0101  8000  0101  8000  0701  7F00  8183
0000124060   8300  06CA  0A01  7500  8380  0200  0273  2F83
0000124100   0107  0007  8578  00A8  8083  0100  0001  0180
0000124120   0001  0180  0001  0180  0001  0180  0001  0180
*
0000133560   0001  0180  0001  0180  001B  2079  8309  05CC
0000133600   CD83  8205  690F  755F  6D5F  6773  705F  7261
0000133620   6D61  745F  0169  001C  837F  0081  8583  8300
0000133640   0082  8683  8300  0088  8083  8300  0084  C083
0000133660   8300  00CC  6A01  7F00  0982  5F69  5F75  6873
0000133700   726F  0074  0A82  5F69  5F75  7375  6F68  7472
0000133720   8200  6908  755F  6C5F  6E6F  0067  0982  5F69
0000133740   5F75  6C75  6E6F  0067  0982  5F69  5F75  6C66
0000133760   616F  0074  0882  5F69  5F75  6863  7261  8200
0000134000   6909  755F  755F  6863  7261  8200  6907  755F
0000134020   735F  7274  8200  6909  755F  625F  6F6C  6B63
0000134040   0100  0019  3079  8302  05CF  D083  8205  690D
0000134060   6D5F  6773  705F  7261  6D61  745F  0169  0007
0000134100   837F  0085  CB83  0105  0010  827F  7404  7079
0000134120   0065  0582  6176  756C  0265  0101  8000  1C01
0000134140   7900  9085  0900  D383  8305  05D4  0E82  5F69
0000134160   736D  5F67  6568  6461  7265  745F  0169  001C
0000134200   837F  0081  8183  8300  0085  8583  8300  0084
0000134220   8583  8300  0085  8183  8300  0085  4701  7F00
```

```
THU MAR 14 17:47:32 1991  TESTWIN.DLL  PAGE 35, LINE 2007

0000134240  0482  5F71  6469  8200  7306  756F  6372  0265
0000134260  0382  6970  0464  0382  6974  0664  0482  6572
0000134300  7073  8208  7208  7365  5F70  6974  0A64  0782
0000134320  706F  635F  646F  0C65  0482  7974  6570  820E
0000134340  7304  7A69  1065  1501  7900  C085  0200  D783
0000134360  8305  05D8  0782  5F69  736D  5F67  6974  0501
0000134400  7800  8330  05CE  0701  7F00  D283  8305  05D6
0000134420  1701  7F00  0682  6568  6461  7265  8200  700A
0000134440  7261  6D61  6C5F  7369  1274  0101  8000  0101
0000134460  8000  0101  8000  0701  7A00  8373  05D5  0082
0000134500  0101  8000  0101  8000  0101  8000  0101  8000
*
0000135520  0101  8000  1301  7900  E085  0401  6483  8306
0000135540  0665  0582  665F  726F  696D  0701  7800  9085
0000135560  8301  0080  0D01  7F00  8583  8300  00C0  C083
0000135600  8300  0663  1E01  7F00  0282  6469  8200  7405
0000135620  7469  656C  8202  7006  6F72  706D  0674  0482
0000135640  6164  6174  010A  0001  0180  0001  0180  0001
0000135660  0180  0001  0180  0001  0180  0001  0180  0001
*
0000135740  0180  0001  0180  0001  0180  0007  737A  6283
0000135760  8206  0100  0001  0180  0001  0180  0001  0180
0000136000  0001  0180  0001  0180  0001  0180  0001  0180
0000136020  0001  0180  0007  837F  00C0  7783  0106  000A
0000136040  8075  8183  7300  8302  0680  0D01  7F00  C083
0000136060  8300  0085  C083  8300  00C0  0A01  7500  8380
0000136100  00C0  0473  8283  0106  0007  8578  00C8  8083
0000136120  0100  0001  0180  0007  837F  00C0  7783  0106
0000136140  000A  8075  8183  6400  8302  0686  0D01  7F00
0000136160  C083  8300  0085  C083  8300  00C0  0A01  7500
0000136200  8380  00C0  0473  8883  0106  0005  7878  8083
0000136220  0100  0007  8578  0080  8083  0100  0007  8578
0000136240  0088  8083  0100  0007  837F  00C0  DC83  0105
0000136260  000A  8075  8183  6400  8302  068D  0D01  7F00
0000136300  C083  8300  0085  C083  8300  00C0  0A01  7500
0000136320  8380  00C0  0473  8F83  0106  0005  4878  8083
0000136340  0100  000A  8075  8183  6400  8300  0201  0101
0000136360  8000  0101  8000  0101  8000  0101  8000  0101
*
0000145620  8000  0101  8000  1301  7900  E085  0401  AD83
0000145640  8305  05AE  0582  665F  726F  696D  0701  7800
0000145660  9085  8301  0080  0D01  7F00  8583  8300  00C0
0000145700  C083  8300  05AC  1E01  7F00  0282  6469  8200
0000145720  7405  7469  656C  8202  7006  6F72  706D  0674
0000145740  0482  6164  6174  010A  0001  0180  0001  018u
0000145760  0001  0180  0001  0180  0001  0180  0001  0180
*
0000146120  0001  0180  0001  0180  0005  7878  8083  0100
0000146140  0007  8578  0098  8083  0100  0001  0180  0004
0000146160  837F  00C0  0A01  7500  8380  0200  0164  CE83
0000146200  0105  0005  1078  8083  0100  0007  837F  00C0
0000146220  8683  0100  000A  8075  8183  6400  8302  05D1
0000146240  0701  7800  F085  8301  0080  0101  8000  0101
0000146260  8000  0101  8000  0101  8000  0101  8000  0101
*
0000147660  8000  0101  8000  0101  8000  0101  8000  0701
0000147700  7800  0085  8301  0080  0101  8000  0101  8000
0000147720  0101  8000  0101  8000  0101  8000  0101  8000
*
```

THU MAR 14 17:47:32 1991 TESTWIN.DLL PAGE 36, LINE 2066

```
0000155120  1801  7900  1085  0201  6983  8305  056A  0A82
0000155140  7528  746E  6761  6567  2964  0169  0007  837F
0000155160  02C5  8183  0100  000F  827F  6E04  6D61  0065
0000155200  0482  7974  6570  0120  0018  8579  0930  830D
0000155220  056E  6F83  8205  280A  6E75  6174  6767  6465
0000155240  6929  0701  7800  2085  8303  0080  0701  7A00
0000155260  8373  0568  0082  2801  7F00  C583  8302  0081
0000155300  C583  8302  0082  6C83  8305  056C  C083  8300
0000155320  00C0  C083  8300  00C0  8183  8300  0085  6D83
0000155340  0105  00A1  827F  6E04  6D61  0065  0482  7974
0000155360  6570  8220  6106  7475  6F68  2272  0482  6164
0000155400  6574  8242  6608  6E75  7463  6F69  466E  0882
0000155420  7073  6365  725F  6665  AA85  8200  640B  7365
0000155440  7263  7069  6974  6E6F  0E85  8201  6307  6D6F
0000155460  656D  746E  1285  8201  6610  746C  5F72  6573
0000155500  7261  6863  705F  7461  8568  0116  0E82  6374
0000155520  735F  6165  6372  5F68  6170  6874  1A85  8201
0000155540  6405  6D75  796D  1E85  8201  7009  7261  6D61
0000155560  635F  746E  2085  8201  7009  7261  6D61  6C5F
0000155600  7473  2285  0101  0001  0180  0001  0180  0001
0000155620  0180  0001  0180  0001  0180  0001  0180  0007
0000155640  737A  6B83  8205  0100  0001  0180  0001  0180
0000155660  0001  0180  0001  0180  0001  0180  0001  0180
*
0000156540  0001  0180  000A  8075  8183  6400  8302  05E7
0000156560  0701  7F00  8583  8300  00C0  0A01  7500  8380
0000156600  0081  0164  E983  0105  0004  837F  00C0  0401
0000156620  7F00  7683  0105  000A  8075  8183  7300  8301
0000156640  05EA  0D01  7F00  C083  8300  0085  C083  8300
0000156660  00C0  0A01  7500  8380  00C0  0473  EC83  0105
0000156700  0007  8578  00C8  8083  0100  0001  0180  0007
0000156720  837F  0085  C083  0100  000A  8075  8183  6400
0000156740  8302  05F0  0401  7F00  C083  0100  000A  8075
0000156760  8183  6400  8301  05F2  1105  0001  0000  0116
0000157000  0000  07A7  01C7  0016  01BB  0000  0704  7774
0000157020  695F  696E  0C74  F604  C0FF  0600  5F5F  7974
0000157040  6570  040F  FFF0  0085  5F09  625F  5F78  7974
0000157060  6570  040D  FFE0  07AB  5F07  705F  6972  746E
0000157100  040B  FFD8  0780  5F05  6C5F  6C76  040D  FFE4
0000157120  07AD  5F07  635F  6F6C  6B63  040D  FFF2  00C0
0000157140  5F07  735F  6174  6B63  040E  FFDE  0081  5F08
0000157160  725F  7465  6176  0A6C  FA04  C0FF  0400  6875
0000157200  6261  050E  0084  0005  04F1  5F06  665F  6E75
0000157220  0163  1C02  C701  B101  4E07  1600  4000  0000
0000157240  0400  740D  5F77  6567  6374  6168  5F72  7461
0000157260  040A  0008  0081  6C04  6E69  0965  0604  8100
0000157300  0300  6F63  096C  FC04  81FF  0300  7265  0872
0000157320  FA04  80FF  0200  6863  0201  011C  0215  07B3
0000157340  0036  0016  0028  0000  0D04  7774  705F  7475
0000157360  6863  7261  615F  0874  0A04  8000  0200  6863
0000157400  040A  0008  0081  6C04  6E69  0965  0604  8100
0000157420  0300  6F63  016C  1B02  4B01  B502  3807  1600
0000157440  2A00  0000  0400  740C  5F77  7570  7374  7274
0000157460  615F  0974  0A04  C000  0300  7473  0A72  0804
0000157500  8100  0400  696C  656E  0409  0006  0081  6303
0000157520  6C6F  0201  0117  0283  07B7  0030  0016  0022
0000157540  0000  0804  7774  755F  706E  7475  0407  0006
0000157560  0080  6301  0201  011D  02B3  07B8  002A  0013
0000157600  001E  0000  0E04  7774  675F  7465  635F  5F6D
```

THU MAR 14 17:47:32 1991 TESTWIN.DLL PAGE 37, LINE 2125

| | | | | | | | | |
|---|---|---|---|---|---|---|---|---|
| 0000157620 | 696C | 656E | 0201 | 0118 | 02DD | 07BA | 002F | 0016 |
| 0000157640 | 0021 | 0000 | 0904 | 7774 | 735F | 7465 | 655F | 0A6D |
| 0000157660 | 0604 | 8100 | 0400 | 696C | 656E | 0201 | 011B | 030C |
| 0000157700 | 07BC | 0050 | 0016 | 0042 | 0000 | 0C04 | 7774 | 705F |
| 0000157720 | 7375 | 5F68 | 6863 | 7261 | 0407 | 0008 | 0080 | 6301 |
| 0000157740 | 040D | 0006 | 0085 | 6507 | 6578 | 7563 | 6574 | 0201 |
| 0000157760 | 011A | 035C | 07BE | 0054 | 0016 | 0046 | 0000 | 0B04 |
| 0000160000 | 7774 | 705F | 7375 | 5F68 | 7473 | 0972 | 0804 | C000 |
| 0000160020 | 0300 | 7473 | 0D72 | 0604 | 8500 | 0700 | 7865 | 6365 |
| 0000160040 | 7475 | 0165 | 1402 | 0005 | 0000 | 8100 | 0C00 | 7842 |
| 0000160060 | 445F | 6265 | 6775 | 6F4D | 6564 | 0514 | 0000 | 0000 |
| 0000160100 | 0081 | 420C | 5F78 | 6954 | 656D | 4D73 | 646F | 1465 |
| 0000160120 | 0005 | 0000 | 8100 | 0C00 | 7842 | 455F | 7272 | 726F |
| 0000160140 | 6F4D | 6564 | 0510 | 0000 | 0000 | 0081 | 4208 | 5F78 |
| 0000160160 | 5F42 | 6973 | 0567 | 000D | 1A00 | 0F00 | 7C05 | 0500 |
| 0000160200 | C000 | 0700 | 5F42 | 4678 | 6C69 | 0F65 | 8005 | 0500 |
| 0000160220 | C000 | 0700 | 5F42 | 5078 | 6361 | 146B | 0005 | 0000 |
| 0000160240 | C000 | 0C00 | 7842 | 615F | 7373 | 7265 | 6D74 | 6773 |
| 0000160260 | 1105 | 0001 | 0000 | 0117 | 03B0 | 0707 | 0295 | 0010 |
| 0000160300 | 028A | 0000 | 0804 | 6977 | 5F6E | 6E69 | 7469 | 0409 |
| 0000160320 | 0006 | 00C0 | 7303 | 7274 | 0409 | 000A | 00C0 | 6803 |
| 0000160340 | 6261 | 040D | FF5A | 0086 | 6307 | 6C74 | 6164 | 6174 |
| 0000160360 | 0409 | FFDE | 0085 | 7203 | 7365 | 0409 | FF5E | 0708 |
| 0000160400 | 6103 | 6863 | 040B | FFE0 | 00C0 | 6D05 | 756F | 6573 |
| 0000160420 | 040F | FFE4 | 0081 | 6909 | 6574 | 5F6D | 7461 | 7274 |
| 0000160440 | 0416 | FFFA | 00C0 | 6D10 | 7261 | 6C6B | 636F | 7461 |
| 0000160460 | 726F | 6D5F | 6E65 | 1775 | E604 | C0FF | 1100 | 656C |
| 0000160500 | 7261 | 706E | 696F | 746E | 7265 | 6D5F | 6E65 | 0975 |
| 0000160520 | EA04 | 72FF | 0304 | 696D | 0531 | 6100 | 1904 | 0900 |
| 0000160540 | 5604 | 86FF | 0300 | 7265 | 0172 | 0102 | 1E02 | 4501 |
| 0000160560 | 0B06 | 9507 | 1600 | 8700 | 0000 | 0400 | 740F | 5F77 |
| 0000160600 | 6964 | 7073 | 616C | 5F79 | 6574 | 7473 | 040F | 000A |
| 0000160620 | 00C0 | 7409 | 7365 | 5F74 | 616E | 656D | 040D | 0006 |
| 0000160640 | 0086 | 7407 | 7365 | 5F74 | 6469 | 040C | FFFC | 0085 |
| 0000160660 | 6206 | 6675 | 6E5F | 0A6F | FA04 | 81FF | 0400 | 7473 |
| 0000160700 | 7461 | 0201 | 011B | 06DA | 070D | 0095 | 0016 | 0087 |
| 0000160720 | 0000 | 0C04 | 7774 | 735F | 7661 | 5F65 | 6574 | 7473 |
| 0000160740 | 040F | 000A | 00C0 | 7409 | 7365 | 5F74 | 616E | 656D |
| 0000160760 | 040D | 0006 | 0086 | 7407 | 7365 | 5F74 | 6469 | 040A |
| 0000161000 | FFFA | 0081 | 7304 | 6174 | 0C74 | FC04 | 85FF | 0600 |
| 0000161020 | 7562 | 5F66 | 6F6E | 0201 | 0118 | 076F | 070E | 0048 |
| 0000161040 | 0016 | 003C | 0000 | 0904 | 7774 | 665F | 6E69 | 7369 |
| 0000161060 | 0168 | 1A02 | B701 | 1007 | 4E07 | 1608 | 4000 | 0008 |
| 0000161100 | 0400 | 740B | 5F77 | 6E77 | 5F64 | 7270 | 636F | 040A |
| 0000161120 | 0010 | 00C0 | 6804 | 6E77 | 0964 | 0E04 | 8500 | 0300 |
| 0000161140 | 736D | 0967 | 0A04 | C000 | 0300 | 706D | 0931 | 0604 |
| 0000161160 | C000 | 0300 | 706D | 0F32 | FA04 | 81FF | 0900 | 7469 |
| 0000161200 | 6D65 | 615F | 7474 | 0972 | F804 | 85FF | 0300 | 6572 |
| 0000161220 | 0A73 | FC04 | 85FF | 0400 | 696C | 656E | 0409 | FFF2 |
| 0000161240 | 0085 | 6303 | 6C6F | 040D | FFF4 | 0644 | 6D07 | 6773 |
| 0000161260 | 705F | 7274 | 050D | 050A | 0005 | 0085 | 6205 | 6675 |
| 0000161300 | 645F | 050D | 050C | 0005 | 0085 | 6205 | 6675 | 6E5F |
| 0000161320 | 0005 | 0DC5 | 0022 | 040D | FFF0 | 0081 | 6E07 | 6D75 |
| 0000161340 | 6163 | 6C6C | 0201 | 0005 | 0DFB | 0036 | 040C | FFF0 |
| 0000161360 | 0085 | 6906 | 4964 | 6574 | 016D | 0102 | 1D02 | 0501 |
| 0000161400 | 1410 | 8307 | 1600 | 7500 | 0000 | 0400 | 610E | 6F62 |
| 0000161420 | 7475 | 645F | 676C | 705F | 6F72 | 0A63 | 1004 | C000 |
| 0000161440 | 0400 | 6468 | 676C | 0409 | 000E | 0085 | 6D03 | 6773 |
| 0000161460 | 0409 | 000A | 00C0 | 6D03 | 3170 | 0409 | 0006 | 00C0 |

#15 substitute sheet

THU MAR 14 17:47:32 1991 TESTWIN.DLL PAGE 38, LINE 2184

| | | | | | | | | |
|---|---|---|---|---|---|---|---|---|
| 0000161500 | 6D03 | 3270 | 0201 | 0113 | 1088 | 0716 | 0110 | 0010 |
| 0000161520 | 0105 | 0000 | 0404 | 656D | 756E | 040A | 0006 | 0081 |
| 0000161540 | 7404 | 7079 | 0A65 | 0804 | C000 | 0400 | 7768 | 646E |
| 0000161560 | 040E | 000C | 0081 | 6D08 | 6E65 | 6975 | 6574 | 096D |
| 0000161600 | 0E04 | C100 | 0300 | 6170 | 0972 | 1204 | C000 | 0300 |
| 0000161620 | 7473 | 0972 | FC04 | 81FF | 0300 | 6572 | 0173 | 1A02 |
| 0000161640 | 9801 | 1811 | 4C07 | 1600 | 3E00 | 0000 | 0400 | 740B |
| 0000161660 | 5F77 | 6567 | 5F74 | 6D68 | 646F | 040B | 0006 | 00C5 |
| 0000161700 | 7005 | 6D68 | 646F | 0201 | 011A | 11E4 | 071A | 0050 |
| 0000161720 | 0016 | 0042 | 0000 | 0B04 | 7774 | 675F | 7465 | 685F |
| 0000161740 | 6E77 | 0B64 | 0604 | CE00 | 0503 | 6870 | 6E77 | 0164 |
| 0000161760 | 1F02 | 3401 | 1C12 | FB07 | 1602 | ED00 | 0002 | 0400 |
| 0000162000 | 7410 | 5F77 | 6573 | 5F74 | 656D | 756E | 6D5F | 646F |
| 0000162020 | 0F65 | 0604 | 8100 | 0900 | 656D | 756E | 6D5F | 646F |
| 0000162040 | 0C65 | FA04 | C0FF | 0600 | 5F5F | 7974 | 6570 | 040F |
| 0000162060 | FFF0 | 0085 | 5F09 | 625F | 5F78 | 7974 | 6570 | 040D |
| 0000162100 | FFE0 | 0284 | 5F07 | 705F | 6972 | 746E | 040B | FFD6 |
| 0000162120 | 0202 | 5F05 | 6C5F | 6C76 | 040D | FFE4 | 071F | 5F07 |
| 0000162140 | 635F | 6F6C | 6B63 | 040D | FFF6 | 00C0 | 5F07 | 735F |
| 0000162160 | 6174 | 6B63 | 040E | FFDC | 0081 | 5F08 | 725F | 7465 |
| 0000162200 | 6176 | 0A6C | DE04 | 85FF | 0400 | 7473 | 7461 | 040E |
| 0000162220 | FFD4 | 0081 | 6908 | 6574 | 5F6D | 756E | 076D | F204 |
| 0000162240 | 81FF | 0100 | 0F69 | F404 | 81FF | 0900 | 7469 | 6D65 |
| 0000162260 | 615F | 7474 | 0E72 | 1C05 | 0505 | 1E00 | 0607 | 5F5F |
| 0000162300 | 7566 | 636E | 0201 | 0120 | 152F | 0720 | 013B | 0016 |
| 0000162320 | 012F | 0000 | 1104 | 7774 | 735F | 7465 | 6E5F | 726F |
| 0000162340 | 6E75 | 6D5F | 6E65 | 0C75 | FA04 | C0FF | 0600 | 5F5F |
| 0000162360 | 7974 | 6570 | 040F | FFF4 | 0085 | 5F09 | 625F | 5F78 |
| 0000162400 | 7974 | 6570 | 040D | FFE4 | 0284 | 5F07 | 705F | 6972 |
| 0000162420 | 746E | 040B | FFDC | 0202 | 5FD5 | 6C5F | 6C76 | 040D |
| 0000162440 | FFE8 | 071F | 5F07 | 635F | 6F6C | 6B63 | 040D | FFF6 |
| 0000162460 | 00C0 | 5F07 | 735F | 6174 | 6B63 | 040E | FFE2 | 0081 |
| 0000162500 | 5F08 | 725F | 7465 | 6176 | 0E6C | 3C05 | 0505 | 2200 |
| 0000162520 | 0607 | 5F5F | 7566 | 636E | 0201 | 0122 | 166A | 0723 |
| 0000162540 | 0138 | 0010 | 012D | 0000 | 1304 | 7774 | 625F | 6975 |
| 0000162560 | 646C | 635F | 6C61 | 736C | 6D5F | 6E65 | 0E75 | E404 |
| 0000162600 | C0FF | 0800 | 656D | 756E | 625F | 7261 | 0410 | FFFA |
| 0000162620 | 00C0 | 630A | 6C61 | 736C | 6D5F | 6E65 | 0975 | EA04 |
| 0000162640 | 72FF | 0304 | 696D | 0A31 | 3C04 | 85FF | 0400 | 7469 |
| 0000162660 | 6D65 | 040C | FF3E | D6CA | 7006 | 6163 | 6C6C | 0F73 |
| 0000162700 | 4204 | 81FF | 0900 | 6163 | 6C6C | 5F73 | 656C | 076E |
| 0000162720 | E804 | 81FF | 0100 | 0969 | 4404 | 24FF | 0307 | 7562 |
| 0000162740 | 0A66 | 6605 | 0505 | 7200 | 0204 | 696D | 0201 | 0128 |
| 0000162760 | 17A2 | 0727 | 0254 | 0010 | 0249 | 0000 | 1904 | 7774 |
| 0000163000 | 625F | 6975 | 646C | 745F | 7365 | 5F74 | 7562 | 6666 |
| 0000163020 | 7265 | 6C5F | 7369 | 0C74 | F804 | C0FF | 0600 | 5F5F |
| 0000163040 | 7974 | 6570 | 040F | FFDC | 0085 | 5F09 | 625F | 5F78 |
| 0000163060 | 7974 | 6570 | 040D | FFC8 | 0284 | 5F07 | 705F | 6972 |
| 0000163100 | 746E | 040B | FFC0 | 0202 | 5F05 | 6C5F | 6C76 | 040D |
| 0000163120 | FFD0 | 071F | 5F07 | 635F | 6F6C | 6B63 | 040D | FFF0 |
| 0000163140 | 00C0 | 5F07 | 735F | 6174 | 6B63 | 040E | FFC6 | 0081 |
| 0000163160 | 5F08 | 725F | 7465 | 6176 | 0F6C | CC04 | C0FF | 0900 |
| 0000163200 | 6970 | 6B63 | 6D5F | 6E65 | 0975 | ED04 | 72FF | 0304 |
| 0000163220 | 696D | 0A31 | BE04 | 85FF | 0400 | 7469 | 6D65 | 040A |
| 0000163240 | FFFC | 0081 | 6204 | 6675 | 0A63 | F404 | 05FF | 0402 |
| 0000163260 | 7562 | 7666 | 0407 | FFDE | 0081 | 6901 | 050E | 05A2 |
| 0000163300 | 0005 | 0729 | 5F06 | 665F | 6E75 | 0A63 | BC95 | 0505 |
| 0000163320 | 7200 | 0204 | 696D | 0201 | 0129 | 19F6 | 072C | 0083 |
| 0000163340 | 0010 | 0078 | 0000 | 1A04 | 7774 | 645F | 6C65 | 7465 |

THU MAR 14 17:47:32 1991 TESTWIN.DLL PAGE 39, LINE 2243

| | | | | | | | | |
|---|---|---|---|---|---|---|---|---|
| 0000163360 | 5F65 | 6163 | 6C6C | 5F73 | 656D | 756E | 695F | 6574 |
| 0000163400 | 736D | 040A | 0006 | 0085 | 6904 | 6574 | 0E6D | E604 |
| 0000163420 | C0FF | 0800 | 656D | 756E | 625F | 7261 | 0410 | FFFA |
| 0000163440 | 00C0 | 630A | 6C61 | 736C | 6D5F | 6E65 | 0975 | EA04 |
| 0000163460 | 72FF | 0304 | 696D | 0131 | 2302 | 7901 | 301A | 2D07 |
| 0000163500 | 1601 | 1F00 | 0001 | 0400 | 7414 | 5F77 | 7075 | 6164 |
| 0000163520 | 6574 | 635F | 6C61 | 5F6C | 6863 | 6961 | 096E | 0A04 |
| 0000163540 | 8100 | 0300 | 656C | 0C6E | 0604 | CA00 | 0606 | 6370 |
| 0000163560 | 6C61 | 736C | 040C | FFFA | 00C0 | 5F06 | 745F | 7079 |
| 0000163600 | 0F65 | F404 | 85FF | 0900 | 5F5F | 7862 | 745F | 7079 |
| 0000163620 | 0D65 | E404 | 84FF | 0702 | 5F5F | 7270 | 6E69 | 0B74 |
| 0000163640 | DC04 | 02FF | 0502 | 5F5F | 766C | 0D6C | E804 | 1FFF |
| 0000163660 | 0707 | 5F5F | 6C63 | 636F | 0D6B | F604 | C0FF | 0700 |
| 0000163700 | 5F5F | 7473 | 6361 | 0E6B | E204 | 81FF | 0800 | 5F5F |
| 0000163720 | 6572 | 7674 | 6C61 | 050E | 05D4 | 0005 | 0731 | 5F06 |
| 0000163740 | 665F | 6E75 | 0163 | 0F02 | 6605 | 0503 | FA00 | 0706 |
| 0000163760 | 7A73 | 685F | 6C65 | 0F70 | 1A05 | 0402 | 8500 | 0700 |
| 0000164000 | 6876 | 665F | 6C69 | 0C65 | 0405 | 0400 | 8500 | 0400 |
| 0000164020 | 6D68 | 646F | 0517 | 037C | 0005 | 0081 | 6E0F | 726F |
| 0000164040 | 6E75 | 6D5F | 6E65 | 5F75 | 6F6D | 6564 | 0515 | 037E |
| 0000164060 | 0005 | 0081 | 630D | 7275 | 6D5F | 6E65 | 5F75 | 6F6D |
| 0000164100 | 6564 | 0510 | 0380 | 0005 | 06D1 | 6208 | 7470 | 665F |
| 0000164120 | 726F | 056D | 000D | 1A00 | 1100 | BC05 | 0503 | D100 |
| 0000164140 | 0906 | 706F | 6E65 | 665F | 726F | 106D | F805 | 0503 |
| 0000164160 | D100 | 0806 | 656E | 5F77 | 6F66 | 6D72 | 0513 | 0434 |
| 0000164200 | 0005 | 06D1 | 690B | 706D | 726F | 5F74 | 6F66 | 6D72 |
| 0000164220 | 0513 | 0470 | 0005 | 06D1 | 760B | 7265 | 6669 | 5F79 |
| 0000164240 | 6F66 | 6D72 | 0515 | 11F4 | 0005 | 0081 | 740D | 6C73 |
| 0000164260 | 635F | 6C61 | 736C | 6C5F | 6E65 | 051A | 10EC | 0005 |
| 0000164300 | 06CA | 7412 | 6C73 | 635F | 6C61 | 5F6C | 6863 | 6961 |
| 0000164320 | 5F6E | 7470 | 1172 | F005 | 0510 | ED00 | 0905 | 6970 |
| 0000164340 | 6B63 | 745F | 7365 | 0F74 | 0805 | 0400 | 2D00 | 0702 |
| 0000164360 | 6670 | 725F | 6165 | 1064 | 1005 | 0402 | 2D00 | 0802 |
| 0000164400 | 6670 | 775F | 6972 | 6574 | 0514 | 020C | 0004 | 03A3 |
| 0000164420 | 700C | 6E66 | 6C4F | 4364 | 696C | 6E65 | 1074 | AC05 |
| 0000164440 | 0504 | 8100 | 0800 | 5473 | 706F | 694C | 656E | 050F |
| 0000164460 | 0168 | 0005 | 00C0 | 4207 | 785F | 6946 | 656C | 050F |
| 0000164500 | 021C | 0004 | 0085 | 6807 | 4966 | 706E | 7475 | 0510 |
| 0000164520 | 021E | 0004 | 0085 | 7508 | 4173 | 7463 | 6F69 | 0F6E |
| 0000164540 | 6C05 | 0501 | C000 | 0700 | 5F42 | 5078 | 6361 | 116B |
| 0000164560 | 0005 | 0400 | C000 | 0900 | 7768 | 646E | 6D5F | 6E65 |
| 0000164600 | 1275 | AE05 | 0504 | 8500 | 0A00 | 4C66 | 7261 | 6567 |
| 0000164620 | 6F46 | 746E | 0510 | 0214 | 0004 | 0081 | 7308 | 614D |
| 0000164640 | 4C78 | 6E69 | 0965 | 1605 | 0402 | C000 | 0100 | 1473 |
| 0000164660 | 0005 | 0000 | 8100 | 0C00 | 7842 | 445F | 6265 | 6775 |
| 0000164700 | 6F4D | 6564 | 0514 | 0000 | 0000 | 0081 | 420C | 5F78 |
| 0000164720 | 6954 | 656D | 4D73 | 646F | 1265 | 7005 | 0501 | F300 |
| 0000164740 | 0A06 | 656D | 756E | 695F | 6574 | 736D | 0513 | 10E8 |
| 0000164760 | 0005 | 00C0 | 680B | 6E77 | 5F64 | 6C63 | 6569 | 746E |
| 0000165000 | 0512 | 11F0 | 0005 | 00C0 | 680A | 6E77 | 5F64 | 7266 |
| 0000165020 | 6D61 | 0B65 | 0605 | 0400 | 8100 | 0300 | 656D | 106E |
| 0000165040 | 5005 | 0503 | F600 | 0806 | 7A73 | 635F | 616C | 7373 |
| 0000165060 | 0512 | 0354 | 0005 | 0351 | 730A | 5F7A | 656D | 7373 |
| 0000165100 | 6761 | 1465 | 6005 | 0503 | F800 | 0C06 | 7A73 | 655F |
| 0000165120 | 7478 | 6E65 | 6973 | 6E6F | 1105 | 0001 | 0000 | 0115 |
| 0000165140 | 1BA6 | 0681 | 0051 | 0016 | 0043 | 0000 | 0604 | 7774 |
| 0000165160 | 645F | 676C | 040A | 000A | 00C0 | 6804 | 6E77 | 0E64 |
| 0000165200 | 0604 | 7700 | 0806 | 6F66 | 6D72 | 705F | 7274 | 0201 |
| 0000165220 | 011F | 1BF7 | 0683 | 01B5 | 0016 | 01A7 | 0000 | 1004 |

THU MAR 14 17:47:32 1991 TESTWIN.DLL PAGE 40, LINE 2302

| | | | | | | | | |
|---|---|---|---|---|---|---|---|---|
| 0000165240 | 6567 | 656E | 6972 | 5F63 | 6C64 | 5F67 | 7270 | 636F |
| 0000165260 | 040A | 0010 | 00C0 | 6804 | 6E77 | 0964 | 0E04 | 8500 |
| 0000165300 | 0300 | 736D | 0967 | 0A04 | C000 | 0300 | 706D | 0931 |
| 0000165320 | 0604 | C000 | 0300 | 706D | 0B32 | FC04 | 81FF | 0500 |
| 0000165340 | 7265 | 6F72 | 1472 | F605 | 0511 | 7700 | 0C06 | 7563 |
| 0000165360 | 5F72 | 6F66 | 6D72 | 705F | 7274 | 0201 | 0116 | 1DAC |
| 0000165400 | 0687 | 0048 | 0010 | 003D | 0000 | 0704 | 7062 | 5F74 |
| 0000165420 | 6C64 | 0A67 | 0604 | C000 | 0400 | 7768 | 646E | 040E |
| 0000165440 | 000A | 0677 | 6608 | 726F | 5F6D | 7470 | 0172 | 1B02 |
| 0000165460 | F401 | 891D | 6706 | 1602 | 5900 | 0002 | 0400 | 620C |
| 0000165500 | 7470 | 645F | 676C | 705F | 6F72 | 0A63 | 1004 | C000 |
| 0000165520 | 0400 | 7768 | 646E | 0409 | 000E | 0085 | 6D03 | 6773 |
| 0000165540 | 0409 | 000A | 00C0 | 6D03 | 3170 | 0409 | 0006 | 00C0 |
| 0000165560 | 6D03 | 3270 | 040B | FFFC | 0081 | 6505 | 7272 | 726F |
| 0000165600 | 0514 | 11FA | 0005 | 0677 | 630C | 7275 | 665F | 726F |
| 0000165620 | 5F6D | 7470 | 1372 | 5C05 | 0506 | 8500 | 0B00 | 6F63 |
| 0000165640 | 706D | 7261 | 5F65 | 6C66 | 0167 | 1F02 | 5B01 | 8E20 |
| 0000165660 | 4506 | 1000 | 3A00 | 0000 | 0400 | 7410 | 5F77 | 6964 |
| 0000165700 | 7073 | 6E5F | 7765 | 745F | 7365 | 0A74 | 0604 | C000 |
| 0000165720 | 0400 | 7768 | 646E | 040B | 000A | 05DC | 6D05 | 6773 |
| 0000165740 | 705F | 0201 | 011F | 20A0 | 0690 | 01F5 | 0016 | 01E7 |
| 0000165760 | 0000 | 1004 | 7774 | 6E5F | 7765 | 745F | 7365 | 5F74 |
| 0000166000 | 7270 | 636F | 040A | 0010 | 00C0 | 6804 | 6E77 | 0964 |
| 0000166020 | 0E04 | 850C | 0300 | 736D | 0967 | 0A04 | C000 | 0300 |
| 0000166040 | 706D | 0931 | 0604 | C000 | 0300 | 706D | 0E32 | FC04 |
| 0000166060 | 81FF | 0800 | 616E | 656D | 6C5F | 6E65 | 050D | 11FE |
| 0000166100 | 0005 | 05DC | 6D05 | 6773 | 705F | 0201 | 0D05 | 0000 |
| 0000166120 | 001A | 050C | 0004 | 0004 | 0085 | 6804 | 6F6D | 0564 |
| 0000166140 | 0111 | 0000 | 2000 | 9601 | CF22 | 9705 | 1000 | 8C00 |
| 0000166160 | 0000 | 0400 | 7411 | 5F77 | 6564 | 6166 | 6C75 | 5F74 |
| 0000166200 | 6F66 | 646C | 7265 | 040A | 0006 | 00C0 | 6804 | 6E77 |
| 0000166220 | 0A64 | F604 | 81FF | 0400 | 7473 | 7461 | 0409 | FFF8 |
| 0000166240 | 0085 | 7203 | 7365 | 040D | FFFA | 0086 | 6607 | 6C6F |
| 0000166260 | 5F64 | 6469 | 040F | FFF2 | 00C0 | 6609 | 6C75 | 5F6C |
| 0000166300 | 6170 | 6874 | 0201 | 011E | 232D | 05D2 | 0118 | 0010 |
| 0000166320 | 010D | 0000 | 0F04 | 7774 | 6F5F | 6570 | 5F6E | 6574 |
| 0000166340 | 7473 | 695F | 0A64 | 0604 | C000 | 0400 | 7768 | 646E |
| 0000166360 | 040D | 000A | 0086 | 7407 | 7365 | 5F74 | 6469 | 040F |
| 0000166400 | FFFA | 00C0 | 7409 | 7365 | 5F74 | 616E | 656D | 040A |
| 0000166420 | FFF4 | 0081 | 7304 | 6174 | 0774 | F604 | C0FF | 0100 |
| 0000166440 | 0A63 | F204 | 80FF | 0400 | 6173 | 6576 | 0201 | 0D05 |
| 0000166460 | 0000 | 001A | 051B | 068C | 0005 | 05AB | 6413 | 6665 |
| 0000166500 | 7561 | 746C | 665F | 6C6F | 6564 | 5F72 | 6F66 | 6D72 |
| 0000166520 | 1105 | 0001 | 0000 | 0119 | 2446 | 05EB | 00A3 | 0016 |
| 0000166540 | 0095 | 0000 | 0A04 | 6D74 | 645F | 7369 | 5F70 | 6874 |
| 0000166560 | 0410 | 0006 | 0576 | 740A | 5F68 | 5F70 | 6170 | 6172 |
| 0000166600 | 0A6D | FA04 | C0FF | 0400 | 7768 | 646E | 040A | FFF8 |
| 0000166620 | 0085 | 6804 | 6F6D | 0A64 | F604 | 81FF | 0400 | 7473 |
| 0000166640 | 7461 | 0201 | 0119 | 24E9 | 05ED | 0552 | 0016 | 0544 |
| 0000166660 | 0000 | 0A04 | 6D74 | 745F | 5F68 | 7270 | 636F | 040A |
| 0000166700 | 0010 | 00C0 | 6804 | 6E77 | 0964 | 0E04 | 8500 | 0300 |
| 0000166720 | 736D | 0967 | 0A04 | C000 | 0300 | 706D | 0931 | 0604 |
| 0000166740 | C000 | 0300 | 706D | 1132 | DA04 | C0FF | 0B00 | 7768 |
| 0000166760 | 646E | 705F | 7261 | 6D61 | 0A73 | C804 | 81FF | 0400 |
| 0000167000 | 7469 | 6D65 | 040C | FFCA | 0081 | 7206 | 7365 | 6C75 |
| 0000167020 | 0B74 | DE04 | C5FF | 0502 | 6170 | 6172 | 0E6D | CC04 |
| 0000167040 | C0FF | 0800 | 6D74 | 5F70 | 6564 | 6373 | 040C | FFD0 |
| 0000167060 | 00C0 | 6406 | 7365 | 5F63 | 0E70 | D404 | C0FF | 0800 |
| 0000167100 | 696C | 656E | 655F | 646E | 0407 | FFD8 | 0085 | 6901 |

THU MAR 14 17:47:32 1991 TESTWIN.DLL PAGE 41, LINE 2361

| | | | | | | | | |
|---|---|---|---|---|---|---|---|---|
| 0000167120 | 0201 | 011B | 2A3B | 05F1 | 013F | 0010 | 0134 | 0000 |
| 0000167140 | 0C04 | 6E69 | 6573 | 7472 | 705F | 7261 | 6D61 | 0411 |
| 0000167160 | 0006 | 0085 | 750B | 6470 | 7461 | 5F65 | 6C66 | 6761 |
| 0000167200 | 040A | 0008 | 00CD | 6804 | 6E77 | 0A64 | DA04 | 81FF |
| 0000167220 | 0400 | 7469 | 6D65 | 040C | FFDC | 0081 | 7206 | 7365 |
| 0000167240 | 6C75 | 0B74 | DE04 | C5FF | 0502 | 6170 | 6172 | 016D |
| 0000167260 | 1602 | 7A01 | F32B | 1005 | 1002 | 0500 | 0002 | 0400 |
| 0000167300 | 6707 | 7465 | 685F | 7264 | 040A | 0006 | 00C0 | 6804 |
| 0000167320 | 6E77 | 0964 | F404 | 85FF | 0300 | 656C | 0A6E | F604 |
| 0000167340 | 85FF | 0400 | 7469 | 6D65 | 040C | FFF8 | 00CD | 6406 |
| 0000167360 | 7365 | 5F63 | 0770 | FC04 | 85FF | 0100 | 0169 | 0502 |
| 0000167400 | 000D | 1A00 | 0C00 | 0205 | 0512 | 7600 | 0405 | 6874 |
| 0000167420 | 705F | 7409 | 7365 | 7774 | 6E69 | 632E | 0001 | 002B |
| 0000167440 | 003D | 0000 | 003E | 0016 | 0041 | 00A8 | 0043 | 0120 |
| 0000167460 | 0044 | 01BB | 0057 | 01C7 | 005A | 01DD | 005B | 01F0 |
| 0000167500 | 005C | 01F9 | 005D | 01FF | 005E | 0202 | 005F | 0207 |
| 0000167520 | 0073 | 0215 | 0074 | 022B | 0075 | 023D | 007D | 024B |
| 0000167540 | 007E | 0261 | 007F | 0275 | 0094 | 0283 | 0095 | 0299 |
| 0000167560 | 0096 | 02A5 | 009F | 02B3 | 00A0 | 02C9 | 00A1 | 02D1 |
| 0000167600 | 00AB | 02DD | 00AC | 02F3 | 00AD | 02FE | 00B9 | 030C |
| 0000167620 | 00BA | 0322 | 00BB | 032B | 00BC | 0332 | 00BD | 033B |
| 0000167640 | 00BE | 0342 | 00BF | 0345 | 00C0 | 034E | 00C7 | 035C |
| 0000167660 | 00C8 | 0372 | 00C9 | 037B | 00CA | 0382 | 00CB | 038D |
| 0000167700 | 00CC | 0394 | 00CD | 0397 | 00CF | 03A2 | 7404 | 2E77 |
| 0000167720 | 0163 | 6000 | 9D01 | B000 | A703 | C000 | A803 | DB00 |
| 0000167740 | A903 | E400 | AC03 | EA00 | AD03 | 0D00 | B004 | 1300 |
| 0000167760 | B704 | 1F00 | B904 | 5500 | BB04 | 6100 | BC04 | 7400 |
| 0000170000 | BE04 | 7A00 | C104 | 8100 | C204 | 9200 | C304 | 9F00 |
| 0000170020 | C404 | B200 | C504 | BF00 | C604 | CE00 | C704 | E100 |
| 0000170040 | C804 | E600 | CE04 | 0A00 | D005 | 1A00 | D105 | 2E00 |
| 0000170060 | D305 | 6200 | D405 | 8200 | D605 | 8E00 | D905 | A500 |
| 0000170100 | DA05 | C500 | DC05 | D100 | E105 | E800 | E305 | 0200 |
| 0000170120 | E506 | 1900 | E606 | 2700 | E806 | 3400 | EA06 | 3A00 |
| 0000170140 | FC06 | 4500 | 0006 | 5B01 | 0106 | 7401 | 0206 | 7D01 |
| 0000170160 | 0306 | 8501 | 0406 | 9701 | 0506 | 9D01 | 0706 | A001 |
| 0000170200 | 0806 | A701 | 0906 | AF01 | 0A06 | B701 | 0B06 | BE01 |
| 0000170220 | 1306 | C601 | 1406 | CC01 | 2606 | DA01 | 2A06 | F001 |
| 0000170240 | 2B06 | 1701 | 2C07 | 1D01 | 2D07 | 3601 | 2E07 | 3C01 |
| 0000170260 | 2F07 | 5501 | 3107 | 5B01 | 3207 | 6101 | 4407 | 6F01 |
| 0000170300 | 4907 | 8501 | 4B07 | 8A01 | 4C07 | 9701 | 4D07 | A501 |
| 0000170320 | 4E07 | AB01 | 6607 | B701 | 7207 | CD01 | 7407 | D301 |
| 0000170340 | 7507 | EF01 | 7907 | F201 | 7A07 | 1801 | 7D08 | 1B01 |
| 0000170360 | 8008 | 2101 | 8108 | 2601 | 8408 | 2901 | 8508 | 2E01 |
| 0000170400 | 8708 | 3101 | 8808 | 3401 | 8908 | 4A01 | 8D08 | 4D01 |
| 0000170420 | 8E08 | 5401 | 9108 | 5D01 | 9408 | 6301 | 9508 | 7701 |
| 0000170440 | 9608 | 8001 | 9708 | 8B01 | 9A08 | 8E01 | 9B08 | A201 |
| 0000170460 | 9C08 | AB01 | 9D08 | B601 | A008 | B901 | A108 | C001 |
| 0000170500 | A508 | C301 | A608 | CA01 | BA08 | CD01 | BB08 | D401 |
| 0000170520 | BE08 | D701 | BF08 | EB01 | C008 | F401 | C108 | FF01 |
| 0000170540 | C508 | 0201 | C609 | 1601 | C709 | 1F01 | C809 | 2A01 |
| 0000170560 | CC09 | 2D01 | CD09 | 5201 | D009 | 5501 | D109 | 5C01 |
| 0000170600 | D409 | 5F01 | D509 | 6601 | D809 | 6901 | D909 | 7001 |
| 0000170620 | DC09 | 7301 | DD09 | 7A01 | E009 | 7D01 | E209 | 8201 |
| 0000170640 | E309 | A601 | E609 | AF01 | E709 | D301 | E909 | DC01 |
| 0000170660 | EA09 | DF01 | EC09 | E401 | ED09 | 0801 | F00A | 1101 |
| 0000170700 | F30A | 1401 | F50A | 1901 | F60A | 3D01 | F90A | 4601 |
| 0000170720 | FA0A | 6A01 | FC0A | 7301 | FD0A | 7601 | FF0A | 7B01 |
| 0000170740 | 000A | 9F02 | 030A | A802 | 060A | AB02 | 080A | B002 |
| 0000170760 | 090A | D402 | 0C0A | DD02 | 0D0A | 0102 | 0F0B | 0A02 |

THU MAR 14 17:47:32 1991 TESTWIN.DLL PAGE 42, LINE 2420

| | | | | | | | | |
|---|---|---|---|---|---|---|---|---|
| 0000171000 | 100B | 0D02 | 120B | 1202 | 130B | 3602 | 160B | 3F02 |
| 0000171020 | 190B | 4202 | 1A0B | 4F02 | 1B0B | 5802 | 1C0B | 5B02 |
| 0000171040 | 1D0B | 6F02 | 1E0B | 7B02 | 1F0B | 7B02 | 200B | 8B02 |
| 0000171060 | 210B | 9402 | 220B | 9D02 | 230B | AA02 | 250B | B502 |
| 0000171100 | 290B | B802 | 2A0B | BF02 | 2D0B | C202 | 2E0B | C902 |
| 0000171120 | 310B | CC02 | 320B | D302 | 350B | D602 | 360B | DD02 |
| 0000171140 | 390B | E002 | 3A0B | E702 | 3D0B | EA02 | 3E0B | F102 |
| 0000171160 | 410B | F402 | 420B | FB02 | 460B | FE02 | 480B | 0302 |
| 0000171200 | 490C | 2702 | 4C0C | 3002 | 4D0C | 5402 | 4F0C | 5D02 |
| 0000171220 | 500C | 6002 | 520C | 6502 | 530C | 8902 | 560C | 9202 |
| 0000171240 | 590C | 9502 | 5A0C | 9C02 | 5D0C | 9F02 | 5F0C | A402 |
| 0000171260 | 600C | C802 | 630C | D102 | 640C | F502 | 660C | FE02 |
| 0000171300 | 670C | 0102 | 690D | 0602 | 6A0D | 2A02 | 6D0D | 3302 |
| 0000171320 | 700D | 3602 | 710D | 3D02 | 730D | 4002 | 740D | 4702 |
| 0000171340 | 760D | 4A02 | 770D | 5102 | 790D | 5402 | 7A0D | 5B02 |
| 0000171360 | 7C0D | 5E02 | 7D0D | 6502 | 7F0D | 6802 | 800D | 6F02 |
| 0000171400 | 860D | 7202 | 870D | 8102 | 880D | 8A02 | 890D | 9102 |
| 0000171420 | 8B0D | 9402 | 8C0D | A402 | 8F0D | A702 | 900D | AE02 |
| 0000171440 | 970D | B102 | 9A0D | C502 | 9B0D | CE02 | 9C0D | D802 |
| 0000171460 | 9D0D | E402 | A10D | E702 | A30D | FB02 | A70D | 0102 |
| 0000171500 | A80E | 2302 | A90E | 2E02 | AC0E | 3102 | AD0E | 2A02 |
| 0000171520 | B00F | 2D02 | B10F | 3402 | B20F | 5802 | B70F | 6302 |
| 0000171540 | B90F | 6B02 | BA0F | 7202 | BB0F | 8F02 | BD0F | 9202 |
| 0000171560 | BE0F | B202 | BF0F | EE02 | C00F | F702 | D40F | 0502 |
| 0000171600 | D510 | 1B02 | D710 | 2102 | D810 | 2702 | D910 | 3702 |
| 0000171620 | DA10 | 3A02 | DB10 | 4602 | DC10 | 6302 | DD10 | 7102 |
| 0000171640 | DE10 | 7A02 | E910 | 8802 | EC10 | 9802 | F010 | 9E02 |
| 0000171660 | F110 | B902 | F610 | BC02 | F710 | DB02 | FC10 | DE02 |
| 0000171700 | FD10 | 0702 | 0211 | 0A03 | 0311 | 2A03 | 0811 | 2D03 |
| 0000171720 | 0911 | 5003 | 0A11 | 5903 | 0C11 | 5C03 | 0D11 | 6203 |
| 0000171740 | 0E11 | 8703 | 1011 | 8D03 | 2111 | 9803 | 2211 | AE03 |
| 0000171760 | 2311 | BD03 | 2411 | C703 | 2611 | CD03 | 2711 | D003 |
| 0000172000 | 2911 | D603 | 3B11 | E403 | 3C11 | FA03 | 3D11 | 0603 |
| 0000172020 | 3E12 | 1703 | 4012 | 1D03 | 4112 | 2003 | 4312 | 2603 |
| 0000172040 | 5612 | 3403 | 5712 | 4A03 | 5A12 | DD03 | 5C12 | E203 |
| 0000172060 | 5F12 | E703 | 6012 | F303 | 6112 | 7003 | 6713 | 7603 |
| 0000172100 | 6813 | 7F03 | 6B13 | 8503 | 6E13 | 9B03 | 7213 | ED03 |
| 0000172120 | 7413 | F303 | 7513 | 1703 | 7814 | 1A03 | 7914 | 3E03 |
| 0000172140 | 7A14 | 6203 | 7D14 | 6503 | 7E14 | 8903 | 7F14 | 8C03 |
| 0000172160 | 8114 | A403 | 8214 | 2103 | 9415 | 2F03 | 9515 | 4503 |
| 0000172200 | 9715 | D803 | 9815 | E103 | 9915 | 5E03 | AA16 | 6A03 |
| 0000172220 | B916 | 7A03 | BB16 | 7F03 | BD16 | 9503 | BE16 | AD03 |
| 0000172240 | C116 | B903 | C516 | BF03 | CA16 | EAD3 | CB16 | F103 |
| 0000172260 | CE16 | 0003 | CF17 | 0A03 | D117 | 1003 | D217 | 2603 |
| 0000172300 | D617 | 2903 | D717 | 4003 | D917 | 4903 | DC17 | 7C03 |
| 0000172320 | DD17 | 9403 | DF17 | 9703 | E917 | A203 | EA17 | B203 |
| 0000172340 | F617 | 4503 | F918 | 5403 | FA18 | 7403 | FD18 | 8003 |
| 0000172360 | 0118 | 8504 | 0418 | AE04 | 0518 | B704 | 0718 | BD04 |
| 0000172400 | 0818 | D304 | 0F18 | 3604 | 1019 | 4C04 | 1219 | 5504 |
| 0000172420 | 1319 | 7704 | 1619 | 7A04 | 1819 | 8804 | 1919 | EB04 |
| 0000172440 | 2519 | F604 | 2A19 | 0604 | 2C1A | 1C04 | 2E1A | 3404 |
| 0000172460 | 311A | 4004 | 341A | 4504 | 351A | 6E04 | 4B1A | 7904 |
| 0000172500 | 4C1A | 8F04 | 4E1A | 2204 | 4F1B | 2804 | 511B | 3504 |
| 0000172520 | 521B | 9804 | 051B | 6C64 | 2E67 | 0163 | 6600 | 4700 |
| 0000172540 | A600 | 491B | BC00 | 4A1B | E900 | 5F1B | F700 | 631B |
| 0000172560 | 0D00 | 661C | 1300 | 691C | 2000 | 6A1C | 3900 | 6B1C |
| 0000172600 | 4A00 | 6D1C | 6400 | 6F1C | 7500 | 711C | 9200 | 731C |
| 0000172620 | A300 | 751C | C000 | 7A1C | C900 | 7B1C | EC00 | 7F1C |
| 0000172640 | F500 | 831C | FB00 | 841C | 1A00 | 851D | 2700 | 881D |

THU MAR 14 17:47:32 1991 TESTWIN.DLL PAGE 43, LINE 2479

| | | | | | | | | |
|---|---|---|---|---|---|---|---|---|---|
| 0000172660 | 3000 | 891D | 3D00 | 8A1D | 4600 | 8B1D | 4900 | 8C1D |
| 0000172700 | 5B00 | 8D1D | 7800 | 8E1D | 9500 | 8F1D | 9E00 | A21D |
| 0000172720 | AC00 | A41D | BC00 | A51D | E900 | BA1D | F400 | BF1D |
| 0000172740 | 0A00 | C21E | 1000 | C41E | 1D00 | C51E | 3600 | C61E |
| 0000172760 | 4700 | C81E | 6100 | CA1E | 7200 | CC1E | 8F00 | CE1E |
| 0000173000 | 9900 | D01E | B200 | D51E | BB00 | D61E | DE00 | D91E |
| 0000173020 | E700 | DC1E | ED00 | DD1E | 0900 | DE1F | 1300 | DF1F |
| 0000173040 | 1C00 | E01F | 1F00 | E11F | 2800 | E51F | 3100 | E71F |
| 0000173060 | 4600 | EB1F | 4F00 | EC1F | 6400 | F01F | 6D00 | F11F |
| 0000173100 | 8200 | F51F | 8B00 | F61F | A000 | F91F | A900 | FC1F |
| 0000173120 | B200 | FD1F | BF00 | 011F | C801 | 021F | CB01 | 031F |
| 0000173140 | 0901 | 0420 | 2601 | 0520 | 4401 | 0620 | 4D01 | 1920 |
| 0000173160 | 5B01 | 1B20 | 6B01 | 1C20 | 9501 | 3120 | A001 | 3520 |
| 0000173200 | B601 | 3920 | BC01 | 3B20 | C901 | 3C20 | E001 | 3F20 |
| 0000173220 | E901 | 4020 | 0901 | 4221 | 1201 | 4421 | 2B01 | 4721 |
| 0000173240 | 2E01 | 4A21 | 3401 | 4B21 | 3E01 | 4C21 | 5701 | 4D21 |
| 0000173260 | 6001 | 4E21 | 8A01 | 5021 | 9301 | 5121 | B701 | 5521 |
| 0000173300 | C001 | 5621 | F101 | 5721 | 0601 | 5822 | 0F01 | 5B22 |
| 0000173320 | 1201 | 5C22 | 2701 | 5D22 | 3001 | 6022 | 3301 | 6122 |
| 0000173340 | 3601 | 6222 | 4801 | 6522 | 4B01 | 6622 | 6801 | 6722 |
| 0000173360 | 7E01 | 6822 | 8701 | 0722 | 7774 | 645F | 2E62 | 0163 |
| 0000173400 | 1C00 | 3D00 | 9600 | 4322 | A600 | 4422 | B700 | 4522 |
| 0000173420 | CA00 | 4622 | D500 | 4722 | E900 | 4922 | FC00 | 4A22 |
| 0000173440 | 0E00 | 4C23 | 1700 | 4D23 | 2200 | 5F23 | 2D00 | 6723 |
| 0000173460 | 3D00 | 6A23 | 5C00 | 6B23 | 6500 | 6E23 | 6B00 | 6F23 |
| 0000173500 | 8C00 | 7323 | 9200 | 7423 | AF00 | 7523 | B800 | 7623 |
| 0000173520 | D800 | 7723 | E400 | 7823 | EF00 | 7923 | F600 | 7B23 |
| 0000173540 | 1600 | 7C24 | 1E00 | 7F24 | 2700 | 8024 | 3400 | 8124 |
| 0000173560 | 3A00 | 0424 | 6874 | 632E | 0001 | 008E | 0051 | 2446 |
| 0000173600 | 0057 | 245C | 0058 | 2477 | 005A | 247D | 005B | 248F |
| 0000173620 | 005E | 2499 | 005F | 24C2 | 0061 | 24C8 | 0063 | 24D5 |
| 0000173640 | 0064 | 24DB | 0078 | 24E9 | 007F | 24FF | 0085 | 2505 |
| 0000173660 | 0087 | 251E | 0089 | 2537 | 008B | 2550 | 008D | 2569 |
| 0000173700 | 008F | 2582 | 0091 | 259B | 0095 | 25A8 | 0096 | 25C3 |
| 0000173720 | 0098 | 25CC | 0099 | 25EE | 009B | 25F7 | 009C | 2623 |
| 0000173740 | 009E | 262C | 009F | 264E | 00A1 | 2657 | 00A2 | 2679 |
| 0000173760 | 00A4 | 2682 | 00A6 | 2695 | 00A7 | 26C2 | 00A8 | 26CB |
| 0000174000 | 00A9 | 26E7 | 00AA | 26F3 | 00AB | 2708 | 00AC | 271E |
| 0000174020 | 00AD | 2729 | 00AE | 272C | 00AF | 272F | 00B0 | 2736 |
| 0000174040 | 00B1 | 2752 | 00B2 | 275B | 00B3 | 276D | 00B4 | 2770 |
| 0000174060 | 00B9 | 277E | 00BA | 2799 | 00BC | 27A2 | 00BD | 27B7 |
| 0000174100 | 00BF | 27C0 | 00C0 | 27DD | 00C2 | 27E6 | 00C6 | 2802 |
| 0000174120 | 00C9 | 282D | 00CA | 2838 | 00CB | 2841 | 00CE | 2844 |
| 0000174140 | 00D0 | 2851 | 00D5 | 2854 | 00D6 | 2873 | 00D9 | 2876 |
| 0000174160 | 00DD | 287C | 00DF | 2898 | 00E2 | 289E | 00E6 | 28A1 |
| 0000174200 | 00E7 | 28BF | 00E8 | 28DA | 00E9 | 28E3 | 00EB | 28E6 |
| 0000174220 | 00EC | 28E9 | 00ED | 28FD | 00F0 | 2900 | 00F1 | 2903 |
| 0000174240 | 00F2 | 2911 | 00F5 | 2914 | 00F8 | 291A | 00F9 | 292A |
| 0000174260 | 00FD | 292D | 00FE | 2949 | 00FF | 2952 | 0101 | 2955 |
| 0000174300 | 0102 | 2971 | 0105 | 2974 | 0106 | 2984 | 0109 | 2987 |
| 0000174320 | 010D | 2995 | 010E | 29AA | 010F | 29B3 | 0112 | 29B6 |
| 0000174340 | 0113 | 29B9 | 0114 | 29DF | 0117 | 29E2 | 0118 | 29FF |
| 0000174360 | 0119 | 2A24 | 011A | 2A2D | 0127 | 2A3B | 012C | 2A4B |
| 0000174400 | 012D | 2A68 | 0132 | 2A6E | 0133 | 2A8B | 0135 | 2A91 |
| 0000174420 | 0137 | 2A94 | 013A | 2A9A | 013C | 2AB6 | 013D | 2ABC |
| 0000174440 | 0141 | 2AD1 | 0142 | 2AED | 0143 | 2AF6 | 0144 | 2AFF |
| 0000174460 | 0146 | 2B05 | 0147 | 2B29 | 0149 | 2B2F | 014A | 2B32 |
| 0000174500 | 014B | 2B3B | 014F | 2B40 | 0151 | 2B60 | 0152 | 2B69 |
| 0000174520 | 0154 | 2B6F | 015E | 2B7A | 0164 | 2B8A | 0165 | 2BAE |

THU MAR 14 17:47:32 1991 TESTWIN.DLL PAGE 44, LINE 2538

| | | | | | | | | |
|---|---|---|---|---|---|---|---|---|
| 0000174540 | 0168 | 2BB4 | 0169 | 2BD8 | 016C | 2BE1 | 016D | 2C05 |
| 0000174560 | 016F | 2C0F | 0170 | 2C29 | 0174 | 2C3E | 0175 | 2C6C |
| 0000174600 | 0177 | 2C72 | 0178 | 2C86 | 0179 | 2CA0 | 017A | 2CBA |
| 0000174620 | 017B | 2CC4 | 017C | 2CCB | 017D | 2CCE | 0182 | 2CD5 |
| 0000174640 | 0186 | 2CF7 | 0187 | 2D2B | 0189 | 2D31 | 018C | 2D4D |
| 0000174660 | 018D | 2D7F | 0700 | 736F | 2E32 | 696C | 0A62 | 626C |
| 0000174700 | 7069 | 746D | 6C2E | 6269 | 7506 | 2E69 | 696C | 0962 |
| 0000174720 | 656D | 6964 | 2E74 | 696C | 0962 | 6264 | 705F | 2E69 |
| 0000174740 | 696C | 0A62 | 7374 | 5F6C | 6669 | 6C2E | 6269 | 4C0C |
| 0000174760 | 494C | 4342 | 4C44 | 2E4C | 494C | 8642 | 0100 | 0101 |
| 0000175000 | 0800 | 0000 | 3100 | 0200 | 0101 | CF00 | 0005 | A200 |
| 0000175020 | 0300 | 0101 | 4400 | 0012 | E600 | 0417 | 0101 | 9700 |
| 0000175040 | 0079 | B800 | 0902 | 0101 | B100 | 008A | BA00 | 0100 |
| 0000175060 | 0201 | 3900 | 0000 | 2C00 | 0200 | 0201 | 7100 | 0006 |
| 0000175100 | E700 | 0301 | 0201 | 2A00 | 002A | C000 | 0419 | 0201 |
| 0000175120 | 4F00 | 007C | A800 | 0909 | 0201 | 6B00 | 008B | 8900 |
| 0000175140 | 0105 | 0301 | 6500 | 0000 | 2D00 | 0200 | 0301 | 5800 |
| 0000175160 | 0008 | 7500 | 0300 | 0301 | EA00 | 0043 | 9600 | 0414 |
| 0000175200 | 0301 | F700 | 0085 | 0700 | 0902 | 0301 | F400 | 0090 |
| 0000175220 | A200 | 0101 | 0401 | 9200 | 0000 | 2F00 | 0200 | 0401 |
| 0000175240 | CD00 | 0008 | 3000 | 0300 | 0401 | 8000 | 0058 | C900 |
| 0000175260 | 040F | 0401 | FE00 | 0087 | F100 | 0900 | 0401 | 9600 |
| 0000175300 | 0092 | 7C00 | 0100 | 0501 | C100 | 0000 | 2C00 | 0200 |
| 0000175320 | 0501 | FD00 | 0008 | 2200 | 0300 | 0501 | 4900 | 0068 |
| 0000175340 | 4E00 | 0411 | 0501 | EF00 | 0088 | C200 | 0901 | 0501 |
| 0000175360 | 1200 | 0093 | 4100 | 0102 | 4F01 | ED00 | 0000 | 1800 |
| 0000175400 | 0200 | 4F01 | 1F00 | 0009 | 5200 | 0101 | 5001 | 0500 |
| 0000175420 | 0001 | 1B00 | 0200 | 5001 | 7100 | 000A | D200 | 0101 |
| 0000175440 | 5101 | 2000 | 0001 | 1C00 | 0200 | 5101 | 4300 | 000C |
| 0000175460 | 3500 | 0100 | 5201 | 3C00 | 0001 | 1700 | 0200 | 5201 |
| 0000175500 | 7800 | 000C | 0F00 | 0100 | 5301 | 5300 | 0001 | 1700 |
| 0000175520 | 0200 | 5301 | 8700 | 000C | 3300 | 0100 | 5401 | 6A00 |
| 0000175540 | 0001 | 1A00 | 0200 | 5401 | BA00 | 000C | 1000 | 0100 |
| 0000175560 | 5501 | 8400 | 0001 | 1C00 | 0200 | 5501 | CA00 | 000C |
| 0000175600 | 2500 | 0100 | 5601 | A000 | 0001 | 1B00 | 0200 | 5601 |
| 0000175620 | EF00 | 000C | 3F00 | 0100 | 5701 | BB00 | 0001 | 1800 |
| 0000175640 | 0200 | 5701 | 2E00 | 000D | 0F00 | 0100 | 5801 | D300 |
| 0000175660 | 0001 | 1400 | 0200 | 5801 | 3D00 | 000D | 3700 | 0100 |
| 0000175700 | 5901 | E700 | 0001 | 1800 | 0200 | 5901 | 7400 | 000D |
| 0000175720 | 0F00 | 0100 | 5A01 | FF00 | 0001 | 1800 | 0200 | 5A01 |
| 0000175740 | 8300 | 000D | 0F00 | 0100 | 5B01 | 1700 | 0002 | 1500 |
| 0000175760 | 0200 | 5B01 | 9200 | 000D | 3000 | 0100 | 5C01 | 2C00 |
| 0000176000 | 0002 | 1700 | 0200 | 5C01 | C200 | 000D | 0F00 | 0100 |
| 0000176020 | 5D01 | 4300 | 0002 | 1A00 | 0200 | 5D01 | D100 | 000D |
| 0000176040 | 1E00 | 0100 | 5E01 | 5D00 | 0002 | 1600 | 0200 | 5E01 |
| 0000176060 | EF00 | 000D | 1E00 | 0100 | 5F01 | 7300 | 0002 | 1700 |
| 0000176100 | 0200 | 5F01 | 0D00 | 000E | 1F00 | 0100 | 6001 | 8A00 |
| 0000176120 | 0002 | 1500 | 0200 | 6001 | 2C00 | 000E | 1B00 | 0100 |
| 0000176140 | 6101 | 9F00 | 0002 | 1800 | 0200 | 6101 | 4700 | 000E |
| 0000176160 | 4200 | 0100 | 6201 | B700 | 0002 | 1600 | 0200 | 6201 |
| 0000176200 | 8900 | 000E | 0E00 | 0100 | 6301 | CD00 | 0002 | 1800 |
| 0000176220 | 0200 | 6301 | 9700 | 000E | 1000 | 0100 | 6401 | E500 |
| 0000176240 | 0002 | 1800 | 0200 | 6401 | A700 | 000E | 1000 | 0100 |
| 0000176260 | 6501 | FD00 | 0002 | 1900 | 0200 | 6501 | B700 | 000E |
| 0000176300 | 1200 | 0100 | 6601 | 1600 | 0003 | 1800 | 0200 | 6601 |
| 0000176320 | C900 | 000E | 4100 | 0100 | 6701 | 2E00 | 0003 | 1700 |
| 0000176340 | 0200 | 6701 | 0A00 | 000F | 0F00 | 0100 | 6801 | 4500 |
| 0000176360 | 0003 | 1700 | 0200 | 6801 | 1900 | 000F | 0E00 | 0100 |
| 0000176400 | 6901 | 5C00 | 0003 | 1700 | 0200 | 6901 | 2700 | 000F |

THU MAR 14 17:47:32 1991 TESTWIN.DLL PAGE 45, LINE 2597

| | | | | | | | | |
|---|---|---|---|---|---|---|---|---|
| 0000176420 | 0E00 | 0100 | 6A01 | 7300 | 0003 | 1700 | 0200 | 6A01 |
| 0000176440 | 3500 | 000F | 0E00 | 0100 | 6B01 | 8A00 | 0003 | 1800 |
| 0000176460 | 0200 | 6B01 | 4300 | 000F | 0F00 | 0100 | 6C01 | A200 |
| 0000176500 | 0003 | 1800 | 0200 | 6C01 | 5200 | 000F | 0F00 | 0100 |
| 0000176520 | 6D01 | BA00 | 0003 | 1500 | 0200 | 6D01 | 6100 | 000F |
| 0000176540 | 0C00 | 0100 | 6E01 | CF00 | 0003 | 1500 | 0200 | 6E01 |
| 0000176560 | 6D00 | 000F | 0E00 | 0100 | 6F01 | E400 | 0003 | 1900 |
| 0000176600 | 0200 | 6F01 | 7B00 | 000F | 5600 | 0100 | 7001 | FD00 |
| 0000176620 | 0003 | 1600 | 0200 | 7001 | D100 | 000F | 1D00 | 0100 |
| 0000176640 | 7101 | 1300 | 0004 | 1500 | 0200 | 7101 | EE00 | 000F |
| 0000176660 | 0E00 | 0100 | 7201 | 2800 | 0004 | 1A00 | 0200 | 7201 |
| 0000176700 | FC00 | 000F | AB00 | 0100 | 7301 | 4200 | 0004 | 1D00 |
| 0000176720 | 0200 | 7301 | A700 | 0010 | 2400 | 0100 | 7401 | 5F00 |
| 0000176740 | 0004 | 1600 | 0200 | 7401 | CB00 | 0010 | 0F00 | 0100 |
| 0000176760 | 7501 | 7500 | 0004 | 1700 | 0200 | 7501 | DA00 | 0010 |
| 0000177000 | 0E00 | 0100 | 7601 | 8C00 | 0004 | 1600 | 0200 | 7601 |
| 0000177020 | E800 | 0010 | 0F00 | 0100 | 7701 | A200 | 0004 | 1400 |
| 0000177040 | 0200 | 7701 | F700 | 0010 | 0D00 | 0100 | 7801 | B600 |
| 0000177060 | 0004 | 1300 | 0200 | 7801 | 0400 | 0011 | 1C00 | 0100 |
| 0000177100 | 7901 | C900 | 0004 | 1500 | 0200 | 7901 | 2000 | 0011 |
| 0000177120 | 0E00 | 0100 | 7A01 | DE00 | 0004 | 1700 | 0200 | 7A01 |
| 0000177140 | 2E00 | 0011 | 1100 | 0100 | 7B01 | F500 | 0004 | 1400 |
| 0000177160 | 0200 | 7B01 | 3F00 | 0011 | 2C00 | 0100 | 7C01 | 0900 |
| 0000177200 | 0005 | 1600 | 0200 | 7C01 | 6B00 | 0011 | 4E00 | 0100 |
| 0000177220 | 7D01 | 1F00 | 0005 | 1700 | 0200 | 7D01 | B900 | 0011 |
| 0000177240 | 0E00 | 0100 | 7E01 | 3600 | 0005 | 1800 | 0200 | 7E01 |
| 0000177260 | C700 | 0011 | 0F00 | 0100 | 7F01 | 4E00 | 0005 | 1600 |
| 0000177300 | 0200 | 7F01 | D600 | 0011 | 1100 | 0100 | 8001 | 6400 |
| 0000177320 | 0005 | 1500 | 0200 | 8001 | E700 | 0011 | 0F00 | 0100 |
| 0000177340 | 8101 | 7900 | 0005 | 1500 | 0200 | 8101 | F600 | 0011 |
| 0000177360 | 1F00 | 0100 | 8201 | 8E00 | 0005 | 1500 | 0200 | 8201 |
| 0000177400 | 1500 | 0012 | 0F00 | 0100 | 8301 | A300 | 0005 | 1600 |
| 0000177420 | 0200 | 8301 | 2400 | 0012 | 1000 | 0100 | 8401 | B900 |
| 0000177440 | 0005 | 1600 | 0200 | 8401 | 3400 | 0012 | 1000 | 0600 |
| 0000177460 | 0001 | 5300 | 0095 | 4700 | 4E00 | 3042 | E032 | 009A |
| 0000177500 | 0000 | | | | | | | |
| 0000177501 | | | | | | | | |

THU MAR 14 17:48:06 1991 TM.EXE PAGE 1, LINE 1

| | | | | | | | | |
|---|---|---|---|---|---|---|---|---|
| 0000000000 | 5A4D | 017E | 003A | 0000 | 0004 | 0000 | FFFF | 0000 |
| 0000000020 | 00B6 | 0000 | 0000 | 0000 | 0040 | 0000 | 0000 | 0000 |
| 0000000040 | 0000 | 000C | 0000 | 0000 | 0000 | 0000 | 0000 | 0000 |
| 0000000060 | 0000 | 0000 | 0000 | 0000 | 0000 | 0000 | 0080 | 0000 |
| 0000000100 | 1F0E | 0EBA | B400 | CD09 | B821 | 4C01 | 21CD | 6854 |
| 0000000120 | 7369 | 7020 | 6F72 | 7267 | 6D61 | 6320 | 6E61 | 6F6E |
| 0000000140 | 2074 | 7572 | 206E | 6E69 | 4420 | 534F | 6D20 | 646F |
| 0000000160 | 2E65 | 0D0D | 240A | 0000 | 0000 | 0000 | 0000 | 0000 |
| 0000000200 | 454E | 0A05 | 0174 | 0007 | A9B8 | 34CF | 0302 | 0005 |
| 0000000220 | 4000 | 6000 | 0010 | 0001 | 0000 | 0005 | 0005 | 0010 |
| 0000000240 | 002D | 0040 | 0068 | 0068 | 0080 | 00A0 | 01FB | 0000 |
| 0000000260 | 0000 | 0004 | 0000 | 0001 | 0000 | 0000 | 0000 | 0000 |
| 0000000300 | 0023 | 5EA6 | 0D00 | 5EA6 | 0651 | 00C6 | 0C01 | 0100 |
| 0000000320 | 0000 | 0000 | 0C01 | 0850 | 0000 | 0000 | 0C01 | 020A |
| 0000000340 | 065E | 0D74 | 0D01 | 0DB0 | 5402 | 004D | 0F00 | 4D54 |
| 0000000360 | 435F | 5F4D | 4157 | 5449 | 485F | 4F4F | 014B | 0000 |
| 0000000400 | 0001 | 0004 | 0007 | 000F | 0015 | 001B | 001E | 0021 |
| 0000000420 | 0024 | 002B | 0032 | 0039 | 003F | 00BC | 00C5 | 00CE |
| 0000000440 | 0200 | 4849 | 5502 | 0749 | 6574 | 7473 | 6977 | 056E |
| 0000000460 | 4244 | 505F | 0549 | 6573 | 7574 | 0270 | 5250 | 5202 |
| 0000000500 | 0256 | 4C46 | 6306 | 7672 | 695F | 0666 | 7374 | 5F6C |
| 0000000520 | 6669 | 7406 | 6C73 | 6E69 | 0574 | 454D | 4944 | 0654 |
| 0000000540 | 626C | 7069 | 746D | 5F0D | 5842 | 445F | 4245 | 4755 |
| 0000000560 | 4F4D | 4544 | 5F0D | 5842 | 545F | 4D49 | 5345 | 4F4D |
| 0000000600 | 4544 | 5F0E | 5842 | 445F | 4245 | 4755 | 4E45 | 4554 |
| 0000000620 | 0F52 | 425F | 5F58 | 4544 | 5542 | 5247 | 5445 | 5255 |
| 0000000640 | 0E4E | 425F | 5F58 | 4F56 | 4449 | 4552 | 5554 | 4E52 |
| 0000000660 | 5F0B | 5842 | 505F | 4F52 | 4543 | 5353 | 5F10 | 5842 |
| 0000000700 | 545F | 5248 | 4145 | 5F44 | 5453 | 5241 | 0E54 | 425F |
| 0000000720 | 5F58 | 4150 | 4B43 | 4946 | 544C | 5245 | 4408 | 534F |
| 0000000740 | 4143 | 4C4C | 0853 | 414E | 504D | 5049 | 5345 | 5005 |
| 0000000760 | 574D | 4E49 | 0101 | 9001 | 0045 | 2900 | 6554 | 7473 |
| 0000001000 | 6E69 | 3167 | 3332 | 5420 | 7365 | 2074 | 614D | 616E |
| 0000001020 | 6567 | 2072 | 4328 | 2029 | 654D | 6372 | 7275 | 2C79 |
| 0000001040 | 3120 | 3939 | 0030 | 0000 | 0000 | 0000 | 0000 | 0000 |
| 0000001060 | 0000 | 0000 | 0000 | 0000 | 0000 | 0000 | 0000 | 0000 |
| 0000001100 | A3FC | 0044 | 1E89 | 0042 | 8949 | 4E0E | BB00 | 0050 |
| 0000001120 | 1F8C | E483 | 89FE | 0467 | FEB8 | 50FF | 6789 | F70A |
| 0000001140 | 50D0 | 6789 | 8906 | 0867 | 2689 | 0046 | 681E | 0048 |
| 0000001160 | 681E | 004C | FF9A | 00FF | 8E00 | 4806 | 2600 | 15A1 |
| 0000001200 | A300 | 0086 | 46E8 | 9A00 | 02E0 | FFFF | 689A | 5A04 |
| 0000001220 | 9A00 | 00EA | 005F | 36FF | 0294 | 36FF | 0292 | 36FF |
| 0000001240 | 0290 | 36FF | 028E | 36FF | 028C | DC9A | 6427 | 5000 |
| 0000001260 | E80E | 00FE | FFB8 | 8EFF | B8D8 | 0003 | 0E50 | 03E8 |
| 0000001300 | 0E02 | A7E8 | B804 | 00FF | DE50 | ECE8 | BB00 | 000D |
| 0000001320 | FF33 | 068E | 0044 | FFB9 | 267F | 3D80 | 7500 | 4701 |
| 0000001340 | 8026 | 003D | 3174 | 64BE | 8B00 | 8BD1 | F3CB | 8BA6 |
| 0000001360 | 74CA | 3308 | F2C0 | 74AE | EBE7 | 061C | 071E | F78B |
| 0000001400 | BF1F | 008C | 2CAC | 7241 | C00E | 04E0 | AC92 | 412C |
| 0000001420 | 0572 | C20A | EBAA | 16ED | C31F | 286A | FF9A | 00FF |
| 0000001440 | BB00 | 0002 | 8B52 | 80D4 | 8CA7 | B700 | 8B50 | 53C4 |
| 0000001460 | 5016 | 5216 | FF9A | 00FF | 0B00 | 58C0 | 1075 | 40B1 |
| 0000001500 | 013C | 0674 | 023C | 0675 | 08B1 | 8F08 | 008C | 794B |
| 0000001520 | 5AD6 | C033 | 5050 | DC8B | BA50 | 0084 | 520E | 5316 |
| 0000001540 | FF9A | 00FF | 5800 | E858 | 0013 | F0BE | BF0B | 0BF0 |
| 0000001560 | 3DE8 | BE01 | 0BF0 | F0BF | E80B | 0134 | 8BCB | E60E |
| 0000001600 | E30B | 8B2E | 4436 | C400 | E806 | 8C0B | 33C2 | FFDB |
| 0000001620 | E41E | 730B | E903 | 014E | 068E | 004C | 8B26 | 061E |
| 0000001640 | 4B00 | 0D75 | 06C4 | 0BEC | C28C | 03BB | FF00 | E41E |

THU MAR 14 17:48:06 1991 TM.EXE PAGE 2, LINE 60

| | | | | | | | | |
|---|---|---|---|---|---|---|---|---|
| 0000001660 | C30B | 8B55 | 33EC | EBC9 | 551A | EC8B | 01B9 | EB00 |
| 0000001700 | 5512 | EC8B | 5756 | 00B9 | EB01 | 5508 | EC8B | 5756 |
| 0000001720 | 01B9 | E801 | 005F | 0A51 | 75C9 | BE12 | 0DAC | ACBF |
| 0000001740 | E80D | 00CC | F0BE | BF0B | 0BF4 | C3E8 | BE00 | 0BF4 |
| 0000001760 | F4BF | E80B | 00BA | F4BE | BF0B | 0BF4 | B1E8 | 9A00 |
| 0000002000 | 02BC | 007D | C00B | 1174 | 0A58 | 50E4 | 0B75 | 7E83 |
| 0000002020 | 0006 | 0575 | 46C7 | FF06 | E800 | 0086 | 0A58 | 75E4 |
| 0000002040 | B80D | 0001 | 8A50 | 0646 | 9A50 | FFFF | 0000 | 4EE8 |
| 0000002060 | 5F00 | 5D5E | 55CB | EC8B | 0D6A | 8BE8 | 8306 | 02C4 |
| 0000002100 | D68E | 004C | 8B26 | 061E | 4B00 | 168B | 029C | FA83 |
| 0000002120 | 75FF | 8904 | 9C1E | 3902 | 9C1E | 9F02 | 0D6A | 8DE8 |
| 0000002140 | 8306 | 02C4 | 749E | 6A0A | E80E | 063C | C483 | EB02 |
| 0000002160 | 3BC7 | 74D3 | 6A08 | E80E | D64E | C483 | 5D02 | 55C3 |
| 0000002200 | EC8B | 0D6A | 41E8 | 8306 | 02C4 | 06C7 | 029C | FFFF |
| 0000002220 | 0D6A | 59E8 | 8306 | 02C4 | 0E6A | 51E8 | 8306 | 02C4 |
| 0000002240 | C35D | 0E8B | ?3E6 | 07E3 | 02BB | FF00 | E41E | C30B |
| 0000002260 | F73B | 0E73 | EF83 | 8B04 | 0B05 | 0245 | F274 | 1DFF |
| 0000002300 | EEEB | 00C3 | 8B55 | B8EC | 00FC | 0E50 | 9DE8 | 8302 |
| 0000002320 | A03E | 0002 | 0474 | 1EFF | 029E | FFB8 | 5000 | E80E |
| 0000002340 | 028A | E58B | CB5D | 02B8 | E900 | FDD0 | 3356 | B9F6 |
| 0000002360 | 0042 | E432 | ACFC | E032 | FBE2 | F480 | 7455 | 0E0F |
| 0000002400 | C1E8 | B8FF | 0001 | 0E50 | 61E8 | B802 | 0001 | CB5E |
| 0000002420 | 068F | 02A4 | 068F | 02A6 | 42A1 | 8E00 | 441E | 8B00 |
| 0000002440 | 4EF0 | 0674 | 7C80 | 00FF | F775 | 8936 | 9636 | 3602 |
| 0000002460 | 1E8C | 0298 | F696 | FF04 | 0175 | 3696 | 3689 | 02A2 |
| 0000002500 | D233 | 01BF | AC00 | 0A42 | 75C0 | ACFA | 203C | FB74 |
| 0000002520 | 093C | F774 | C00A | 6374 | 4E47 | 3CAC | 7420 | 3CEC |
| 0000002540 | 7409 | 0AE8 | 74C0 | 3C54 | 7422 | 3C24 | 745C | 4203 |
| 0000002560 | E8EB | C933 | AC41 | 5C3C | FA74 | 223C | 0474 | D103 |
| 0000002600 | D7EB | C18B | E9D1 | D113 | 01A8 | CE75 | 01EB | AC4E |
| 0000002620 | C00A | 2774 | 223C | C274 | 5C3C | 0374 | EB42 | 33F0 |
| 0000002640 | 41C9 | 3CAC | 745C | 3CFA | 7422 | 0304 | EBD1 | 8BDF |
| 0000002660 | D1C1 | 13E9 | A8D1 | 7501 | EBD6 | 169F | 891F | 8C3E |
| 0000002700 | 0302 | 47D7 | E7D1 | E7D1 | C78B | C203 | 2440 | E8FE |
| 0000002720 | 01D0 | 0673 | 08B8 | E900 | FCE2 | 8EA3 | 8902 | 9016 |
| 0000002740 | 8B02 | 03D8 | 8EF8 | 26C2 | 3F89 | 8C26 | 0247 | C383 |
| 0000002760 | 8B04 | A236 | 8E02 | 441E | AC00 | 0AAA | 75C0 | EBFA |
| 0000003000 | 3303 | AAC0 | 3CAC | 7420 | 3CFB | 7409 | 0AF7 | 74C0 |
| 0000003020 | 2675 | 3F89 | 8C26 | 0247 | C383 | 4E04 | 3CAC | 7420 |
| 0000003040 | 3CE0 | 7409 | 0ADC | 74C0 | 3C5A | 7422 | 3C27 | 745C |
| 0000003060 | AA03 | E8EB | C933 | AC41 | 5C3C | FA74 | 223C | 0674 |
| 0000003100 | 5CB0 | AAF3 | D5EB | 5CB0 | E9D1 | AAF3 | 0673 | 22B0 |
| 0000003120 | EBAA | 4EC9 | 0AAC | 74C0 | 3C2A | 7422 | 3CBF | 745C |
| 0000003140 | AA03 | F0EB | C933 | AC41 | 5C3C | FA74 | 223C | 0674 |
| 0000003160 | 5CB0 | AAF3 | DDEB | 5CB0 | E9D1 | AAF3 | 9E73 | 22B0 |
| 0000003200 | EBAA | 33D1 | AAC0 | C726 | 0007 | 2600 | 47C7 | 0002 |
| 0000003220 | 1600 | FF1F | A42E | 0002 | 8B55 | 83EC | 08EC | 8E1E |
| 0000003240 | 4406 | 8C00 | FC46 | 5E8C | 33FE | 33C0 | 33F6 | B9FF |
| 0000003260 | FFFF | 3A26 | 7405 | F206 | 46AE | 75AE | 8BFA | 40C7 |
| 0000003300 | FE24 | 8B46 | D1FE | D1E6 | E8E6 | 00D6 | 1772 | 5689 |
| 0000003320 | 50F8 | C68B | CBE8 | 7200 | A30C | 0292 | 1689 | 0294 |
| 0000003340 | 5689 | EBFA | B806 | 0009 | D1E9 | 8BFB | 8BCF | 33D8 |
| 0000003360 | 5FF6 | 1E06 | 1F07 | E349 | 8B35 | 8E04 | FE46 | 3B26 |
| 0000003400 | 6406 | 7500 | 510E | 5756 | 64BF | B900 | 0006 | A7F3 |
| 0000003420 | 5E5F | 8E59 | F846 | 0B74 | 5E8E | 89FA | 8C3F | 0247 |
| 0000003440 | C383 | 8E04 | FC5E | AAAC | C00A | FA75 | CBE2 | 5E8E |
| 0000003460 | 89FA | 890F | 024F | 8B1F | 5DE5 | 00CB | 8B55 | 56EC |
| 0000003500 | B857 | 0085 | D88E | C08E | 568B | BE06 | 0C12 | 3BAD |
| 0000003520 | 74C2 | 4010 | 7496 | 970C | C033 | FFB9 | F2FF | 8BAE |

THU MAR 14 17:48:06 1991 TM.EXE PAGE 3, LINE 119

| | | | | | | | | |
|---|---|---|---|---|---|---|---|---|
| 0000003540 | EBF7 | 96EB | 5E5F | E58B | CA5D | 0002 | 8B55 | 57EC |
| 0000003560 | 76FF | 0E06 | C5E8 | 0BFF | 74C0 | 921F | FA8B | C033 |
| 0000003600 | FFB9 | F2FF | F7AE | 49D1 | 8B50 | BBC4 | 0002 | 1E53 |
| 0000003620 | 5152 | 5016 | FF9A | 00FF | 5B00 | 8B5F | 5DE5 | 02CA |
| 0000003640 | 0000 | 8B55 | 06EC | 00B9 | 8704 | B60E | 5102 | 9A50 |
| 0000003660 | 0594 | 01D2 | 8F5B | B606 | 8B02 | 0BCA | 75C8 | F901 |
| 0000003700 | 5D07 | 00C3 | B1EA | 8205 | EA05 | 05D0 | 0597 | 8B55 |
| 0000003720 | 56EC | 76C4 | 8C06 | E3C1 | 2605 | 4C80 | 01FE | 5D5E |
| 0000003740 | 55CB | EC8B | 096A | DFE8 | 8302 | 02C4 | 76FF | 0E06 |
| 0000003760 | 0DE8 | 5B00 | 096A | F5E8 | 8302 | 02C4 | E58B | CB5D |
| 0000004000 | 8B55 | 56EC | 8B57 | 064E | F983 | 77E8 | 1E69 | AAA1 |
| 0000004020 | 0B02 | 74C0 | BF48 | 06B8 | 368B | 02B2 | 1EC5 | 02AC |
| 0000004040 | 561E | FF57 | 5FD7 | 735E | 8C2B | C5DA | 0C5F | D63B |
| 0000004060 | EF75 | 1F58 | C41E | AC36 | 2602 | 748B | C512 | A81E |
| 0000004100 | 8C02 | 3BDA | 75D0 | 1FD9 | 811E | 34FF | 7407 | BF0E |
| 0000004120 | 0734 | C4EB | 815E | B8FF | 7406 | EB0F | 070A | BF05 |
| 0000004140 | 02A8 | E1E8 | 7201 | E80E | 007E | 891F | AE16 | 8902 |
| 0000004160 | AC1E | EB02 | 1F04 | C033 | 5F99 | 5D5E | 00CB | 5706 |
| 0000004200 | F88B | FB03 | 7F89 | 4F04 | 2D4F | 0016 | 778D | C714 |
| 0000004220 | FE05 | 89FF | 0A7F | 8948 | 8C04 | 8B1F | 8CC6 | 8EDA |
| 0000004240 | 8DC2 | 067F | ABFC | 47AB | 3347 | ABC0 | ABAB | 5FAB |
| 0000004260 | C307 | 8B26 | 0245 | C00B | 0975 | 8C26 | 025D | 8926 |
| 0000004300 | EB1D | 0614 | C426 | 0875 | 8C26 | 0E5C | 8926 | 0C5C |
| 0000004320 | 478C | 8912 | 1077 | 2607 | 5D8C | 260A | 5D89 | 2608 |
| 0000004340 | 5D8C | 2606 | 5D89 | C304 | 8041 | FEE1 | FC53 | 778B |
| 0000004360 | 8B08 | 0A5F | FF33 | 23EB | C38B | A85B | 7501 | 5342 |
| 0000004400 | 778B | 8B06 | 085F | DE3B | 3674 | 334B | EBFF | 900C |
| 0000004420 | 548D | 3BFE | 73D3 | 03E1 | 72F0 | AD23 | 01A8 | F074 |
| 0000004440 | FE8B | 3B48 | 73C1 | 0323 | 72F0 | 8B13 | ADD0 | 01A8 |
| 0000004460 | DE74 | C203 | 0205 | 8B00 | 89F7 | FE44 | E4EB | C08B |
| 0000004500 | 8B5B | 0647 | 4789 | F908 | 19EB | 895B | FE4C | 0974 |
| 0000004520 | F903 | C12B | 8948 | 2B05 | 03F9 | 89F9 | 087F | C68B |
| 0000004540 | DA8C | C3F8 | 5751 | 47F6 | 0102 | 6674 | B7E8 | 8B00 |
| 0000004560 | 8BFE | A804 | 7401 | 2B03 | 49C8 | 4141 | 778B | 0B04 |
| 0000004600 | 74F6 | 034F | 73CE | 3309 | BAC0 | FFF0 | 33E3 | 42EB |
| 0000004620 | 12B8 | 8E05 | 26C0 | B6A1 | 3D02 | 2000 | 1674 | 00BA |
| 0000004640 | 3B80 | 72D0 | D106 | 75EA | EBF8 | 8322 | 08FA | 1D72 |
| 0000004660 | E2D1 | C28B | 8B48 | 03D0 | 73C1 | 3302 | F7C0 | 23D2 |
| 0000004700 | 52C2 | 2EE8 | 5A00 | 0D73 | FA83 | 74F0 | B805 | 0010 |
| 0000004720 | E2EB | EBF9 | 8B1B | 2BD0 | 0457 | 4789 | 8904 | 087F |
| 0000004740 | 778B | 4A0A | 1489 | 0342 | C7F2 | FE04 | 89FF | 0A77 |
| 0000004760 | 595F | 8BC3 | F6D0 | 0247 | 7404 | 4A0F | 778B | 4E04 |
| 0000005000 | D63B | 0572 | 5739 | 73FE | 4218 | 1E50 | FF9A | 00FF |
| 0000005020 | 0B00 | 75C0 | 8B0F | F6C2 | 0247 | 7404 | 4A04 | 5789 |
| 0000005040 | F8FE | 01EB | C3F9 | 8B57 | 0877 | 773B | 750A | 8B03 |
| 0000005060 | 0677 | 3DAD | FFFE | 0874 | FE8B | FE24 | F003 | F2EB |
| 0000005100 | 4F4F | F78B | C35F | D18B | C283 | 8027 | F0E2 | 8B50 |
| 0000005120 | 52C4 | 5016 | C033 | 9A50 | FFFF | 0000 | 0B1F | 75C0 |
| 0000005140 | 3314 | 26DB | 458B | 890C | 0247 | C28B | 0FE8 | E8FE |
| 0000005160 | FE40 | EBF8 | F901 | 00C3 | 8B55 | 50EC | 468B | 0504 |
| 0000005200 | 0014 | 4BEB | 8B55 | 50EC | 468B | 0504 | 0014 | 65EB |
| 0000005220 | 8B55 | 50EC | 468B | 0504 | 0114 | 33EB | 8B55 | 50EC |
| 0000005240 | 468B | 0504 | 0114 | 4DEB | 8B55 | 50EC | 468B | C104 |
| 0000005260 | 02E0 | FF68 | 50FF | FF6A | FF6A | FF9A | 00FF | 0B00 |
| 0000005300 | 75C0 | 5825 | E58B | C35D | 8B55 | 50EC | 468B | C104 |
| 0000005320 | 02E0 | 8368 | 5008 | FF6A | FF6A | FF9A | 00FF | 0B00 |
| 0000005340 | 75C0 | 5805 | E58B | C35D | 11B8 | E900 | F7CE | 8B55 |
| 0000005360 | 50EC | 468B | C104 | 02E0 | A368 | 5008 | FF9A | 00FF |
| 0000005400 | 0B00 | 75C0 | 58E3 | E58B | C35D | 8B55 | FFEC | 0676 |

THU MAR 14 17:48:06 1991 TM.EXE PAGE 4, LINE 178

| | | | | | | | | |
|---|---|---|---|---|---|---|---|---|
| 0000005420 | B5E8 | 83FF | 02C4 | E58B | CB5D | 8B55 | FFEC | 0676 |
| 0000005440 | CBE8 | 83FF | 02C4 | E58B | CB5D | 9EEA | 9005 | EA5E |
| 0000005460 | 059E | 08FD | 8B55 | 8BEC | 8BD7 | 1EDE | 7EC4 | 3306 |
| 0000005500 | B9C0 | FFFF | AEF2 | 758D | C4FF | 0A7E | FFB9 | F2FF |
| 0000005520 | F7AE | 2BD1 | 8CF9 | 8EC0 | 8ED8 | 0846 | FE87 | 468B |
| 0000005540 | F706 | 01C6 | 7400 | A402 | D149 | F3E9 | 13A5 | F3C9 |
| 0000005560 | 8BA4 | 8BF3 | 1FFA | C28C | CB5D | 8B55 | 8BEC | 8BD7 |
| 0000005600 | 1EDE | 76C5 | 8B0A | 8CFE | 8ED8 | 33C0 | B9C0 | FFFF |
| 0000005620 | AEF2 | D1F7 | 7EC4 | 8B06 | A8C7 | 7401 | A402 | D149 |
| 0000005640 | F3E9 | 13A5 | F3C9 | 8BA4 | 8BF3 | 1FFA | C28C | CB5D |
| 0000005660 | 8B55 | 8BEC | 8BD7 | 1EDE | 76C5 | C406 | 0A7E | C033 |
| 0000005700 | FFB9 | F2FF | F7AE | 2BD1 | F3F9 | 74A6 | 1B05 | 1DC0 |
| 0000005720 | FFFF | 8B1F | 8BF3 | 5DFA | 00CB | 8B55 | 8BEC | C4D7 |
| 0000005740 | 067E | C033 | FFB9 | F2FF | F7AE | 49D1 | 8B91 | 5DFA |
| 0000005760 | 00CB | 04C8 | 0000 | A156 | 0292 | 168B | 0294 | 4689 |
| 0000006000 | 89FC | FE56 | 0C6A | BFE8 | 83FE | 02C4 | 468B | 0BFE |
| 0000006020 | FC46 | 7674 | 468B | 0B08 | 0646 | 6E74 | 76FF | FF08 |
| 0000006040 | 0676 | AA9A | 1209 | 830A | 04C4 | F08B | 5EC4 | 26FC |
| 0000006060 | 478B | 2602 | 070B | 5274 | FF26 | 0277 | FF26 | 9A37 |
| 0000006100 | 09AA | 0A33 | C483 | 3B04 | 7EC6 | C439 | FC5E | C426 |
| 0000006120 | 261F | 3880 | 753D | 562D | 76FF | FF08 | 0676 | 5306 |
| 0000006140 | 389A | 0214 | 8309 | 0AC4 | C00B | 1875 | 0C6A | 7DE8 |
| 0000006160 | 83FE | 02C4 | 5EC4 | 26FC | 078B | 8B26 | 0257 | C603 |
| 0000006200 | EB40 | 9012 | 4683 | 04FC | A2EB | 0C6A | 5FE8 | 83FE |
| 0000006220 | 02C4 | C02B | 5E99 | CBC9 | 8B55 | 1EEC | 8B07 | 0E4E |
| 0000006240 | C90B | 3174 | C1F6 | 7501 | 8B2C | 0C56 | 468B | 8B0A |
| 0000006260 | 0BD8 | 75DA | 5112 | 949A | F505 | 5909 | D88B | DA0B |
| 0000006300 | 1374 | D88B | EB43 | 0B0A | 74D2 | A80A | 7501 | 8B06 |
| 0000006320 | 03D8 | 73C1 | BA08 | 0016 | C033 | 37E9 | 6A03 | 8BFF |
| 0000006340 | 52CC | 5653 | 0E57 | ED68 | 160A | 5251 | 8B50 | 084E |
| 0000006360 | 568B | 8B06 | 1276 | 7E8B | 9A10 | FFFF | 0000 | 5E5F |
| 0000006400 | C00B | 1374 | F65B | 01C3 | 0A74 | 534B | FA9A | 8908 |
| 0000006420 | 830A | 04C4 | 16E9 | 8303 | 04C4 | 5D58 | 56CB | 0E57 |
| 0000006440 | 4968 | 510B | E852 | 097C | 8E93 | 26C2 | 578B | 0B22 |
| 0000006460 | 74D2 | 5015 | 0653 | 2652 | 77FF | 9A20 | 08FA | 0ADF |
| 0000006500 | C483 | 0704 | 585B | D233 | 8926 | 2617 | 5789 | 2602 |
| 0000006520 | 5789 | 2608 | 5789 | 260A | 5789 | 2620 | 5789 | A822 |
| 0000006540 | 7401 | 4809 | 8C26 | 2257 | 8926 | 2047 | 0005 | 2602 |
| 0000006560 | 4789 | 3304 | E8ED | F605 | 55CB | EC8B | 23E8 | E8F7 |
| 0000006600 | 0922 | D88B | C28E | C033 | 8926 | 2607 | 4789 | 2602 |
| 0000006620 | 4789 | 2608 | 4789 | 260A | 47C7 | 0004 | 6A02 | 6A00 |
| 0000006640 | 9A00 | 01FA | 0000 | 04C8 | 0000 | 5657 | 126A | 17E8 |
| 0000006660 | 83FD | 02C4 | C6C6 | 0DAA | 8B42 | 0646 | 568B | A308 |
| 0000006700 | 0DA6 | 1689 | 0DA8 | A0BE | 890D | 8904 | 0254 | 06C7 |
| 0000006720 | 0DA4 | 7FFF | 468D | 160E | FF50 | 0C76 | 76FF | 1E0A |
| 0000006740 | 9A56 | 0F4E | 0BD7 | C483 | 8B0C | FFF8 | A40E | 780D |
| 0000006760 | C40F | A01E | FF0D | A006 | 260D | 07C6 | EB00 | 900D |
| 0000007000 | 561E | 006A | 589A | 0E0E | 830B | 06C4 | 126A | DDE8 |
| 0000007020 | 83FC | 02C4 | C78B | 5F5E | CBC9 | 8B55 | 57EC | 7EC4 |
| 0000007040 | 3306 | B9C0 | FFFF | AEF2 | F741 | 4FD9 | 468A | FD0A |
| 0000007060 | AEF2 | 2647 | 0538 | 0674 | C033 | D08B | 04EB | C78B |
| 0000007100 | C28C | 5FFC | E58B | CB5D | 581E | 4590 | 8B55 | 1EEC |
| 0000007120 | D88E | EC83 | 1E18 | 2668 | 9A07 | 09C2 | 0C48 | C483 |
| 0000007140 | 8904 | EE46 | 5689 | 8BF0 | 0846 | 460B | 7506 | 6A1F |
| 0000007160 | 5200 | 76FF | 9AEE | 1A50 | 0C9A | C483 | 0B06 | 75C0 |
| 0000007200 | B807 | 0001 | 9FE9 | 9000 | C02B | 99E9 | 9000 | 46C7 |
| 0000007220 | 2EF2 | 8C07 | F45E | 468B | 8B06 | 0856 | 4689 | 89F6 |
| 0000007240 | F856 | C02B | 4689 | 89FC | FA46 | 468B | 0BF0 | EE46 |
| 0000007260 | 4674 | 36FF | 0294 | 36FF | 0292 | 468D | 16EE | FF50 |

THU MAR 14 17:48:06 1991 TM.EXE PAGE 5, LINE 237

| | | | | | | | | |
|---|---|---|---|---|---|---|---|---|
| 0000007300 | F076 | 76FF | 6AEE | 9A00 | 1650 | 0CA8 | C483 | 890E |
| 0000007320 | EC46 | 7540 | 9A1E | 0E4C | 0CB7 | C28E | D88B | 8326 |
| 0000007340 | 023F | 1474 | 4C9A | F40E | 8E0C | 8BC2 | 26D8 | 3F83 |
| 0000007360 | 740D | 8B05 | EC46 | 2EEB | 3E80 | 0088 | 7400 | C707 |
| 0000007400 | EE46 | 0731 | 05EB | 46C7 | 39EE | 8C07 | F05E | 36FF |
| 0000007420 | 0294 | 36FF | 0292 | 468D | 16EE | 1E50 | 76FF | 6AEE |
| 0000007440 | 9A00 | 1882 | 0BB4 | 4D4D | E58B | 5D1F | CB4D | 8B55 |
| 0000007460 | 57EC | 5356 | FF33 | 468B | 0B08 | 7DC0 | 4711 | 568B |
| 0000007500 | F706 | F7D8 | 1DDA | 0000 | 4689 | 8908 | 0656 | 468B |
| 0000007520 | 0B0C | 7DC0 | 4711 | 568B | F70A | F7D8 | 1DDA | 0000 |
| 0000007540 | 4689 | 890C | 0A56 | C00B | 1575 | 4E8B | 8B0A | 0846 |
| 0000007560 | D233 | F1F7 | D88B | 468B | F706 | 8BF1 | EBD3 | 8B38 |
| 0000007600 | 8BD8 | 0A4E | 568B | 8B08 | 0646 | EBD1 | D9D1 | EAD1 |
| 0000007620 | D8D1 | DB0B | F475 | F1F7 | F08B | 66F7 | 910C | 468B |
| 0000007640 | F70A | 03E6 | 72D1 | 3B0C | 0856 | 0777 | 0672 | 463B |
| 0000007660 | 7606 | 4E01 | D233 | 4F96 | 0775 | DAF7 | D8F7 | DA83 |
| 0000007700 | 5B00 | 5F5E | CA5D | 0008 | 1601 | 0202 | 0203 | 1804 |
| 0000007720 | 0D05 | 0906 | 0C07 | 0C08 | 0C09 | 070A | 080B | 160C |
| 0000007740 | 160D | 020F | 0D10 | 1211 | 0212 | 0235 | 0D41 | 0243 |
| 0000007760 | 0D52 | 0D53 | 0D57 | 0B59 | 0D6C | 206D | 1C70 | 0972 |
| 0000010000 | 1606 | 0A80 | 0A81 | 0982 | 0D84 | 0BA4 | 02CE | 0BD7 |
| 0000010020 | 0D00 | 1608 | 8B52 | E8D8 | 068A | 8E93 | 5AC2 | 8926 |
| 0000010040 | 0247 | 8926 | B817 | FFFF | 8B99 | 5DE5 | E8CB | 0008 |
| 0000010060 | FFB8 | 99FF | E58B | CB5D | D88B | 67E8 | 9306 | C28E |
| 0000010100 | 8926 | 0247 | BB53 | 0D98 | 24B9 | 0A00 | 75E4 | 2E1B |
| 0000010120 | 073A | 1674 | 4343 | F7E2 | 133C | 0472 | 243C | 0A76 |
| 0000010140 | 3C43 | 72BC | 3C04 | 76CA | 4301 | 8A2E | 0147 | 5B98 |
| 0000010160 | 8926 | C307 | 8B55 | BBEC | 0002 | 05EB | 8B55 | 33EC |
| 0000010200 | E8DB | 0620 | C303 | CB5D | 8B55 | 56EC | 8B57 | 0876 |
| 0000010220 | 448A | A80A | 7482 | A864 | 7540 | C760 | 0444 | 0000 |
| 0000010240 | 01A8 | 0B74 | 10A8 | 5374 | 4C8B | 8906 | 240C | 0CFE |
| 0000010260 | 2402 | 88EF | 0A44 | FE8B | EF81 | 07F4 | C781 | 09D4 |
| 0000010300 | DB33 | 5C8A | A80B | 7508 | A84B | 7504 | F618 | 0105 |
| 0000010320 | 4275 | FE81 | 0800 | 0674 | FE81 | 080C | 2675 | 87F6 |
| 0000010340 | 008C | 7440 | B91F | 0001 | 1651 | 7E8D | 5706 | 0E53 |
| 0000010360 | C9E8 | 830C | 08C4 | 01B9 | EB00 | B846 | FFFF | 4C80 |
| 0000010400 | 200A | 65EB | 1E53 | E856 | 0BE4 | C483 | 5B04 | 44F6 |
| 0000010420 | 080A | D174 | 0C8B | 548B | 2B06 | 42CA | 1489 | 558B |
| 0000010440 | 4A02 | 5489 | E304 | 5125 | FF51 | 0874 | 74FF | 5306 |
| 0000010460 | E80E | 0C88 | C483 | 5908 | 7CC4 | 8B06 | 0656 | 8826 |
| 0000010500 | 3B15 | 75C1 | 33B6 | 8AC0 | 0646 | 1DEB | C033 | 87F6 |
| 0000010520 | 008C | 7420 | B9E3 | 0002 | 5051 | 5350 | E80E | 0BE4 |
| 0000010540 | C483 | 3308 | 8BC0 | EBC8 | 5FCF | 5D5E | 00CB | 0FA6 |
| 0000010560 | 0FB1 | 0FC7 | 0FFB | 1027 | 102F | 1058 | 108A | 8B55 |
| 0000010600 | B8EC | 0171 | E80E | 0B34 | 5756 | C033 | 4689 | 88F8 |
| 0000010620 | FB46 | 76C4 | 260A | 89AC | 0A76 | 4688 | 0AFE | 74C0 |
| 0000010640 | 8306 | F87E | 7D00 | 8B06 | F846 | B5E9 | BB04 | 0746 |
| 0000010660 | 202C | 583C | 0577 | 24D7 | EB0F | B002 | B100 | D203 |
| 0000010700 | 02E0 | FB46 | FED7 | D2C1 | 88E8 | FB46 | 8B98 | D1D8 |
| 0000010720 | 2EE3 | A7FF | 0F3E | 568A | B9FE | 0001 | 36E8 | EB04 |
| 0000010740 | 33B1 | 89C0 | F046 | 4689 | 89F6 | EE46 | 46C7 | 20FC |
| 0000010760 | 4800 | 4689 | EBF4 | 8A9B | FE46 | 2D3C | 0675 | 4E80 |
| 0000011000 | 04FC | 8EEB | 2B3C | 0675 | 4E80 | 01FC | 84EB | 203C |
| 0000011020 | 0775 | 4E80 | 02FC | 79E9 | 3CFF | 7523 | 8007 | FC4E |
| 0000011040 | E980 | FF6E | 4E80 | 08FC | 67E9 | 8AFF | FE4E | F980 |
| 0000011060 | 752A | E80F | 035C | C00B | 1779 | D8F7 | 4E80 | 04FC |
| 0000011100 | 0FEB | E980 | 3230 | 8BED | F646 | DABB | F700 | 03E3 |
| 0000011120 | 89C1 | F646 | 3BE9 | C7FF | F446 | 0000 | 33E9 | 8AFF |
| 0000011140 | FE4E | F980 | 752A | E80C | 0328 | C00B | 1479 | FFB8 |

THU MAR 14 17:48:06 1991 TM.EXE PAGE 6, LINE 296

| | | | | | | | | |
|---|---|---|---|---|---|---|---|---|
| 0000011160 | EBFF | 800F | 30E9 | ED32 | 468B | BBF4 | 000A | E3F7 |
| 0000011200 | C103 | 4689 | E9F4 | FF0A | 468A | 3CFE | 756C | 8006 |
| 0000011220 | FC4E | EB10 | 3C22 | 7546 | 8006 | FC4E | EB20 | 3C18 |
| 0000011240 | 754E | 8006 | FD4E | EB10 | 3C0E | 754C | 8006 | FD4E |
| 0000011260 | EB04 | 8004 | FD4E | E908 | FED8 | 468A | 3CFE | 7564 |
| 0000011300 | E903 | 0194 | 693C | 0375 | 8DE9 | 3C01 | 7575 | E903 |
| 0000011320 | 018A | 583C | 0375 | 89E9 | 3C01 | 7578 | E903 | 0188 |
| 0000011340 | 6F3C | 0375 | A2E9 | 3C01 | 7463 | 3C1A | 7473 | 3C27 |
| 0000011360 | 746E | 3C51 | 7470 | 3C60 | 7445 | 3C07 | 7447 | E903 |
| 0000011400 | 00BB | B5E9 | E800 | 028A | BE8D | FE8F | 0716 | 4FAA |
| 0000011420 | 01B9 | E900 | 01F1 | 90E8 | 0B02 | 75FF | 8C12 | 0BC0 |
| 0000011440 | 75C0 | 1E0C | BF07 | 079F | 0E8B | 07A5 | D8E9 | 5701 |
| 0000011460 | 4E8B | E3F4 | 3207 | F2C0 | 75AE | 4F01 | 2B59 | 87F9 |
| 0000011500 | E9CF | 01C3 | 62E8 | 8B02 | F846 | F6AB | FC46 | 7410 |
| 0000011520 | 3303 | ABC0 | 3BE9 | F6FE | FC46 | 7530 | E805 | 0232 |
| 0000011540 | 39EB | 36E8 | F602 | FD46 | 7518 | C630 | FF46 | B907 |
| 0000011560 | 0010 | 0716 | 3352 | 8DD2 | 97BE | BEFE | 0004 | B0E8 |
| 0000011600 | B902 | 0010 | BE8D | FE92 | 3358 | BED2 | 0004 | A0E8 |
| 0000011620 | C602 | 9386 | 3AFE | 09B9 | EB00 | C618 | FF46 | B907 |
| 0000011640 | 0010 | 0716 | D233 | BE8D | FE92 | 04BE | E800 | 0281 |
| 0000011660 | 04B9 | 8D00 | 8FBE | E9FE | 014D | 46FF | 80EE | FC4E |
| 0000011700 | 8A40 | FE46 | 200C | 8B98 | 83F0 | F47E | 7F00 | 7413 |
| 0000011720 | C707 | F446 | 0006 | 0AEB | 673D | 7500 | C705 | F446 |
| 0000011740 | 0001 | BE8D | FE8F | 76FF | FFEE | F476 | 1656 | FF57 |
| 0000011760 | 1076 | 76FF | F60E | FD46 | 7404 | FF0A | CC1E | 830B |
| 0000012000 | 0E46 | EB0A | FF08 | B81E | 830B | 0E46 | 8308 | 0EC4 |
| 0000012020 | 46F6 | 80FC | 0F74 | 7E83 | 00F4 | 0975 | 5716 | 1EFF |
| 0000012040 | 0BC4 | C483 | 8304 | 67FE | 1075 | 46F7 | 80FC | 7500 |
| 0000012060 | 1609 | FF57 | BC1E | 830B | 04C4 | 0716 | 8026 | 2D3D |
| 0000012100 | 0575 | 8047 | FD4E | B901 | FFFF | B057 | F200 | 4FAE |
| 0000012120 | 2B59 | 87F9 | E9CF | 00AF | 4E80 | 40FC | 46C6 | 0AFA |
| 0000012140 | 35EB | 46C6 | 07FF | 04EB | 46C6 | 27FF | 46F6 | 80FC |
| 0000012160 | 1174 | 46C7 | 02F0 | C600 | F246 | B230 | 0251 | FF56 |
| 0000012200 | 5688 | C6F3 | FA46 | EB10 | F60E | FC46 | 7480 | 8004 |
| 0000012220 | FD4E | C602 | FA46 | F608 | FC46 | 7410 | E805 | 00FB |
| 0000012240 | 0EEB | EDE8 | F600 | FC46 | 7440 | 9903 | 02EB | D233 |
| 0000012260 | 46F6 | 40FC | 0F74 | D20B | 0B7D | 4E80 | 01FD | D8F7 |
| 0000012300 | D283 | F700 | 83DA | F47E | 7D00 | C707 | F446 | 0001 |
| 0000012320 | 04EB | 6680 | F7FC | D88B | DA0B | 0575 | 46C7 | 00F0 |
| 0000012340 | 8D00 | EB7E | 0716 | 4E8A | 32FA | 8BED | F476 | 40E8 |
| 0000012360 | F601 | FD46 | 7402 | E30E | 2606 | 3D80 | 7430 | 4F06 |
| 0000012400 | C626 | 3005 | EB41 | F600 | FC46 | 7440 | F631 | FD46 |
| 0000012420 | 7401 | C60B | F246 | C72D | F046 | 0001 | 20EB | 46F6 |
| 0000012440 | 01FC | 0B74 | 46C6 | 2BF2 | 46C7 | 01F0 | EB00 | F60F |
| 0000012460 | FC46 | 7402 | C609 | F246 | C720 | F046 | 0001 | 468B |
| 0000012500 | 2BF6 | 2BC1 | F046 | 027D | C033 | 5706 | F651 | FC46 |
| 0000012520 | 750C | 8B07 | B2C8 | E820 | 00BB | 1650 | 8D07 | F27E |
| 0000012540 | 4E8B | E8F0 | 0091 | F658 | FC46 | 7408 | F60D | FC46 |
| 0000012560 | 7504 | 8B07 | B2C8 | E830 | 009B | 5F59 | 5007 | 76E8 |
| 0000012600 | 5800 | 46F6 | 04FC | 0774 | C88B | 20B2 | 86E8 | E900 |
| 0000012620 | FC00 | 76C4 | 260E | 89AD | 0E76 | C4C3 | 0E76 | AD26 |
| 0000012640 | D08B | AD26 | 8992 | 0E76 | F6C3 | FC46 | 7420 | E808 |
| 0000012660 | FFE9 | C28E | F88B | E8C3 | FFD8 | F88B | C00B | 0375 |
| 0000012700 | C08E | 1EC3 | C307 | 0698 | C457 | 065E | FF26 | 044F |
| 0000012720 | 1078 | 8B26 | 263F | 07FF | 8E26 | 0247 | 33AA | 5FC0 |
| 0000012740 | C307 | 5251 | 5306 | 0E50 | 9DE8 | 83FA | 06C4 | 595A |
| 0000012760 | FF3D | 75FF | EBE8 | E3E8 | 8B1B | 01F7 | F84E | 3357 |
| 0000013000 | 26FF | E8AC | FFC0 | F80B | F7E2 | FF0B | 745F | C705 |
| 0000013020 | F846 | FFFF | E3C3 | 0119 | F84E | 3357 | 8AFF | E8C2 |

THU MAR 14 17:48:06 1991 TM.EXE PAGE 7, LINE 355

| | | | | | | | | |
|---|---|---|---|---|---|---|---|---|
| 0000013040 | FFA4 | F80B | F7E2 | FF0B | 745F | C705 | F846 | FFFF |
| 0000013060 | FDC3 | 9357 | F60B | 0A7F | DB0B | 0675 | D20B | 0275 |
| 0000013100 | 1AEB | 3392 | F7D2 | 93F1 | F1F7 | 8792 | 04D3 | 3C30 |
| 0000013120 | 7639 | 0203 | FF46 | 8BAA | 4EC2 | D8EB | 2B59 | 47CF |
| 0000013140 | C3FC | 5E5F | E58B | CB5D | 8B55 | 57EC | 1E56 | 4E8B |
| 0000013160 | E30E | 8B27 | C4D9 | 067E | F78B | C033 | AEF2 | D9F7 |
| 0000013200 | CB03 | FE8B | 76C5 | F30A | 8AA6 | FF44 | C933 | 3A26 |
| 0000013220 | FF45 | 0477 | 0474 | 4949 | D1F7 | C18B | 5E1F | 8B5F |
| 0000013240 | 5DE5 | 00CB | 068E | 004C | A126 | 0006 | 3B48 | A8D6 |
| 0000013260 | 7707 | C107 | 06E0 | FFBA | C3FF | 5357 | 6A51 | E80F |
| 0000013300 | F406 | C483 | 3B02 | A806 | 7607 | 8B60 | 05D8 | 0004 |
| 0000013320 | FC25 | 8BFF | C1C8 | 06E0 | 87BA | 5014 | 9A52 | 07DD |
| 0000013340 | 0000 | C00B | 3275 | 8B49 | 87F9 | A83E | 2B07 | 51CF |
| 0000013360 | C147 | 06E7 | E1C1 | 5705 | C28E | ABF3 | 595F | C726 |
| 0000013400 | 0445 | 0200 | C783 | E240 | 8BF5 | 6AC3 | E80F | F3DE |
| 0000013420 | C483 | 5902 | 5F5B | 9BEB | 10B8 | E900 | EB9E | 581E |
| 0000013440 | 4590 | 8B55 | 1EEC | D88E | 1AB8 | 9A00 | 1A8C | 1521 |
| 0000013460 | 46C7 | 00F8 | 8300 | 147E | 7400 | E903 | 00AC | 468B |
| 0000013500 | 8B08 | 0A56 | 4689 | 89EC | EE56 | 681E | 07AA | C29A |
| 0000013520 | 5609 | 8315 | 04C4 | 4689 | 8908 | 0A56 | 4689 | 89FA |
| 0000013540 | FC56 | D00B | 0374 | 89E9 | 8000 | 883E | 0000 | 0874 |
| 0000013560 | 46C7 | B208 | EB07 | 9006 | 46C7 | BA08 | 8C07 | 0A5E |
| 0000013600 | 0468 | 9A01 | 0594 | 1580 | C483 | 8902 | FA46 | 5689 |
| 0000013620 | 0BFC | 75D0 | B807 | FFFF | DDE9 | 9000 | 46FF | FFF8 |
| 0000013640 | FC76 | 1E50 | C668 | FF07 | 0A76 | 76FF | 9A08 | 1E94 |
| 0000013660 | 1593 | C483 | C40C | FA5E | 8026 | 003F | 2075 | 5306 |
| 0000013700 | FA9A | 9B08 | 8315 | 04C4 | 4C9A | ED0E | 8915 | E646 |
| 0000013720 | 5689 | C4E8 | E65E | C726 | 0807 | EB00 | 90B8 | C38B |
| 0000013740 | C28C | 4689 | 8908 | 0A56 | 08EB | C02B | 4689 | 89FC |
| 0000013760 | FA46 | 76FF | FFEE | EC76 | 76FF | FFFC | FA76 | 76FF |
| 0000014000 | FF0A | 0876 | 468D | 16F4 | 8D50 | F046 | 5016 | 76FF |
| 0000014020 | FF12 | 1076 | 76FF | FF0E | 0C76 | A09A | 101F | 8316 |
| 0000014040 | 1CC4 | 7540 | E903 | FF6D | 76FF | FFF6 | F476 | 76FF |
| 0000014060 | FFF2 | F076 | 76FF | FF0A | 0876 | 76FF | 9A06 | 23DA |
| 0000014100 | 1627 | C483 | 890E | EA46 | 7E83 | 00F8 | 0E74 | 76FF |
| 0000014120 | FFFC | FA76 | FA9A | 3508 | 8316 | 04C4 | 76FF | FFF2 |
| 0000014140 | F076 | FA9A | 4308 | 8316 | 04C4 | 76FF | FFF6 | F476 |
| 0000014160 | FA9A | 6008 | 8B16 | EA46 | 4D4D | E58B | 5D1F | CB4D |
| 0000014200 | 581E | 4590 | 8B55 | 1EEC | D88E | 16B8 | 9A00 | 1A8C |
| 0000014220 | 1687 | 3E80 | 0088 | 7400 | B805 | 07D5 | 03EB | DAB8 |
| 0000014240 | A307 | 07E2 | 5C6A | 468B | 8B08 | 0A56 | 4689 | 89EA |
| 0000014260 | EC56 | 5052 | EA9A | 9D0B | 8316 | 06C4 | 4689 | 89EE |
| 0000014300 | F056 | 2F6A | 76FF | FFEC | EA76 | EA9A | C20B | 8316 |
| 0000014320 | 06C4 | 4689 | 89FA | FC56 | D00B | 7E75 | 468B | 0BF0 |
| 0000014340 | EE46 | 0374 | 8FE9 | 6A00 | FF3A | EC76 | 76FF | 9AEA |
| 0000014360 | 1D76 | 16DA | C483 | 8906 | EE46 | 5689 | 0BF0 | 75D0 |
| 0000014400 | FF75 | EC76 | 76FF | 9AEA | 09AA | 16E6 | C483 | 0504 |
| 0000014420 | 0003 | 9A50 | 0594 | 1707 | C483 | 89D2 | EA46 | 5689 |
| 0000014440 | 0BEC | 75D0 | B807 | FFFF | 7EE9 | 9001 | 681E | 07DF |
| 0000014460 | 76FF | 50EC | 4A9A | 1B09 | 8317 | 08C4 | 76FF | FF0A |
| 0000014500 | 0876 | 76FF | FFEC | EA76 | 049A | 5109 | 8317 | 08C4 |
| 0000014520 | 468B | 8BEA | EC56 | 4D40 | 16EB | 468B | 0BF0 | EE46 |
| 0000014540 | 0874 | 468B | 39EE | FA46 | 0C76 | 468B | 8BFA | FC56 |
| 0000014560 | 4689 | 89EE | F056 | 2E6A | 76FF | FFF0 | EE76 | EA9A |
| 0000014600 | 6C0B | 8317 | 06C4 | 4689 | 89F6 | F856 | D00B | 3674 |
| 0000014620 | FF1E | E236 | FF07 | F876 | 9A50 | 1DA4 | 178A | C483 |
| 0000014640 | 5008 | 76FF | FF12 | 1076 | 76FF | FF0E | 0C76 | 76FF |
| 0000014660 | FFEC | EA76 | 76FF | 9A06 | 14EE | 179F | C483 | 8910 |
| 0000014700 | F446 | C6E9 | 9000 | 76FF | FFEC | EA76 | AA9A | AB09 |

THU MAR 14 17:48:06 1991 TM.EXE PAGE 8, LINE 414

| | | | | | | | | |
|---|---|---|---|---|---|---|---|---|
| 0000014720 | 8317 | 04C4 | 0505 | 5000 | 949A | CA05 | 8317 | 02C4 |
| 0000014740 | 4689 | 89EE | F056 | D00B | 0375 | 38E9 | FFFF | EC76 |
| 0000014760 | 76FF | FFEA | F076 | 9A50 | 094A | 17D8 | C483 | FF08 |
| 0000015000 | EC76 | 76FF | 9AEA | 09AA | 1812 | C483 | 0304 | EE46 |
| 0000015020 | 568B | 89F0 | F646 | 5689 | C7F8 | F446 | FFFF | 46C7 |
| 0000015040 | 02F2 | EB00 | 9004 | 4EFF | 83F2 | F27E | 7C00 | 8B4E |
| 0000015060 | F25E | E3D1 | FF1E | E2B7 | FF07 | F876 | 76FF | 9AF6 |
| 0000015100 | 094A | 1822 | C483 | 6A08 | FF00 | F076 | 76FF | 9AEE |
| 0000015120 | 1A50 | 1845 | C483 | 4006 | CC74 | 76FF | FFF2 | 1276 |
| 0000015140 | 76FF | FF10 | 0E76 | 76FF | FF0C | F076 | 76FF | FFEE |
| 0000015160 | 0676 | EE9A | 5614 | 8318 | 10C4 | 4689 | FFF4 | F076 |
| 0000015200 | 76FF | 9AEE | 08FA | 1874 | C483 | 8B04 | 0846 | 568B |
| 0000015220 | 390A | EA46 | 0575 | 5639 | 74EC | FFDB | EC76 | 76FF |
| 0000015240 | 9AEA | 08FA | 0C2C | 468B | 4DF4 | 8B4D | 1FE5 | 4D5D |
| 0000015260 | 90CB | 581E | 4590 | 8B55 | 1EEC | D88E | EC83 | 5610 |
| 0000015300 | C02B | 4689 | 89F2 | F046 | 76FF | FF12 | 1076 | 76FF |
| 0000015320 | FF0E | 0C76 | 76FF | FF0A | 0876 | 76FF | 9A06 | 1650 |
| 0000015340 | 18C1 | C483 | 890E | FC46 | 7440 | E903 | 0170 | 4C9A |
| 0000015360 | DB0E | 8E18 | 8BC2 | 26D8 | 3F83 | 7402 | E903 | 015E |
| 0000015400 | 2F6A | 76FF | FF0A | 0876 | 769A | F21D | 8318 | 06C4 |
| 0000015420 | D00B | 0374 | 47E9 | 6A01 | FF5C | 0A76 | 76FF | 9A08 |
| 0000015440 | 1D76 | 1918 | C483 | 0B06 | 74D0 | E903 | 0130 | 5EC4 |
| 0000015460 | 2608 | 3F80 | 7400 | 260A | 7F80 | 3A01 | 0375 | 1DE9 |
| 0000015500 | 1E01 | E868 | 9A07 | 09C2 | 1930 | C483 | 8904 | F446 |
| 0000015520 | 5689 | 0BF6 | 75D0 | E903 | 0104 | 0468 | 9A01 | 0594 |
| 0000015540 | 1975 | C483 | 8902 | F046 | 5689 | 0BF2 | 75D0 | E903 |
| 0000015560 | 00EC | 0368 | FF01 | F276 | 76FF | FFF0 | F676 | 76FF |
| 0000015600 | E8F4 | 0496 | C483 | 890A | F446 | 5689 | 0BF6 | 75D0 |
| 0000015620 | E903 | 00CA | 5EC4 | 26F0 | 3F80 | 7500 | E903 | 00BE |
| 0000015640 | 5306 | AA9A | 9709 | 8319 | 04C4 | 5EC4 | 03F0 | 4BD8 |
| 0000015660 | 8026 | 5C3F | 1674 | 8026 | 2F3F | 1074 | 681E | 07ED |
| 0000015700 | FF06 | F076 | 049A | A509 | 8319 | 08C4 | 76FF | FF0A |
| 0000015720 | 0876 | AA9A | B509 | 8319 | 04C4 | 76FF | FFF2 | F076 |
| 0000015740 | F08B | AA9A | D109 | 8319 | 04C4 | F003 | FE81 | 0104 |
| 0000015760 | 6C73 | 76FF | FF0A | 0876 | 76FF | FFF2 | F076 | 049A |
| 0000016000 | EE09 | 8319 | 08C4 | 76FF | FF12 | 1076 | 76FF | FF0E |
| 0000016020 | 0C76 | 76FF | FFF2 | F076 | 76FF | 9A06 | 1650 | 19FC |
| 0000016040 | C483 | 890E | FC46 | 7540 | 9A35 | 0E4C | 1A3F | C28E |
| 0000016060 | D88B | 8326 | 023F | 0375 | 37E9 | C4FF | F05E | 8026 |
| 0000016100 | 5C3F | 0674 | 8026 | 2F3F | 1475 | 8026 | 017F | 755C |
| 0000016120 | E903 | FF1E | 8026 | 017F | 752F | E903 | FF14 | 468B |
| 0000016140 | 0BF2 | F046 | 0E74 | 76FF | FFF2 | F076 | FA9A | FE08 |
| 0000016160 | 8314 | 04C4 | 468B | 5EFC | 4D4D | E58B | 5D1F | CB4D |
| 0000016200 | 8B55 | 83EC | 02EC | 76FF | FF08 | 0676 | 8D16 | FE46 |
| 0000016220 | 3350 | 50C0 | 9A50 | FFFF | 0000 | C00B | 1675 | 46F6 |
| 0000016240 | 020A | 1374 | 46F7 | 01FE | 7400 | BA0C | 000D | 05B8 |
| 0000016260 | E900 | F360 | 76E9 | 8BF3 | 5DE5 | 00CB | 5A59 | DC8B |
| 0000016300 | D82B | 1972 | FB81 | 0200 | 1372 | E852 | F9D6 | 8E93 |
| 0000016320 | 5AC2 | 3B26 | 0447 | 0572 | E08B | 5152 | 52CB | A151 |
| 0000016340 | 07F0 | 7540 | 3305 | E9C0 | E5D2 | 2EFF | 07F0 | 8B55 |
| 0000016360 | 56EC | 768B | B804 | 0200 | 9A50 | 0594 | 18B0 | 8B59 |
| 0000016400 | 81DE | F4EB | 8107 | D4C3 | 0B09 | 74D2 | 800B | 0A4C |
| 0000016420 | C708 | 0247 | 0200 | 0EEB | 4C80 | 040A | 47C7 | 0102 |
| 0000016440 | 8C00 | 8DDA | 0147 | 5489 | 8902 | 8904 | 0854 | 4489 |
| 0000016460 | C706 | 0444 | 0000 | 5D5E | 00C3 | 8B55 | 83EC | 02EC |
| 0000016500 | C033 | 09EB | 8B55 | 83EC | 02EC | FFB8 | 89FF | FE46 |
| 0000016520 | 5E8B | 3B06 | 8A1E | 7200 | BA19 | 0009 | C033 | B3E9 |
| 0000016540 | 8BF2 | FE4E | C90B | 0774 | E853 | ED30 | C483 | E902 |
| 0000016560 | F2BB | C00B | 0774 | E853 | ED16 | C483 | 8302 | 04EC |

THU MAR 14 17:48:06 1991 TM.EXE PAGE 9, LINE 473

| | | | | | | | | |
|---|---|---|---|---|---|---|---|---|
| 0000016600 | CC8B | FF53 | 0A76 | 76FF | FF08 | 0C76 | 5116 | FF9A |
| 0000016620 | 00FF | 5900 | 855A | 75C0 | 80C8 | 8CA7 | FD00 | 468B |
| 0000016640 | 0BFE | 74C0 | 5307 | F3E8 | 83EC | 02C4 | 8B91 | 5DE5 |
| 0000016660 | 00CB | 8B55 | 83EC | 0EEC | C033 | 09EB | 8B55 | 83EC |
| 0000016700 | 0EEC | FFB8 | 89FF | F246 | 5E8B | 3B06 | 8A1E | 7200 |
| 0000016720 | BA08 | 0009 | C033 | 3BE9 | 0BF2 | 74C0 | 5307 | AFE8 |
| 0000016740 | 83EC | 02C4 | 87F6 | 008C | 7420 | 5312 | C933 | 5151 |
| 0000016760 | 4141 | 8D51 | F446 | 5016 | 5F9A | 001B | F600 | 8C87 |
| 0000017000 | 8000 | 7D74 | 5E8C | 8EFA | 0A46 | 56C5 | 3308 | 89C0 |
| 0000017020 | FE46 | 4689 | FCFC | 5657 | FA8B | F28B | 6689 | 8BF8 |
| 0000017040 | 0C4E | 3FE3 | 0AB0 | AEF2 | 5275 | 8E1E | FA5E | 5C9A |
| 0000017060 | CC24 | 3D1A | 00A8 | 4C76 | 831F | 02EC | DC8B | 00BA |
| 0000017100 | 3D02 | 0228 | 0373 | 80BA | 2B00 | 8BE2 | 8BD4 | 16FA |
| 0000017120 | 8B07 | 0C4E | 3CAC | 740A | 3B0D | 74FB | AA1A | F4E2 |
| 0000017140 | 38E8 | E900 | 00AF | 0DB0 | FB3B | 0375 | 2CE8 | AA00 |
| 0000017160 | 0AB0 | 46FF | EBFC | E8E2 | 0021 | E1EB | 5F5E | 5E8E |
| 0000017200 | E9FA | 00C8 | 468B | 0BF2 | 74C0 | FF09 | 0676 | 0BE8 |
| 0000017220 | 83EC | 02C4 | FCB8 | 0EFF | 21E8 | 50FE | 5153 | 061E |
| 0000017240 | 8B1F | 2BCF | E3CA | 5121 | 5E8B | 5306 | 521E | 8D51 |
| 0000017260 | F446 | 5016 | 659A | 0005 | 5900 | C00B | 1175 | 5E8B |
| 0000017300 | 01F4 | FE5E | D93B | 0772 | 591F | 585B | FA8B | 1FC3 |
| 0000017320 | C483 | 8308 | FE7E | 7500 | 0B3C | 74C0 | 3D18 | 006D |
| 0000017340 | 0D74 | 013D | BA00 | 0009 | 0875 | 1CBA | EB00 | BA03 |
| 0000017360 | 0020 | EBF9 | 8E26 | FA5E | 87F6 | 008C | 7440 | 8E0E |
| 0000017400 | 0A5E | 5E8B | 8008 | 1A3F | 0375 | EBF8 | BA0E | 001C |
| 0000017420 | C033 | EBF9 | 8B06 | FE46 | 462B | 8BFC | F866 | 5F5E |
| 0000017440 | 5E8E | 72FA | 8B14 | F25E | DB0B | 0974 | 76FF | E806 |
| 0000017460 | EB6A | C483 | 8B02 | 5DE5 | 8BCB | F25E | DB0B | 0974 |
| 0000017500 | 76FF | E806 | EB56 | C483 | E902 | F0C8 | 4E8B | 0B0C |
| 0000017520 | 75C9 | 8B04 | EBC1 | 1ECE | 56C5 | 5308 | 521E | 8D51 |
| 0000017540 | F446 | 5016 | 859A | 001C | 1E00 | 1F07 | C00B | 1774 |
| 0000017560 | 6D3D | 7400 | 3D0D | 0001 | 09BA | 7500 | BABC | 001C |
| 0000017600 | B7EB | 20BA | EB00 | 8BB2 | F446 | C00B | 9775 | 87F6 |
| 0000017620 | 008C | 7440 | 8B0A | 26DA | 3F80 | 751A | EB02 | BA86 |
| 0000017640 | 001C | C033 | 93EB | 8B55 | 57EC | 7EC4 | 8B06 | 33DF |
| 0000017660 | B9C0 | FFFF | AEF2 | F741 | 8AD9 | 0A46 | FB8B | AEF2 |
| 0000017700 | 264F | 0538 | 0474 | FF33 | C78E | C78B | C28C | 8B5F |
| 0000017720 | 5DE5 | 00CB | 8B55 | 8BEC | 1ED6 | 76C5 | C40A | 065E |
| 0000017740 | FFB0 | C00A | 2D74 | 26AC | 278A | 3A43 | 74E0 | 2CF3 |
| 0000017760 | 3C41 | 1A1A | 80C9 | 20E1 | C102 | 4104 | E086 | 412C |
| 0000020000 | 1A3C | C91A | E180 | 0220 | 04C1 | 3A41 | 74C4 | 1AD3 |
| 0000020020 | 1CC0 | 98FF | 8B1F | 5DF2 | 00CB | 04CB | 0000 | 468B |
| 0000020040 | 8B04 | 0656 | 4689 | 89FC | FE56 | 4EFF | 740C | EB79 |
| 0000020060 | 9044 | 8026 | 3B3F | 6774 | 8026 | 223F | 2274 | 8A26 |
| 0000020100 | C407 | 085E | 8826 | FF07 | 0446 | 46FF | FF08 | 0C4E |
| 0000020120 | 2375 | 468B | 8B04 | 0656 | 4689 | 89FC | FE56 | 48EB |
| 0000020140 | 46FF | C404 | 045E | 8026 | 003F | 1475 | 8026 | 003F |
| 0000020160 | 0374 | 46FF | C404 | 045E | 8026 | 003F | B475 | 1FEB |
| 0000020200 | 8026 | 223F | E674 | 8A26 | C407 | 085E | 8826 | FF07 |
| 0000020220 | 0446 | 46FF | FF08 | 0C4E | C975 | B6EB | 46FF | 8B04 |
| 0000020240 | 045E | 8026 | 3B3F | F474 | 5EC4 | 2608 | 07C6 | 8B00 |
| 0000020260 | 0446 | 568B | 3906 | FC46 | 0875 | 5639 | 75FE | 2B03 |
| 0000020300 | 99C0 | C3C9 | 08C8 | 0000 | 6A56 | FF00 | 0876 | 76FF |
| 0000020320 | 9A06 | 1A50 | 1EB9 | C483 | 0B06 | 75C0 | 6841 | 0104 |
| 0000020340 | 76FF | FF10 | 0E76 | 7A9A | D124 | 831E | 06C4 | 5EC4 |
| 0000020360 | 260E | 7F80 | 0003 | 0E74 | 681E | 0BD6 | 5306 | 049A |
| 0000020400 | E509 | 831E | 08C4 | 76FF | FF08 | 0676 | 76FF | FF10 |
| 0000020420 | 0E76 | 049A | F709 | 831E | 08C4 | B0E9 | 900D | 76FF |
| 0000020440 | FF0C | 0A76 | C29A | 3509 | 831F | 04C4 | 4689 | 89FC |

THU MAR 14 17:48:06 1991 TM.EXE PAGE 10, LINE 532

| | | | | | | | | |
|---|---|---|---|---|---|---|---|---|
| 0000020460 | FE56 | D00B | 0375 | 8DE9 | 6A00 | FF00 | 1076 | 76FF |
| 0000020500 | FF0E | FE76 | 76FF | E8FC | FED0 | C483 | 890A | FC46 |
| 0000020520 | 5689 | 0BFE | 74D0 | C46F | 0E5E | 8026 | 003F | 6674 |
| 0000020540 | 5306 | AA9A | 7709 | 831F | 04C4 | 5EC4 | 030E | 89D8 |
| 0000020560 | F85E | 468C | 26FA | 478A | 98FF | F08B | FE83 | 742F |
| 0000020600 | 8317 | 5CFE | 1274 | FE83 | 743A | 260D | 07C6 | 8D5C |
| 0000020620 | 0147 | 4689 | 8CF8 | FA46 | 76FF | FF08 | 0676 | 76FF |
| 0000020640 | FFFA | F876 | 4A9A | 8709 | 831F | 08C4 | 006A | 76FF |
| 0000020660 | FF10 | 0E76 | 509A | 011A | 831C | 06C4 | C00B | 0374 |
| 0000020700 | 76E9 | EBFF | 9008 | 5EC4 | 260E | 07C6 | 5E00 | CBC9 |
| 0000020720 | 14C8 | 0000 | 5657 | 468B | 0B0C | 0A46 | 0D75 | 92A1 |
| 0000020740 | 8B02 | 9416 | 8902 | 0A46 | 5689 | 8B0C | 0646 | 568B |
| 0000020760 | 8908 | F446 | 5689 | BEF6 | 0002 | 16EB | 4683 | 04F4 |
| 0000021000 | FF26 | 0277 | FF26 | 9A37 | 09AA | 2005 | C483 | 4004 |
| 0000021020 | F003 | 5EC4 | 26F4 | 478B | 2602 | 070B | 0674 | FE81 |
| 0000021040 | 7FFF | D876 | 468B | 0B1C | 1A46 | 2274 | 76FF | FF1C |
| 0000021060 | 1A76 | AA9A | 1509 | 8320 | 04C4 | 76FF | FF20 | 1E76 |
| 0000021100 | F88B | AA9A | 3609 | 8320 | 04C4 | F803 | F703 | 7689 |
| 0000021120 | 81FC | FFFE | 727F | C41D | 125E | C02B | 8926 | 0247 |
| 0000021140 | 8926 | 9A07 | 0E4C | 2048 | 4689 | 89F0 | F256 | 5EC4 |
| 0000021160 | E9F0 | 0110 | 9A56 | 0594 | 206A | C483 | C402 | 0E5E |
| 0000021200 | 8926 | 2607 | 5789 | 0B02 | 75D0 | C433 | 125E | C02B |
| 0000021220 | 8926 | 0247 | 8926 | 9A07 | 0E4C | 207D | 4689 | 89EC |
| 0000021240 | EE56 | 5EC4 | 26EC | 07C7 | 000C | 449A | AE0E | 8E20 |
| 0000021260 | 8BC2 | 26D8 | 07C7 | 0008 | FFB8 | E9FF | 0347 | 468B |
| 0000021300 | 8B0A | 0C56 | 4689 | 89F4 | F656 | 02BE | EB00 | 9017 |
| 0000021320 | 4683 | 04F4 | FF26 | 0277 | FF26 | 9A37 | 09AA | 210C |
| 0000021340 | C483 | 4004 | F003 | 5EC4 | 26F4 | 478B | 2602 | 070B |
| 0000021360 | 0674 | FE81 | 7FFF | D876 | 3E83 | 0BE0 | 7400 | A11F |
| 0000021400 | 008A | 4689 | EBFE | 9004 | 4EFF | 83FE | FE7E | 7400 |
| 0000021420 | 8B12 | FE5E | BF80 | 008B | 7500 | EB08 | 90EB | 46C7 |
| 0000021440 | 00FE | 8300 | FE7E | 7400 | 8B0A | FE46 | 0705 | D100 |
| 0000021460 | 03E0 | FFF0 | 1876 | 76FF | 9A16 | 09AA | 2135 | C483 |
| 0000021500 | 2B04 | 03D2 | FC46 | D213 | C603 | D283 | 0B00 | 7CD2 |
| 0000021520 | 7F49 | 3D05 | 7FFE | 4276 | 5EC4 | 260E | 77FF | 2602 |
| 0000021540 | 37FF | FA9A | 4908 | 8321 | 04C4 | 5EC4 | 2B0E | 26C0 |
| 0000021560 | 4789 | 2602 | 0789 | 4C9A | 5C0E | 8921 | EC46 | 5689 |
| 0000021600 | C4EE | EC5E | C726 | 0707 | 9A00 | 0E44 | 216E | C28E |
| 0000021620 | D88B | C726 | 0A07 | E900 | FF1E | 9A56 | 0594 | 218E |
| 0000021640 | C483 | C402 | 125E | 8926 | 2607 | 5789 | 0B02 | 75D0 |
| 0000021660 | C419 | 0E5E | FF26 | 0277 | FF26 | 9A37 | 08FA | 21C9 |
| 0000021700 | C483 | C404 | 0E5E | C5E9 | 90FE | 5EC4 | 260E | 078B |
| 0000021720 | 8B26 | 0257 | 4689 | 89F8 | FA56 | 4E8B | 8B06 | 085E |
| 0000021740 | 4E89 | 89F4 | F65E | 7E8B | 0B1C | 1A7E | 7874 | 76FF |
| 0000021760 | FF1C | 1A76 | 5052 | 4A9A | DB09 | 8321 | 08C4 | 681E |
| 0000022000 | 0BD8 | 76FF | FF1C | 1A76 | AA9A | F109 | 8321 | 04C4 |
| 0000022020 | 4E8B | 8BF8 | FA56 | C803 | 8941 | F84E | 5152 | 4A9A |
| 0000022040 | 0509 | 8322 | 08C4 | 76FF | FF20 | 1E76 | 76FF | FFFA |
| 0000022060 | F876 | 049A | 1309 | 8322 | 08C4 | 76FF | FF20 | 1E76 |
| 0000022100 | AA9A | 5609 | 8322 | 04C4 | D88B | 5E03 | 8EF8 | FA46 |
| 0000022120 | 5E89 | 26F8 | 47C6 | 20FF | 468B | 8BF4 | F656 | 0405 |
| 0000022140 | 8900 | F446 | 4BEB | 5EC4 | 26F4 | 478B | 2602 | 070B |
| 0000022160 | 0675 | 46FF | EBF8 | 903A | FF26 | 0277 | FF26 | 5237 |
| 0000022200 | 76FF | 9AF8 | 094A | 2278 | C483 | 8B08 | F446 | 568B |
| 0000022220 | 89F6 | EC46 | 5689 | 83EE | F446 | C404 | EC5E | FF26 |
| 0000022240 | 0277 | FF26 | 9A37 | 09AA | 229D | C483 | 4004 | 4601 |
| 0000022260 | C4F8 | F45E | 8B26 | 0247 | 0B26 | 7407 | 264D | 77FF |
| 0000022300 | 2602 | 37FF | 76FF | FFFA | F876 | 4A9A | BF09 | 8322 |
| 0000022320 | 08C4 | 468B | 8BF4 | F656 | 4689 | 89EC | EE56 | 4683 |

THU MAR 14 17:48:06 1991 TM.EXE PAGE 11, LINE 591

| | | | | | | | | |
|---|---|---|---|---|---|---|---|---|
| 0000022340 | 04F4 | 5EC4 | 26EC | 77FF | 2602 | 37FF | AA9A | 3909 |
| 0000022360 | 8323 | 04C4 | 4601 | C4F8 | F85E | C626 | 2007 | 478D |
| 0000022400 | 8901 | F846 | 468C | EBFA | 90A8 | C02A | 5EC4 | 26F8 |
| 0000022420 | 4788 | 26FF | 0788 | 5EC4 | 2612 | 078B | 8B26 | 0257 |
| 0000022440 | 4689 | 89F8 | FA56 | 5EC4 | 890A | F45E | 468C | 26F6 |
| 0000022460 | 4F8B | 2602 | 0F0B | 1575 | 7E83 | 00FE | 0F75 | C28E |
| 0000022500 | D88B | C626 | 0007 | 8940 | F846 | 5689 | C4FA | F45E |
| 0000022520 | 8B26 | 0247 | 0B26 | 7407 | 263D | 77FF | 2602 | 37FF |
| 0000022540 | 76FF | FFFA | F876 | 4A9A | A409 | 831E | 08C4 | 468B |
| 0000022560 | 8BF4 | F656 | 4689 | 89EC | EE56 | 4683 | 04F4 | 5EC4 |
| 0000022600 | 26EC | 77FF | 2602 | 37FF | AA9A | 7909 | 8323 | 04C4 |
| 0000022620 | 0140 | F846 | B7EB | 7E83 | 00FE | 6074 | 681E | 0064 |
| 0000022640 | 76FF | FFFA | F876 | 4A9A | 8509 | 8323 | 08C4 | 681E |
| 0000022660 | 0064 | AA9A | DA09 | 831F | 04C4 | 4601 | 2BF8 | EBF6 |
| 0000022700 | 9027 | 848A | 008C | C88B | F8C0 | 2404 | 040F | C441 |
| 0000022720 | F85E | 46FF | 26F8 | 0788 | E180 | 800F | 41C1 | 5EC4 |
| 0000022740 | FFF8 | F846 | 8826 | 460F | 468B | FFFE | FE4E | C00B |
| 0000022760 | D075 | 5EC4 | FFF8 | F846 | C626 | 0007 | 5EC4 | 26F8 |
| 0000023000 | 07C6 | 2B00 | 5EC0 | C95F | 90CB | 8B55 | 83EC | 04EC |
| 0000023020 | 468B | 3306 | 3DD2 | 0000 | 2074 | 3D42 | 0002 | 1A74 |
| 0000023040 | 033D | 7400 | 4215 | 013D | 7400 | 8B0F | 3DD0 | 0004 |
| 0000023060 | 0874 | 16BA | 3300 | E9C0 | E9DA | C033 | 5050 | 525C |
| 0000023100 | 76FF | FF0E | 0C76 | 76FF | FF12 | 1076 | 468D | 16FC |
| 0000023120 | FF50 | 0A76 | 76FF | C708 | 9A06 | 0102 | 9A00 | FFFF |
| 0000023140 | 0000 | 06C7 | 029A | 0000 | C00B | 0374 | BEE9 | 83E9 |
| 0000023160 | 067E | 7502 | 5005 | E80E | DD3F | 468B | 83FC | 067E |
| 0000023200 | 7500 | 8A05 | 8AE0 | FE46 | E58B | CB5D | 5A59 | E852 |
| 0000023220 | F012 | D88B | C28E | 265A | 478B | 3B04 | 73C4 | 2B07 |
| 0000023240 | F7C4 | 52D8 | CB51 | C033 | F9EB | 8B55 | FFEC | 0A76 |
| 0000023260 | 76FF | FF08 | 0676 | 006A | 909A | A624 | C924 | 90CB |
| 0000023300 | 12C8 | 0000 | 8B56 | 0C76 | 46C7 | 01FA | 8300 | 067E |
| 0000023320 | 7500 | 9A08 | 26E2 | 24DD | 4689 | FF06 | 0676 | 468D |
| 0000023340 | 16FC | 8D50 | FA46 | 5016 | 739A | 0025 | 8B00 | 0846 |
| 0000023360 | 568B | 890A | F646 | 5689 | 0BF8 | 75D0 | 8B52 | FA46 |
| 0000023400 | 0305 | 3B00 | 7EC6 | 8B02 | 56F0 | 949A | EF05 | 8324 |
| 0000023420 | 02C4 | 4689 | 89F6 | F856 | D00B | 2A75 | 4C9A | 02DE |
| 0000023440 | 8925 | F246 | 5689 | C4F4 | F25E | C726 | 0C07 | 9A00 |
| 0000023460 | 0E44 | 254E | C28E | D88B | C726 | 0807 | 8B00 | F646 |
| 0000023500 | 568B | E9F8 | 009B | 568B | 89F8 | 0846 | 5689 | 8A0A |
| 0000023520 | 0646 | 4004 | 5EC4 | FFF6 | F646 | 8826 | C407 | F65E |
| 0000023540 | 46FF | 26F6 | 07C6 | C43A | F65E | 46FF | 26F6 | 07C6 |
| 0000023560 | 8B5C | FA46 | 0305 | 3B00 | 76C6 | 9A19 | 0E4C | 2581 |
| 0000023600 | 4689 | 89EE | F056 | 5EC4 | 26EE | 07C7 | 0022 | C02B |
| 0000023620 | EB99 | 904E | 76FF | FF06 | F876 | 76FF | 8DF6 | FA46 |
| 0000023640 | 5016 | FF9A | 00FF | 8900 | FE46 | C00B | 2A74 | 4C9A |
| 0000023660 | 940E | 8925 | EE46 | 5689 | C4F0 | EE5E | C726 | 0D07 |
| 0000023700 | 9A00 | 0E44 | 235B | 4689 | 89F2 | F456 | 468B | C4FE |
| 0000023720 | F25E | 8926 | EB07 | 90B7 | 468B | 8BF6 | F856 | 032D |
| 0000023740 | 5E00 | CBC9 | 04C8 | 0000 | 468B | 0B08 | 0646 | 0875 |
| 0000023760 | 006A | A7E8 | EB00 | 9031 | 468B | 2D06 | 07F4 | 0CB9 |
| 0000024000 | 9900 | F9F7 | 4689 | 50FC | 6DE8 | 83E2 | 02C4 | 76FF |
| 0000024020 | FF08 | 0676 | FA9A | 3E25 | 8326 | 04C4 | 4689 | FFFE |
| 0000024040 | FC76 | 5FE8 | 8BE2 | FE46 | CBC9 | 02C8 | 0000 | 5657 |
| 0000024060 | FF2B | 768B | 8A06 | 0A44 | C88B | 0324 | 023C | 3F75 |
| 0000024100 | C1F6 | 7508 | 8B0D | 81DE | F4EB | F607 | D487 | 0109 |
| 0000024120 | 2D74 | 048B | 442B | 8906 | FE46 | C00B | 217E | FF50 |
| 0000024140 | 0874 | 74FF | 8A06 | 0B4C | ED2A | 9A51 | 1B8C | 26BB |
| 0000024160 | C483 | 3908 | FE46 | 0774 | 4C80 | 200A | FFBF | 8BFF |
| 0000024200 | 0644 | 548B | 8908 | 8904 | 0254 | 44C7 | 0004 | 8B00 |

THU MAR 14 17:48:06 1991 TM.EXE PAGE 12, LINE 650

| | | | | | | | | |
|---|---|---|---|---|---|---|---|---|
| 0000024220 | 5EC7 | C95F | 90CB | 016A | 01E8 | CB00 | 04C8 | 0000 |
| 0000024240 | 5657 | F4BE | 2B07 | 89FF | FE7E | 026A | 19E8 | 83E2 |
| 0000024260 | 02C4 | 11EB | 46C7 | FFFE | FFFF | FC76 | C5E8 | 83E1 |
| 0000024300 | 02C4 | C683 | 390C | B436 | 720B | 8B2B | 2DC6 | 07F4 |
| 0000024320 | 0CB9 | 9900 | F9F7 | 4689 | 50FC | 9BE8 | 83E1 | 02C4 |
| 0000024340 | 44F6 | 830A | D374 | 561E | FA9A | 8B25 | 8324 | 04C4 |
| 0000024360 | 7440 | 47C1 | C3EB | 026A | F3E8 | 83E1 | 02C4 | 7E83 |
| 0000024400 | 0104 | 0475 | C78B | 03EB | 468B | 5EFE | C95F | 02C2 |
| 0000024420 | 9000 | EC83 | 8B06 | 16C4 | 4050 | 1640 | 9A50 | FFFF |
| 0000024440 | 0000 | 8358 | 04C4 | 55CB | EC8B | 76FF | 9A06 | FFFF |
| 0000024460 | 0000 | C00B | FFB8 | 75FF | 4001 | CB5D | 581E | 4590 |
| 0000024500 | 8B55 | 1EEC | D88E | EC81 | 0030 | 5657 | 681E | 02C4 |
| 0000024520 | FF9A | 00FF | 8300 | 04C4 | 4689 | 89F4 | F656 | 46C7 |
| 0000024540 | C7F8 | 8C02 | FA5E | 46C7 | 00EA | 2B00 | 89C0 | DC46 |
| 0000024560 | 4689 | 8EDA | F406 | 260B | 3E83 | FFFF | 7500 | E903 |
| 0000024600 | 001D | 36FF | 02D6 | 36FF | 02D4 | 468D | 16D0 | 9A50 |
| 0000024620 | FFFF | 0000 | C483 | 3D08 | 0000 | 0374 | 0FE9 | 8E00 |
| 0000024640 | F606 | 260B | 3E83 | 2809 | 7500 | E903 | 003A | 681E |
| 0000024660 | 02CB | 468D | 16DE | 8D50 | D046 | 5016 | 468D | 16F0 |
| 0000024700 | 6A50 | 1E65 | E268 | FF02 | D236 | FF02 | D036 | FF02 |
| 0000024720 | D636 | FF02 | D436 | 9A02 | FFFF | 0000 | C483 | 891E |
| 0000024740 | F046 | 5689 | E9F2 | 0008 | C02B | 4689 | 89F2 | F046 |
| 0000024760 | 76FF | FF0A | 0876 | 76FF | 9A06 | 461F | 2899 | C483 |
| 0000025000 | 8906 | D846 | 013D | 1B00 | 40C0 | 003D | 7500 | E903 |
| 0000025020 | 006A | 76FF | 9AD8 | 28B3 | 0000 | 068E | 0BF4 | 8326 |
| 0000025040 | D23E | 0028 | 0375 | 09E9 | 8300 | D47E | 74FE | E903 |
| 0000025060 | 000F | 068E | 0BF6 | 8326 | EA3E | 0028 | 0375 | 38E9 |
| 0000025100 | 8D00 | DE46 | 5016 | 468D | 16F0 | 8D50 | D046 | 5016 |
| 0000025120 | 681E | 02E2 | 6D6A | 36FF | 02D2 | 36FF | 02D0 | 36FF |
| 0000025140 | 02D6 | 36FF | 02D4 | 189A | 0029 | 8300 | 1AC4 | 46C7 |
| 0000025160 | 00D6 | E900 | 00E7 | 03E9 | E900 | 00E1 | 006A | FF9A |
| 0000025200 | 00FF | 8900 | D846 | 3E83 | 02D8 | 7400 | E903 | 006B |
| 0000025220 | 468D | 16EC | 8D50 | FC46 | 5016 | FF9A | 00FF | 8900 |
| 0000025240 | D846 | 013D | 1B00 | 40C0 | 003D | 7500 | E903 | 0003 |
| 0000025260 | D3E9 | C4FF | EC5E | 8326 | 027F | 7401 | E903 | 002A |
| 0000025300 | 76FF | FFEE | EC76 | 8B9A | C350 | 8328 | 04C4 | 4689 |
| 0000025320 | 3DD8 | 0001 | C01B | 3D40 | 0000 | 0375 | 08E9 | FF00 |
| 0000025340 | D876 | FF9A | 00FF | E900 | 000E | 76FF | FFEE | EC76 |
| 0000025360 | 389A | 9C29 | 8305 | 04C4 | 8BE9 | 8EFF | F406 | 260B |
| 0000025400 | 3E83 | 274A | 7500 | E903 | 0009 | 7E83 | FED4 | 0374 |
| 0000025420 | 0FE9 | 8E00 | F606 | 260B | 3E83 | FFFF | 7500 | E903 |
| 0000025440 | 0038 | 468D | 16DE | 8D50 | F046 | 5016 | 468D | 16D0 |
| 0000025460 | 1E50 | E268 | 6A02 | FF7D | D236 | FF02 | D036 | FF02 |
| 0000025500 | D636 | FF02 | D436 | 9A02 | FFFF | 0000 | C483 | C71A |
| 0000025520 | D646 | 0000 | 06E9 | E900 | 0003 | 00E9 | 5E00 | 835F |
| 0000025540 | 02ED | E58B | 5D1F | CB4D | 581E | 4590 | 8B55 | 1EEC |
| 0000025560 | D88E | EC81 | 0004 | 5657 | 5EC4 | 2606 | 478B | E90C |
| 0000025600 | 0054 | 659A | 7E3B | 8929 | FC46 | 00B8 | E900 | 00CE |
| 0000025620 | 5EC4 | 2606 | [illegible] | 7403 | E903 | 000C | 06C7 | 02D8 |
| 0000025640 | 0001 | 00B8 | E900 | 00B6 | 6AE9 | 9A00 | 3C8A | 2986 |
| 0000025660 | ABE9 | 9A00 | 3ECF | 298E | A3E9 | 9A00 | 3F38 | 2996 |
| 0000025700 | 9BE9 | 9A00 | 3C24 | 299E | 93E9 | 9A00 | 3F5F | 27CC |
| 0000025720 | 8BE9 | E900 | 003F | 1B3D | 7500 | E903 | FFE5 | 0376 |
| 0000025740 | 1BE9 | 2D00 | 0007 | 0375 | A5E9 | 2DFF | 000F | 0375 |
| 0000025760 | 8FE9 | 2DFF | 0004 | 0375 | B0E9 | E9FF | 0017 | 1C2D |
| 0000026000 | 7500 | E903 | FFAD | 7548 | E903 | FFAF | 7548 | E903 |
| 0000026020 | FFB9 | 00E9 | 8300 | E03E | 0002 | 0375 | 0CE9 | 1E00 |
| 0000026040 | E768 | 9A02 | FFFF | 0000 | 2DE9 | C700 | E006 | 0102 |
| 0000026060 | 8B00 | 0646 | 568B | A308 | 0D74 | 1689 | 0D76 | 681E |

THU MAR 14 17:48:06 1991 TM.EXE PAGE 13, LINE 709

| | | | | | | | | |
|---|---|---|---|---|---|---|---|---|
| 0000026100 | 02DC | CD9A | 0008 | 8900 | FC46 | 003D | 7500 | E903 |
| 0000026120 | 0006 | 05B8 | E900 | 0006 | 00B8 | E900 | 0000 | 5F5E |
| 0000026140 | ED83 | 8B02 | 1FE5 | 4D5D | 1ECB | 9058 | 5545 | EC8B |
| 0000026160 | 8E1E | 81D8 | 24EC | 5700 | C756 | FA46 | 0329 | 5E8C |
| 0000026200 | C7FC | F446 | 0000 | C02B | 4689 | 89E6 | E446 | 068E |
| 0000026220 | 0BF4 | 8326 | E33E | 002A | 0375 | 1DE9 | FF00 | D636 |
| 0000026240 | FF02 | D436 | 8D02 | DC46 | 5016 | 609A | 0027 | 8300 |
| 0000026260 | 08C4 | 003D | 7400 | E903 | 000F | 068E | 0BF6 | 8326 |
| 0000026300 | F23E | 002A | 0375 | 3BE9 | 1E00 | 2D68 | 8D03 | E846 |
| 0000026320 | 5016 | 468D | 16DC | 8D50 | F646 | 5016 | CC68 | 1E00 |
| 0000026340 | 3E68 | FF03 | D236 | FF02 | D036 | FF02 | D636 | FF02 |
| 0000026360 | D436 | 9A02 | 27A8 | 0000 | C483 | 891E | F646 | 5689 |
| 0000026400 | E9F8 | 0008 | C02B | 4689 | 89F8 | F646 | 068E | 0BF4 |
| 0000026420 | 8326 | F13E | 0027 | 0374 | 0FE9 | 8E00 | F606 | 260B |
| 0000026440 | 3E83 | 2776 | 7500 | E903 | 000C | 681E | 0331 | FF9A |
| 0000026460 | 00FF | 8300 | 04C4 | 006A | FF9A | 00FF | 8E00 | F806 |
| 0000026500 | 260B | 00A3 | 2600 | 1689 | 0002 | FF26 | 0236 | 2600 |
| 0000026520 | 36FF | 0000 | 006A | FF9A | 00FF | 8E00 | FA06 | 260B |
| 0000026540 | 06A3 | 2602 | 1689 | 0208 | 3E83 | 02DA | 7400 | E903 |
| 0000026560 | 002F | 681E | 02DC | FF9A | 00FF | C700 | E006 | 0002 |
| 0000026600 | 1E00 | DC68 | 6A02 | 6AFF | 9AFF | 088B | 0000 | 36FF |
| 0000026620 | 0D76 | 36FF | 0D74 | DF9A | 552B | 8329 | 04C4 | C7E9 |
| 0000026640 | 8EFF | F406 | 260B | 3E83 | 2A65 | 7500 | E903 | 0009 |
| 0000026660 | 7E83 | FEE0 | 0374 | 0FE9 | 8E00 | F606 | 260B | 3E83 |
| 0000026700 | 2A91 | 7500 | E903 | 0039 | 468D | 16E8 | 8D50 | F646 |
| 0000026720 | 5016 | 468D | 16DC | 1E50 | 3E68 | 6803 | 00D8 | 36FF |
| 0000026740 | 02D2 | 36FF | 02D0 | 36FF | 02D6 | 36FF | 02D4 | 379A |
| 0000026760 | 0028 | 8300 | 1AC4 | 46C7 | 00E2 | E900 | 0006 | 03E9 |
| 0000027000 | E900 | 0000 | 5F5E | ED83 | 8B02 | 1FE5 | 4D5D | 1ECB |
| 0000027020 | 9058 | 5545 | EC8B | 8E1E | 81D8 | 2EEC | 5700 | C756 |
| 0000027040 | FC46 | 0000 | 016A | 4F9A | 0028 | C400 | 065E | 8B26 |
| 0000027060 | 0C47 | 4BE9 | 6A03 | C429 | 065E | FF26 | 1677 | FF26 |
| 0000027100 | 1477 | 3E9A | 2E30 | 832C | 06C4 | 4689 | E9FC | 03F1 |
| 0000027120 | 5EC4 | 2606 | 77FF | 2616 | 77FF | 9A14 | 30D6 | 2C3C |
| 0000027140 | C483 | 8904 | FC46 | D8E9 | 9A03 | 4212 | 2C47 | 4689 |
| 0000027160 | E9FC | 03CD | F89A | 5231 | 892C | FC46 | C2E9 | 9A03 |
| 0000027200 | 323A | 2C68 | 4689 | E9FC | 03B7 | 5EC4 | 2606 | 77FF |
| 0000027220 | 2616 | 77FF | 9A14 | 34A8 | 2C81 | C483 | 8904 | FC46 |
| 0000027240 | 9EE9 | C403 | 065E | FF26 | 1677 | FF26 | 1477 | 889A |
| 0000027260 | 8F33 | 832C | 04C4 | 4689 | E9FC | 0385 | 979A | 9F42 |
| 0000027300 | 3D2C | 0000 | 0374 | 03E9 | E900 | 0375 | 259A | AD4E |
| 0000027320 | C72C | DA06 | 0102 | E900 | 0367 | 939A | BD35 | 892C |
| 0000027340 | FC46 | 5CE9 | 6A03 | 6800 | 07D0 | EB9A | CB36 | 832C |
| 0000027360 | 04C4 | 4689 | E9FC | 0349 | 199A | 6938 | 892B | FC46 |
| 0000027400 | 3EE9 | 6A03 | 6A00 | 6A00 | 6A00 | 6A00 | 6A00 | 9A00 |
| 0000027420 | FFFF | 0000 | 2AE9 | C403 | 065E | FF26 | 1477 | FF9A |
| 0000027440 | 00FF | E900 | 031B | 5EC4 | 2606 | 478B | 8E14 | FC06 |
| 0000027460 | 260B | 04A3 | E900 | 0309 | FF9A | 00FF | 1E00 | 7E8D |
| 0000027500 | 8BDA | 16F0 | 8E07 | B9DA | 0011 | A5F3 | C41F | 065E |
| 0000027520 | 8B26 | 1447 | 4689 | 8DE8 | DA46 | 5016 | FF9A | 00FF |
| 0000027540 | E900 | 02DD | 5EC4 | 2606 | 77FF | 261C | 77FF | C41A |
| 0000027560 | 065E | FF26 | 1477 | BD9A | 1538 | 832C | 06C4 | 4689 |
| 0000027600 | E9FC | 02BD | FF9A | 00FF | 9A00 | FFFF | 0000 | 256A |
| 0000027620 | 006A | 006A | 006A | 006A | 006A | E09A | 002C | 6A00 |
| 0000027640 | 6A00 | 6A03 | 6A00 | 6A00 | 9A00 | FFFF | 0000 | 5052 |
| 0000027660 | FF9A | 00FF | 5000 | 006A | 006A | FF9A | 00FF | 9A00 |
| 0000027700 | FFFF | 0000 | 9D9A | 002D | E900 | 0275 | FF9A | 00FF |
| 0000027720 | E900 | 026D | FF9A | 00FF | 6A00 | 9A04 | FFFF | 0000 |
| 0000027740 | 4689 | E9FC | 025B | 006A | 509A | CB39 | 832D | 02C4 |

THU MAR 14 17:?8:06 1991 TM.EXE PAGE 14, LINE 768

| | | | | | | | | |
|---|---|---|---|---|---|---|---|---|
| 0000027760 | 4689 | E9FC | 024B | 036A | 509A | DB39 | 832D | 02C4 |
| 0000030000 | 4689 | E9FC | 023B | 016A | 509A | EB39 | 832D | 02C4 |
| 0000030020 | 4689 | E9FC | 022B | 026A | 509A | 6439 | 832E | 02C4 |
| 0000030040 | 4689 | E9FC | 021B | 959A | 002D | 9A00 | FFFF | 0000 |
| 0000030060 | 006A | 026A | 096A | 006A | 006A | 7A9A | 002D | 5200 |
| 0000030100 | 9A50 | 2D81 | 0000 | 6A50 | 6A00 | 9A00 | 2D8B | 0000 |
| 0000030120 | EEE9 | C401 | 065E | FF26 | 1477 | FF9A | 00FF | E900 |
| 0000030140 | 01DF | DCE9 | 9A01 | 2D09 | 0000 | 8D1E | DA7E | F08B |
| 0000030160 | 0716 | DA8E | 11B9 | F300 | 1FA5 | 5EC4 | 2606 | 478B |
| 0000030200 | 8914 | F046 | 468D | 16DA | 9A50 | 2D2D | 0000 | B0E9 |
| 0000030220 | 9A01 | 3C8A | 2E6F | 4689 | E9FC | 01A5 | 249A | 7A3C |
| 0000030240 | 892E | FC46 | 9AE9 | 9A01 | 3ECF | 2E85 | 4689 | E9FC |
| 0000030260 | 018F | 389A | 493F | 892D | FC46 | 84E9 | 6A01 | 6A13 |
| 0000030300 | 6A00 | 6A00 | 6A00 | 6A00 | 9A00 | 2D6B | 0000 | 4689 |
| 0000030320 | E9FC | 016D | 068E | 0BFE | 8326 | 643E | 1A03 | 0374 |
| 0000030340 | 05E9 | 9A00 | 3DA2 | 2EE8 | 068E | 0BFE | C726 | 6406 |
| 0000030360 | 0003 | 9A00 | 2DF7 | 0000 | 46E9 | C401 | 065E | FF26 |
| 0000030400 | 1677 | FF26 | 1477 | 006A | 006A | FF9A | 00FF | 8900 |
| 0000030420 | FC46 | 2CE9 | 9A01 | 3FC8 | 2DBB | 4689 | E9FC | 0121 |
| 0000030440 | FF9A | 00FF | 8900 | FC46 | 16E9 | 8D01 | D246 | 5016 |
| 0000030460 | FF9A | 00FF | 8900 | D846 | 5EC4 | 2606 | 478B | 8914 |
| 0000030500 | D646 | 4669 | CAD6 | 0300 | D246 | 568B | 52D4 | 9A50 |
| 0000030520 | 30D6 | 2EB6 | C483 | 8904 | FC46 | 7669 | CAD6 | C400 |
| 0000030540 | D25E | FF26 | 3270 | FF9A | 00FF | E900 | 00D3 | 5EC4 |
| 0000030560 | 2606 | 77FF | 9A14 | 27E6 | 0000 | C4E9 | E900 | 00C1 |
| 0000030600 | 123D | 7500 | E903 | FE6E | 0376 | 34E9 | 3D00 | 0011 |
| 0000030620 | 0376 | ACE9 | D100 | 93E0 | FF2E | 6DA7 | 052F | 202C |
| 0000030640 | 392C | 442C | 4F2C | 5A2C | 732C | 8C2C | AA2C | B52C |
| 0000030660 | C82C | D32C | E72C | F62C | 082C | 342D | A42D | B62D |
| 0000030700 | 3D2D | 001D | 0375 | E9E9 | 76FE | E903 | 0027 | 132D |
| 0000030720 | 3D00 | 0009 | 0376 | 68E9 | D100 | 93E0 | FF2E | B1A7 |
| 0000030740 | D62F | E62D | F62D | 112D | 2330 | 322E | 352E | 612E |
| 0000030760 | 6C2E | 772E | 3D2E | 0023 | 0375 | 87E9 | 76FD | E903 |
| 0000031000 | 001D | 1F2D | 7500 | E903 | FEB3 | 7548 | E903 | FEEB |
| 0000031020 | 7548 | E903 | FEFF | 7548 | E903 | FF04 | 22E9 | 2D00 |
| 0000031040 | 0024 | 0375 | A5E9 | 48FD | 7548 | E903 | FEFD | 3E2D |
| 0000031060 | 7500 | E903 | FE9E | 862D | 7503 | E903 | FF30 | 00E9 |
| 0000031100 | 8300 | FC7E | 1B01 | 40C0 | 003D | 7500 | E903 | 0008 |
| 0000031120 | 76FF | 9AFC | 2F46 | 0000 | 006A | F79A | 002B | 8900 |
| 0000031140 | FC46 | 5F5E | ED83 | 8B02 | 1FE5 | 4D5D | 00CB | 581E |
| 0000031160 | 4590 | 8B55 | 1EEC | D88E | EC81 | 0008 | 5657 | C02B |
| 0000031200 | 4689 | 89FC | FA46 | 76FF | FF08 | 0676 | 76FF | 6A0A |
| 0000031220 | 6A00 | 8D00 | FA46 | 5016 | FF9A | 00FF | 8900 | F846 |
| 0000031240 | 013D | 1B00 | 40C0 | 003D | 7500 | E903 | 0006 | 468B |
| 0000031260 | E9F8 | 0047 | 76FF | FF08 | 0676 | D69A | AC30 | 8330 |
| 0000031300 | 04C4 | 4689 | 3DF8 | 0001 | C01B | 3D40 | 0000 | 0375 |
| 0000031320 | 06E9 | 8B00 | F846 | 22E9 | 9A00 | 4212 | 2F22 | 4689 |
| 0000031340 | 3DF8 | 0001 | C01B | 3D40 | 0000 | 0375 | 06E9 | 8B00 |
| 0000031360 | F846 | 06E9 | B800 | 0000 | 00E9 | 5E00 | 835F | 02ED |
| 0000031400 | E58B | 5D1F | CB4D | 581E | 4590 | 8B55 | 1EEC | D88E |
| 0000031420 | EC81 | 0012 | 5657 | 76FF | FF08 | 0676 | 468D | 16F2 |
| 0000031440 | 9A50 | FFFF | 0000 | 4689 | 3DF0 | 0001 | C01B | 3D40 |
| 0000031460 | 0000 | 0375 | 06E9 | 8B00 | F046 | E0E9 | FF00 | F476 |
| 0000031500 | 76FF | 8DF2 | FA46 | 5016 | FF9A | 00FF | 8900 | F046 |
| 0000031520 | 013D | 1B00 | 40C0 | 003D | 7500 | E903 | 0006 | 468B |
| 0000031540 | E9F0 | 00B9 | 76FF | FFF4 | F276 | 76FF | FFFC | FA76 |
| 0000031560 | 016A | 468D | 16F6 | 9A50 | FFFF | 0000 | 4689 | 3DF0 |
| 0000031600 | 0001 | C01B | 3D40 | 0000 | 0375 | 06E9 | 8B00 | F046 |
| 0000031620 | 8AE9 | FF00 | FC76 | 76FF | FFFA | F476 | 76FF | 9AF2 |

THU MAR 14 17:48:06 1991 TM.EXE PAGE 15, LINE 827

| | | | | | | | | |
|---|---|---|---|---|---|---|---|---|
| 0000031640 | FFFF | 0000 | 4689 | 3DF0 | 0000 | 0375 | 3DE9 | FF00 |
| 0000031660 | FC76 | 76FF | 9AFA | FFFF | 0000 | 4689 | 9AEE | 31A2 |
| 0000031700 | 0000 | 5052 | 468D | 16F6 | 9A50 | FFFF | 0000 | 4689 |
| 0000031720 | 9AEE | 2E0B | 0000 | 5052 | 76FF | FFF4 | F276 | 709A |
| 0000031740 | 0031 | 8900 | EE46 | 468B | E9F0 | 0031 | 026A | FF9A |
| 0000031760 | 00FF | 8900 | F046 | 003D | 7500 | E903 | 0006 | 468B |
| 0000032000 | E9F0 | 0019 | 76FF | FFFC | FA76 | FF9A | 00FF | 2B00 |
| 0000032020 | 89C0 | FC46 | 4689 | B8FA | 0000 | 00E9 | 5E00 | 835F |
| 0000032040 | 02ED | E58B | 5D1F | CB4D | 581E | 4590 | 8B55 | 1EEC |
| 0000032060 | D88E | EC81 | 0004 | 5657 | 006A | 006A | FF9A | 00FF |
| 0000032100 | 5200 | 9A50 | FFFF | 0000 | 4689 | 3DFC | 0000 | 0375 |
| 0000032120 | 06E9 | 8B00 | FC46 | 06E9 | B800 | 0000 | 00E9 | 5E00 |
| 0000032140 | 835F | 02ED | E58B | 5D1F | CB4D | 581E | 4590 | 8B55 |
| 0000032160 | 1EEC | D88E | EC81 | 010C | 5657 | FF9A | 00FF | 8900 |
| 0000032200 | FC86 | FFFE | FCB6 | 9AFE | FFFF | 0000 | 003D | 7500 |
| 0000032220 | E903 | 0020 | 681E | 0466 | 2168 | 9A41 | FFFF | 0000 |
| 0000032240 | 8689 | FEFA | BE83 | FEFA | 7402 | E903 | 0006 | 00B8 |
| 0000032260 | E900 | 00F9 | F29A | 0032 | 5200 | 8D50 | FE86 | 16FE |
| 0000032300 | 9A50 | 094A | 32A6 | C483 | 1E08 | 6668 | 8D03 | FE86 |
| 0000032320 | 16FE | 9A50 | 0980 | 3316 | C483 | 3D08 | 0000 | 0374 |
| 0000032340 | 11E9 | 6A00 | 6AFF | 6A01 | 6A00 | 9A00 | FFFF | 0000 |
| 0000032360 | 8689 | FEF4 | 868D | FEFE | 5016 | 869A | 0031 | 8900 |
| 0000032400 | F486 | 3DFE | 0001 | C01B | 3D40 | 0000 | 0375 | 07E9 |
| 0000032420 | 8B00 | F486 | E9FE | 0095 | B6FF | FEFC | FF9A | 00FF |
| 0000032440 | 9A00 | 318E | 0000 | 8689 | FEF6 | 9689 | FEF8 | 868B |
| 0000032460 | FEF8 | 860B | FEF6 | 0375 | 2CE9 | FF00 | F8B6 | FFFE |
| 0000032500 | F6B6 | 9AFE | 30D6 | 308D | C483 | 8904 | F486 | 3DFE |
| 0000032520 | 0001 | C01B | 3D40 | 0000 | 0375 | 07E9 | 8B00 | F486 |
| 0000032540 | E9FE | 0049 | 40E9 | 1E00 | A168 | 6A04 | 6A00 | 9A00 |
| 0000032560 | 31AF | 0000 | 8689 | FEF4 | 013D | 1B00 | 40C0 | 003D |
| 0000032600 | 7500 | E903 | 0007 | 868B | FEF4 | 20E9 | 6A00 | 9A00 |
| 0000032620 | 31BF | 0000 | 8689 | FEF4 | 003D | 7500 | E903 | 0007 |
| 0000032640 | 868B | FEF4 | 06E9 | B800 | 0000 | 00E9 | 5E00 | 835F |
| 0000032660 | 02ED | E58B | 5D1F | CB4D | 581E | 4590 | 8B55 | 1EEC |
| 0000032700 | D88E | EC81 | 000C | 5657 | 759A | 0034 | 5200 | 6A50 |
| 0000032720 | 8D02 | FA46 | 5016 | FF9A | 00FF | 8900 | F446 | 013D |
| 0000032740 | 1B00 | 40C0 | 003D | 7500 | E903 | 0006 | 468B | E9F4 |
| 0000032760 | 00DB | 681E | 04A6 | AA9A | D909 | 8333 | 04C4 | 76FF |
| 0000033000 | FF08 | 0676 | F08B | AA9A | E909 | 8333 | 04C4 | 76FF |
| 0000033020 | FFFC | FA76 | F88B | AA9A | F909 | 8333 | 04C4 | F803 |
| 0000033040 | F703 | C683 | 5602 | 949A | 1D05 | 8334 | 02C4 | 4689 |
| 0000033060 | 89F6 | F856 | 76FF | FFFC | FA76 | 76FF | FF08 | 0676 |
| 0000033100 | 681E | 04AA | 76FF | FFF8 | F676 | 769A | 2B0B | 8334 |
| 0000033120 | 10C4 | 76FF | FFF8 | F676 | 189A | 4A0C | 8334 | 04C4 |
| 0000033140 | 4689 | 3DF4 | 0000 | 0375 | 06E9 | B800 | 0005 | 5CE9 |
| 0000033160 | FF00 | F876 | 76FF | 9AF6 | 08FA | 3294 | C483 | FF04 |
| 0000033200 | 0876 | 76FF | 9A06 | 31DB | 0000 | C02B | 4689 | 8908 |
| 0000033220 | 0646 | 4B9A | 0032 | 5000 | ED9A | 0032 | 9A00 | 3285 |
| 0000033240 | 0000 | 5052 | 0D9A | 0032 | 5200 | 9A50 | 3340 | 0000 |
| 0000033260 | 4689 | 3DF4 | 0001 | C01B | 3D40 | 0000 | 0375 | 06E9 |
| 0000033300 | 8B00 | F446 | 06E9 | B800 | 0000 | 00E9 | 5E00 | 835F |
| 0000033320 | 02ED | E58B | 5D1F | CB4D | 581E | 4590 | 8B55 | 1EEC |
| 0000033340 | D88E | EC81 | 000C | 5657 | 999A | 0033 | 5200 | 6A50 |
| 0000033360 | 8D02 | FA46 | 5016 | A79A | 0033 | 8900 | F446 | 013D |
| 0000033400 | 1B00 | 40C0 | 003D | 7500 | E903 | 0006 | 468B | E9F4 |
| 0000033420 | 00A6 | 681E | 04B3 | AA9A | F909 | 8334 | 04C4 | 76FF |
| 0000033440 | FF08 | 0676 | F08B | AA9A | 0909 | 8335 | 04C4 | 76FF |
| 0000033460 | FFFC | FA76 | F88B | AA9A | 1909 | 8335 | 04C4 | F803 |
| 0000033500 | F703 | C683 | 5602 | 949A | 3D05 | 8335 | 02C4 | 4689 |

THU MAR 14 17:48:06 1991 TM.EXE PAGE 16, LINE 886

| | | | | | | | | |
|---|---|---|---|---|---|---|---|---|
| 0000033520 | 89F6 | F856 | 73FF | FF08 | 0676 | 76FF | FFFC | FA76 |
| 0000033540 | 681E | 04B7 | 76FF | FFF8 | F676 | 769A | 4B0B | 8335 |
| 0000033560 | 10C4 | 76FF | FFF8 | F676 | 189A | 6A0C | 8335 | 04C4 |
| 0000033600 | 4689 | 3DF4 | 0000 | 0375 | 06E9 | B800 | 0005 | 27E9 |
| 0000033620 | FF00 | F876 | 76FF | 9AF6 | 08FA | 33C9 | C483 | FF04 |
| 0000033640 | 0876 | 76FF | 9A06 | 3456 | 0000 | C02B | 4689 | 8908 |
| 0000033660 | 0646 | 00B8 | E900 | 0000 | 5F5E | ED83 | 8B02 | 1FE5 |
| 0000033700 | 4D5D | 1ECB | 9058 | 5545 | EC8B | 8E1E | 81D8 | 0AEC |
| 0000033720 | 5700 | 9A56 | 35C4 | 0000 | 7548 | E903 | 0006 | 01B8 |
| 0000033740 | E900 | 0003 | 00B8 | 8900 | F646 | 7E83 | 01F6 | 0374 |
| 0000033760 | 7CE9 | 9A00 | FFFF | 0000 | 023D | 7400 | E903 | 000E |
| 0000034000 | 006A | 006A | 006A | BD9A | 2C38 | 8336 | 06C4 | 226A |
| 0000034020 | 468D | 16F6 | 6A50 | 8D02 | FA46 | 5016 | 4E9A | 0036 |
| 0000034040 | 8900 | F846 | 013D | 1B00 | 40C0 | 003D | 7500 | E903 |
| 0000034060 | 0009 | 468B | E9F8 | 00D8 | 1EE9 | C400 | FA5E | 8B26 |
| 0000034100 | 1447 | 4689 | 3DF8 | 0001 | C01B | 3D40 | 0000 | 0375 |
| 0000034120 | 06E9 | 8B00 | F846 | B7E9 | 9A00 | 505C | 369B | 8B9A |
| 0000034140 | 0036 | 5000 | FF9A | 00FF | 8900 | F846 | 63E9 | 6A00 |
| 0000034160 | 8D22 | F646 | 5016 | 026A | 468D | 16FA | 9A50 | 2E9A |
| 0000034200 | 0000 | 4689 | 3DF8 | 0001 | C01B | 3D40 | 0000 | 0375 |
| 0000034220 | 09E9 | 8B00 | F846 | 77E9 | E900 | 001E | 5EC4 | 26FA |
| 0000034240 | 478B | 8914 | F846 | 013D | 1B00 | 40C0 | 003D | 7500 |
| 0000034260 | E903 | 0006 | 468B | E9F8 | 0056 | 639A | 0034 | 5000 |
| 0000034300 | FF9A | 00FF | 8900 | F846 | 419A | E959 | 9A34 | 2EF1 |
| 0000034320 | 0000 | 76FF | 9AF6 | FFFF | 0000 | 036A | 7E83 | 00F6 |
| 0000034340 | 0375 | 06E9 | B800 | 04C0 | 03E9 | B800 | 04C7 | 501E |
| 0000034360 | FF9A | 00FF | 8300 | F67E | 1B01 | 25C0 | 0001 | 0105 |
| 0000034400 | 5000 | 609A | 0033 | 8900 | F846 | 00B8 | E900 | 0000 |
| 0000034420 | 5F5E | ED83 | 8B02 | 1FE5 | 4D5D | 1ECB | 9058 | 5545 |
| 0000034440 | EC8B | 8E1E | 81D8 | 56EC | 5700 | 9A56 | 34B9 | 0000 |
| 0000034460 | 5052 | 786A | 649A | 0037 | 8E00 | 8BC2 | 26D8 | 7F83 |
| 0000034500 | 000E | 0375 | 06E9 | B800 | 04CE | 03E9 | B800 | 04D2 |
| 0000034520 | 501E | 468D | 16AC | 9A50 | FFFF | 0000 | 4689 | 3DAA |
| 0000034540 | 0000 | 0375 | 06E9 | 8B00 | AA46 | D1E9 | 9A00 | 346E |
| 0000034560 | 0000 | 5052 | 629A | C03A | 8337 | 04C4 | 4689 | 3DAA |
| 0000034600 | 0001 | C01B | 3D40 | 0000 | 0375 | 06E9 | 8B00 | AA46 |
| 0000034620 | ABE9 | 9A00 | 37CE | 0000 | C28E | D88B | 8326 | 0E7F |
| 0000034640 | 7500 | E903 | 0017 | 468D | 16AC | FF50 | 0876 | 76FF |
| 0000034660 | 6A06 | 6A00 | 9A00 | FFFF | 0000 | 14E9 | 8D00 | AC46 |
| 0000034700 | 5016 | 76FF | FF08 | 0676 | 006A | 006A | FF9A | 00FF |
| 0000034720 | 9A00 | FFFF | 0000 | 4689 | 3DAA | 0001 | C01B | 3D40 |
| 0000034740 | 0000 | 0375 | 06E9 | 8B00 | AA46 | 51E9 | 9A00 | 5941 |
| 0000034760 | 37F7 | 76FF | FF08 | 0676 | 468D | 16AC | 9A50 | 2E36 |
| 0000035000 | 0000 | C28E | D88B | 8326 | 0E7F | 7500 | E903 | 0006 |
| 0000035020 | D7B8 | E904 | 0003 | DBB8 | 1E04 | 1E50 | E268 | 8D04 |
| 0000035040 | CC46 | 5016 | 769A | D90B | 8335 | 14C4 | 468D | 16CC |
| 0000035060 | 6A50 | 9A00 | FFFF | 0000 | 00B8 | E900 | 0000 | 5F5E |
| 0000035100 | ED83 | 8B02 | 1FE5 | 4D5D | 1ECB | 9058 | 5545 | EC8B |
| 0000035120 | 8E1E | 81D8 | 3EEC | 5700 | 6A56 | 6A03 | 6A00 | 6A00 |
| 0000035140 | 8D00 | C246 | 5016 | ED9A | 0035 | 8900 | C646 | 013D |
| 0000035160 | 1B00 | 40C0 | 003D | 7500 | E903 | 0006 | 468B | E9C6 |
| 0000035200 | 0060 | 5EC4 | 26C2 | 478B | 8914 | C646 | 013D | 1B00 |
| 0000035220 | 40C0 | 003D | 7500 | E903 | 0006 | 468B | E9C6 | 0042 |
| 0000035240 | 5EC4 | 26C2 | 478B | 891A | CA46 | 5EC4 | 26C2 | 478B |
| 0000035260 | 8920 | C846 | 419A | 9B59 | FF38 | C876 | 76FF | 1ECA |
| 0000035300 | F968 | 8D04 | CC46 | 5016 | 769A | 470B | 8337 | 0CC4 |
| 0000035320 | 468D | 16CC | 6A50 | 9A00 | 3804 | 0000 | 00B8 | E900 |
| 0000035340 | 0000 | 5F5E | ED83 | 8B02 | 1FE5 | 4D5D | 1ECB | 9058 |
| 0000035360 | 5545 | EC8B | 8E1E | 81D8 | 04EC | 5700 | 9A56 | 35A4 |

THU MAR 14 17:48:06 1991 TM.EXE PAGE 17, LINE 945

| | | | | | | | | |
|---|---|---|---|---|---|---|---|---|
| 0000035400 | 0000 | 7448 | E903 | 0005 | 939A | 8735 | FF38 | 0676 |
| 0000035420 | 76FF | FF0A | 0876 | FF9A | 00FF | 8900 | FC46 | 013D |
| 0000035440 | 1B00 | 40C0 | 003D | 7500 | E903 | 0006 | 468B | E9FC |
| 0000035460 | 0043 | FF6A | 016A | 006A | 006A | BC9A | 0032 | 8300 |
| 0000035500 | 067E | 1B01 | 25C0 | FFFF | 0305 | 5000 | D39A | 0036 |
| 0000035520 | 8900 | FC46 | 036A | 7E83 | 0006 | 0375 | 06E9 | B800 |
| 0000035540 | 0515 | 03E9 | B800 | 051C | 501E | C19A | 0036 | B800 |
| 0000035560 | 0000 | 00E9 | 5E00 | 835F | 02ED | E58B | 5D1F | CB4D |
| 0000035600 | 581E | 4590 | 8B55 | 1EEC | D88E | EC81 | 000C | 5657 |
| 0000035620 | 7E83 | 0006 | 0375 | 09E9 | 8300 | 067E | 7403 | E903 |
| 0000035640 | 0007 | 046A | 1D9A | 0039 | 9A00 | FFFF | 0000 | 3E9A |
| 0000035660 | 0037 | 8900 | FA46 | 5689 | 9AFC | 39C0 | 0000 | C28E |
| 0000035700 | D88B | 8B26 | 2CB7 | 2601 | BF8B | 012E | CB9A | 0039 |
| 0000035720 | 3B00 | 74F0 | F903 | 0007 | FA3B | 0375 | 2DE9 | 6A00 |
| 0000035740 | 6AFF | 6A01 | 6A00 | 9A00 | 390B | 0000 | 4689 | 9AF8 |
| 0000035760 | 3A19 | 0000 | 4689 | 89F4 | F656 | FC9A | 0036 | C400 |
| 0000036000 | F45E | 8926 | 2C87 | 2601 | 9789 | 012E | 76FF | FFFC |
| 0000036020 | FA76 | 629A | DB3A | 8338 | 04C4 | 4689 | 3DF8 | 0001 |
| 0000036040 | C01B | 3D40 | 0000 | 0375 | 06E9 | 8B00 | F846 | 56E9 |
| 0000036060 | 6A00 | 6A00 | 8B01 | 065E | E3D1 | B7FF | 0524 | 006A |
| 0000036100 | 006A | 76FF | FFFC | FA76 | FF9A | 00FF | 8E00 | 8BC2 |
| 0000036120 | 26D8 | B7FF | 012A | 006A | 006A | 1C9A | 002E | 8900 |
| 0000036140 | F846 | 76FF | 9A06 | 2DAC | 0000 | 4689 | 3DF8 | 0001 |
| 0000036160 | C01B | 3D40 | 0000 | 0375 | 06E9 | 8B00 | F846 | 06E9 |
| 0000036200 | B800 | 0000 | 00E9 | 5E00 | 835F | 02ED | E58B | 5D1F |
| 0000036220 | CB4D | 581E | 4590 | 8B55 | 1EEC | D88E | EC81 | 000A |
| 0000036240 | 5657 | 468D | 16FC | 9A50 | FFFF | 0000 | 103D | 7400 |
| 0000036260 | E903 | 00D0 | CE9A | 0038 | 3D00 | 0002 | 0374 | 39E9 |
| 0000036300 | FF00 | 0876 | 76FF | 9A06 | 3AA2 | 0000 | 0605 | 5200 |
| 0000036320 | 9A50 | 398A | 0000 | C28E | D88B | FF26 | 0477 | FF26 |
| 0000036340 | 0277 | 006A | 006A | 006A | 006A | 468D | 16FC | 9A50 |
| 0000036360 | 3AE9 | 0000 | 4689 | E9F6 | 0026 | 76FF | FF08 | 0676 |
| 0000036400 | 006A | 006A | 9D9A | 0039 | 5200 | 6A50 | 6A00 | 6A00 |
| 0000036420 | 6A00 | 8D00 | FC46 | 5016 | FF9A | 00FF | 8900 | F646 |
| 0000036440 | 2F6A | 006A | 006A | 006A | 468D | 16F8 | 9A50 | 3837 |
| 0000036460 | 0000 | 4689 | 3DF6 | 0001 | C01B | 3D40 | 0000 | 0375 |
| 0000036500 | 06E9 | 8B00 | F646 | 41E9 | C400 | F85E | 8B26 | 1447 |
| 0000036520 | 4689 | 3DF6 | 0001 | C01B | 3D40 | 0000 | 0375 | 06E9 |
| 0000036540 | 8B00 | F646 | 23E9 | 8B00 | 0846 | 460B | 7506 | E903 |
| 0000036560 | 0012 | 76FF | FF08 | 0676 | 681E | 0366 | 4A9A | E509 |
| 0000036600 | 8339 | 08C4 | 00B8 | E900 | 0000 | 5F5E | ED83 | 8B02 |
| 0000036620 | 1FE5 | 4D5D | 1ECB | 9058 | 5545 | EC8B | 8E1E | 81D8 |
| 0000036640 | 04EC | 5700 | 6A56 | 9A01 | 3C0C | 0000 | 4689 | 6AFC |
| 0000036660 | 6A00 | 6A02 | 6A0A | 6A00 | 9A00 | 39[illegible]F | 0000 | 5052 |
| 0000036700 | 129A | 002E | 5000 | 006A | 006A | 2B9A | 003A | 9A00 |
| 0000036720 | FFFF | 0000 | A59A | 002D | 8300 | 643E | 0003 | 0374 |
| 0000036740 | 05E9 | 9A00 | 2EC4 | 0000 | FF9A | 00FF | 8900 | FC46 |
| 0000036760 | 013D | 1B00 | 40C0 | 003D | 7500 | E903 | 0008 | 76FF |
| 0000037000 | 9AFC | 3024 | 0000 | 859A | 003A | E900 | 001C | 939A |
| 0000037020 | EF35 | E93B | 0023 | 006A | 006A | 006A | BD9A | 4F38 |
| 0000037040 | 833B | 06C4 | 12E9 | E900 | 000F | 7548 | E903 | FFDE |
| 0000037060 | 7548 | E903 | FFE0 | 00E9 | 6A00 | 9A00 | 302B | 0000 |
| 0000037100 | 4689 | B8FC | 0000 | 00E9 | 5E00 | 835F | 02ED | E58B |
| 0000037120 | 5D1F | CB4D | 581E | 4590 | 8B55 | 1EEC | D88E | EC81 |
| 0000037140 | 000C | 5657 | C02B | 4689 | 89FC | FA46 | 8A9A | 003B |
| 0000037160 | 8900 | F646 | 5689 | 8BF8 | F846 | 460B | 75F6 | E903 |
| 0000037200 | 000C | 468B | 8BF6 | F856 | 4689 | 89FA | FC56 | 06C7 |
| 0000037220 | 0364 | 001B | 046A | 759A | 0039 | FF00 | FC76 | 76FF |
| 0000037240 | 9AFA | FFFF | 0000 | 4689 | 8BF4 | F446 | 00E9 | 5E00 |

THU MAR 14 17:48:06 1991 TM.EXE PAGE 18, LINE 1004

| | | | | | | | | |
|---|---|---|---|---|---|---|---|---|
| 0000037260 | 835F | 02ED | E58B | 5D1F | CB4D | 581E | 4590 | 8B55 |
| 0000037300 | 1EEC | D88E | EC81 | 0114 | 5657 | C02B | 4689 | 89FC |
| 0000037320 | FA46 | C02B | 8689 | FEF4 | 8689 | FEF2 | 06C7 | 0364 |
| 0000037340 | 001A | 046A | 679A | 003C | 9A00 | 3BD7 | 0000 | 023D |
| 0000037360 | 7400 | E903 | 0011 | 989A | 003A | 0500 | 0026 | 4689 |
| 0000037400 | 89FA | FC56 | 28E9 | 9A00 | 3C3D | 0000 | 8689 | FEEE |
| 0000037420 | 9689 | FEF0 | 868B | FEF0 | 860B | FEEE | 0375 | 0EE9 |
| 0000037440 | 8B00 | EE86 | 8BFE | F096 | 89FE | FA46 | 5689 | 8BFC |
| 0000037460 | FC46 | 460B | 75FA | E903 | 006F | 5D9A | 003D | 0500 |
| 0000037500 | 0006 | 5052 | 76FF | FFFC | FA76 | 681E | 052C | 868D |
| 0000037520 | FEF6 | 5016 | 769A | E10B | 833B | 10C4 | 868D | FEF6 |
| 0000037540 | 5016 | 468D | 16F6 | 9A50 | 30F2 | 0000 | 8689 | FEEC |
| 0000037560 | 013D | 1B00 | F7C0 | 3DD8 | 0000 | 0375 | 20E9 | 8A00 |
| 0000037600 | F946 | E42A | 2C3D | 7400 | E903 | 0013 | C79A | 003C |
| 0000037620 | 0500 | 0006 | 8689 | FEF2 | 9689 | FEF4 | 0AE9 | 2B00 |
| 0000037640 | 89C0 | F486 | 89FE | F286 | FFFE | FC76 | 76FF | FFFA |
| 0000037660 | F486 | FFFE | F2B6 | 9AFE | FFFF | 0000 | 8689 | FEEC |
| 0000037700 | 868B | FEEC | 00E9 | 5E00 | 835F | 02ED | E58B | 5D1F |
| 0000037720 | CB4D | 581E | 4590 | 8B55 | 1EEC | D88E | EC81 | 0110 |
| 0000037740 | 5657 | D89A | 003C | 8900 | F246 | 5689 | 8BF4 | F446 |
| 0000037760 | 460B | 75F2 | E903 | 0066 | 468B | 8BF2 | F456 | 4689 |
| 0000040000 | 89FA | FC56 | 056A | 76FF | FFFC | FA76 | 76FF | FFFC |
| 0000040020 | FA76 | AA9A | 6509 | 833E | 04C4 | 5040 | 468D | 16F6 |
| 0000040040 | 9A50 | 3E88 | 0000 | 4689 | 3DF0 | 0001 | C01B | 3D40 |
| 0000040060 | 0000 | 0375 | 09E9 | 8B00 | F046 | B7E9 | E900 | 001E |
| 0000040100 | 5EC4 | 26F6 | 478B | 8914 | F046 | 013D | 1B00 | 40C0 |
| 0000040120 | 003D | 7500 | E903 | 0006 | 468B | E9F0 | 0096 | 459A |
| 0000040140 | 003E | 8E00 | 83C2 | 26D8 | 478B | 2604 | 470B | 7502 |
| 0000040160 | E903 | 0080 | 4F9A | 003E | 0500 | 0006 | 5052 | 0B9A |
| 0000040200 | 003D | 0500 | 0026 | 5052 | 681E | 0532 | 868D | FEF0 |
| 0000040220 | 5016 | 769A | 7B0B | 833E | 10C4 | 066A | 868D | FEF0 |
| 0000040240 | 5016 | 868D | FEF0 | 5016 | AA9A | 2709 | 833D | 04C4 |
| 0000040260 | 5040 | 468D | 16F6 | 9A50 | 3AFE | 0000 | 4689 | 3DF0 |
| 0000040300 | 0001 | C01B | 3D40 | 0000 | 0375 | 09E9 | 8B00 | F046 |
| 0000040320 | 21E9 | E900 | 001E | 5EC4 | 26F6 | 478B | 8914 | F046 |
| 0000040340 | 013D | 1B00 | 40C0 | 003D | 7500 | E903 | 0006 | 468B |
| 0000040360 | E9F0 | 0000 | 5F5E | ED83 | 8B02 | 1FE5 | 4D5D | 1ECB |
| 0000040400 | 9058 | 5545 | EC8B | 8E1E | 81D8 | 0CEC | 5700 | C756 |
| 0000040420 | 6406 | 1C03 | 6A00 | 9A04 | 3CB5 | 0000 | B39A | 003D |
| 0000040440 | 8900 | F646 | 5689 | 8BF8 | F846 | 460B | 75F6 | E903 |
| 0000040460 | 000F | 468B | 8BF6 | F856 | 4689 | 89FA | FC56 | 08E9 |
| 0000040500 | 2B00 | 89C0 | FC46 | 4689 | FFFA | FC76 | 76FF | 9AFA |
| 0000040520 | FFFF | 0000 | 4689 | 8BF4 | F446 | 00E9 | 5E00 | 835F |
| 0000040540 | 02ED | E58B | 5D1F | CB4D | 581E | 4590 | 8B55 | 1EEC |
| 0000040560 | D88E | EC81 | 0000 | 5657 | 006A | 006A | FF9A | 00FF |
| 0000040600 | E900 | 0000 | 5F5E | ED83 | 8B02 | 1FE5 | 4D5D | 1ECB |
| 0000040620 | 9058 | 5545 | EC8B | 8E1E | 81D8 | 0CEC | 5700 | C756 |
| 0000040640 | 6406 | 1E03 | 6A00 | 9A04 | 3EE8 | 0000 | ED9A | 003E |
| 0000040660 | 8900 | F646 | 5689 | 8BF8 | F846 | 460B | 75F6 | E903 |
| 0000040700 | 000F | 468B | 8BF6 | F856 | 4689 | 89FA | FC56 | 08E9 |
| 0000040720 | 2B00 | 89C0 | FC46 | 4689 | FFFA | FC76 | 76FF | 9AFA |
| 0000040740 | FFFF | 0000 | 4689 | 8BF4 | F446 | 00E9 | 5E00 | 835F |
| 0000040760 | 02ED | E58B | 5D1F | CB4D | 581E | 4590 | 8B55 | 1EEC |
| 0000041000 | D88E | EC81 | 0020 | 5657 | D59A | 003A | 8900 | E246 |
| 0000041020 | 5689 | 0BE4 | 74D0 | E903 | 0006 | 9BB8 | E901 | 0217 |
| 0000041040 | 076A | 006A | 006A | 006A | 468D | 16E6 | 9A50 | 4048 |
| 0000041060 | 0000 | 4689 | 3DE0 | 0001 | C01B | 3D40 | 0000 | 0375 |
| 0000041100 | 09E9 | 8B00 | E046 | EEE9 | E901 | 001E | 5EC4 | 26E6 |
| 0000041120 | 478B | 8914 | E046 | 013D | 1B00 | 40C0 | 003D | 7500 |

THU MAR 14 17:48:06 1991 TM.EXE PAGE 19, LINE 1063

| | | | | | | | | |
|---|---|---|---|---|---|---|---|---|
| 0000041140 | E903 | 0006 | 468B | E9E0 | 01CD | 086A | 006A | 006A |
| 0000041160 | 006A | 468D | 16E6 | 9A50 | 41B8 | 0000 | 4689 | 3DE0 |
| 0000041200 | 0001 | C01B | 3D40 | 0000 | 0375 | D9E9 | 8B00 | E046 |
| 0000041220 | A4E9 | E901 | 001E | 5EC4 | 26E6 | 478B | 8914 | E046 |
| 0000041240 | 013D | 1B00 | 40C0 | 003D | 7500 | E903 | 0006 | 468B |
| 0000041260 | E9E0 | 0183 | 76FF | FFE4 | E276 | 786A | FF9A | 00FF |
| 0000041300 | 8900 | E046 | 7E83 | 01E0 | C01B | 3D40 | 0000 | 0375 |
| 0000041320 | 12E9 | 8100 | E07E | 01B7 | 0375 | 08E9 | FF00 | E076 |
| 0000041340 | 599A | 0041 | 9A00 | 3F7D | 0000 | 4689 | 89FA | FC56 |
| 0000041360 | 76FF | FFFC | FA76 | 006A | 006A | 468D | 16EC | 8D50 |
| 0000041400 | F246 | 5016 | FF9A | 00FF | 8900 | E046 | 7E83 | 01E0 |
| 0000041420 | C01B | 3D40 | 0000 | 0375 | 10E9 | 8100 | E07E | 01BC |
| 0000041440 | 0375 | 06E9 | 8B00 | E046 | 0CE9 | C701 | EA46 | 0000 |
| 0000041460 | 03E9 | FF00 | EA46 | 468B | 39EA | EC46 | 0377 | 4FE9 |
| 0000041500 | 6B00 | EA5E | C424 | F276 | 8A26 | 0340 | E42A | 2C3D |
| 0000041520 | 7400 | E903 | 0037 | 006A | 006A | 5E6B | 24EA | 76C4 |
| 0000041540 | 26F2 | 70FF | 2602 | 30FF | 016A | 468D | 16F6 | 9A50 |
| 0000041560 | FFFF | 0000 | 4689 | 3DE0 | 0001 | C01B | 3D40 | 0000 |
| 0000041600 | 0375 | 08E9 | FF00 | E076 | D29A | 003B | E900 | FFA3 |
| 0000041620 | 76FF | FFF4 | F276 | FB9A | 0041 | 2B00 | 89C0 | F446 |
| 0000041640 | 4689 | FFF2 | E476 | 76FF | 8DE2 | EE46 | 5016 | 199A |
| 0000041660 | 0031 | 8900 | E046 | 013D | 1B00 | 40C0 | 003D | 7500 |
| 0000041700 | E903 | 0006 | 468B | E9E0 | 006D | 056A | 76FF | FFF0 |
| 0000041720 | EE76 | 76FF | FFF0 | EE76 | AA9A | E509 | 833D | 04C4 |
| 0000041740 | 5040 | 468D | 16E6 | 9A50 | 3DF2 | 0000 | 4689 | 3DE0 |
| 0000041760 | 0001 | C01B | 3D40 | 0000 | 0375 | 09E9 | 8B00 | E046 |
| 0000042000 | 34E9 | E900 | 001E | 5EC4 | 26E6 | 478B | 8914 | E046 |
| 0000042020 | 013D | 1B00 | 40C0 | 003D | 7500 | E903 | 0006 | 468B |
| 0000042040 | E9E0 | 0013 | 76FF | FFF0 | EE76 | 769A | 0035 | 2B00 |
| 0000042060 | 89C0 | F046 | 4689 | 5EEE | 835F | 02ED | E58B | 5D1F |
| 0000042100 | CB4D | 581E | 4590 | 8B55 | 1EEC | D88E | EC81 | 0008 |
| 0000042120 | 5657 | B69A | 0040 | 8E00 | 8BC2 | 26D8 | 878B | 0106 |
| 0000042140 | 8B26 | 0897 | 8901 | FA46 | 5689 | FFFC | FC76 | 76FF |
| 0000042160 | 9AFA | FFFF | 0000 | 4689 | 3DF8 | 0001 | C01B | 3D40 |
| 0000042200 | 0000 | 0375 | 06E9 | 8B00 | F846 | 2FE9 | 9A00 | 3FD9 |
| 0000042220 | 0000 | 5052 | 76FF | FFFC | FA76 | FF9A | 00FF | 8900 |
| 0000042240 | F846 | 013D | 1B00 | 40C0 | 003D | 7500 | E903 | 0006 |
| 0000042260 | 468B | E9F8 | 0006 | 00B8 | E900 | 0000 | 5F5E | ED83 |
| 0000042300 | 8B02 | 1FE5 | 4D5D | 1ECB | 9058 | 5545 | EC8B | 8E1E |
| 0000042320 | 81D8 | 44EC | 5701 | C756 | FA46 | 0538 | 5E8C | C7FC |
| 0000042340 | F286 | 0DFE | 2901 | 89C0 | E286 | 89FE | E086 | 8EFE |
| 0000042360 | 0006 | 260C | 3E83 | 2B78 | 7500 | E903 | 001E | 36FF |
| 0000042400 | 0362 | 36FF | 0360 | 868D | FED6 | 5016 | 7B9A | 002A |
| 0000042420 | 8300 | 08C4 | 003D | 7400 | E903 | 000F | 068E | 0C02 |
| 0000042440 | 8326 | 903E | 002B | 0375 | 3DE9 | 1E00 | 3D68 | 8D05 |
| 0000042460 | E486 | 16FE | 8D50 | D686 | 16FE | 8D50 | F646 | 5016 |
| 0000042500 | 5C68 | 1E03 | 9668 | FF05 | 5E36 | FF03 | 5C36 | FF03 |
| 0000042520 | 6236 | FF03 | 6036 | 9A03 | 2AC4 | 0000 | C483 | 891E |
| 0000042540 | F646 | 5689 | E9F8 | 0008 | C02B | 4689 | 89F8 | F646 |
| 0000042560 | 86C7 | FEF4 | 0000 | C02B | 8689 | FEC0 | 8689 | FEBE |
| 0000042600 | BE8D | FEF6 | 42BE | 8C05 | 8ED0 | B9C0 | 0019 | A5F3 |
| 0000042620 | 00B8 | B900 | 00CE | BE8D | FF28 | 0716 | AAF3 | BE8D |
| 0000042640 | FEC2 | 74BE | 8C05 | 8ED0 | B9C0 | 0009 | A5F3 | 8DA4 |
| 0000042660 | F686 | 16FE | 9A50 | 09AA | 4398 | C483 | 8D04 | C28E |
| 0000042700 | 16FE | 8B51 | 9AF0 | 09AA | 43F3 | C483 | 0304 | 46F0 |
| 0000042720 | B689 | FEBC | 868D | FEF4 | 5016 | FF9A | 00FF | 8900 |
| 0000042740 | DE86 | 3DFE | 000F | 0374 | 06E9 | E900 | 0064 | 5EE9 |
| 0000042760 | FF00 | F4B6 | 9AFE | FFFF | 0000 | 8689 | FEBE | 9689 |
| 0000043000 | FEC0 | 8683 | FEBC | 8B05 | BC86 | 05FE | 000C | 003D |

THU MAR 14 17:48:06 1991 TM.EXE PAGE 20, LINE 1122

| | | | | | | | | |
|---|---|---|---|---|---|---|---|---|
| 0000043020 | 7F01 | E903 | 0015 | 681E | 0587 | 868D | FEF6 | 5016 |
| 0000043040 | 049A | AB09 | 8341 | 08C4 | 27E9 | FFD0 | C0B6 | FFFE |
| 0000043060 | BEB6 | 1EFE | 9468 | 8D05 | F686 | 16FE | 9A50 | 0904 |
| 0000043100 | 441A | C483 | 5208 | 9A50 | 0904 | 4431 | C483 | E908 |
| 0000043120 | FF82 | 868D | FEC2 | 5016 | 868D | FEF6 | 5016 | 049A |
| 0000043140 | 8809 | 8343 | 08C4 | 868B | FEC0 | 860B | FEBE | 0375 |
| 0000043160 | BCE9 | 8D00 | F686 | 16FE | 6850 | 4121 | 6C9A | 0032 |
| 0000043200 | 8900 | F086 | 8EFE | 0006 | 260C | 3E83 | 4506 | 7500 |
| 0000043220 | E903 | 000A | BE83 | FEDA | 74FE | E903 | 000F | 068E |
| 0000043240 | 0C02 | 8326 | 1F3E | 0045 | 0375 | 69E9 | 8300 | F0BE |
| 0000043260 | 01FE | 0374 | 06E9 | B800 | 0001 | 03E9 | B800 | 0000 |
| 0000043300 | 8689 | FEDC | B6FF | FEE2 | B6FF | FEE0 | 868D | FEDC |
| 0000043320 | 5016 | B6FF | FEF2 | 76FF | FFFC | FA76 | 8E8D | FEE4 |
| 0000043340 | 5116 | 4E8D | 16F6 | 8D51 | D68E | 16FE | 1E51 | 9668 |
| 0000043360 | 6805 | 037E | 36FF | 035E | 36FF | 035C | 36FF | 0362 |
| 0000043400 | 36FF | 0360 | 6E9A | 0045 | 8300 | 28C4 | 868B | FEDC |
| 0000043420 | A2E9 | E900 | 0016 | BE83 | FEF0 | 7401 | E903 | 0006 |
| 0000043440 | 01B8 | E900 | 0003 | 00B8 | E900 | 0089 | 86E9 | 8E00 |
| 0000043460 | 0006 | 260C | 3E83 | 42C6 | 7500 | E903 | 000A | BE83 |
| 0000043500 | FEDA | 74FE | E903 | 000F | 068E | 0C02 | 8326 | F33E |
| 0000043520 | 0042 | 0375 | 58E9 | C700 | DC86 | 01FE | FF00 | E2B6 |
| 0000043540 | FFFE | E0B6 | 8DFE | DC86 | 16FE | FF50 | F2B6 | FFFE |
| 0000043560 | FC76 | 76FF | 8DFA | E48E | 16FE | 8D51 | F64E | 5116 |
| 0000043600 | 8E8D | FED6 | 5116 | 681E | 0596 | 8068 | FF03 | 5E36 |
| 0000043620 | FF03 | 5C36 | FF03 | 6236 | FF03 | 6036 | 9A03 | FFFF |
| 0000043640 | 0000 | C483 | 8B28 | DC86 | E9FE | 0009 | 06E9 | B800 |
| 0000043660 | 0001 | 00E9 | 5E00 | 835F | 02ED | E58B | 5D1F | CB4D |
| 0000043700 | 581E | 4590 | 8B55 | 1EEC | D88E | EC81 | 0000 | 5657 |
| 0000043720 | B81E | 0761 | D88E | E99A | 0045 | 4800 | 0374 | 00E9 |
| 0000043740 | 9A00 | FFFF | 0000 | 9A50 | FFFF | 0000 | 016A | FF9A |
| 0000043760 | 00FF | 9A00 | 3BB4 | 0000 | 006A | 026A | 046A | 006A |
| 0000044000 | 006A | 239A | 0042 | 5200 | 9A50 | 3B91 | 0000 | 6A50 |
| 0000044020 | 6A00 | 9A00 | 3B9B | 0000 | BA9A | 003C | 3D00 | 0002 |
| 0000044040 | 0374 | 11E9 | 6A00 | 6A00 | 6A00 | 9A00 | 38BD | 4410 |
| 0000044060 | C483 | E906 | 000D | FF6A | 016A | 006A | 006A | B89A |
| 0000044100 | 0039 | 1F00 | 5F5E | ED83 | 8B02 | 1FE5 | 4D5D | 1ECB |
| 0000044120 | 9058 | 5545 | EC8B | 8E1E | 81D8 | 56EC | 5700 | C756 |
| 0000044140 | FA46 | 05BA | 5E8C | C7FC | CE46 | 0101 | C02B | 4689 |
| 0000044160 | 89C0 | BE46 | 068E | 0C04 | 8326 | 5C3E | 0044 | 0375 |
| 0000044200 | 1DE9 | FF00 | B836 | FF05 | B636 | 8D05 | B046 | 5016 |
| 0000044220 | DD9A | 0042 | 8300 | 08C4 | 003D | 7400 | E903 | 000F |
| 0000044240 | 068E | 0C06 | 8326 | FE3E | 0046 | 0375 | 3AE9 | 1E00 |
| 0000044260 | C168 | 8D05 | C246 | 5016 | 468D | 16B0 | 8D50 | D646 |
| 0000044300 | 5016 | 756A | 681E | 05F4 | 36FF | 05B4 | 36FF | 05B2 |
| 0000044320 | 36FF | 05B8 | 36FF | 05B6 | 289A | 0043 | 8300 | 1EC4 |
| 0000044340 | 4689 | 89D6 | D856 | 08E9 | 2B00 | 89C0 | D846 | 4689 |
| 0000044360 | 2BD6 | 89C0 | BC46 | 4689 | 9ABA | FFFF | 0000 | 4689 |
| 0000044400 | 3DB8 | 0001 | C01B | 3D40 | 0000 | 0375 | 7EE9 | 8E00 |
| 0000044420 | 0406 | 260C | 3E83 | 4790 | 7500 | E903 | 0009 | 7E83 |
| 0000044440 | FEB4 | 0374 | 0FE9 | 8E00 | 0606 | 260C | 3E83 | 47A8 |
| 0000044460 | 7500 | E903 | 0051 | 468B | 89B8 | B646 | 76FF | FFC0 |
| 0000044500 | BE76 | 468D | 16B6 | FF50 | CE76 | 76FF | FFFC | FA76 |
| 0000044520 | 4E8D | 16C2 | 8D51 | D64E | 5116 | 4E8D | 16B0 | 1E51 |
| 0000044540 | F468 | 6805 | 0082 | 36FF | 05B4 | 36FF | 05B2 | 36FF |
| 0000044560 | 05B8 | 36FF | 05B6 | F09A | 0047 | 8300 | 28C4 | 468B |
| 0000044600 | E9B6 | 06C6 | 06E9 | 8B00 | B846 | BDE9 | 6A06 | 9A01 |
| 0000044620 | 3B78 | 0000 | 681E | 05C8 | 468D | 16AE | 6A50 | 6A00 |
| 0000044640 | 6A02 | 6A00 | 6A00 | 6A00 | 9A00 | FFFF | 0000 | 4689 |
| 0000044660 | 3DB8 | 0000 | 0375 | 7DE9 | 8E00 | 0406 | 260C | 3E83 |

THU MAR 14 17:48:06 1991 TM.EXE PAGE 21, LINE 1181

| | | | | | | | | |
|---|---|---|---|---|---|---|---|---|
| 0000044700 | 4825 | 7500 | E903 | 0009 | 7E83 | FEB4 | 0374 | 0FE9 |
| 0000044720 | 8E00 | 0606 | 260C | 3E83 | 483D | 7500 | E903 | 0050 |
| 0000044740 | 46C7 | 05B6 | FF00 | C076 | 76FF | 8DBE | B646 | 5016 |
| 0000044760 | 76FF | FFCE | FC76 | 76FF | 8DFA | C24E | 5116 | 4E8D |
| 0000045000 | 16D6 | 8D51 | B04E | 5116 | 681E | 05F4 | 8868 | FF00 |
| 0000045020 | B436 | FF05 | B236 | FF05 | B836 | FF05 | B636 | 9A05 |
| 0000045040 | 4886 | 0000 | C483 | 8B28 | B646 | 1DE9 | E906 | 0006 |
| 0000045060 | 05B8 | E900 | 0614 | 016A | FF68 | 68FF | FFFF | FF9A |
| 0000045100 | 00FF | 8900 | B846 | 003D | 7500 | E903 | 007E | 068E |
| 0000045120 | 0C04 | 8326 | 043E | 0049 | 0375 | 09E9 | 8300 | B47E |
| 0000045140 | 74FE | E903 | 000F | 068E | 0C06 | 8326 | 1C3E | 0049 |
| 0000045160 | 0375 | 51E9 | 8B00 | B846 | 4689 | FFB6 | C076 | 76FF |
| 0000045200 | 8DBE | B646 | 5016 | 76FF | FFCE | FC76 | 76FF | 8DFA |
| 0000045220 | C24E | 5116 | 4E8D | 16D6 | 8D51 | B04E | 5116 | 681E |
| 0000045240 | 05F4 | 8B68 | FF00 | B436 | FF05 | B236 | FF05 | B836 |
| 0000045260 | FF05 | B636 | 9A05 | 4965 | 0000 | C483 | 8B28 | B646 |
| 0000045300 | 87E9 | E905 | 0006 | 468B | E9B8 | 057E | 681E | 05D4 |
| 0000045320 | C29A | C709 | 8348 | 04C4 | 4689 | 89D2 | D456 | 468B |
| 0000045340 | 0BD4 | D246 | 0375 | 16E9 | FF00 | D476 | 76FF | 8DD2 |
| 0000045360 | DA46 | 5016 | 4A9A | DB09 | 8348 | 08C4 | 11E9 | 1E00 |
| 0000045400 | DC68 | 8D05 | DA46 | 5016 | 4A9A | FE09 | 8345 | 08C4 |
| 0000045420 | 468D | 16DA | 1E50 | E168 | 6A05 | 6A03 | 9A01 | FFFF |
| 0000045440 | 0000 | 4689 | 3DB8 | 0000 | 0375 | 7EE9 | 8E00 | 0406 |
| 0000045460 | 260C | 3E83 | 4998 | 7500 | E903 | 0009 | 7E83 | FEB4 |
| 0000045500 | 0374 | 0FE9 | 8E00 | 0606 | 260C | 3E83 | 49B0 | 7500 |
| 0000045520 | E903 | 0051 | 468B | 89B8 | B646 | 76FF | FFC0 | BE76 |
| 0000045540 | 468D | 16B6 | FF50 | CE76 | 76FF | FFFC | FA76 | 4E8D |
| 0000045560 | 16C2 | 8D51 | D64E | 5116 | 4E8D | 16B0 | 1E51 | F468 |
| 0000045600 | 6805 | 0098 | 36FF | 05B4 | 36FF | 05B2 | 36FF | 05B8 |
| 0000045620 | 36FF | 05B6 | FB9A | 0049 | 8300 | 28C4 | 468B | E9B6 |
| 0000045640 | 04A8 | 06E9 | 8B00 | B846 | 9FE9 | 6AD4 | 6A00 | 9A00 |
| 0000045660 | FFFF | 0000 | B99A | 0049 | 3D00 | 0000 | 0375 | 82E9 |
| 0000045700 | 8E00 | 0406 | 260C | 3E83 | 464B | 7500 | E903 | 0009 |
| 0000045720 | 7E83 | FEB4 | 0374 | 0FE9 | 8E00 | 0606 | 260C | 3E83 |
| 0000045740 | 4475 | 7500 | E903 | 0053 | 0C9A | 004A | 8900 | B646 |
| 0000045760 | 76FF | FFC0 | BE76 | 468D | 16B6 | FF50 | CE76 | 76FF |
| 0000046000 | FFFC | FA76 | 4E8D | 16C2 | 8D51 | D64E | 5116 | 4E8D |
| 0000046020 | 16B0 | 1E51 | F468 | 6805 | 009F | 36FF | 05B4 | 36FF |
| 0000046040 | 05B2 | 36FF | 05B8 | 36FF | 05B6 | D59A | 0044 | 8300 |
| 0000046060 | 28C4 | 468B | E9B6 | 0412 | 08E9 | 9A00 | 37A2 | 0000 |
| 0000046100 | 07E9 | 6A04 | 6A00 | 8D00 | BA46 | 5016 | 006A | 006A |
| 0000046120 | 006A | 006A | FF9A | 00FF | 8900 | B846 | FF9A | 00FF |
| 0000046140 | 8900 | B846 | 003D | 7500 | E903 | 007E | 068E | 0C04 |
| 0000046160 | 8326 | E63E | 0046 | 0375 | 09E9 | 8300 | B47E | 74FE |
| 0000046200 | E903 | 000F | 068E | 0C06 | 8326 | 773E | 0046 | 0375 |
| 0000046220 | 51E9 | 8B00 | B846 | 4689 | FFB6 | C076 | 76FF | 8DBE |
| 0000046240 | B646 | 5016 | 76FF | FFCE | FC76 | 76FF | 8DFA | C24E |
| 0000046260 | 5116 | 4E8D | 16D6 | 8D51 | B04E | 5116 | 681E | 05F4 |
| 0000046300 | A468 | FF00 | B436 | FF05 | B236 | FF05 | B836 | FF05 |
| 0000046320 | B636 | 9A05 | 4747 | 0000 | C483 | 8B28 | B646 | 69E9 |
| 0000046340 | E903 | 0006 | 468B | E9B8 | 0360 | 036A | 681E | 05ED |
| 0000046360 | 3B9A | 0039 | 6800 | 4AF9 | FF68 | 9AFF | FFFF | 0000 |
| 0000046400 | 46C7 | 01D0 | E900 | 0003 | 46FF | 8BD0 | 0646 | 4639 |
| 0000046420 | 7CD0 | E903 | 0034 | 5E8B | C1D0 | 02E3 | 76C4 | 2608 |
| 0000046440 | 70FF | 2602 | 30FF | D69A | A330 | 8348 | 04C4 | 4689 |
| 0000046460 | 3DB8 | 0001 | C01B | 3D40 | 0000 | 0375 | 08E9 | FF00 |
| 0000046500 | B876 | B19A | 0040 | E900 | FFBE | 7E83 | 0106 | 037F |
| 0000046520 | B2E9 | 8300 | B87E | 1B01 | F7C0 | 3DD8 | 0000 | 0375 |
| 0000046540 | A2E9 | 6A00 | 8B5C | 0676 | E6C1 | C402 | 085E | FF26 |

THU MAR 14 17:48:06 1991 TM.EXE PAGE 22, LINE 1240

| | | | | | | | | |
|---|---|---|---|---|---|---|---|---|
| 0000046560 | FE70 | FF26 | FC70 | EA9A | 7B0B | 834B | 06C4 | 4689 |
| 0000046600 | 89AA | AC56 | D00B | 0375 | 0AE9 | C400 | AA5E | C626 |
| 0000046620 | 0007 | 32E9 | 6A00 | 8B3A | 0676 | E6C1 | C402 | 085E |
| 0000046640 | FF26 | FE70 | FF26 | FC70 | EA9A | C60B | 834A | 06C4 |
| 0000046660 | 4689 | 89AA | AC56 | D00B | 0375 | 0AE9 | FF00 | AA46 |
| 0000046700 | 5EC4 | 26AA | 07C6 | 8B00 | AC46 | 460B | 75AA | E903 |
| 0000046720 | 0033 | 768B | C106 | 02E6 | 5EC4 | 2608 | 70FF | 26FE |
| 0000046740 | 70FF | 6AFC | 6A00 | 9A00 | 2EDB | 0000 | 4689 | 3DB8 |
| 0000046760 | 0001 | C01B | 3D40 | 0000 | 0375 | 08E9 | FF00 | B876 |
| 0000047000 | 139A | 004B | 9A00 | 4FA8 | 4C7F | FF68 | 68FF | FFFF |
| 0000047020 | FF9A | 00FF | 9A00 | FFFF | 0000 | 4689 | 3DB8 | 0000 |
| 0000047040 | 0375 | 7EE9 | 8E00 | 0406 | 260C | 3E83 | 4A43 | 7500 |
| 0000047060 | E903 | 0009 | 7E83 | FEB4 | 0374 | 0FE9 | 8E00 | 0606 |
| 0000047100 | 260C | 3E83 | 4A5B | 7500 | E903 | 0051 | 468B | 89B8 |
| 0000047120 | B646 | 76FF | FFC0 | BE76 | 468D | 16B6 | FF50 | CE76 |
| 0000047140 | 76FF | FFFC | FA76 | 4E8D | 16C2 | 8D51 | D64E | 5116 |
| 0000047160 | 4E8D | 16B0 | 1E51 | F468 | 6805 | 00C1 | 36FF | 05B4 |
| 0000047200 | 36FF | 05B2 | 36FF | 05B8 | 36FF | 05B6 | A49A | 004A |
| 0000047220 | 8300 | 28C4 | 468B | E9B6 | 01B0 | 06E9 | 8B00 | B846 |
| 0000047240 | A7E9 | 6A01 | 6A00 | 6800 | 1000 | 006A | 006A | 8768 |
| 0000047260 | 684C | FFFF | 689A | 490A | 834B | 0EC4 | 7440 | E903 |
| 0000047300 | 007D | 068E | 0C04 | 8326 | 263E | 004D | 0375 | 09E9 |
| 0000047320 | 8300 | B47E | 74FE | E903 | 000F | 068E | 0C06 | 8326 |
| 0000047340 | 3E3E | 004D | 0375 | 50E9 | C700 | B646 | 0005 | 76FF |
| 0000047360 | FFC0 | BE76 | 468D | 16B6 | FF50 | CE76 | 76FF | FFFC |
| 0000047400 | FA76 | 4E8D | 16C2 | 8D51 | D64E | 5116 | 4E8D | 16B0 |
| 0000047420 | 1E51 | F468 | 6805 | 00C4 | 36FF | 05B4 | 36FF | 05B2 |
| 0000047440 | 36FF | 05B8 | 36FF | 05B6 | 879A | 004D | 8300 | 28C4 |
| 0000047460 | 468B | E9B6 | 0114 | 06E9 | B800 | 0005 | 0BE9 | 9A01 |
| 0000047500 | 45C4 | 0000 | 4689 | 3DB8 | 0000 | 0375 | 7EE9 | 8E00 |
| 0000047520 | 0406 | 260C | 3E83 | 4DA4 | 7500 | E903 | 0009 | 7E83 |
| 0000047540 | FEB4 | 0374 | 0FE9 | 8E00 | 0606 | 260C | 3E83 | 4DBC |
| 0000047560 | 7500 | E903 | 0051 | 468B | 89B8 | B646 | 76FF | FFC0 |
| 0000047600 | BE76 | 468D | 16B6 | FF50 | CE76 | 76FF | FFFC | FA76 |
| 0000047620 | 4E8D | 16C2 | 8D51 | D64E | 5116 | 4E8D | 16B0 | 1E51 |
| 0000047640 | F468 | 6805 | 00C8 | 36FF | 05B4 | 36FF | 05B2 | 36FF |
| 0000047660 | 05B8 | 36FF | 05B6 | 049A | 004E | 8300 | 28C4 | 468B |
| 0000047700 | E9B6 | 0086 | 06E9 | 8B00 | B846 | 7DE9 | 8E00 | 0406 |
| 0000047720 | 260C | 3E83 | 4BFC | 7500 | E903 | 0009 | 7E83 | FEB4 |
| 0000047740 | 0374 | 0FE9 | 8E00 | 0606 | 260C | 3E83 | 4C14 | 7500 |
| 0000047760 | E903 | 0050 | 46C7 | 00B6 | FF00 | C076 | 76FF | 8DBE |
| 0000050000 | B646 | 5016 | 76FF | FFCE | FC76 | 76FF | 8DFA | C24E |
| 0000050020 | 5116 | 4E8D | 16D6 | 8D51 | B04E | 5116 | 681E | 05F4 |
| 0000050040 | CA68 | FF00 | B436 | FF05 | B236 | FF05 | B836 | FF05 |
| 0000050060 | B636 | 9A05 | 4C5D | 0000 | C483 | 8B28 | B646 | 09E9 |
| 0000050100 | E900 | 0006 | 00B8 | E900 | 0000 | 5F5E | ED83 | 8B02 |
| 0000050120 | 1FE5 | 4D5D | 1ECB | 9058 | 5545 | EC8B | 8E1E | 81D8 |
| 0000050140 | 26EC | 5700 | C756 | FA46 | 05FC | 5E8C | C7FC | F446 |
| 0000050160 | 0000 | C02B | 4689 | 89E6 | E446 | 068E | 0C04 | 8326 |
| 0000050200 | 403E | 004F | 0375 | 1DE9 | FF00 | B836 | FF05 | B636 |
| 0000050220 | 8D05 | DA46 | 5016 | 619A | 0046 | 8300 | 08C4 | 003D |
| 0000050240 | 7400 | E903 | 000F | 068E | 0C06 | 8326 | 583E | 004F |
| 0000050260 | 0375 | 3BE9 | 1E00 | 0068 | 8D06 | E846 | 5016 | 468D |
| 0000050300 | 16DA | 8D50 | F646 | 5016 | D668 | 1E00 | 0468 | FF06 |
| 0000050320 | B436 | FF05 | B236 | FF05 | B836 | FF05 | B636 | 9A05 |
| 0000050340 | 46A9 | 0000 | C483 | 891E | F646 | 5689 | E9F8 | 0008 |
| 0000050360 | C02B | 4689 | 89F8 | F646 | A79A | 0045 | E900 | 001C |
| 0000050400 | 939A | E135 | E94E | 0023 | 006A | 006A | 006A | BD9A |
| 0000050420 | D838 | 834B | 06C4 | 12E9 | E900 | 000F | 7548 | E903 |

THU MAR 14 17:48:06 1991 TM.EXE PAGE 23, LINE 1299

| | | | | | | | | |
|---|---|---|---|---|---|---|---|---|
| 0000050440 | FFDE | 7548 | E903 | FFE0 | 00E9 | 6A00 | 6AFF | 6A01 |
| 0000050460 | 6A00 | 9A00 | 460F | 0000 | 4689 | 9AE2 | FFFF | 0000 |
| 0000050500 | 4689 | 9AE2 | FFFF | 0000 | 4689 | C7E2 | 8406 | 070D |
| 0000050520 | C700 | 8806 | 000D | C700 | 8606 | 010D | 1E00 | 7868 |
| 0000050540 | 9A0D | FFFF | 0000 | 4689 | 8EE2 | 0406 | 260C | 3E83 |
| 0000050560 | 4C99 | 7500 | E903 | 0009 | 7E83 | FEDE | 0374 | 0FE9 |
| 0000050600 | 8E00 | 0606 | 260C | 3E83 | 4CB1 | 7500 | E903 | 0039 |
| 0000050620 | 468D | 16E8 | 8D50 | F646 | 5016 | 468D | 16DA | 1E50 |
| 0000050640 | 0468 | 6806 | 00EB | 36FF | 05B4 | 36FF | 05B2 | 36FF |
| 0000050660 | 05B8 | 36FF | 05B6 | BF9A | 002B | 8300 | 1AC4 | 46C7 |
| 0000050700 | 00E0 | E900 | 0006 | 03E9 | E900 | 0000 | 5F5E | ED83 |
| 0000050720 | 8B02 | 1FE5 | 4D5D | 00CB | 581E | 4590 | 8B55 | 1EEC |
| 0000050740 | D88E | EC81 | 000A | 5657 | 059A | 0037 | 8E00 | 8BC2 |
| 0000050760 | 26D8 | 478B | 8E08 | 0806 | 260C | 04A3 | 6A00 | 6A00 |
| 0000051000 | 6A00 | 1E03 | 0E68 | 8D06 | F646 | 5016 | 099A | 0050 |
| 0000051020 | 8900 | F846 | 013D | 1B00 | F7C0 | 3DD8 | 0000 | 0375 |
| 0000051040 | 06E9 | 8B00 | F646 | 66A3 | 6A06 | 6A00 | 6A00 | 1E03 |
| 0000051060 | 2768 | 8D06 | F646 | 5016 | 359A | 0050 | 8900 | F846 |
| 0000051100 | 013D | 1B00 | F7C0 | 3DD8 | 0000 | 0375 | 06E9 | 8B00 |
| 0000051120 | F646 | 68A3 | 6A06 | 6A00 | 6A00 | 1E01 | 4168 | 8D06 |
| 0000051140 | FA46 | 5016 | FF9A | 00FF | 8900 | F846 | 013D | 1B00 |
| 0000051160 | F7C0 | 3DD8 | 0000 | 0375 | 06E9 | 8A00 | FA46 | 64A2 |
| 0000051200 | 5E06 | 835F | 02ED | E58B | 5D1F | CB4D | 581E | 4590 |
| 0000051220 | 8B55 | 1EEC | D88E | EC81 | 0000 | 5657 | 681E | 0D98 |
| 0000051240 | FF9A | 00FF | C600 | 9006 | 000D | 64A0 | A206 | 0D96 |
| 0000051260 | 5F5E | ED83 | 8B02 | 1FE5 | 4D5D | 1ECB | 9058 | 5545 |
| 0000051300 | EC8B | 8E1E | 81D8 | 06EC | 5700 | FF56 | 0876 | 76FF |
| 0000051320 | 9A06 | FFFF | 0000 | 5EC4 | 2606 | 478B | 890C | FC46 |
| 0000051340 | 7E83 | 00FC | 0374 | 06E9 | B800 | 0000 | F6E9 | 8301 |
| 0000051360 | FC7E | 7415 | E903 | 0006 | 00B8 | E900 | 01E7 | 7E83 |
| 0000051400 | 09FC | 0375 | 20E9 | 8300 | FC7E | 750A | E903 | 0017 |
| 0000051420 | 7E83 | 0BFC | 0375 | 0EE9 | 8300 | FC7E | 7519 | E903 |
| 0000051440 | 0005 | 419A | 0A59 | 8B51 | FC46 | 58E9 | 8301 | 5A3E |
| 0000051460 | 0106 | 0374 | 05E9 | 9A00 | 5941 | 5132 | 3E83 | 065A |
| 0000051500 | 7500 | E903 | 000B | 06C6 | 0D90 | C700 | 5A06 | 0006 |
| 0000051520 | 8B00 | 0646 | 568B | 0508 | 0012 | 5052 | 76FF | 9AFC |
| 0000051540 | 52C0 | 515E | C483 | 8906 | FA46 | 013D | 1B00 | 40C0 |
| 0000051560 | 003D | 7500 | E903 | 0006 | 468B | E9FA | 0167 | 5EE9 |
| 0000051600 | 8301 | 5A3E | 0006 | 0374 | 05E9 | 9A00 | 5941 | 5183 |
| 0000051620 | 3E83 | 065A | 7501 | E903 | 000B | 06C6 | 0D90 | C700 |
| 0000051640 | 5A06 | 0106 | 8B00 | 0646 | 568B | 0508 | 0012 | 5052 |
| 0000051660 | 199A | B05A | 8351 | 04C4 | 4689 | 3DFA | 0001 | C01B |
| 0000051700 | 3D40 | 0000 | 0375 | 06E9 | 8B00 | FA46 | 16E9 | E901 |
| 0000051720 | 010D | 468B | 8B06 | 0856 | 1205 | 5200 | 9A50 | 5AF7 |
| 0000051740 | 51C6 | C483 | E904 | 00F7 | 468B | 8B06 | 0856 | 1205 |
| 0000051760 | 5200 | 9A50 | 5BAE | 51DC | C483 | E904 | 00E1 | 468B |
| 0000052000 | 8B06 | 0856 | 1205 | 5200 | 9A50 | 5C0B | 51FC | C483 |
| 0000052020 | E904 | 00C8 | 016A | 1D9A | 0052 | 8900 | FA46 | 5EC4 |
| 0000052040 | 2606 | 77FF | 2616 | 77FF | 9A14 | 36EB | 4ED3 | C483 |
| 0000052060 | 8904 | FA46 | 013D | 1B00 | 40C0 | 003D | 7500 | E903 |
| 0000052100 | 0008 | 76FF | 9AFA | 4BD1 | 0000 | 006A | 609A | 0047 |
| 0000052120 | 8900 | FA46 | 88E9 | C400 | 065E | FF26 | 1477 | 169A |
| 0000052140 | 0052 | E900 | 0079 | 76FF | FF08 | 0676 | FF9A | 00FF |
| 0000052160 | E900 | 006B | 76FF | FF08 | 0676 | FF9A | 00FF | E900 |
| 0000052200 | 005D | 5AE9 | 3D00 | 0019 | 0375 | 71E9 | 7EFF | E903 |
| 0000052220 | 001D | 092D | 3D00 | 0004 | 0376 | 42E9 | D100 | 93E0 |
| 0000052240 | FF2E | 75A7 | FD52 | FD50 | 5150 | A251 | B851 | 3D51 |
| 0000052260 | 0033 | 0375 | AFE9 | 7EFF | E903 | 000B | 212D | 7500 |
| 0000052300 | E903 | FF50 | 18E9 | 2D00 | 0046 | 037D | 10E9 | 4800 |

THU MAR 14 17:48:06 1991 TM.EXE PAGE 24, LINE 1358

| | | | | | | | | |
|---|---|---|---|---|---|---|---|---|
| 0000052320 | 037F | 9FE9 | 48FF | 7548 | E903 | FF7B | 00E9 | B800 |
| 0000052340 | 0000 | 00E9 | 5E00 | 835F | 02ED | E58B | 5D1F | CB4D |
| 0000052360 | 581E | 4590 | 8B55 | 1EEC | D88E | EC81 | 0034 | 5657 |
| 0000052400 | 3E83 | 065A | 7400 | E903 | 0036 | B99A | 004F | 8E00 |
| 0000052420 | 8BC2 | 26D8 | 078B | 4689 | 6ACC | FF00 | CC76 | 468B |
| 0000052440 | D1CC | 2BE8 | C4D2 | 085E | 0326 | 0247 | 1326 | 0457 |
| 0000052460 | 5052 | FE9A | 530C | 8953 | CE46 | 5689 | E9D0 | 0011 |
| 0000052500 | 5EC4 | 2608 | 478B | 2602 | 578B | 8904 | CE46 | 5689 |
| 0000052520 | 8BD0 | D046 | 460B | 75CE | E903 | 0094 | 5EA1 | 0B06 |
| 0000052540 | 5C06 | 7406 | E903 | 0088 | 76FF | FFD0 | CE76 | 3E83 |
| 0000052560 | 065A | 1B01 | 25C0 | 0020 | 5405 | 5000 | 681E | 0670 |
| 0000052600 | 468D | 16D8 | 9A50 | 0B76 | 5360 | C483 | 9A0E | 58BB |
| 0000052620 | 536A | 468D | 16D8 | 9A50 | 09AA | 53E6 | C483 | 0004 |
| 0000052640 | 9006 | 8D0D | D846 | 5016 | 006A | A89A | 0038 | C400 |
| 0000052660 | 085E | 8B26 | 0847 | 0B26 | 0647 | 0375 | 31E9 | C700 |
| 0000052700 | F646 | 0002 | 90A0 | 880D | F846 | 5EC4 | 2608 | 478B |
| 0000052720 | 2606 | 578B | 8908 | FA46 | 5689 | 1EFC | 9868 | FF0D |
| 0000052740 | FC76 | 76FF | FFFA | F876 | 76FF | 9AF6 | FFFF | 0000 |
| 0000052760 | 3E83 | 065A | 7400 | E903 | 003B | 068E | 0C08 | 8326 |
| 0000053000 | 043E | 0000 | 0375 | 2CE9 | C400 | 085E | 8A26 | 5007 |
| 0000053020 | 76FF | 9A06 | 56C7 | 540F | C483 | 8904 | D246 | 013D |
| 0000053040 | 1B00 | 40C0 | 003D | 7500 | E903 | 0006 | 468B | E9D2 |
| 0000053060 | 00B5 | 42E9 | C400 | 085E | 8A26 | 5007 | C29A | AF54 |
| 0000053100 | 8354 | 02C4 | 4689 | 3DD2 | 0001 | C01B | 3D40 | 0000 |
| 0000053120 | 0375 | 06E9 | 8B00 | D246 | 8CE9 | FE00 | 9006 | 830D |
| 0000053140 | 067E | 7409 | E903 | 0005 | 2DB0 | 02E9 | B000 | 502B |
| 0000053160 | 006A | FF9A | 00FF | 8300 | 5A3E | 0006 | 0374 | 17E9 |
| 0000053200 | C400 | 085E | 8A26 | 5007 | 468D | 16D4 | 9A50 | FFFF |
| 0000053220 | 0000 | 4689 | E9D2 | 0014 | 5EC4 | 2608 | 078A | 8D50 |
| 0000053240 | D446 | 5016 | FF9A | 00FF | 8900 | D246 | 3E80 | 0D90 |
| 0000053260 | 7232 | E903 | 0026 | 7E83 | 0906 | 0374 | 22E9 | 8300 |
| 0000053300 | D27E | 1B01 | F7C0 | 3DD8 | 0000 | 0375 | 12E9 | C400 |
| 0000053320 | D45E | 8326 | 187F | 7500 | E903 | 0005 | 419A | F559 |
| 0000053340 | B850 | 0000 | 00E9 | 5E00 | 835F | 02ED | E58B | 5D1F |
| 0000053360 | CB4D | 581E | 4590 | 8B55 | 1EEC | D88E | EC81 | 000E |
| 0000053400 | 5657 | 3E83 | 065A | 7400 | E903 | 009E | 468A | 5006 |
| 0000053420 | 468D | 16F6 | 9A50 | 545E | 0000 | 4689 | 3DF4 | 0001 |
| 0000053440 | C01B | 3D40 | 0000 | 0375 | 06E9 | 8B00 | F446 | BBE9 |
| 0000053460 | 8301 | 603E | 0006 | 0374 | 17E9 | 8300 | 623E | 0006 |
| 0000053500 | 0375 | 1FE9 | C400 | F65E | 8326 | 307F | 7500 | E903 |
| 0000053520 | 0012 | 468B | 8BF6 | F856 | 1A05 | 8900 | FA46 | 5689 |
| 0000053540 | E9FC | 000C | 468B | 8BF6 | F856 | 4689 | 89FA | FC56 |
| 0000053560 | 3E83 | 0668 | 7400 | E903 | 002D | 3E83 | 0660 | 7500 |
| 0000053600 | E903 | 0023 | 3E83 | 0662 | 7500 | E903 | 0019 | 5EC4 |
| 0000053620 | 26F6 | 7F83 | 0030 | 0375 | 0CE9 | 8B00 | F646 | 568B |
| 0000053640 | 89F8 | FA46 | 5689 | E9FC | 0031 | 468A | 5006 | 468D |
| 0000053660 | 16F6 | 9A50 | 5475 | 0000 | 4689 | 3DF4 | 0001 | C01B |
| 0000053700 | 3D40 | 0000 | 0375 | 06E9 | 8B00 | F446 | 1DE9 | 8B01 |
| 0000053720 | F646 | 568B | 89F8 | FA46 | 5689 | 9AFC | 58BB | 5305 |
| 0000053740 | 5EC4 | 26FA | 7F80 | 0001 | 0374 | 9BE9 | C400 | FA5E |
| 0000053760 | 8026 | 5C3F | 0375 | 6DE9 | C400 | FA5E | 8026 | 223F |
| 0000054000 | 0375 | 61E9 | C400 | FA5E | 8026 | 2D3F | 0375 | 55E9 |
| 0000054020 | A100 | 065E | 060B | 065C | 0374 | 28E9 | C400 | FA5E |
| 0000054040 | 8026 | 3C3F | 0375 | 0CE9 | C400 | FA5E | 8026 | 2B3F |
| 0000054060 | 0374 | 08E9 | C700 | F246 | 0001 | 05E9 | C700 | F246 |
| 0000054100 | 0000 | 18E9 | C400 | FA5E | 8026 | 3E3F | 0374 | 06E9 |
| 0000054120 | B800 | 0001 | 03E9 | B800 | 0000 | 4689 | 83F2 | F27E |
| 0000054140 | 7500 | E903 | 000D | 06FE | 0D90 | 5C6A | 006A | 519A |
| 0000054160 | 0056 | FE00 | 9006 | C40D | FA5E | 8A26 | 5007 | 006A |

THU MAR 14 17:48:06 1991 TM.EXE PAGE 25, LINE 1417

| | | | | | | | | |
|---|---|---|---|---|---|---|---|---|
| 0000054200 | 6D9A | 0056 | E900 | 005E | 5EA1 | 0B06 | 5C06 | 7406 |
| 0000054220 | E903 | 000D | 06FE | 0D90 | 3C6A | 006A | 7A9A | 0056 |
| 0000054240 | FE00 | 9006 | 6A0D | 6A6B | 9A00 | 56B2 | 0000 | 76FF |
| 0000054260 | FFFC | FA76 | AA9A | AE09 | 8355 | 04C4 | 0600 | 0D90 |
| 0000054300 | 76FF | FFFC | FA76 | 006A | 7B9A | 0053 | A100 | 065E |
| 0000054320 | 060B | 065C | 0374 | 0DE9 | FE00 | 9006 | 6A0D | 6A3E |
| 0000054340 | 9A00 | 5443 | 0000 | 00B8 | E900 | 0000 | 5F5E | ED83 |
| 0000054360 | 8B02 | 1FE5 | 4D5D | 1ECB | 9058 | 5545 | EC8B | 8E1E |
| 0000054400 | 81D8 | 08EC | 5700 | 8A56 | 0846 | 8D50 | FA46 | 5016 |
| 0000054420 | E69A | 0054 | 8900 | F846 | 013D | 1B00 | 40C0 | 003D |
| 0000054440 | 7500 | E903 | 0006 | 468B | E9F8 | 0143 | 5EC4 | 26FA |
| 0000054460 | 478B | E916 | 0118 | 7E83 | 0906 | 0374 | 3CE9 | A100 |
| 0000054500 | 065E | 060B | 065C | 0375 | 0DE9 | FE00 | 9006 | 6A0D |
| 0000054520 | 6A2D | 9A00 | 5771 | 0000 | 468A | 5008 | C29A | 6654 |
| 0000054540 | 8357 | 02C4 | 4689 | 3DF8 | 0001 | C01B | 3D40 | 0000 |
| 0000054560 | 0375 | 06E9 | 8B00 | F846 | F4E9 | E900 | 00EB | 7E83 |
| 0000054600 | 0906 | 0374 | 60E9 | A100 | 065E | 060B | 065C | 0374 |
| 0000054620 | 15E9 | 9A00 | 58BB | 578C | 06FE | 0D90 | 3C6A | 006A |
| 0000054640 | 819A | 0057 | E900 | 000D | 06FE | 0D90 | 2D6A | 006A |
| 0000054660 | E49A | 0057 | 8400 | 0846 | 9A50 | 5CBD | 5798 | C483 |
| 0000054700 | 8A02 | 0846 | 9A50 | 54C2 | 57CA | C483 | 8902 | F846 |
| 0000054720 | 013D | 1B00 | 40C0 | 003D | 7500 | E903 | 0006 | 468B |
| 0000054740 | E9F8 | 008B | 31E9 | A100 | 065E | 060B | 065C | 0375 |
| 0000054760 | 25E9 | 8A00 | 0846 | 9A50 | 5DBA | 5687 | C483 | A102 |
| 0000055000 | 065E | 060B | 065C | 0374 | 0DE9 | FE00 | 9006 | 6A0D |
| 0000055020 | 6A3E | 9A00 | 563F | 0000 | 4EE9 | 8300 | 067E | 7409 |
| 0000055040 | E903 | 0006 | 01B8 | E900 | 0003 | 00B8 | A300 | 0660 |
| 0000055060 | 36E9 | 8300 | 067E | 7409 | E903 | 000C | 3E83 | 0662 |
| 0000055100 | 1B01 | F7C0 | A3D8 | 0662 | 1EE9 | E900 | 001B | 7548 |
| 0000055120 | E903 | FEE2 | 7548 | E903 | FF24 | 7548 | E903 | FFBB |
| 0000055140 | 7548 | E903 | FFCD | 00E9 | B800 | 0000 | 00E9 | 5E00 |
| 0000055160 | 835F | 02ED | E58B | 5D1F | CB4D | 581E | 4590 | 8B55 |
| 0000055200 | 1EEC | D88E | EC81 | 0006 | 5657 | 5EA1 | 0B06 | 5C06 |
| 0000055220 | 7506 | E903 | 000D | 06FE | 0D90 | 3E6A | 006A | 249A |
| 0000055240 | 0057 | A100 | 065E | 060B | 065C | 0375 | 31E9 | A100 |
| 0000055260 | 065C | 168B | 065E | 4689 | 89FA | FC56 | 1EC4 | 065C |
| 0000055300 | 8B26 | 0247 | 8B26 | 0457 | 5CA3 | 8906 | 5E16 | FF06 |
| 0000055320 | FC76 | 76FF | 9AFA | 08FA | 572F | C483 | E904 | FFC3 |
| 0000055340 | 5F5E | ED83 | 8B02 | 1FE5 | 4D5D | 1ECB | 9058 | 5545 |
| 0000055360 | EC8B | 8E1E | 81D8 | 00EC | 5700 | 8356 | 6A3E | 0006 |
| 0000055400 | 0374 | 5BE9 | A100 | 065A | 3FE9 | 1E00 | 7768 | 9A06 |
| 0000055420 | 09AA | 5900 | C483 | 0004 | 9006 | 1E0D | 7F68 | 6A06 |
| 0000055440 | 9A00 | 5910 | 0000 | 31E9 | 1E00 | 8768 | 9A06 | 09AA |
| 0000055460 | 58A8 | C483 | 0004 | 9006 | 1E0D | 9068 | 6A06 | 9A00 |
| 0000055500 | 5699 | 0000 | 13E9 | E900 | 0010 | C00B | 0375 | BAE9 |
| 0000055520 | 48FF | 0375 | D2E9 | E9FF | 0000 | 06C7 | 066A | 0001 |
| 0000055540 | 00B8 | E900 | 0000 | 5F5E | ED83 | 8B02 | 1FE5 | 4D5D |
| 0000055560 | 1ECB | 9058 | 5545 | EC8B | 8E1E | 81D8 | 26EC | 5700 |
| 0000055600 | C756 | DA46 | 0000 | 3E83 | 066A | 7400 | E903 | 0006 |
| 0000055620 | 00B8 | E900 | 00A8 | 4A9A | AE58 | 8359 | 9E3E | 000D |
| 0000055640 | 0375 | 5EE9 | 1E00 | 9868 | 8D0D | FA46 | 5016 | FF9A |
| 0000055660 | 00FF | 8900 | DA46 | 013D | 1B00 | 40C0 | 003D | 7500 |
| 0000055700 | E903 | 0008 | C02B | 4689 | 89FC | FA46 | 76FF | FFFC |
| 0000055720 | FA76 | 681E | 0699 | 468D | 16DC | 9A50 | 0B76 | 59BB |
| 0000055740 | C483 | 8D0C | DC46 | 5016 | AA9A | DA09 | 8359 | 04C4 |
| 0000055760 | 0600 | 0D90 | 468D | 16DC | 6A50 | 9A00 | 59EA | 0000 |
| 0000056000 | 1BE9 | 1E00 | A368 | 9A06 | 09AA | 58E2 | C483 | 0004 |
| 0000056020 | 9006 | 1E0D | A868 | 6A06 | 9A00 | 58F2 | 0000 | 681E |
| 0000056040 | 0D98 | 719A | 0050 | C600 | 9006 | 000D | 06C7 | 065A |

THU MAR 14 17:48:06 1991 TM.EXE PAGE 26, LINE 1476

| | | | | | | | | |
|---|---|---|---|---|---|---|---|---|
| 0000056060 | 0002 | 06C7 | 066A | 0000 | 468B | E9DA | 0000 | 5F5E |
| 0000056100 | ED83 | 8B02 | 1FE5 | 4D5D | 1ECB | 9058 | 5545 | EC8B |
| 0000056120 | 8E1E | 81D8 | 16EC | 5700 | 8B56 | 0646 | 568B | 0508 |
| 0000056140 | 0002 | 8D1E | F07E | F08B | 0716 | DA8E | A5A5 | A5A5 |
| 0000056160 | C71F | FC46 | 0000 | 03E9 | FF00 | FC46 | 7E83 | 08FC |
| 0000056200 | 037C | 88E9 | 8A00 | FC4E | 96A0 | D20D | 25E8 | 0001 |
| 0000056220 | 4689 | 8AEA | FC4E | 5EC4 | 2606 | 078A | E8D2 | 0125 |
| 0000056240 | 8900 | FA46 | 468B | 39FA | EA46 | 0375 | 5BE9 | 8B00 |
| 0000056260 | FA46 | 0639 | 0666 | 0374 | 06E9 | B800 | 0009 | 03E9 |
| 0000056300 | B800 | 000A | 4689 | 8AEC | FC4E | 01B0 | E0D2 | 4688 |
| 0000056320 | 8DEE | EE46 | 5016 | 76FF | 9AEC | 52C0 | 5969 | C483 |
| 0000056340 | 8906 | F846 | 013D | 1B00 | 40C0 | 003D | 7500 | E903 |
| 0000056360 | 0006 | 468B | E9F8 | 0024 | 00B8 | BA00 | 0000 | 4689 |
| 0000056400 | 89F4 | F656 | 4689 | 89F0 | F256 | 6CE9 | C4FF | 065E |
| 0000056420 | 8A26 | A207 | 0D96 | 00B8 | E900 | 0000 | 5F5E | ED83 |
| 0000056440 | 8B02 | 1FE5 | 4D5D | 1ECB | 9058 | 5545 | EC8B | 8E1E |
| 0000056460 | 81D8 | 56EC | 5700 | C456 | 065E | 8026 | 0E3F | 0374 |
| 0000056500 | 23E9 | C400 | 065E | 8026 | 017F | 7419 | E903 | 000B |
| 0000056520 | 46C7 | ADAA | 8C06 | AC5E | 08E9 | C700 | AA46 | 06BE |
| 0000056540 | 5E8C | E9AC | 0020 | 5EC4 | 2606 | 7F80 | 1901 | 0374 |
| 0000056560 | 0BE9 | C700 | AA46 | 06CD | 5E8C | E9AC | 0008 | 46C7 |
| 0000056600 | DEAA | 8C06 | AC5E | 5EC4 | 2606 | 77FF | 260A | 77FF |
| 0000056620 | C408 | 065E | FF26 | 0677 | 5EC4 | 2606 | 77FF | FF04 |
| 0000056640 | AC76 | 76FF | 1EAA | ED68 | 8D06 | AE46 | 5016 | 769A |
| 0000056660 | 8E0B | 835B | 14C4 | 468D | 16AE | 9A50 | 09AA | 5AAC |
| 0000056700 | C483 | 0004 | 9006 | 8D0D | AE46 | 5016 | 006A | CC9A |
| 0000056720 | 0059 | 5E00 | 835F | 02ED | E58B | 5D1F | CB4D | 581E |
| 0000056740 | 4590 | 8B55 | 1EEC | D88E | EC81 | 0056 | 5657 | 5EC4 |
| 0000056760 | 2606 | 078B | 4689 | C7FA | FC46 | 0000 | 76FF | FFFC |
| 0000057000 | FA76 | 681E | 06FF | 468D | 16AA | 9A50 | 0B76 | 5BEB |
| 0000057020 | C483 | 8D0C | AA46 | 5016 | AA9A | 8109 | 835B | 04C4 |
| 0000057040 | 0600 | 0D90 | 468D | 16AA | 6A50 | 9A00 | 5B9F | 0000 |
| 0000057060 | 5F5E | ED83 | 8B02 | 1FE5 | 4D5D | 1ECB | 9058 | 5545 |
| 0000057100 | EC8B | 8E1E | 81D8 | 2CEC | 5700 | C456 | 065E | 8B26 |
| 0000057120 | 8907 | FA46 | 46C7 | 00FC | 8300 | 5A3E | 0206 | 0374 |
| 0000057140 | 0DE9 | C400 | 065E | 8326 | 047F | 7500 | E903 | 003E |
| 0000057160 | 46C7 | 01F2 | 8300 | 5A3E | 0206 | 0374 | 05E9 | B000 |
| 0000057200 | E900 | 0003 | 90A0 | 880D | F446 | 468B | 8BFA | FC56 |
| 0000057220 | 4689 | 89F6 | F856 | 681E | 0D98 | 76FF | FFF8 | F676 |
| 0000057240 | 76FF | FFF4 | F276 | BC9A | 0053 | E900 | 0034 | 76FF |
| 0000057260 | FFFC | FA76 | 681E | 0719 | 468D | 16D4 | 9A50 | 0B76 |
| 0000057300 | 5C9D | C483 | 8D0C | D446 | 5016 | AA9A | DE09 | 835B |
| 0000057320 | 04C4 | 0600 | 0D90 | 468D | 16D4 | 6A50 | 9A00 | 5BFC |
| 0000057340 | 0000 | 5F5E | ED83 | 8B02 | 1FE5 | 4D5D | 1ECB | 9058 |
| 0000057360 | 5545 | EC8B | 8E1E | 81D8 | 06EC | 5700 | A156 | 065E |
| 0000057400 | 060B | 065C | 0374 | 33E9 | 6A00 | 9A06 | 0594 | 5D5C |
| 0000057420 | C483 | A302 | 065C | 1689 | 065E | 5EA1 | 0B06 | 5C06 |
| 0000057440 | 7406 | E903 | 0006 | 05B8 | E900 | 00B3 | 5CA1 | 8B06 |
| 0000057460 | 5E16 | 8906 | FA46 | 5689 | E9FC | 0087 | 5CA1 | 8B06 |
| 0000057500 | 5E16 | 8906 | FA46 | 5689 | C4FC | FA5E | 468A | 2606 |
| 0000057520 | 0738 | 0374 | 06E9 | B800 | 0000 | 82E9 | C400 | FA5E |
| 0000057540 | 8B26 | 0447 | 0B26 | 0247 | 0374 | 06E9 | E900 | 0017 |
| 0000057560 | 11E9 | C400 | FA5E | 8B26 | 0247 | 8B26 | 0457 | 4689 |
| 0000057600 | 89FA | FC56 | C2E9 | 6AFF | 9A06 | 0594 | 5C90 | C483 |
| 0000057620 | C402 | FA5E | 8926 | 0247 | 8926 | 0457 | 5EC4 | 26FA |
| 0000057640 | 478B | 2604 | 470B | 7402 | E903 | 0006 | 05B8 | E900 |
| 0000057660 | 002D | 5EC4 | 26FA | 478B | 2602 | 578B | 8904 | FA46 |
| 0000057700 | 5689 | 8AFC | 0646 | 5EC4 | 26FA | 0788 | 5EC4 | 2BFA |
| 0000057720 | 26C0 | 4789 | 2604 | 4789 | B802 | 0000 | 00E9 | 5E00 |

THU MAR 14 17:48:06 1991 TM.EXE PAGE 27, LINE 1535

| | | | | | | | | |
|---|---|---|---|---|---|---|---|---|
| 0000057740 | 835F | 02ED | E58B | 5D1F | CB4D | 581E | 4590 | 8B55 |
| 0000057760 | 1EEC | D88E | EC81 | 000A | 5657 | 5EA1 | 0B06 | 5C06 |
| 0000060000 | 7406 | E903 | 0003 | C2E9 | C400 | 5C1E | 8A06 | 0646 |
| 0000060020 | 3826 | 7407 | E903 | 0031 | 5CA1 | 8B06 | 5E16 | 8906 |
| 0000060040 | F646 | 5689 | C4F8 | 5C1E | 2606 | 478B | 2602 | 578B |
| 0000060060 | A304 | 065C | 1689 | 065E | 76FF | FFF8 | F676 | FA9A |
| 0000060100 | DE08 | 835C | 04C4 | 82E9 | A100 | 065C | 168B | 065E |
| 0000060120 | 4689 | 89FA | FC56 | 11E9 | C400 | FA5E | 8B26 | 0247 |
| 0000060140 | 8B26 | 0457 | 4689 | 89FA | FC56 | 5EC4 | 26FA | 478B |
| 0000060160 | 2604 | 470B | 7502 | E903 | 0051 | 5EC4 | 26FA | 5FC4 |
| 0000060200 | 8A02 | 0646 | 3826 | 7407 | E903 | 003C | 5EC4 | 26FA |
| 0000060220 | 478B | 2602 | 578B | 8904 | F646 | 5689 | C4F8 | FA5E |
| 0000060240 | C426 | 025F | 8B26 | 0247 | 8B26 | 0457 | 5EC4 | 26FA |
| 0000060260 | 4789 | 2602 | 5789 | FF04 | F876 | 76FF | 9AF6 | 08FA |
| 0000060300 | 5E11 | C483 | E904 | 0003 | 8EE9 | 5EFF | 835F | 02ED |
| 0000060320 | E58B | 5D1F | CB4D | 0086 | 0103 | 48EE | 0004 | 0060 |
| 0000060340 | 0103 | 242E | 000E | 0090 | 0103 | 0ACA | 000E | 0091 |
| 0000060360 | 0002 | 25E7 | 0001 | 0000 | 0203 | 2AFF | 000D | 009C |
| 0000060400 | 0103 | 408D | 0004 | 0066 | 0103 | 45B2 | 000C | 0026 |
| 0000060420 | 0002 | 14A9 | 0002 | 0000 | 0103 | 286B | 0001 | 0001 |
| 0000060440 | 0103 | 397A | 000C | 002B | 0002 | 08C9 | 0003 | 0000 |
| 0000060460 | 0103 | 4F32 | 0001 | 0005 | 0103 | 34C7 | 0004 | 0070 |
| 0000060500 | 0103 | 4F14 | 0002 | 0001 | 0103 | 0828 | 000E | 0022 |
| 0000060520 | 0002 | 45A2 | 0005 | 0000 | 0203 | 4E67 | 000D | 00AD |
| 0000060540 | 0103 | 14AE | 000E | 0026 | 0103 | 522F | 0002 | 0008 |
| 0000060560 | 0102 | 4809 | 0002 | 0010 | 0103 | 347C | 0003 | 0001 |
| 0000060600 | 0103 | 3258 | 000C | 0039 | 0103 | 480F | 0001 | 0011 |
| 0000060620 | 0103 | 3F78 | 0003 | 0002 | 0103 | 3214 | 0003 | 0003 |
| 0000060640 | 0103 | 46CA | 0002 | 000B | 0103 | 4242 | 0003 | 0007 |
| 0000060660 | 0103 | 4D10 | 0003 | 0008 | 0103 | 3BA5 | 000C | 0043 |
| 0000060700 | 0103 | 2F37 | 000C | 0044 | 0103 | 4A25 | 0002 | 0014 |
| 0000060720 | 0105 | 4BDE | 000C | 0024 | 0103 | 444D | 0002 | 0015 |
| 0000060740 | 0103 | 362F | 000C | 0045 | 0103 | 4A2D | 0003 | 000D |
| 0000060760 | 0103 | 43AB | 000C | 0047 | 0103 | 29F4 | 0002 | 0017 |
| 0000061000 | 0103 | 3469 | 000C | 0049 | 0103 | 56E1 | 0005 | 0001 |
| 0000061020 | 0103 | 524B | 0005 | 0002 | 0103 | 586F | 0003 | 0012 |
| 0000061040 | 0103 | 1BC9 | 000E | 003A | 0103 | 45B8 | 000C | 004B |
| 0000061060 | 0103 | 2D90 | 000C | 004D | 0103 | 5584 | 0005 | 0005 |
| 0000061100 | 0103 | 51E7 | 0002 | 001F | 0005 | 4AC9 | 0001 | 4590 |
| 0000061120 | 0103 | 45E4 | 0006 | 0001 | 0103 | 5CAE | 0003 | 0019 |
| 0000061140 | 0103 | 4F04 | 0006 | 0002 | 0103 | 3C72 | 0006 | 0003 |
| 0000061160 | 0103 | 3FB0 | 0005 | 000D | 0103 | 3A78 | 0006 | 0006 |
| 0000061200 | 0103 | 3AC0 | 0006 | 0007 | 0103 | 24B9 | 000E | 0047 |
| 0000061220 | 0103 | 26EE | 000E | 0048 | 0103 | 2B27 | 0010 | 003A |
| 0000061240 | 0103 | 3D88 | 0007 | 0002 | 0103 | 1A66 | 000E | 004B |
| 0000061260 | 0103 | 0105 | 000E | 004D | 0103 | 3F4D | 0008 | 0001 |
| 0000061300 | 0103 | 26FE | 000E | 0051 | 0103 | 3F20 | 0008 | 0002 |
| 0000061320 | 0103 | 3069 | 0004 | 0023 | 0103 | 523D | 0008 | 0003 |
| 0000061340 | 0103 | 00ED | 000E | 0055 | 0103 | 4167 | 0004 | 0025 |
| 0000061360 | 0103 | 0131 | 000E | 0059 | 0103 | 3BB9 | 0009 | 0001 |
| 0000061400 | 0203 | 4EB0 | 000D | 0062 | 0103 | 3FFE | 0009 | 0002 |
| 0000061420 | 0103 | 4FDD | 0004 | 002C | 0103 | 50A2 | 0009 | 0005 |
| 0000061440 | 0103 | 2CEF | 0009 | 0006 | 0103 | 3D38 | 0004 | 002E |
| 0000061460 | 0103 | 4BB8 | 0004 | 002F | 0105 | 480C | 0002 | 0010 |
| 0000061500 | 0103 | 45D3 | 000A | 0001 | 0103 | 4985 | 000A | 0002 |
| 0000061520 | 0103 | 4140 | 0004 | 0032 | 0102 | 4BDB | 000C | 0024 |
| 0000061540 | 0103 | 40D5 | 0004 | 0035 | 0103 | 52DB | 000A | 0006 |
| 0000061560 | 0103 | 319A | 000A | 0007 | 0103 | 2E2B | 000B | 0001 |
| 0000061600 | 0103 | 3786 | 000A | 0009 | 0203 | 4CF9 | 000D | 0071 |

```
THU MAR 14 17:48:06 1991  TM.EXE  PAGE 28, LINE 1594

0000061620  0005  4C82  0001  2A39  0103  2E5A  000A  000A
0000061640  0103  3728  0004  003A  0103  3BA0  000B  0002
0000061660  0103  3A36  000B  0003  0103  4BE1  000B  0004
0000061700  0103  4BE6  000B  0005  0103  2D5A  000B  0006
0000061720  0103  2DFC  000B  0007  0103  5C77  000A  000F
0000061740  0103  2F01  000B  0008  0103  597F  000A  0010
0000061760  0103  3635  000C  0001  0103  38E7  000A  0012
0000062000  0103  2D55  000C  0003  0103  4F0C  000A  0013
0000062020  0103  425E  000A  0014  0205  4E51  000D  0046
0000062040  0103  379D  000A  0016  0103  3691  000C  0007
0000062060  0103  32CB  000A  0018  0203  4F87  000D  0081
0000062100  0103  4EC9  000A  0019  0103  426B  0004  0049
0000062120  0103  43C6  000C  0009  0103  45DA  000A  001C
0000062140  0103  4ACC  000C  000D  0103  45BF  000C  000E
0000062160  0103  36A6  000A  001F  0205  4E7D  000D  0054
0000062200  0103  3148  000A  0024  0103  0B72  000E  0005
0000062220  0103  3E2F  000A  0025  0103  2B09  0010  00F6
0000062240  0103  4AC1  000C  0016  0103  369E  000A  0027
0000062260  0103  0045  000E  0008  0203  2721  000D  0090
0000062300  0103  417F  0004  0058  0103  4980  000A  0028
0000062320  0103  477A  000F  0001  0103  1D35  000E  008A
0000062340  0103  08AB  000E  008C  0103  59F3  000A  002C
0000062360  0103  2A13  000E  008D  0103  2B5A  000E  008E
0000062400  0103  2B47  000E  008F  0000  0000  0000  0000
0000062420  0000  0000  0FB0  0000  0000  0000  0000  0000
0000062440  0000  0000  0000  0000  0000  0000  0000  0000
*
0000062520  0000  0000  0200  0000  0000  0000  0000  0000
0000062540  0000  0000  0000  0000  0000  0000  0000  0000
*
0000062620  0000  0000  0200  0000  0000  0000  0000  0000
0000062640  0000  0000  0000  0000  0000  0000  0000  0000
*
0000062720  0000  0000  0200  0000  0000  0000  0000  0000
0000062740  0000  0000  0000  0000  534D  5220  6E75  542D
0000062760  6D69  2065  694C  7262  7261  2079  202D  6F43
0000063000  7970  6972  6867  2074  6328  2029  3931  3039
0000063020  202C  694D  7263  736F  666F  2074  6F43  7072
0000063040  0018  0000  0000  0000  0000  0006  0000  0000
0000063060  0000  0005  0000  0000  0000  0000  0000  0000
0000063100  0000  0000  435F  465F  4C49  5F45  4E49  4F46
0000063120  003D  0001  FFFF  0000  0000  0000  0000  0000
0000063140  0000  0000  0000  0000  0001  0100  8181  0081
0000063160  0000  0000  0000  0000  0000  0000  0000  0000
*
0000063540  0000  0000  0000  0000  0000  0000  0A0A  0A0A
0000063560  0A0A  0A0A  0A0A  0A0A  0A0A  0A0A  0A0A  0A0A
*
0000064140  0A0A  0A0A  0A0A  0A0A  0A0A  0A0A  0000  0000
0000064160  0000  0000  0000  0000  0000  0000  FFFF  0000
0000064200  0000  0000  0000  0000  0000  0000  0000  0000
0000064220  0000  0000  0003  2000  616D  6E69  632E  7400
0000064240  2E6D  0070  4D54  6900  746E  6900  746E  0000
0000064260  02B8  02D6  02BF  0BFE  0000  0000  0000  0000
0000064300  0000  616D  6E69  5400  7365  6974  676E  3231
0000064320  2033  7369  6220  7375  2E79  500A  656C  7361
0000064340  2065  6177  7469  202C  726F  7520  6573  4120
0000064360  6F62  7472  2820  7266  6D6F  5220  7065  616C
0000064400  2079  656D  756E  2E29  6900  746E  6900  746E
```

THU MAR 14 17:48:06 1991 TM.EXE PAGE 29, LINE 1653

| | | | | | | | | |
|---|---|---|---|---|---|---|---|---|
| 0000064420 | 7000 | 6F72 | 6563 | 7373 | 6D5F | 6773 | 0000 | 6D74 |
| 0000064440 | 705F | 6F72 | 6563 | 7373 | 6D5F | 67~3 | 0000 | 6D74 |
| 0000064460 | 6F5F | 2E70 | 0063 | 6D74 | 702E | 0000 | 034E | 0362 |
| 0000064500 | 0356 | 02D2 | 0000 | 0000 | 0000 | 0000 | 0000 | 0000 |
| 0000064520 | 0000 | 0000 | 0000 | 0000 | 0000 | 0000 | 0000 | 0000 |
| * | | | | | | | | |
| 0000065100 | 0000 | 0000 | 0000 | 7543 | 7272 | 6E65 | 2074 | 7562 |
| 0000065120 | 6666 | 7265 | 7720 | 7361 | 6D20 | 646F | 6669 | 6569 |
| 0000065140 | 2064 | 7562 | 2074 | 6F6E | 2074 | 6173 | 6576 | 3A64 |
| 0000065160 | 0A0A | 4F20 | 204B | 6F74 | 6320 | 6F6C | 6573 | 3F20 |
| 0000065200 | 6D00 | 6961 | 006E | 7063 | 0020 | 7063 | 2520 | 2073 |
| 0000065220 | 7325 | 6300 | 2070 | 6300 | 2070 | 7325 | 2520 | 0073 |
| 0000065240 | 6552 | 6F63 | 6472 | 5200 | 7065 | 616C | 0079 | 6973 |
| 0000065260 | 0067 | 6373 | 6E72 | 7300 | 6769 | 7300 | 7263 | 6565 |
| 0000065300 | 006E | 6863 | 6365 | 5F6B | 7325 | 2820 | 2522 | 2273 |
| 0000065320 | 202C | 6C25 | 2964 | 0A3B | 6D00 | 766F | 5F65 | 6F6C |
| 0000065340 | 6163 | 6F74 | 5F72 | 6261 | 2073 | 2528 | 2C64 | 2520 |
| 0000065360 | 2964 | 0A3B | 5600 | 7265 | 6669 | 0079 | 6552 | 6C70 |
| 0000065400 | 7961 | 0000 | 0002 | 0007 | 0008 | 0006 | 7325 | 255C |
| 0000065420 | 0073 | 7325 | 255C | 0073 | 4F42 | 4C4F | 4200 | 4F4F |
| 0000065440 | 004C | 6F46 | 6C6C | 776F | 6E69 | 2067 | 7562 | 6666 |
| 0000065460 | 7265 | 7328 | 2029 | 6577 | 6572 | 6D20 | 646F | 6669 |
| 0000065500 | 6569 | 2064 | 7562 | 2074 | 6F6E | 2074 | 6173 | 6576 |
| 0000065520 | 3A64 | 000A | 0A0A | 2020 | 2020 | 4B4F | 7420 | 206F |
| 0000065540 | 7865 | 7469 | 3F20 | 2000 | 6E61 | 2064 | 6F6D | 6572 |
| 0000065560 | 2E2E | 002E | 0020 | 6D74 | 655F | 6978 | 5F74 | 6863 |
| 0000065600 | 6365 | 736B | 0000 | 6E69 | 7469 | 632E | 7400 | 2E6D |
| 0000065620 | 0070 | 05A6 | 05B8 | 05AD | 035E | 5F47 | 5745 | 545F |
| 0000065640 | 4700 | 455F | 5F57 | 0054 | 705C | 7069 | 5C65 | 4D54 |
| 0000065660 | 755F | 0070 | 4F4C | 4E47 | 4D41 | 0045 | 7355 | 7265 |
| 0000065700 | 4100 | 7070 | 696C | 6163 | 6974 | 6E6F | 5200 | 7065 |
| 0000065720 | 616C | 0079 | 6D74 | 695F | 696E | 0074 | 6E69 | 0074 |
| 0000065740 | 6E69 | 0074 | 6D74 | 665F | 6E69 | 7369 | 0068 | 3154 |
| 0000065760 | 3332 | 495F | 504E | 4D5F | 454B | 5F59 | 5250 | 5345 |
| 0000066000 | 5F53 | 5349 | 315F | 5400 | 3231 | 5F33 | 4E49 | 5F50 |
| 0000066020 | 4143 | 5350 | 535F | 4948 | 5446 | 555F | 5050 | 5245 |
| 0000066040 | 5400 | 3231 | 5F33 | 4E49 | 5F50 | 4552 | 454C | 5341 |
| 0000066060 | 4445 | 4D5F | 454B | 5359 | 0000 | 0002 | 0000 | 0000 |
| 0000066100 | 0000 | 0000 | 0000 | 0001 | 0001 | 0000 | 0000 | 0000 |
| 0000066120 | 253C | 2563 | 3E64 | 7400 | 7079 | 2065 | 2228 | 7400 |
| 0000066140 | 7079 | 2065 | 2228 | 6D00 | 7974 | 6570 | 2820 | 0022 |
| 0000066160 | 746D | 7079 | 2065 | 2228 | 2200 | 202C | 6C25 | 2975 |
| 0000066200 | 0A3B | 2200 | 3B29 | 000A | 2922 | 0A3B | 6D00 | 766F |
| 0000066220 | 5F65 | 6F6C | 6163 | 6F74 | 5F72 | 6261 | 0073 | 6F6D |
| 0000066240 | 6576 | 6D5F | 756F | 6573 | 615F | 7362 | 6D00 | 766F |
| 0000066260 | 5F65 | 6F6C | 6163 | 6F74 | 5F72 | 6572 | 006C | 6F6D |
| 0000066300 | 6576 | 6D5F | 756F | 6573 | 725F | 6C65 | 2500 | 2073 |
| 0000066320 | 2528 | 2C64 | 2520 | 2C64 | 2520 | 2964 | 0A3B | 6D00 |
| 0000066340 | 766F | 5F65 | 6F6C | 6163 | 6F74 | 5F72 | 7274 | 6361 |
| 0000066360 | 286B | 6C25 | 2975 | 0A3B | 7400 | 6365 | 2068 | 2528 |
| 0000066400 | 756C | 3B29 | 000A | 4F43 | 534D | 4550 | 0043 | 632F |
| 0000066420 | 6300 | 646D | 652E | 6578 | 6300 | 6D6F | 616D | 646E |
| 0000066440 | 632E | 6D6F | 0000 | 0006 | 0600 | 0100 | 0000 | 0010 |
| 0000066460 | 0603 | 0600 | 1002 | 4504 | 4545 | 0505 | 0505 | 3505 |
| 0000066500 | 0030 | 0050 | 0000 | 2000 | 3020 | 5850 | 0807 | 3000 |
| 0000066520 | 3030 | 5057 | 0007 | 2000 | 0020 | 0000 | 0000 | 6008 |
| 0000066540 | 6060 | 6060 | 0060 | 7000 | 7870 | 7878 | 0878 | 0807 |
| 0000066560 | 0000 | 0007 | 0808 | 0008 | 0800 | 0800 | 0000 | 2808 |
| 0000066600 | 756E | 6C6C | 0629 | 0000 | 0003 | 4F43 | 534D | 4550 |

```
THU MAR 14 17:48:06 1991  TM.EXE  PAGE 30, LINE 1712

0000066620  0043  6D63  2E64  7865  0065  6F63  6D6D  6E61
0000066640  2E64  6F63  006D  4150  4854  2E00  7865  0065
0000066660  632E  6D6F  2E00  6D63  0064  622E  7461  2E00
0000066700  005C  0000  07CB  07D0  4150  4854  5C00  0000
0000066720  FFFF  FFFF  0006  07FC  0000  0006  0C08  0001
0000066740  0000  0000  0000  0000  0000  0102  0000  0000
0000066760  0000  0000  0000  0202  0000  0000  0000  0000
0000067000  0000  0000  0000  0000  0000  0000  0000  0000
*
0000067660  0000  0000  0001  0200  0000  0000  0000  0000
0000067700  0000  0000  0000  0000  0000  0000  0000  0000
*
0000070620  0000  0000  09C8  05B4  02B6  FFFF  02B6  0BBA
0000070640  02B6  0BBE  02B6  0BC2  02B6  0BC6  02B6  0BCA
0000070660  0000  0000  0101  005C  632F  0020  0002  0000
0000070700  0000  0000  0000  0000  0000  0000  0000  0000
0000070720  2666  0BCE  FFFF  FFFF  FFFF  0BF8  0BFA  FFFF
0000070740  0BF4  0BF6  0C00  0C02  0BFC  3C3C  4D4E  4753
0000070760  3E3E  0000  3652  3030  0D30  2D0A  7320  6174
0000071000  6B63  6F20  6576  6672  6F6C  0D77  000A  0003
0000071020  3652  3030  0D33  2D0A  6920  746E  6765  7265
0000071040  6420  7669  6469  2065  7962  3020  0A0D  0800
0000071060  5200  3036  3830  0A0D  202D  6F6E  2074  6E65
0000071100  756F  6867  7320  6170  6563  6620  726F  6120
0000071120  6772  6D75  6E65  7374  0A0D  0900  5200  3036
0000071140  3930  0A0D  202D  6F6E  2074  6E65  756F  6867
0000071160  7320  6170  6563  6620  726F  6520  766E  7269
0000071200  6E6F  656D  746E  0A0D  FC00  0D00  000A  00FF
0000071220  7572  2D6E  6974  656D  6520  7272  726F  0020
0000071240  0002  3652  3030  0D32  2D0A  6620  6F6C  7461
0000071260  6E69  2D67  6F70  6E69  2074  7573  7070  726F
0000071300  2074  6F6E  2074  6F6C  6461  6465  0A0D  0100
0000071320  5200  3036  3130  0A0D  202D  756E  6C6C  7020
0000071340  696F  746E  7265  6120  7373  6769  6D6E  6E65
0000071360  0D74  000A  0011  3652  3130  0D37  2D0A  7520
0000071400  656E  7078  6365  6574  2064  756D  746C  7469
0000071420  7268  6165  2064  6F6C  6B63  6520  7272  726F
0000071440  0A0D  1000  5200  3036  3631  0A0D  202D  6F6E
0000071460  2074  6E65  756F  6867  7320  6170  6563  6620
0000071500  726F  7420  7268  6165  2064  6164  6174  0A0D
0000071520  FF00  FFFF  0005  0002  0BF2  0001  0000  0202
0000071540  0C06  000D  0054  0002  07F6  0004  0000  0002
0000071560  0BB6  0005  0000  0202  0C04  000D  0046  424E
0000071600  3230  9770  0000  0001  0010  00DA  0000  0001
0000071620  0001  6F0C  3273  635C  7472  2E30  7361  016D
0000071640  EA00  A900  0001  0100  0100  0F00  736F  5C32
0000071660  7263  3074  6164  2E74  7361  016D  9400  2202
0000071700  0000  0100  0100  0F00  736F  5C32  7263  3074
0000071720  736D  2E67  7361  016D  B600  0602  0000  0100
0000071740  0100  0A00  7263  3074  7066  612E  6D73  0001
0000071760  02BC  0024  0000  0001  0001  630A  6B68  7573
0000072000  2E6D  7361  016D  E000  8702  0001  0100  0100
0000072020  0F00  736F  5C32  7473  6164  6772  2E76  7361
0000072040  016D  6800  A304  0000  0100  0100  0F00  736F
0000072060  5C32  7473  6564  766E  2E70  7361  016D  0C00
0000072100  6505  0000  0100  0100  0F00  736F  5C32  6D6E
0000072120  6773  6468  2E72  7361  016D  7200  2105  0000
0000072140  0100  0100  1000  736F  5C32  7473  6164  6C6C
0000072160  636F  612E  6D73  0001  0594  000A  0000  0001
```

THU MAR 14 17:48:06 1991 TM.EXE PAGE 31, LINE 1771

| | | | | | | | | |
|---|---|---|---|---|---|---|---|---|
| 0000072200 | 0001 | 6D0A | 6C61 | 6F6C | 2E63 | 7361 | 016D | 9E00 |
| 0000072220 | AF05 | 0000 | 0100 | 0100 | 0B00 | 6D66 | 6C61 | 6F6C |
| 0000072240 | 2E63 | 7361 | 006D | 0000 | 0000 | 0000 | 0100 | 0000 |
| 0000072260 | 0900 | 6466 | 7461 | 2E61 | 7361 | 016D | 4E00 | 3406 |
| 0000072300 | 0000 | 0100 | 0100 | 0B00 | 6E69 | 7469 | 6573 | 2E67 |
| 0000072320 | 7361 | 016D | 8200 | 3606 | 0000 | 0100 | 0100 | 0B00 |
| 0000072340 | 696C | 6B6E | 6573 | 2E67 | 7361 | 016D | B800 | 7C06 |
| 0000072360 | 0000 | 0100 | 0100 | 0C00 | 6573 | 7261 | 6863 | 6773 |
| 0000072400 | 612E | 6D73 | 0001 | 0734 | 00E2 | 0000 | 0001 | 0001 |
| 0000072420 | 670B | 6F72 | 7377 | 6765 | 612E | 6D73 | 0001 | 0816 |
| 0000072440 | 0031 | 0000 | 0001 | 0001 | 6E0A | 7765 | 6573 | 2E67 |
| 0000072460 | 7361 | 016D | 4800 | B208 | 0000 | 0100 | 0100 | 0D00 |
| 0000072500 | 736F | 5C32 | 6C6D | 636F | 2E6B | 7361 | 016D | 0C00 |
| 0000072520 | 3127 | 0009 | 0200 | 0100 | 0600 | 616D | 6E69 | 632E |
| 0000072540 | 0001 | 303E | 1552 | 0000 | 0002 | 0001 | 7407 | 5F6D |
| 0000072560 | 706F | 632E | 0001 | 4590 | 0A17 | 0000 | 0002 | 0001 |
| 0000072600 | 6906 | 696E | 2E74 | 0163 | A800 | FE4F | 000E | 0200 |
| 0000072620 | 0100 | 0800 | 6C78 | 7461 | 726F | 632E | 0001 | 08FA |
| 0000072640 | 000A | 0000 | 0001 | 0001 | 6608 | 6572 | 2E65 | 7361 |
| 0000072660 | 016D | 0400 | 4609 | 0000 | 0100 | 0100 | 0A00 | 7473 |
| 0000072700 | 6372 | 7461 | 612E | 6D73 | 0001 | 094A | 0036 | 0000 |
| 0000072720 | 0001 | 0001 | 730A | 7274 | 7063 | 2E79 | 7361 | 016D |
| 0000072740 | 8000 | 2909 | 0000 | 0100 | 0100 | 0A00 | 7473 | 6372 |
| 0000072760 | 706D | 612E | 6D73 | 0001 | 09AA | 0017 | 0000 | 0001 |
| 0000073000 | 0001 | 730A | 7274 | 656C | 2E6E | 7361 | 016D | C200 |
| 0000073020 | A609 | 0000 | 0100 | 0100 | 0800 | 6567 | 6574 | 766E |
| 0000073040 | 632E | 0001 | 0A68 | 010E | 0000 | 0001 | 0001 | 640E |
| 0000073060 | 6C6C | 745C | 7268 | 6165 | 2E64 | 7361 | 016D | 7600 |
| 0000073100 | 740B | 0000 | 0100 | 0100 | 0900 | 70̄3 | 6972 | 746E |
| 0000073120 | 2E66 | 0163 | EA00 | 2E0B | 0000 | 0100 | 0100 | 0B00 |
| 0000073140 | 7473 | 7272 | 6863 | 2E72 | 7361 | 016D | 1800 | E60C |
| 0000073160 | 0000 | 0100 | 0100 | 0800 | 7973 | 7473 | 6D65 | 632E |
| 0000073200 | 0001 | 0CFE | 009A | 0000 | 0001 | 0001 | 6C08 | 6964 |
| 0000073220 | 2E76 | 7361 | 016D | 9800 | C00D | 0000 | 0100 | 0100 |
| 0000073240 | 0E00 | 736F | 5C32 | 6F64 | 7273 | 7465 | 612E | 6D73 |
| 0000073260 | 0001 | 0E58 | 00E5 | 0000 | 0001 | 0001 | 5F0B | 6C66 |
| 0000073300 | 6273 | 6675 | 612E | 6D73 | 0001 | 0F3E | 04FA | 0000 |
| 0000073320 | 0001 | 0001 | 6F0A | 7475 | 7570 | 2E74 | 7361 | 016D |
| 0000073340 | 3800 | 3B14 | 0000 | 0100 | 0100 | 0B00 | 7473 | 6E72 |
| 0000073360 | 6D63 | 2E70 | 7361 | 016D | 7400 | 7A14 | 0000 | 0100 |
| 0000073400 | 0100 | 1000 | 6C64 | 5C6C | 6974 | 7464 | 6261 | 656C |
| 0000073420 | 612E | 6D73 | 0001 | 14EE | 0394 | 0000 | 0001 | 0001 |
| 0000073440 | 6F0D | 3273 | 735C | 6170 | 6E77 | 6576 | 632E | 0001 |
| 0000073460 | 1882 | 01CE | 0000 | 0001 | 0001 | 730A | 6170 | 6E77 |
| 0000073500 | 7076 | 2E65 | 0163 | 5000 | 3B1A | 0000 | 0100 | 0100 |
| 0000073520 | 0E00 | 736F | 5C32 | 6361 | 6563 | 7373 | 612E | 6D73 |
| 0000073540 | 0001 | 1A8C | 0032 | 0000 | 0001 | 0001 | 630A | 6B68 |
| 0000073560 | 7473 | 2E6B | 7361 | 006D | 0000 | 0000 | 0000 | 0100 |
| 0000073600 | 0000 | 0700 | 665F | 6C69 | 2E65 | 0163 | BE0U | 4B1A |
| 0000073620 | 0000 | 0100 | 0100 | 0B00 | 675F | 7465 | 7562 | 2E66 |
| 0000073640 | 7361 | 016D | 0A00 | 771B | 0000 | 0100 | 0100 | 0D00 |
| 0000073660 | 736F | 5C32 | 736C | 6565 | 2E6B | 7361 | 016D | 8200 |
| 0000073700 | F41B | 0001 | 0100 | 0100 | 0900 | 7277 | 7469 | 2E65 |
| 0000073720 | 7361 | 006D | 0000 | 0000 | 0000 | 0100 | 0000 | 0C00 |
| 0000073740 | 6D63 | 7369 | 6463 | 7461 | 612E | 6D73 | 0001 | 1D76 |
| 0000073760 | 002D | 0000 | 0001 | 0001 | 730A | 7274 | 6863 | 2E72 |
| 0000074000 | 7361 | 016D | A400 | 451D | 0000 | 0100 | 0100 | 0B00 |
| 0000074020 | 7473 | 6972 | 6D63 | 2E70 | 7361 | 016D | EA00 | AA1D |
| 0000074040 | 0000 | 0100 | 0100 | 0900 | 6567 | 7074 | 7461 | 2E68 |

THU MAR 14 17:48:06 1991 TM.EXE PAGE 32, LINE 1830

| | | | | | | | | |
|---|---|---|---|---|---|---|---|---|
| 0000074060 | 0163 | 9400 | 0C1E | 0001 | 0100 | 0100 | 0A00 | 6573 |
| 0000074100 | 7261 | 6863 | 6E65 | 632E | 0001 | 1FA0 | 043A | 0000 |
| 0000074120 | 0001 | 0001 | 6F0D | 3273 | 635C | 6E65 | 6176 | 6772 |
| 0000074140 | 632E | 0001 | 23DA | 0082 | 0000 | 0001 | 0001 | 6F0F |
| 0000074160 | 3273 | 645C | 736F | 6170 | 6E77 | 612E | 6D73 | 0000 |
| 0000074200 | 0000 | 0000 | 0000 | 0001 | 0000 | 5F0B | 6663 | 756C |
| 0000074220 | 6873 | 612E | 6D73 | 0001 | 245C | 001E | 0000 | 0001 |
| 0000074240 | 0001 | 730C | 6174 | 6B63 | 7661 | 2E61 | 7361 | 006D |
| 0000074260 | 0000 | 0000 | 0000 | 0100 | 0000 | 0A00 | 6663 | 6E69 |
| 0000074300 | 6F66 | 612E | 6D73 | 0001 | 247A | 013A | 0000 | 0001 |
| 0000074320 | 0001 | 6F0C | 3273 | 675C | 7465 | 7763 | 2E64 | 0163 |
| 0000074340 | B400 | 2E25 | 0001 | 0100 | 0100 | 0800 | 6666 | 756C |
| 0000074360 | 6873 | 632E | 0001 | 26E2 | 002A | 0000 | 0001 | 0001 |
| 0000074400 | 6F0D | 3273 | 645C | 6972 | 6576 | 612E | 6D73 | 0D74 |
| 0000074420 | 0005 | 0000 | 5F06 | 6465 | 7461 | B061 | 050D | 0000 |
| 0000074440 | 0400 | 655F | 646E | 0050 | 0005 | 0000 | 5F0C | 6E5F |
| 0000074460 | 6568 | 7061 | 645F | 7365 | 7663 | 0500 | 0000 | 0C00 |
| 0000074500 | 5F5F | 615F | 4244 | 7773 | 6670 | 676C | 0042 | 0005 |
| 0000074520 | 0000 | 5F08 | 615F | 6D63 | 6C64 | 746E | 0500 | 0000 |
| 0000074540 | 0800 | 5F5F | 7361 | 6765 | 6968 | 0072 | 0005 | 0000 |
| 0000074560 | 5F08 | 615F | 6573 | 6C67 | 4E6F | 0500 | 0000 | 0800 |
| 0000074600 | 5F5F | 7361 | 7A69 | 7364 | 0010 | 0001 | 0000 | 5F08 |
| 0000074620 | 615F | 7473 | 7261 | 4674 | 0500 | 0000 | 0800 | 5F5F |
| 0000074640 | 7461 | 706F | 7073 | 0064 | 0005 | 0000 | 5F09 | 615F |
| 0000074660 | 6663 | 6E69 | 6F66 | D6D6 | 0000 | 0001 | 5F09 | 615F |
| 0000074700 | 4244 | 7375 | 6465 | 0044 | 0005 | 0000 | 5F09 | 615F |
| 0000074720 | 6E65 | 7376 | 6765 | 0084 | 0001 | 0000 | 5F09 | 635F |
| 0000074740 | 6E69 | 4474 | 5649 | 004A | 0005 | 0000 | 5F0A | 745F |
| 0000074760 | 7268 | 6165 | 6964 | 4864 | 0500 | 0000 | 0A00 | 5F5F |
| 0000075000 | 6967 | 666E | 736F | 6765 | D6D6 | 0000 | 0001 | 5F0A |
| 0000075020 | 615F | 4244 | 6F64 | 7773 | 4C70 | 0500 | 0000 | 0A00 |
| 0000075040 | 5F5F | 696C | 666E | 736F | 6765 | 9876 | 0000 | 0001 |
| 0000075060 | 5F0A | 615F | 7263 | 7574 | 6573 | 7864 | 0500 | 0000 |
| 0000075100 | 0B00 | 5F5F | 615F | 4244 | 7472 | 7265 | 8C72 | 0100 |
| 0000075120 | 0000 | 0B00 | 5F5F | 6D61 | 6773 | 655F | 6978 | 8674 |
| 0000075140 | 0500 | 0000 | 0B00 | 5F5F | 736F | 6576 | 7372 | 6F69 |
| 0000075160 | 896E | 0101 | 0000 | 0600 | 5F5F | 7865 | 7469 | 024F |
| 0000075200 | 0001 | 0000 | 5F0C | 755F | 6C6E | 636F | 656B | 6978 |
| 0000075220 | 9A74 | 0502 | 0000 | 0700 | 5F5F | 6863 | 6C69 | 8A64 |
| 0000075240 | 0500 | 0000 | 0700 | 5F5F | 666E | 6C69 | EA65 | 0100 |
| 0000075260 | 0000 | 0700 | 5F5F | 6963 | 696E | 8C74 | 0502 | 0000 |
| 0000075300 | 0700 | 5F5F | 615F | 6772 | 9163 | 0101 | 0000 | 0700 |
| 0000075320 | 5F5F | 6563 | 6978 | 8674 | 0500 | 0000 | 0D00 | 5F5F |
| 0000075340 | 6F64 | 7673 | 7265 | 616D | 6F6A | 8E72 | 0502 | 0000 |
| 0000075360 | 0700 | 5F5F | 615F | 6772 | 8776 | 0500 | 0000 | 0D00 |
| 0000075400 | 5F5F | 6F64 | 7673 | 7265 | 696D | 6F6E | 8C72 | 0501 |
| 0000075420 | 0000 | 0800 | 5F5F | 6970 | 6570 | 6863 | 0292 | 0005 |
| 0000075440 | 0000 | 5F08 | 6E65 | 6976 | 6F72 | 8C6E | 0500 | 0000 |
| 0000075460 | 0800 | 5F5F | 736F | 6966 | 656C | 0088 | 0005 | 0000 |
| 0000075500 | 5F08 | 6F5F | 6D73 | 646F | 4D65 | 0101 | 0000 | 0800 |
| 0000075520 | 5F5F | 6E69 | 7469 | 7066 | 0BE4 | 0005 | 0000 | 5F08 |
| 0000075540 | 665F | 6970 | 696E | 7274 | 0102 | 0000 | 0800 | 5F5F |
| 0000075560 | 6574 | 6D72 | 7066 | 0296 | 0005 | 0000 | 5F08 | 705F |
| 0000075600 | 6D67 | 7470 | 9B72 | 0101 | 0000 | 0800 | 5F5F | 5F63 |
| 0000075620 | 7865 | 7469 | 0088 | 0005 | 0000 | 5F09 | 645F | 736F |
| 0000075640 | 6F6D | 6564 | 0086 | 0005 | 0000 | 5F09 | 6F5F | 6D73 |
| 0000075660 | 6A61 | 726F | 0087 | 0005 | 0000 | 5F09 | 6F5F | 6D73 |
| 0000075700 | 6E69 | 726F | 0205 | 0001 | 0000 | 5F0A | 6C5F | 636F |
| 0000075720 | 656B | 6978 | 8474 | 0500 | 0000 | 0A00 | 5F5F | 6D75 |

THU MAR 14 17:48:06 1991 TM.EXE PAGE 33, LINE 1889

| | | | | | | | | |
|---|---|---|---|---|---|---|---|---|
| 0000075740 | 7361 | 766B | 6C61 | 0272 | 0001 | 0000 | 5F0A | 635F |
| 0000075760 | 6574 | 6D72 | 7573 | 9C62 | 0502 | 0000 | 0A00 | 5F5F |
| 0000076000 | 7865 | 7469 | 745F | 6469 | 007A | 0005 | 0000 | 5F05 |
| 0000076020 | 665F | 6361 | 0182 | 0001 | 0000 | 5F05 | 7865 | 7469 |
| 0000076040 | 0294 | 0001 | 0000 | 5F0E | 465F | 5F46 | 534D | 4247 |
| 0000076060 | 4E41 | 454E | 9E52 | 0502 | 0000 | 0900 | 5F5F | 6461 |
| 0000076100 | 6762 | 736D | 7667 | 0098 | 0100 | 0900 | 5F5F | 6361 |
| 0000076120 | 7472 | 736D | B667 | 0102 | 0000 | 0800 | 5F5F | 7066 |
| 0000076140 | 7274 | 7061 | 02BC | 0001 | 0000 | 5F0B | 6E5F | 6C75 |
| 0000076160 | 636C | 6568 | 6B63 | 0042 | 0005 | 0000 | 5F0B | 615F |
| 0000076200 | 756E | 6C6C | 6973 | 657A | 02E0 | 0001 | 0000 | 5F09 |
| 0000076220 | 735F | 7465 | 7261 | 7667 | 0468 | 0001 | 0000 | 5F09 |
| 0000076240 | 735F | 7465 | 6E65 | 7076 | 050C | 0001 | 0000 | 5F06 |
| 0000076260 | 4E5F | 534D | 5F47 | 4554 | 5458 | 053C | 0001 | 0000 |
| 0000076300 | 5F0C | 4E5F | 534D | 5F47 | 5257 | 5449 | 7245 | 0105 |
| 0000076320 | 0000 | 0A00 | 5F5F | 7473 | 6164 | 6C6C | 636F | 0594 |
| 0000076340 | 0001 | 0000 | 5F07 | 616D | 6C6C | 636F | 0599 | 0001 |
| 0000076360 | 0000 | 5F0A | 616D | 6C6C | 636F | 6C5F | D06B | 0105 |
| 0000076400 | 0000 | 0C00 | 5F5F | 6D66 | 6C61 | 6F6C | 5F63 | 6B6C |
| 0000076420 | 059E | 0001 | 0000 | 5F07 | 665F | 7266 | 6565 | 05B1 |
| 0000076440 | 0001 | 0000 | 5F09 | 665F | 616D | 6C6C | 636F | 059E |
| 0000076460 | 0001 | 0000 | 5F0A | 665F | 7266 | 6565 | 6C5F | A86B |
| 0000076500 | 0502 | 0000 | 0700 | 5F5F | 6866 | 6165 | 4E70 | 0106 |
| 0000076520 | 0000 | 0900 | 5F5F | 6E69 | 7469 | 6573 | 8267 | 0106 |
| 0000076540 | 0000 | 0900 | 5F5F | 696C | 6B6E | 6573 | B867 | 0106 |
| 0000076560 | 0000 | 0B00 | 5F5F | 6573 | 7261 | 6863 | 6573 | C367 |
| 0000076600 | 0107 | 0000 | 0800 | 5F5F | 6E69 | 7363 | 6765 | 0734 |
| 0000076620 | 0001 | 0000 | 5F09 | 675F | 6F72 | 7377 | 6765 | 07F6 |
| 0000076640 | 0001 | 0000 | 5F0A | 665F | 6E69 | 6C64 | 7361 | B674 |
| 0000076660 | 0502 | 0000 | 0A00 | 5F5F | 6D61 | 6C62 | 736B | 7A69 |
| 0000076700 | 0816 | 0001 | 0000 | 5F08 | 6E5F | 7765 | 6573 | 9867 |
| 0000076720 | 0108 | 0000 | 0600 | 5F5F | 6F6C | 6B63 | 08DA | 0001 |
| 0000076740 | 0000 | 5F07 | 6C5F | 636F | 666B | 086C | 0001 | 0000 |
| 0000076760 | 5F0D | 755F | 6C6E | 636F | 5F6B | 6966 | 656C | 0848 |
| 0000077000 | 0001 | 0000 | 5F0D | 6C5F | 636F | 5F6B | 7473 | 6572 |
| 0000077020 | 6D61 | 08BE | 0001 | 0000 | 5F08 | 755F | 6C6E | 636F |
| 0000077040 | EA6B | 0108 | 0000 | 0900 | 5F5F | 6E75 | 6F6C | 6B63 |
| 0000077060 | 5466 | 0108 | 0000 | 0F00 | 5F5F | 6E75 | 6F6C | 6B63 |
| 0000077100 | 735F | 7274 | 6165 | 786D | 0108 | 0000 | 0A00 | 5F5F |
| 0000077120 | 6177 | 7469 | 6F6C | 6B63 | 0860 | 0001 | 0000 | 5F0B |
| 0000077140 | 6C5F | 636F | 5F6B | 6966 | 656C | 0000 | 0004 | 00C0 |
| 0000077160 | 5F07 | 6D74 | 685F | 6261 | 0206 | 0004 | 00C0 | 5F07 |
| 0000077200 | 6D74 | 685F | 716D | 2A39 | 0001 | 071C | 5F0F | 6D74 |
| 0000077220 | 705F | 6F72 | 6563 | 7373 | 6D5F | 6773 | 270C | 0001 |
| 0000077240 | 0713 | 5F05 | 616D | 6E69 | 323A | 0001 | 0768 | 5F16 |
| 0000077260 | 6D74 | 635F | 6F6C | 6573 | 635F | 7275 | 6572 | 746E |
| 0000077300 | 745F | 7365 | 8874 | 0133 | 6B00 | 0A07 | 745F | 5F6D |
| 0000077320 | 6D69 | 6F70 | 7472 | 34A8 | 0001 | 076F | 5F0A | 6D74 |
| 0000077340 | 655F | 7078 | 726F | 9374 | 0135 | 7000 | 1107 | 745F |
| 0000077360 | 5F6D | 7773 | 7469 | 6863 | 725F | 6365 | 726F | EB64 |
| 0000077400 | 0136 | 7300 | 1707 | 745F | 5F6D | 6E69 | 6573 | 7472 |
| 0000077420 | 635F | 6568 | 6B63 | 735F | 7263 | 6565 | 196E | 0138 |
| 0000077440 | 7500 | 1007 | 745F | 5F6D | 616D | 6B72 | 6C5F | 636F |
| 0000077460 | 7461 | 726F | 38BD | 0001 | 0778 | 5F0E | 6D74 | 735F |
| 0000077500 | 7465 | 765F | 7265 | 6669 | 5079 | 0139 | 7A00 | 0607 |
| 0000077520 | 745F | 5F6D | 6F67 | 3B65 | 0001 | 077E | 5F09 | 6D74 |
| 0000077540 | 615F | 6F62 | 7472 | 3C24 | 0001 | 077F | 5F0F | 6D74 |
| 0000077560 | 6D5F | 6B61 | 5F65 | 6572 | 6F70 | 7472 | 3C8A | 0001 |
| 0000077600 | 0780 | 5F10 | 6D74 | 735F | 6F68 | 5F77 | 6572 | 7573 |

THU MAR 14 17:48:06 1991 TM.EXE PAGE 34, LINE 1948

| | | | | | | | | |
|---|---|---|---|---|---|---|---|---|
| 0000077620 | 746C | A273 | 013D | 8200 | 0F07 | 745F | 5F6D | 6E65 |
| 0000077640 | 5F64 | 6964 | 7073 | 616C | CF79 | 013E | 8300 | 1007 |
| 0000077660 | 745F | 5F6D | 6873 | 776F | 665F | 6C69 | 6574 | 7372 |
| 0000077700 | 3F38 | 0001 | 0784 | 5F0C | 6D74 | 655F | 6378 | 5F70 |
| 0000077720 | 6564 | 5F66 | 013F | 8500 | 0E07 | 745F | 5F6D | 6369 |
| 0000077740 | 6E6F | 6C5F | 6165 | 6E72 | 3FC8 | 0001 | 0786 | 5F0E |
| 0000077760 | 6D74 | 635F | 656C | 6E61 | 7075 | 645F | 1262 | 0142 |
| 0000100000 | 8700 | 0E07 | 745F | 5F6D | 6168 | 646E | 656C | 685F |
| 0000100020 | 7264 | 4297 | 0001 | 0788 | 5F0F | 6D74 | 655F | 6978 |
| 0000100040 | 5F74 | 6863 | 6365 | 736B | 0364 | 0005 | 0081 | 5F0C |
| 0000100060 | 7563 | 5F72 | 7475 | 6C69 | 7469 | 3E79 | 0130 | 6400 |
| 0000100100 | 0F07 | 745F | 5F6D | 7263 | 6165 | 6574 | 745F | 7365 |
| 0000100120 | D674 | 0130 | 6600 | 0D07 | 745F | 5F6D | 706F | 6E65 |
| 0000100140 | 745F | 7365 | F874 | 0131 | 6700 | 0D07 | 745F | 5F6D |
| 0000100160 | 6173 | 6576 | 745F | 7365 | 9074 | 0145 | AF00 | 0F07 |
| 0000100200 | 4D54 | 435F | 5F4D | 4157 | 5449 | 485F | 4F4F | IF4B |
| 0000100220 | 0146 | B100 | 0807 | 745F | 5F6D | 6E69 | 7469 | 4E25 |
| 0000100240 | 0001 | 07B7 | 5F0A | 6D74 | 665F | 6E69 | 7369 | 0468 |
| 0000100260 | 0400 | 8100 | 0F00 | 745F | 5F6D | 656B | 5F79 | 6465 |
| 0000100300 | 7469 | 6E69 | A867 | 014F | 9F00 | 0F06 | 745F | 5F6D |
| 0000100320 | 6C78 | 7461 | 726F | 695F | 696E | 5C74 | 0150 | A300 |
| 0000100340 | 1706 | 745F | 5F6D | 6E69 | 7469 | 785F | 616C | 6F74 |
| 0000100360 | 5F72 | 6573 | 7373 | 6F69 | 8B6E | 0150 | A500 | 0F06 |
| 0000100400 | 745F | 5F6D | 6C78 | 7461 | 5F65 | 7665 | 6E65 | 4174 |
| 0000100420 | 0159 | B300 | 1206 | 745F | 5F6D | 6574 | 6D72 | 6E69 |
| 0000100440 | 7461 | 5F65 | 7974 | 6570 | 08FF | 0001 | 0000 | 5F08 |
| 0000100460 | 7266 | 6565 | 6C5F | FA6B | 0108 | 0000 | 0500 | 665F |
| 0000100500 | 6572 | 0465 | 0109 | 0000 | 0700 | 735F | 7274 | 6163 |
| 0000100520 | 4A74 | 0109 | 0000 | 0700 | 735F | 7274 | 7063 | 8079 |
| 0000100540 | 0109 | 0000 | 0700 | 735F | 7274 | 6D63 | AA70 | 0109 |
| 0000100560 | 0000 | 0700 | 735F | 7274 | 656C | C26E | 0109 | 0000 |
| 0000100600 | 0700 | 675F | 7465 | 6E65 | 6876 | 010A | 0000 | 0D00 |
| 0000100620 | 5F5F | 6562 | 6967 | 746E | 7268 | 6165 | 4964 | 010B |
| 0000100640 | 0000 | 0B00 | 5F5F | 6E65 | 7464 | 7268 | 6165 | 7664 |
| 0000100660 | 010B | 0000 | 0800 | 735F | 7270 | 6E69 | 6674 | 0BEA |
| 0000100700 | 0001 | 0000 | 5F08 | 7473 | 7272 | 6863 | 1872 | 010C |
| 0000100720 | 0000 | 0700 | 735F | 7379 | 6574 | FE6D | 010C | 0000 |
| 0000100740 | 0800 | 5F5F | 4661 | 646C | 7669 | 0E44 | 0001 | 0000 |
| 0000100760 | 5F0B | 5F5F | 6F64 | 6573 | 7272 | 6F6E | 0E4C | 0001 |
| 0000101000 | 0000 | 5F07 | 655F | 7272 | 6F6E | 0DFD | 0001 | 0000 |
| 0000101020 | 5F08 | 645F | 736F | 6572 | E474 | 010D | 0000 | 0900 |
| 0000101040 | 5F5F | 6F64 | 7273 | 7465 | 5866 | 010E | 0000 | 0800 |
| 0000101060 | 5F5F | 6C66 | 6273 | 6675 | 0F4E | 0001 | 0000 | 5F08 |
| 0000101100 | 6F5F | 7475 | 7570 | 3874 | 0114 | 0000 | 0800 | 735F |
| 0000101120 | 7274 | 636E | 706D | 1474 | 0001 | 0000 | 5F0B | 675F |
| 0000101140 | 7465 | 6974 | 7464 | 6261 | 07A8 | 0005 | 0000 | 5F0B |
| 0000101160 | 745F | 6469 | 6174 | 6D62 | 7861 | 1650 | 0001 | 0000 |
| 0000101200 | 5F08 | 7073 | 7761 | 766E | 8265 | 0118 | 0000 | 0900 |
| 0000101220 | 735F | 6170 | 6E77 | 7076 | 5065 | 011A | 0000 | 0700 |
| 0000101240 | 615F | 6363 | 7365 | F073 | 0507 | 0000 | 0C00 | 5F5F |
| 0000101260 | 6161 | 746C | 7473 | 6F6B | 7276 | 1A8C | 0001 | 0000 |
| 0000101300 | 5F08 | 635F | 6B68 | 7473 | 8C6B | 011A | 0000 | 0A00 |
| 0000101320 | 5F5F | 4661 | 6863 | 736B | 6B74 | 0006 | 0004 | 0000 |
| 0000101340 | 5F07 | 625F | 6675 | 6E69 | 07F4 | 0005 | 0000 | 5F05 |
| 0000101360 | 695F | 626F | 09D4 | 0005 | 0000 | 5F06 | 695F | 626F |
| 0000101400 | B432 | 050B | 0000 | 0900 | 5F5F | 616C | 7473 | 6F69 |
| 0000101420 | BE62 | 011A | 0000 | 0800 | 5F5F | 6567 | 6274 | 6675 |
| 0000101440 | 1B14 | 0001 | 0000 | 5F06 | 736C | 6565 | 0A6B | 011B |
| 0000101460 | 0000 | 0A00 | 5F5F | 736C | 6565 | 5F6B | 6B6C | 1B8C |

```
THU MAR 14 17:48:06 1991   TM.EXE   PAGE 35, LINE 2007

0000101500  0001  0000  5F06  7277  7469  8265  011B  0000
0000101520  0A00  5F5F  7277  7469  5F65  6B6C  0BB8  0005
0000101540  0000  5F0D  635F  6C66  6374  7476  745F  6261
0000101560  0BD4  0005  0000  5F08  615F  6973  657A  D543
0000101600  050B  0000  0800  5F5F  7361  7A69  4465  0BD2
0000101620  0005  0000  5F0B  735F  6769  6E69  6F74  6666
0000101640  0BD0  0005  0000  5F0B  735F  6769  6E69  7374
0000101660  6765  1D76  0001  0000  5F07  7473  6372  7268
0000101700  1DA4  0001  0000  5F08  7473  6972  6D63  A470
0000101720  011D  0000  0800  735F  7274  6D63  6970  1DEA
0000101740  0001  0000  5F09  675F  7465  6170  6874  1E94
0000101760  0001  0000  5F0B  735F  6165  6372  6568  766E
0000102000  1FA0  0001  0000  5F09  635F  6E65  6176  6772
0000102020  0BDC  0005  0000  5F0B  705F  6F5F  6576  6C72
0000102040  7961  23DA  0001  0000  5F09  645F  736F  6170
0000102060  6E77  0BDE  0005  0000  5F08  635F  6C66  7375
0000102100  5C68  0124  0000  0B00  735F  6174  6B63  7661
0000102120  6961  E06C  050B  0000  0A00  5F5F  6966  656C
0000102140  6E69  6F66  2490  0001  0000  5F09  675F  7465
0000102160  6364  6477  247A  0001  0000  5F07  6567  6374
0000102200  6477  25FA  0001  0000  5F0B  665F  6C66  7375
0000102220  5F68  6B6C  25B4  0001  0000  5F07  6666  756C
0000102240  6873  2666  0001  0000  5F09  6C66  7375  6168
0000102260  6C6C  26F7  0001  0000  5F09  635F  6468  6972
0000102300  6576  26E2  0001  0000  5F0A  675F  7465  7264
0000102320  7669  0165  000A  8075  8183  6400  8300  0201
0000102340  0101  8000  1601  7900  0330  0383  8302  0204
0000102360  0A82  7528  746E  6761  6567  2964  0169  000A
0000102400  837F  0081  8183  8300  0081  1C01  7F00  0682
0000102420  6170  6B63  685F  8200  6606  6C69  5F65  0268
0000102440  0682  7566  636E  685F  0104  0007  737A  C083
0000102460  8200  0100  0001  0180  0001  0180  0001  0180
0000102500  0001  0180  0001  0180  0001  0180  0001  0180
*
0000102660  0001  0180  0001  0180  0001  0180  0005  3878
0000102700  8083  0100  0005  2878  8083  0100  0001  0180
0000102720  0001  0180  0001  0180  0001  0180  0001  0180
*
0000103320  0001  0180  0001  0180  0001  0180  0007  737A
0000103340  6F83  8202  0100  000A  8075  8183  6400  8300
0000103360  0201  0101  8000  0101  8000  0101  8000  0101
0000103400  8000  0101  8000  0101  8000  0101  8000  0101
*
0000112120  8000  0101  8000  0701  7800  2085  8303  0080
0000112140  0101  8000  0101  8000  0101  8000  0101  8000
*
0000112240  0101  8000  0101  8000  1801  7900  1085  1101
0000112260  DD83  8305  05DE  0A82  7528  746E  6761  6567
0000112300  2964  0169  0034  837F  0085  8583  8300  0085
0000112320  8583  8300  0085  8583  8300  0081  8583  8300
0000112340  0085  8583  8300  0084  8583  8300  0085  8583
0000112360  8300  0085  8583  8300  0085  0601  7F01  0982
0000112400  6974  656D  735F  696E  0074  0F82  696D  5F6E
0000112420  6572  6F63  6472  745F  6D69  0265  0982  7473
0000112440  6261  6C69  7469  0479  0F82  6163  7470  7275
0000112460  5F65  6974  656D  756F  0674  0A82  656B  5F79
0000112500  6F66  6D72  7461  8208  6313  6E6F  6974  756E
0000112520  756F  5F73  7274  6361  696B  676E  820A  6D0E
0000112540  756F  6573  745F  6172  6B63  6E69  0C67  1182
```

THU MAR 14 17:48:06 1991 TM.EXE PAGE 36, LINE 2066

| | | | | | | | | |
|---|---|---|---|---|---|---|---|---|
| 0000112560 | 6163 | 7470 | 7275 | 5F65 | 6973 | 6E67 | 7461 | 7275 |
| 0000112600 | 0E65 | 0B82 | 6F68 | 6B74 | 7965 | 735F | 6E79 | 1063 |
| 0000112620 | 0C82 | 6564 | 6166 | 6C75 | 5F74 | 6974 | 656D | 8212 |
| 0000112640 | 6D09 | 7861 | 645F | 6C65 | 7961 | 8214 | 660B | 7361 |
| 0000112660 | 5F74 | 6572 | 6C70 | 7961 | 8216 | 760E | 7265 | 6669 |
| 0000112700 | 5F79 | 6974 | 656D | 756F | 1874 | 0C82 | 6177 | 7469 |
| 0000112720 | 745F | 6D69 | 6F65 | 7475 | 821A | 730C | 6E79 | 5F63 |
| 0000112740 | 6974 | 656D | 756F | 1C74 | 0982 | 6874 | 6572 | 6873 |
| 0000112760 | 6C6F | 1E64 | 0C82 | 6863 | 6365 | 5F6B | 6F6C | 6B6F |
| 0000113000 | 7075 | 0120 | 0001 | 0180 | 0001 | 0180 | 0001 | 0180 |
| 0000113020 | 0001 | 0180 | 0001 | 0180 | 0001 | 0180 | 0001 | 0180 |
| * | | | | | | | | |
| 0000113420 | 0001 | 0180 | 0001 | 0180 | 001B | 2079 | 8309 | 0625 |
| 0000113440 | 2683 | 8206 | 690F | 755F | 6D5F | 6773 | 705F | 7261 |
| 0000113460 | 6D61 | 745F | 0169 | 001C | 837F | 0081 | 8583 | 8300 |
| 0000113500 | 0082 | 8683 | 8300 | 0088 | 8083 | 8300 | 0084 | C083 |
| 0000113520 | 8300 | 00C0 | 6A01 | 7F00 | 0982 | 5F69 | 5F75 | 6873 |
| 0000113540 | 726F | 0074 | 0A82 | 5F69 | 5F75 | 7375 | 6F68 | 7472 |
| 0000113560 | 8200 | 6908 | 755F | 6C5F | 6E6F | 0067 | 0982 | 5F69 |
| 0000113600 | 5F75 | 6C75 | 6E6F | 0067 | 0982 | 5F69 | 5F75 | 6C66 |
| 0000113620 | 616F | 0074 | 0882 | 5F69 | 5F75 | 6863 | 7261 | 8200 |
| 0000113640 | 6909 | 755F | 755F | 6863 | 7261 | 8200 | 6907 | 755F |
| 0000113660 | 735F | 7274 | 8200 | 6909 | 755F | 625F | 6F6C | 6B63 |
| 0000113700 | 0100 | 0019 | 3079 | 8302 | 0628 | 2983 | 8206 | 690D |
| 0000113720 | 6D5F | 6773 | 705F | 7261 | 6D61 | 745F | 0169 | 0007 |
| 0000113740 | 837F | 0085 | 2483 | 0106 | 0010 | 827F | 7404 | 7079 |
| 0000113760 | 0065 | 0582 | 6176 | 756C | 0265 | 0101 | 8000 | 1C01 |
| 0000114000 | 7900 | 9085 | 0900 | 2C83 | 8306 | 062D | 0E82 | 5F69 |
| 0000114020 | 736D | 5F67 | 6568 | 6461 | 7265 | 745F | 0169 | 001C |
| 0000114040 | 837F | 0081 | 8183 | 8300 | 0085 | 8583 | 8300 | 0084 |
| 0000114060 | 8583 | 8300 | 0085 | 8183 | 8300 | 0085 | 4701 | 7F00 |
| 0000114100 | 0482 | 5F71 | 6469 | 8200 | 7306 | 756F | 6372 | 0265 |
| 0000114120 | 0382 | 6970 | 0464 | 0382 | 6974 | 0664 | 0482 | 6572 |
| 0000114140 | 7073 | 8208 | 7208 | 7365 | 5F70 | 6974 | 0A64 | 0782 |
| 0000114160 | 706F | 635F | 646F | 0C65 | 0482 | 7974 | 6570 | 820E |
| 0000114200 | 7304 | 7A69 | 1065 | 1501 | 7900 | C085 | 0200 | 3083 |
| 0000114220 | 8306 | 0631 | 0782 | 5F69 | 736D | 5F67 | 6974 | 0501 |
| 0000114240 | 7800 | 8330 | 0627 | 0701 | 7F00 | 2B83 | 8306 | 062F |
| 0000114260 | 1701 | 7F00 | 0682 | 6568 | 6461 | 7265 | 8200 | 700A |
| 0000114300 | 7261 | 6D61 | 6C5F | 7369 | 1274 | 0101 | 8000 | 0101 |
| 0000114320 | 8000 | 0101 | 8000 | 0701 | 7A00 | 8373 | 062E | 0082 |
| 0000114340 | 0101 | 8000 | 0101 | 8000 | 0101 | 8000 | 0101 | 8000 |
| * | | | | | | | | |
| 0000114760 | 0101 | 8000 | 0101 | 8000 | 0101 | 8000 | 1601 | 7900 |
| 0000115000 | 5085 | 0406 | 7F83 | 8306 | 0680 | 0882 | 7374 | 5F6C |
| 0000115020 | 6163 | 6C6C | 0169 | 0007 | 8578 | 0190 | 8083 | 0100 |
| 0000115040 | 000D | 837F | 067E | 8183 | 8300 | 067E | C983 | 0105 |
| 0000115060 | 0022 | 827F | 6604 | 6C69 | 0065 | 0482 | 696C | 656E |
| 0000115100 | 8232 | 6306 | 6C61 | 656C | 3465 | 0782 | 6163 | 6C6C |
| 0000115120 | 7473 | 6672 | 0101 | 8000 | 0101 | 8000 | 0101 | 8000 |
| 0000115140 | 0701 | 7A00 | 8373 | 067D | 0082 | 0101 | 8000 | 0101 |
| 0000115160 | 8000 | 0101 | 8000 | 0101 | 8000 | 0101 | 8000 | 0101 |
| * | | | | | | | | |
| 0000115760 | 8000 | 0101 | 8000 | 0A01 | 7500 | 8380 | 0081 | 0164 |
| 0000116000 | E983 | 0106 | 0004 | 837F | 0635 | 0101 | 8000 | 0101 |
| 0000116020 | 8000 | 0101 | 8000 | 0101 | 8000 | 0101 | 8000 | 0101 |
| * | | | | | | | | |
| 0000116220 | 8000 | 0101 | 8000 | 0101 | 8000 | 0A01 | 7500 | 8380 |
| 0000116240 | 0200 | 0164 | 0F83 | 0107 | 0004 | 837F | 0635 | 0101 |

```
THU MAR 14 17:48:06 1991  TM.EXE  PAGE 37, LINE 2125

0000116260  8000  0101  8000  0701  7F00  8183  8300  0205
0000116300  0A01  7500  8380  0200  0264  1283  0107  0005
0000116320  1878  8083  0100  0001  0180  0005  2878  8083
0000116340  0100  0005  2078  8083  0100  0005  6078  8283
0000116360  0100  0004  837F  0635  0A01  7500  8380  0081
0000116400  0164  1983  0107  0007  8578  0210  8083  0100
0000116420  000A  8075  0083  6402  8300  0201  0101  8000
0000116440  0501  7800  8378  0080  0501  7800  8360  0080
0000116460  0401  7F00  3583  0106  000A  8075  0083  6402
0000116500  8301  0720  0101  8000  0101  8000  1601  7900
0000116520  0330  0383  8302  0204  0A82  7528  746E  6761
0000116540  6567  2964  0169  000A  837F  0081  8183  8300
0000116560  0081  1C01  7F00  0682  6170  6B63  685F  8200
0000116600  6606  6C69  5F65  0268  0682  7566  636E  685F
0000116620  0104  0001  0180  0001  0180  0001  0180  0001
0000116640  0180  0001  0180  0001  0180  0001  0180  0001
*
0000117020  0180  0001  0180  0001  0180  0001  0180  0005
0000117040  4078  8083  0100  0005  2878  8083  0100  0001
0000117060  0180  0001  0180  0001  0180  0001  0180  0001
*
0000117320  0180  0001  0180  0007  8578  0100  8083  0100
0000117340  0001  0180  0001  0180  0001  0180  0001  0180
*
0000125520  0001  0180  0001  0180  0018  8579  0120  8302
0000125540  0574  7583  8205  280A  6E75  6174  6767  6465
0000125560  6929  0701  7F00  8683  8300  0254  1501  7F00
0000125600  0682  626F  5F6A  6469  8200  6F08  6A62  6E5F
0000125620  6D61  0465  0101  8000  0101  8000  0101  8000
0000125640  0101  8000  0101  8000  0101  8000  0101  8000
*
0000126220  0101  8000  0101  8000  0701  7A00  8373  0573
0000126240  0082  0101  8000  0101  8000  0101  8000  0101
0000126260  8000  0101  8000  0101  8000  0101  8000  0101
*
0000126320  8000  0101  8000  0101  8000  0101  8000  1801
0000126340  7900  1085  0201  C883  8305  05C9  0A82  7528
0000126360  746E  6761  6567  2964  0169  0007  837F  0254
0000126400  8183  0100  000F  827F  6E04  6D61  0065  0482
0000126420  7974  6570  0120  0018  8579  0930  830D  05CD
0000126440  CE83  8205  280A  6E75  6174  6767  6465  6929
0000126460  0701  7800  2085  8303  0080  0701  7A00  8373
0000126500  05C7  0082  2801  7F00  5483  8302  0081  5483
0000126520  8302  0082  CB83  8305  05CB  C083  8300  00C0
0000126540  C083  8300  00C0  8183  8300  0085  CC83  0105
0000126560  00A1  827F  6E04  6D61  0065  0482  7974  6570
0000126600  8220  6106  7475  6F68  2272  0482  6164  6574
0000126620  8242  6608  6E75  7463  6F69  466E  0882  7073
0000126640  6365  725F  6665  AA85  8200  640B  7365  7263
0000126660  7069  6974  6E6F  0E85  8201  6307  6D6F  656D
0000126700  746E  1285  8201  6610  746C  5F72  6573  7261
0000126720  6863  705F  7461  8568  0116  0E82  6374  735F
0000126740  6165  6372  5F68  6170  6874  1A85  8201  6405
0000126760  6D75  796D  1E85  8201  7009  7261  6D61  635F
0000127000  746E  2085  8201  7009  7261  6D61  6C5F  7473
0000127020  2285  0101  0001  0180  0001  0180  0001  0180
0000127040  0001  0180  0001  0180  0001  0180  0007  737A
0000127060  CA83  8205  0100  0001  0180  0001  0180  0001
0000127100  0180  0001  0180  0001  0180  0001  0180  0001
```

```
THU MAR 14 17:48:06 1991  TM.EXE  PAGE 38, LINE 2184

*
0000127540  0180  0001  0180  0001  0180  0001  0180  0007
0000127560  8578  0800  8083  0100  0001  0180  0001  0180
0000127600  0001  0180  0001  0180  0001  0180  0001  0180
*
0000130200  0001  0180  001B  2079  8309  0669  6A83  8206
0000130220  690F  755F  6D5F  6773  705F  7261  6D61  745F
0000130240  0169  001C  837F  0081  8583  8300  0082  8683
0000130260  8300  0088  8083  8300  0084  C083  8300  00C0
0000130300  6A01  7F00  0982  5F69  5F75  6873  726F  0074
0000130320  0A82  5F69  5F75  7375  6F68  7472  8200  6908
0000130340  755F  6C5F  6E6F  0067  0982  5F69  5F75  6C75
0000130360  6E6F  0067  0982  5F69  5F75  6C66  616F  0074
0000130400  0882  5F69  5F75  6863  7261  8200  6909  755F
0000130420  755F  6863  7261  8200  6907  755F  735F  7274
0000130440  8200  6909  755F  625F  6F6C  6B63  0100  0019
0000130460  3079  8302  066C  6D83  8206  690D  6D5F  6773
0000130500  705F  7261  6D61  745F  0169  0007  837F  0085
0000130520  6883  0106  0010  827F  7404  7079  0065  0582
0000130540  6176  756C  0265  0101  8000  1C01  7900  9085
0000130560  0900  7083  8306  0671  0E82  5F69  736D  5F67
0000130600  6568  6461  7265  745F  0169  001C  837F  0081
0000130620  8183  8300  0085  8583  8300  0084  8583  8300
0000130640  0085  8183  8300  0085  4701  7F00  0482  5F71
0000130660  6469  8200  7306  756F  6372  0265  0382  6970
0000130700  0464  0382  6974  0664  0482  6572  7073  8208
0000130720  7208  7365  5F70  6974  0A64  0782  706F  635F
0000130740  646F  0C65  0482  7974  6570  820E  7304  7A69
0000130760  1065  1501  7900  C085  0200  7483  8306  0675
0000131000  0782  5F69  736D  5F67  6974  0501  7800  8330
0000131020  066B  0701  7F00  6F83  8306  0673  1701  7F00
0000131040  0682  6568  6461  7265  8200  700A  7261  6D61
0000131060  6C5F  7369  1274  0101  8000  0101  8000  0101
0000131100  8000  0701  7A00  8373  0672  0082  0101  8000
0000131120  0101  8000  0101  8000  0101  8000  0101  8000
*
0000131340  0101  8000  1801  7900  8085  0708  A183  8306
0000131360  06A2  0A82  7528  746E  6761  6567  2964  0169
0000131400  0016  837F  0624  8283  8300  0081  D583  8305
0000131420  0085  8583  8300  0081  4F01  7F00  0482  616E
0000131440  656D  8200  6405  5F62  6469  0085  8201  750C
0000131460  6173  6567  735F  6174  7574  8573  0104  0682
0000131500  6568  6461  7265  0685  8201  7509  6573  5F72
0000131520  706F  6E65  0A85  8201  6C06  616F  6564  8564
0000131540  010C  0382  726C  8575  010E  0101  8000  0701
0000131560  7A00  8373  06A0  0082  0101  8000  0101  8000
0000131600  0101  8000  0101  8000  0101  8000  0101  8000
*
0000132220  0101  8000  0101  8000  0101  8000  0501  7800
0000132240  8340  0081  0101  8000  0101  8000  0101  8000
0000132260  0101  8000  0101  8000  0101  8000  0101  8000
*
0000132320  0101  8000  0701  7800  9085  8301  0080  0101
0000132340  8000  0101  8000  0101  8000  0101  8000  0101
*
0000133160  8000  0101  8000  0101  8000  0701  7F00  C083
0000133200  8300  0081  0A01  7500  8380  0081  0264  6383
0000133220  0107  0004  837F  00C0  0A01  7500  8380  0081
0000133240  0164  6583  0107  000A  8075  8183  6400  8300
```

```
THU MAR 14 17:48:06 1991  TM.EXE  PAGE 39, LINE 2243

0000133260  0201  0A01  7500  8380  0081  0064  0183  0102
0000133300  0007  8578  01D8  8083  0100  0004  837F  00C0
0000133320  0A01  7500  8380  0081  0164  6A83  0107  0005
0000133340  2078  8083  0100  0005  4878  8083  0100  0004
0000133360  837F  00C0  0401  7500  8380  0081  0164  6E83
0000133400  0107  000A  8075  8183  6400  8300  0201  0501
0000133420  7800  8338  0080  0401  7F00  8283  0100  000A
0000133440  8075  8183  6400  8301  0772  0701  7800  B885
0000133460  8300  0080  0A01  7500  8380  0081  0064  0183
0000133500  0102  0007  8578  00E0  8083  0100  0007  837F
0000133520  0085  C083  0100  000A  8075  8183  6400  8302
0000133540  0777  0401  7F00  8183  0100  000A  8075  8183
0000133560  6400  8301  0779  0101  8000  0401  7F00  C083
0000133600  0100  000A  8075  8183  6400  8301  077C  0A01
0000133620  7500  8380  0081  0064  0183  0102  000A  8075
0000133640  8183  6400  8300  0201  0A01  7500  8380  0081
0000133660  0064  0183  0102  0005  3078  8083  0100  000A
0000133700  8075  8183  6400  8300  0201  0A01  7500  8380
0000133720  0081  0064  0183  0102  000A  8075  8183  6400
0000133740  8300  0201  0A01  7500  8380  0081  0064  0183
0000133760  0102  000A  8075  8183  6400  8300  0201  0A01
0000134000  7500  8380  0081  0064  0183  0102  000A  8075
0000134020  8583  6400  8300  0201  0101  8000  0101  8000
0000134040  0501  7800  8378  0080  0701  7A00  8373  078D
0000134060  0082  0A01  7500  8380  0081  0064  0183  0102
0000134100  0005  6078  8283  0100  0007  8578  0190  8083
0000134120  0100  0007  8578  0098  8083  0100  0007  8578
0000134140  0098  8083  0100  0001  0180  0005  6878  8083
0000134160  0100  0005  1078  8083  0100  000A  8075  8183
0000134200  6400  8300  0201  0101  8000  1601  7900  0330
0000134220  0383  8302  0204  0A82  7528  746E  6761  6567
0000134240  2964  0169  000A  837F  0081  8183  8300  0081
0000134260  1C01  7F00  0682  6170  6B63  685F  8200  6606
0000134300  6C69  5F65  0268  0682  7566  636E  685F  0104
0000134320  0007  737A  C083  8200  0100  0001  0180  0001
0000134340  0180  0001  0180  0001  0180  0001  0180  0001
*
0000134540  0180  0005  3878  8083  0100  0005  2878  8083
0000134560  0100  0007  737A  2B83  8202  0100  000A  8075
0000134600  8183  6400  8300  0201  0101  8000  0101  8000
0000134620  0101  8000  0101  8000  0101  8000  0101  8000
*
0000136200  0101  8000  0101  8000  0701  7800  0085  8301
0000136220  0080  0101  8000  0101  8000  0101  8000  0101
0000136240  8000  0101  8000  0101  8000  0101  8000  0101
*
0000146020  8000  0101  8000  0101  8000  1B01  7900  0920
0000146040  D083  8306  06D1  0F82  5F69  5F75  736D  5F67
0000146060  6170  6172  5F6D  6974  1C01  7F00  8183  8300
0000146100  0085  8283  8300  0086  8883  8300  0080  8483
0000146120  8300  00C0  C083  0100  006A  827F  6909  755F
0000146140  735F  6F68  7472  8200  690A  755F  755F  6873
0000146160  726F  0074  0882  5F69  5F75  6F6C  676E  8200
0000146200  6909  755F  755F  6F6C  676E  8200  6909  755F
0000146220  665F  6F6C  7461  8200  6908  755F  635F  6168
0000146240  0072  0982  5F69  5F75  6375  6168  0072  0782
0000146260  5F69  5F75  7473  0072  0982  5F69  5F75  6C62
0000146300  636F  006B  1901  7900  0230  D383  8306  06D4
0000146320  0D82  5F69  736D  5F67  6170  6172  5F6D  6974
```

```
THU MAR 14 17:48:06 1991  TM.EXE  PAGE 40, LINE 2302

0000146340  0701  7F00  8583  8300  06CF  1001  7F00  0482
0000146360  7974  6570  8200  7605  6C61  6575  0102  0001
0000146400  0180  001C  8579  0090  8309  06D7  D883  8206
0000146420  690E  6D5F  6773  685F  6165  6564  5F72  6974
0000146440  1C01  7F00  8183  8300  0081  8583  8300  0085
0000146460  8483  8300  0085  8583  8300  0081  8583  0100
0000146500  0047  827F  7104  695F  0064  0682  6F73  7275
0000146520  6563  8202  7003  6469  8204  7403  6469  8206
0000146540  7204  7365  0870  0882  6572  7073  745F  6469
0000146560  820A  6F07  5F70  6F63  6564  820C  7404  7079
0000146600  0E65  0482  6973  657A  0110  0015  8579  00C0
0000146620  8302  06DB  DC83  8206  6907  6D5F  6773  745F
0000146640  0169  0005  3078  D283  0106  0007  837F  06D6
0000146660  DA83  0106  0017  827F  6806  6165  6564  0072
0000146700  0A82  6170  6172  5F6D  696C  7473  0112  0001
0000146720  0180  0001  0180  0001  0180  0001  0180  0001
*
0000150420  0180  0001  0180  000A  8075  0083  7302  8300
0000150440  0201  0701  7F00  8183  8300  0205  0A01  7500
0000150460  8380  0081  0264  B083  0107  0001  0180  0005
0000150500  4078  8083  0100  0005  4078  8083  0100  0005
0000150520  6078  8283  0100  0005  6078  8083  0100  000A
0000150540  8075  0083  6402  8300  0201  0101  8000  0501
0000150560  7800  8350  0080  0501  7800  8320  0080  0A01
0000150600  7500  8380  0081  0064  0183  0102  0001  0180
0000150620  0001  0180  0001  0180  0001  0180  0001  0180
*
0000155440  0001  0180  0001  0180  000A  8075  8183  6400
0000155460  8300  0201  0101  8000  0101  8000  0101  8000
0000155500  0101  8000  0101  8000  0101  8000  0101  8000
*
0000156400  1601  7900  0220  DD83  8304  04DE  0A82  7528
0000156420  746E  6761  6567  2964  0169  0007  837F  0081
0000156440  8183  0100  0009  827F  7801  8200  7901  0102
0000156460  0001  0180  0001  0180  0001  0180  0001  0180
*
0000157020  0018  8579  0140  8303  0519  1A83  8205  280A
0000157040  6E75  6174  6767  6465  6929  0701  7800  1085
0000157060  8301  0084  0A01  7F00  8683  8300  0085  1883
0000157100  0105  0015  827F  6902  0064  0482  6973  657A
0000157120  8204  7305  6170  6572  0106  0001  0180  0001
0000157140  0180  0001  0180  0001  0180  0001  0180  0001
*
0000157540  0180  0001  0180  0016  4079  8302  055F  6083
0000157560  8205  280A  6E75  6174  6767  6465  6929  0701
0000157600  7F00  8283  8300  0082  1701  7F00  0882  6564
0000157620  5F66  6974  656D  8200  6D08  6E69  745F  6D69
0000157640  0465  1601  7900  0250  6283  8305  0563  0A82
0000157660  7528  746E  6761  6567  2964  0169  0007  837F
0000157700  0084  5E83  0105  0010  827F  6B03  7965  8200
0000157720  7406  6D69  6E69  0267  1601  7900  0250  6583
0000157740  8305  0566  0A82  7528  746E  6761  6567  2964
0000157760  0169  0007  837F  0084  5E83  0105  0011  827F
0000160000  6D04  656B  0079  0682  6974  696D  676E  0102
0000160020  0016  4079  8304  0568  6983  8205  280A  6E75
0000160040  6174  6767  6465  6929  0D01  7F00  8483  8300
0000160060  0084  8483  8300  04DC  2901  7F00  0782  6261
0000160100  5F73  6572  006C  0582  6E75  7469  0173  0C82
0000160120  7073  6365  6169  5F6C  7566  636E  8202  6404
```

THU MAR 14 17:48:06 1991 TM.EXE PAGE 41, LINE 2361

```
0000160140  7369  0470  1801  7900  8085  0200  6B83  8305
0000160160  056C  0A82  7528  746E  6761  6567  2964  0169
0000160200  0007  837F  0567  5E83  0105  0011  827F  6404
0000160220  7369  0070  0682  6974  696D  676E  0108  0001
0000160240  0180  0001  0180  0001  0180  0016  3079  8302
0000160260  0571  7283  8205  280A  6E75  6174  6767  6465
0000160300  6929  0701  7F00  8283  8300  0081  1901  7F00
0000160320  0782  6574  6863  695F  0064  0B82  6574  6863
0000160340  725F  6165  6F73  046E  0101  8000  0101  8000
0000160360  0101  8000  0101  8000  0101  8000  0101  8000
*
0000160620  0101  8000  0101  8000  1B01  7900  0920  A083
0000160640  8305  05A1  0F82  5F69  5F75  736D  5F67  6170
0000160660  6172  5F6D  6974  1C01  7F00  8183  8300  0085
0000160700  8283  8300  0086  8883  8300  0080  8483  8300
0000160720  00C0  C083  0100  006A  827F  6909  755F  735F
0000160740  6F68  7472  8200  690A  755F  755F  6873  726F
0000160760  0074  0882  5F69  5F75  6F6C  676E  8200  6909
0000161000  755F  755F  6F6C  676E  8200  6909  755F  665F
0000161020  6F6C  7461  8200  6908  755F  635F  6168  0072
0000161040  0982  5F69  5F75  6375  6168  0072  0782  5F69
0000161060  5F75  7473  0072  0982  5F69  5F75  6C62  636F
0000161100  006B  1901  7900  0230  A383  8305  05A4  0D82
0000161120  5F69  736D  5F67  6170  6172  5F6D  6974  0701
0000161140  7F00  8583  8300  059F  1001  7F00  0482  7974
0000161160  6570  8200  7605  6C61  6575  0102  0001  0180
0000161200  001C  8579  0090  8309  05A7  A883  8205  690E
0000161220  6D5F  6773  685F  6165  6564  5F72  6974  1C01
0000161240  7F00  8183  8300  0081  8583  8300  0085  8483
0000161260  8300  0085  8583  8300  0081  8583  0100  0047
0000161300  827F  7104  695F  0064  0682  6F73  7275  6563
0000161320  8202  7003  6469  8204  7403  6469  8206  7204
0000161340  7365  0870  0882  6572  7073  745F  6469  820A
0000161360  6F07  5F70  6F63  6564  820C  7404  7079  0E65
0000161400  0482  6973  657A  0110  0015  8579  00C0  8302
0000161420  05AB  AC83  8205  6907  6D5F  6773  745F  0169
0000161440  0005  3078  A283  0105  0007  837F  05A6  AA83
0000161460  0105  0017  827F  6806  6165  6564  0072  0A82
0000161500  6170  6172  5F6D  696C  7473  0112  0001  0180
0000161520  0001  0180  0001  0180  0007  737A  A983  8205
0000161540  0100  0001  0180  0001  0180  0001  0180  0001
0000161560  0180  0001  0180  0001  0180  0001  0180  0001
*
0000161760  0180  0001  0180  0001  0180  0018  8579  0190
0000162000  8305  05D9  DA83  8205  280A  6E75  6174  6767
0000162020  6465  6929  0701  7800  A885  8300  0080  1001
0000162040  7F00  D883  8305  0081  8583  8300  05D8  8583
0000162060  0100  002A  827F  6E04  6D61  0065  0482  7974
0000162100  6570  8216  7309  7065  7261  7461  726F  8218
0000162120  7305  6968  7466  821A  6304  7061  3073  0101
0000162140  8000  0101  8000  0101  8000  0101  8000  0101
*
0000162240  8000  0101  8000  0101  8000  0701  7A00  8373
0000162260  05D7  0082  0101  8000  0101  8000  0101  8000
0000162300  0101  8000  0101  8000  0101  8000  0101  8000
*
0000162740  0101  8000  1601  7900  0340  3F83  8306  0640
0000162760  0A82  7528  746E  6761  6567  2964  0169  0016
0000163000  2079  8302  063D  3E83  8206  280A  6E75  6174
```

THU MAR 14 17:48:06 1991 TM.EXE PAGE 42, LINE 2420

| | | | | | | | | |
|---|---|---|---|---|---|---|---|---|
| 0000163020 | 6767 | 6465 | 6929 | 0701 | 7F00 | 8283 | 8300 | 0082 |
| 0000163040 | 1601 | 7F00 | 0882 | 696D | 5F6E | 6974 | 656D | 8200 |
| 0000163060 | 7407 | 6365 | 5F68 | 6469 | 0100 | 000A | 837F | 0081 |
| 0000163100 | 8483 | 8300 | 063C | 1A01 | 7F00 | 0482 | 7974 | 6570 |
| 0000163120 | 8200 | 6C08 | 636F | 7461 | 6F69 | 026E | 0482 | 6164 |
| 0000163140 | 6174 | 0104 | 0018 | 8579 | 0140 | 8302 | 0643 | 4483 |
| 0000163160 | 8206 | 280A | 6E75 | 6174 | 6767 | 6465 | 6929 | 0501 |
| 0000163200 | 7800 | 8300 | 063B | 0701 | 7F00 | 1783 | 8305 | 0642 |
| 0000163220 | 1101 | 7F00 | 0782 | 6567 | 5F6E | 6468 | 0072 | 0382 |
| 0000163240 | 7562 | 2866 | 1601 | 7900 | 0340 | 4783 | 8306 | 0648 |
| 0000163260 | 0A82 | 7528 | 746E | 6761 | 6567 | 2964 | 0169 | 0007 |
| 0000163300 | 737A | 4183 | 8206 | 0100 | 000A | 837F | 0646 | 8183 |
| 0000163320 | 8300 | 0081 | 1C01 | 7F00 | 0882 | 6574 | 6863 | 625F |
| 0000163340 | 6675 | 8200 | 6907 | 6574 | 6E6D | 6D75 | 8204 | 7003 |
| 0000163360 | 736F | 0106 | 0001 | 0180 | 0001 | 0180 | 0001 | 0180 |
| 0000163400 | 0001 | 0180 | 0001 | 0180 | 0001 | 0180 | 0001 | 0180 |
| * | | | | | | | | |
| 0000163720 | 0001 | 0180 | 0019 | 3079 | 8302 | 0683 | 8483 | 8206 |
| 0000163740 | 530D | 5145 | 455F | 454C | 454D | 544E | 545F | 0169 |
| 0000163760 | 0007 | 737A | 8183 | 8206 | 0100 | 0007 | 837F | 0084 |
| 0000164000 | 8283 | 0106 | 000E | 827F | 6B03 | 7965 | 8200 | 6E04 |
| 0000164020 | 7865 | 0274 | 1901 | 7900 | A085 | 0200 | 8783 | 8306 |
| 0000164040 | 0688 | 0B82 | 4F4D | 4556 | 4C5F | 5349 | 5F54 | 6954 |
| 0000164060 | 0701 | 7A00 | 8373 | 0685 | 0082 | 0701 | 7F00 | 6A83 |
| 0000164100 | 8305 | 0686 | 0E01 | 7F00 | 0382 | 736D | 0067 | 0482 |
| 0000164120 | 656E | 7478 | 0110 | 0007 | 737A | 6183 | 8205 | 0100 |
| 0000164140 | 000A | 8075 | 8183 | 6400 | 8302 | 068B | 0701 | 7F00 |
| 0000164160 | 8183 | 8300 | 0689 | 0A01 | 7500 | 8380 | 0081 | 0264 |
| 0000164200 | 8D83 | 0106 | 0007 | 837F | 0084 | 0083 | 0100 | 000A |
| 0000164220 | 8075 | 8183 | 6400 | 8302 | 068F | 0701 | 7F00 | 8183 |
| 0000164240 | 8300 | 0084 | 0701 | 7A00 | 8373 | 0564 | 0082 | 0A01 |
| 0000164260 | 7500 | 8380 | 0081 | 0164 | 9283 | 0106 | 0004 | 837F |
| 0000164300 | 0690 | 0701 | 7A00 | 8373 | 056A | 0082 | 0A01 | 7500 |
| 0000164320 | 8380 | 0200 | 0164 | 9583 | 0106 | 0004 | 837F | 0693 |
| 0000164340 | 0A01 | 7500 | 8380 | 0200 | 0164 | 9783 | 0106 | 0004 |
| 0000164360 | 837F | 00C2 | 0701 | 7A00 | 8373 | 0570 | 0082 | 0A01 |
| 0000164400 | 7500 | 8380 | 0200 | 0164 | 9A83 | 0106 | 0004 | 837F |
| 0000164420 | 0698 | 0A01 | 7500 | 8380 | 0081 | 0164 | 9C83 | 0106 |
| 0000164440 | 0004 | 837F | 0084 | 0A01 | 7500 | 8380 | 0200 | 0164 |
| 0000164460 | 9E83 | 0106 | 0004 | 837F | 0084 | 0A01 | 7500 | 8380 |
| 0000164500 | 0200 | 0064 | 0183 | 0102 | 0007 | 8578 | 00C8 | 8083 |
| 0000164520 | 0100 | 0007 | 8578 | 00D0 | 8083 | 0100 | 0007 | 8578 |
| 0000164540 | 00C0 | 8083 | 0100 | 000A | 8075 | 0083 | 6402 | 8300 |
| 0000164560 | 0201 | 0401 | 7F00 | B083 | 0105 | 000A | 8075 | 8183 |
| 0000164600 | 6400 | 8301 | 06A4 | 0101 | 8000 | 0701 | 7F00 | 8183 |
| 0000164620 | 8300 | 0689 | 0A01 | 7500 | 8380 | 0081 | 0264 | A783 |
| 0000164640 | 0106 | 0007 | 8578 | 00F0 | 8083 | 0100 | 0005 | 3878 |
| 0000164660 | 8083 | 0100 | 0007 | 837F | 0084 | 0083 | 0100 | 000A |
| 0000164700 | 8075 | 8183 | 6400 | 8302 | 06AB | 0701 | 7F00 | 8183 |
| 0000164720 | 8300 | 0084 | 0A01 | 7500 | 8380 | 0081 | 0264 | AD83 |
| 0000164740 | 0106 | 000A | 8075 | 0083 | 6402 | 8300 | 0201 | 0A01 |
| 0000164760 | 7500 | 8380 | 0081 | 0064 | 0183 | 0102 | 0005 | 4078 |
| 0000165000 | 8083 | 0100 | 0005 | 4878 | 8083 | 0100 | 000A | 8075 |
| 0000165020 | 8183 | 6400 | 8300 | 0201 | 0501 | 7800 | 8350 | 0080 |
| 0000165040 | 0501 | 7800 | 8328 | 0080 | 0401 | 7F00 | 9083 | 0106 |
| 0000165060 | 000A | 8075 | 8183 | 6400 | 8301 | 06B6 | 0401 | 7F00 |
| 0000165100 | 9383 | 0106 | 000A | 8075 | 0083 | 6402 | 8301 | 06B8 |
| 0000165120 | 0701 | 7800 | 8085 | 8302 | 0080 | 0701 | 7800 | 8885 |
| 0000165140 | 8300 | 0080 | 0501 | 7800 | 8378 | 0080 | 0701 | 7800 |

THU MAR 14 17:48:06 1991 TM.EXE PAGE 43, LINE 2479

| | | | | | | | | |
|---|---|---|---|---|---|---|---|---|
| 0000165160 | 9085 | 8300 | 0080 | 0401 | 7F00 | C283 | 0100 | 000A |
| 0000165200 | 8075 | 0083 | 6402 | 8301 | 06BE | 0401 | 7F00 | 9883 |
| 0000165220 | 0106 | 000A | 8075 | 0083 | 6402 | 8301 | 06C0 | 0501 |
| 0000165240 | 7800 | 8368 | 0080 | 0401 | 7F00 | 8483 | 0100 | 000A |
| 0000165260 | 8075 | 8183 | 6400 | 8301 | 06C3 | 0401 | 7F00 | 8483 |
| 0000165300 | 0100 | 000A | 8075 | 0083 | 6402 | 8301 | 06C5 | 1105 |
| 0000165320 | 0001 | 0000 | 0113 | 270C | 0713 | 022C | 0010 | 0221 |
| 0000165340 | 0000 | 0404 | 616D | 6E69 | 040A | 0006 | 0081 | 6104 |
| 0000165360 | 6772 | 0A63 | 0804 | 0500 | 0402 | 7261 | 7667 | 040E |
| 0000165400 | FFD6 | 0081 | 5F08 | 725F | 7465 | 6176 | 096C | EC04 |
| 0000165420 | 35FF | 0306 | 736D | 0F67 | FC04 | 81FF | 0900 | 7274 |
| 0000165440 | 6E61 | 5F73 | 7265 | 0A72 | D804 | 81FF | 0400 | 7473 |
| 0000165460 | 7461 | 040C | FFF4 | 00C0 | 5F06 | 705F | 6F72 | 0C63 |
| 0000165500 | F804 | C0FF | 0600 | 5F5F | 7974 | 6570 | 040F | FFEA |
| 0000165520 | 0085 | 5F09 | 625F | 5F78 | 7974 | 6570 | 040D | FFDA |
| 0000165540 | 026E | 5F07 | 705F | 6972 | 746E | 040B | FFD0 | 0202 |
| 0000165560 | 5F05 | 6C5F | 6C76 | 040D | FFDE | 0718 | 5F07 | 635F |
| 0000165600 | 6F6C | 6B63 | 040D | FFF0 | 00C0 | 5F07 | 735F | 6174 |
| 0000165620 | 6B63 | 050E | 02E2 | 0005 | 0716 | 5F06 | 665F | 6E75 |
| 0000165640 | 0163 | 2202 | 3801 | 1A29 | 0107 | 1001 | F600 | 0000 |
| 0000165660 | 0400 | 7313 | 6E65 | 5F64 | 736D | 5F67 | 6F74 | 705F |
| 0000165700 | 6F72 | 6563 | 7373 | 0409 | 0006 | 0635 | 6D03 | 6773 |
| 0000165720 | 040A | FFFC | 0081 | 7304 | 6174 | 0174 | 1D02 | 3901 |
| 0000165740 | 1C2A | A607 | 1001 | 9B00 | 0001 | 0400 | 740E | 5F6D |
| 0000165760 | 7270 | 636F | 7365 | 5F73 | 736D | 0C67 | FA04 | C0FF |
| 0000166000 | 0600 | 5F5F | 7974 | 6570 | 040F | FFF4 | 0085 | 5F09 |
| 0000166020 | 625F | 5F78 | 7974 | 6570 | 040D | FFE4 | 026E | 5F07 |
| 0000166040 | 705F | 6972 | 746E | 040B | FFDC | 0202 | 5F05 | 6C5F |
| 0000166060 | 6C76 | 040D | FFE8 | 0718 | 5F07 | 635F | 6F6C | 6B63 |
| 0000166100 | 040D | FFF6 | 00C0 | 5F07 | 735F | 6174 | 6B63 | 040E |
| 0000166120 | FFE2 | 0081 | 5F08 | 725F | 7465 | 6176 | 0E6C | 3E05 |
| 0000166140 | 0503 | 1E00 | 0607 | 5F5F | 7566 | 636E | 0201 | 011F |
| 0000166160 | 2BDF | 0721 | 045E | 0010 | 0453 | 0000 | 1004 | 6D74 |
| 0000166200 | 705F | 6F72 | 6563 | 7373 | 6D5F | 6773 | 315F | 0409 |
| 0000166220 | 0006 | 0635 | 6D03 | 6773 | 040A | FFFC | 0081 | 7304 |
| 0000166240 | 6174 | 1074 | DA04 | DCFF | 0A05 | 7563 | 5F72 | 6170 |
| 0000166260 | 6172 | 736D | 0005 | 2EFB | 0043 | 040D | FFD6 | 0081 |
| 0000166300 | 6307 | 6C61 | 6E6C | 6D75 | 040E | FFD8 | 0081 | 6308 |
| 0000166320 | 6C61 | 5F6C | 656C | 0C6E | D204 | 84FF | 0606 | 6370 |
| 0000166340 | 6C61 | 736C | 0201 | 0201 | 0D05 | 0000 | 001A | 050F |
| 0000166360 | 02D0 | 0005 | 00C0 | 4207 | 785F | 6946 | 656C | 050F |
| 0000166400 | 02D4 | 0005 | 00C0 | 4207 | 785F | 6150 | 6B63 | 050E |
| 0000166420 | 0000 | 0004 | 00C0 | 7406 | 5F6D | 6168 | 1662 | D805 |
| 0000166440 | 0502 | 8500 | 0E00 | 616D | 6E69 | 655F | 6978 | 5F74 |
| 0000166460 | 6C66 | 6761 | 050E | 0206 | 0004 | 00C0 | 7406 | 5F6D |
| 0000166500 | 6D68 | 1471 | 0005 | 0000 | 8100 | 0C00 | 7842 | 445F |
| 0000166520 | 6265 | 6775 | 6F4D | 6564 | 0515 | 02DA | 0005 | 0085 |
| 0000166540 | 730D | 6275 | 655F | 6978 | 5F74 | 6C66 | 6761 | 050F |
| 0000166560 | 02DC | 0005 | 0086 | 6D07 | 6773 | 735F | 6D65 | 0514 |
| 0000166600 | 0000 | 0000 | 0081 | 420C | 5F78 | 6954 | 656D | 4D73 |
| 0000166620 | 646F | 0F65 | E005 | 0502 | 8500 | 0700 | 6F77 | 6B72 |
| 0000166640 | 6E69 | 1067 | 7405 | 050D | 3500 | 0806 | 6C67 | 626F |
| 0000166660 | 6D5F | 6773 | 0516 | 0004 | 0004 | 0081 | 740E | 5F6D |
| 0000166700 | 656B | 5F79 | 6465 | 7469 | 6E69 | 1367 | 6405 | 0503 |
| 0000166720 | 8100 | 0B00 | 7563 | 5F72 | 7475 | 6C69 | 7469 | 0579 |
| 0000166740 | 0111 | 0000 | 1D00 | 3E01 | 6430 | 9807 | 1000 | 8D00 |
| 0000166760 | 0000 | 0400 | 740E | 5F6D | 7263 | 6165 | 6574 | 745F |
| 0000167000 | 7365 | 0F74 | 0604 | C000 | 0900 | 6574 | 7473 | 6E5F |
| 0000167020 | 6D61 | 0F65 | 0A04 | 8100 | 0900 | 6574 | 7473 | 745F |

THU MAR 14 17:48:06 1991 TM.EXE PAGE 44, LINE 2538

| | | | | | | | | | |
|---|---|---|---|---|---|---|---|---|---|
| 0000167040 | 7079 | 0C65 | FA04 | 86FF | 0600 | 7564 | 5F6D | 6469 |
| 0000167060 | 040A | FFF8 | 0081 | 7304 | 6174 | 0174 | 1B02 | D601 |
| 0000167100 | 6630 | 2207 | 1001 | 1700 | 0001 | 0400 | 740C | 5F6D |
| 0000167120 | 706F | 6E65 | 745F | 7365 | 0F74 | 0604 | C000 | 0900 |
| 0000167140 | 6574 | 7473 | 6E5F | 6D61 | 0A65 | F004 | 81FF | 0400 |
| 0000167160 | 7473 | 7461 | 040F | FFF6 | 06A4 | 7409 | 7365 | 5F74 |
| 0000167200 | 7461 | 7274 | 040D | FFF2 | 0086 | 7407 | 7365 | 5F74 |
| 0000167220 | 6469 | 040F | FFFA | 00C0 | 6609 | 6C75 | 5F6C | 616E |
| 0000167240 | 656D | 0005 | 317F | 003D | 040B | FFEE | 0081 | 7305 |
| 0000167260 | 6174 | 3174 | 0201 | 0201 | 011B | 31F8 | 0767 | 0042 |
| 0000167300 | 0010 | 0037 | 0000 | 0C04 | 6D74 | 735F | 7661 | 5F65 |
| 0000167320 | 6574 | 7473 | 040A | FFFC | 0081 | 7304 | 6174 | 0174 |
| 0000167340 | 2402 | 3A01 | 6832 | 4E07 | 1001 | 4300 | 0001 | 0400 |
| 0000167360 | 7415 | 5F6D | 6C63 | 736F | 5F65 | 7563 | 7272 | 6E65 |
| 0000167400 | 5F74 | 6574 | 7473 | 040A | FEF4 | 0081 | 7304 | 6174 |
| 0000167420 | 0A74 | F604 | A4FE | 0406 | 7461 | 7274 | 040F | FEFE |
| 0000167440 | 0624 | 7409 | 7365 | 5F74 | 616E | 656D | 040A | FEFA |
| 0000167460 | 0081 | 7204 | 7365 | 1070 | FC04 | 85FE | 0A00 | 7563 |
| 0000167500 | 7272 | 7562 | 5F66 | 6F6E | 0201 | 0118 | 3388 | 076B |
| 0000167520 | 0120 | 0010 | 0115 | 0000 | 0904 | 6D74 | 695F | 706D |
| 0000167540 | 726F | 0F74 | 0604 | C000 | 0900 | 6966 | 656C | 6E5F |
| 0000167560 | 6D61 | 1265 | FA04 | C0FF | 0C00 | 6264 | 665F | 6C69 |
| 0000167600 | 5F65 | 616E | 656D | 040A | FFF4 | 0081 | 7304 | 6174 |
| 0000167620 | 0874 | F6D4 | C0FF | 0200 | 7473 | 0201 | 0118 | 34A8 |
| 0000167640 | 076F | 00EB | 0010 | 00E0 | 0000 | 0904 | 6D74 | 655F |
| 0000167660 | 7078 | 726F | 0F74 | 0604 | C000 | 0900 | 6966 | 656C |
| 0000167700 | 6E5F | 6D61 | 1265 | FA04 | C0FF | 0C00 | 6264 | 665F |
| 0000167720 | 6C69 | 5F65 | 616E | 656D | 040A | FFF4 | 0081 | 7304 |
| 0000167740 | 6174 | 0874 | F604 | C0FF | 0200 | 7473 | 0201 | 011F |
| 0000167760 | 3593 | 0770 | 0158 | 0010 | 014D | 0000 | 1004 | 6D74 |
| 0000170000 | 735F | 6977 | 6374 | 5F68 | 6572 | 6F63 | 6472 | 0415 |
| 0000170020 | FFF6 | 0081 | 6E0F | 7765 | 725F | 6365 | 726F | 5F64 |
| 0000170040 | 6F6D | 6564 | 040A | FFF8 | 0081 | 7304 | 6174 | 0A74 |
| 0000170060 | FA04 | 79FF | 0406 | 6572 | 7073 | 0201 | 0125 | 36EB |
| 0000170100 | 0773 | 012E | 0010 | 0123 | 0000 | 1604 | 6D74 | 695F |
| 0000170120 | 736E | 7265 | 5F74 | 6863 | 6365 | 5F6B | 6373 | 6572 |
| 0000170140 | 6E65 | 040E | 0006 | 0082 | 6408 | 6665 | 745F | 6D69 |
| 0000170160 | 0865 | CC04 | FBFF | 0206 | 7473 | 040E | FFAC | 0254 |
| 0000170200 | 7308 | 7263 | 6E5F | 6D61 | 0A65 | AA04 | 81FF | 0400 |
| 0000170220 | 7473 | 7461 | 0201 | 011E | 3819 | 0775 | 00A4 | 0010 |
| 0000170240 | 0099 | 0000 | 0F04 | 6D74 | 6D5F | 7261 | 5F6B | 6F6C |
| 0000170260 | 6163 | 6F74 | 0E72 | C204 | 79FF | 0806 | 6572 | 7073 |
| 0000170300 | 6E6F | 6573 | 0408 | FFCC | 06FB | 7302 | 0A74 | C604 |
| 0000170320 | 81FF | 0400 | 7473 | 7461 | 0407 | FFCA | 0081 | 7801 |
| 0000170340 | 0407 | FFC8 | 0081 | 7901 | 0201 | 011C | 38BD | 0778 |
| 0000170360 | 0093 | 0010 | 0088 | 0000 | 0D04 | 6D74 | 735F | 7465 |
| 0000170400 | 765F | 7265 | 6669 | 1179 | 0604 | 8500 | 0B00 | 6576 |
| 0000170420 | 6972 | 7966 | 665F | 616C | 1367 | 0804 | C000 | 0D00 |
| 0000170440 | 6964 | 6666 | 6E5F | 6D61 | 5F65 | 6170 | 0A72 | FC04 |
| 0000170460 | 81FF | 0400 | 7473 | 7461 | 0201 | 0114 | 3950 | 077A |
| 0000170500 | 0112 | 0010 | 0107 | 0000 | 0504 | 6D74 | 675F | 0B6F |
| 0000170520 | 0604 | 8100 | 0500 | 6F67 | 6D63 | 0A64 | F804 | 81FF |
| 0000170540 | 0400 | 7473 | 7461 | 040F | FFFA | 00C0 | 7409 | 7365 |
| 0000170560 | 5F74 | 616E | 656D | 0516 | 0524 | 0005 | 06EE | 670E |
| 0000170600 | 636F | 646D | 325F | 725F | 7065 | 726F | 0174 | 1A02 |
| 0000170620 | 6201 | 7D3A | 0307 | 1001 | F800 | 0000 | 0400 | 740B |
| 0000170640 | 5F6D | 706F | 6E65 | 725F | 7065 | 040F | 0006 | 00C0 |
| 0000170660 | 7409 | 7365 | 5F74 | 616E | 656D | 040C | FFFC | 0081 |
| 0000170700 | 7206 | 7065 | 695F | 0A64 | F604 | 81FF | 0400 | 7473 |

THU MAR 14 17:48:06 1991 TM.EXE PAGE 45, LINE 2597

| | | | | | | | | |
|---|---|---|---|---|---|---|---|---|
| 0000170720 | 7461 | 040A | FFF8 | 0679 | 7204 | 7365 | 0170 | 1702 |
| 0000170740 | 6501 | 7E3B | BF07 | 1000 | B400 | 0000 | 0400 | 7408 |
| 0000170760 | 5F6D | 6261 | 726F | 0A74 | FC04 | 81FF | 0400 | 7473 |
| 0000171000 | 7461 | 0201 | 011D | 3C24 | 077F | 0066 | 0010 | 005B |
| 0000171020 | 0000 | 0E04 | 6D74 | 6D5F | 6B61 | 5F65 | 6572 | 6F70 |
| 0000171040 | 7472 | 040F | FFF6 | 06A4 | 7409 | 7365 | 5F74 | 7461 |
| 0000171060 | 7274 | 040F | FFFA | 00C0 | 7409 | 7365 | 5F74 | 616E |
| 0000171100 | 656D | 040A | FFF4 | 0081 | 7304 | 6174 | 0174 | 1E02 |
| 0000171120 | 8A01 | 8D3C | 1807 | 1001 | 0D00 | 0001 | 0400 | 740F |
| 0000171140 | 5F6D | 6873 | 776F | 725F | 7365 | 6C75 | 7374 | 040F |
| 0000171160 | FEEE | 06A4 | 7409 | 7365 | 5F74 | 7461 | 7274 | 040F |
| 0000171200 | FFFA | 00C0 | 7409 | 7365 | 5F74 | 616E | 656D | 040F |
| 0000171220 | FEF2 | 00C0 | 6409 | 6669 | 5F66 | 616E | 656D | 040E |
| 0000171240 | FEF6 | 0624 | 6408 | 6669 | 5F66 | 7562 | 0A66 | EC04 |
| 0000171260 | 81FE | 0400 | 7473 | 7461 | 040D | FFF6 | 0086 | 6407 |
| 0000171300 | 6669 | 5F66 | 6469 | 0201 | 011D | 3DA2 | 0782 | 012D |
| 0000171320 | 0010 | 0122 | 0000 | 0E04 | 6D74 | 655F | 646E | 645F |
| 0000171340 | 7369 | 6C70 | 7961 | 040F | FFF2 | 06A4 | 7409 | 7365 |
| 0000171360 | 5F74 | 7461 | 7274 | 040F | FFFA | 00C0 | 7409 | 7365 |
| 0000171400 | 5F74 | 616E | 656D | 0412 | FEF0 | 0624 | 640C | 5F62 |
| 0000171420 | 6964 | 6666 | 6E5F | 6D61 | 0A65 | F004 | 81FF | 0400 |
| 0000171440 | 7473 | 7461 | 040A | FFF6 | 0679 | 7204 | 7365 | 0170 |
| 0000171460 | 1E02 | CF01 | 833E | 6907 | 1000 | 5E00 | 0000 | 0400 |
| 0000171500 | 740F | 5F6D | 6873 | 776F | 665F | 6C69 | 6574 | 7372 |
| 0000171520 | 040F | FFF6 | 06A4 | 7409 | 7365 | 5F74 | 7461 | 7274 |
| 0000171540 | 040F | FFFA | 00C0 | 7409 | 7365 | 5F74 | 616E | 656D |
| 0000171560 | 040A | FFF4 | 0081 | 7304 | 6174 | 0174 | 1A02 | 3801 |
| 0000171600 | 843F | 2707 | 1000 | 1C00 | 0000 | 0400 | 740B | 5F6D |
| 0000171620 | 7865 | 7063 | 645F | 6665 | 0201 | 011C | 3F5F | 0785 |
| 0000171640 | 0D69 | 001D | 005E | 0000 | 0D04 | 6D74 | 695F | 6F63 |
| 0000171660 | 5F6E | 656C | 7261 | 0F6E | F604 | A4FF | 0906 | 6574 |
| 0000171700 | 7473 | 615F | 7474 | 0F72 | FA04 | C0FF | 0900 | 6574 |
| 0000171720 | 7473 | 6E5F | 6D61 | 0A65 | F404 | 81FF | 0400 | 7473 |
| 0000171740 | 7461 | 0201 | 011C | 3FC8 | 0786 | 024A | 0010 | 023F |
| 0000171760 | 0000 | 0D04 | 6D74 | 635F | 656C | 6E61 | 7075 | 645F |
| 0000172000 | 0A62 | E004 | 81FF | 0400 | 7473 | 7461 | 040D | FFE2 |
| 0000172020 | 0086 | 7407 | 7365 | 5F74 | 6469 | 040F | FFFA | 00C0 |
| 0000172040 | 7409 | 7365 | 5F74 | 616E | 656D | 040F | FFEC | 0085 |
| 0000172060 | 6309 | 6968 | 646C | 635F | 746E | 0407 | FFEA | 0085 |
| 0000172100 | 6901 | 040F | FFF2 | 05B7 | 6309 | 6968 | 646C | 6C5F |
| 0000172120 | 7473 | 040F | FFF6 | 0086 | 6609 | 6961 | 656C | 5F64 |
| 0000172140 | 6469 | 0412 | FFEE | 00C0 | 660C | 6C75 | 5F6C | 6264 |
| 0000172160 | 6E5F | 6D61 | 0A65 | E604 | 79FF | 0406 | 6572 | 7073 |
| 0000172200 | 0201 | 011C | 4212 | 0787 | 0085 | 0010 | 007A | 0000 |
| 0000172220 | 0D04 | 6D74 | 685F | 6E61 | 6C64 | 5F65 | 6468 | 0A72 |
| 0000172240 | FA04 | D5FF | 0405 | 6874 | 705F | 040A | FFF8 | 0081 |
| 0000172260 | 7304 | 6174 | 0174 | 1D02 | 9701 | 8842 | F907 | 1002 |
| 0000172300 | EE00 | 0002 | 0400 | 740E | 5F6D | 7865 | 7469 | 635F |
| 0000172320 | 6568 | 6B63 | 0C73 | FA04 | C0FF | 0600 | 5F5F | 7974 |
| 0000172340 | 6570 | 040F | FEF2 | 0085 | 5F09 | 625F | 5F78 | 7974 |
| 0000172360 | 6570 | 040D | FEE0 | 078C | 5F07 | 705F | 6972 | 746E |
| 0000172400 | 040B | FED6 | 0202 | 5F05 | 6C5F | 6C76 | 040D | FEE4 |
| 0000172420 | 078E | 5F07 | 635F | 6F6C | 6B63 | 040D | FFF6 | 00C0 |
| 0000172440 | 5F07 | 735F | 6174 | 6B63 | 040E | FEDC | 0085 | 5F08 |
| 0000172460 | 725F | 7465 | 6176 | 0C6C | F404 | 85FE | 0600 | 7562 |
| 0000172500 | 5F66 | 6F6E | 040E | FEBE | 00C0 | 6208 | 6675 | 6E5F |
| 0000172520 | 6D61 | 0865 | F604 | 24FE | 0206 | 7473 | 040D | FEC2 |
| 0000172540 | 0791 | 7007 | 736F | 6674 | 7869 | 0409 | FEBC | 0081 |
| 0000172560 | 6C03 | 6E65 | 040A | FEDE | 0081 | 7304 | 6174 | 0A74 |

THU MAR 14 17:48:06 1991 TM.EXE PAGE 46, LINE 2656

| | | | | | | | | |
|---|---|---|---|---|---|---|---|---|
| 0000172600 | F004 | 81FE | 0400 | 6572 | 7073 | 050E | 0596 | 0005 |
| 0000172620 | 078B | 5F06 | 665F | 6E75 | 0163 | 0502 | 000D | 1A00 |
| 0000172640 | 0F00 | 5C05 | 0503 | C000 | 0700 | 5F42 | 4678 | 6C69 |
| 0000172660 | 0F65 | 6005 | 0503 | C000 | 0700 | 5F42 | 5078 | 6361 |
| 0000172700 | 146B | 0005 | 0000 | 8100 | 0C00 | 7842 | 445F | 6265 |
| 0000172720 | 6775 | 6F4D | 6564 | 0514 | 0000 | 0000 | 0081 | 420C |
| 0000172740 | 5F78 | 6954 | 656D | 4D73 | 646F | 1565 | 6605 | 0503 |
| 0000172760 | 2400 | 0D06 | 6572 | 6F70 | 7472 | 6465 | 745F | 7365 |
| 0000173000 | 1374 | 6405 | 0503 | 8100 | 0B00 | 7563 | 5F72 | 7475 |
| 0000173020 | 6C69 | 7469 | 0579 | 0111 | 0000 | 1E00 | 9001 | AF45 |
| 0000173040 | 8F07 | 1600 | 8300 | 0000 | 0400 | 740F | 5F6D | 6D63 |
| 0000173060 | 775F | 6961 | 5F74 | 6F68 | 6B6F | 0201 | 0116 | 461F |
| 0000173100 | 07B1 | 0806 | 0010 | 07FB | 0000 | 0704 | 6D74 | 695F |
| 0000173120 | 696E | 0A74 | 0604 | 8100 | 0400 | 7261 | 6367 | 040A |
| 0000173140 | 0008 | 0205 | 6104 | 6772 | 0C76 | FA04 | C0FF | 0600 |
| 0000173160 | 5F5F | 7974 | 6570 | 040F | FFCE | 0085 | 5F09 | 625F |
| 0000173200 | 5F78 | 7974 | 6570 | 040D | FFBE | 022A | 5F07 | 705F |
| 0000173220 | 6972 | 746E | 040B | FFB0 | 0202 | 5F05 | 6C5F | 6C76 |
| 0000173240 | 040D | FFC2 | 07B5 | 5F07 | 635F | 6F6C | 6B63 | 040D |
| 0000173260 | FFD6 | 00C0 | 5F07 | 735F | 6174 | 6B63 | 040E | FFB6 |
| 0000173300 | 0081 | 5F08 | 725F | 7465 | 6176 | 0B6C | D204 | C0FF |
| 0000173320 | 0500 | 6E65 | 5F76 | 0E70 | DA04 | ECFF | 0802 | 6F6C |
| 0000173340 | 5F67 | 616E | 656D | 040C | FFAE | 0085 | 6406 | 6D75 |
| 0000173360 | 685F | 0A70 | B804 | 81FF | 0400 | 7473 | 7461 | 0407 |
| 0000173400 | FFD0 | 0081 | 6901 | 0410 | FFBA | 0086 | 640A | 6D75 |
| 0000173420 | 6F5F | 6A62 | 695F | 0E64 | F405 | 0505 | B400 | 0607 |
| 0000173440 | 5F5F | 7566 | 636E | 0005 | 4B33 | 00A2 | 0407 | FFAA |
| 0000173460 | 00C0 | 6301 | 0201 | 0201 | 0118 | 4E25 | 07B7 | 0182 |
| 0000173500 | 0010 | 0177 | 0000 | 0904 | 6D74 | 665F | 6E69 | 7369 |
| 0000173520 | 0B68 | DA04 | 02FF | 0502 | 5F5F | 766C | 0D6C | E804 |
| 0000173540 | B5FF | 0707 | 5F5F | 6C63 | 636F | 0D6B | F604 | C0FF |
| 0000173560 | 0700 | 5F5F | 7473 | 6361 | 0E6B | E004 | 81FF | 0800 |
| 0000173600 | 5F5F | 6572 | 7674 | 6C61 | 040A | FFE2 | 0081 | 7304 |
| 0000173620 | 6174 | 0C74 | FA04 | C0FF | 0600 | 5F5F | 7974 | 6570 |
| 0000173640 | 040F | FFF4 | 0085 | 5F09 | 625F | 5F78 | 7974 | 6570 |
| 0000173660 | 040D | FFE4 | 022A | 5F07 | 705F | 6972 | 746E | 0512 |
| 0000173700 | 0D78 | 0005 | 06D9 | 660A | 6E69 | 7369 | 5F68 | 736D |
| 0000173720 | 0E67 | 0405 | 0506 | B900 | 0607 | 5F5F | 7566 | 636E |
| 0000173740 | 0201 | 0D05 | 0000 | 001A | 050F | 05B2 | 0005 | 00C0 |
| 0000173760 | 4207 | 785F | 6946 | 656C | 050F | 05B6 | 0005 | 00C0 |
| 0000174000 | 4207 | 785F | 6150 | 6B63 | 0514 | 0000 | 0000 | 0081 |
| 0000174020 | 420C | 5F78 | 6544 | 7562 | 4D67 | 646F | 1465 | 0005 |
| 0000174040 | 0000 | 8100 | 0C00 | 7842 | 545F | 6D69 | 7365 | 6F4D |
| 0000174060 | 6564 | 1105 | 0001 | 0000 | 011D | 4FA8 | 069F | 00B4 |
| 0000174100 | 0010 | 00A9 | 0000 | 0E04 | 6D74 | 785F | 616C | 6F74 |
| 0000174120 | 5F72 | 6E69 | 7469 | 040A | FFF6 | 0085 | 6204 | 6F6F |
| 0000174140 | 0B6C | FA04 | 86FF | 0500 | 6C75 | 6E6F | 0A67 | F804 |
| 0000174160 | 81FF | 0400 | 7473 | 7461 | 0201 | 0125 | 505C | 06A3 |
| 0000174200 | 002F | 0010 | 0024 | 0000 | 1604 | 6D74 | 695F | 696E |
| 0000174220 | 5F74 | 6C78 | 7461 | 726F | 735F | 7365 | 6973 | 6E6F |
| 0000174240 | 0201 | 011D | 508B | 06A5 | 0235 | 0010 | 022A | 0000 |
| 0000174260 | 0E04 | 6D74 | 785F | 616C | 6574 | 655F | 6576 | 746E |
| 0000174300 | 0409 | 0006 | 05B0 | 6D03 | 6773 | 0411 | FFFC | 0081 |
| 0000174320 | 630B | 7672 | 635F | 6D6F | 616D | 646E | 040A | FFFA |
| 0000174340 | 0081 | 7304 | 6174 | 0174 | 1C02 | C001 | A852 | 0206 |
| 0000174360 | 1002 | F700 | 0001 | 0400 | 740D | 5F6D | 7277 | 7469 |
| 0000174400 | 5F65 | 7974 | 6570 | 0411 | 0006 | 0081 | 630B | 7672 |
| 0000174420 | 635F | 6D6F | 616D | 646E | 0409 | 0008 | 0689 | 6D03 |
| 0000174440 | 6773 | 040A | FFD4 | 05EE | 6104 | 7474 | 0872 | D804 |

THU MAR 14 17:48:06 1991 TM.EXE PAGE 47, LINE 2715

| | | | | | | | | |
|---|---|---|---|---|---|---|---|---|
| 0000174460 | A9FF | 0206 | 7473 | 040E | FFCE | 0082 | 6408 | 6665 |
| 0000174500 | 745F | 6D69 | 0F65 | F604 | 3BFF | 0906 | 6574 | 6863 |
| 0000174520 | 695F | 6574 | 0F6D | CC04 | 85FF | 0900 | 6974 | 656D |
| 0000174540 | 755F | 696E | 0A74 | D204 | 81FF | 0400 | 7473 | 7461 |
| 0000174560 | 0201 | 0119 | 54C2 | 06AC | 0205 | 0010 | 01FA | 0000 |
| 0000174600 | 0A04 | 6D74 | 615F | 6464 | 6B5F | 7965 | 0409 | 0006 |
| 0000174620 | 0084 | 6B03 | 7965 | 040A | FFF6 | 05EE | 6104 | 7474 |
| 0000174640 | 0A72 | FA04 | C0FF | 0400 | 616E | 656D | 040A | FFF4 |
| 0000174660 | 0081 | 7304 | 6174 | 0174 | 2002 | C701 | AE56 | 8306 |
| 0000174700 | 1001 | 7800 | 0001 | 0400 | 7411 | 5F6D | 6461 | 5F64 |
| 0000174720 | 6465 | 7469 | 6465 | 6B5F | 7965 | 0411 | 0006 | 0081 |
| 0000174740 | 630B | 7672 | 635F | 6D6F | 616D | 646E | 0409 | 0008 |
| 0000174760 | 0084 | 6B03 | 7965 | 040A | FFFA | 05EE | 6104 | 7474 |
| 0000175000 | 0A72 | F804 | 81FF | 0400 | 7473 | 7461 | 0201 | 011F |
| 0000175020 | 584A | 06AF | 0071 | 0010 | 0066 | 0000 | 1004 | 6D74 |
| 0000175040 | 745F | 7265 | 696D | 616E | 6574 | 735F | 7165 | 0409 |
| 0000175060 | FFFA | 0682 | 7403 | 706D | 0201 | 011B | 58BB | 06B0 |
| 0000175100 | 0086 | 0010 | 007B | 0000 | 0C04 | 6D74 | 695F | 696E |
| 0000175120 | 5F74 | 7974 | 6570 | 0201 | 0120 | 5941 | 06B3 | 00D8 |
| 0000175140 | 0010 | 00CD | 0000 | 1104 | 6D74 | 745F | 7265 | 696D |
| 0000175160 | 616E | 6574 | 745F | 7079 | 0D65 | FA04 | 86FF | 0700 |
| 0000175200 | 6574 | 6863 | 695F | 0864 | DC04 | A9FF | 0206 | 7473 |
| 0000175220 | 040A | FFDA | 0081 | 7304 | 6174 | 0174 | 1D02 | 1901 |
| 0000175240 | B75A | DE06 | 1000 | D300 | 0000 | 0400 | 740E | 5F6D |
| 0000175260 | 7277 | 7469 | 5F65 | 746D | 7079 | 0965 | 0604 | 9000 |
| 0000175300 | 0306 | 736D | 0967 | EA04 | 85FF | 0300 | 6C6F | 0964 |
| 0000175320 | FA04 | 85FF | 0300 | 656E | 0777 | FC04 | 81FF | 0100 |
| 0000175340 | 0D69 | EC04 | 81FF | 0700 | 6F63 | 6D6D | 6E61 | 0D64 |
| 0000175360 | EE04 | 61FF | 0705 | 656B | 5F79 | 736D | 0A67 | F804 |
| 0000175400 | 81FF | 0400 | 7473 | 7461 | 0201 | 011C | 5AF7 | 06B9 |
| 0000175420 | 00B7 | 0010 | 00AC | 0000 | 0D04 | 6D74 | 775F | 6972 |
| 0000175440 | 6574 | 6D5F | 766F | 0965 | 0604 | 9300 | 0306 | 736D |
| 0000175460 | 0A67 | AA04 | C0FF | 0400 | 7473 | 7461 | 0408 | FFAE |
| 0000175500 | 06BA | 7302 | 0174 | 1D02 | AE01 | BF5B | 5D06 | 1000 |
| 0000175520 | 5200 | 0000 | 0400 | 740E | 5F6D | 7277 | 7469 | 5F65 |
| 0000175540 | 7274 | 6361 | 106B | 0604 | C200 | 0A00 | 7274 | 6361 |
| 0000175560 | 5F6B | 6469 | 705F | 0408 | FFAA | 06BA | 7302 | 0E74 |
| 0000175600 | FA04 | 82FF | 0800 | 7274 | 6361 | 5F6B | 6469 | 0201 |
| 0000175620 | 011C | 5C0B | 06C1 | 00B2 | 0010 | 00A7 | 0000 | 0D04 |
| 0000175640 | 6D74 | 775F | 6972 | 6574 | 745F | 6365 | 0968 | 0604 |
| 0000175660 | 9800 | 0306 | 736D | 0D67 | FA04 | 86FF | 0700 | 6574 |
| 0000175700 | 6863 | 695F | 0864 | D404 | A9FF | 0206 | 7473 | 040F |
| 0000175720 | FFF2 | 063B | 7409 | 6365 | 5F68 | 7469 | 6D65 | 0201 |
| 0000175740 | 0116 | 5CBD | 06C4 | 00FD | 0010 | 00F2 | 0000 | 0704 |
| 0000175760 | 6461 | 5F64 | 6573 | 0971 | 0604 | 8400 | 0300 | 6573 |
| 0000176000 | 0771 | FA04 | 82FF | 0106 | 0170 | 1902 | BA01 | C65D |
| 0000176020 | EC06 | 1000 | E100 | 0000 | 0400 | 720A | 6D65 | 766F |
| 0000176040 | 5F65 | 6573 | 0971 | 0604 | 8400 | 0300 | 6573 | 0771 |
| 0000176060 | FA04 | 82FF | 0106 | 0970 | F604 | 82FF | 0306 | 6D74 |
| 0000176100 | 0170 | 1102 | 6C05 | 0506 | 8600 | 0906 | 6F6D | 6576 |
| 0000176120 | 6C5F | 7369 | 1074 | 9205 | 050D | 8600 | 0806 | 6E65 |
| 0000176140 | 5F64 | 6F6D | 6576 | 0D05 | 0000 | 001A | 0513 | 065A |
| 0000176160 | 0005 | 0081 | 630B | 7275 | 635F | 6D6F | 616D | 646E |
| 0000176200 | 0510 | 065C | 0005 | 0682 | 7308 | 7165 | 6C5F | 7369 |
| 0000176220 | 0D74 | 6005 | 0506 | 8500 | 0500 | 6873 | 6669 | 0C74 |
| 0000176240 | 6205 | 0506 | 8500 | 0400 | 6163 | 7370 | 0516 | 0004 |
| 0000176260 | 0004 | 0081 | 740E | 5F6D | 656B | 5F79 | 6465 | 7469 |
| 0000176300 | 6E69 | 1167 | 9805 | 050D | 4500 | 0906 | 6574 | 6863 |
| 0000176320 | 6C5F | 7369 | 1074 | 9005 | 050D | 8400 | 0800 | 6F6C |

THU MAR 14 17:48:06 1991 TM.EXE PAGE 48, LINE 2774

| | | | | | | | | |
|---|---|---|---|---|---|---|---|---|
| 0000176340 | 6163 | 6974 | 6E6F | 0510 | 0D96 | 0005 | 0084 | 6308 |
| 0000176360 | 7275 | 6D5F | 656B | 1679 | 6405 | 0506 | 8400 | 0E00 |
| 0000176400 | 6572 | 656C | 7361 | 6465 | 6D5F | 656B | 7379 | 0512 |
| 0000176420 | 0666 | 0005 | 0085 | 700A | 6572 | 7373 | 695F | 5F73 |
| 0000176440 | 1831 | 6805 | 0506 | 8500 | 1000 | 6163 | 7370 | 735F |
| 0000176460 | 6968 | 7466 | 755F | 7070 | 7265 | 0513 | 066A | 0005 |
| 0000176500 | 0085 | 740B | 7079 | 5F65 | 7277 | 7469 | 6E65 | 6D06 |
| 0000176520 | 6961 | 2E6E | 0163 | 9F00 | 6300 | 0C00 | 6427 | 1C00 |
| 0000176540 | 6527 | 2E00 | 6B27 | C000 | 6C27 | E200 | 6D27 | EA00 |
| 0000176560 | 6F27 | 4C00 | 7128 | 5600 | 7428 | 6000 | 7528 | 8000 |
| 0000176600 | 7628 | 8300 | 7828 | 9000 | 7928 | AF00 | 7A28 | B700 |
| 0000176620 | 7B28 | BA00 | 7C28 | C800 | 7D28 | CB00 | 7E28 | 2D00 |
| 0000176640 | 8A29 | 3800 | 8D29 | 4800 | 9029 | 5200 | 9129 | 5A00 |
| 0000176660 | 9429 | 6000 | 9629 | 6C00 | 9729 | 7200 | 9929 | 7800 |
| 0000176700 | 9D29 | 7B00 | A029 | 8300 | A329 | 8B00 | A629 | 9300 |
| 0000176720 | A929 | 9B00 | AA29 | A300 | B129 | E500 | B229 | EF00 |
| 0000176740 | B329 | F800 | B429 | FB00 | B529 | 0100 | B62A | 0E00 |
| 0000176760 | B72A | 2200 | B92A | 2800 | BA2A | 2E00 | CB2A | 3900 |
| 0000177000 | CC2A | 4900 | CD2A | DC00 | CF2A | 0600 | D02B | 1A00 |
| 0000177020 | D22B | 3800 | D32B | 4200 | D42B | 4B00 | D52B | 5100 |
| 0000177040 | D62B | 5E00 | D72B | 6E00 | D82B | 7100 | D92B | D400 |
| 0000177060 | E52B | DF00 | E62B | EF00 | F52B | F400 | F82B | FB00 |
| 0000177100 | FA2B | 0500 | FB2C | 1D00 | FE2C | 2000 | FF2C | 3600 |
| 0000177120 | 022C | 3901 | 032C | 4101 | 062C | 4401 | 072C | 4C01 |
| 0000177140 | 0A2C | 4F01 | UB2C | 5701 | 0E2C | 5A01 | 0F2C | 7001 |
| 0000177160 | 122C | 7301 | 132C | 8901 | 162C | 8C01 | 172C | 9901 |
| 0000177200 | 182C | 9C01 | 192C | A101 | 1A2C | A701 | 1D2C | AA01 |
| 0000177220 | 1E2C | B201 | 212C | B501 | 232C | C501 | 262C | C801 |
| 0000177240 | 272C | D001 | 2A2C | D301 | 2B2C | E401 | 2E2C | E701 |
| 0000177260 | 2F2C | F301 | 322C | F601 | 332C | 0501 | 362D | 0801 |
| 0000177300 | 372D | 1D01 | 382D | 2701 | 392D | 3101 | 3D2D | 3401 |
| 0000177320 | 3E2D | 5101 | 462D | 5401 | 472D | 5901 | 482D | 5E01 |
| 0000177340 | 4C2D | 6F01 | 4D2D | 8F01 | 4E2D | 9401 | 4F2D | 9901 |
| 0000177360 | 532D | 9C01 | 542D | A101 | 572D | A401 | 582D | A901 |
| 0000177400 | 5A2D | B301 | 5D2D | B601 | 5E2D | C301 | 612D | C601 |
| 0000177420 | 622D | D301 | 652D | D601 | 662D | E301 | 692D | E691 |
| 0000177440 | 6A2D | F301 | 6D2D | F601 | 6E2D | FB01 | 722D | 0001 |
| 0000177460 | 732E | 2001 | 762E | 2301 | 772E | 2F01 | 7A2E | 3201 |
| 0000177500 | 7D2E | 3501 | 7E2E | 4A01 | 7F2E | 5401 | 802E | 5E01 |
| 0000177520 | 832E | 6101 | 842E | 6901 | 872E | 6C01 | 882E | 7401 |
| 0000177540 | 8B2E | 7701 | 8C2E | 7F01 | 8F2E | 8201 | 902E | 8A01 |
| 0000177560 | 932E | 8D01 | 942E | A101 | 972E | A401 | 982E | B301 |
| 0000177600 | 992E | B801 | 9A2E | C301 | 9B2E | C801 | 9E2E | CB01 |
| 0000177620 | 9F2E | E201 | A22E | E501 | A32E | ED01 | A62E | F001 |
| 0000177640 | A72E | F801 | B32E | FB01 | B42E | 0801 | B52F | 1201 |
| 0000177660 | B62F | 2A01 | B72F | 3B01 | BB2F | 3E01 | BC2F | 4A01 |
| 0000177700 | BE2F | 4D01 | C02F | 1101 | C130 | 2001 | C530 | 2801 |
| 0000177720 | C630 | 3201 | 0730 | 6D74 | 6F5F | 2E70 | 0163 | 4100 |
| 0000177740 | 5301 | 3E00 | 5430 | 4E00 | 5730 | 5600 | 5930 | 7E00 |
| 0000177760 | 5B30 | 8400 | 5C30 | A300 | 5E30 | A900 | 5F30 | BF00 |
| 0000200000 | 6130 | C500 | 6230 | CB00 | 6B30 | D600 | 7230 | E600 |
| 0000200020 | 7330 | 0700 | 7431 | 0D00 | 7531 | 2E00 | 7B31 | 3400 |
| 0000200040 | 7D31 | 5D00 | 8031 | 6300 | 8331 | 7F00 | 8431 | 8D00 |
| 0000200060 | 8531 | A100 | 8631 | B600 | 8931 | BC00 | 8A31 | CE00 |
| 0000200100 | 8C31 | D400 | 8D31 | E700 | 8E31 | ED00 | 9831 | F800 |
| 0000200120 | 9B31 | 0800 | 9C32 | 2300 | 9E32 | 2900 | 9F32 | 2F00 |
| 0000200140 | A932 | 3A00 | B032 | 4A00 | B532 | 5300 | B832 | 6400 |
| 0000200160 | B932 | 7400 | BA32 | 7E00 | BD32 | 8400 | BE32 | 9900 |
| 0000200200 | BF32 | B300 | C132 | C400 | C232 | E100 | C632 | E800 |

THU MAR 14 17:48:06 1991 TM.EXE PAGE 49, LINE 2833

| | | | | | | | | |
|---|---|---|---|---|---|---|---|---|
| 0000200220 | CB32 | F100 | CC32 | FE00 | CD32 | 0B00 | CE33 | 2D00 |
| 0000200240 | CF33 | 3400 | D033 | 3700 | D133 | 5600 | D233 | 5D00 |
| 0000200260 | D333 | 7000 | D633 | 7700 | D733 | 7D00 | E133 | 8800 |
| 0000200300 | E733 | 9800 | E933 | BC00 | EC33 | C200 | EE33 | 0400 |
| 0000200320 | EF34 | 2200 | F034 | 3B00 | F234 | 4100 | F334 | 4F00 |
| 0000200340 | F634 | 6200 | F834 | 6D00 | FA34 | 9100 | FD34 | 9700 |
| 0000200360 | FE34 | 9D00 | 0834 | A801 | 0E34 | B801 | 1034 | DC01 |
| 0000200400 | 1334 | E201 | 1534 | 2401 | 1635 | 4201 | 1735 | 5B01 |
| 0000200420 | 1935 | 6101 | 1A35 | 6F01 | 1C35 | 8201 | 1D35 | 8801 |
| 0000200440 | 2735 | 9301 | 2C35 | A301 | 2E35 | BA01 | 2F35 | C301 |
| 0000200460 | 3135 | D001 | 3335 | DE01 | 3535 | 0201 | 3636 | 0801 |
| 0000200500 | 3736 | 2301 | 3936 | 2901 | 3A36 | 2E01 | 3C36 | 3C01 |
| 0000200520 | 3D36 | 3F01 | 3F36 | 6301 | 4036 | 6901 | 4136 | 8401 |
| 0000200540 | 4336 | 8A01 | 4436 | 9801 | 4536 | 9D01 | 4836 | A201 |
| 0000200560 | 4936 | AA01 | 4A36 | C501 | 4C36 | DA01 | 4D36 | E001 |
| 0000200600 | 5736 | EB01 | 6036 | FB01 | 6136 | 3701 | 6737 | 3D01 |
| 0000200620 | 6837 | 5D01 | 6A37 | 6301 | 6B37 | 7601 | 6C37 | 8A01 |
| 0000200640 | 6D37 | 8D01 | 6F37 | A101 | 7037 | B701 | 7237 | BD01 |
| 0000200660 | 7637 | C201 | 7737 | FC01 | 7B37 | 0801 | 7C38 | 0E01 |
| 0000200700 | 8738 | 1901 | 8D38 | 2901 | 8F38 | 4C01 | 9138 | 5201 |
| 0000200720 | 9238 | 6A01 | 9438 | 7001 | 9538 | 7A01 | 9738 | 8401 |
| 0000200740 | 9938 | 8901 | 9A38 | A001 | 9C38 | AC01 | 9D38 | B201 |
| 0000200760 | A938 | BD01 | AC38 | CD01 | AE38 | D801 | AF38 | DD01 |
| 0000201000 | B038 | FC01 | B438 | 0201 | B639 | 0F01 | B739 | 2401 |
| 0000201020 | B939 | 3F01 | BA39 | 4501 | C539 | 5001 | CE39 | 6001 |
| 0000201040 | CF39 | 7201 | D039 | 7901 | D439 | 7E01 | D539 | 8901 |
| 0000201060 | D639 | AF01 | D739 | BF01 | D939 | DC01 | DA39 | FB01 |
| 0000201100 | DF39 | 0101 | E13A | 3201 | E23A | 4B01 | E43A | 5101 |
| 0000201120 | E63A | 5701 | F13A | 6201 | F53A | 7201 | F93A | 8401 |
| 0000201140 | FD3A | 9101 | FE3A | C701 | 003A | CA02 | 023A | F002 |
| 0000201160 | 033A | 1302 | 053B | 1902 | 063B | 3102 | 093B | 3702 |
| 0000201200 | 0A3B | 4202 | 0D3B | 5402 | 0E3B | 5A02 | 183B | 6502 |
| 0000201220 | 1B3B | 7502 | 1F3B | 7F02 | 213B | 9F02 | 223B | A402 |
| 0000201240 | 243B | A902 | 253B | B302 | 263B | B802 | 273B | CE02 |
| 0000201260 | 2B3B | D602 | 2D3B | DE02 | 2E3B | E302 | 303B | E602 |
| 0000201300 | 313B | F402 | 323B | F702 | 343B | 0902 | 353C | 1302 |
| 0000201320 | 363C | 1902 | 413C | 2402 | 433C | 3402 | 463C | 3C02 |
| 0000201340 | 473C | 4702 | 433C | 5202 | 4A3C | 5E02 | 4B3C | 6402 |
| 0000201360 | 4C3C | 6B02 | 4E3C | 7902 | 4F3C | 7F02 | 5B3C | 8A02 |
| 0000201400 | 5D3C | 9A02 | 623C | AC02 | 633C | B202 | 653C | B902 |
| 0000201420 | 663C | C602 | 673C | D402 | 683C | D702 | 693C | E402 |
| 0000201440 | 6A3C | F102 | 6D3C | FF02 | 6E3C | 0A02 | 703D | 2C02 |
| 0000201460 | 713D | 5C02 | 723D | 6C02 | 733D | 6F02 | 763D | 7902 |
| 0000201500 | 783D | 9002 | 793D | 9702 | 813D | A202 | 883D | B202 |
| 0000201520 | 893D | BD02 | 8A3D | C802 | 8B3D | D402 | 8D3D | 0702 |
| 0000201540 | 8E3E | 0D02 | 8F3E | 2802 | 923E | 2E02 | 953E | 4402 |
| 0000201560 | 963E | 6A02 | 983E | 9D02 | 993E | A302 | 9A3E | BE02 |
| 0000201600 | 9C3E | C402 | A73E | CF02 | AC3E | DF02 | AD3E | E502 |
| 0000201620 | AF3E | EC02 | B03E | F702 | B13E | 0202 | B23F | 0E02 |
| 0000201640 | B33F | 1102 | B53F | 1902 | B73F | 2702 | B93F | 2D02 |
| 0000201660 | C33F | 3802 | C63F | 4802 | C83F | 5402 | D43F | 5F02 |
| 0000201700 | D93F | 6F02 | DA3F | 7502 | DC3F | 7C02 | DD3F | 8702 |
| 0000201720 | DE3F | 9202 | DF3F | 9E02 | E03F | A102 | E23F | A902 |
| 0000201740 | E43F | B702 | E53F | BD02 | F93F | C802 | 033F | D803 |
| 0000201760 | 043F | EA03 | 083F | F003 | 093F | 1303 | 0A40 | 1903 |
| 0000202000 | 0B40 | 3403 | 0C40 | 3A03 | 0D40 | 5D03 | 0E40 | 6303 |
| 0000202020 | 0F40 | 7E03 | 1140 | 8403 | 1240 | 9403 | 1340 | AD03 |
| 0000202040 | 1640 | B503 | 1840 | C003 | 1940 | DC03 | 1A40 | F503 |
| 0000202060 | 1C40 | FB03 | 1D40 | 1103 | 1E41 | 2603 | 2141 | 5503 |

THU MAR 14 17:48:06 1991 TM.EXE PAGE 50, LINE 2892

| | | | | | | | | |
|---|---|---|---|---|---|---|---|---|
| 0000202100 | 2341 | 5D03 | 2741 | 7303 | 2841 | 9403 | 2A41 | 9A03 |
| 0000202120 | 2C41 | CD03 | 2D41 | D303 | 2E41 | EE03 | 2F41 | F403 |
| 0000202140 | 3041 | 0703 | 3B42 | 1203 | 3F42 | 2203 | 4142 | 3B03 |
| 0000202160 | 4242 | 5703 | 4442 | 5D03 | 4542 | 8003 | 4742 | 8603 |
| 0000202200 | 4842 | 8C03 | 5B42 | 9703 | 5C42 | A703 | 6042 | 4003 |
| 0000202220 | 6143 | 4603 | 6343 | 5003 | 6443 | 6E03 | 6543 | 7F03 |
| 0000202240 | 6A43 | A403 | 6B43 | BB03 | 6C43 | BE03 | 6D43 | C103 |
| 0000202260 | 7143 | D203 | 7243 | D703 | 7343 | E603 | 7443 | F803 |
| 0000202300 | 7743 | FB03 | 7843 | 1F03 | 7A44 | 2203 | 7B44 | 3603 |
| 0000202320 | 7D44 | 4303 | 7E44 | 5503 | 7F44 | FC03 | 8044 | FF03 |
| 0000202340 | 8144 | 8503 | 0645 | 6E69 | 7469 | 632E | 0001 | 004A |
| 0000202360 | 004B | 4590 | 004C | 45A6 | 0058 | 45B1 | 0059 | 45BC |
| 0000202400 | 005B | 45C3 | 005F | 45C8 | 0063 | 45E8 | 0064 | 45F5 |
| 0000202420 | 0065 | 4603 | 0067 | 4606 | 0069 | 4613 | 0074 | 461F |
| 0000202440 | 0075 | 462F | 007C | 46C1 | 0081 | 46C9 | 0082 | 46DF |
| 0000202460 | 0083 | 475D | 0087 | 4764 | 0088 | 4789 | 008A | 4806 |
| 0000202500 | 008B | 481E | 008E | 489C | 0090 | 48AE | 0091 | 48B9 |
| 0000202520 | 0093 | 48CC | 0094 | 48CF | 0097 | 48E0 | 0098 | 48FD |
| 0000202540 | 009D | 497B | 009E | 4984 | 009F | 4991 | 00A1 | 4A13 |
| 0000202560 | 00A3 | 4A2C | 00A4 | 4A3C | 00A5 | 4ABA | 00A7 | 4AC5 |
| 0000202600 | 00AB | 4AD0 | 00AC | 4AE6 | 00AD | 4B0F | 00AF | 4B17 |
| 0000202620 | 00B2 | 4B33 | 00B3 | 4B5B | 00B4 | 4B62 | 00B5 | 4B8D |
| 0000202640 | 00B6 | 4B97 | 00B7 | 4BA2 | 00B9 | 4BCD | 00BC | 4BD5 |
| 0000202660 | 00BE | 4BDA | 00C0 | 4BE5 | 00C1 | 4BF5 | 00C3 | 4C73 |
| 0000202700 | 00C4 | 4C92 | 00C7 | 4D0F | 00C8 | 4D1F | 00CA | 4D9D |
| 0000202720 | 00CB | 4E1A | 00D5 | 4E25 | 00D6 | 4E35 | 00DA | 4EC8 |
| 0000202740 | 00DC | 4ED0 | 00DD | 4ED5 | 00DF | 4ED8 | 00E0 | 4EE6 |
| 0000202760 | 00E1 | 4EE9 | 00E2 | 4EFB | 00E3 | 4F0B | 00E4 | 4F13 |
| 0000203000 | 00E6 | 4F1B | 00E7 | 4F21 | 00E8 | 4F27 | 00E9 | 4F2D |
| 0000203020 | 00EB | 4F39 | 00EC | 4F9C | 7808 | 616C | 6F74 | 2E72 |
| 0000203040 | 0163 | 0B00 | A101 | A800 | A64F | B800 | A84F | CD00 |
| 0000203060 | AA4F | F300 | AC4F | F900 | AE4F | 1F00 | B050 | 2500 |
| 0000203100 | B250 | 4B00 | B450 | 5100 | BE50 | 5C00 | C050 | 6C00 |
| 0000203120 | C150 | 7500 | C250 | 7A00 | C350 | 8000 | C850 | 8B00 |
| 0000203140 | CC50 | 9B00 | CE50 | A600 | D050 | B000 | D150 | B900 |
| 0000203160 | D250 | BF00 | D350 | C800 | D850 | CE00 | DA50 | F200 |
| 0000203200 | DE50 | F700 | E150 | FD00 | E250 | 0700 | E451 | 0C00 |
| 0000203220 | E551 | 1600 | E951 | 1B00 | EC51 | 2100 | EE51 | 4800 |
| 0000203240 | F051 | 4E00 | F351 | 5100 | F451 | 5B00 | F551 | 6000 |
| 0000203260 | F651 | 6A00 | FA51 | 6F00 | FD51 | 7500 | FE51 | 9900 |
| 0000203300 | FF51 | 9F00 | 0251 | A201 | 0451 | B501 | 0751 | B801 |
| 0000203320 | 0851 | CB01 | 0B51 | CE01 | 0C51 | E101 | 1051 | E401 |
| 0000203340 | 1151 | EE01 | 1351 | 1201 | 1452 | 1A01 | 1552 | 2401 |
| 0000203360 | 1852 | 2701 | 1952 | 3301 | 1C52 | 3601 | 1D52 | 4101 |
| 0000203400 | 2152 | 4401 | 2252 | 4F01 | 2352 | 5201 | 2452 | AF01 |
| 0000203420 | 2552 | B501 | 3152 | C001 | 3952 | D001 | 3A52 | DA01 |
| 0000203440 | 3B52 | E901 | 3C52 | 0D01 | 3D53 | 1001 | 3F53 | 2101 |
| 0000203460 | 4153 | 3801 | 4253 | 5D01 | 4353 | 6201 | 4453 | 7F01 |
| 0000203500 | 4653 | 8F01 | 4753 | 9401 | 4853 | 9A01 | 4953 | AB01 |
| 0000203520 | 4C53 | C001 | 4D53 | D901 | 4E53 | FC01 | 4F53 | 0201 |
| 0000203540 | 5054 | 0501 | 5154 | 2501 | 5254 | 2B01 | 5654 | 4701 |
| 0000203560 | 5754 | 5101 | 5854 | 6501 | 5954 | 6801 | 5C54 | 7C01 |
| 0000203600 | 5D54 | AC01 | 5F54 | B101 | 6054 | B701 | 6A54 | C201 |
| 0000203620 | 7454 | D201 | 7554 | DC01 | 7654 | FB01 | 7954 | 0101 |
| 0000203640 | 7A55 | 4001 | 7B55 | 6B01 | 7D55 | 7701 | 7E55 | 7A01 |
| 0000203660 | 7F55 | 9901 | 8055 | 9F01 | 8455 | AB01 | 8555 | B001 |
| 0000203700 | 8655 | BD01 | 8755 | 3601 | 8B56 | 4301 | 8956 | 5501 |
| 0000203720 | 8A56 | 5801 | 8B56 | 6401 | 8C56 | 7101 | 8D56 | 7E01 |
| 0000203740 | 8E56 | 9D01 | 8F56 | A901 | 9156 | B601 | 9256 | BC01 |

THU MAR 14 17:48:06 1991 TM.EXE PAGE 51, LINE 2951

| | | | | | | | | |
|---|---|---|---|---|---|---|---|---|
| 0000203760 | A456 | C701 | A856 | D701 | A956 | F601 | AB56 | FC01 |
| 0000204000 | AD56 | 0601 | AE57 | 0F01 | AF57 | 1B01 | B057 | 2801 |
| 0000204020 | B157 | 4501 | B357 | 4B01 | B657 | 4E01 | B757 | 5701 |
| 0000204040 | B957 | 6301 | BA57 | 6801 | BC57 | 7501 | BD57 | 7801 |
| 0000204060 | BF57 | 8501 | C057 | 9101 | C157 | AE01 | C257 | B401 |
| 0000204100 | C357 | B701 | C457 | C301 | C557 | CF01 | C657 | DB01 |
| 0000204120 | C957 | E801 | CC57 | EB01 | CD57 | 0001 | D058 | 0301 |
| 0000204140 | D158 | 0C01 | D258 | 1801 | D358 | 1B01 | D458 | 3901 |
| 0000204160 | D558 | 3F01 | E258 | 4A01 | E758 | 5A01 | E858 | 6601 |
| 0000204200 | E958 | 7301 | EA58 | 7F01 | EB58 | 8C01 | EC58 | 9F01 |
| 0000204220 | ED58 | AD01 | EE58 | B001 | F458 | BB01 | F558 | CB01 |
| 0000204240 | F658 | D501 | F858 | DB01 | F958 | F601 | FC58 | F901 |
| 0000204260 | FD58 | 1401 | FE59 | 1701 | FF59 | 2A01 | 0159 | 3002 |
| 0000204300 | 0259 | 3602 | 1259 | 4102 | 1559 | 5102 | 1759 | 5602 |
| 0000204320 | 1859 | 6002 | 1959 | 6602 | 1A59 | 6B02 | 1B59 | 7502 |
| 0000204340 | 1C59 | 9402 | 1D59 | 9C02 | 1E59 | B302 | 1F59 | D002 |
| 0000204360 | 2059 | D302 | 2359 | EE02 | 2459 | F702 | 2659 | FC02 |
| 0000204400 | 2759 | 0202 | 285A | 0802 | 295A | 0E02 | 335A | 1902 |
| 0000204420 | 3A5A | 2902 | 3B5A | 4102 | 3C5A | 5502 | 3D5A | 6302 |
| 0000204440 | 3E5A | 7402 | 3F5A | 7F02 | 405A | 9702 | 415A | A102 |
| 0000204460 | 425A | C202 | 455A | C802 | 475A | DA02 | 485A | DD02 |
| 0000204500 | 495A | E602 | 4A5A | EC02 | 545A | F702 | 585A | 0702 |
| 0000204520 | 595B | 1302 | 5A5B | 2002 | 5B5B | 2802 | 5C5B | 2B02 |
| 0000204540 | 5D5B | 3302 | 5E5B | 3602 | 5F5B | 4302 | 605B | 4B02 |
| 0000204560 | 615B | 4E02 | 6C5B | 5602 | 6E5B | 8602 | 6F5B | A302 |
| 0000204600 | 795B | AE02 | 7D5B | BE02 | 7E5B | CC02 | 7F5B | E302 |
| 0000204620 | 805B | 0002 | 8A5C | 0B02 | 8F5C | 1B02 | 915C | 2902 |
| 0000204640 | 935C | 4002 | 975C | 4502 | 985C | 5A02 | 995C | 6602 |
| 0000204660 | 9A5C | 7B02 | 9B5C | 7E02 | 9C5C | 9502 | 9E5C | B202 |
| 0000204700 | A95C | BD02 | AC5C | CD02 | AD5C | D902 | AE5C | F602 |
| 0000204720 | AF5C | FC02 | B15C | 0902 | B25D | 0C02 | B45D | 1902 |
| 0000204740 | B55D | 2702 | B65D | 2D02 | B75D | 3D02 | B85D | 4002 |
| 0000204760 | B95D | 4302 | BA5D | 5402 | BB5D | 5702 | BC5D | 7C02 |
| 0000205000 | BD5D | 8202 | BF5D | 9302 | C05D | 9C02 | C25D | A902 |
| 0000205020 | C35D | AF02 | CD5D | BA02 | D45D | CA02 | D55D | D602 |
| 0000205040 | D65D | D902 | D75D | E802 | D85D | F502 | D95D | 0802 |
| 0000205060 | DA5E | 1602 | DD5E | 1902 | DE5E | 4A02 | DF5E | 5C02 |
| 0000205100 | E05E | 6D02 | E15E | 8702 | E25E | 9502 | E45E | 9802 |
| 0000205120 | 005E | 6C0B | 696C | 6362 | 746D | 6C2E | 6269 | 7406 |
| 0000205140 | 2E6D | 696C | 0662 | 6869 | 6C2E | 6269 | 7506 | 2E69 |
| 0000205160 | 696C | 0B62 | 6574 | 7473 | 6977 | 2E6E | 696C | 0962 |
| 0000205200 | 6264 | 705F | 2E69 | 696C | 0962 | 6573 | 7574 | 2E70 |
| 0000205220 | 696C | 0762 | 7973 | 2E73 | 696C | 0662 | 7270 | 6C2E |
| 0000205240 | 6269 | 7206 | 2E76 | 696C | 0662 | 6C66 | 6C2E | 6269 |
| 0000205260 | 630A | 7672 | 695F | 2E66 | 696C | 0A62 | 7374 | 5F6C |
| 0000205300 | 6669 | 6C2E | 6269 | 740A | 6C73 | 6E69 | 2E74 | 696C |
| 0000205320 | 0962 | 656D | 6964 | 2E74 | 696C | 0A62 | 626C | 7069 |
| 0000205340 | 746D | 6C2E | 6269 | 6F07 | 3273 | 6C2E | 6269 | 0083 |
| 0000205360 | 0101 | 0002 | 0008 | 0000 | 0019 | 0102 | 0002 | 0590 |
| 0000205400 | 0000 | 0151 | 0101 | 0003 | 0021 | 0000 | 001C | 0102 |
| 0000205420 | 0003 | 06E1 | 0000 | 01C1 | 0101 | 0004 | 003D | 0000 |
| 0000205440 | 001C | 0102 | 0004 | 08A2 | 0000 | 0035 | 0101 | 0005 |
| 0000205460 | 0059 | 0000 | 0017 | 0102 | 0005 | 08D7 | 0000 | 000F |
| 0000205500 | 0101 | 0006 | 0070 | 0000 | 0017 | 0102 | 0006 | 08E6 |
| 0000205520 | 0000 | 0024 | 0101 | 0007 | 0087 | 0000 | 001C | 0102 |
| 0000205540 | 0007 | 090A | 0000 | 0010 | 0101 | 0008 | 00A3 | 0000 |
| 0000205560 | 001C | 0102 | 0008 | 091A | 0000 | 0010 | 0101 | 0009 |
| 0000205600 | 00BF | 0000 | 001C | 0102 | 0009 | 092A | 0000 | 0025 |
| 0000205620 | 0101 | 000A | 00DB | 0000 | 001D | 0102 | 000A | 094F |

THU MAR 14 17:48:06 1991 TM.EXE PAGE 52, LINE 3010

| | | | | | | | | |
|---|---|---|---|---|---|---|---|---|
| 0000205640 | 0000 | 0011 | 0101 | 000B | 00F8 | 0000 | 0017 | 0102 |
| 0000205660 | 000B | 0960 | 0000 | 001F | 0101 | 000C | 010F | 0000 |
| 0000205700 | 0018 | 0102 | 000C | 097F | 0000 | 0042 | 0101 | 000D |
| 0000205720 | 0127 | 0000 | 0016 | 0102 | 000D | 09C1 | 0000 | 000E |
| 0000205740 | 0101 | 000E | 013D | 0000 | 0018 | 0102 | 000E | 09CF |
| 0000205760 | 0000 | 0010 | 0101 | 000F | 0155 | 0000 | 0018 | 0102 |
| 0000206000 | 000F | 09DF | 0000 | 0010 | 0101 | 0010 | 016D | 0000 |
| 0000206020 | 0019 | 0102 | 0010 | 09EF | 0000 | 0012 | 0101 | 0011 |
| 0000206040 | 0186 | 0000 | 0018 | 0102 | 0011 | 0A01 | 0000 | 0041 |
| 0000206060 | 0101 | 0012 | 019E | 0000 | 0017 | 0102 | 0012 | 0A42 |
| 0000206100 | 0000 | 000F | 0101 | 0013 | 01B5 | 0000 | 001A | 0102 |
| 0000206120 | 0013 | 0A51 | 0000 | 009B | 0101 | 0014 | 01CF | 0000 |
| 0000206140 | 0013 | 0102 | 0014 | 0AEC | 0000 | 003E | 0103 | 0014 |
| 0000206160 | 1155 | 0000 | 1871 | 0104 | 0014 | 7750 | 0000 | 0311 |
| 0000206200 | 0109 | 0014 | 89D0 | 0000 | 0287 | 0101 | 0015 | 01E2 |
| 0000206220 | 0000 | 0014 | 0102 | 0015 | 0B2A | 0000 | 01D1 | 0103 |
| 0000206240 | 0015 | 29C6 | 0000 | 1B35 | 0104 | 0015 | 7A61 | 0000 |
| 0000206260 | 0836 | 0109 | 0015 | 8C57 | 0000 | 0510 | 0101 | 0016 |
| 0000206300 | 01F6 | 0000 | 0013 | 0102 | 0016 | 0CFB | 0000 | 0036 |
| 0000206320 | 0103 | 0016 | 44FB | 0000 | 1905 | 0104 | 0016 | 8297 |
| 0000206340 | 0000 | 021D | 0109 | 0016 | 9167 | 0000 | 0133 | 0101 |
| 0000206360 | 0017 | 0209 | 0000 | 0015 | 0102 | 0017 | 0D31 | 0000 |
| 0000206400 | 0079 | 0103 | 0017 | 5E00 | 0000 | 1950 | 0104 | 0017 |
| 0000206420 | 84B4 | 0000 | 051C | 0109 | 0017 | 929A | 0000 | 0439 |
| 0000206440 | 0101 | 0092 | 021E | 0000 | 0015 | 0102 | 0092 | 0DAA |
| 0000206460 | 0000 | 001B | 0101 | 0093 | 0233 | 0000 | 0017 | 0102 |
| 0000206500 | 0093 | 0DC5 | 0000 | 000E | 0101 | 0094 | 024A | 0000 |
| 0000206520 | 0017 | 0102 | 0094 | 0DD3 | 0000 | 000E | 0101 | 0095 |
| 0000206540 | 0261 | 0000 | 0017 | 0102 | 0095 | 0DE1 | 0000 | 000E |
| 0000206560 | 0101 | 0096 | 0278 | 0000 | 0017 | 0102 | 0096 | 0DEF |
| 0000206600 | 0000 | 000E | 0101 | 0097 | 028F | 0000 | 0015 | 0102 |
| 0000206620 | 0097 | 0DFD | 0000 | 000E | 0101 | 0098 | 02A4 | 0000 |
| 0000206640 | 001B | 0102 | 0098 | 0E0B | 0000 | 0026 | 0101 | 0099 |
| 0000206660 | 02BF | 0000 | 0016 | 0102 | 0099 | 0E31 | 0000 | 000F |
| 0000206700 | 0101 | 009A | 02D5 | 0000 | 0018 | 0102 | 009A | 0E40 |
| 0000206720 | 0000 | 000F | 0101 | 009B | 02ED | 0000 | 0015 | 0102 |
| 0000206740 | 009B | 0E4F | 0000 | 000E | 0101 | 009C | 0302 | 0000 |
| 0000206760 | 0015 | 0102 | 009C | 0E5D | 0000 | 000F | 0101 | 009D |
| 0000207000 | 0317 | 0000 | 001B | 0102 | 009D | 0E6C | 0000 | 003F |
| 0000207020 | 0101 | 009E | 0332 | 0000 | 0018 | 0102 | 009E | 0EAB |
| 0000207040 | 0000 | 000F | 0101 | 009F | 034A | 0000 | 0017 | 0102 |
| 0000207060 | 009F | 0EBA | 0000 | 000F | 0101 | 00A0 | 0361 | 0000 |
| 0000207100 | 0018 | 0102 | 00A0 | 0EC9 | 0000 | 000F | 0101 | 00A1 |
| 0000207120 | 0379 | 0000 | 001D | 0102 | 00A1 | 0ED8 | 0000 | 0024 |
| 0000207140 | 0101 | 00A2 | 0396 | 0000 | 001A | 0102 | 00A2 | 0EFC |
| 0000207160 | 0000 | 000F | 0101 | 00A3 | 03B0 | 0000 | 0017 | 0102 |
| 0000207200 | 00A3 | 0F0B | 0000 | 0010 | 0101 | 00A4 | 03C7 | 0000 |
| 0000207220 | 001B | 0102 | 00A4 | 0F1B | 0000 | 000E | 0101 | 00A5 |
| 0000207240 | 03E2 | 0000 | 0017 | 0102 | 00A5 | 0F29 | 0000 | 0033 |
| 0000207260 | 0101 | 00A6 | 03F9 | 0000 | 0014 | 0102 | 00A6 | 0F5C |
| 0000207300 | 0000 | 0037 | 0101 | 00A7 | 040D | 0000 | 0018 | 0102 |
| 0000207320 | 00A7 | 0F93 | 0000 | 000F | 0101 | 00A8 | 0425 | 0000 |
| 0000207340 | 001A | 0102 | 00A8 | 0FA2 | 0000 | 001E | 0101 | 00A9 |
| 0000207360 | 043F | 0000 | 0016 | 0102 | 00A9 | 0FC0 | 0000 | 001E |
| 0000207400 | 0101 | 00AA | 0455 | 0000 | 0019 | 0102 | 00AA | 0FDE |
| 0000207420 | 0000 | 0056 | 0101 | 00AB | 046E | 0000 | 0017 | 0102 |
| 0000207440 | 00AB | 1034 | 0000 | 000E | 0101 | 00AC | 0485 | 0000 |
| 0000207460 | 0018 | 0102 | 00AC | 1042 | 0000 | 001E | 0101 | 00AD |
| 0000207500 | 049D | 0000 | 0016 | 0102 | 00AD | 1060 | 0000 | 0010 |

THU MAR 14 17:48:06 1991 TM.EXE PAGE 53, LINE 3069

| | | | | | | | | |
|---|---|---|---|---|---|---|---|---|
| 0000207520 | 0101 | 00AE | 04B3 | 0000 | 0017 | 0102 | 00AE | 1070 |
| 0000207540 | 0000 | 0012 | 0101 | 00AF | 04CA | 0000 | 001A | 0102 |
| 0000207560 | 00AF | 1082 | 0000 | 0010 | 0101 | 00B0 | 04E4 | 0000 |
| 0000207600 | 001C | 0102 | 00B0 | 1092 | 0000 | 0022 | 0101 | 00B1 |
| 0000207620 | 0500 | 0000 | 0018 | 0102 | 00B1 | 10B4 | 0000 | 000F |
| 0000207640 | 0101 | 00B2 | 0518 | 0000 | 0019 | 0102 | 00B2 | 10C3 |
| 0000207660 | 0000 | 0012 | 0101 | 00B3 | 0531 | 0000 | 0017 | 0102 |
| 0000207700 | 00B3 | 10D5 | 0000 | 0011 | 0101 | 00B4 | 0548 | 0000 |
| 0000207720 | 0019 | 0102 | 00B4 | 10E6 | 0000 | 001E | 0101 | 00B5 |
| 0000207740 | 0561 | 0000 | 0015 | 0102 | 00B5 | 1104 | 0000 | 0030 |
| 0000207760 | 0101 | 00B6 | 0576 | 0000 | 001A | 0102 | 00B6 | 1134 |
| 0000210000 | 0000 | 0021 | 0106 | 0000 | 96D3 | 0000 | 009D | 424E |
| 0000210020 | 3230 | 9C98 | 0000 | | | | | |
| 0000210026 | | | | | | | | |

THU MAR 14 17:48:46 1991 TSL_IF.DLL PAGE 1, LINE 1

| | | | | | | | | |
|---|---|---|---|---|---|---|---|---|
| 0000000000 | 5A4D | 0107 | 003D | 0000 | 0004 | 0000 | FFFF | 0000 |
| 0000000020 | 00B6 | 0000 | 0000 | 0000 | 0040 | 0000 | 0000 | 0000 |
| 0000000040 | 0000 | 0000 | 0000 | 0000 | 0000 | 0000 | 0000 | 0000 |
| 0000000060 | 0000 | 000C | 0000 | 0000 | 0000 | 0000 | 0080 | 0000 |
| 0000000100 | 1F0E | 0EBA | B400 | CD09 | B821 | 4C01 | 21CD | 6854 |
| 0000000120 | 7369 | 7020 | 6F72 | 7267 | 6D61 | 6320 | 6E61 | 6F6E |
| 0000000140 | 2074 | 7572 | 206E | 6E69 | 4420 | 534F | 6D20 | 646F |
| 0000000160 | 2E65 | 0D0D | 240A | 0000 | 0000 | 0000 | 0000 | 0000 |
| 0000000200 | 454E | 0A05 | 0434 | 0088 | 0C6B | CF6F | 8006 | 0005 |
| 0000000220 | 0000 | 0000 | 3EFE | 0001 | 0000 | 0000 | 0005 | 0008 |
| 0000000240 | 000E | 0040 | 0068 | 0068 | 0382 | 0392 | 053C | 0000 |
| 0000000260 | 0000 | 0004 | 0000 | 0001 | 0000 | 0000 | 0000 | 0000 |
| 0000000300 | 0055 | 61B5 | 0D00 | 61B6 | 0696 | 00C6 | 0C01 | 0100 |
| 0000000320 | 0000 | 0000 | 0C01 | 0850 | 0000 | 0000 | 0C01 | 0D42 |
| 0000000340 | 06A3 | 0EAD | 0D01 | 1000 | 7406 | 6C73 | 695F | 0066 |
| 0000000360 | 1400 | 5354 | 5F4C | 4547 | 5F54 | 5543 | 5252 | 4E45 |
| 0000000400 | 5F54 | 5441 | 5254 | 0001 | 540E | 4C53 | 475F | 5445 |
| 0000000420 | 535F | 4154 | 5554 | 0253 | 0900 | 5354 | 5F4C | 4547 |
| 0000000440 | 5F54 | 0358 | 0900 | 5354 | 5F4C | 4547 | 5F54 | 0459 |
| 0000000460 | 0E00 | 5354 | 5F4C | 4553 | 5F54 | 4946 | 544C | 5245 |
| 0000000500 | 0005 | 540E | 4C53 | 475F | 5445 | 505F | 5241 | 4D41 |
| 0000000520 | 0653 | 0D00 | 5354 | 5F4C | 504F | 4E45 | 545F | 5345 |
| 0000000540 | 0754 | 1100 | 5354 | 5F4C | 4547 | 5F54 | 4554 | 5453 |
| 0000000560 | 415F | 5454 | 0852 | 0D00 | 5354 | 5F4C | 4843 | 4345 |
| 0000000600 | 5F4B | 4953 | 0947 | 0E00 | 5354 | 5F4C | 4553 | 5F54 |
| 0000000620 | 4150 | 4152 | 534D | 000A | 5409 | 4C53 | 4D5F | 5954 |
| 0000000640 | 4550 | 000B | 5408 | 4C53 | 545F | 5059 | 0C45 | 1200 |
| 0000000660 | 5354 | 5F4C | 4F4D | 4556 | 4D5F | 554F | 4553 | 525F |
| 0000000700 | 4C45 | 000D | 5412 | 4C53 | 4D5F | 564F | 5F45 | 4F4D |
| 0000000720 | 5355 | 5F45 | 4241 | 0E53 | 0B00 | 4D54 | 415F | 4444 |
| 0000000740 | 545F | 4345 | 0F48 | 1200 | 4D54 | 465F | 554C | 4853 |
| 0000000760 | 545F | 4345 | 5F48 | 494C | 5453 | 0010 | 5414 | 4C53 |
| 0000001000 | 4D5F | 564F | 5F45 | 4F4C | 4143 | 4F54 | 5F52 | 4241 |
| 0000001020 | 1153 | 0E00 | 5354 | 5F4C | 4553 | 5F54 | 4556 | 4952 |
| 0000001040 | 5946 | 0012 | 540A | 4C53 | 465F | 4E49 | 5349 | 1348 |
| 0000001060 | 0F00 | 5354 | 5F4C | 4547 | 5F54 | 4554 | 5453 | 495F |
| 0000001100 | 1444 | 0E00 | 5354 | 5F4C | 4C43 | 4145 | 5F52 | 4944 |
| 0000001120 | 4646 | 0015 | 5410 | 4C53 | 435F | 4548 | 4B43 | 535F |
| 0000001140 | 5243 | 4545 | 164E | 1700 | 5354 | 5F4C | 4547 | 5F54 |
| 0000001160 | 504F | 4E45 | 545F | 5345 | 5F54 | 414E | 454D | 1753 |
| 0000001200 | 0E00 | 5354 | 5F4C | 4C43 | 534F | 5F45 | 4554 | 5453 |
| 0000001220 | 0018 | 540F | 4C53 | 475F | 5445 | 535F | 5359 | 4F4D |
| 0000001240 | 4544 | 0019 | 5416 | 4C53 | 4D5F | 564F | 5F45 | 4F4C |
| 0000001260 | 4143 | 4F54 | 5F52 | 5254 | 4341 | 1A4B | 0800 | 5354 |
| 0000001300 | 5F4C | 4554 | 4843 | 001B | 540F | 4C53 | 475F | 5445 |
| 0000001320 | 4C5F | 4E49 | 5F45 | 4F4E | 001C | 540B | 5F4D | 4547 |
| 0000001340 | 5F54 | 4554 | 4843 | 001D | 5411 | 4C53 | 535F | 5445 |
| 0000001360 | 455F | 4358 | 5045 | 4954 | 4E4F | 001E | 540E | 4C53 |
| 0000001400 | 535F | 5445 | 525F | 4345 | 524F | 1F44 | 1000 | 4D54 |
| 0000001420 | 475F | 5445 | 545F | 4345 | 5F48 | 494C | 5453 | 0020 |
| 0000001440 | 5414 | 4C53 | 4D5F | 564F | 5F45 | 4F4C | 4143 | 4F54 |
| 0000001460 | 5F52 | 4552 | 214C | 0F00 | 5354 | 5F4C | 4553 | 5F54 |
| 0000001500 | 494C | 454E | 4E5F | 224F | 1300 | 4F54 | 5F4F | 414D |
| 0000001520 | 594E | 4F5F | 4550 | 5F4E | 4554 | 5453 | 2353 | 1000 |
| 0000001540 | 5354 | 5F4C | 504F | 4E45 | 545F | 5345 | 5F54 | 4449 |
| 0000001560 | 0024 | 540F | 4C53 | 475F | 5445 | 435F | 4E4F | 4554 |
| 0000001600 | 5458 | 0025 | 5410 | 4C53 | 525F | 5345 | 5445 | 465F |
| 0000001620 | 4C49 | 4554 | 2652 | 0A00 | 5354 | 5F4C | 5942 | 4150 |
| 0000001640 | 5353 | 0027 | 5408 | 4C53 | 495F | 494E | 2854 | 0F00 |

THU MAR 14 17:48:46 1991 TSL_IF.DLL PAGE 2, LINE 60

| | | | | | | | | |
|---|---|---|---|---|---|---|---|---|
| 0000001660 | 5354 | 5F4C | 4547 | 5F54 | 4944 | 4646 | 495F | 2944 |
| 0000001700 | 1300 | 5354 | 5F4C | 5246 | 4545 | 545F | 5345 | 5F54 |
| 0000001720 | 414E | 454D | 2A53 | 1300 | 5354 | 5F4C | 4552 | 4553 |
| 0000001740 | 5F54 | 5845 | 4543 | 5450 | 4F49 | 2B4E | 1100 | 4D54 |
| 0000001760 | 495F | 494E | 5F54 | 4554 | 4843 | 4C5F | 5349 | 2C54 |
| 0000002000 | 0000 | 0001 | 000A | 0083 | 008A | 0090 | 0096 | 0099 |
| 0000002020 | 009C | 0800 | 4F44 | 4353 | 4C41 | 534C | 6C06 | 6962 |
| 0000002040 | 6D70 | 0D74 | 425F | 5F58 | 4544 | 5542 | 4D47 | 444F |
| 0000002060 | 0D45 | 425F | 5F58 | 4954 | 454D | 4D53 | 444F | 0945 |
| 0000002100 | 425F | 5F58 | 5F42 | 4953 | 0E47 | 425F | 5F58 | 4544 |
| 0000002120 | 5542 | 4547 | 544E | 5245 | 5F0F | 5842 | 445F | 4245 |
| 0000002140 | 4755 | 4552 | 5554 | 4E52 | 5F0E | 5842 | 565F | 494F |
| 0000002160 | 5244 | 5445 | 5255 | 0E4E | 425F | 5F58 | 4544 | 5542 |
| 0000002200 | 5047 | 4952 | 544E | 5F0E | 5842 | 505F | 4341 | 464B |
| 0000002220 | 4C49 | 4554 | 0652 | 7263 | 5F76 | 6669 | 7305 | 7465 |
| 0000002240 | 7075 | 4405 | 5F42 | 4950 | 4902 | 0248 | 5250 | 4D05 |
| 0000002260 | 4445 | 5449 | 012C | C601 | 011A | 11F4 | D301 | 0104 |
| 0000002300 | 0557 | CF01 | 0118 | 09AF | 6201 | 011D | 1938 | 0201 |
| 0000002320 | 0108 | 091E | 6C01 | 0102 | 0232 | 0001 | 0104 | 03C1 |
| 0000002340 | 8001 | 013C | 3D1D | 4301 | 0103 | 10FA | 7901 | 010C |
| 0000002360 | 12B6 | 4101 | 010E | 07C2 | B201 | 0125 | 23CD | CC01 |
| 0000002400 | 0111 | 043F | 8A01 | 0108 | 1360 | 7001 | 013E | 0842 |
| 0000002420 | 9E01 | 0111 | 3DC4 | 8201 | 0103 | 1336 | 3101 | 011A |
| 0000002440 | 1B07 | D901 | 0109 | 1903 | 2101 | 0112 | 0A03 | 0A01 |
| 0000002460 | 0113 | 28B3 | 6601 | 0108 | 3C3E | 0000 | 740A | 6C73 |
| 0000002500 | 695F | 2066 | 4C44 | 004C | 0000 | 0000 | 0000 | 0000 |
| 0000002520 | 581E | 4590 | 8B55 | 1EEC | D88E | EC81 | 0006 | 5657 |
| 0000002540 | 068E | 0D34 | C726 | 4006 | 000D | 8B00 | 0646 | 068E |
| 0000002560 | 0D36 | A326 | 0D20 | 068E | 0D38 | C02B | A326 | 0D1E |
| 0000002600 | A326 | 0D1C | 468B | 8B08 | 0A56 | 068E | 0D3A | A326 |
| 0000002620 | 0000 | 8926 | 0216 | 8B00 | 0846 | 568B | 8E0A | 3C06 |
| 0000002640 | 260D | 34A3 | 260D | 1689 | 0D36 | 76FF | FF0E | 0C76 |
| 0000002660 | 6C68 | 6800 | 0328 | C49A | 7A3D | 6800 | 0072 | 2868 |
| 0000002700 | 6803 | 0087 | 1068 | 9A0D | 3E70 | 007F | F39A | 843A |
| 0000002720 | 9A00 | 32C0 | 008F | FF68 | 68FF | 0D22 | 129A | AA61 |
| 0000002740 | 8300 | 04C4 | 068E | 0D34 | A326 | 0D40 | 8326 | 403E |
| 0000002760 | 000D | 0374 | 08E9 | 9A00 | 2A0C | 00CC | 03E9 | E900 |
| 0000003000 | 00CD | 7E83 | 0106 | 0374 | 16E9 | 8E00 | 3806 | 260D |
| 0000003020 | 36FF | 0D1E | FF26 | 1C36 | 9A0D | 018A | FFFF | C483 |
| 0000003040 | 8E04 | 3806 | 260D | 1EA1 | 260D | 060B | 0D1C | 0374 |
| 0000003060 | 0EE9 | 8E00 | 3406 | 260D | 06C7 | 0D40 | 0000 | 8EE9 |
| 0000003100 | 8E00 | 3806 | 260D | 36FF | 0D1E | FF26 | 1C36 | 8D0D |
| 0000003120 | FA46 | 5016 | FF9A | 00FF | 8E00 | 3406 | 260D | 40A3 |
| 0000003140 | 8E0D | 3406 | 260D | 3E83 | 0D40 | 1B01 | 40C0 | 003D |
| 0000003160 | 7500 | E903 | 0003 | 56E9 | C400 | FA5E | 8B26 | 1447 |
| 0000003200 | 068E | 0D34 | A326 | 0D40 | 17E9 | E900 | 0041 | 068E |
| 0000003220 | 0D34 | C726 | 4006 | 000D | E900 | 0033 | 30E9 | E900 |
| 0000003240 | 002D | CE3D | 7E00 | E903 | 0012 | CD3D | 7C00 | E903 |
| 0000003260 | FFDC | C00B | 0375 | D2E9 | E9FF | FFE0 | D42D | 7500 |
| 0000003300 | E903 | FFCA | 062D | 7500 | E903 | FFC2 | CDE9 | 5EFF |
| 0000003320 | 835F | 02ED | E58B | 5D1F | CB4D | 581E | 4590 | 8B55 |
| 0000003340 | 1EEC | D88E | EC81 | 0004 | 5657 | 11E9 | C400 | 065E |
| 0000003360 | 8B26 | 0847 | 8B26 | 0A57 | 4689 | 8906 | 0856 | 468B |
| 0000003400 | 0B08 | 0646 | 0375 | 6EE9 | C400 | 065E | 8326 | 093F |
| 0000003420 | 0375 | 0CE9 | C400 | 065E | 8326 | 0A3F | 0374 | 53E9 |
| 0000003440 | C400 | 065E | C426 | 045F | 8A26 | 8807 | FC46 | 5EC4 |
| 0000003460 | 2606 | 3F83 | 7409 | E903 | 0006 | 01B8 | E900 | 0003 |
| 0000003500 | 00B8 | 3B00 | 4406 | 7400 | E903 | 000A | 468A | 08FC |
| 0000003520 | DE06 | E90F | 0009 | 468A | F6FC | 20D0 | DE06 | A00F |

THU MAR 14 17:48:46 1991 TSL_IF.DLL PAGE 3, LINE 119

| | | | | | | | | |
|---|---|---|---|---|---|---|---|---|
| 0000003540 | 0FDE | 5EC4 | 2606 | 5FC4 | 2604 | 0788 | 5EC4 | 2606 |
| 0000003560 | 07C7 | 000B | 76E9 | 5EFF | 835F | 02ED | E58B | 5D1F |
| 0000003600 | CB4D | 581E | 4590 | 8B55 | 1EEC | D88E | EC81 | 0000 |
| 0000003620 | 5657 | B81E | FFFF | D88E | 76FF | FF08 | 0676 | 76FF |
| 0000003640 | FF0C | 0A76 | 006A | 009A | 6900 | 8300 | 0AC4 | 5E1F |
| 0000003660 | 835F | 02ED | E58B | 5D1F | CA4D | 0008 | 581E | 4590 |
| 0000003700 | 8B55 | 1EEC | D88E | EC81 | 0000 | 5657 | B81E | 0244 |
| 0000003720 | D88E | 76FF | FF08 | 0676 | 76FF | FF0C | 0A76 | 016A |
| 0000003740 | 009A | 5900 | 8302 | 0AC4 | 5E1F | 835F | 02ED | E58B |
| 0000003760 | 5D1F | CA4D | 0008 | 581E | 4590 | 8B55 | 1EEC | D88E |
| 0000004000 | EC81 | 0016 | 5657 | 468A | 8806 | EE46 | 468A | 8808 |
| 0000004020 | EF46 | 468B | 890A | F246 | 468B | 890C | F446 | 468B |
| 0000004040 | 990E | 4689 | 89F6 | F856 | 468B | 990E | 4689 | 89FA |
| 0000004060 | FC56 | 0C6A | 468D | 16EE | 6A50 | 8D10 | EA46 | 5016 |
| 0000004100 | FF9A | 00FF | 8E00 | 3406 | 260D | 40A3 | 8E0D | 3406 |
| 0000004120 | 260D | 3E83 | 0D40 | 1B01 | 40C0 | 003D | 7500 | E903 |
| 0000004140 | 0006 | 23E9 | E900 | 0020 | 5EC4 | 26EA | 478B | 8E14 |
| 0000004160 | 3406 | 260D | 40A3 | 3D0D | 0001 | C01B | 3D40 | 0000 |
| 0000004200 | 0375 | 03E9 | E900 | 0000 | 5F5E | ED83 | 8B02 | 1FE5 |
| 0000004220 | 4D5D | 1ECB | 9058 | 5545 | EC8B | 8E1E | 81D8 | 00EC |
| 0000004240 | 5700 | 1E56 | 7EB8 | 8E02 | FFD8 | 0876 | 76FF | FF06 |
| 0000004260 | 0A76 | 76FF | FF0C | 0E76 | 196A | 0E6A | A69A | 9302 |
| 0000004300 | 8302 | 0EC4 | 5E1F | 835F | 02ED | E58B | 5D1F | CA4D |
| 0000004320 | 000A | 581E | 4590 | 8B55 | 1EEC | D88E | EC81 | 0000 |
| 0000004340 | 5657 | B81E | 0355 | D88E | 76FF | FF08 | 0676 | 76FF |
| 0000004360 | FF0A | 0C76 | 76FF | 6A0E | 6A19 | 9A0F | 02A6 | 036F |
| 0000004400 | C483 | 1F0E | 5F5E | ED83 | 8B02 | 1FE5 | 4D5D | 0ACA |
| 0000004420 | 1E00 | 9058 | 5545 | EC8B | 8E1E | 81D8 | 00EC | 5700 |
| 0000004440 | 1E56 | 94B8 | 8E03 | FFD8 | 0876 | 76FF | FF06 | 0A76 |
| 0000004460 | 76FF | FF0C | 0E76 | 186A | 0E6A | A69A | AE02 | 8303 |
| 0000004500 | 0EC4 | 5E1F | 835F | 02ED | E58B | 5D1F | CA4D | 000A |
| 0000004520 | 581E | 4590 | 8B55 | 1EEC | D88E | EC81 | 0000 | 5657 |
| 0000004540 | B81E | 03D3 | D88E | 76FF | FF08 | 0676 | 76FF | FF0A |
| 0000004560 | 0C76 | 76FF | 6A0E | 6A18 | 9A0F | 02A6 | 03ED | C483 |
| 0000004600 | 1F0E | 5F5E | ED83 | 8B02 | 1FE5 | 4D5D | 0ACA | 1E00 |
| 0000004620 | 9058 | 5545 | EC8B | 8E1E | 81D8 | 06EC | 5700 | 1E56 |
| 0000004640 | 12B8 | 8E04 | 8BD8 | 0646 | 568B | 2508 | FFFF | E281 |
| 0000004660 | 00FF | 000D | 8100 | 00CA | 898C | 0646 | 5689 | 6A08 |
| 0000004700 | 8D0D | 0646 | 5016 | 046A | 468D | 16FA | 9A50 | 02F1 |
| 0000004720 | 0000 | 068E | 0D34 | A326 | 0D40 | 068E | 0D34 | 8326 |
| 0000004740 | 403E | 010D | C01B | 3D40 | 0000 | 0375 | 06E9 | E900 |
| 0000004760 | 0023 | 20E9 | C400 | FA5E | 8B26 | 1447 | 068E | 0D34 |
| 0000005000 | A326 | 0D40 | 013D | 1B00 | 40C0 | 003D | 7500 | E903 |
| 0000005020 | 0003 | 00E9 | 1F00 | 5F5E | ED83 | 8B02 | 1FE5 | 4D5D |
| 0000005040 | 04CA | 1E00 | 9058 | 5545 | EC8B | 8E1E | 81D8 | 06EC |
| 0000005060 | 5700 | 1E56 | 51B8 | 8E04 | 6AD8 | 6A03 | 6A00 | 6A00 |
| 0000005100 | 8D00 | FA46 | 5016 | 7E9A | 0004 | 8E00 | 3406 | 260D |
| 0000005120 | 40A3 | 8E0D | 3406 | 260D | 3E83 | 0D40 | 1B01 | 40C0 |
| 0000005140 | 003D | 7500 | E903 | 0006 | FFB8 | E9FF | 002D | 5EC4 |
| 0000005160 | 26FA | 478B | 8E14 | 3406 | 260D | 40A3 | 3D0D | 0001 |
| 0000005200 | C01B | 3D40 | 0000 | 0375 | 06E9 | B800 | FFFF | 0AE9 |
| 0000005220 | C400 | FA5E | 8B26 | 1A47 | 00E9 | 1F00 | 5F5E | ED83 |
| 0000005240 | 8B02 | 1FE5 | 4D5D | 1ECB | 9058 | 5545 | EC8B | 8E1E |
| 0000005260 | 81D8 | 06EC | 5700 | 1E56 | E5B8 | 8E04 | 6AD8 | 6A03 |
| 0000005300 | 6A00 | 6A00 | 8D00 | FA46 | 5016 | F79A | 0004 | 8E00 |
| 0000005320 | 3406 | 260D | 40A3 | 8E0D | 3406 | 260D | 3E83 | 0D40 |
| 0000005340 | 1B01 | 40C0 | 003D | 7500 | E903 | 0006 | FFB8 | E9FF |
| 0000005360 | 002D | 5EC4 | 26FA | 478B | 8E14 | 3406 | 260D | 40A3 |
| 0000005400 | 3D0D | 0001 | C01B | 3D40 | 0000 | 0375 | 06E9 | B800 |

THU MAR 14 17:48:46 1991 TSL_IF.DLL PAGE 4, LINE 178

| | | | | | | | | |
|---|---|---|---|---|---|---|---|---|
| 0000005420 | FFFF | 0AE9 | C400 | FA5E | 8B26 | 2047 | 00E9 | 1F00 |
| 0000005440 | 5F5E | ED83 | 8B02 | 1FE5 | 4D5D | 1ECB | 9058 | 5545 |
| 0000005460 | EC8B | 8E1E | 81D8 | 3EEC | 5700 | FF56 | 0A76 | 76FF |
| 0000005500 | 9A08 | 574A | 0635 | C483 | 3D04 | 001F | 0377 | 0EE9 |
| 0000005520 | 8E00 | 3406 | 260D | 06C7 | 0D40 | 0320 | A8E9 | 8B01 |
| 0000005540 | 0C46 | 568B | 890E | D446 | 5689 | 8BD6 | 0C46 | 568B |
| 0000005560 | 890E | D846 | 5689 | FFDA | 0A76 | 76FF | 8D08 | DC46 |
| 0000005600 | 5016 | EA9A | 2C56 | 8304 | 08C4 | 3E83 | 0EAE | 7402 |
| 0000005620 | E903 | 0006 | 2BB8 | E900 | 000C | 7E83 | 0106 | C01B |
| 0000005640 | FE25 | 05FF | 002A | 8D50 | D446 | 5016 | 286A | 468D |
| 0000005660 | 16C8 | 9A50 | 057B | 0000 | 068E | 0D34 | A326 | 0D40 |
| 0000005700 | 068E | 0D34 | 8326 | 403E | 010D | C01B | D8F7 | 003D |
| 0000005720 | 7500 | E903 | 0012 | 5EC4 | 26C8 | 478B | 8E14 | 3406 |
| 0000005740 | 260D | 40A3 | E90D | 0003 | 1CE9 | C401 | C85E | 8B26 |
| 0000005760 | 1A47 | 8B26 | 1C57 | 4689 | 89D0 | D256 | 3E83 | 0EAE |
| 0000006000 | 7402 | E903 | 0010 | 068E | 0D34 | 8126 | 403E | D40D |
| 0000006020 | 7500 | E903 | 0019 | 3E83 | 0EAE | 7502 | E9D3 | 0055 |
| 0000006040 | 068E | 0D34 | 8326 | 403E | 000D | 0374 | 46E9 | 8300 |
| 0000006060 | AE3E | 020E | 0374 | 08E9 | 9A00 | 130A | 06F4 | 05E9 |
| 0000006100 | 9A00 | 12B6 | 0713 | 4689 | 89C2 | C456 | 76FF | FFC4 |
| 0000006120 | C276 | 76FF | FF0A | 0876 | 786A | 76FF | FFD2 | D076 |
| 0000006140 | B69A | 1A12 | 5207 | 9A50 | 1360 | 079F | 9A5D | FFFF |
| 0000006160 | 0000 | 4689 | FFCE | CA76 | 76FF | 9AC8 | FFFF | 0000 |
| 0000006200 | 3E83 | 0EAE | 7402 | E903 | 0006 | 05B8 | E900 | 0003 |
| 0000006220 | 04B8 | 8900 | FC46 | 068E | 0D34 | A126 | 0D40 | 23E9 |
| 0000006240 | C700 | CC46 | 0001 | 35E9 | C700 | CC46 | 000D | 2DE9 |
| 0000006260 | C700 | CC46 | 000F | 25E9 | C700 | CC46 | 000E | 1DE9 |
| 0000006300 | E900 | 001A | C00B | 0375 | D6E9 | 2DFF | 00CD | 0375 |
| 0000006320 | DEE9 | 2DFF | 0007 | 0375 | CEE9 | E9FF | FFDB | 006A |
| 0000006340 | 76FF | FFFC | CC76 | 76FF | FF0A | 0876 | C69A | A61A |
| 0000006360 | 5207 | 9A50 | 1360 | 05F4 | FF50 | D276 | 76FF | 9AD0 |
| 0000006400 | FFFF | 0000 | 4689 | 5ECE | 835F | 02ED | E58B | 5D1F |
| 0000006420 | CB4D | 581E | 4590 | 8B55 | 1EEC | D88E | EC81 | 0000 |
| 0000006440 | 5657 | B81E | 0569 | D88E | 76FF | FF08 | 0676 | 76FF |
| 0000006460 | FF0C | 0A76 | 76FF | FF10 | 0E76 | 006A | DB9A | EC05 |
| 0000006500 | 8306 | 0EC4 | 5E1F | 835F | 02ED | E58B | 5D1F | CA4D |
| 0000006520 | 000C | 581E | 4590 | 8B55 | 1EEC | D88E | EC81 | 0000 |
| 0000006540 | 5657 | B81E | 07D4 | D88E | 76FF | FF08 | 0676 | 76FF |
| 0000006560 | FF0C | 0A76 | 76FF | FF10 | 0E76 | 016A | DB9A | EF05 |
| 0000006600 | 8307 | 0EC4 | 5E1F | 835F | 02ED | E58B | 5D1F | CA4D |
| 0000006620 | 000C | 581E | 4590 | 8B55 | 1EEC | D88E | EC81 | 000D |
| 0000006640 | 5657 | B81E | 0814 | D88E | 5E1F | 835F | 02ED | E58B |
| 0000006660 | 5D1F | CA4D | 0008 | 581E | 4590 | 8B55 | 1EEC | D88E |
| 0000006700 | EC81 | 000C | 5657 | B81E | 0854 | D88E | 5E1F | 835F |
| 0000006720 | 02ED | E58B | 5D1F | CA4D | 0004 | 581E | 4590 | 8B55 |
| 0000006740 | 1EEC | D88E | EC81 | 0006 | 5657 | B81E | 0878 | D88E |
| 0000006760 | 468B | 8B06 | 0856 | FF25 | 81FF | FFE2 | 0D00 | 0000 |
| 0000007000 | CA81 | 8D00 | 4689 | 8906 | 0856 | 196A | 468D | 1606 |
| 0000007020 | 6A50 | 8D04 | FA46 | 5016 | 649A | 0006 | 8E00 | 3406 |
| 0000007040 | 260D | 40A3 | 8E0D | 3406 | 260D | 3E83 | 0D40 | 1B01 |
| 0000007060 | 40C0 | 003D | 7500 | E903 | 0006 | 23E9 | E900 | 0020 |
| 0000007100 | 5EC4 | 26FA | 478B | 8E14 | 3406 | 260D | 40A3 | 3D0D |
| 0000007120 | 0001 | C01B | 3D40 | 0000 | 0375 | 03E9 | E900 | 0000 |
| 0000007140 | 5E1F | 835F | 02ED | E58B | 5D1F | CA4D | 0004 | 581E |
| 0000007160 | 4590 | 8B55 | 1EEC | D88E | EC81 | 0006 | 5657 | B81E |
| 0000007200 | 089C | D88E | 486A | 76FF | FF08 | 0676 | 226A | 468D |
| 0000007220 | 16FA | 9A50 | 08C9 | 0000 | 068E | 0D34 | A326 | 0D40 |
| 0000007240 | 068E | 0D34 | 8326 | 403E | 010D | C01B | 3D40 | 0000 |
| 0000007260 | 0375 | 06E9 | E900 | 0039 | 20E9 | C400 | FA5E | 8B26 |

THU MAR 14 17:48:46 1991 TSL_IF.DLL PAGE 5, LINE 237

| | | | | | | | | |
|---|---|---|---|---|---|---|---|---|
| 0000007300 | 1447 | 068E | 0D34 | A326 | 0D40 | 013D | 1B00 | 40C0 |
| 0000007320 | 003D | 7500 | E903 | 0003 | 16E9 | 8B00 | 0646 | 568B |
| 0000007340 | 1E08 | 46BF | 8B00 | 1EF0 | 8E07 | B9DA | 0011 | A5F3 |
| 0000007360 | 1F1F | 5F5E | ED83 | 8B02 | 1FE5 | 4D5D | 04CA | 1E00 |
| 0000007400 | 9058 | 5545 | EC8B | 8E1E | 81D8 | 00EC | 5700 | 1E56 |
| 0000007420 | 30B8 | 8E09 | B8D8 | 0046 | DA8C | 00E9 | 1F00 | 5F5E |
| 0000007440 | ED83 | 8B02 | 1FE5 | 4D5D | 1ECB | 9058 | 5545 | EC8B |
| 0000007460 | 8E1E | 81D8 | 00EC | 5700 | 1E56 | C1B8 | 8E09 | B8D8 |
| 0000007500 | 0EAE | DA8C | 00E9 | 1F00 | 5F5E | ED83 | 8B02 | 1FE5 |
| 0000007520 | 4D5D | 1ECB | 9058 | 5545 | EC8B | 8E1E | 81D8 | 24EC |
| 0000007540 | 5702 | 1E56 | EBB8 | 8E09 | 2BD8 | 89C0 | F686 | 89FE |
| 0000007560 | F486 | 2BFE | 89C0 | E486 | 89FD | E286 | 8DFD | F8BE |
| 0000007600 | BEFE | 0068 | D08C | C08E | 0DB9 | F300 | A4A5 | 00B8 |
| 0000007620 | B900 | 00E5 | BE8D | FF13 | 0716 | AAF3 | 06C7 | 0EAE |
| 0000007640 | 0000 | C02B | B2A3 | A30E | 0EB0 | 06C6 | 0EB4 | C700 |
| 0000007660 | D806 | 000F | 2B00 | A3C0 | 0FDC | DAA3 | 8B0F | 0846 |
| 0000007700 | 460B | 7506 | E903 | 0072 | 681E | 008F | 681E | 0083 |
| 0000007720 | 036A | 016A | FF9A | 00FF | 8E00 | 3406 | 260D | 40A3 |
| 0000007740 | 8E0D | 3406 | 260D | 3E83 | 0D40 | 1B01 | 40C0 | 003D |
| 0000007760 | 7500 | E903 | 000B | 068E | 0D34 | A126 | 0D40 | BAE9 |
| 0000010000 | FF01 | 0876 | 76FF | 8D06 | DC86 | 16FD | 9A50 | 1D62 |
| 0000010020 | 082F | 068E | 0D34 | A326 | 0D40 | 068E | 0D34 | 8326 |
| 0000010040 | 403E | 010D | C01B | 3D40 | 0000 | 0375 | 0BE9 | 8E00 |
| 0000010060 | 3406 | 260D | 40A1 | E90D | 0181 | FF9A | 00FF | 8E00 |
| 0000010100 | 3406 | 260D | 40A3 | 8E0D | 3406 | 260D | 3E83 | 0D40 |
| 0000010120 | 1B01 | 40C0 | 003D | 7500 | E903 | 000B | 068E | 0D34 |
| 0000010140 | A126 | 0D40 | 54E9 | 2B01 | A3C0 | 0FE2 | E0A3 | 6A0F |
| 0000010160 | 6A00 | 1E00 | E068 | 6A0F | 8D00 | EE86 | 16FD | 8D50 |
| 0000010200 | FC46 | 5016 | FF9A | 00FF | 8E00 | 3406 | 260D | 40A3 |
| 0000010220 | 8E0D | 3406 | 260D | 3E83 | 0D40 | 1B01 | 40C0 | 003D |
| 0000010240 | 7500 | E903 | 000B | 068E | 0D34 | A126 | 0D40 | 0AE9 |
| 0000010260 | 9A01 | 139A | 0B6D | 681E | 0046 | 1E9A | F309 | FF0B |
| 0000010300 | E236 | FF0F | E036 | 1E0F | 9468 | 8D00 | E886 | 16FD |
| 0000010320 | 8D50 | EA86 | 16FD | 9A50 | FFFF | 0000 | 8689 | FDE6 |
| 0000010340 | 013D | 1B00 | F7C0 | 3DD8 | 0000 | 0375 | 11E9 | FF00 |
| 0000010360 | E8B6 | FFFD | ECB6 | FFFD | EAB6 | 9AFD | FFFF | 0000 |
| 0000010400 | 42A0 | A200 | 0FDE | 36FF | 0FE2 | 36FF | 0FE0 | 046A |
| 0000010420 | 681E | 00A5 | 468D | 16F8 | 9A50 | FFFF | 0000 | 8689 |
| 0000010440 | FDE6 | 013D | 1B00 | F7C0 | 3DD8 | 0000 | 0375 | 2AE9 |
| 0000010460 | 6800 | 00FF | 76FF | FFFA | F876 | 868D | FEF8 | 5016 |
| 0000010500 | 629A | C057 | 830A | 0AC4 | 76FF | FFFA | F876 | FF9A |
| 0000010520 | 00FF | 2B00 | 89C0 | FA46 | 4689 | 8DF8 | F886 | 16FE |
| 0000010540 | 8D50 | F086 | 16FE | 8D50 | E086 | 16FD | 8D50 | EE86 |
| 0000010560 | 16FE | 9A50 | FFFF | 0000 | 068E | 0D34 | A326 | 0D40 |
| 0000010600 | 068E | 0D34 | 8326 | 403E | 010D | C01B | 3D40 | 0000 |
| 0000010620 | 0375 | 0BE9 | 8E00 | 3406 | 260D | 40A1 | E90D | 001B |
| 0000010640 | B6FF | FEF2 | B6FF | FEF0 | FF9A | 00FF | B800 | 0000 |
| 0000010660 | 068E | 0D34 | A326 | 0D40 | 00E9 | 1F00 | 5F5E | ED83 |
| 0000010700 | 8B02 | 1FE5 | 4D5D | 04CA | 1E00 | 9058 | 5545 | EC8B |
| 0000010720 | 8E1E | 81D8 | 08EC | 5700 | 1E56 | 15B8 | 8E0A | FFD8 |
| 0000010740 | B236 | FF0E | B036 | 6A0E | 9A01 | FFFF | 0000 | 4689 |
| 0000010760 | 6AF8 | 6A23 | 6A00 | 6A00 | 8D00 | FA46 | 5016 | 2E9A |
| 0000011000 | 000D | 8900 | F846 | 468B | 8EF8 | 3406 | 260D | 40A3 |
| 0000011020 | 3D0D | 0001 | C01B | 3D40 | 0000 | 0375 | 0EE9 | 8E00 |
| 0000011040 | 3406 | 260D | 40A1 | E90D | 00B7 | 28E9 | C400 | FA5E |
| 0000011060 | 8B26 | 1447 | 068E | 0D34 | A326 | 0D40 | 013D | 1B00 |
| 0000011100 | 40C0 | 003D | 7500 | E903 | 000B | 068E | 0D34 | A126 |
| 0000011120 | 0D40 | 8CE9 | 1E00 | B768 | 9A00 | 583E | 0B64 | C483 |
| 0000011140 | 0B04 | 75D0 | E903 | 0006 | 26B8 | E900 | 0003 | 27B8 |

THU MAR 14 17:48:46 1991 TSL_IF.DLL PAGE 6, LINE 296

| | | | | | | | | |
|---|---|---|---|---|---|---|---|---|
| 0000011160 | 5000 | 006A | 006A | 006A | 468D | 16FA | 9A50 | 0944 |
| 0000011200 | 0000 | 4689 | 8BF8 | F846 | 068E | 0D34 | A326 | 0D40 |
| 0000011220 | 013D | 1B00 | 40C0 | 003D | 7500 | E903 | 000E | 068E |
| 0000011240 | 0D34 | A126 | 0D40 | 38E9 | E900 | 0028 | 5EC4 | 26FA |
| 0000011260 | 478B | 8E14 | 3406 | 260D | 40A3 | 3D0D | 0001 | C01B |
| 0000011300 | 3D40 | 0000 | 0375 | 0BE9 | 8E00 | 3406 | 260D | 40A1 |
| 0000011320 | E90D | 000D | 006A | FF9A | 00FF | 8900 | F846 | 00E9 |
| 0000011340 | 1F00 | 5F5E | ED83 | 8B02 | 1FE5 | 4D5D | 1ECB | 9058 |
| 0000011360 | 5545 | EC8B | 8E1E | 81D8 | 08EC | 5700 | 6A56 | 6A08 |
| 0000011400 | 6A00 | 6A00 | 8D00 | FA46 | 5016 | AF9A | 000C | 8900 |
| 0000011420 | F846 | 013D | 1B00 | 40C0 | 003D | 7500 | E903 | 0009 |
| 0000011440 | 468B | E9F8 | 0060 | 1EE9 | C400 | FA5E | 8B26 | 1447 |
| 0000011460 | 4689 | 3DF8 | 0001 | C01B | 3D40 | 0000 | 0375 | 06E9 |
| 0000011500 | 8B00 | F846 | 3FE9 | FF00 | B236 | FF0E | B036 | 6A0E |
| 0000011520 | 9A01 | 0C9A | 0000 | 4689 | 83F8 | F87E | 1B01 | 40C0 |
| 0000011540 | 003D | 7500 | E903 | 0010 | 7E81 | 9BF8 | 7501 | E903 |
| 0000011560 | 0006 | 468B | E9F8 | 000E | C02B | B2A3 | A30E | 0EB0 |
| 0000011600 | 00B8 | E900 | 0000 | 5F5E | ED83 | 8B02 | 1FE5 | 4D5D |
| 0000011620 | 1ECB | 9058 | 5545 | EC8B | 8E1E | 81D8 | 00EC | 5700 |
| 0000011640 | 1E56 | 8BB8 | 8E0C | C6D8 | B406 | 000E | 5E1F | 835F |
| 0000011660 | 02ED | E58B | 5D1F | CB4D | 581E | 4590 | 8B55 | 1EEC |
| 0000011700 | D88E | EC81 | 001C | 5657 | 468B | 0B10 | 0E46 | 0375 |
| 0000011720 | 0CE9 | C400 | 0E5E | 8026 | 003F | 0374 | 06E9 | B800 |
| 0000011740 | 0014 | 5AE9 | 9A02 | 0D9D | 0EBA | 4689 | 3DE8 | 0001 |
| 0000011760 | C01B | 3D40 | 0000 | 0375 | 06E9 | 8B00 | E846 | 3EE9 |
| 0000012000 | FF02 | 0876 | 76FF | 9A06 | 574A | 0ECA | C483 | FF04 |
| 0000012020 | 1076 | 76FF | 8B0E | 9AF0 | 574A | 0ED8 | C483 | 0304 |
| 0000012040 | 83F0 | 02C6 | 9A56 | 53E6 | 0EFC | C483 | 8902 | E446 |
| 0000012060 | 5689 | FFE6 | 1076 | 76FF | FF0E | 0876 | 76FF | 1E06 |
| 0000012100 | C368 | FF00 | E676 | 76FF | 9AE4 | 5A18 | 0FC4 | C483 |
| 0000012120 | FF10 | E676 | 76FF | 6AE4 | 6A00 | 8D00 | F646 | 5016 |
| 0000012140 | FF9A | 00FF | 3D00 | 0001 | C01B | D8F7 | 003D | 7500 |
| 0000012160 | E903 | 0014 | 5EC4 | 26F6 | 078B | 8B26 | 0257 | B0A3 |
| 0000012200 | 890E | B216 | E90E | 0008 | C02B | B2A3 | A30E | 0EB0 |
| 0000012220 | B2A1 | 0B0E | B006 | 750E | E903 | 0073 | D4A1 | 8B0F |
| 0000012240 | D616 | C40F | F65E | 3926 | 2657 | 037E | 60E9 | 7D00 |
| 0000012260 | E903 | 0009 | 3926 | 2447 | 0372 | 52E9 | 6A00 | 6A00 |
| 0000012300 | FF00 | B236 | FF0E | B036 | 6A0E | 8D01 | FA46 | 5016 |
| 0000012320 | FF9A | 00FF | 8900 | E846 | 013D | 1B00 | 40C0 | 003D |
| 0000012340 | 7500 | E903 | 000E | C02B | B2A3 | A30E | 0EB0 | 468B |
| 0000012360 | E9E8 | 014B | C02B | B2A3 | A30E | 0EB0 | 76FF | FFF8 |
| 0000012400 | F676 | FF9A | 00FF | 2B00 | 89C0 | F846 | 4689 | 6AF6 |
| 0000012420 | 9A1F | 53E6 | 106E | C483 | 8902 | EA46 | 5689 | FFEC |
| 0000012440 | 0876 | 76FF | FF06 | 0C76 | 76FF | 8D0A | F246 | 5016 |
| 0000012460 | 76FF | FFEC | EA76 | FF9A | 00FF | A100 | 0EB2 | 060B |
| 0000012500 | 0EB0 | 0374 | 38E9 | FF00 | EC76 | 76FF | FFEA | F476 |
| 0000012520 | 76FF | FFF2 | 1076 | 76FF | 6A0E | 6A2C | 6A00 | 1E00 |
| 0000012540 | B068 | 9A0E | FFFF | 0000 | 4689 | 3DE8 | 0001 | C01B |
| 0000012560 | 3D40 | 0000 | 0375 | 06E9 | 8B00 | E846 | C0E9 | FF00 |
| 0000012600 | E676 | 76FF | 1EE4 | B068 | 6A0E | 6A00 | 6A00 | 6A02 |
| 0000012620 | 9A00 | FFFF | 0000 | 4689 | 3DE8 | 0001 | C01B | 3D40 |
| 0000012640 | 0000 | 0375 | 06E9 | 8B00 | E846 | 92E9 | 6A00 | FF06 |
| 0000012660 | E676 | 76FF | FFE4 | E676 | 76FF | 9AE4 | 574A | 10C0 |
| 0000012700 | C483 | 4004 | 8D50 | EE46 | 5016 | BB9A | 000D | 8900 |
| 0000012720 | E846 | 013D | 1B00 | 40C0 | 003D | 7500 | E903 | 0009 |
| 0000012740 | 468B | E9E8 | 0059 | 1EE9 | C400 | EE5E | 8B26 | 1447 |
| 0000012760 | 4689 | 3DE8 | 0001 | C01B | 3D40 | 0000 | 0375 | 06E9 |
| 0000013000 | 8B00 | E846 | 38E9 | FF00 | E676 | 76FF | 9AE4 | 53F0 |
| 0000013020 | 10D2 | C483 | FF04 | 1076 | 76FF | 1E0E | B468 | 9A0E |

THU MAR 14 17:48:46 1991 TSL_IF.DLL PAGE 7, LINE 355

| | | | | | | | | |
|---|---|---|---|---|---|---|---|---|
| 0000013040 | 56EA | 1DE4 | C483 | FF08 | 0876 | 76FF | 1E06 | D468 |
| 0000013060 | 9A0E | 56EA | 0D0C | C483 | B808 | 0000 | 00E9 | 5E00 |
| 0000013100 | 835F | 02ED | E58B | 5D1F | CB4D | 581E | 4590 | 8B55 |
| 0000013120 | 1EEC | D88E | EC81 | 0004 | 5657 | B81E | 0E53 | D88E |
| 0000013140 | 7E83 | 000A | 0375 | 4FE9 | 6A00 | 6A00 | 9A00 | 5C60 |
| 0000013160 | 1135 | C483 | A304 | 0FD4 | 1689 | 0FD6 | 76FF | FF08 |
| 0000013200 | 0676 | B69A | 3C12 | 5211 | 9A50 | 1AC6 | 1143 | 5052 |
| 0000013220 | 689A | 6B0E | 8311 | 0CC4 | 4689 | 3DFC | 0001 | C01B |
| 0000013240 | 3D40 | 0000 | 0375 | 06E9 | 8B00 | FC46 | 31E9 | C700 |
| 0000013260 | AE06 | 020E | E900 | 0022 | 9D9A | 980D | 890E | FC46 |
| 0000013300 | 013D | 1B00 | 40C0 | 003D | 7500 | E903 | 0006 | 468B |
| 0000013320 | E9FC | 000C | 06C7 | 0EAE | 0000 | 00B8 | E900 | 0000 |
| 0000013340 | 5E1F | 835F | 02ED | E58B | 5D1F | CA4D | 0006 | 581E |
| 0000013360 | 4590 | 8B55 | 1EEC | D88E | EC81 | 0000 | 5657 | B81E |
| 0000013400 | 110C | D88E | 7E83 | 0106 | C01B | A340 | 0EAE | 5E1F |
| 0000013420 | 835F | 02ED | E58B | 5D1F | CA4D | 0002 | 581E | 4590 |
| 0000013440 | 8B55 | 1EEC | D88E | EC81 | 0000 | 5657 | B81E | 11B0 |
| 0000013460 | D88E | AEA1 | E90E | 0000 | 5E1F | 835F | 02ED | E58B |
| 0000013500 | 5D1F | CB4D | 581E | 4590 | 8B55 | 1EEC | D88E | EC81 |
| 0000013520 | 0000 | 5657 | B81E | 11DE | D88E | 068E | 0D34 | A126 |
| 0000013540 | 0D40 | 00E9 | 1F00 | 5F5E | ED83 | 8B02 | 1FE5 | 4D5D |
| 0000013560 | 1ECB | 9058 | 5545 | EC8B | 8E1E | 81D8 | 06EC | 5700 |
| 0000013600 | 1E56 | 06B8 | 8E12 | 6AD8 | 6A23 | 6A00 | 6A00 | 8D00 |
| 0000013620 | FA46 | 5016 | 7B9A | 0010 | 8E00 | 3406 | 260D | 40A3 |
| 0000013640 | 8E0D | 3406 | 260D | 3E83 | 0D40 | 1B01 | 40C0 | 003D |
| 0000013660 | 7500 | E903 | 000E | 068E | 0D34 | A126 | 0D40 | 39E9 |
| 0000013700 | E900 | 0030 | 068E | 0D34 | A126 | 0D40 | 5EC4 | 26FA |
| 0000013720 | 4739 | 7514 | E903 | 0006 | 01B8 | E900 | 0003 | 00B8 |
| 0000013740 | 3D00 | 0000 | 0375 | 0BE9 | 8E00 | 3406 | 260D | 40A1 |
| 0000013760 | E90D | 0006 | 00B8 | E900 | 0000 | 5E1F | 835F | 02ED |
| 0000014000 | E58B | 5D1F | CB4D | 581E | 4590 | 8B55 | 1EEC | D88E |
| 0000014020 | EC81 | 0006 | 5657 | B81E | 1233 | D88E | C69A | 201A |
| 0000014040 | 8911 | FA46 | 5689 | 8BFC | FC46 | 460B | 74FA | E903 |
| 0000014060 | 000C | 00B8 | BA00 | 0000 | 13E9 | E900 | 0010 | 5EC4 |
| 0000014100 | 26FA | 878B | 0100 | 8B26 | 0297 | E901 | 0000 | 5E1F |
| 0000014120 | 835F | 02ED | E58B | 5D1F | CB4D | 581E | 4590 | 8B55 |
| 0000014140 | 1EEC | D88E | EC81 | 000D | 5657 | B81E | 12C8 | D88E |
| 0000014160 | B0A1 | 8B0E | B216 | E90E | 0000 | 5E1F | 835F | 02ED |
| 0000014200 | E58B | 5D1F | CB4D | 581E | 4590 | 8B55 | 1EEC | D88E |
| 0000014220 | EC81 | 0000 | 5657 | B81E | 131C | D88E | 468B | A306 |
| 0000014240 | 0FD8 | 5E1F | 835F | 02ED | E58B | 5D1F | CA4D | 0002 |
| 0000014260 | 581E | 4590 | 8B55 | 1EEC | D88E | EC81 | 0000 | 5657 |
| 0000014300 | B81E | 1348 | D88E | 3E83 | 0EAE | 7401 | E903 | 0008 |
| 0000014320 | FF9A | 00FF | E900 | 0003 | D8A1 | E90F | 0000 | 5E1F |
| 0000014340 | 835F | 02ED | E58B | 5D1F | CB4D | 581E | 4590 | 8B55 |
| 0000014360 | 1EEC | D88E | EC81 | 000A | 5657 | 36FF | 0FE2 | 36FF |
| 0000014400 | 0FE0 | 016A | 681E | 00C9 | 468D | 16FA | 9A50 | 13EE |
| 0000014420 | 0000 | 4689 | 3DF6 | 0001 | C01B | D8F7 | 003D | 7500 |
| 0000014440 | E903 | 0006 | 468B | A3FA | 0046 | 36FF | 0FE2 | 36FF |
| 0000014460 | 0FE0 | 016A | 681E | 00D8 | 468D | 16FA | 9A50 | 141E |
| 0000014500 | 0000 | 4689 | 3DF6 | 0001 | C01B | D8F7 | 003D | 7500 |
| 0000014520 | E903 | 0006 | 468B | A3FA | 0048 | 36FF | 0FE2 | 36FF |
| 0000014540 | 0FE0 | 016A | 681E | 00ED | 468D | 16FA | 9A50 | 144E |
| 0000014560 | 0000 | 4689 | 3DF6 | 0001 | C01B | D8F7 | 003D | 7500 |
| 0000014600 | E903 | 0006 | 468B | A3FA | 004A | 36FF | 0FE2 | 36FF |
| 0000014620 | 0FE0 | 016A | 681E | 00FC | 468D | 16FA | 9A50 | 147E |
| 0000014640 | 0000 | 4689 | 3DF6 | 0001 | C01B | D8F7 | 003D | 7500 |
| 0000014660 | E903 | 0006 | 468B | A3FA | 004C | 36FF | 0FE2 | 36FF |
| 0000014700 | 0FE0 | 036A | 681E | 0111 | 468D | 16F8 | 9A50 | 14AE |

THU MAR 14 17:48:46 1991 TSL_IF.DLL PAGE 8, LINE 414

| | | | | | | | | |
|---|---|---|---|---|---|---|---|---|
| 0000014720 | 0000 | 4689 | 3DF6 | 0001 | C01B | D8F7 | 003D | 7500 |
| 0000014740 | E903 | 0006 | 468B | A3F8 | 004E | 36FF | 0FE2 | 36FF |
| 0000014760 | 0FE0 | 036A | 681E | 0122 | 468D | 16F8 | 9A50 | 14DE |
| 0000015000 | 0000 | 4689 | 3DF6 | 0001 | C01B | D8F7 | 003D | 7500 |
| 0000015020 | E903 | 0006 | 468B | A3F8 | 0050 | 36FF | 0FE2 | 36FF |
| 0000015040 | 0FE0 | 016A | 681E | 013B | 468D | 16FA | 9A50 | 150E |
| 0000015060 | 0000 | 4689 | 3DF6 | 0001 | C01B | D8F7 | 003D | 7500 |
| 0000015100 | E903 | 0006 | 468B | A3FA | 0052 | 36FF | 0FE2 | 36FF |
| 0000015120 | 0FE0 | 036A | 681E | 014F | 468D | 16F8 | 9A50 | 153E |
| 0000015140 | 0000 | 4689 | 3DF6 | 0001 | C01B | D8F7 | 003D | 7500 |
| 0000015160 | E903 | 0006 | 468B | A3F8 | 0054 | 36FF | 0FE2 | 36FF |
| 0000015200 | 0FE0 | 036A | 681E | 0160 | 468D | 16F8 | 9A50 | 156E |
| 0000015220 | 0000 | 4689 | 3DF6 | 0001 | C01B | D8F7 | 003D | 7500 |
| 0000015240 | E903 | 0006 | 468B | A3F8 | 0056 | 36FF | 0FE2 | 36FF |
| 0000015260 | 0FE0 | 016A | 681E | 0171 | 468D | 16FA | 9A50 | 159E |
| 0000015300 | 0000 | 4689 | 3DF6 | 0001 | C01B | D8F7 | 003D | 7500 |
| 0000015320 | E903 | 0006 | 468B | A3FA | 0058 | 36FF | 0FE2 | 36FF |
| 0000015340 | 0FE0 | 016A | 681E | 0183 | 468D | 16FA | 9A50 | 15CE |
| 0000015360 | 0000 | 4689 | 3DF6 | 0001 | C01B | D8F7 | 003D | 7500 |
| 0000015400 | E903 | 0006 | 468A | A2FA | 005A | 36FF | 0FE2 | 36FF |
| 0000015420 | 0FE0 | 036A | 681E | 0192 | 468D | 16F8 | 9A50 | 15FE |
| 0000015440 | 0000 | 4689 | 3DF6 | 0001 | C01B | D8F7 | 003D | 7500 |
| 0000015460 | E903 | 0006 | 468B | A3F8 | 005C | 36FF | 0FE2 | 36FF |
| 0000015500 | 0FE0 | 016A | 681E | 01A3 | 468D | 16FA | 9A50 | FFFF |
| 0000015520 | 0000 | 4689 | 3DF6 | 0001 | C01B | D8F7 | 003D | 7500 |
| 0000015540 | E903 | 0006 | 468B | A3FA | 005E | 36FF | 0FE2 | 36FF |
| 0000015560 | 0FE0 | 016A | 681E | 01B7 | 468D | 16FA | 9A50 | 165E |
| 0000015600 | 0000 | 4689 | 3DF6 | 0001 | C01B | D8F7 | 003D | 7500 |
| 0000015620 | E903 | 0006 | 468B | A3FA | 0060 | 36FF | 0FE2 | 36FF |
| 0000015640 | 0FE0 | 016A | 681E | 01C9 | 468D | 16FA | 9A50 | 168E |
| 0000015660 | 0000 | 4689 | 3DF6 | 0001 | C01B | D8F7 | 003D | 7500 |
| 0000015700 | E903 | 0006 | 468B | A3FA | 0062 | 36FF | 0FE2 | 36FF |
| 0000015720 | 0FE0 | 016A | 681E | 01DB | 468D | 16FA | 9A50 | 16BE |
| 0000015740 | 0000 | 4689 | 3DF6 | 0001 | C01B | D8F7 | 003D | 7500 |
| 0000015760 | E903 | 0006 | 468B | A3FA | 0064 | 36FF | 0FE2 | 36FF |
| 0000016000 | 0FE0 | 036A | 681E | 01EA | 468D | 16F8 | 9A50 | 16EA |
| 0000016020 | 0000 | 4689 | 3DF6 | 0001 | C01B | D8F7 | 003D | 7500 |
| 0000016040 | E903 | 0006 | 468B | A3F8 | 0066 | 006A | 006A | 036A |
| 0000016060 | 681E | 01FC | 468D | 16F8 | 9A50 | 1716 | 0000 | 4689 |
| 0000016100 | 3DF6 | 0001 | C01B | D8F7 | 003D | 7500 | E903 | 0006 |
| 0000016120 | 468B | A3F8 | 0044 | 006A | 006A | 016A | 681E | 0215 |
| 0000016140 | 468D | 16FA | 9A50 | 1742 | 0000 | 4689 | 3DF6 | 0001 |
| 0000016160 | C01B | D8F7 | 003D | 7500 | E903 | 0006 | 468A | A2FA |
| 0000016200 | 0042 | 006A | 006A | 036A | 681E | 022D | 468D | 16F8 |
| 0000016220 | 9A50 | 13BE | 0000 | 4689 | 3DF6 | 0001 | C01B | D8F7 |
| 0000016240 | 003D | 7500 | E903 | 000B | 468B | 8EF8 | 3E06 | 260D |
| 0000016260 | C4A3 | B804 | 0000 | 00E9 | 5E00 | 835F | 02ED | E58B |
| 0000016300 | 5D1F | CB4D | 581E | 4590 | 8B55 | 1EEC | D88E | EC81 |
| 0000016320 | 00E0 | 5657 | 76FF | FF08 | 0676 | 4A9A | CF57 | 8312 |
| 0000016340 | 04C4 | 1F3D | 7700 | E903 | 000E | 068E | 0D40 | C726 |
| 0000016360 | 4006 | 200D | E903 | 011C | 76FF | FF08 | 0676 | 868D |
| 0000016400 | FF7E | 5016 | EA9A | CE56 | 8317 | 08C4 | 468D | 899E |
| 0000016420 | F646 | 568C | C7F8 | 2086 | 00FF | 9A00 | 12B6 | 18AE |
| 0000016440 | 5052 | 016A | 868D | FF7E | 5016 | 868D | FF22 | 5016 |
| 0000016460 | 468D | 16F6 | 9A50 | FFFF | 0000 | 068E | 0D40 | A326 |
| 0000016500 | 0D40 | 068E | 0D40 | 8326 | 403E | 010D | C01B | 3D40 |
| 0000016520 | 0000 | 0375 | 20E9 | 8E00 | 4006 | 260D | 3E81 | 0D40 |
| 0000016540 | 01BC | 0374 | 07E9 | 2600 | 06C7 | 0D40 | 01AB | 86C7 |
| 0000016560 | FF20 | 0012 | 6BE9 | 8B00 | F646 | 568B | 1EF8 | BE8D |

THU MAR 14 17:48:46 1991 TSL_IF.DLL PAGE 9, LINE 473

| | | | | | | | | |
|---|---|---|---|---|---|---|---|---|
| 0000016600 | FF24 | F08B | 0716 | DA8E | 2CB9 | F300 | 1FA5 | 468B |
| 0000016620 | 890A | 7C86 | 6AFF | 8D2E | 2486 | 16FF | 6A50 | 8D5A |
| 0000016640 | FA46 | 5016 | 459A | 0012 | 8E00 | 4006 | 260D | 40A3 |
| 0000016660 | 260D | 3E83 | 0D40 | 7400 | E903 | 000D | 5EC4 | 26FA |
| 0000016700 | 7F83 | 0014 | 0375 | 06E9 | C700 | 2086 | 0BFF | FF00 |
| 0000016720 | F876 | 76FF | 9AF6 | 0BFF | 0000 | C02B | 4689 | 89F8 |
| 0000016740 | F646 | 006A | 7E83 | 010A | C01B | 0125 | 0500 | 000F |
| 0000016760 | FF50 | 20B6 | FFFF | 0876 | 76FF | 9A06 | 1AC6 | 18B5 |
| 0000017000 | 5052 | 609A | 8D13 | 5017 | 006A | 006A | B09A | 0007 |
| 0000017020 | E900 | 000C | 5F5E | ED83 | 8B02 | 1FE5 | 4D5D | 1ECB |
| 0000017040 | 9058 | 5545 | EC8B | 8E1E | 81D8 | 00EC | 5700 | 1E56 |
| 0000017060 | 72B8 | 8E13 | 6AD8 | FF01 | 0876 | 76FF | 9A06 | 1774 |
| 0000017100 | 17B7 | C483 | 1F06 | 5F5E | ED83 | 8B02 | 1FE5 | 4D5D |
| 0000017120 | 04CA | 1E00 | 9058 | 5545 | EC8B | 8E1E | 81D8 | 00EC |
| 0000017140 | 5700 | 1E56 | E1B8 | 8E18 | 6AD8 | FF00 | 0876 | 76FF |
| 0000017160 | 9A06 | 1774 | 18F0 | C483 | 1F06 | 5F5E | ED83 | 8B02 |
| 0000017200 | 1FE5 | 4D5D | 04CA | 0000 | 581E | 4590 | 8B55 | 1EEC |
| 0000017220 | D88E | EC81 | 0008 | 5657 | B81E | 1915 | D88E | 468D |
| 0000017240 | 16F8 | FF50 | 0C76 | 76FF | 9A0A | 199C | 1924 | C483 |
| 0000017260 | 8908 | FC46 | 013D | 1B00 | 40C0 | 003D | 7500 | E903 |
| 0000017300 | 0006 | 468B | E9FC | 0016 | 468B | 8BF8 | FA56 | 5EC4 |
| 0000017320 | 2606 | 0789 | 8926 | 0257 | 00B8 | E900 | 0000 | 5E1F |
| 0000017340 | 835F | 02ED | E58B | 5D1F | CA4D | 0008 | 581E | 4590 |
| 0000017360 | 8B55 | 1EEC | D88E | EC81 | 0006 | 5657 | 5EA1 | 8B02 |
| 0000017400 | 6016 | 8902 | FA46 | 5689 | E9FC | 0013 | 5EC4 | 26FA |
| 0000017420 | 878B | 0110 | 8B26 | 1297 | 8901 | FA46 | 5689 | 8BFC |
| 0000017440 | FC46 | 460B | 75FA | E903 | 0022 | 76FF | FFFC | FA76 |
| 0000017460 | 76FF | FF08 | 0676 | 209A | 5C57 | 8319 | 08C4 | 003D |
| 0000017500 | 7400 | E903 | 0003 | 03E9 | E900 | FFC0 | 468B | 0BFC |
| 0000017520 | FA46 | 0375 | 19E9 | 8B00 | FA46 | 568B | C4FC | 0A5E |
| 0000017540 | 8926 | 2607 | 5789 | B802 | 0000 | 09E9 | E900 | 0006 |
| 0000017560 | 10B8 | E900 | 0000 | 5F5E | ED83 | 8B02 | 1FE5 | 4D5D |
| 0000017600 | 1ECB | 9058 | 5545 | EC8B | 8E1E | 81D8 | 00EC | 5700 |
| 0000017620 | 1E56 | 4AB8 | 8E19 | 9AD8 | 1A6C | 19E9 | 163D | 7D00 |
| 0000017640 | E903 | 0006 | 01B8 | E900 | 0003 | 00B8 | E900 | 0000 |
| 0000017660 | 5E1F | 835F | 02ED | E58B | 5D1F | CB4D | 581E | 4590 |
| 0000017700 | 8B55 | 1EEC | D88E | EC81 | 0008 | 5657 | 46C7 | 00F8 |
| 0000017720 | A100 | 025E | 168B | 0260 | 4689 | 89FA | FC56 | 16E9 |
| 0000017740 | C400 | FA5E | 8B26 | 1087 | 2601 | 970B | 0112 | 4689 |
| 0000017760 | 89FA | FC56 | 46FF | 8BF8 | FC46 | 460B | 75FA | E903 |
| 0000020000 | 0003 | DCE9 | 8BFF | F846 | 00E9 | 5E00 | 835F | 02ED |
| 0000020020 | E58B | 5D1F | CB4D | 581E | 4590 | 8B55 | 1EEC | D88E |
| 0000020040 | EC81 | 0000 | 5657 | B81E | 1A43 | D88E | 64A1 | 0B02 |
| 0000020060 | 6206 | 7402 | E903 | 0009 | 00B8 | BA00 | 0000 | 0AE9 |
| 0000020100 | A100 | 0262 | 168B | 0264 | 00E9 | 1F00 | 5F5E | ED83 |
| 0000020120 | 8B02 | 1FE5 | 4D5D | 1ECB | 9058 | 5545 | EC8B | 8E1E |
| 0000020140 | 81D8 | 0CEC | 5700 | 1E56 | D8B8 | 8E1A | 8DD8 | FA46 |
| 0000020160 | 5016 | 76FF | FF0E | 0C76 | 9C9A | 6519 | 831B | 08C4 |
| 0000020200 | 4689 | 83F4 | F47E | 7410 | E903 | 012B | 468A | 2A13 |
| 0000020220 | E9E4 | 000C | 1BE9 | B800 | 0013 | 07E9 | E902 | 0012 |
| 0000020240 | 292D | 7D00 | E903 | FFEF | 4848 | 037F | E5E9 | E9FF |
| 0000020260 | FFE5 | 319A | 721A | 3D1B | 0000 | 0375 | 13E9 | 9A00 |
| 0000020300 | 200D | 1B88 | 003D | 7400 | E903 | 0006 | 84B8 | E903 |
| 0000020320 | 01D2 | 1468 | 9A01 | 53E6 | 1BB3 | C483 | 8902 | FA46 |
| 0000020340 | 5689 | 8BFC | FC46 | 460B | 74FA | E903 | 0006 | 07B8 |
| 0000020360 | E900 | 01B0 | 76FF | FF0E | 0C76 | 76FF | FFFC | FA76 |
| 0000020400 | EA9A | 4A56 | 831A | 08C4 | 468B | 8B10 | 1256 | 5EC4 |
| 0000020420 | 26FA | 8789 | 0100 | 8926 | 0297 | C401 | FA5E | C726 |
| 0000020440 | 0C87 | 0001 | 8B00 | 0A46 | 5EC4 | 26FA | 8789 | 010A |

THU MAR 14 17:48:46 1991 TSL_IF.DLL PAGE 10, LINE 532

| | | | | | | | | |
|---|---|---|---|---|---|---|---|---|
| 0000020460 | 76FF | FF0E | 0C76 | 468B | 8BFA | FC56 | 0005 | 5201 |
| 0000020500 | 6A50 | 6A00 | 6A00 | 6A02 | 9A00 | 1042 | 0000 | 4689 |
| 0000020520 | 3DF4 | 0000 | 0375 | 06E9 | 8B00 | F446 | 45E9 | C401 |
| 0000020540 | FA5E | FF26 | 02B7 | 2601 | B7FF | 0100 | 468B | 8BFA |
| 0000020560 | FC56 | 0605 | 5201 | 9A50 | FFFF | 0000 | 4689 | 3DF4 |
| 0000020600 | 0001 | C01B | 3D40 | 0000 | 0375 | 06E9 | 8B00 | F446 |
| 0000020620 | 11E9 | A101 | 025E | 168B | 0260 | 5EC4 | 26FA | 8789 |
| 0000020640 | 0110 | 8926 | 1297 | 8B01 | FA46 | 568B | A3FC | 025E |
| 0000020660 | 1689 | 0260 | 15E9 | 8300 | F47E | 1B01 | 40C0 | 003D |
| 0000020700 | 7500 | E903 | 0006 | 468B | E9F4 | 00D8 | 056A | 76FF |
| 0000020720 | FF0E | 0C76 | 76FF | FF0E | 0C76 | 4A9A | 2857 | 831D |
| 0000020740 | 04C4 | 5040 | 468D | 16F6 | 9A50 | 1855 | 0000 | 4689 |
| 0000020760 | 3DF4 | 0001 | C01B | 3D40 | 0000 | 0375 | 09E9 | 8B00 |
| 0000021000 | F446 | 9FE9 | E900 | 001E | 5EC4 | 26F6 | 478B | 8914 |
| 0000021020 | F446 | 013D | 1B00 | 40C0 | 003D | 7500 | E903 | 0006 |
| 0000021040 | 468B | E9F4 | 007E | 64A1 | 0B02 | 6206 | 7502 | E903 |
| 0000021060 | 000B | 1EC4 | 0262 | C726 | 0487 | 0201 | 8B00 | FA46 |
| 0000021100 | 568B | A3FC | 0262 | 1689 | 0264 | 68A1 | C402 | FA5E |
| 0000021120 | 8926 | 0E87 | FF01 | 6806 | C402 | FA5E | 8326 | 0CBF |
| 0000021140 | 0001 | 0374 | 1DE9 | FF00 | 6606 | 8302 | 663E | 0802 |
| 0000021160 | 037D | 05E9 | 9A00 | 1DC9 | 1B2B | 5EC4 | 26FA | 87C7 |
| 0000021200 | 010C | 0001 | 5EC4 | 26FA | 87C7 | 0104 | 0000 | 468B |
| 0000021220 | 8BFA | FC56 | 5EC4 | 2606 | 0789 | 8926 | 0257 | 00B8 |
| 0000021240 | E900 | 0000 | 5E1F | 835F | 02ED | E58B | 5D1F | CA4D |
| 0000021260 | 000E | 581E | 4590 | 8B55 | 1EEC | D88E | EC81 | 0008 |
| 0000021300 | 5657 | B81E | 1B19 | D88E | 76FF | FF0C | 0A76 | 468D |
| 0000021320 | 16FA | 9A5D | FFFF | 0000 | 4689 | 3DF8 | 0001 | C01B |
| 0000021340 | 3D40 | 0000 | 0375 | 06E9 | 8B00 | F846 | 1CE9 | FF00 |
| 0000021360 | FC76 | 76FF | FFFA | 0C76 | 76FF | 6A0A | FF00 | 0876 |
| 0000021400 | 76FF | 9A06 | 1B07 | 1C8D | 00E9 | 1F00 | 5F5E | ED83 |
| 0000021420 | 8B02 | 1FE5 | 4D5D | 08CA | 1E00 | 9058 | 5545 | EC8B |
| 0000021440 | 8E1E | 81D8 | 30EC | 5700 | C756 | FA46 | 026A | 5E8C |
| 0000021460 | C7FC | EE46 | 0101 | C02B | 4689 | 89E0 | DE46 | 068E |
| 0000021500 | 0D42 | 8326 | FF3E | 00FF | 0375 | 1DE9 | FF00 | 5C36 |
| 0000021520 | FF02 | 5A36 | 8D02 | D046 | 5016 | FF9A | 00FF | 8300 |
| 0000021540 | 08C4 | 003D | 7400 | E903 | 000F | 068E | 0D44 | 8326 |
| 0000021560 | A43E | 001F | 0375 | 3BE9 | 1E00 | 7168 | 8D02 | E246 |
| 0000021600 | 5016 | 468D | 16D0 | 8D50 | F246 | 5016 | 4E68 | 1E01 |
| 0000021620 | 8E68 | FF02 | 5836 | FF02 | 5636 | FF02 | 5C36 | FF02 |
| 0000021640 | 5A36 | 9A02 | FFFF | 0000 | C483 | 891E | F246 | 5689 |
| 0000021660 | E9F4 | 0008 | C02B | 4689 | 89F4 | F246 | 46C7 | FFF0 |
| 0000021700 | A17F | 025E | 168B | 0260 | 4689 | 89D8 | DA56 | 13E9 |
| 0000021720 | C400 | D85E | 8B26 | 1087 | 2601 | 978B | 0112 | 4689 |
| 0000021740 | 89D8 | DA56 | 468B | 0BDA | D846 | 0375 | 38E9 | C400 |
| 0000021760 | D85E | 8326 | 0CBF | 0001 | 0375 | 27E9 | C400 | D85E |
| 0000022000 | 468B | 26F0 | 8739 | 010E | 037C | 17E9 | 8B00 | D846 |
| 0000022020 | 568B | 89DA | F646 | 5689 | C4F8 | D85E | 8B26 | 0E87 |
| 0000022040 | 8901 | F046 | AAE9 | 8EFF | 4206 | 260D | 3E83 | 1F8C |
| 0000022060 | 7500 | E903 | 004B | 7E83 | FED4 | 0375 | 42E9 | FF00 |
| 0000022100 | F876 | 76FF | 1EF6 | 7868 | 8D02 | E246 | 5016 | 468D |
| 0000022120 | 16F2 | 8D50 | D046 | 5016 | 681E | 028E | 5A68 | FF01 |
| 0000022140 | 5836 | FF02 | 5636 | FF02 | 5C36 | FF02 | 5A36 | 1E02 |
| 0000022160 | 8568 | 6802 | FFFF | FF68 | 9AFF | FFFF | 0000 | C483 |
| 0000022200 | C42A | F65E | FF26 | 02B7 | 2601 | B7FF | 0100 | 786A |
| 0000022220 | 599A | 001F | 8900 | DC46 | 5EC4 | 26F6 | B7FF | 0102 |
| 0000022240 | FF26 | 00B7 | 6801 | 008E | 7D9A | 001F | 8900 | DC46 |
| 0000022260 | 5EC4 | 26F6 | B7FF | 0102 | FF26 | 00B7 | 6A01 | 9A16 |
| 0000022300 | FFFF | 0000 | 4689 | FFDC | 660E | C402 | F65E | C726 |
| 0000022320 | 0C87 | 0001 | 8E00 | 4206 | 260D | 3E83 | 1DF5 | 7500 |

THU MAR 14 17:48:46 1991 TSL_IF.DLL PAGE 11, LINE 591

| | | | | | | | | |
|---|---|---|---|---|---|---|---|---|
| 0000022340 | E903 | 0009 | 7E83 | FED4 | 0374 | 0FE9 | 8E00 | 4406 |
| 0000022360 | 260D | 3E83 | FFFF | 7500 | E903 | 0050 | 46C7 | 00D6 |
| 0000022400 | FF00 | E076 | 76FF | 8DDE | D646 | 5016 | 76FF | FFEE |
| 0000022420 | FC76 | 76FF | 8DFA | E24E | 5116 | 4E8D | 16F2 | 8D51 |
| 0000022440 | D04E | 5116 | 681E | 028E | 6568 | FF01 | 5836 | FF02 |
| 0000022460 | 5636 | FF02 | 5C36 | FF02 | 5A36 | 9A02 | FFFF | 0000 |
| 0000022500 | C483 | 8B28 | D646 | 09E9 | E900 | 0006 | 00B8 | E900 |
| 0000022520 | 0000 | 5F5E | ED83 | 8B02 | 1FE5 | 4D5D | 1ECB | 9058 |
| 0000022540 | 5545 | EC8B | 8E1E | 81D8 | 3EEC | 5700 | C756 | F846 |
| 0000022560 | 029E | 5E8C | C7FA | E446 | 0101 | C02B | 4689 | 89D6 |
| 0000022600 | D446 | 068E | 0D42 | 8326 | 223E | 0021 | 0375 | 1DE9 |
| 0000022620 | FF00 | 5C36 | FF02 | 5A36 | 8D02 | C446 | 5016 | 0B9A |
| 0000022640 | 001E | 8300 | 08C4 | 003D | 7400 | E903 | 000F | 068E |
| 0000022660 | 0D44 | 8326 | 3A3E | 0021 | 0375 | 3BE9 | 1E00 | A268 |
| 0000022700 | 8D02 | D846 | 5016 | 468D | 16C4 | 8D50 | EC46 | 5016 |
| 0000022720 | 7668 | 1E01 | A668 | FF02 | 5836 | FF02 | 5636 | FF02 |
| 0000022740 | 5C36 | FF02 | 5A36 | 9A02 | 1E54 | 0000 | C483 | 891E |
| 0000022760 | EC46 | 5689 | E9EE | 0008 | C02B | 4689 | 89EE | EC46 |
| 0000023000 | FF9A | 00FF | 8900 | EA46 | 46C7 | 00C2 | C700 | E846 |
| 0000023020 | 7FFF | 5EA1 | 8B02 | 6016 | 8902 | CC46 | 5689 | C7CE |
| 0000023040 | FC46 | 0000 | 13E9 | C400 | CC5E | 8B26 | 1087 | 2601 |
| 0000023060 | 978B | 0112 | 4689 | 89CC | CE56 | 468B | 0BCE | CC46 |
| 0000023100 | 0375 | 93E9 | C401 | CC5E | 8326 | 0ABF | 0001 | 0374 |
| 0000023120 | 82E9 | FF01 | CE76 | 76FF | 8DCC | E646 | 5016 | FF9A |
| 0000023140 | 00FF | 3D00 | 0000 | 0375 | 7DE9 | 8E00 | 4206 | 260D |
| 0000023160 | 3E83 | 1EDE | 7500 | E903 | 0009 | 7E83 | FEC8 | 0374 |
| 0000023200 | 0FE9 | 8E00 | 4406 | 260D | 3E83 | 1E21 | 7500 | E903 |
| 0000023220 | 0050 | 46C7 | FFCA | FFFF | D676 | 76FF | 8DD4 | CA46 |
| 0000023240 | 5016 | 76FF | FFE4 | FA76 | 76FF | 8DF8 | D84E | 5116 |
| 0000023260 | 4E8D | 16EC | 8D51 | C44E | 5116 | 681E | 02A6 | 8668 |
| 0000023300 | FF01 | 5836 | FF02 | 5636 | FF02 | 5C36 | FF02 | 5A36 |
| 0000023320 | 9A02 | 1FEC | 0000 | C483 | 8B28 | CA46 | 33E9 | E902 |
| 0000023340 | 0006 | FFB8 | E9FF | 022A | 468B | 39E6 | EA46 | 0374 |
| 0000023360 | 03E9 | E900 | FF31 | 76FF | 8DE6 | F446 | 5016 | FF9A |
| 0000023400 | 00FF | 3D00 | 0000 | 0375 | 7DE9 | 8E00 | 4206 | 260D |
| 0000023420 | 3E83 | 22BD | 7500 | E903 | 0009 | 7E83 | FEC8 | 0374 |
| 0000023440 | 0FE9 | 8E00 | 4406 | 260D | 3E83 | 22D5 | 7500 | E903 |
| 0000023460 | 0050 | 46C7 | FFCA | FFFF | D676 | 76FF | 8DD4 | CA46 |
| 0000023500 | 5016 | 76FF | FFE4 | FA76 | 76FF | 8DF8 | D84E | 5116 |
| 0000023520 | 4E8D | 16EC | 8D51 | C44E | 5116 | 681E | 02A6 | 8D68 |
| 0000023540 | FF01 | 5836 | FF02 | 5636 | FF02 | 5C36 | FF02 | 5A36 |
| 0000023560 | 9A02 | 231D | 0000 | C483 | 8B28 | CA46 | 93E9 | E901 |
| 0000023600 | 0006 | FFB8 | E9FF | 018A | 76FF | 9AE6 | FFFF | 0000 |
| 0000023620 | 4689 | 83F6 | F47E | 7400 | E903 | 0039 | 7E83 | 00F6 |
| 0000023640 | 0374 | 30E9 | FF00 | FC46 | 5EC4 | 8BCC | E846 | 3926 |
| 0000023660 | 0E87 | 7C01 | E903 | 001D | 468B | 8BCC | CE56 | 4689 |
| 0000023700 | 89F0 | F256 | 468B | 89E6 | D246 | 5EC4 | 26CC | 878B |
| 0000023720 | 010E | 4689 | E9E8 | FE4F | 7E83 | 00FC | 0374 | 06E9 |
| 0000023740 | E900 | 00B0 | A4E9 | FF00 | C246 | 76FF | FFF2 | F076 |
| 0000023760 | CD9A | B623 | 891D | D046 | 013D | 1B00 | 40C0 | 003D |
| 0000024000 | 7500 | E903 | 007D | 068E | 0D42 | 8326 | 4B3E | 0023 |
| 0000024020 | 0375 | 09E9 | 8300 | C87E | 74FE | E903 | 000F | 068E |
| 0000024040 | 0D44 | 8326 | 633E | 0023 | 0375 | 50E9 | C700 | CA46 |
| 0000024060 | FFFF | 76FF | FFD6 | D476 | 468D | 16CA | FF50 | E476 |
| 0000024100 | 76FF | FFFA | F876 | 4E8D | 16D8 | 8D51 | EC4E | 5116 |
| 0000024120 | 4E8D | 16C4 | 1E51 | A668 | 6802 | 019F | 36FF | 0258 |
| 0000024140 | 36FF | 0256 | 36FF | 025C | 36FF | 025A | AC9A | 0023 |
| 0000024160 | 8300 | 28C4 | 468B | E9CA | 0098 | 06E9 | B800 | FFFF |
| 0000024200 | 8FE9 | FF00 | D276 | FF9A | 00FF | 8300 | C27E | 7401 |

THU MAR 14 17:48:46 1991 TSL_IF.DLL PAGE 12, LINE 650

| | | | | | | | | |
|---|---|---|---|---|---|---|---|---|
| 0000024220 | E903 | FD7E | 068E | 0D42 | 8326 | 393E | 0020 | 0375 |
| 0000024240 | 09E9 | 8300 | C87E | 74FE | E903 | 000F | 068E | 0D44 |
| 0000024260 | 8326 | 653E | 0020 | 0375 | 51E9 | 8B00 | C246 | 4689 |
| 0000024300 | FFCA | D676 | 76FF | 8DD4 | CA46 | 5016 | 76FF | FFE4 |
| 0000024320 | FA76 | 76FF | 8DF8 | D84E | 5116 | 4E8D | 16EC | 8D51 |
| 0000024340 | C44E | 5116 | 681E | 02A6 | A568 | FF01 | 5836 | FF02 |
| 0000024360 | 5636 | FF02 | 5C36 | FF02 | 5A36 | 9A02 | 2182 | 0000 |
| 0000024400 | C483 | 8B28 | CA46 | 09E9 | E900 | 0006 | 468B | E9C2 |
| 0000024420 | 0000 | 5F5E | ED83 | 8B02 | 1FE5 | 4D5D | 1ECB | 9058 |
| 0000024440 | 5545 | EC8B | 8E1E | 81D8 | 10EC | 5700 | 1E56 | 74B8 |
| 0000024460 | 8E1D | 8DD8 | F046 | 5016 | 76FF | FF08 | 0676 | 9C9A |
| 0000024500 | 9919 | 8325 | 08C4 | 4689 | 3DF8 | 0001 | C01B | 3D40 |
| 0000024520 | 0000 | 0375 | 06E9 | 8B00 | F846 | 97E9 | 6A01 | 6A07 |
| 0000024540 | 6A00 | 6A00 | 8D00 | FA46 | 5016 | 9A9A | 001C | 8900 |
| 0000024560 | F846 | 013D | 1B00 | 40C0 | 003D | 7500 | E903 | 0009 |
| 0000024600 | 468B | E9F8 | 016E | 1EE9 | C400 | FA5E | 8B26 | 1447 |
| 0000024620 | 4689 | 3DF8 | 0001 | C01B | 3D40 | 0000 | 0375 | 06E9 |
| 0000024640 | 8B00 | F846 | 4DE9 | C401 | F05E | FF26 | 08B7 | 2601 |
| 0000024660 | B7FF | 0106 | FF9A | 00FF | C400 | F05E | C02B | 8926 |
| 0000024700 | D887 | 2601 | 8789 | 0106 | 5EC4 | 26F0 | B7FF | 0102 |
| 0000024720 | FF26 | 00B7 | 6A01 | 9A01 | 0E02 | 0000 | 4689 | 3DF8 |
| 0000024740 | 0001 | C01B | 3D40 | 0000 | 0375 | 06E9 | 8B00 | F846 |
| 0000024760 | 01E9 | C401 | F05E | 8326 | 0CBF | 0001 | 0375 | 04E9 |
| 0000025000 | FF00 | 660E | A102 | 025E | 168B | 0260 | 4639 | 74F0 |
| 0000025020 | E903 | 001F | 5639 | 74F2 | E903 | 0017 | 5EC4 | 26F0 |
| 0000025040 | 878B | 0110 | 8B26 | 1297 | A301 | 025E | 1689 | 0260 |
| 0000025060 | 5DE9 | A100 | 025E | 168B | 0260 | 4689 | 89F4 | F656 |
| 0000025100 | 13E9 | C400 | F45E | 8B26 | 1087 | 2601 | 978B | 0112 |
| 0000025120 | 4689 | 89F4 | F656 | 468B | 8BF0 | F256 | 5EC4 | 26F4 |
| 0000025140 | 8739 | 0110 | 0374 | 0AE9 | 2600 | 9739 | 0112 | 0375 |
| 0000025160 | 03E9 | E900 | FFCD | 5EC4 | 26F0 | 878B | 0110 | 8B26 |
| 0000025200 | 1297 | C401 | F45E | 8926 | 1087 | 2601 | 9789 | 0112 |
| 0000025220 | 62A1 | 8B02 | 6416 | 3902 | F046 | 0374 | 41E9 | 3900 |
| 0000025240 | F256 | 0374 | 39E9 | C400 | 621E | 2602 | 878B | 0112 |
| 0000025260 | 0B26 | 1087 | 7501 | E903 | 0018 | 1EC4 | 0262 | 8B26 |
| 0000025300 | 1087 | 2601 | 978B | 0112 | 62A3 | 8902 | 6416 | E907 |
| 0000025320 | 000E | 5EA1 | 8B02 | 6016 | A302 | 0262 | 1689 | 0264 |
| 0000025340 | 76FF | FFF2 | F076 | F09A | A353 | 8322 | 04C4 | 00B8 |
| 0000025360 | E900 | 0000 | 5E1F | 835F | 02ED | E58B | 5D1F | CA4D |
| 0000025400 | 0004 | 581E | 4590 | 8B55 | 1EEC | D88E | EC81 | 0028 |
| 0000025420 | 5657 | B81E | 23DF | D88E | 46C7 | B5FA | 8C02 | FC5E |
| 0000025440 | 46C7 | 01F4 | 2B01 | 89C0 | E646 | 4689 | 8EE4 | 4206 |
| 0000025460 | 260D | 3E83 | 2687 | 7500 | E903 | 001D | 36FF | 025C |
| 0000025500 | 36FF | 025A | 468D | 16D8 | 9A50 | 204F | 0000 | C483 |
| 0000025520 | 3D08 | 0000 | 0374 | 0FE9 | 8E00 | 4406 | 260D | 3E83 |
| 0000025540 | 269F | 7500 | E903 | 003B | 681E | 02B9 | 468D | 16E8 |
| 0000025560 | 8D50 | D846 | 5016 | 468D | 16F6 | 6850 | 01FE | 681E |
| 0000025600 | 02BE | 36FF | 0258 | 36FF | 0256 | 36FF | 025C | 36FF |
| 0000025620 | 025A | 989A | 0020 | 8300 | 1EC4 | 4689 | 89F6 | F856 |
| 0000025640 | 08E9 | 2B0C | [illegible]C0 | F846 | 4689 | 6AF6 | 6A04 | 9A16 |
| 0000025660 | 5C0C | 23F1 | C483 | C404 | 065E | 8926 | 2607 | 5789 |
| 0000025700 | C402 | 065E | 8B26 | 0247 | 0B26 | 7407 | E903 | 007D |
| 0000025720 | 068E | 0D42 | 8326 | C23E | 0021 | 0375 | 09E9 | 8300 |
| 0000025740 | DC7E | 74FE | E903 | 000F | 068E | 0D44 | 8326 | DA3E |
| 0000025760 | 0021 | 0375 | 50E9 | C700 | DE46 | 0007 | 76FF | FFE6 |
| 0000026000 | E476 | 468D | 16DE | FF50 | F476 | 76FF | FFFC | FA76 |
| 0000026020 | 4E8D | 16E8 | 8D51 | F64E | 5116 | 4E8D | 16D8 | 1E51 |
| 0000026040 | BE68 | 6802 | 0204 | 36FF | 0258 | 36FF | 0256 | 36FF |
| 0000026060 | 025C | 36FF | 025A | 229A | 0022 | 8300 | 28C4 | 468B |

THU MAR 14 17:48:46 1991 TSL_IF.DLL PAGE 13, LINE 709

| | | | | | | | | |
|---|---|---|---|---|---|---|---|---|
| 0000026100 | E9DE | 01B1 | 06E9 | B800 | 0007 | A8E9 | C401 | 0A5E |
| 0000026120 | C726 | 0007 | A100 | 025E | 168B | 0260 | 4689 | 89E0 |
| 0000026140 | E256 | 13E9 | C400 | E05E | 8B26 | 1087 | 2601 | 978B |
| 0000026160 | 0112 | 4689 | 89E0 | E256 | 468B | 0BE2 | E046 | 0375 |
| 0000026200 | F5E9 | 6A00 | FF01 | E276 | 76FF | 9AE0 | 574A | 2748 |
| 0000026220 | C483 | 4004 | 9A50 | 5C0C | 281A | C483 | C404 | 0A5E |
| 0000026240 | 8B26 | C11F | 02E3 | 76C4 | 2606 | 34C4 | 8926 | 2600 |
| 0000026260 | 5089 | C402 | 0A5E | 8B26 | C11F | 02E3 | 76C4 | 2606 |
| 0000026300 | 34C4 | 8B26 | 0240 | 0B26 | 7400 | E903 | 007D | 068E |
| 0000026320 | 0D42 | 8326 | 2F3E | 0028 | 0375 | 09E9 | 8300 | DC7E |
| 0000026340 | 74FE | E903 | 000F | 068E | 0D44 | 8326 | 473E | 0028 |
| 0000026360 | 0375 | 50E9 | C700 | DE46 | 0007 | 76FF | FFE6 | E476 |
| 0000026400 | 468D | 16DE | FF50 | F476 | 76FF | FFFC | FA76 | 4E8D |
| 0000026420 | 16E8 | 8D51 | F64E | 5116 | 4E8D | 16D8 | 1E51 | BE68 |
| 0000026440 | 6802 | 020B | 36FF | 0258 | 36FF | 0256 | 36FF | 025C |
| 0000026460 | 36FF | 025A | 8F9A | 0028 | 8300 | 28C4 | 468B | E9DE |
| 0000026500 | 00B3 | 06E9 | B800 | 0007 | AAE9 | FF00 | E276 | 76FF |
| 0000026520 | C4E0 | 0A5E | 8B26 | C11F | 02E3 | 76C4 | 2606 | 34C4 |
| 0000026540 | FF26 | 0270 | FF26 | 9A30 | 56EA | 2662 | C483 | C408 |
| 0000026560 | 0A5E | FF26 | E907 | FEED | 068E | 0D42 | 8326 | E43E |
| 0000026600 | 0025 | 0375 | 09E9 | 8300 | DC7E | 74FE | E903 | 000F |
| 0000026620 | 068E | 0D44 | 8326 | 103E | 0026 | 0375 | 50E9 | C700 |
| 0000026640 | DE46 | 0000 | 76FF | FFE6 | E476 | 468D | 16DE | FF50 |
| 0000026660 | F476 | 76FF | FFFC | FA76 | 4E8D | 16E8 | 8D51 | F64E |
| 0000026700 | 5116 | 4E8D | 16D8 | 1E51 | BE68 | 6802 | 020F | 36FF |
| 0000026720 | 0258 | 36FF | 0256 | 36FF | 025C | 36FF | 025A | E79A |
| 0000026740 | 0026 | 8300 | 28C4 | 468B | E9DE | 0009 | 06E9 | B800 |
| 0000026760 | 0000 | 00E9 | 1F00 | 5F5E | ED83 | 8B02 | 1FE5 | 4D5D |
| 0000027000 | 08CA | 1E00 | 9058 | 5545 | EC8B | 8E1E | 81D8 | 26EC |
| 0000027020 | 5700 | 1E56 | C4B8 | 8E25 | C7D8 | FA46 | 02D6 | 5E8C |
| 0000027040 | C7FC | F246 | 0101 | C02B | 4689 | 89E4 | E246 | 068E |
| 0000027060 | 0D42 | 8326 | A23E | 0029 | 0375 | 1DE9 | FF00 | 5C36 |
| 0000027100 | FF02 | 5A36 | 8D02 | DA46 | 5016 | FA9A | 0025 | 8300 |
| 0000027120 | 08C4 | 003D | 7400 | E903 | 000F | 068E | 0D44 | 8326 |
| 0000027140 | BA3E | 0029 | 0375 | 3BE9 | 1E00 | DA68 | 8D02 | E646 |
| 0000027160 | 5016 | 468D | 16DA | 8D50 | F646 | 5016 | 2668 | 1E02 |
| 0000027200 | DE68 | FF02 | 5836 | FF02 | 5636 | FF02 | 5C36 | FF02 |
| 0000027220 | 5A36 | 9A02 | 2643 | 0000 | C483 | 891E | F646 | 5689 |
| 0000027240 | E9F8 | 0008 | C02B | 4689 | 89F8 | F646 | 46C7 | 00F4 |
| 0000027260 | E900 | 0003 | 46FF | 8BF4 | F446 | 4639 | 77DA | E903 |
| 0000027300 | 001B | 5E8B | C1F4 | 02E3 | 76C4 | 2606 | 70FF | 2602 |
| 0000027320 | 30FF | F09A | 9653 | 8329 | 04C4 | D7E9 | FFFF | 0876 |
| 0000027340 | 76FF | 9A06 | 53F0 | 273E | C483 | 8E04 | 4206 | 260D |
| 0000027360 | 3E83 | 2785 | 7500 | E903 | 0009 | 7E83 | FEDE | 0374 |
| 0000027400 | 0FE9 | 8E00 | 4406 | 260D | 3E83 | 279D | 7500 | E903 |
| 0000027420 | 0039 | 468D | 16E6 | 8D50 | F646 | 5016 | 468D | 16DA |
| 0000027440 | 1E50 | DE68 | 6802 | 022F | 36FF | 0258 | 36FF | 0256 |
| 0000027460 | 36FF | 025C | 36FF | 025A | FF9A | 00FF | 8300 | 1AC4 |
| 0000027500 | 46C7 | 00E0 | E900 | 0006 | 03E9 | E900 | 0000 | 5E1F |
| 0000027520 | 835F | 02ED | E58B | 5D1F | CA4D | 0006 | 581E | 4590 |
| 0000027540 | 8B55 | 1EEC | D88E | EC81 | 01D0 | 5657 | 46C7 | 02FA |
| 0000027560 | 8C03 | FC5E | 86C7 | FE58 | 0101 | C02B | 8689 | FE48 |
| 0000027600 | 8689 | FE46 | 068E | 0D46 | 8326 | E53E | 0028 | 0375 |
| 0000027620 | 1EE9 | FF00 | 8436 | FF03 | 8236 | 8D03 | 3A86 | 16FE |
| 0000027640 | 9A50 | 28FB | 0000 | C483 | 3D08 | 0000 | 0374 | 0FE9 |
| 0000027660 | 8E00 | 4806 | 260D | 3E83 | 2911 | 7500 | E903 | 003D |
| 0000027700 | 681E | 0306 | 868D | FE4A | 5016 | 868D | FE3A | 5016 |
| 0000027720 | 468D | 16F2 | 6850 | 00C0 | 681E | 04B4 | 36FF | 0380 |
| 0000027740 | 36FF | 037E | 36FF | 0384 | 36FF | 0382 | 449A | 0029 |

THU MAR 14 17:48:46 1991 TSL_IF.DLL PAGE 14, LINE 768

| | | | | | | | | |
|---|---|---|---|---|---|---|---|---|
| 0000027760 | 8300 | 1EC4 | 4689 | 89F2 | F456 | 08E9 | 2B00 | 89C0 |
| 0000030000 | F446 | 4689 | C7F2 | F646 | 0000 | 06C7 | 04B2 | FFFF |
| 0000030020 | 06C7 | 04AC | 0000 | 06C7 | 04AE | 0000 | 868D | FE5C |
| 0000030040 | 4689 | 8CEE | F056 | 86C7 | FE5A | 0004 | 86C7 | FE5C |
| 0000030060 | 0061 | 4683 | 02EE | 468B | 8DEE | EE4E | C12B | FE25 |
| 0000030100 | 3DFF | 0000 | 037F | 12E9 | 1E0D | 0A68 | 9A03 | 3BEC |
| 0000030120 | 2985 | C483 | B804 | 0001 | A9E9 | 8B07 | F646 | 5EC4 |
| 0000030140 | 26EE | 0789 | 8683 | FE5A | 8E04 | 4A06 | 260D | 0CA1 |
| 0000030160 | 260D | 168B | 0D0E | 9EC4 | FE5A | 8926 | 2607 | 5789 |
| 0000030200 | 8B02 | F65E | E3D1 | 878B | 03D8 | 8689 | FE36 | BE81 |
| 0000030220 | FE36 | FC18 | 037E | 03E9 | E900 | 0094 | 3E83 | 04B2 |
| 0000030240 | 7C00 | E903 | 0018 | E19A | 0032 | A32B | 04B2 | 3E83 |
| 0000030260 | 04B2 | 7C00 | E903 | 0006 | 06C7 | 04B2 | 0000 | B2A1 |
| 0000030300 | 0104 | 3686 | 83FE | 36BE | 00FE | 037D | 0AE9 | 8300 |
| 0000030320 | 36BE | 20FE | 037D | 03E9 | E900 | 0054 | 9E8B | FE36 |
| 0000030340 | E3D1 | 9F8B | 0398 | 9E89 | FE36 | E3D1 | B2A1 | 3904 |
| 0000030360 | 5087 | 7404 | E903 | 0038 | 06C7 | 04B2 | FFFF | 068E |
| 0000030400 | 0D4C | A126 | 0D38 | 8B26 | 3A16 | 8E0D | 4A06 | 260D |
| 0000030420 | 0CA3 | 260D | 1689 | 0D0E | 868B | FE36 | 4689 | 83F6 |
| 0000030440 | AE3E | 0004 | 037F | 04E9 | FF00 | AE0E | E904 | FF02 |
| 0000030460 | 5E8B | D1F6 | 8BE3 | 7E87 | 8904 | 3686 | 3DFE | FFFE |
| 0000030500 | 0374 | D6E9 | 8301 | B23E | 0004 | 037C | 18E9 | 9A00 |
| 0000030520 | 32E1 | 2B59 | B2A3 | 8304 | B23E | 0004 | 037C | 06E9 |
| 0000030540 | C700 | B206 | 0004 | 8E00 | 4E06 | 260D | 06C7 | 0D3C |
| 0000030560 | 038A | 8C26 | 3E1E | E90D | 000A | 068E | 0D4E | 8326 |
| 0000030600 | 3C06 | 040D | 068E | 0D4E | C426 | 3C1E | 260D | 3F83 |
| 0000030620 | 74FF | E903 | 0015 | 068E | 0D4E | C426 | 3C1E | 8B0D |
| 0000030640 | F646 | 3926 | 0247 | 0375 | 03E9 | E900 | FFCC | 068E |
| 0000030660 | 0D4E | 8326 | 3C06 | 040D | C426 | 3C1E | 260D | 3F83 |
| 0000030700 | 7D00 | E903 | 001A | 068E | 0D4E | C426 | 3C1E | A10D |
| 0000030720 | 04B2 | 3926 | 7407 | E903 | 0003 | 03E9 | E900 | FFCE |
| 0000030740 | 068E | 0D4E | C426 | 3C1E | 260D | 478B | 8902 | 3686 |
| 0000030760 | 3DFE | 0000 | 037C | 22E9 | 8301 | 883E | 0003 | 0375 |
| 0000031000 | 12E9 | 1E01 | 2968 | 8E03 | 5006 | 260D | 36FF | 0332 |
| 0000031020 | FF26 | 3036 | 9A03 | 4544 | 2C02 | C483 | 8E08 | 5206 |
| 0000031040 | 260D | 34A3 | 2603 | 1689 | 0336 | A126 | 0336 | 0B26 |
| 0000031060 | 3406 | 7403 | E903 | 0024 | 068E | 0D50 | FF26 | 3236 |
| 0000031100 | 2603 | 36FF | 0330 | 681E | 032B | 681E | 074C | 5C9A |
| 0000031120 | C845 | 832C | 0CC4 | 00B8 | E900 | 05A8 | B0A1 | 4804 |
| 0000031140 | 8689 | FE34 | 04E9 | FF00 | 348E | 83FE | 34BE | 00FE |
| 0000031160 | 037D | 8AE9 | 8E00 | 5406 | 8B0D | 349E | D1FE | 26E3 |
| 0000031200 | 9F8B | 0338 | E3D1 | 068E | 0D56 | 8B26 | 1887 | 890D |
| 0000031220 | 3286 | 1EFE | 4268 | 8B03 | 3286 | D1FE | 05E0 | 0004 |
| 0000031240 | 7268 | 502D | 209A | 8A57 | 832D | 08C4 | 003D | 7500 |
| 0000031260 | E903 | 002E | 868B | FE32 | 86FF | FE32 | E0D1 | 0405 |
| 0000031300 | 6800 | 2AE0 | 1E50 | 4768 | 8E03 | 5206 | 260D | 36FF |
| 0000031320 | 0336 | FF26 | 3436 | 9A03 | 455C | 2DA7 | C483 | E90C |
| 0000031340 | FFB1 | 681E | 034B | 068E | 0D52 | FF26 | 3636 | 2603 |
| 0000031360 | 36FF | 0334 | 5C9A | C045 | 832D | 08C4 | 68E9 | 8EFF |
| 0000031400 | 5206 | 260D | 36FF | 0336 | FF26 | 3436 | 9A03 | 43F0 |
| 0000031420 | 2D01 | C483 | B804 | 0000 | E9E9 | 8304 | 36BE | 00FE |
| 0000031440 | 0374 | EAE9 | A101 | 04AE | C8E9 | 1E01 | 4D68 | 9A03 |
| 0000031460 | 3BEC | 2D57 | C483 | FF04 | AC06 | C704 | AE06 | 0304 |
| 0000031500 | 8D00 | 5E86 | 39FE | EE46 | 0373 | 6AE9 | C400 | EE5E |
| 0000031520 | 8B26 | D11F | 8BE3 | D887 | 0503 | 0100 | 8689 | FE36 |
| 0000031540 | BE83 | FE36 | 7D00 | E903 | 0031 | BE83 | FE36 | 7C20 |
| 0000031560 | E903 | 0027 | 9E8B | FE36 | E3D1 | 9F8B | 0398 | E3D1 |
| 0000031600 | BF81 | 0450 | 0100 | 0374 | 10E9 | 8B00 | 369E | D1FE |
| 0000031620 | 8BE3 | 9887 | 8903 | F646 | 97E9 | C4FC | EE5E | 8B26 |

THU MAR 14 17:48:46 1991 TSL_IF.DLL PAGE 15, LINE 827

| | | | | | | | | |
|---|---|---|---|---|---|---|---|---|
| 0000031640 | D11F | 8BE3 | D887 | 8903 | 3686 | 83FE | EE6E | 8302 |
| 0000031660 | 5AAE | 04FE | 8AE9 | 83FF | 883E | 0003 | 0375 | 13E9 |
| 0000031700 | 1E01 | 5A68 | 8E03 | 5006 | 260D | 36FF | 0332 | FF26 |
| 0000031720 | 3036 | 9A03 | 4544 | 2EBF | C483 | 8E08 | 5206 | 260D |
| 0000031740 | 34A3 | 2603 | 1689 | 0336 | A126 | 0336 | 0B26 | 3406 |
| 0000031760 | 7403 | E903 | 0024 | 068E | 0D50 | FF26 | 3236 | 2603 |
| 0000032000 | 36FF | 0330 | 681E | 035C | 681E | 074C | 5C9A | 1645 |
| 0000032020 | 832F | 0CC4 | 01B8 | E900 | 03EA | 86C7 | FE30 | 0001 |
| 0000032040 | 04E9 | FF00 | 3086 | 8BFE | 3086 | 39FE | B006 | 7F04 |
| 0000032060 | E903 | 008A | 068E | 0D54 | 9E8B | FE30 | E3D1 | 8B26 |
| 0000032100 | 389F | D103 | 8EE3 | 5606 | 260D | 878B | 0D18 | 8689 |
| 0000032120 | FE32 | 681E | 0373 | 868B | FE32 | E0D1 | 0405 | 6800 |
| 0000032140 | 2F31 | 9A50 | 5720 | 2F49 | C483 | 3D08 | 0000 | 0375 |
| 0000032160 | 2EE9 | 8B00 | 3286 | FFFE | 3286 | D1FE | 05E0 | 0004 |
| 0000032200 | 5168 | 502D | 681E | 0378 | 068E | 0D52 | FF26 | 3636 |
| 0000032220 | 2603 | 36FF | 0334 | 5C9A | 6645 | 832F | 0CC4 | B1E9 |
| 0000032240 | 1EFF | 7C68 | 8E03 | 5206 | 260D | 36FF | 0336 | FF26 |
| 0000032260 | 3436 | 9A03 | 455C | 2F7F | C483 | E908 | FF65 | 068E |
| 0000032300 | 0D52 | FF26 | 3636 | 2603 | 36FF | 0334 | F09A | E243 |
| 0000032320 | 832D | 04C4 | 01B8 | E900 | 032A | 3E83 | 04B2 | 7400 |
| 0000032340 | E903 | 0003 | D0E9 | C7FE | B206 | FF04 | E9FF | FB91 |
| 0000032360 | 1CE9 | 0B00 | 75C0 | E903 | FE31 | 7D48 | E903 | 000F |
| 0000032400 | 7F48 | E903 | FE35 | 7548 | E903 | FFCE | 00E9 | 8300 |
| 0000032420 | 883E | 0003 | 0375 | 22E9 | 8100 | B03E | E804 | 7C03 |
| 0000032440 | E903 | 0017 | 868B | FE36 | 068E | 0D54 | 1E8B | 04B0 |
| 0000032460 | E3D1 | 8926 | 3887 | FF03 | B006 | 8B04 | 369E | D1FE |
| 0000032500 | 8BE3 | 3287 | D104 | 29E0 | EE46 | 868B | FE5A | 968B |
| 0000032520 | FE5C | 8689 | FE42 | 9689 | FE44 | 9E8B | FE36 | E3D1 |
| 0000032540 | 878B | 0432 | E0C1 | 2902 | 5A86 | C4FE | 5A9E | 26FE |
| 0000032560 | 478B | 2604 | 578B | 8E06 | 4A06 | 260D | 0CA3 | 260D |
| 0000032600 | 1689 | 0D0E | 868B | FE36 | 8689 | FE38 | 9E8B | FE36 |
| 0000032620 | E3D1 | 878B | 0414 | 8689 | FE36 | 9E8B | FE36 | E3D1 |
| 0000032640 | 878B | 0406 | 5EC4 | 26EE | 0703 | 8940 | 5686 | 83FE |
| 0000032660 | 56BE | 20FE | 037C | 1FE9 | 8B00 | 569E | D1FE | 8BE3 |
| 0000032700 | 989F | 8903 | F65E | E3D1 | 878B | 0450 | 8603 | FE36 |
| 0000032720 | 003D | 7500 | E903 | 0013 | 9E8B | FE36 | E3D1 | 9F8B |
| 0000032740 | 0406 | E3D1 | 878B | 0398 | 4689 | 8BF6 | 3886 | E9FE |
| 0000032760 | 01E3 | 1068 | 682F | 0D08 | 9EC4 | FE42 | FF26 | 0277 |
| 0000033000 | FF26 | 8E37 | 5806 | 260D | 36FF | 0D1E | FF26 | 1C36 |
| 0000033020 | 9A0D | 3905 | 30D9 | C483 | 8E0C | 5806 | 260D | 1CA3 |
| 0000033040 | 260D | 1689 | 0D1E | F39A | ED3A | E930 | 01D3 | 9EC4 |
| 0000033060 | FE42 | FF26 | FE77 | FF26 | FC77 | B89A | 1439 | 8331 |
| 0000033100 | 04C4 | 068E | 0D4A | A326 | 0D0C | 8926 | 0E16 | E90D |
| 0000033120 | 01AF | 0768 | C401 | 429E | 26FE | 77FF | 26FE | 77FF |
| 0000033140 | 9AFC | 36B2 | 313B | C483 | 8E06 | 4A06 | 260D | 0CA3 |
| 0000033160 | 260D | 1689 | 0D0E | 88E9 | 6801 | 0108 | 9EC4 | FE42 |
| 0000033200 | FF26 | FE77 | FF26 | FC77 | B29A | 5E36 | 8331 | 06C4 |
| 0000033220 | 068E | 0D4A | A326 | 0D0C | 8926 | 0E16 | E90D | 0161 |
| 0000033240 | 9EC4 | FE42 | FF26 | 0277 | FF26 | 9A37 | 3938 | 31AB |
| 0000033260 | C483 | 8E04 | 4A06 | 260D | 0CA3 | 260D | 1689 | 0D0E |
| 0000033300 | 3EE9 | C401 | 429E | 26FE | 3F80 | 742B | E903 | 000E |
| 0000033320 | 068E | 0D4A | C426 | 0C1E | 260D | 07C7 | 000A | 20E9 |
| 0000033340 | C401 | 429E | 26FE | 77FF | 2602 | 37FF | 9EC4 | FE42 |
| 0000033360 | FF26 | FA77 | FF26 | F877 | 8C9A | DA38 | 8331 | 08C4 |
| 0000033400 | 068E | 0D4A | A326 | 0D0C | 8926 | 0E16 | E90D | 00F1 |
| 0000033420 | 9EC4 | FE42 | FF26 | 0277 | FF26 | C437 | 429E | 26FE |
| 0000033440 | 77FF | 26FA | 77FF | 9AF8 | 388C | 31FD | C483 | 8E08 |
| 0000033460 | 4A06 | 260D | 0CA3 | 260D | 1689 | 0D0E | C2E9 | C400 |
| 0000033500 | 429E | 26FE | 77FF | 2602 | 37FF | 259A | 2335 | 8332 |

THU MAR 14 17:48:46 1991 TSL_IF.DLL PAGE 16, LINE 886

| | | | | | | | | |
|---|---|---|---|---|---|---|---|---|
| 0000033520 | 04C4 | 068E | 0D4A | A326 | 0D0C | 8926 | 0E16 | E90D |
| 0000033540 | 009F | 9EC4 | FE42 | 8A26 | A207 | 0386 | 681E | 0386 |
| 0000033560 | 259A | 4735 | 8332 | 04C4 | 068E | 0D4A | A326 | 0D0C |
| 0000033600 | 8926 | 0E16 | E90D | 0079 | 9EC4 | FE42 | FF26 | FE77 |
| 0000033620 | FF26 | FC77 | 259A | 6D35 | 8332 | 04C4 | 068E | 0D4A |
| 0000033640 | A326 | 0D0C | 8926 | 0E16 | E90D | 0055 | 9EC4 | FE42 |
| 0000033660 | 8A26 | A207 | 0386 | 681E | 0386 | 259A | 8635 | 832E |
| 0000033700 | 04C4 | 068E | 0D4A | A326 | 0D0C | 8926 | 0E16 | E90D |
| 0000033720 | 002F | 2CE9 | 4800 | 3D48 | 000C | 0376 | 22E9 | D100 |
| 0000033740 | 93E0 | FF2E | 97A7 | A232 | B130 | DE32 | 0230 | 2931 |
| 0000033760 | 5031 | 7331 | 9131 | C031 | EF31 | 1231 | 3832 | 5C32 |
| 0000034000 | E932 | F82E | 5F5E | ED83 | 8B02 | 1FE5 | 4D5D | 00CB |
| 0000034020 | 581E | 4590 | 8B55 | 1EEC | D88E | EC81 | 0000 | 5657 |
| 0000034040 | 06C7 | 04C6 | 0000 | 5F5E | ED83 | 8B02 | 1FE5 | 4D5D |
| 0000034060 | 1ECB | 9058 | 5545 | EC8B | 8E1E | 81D8 | 0AEC | 5700 |
| 0000034100 | 8E56 | 5A06 | 260D | 00A1 | 2600 | 168B | 0002 | 4689 |
| 0000034120 | 89F6 | F856 | C08C | C08E | 8B26 | 001E | 2600 | 06FF |
| 0000034140 | 0000 | 8E26 | 0206 | 2600 | 078A | 4688 | 8AFA | FA46 |
| 0000034160 | 068E | 0D5C | A226 | 0D38 | 7E80 | 00FA | 0374 | 06E9 |
| 0000034200 | B800 | 0000 | E3E9 | 8001 | FA7E | 745C | E903 | 0024 |
| 0000034220 | 068E | 0D5A | 8B26 | 001E | 2600 | 06FF | 0000 | 8E26 |
| 0000034240 | 0206 | 2600 | 078A | 068E | 0D5C | A226 | 0D38 | 04B8 |
| 0000034260 | E901 | 01B6 | 3E83 | 04C6 | 7400 | E903 | 0042 | 468A |
| 0000034300 | 98FA | 21E9 | C700 | C606 | 0104 | B800 | 0101 | 99E9 |
| 0000034320 | B801 | 0103 | 93E9 | B801 | 0103 | 8DE9 | B801 | 0104 |
| 0000034340 | 87E9 | E901 | 001A | 2B2D | 7500 | E903 | FFE9 | 4848 |
| 0000034360 | 0375 | DCE9 | 2DFF | 000F | 0375 | C8E9 | E9FF | FFDD |
| 0000034400 | 468A | 98FA | 38E9 | C701 | C606 | 0004 | B800 | 0102 |
| 0000034420 | 57E9 | 8E01 | 5A06 | 260D | 1EC4 | 0000 | 8A26 | 9807 |
| 0000034440 | D88B | 87F6 | 0B93 | 7404 | E903 | 0006 | 04B8 | E901 |
| 0000034460 | 0138 | 006A | A368 | 6830 | 0000 | 068E | 0D5A | FF26 |
| 0000034500 | 0236 | 2600 | 36FF | 0000 | D89A | 915F | 8334 | 0AC4 |
| 0000034520 | 068E | 0D5C | A326 | 0D38 | 8926 | 3A16 | 800D | FA7E |
| 0000034540 | 7474 | E903 | 0006 | 07B8 | E901 | 0003 | 08B8 | E901 |
| 0000034560 | 00F8 | 068E | 0D5A | C426 | 001E | 2600 | 078A | 8B98 |
| 0000034600 | F6D8 | 9387 | 070B | 0374 | 18E9 | 8E00 | 5A06 | 260D |
| 0000034620 | 1EC4 | 0000 | 8026 | 5F3F | 0375 | 06E9 | B800 | 0104 |
| 0000034640 | C7E9 | FF00 | F646 | 46C7 | 00FC | E900 | 0003 | 46FF |
| 0000034660 | C4FC | F65E | 768B | 26FC | 008A | 8B98 | F6D8 | 9387 |
| 0000034700 | 070B | 0374 | 0FE9 | C400 | F65E | 768B | 26FC | 3880 |
| 0000034720 | 745F | E903 | 0003 | D5E9 | 8BFF | FC46 | 5040 | E69A |
| 0000034740 | B953 | 8334 | 02C4 | 068E | 0D5C | A326 | 0D38 | 8926 |
| 0000034760 | 3A16 | FF0D | FC76 | 76FF | FFF8 | F676 | FF26 | 3A36 |
| 0000035000 | 260D | 36FF | 0D38 | 629A | C457 | 8330 | 0AC4 | 068E |
| 0000035020 | 0D5C | C426 | 381E | 8B0D | FC76 | C626 | 0000 | 468B |
| 0000035040 | 8EFC | 5A06 | 260D | 0601 | 0000 | 06B8 | E901 | 003A |
| 0000035060 | 05B8 | E901 | 0034 | 04B8 | E901 | 002E | 2BE9 | 2D00 |
| 0000035100 | 002D | 0375 | E9E9 | 2DFF | 0011 | 0375 | B8E9 | 2DFE |
| 0000035120 | 0016 | 0375 | BCE9 | 2DFE | 0017 | 0375 | 13E9 | 2DFF |
| 0000035140 | 0009 | 0375 | ACE9 | E9FE | FFCC | 5F5E | ED83 | 8B02 |
| 0000035160 | 1FE5 | 4D5D | 1ECB | 9058 | 5545 | EC8B | 8E1E | 81D8 |
| 0000035200 | 0AEC | 5700 | 2B56 | 89C0 | F846 | 4689 | 8EF6 | 5E06 |
| 0000035220 | 260D | 3E83 | 0D20 | 7401 | E903 | 002F | 76FF | FF08 |
| 0000035240 | 0676 | 468D | 16FA | 9A50 | FFFF | 0000 | 003D | 7400 |
| 0000035260 | E903 | 0014 | 468A | 50FA | 096A | 1B9A | 9C36 | 8335 |
| 0000035300 | 04C4 | 4689 | 89F6 | F856 | 8CE9 | FF00 | 0876 | 76FF |
| 0000035320 | 8D06 | FA46 | 5016 | FF9A | 00FF | 3D00 | 0000 | 0374 |
| 0000035340 | 17E9 | 8A00 | FA46 | 6A50 | 9A09 | 361B | 35D5 | C483 |
| 0000035360 | 8904 | F646 | 5689 | E9F8 | 005D | 76FF | FF08 | 0676 |

THU MAR 14 17:48:46 1991 TSL_IF.DLL PAGE 17, LINE 945

| | | | | | | | | |
|---|---|---|---|---|---|---|---|---|
| 0000035400 | 468D | 16FA | 9A50 | FFFF | 0000 | 003D | 7400 | E903 |
| 0000035420 | 003A | 468D | 16FC | 9A50 | FFFF | 0000 | 468A | 50FC |
| 0000035440 | 096A | 1B9A | FB36 | 8333 | 04C4 | 4689 | 89F6 | F856 |
| 0000035460 | 468A | 50FA | 096A | 1B9A | 0236 | 8336 | 04C4 | 5EC4 |
| 0000035500 | 26F6 | 4789 | 2608 | 5789 | E90A | 000B | 2168 | 9A03 |
| 0000035520 | 3C12 | 356D | C483 | 8B02 | F646 | 568B | E9F8 | 0000 |
| 0000035540 | 5F5E | ED83 | 8B02 | 1FE5 | 4D5D | 1ECB | 9058 | 5545 |
| 0000035560 | EC8B | 8E1E | 81D8 | 0AEC | 5700 | 6A56 | 9A0A | 53E6 |
| 0000035600 | 3663 | C483 | 8902 | F646 | 5689 | 8AF8 | 0846 | 5EC4 |
| 0000035620 | 26F6 | 0788 | 5EC4 | 2BF6 | 26C0 | 4789 | 2604 | 4789 |
| 0000035640 | C402 | F65E | C02B | 8926 | 0847 | 8926 | 0647 | 0C6A |
| 0000035660 | E69A | E953 | 8335 | 02C4 | 4689 | 89FA | FC56 | 468B |
| 0000035700 | C406 | FA5E | 8926 | C407 | FA5E | C726 | 0247 | 000A |
| 0000035720 | 468B | 8BF6 | F856 | 5EC4 | 26FA | 4789 | 2604 | 5789 |
| 0000035740 | C406 | FA5E | C02B | 8926 | 0A47 | 8926 | 0847 | 468B |
| 0000035760 | 8BFA | FC56 | 00E9 | 5E00 | 835F | 02ED | E58B | 5D1F |
| 0000036000 | CB4D | 581E | 4590 | 8B55 | 1EEC | D88E | EC81 | 0012 |
| 0000036020 | 5657 | 086A | E69A | DF53 | 8336 | 02C4 | 4689 | 89F0 |
| 0000036040 | F256 | 7E81 | 070A | 7401 | E903 | 000F | AF9A | FD09 |
| 0000036060 | 8E36 | 8BC2 | 26D8 | 078B | 03E9 | B800 | 0001 | 4689 |
| 0000036100 | 83FC | FC7E | 7401 | E903 | 000F | AF9A | 1209 | 8E37 |
| 0000036120 | 8BC2 | 26D8 | 078B | 03E9 | B800 | 0001 | 4689 | 9AEE |
| 0000036140 | 09AF | 375D | C28E | D88B | 8A26 | 1447 | E42A | 66F7 |
| 0000036160 | 89EE | F846 | 5689 | 8BFA | 0646 | 568B | 3908 | FA56 |
| 0000036200 | 037E | 19E9 | 7D00 | E903 | 0008 | 4639 | 72F8 | E903 |
| 0000036220 | 000C | 468B | 8BF8 | FA56 | 4689 | 8906 | 0856 | 76FF |
| 0000036240 | FF08 | 0676 | 468B | 99FC | 5052 | 849A | AD61 | C437 |
| 0000036260 | F05E | 8926 | 2607 | 5789 | C402 | F05E | 8126 | 027F |
| 0000036300 | 0100 | 037D | 1CE9 | 7E00 | E903 | 0009 | 8326 | 003F |
| 0000036320 | 0377 | 0EE9 | C400 | F05E | C726 | 0007 | 2600 | 47C7 |
| 0000036340 | 0002 | C401 | F05E | 8B26 | 2607 | 578B | C402 | F05E |
| 0000036360 | 8926 | 0447 | 8926 | 0657 | 0C6A | E69A | 3053 | 8336 |
| 0000036400 | 02C4 | 4689 | 89F4 | F656 | 5EC4 | 26F4 | 07C7 | 0015 |
| 0000036420 | 5EC4 | 26F4 | 47C7 | 0802 | 8B00 | F046 | 568B | C4F2 |
| 0000036440 | F45E | 8926 | 0447 | 8926 | 0657 | 5EC4 | 2BF4 | 26C0 |
| 0000036460 | 4789 | 260A | 4789 | 8B08 | F446 | 568B | E9F6 | 0000 |
| 0000036500 | 5F5E | ED83 | 8B02 | 1FE5 | 4D5D | 1ECB | 9058 | 5545 |
| 0000036520 | EC8B | 8E1E | 81D8 | 0AEC | 5700 | 6A56 | 9A04 | 53E6 |
| 0000036540 | 383E | C483 | 8902 | F646 | 5689 | 8BF8 | 0646 | 568B |
| 0000036560 | 2508 | FFFF | E281 | 00FF | 000D | 8100 | 00CA | C48D |
| 0000036600 | F65E | 8926 | 2607 | 5789 | 6A02 | 9A0C | 53E6 | 36C7 |
| 0000036620 | C483 | 8902 | FA46 | 5689 | C4FC | FA5E | C726 | 1907 |
| 0000036640 | C400 | FA5E | C726 | 0247 | 0004 | 468B | 8BF6 | F856 |
| 0000036660 | 5EC4 | 26FA | 4789 | 2604 | 5789 | C406 | FA5E | C02B |
| 0000036700 | 8926 | 0A47 | 8926 | 0847 | 468B | 8BFA | FC56 | 00E9 |
| 0000036720 | 5E00 | 835F | 02ED | E58B | 5D1F | CB4D | 581E | 4590 |
| 0000036740 | 8B55 | 1EEC | D88E | EC81 | 0006 | 5657 | 468B | 0B08 |
| 0000036760 | 0646 | 0374 | 09E9 | 8B00 | 0A46 | 568B | E90C | 004A |
| 0000037000 | 468B | 8B06 | 0856 | 4689 | 89FA | FC56 | 5EC4 | 2606 |
| 0000037020 | 478B | 260A | 470B | 7508 | E903 | 0014 | 5EC4 | 2606 |
| 0000037040 | 478B | 2608 | 578B | 890A | 0646 | 5689 | E908 | FFDC |
| 0000037060 | 468B | 8B0A | 0C56 | 5EC4 | 2606 | 4789 | 2608 | 5789 |
| 0000037100 | 8B0A | FA46 | 568B | E9FC | 0000 | 5F5E | ED83 | 8B02 |
| 0000037120 | 1FE5 | 4D5D | 1ECB | 9058 | 5545 | EC8B | 8E1E | 81D8 |
| 0000037140 | 06EC | 5700 | 8B56 | 0C46 | 460B | 740A | E903 | 0009 |
| 0000037160 | 468B | 8B06 | 0856 | 84E9 | 8B00 | 0A46 | 568B | 890C |
| 0000037200 | FA46 | 5689 | E9FC | 0011 | 5EC4 | 26FA | 478B | 2608 |
| 0000037220 | 578B | 890A | FA46 | 5689 | C4FC | FA5E | 8B26 | 0A47 |
| 0000037240 | 0B26 | 0847 | 0375 | 03E9 | E900 | FFDC | 468B | 0B08 |

THU MAR 14 17:48:46 1991 TSL_IF.DLL PAGE 18, LINE 1004

| | | | | | | | | |
|---|---|---|---|---|---|---|---|---|
| 0000037260 | 0646 | 0374 | 19E9 | 8B00 | FA46 | 568B | C4FC | 0E5E |
| 0000037300 | 8926 | 2607 | 5789 | 8B02 | 0A46 | 568B | E90C | 002D |
| 0000037320 | 468B | 8B0A | 0C56 | 5EC4 | 260E | 1FC4 | 8926 | 0847 |
| 0000037340 | 8926 | 0A57 | 468B | 8BFA | FC56 | 5EC4 | 260E | 0789 |
| 0000037360 | 8926 | 0257 | 468B | 8B06 | 0856 | 00E9 | 5E00 | 835F |
| 0000037400 | 02ED | E58B | 5D1F | CB4D | 581E | 4590 | 8B55 | 1EEC |
| 0000037420 | D88E | EC81 | 0014 | 5657 | 468B | 8B06 | 0856 | 4689 |
| 0000037440 | 89EC | EE56 | 468B | 8B06 | 0856 | 4689 | 89FA | FC56 |
| 0000037460 | 468B | 0B08 | 0646 | 0374 | 09E9 | 8B00 | 0646 | 568B |
| 0000037500 | E908 | 00F4 | 5EC4 | 26FA | 478B | 260A | 470B | 7508 |
| 0000037520 | E903 | 0014 | 5EC4 | 26FA | 478B | 2608 | 578B | 890A |
| 0000037540 | FA46 | 5689 | E9FC | FFDC | 468B | 0BEE | EC46 | 0375 |
| 0000037560 | BCE9 | C400 | EC5E | 8326 | 093F | 0374 | B0E9 | C400 |
| 0000037600 | EC5E | C426 | 045F | 8A26 | 8807 | F646 | 3E83 | 04C4 |
| 0000037620 | 7400 | E903 | 0041 | 468A | 50F6 | 468D | 16F2 | 9A50 |
| 0000037640 | FFFF | 0000 | 4689 | 3DF0 | 0001 | C01B | 3D40. | 0000 |
| 0000037660 | 0375 | 09E9 | 8B00 | 0646 | 568B | E908 | 007A | 5EC4 |
| 0000037700 | 26F2 | 7F83 | 0116 | 0375 | 06E9 | B800 | 0001 | 03E9 |
| 0000037720 | B800 | 0000 | 4689 | 83F8 | C43E | 0004 | 0374 | 09E9 |
| 0000037740 | 8300 | F87E | 7500 | E903 | 0031 | 5EC4 | 26EC | 5FC4 |
| 0000037760 | 2604 | 078A | 6A50 | 9A0A | 361B | 3810 | C483 | C404 |
| 0000040000 | FA5E | 8926 | 0847 | 8926 | 0A57 | 5EC4 | 26FA | 478B |
| 0000040020 | 2608 | 578B | 890A | FA46 | 5689 | C4FC | EC5E | 8B26 |
| 0000040040 | 0847 | 8B26 | 0A57 | 4689 | 89EC | EE56 | 39E9 | 8BFF |
| 0000040060 | 0646 | 568B | E908 | 0000 | 5F5E | ED83 | 8B02 | 1FE5 |
| 0000040100 | 4D5D | 1ECB | 9058 | 5545 | EC8B | 8E1E | 81D8 | 06EC |
| 0000040120 | 5700 | 8E56 | 5A06 | 260D | 00A0 | 8ED0 | 6006 | 260D |
| 0000040140 | 062A | 0D34 | 068E | 0D62 | 3A26 | 1206 | 730D | E903 |
| 0000040160 | 00BF | A126 | 0D10 | 8EE9 | E900 | 00A1 | 068E | 0D62 |
| 0000040200 | FF26 | 1636 | 260D | 36FF | 0D14 | FB9A | AA37 | 833A |
| 0000040220 | 04C4 | 4689 | 89FA | FC56 | E568 | 6833 | 0D08 | 76FF |
| 0000040240 | FFFC | FA76 | 068E | 0D64 | FF26 | 1E36 | 260D | 36FF |
| 0000040260 | 0D1C | 059A | 3D39 | 833B | 0CC4 | 068E | 0D64 | A326 |
| 0000040300 | 0D1C | 8926 | 1E16 | E90D | 0053 | 068E | 0D66 | C426 |
| 0000040320 | 081E | 260D | 3F83 | 7515 | E903 | 0003 | 3EE9 | 8E00 |
| 0000040340 | 6206 | 260D | 14A1 | 260D | 168B | 0D16 | 068E | 0D66 |
| 0000040360 | C426 | 081E | 260D | 5FC4 | 2604 | 4789 | 2604 | 5789 |
| 0000040400 | E906 | 0019 | 16E9 | 0B00 | 75C0 | E903 | FF6B | 7548 |
| 0000040420 | E903 | FF68 | 7548 | E903 | FFB0 | 00E9 | 6800 | 3BD4 |
| 0000040440 | 2868 | 6803 | 3B49 | 1068 | 9A0D | 3E70 | 3B65 | 22E9 |
| 0000040460 | 5EFF | 835F | 02ED | E58B | 5D1F | CB4D | 581E | 4590 |
| 0000040500 | 8B55 | 1EEC | D88E | EC81 | 0000 | 5657 | 2268 | 9A03 |
| 0000040520 | 3C12 | 3BDC | C483 | 5E02 | 835F | 02ED | E58B | 5D1F |
| 0000040540 | CB4D | 581E | 4590 | 8B55 | 1EEC | D88E | EC81 | 0000 |
| 0000040560 | 5657 | 76FF | 6806 | 3BCE | 2268 | 9A0D | 613C | 3C02 |
| 0000040600 | C483 | 5E06 | 835F | 02ED | E58B | 5D1F | CB4D | 581E |
| 0000040620 | 4590 | 8B55 | 1EEC | D88E | EC81 | 0000 | 5657 | B81E |
| 0000040640 | 28C5 | D88E | 5EC4 | 2606 | 47C7 | 0004 | C400 | 065E |
| 0000040660 | C02B | 8926 | 0247 | 8926 | C407 | 065E | C726 | 0647 |
| 0000040700 | 0000 | 5E1F | 835F | 02ED | E58B | 5D1F | CA4D | 0004 |
| 0000040720 | 581E | 4590 | 8B55 | 1EEC | D88E | EC81 | 0006 | 5657 |
| 0000040740 | B81E | 3C50 | D88E | 5EC4 | 260E | 478B | C406 | 0E5E |
| 0000040760 | 3926 | 0447 | 0374 | 32E9 | C400 | 0E5E | 8326 | 0447 |
| 0000041000 | C40A | 0E5E | 8B26 | 0447 | 0505 | C100 | 03E0 | C450 |
| 0000041020 | 0E5E | FF26 | 0277 | FF26 | 9A37 | 5B3A | 3C2E | C483 |
| 0000041040 | C406 | 0E5E | 8926 | 2607 | 5789 | C402 | 0E5E | 8B26 |
| 0000041060 | 0647 | E0C1 | C403 | 0E5E | 0326 | 2607 | 578B | 0502 |
| 0000041100 | 0028 | 4689 | 89FA | FC56 | 5EC4 | 260E | 47FF | 1E06 |
| 0000041120 | 768D | 8C06 | 8ED0 | C4D8 | FA7E | A5A5 | A5A5 | 1F1F |

THU MAR 14 17:48:46 1991 TSL_IF.DLL PAGE 19, LINE 1063

| | | | | | | | | |
|---|---|---|---|---|---|---|---|---|
| 0000041140 | 5F5E | ED83 | 8B02 | 1FE5 | 4D5D | 0CCA | 1E00 | 9058 |
| 0000041160 | 5545 | EC8B | 8E1E | 81D8 | 04EC | 5700 | 1E56 | 92B8 |
| 0000041200 | 8E3C | C4D8 | 0A5E | C426 | 2B1F | 26C0 | 4789 | 2602 |
| 0000041220 | 0789 | 5EC4 | 260A | 478B | 0506 | 0005 | E0C1 | C403 |
| 0000041240 | 0A5E | C426 | 261F | 4789 | 9A04 | 12B6 | 3DAB | 5052 |
| 0000041260 | 8E68 | C400 | 0A5E | FF26 | 0277 | FF26 | 9A37 | FFFF |
| 0000041300 | 0000 | 4689 | 3DFC | 0001 | C01B | 3D40 | 0000 | 0375 |
| 0000041320 | 06E9 | 8B00 | FC46 | 2DE9 | C400 | 0A5E | C426 | 261F |
| 0000041340 | 078B | 5EC4 | 2606 | 0789 | C726 | 0247 | 0000 | 5EC4 |
| 0000041360 | 260A | 77FF | 2602 | 37FF | F09A | CC53 | 833C | 04C4 |
| 0000041400 | 00B8 | E900 | 0000 | 5E1F | 835F | 02ED | E58B | 5D1F |
| 0000041420 | CA4D | 0008 | 581E | 4590 | 8B55 | 1EEC | D88E | EC81 |
| 0000041440 | 0008 | 5657 | B81E | 3D2F | D88E | C02B | 4689 | 89FC |
| 0000041460 | FA46 | 468B | 0B0C | 0A46 | 0374 | 06E9 | B800 | 0000 |
| 0000041500 | 6FE9 | 8B00 | 0A46 | 568B | 250C | FFFF | E281 | 00FF |
| 0000041520 | 000D | 8100 | 00CA | 898E | 0A46 | 5689 | 9A0C | 12B6 |
| 0000041540 | 3D5C | 5052 | 76FF | FF0C | 0A76 | 76FF | FF08 | 0676 |
| 0000041560 | FF9A | 00FF | 8900 | F846 | 013D | 1B00 | 40C0 | 003D |
| 0000041600 | 7500 | E903 | 0006 | 468B | E9F8 | 0026 | 5EC4 | 2606 |
| 0000041620 | 1FC4 | 8B26 | 0447 | 282D | C100 | 03E8 | 5EC4 | 2606 |
| 0000041640 | 4789 | C404 | 065E | C726 | 0647 | 0000 | 00B8 | E900 |
| 0000041660 | 0000 | 5E1F | 835F | 02ED | E58B | 5D1F | CA4D | 0008 |
| 0000041700 | 581E | 4590 | 8B55 | 1EEC | D88E | EC81 | 0000 | 5657 |
| 0000041720 | B81E | 3DD6 | D88E | 5EC4 | 260A | 478B | C404 | 0A5E |
| 0000041740 | 3926 | 0647 | 0374 | 16E9 | C400 | 065E | C726 | 0007 |
| 0000041760 | C400 | 065E | C626 | 0247 | B880 | 0001 | 31E9 | C400 |
| 0000042000 | 0A5E | 8B26 | 0647 | E0C1 | C403 | 0A5E | 0326 | 2607 |
| 0000042020 | 578B | 0502 | 0028 | 8B1E | 8EF0 | C4DA | 067E | A5A5 |
| 0000042040 | A5A5 | C41F | 0A5E | FF26 | 0647 | 00B8 | E900 | 00C0 |
| 0000042060 | 5E1F | 835F | 02ED | E58B | 5D1F | CA4D | 0008 | 0000 |
| 0000042100 | 0000 | 0000 | 0000 | 0000 | 0000 | 0000 | 0000 | 8B55 |
| 0000042120 | 1EEC | CC68 | 1E04 | D068 | 9A04 | FFFF | 0000 | 068E |
| 0000042140 | 04CC | A126 | 0015 | 0CA3 | BB05 | 04D6 | 1F8C | 05BE |
| 0000042160 | 8310 | FEE6 | 1E56 | FF9A | 00FF | 0B00 | 74C0 | 3304 |
| 0000042200 | EBC0 | 893A | 0477 | 894E | D436 | 8304 | 03EE | 04C7 |
| 0000042220 | 0001 | 7789 | 8906 | 0877 | C683 | C702 | FE04 | 89FF |
| 0000042240 | 0A77 | 681E | 04CA | 681E | 04C8 | FF9A | 00FF | E800 |
| 0000042260 | 0020 | C29A | 1041 | E83E | 0066 | 01B8 | 5D00 | 50CB |
| 0000042300 | 809A | 6541 | 9A3F | 42FA | 3F73 | FF68 | 9A00 | 4089 |
| 0000042320 | 3F78 | BB1E | 000D | FF33 | 068E | 04CA | FFB9 | 267F |
| 0000042340 | 3D80 | 7500 | 4701 | 8026 | 003D | 3174 | EABE | 8B04 |
| 0000042360 | 8BD1 | F3CB | 8BA6 | 74CA | 3308 | F2C0 | 74AE | EBE7 |
| 0000042400 | 061C | 071E | F78B | BF1F | 0511 | 2CAC | 7241 | C00E |
| 0000042420 | 04E0 | AC92 | 412C | 0572 | C20A | EBAA | 1FED | 00C3 |
| 0000042440 | 02BB | 5200 | D48B | A780 | 0511 | 50B7 | C48B | 1653 |
| 0000042460 | 1650 | 9A52 | FFFF | 0000 | C00B | 7558 | B110 | 3C40 |
| 0000042500 | 7401 | 3C06 | 7502 | B106 | 0808 | 118F | 4B05 | D679 |
| 0000042520 | E85A | 0026 | 30BE | BF0D | 0D30 | 5FE8 | BE01 | 0D30 |
| 0000042540 | 30BF | E80D | 0156 | 30B8 | 3D0D | 0D34 | 0B74 | 016A |
| 0000042560 | 680E | 405B | FF9A | 00FF | C300 | 0E8B | 0D26 | 2AE3 |
| 0000042600 | 06C4 | 0D28 | C28C | DB33 | 1EFF | 0D24 | 0373 | 61E9 |
| 0000042620 | 8E01 | D006 | 2604 | 1E8B | 0006 | 754B | C40D | 2C06 |
| 0000042640 | 8C0D | BBC2 | 0003 | 1EFF | 0D24 | B8C3 | 3E82 | D88E |
| 0000042660 | 21A1 | 0B07 | 75C0 | 0E10 | 94A1 | 0B0C | 75C0 | E805 |
| 0000042700 | 001F | 03EB | 24E8 | 6A00 | 6A03 | 6A00 | 9A00 | 4025 |
| 0000042720 | 0000 | 8B55 | 33EC | EBC9 | 551A | EC8B | 01B9 | EB00 |
| 0000042740 | 5512 | EC8B | 5756 | 00B9 | EB01 | 5508 | EC8B | 5756 |
| 0000042760 | 01B9 | E801 | 004B | 0A51 | 75C9 | BE12 | 0FF2 | F2BF |
| 0000043000 | E80F | 00B8 | 30BE | BF0D | 0D34 | AFE8 | BE00 | 0D34 |

THU MAR 14 17:48:46 1991 TSL_IF.DLL PAGE 20, LINE 1122

| | | | | | | | | |
|---|---|---|---|---|---|---|---|---|
| 0000043020 | 34BF | E80D | 00A6 | 34BE | BF0D | 0D34 | 9DE8 | E800 |
| 0000043040 | 008C | 0A58 | 75E4 | C713 | 2106 | 0107 | B800 | 0001 |
| 0000043060 | 8A50 | 0646 | 9A50 | FFFF | 0000 | 4EE8 | 5F00 | 5D5E |
| 0000043100 | 55CB | EC8B | 0D6A | 3BE8 | 8318 | 02C4 | 068E | 04D0 |
| 0000043120 | 8B26 | 061E | 4B00 | 168B | 0723 | FA83 | 75FF | 8904 |
| 0000043140 | 231E | 3907 | 231E | 9F07 | 0D6A | 41E8 | 8318 | 02C4 |
| 0000043160 | 749E | 6A0A | E80E | 17EC | C483 | EB02 | 3BC7 | 74D3 |
| 0000043200 | 6A08 | E80E | 17FE | C483 | 5D02 | 55C3 | EC8B | 0D6A |
| 0000043220 | F1E8 | 8317 | 02C4 | 06C7 | 0723 | FFFF | 0D6A | 0DE8 |
| 0000043240 | 8318 | 02C4 | 0E6A | 05E8 | 8318 | 02C4 | C35D | 0E8B |
| 0000043260 | 0D26 | 07E3 | 02BB | FF00 | 241E | C30D | F73B | 0E73 |
| 0000043300 | EF83 | 8B04 | 0B05 | 0245 | F274 | 1DFF | EEEB | 00C3 |
| 0000043320 | 8B55 | B8EC | 00FC | 0E50 | 6FE8 | 8301 | 283E | 0007 |
| 0000043340 | 0474 | 1EFF | 0726 | FFB8 | 5000 | E80E | 015C | E58B |
| 0000043360 | CB5D | 02B8 | E900 | FDC7 | 5A59 | DC8B | D82B | 0B72 |
| 0000043400 | FB81 | 0200 | 0572 | E38B | 5152 | 52CB | 3351 | E9C0 |
| 0000043420 | FDAD | 14C8 | 0000 | 5657 | FF2B | F78B | 3639 | 04CA |
| 0000043440 | 0375 | F0E9 | A100 | 04CA | C92B | 4E89 | 89F4 | F646 |
| 0000043460 | 4E89 | 89F8 | FA46 | 0C6A | 76FF | FFFA | F876 | 681E |
| 0000043500 | 04EA | 8C9A | 3657 | 8342 | 0AC4 | C00B | 1A74 | 8146 |
| 0000043520 | FFFE | 767F | E903 | 00BD | 5EC4 | FFF8 | F846 | 8026 |
| 0000043540 | 003F | EA75 | EB47 | 900D | 5EC4 | FFF8 | F846 | 8026 |
| 0000043560 | 003F | F475 | 5E8B | 26F8 | 3F80 | 7500 | 8DB9 | 0145 |
| 0000043600 | 6A50 | 9A04 | 5C0C | 4245 | C483 | 8904 | F046 | 5689 |
| 0000043620 | 56F2 | E69A | 7B53 | 8342 | 02C4 | 4689 | 89FC | FE56 |
| 0000043640 | 468B | 0BF2 | F046 | 6D74 | C28B | 460B | 74FC | 8B66 |
| 0000043660 | F046 | 568B | A3F2 | 0717 | 1689 | 0719 | 0C6A | 76FF |
| 0000043700 | FFF6 | F476 | 681E | 04EA | 8C9A | 8057 | 833F | 0AC4 |
| 0000043720 | C00B | 2C74 | 468B | 8BFC | FE56 | 5EC4 | 83F0 | F046 |
| 0000043740 | 2604 | 0789 | 8926 | 0257 | 5EC4 | FFF4 | F446 | 8A26 |
| 0000043760 | C407 | FC5E | 46FF | 26FC | 0788 | C00A | 0E74 | E8EB |
| 0000044000 | 5EC4 | FFF4 | F446 | 8026 | 003F | F475 | 5EC4 | 26F4 |
| 0000044020 | 3F80 | 7500 | 5EA7 | C95F | 90CB | 8B55 | 56EC | B857 |
| 0000044040 | 405C | D88E | C08E | 568B | BE06 | 0D70 | 3BAD | 74C2 |
| 0000044060 | 4010 | 7496 | 970C | C033 | FFB9 | F2FF | 8BAE | EBF7 |
| 0000044100 | 96EB | 5E5F | E58B | CA5D | 0002 | 8B55 | 57EC | 76FF |
| 0000044120 | 0E06 | C5E8 | 0BFF | 74C0 | 921F | FA8B | C033 | FFB9 |
| 0000044140 | F2FF | F7AE | 49D1 | 8B50 | BBC4 | 0002 | 1E53 | 5152 |
| 0000044160 | 5016 | FF9A | 00FF | 5B00 | 8B5F | 5DE5 | 02CA | 0000 |
| 0000044200 | 1601 | 0202 | 0203 | 1804 | 0D05 | 0906 | 0C07 | 0C08 |
| 0000044220 | 0C09 | 070A | 080B | 160C | 160D | 020F | 0D10 | 1211 |
| 0000044240 | 0212 | 0235 | 0D41 | 0243 | 0D52 | 0D53 | 0D57 | 0B59 |
| 0000044260 | 0D6C | 206D | 1C70 | 0972 | 1606 | 0A80 | 0A81 | 0982 |
| 0000044300 | 0D84 | 0BA4 | 02CE | 0BD7 | 0D00 | 1608 | 8B52 | E8D8 |
| 0000044320 | 161C | 8E93 | 5AC2 | 8926 | 0247 | 8926 | B817 | FFFF |
| 0000044340 | 8B99 | 5DE5 | E8CB | 0008 | FFB8 | 99FF | E58B | CB5D |
| 0000044360 | D88B | F9E8 | 9315 | C28E | 8926 | 0247 | BB53 | 4330 |
| 0000044400 | 24B9 | 0A00 | 75E4 | 2E1B | 073A | 1674 | 4343 | F7E2 |
| 0000044420 | 133C | 0472 | 243C | 0A76 | 3C43 | 72BC | 3C04 | 76CA |
| 0000044440 | 4301 | 8A2E | 0147 | 5B98 | 8926 | C307 | 8B55 | BBEC |
| 0000044460 | 0002 | 05EB | 8B55 | 33EC | E8DB | 15B2 | C303 | CB5D |
| 0000044500 | 04C8 | 0000 | 46C7 | FFFC | C4FF | 065E | F626 | 0A47 |
| 0000044520 | 7440 | 2607 | 47C6 | 000A | 2CEB | C38B | 342D | B907 |
| 0000044540 | 000C | F799 | 89F9 | FE46 | E850 | 14C8 | C483 | FF02 |
| 0000044560 | 0876 | 76FF | 9A06 | 443C | 4456 | C483 | 8904 | FC46 |
| 0000044600 | 76FF | E8FE | 14BA | 468B | C9FC | 90CB | 10C8 | 0000 |
| 0000044620 | 5657 | FFBF | 8BFF | 0676 | 44F6 | 830A | 0375 | 97E9 |
| 0000044640 | 1E00 | 9A56 | 4918 | 447B | C483 | 8B04 | 8BF8 | 81DE |
| 0000044660 | 34EB | 8B07 | 1887 | 8909 | FA46 | 561E | 2DE8 | 8302 |

THU MAR 14 17:48:46 1991 TSL_IF.DLL PAGE 21, LINE 1181

| | | | | | | | | |
|---|---|---|---|---|---|---|---|---|
| 0000044700 | 04C4 | 448A | 2A0B | 50E4 | 729A | 964F | 8344 | 02C4 |
| 0000044720 | C00B | 617C | 7E83 | 00FA | 5E74 | 681E | 072E | 468D |
| 0000044740 | 16F0 | 9A50 | 56EA | 44B6 | C483 | 8D08 | F246 | 4689 |
| 0000044760 | 8CFC | FE56 | 7E80 | 5CF0 | 1474 | 681E | 0730 | 468D |
| 0000045000 | 16F0 | 9A50 | 56A4 | 44CF | C483 | EB08 | 9004 | 4EFF |
| 0000045020 | 6AFC | FF0A | FE76 | 76FF | FFFC | FA76 | 229A | DC58 |
| 0000045040 | 8344 | 08C4 | 468D | 16F0 | 9A50 | 6166 | 41F5 | C483 |
| 0000045060 | 0B04 | 74C0 | BF03 | FFFF | 44C6 | 000A | C78B | 5F5E |
| 0000045100 | CBC9 | 08C8 | 0000 | FA9A | 204E | 8945 | FC46 | 5689 |
| 0000045120 | 0BFE | 75D0 | 2B05 | 99C0 | 37EB | 76FF | 50FE | 76FF |
| 0000045140 | FF0E | 0C76 | 76FF | FF0A | 0876 | 76FF | 9A06 | 4720 |
| 0000045160 | 4558 | C483 | 890E | F846 | 5689 | 8BFA | FC46 | 342D |
| 0000045200 | B907 | 000C | F799 | 50F9 | B5E8 | 8B13 | F846 | 568B |
| 0000045220 | C9FA | 90CB | 8B55 | 6AEC | FF40 | 0C76 | 76FF | FF0A |
| 0000045240 | 0876 | 76FF | 9A06 | 44F2 | 4428 | CBC9 | 08C8 | 0000 |
| 0000045260 | 5657 | 768B | 8B06 | 2DC6 | 0734 | 0CB9 | 9900 | F9F7 |
| 0000045300 | 4689 | 50FA | 6DE8 | 8313 | 02C4 | 561E | 93E8 | 8302 |
| 0000045320 | 04C4 | F88B | 468D | 160E | FF50 | 0C76 | 76FF | 1E0A |
| 0000045340 | 9A56 | 4A10 | 44F9 | C483 | 890C | F846 | 561E | E857 |
| 0000045360 | 02E8 | C483 | FF06 | FA76 | 45E8 | 8313 | 02C4 | 468B |
| 0000045400 | 5EF8 | C95F | 90CB | 8B55 | 56EC | 8B57 | 0876 | 448A |
| 0000045420 | A80A | 7482 | A864 | 754D | C760 | 0444 | 0000 | 01A8 |
| 0000045440 | 0B74 | 10A8 | 5374 | 4C8B | 8906 | 240C | 0CFE | 2402 |
| 0000045460 | 88EF | 0A44 | FE8B | EF81 | 0734 | C781 | 0914 | DB33 |
| 0000045500 | 5C8A | A80B | 7508 | A84B | 7504 | F618 | 0105 | 4275 |
| 0000045520 | FE81 | 0740 | 0674 | FE81 | 074C | 2675 | 87F6 | 0511 |
| 0000045540 | 7440 | B91F | 0001 | 1651 | 7E8D | 5706 | 0E53 | F1E8 |
| 0000045560 | 830B | 08C4 | 01B9 | EB00 | B846 | FFFF | 4C80 | 200A |
| 0000045600 | 65EB | 1E53 | E856 | 009C | C483 | 5B04 | 44F6 | 080A |
| 0000045620 | D174 | 0C8B | 548B | 2B06 | 42CA | 1489 | 558B | 4A02 |
| 0000045640 | 5489 | E304 | 5125 | FF51 | 0874 | 74FF | 5306 | E80E |
| 0000045660 | 0BB0 | C483 | 5908 | 7CC4 | 8B06 | 0656 | 8826 | 3B15 |
| 0000045700 | 75C1 | 33B6 | 8AC0 | 0646 | 1DEB | C033 | 87F6 | 0511 |
| 0000045720 | 7420 | B9E3 | 0002 | 5051 | 5350 | E80E | 092E | C483 |
| 0000045740 | 3308 | 8BC0 | EBC8 | 5FCF | 5D5E | 00CB | 8B55 | 56EC |
| 0000045760 | 768B | 8A04 | 0A44 | 83A8 | 2674 | 08A8 | 2274 | 74FF |
| 0000046000 | FF08 | 0674 | F09A | 9453 | 8345 | 04C4 | 6480 | F70A |
| 0000046020 | C033 | 4489 | 8906 | 0844 | 0489 | 4489 | 8902 | 0444 |
| 0000046040 | 5D5E | 00C3 | 8B55 | 56EC | 768B | B804 | 0200 | 9A50 |
| 0000046060 | 53E6 | 46B7 | 8B59 | 81DE | 34EB | 8107 | 14C3 | 0B09 |
| 0000046100 | 74D2 | 800B | 0A4C | C708 | 0247 | 0200 | 0EEB | 4C80 |
| 0000046120 | 040A | 47C7 | 0102 | 8C00 | 8DDA | 0147 | 5489 | 8902 |
| 0000046140 | 8904 | 0854 | 4489 | C706 | 0444 | 0000 | 5D5E | 00C3 |
| 0000046160 | 08C8 | 0000 | 5657 | 5EC4 | 260A | 078A | 3D98 | 0077 |
| 0000046200 | 4874 | 0877 | 612C | 4C74 | 112C | 0674 | C02B | E999 |
| 0000046220 | 00CC | F62B | 46C6 | 01FC | 46C7 | 01FE | FF00 | 0A46 |
| 0000046240 | 5EC4 | 260A | 3F80 | 7400 | 835B | FE7E | 7400 | 2655 |
| 0000046260 | 078A | 3D98 | 0074 | 3474 | 0877 | 2B2C | 1C74 | 372C |
| 0000046300 | 3674 | 46C7 | 00FE | EB00 | 90D4 | 01BE | C603 | FC46 |
| 0000046320 | EB02 | 90C5 | 09BE | EB01 | 90F4 | C6F7 | 0002 | E275 |
| 0000046340 | CE83 | 8302 | FEE6 | 46C6 | 80FC | B1EB | C6F7 | C000 |
| 0000046360 | D075 | CE81 | 4000 | A5EB | C6F7 | C000 | C475 | CE81 |
| 0000046400 | 8000 | 99EB | A468 | FF01 | 0E76 | FF56 | 0876 | 76FF |
| 0000046420 | 9A06 | 502A | 46E2 | C483 | 890A | FA46 | C00B | 037D |
| 0000046440 | 69E9 | FFFF | 3206 | 8B07 | 107E | C78B | 342D | 0507 |
| 0000046460 | 0914 | 4689 | 8AF8 | FC46 | 4588 | 8B0A | F85E | 07C6 |
| 0000046500 | 2B00 | 89C0 | 0445 | 4789 | 8904 | 0245 | 0589 | 4589 |
| 0000046520 | 8908 | 0645 | 468A | 88FA | 0B45 | C78B | DA8C | 5F5E |
| 0000046540 | CBC9 | 8B55 | 56EC | 8B57 | 0476 | F8BB | 810A | 40FE |

THU MAR 14 17:48:46 1991 TSL_IF.DLL PAGE 22, LINE 1240

| | | | | | | | | |
|---|---|---|---|---|---|---|---|---|
| 0000046560 | 7407 | BB09 | 0AFC | FE81 | 074C | 5875 | FE8B | EF81 |
| 0000046600 | 0734 | C781 | 0914 | 44F6 | 0C0A | 4875 | 05F6 | 7501 |
| 0000046620 | 8B43 | 8B07 | 0257 | C88B | CA0B | 2174 | 4489 | 8906 |
| 0000046640 | 0854 | 0489 | 5489 | C702 | 0444 | 0200 | 45C7 | 0002 |
| 0000046660 | 8002 | 0A4C | C602 | 1105 | 01B8 | EB00 | 5319 | 00B8 |
| 0000046700 | 5002 | E69A | C453 | 5B47 | 0B5B | 74D2 | 8907 | 8907 |
| 0000046720 | 0257 | C8EB | C033 | 5E5F | C35D | 8B55 | 56EC | 8B57 |
| 0000046740 | 0676 | FE8B | EF81 | 0734 | C781 | 0914 | 05F6 | 7410 |
| 0000046760 | 332D | 8ADB | 0B5C | 87F6 | 0511 | 7440 | 1E21 | 0E56 |
| 0000047000 | 65E8 | 8300 | 04C4 | 7E83 | 0004 | 1274 | C033 | 0588 |
| 0000047020 | 4589 | 8902 | 8904 | 0244 | 4489 | 8906 | 0844 | 5E5F |
| 0000047040 | C35D | 04C8 | 0000 | 468B | 0B08 | 0646 | 0875 | 006A |
| 0000047060 | A7E8 | EB00 | 9031 | 468B | 2D06 | 0734 | 0CB9 | 9900 |
| 0000047100 | F9F7 | 4689 | 50FC | EBE8 | 830F | 02C4 | 76FF | FF08 |
| 0000047120 | 0676 | 189A | 5C49 | 8349 | 04C4 | 4689 | FFFE | FC76 |
| 0000047140 | DDE8 | 8B0F | FE46 | CBC9 | 02C8 | 0000 | 5657 | FF2B |
| 0000047160 | 768B | 8A06 | 0A44 | C88B | 0324 | 023C | 3F75 | C1F6 |
| 0000047200 | 7508 | 8B0D | 81DE | 34EB | F607 | 1487 | 0109 | 2D74 |
| 0000047220 | 048B | 442B | 8906 | FE46 | C00B | 217E | FF50 | 0874 |
| 0000047240 | 74FF | 8A06 | 0B4C | ED2A | 9A51 | 5212 | 49D9 | C483 |
| 0000047260 | 3908 | FE46 | 0774 | 4C80 | 200A | FFBF | 8BFF | 0644 |
| 0000047300 | 548B | 8908 | 8904 | 0254 | 44C7 | 0004 | 8B00 | 5EC7 |
| 0000047320 | C95F | 90CB | 016A | 01E8 | CB00 | 04C8 | 0000 | 5657 |
| 0000047340 | 34BE | 2B07 | 89FF | FE7E | 026A | 97E8 | 830F | 02C4 |
| 0000047360 | 11EB | 46C7 | FFFE | FFFF | FC76 | 43E8 | 830F | 02C4 |
| 0000047400 | C683 | 390C | F436 | 720A | 8B2B | 2DC6 | 0734 | 0CB9 |
| 0000047420 | 9900 | F9F7 | 4689 | 50FC | 19E8 | 830F | 02C4 | 44F6 |
| 0000047440 | 830A | D374 | 561E | 189A | 7549 | 8348 | 04C4 | 7440 |
| 0000047460 | 47C1 | C3EB | 026A | 75E8 | 830F | 02C4 | 7E83 | 0104 |
| 0000047500 | 0475 | C78B | 03EB | 468B | 5EFE | C95F | 02C2 | 9000 |
| 0000047520 | 4A68 | 4A73 | 4A89 | 4ABD | 4AE9 | 4AF1 | 4B1A | 4B4C |
| 0000047540 | 8B55 | B8EC | 0171 | E80E | F78E | 5756 | C033 | 4689 |
| 0000047560 | 88F8 | FB46 | 76C4 | 260A | 89AC | 0A76 | 4688 | 0AFE |
| 0000047600 | 74C0 | 8306 | F87E | 7D00 | 8B06 | F846 | B5E9 | BB04 |
| 0000047620 | 0B00 | 202C | 583C | 0577 | 24D7 | EB0F | B002 | B100 |
| 0000047640 | D203 | 02E0 | FB46 | FED7 | D2C1 | 88E8 | FB46 | 8B98 |
| 0000047660 | D1D8 | 2EE3 | A7FF | 4A00 | 568A | B9FE | 0001 | 36E8 |
| 0000047700 | EB04 | 33B1 | 89C0 | F046 | 4689 | 89F6 | EE46 | 46C7 |
| 0000047720 | 20FC | 4800 | 4689 | EBF4 | 8A9B | FE46 | 2D3C | 0675 |
| 0000047740 | 4E80 | 04FC | 8EEB | 2B3C | 0675 | 4E80 | 01FC | 84EB |
| 0000047760 | 203C | 0775 | 4E80 | D2FC | 79E9 | 3CFF | 7523 | 8007 |
| 0000050000 | FC4E | E980 | FF6E | 4E80 | 08FC | 67E9 | 8AFF | FE4E |
| 0000050020 | F980 | 752A | E80F | 035C | C00B | 1779 | D8F7 | 4E80 |
| 0000050040 | 04FC | 0FEB | E980 | 3230 | 8BED | F646 | 0ABB | F700 |
| 0000050060 | 03E3 | 89C1 | F646 | 3BE9 | C7FF | F446 | 0000 | 33E9 |
| 0000050100 | 8AFF | FE4E | F980 | 752A | E80C | 0328 | C00B | 1479 |
| 0000050120 | FFB8 | EBFF | 800F | 30E9 | ED32 | 468B | BBF4 | 000A |
| 0000050140 | E3F7 | C103 | 4689 | E9F4 | FF0A | 468A | 3CFE | 756C |
| 0000050160 | 8006 | FC4E | EB10 | 3C22 | 7546 | 8006 | FC4E | EB20 |
| 0000050200 | 3C18 | 754E | 8006 | FD4E | EB10 | 3C0E | 754C | 8006 |
| 0000050220 | FD4E | EB04 | 8004 | FD4E | E908 | FED8 | 468A | 3CFE |
| 0000050240 | 7564 | E903 | 0194 | 693C | 0375 | 8DE9 | 3C01 | 7575 |
| 0000050260 | E903 | 018A | 583C | 0375 | 89E9 | 3C01 | 7578 | E903 |
| 0000050300 | 0188 | 6F3C | 0375 | A2E9 | 3C01 | 7463 | 3C1A | 7473 |
| 0000050320 | 3C27 | 746E | 3C51 | 7470 | 3C60 | 7445 | 3C07 | 7447 |
| 0000050340 | E903 | 00BB | B5E9 | E800 | 028A | BE8D | FE8F | 0716 |
| 0000050360 | 4FAA | 01B9 | E900 | 01F1 | 90E8 | 0B02 | 75FF | 8C12 |
| 0000050400 | 0BC0 | 75C0 | 1E0C | BF07 | 0B59 | 0E8B | 0B5F | D8E9 |
| 0000050420 | 5701 | 4E8B | E3F4 | 3207 | F2C0 | 75AE | 4F01 | 2B59 |

THU MAR 14 17:48:46 1991 TSL_IF.DLL PAGE 23, LINE 1299

| | | | | | | | | |
|---|---|---|---|---|---|---|---|---|
| 0000050440 | 87F9 | E9CF | 01C3 | 62E8 | 8B02 | F846 | F6AB | FC46 |
| 0000050460 | 7410 | 3303 | ABC0 | 3BE9 | F6FE | FC46 | 7530 | E805 |
| 0000050500 | 0232 | 39EB | 36E8 | F602 | FD46 | 7518 | C630 | FF46 |
| 0000050520 | B907 | 0010 | 0716 | 3352 | 8DD2 | 97BE | BEFE | 0004 |
| 0000050540 | B0E8 | B902 | 0010 | BE8D | FE92 | 3358 | BED2 | 0004 |
| 0000050560 | A0E8 | C602 | 9386 | 3AFE | 09B9 | EB00 | C618 | FF46 |
| 0000050600 | B907 | 0010 | 0716 | D233 | BE8D | FE92 | 04BE | E800 |
| 0000050620 | 0281 | 04B9 | 8D00 | 8FBE | E9FE | 014D | 46FF | 80EE |
| 0000050640 | FC4E | 8A40 | FE46 | 200C | 8B98 | 83F0 | F47E | 7F00 |
| 0000050660 | 7413 | C707 | F446 | 0006 | 0AEB | 673D | 7500 | C705 |
| 0000050700 | F446 | 0001 | BE8D | FE8F | 76FF | FFEE | F476 | 1656 |
| 0000050720 | FF57 | 1076 | 76FF | F60E | FD46 | 7404 | FF0A | 881E |
| 0000050740 | 830B | 0E46 | EB0A | FF08 | 741E | 830B | 0E46 | 8308 |
| 0000050760 | 0EC4 | 46F6 | 80FC | 0F74 | 7E83 | 00F4 | 0975 | 5716 |
| 0000051000 | 1EFF | 0B80 | C483 | 8304 | 67FE | 1075 | 46F7 | 80FC |
| 0000051020 | 7500 | 1609 | FF57 | 781E | 830B | 04C4 | 0716 | 8026 |
| 0000051040 | 2D3D | 0575 | 8047 | FD4E | B901 | FFFF | B057 | F200 |
| 0000051060 | 4FAE | 2B59 | 87F9 | E9CF | 00AF | 4E80 | 40FC | 46C6 |
| 0000051100 | 0AFA | 35EB | 46C6 | 07FF | 04EB | 46C6 | 27FF | 46F6 |
| 0000051120 | 80FC | 1174 | 46C7 | 02F0 | C600 | F246 | B230 | 0251 |
| 0000051140 | FF56 | 5688 | C6F3 | FA46 | EB10 | F60E | FC46 | 7480 |
| 0000051160 | 8004 | FD4E | C602 | FA46 | F608 | FC46 | 7410 | E805 |
| 0000051200 | 00FB | 0EEB | EDE8 | F600 | FC46 | 7440 | 9903 | 02EB |
| 0000051220 | D233 | 46F6 | 40FC | 0F74 | D20B | 0B7D | 4E80 | 01FD |
| 0000051240 | D8F7 | D283 | F700 | 83DA | F47E | 7D00 | C707 | F446 |
| 0000051260 | 0001 | 04EB | 6680 | F7FC | D88B | DA0B | 0575 | 46C7 |
| 0000051300 | 00F0 | 8D00 | EB7E | 0716 | 4E8A | 32FA | 8BED | F476 |
| 0000051320 | 40E8 | F601 | FD46 | 7402 | E30E | 2606 | 3D80 | 7430 |
| 0000051340 | 4F06 | C626 | 3005 | EB41 | F600 | FC46 | 7440 | F631 |
| 0000051360 | FD46 | 7401 | C60B | F246 | C72D | F046 | 0001 | 20EB |
| 0000051400 | 46F6 | 01FC | 0B74 | 46C6 | 2BF2 | 46C7 | 01F0 | EB00 |
| 0000051420 | F60F | FC46 | 7402 | C609 | F246 | C720 | F046 | 0001 |
| 0000051440 | 468B | 2BF6 | 2BC1 | F046 | 027D | C033 | 5706 | F651 |
| 0000051460 | FC46 | 750C | 8B07 | B2C8 | E820 | 00BB | 1650 | 8D07 |
| 0000051500 | F27E | 4E8B | E8F0 | 0091 | F658 | FC46 | 7408 | F60D |
| 0000051520 | FC46 | 7504 | 8B07 | B2C8 | E830 | 009B | 5F59 | 5007 |
| 0000051540 | 76E8 | 5800 | 46F6 | 04FC | 0774 | C88B | 20B2 | 86E8 |
| 0000051560 | E900 | FC00 | 76C4 | 260E | 89AD | 0E76 | C4C3 | 0E76 |
| 0000051600 | AD26 | D08B | AD26 | 8992 | 0E76 | F6C3 | FC46 | 7420 |
| 0000051620 | E808 | FFE9 | C28E | F88B | E8C3 | FFD8 | F88B | C00B |
| 0000051640 | 0375 | C08E | 1EC3 | C307 | 0698 | C457 | 065E | FF26 |
| 0000051660 | 044F | 1078 | 8B26 | 263F | 07FF | 8E26 | 0247 | 33AA |
| 0000051700 | 5FC0 | C307 | 5251 | 5306 | 0E50 | 39E8 | 83F7 | 06C4 |
| 0000051720 | 595A | FF3D | 75FF | EBE8 | E3E8 | 8B1B | 01F7 | F84E |
| 0000051740 | 3357 | 26FF | E8AC | FFC0 | F80B | F7E2 | FF0B | 745F |
| 0000051760 | C705 | F846 | FFFF | E3C3 | 0119 | F84E | 3357 | 8AFF |
| 0000052000 | E8C2 | FFA4 | F80B | F7E2 | FF0B | 745F | C705 | F846 |
| 0000052020 | FFFF | FDC3 | 9357 | F60B | 0A7F | DB0B | 0675 | D20B |
| 0000052040 | 0275 | 1AEB | 3392 | F7D2 | 93F1 | F1F7 | 8792 | 04D3 |
| 0000052060 | 3C30 | 7639 | 0203 | FF46 | 8BAA | 4EC2 | D8EB | 2B59 |
| 0000052100 | 47CF | C3FC | 5E5F | E58B | CB5D | 06C8 | 0000 | BE56 |
| 0000052120 | 0734 | C02B | 4689 | 89FC | FA46 | 026A | 25E8 | 830A |
| 0000052140 | 02C4 | 0CEB | 76FF | E8FE | D9D6 | C483 | 8302 | 0CC6 |
| 0000052160 | 3639 | 0AF4 | 3B72 | C68B | 342D | B907 | 000C | F799 |
| 0000052200 | 89F9 | FE46 | E850 | 09AC | C483 | F602 | 0A44 | 7583 |
| 0000052220 | C7D3 | 0444 | 0000 | 44C6 | 000A | C02B | 4489 | 8908 |
| 0000052240 | 0644 | 4489 | 8902 | C604 | 0B44 | 89FF | FA76 | 5E8C |
| 0000052260 | 6AFC | E802 | 09F8 | C483 | 8B02 | FA46 | 568B | 5EFC |
| 0000052300 | CBC9 | 8B55 | 8BEC | 065E | 1E3B | 050F | 1272 | 09BA |

THU MAR 14 17:48:46 1991 TSL_IF.DLL PAGE 24, LINE 1358

| | | | | | | | | |
|---|---|---|---|---|---|---|---|---|
| 0000052320 | 3300 | E9C0 | F3F6 | E853 | 097E | C483 | E902 | F405 |
| 0000052340 | E853 | 0968 | C483 | 5302 | FF9A | 00FF | 8500 | 75C0 |
| 0000052360 | C6E5 | 1187 | 0005 | E853 | 095E | C483 | 8B02 | 5DE5 |
| 0000052400 | 00CB | 8B55 | 83EC | 02EC | C033 | 09EB | 8B55 | 83EC |
| 0000052420 | 02EC | FFB8 | 89FF | FE46 | 5E8B | 3B06 | 0F1E | 7205 |
| 0000052440 | BA19 | 0009 | C033 | A3E9 | 8BF3 | FE4E | C90B | 0774 |
| 0000052460 | E853 | 0924 | C483 | E902 | F3AB | C00B | 0774 | E853 |
| 0000052500 | 090A | C483 | [illegible]302 | 04EC | CC8B | FF53 | 0A76 | 76FF |
| 0000052520 | FF08 | 0C76 | 5116 | FF9A | 00FF | 5900 | 855A | 75C0 |
| 0000052540 | 80C8 | 11A7 | FD05 | 468B | 0BFE | 74C0 | 5307 | E7E8 |
| 0000052560 | 8308 | 02C4 | 8B91 | 5DE5 | 00CB | 8B55 | 83EC | 0EEC |
| 0000052600 | 7E&A | 8B0C | 0E46 | 4689 | EB0C | 5508 | EC8B | EC83 |
| 0000052620 | B70E | FF40 | 0876 | 76FF | 1606 | 568D | 52FE | 8D16 |
| 0000052640 | F856 | 3352 | 52D2 | 8B52 | 0C4E | 99E8 | 8B01 | 0A46 |
| 0000052660 | 00A9 | 7401 | 8008 | 10CA | 00A9 | 7504 | A92A | 0200 |
| 0000052700 | 2274 | CA80 | 5002 | 468D | FFFE | 0876 | 76FF | 1606 |
| 0000052720 | 3350 | 50C0 | 9A50 | FFFF | 0000 | C085 | 7558 | 8B08 |
| 0000052740 | FE4E | 03EB | CA80 | 5101 | 2552 | 0003 | C70A | 3350 |
| 0000052760 | 50C0 | 9A50 | FFFF | 0000 | C00B | 1674 | 6E3D | 7500 |
| 0000053000 | F60E | F0C2 | 02BA | 7400 | BA03 | 0011 | BDE9 | E9F2 |
| 0000053020 | 009D | 468B | 3BFE | 0F06 | 7205 | 500D | 999A | 004F |
| 0000053040 | BA00 | 0018 | C033 | E4EB | E850 | 0820 | C483 | 8B02 |
| 0000053060 | 50D0 | 8D16 | F45E | 1653 | 468D | 50F8 | E49A | 003F |
| 0000053100 | 0B00 | 75C0 | 8B61 | 0A46 | C933 | 00A9 | 7580 | A90E |
| 0000053120 | 4000 | 0775 | 06F6 | 0B63 | 7580 | B102 | 8880 | F24E |
| 0000053140 | 468A | 3CF4 | 7501 | C607 | F446 | E940 | 008F | 023C |
| 0000053160 | 0775 | 46C6 | 08F4 | 84E9 | 3200 | 88C0 | F446 | C90A |
| 0000053200 | F474 | 46F7 | 020A | 7400 | 5274 | FFB9 | 51FF | B951 |
| 0000053220 | 0002 | 1651 | 468D | 50FA | 079A | 0050 | 0800 | 74C0 |
| 0000053240 | 3D15 | 0083 | 0C74 | 76FF | E8FE | 07AC | C483 | E902 |
| 0000053260 | F233 | C033 | 47EB | 1652 | 468D | 50F6 | 01B8 | 5000 |
| 0000053300 | 8D16 | F846 | 9A50 | FFFF | 0000 | C00B | 1B75 | 4639 |
| 0000053320 | 74F8 | 802A | F67E | 751A | 5210 | 76FF | FFFC | FA76 |
| 0000053340 | FF9A | 00FF | 0B00 | 75C0 | 52BD | C033 | 5050 | 1650 |
| 0000053360 | 468D | 50FA | 499A | 0051 | 0B00 | 75C0 | 8AA9 | F44E |
| 0000053400 | C1F6 | 7548 | FF28 | 0876 | 76FF | 1606 | 468D | 50F8 |
| 0000053420 | C033 | 5050 | 869A | 0050 | F700 | F846 | 0001 | 0374 |
| 0000053440 | C980 | F710 | 0A46 | 0008 | 0374 | C980 | 0A20 | F24E |
| 0000053460 | C980 | 8801 | 8BC2 | 88D8 | 118F | 5305 | 19E8 | 8307 |
| 0000053500 | 02C4 | E58B | CB5D | 0AA1 | F705 | 23D0 | 33C1 | A8C9 |
| 0000053520 | 7580 | 8003 | 01C9 | 00C3 | 8B55 | 83EC | 0EEC | C033 |
| 0000053540 | 09EB | 8B55 | 83EC | 0EEC | FFB8 | 89FF | F246 | 5E8B |
| 0000053560 | 3B06 | 0F1E | 7205 | BA08 | 0009 | C033 | 4DE9 | 0BF1 |
| 0000053600 | 74C0 | 5307 | C5E8 | 8306 | 02C4 | 87F6 | 0511 | 7420 |
| 0000053620 | 5312 | C933 | 5151 | 4141 | 8D51 | F446 | 5016 | A59A |
| 0000053640 | 0051 | F600 | 1187 | 8005 | 6674 | 5E8C | 8EFA | 0A46 |
| 0000053660 | 56C5 | 3308 | 89C0 | FE46 | 4689 | FCFC | 5657 | FA8B |
| 0000053700 | F28B | 6689 | 8BF8 | 0C4E | 28E3 | 0AB0 | AEF2 | 3B75 |
| 0000053720 | EC83 | 8B02 | BADC | 0080 | E22B | D48B | FA8B | 0716 |
| 0000053740 | 4E8B | AC0C | 0A3C | 0D74 | FB3B | 1A74 | E2AA | E8F4 |
| 0000053760 | 0038 | AFE9 | B000 | 3B0D | 75FB | E803 | 002C | B0AA |
| 0000054000 | FFDA | FC46 | E2EB | 21E8 | EB00 | 5EE1 | 8E5F | FA5E |
| 0000054020 | C8E9 | 8B00 | F246 | C00B | 0974 | 76FF | E806 | 0638 |
| 0000054040 | C483 | B802 | FFFC | E80E | EECE | 5350 | 1E51 | 1F06 |
| 0000054060 | CF8B | CA2B | 21E3 | 8B51 | 065E | 1E53 | 5152 | 468D |
| 0000054100 | 16F4 | 9A50 | 4323 | 0000 | 0B59 | 75C0 | 8B11 | F45E |
| 0000054120 | 5E01 | 3BFE | 72D9 | 1F07 | 5B59 | 8B58 | C3FA | 831F |
| 0000054140 | 08C4 | 7E83 | 00FE | 3C75 | C00B | 1874 | 6D3D | 7400 |
| 0000054160 | 3D0D | 0001 | 09BA | 7500 | BA08 | 001C | 03EB | 20BA |

THU MAR 14 17:48:46 1991 TSL_IF.DLL PAGE 25, LINE 1417

| | | | | | | | | |
|---|---|---|---|---|---|---|---|---|
| 0000054200 | F900 | 26EB | 5E8E | F6FA | 1187 | 4005 | 0E74 | 5E8E |
| 0000054220 | 8B0A | 085E | 3F80 | 751A | F803 | 0EEB | 1CBA | 3300 |
| 0000054240 | F9C0 | 06EB | 468B | 2BFE | FC46 | 668B | 5EF8 | 8E5F |
| 0000054260 | FA5E | 1472 | 5E8B | 0BF2 | 74DB | FF09 | 0676 | 97E8 |
| 0000054300 | 8305 | 02C4 | E58B | CB5D | 5E8B | 0BF2 | 74DB | FF09 |
| 0000054320 | 0676 | 83E8 | 8305 | 02C4 | F1E9 | 8BEF | 0C4E | C90B |
| 0000054340 | 0475 | C18B | CEEB | C51E | 0856 | 1E53 | 5152 | 468D |
| 0000054360 | 16F4 | 9A50 | 52F4 | 0000 | 071E | 0B1F | 74C0 | 3D17 |
| 0000054400 | 006D | 0D74 | 013D | BA00 | 0009 | BC75 | 1CBA | EB00 |
| 0000054420 | BAB7 | 0020 | B2EB | 468B | 0BF4 | 75C0 | F697 | 1187 |
| 0000054440 | 4005 | 0A74 | DA8B | 8026 | 1A3F | 0275 | 86EB | 1CBA |
| 0000054460 | 3300 | EBC0 | 0093 | 0DEA | 0554 | EA49 | 542C | 53E9 |
| 0000054500 | FAEA | EE53 | EA53 | 53FA | 53F3 | 8B55 | 56EC | 76C4 |
| 0000054520 | 8C06 | E3C1 | 2605 | 4C80 | 01FE | 5D5E | 55CB | EC8B |
| 0000054540 | 096A | 1FE8 | 8305 | 02C4 | 76FF | 0E06 | 0DE8 | 5B00 |
| 0000054560 | 096A | 39E8 | 8305 | 02C4 | E58B | CB5D | 8B55 | 56EC |
| 0000054600 | 8B57 | 064E | F983 | 77E8 | 1E69 | 66A1 | 0B0B | 74C0 |
| 0000054620 | BF48 | 5514 | 368B | 0B6E | 1EC5 | 0B68 | 561E | FF57 |
| 0000054640 | 5FD7 | 735E | 8C2B | C5DA | 0C5F | D63B | EF75 | 1F58 |
| 0000054660 | C41E | 6836 | 260B | 748B | C512 | 641E | 8C0B | 3BDA |
| 0000054700 | 75D0 | 1FD9 | 811E | 90FF | 7455 | BF0E | 5590 | C4EB |
| 0000054720 | 815E | 14FF | 7455 | EB0F | 070A | BF06 | 0B64 | E1E8 |
| 0000054740 | 7201 | E80E | 007E | 891F | 6A16 | 890B | 681E | EB0B |
| 0000054760 | 1F04 | C033 | 5F99 | 5D5E | 00CB | 5706 | F88B | FB03 |
| 0000055000 | 7F89 | 4F04 | 2D4F | 0016 | 778D | C714 | FE05 | 89FF |
| 0000055020 | 0A7F | 8948 | 8C04 | 8B1F | 8CC6 | 8EDA | 8DC2 | 067F |
| 0000055040 | ABFC | 47AB | 3347 | ABC0 | ABAB | 5FAB | C307 | 8B26 |
| 0000055060 | 0245 | C00B | 0975 | 8C26 | 025D | 8926 | EB1D | 0614 |
| 0000055100 | C426 | 0875 | 8C26 | 0E5C | 8926 | 0C5C | 478C | 8912 |
| 0000055120 | 1077 | 2607 | 5D8C | 260A | 5D89 | 2608 | 5D8C | 2606 |
| 0000055140 | 5D89 | C304 | 8041 | FEE1 | FC53 | 778B | 8B08 | 0A5F |
| 0000055160 | FF33 | 23EB | C38B | A85B | 7501 | 5342 | 778B | 8B06 |
| 0000055200 | 085F | DE3B | 3674 | 334B | EBFF | 900C | 548D | 3BFE |
| 0000055220 | 73D3 | 03E1 | 72F0 | AD23 | 01A8 | F074 | FE8B | 3B48 |
| 0000055240 | 73C1 | 0323 | 72F0 | 8B13 | ADD0 | 01A8 | DE74 | C203 |
| 0000055260 | 0205 | 8B00 | 89F7 | FE44 | E4EB | C08B | 8B5B | 0647 |
| 0000055300 | 4789 | F908 | 19EB | 895B | FE4C | 0974 | F903 | C12B |
| 0000055320 | 8948 | 2B05 | 03F9 | 89F9 | 087F | C68B | DA8C | C3F8 |
| 0000055340 | 5751 | 47F6 | 0102 | 6674 | B7E8 | 8B00 | 8BFE | A804 |
| 0000055360 | 7401 | 2B03 | 49C8 | 4141 | 778B | 0B04 | 74F6 | 034F |
| 0000055400 | 73CE | 3309 | BAC0 | FFF0 | 33E3 | 42EB | D0B8 | 8E42 |
| 0000055420 | 26C0 | 72A1 | 3D0B | 2000 | 1674 | 00BA | 3B80 | 72D0 |
| 0000055440 | D106 | 75EA | EBF8 | 8322 | 08FA | 1D72 | E2D1 | C28B |
| 0000055460 | 8B48 | 03D0 | 73C1 | 3302 | F7C0 | 23D2 | 52C2 | 2EE8 |
| 0000055500 | 5A00 | 0D73 | FA83 | 74F0 | B805 | 0010 | E2EB | EBF9 |
| 0000055520 | 8B1B | 2BD0 | 0457 | 4789 | 8904 | 087F | 778B | 4A0A |
| 0000055540 | 1489 | 0342 | C7F2 | FE04 | 89FF | 0A77 | 595F | 8BC3 |
| 0000055560 | F6D0 | 0247 | 7404 | 4A0F | 778B | 4E04 | D63B | 0572 |
| 0000055600 | 5739 | 73FE | 4218 | 1E50 | 279A | 003F | 0B00 | 75C0 |
| 0000055620 | 8B0F | F6C2 | 0247 | 7404 | 4A04 | 5789 | F8FE | 01EB |
| 0000055640 | C3F9 | 8B57 | 0877 | 773B | 750A | 8B03 | 0677 | 3DAD |
| 0000055660 | FFFE | 0874 | FE8B | FE24 | F003 | F2EB | 4F4F | F78B |
| 0000055700 | C35F | D18B | C283 | 8027 | F0E2 | 8B50 | 52C4 | 5016 |
| 0000055720 | C033 | 9A50 | FFFF | 0000 | 0B1F | 75C0 | 3314 | 26DB |
| 0000055740 | 458B | 890C | 0247 | C28B | 0FE8 | E8FE | FE40 | EBF8 |
| 0000055760 | F901 | 00C3 | 8B55 | 8BEC | 8BD7 | 1EDE | 7EC4 | 3306 |
| 0000056000 | B9C0 | FFFF | AEF2 | 758D | C4FF | 0A7E | FFB9 | F2FF |
| 0000056020 | F7AE | 2BD1 | 8CF9 | 8EC0 | 8ED8 | 0846 | FE87 | 468B |
| 0000056040 | F706 | 01C6 | 7400 | A402 | D149 | F3E9 | 13A5 | F3C9 |

THU MAR 14 17:48:46 1991 TSL_IF.DLL PAGE 26, LINE 1476

| | | | | | | | | |
|---|---|---|---|---|---|---|---|---|
| 0000056060 | 8BA4 | 8BF3 | 1FFA | C28C | CB5D | 8B55 | 8BEC | 8BD7 |
| 0000056100 | 1EDE | 76C5 | 8B0A | 8CFE | 8ED8 | 33C0 | B9C0 | FFFF |
| 0000056120 | AEF2 | D1F7 | 7EC4 | 8B06 | A8C7 | 7401 | A402 | D149 |
| 0000056140 | F3E9 | 13A5 | F3C9 | 8BA4 | 8BF3 | 1FFA | C28C | CB5D |
| 0000056160 | 8B55 | 8BEC | 8BD7 | 1EDE | 76C5 | C406 | 0A7E | C033 |
| 0000056200 | FFB9 | F2FF | F7AE | 2BD1 | F3F9 | 74A6 | 1B05 | 1DC0 |
| 0000056220 | FFFF | 8B1F | 8BF3 | 5DFA | 00CB | 8B55 | 8BEC | C4D7 |
| 0000056240 | 067E | C033 | FFB9 | F2FF | F7AE | 49D1 | 8B91 | 5DFA |
| 0000056260 | 00CB | 8B55 | 57EC | 1E56 | 7EC4 | C506 | 0A76 | DF8B |
| 0000056300 | 4E8B | E30E | AC0C | C00A | 0374 | E2AA | 32F8 | F3C0 |
| 0000056320 | 8BAA | 8CC3 | 1FC2 | 5F5E | E58B | CB5D | 8B55 | 57EC |
| 0000056340 | 1E56 | 4E8B | E30E | 8B27 | C4D9 | 067E | F78B | C033 |
| 0000056360 | AEF2 | D9F7 | CB03 | FE8B | 76C5 | F30A | 8AA6 | FF44 |
| 0000056400 | C933 | 3A26 | FF45 | 0477 | 0474 | 4949 | D1F7 | C18B |
| 0000056420 | 5E1F | 8B5F | 5DE5 | 00CB | 01E9 | 0000 | 8B55 | 57EC |
| 0000056440 | 1E56 | 76C5 | 3306 | 99C0 | DB33 | 3CAC | 7420 | 3CFB |
| 0000056460 | 7409 | 50F7 | 2D3C | 0474 | 2B3C | 0175 | 3CAC | 7739 |
| 0000056500 | 2C1F | 7230 | D11B | D1E3 | 8BD2 | 8BCB | D1FA | D1E3 |
| 0000056520 | D1D2 | D1E3 | 03D2 | 13D9 | 03D7 | 83D8 | 00D2 | DCEB |
| 0000056540 | 3C58 | 932D | 0775 | D8F7 | D283 | F700 | 1FDA | 5F5E |
| 0000056560 | CB5D | 8B55 | 56EC | B357 | 8B01 | 0C4E | 468B | 3306 |
| 0000056600 | 83D2 | 0AF9 | 0175 | 1E99 | 7EC5 | E908 | 0737 | 04C8 |
| 0000056620 | 0000 | A156 | 0717 | 168B | 0719 | 4689 | 89FC | FE56 |
| 0000056640 | 0C6A | DFE8 | 8300 | 02C4 | 468B | 0BFE | FC46 | 7674 |
| 0000056660 | 468B | 0B08 | 0646 | 6E74 | 76FF | FF08 | 0676 | 4A9A |
| 0000056700 | 8E57 | 8358 | 04C4 | F08B | 5EC4 | 26FC | 478B | 2602 |
| 0000056720 | 070B | 5274 | FF26 | 0277 | FF26 | 9A37 | 574A | 58AF |
| 0000056740 | C483 | 3B04 | 7EC6 | C439 | FC5E | C426 | 261F | 3880 |
| 0000056760 | 753D | 562D | 76FF | FF08 | 0676 | 5306 | 8C9A | F857 |
| 0000057000 | 8353 | 0AC4 | C00B | 1875 | 0C6A | A1E8 | 8300 | 02C4 |
| 0000057020 | 5EC4 | 26FC | 078B | 8B26 | 0257 | C603 | EB40 | 9012 |
| 0000057040 | 4683 | 04FC | A2EB | 0C6A | 83E8 | 8300 | 02C4 | C02B |
| 0000057060 | 5E99 | CBC9 | 8B55 | 50EC | 468B | 0504 | 0014 | 4BEB |
| 0000057100 | 8B55 | 50EC | 468B | 0504 | 0014 | 69EB | 8B55 | 50EC |
| 0000057120 | 468B | 0504 | 0114 | 33EB | 8B55 | 50EC | 468B | 0504 |
| 0000057140 | 0114 | 51EB | 8B55 | 50EC | 468B | C104 | 02E0 | FF68 |
| 0000057160 | 50FF | FF6A | FF6A | FF9A | 00FF | 0B00 | 75C0 | 5829 |
| 0000057200 | E58B | C35D | 8B55 | 50EC | 468B | FF04 | 9406 | C10C |
| 0000057220 | 02E0 | 1F68 | 5059 | FF6A | FF6A | FF9A | 00FF | 0B00 |
| 0000057240 | 75C0 | 5805 | E58B | C35D | 11B8 | E900 | E611 | 8B55 |
| 0000057260 | 50EC | 468B | C104 | 02E0 | 4368 | 5059 | FF9A | 00FF |
| 0000057300 | 0B00 | 75C0 | FFE3 | 940E | 580C | E58B | C35D | 8B55 |
| 0000057320 | FFEC | 0676 | ADE8 | 83FF | 02C4 | E58B | CB5D | 8B55 |
| 0000057340 | FFEC | 0676 | C7E8 | 83FF | 02C4 | E58B | CB5D | 068E |
| 0000057360 | 04D0 | A126 | 0006 | 3B48 | 9606 | 770C | C107 | 06E0 |
| 0000057400 | FFBA | C3FF | 5357 | 6A51 | E80F | FF78 | C483 | 3B02 |
| 0000057420 | 9606 | 760C | 8B40 | 05D8 | 0004 | FC25 | 8BFF | C1C8 |
| 0000057440 | 06E0 | B1BA | 5059 | 9A52 | 5639 | 0000 | C00B | 3275 |
| 0000057460 | 8B49 | 87F9 | 963E | 2B0C | 51CF | C147 | 06E7 | E1C1 |
| 0000057500 | 5705 | C28E | ABF3 | 595F | C726 | 0445 | 0200 | C783 |
| 0000057520 | E240 | 8BF5 | 6AC3 | E80F | FF54 | C483 | 5902 | 5F5B |
| 0000057540 | 9BEB | 10B8 | E900 | E557 | 04C8 | 0000 | 5657 | 126A |
| 0000057560 | 11E8 | 83FF | 02C4 | 06C6 | 0FEE | 8B42 | 0646 | 568B |
| 0000057600 | A308 | 0FEA | 1689 | 0FEC | E4BE | 890F | 8904 | 0254 |
| 0000057620 | 06C7 | 0FE8 | 7FFF | 468D | 160E | FF50 | 0C76 | 76FF |
| 0000057640 | 1E0A | 9A56 | 4A1D | 5A79 | C483 | 8B0C | FFF8 | E80E |
| 0000057660 | 780F | C40F | E41E | FF0F | E406 | 260F | 07C6 | E800 |
| 0000057700 | 900D | 561E | 006A | B69A | 7145 | 8358 | 06C4 | 126A |
| 0000057720 | DBE8 | 83FE | 02C4 | C78B | 5F5E | CBC9 | 8B55 | 6AEC |

THU MAR 14 17:48:46 1991 TSL_IF.DLL PAGE 27, LINE 1535

| | | | | | | | | |
|---|---|---|---|---|---|---|---|---|
| 0000057740 | E809 | FEA0 | C483 | FF02 | 0A76 | 76FF | FF08 | 0676 |
| 0000057760 | E80E | 000F | C483 | 6A06 | E809 | FEB2 | C483 | 8B02 |
| 0000060000 | 5DE5 | 55CB | EC8B | 5756 | 8B1E | 0656 | F28B | 468B |
| 0000060020 | 8B08 | 0A4E | D00B | 5374 | 59E3 | DF8C | 64BB | 510B |
| 0000060040 | 67E8 | 5901 | 5B72 | 74FF | 51FE | 67E8 | 5900 | 0B72 |
| 0000060060 | C68B | DA8C | 6480 | FEFE | EB59 | 1E49 | 8E53 | 51DF |
| 0000060100 | E80E | F938 | 5B59 | 591F | E180 | 57FE | F88B | C20B |
| 0000060120 | 7458 | 8E2B | FCC2 | 5706 | 561E | E9D1 | A5F3 | D88E |
| 0000060140 | E80E | F8E6 | C483 | 5804 | EB5A | 5119 | E80E | F90C |
| 0000060160 | EB59 | 5011 | 0E56 | D1E8 | 83F8 | 04C4 | 03EB | 13E8 |
| 0000060200 | 3300 | 99C0 | 5F1F | 5D5E | 00CB | 8CEA | 565A | EA5A |
| 0000060220 | 5AB3 | 5B3D | 8B55 | 83EC | 02EC | 5756 | C7FC | FE46 |
| 0000060240 | 0000 | 7441 | 8005 | FEE1 | 01EB | 4E49 | 8B4E | ADFE |
| 0000060260 | 2450 | 89FE | 8B05 | 3BD0 | 73D1 | 0368 | 72F0 | AD5A |
| 0000060300 | 01A8 | 0874 | D003 | 8942 | 4815 | EBEB | FE3D | 75FF |
| 0000060320 | F641 | 0247 | 7401 | 8D3B | 0445 | C103 | 0773 | 46C7 |
| 0000060340 | 01FE | 2B00 | FFC8 | 3B05 | 087F | 0373 | 7F89 | 5208 |
| 0000060360 | E856 | F9EC | 5A5E | 1173 | 46C7 | 01FE | 8300 | 10F9 |
| 0000060400 | 1072 | E9D1 | D183 | EB00 | FFE6 | 8D0D | 0275 | C28B |
| 0000060420 | A5EB | 01B8 | 4E00 | EB4E | 5A23 | EBF9 | 4639 | 0346 |
| 0000060440 | EBF1 | 8B19 | FE46 | F78B | F374 | C00B | 0E75 | 0D89 |
| 0000060460 | 4646 | F103 | E372 | D12B | 894A | 4A14 | 9159 | 0125 |
| 0000060500 | 8300 | FE25 | 0509 | 578B | 3B08 | 73FA | 3B07 | 76F2 |
| 0000060520 | 8903 | 087F | D9F7 | 5E5F | E58B | C35D | 8B55 | 57EC |
| 0000060540 | 468B | F706 | 0866 | 0573 | C033 | EB99 | 501A | E69A |
| 0000060560 | 4253 | 595B | D88B | DA0B | 0D74 | 8B50 | 8EF8 | 33C2 |
| 0000060600 | 41C0 | E9D1 | ABF3 | 5F58 | CB5D | 473B | 7506 | C505 |
| 0000060620 | 045F | 19EB | 531E | 1FC5 | 08EB | 1F5B | EBF9 | C50F |
| 0000060640 | 0C5F | D98C | F4E3 | C13B | F575 | C483 | F804 | 00C3 |
| 0000060660 | 8B55 | 83EC | 0CEC | 468D | 16F4 | 9A50 | FFFF | 0000 |
| 0000060700 | 00B4 | 468A | 50F6 | 468A | 50F5 | 468A | 50F4 | 468A |
| 0000060720 | 50F8 | 468A | 50F9 | 468B | 2DFA | 07BC | 9A50 | 5E72 |
| 0000060740 | 5C21 | C483 | 830C | 087E | 7400 | C40A | 065E | 8926 |
| 0000060760 | 0257 | 8926 | 8B07 | 5DE5 | 00CB | 0B6A | 85E8 | 83FC |
| 0000061000 | 02C4 | 3E83 | 0FF0 | 7500 | E807 | 0022 | 06FF | 0FF0 |
| 0000061020 | 0B6A | 99E8 | 83FC | 02C4 | 90CB | 0B6A | 65E8 | 83FC |
| 0000061040 | 02C4 | 09E8 | 6A00 | E80B | FC84 | C483 | CB02 | 04C8 |
| 0000061060 | 0000 | 1E56 | CC68 | 9A0C | 583E | 5D17 | C483 | 8904 |
| 0000061100 | FC46 | 5689 | 0BFE | 75D0 | E903 | 00A4 | 5EC4 | 26FC |
| 0000061120 | 3F80 | 7500 | E903 | 0098 | 036A | 5006 | 36FF | 0CE0 |
| 0000061140 | 36FF | 0CDE | 629A | 2E57 | 835D | 0AC4 | 006A | 1068 |
| 0000061160 | 830E | FC46 | FFD3 | FE76 | 76FF | 9AFC | 57C8 | 5D38 |
| 0000061200 | C483 | 5204 | 9A50 | 6184 | 5D83 | D8A3 | 890C | DA16 |
| 0000061220 | 2B0C | 8EF6 | FE46 | 5E8B | 26FC | 3880 | 7400 | 261A |
| 0000061240 | 008A | C88B | 8B98 | F6D8 | 9387 | 040B | 0575 | F980 |
| 0000061260 | 752D | 4606 | FE83 | 7C03 | 8BDD | FC5E | 8026 | 0038 |
| 0000061300 | 1874 | 036A | DE03 | 5306 | 36FF | 0CE4 | 36FF | 0CE2 |
| 0000061320 | 629A | 9057 | 835C | 0AC4 | 08EB | 1EC4 | 0CE2 | C626 |
| 0000061340 | 0007 | 1EC4 | 0CE2 | 8026 | 013F | C01B | A340 | 0CDC |
| 0000061360 | C95E | 90C3 | 04C8 | 0000 | C456 | 065E | 8326 | 087F |
| 0000061400 | 7D03 | E903 | 00B6 | 8326 | 087F | 7E09 | E903 | 00AC |
| 0000061420 | 8326 | 087F | 7E03 | 260A | 7F83 | 0908 | 037D | 81E9 |
| 0000061440 | 2600 | 778B | 810A | 6CC6 | 8107 | C2FE | 7E07 | 2617 |
| 0000061460 | 7F83 | 0308 | 1075 | 8B26 | 085F | E3D1 | 878B | 0CB2 |
| 0000061500 | 0705 | EB00 | 900B | 8B26 | 085F | E3D1 | 878B | 0CB4 |
| 0000061520 | 4689 | F7FC | 03C6 | 7500 | FF03 | FC46 | 5E8B | 2606 |
| 0000061540 | 778B | 830A | 46EE | 448D | 9901 | C233 | C22B | F8C1 |
| 0000061560 | 3302 | 2BC2 | 69C2 | 6DCE | 0301 | 03C1 | FC46 | 0405 |
| 0000061600 | B900 | 0007 | F799 | 2BF9 | FC56 | DAF7 | 8326 | 087F |

THU MAR 14 17:48:46 1991 TSL_IF.DLL PAGE 28, LINE 1594

| | | | | | | | | |
|---|---|---|---|---|---|---|---|---|
| 0000061620 | 7503 | 2615 | 573B | 7C0E | 7509 | 2621 | 7F83 | 0204 |
| 0000061640 | 1A7C | 01B8 | EB00 | 9017 | 5EC4 | 8B06 | 26C2 | 4739 |
| 0000061660 | 7C0E | 75EF | 2607 | 7F83 | 0104 | E67C | C02B | C95E |
| 0000061700 | 90CB | 16C8 | 0000 | 5657 | 768B | 6A06 | 6801 | 5180 |
| 0000061720 | 448D | 9903 | C233 | C22B | F8C1 | 3302 | 2BC2 | 99C2 |
| 0000061740 | 5052 | 849A | C461 | 895E | EA46 | 5689 | 8BEC | 085E |
| 0000061760 | E3D1 | BF8B | 0CB0 | C68B | 04B9 | 9900 | F9F7 | D20B |
| 0000062000 | 0775 | 7E83 | 0208 | 017E | 8B47 | 0A46 | C703 | 4689 |
| 0000062020 | 9AFC | 5CAA | 5EE7 | 006A | 3C6A | 006A | 3C6A | 006A |
| 0000062040 | 186A | C669 | 016D | 4603 | 030A | 99C7 | 4405 | 830E |
| 0000062060 | 00D2 | 5052 | 849A | FA61 | 8B5E | 8BC8 | 0C46 | DA8B |
| 0000062100 | 0399 | 13C1 | 52D3 | 9A50 | 6184 | 5F0D | C88B | 468B |
| 0000062120 | 8B0E | 99DA | C103 | D313 | 5052 | 849A | 4B61 | 8B5F |
| 0000062140 | 8BC8 | 1046 | DA8B | D399 | 13C1 | 03D3 | D806 | 130C |
| 0000062160 | DA16 | 010C | EA46 | 5611 | 8DEC | 5044 | 4689 | 8BF8 |
| 0000062200 | 0846 | 8948 | F646 | 468B | 890C | F246 | 3E83 | 0CDC |
| 0000062220 | 7400 | 8D1A | EE46 | 5016 | A49A | EA5D | 835C | 04C4 |
| 0000062240 | C00B | 0974 | 6E81 | 10EA | 830E | EC5E | 8B00 | EA46 |
| 0000062260 | 568B | 5EEC | C95F | 90CB | 4E8B | 8B0E | 0646 | 568B |
| 0000062300 | 1E08 | 7EC5 | 570A | 071E | 93FC | C00A | 1374 | F983 |
| 0000062320 | 750A | 0B0E | 79D2 | B00A | AA2D | DBF7 | D283 | F700 |
| 0000062340 | 8BDA | 92F7 | D233 | C00B | 0274 | F1F7 | F793 | 92F1 |
| 0000062360 | D387 | 3004 | 393C | 0276 | 2704 | 8BAA | 0BC2 | 75C3 |
| 0000062400 | 88E2 | 4F05 | 86AC | 8805 | FF44 | 448D | 3B01 | 72C7 |
| 0000062420 | 8CF2 | 58DA | 5F1F | 8B5E | 5DE5 | 00CB | 8B55 | 83EC |
| 0000062440 | 02EC | 5756 | 01B2 | 0AEB | 8B55 | 83EC | 02EC | 5756 |
| 0000062460 | D232 | 5688 | C4FF | 0676 | AC26 | 203C | FA74 | 0D3C |
| 0000062500 | 0677 | 093C | 0272 | F0EB | 2B3C | 0874 | 2D3C | 0675 |
| 0000062520 | 4E80 | 02FF | AC26 | 4E8B | E30E | 830D | 01F9 | 0574 |
| 0000062540 | F983 | 7624 | E91E | 0099 | 0AB9 | 3C00 | 7530 | 2614 |
| 0000062560 | 3C80 | 7478 | 260B | 3C80 | 7458 | B905 | 0008 | 03EB |
| 0000062600 | 10B9 | 8900 | 0E4E | F983 | 7510 | 3C13 | 7530 | 260F |
| 0000062620 | 3C80 | 7478 | 2606 | 3C80 | 7558 | 4603 | AC26 | D233 |
| 0000062640 | DB33 | A3E8 | 7200 | 8B63 | 0E4E | C13B | 5C73 | 4E80 |
| 0000062660 | 08FF | F88B | C28B | E1F7 | 0473 | 4E80 | 04FF | 8B50 |
| 0000062700 | F7C3 | 59E1 | D103 | 0473 | 4E80 | 04FF | C703 | D283 |
| 0000062720 | 7300 | 8004 | FF4E | 8B04 | 26D8 | EBAC | 06C5 | 0DE8 |
| 0000062740 | 8BF9 | 8ED8 | 26C2 | D7C7 | D022 | BA07 | 7FFF | FFBB |
| 0000062760 | F6FF | FF46 | 7401 | 812A | 00CA | 8080 | FF66 | EBFD |
| 0000063000 | 8B20 | 0676 | DB33 | D233 | 17EB | F64E | FF46 | 7408 |
| 0000063020 | F6FD | FF46 | 7504 | F6C6 | FF46 | 7501 | 0B04 | 78D2 |
| 0000063040 | 8CBC | C4C0 | 0A7E | C18C | CF0B | 0774 | 8926 | 0245 |
| 0000063060 | 8926 | 8B35 | F6C3 | FF46 | 7402 | F707 | 83D8 | 00D2 |
| 0000063100 | DAF7 | 5E5F | E58B | CB5D | 613C | 0272 | DF24 | 302C |
| 0000063120 | 0D72 | 0A3C | 0872 | 113C | 0572 | 072C | 243C | 98F5 |
| 0000063140 | 00C3 | C58B | EC8B | DA8C | 5EC5 | 8904 | 8907 | 027F |
| 0000063160 | 7789 | 8904 | 0667 | 4E8B | 8900 | 084F | 4E8B | 8902 |
| 0000063200 | CA4F | 5739 | 8E0C | 8BDA | 33E8 | CBC0 | EC8B | 468B |
| 0000063220 | 0B08 | 75C0 | 4001 | 5EC5 | 8B04 | 027F | 778B | 8B04 |
| 0000063240 | 0667 | EC8B | 4F8B | 8908 | 004E | 4F8B | 890A | 024E |
| 0000063260 | 2F8B | 5F8E | CB0C | 8B55 | FFEC | 0876 | 76FF | 3306 |
| 0000063300 | 50C0 | 9A50 | FFFF | 0000 | C085 | 0374 | 16E9 | 8BE2 |
| 0000063320 | 5DE5 | 00CB | 8B55 | 8BEC | 0846 | 4E8B | 0B0C | 8BC8 |
| 0000063340 | 0A4E | 0975 | 468B | F706 | 5DE1 | 08CA | 5300 | E1F7 |
| 0000063360 | D88B | 468B | F706 | 0C66 | D803 | 468B | F706 | 03E1 |
| 0000063400 | 5BD3 | CA5D | 4A08 | 0300 | 4101 | 051F | 5900 | 0200 |
| 0000063420 | 9500 | 015E | 0000 | 0300 | 5202 | 022A | 7400 | 0300 |
| 0000063440 | B101 | 0820 | 4500 | 0300 | 8501 | 050A | 6000 | 0200 |
| 0000063460 | D300 | 0259 | 0000 | 0300 | 3701 | 0823 | 4900 | 0300 |

THU MAR 14 17:48:46 1991 TSL_IF.DLL PAGE 29, LINE 1653

| | | | | | | | | |
|---|---|---|---|---|---|---|---|---|
| 0000063500 | E701 | 050F | 6300 | 0200 | 6900 | 0359 | 0000 | 0300 |
| 0000063520 | E601 | 0140 | 0500 | 0300 | 7E01 | 0140 | 0700 | 0200 |
| 0000063540 | 2600 | 043C | 0000 | 0300 | 0A01 | 013F | 0800 | 0300 |
| 0000063560 | 1401 | 0510 | 6900 | 0300 | 7601 | 0151 | 8900 | 0300 |
| 0000063600 | A401 | 0153 | 8A00 | 0200 | BD00 | 0555 | 0000 | 0300 |
| 0000063620 | 4B01 | 0159 | 8C00 | 0300 | 6D01 | 0159 | 8D00 | 0300 |
| 0000063640 | 2701 | 0159 | 8E00 | 0300 | 1B01 | 0324 | 0200 | 0300 |
| 0000063660 | 0501 | 0301 | 0400 | 0300 | EB01 | 030A | 0700 | 0300 |
| 0000063700 | 5001 | 043A | 0100 | 0300 | C801 | 0435 | 0300 | 0300 |
| 0000063720 | 2401 | 040C | 0400 | 0300 | 8701 | 0435 | 0600 | 0300 |
| 0000063740 | 5801 | 0435 | 0800 | 0300 | 1E01 | 0507 | 0100 | 0300 |
| 0000063760 | 6C01 | 015C | 2100 | 0300 | 5901 | 040C | 0A00 | 0300 |
| 0000064000 | 8401 | 0156 | 2200 | 0300 | E601 | 0517 | 0400 | 0300 |
| 0000064020 | D801 | 0159 | 2600 | 0300 | B601 | 0435 | 0F00 | 0200 |
| 0000064040 | 2402 | 021F | 2D00 | 0300 | BD01 | 0718 | 0100 | 0300 |
| 0000064060 | 2C01 | 0607 | 0F00 | 0300 | 1101 | 050F | 1900 | 0300 |
| 0000064100 | 8101 | 0813 | 0200 | 0300 | 4F01 | 0152 | 3A00 | 0300 |
| 0000064120 | CD01 | 0150 | 3B00 | 0300 | 7401 | 0161 | 3C00 | 0300 |
| 0000064140 | 9D02 | 022A | 3700 | 0300 | 9101 | 0151 | 4400 | 0300 |
| 0000064160 | 8601 | 0518 | 2500 | 0300 | 3501 | 050B | 2600 | 0300 |
| 0000064200 | A401 | 0150 | 4600 | 0500 | 3B02 | 022A | 1100 | 0300 |
| 0000064220 | C501 | 0151 | 4B00 | 0300 | 2E01 | 0516 | 2C00 | 0300 |
| 0000064240 | 2101 | 053E | 2D00 | 0300 | ED01 | 0150 | 4D00 | 0300 |
| 0000064260 | 8401 | 051D | 2E00 | 0300 | E502 | 0227 | 4600 | 0300 |
| 0000064300 | 0F01 | 0821 | 1800 | 0300 | 8101 | 050F | 3200 | 0300 |
| 0000064320 | CA01 | 050B | 3700 | 0500 | 6802 | 022A | 1F00 | 0300 |
| 0000064340 | AC01 | 050B | 3B00 | 0300 | 5B01 | 013F | 5B00 | 0300 |
| 0000064360 | 6E01 | 053D | 3C00 | 0300 | E902 | 0229 | 5600 | 0300 |
| 0000064400 | 8701 | 050D | 4000 | 0300 | 2801 | 051C | 4100 | 0300 |
| 0000064420 | AF01 | 0821 | 2A00 | 0300 | 8801 | 050B | 4300 | 0500 |
| 0000064440 | 2702 | 021F | 2D00 | 0300 | 8801 | 0524 | 4600 | 0300 |
| 0000064460 | 6501 | 0524 | 4A00 | 0300 | 2A02 | 021F | 6500 | 0300 |
| 0000064500 | B301 | 050F | 5000 | 0300 | 3C01 | 0822 | 3900 | 0300 |
| 0000064520 | FA01 | 051B | 5700 | 0000 | 0000 | 0000 | 0000 | 0000 |
| 0000064540 | 0000 | 0000 | 0200 | 0000 | 0000 | 0000 | 0000 | 0000 |
| 0000064560 | 0000 | 0000 | 0000 | 0000 | 0000 | 0000 | 0000 | 0000 |
| * | | | | | | | | |
| 0000064640 | 0000 | 0000 | 0200 | 0000 | 0000 | 0000 | 0000 | 0000 |
| 0000064660 | 0000 | 0000 | 0000 | 0000 | 0000 | 0000 | 0000 | 0000 |
| * | | | | | | | | |
| 0000064740 | 0000 | 0000 | 0200 | 0000 | 0000 | 0000 | 0000 | 0000 |
| 0000064760 | 0000 | 0000 | 0000 | 0000 | 0000 | 0000 | 0000 | 0000 |
| * | | | | | | | | |
| 0000065040 | 0000 | 0000 | 0200 | 0000 | 0000 | 0000 | 0000 | 0000 |
| 0000065060 | 0000 | 0000 | 0000 | 0000 | 534D | 5220 | 6E75 | 542D |
| 0000065100 | 6D69 | 2065 | 694C | 7262 | 7261 | 2079 | 202D | 6F43 |
| 0000065120 | 7970 | 6972 | 6867 | 2074 | 6328 | 2029 | 3931 | 3039 |
| 0000065140 | 202C | 694D | 7263 | 736F | 666F | 2074 | 6F43 | 7072 |
| 0000065160 | 0018 | 0000 | 0001 | 03E8 | 000A | 000A | 0BB8 | 0001 |
| 0000065200 | 0001 | 0000 | 0000 | 0001 | 0064 | 000A | 0000 | 0BB8 |
| 0000065220 | 0BB8 | 0BB8 | 0000 | 0001 | 3A69 | 745C | 3231 | 5C33 |
| 0000065240 | 6164 | 5C74 | 6573 | 7574 | 5C70 | 6370 | 7375 | 6B2E |
| 0000065260 | 6462 | 4100 | 7070 | 696C | 6163 | 6974 | 6E6F | 5500 |
| 0000065300 | 6573 | 0072 | 3154 | 3332 | 535F | 4145 | 4352 | 5F48 |
| 0000065320 | 4150 | 4854 | 5400 | 3231 | 5F33 | 4E49 | 5F50 | 424B |
| 0000065340 | 5F44 | 414E | 454D | 5400 | 3231 | 5F33 | 4F4E | 4853 |
| 0000065360 | 5455 | 2500 | 5C73 | 7325 | 5400 | 3231 | 5F33 | 4954 |
| 0000065400 | 454D | 555F | 494E | 0054 | 3154 | 3332 | 4D5F | 4E49 |
| 0000065420 | 525F | 4345 | 524F | 5F44 | 4954 | 454D | 5400 | 3231 |

THU MAR 14 17:48:46 1991 TSL_IF.DLL PAGE 30, LINE 1712

| | | | | | | | | |
|---|---|---|---|---|---|---|---|---|
| 0000065440 | 5F33 | 5453 | 4241 | 4C49 | 5449 | 0059 | 3154 | 3332 |
| 0000065460 | 435F | 5041 | 5554 | 4552 | 545F | 4D49 | 4F45 | 5455 |
| 0000065500 | 5400 | 3231 | 5F33 | 454B | 5F59 | 4445 | 5449 | 4E49 |
| 0000065520 | 0047 | 3154 | 3332 | 435F | 4E4F | 4954 | 554E | 554F |
| 0000065540 | 5F53 | 5254 | 4341 | 494B | 474E | 5400 | 3231 | 5F33 |
| 0000065560 | 4F4D | 5355 | 5F45 | 5254 | 4341 | 494B | 474E | 5400 |
| 0000065600 | 3231 | 5F33 | 4143 | 5450 | 5255 | 5F45 | 4953 | 0047 |
| 0000065620 | 3154 | 3332 | 485F | 544F | 454B | 5F59 | 5953 | 434E |
| 0000065640 | 5400 | 3231 | 5F33 | 4544 | 4146 | 4C55 | 5F54 | 4954 |
| 0000065660 | 454D | 5400 | 3231 | 5F33 | 414D | 5F58 | 4544 | 414C |
| 0000065700 | 0059 | 3154 | 3332 | 465F | 5341 | 5F54 | 4552 | 4C50 |
| 0000065720 | 5941 | 5400 | 3231 | 5F33 | 4556 | 4952 | 5946 | 545F |
| 0000065740 | 4D49 | 4F45 | 5455 | 5400 | 3231 | 5F33 | 4157 | 5449 |
| 0000065760 | 545F | 4D49 | 4F45 | 5455 | 5400 | 3231 | 5F33 | 5953 |
| 0000066000 | 434E | 545F | 4D49 | 4F45 | 5455 | 5400 | 3231 | 5F33 |
| 0000066020 | 4854 | 4552 | 4853 | 4C4F | 0044 | 3154 | 3332 | 435F |
| 0000066040 | 4548 | 4B43 | 4C5F | 4F4F | 554B | 0050 | 3154 | 3332 |
| 0000066060 | 495F | 504E | 4D5F | 454B | 5F59 | 5250 | 5345 | 5F53 |
| 0000066100 | 5349 | 315F | 5400 | 3231 | 5F33 | 4E49 | 5F50 | 4552 |
| 0000066120 | 454C | 5341 | 4445 | 4D5F | 454B | 5359 | 5400 | 3231 |
| 0000066140 | 5F33 | 4E49 | 5F50 | 4552 | 454C | 5341 | 5F45 | 4F43 |
| 0000066160 | 4544 | 0053 | 6574 | 7473 | 2E73 | 0063 | 7374 | 5F6C |
| 0000066200 | 6669 | 702E | 0000 | 0244 | 025C | 024C | 0D3E | 0000 |
| 0000066220 | 0000 | 0000 | 0000 | 0000 | 0000 | 5F47 | 5745 | 545F |
| 0000066240 | 4700 | 455F | 5F57 | 0054 | 6E55 | 6F6C | 6461 | 6E69 |
| 0000066260 | 2067 | 7325 | 6200 | 645F | 6265 | 6775 | 0000 | 6E75 |
| 0000066300 | 6F6C | 6461 | 755F | 6E6E | 6565 | 6564 | 0064 | 6E69 |
| 0000066320 | 0074 | 6E69 | 0074 | 6C63 | 736F | 5F65 | 6E75 | 656E |
| 0000066340 | 6465 | 6465 | 6900 | 746E | 6900 | 746E | 0000 | 7374 |
| 0000066360 | 5F6C | 6567 | 5F74 | 706F | 6E65 | 745F | 7365 | 5F74 |
| 0000066400 | 616E | 656D | 0073 | 6E69 | 0074 | 6E69 | 0074 | 7374 |
| 0000066420 | 5F6C | 7266 | 6565 | 745F | 7365 | 5F74 | 616E | 656D |
| 0000066440 | 0073 | 7974 | 6570 | 792E | 7400 | 6C73 | 695F | 2E66 |
| 0000066460 | 0070 | 6E69 | 0074 | 6E69 | 0074 | 6370 | 6179 | 6363 |
| 0000066500 | 6920 | 746E | 7265 | 616E | 206C | 7473 | 6361 | 206B |
| 0000066520 | 766F | 7265 | 6C66 | 776F | 7700 | 4300 | 6E61 | 7427 |
| 0000066540 | 6F20 | 6570 | 206E | 2074 | 6966 | 656C | 203A | 7325 |
| 0000066560 | 000A | 4524 | 504F | 2500 | 2073 | 0A00 | 7300 | 6E79 |
| 0000066600 | 6174 | 2078 | 7265 | 6F72 | 0072 | 0077 | 6143 | 276E |
| 0000066620 | 2074 | 706F | 6E65 | 7420 | 6620 | 6C69 | 3A65 | 2520 |
| 0000066640 | 0A73 | 2400 | 4F45 | 0050 | 7325 | 0020 | 000A | 02F2 |
| 0000066660 | 0384 | 02F9 | 0258 | 0020 | 0000 | FFFF | 0001 | 0000 |
| 0000066700 | FFFF | FFFE | 0000 | 0000 | 000C | 000D | 000A | 0008 |
| 0000066720 | 0009 | 000C | 000E | 0015 | 0013 | 000F | 0004 | 000B |
| 0000066740 | 0012 | 0006 | 0011 | 0010 | 0001 | 0005 | 0007 | 0003 |
| 0000066760 | 0002 | 0000 | 0000 | 0000 | 0000 | 0000 | 0000 | 0014 |
| 0000067000 | 0000 | 0000 | 0000 | 0016 | FC18 | FF09 | FC18 | FC18 |
| 0000067020 | FEFC | FEFE | FC18 | FF04 | FF0D | FF0C | FF0A | FF03 |
| 0000067040 | FC18 | FC18 | FC18 | FF01 | FC18 | FC18 | FC18 | FF01 |
| 0000067060 | FC18 | FC18 | FC18 | 0000 | 0014 | 0013 | 0012 | 000B |
| 0000067100 | 0011 | 0010 | 0000 | 0006 | 0006 | 0001 | 0001 | 0001 |
| 0000067120 | 0001 | 0002 | 0002 | 0003 | 0003 | 0004 | 0004 | 0005 |
| 0000067140 | 0005 | 0000 | 0000 | 0002 | 0001 | 0003 | 0003 | 0003 |
| 0000067160 | 0001 | 0002 | 0003 | 0003 | 0001 | 0001 | 0003 | 0001 |
| 0000067200 | FC18 | FFFA | FFFF | FFFE | 0101 | FFFB | 0104 | FFFD |
| 0000067220 | 0107 | 0108 | 0106 | FFFC | 0104 | 0103 | 0102 | 0105 |
| 0000067240 | 0102 | 0102 | 0102 | 0105 | FFFC | 0106 | FFFC | 0001 |
| 0000067260 | FFFE | 0002 | 0003 | 0000 | 0007 | 000E | 0000 | 0000 |
| 0000067300 | 0000 | 000B | 0000 | 000C | 0008 | 0004 | 0000 | 0005 |

```
THU MAR 14 17:48:46 1991  TSL_IF.DLL  PAGE 31, LINE 1771

0000067320  0006  000D  0000  000A  000B  0009  0000  0000
0000067340  0000  FFFF  7374  5F6C  7974  6570  705F  7261
0000067360  6573  0000  0001  0000  0000  0000  0000  0006
0000067400  0000  1000  0FFF  0000  0005  0000  0000  0000
0000067420  0000  0000  0000  0000  0000  435F  465F  4C49
0000067440  5F45  4E49  4F46  003D  0001  FFFF  0000  0000
0000067460  0000  0000  0000  0000  0000  0000  0000  0001
0000067500  8101  8181  0000  0000  0000  0000  0000  0000
0000067520  0000  0000  0000  0000  0000  0000  0000  0000
*
0000070100  0A00  0A0A  0A0A  0A0A  0A0A  0A0A  0A0A  0A0A
0000070120  0ACA  0A0A  0A0A  0A0A  0A0A  0A0A  0A0A  0A0A
*
0000070500  000A  0000  0000  0000  0000  0000  0000  0000
0000070520  0000  FF00  00FF  0000  0000  FFFF  FFFF  005C
0000070540  005C  0000  0B08  073C  0000  0B08  0D66  0001
0000070560  0000  0000  0000  0000  0000  0102  0000  0000
0000070600  0000  0000  0000  0202  0000  0000  0000  0000
0000070620  0000  0000  0000  0000  0000  0000  0000  0000
*
0000071500  0000  0000  0001  0200  0000  0000  0000  0000
0000071520  0000  0000  0000  0000  0000  0000  0000  0000
*
0000072440  0000  0000  0908  0380  0000  0000  0000  0000
0000072460  0006  0600  0100  0000  0010  0603  0600  1002
0000072500  4504  4545  0505  0505  3505  0030  0050  0000
0000072520  2000  3020  5850  0807  3000  3030  5057  0007
0000072540  2000  0020  0000  0000  6008  6060  6060  0060
0000072560  7000  7870  7878  0878  0807  0000  0007  0808
0000072600  0008  0800  0800  0000  2808  756E  6C6C  0629
0000072620  0000  0000  0000  0000  0000  0000  0000  0000
0000072640  0003  2000  41A2  0D32  41A2  0B76  41A2  0B7A
0000072660  41A2  0B7E  41A2  0B82  41A2  0B86  0000  0000
0000072700  0101  2000  2020  2020  2020  2020  2828  2828
0000072720  2028  2020  2020  2020  2020  2020  2020  2020
0000072740  2020  4820  1010  1010  1010  1010  1010  1010
0000072760  1010  8410  8484  8484  8484  8484  1084  1010
0000073000  1010  1010  8181  8181  8181  0101  0101  0101
0000073020  0101  0101  0101  0101  0101  0101  0101  1010
0000073040  1010  1010  8282  8282  8282  0202  0202  0202
0000073060  0202  0202  0202  0202  0202  0202  0202  1010
0000073100  1010  0020  0000  0000  0000  0000  0000  0000
0000073120  0000  0000  0000  0000  0000  0000  0000  0000
*
0000073300  0000  0000  0000  0003  FFFF  001E  003B  005A
0000073320  0078  0097  00B5  00D4  00F3  0111  0130  014E
0000073340  016D  FFFF  001E  003A  0059  0077  0096  00B4
0000073360  00D3  00F2  0110  012F  014D  016C  5A54  0000
0000073400  5350  0054  4450  0054  7080  0000  0001  0CD0
0000073420  0CE4  0CD4  0AF6  7553  4D6E  6E6F  7554  5765
0000073440  6465  6854  4675  6972  6153  0074  614A  466E
0000073460  6265  614D  4172  7270  614D  4A79  6E75  754A
0000073500  416C  6775  6553  4F70  7463  6F4E  4476  6365
0000073520  0000  0000  0000  0000  0000  0000  0000  0000
0000073540  4984  FFFF  FFFF  0D34  0D36  0D38  0D3A  FFFF
0000073560  0D3C  FFFF  FFFF  0D42  0D44  0D40  0D4A  0D4C
0000073600  0D4E  0D50  0D52  0D54  0D56  0D58  0D5A  0D5C
0000073620  0D5E  0D60  0D62  0D64  3C3C  4D4E  4753  3E3E
0000073640  0000  3652  3030  0D30  2D0A  7320  6174  6B63
```

THU MAR 14 17:48:46 1991 TSL_IF.DLL PAGE 32, LINE 1830

| | | | | | | | | |
|---|---|---|---|---|---|---|---|---|
| 0000073660 | 6F20 | 6576 | 6672 | 6F6C | 0D77 | 000A | 0003 | 3652 |
| 0000073700 | 3030 | 0D33 | 2D0A | 6920 | 746E | 6765 | 7265 | 6420 |
| 0000073720 | 7669 | 6469 | 2065 | 7962 | 3020 | 0A0D | 0800 | 5200 |
| 0000073740 | 3036 | 3830 | 0A0D | 202D | 6F6E | 2074 | 6E65 | 756F |
| 0000073760 | 6867 | 7320 | 6170 | 6563 | 6620 | 726F | 6120 | 6772 |
| 0000074000 | 6D75 | 6E65 | 7374 | 0A0D | 0900 | 5200 | 3036 | 3930 |
| 0000074020 | 0A0D | 202D | 6F6E | 2074 | 6E65 | 756F | 6867 | 7320 |
| 0000074040 | 6170 | 6563 | 6620 | 726F | 6520 | 766E | 7269 | 6E6F |
| 0000074060 | 656D | 746E | 0A0D | FC00 | 0D00 | 000A | 00FF | 7572 |
| 0000074100 | 2D6E | 6974 | 656D | 6520 | 7272 | 726F | 0020 | 0002 |
| 0000074120 | 3652 | 3030 | 0D32 | 2D0A | 6620 | 6F6C | 7461 | 6E69 |
| 0000074140 | 2D67 | 6F70 | 6E69 | 2074 | 7573 | 7070 | 726F | 2074 |
| 0000074160 | 6F6E | 2074 | 6F6C | 6461 | 6465 | 0A0D | 1100 | 5200 |
| 0000074200 | 3036 | 3731 | 0A0D | 202D | 6E75 | 7865 | 6570 | 7463 |
| 0000074220 | 6465 | 6D20 | 6C75 | 6974 | 6874 | 6572 | 6461 | 6C20 |
| 0000074240 | 636F | 206B | 7265 | 6F72 | 0D72 | 000A | 0010 | 3652 |
| 0000074260 | 3130 | 0D36 | 2D0A | 6E20 | 746F | 6520 | 6F6E | 6775 |
| 0000074300 | 2068 | 7073 | 6361 | 2065 | 6F66 | 2072 | 6874 | 6572 |
| 0000074320 | 6461 | 6420 | 7461 | 0D61 | 000A | FFFF | 05FF | 0200 |
| 0000074340 | 8A00 | 010B | 0000 | 0200 | 3600 | 0407 | 0000 | 0200 |
| 0000074360 | E000 | 050C | 0000 | 0200 | 4602 | 020D | 1100 | 0200 |
| 0000074400 | 4802 | 020D | 1F00 | 4E00 | 3042 | 9832 | 00AA | 0100 |
| 0000074420 | 0000 | 7400 | 0017 | 0000 | 0100 | 1F00 | 745C | 3231 |
| 0000074440 | 5C33 | 7061 | 5C70 | 7374 | 5F6C | 6669 | 6F5C | 6A62 |
| 0000074460 | 745C | 6C73 | 695F | 2E66 | 626F | 016A | 7400 | C317 |
| 0000074500 | 0001 | 0000 | 0100 | 2100 | 745C | 3231 | 5C33 | 7061 |
| 0000074520 | 5C70 | 7374 | 5F6C | 6669 | 6F5C | 6A62 | 745C | 6C73 |
| 0000074540 | 665F | 746C | 2E72 | 626F | 016A | 3800 | D419 | 0010 |
| 0000074560 | 0000 | 0100 | 1E00 | 745C | 3231 | 5C33 | 7061 | 5C70 |
| 0000074600 | 7374 | 5F6C | 6669 | 6F5C | 6A62 | 745C | 7365 | 7374 |
| 0000074620 | 6F2E | 6A62 | 0001 | 2A0C | 08B3 | 0000 | 0000 | 0001 |
| 0000074640 | 5C1D | 3174 | 3332 | 615C | 7070 | 745C | 6C73 | 695F |
| 0000074660 | 5C66 | 626F | 5C6A | 7974 | 6570 | 6F2E | 6A62 | 0001 |
| 0000074700 | 32C0 | 097E | 0000 | 0000 | 0001 | 5C1E | 3174 | 3332 |
| 0000074720 | 615C | 7070 | 745C | 6C73 | 695F | 5C66 | 626F | 5C6A |
| 0000074740 | 7974 | 6570 | 2E31 | 626F | 016A | 3E00 | B03C | 0002 |
| 0000074760 | 0000 | 0100 | 1D00 | 745C | 3231 | 5C33 | 7061 | 5C70 |
| 0000075000 | 7374 | 5F6C | 6669 | 6F5C | 6A62 | 745C | 6365 | 2E68 |
| 0000075020 | 626F | 016A | FE00 | D13E | 0000 | 0100 | 0100 | 0B00 |
| 0000075040 | 6C64 | 5C6C | 7363 | 2E75 | 7361 | 016D | D000 | AF3F |
| 0000075060 | 0001 | 0100 | 0100 | 0E00 | 6C64 | 5C6C | 7363 | 6475 |
| 0000075100 | 7461 | 612E | 6D73 | 0001 | 4180 | 0022 | 0000 | 0001 |
| 0000075120 | 0001 | 6F0F | 3273 | 635C | 7472 | 6D30 | 6773 | 612E |
| 0000075140 | 6D73 | 0001 | 41A2 | 0006 | 0000 | 0001 | 0001 | 630A |
| 0000075160 | 7472 | 6630 | 2E70 | 7361 | 016D | A800 | 1A41 | 0000 |
| 0000075200 | 0100 | 0100 | 0A00 | 6863 | 736B | 6B74 | 612E | 6D73 |
| 0000075220 | 0001 | 41C2 | 0108 | 0000 | 0001 | 0001 | 640D | 6C6C |
| 0000075240 | 735C | 7465 | 6E65 | 7076 | 632E | 0001 | 42CA | 0065 |
| 0000075260 | 0000 | 0001 | 0001 | 6F0F | 3273 | 6E5C | 736D | 6867 |
| 0000075300 | 7264 | 612E | 6D73 | 0001 | 4330 | 00C0 | 0000 | 0001 |
| 0000075320 | 0001 | 6F0E | 3273 | 645C | 736F | 6572 | 2E74 | 7361 |
| 0000075340 | 016D | F000 | 0243 | 0001 | 0100 | 0100 | 0800 | 6366 |
| 0000075360 | 6F6C | 6573 | 632E | 0001 | 44F2 | 006A | 0000 | 0001 |
| 0000075400 | 0001 | 6607 | 706F | 6E65 | 632E | 0001 | 455C | 005A |
| 0000075420 | 0000 | 0001 | 0001 | 6609 | 7270 | 6E69 | 6674 | 632E |
| 0000075440 | 0000 | 0000 | 0000 | 0000 | 0001 | 0000 | 5F0B | 6663 |
| 0000075460 | 756C | 6873 | 612E | 6D73 | 0000 | 0000 | 0000 | 0000 |
| 0000075500 | 0001 | 0000 | 5F07 | 6966 | 656C | 632E | 0001 | 45B6 |
| 0000075520 | 00E5 | 0000 | 0001 | 0001 | 5F0B | 6C66 | 6273 | 6675 |

THU MAR 14 17:48:46 1991 TSL_IF.DLL PAGE 33, LINE 1889

| | | | | | | | | |
|---|---|---|---|---|---|---|---|---|
| 0000075540 | 612E | 6D73 | 0001 | 469C | 0037 | 0000 | 0001 | 0001 |
| 0000075560 | 5F0C | 7266 | 6565 | 7562 | 2E66 | 7361 | 016D | D400 |
| 0000075600 | 4B46 | 0000 | 0100 | 0100 | 0B00 | 675F | 7465 | 7562 |
| 0000075620 | 2E66 | 7361 | 016D | 2000 | F247 | 0000 | 0100 | 0100 |
| 0000075640 | 0700 | 6F5F | 6570 | 2E6E | 0163 | 1200 | C048 | 0000 |
| 0000075660 | 0100 | 0100 | 0B00 | 735F | 7466 | 7562 | 2E66 | 7361 |
| 0000075700 | 016D | D200 | 2E48 | 0001 | 0100 | 0100 | 0800 | 6666 |
| 0000075720 | 756C | 6873 | 632E | 0001 | 4A00 | 04FA | 0000 | 0001 |
| 0000075740 | 0001 | 6F0A | 7475 | 7570 | 2E74 | 7361 | 016D | FA00 |
| 0000075760 | 784E | 0000 | 0100 | 0100 | 0800 | 7473 | 6572 | 6D61 |
| 0000076000 | 632E | 0001 | 4F72 | 003F | 0000 | 0001 | 0001 | 6F0D |
| 0000076020 | 3273 | 635C | 6F6C | 6573 | 612E | 6D73 | 0001 | 4FB2 |
| 0000076040 | 0077 | 0000 | 0001 | 0001 | 6F0D | 3273 | 6C5C | 6573 |
| 0000076060 | 6B65 | 612E | 6D73 | 0001 | 502A | 01DD | 0000 | 0001 |
| 0000076100 | 0001 | 6F0C | 3273 | 6F5C | 6570 | 2E6E | 7361 | 016D |
| 0000076120 | 0800 | DD52 | 0001 | 0100 | 0100 | 0900 | 7277 | 7469 |
| 0000076140 | 2E65 | 7361 | 006D | 0000 | 0000 | 0000 | 0100 | 0000 |
| 0000076160 | 0B00 | 7874 | 6D74 | 646F | 2E65 | 7361 | 016D | E600 |
| 0000076200 | 0A53 | 0000 | 0100 | 0100 | 0A00 | 616D | 6C6C | 636F |
| 0000076220 | 612E | 6D73 | 0001 | 53F0 | 000A | 0000 | 0001 | 0001 |
| 0000076240 | 6608 | 6572 | 2E65 | 7361 | 016D | FA00 | AF53 | 0000 |
| 0000076260 | 0100 | 0100 | 0B00 | 6D66 | 6C61 | 6F6C | 2E63 | 7361 |
| 0000076300 | 006D | 0000 | 0000 | 0000 | 0100 | 0000 | 0900 | 6466 |
| 0000076320 | 7461 | 2E61 | 7361 | 016D | AA00 | 3454 | 0000 | 0100 |
| 0000076340 | 0100 | 0B00 | 6E69 | 7469 | 6573 | 2E67 | 7361 | 016D |
| 0000076360 | DE00 | 3654 | 0000 | 0100 | 0100 | 0B00 | 696C | 6B6E |
| 0000076400 | 6573 | 2E67 | 7361 | 016D | 1400 | 7C55 | 0000 | 0100 |
| 0000076420 | 0100 | 0C00 | 6573 | 7261 | 6863 | 6773 | 612E | 6D73 |
| 0000076440 | 0001 | 5590 | 00E2 | 0000 | 0001 | 0001 | 670B | 6F72 |
| 0000076460 | 7377 | 6765 | 612E | 6D73 | 0001 | 5672 | 0031 | 0000 |
| 0000076500 | 0001 | 0001 | 6E0A | 7765 | 6573 | 2E67 | 7361 | 016D |
| 0000076520 | A400 | 4656 | 0000 | 0100 | 0100 | 0A00 | 7473 | 6372 |
| 0000076540 | 7461 | 612E | 6D73 | 0001 | 56EA | 0036 | 0000 | 0001 |
| 0000076560 | 0001 | 730A | 7274 | 7063 | 2E79 | 7361 | 016D | 2000 |
| 0000076600 | 2957 | 0000 | 0100 | 0100 | 0A00 | 7473 | 6372 | 706D |
| 0000076620 | 612E | 6D73 | 0001 | 574A | 0017 | 0000 | 0001 | 0001 |
| 0000076640 | 730A | 7274 | 656C | 2E6E | 7361 | 016D | 6200 | 2A57 |
| 0000076660 | 0000 | 0100 | 0100 | 0B00 | 7473 | 6E72 | 7063 | 2E79 |
| 0000076700 | 7361 | 016D | 8C00 | 3B57 | 0000 | 0100 | 0100 | 0B00 |
| 0000076720 | 7473 | 6E72 | 6D63 | 2E70 | 7361 | 016D | C800 | 0357 |
| 0000076740 | 0000 | 0100 | 0100 | 0800 | 7461 | 6C6F | 612E | 6D73 |
| 0000076760 | 0001 | 57CC | 0056 | 0000 | 0001 | 0001 | 6108 | 6F74 |
| 0000077000 | 2E78 | 7361 | 016D | 2200 | 1C58 | 0000 | 0100 | 0100 |
| 0000077020 | 0800 | 7469 | 616F | 612E | 6D73 | 0000 | 0000 | 0000 |
| 0000077040 | 0000 | 0001 | 0000 | 630C | 696D | 6373 | 6164 | 2E74 |
| 0000077060 | 7361 | 006D | 0000 | 0000 | 0000 | 0100 | 0000 | 0900 |
| 0000077100 | 7463 | 7079 | 2E65 | 7361 | 016D | 3E00 | A658 | 0000 |
| 0000077120 | 0100 | 0100 | 0800 | 6567 | 6574 | 766E | 632E | 0001 |
| 0000077140 | 58E4 | 00BA | 0000 | 0001 | 0001 | 6F0D | 3273 | 6D5C |
| 0000077160 | 6F6C | 6B63 | 612E | 6D73 | 0001 | 599E | 007A | 0000 |
| 0000077200 | 0001 | 0001 | 6410 | 6C6C | 745C | 6469 | 6174 | 6C62 |
| 0000077220 | 2E65 | 7361 | 016D | 1800 | 745A | 0000 | 0100 | 0100 |
| 0000077240 | 0900 | 7073 | 6972 | 746E | 2E66 | 0163 | 8C00 | AD5A |
| 0000077260 | 0000 | 0100 | 0100 | 0C00 | 7266 | 6165 | 6C6C | 636F |
| 0000077300 | 612E | 6D73 | 0001 | 5B3A | 000A | 0000 | 0001 | 0001 |
| 0000077320 | 720B | 6165 | 6C6C | 636F | 612E | 6D73 | 0001 | 5B44 |
| 0000077340 | 00C8 | 0000 | 0001 | 0001 | 720A | 7365 | 7A69 | 2E65 |
| 0000077360 | 7361 | 016D | 0C00 | 2E5C | 0000 | 0100 | 0100 | 0A00 |
| 0000077400 | 6163 | 6C6C | 636F | 612E | 6D73 | 0001 | 5C3A | 0025 |

THU MAR 14 17:48:46 1991 TSL_IF.DLL PAGE 34, LINE 1948

| | | | | | | | | |
|---|---|---|---|---|---|---|---|---|
| 0000077420 | 0000 | 0001 | 0001 | 660B | 6E69 | 7364 | 6765 | 612E |
| 0000077440 | 6D73 | 0000 | 0000 | 0000 | 0000 | 0001 | 0000 | 6406 |
| 0000077460 | 7961 | 2E73 | 0163 | 6000 | 495C | 0000 | 0100 | 0100 |
| 0000077500 | 0C00 | 736F | 5C32 | 6974 | 656D | 612E | 6D73 | 0001 |
| 0000077520 | 5CAA | 01C8 | 0000 | 0001 | 0001 | 7407 | 737A | 7465 |
| 0000077540 | 632E | 0000 | 0000 | 0000 | 0000 | 0001 | 0000 | 7409 |
| 0000077560 | 6D69 | 7365 | 7465 | 632E | 0001 | 5E72 | 00F6 | 0000 |
| 0000077600 | 0001 | 0001 | 640A | 6F74 | 7478 | 6D69 | 2E65 | 0163 |
| 0000077620 | 6800 | 635F | 0000 | 0100 | 0100 | 0800 | 7478 | 616F |
| 0000077640 | 612E | 6D73 | 0001 | 5FCC | 0145 | 0000 | 0001 | 0001 |
| 0000077660 | 730A | 7274 | 6F74 | 2E6C | 7361 | 016D | 1200 | 5461 |
| 0000077700 | 0000 | 0100 | 0100 | 0A00 | 6573 | 6A74 | 706D | 612E |
| 0000077720 | 6D73 | 0001 | 6166 | 001D | 0000 | 0001 | 0001 | 6F0E |
| 0000077740 | 3273 | 755C | 6C6E | 6E69 | 2E6B | 7361 | 016D | 8400 |
| 0000077760 | 3261 | 0000 | 0100 | 0100 | 0800 | 6D6C | 6C75 | 612E |
| 0000100000 | 6D73 | 0D40 | 0004 | 0081 | 5F0B | 7374 | 5F6C | 7473 |
| 0000100020 | 7461 | 7375 | 088A | 0001 | 06AC | 5408 | 4C53 | 545F |
| 0000100040 | 4345 | 1E48 | 0109 | AE00 | 0E06 | 5354 | 5F4C | 4553 |
| 0000100060 | 5F54 | 4150 | 4152 | 534D | 09AF | 0001 | 06AF | 540E |
| 0000100100 | 4C53 | 475F | 5445 | 505F | 5241 | 4D41 | D953 | 0109 |
| 0000100120 | B000 | 0F06 | 5354 | 5F4C | 4547 | 5F54 | 4F43 | 544E |
| 0000100140 | 5845 | 0354 | 010A | B200 | 0806 | 5354 | 5F4C | 4E49 |
| 0000100160 | 5449 | 0C79 | 0001 | 06B8 | 540A | 4C53 | 465F | 4E49 |
| 0000100200 | 5349 | 4148 | 010E | BA00 | 0E06 | 5354 | 5F4C | 4C43 |
| 0000100220 | 4145 | 5F52 | 4944 | 4646 | 10FA | 0001 | 06BF | 540E |
| 0000100240 | 4C53 | 535F | 5445 | 565F | 5245 | 4649 | 9E59 | 0111 |
| 0000100260 | C100 | 0E06 | 5354 | 5F4C | 4553 | 5F54 | 4552 | 4F43 |
| 0000100300 | 4452 | 11CC | 0001 | 06C2 | 540F | 4C53 | 475F | 5445 |
| 0000100320 | 535F | 5359 | 4F4D | 4544 | 11F4 | 0001 | 06C3 | 540E |
| 0000100340 | 4C53 | 475F | 5445 | 535F | 4154 | 5554 | 2153 | 0112 |
| 0000100360 | C400 | 0A06 | 5354 | 5F4C | 5942 | 4150 | 5353 | 12B6 |
| 0000100400 | 0001 | 06C5 | 540F | 4C53 | 475F | 5445 | 545F | 5345 |
| 0000100420 | 5F54 | 4449 | 130A | 0001 | 06C6 | 540F | 4C53 | 475F |
| 0000100440 | 5445 | 445F | 4649 | 5F46 | 4449 | 0232 | 0001 | 0690 |
| 0000100460 | 5408 | 4C53 | 545F | 5059 | 3645 | 0113 | C800 | 0F06 |
| 0000100500 | 5354 | 5F4C | 4553 | 5F54 | 494C | 454E | 4E5F | 604F |
| 0000100520 | 0113 | C900 | 0F06 | 5354 | 5F4C | 4547 | 5F54 | 494C |
| 0000100540 | 454E | 4E5F | 6C4F | 0102 | 9200 | 0906 | 5354 | 5F4C |
| 0000100560 | 544D | 5059 | 4345 | 0103 | 9600 | 1406 | 5354 | 5F4C |
| 0000100600 | 4F4D | 4556 | 4C5F | 434F | 5441 | 524F | 415F | 5342 |
| 0000100620 | 0382 | 0001 | u698 | 5414 | 4C53 | 4D5F | 564F | 5F45 |
| 0000100640 | 4F4C | 4143 | 4F54 | 5F52 | 4552 | C14C | 0103 | 9A00 |
| 0000100660 | 1206 | 5354 | 5F4C | 4F4D | 4556 | 4D5F | 554F | 4553 |
| 0000100700 | 415F | 5342 | 0400 | 0001 | 069C | 5412 | 4C53 | 4D5F |
| 0000100720 | 564F | 5F45 | 4F4D | 5355 | 5F45 | 4552 | 684C | 010E |
| 0000100740 | BC00 | 0E06 | 745F | 6C73 | 6F5F | 6570 | 5F6E | 6964 |
| 0000100760 | 6666 | 043F | 0001 | 069E | 5416 | 4C53 | 4D5F | 564F |
| 0000101000 | 5F45 | 4F4C | 4143 | 4F54 | 5F52 | 5254 | 4341 | D34B |
| 0000101020 | 0104 | 9F00 | 0906 | 5354 | 5F4C | 4547 | 5F54 | 5758 |
| 0000101040 | 0105 | A000 | 0906 | 5354 | 5F4C | 4547 | 5F54 | C259 |
| 0000101060 | 0107 | A400 | 1006 | 5354 | 5F4C | 4843 | 4345 | 5F4B |
| 0000101100 | 4353 | 4552 | 4E45 | 0802 | 0001 | 06A6 | 540D | 4C53 |
| 0000101120 | 435F | 4548 | 4B43 | 535F | 4749 | 0842 | 0001 | 06A8 |
| 0000101140 | 5411 | 4C53 | 535F | 5445 | 455F | 4358 | 5045 | 4954 |
| 0000101160 | 4E4F | 0866 | 0001 | 06AA | 5413 | 4C53 | 525F | 5345 |
| 0000101200 | 5445 | 455F | 4358 | 5045 | 4954 | 4E4F | 18CF | 0001 |
| 0000101220 | 04AD | 540E | 4C53 | 535F | 5445 | 465F | 4C49 | 4554 |
| 0000101240 | 0352 | 0119 | AF00 | 1004 | 5354 | 5F4C | 4552 | 4553 |
| 0000101260 | 5F54 | 4946 | 544C | 5245 | 1938 | 0001 | 0557 | 5411 |

THU MAR 14 17:48:46 1991 TSL_IF.DLL PAGE 35, LINE 2007

| | | | | | | | | |
|---|---|---|---|---|---|---|---|---|
| 0000101300 | 4C53 | 475F | 5445 | 545F | 5345 | 5F54 | 5441 | 5254 |
| 0000101320 | 1A31 | 0001 | 055A | 5413 | 4F4F | 4D5F | 4E41 | 5F59 |
| 0000101340 | 504F | 4E45 | 545F | 5345 | 5354 | 1AC6 | 0001 | 055C |
| 0000101360 | 5414 | 4C53 | 475F | 5445 | 435F | 5255 | 4552 | 544E |
| 0000101400 | 415F | 5454 | 0752 | 011B | 5E00 | 1005 | 5354 | 5F4C |
| 0000101420 | 504F | 4E45 | 545F | 5345 | 5F54 | 4449 | 1D62 | 0001 |
| 0000101440 | 0560 | 540D | 4C53 | 4F5F | 4550 | 5F4E | 4554 | 5453 |
| 0000101460 | 23CD | 0001 | 056F | 540E | 4C53 | 435F | 4F4C | 4553 |
| 0000101500 | 545F | 5345 | B254 | 0125 | 7100 | 1705 | 5354 | 5F4C |
| 0000101520 | 4547 | 5F54 | 504F | 4E45 | 545F | 5345 | 5F54 | 414E |
| 0000101540 | 454D | B353 | 0128 | 7500 | 1305 | 5354 | 5F4C | 5246 |
| 0000101560 | 4545 | 545F | 5345 | 5F54 | 414E | 454D | 3C53 | 040D |
| 0000101600 | C100 | 0500 | 795F | 7879 | 0869 | 0400 | EC00 | 0404 |
| 0000101620 | 795F | 7679 | 0338 | 0004 | 04ED | 5F07 | 6572 | 7364 |
| 0000101640 | 7165 | 0334 | 0004 | 04AA | 5F09 | 7979 | 6674 | 6C69 |
| 0000101660 | 7065 | 0D38 | 0004 | 04A3 | 5F07 | 7979 | 766C | 6C61 |
| 0000101700 | 0330 | 0004 | 00C0 | 5F09 | 7979 | 6674 | 6C69 | 6E65 |
| 0000101720 | 0D0C | 0004 | 04A3 | 5F06 | 7979 | 6176 | 186C | 040D |
| 0000101740 | E500 | 0704 | 735F | 6476 | 7270 | 0464 | 0400 | E600 |
| 0000101760 | 0804 | 735F | 6476 | 616E | 736D | 04AC | 0005 | 0081 |
| 0000102000 | 5F13 | 7374 | 5F6C | 7974 | 6570 | 705F | 7963 | 6579 |
| 0000102020 | 7272 | 7463 | 04AE | 0005 | 0081 | 5F13 | 7374 | 5F6C |
| 0000102040 | 7974 | 6570 | 705F | 7963 | 6579 | 7272 | 6C66 | 04B0 |
| 0000102060 | 0005 | 0081 | 5F10 | 7374 | 5F6C | 7974 | 6570 | 725F |
| 0000102100 | 6465 | 6E63 | B274 | 0504 | 8100 | 1300 | 745F | 6C73 |
| 0000102120 | 745F | 7079 | 5F65 | 6370 | 7979 | 6F74 | 656B | 0C6E |
| 0000102140 | 012A | EE00 | 0F04 | 745F | 6C73 | 745F | 7079 | 5F65 |
| 0000102160 | 6170 | 7372 | 8865 | 0503 | 8100 | 1100 | 745F | 6C73 |
| 0000102200 | 745F | 7079 | 5F65 | 7979 | 6674 | 616C | 8A67 | 0503 |
| 0000102220 | E800 | 1004 | 745F | 6C73 | 745F | 7079 | 5F65 | 7979 |
| 0000102240 | 7865 | 6163 | 0398 | 0005 | 04E9 | 5F0F | 7374 | 5F6C |
| 0000102260 | 7974 | 6570 | 795F | 6179 | 7463 | 03D8 | 0005 | 04EA |
| 0000102300 | 5F10 | 7374 | 5F6C | 7974 | 6570 | 795F | 7079 | 6361 |
| 0000102320 | 0674 | 0504 | E800 | 0F04 | 745F | 6C73 | 745F | 7079 |
| 0000102340 | 5F65 | 7979 | 6770 | 146F | 0504 | EB00 | 0E04 | 745F |
| 0000102360 | 6C73 | 745F | 7079 | 5F65 | 7979 | 3172 | 0432 | 0005 |
| 0000102400 | 04EB | 5F0E | 7374 | 5F6C | 7974 | 6570 | 795F | 7279 |
| 0000102420 | 5032 | 0504 | EA00 | 0F04 | 745F | 6C73 | 745F | 7079 |
| 0000102440 | 5F65 | 7979 | 6863 | 7E6B | 0504 | EA00 | 0F04 | 745F |
| 0000102460 | 6C73 | 745F | 7079 | 5F65 | 7979 | 6564 | 2066 | 040D |
| 0000102500 | 8100 | 0E00 | 745F | 6C73 | 745F | 7079 | 5F65 | 696B |
| 0000102520 | 646E | 0D22 | 0004 | 051A | 5F09 | 7374 | 5F6C | 616D |
| 0000102540 | 6B72 | 0000 | 0004 | 00C0 | 5F10 | 7374 | 5F6C | 7974 |
| 0000102560 | 6570 | 735F | 7274 | 6E69 | 3467 | 040D | C000 | 0F00 |
| 0000102600 | 745F | 6C73 | 745F | 7079 | 5F65 | 7473 | 7261 | 1C74 |
| 0000102620 | 040D | F700 | 1204 | 745F | 6C73 | 745F | 7079 | 5F65 |
| 0000102640 | 6F63 | 6D6D | 6E61 | 7364 | 0D08 | 0004 | 04F7 | 5F11 |
| 0000102660 | 7374 | 5F6C | 7974 | 6570 | 635F | 6D6F | 655F | 646E |
| 0000102700 | 0D10 | 0004 | 0500 | 5F0D | 7374 | 5F6C | 7563 | 5F72 |
| 0000102720 | 6574 | 6863 | 0328 | 0004 | 050A | 5F12 | 7374 | 5F6C |
| 0000102740 | 7563 | 5F72 | 6574 | 6863 | 6C5F | 7369 | C474 | 0504 |
| 0000102760 | 8500 | 1200 | 745F | 6C73 | 725F | 6C65 | 6165 | 6573 |
| 0000103000 | 635F | 646F | 7365 | 32C0 | 0001 | 0330 | 5F0E | 7374 |
| 0000103020 | 5F6C | 6E69 | 7469 | 745F | 7079 | E165 | 0132 | 3100 |
| 0000103040 | 0D05 | 745F | 6C73 | 745F | 7079 | 5F65 | 656C | 2578 |
| 0000103060 | 0135 | 3300 | 0F05 | 745F | 6C73 | 705F | 6572 | 7373 |
| 0000103100 | 6E5F | 6D61 | B265 | 0136 | 3800 | 0D05 | 745F | 6C73 |
| 0000103120 | 6D5F | 746B | 6D69 | 6E69 | 8C67 | 0138 | 3D00 | 1105 |
| 0000103140 | 745F | 6C73 | 615F | 7070 | 6E65 | 5F64 | 6972 | 6867 |

THU MAR 14 17:48:46 1991 TSL_IF.DLL PAGE 36, LINE 2066

| | | | | | | | | |
|---|---|---|---|---|---|---|---|---|
| 0000103160 | 0574 | 0139 | 3F00 | 1005 | 745F | 6C73 | 665F | 7361 |
| 0000103200 | 5F74 | 7061 | 6570 | 646E | 39B8 | 0001 | 0541 | 5F14 |
| 0000103220 | 7374 | 5F6C | 7061 | 6570 | 646E | 725F | 6C65 | 6165 |
| 0000103240 | 6573 | F373 | 013A | 4200 | 1005 | 745F | 6C73 | 745F |
| 0000103260 | 6365 | 5F68 | 7075 | 6164 | 6574 | 3BEC | 0001 | 0544 |
| 0000103300 | 5F0F | 7374 | 5F6C | 7974 | 6570 | 655F | 7272 | 726F |
| 0000103320 | 3C3E | 0001 | 04BE | 5411 | 5F4D | 4E49 | 5449 | 545F |
| 0000103340 | 4345 | 5F48 | 494C | 5453 | 3C80 | 0001 | 04C0 | 540B |
| 0000103360 | 5F4D | 4441 | 5F44 | 4554 | 4843 | 3D1D | 0001 | 04C2 |
| 0000103400 | 5412 | 5F4D | 4C46 | 5355 | 5F48 | 4554 | 4843 | 4C5F |
| 0000103420 | 5349 | C454 | 013D | C400 | 1004 | 4D54 | 475F | 5445 |
| 0000103440 | 545F | 4345 | 5F48 | 494C | 5453 | 3E70 | 0001 | 04C6 |
| 0000103460 | 540B | 5F4D | 4547 | 5F54 | 4554 | 4843 | 0EAE | 0005 |
| 0000103500 | 0000 | 5F06 | 6465 | 7461 | 0061 | 0510 | 0000 | 0400 |
| 0000103520 | 655F | 646E | 3EFE | 0001 | 0000 | 4306 | 495F | 494E |
| 0000103540 | D654 | 0504 | 0000 | 0C00 | 5F5F | 686E | 6165 | 5F70 |
| 0000103560 | 6564 | 6373 | 1000 | 0005 | 0000 | 5F0C | 7473 | 6361 |
| 0000103600 | 626B | 746F | 6F74 | FC6D | 0504 | 0000 | 0C00 | 5F5F |
| 0000103620 | 615F | 4244 | 7773 | 6670 | 676C | 04C8 | 0005 | 0000 |
| 0000103640 | 5F08 | 615F | 6D63 | 6C64 | FA6E | 0504 | 0000 | 0800 |
| 0000103660 | 5F5F | 7361 | 6765 | 6968 | 04F8 | 0005 | 0000 | 5F08 |
| 0000103700 | 615F | 6573 | 6C67 | D46F | 0504 | 0000 | 0800 | 5F5F |
| 0000103720 | 7361 | 7A69 | 7364 | 04D2 | 0005 | 0000 | 5F08 | 615F |
| 0000103740 | 6F74 | 7370 | EA70 | 0504 | 0000 | 0900 | 5F5F | 6361 |
| 0000103760 | 6966 | 666E | D66F | 00D6 | 0100 | 0900 | 5F5F | 4461 |
| 0000104000 | 7542 | 6573 | CA64 | 0504 | 0000 | 0900 | 5F5F | 6561 |
| 0000104020 | 766E | 6573 | CE67 | 0504 | 0000 | 0A00 | 5F5F | 6874 |
| 0000104040 | 6572 | 6461 | 6469 | 04CC | 0005 | 0000 | 5F0A | 675F |
| 0000104060 | 6E69 | 6F66 | 6573 | D667 | 00D6 | 0100 | 0A00 | 5F5F |
| 0000104100 | 4461 | 6442 | 736F | 7077 | 04D0 | 0005 | 0000 | 5F0A |
| 0000104120 | 6C5F | 6E69 | 6F66 | 6573 | 7667 | 0098 | 0100 | 0A00 |
| 0000104140 | 5F5F | 6361 | 7472 | 7375 | 6465 | 04FE | 0005 | 0000 |
| 0000104160 | 5F0B | 5F5F | 4461 | 7242 | 6574 | 7272 | 3F6F | 0001 |
| 0000104200 | 0000 | 5F0B | 615F | 736D | 5F67 | 7865 | 7469 | 050C |
| 0000104220 | 0005 | 0000 | 5F0B | 6F5F | 7673 | 7265 | 6973 | 6E6F |
| 0000104240 | 4089 | 0001 | 0000 | 5F06 | 655F | 6978 | 3B74 | 0141 |
| 0000104260 | 0000 | 0C00 | 5F5F | 6E75 | 6F6C | 6B63 | 7865 | 7469 |
| 0000104300 | 071F | 0005 | 0000 | 5F07 | 635F | 6968 | 646C | 050F |
| 0000104320 | 0005 | 0000 | 5F07 | 6E5F | 6966 | 656C | 3FD0 | 0001 |
| 0000104340 | 0000 | 5F07 | 635F | 6E69 | 7469 | 0711 | 0005 | 0000 |
| 0000104360 | 5F07 | 5F5F | 7261 | 6367 | 4091 | 0001 | 0000 | 5F07 |
| 0000104400 | 635F | 7865 | 7469 | 050C | 0005 | 0000 | 5F0D | 645F |
| 0000104420 | 736F | 6576 | 6D72 | 6A61 | 726F | 0713 | 0005 | 0000 |
| 0000104440 | 5F07 | 5F5F | 7261 | 7667 | 050D | 0005 | 0000 | 5F0D |
| 0000104460 | 645F | 736F | 6576 | 6D72 | 6E69 | 726F | 0611 | 0005 |
| 0000104500 | 0000 | 5F08 | 705F | 7069 | 6365 | 1768 | 0507 | 0000 |
| 0000104520 | 0800 | 655F | 766E | 7269 | 6E6F | 0511 | 0005 | 0000 |
| 0000104540 | 5F08 | 6F5F | 6673 | 6C69 | 0E65 | 0505 | 0000 | 0800 |
| 0000104560 | 5F5F | 736F | 6F6D | 6564 | 402A | 0001 | 0000 | 5F08 |
| 0000104600 | 695F | 696E | 6674 | 2470 | 050D | 0000 | 0800 | 5F5F |
| 0000104620 | 7066 | 6E69 | 7469 | 415E | 0001 | 0000 | 5F08 | 745F |
| 0000104640 | 7265 | 666D | 1B70 | 0507 | 0000 | 0800 | 5F5F | 6770 |
| 0000104660 | 706D | 7274 | 409B | 0001 | 0000 | 5F08 | 635F | 655F |
| 0000104700 | 6978 | 0E74 | 0505 | 0000 | 0900 | 5F5F | 6F64 | 6D73 |
| 0000104720 | 646F | 0C65 | 0505 | 0000 | 0900 | 5F5F | 736F | 616D |
| 0000104740 | 6F6A | 0D72 | 0505 | 0000 | 0900 | 5F5F | 736F | 696D |
| 0000104760 | 6F6E | 2172 | 0507 | 0000 | 0A00 | 5F5F | 7865 | 7469 |
| 0000105000 | 6F64 | 656E | 40F1 | 0001 | 0000 | 5F0A | 6C5F | 636F |
| 0000105020 | 656B | 6978 | 0A74 | 0505 | 0000 | 0A00 | 5F5F | 6D75 |

THU MAR 14 17:48:46 1991 TSL_IF.DLL PAGE 37, LINE 2125

| | | | | | | | | |
|---|---|---|---|---|---|---|---|---|
| 0000105040 | 7361 | 766B | 6C61 | 415E | 0001 | 0000 | 5F0A | 635F |
| 0000105060 | 6574 | 6D72 | 7573 | 2362 | 0507 | 0000 | 0A00 | 5F5F |
| 0000105100 | 7865 | 7469 | 745F | 6469 | 0500 | 0005 | 0000 | 5F05 |
| 0000105120 | 665F | 6361 | 4082 | 0001 | 0000 | 5F05 | 7865 | 7469 |
| 0000105140 | 4180 | 0001 | 0000 | 5F0E | 465F | 5F46 | 534D | 4247 |
| 0000105160 | 4E41 | 454E | 2652 | 0507 | 0000 | 0900 | 5F5F | 6461 |
| 0000105200 | 6762 | 736D | 7667 | 0098 | 0100 | 0900 | 5F5F | 6361 |
| 0000105220 | 7472 | 736D | A267 | 0141 | 0000 | 0800 | 5F5F | 7066 |
| 0000105240 | 7274 | 7061 | 072A | 0005 | 0000 | 5F0C | 615F | 6C61 |
| 0000105260 | 7374 | 6B74 | 766F | A872 | 0141 | 0000 | 0800 | 5F5F |
| 0000105300 | 6863 | 736B | 6B74 | 41A8 | 0001 | 0000 | 5F0A | 615F |
| 0000105320 | 6346 | 6B68 | 7473 | C26B | 0141 | 0000 | 0900 | 5F5F |
| 0000105340 | 6573 | 6574 | 766E | CA70 | 0142 | 0000 | 0B00 | 5F5F |
| 0000105360 | 4D4E | 4753 | 545F | 5845 | FA54 | 0142 | 0000 | 0C00 |
| 0000105400 | 5F5F | 4D4E | 4753 | 575F | 4952 | 4554 | 43DC | 0001 |
| 0000105420 | 0000 | 5F0B | 5F5F | 6F64 | 6573 | 7272 | 6F6E | 43E4 |
| 0000105440 | 0001 | 0000 | 5F07 | 655F | 7272 | 6F6E | 4395 | 0001 |
| 0000105460 | 0000 | 5F08 | 645F | 736F | 6572 | 7C74 | 0143 | 0000 |
| 0000105500 | 0900 | 5F5F | 6F64 | 7273 | 7465 | 3C66 | 0144 | 0000 |
| 0000105520 | 0B00 | 5F5F | 6366 | 6F6C | 6573 | 6C5F | F06B | 0143 |
| 0000105540 | 0000 | 0700 | 665F | 6C63 | 736F | F265 | 0144 | 0000 |
| 0000105560 | 0800 | 5F5F | 7366 | 706F | 6E65 | 4544 | 0001 | 0000 |
| 0000105600 | 5F06 | 6F66 | 6570 | 5C6E | 0145 | 0000 | 0800 | 665F |
| 0000105620 | 7270 | 6E69 | 6674 | 0732 | 0005 | 0000 | 5F08 | 635F |
| 0000105640 | 6C66 | 7375 | 0868 | 040B | 0000 | 0700 | 5F5F | 7562 |
| 0000105660 | 6966 | 346E | 0507 | 0000 | 0500 | 5F5F | 6F69 | 1462 |
| 0000105700 | 0509 | 0000 | 0600 | 5F5F | 6F69 | 3262 | 0AF4 | 0005 |
| 0000105720 | 0000 | 5F09 | 6C5F | 7361 | 6974 | 626F | 45B6 | 0001 |
| 0000105740 | 0000 | 5F08 | 665F | 736C | 7562 | 9C66 | 0146 | 0000 |
| 0000105760 | 0900 | 5F5F | 7266 | 6565 | 7562 | D466 | 0146 | 0000 |
| 0000106000 | 0800 | 5F5F | 6567 | 6274 | 6675 | 4720 | 0001 | 0000 |
| 0000106020 | 5F0A | 6F5F | 6570 | 666E | 6C69 | 8A65 | 0148 | 0000 |
| 0000106040 | 0700 | 5F5F | 7466 | 7562 | 1266 | 0148 | 0000 | 0700 |
| 0000106060 | 5F5F | 7473 | 7562 | 1866 | 0149 | 0000 | 0B00 | 5F5F |
| 0000106100 | 6666 | 756C | 6873 | 6C5F | D26B | 0148 | 0000 | 0700 |
| 0000106120 | 665F | 6C66 | 7375 | 8468 | 0149 | 0000 | 0900 | 665F |
| 0000106140 | 756C | 6873 | 6C61 | 106C | 014A | 0000 | 0800 | 5F5F |
| 0000106160 | 756F | 7074 | 7475 | 4EFA | 0001 | 0000 | 5F0B | 675F |
| 0000106200 | 7465 | 7473 | 6572 | 6D61 | 4F72 | 0001 | 0000 | 5F06 |
| 0000106220 | 6C63 | 736F | BC65 | 014F | 0000 | 0600 | 6C5F | 6573 |
| 0000106240 | 6B65 | 4FB2 | 0001 | 0000 | 5F0A | 6C5F | 6573 | 6B65 |
| 0000106260 | 6C5F | 2A6B | 0150 | 0000 | 0600 | 735F | 706F | 6E65 |
| 0000106300 | 503B | 0001 | 0000 | 5F05 | 706F | 6E65 | 51F6 | 0001 |
| 0000106320 | 0000 | 5F11 | 635F | 4558 | 494E | 7458 | 446F | 534F |
| 0000106340 | 6F6D | 6564 | 5212 | 0001 | 0000 | 5F06 | 7277 | 7469 |
| 0000106360 | 0865 | 0152 | 0000 | 0A00 | 5F5F | 7277 | 7469 | 5F65 |
| 0000106400 | 6B6C | 0B62 | 0005 | 0000 | 5F07 | 665F | 6F6D | 6564 |
| 0000106420 | 0B62 | 0005 | 0000 | 5F08 | 695F | 6D6F | 646F | E665 |
| 0000106440 | 0153 | 0000 | 0700 | 6D5F | 6C61 | 6F6C | EB63 | 0153 |
| 0000106460 | 0000 | 0A00 | 6D5F | 6C61 | 6F6C | 5F63 | 6B6C | 53F5 |
| 0000106500 | 0001 | 0000 | 5F08 | 7266 | 6565 | 6C5F | F06B | 0153 |
| 0000106520 | 0000 | 0500 | 665F | 6572 | 2C65 | 0154 | 0000 | 0C00 |
| 0000106540 | 5F5F | 6D66 | 6C61 | 6F6C | 5F63 | 6B6C | 53FA | 0001 |
| 0000106560 | 0000 | 5F07 | 665F | 7266 | 6565 | 540D | 0001 | 0000 |
| 0000106600 | 5F09 | 665F | 616D | 6C6C | 636F | 53FA | 0001 | 0000 |
| 0000106620 | 5F0A | 665F | 7266 | 6565 | 6C5F | 646B | 050B | 0000 |
| 0000106640 | 0700 | 5F5F | 6866 | 6165 | AA70 | 0154 | 0000 | 0900 |
| 0000106660 | 5F5F | 6E69 | 7469 | 6573 | DE67 | 0154 | 0000 | 0900 |
| 0000106700 | 5F5F | 696C | 6B6E | 6573 | 1467 | 0155 | 0000 | 0B00 |

THU MAR 14 17:48:46 1991 TSL_IF.DLL PAGE 38, LINE 2184

| | | | | | | | | |
|---|---|---|---|---|---|---|---|---|
| 0000106720 | 5F5F | 6573 | 7261 | 6863 | 6573 | 1F67 | 0156 | 0000 |
| 0000106740 | 0800 | 5F5F | 6E69 | 7363 | 6765 | 5590 | 0001 | 0000 |
| 0000106760 | 5F09 | 675F | 6F72 | 7377 | 6765 | 5652 | 0001 | 0000 |
| 0000107000 | 5F0A | 665F | 6E69 | 6C64 | 7361 | 7274 | 050B | 0000 |
| 0000107020 | 0A00 | 5F5F | 6D61 | 6C62 | 736B | 7A69 | 5672 | 0001 |
| 0000107040 | 0000 | 5F08 | 6E5F | 7765 | 6573 | A467 | 0156 | 0000 |
| 0000107060 | 0700 | 735F | 7274 | 6163 | EA74 | 0156 | 0000 | 0700 |
| 0000107100 | 735F | 7274 | 7063 | 2079 | 0157 | 0000 | 0700 | 735F |
| 0000107120 | 7274 | 6D63 | 4A70 | 0157 | 0000 | 0700 | 735F | 7274 |
| 0000107140 | 656C | 626E | 0157 | 0000 | 0800 | 735F | 7274 | 636E |
| 0000107160 | 7970 | 578C | 0001 | 0000 | 5F08 | 7473 | 6E72 | 6D63 |
| 0000107200 | C870 | 0157 | 0000 | 0500 | 615F | 6F74 | CC6C | 0157 |
| 0000107220 | 0000 | 0700 | 5F5F | 6163 | 6F74 | 2278 | 0158 | 0000 |
| 0000107240 | 0500 | 695F | 6F74 | 7461 | 050B | 0000 | 0D00 | 5F5F |
| 0000107260 | 6663 | 746C | 7663 | 5F74 | 6174 | 9062 | 050B | 0000 |
| 0000107300 | 0800 | 5F5F | 7361 | 7A69 | 4365 | 0B91 | 0005 | 0000 |
| 0000107320 | 5F08 | 615F | 6973 | 657A | 8E44 | 050B | 0000 | 0B00 |
| 0000107340 | 5F5F | 6973 | 6967 | 746E | 666F | 8C66 | 050B | 0000 |
| 0000107360 | 0B00 | 5F5F | 6973 | 6967 | 746E | 6573 | 9267 | 050B |
| 0000107400 | 0000 | 0700 | 5F5F | 7463 | 7079 | 9265 | 050B | 0000 |
| 0000107420 | 0800 | 5F5F | 7463 | 7079 | 5F65 | 583E | 0001 | 0000 |
| 0000107440 | 5F07 | 6567 | 6574 | 766E | 5934 | 0001 | 0000 | 5F06 |
| 0000107460 | 6C5F | 636F | 7E6B | 0159 | 0000 | 0700 | 5F5F | 6F6C |
| 0000107500 | 6B63 | 0866 | 0159 | 0000 | 0D00 | 5F5F | 6E75 | 6F6C |
| 0000107520 | 6B63 | 665F | 6C69 | E465 | 0158 | 0000 | 0D00 | 5F5F |
| 0000107540 | 6F6C | 6B63 | 735F | 7274 | 6165 | 5E6D | 0159 | 0000 |
| 0000107560 | 0800 | 5F5F | 6E75 | 6F6C | 6B63 | 0C94 | 0005 | 0000 |
| 0000107600 | 5F09 | 6C5F | 636F | 636B | 746E | 598E | 0001 | 0000 |
| 0000107620 | 5F09 | 755F | 6C6E | 636F | 666B | 58F0 | 0001 | 0000 |
| 0000107640 | 5F0F | 755F | 6C6E | 636F | 5F6B | 7473 | 6572 | 6D61 |
| 0000107660 | 5914 | 0001 | 0000 | 5F0A | 775F | 6961 | 6C74 | 636F |
| 0000107700 | FC6B | 0158 | 0000 | 0B00 | 5F5F | 6F6C | 6B63 | 665F |
| 0000107720 | 6C69 | 9E65 | 0159 | 0000 | 0B00 | 5F5F | 6567 | 7474 |
| 0000107740 | 6469 | 6174 | 9662 | 050C | 0000 | 0B00 | 5F5F | 6974 |
| 0000107760 | 7464 | 6261 | 616D | 1878 | 015A | 0000 | 0800 | 735F |
| 0000110000 | 7270 | 6E69 | 6674 | 5AB3 | 0001 | 0000 | 5F0D | 665F |
| 0000110020 | 6572 | 6C61 | 6F6C | 5F63 | 6B6C | 5A8C | 0001 | 0000 |
| 0000110040 | 5F0A | 665F | 6572 | 6C61 | 6F6C | 3A63 | 015B | 0000 |
| 0000110060 | 0800 | 725F | 6165 | 6C6C | 636F | 5B3F | 0001 | 0000 |
| 0000110100 | 5F0B | 6572 | 6C61 | 6F6C | 5F63 | 6B6C | 5B44 | 0001 |
| 0000110120 | 0000 | 5F08 | 725F | 7365 | 7A69 | 0C65 | 015C | 0000 |
| 0000110140 | 0700 | 635F | 6C61 | 6F6C | 3A63 | 015C | 0000 | 0900 |
| 0000110160 | 5F5F | 6966 | 646E | 6573 | B267 | 050C | 0000 | 0600 |
| 0000110200 | 5F5F | 6164 | 7379 | 0C98 | 0005 | 0000 | 5F08 | 6C5F |
| 0000110220 | 6470 | 7961 | 6073 | 015C | 0000 | 0500 | 745F | 6D69 |
| 0000110240 | CA65 | 015C | 0000 | 0600 | 745F | 737A | 7465 | 5DA4 |
| 0000110260 | 0001 | 0000 | 5F09 | 695F | 6973 | 646E | 7473 | 5CAA |
| 0000110300 | 0001 | 0000 | 5F08 | 5F5F | 7A74 | 6573 | DC74 | 050C |
| 0000110320 | 0000 | 0900 | 645F | 7961 | 696C | 6867 | D874 | 050C |
| 0000110340 | 0000 | 0900 | 745F | 6D69 | 7A65 | 6E6F | DE65 | 050C |
| 0000110360 | 0000 | 0700 | 745F | 6E7A | 6D61 | E665 | 050C | 0000 |
| 0000110400 | 0900 | 5F5F | 645F | 616E | 656D | FC73 | 050C | 0000 |
| 0000110420 | 0900 | 5F5F | 6D5F | 616E | 656D | 7273 | 015E | 0000 |
| 0000110440 | 0A00 | 5F5F | 7464 | 786F | 6974 | 656D | 5F75 | 0001 |
| 0000110460 | 0000 | 5F07 | 635F | 7478 | 616F | 5F68 | 0001 | 0000 |
| 0000110500 | 5F0A | 635F | 746C | 616F | 7573 | D862 | 015F | 0000 |
| 0000110520 | 0700 | 735F | 7274 | 6F74 | CC6C | 015F | 0000 | 0800 |
| 0000110540 | 735F | 7274 | 6F74 | 6C75 | 6112 | 0001 | 0000 | 5F07 |
| 0000110560 | 6573 | 6A74 | 706D | 613C | 0001 | 0000 | 5F08 | 6F6C |

```
THU MAR 14 17:48:46 1991  TSL_IF.DLL  PAGE 39, LINE 2243

0000110600  676E  6D6A  6670  0161  0000  0700  725F  6D65
0000110620  766F  6665  0161  0000  0700  755F  6C6E  6E69
0000110640  846B  0161  0000  0800  5F5F  4661  6D6C  6C75
0000110660  6184  0001  0000  5F09  615F  7546  6D6C  6C75
0000110700  0A01  7500  8380  0081  0064  0183  0102  0001
0000110720  0180  0001  0180  0001  0180  0001  0180  0001
*
0000111000  0180  0001  0180  0001  0180  0007  737A  C083
0000111020  8200  0100  0001  0180  0001  0180  0001  0180
0000111040  0001  0180  0001  0180  0001  0180  0001  0180
*
0000111400  000A  8075  8183  6400  8300  0201  0101  8000
0000111420  0101  8000  0101  8000  0101  8000  0101  8000
*
0000113220  0101  8000  0101  8000  0101  8000  0701  7800
0000113240  0085  8301  0080  0101  8000  0101  8000  0101
0000113260  8000  0101  8000  0101  8000  0101  8000  0101
*
0000115420  8000  0101  8000  0101  8000  0101  8000  1601
0000115440  7900  0220  5183  8304  0452  0A82  7528  746E
0000115460  6761  6567  2964  0169  0007  837F  0081  8183
0000115500  0100  0009  827F  7801  8200  7901  0102  0001
0000115520  0180  0001  0180  0001  0180  0001  0180  0001
*
0000116040  0180  0001  0180  0001  0180  0001  0180  0018
0000116060  8579  0260  8305  048C  8D83  8204  280A  6E75
0000116100  6174  6767  6465  6929  1001  7F00  8683  8300
0000116120  0331  8283  8300  0331  C083  0100  002E  827F
0000116140  6902  0064  0482  616E  656D  8204  740A  6D69
0000116160  5F65  7473  6D61  2470  0582  776F  656E  2872
0000116200  0982  6870  7379  705F  7461  4868  0101  8000
0000116220  0101  8000  0101  8000  0101  8000  0101  8000
*
0000116320  0101  8000  0701  7A00  8373  048B  0082  0101
0000116340  8000  0101  8000  0101  8000  0101  8000  0101
*
0000116500  8000  0101  8000  0101  8000  1801  7900  1085
0000116520  0201  BD83  8304  04BE  0A82  7528  746E  6761
0000116540  6567  2964  0169  0007  837F  0331  8183  0100
0000116560  000F  827F  6E04  6D61  0065  0482  7974  6570
0000116600  0120  0018  8579  0930  830D  04C2  C383  8204
0000116620  280A  6E75  6174  6767  6465  6929  0701  7800
0000116640  2085  8303  0080  0701  7A00  8373  04BC  0082
0000116660  2801  7F00  3183  8303  0081  3183  8303  0082
0000116700  C083  8304  04C0  C083  8300  00C0  C083  8300
0000116720  00C0  8183  8300  0085  C183  0104  00A1  827F
0000116740  6E04  6D61  0065  0482  7974  6570  8220  6106
0000116760  7475  6F[illegible]  2272  0482  6164  6574  8242  6608
0000117000  6E75  7463  6F69  466E  0882  7073  6365  725F
0000117020  6665  AA85  8200  640B  7365  7263  7069  6974
0000117040  6E6F  0E85  8201  6307  6D6F  656D  746E  1285
0000117060  8201  6610  746C  5F72  6573  7261  6863  705F
0000117100  7461  8568  0116  0E82  6374  735F  6165  6372
0000117120  5F68  6170  6874  1A85  8201  6405  6D75  796D
0000117140  1E85  8201  7009  7261  6D61  635F  746E  2085
0000117160  8201  7009  7261  6D61  6C5F  7473  2285  0101
0000117200  0001  0180  0001  0180  0001  0180  0001  0180
0000117220  0001  0180  0001  0180  0007  737A  BF83  8204
0000117240  0100  0001  0180  0001  0180  0001  0180  0001
```

```
THU MAR 14 17:48:46 1991  TSL_IF.DLL  PAGE 40, LINE 2302

0000117260  0180  0001  0180  0001  0180  0001  0130  0001
*
0000117700  0180  0001  0180  0001  0180  0018  8579  0140
0000117720  8303  0517  1883  8205  280A  6E75  6174  6767
0000117740  6465  6929  0701  7800  1085  8301  0084  0A01
0000117760  7F00  8683  8300  0085  1683  0105  0015  827F
0000120000  6902  0064  0482  6973  657A  8204  7305  6170
0000120020  6572  0106  0001  0180  0001  0180  0001  0180
0000120040  0001  0180  0001  0180  0001  0180  0001  0180
*
0000120200  0001  0180  0001  0180  0018  8579  0110  8311
0000120220  0537  3883  8205  280A  6E75  6174  6767  6465
0000120240  6929  3401  7F00  8583  8300  0085  8583  8300
0000120260  0085  8583  8300  0085  8183  8300  0085  8583
0000120300  8300  0085  8483  8300  0085  8583  8300  0085
0000120320  8583  8300  0085  8583  0100  0106  827F  7409
0000120340  6D69  5F65  6E75  7469  8200  6D0F  6E69  725F
0000120360  6365  726F  5F64  6974  656D  8202  7309  6174
0000120400  6962  696C  7974  8204  630F  7061  7574  6572
0000120420  745F  6D69  6F65  7475  8206  6B0A  7965  665F
0000120440  726F  616D  0874  1382  6F63  746E  6E69  6F75
0000120460  7375  745F  6172  6B63  6E69  0A67  0E82  6F6D
0000120500  7375  5F65  7274  6361  696B  676E  820C  6311
0000120520  7061  7574  6572  735F  6769  616E  7574  6572
0000120540  820E  680B  746F  656B  5F79  7973  636E  8210
0000120560  640C  6665  7561  746C  745F  6D69  1265  0982
0000120600  616D  5F78  6564  616C  1479  0B82  6166  7473
0000120620  725F  7065  616C  1679  0E82  6576  6972  7966
0000120640  745F  6D69  6F65  7475  8218  770C  6961  5F74
0000120660  6974  656D  756F  1A74  0C82  7973  636E  745F
0000120700  6D69  6F65  7475  821C  7409  726B  7365  6F68
0000120720  646C  821E  630C  6568  6B63  6C5F  6F6F  756B
0000120740  2070  1801  7900  8085  0709  3B83  8305  053C
0000120760  0A82  7528  746E  6761  6567  2964  0169  0007
0000121000  8578  0800  8083  0100  0016  837F  0081  8683
0000121020  8300  0331  3A83  8305  0082  8583  8300  0086
0000121040  6B01  7F00  0782  7973  6D73  646F  0065  0782
0000121060  6964  6666  695F  0264  0982  6964  6666  6E5F
0000121100  6D61  0665  0E82  6574  7473  645F  6669  5F66
0000121120  616E  656D  8226  7611  7265  6669  5F79  6974
0000121140  656D  735F  6174  706D  2685  8201  6C07  6E69
0000121160  5F65  6F6E  2A85  8201  6C12  7361  5F74  7865
0000121200  6365  7475  6465  745F  7365  8574  012C  0101
0000121220  8000  0101  8000  0101  8000  0101  8000  0101
*
0000121300  8000  0101  8000  0101  8000  0701  7A00  8373
0000121320  0536  0082  0101  8000  0101  8000  0101  8000
0000121340  0701  7A00  8373  0536  0082  0101  8000  0701
0000121360  7A00  8373  0539  0082  0101  8000  0101  8000
0000121400  0101  8000  0101  8000  0101  8000  0101  8000
0000121420  0101  8000  1601  7900  0240  5B83  8305  055C
0000121440  0A82  7528  746E  6761  6567  2964  0169  0007
0000121460  837F  0082  8283  0100  0017  827F  6408  6665
0000121500  745F  6D69  0065  0882  696D  5F6E  6974  656D
0000121520  0104  0001  0180  0001  0180  0001  0180  0001
0000121540  0180  0001  0180  0001  0180  0016  4079  8304
0000121560  0564  6583  8205  280A  6E75  6174  6767  6465
0000121600  6929  0D01  7F00  8483  8300  0084  8483  8300
0000121620  0450  2901  7F00  0782  6261  5F73  6572  006C
```

```
THU MAR 14 17:48:46 1991  TSL_IF.DLL  PAGE 41, LINE 2361

0000121640   0582  6E75  7469  0173  0C82  7073  6365  6169
0000121660   5F6C  7566  636E  8202  6404  7369  0470  1801
0000121700   7900  8085  0200  6783  8305  0568  0A82  7528
0000121720   746E  6761  6567  2964  0169  0007  837F  0563
0000121740   5A83  0105  0011  827F  6404  7369  0070  0682
0000121760   6974  696D  676E  0108  0001  0180  0001  0180
0000122000   0001  0180  0001  0180  0001  0180  0001  0180
0000122020   0018  8579  0140  8302  0570  7183  8205  280A
0000122040   6E75  6174  6767  6465  6929  0701  7F00  5A83
0000122060   8305  0331  1801  7F00  0682  6974  696D  676E
0000122100   8200  730B  7263  6565  5F6E  616E  656D  0108
0000122120   0001  0180  0001  0180  0001  0180  0001  0180
*
0000122200   001B  2079  8309  057F  8083  8205  690F  755F
0000122220   6D5F  6773  705F  7261  6D61  745F  0169  001C
0000122240   837F  0081  8583  8300  0082  8683  8300  0088
0000122260   8083  8300  0084  C083  8300  00C0  6A01  7F00
0000122300   0982  5F69  5F75  6873  726F  0074  0A82  5F69
0000122320   5F75  7375  6F68  7472  8200  6908  755F  6C5F
0000122340   6E6F  0067  0982  5F69  5F75  6C75  6E6F  0067
0000122360   0982  5F69  5F75  6C66  616F  0074  0882  5F69
0000122400   5F75  6863  7261  8200  6909  755F  755F  6863
0000122420   7261  8200  6907  755F  735F  7274  8200  6909
0000122440   755F  625F  6F6C  6B63  0100  0019  3079  8302
0000122460   0582  8383  8205  690D  6D5F  6773  705F  7261
0000122500   6D61  745F  0169  0007  837F  0085  7E83  0105
0000122520   0010  827F  7404  7079  0065  0582  6176  756C
0000122540   0265  0101  8000  1C01  7900  9085  0900  8683
0000122560   8305  0587  0E82  5F69  736D  5F67  6568  6461
0000122600   7265  745F  0169  001C  837F  0081  8183  8300
0000122620   0085  8583  8300  0084  8583  8300  0085  8183
0000122640   8300  0085  4701  7F00  0482  5F71  6469  8200
0000122660   7306  756F  6372  0265  0382  6970  0464  0382
0000122700   6974  0664  0482  6572  7073  8208  7208  7365
0000122720   5F70  6974  0A64  0782  706F  635F  646F  0C65
0000122740   0482  7974  6570  820E  7304  7A69  1065  1501
0000122760   7900  C085  0200  8A83  8305  058B  0782  5F69
0000123000   736D  5F67  6974  0501  7800  8330  0581  0701
0000123020   7F00  8583  8305  0589  1701  7F00  0682  6568
0000123040   6461  7265  8200  700A  7261  6D61  6C5F  7369
0000123060   1274  0101  8000  0101  8000  0101  8000  0701
0000123100   7A00  8373  0588  0082  0101  8000  0101  8000
0000123120   0101  8000  0101  8000  0101  8000  0101  8000
*
0000123400   0101  8000  1901  7900  0460  C183  8305  05C2
0000123420   0D82  5243  5F56  4F43  4D4D  4E41  5F44  6954
0000123440   0701  7A00  8373  05BF  0082  0D01  7F00  8183
0000123460   8300  0081  C083  8300  05C0  2401  7F00  0C82
0000123500   6F63  6D6D  6E61  5F64  7974  6570  8200  7304
0000123520   7A69  0265  0382  7562  0466  0482  656E  7478
0000123540   0108  0001  0180  0001  0180  0001  0180  0001
0000123560   0180  0001  0180  0001  0180  0018  8579  0190
0000123600   8305  05CB  CC83  8205  280A  6E75  6174  6767
0000123620   6465  6929  0701  7800  A885  8300  0080  1001
0000123640   7F00  CA83  8305  0081  8583  8300  05CA  8583
0000123660   0100  002A  827F  6E04  6D61  0065  0482  7974
0000123700   6570  8216  7309  7065  7261  7461  726F  8218
0000123720   7305  6968  7466  821A  6304  7061  3073  0101
0000123740   8000  1A01  7900  0086  0190  0100  D083  8305
```

```
THU MAR 14 17:48:46 1991  TSL_IF.DLL  PAGE 42, LINE 2420

0000123760  05D1  0A82  7528  746E  6761  6567  2964  0169
0000124000  0009  8678  9000  0001  C983  0105  0004  837F
0000124020  05CF  0C01  7F00  0882  626B  745F  6261  656C
0000124040  0100  0001  0180  0001  0180  0007  737A  CE83
0000124060  8205  0100  0001  0180  0001  0180  0001  0180
0000124100  0001  0180  0001  0180  0001  0180  0001  0180
*
0000125020  0001  0180  0016  4079  8303  0651  5283  8206
0000125040  280A  6E75  6174  6767  6465  6929  1601  7900
0000125060  0220  4F83  8306  0650  0A82  7528  746E  6761
0000125100  6567  2964  0169  0007  837F  0082  8283  0100
0000125120  0016  827F  6D08  6E69  745F  6D69  0065  0782
0000125140  6574  6863  695F  0064  0A01  7F00  8183  8300
0000125160  0084  4E83  0106  001A  827F  7404  7079  0065
0000125200  0882  6F6C  6163  6974  6E6F  8202  6404  7461
0000125220  0461  1801  7900  4085  0201  5583  8306  0656
0000125240  0A82  7528  746E  6761  6567  2964  0169  0005
0000125260  0078  4D83  0106  0007  837F  0515  5483  0106
0000125300  0011  827F  6707  6E65  685F  7264  8200  6203
0000125320  6675  0128  0016  4079  8303  0659  5A83  8206
0000125340  280A  6E75  6174  6767  6465  6929  0701  7A00
0000125360  8373  0653  0082  0A01  7F00  5883  8306  0081
0000125400  8183  0100  001C  827F  7408  6365  5F68  7562
0000125420  0066  0782  7469  6D65  756E  046D  0382  6F70
0000125440  0673  0101  8000  0101  8000  0101  8000  0101
0000125460  8000  0101  8000  0101  8000  0101  8000  0101
*
0000125520  8000  0701  7800  9085  8300  0081  0101  8000
0000125540  0101  8000  0101  8000  0101  8000  0101  8000
*
0000125620  0101  8000  1801  7900  8085  0708  7783  8306
0000125640  0678  0A82  7528  746E  6761  6567  2964  0169
0000125660  0016  837F  053A  8283  8300  0081  CA83  8304
0000125700  0085  8583  8300  0081  4F01  7F00  0482  616E
0000125720  656D  8200  6405  5F62  6469  0085  8201  750C
0000125740  6173  6567  735F  6174  7574  8573  0104  0682
0000125760  6568  6461  7265  0685  8201  7509  6573  5F72
0000126000  706F  6E65  0A85  8201  6C06  616F  6564  8564
0000126020  010C  0382  726C  8575  010E  0101  8000  0701
0000126040  7A00  8373  0676  0082  0101  8000  0101  8000
0000126060  0101  8000  0101  8000  0101  8000  0101  8000
0000126100  0101  8000  0101  8000  0A01  7500  8380  0200
0000126120  0164  8483  0106  0004  837F  05C0  0101  8000
0000126140  0101  8000  0101  8000  0101  8000  0D01  7F00
0000126160  8183  8300  00C0  8283  8300  0000  0A01  7500
0000126200  8380  0200  0464  8983  0106  0004  837F  05C0
0000126220  0A01  7500  8380  0200  0164  8B83  0106  0001
0000126240  0180  0001  0180  0007  837F  00C0  8283  0100
0000126260  000A  8075  0083  7302  8302  068F  0701  7F00
0000126300  C083  8300  0082  0A01  7500  8380  0200  0273
0000126320  9183  0106  0013  837F  0084  8483  8300  0081
0000126340  8183  8300  0081  8283  0100  000A  8075  0083
0000126360  6402  8306  0693  0D01  7F00  8183  8300  0081
0000126400  8183  8300  0082  0A01  7500  8380  0200  0473
0000126420  9583  0106  000D  837F  0081  8183  8300  0081
0000126440  8283  0100  000A  8075  0083  7302  8304  0697
0000126460  0D01  7F00  8183  8300  0081  8183  8300  0082
0000126500  0A01  7500  8380  0200  0473  9983  0106  000D
0000126520  837F  0081  8183  8300  0081  8283  0100  000A
```

```
THU MAR 14 17:48:46 1991  TSL_IF.DLL  PAGE 43, LINE 2479

0000126540  8075  0083  7302  8304  069B  0401  7F00  8283
0000126560  0100  000A  8075  0083  7302  8301  069D  0A01
0000126600  7500  8380  0081  0073  0183  0102  000A  8075
0000126620  8183  7300  8300  0201  0D01  7F00  8583  8300
0000126640  00C0  8283  8300  0082  0A01  7500  8380  0200
0000126660  0464  A183  0106  000A  837F  00C0  8283  8300
0000126700  0082  0A01  7500  8380  0200  0373  A383  0106
0000126720  000A  837F  00C0  8283  8300  0082  0A01  7500
0000126740  8380  0200  0373  A583  0106  0007  837F  00C0
0000126760  C083  0100  000A  8075  0083  7302  8302  06A7
0000127000  0401  7F00  C083  0100  000A  8075  0083  7302
0000127020  8301  06A9  0401  7F00  8283  0100  000A  8075
0000127040  0083  7302  8301  06AB  0401  7F00  4C83  0105
0000127060  000A  8075  0083  7302  8301  06AD  0A01  7500
0000127100  8380  0550  0073  0183  0102  000A  8075  5283
0000127120  7305  8300  0201  0401  7F00  C083  0100  000A
0000127140  8075  8183  7300  8301  06B1  0701  7800  D885
0000127160  8300  0080  0501  7800  8328  0080  0501  7800
0000127200  8360  0080  0701  7800  8885  8300  0080  0701
0000127220  7800  9085  8300  0080  0A01  7500  8380  0081
0000127240  0073  0183  0102  000A  8075  8183  6400  8300
0000127260  0201  0A01  7500  8380  0200  0073  0183  0102
0000127300  000A  837F  00C0  8683  8300  00C0  0A01  7500
0000127320  8380  0081  0364  BB83  0106  0005  3078  8083
0000127340  0100  0007  837F  0085  C083  0100  000A  8075
0000127360  8183  7300  8302  06BE  0401  7F00  8583  0100
0000127400  000A  8075  0083  7302  8301  06C0  0A01  7500
0000127420  8380  0081  0073  0183  0102  000A  8075  8183
0000127440  7300  8300  0201  0A01  7500  8380  0081  0073
0000127460  0183  0102  000A  8075  8683  7300  8300  0201
0000127500  0A01  7500  8380  0086  0073  0183  0102  0004
0000127520  837F  0085  0A01  7500  8380  0200  0173  C783
0000127540  0106  000A  8075  8583  7300  8300  0201  0A01
0000127560  7500  8380  0081  0064  0183  0102  0005  7878
0000127600  8083  0100  0007  8578  00A8  8083  0100  0007
0000127620  8578  00C8  8083  0100  0007  8578  00A0  8083
0000127640  0100  0007  8578  00C0  8083  0100  0007  8578
0000127660  00B8  8083  0100  000A  8075  8183  6400  8300
0000127700  0201  0101  8000  0101  8000  0101  8000  0101
0000127720  8000  0101  8000  0101  8000  0101  8000  0101
*
0000130140  8000  0101  8000  0101  8000  0101  8000  0701
0000130160  7800  0085  8301  0080  0101  8000  0101  8000
0000130200  0101  8000  0101  8000  0101  8000  0101  8000
*
0000132360  0101  8000  1601  7900  0220  4D83  8303  034E
0000132400  0A82  7528  746E  6761  6567  2964  0169  0007
0000132420  837F  0081  8183  0100  0009  827F  7801  8200
0000132440  7901  0102  0016  4079  8302  0350  5183  8203
0000132460  280A  6E75  6174  6767  6465  6929  0701  7F00
0000132500  4C83  8303  034C  0D01  7F00  0382  696D  006E
0000132520  0382  616D  0478  0101  8000  0101  8000  0101
0000132540  8000  0101  8000  0101  8000  0101  8000  0101
*
0000133260  8000  1801  7900  C085  0702  AB83  8303  03AC
0000133300  0A82  7528  746E  6761  6567  2964  0169  0007
0000133320  8578  0120  8483  0100  0016  837F  0086  2C83
0000133340  8302  034F  8183  8300  0081  8283  8300  03AA
0000133360  3801  7F00  0282  6469  8200  6E04  6D61  0465
```

THU MAR 14 17:48:46 1991 TSL_IF.DLL PAGE 44, LINE 2538

```
0000133400  0482  6572  7463  8224  6104  7474  2C72  0582
0000133420  7564  6D6D  2E79  0A82  6974  656D  735F  6174
0000133440  706D  8230  7305  6170  6572  0134  0001  0180
0000133460  0001  0180  0007  8578  0100  2C83  0102  0001
0000133500  0180  0001  0180  0001  0180  0007  737A  A983
0000133520  8203  0100  0001  0180  0001  0180  0001  0180
0000133540  0001  0180  0001  0180  0001  0180  0001  0180
*
0000134360  0001  0180  0018  8579  02D0  8302  041D  1E83
0000134400  8204  280A  6E75  6174  6767  6465  6929  0701
0000134420  7F00  A983  8303  0081  1101  7F00  0682  6966
0000134440  746C  7265  8200  6D04  646F  5865  0101  8000
0000134460  0101  8000  1B01  7900  0920  2283  8304  0423
0000134500  0F82  5F69  5F75  736D  5F67  6170  6172  5F6D
0000134520  6974  1C01  7F00  8183  8300  0085  8283  8300
0000134540  0086  8883  8300  0080  8483  8300  00C0  C083
0000134560  0100  006A  827F  6909  755F  735F  6F68  7472
0000134600  8200  690A  755F  755F  6873  726F  0074  0882
0000134620  5F69  5F75  6F6C  676E  8200  6909  755F  755F
0000134640  6F6C  676E  8200  6909  755F  665F  6F6C  7461
0000134660  8200  6908  755F  635F  6168  0072  0982  5F69
0000134700  5F75  6375  6168  0072  0782  5F69  5F75  7473
0000134720  0072  0982  5F69  5F75  6C62  636F  006B  1901
0000134740  7900  0230  2583  8304  0426  0D82  5F69  736D
0000134760  5F67  6170  6172  5F6D  6974  0701  7F00  8583
0000135000  8300  0421  1001  7F00  0482  7974  6570  8200
0000135020  7605  6C61  6575  0102  0001  0180  001C  8579
0000135040  0090  8309  0429  2A83  8204  690E  6D5F  6773
0000135060  685F  6165  6564  5F72  6974  1C01  7F00  8183
0000135100  8300  0081  8583  8300  0085  8483  8300  0085
0000135120  8583  8300  0081  8583  0100  0047  827F  7104
0000135140  695F  0064  0682  6F73  7275  6563  8202  7003
0000135160  6469  8204  7403  6469  8206  7204  7365  0870
0000135200  0882  6572  7073  745F  6469  820A  6F07  5F70
0000135220  6F63  6564  820C  7404  7079  0E65  0482  6973
0000135240  657A  0110  0015  8579  00C0  8302  042D  2E83
0000135260  8204  6907  6D5F  6773  745F  0169  0005  3078
0000135300  2483  0104  0007  837F  0428  2C83  0104  0017
0000135320  827F  6806  6165  6564  0072  0A82  6170  6172
0000135340  5F6D  696C  7473  0112  0001  0180  0001  0180
0000135360  0001  0180  0007  737A  2B83  8204  0100  0001
0000135400  0180  0001  0180  0001  0180  0001  0180  0001
*
0000136320  0180  0001  0180  0001  0180  0007  837F  00C0
0000136340  8183  0100  000A  8075  0083  6402  8302  04AA
0000136360  0401  7F00  C083  0100  000A  8075  0083  7302
0000136400  8301  04AC  0401  7F00  C083  0100  000A  8075
0000136420  0083  7302  8301  04AE  0A01  7500  8380  0081
0000136440  0064  0183  0102  0001  0180  0016  3079  8303
0000136460  0203  0483  8202  280A  6E75  6174  6767  6465
0000136500  6929  0A01  7F00  8183  8300  0081  8183  0100
0000136520  001C  827F  7006  6361  5F6B  0068  0682  6966
0000136540  656C  685F  8202  6606  6E75  5F63  0468  0701
0000136560  7A00  8373  00C0  0082  0101  8000  0101  8000
0000136600  0101  8000  0101  8000  0101  8000  0101  8000
*
0000137000  0501  7800  8340  0080  0501  7800  8348  0080
0000137020  0101  8000  0101  8000  0101  8000  0101  8000
*
```

THU MAR 14 17:48:46 1991 TSL_IF.DLL PAGE 45, LINE 2597

```
0000137220  0101  8000  0101  8000  0A01  7500  8380  0081
0000137240  0064  0183  0102  0001  0180  0001  0180  0001
0000137260  0180  0001  0180  0001  0180  0001  0180  0001
*
0000140120  0180  0001  0180  0001  0180  0007  8578  0100
0000140140  8083  0100  0001  0180  0001  0180  0001  0180
0000140160  0001  0180  0001  0180  0001  0180  0001  0180
*
0000143200  0001  0180  0001  0180  0001  0180  0018  8579
0000143220  0110  8302  0446  4783  8204  280A  6E75  6174
0000143240  6767  6465  6929  0701  7F00  BA83  8302  0081
0000143260  0FGI  7F00  0482  616E  656D  8200  7404  7079
0000143300  2065  1801  7900  3085  0D09  4B83  8304  044C
0000143320  0A82  7528  746E  6761  6567  2964  0169  0007
0000143340  8578  0320  8083  0100  0007  737A  4583  8204
0000143360  0100  0028  837F  02BA  8183  8300  02BA  8283
0000143400  8300  0449  4983  8304  00C0  C083  8300  00C0
0000143420  C083  8300  0081  8583  8300  044A  A101  7F00
0000143440  0482  616E  656D  8200  7404  7079  2065  0682
0000143460  7561  6874  726F  8222  6404  7461  4265  0882
0000143500  7566  636E  6974  6E6F  8246  7308  6570  5F63
0000143520  6572  8566  00AA  0B82  6564  6373  6972  7470
0000143540  6F69  856E  010E  0782  6F63  6D6D  6E65  8574
0000143560  0112  1082  6C66  7274  735F  6165  6372  5F68
0000143600  6170  6874  1685  8201  740E  5F63  6573  7261
0000143620  6863  705F  7461  8568  011A  0582  7564  6D6D
0000143640  8579  011E  0982  6170  6172  5F6D  6E63  8574
0000143660  0120  0982  6170  6172  5F6D  736C  8574  0122
0000143700  0101  8000  0101  8000  0101  8000  0101  8000
0000143720  0101  8000  0101  8000  0701  7A00  8373  0448
0000143740  0082  0101  8000  0101  8000  0101  8000  0101
0000143760  8000  0101  8000  0101  8000  0101  8000  0101
*
0000144020  8000  0701  7800  0085  8308  0080  0101  8000
0000144040  0101  8000  0101  8000  0101  8000  0101  8000
*
0000144440  0101  8000  0101  8000  1B01  7900  0920  A583
0000144460  8304  04A6  0F82  5F69  5F75  736D  5F67  6170
0000144500  6172  5F6D  6974  1C01  7F00  8183  8300  0085
0000144520  8283  8300  0086  8883  8300  0080  8483  8300
0000144540  00C0  C083  0100  006A  827F  6909  755F  735F
0000144560  6F68  7472  8200  690A  755F  755F  6873  726F
0000144600  0074  0882  5F69  5F75  6F6C  676E  8200  6909
0000144620  755F  755F  6F6C  676E  8200  6909  755F  665F
0000144640  6F6C  7461  8200  6908  755F  635F  6168  0072
0000144660  0982  5F69  5F75  6375  6168  0072  0782  5F69
0000144700  5F75  7473  0072  0982  5F69  5F75  6C62  636F
0000144720  006B  1901  7900  0230  A883  8304  04A9  0D82
0000144740  5F69  736D  5F67  6170  6172  5F6D  6974  0701
0000144760  7F00  8583  8300  04A4  1001  7F00  0482  7974
0000145000  6570  8200  7605  6C61  6575  0102  0001  0180
0000145020  001C  8579  0090  8309  04AC  AD83  8204  690E
0000145040  6D5F  6773  685F  6165  6564  5F72  6974  1C01
0000145060  7F00  8183  8300  0081  8583  8300  0085  8483
0000145100  8300  0085  8583  8300  0081  8583  0100  0047
0000145120  827F  7104  695F  0064  0682  6F73  7275  6563
0000145140  8202  7003  6469  8204  7403  6469  8206  7204
0000145160  7365  0870  0882  6572  7073  745F  6469  820A
0000145200  6F07  5F70  6F63  6564  820C  7404  7079  0E65
```

```
THU MAR 14 17:48:46 1991  TSL_IF.DLL  PAGE 46, LINE 2656

0000145220  0482  6973  657A  0110  0015  8579  00C0  8302
0000145240  04B0  8183  8204  6907  6D5F  6773  745F  0169
0000145260  0005  3078  A783  0104  0007  837F  04AB  AF83
0000145300  0104  0017  827F  6806  6165  6564  0072  0A82
0000145320  6170  6172  5F6D  696C  7473  0112  0001  0180
0000145340  0001  0180  0001  0180  0007  737A  AE83  8204
0000145360  0100  0001  0180  0001  0180  0001  0180  0001
0000145400  0180  0001  0180  0001  0180  0001  0180  0001
*
0000145620  0180  0018  8579  0880  8307  04DF  E083  8204
0000145640  280A  6E75  6174  6767  6465  6929  1601  7F00
0000145660  6083  8304  0082  8183  8300  0453  8583  8300
0000145700  0085  8183  0100  004F  827F  6E04  6D61  0065
0000145720  0582  6264  695F  8564  0100  0C82  7375  6761
0000145740  5F65  7473  7461  7375  0485  8201  6806  6165
0000145760  6564  8572  0106  0982  7375  7265  6F5F  6570
0000146000  856E  010A  0682  6F6C  6461  6465  0C85  8201
0000146020  6C03  7572  0E85  0101  0007  737A  E283  8204
0000146040  0100  0007  737A  DE83  8204  0100  0001  0180
0000146060  0001  0180  0001  0180  0007  737A  DE83  8204
0000146100  0100  0001  0180  0001  0180  0007  737A  0583
0000146120  8202  0100  0001  0180  0001  0180  0001  0180
0000146140  0001  0180  0001  0180  0001  0180  0001  0180
*
0000146740  0001  0180  0001  0180  0019  8579  08A0  8302
0000146760  0551  5283  8205  540B  5345  5F54  5449  4D45
0000147000  545F  0169  0007  737A  4F83  8205  0100  0007
0000147020  837F  04DE  5083  0105  0011  827F  6104  7474
0000147040  0072  0482  656E  7478  1085  0101  0007  737A
0000147060  5083  8205  0100  000A  8075  8183  6400  8302
0000147100  0555  0701  7F00  C083  8300  0553  0701  7F00
0000147120  C083  8300  04E1  0A01  7500  8380  0081  0273
0000147140  5683  0105  0007  837F  00C0  5383  0105  000A
0000147160  8075  8183  6400  8302  0558  0A01  7500  8380
0000147200  0085  0073  0183  0102  000A  8075  8183  6400
0000147220  8300  0201  0A01  7500  8380  04E6  0073  0183
0000147240  0102  000D  837F  0086  C083  8300  0085  E183
0000147260  0104  000A  8075  8183  7300  8304  055D  0701
0000147300  7F00  C083  8300  04E1  0A01  7500  8380  0081
0000147320  0273  5F83  0105  000A  8075  8183  6400  8300
0000147340  0201  0101  8000  0101  8000  0701  7800  8085
0000147360  8300  0080  0501  7800  8338  0080  0701  7A00
0000147400  8373  0567  0082  0A01  7500  8380  0081  0064
0000147420  0183  0102  0005  6078  8283  0100  0005  6878
0000147440  8083  0100  000A  8075  8183  6400  8300  0201
0000147460  0101  8000  0501  7800  8378  0080  0501  7800
0000147500  8320  0080  0401  7F00  C083  0100  000A  8075
0000147520  8183  7300  8301  056E  0701  7F00  C583  8300
0000147540  04E9  0A01  7500  8380  0081  0273  7083  0105
0000147560  0001  0180  0007  8578  00C0  8083  0100  0007
0000147600  837F  0085  0583  0102  000A  8075  0083  7302
0000147620  8302  0574  0101  8000  0701  7800  A085  8300
0000147640  0080  0101  8000  0101  8000  1601  7900  0330
0000147660  0383  8302  0204  0A82  7528  746E  6761  6567
0000147700  2964  0169  000A  837F  0081  8183  8300  0081
0000147720  1C01  7F00  0682  6170  6B63  685F  8200  6606
0000147740  6C69  5F65  0268  0682  7566  636E  685F  0104
0000147760  0001  0180  0001  0180  0001  0180  0001  0180
*
```

```
THU MAR 14 17:48:46 1991  TSL_IF.DLL  PAGE 47, LINE 2715

0000150160  0001  0180  0001  0180  0001  0180  0005  3878
0000150200  8083  0100  0005  4878  8083  0100  0001  0180
0000150220  0001  0180  0001  0180  0001  0180  0001  0180
*
0000154620  0019  6079  8304  046D  6E83  8204  430D  5652
0000154640  435F  4D4F  414D  444E  545F  0169  0007  737A
0000154660  6B83  8204  0100  000D  837F  0081  8183  8300
0000154700  00C0  6C83  0104  0024  827F  630C  6D6F  616D
0000154720  646E  745F  7079  0065  0482  6973  657A  8202
0000154740  6203  6675  8204  6E04  7865  0874  0101  8000
0000154760  0101  8000  0101  8000  0101  8000  0101  8000
*
0000155260  0101  8000  0501  7800  8310  0080  0501  7800
0000155300  8310  0080  1601  7900  0420  A483  8304  04A5
0000155320  0A82  7528  746E  6761  6567  2964  0169  000D
0000155340  837F  046C  8083  8300  00C0  8283  0100  002C
0000155360  827F  630B  7672  635F  6D6F  616D  646E  8200
0000155400  6C06  7865  635F  0068  0782  656C  5F78  7473
0000155420  0072  0782  656C  5F78  6E69  0074  1201  7900
0000155440  0560  A783  8304  04A8  0682  695F  626F  6675
0000155460  0169  0010  837F  00C0  8183  8300  00C0  8083
0000155500  8300  0080  2701  7F00  0482  705F  7274  8200
0000155520  5F04  6E63  0474  0582  625F  7361  0665  0582
0000155540  665F  616C  0A67  0582  665F  6C69  0B65  0501
0000155560  7800  8300  04A6  0701  7A00  8373  04A6  0082
0000155600  0101  8000  0101  8000  0101  8000  0101  8000
*
0000156140  0101  8000  0101  8000  0501  7800  8320  0081
0000156160  0501  7800  8320  04A2  0101  8000  0501  7800
0000156200  8370  0081  0701  7800  0085  8302  0081  0701
0000156220  7800  7085  8301  0081  0701  7800  F085  8300
0000156240  0081  0701  7800  0085  8319  04A3  0701  7800
0000156260  8085  833E  0081  0A01  7500  8380  0081  0064
0000156300  0183  0102  0001  0180  0005  7878  8083  0100
0000156320  0005  2078  8083  0100  0007  737A  F383  8204
0000156340  0100  000A  8075  8183  6400  8300  0201  0501
0000156360  7800  8360  0082  0701  7800  8085  830C  0081
0000156400  0701  7A00  8373  04A3  0082  0701  7800  F885
0000156420  8300  0080  0701  7800  B885  8300  0080  0501
0000156440  7800  8328  0080  0501  7800  8368  0080  0A01
0000156460  7500  8380  0081  0064  0183  0102  0001  0180
0000156500  0001  0180  0001  0180  0001  0180  0001  0180
*
0000156740  0001  0180  0001  0180  0001  0180  000A  8075
0000156760  0083  6402  8301  022E  0401  7F00  8183  0100
0000157000  0001  0180  0001  0180  0001  0180  0001  0180
*
0000160060  0001  0180  0001  0180  0001  0180  0005  0078
0000160100  8483  0100  0001  0180  0001  0180  0001  0180
0000160120  0001  0180  0001  0180  0001  0180  0001  0180
*
0000163140  0001  0180  0001  0180  0018  8579  0140  8303
0000163160  044A  4B83  8204  280A  6E75  6174  6767  6465
0000163200  6929  0701  7800  1085  8301  0084  0A01  7F00
0000163220  8683  8300  0085  4983  0104  0015  827F  6902
0000163240  0064  0482  6973  657A  8204  7305  6170  6572
0000163260  0106  0001  0180  0001  0180  0001  0180  0001
0000163300  0180  0001  0180  0001  0180  0001  0180  0001
*
```

THU MAR 14 17:48:46 1991 TSL_IF.DLL PAGE 48, LINE 2774

```
0000163360  0180  0018  8579  0190  8305  045E  5F83  8204
0000163400  280A  6E75  6174  6767  6465  6929  0701  7800
0000163420  A885  8300  0080  1001  7F00  5D83  8304  0081
0000163440  8583  8300  045D  8583  0100  002A  827F  6E04
0000163460  6D61  0065  0482  7974  6570  8216  7309  7065
0000163500  7261  7461  726F  8218  7305  6968  7466  821A
0000163520  6304  7061  3073  0101  8000  0101  8000  0101
0000163540  8000  0101  8000  0101  8000  0101  8000  0101
*
0000163640  8000  0701  7A00  8373  045C  0082  0101  8000
0000163660  0101  8000  0101  8000  0101  8000  0101  8000
*
0000164140  0101  8000  1601  7900  0240  A383  8304  04A4
0000164160  0A82  7528  746E  6761  6567  2964  0169  0007
0000164200  837F  0082  8283  0100  0017  827F  6408  6665
0000164220  745F  6D69  0065  0882  696D  5F6E  6974  656D
0000164240  0104  0016  5079  8302  04A6  A783  8204  280A
0000164260  6E75  6174  6767  6465  6929  0701  7F00  8483
0000164300  8300  04A2  1001  7F00  0382  656B  0079  0682
0000164320  6974  696D  676E  0102  0001  0180  0001  0180
0000164340  0001  0180  0001  0180  0001  0180  0001  0180
*
0000165020  0019  6079  8304  04F8  F983  8204  430D  5652
0000165040  435F  4D4F  414D  444E  545F  0169  0007  737A
0000165060  F683  8204  0100  000D  837F  0081  8183  8300
0000165100  00C0  F783  0104  0024  827F  630C  6D6F  616D
0000165120  646E  745F  7079  0065  0482  6973  657A  8202
0000165140  6203  6675  8204  6E04  7865  0874  0101  8000
0000165160  0101  8000  0101  8000  0101  8000  0101  8000
0000165200  0101  8000  1601  7900  0340  0483  8305  0505
0000165220  0A82  7528  746E  6761  6567  2964  0169  0016
0000165240  2079  8302  0502  0383  8205  280A  6E75  6174
0000165260  6767  6465  6929  0701  7F00  8283  8300  0082
0000165300  1601  7F00  0882  696D  5F6E  6974  656D  8200
0000165320  7407  6365  5F68  6469  0100  000A  837F  0081
0000165340  8483  8300  0501  1A01  7F00  0482  7974  6570
0000165360  8200  6C08  636F  7461  6F69  026E  0482  6164
0000165400  6174  0104  0018  8579  0140  8302  0508  0983
0000165420  8205  280A  6E75  6174  6767  6465  6929  0501
0000165440  7800  8300  0500  0701  7F00  4883  8304  0507
0000165460  1101  7F00  0782  6567  5F6E  6468  0072  0382
0000165500  7562  2866  1601  7900  0340  0C83  8305  050D
0000165520  0A82  7528  746E  6761  6567  2964  0169  0007
0000165540  737A  0683  8205  0100  000A  837F  0508  8183
0000165560  8300  0081  1C01  7F00  0882  6574  6863  625F
0000165600  6675  8200  6907  6574  6E6D  6D75  8204  7003
0000165620  736F  0106  0001  0180  0001  0180  0001  0180
0000165640  0001  0180  0001  0180  0001  0180  0001  0180
*
0000165700  0001  0180  0007  8578  0090  8183  0100  0001
0000165720  0180  0007  737A  F683  8204  0100  0001  0180
0000165740  0001  0180  0001  0180  0001  0180  0001  0180
0000165760  0007  737A  F783  8204  0100  0001  0180  0001
0000166000  0180  0001  0180  0001  0180  0001  0180  0001
0000166020  0180  0016  2079  8304  052A  2B83  8205  280A
0000166040  6E75  6174  6767  6465  6929  0D01  7F00  F783
0000166060  8304  0080  C083  8300  0082  2C01  7F00  0B82
0000166100  7263  5F76  6F63  6D6D  6E61  0064  0682  656C
0000166120  5F78  6863  8200  6C07  7865  735F  7274  8200
```

```
THU MAR 14 17:48:46 1991  TSL_IF.DLL  PAGE 49, LINE 2833

0000166140  6C07  7865  695F  746E  0100  000A  8075  1C83
0000166160  6405  8302  052D  0701  7F00  8183  8300  0084
0000166200  0101  8000  0101  8000  0A01  7500  8380  0200
0000166220  0064  0183  0102  000A  8075  8183  6400  8300
0000166240  0201  0401  7F00  C083  0100  000A  8075  1C83
0000166260  6405  8301  0532  0701  7F00  8183  8300  0084
0000166300  0A01  7500  8380  051C  0264  3483  0105  0007
0000166320  737A  A583  8204  0100  0007  837F  0082  8183
0000166340  0100  000A  8075  1C83  6405  8302  0537  0701
0000166360  7A00  8373  04A2  0082  0401  7F00  8283  0100
0000166400  000A  8075  1C83  6405  8301  053A  0701  7F00
0000166420  F783  8304  04F7  0A01  7500  8380  051C  0264
0000166440  3C83  0105  000A  837F  04F7  F783  8304  0522
0000166460  0A01  7500  8380  051C  0364  3E83  0105  0004
0000166500  837F  04F7  0A01  7500  8380  051C  0164  4083
0000166520  0105  000A  8075  0083  6402  8300  0201  0401
0000166540  7F00  C083  0100  000A  8075  0083  6402  8301
0000166560  0543  0401  7F00  8183  0100  000A  8075  0083
0000166600  6402  8301  0545  0A01  7500  8380  0081  0064
0000166620  0183  0102  0001  0180  0001  0180  0001  0180
0000166640  0001  0180  0001  0180  0001  0180  0001  0180
*
0000172640  0001  0180  0018  8579  0140  8303  0407  0883
0000172660  8204  280A  6E75  6174  6767  6465  6929  0701
0000172700  7800  1085  8301  0084  0A01  7F00  8683  8300
0000172720  0085  0683  0104  0015  827F  6902  0064  0482
0000172740  6973  657A  8204  7305  6170  6572  0106  0001
0000172760  0180  0001  0180  0001  0180  0001  0180  0001
*
0000174120  0180  0001  0180  0016  4079  8303  04A7  A883
0000174140  8204  280A  6E75  6174  6767  6465  6929  1601
0000174160  7900  0220  A583  8304  04A6  0A82  7528  746E
0000174200  6761  6567  2964  0169  0007  837F  0082  8283
0000174220  0100  0016  827F  6D08  6E69  745F  6D69  0065
0000174240  0782  6574  6863  695F  0064  0A01  7F00  8183
0000174260  8300  0084  A483  0104  001A  827F  7404  7079
0000174300  0065  0882  6F6C  6163  6974  6E6F  8202  6404
0000174320  7461  0461  1801  7900  4085  0201  AB83  8304
0000174340  04AC  0A82  7328  746E  6761  6567  2964  0169
0000174360  0005  0078  A383  0104  0007  837F  0405  AA83
0000174400  0104  0011  827F  6707  6E65  685F  7264  8200
0000174420  6203  6675  0128  0016  4079  8303  04AF  B083
0000174440  8204  280A  6E75  6174  6767  6465  6929  0701
0000174460  7A00  8373  04A9  0082  0A01  7F00  AE83  8304
0000174500  0081  8183  0100  001C  827F  7408  6365  5F68
0000174520  7562  0066  0782  7469  6D65  756E  046D  0382
0000174540  6F70  0673  0701  7A00  8373  04AD  0082  0101
0000174560  8000  0101  8000  0101  8000  0101  8000  0101
0000174600  8000  0101  8000  0101  8000  0101  8000  0701
0000174620  7A00  8373  04A3  0082  0101  8000  0101  8000
0000174640  0401  7F00  B183  0104  000A  8075  0083  7302
0000174660  8301  04BD  0701  7F00  B183  8304  04A3  0A01
0000174700  7500  8380  0200  0273  BF83  0104  0007  837F
0000174720  04B1  C683  0100  000A  8075  8183  7300  8302
0000174740  04C1  0701  7F00  8683  8300  04B1  0A01  7500
0000174760  8380  0081  0273  C383  0104  0007  837F  04B1
0000175000  BA83  0104  000A  8075  8183  7300  8302  04C5
0000175020  1105  0001  0000  011F  0000  068A  018A  0010
0000175040  017F  0000  1004  7374  5F6C  6567  656E  6172
```

THU MAR 14 17:48:46 1991 TSL_IF.DLL PAGE 50, LINE 2892

| | | | | | | | | |
|---|---|---|---|---|---|---|---|---|
| 0000175060 | 5F6C | 7974 | 6570 | 040F | 0006 | 0081 | 7409 | 7079 |
| 0000175100 | 5F65 | 696B | 646E | 0408 | 0008 | 00C0 | 7302 | 1274 |
| 0000175120 | 0C04 | 8200 | 0C00 | 6574 | 6863 | 6C5F | 7369 | 5F74 |
| 0000175140 | 6469 | 040A | FFFA | 058F | 7204 | 7365 | 0170 | 1F02 |
| 0000175160 | 8A01 | 8C01 | A806 | 1000 | 9D00 | 0000 | 0400 | 6610 |
| 0000175200 | 7869 | 6D5F | 7974 | 6570 | 655F | 6576 | 746E | 0A73 |
| 0000175220 | 0604 | C000 | 0405 | 696C | 7473 | 0409 | FFFC | 0084 |
| 0000175240 | 6B03 | 7965 | 0201 | 0117 | 0232 | 0690 | 003A | 0016 |
| 0000175260 | 002C | 0000 | 0804 | 7374 | 5F6C | 7974 | 6570 | 0408 |
| 0000175300 | 000A | 00C0 | 7302 | 1274 | 0604 | 8200 | 0C00 | 6574 |
| 0000175320 | 6863 | 6C5F | 7369 | 5F74 | 6469 | 0201 | 0118 | 026C |
| 0000175340 | 0692 | 003A | 0016 | 002C | 0000 | 0904 | 7374 | 5F6C |
| 0000175360 | 744D | 7079 | 0865 | 0A04 | C000 | 0200 | 7473 | 0412 |
| 0000175400 | 0006 | 0082 | 740C | 6365 | 5F68 | 696C | 7473 | 695F |
| 0000175420 | 0164 | 1F02 | A601 | 9402 | 9D06 | 1000 | 9200 | 0000 |
| 0000175440 | 0400 | 7410 | 6C73 | 675F | 6E65 | 7265 | 6C61 | 6D5F |
| 0000175460 | 766F | 0D65 | 0604 | 8400 | 0700 | 6261 | 5F73 | 6572 |
| 0000175500 | 0B6C | 0804 | 8400 | 0500 | 6E75 | 7469 | 0773 | 0A04 |
| 0000175520 | 8100 | 0100 | 0778 | 0C04 | 8100 | 0100 | 0E79 | 0E04 |
| 0000175540 | 8100 | 0800 | 6564 | 5F66 | 6974 | 656D | 0412 | 0010 |
| 0000175560 | 0082 | 740C | 6365 | 5F68 | 696C | 7473 | 695F | 0964 |
| 0000175600 | EE04 | 66FF | 0305 | 736D | 0A67 | EA04 | 8FFF | 0405 |
| 0000175620 | 6572 | 7073 | 0201 | 0123 | 0343 | 0696 | 003F | 0016 |
| 0000175640 | 0031 | 0000 | 1404 | 7374 | 5F6C | 6F6D | 6576 | 6C5F |
| 0000175660 | 636F | 7461 | 726F | 615F | 7362 | 0407 | 000E | 0081 |
| 0000175700 | 7801 | 0407 | 000C | 0081 | 7901 | 040E | 000A | 0081 |
| 0000175720 | 6408 | 6665 | 745F | 6D69 | 1265 | 0604 | 8200 | 0C00 |
| 0000175740 | 6574 | 6863 | 6C5F | 7369 | 5F74 | 6469 | 0201 | 0123 |
| 0000175760 | 0382 | 0698 | 003F | 0016 | 0031 | 0000 | 1404 | 7374 |
| 0000176000 | 5F6C | 6F6D | 6576 | 6C5F | 636F | 7461 | 726F | 725F |
| 0000176020 | 6C65 | 0407 | 000E | 0081 | 7801 | 0407 | 000C | 0081 |
| 0000176040 | 7901 | 040E | 000A | 0081 | 6408 | 6665 | 745F | 6D69 |
| 0000176060 | 1265 | 0604 | 8200 | 0C00 | 6574 | 6863 | 6C5F | 7369 |
| 0000176100 | 5F74 | 6469 | 0201 | 0121 | 03C1 | 069A | 003F | 0016 |
| 0000176120 | 0031 | 0000 | 1204 | 7374 | 5F6C | 6F6D | 6576 | 6D5F |
| 0000176140 | 756F | 6573 | 615F | 7362 | 0407 | 000E | 0081 | 7801 |
| 0000176160 | 0407 | 000C | 0081 | 7901 | 040E | 000A | 0081 | 6408 |
| 0000176200 | 6665 | 745F | 6D69 | 1265 | 0604 | 8200 | 0C00 | 6574 |
| 0000176220 | 6863 | 6C5F | 7369 | 5F74 | 6469 | 0201 | 0121 | 040C |
| 0000176240 | 069C | 003F | 0016 | 0031 | 0000 | 1204 | 7374 | 5F6C |
| 0000176260 | 6F6D | 6576 | 6D5F | 756F | 6573 | 725F | 6C65 | 0407 |
| 0000176300 | 000E | 0081 | 7801 | 0407 | 000C | 0081 | 7901 | 040E |
| 0000176320 | 000A | 0081 | 6408 | 6665 | 745F | 6D69 | 1265 | 0604 |
| 0000176340 | 8200 | 0C00 | 6574 | 6863 | 6C5F | 7369 | 5F74 | 6469 |
| 0000176360 | 0201 | 0125 | 043F | 069E | 0094 | 0016 | 0086 | 0000 |
| 0000176400 | 1604 | 7374 | 5F6C | 6F6D | 6576 | 6C5F | 636F | 7461 |
| 0000176420 | 726F | 745F | 6172 | 6B63 | 040E | 0006 | 0082 | 7408 |
| 0000176440 | 6172 | 6B63 | 695F | 0A64 | FA04 | 8FFF | 0405 | 6572 |
| 0000176460 | 7073 | 0201 | 0118 | 04D3 | 069F | 0084 | 0016 | 0078 |
| 0000176500 | 0000 | 0904 | 7374 | 5F6C | 6567 | 5F74 | 0E78 | FA04 |
| 0000176520 | 8FFF | 0805 | 6572 | 7073 | 6E6F | 6573 | 0201 | 0118 |
| 0000176540 | 0557 | 06A0 | 0084 | 0016 | 0078 | 0000 | 0904 | 7374 |
| 0000176560 | 5F6C | 6567 | 5F74 | 0E79 | FA04 | 8FFF | 0805 | 6572 |
| 0000176600 | 7073 | 6E6F | 6573 | 0201 | 0127 | 05DB | 06A2 | 01E7 |
| 0000176620 | 0010 | 01DC | 0000 | 1804 | 7374 | 5F6C | 6567 | 656E |
| 0000176640 | 6172 | 5F6C | 6863 | 6365 | 5F6B | 6373 | 6572 | 6E65 |
| 0000176660 | 0417 | 0006 | 0085 | 6311 | 7061 | 7574 | 6572 | 735F |
| 0000176700 | 6769 | 616E | 7574 | 6572 | 040C | 0008 | 00C0 | 7306 |
| 0000176720 | 7263 | 6565 | 0E6E | 0C04 | 8200 | 0800 | 6564 | 5F66 |

THU MAR 14 17:48:46 1991 TSL_IF.DLL PAGE 51, LINE 2951

| | | | | | | | | |
|---|---|---|---|---|---|---|---|---|
| 0000176740 | 6974 | 656D | 0412 | 0010 | 0082 | 740C | 6365 | 5F68 |
| 0000176760 | 696C | 7473 | 695F | 0964 | D404 | 6FFF | 0305 | 736D |
| 0000177000 | 0E67 | C804 | 8FFF | 0805 | 6572 | 7073 | 6E6F | 6573 |
| 0000177020 | 040C | FFD0 | 0086 | 6906 | 676D | 695F | 0B64 | FC04 |
| 0000177040 | 81FF | 0500 | 7665 | 6E65 | 0C74 | CC04 | 81FF | 0600 |
| 0000177060 | 6572 | 7573 | 746C | 040A | FFCE | 0081 | 7304 | 6174 |
| 0000177100 | 0174 | 1F02 | C201 | A407 | 4006 | 1600 | 3200 | 0000 |
| 0000177120 | 0400 | 7410 | 6C73 | 635F | 6568 | 6B63 | 735F | 7263 |
| 0000177140 | 6565 | 0C6E | 0E04 | C000 | 0600 | 6373 | 6572 | 6E65 |
| 0000177160 | 040E | 000A | 0082 | 6408 | 6665 | 745F | 6D69 | 1265 |
| 0000177200 | 0604 | 8200 | 0C00 | 6574 | 6863 | 6C5F | 7369 | 5F74 |
| 0000177220 | 6469 | 0201 | 011C | 0802 | 06A6 | 0040 | 0016 | 0032 |
| 0000177240 | 0000 | 0D04 | 7374 | 5F6C | 6863 | 6365 | 5F6B | 6973 |
| 0000177260 | 0C67 | 0E04 | C000 | 0600 | 6373 | 6572 | 6E65 | 040E |
| 0000177300 | 000A | 0082 | 6408 | 6665 | 745F | 6D69 | 1265 | 0604 |
| 0000177320 | 8200 | 0C00 | 6574 | 6863 | 6C5F | 7369 | 5F74 | 6469 |
| 0000177340 | 0201 | 0120 | 0842 | 06A8 | 0024 | 0016 | 0016 | 0000 |
| 0000177360 | 1104 | 7374 | 5F6C | 6573 | 5F74 | 7865 | 6563 | 7470 |
| 0000177400 | 6F69 | 0C6E | 0A04 | C000 | 0600 | 6373 | 6572 | 6E65 |
| 0000177420 | 040D | 0006 | 00C0 | 6807 | 6E61 | 6C64 | 7265 | 0201 |
| 0000177440 | 0122 | 0866 | 06AA | 0024 | 0016 | 0016 | 0000 | 1304 |
| 0000177460 | 7374 | 5F6C | 6572 | 6573 | 5F74 | 7865 | 6563 | 7470 |
| 0000177500 | 6F69 | 0C6E | 0604 | C000 | 0600 | 6373 | 6572 | 6E65 |
| 0000177520 | 0201 | 0117 | 08BA | 06AC | 0094 | 0016 | 0086 | 0000 |
| 0000177540 | 0804 | 7374 | 5F6C | 6574 | 6863 | 040D | 0006 | 0082 |
| 0000177560 | 7407 | 6365 | 5F68 | 6469 | 040A | FFFA | 058F | 7204 |
| 0000177600 | 7365 | 0170 | 1D02 | 1E01 | AE09 | 9106 | 1600 | 8300 |
| 0000177620 | 0000 | 0400 | 740E | 6C73 | 735F | 7465 | 705F | 7261 |
| 0000177640 | 6D61 | 0C73 | 0604 | 4C00 | 0605 | 6170 | 6172 | 736D |
| 0000177660 | 040E | FFFA | 058F | 7208 | 7365 | 6F70 | 736E | 0165 |
| 0000177700 | 1D02 | AF01 | AF09 | 2A06 | 1600 | 1E00 | 0000 | 0400 |
| 0000177720 | 740E | 6C73 | 675F | 7465 | 705F | 7261 | 6D61 | 0173 |
| 0000177740 | 1E02 | D901 | B009 | 2A06 | 1600 | 1E00 | 0000 | 0400 |
| 0000177760 | 740F | 6C73 | 675F | 7465 | 635F | 6E6F | 6574 | 7478 |
| 0000200000 | 0201 | 0117 | 0A03 | 06B2 | 0276 | 0016 | 0268 | 0000 |
| 0000200020 | 0804 | 7374 | 5F6C | 6E69 | 7469 | 040F | 0006 | 00C0 |
| 0000200040 | 7409 | 7365 | 5F74 | 616E | 656D | 0410 | FEF0 | 05D4 |
| 0000200060 | 6B0A | 5F62 | 6174 | 6C62 | 5F65 | 1170 | E004 | 85FD |
| 0000200100 | 0B00 | 626B | 655F | 7272 | 6C5F | 6E69 | 1465 | EE04 |
| 0000200120 | 85FE | 0E00 | 626B | 765F | 6C61 | 6469 | 635F | 756F |
| 0000200140 | 746E | 040C | FEF4 | 0086 | 6406 | 6D75 | 695F | 0D64 |
| 0000200160 | E204 | 86FD | 0700 | 6574 | 7473 | 695F | 0E64 | EE04 |
| 0000200200 | 3AFD | 0805 | 7265 | 5F72 | 6170 | 6874 | 040E | FFFC |
| 0000200220 | 0085 | 6508 | 7272 | 6C5F | 6E69 | 0E65 | F804 | 3AFE |
| 0000200240 | 0805 | 626B | 5F64 | 616E | 656D | 0412 | FFF8 | 00C0 |
| 0000200260 | 740C | 706D | 6B5F | 6462 | 6E5F | 6D61 | 0E65 | E804 |
| 0000200300 | 85FD | 0800 | 7073 | 635F | 756F | 746E | 0412 | FDEA |
| 0000200320 | 0210 | 730C | 5F70 | 6170 | 6874 | 6C5F | 7369 | 0A74 |
| 0000200340 | E604 | 81FD | 0400 | 7473 | 7461 | 0005 | 0A78 | 0072 |
| 0000200360 | 040F | FDDC | 067A | 7409 | 7365 | 5F74 | 7461 | 7274 |
| 0000200400 | 0201 | 0201 | 0119 | 0C79 | 06B8 | 0124 | 0016 | 0118 |
| 0000200420 | 0000 | 0A04 | 7374 | 5F6C | 6966 | 696E | 6873 | 040A |
| 0000200440 | FFF8 | 0081 | 7304 | 6174 | 0A74 | FA04 | 8FFF | 0405 |
| 0000200460 | 6572 | 7073 | 0201 | 011D | 0D9D | 06B9 | 00A4 | 0010 |
| 0000200500 | 0099 | 0000 | 0E04 | 7374 | 5F6C | 6C63 | 736F | 5F65 |
| 0000200520 | 6964 | 6666 | 040A | FFF8 | 0081 | 7304 | 6174 | 0A74 |
| 0000200540 | FA04 | 8FFF | 0405 | 6572 | 7073 | 0201 | 011D | 0E41 |
| 0000200560 | 06BA | 0027 | 0016 | 001B | 0000 | 0E04 | 7374 | 5F6C |
| 0000200600 | 6C63 | 6165 | 5F72 | 6964 | 6666 | 0201 | 011C | 0E68 |

THU MAR 14 17:48:46 1991 TSL_IF.DLL PAGE 52, LINE 3010

| | | | | | | | | |
|---|---|---|---|---|---|---|---|---|
| 0000200620 | 06BC | 0292 | 0010 | 0287 | 0000 | 0D04 | 7374 | 5F6C |
| 0000200640 | 706F | 6E65 | 645F | 6669 | 0F66 | 0604 | C000 | 0900 |
| 0000200660 | 6574 | 7473 | 6E5F | 6D61 | 0D65 | 0A04 | 8600 | 0700 |
| 0000200700 | 6574 | 7473 | 695F | 0F64 | 0E04 | C000 | 0900 | 6964 |
| 0000200720 | 6666 | 6E5F | 6D61 | 1265 | E404 | C0FF | 0C00 | 6264 |
| 0000200740 | 645F | 6669 | 5F66 | 616E | 656D | 0411 | FFEA | 00C0 |
| 0000200760 | 700B | 7261 | 6E65 | 5F74 | 616E | 656D | 040F | FFFA |
| 0000201000 | 0086 | 6609 | 6961 | 656C | 5F64 | 6469 | 040F | FFF2 |
| 0000201020 | 0086 | 7009 | 7261 | 6E65 | 5F74 | 6469 | 040A | FFE8 |
| 0000201040 | 0081 | 7304 | 6174 | 0F74 | F604 | A0FF | 0904 | 6964 |
| 0000201060 | 6666 | 695F | 666E | 0A6F | EE04 | 8FFF | 0405 | 6572 |
| 0000201100 | 7073 | 0201 | 011D | 10FA | 06BF | 00A4 | 0016 | 0096 |
| 0000201120 | 0000 | 0E04 | 7374 | 5F6C | 6573 | 5F74 | 6576 | 6972 |
| 0000201140 | 7966 | 040C | 000A | 0085 | 7606 | 7265 | 6669 | 0F79 |
| 0000201160 | 0604 | C000 | 0900 | 6964 | 6666 | 6E5F | 6D61 | 0A65 |
| 0000201200 | FC04 | 81FF | 0400 | 7473 | 7461 | 0201 | 011D | 119E |
| 0000201220 | 06C1 | 002E | 0016 | 0020 | 0000 | 0E04 | 7374 | 5F6C |
| 0000201240 | 6573 | 5F74 | 6572 | 6F63 | 6472 | 0411 | 0006 | 0085 |
| 0000201260 | 720B | 6365 | 726F | 5F64 | 6C66 | 6761 | 0201 | 011E |
| 0000201300 | 11CC | 06C2 | 0028 | 0016 | 001C | 0000 | 0F04 | 7374 |
| 0000201320 | 5F6C | 6567 | 5F74 | 7973 | 6D73 | 646F | 0165 | 1D02 |
| 0000201340 | F401 | C311 | 2D06 | 1600 | 2100 | 0000 | 0400 | 740E |
| 0000201360 | 6C73 | 675F | 7465 | 735F | 6174 | 7574 | 0173 | 1902 |
| 0000201400 | 2101 | C412 | 9506 | 1600 | 8900 | 0000 | 0400 | 740A |
| 0000201420 | 6C73 | 625F | 7079 | 7361 | 0A73 | FA04 | 8FFF | 0405 |
| 0000201440 | 6572 | 7073 | 0201 | 011E | 12B6 | 06C5 | 0054 | 0016 |
| 0000201460 | 0048 | 0000 | 0F04 | 7374 | 5F6C | 6567 | 5F74 | 6574 |
| 0000201500 | 7473 | 695F | DA64 | FA04 | 7AFF | 0406 | 7461 | 7274 |
| 0000201520 | 0201 | 011E | 130A | 06C6 | 002C | 0016 | 0020 | 0000 |
| 0000201540 | 0F04 | 7374 | 5F6C | 6567 | 5F74 | 6964 | 6666 | 695F |
| 0000201560 | 0164 | 1E02 | 3601 | C813 | 2A06 | 1600 | 1C00 | 0000 |
| 0000201600 | 0400 | 740F | 6C73 | 735F | 7465 | 6C5F | 6E69 | 5F65 |
| 0000201620 | 6F6E | 040D | 0006 | 0085 | 6C07 | 6E69 | 5F65 | 6F6E |
| 0000201640 | 0201 | 011E | 1360 | 06C9 | 003A | 0016 | 002E | 0000 |
| 0000201660 | 0F04 | 7374 | 5F6C | 6567 | 5F74 | 696C | 656E | 6E5F |
| 0000201700 | 016F | 1A02 | 9A01 | CA13 | DA06 | 1003 | CF00 | 0003 |
| 0000201720 | 0400 | 720B | 6165 | 5F64 | 6170 | 6172 | 736D | 040A |
| 0000201740 | FFF6 | 0081 | 7304 | 6174 | 0A74 | F804 | 85FF | 0400 |
| 0000201760 | 6F62 | 6C6F | 040B | FFFA | 0086 | 7505 | 6F6C | 676E |
| 0000202000 | 0201 | 0512 | 0044 | 0005 | 0085 | 700A | 6572 | 7373 |
| 0000202020 | 695F | 5F73 | 1231 | E005 | 050F | B600 | 0A00 | 6663 |
| 0000202040 | 5F67 | 626F | 5F6A | 6469 | 0512 | 0046 | 0005 | 0536 |
| 0000202060 | 630A | 7275 | 705F | 7261 | 6D61 | 0573 | 000D | 1A00 |
| 0000202100 | 1500 | 2005 | 040D | 8100 | 0D00 | 7374 | 5F6C | 7974 |
| 0000202120 | 6570 | 6B5F | 6E69 | 1964 | C405 | 0504 | 8500 | 1100 |
| 0000202140 | 7374 | 5F6C | 6572 | 656C | 7361 | 5F65 | 6F63 | 6564 |
| 0000202160 | 1073 | 2205 | 040D | 6700 | 0806 | 7374 | 5F6C | 616D |
| 0000202200 | 6B72 | 0517 | 0000 | 0004 | 00C0 | 740F | 6C73 | 745F |
| 0000202220 | 7079 | 5F65 | 7473 | 6972 | 676E | 0516 | 0D34 | 0004 |
| 0000202240 | 00C0 | 740E | 6C73 | 745F | 7079 | 5F65 | 7473 | 7261 |
| 0000202260 | 1974 | 1C05 | 040D | C000 | 1105 | 7374 | 5F6C | 7974 |
| 0000202300 | 6570 | 635F | 6D6F | 616D | 646E | 1473 | 1005 | 040D |
| 0000202320 | 4D00 | 0C06 | 7374 | 5F6C | 7563 | 5F72 | 6574 | 6863 |
| 0000202340 | 0519 | 0328 | 0004 | 0657 | 7411 | 6C73 | 635F | 7275 |
| 0000202360 | 745F | 6365 | 5F68 | 696C | 7473 | 0512 | 0D40 | 0004 |
| 0000202400 | 0081 | 740A | 6C73 | 735F | 6174 | 7574 | 0F73 | AE05 |
| 0000202420 | 050E | 3900 | 0705 | 6F63 | 746E | 7865 | 1074 | DE05 |
| 0000202440 | 050F | 8400 | 0800 | 7563 | 5F72 | 6B6D | 7965 | 0516 |
| 0000202460 | 0042 | 0005 | 0084 | 720E | 6C65 | 6165 | 6573 | 5F64 |

THU MAR 14 17:48:46 1991 TSL_IF.DLL PAGE 53, LINE 3069

| | | | | | | | | |
|---|---|---|---|---|---|---|---|---|
| 0000202500 | 6B6D | 7965 | 0573 | 0111 | 0000 | 1C00 | 7401 | AB17 |
| 0000202520 | 5B04 | 1001 | 5000 | 0001 | 0400 | 680D | 6E61 | 6C64 |
| 0000202540 | 5F65 | 6966 | 746C | 7265 | 040C | 0006 | 00C0 | 6606 |
| 0000202560 | 6C69 | 6574 | 0A72 | 0A04 | 8100 | 0400 | 6F6D | 6564 |
| 0000202600 | 040C | FF22 | 0085 | 7206 | 7465 | 756E | 126D | 9E04 |
| 0000202620 | A9FF | 0C03 | 6966 | 746C | 7265 | 615F | 7474 | 3172 |
| 0000202640 | 0411 | FFF6 | 03B3 | 660B | 6C69 | 6574 | 5F72 | 7461 |
| 0000202660 | 7274 | 0409 | FF24 | 041C | 6D03 | 6773 | 040B | FF7E |
| 0000202700 | 03AF | 6605 | 616E | 656D | 040E | FFFA | 0432 | 7208 |
| 0000202720 | 7365 | 5F70 | 736D | 0C67 | 2004 | 81FF | 0600 | 6572 |
| 0000202740 | 7573 | 746C | 0201 | 011D | 18CF | 04AD | 0034 | 0016 |
| 0000202760 | 0026 | 0000 | 0E04 | 7374 | 5F6C | 6573 | 5F74 | 6966 |
| 0000203000 | 746C | 7265 | 040C | 0006 | 00C0 | 6606 | 6C69 | 6574 |
| 0000203020 | 0172 | 1F02 | 0301 | AF19 | 3404 | 1600 | 2600 | 0000 |
| 0000203040 | 0400 | 7410 | 6C73 | 725F | 7365 | 7465 | 665F | 6C69 |
| 0000203060 | 6574 | 0C72 | 0604 | C000 | 0600 | 6966 | 746C | 7265 |
| 0000203100 | 0201 | 0512 | 0D40 | 0004 | 0081 | 740A | 6C73 | 735F |
| 0000203120 | 6174 | 7574 | 0573 | 000D | 1A00 | 0500 | 0111 | 0000 |
| 0000203140 | 2000 | 3801 | 5719 | 6405 | 1600 | 5600 | 0000 | 0400 |
| 0000203160 | 7411 | 6C73 | 675F | 7465 | 745F | 7365 | 5F74 | 7461 |
| 0000203200 | 7274 | 040F | 000A | 00C0 | 7409 | 7365 | 5F74 | 616E |
| 0000203220 | 656D | 040A | 0006 | 04E1 | 6104 | 7474 | 0A72 | F804 |
| 0000203240 | 50FF | 0405 | 7469 | 6D65 | 040A | FFFC | 0081 | 7304 |
| 0000203260 | 6174 | 0174 | 1C02 | 9C01 | 5919 | 9505 | 1000 | 8A00 |
| 0000203300 | 0000 | 0400 | 670D | 7465 | 745F | 7365 | 5F74 | 7469 |
| 0000203320 | 6D65 | 040F | 0006 | 00C0 | 7409 | 7365 | 5F74 | 616E |
| 0000203340 | 656D | 040A | 000A | 0553 | 6904 | 6574 | 076D | FA04 |
| 0000203360 | 50FF | 0105 | 016C | 2202 | 3101 | 5A1A | 3B05 | 1600 |
| 0000203400 | 2F00 | 0000 | 0400 | 7413 | 6F6F | 6D5F | 6E61 | 5F79 |
| 0000203420 | 706F | 6E65 | 745F | 7365 | 7374 | 0201 | 011F | 1A6C |
| 0000203440 | 055B | 005A | 0010 | 004F | 0000 | 1004 | 6567 | 5F74 |
| 0000203460 | 756E | 5F6D | 666F | 745F | 7365 | 7374 | 0407 | FFFA |
| 0000203500 | 0550 | 6C01 | 040C | FFF8 | 0081 | 7206 | 7365 | 6C75 |
| 0000203520 | 0174 | 2302 | C601 | 5C1A | 4105 | 1600 | 3500 | 0000 |
| 0000203540 | 0400 | 7414 | 6C73 | 675F | 7465 | 635F | 7275 | 6572 |
| 0000203560 | 746E | 615F | 7474 | 0172 | 1F02 | 0701 | 5E1B | 5B05 |
| 0000203600 | 1602 | 4D00 | 0002 | 0400 | 7410 | 6C73 | 6F5F | 6570 |
| 0000203620 | 5F6E | 6574 | 7473 | 695F | 0D64 | 1004 | 8600 | 0700 |
| 0000203640 | 6574 | 7473 | 695F | 0F64 | 0C04 | C000 | 0900 | 6574 |
| 0000203660 | 7473 | 6E5F | 6D61 | 0D65 | 0A04 | 8500 | 0700 | 7962 |
| 0000203700 | 755F | 6573 | 0A72 | 0604 | E100 | 0404 | 7461 | 7274 |
| 0000203720 | 0408 | FFFA | 0550 | 7402 | 0A70 | F404 | 81FF | 0400 |
| 0000203740 | 7473 | 7461 | 040A | FFF6 | 04B5 | 7204 | 7365 | 0F70 |
| 0000203760 | 6805 | 0502 | 8100 | 0700 | 7563 | 5F72 | 726C | 0175 |
| 0000204000 | 1C02 | 6201 | 601D | 6705 | 1600 | 5900 | 0000 | 0400 |
| 0000204020 | 740D | 6C73 | 6F5F | 6570 | 5F6E | 6574 | 7473 | 040F |
| 0000204040 | 000A | 00C0 | 7409 | 7365 | 5F74 | 616E | 656D | 040A |
| 0000204060 | 0006 | 04E1 | 6104 | 7474 | 0A72 | F804 | 81FF | 0400 |
| 0000204100 | 7473 | 7461 | 040D | FFFA | 0086 | 7407 | 7365 | 5F74 |
| 0000204120 | 6469 | 0201 | 011E | 1DC9 | 0561 | 0244 | 0010 | 0239 |
| 0000204140 | 0000 | 0F04 | 6E75 | 6F6C | 6461 | 755F | 6E6E | 6565 |
| 0000204160 | 6564 | 0C64 | FA04 | C0FF | 0600 | 5F5F | 7974 | 6570 |
| 0000204200 | 040F | FFEE | 0085 | 5F09 | 625F | 5F78 | 7974 | 6570 |
| 0000204220 | 040D | FFDE | 0566 | 5F07 | 705F | 6972 | 746E | 040B |
| 0000204240 | FFD0 | 0202 | 5F05 | 6C5F | 6C76 | 040D | FFE2 | 0568 |
| 0000204260 | 5F07 | 635F | 6F6C | 6B63 | 040D | FFF2 | 00C0 | 5F07 |
| 0000204300 | 735F | 6174 | 6B63 | 040E | FFD6 | 0081 | 5F08 | 725F |
| 0000204320 | 7465 | 6176 | 076C | D804 | 50FF | 0105 | 0E6C | F604 |
| 0000204340 | 50FF | 0805 | 696D | 5F6E | 6574 | 7473 | 040A | FFDC |

THU MAR 14 17:48:46 1991 TSL_IF.DLL PAGE 54, LINE 3128

| | | | | | | | | |
|---|---|---|---|---|---|---|---|---|
| 0000204360 | 0081 | 7304 | 6174 | 0D74 | F004 | 81FF | 0700 | 696D |
| 0000204400 | 5F6E | 726C | 0E75 | 8E05 | 0502 | 6400 | 0605 | 5F5F |
| 0000204420 | 7566 | 636E | 0201 | 011D | 200D | 056A | 03C0 | 0010 |
| 0000204440 | 03B5 | 0000 | 0E04 | 6C63 | 736F | 5F65 | 6E75 | 656E |
| 0000204460 | 6465 | 6465 | 040C | FFF8 | 00C0 | 5F06 | 745F | 7079 |
| 0000204500 | 0F65 | E404 | 85FF | 0900 | 5F5F | 7862 | 745F | 7079 |
| 0000204520 | 0D65 | D404 | 66FF | 0705 | 5F5F | 7270 | 6E69 | 0B74 |
| 0000204540 | C404 | 02FF | 0502 | 5F5F | 766C | 0D6C | D804 | 68FF |
| 0000204560 | 0705 | 5F5F | 6C63 | 636F | 0D6B | EC04 | C0FF | 0700 |
| 0000204600 | 5F5F | 7473 | 6361 | 0E6B | CA04 | 81FF | 0800 | 5F5F |
| 0000204620 | 6572 | 7674 | 6C61 | 0407 | FFCC | 0550 | 6C01 | 040E |
| 0000204640 | FFF0 | 0550 | 6D08 | 6E69 | 745F | 7365 | 0A74 | D004 |
| 0000204660 | 81FF | 0400 | 7473 | 7461 | 040C | FFE6 | 0085 | 6206 |
| 0000204700 | 6675 | 6E5F | 106F | D204 | 85FF | 0A00 | 696D | 5F6E |
| 0000204720 | 7562 | 5F66 | 6F6E | 0410 | FFEA | 0085 | 630A | 7275 |
| 0000204740 | 6272 | 6675 | 6E5F | 0E6F | F604 | 85FF | 0800 | 6F6D |
| 0000204760 | 6964 | 6966 | 6465 | 040C | FFF4 | 0085 | 6C06 | 636F |
| 0000205000 | 656B | 0D64 | FC04 | 81FF | 0700 | 6F63 | 6E75 | 6574 |
| 0000205020 | 0C72 | C204 | 81FF | 0600 | 6572 | 7573 | 746C | 040D |
| 0000205040 | FFE8 | 0081 | 6D07 | 6E69 | 6C5F | 7572 | 050E | 02A6 |
| 0000205060 | 0005 | 056C | 5F06 | 665F | 6E75 | 0163 | 1D02 | CD01 |
| 0000205100 | 6F23 | E505 | 1601 | D700 | 0001 | 0400 | 740E | 6C73 |
| 0000205120 | 635F | 6F6C | 6573 | 745F | 7365 | 0F74 | 0604 | C000 |
| 0000205140 | 0900 | 6574 | 7473 | 6E5F | 6D61 | 0865 | F004 | 50FF |
| 0000205160 | 0205 | 6974 | 040A | FFF4 | 0550 | 7004 | 6572 | 0A76 |
| 0000205200 | F804 | 81FF | 0400 | 7473 | 7461 | 040A | FFFA | 04B5 |
| 0000205220 | 7204 | 7365 | 0170 | 2602 | B201 | 7125 | 0105 | 1603 |
| 0000205240 | F300 | 0002 | 0400 | 7417 | 6C73 | 675F | 7465 | 6F5F |
| 0000205260 | 6570 | 5F6E | 6574 | 7473 | 6E5F | 6D61 | 7365 | 040A |
| 0000205300 | 000A | 00C5 | 7404 | 7473 | 0A63 | 0604 | E900 | 0404 |
| 0000205320 | 7374 | 7674 | 040D | FFF6 | 00C0 | 5F07 | 735F | 6174 |
| 0000205340 | 6B63 | 040E | FFDE | 0081 | 5F08 | 725F | 7465 | 6176 |
| 0000205360 | 076C | E004 | 50FF | 0105 | 0C6C | FA04 | C0FF | 0600 |
| 0000205400 | 5F5F | 7974 | 6570 | 040F | FFF4 | 0085 | 5F09 | 625F |
| 0000205420 | 5F78 | 7974 | 6570 | 040D | FFE4 | 0566 | 5F07 | 705F |
| 0000205440 | 6972 | 746E | 040B | FFD8 | 0202 | 5F05 | 6C5F | 6C76 |
| 0000205460 | 040D | FFE8 | 0568 | 5F07 | 635F | 6F6C | 6B63 | 050E |
| 0000205500 | 02BE | 0005 | 0573 | 5F06 | 665F | 6E75 | 0163 | 2202 |
| 0000205520 | B301 | 7528 | 5905 | 1601 | 4B00 | 0001 | 0400 | 7413 |
| 0000205540 | 6C73 | 665F | 6572 | 5F65 | 6574 | 7473 | 6E5F | 6D61 |
| 0000205560 | 7365 | 040A | 000A | 0085 | 7404 | 7473 | 0A63 | 0604 |
| 0000205600 | 0500 | 0402 | 7374 | 7674 | 040C | FFFA | 00C0 | 5F06 |
| 0000205620 | 745F | 7079 | 0F65 | F204 | 85FF | 0900 | 5F5F | 7862 |
| 0000205640 | 745F | 7079 | 0D65 | E204 | 66FF | 0705 | 5F5F | 7270 |
| 0000205660 | 6E69 | 0B74 | DA04 | 02FF | 0502 | 5F5F | 766C | 0D6C |
| 0000205700 | E604 | 68FF | 0705 | 5F5F | 6C63 | 636F | 0D6B | F604 |
| 0000205720 | C0FF | 0700 | 5F5F | 7473 | 6361 | 0E6B | E004 | 81FF |
| 0000205740 | 0800 | 5F5F | 6572 | 7674 | 6C61 | 040C | FFF4 | 0085 |
| 0000205760 | 7406 | 7473 | 6E5F | 0E6F | DE05 | 0502 | 7700 | 0605 |
| 0000206000 | 5F5F | 7566 | 636E | 0201 | D50F | 0262 | 0005 | 0550 |
| 0000206020 | 6307 | 7275 | 6572 | 746E | 0512 | 0266 | 0005 | 0081 |
| 0000206040 | 6C0A | 616F | 6564 | 5F64 | 756E | 056D | 000D | 1A00 |
| 0000206060 | 0F00 | 5605 | 0502 | C000 | 0700 | 5F42 | 4678 | 6C69 |
| 0000206100 | 0F65 | 5A05 | 0502 | C000 | 0700 | 5F42 | 5078 | 6361 |
| 0000206120 | 146B | 0005 | 0000 | 8100 | 0C00 | 7842 | 445F | 6265 |
| 0000206140 | 6775 | 6F4D | 6564 | 0514 | 0000 | 0000 | 0081 | 420C |
| 0000206160 | 5F78 | 6954 | 656D | 4D73 | 646F | 1065 | 0005 | 0000 |
| 0000206200 | 8100 | 0800 | 7842 | 425F | 735F | 6769 | 050C | 025E |
| 0000206220 | 0005 | 0550 | 6C04 | 7369 | 0574 | 0111 | 0000 | 1D00 |

THU MAR 14 17:48:46 1991 TSL_IF.DLL PAGE 55, LINE 3187

| | | | | | | | | |
|---|---|---|---|---|---|---|---|---|
| 0000206240 | 0C01 | EE2A | B304 | 1008 | A800 | 0008 | 0400 | 740E |
| 0000206260 | 6C73 | 745F | 7079 | 5F65 | 6170 | 7372 | 0C65 | FA04 |
| 0000206300 | C0FF | 0600 | 5F5F | 7974 | 6570 | 040F | FE58 | 0085 |
| 0000206320 | 5F09 | 625F | 5F78 | 7974 | 6570 | 040D | FE46 | 04F2 |
| 0000206340 | 5F07 | 705F | 6972 | 746E | 040B | FE3A | 0202 | 5F05 |
| 0000206360 | 6C5F | 6C76 | 040D | FE4A | 04F4 | 5F07 | 635F | 6F6C |
| 0000206400 | 6B63 | 040D | FFF2 | 00C0 | 5F07 | 735F | 6174 | 6B63 |
| 0000206420 | 040E | FE40 | 0081 | 5F08 | 725F | 7465 | 6176 | 106C |
| 0000206440 | 5E04 | F5FE | 0A04 | 7473 | 7461 | 7365 | 6174 | 6B63 |
| 0000206460 | 0407 | FE56 | 0081 | 6A01 | 0407 | FE38 | 0081 | 6D01 |
| 0000206500 | 040B | FE42 | 04F6 | 7905 | 7079 | 7476 | 040E | FFF6 |
| 0000206520 | 0081 | 7408 | 706D | 7473 | 7461 | 0E65 | F804 | 81FF |
| 0000206540 | 0800 | 6D74 | 7470 | 6B6F | 6E65 | 040A | FFEE | 00C1 |
| 0000206560 | 7904 | 7079 | 0773 | 3604 | 81FE | 0100 | 0A6E | 5A04 |
| 0000206600 | F6FE | 0404 | 7979 | 7670 | 050E | 04B4 | 0005 | 04F0 |
| 0000206620 | 5F06 | 665F | 6E75 | 0C63 | E20B | 002A | 6507 | 736E |
| 0000206640 | 6174 | 6B63 | 0B0D | 2B31 | 0800 | 656E | 7377 | 6174 |
| 0000206660 | 6574 | 0B0F | 23E0 | 0A00 | 6564 | 6166 | 6C75 | 6174 |
| 0000206700 | 7463 | 0005 | 2CB3 | 0112 | 0408 | FE34 | 0081 | 7402 |
| 0000206720 | 0869 | 3204 | 81FE | 0200 | 6A74 | 0201 | 0B0D | 2DE7 |
| 0000206740 | 0800 | 7979 | 7265 | 6C72 | 6261 | 0B0C | 2E67 | 0700 |
| 0000206760 | 7979 | 6261 | 726F | 0574 | 7100 | 132E | 0801 | 3004 |
| 0000207000 | 81FE | 0200 | 6974 | 0408 | FE32 | 0081 | 7402 | 016A |
| 0000207020 | 0102 | 0C02 | 3C05 | 040D | C100 | 0400 | 7979 | 6978 |
| 0000207040 | 050B | 0008 | 0004 | 04EC | 7903 | 7679 | 051A | 04AC |
| 0000207060 | 0005 | 0081 | 7412 | 6C73 | 745F | 7079 | 5F65 | 6370 |
| 0000207100 | 7979 | 7265 | 6372 | 1A74 | AE05 | 0504 | 8100 | 1200 |
| 0000207120 | 7374 | 5F6C | 7974 | 6570 | 705F | 7963 | 6579 | 7272 |
| 0000207140 | 6C66 | 050E | 0338 | 0004 | 04ED | 7206 | 6465 | 6573 |
| 0000207160 | 1771 | B005 | 0504 | 8100 | 0F00 | 7374 | 5F6C | 7974 |
| 0000207200 | 6570 | 725F | 6465 | 6E63 | 1A74 | B205 | 0504 | 8100 |
| 0000207220 | 1200 | 7374 | 5F6C | 7974 | 6570 | 705F | 7963 | 7479 |
| 0000207240 | 6B6F | 6E65 | 0D05 | 0000 | 001A | 0519 | 0D1C | 0004 |
| 0000207260 | 046C | 7411 | 6C73 | 745F | 7079 | 5F65 | 6F63 | 6D6D |
| 0000207300 | 6E61 | 7364 | 0518 | 0D08 | 0004 | 046C | 7410 | 6C73 |
| 0000207320 | 745F | 7079 | 5F65 | 6F63 | 5F6D | 6E65 | 0F64 | 7E05 |
| 0000207340 | 0503 | C000 | 0700 | 5F42 | 4678 | 6C69 | 0F65 | 8205 |
| 0000207360 | 0503 | C000 | 0700 | 5F42 | 5078 | 6361 | 146B | 0005 |
| 0000207400 | 0000 | 8100 | 0C00 | 7842 | 445F | 6265 | 6775 | 6F4D |
| 0000207420 | 6564 | 0514 | 0000 | 0000 | 0081 | 420C | 5F78 | 6954 |
| 0000207440 | 656D | 4D73 | 646F | 1265 | 8605 | 0503 | A200 | 0A04 |
| 0000207460 | 7374 | 5F6C | 6863 | 616E | 656D | 0510 | 0334 | 0004 |
| 0000207500 | 04AA | 7908 | 7479 | 6966 | 656C | 0E70 | 3805 | 040D |
| 0000207520 | A300 | 0604 | 7979 | 766C | 6C61 | 0510 | 0330 | 0004 |
| 0000207540 | 00C0 | 7908 | 7479 | 6966 | 656C | 0D6E | 0C05 | 040D |
| 0000207560 | A300 | 0504 | 7979 | 6176 | 186C | 8805 | 0503 | 8100 |
| 0000207600 | 1000 | 7374 | 5F6C | 7974 | 6570 | 795F | 7479 | 6C66 |
| 0000207620 | 6761 | 050E | 0D18 | 0004 | 04E5 | 7306 | 6476 | 7270 |
| 0000207640 | 0F64 | 0405 | 0400 | E600 | 0704 | 7673 | 6E64 | 6D61 |
| 0000207660 | 0C73 | 3405 | 0507 | A900 | 0404 | 695F | 626F | 0517 |
| 0000207700 | 038A | 0005 | 04E8 | 740F | 6C73 | 745F | 7079 | 5F65 |
| 0000207720 | 7979 | 7865 | 6163 | 0516 | 0398 | 0005 | 04E9 | 740E |
| 0000207740 | 6C73 | 745F | 7079 | 5F65 | 7979 | 6361 | 1774 | D805 |
| 0000207760 | 0503 | EA00 | 0F04 | 7374 | 5F6C | 7974 | 6570 | 795F |
| 0000210000 | 7079 | 6361 | 1674 | 0605 | 0504 | E800 | 0E04 | 7374 |
| 0000210020 | 5F6C | 7974 | 6570 | 795F | 7079 | 6F67 | 0515 | 0414 |
| 0000210040 | 0005 | 04EB | 740D | 6C73 | 745F | 7079 | 5F65 | 7979 |
| 0000210060 | 3172 | 0515 | 0432 | 0005 | 04EB | 740D | 6C73 | 745F |
| 0000210100 | 7079 | 5F65 | 7979 | 3272 | 0516 | 0450 | 0005 | 04EA |

THU MAR 14 17:48:46 1991 TSL_IF.DLL PAGE 56, LINE 3246

| | | | | | | | | |
|---|---|---|---|---|---|---|---|---|
| 0000210120 | 740E | 6C73 | 745F | 7079 | 5F65 | 7979 | 6863 | 166B |
| 0000210140 | 7E05 | 0504 | EA00 | 0E04 | 7374 | 5F6C | 7974 | 6570 |
| 0000210160 | 795F | 6479 | 6665 | 1105 | 0001 | 0000 | 011C | 32C0 |
| 0000210200 | 0530 | 0021 | 0010 | 0016 | 0000 | 0D04 | 7374 | 5F6C |
| 0000210220 | 6E69 | 7469 | 745F | 7079 | 0165 | 1B02 | E101 | 3132 |
| 0000210240 | 4405 | 1002 | 3900 | 0002 | 0400 | 740C | 6C73 | 745F |
| 0000210260 | 7079 | 5F65 | 656C | 0778 | FA04 | 80FF | 0100 | 0E63 |
| 0000210300 | F604 | C0FF | 0800 | 6F74 | 736B | 6174 | 7472 | 040D |
| 0000210320 | FFFC | 0081 | 6E07 | 6D61 | 6C65 | 6E65 | 0201 | 011D |
| 0000210340 | 3525 | 0533 | 00F6 | 0010 | 00EB | 0000 | 0E04 | 7374 |
| 0000210360 | 5F6C | 7270 | 7365 | 5F73 | 616E | 656D | 040A | 0006 |
| 0000210400 | 00C0 | 6E04 | 6D61 | 0A65 | FA04 | 84FF | 0400 | 6F63 |
| 0000210420 | 6564 | 040C | FFF6 | 04F7 | 7206 | 7365 | 6C75 | 1074 |
| 0000210440 | FC04 | 84FF | 0A00 | 6873 | 6669 | 5F74 | 6F63 | 6564 |
| 0000210460 | 0201 | 0118 | 361B | 0535 | 0097 | 0010 | 008C | 0000 |
| 0000210500 | 0904 | 7374 | 5F6C | 6B6D | 656B | 1279 | 0604 | 8100 |
| 0000210520 | 0C00 | 6F63 | 6D6D | 6E61 | 5F64 | 7974 | 6570 | 0409 |
| 0000210540 | 0008 | 0084 | 6B03 | 7965 | 040D | FFF6 | 0536 | 6B07 |
| 0000210560 | 7965 | 6D5F | 6773 | 0411 | FFFA | 04F7 | 630B | 7672 |
| 0000210600 | 635F | 6D6F | 616D | 646E | 0201 | 011B | 36B2 | 0538 |
| 0000210620 | 0149 | 0010 | 013E | 0000 | 0C04 | 7374 | 5F6C | 6B6D |
| 0000210640 | 6974 | 696D | 676E | 040A | 0006 | 0082 | 7404 | 6D69 |
| 0000210660 | 0A65 | 0A04 | 8100 | 0400 | 7974 | 6570 | 0410 | FFF0 |
| 0000210700 | 0539 | 740A | 6D69 | 6E69 | 5F67 | 736D | 1167 | F404 |
| 0000210720 | F7FF | 0B04 | 7263 | 5F76 | 6F63 | 6D6D | 6E61 | 0B64 |
| 0000210740 | FC04 | 81FF | 0500 | 6E75 | 7469 | 0973 | F804 | 82FF |
| 0000210760 | 0300 | 616D | 0178 | 1902 | FB01 | 3B37 | 9105 | 1000 |
| 0000211000 | 8600 | 0000 | 0400 | 740A | 6C73 | 6D5F | 746B | 6365 |
| 0000211020 | 0D68 | 0604 | 8200 | 0700 | 6574 | 6863 | 695F | 1164 |
| 0000211040 | FA04 | F7FF | 0B04 | 7263 | 5F76 | 6F63 | 6D6D | 6E61 |
| 0000211060 | 0E64 | F604 | C2FF | 0800 | 6574 | 6863 | 6D5F | 6773 |
| 0000211100 | 0201 | 011F | 388C | 053D | 0079 | 0010 | 006E | 0000 |
| 0000211120 | 1004 | 7374 | 5F6C | 7061 | 6570 | 646E | 725F | 6769 |
| 0000211140 | 7468 | 040A | 0006 | 04F7 | 6C04 | 7369 | 0974 | 0A04 |
| 0000211160 | F700 | 0304 | 656E | 0D77 | FA04 | F7FF | 0704 | 6C6F |
| 0000211200 | 6C64 | 7369 | 0174 | 1E02 | 0501 | 3F39 | B305 | 1000 |
| 0000211220 | A800 | 0000 | 0400 | 740F | 6C73 | 665F | 7361 | 5F74 |
| 0000211240 | 7061 | 6570 | 646E | 040A | 0006 | 04F7 | 6C04 | 7369 |
| 0000211260 | 0974 | 0A04 | F700 | 0304 | 656E | 0977 | 0E04 | 2200 |
| 0000211300 | 0305 | 6E65 | 0C64 | FA04 | F7FF | 0604 | 6E65 | 6E64 |
| 0000211320 | 7765 | 0201 | 0122 | 39B8 | 0541 | 013B | 0010 | 0130 |
| 0000211340 | 0000 | 1304 | 7374 | 5F6C | 7061 | 6570 | 646E | 725F |
| 0000211360 | 6C65 | 6165 | 6573 | 0A73 | 0604 | F700 | 0404 | 696C |
| 0000211400 | 7473 | 040C | FFEC | 04F7 | 7006 | 6572 | 7373 | 0A70 |
| 0000211420 | FA04 | F7FF | 0404 | 6572 | 706C | 040A | FFF2 | 0473 |
| 0000211440 | 6104 | 7474 | 0972 | F604 | 84FF | 0300 | 656B | 1279 |
| 0000211460 | F804 | 85FF | 0C00 | 756D | 7473 | 725F | 6C65 | 6165 |
| 0000211500 | 6573 | 040A | FFF0 | 0081 | 7304 | 6174 | 0174 | 1E02 |
| 0000211520 | F301 | 423A | F905 | 1000 | EE00 | 0000 | 0400 | 740F |
| 0000211540 | 6C73 | 745F | 6365 | 5F68 | 7075 | 6164 | 6574 | 0411 |
| 0000211560 | FFFA | 04F7 | 630B | 7672 | 635F | 6D6F | 616D | 646E |
| 0000211600 | 0201 | 011D | 3BEC | 0544 | 0026 | 0010 | 001B | 0000 |
| 0000211620 | 0E04 | 7374 | 5F6C | 7974 | 6570 | 655F | 7272 | 726F |
| 0000211640 | 0407 | 0006 | 00C0 | 7301 | 0201 | 0116 | 3C12 | 0546 |
| 0000211660 | 002C | 0010 | 0021 | 0000 | 0704 | 7374 | 5F6C | 7265 |
| 0000211700 | 0A72 | 0604 | 8100 | 0400 | 7473 | 7461 | 0201 | 0D05 |
| 0000211720 | 0000 | 001A | 0515 | 0D20 | 0004 | 0081 | 740D | 6C73 |
| 0000211740 | 745F | 7079 | 5F65 | 696B | 646E | 0519 | 04C4 | 0005 |
| 0000211760 | 0085 | 7411 | 6C73 | 725F | 6C65 | 6165 | 6573 | 635F |

THU MAR 14 17:48:46 1991 TSL_IF.DLL PAGE 57, LINE 3305

| | | | | | | | | |
|---|---|---|---|---|---|---|---|---|
| 0000212000 | 646F | 7365 | 0510 | 0D22 | 0004 | 051A | 7408 | 6C73 |
| 0000212020 | 6D5F | 7261 | 176B | 0005 | 0400 | C000 | 0F00 | 7374 |
| 0000212040 | 5F6C | 7974 | 6570 | 735F | 7274 | 6E69 | 1667 | 3405 |
| 0000212060 | 040D | C000 | 0E00 | 7374 | 5F6C | 7974 | 6570 | 735F |
| 0000212100 | 6174 | 7472 | 0519 | 0D1C | 0004 | 04F7 | 7411 | 6C73 |
| 0000212120 | 745F | 7079 | 5F65 | 6F63 | 6D6D | 6E61 | 7364 | 0518 |
| 0000212140 | 0D08 | 0004 | 04F7 | 7410 | 6C73 | 745F | 7079 | 5F65 |
| 0000212160 | 6F63 | 5F6D | 6E65 | 1464 | 1005 | 040D | 0000 | 0C05 |
| 0000212200 | 7374 | 5F6C | 7563 | 5F72 | 6574 | 6863 | 0519 | 0328 |
| 0000212220 | 0004 | 050A | 7411 | 6C73 | 635F | 7275 | 745F | 6365 |
| 0000212240 | 5F68 | 696C | 7473 | 050E | 0B92 | 0005 | 02BE | 5F06 |
| 0000212260 | 7463 | 7079 | 0E65 | 3805 | 040D | 2900 | 0605 | 7979 |
| 0000212300 | 766C | 6C61 | 0512 | 04C6 | 0005 | 0085 | 690A | 736E |
| 0000212320 | 6469 | 5F65 | 6573 | 0571 | 0111 | 0000 | 2000 | 3E01 |
| 0000212340 | BE3C | 4204 | 1600 | 3400 | 0000 | 0400 | 7411 | 5F6D |
| 0000212360 | 6E69 | 7469 | 745F | 6365 | 5F68 | 696C | 7473 | 040A |
| 0000212400 | 0006 | 04B1 | 6C04 | 7369 | 0174 | 1A02 | 8001 | C03C |
| 0000212420 | 9D04 | 1600 | 8F00 | 0000 | 0400 | 740B | 5F6D | 6461 |
| 0000212440 | 5F64 | 6574 | 6863 | 040A | 000E | 04B1 | 6C04 | 7369 |
| 0000212460 | 0A74 | 0604 | A300 | 0404 | 7469 | 6D65 | 0201 | 0121 |
| 0000212500 | 3D1D | 04C2 | 00A7 | 0016 | 0099 | 0000 | 1204 | 6D74 |
| 0000212520 | 665F | 756C | 6873 | 745F | 6365 | 5F68 | 696C | 7473 |
| 0000212540 | 040A | 000A | 04B1 | 6C04 | 7369 | 1274 | 0604 | C600 |
| 0000212560 | 0C00 | 6574 | 6863 | 6C5F | 7369 | 5F74 | 6469 | 040A |
| 0000212600 | FFFC | 0081 | 7304 | 6174 | 0174 | 1F02 | C401 | C43D |
| 0000212620 | AC04 | 1600 | 9E00 | 0000 | 0400 | 7410 | 5F6D | 6567 |
| 0000212640 | 5F74 | 6574 | 6863 | 6C5F | 7369 | 1274 | 0A04 | 8600 |
| 0000212660 | 0C00 | 6574 | 6863 | 6C5F | 7369 | 5F74 | 6469 | 040A |
| 0000212700 | 0006 | 04B1 | 6C04 | 7369 | 0E74 | FA04 | 82FF | 0800 |
| 0000212720 | 626F | 5F6A | 6973 | 657A | 040A | FFF8 | 0081 | 7304 |
| 0000212740 | 6174 | 0174 | 1A02 | 7001 | C63E | 7E04 | 1600 | 7000 |
| 0000212760 | 0000 | 0400 | 740B | 5F6D | 6567 | 5F74 | 6574 | 6863 |
| 0000213000 | 040A | 000A | 04B1 | 6C04 | 7369 | 0A74 | 0604 | BA00 |
| 0000213020 | 0404 | 7469 | 6D65 | 0201 | 0D05 | 0000 | 001A | 7408 |
| 0000213040 | 6C73 | 695F | 2E66 | 0163 | 4900 | 9B01 | 0000 | 9E00 |
| 0000213060 | 1000 | A000 | 1B00 | A100 | 2600 | A200 | 3400 | A300 |
| 0000213100 | 4700 | A500 | 5A00 | A600 | 6B00 | A700 | 7C00 | A900 |
| 0000213120 | 8100 | AA00 | 8600 | AB00 | A700 | AC00 | AC00 | AF00 |
| 0000213140 | B200 | B000 | BB00 | B300 | D100 | B400 | E300 | B500 |
| 0000213160 | EE00 | B800 | F100 | BA00 | 2600 | BB01 | 2900 | BD01 |
| 0000213200 | 3B00 | C201 | 3E00 | C301 | 4900 | C501 | 4C00 | C601 |
| 0000213220 | 4F00 | CC01 | 7F00 | D601 | 8A00 | D901 | 9A00 | DB01 |
| 0000213240 | B900 | DD01 | D100 | DF01 | DE00 | E001 | FC00 | E101 |
| 0000213260 | 0300 | E202 | 0600 | E402 | 0F00 | E602 | 1C00 | E802 |
| 0000213300 | 2400 | E902 | E700 | 0502 | 3201 | 0602 | 4801 | 0702 |
| 0000213320 | 5E01 | 1F02 | 6C01 | 2002 | 8201 | 2102 | 9801 | 3902 |
| 0000213340 | A601 | 3F02 | B601 | 4002 | BC01 | 4102 | C201 | 4202 |
| 0000213360 | C801 | 4302 | CE01 | 4402 | D801 | 4602 | E201 | 4802 |
| 0000213400 | 1201 | 4903 | 1501 | 4A03 | 3501 | 4B03 | 3801 | 6303 |
| 0000213420 | 4301 | 6503 | 5901 | 6603 | 7401 | 6F03 | 8201 | 7103 |
| 0000213440 | 9801 | 7203 | B301 | 7B03 | C101 | 7D03 | D701 | 7E03 |
| 0000213460 | F201 | 8703 | 0001 | 8904 | 1601 | 8A04 | 3101 | 9E04 |
| 0000213500 | 3F01 | A204 | 5501 | A404 | 6F01 | A704 | 9F01 | A804 |
| 0000213520 | A201 | A904 | C201 | AA04 | C501 | BC04 | D301 | BF04 |
| 0000213540 | E901 | C104 | 1801 | C305 | 1E01 | C405 | 3B01 | C605 |
| 0000213560 | 4101 | C705 | 4B01 | D905 | 5701 | DC05 | 6D01 | DE05 |
| 0000213600 | 9C01 | E005 | A201 | E105 | BF01 | E305 | C501 | E405 |
| 0000213620 | CF01 | FB05 | DB01 | 0605 | EB02 | 0705 | 0102 | 0806 |
| 0000213640 | 0C02 | 0A06 | 0F02 | 0B06 | 1B02 | 0C06 | 2702 | 1206 |

THU MAR 14 17:48:46 1991 TSL_IF.DLL PAGE 58, LINE 3364

| | | | | | | | | |
|---|---|---|---|---|---|---|---|---|
| 0000213660 | 3A02 | 1306 | 7002 | 1406 | 8602 | 1506 | 9502 | 1606 |
| 0000213700 | 9802 | 1906 | 9B02 | 1C06 | AC02 | 2306 | DF02 | 2506 |
| 0000213720 | 2502 | 2A07 | 3002 | 2B07 | 4602 | 2D07 | 5102 | 2E07 |
| 0000213740 | 5602 | 3107 | 5902 | 3207 | 5E02 | 3507 | 6102 | 3607 |
| 0000213760 | 6602 | 3907 | 6902 | 3A07 | 6E02 | 3C07 | 7102 | 4107 |
| 0000214000 | 8E02 | 4307 | B702 | 5907 | C202 | 5A07 | D802 | 5B07 |
| 0000214020 | F402 | 7107 | 0202 | 7208 | 1802 | 7308 | 3402 | 8608 |
| 0000214040 | 4202 | 8708 | 5802 | 9908 | 6602 | 9A08 | 7C02 | C308 |
| 0000214060 | 8A02 | C608 | A002 | C708 | BA02 | CA08 | EA02 | CB08 |
| 0000214100 | ED02 | CC08 | 0D02 | CD09 | 1002 | E109 | 1E02 | E409 |
| 0000214120 | 3402 | E709 | 6502 | E809 | 6802 | E909 | 8802 | EA09 |
| 0000214140 | 8B02 | EB09 | A102 | FD09 | AF02 | FE09 | C502 | FF09 |
| 0000214160 | CD02 | 1209 | D903 | 1309 | EF03 | 1409 | F703 | 2609 |
| 0000214200 | 0303 | 290A | 1903 | 2A0A | 2303 | 2D0A | 2D03 | 370A |
| 0000214220 | 4C03 | 380A | 5203 | 390A | 5A03 | 3A0A | 5F03 | 3B0A |
| 0000214240 | 6503 | 3D0A | 6D03 | 440A | 7803 | 460A | A603 | 470A |
| 0000214260 | B103 | 480A | DF03 | 4B0A | EA03 | 4C0A | 0C03 | 500B |
| 0000214300 | 1703 | 510B | 1F03 | 540B | 5603 | 560B | 6103 | 570B |
| 0000214320 | 6603 | 5A0B | 6F03 | 5D0B | 9F03 | 620B | B003 | 660B |
| 0000214340 | B603 | 690B | E103 | 6A0B | F803 | 6C0B | 0B03 | 6F0C |
| 0000214360 | 4503 | 700C | 5003 | 720C | 5D03 | 730C | 6B03 | 850C |
| 0000214400 | 7903 | 8A0C | 8F03 | 8C0C | A103 | 8D0C | B603 | 8E0C |
| 0000214420 | CF03 | 8F0C | DA03 | 900C | FA03 | 910C | 0503 | 930D |
| 0000214440 | 3503 | 940D | 4E03 | 950D | 5903 | 960D | 7903 | 980D |
| 0000214460 | 8403 | 990D | 9103 | A60D | 9D03 | AB0D | AD03 | AC0D |
| 0000214500 | D003 | AD0D | D603 | AE0D | F103 | B00D | F703 | B10D |
| 0000214520 | 0903 | B20E | 2203 | B30E | 2803 | B50E | 3003 | B60E |
| 0000214540 | 3603 | C80E | 4103 | C90E | 5703 | CA0E | 5C03 | DD0E |
| 0000214560 | 6803 | E40E | 7803 | E50E | 8F03 | ED0E | 9503 | EE0E |
| 0000214600 | AB03 | F10E | B103 | F20E | E303 | F60E | 0103 | F80F |
| 0000214620 | 2403 | F90F | 3503 | FA0F | 3803 | FF0F | 4003 | 010F |
| 0000214640 | 6D04 | 050F | 9604 | 060F | 9E04 | 080F | A404 | 090F |
| 0000214660 | AC04 | 0B0F | BF04 | 0C0F | CF04 | 0D0F | EB04 | 0E0F |
| 0000214700 | F704 | 100F | 2904 | 1210 | 2F04 | 1710 | 5704 | 1910 |
| 0000214720 | 5D04 | 1C10 | 9004 | 1D10 | 9604 | 1E10 | B104 | 2010 |
| 0000214740 | B704 | 2210 | C504 | 2310 | D704 | 2510 | E904 | 2610 |
| 0000214760 | EF04 | 3B10 | FA04 | 3E10 | 1004 | 3F11 | 1904 | 4211 |
| 0000215000 | 2C04 | 4511 | 5904 | 4711 | 5F04 | 4811 | 6504 | 4911 |
| 0000215020 | 6804 | 4A11 | 7E04 | 4B11 | 8404 | 5011 | 8A04 | 5111 |
| 0000215040 | 9004 | 6611 | 9E04 | 6711 | B404 | 6811 | BE04 | 7A11 |
| 0000215060 | CC04 | 7B11 | E204 | 7C11 | E804 | 8C11 | F404 | 8D11 |
| 0000215100 | 0A04 | 8E12 | 1504 | A312 | 2104 | A612 | 3704 | A712 |
| 0000215120 | 6604 | A812 | 7104 | A912 | 9904 | AA12 | A404 | AB12 |
| 0000215140 | AA04 | BC12 | B604 | BF12 | CC04 | C012 | D704 | C112 |
| 0000215160 | E204 | C212 | EB04 | C312 | EE04 | C412 | FE04 | D512 |
| 0000215200 | 0A04 | D613 | 2004 | D713 | 2A04 | EA13 | 3604 | EC13 |
| 0000215220 | 4C04 | ED13 | 5204 | 0013 | 6005 | 0313 | 7605 | 0413 |
| 0000215240 | 8E05 | 0E13 | 9A05 | 1313 | AA05 | 1513 | D405 | 1713 |
| 0000215260 | DA05 | 1913 | 0405 | 1B14 | 0A05 | 1D14 | 3405 | 1F14 |
| 0000215300 | 3A05 | 2114 | 6405 | 2314 | 6A05 | 2514 | 9405 | 2714 |
| 0000215320 | 9A05 | 2914 | C405 | 2B14 | CA05 | 2D14 | F405 | 2F14 |
| 0000215340 | FA05 | 3114 | 2405 | 3315 | 2A05 | 3515 | 5405 | 4415 |
| 0000215360 | 5A05 | 4615 | 8405 | 4815 | 8A05 | 4A15 | B405 | 4C15 |
| 0000215400 | BA05 | 4E15 | E405 | 5015 | EA05 | 5215 | 1405 | 5416 |
| 0000215420 | 1A05 | 5616 | 4405 | 5816 | 4A05 | 5A16 | 7405 | 5C16 |
| 0000215440 | 7A05 | 5E16 | A405 | 6016 | AA05 | 6216 | D405 | 6416 |
| 0000215460 | DA05 | 6616 | 0005 | 6817 | 0605 | 6A17 | 2C05 | 6C17 |
| 0000215500 | 3205 | 6E17 | 5305 | 7017 | 6305 | 7117 | 6905 | 0A17 |
| 0000215520 | 7374 | 5F6C | 6C66 | 7274 | 632E | 0001 | 001C | 003E |

THU MAR 14 17:48:46 1991 TSL_IF.DLL PAGE 59, LINE 3423

| | | | | | | | | |
|---|---|---|---|---|---|---|---|---|
| 0000215540 | 1774 | 0049 | 1784 | 004A | 179A | 004B | 17A5 | 004D |
| 0000215560 | 17A8 | 004F | 17BC | 0051 | 17C5 | 0055 | 17CB | 0057 |
| 0000215600 | 17F2 | 0058 | 1807 | 0059 | 1817 | 005A | 181E | 005C |
| 0000215620 | 1824 | 005D | 1827 | 005E | 183E | 0062 | 1845 | 0064 |
| 0000215640 | 1861 | 0065 | 1879 | 0067 | 187F | 006D | 1892 | 006F |
| 0000215660 | 18C1 | 0070 | 18C4 | 0082 | 18CF | 0083 | 18E5 | 0084 |
| 0000215700 | 18F5 | 0096 | 1903 | 0097 | 1919 | 0098 | 1929 | 7407 |
| 0000215720 | 7365 | 7374 | 632E | 0001 | 00AC | 0068 | 1938 | 006C |
| 0000215740 | 194E | 006D | 1972 | 006E | 1978 | 006F | 1988 | 0070 |
| 0000215760 | 198E | 007B | 199C | 007E | 19AC | 007F | 19DA | 0080 |
| 0000216000 | 19F6 | 0081 | 19F9 | 0082 | 1A07 | 0083 | 1A17 | 0084 |
| 0000216020 | 1A1D | 0085 | 1A20 | 0086 | 1A26 | 0099 | 1A31 | 009A |
| 0000216040 | 1A47 | 009B | 1A60 | 00A7 | 1A6C | 00A9 | 1A7C | 00AB |
| 0000216060 | 1A81 | 00AC | 1AB2 | 00AE | 1AB5 | 00AF | 1ABB | 00C0 |
| 0000216100 | 1AC6 | 00C1 | 1ADC | 00C2 | 1AE8 | 00C4 | 1AF1 | 00C5 |
| 0000216120 | 1AFB | 00DA | 1B07 | 00E2 | 1B1D | 00E4 | 1B33 | 00E7 |
| 0000216140 | 1B3C | 00EB | 1B44 | 00EE | 1B47 | 00EF | 1B4D | 00F1 |
| 0000216160 | 1B62 | 00F2 | 1B6F | 00F3 | 1B7C | 00F7 | 1B82 | 00F8 |
| 0000216200 | 1B9E | 00FA | 1BA4 | 00FB | 1BB8 | 00FC | 1BCB | 00FE |
| 0000216220 | 1BD5 | 0104 | 1BE0 | 0105 | 1C09 | 0107 | 1C0F | 0109 |
| 0000216240 | 1C3D | 010B | 1C43 | 010C | 1C57 | 010E | 1C64 | 010F |
| 0000216260 | 1C76 | 0111 | 1C7C | 0113 | 1CAF | 0114 | 1CB5 | 0115 |
| 0000216300 | 1CD0 | 0117 | 1CD6 | 0118 | 1CE2 | 0119 | 1CED | 011A |
| 0000216320 | 1CFA | 011B | 1D09 | 011C | 1D17 | 011D | 1D1B | 011E |
| 0000216340 | 1D25 | 011F | 1D2A | 0121 | 1D34 | 0122 | 1D3E | 0124 |
| 0000216360 | 1D4E | 0125 | 1D54 | 0138 | 1D62 | 013C | 1D78 | 013D |
| 0000216400 | 1D99 | 0142 | 1D9F | 0144 | 1DBB | 014D | 1DC9 | 014E |
| 0000216420 | 1DD9 | 0151 | 1E6C | 0153 | 1E71 | 0154 | 1E9F | 0155 |
| 0000216440 | 1EBD | 0156 | 1EC9 | 0158 | 1ED4 | 015A | 1ED7 | 015E |
| 0000216460 | 1F31 | 015F | 1F48 | 0160 | 1F60 | 0162 | 1F77 | 0163 |
| 0000216500 | 1F7B | 0165 | 1F85 | 0166 | 2002 | 0175 | 200D | 0176 |
| 0000216520 | 201D | 017B | 20B0 | 017F | 20B8 | 0180 | 20BD | 0183 |
| 0000216540 | 20C2 | 0184 | 20F5 | 0185 | 2103 | 0186 | 211B | 018A |
| 0000216560 | 2198 | 018B | 21A3 | 018C | 21A6 | 018D | 21BB | 018E |
| 0000216600 | 2238 | 018F | 2243 | 0190 | 2255 | 0191 | 2258 | 0192 |
| 0000216620 | 2268 | 0193 | 2274 | 0194 | 227A | 0198 | 2285 | 019A |
| 0000216640 | 2288 | 019B | 2291 | 019C | 2294 | 019D | 2297 | 019E |
| 0000216660 | 229A | 019F | 22B6 | 01A1 | 2333 | 01A3 | 233B | 01A5 |
| 0000216700 | 2344 | 01A6 | 23C2 | 01B9 | 23CD | 01BE | 23E3 | 01BF |
| 0000216720 | 2407 | 01C1 | 240D | 01C2 | 2430 | 01C3 | 2436 | 01C4 |
| 0000216740 | 2451 | 01C6 | 2457 | 01C7 | 2478 | 01C9 | 249D | 01CB |
| 0000216760 | 24A3 | 01CC | 24B1 | 01CE | 24B5 | 01CF | 24CC | 01D0 |
| 0000217000 | 24E0 | 01D1 | 24E3 | 01D2 | 2523 | 01D3 | 2526 | 01D6 |
| 0000217020 | 2540 | 01DB | 2557 | 01DC | 256A | 01DD | 257F | 01DE |
| 0000217040 | 2582 | 01E4 | 2590 | 01E5 | 259E | 01E6 | 25A4 | 01FD |
| 0000217060 | 25B2 | 01FE | 25C8 | 0202 | 265B | 0203 | 2671 | 0204 |
| 0000217100 | 2680 | 0206 | 26FD | 0207 | 2705 | 0209 | 2733 | 020A |
| 0000217120 | 2763 | 020B | 277E | 020C | 27FB | 020D | 281F | 020E |
| 0000217140 | 2825 | 020F | 2828 | 0210 | 28A5 | 0225 | 28B3 | 0226 |
| 0000217160 | 28C9 | 022A | 295C | 022B | 2972 | 022C | 298A | 022D |
| 0000217200 | 298D | 022F | 299B | 0230 | 29FE | 7406 | 7079 | 2E65 |
| 0000217220 | 0179 | 6200 | BF00 | 0C00 | C02A | 1C00 | C82A | B500 |
| 0000217240 | C92A | BA00 | CD2A | C000 | CE2A | C600 | CF2A | CC00 |
| 0000217260 | D02A | D600 | D72A | E200 | D82A | F900 | D92A | 0500 |
| 0000217300 | DB2B | 0B00 | DC2B | 1400 | DD2B | 1900 | E12B | 3100 |
| 0000217320 | E22B | 3E00 | E52B | 4C00 | E62B | 6E00 | E92B | 8C00 |
| 0000217340 | ED2B | A800 | EE2B | AE00 | EF2B | C800 | F02B | CF00 |
| 0000217360 | F12B | DD00 | F82B | E000 | F92B | F500 | FA2B | 1700 |
| 0000217400 | FB2C | 5E00 | FC2C | 8D00 | FD2C | A900 | FF2C | B300 |

THU MAR 14 17:48:46 1991 TSL_IF.DLL PAGE 60, LINE 3482

| | | | | | | | | |
|---|---|---|---|---|---|---|---|---|
| 0000217420 | 002C | DA01 | 012C | E801 | 022C | 0601 | 032D | 0C01 |
| 0000217440 | 042D | 2501 | 052D | 4301 | 062D | 6401 | 072D | 9201 |
| 0000217460 | 082D | AC01 | 092D | AF01 | 0B2D | C501 | 102D | CB01 |
| 0000217500 | 112D | D501 | 132D | DB01 | 152D | E701 | 182D | EB01 |
| 0000217520 | 1A2D | F101 | 1B2D | FD01 | 1C2D | 1001 | 1D2E | 3B01 |
| 0000217540 | 1E2E | 4801 | 202E | 4B01 | 272E | 5B01 | 282E | 5F01 |
| 0000217560 | 292E | 6401 | 2D2E | 6701 | 2F2E | 7101 | 302E | 9801 |
| 0000217600 | 312E | A601 | 322E | C401 | 332E | CA01 | 342E | E401 |
| 0000217620 | 352E | 0201 | 362F | 2301 | 372F | 5101 | 382F | 6B01 |
| 0000217640 | 392F | 6E01 | 3B2F | 8401 | 422F | 8A01 | 432F | 9701 |
| 0000217660 | 442F | 9D01 | 4C2F | BF01 | 4D2F | EB01 | 4E2F | FA01 |
| 0000217700 | 4F2F | 0A01 | 5030 | 1B01 | 5130 | 3401 | 5330 | 3C01 |
| 0000217720 | 5430 | 4A01 | 5530 | 5F01 | 5630 | 9B01 | 4330 | A200 |
| 0000217740 | 4430 | D600 | 4930 | DE00 | 4A30 | 0200 | 4B31 | 2900 |
| 0000217760 | 4F31 | 5000 | 5131 | 7300 | 5231 | 8000 | 5631 | 9100 |
| 0000220000 | 5731 | C000 | 5B31 | EF00 | 5C31 | 1200 | 6032 | 3800 |
| 0000220020 | 6132 | 5C00 | 6232 | B100 | 6332 | B400 | 0732 | 7974 |
| 0000220040 | 6570 | 2E31 | 0163 | 9C00 | 5B00 | C000 | 6032 | D000 |
| 0000220060 | 6132 | D600 | 6932 | E100 | 7732 | F100 | 7832 | 0400 |
| 0000220100 | 7933 | 1D00 | 7B33 | 2800 | 7C33 | 3100 | 7D33 | 3700 |
| 0000220120 | 7E33 | 4000 | 7F33 | 5E00 | 8133 | 6400 | 8233 | 6E00 |
| 0000220140 | 8433 | 7500 | 8533 | 7B00 | 8733 | 8100 | 8833 | 8700 |
| 0000220160 | 8933 | 8D00 | 8A33 | 9300 | 8E33 | B000 | 9033 | B700 |
| 0000220200 | 9133 | BD00 | 9533 | C300 | 9633 | DC00 | 9733 | E200 |
| 0000220220 | 9833 | 0D00 | 9B34 | 2200 | 9C34 | 4D00 | 9D34 | 5300 |
| 0000220240 | 9E34 | 5600 | 9F34 | 8600 | A034 | 8900 | A134 | A300 |
| 0000220260 | A234 | BE00 | A334 | CE00 | A434 | DA00 | A734 | E000 |
| 0000220300 | A934 | E600 | AA34 | EC00 | AB34 | 1A00 | B635 | 2500 |
| 0000220320 | B835 | 3500 | BB35 | 3D00 | BC35 | 4C00 | BD35 | 6400 |
| 0000220340 | BF35 | 7800 | C035 | 7B00 | C135 | 9300 | C235 | A700 |
| 0000220360 | C335 | C200 | C435 | CC00 | C535 | E000 | C735 | F900 |
| 0000220400 | C835 | 0700 | C936 | 1000 | D436 | 1B00 | D836 | 2B00 |
| 0000220420 | D936 | 3B00 | DA36 | 4400 | DB36 | 5100 | DD36 | 5E00 |
| 0000220440 | DE36 | 6E00 | DF36 | 7700 | E036 | 8000 | E136 | 9100 |
| 0000220460 | E336 | 9E00 | E436 | A700 | EF36 | B200 | F536 | C200 |
| 0000220500 | F736 | D200 | F936 | F100 | FA36 | 2700 | FB37 | 4200 |
| 0000220520 | FD37 | 4E00 | FE37 | 6900 | FF37 | 8500 | 0037 | 9301 |
| 0000220540 | 0237 | A801 | 0337 | B801 | 0437 | C001 | 0537 | C901 |
| 0000220560 | 0637 | DA01 | 0837 | E701 | 0937 | F001 | 1337 | FB01 |
| 0000220600 | 1737 | 0B01 | 1838 | 1B01 | 1A38 | 3901 | 1B38 | 4901 |
| 0000220620 | 1C38 | 5101 | 1D38 | 5A01 | 1E38 | 6B01 | 2038 | 7801 |
| 0000220640 | 2138 | 8101 | 2D38 | 8C01 | 3038 | 9C01 | 3138 | A701 |
| 0000220660 | 3238 | B001 | 3338 | BC01 | 3438 | CC01 | 3538 | E001 |
| 0000220700 | 3638 | F101 | 3738 | FA01 | 4438 | 0501 | 4739 | 1501 |
| 0000220720 | 4839 | 2001 | 4A39 | 2901 | 4C39 | 5C01 | 4D39 | 6701 |
| 0000220740 | 4E39 | 7701 | 5039 | 8001 | 5139 | 9401 | 5339 | A401 |
| 0000220760 | 5439 | AD01 | 5E39 | B801 | 5F39 | C801 | 6039 | D401 |
| 0000221000 | 6639 | E001 | 6739 | EB01 | 6A39 | F401 | 6B39 | 0401 |
| 0000221020 | 6D3A | 1801 | 6E3A | 2F01 | 6F3A | 3C01 | 703A | 4601 |
| 0000221040 | 713A | 6501 | 733A | 6E01 | 753A | 8701 | 773A | 9A01 |
| 0000221060 | 783A | BA01 | 7A3A | CB01 | 7B3A | DC01 | 7C3A | DF01 |
| 0000221100 | 7D3A | E801 | 8D3A | F301 | 903A | 0301 | 923B | 2201 |
| 0000221120 | 943B | 2901 | 973B | 2C01 | 993B | 4801 | 9A3B | 7701 |
| 0000221140 | 9D3B | 7A01 | 9E3B | 8C01 | A03B | 8F01 | A13B | B101 |
| 0000221160 | A23B | B401 | A33B | CD01 | A43B | DE01 | A53B | E101 |
| 0000221200 | AF3B | EC01 | B03B | FC01 | B13B | 0701 | B73C | 1201 |
| 0000221220 | B83C | 2201 | B93C | 3301 | 063C | 6574 | 6863 | 632E |
| 0000221240 | 0001 | 0027 | 003D | 3C3E | 003E | 3C54 | 003F | 3C5D |
| 0000221260 | 0040 | 3C69 | 0041 | 3C72 | 0053 | 3C80 | 0054 | 3C96 |

THU MAR 14 17:48:46 1991 TSL_IF.DLL PAGE 61, LINE 3541

| | | | | | | | | |
|---|---|---|---|---|---|---|---|---|
| 0000221300 | 0055 | 3CA9 | 0057 | 3CB1 | 0059 | 3CDB | 005A | 3D0F |
| 0000221320 | 006D | 3D1D | 0070 | 3D33 | 0072 | 3D42 | 0074 | 3D59 |
| 0000221340 | 0077 | 3D83 | 0079 | 3D89 | 007B | 3D9E | 007D | 3DB0 |
| 0000221360 | 007E | 3DB6 | 0090 | 3DC4 | 0091 | 3DDA | 0094 | 3DE2 |
| 0000221400 | 0095 | 3DED | 0097 | 3DF3 | 0099 | 3E0D | 009C | 3E36 |
| 0000221420 | 00A0 | 3E3C | 00A1 | 3E53 | 00A3 | 3E5C | 00A4 | 3E62 |
| 0000221440 | 00B9 | 3E70 | 00BA | 3E86 | 00BB | 3E99 | 00BC | 3EA1 |
| 0000221460 | 00BD | 3EA9 | 00C0 | 3EAF | 00C1 | 3EDA | 00C2 | 3EE0 |
| 0000221500 | 0C00 | 6C6C | 6269 | 6463 | 6C6C | 6C2E | 6269 | 6F07 |
| 0000221520 | 3273 | 6C2E | 6269 | 6C0A | 6962 | 6D70 | 2E74 | 696C |
| 0000221540 | 0A62 | 7263 | 5F76 | 6669 | 6C2E | 6269 | 7309 | 7465 |
| 0000221560 | 7075 | 6C2E | 6269 | 6409 | 5F62 | 6970 | 6C2E | 6269 |
| 0000221600 | 6906 | 2E68 | 696C | 0662 | 7270 | 6C2E | 6269 | 7506 |
| 0000221620 | 2E69 | 696C | 0962 | 656D | 6964 | 2E74 | 696C | A162 |
| 0000221640 | 0100 | 0101 | 0800 | 0000 | 2C00 | 0200 | 0101 | FB00 |
| 0000221660 | 0006 | 8A00 | 0302 | 0101 | B900 | 0018 | F500 | 041D |
| 0000221700 | 0101 | 0900 | 0081 | 3500 | 090B | 0101 | 1700 | 009D |
| 0000221720 | 3100 | 0105 | 0201 | 3400 | 0000 | 2E00 | 0200 | 0201 |
| 0000221740 | 8500 | 0009 | 2C00 | 0300 | 0201 | AE00 | 0036 | 6300 |
| 0000221760 | 040D | 0201 | 3E00 | 008C | 1600 | 0901 | 0201 | 4800 |
| 0000222000 | 00A2 | 7F00 | 0100 | 0301 | 6200 | 0000 | 2B00 | 0200 |
| 0000222020 | 0301 | B100 | 0009 | C500 | 0300 | 0301 | 1100 | 0044 |
| 0000222040 | 8A00 | 0412 | 0301 | 5400 | 008D | 3E00 | 0906 | 0301 |
| 0000222060 | C700 | 00A2 | BC00 | 0102 | 0401 | 8D00 | 0000 | 2A00 |
| 0000222100 | 0200 | 0401 | 7600 | 000A | C000 | 0301 | 0401 | 9B00 |
| 0000222120 | 0056 | 8C00 | 040D | 0401 | 9200 | 0093 | DD00 | 0903 |
| 0000222140 | 0401 | 8300 | 00A5 | 9300 | 0101 | 0501 | B700 | 0000 |
| 0000222160 | 2B00 | 0200 | 0501 | 3600 | 000C | 9300 | 0301 | 0501 |
| 0000222200 | 2700 | 0064 | 5800 | 0410 | 0501 | 6F00 | 0097 | 6100 |
| 0000222220 | 0904 | 0501 | 1600 | 00A7 | 7C00 | 0102 | 0601 | E200 |
| 0000222240 | 0000 | 2A00 | 0200 | 0601 | C900 | 000D | 6C00 | 0300 |
| 0000222260 | 0601 | 7F00 | 0074 | 8A00 | 040C | 0601 | D000 | 009B |
| 0000222300 | 4700 | 0901 | 0601 | 9200 | 00A9 | A700 | 0100 | 0701 |
| 0000222320 | 0C00 | 0001 | 1800 | 0200 | 0701 | 3500 | 000E | 5200 |
| 0000222340 | 0101 | 0801 | 2400 | 0001 | 1B00 | 0200 | 0801 | 8700 |
| 0000222360 | 000F | D200 | 0101 | 0901 | 3F00 | 0001 | 1C00 | 0200 |
| 0000222400 | 0901 | 5900 | 0011 | 3500 | 0100 | 0A01 | 5B00 | 0001 |
| 0000222420 | 1700 | 0200 | 0A01 | 8E00 | 0011 | 0F00 | 0100 | 0B01 |
| 0000222440 | 7200 | 0001 | 1700 | 0200 | 0B01 | 9D00 | 0011 | 3300 |
| 0000222460 | 0100 | 0C01 | 8900 | 0001 | 1A00 | 0200 | 0C01 | D000 |
| 0000222500 | 0011 | 1000 | 0100 | 0D01 | A300 | 0001 | 1C00 | 0200 |
| 0000222520 | 0D01 | E000 | 0011 | 2500 | 0100 | 0E01 | BF00 | 0001 |
| 0000222540 | 1B00 | 0200 | 0E01 | 0500 | 0012 | 3F00 | 0100 | 0F01 |
| 0000222560 | DA00 | 0001 | 1500 | 0200 | 0F01 | 4400 | 0012 | 2000 |
| 0000222600 | 0100 | 1001 | EF00 | 0001 | 1400 | 0200 | 1001 | 6400 |
| 0000222620 | 0012 | 1C00 | 0100 | 1101 | 0300 | 0002 | 1600 | 0200 |
| 0000222640 | 1101 | 8000 | 0012 | 0F00 | 0100 | 1201 | 1900 | 0002 |
| 0000222660 | 1800 | 0200 | 1201 | 8F00 | 0012 | 0F00 | 0100 | 1301 |
| 0000222700 | 3100 | 0002 | 1400 | 0200 | 1301 | 9E00 | 0012 | 3700 |
| 0000222720 | 0100 | 1401 | 4500 | 0002 | 1800 | 0200 | 1401 | D500 |
| 0000222740 | 0012 | 0F00 | 0100 | 1501 | 5D00 | 0002 | 1900 | 0200 |
| 0000222760 | 1501 | E400 | 0012 | 1000 | 0100 | 1601 | 7600 | 0002 |
| 0000223000 | 1800 | 0200 | 1601 | F400 | 0012 | 0F00 | 0100 | 1701 |
| 0000223020 | 8E00 | 0002 | 1400 | 0200 | 1701 | 0300 | 0013 | 1100 |
| 0000223040 | 0100 | 1801 | A200 | 0002 | 1800 | 0200 | 1801 | 1400 |
| 0000223060 | 0013 | 1C00 | 0100 | 1901 | BA00 | 0002 | 1500 | 0200 |
| 0000223100 | 1901 | 3000 | 0013 | 3000 | 0100 | 1A01 | CF00 | 0002 |
| 0000223120 | 1700 | 0200 | 1A01 | 6000 | 0013 | 0F00 | 0100 | 1B01 |
| 0000223140 | E600 | 0002 | 1500 | 0200 | 1B01 | 6F00 | 0013 | 1200 |

THU MAR 14 17:48:46 1991 TSL_IF.DLL PAGE 62, LINE 3600

| | | | | | | | | |
|---|---|---|---|---|---|---|---|---|
| 0000223160 | 0100 | 1C01 | FB00 | 0002 | 1A00 | 0200 | 1C01 | 8100 |
| 0000223200 | 0013 | 0D00 | 0100 | 1D01 | 1500 | 0003 | 1A00 | 0200 |
| 0000223220 | 1D01 | 8E00 | 0013 | 1E00 | 0100 | 1E01 | 2F00 | 0003 |
| 0000223240 | 1900 | 0200 | 1E01 | AC00 | 0013 | 3100 | 0100 | 1F01 |
| 0000223260 | 4800 | 0003 | 1600 | 0200 | 1F01 | DD00 | 0013 | 1E00 |
| 0000223300 | 0100 | 2001 | 5E00 | 0003 | 1800 | 0200 | 2001 | FB00 |
| 0000223320 | 0013 | 1D00 | 0100 | 2101 | 7600 | 0003 | 1700 | 0200 |
| 0000223340 | 2101 | 1800 | 0014 | 1F00 | 0100 | 2201 | 8D00 | 0003 |
| 0000223360 | 1500 | 0200 | 2201 | 3700 | 0014 | 1B00 | 0100 | 2301 |
| 0000223400 | A200 | 0003 | 1800 | 0200 | 2301 | 5200 | 0014 | 4200 |
| 0000223420 | 0100 | 2401 | BA00 | 0003 | 1600 | 0200 | 2401 | 9400 |
| 0000223440 | 0014 | 0E00 | 0100 | 2501 | D000 | 0003 | 1800 | 0200 |
| 0000223460 | 2501 | A200 | 0014 | 1000 | 0100 | 2601 | E800 | 0003 |
| 0000223500 | 1800 | 0200 | 2601 | B200 | 0014 | 1000 | 0100 | 2701 |
| 0000223520 | 0000 | 0004 | 1900 | 0200 | 2701 | C200 | 0014 | 1200 |
| 0000223540 | 0100 | 2801 | 1900 | 0004 | 1800 | 0200 | 2801 | D400 |
| 0000223560 | 0014 | 4100 | 0100 | 2901 | 3100 | 0004 | 1700 | 0200 |
| 0000223600 | 2901 | 1500 | 0015 | 0F00 | 0100 | 2A01 | 4800 | 0004 |
| 0000223620 | 1700 | 0200 | 2A01 | 2400 | 0015 | 0E00 | 0100 | 2B01 |
| 0000223640 | 5F00 | 0004 | 1700 | 0200 | 2B01 | 3200 | 0015 | 0E00 |
| 0000223660 | 0100 | 2C01 | 7600 | 0004 | 1700 | 0200 | 2C01 | 4000 |
| 0000223700 | 0015 | 0E00 | 0100 | 2D01 | 8D00 | 0004 | 1700 | 0200 |
| 0000223720 | 2D01 | 4E00 | 0015 | 0E00 | 0100 | 2E01 | A400 | 0004 |
| 0000223740 | 1800 | 0200 | 2E01 | 5C00 | 0015 | 0F00 | 0100 | 2F01 |
| 0000223760 | BC00 | 0004 | 1800 | 0200 | 2F01 | 6B00 | 0015 | 0F00 |
| 0000224000 | 0100 | 3001 | D400 | 0004 | 1500 | 0200 | 3001 | 7A00 |
| 0000224020 | 0015 | 0C00 | 0100 | 3101 | E900 | 0004 | 1500 | 0200 |
| 0000224040 | 3101 | 8600 | 0015 | 0E00 | 0100 | 3201 | FE00 | 0004 |
| 0000224060 | 1500 | 0200 | 3201 | 9400 | 0015 | 0C00 | 0100 | 3301 |
| 0000224100 | 1300 | 0005 | 1900 | 0200 | 3301 | A000 | 0015 | 5600 |
| 0000224120 | 0100 | 3401 | 2C00 | 0005 | 1600 | 0200 | 3401 | F600 |
| 0000224140 | 0015 | 1D00 | 0100 | 3501 | 4200 | 0005 | 1500 | 0200 |
| 0000224160 | 3501 | 1300 | 0016 | 0E00 | 0100 | 3601 | 5700 | 0005 |
| 0000224200 | 1A00 | 0200 | 3601 | 2100 | 0016 | AB00 | 0100 | 3701 |
| 0000224220 | 7100 | 0005 | 1D00 | 0200 | 3701 | CC00 | 0016 | 2400 |
| 0000224240 | 0100 | 3801 | 8E00 | 0005 | 1600 | 0200 | 3801 | F000 |
| 0000224260 | 0016 | 0F00 | 0100 | 3901 | A400 | 0005 | 1900 | 0200 |
| 0000224300 | 3901 | FF00 | 0016 | 2500 | 0100 | 3A01 | BD00 | 0005 |
| 0000224320 | 1800 | 0200 | 3A01 | 2400 | 0017 | 2100 | 0100 | 3B01 |
| 0000224340 | D500 | 0005 | 1700 | 0200 | 3B01 | 4500 | 0017 | 0F00 |
| 0000224360 | 0100 | 3C01 | EC00 | 0005 | 1700 | 0200 | 3C01 | 5400 |
| 0000224400 | 0017 | 0E00 | 0100 | 3D01 | 0300 | 0006 | 1800 | 0200 |
| 0000224420 | 3D01 | 6200 | 0017 | 1000 | 0100 | 3E01 | 1B00 | 0006 |
| 0000224440 | 1300 | 0200 | 3E01 | 7200 | 0017 | 1C00 | 0100 | 3F01 |
| 0000224460 | 2E00 | 0006 | 1900 | 0200 | 3F01 | 8E00 | 0017 | 0C00 |
| 0000224500 | 0100 | 4001 | 4700 | 0006 | 1400 | 0200 | 4001 | 9A00 |
| 0000224520 | 0017 | 2C00 | 0100 | 4101 | 5B00 | 0006 | 1600 | 0200 |
| 0000224540 | 4101 | C600 | 0017 | 4E00 | 0100 | 4201 | 7100 | 0006 |
| 0000224560 | 1700 | 0200 | 4201 | 1400 | 0018 | 1100 | 0100 | 4301 |
| 0000224600 | 8800 | 0006 | 1500 | 0200 | 4301 | 2500 | 0018 | 1F00 |
| 0000224620 | 0100 | 4401 | 9D00 | 0006 | 1700 | 0200 | 4401 | 4400 |
| 0000224640 | 0018 | 1D00 | 0100 | 4501 | B400 | 0006 | 1700 | 0200 |
| 0000224660 | 4501 | 6100 | 0018 | 1D00 | 0100 | 4601 | CB00 | 0006 |
| 0000224700 | 1B00 | 0200 | 4601 | 7E00 | 0018 | 1C00 | 0100 | 4701 |
| 0000224720 | E600 | 0006 | 1500 | 0200 | 4701 | 9A00 | 0018 | 1F00 |
| 0000224740 | 0600 | 0001 | 3900 | 00AA | 5F00 | 4E00 | 3042 | EC32 |
| 0000224760 | 00B0 | 0000 | | | | | | |
| 0000224763 | | | | | | | | |

THU MAR 14 17:52:34 1991 TSLINT.DLL PAGE 1, LINE 1

| | | | | | | | | |
|---|---|---|---|---|---|---|---|---|
| 0000000000 | 5A4D | 01FA | 01EF | 0000 | 0004 | 0000 | FFFF | 0000 |
| 0000000020 | 00B6 | 0000 | 0000 | 0000 | 0040 | 0000 | 0000 | 0000 |
| 0000000040 | 0000 | 0000 | 000D | 0000 | 0000 | 0000 | 0000 | 0000 |
| 0000000060 | 0000 | 0000 | 0000 | 0000 | 0000 | 0000 | 0080 | 0000 |
| 0000000100 | 1F0E | 0EBA | B400 | CD09 | B821 | 4C01 | 21CD | 6854 |
| 0000000120 | 7369 | 7020 | 6F72 | 7267 | 6D61 | 6320 | 6E61 | 6F6E |
| 0000000140 | 2074 | 7572 | 206E | 6E69 | 4420 | 534F | 6D20 | 646F |
| 0000000160 | 2E65 | 0D0D | 240A | 0000 | 0000 | 0000 | 0000 | 0000 |
| 0000000200 | 454E | 0A05 | 0249 | 001E | 5F7A | 7B22 | 8006 | 0009 |
| 0000000220 | 0000 | 0000 | 2BDA | 0004 | 0000 | 0000 | 0009 | 0009 |
| 0000000240 | 0028 | 0040 | 0088 | 0088 | 011D | 012F | 02E7 | 0000 |
| 0000000260 | 0000 | 0004 | 000D | 0001 | 0000 | 0000 | 0000 | 0000 |
| 0000000300 | 0031 | B951 | 0D00 | B951 | 0BDA | EFD9 | 0D00 | EFD9 |
| 0000000320 | 1AE5 | FD0B | 0D00 | FD0B | 2AD9 | AB13 | 0D00 | AB14 |
| 0000000340 | 35A0 | 00C6 | 0C01 | 0100 | 0000 | 0000 | 0C01 | 0850 |
| 0000000360 | 35AD | 04B6 | 0C01 | 04B6 | 0000 | 0000 | 0C01 | 12D6 |
| 0000000400 | 35F9 | 7E20 | 0D01 | D180 | 7406 | 6C73 | 6E69 | 0074 |
| 0000000420 | 1900 | 5354 | 5F4C | 4553 | 5F54 | 4150 | 5355 | 5F45 |
| 0000000440 | 4E4F | 4D5F | 5349 | 414D | 4354 | 0148 | 0B00 | 5354 |
| 0000000460 | 5F4C | 4552 | 5453 | 5241 | 0254 | 0900 | 5354 | 5F4C |
| 0000000500 | 4F47 | 4D43 | 0344 | 1200 | 5354 | 5F4C | 4553 | 5F54 |
| 0000000520 | 4E49 | 5550 | 5F54 | 5546 | 434E | 0004 | 5409 | 4C53 |
| 0000000540 | 535F | 4154 | 5452 | 0005 | 5409 | 4C53 | 415F | 4F42 |
| 0000000560 | 5452 | 0006 | 5410 | 4C53 | 535F | 5355 | 4550 | 444E |
| 0000000600 | 455F | 4558 | 0743 | 1200 | 5354 | 5F4C | 4547 | 5F54 |
| 0000000620 | 4143 | 4C4C | 435F | 4148 | 4E49 | 0008 | 0100 | 0A00 |
| 0000000640 | 1000 | F900 | FF00 | 0600 | 0C01 | 0F01 | 1701 | 0001 |
| 0000000660 | 4408 | 534F | 4143 | 4C4C | 0553 | 4D50 | 4957 | 064E |
| 0000000700 | 626C | 7069 | 746D | 5F0D | 5842 | 415F | 5353 | 5245 |
| 0000000720 | 4D54 | 4753 | 5F0D | 5842 | 445F | 4245 | 4755 | 4F4D |
| 0000000740 | 4544 | 5F0D | 5842 | 545F | 4D49 | 5345 | 4F4D | 4544 |
| 0000000760 | 5F09 | 5842 | 425F | 535F | 4749 | 5F0E | 5842 | 445F |
| 0000001000 | 4245 | 4755 | 4E45 | 4554 | 0F52 | 425F | 5F58 | 4544 |
| 0000001020 | 5542 | 5247 | 5445 | 5255 | 0E4E | 425F | 5F58 | 4F56 |
| 0000001040 | 4449 | 4552 | 5554 | 4E52 | 5F0E | 5842 | 445F | 4245 |
| 0000001060 | 4755 | 5250 | 4E49 | 0D54 | 425F | 5F58 | 4544 | 5542 |
| 0000001100 | 4347 | 444F | 1145 | 425F | 5F58 | 4544 | 5542 | 5647 |
| 0000001120 | 5241 | 4149 | 4C42 | 0845 | 425F | 5F58 | 4E49 | 5449 |
| 0000001140 | 5F0A | 5842 | 505F | 4952 | 544E | 1046 | 425F | 5F58 |
| 0000001160 | 4854 | 4552 | 4441 | 535F | 4154 | 5452 | 5F0E | 5842 |
| 0000001200 | 505F | 4341 | 464B | 4C49 | 4554 | 0D52 | 425F | 5F58 |
| 0000001220 | 5245 | 4F52 | 4D52 | 444F | 0E45 | 425F | 5F58 | 4544 |
| 0000001240 | 5542 | 4547 | 5252 | 524F | 4405 | 5F42 | 4950 | 7406 |
| 0000001260 | 6C73 | 695F | 0566 | 454D | 4944 | 0254 | 4955 | 7407 |
| 0000001300 | 7365 | 7774 | 6E69 | 5002 | 0152 | 0101 | 4DA0 | 0307 |
| 0000001320 | 9601 | 019A | 97CA | D601 | 012B | 28CC | 7301 | 0199 |
| 0000001340 | 9BBE | 7701 | 00E0 | 2400 | 7354 | 206C | 6E69 | 6574 |
| 0000001360 | 7072 | 6572 | 6574 | 2072 | 7964 | 616E | 696D | 2063 |
| 0000001400 | 696C | 6B6E | 6C20 | 6269 | 6172 | 7972 | 0000 | 0000 |
| 0000001420 | 581E | 4590 | 8B55 | 1EEC | D88E | EC81 | 0000 | 5657 |
| 0000001440 | D16A | 681E | 004F | F89A | FF6D | 83FF | 06C4 | 5052 |
| 0000001460 | 681E | 0051 | 6A9A | FF33 | 83FF | 08C4 | 068E | 79DC |
| 0000001500 | A326 | 0C62 | 8926 | 6416 | FF0C | D236 | FF79 | D036 |
| 0000001520 | FF79 | CE36 | FF79 | CC36 | 9A79 | 6D5E | 0019 | C483 |
| 0000001540 | 5208 | 1E50 | 5468 | 9A00 | 336A | 0027 | C483 | 8E08 |
| 0000001560 | DE06 | 2679 | 9AA3 | 260A | 1689 | 0A9C | 016A | 681E |
| 0000001600 | 0057 | F89A | 4C6D | 8300 | 06C4 | 5052 | 681E | 0059 |
| 0000001620 | 6A9A | 5A33 | 8300 | 08C4 | 068E | 79E0 | A326 | 0000 |
| 0000001640 | 8926 | 0216 | FF00 | DA36 | FF79 | D836 | FF79 | D636 |

THU MAR 14 17:52:34 1991 TSLINT.DLL PAGE 2, LINE 60

| | | | | | | | | |
|---|---|---|---|---|---|---|---|---|
| 0000001660 | FF79 | D436 | 9A79 | 6D5E | 0075 | C483 | 5208 | 1E50 |
| 0000001700 | 5C68 | 9A00 | 336A | 0083 | C483 | 8E08 | E206 | 2679 |
| 0000001720 | 82A3 | 260C | 1689 | 0C84 | 36FF | 79DA | 36FF | 79D8 |
| 0000001740 | 36FF | 79D6 | 36FF | 79D4 | 5E9A | A86D | 8300 | 08C4 |
| 0000001760 | 5052 | 681E | 005F | 6A9A | B633 | 8300 | 08C4 | 068E |
| 0000002000 | 79E4 | A326 | 0C6A | 8926 | 6C16 | 6A0C | 1E01 | 6368 |
| 0000002020 | 9A00 | 6DF8 | 00DB | C483 | 5206 | 1E50 | 6568 | 9A00 |
| 0000002040 | 336A | 00E9 | C483 | 8E08 | E606 | 2679 | 7CA3 | 2600 |
| 0000002060 | 1689 | 007E | 016A | 681E | 006E | F89A | 046D | 8301 |
| 0000002100 | 06C4 | 5052 | 681E | 0070 | 6A9A | 1233 | 8301 | 08C4 |
| 0000002120 | 068E | 79E8 | A326 | 0C58 | 8926 | 5A16 | 6A0C | 1E01 |
| 0000002140 | 7468 | 9A00 | 6DF8 | 012D | C483 | 5206 | 1E50 | 7668 |
| 0000002160 | 9A00 | 336A | 013B | C483 | 8E08 | EA06 | 2679 | 30A3 |
| 0000002200 | 2600 | 1689 | 0032 | 046A | 681E | 007A | F89A | 566D |
| 0000002220 | 8301 | 06C4 | 5052 | 681E | 007F | 6A9A | 6433 | 8301 |
| 0000002240 | 08C4 | 068E | 79EC | A326 | 0A80 | 8926 | 8216 | FF0A |
| 0000002260 | DA36 | FF79 | D836 | FF79 | D636 | FF79 | D436 | 9A79 |
| 0000002300 | 6D5E | 017F | C483 | 5208 | 1E50 | 8468 | 9A00 | 336A |
| 0000002320 | 018D | C483 | 8E08 | EE06 | 2679 | 62A3 | 260A | 1689 |
| 0000002340 | 0A64 | 36FF | 79DA | 36FF | 79D8 | 36FF | 79D6 | 36FF |
| 0000002360 | 79D4 | 5E9A | B26D | 8301 | 08C4 | 5052 | 681E | 008C |
| 0000002400 | 6A9A | C033 | 8301 | 08C4 | 068E | 79F0 | A326 | 0AB4 |
| 0000002420 | 8926 | B616 | 6A0A | 1E01 | 9368 | 9A00 | 6DF8 | 01E5 |
| 0000002440 | C483 | 5206 | 1E50 | 9568 | 9A00 | 336A | 01F3 | C483 |
| 0000002460 | 8E08 | F206 | 2679 | 66A3 | 260A | 1689 | 0A68 | 36FF |
| 0000002500 | 79DA | 36FF | 79D8 | 36FF | 79D6 | 36FF | 79D4 | 5E9A |
| 0000002520 | 0E6D | 8302 | 08C4 | 5052 | 681E | 009C | 6A9A | 1C33 |
| 0000002540 | 8302 | 08C4 | 068E | 79F4 | A326 | 0C66 | 8926 | 6816 |
| 0000002560 | 8E0C | F606 | 2679 | 36FF | 373C | FF26 | 3A36 | 1E37 |
| 0000002600 | A768 | 9A00 | 336A | 024F | C483 | 8E08 | F806 | 2679 |
| 0000002620 | 5AA3 | 2608 | 1689 | 085C | 5F5E | ED83 | 8B02 | 1FE5 |
| 0000002640 | 4D5D | 1ECB | 9058 | 5545 | EC8B | 8E1E | 81D8 | 06EC |
| 0000002660 | 5700 | 8E56 | DC06 | 2679 | 1EC4 | 0C62 | FF26 | 0277 |
| 0000002700 | FF26 | 9A37 | 6514 | 0241 | C483 | 8904 | FA46 | 5689 |
| 0000002720 | C4FC | FA5E | 8326 | 0C7F | 7400 | E903 | 0009 | 00B8 |
| 0000002740 | BA00 | 0000 | 0EE9 | C400 | FA5E | 8B26 | 0847 | 8B26 |
| 0000002760 | 0A57 | 00E9 | 5E00 | 835F | 02ED | E58B | 5D1F | CB4D |
| 0000003000 | 581E | 4590 | 8855 | 1EEC | D88E | EC81 | 0006 | 5657 |
| 0000003020 | 006A | 068E | 79DC | FF26 | 6436 | 260C | 36FF | DC62 |
| 0000003040 | DB9A | B625 | 8302 | 06C4 | 4689 | 89FA | FC56 | 068E |
| 0000003060 | 79FA | 8326 | 423E | 0037 | 0375 | 20E9 | C400 | 065E |
| 0000003100 | 8026 | 743F | 0374 | 14E9 | C400 | 065E | 8026 | 017F |
| 0000003120 | 7400 | E903 | 0007 | 5EC4 | 2606 | 07C6 | 6A09 | FF01 |
| 0000003140 | 0876 | 76FF | 9A06 | 6DF8 | 036A | C483 | C406 | FA5E |
| 0000003160 | 8926 | 2607 | 5789 | 9A02 | 29E7 | 0313 | 5F5E | ED83 |
| 0000003200 | 8B02 | 1FE5 | 4D5D | 1ECB | 9058 | 5545 | EC8B | 8E1E |
| 0000003220 | 81D8 | 0EEC | 5700 | 8D56 | FA46 | 5016 | 76FF | FF08 |
| 0000003240 | 0676 | 099A | 7625 | 8302 | 08C4 | 76FF | FFFC | FA76 |
| 0000003260 | 869A | D862 | 8303 | 04C4 | C28E | D88B | FF26 | 0677 |
| 0000003300 | FF26 | 0477 | FF26 | 0277 | FF26 | 8D37 | F246 | 9A50 |
| 0000003320 | A29E | FFFF | D88B | FF36 | 0677 | FF36 | 0477 | FF36 |
| 0000003340 | 0277 | FF36 | 9A37 | 6DB2 | 0358 | C483 | E908 | 0000 |
| 0000003360 | 5F5E | ED83 | 8B02 | 1FE5 | 4D5D | 1ECB | 9058 | 5545 |
| 0000003400 | EC8B | 8E1E | 81D8 | 14EC | 5700 | 8D56 | F646 | 5016 |
| 0000003420 | 4E8D | 16FA | FF51 | 0876 | 76FF | 9A06 | 2605 | 0395 |
| 0000003440 | C483 | C40C | FA5E | 8B26 | 0847 | 8B26 | 0A57 | 4689 |
| 0000003460 | 89F2 | F456 | 5EC4 | 26F6 | 478B | 2608 | 578B | 890A |
| 0000003500 | EE46 | 5689 | C4F0 | FA5E | 8B26 | 0C77 | 5EC4 | 26F6 |
| 0000003520 | 7F8B | 830C | 00FE | 0375 | 67E9 | 8300 | 00FF | 0375 |

THU MAR 14 17:52:34 1991 TSLINT.DLL PAGE 3, LINE 119

| | | | | | | | | |
|---|---|---|---|---|---|---|---|---|
| 0000003540 | 58E9 | C400 | F25E | 8A26 | C407 | EE5E | 3826 | 7407 |
| 0000003560 | E903 | 0047 | FF57 | F076 | 76FF | FFEE | F476 | 76FF |
| 0000003600 | 9AF2 | 5156 | 0494 | C483 | 3D0A | 0000 | 0374 | 2AE9 |
| 0000003620 | C400 | FA5E | 8B26 | 0C47 | C62B | 8940 | EC46 | 5E8D |
| 0000003640 | 9AEC | 99CD | 049E | EC83 | 8B08 | 9ADC | 9B29 | 03C2 |
| 0000003660 | B29A | C56D | 8304 | 08C4 | 22E9 | 4E00 | 46FF | E9F2 |
| 0000003700 | FF91 | 36FF | 79DA | 36FF | 79D8 | 36FF | 79D6 | 36FF |
| 0000003720 | 79D4 | B29A | A36D | 8303 | 08C4 | 00E9 | 5E00 | 835F |
| 0000003740 | 02ED | E58B | 5D1F | CB4D | 581E | 4590 | 8B55 | 1EEC |
| 0000003760 | D88E | EC81 | 000E | 5657 | 468D | 16FA | FF50 | 0876 |
| 0000004000 | 76FF | 9A06 | 2509 | 040E | C483 | FF08 | FC76 | 76FF |
| 0000004020 | 9AFA | 6286 | 0539 | C483 | 8E04 | 8BC2 | 26D8 | 77FF |
| 0000004040 | 2606 | 77FF | 2604 | 77FF | 2602 | 37FF | 468D | 50F2 |
| 0000004060 | 729A | 74AA | 8B04 | 36D8 | 77FF | 3606 | 77FF | 3604 |
| 0000004100 | 77FF | 3602 | 37FF | B29A | A36D | 8304 | 08C4 | 00E9 |
| 0000004120 | 5E00 | 835F | 02ED | E58B | 5D1F | CB4D | 581E | 4590 |
| 0000004140 | 8B55 | 1EEC | D88E | EC81 | 0006 | 5657 | 468D | 16FA |
| 0000004160 | FF50 | 0876 | 76FF | 9A06 | 2509 | 04F6 | C483 | FF08 |
| 0000004200 | FC76 | 76FF | 9AFA | 6514 | 0596 | C483 | 8E04 | 8BC2 |
| 0000004220 | 8DD8 | 0C5F | D19A | 9199 | 8305 | 08EC | DC8B | 299A |
| 0000004240 | 239B | 9A05 | 6DB2 | 0504 | C483 | E908 | 0000 | 5F5E |
| 0000004260 | ED83 | 8B02 | 1FE5 | 4D5D | 1ECB | 9058 | 5545 | EC8B |
| 0000004300 | 8E1E | 81D8 | 0EEC | 5700 | 8D56 | FA46 | 5016 | 76FF |
| 0000004320 | FF08 | 0676 | 099A | 6A25 | 8305 | 08C4 | 76FF | FFFC |
| 0000004340 | FA76 | 869A | 0A62 | 8306 | 04C4 | C28E | D88B | FF26 |
| 0000004360 | 0677 | FF26 | 0477 | FF26 | 0277 | FF26 | 8D37 | F246 |
| 0000004400 | 9A50 | A27A | 0587 | D88B | FF36 | 0677 | FF36 | 0477 |
| 0000004420 | FF36 | 0277 | FF36 | 9A37 | 6DB2 | 0578 | C483 | E908 |
| 0000004440 | 0000 | 5F5E | ED83 | 8B02 | 1FE5 | 4D5D | 1ECB | 9058 |
| 0000004460 | 5545 | EC8B | 8E1E | 81D8 | 08EC | 5700 | C756 | F846 |
| 0000004500 | 70F4 | 5E8C | C7FA | FC46 | 0000 | 5EC4 | 2606 | 478B |
| 0000004520 | 2606 | 470B | 7504 | E903 | 002A | 468D | 16FC | C450 |
| 0000004540 | 065E | FF26 | 0677 | FF26 | 0477 | 849A | D539 | 8305 |
| 0000004560 | 08C4 | C28E | D88B | 8B26 | 0647 | 8B26 | 0857 | 4689 |
| 0000004600 | 89F8 | FA56 | 468B | 0BFA | F846 | 0375 | 22E9 | FF00 |
| 0000004620 | FA76 | 76FF | C4F8 | 065E | FF26 | 0277 | FF26 | 9A37 |
| 0000004640 | 085B | 069C | C483 | 5204 | 9A50 | 2EF2 | 05C7 | C483 |
| 0000004660 | 5E08 | 835F | 02ED | E58B | 5D1F | CB4D | 581E | 4590 |
| 0000004700 | 8B55 | 1EEC | D88E | EC81 | 0006 | 5657 | 5E8D | 9A06 |
| 0000004720 | 99CD | 06CC | EC83 | 8B08 | 9ADC | 9B29 | 05F4 | B29A |
| 0000004740 | E16D | 8306 | 08C4 | 5052 | 76FF | FF10 | 0E76 | F29A |
| 0000004760 | F857 | 8306 | 08C4 | 4689 | 89FA | FC56 | 76FF | FF0C |
| 0000005000 | 0A76 | 76FF | 9A08 | 6DF8 | 065D | C483 | C406 | FA5E |
| 0000005020 | 8926 | 2607 | 5789 | 5E02 | 835F | 02ED | E58B | 5D1F |
| 0000005040 | CB4D | 581E | 4590 | 8B55 | 1EEC | D88E | EC81 | 001C |
| 0000005060 | 5657 | 468D | 16EE | 8D50 | F246 | 5016 | 468D | 16F6 |
| 0000005100 | FF50 | 0876 | 76FF | 9A06 | 2D0D | 074A | C483 | 3D10 |
| 0000005120 | 0003 | 037C | 0EE9 | 9A00 | 0293 | 0692 | 4689 | 89E6 |
| 0000005140 | E856 | 20E9 | FF00 | F076 | 76FF | 9AEE | 6514 | 06D1 |
| 0000005160 | C483 | 8E04 | 8BC2 | 26D8 | 478B | 2608 | 578B | 890A |
| 0000005200 | E646 | 5689 | [illegible] | F246 | 568B | 89F4 | EA46 | 5689 |
| 0000005220 | C4EC | F25E | 8326 | 127F | 7428 | E903 | 0020 | 5EC4 |
| 0000005240 | 26F2 | 5F8B | C10C | 02E3 | 068E | 79FC | C426 | 5636 |
| 0000005260 | 2608 | 008B | 8B26 | 0250 | 4689 | 89EA | EC56 | 5EC4 |
| 0000005300 | 26EA | 7F83 | 3D12 | 0375 | 19E9 | C400 | EA5E | 8326 |
| 0000005320 | 127F | 753E | E903 | 000C | 681E | 00BC | B69A | FFB3 |
| 0000005340 | 83FF | 04C4 | 76FF | FFEC | EA76 | F59A | EB54 | 8307 |
| 0000005360 | 04C4 | 76FF | FFF8 | F676 | 149A | 2B65 | 8308 | 04C4 |
| 0000005400 | 4689 | 8906 | 0856 | 5EC4 | 2606 | 478B | 2608 | 578B |

THU MAR 14 17:52:34 1991 TSLINT.DLL PAGE 4, LINE 178

| | | | | | | | | |
|---|---|---|---|---|---|---|---|---|
| 0000005420 | 890A | FA46 | 5689 | FFFC | EC76 | 76FF | 68EA | 073A |
| 0000005440 | FF68 | FFFF | E876 | 76FF | C4E6 | 065E | FF26 | 0C77 |
| 0000005460 | 468D | 16FA | 6850 | 7FFF | AC9A | 4814 | 8308 | 14C4 |
| 0000005500 | 4689 | 8DE4 | E45E | CD9A | 4399 | 8308 | 08EC | DC8B |
| 0000005520 | 299A | C29B | 9A06 | 6DB2 | 075E | C483 | E908 | 0000 |
| 0000005540 | 5F5E | ED83 | 8B02 | 1FE5 | 4D5D | 1ECB | 9058 | 5545 |
| 0000005560 | EC8B | 8E1E | 81D8 | 8AEC | 5700 | 8D56 | FE46 | 4689 |
| 0000005600 | 8CA4 | A656 | 786A | 6C9A | B0BB | 8308 | 02C4 | 4689 |
| 0000005620 | 898C | 8E56 | 46C7 | 78BA | 8B00 | BA46 | 4689 | C790 |
| 0000005640 | 8446 | 0000 | 468D | 1694 | FF50 | 0876 | 76FF | 9A06 |
| 0000005660 | 2509 | 080E | C483 | FF08 | 9676 | 76FF | 9A94 | 6514 |
| 0000005700 | 07DD | C483 | 8904 | 9446 | 5689 | C496 | 065E | 8B26 |
| 0000005720 | 0447 | 8B26 | 0657 | 4689 | 8980 | 8256 | 5EC4 | 2694 |
| 0000005740 | 478B | 2608 | 578B | 890A | BC46 | 5689 | 89BE | C846 |
| 0000005760 | 5689 | C4CA | 945E | 8B26 | DC47 | 4689 | 8B86 | 8646 |
| 0000006000 | 4EFF | 3D86 | 000D | 037F | BCE9 | C415 | BC5E | 8026 |
| 0000006020 | 253F | 0375 | 06E9 | FF00 | BC46 | E0E9 | 8BFF | C846 |
| 0000006040 | 4639 | 75BC | E903 | 0080 | 468B | 2BBC | C846 | 463B |
| 0000006060 | 7F90 | E903 | 0040 | 76FF | FF84 | 8E76 | 76FF | 8B8C |
| 0000006100 | BA46 | E0D1 | 9A50 | BB6C | 0879 | C483 | 8902 | 7A86 |
| 0000006120 | 89FF | 7C96 | 52FF | 9A50 | 662E | 0839 | C483 | 8B0A |
| 0000006140 | 7A86 | 8BFF | 7C96 | 89FF | 8C46 | 5689 | 8B8E | BA46 |
| 0000006160 | 4601 | D190 | BA66 | 468B | 2BBC | C846 | FF50 | CA76 |
| 0000006200 | 76FF | 8BC8 | 8C46 | 568B | 038E | 8446 | 5052 | 2E9A |
| 0000006220 | 4A66 | 8309 | 0AC4 | 468B | 2BBC | C846 | 4601 | 8B84 |
| 0000006240 | C846 | 462B | 01BC | 9046 | 468B | 8BBC | BE56 | 4689 |
| 0000006260 | 89C8 | CA56 | 468D | 8988 | A046 | 568C | 2BA2 | 89C9 |
| 0000006300 | 8A4E | 4E89 | 2B88 | 89C0 | 9E46 | 4689 | B89C | 0000 |
| 0000006320 | 00BA | 8900 | D446 | 5689 | 89D6 | D846 | 5689 | 89DA |
| 0000006340 | B646 | 5689 | C7B8 | B246 | 0112 | 5E8C | 8BB4 | A446 |
| 0000006360 | 568B | 89A6 | D046 | 5689 | FFD2 | BC46 | 4EFF | C486 |
| 0000006400 | BC5E | 46FF | 26BC | 078A | E998 | 1428 | 7E83 | 0190 |
| 0000006420 | 037C | 40E9 | FF00 | 8476 | 76FF | FF8E | 8C76 | 468B |
| 0000006440 | D1BA | 50E0 | 6C9A | 38BB | 8309 | 02C4 | 8689 | FF7A |
| 0000006460 | 9689 | FF7C | 5052 | 2E9A | 8166 | 8309 | 0AC4 | 868B |
| 0000006500 | FF7A | 968B | FF7C | 4689 | 898C | 8E56 | 468B | 01BA |
| 0000006520 | 9046 | 66D1 | 6ABA | 1E01 | E768 | 8B00 | 8C46 | 568B |
| 0000006540 | 038E | 8446 | 5052 | 2E9A | 3066 | 830C | 0AC4 | 46FF |
| 0000006560 | FF84 | 904E | 468B | 8BBC | BE56 | 4689 | 89C8 | CA56 |
| 0000006600 | 41E9 | B814 | 0112 | D98C | 463B | 74B2 | E903 | 0013 |
| 0000006620 | 4E3B | 74B4 | E903 | 000B | 468B | 0BB8 | B646 | 0375 |
| 0000006640 | 03E9 | E900 | 1388 | 468D | 8988 | DC46 | 568C | 8BDE |
| 0000006660 | A046 | 568B | 39A2 | DC46 | 0374 | 1DE9 | 3900 | DE56 |
| 0000006700 | 0374 | 08E9 | C700 | B246 | 00E9 | 5E8C | 8BB4 | A246 |
| 0000006720 | 460B | 74A0 | E903 | 0003 | 53E9 | C413 | BC5E | 8A26 |
| 0000006740 | FF47 | 2D98 | 0030 | C499 | A05E | 8926 | 2607 | 5789 |
| 0000006760 | 8302 | 867E | 7F00 | E903 | 005B | 5EC4 | 26BC | 3F80 |
| 0000007000 | 7D30 | E903 | 004F | 5EC4 | 26BC | 3F80 | 7E39 | E903 |
| 0000007020 | 0043 | 4EFF | C486 | BC5E | 46FF | 26BC | 078A | 9998 |
| 0000007040 | 5EC4 | 26A0 | 0F8B | 8B26 | 0277 | D98B | FE8B | E1D1 |
| 0000007060 | D6D1 | E1D1 | D6D1 | CB03 | F713 | E1D1 | D6D1 | C103 |
| 0000007100 | D613 | 302D | 8300 | 00DA | 5EC4 | 26A0 | 0789 | 8926 |
| 0000007120 | 0257 | 9CE9 | E9FF | FEA4 | 468B | 0BB8 | B646 | 0374 |
| 0000007140 | 15E9 | B800 | 0112 | D98C | 463B | 74B2 | E903 | 0008 |
| 0000007160 | 4E3B | 75B4 | E903 | 0003 | B3E9 | 8312 | B646 | 8301 |
| 0000007200 | B856 | E900 | FE76 | 468D | 8988 | DC46 | 568C | 8BDE |
| 0000007220 | A046 | 568B | 39A2 | DC46 | 0374 | 08E9 | 3900 | DE56 |
| 0000007240 | 0375 | 03E9 | E900 | 1286 | 468D | 899C | A046 | 568C |
| 0000007260 | E9A2 | FE48 | 468B | 0BDA | D846 | 0375 | 03E9 | E900 |

THU MAR 14 17:52:34 1991 TSLINT.DLL PAGE 5, LINE 237

| | | | | | | | | |
|---|---|---|---|---|---|---|---|---|
| 0000007300 | 126C | 4683 | 01D8 | 5683 | 00DA | 2FE9 | 8BFE | D646 |
| 0000007320 | 460B | 75D4 | E903 | 0003 | 53E9 | 8312 | D446 | 8301 |
| 0000007340 | D656 | E900 | FE16 | 468B | 0B82 | 8046 | 0374 | 16E9 |
| 0000007360 | 8E00 | F606 | 2679 | 3AA1 | 2637 | 168B | 373C | 4689 |
| 0000007400 | 8998 | 9A56 | 24E9 | 8D00 | 9846 | 5016 | 76FF | FF82 |
| 0000007420 | 8076 | 099A | A225 | 8308 | 08C4 | 5EC4 | 2680 | 478B |
| 0000007440 | 2604 | 578B | 8906 | 8046 | 5689 | C482 | 985E | F626 |
| 0000007460 | 1447 | 7508 | E903 | 0031 | 5EC4 | 8D98 | 9A1F | 9935 |
| 0000007500 | 0C35 | F79A | 299B | 890A | AC46 | 5689 | 8AAE | AC46 |
| 0000007520 | 4688 | C7E0 | 9C46 | 0001 | 46C7 | 009E | 8D00 | E046 |
| 0000007540 | 4689 | 8CA8 | AA56 | EFE9 | 8B00 | 9E46 | 460B | 749C |
| 0000007560 | E903 | 000D | 46C7 | 019C | C700 | 9E46 | 0000 | 2BE9 |
| 0000007600 | C400 | 985E | 8B26 | 0C47 | 3B99 | 9E56 | 037E | 1BE9 |
| 0000007620 | 7D00 | E903 | 0008 | 463B | 729C | E903 | 000E | 5EC4 |
| 0000007640 | 2698 | 478B | 990C | 4689 | 899C | 9E56 | 468D | 89E0 |
| 0000007660 | A846 | 568C | E9AA | 00A0 | 468B | 0B82 | 8046 | 0374 |
| 0000007700 | 16E9 | 8E00 | F606 | 2679 | 3AA1 | 2637 | 168B | 373C |
| 0000007720 | 4689 | 8998 | 9A56 | 24E9 | 8D00 | 9846 | 5016 | 76FF |
| 0000007740 | FF82 | 8076 | 099A | 0525 | 830C | 08C4 | 5EC4 | 2680 |
| 0000007760 | 478B | 2604 | 578B | 8906 | 8046 | 5689 | FF82 | 9A76 |
| 0000010000 | 76FF | 9A98 | 6514 | 0A17 | C483 | 8904 | 9846 | 5689 |
| 0000010020 | 8B9A | 9E46 | 460B | 759C | E903 | 001D | 5EC4 | 2698 |
| 0000010040 | 478B | 990C | 563B | 7E9E | E903 | 001B | 037D | 08E9 |
| 0000010060 | 3B00 | 9C46 | 0372 | 0EE9 | C400 | 985E | 8B26 | 0C47 |
| 0000010100 | 8999 | 9C46 | 5689 | C49E | 985E | 8B26 | 0847 | 8B26 |
| 0000010120 | 0A57 | 4689 | 89A8 | AA56 | 468B | 8B88 | 8A56 | 5639 |
| 0000010140 | 7E9E | E903 | 00A6 | 037D | 08E9 | 3900 | 9C46 | 0372 |
| 0000010160 | 99E9 | 8B00 | B846 | 460B | 74B6 | E903 | 008E | 468B |
| 0000010200 | 8B88 | 8A56 | 5639 | 7E9E | E903 | 0080 | 037D | 08E9 |
| 0000010220 | 3900 | 9C46 | 0372 | 73E9 | 8300 | 907E | 7C01 | E903 |
| 0000010240 | 0040 | 76FF | FF84 | 8E76 | 76FF | 8B8C | BA46 | E0D1 |
| 0000010260 | 9A50 | BB6C | 0CF6 | C483 | 8902 | 7A86 | 89FF | 7C96 |
| 0000010300 | 52FF | 9A50 | 662E | 0A59 | C483 | 8B0A | 7A86 | 8BFF |
| 0000010320 | 7C96 | 89FF | 8C46 | 5689 | 8B8E | BA46 | 4601 | D190 |
| 0000010340 | BA66 | 016A | 681E | 0112 | 468B | 8B8C | 8E56 | 4603 |
| 0000010360 | 5284 | 9A50 | 662E | 0DB6 | C483 | FF0A | 8446 | 4EFF |
| 0000010400 | 8390 | 886E | 8301 | 8A5E | E900 | FF72 | 7E83 | 009C |
| 0000010420 | 0375 | 73E9 | 8B00 | 9046 | 4639 | 7F9C | E903 | 0040 |
| 0000010440 | 76FF | FF84 | 8E76 | 76FF | 8B8C | BA46 | E0D1 | 9A50 |
| 0000010460 | BB6C | 0DA4 | C483 | 8902 | 7A86 | 89FF | 7C96 | 52FF |
| 0000010500 | 9A50 | 662E | 0DE6 | C483 | 8B0A | 7A86 | 8BFF | 7C96 |
| 0000010520 | 89FF | 8C46 | 5689 | 8B8E | BA46 | 4601 | D190 | BA66 |
| 0000010540 | 76FF | FF9C | AA76 | 76FF | 8BA8 | 8C46 | 568B | 038E |
| 0000010560 | 8446 | 5052 | 2E9A | 3466 | 830E | 0AC4 | 468B | 019C |
| 0000010600 | 8446 | 468B | 299C | 9046 | 468B | 8B88 | 8A56 | 5639 |
| 0000010620 | 7E9E | E903 | 009B | 037D | 08E9 | 3900 | 9C46 | 0372 |
| 0000010640 | 8EE9 | 8B00 | 8846 | 568B | 398A | 9E56 | 037E | 80E9 |
| 0000010660 | 7D00 | E903 | 0008 | 4639 | 729C | E903 | 0073 | 7E83 |
| 0000010700 | 0190 | 037C | 40E9 | FF00 | 8476 | 76FF | FF8E | 8C76 |
| 0000010720 | 468B | D1BA | 50E0 | 6C9A | 22BB | 830E | 02C4 | 8689 |
| 0000010740 | FF7A | 9689 | FF7C | 5052 | 2E9A | 6766 | 830E | 0AC4 |
| 0000010760 | 868B | FF7A | 968B | FF7C | 4689 | 898C | 8E56 | 468B |
| 0000011000 | 01BA | 9046 | 66D1 | 6ABA | 1E01 | 1268 | 8B01 | 8C46 |
| 0000011020 | 568B | 038E | 8446 | 5052 | 2E9A | 8C66 | 830F | 0AC4 |
| 0000011040 | 46FF | FF84 | 904E | 6E83 | 0188 | 5E83 | 008A | 72E9 |
| 0000011060 | 8BFF | BC46 | 568B | 89BE | C846 | 5689 | E9CA | 0F84 |
| 0000011100 | 468B | 0B82 | 8046 | 0374 | 16E9 | 8E00 | F606 | 2679 |
| 0000011120 | 3AA1 | 2637 | 168B | 373C | 4689 | 8998 | 9A56 | 24E9 |
| 0000011140 | 8D00 | 9846 | 5016 | 76FF | FF82 | 8076 | 099A | D725 |

THU MAR 14 17:52:34 1991 TSLINT.DLL PAGE 6, LINE 296

| | | | | | | | | |
|---|---|---|---|---|---|---|---|---|
| 0000011160 | 830C | 08C4 | 5EC4 | 2680 | 478B | 2604 | 578B | 8906 |
| 0000011200 | 8046 | 5689 | FF82 | 9A76 | 76FF | 9A98 | 6286 | 0EC9 |
| 0000011220 | C483 | 8E04 | 8BC2 | 8DD8 | 9A1F | 9935 | 0F91 | F79A |
| 0000011240 | C69B | 890F | CC46 | 5689 | 83CE | CE7E | 7C00 | E903 |
| 0000011260 | 0012 | 46C7 | 01B0 | F700 | CC5E | 5683 | 00CE | 5EF7 |
| 0000011300 | E9CE | 0005 | 46C7 | 00B0 | 6A00 | 6A00 | FF0A | CE76 |
| 0000011320 | 76FF | 9ACC | 7AF6 | 0FDF | 3004 | 4EFF | C4D0 | D05E |
| 0000011340 | 8826 | 6A07 | 6A00 | 8D0A | CC46 | 5016 | 829A | DB79 |
| 0000011360 | 8B0E | CE46 | 460B | 74CC | E903 | FFCD | 7E83 | 00B0 |
| 0000011400 | 0375 | 0AE9 | FF00 | D04E | 5EC4 | 26D0 | 07C6 | 8B2D |
| 0000011420 | A446 | 462B | 1BD0 | 89D2 | 9C46 | 5689 | 8B9E | 8846 |
| 0000011440 | 568B | 398A | 9E56 | 037E | 46E9 | 7D01 | E903 | 0008 |
| 0000011460 | 4639 | 729C | E903 | 0139 | 468B | 0BB8 | B646 | 0374 |
| 0000011500 | 2EE9 | B801 | 0112 | D98C | 463B | 74B2 | E903 | 0008 |
| 0000011520 | 4E3B | 75B4 | E903 | 0089 | 5EC4 | 26D0 | 3F80 | 742D |
| 0000011540 | E903 | 007D | 7E83 | 0190 | 037C | 40E9 | FF00 | 8476 |
| 0000011560 | 76FF | FF8E | 8C76 | 468B | D1BA | 50E0 | 6C9A | 7EBB |
| 0000011600 | 830F | 02C4 | 8689 | FF7A | 9689 | FF7C | 5052 | 2E9A |
| 0000011620 | 0B66 | 830F | 0AC4 | 868B | FF7A | 968B | FF7C | 4689 |
| 0000011640 | 898C | 8E56 | 468B | 01BA | 9046 | 66D1 | 6ABA | FF01 |
| 0000011660 | D276 | 76FF | 8BD0 | 8C46 | 568B | 038E | 8446 | 5052 |
| 0000011700 | 2E9A | 8166 | 8310 | 0AC4 | 46FF | FF84 | 904E | 46FF |
| 0000011720 | 83D0 | 9C6E | 8301 | 9E5E | 8300 | 886E | 8301 | 8A5E |
| 0000011740 | 8B00 | 8846 | 568B | 398A | 9E56 | 037E | 82E9 | 7D00 |
| 0000011760 | E903 | 0008 | 4639 | 729C | E903 | 0075 | 7E83 | 0190 |
| 0000012000 | 037C | 40E9 | FF00 | 8476 | 76FF | FF8E | 8C76 | 468B |
| 0000012020 | D1BA | 50E0 | 6C9A | 6FBB | 8310 | 02C4 | 8689 | FF7A |
| 0000012040 | 9689 | FF7C | 5052 | 2E9A | B366 | 8310 | 0AC4 | 868B |
| 0000012060 | FF7A | 968B | FF7C | 4689 | 898C | 8E56 | 468B | 01BA |
| 0000012100 | 9046 | 66D1 | 6ABA | FF01 | B476 | 76FF | 8BB2 | 8C46 |
| 0000012120 | 568B | 038E | 8446 | 5052 | 2E9A | 1966 | 8311 | 0AC4 |
| 0000012140 | 46FF | FF84 | 904E | 6E83 | 0188 | 5E83 | 008A | 70E9 |
| 0000012160 | 83FF | 9C7E | 7500 | E903 | 0073 | 468B | 3990 | 9C46 |
| 0000012200 | 037F | 40E9 | FF00 | 8476 | 76FF | FF8E | 8C76 | 468B |
| 0000012220 | D1BA | 50E0 | 6C9A | 07BB | 8311 | 02C4 | 8689 | FF7A |
| 0000012240 | 9689 | FF7C | 5052 | 2E9A | 4B66 | 8311 | 0AC4 | 868B |
| 0000012260 | FF7A | 968B | FF7C | 4689 | 898C | 8E56 | 468B | 01BA |
| 0000012300 | 9046 | 66D1 | FFBA | 9C76 | 76FF | FFD2 | D076 | 468B |
| 0000012320 | 8B8C | 8E56 | 4603 | 5284 | 9A50 | 662E | 1199 | C483 |
| 0000012340 | 8B0A | 9C46 | 4601 | 8B84 | 9C46 | 4629 | 8B90 | 8846 |
| 0000012360 | 568B | 398A | 9E56 | 037E | 9DE9 | 7D00 | E903 | 0008 |
| 0000012400 | 4639 | 729C | E903 | 0090 | 468B | 8B88 | 8A56 | 5639 |
| 0000012420 | 7E9E | E903 | 0082 | 037D | 08E9 | 3900 | 9C46 | 0372 |
| 0000012440 | 75E9 | 8300 | 907E | 7C01 | E903 | 0040 | 76FF | FF84 |
| 0000012460 | 8E76 | 76FF | 8B8C | BA46 | E0D1 | 9A50 | BB6C | 1187 |
| 0000012500 | C483 | 8902 | 7A86 | 89FF | 7C96 | 52FF | 9A50 | 662E |
| 0000012520 | 11CC | C483 | 8B0A | 7A86 | 8BFF | 7C96 | 89FF | 8C46 |
| 0000012540 | 5689 | 8B8E | BA46 | 4601 | D190 | BA66 | 016A | 76FF |
| 0000012560 | FFB4 | B276 | 468B | 8B8C | 8E56 | 4603 | 5284 | 9A50 |
| 0000012600 | 662E | 1240 | C483 | FF0A | 8446 | 4EFF | 8390 | 886E |
| 0000012620 | 8301 | 8A5E | E900 | FF70 | 468B | 8BBC | BE56 | 4689 |
| 0000012640 | 89C8 | CA56 | 1DE9 | C70C | 9246 | 000A | 10E9 | C700 |
| 0000012660 | 9246 | 0008 | 08E9 | C700 | 9246 | 0010 | 00E9 | 8B00 |
| 0000012700 | 8246 | 460B | 7480 | E903 | 0016 | 068E | 79F6 | A126 |
| 0000012720 | 373A | 8B26 | 3C16 | 8937 | 9846 | 5689 | E99A | 0024 |
| 0000012740 | 468D | 1698 | FF50 | 8276 | 76FF | 9A80 | 2509 | 0F5F |
| 0000012760 | C483 | C408 | 805E | 8B26 | 0447 | 8B26 | 0657 | 4689 |
| 0000013000 | 8980 | 8256 | 76FF | FF9A | 9876 | 869A | 2E62 | 8312 |
| 0000013020 | 04C4 | C28E | D88B | 1F8D | 359A | 1099 | 9A13 | 9BF7 |

THU MAR 14 17:52:34 1991 TSLINT.DLL PAGE 7, LINE 355

| | | | | | | | | |
|---|---|---|---|---|---|---|---|---|
| 0000013040 | 1327 | 4689 | 89AC | AE56 | 468B | 9992 | 5052 | 76FF |
| 0000013060 | FFAE | AC76 | 029A | 467C | 8B13 | 8AD8 | 0087 | FF01 |
| 0000013100 | D04E | 5EC4 | C5D0 | 0788 | 468B | 9992 | 5052 | 468D |
| 0000013120 | 16AC | 9A50 | 7A08 | 1272 | 468B | 0BAE | AC46 | 0374 |
| 0000013140 | C5E9 | 8BFF | A446 | 462B | 1BD0 | 89D2 | 9C46 | 5689 |
| 0000013160 | 8B9E | 8846 | 568B | 398A | 9E56 | 037E | A8E9 | 7D00 |
| 0000013200 | E903 | 0008 | 4639 | 729C | E903 | 009B | 468B | 0BB8 |
| 0000013220 | B646 | 0374 | 90E9 | 8B00 | 8846 | 568B | 398A | 9E56 |
| 0000013240 | 037E | 82E9 | 7D00 | E903 | 0008 | 4639 | 729C | E903 |
| 0000013260 | 0075 | 7E83 | 0190 | 037C | 40E9 | FF00 | 8476 | 76FF |
| 0000013300 | FF8E | 8C76 | 468B | D1BA | 50E0 | 6C9A | FDBB | 8312 |
| 0000013320 | 02C4 | 8689 | FF7A | 9689 | FF7C | 5052 | 2E9A | 0B66 |
| 0000013340 | 8313 | 0AC4 | 868B | FF7A | 968B | FF7C | 4689 | 898C |
| 0000013360 | 8E56 | 468B | 01BA | 9046 | 66D1 | 6ABA | FF01 | B476 |
| 0000013400 | 76FF | 8BB2 | 8C46 | 568B | 038E | 8446 | 5052 | 2E9A |
| 0000013420 | CF66 | 8313 | 0AC4 | 46FF | FF84 | 904E | 6E83 | 0188 |
| 0000013440 | 5E83 | 008A | 70E9 | 83FF | 9C7E | 7500 | E903 | 0073 |
| 0000013460 | 468B | 3990 | 9C46 | 037F | 40E9 | FF00 | 8476 | 76FF |
| 0000013500 | FF8E | 8C76 | 468B | D1BA | 50E0 | 6C9A | BDBB | 8313 |
| 0000013520 | 02C4 | 8689 | FF7A | 9689 | FF7C | 5052 | 2E9A | 0166 |
| 0000013540 | 8314 | 0AC4 | 868B | FF7A | 968B | FF7C | 4689 | 898C |
| 0000013560 | 8E56 | 468B | 01BA | 9046 | 66D1 | FFBA | 9C76 | 76FF |
| 0000013600 | FFD2 | D076 | 468B | 8B8C | 8E56 | 4603 | 5284 | 9A50 |
| 0000013620 | 662E | 144F | C483 | 8B0A | 9C46 | 4601 | 8B84 | 9C46 |
| 0000013640 | 4629 | 8B90 | 8846 | 568B | 398A | 9E56 | 037E | 9DE9 |
| 0000013660 | 7D00 | E903 | 0008 | 4639 | 729C | E903 | 0090 | 468B |
| 0000013700 | 8B88 | 8A56 | 5639 | 7E9E | E903 | 0082 | 037D | 08E9 |
| 0000013720 | 3900 | 9C46 | 0372 | 75E9 | 8300 | 907E | 7C01 | E903 |
| 0000013740 | 0040 | 76FF | FF84 | 8E76 | 76FF | 8B8C | BA46 | E0D1 |
| 0000013760 | 9A50 | BB6C | 143D | C483 | 8902 | 7A86 | 89FF | 7C96 |
| 0000014000 | 52FF | 9A50 | 662E | 1482 | C483 | 8B0A | 7A86 | 8BFF |
| 0000014020 | 7C96 | 89FF | 8C46 | 5689 | 8B8E | BA46 | 4601 | D190 |
| 0000014040 | BA66 | 016A | 76FF | FFB4 | B276 | 468B | 8B8C | 8E56 |
| 0000014060 | 4603 | 5284 | 9A50 | 662E | 15DB | C483 | FF0A | 8446 |
| 0000014100 | 4EFF | 8390 | 886E | 8301 | 8A5E | E900 | FF70 | 468B |
| 0000014120 | 8BBC | BE56 | 4689 | 89C8 | CA56 | 67E9 | 8B09 | 8246 |
| 0000014140 | 460B | 7480 | E903 | 0016 | 068E | 79F6 | A126 | 373A |
| 0000014160 | 8B26 | 3C16 | 8937 | 9846 | 5689 | E99A | 0024 | 468D |
| 0000014200 | 1698 | FF50 | 8276 | 76FF | 9A80 | 2509 | 12DE | C483 |
| 0000014220 | C408 | 805E | 8B26 | 0447 | 8B26 | 0657 | 4689 | 8980 |
| 0000014240 | 8256 | 76FF | FF9A | 9876 | 869A | E462 | 8314 | 04C4 |
| 0000014260 | 8D1E | C07E | F08B | 0716 | DA8E | A5A5 | A5A5 | 8B1F |
| 0000014300 | 9E46 | 460B | 749C | E903 | 000A | 46C7 | 0D9C | C700 |
| 0000014320 | 9E46 | 0000 | 468D | 16E0 | FF50 | 9C76 | 76FF | FFC6 |
| 0000014340 | C476 | 76FF | FFC2 | C076 | 389A | EB67 | 8315 | 0EC4 |
| 0000014360 | 468D | 16E0 | 9A50 | 5114 | 14F6 | C483 | 8904 | 9C46 |
| 0000014400 | 46C7 | 009E | 8D00 | E046 | 4689 | 8CD0 | D256 | 468B |
| 0000014420 | 8B88 | 8A56 | 5639 | 7E9E | E903 | 0265 | 037D | 08E9 |
| 0000014440 | 3900 | 9C46 | 0372 | 58E9 | 8B02 | B846 | 460B | 74B6 |
| 0000014460 | E903 | 024D | 12B8 | 8C01 | 3BD9 | B246 | 0374 | 08E9 |
| 0000014500 | 3B00 | B44E | 0375 | 81E9 | C400 | D05E | 8026 | 2D3F |
| 0000014520 | 0374 | 75E9 | 8300 | 907E | 7C01 | E903 | 0040 | 76FF |
| 0000014540 | FF84 | 8E76 | 76FF | 8B8C | BA46 | E0D1 | 9A50 | BB6C |
| 0000014560 | 159B | C483 | 8902 | 7A86 | 89FF | 7C96 | 52FF | 9A50 |
| 0000014600 | 662E | 1528 | C483 | 8B0A | 7A86 | 8BFF | 7C96 | 89FF |
| 0000014620 | 8C46 | 5689 | 8B8E | BA46 | 4601 | D190 | BA66 | 016A |
| 0000014640 | 76FF | FFD2 | D076 | 468B | 8B8C | 8E56 | 4603 | 5284 |
| 0000014660 | 9A50 | 662E | 1672 | C483 | FF0A | 8446 | 4EFF | FF90 |
| 0000014700 | D046 | 6E83 | 019C | 5E83 | 009E | 12B8 | 8C01 | 3BD9 |

THU MAR 14 17:52:34 1991 TSLINT.DLL PAGE 8, LINE 414

| | | | | | | | | |
|---|---|---|---|---|---|---|---|---|
| 0000014720 | B246 | 0374 | 17E9 | 3B01 | B44E | 0374 | 0FE9 | C401 |
| 0000014740 | D05E | 8026 | 2E3F | 0374 | 03E9 | 8301 | 886E | 8301 |
| 0000014760 | 8A5E | 8300 | 886E | 8301 | 8A5E | 8B00 | 8846 | 568D |
| 0000015000 | 398A | 9E56 | 037E | 7AE9 | 7D00 | E903 | 0008 | 4639 |
| 0000015020 | 769C | E903 | 006D | 7E83 | 0190 | 037C | 40E9 | FF00 |
| 0000015040 | 8476 | 76FF | FF8E | 8C76 | 468B | D1BA | 50E0 | 6C9A |
| 0000015060 | 60BB | 8316 | 02C4 | 8689 | FF7A | 9689 | FF7C | 5052 |
| 0000015100 | 2E9A | A466 | 8316 | 0AC4 | 868B | FF7A | 968B | FF7C |
| 0000015120 | 4689 | 898C | 8E56 | 468B | 01BA | 9046 | 66D1 | 6ABA |
| 0000015140 | FF01 | B476 | 76FF | 8BB2 | 8C46 | 568B | 038E | 8446 |
| 0000015160 | 5052 | 2E9A | 3366 | 8317 | 0AC4 | 46FF | FF84 | 904E |
| 0000015200 | 70E9 | 83FF | 907E | 7C01 | E903 | 0040 | 76FF | FF84 |
| 0000015220 | 8E76 | 76FF | 8B8C | BA46 | E0D1 | 9A50 | BB6C | 1721 |
| 0000015240 | C483 | 8902 | 7A86 | 89FF | 7C96 | 52FF | 9A50 | 662E |
| 0000015260 | 1765 | C483 | 8B0A | 7A86 | 8BFF | 7C96 | 89FF | 8C46 |
| 0000015300 | 5689 | 8B8E | BA46 | 4601 | D190 | BA66 | 016A | 681E |
| 0000015320 | 00EB | 468B | 8B8C | 8E56 | 4603 | 5284 | 9A50 | 662E |
| 0000015340 | 17A0 | C483 | FF0A | 8446 | 4EFF | E990 | 0090 | 468B |
| 0000015360 | 8B88 | 8A56 | 6E83 | 0188 | 5E83 | 008A | 5639 | 7E9E |
| 0000015400 | E903 | 007A | 037D | 08E9 | 3900 | 9C46 | 0372 | 6DE9 |
| 0000015420 | 8300 | 907E | 7C01 | E903 | 0040 | 76FF | FF84 | 8E76 |
| 0000015440 | 76FF | 8B8C | BA46 | E0D1 | 9A50 | BB6C | 178E | C483 |
| 0000015460 | 8902 | 7686 | 89FF | 7896 | 52FF | 9A50 | 662E | 17D0 |
| 0000015500 | C483 | 8B0A | 7686 | 8BFF | 7896 | 89FF | 8C46 | 5689 |
| 0000015520 | 8B8E | BA46 | 4601 | D190 | BA66 | 016A | 76FF | FFB4 |
| 0000015540 | B276 | 468B | 8B8C | 8E56 | 4603 | 5284 | 9A50 | 662E |
| 0000015560 | 182E | C483 | FF0A | 8446 | 4EFF | E990 | FF70 | 91E9 |
| 0000015600 | C400 | D05E | 8026 | 2E3F | 0374 | 85E9 | B800 | 0112 |
| 0000015620 | D98C | 463B | 74B2 | E903 | 0078 | 4E3B | 74B4 | E903 |
| 0000015640 | 0070 | 7E83 | 0190 | 037C | 40E9 | FF00 | 8476 | 76FF |
| 0000015660 | FF8E | 8C76 | 468B | D1BA | 50E0 | 6C9A | 1CBB | 8318 |
| 0000015700 | 02C4 | 8689 | FF76 | 9689 | FF78 | 5052 | 2E9A | 6066 |
| 0000015720 | 8318 | 0AC4 | 868B | FF76 | 968B | FF78 | 4689 | 898C |
| 0000015740 | 8E56 | 468B | 01BA | 9046 | 66D1 | 6ABA | 1E01 | ED68 |
| 0000015760 | 8B00 | 8C46 | 568B | 038E | 8446 | 5052 | 2E9A | BF66 |
| 0000016000 | 8318 | 0AC4 | 46FF | FF84 | 904E | 6E83 | 0188 | 5E83 |
| 0000016020 | 008A | 7E83 | 009C | 0375 | 73E9 | 8B00 | 9046 | 4639 |
| 0000016040 | 7F9C | E903 | 0040 | 76FF | FF84 | 8E76 | 76FF | 8B8C |
| 0000016060 | BA46 | E0D1 | 9A50 | BB6C | 18AD | C483 | 8902 | 7686 |
| 0000016100 | 89FF | 7896 | 52FF | 9A50 | 662E | 18EF | C483 | 8B0A |
| 0000016120 | 7686 | 8BFF | 7896 | 89FF | 8C46 | 5689 | 8B8E | BA46 |
| 0000016140 | 4601 | D190 | BA66 | 76FF | FF9C | D276 | 76FF | 8BD0 |
| 0000016160 | 8C46 | 568B | 038E | 8446 | 5052 | 2E9A | 3A66 | 8319 |
| 0000016200 | 0AC4 | 468B | 019C | 8446 | 468B | 299C | 9046 | 468B |
| 0000016220 | 8B88 | 8A56 | 5639 | 7E9E | E903 | 009D | 037D | 08E9 |
| 0000016240 | 3900 | 9C46 | 0372 | 90E9 | 8B00 | 8846 | 568B | 838A |
| 0000016260 | 886E | 8301 | 8A5E | 3900 | 9E56 | 037E | 7AE9 | 7D00 |
| 0000016300 | E903 | 0008 | 4639 | 729C | E903 | 006D | 7E83 | 0190 |
| 0000016320 | 037C | 40E9 | FFD0 | 8476 | 76FF | FF8E | 8C76 | 468B |
| 0000016340 | D1BA | 50E0 | 6C9A | 28BB | 8319 | 02C4 | 8689 | FF7A |
| 0000016360 | 9689 | FF7C | 5052 | 2E9A | 6D66 | 8319 | 0AC4 | 868B |
| 0000016400 | FF7A | 968B | FF7C | 4689 | 898C | 8E56 | 468B | 01BA |
| 0000016420 | 9046 | 66D1 | 6ABA | FF01 | B476 | 76FF | 8BB2 | 8C46 |
| 0000016440 | 568B | 038E | 8446 | 5052 | 2E9A | E966 | 8319 | 0AC4 |
| 0000016460 | 46FF | FF84 | 904E | 70E9 | 8BFF | BC46 | 568B | 89BE |
| 0000016500 | C846 | 5689 | E9CA | 047C | 468B | 0B82 | 8046 | 0374 |
| 0000016520 | 16E9 | 8E00 | F606 | 2679 | 3AA1 | 2637 | 168B | 373C |
| 0000016540 | 4689 | 8998 | 9A56 | 24E9 | 8D00 | 9846 | 5016 | 76FF |
| 0000016560 | FF82 | 8076 | 099A | 7C25 | 8315 | 08C4 | 5EC4 | 2680 |

THU MAR 14 17:52:34 1991  TSLINT.DLL  PAGE 9, LINE 473

| | | | | | | | | |
|---|---|---|---|---|---|---|---|---|
| 0000016600 | 478B | 2604 | 578B | 8906 | 8046 | 5689 | FF82 | 9A76 |
| 0000016620 | 76FF | 9A98 | 6286 | 19D7 | C483 | 1E04 | 7E8D | 8BC0 |
| 0000016640 | 16F0 | 8E07 | A5DA | A5A5 | 1FA5 | 468B | 9990 | 4E8B |
| 0000016660 | 8B9C | 9E5E | 4E03 | 1388 | 8A5E | C183 | 8305 | 00D3 |
| 0000016700 | DA3B | 037D | 4CE9 | 7E00 | E903 | 0007 | C83B | 0377 |
| 0000016720 | 40E9 | FF00 | 8476 | 76FF | FF8E | 8C76 | 468B | D1BA |
| 0000016740 | 50E0 | 6C9A | 86BB | 831A | 02C4 | 8689 | FF76 | 9689 |
| 0000016760 | FF78 | 5052 | 2E9A | 1B66 | 831A | 0AC4 | 868B | FF76 |
| 0000017000 | 968B | FF78 | 4689 | 898C | 8E56 | 468B | 01BA | 9046 |
| 0000017020 | 66D1 | 8DBA | E046 | 4689 | 8CD0 | D256 | 5EC4 | FFD0 |
| 0000017040 | D046 | C626 | 2507 | 468B | 0BB8 | B646 | 0375 | 0AE9 |
| 0000017060 | C400 | D05E | 46FF | 26D0 | 07C6 | B82D | 0112 | D98C |
| 0000017100 | 463B | 74B2 | E903 | 0008 | 4E3B | 75B4 | E903 | 000A |
| 0000017120 | 5EC4 | FFD0 | D046 | C626 | 3007 | 468D | 8988 | DC46 |
| 0000017140 | 568C | 8BDE | A04E | 568B | 39A2 | DC4E | 0374 | 08E9 |
| 0000017160 | 3900 | DE56 | 0375 | 3FE9 | 1E00 | EF68 | FF00 | D276 |
| 0000017200 | 76FF | 9AD0 | 50B4 | 1BA0 | C483 | FF08 | C676 | 76FF |
| 0000017220 | FFC4 | C276 | 76FF | FFC0 | 9C76 | 76FF | 8D88 | E046 |
| 0000017240 | 5016 | 468B | 8B8C | 8E56 | 4603 | 5284 | 9A50 | 59B2 |
| 0000017260 | 1BB5 | C483 | E914 | 0039 | 681E | 00F4 | 76FF | FFD2 |
| 0000017300 | D076 | B49A | DC50 | 831B | 08C4 | 76FF | FFC6 | C476 |
| 0000017320 | 76FF | FFC2 | C076 | 76FF | 8D88 | E046 | 5016 | 468B |
| 0000017340 | 8B8C | 8E56 | 4603 | 5284 | 9A50 | 59B2 | 1BFE | C483 |
| 0000017360 | 8B12 | 8C46 | 568B | 038E | 8446 | 4689 | 89D0 | D256 |
| 0000017400 | 468B | 8B8C | 8E56 | 4603 | 5284 | 9A50 | 5114 | 1C14 |
| 0000017420 | C483 | 2904 | 9046 | 468B | 8B8C | 8E56 | 4603 | 5284 |
| 0000017440 | 9A50 | 5114 | 1AE7 | C483 | 0104 | 8446 | 468B | 8BBC |
| 0000017460 | BE56 | 4689 | 89C8 | CA56 | 89E9 | 8B02 | 8246 | 460B |
| 0000017500 | 7480 | E903 | 0016 | 068E | 79F6 | A126 | 373A | 8B26 |
| 0000017520 | 3C16 | 8937 | 9346 | 5689 | E99A | 0024 | 468D | 1698 |
| 0000017540 | FF50 | 8276 | 76FF | 9A80 | 2509 | 1A67 | C483 | C408 |
| 0000017560 | 805E | 8B26 | 0447 | 8B26 | 0657 | 4689 | 8980 | 8256 |
| 0000017600 | 76FF | FF9A | 9876 | 869A | D562 | 831A | 04C4 | 8D1E |
| 0000017620 | C07E | F08B | 0716 | DA8E | A5A5 | A5A5 | 8B1F | 9046 |
| 0000017640 | 8B99 | 9C4E | 5E8B | 039E | 884E | 5E13 | 838A | 05C1 |
| 0000017660 | D383 | 3B00 | 7DDA | E903 | 004C | 037E | 07E9 | 3B00 |
| 0000017700 | 77C8 | E903 | 0040 | 76FF | FF84 | 8E76 | 76FF | 8B8C |
| 0000017720 | BA46 | E0D1 | 9A50 | BB6C | 1C79 | C483 | 8902 | 7686 |
| 0000017740 | 89FF | 7896 | 52FF | 9A50 | 662E | 1B76 | C483 | 8BDA |
| 0000017760 | 7686 | 8BFF | 7896 | 89FF | 8C46 | 5689 | 8B8E | BA46 |
| 0000020000 | 4601 | D190 | BA66 | 468D | 89E0 | D046 | 568C | C4D2 |
| 0000020020 | D05E | 46FF | 26D0 | 07C6 | 8B25 | B846 | 460B | 75B6 |
| 0000020040 | E903 | 000A | 5EC4 | FFD0 | D046 | C626 | 2D07 | 12B8 |
| 0000020060 | 8C01 | 3BD9 | B246 | 0374 | 08E9 | 3B00 | B44E | 0375 |
| 0000020100 | 0AE9 | C400 | D05E | 46FF | 26D0 | 07C6 | 8D30 | 8846 |
| 0000020120 | 4689 | 8CDC | DE56 | 4E8B | 8BAD | A256 | 4E39 | 74DC |
| 0000020140 | E903 | 0008 | 5639 | 75DE | E903 | 003F | 681E | 00F7 |
| 0000020160 | 76FF | FFD2 | D076 | B49A | 9350 | 831D | 08C4 | 76FF |
| 0000020200 | FFC6 | C476 | 76FF | FFC2 | C076 | 76FF | FF9C | 8876 |
| 0000020220 | 468D | 16E0 | 8B50 | 8C46 | 568B | 038E | 8446 | 5052 |
| 0000020240 | B29A | A859 | 831D | 14C4 | 39E9 | 1E00 | FC68 | FF00 |
| 0000020260 | D276 | 76FF | 9AD0 | 50B4 | 1DCF | C483 | FF08 | C676 |
| 0000020300 | 76FF | FFC4 | C276 | 76FF | FFC0 | 8876 | 468D | 16E0 |
| 0000020320 | 8B50 | 8C46 | 568B | 038E | 8446 | 5052 | B29A | F159 |
| 0000020340 | 831D | 12C4 | 468B | 8B8C | 8E56 | 4603 | 8984 | D046 |
| 0000020360 | 5689 | 8BD2 | 8C46 | 568B | 038E | 8446 | 5052 | 149A |
| 0000020400 | 0751 | 831E | 04C4 | 4629 | 8B90 | 8C46 | 568B | 038E |
| 0000020420 | 8446 | 5052 | 149A | DA51 | 831C | 04C4 | 4601 | 8B84 |
| 0000020440 | BC46 | 568B | 89BE | C846 | 5689 | E9CA | 0096 | 93E9 |

THU MAR 14 17:52:34 1991 TSLINT.DLL PAGE 10, LINE 532

| | | | | | | | | |
|---|---|---|---|---|---|---|---|---|
| 0000020460 | E900 | 0090 | 643D | 7500 | E903 | F104 | 037E | 48E9 |
| 0000020500 | 3D00 | 002E | 0375 | 3DE9 | 7EED | E903 | 001A | 232D |
| 0000020520 | 7500 | E903 | ED5E | 4848 | 0375 | AFE9 | 2DEB | 0008 |
| 0000020540 | 0375 | F3E9 | E9EC | FFC6 | 302D | 7500 | E903 | EC13 |
| 0000020560 | 7D48 | E903 | FFB8 | 082D | 7F00 | E903 | EC4F | 2A2D |
| 0000020600 | 7500 | E903 | ED60 | A5E9 | 2DFF | 0065 | 133D | 7600 |
| 0000020620 | E903 | FF9A | E0D1 | 2E93 | A7FF | 1E8C | 1C2B | 1A38 |
| 0000020640 | 154D | 1E1E | 1E1E | 1E1E | 1E1E | 0BBD | 1E1E | 1E1E |
| 0000020660 | 129F | 1E1E | 1E1E | 1E1E | 0CA8 | 1E1E | 1297 | 1E1E |
| 0000020700 | 1E1E | 12A7 | 36E9 | 8BEA | C846 | 4639 | 75BC | E903 |
| 0000020720 | 0080 | 468B | 2BBC | C846 | 463B | 7F90 | E903 | 0040 |
| 0000020740 | 76FF | FF84 | 8E76 | 76FF | 8B8C | BA46 | E0D1 | 9A50 |
| 0000020760 | BB6C | 1CC8 | C483 | 8902 | 7686 | 89FF | 7896 | 52FF |
| 0000021000 | 9A50 | 662E | 1D69 | C483 | 8B0A | 7686 | 8BFF | 7896 |
| 0000021020 | 89FF | 8C46 | 5689 | 8B8E | BA46 | 4601 | D190 | BA66 |
| 0000021040 | 468B | 2BBC | C846 | FF50 | CA76 | 76FF | 8BC8 | 8C46 |
| 0000021060 | 568B | 038E | 8446 | 5052 | 2E9A | F466 | 831E | 0AC4 |
| 0000021100 | 468B | 2BBC | C846 | 4601 | 8B84 | C846 | 462B | 01BC |
| 0000021120 | 9046 | 76FF | FF84 | 8E76 | 76FF | 9A8C | 734F | 1EE2 |
| 0000021140 | C483 | E906 | 0000 | 5F5E | ED83 | 8B02 | 1FE5 | 4D5D |
| 0000021160 | 1ECB | 9058 | 5545 | EC8B | 8E1E | 81D8 | 0EEC | 5700 |
| 0000021200 | 8D56 | FA46 | 5016 | 76FF | FF08 | 0676 | 099A | 5A25 |
| 0000021220 | 831C | 08C4 | 76FF | FFFC | FA76 | 869A | C262 | 831F |
| 0000021240 | 04C4 | C28E | D88B | FF26 | 0677 | FF26 | 0477 | FF26 |
| 0000021260 | 0277 | FF26 | 8D37 | F246 | 9A50 | A256 | 1F2B | D88B |
| 0000021300 | FF36 | 0677 | FF36 | 0477 | FF36 | 0277 | FF36 | 9A37 |
| 0000021320 | 6DB2 | 1F4E | C483 | E908 | 0000 | 5F5E | ED83 | 8B02 |
| 0000021340 | 1FE5 | 4D5D | 1ECB | 9058 | 5545 | EC8B | 8E1E | 81D8 |
| 0000021360 | 0EEC | 5700 | BF56 | FFFF | 468D | 16F2 | 8D50 | F64E |
| 0000021400 | 5116 | 4E8D | 16FA | FF51 | 0876 | 76FF | 9A06 | 27AF |
| 0000021420 | 1F7F | C483 | 3D10 | 0003 | 0374 | 20E9 | FF00 | F476 |
| 0000021440 | 76FF | 9AF2 | 6286 | 2036 | C483 | 8E04 | 8BC2 | 8DD8 |
| 0000021460 | 9A1F | 9935 | 2029 | F79A | 449B | 8B20 | FFF8 | F876 |
| 0000021500 | 76FF | 9AF6 | 6286 | 2057 | C483 | 8E04 | 8BC2 | 8DD8 |
| 0000021520 | 9A1F | 9935 | 2049 | F79A | AC9B | 8B1F | 4EF0 | 76FF |
| 0000021540 | FFFC | FA76 | 149A | CC65 | 8320 | 04C4 | 4689 | 8906 |
| 0000021560 | 0856 | FF83 | 74FF | E903 | 0007 | 5EC4 | 2606 | 7F8B |
| 0000021600 | 830C | 00FE | 037C | 03E9 | BED0 | 0000 | 5EC4 | 2606 |
| 0000021620 | 7739 | 7F0C | E903 | 0008 | FF83 | 7E00 | E903 | 0010 |
| 0000021640 | 068E | 79F6 | A126 | 373A | 8B26 | 3C16 | E937 | 0034 |
| 0000021660 | 5EC4 | 8B06 | 03C7 | 26C6 | 4739 | 7C0C | E903 | 0009 |
| 0000021700 | 5EC4 | 2606 | 7F8B | 2B0C | 57FE | 5EC4 | 2606 | 478B |
| 0000021720 | 2608 | 578B | 030A | 52C6 | 9A50 | 734F | 1F8D | C483 |
| 0000021740 | E906 | 0000 | 5F5E | ED83 | 8B02 | 1FE5 | 4D5D | 1ECB |
| 0000021760 | 9058 | 5545 | EC8B | 8E1E | 81D8 | 08EC | 5700 | 9A56 |
| 0000022000 | 49D4 | 2110 | 468D | 16FA | FF50 | 0876 | 76FF | 9A06 |
| 0000022020 | 2509 | 2000 | C483 | FF08 | FC76 | 76FF | 9AFA | 6514 |
| 0000022040 | 2149 | C483 | 8E04 | 8BC2 | 26D8 | 77FF | 260A | 77FF |
| 0000022060 | 9A08 | 746A | 213A | C483 | 8904 | F846 | 468A | 2AF9 |
| 0000022100 | 89E4 | F846 | 5E8D | 9AF8 | 99CD | 2144 | EC83 | 8B08 |
| 0000022120 | 9ADC | 9B29 | 2024 | B29A | 166D | 8320 | 08C4 | 00E9 |
| 0000022140 | 5E00 | 835F | 02ED | E58B | 5D1F | CB4D | 581E | 4590 |
| 0000022160 | 8B55 | 1EEC | D88E | EC81 | 0008 | 5657 | 46C7 | F4F8 |
| 0000022200 | 8C70 | FA5E | 46C7 | 00FC | C400 | 065E | 8B26 | 0647 |
| 0000022220 | 0B26 | 0447 | 0375 | 2AE9 | 8D00 | FC46 | 5016 | 5EC4 |
| 0000022240 | 2606 | 77FF | 2606 | 77FF | 9A04 | 3984 | 20F2 | C483 |
| 0000022260 | 8E08 | 8BC2 | 26D8 | 478B | 2606 | 578B | 8908 | F846 |
| 0000022300 | 5689 | 8BFA | FA46 | 460B | 74F8 | E903 | 0003 | 9AE9 |
| 0000022320 | C401 | 065E | 8B26 | 2607 | 578B | 8902 | 0646 | 5689 |

THU MAR 14 17:52:34 1991 TSLINT.DLL PAGE 11, LINE 591

| | | | | | | | | |
|---|---|---|---|---|---|---|---|---|
| 0000022340 | 8B08 | 0846 | 460B | 7406 | E903 | 003F | 068E | 79FE |
| 0000022360 | 8326 | 683E | 0015 | 0375 | 13E9 | 8E00 | 0006 | 267A |
| 0000022400 | 1EC4 | 0C76 | 8B26 | 2607 | 578B | E902 | 0017 | 006A |
| 0000022420 | 006A | CF9A | 9C12 | 8321 | 04C4 | C28E | D88B | 8B26 |
| 0000022440 | 2607 | 578B | 8902 | 0646 | 5689 | C408 | 065E | 8326 |
| 0000022460 | 127F | 7527 | E903 | 0037 | 5EC4 | 2606 | 47F6 | 1014 |
| 0000022500 | 0374 | 13E9 | 1E00 | 1468 | 6801 | 031D | 681E | 0124 |
| 0000022520 | B69A | CFB3 | 8307 | 0AC4 | 76FF | FFFA | F876 | 76FF |
| 0000022540 | FF08 | 0676 | F29A | 022E | 8321 | 08C4 | DEE9 | 8B00 |
| 0000022560 | 0846 | 460B | 7506 | E903 | 00D3 | 5EC4 | 2606 | 078B |
| 0000022600 | 8B26 | 0257 | 068E | 7A02 | A326 | 0AB0 | 8926 | B216 |
| 0000022620 | 0B0A | 74D0 | E903 | 0010 | D68E | 79F6 | A126 | 373A |
| 0000022640 | 8B26 | 3C16 | E937 | 0039 | 068E | 7A02 | C426 | B01E |
| 0000022660 | 260A | 7F83 | 4E12 | 0374 | 10E9 | 8E00 | 0206 | 267A |
| 0000022700 | B0A1 | 260A | 168B | 0AB2 | 16E9 | 8E00 | 0206 | 267A |
| 0000022720 | 36FF | 0AB2 | FF26 | B036 | 9A0A | 499F | 2243 | C483 |
| 0000022740 | 8E04 | 0406 | 267A | 84A3 | 260A | 1689 | 0A86 | 76FF |
| 0000022760 | FFFA | F876 | FF26 | 8636 | 260A | 36FF | 0A84 | 149A |
| 0000023000 | 0565 | 8322 | 04C4 | 5052 | F29A | 352E | 8323 | 08C4 |
| 0000023020 | 5EC4 | 2606 | 478B | 2604 | 578B | 8906 | 0646 | 5689 |
| 0000023040 | 8B08 | 0846 | 460B | 7506 | E903 | 001E | 76FF | FFFA |
| 0000023060 | F876 | 068E | 79E8 | C426 | 581E | 260C | 77FF | 2602 |
| 0000023100 | 37FF | F29A | 562E | 8323 | 08C4 | 22E9 | FFFF | FA76 |
| 0000023120 | 76FF | 8EF8 | EA06 | 2679 | 1EC4 | 0030 | FF26 | 0277 |
| 0000023140 | FF26 | 9A37 | 2EF2 | 2257 | C483 | 5E08 | 835F | 02ED |
| 0000023160 | E58B | 5D1F | CB4D | 581E | 4590 | 8B55 | 1EEC | D88E |
| 0000023200 | EC81 | 0012 | 5657 | 468D | 16FA | FF50 | 0876 | 76FF |
| 0000023220 | 9A06 | 2509 | 22FB | C483 | FF08 | FC76 | 76FF | 9AFA |
| 0000023240 | 6514 | 23B2 | C483 | 8904 | FA46 | 5689 | C4FC | FA5E |
| 0000023260 | FF26 | 0C77 | 5EC4 | 26FA | 77FF | 260A | 77FF | 9A08 |
| 0000023300 | 734F | 22F1 | C483 | 8906 | F646 | 5689 | C4F8 | F65E |
| 0000023320 | 8B26 | 0847 | 8B26 | 0A57 | 4689 | 89F2 | F456 | 5EC4 |
| 0000023340 | 26F6 | 478B | 2608 | 578B | C40A | F65E | 0326 | 0C47 |
| 0000023360 | 4689 | 89EE | F056 | 03E9 | FF00 | F246 | 468B | 39F2 |
| 0000023400 | EE46 | 0377 | 33E9 | C400 | F25E | 8A26 | 9807 | D88B |
| 0000023420 | 87F6 | 754F | 7501 | E903 | 001D | 5EC4 | 26F2 | 078A |
| 0000023440 | 8B98 | F6D8 | 4F87 | 0175 | 0375 | 0AE9 | C400 | F25E |
| 0000023460 | 8026 | 2007 | 00E9 | E900 | FFBF | 468B | 8BF6 | F856 |
| 0000023500 | 00E9 | 5E00 | 835F | 02ED | E58B | 5D1F | CB4D | 581E |
| 0000023520 | 4590 | 8B55 | 1EEC | D88E | EC81 | 000E | 5657 | 468D |
| 0000023540 | 16FA | FF50 | 0876 | 76FF | 9A06 | 2509 | 2384 | C483 |
| 0000023560 | FF08 | FC76 | 76FF | 9AFA | 6514 | 248A | C483 | 8904 |
| 0000023600 | FA46 | 5689 | C4FC | FA5E | FF26 | 0C77 | 5EC4 | 26FA |
| 0000023620 | 77FF | 260A | 77FF | 9A08 | 734F | 2392 | C483 | 8906 |
| 0000023640 | F646 | 5689 | C4F8 | F65E | 8B26 | 0847 | 8B26 | 0A57 |
| 0000023660 | 4689 | 89F2 | F456 | 03E9 | FF00 | F246 | 5EC4 | 26F6 |
| 0000023700 | 478B | C408 | F65E | 0326 | 0C47 | 463B | 77F2 | E903 |
| 0000023720 | 0033 | 5EC4 | 26F2 | 078A | 8B98 | F6D8 | 4F87 | 0275 |
| 0000023740 | 0375 | 1DE9 | C400 | F25E | 8A26 | 9807 | D88B | 87F6 |
| 0000023760 | 754F | 7502 | E903 | 000A | 5EC4 | 26F2 | 2F80 | E920 |
| 0000024000 | 0000 | B4E9 | 8BFF | F646 | 568B | E9F8 | 0000 | 5F5E |
| 0000024020 | ED83 | 8B02 | 1FE5 | 4D5D | 1ECB | 9058 | 5545 | EC8B |
| 0000024040 | 8E1E | 81D8 | 00EC | 5700 | 8B56 | 0846 | 460B | 7406 |
| 0000024060 | E903 | 0049 | 068E | 79FE | 8326 | 683E | 0015 | 0375 |
| 0000024100 | 13E9 | 8E00 | 0006 | 267A | 1EC4 | 0C76 | 8B26 | 2607 |
| 0000024120 | 578B | E902 | 0017 | 006A | D06A | CF9A | 6A12 | 8324 |
| 0000024140 | 04C4 | C28E | D88B | 8B26 | 2607 | 578B | C402 | 0A5E |
| 0000024160 | 8926 | 2607 | 5789 | B802 | 0000 | 8DE9 | C400 | 065E |
| 0000024200 | 8B26 | 2607 | 578B | 8E02 | 0206 | 267A | B0A3 | 260A |

THU MAR 14 17:52:34 1991 TSLINT.DLL PAGE 12, LINE 650

| | | | | | | | | |
|---|---|---|---|---|---|---|---|---|
| 0000024220 | 1689 | 0AB2 | D00B | 0374 | 10E9 | 8E00 | F606 | 2679 |
| 0000024240 | 3AA1 | 2637 | 168B | 373C | 39E9 | 8E00 | 0206 | 267A |
| 0000024260 | 1EC4 | 0AB0 | 8326 | 127F | 744E | E903 | 0010 | 068E |
| 0000024300 | 7A02 | A126 | 0AB0 | 8B26 | B216 | E90A | 0016 | 068E |
| 0000024320 | 7A02 | FF26 | B236 | 260A | 36FF | 0AB0 | 9F9A | CC49 |
| 0000024340 | 8322 | 04C4 | 068E | 7A04 | A326 | 0A84 | 8926 | 8616 |
| 0000024360 | 260A | 84A1 | 260A | 168B | 0A86 | 5EC4 | 260A | 0789 |
| 0000024400 | 8926 | 0257 | 01B8 | E900 | 0000 | 5F5E | ED83 | 8B02 |
| 0000024420 | 1FE5 | 4D5D | 1ECB | 9058 | 5545 | EC8B | 8E1E | 81D8 |
| 0000024440 | 00EC | 5700 | 8B56 | 0846 | 460B | 7406 | E903 | 0049 |
| 0000024460 | 068E | 79FE | 8326 | 683E | 0015 | 0375 | 13E9 | 8E00 |
| 0000024500 | 0006 | 267A | 1EC4 | 0C76 | 8B26 | 2607 | 578B | E902 |
| 0000024520 | 0017 | 006A | 006A | CF9A | 4D12 | 8325 | 04C4 | C28E |
| 0000024540 | D88B | 8B26 | 2607 | 578B | C402 | 0A5E | 8926 | 2607 |
| 0000024560 | 5789 | B802 | 0000 | 3BE9 | C401 | 065E | 8B26 | 2607 |
| 0000024600 | 578B | 8E02 | 0206 | 267A | B0A3 | 260A | 1689 | 0AB2 |
| 0000024620 | D00B | 0374 | 10E9 | 8E00 | F606 | 2679 | 3AA1 | 2637 |
| 0000024640 | 168B | 373C | 39E9 | 8E00 | 0206 | 267A | 1EC4 | 0AB0 |
| 0000024660 | 8326 | 127F | 744E | E903 | 0010 | 068E | 7A02 | A126 |
| 0000024700 | 0AB0 | 8B26 | B216 | E90A | 0016 | 068E | 7A02 | FF26 |
| 0000024720 | B236 | 260A | 36FF | 0AB0 | 9F9A | 7949 | 8327 | 04C4 |
| 0000024740 | 068E | 7A04 | A326 | 0A84 | 8926 | 8616 | 260A | 84A1 |
| 0000024760 | 260A | 168B | 0A86 | 5EC4 | 260A | 0789 | 8926 | 0257 |
| 0000025000 | 5EC4 | 2606 | 478B | 2606 | 470B | 7404 | E903 | 0006 |
| 0000025020 | 01B8 | E900 | 009E | 5EC4 | 2606 | 478B | 2604 | 578B |
| 0000025040 | 8906 | 0646 | 5689 | C408 | 065E | 8B26 | 2607 | 578B |
| 0000025060 | 8E02 | 0206 | 267A | B0A3 | 260A | 1689 | 0AB2 | D00B |
| 0000025100 | 0374 | 10E9 | 8E00 | F606 | 2679 | 3AA1 | 2637 | 168B |
| 0000025120 | 373C | 39E9 | 8E00 | 0206 | 267A | 1EC4 | 0A90 | 8326 |
| 0000025140 | 127F | 744E | E903 | 0010 | 068E | 7A02 | A126 | 0AB0 |
| 0000025160 | 8B26 | B216 | E90A | 0016 | 068E | 7A02 | FF26 | B236 |
| 0000025200 | 260A | 36FF | 0AB0 | 9F9A | CF49 | 8325 | 04C4 | 068E |
| 0000025220 | 7A04 | A326 | 0A84 | 8926 | 8616 | 260A | 84A1 | 260A |
| 0000025240 | 168B | 0A86 | 5EC4 | 260E | 0789 | 8926 | 0257 | 02B8 |
| 0000025260 | E900 | 0000 | 5F5E | ED83 | 8B02 | 1FE5 | 4D5D | 1ECB |
| 0000025300 | 9058 | 5545 | EC8B | 8E1E | 81D8 | 00EC | 5700 | 8B56 |
| 0000025320 | 0846 | 460B | 7406 | E903 | 0049 | 068E | 79FE | 8326 |
| 0000025340 | 683E | 0015 | 0375 | 13E9 | 8E00 | 0006 | 267A | 1EC4 |
| 0000025360 | 0C76 | 8B26 | 2607 | 578B | E902 | 0017 | 006A | 006A |
| 0000025400 | CF9A | 4912 | 8326 | 04C4 | C28E | D88B | 8B26 | 2607 |
| 0000025420 | 578B | C402 | 0A5E | 8926 | 2607 | 5789 | B802 | 0000 |
| 0000025440 | E9E9 | C401 | 065E | 8B26 | 2607 | 578B | 8E02 | 0206 |
| 0000025460 | 267A | B0A3 | 260A | 1689 | 0AB2 | D00B | 0374 | 10E9 |
| 0000025500 | 8E00 | F606 | 2679 | 3AA1 | 2637 | 168B | 373C | 39E9 |
| 0000025520 | 8E00 | 0206 | 267A | 1EC4 | 0AB0 | 8326 | 127F | 744E |
| 0000025540 | E903 | 0010 | 068E | 7A02 | A126 | 0AB0 | 8B26 | B216 |
| 0000025560 | E90A | 0016 | 068E | 7A02 | FF26 | B236 | 260A | 36FF |
| 0000025600 | 0AB0 | 9F9A | 2349 | 8329 | 04C4 | 068E | 7A04 | A326 |
| 0000025620 | 0A84 | 8926 | 8616 | 260A | 84A1 | 260A | 168B | 0A86 |
| 0000025640 | 5EC4 | 260A | 0789 | 8926 | 0257 | 5EC4 | 2606 | 478B |
| 0000025660 | 2606 | 470B | 7404 | E903 | 0006 | 01B8 | E900 | 014C |
| 0000025700 | 5EC4 | 2606 | 478B | 2604 | 578B | 8906 | 0646 | 5689 |
| 0000025720 | C408 | 065E | 8B26 | 2607 | 578B | 8E02 | 0206 | 267A |
| 0000025740 | B0A3 | 260A | 1689 | 0AB2 | D00B | 0374 | 10E9 | 8E00 |
| 0000025760 | F606 | 2679 | 3AA1 | 2637 | 168B | 373C | 39E9 | 8E00 |
| 0000026000 | 0206 | 267A | 1EC4 | 0AB0 | 8326 | 127F | 744E | E903 |
| 0000026020 | 0010 | 068E | 7A02 | A126 | 0AB0 | 8B26 | B216 | E90A |
| 0000026040 | 0016 | 068E | 7A02 | FF26 | B236 | 260A | 36FF | 0AB0 |
| 0000026060 | 9F9A | D149 | 8329 | 04C4 | 068E | 7A04 | A326 | 0A84 |

THU MAR 14 17:52:34 1991 TSLINT.DLL PAGE 13, LINE 709

| | | | | | | | | |
|---|---|---|---|---|---|---|---|---|
| 0000026100 | 8926 | 8616 | 260A | 84A1 | 260A | 168B | 0A86 | 5EC4 |
| 0000026120 | 260E | 0789 | 8926 | 0257 | 5EC4 | 2606 | 478B | 2606 |
| 0000026140 | 470B | 7404 | E903 | 0006 | 02B8 | E900 | 009E | 5EC4 |
| 0000026160 | 2606 | 478B | 2604 | 578B | 8906 | 0646 | 5689 | C408 |
| 0000026200 | 065E | 8B26 | 2607 | 578B | 8E02 | 0206 | 267A | B0A3 |
| 0000026220 | 260A | 1689 | 0AB2 | D00B | 0374 | 10E9 | 8E00 | F606 |
| 0000026240 | 2679 | 3AA1 | 2637 | 168B | 373C | 39E9 | 8E00 | 0206 |
| 0000026260 | 267A | 1EC4 | 0AB0 | 8326 | 127F | 744E | E903 | 0010 |
| 0000026300 | 068E | 7A02 | A126 | 0AB0 | 8B26 | B216 | E90A | 0016 |
| 0000026320 | 068E | 7A02 | FF26 | B236 | 260A | 36FF | 0AB0 | 9F9A |
| 0000026340 | CB49 | 8326 | 04C4 | 068E | 7A04 | A326 | 0A84 | 8926 |
| 0000026360 | 8616 | 260A | 84A1 | 260A | 168B | 0A86 | 5EC4 | 2612 |
| 0000026400 | 0789 | 8926 | 0257 | 03B8 | E900 | 0000 | 5F5E | ED83 |
| 0000026420 | 8B02 | 1FE5 | 4D5D | 1ECB | 9058 | 5545 | EC8B | 8E1E |
| 0000026440 | 81D8 | 00EC | 5700 | 8B56 | 0846 | 460B | 7406 | E903 |
| 0000026460 | 0049 | 068E | 79FE | 8326 | 683E | 0015 | 0375 | 13E9 |
| 0000026500 | 8E00 | 0006 | 267A | 1EC4 | 0C76 | 8B26 | 2607 | 578B |
| 0000026520 | E902 | 0017 | 006A | 006A | CF9A | F312 | 8327 | 04C4 |
| 0000026540 | C28E | D88B | 8B26 | 2607 | 578B | C402 | 0A5E | 8926 |
| 0000026560 | 2607 | 5789 | B802 | 0000 | 97E9 | C402 | 065E | 8B26 |
| 0000026600 | 2607 | 578B | 8E02 | 0206 | 267A | B0A3 | 260A | 1689 |
| 0000026620 | 0AB2 | D00B | 0374 | 10E9 | 8E00 | F606 | 2679 | 3AA1 |
| 0000026640 | 2637 | 168B | 373C | 39E9 | 8E00 | 0206 | 267A | 1EC4 |
| 0000026660 | 0AB0 | 8326 | 127F | 744E | E903 | 0010 | 068E | 7A02 |
| 0000026700 | A126 | 0AB0 | 8B26 | B216 | E90A | 0016 | 068E | 7A02 |
| 0000026720 | FF26 | B236 | 260A | 36FF | 0AB0 | 9F9A | 7B49 | 832B |
| 0000026740 | 04C4 | 068E | 7A04 | A326 | 0A84 | 8926 | 8616 | 260A |
| 0000026760 | 84A1 | 260A | 168B | 0A86 | 5EC4 | 260A | 0789 | 8926 |
| 0000027000 | 0257 | 5EC4 | 2606 | 478B | 2606 | 470B | 7404 | E903 |
| 0000027020 | 0006 | 01B8 | E900 | 01FA | 5EC4 | 2606 | 478B | 2604 |
| 0000027040 | 578B | 8906 | 0646 | 5689 | C408 | 065E | 8B26 | 2607 |
| 0000027060 | 578B | 8E02 | 0206 | 267A | B0A3 | 260A | 1689 | 0AB2 |
| 0000027100 | D00B | 0374 | 10E9 | 8E00 | F606 | 2679 | 3AA1 | 2637 |
| 0000027120 | 168B | 373C | 39E9 | 8E00 | 0206 | 267A | 1EC4 | 0AB0 |
| 0000027140 | 8326 | 127F | 744E | E903 | 0010 | 068E | 7A02 | A126 |
| 0000027160 | 0AB0 | 8B26 | B216 | E90A | 0016 | 068E | 7A02 | FF26 |
| 0000027200 | B236 | 260A | 36FF | 0AB0 | 9F9A | 2949 | 832C | 04C4 |
| 0000027220 | 068E | 7A04 | A326 | 0A84 | 8926 | 8616 | 260A | 84A1 |
| 0000027240 | 260A | 168B | 0A86 | 5EC4 | 260E | 0789 | 8926 | 0257 |
| 0000027260 | 5EC4 | 2606 | 478B | 2606 | 470B | 7404 | E903 | 0006 |
| 0000027300 | 02B8 | E900 | 014C | 5EC4 | 2606 | 478B | 2604 | 578B |
| 0000027320 | 8906 | 0646 | 5689 | C408 | 065E | 8B26 | 2607 | 578B |
| 0000027340 | 8E02 | 0206 | 267A | B0A3 | 260A | 1689 | 0AB2 | D00B |
| 0000027360 | 0374 | 10E9 | 8E00 | F606 | 2679 | 3AA1 | 2637 | 168B |
| 0000027400 | 373C | 39E9 | 8E00 | 0206 | 267A | 1EC4 | 0AB0 | 8326 |
| 0000027420 | 127F | 744E | E903 | 0010 | 068E | 7A02 | A126 | 0AB0 |
| 0000027440 | 8B26 | B216 | E90A | 0016 | 068E | 7A02 | FF26 | B236 |
| 0000027460 | 260A | 36FF | 0AB0 | 9F9A | D749 | 832C | 04C4 | 068E |
| 0000027500 | 7A04 | A326 | 0A84 | 8926 | 8616 | 260A | 84A1 | 260A |
| 0000027520 | 168B | 0A86 | 5EC4 | 2612 | 0789 | 8926 | 0257 | 5EC4 |
| 0000027540 | 2606 | 478B | 2606 | 470B | 7404 | E903 | 0006 | 03B8 |
| 0000027560 | E900 | 009E | 5EC4 | 2606 | 478B | 2604 | 578B | 8906 |
| 0000027600 | 0646 | 5689 | C408 | 065E | 8B26 | 2607 | 578B | 8E02 |
| 0000027620 | 0206 | 267A | B0A3 | 260A | 1689 | 0AB2 | D00B | 0374 |
| 0000027640 | 10E9 | 8E00 | F606 | 2679 | 3AA1 | 2637 | 168B | 373C |
| 0000027660 | 39E9 | 8E00 | 0206 | 267A | 1EC4 | 0AB0 | 8326 | 127F |
| 0000027700 | 744E | E903 | 0010 | 068E | 7A02 | A126 | 0AB0 | 8B26 |
| 0000027720 | B216 | E90A | 0016 | 068E | 7A02 | FF26 | B236 | 260A |
| 0000027740 | 36FF | 0AB0 | 9F9A | 7549 | 8328 | 04C4 | 068E | 7A04 |

THU MAR 14 17:52:34 1991 TSLINT.DLL PAGE 14, LINE 768

| | | | | | | | | |
|---|---|---|---|---|---|---|---|---|
| 0000027760 | A326 | 0A84 | 8926 | 8616 | 260A | 84A1 | 260A | 168B |
| 0000030000 | 0A86 | 5EC4 | 2616 | 0789 | 8926 | 0257 | 04B8 | E900 |
| 0000030020 | 0000 | 5F5E | ED83 | 8B02 | 1FE5 | 4D5D | 1ECB | 9058 |
| 0000030040 | 5545 | EC8B | 8E1E | 81D8 | 00EC | 5700 | 8B56 | 0846 |
| 0000030060 | 460B | 7406 | E903 | 0049 | 068E | 79FE | 8326 | 683E |
| 0000030100 | 0015 | 0375 | 13E9 | 8E00 | 0006 | 267A | 1EC4 | 0C76 |
| 0000030120 | 8B26 | 2607 | 578B | E902 | 0017 | 006A | 006A | CF9A |
| 0000030140 | 4B12 | 832A | 04C4 | C28E | D88B | 8B26 | 2607 | 578B |
| 0000030160 | C402 | 0A5E | 8926 | 2607 | 5789 | B802 | 0000 | 76E9 |
| 0000030200 | C401 | 065E | 8B26 | 2607 | 578B | 8E02 | 0206 | 267A |
| 0000030220 | B0A3 | 260A | 1689 | 0AB2 | D00B | 0374 | 10E9 | 8E00 |
| 0000030240 | F606 | 2679 | 3AA1 | 2637 | 168B | 373C | 39E9 | 8E00 |
| 0000030260 | 0206 | 267A | 1EC4 | 0AB0 | 8326 | 127F | 744E | E903 |
| 0000030300 | 0010 | 068E | 7A02 | A126 | 0AB0 | 8B26 | B216 | E90A |
| 0000030320 | 0016 | 068E | 7A02 | FF26 | B236 | 260A | 36FF | 0AB0 |
| 0000030340 | 9F9A | BC49 | 832E | 04C4 | 068E | 7A04 | A326 | 0A84 |
| 0000030360 | 8926 | 8616 | 260A | 84A1 | 260A | 168B | 0A86 | 5EC4 |
| 0000030400 | 260A | 0789 | 8926 | 0257 | 5EC4 | 2606 | 478B | 2606 |
| 0000030420 | 470B | 7404 | E903 | 0006 | 01B8 | E900 | 00D9 | 5EC4 |
| 0000030440 | 2606 | 478B | 2604 | 578B | 8906 | 0646 | 5689 | C408 |
| 0000030460 | 065E | 8B26 | 2607 | 578B | C402 | 0E5E | 8926 | 2607 |
| 0000030500 | 5789 | C402 | 065E | 8B26 | 0647 | 0B26 | 0447 | 0374 |
| 0000030520 | 06E9 | B800 | 0002 | 9EE9 | C400 | 065E | 8B26 | 0447 |
| 0000030540 | 8B26 | 0657 | 4689 | 8906 | 0856 | 5EC4 | 2606 | 078B |
| 0000030560 | 8B26 | 0257 | 068E | 7A02 | A326 | 0AB0 | 8926 | B216 |
| 0000030600 | 0B0A | 74D0 | E903 | 0010 | 068E | 79F6 | A126 | 373A |
| 0000030620 | 8B26 | 3C16 | E937 | 0039 | 068E | 7A02 | C426 | B01E |
| 0000030640 | 260A | 7F83 | 4E12 | 0374 | 10E9 | 8E00 | 0206 | 267A |
| 0000030660 | B0A1 | 260A | 168B | 0AB2 | 16E9 | 8E00 | 0206 | 267A |
| 0000030700 | 36FF | 0AB2 | FF26 | B036 | 9A0A | 499F | 2ACD | C483 |
| 0000030720 | 8E04 | 0406 | 267A | 84A3 | 260A | 1689 | 0A86 | A126 |
| 0000030740 | 0A84 | 8B26 | 8616 | C40A | 125E | 8926 | 2607 | 5789 |
| 0000030760 | B802 | 0003 | 00E9 | 5E00 | 835F | 02ED | E58B | 5D1F |
| 0000031000 | CB4D | 581E | 4590 | 8B55 | 1EEC | D88E | EC81 | 0088 |
| 0000031020 | 5657 | 46C7 | 40FA | 8C01 | FC5E | 46C7 | 00F4 | 2B00 |
| 0000031040 | 89C0 | E646 | 4689 | 8EE4 | 0606 | 267A | 3E83 | FFFF |
| 0000031060 | 7500 | E903 | 001D | 36FF | 00B6 | 36FF | 00B4 | 468D |
| 0000031100 | 16DC | 9A50 | FFFF | 0000 | C483 | 3D08 | 0000 | 0374 |
| 0000031120 | 0FE9 | 8E00 | 0806 | 267A | 3E83 | FFFF | 7500 | E903 |
| 0000031140 | 003B | 681E | 0144 | 468D | 16E8 | 8D50 | DC46 | 5016 |
| 0000031160 | 468D | 16F6 | 6850 | 03CD | 681E | 0154 | 36FF | 00B2 |
| 0000031200 | 36FF | 00B0 | 36FF | 00B6 | 36FF | 00B4 | FF9A | 00FF |
| 0000031220 | 8300 | 1EC4 | 4689 | 89F6 | F856 | D8E9 | 2B00 | 89C0 |
| 0000031240 | F846 | 4689 | FFF6 | 0C76 | 76FF | C40A | 065E | FF26 |
| 0000031260 | 0C77 | 016A | 5EC4 | 2606 | 77FF | 260A | 77FF | 9A08 |
| 0000031300 | 3292 | 2124 | C483 | C40C | 065E | 3B26 | 0C47 | 0375 |
| 0000031320 | 00E9 | 8E00 | 0606 | 267A | 3E83 | 2F1E | 7500 | E903 |
| 0000031340 | 0087 | 7E83 | FEE0 | 0375 | 7EE9 | 8D00 | E846 | 5016 |
| 0000031360 | 468D | 16F6 | 8D50 | DC46 | 5016 | 681E | D154 | D868 |
| 0000031400 | FF03 | B236 | FF00 | B036 | FF00 | B636 | FF00 | B436 |
| 0000031420 | 1E00 | 4868 | 6801 | FFFF | FF68 | 9AFF | FFFF | 0000 |
| 0000031440 | C483 | 3D22 | 0000 | 0375 | 3EE9 | C400 | 065E | FF26 |
| 0000031460 | 0C77 | 5EC4 | 2606 | 77FF | 260A | 77FF | 8D08 | 7886 |
| 0000031500 | 16FF | 9A50 | 512C | 2FB2 | C483 | C40A | 065E | 8B26 |
| 0000031520 | 0C77 | 82C6 | FF78 | 8D00 | 7886 | 16FF | 1E50 | 5068 |
| 0000031540 | 9A01 | FFFF | 0000 | C483 | C408 | 065E | F626 | 1447 |
| 0000031560 | 7502 | E903 | 001B | 468B | 8B06 | 0856 | 068E | 7A0A |
| 0000031600 | A326 | 0AA0 | 8926 | A216 | 9A0A | 29E7 | 2D51 | 00E9 |
| 0000031620 | 5E00 | 835F | 02ED | E58B | 5D1F | CB4D | 581E | 4590 |

THU MAR 14 17:52:34 1991 TSLINT.DLL PAGE 15, LINE 827

| | | | | | | | | |
|---|---|---|---|---|---|---|---|---|
| 0000031640 | 8B55 | 1EEC | D88E | EC81 | 0012 | 5657 | 468D | 16F6 |
| 0000031660 | 8D50 | FA4E | 5116 | 76FF | FF08 | 0676 | 059A | 5C26 |
| 0000031700 | 8324 | 0CC4 | 76FF | FFFC | FA76 | 869A | DD62 | 8330 |
| 0000031720 | 04C4 | 5EC4 | 26FA | 77FF | 2606 | 77FF | 2604 | 77FF |
| 0000031740 | 2602 | 37FF | 76FF | FFF8 | F676 | 869A | 1262 | 8331 |
| 0000031760 | 04C4 | C28E | D88B | FF26 | 0677 | FF26 | 0477 | FF26 |
| 0000032000 | 0277 | FF26 | 8D37 | EE46 | 9A50 | A31C | 3036 | D88B |
| 0000032020 | FF36 | 0677 | FF36 | 0477 | FF36 | 0277 | FF36 | 9A37 |
| 0000032040 | 6DB2 | 307C | C483 | E908 | 0000 | 5F5E | ED83 | 8B02 |
| 0000032060 | 1FE5 | 4D5D | 1ECB | 9058 | 5545 | EC8B | 8E1E | 81D8 |
| 0000032100 | 0EEC | 5700 | 8D56 | FA46 | 5016 | 76FF | FF08 | 0676 |
| 0000032120 | 099A | AF25 | 8330 | 08C4 | 76FF | FFFC | FA76 | 869A |
| 0000032140 | 8662 | 8331 | 04C4 | C28E | D88B | FF26 | 0677 | FF26 |
| 0000032160 | 0477 | FF26 | 0277 | FF26 | 8D37 | F246 | 9A50 | A2B0 |
| 0000032200 | 30FC | D88B | FF36 | 0677 | FF36 | 0477 | FF36 | 0277 |
| 0000032220 | FF36 | 9A37 | 6DB2 | 30BD | C483 | E908 | 0000 | 5F5E |
| 0000032240 | ED83 | 8B02 | 1FE5 | 4D5D | 1ECB | 9058 | 5545 | EC8B |
| 0000032260 | 8E1E | 81D8 | 0EEC | 5700 | 8D56 | FA46 | 5016 | 76FF |
| 0000032300 | FF08 | 0676 | 099A | 4325 | 8331 | 08C4 | 76FF | FFFC |
| 0000032320 | FA76 | 869A | FA62 | 8331 | 04C4 | C28E | D88B | FF26 |
| 0000032340 | 0677 | FF26 | 0477 | FF26 | 0277 | FF26 | 8D37 | F246 |
| 0000032360 | 9A50 | A2C2 | 3170 | D88B | FF36 | 0677 | FF36 | 0477 |
| 0000032400 | FF36 | 0277 | FF36 | 9A37 | 6DB2 | 3151 | C483 | E908 |
| 0000032420 | 0000 | 5F5E | ED83 | 8B02 | 1FE5 | 4D5D | 1ECB | 9058 |
| 0000032440 | 5545 | EC8B | 8E1E | 81D8 | 06EC | 5700 | 8356 | B83E |
| 0000032460 | 0000 | 0375 | 21E9 | 6800 | 0100 | 681E | 7E20 | 016A |
| 0000032500 | 519A | C5B7 | 8331 | 08C4 | 016A | 749A | 33B6 | 8332 |
| 0000032520 | 02C4 | 06C7 | 00B8 | 0000 | 309A | 71BA | 8932 | FC56 |
| 0000032540 | 4689 | 8DFA | FA5E | C09A | 6299 | 8D32 | 0C1E | 9A7A |
| 0000032560 | 9E68 | 326C | EC83 | 8B08 | 9ADC | 9B29 | 31E4 | B29A |
| 0000032600 | 3D6D | 8332 | 08C4 | 00E9 | 5E00 | 835F | 02ED | E58B |
| 0000032620 | 5D1F | CB4D | 581E | 4590 | 8B55 | 1EEC | D88E | EC81 |
| 0000032640 | 000A | 5657 | 62A1 | 8B01 | 6416 | 8901 | F646 | 5689 |
| 0000032660 | 83F8 | B83E | 0000 | 0375 | 14E9 | 6800 | 0100 | 681E |
| 0000032700 | 7E20 | 016A | 519A | C6B7 | 8332 | 08C4 | 0CE9 | 1E00 |
| 0000032720 | 2068 | 9A7E | B8E4 | 32F0 | C483 | 8B04 | 0846 | 460B |
| 0000032740 | 7406 | E903 | 0022 | 006A | 006A | 5E9A | 2261 | 8333 |
| 0000032760 | 04C4 | 62A3 | 8901 | 6416 | FF01 | 6236 | 9A01 | B674 |
| 0000033000 | 3314 | C483 | E902 | 0044 | 468D | 16FA | FF50 | 0876 |
| 0000033020 | 76FF | 9A06 | 2509 | 31B7 | C483 | FF08 | FC76 | 76FF |
| 0000033040 | 9AFA | 6286 | 3337 | C483 | 8E04 | 8BC2 | 8DD8 | 9A1F |
| 0000033060 | 9935 | 3327 | F79A | 489B | A333 | 0162 | 1689 | 0164 |
| 0000033100 | 36FF | 0162 | 749A | 57B6 | 8333 | 02C4 | 06C7 | 00B8 |
| 0000033120 | 0000 | 5E8D | 9AF6 | 99C0 | 3352 | EC83 | 8B08 | 9ADC |
| 0000033140 | 9B29 | 3259 | B29A | 4B6D | 8332 | 08C4 | 00E9 | 5E00 |
| 0000033160 | 835F | 02ED | E58B | 5D1F | CB4D | 581E | 4590 | 8B55 |
| 0000033200 | 1EEC | D88E | EC81 | 0006 | 5657 | 76FF | FF08 | 0676 |
| 0000033220 | B868 | 6833 | 0AC4 | AB9A | AA04 | 8333 | 08C4 | 4689 |
| 0000033240 | 89FA | FC56 | D00B | 0374 | 30E9 | 6A00 | 6A00 | 6A00 |
| 0000033260 | FF3D | 0C76 | 76FF | 9A0A | 12B1 | 33C0 | C483 | 520A |
| 0000033300 | FF50 | 0876 | 76FF | 6806 | FFFF | C468 | 9A0A | 0147 |
| 0000033320 | 2DD3 | C483 | 890C | FA46 | 5689 | 8BFC | FA46 | 568B |
| 0000033340 | E9FC | 0000 | 5F5E | ED83 | 8B02 | 1FE5 | 4D5D | 1ECB |
| 0000033360 | 9058 | 5545 | EC8B | 8E1E | 81D8 | 0AEC | 5700 | 8E56 |
| 0000033400 | F606 | 2679 | 36FF | 373C | FF26 | 3A36 | 1E37 | 6668 |
| 0000033420 | 9A01 | 336A | 3306 | C483 | 8E08 | 1406 | 267A | B8A3 |
| 0000033440 | 260A | 1689 | 0ABA | 36FF | 79DA | 36FF | 79D8 | 36FF |
| 0000033460 | 79D6 | 36FF | 79D4 | B29A | 416D | 8334 | 08C4 | 5052 |
| 0000033500 | 068E | 7A14 | FF26 | BA36 | 260A | 36FF | 0AB8 | F29A |

THU MAR 14 17:52:34 1991 TSLINT.DLL PAGE 16, LINE 886

| | | | | | | | | |
|---|---|---|---|---|---|---|---|---|
| 0000033520 | 6457 | 8334 | 08C4 | 4689 | 89FA | FC56 | 76FF | FF0C |
| 0000033540 | 0A76 | 149A | 9551 | 8334 | 04C4 | FF50 | 0C76 | 76FF |
| 0000033560 | 9A0A | 6DF8 | 34A4 | C483 | C406 | FA5E | 8926 | 2607 |
| 0000033600 | 5789 | 8B02 | 0646 | 4689 | C7F8 | F646 | 0001 | D3E9 |
| 0000033620 | FF00 | F846 | 468B | 3908 | F846 | 037C | 79E9 | 8D00 |
| 0000033640 | F65E | CD9A | 9F99 | 8334 | 08EC | DC8B | 299A | DA9B |
| 0000033660 | 9A34 | 6DB2 | 34BC | C483 | 5208 | 8E50 | 1406 | 267A |
| 0000033700 | 36FF | 0ABA | FF26 | B836 | 9A0A | 57F2 | 34F3 | C483 |
| 0000033720 | 8908 | FA46 | 5689 | 8BFC | F85E | E3C1 | C402 | 0E76 |
| 0000033740 | FF26 | 0270 | FF26 | 9A30 | 5114 | 350E | C483 | 5004 |
| 0000033760 | 5E8B | C1F8 | 02E3 | 76C4 | 260E | 70FF | 2602 | 30FF |
| 0000034000 | F89A | 1D6D | 8335 | 06C4 | 5EC4 | 26FA | 0789 | 8926 |
| 0000034020 | 0257 | 46FF | E9F6 | FF79 | 5E8D | 9AF6 | 99CD | 3518 |
| 0000034040 | EC83 | 8B08 | 9ADC | 9B29 | 32DD | 5E9A | B76D | 8332 |
| 0000034060 | 08C4 | 5052 | 681E | 016B | 6A9A | 0433 | 8334 | 08C4 |
| 0000034100 | 068E | 7A16 | A326 | 0A7C | 8926 | 7E16 | 5E0A | 835F |
| 0000034120 | 02ED | E58B | 5D1F | CB4D | 581E | 4590 | 8B55 | 1EEC |
| 0000034140 | D88E | EC81 | 0038 | 5657 | 46C7 | 70FA | 8C01 | FC5E |
| 0000034160 | 46C7 | 07E6 | 2B01 | 89C0 | D846 | 4689 | 8ED6 | 0606 |
| 0000034200 | 267A | 3E83 | 361C | 7500 | E903 | 001D | 36FF | 00B6 |
| 0000034220 | 36FF | 00B4 | 468D | 16CC | 9A50 | 2F34 | 0000 | C483 |
| 0000034240 | 3D08 | 0000 | 0374 | 0FE9 | 8E00 | 0806 | 267A | 3E83 |
| 0000034260 | 3634 | 7500 | E903 | 003B | 681E | 0177 | 468D | 16DA |
| 0000034300 | 8D50 | CC46 | 5016 | 468D | 16F0 | 6850 | 0461 | 681E |
| 0000034320 | 01E8 | 36FF | 00B2 | 36FF | 00B0 | 36FF | 00B6 | 36FF |
| 0000034340 | 00B4 | 7D9A | 002F | 8300 | 1EC4 | 4689 | 89F0 | F256 |
| 0000034360 | 08E9 | 2B00 | 89C0 | F246 | 4689 | 8DF0 | E846 | 5016 |
| 0000034400 | 468D | 16EC | FF50 | 0876 | 76FF | 9A06 | 2605 | 3643 |
| 0000034420 | C483 | 890C | C846 | 7548 | E903 | 009F | 7E83 | 02C8 |
| 0000034440 | 0375 | 96E9 | 8E00 | 0606 | 267A | 3E83 | 3707 | 7500 |
| 0000034460 | E903 | 0009 | 7E83 | FED0 | 0374 | 0FE9 | 8E00 | 0806 |
| 0000034500 | 267A | 3E83 | 2F4A | 7500 | E903 | 0060 | 681E | 017E |
| 0000034520 | A09A | A369 | 8336 | D4C4 | 4689 | 89D2 | D456 | 76FF |
| 0000034540 | FFD8 | D676 | 468D | 16D2 | FF50 | E676 | 76FF | FFFC |
| 0000034560 | FA76 | 4E8D | 16DA | 8D51 | FD4E | 5116 | 4E8D | 16CC |
| 0000034600 | 1E51 | E868 | 6801 | 0469 | 36FF | 00B2 | 36FF | 00B0 |
| 0000034620 | 36FF | 00B6 | 36FF | 00B4 | FF9A | 00FF | 8300 | 28C4 |
| 0000034640 | 468B | 8BD2 | D456 | 50E9 | E902 | 00DF | 681E | 01A4 |
| 0000034660 | A09A | 2B69 | 8335 | 04C4 | 3EE9 | FF02 | EE76 | 76FF |
| 0000034700 | 9AEC | 6514 | 36E8 | C483 | 8904 | EC46 | 5689 | C4EE |
| 0000034720 | EC5E | 8B26 | 0847 | 8B26 | 0A57 | 4689 | 89F6 | F856 |
| 0000034740 | 7E83 | 01C8 | 0374 | 06E9 | B800 | 0000 | 1EE9 | FF00 |
| 0000034760 | EA76 | 76FF | 9AE8 | 6286 | 3429 | C483 | 8E04 | 8BC2 |
| 0000035000 | 8DD8 | 9A1F | 9935 | 36FB | F79A | 559B | 8934 | CA46 |
| 0000035020 | 068E | 7A06 | 8326 | 5A3E | 0037 | 0375 | 44E9 | 8300 |
| 0000035040 | D07E | 75FE | E903 | 003B | 76FF | FFF8 | F676 | 681E |
| 0000035060 | 01CA | 468D | 16DA | 8D50 | F046 | 5016 | 468D | 16CC |
| 0000035100 | 1E50 | E868 | 6801 | 046C | 36FF | 00B2 | 36FF | 00B0 |
| 0000035120 | 36FF | 00B6 | 36FF | 00B4 | 0668 | 9A01 | 379C | 0000 |
| 0000035140 | C483 | 8E24 | 0606 | 267A | 3E83 | 37AA | 7500 | E903 |
| 0000035160 | 0041 | 7E83 | FED0 | 0375 | 38E9 | FF00 | CA76 | 681E |
| 0000035200 | 01CC | 468D | 16DA | 8D50 | F046 | 5016 | 468D | 16CC |
| 0000035220 | 1E50 | E868 | 6801 | 046C | 36FF | 00B2 | 36FF | 00B0 |
| 0000035240 | 36FF | 00B6 | 36FF | 00B4 | 0168 | 9A01 | FFFF | 0000 |
| 0000035260 | C483 | 8E22 | 0606 | 267A | 3E83 | 2FCA | 7500 | E903 |
| 0000035300 | 004E | 7E83 | FED0 | 0375 | 45E9 | FF00 | CA76 | 76FF |
| 0000035320 | FFF8 | F676 | 681E | 01CE | 468D | 16DA | 8D50 | F046 |
| 0000035340 | 5016 | 468D | 16CC | 1E50 | E868 | 6801 | 046D | 36FF |
| 0000035360 | 00B2 | 36FF | 00B0 | 36FF | 00B6 | 36FF | 00B4 | 681E |

THU MAR 14 17:52:34 1991 TSLINT.DLL PAGE 17, LINE 945

| | | | | | | | | |
|---|---|---|---|---|---|---|---|---|
| 0000035400 | 01DF | 0668 | 6830 | 3009 | FF9A | 00FF | 8300 | 2CC4 |
| 0000035420 | 068E | 7A18 | 8326 | 563E | 0038 | 0374 | 11E9 | FF00 |
| 0000035440 | F876 | 76FF | 8BF6 | CA46 | 5299 | 9A50 | FFFF | 0000 |
| 0000035460 | FF9A | 00FF | 8900 | F446 | 003D | 7500 | E903 | 000B |
| 0000035500 | 76FF | 9AF4 | AFE0 | 3389 | C483 | 8E02 | 0606 | 267A |
| 0000035520 | 3E83 | 3574 | 7500 | E903 | 0009 | 7E83 | FED0 | 0374 |
| 0000035540 | 0FE9 | 8E00 | 0806 | 267A | 3E83 | 35A0 | 7500 | E903 |
| 0000035560 | 006C | 36FF | 79DA | 36FF | 79D8 | 36FF | 79D6 | 36FF |
| 0000035600 | 79D4 | B29A | E16D | 8338 | 08C4 | 4689 | 89D2 | D456 |
| 0000035620 | 76FF | FFD8 | D676 | 468D | 16D2 | FF50 | E676 | 76FF |
| 0000035640 | FFFC | FA76 | 4E8D | 16DA | 8D51 | F04E | 5116 | 4E8D |
| 0000035660 | 16CC | 1E51 | E868 | 6801 | 0473 | 36FF | 00B2 | 36FF |
| 0000035700 | 00B0 | 36FF | 00B6 | 36FF | 00B4 | 899A | 0036 | 8300 |
| 0000035720 | 28C4 | 468B | 8BD2 | D456 | 1EE9 | E900 | 001B | 36FF |
| 0000035740 | 79DA | 36FF | 79D8 | 36FF | 79D6 | 36FF | 79D4 | B29A |
| 0000035760 | B46D | 8336 | 08C4 | 00E9 | 5E00 | 835F | 02ED | E58B |
| 0000036000 | 5D1F | CB4D | 581E | 4590 | 8B55 | 1EEC | D88E | EC81 |
| 0000036020 | 0038 | 5657 | 46C7 | F0FA | 8C01 | FC5E | 46C7 | 07E6 |
| 0000036040 | 2B01 | 89C0 | D846 | 4689 | 8ED6 | D606 | 267A | 3E83 |
| 0000036060 | 39C8 | 7500 | E903 | 001D | 36FF | 00B6 | 36FF | 00B4 |
| 0000036100 | 468D | 16CC | 9A50 | 358A | 0000 | C483 | 3D08 | 0000 |
| 0000036120 | 0374 | 0FE9 | 8E00 | 0806 | 267A | 3E83 | 39E0 | 7500 |
| 0000036140 | E903 | 003B | 681E | 01F7 | 468D | 16DA | 8D50 | CC46 |
| 0000036160 | 5016 | 468D | 16F0 | 6850 | 047D | 681E | 026A | 36FF |
| 0000036200 | 00B2 | 36FF | 00B0 | 36FF | 00B6 | 36FF | 00B4 | D39A |
| 0000036220 | 0035 | 8300 | 1EC4 | 4689 | 89F0 | F256 | 08E9 | 2B00 |
| 0000036240 | 89C0 | F246 | 4689 | 8DF0 | E846 | 5016 | 468D | 16EC |
| 0000036260 | FF50 | 0876 | 76FF | 9A06 | 2605 | 39EF | C483 | 890C |
| 0000036300 | C846 | 7548 | E903 | 009F | 7E83 | 02C8 | 0375 | 96E9 |
| 0000036320 | 8E00 | 0606 | 267A | 3E83 | 3842 | 7500 | E903 | 0009 |
| 0000036340 | 7E83 | FED0 | 0374 | 0FE9 | 8E00 | 0806 | 267A | 3E83 |
| 0000036360 | 385A | 7500 | E903 | 0060 | 681E | 01FE | A09A | 4F69 |
| 0000036400 | 833A | 04C4 | 4689 | 89D2 | D456 | 76FF | FFD8 | D676 |
| 0000036420 | 468D | 16D2 | FF50 | E676 | 76FF | FFFC | FA76 | 4E8D |
| 0000036440 | 16DA | 8D51 | F04E | 5116 | 4E8D | 16CC | 1E51 | 6A68 |
| 0000036460 | 6802 | 0484 | 36FF | 00B2 | 36FF | 00B0 | 36FF | 00B6 |
| 0000036500 | 36FF | 00B4 | BB9A | 0038 | 8300 | 28C4 | 468B | 8BD2 |
| 0000036520 | D456 | 50E9 | E902 | 000F | 681E | 0225 | A09A | FE69 |
| 0000036540 | 8335 | 04C4 | 3EE9 | FF02 | EE76 | 76FF | 9AEC | 6514 |
| 0000036560 | 3A94 | C483 | 8904 | EC46 | 5689 | C4EE | EC5E | 8B26 |
| 0000036600 | 0847 | 8B26 | 0A57 | 4689 | 89F6 | F856 | 7E83 | 01C8 |
| 0000036620 | 0374 | 06E9 | B800 | 0000 | 1EE9 | FF00 | EA76 | 76FF |
| 0000036640 | 9AE8 | 6286 | 3C21 | C483 | 8E04 | 8BC2 | 8DD8 | 9A1F |
| 0000036660 | 9935 | 3AA7 | F79A | F69B | 8936 | CA46 | 068E | 7A06 |
| 0000036700 | 8326 | 063E | 003B | 0375 | 44E9 | 8300 | D07E | 75FE |
| 0000036720 | E903 | 003B | 76FF | FFF8 | F676 | 681E | 024C | 468D |
| 0000036740 | 16DA | 8D50 | F046 | 5016 | 468D | 16CC | 1E50 | 6A68 |
| 0000036760 | 6802 | 0487 | 36FF | 00B2 | 36FF | 00B0 | 36FF | 00B6 |
| 0000037000 | 36FF | 00B4 | 0668 | 9A01 | 3B48 | 0000 | C483 | 8E24 |
| 0000037020 | 0606 | 267A | 3E83 | 3B56 | 7500 | E903 | 0041 | 7E83 |
| 0000037040 | FED0 | 0375 | 38E9 | FF00 | CA76 | 681E | 024E | 468D |
| 0000037060 | 16DA | 8D50 | F046 | 5016 | 468D | 16CC | 1E50 | 6A68 |
| 0000037100 | 6802 | 0487 | 36FF | 00B2 | 36FF | 00B0 | 36FF | 00B6 |
| 0000037120 | 36FF | 00B4 | 0168 | 9A01 | 374C | 0000 | C483 | 8E22 |
| 0000037140 | 0606 | 267A | 3E83 | 3BEE | 7500 | E903 | 004E | 7E83 |
| 0000037160 | FED0 | 0375 | 45E9 | FF00 | CA76 | 76FF | FFF8 | F676 |
| 0000037200 | 681E | 0250 | 468D | 16DA | 8D50 | F046 | 5016 | 468D |
| 0000037220 | 16CC | 1E50 | 6A68 | 6802 | 0488 | 36FF | 00B2 | 36FF |
| 0000037240 | 00B0 | 36FF | 00B6 | 36FF | 00B4 | 681E | 0262 | F368 |

THU MAR 14 17:52:34 1991 TSLINT.DLL PAGE 18, LINE 1004

| | | | | | | | | |
|---|---|---|---|---|---|---|---|---|
| 0000037260 | 6837 | 37F6 | F99A | 0037 | 8300 | 2CC4 | 068E | 7A18 |
| 0000037300 | 8326 | 563E | 0038 | 0374 | 11E9 | FF00 | F876 | 76FF |
| 0000037320 | 8BF6 | CA46 | 5299 | 9A50 | FFFF | 0000 | 219A | 0038 |
| 0000037340 | 8900 | F446 | 003D | 7500 | E903 | 000B | 76FF | 9AF4 |
| 0000037360 | AFE0 | 3836 | C483 | 8E02 | 0606 | 267A | 3E83 | 3920 |
| 0000037400 | 7500 | E903 | 0009 | 7E83 | FED0 | 0374 | 0FE9 | 8E00 |
| 0000037420 | 0806 | 267A | 3E83 | 394C | 7500 | E903 | 006C | 36FF |
| 0000037440 | 79DA | 36FF | 79D8 | 36FF | 79D6 | 36FF | 79D4 | B29A |
| 0000037460 | 8D6D | 833C | 08C4 | 4689 | 89D2 | D456 | 76FF | FFD8 |
| 0000037500 | D676 | 468D | 16D2 | FF50 | E676 | 76FF | FFFC | FA76 |
| 0000037520 | 4E8D | 16DA | 8D51 | F04E | 5116 | 4E8D | 16CC | 1E51 |
| 0000037540 | 6A88 | 6802 | 048E | 36FF | 00B2 | 36FF | 00B0 | 36FF |
| 0000037560 | 00B6 | 36FF | 00B4 | 359A | 003A | 8300 | 28C4 | 468B |
| 0000037600 | 8BD2 | D456 | 1EE9 | E900 | 001B | 36FF | 79DA | 36FF |
| 0000037620 | 79D8 | 36FF | 79D6 | 36FF | 79D4 | B29A | 756D | 8338 |
| 0000037640 | 08C4 | 00E9 | 5E00 | 835F | 02ED | E58B | 5D1F | CB4D |
| 0000037660 | 581E | 4590 | 8B55 | 1EEC | D88E | EC81 | 002E | 5657 |
| 0000037700 | 46C7 | 73FA | 8C02 | FC5E | 46C7 | 07EE | 2B01 | 89C0 |
| 0000037720 | E046 | 4689 | 8EDE | 0606 | 267A | 3E83 | 3D63 | 7500 |
| 0000037740 | E903 | 001D | 36FF | 00B6 | 36FF | 00B4 | 468D | 16D4 |
| 0000037760 | 9A50 | 3936 | 0000 | C483 | 3D08 | 0000 | 0374 | 0FE9 |
| 0000040000 | 8E00 | 0806 | 267A | 3E83 | 3D7B | 7500 | E903 | 003B |
| 0000040020 | 681E | 027A | 468D | 16E2 | 8D50 | D446 | 5016 | 468D |
| 0000040040 | 16F4 | 6850 | 049B | 681E | 0312 | 36FF | 00B2 | 36FF |
| 0000040060 | 00B0 | 36FF | 00B6 | 36FF | 00B4 | 7F9A | 0039 | 8300 |
| 0000040100 | 1EC4 | 4689 | 89F4 | F656 | 08E9 | 2B00 | 89C0 | F646 |
| 0000040120 | 4689 | 8DF4 | F046 | 5016 | 76FF | FF08 | 0676 | 099A |
| 0000040140 | 8A25 | 833D | 08C4 | 7548 | E903 | 0096 | 068E | 7A06 |
| 0000040160 | 8326 | 1A3E | 003E | 0375 | D9E9 | 8300 | D87E | 74FE |
| 0000040200 | E903 | 000F | 068E | 7A08 | 8326 | BE3E | 003E | 0375 |
| 0000040220 | 60E9 | 1E00 | 8168 | 9A02 | 69A0 | 3DEA | C483 | 8904 |
| 0000040240 | DA46 | 5689 | FFDC | E076 | 76FF | 8DDE | DA46 | 5016 |
| 0000040260 | 76FF | FFEE | FC76 | 76FF | 8DFA | E24E | 5116 | 4E8D |
| 0000040300 | 16F4 | 8D51 | D44E | 5116 | 681E | 0312 | A368 | FF04 |
| 0000040320 | B236 | FF00 | B036 | FF00 | B636 | FF00 | B436 | 9A0D |
| 0000040340 | 3F1F | 0000 | C483 | 8B28 | DA46 | 568B | E9DC | 016D |
| 0000040360 | 0FE9 | 1E00 | B868 | 9A02 | 69A0 | 39AA | C483 | E904 |
| 0000040400 | 015B | 76FF | FFF2 | F076 | 869A | D962 | 833E | 04C4 |
| 0000040420 | C28E | D88B | 1F8D | 359A | 0E99 | 9A3E | 9BF7 | 3AA2 |
| 0000040440 | 4689 | 8ED2 | 0606 | 267A | 3E83 | 3EA6 | 7500 | E903 |
| 0000040460 | 0048 | 7E83 | FED8 | 0375 | 3FE9 | FF00 | D276 | 681E |
| 0000040500 | 02EF | 468D | 16E2 | 8D50 | F446 | 5016 | 468D | 16D4 |
| 0000040520 | 1E50 | 1268 | 6803 | 04A5 | 36FF | 00B2 | 36FF | 00B0 |
| 0000040540 | 36FF | 00B6 | 36FF | 00B4 | 681E | 030A | 9F68 | 683B |
| 0000040560 | 3BA2 | A59A | 003B | 8300 | 28C4 | 068E | 7A18 | 8326 |
| 0000040600 | 563E | 0038 | 0374 | 0BE9 | 8B00 | D246 | 5299 | 9A50 |
| 0000040620 | FFFF | 0000 | CD9A | 003B | 8900 | F846 | 003D | 7500 |
| 0000040640 | E903 | 000B | 76FF | 9AF8 | AFE0 | 3BE2 | C483 | 8E02 |
| 0000040660 | 0606 | 267A | 3E83 | 3AB3 | 7500 | E903 | 0009 | 7E83 |
| 0000040700 | FED8 | 0374 | 0FE9 | 8E00 | 0806 | 267A | 3E83 | 3C06 |
| 0000040720 | 7500 | E903 | 006C | 36FF | 79DA | 36FF | 79D8 | 36FF |
| 0000040740 | 79D6 | 36FF | 79D4 | B29A | 456D | 833F | 08C4 | 4689 |
| 0000040760 | 89DA | DC56 | 76FF | FFE0 | DE76 | 468D | 16DA | FF50 |
| 0000041000 | EE76 | 76FF | FFFC | FA76 | 4E8D | 16E2 | 8D51 | F44E |
| 0000041020 | 5116 | 4E8D | 16D4 | 1E51 | 1268 | 6803 | 04AB | 36FF |
| 0000041040 | 00B2 | 36FF | 00B0 | 36FF | 00B6 | 36FF | 00B4 | 679A |
| 0000041060 | 003C | 8300 | 28C4 | 468B | 8BDA | DC56 | 1EE9 | E900 |
| 0000041100 | 001B | 36FF | 79DA | 36FF | 79D8 | 36FF | 79D6 | 36FF |
| 0000041120 | 79D4 | B29A | 606D | 833A | 08C4 | 00E9 | 5E00 | 835F |

THU MAR 14 17:52:34 1991 TSLINT.DLL PAGE 19, LINE 1063

| | | | | | | | | |
|---|---|---|---|---|---|---|---|---|
| 0000041140 | 02ED | E58B | 5D1F | CB4D | 581E | 4590 | 8B55 | 1EEC |
| 0000041160 | D88E | EC81 | 0044 | 5657 | 46C7 | 28F8 | 8C03 | FA5E |
| 0000041200 | 46C7 | 07DC | 2B01 | 89C0 | CE46 | 4689 | 8ECC | 0606 |
| 0000041220 | 267A | 3E83 | 4039 | 7500 | E903 | 001D | 36FF | 00B6 |
| 0000041240 | 36FF | 00B4 | 468D | 16C2 | 9A50 | 3CE2 | 0000 | C483 |
| 0000041260 | 3D08 | 0000 | 0374 | 0FE9 | 8E00 | 0806 | 267A | 3E83 |
| 0000041300 | 4051 | 7500 | E903 | 003B | 681E | 032F | 468D | 16D0 |
| 0000041320 | 8D50 | C246 | 5016 | 468D | 16EE | 6850 | 04B5 | 681E |
| 0000041340 | 03C8 | 36FF | 00B2 | 36FF | 00B0 | 36FF | 00B6 | 36FF |
| 0000041360 | 00B4 | 2B9A | 003D | 8300 | 1EC4 | 4689 | 89EE | F056 |
| 0000041400 | 08E9 | 2B00 | 89C0 | F046 | 4689 | 8DEE | DE46 | 5016 |
| 0000041420 | 468D | 16E2 | 8D50 | E646 | 5016 | 468D | 16EA | FF50 |
| 0000041440 | 0876 | 76FF | 9A06 | 2A07 | 4060 | C483 | 8914 | BE46 |
| 0000041460 | 7E83 | 02BE | 037D | 09E9 | 8300 | BE7E | 7F04 | E903 |
| 0000041500 | 0096 | 068E | 7A06 | 8326 | 773E | 0041 | 0375 | 09E9 |
| 0000041520 | 8300 | C67E | 74FE | E903 | 000F | 068E | 7A08 | 8326 |
| 0000041540 | 303E | 0042 | 0375 | 60E9 | 1E00 | 3668 | 9A03 | 69A0 |
| 0000041560 | 40C0 | C483 | 89D4 | C846 | 5689 | FFCA | CE76 | 76FF |
| 0000041600 | 8DCC | C846 | 5016 | 76FF | FFDC | FA76 | 76FF | 8DF8 |
| 0000041620 | D04E | 5116 | 4E8D | 16EE | 8D51 | C24E | 5116 | 681E |
| 0000041640 | 03C8 | BE68 | FF04 | B236 | FF00 | B036 | FF00 | B636 |
| 0000041660 | FF00 | B436 | 9A00 | 4291 | 0000 | C483 | 8B28 | C846 |
| 0000041700 | 568B | E9CA | 0209 | 0FE9 | 1E00 | 6868 | 9A03 | 69A0 |
| 0000041720 | 3D51 | C483 | E904 | 01F7 | 76FF | FFEC | EA76 | 869A |
| 0000041740 | F262 | 8340 | 04C4 | C28E | D88B | 1F8D | 359A | E499 |
| 0000041760 | 9A40 | 9BF7 | 4100 | 4689 | FFC0 | E876 | 76FF | 9AE6 |
| 0000042000 | 6286 | 411C | C483 | 8E04 | 8BC2 | 8DD8 | 9A1F | 9935 |
| 0000042020 | 4105 | F79A | 2A9B | 8941 | BC46 | 7E83 | 03BE | 037D |
| 0000042040 | 21E9 | FF00 | E476 | 76FF | 9AE2 | 6286 | 414C | C483 |
| 0000042060 | 8E04 | 8BC2 | 8DD8 | 9A1F | 9935 | 412F | F79A | 5A9B |
| 0000042100 | E941 | 0003 | 00B8 | 8900 | FC46 | 7E83 | 04BE | 037D |
| 0000042120 | 21E9 | FF00 | E076 | 76FF | 9ADE | 6286 | 424B | C483 |
| 0000042140 | 8E04 | 8BC2 | 8DD8 | 9A1F | 9935 | 415F | F79A | 099B |
| 0000042160 | E93E | 0006 | 00B8 | BA00 | 0000 | 4689 | 89F4 | F656 |
| 0000042200 | 068E | 7A06 | 8326 | 183E | 0042 | 0375 | 54E9 | 8300 |
| 0000042220 | C67E | 75FE | E903 | 004B | 76FF | FFF6 | F476 | 76FF |
| 0000042240 | FFFC | BC76 | 76FF | 1EC0 | 9A68 | 8D03 | D046 | 5016 |
| 0000042260 | 468D | 16EE | 8D50 | C246 | 5016 | 681E | 03C8 | C368 |
| 0000042300 | FF04 | B236 | FF00 | B036 | FF00 | B636 | FF00 | B436 |
| 0000042320 | 1E00 | BF68 | 6803 | 3E5D | 6068 | 9A3E | 3E63 | 0000 |
| 0000042340 | C483 | 8E30 | 1806 | 267A | 3E83 | 3856 | 7400 | E903 |
| 0000042360 | 0014 | 76FF | FFC0 | BC76 | 76FF | FFFC | F676 | 76FF |
| 0000042400 | 9AF4 | FFFF | 0000 | 859A | 003E | 8900 | F246 | 003D |
| 0000042420 | 7500 | E903 | 000B | 76FF | 9AF2 | AFE0 | 3E9A | C483 |
| 0000042440 | 8E02 | 0606 | 267A | 3E83 | 3CCC | 7500 | E903 | 0009 |
| 0000042460 | 7E83 | FEC6 | 0374 | 0FE9 | 8E00 | 0806 | 267A | 3E83 |
| 0000042500 | 3CF8 | 7500 | E903 | 006C | 36FF | 79DA | 36FF | 79D8 |
| 0000042520 | 36FF | 79D6 | 36FF | 79D4 | B29A | B76D | 8342 | 08C4 |
| 0000042540 | 4689 | 89C8 | CA56 | 76FF | FFCE | CC76 | 468D | 16C8 |
| 0000042560 | FF50 | DC76 | 76FF | FFFA | F876 | 4E8D | 16D0 | 8D51 |
| 0000042600 | EE4E | 5116 | 4E8D | 16C2 | 1E51 | C868 | 6803 | 04C8 |
| 0000042620 | 36FF | 00B2 | 36FF | 00B0 | 36FF | 00B6 | 36FF | 00B4 |
| 0000042640 | D09A | 003D | 8300 | 28C4 | 468B | 8BC8 | CA56 | 1EE9 |
| 0000042660 | E900 | 001B | 36FF | 79DA | 36FF | 79D8 | 36FF | 79D6 |
| 0000042700 | 36FF | 79D4 | B29A | FB6D | 833D | 08C4 | 00E9 | 5E00 |
| 0000042720 | 835F | 02ED | E58B | 5D1F | CB4D | 581E | 4590 | 8B55 |
| 0000042740 | 1EEC | D88E | EC81 | 0044 | 5657 | 46C7 | DCF8 | 8C03 |
| 0000042760 | FA5E | 46C7 | 07DC | 2B01 | 89C0 | CE46 | 4689 | 8ECC |
| 0000043000 | 0606 | 267A | 3E83 | 43AB | 7500 | E903 | 001D | 36FF |

THU MAR 14 17:52:34 1991 TSLINT.DLL PAGE 20, LINE 1122

| | | | | | | | | |
|---|---|---|---|---|---|---|---|---|
| 0000043020 | 00B6 | 36FF | 00B4 | 468D | 16C2 | 9A50 | 3F9A | 0000 |
| 0000043040 | C483 | 3D08 | 0000 | 0374 | 0FE9 | 8E00 | 0806 | 267A |
| 0000043060 | 3E83 | 43C3 | 7500 | E903 | 003B | 681E | 03E3 | 468D |
| 0000043100 | 16D0 | 8D50 | C246 | 5016 | 468D | 16EE | 6850 | 04D4 |
| 0000043120 | 681E | 047C | 36FF | 00B2 | 36FF | 00B0 | 36FF | 00B6 |
| 0000043140 | 36FF | 00B4 | E39A | 003F | 8300 | 1EC4 | 4689 | 89EE |
| 0000043160 | F056 | 08E9 | 2B00 | 89C0 | F046 | 4689 | 8DEE | DE46 |
| 0000043200 | 5016 | 468D | 16E2 | 8D50 | E646 | 5016 | 468D | 16EA |
| 0000043220 | FF50 | 0876 | 76FF | 9A06 | 2A07 | 43D2 | C483 | 8914 |
| 0000043240 | BE46 | 7E83 | 02BE | 037D | 09E9 | 8300 | BE7E | 7F04 |
| 0000043260 | E903 | 0096 | 068E | 7A06 | 8326 | E93E | 0044 | 0375 |
| 0000043300 | 09E9 | 8300 | C67E | 74FE | E903 | 000F | 068E | 7A08 |
| 0000043320 | 8326 | B03E | 003F | 0375 | 60E9 | 1E00 | EA68 | 9A03 |
| 0000043340 | 69A0 | 4432 | C483 | 8904 | C846 | 5689 | FFCA | CE76 |
| 0000043360 | 76FF | 8DCC | C846 | 5016 | 76FF | FFDC | FA76 | 76FF |
| 0000043400 | 8DF8 | D04E | 5116 | 4E8D | 16EE | 8D51 | C24E | 5116 |
| 0000043420 | 681E | 047C | DD68 | FF04 | B236 | FF00 | B036 | FF00 |
| 0000043440 | B636 | FF00 | B436 | 9A00 | 40A6 | 0000 | C483 | 8B28 |
| 0000043460 | C846 | 568B | E9CA | 0209 | 0FE9 | 1E00 | 1C68 | 9AD4 |
| 0000043500 | 69A0 | 4018 | C483 | E904 | 01F7 | 76FF | FFEC | EA76 |
| 0000043520 | 869A | 6462 | 8344 | 04C4 | C28E | D88B | 1F8D | 359A |
| 0000043540 | 5699 | 9A44 | 9BF7 | 4472 | 4689 | FFC0 | E876 | 76FF |
| 0000043560 | 9AE6 | 6286 | 448E | C483 | 8E04 | 8BC2 | 8DD8 | 9A1F |
| 0000043600 | 9935 | 4477 | F79A | 9C9B | 8944 | BC46 | 7E83 | 03BE |
| 0000043620 | 037D | 21E9 | FF00 | E476 | 76FF | 9AE2 | 6286 | 44BE |
| 0000043640 | C483 | 8E04 | 8BC2 | 8DD8 | 9A1F | 9935 | 44A1 | F79A |
| 0000043660 | CC9B | E944 | 0003 | 00B8 | 8900 | FC46 | 7E83 | 04BE |
| 0000043700 | 037D | 21E9 | FF00 | E076 | 76FF | 9ADE | 6286 | 40D1 |
| 0000043720 | C483 | 8E04 | 8BC2 | 8DD8 | 9A1F | 9935 | 44D1 | F79A |
| 0000043740 | DF9B | E940 | 0006 | 00B8 | BA00 | 0000 | 4689 | 89F4 |
| 0000043760 | F656 | 068E | 7A06 | 8326 | 843E | 003F | 0375 | 54E9 |
| 0000044000 | 8300 | C67E | 75FE | E903 | 004B | 76FF | FFF6 | F476 |
| 0000044020 | 76FF | FFFC | BC76 | 76FF | 1EC0 | 4E68 | 8D04 | D046 |
| 0000044040 | 5016 | 468D | 16EE | 8D50 | C246 | 5016 | 681E | 047C |
| 0000044060 | E268 | FF04 | B236 | FF00 | B036 | FF00 | B636 | FF00 |
| 0000044100 | B436 | 1E00 | 7368 | 6804 | 41C6 | C968 | 9A41 | 41CC |
| 0000044120 | 0000 | C483 | 8E30 | 1806 | 267A | 3E83 | 3856 | 7400 |
| 0000044140 | E903 | 0014 | 76FF | FFC0 | BC76 | 76FF | FFFC | F676 |
| 0000044160 | 76FF | 9AF4 | FFFF | 0000 | F79A | 0041 | 8900 | F246 |
| 0000044200 | 003D | 7500 | E903 | 000B | 76FF | 9AF2 | AFE0 | 420C |
| 0000044220 | C483 | 8E02 | 0606 | 267A | 3E83 | 42F6 | 7500 | E903 |
| 0000044240 | 0009 | 7E83 | FEC6 | 0374 | 0FE9 | 8E00 | 0806 | 267A |
| 0000044260 | 3E83 | 4322 | 7500 | E903 | 006C | 36FF | 79DA | 36FF |
| 0000044300 | 79D8 | 36FF | 79D6 | 36FF | 79D4 | B29A | 296D | 8346 |
| 0000044320 | 08C4 | 4689 | 89C8 | CA56 | 76FF | FFCE | CC76 | 468D |
| 0000044340 | 16C8 | FF50 | DC76 | 76FF | FFFA | F876 | 4E8D | 16D0 |
| 0000044360 | 8D51 | EE4E | 5116 | 4E8D | 16C2 | 1E51 | 7C68 | 6804 |
| 0000044400 | 04E7 | 36FF | 00B2 | 36FF | 00B0 | 36FF | 00B6 | 36FF |
| 0000044420 | 00B4 | 189A | 0044 | 8300 | 28C4 | 468B | 8BC8 | CA56 |
| 0000044440 | 1EE9 | E900 | 001B | 36FF | 79DA | 36FF | 79D8 | 36FF |
| 0000044460 | 79D6 | 36FF | 79D4 | B29A | 436D | 8344 | 08C4 | 00E9 |
| 0000044500 | 5E00 | 835F | 02ED | E58B | 5D1F | CB4D | 581E | 4590 |
| 0000044520 | 8B55 | 1EEC | D88E | EC81 | 0044 | 5657 | 46C7 | 90F8 |
| 0000044540 | 8C04 | FA5E | 46C7 | 07DC | 2B01 | 89C0 | CE46 | 4689 |
| 0000044560 | 8ECC | 0606 | 267A | 3E83 | 471D | 7500 | E903 | 001D |
| 0000044600 | 36FF | 00B6 | 36FF | 00B4 | 468D | 16C2 | 9A50 | 430C |
| 0000044620 | 0000 | C483 | 3D08 | 0000 | 0374 | 0FE9 | 8E00 | 0806 |
| 0000044640 | 267A | 3E83 | 4735 | 7500 | E903 | 003B | 681E | 0497 |
| 0000044660 | 468D | 16D0 | 8D50 | C246 | 5016 | 468D | 16EE | 6850 |

THU MAR 14 17:52:34 1991 TSLINT.DLL PAGE 21, LINE 1181

| | | | | | | | | |
|---|---|---|---|---|---|---|---|---|
| 0000044700 | 04F3 | 681E | 052A | 36FF | 00B2 | 36FF | 00B0 | 36FF |
| 0000044720 | 00B6 | 36FF | 00B4 | 559A | 0043 | 8300 | 1EC4 | 4689 |
| 0000044740 | 89EE | F056 | 08E9 | 2B00 | 89C0 | F046 | 4689 | 8DEE |
| 0000044760 | DE46 | 5016 | 468D | 16E2 | 8D50 | E646 | 5016 | 468D |
| 0000045000 | 16EA | FF50 | 0876 | 76FF | 9A06 | 2A07 | 4744 | C483 |
| 0000045020 | 8914 | BE46 | 7E83 | 02BE | 037D | 09E9 | 8300 | BE7E |
| 0000045040 | 7F04 | E903 | 0096 | 068E | 7A06 | 8326 | 5B3E | 0048 |
| 0000045060 | 0375 | 09E9 | 8300 | C67E | 74FE | E903 | 000F | 068E |
| 0000045100 | 7A08 | 8326 | 143E | 0049 | 0375 | 60E9 | 1E00 | 9E68 |
| 0000045120 | 9A04 | 69A0 | 47A4 | C483 | 8904 | C846 | 5689 | FFCA |
| 0000045140 | CE76 | 76FF | 8DCC | C846 | 5016 | 76FF | FFDC | FA76 |
| 0000045160 | 76FF | 8DF8 | D04E | 5116 | 4E8D | 16EE | 8D51 | C24E |
| 0000045200 | 5116 | 681E | 052A | FC68 | FF04 | B236 | FF00 | B036 |
| 0000045220 | FF00 | B636 | FF00 | B436 | 9A00 | 4975 | 0000 | C483 |
| 0000045240 | 8B28 | C846 | 568B | E9CA | 0209 | 0FE9 | 1E00 | CE68 |
| 0000045260 | 9A04 | 69A0 | 438A | C483 | E904 | 01F7 | 76FF | FFEC |
| 0000045300 | EA76 | 869A | D662 | 8347 | 04C4 | C28E | D88B | 1F8D |
| 0000045320 | 359A | C899 | 9A47 | 9BF7 | 47E4 | 4689 | FFC0 | E876 |
| 0000045340 | 76FF | 9AE6 | 6286 | 4800 | C483 | 8E04 | 8BC2 | 8DD8 |
| 0000045360 | 9A1F | 9935 | 47E9 | F79A | 0E9B | 8948 | BC46 | 7E83 |
| 0000045400 | 03BE | 037D | 21E9 | FF00 | E476 | 76FF | 9AE2 | 6286 |
| 0000045420 | 4830 | C483 | 8E04 | 8BC2 | 8DD8 | 9A1F | 9935 | 4813 |
| 0000045440 | F79A | 3E9B | E948 | 0003 | 00B8 | 8900 | FC46 | 7E83 |
| 0000045460 | 04BE | 037D | 21E9 | FF00 | E076 | 76FF | 9ADE | 6286 |
| 0000045500 | 492F | C483 | 8E04 | 8BC2 | 8DD8 | 9A1F | 9935 | 4843 |
| 0000045520 | F79A | 519B | E944 | 0006 | 00B8 | BA00 | 0000 | 4689 |
| 0000045540 | 89F4 | F656 | 068E | 7A06 | 8326 | FC3E | 0048 | 0375 |
| 0000045560 | 54E9 | 8300 | C67E | 75FE | E903 | 004B | 76FF | FFF6 |
| 0000045600 | F476 | 76FF | FFFC | BC76 | 76FF | 1EC0 | FE68 | 8D04 |
| 0000045620 | D046 | 5016 | 468D | 16EE | 8D50 | C246 | 5016 | 681E |
| 0000045640 | 052A | 0168 | FF05 | B236 | FF00 | B036 | FF00 | B636 |
| 0000045660 | FF00 | B436 | 1E00 | 2168 | 6805 | 4538 | 3B68 | 9A45 |
| 0000045700 | 453E | 0000 | C483 | 8E30 | 1806 | 267A | 3E83 | 3856 |
| 0000045720 | 7400 | E903 | 0014 | 76FF | FFC0 | BC76 | 76FF | FFFC |
| 0000045740 | F676 | 76FF | 9AF4 | FFFF | 0000 | 699A | 0045 | 8900 |
| 0000045760 | F246 | 003D | 7500 | E903 | 000B | 76FF | 9AF2 | AFE0 |
| 0000046000 | 457E | C483 | 8E02 | 0606 | 267A | 3E83 | 458A | 7500 |
| 0000046020 | E903 | 0009 | 7E83 | FEC6 | 0374 | 0FE9 | 8E00 | 0806 |
| 0000046040 | 267A | 3E83 | 45A2 | 7500 | E903 | 006C | 36FF | 79DA |
| 0000046060 | 36FF | 79D8 | 36FF | 79D6 | 36FF | 79D4 | B29A | 9B6D |
| 0000046100 | 8349 | 08C4 | 4689 | 89C8 | CA56 | 76FF | FFCE | CC76 |
| 0000046120 | 468D | 16C8 | FF50 | DC76 | 76FF | FFFA | F876 | 4E8D |
| 0000046140 | 16D0 | 8D51 | EE4E | 5116 | 4E8D | 16C2 | 1E51 | 2A68 |
| 0000046160 | 6805 | 0506 | 36FF | 00B2 | 36FF | 00B0 | 36FF | 00B6 |
| 0000046200 | 36FF | 00B4 | 039A | 0046 | 8300 | 28C4 | 468B | 8BC8 |
| 0000046220 | CA56 | 1EE9 | E900 | 001B | 36FF | 79DA | 36FF | 79D8 |
| 0000046240 | 36FF | 79D6 | 36FF | 79D4 | B29A | BD6D | 8345 | 08C4 |
| 0000046260 | 00E9 | 5E00 | 835F | 02ED | E58B | 5D1F | CB4D | 581E |
| 0000046300 | 4590 | 8B55 | 1EEC | D88E | EC81 | 0044 | 5657 | 46C7 |
| 0000046320 | 3AF8 | 8C05 | FA5E | 46C7 | 07DC | 2B01 | 89C0 | CE46 |
| 0000046340 | 4689 | 8ECC | 0606 | 267A | 3E83 | 4A8F | 7500 | E903 |
| 0000046360 | 001D | 36FF | 00B6 | 36FF | 00B4 | 468D | 16C2 | 9A50 |
| 0000046400 | 467E | 0000 | C483 | 3D08 | 0000 | 0374 | 0FE9 | 8E00 |
| 0000046420 | 0806 | 267A | 3E83 | 4AA7 | 7500 | E903 | 003B | 681E |
| 0000046440 | 0541 | 468D | 16D0 | 8D50 | C246 | 5016 | 468D | 16EE |
| 0000046460 | 6850 | 0512 | 681E | 05D4 | 36FF | 00B2 | 36FF | 00B0 |
| 0000046500 | 36FF | 00B6 | 36FF | 00B4 | C79A | 0046 | 8300 | 1EC4 |
| 0000046520 | 4689 | 89EE | F056 | 08E9 | 2B00 | 89C0 | F046 | 4689 |
| 0000046540 | 8DEE | DE46 | 5016 | 468D | 16E2 | 8D50 | E646 | 5016 |

THU MAR 14 17:52:34 1991 TSLINT.DLL PAGE 22, LINE 1240

| | | | | | | | | |
|---|---|---|---|---|---|---|---|---|
| 0000046560 | 468D | 16EA | FF50 | 0876 | 76FF | 9A06 | 2A07 | 4AB6 |
| 0000046600 | C483 | 8914 | BE46 | 7E83 | 02BE | 037D | 09E9 | 8300 |
| 0000046620 | BE7E | 7F04 | E903 | 0096 | 068E | 7A06 | 8326 | CD3E |
| 0000046640 | 004B | 0375 | 09E9 | 8300 | C67E | 74FE | E903 | 000F |
| 0000046660 | 068E | 7A08 | 8326 | 863E | 004C | 0375 | 60E9 | 1E00 |
| 0000046700 | 4868 | 9A05 | 69A0 | 4B16 | C483 | 8904 | C846 | 5689 |
| 0000046720 | FFCA | CE76 | 76FF | 8DCC | C846 | 5016 | 76FF | FFDC |
| 0000046740 | FA76 | 76FF | 8DF8 | D04E | 5116 | 4E8D | 16EE | 8D51 |
| 0000046760 | C24E | 5116 | 681E | 05D4 | 1C68 | FF05 | B236 | FF00 |
| 0000047000 | B036 | FF00 | B636 | FF00 | B436 | 9A00 | 4CE7 | 0000 |
| 0000047020 | C483 | 8B28 | C846 | 568B | E9CA | 0209 | 0FE9 | 1E00 |
| 0000047040 | 7868 | 9A05 | 69A0 | 46FC | C483 | E904 | 01F7 | 76FF |
| 0000047060 | FFEC | EA76 | 869A | 4862 | 834B | 04C4 | C28E | D88B |
| 0000047100 | 1F8D | 359A | 3A99 | 9A4B | 9BF7 | 4B56 | 4689 | FFC0 |
| 0000047120 | E876 | 76FF | 9AE6 | 6286 | 4B72 | C483 | 8E04 | 8BC2 |
| 0000047140 | 8DD8 | 9A1F | 9935 | 4B5B | F79A | 809B | 894B | BC46 |
| 0000047160 | 7E83 | 03BE | 037D | 21E9 | FF00 | E476 | 76FF | 9AE2 |
| 0000047200 | 6286 | 4BA2 | C483 | 8E04 | 8BC2 | 8DD8 | 9A1F | 9935 |
| 0000047220 | 4B85 | F79A | B09B | E94B | 0003 | 00B8 | 8900 | FC46 |
| 0000047240 | 7E83 | 04BE | 037D | 21E9 | FF00 | E076 | 76FF | 9ADE |
| 0000047260 | 6286 | 4CA1 | C483 | 8E04 | 8BC2 | 8DD8 | 9A1F | 9935 |
| 0000047300 | 4BB5 | F79A | C39B | E947 | 0006 | 00B8 | BA00 | 000D |
| 0000047320 | 4689 | 89F4 | F656 | 068E | 7A06 | 8326 | 6E3E | 004C |
| 0000047340 | 0375 | 54E9 | 8300 | C67E | 75FE | E903 | 004B | 76FF |
| 0000047360 | FFF6 | F476 | 76FF | FFFC | BC76 | 76FF | 1EC0 | A868 |
| 0000047400 | 8D05 | D046 | 5016 | 468D | 16EE | 8D50 | C246 | 5016 |
| 0000047420 | 681E | 05D4 | 2268 | FF05 | B236 | FF00 | B036 | FF00 |
| 0000047440 | B636 | FF00 | B436 | 1E00 | CB68 | 6805 | 48AA | AD68 |
| 0000047460 | 9A48 | 48B0 | 0000 | C483 | 8E30 | 1806 | 267A | 3E83 |
| 0000047500 | 3856 | 7400 | E903 | 0014 | 76FF | FFC0 | BC76 | 76FF |
| 0000047520 | FFFC | F676 | 76FF | 9AF4 | FFFF | 0000 | DB9A | 0048 |
| 0000047540 | 8900 | F246 | 003D | 7500 | E903 | 000B | 76FF | 9AF2 |
| 0000047560 | AFE0 | 48F0 | C483 | 8E02 | 0606 | 267A | 3E83 | 4668 |
| 0000047600 | 7500 | E903 | 0009 | 7E83 | FEC6 | 0374 | 0FE9 | 8E00 |
| 0000047620 | 0806 | 267A | 3E83 | 4694 | 7500 | E903 | 006C | 36FF |
| 0000047640 | 79DA | 36FF | 79D8 | 36FF | 79D6 | 36FF | 79D4 | B29A |
| 0000047660 | 0D6D | 834D | 08C4 | 4689 | 89C8 | CA56 | 76FF | FFCE |
| 0000047700 | CC76 | 468D | 16C8 | FF50 | DC76 | 76FF | FFFA | F876 |
| 0000047720 | 4E8D | 16D0 | 8D51 | EE4E | 5116 | 4E8D | 16C2 | 1E51 |
| 0000047740 | D468 | 6805 | 0527 | 36FF | 00B2 | 36FF | 00B0 | 36FF |
| 0000047760 | 00B6 | 36FF | 00B4 | 8A9A | 0047 | 8300 | 28C4 | 468B |
| 0000050000 | 8BC8 | CA56 | 1EE9 | E900 | 001B | 36FF | 79DA | 36FF |
| 0000050020 | 79D8 | 36FF | 79D6 | 36FF | 79D4 | B29A | B56D | 8347 |
| 0000050040 | 08C4 | 00E9 | 5E00 | 835F | 02ED | E58B | 5D1F | CB4D |
| 0000050060 | 581E | 4590 | 8B55 | 1EEC | D88E | EC81 | 0004 | 5657 |
| 0000050100 | FF9A | 00FF | 8900 | FC46 | 5E8D | 9AFC | 99CD | 4D48 |
| 0000050120 | EC83 | 8B08 | 9ADC | 9B29 | 4B35 | B29A | 276D | 834B |
| 0000050140 | 08C4 | 00E9 | 5E00 | 835F | 02ED | E58B | 5D1F | CB4D |
| 0000050160 | 581E | 4590 | 8B55 | 1EEC | D88E | EC81 | 0004 | 5657 |
| 0000050200 | FF9A | 00FF | 8900 | FC46 | 5E8D | 9AFC | 99CD | 4D88 |
| 0000050220 | EC83 | 8B08 | 9ADC | 9B29 | 4D3E | B29A | 4D6D | 834D |
| 0000050240 | 08C4 | 00E9 | 5E00 | 835F | 02ED | E58B | 5D1F | CB4D |
| 0000050260 | 581E | 4590 | 8B55 | 1EEC | D88E | EC81 | 0000 | 5657 |
| 0000050300 | B81E | FFFF | D88E | 468B | A306 | 00BA | 5E1F | 835F |
| 0000050320 | 02ED | E58B | 5D1F | CA4D | 0002 | 581E | 4590 | 8B55 |
| 0000050340 | 1EEC | D88E | EC81 | 0022 | 5657 | 4D9A | 004C | 8900 |
| 0000050360 | FC46 | 468B | E9FC | 004A | 59E9 | 8300 | BA3E | 0000 |
| 0000050400 | 0375 | 2CE9 | FF00 | 0876 | 76FF | 1E06 | E468 | 8D05 |
| 0000050420 | DE46 | 5016 | B29A | 7E59 | 834D | 0CC4 | 468D | 16DE |

THU MAR 14 17:52:34 1991 TSLINT.DLL PAGE 23, LINE 1299

| | | | | | | | | |
|---|---|---|---|---|---|---|---|---|
| 0000050440 | 9A50 | FFFF | 0000 | BE9A | 2A9B | E94E | 0026 | 03E9 |
| 0000050460 | E900 | 0020 | 76FF | 9AFC | AFE0 | 4C62 | C483 | E902 |
| 0000050500 | 0012 | C00B | 0375 | AFE9 | 2DFF | 00D4 | 0375 | AAE9 |
| 0000050520 | E9FF | FFE0 | 5F5E | ED83 | 8B02 | 1FE5 | 4D5D | 1ECB |
| 0000050540 | 9058 | 5545 | EC8B | 8E1E | 81D8 | 3CEC | 5700 | C756 |
| 0000050560 | F846 | 05FA | 5E8C | C7FA | E246 | 0107 | C02B | 4689 |
| 0000050600 | 89D4 | D246 | 068E | 7A06 | 8326 | 2B3E | 004F | 0375 |
| 0000050620 | 1DE9 | FF00 | B636 | FF00 | B436 | 8D00 | C846 | 5016 |
| 0000050640 | F09A | 0049 | 8300 | 08C4 | 003D | 7400 | E903 | 000F |
| 0000050660 | 068E | 7A08 | 8326 | 433E | 004F | 0375 | 3BE9 | 1E00 |
| 0000050700 | 0168 | 8D06 | D646 | 5016 | 468D | 16C8 | 8D50 | F046 |
| 0000050720 | 5016 | 8268 | 1E05 | 8A68 | FF06 | B236 | FF00 | B036 |
| 0000050740 | FF00 | B636 | FF00 | B436 | 9A00 | 4A39 | 0000 | C483 |
| 0000050760 | 891E | F046 | 5689 | E9F2 | 0008 | C02B | 4689 | 89F2 |
| 0000051000 | F046 | 468D | 16E4 | 8D50 | E846 | 5016 | 468D | 16EC |
| 0000051020 | FF50 | 0876 | 76FF | 9A06 | 27AF | 4F52 | C483 | 8910 |
| 0000051040 | C646 | 7E83 | 01C6 | 037D | 09E9 | 8300 | C67E | 7F03 |
| 0000051060 | E903 | 0096 | 068E | 7A06 | 8326 | 413E | 0050 | 0375 |
| 0000051100 | 09E9 | 8300 | CC7E | 74FE | E903 | 000F | 068E | 7A08 |
| 0000051120 | 8326 | ED3E | 0050 | 0375 | 60E9 | 1E00 | 0868 | 9A06 |
| 0000051140 | 69A0 | 4FB2 | C483 | 8904 | CE46 | 5689 | FFD0 | D476 |
| 0000051160 | 76FF | 8DD2 | CE46 | 5016 | 76FF | FFE2 | FA76 | 76FF |
| 0000051200 | 8DF8 | D64E | 5116 | 4E8D | 16F0 | 8D51 | C84E | 5116 |
| 0000051220 | 681E | 068A | 8B68 | FF05 | B236 | FF00 | B036 | FF00 |
| 0000051240 | B636 | FF00 | B436 | 9A00 | 514E | 0000 | C483 | 8B28 |
| 0000051260 | CE46 | 568B | E9D0 | 01D4 | 0FE9 | 1E00 | 3668 | 9A06 |
| 0000051300 | 69A0 | 5DC9 | C483 | E904 | 01C2 | 76FF | FFEE | EC76 |
| 0000051320 | 149A | EC65 | 834F | 04C4 | C28E | D88B | 8B26 | 0847 |
| 0000051340 | 8B26 | 0A57 | 4689 | 89F4 | F656 | 7E83 | 02C6 | 037D |
| 0000051360 | 21E9 | FF00 | EA76 | 76FF | 9AE8 | 6286 | 501C | C483 |
| 0000051400 | 8E04 | 8BC2 | 8DD8 | 9A1F | 9935 | 4FFF | F79A | 2A9B |
| 0000051420 | E950 | 0003 | 00B8 | 8900 | C446 | 7E83 | 03C6 | 037D |
| 0000051440 | 21E9 | FF00 | E676 | 76FF | 9AE4 | 6286 | 5108 | C483 |
| 0000051460 | 8E04 | 8BC2 | 8DD8 | 9A1F | 9935 | 502F | F79A | 079B |
| 0000051500 | E94E | 0003 | 00B8 | 8900 | FC46 | 068E | 7A06 | 8326 |
| 0000051520 | D53E | 0050 | 0375 | 51E9 | 8300 | CC7E | 75FE | E903 |
| 0000051540 | 0048 | 76FF | FFFC | C476 | 76FF | FFF6 | F476 | 681E |
| 0000051560 | 0664 | 468D | 16D6 | 8D50 | F046 | 5016 | 468D | 16C8 |
| 0000051600 | 1E50 | 8A68 | 6806 | 058F | 36FF | 00B2 | 36FF | 00B0 |
| 0000051620 | 36FF | 00B6 | 36FF | 00B4 | 681E | 0681 | 1C68 | 684C |
| 0000051640 | 4C1F | 229A | 004C | 8300 | 2EC4 | 068E | 7A18 | 8326 |
| 0000051660 | 563E | 0038 | 0374 | 17E9 | FF00 | F676 | 76FF | 8BF4 |
| 0000051700 | C446 | 5299 | 8B50 | FC46 | 5299 | 9A50 | FFFF | 0000 |
| 0000051720 | 76FF | FFF6 | F476 | CA9A | 6E4D | 834A | 04C4 | 068E |
| 0000051740 | 7A06 | 8326 | DA3E | 0049 | 0375 | 09E9 | 8300 | CC7E |
| 0000051760 | 74FE | E903 | 000F | 068E | 7A08 | 8326 | 063E | 004A |
| 0000052000 | 0375 | 6CE9 | FF00 | DA36 | FF79 | D836 | FF79 | D636 |
| 0000052020 | FF79 | D436 | 9A79 | 6DB2 | 5174 | C483 | 8908 | CE46 |
| 0000052040 | 5689 | FFD0 | D476 | 76FF | 8DD2 | CE46 | 5016 | 76FF |
| 0000052060 | FFE2 | FA76 | 76FF | 8DF8 | D64E | 5116 | 4E8D | 16F0 |
| 0000052100 | 8D51 | C84E | 5116 | 681E | 068A | 9568 | FF05 | B236 |
| 0000052120 | FF00 | B036 | FF00 | B636 | FF00 | B436 | 9A00 | 4AFC |
| 0000052140 | 0000 | C483 | 8B28 | CE46 | 568B | E9D0 | 001E | 1BE9 |
| 0000052160 | FF00 | DA36 | FF79 | D836 | FF79 | D636 | FF79 | D436 |
| 0000052200 | 9A79 | 6DB2 | 4D8D | C483 | E908 | 0000 | 5F5E | ED83 |
| 0000052220 | 8B02 | 1FE5 | 4D5D | 1ECB | 9058 | 5545 | EC8B | 8E1E |
| 0000052240 | 81D8 | 3CEC | 5700 | C756 | F846 | 069A | 5E8C | C7FA |
| 0000052260 | E246 | 0107 | C02B | 4689 | 89D4 | D246 | 068E | 7A06 |
| 0000052300 | 8326 | 633E | 0052 | 0375 | 1DE9 | FF00 | B636 | FF00 |

THU MAR 14 17:52:34 1991 TSLINT.DLL PAGE 24, LINE 1358

| | | | | | | | | |
|---|---|---|---|---|---|---|---|---|
| 0000052320 | B436 | 8D00 | C846 | 5016 | 919A | 004E | 8300 | 08C4 |
| 0000052340 | 003D | 7400 | E903 | 000F | 068E | 7A08 | 8326 | 7B3E |
| 0000052360 | 0052 | 0375 | 3BE9 | 1E00 | A168 | 8D06 | D646 | 5016 |
| 0000052400 | 468D | 16C8 | 8D50 | F046 | 5016 | 9F68 | 1E05 | 2068 |
| 0000052420 | FF07 | B236 | FF00 | B036 | FF00 | B636 | FF00 | B436 |
| 0000052440 | 9A00 | 4EDA | 0000 | C483 | 891E | F046 | 5689 | E9F2 |
| 0000052460 | 0008 | C02B | 4689 | 89F2 | F046 | 468D | 16E4 | 8D50 |
| 0000052500 | E846 | 5016 | 468D | 16EC | FF50 | 0876 | 76FF | 9A06 |
| 0000052520 | 27AF | 528A | C483 | 8910 | C646 | 7E83 | 01C6 | 037D |
| 0000052540 | 09E9 | 8300 | C67E | 7F03 | E903 | 0096 | 068E | 7A06 |
| 0000052560 | 8326 | 793E | 0053 | 0375 | 09E9 | 8300 | CC7E | 74FE |
| 0000052600 | E903 | 000F | 068E | 7A08 | 8326 | 253E | 0054 | 0375 |
| 0000052620 | 60E9 | 1E00 | A868 | 9A06 | 69A0 | 52EA | C483 | 8904 |
| 0000052640 | CE46 | 5689 | FFD0 | D476 | 76FF | 8DD2 | CE46 | 5016 |
| 0000052660 | 76FF | FFE2 | FA76 | 76FF | 8DF8 | D64E | 5116 | 4E8D |
| 0000052700 | 16F0 | 8D51 | C84E | 5116 | 681E | 0720 | A868 | FF05 |
| 0000052720 | B236 | FF00 | B036 | FF00 | B636 | FF00 | B436 | 9A00 |
| 0000052740 | 5486 | 0000 | C483 | 8B28 | CE46 | 568B | E9D0 | 01D4 |
| 0000052760 | 0FE9 | 1E00 | D368 | 9A06 | 69A0 | 5401 | C483 | E904 |
| 0000053000 | 01C2 | 76FF | FFEE | EC76 | 149A | 2465 | 8353 | 04C4 |
| 0000053020 | C28E | D88B | 8B26 | 0847 | 8B26 | 0A57 | 4689 | 89F4 |
| 0000053040 | F656 | 7E83 | 02C6 | 037D | 21E9 | FF00 | EA76 | 76FF |
| 0000053060 | 9AE8 | 6286 | 5354 | C483 | 8E04 | 8BC2 | 8DD8 | 9A1F |
| 0000053100 | 9935 | 5337 | F79A | 629B | E953 | 0003 | 00B8 | 8900 |
| 0000053120 | C446 | 7E83 | 03C6 | 037D | 21E9 | FF00 | E676 | 76FF |
| 0000053140 | 9AE4 | 6286 | 5440 | C483 | 8E04 | 8BC2 | 8DD8 | 9A1F |
| 0000053160 | 9935 | 5367 | F79A | FA9B | E94F | 0003 | 00B8 | 8900 |
| 0000053200 | FC46 | 068E | 7A06 | 8326 | 0D3E | 0054 | 0375 | 51E9 |
| 0000053220 | 8300 | CC7E | 75FE | E903 | 0048 | 76FF | FFFC | C476 |
| 0000053240 | 76FF | FFF6 | F476 | 681E | 06FE | 468D | 16D6 | 8D50 |
| 0000053260 | F046 | 5016 | 468D | 16C8 | 1E50 | 2068 | 6807 | 05AC |
| 0000053300 | 36FF | 00B2 | 36FF | 00B0 | 36FF | 00B6 | 36FF | 00B4 |
| 0000053320 | 681E | 0718 | 8D68 | 6850 | 5090 | 939A | 0050 | 8300 |
| 0000053340 | 2EC4 | 068E | 7A18 | 8326 | 563E | 0038 | 0374 | 17E9 |
| 0000053360 | FF00 | F676 | 76FF | 8BF4 | C446 | 5299 | 8B50 | FC46 |
| 0000053400 | 5299 | 9A50 | FFFF | 0000 | 76FF | FFF6 | F476 | CA9A |
| 0000053420 | 0A4D | 834F | 04C4 | 068E | 7A06 | 8326 | 7B3E | 004E |
| 0000053440 | 0375 | 09E9 | 8300 | CC7E | 74FE | E903 | 000F | 068E |
| 0000053460 | 7A08 | 8326 | A73E | 004E | 0375 | 6CE9 | FF00 | DA36 |
| 0000053500 | FF79 | D836 | FF79 | D636 | FF79 | D436 | 9A79 | 6DB2 |
| 0000053520 | 54AC | C483 | 8908 | CE46 | 5689 | FFD0 | D476 | 76FF |
| 0000053540 | 8DD2 | CE46 | 5016 | 76FF | FFE2 | FA76 | 76FF | 8DF8 |
| 0000053560 | D64E | 5116 | 4E8D | 16F0 | 8D51 | C84E | 5116 | 681E |
| 0000053600 | 0720 | B268 | FF05 | B236 | FF00 | B036 | FF00 | B636 |
| 0000053620 | FF00 | B436 | 9A00 | 4F98 | 0000 | C483 | 8B28 | CE46 |
| 0000053640 | 568B | E9D0 | 001E | 1BE9 | FF00 | DA36 | FF79 | D836 |
| 0000053660 | FF79 | D636 | FF79 | D436 | 9A79 | 6DB2 | 4FC3 | C483 |
| 0000053700 | E908 | 0000 | 5F5E | ED83 | 8B02 | 1FE5 | 4D5D | 1ECB |
| 0000053720 | 9058 | 5545 | EC8B | 8E1E | 81D8 | 32EC | 5700 | C756 |
| 0000053740 | FA46 | 072D | 5E8C | C7FC | EA46 | 0107 | C02B | 4689 |
| 0000053760 | 89DC | DA46 | 068E | 7A06 | 8326 | 883E | 0055 | 0375 |
| 0000054000 | 1DE9 | FF00 | B636 | FF00 | B436 | 8D00 | D046 | 5016 |
| 0000054020 | C99A | 0051 | 8300 | 08C4 | 003D | 7400 | E903 | 000F |
| 0000054040 | 068E | 7A08 | 8326 | A03E | 0055 | 0375 | 3BE9 | 1E00 |
| 0000054060 | 3468 | 8D07 | DE46 | 5016 | 468D | 16D0 | 8D50 | F046 |
| 0000054100 | 5016 | BD68 | 1E05 | B068 | FF07 | B236 | FF00 | B036 |
| 0000054120 | FF00 | B636 | FF00 | B436 | 9A00 | 5212 | 0000 | C483 |
| 0000054140 | 891E | F046 | 5689 | E9F2 | 0008 | C02B | 4689 | 89F2 |
| 0000054160 | F046 | 468D | 16EC | FF50 | 0876 | 76FF | 9A06 | 2509 |

THU MAR 14 17:52:34 1991 TSLINT.DLL PAGE 25, LINE 1417

| | | | | | | | | |
|---|---|---|---|---|---|---|---|---|
| 0000054200 | 55AF | C483 | 8908 | CE46 | 7E83 | 01CE | 0375 | 96E9 |
| 0000054220 | 8E00 | 0606 | 267A | 3E83 | 563E | 7500 | E903 | 0009 |
| 0000054240 | 7E83 | FED4 | 0374 | 0FE9 | 8E00 | 0806 | 267A | 3E83 |
| 0000054260 | 51DF | 7500 | E903 | 0060 | 681E | 073B | A09A | 0F69 |
| 0000054300 | 8356 | 04C4 | 4689 | 89D6 | D856 | 76FF | FFDC | DA76 |
| 0000054320 | 468D | 16D6 | FF50 | EA76 | 76FF | FFFC | FA76 | 4E8D |
| 0000054340 | 16DE | 8D51 | F04E | 5116 | 4E8D | 16D0 | 1E51 | B068 |
| 0000054360 | 6807 | 05C7 | 36FF | 00B2 | 36FF | 00B0 | 36FF | 00B6 |
| 0000054400 | 36FF | 00B4 | D09A | 0052 | 8300 | 28C4 | 468B | 8BD6 |
| 0000054420 | D856 | 6FE9 | E901 | 000F | 681E | 0768 | A09A | 4269 |
| 0000054440 | 8352 | 04C4 | 5DE9 | FF01 | EE76 | 76FF | 9AEC | 6514 |
| 0000054460 | 52FB | C483 | 8E04 | 8BC2 | 26D8 | 478B | 2608 | 578B |
| 0000054500 | 890A | F646 | 5689 | 8EF8 | 0606 | 267A | 3E83 | 51B3 |
| 0000054520 | 7500 | E903 | 004B | 7E83 | FED4 | 0375 | 42E9 | FF00 |
| 0000054540 | F876 | 76FF | 1EF6 | 9568 | 8D07 | DE46 | 5016 | 468D |
| 0000054560 | 16F0 | 8D50 | D046 | 5016 | 681E | 07B0 | C968 | FF05 |
| 0000054600 | B236 | FF00 | B036 | FF00 | B636 | FF00 | B436 | 1E00 |
| 0000054620 | A868 | 6807 | 53C5 | C868 | 9A53 | 53CB | 0000 | C483 |
| 0000054640 | 8E2A | 1806 | 267A | 3E83 | 3856 | 7400 | E903 | 000B |
| 0000054660 | 76FF | FFF8 | F676 | FF9A | 00FF | 9A00 | 4DDB | 0000 |
| 0000054700 | 4689 | 3DF4 | 0000 | 0375 | 0BE9 | FF00 | F476 | E09A |
| 0000054720 | 19AF | 834E | 02C4 | 068E | 7A06 | 8326 | EB3E | 0054 |
| 0000054740 | 0375 | 09E9 | 8300 | D47E | 74FE | E903 | 000F | 068E |
| 0000054760 | 7A08 | 8326 | 173E | 0055 | 0375 | 6CE9 | FF00 | DA36 |
| 0000055000 | FF79 | D836 | FF79 | D636 | FF79 | D436 | 9A79 | 6DB2 |
| 0000055020 | 576C | C483 | 8908 | D646 | 5689 | FFD8 | DC76 | 76FF |
| 0000055040 | 8DDA | D646 | 5016 | 76FF | FFEA | FC76 | 76FF | 8DFA |
| 0000055060 | DE4E | 5116 | 4E8D | 16F0 | 8D51 | D04E | 5116 | 681F |
| 0000055100 | 07B0 | CE68 | FF05 | B236 | FF00 | B036 | FF00 | B636 |
| 0000055120 | FF00 | B436 | 9A00 | 55F5 | 0000 | C483 | 8B28 | D646 |
| 0000055140 | 568B | E9D8 | 001E | 1BE9 | FF00 | DA36 | FF79 | D836 |
| 0000055160 | FF79 | D636 | FF79 | D436 | 9A79 | 6DB2 | 5620 | C483 |
| 0000055200 | E908 | 0000 | 5F5E | ED83 | 8B02 | 1FE5 | 4D5D | 1ECB |
| 0000055220 | 9058 | 5545 | EC8B | 8E1E | 81D8 | 32EC | 5700 | C756 |
| 0000055240 | FA46 | 07BE | 5E8C | C7FC | EA46 | 0107 | C02B | 4689 |
| 0000055260 | 89DC | DA46 | 068E | 7A06 | 8326 | 483E | 0058 | 0375 |
| 0000055300 | 1DE9 | FF00 | B636 | FF00 | B436 | 8D00 | D046 | 5016 |
| 0000055320 | 019A | 0055 | 8300 | 08C4 | 003D | 7400 | E903 | 000F |
| 0000055340 | 068E | 7A08 | 8326 | 603E | 0058 | 0375 | 3BE9 | 1E00 |
| 0000055360 | C568 | 8D07 | DE46 | 5016 | 468D | 16D0 | 8D50 | F046 |
| 0000055400 | 5016 | D968 | 1E05 | 4868 | FF08 | B236 | FF00 | B036 |
| 0000055420 | FF00 | B636 | FF00 | B436 | 9A00 | 554A | 0000 | C483 |
| 0000055440 | 891E | F046 | 5689 | E9F2 | 0008 | C02B | 4689 | 89F2 |
| 0000055460 | F046 | 468D | 16EC | FF50 | 0876 | 76FF | 9A06 | 2509 |
| 0000055500 | 586F | C483 | 8908 | CE46 | 7E83 | 01CE | 0375 | 96E9 |
| 0000055520 | 8E00 | 0606 | 267A | 3E83 | 58FE | 7500 | E903 | 0009 |
| 0000055540 | 7E83 | FED4 | 0374 | 0FE9 | 8E00 | 0806 | 267A | 3E83 |
| 0000055560 | 59A5 | 7500 | E903 | 0060 | 681E | 07CC | A09A | CF69 |
| 0000055600 | 8358 | 04C4 | 4689 | 89D6 | D856 | 76FF | FFDC | DA76 |
| 0000055620 | 468D | 16D6 | FF50 | EA76 | 76FF | FFFC | FA76 | 4E8D |
| 0000055640 | 16DE | 8D51 | F04E | 5116 | 4E8D | 16D0 | 1E51 | 4868 |
| 0000055660 | 6808 | 05E3 | 36FF | 00B2 | 36FF | 00B0 | 36FF | 00B6 |
| 0000055700 | 36FF | 00B4 | 069A | 005A | 8300 | 28C4 | 468B | 8BD6 |
| 0000055720 | D856 | 6FE9 | E901 | 000F | 681E | 07FB | A09A | 7069 |
| 0000055740 | 8355 | 04C4 | 5DE9 | FF01 | EE76 | 76FF | 9AEC | 6514 |
| 0000055760 | 59C0 | C483 | 8E04 | 8BC2 | 26D8 | 478B | 2608 | 578B |
| 0000056000 | 890A | F646 | 5689 | 8EF8 | 0606 | 267A | 3E83 | 598D |
| 0000056020 | 7500 | E903 | 004B | 7E83 | FED4 | 0375 | 42E9 | FF00 |
| 0000056040 | F876 | 76FF | 1EF6 | 2A68 | 8D08 | DE46 | 5016 | 468D |

THU MAR 14 17:52:34 1991 TSLINT.DLL PAGE 26, LINE 1476

| | | | | | | | | |
|---|---|---|---|---|---|---|---|---|
| 0000056060 | 16F0 | 8D50 | D046 | 5016 | 681E | 0848 | E568 | FF05 |
| 0000056100 | B236 | FF00 | B036 | FF00 | B636 | FF00 | B436 | 1ED0 |
| 0000056120 | 3F68 | 6808 | 5684 | 8768 | 9A56 | 568A | 0000 | C483 |
| 0000056140 | 8E2A | 1806 | 267A | 3E83 | 3856 | 7400 | E903 | 000B |
| 0000056160 | 76FF | FFF8 | F676 | FF9A | 00FF | 9A00 | 56AC | 0000 |
| 0000056200 | 4689 | 3DF4 | 0000 | 0375 | 0BE9 | FF00 | F476 | E09A |
| 0000056220 | C1AF | 8356 | 02C4 | 068E | 7A06 | 8326 | CD3E | 0056 |
| 0000056240 | 0375 | 09E9 | 8300 | D47E | 74FE | E903 | 000F | 068E |
| 0000056260 | 7A08 | 8326 | E53E | 0056 | 0375 | 6CE9 | FF00 | DA36 |
| 0000056300 | FF79 | D836 | FF79 | D636 | FF79 | D436 | 9A79 | 6DB2 |
| 0000056320 | 5A2C | C483 | 8908 | D646 | 5689 | FFD8 | DC76 | 76FF |
| 0000056340 | 8DDA | D646 | 5016 | 76FF | FFEA | FC76 | 76FF | 8DFA |
| 0000056360 | DE4E | 5116 | 4E8D | 16F0 | 8D51 | D04E | 5116 | 681E |
| 0000056400 | 0848 | EA68 | FF05 | B236 | FF00 | B036 | FF00 | B636 |
| 0000056420 | FF00 | B436 | 9A00 | 5746 | 0000 | C483 | 8B28 | D646 |
| 0000056440 | 568B | E9D8 | 001E | 1BE9 | FF00 | DA36 | FF79 | D836 |
| 0000056460 | FF79 | D636 | FF79 | D436 | 9A79 | 6DB2 | 5700 | C483 |
| 0000056500 | E908 | 0000 | 5F5E | ED83 | 8B02 | 1FE5 | 4D5D | 1ECB |
| 0000056520 | 9058 | 5545 | EC8B | 8E1E | 81D8 | 3AEC | 5700 | C756 |
| 0000056540 | FA46 | 0858 | 5E8C | C7FC | E246 | 0107 | C02B | 4689 |
| 0000056560 | 89D4 | D246 | 068E | 7A06 | 8326 | 0D3E | 005B | 0375 |
| 0000056600 | 1DE9 | FF00 | B636 | FF00 | B436 | 8D00 | C846 | 5016 |
| 0000056620 | C19A | 0057 | 8300 | 08C4 | 003D | 7400 | E903 | 000F |
| 0000056640 | 068E | 7A08 | 8326 | 253E | 005B | 0375 | 3BE9 | 1E00 |
| 0000056660 | 5F68 | 8D08 | D646 | 5016 | 468D | 16C8 | 8D50 | F046 |
| 0000056700 | 5016 | F468 | 1E05 | E868 | FF08 | B236 | FF00 | B036 |
| 0000056720 | FF00 | B636 | FF00 | B436 | 9A00 | 580A | 0000 | C483 |
| 0000056740 | 891E | F046 | 5689 | E9F2 | 0008 | C02B | 4689 | 89F2 |
| 0000056760 | F046 | 468D | 16E4 | 8D50 | E846 | 5016 | 76FF | FF08 |
| 0000057000 | 0676 | 059A | 3426 | 835B | 0CC4 | 4689 | 83C6 | C67E |
| 0000057020 | 7502 | E903 | 0096 | 068E | 7A06 | 8326 | E33E | 005B |
| 0000057040 | 0375 | 09E9 | 8300 | CC7E | 74FE | E903 | 000F | 068E |
| 0000057060 | 7A08 | 8326 | 963E | 005C | 0375 | 60E9 | 1E00 | 6668 |
| 0000057100 | 9A08 | 69A0 | 5B94 | C483 | 8904 | CE46 | 5689 | FFD0 |
| 0000057120 | D476 | 76FF | 8DD2 | CE46 | 5016 | 76FF | FFE2 | FC76 |
| 0000057140 | 76FF | 8DFA | D64E | 5116 | 4E8D | 16F0 | 8D51 | C84E |
| 0000057160 | 5116 | 681E | 08E8 | FE68 | FF05 | B236 | FF00 | B036 |
| 0000057200 | FF00 | B636 | FF00 | B436 | 9A00 | 5CF7 | 0000 | C483 |
| 0000057220 | 8B28 | CE46 | 568B | E9D0 | 019B | 0FE9 | 1E00 | 9668 |
| 0000057240 | 9A08 | 69A0 | 5830 | C483 | E904 | 0189 | 76FF | FFEA |
| 0000057260 | E876 | 149A | C565 | 835B | D4C4 | C28E | D88B | 8B26 |
| 0000057300 | 0847 | 8B26 | 0A57 | 4689 | 89F4 | F656 | 76FF | FFE6 |
| 0000057320 | E476 | 149A | B165 | 835C | 04C4 | C28E | D88B | 8B26 |
| 0000057340 | 0847 | 8B26 | 0A57 | 4689 | 89EC | EE56 | 068E | 7A06 |
| 0000057360 | 8326 | 7E3E | 005C | 0375 | 51E9 | 8300 | CC7E | 75FE |
| 0000057400 | E903 | 0048 | 76FF | FFEE | EC76 | 76FF | FFF6 | F476 |
| 0000057420 | 681E | 08C6 | 468D | 16D6 | 8D50 | F046 | 5016 | 468D |
| 0000057440 | 16C8 | 1E50 | E868 | 6808 | 0601 | 36FF | 00B2 | 36FF |
| 0000057460 | 00B0 | 36FF | 00B6 | 36FF | 00B4 | 681E | 08DF | 4468 |
| 0000057500 | 6859 | 5947 | 4A9A | 0059 | 8300 | 2EC4 | 068E | 7A18 |
| 0000057520 | 8326 | 563E | 0038 | 0374 | 11E9 | FF00 | F676 | 76FF |
| 0000057540 | FFF4 | EE76 | 76FF | 9AEC | FFFF | 0000 | 6C9A | 0059 |
| 0000057560 | 8900 | F846 | 003D | 7500 | E903 | 000B | 76FF | 9AF8 |
| 0000057600 | AFE0 | 5981 | C483 | 8E02 | 0606 | 267A | 3E83 | 57AB |
| 0000057620 | 7500 | E903 | 0009 | 7E83 | FECC | 0374 | 0FE9 | 8E0D |
| 0000057640 | 0806 | 267A | 3E83 | 57D7 | 7500 | E903 | 006C | 36FF |
| 0000057660 | 79DA | 36FF | 79D8 | 36FF | 79D6 | 36FF | 79D4 | B29A |
| 0000057700 | 1D6D | 835D | 08C4 | 4689 | 89CE | D056 | 76FF | FFD4 |
| 0000057720 | D276 | 468D | 16CE | FF50 | E276 | 76FF | FFFC | FA76 |

THU MAR 14 17:52:34 1991 TSLINT.DLL PAGE 27, LINE 1535

| | | | | | | | | |
|---|---|---|---|---|---|---|---|---|
| 0000057740 | 4E8D | 16D6 | 8D51 | F04E | 5116 | 4E8D | 16C8 | 1E51 |
| 0000057760 | E868 | 6808 | 0606 | 36FF | 00B2 | 36FF | 00B0 | 36FF |
| 0000060000 | 00B6 | 36FF | 00B4 | B59A | 0058 | 8300 | 28C4 | 468B |
| 0000060020 | 8BCE | D056 | 1EE9 | E900 | 001B | 36FF | 79DA | 36FF |
| 0000060040 | 79D8 | 36FF | 79D6 | 36FF | 79D4 | B29A | E06D | 8358 |
| 0000060060 | 08C4 | 00E9 | 5E00 | 835F | 02ED | E58B | 5D1F | CB4D |
| 0000060100 | 581E | 4590 | 8B55 | 1EEC | D88E | EC81 | 0032 | 5657 |
| 0000060120 | 46C7 | F9FA | 8C08 | FC5E | 46C7 | 07EA | 2B01 | 89C0 |
| 0000060140 | DC46 | 4689 | 8EDA | 0606 | 267A | 3E83 | 5DF9 | 7500 |
| 0000060160 | E903 | 001D | 36FF | 00B6 | 36FF | 00B4 | 468D | 16D0 |
| 0000060200 | 9A50 | 5A81 | 0000 | C483 | 3D08 | 0000 | 0374 | 0FE9 |
| 0000060220 | 8E00 | 0806 | 267A | 3E83 | 5E11 | 7500 | E903 | 003B |
| 0000060240 | 681E | 0900 | 468D | 16DE | 8D50 | D046 | 5016 | 468D |
| 0000060260 | 16F0 | 6850 | 0611 | 681E | 098C | 36FF | 00B2 | 36FF |
| 0000060300 | 00B0 | 36FF | 00B6 | 36FF | 00B4 | CA9A | 005A | 8300 |
| 0000060320 | 1EC4 | 4689 | 89F0 | F256 | 08E9 | 2B00 | 89C0 | F246 |
| 0000060340 | 4689 | 8DF0 | EC46 | 5016 | 76FF | FF08 | 0676 | 099A |
| 0000060360 | 2025 | 835E | 08C4 | 4689 | 83CE | CE7E | 7501 | E903 |
| 0000060400 | 0096 | 068E | 7A06 | 8326 | AF3E | 005E | 0375 | 09E9 |
| 0000060420 | 8300 | D47E | 74FE | E903 | 000F | 068E | 7A08 | 8326 |
| 0000060440 | 563E | 005F | 0375 | 60E9 | 1E00 | 0768 | 9A09 | 69A0 |
| 0000060460 | 5E80 | C483 | 8904 | D646 | 5689 | FFD8 | DC76 | 76FF |
| 0000060500 | 8DDA | D646 | 5016 | 76FF | FFEA | FC76 | 76FF | 8DFA |
| 0000060520 | DE4E | 5116 | 4E8D | 16F0 | 8D51 | D04E | 5116 | 681E |
| 0000060540 | 098C | 1B68 | FF06 | B236 | FF00 | B036 | FF00 | B636 |
| 0000060560 | FF00 | B436 | 9A00 | 5FB7 | 0000 | C483 | 8B28 | D646 |
| 0000060600 | 568B | E9D8 | 016F | 0FE9 | 1E00 | 3968 | 9A09 | 69A0 |
| 0000060620 | 5AF5 | C483 | E904 | 015D | 76FF | FFEE | EC76 | 149A |
| 0000060640 | 7165 | 835F | 04C4 | C28E | D88B | 8B26 | 0847 | 8B26 |
| 0000060660 | 0A57 | 4689 | 89F6 | F856 | 068E | 7A06 | 8326 | 3E3E |
| 0000060700 | 005F | 0375 | 4BE9 | 8300 | D47E | 75FE | E903 | 0042 |
| 0000060720 | 76FF | FFF8 | F676 | 681E | 096B | 468D | 16DE | 8D50 |
| 0000060740 | F046 | 5016 | 468D | 16D0 | 1E50 | 8C68 | 6809 | 061D |
| 0000060760 | 36FF | 00B2 | 36FF | 00B0 | 36FF | 00B6 | 36FF | 00B4 |
| 0000061000 | 681E | 0983 | 2F68 | 685C | 5C32 | 359A | 005C | 8300 |
| 0000061020 | 2AC4 | 068E | 7A18 | 8326 | 563E | 0038 | 0374 | 0BE9 |
| 0000061040 | FF00 | F876 | 76FF | 9AF6 | FFFF | 0000 | 5D9A | 005C |
| 0000061060 | 8900 | F446 | 003D | 7500 | E903 | 000B | 76FF | 9AF4 |
| 0000061100 | AFE0 | 5C72 | C483 | 8E02 | 0606 | 267A | 3E83 | 5A6B |
| 0000061120 | 7500 | E903 | 0009 | 7E83 | FED4 | 0374 | 0FE9 | 8E00 |
| 0000061140 | 0806 | 267A | 3E83 | 5A97 | 7500 | E903 | 006C | 36FF |
| 0000061160 | 79DA | 36FF | 79D8 | 36FF | 79D6 | 36FF | 79D4 | B29A |
| 0000061200 | DD6D | 835F | 08C4 | 4689 | 89D6 | D856 | 76FF | FFDC |
| 0000061220 | DA76 | 468D | 16D6 | FF50 | EA76 | 76FF | FFFC | FA76 |
| 0000061240 | 4E8D | 16DE | 8D51 | F04E | 5116 | 4E8D | 16D0 | 1E51 |
| 0000061260 | 8C68 | 6809 | 0622 | 36FF | 00B2 | 36FF | 00B0 | 36FF |
| 0000061300 | 00B6 | 36FF | 00B4 | 7A9A | 005B | 8300 | 28C4 | 468B |
| 0000061320 | 8BD6 | D856 | 1EE9 | E900 | 001B | 36FF | 79DA | 36FF |
| 0000061340 | 79D8 | 36FF | 79D6 | 36FF | 79D4 | B29A | A56D | 835B |
| 0000061360 | 08C4 | 00E9 | 5E00 | 835F | 02ED | E58B | 5D1F | CB4D |
| 0000061400 | 581E | 4590 | 8B55 | 1EEC | D88E | EC81 | 002E | 5657 |
| 0000061420 | 46C7 | 9FFA | 8C09 | FC5E | 46C7 | 07EE | 2B01 | 89C0 |
| 0000061440 | E046 | 4689 | 8EDE | 0606 | 267A | 3E83 | 60B3 | 7500 |
| 0000061460 | E903 | 001D | 36FF | 00B6 | 36FF | 00B4 | 468D | 16D4 |
| 0000061500 | 9A50 | 5D72 | 0000 | C483 | 3D08 | 0000 | 0374 | 0FE9 |
| 0000061520 | 8E00 | 0806 | 267A | 3E83 | 60CB | 7500 | E903 | 003B |
| 0000061540 | 681E | 09A6 | 468D | 16E2 | 8D50 | D446 | 5016 | 468D |
| 0000061560 | 16F4 | 6850 | 062D | 681E | 0A0E | 36FF | 00B2 | 36FF |
| 0000061600 | 00B0 | 36FF | 00B6 | 36FF | 00B4 | BB9A | 005D | 8300 |

THU MAR 14 17:52:34 1991 TSLINT.DLL PAGE 28, LINE 1594

| | | | | | | | | |
|---|---|---|---|---|---|---|---|---|
| 0000061620 | 1EC4 | 4689 | 89F4 | F656 | 08E9 | 2B00 | 89C0 | F646 |
| 0000061640 | 4689 | 8DF4 | F046 | 5016 | 76FF | FF08 | 0676 | 099A |
| 0000061660 | DA25 | 8360 | 08C4 | 7548 | E903 | 0096 | 068E | 7A06 |
| 0000061700 | 8326 | 5C3E | 005D | 0375 | 09E9 | 8300 | D87E | 74FE |
| 0000061720 | E903 | 000F | 068E | 7A08 | 8326 | 883E | 005D | 0375 |
| 0000061740 | 60E9 | 1E00 | AD68 | 9A09 | 69A0 | 613A | C483 | 8904 |
| 0000061760 | DA46 | 5689 | FFDC | E076 | 76FF | 8DDE | DA46 | 5016 |
| 0000062000 | 76FF | FFEE | FC76 | 76FF | 8DFA | E24E | 5116 | 4E8D |
| 0000062020 | 16F4 | 8D51 | D44E | 5116 | 681E | 0A0E | 3468 | FF06 |
| 0000062040 | B236 | FF00 | B036 | FF00 | B636 | FF00 | B436 | 9A00 |
| 0000062060 | 5E66 | 0000 | C483 | 8B28 | DA46 | 568B | E9DC | 015E |
| 0000062100 | 0FE9 | 1E00 | D468 | 9A09 | 69A0 | 5DE1 | C483 | E904 |
| 0000062120 | 014C | 76FF | FFF2 | F076 | 869A | 9162 | 835E | 04C4 |
| 0000062140 | C28E | D88B | 1F8D | 359A | 5E99 | 9A61 | 9BF7 | 5332 |
| 0000062160 | 4689 | 8ED2 | 0606 | 267A | 3E83 | 61E7 | 7500 | E903 |
| 0000062200 | 0048 | 7E83 | FED8 | 0375 | 3FE9 | FF00 | D276 | 681E |
| 0000062220 | 09FB | 468D | 16E2 | 8D50 | F446 | 5016 | 468D | 16D4 |
| 0000062240 | 1E5D | 0E68 | 680A | 0636 | 36FF | 00B2 | 36FF | 00B0 |
| 0000062260 | 36FF | 00B6 | 36FF | 00B4 | 681E | 0A05 | F568 | 685E |
| 0000062300 | 5EF8 | FB9A | 005E | 8300 | 28C4 | 468B | 99D2 | 5052 |
| 0000062320 | FF9A | 00FF | 9A00 | 5F1D | 0000 | 4689 | 3DF8 | 0000 |
| 0000062340 | 0375 | 0BE9 | FF00 | F876 | E09A | 32AF | 835F | 02C4 |
| 0000062360 | 068E | 7A06 | 8326 | 1C3E | 0060 | 0375 | 09E9 | 8300 |
| 0000062400 | D87E | 74FE | E903 | 000F | 068E | 7A08 | 8326 | 483E |
| 0000062420 | 0060 | 0375 | 6CE9 | FF00 | DA36 | FF79 | D836 | FF79 |
| 0000062440 | D636 | FF79 | D436 | 9A79 | 6DB2 | 6286 | C483 | 8908 |
| 0000062460 | DA46 | 5689 | FFDC | E076 | 76FF | 8DDE | DA46 | 5016 |
| 0000062500 | 76FF | FFEE | FC76 | 76FF | 8DFA | E24E | 5116 | 4E8D |
| 0000062520 | 16F4 | 8D51 | D44E | 5116 | 681E | 0A0E | 3A68 | FF06 |
| 0000062540 | B236 | FF00 | B036 | FF00 | B636 | FF00 | B436 | 9A00 |
| 0000062560 | 6120 | 0000 | C483 | 8B28 | DA46 | 568B | E9DC | 001E |
| 0000062600 | 1BE9 | FF00 | DA36 | FF79 | D836 | FF79 | D636 | FF79 |
| 0000062620 | D436 | 9A79 | 6DB2 | 614B | C483 | E908 | 0000 | 5F5E |
| 0000062640 | ED83 | 8B02 | 1FE5 | 4D5D | 1ECB | 9058 | 5545 | EC8B |
| 0000062660 | 8E1E | 81D8 | 2EEC | 5700 | C756 | FA46 | 0A17 | 5E8C |
| 0000062700 | C7FC | EC46 | 0107 | C02B | 4689 | 89DE | DC46 | 068E |
| 0000062720 | 7A06 | 8326 | 893E | 0063 | 0375 | 1DE9 | FF00 | B636 |
| 0000062740 | FF00 | B436 | 8D00 | D246 | 5016 | 329A | 0060 | 8300 |
| 0000062760 | 08C4 | 003D | 7400 | E903 | 000F | 068E | 7A08 | 8326 |
| 0000063000 | 0B3E | 0064 | 0375 | 3BE9 | 1E00 | 1E68 | 8D0A | E046 |
| 0000063020 | 5016 | 468D | 16D2 | 8D50 | F646 | 5016 | 4368 | 1E06 |
| 0000063040 | 3E68 | FF0A | B236 | FF00 | B036 | FF00 | B636 | FF00 |
| 0000063060 | B436 | 9A00 | 607B | 0000 | C483 | 891E | F646 | 5689 |
| 0000063100 | E9F8 | 0008 | C02B | 4689 | 89F8 | F646 | 468D | 16F2 |
| 0000063120 | FF50 | 0876 | 76FF | 9A06 | 2509 | 60A1 | C483 | 3D08 |
| 0000063140 | 0000 | 0374 | 0BE9 | C700 | EE46 | 0A25 | 5E8C | E9F0 |
| 0000063160 | 0020 | 76FF | FFF4 | F276 | 149A | 2665 | 8364 | 04C4 |
| 0000063200 | C28E | D88B | 8B26 | 0847 | 8B26 | 0A57 | 4689 | 89EE |
| 0000063220 | F056 | 068E | 7A06 | 8326 | F33E | 0063 | 0375 | 4BE9 |
| 0000063240 | 8300 | D67E | 75FE | E903 | 0042 | 76FF | FFF0 | EE76 |
| 0000063260 | 681E | 0A2B | 468D | 16E0 | 8D50 | F646 | 5016 | 468D |
| 0000063300 | 16D2 | 1E50 | 3E68 | 680A | 064A | 36FF | 00B2 | 36FF |
| 0000063320 | 00B0 | 36FF | 00B6 | 36FF | 00B4 | 681E | 0A36 | AD68 |
| 0000063340 | 6861 | 61B0 | B39A | 0061 | 8300 | 2AC4 | 76FF | FFF0 |
| 0000063360 | EE76 | 129A | 004E | 9A00 | FFFF | 0000 | 068E | 7A06 |
| 0000063400 | 8326 | 6A3E | 0061 | 0375 | 09E9 | 8300 | D67E | 74FE |
| 0000063420 | E903 | 000F | 068E | 7A08 | 8326 | FF3E | 0061 | 0375 |
| 0000063440 | 6CE9 | FF00 | DA36 | FF79 | D836 | FF79 | D636 | FF79 |
| 0000063460 | D436 | 9A79 | 6DB2 | 6492 | C483 | 8908 | D846 | 5689 |

THU MAR 14 17:52:34 1991 TSLINT.DLL PAGE 29, LINE 1653

| | | | | | | | | |
|---|---|---|---|---|---|---|---|---|
| 0000063500 | FFDA | DE76 | 76FF | 8DDC | D846 | 5016 | 76FF | FFEC |
| 0000063520 | FC76 | 76FF | 8DFA | E04E | 5116 | 4E8D | 16F6 | 8D51 |
| 0000063540 | D24E | 5116 | 681E | 0A3E | 4D68 | FF06 | B236 | FF00 |
| 0000063560 | B036 | FF00 | B636 | FF00 | B436 | 9A00 | 6260 | 0000 |
| 0000063600 | C483 | 8B28 | D846 | 568B | E9DA | 001E | 1BE9 | FF00 |
| 0000063620 | DA36 | FF79 | D836 | FF79 | D636 | FF79 | D436 | 9A79 |
| 0000063640 | 6DB2 | 621A | C483 | E908 | 0000 | 5F5E | ED83 | 8B02 |
| 0000063660 | 1FE5 | 4D5D | 1ECB | 9058 | 5545 | EC8B | 8E1E | 81D8 |
| 0000063700 | 2EEC | 5700 | C756 | FA46 | 0A48 | 5E8C | C7FC | F046 |
| 0000063720 | 0107 | C02B | 4689 | 89E2 | E046 | 068E | 7A06 | 8326 |
| 0000063740 | 683E | 0065 | 0375 | 1DE9 | FF00 | B636 | FF00 | B436 |
| 0000063760 | 8D00 | D646 | 5016 | DB9A | 0062 | 8300 | 08C4 | 003D |
| 0000064000 | 7400 | E903 | 000F | 068E | 7A08 | 8326 | 803E | 0065 |
| 0000064020 | 0375 | 3BE9 | 1E00 | 4F68 | 8D0A | E446 | 5016 | 468D |
| 0000064040 | 16D6 | 8D50 | F646 | 5016 | 5668 | 1E06 | B868 | FF0A |
| 0000064060 | B236 | FF00 | B036 | FF00 | B636 | FF00 | B436 | 9A00 |
| 0000064100 | 6324 | 0000 | C483 | 891E | F646 | 5689 | E9F8 | 0008 |
| 0000064120 | C02B | 4689 | 89F8 | F646 | 468D | 16F2 | FF50 | 0876 |
| 0000064140 | 76FF | 9A06 | 2509 | 658F | C483 | 4808 | 0375 | 96E9 |
| 0000064160 | 8E00 | 0606 | 267A | 3E83 | 6623 | 7500 | E903 | 0009 |
| 0000064200 | 7E83 | FEDA | 0374 | 0FE9 | 8E00 | 0806 | 267A | 3E83 |
| 0000064220 | 66AC | 7500 | E903 | 0060 | 681E | 0A56 | A09A | EF69 |
| 0000064240 | 8365 | 04C4 | 4689 | 89DC | DE56 | 76FF | FFE2 | E076 |
| 0000064260 | 468D | 16DC | FF50 | F076 | 76FF | FFFC | FA76 | 4E8D |
| 0000064300 | 16E4 | 8D51 | F64E | 5116 | 4E8D | 16D6 | 1E51 | B868 |
| 0000064320 | 680A | 065C | 36FF | 00B2 | 36FF | 00B0 | 36FF | 00B6 |
| 0000064340 | 36FF | 00B4 | 0D9A | 0067 | 8300 | 28C4 | 468B | 8BDC |
| 0000064360 | DE56 | 56E9 | E901 | 000F | 681E | 0A7D | A09A | 4A69 |
| 0000064400 | 8363 | 04C4 | 44E9 | FF01 | F476 | 76FF | 9AF2 | 6286 |
| 0000064420 | 66C7 | C483 | 8E04 | 8BC2 | 8DD8 | 9A1F | 9935 | 6613 |
| 0000064440 | F79A | 849B | 9966 | 4689 | 89D2 | D456 | 068E | 7A06 |
| 0000064460 | 8326 | 943E | 0066 | 0375 | 4BE9 | 8300 | DA7E | 75FE |
| 0000064500 | E903 | 0042 | 76FF | FFD4 | D276 | 681E | 0AA4 | 468D |
| 0000064520 | 16E4 | 8D50 | F646 | 5016 | 468D | 16D6 | 1E50 | B868 |
| 0000064540 | 680A | 065E | 36FF | 00B2 | 36FF | 00B0 | 36FF | 00B6 |
| 0000064560 | 36FF | 00B4 | 681E | 0AAF | CF68 | 6863 | 63D2 | D59A |
| 0000064600 | 0063 | 8300 | 2AC4 | 006A | E868 | FF03 | D476 | 76FF |
| 0000064620 | 9AD2 | 7AC4 | 6159 | 5052 | FF9A | 00FF | 8E00 | 0606 |
| 0000064640 | 267A | 3E83 | 62C5 | 7500 | E903 | 0009 | 7E83 | FEDA |
| 0000064660 | 0374 | 0FE9 | 8E00 | 0806 | 267A | 3E83 | 62F1 | 7500 |
| 0000064700 | E903 | 006C | 36FF | 79DA | 36FF | 79D8 | 36FF | 79D6 |
| 0000064720 | 36FF | 79D4 | B29A | 336D | 8367 | 08C4 | 4689 | 89DC |
| 0000064740 | DE56 | 76FF | FFE2 | E076 | 468D | 16DC | FF50 | F076 |
| 0000064760 | 76FF | FFFC | FA76 | 4E8D | 16E4 | 8D51 | F64E | 5116 |
| 0000065000 | 4E8D | 16D6 | 1E51 | B868 | 680A | 0660 | 36FF | 00B2 |
| 0000065020 | 36FF | 00B0 | 36FF | 00B6 | 36FF | 00B4 | 6C9A | 0064 |
| 0000065040 | 8300 | 28C4 | 468B | 8BDC | DE56 | 1EE9 | E900 | 001B |
| 0000065060 | 36FF | 79DA | 36FF | 79D8 | 36FF | 79D6 | 36FF | 79D4 |
| 0000065100 | B29A | 6B6D | 8363 | 08C4 | 00E9 | 5E00 | 835F | 02ED |
| 0000065120 | E58B | 5D1F | CB4D | 581E | 4590 | 8B55 | 1EEC | D88E |
| 0000065140 | EC81 | 0006 | 5657 | 006A | 006A | 5E9A | 6E61 | 8367 |
| 0000065160 | 04C4 | 5689 | 89FC | FA46 | 5E8D | 9AFA | 99C0 | 6778 |
| 0000065200 | EC83 | 8B08 | 9ADC | 9B29 | 660E | B29A | 006D | 8366 |
| 0000065220 | 08C4 | 00E9 | 5E00 | 835F | 02ED | E58B | 5D1F | CB4D |
| 0000065240 | 581E | 4590 | 8B55 | 1EEC | D88E | EC81 | 000E | 5657 |
| 0000065260 | 468B | 0B08 | 0646 | 0374 | 15E9 | 6A00 | 6A00 | 9A00 |
| 0000065300 | 615E | 67EA | C483 | 8904 | F246 | 5689 | E9F4 | 0037 |
| 0000065320 | 468D | 16FA | FF50 | 0876 | 76FF | 9A06 | 2509 | 6556 |
| 0000065340 | C483 | FF08 | FC76 | 76FF | 9AFA | 6286 | 6823 | C483 |

THU MAR 14 17:52:34 1991 TSLINT.DLL PAGE 30, LINE 1712

| | | | | | | | | |
|---|---|---|---|---|---|---|---|---|
| 0000065360 | 8E04 | 8BC2 | 8DD8 | 9A1F | 9935 | 67EF | F79A | FF9B |
| 0000065400 | 8967 | F246 | 5689 | 8DF4 | F246 | 5016 | 669A | 135E |
| 0000065420 | 8368 | 04C4 | 4689 | 89F6 | F856 | 76FF | FFF8 | F676 |
| 0000065440 | 149A | 5D51 | 8367 | 04C4 | 5040 | 76FF | FFF8 | F676 |
| 0000065460 | 4F9A | 7D73 | 8367 | 06C4 | 00E9 | 5E00 | 835F | 02ED |
| 0000065500 | E58B | 5D1F | CB4D | 581E | 4590 | 8B55 | 1EEC | D88E |
| 0000065520 | EC81 | 0026 | 5457 | 46C7 | C1FA | 8C0A | FC5E | 46C7 |
| 0000065540 | 07F4 | 2B01 | 89C0 | E646 | 4689 | 8EE4 | 0606 | 267A |
| 0000065560 | 3E83 | 68EE | 7500 | E903 | 001D | 36FF | 00B6 | 36FF |
| 0000065600 | 00B4 | 468D | 16DA | 9A50 | 64E7 | 0000 | C483 | 3D08 |
| 0000065620 | 0000 | 0374 | 0FE9 | 8E00 | 0806 | 267A | 3E83 | 6906 |
| 0000065640 | 7500 | E903 | 003B | 681E | 0AC8 | 468D | 16E8 | 8D50 |
| 0000065660 | DA46 | 5016 | 468D | 16F6 | 6850 | 0686 | 681E | 0AE8 |
| 0000065700 | 36FF | 00B2 | 36FF | 00B0 | 36FF | 00B6 | 36FF | 00B4 |
| 0000065720 | 309A | 0065 | 8300 | 1EC4 | 4689 | 89F6 | F856 | 08E9 |
| 0000065740 | 2B00 | 89C0 | F846 | 4689 | 1EF6 | CF68 | 9A0A | 63E3 |
| 0000065760 | 0000 | E89A | 0063 | 8E00 | 0606 | 267A | 3E83 | 64D1 |
| 0000066000 | 7500 | E903 | 0009 | 7E83 | FEDE | 0374 | 0FE9 | 8E00 |
| 0000066020 | 0806 | 267A | 3E83 | 64FD | 7500 | E903 | 006C | 36FF |
| 0000066040 | 79DA | 36FF | 79D8 | 36FF | 79D6 | 36FF | 79D4 | B29A |
| 0000066060 | 8D6D | 8369 | 08C4 | 4689 | 89E0 | E256 | 76FF | FFE6 |
| 0000066100 | E476 | 468D | 16E0 | FF5D | F476 | 76FF | FFFC | FA76 |
| 0000066120 | 4E8D | 16E8 | 8D51 | F64E | 5116 | 4E8D | 16DA | 1E51 |
| 0000066140 | E868 | 680A | 0689 | 36FF | 00B2 | 36FF | 00B0 | 36FF |
| 0000066160 | 00B6 | 36FF | 00B4 | D59A | 0065 | 8300 | 28C4 | 468B |
| 0000066200 | 8BE0 | E256 | 1EE9 | E900 | 001B | 36FF | 79DA | 36FF |
| 0000066220 | 79D8 | 36FF | 79D6 | 36FF | 79D4 | B29A | DC6D | 8367 |
| 0000066240 | 08C4 | 00E9 | 5E00 | 835F | 02ED | E58B | 5D1F | CB4D |
| 0000066260 | 581E | 4590 | 8B55 | 1EEC | D88E | EC81 | 0028 | 5657 |
| 0000066300 | 46C7 | F1FA | 8C0A | FC5E | 46C7 | 07F2 | 2B01 | 89C0 |
| 0000066320 | E446 | 4689 | 8EE2 | 0606 | 267A | 3E83 | 6A58 | 7500 |
| 0000066340 | E903 | 001D | 36FF | 00B6 | 36FF | 00B4 | 468D | 16D8 |
| 0000066360 | 9A50 | 6878 | 0000 | C483 | 3D08 | 0000 | 0374 | 0FE9 |
| 0000066400 | 8E00 | 0806 | 267A | 3E83 | 6ADF | 7500 | E903 | 003B |
| 0000066420 | 681E | 0AF8 | 468D | 16E6 | 8D50 | D846 | 5016 | 468D |
| 0000066440 | 16F4 | 6850 | 0692 | 681E | 0B1A | 36FF | 00B2 | 36FF |
| 0000066460 | 00B0 | 36FF | 00B6 | 36FF | 00B4 | C19A | 0068 | 8300 |
| 0000066500 | 1EC4 | 4689 | 89F4 | F656 | 08E9 | 2B00 | 89C0 | F646 |
| 0000066520 | 4689 | FFF4 | 0876 | 76FF | 9A06 | AD40 | 6ABB | C483 |
| 0000066540 | 8E04 | 0606 | 267A | 3E83 | 6AC7 | 7500 | E903 | 0045 |
| 0000066560 | 7E83 | FEDC | 0375 | 3CE9 | 1E00 | FF68 | 8D0A | E646 |
| 0000066600 | 5016 | 468D | 16F4 | 8D50 | D846 | 5016 | 681E | 0B1A |
| 0000066620 | 9968 | FF06 | B236 | FF00 | B036 | FF00 | B636 | FF00 |
| 0000066640 | B436 | 1E00 | 1468 | 680B | 6669 | 6C68 | 9A66 | 666F |
| 0000066660 | 0000 | C483 | 9A26 | 61C6 | 0000 | 4689 | 3DF8 | 0000 |
| 0000066700 | 0375 | 0BE9 | FF00 | F876 | E09A | DBAF | 8361 | 02C4 |
| 0000066720 | 068E | 7A06 | 8326 | 623E | 0068 | 0375 | 09E9 | 8300 |
| 0000066740 | DC7E | 74FE | E903 | 000F | 068E | 7A08 | 8326 | 8E3E |
| 0000066760 | 0068 | 0375 | 6CE9 | FF00 | DA36 | FF79 | D836 | FF79 |
| 0000067000 | D636 | FF79 | D436 | 9A79 | 6DB2 | 6B66 | C483 | 8908 |
| 0000067020 | DE46 | 5689 | FFE0 | E476 | 76FF | 8DE2 | DE46 | 5016 |
| 0000067040 | 76FF | FFF2 | FC76 | 76FF | 8DFA | E64E | 5116 | 4E8D |
| 0000067060 | 16F4 | 8D51 | D84E | 5116 | 681E | 0B1A | 9C68 | FF06 |
| 0000067100 | B236 | FF00 | B036 | FF00 | B636 | FF00 | B436 | 9A00 |
| 0000067120 | 6967 | 0000 | C483 | 8B28 | DE46 | 568B | E9E0 | 001E |
| 0000067140 | 1BE9 | FF00 | DA36 | FF79 | D836 | FF79 | D636 | FF79 |
| 0000067160 | D436 | 9A79 | 6DB2 | 6921 | C483 | E908 | 0000 | 5F5E |
| 0000067200 | ED83 | 8B02 | 1FE5 | 4D5D | 00CB | 581E | 4590 | 8B55 |
| 0000067220 | 1EEC | D88E | EC81 | 0098 | 5657 | 46C7 | 39E4 | 8C0B |

THU MAR 14 17:52:34 1991 TSLINT.DLL PAGE 31, LINE 1771

| | | | | | | | | |
|---|---|---|---|---|---|---|---|---|
| 0000067240 | E65E | 46C7 | 07BA | 2B01 | 89C0 | 9A46 | 4689 | 8E98 |
| 0000067260 | IA06 | 267A | 3E83 | 69CC | 7500 | E903 | 001E | 36FF |
| 0000067300 | 0C0C | 36FF | 0C0A | 868D | FF7C | 5016 | E29A | 0069 |
| 0000067320 | 8300 | 08C4 | 003D | 7400 | E903 | 000F | 068E | 7A1C |
| 0000067340 | 8326 | F83E | 0069 | 0375 | 3BE9 | 1E00 | 4068 | 8D0B |
| 0000067360 | 9C46 | 5016 | 868D | FF7C | 5016 | 468D | 16DC | 6A50 |
| 0000067400 | 1E3E | 0E68 | FF0C | 0836 | FF0C | 0636 | FF0C | 0C36 |
| 0000067420 | FF0C | 0A36 | 9A0C | 6A2B | 0000 | C483 | 891E | DC46 |
| 0000067440 | 5689 | E9DE | 0008 | C02B | 4689 | 89DE | DC46 | C02B |
| 0000067460 | 4689 | 89FC | FA46 | 5EC4 | 2606 | 77FF | 260A | 77FF |
| 0000067500 | 6808 | 3381 | C468 | 9A0A | 04AB | 6C6F | C483 | 8908 |
| 0000067520 | D246 | 5689 | 8BD4 | D446 | 460B | 75D2 | E903 | 000D |
| 0000067540 | 5EC4 | 26D2 | 7F83 | 4312 | 0375 | 17E9 | C400 | 065E |
| 0000067560 | FF26 | 0A77 | FF26 | 0877 | 681E | 0B47 | 409A | 90AD |
| 0000067600 | 836D | 08C4 | 068E | 7A1A | 8326 | E73E | 006C | 0375 |
| 0000067620 | 50E9 | 8300 | 807E | 75FE | E903 | 0047 | 5EC4 | 2606 |
| 0000067640 | 77FF | 260A | 77FF | 1E08 | 6568 | 8D0B | 9C46 | 5016 |
| 0000067660 | 468D | 16DC | 8D50 | 7C86 | 16FF | 1E50 | 0E68 | 6A0C |
| 0000067700 | FF51 | 0836 | FF0C | 0636 | FF0C | 0C36 | FF0C | 0A36 |
| 0000067720 | 1E0C | 7968 | 680B | 6D77 | 7A68 | 9A6D | 6D7D | 0000 |
| 0000067740 | C483 | C42A | 025E | C426 | 261F | 478B | 890C | BC46 |
| 0000067760 | 068E | 7A1A | 8326 | 373E | 006D | 0375 | 41E9 | 8300 |
| 0000070000 | 807E | 75FE | E903 | 0038 | 76FF | 1EBC | 8268 | 8D0B |
| 0000070020 | 9C46 | 5016 | 468D | 16DC | 8D50 | 7C86 | 16FF | 1E50 |
| 0000070040 | 0E68 | 6A0C | FF56 | 0836 | FF0C | 0636 | FF0C | 0C36 |
| 0000070060 | FF0C | 0A36 | 680C | 0101 | F89A | 003A | 8300 | 22C4 |
| 0000070100 | 068E | 7A1A | 8326 | A63E | 006B | 0375 | 45E9 | 8300 |
| 0000070120 | 807E | 75FE | E903 | 003C | 681E | 0B88 | 468D | 169C |
| 0000070140 | 8D50 | DC46 | 5016 | 868D | FF7C | 5016 | 681E | 0C0E |
| 0000070160 | 586A | 36FF | 0C08 | 36FF | 0C06 | 36FF | 0C0C | 36FF |
| 0000070200 | 0C0A | 681E | 0B9F | 9868 | 686A | 6A9B | 9E9A | 006A |
| 0000070220 | 8300 | 26C4 | 7E83 | 00BC | 037F | A7E9 | 9A00 | E352 |
| 0000070240 | 6A4C | 8E50 | 1E06 | 267A | 70A0 | 5026 | 468B | C1BC |
| 0000070260 | 02E0 | 9A50 | AC87 | 6E93 | C483 | 8906 | FA46 | 5689 |
| 0000070300 | 0BFC | 74D0 | E903 | 000C | 681E | 0BA8 | B69A | DFB3 |
| 0000070320 | 836D | 04C4 | 068E | 7A1A | 8326 | 7B3E | 006C | 0375 |
| 0000070340 | 61E9 | 8300 | 807E | 75FE | E903 | 0058 | E49A | ECF7 |
| 0000070360 | 526D | FF50 | FC76 | 76FF | 9AFA | F91E | 6C3A | C483 |
| 0000070400 | 5004 | 76FF | FFFC | FA76 | 681E | 0BB7 | 468D | 169C |
| 0000070420 | 8D50 | DC46 | 5016 | 868D | FF7C | 5016 | 681E | 0C0E |
| 0000070440 | 5B6A | 36FF | 0C08 | 36FF | 0C06 | 36FF | 0C0C | 36FF |
| 0000070460 | 0C0A | 681E | 0BC5 | C668 | 686C | 6CC9 | CC9A | 006C |
| 0000070500 | 8300 | 30C4 | 468B | 8BFA | FC56 | 4689 | 89E0 | E256 |
| 0000070520 | 468B | 8B0A | 0C56 | 8689 | FF6E | 9689 | FF70 | 14E9 |
| 0000070540 | C400 | 6E9E | 26FF | 478B | 2604 | 578B | 8906 | 6E86 |
| 0000070560 | 89FF | 7096 | 83FF | BC7E | 7500 | E903 | 0154 | 868B |
| 0000070600 | FF70 | 860B | FF6E | 0375 | 47E9 | C401 | 6E9E | 26FF |
| 0000070620 | 078B | 8B26 | 0257 | 8689 | FF72 | 9689 | FF74 | 3D6A |
| 0000070640 | A69A | FAB2 | 836A | 02C4 | 8689 | FF6A | 9689 | FF6C |
| 0000070660 | 9EC4 | FF72 | 8326 | 127F | 7428 | E903 | 0023 | 9EC4 |
| 0000070700 | FF72 | 8B26 | 0C5F | E3C1 | 8E02 | 2006 | 267A | 36C4 |
| 0000070720 | 0856 | 8B26 | 2600 | 508B | 8902 | 7286 | 89FF | 7496 |
| 0000070740 | C4FF | 729E | 26FF | 7F83 | 3E12 | 0374 | IAE9 | 8B00 |
| 0000070760 | 7286 | 8BFF | 7496 | 1EFF | F08B | DA8E | BEC4 | FF6A |
| 0000071000 | 0BB9 | F300 | 1FA5 | ADE9 | 8B00 | 7286 | 8BFF | 7496 |
| 0000071020 | 8EFF | 2206 | 267A | B0A3 | 260A | 1689 | 0AB2 | D00B |
| 0000071040 | 0374 | 10E9 | 8E00 | 2406 | 267A | 3AA1 | 2637 | 168B |
| 0000071060 | 373C | 39E9 | 8E00 | 2206 | 267A | 1EC4 | 0AB0 | 8326 |
| 0000071100 | 127F | 744E | E903 | 0010 | 068E | 7A22 | A126 | 0AB0 |

THU MAR 14 17:52:34 1991 TSLINT.DLL PAGE 32, LINE 1830

| | | | | | | | | |
|---|---|---|---|---|---|---|---|---|
| 0000071120 | 8B26 | B216 | E90A | 0016 | 068E | 7A22 | FF26 | B236 |
| 0000071140 | 260A | 36FF | 0AB0 | 9F9A | BF49 | 836D | 04C4 | 068E |
| 0000071160 | 7A26 | A326 | 0A84 | 8926 | 8616 | 260A | 36FF | 0A86 |
| 0000071200 | FF26 | 8436 | 9A0A | 6983 | 6FF9 | C483 | 8904 | 7686 |
| 0000071220 | 89FF | 7896 | 8BFF | 7686 | 8BFF | 7896 | C4FF | 6A9E |
| 0000071240 | 26FF | 0789 | 8926 | 0257 | 9EC4 | FF6A | C02B | 8926 |
| 0000071260 | D647 | 8926 | 0447 | 868B | FF6A | 968B | FF6C | 5EC4 |
| 0000071300 | 83E0 | E046 | 2604 | 0789 | 8926 | 0257 | 4EFF | E9BC |
| 0000071320 | FE8F | 868B | FF70 | 860B | FF6E | 0375 | 17E9 | C400 |
| 0000071340 | 065E | FF26 | 0A77 | FF26 | 0877 | 681E | 0BCE | 4A9A |
| 0000071360 | 59B2 | 836F | 08C4 | 468B | FFBC | BC4E | 003D | 7F0D |
| 0000071400 | E903 | 0051 | 3D6A | A69A | A6B2 | 836D | 02C4 | 8689 |
| 0000071420 | FF6A | 9689 | FF6C | 068E | 7A24 | A126 | 373A | 8B26 |
| 0000071440 | 3C16 | C437 | 6A9E | 26FF | 0789 | 8926 | 0257 | 9EC4 |
| 0000071460 | FF6A | C02B | 8926 | 0647 | 8926 | 0447 | 868B | FF6A |
| 0000071500 | 968B | FF6C | 5EC4 | 83E0 | E046 | 2604 | 0789 | 8926 |
| 0000071520 | 0257 | A1E9 | 8BFF | FA46 | 568B | 89FC | E046 | 5689 |
| 0000071540 | 8EE2 | 2006 | 267A | 56A1 | 2608 | 168B | 0858 | 4689 |
| 0000071560 | 89FA | FC56 | 468B | 8BE0 | E256 | A326 | 0856 | 8926 |
| 0000071600 | 5816 | 6A08 | 6812 | 6C32 | 5468 | 8D00 | 8646 | 5016 |
| 0000071620 | 2E9A | B266 | 8367 | 0AC4 | 068E | 7A28 | FF26 | 5C06 |
| 0000071640 | 6A38 | 6812 | 7076 | 3868 | 8D00 | E846 | 5016 | 2E9A |
| 0000071660 | 8366 | 8370 | 0AC4 | 068E | 7A2A | A126 | 3858 | 8689 |
| 0000071700 | FF7A | 126A | 9468 | 6870 | 0A88 | 468D | 16BE | 9A50 |
| 0000071720 | 662E | 70A1 | C483 | 8E0A | 2C06 | 267A | 5AA1 | 8938 |
| 0000071740 | D646 | 126A | B568 | 6870 | 0066 | 468D | 16A8 | 9A50 |
| 0000071760 | 662E | 70C2 | C483 | 8E0A | 2E06 | 267A | 5EA1 | 8938 |
| 0000072000 | D046 | C726 | 5E06 | 0038 | 8E00 | 3006 | 267A | 5EA1 |
| 0000072020 | 260C | 168B | 0C60 | 4689 | 89D8 | DA56 | 6168 | 6871 |
| 0000072040 | 0054 | D29A | 6968 | 8371 | 04C4 | 003D | 7400 | E903 |
| 0000072060 | 0013 | 5EC4 | 26D2 | 77FF | 2606 | 77FF | 9A04 | 2D02 |
| 0000072100 | 6FE1 | C483 | 8E04 | 3006 | 267A | 5EA1 | 260C | 168B |
| 0000072120 | 0C60 | 8689 | FF6A | 9689 | FF6C | 438B | 8BD8 | DA56 |
| 0000072140 | A326 | 0C5E | P926 | 6016 | 6A0C | 8D12 | 8646 | 5016 |
| 0000072160 | 7F68 | 6871 | 0054 | 2E9A | 8766 | 8371 | 0AC4 | 068E |
| 0000072200 | 7A28 | FF26 | 5C0E | 6A38 | 8D12 | E846 | 5016 | D568 |
| 0000072220 | 6870 | 0038 | 2E9A | E266 | 8370 | 0AC4 | 868B | FF7A |
| 0000072240 | 068E | 7A2A | A326 | 3858 | 126A | 468D | 16BE | 6850 |
| 0000072260 | 71C0 | 8868 | 9A0A | 662E | 71C8 | C483 | 8B0A | D646 |
| 0000072300 | 068E | 7A2C | A326 | 385A | 126A | 468D | 16A8 | 6850 |
| 0000072320 | 710D | 6668 | 9A00 | 662E | 7115 | C483 | 8B0A | D046 |
| 0000072340 | 068E | 7A2E | A326 | 385E | 068E | 7A20 | A126 | 0856 |
| 0000072360 | 8B26 | 5816 | 8908 | E046 | 5689 | 8BE2 | FA46 | 568B |
| 0000072400 | 26FC | 56A3 | 2608 | 1689 | 0858 | 468B | 8BE0 | E256 |
| 0000072420 | 4689 | 89FA | FC56 | 5EC4 | 26D2 | 1FC4 | 8B26 | 0C47 |
| 0000072440 | 4689 | 8BBC | 0A46 | 568B | 890C | 6E86 | 89FF | 7096 |
| 0000072460 | E9FF | 0014 | 9EC4 | FF6E | 8B26 | 0447 | 8B26 | 0657 |
| 0000072500 | 8689 | FF6E | 9689 | FF70 | 468B | FFBC | BC4E | 003D |
| 0000072520 | 7F00 | E903 | 00A4 | 868B | FF70 | 860B | FF6E | 0375 |
| 0000072540 | 97E9 | C400 | 6E9E | 26FF | 078B | 8B26 | 0257 | 8689 |
| 0000072560 | FF72 | 9689 | FF74 | 5EC4 | 83E0 | E046 | 2604 | 078B |
| 0000072600 | 8B26 | 0257 | 8689 | FF76 | 9689 | FF78 | 9EC4 | FF72 |
| 0000072620 | 8326 | 127F | 743D | E903 | 0030 | 9EC4 | FF76 | 8326 |
| 0000072640 | 127F | 743E | E903 | 0022 | 9EC4 | FF76 | 8B26 | 0447 |
| 0000072660 | 8B26 | 0657 | 9EC4 | FF72 | 8926 | 0447 | 8926 | 0657 |
| 0000072700 | 9EC4 | FF72 | C726 | 1247 | 003E | 9EC4 | FF76 | 8B26 |
| 0000072720 | 2607 | 578B | 8E02 | 3206 | 267A | A0A3 | 260A | 1689 |
| 0000072740 | 0AA2 | E79A | E229 | FF72 | 78B6 | FFFF | 76B6 | 9AFF |
| 0000072760 | B4E2 | 7329 | C483 | E904 | FF3A | 468B | FFBC | BC4E |

THU MAR 14 17:52:34 1991 TSLINT.DLL PAGE 33, LINE 1889

| | | | | | | | | |
|---|---|---|---|---|---|---|---|---|
| 0000073000 | 003D | 7F00 | E903 | 0046 | 5EC4 | 83E0 | E046 | 2604 |
| 0000073020 | 078B | 8B26 | 0257 | 8689 | FF76 | 9689 | FF78 | 9EC4 |
| 0000073040 | FF76 | 8B26 | 2607 | 578B | 8E02 | 3206 | 267A | A0A3 |
| 0000073060 | 260A | 1689 | 0AA2 | E79A | 3629 | FF73 | 78B6 | FFFF |
| 0000073100 | 76B6 | 9AFF | B4E2 | 6F78 | C483 | E904 | FFAC | 468B |
| 0000073120 | 0BFC | FA46 | 0375 | 86E9 | FF00 | FC76 | 76FF | 9AFA |
| 0000073140 | F91E | 7384 | C483 | 8904 | 6886 | FFFF | FC76 | 76FF |
| 0000073160 | 9AFA | AA42 | 72D5 | C483 | 8E04 | 1A06 | 267A | 3E83 |
| 0000073200 | 6DCB | 7500 | E903 | 0057 | 7E83 | FE80 | 0375 | 4EE9 |
| 0000073220 | 9A00 | F7E4 | 7130 | 5052 | B6FF | FF68 | 76FF | FFFC |
| 0000073240 | FA76 | 681E | 0BEE | 468D | 169C | 8D50 | DC46 | 5016 |
| 0000073260 | 868D | FF7C | 5016 | 681E | 0C0E | C068 | FF00 | 0836 |
| 0000073300 | FF0C | 0636 | FF0C | 0C36 | FF0C | 0A36 | 1E0C | FC68 |
| 0000073320 | 680B | 6E27 | 2A68 | 9A6E | 6E2D | 0000 | C483 | 8E30 |
| 0000073340 | 1A06 | 267A | 3E83 | 7370 | 7500 | E903 | 0009 | 7E83 |
| 0000073360 | FE80 | 0374 | 0FE9 | 8E00 | 1C06 | 267A | 3E83 | 6BD3 |
| 0000073400 | 7500 | E903 | 005D | 868B | FF6A | 968B | FF6C | 4689 |
| 0000073420 | 8982 | 8456 | 76FF | FF9A | 9876 | 468D | 1682 | FF50 |
| 0000073440 | BA76 | 76FF | FFE6 | E476 | 4E8D | 169C | 8D51 | DC4E |
| 0000073460 | 5116 | 8E8D | FF7C | 5116 | 681E | 0C0E | C268 | FF00 |
| 0000073500 | 0836 | FF0C | 0636 | FF0C | 0C36 | FF0C | 0A36 | 9A0C |
| 0000073520 | 6B40 | 0000 | C483 | 8B28 | 8246 | 568B | E984 | 000E |
| 0000073540 | 0BE9 | 8B00 | 6A86 | 8BFF | 6C96 | E9FF | 0000 | 5F5E |
| 0000073560 | ED83 | 8B02 | 1FE5 | 4D5D | 1ECB | 9058 | 5545 | EC8B |
| 0000073600 | 8E1E | 81D8 | 36EC | 5700 | C456 | 065E | 8B26 | 2607 |
| 0000073620 | 578B | 8E02 | 2206 | 267A | B0A3 | 260A | 1689 | 0AB2 |
| 0000073640 | D00B | 0374 | 1DE9 | 8E00 | 2406 | 267A | 3AA1 | 2637 |
| 0000073660 | 168B | 373C | 39E9 | 8E00 | 2206 | 267A | 1EC4 | 0AB0 |
| 0000073700 | 8326 | 127F | 744E | E903 | 0010 | 068E | 7A22 | A126 |
| 0000073720 | 0AB0 | 8B26 | B216 | E90A | 0016 | 068E | 7A22 | FF26 |
| 0000073740 | B236 | 260A | 36FF | 0AB0 | 9F9A | 5249 | 8373 | 04C4 |
| 0000073760 | 068E | 7A26 | A326 | 0A84 | 8926 | 8616 | 260A | 36FF |
| 0000074000 | 0A86 | FF26 | 8436 | 9A0A | 6514 | 7364 | C483 | 8904 |
| 0000074020 | F446 | 5689 | C4F6 | 065E | C426 | 045F | 8326 | 127F |
| 0000074040 | 744C | E903 | 0111 | 5EC4 | 2606 | 5FC4 | 2604 | 478B |
| 0000074060 | 2604 | 578B | 8906 | F846 | 5689 | 8EFA | 3C06 | 267A |
| 0000074100 | 3E83 | 3742 | 7400 | E903 | 00EA | 1E8D | 7A34 | 319A |
| 0000074120 | A899 | 8E71 | 3E06 | 267A | 1EC4 | 0C66 | C426 | 8D1F |
| 0000074140 | 9A1F | 9935 | 7559 | 1D9A | 899F | 7575 | E903 | 0006 |
| 0000074160 | 01B8 | E900 | 0003 | 00B8 | C400 | 065E | C426 | 045F |
| 0000074200 | 8026 | 107F | 1B01 | 41C9 | C133 | 003D | 7500 | E903 |
| 0000074220 | 00A2 | 1E8D | 7A34 | 319A | 9C99 | 8E75 | 3E06 | 267A |
| 0000074240 | 1EC4 | 0C66 | C426 | 8D1F | 9A1F | 9935 | 75A1 | 1D9A |
| 0000074260 | F39F | 7575 | E903 | 0006 | 01B8 | E900 | 0003 | 00B8 |
| 0000074300 | 5000 | 5EC4 | 2606 | 5FC4 | 2604 | 77FF | 2602 | 37FF |
| 0000074320 | 389A | 8A20 | 8376 | 06C4 | 5EC4 | 2606 | 5FC4 | 2604 |
| 0000074340 | 4789 | 2604 | 5789 | C406 | 065E | C426 | 045F | 8B26 |
| 0000074360 | 0447 | 8B26 | 0657 | 4689 | 89F8 | FA56 | 1E8D | 7A34 |
| 0000074400 | 319A | 0699 | 8E76 | 3E06 | 267A | 1EC4 | 0C66 | C426 |
| 0000074420 | 8D1F | 9A1F | 9935 | 760B | 1D9A | A39F | 7576 | E903 |
| 0000074440 | 0005 | 01B0 | 02E9 | B000 | C400 | 065E | C426 | 045F |
| 0000074460 | 8826 | 1047 | E9E9 | C400 | 065E | 8B26 | 0447 | 8B26 |
| 0000074500 | 0657 | 068E | 7A22 | A326 | 0AB0 | 8926 | B216 | 0B0A |
| 0000074520 | 74D0 | E903 | 0010 | 068E | 7A24 | A126 | 373A | 8B26 |
| 0000074540 | 3C16 | E937 | 0039 | 068E | 7A22 | C426 | B01E | 260A |
| 0000074560 | 7F83 | 4E12 | 0374 | 10E9 | 8E00 | 2206 | 267A | B0A1 |
| 0000074600 | 260A | 168B | 0AB2 | 16E9 | 8E00 | 2206 | 267A | 36FF |
| 0000074620 | 0AB2 | FF26 | B036 | 9A0A | 499F | 76E7 | C483 | 8E04 |
| 0000074640 | 2606 | 267A | 84A3 | 260A | 1689 | 0A86 | 1E8D | 7A34 |

THU MAR 14 17:52:34 1991 TSLINT.DLL PAGE 34, LINE 1948

| | | | | | | | | |
|---|---|---|---|---|---|---|---|---|
| 0000074660 | 319A | B699 | 8E76 | 3E06 | 267A | 1EC4 | 0C66 | C426 |
| 0000074700 | 8D1F | 9A1F | 9935 | 76BB | 1D9A | 849F | 7577 | E903 |
| 0000074720 | 0006 | 01B8 | E900 | 0003 | 00B8 | 5000 | 068E | 7A26 |
| 0000074740 | FF26 | 8636 | 260A | 36FF | 0A84 | 149A | 3965 | 8377 |
| 0000074760 | 04C4 | 5052 | 2E9A | 0B1C | 8377 | 06C4 | 4689 | 89F8 |
| 0000075000 | FA56 | 468B | 0BFA | F846 | 0374 | 13E9 | 1E00 | 1868 |
| 0000075020 | 680C | 00DE | 681E | 0C28 | B69A | DBB3 | 8374 | 0AC4 |
| 0000075040 | 468D | 16CC | C450 | F45E | FF26 | 0C77 | 006A | 5EC4 |
| 0000075060 | 26F4 | 77FF | C40C | F45E | FF26 | 0A77 | FF26 | 0877 |
| 0000075100 | 76FF | FFFA | F876 | 749A | 648F | 8377 | 12C4 | 4689 |
| 0000075120 | C4FC | F45E | F626 | 1447 | 7502 | E903 | 001B | 468B |
| 0000075140 | 8BF4 | F656 | 068E | 7A32 | A326 | 0AA0 | 8926 | A216 |
| 0000075160 | 9A0A | 29E7 | 74FA | 00E9 | 8300 | FC7E | 7D00 | E903 |
| 0000075200 | 002A | 46FF | 8BFC | E046 | 462B | 89CC | CA46 | 5E8D |
| 0000075220 | 9ACA | 99CD | 7541 | 068E | 7A40 | C426 | 621E | 260A |
| 0000075240 | 1FC4 | 1F8D | 319A | 549B | E975 | 0020 | 46C7 | 00FC |
| 0000075260 | 8E00 | 4006 | 267A | 1EC4 | 0A62 | 8B26 | 2607 | 578B |
| 0000075300 | 8B02 | BEF8 | 7A42 | C28E | A5A5 | A5A5 | 5E8D | 9AFC |
| 0000075320 | 99CD | 7797 | 068E | 7A4A | C426 | B41E | 260A | 1FC4 |
| 0000075340 | 1F8D | 319A | DD9B | 8D77 | FC5E | CD9A | E799 | 8377 |
| 0000075360 | 08EC | DC8B | 299A | C29B | 9A77 | 6DB2 | 76DD | C483 |
| 0000075400 | E908 | 0000 | 5F5E | ED83 | 8B02 | 1FE5 | 4D5D | 1ECB |
| 0000075420 | 9058 | 5545 | EC8B | 8E1E | 81D8 | 82EC | 5700 | C756 |
| 0000075440 | FA46 | 0C44 | 5E8C | C7FC | AE46 | 0107 | C02B | 4689 |
| 0000075460 | 89A0 | 9E46 | 068E | 7A1A | 8326 | D63E | 0073 | 0375 |
| 0000075500 | 1DE9 | FF00 | 0C36 | FF0C | 0A36 | 8D0C | 9246 | 5016 |
| 0000075520 | BD9A | 006B | 8300 | 08C4 | 003D | 7400 | E903 | 000F |
| 0000075540 | 068E | 7A1C | 8326 | EE3E | 0073 | 0375 | 3BE9 | 1E00 |
| 0000075560 | 4B68 | 8D0C | A246 | 5016 | 468D | 1692 | 8D50 | DE46 |
| 0000075600 | 5016 | F868 | 1E00 | BC68 | FF0C | 0836 | FF0C | 0636 |
| 0000075620 | FF0C | 0C36 | FF0C | 0A36 | 9A0C | 6C06 | 0000 | C483 |
| 0000075640 | 891E | DE46 | 5689 | E9E0 | 0008 | C02B | 4689 | 89E0 |
| 0000075660 | DE46 | 46C7 | 00E6 | C700 | DC46 | 0000 | 5EC4 | 2606 |
| 0000075700 | 7F83 | 4712 | 0374 | 06E9 | B800 | 0001 | 03E9 | B800 |
| 0000075720 | 0000 | 4689 | C4F0 | 065E | C426 | 045F | 8326 | 127F |
| 0000075740 | 744C | E903 | 0111 | 5EC4 | 2606 | 5FC4 | 2604 | 478B |
| 0000075760 | 2604 | 578B | 8906 | EC46 | 5689 | 8EEE | 3C06 | 267A |
| 0000076000 | 3E83 | 3742 | 7400 | E903 | 00EA | 1E8D | 7A34 | 319A |
| 0000076020 | 1499 | 8E79 | 3E06 | 267A | 1EC4 | 0C66 | C426 | 8D1F |
| 0000076040 | 9A1F | 9935 | 7919 | 1D9A | 499F | 7579 | E903 | 0006 |
| 0000076060 | 01B8 | E900 | 0003 | 00B8 | C400 | 065E | C426 | 045F |
| 0000076100 | 8026 | 107F | 1B01 | 41C9 | C133 | 003D | 7500 | E903 |
| 0000076120 | 00A2 | 1E8D | 7A34 | 319A | 5C99 | 8E79 | 3E06 | 267A |
| 0000076140 | 1EC4 | 0C66 | C426 | 8D1F | 9A1F | 9935 | 7961 | 1D9A |
| 0000076160 | B39F | 7579 | E903 | 0006 | 01B8 | E900 | 0003 | 00B8 |
| 0000076200 | 5000 | 5EC4 | 2606 | 5FC4 | 2604 | 77FF | 2602 | 37FF |
| 0000076220 | 389A | 4A20 | 837A | 06C4 | 5EC4 | 2606 | 5FC4 | 2604 |
| 0000076240 | 4789 | 2604 | 5789 | C406 | 065E | C426 | 045F | 8B26 |
| 0000076260 | 0447 | 8B26 | 0657 | 4689 | 89EC | EE56 | 1E8D | 7A34 |
| 0000076300 | 319A | C699 | 8E79 | 3E06 | 267A | 1EC4 | 0C66 | C426 |
| 0000076320 | 8D1F | 9A1F | 9935 | 79CB | 1D9A | 639F | 757A | E903 |
| 0000076340 | 0005 | 01B0 | 02E9 | B000 | C400 | 065E | C426 | 045F |
| 0000076360 | 8826 | 1047 | E9E9 | C400 | 065E | 8B26 | 0447 | 8B26 |
| 0000076400 | 0657 | 068E | 7A22 | A326 | 0AB0 | 8926 | B216 | 0B0A |
| 0000076420 | 74D0 | E903 | 0010 | 068E | 7A24 | A126 | 373A | 8B26 |
| 0000076440 | 3C16 | E937 | 0039 | 068E | 7A22 | C426 | B01E | 260A |
| 0000076460 | 7F83 | 4E12 | 0374 | 10E9 | 8E00 | 2206 | 267A | B0A1 |
| 0000076500 | 260A | 168B | 0AB2 | 16E9 | 8E00 | 2206 | 267A | 36FF |
| 0000076520 | 0AB2 | FF26 | B036 | 9A0A | 499F | 7AA7 | C483 | 8E04 |

THU MAR 14 17:52:34 1991 TSLINT.DLL PAGE 35, LINE 2007

| | | | | | | | | |
|---|---|---|---|---|---|---|---|---|
| 0000076540 | 2606 | 267A | 84A3 | 260A | 1689 | 0A86 | 1E8D | 7A34 |
| 0000076560 | 319A | 7699 | 8E7A | 3E06 | 267A | 1EC4 | 0C66 | C426 |
| 0000076600 | 8D1F | 9A1F | 9935 | 7A7B | 1D9A | D59F | 7577 | E903 |
| 0000076620 | 0006 | 01B8 | E900 | 0003 | 00B8 | 5000 | 068E | 7A26 |
| 0000076640 | FF26 | 8636 | 260A | 36FF | 0A84 | 149A | 6165 | 837B |
| 0000076660 | 04C4 | 5052 | 2E9A | CB1C | 837A | 06C4 | 4689 | 89EC |
| 0000076700 | EE56 | 468B | 0BEE | EC46 | 0374 | 13E9 | 1E00 | 5268 |
| 0000076720 | 680C | 011B | 681E | 0C62 | B69A | 42B3 | 837B | 0AC4 |
| 0000076740 | 5EC4 | 2606 | 078B | 8B26 | 0257 | 4689 | 8906 | 0856 |
| 0000076760 | 5EC4 | 2606 | 078B | 8B26 | 0257 | 068E | 7A22 | A326 |
| 0000077000 | 0AB0 | 8926 | B216 | 0B0A | 74D0 | E903 | 0010 | 068E |
| 0000077020 | 7A24 | A126 | 373A | 8B26 | 3C16 | E937 | 0039 | 068E |
| 0000077040 | 7A22 | C426 | B01E | 260A | 7F83 | 4E12 | 0374 | 10E9 |
| 0000077060 | 8E00 | 2206 | 267A | B0A1 | 260A | 168B | 0AB2 | 16E9 |
| 0000077100 | 8E00 | 2206 | 267A | 36FF | 0AB2 | FF26 | B036 | 9A0A |
| 0000077120 | 499F | 75C3 | C483 | 8E04 | 2606 | 267A | 84A3 | 260A |
| 0000077140 | 1689 | 0A86 | FF26 | 8636 | 260A | 36FF | 0A84 | 149A |
| 0000077160 | EC65 | 8377 | 04C4 | 4689 | 89E8 | EA56 | 5EC4 | 2606 |
| 0000077200 | 478B | 2604 | 578B | 8906 | 0646 | 5689 | 8E08 | 3206 |
| 0000077220 | 2B7A | 26C0 | A2A3 | 260A | A0A3 | 8E0A | 4C06 | 267A |
| 0000077240 | 06C7 | 0AC2 | FFFF | 468B | 0B08 | 0646 | 0374 | 73E9 |
| 0000077260 | 8E00 | 4E06 | 267A | 3E83 | 1568 | 7500 | E903 | 0013 |
| 0000077300 | 068E | 7A50 | C426 | 761E | 260C | 078B | 8B26 | 0257 |
| 0000077320 | 17E9 | 6A00 | 6A00 | 9A00 | 12CF | 7C2F | C483 | 8E04 |
| 0000077340 | 8BC2 | 26D8 | 078B | 8B26 | 0257 | 4689 | 89E2 | E456 |
| 0000077360 | 068E | 7A50 | A126 | 0C76 | 8B26 | 7816 | 890C | D846 |
| 0000077400 | 5689 | 8EDA | 4C06 | 267A | 06C7 | 0AC2 | 0000 | 468B |
| 0000077420 | 8BE2 | E456 | 068E | 7A32 | A326 | 0AA0 | 8926 | A216 |
| 0000077440 | E90A | 00AE | 5EC4 | 2606 | 078B | 8B26 | 0257 | 4689 |
| 0000077460 | 89E2 | E456 | 016A | 76FF | FFE4 | E276 | DB9A | B725 |
| 0000077500 | 837C | 06C4 | 4689 | 89D8 | DA56 | 468B | 8BE2 | E456 |
| 0000077520 | 068E | 7A22 | A326 | 0AB0 | 8926 | B216 | 0B0A | 74D0 |
| 0000077540 | E903 | 0010 | 068E | 7A24 | A126 | 373A | 8B26 | 3C16 |
| 0000077560 | E937 | 0039 | 068E | 7A22 | C426 | B01E | 260A | 7F83 |
| 0000077600 | 4E12 | 0374 | 10E9 | 8E00 | 2206 | 267A | B0A1 | 260A |
| 0000077620 | 168B | 0AB2 | 16E9 | 8E00 | 2206 | 267A | 36FF | 0AB2 |
| 0000077640 | FF26 | B036 | 9A0A | 499F | 7E0E | C483 | 8E04 | 2606 |
| 0000077660 | 267A | 84A3 | 260A | 1689 | 0A86 | FF26 | 8636 | 260A |
| 0000077700 | 36FF | 0A84 | 149A | F965 | 837C | 04C4 | 4689 | 89E2 |
| 0000077720 | E456 | 5EC4 | 26E2 | 7F80 | 010E | 0376 | 0DE9 | C400 |
| 0000077740 | E25E | F626 | 1447 | 7504 | E903 | 005E | 5EC4 | 26E2 |
| 0000077760 | 478A | 2A14 | 89E4 | 9C46 | 5EC4 | 26E2 | 6780 | FE14 |
| 0000100000 | 76FF | FFE4 | E276 | 839A | 1169 | 837D | 04C4 | 4689 |
| 0000100020 | 89F2 | F456 | 468A | C49C | E25E | 8826 | 1447 | E79A |
| 0000100040 | 7929 | 8B7D | F246 | 568B | 89F4 | E246 | 5689 | 8BE4 |
| 0000100060 | DA46 | 460B | 75D8 | E903 | 0010 | 468B | 8BF2 | F456 |
| 0000100100 | 5EC4 | 26D8 | 0789 | 8926 | 0257 | 5EC4 | 26E2 | 478B |
| 0000100120 | 2608 | 578B | 890A | F646 | 5689 | 8DF8 | B046 | 5016 |
| 0000100140 | 5EC4 | 26E2 | 4F8B | 2B0C | E64E | FF51 | E676 | 5EC4 |
| 0000100160 | 26E2 | 77FF | C40C | E25E | FF26 | 0A77 | FF26 | 0877 |
| 0000100200 | 76FF | FFEE | EC76 | 749A | 218F | 837E | 12C4 | 7540 |
| 0000100220 | E903 | 000B | 468B | 39B0 | C446 | 0374 | 03E9 | E900 |
| 0000100240 | 0331 | 46FF | 8BDC | C446 | 462B | 89B0 | 8C46 | 5EC4 |
| 0000100260 | 26E2 | 778B | 2B0C | 8C76 | 5EC4 | 26E8 | 478B | 2608 |
| 0000100300 | 578B | 890A | 8846 | 5689 | E98A | 0003 | 46FF | C488 |
| 0000100320 | E85E | 8B26 | 0847 | 5EC4 | 26E8 | 4703 | 3B0C | 8846 |
| 0000100340 | 0377 | 36E9 | C400 | 885E | 8026 | 263F | 0374 | 06E9 |
| 0000100360 | 0300 | 8C76 | 21E9 | C400 | 885E | 8026 | 5C3F | 0374 |
| 0000100400 | 14E9 | C400 | 885E | 8026 | 017F | 7426 | E903 | 0007 |

THU MAR 14 17:52:34 1991 TSLINT.DLL PAGE 36, LINE 2066

| | | | | | | | | |
|---|---|---|---|---|---|---|---|---|
| 0000100420 | 46FF | 4688 | 01E9 | 4600 | B1E9 | 9AFF | E352 | 7E3A |
| 0000100440 | 8E50 | 1E06 | 267A | 70A0 | 5026 | 448D | 5001 | 879A |
| 0000100460 | 9DAC | 837A | 06C4 | 4689 | 898E | 9056 | D00B | 0374 |
| 0000100500 | 0CE9 | 1E00 | 7E68 | 9A0C | B3B6 | 7E5A | C483 | 8E04 |
| 0000100520 | 1A06 | 267A | 3E83 | 782B | 7500 | E903 | 0061 | 7E83 |
| 0000100540 | FE96 | 0375 | 58E9 | 9A00 | F7E4 | 7E67 | 5052 | 76FF |
| 0000100560 | FF90 | 8E76 | 1E9A | 83F9 | 8379 | 04C4 | FF50 | 9076 |
| 0000100600 | 76FF | 1E8E | 8D68 | 8D0C | A246 | 5016 | 468D | 16DE |
| 0000100620 | 8D50 | 9246 | 5016 | 681E | 0CBC | 4F68 | FF01 | 0836 |
| 0000100640 | FF0C | 0636 | FF0C | 0C36 | FF0C | 0A36 | 1E0C | 9B68 |
| 0000100660 | 680C | 73C2 | C568 | 9A73 | 73C8 | 0000 | C483 | 8B30 |
| 0000100700 | 8E46 | 568B | 8990 | 8446 | 5689 | C486 | E25E | 8B26 |
| 0000100720 | 0847 | 8B26 | 0A57 | 4689 | 8988 | 8A56 | 03E9 | FF00 |
| 0000100740 | 8846 | 5EC4 | 26E2 | 478B | 0308 | B046 | 463B | 7788 |
| 0000100760 | E903 | 0012 | 5EC4 | 2688 | 078A | 5EC4 | FF84 | 8446 |
| 0000101000 | 8826 | E907 | FFD9 | 5EC4 | 26E8 | 470B | 2608 | 578B |
| 0000101020 | 890A | 8846 | 5689 | E98A | 0003 | 46FF | C488 | E85E |
| 0000101040 | 8B26 | 0847 | 5EC4 | 26E8 | 4703 | 3B0C | 8846 | 0377 |
| 0000101060 | 8DE9 | C400 | 885E | 8026 | 263F | 0374 | 41E9 | C400 |
| 0000101100 | E25E | 8B26 | 0847 | 8B26 | 0A57 | 4603 | 89B0 | 8046 |
| 0000101120 | 5689 | E982 | 0003 | 46FF | C480 | E25E | 8B26 | 0847 |
| 0000101140 | 4603 | 3BC4 | 8046 | 0377 | 12E9 | C400 | 805E | 8A26 |
| 0000101160 | C407 | 845E | 46FF | 2684 | 0788 | D9E9 | E9FF | 003D |
| 0000101200 | 5EC4 | 2688 | 3F80 | 745C | E903 | 0022 | 5EC4 | 2688 |
| 0000101220 | 7F80 | 2601 | 0374 | 15E9 | FF00 | 8846 | 5EC4 | 2688 |
| 0000101240 | 078A | 5EC4 | FF84 | 8446 | 8826 | E907 | 000F | 5EC4 |
| 0000101260 | 2688 | 078A | 5EC4 | FF84 | 8446 | 8826 | E907 | FF5A |
| 0000101300 | 468B | 2B84 | 8E46 | 4689 | C4E6 | E25E | 8B26 | 0847 |
| 0000101320 | 8B26 | 0A57 | 4603 | 89C4 | 8846 | 5689 | E98A | 0003 |
| 0000101340 | 46FF | C488 | E25E | 8B26 | 0847 | 5EC4 | 26E2 | 4703 |
| 0000101360 | 3B0C | 8846 | 0377 | 12E9 | C400 | 885E | 8A26 | C407 |
| 0000101400 | 845E | 46FF | 2684 | 0788 | D5E9 | C4FF | 845E | C626 |
| 0000101420 | 0007 | 76FF | FFF8 | F676 | 1E9A | 3DF9 | 8380 | 04C4 |
| 0000101440 | 8689 | FF7E | 76FF | FFF8 | F676 | 429A | CAAA | 837B |
| 0000101460 | 04C4 | 068E | 7A1A | 8326 | 463E | 007E | 0375 | 56E9 |
| 0000101500 | 8300 | 967E | 75FE | E903 | 004D | E49A | 98F7 | 527C |
| 0000101520 | FF50 | 7EB6 | FFFF | F876 | 76FF | 1EF6 | A468 | 8D0C |
| 0000101540 | A246 | 5016 | 468D | 16DE | 8D50 | 9246 | 5016 | 681E |
| 0000101560 | 0CBC | 6568 | FF01 | 0836 | FF0C | 0636 | FF0C | 0C36 |
| 0000101600 | FF0C | 0A36 | 1E0C | B268 | 680C | 7EA2 | A568 | 9A7E |
| 0000101620 | 7EA8 | 0000 | C483 | 8B30 | 8E46 | 568B | C490 | E25E |
| 0000101640 | 8926 | 0847 | 8926 | 0A57 | 468B | 8B8E | 9056 | 4689 |
| 0000101660 | 89F6 | F856 | 5EC4 | 26E2 | 7789 | 830C | F07E | 7500 |
| 0000101700 | E903 | 000F | 5EC4 | 8BE2 | E646 | 3926 | 0C47 | 037E |
| 0000101720 | 88E9 | C4FC | E85E | F626 | 1447 | 7502 | E903 | 001B |
| 0000101740 | 468B | 8BE8 | EA56 | 068E | 7A32 | A326 | 0AA0 | 8926 |
| 0000101760 | A216 | 9A0A | 29E7 | 812A | 00E9 | 8300 | DC7E | 7F00 |
| 0000102000 | E903 | 0043 | 068E | 7A4C | 8326 | C23E | 000A | 0374 |
| 0000102020 | 2CE9 | 8E00 | 5006 | 267A | 1EC4 | 0C76 | C426 | 261F |
| 0000102040 | 77FF | 8E0C | 5006 | 267A | 1EC4 | 0C76 | C426 | 261F |
| 0000102060 | 77FF | 260A | 77FF | 9A08 | 11C1 | 817E | C483 | C406 |
| 0000102100 | E25E | 8026 | 1467 | 8EF7 | 4C06 | 267A | 06C7 | 0AC2 |
| 0000102120 | FFFF | 068E | 7A1A | 8326 | 293E | 0080 | 0375 | 09E9 |
| 0000102140 | 8300 | 967E | 74FE | E903 | 000F | 068E | 7A1C | 8326 |
| 0000102160 | 573E | 0078 | 0375 | 6EE9 | 8D00 | DC5E | CD9A | 7999 |
| 0000102200 | 8381 | 08EC | DC8B | 299A | DD9B | 9A81 | 6DB2 | 81EC |
| 0000102220 | C483 | 8908 | 9846 | 5689 | FF9A | A076 | 76FF | 8D9E |
| 0000102240 | 9846 | 5016 | 76FF | FFAE | FC76 | 76FF | 8DFA | A24E |
| 0000102260 | 5116 | 4E8D | 16DE | 8D51 | 924E | 5116 | 681E | 0CBC |

THU MAR 14 17:52:34 1991 TSLINT.DLL PAGE 37, LINE 2125

| | | | | | | | | |
|---|---|---|---|---|---|---|---|---|
| 0000102300 | 7268 | FF01 | 0836 | FF0C | 0636 | FF0C | 0C36 | FF0C |
| 0000102320 | 0A36 | 9A0C | 7440 | 0000 | C483 | 8B28 | 9846 | 568B |
| 0000102340 | E99A | 0020 | 1DE9 | 8D00 | DC5E | CD9A | E799 | 8381 |
| 0000102360 | 08EC | DC8B | 299A | 019B | 9A79 | 6DB2 | 801D | C483 |
| 0000102400 | E908 | 0000 | 5F5E | ED83 | 8B02 | 1FE5 | 4D5D | 00CB |
| 0000102420 | 581E | 4590 | 8B55 | 1EEC | D88E | EC81 | 0024 | 5657 |
| 0000102440 | 46C7 | F7FA | 8C0E | FC5E | 46C7 | 00F4 | 2B00 | 89C0 |
| 0000102460 | E646 | 4689 | 8EE4 | 5206 | 267A | 3E83 | 8149 | 7500 |
| 0000102500 | E903 | 001D | 36FF | 0F06 | 36FF | 0F04 | 468D | 16DC |
| 0000102520 | 9A50 | 7841 | 0000 | C483 | 3D08 | 0000 | 0374 | 0FE9 |
| 0000102540 | 8E00 | 5406 | 267A | 3E83 | 82CF | 7500 | E903 | 003A |
| 0000102560 | 681E | 0EFB | 468D | 16E8 | 8D50 | DC46 | 5016 | 468D |
| 0000102600 | 16F6 | 6A50 | 1E64 | 5068 | FF10 | 0236 | FF0F | 0036 |
| 0000102620 | FF0F | 0636 | FF0F | 0436 | 9A0F | 788A | 0000 | C483 |
| 0000102640 | 891E | F646 | 5689 | E9F8 | 0008 | C02B | 4689 | 89F8 |
| 0000102660 | F646 | 76FF | FF08 | 0676 | 389A | CE83 | 8367 | 04C4 |
| 0000102700 | 068E | 7A52 | 8326 | 2C3E | 0082 | 0375 | 09E9 | 8300 |
| 0000102720 | E07E | 74FE | E903 | 000F | 068E | 7A54 | 8326 | 613E |
| 0000102740 | 0081 | 0375 | 38E9 | 8D00 | E846 | 5016 | 468D | 16F6 |
| 0000102760 | 8D50 | DC46 | 5016 | 681E | 1050 | 666A | 36FF | 0F02 |
| 0000103000 | 36FF | 0F00 | 36FF | 0F06 | 36FF | 0F04 | FF9A | 00FF |
| 0000103020 | 8300 | 1AC4 | 46C7 | 00E2 | E900 | 0006 | 03E9 | E900 |
| 0000103040 | 0000 | 5F5E | ED83 | 8B02 | 1FE5 | 4D5D | 1ECB | 9058 |
| 0000103060 | 5545 | EC8B | 8E1E | 81D8 | 00EC | 5700 | 5E56 | 835F |
| 0000103100 | 02ED | E58B | 5D1F | CB4D | 581E | 4590 | 8B55 | 1EEC |
| 0000103120 | D88E | EC81 | 0028 | 5657 | 46C7 | 56FA | 8C10 | FC5E |
| 0000103140 | 46C7 | 00F4 | 2B00 | 89C0 | E646 | 4689 | 8EE4 | 5206 |
| 0000103160 | 267A | 3E83 | 83ED | 7500 | E903 | 001D | 36FF | 0F06 |
| 0000103200 | 36FF | 0F04 | 468D | 16DC | 9A50 | 8242 | 0000 | C483 |
| 0000103220 | 3D08 | 0000 | 0374 | 0FE9 | 8E00 | 5406 | 267A | 3E83 |
| 0000103240 | 8459 | 7500 | E903 | 003B | 681E | 105A | 468D | 16E8 |
| 0000103260 | 8D50 | DC46 | 5016 | 468D | 16F6 | 6850 | 0080 | 681E |
| 0000103300 | 11B2 | 36FF | 0F02 | 36FF | 0F00 | 36FF | 0F06 | 36FF |
| 0000103320 | 0F04 | 8A9A | 0082 | 8300 | 1EC4 | 4689 | 89F6 | F856 |
| 0000103340 | 08E9 | 2B00 | 89C0 | F846 | 4689 | 8BF6 | 0846 | 460B |
| 0000103360 | 7406 | E903 | 00B7 | 068E | 7A52 | 8326 | 413E | 0084 |
| 0000103400 | 0375 | 45E9 | 8300 | E07E | 75FE | E903 | 003C | 681E |
| 0000103420 | 105E | 468D | 16E8 | 8D50 | F646 | 5016 | 468D | 16DC |
| 0000103440 | 1E50 | B268 | 6811 | 0083 | 36FF | 0F02 | 36FF | 0F00 |
| 0000103460 | 36FF | 0F06 | 36FF | 0F04 | 681E | 1064 | 0B68 | 6885 |
| 0000103500 | 850E | 119A | 0085 | 8300 | 26C4 | 068E | 7A52 | 8326 |
| 0000103520 | BE3E | 0084 | 0375 | 09E9 | 8300 | E07E | 74FE | E903 |
| 0000103540 | 000F | 068E | 7A54 | 8326 | 373E | 0085 | 0375 | 39E9 |
| 0000103560 | 8D00 | E846 | 5016 | 468D | 16F6 | 8D50 | DC46 | 5016 |
| 0000103600 | 681E | 11B2 | 8468 | FF00 | 0236 | FF0F | 0036 | FF0F |
| 0000103620 | 0636 | FF0F | 0436 | 9A0F | 8566 | 0000 | C483 | C71A |
| 0000103640 | E246 | 0000 | D8E9 | E90A | 0003 | D2E9 | C40A | 065E |
| 0000103660 | 8326 | 127F | 7D00 | E903 | 000D | 5EC4 | 2606 | 7F83 |
| 0000103700 | 5112 | 037F | C4E9 | 8E00 | 5206 | 267A | 3E83 | 851F |
| 0000103720 | 7500 | E903 | 0052 | 7E83 | FEE0 | 0375 | 49E9 | C400 |
| 0000103740 | 065E | FF26 | 1277 | 76FF | FF08 | 0676 | 681E | 106B |
| 0000103760 | 468D | 16E8 | 8D50 | F646 | 5016 | 468D | 16DC | 1E50 |
| 0000104000 | B268 | 6811 | 0087 | 36FF | 0F02 | 36FF | 0F00 | 36FF |
| 0000104020 | 0F06 | 36FF | 0F04 | 681E | 107B | CE68 | 6885 | 85D1 |
| 0000104040 | D49A | 0085 | 8300 | 2CC4 | 068E | 7A52 | 8326 | 823E |
| 0000104060 | 0085 | 0375 | 09E9 | 8300 | E07E | 74FE | E903 | 000F |
| 0000104100 | 068E | 7A54 | 8326 | 583E | 0082 | 0375 | 39E9 | 8D00 |
| 0000104120 | E846 | 5016 | 468D | 16F6 | 8D50 | DC46 | 5016 | 681E |
| 0000104140 | 11B2 | 8868 | FF00 | 0236 | FF0F | 0036 | FF0F | 0636 |

THU MAR 14 17:52:34 1991 TSLINT.DLL PAGE 38, LINE 2184

| | | | | | | | | |
|---|---|---|---|---|---|---|---|---|
| 0000104160 | FF0F | 0436 | 9A0F | 82FD | 0000 | C483 | C71A | E246 |
| 0000104200 | 0000 | FAE9 | E909 | 0003 | F4E9 | 8E09 | 5206 | 267A |
| 0000104220 | 3E83 | 85EC | 7500 | E903 | 0051 | 7E83 | FEE0 | 0375 |
| 0000104240 | 48E9 | 1E00 | 8268 | FF10 | 0A36 | FF0F | 0A36 | 1E0F |
| 0000104260 | 8368 | 8D10 | E846 | 5016 | 468D | 16F6 | 8D50 | DC46 |
| 0000104300 | 5016 | 681E | 11B2 | 8A68 | FF00 | 0236 | FF0F | 0036 |
| 0000104320 | FF0F | 0636 | FF0F | 0436 | 1E0F | 8B68 | 6810 | 8632 |
| 0000104340 | 3568 | 9A86 | 8638 | 0000 | C483 | C42E | 065E | 8B26 |
| 0000104360 | 1247 | 15E9 | 8E05 | 5206 | 267A | 3E83 | 8653 | 7500 |
| 0000104400 | E903 | 004B | 7E83 | FEE0 | 0375 | 42E9 | FF00 | 0876 |
| 0000104420 | 76FF | 1E06 | 9268 | 8D10 | E846 | 5016 | 468D | 16F6 |
| 0000104440 | 8D50 | DC46 | 5016 | 681E | 11B2 | 8F68 | FF00 | 0236 |
| 0000104460 | FF0F | 0036 | FF0F | 0636 | FF0F | 0436 | 1E0F | 9D68 |
| 0000104500 | 6810 | 86A5 | A868 | 9A86 | 86AB | 0000 | C483 | C42A |
| 0000104520 | 065E | F626 | 1447 | 7510 | E903 | 0066 | 068E | 7A52 |
| 0000104540 | 8326 | C63E | 0086 | 0375 | 57E9 | 8300 | E07E | 75FE |
| 0000104560 | E903 | 004E | 5EC4 | 2606 | 77FF | 260A | 77FF | C408 |
| 0000104600 | 065E | FF26 | 0C77 | 681E | 10A4 | 468D | 16E8 | 8D50 |
| 0000104620 | F646 | 5016 | 468D | 16DC | 1E50 | B268 | 6811 | 0092 |
| 0000104640 | 36FF | 0F02 | 36FF | 0F00 | 36FF | 0F06 | 36FF | 0F04 |
| 0000104660 | 681E | 10B1 | 7A68 | 6880 | 807D | 809A | 0080 | 8300 |
| 0000104700 | 2CC4 | 5EC4 | 2606 | 47F6 | 0814 | 0375 | 66E9 | 8E00 |
| 0000104720 | 5206 | 267A | 3E83 | 82B7 | 7500 | E903 | 0057 | 7E83 |
| 0000104740 | FEE0 | 0375 | 4EE9 | C400 | 065E | FF26 | 0677 | FF26 |
| 0000104760 | 0477 | FF26 | 0277 | FF26 | 1E37 | B868 | 8D10 | E846 |
| 0000105000 | 5016 | 468D | 16F6 | 8D50 | DC46 | 5016 | 681E | 11B2 |
| 0000105020 | 9468 | FF00 | 0236 | FF0F | 0036 | FF0F | 0636 | FF0F |
| 0000105040 | 0436 | 1E0F | C068 | 6810 | 876C | 6F68 | 9A87 | 8772 |
| 0000105060 | 0000 | C483 | 8E2E | 5206 | 267A | 3E83 | 8780 | 7500 |
| 0000105100 | E903 | 0045 | 7E83 | FEE0 | 0375 | 3CE9 | 1E00 | C768 |
| 0000105120 | 8D10 | E846 | 5016 | 468D | 16F6 | 8D50 | DC46 | 5016 |
| 0000105140 | 681E | 11B2 | 9568 | FF00 | 0236 | FF0F | 0036 | FF0F |
| 0000105160 | 0636 | FF0F | 0436 | 1E0F | CA68 | 6810 | 842D | 3068 |
| 0000105200 | 9A84 | 8433 | 0000 | C483 | 8E26 | 5206 | 267A | 3E83 |
| 0000105220 | 8364 | 7500 | E903 | 0009 | 7E83 | FEE0 | 0374 | 0FE9 |
| 0000105240 | 8E00 | 5406 | 267A | 3E83 | 8390 | 7500 | E903 | 0039 |
| 0000105260 | 468D | 16E8 | 8D50 | F646 | 5016 | 468D | 16DC | 1E50 |
| 0000105300 | B268 | 6811 | 0096 | 36FF | 0F02 | 36FF | 0F00 | 36FF |
| 0000105320 | 0F06 | 36FF | 0F04 | 889A | 0084 | 8300 | 1AC4 | 46C7 |
| 0000105340 | 00E2 | E900 | 0799 | 03E9 | E900 | 0793 | 068E | 7A52 |
| 0000105360 | 8326 | 733E | 0088 | 0375 | 4BE9 | 8300 | E07E | 75FE |
| 0000105400 | E903 | 0042 | 76FF | FF08 | 0676 | 681E | 10D1 | 468D |
| 0000105420 | 16E8 | 8D50 | F646 | 5016 | 468D | 16DC | 1E50 | B268 |
| 0000105440 | 6811 | 009C | 36FF | 0F02 | 36FF | 0F00 | 36FF | 0F06 |
| 0000105460 | 36FF | 0F04 | 681E | 10DD | B368 | 6888 | 88B6 | B99A |
| 0000105500 | 0088 | 8300 | 2AC4 | 76FF | FF08 | 0676 | 129A | 565D |
| 0000105520 | 8388 | 04C4 | 4689 | 89D8 | DA56 | 14E9 | FF00 | DA76 |
| 0000105540 | 76FF | 9AD8 | 5FC9 | 893B | C483 | 8904 | D846 | 5689 |
| 0000105560 | 8BDA | DA46 | 4608 | 75D8 | E903 | 013E | 068E | 7A52 |
| 0000105600 | 8326 | DA3E | 0088 | 0375 | 45E9 | 8300 | E07E | 75FE |
| 0000105620 | E903 | 003C | 681E | 10E4 | 468D | 16E8 | 8D50 | F646 |
| 0000105640 | 5016 | 468D | 16DC | 1E50 | B268 | 6811 | 009E | 36FF |
| 0000105660 | 0F02 | 36FF | 0F00 | 36FF | 0F06 | 36FF | 0F04 | 681E |
| 0000105700 | 10ED | 1A68 | 6889 | 891D | 209A | 0089 | 8300 | 26C4 |
| 0000105720 | 5EC4 | 26D8 | 77FF | 260C | 77FF | 9A0A | 8338 | 894E |
| 0000105740 | C483 | 8E04 | 5206 | 267A | 3E83 | 895A | 7500 | E903 |
| 0000105760 | 0045 | 7E83 | FEE0 | 0375 | 3CE9 | 1E00 | F468 | 8D10 |
| 0000106000 | E846 | 5016 | 468D | 16F6 | 8D50 | DC46 | 5016 | 681E |
| 0000106020 | 11B2 | A068 | FF00 | 0236 | FF0F | 0036 | FF0F | 0636 |

THU MAR 14 17:52:34 1991 TSLINT.DLL PAGE 39, LINE 2243

| | | | | | | | | |
|---|---|---|---|---|---|---|---|---|
| 0000106040 | FF0F | 0436 | 1E0F | FD68 | 6810 | 899A | 9D68 | 9A89 |
| 0000106060 | 89A0 | 0000 | C483 | C426 | D85E | FF26 | 0C77 | FF26 |
| 0000106100 | 0A77 | 76FF | FF08 | 0676 | F29A | E657 | 8380 | 08C4 |
| 0000106120 | C28E | D88B | FF26 | 0277 | FF26 | 9A37 | 8338 | 82AB |
| 0000106140 | C483 | 8E04 | 5206 | 267A | 3E83 | 89B1 | 7500 | E903 |
| 0000106160 | 0045 | 7E83 | FEE0 | 0375 | 3CE9 | 1E00 | 0468 | 8D11 |
| 0000106200 | E846 | 5016 | 468D | 16F6 | 8D50 | DC46 | 5016 | 681E |
| 0000106220 | 11B2 | A268 | FF00 | 0236 | FF0F | 0036 | FF0F | 0636 |
| 0000106240 | FF0F | 0436 | 1E0F | 0668 | 6811 | 8718 | 1B68 | 9A87 |
| 0000106260 | 871E | 0000 | C483 | E926 | FEA3 | 068E | 7A52 | 8326 |
| 0000106300 | 2C3E | 0087 | 0375 | 09E9 | 8300 | E07E | 74FE | E903 |
| 0000106320 | 000F | 068E | 7A54 | 8326 | 983E | 0087 | 0375 | 39E9 |
| 0000106340 | 8D00 | E846 | 5016 | 468D | 16F6 | 8D50 | DC46 | 5016 |
| 0000106360 | 681E | 11B2 | A468 | FF00 | 0236 | FF0F | 0036 | FF0F |
| 0000106400 | 0636 | FF0F | 0436 | 9A0F | 87C7 | 0000 | C483 | C71A |
| 0000106420 | E246 | 0000 | 68E9 | E905 | 0003 | 62E9 | 8E05 | 5206 |
| 0000106440 | 267A | 3E83 | 8A9B | 7500 | E903 | 0055 | 7E83 | FEE0 |
| 0000106460 | 0375 | 4CE9 | C400 | 065E | FF26 | 0277 | FF26 | FF37 |
| 0000106500 | 0876 | 76FF | 1E06 | 0D68 | 8D11 | E846 | 5016 | 468D |
| 0000106520 | 16F6 | 8D50 | DC46 | 5016 | 681E | 11B2 | A868 | FF00 |
| 0000106540 | 0236 | FF0F | 0036 | FF0F | 0636 | FF0F | 0436 | 1E0F |
| 0000106560 | 2568 | 6811 | 8B75 | 7868 | 9A8B | 8B7B | 0000 | C483 |
| 0000106600 | C42E | 065E | 8B26 | 0647 | 0B26 | 0447 | 0375 | 13E9 |
| 0000106620 | C400 | 065E | FF26 | 0677 | FF26 | 0477 | 389A | D883 |
| 0000106640 | 838C | 04C4 | 068E | 7A52 | 8326 | 2B3E | 008B | 0375 |
| 0000106660 | 09E9 | 8300 | E07E | 74FE | E903 | 000F | 068E | 7A54 |
| 0000106700 | 8326 | C93E | 0089 | 0375 | 39E9 | 8D00 | E846 | 5016 |
| 0000106720 | 468D | 16F6 | 8D50 | DC46 | 5016 | 681E | 11B2 | AB68 |
| 0000106740 | FF00 | 0236 | FF0F | 0036 | FF0F | 0636 | FF0F | 0436 |
| 0000106760 | 9A0F | 89F8 | 0000 | C483 | C71A | E246 | 0000 | 7EE9 |
| 0000107000 | E904 | 0003 | 78E9 | E904 | 001B | 282D | 7500 | E903 |
| 0000107020 | FF0B | 162D | 7500 | E903 | FCD2 | 102D | 7500 | E903 |
| 0000107040 | FAD3 | 00E9 | C400 | 065E | 8B26 | 0247 | 0B26 | 7507 |
| 0000107060 | E903 | 005E | 068E | 7A52 | 8326 | 893E | 008B | 0375 |
| 0000107100 | 4FE9 | 8300 | E07E | 75FE | E903 | 0046 | 5EC4 | 2606 |
| 0000107120 | 77FF | 2602 | 37FF | 681E | 112C | 468D | 16E8 | 8D50 |
| 0000107140 | F646 | 5016 | 468D | 16DC | 1E5D | B268 | 6811 | 00AF |
| 0000107160 | 36FF | 0F02 | 36FF | 0F00 | 36FF | 0F06 | 36FF | 0F04 |
| 0000107200 | 681E | 1139 | E868 | 688B | 8BEB | EE9A | 008B | 8300 |
| 0000107220 | 2AC4 | 068E | 7A52 | 8326 | 0C3E | 008C | 0375 | 64E9 |
| 0000107240 | 8300 | E07E | 75FE | E903 | 005B | 5EC4 | 2606 | 77FF |
| 0000107260 | C412 | 065E | 8B26 | 125F | E3C1 | FF02 | 0EB7 | FF0F |
| 0000107300 | 0CB7 | FF0F | 0876 | 76FF | 1E06 | 4068 | 8D11 | E846 |
| 0000107320 | 5016 | 468D | 16F6 | 8D50 | DC46 | 5016 | 681E | 11B2 |
| 0000107340 | B268 | FF00 | 0236 | FF0F | 0036 | FF0F | 0636 | FF0F |
| 0000107360 | 0436 | 1E0F | 4B68 | 6811 | 8C57 | 5A68 | 9A8C | 8C5D |
| 0000107400 | 0000 | C483 | C430 | 065E | 8B26 | 0647 | 0B26 | 0447 |
| 0000107420 | 0375 | 5FE9 | 8E00 | 5206 | 267A | 3E83 | 8C6B | 7500 |
| 0000107440 | E903 | 0050 | 7E83 | FEE0 | 0375 | 47E9 | C400 | 065E |
| 0000107460 | FF26 | 0677 | FF26 | 0477 | 681E | 1152 | 468D | 16E8 |
| 0000107500 | 8D50 | F646 | 5016 | 468D | 16DC | 1E50 | B268 | 6811 |
| 0000107520 | 00B5 | 36FF | 0F02 | 36FF | 0F00 | 36FF | 0F06 | 36FF |
| 0000107540 | 0F04 | 681E | 1160 | AB68 | 688C | 8CAE | B19A | 008C |
| 0000107560 | 8300 | 2AC4 | 068E | 7A52 | 8326 | F13E | 008C | 0375 |
| 0000107600 | 45E9 | 8300 | E07E | 75FE | E903 | 003C | 681E | 1167 |
| 0000107620 | 468D | 16E8 | 8D50 | F646 | 5016 | 468D | 16DC | 1E50 |
| 0000107640 | B268 | 6811 | 00B6 | 36FF | 0F02 | 36FF | 0F00 | 36FF |
| 0000107660 | 0F06 | 36FF | 0F04 | 681E | 1169 | 3C68 | 688D | 8D3F |
| 0000107700 | 429A | 008D | 8300 | 26C4 | 06FF | 0F0A | 5EC4 | 2606 |

THU MAR 14 17:52:34 1991 TSLINT.DLL PAGE 40, LINE 2302

| | | | | | | | | |
|---|---|---|---|---|---|---|---|---|
| 0000107720 | 478B | 2602 | 070B | 0375 | 12E9 | C400 | 065E | FF26 |
| 0000107740 | 0277 | FF26 | 9A37 | 8338 | 88CE | C483 | C404 | 065E |
| 0000107760 | 8B26 | 1247 | EFE9 | E901 | 021E | 068E | 7A52 | 8326 |
| 0000110000 | E33E | 0087 | 0375 | 50E9 | 8300 | E07E | 75FE | E903 |
| 0000110020 | 0047 | 5EC4 | 2606 | 77FF | 2606 | 77FF | 1E04 | 7068 |
| 0000110040 | 8D11 | E846 | 5016 | 468D | 16F6 | 8D50 | DC46 | 5016 |
| 0000110060 | 681E | 11B2 | C068 | FF00 | 0236 | FF0F | 0036 | FF0F |
| 0000110100 | 0636 | FF0F | 0436 | 1E0F | 7D68 | 6811 | 8829 | 2C68 |
| 0000110120 | 9A88 | 882F | 0000 | C483 | E92A | 01BC | 068E | 7A52 |
| 0000110140 | 8326 | D33E | 008D | 0375 | 57E9 | 8300 | E07E | 75FE |
| 0000110160 | E903 | 004E | 5EC4 | 2606 | 5F8B | C112 | 02E3 | B7FF |
| 0000110200 | 0F0E | B7FF | 0F0C | 681E | 1184 | 468D | 16E8 | 8D50 |
| 0000110220 | F646 | 5016 | 468D | 16DC | 1E50 | B268 | 6811 | 00C4 |
| 0000110240 | 36FF | 0F02 | 36FF | 0F00 | 36FF | 0F06 | 36FF | 0F04 |
| 0000110260 | 681E | 118B | 1368 | 688E | 8E16 | 199A | 008E | 8300 |
| 0000110300 | 2AC4 | 5EC4 | 2606 | 5FC4 | 2604 | 5FC4 | 2604 | 77FF |
| 0000110320 | 2602 | 37FF | 389A | 3683 | 838E | 04C4 | 068E | 7A52 |
| 0000110340 | 8326 | 423E | 008E | 0375 | 45E9 | 8300 | E07E | 75FE |
| 0000110360 | E903 | 003C | 681E | 1192 | 468D | 16E8 | 8D50 | F646 |
| 0000110400 | 5016 | 468D | 16DC | 1E50 | B268 | 6811 | 00C6 | 36FF |
| 0000110420 | 0F02 | 36FF | 0F00 | 36FF | 0F06 | 36FF | 0F04 | 681E |
| 0000110440 | 119C | 8268 | 688E | 8E85 | 889A | 008E | 8300 | 26C4 |
| 0000110460 | 5EC4 | 2606 | 5FC4 | 2604 | 5FC4 | 2604 | 77FF | 2606 |
| 0000110500 | 77FF | 9A04 | 8338 | 8EA5 | C483 | 8E04 | 5206 | 267A |
| 0000110520 | 3E83 | 8F13 | 7500 | E903 | 0045 | 7E83 | FEE0 | 0375 |
| 0000110540 | 3CE9 | 1E00 | A368 | 8D11 | E846 | 5016 | 468D | 16F6 |
| 0000110560 | 8D50 | DC46 | 5016 | 681E | 11B2 | C868 | FF00 | 0236 |
| 0000110600 | FF0F | 0036 | FF0F | 0636 | FF0F | 0436 | 1E0F | AB68 |
| 0000110620 | 6811 | 8A64 | 6768 | 9A8A | 8A6A | 0000 | C483 | C426 |
| 0000110640 | 065E | C426 | 045F | C426 | 045F | FF26 | 0A77 | FF26 |
| 0000110660 | 0877 | 389A | CB83 | 838E | 04C4 | 5BE9 | C400 | 065E |
| 0000110700 | 8B26 | 0647 | 0B26 | 0447 | 0375 | 13E9 | C400 | 065E |
| 0000110720 | FF26 | 0677 | FF26 | 0477 | 389A | 8F83 | 838A | 04C4 |
| 0000110740 | 35E9 | E900 | 0032 | 2E3D | 7E00 | E903 | 0019 | 2D3D |
| 0000110760 | 7C00 | E903 | FE66 | 1E2D | 7D00 | E903 | FFBF | 7F48 |
| 0000111000 | E903 | FDF3 | B6E9 | 2DFF | 003F | 0375 | EBE9 | 48FD |
| 0000111020 | 0375 | E2E9 | E9FD | FFA5 | 0EFF | 0F0A | 068E | 7A52 |
| 0000111040 | 8326 | 143E | 008A | 0375 | 09E9 | 8300 | E07E | 74FE |
| 0000111060 | E903 | 000F | 068E | 7A54 | 8326 | B33E | 008A | 0375 |
| 0000111100 | 39E9 | 8D00 | E346 | 5016 | 468D | 16F6 | 8D50 | DC46 |
| 0000111120 | 5016 | 681E | 11B2 | D168 | FF00 | 0236 | FF0F | 0036 |
| 0000111140 | FF0F | 0636 | FF0F | D436 | 9A0F | 8AE2 | 0000 | C483 |
| 0000111160 | C71A | E246 | 0000 | 06E9 | E900 | 0003 | 00E9 | 5E00 |
| 0000111200 | 835F | 02ED | E58B | 5D1F | CB4D | 581E | 4590 | 8B55 |
| 0000111220 | 1EEC | D88E | EC81 | 0028 | 5657 | 46C7 | C3FA | 8C11 |
| 0000111240 | FC5E | 46C7 | 00F4 | 2B00 | 89C0 | E646 | 4689 | 8EE4 |
| 0000111260 | 5206 | 267A | 3E83 | 9024 | 7500 | E903 | 001D | 36FF |
| 0000111300 | 0F06 | 36FF | 0F04 | 468D | 16DC | 9A50 | 837A | 0000 |
| 0000111320 | C483 | 3D08 | 0000 | 0374 | 0FE9 | 8E00 | 5406 | 267A |
| 0000111340 | 3E83 | 8F2B | 7500 | E903 | 003B | 681E | 11C7 | 468D |
| 0000111360 | 16E8 | 8D50 | DC46 | 5016 | 468D | 16F6 | 6850 | 00DE |
| 0000111400 | 681E | 1220 | 36FF | 0F02 | 36FF | 0F00 | 36FF | 0F06 |
| 0000111420 | 36FF | 0F04 | C39A | 0083 | 8300 | 1EC4 | 4689 | 89F6 |
| 0000111440 | F856 | 08E9 | 2B00 | 89C0 | F846 | 4689 | 8EF6 | 5206 |
| 0000111460 | 267A | 3E83 | 9087 | 7500 | E903 | 0045 | 7E83 | FEE0 |
| 0000111500 | 0375 | 3CE9 | 1E00 | CB68 | 8D11 | E846 | 5016 | 468D |
| 0000111520 | 16F6 | 8D50 | DC46 | 5016 | 681E | 1220 | E668 | FF00 |
| 0000111540 | 0236 | FF0F | 0036 | FF0F | 0636 | FF0F | 0436 | 1E0F |
| 0000111560 | D268 | 6811 | 90C8 | CB68 | 9A90 | 90CE | 0000 | C483 |

THU MAR 14 17:52:34 1991 TSLINT.DLL PAGE 41, LINE 2361

| | | | | | | | | |
|---|---|---|---|---|---|---|---|---|
| 0000111600 | BE26 | 0000 | 01E9 | 4600 | FE83 | 7C65 | E903 | 0110 |
| 0000111620 | 068E | 7A52 | 8326 | 533E | 008D | 0375 | 46E9 | 8300 |
| 0000111640 | E07E | 75FE | E903 | 003D | 1E56 | DA68 | 8D11 | E846 |
| 0000111660 | 5016 | 468D | 16F6 | 8D50 | DC46 | 5016 | 681E | 1220 |
| 0000111700 | E868 | FF00 | 0236 | FF0F | 0036 | FF0F | 0636 | FF0F |
| 0000111720 | 0436 | 1E0F | EC68 | 6811 | 8DA5 | A868 | 9A8D | 8DAB |
| 0000111740 | 0000 | C483 | BF28 | 0000 | 068E | 7A56 | DE8B | E3C1 |
| 0000111760 | 2602 | 878B | 0AC4 | 8B26 | C697 | 890A | D846 | 5689 |
| 0000112000 | E9DA | 0010 | 5EC4 | 26D8 | 078B | 8B26 | 0257 | 4689 |
| 0000112020 | 89D8 | DA56 | 468B | 0BDA | D846 | 0375 | 7EE9 | 4700 |
| 0000112040 | 068E | 7A52 | 8326 | 973E | 0091 | 0375 | 58E9 | 8300 |
| 0000112060 | E07E | 75FE | E903 | 004F | 5EC4 | 26D8 | 77FF | C408 |
| 0000112100 | D85E | FF26 | 0677 | FF26 | 0477 | 1E57 | F468 | 8D11 |
| 0000112120 | E846 | 5016 | 468D | 16F6 | 8D50 | DC46 | 5016 | 681E |
| 0000112140 | 1220 | ED68 | FF00 | 0236 | FF0F | 0036 | FF0F | 0636 |
| 0000112160 | FF0F | 0436 | 1E0F | 0A68 | 6812 | 91D7 | DA68 | 9A91 |
| 0000112200 | 91DD | 0000 | C483 | C42E | D85E | FF26 | 0C77 | FF26 |
| 0000112220 | 0A77 | 389A | C783 | 838D | 04C4 | 67E9 | E9FF | FEE7 |
| 0000112240 | 068E | 7A52 | 8326 | EB3E | 0091 | 0375 | 45E9 | 8300 |
| 0000112260 | E07E | 75FE | E903 | 003C | 681E | 1212 | 468D | 16E8 |
| 0000112300 | 8D50 | F646 | 5016 | 468D | 16DC | 1E50 | 2068 | 6812 |
| 0000112320 | 00F1 | 36FF | 0F02 | 36FF | 0F00 | 36FF | 0F06 | 36FF |
| 0000112340 | 0F04 | 681E | 1217 | 6468 | 6890 | 9067 | 6A9A | 0090 |
| 0000112360 | 8300 | 26C4 | 068E | 7A52 | 8326 | A63E | 008F | 0375 |
| 0000112400 | 09E9 | 8300 | E07E | 74FE | E903 | 000F | 068E | 7A54 |
| 0000112420 | 8326 | D23E | 008F | 0375 | 39E9 | 8D00 | E846 | 5016 |
| 0000112440 | 468D | 16F6 | 8D50 | DC46 | 5016 | 681E | 1220 | F268 |
| 0000112460 | FF00 | 0236 | FF0F | 0036 | FF0F | 0636 | FF0F | 0436 |
| 0000112500 | 9A0F | 8F5A | 0000 | C483 | C71A | E246 | 0000 | 06E9 |
| 0000112520 | E900 | 0003 | 00E9 | 5E00 | 835F | 02ED | E58B | 5D1F |
| 0000112540 | CB4D | 581E | 4590 | 8B55 | 1EEC | D88E | EC81 | 0000 |
| 0000112560 | 5657 | 3E83 | 0F08 | 7500 | E903 | 0015 | 76FF | FF0A |
| 0000112600 | 0876 | 76FF | 1E06 | 2A68 | 9A12 | 3464 | 816F | C483 |
| 0000112620 | 5E0A | 835F | 02ED | E58B | 5D1F | CB4D | 581E | 4590 |
| 0000112640 | 8B55 | 1EEC | D88E | EC81 | 0036 | 5657 | 46C7 | 33FA |
| 0000112660 | 8C12 | FC5E | 46C7 | 00EC | 2B00 | 89C0 | D646 | 4689 |
| 0000112700 | 8ED4 | 5206 | 267A | 3E83 | 9341 | 7500 | E903 | 001D |
| 0000112720 | 36FF | 0F06 | 36FF | 0F04 | 468D | 16CC | 9A50 | 8FBC |
| 0000112740 | 0000 | C483 | 3D08 | 0000 | 0374 | 0FE9 | 8E00 | 5406 |
| 0000112760 | 267A | 3E83 | 9359 | 7500 | E903 | 003B | 681E | 1237 |
| 0000113000 | 468D | 16DC | 8D50 | CC46 | 5016 | 468D | 16F2 | 6850 |
| 0000113020 | 0113 | 681E | 14B0 | 36FF | 0F02 | 36FF | 0F00 | 36FF |
| 0000113040 | 0F06 | 36FF | 0F04 | 059A | 0090 | 8300 | 1EC4 | 4689 |
| 0000113060 | 89F2 | F456 | 08E9 | 2B00 | 89C0 | F446 | 4689 | 8BF2 |
| 0000113100 | 0846 | 460B | 7406 | E903 | 0063 | 068E | 7A52 | 8326 |
| 0000113120 | BB3E | 0093 | 0375 | 09E9 | 8300 | D07E | 74FE | E903 |
| 0000113140 | 000F | 068E | 7A54 | 8326 | A23E | 0094 | 0375 | 39E9 |
| 0000113160 | 8D00 | DC46 | 5016 | 468D | 16F2 | 8D50 | CC46 | 5016 |
| 0000113200 | 681E | 14B0 | 1B68 | FF01 | 0236 | FF0F | 0036 | FF0F |
| 0000113220 | 0636 | FF0F | 0436 | 9A0F | 94D1 | 0000 | C483 | C71A |
| 0000113240 | D246 | 0000 | C6E9 | E920 | 0003 | C0E9 | C420 | 065E |
| 0000113260 | 8B26 | 1247 | A6E9 | C41F | 065E | F626 | 1447 | 7508 |
| 0000113300 | E903 | 0069 | 068E | 7A52 | 8326 | 243E | 0094 | 0375 |
| 0000113320 | 57E9 | 8300 | D07E | 75FE | E903 | 004E | 5EC4 | 2606 |
| 0000113340 | 77FF | 2606 | 77FF | 2604 | 77FF | 2602 | 37FF | 681E |
| 0000113360 | 123B | 468D | 16DC | 8D50 | F246 | 5016 | 468D | 16CC |
| 0000113400 | 1E50 | B068 | 6814 | 011F | 36FF | 0F02 | 36FF | 0F00 |
| 0000113420 | 36FF | 0F06 | 36FF | 0F04 | 681E | 123E | 7668 | 6894 |
| 0000113440 | 9479 | 7C9A | 0094 | 8300 | 2EC4 | 66E9 | 8E00 | 5206 |

THU MAR 14 17:52:34 1991 TSLINT.DLL PAGE 42, LINE 2420

| | | | | | | | | |
|---|---|---|---|---|---|---|---|---|
| 0000113460 | 267A | 3E83 | 948A | 7500 | E903 | 0057 | 7E83 | FED0 |
| 0000113500 | 0375 | 4EE9 | C400 | 065E | FF26 | 0A77 | FF26 | 0877 |
| 0000113520 | 5EC4 | 2606 | 77FF | 1E0C | 4568 | 8D12 | DC46 | 5016 |
| 0000113540 | 468D | 16F2 | 8D50 | CC46 | 5016 | 681E | 14B0 | 2368 |
| 0000113560 | FF01 | 0236 | FF0F | 0036 | FF0F | 0636 | FF0F | 0436 |
| 0000113600 | 1E0F | 4C68 | 6812 | 916A | 6D68 | 9A91 | 9170 | 0000 |
| 0000113620 | C483 | 8E2C | 5206 | 267A | 3E83 | 9117 | 7500 | E903 |
| 0000113640 | 0009 | 7E83 | FED0 | 0374 | 0FE9 | 8E00 | 5406 | 267A |
| 0000113660 | 3E83 | 9203 | 7500 | E903 | 0039 | 468D | 16DC | 8D50 |
| 0000113700 | F246 | 5016 | 468D | 16CC | 1E50 | B068 | 6814 | 0124 |
| 0000113720 | 36FF | 0F02 | 36FF | 0F00 | 36FF | 0F06 | 36FF | 0F04 |
| 0000113740 | 329A | 00.2 | 8300 | 1AC4 | 46C7 | 00D2 | E900 | 1F7D |
| 0000113760 | 03E9 | E900 | 1F77 | 46C7 | 53EE | 8C12 | F05E | E7E9 |
| 0000114000 | C700 | EE46 | 1255 | 5E8C | E9F0 | 00DC | 46C7 | 57EE |
| 0000114020 | 8C12 | F05E | D1E9 | C700 | EE46 | 1259 | 5E8C | E9F0 |
| 0000114040 | 00C6 | 46C7 | 5BEE | 8C12 | F05E | BBE9 | C700 | EE46 |
| 0000114060 | 125D | 5E8C | E9F0 | 00B0 | 46C7 | 5FEE | 8C12 | F05E |
| 0000114100 | A5E9 | C700 | EE46 | 1261 | 5E8C | E9F0 | 009A | 46C7 |
| 0000114120 | 63EE | 8C12 | F05E | 8FE9 | C700 | EE46 | 1266 | 5E8C |
| 0000114140 | E9F0 | 0084 | 46C7 | 69EE | 8C12 | F05E | 79E9 | C700 |
| 0000114160 | EE46 | 126C | 5E8C | E9F0 | 006E | 46C7 | 6FEE | 8C12 |
| 0000114200 | F05E | 63E9 | C700 | EE46 | 1272 | 5E8C | E9F0 | 0058 |
| 0000114220 | 46C7 | 75EE | 8C12 | F05E | 4DE9 | C700 | EE46 | 1278 |
| 0000114240 | 5E8C | E9F0 | 0042 | 46C7 | 7BEE | 8C12 | F05E | 37E9 |
| 0000114260 | C700 | EE46 | 127E | 5E8C | E9F0 | 002C | 46C7 | 81EE |
| 0000114300 | 8C12 | F05E | 21E9 | C700 | EE46 | 1283 | 5E3C | E9F0 |
| 0000114320 | 0016 | 46C7 | 85EE | 8C12 | F05E | 0BE9 | C700 | EE46 |
| 0000114340 | 1288 | 5E8C | E9F0 | 0000 | 5EC4 | 2606 | 77FF | 2602 |
| 0000114360 | 37FF | 8C9A | 5292 | 8396 | 04C4 | 068E | 7A52 | 8326 |
| 0000114400 | 5E3E | 0096 | 0375 | 4BE9 | 8300 | D07E | 75FE | E903 |
| 0000114420 | 0042 | 76FF | FFF0 | EE76 | 681E | 128B | 468D | 16DC |
| 0000114440 | 8D50 | F246 | 5016 | 468D | 16CC | 1E50 | B068 | 6814 |
| 0000114460 | 016A | 36FF | 0F02 | 36FF | 0F00 | 36FF | 0F06 | 36FF |
| 0000114500 | 0F04 | 681E | 128E | 0D68 | 6894 | 9410 | 139A | 0094 |
| 0000114520 | 8300 | 2AC4 | 5EC4 | 2606 | 77FF | 2606 | 77FF | 9A04 |
| 0000114540 | 928C | 9185 | C483 | 8E04 | 5206 | 267A | 3E83 | 92B8 |
| 0000114560 | 7500 | E903 | 0009 | 7E83 | FED0 | 0374 | 0FE9 | 8E00 |
| 0000114600 | 5406 | 267A | 3E83 | 92E4 | 7500 | E903 | 0039 | 468D |
| 0000114620 | 16DC | 8D50 | F246 | 5016 | 468D | 16CC | 1E50 | B068 |
| 0000114640 | 6814 | 016C | 36FF | 0F02 | 36FF | 0F00 | 36FF | 0F06 |
| 0000114660 | 36FF | 0F04 | 889A | 0093 | 8300 | 1AC4 | 46C7 | 00D2 |
| 0000114700 | E900 | 1DA9 | 03E9 | E900 | 1DA3 | 46C7 | 95EE | 8C12 |
| 0000114720 | F05E | 46C7 | 97D8 | 8C12 | DA5E | 5FE9 | C700 | EE46 |
| 0000114740 | 1298 | 5E8C | C7F0 | D846 | 129B | 5E8C | E9DA | 004C |
| 0000114760 | 46C7 | 9DEE | 8C12 | F05E | 46C7 | 9ED8 | 8C12 | DA5E |
| 0000115000 | 39E9 | C700 | EE46 | 12A1 | 5E8C | C7F0 | D846 | 12A2 |
| 0000115020 | 5E8C | E9DA | 0026 | 46C7 | A5EE | 8C12 | F05E | 46C7 |
| 0000115040 | A8D8 | 8C12 | DA5E | 13E9 | C700 | EE46 | 12A9 | 5E8C |
| 0000115060 | C7F0 | D846 | 12AC | 5E8C | E9DA | 0000 | 068E | 7A52 |
| 0000115100 | 8326 | 9B3E | 0097 | 0375 | 47E9 | 8300 | D07E | 75FE |
| 0000115120 | E903 | 003E | 76FF | FFF0 | EE76 | 468D | 16DC | 8D50 |
| 0000115140 | F246 | 5016 | 468D | 16CC | 1E50 | B068 | 6814 | 0187 |
| 0000115160 | 36FF | 0F02 | 36FF | 0F00 | 36FF | 0F06 | 36FF | 0F04 |
| 0000115200 | 681E | 12AD | DD68 | 6897 | 97E0 | E39A | 0097 | 8300 |
| 0000115220 | 26C4 | 5EC4 | 26D6 | 77FF | 2602 | 37FF | 8C9A | 5A92 |
| 0000115240 | 8398 | 04C4 | 068E | 7A52 | 8326 | F13E | 0097 | 0375 |
| 0000115260 | 47E9 | 8300 | D07E | 75FE | E903 | 003E | 76FF | FFDA |
| 0000115300 | D876 | 468D | 16DC | 8D50 | F246 | 5016 | 468D | 16CC |
| 0000115320 | 1E50 | B068 | 6814 | 0189 | 36FF | 0F02 | 36FF | 0F00 |

THU MAR 14 17:52:34 1991 TSLINT.DLL PAGE 43, LINE 2479

| | | | | | | | | |
|---|---|---|---|---|---|---|---|---|
| 0000115340 | 36FF | 0F06 | 36FF | 0F04 | 681E | 12B4 | B668 | 6898 |
| 0000115360 | 98B9 | BC9A | 0098 | 8300 | 26C4 | 068E | 7A52 | 8326 |
| 0000115400 | 763E | 0098 | 0375 | 09E9 | 8300 | D07E | 74FE | E903 |
| 0000115420 | 000F | 068E | 7A54 | 8326 | F53E | 0098 | 0375 | 39E9 |
| 0000115440 | 8D00 | DC46 | 5016 | 468D | 16F2 | 8D50 | CC46 | 5016 |
| 0000115460 | 681E | 14B0 | 8A68 | FF01 | 0236 | FF0F | 0036 | FF0F |
| 0000115500 | 0636 | FF0F | 0436 | 9A0F | 9924 | 0000 | C483 | C71A |
| 0000115520 | D246 | 0000 | 16E9 | E91C | 0003 | 10E9 | C41C | 065E |
| 0000115540 | FF26 | 0277 | FF26 | 9A37 | 928C | 98D1 | C483 | C404 |
| 0000115560 | 065E | 8B26 | 0647 | 0B26 | 0447 | 0375 | 67E9 | 8E00 |
| 0000115600 | 5206 | 267A | 3E83 | 98DD | 7500 | E903 | 0045 | 7E83 |
| 0000115620 | FED0 | 0375 | 3CE9 | 1E00 | BB68 | 8D12 | DC46 | 5016 |
| 0000115640 | 468D | 16F2 | 8D50 | CC46 | 5016 | 681E | 14B0 | 8F68 |
| 0000115660 | FF01 | 0236 | FF0F | 0036 | FF0F | 0636 | FF0F | 0436 |
| 0000115700 | 1E0F | BD68 | 6812 | 99F9 | FC68 | 9A99 | 99FF | 0000 |
| 0000115720 | C483 | C426 | 065E | FF26 | 0677 | FF26 | 0477 | 8C9A |
| 0000115740 | 8492 | 839A | 04C4 | 068E | 7A52 | 8326 | A73E | 0099 |
| 0000115760 | 0375 | 09E9 | 8300 | D07E | 74FE | E903 | 000F | 068E |
| 0000116000 | 7A54 | 8326 | 333E | 009A | 0375 | 39E9 | 8D00 | DC46 |
| 0000116020 | 5016 | 468D | 16F2 | 8D50 | CC46 | 5016 | 681E | 14B0 |
| 0000116040 | 9268 | FF01 | 0236 | FF0F | 0036 | FF0F | 0636 | FF0F |
| 0000116060 | 0436 | 9A0F | 9A62 | 0000 | C483 | C71A | D246 | 0000 |
| 0000116100 | 2AE9 | E91B | 0003 | 24E9 | C71B | CA46 | 0000 | 03E9 |
| 0000116120 | FF00 | CA46 | 7E83 | 65CA | 037C | C7E9 | 8E00 | 5606 |
| 0000116140 | 8B7A | CA5E | E3C1 | 2602 | 878B | 0AC4 | 8B26 | C697 |
| 0000116160 | 890A | E846 | 5689 | E9EA | 0010 | 5EC4 | 26E8 | 078B |
| 0000116200 | 8B26 | 0257 | 4689 | 89E8 | EA56 | 468B | 0BEA | E846 |
| 0000116220 | 0375 | 8CE9 | 8B00 | 0646 | 568B | C408 | E85E | 3926 |
| 0000116240 | 0A47 | 0374 | 77E9 | 2600 | 5739 | 740C | E903 | 006E |
| 0000116260 | 068E | 7A52 | 8326 | 1B3E | 009A | 0375 | 57E9 | 8300 |
| 0000116300 | D07E | 75FE | E903 | 004E | 5EC4 | 26E8 | 77FF | 2606 |
| 0000116320 | 77FF | C404 | E85E | FF26 | 0877 | 681E | 12C4 | 468D |
| 0000116340 | 16DC | 8D50 | F246 | 5016 | 468D | 16CC | 1E50 | B068 |
| 0000116360 | 6814 | 0198 | 36FF | 0F02 | 36FF | 0F00 | 36FF | 0F06 |
| 0000116400 | 36FF | 0F04 | 681E | 12C9 | D068 | 689A | 9AD3 | D69A |
| 0000116420 | 009A | 8300 | 2CC4 | 46C7 | 65CA | E900 | 0003 | 59E9 |
| 0000116440 | E9FF | FF2D | 068E | 7A52 | 8326 | 903E | 009A | 0375 |
| 0000116460 | 09E9 | 8300 | D07E | 74FE | E903 | 000F | 068E | 7A54 |
| 0000116500 | 8326 | 763E | 0096 | 0375 | 39E9 | 8D00 | DC46 | 5016 |
| 0000116520 | 468D | 16F2 | 8D50 | CC46 | 5016 | 681E | 14B0 | 9E68 |
| 0000116540 | FF01 | 0236 | FF0F | 0036 | FF0F | 0636 | FF0F | 0436 |
| 0000116560 | 9A0F | 96A5 | 0000 | C483 | C71A | D246 | 0000 | ECE9 |
| 0000116600 | E919 | 0003 | E6E9 | C419 | 065E | FF26 | 0277 | FF26 |
| 0000116620 | 9A37 | 928C | 95E5 | C483 | 8E04 | 5206 | 267A | 3E83 |
| 0000116640 | 95F1 | 7500 | E903 | 0045 | 7E83 | FED0 | 0375 | 3CE9 |
| 0000116660 | 1E00 | D068 | 8D12 | DC46 | 5016 | 468D | 16F2 | 8D50 |
| 0000116700 | CC46 | 5016 | 681E | 14B0 | A168 | FF01 | 0236 | FF0F |
| 0000116720 | 0036 | FF0F | 0636 | FF0F | 0436 | 1E0F | D268 | 6812 |
| 0000116740 | 9637 | 3A68 | 9A96 | 963D | 0000 | C483 | C426 | 065E |
| 0000116760 | FF26 | 0677 | FF26 | 0477 | 8C9A | 0892 | 839C | 04C4 |
| 0000117000 | 068E | 7A52 | 8326 | 4B3E | 009B | 0375 | 45E9 | 8300 |
| 0000117020 | D07E | 75FE | E903 | 003C | 681E | 12D9 | 468D | 16DC |
| 0000117040 | 8D50 | F246 | 5016 | 468D | 16CC | 1E50 | B068 | 6814 |
| 0000117060 | 01A3 | 36FF | 0F02 | 36FF | 0F00 | 36FF | 0F06 | 36FF |
| 0000117100 | 0F04 | 681E | 12DB | EE68 | 689B | 9BF1 | F49A | 009B |
| 0000117120 | 8300 | 26C4 | 068E | 7A52 | 8326 | AE3E | 009B | 0375 |
| 0000117140 | 09E9 | 8300 | D07E | 74FE | E903 | 000F | 068E | 7A54 |
| 0000117160 | 8326 | 803E | 009C | 0375 | 39E9 | 8D00 | DC46 | 5016 |
| 0000117200 | 468D | 16F2 | 8D50 | CC46 | 5016 | 681E | 14B0 | A468 |

THU MAR 14 17:52:34 1991 TSLINT.DLL PAGE 44, LINE 2538

| | | | | | | | | |
|---|---|---|---|---|---|---|---|---|
| 0000117220 | FF01 | 0236 | FF0F | 0036 | FF0F | 0636 | FF0F | 0436 |
| 0000117240 | 9A0F | 9CAF | 0000 | C483 | C71A | D246 | 0000 | BCE9 |
| 0000117260 | E918 | 0003 | B6E9 | 8E18 | 5206 | 267A | 3E83 | 9C14 |
| 0000117300 | 7500 | E903 | 0045 | 7E83 | FED0 | 0375 | 3CE9 | 1E00 |
| 0000117320 | E268 | 8D12 | DC46 | 5016 | 468D | 16F2 | 8D50 | CC46 |
| 0000117340 | 5016 | 681E | 14B0 | A668 | FF01 | 0236 | FF0F | 0036 |
| 0000117360 | FF0F | 0636 | FF0F | 0436 | 1E0F | F068 | 6812 | 9C54 |
| 0000117400 | 5768 | 9A9C | 9C5A | 0000 | C483 | C426 | 065E | FF26 |
| 0000117420 | 0277 | FF26 | 9A37 | 928C | 9DA0 | C483 | 8E04 | 5206 |
| 0000117440 | 267A | 3E83 | 9C68 | 7500 | E903 | 0045 | 7E83 | FED0 |
| 0000117460 | 0375 | 3CE9 | 1E00 | F768 | 8D12 | DC46 | 5016 | 468D |
| 0000117500 | 16F2 | 8D50 | CC46 | 5016 | 681E | 14B0 | A868 | FF01 |
| 0000117520 | 0236 | FF0F | 0036 | FF0F | 0636 | FF0F | 0436 | 1E0F |
| 0000117540 | F968 | 6812 | 9D0B | 0E68 | 9A9D | 9D11 | 0000 | C483 |
| 0000117560 | 8E26 | 5206 | 267A | 3E83 | 9CCB | 7500 | E903 | 0009 |
| 0000117600 | 7E83 | FED0 | 0374 | 0FE9 | 8E00 | 5406 | 267A | 3E83 |
| 0000117620 | 9809 | 7500 | E903 | 0039 | 468D | 16DC | 8D50 | F246 |
| 0000117640 | 5016 | 468D | 16CC | 1E50 | B068 | 6814 | 01A9 | 36FF |
| 0000117660 | 0F02 | 36FF | 0F00 | 36FF | 0F06 | 36FF | 0F04 | 389A |
| 0000117700 | 0098 | 8300 | 1AC4 | 46C7 | 00D2 | E900 | 179F | 03E9 |
| 0000117720 | E900 | 1799 | 068E | 7A52 | 8326 | 383E | 009D | 0375 |
| 0000117740 | 45E9 | 8300 | D07E | 75FE | E903 | 003C | 681E | 1300 |
| 0000117760 | 468D | 16DC | 8D50 | F246 | 5016 | 468D | 16CC | 1E50 |
| 0000120000 | B068 | 6814 | 01AC | 36FF | 0F02 | 36FF | 0F00 | 36FF |
| 0000120020 | 0F06 | 36FF | 0F04 | 681E | 1303 | 7868 | 689D | 9D7B |
| 0000120040 | 7E9A | 009D | 8300 | 26C4 | 06FF | 14AE | AEA1 | 8914 |
| 0000120060 | CA46 | 03E9 | FF00 | CA4E | 7E83 | 00CA | 0375 | 57E9 |
| 0000120100 | 8E00 | 5206 | 267A | 3E83 | 9DD1 | 7500 | E903 | 0045 |
| 0000120120 | 7E83 | FED0 | 0375 | 3CE9 | 1E00 | 0A68 | 8D13 | DC46 |
| 0000120140 | 5016 | 468D | 16F2 | 8D50 | CC46 | 5016 | 681E | 14B0 |
| 0000120160 | AF68 | FF01 | 0236 | FF0F | 0036 | FF0F | 0636 | FF0F |
| 0000120200 | 0436 | 1E0F | 0D68 | 6813 | 9E11 | 1468 | 9A9E | 9E17 |
| 0000120220 | 0000 | C483 | E926 | FF9D | 468B | 0B08 | 0646 | 0375 |
| 0000120240 | A2E9 | C400 | 065E | FF26 | 0277 | FF26 | 9A37 | B468 |
| 0000120260 | 978F | C483 | C404 | 065E | 8B26 | 0647 | 0B26 | 0447 |
| 0000120300 | 0375 | 6CE9 | A100 | 14AE | 4689 | E9CA | 0003 | 4EFF |
| 0000120320 | 83CA | CA7E | 7500 | E903 | 0057 | 068E | 7A52 | 8326 |
| 0000120340 | 553E | 009E | 0375 | 45E9 | 8300 | D07E | 75FE | E903 |
| 0000120360 | 003C | 681E | 1314 | 468D | 16DC | 8D50 | F246 | 5016 |
| 0000120400 | 468D | 16CC | 1E50 | B068 | 6814 | 01B4 | 36FF | 0F02 |
| 0000120420 | 36FF | 0F00 | 36FF | 0F06 | 36FF | 0F04 | 681E | 1317 |
| 0000120440 | 7568 | 6897 | 9778 | 7B9A | 0097 | 8300 | 26C4 | 9DE9 |
| 0000120460 | C4FF | 065E | 8B26 | 0447 | 8B26 | 0657 | 4689 | 8906 |
| 0000120500 | 0856 | 53E9 | FFFF | AE0E | A114 | 14AE | 4689 | E9CA |
| 0000120520 | 0003 | 4EFF | 83CA | CA7E | 7500 | E903 | 0057 | 068E |
| 0000120540 | 7A52 | 8326 | 333E | 0097 | 0375 | 45E9 | 8300 | D07E |
| 0000120560 | 75FE | E903 | 003C | 681E | 131E | 468D | 16DC | 8D50 |
| 0000120600 | F246 | 5016 | 468D | 16CC | 1E50 | B068 | 6814 | 01B9 |
| 0000120620 | 36FF | 0F02 | 36FF | 0F00 | 36FF | 0F06 | 36FF | 0F04 |
| 0000120640 | 681E | 1321 | EC68 | 689E | 9EEF | F29A | 009E | 8300 |
| 0000120660 | 26C4 | 9DE9 | 8EFF | 5206 | 267A | 3E83 | 9F15 | 7500 |
| 0000120700 | E903 | 0045 | 7E83 | FED0 | 0375 | 3CE9 | 1E00 | 2868 |
| 0000120720 | 8D13 | DC46 | 5016 | 468D | 16F2 | 8D50 | CC46 | 5016 |
| 0000120740 | 681E | 14B0 | BA68 | FF01 | 0236 | FF0F | 0036 | FF0F |
| 0000120760 | 0636 | FF0F | 0436 | 1E0F | 2B68 | 6813 | 9F55 | 5868 |
| 0000121000 | 9A9F | 9F5B | 0000 | C483 | A126 | 14AE | 4689 | E9CA |
| 0000121020 | 0003 | 4EFF | 83CA | CA7E | 7500 | E903 | 0057 | 068E |
| 0000121040 | 7A52 | 8326 | 6C3E | 009F | 0375 | 45E9 | 8300 | D07E |
| 0000121060 | 75FE | E903 | 003C | 681E | 1332 | 468D | 16DC | 8D50 |

THU MAR 14 17:52:34 1991 TSLINT.DLL PAGE 45, LINE 2597

| | | | | | | | | |
|---|---|---|---|---|---|---|---|---|
| 0000121100 | F246 | 5016 | 468D | 16CC | 1E50 | B068 | 6814 | 01BC |
| 0000121120 | 36FF | 0F02 | 36FF | 0F00 | 36FF | 0F06 | 36FF | 0F04 |
| 0000121140 | 681E | 1335 | 3768 | 689B | 9B3A | 3D9A | 009B | 8300 |
| 0000121160 | 26C4 | 9DE9 | 8EFF | 5206 | 267A | 3E83 | 9AF7 | 7500 |
| 0000121200 | E903 | 0009 | 7E83 | FED0 | 0374 | 0FE9 | 8E00 | 5406 |
| 0000121220 | 267A | 3E83 | 9B63 | 7500 | E903 | 0039 | 468D | 16DC |
| 0000121240 | 8D50 | F246 | 5016 | 468D | 16CC | 1E50 | B068 | 6814 |
| 0000121260 | 01BD | 36FF | 0F02 | 36FF | 0F00 | 36FF | 0F06 | 36FF |
| 0000121300 | 0F04 | 929A | 009B | 8300 | 1AC4 | 46C7 | 00D2 | E900 |
| 0000121320 | 149B | 03E9 | E900 | 1495 | 068E | 7A52 | 8326 | 353E |
| 0000121340 | 00A0 | 0375 | 45E9 | 8300 | D07E | 75FE | E903 | 003C |
| 0000121360 | 681E | 133C | 468D | 16DC | 8D50 | F246 | 5016 | 468D |
| 0000121400 | 16CC | 1E50 | B068 | 6814 | 01C0 | 36FF | 0F02 | 36FF |
| 0000121420 | 0F00 | 36FF | 0F06 | 36FF | 0F04 | 681E | 1340 | 7568 |
| 0000121440 | 68A0 | A078 | 7B9A | 00A0 | 8300 | 26C4 | 5EC4 | 2606 |
| 0000121460 | 77FF | 2602 | 37FF | 8C9A | A392 | 83A1 | 04C4 | 068E |
| 0000121500 | 7A52 | 8326 | AA3E | 00A0 | 0375 | 45E9 | 8300 | D07E |
| 0000121520 | 75FE | E903 | 003C | 681E | 1347 | 468D | 16DC | 8D50 |
| 0000121540 | F246 | 5016 | 468D | 16CC | 1E50 | B068 | 6814 | 01C2 |
| 0000121560 | 36FF | 0F02 | 36FF | 0F00 | 36FF | 0F06 | 36FF | 0F04 |
| 0000121600 | 681E | 134A | EA68 | 68A0 | A0ED | F09A | 00A0 | 8300 |
| 0000121620 | 26C4 | 5EC4 | 2606 | 478B | 2604 | 578B | 8906 | 0646 |
| 0000121640 | 5689 | C408 | 065E | C426 | 261F | 7F83 | 2512 | 0374 |
| 0000121660 | 99E9 | 8E02 | 5206 | 267A | 3E83 | A146 | 7500 | E903 |
| 0000121700 | 0045 | 7E83 | FED0 | 0375 | 3CE9 | 1E00 | 5168 | 8D13 |
| 0000121720 | DC46 | 5016 | 468D | 16F2 | 8D50 | CC46 | 5016 | 681E |
| 0000121740 | 14B0 | C568 | FF01 | 0236 | FF0F | 0036 | FF0F | 0636 |
| 0000121760 | FF0F | 0436 | 1E0F | 5468 | 6813 | A186 | 8968 | 9AA1 |
| 0000122000 | A18C | 0000 | C483 | FF26 | AE06 | C414 | 065E | 8B26 |
| 0000122020 | 2607 | 578B | 8902 | F646 | 5689 | E9F8 | 0011 | 5EC4 |
| 0000122040 | 26F6 | 478B | 2604 | 578B | 8906 | F646 | 5689 | 8BF8 |
| 0000122060 | F846 | 460B | 75F6 | E903 | 0081 | AEA1 | 8914 | CA46 |
| 0000122100 | 03E9 | FF00 | CA4E | 7E83 | 00CA | 0375 | 57E9 | 8E00 |
| 0000122120 | 5206 | 267A | 3E83 | A1CB | 7500 | E903 | 0045 | 7E83 |
| 0000122140 | FED0 | 0375 | 3CE9 | 1E00 | 5B68 | 8D13 | DC46 | 5016 |
| 0000122160 | 468D | 16F2 | 8D50 | CC46 | 5016 | 681E | 14B0 | C968 |
| 0000122200 | FF01 | 0236 | FF0F | 0036 | FF0F | 0636 | FF0F | 0436 |
| 0000122220 | 1E0F | 5E68 | 6813 | A20B | 0E68 | 9AA2 | A211 | 0000 |
| 0000122240 | C483 | E926 | FF9D | 5EC4 | 26F6 | 77FF | 2602 | 37FF |
| 0000122260 | 689A | 49B4 | 83A3 | 04C4 | 63E9 | FFFF | AE0E | A114 |
| 0000122300 | 14AE | 4689 | E9CA | 0003 | 4EFF | 83CA | CA7E | 7500 |
| 0000122320 | E903 | 0057 | 068E | 7A52 | 8326 | 323E | 00A2 | 0375 |
| 0000122340 | 45E9 | 8300 | D07E | 75FE | E903 | 003C | 681E | 1365 |
| 0000122360 | 468D | 16DC | 8D50 | F246 | 5016 | 468D | 16CC | 1E50 |
| 0000122400 | B068 | 6814 | 01CE | 36FF | 0F02 | 36FF | 0F00 | 36FF |
| 0000122420 | 0F06 | 36FF | 0F04 | 681E | 1368 | 7268 | 68A2 | A275 |
| 0000122440 | 789A | 00A2 | 8300 | 26C4 | 9DE9 | C4FF | 065E | 8B26 |
| 0000122460 | 0647 | 0B26 | 0447 | 0375 | 57E9 | 8E00 | 5206 | 267A |
| 0000122500 | 3E83 | A289 | 7500 | E903 | 0045 | 7E83 | FED0 | 0375 |
| 0000122520 | 3CE9 | 1E00 | 6F68 | 8D13 | DC46 | 5016 | 468D | 16F2 |
| 0000122540 | 8D50 | CC46 | 5016 | 681E | 14B0 | D068 | FF01 | 0236 |
| 0000122560 | FF0F | 0036 | FF0F | 0636 | FF0F | 0436 | 1E0F | 7768 |
| 0000122600 | 6813 | A2C9 | CC68 | 9AA2 | A2CF | 0000 | C483 | E926 |
| 0000122620 | 00B7 | 068E | 7A52 | 8326 | DD3E | 00A2 | 0375 | 45E9 |
| 0000122640 | 8300 | D07E | 75FE | E903 | 003C | 681E | 137E | 468D |
| 0000122660 | 16DC | 8D50 | F246 | 5016 | 468D | 16CC | 1E50 | B068 |
| 0000122700 | 6814 | 01D2 | 36FF | 0F02 | 36FF | 0F00 | 36FF | 0F06 |
| 0000122720 | 36FF | 0F04 | 681E | 1381 | 9568 | 689E | 9E98 | 9B9A |
| 0000122740 | 009E | 8300 | 26C4 | 068E | 7A52 | 8326 | 7A3E | 00A3 |

THU MAR 14 17:52:34 1991 TSLINT.DLL PAGE 46, LINE 2656

| | | | | | | | | |
|---|---|---|---|---|---|---|---|---|
| 0000122760 | 0375 | 09E9 | 8300 | D07E | 74FE | E903 | 000F | 068E |
| 0000123000 | 7A54 | 8326 | 843E | 009F | 0375 | 39E9 | 8D00 | DC46 |
| 0000123020 | 5016 | 468D | 16F2 | 8D50 | CC46 | 5016 | 681E | 14B0 |
| 0000123040 | D368 | FF01 | 0236 | FF0F | 0036 | FF0F | 0636 | FF0F |
| 0000123060 | 0436 | 9A0F | 9FB3 | 0000 | C483 | C71A | D246 | 0000 |
| 0000123100 | 2AE9 | E911 | 0003 | 24E9 | E911 | 0148 | 5EC4 | 2606 |
| 0000123120 | 77FF | 2602 | 37FF | 689A | EBB4 | 839A | 04C4 | 5EC4 |
| 0000123140 | 2606 | 478B | 2606 | 470B | 7504 | E903 | 00C3 | AEA1 |
| 0000123160 | 8914 | CA46 | 03E9 | FF00 | CA4E | 7E83 | 00CA | 0375 |
| 0000123200 | 57E9 | 8E00 | 5206 | 267A | 3E83 | 9EAC | 7500 | E903 |
| 0000123220 | 0045 | 7E83 | FED0 | 0375 | 3CE9 | 1E00 | 8868 | 8D13 |
| 0000123240 | DC46 | 5016 | 468D | 16F2 | 8D50 | CC46 | 5016 | 681E |
| 0000123260 | 14B0 | D968 | FF01 | 0236 | FF0F | 0036 | FF0F | 0636 |
| 0000123300 | FF0F | 0436 | 1E0F | 8B68 | 6813 | A411 | 1468 | 9AA4 |
| 0000123320 | A417 | 0000 | C483 | E926 | FF9D | 068E | 7A52 | 8326 |
| 0000123340 | 283E | 00A4 | 0375 | 45E9 | 8300 | D07E | 75FE | E903 |
| 0000123360 | 003C | 681E | 1392 | 468D | 16DC | 8D50 | F246 | 5016 |
| 0000123400 | 468D | 16CC | 1E50 | B068 | 6814 | 01DA | 36FF | 0F02 |
| 0000123420 | 36FF | 0F00 | 36FF | 0F06 | 36FF | 0F04 | 681E | 1398 |
| 0000123440 | B468 | 68A5 | A5B7 | BA9A | 00A5 | 8300 | 26C4 | 63E9 |
| 0000123460 | 8E00 | 5206 | 267A | 3E83 | A49B | 7500 | E903 | 0009 |
| 0000123500 | 7E83 | FED0 | 0374 | 0FE9 | 8E00 | 5406 | 267A | 3E83 |
| 0000123520 | A4B3 | 7500 | E903 | 0039 | 468D | 16DC | 8D50 | F246 |
| 0000123540 | 5016 | 468D | 16CC | 1E50 | B068 | 6814 | 01DC | 36FF |
| 0000123560 | 0F02 | 36FF | 0F00 | 36FF | 0F06 | 36FF | 0F04 | E29A |
| 0000123600 | 00A4 | 8300 | 1AC4 | 46C7 | 00D2 | E900 | 0FDF | 03E9 |
| 0000123620 | E900 | 0FD9 | 5EC4 | 2606 | 478B | 2606 | 470B | 7404 |
| 0000123640 | E903 | 0063 | 068E | 7A52 | 8326 | 113E | 00A5 | 0375 |
| 0000123660 | 09E9 | 8300 | D07E | 74FE | E903 | 000F | 068E | 7A54 |
| 0000123700 | 8326 | 293E | 00A5 | 0375 | 39E9 | 8D00 | DC46 | 5016 |
| 0000123720 | 468D | 16F2 | 8D50 | CC46 | 5016 | 681E | 14B0 | DF68 |
| 0000123740 | FF01 | 0236 | FF0F | 0036 | FF0F | 0636 | FF0F | 0436 |
| 0000123760 | 9A0F | A558 | 0000 | C483 | C71A | D246 | 0000 | 6CE9 |
| 0000124000 | E90F | 0003 | 66E9 | C40F | 065E | FF26 | 0677 | FF26 |
| 0000124020 | 0477 | 0E9A | CEB6 | 83A5 | 04C4 | 068E | 7A52 | 8326 |
| 0000124040 | 743E | 00A5 | 0375 | 09E9 | 8300 | D07E | 74FE | E903 |
| 0000124060 | 000F | 068E | 7A54 | 8326 | 593E | 00A6 | 0375 | 39E9 |
| 0000124100 | 8D00 | DC46 | 5016 | 468D | 16F2 | 8D50 | CC46 | 5016 |
| 0000124120 | 681E | 14B0 | E168 | FF01 | 0236 | FF0F | 0036 | FF0F |
| 0000124140 | 0636 | FF0F | 0436 | 9A0F | A688 | 0000 | C483 | C71A |
| 0000124160 | D246 | 0000 | F6E9 | E90E | 0003 | F0E9 | 8E0E | 5206 |
| 0000124200 | 267A | 3E83 | A5DA | 7500 | E903 | 0045 | 7E83 | FED0 |
| 0000124220 | 0375 | 3CE9 | 1E00 | 9F68 | 8D13 | DC46 | 5016 | 468D |
| 0000124240 | 16F2 | 8D50 | CC46 | 5016 | 681E | 14B0 | E468 | FF01 |
| 0000124260 | 0236 | FF0F | 0036 | FF0F | 0636 | FF0F | 0436 | 1E0F |
| 0000124300 | A668 | 6813 | A61A | 1D68 | 9AA6 | A620 | 0000 | C483 |
| 0000124320 | C426 | 065E | FF26 | 0277 | FF26 | 9A37 | 928C | A635 |
| 0000124340 | C483 | 8E04 | 5206 | 267A | 3E83 | A641 | 7500 | E903 |
| 0000124360 | 0045 | 7E83 | FED0 | 0375 | 3CE9 | 1E00 | AD68 | 8D13 |
| 0000124400 | DC46 | 5016 | 468D | 16F2 | 8D50 | CC46 | 5016 | 681E |
| 0000124420 | 14B0 | E668 | FF01 | 0236 | FF0F | 0036 | FF0F | 0636 |
| 0000124440 | FF0F | 0436 | 1E0F | B068 | 6813 | A6E4 | E768 | 9AA6 |
| 0000124460 | A6EA | 0000 | C483 | C426 | 065E | FF26 | 0677 | FF26 |
| 0000124500 | 0477 | 0E9A | FFB6 | 83A6 | 04C4 | 068E | 7A52 | 8326 |
| 0000124520 | A43E | 00A6 | 0375 | 09E9 | 8300 | D07E | 74FE | E903 |
| 0000124540 | 000F | 068E | 7A54 | 8326 | F53E | 00A2 | 0375 | 39E9 |
| 0000124560 | 8D00 | DC46 | 5016 | 468D | 16F2 | 8D50 | CC46 | 5016 |
| 0000124600 | 681E | 14B0 | E868 | FF01 | 0236 | FF0F | 0036 | FF0F |
| 0000124620 | 0636 | FF0F | 0436 | 9A0F | A324 | 0000 | C483 | C71A |

THU MAR 14 17:52:34 1991 TSLINT.DLL PAGE 47, LINE 2715

| | | | | | | | | |
|---|---|---|---|---|---|---|---|---|
| 0000124640 | D246 | 0000 | C6E9 | E90D | 0003 | C0E9 | 8E0D | 5206 |
| 0000124660 | 267A | 3E83 | A70B | 7500 | E903 | 0045 | 7E83 | FED0 |
| 0000124700 | 0375 | 3CE9 | 1E00 | B768 | 8D13 | DC46 | 5016 | 468D |
| 0000124720 | 16F2 | 8D50 | CC46 | 5016 | 681E | 14B0 | EB68 | FF01 |
| 0000124740 | 0236 | FF0F | 0036 | FF0F | 0636 | FF0F | 0436 | 1E0F |
| 0000124760 | BB68 | 6813 | A00F | 1268 | 9AA0 | A015 | 0000 | C483 |
| 0000125000 | C426 | 065E | FF26 | 0677 | FF26 | 0477 | 0E9A | 29B6 |
| 0000125020 | 83A0 | 04C4 | 068E | 7A52 | 8326 | CF3E | 009F | 0375 |
| 0000125040 | 45E9 | 8300 | D07E | 75FE | E903 | 003C | 681E | 13C2 |
| 0000125060 | 468D | 16DC | 8D50 | F246 | 5016 | 468D | 16CC | 1E50 |
| 0000125100 | B068 | 6814 | 01ED | 36FF | 0F02 | 36FF | 0F00 | 36FF |
| 0000125120 | 0F06 | 36FF | 0F04 | 681E | 13C9 | B168 | 68A7 | A7B4 |
| 0000125140 | B79A | 00A7 | 8300 | 26C4 | 5EC4 | 2606 | 77FF | 2602 |
| 0000125160 | 37FF | 8C9A | 8A92 | 83A8 | 04C4 | 068E | 7A52 | 8326 |
| 0000125200 | C53E | 00A7 | 0375 | 45E9 | 8300 | D07E | 75FE | E903 |
| 0000125220 | 003C | 681E | 13D0 | 468D | 16DC | 8D50 | F246 | 5016 |
| 0000125240 | 468D | 16CC | 1E50 | B068 | 6814 | 01EF | 36FF | 0F02 |
| 0000125260 | 36FF | 0F00 | 36FF | 0F06 | 36FF | 0F04 | 681E | 13D3 |
| 0000125300 | 6868 | 68A8 | A86B | 6E9A | 00A8 | 8300 | 26C4 | 068E |
| 0000125320 | 7A52 | 8326 | 283E | 00A8 | 0375 | 09E9 | 8300 | D07E |
| 0000125340 | 74FE | E903 | 000F | 068E | 7A54 | 8326 | F23E | 00A9 |
| 0000125360 | 0375 | 39E9 | 8D00 | DC46 | 5016 | 468D | 16F2 | 8D50 |
| 0000125400 | CC46 | 5016 | 681E | 14B0 | F068 | FF01 | 0236 | FF0F |
| 0000125420 | 0036 | FF0F | 0636 | FF0F | 0436 | 9A0F | AA21 | 0000 |
| 0000125440 | C483 | C71A | D246 | 0000 | 42E9 | E90C | 0003 | 3CE9 |
| 0000125460 | 8E0C | 5206 | 267A | 3E83 | A896 | 7500 | E903 | 0045 |
| 0000125500 | 7E83 | FED0 | 0375 | 3CE9 | 1E00 | DA68 | 8D13 | DC46 |
| 0000125520 | 5016 | 468D | 16F2 | 8D50 | CC46 | 5016 | 681E | 14B0 |
| 0000125540 | F368 | FF01 | 0236 | FF0F | 0036 | FF0F | 0636 | FF0F |
| 0000125560 | 0436 | 1E0F | DF68 | 6813 | A8D6 | D968 | 9AA8 | A8DC |
| 0000125600 | 0000 | C483 | C426 | 065E | C426 | 045F | C426 | 045F |
| 0000125620 | FF26 | 0277 | FF26 | 9A37 | 928C | A8F9 | C483 | 8E04 |
| 0000125640 | 5206 | 267A | 3E83 | A905 | 7500 | E903 | 0045 | 7E83 |
| 0000125660 | FED0 | 0375 | 3CE9 | 1E00 | E668 | 8D13 | DC46 | 5016 |
| 0000125700 | 468D | 16F2 | 8D50 | CC46 | 5016 | 681E | 14B0 | F568 |
| 0000125720 | FF01 | 0236 | FF0F | 0036 | FF0F | 0636 | FF0F | 0436 |
| 0000125740 | 1E0F | E868 | 6813 | A945 | 4868 | 9AA9 | A94B | 0000 |
| 0000125760 | C483 | C426 | 065E | C426 | 045F | C426 | 045F | FF26 |
| 0000126000 | 0677 | FF26 | 0477 | 8C9A | 6892 | 83A9 | 04C4 | 068E |
| 0000126020 | 7A52 | 8326 | 743E | 00A9 | 0375 | 45E9 | 8300 | D07E |
| 0000126040 | 75FE | E903 | 003C | 681E | 13EF | 468D | 16DC | 8D50 |
| 0000126060 | F246 | 5016 | 468D | 16CC | 1E50 | B068 | 6814 | 01F7 |
| 0000126100 | 36FF | 0F02 | 36FF | 0F00 | 36FF | 0F06 | 36FF | 0F04 |
| 0000126120 | 681E | 13F1 | B468 | 68A9 | A9B7 | BA9A | 00A9 | 8300 |
| 0000126140 | 26C4 | 5EC4 | 2606 | 5FC4 | 2604 | 5FC4 | 2604 | 77FF |
| 0000126160 | 260A | 77FF | 9A08 | 928C | A9CE | C483 | 8E04 | 5206 |
| 0000126200 | 267A | 3E83 | A9DA | 7500 | E903 | 0045 | 7E83 | FED0 |
| 0000126220 | 0375 | 3CE9 | 1E00 | F868 | 8D13 | DC46 | 5016 | 468D |
| 0000126240 | 16F2 | 8D50 | CC46 | 5016 | 681E | 14B0 | F968 | FF01 |
| 0000126260 | 0236 | FF0F | 0036 | FF0F | 0636 | FF0F | 0436 | 1E0F |
| 0000126300 | FB68 | 6813 | A3BA | BD68 | 9AA3 | A3C0 | 0000 | C483 |
| 0000126320 | C426 | 065E | FF26 | 0277 | FF26 | 9A37 | B60E | A505 |
| 0000126340 | C483 | 8E04 | 5206 | 267A | 3E83 | A3D1 | 7500 | E903 |
| 0000126360 | 0009 | 7E83 | FED0 | 0374 | 0FE9 | 8E00 | 5406 | 267A |
| 0000126400 | 3E83 | A440 | 7500 | E903 | 0039 | 468D | 16DC | 8D50 |
| 0000126420 | F246 | 5016 | 468D | 16CC | 1E50 | B068 | 6814 | 01FB |
| 0000126440 | 36FF | 0F02 | 36FF | 0F00 | 36FF | 0F06 | 36FF | 0F04 |
| 0000126460 | 6F9A | 00A4 | 8300 | 1AC4 | 46C7 | 00D2 | E900 | 0A2D |
| 0000126500 | 03E9 | E900 | 0A27 | 068E | 7A52 | 8326 | AB3E | 00AA |

THU MAR 14 17:52:34 1991 TSLINT.DLL PAGE 48, LINE 2774

| | | | | | | | | |
|---|---|---|---|---|---|---|---|---|
| 0000126520 | 0375 | 45E9 | 8300 | D07E | 75FE | E903 | 003C | 681E |
| 0000126540 | 1402 | 468D | 16DC | 8D50 | F246 | 5016 | 468D | 16CC |
| 0000126560 | 1E50 | B068 | 6814 | 01FD | 36FF | 0F02 | 36FF | 0F00 |
| 0000126600 | 36FF | 0F06 | 36FF | 0F04 | 681E | 1407 | EB68 | 68AA |
| 0000126620 | AAEE | F19A | 00AA | 8300 | 26C4 | 5EC4 | 2606 | 5FC4 |
| 0000126640 | 2604 | 5FC4 | 2604 | 77FF | 2602 | 37FF | 8C9A | 0E92 |
| 0000126660 | 83AB | 04C4 | 068E | 7A52 | 8326 | 1A3E | 00AB | 0375 |
| 0000126700 | 45E9 | 8300 | D07E | 75FE | E903 | 003C | 681E | 140E |
| 0000126720 | 468D | 16DC | 8D50 | F246 | 5016 | 468D | 16CC | 1E50 |
| 0000126740 | B068 | 6814 | 01FF | 36FF | 0F02 | 36FF | 0F00 | 36FF |
| 0000126760 | 0F06 | 36FF | 0F04 | 681E | 1413 | 5A68 | 68AB | AB5D |
| 0000127000 | 609A | 00AB | 8300 | 26C4 | 5EC4 | 2606 | 5FC4 | 2604 |
| 0000127020 | 5FC4 | 2604 | 77FF | 260A | 77FF | 9A08 | 928C | AB74 |
| 0000127040 | C483 | 8E04 | 5206 | 267A | 3E83 | AB80 | 7500 | E903 |
| 0000127060 | 0045 | 7E83 | FED0 | 0375 | 3CE9 | 1E00 | 1A68 | 8D14 |
| 0000127100 | DC46 | 5016 | 468D | 16F2 | 8D50 | CC46 | 5016 | 681E |
| 0000127120 | 14B0 | 0168 | FF02 | 0236 | FF0F | 0036 | FF0F | 0636 |
| 0000127140 | FF0F | 0436 | 1E0F | 1D68 | 6814 | AC23 | 2668 | 9AAC |
| 0000127160 | AC29 | 0000 | C483 | C426 | 065E | FF26 | D277 | FF26 |
| 0000127200 | 9A37 | B60E | AC3D | C483 | 8E04 | 5206 | 267A | 3E83 |
| 0000127220 | ABE3 | 7500 | E903 | 0009 | 7E83 | FED0 | 0374 | 0FE9 |
| 0000127240 | 8E00 | 5406 | 267A | 3E83 | ACB5 | 7500 | E903 | 0039 |
| 0000127260 | 468D | 16DC | 8D50 | F246 | 5016 | 468D | 16CC | 1E50 |
| 0000127300 | B068 | 6814 | D203 | 36FF | 0F02 | 36FF | 0F00 | 36FF |
| 0000127320 | 0F06 | 36FF | 0F04 | E49A | 00AC | 8300 | 1AC4 | 46C7 |
| 0000127340 | 00D2 | E900 | 0887 | 03E9 | E900 | 0881 | 068E | 7A52 |
| 0000127360 | 8326 | 493E | 00AC | 0375 | 45E9 | 8300 | D07E | 75FE |
| 0000127400 | E903 | 003C | 681E | 1424 | 468D | 16DC | 8D50 | F246 |
| 0000127420 | 5016 | 468D | 16CC | 1E50 | B068 | 6814 | 0206 | 36FF |
| 0000127440 | 0F02 | 36FF | 0F00 | 36FF | 0F06 | 36FF | 0F04 | 681E |
| 0000127460 | 142C | 8968 | 68AC | AC8C | 8F9A | 00AC | 8300 | 26C4 |
| 0000127500 | 5EC4 | 2606 | 77FF | 2602 | 37FF | 8C9A | 5A92 | 83AD |
| 0000127520 | 04C4 | 068E | 7A52 | 8326 | 9D3E | 00AC | 0375 | 45E9 |
| 0000127540 | 8300 | D07E | 75FE | E903 | 003C | 681E | 1433 | 468D |
| 0000127560 | 16DC | 8D50 | F246 | 5016 | 468D | 16CC | 1E50 | B068 |
| 0000127600 | 6814 | 0208 | 36FF | 0F02 | 36FF | 0F00 | 36FF | 0F06 |
| 0000127620 | 36FF | 0F04 | 681E | 1435 | 4068 | 68AD | AD43 | 469A |
| 0000127640 | 00AD | 8300 | 26C4 | 068E | 7A52 | 8326 | 003E | 00AD |
| 0000127660 | 0375 | 09E9 | 8300 | D07E | 74FE | E903 | 000F | 068E |
| 0000127700 | 7A54 | 8326 | D23E | 00AD | 0375 | 39E9 | 8D00 | DC46 |
| 0000127720 | 5016 | 468D | 16F2 | 8D50 | CC46 | 5016 | 681E | 14B0 |
| 0000127740 | 0968 | FF02 | 0236 | FF0F | 0036 | FF0F | 0636 | FF0F |
| 0000127760 | 0436 | 9A0F | A80C | 0000 | C483 | C71A | D246 | 0000 |
| 0000130000 | 6AE9 | E907 | 0003 | 64E9 | 8E07 | 5206 | 267A | 3E83 |
| 0000130020 | AD66 | 7500 | E903 | 0045 | 7E83 | FED0 | 0375 | 3CE9 |
| 0000130040 | 1E00 | 3C68 | 0D14 | DC46 | 5016 | 468D | 16F2 | 8D50 |
| 0000130060 | CC46 | 5016 | 681E | 14B0 | 0B68 | FF02 | 0236 | FF0F |
| 0000130100 | 0036 | FF0F | 0636 | FF0F | 0436 | 1E0F | 4368 | 6814 |
| 0000130120 | ADA6 | A968 | 9AAD | ADAC | 0000 | C483 | C426 | 065E |
| 0000130140 | FF26 | 0277 | FF26 | 9A37 | 928C | A765 | C483 | 8E04 |
| 0000130160 | 5206 | 267A | 3E83 | ADBA | 7500 | E903 | 0045 | 7E83 |
| 0000130200 | FED0 | 0375 | 3CE9 | 1E00 | 4A68 | 8D14 | DC46 | 5016 |
| 0000130220 | 468D | 16F2 | 8D50 | CC46 | 5016 | 681E | 14B0 | 0D68 |
| 0000130240 | FF02 | 0236 | FF0F | 0036 | FF0F | 0636 | FF0F | 0436 |
| 0000130260 | 1E0F | 4C68 | 6814 | A74B | 4E68 | 9AA7 | A751 | 0000 |
| 0000130300 | C483 | 8E26 | 5206 | 267A | 3E83 | A771 | 7500 | E903 |
| 0000130320 | 0009 | 7E83 | FED0 | 0374 | 0FE9 | 8E00 | 5406 | 267A |
| 0000130340 | 3E83 | A7DD | 7500 | E903 | 0039 | 468D | 16DC | 8D50 |
| 0000130360 | F246 | 5016 | 468D | 16CC | 1E50 | B068 | 6814 | 020E |

THU MAR 14 17:52:34 1991 TSLINT.DLL PAGE 49, LINE 2833

| | | | | | | | | |
|---|---|---|---|---|---|---|---|---|
| 0000130400 | 36FF | 0F02 | 36FF | 0F00 | 36FF | 0F06 | 36FF | 0F04 |
| 0000130420 | B89A | 00AE | 8300 | 1AC4 | 46C7 | 00D2 | E900 | 064D |
| 0000130440 | 03E9 | E900 | 0647 | 068E | 7A52 | 8326 | 713E | 00AE |
| 0000130460 | 0375 | 45E9 | 8300 | D07E | 75FE | E903 | 003C | 681E |
| 0000130500 | 1453 | 468D | 16DC | 8D50 | F246 | 5016 | 468D | 16CC |
| 0000130520 | 1E50 | B068 | 6814 | 0210 | 36FF | 0F02 | 36FF | 0F00 |
| 0000130540 | 36FF | 0F06 | 36FF | 0F04 | 681E | 1458 | 1468 | 68AF |
| 0000130560 | AF17 | 1A9A | 00AF | 8300 | 26C4 | 068E | 7A52 | 8326 |
| 0000130600 | D43E | 00AE | 0375 | 09E9 | 8300 | D07E | 74FE | E903 |
| 0000130620 | 000F | 068E | 7A54 | 8326 | 403E | 00AF | 0375 | 39E9 |
| 0000130640 | 8D00 | DC46 | 5016 | 468D | 16F2 | 8D50 | CC46 | 5016 |
| 0000130660 | 681E | 14B0 | 1168 | FF02 | 0236 | FF0F | 0036 | FF0F |
| 0000130700 | 0636 | FF0F | 0436 | 9A0F | AF6F | 0000 | C483 | C71A |
| 0000130720 | D246 | 0000 | 96E9 | E905 | 0003 | 90E9 | 8E05 | 5206 |
| 0000130740 | 267A | 3E83 | AF28 | 7500 | E903 | 0045 | 7E83 | FED0 |
| 0000130760 | 0375 | 3CE9 | 1E00 | 5F68 | 8D14 | DC46 | 5016 | 468D |
| 0000131000 | 16F2 | 8D50 | CC46 | 5016 | 681E | 14B0 | 1368 | FF02 |
| 0000131020 | 0236 | FF0F | 0036 | FF0F | 0636 | FF0F | 0436 | 1E0F |
| 0000131040 | 6568 | 6814 | AFCB | CE68 | 9AAF | AFD1 | 0000 | C483 |
| 0000131060 | 8E26 | 5206 | 267A | 3E83 | AF8B | 7500 | E903 | 0009 |
| 0000131100 | 7E83 | FED0 | 0374 | 0FE9 | 8E00 | 5406 | 267A | 3E83 |
| 0000131120 | B009 | 7500 | E903 | 0039 | 468D | 16DC | 8D50 | F246 |
| 0000131140 | 5016 | 468D | 16CC | 1E50 | B068 | 6814 | 0214 | 36FF |
| 0000131160 | 0F02 | 36FF | 0F00 | 36FF | 0F06 | 36FF | 0F04 | 389A |
| 0000131200 | 00B0 | 8300 | 1AC4 | 46C7 | 00D2 | E900 | 04DF | 03E9 |
| 0000131220 | E900 | 04D9 | 068E | 7A52 | 8326 | F13E | 00AF | 0375 |
| 0000131240 | 45E9 | 8300 | D07E | 75FE | E903 | 003C | 681E | 146C |
| 0000131260 | 468D | 16DC | 8D50 | F246 | 5016 | 468D | 16CC | 1E50 |
| 0000131300 | B068 | 6814 | 0216 | 36FF | 0F02 | 36FF | 0F00 | 36FF |
| 0000131320 | 0F06 | 36FF | 0F04 | 681E | 1474 | A168 | 68B0 | B0A4 |
| 0000131340 | A79A | 00B0 | 8300 | 26C4 | 5EC4 | 2606 | 77FF | 2602 |
| 0000131360 | 37FF | 8C9A | D292 | 83B0 | 04C4 | 068E | 7A52 | 8326 |
| 0000131400 | 543E | 00B0 | 0375 | 09E9 | 8300 | D07E | 74FE | E903 |
| 0000131420 | 000F | 068E | 7A54 | 8326 | 5D3E | 00B1 | 0375 | 39E9 |
| 0000131440 | 8D00 | DC46 | 5016 | 468D | 16F2 | 8D50 | CC46 | 5016 |
| 0000131460 | 681E | 14B0 | 1868 | FF02 | 0236 | FF0F | 0036 | FF0F |
| 0000131500 | 0636 | FF0F | 0436 | 9A0F | B18C | 0000 | C483 | C71A |
| 0000131520 | D246 | 0000 | 16E9 | E904 | 0003 | 10E9 | 8E04 | 5206 |
| 0000131540 | 267A | 3E83 | B0DE | 7500 | E903 | 0052 | 7E83 | FED0 |
| 0000131560 | 0375 | 49E9 | C400 | 065E | C426 | 261F | 77FF | 2602 |
| 0000131600 | 37FF | 681E | 147B | 468D | 16DC | 8D50 | F246 | 5016 |
| 0000131620 | 468D | 16CC | 1E50 | B068 | 6814 | 021A | 36FF | 0F02 |
| 0000131640 | 36FF | 0F00 | 36FF | 0F06 | 36FF | 0F04 | 681E | 1489 |
| 0000131660 | 1E68 | 68B1 | B121 | 249A | 00B1 | 8300 | 2AC4 | 5EC4 |
| 0000131700 | 2606 | 1FC4 | 8B26 | 0647 | 0B26 | 0447 | 0375 | 16E9 |
| 0000131720 | C400 | 065E | C426 | 261F | 77FF | 2606 | 77FF | 9A04 |
| 0000131740 | 928C | B139 | C483 | 8E04 | 5206 | 267A | 3E83 | B145 |
| 0000131760 | 7500 | E903 | 0045 | 7E83 | FED0 | 0375 | 3CE9 | 1E00 |
| 0000132000 | 9068 | 8D14 | DC46 | 5016 | 468D | 16F2 | 8D50 | CC46 |
| 0000132020 | 5016 | 681E | 14B0 | 1D68 | FF02 | 0236 | FF0F | 0036 |
| 0000132040 | FF0F | 0636 | FF0F | 0436 | 1E0F | 9368 | 6814 | AA7D |
| 0000132060 | 8068 | 9AAA | AA83 | 0000 | C483 | C426 | 065E | FF26 |
| 0000132100 | 0677 | FF26 | 0477 | 8C9A | 9F92 | 83AA | 04C4 | 068E |
| 0000132120 | 7A52 | 8326 | 3D3E | 00AA | 0375 | 09E9 | 8300 | D07E |
| 0000132140 | 74FE | E903 | 000F | 068E | 7A54 | 8326 | 983E | 00AB |
| 0000132160 | 0375 | 39E9 | 8D00 | DC46 | 5016 | 468D | 16F2 | 8D50 |
| 0000132200 | CC46 | 5016 | 681E | 14B0 | 1F68 | FF02 | 0236 | FF0F |
| 0000132220 | 0036 | FF0F | 0636 | FF0F | 0436 | 9ACF | ABC7 | 0000 |
| 0000132240 | C483 | C71A | D246 | 0000 | C2E9 | E902 | 0003 | BCE9 |

THU MAR 14 17:52:34 1991 TSLINT.DLL PAGE 50, LINE 2892

| | | | | | | | | |
|---|---|---|---|---|---|---|---|---|
| 0000132260 | 8E02 | 5206 | 267A | 3E83 | B216 | 7500 | E903 | 004F |
| 0000132300 | 7E83 | FED0 | 0375 | 46E9 | C400 | 065E | FF26 | 0277 |
| 0000132320 | FF26 | 1E37 | 9A68 | 8D14 | DC46 | 5016 | 468D | 16F2 |
| 0000132340 | 8D50 | CC46 | 5016 | 681E | 14B0 | 2168 | FF02 | 0236 |
| 0000132360 | FF0F | 0036 | FF0F | 0636 | FF0F | 0436 | 1E0F | 9D68 |
| 0000132400 | 6814 | B256 | 5968 | 9AB2 | B25C | 0000 | C483 | C42A |
| 0000132420 | 065E | 8B26 | 0647 | 0B26 | 0447 | 0375 | 67E9 | 8E00 |
| 0000132440 | 5206 | 267A | 3E83 | B27D | 7500 | E903 | 0045 | 7E83 |
| 0000132460 | FED0 | 0375 | 3CE9 | 1E00 | A468 | 8D14 | DC46 | 5016 |
| 0000132500 | 468D | 16F2 | 8D50 | CC46 | 5016 | 681E | 14B0 | 2368 |
| 0000132520 | FF02 | 0236 | FF0F | 0036 | FF0F | 0636 | FF0F | 0436 |
| 0000132540 | 1E0F | A768 | 6814 | AE5D | 6068 | 9AAE | AE63 | 0000 |
| 0000132560 | C483 | C426 | 065E | FF26 | 0677 | FF26 | 0477 | 8C9A |
| 0000132600 | E292 | 83B2 | 04C4 | 068E | 7A52 | 8326 | EE3E | 00B2 |
| 0000132620 | 0375 | 09E9 | 8300 | D07E | 74FE | E903 | 000F | 068E |
| 0000132640 | 7A54 | 8326 | 063E | 00B3 | 0375 | 39E9 | 8D00 | DC46 |
| 0000132660 | 5016 | 468D | 16F2 | 8D50 | CC46 | 5016 | 681E | 14B0 |
| 0000132700 | 2668 | FF02 | 0236 | FF0F | 0036 | FF0F | 0636 | FF0F |
| 0000132720 | 0436 | 9A0F | B335 | 0000 | C483 | C71A | D246 | 0000 |
| 0000132740 | 8AE9 | E901 | 0003 | 84E9 | FF01 | 0876 | 76FF | 9A06 |
| 0000132760 | 8338 | AFE5 | C483 | 8E04 | 5206 | 267A | 3E83 | B401 |
| 0000133000 | 7500 | E903 | 0009 | 7E83 | FED0 | 0374 | 0FE9 | 8E00 |
| 0000133020 | 5406 | 267A | 3E83 | B419 | 7500 | E903 | 0039 | 468D |
| 0000133040 | 16DC | 8D50 | F246 | 5016 | 468D | 16CC | 1E50 | B068 |
| 0000133060 | 6814 | 0229 | 36FF | 0F02 | 36FF | 0F00 | 36FF | 0F06 |
| 0000133100 | 36FF | 0F04 | 489A | 00B4 | 8300 | 1AC4 | 46C7 | 00D2 |
| 0000133120 | E900 | 0119 | 03E9 | E900 | 0113 | ADE9 | 4800 | 4D3D |
| 0000133140 | 7600 | E903 | FF83 | E0D1 | 2E93 | A7FF | B35E | 94E6 |
| 0000133160 | 94F1 | 94FC | 9507 | 9512 | B2D9 | 9A77 | 9528 | 9706 |
| 0000133200 | 9719 | 96E0 | 96F3 | B2D9 | 96CD | 9533 | 953E | 9549 |
| 0000133220 | 9554 | 955F | 956A | 9580 | 958B | 9596 | 95A1 | 95AC |
| 0000133240 | 95B7 | 95C2 | 95CD | 96BA | B2D9 | B2D9 | B2D9 | B2D9 |
| 0000133260 | B2D9 | B2D9 | B2D9 | 9CC4 | B2D9 | 984D | B1A1 | B2D9 |
| 0000133300 | B2D9 | 9FC8 | A56D | A821 | AA36 | AECD | B2D9 | ACF9 |
| 0000133320 | ABDC | AE16 | B2D9 | A69D | B2D9 | AF84 | B2D9 | B2D9 |
| 0000133340 | B2D9 | B2D9 | B2D9 | 9939 | B2D9 | 9BA7 | B2D9 | B2D9 |
| 0000133360 | B2D9 | B04D | B2D9 | B2D9 | B2D9 | B2D9 | B2D9 | B2D9 |
| 0000133400 | 951D | 9575 | B2D9 | B2D9 | 93A7 | 068E | 7A52 | 8326 |
| 0000133420 | 1D3E | 00AE | 0375 | 09E9 | 8300 | D07E | 74FE | E903 |
| 0000133440 | 000F | 068E | 7A54 | 8326 | 893E | 00AE | 0375 | 39E9 |
| 0000133460 | 8D00 | DC46 | 5016 | 468D | 16F2 | 8D50 | CC46 | 5016 |
| 0000133500 | 681E | 14B0 | 2B68 | FF02 | 0236 | FF0F | 0036 | FF0F |
| 0000133520 | 0636 | FF0F | 0436 | 9A0F | AE01 | 0000 | C483 | C71A |
| 0000133540 | D246 | 0000 | 06E9 | E900 | 0003 | 00E9 | 5E00 | 835F |
| 0000133560 | 02ED | E58B | 5D1F | CB4D | 581E | 4590 | 8B55 | 1EEC |
| 0000133600 | D88E | EC81 | 0024 | 5657 | 46C7 | BDFA | 8C14 | FC5E |
| 0000133620 | 46C7 | 00F4 | 2B00 | 89C0 | E646 | 4689 | 8EE4 | 5206 |
| 0000133640 | 267A | 3E83 | B52D | 7500 | E903 | 001D | 36FF | 0F06 |
| 0000133660 | 36FF | 0F04 | 468D | 16DC | 9A50 | 92CE | 0000 | C483 |
| 0000133700 | 3D08 | 0000 | 0374 | DFE9 | 8E00 | 5406 | 267A | 3E83 |
| 0000133720 | B5BF | 7500 | E903 | 003B | 681E | 14C1 | 468D | 16E8 |
| 0000133740 | 8D50 | DC46 | 5016 | 468D | 16F6 | 6850 | 0233 | 681E |
| 0000133760 | 14D0 | 36FF | 0F02 | 36FF | 0F00 | 36FF | 0F06 | 36FF |
| 0000134000 | 0F04 | 179A | 0093 | 8300 | 1EC4 | 4689 | 89F6 | F856 |
| 0000134020 | 08E9 | 2B00 | 89C0 | F846 | 4689 | FFF6 | 0876 | 76FF |
| 0000134040 | 9A06 | 928C | B271 | C483 | C404 | 065E | 8B26 | 1247 |
| 0000134060 | 5DE9 | E900 | 007A | 068E | 7A52 | 8326 | A73E | 00B5 |
| 0000134100 | 0375 | 45E9 | 8300 | E07E | 75FE | E903 | 003C | 681E |
| 0000134120 | 14C5 | 468D | 16E8 | 8D50 | F646 | 5016 | 468D | 16DC |

THU MAR 14 17:52:34 1991 TSLINT.DLL PAGE 51, LINE 2951

| | | | | | | | | |
|---|---|---|---|---|---|---|---|---|
| 0000134140 | 1E50 | D068 | 6814 | 023C | 36FF | 0F02 | 36FF | 0F00 |
| 0000134160 | 36FF | 0F06 | 36FF | 0F04 | 681E | 14C8 | F268 | 68B1 |
| 0000134200 | B1F5 | F89A | 00B1 | 8300 | 26C4 | 23E9 | E900 | 0020 |
| 0000134220 | 252D | 7500 | E903 | FF9B | 062D | 7500 | E903 | FF93 |
| 0000134240 | 4848 | 037D | 8FE9 | 48FF | 037F | 86E9 | E9FF | FF86 |
| 0000134260 | 068E | 7A52 | 8326 | A83E | 00B1 | 0375 | 09E9 | 8300 |
| 0000134300 | E07E | 74FE | E903 | 000F | 068E | 7A54 | 8326 | 953E |
| 0000134320 | 00B2 | 0375 | 39E9 | 8D00 | E846 | 5016 | 468D | 16F6 |
| 0000134340 | 8D50 | DC46 | 5016 | 681E | 14D0 | 3F68 | FF02 | 0236 |
| 0000134360 | FF0F | 0036 | FF0F | 0636 | FF0F | 0436 | 9A0F | B2C4 |
| 0000134400 | 0000 | C483 | C71A | E246 | 0000 | 06E9 | E900 | 0003 |
| 0000134420 | 00E9 | 5E00 | 835F | 02ED | E58B | 5D1F | CB4D | 581E |
| 0000134440 | 4590 | 8B55 | 1EEC | D88E | EC81 | 0026 | 5657 | 46C7 |
| 0000134460 | E1FA | 8C14 | FC5E | 46C7 | 00F4 | 2B00 | 89C0 | E646 |
| 0000134500 | 4689 | 8EE4 | 5206 | 267A | 3E83 | B6C5 | 7500 | E903 |
| 0000134520 | 001D | 36FF | 0F06 | 36FF | 0F04 | 468D | 16DC | 9A50 |
| 0000134540 | B4AA | 0000 | C483 | 3D08 | 0000 | 0374 | 0FE9 | 8E00 |
| 0000134560 | 5406 | 267A | 3E83 | B4C0 | 7500 | E903 | 003B | 681E |
| 0000134600 | 14E5 | 468D | 16E8 | 8D50 | DC46 | 5016 | 468D | 16F6 |
| 0000134620 | 6850 | 0247 | 681E | 1512 | 36FF | 0F02 | 36FF | 0F00 |
| 0000134640 | 36FF | 0F06 | 36FF | 0F04 | F39A | 00B4 | 8300 | 1EC4 |
| 0000134660 | 4689 | 89F6 | F856 | 08E9 | 2B00 | 89C0 | F846 | 4689 |
| 0000134700 | C4F6 | 065E | 8326 | 127F | 7425 | E903 | 01BC | 068E |
| 0000134720 | 7A52 | 8326 | 943E | 00B4 | 0375 | 45E9 | 8300 | E07E |
| 0000134740 | 75FE | E903 | 003C | 681E | 14E9 | 468D | 16E8 | 8D50 |
| 0000134760 | F646 | 5016 | 468D | 16DC | 1E50 | 1268 | 6815 | 024B |
| 0000135000 | 36FF | 0F02 | 36FF | 0F00 | 36FF | 0F06 | 36FF | 0F04 |
| 0000135020 | 681E | 14EC | 6D68 | 68B5 | B570 | 739A | 00B5 | 8300 |
| 0000135040 | 26C4 | 06FF | 14AE | 468B | 0B08 | 0646 | 0375 | 92E9 |
| 0000135060 | A100 | 14AE | 4689 | E9DA | 0003 | 4EFF | 83DA | DA7E |
| 0000135100 | 7500 | E903 | 0057 | 068E | 7A52 | 8326 | D33E | 00B7 |
| 0000135120 | 0375 | 45E9 | 8300 | E07E | 75FE | E903 | 003C | 681E |
| 0000135140 | 14F3 | 468D | 16E8 | 8D50 | F646 | 5016 | 468D | 16DC |
| 0000135160 | 1E50 | 1268 | 6815 | 024F | 36FF | 0F02 | 36FF | 0F00 |
| 0000135200 | 36FF | 0F06 | 36FF | 0F04 | 681E | 14F6 | 1368 | 68B8 |
| 0000135220 | B816 | 199A | 00B8 | 8300 | 26C4 | 9DE9 | C4FF | 065E |
| 0000135240 | FF26 | 0277 | FF26 | 9A37 | B468 | B883 | C483 | C404 |
| 0000135260 | 065E | 8B26 | 0447 | 8B26 | 0657 | 4689 | 8906 | 0856 |
| 0000135300 | 63E9 | FFFF | AE0E | A114 | 14AE | 4689 | E9DA | 0003 |
| 0000135320 | 4EFF | 83DA | DA7E | 7500 | E903 | 0057 | 068E | 7A52 |
| 0000135340 | 8326 | 2A3E | 00B8 | 0375 | 45E9 | 8300 | E07E | 75FE |
| 0000135360 | E903 | 003C | 681E | 14FD | 468D | 16E8 | 8D50 | F646 |
| 0000135400 | 5016 | 468D | 16DC | 1E50 | 1268 | 6815 | 0255 | 36FF |
| 0000135420 | 0F02 | 36FF | 0F00 | 36FF | 0F06 | 36FF | 0F04 | 681E |
| 0000135440 | 1500 | 6A68 | 68B8 | B86D | 709A | 00B8 | 8300 | 26C4 |
| 0000135460 | 9DE9 | 8EFF | 5206 | 267A | 3E83 | B88F | 7500 | E903 |
| 0000135500 | 0045 | 7E83 | FEE0 | 0375 | 3CE9 | 1E00 | 0768 | 8D15 |
| 0000135520 | E846 | 5016 | 468D | 16F6 | 8D50 | DC46 | 5016 | 681E |
| 0000135540 | 1512 | 5668 | FF02 | 0236 | FF0F | 0036 | FF0F | 0636 |
| 0000135560 | FF0F | 0436 | 1E0F | 0A68 | 6815 | B705 | 0868 | 9AB7 |
| 0000135600 | B70B | 0000 | C483 | E926 | 000E | 76FF | FF08 | 0676 |
| 0000135620 | 689A | 14B4 | 83B5 | 04C4 | 068E | 7A52 | 8326 | 3A3E |
| 0000135640 | 00B6 | 0375 | 09E9 | 8300 | E07E | 74FE | E903 | 000F |
| 0000135660 | 068E | 7A54 | 8326 | 663E | 00B6 | 0375 | 39E9 | 8D00 |
| 0000135700 | E846 | 5016 | 468D | 16F6 | 8D50 | DC46 | 5016 | 681E |
| 0000135720 | 1512 | 5A68 | FF02 | 0236 | FF0F | 0036 | FF0F | 0636 |
| 0000135740 | FF0F | 0436 | 9A0F | B5EE | 0000 | C483 | C71A | E246 |
| 0000135760 | 0000 | 06E9 | E900 | 0003 | 00E9 | 5E00 | 835F | 02ED |
| 0000136000 | E58B | 5D1F | CB4D | 581E | 4590 | 8B55 | 1EEC | D88E |

THU MAR 14 17:52:34 1991 TSLINT.DLL PAGE 52, LINE 3010

| | | | | | | | | |
|---|---|---|---|---|---|---|---|---|
| 0000136020 | EC81 | 0000 | 5657 | 7A9A | 9A8F | 8EB7 | 5806 | 267A |
| 0000136040 | 3AA1 | 2637 | 168B | 373C | 00E9 | 5E00 | 835F | 02ED |
| 0000136060 | E58B | 5D1F | CB4D | 581E | 4590 | 8B55 | 1EEC | D88E |
| 0000136100 | EC81 | 0000 | 5657 | 068E | 7A58 | A126 | 373A | 8B26 |
| 0000136120 | 3C16 | E937 | 0000 | 5F5E | ED83 | 8B02 | 1FE5 | 4D5D |
| 0000136140 | 27CB | 0300 | D602 | 03B8 | 6A00 | 0200 | 0900 | 01B9 |
| 0000136160 | 0000 | 0500 | 3D02 | 03B7 | 2500 | 0200 | 3F00 | 0288 |
| 0000136200 | 0000 | 0200 | 0B00 | 0380 | 0000 | 0200 | 7C00 | 0492 |
| 0000136220 | 0000 | 0300 | 8302 | 03B7 | 7900 | 0500 | A702 | 03B8 |
| 0000136240 | 3300 | 0300 | 0C02 | 0330 | 8800 | 0200 | A000 | 0871 |
| 0000136260 | 0000 | 0500 | 8002 | 03B7 | 4100 | 0200 | B200 | 094D |
| 0000136300 | 0000 | 0300 | 8901 | 0166 | 2000 | 0300 | A601 | 056A |
| 0000136320 | 0200 | 0300 | 3101 | 054D | 0300 | 0300 | 7101 | 054D |
| 0000136340 | 0400 | 0300 | A701 | 0556 | 0500 | 0300 | 2902 | 036D |
| 0000136360 | 9600 | 0300 | F401 | 0553 | 0900 | 0300 | C801 | 053B |
| 0000136400 | 0B00 | 0300 | 1C01 | 0538 | 0C00 | 0300 | 4801 | 054C |
| 0000136420 | 0D00 | 0300 | D601 | 0548 | 0E00 | 0300 | F201 | 0541 |
| 0000136440 | 1100 | 0300 | BC01 | 0550 | 1600 | 0300 | E302 | 0368 |
| 0000136460 | A800 | 0300 | 8001 | 053E | 1A00 | 0300 | C101 | 0561 |
| 0000136500 | 1B00 | 0300 | 5801 | 055C | 1E00 | 0300 | 5202 | 033D |
| 0000136520 | B100 | 0300 | 6401 | 0545 | 2100 | 0500 | 1100 | 0108 |
| 0000136540 | AC00 | 0206 | 7D02 | 03B7 | 4100 | 0300 | 6701 | 0559 |
| 0000136560 | 2600 | 0300 | DE01 | 0768 | 1900 | 0300 | 1801 | 055F |
| 0000136600 | 2B00 | 0300 | 9902 | 03B6 | 4B00 | 0300 | 5002 | 03B6 |
| 0000136620 | CD00 | 0300 | C402 | 0381 | 5A00 | 0000 | 0000 | 0000 |
| 0000136640 | 581E | 4590 | 8B55 | 1EEC | D88E | EC81 | 0024 | 5657 |
| 0000136660 | 46C7 | 31FA | 8C15 | FC5E | 46C7 | 00F4 | 2B00 | 89C0 |
| 0000136700 | E646 | 4689 | 8EE4 | 5A06 | 267A | 3E83 | FFFF | 7500 |
| 0000136720 | E903 | 001D | 36FF | 1566 | 36FF | 1564 | 468D | 16DC |
| 0000136740 | 9A50 | FFFF | 0000 | C483 | 3D08 | 0000 | 0374 | 0FE9 |
| 0000136760 | 8E00 | 5C06 | 267A | 3E83 | FFFF | 7500 | E903 | 003B |
| 0000137000 | 681E | 1535 | 468D | 16E8 | 8D50 | DC46 | 5016 | 468D |
| 0000137020 | 16F6 | 6850 | 009D | 681E | 157E | 36FF | 1562 | 36FF |
| 0000137040 | 1560 | 36FF | 1566 | 36FF | 1564 | FF9A | 00FF | 8300 |
| 0000137060 | 1EC4 | 4689 | 89F6 | F856 | 08E9 | 2B00 | 89C0 | F846 |
| 0000137100 | 4689 | 9AF6 | E352 | FFFF | 8E50 | 5E06 | 267A | 70A0 |
| 0000137120 | 5026 | 046A | 879A | FFAC | 83FF | 06C4 | 068E | 7A60 |
| 0000137140 | A326 | 0C76 | 8926 | 7816 | 260C | 78A1 | 260C | 060B |
| 0000137160 | 0C76 | 0374 | 0CE9 | 1E00 | 3968 | 9A15 | B3B6 | 00FE |
| 0000137200 | C483 | 8E04 | 5A06 | 267A | 3E83 | 002C | 7500 | E903 |
| 0000137220 | 0071 | 7E83 | FEE0 | 0375 | 68E9 | 9A00 | F7E4 | 0113 |
| 0000137240 | 5052 | 068E | 7A60 | FF26 | 7836 | 260C | 36FF | 0C76 |
| 0000137260 | 1E9A | A6F9 | 8300 | 04C4 | 8E50 | 6006 | 267A | 36FF |
| 0000137300 | 0C78 | FF26 | 7636 | 1E0C | 4868 | 8D15 | E846 | 5016 |
| 0000137320 | 468D | 16F6 | 8D50 | DC46 | 5016 | 681E | 157E | 9E68 |
| 0000137340 | FF00 | 6236 | FF15 | 6036 | FF15 | 6636 | FF15 | 6436 |
| 0000137360 | 1E15 | 5668 | 6815 | FFFF | FF68 | 9AFF | FFFF | 0000 |
| 0000137400 | C483 | 8E30 | 6206 | 267A | 06C7 | 002C | 004E | C626 |
| 0000137420 | 2806 | 0000 | C626 | 2E06 | 1400 | 068E | 7A60 | C426 |
| 0000137440 | 761E | 260C | 07C7 | 001A | C726 | 0247 | FFFF | 068E |
| 0000137460 | 7A5A | 8326 | EA3E | 0000 | 0375 | 09E9 | 8300 | E07E |
| 0000137500 | 74FE | E903 | 000F | 068E | 7A5C | 8326 | 583E | 0000 |
| 0000137520 | 0375 | 39E9 | 8D00 | E846 | 5016 | 468D | 16F6 | 8D50 |
| 0000137540 | DC46 | 5016 | 681E | 157E | A368 | FF00 | 6236 | FF15 |
| 0000137560 | 6036 | FF15 | 6636 | FF15 | 6436 | 9A15 | FFFF | 0000 |
| 0000137600 | C483 | C71A | E246 | 0000 | 06E9 | E900 | 0003 | 00E9 |
| 0000137620 | 5E00 | 835F | 02ED | E58B | 5D1F | CB4D | 581E | 4590 |
| 0000137640 | 8B55 | 1EEC | D88E | EC81 | 0030 | 5657 | 46C7 | 8AFA |
| 0000137660 | 8C15 | FC5E | 46C7 | 00F2 | 2B00 | 89C0 | E446 | 4689 |

THU MAR 14 17:52:34 1991 TSLINT.DLL PAGE 53, LINE 3069

| | | | | | | | | |
|---|---|---|---|---|---|---|---|---|
| 0000137700 | 8EE2 | 5A06 | 267A | 3E83 | 0195 | 7500 | E903 | 001D |
| 0000137720 | 36FF | 1566 | 36FF | 1564 | 468D | 16DA | 9A50 | 0042 |
| 0000137740 | 0000 | C483 | 3D08 | 0000 | 0374 | 0FE9 | 8E00 | 5C06 |
| 0000137760 | 267A | 3E83 | 01AD | 7500 | E903 | 003B | 681E | 158E |
| 0000140000 | 468D | 16E6 | 8D50 | DA46 | 5016 | 468D | 16F4 | 6850 |
| 0000140020 | 00B4 | 681E | 15C4 | 36FF | 1562 | 36FF | 1560 | 36FF |
| 0000140040 | 1566 | 36FF | 1564 | 8B9A | 0000 | 8300 | 1EC4 | 4689 |
| 0000140060 | 89F4 | F656 | 08E9 | 2B00 | 89C0 | F646 | 4689 | A1F4 |
| 0000140100 | 15D0 | 4639 | 7F06 | E903 | 0100 | 068E | 7A60 | FF26 |
| 0000140120 | 7836 | 260C | 36FF | 0C76 | 1E9A | D9F9 | 8302 | 04C4 |
| 0000140140 | 4689 | 8ED0 | 6006 | 267A | 76A1 | 260C | 168B | 0C78 |
| 0000140160 | 4689 | 89D2 | D456 | 529A | 25E3 | 5003 | 068E | 7A5E |
| 0000140200 | A026 | 2670 | 8B50 | 0646 | C140 | 02E0 | 8E50 | 6006 |
| 0000140220 | 267A | 36FF | 0C78 | FF26 | 7636 | 9A0C | AF90 | 00B7 |
| 0000140240 | C483 | 8EDA | 6006 | 267A | 76A3 | 260C | 1689 | 0C78 |
| 0000140260 | A126 | 0C78 | 0B26 | 7606 | 740C | E903 | 000C | 681E |
| 0000140300 | 1592 | B69A | 45B3 | 8303 | 04C4 | 068E | 7A5A | 8326 |
| 0000140320 | 283E | 0002 | 0375 | 6BE9 | 8300 | DE7E | 75FE | E903 |
| 0000140340 | 0062 | E49A | DEF7 | 5200 | 8B50 | 0646 | C140 | 02E0 |
| 0000140360 | 8E50 | 6006 | 267A | 36FF | 0C78 | FF26 | 7636 | FF0C |
| 0000140400 | D076 | 76FF | FFD4 | D276 | 681E | 15A1 | 468D | 16E6 |
| 0000140420 | 8D50 | F446 | 5016 | 468D | 16DA | 1E50 | C468 | 6815 |
| 0000140440 | 00BA | 36FF | 1562 | 36FF | 1560 | 36FF | 1566 | 36FF |
| 0000140460 | 1564 | 681E | 15BA | 5668 | 6801 | 0159 | 5C9A | 0001 |
| 0000140500 | 8300 | 36C4 | 468B | A306 | 15D0 | 76A1 | 4015 | 4689 |
| 0000140520 | E9F8 | 0003 | 46FF | 8BF8 | F846 | 4639 | 7F06 | E903 |
| 0000140540 | 0026 | 068E | 7A64 | A126 | 373A | 8B26 | 3C16 | 8E37 |
| 0000140560 | 6006 | 267A | 1EC4 | 0C76 | 768B | C1F8 | 02E6 | 8926 |
| 0000140600 | 2600 | 5089 | E902 | FFCC | 76FF | FF0C | 0A76 | 76FF |
| 0000140620 | 9A08 | 6DF8 | 02FE | C483 | 8906 | D646 | 5689 | 8BD8 |
| 0000140640 | D646 | 568B | 8ED8 | 6006 | 267A | 1EC4 | 0C76 | 768B |
| 0000140660 | C106 | 02E6 | 8926 | 2600 | 5089 | 8B02 | 0646 | 76A3 |
| 0000140700 | 5E15 | 835F | 02ED | E58B | 5D1F | CB4D | 581E | 4590 |
| 0000140720 | 8B55 | 1EEC | D88E | EC81 | 003C | 5657 | 46C7 | D2FA |
| 0000140740 | 8C15 | FC5E | 46C7 | 00EC | 2B00 | 89C0 | DE46 | 4689 |
| 0000140760 | 8EDC | 5A06 | 267A | 3E83 | 0331 | 7500 | E903 | 001D |
| 0000141000 | 36FF | 1566 | 36FF | 1564 | 468D | 16D4 | 9A50 | 023E |
| 0000141020 | 0000 | C483 | 3D08 | 0000 | 0374 | 0FE9 | 8E00 | 5C06 |
| 0000141040 | 267A | 3E83 | 0254 | 7500 | E903 | 003B | 681E | 15D6 |
| 0000141060 | 468D | 16E0 | 8D50 | D446 | 5016 | 468D | 16F2 | 6850 |
| 0000141100 | 00CB | 681E | 1602 | 36FF | 1562 | 36FF | 1560 | 36FF |
| 0000141120 | 1566 | 36FF | 1564 | 879A | 0002 | 8300 | 1EC4 | 4689 |
| 0000141140 | 89F2 | F456 | 08E9 | 2B00 | 89C0 | F446 | 4689 | 2BF2 |
| 0000141160 | 89C0 | C646 | 4689 | BEC4 | 0000 | 068E | 7A66 | C426 |
| 0000141200 | 581E | 260C | 77FF | 2602 | 37FF | 149A | 3265 | 8305 |
| 0000141220 | 04C4 | 4689 | 89EE | F056 | 068E | 7A60 | A126 | 0C76 |
| 0000141240 | 8B26 | 7816 | 8B0C | 760E | C115 | 02E1 | C103 | 4689 |
| 0000141260 | 89C8 | CA56 | 068E | 7A60 | 468B | 26C8 | 0639 | 0C76 |
| 0000141300 | 0372 | 4AE9 | C400 | C85E | FF26 | 0277 | FF26 | 9A37 |
| 0000141320 | 6514 | 05A9 | C483 | 8904 | D046 | 5689 | C4D2 | D05E |
| 0000141340 | 0326 | 0C77 | 5EC4 | 26D0 | 7F83 | 000C | 0375 | 17E9 |
| 0000141360 | 8B00 | C646 | 460B | 74C4 | E903 | 000C | 468B | 8BC8 |
| 0000141400 | CA56 | 4689 | 89C4 | C656 | 6E83 | 04C8 | A5E9 | 8BFF |
| 0000141420 | C646 | 460B | 75C4 | E903 | 0179 | 468B | 8EC4 | 6006 |
| 0000141440 | 267A | 062B | 0C76 | F8C1 | 4802 | 5EC4 | 26EE | 6FF7 |
| 0000141460 | 030C | 9AF0 | E352 | 05C2 | 8E50 | 5E06 | 267A | 70A0 |
| 0000141500 | 5026 | 448D | 5001 | 879A | 78AC | 8306 | 06C4 | 4689 |
| 0000141520 | 89F6 | F856 | D00B | 0374 | 0CE9 | 1E00 | DA68 | 9A15 |
| 0000141540 | B3B6 | 05E2 | C483 | 8E04 | 5A06 | 267A | 3E83 | 0458 |

THU MAR 14 17:52:34 1991 TSLINT.DLL PAGE 54, LINE 3128

| | | | | | | | | |
|---|---|---|---|---|---|---|---|---|
| 0000141560 | 7500 | E903 | 0061 | 7E83 | FED8 | 0375 | 58E9 | 9A00 |
| 0000141600 | F7E4 | 05EF | 5052 | 76FF | FFF8 | F676 | 1E9A | BBF9 |
| 0000141620 | 8302 | 04C4 | FF50 | F876 | 76FF | 1EF6 | E968 | 8D15 |
| 0000141640 | E046 | 5016 | 468D | 16F2 | 8D50 | D446 | 5016 | 681E |
| 0000141660 | 1602 | E168 | FF00 | 6236 | FF15 | 6036 | FF15 | 6636 |
| 0000141700 | FF15 | 6436 | 1E15 | F768 | 6815 | 0397 | 9A68 | 9A03 |
| 0000141720 | 039D | 0000 | C483 | 8B30 | F646 | 568B | 89F8 | CC46 |
| 0000141740 | 5689 | 8ECE | 6006 | 267A | 76A1 | 260C | 168B | 0C78 |
| 0000141760 | 0405 | 8900 | C846 | 5689 | E9CA | 0004 | 4683 | 04C8 |
| 0000142000 | 468B | 39C8 | C446 | 0373 | 85E9 | C400 | C85E | FF26 |
| 0000142020 | 0277 | FF26 | 9A37 | 6514 | 0705 | C483 | 8904 | D046 |
| 0000142040 | 5689 | C4D2 | D05E | FF26 | 0C77 | 5EC4 | 26D0 | 77FF |
| 0000142060 | 260A | 77FF | FF08 | CE76 | 76FF | 9ACC | 662E | 06DE |
| 0000142100 | C483 | C40A | D05E | 8B26 | 0C47 | 4601 | 8BCC | C846 |
| 0000142120 | 568B | 39CA | C446 | 0374 | 08E9 | 3900 | C656 | 0375 |
| 0000142140 | 2AE9 | C400 | EE5E | FF26 | 0C77 | 5EC4 | 26EE | 77FF |
| 0000142160 | 260A | 77FF | FFD8 | CE76 | 76FF | 9ACC | 662E | FFFF |
| 0000142200 | C483 | C40A | EE5E | 8B26 | 0C47 | 4601 | E9CC | FF6C |
| 0000142220 | 08E9 | C700 | F646 | 1600 | 5E8C | 56F8 | 76FF | FFF8 |
| 0000142240 | F676 | F89A | F46D | 8303 | 06C4 | 4689 | 89D0 | D256 |
| 0000142260 | 068E | 7A60 | C426 | 761E | 260C | 078B | 8B26 | 0257 |
| 0000142300 | 068E | 7A68 | A326 | 0AAD | 8926 | A216 | 9A0A | 29E7 |
| 0000142320 | 04ED | 468B | 8BD0 | D256 | 068E | 7A60 | C426 | 761E |
| 0000142340 | 260C | 0789 | 8926 | 0257 | 068E | 7A5A | 8326 | CE3E |
| 0000142360 | 0005 | 0375 | C9E9 | 8300 | D87E | 74FE | E903 | 000F |
| 0000142400 | 068E | 7A5C | 8326 | 843E | 0004 | 0375 | 39E9 | 8D00 |
| 0000142420 | E046 | 5016 | 468D | 16F2 | 8D50 | D446 | 5016 | 681E |
| 0000142440 | 1602 | F268 | FF00 | 6236 | FF15 | 6036 | FF15 | 6636 |
| 0000142460 | FF15 | 6436 | 9A15 | 01DC | 0000 | C483 | C71A | DA46 |
| 0000142500 | 0000 | 06E9 | E900 | 0003 | 00E9 | 5E00 | 835F | 02ED |
| 0000142520 | E58B | 5D1F | CB4D | 581E | 4590 | 8B55 | 1EEC | D88E |
| 0000142540 | EC81 | 0042 | 5657 | 46C7 | 11FA | 8C16 | FC5E | 46C7 |
| 0000142560 | 01F0 | 2B01 | 89C0 | E246 | 4689 | 8EE0 | 5A06 | 267A |
| 0000142600 | 3E83 | 0BC3 | 7500 | E903 | 001D | 36FF | 1566 | 36FF |
| 0000142620 | 1564 | 468D | 16D8 | 9A50 | 046E | 0000 | C483 | 3D08 |
| 0000142640 | 0000 | 0374 | 0FE9 | 8E00 | 5C06 | 267A | 3E83 | 08DB |
| 0000142660 | 7500 | E903 | 003B | 681E | 1615 | 468D | 16E4 | 8D50 |
| 0000142700 | D846 | 5016 | 468D | 16F2 | 6850 | 0111 | 681E | 16D8 |
| 0000142720 | 36FF | 1562 | 36FF | 1560 | 36FF | 1566 | 36FF | 1564 |
| 0000142740 | B79A | 0004 | 8300 | 1EC4 | 4689 | 89F2 | F456 | 08E9 |
| 0000142760 | 2B00 | 89C0 | F446 | 4689 | 9AF2 | 392A | 0730 | 4688 |
| 0000143000 | C4C4 | 0A5E | 8B26 | 0247 | 8B26 | 0457 | 5EC4 | 260A |
| 0000143020 | 4703 | 890C | CE46 | 5689 | C4D0 | 0A5E | 468B | 26CE |
| 0000143040 | 4739 | 7306 | E903 | 00EE | 5EC4 | 260A | 77FF | C40A |
| 0000143060 | 0A5E | FF26 | 0477 | FF26 | 0277 | 5EC4 | 260A | 37FF |
| 0000143100 | 749A | 9E4A | 8306 | 08C4 | 5EC4 | 260A | 4789 | C40C |
| 0000143120 | 0A5E | 8326 | 0C7F | 7E00 | E903 | 008C | 068E | 7A5A |
| 0000143140 | 8326 | 4F3E | 0007 | 0375 | 09E9 | 8300 | DC7E | 74FE |
| 0000143160 | E903 | 000F | 068E | 7A5C | 8326 | 673E | 0007 | 0375 |
| 0000143200 | 58E9 | B800 | FFFF | 5EC4 | 260A | 4789 | 890C | DE46 |
| 0000143220 | 76FF | FFE2 | E076 | 468D | 16DE | FF50 | F076 | 76FF |
| 0000143240 | FFFC | FA76 | 4E8D | 16E4 | 8D51 | F24E | 5116 | 4E8D |
| 0000143260 | 16D8 | 1E51 | D868 | 6816 | 011F | 36FF | 1562 | 36FF |
| 0000143300 | 1560 | 36FF | 1566 | 36FF | 1564 | FF9A | 00FF | 8300 |
| 0000143320 | 28C4 | 468B | E9DE | 0798 | 0DE9 | B800 | FFFF | 5EC4 |
| 0000143340 | 260A | 4789 | E90C | 0788 | 5EC4 | 260A | 478B | 2602 |
| 0000143360 | 578B | C404 | 0A5E | 0326 | 0C47 | 4689 | 89CE | D056 |
| 0000143400 | 5EC4 | 260A | 478B | 2602 | 578B | C404 | 0A5E | 8926 |
| 0000143420 | 0647 | 8926 | 0857 | 5EC4 | 260A | 478B | 2606 | 578B |

THU MAR 14 17:52:34 1991 TSLINT.DLL PAGE 55, LINE 3187

| | | | | | | | | |
|---|---|---|---|---|---|---|---|---|
| 0000143440 | 8908 | C646 | 5689 | 89C8 | D446 | 5689 | C4D6 | 0A5E |
| 0000143460 | 8B26 | 0247 | 8B26 | 0457 | 5EC4 | 260A | 4703 | 890A |
| 0000143500 | CA46 | 5689 | 80CC | C47E | 7400 | E903 | 030E | 5EC4 |
| 0000143520 | 26C6 | 3F80 | 740A | E903 | 0028 | 468B | 8BC6 | C856 |
| 0000143540 | 5EC4 | 260A | 4739 | 7402 | E903 | 0009 | 3926 | 0457 |
| 0000143560 | 0375 | 0DE9 | C400 | C65E | 8026 | FF7F | 750A | E903 |
| 0000143600 | 0254 | 468B | 8BCA | CC56 | 46FF | 39C6 | C646 | 0374 |
| 0000143620 | C6E9 | 3901 | C856 | 0374 | BEE9 | 8B01 | C646 | 462B |
| 0000143640 | 89D4 | D246 | 5EC4 | 8B0A | D246 | 3926 | 1247 | 037C |
| 0000143660 | FEE9 | C400 | 0A5E | FF26 | 1077 | FF26 | 0E77 | 1E9A |
| 0000143700 | 44F9 | 830A | 04C4 | 4689 | C4BE | 0A5E | 8B26 | 0E47 |
| 0000143720 | 8B26 | 1057 | 4689 | 89C0 | C256 | 5EC4 | 260A | 67D1 |
| 0000143740 | 9A12 | E352 | 0A8C | 8E50 | 5E06 | 267A | 70A0 | 5026 |
| 0000143760 | 5EC4 | 260A | 77FF | C412 | 0A5E | FF26 | 1077 | FF26 |
| 0000144000 | 0E77 | 909A | 5CAF | 8308 | 0AC4 | 5EC4 | 260A | 4789 |
| 0000144020 | 260E | 5789 | C410 | 0A5E | 8B26 | 1047 | 0B26 | 0E47 |
| 0000144040 | 0374 | 0CE9 | 1E00 | 1968 | 9A16 | B3B6 | 0AB3 | C483 |
| 0000144060 | 8E04 | 5A06 | 267A | 3E83 | 07E2 | 7500 | E903 | 006E |
| 0000144100 | 7E83 | FEDC | 0375 | 65E9 | C400 | 0A5E | D126 | 1267 |
| 0000144120 | E49A | 96F7 | 5205 | C450 | 0A5E | FF26 | 1277 | 5EC4 |
| 0000144140 | 260A | 77FF | 2610 | 77FF | FF0E | BE76 | 76FF | FFC2 |
| 0000144160 | C076 | 681E | 1628 | 468D | 16E4 | 8D50 | F246 | 5016 |
| 0000144200 | 468D | 16D8 | 1E50 | D868 | 6816 | 0128 | 36FF | 1562 |
| 0000144220 | 36FF | 1560 | 36FF | 1566 | 36FF | 1564 | 681E | 1641 |
| 0000144240 | 2A68 | 6806 | 062D | 309A | 0006 | 8300 | 36C4 | F3E9 |
| 0000144260 | FFFE | D276 | 76FF | FFD6 | D476 | 5EC4 | 260A | 77FF |
| 0000144300 | 2610 | 77FF | 9A0E | 662E | 0B62 | C483 | C40A | 0A5E |
| 0000144320 | 8B26 | 0E47 | 8B26 | 1057 | 4689 | 89D4 | D656 | 4603 |
| 0000144340 | 89D2 | F646 | 5689 | C4F8 | 0A5E | FF26 | 0A77 | 5EC4 |
| 0000144360 | 260A | 77FF | 2604 | 77FF | C402 | 0A5E | FF26 | 9A37 |
| 0000144400 | 4A74 | 0BE5 | C483 | C408 | 0A5E | 8926 | 0C47 | 5EC4 |
| 0000144420 | 260A | 7F83 | 000C | 037C | 0AE9 | C400 | 0A5E | 8B26 |
| 0000144440 | 0C47 | 4BE9 | C405 | 0A5E | 8B26 | 0247 | 8B26 | 0457 |
| 0000144460 | 5EC4 | 260A | 4703 | 890C | CE46 | 5689 | C4D0 | 0A5E |
| 0000144500 | 8B26 | 0247 | 8B26 | 0457 | 4689 | 89C6 | C856 | 5EC4 |
| 0000144520 | 260A | 4789 | 2606 | 5789 | 8B08 | CE46 | 568B | 39D0 |
| 0000144540 | C646 | 0374 | 6CE9 | 3900 | C856 | 0374 | 64E9 | 8B00 |
| 0000144560 | CA46 | 462B | 50CE | 76FF | FFD0 | CE76 | 5EC4 | 260A |
| 0000144600 | 37FF | 749A | A34A | 8308 | 08C4 | 5EC4 | 260A | 4789 |
| 0000144620 | C40C | 0A5E | 8326 | 0C7F | 7C00 | E903 | 000A | 5EC4 |
| 0000144640 | 260A | 478B | E90C | 04C8 | 5EC4 | 260A | 478B | 010C |
| 0000144660 | CE46 | 5EC4 | 260A | 7F83 | 000C | 0374 | 03E9 | E900 |
| 0000144700 | 0014 | 468B | C4CE | 0A5E | 2B26 | 0247 | 5EC4 | 260A |
| 0000144720 | 4789 | E90C | FD78 | 5EC4 | 26C6 | 3F80 | 740A | E903 |
| 0000144740 | 0029 | 468B | 8BD4 | D656 | 4639 | 74C6 | E903 | 0008 |
| 0000144760 | 5639 | 75C8 | E903 | 0013 | 5EC4 | 26C6 | 7F80 | 0AFF |
| 0000145000 | 0374 | 06E9 | FF00 | C64E | 3AE9 | 8B00 | C646 | 568B |
| 0000145020 | C4C8 | 0A5E | 3926 | 0247 | 0374 | 09E9 | 2600 | 5739 |
| 0000145040 | 7504 | E903 | 001C | 5EC4 | 26C6 | 7F80 | 0AFF | 0375 |
| 0000145060 | 0FE9 | 1E00 | 4A68 | 9A16 | B24A | 0A21 | C483 | E904 |
| 0000145100 | 0003 | 4EFF | 8BC6 | C646 | 568B | 05C8 | 0002 | 5EC4 |
| 0000145120 | 260A | 4789 | 2606 | 5789 | E908 | 0294 | 5EC4 | FFC6 |
| 0000145140 | C646 | 468A | 26C4 | 0738 | 0375 | 51E9 | 8B02 | CA46 |
| 0000145160 | 568B | 39CC | C646 | 0374 | C6E9 | 3901 | C856 | 0374 |
| 0000145200 | BEE9 | 8B01 | C646 | 462B | 89D4 | D246 | 5EC4 | 8B0A |
| 0000145220 | D246 | 3926 | 1247 | 037C | FEE9 | C400 | 0A5E | FF26 |
| 0000145240 | 1077 | FF26 | 0E77 | 1E9A | 2CF9 | 830D | 04C4 | 4689 |
| 0000145260 | C4BE | 0A5E | 8B26 | 0E47 | 8B26 | 1057 | 4689 | 89C0 |
| 0000145300 | C256 | 5EC4 | 260A | 67D1 | 9A12 | E352 | 0D74 | 8E50 |

THU MAR 14 17:52:34 1991 TSLINT.DLL PAGE 56, LINE 3246

| | | | | | | | | |
|---|---|---|---|---|---|---|---|---|
| 0000145320 | 5E06 | 267A | 70A0 | 5026 | 5EC4 | 260A | 77FF | C412 |
| 0000145340 | 0A5E | FF26 | 1077 | FF26 | 0E77 | 909A | 65AF | 830A |
| 0000145360 | 0AC4 | 5EC4 | 260A | 4789 | 260E | 5789 | C410 | 0A5E |
| 0000145400 | 8B26 | 1047 | 0B26 | 0E47 | 0374 | 0CE9 | 1E00 | 6068 |
| 0000145420 | 9A16 | B3B6 | 0D9B | C483 | 8E04 | 5A06 | 267A | 3E83 |
| 0000145440 | 0A98 | 7500 | E903 | 006E | 7E83 | FEDC | 0375 | 65E9 |
| 0000145460 | C400 | 0A5E | D126 | 1267 | E49A | 9AF7 | 520C | C450 |
| 0000145500 | 0A5E | FF26 | 1277 | 5EC4 | 260A | 77FF | 2610 | 77FF |
| 0000145520 | FF0E | BE76 | 76FF | FFC2 | C076 | 681E | 166F | 468D |
| 0000145540 | 16E4 | 8D50 | F246 | 5016 | 468D | 16D8 | 1E50 | D868 |
| 0000145560 | 6816 | 0138 | 36FF | 1562 | 36FF | 1560 | 36FF | 1566 |
| 0000145600 | 36FF | 1564 | 681E | 1688 | 0168 | 680B | 0B04 | 079A |
| 0000145620 | 000B | 8300 | 36C4 | F3E9 | FFFE | D276 | 76FF | FFD6 |
| 0000145640 | D476 | 5EC4 | 260A | 77FF | 2610 | 77FF | 9A0E | 662E |
| 0000145660 | 0E4A | C483 | C40A | 0A5E | 8B26 | 0E47 | 8B26 | 1057 |
| 0000145700 | 4689 | 89D4 | D656 | 4603 | 89D2 | F646 | 5689 | C4F8 |
| 0000145720 | 0A5E | FF26 | 0A77 | 5EC4 | 260A | 77FF | 2604 | 77FF |
| 0000145740 | C402 | 0A5E | FF26 | 9A37 | 4A74 | 0ECD | C483 | C408 |
| 0000145760 | 0A5E | 8926 | 0C47 | 5EC4 | 260A | 7F83 | 000C | 037C |
| 0000146000 | 0AE9 | C400 | 0A5E | 8B26 | 0C47 | 63E9 | C402 | 0A5E |
| 0000146020 | 8B26 | 0247 | 8B26 | 0457 | 5EC4 | 260A | 4703 | 890C |
| 0000146040 | CE46 | 5689 | C4D0 | 0A5E | 8B26 | 0247 | 8B26 | 0457 |
| 0000146060 | 4689 | 89C6 | C856 | 5EC4 | 260A | 4789 | 2606 | 5789 |
| 0000146100 | 8B08 | CE46 | 568B | 39D0 | C646 | 0374 | 6CE9 | 3900 |
| 0000146120 | C856 | 0374 | 64E9 | 8B00 | CA46 | 462B | 50CE | 76FF |
| 0000146140 | FFD0 | CE76 | 5EC4 | 260A | 37FF | 749A | 284A | 830B |
| 0000146160 | 08C4 | 5EC4 | 260A | 4789 | C40C | 0A5E | 8326 | 0C7F |
| 0000146200 | 7C00 | E903 | 000A | 5EC4 | 260A | 478B | E90C | 01E0 |
| 0000146220 | 5EC4 | 260A | 478B | 010C | CE46 | 5EC4 | 260A | 7F83 |
| 0000146240 | 000C | 0374 | 03E9 | E900 | 0014 | 468B | C4CE | 0A5E |
| 0000146260 | 2B26 | 0247 | 5EC4 | 260A | 4789 | E90C | FD9E | 4EFF |
| 0000146300 | C4C6 | C65E | 468A | 26C4 | 0738 | 0375 | 0FE9 | 1E00 |
| 0000146320 | 9168 | 9A16 | B24A | 0D09 | C483 | FF04 | C646 | 468B |
| 0000146340 | 8BC6 | C856 | C440 | 0A5E | 8926 | 0647 | 8926 | 0857 |
| 0000146360 | 468B | 8BD4 | D656 | 5EC4 | 260A | 4739 | 740E | E903 |
| 0000146400 | 014E | 3926 | 1057 | 0374 | 45E9 | 8B01 | C646 | 5EC4 |
| 0000146420 | 260A | 472B | 8902 | D246 | 5EC4 | 8B0A | D246 | 3926 |
| 0000146440 | 1247 | 037C | FEE9 | C400 | 0A5E | FF26 | 1077 | FF26 |
| 0000146460 | 0E77 | 1E9A | B8F9 | 830F | 04C4 | 4689 | C4BE | 0A5E |
| 0000146500 | 8B26 | 0E47 | 8B26 | 1057 | 4689 | 89C0 | C256 | 5EC4 |
| 0000146520 | 260A | 67D1 | 9A12 | E352 | 1000 | 8E50 | 5E06 | 267A |
| 0000146540 | 70A0 | 5026 | 5EC4 | 260A | 77FF | C412 | 0A5E | FF26 |
| 0000146560 | 1077 | FF26 | 0E77 | 909A | 4DAF | 830D | 0AC4 | 5EC4 |
| 0000146600 | 260A | 4789 | 260E | 5789 | C410 | 0A5E | 8B26 | 1047 |
| 0000146620 | 0B26 | 0E47 | 0374 | 0CE9 | 1E00 | A768 | 9A16 | B3B6 |
| 0000146640 | 1027 | C483 | 8E04 | 5A06 | 267A | 3E83 | 0D80 | 7500 |
| 0000146660 | E903 | 006E | 7E83 | FEDC | 0375 | 65E9 | C400 | 0A5E |
| 0000146700 | D126 | 1267 | E49A | 36F7 | 520F | C450 | 0A5E | FF26 |
| 0000146720 | 1277 | 5EC4 | 260A | 77FF | 2610 | 77FF | FF0E | BE76 |
| 0000146740 | 76FF | FFC2 | C076 | 681E | 16B6 | 468D | 16E4 | 8D50 |
| 0000146760 | F246 | 5016 | 468D | 16D8 | 1E50 | D868 | 6816 | 0147 |
| 0000147000 | 36FF | 1562 | 36FF | 1560 | 36FF | 1566 | 36FF | 1564 |
| 0000147020 | 681E | 16CF | E968 | 680D | 0DEC | EF9A | 000D | 8300 |
| 0000147040 | 36C4 | F3E9 | FFFE | D276 | 5EC4 | 260A | 77FF | 2604 |
| 0000147060 | 77FF | FF02 | F876 | 76FF | 9AF6 | 662E | 0E10 | C483 |
| 0000147100 | 8B0A | F646 | 568B | 03F8 | D246 | 4689 | 89C6 | C856 |
| 0000147120 | 5EC4 | 26C6 | 07C6 | 8B00 | D446 | 568B | C4D6 | 065E |
| 0000147140 | 8926 | 2607 | 5789 | 8B02 | C646 | 462B | E9D4 | 0000 |
| 0000147160 | 5F5E | ED83 | 8B02 | 1FE5 | 4D5D | 1ECB | 9058 | 5545 |

THU MAR 14 17:52:34 1991 TSLINT.DLL PAGE 57, LINE 3305

| | | | | | | | | |
|---|---|---|---|---|---|---|---|---|
| 0000147200 | EC8B | 8E1E | 81D8 | 06EC | 5700 | C756 | FA46 | 0000 |
| 0000147220 | 76FF | FF08 | 0676 | 681E | 1570 | B69A | D907 | 830F |
| 0000147240 | 08C4 | 4689 | 83FC | FC7E | 74FF | E903 | 000D | 46C7 |
| 0000147260 | 00FC | C700 | FA46 | 0001 | 82E9 | 8300 | 6E3E | 0015 |
| 0000147300 | 0374 | 78E9 | 8E00 | 7206 | 267A | 1EC4 | 0C82 | C426 |
| 0000147320 | 8D1F | 9A1F | 9935 | 113F | 1E8D | 7A6A | E09A | 499E |
| 0000147340 | 8311 | 08EC | DC8B | 299A | 9C9B | 8E10 | 7206 | 267A |
| 0000147360 | 36FF | 0C84 | FF26 | 8236 | 9A0C | 7BC2 | 0F95 | C483 |
| 0000147400 | 8E0C | 7406 | 267A | 1EC4 | 0C6A | C426 | 8D1F | 9A1F |
| 0000147420 | 9935 | 117B | 1E8D | 7A6A | E09A | 859E | 8311 | 08EC |
| 0000147440 | DC8B | 299A | 369B | 8E11 | 7406 | 267A | 36FF | 0C6C |
| 0000147460 | FF26 | 6A36 | 9A0C | 7BC2 | 115C | C483 | FF0C | FC76 |
| 0000147500 | 36FF | 1572 | 36FF | 1570 | C19A | FD11 | 8310 | 06C4 |
| 0000147520 | 468B | E9FA | 0000 | 5F5E | ED83 | 8B02 | 1FE5 | 4D5D |
| 0000147540 | 1ECB | 9058 | 5545 | EC8B | 8E1E | 81D8 | 00EC | 5700 |
| 0000147560 | FF56 | 7C36 | FF7A | 7A36 | FF7A | 7836 | FF7A | 7636 |
| 0000147600 | 8E7A | 7E06 | 267A | 36FF | 0A9C | FF26 | 9A36 | 9A0A |
| 0000147620 | 7BC2 | 1198 | C483 | BE0C | 0001 | 01E9 | 4600 | 3639 |
| 0000147640 | 1576 | 037D | 2AE9 | 8B00 | C1FE | 02E7 | 068E | 7A60 |
| 0000147660 | C426 | 761E | 260C | 018B | 8B26 | 0251 | 068E | 7A68 |
| 0000147700 | A326 | 0AA0 | 8926 | A216 | 9A0A | 29E7 | 1275 | CCE9 |
| 0000147720 | C7FF | 7606 | 0015 | C700 | 6806 | 0115 | 8B00 | 0646 |
| 0000147740 | 568B | 3908 | 7006 | 7415 | E903 | 0078 | 1639 | 1572 |
| 0000147760 | 0374 | 6FE9 | 8E00 | 6006 | 267A | 1EC4 | 0C76 | 8B26 |
| 0000150000 | 2607 | 578B | 8E02 | 6806 | 267A | A0A3 | 260A | 1689 |
| 0000150020 | 0AA2 | E79A | AB29 | 9A11 | 0293 | FFFF | 7AA3 | 8915 |
| 0000150040 | 7C16 | 8E15 | 6206 | 267A | 06C7 | 002C | 004E | 468B |
| 0000150060 | 8B06 | 0856 | A326 | 0022 | 8926 | 2416 | 8B00 | 0A46 |
| 0000150100 | A326 | 0026 | C626 | 2806 | 0100 | C626 | 2E06 | 1400 |
| 0000150120 | 068E | 7A60 | C426 | 761E | 260C | 07C7 | 001A | C726 |
| 0000150140 | 0247 | 018C | 5F5E | ED83 | 8B02 | 1FE5 | 4D5D | 1ECB |
| 0000150160 | 9058 | 5545 | EC8B | 8E1E | 81D8 | 04EC | 5700 | 8356 |
| 0000150200 | 067E | 7400 | E903 | 007D | 3E83 | 1568 | 7400 | E903 |
| 0000150220 | 0073 | 006A | 006A | 2068 | 6813 | 13D5 | 36FF | 157C |
| 0000150240 | 36FF | 157A | 068E | 7A62 | A126 | 0022 | 0326 | 2606 |
| 0000150260 | 2B00 | 2006 | 507F | 681E | 7F20 | FE68 | 9A7F | 14AC |
| 0000150300 | 1353 | C483 | 8914 | FC46 | 5E8D | 9AFC | 99CD | 1338 |
| 0000150320 | EC83 | 8B08 | 9ADC | 9B29 | 1468 | 068E | 7A7E | FF26 |
| 0000150340 | 9C36 | 260A | 36FF | 0A9A | C29A | 857B | 8314 | 0CC4 |
| 0000150360 | 2C9A | D204 | 8E13 | 6006 | 267A | 76A1 | 260C | 168B |
| 0000150400 | 0C78 | 3CE9 | 8301 | 067E | 7F00 | E903 | 000F | 7E83 |
| 0000150420 | 0008 | 0375 | 06E9 | C700 | 6806 | 0015 | A100 | 1576 |
| 0000150440 | 4639 | 7E06 | E903 | 0017 | 468B | C106 | 02E0 | 068E |
| 0000150460 | 7A60 | 0326 | 7606 | 260C | 168B | 0C78 | 02E9 | 8301 |
| 0000150500 | 763E | 0015 | 0374 | 24E9 | 8300 | 067E | 7F00 | E903 |
| 0000150520 | 001B | 068E | 7A60 | C426 | 761E | 260C | 1FC4 | 8B26 |
| 0000150540 | 0847 | 8B26 | 0A57 | 20A3 | 897F | 2216 | 6A7F | 6A00 |
| 0000150560 | 6800 | 140E | FF68 | FFFF | 7C36 | FF15 | 7A36 | 8E15 |
| 0000150600 | 6006 | 267A | 1EC4 | 0C76 | C426 | 261F | 478B | 8E08 |
| 0000150620 | 6006 | 267A | 1EC4 | 0C76 | C426 | 261F | 4703 | 2B0C |
| 0000150640 | 2006 | 507F | 681E | 7F20 | 76FF | 9A06 | 14AC | 1441 |
| 0000150660 | C483 | 8914 | FC46 | 7E81 | FE06 | 747F | E903 | 0006 |
| 0000150700 | 468B | 89FC | 0646 | 468B | 3906 | FC46 | 037C | 24E9 |
| 0000150720 | 6A00 | 6A00 | 6A00 | 1E00 | 7868 | FF15 | 0676 | FC9A |
| 0000150740 | 2C01 | 8312 | 0CC4 | 7E83 | 0008 | 0375 | 06E9 | 8B00 |
| 0000150760 | 0646 | 4689 | C4FC | 201E | 267F | 3F80 | 7400 | E903 |
| 0000151000 | 0028 | 5E8D | 9AFC | 99CD | 1472 | EC83 | 8B08 | 9ADC |
| 0000151020 | 9B29 | 1172 | 068E | 7A7E | FF26 | 9C36 | 260A | 36FF |
| 0000151040 | 0A9A | C29A | F27B | 8311 | 0CC4 | 468B | C106 | 02E0 |

THU MAR 14 17:52:34 1991 TSLINT.DLL PAGE 58, LINE 3364

| | | | | | | | | |
|---|---|---|---|---|---|---|---|---|
| 0000151060 | 068E | 7A60 | 0326 | 7606 | 260C | 168B | 0C78 | 00E9 |
| 0000151100 | 5E00 | 835F | 02ED | E58B | 5D1F | CB4D | 581E | 4590 |
| 0000151120 | 8B55 | 1EEC | D88E | EC81 | 003C | 5657 | 5EC4 | 2608 |
| 0000151140 | 078B | 8B26 | 0257 | 4689 | 89FA | FC56 | 468B | 8BFA |
| 0000151160 | FC56 | 4603 | 890C | EC46 | 5689 | A1EE | 1576 | 4689 |
| 0000151200 | 81F8 | 067E | 7FFF | 0374 | 05E9 | C700 | F846 | 0000 |
| 0000151220 | 5EC4 | 260E | 3F80 | 7500 | E903 | 00C5 | 5EC4 | 260E |
| 0000151240 | 7F80 | 0001 | 0375 | B8E9 | 8B00 | FA46 | 568B | 89FC |
| 0000151260 | F046 | 5689 | 8DF2 | C446 | 5016 | 76FF | FF10 | 0E76 |
| 0000151300 | 4E8B | 2BEC | F04E | FF51 | F276 | 76FF | 9AF0 | 1741 |
| 0000151320 | 12F7 | C483 | 400E | 0375 | 2FE9 | 8B00 | F846 | 4639 |
| 0000151340 | 7F06 | E903 | 0024 | 76FF | FF18 | 1676 | 76FF | FFC4 |
| 0000151360 | F276 | 76FF | FFF0 | F846 | 76FF | FFF8 | 125E | C483 |
| 0000151400 | 8B0C | D846 | 4601 | E9F0 | FFAB | 468B | 39F8 | 0646 |
| 0000151420 | 0375 | 36E9 | 8B00 | F046 | 4639 | 73EC | E903 | 002B |
| 0000151440 | 76FF | FF18 | 1676 | 468B | 2BEC | F046 | FF50 | F276 |
| 0000151460 | 76FF | FFF0 | F846 | 76FF | FFF8 | 125E | C483 | 8B0C |
| 0000151500 | EC46 | 568B | 89EE | F046 | 5689 | 8BF2 | F046 | 568B |
| 0000151520 | C4F2 | 085E | 8926 | 2607 | 5789 | 8B02 | F846 | 75E9 |
| 0000151540 | 8B01 | FA46 | 568B | 89FC | F046 | 5689 | E9F2 | 0003 |
| 0000151560 | 46FF | 8BF0 | F046 | 4639 | 77EC | E903 | 0142 | 468B |
| 0000151600 | 39F8 | 0646 | 037F | 37E9 | C401 | 0E5E | 8026 | 203F |
| 0000151620 | 0374 | 37E9 | C400 | F05E | 8026 | 203F | 0375 | 0CE9 |
| 0000151640 | C400 | F05E | 8026 | 093F | 0374 | 11E9 | 8B00 | F046 |
| 0000151660 | 4639 | 77EC | E903 | 0006 | 46FF | E9F0 | FFD7 | 468B |
| 0000151700 | 39F0 | EC46 | 0376 | 03E9 | E900 | 00F4 | 468B | 8BF0 |
| 0000151720 | F256 | 4689 | 89F4 | F656 | 5EC4 | 260E | 3F80 | 7420 |
| 0000151740 | E903 | 002C | 5EC4 | 26F0 | 3F80 | 7520 | E903 | 001D |
| 0000151760 | 5EC4 | 26F0 | 3F80 | 7509 | E903 | 0011 | 468B | 39F0 |
| 0000152000 | EC46 | 0377 | 06E9 | FF00 | F046 | D7E9 | E9FF | 0075 |
| 0000152020 | 5EC4 | 26F0 | 078A | 5EC4 | 260E | 0738 | 0375 | 11E9 |
| 0000152040 | 8B00 | F046 | 4639 | 77EC | E903 | 0006 | 46FF | E9F0 |
| 0000152060 | FFDE | 468B | 8BEC | EE56 | 3B48 | F046 | 0374 | 44E9 |
| 0000152100 | 3B00 | F256 | 0374 | 3CE9 | C400 | F05E | 8A26 | C407 |
| 0000152120 | 0E5E | 3826 | 7407 | E903 | 002B | 76FF | FF18 | 1676 |
| 0000152140 | 468B | 28F0 | F446 | FF50 | F676 | 76FF | FFF4 | F846 |
| 0000152160 | 76FF | FFF8 | 125E | C483 | 8B0C | F046 | 568B | 89F2 |
| 0000152200 | F446 | 5689 | FFF6 | 1876 | 76FF | 8B16 | F046 | 462B |
| 0000152220 | 50F4 | 76FF | FFF6 | F476 | 46FF | FFF8 | F876 | 5EFF |
| 0000152240 | 8312 | 0CC4 | 468B | 8BF0 | F256 | 4639 | 74EC | E903 |
| 0000152260 | 000B | 5639 | 74EE | E903 | 0003 | 03E9 | E900 | FEB0 |
| 0000152300 | 468B | 8BF0 | F256 | 5EC4 | 2608 | 0789 | 8926 | 0257 |
| 0000152320 | 468B | E9F8 | 0000 | 5F5E | ED83 | 8B02 | 1FE5 | 4D5D |
| 0000152340 | 1ECB | 9058 | 5545 | EC8B | 8E1E | 81D8 | 26EC | 5700 |
| 0000152360 | C756 | FA46 | 16E5 | 5E8C | C7FC | F446 | 0101 | C02B |
| 0000152400 | 4689 | 89E6 | E446 | 068E | 7A5A | 8326 | 0C3E | 0010 |
| 0000152420 | 0375 | 1DE9 | FF00 | 6636 | FF15 | 6436 | 8D15 | DC46 |
| 0000152440 | 5016 | F89A | 0007 | 8300 | 08C4 | 003D | 7400 | E903 |
| 0000152460 | 000F | 068E | 7A5C | 8326 | 0E3E | 0008 | 0375 | 3BE9 |
| 0000152500 | 1E00 | E968 | 8D16 | E846 | 5016 | 468D | 16DC | 8D50 |
| 0000152520 | F646 | 5016 | 1C68 | 1E02 | 0A68 | FF18 | 6236 | FF15 |
| 0000152540 | 6036 | FF15 | 6636 | FF15 | 6436 | 9A15 | 0841 | 0000 |
| 0000152560 | C483 | 891E | F646 | 5689 | E9F8 | 0008 | C02B | 4689 |
| 0000152600 | 89F8 | F646 | 16A1 | 0B18 | 1406 | 7518 | E903 | 0030 |
| 0000152620 | 5EC4 | 260C | 078A | 1EC4 | 1814 | 3826 | 7407 | E903 |
| 0000152640 | 0092 | 36FF | 1816 | 36FF | 1814 | 76FF | FF0E | 0C76 |
| 0000152660 | EA9A | 2E50 | 8313 | 08C4 | 003D | 7400 | E903 | 0074 |
| 0000152700 | 26A1 | 0B7F | 2406 | 757F | E903 | 02A9 | 068E | 7A88 |
| 0000152720 | 8326 | 423E | 0037 | 0374 | 9AE9 | C402 | 241E | 267F |

THU MAR 14 17:52:34 1991 TSLINT.DLL PAGE 59, LINE 3423

| | | | | | | | | |
|---|---|---|---|---|---|---|---|---|
| 0000152740 | 478B | 260E | 470B | 750C | E903 | 0006 | 01B8 | E900 |
| 0000152760 | 0003 | 00B8 | 8B00 | 8DF0 | 801E | 9A7A | 9931 | 1813 |
| 0000153000 | 068E | 7A8A | C426 | 661E | 260C | 1FC4 | 1F8D | 359A |
| 0000153020 | 7999 | 8918 | DA76 | 1D9A | 5E9F | 7518 | E903 | 0006 |
| 0000153040 | 01B8 | E900 | 0003 | 00B8 | 3300 | DA46 | 003D | 7500 |
| 0000153060 | E903 | 0241 | 1EC4 | 7F24 | FF26 | 0277 | FF26 | 9A37 |
| 0000153100 | F91E | 18D8 | C483 | 8904 | DA46 | 1EC4 | 7F24 | FF26 |
| 0000153120 | 0277 | FF26 | 9A37 | AA42 | 1530 | C483 | 8E04 | 5A06 |
| 0000153140 | 267A | 3E83 | 176D | 7500 | E903 | 005A | 7E83 | FEE0 |
| 0000153160 | 0375 | 51E9 | 9A00 | F7E4 | 134B | 5052 | 76FF | C4DA |
| 0000153200 | 241E | 267F | 77FF | 2602 | 37FF | 681E | 16ED | 468D |
| 0000153220 | 16E8 | 8D50 | F646 | 5016 | 468D | 16DC | 1E50 | 0A68 |
| 0000153240 | 6818 | 0227 | 36FF | 1562 | 36FF | 1560 | 36FF | 1566 |
| 0000153260 | 36FF | 1564 | 681E | 16FB | 7568 | 6810 | 1078 | 7B9A |
| 0000153300 | 0010 | 8300 | 30C4 | 1EC4 | 7F24 | FF26 | 0A77 | FF26 |
| 0000153320 | 0877 | 1E9A | 6CF9 | 8319 | 04C4 | 4689 | C4DA | 241E |
| 0000153340 | 267F | 77FF | 260A | 77FF | 9A08 | AA42 | 18B8 | C483 |
| 0000153360 | 8E04 | 5A06 | 267A | 3E83 | 18C4 | 7500 | E903 | 005B |
| 0000153400 | 7E83 | FEE0 | 0375 | 52E9 | 9A00 | F7E4 | 18A2 | 5052 |
| 0000153420 | 76FF | C4DA | 241E | 267F | 77FF | 260A | 77FF | 1E08 |
| 0000153440 | 0468 | 8D17 | E846 | 5016 | 468D | 16F6 | 8D50 | DC46 |
| 0000153460 | 5016 | 681E | 180A | 2868 | FF02 | 6236 | FF15 | 6036 |
| 0000153500 | FF15 | 6636 | FF15 | 6436 | 1E15 | 1268 | 6817 | 1919 |
| 0000153520 | 1C68 | 9A19 | 191F | 0000 | C483 | FF30 | 2636 | FF7F |
| 0000153540 | 2436 | 9A7F | F91E | 19F9 | C483 | 8904 | DA46 | 36FF |
| 0000153560 | 7F26 | 36FF | 7F24 | 429A | 4CAA | 8319 | 04C4 | 068E |
| 0000153600 | 7A5A | 8326 | 583E | 0019 | 0375 | 57E9 | 8300 | E07E |
| 0000153620 | 75FE | E903 | 004E | E49A | 35F7 | 5219 | FF50 | DA76 |
| 0000153640 | 36FF | 7F26 | 36FF | 7F24 | 681E | 171B | 468D | 16E8 |
| 0000153660 | 8D50 | F646 | 5016 | 468D | 16DC | 1E50 | 0A68 | 6818 |
| 0000153700 | 0229 | 36FF | 1562 | 36FF | 1560 | 36FF | 1566 | 36FF |
| 0000153720 | 1564 | 681E | 1729 | AE68 | 6819 | 19B1 | B49A | 0019 |
| 0000153740 | 8300 | 30C4 | 36FF | 1816 | 36FF | 1814 | 1E9A | 82F9 |
| 0000153760 | 831A | 04C4 | 4689 | FFDA | 1636 | FF18 | 1436 | 9A18 |
| 0000154000 | AA42 | 19D9 | C483 | 8E04 | 5A06 | 267A | 3E83 | 19E5 |
| 0000154020 | 7500 | E903 | 0057 | 7E83 | FEE0 | 0375 | 4EE9 | 9A00 |
| 0000154040 | F7E4 | 19C6 | 5052 | 76FF | FFDA | 1636 | FF18 | 1436 |
| 0000154060 | 1E18 | 3268 | 8D17 | E846 | 5016 | 468D | 16F6 | 8D50 |
| 0000154100 | DC46 | 5016 | 681E | 180A | 2A68 | FF02 | 6236 | FF15 |
| 0000154120 | 6036 | FF15 | 6636 | FF15 | 6436 | 1E15 | 4068 | 6817 |
| 0000154140 | 1A37 | 3A68 | 9A1A | 1A3D | 0000 | C483 | 2B30 | A3C0 |
| 0000154160 | 1816 | 14A3 | A118 | 1816 | 060B | 1814 | 0374 | A7E9 |
| 0000154200 | 9A03 | E352 | 1B14 | 8E50 | 5E06 | 267A | 70A0 | 5026 |
| 0000154220 | 126A | 879A | B5AC | 831B | 06C4 | 24A3 | 897F | 2616 |
| 0000154240 | A17F | 7F26 | 060B | 7F24 | 0374 | 0CE9 | 1E00 | 4968 |
| 0000154260 | 9A17 | B3B6 | 1B34 | C483 | 8E04 | 5A06 | 267A | 3E83 |
| 0000154300 | 1BE8 | 7500 | E903 | 0065 | 7E83 | FEE0 | 0375 | 5CE9 |
| 0000154320 | 9A00 | F7E4 | 1B43 | 5052 | 36FF | 7F26 | 36FF | 7F24 |
| 0000154340 | 1E9A | A4F9 | 831B | 04C4 | FF50 | 2636 | FF7F | 2436 |
| 0000154360 | 1E7F | 5868 | 8D17 | E846 | 5016 | 468D | 16F6 | 8D50 |
| 0000154400 | DC46 | 5016 | 681E | 180A | 2E68 | FF02 | 6236 | FF15 |
| 0000154420 | 6036 | FF15 | 6636 | FF15 | 6436 | 1E15 | 6668 | 6817 |
| 0000154440 | 1C4E | 5168 | 9A1C | 1C54 | 0000 | C483 | 6A30 | 6A12 |
| 0000154460 | FF00 | 2636 | FF7F | 2436 | 9A7F | 668C | 1871 | C483 |
| 0000154500 | 9A08 | E352 | 1BDC | 8E50 | 5E06 | 267A | 70A0 | 5026 |
| 0000154520 | 086A | 879A | 62AC | 831A | 06C4 | 1EC4 | 7F24 | 8926 |
| 0000154540 | 2607 | 5789 | C402 | 241E | 267F | 478B | 2602 | 070B |
| 0000154560 | 0374 | 0CE9 | 1E00 | 6F68 | 9A17 | B3B6 | 1BFC | C483 |
| 0000154600 | 8E04 | 5A06 | 267A | 3E83 | 1A6E | 7500 | E903 | 006B |

THU MAR 14 17:52:34 1991 TSLINT.DLL PAGE 60, LINE 3482

| | | | | | | | | |
|---|---|---|---|---|---|---|---|---|
| 0000154620 | 7E83 | FEED | 0375 | 62E9 | 9A00 | F7E4 | 1C0E | 5052 |
| 0000154640 | 1EC4 | 7F24 | FF26 | 0277 | FF26 | 9A37 | F91E | 1A4F |
| 0000154660 | C483 | 5004 | 1EC4 | 7F24 | FF26 | 0277 | FF26 | 1E37 |
| 0000154700 | 7E68 | 8D17 | C346 | 5016 | 468D | 16F6 | 8D50 | DC46 |
| 0000154720 | 5016 | 681E | 180A | 3068 | FF02 | 6236 | FF15 | 6036 |
| 0000154740 | FF15 | 6636 | FF15 | 6436 | 1E15 | 8C68 | 6817 | 1AC0 |
| 0000154760 | C368 | 9A1A | 1AC6 | 0000 | C483 | C430 | 241E | 267F |
| 0000155000 | 47C7 | 0804 | 9A00 | E352 | 1CA3 | 8E50 | 5E06 | 267A |
| 0000155020 | 70A0 | 5026 | 0068 | 9A01 | AC87 | 1D46 | C483 | C406 |
| 0000155040 | 241E | 267F | 4789 | 2608 | 5789 | C40A | 241E | 267F |
| 0000155060 | 478B | 260A | 470B | 7408 | E903 | 000C | 681E | 1795 |
| 0000155100 | B69A | C3B3 | 831C | 04C4 | 068E | 7A5A | 8326 | 713E |
| 0000155120 | 001D | 0375 | 6DE9 | 8300 | E07E | 75FE | E903 | 0064 |
| 0000155140 | E49A | D6F7 | 521C | C450 | 241E | 267F | 77FF | 260A |
| 0000155160 | 77FF | 9A08 | F91E | 1D27 | C483 | 5004 | 1EC4 | 7F24 |
| 0000155200 | FF26 | 0A77 | FF26 | 0877 | 681E | 17A4 | 468D | 16E8 |
| 0000155220 | 8D50 | F646 | 5016 | 468D | 16DC | 1E50 | 0A68 | 6818 |
| 0000155240 | 0232 | 36FF | 1562 | 36FF | 1560 | 36FF | 1566 | 36FF |
| 0000155260 | 1564 | 681E | 17B2 | D168 | 681D | 1DD4 | D79A | 001D |
| 0000155300 | 8300 | 30C4 | 529A | 65E3 | 501D | 068E | 7A5E | A026 |
| 0000155320 | 2670 | FF50 | 0E76 | 76FF | 9A0C | 5114 | 1DEF | C483 |
| 0000155340 | 4004 | 9A50 | AC87 | 1E6A | C483 | A306 | 1814 | 1689 |
| 0000155360 | 1816 | 16A1 | 0B18 | 1406 | 7418 | E903 | 000C | 681E |
| 0000155400 | 17BB | B69A | 85B3 | 831D | 04C4 | 068E | 7A5A | 8326 |
| 0000155420 | 8F3E | 001E | 0375 | 65E9 | 8300 | E07E | 75FE | E903 |
| 0000155440 | 005C | E49A | 94F7 | 521D | FF50 | 1636 | FF18 | 1436 |
| 0000155460 | 9A18 | F91E | 1E83 | C483 | 5004 | 36FF | 1816 | 36FF |
| 0000155500 | 1814 | 681E | 17CA | 468D | 16E8 | 8D50 | F646 | 5016 |
| 0000155520 | 468D | 16DC | 1E50 | 0A68 | 6818 | 0233 | 36FF | 1562 |
| 0000155540 | 36FF | 1560 | 36FF | 1566 | 36FF | 1564 | 681E | 17D8 |
| 0000155560 | 8068 | 681B | 1B83 | 869A | 001B | 8300 | 30C4 | 76FF |
| 0000155600 | FF0E | 0C76 | 36FF | 1816 | 36FF | 1814 | B49A | 0A50 |
| 0000155620 | 831E | 08C4 | 068E | 7A88 | 8326 | 423E | 0037 | 0374 |
| 0000155640 | 39E9 | 8D00 | 801E | 9A7A | 9931 | 1E1D | 068E | 7A8A |
| 0000155660 | C426 | 661E | 260C | 1FC4 | 1F8D | 359A | 2299 | 9A1E |
| 0000155700 | 9F1D | 1E5B | 0375 | 13E9 | C400 | 241E | 267F | 47C7 |
| 0000155720 | 120C | 263D | 47C7 | FF0E | E9FF | 000E | 1EC4 | 7F24 |
| 0000155740 | C02B | 8926 | 0E47 | 8926 | 0C47 | 36FF | 7F26 | 36FF |
| 0000155760 | 7F24 | 76FF | FF0E | 0C76 | 149A | 9C51 | 831B | 04C4 |
| 0000156000 | FF50 | 0E76 | 76FF | 9A0C | 7443 | 1ECE | C483 | 0B0A |
| 0000156020 | 75D0 | E903 | 0012 | 76FF | FF0E | 0C76 | 681E | 17E1 |
| 0000156040 | B69A | E4B3 | 831A | 08C4 | 068E | 7A5A | 8326 | 203E |
| 0000156060 | 001B | 0375 | 09E9 | 8300 | E07E | 74FE | E903 | 000F |
| 0000156100 | 068E | 7A5C | 8326 | 993E | 0017 | 0375 | 72E9 | FF00 |
| 0000156120 | 1276 | 76FF | FF10 | 0A76 | 006A | 76FF | FF0A | 0876 |
| 0000156140 | 76FF | FF06 | 2636 | FF7F | 2436 | 9A7F | 8F74 | 1F40 |
| 0000156160 | C483 | 8912 | E246 | 76FF | FFE6 | E476 | 468D | 16E2 |
| 0000156200 | FF50 | F476 | 76FF | FFFC | FA76 | 4E8D | 16E8 | 8D51 |
| 0000156220 | F64E | 5116 | 4E8D | 16DC | 1E51 | 0A68 | 6818 | 023C |
| 0000156240 | 36FF | 1562 | 36FF | 1560 | 36FF | 1566 | 36FF | 1564 |
| 0000156260 | 2B9A | 0009 | 8300 | 28C4 | 468B | E9E2 | 002A | 27E9 |
| 0000156300 | FF00 | 1276 | 76FF | FF10 | 0A76 | 006A | 76FF | FF0A |
| 0000156320 | 0876 | 76FF | FF06 | 2636 | FF7F | 2436 | 9A7F | 8F74 |
| 0000156340 | 1AF5 | C483 | E912 | 0000 | 5F5E | ED83 | 8B02 | 1FE5 |
| 0000156360 | 4D5D | 1ECB | 9058 | 5545 | EC8B | 8E1E | 81D8 | 3AEC |
| 0000156400 | 5700 | C756 | FA46 | 1818 | 5E8C | C7FC | EA46 | 0107 |
| 0000156420 | C02B | 4689 | 89DC | DA46 | 068E | 7A5A | 8326 | 283E |
| 0000156440 | 0020 | 0375 | 1DE9 | FF00 | 6636 | FF15 | 6436 | 8D15 |
| 0000156460 | D046 | 5016 | 839A | 0017 | 8300 | 08C4 | 003D | 7400 |

THU MAR 14 17:52:34 1991 TSLINT.DLL PAGE 61, LINE 3541

| | | | | | | | | |
|---|---|---|---|---|---|---|---|---|
| 0000156500 | E903 | 000F | 068E | 7A5C | 8326 | 403E | 0020 | 0375 |
| 0000156520 | 3BE9 | 1E00 | 1F68 | 8D18 | DE46 | 5016 | 468D | 16D0 |
| 0000156540 | 8D50 | F646 | 5016 | 8268 | 1E02 | 3E68 | FF18 | 6236 |
| 0000156560 | FF15 | 6036 | FF15 | 6636 | FF15 | 6436 | 9A15 | 17CC |
| 0000156600 | 0000 | C483 | 891E | F646 | 5689 | E9F8 | 0008 | C02B |
| 0000156620 | 4689 | 89F8 | F646 | 46C7 | 00CE | C400 | 065E | 8B26 |
| 0000156640 | 0647 | 0B26 | 0447 | 0374 | C4E9 | 9A00 | 2E11 | 205B |
| 0000156660 | 4689 | 89EC | EE56 | 468B | 0BEE | EC46 | 0374 | AEE9 |
| 0000156700 | 8E00 | 5A06 | 267A | 3E83 | 2124 | 7500 | E903 | 0009 |
| 0000156720 | 7E83 | FED4 | 0374 | 0FE9 | 8E00 | 5C06 | 267A | 3E83 |
| 0000156740 | 213C | 7500 | E903 | 006C | 36FF | 7A86 | 36FF | 7A84 |
| 0000156760 | 36FF | 7A82 | 36FF | 7A80 | B29A | C76D | 8320 | 08C4 |
| 0000157000 | 4689 | 89D6 | D856 | 76FF | FFDC | DA76 | 468D | 16D6 |
| 0000157020 | FF50 | EA76 | 76FF | FFFC | FA76 | 4E8D | 16DE | 8D51 |
| 0000157040 | F64E | 5116 | 4E8D | 16D0 | 1E51 | 3E68 | 6818 | 028C |
| 0000157060 | 36FF | 1562 | 36FF | 1560 | 36FF | 1566 | 36FF | 1564 |
| 0000157100 | 9D9A | 0021 | 8300 | 28C4 | 468B | 8BD6 | D856 | 1FE9 |
| 0000157120 | E905 | 001B | 36FF | 7A86 | 36FF | 7A84 | 36FF | 7A82 |
| 0000157140 | 36FF | 7A80 | B29A | F26D | 8320 | 08C4 | 01E9 | C405 |
| 0000157160 | 065E | 8B26 | 0647 | 0B26 | 0447 | 0375 | F0E9 | 8D00 |
| 0000157200 | CE46 | 5016 | 5EC4 | 2606 | 77FF | 2606 | 77FF | 9A04 |
| 0000157220 | 3984 | 2157 | C483 | 8E08 | 8BC2 | 26D8 | 478B | 260A |
| 0000157240 | 578B | 890C | EC46 | 5689 | 8BEE | EE46 | 460B | 74EC |
| 0000157260 | E903 | 00B7 | 7E83 | 00CE | 0375 | AEE9 | 8E00 | 5A06 |
| 0000157300 | 267A | 3E83 | 2201 | 7500 | E903 | 0009 | 7E83 | FED4 |
| 0000157320 | 0374 | 0FE9 | 8E00 | 5C06 | 267A | 3E83 | 2219 | 7500 |
| 0000157340 | E903 | 006C | 36FF | 7A7C | 36FF | 7A7A | 36FF | 7A78 |
| 0000157360 | 36FF | 7A76 | B29A | C36D | 8321 | 08C4 | 4689 | 89D6 |
| 0000157400 | D856 | 76FF | FFDC | DA76 | 468D | 16D6 | FF50 | EA76 |
| 0000157420 | 76FF | FFFC | FA76 | 4E8D | 16DE | 8D51 | F64E | 5116 |
| 0000157440 | 4E8D | 16D0 | 1E51 | 3E68 | 6818 | 0291 | 36FF | 1562 |
| 0000157460 | 36FF | 1560 | 36FF | 1566 | 36FF | 1564 | 7A9A | 0022 |
| 0000157500 | 8300 | 28C4 | 468B | 8BD6 | D856 | 23E9 | E904 | 001B |
| 0000157520 | 36FF | 7A7C | 36FF | 7A7A | 36FF | 7A78 | 36FF | 7A76 |
| 0000157540 | B29A | E76D | 8321 | 08C4 | 05E9 | FF04 | 6E06 | C415 |
| 0000157560 | 065E | 8B26 | 0247 | 0B26 | 7407 | E903 | 00CD | 76FF |
| 0000157600 | FFEE | EC76 | DB9A | 3410 | 8322 | 04C4 | 003D | 7500 |
| 0000157620 | E903 | 00B4 | 06C7 | 156E | 0000 | 068E | 7A5A | 8326 |
| 0000157640 | AF3E | 001C | 0375 | 09E9 | 8300 | D47E | 74FE | E903 |
| 0000157660 | 000F | 068E | 7A5C | 8326 | A73E | 001E | 0375 | 6CE9 |
| 0000157700 | FF00 | 8636 | FF7A | 8436 | FF7A | 8236 | FF7A | 8036 |
| 0000157720 | 9A7A | 6DB2 | 22A0 | C483 | 8908 | D646 | 5689 | FFD8 |
| 0000157740 | DC76 | 76FF | 8DDA | D646 | 5016 | 76FF | FFEA | FC76 |
| 0000157760 | 76FF | 8DFA | DE4E | 5116 | 4E8D | 16F6 | 8D51 | D04E |
| 0000160000 | 5116 | 681E | 183E | 9768 | FF02 | 6236 | FF15 | 6036 |
| 0000160020 | FF15 | 6636 | FF15 | 6436 | 9A15 | 1F11 | 0000 | C483 |
| 0000160040 | 8B28 | D646 | 568B | E9D8 | 0346 | 1BF.9 | FF00 | 8636 |
| 0000160060 | FF7A | 8436 | FF7A | 8236 | FF7A | 8036 | 9A7A | 6DB2 |
| 0000160100 | 1C7A | C483 | E908 | 0328 | 71E9 | 2B02 | 89C0 | CC46 |
| 0000160120 | 4689 | C7CA | C846 | 0000 | 016A | 5EC4 | 2606 | 77FF |
| 0000160140 | 2602 | 37FF | DB9A | E025 | 8322 | 06C4 | 4689 | 89F0 |
| 0000160160 | F256 | 76FF | FFEE | EC76 | 468D | 16CA | 9A50 | 07B6 |
| 0000160200 | 200E | C483 | 8908 | F446 | 3E83 | 156E | 7400 | E903 |
| 0000160220 | 0078 | 068E | 7A72 | C426 | 821E | 260C | 1FC4 | 1F8D |
| 0000160240 | 359A | 0C99 | 8D23 | 6A1E | 9A7A | 9EE0 | 2316 | EC83 |
| 0000160260 | 8B08 | 9ADC | 9B29 | 233F | 068E | 7A72 | FF26 | 8436 |
| 0000160300 | 260C | 36FF | 0C82 | C29A | 657B | 8323 | 0CC4 | 068E |
| 0000160320 | 7A74 | C426 | 6A1E | 260C | 1FC4 | 1F8D | 359A | 4899 |
| 0000160340 | 8D23 | 6A1E | 9A7A | 9EE0 | 2352 | EC83 | 8B08 | 9ADC |

THU MAR 14 17:52:34 1991 TSLINT.DLL PAGE 62, LINE 3600

| | | | | | | | | |
|---|---|---|---|---|---|---|---|---|
| 0000160360 | 9B29 | 1D3C | 068E | 7A74 | FF26 | 6C36 | 260C | 36FF |
| 0000160400 | 0C6A | C29A | 687B | 831C | 0CC4 | 7E83 | FFF4 | 0374 |
| 0000160420 | 37E9 | C701 | 6E06 | 0015 | FF00 | CC76 | 76FF | 9ACA |
| 0000160440 | F91E | 23B3 | C483 | 8904 | C646 | 76FF | FFCC | CA76 |
| 0000160460 | 429A | C7AA | 8322 | 04C4 | 068E | 7A5A | 8326 | 7F3E |
| 0000160500 | 001F | 0375 | 55E9 | 8300 | D47E | 75FE | E903 | 004C |
| 0000160520 | E49A | 29F7 | 5223 | FF50 | C676 | 76FF | FFCC | CA76 |
| 0000160540 | 681E | 1826 | 468D | 16DE | 8D50 | F646 | 5016 | 468D |
| 0000160560 | 16D0 | 1E50 | 3E68 | 6818 | 02AB | 36FF | 1562 | 36FF |
| 0000160600 | 1560 | 36FF | 1566 | 36FF | 1564 | 681E | 1834 | 1768 |
| 0000160620 | 681D | 1D1A | 1D9A | 001D | 8300 | 30C4 | 068E | 7A5A |
| 0000160640 | 8326 | 9F3E | 0023 | 0375 | 09E9 | 8300 | D47E | 74FE |
| 0000160660 | E903 | 000F | 068E | 7A5C | 8326 | AB3E | 001F | 0375 |
| 0000160700 | 6CE9 | FF00 | 8636 | FF7A | 8436 | FF7A | 8236 | FF7A |
| 0000160720 | 8036 | 9A7A | 6DB2 | 24A2 | C483 | 8908 | D646 | 5689 |
| 0000160740 | FFD8 | DC76 | 76FF | 8DDA | D646 | 5016 | 76FF | FFEA |
| 0000160760 | FC76 | 76FF | 8DFA | DE4E | 5116 | 4E8D | 16F6 | 8D51 |
| 0000161000 | D04E | 5116 | 681E | 183E | AC68 | FF02 | 6236 | FF15 |
| 0000161020 | 6036 | FF15 | 6636 | FF15 | 6436 | 9A15 | 20A1 | 0000 |
| 0000161040 | C483 | 8B28 | D646 | 568B | E9D8 | 0144 | 1BE9 | FF00 |
| 0000161060 | 8636 | FF7A | 8436 | FF7A | 8236 | FF7A | 8036 | 9A7A |
| 0000161100 | 6DB2 | 24C2 | C483 | E908 | 0126 | 76FF | FFCC | CA76 |
| 0000161120 | 149A | 0351 | 8323 | 04C4 | FF50 | CC76 | 76FF | 9ACA |
| 0000161140 | 6DF8 | 24D4 | C483 | C406 | FD5E | 8926 | 2607 | 5789 |
| 0000161160 | 9A02 | 29E7 | 2393 | 068E | 7A8C | 8326 | C23E | D00A |
| 0000161200 | 0374 | 2CE9 | 8E00 | 6006 | 267A | 1EC4 | 0C76 | C426 |
| 0000161220 | 261F | 77FF | 8E0C | 6006 | 267A | 1EC4 | 0C76 | C426 |
| 0000161240 | 261F | 77FF | 260A | 77FF | 9A08 | 11C1 | 2436 | C483 |
| 0000161260 | 8E06 | 8C06 | 267A | 06C7 | 0AC2 | FFFF | D6C7 | 156E |
| 0000161300 | 0000 | 068E | 7A5A | 8326 | 033E | 0024 | 0375 | 09E9 |
| 0000161320 | 8300 | D47E | 74FE | E903 | 000F | 068E | 7A5C | 8326 |
| 0000161340 | 1B3E | 0024 | 0375 | 6CE9 | FF00 | 7036 | FF7A | 6E36 |
| 0000161360 | FF7A | 6C36 | FF7A | 6A36 | 9A7A | 6DB2 | 25C8 | C483 |
| 0000161400 | 8908 | D646 | 5689 | FFD8 | DC76 | 76FF | 8DDA | D646 |
| 0000161420 | 5016 | 76FF | FFEA | FC76 | 76FF | 8DFA | DE4E | 5116 |
| 0000161440 | 4E8D | 16F6 | 8D51 | D04E | 5116 | 681E | 183E | B768 |
| 0000161460 | FF02 | 6236 | FF15 | 6036 | FF15 | 6636 | FF15 | 6436 |
| 0000161500 | 9A15 | 247C | 0000 | C483 | 8B28 | D646 | 568B | E9D8 |
| 0000161520 | 001E | 1BE9 | FF00 | 7036 | FF7A | 6E36 | FF7A | 6C36 |
| 0000161540 | FF7A | 6A36 | 9A7A | 6DB2 | 250C | C483 | E908 | 0000 |
| 0000161560 | 5F5E | ED83 | 8B02 | 1FE5 | 4D5D | 1ECB | 9058 | 5545 |
| 0000161600 | EC8B | 8E1E | 81D8 | 0AEC | 5700 | 8B56 | 0846 | 460B |
| 0000161620 | 7406 | E903 | 0013 | 681E | 1849 | CB68 | 1E02 | 5968 |
| 0000161640 | 9A18 | B3B6 | 2382 | C483 | 8E0A | 6806 | 2B7A | 26C0 |
| 0000161660 | A2A3 | 260A | A0A3 | 8E0A | 8C06 | 267A | 06C7 | 0AC2 |
| 0000161700 | FFFF | 5EC4 | 2606 | 478B | E912 | 036E | 468B | 8B06 |
| 0000161720 | 0856 | 068E | 7A7E | 3926 | 9A06 | 740A | E903 | 0034 |
| 0000161740 | 3926 | 9C16 | 740A | E903 | 002A | C426 | 9A1E | 260A |
| 0000161760 | 1FC4 | 1F8D | 359A | 5C99 | 9A26 | 9BF7 | 24B3 | FF3D |
| 0000162000 | 74FF | E903 | 000E | 76FF | 680A | 7FFE | CF9A | 5C12 |
| 0000162020 | 8325 | 04C4 | 5EC4 | 2606 | 078B | 8B26 | 0257 | 068E |
| 0000162040 | 7A68 | A326 | 0AA0 | 8926 | A216 | 260A | 1EC4 | 0AA0 |
| 0000162060 | 8326 | 127F | 754E | E903 | 0013 | 681E | 1875 | D768 |
| 0000162100 | 1E02 | 8568 | 9A18 | B3B6 | 26CE | C483 | 8E0A | 6806 |
| 0000162120 | 267A | 1EC4 | 0AA0 | 8026 | 147F | 7400 | E903 | 0013 |
| 0000162140 | 681E | 18A1 | D968 | 1E02 | B168 | 9A18 | B3B6 | 2604 |
| 0000162160 | C483 | 8B0A | 0646 | 568B | E908 | 0300 | 5EC4 | 2606 |
| 0000162200 | 5F8B | C10C | 02E3 | 068E | 7A8E | C426 | 5636 | 2608 |
| 0000162220 | 008B | 8B26 | 0250 | 4689 | 89FA | FC56 | 5EC4 | 26FA |

THU MAR 14 17:52:34 1991 TSLINT.DLL PAGE 63, LINE 3659

| | | | | | | | | |
|---|---|---|---|---|---|---|---|---|
| 0000162240 | 078B | 8B26 | 0257 | 068E | 7A68 | A326 | 0AA0 | 8926 |
| 0000162260 | A216 | 260A | 1EC4 | 0AA0 | 8326 | 127F | 754E | E903 |
| 0000162300 | 0013 | 681E | 18CD | E268 | 1E02 | DD68 | 9A18 | B3B6 |
| 0000162320 | 2756 | C483 | 8E0A | 6806 | 267A | 1EC4 | 0AA0 | 8026 |
| 0000162340 | 147F | 7400 | E903 | 0013 | 681E | 18F9 | E468 | 1E02 |
| 0000162360 | 0968 | 9A19 | B3B6 | 26A8 | C483 | 8E0A | 6806 | 2B7A |
| 0000162400 | 26C0 | A2A3 | 260A | A0A3 | 8B0A | FA46 | 568B | E9FC |
| 0000162420 | 026A | 5EC4 | 2606 | 078B | 8B26 | 0257 | 068E | 7A90 |
| 0000162440 | A326 | 0AB0 | 8926 | B216 | 0B0A | 74D0 | E903 | 0010 |
| 0000162460 | 068E | 7A64 | A126 | 373A | 8B26 | 3C16 | E937 | 0039 |
| 0000162500 | 068E | 7A90 | C426 | B01E | 260A | 7F83 | 4E12 | 0374 |
| 0000162520 | 10E9 | 8E00 | 9006 | 267A | B0A1 | 260A | 168B | 0AB2 |
| 0000162540 | 16E9 | 8E00 | 9006 | 267A | 36FF | 0AB2 | FF26 | B036 |
| 0000162560 | 9A0A | 499F | 2730 | C483 | 8E04 | 9206 | 267A | 84A3 |
| 0000162600 | 260A | 1689 | 0A86 | FF26 | 8636 | 260A | 36FF | 0A84 |
| 0000162620 | 869A | 4E62 | 8328 | 04C4 | C28E | D88B | 1F8D | 359A |
| 0000162640 | 0699 | 9A28 | 9BF7 | 2657 | 068E | 7A8C | A326 | 0AC2 |
| 0000162660 | 068E | 7A92 | A126 | 0A86 | 0B26 | 8406 | 750A | E903 |
| 0000162700 | 0034 | C426 | 841E | 260A | 47F6 | 0214 | 0375 | 22E9 |
| 0000162720 | 8E00 | 9206 | 267A | 84A1 | 260A | 168B | 0A86 | 068E |
| 0000162740 | 7A68 | A326 | 0AA0 | 8926 | A216 | 9A0A | 29E7 | 2885 |
| 0000162760 | 00E9 | E900 | 0000 | 068E | 7A8C | 8326 | C23E | 000A |
| 0000163000 | 037C | 11E9 | 2600 | 36FF | 0AC2 | 681E | 1925 | B69A |
| 0000163020 | 4AB3 | 8329 | 06C4 | 76FF | 8E0A | 8C06 | 267A | 36FF |
| 0000163040 | 0AC2 | CF9A | FBI2 | 8328 | 04C4 | 4689 | 89F6 | F856 |
| 0000163060 | 5EC4 | 26F6 | 078B | 8B26 | 0257 | 068E | 7A68 | A326 |
| 0000163100 | 0AA0 | 8926 | A216 | 8B0A | F646 | 568B | E9F8 | 012C |
| 0000163120 | 5EC4 | 2606 | 078B | 8B26 | 0257 | 4689 | 89FA | FC56 |
| 0000163140 | 5EC4 | 26FA | 7F83 | 2812 | 0374 | 20E9 | C400 | FA5E |
| 0000163160 | 8B26 | 0C5F | E3C1 | 8E02 | 8E06 | 267A | 36C4 | 0856 |
| 0000163200 | 8B26 | 2600 | 508B | 8902 | FA46 | 5689 | C4FC | 065C |
| 0000163220 | FF26 | 0677 | FF26 | 0477 | 6E9A | 0B4D | 8329 | 04C4 |
| 0000163240 | 5052 | 76FF | FFFC | FA76 | F29A | 6F57 | 8326 | 08C4 |
| 0000163260 | 4689 | 89F6 | F856 | 5EC4 | 26F6 | 078B | 8B26 | 0257 |
| 0000163300 | 068E | 7A68 | A326 | 0AA0 | 8926 | A216 | 260A | 1EC4 |
| 0000163320 | 0AA0 | 8326 | 127F | 754E | E903 | 0013 | 681E | 1940 |
| 0000163340 | FA68 | 1E02 | 5068 | 9A19 | B3B6 | 2970 | C483 | 8E0A |
| 0000163360 | 6806 | 267A | 1EC4 | 0AA0 | 8026 | 147F | 7400 | E903 |
| 0000163400 | 0013 | 681E | 196C | FC68 | 1E02 | 7C68 | 9A19 | B3B6 |
| 0000163420 | 2992 | C483 | 8B0A | F646 | 568B | E9F8 | 005E | 5EC4 |
| 0000163440 | 2606 | 1FC4 | FF26 | 0277 | FF26 | 1E37 | 9868 | 9A19 |
| 0000163460 | B3B6 | 27D4 | C483 | E908 | 0039 | 283D | 7500 | E903 |
| 0000163500 | FD3A | 037E | 13E9 | 2D00 | 0007 | 0375 | 01E9 | 2DFF |
| 0000163520 | 0007 | 0375 | RBE9 | E9FD | 0019 | 3D2D | 7D00 | E903 |
| 0000163540 | 0011 | 7F46 | E903 | FC64 | 052D | 7500 | E903 | FFAE |
| 0000163560 | 00E9 | B800 | 0000 | 00BA | E900 | 0000 | 5F5E | ED83 |
| 0000163600 | 8B02 | 1FE5 | 4D5D | 1ECB | 9058 | 5545 | EC8B | 8E1E |
| 0000163620 | 81D8 | 26EC | 5700 | C756 | FA46 | 19C6 | 5E8C | C7FC |
| 0000163640 | F446 | 0000 | C02B | 4689 | 89E6 | E446 | 068E | 7A5A |
| 0000163660 | 8326 | A33E | 002A | 0375 | 1DE9 | FF00 | 6636 | FF15 |
| 0000163700 | 6436 | 8D15 | DC46 | 5016 | 959A | 001F | 8300 | 08C4 |
| 0000163720 | 003D | 7400 | E903 | 000F | 068E | 7A5C | 8326 | BB3E |
| 0000163740 | 002A | 0375 | 3BE9 | 1E00 | CA68 | 8D19 | E846 | 5016 |
| 0000163760 | 468D | 16DC | 8D50 | F646 | 5016 | 0B68 | 1E03 | 3E68 |
| 0000164000 | FF1A | 6236 | FF15 | 6036 | FF15 | 6636 | FF15 | 6436 |
| 0000164020 | 9A15 | 1FDE | 0000 | C483 | 891E | F646 | 5689 | E9F8 |
| 0000164040 | 0008 | C02B | 4689 | 89F8 | F646 | 068E | 7A68 | A126 |
| 0000164060 | 0AA2 | 0B26 | A006 | 740A | E903 | 0063 | 068E | 7A5A |
| 0000164100 | 8326 | 353E | 002B | 0375 | 09E9 | 8300 | E07E | 74FE |

THU MAR 14 17:52:34 1991 TSLINT.DLL PAGE 64, LINE 3718

| | | | | | | | | |
|---|---|---|---|---|---|---|---|---|
| 0000164120 | E903 | 000F | 068E | 7A5C | 8326 | 4D3E | 002B | 0375 |
| 0000164140 | 39E9 | 8D00 | E846 | 5016 | 468D | 16F6 | 8D50 | DC46 |
| 0000164160 | 5016 | 681E | 1A3E | 0E68 | FF03 | 6236 | FF15 | 6036 |
| 0000164200 | FF15 | 6636 | FF15 | 6436 | 9A15 | 2B7C | 0000 | C483 |
| 0000164220 | C71A | E246 | 0000 | 0DE9 | E903 | 0003 | 07E9 | 8E03 |
| 0000164240 | 6406 | 267A | 3AA1 | 2637 | 168B | 373C | 068E | 7A68 |
| 0000164260 | 3926 | A006 | 740A | E903 | 0077 | 3926 | A216 | 740A |
| 0000164300 | E903 | 006D | C02B | A326 | 0AA2 | A326 | 0AA0 | 068E |
| 0000164320 | 7A5A | 8326 | 293E | 0025 | 0375 | 09E9 | 8300 | E07E |
| 0000164340 | 74FE | E903 | 000F | 068E | 7A5C | 8326 | 413E | 0025 |
| 0000164360 | 0375 | 39E9 | 8D00 | E846 | 5016 | 468D | 16F6 | 8D50 |
| 0000164400 | DC46 | 5016 | 681E | 1A3E | 1168 | FF03 | 6236 | FF15 |
| 0000164420 | 6036 | FF15 | 6636 | FF15 | 6436 | 9A15 | 0796 | 0000 |
| 0000164440 | C483 | C71A | E246 | 0000 | 7BE9 | E902 | 0003 | 75E9 |
| 0000164460 | 8E02 | 6806 | 267A | 1EC4 | 0AA0 | 8026 | 147F | 7400 |
| 0000164500 | E903 | 0013 | 681E | 19CE | 1568 | 1E03 | DE68 | 9A19 |
| 0000164520 | B3B6 | 2BFE | C483 | 8E0A | 6806 | 267A | 1EC4 | 0AA0 |
| 0000164540 | F626 | 1447 | 7401 | E903 | 0013 | 068E | 7A68 | C426 |
| 0000164560 | A01E | 260A | 47F6 | 0214 | 0375 | B8E9 | 8E01 | 6806 |
| 0000164600 | 267A | 1EC4 | 0AA0 | F626 | 1447 | 7504 | E903 | 0013 |
| 0000164620 | 681E | 19FA | 1A68 | 1E03 | 0A68 | 9A1A | B3B6 | 2871 |
| 0000164640 | C483 | 8E0A | 6806 | 267A | 1EC4 | 0AA0 | F626 | 1447 |
| 0000164660 | 7510 | E903 | 0169 | 068E | 7A68 | C426 | A01E | 260A |
| 0000164700 | 7F80 | 000E | 0377 | 20E9 | 8E00 | 6806 | 267A | 1EC4 |
| 0000164720 | 0AA0 | 8026 | 0E7F | 75FF | E903 | 000D | 068E | 7A68 |
| 0000164740 | C426 | A01E | 260A | 4FFE | 8E0E | 6806 | 267A | 1EC4 |
| 0000164760 | 0AA0 | 8026 | 0E7F | 7700 | E903 | 007F | 068E | 7A68 |
| 0000165000 | C426 | A01E | 260A | 6780 | FD14 | 068E | 7A68 | C02B |
| 0000165020 | A326 | 0AA2 | A326 | 0AA0 | 068E | 7A5A | 8326 | 133E |
| 0000165040 | 002A | 0375 | 09E9 | 8300 | E07E | 74FE | E903 | 000F |
| 0000165060 | 068E | 7A5C | 8326 | 3F3E | 002A | 0375 | 39E9 | 8D00 |
| 0000165100 | E846 | 5016 | 468D | 16F6 | 8D50 | DC46 | 5016 | 681E |
| 0000165120 | 1A3E | 2268 | FF03 | 6236 | FF15 | 6036 | FF15 | 6636 |
| 0000165140 | FF15 | 6436 | 9A15 | 2AEA | 0000 | C483 | C71A | E246 |
| 0000165160 | 0000 | 31E9 | E901 | 0003 | 2BE9 | 8E01 | 6806 | 267A |
| 0000165200 | 1EC4 | 0AA0 | FF26 | 0A77 | FF26 | 0877 | 1E9A | 2BF9 |
| 0000165220 | 832D | 04C4 | 4689 | 8EDA | 6806 | 267A | 1EC4 | 0AA0 |
| 0000165240 | FF26 | 0A77 | FF26 | 0877 | 429A | F3AA | 8327 | 04C4 |
| 0000165260 | 068E | 7A5A | 8326 | 7F3E | 002C | 0375 | 60E9 | 8300 |
| 0000165300 | E07E | 75FE | E903 | 0057 | E49A | B2F7 | 522B | FF50 |
| 0000165320 | DA76 | 068E | 7A68 | C426 | A01E | 260A | 77FF | 260A |
| 0000165340 | 77FF | 1E08 | 2668 | 8D1A | E846 | 5016 | 468D | 16F6 |
| 0000165360 | 8D50 | DC46 | 5016 | 681E | 1A3E | 2468 | FF03 | 6236 |
| 0000165400 | FF15 | 6036 | FF15 | 6636 | FF15 | 6436 | 1E15 | 3468 |
| 0000165420 | 681A | 23EF | F268 | 9A23 | 23F5 | 0000 | C483 | 8E30 |
| 0000165440 | 6806 | 267A | 36FF | 0AA2 | FF26 | A036 | 9A0A | B4E2 |
| 0000165460 | 2D0B | C483 | 8E04 | 6806 | 2B7A | 26C0 | A2A3 | 260A |
| 0000165500 | A0A3 | 8E0A | 5A06 | 267A | 3E83 | 2D17 | 7500 | E903 |
| 0000165520 | 0009 | 7E83 | FEE0 | 0374 | 0FE9 | 8E00 | 5C06 | 267A |
| 0000165540 | 3E83 | 2C97 | 7500 | E903 | 0039 | 468D | 16E8 | 8D50 |
| 0000165560 | F646 | 5016 | 468D | 16DC | 1E50 | 3E68 | 681A | 0329 |
| 0000165600 | 36FF | 1562 | 36FF | 1560 | 36FF | 1566 | 36FF | 1564 |
| 0000165620 | C69A | 002C | 8300 | 1AC4 | 46C7 | 00E2 | E900 | 0006 |
| 0000165640 | 03E9 | E900 | 0000 | 5F5E | ED83 | 8B02 | 1FE5 | 4D5D |
| 0000165660 | 1ECB | 9058 | 5545 | EC8B | 8E1E | 81D8 | 10EC | 5700 |
| 0000165700 | C756 | F846 | FFFF | 78A1 | 0B1A | 7606 | 751A | E903 |
| 0000165720 | 0018 | 1EC4 | 1A76 | 8326 | 0C7F | 75FF | E903 | 000A |
| 0000165740 | 76A1 | 8B1A | 7316 | E91A | 0220 | 04E9 | FF00 | 7206 |
| 0000165760 | 8E1A | 9406 | 267A | 1EC4 | 0A7C | C426 | 8D1F | 9A1F |

THU MAR 14 17:52:34 1991 TSLINT.DLL PAGE 65, LINE 3777

| | | | | | | | | |
|---|---|---|---|---|---|---|---|---|
| 0000166000 | 9935 | 2E67 | F79A | 799B | 3B2E | 7206 | 7F1A | E903 |
| 0000166020 | 01B7 | 1E8D | 1A72 | DE9A | 8399 | 832E | 08EC | DC8B |
| 0000166040 | 299A | 019B | 9A28 | 6DB2 | 2D90 | C483 | 5208 | 8E50 |
| 0000166060 | 9606 | 267A | 36FF | 0ABA | FF26 | B836 | 9A0A | 57F2 |
| 0000166100 | 2F20 | C483 | 8E08 | 8BC2 | 26D8 | 1FC4 | 8B26 | 0847 |
| 0000166120 | 8B26 | 0A57 | 4689 | 89F4 | F656 | 5EC4 | 26F4 | 3F80 |
| 0000166140 | 7400 | E903 | 0003 | 84E9 | 6AFF | FF3D | F676 | 76FF |
| 0000166160 | 9AF4 | 6466 | 2F11 | C483 | 8906 | FA46 | 5689 | 8BFC |
| 0000166200 | FC46 | 460B | 75FA | E903 | 0052 | 5EC4 | FFFA | FA46 |
| 0000166220 | C626 | 0007 | 76FF | FFF6 | F476 | CB9A | B00E | 832F |
| 0000166240 | 04C4 | 4689 | 89F0 | F256 | 76FF | FFFC | FA76 | 149A |
| 0000166260 | 5B51 | 832F | 04C4 | FF50 | FC76 | 76FF | 9AFA | 6DF8 |
| 0000166300 | 2E88 | C483 | C406 | F05E | 8926 | 2607 | 5789 | FF02 |
| 0000166320 | FA4E | 5EC4 | 26FA | 07C6 | E93D | 00EA | 06FF | 1A74 |
| 0000166340 | 5EC4 | A0F4 | 1A47 | 3826 | 7407 | E903 | 0022 | 681E |
| 0000166360 | 1A49 | 76FF | FFF6 | F476 | EA9A | 7B50 | 832F | 08C4 |
| 0000166400 | 003D | 7400 | E903 | 0008 | 46C7 | 00F8 | E900 | 0013 |
| 0000166420 | 006A | 76FF | FFF6 | F476 | A79A | 8F48 | 832F | 06C4 |
| 0000166440 | 4689 | 83F8 | F87E | 74FF | E903 | 0029 | C09A | 6230 |
| 0000166460 | 8E2E | 8BC2 | 26D8 | 1F8B | E3C1 | FF02 | 26B7 | FF78 |
| 0000166500 | 24B7 | FF78 | F676 | 76FF | 1EF4 | 4B68 | 9A1A | B3B6 |
| 0000166520 | 2CEF | C483 | 8E0C | 9806 | 267A | 1EC4 | 007C | 8B26 |
| 0000166540 | 2607 | 578B | 8E02 | 6806 | 267A | A0A3 | 260A | 1689 |
| 0000166560 | 0AA2 | E79A | EF29 | FF2F | F676 | 76FF | 9AF4 | 5114 |
| 0000166600 | 2ED4 | C483 | 5004 | 76FF | FFF6 | F476 | F89A | 546D |
| 0000166620 | 8330 | 06C4 | 068E | 7A98 | C426 | 7C1E | 2600 | 0789 |
| 0000166640 | 8926 | 0257 | 068E | 7A74 | C426 | 6A1E | 260C | 078B |
| 0000166660 | 8B26 | 0257 | F88B | 80BE | 8E7A | A5C2 | A5A5 | FFA5 |
| 0000166700 | 7206 | E91A | 0003 | 24E9 | 83FE | 743E | 001A | 0374 |
| 0000166720 | 09E9 | FF00 | 7406 | C71A | F846 | 0000 | 7E83 | FFF8 |
| 0000166740 | 0374 | 09E9 | B800 | 0000 | 00BA | E900 | 001C | 76FF |
| 0000166760 | 9AF8 | 3075 | 2EA0 | C483 | A302 | 1A76 | 1689 | 1A78 |
| 0000167000 | 76A1 | 8B1A | 7816 | E91A | 0000 | 5F5E | ED83 | 8B02 |
| 0000167020 | 1FE5 | 4D5D | 1ECB | 905B | 5545 | EC8B | 8E1E | 81D8 |
| 0000167040 | 4CEC | 5700 | C756 | FA46 | 1A7A | 5E8C | C7FC | D246 |
| 0000167060 | 0107 | C02B | 4689 | 89C4 | C246 | 068E | 7A5A | 8326 |
| 0000167100 | 283E | 0031 | 0375 | 1DE9 | FF00 | 6636 | FF15 | 6436 |
| 0000167120 | 8D15 | B846 | 5016 | 299A | 002A | 8300 | 08C4 | 003D |
| 0000167140 | 7400 | E903 | 000F | 068E | 7A5C | 8326 | 403E | 0031 |
| 0000167160 | 0375 | 3BE9 | 1E00 | 8268 | 8D1A | C646 | 5016 | 468D |
| 0000167200 | 16B8 | 8D50 | F646 | 5016 | 6868 | 1E03 | 0E68 | FF1B |
| 0000167220 | 6236 | FF15 | 6036 | FF15 | 6636 | FF15 | 6436 | 9A15 |
| 0000167240 | 2A72 | 0000 | C483 | 891E | F646 | 5689 | E9F8 | 0008 |
| 0000167260 | C02B | 4689 | 89F8 | F646 | 7E83 | FF06 | 0374 | 86E9 |
| 0000167300 | 8E00 | 5A06 | 267A | 3E83 | 31E0 | 7500 | E903 | 0009 |
| 0000167320 | 7E83 | FEBC | 0374 | 0FE9 | 8E00 | 5C06 | 267A | 3E83 |
| 0000167340 | 2DC2 | 7500 | E903 | 0056 | C02B | 4689 | 89C0 | BE46 |
| 0000167360 | 76FF | FFC4 | C276 | 468D | 16BE | FF50 | D276 | 76FF |
| 0000167400 | FFFC | FA76 | 4E8D | 16C6 | 8D51 | F64E | 5116 | 4E8D |
| 0000167420 | 16B8 | 1E51 | 0E68 | 681B | 037A | 36FF | 1562 | 36FF |
| 0000167440 | 1560 | 36FF | 1566 | 36FF | 1564 | A29A | 0025 | 8300 |
| 0000167460 | 28C4 | 468B | 8BBE | C056 | A7E9 | E903 | 0009 | 00B8 |
| 0000167500 | BA00 | 0000 | 9BE9 | 9A03 | E352 | 31D4 | 8E50 | 5E06 |
| 0000167520 | 267A | 70A0 | 5026 | 146A | 879A | D5AC | 832F | 06C4 |
| 0000167540 | 4689 | 89F2 | F456 | D00B | 0374 | DCE9 | 1E00 | 8A68 |
| 0000167560 | 9A1A | B3B6 | 31F4 | C483 | 8E04 | 5A06 | 267A | 3E83 |
| 0000167600 | 2DAA | 7500 | E903 | 0061 | 7E83 | FEBC | 0375 | 58E9 |
| 0000167620 | 9A00 | F7E4 | 3201 | 5052 | 76FF | FFF4 | F276 | 1E9A |
| 0000167640 | FDF9 | 832E | 04C4 | FF50 | F476 | 76FF | 1EF2 | 9968 |

THU MAR 14 17:52:34 1991 TSLINT.DLL PAGE 66, LINE 3836

| | | | | | | | | |
|---|---|---|---|---|---|---|---|---|
| 0000167660 | 8D1A | C646 | 5016 | 468D | 16F6 | 8D50 | B846 | 5016 |
| 0000167700 | 681E | 1B0E | 7B68 | FF03 | 6236 | FF15 | 6036 | FF15 |
| 0000167720 | 6636 | FF15 | 6436 | 1E15 | A768 | 681A | 2D72 | 7568 |
| 0000167740 | 9A2D | 2D78 | 0000 | C483 | FF30 | 0676 | B09A | E053 |
| 0000167760 | 832F | 02C4 | 003D | 7500 | E903 | 000C | 5EC4 | 26F2 |
| 0000170000 | 47C7 | 800A | E900 | 007E | 468D | 16D4 | FF50 | 0676 |
| 0000170020 | B69A | 9C75 | 8332 | 06C4 | 7440 | E903 | 0012 | 76FF |
| 0000170040 | 1E06 | B068 | 9A1A | B3B6 | 3305 | C483 | E906 | 0056 |
| 0000170060 | 006A | 006A | 006A | 76FF | 9A06 | 4828 | 32E9 | C483 |
| 0000170100 | 3D08 | FFFF | 0374 | 14E9 | 8300 | FFFA | 0374 | 0CE9 |
| 0000170120 | C400 | F25E | C726 | 0A47 | D200 | 29E9 | 8300 | E47E |
| 0000170140 | 7D00 | E903 | 0015 | 037E | 0AE9 | 8100 | E27E | 0200 |
| 0000170160 | 0373 | 06E9 | B800 | 0200 | 04E9 | 8B00 | E246 | C440 |
| 0000170200 | F25E | 8926 | 0A47 | C09A | 4F30 | 8932 | B446 | 5689 |
| 0000170220 | C4B6 | B45E | C726 | 0007 | 8B00 | 0646 | 5EC4 | 26F2 |
| 0000170240 | 0789 | 529A | 42E3 | 5033 | 068E | 7A5E | A026 | 2670 |
| 0000170260 | C450 | F25E | FF26 | 0A77 | 879A | 12AC | 8334 | 06C4 |
| 0000170300 | 5EC4 | 26F2 | 4789 | 2602 | 5789 | C404 | F25E | 8B26 |
| 0000170320 | 0447 | 0B26 | 0247 | 0374 | 0CE9 | 1E00 | C168 | 9A1A |
| 0000170340 | B3B6 | 3362 | C483 | 8E04 | 5A06 | 267A | 3E83 | 3445 |
| 0000170360 | 7500 | E903 | 006B | 7E83 | FEBC | 0375 | 62E9 | 9A00 |
| 0000170400 | F7E4 | 3374 | 5052 | 5EC4 | 26F2 | 77FF | 2604 | 77FF |
| 0000170420 | 9A02 | F91E | 33FC | C483 | 5004 | 5EC4 | 26F2 | 77FF |
| 0000170440 | 2604 | 77FF | 1E02 | D068 | 8D1A | C646 | 5016 | 468D |
| 0000170460 | 16F6 | 8D50 | B846 | 5016 | 681E | 1B0E | 8768 | FF03 |
| 0000170500 | 6236 | FF15 | 6036 | FF15 | 6636 | FF15 | 6436 | 1E15 |
| 0000170520 | DE68 | 681A | 34AB | AE68 | 9A34 | 34B1 | 0000 | C483 |
| 0000170540 | C430 | F25E | 8B26 | 0247 | 8B26 | 0457 | 5EC4 | 26F2 |
| 0000170560 | 4789 | 2606 | 5789 | C408 | F25E | C726 | 0C47 | 0000 |
| 0000170600 | 5EC4 | 26F2 | 478B | 3D0A | 0080 | 037F | 03E9 | B800 |
| 0000170620 | 0080 | 5EC4 | 26F2 | 4789 | 9A12 | E352 | 3439 | 8E50 |
| 0000170640 | 5E06 | 267A | 70A0 | 5026 | 5EC4 | 26F2 | 77FF | 9A12 |
| 0000170660 | AC87 | 31BB | C483 | C406 | F25E | 8926 | 0E47 | 8926 |
| 0000170700 | 1057 | 5EC4 | 26F2 | 478B | 2610 | 470B | 740E | E903 |
| 0000170720 | 000C | 681E | 1AE7 | B69A | 59B3 | 8334 | 04C4 | 068E |
| 0000170740 | 7A5A | 8326 | BF3E | 0034 | 0375 | 6BE9 | 8300 | BC7E |
| 0000170760 | 75FE | E903 | 0062 | E49A | 6BF7 | 5234 | C450 | F25E |
| 0000171000 | FF26 | 1077 | FF26 | 0E77 | 1E9A | AAF9 | 8331 | 04C4 |
| 0000171020 | C450 | F25E | FF26 | 1077 | FF26 | 0E77 | 681E | 1AF6 |
| 0000171040 | 468D | 16C6 | 8D50 | F646 | 5016 | 468D | 16B8 | 1E50 |
| 0000171060 | 0E68 | 681B | 038B | 36FF | 1562 | 36FF | 1560 | 36FF |
| 0000171100 | 1566 | 36FF | 1564 | 681E | 1B04 | 3C68 | 6832 | 323F |
| 0000171120 | 429A | 0032 | 8300 | 30C4 | 068E | 7A5A | 8326 | A13E |
| 0000171140 | 0030 | 0375 | 09E9 | 8300 | BC7E | 74FE | E903 | 000F |
| 0000171160 | 068E | 7A5C | 8326 | CD3E | 0030 | 0375 | 5AE9 | 8B00 |
| 0000171200 | F246 | 568B | 89F4 | BE46 | 5689 | FFC0 | C476 | 76FF |
| 0000171220 | 8DC2 | BE46 | 5016 | 76FF | FFD2 | FC76 | 76FF | 8DFA |
| 0000171240 | C64E | 5116 | 4E8D | 16F6 | 8D51 | B84E | 5116 | 681E |
| 0000171260 | 1B0E | 8C68 | FF03 | 6236 | FF15 | 6036 | FF15 | 6636 |
| 0000171300 | FF15 | 6436 | 9A15 | 318B | 0000 | C483 | 8B28 | BE46 |
| 0000171320 | 568B | E9C0 | 000C | 09E9 | 8B00 | F246 | 568B | E9F4 |
| 0000171340 | 0000 | 5F5E | ED83 | 8B02 | 1FE5 | 4D5D | 1ECB | 9058 |
| 0000171360 | 5545 | EC8B | 8E1E | 81D8 | 06EC | 5700 | 9A56 | 2E11 |
| 0000171400 | 3578 | 4689 | 89FA | FC56 | D00B | 0375 | 23E9 | FF00 |
| 0000171420 | FC76 | 76FF | 9AFA | 38B4 | 331B | C483 | 8E04 | 9A06 |
| 0000171440 | 267A | 3E83 | 3D0E | 7500 | E903 | 0003 | 03E9 | E900 |
| 0000171460 | FFCB | 5F5E | ED83 | 8B02 | 1FE5 | 4D5D | 1ECB | 9058 |
| 0000171500 | 5545 | EC8B | 8E1E | 81D8 | 28EC | 5700 | C756 | FA46 |
| 0000171520 | 1B18 | 5E8C | C7FC | F446 | 0101 | C02B | 4689 | 89E4 |

THU MAR 14 17:52:34 1991 TSLINT.DLL PAGE 67, LINE 3895

| | | | | | | | | |
|---|---|---|---|---|---|---|---|---|
| 0000171540 | E246 | 068E | 7A5A | 8326 | 4E3E | 0033 | 0375 | 1DE9 |
| 0000171560 | FF00 | 6636 | FF15 | 6436 | 8D15 | DA46 | 5016 | B79A |
| 0000171600 | 0030 | 8300 | 08C4 | 003D | 7400 | E903 | 000F | 068E |
| 0000171620 | 7A5C | 8326 | D73E | 0034 | 0375 | 3BE9 | 1E00 | 1C68 |
| 0000171640 | 8D1B | E846 | 5016 | 468D | 16DA | 8D50 | F646 | 5016 |
| 0000171660 | A368 | 1E03 | 7C68 | FF1B | 6236 | FF15 | 6036 | FF15 |
| 0000171700 | 6636 | FF15 | 6436 | 9A15 | 3100 | 0000 | C483 | 891E |
| 0000171720 | F646 | 5689 | E9F8 | 0008 | C02B | 4689 | 89F8 | F646 |
| 0000171740 | 5EC4 | 2606 | 37FF | DE9A | 7347 | 8332 | 02C4 | 4689 |
| 0000171760 | 83E6 | E67E | 74FF | E903 | 000C | 681E | 1B20 | 4A9A |
| 0000172000 | 88B2 | 8332 | 04C4 | 5EC4 | 2606 | 77FF | 2604 | 77FF |
| 0000172020 | 9A02 | F91E | 36AA | C483 | 8904 | D846 | 5EC4 | 2606 |
| 0000172040 | 77FF | 2604 | 77FF | 9A02 | AA42 | 3560 | C483 | 8E04 |
| 0000172060 | 5A06 | 267A | 3E83 | 35C9 | 7500 | E903 | 005A | 7E83 |
| 0000172100 | FEDE | 0375 | 51E9 | 9A00 | F7E4 | 3661 | 5052 | 76FF |
| 0000172120 | C4D8 | 065E | FF26 | 0477 | FF26 | 0277 | 681E | 1B36 |
| 0000172140 | 468D | 16E8 | 8D50 | F646 | 5016 | 468D | 16DA | 1E50 |
| 0000172160 | 7C68 | 681B | 03AA | 36FF | 1562 | 36FF | 1560 | 36FF |
| 0000172200 | 1566 | 36FF | 1564 | 681E | 1B44 | B468 | 6833 | 33B7 |
| 0000172220 | BA9A | 0033 | 8300 | 30C4 | 5EC4 | 2606 | 77FF | 2610 |
| 0000172240 | 77FF | 9A0E | F91E | 373C | C483 | 8904 | D846 | 5EC4 |
| 0000172260 | 2606 | 77FF | 2610 | 77FF | 9A0E | AA42 | 368A | C483 |
| 0000172300 | 8E04 | 5A06 | 267A | 3E83 | 3696 | 7500 | E903 | 005A |
| 0000172320 | 7E83 | FEDE | 0375 | 51E9 | 9A00 | F7E4 | 3674 | 5052 |
| 0000172340 | 76FF | C4D8 | 065E | FF26 | 1077 | FF26 | 0E77 | 681E |
| 0000172360 | 1B4D | 468D | 16E8 | 8D50 | F646 | 5016 | 468D | 16DA |
| 0000172400 | 1E50 | 7C68 | 681B | 03AB | 36FF | 1562 | 36FF | 1560 |
| 0000172420 | 36FF | 1566 | 36FF | 1564 | 681E | 1B5B | EB68 | 6836 |
| 0000172440 | 36EE | F19A | 0036 | 8300 | 30C4 | 76FF | FF08 | 0676 |
| 0000172460 | 1E9A | C4F9 | 8337 | 04C4 | 4689 | FFD8 | 0876 | 76FF |
| 0000172500 | 9A06 | AA42 | 371C | C483 | 8E04 | 5A06 | 267A | 3E83 |
| 0000172520 | 3728 | 7500 | E903 | 0055 | 7E83 | FEDE | 0375 | 4CE9 |
| 0000172540 | 9A00 | F7E4 | 3706 | 5052 | 76FF | FFD8 | 0876 | 76FF |
| 0000172560 | 1E06 | 6468 | 8D1B | E846 | 5016 | 468D | 16F6 | 8D50 |
| 0000172600 | DA46 | 5016 | 681E | 1B7C | AC68 | FF03 | 6236 | FF15 |
| 0000172620 | 6036 | FF15 | 6636 | FF15 | 6436 | 1E15 | 7268 | 681B |
| 0000172640 | 377D | 8068 | 9A37 | 3783 | 0000 | C483 | 8E30 | 5A06 |
| 0000172660 | 267A | 3E83 | 37B0 | 7500 | E903 | 0009 | 7E83 | FEDE |
| 0000172700 | 0374 | 0FE9 | 8E00 | 5C06 | 267A | 3E83 | 35F5 | 7500 |
| 0000172720 | E903 | 0060 | 7E83 | FFE6 | 0374 | 06E9 | B800 | 0001 |
| 0000172740 | 03E9 | B800 | 0000 | 4689 | FFE0 | E476 | 76FF | 8DE2 |
| 0000172760 | E046 | 5016 | 76FF | FFF4 | FC76 | 76FF | 8DFA | E84E |
| 0000173000 | 5116 | 4E8D | 16F6 | 8D51 | DA4E | 5116 | 681E | 1B7C |
| 0000173020 | AD68 | FF03 | 6236 | FF15 | 6036 | FF15 | 6636 | FF15 |
| 0000173040 | 6436 | 9A15 | 3526 | 0000 | C483 | 8B28 | E046 | 18E9 |
| 0000173060 | E900 | 0015 | 7E83 | FFE6 | 0374 | 06E9 | B800 | 0001 |
| 0000173100 | 03E9 | B800 | 0000 | 00E9 | 5E00 | 835F | 02ED | E58B |
| 0000173120 | 5D1F | CB4D | 581E | 4590 | 8B55 | 1EEC | D88E | EC81 |
| 0000173140 | 0000 | 5657 | 76FF | FF08 | 0676 | DB9A | A410 | 8337 |
| 0000173160 | 04C4 | 003D | 7400 | E903 | 0037 | 068E | 7A9C | FF26 |
| 0000173200 | 7436 | 260C | 36FF | 0C72 | 029A | 932D | 8337 | 04C4 |
| 0000173220 | 003D | 7500 | E903 | 0019 | 76FF | FF08 | 0676 | DB9A |
| 0000173240 | 1A10 | 8339 | 04C4 | 003D | 7400 | E903 | 0003 | C9E9 |
| 0000173260 | FFFF | 0876 | 76FF | 9A06 | 359D | 38CD | C483 | 5E04 |
| 0000173300 | 835F | 02ED | E58B | 5D1F | CB4D | 581E | 4590 | 8B55 |
| 0000173320 | 1EEC | D88E | EC81 | 0006 | 5657 | 068E | 7A9E | C426 |
| 0000173340 | 001E | 2600 | 77FF | 2602 | 37FF | 149A | 0165 | 8339 |
| 0000173360 | 04C4 | 4689 | 89FA | FC56 | 5EC4 | 26FA | 7F83 | 000C |
| 0000173400 | 0374 | 06E9 | B800 | 0000 | 0EE9 | C400 | FA5E | C426 |

THU MAR 14 17:52:34 1991 TSLINT.DLL PAGE 68, LINE 3954

| | | | | | | | | |
|---|---|---|---|---|---|---|---|---|
| 0000173420 | 085F | 8A26 | 9807 | 00E9 | 5E00 | 835F | 02ED | E58B |
| 0000173440 | 5D1F | CB4D | 581E | 4590 | 8B55 | 1EEC | D88E | EC81 |
| 0000173460 | 0042 | 5657 | 46C7 | 86FA | 8C1B | FC5E | 46C7 | 07EE |
| 0000173500 | 2B01 | 89C0 | E046 | 4689 | 8EDE | 5A06 | 267A | 3E83 |
| 0000173520 | 3814 | 7500 | E903 | 001D | 36FF | 1566 | 36FF | 1564 |
| 0000173540 | 468D | 16D4 | 9A50 | 35DF | 0000 | C483 | 3D08 | 0000 |
| 0000173560 | 0374 | 0FE9 | 8E00 | 5C06 | 267A | 3E83 | 382C | 7500 |
| 0000173600 | E903 | 003B | 681E | 1B98 | 468D | 16E2 | 8D50 | D446 |
| 0000173620 | 5016 | 468D | 16F0 | 6850 | 03D1 | 631E | 1D3C | 36FF |
| 0000173640 | 1562 | 36FF | 1560 | 36FF | 1566 | 36FF | 1564 | 289A |
| 0000173660 | 0036 | 8300 | 1EC4 | 4689 | 89F0 | F256 | 08E9 | 2B00 |
| 0000173700 | 89C0 | F246 | 4689 | C7F0 | F446 | 0000 | 46C7 | AAF6 |
| 0000173720 | 8C1B | F85E | 46C7 | 00D2 | C400 | 065E | 8B26 | 1247 |
| 0000173740 | E0E9 | C700 | D246 | 0010 | 4E83 | 09D2 | F1E9 | 8E00 |
| 0000173760 | A006 | 267A | 36FF | 3740 | FF26 | 3E36 | 1E37 | AD68 |
| 0000174000 | 1E1B | 0068 | 9A71 | 3238 | 3C45 | C483 | 1E0C | C568 |
| 0000174020 | 9A1B | 69A0 | 127A | C483 | 8E04 | 5A06 | 267A | 3E83 |
| 0000174040 | 3CB6 | 7500 | E903 | 0009 | 7E83 | FED8 | 0374 | 0FE9 |
| 0000174060 | 8E00 | 5C06 | 267A | 3E83 | 3CCE | 7500 | E903 | 0056 |
| 0000174100 | C02B | 4689 | 89DC | DA46 | 76FF | FFE0 | DE76 | 468D |
| 0000174120 | 16DA | FF50 | EE76 | 76FF | FFFC | FA76 | 4E8D | 16E2 |
| 0000174140 | 8D51 | F04E | 5116 | 4E8D | 16D4 | 1E51 | 3C68 | 681D |
| 0000174160 | 03F0 | 36FF | 1562 | 36FF | 1560 | 36FF | 1566 | 36FF |
| 0000174200 | 1564 | 199A | 003D | 8300 | 28C4 | 468B | 8BDA | DC56 |
| 0000174220 | 50E9 | E907 | 0009 | 00B8 | BA00 | 0000 | 44E9 | E907 |
| 0000174240 | 003E | 46C7 | 05D2 | E900 | 0036 | 5EC4 | 2606 | 77FF |
| 0000174260 | 1E12 | ED68 | 9A1B | B3B6 | 3BA2 | C483 | E906 | 0020 |
| 0000174300 | 1DE9 | 2D00 | 0038 | 043D | 7600 | E903 | FFDC | E0D1 |
| 0000174320 | 2E93 | A7FF | 3B36 | 3A48 | 3A43 | 3A4F | 3A4F | 3B02 |
| 0000174340 | 5EC4 | 2606 | 078B | 8B26 | 0257 | 068E | 7A90 | A326 |
| 0000174360 | 0AB0 | 8926 | B216 | 0B0A | 74D0 | E903 | 0010 | 068E |
| 0000174400 | 7A64 | A126 | 373A | 8B26 | 3C16 | E937 | 0039 | 068E |
| 0000174420 | 7A90 | C426 | B01E | 260A | 7F83 | 4E12 | 0374 | 10E9 |
| 0000174440 | 8E00 | 9006 | 267A | B0A1 | 260A | 168B | 0AB2 | 16E9 |
| 0000174460 | 8E00 | 9006 | 267A | 36FF | 0AB2 | FF26 | B036 | 9A0A |
| 0000174500 | 499F | 3C82 | C483 | 8E04 | 9206 | 267A | 84A3 | 260A |
| 0000174520 | 1689 | 0A86 | FF26 | 8636 | 260A | 36FF | 0A84 | 149A |
| 0000174540 | AA65 | 833C | 04C4 | 4689 | 89CE | D056 | 5EC4 | 26CE |
| 0000174560 | 478B | 2608 | 578B | 890A | C646 | 5689 | A1C8 | 156A |
| 0000174600 | 168B | 156C | 4689 | 89CA | CC56 | 46C7 | 00F4 | E900 |
| 0000174620 | 0011 | 5EC4 | 26CA | 478B | 2616 | 578B | 8918 | CA46 |
| 0000174640 | 5689 | 8BCC | CC46 | 460B | 75CA | E903 | 004D | 5EC4 |
| 0000174660 | 8BCA | D246 | 3926 | 7407 | E903 | 0039 | 5EC4 | 26C6 |
| 0000174700 | 078A | 5EC4 | 26CA | 5FC4 | 2602 | 0738 | 0374 | 24E9 |
| 0000174720 | FF00 | C876 | 76FF | C4C6 | CA5E | FF26 | 0477 | FF26 |
| 0000174740 | 0277 | EA9A | F450 | 833D | 08C4 | 003D | 7400 | E903 |
| 0000174760 | 0003 | 06E9 | FF00 | F446 | 97E9 | 8BFF | CC46 | 460B |
| 0000175000 | 74CA | E903 | 02CA | 7E83 | 0AF4 | 037D | C6E9 | FF00 |
| 0000175020 | C876 | 76FF | FFC6 | F876 | 76FF | 1EF6 | 1168 | 9A1C |
| 0000175040 | B3B6 | 3D38 | C483 | C40C | CE5E | F626 | 1447 | 7502 |
| 0000175060 | E903 | 001B | 468B | 8BCE | D056 | 068E | 7A68 | A326 |
| 0000175100 | 0AA0 | 8926 | A216 | 9A0A | 29E7 | 3D49 | 00E9 | 8E00 |
| 0000175120 | 5A06 | 267A | 3E83 | 3D6E | 7500 | E903 | 0009 | 7E83 |
| 0000175140 | FED8 | 0374 | 0FE9 | 8E00 | 5C06 | 267A | 3E83 | 39DC |
| 0000175160 | 7500 | E903 | 0056 | C02B | 4689 | 89DC | DA46 | 76FF |
| 0000175200 | FFE0 | DE76 | 468D | 16DA | FF50 | EE76 | 76FF | FFFC |
| 0000175220 | FA76 | 4E8D | 16E2 | 8D51 | F04E | 5116 | 4E8D | 16D4 |
| 0000175240 | 1E51 | 3C68 | 681D | 0405 | 36FF | 1562 | 36FF | 1560 |
| 0000175260 | 36FF | 1566 | 36FF | 1564 | 849A | 0038 | 8300 | 28C4 |

THU MAR 14 17:52:34 1991 TSLINT.DLL PAGE 69, LINE 4013

| | | | | | | | | |
|---|---|---|---|---|---|---|---|---|
| 0000175300 | 468B | 8BDA | DC56 | 1AE9 | E905 | 0009 | 00B8 | BA00 |
| 0000175320 | 0000 | 0EE9 | 9A05 | E352 | 3D62 | 8E50 | 5E06 | 267A |
| 0000175340 | 70A0 | 5026 | 1A6A | 879A | FEAC | 833D | 06C4 | 4689 |
| 0000175360 | 89CA | CC56 | D00B | 0374 | 0CE9 | 1E00 | AE68 | 9A1C |
| 0000175400 | B3B6 | 3D82 | C483 | 8E04 | 5A06 | 267A | 3E83 | 39B0 |
| 0000175420 | 7500 | E903 | 0061 | 7E83 | FED8 | 0375 | 58E9 | 9A00 |
| 0000175440 | F7E4 | 3D8F | 5052 | 76FF | FFCC | CA76 | 1E9A | DAF9 |
| 0000175460 | 833D | 04C4 | FF50 | CC76 | 76FF | 1ECA | BD68 | 8D1C |
| 0000175500 | E246 | 5016 | 468D | 16F0 | 8D50 | D446 | 5016 | 681E |
| 0000175520 | 1D3C | 0868 | FF04 | 6236 | FF15 | 6036 | FF15 | 6635 |
| 0000175540 | FF15 | 6436 | 1E15 | CB68 | 681C | 3800 | 0368 | 9A38 |
| 0000175560 | 3806 | 0000 | C483 | 9A30 | E352 | 38EB | 8E50 | 5E06 |
| 0000175600 | 267A | 70A0 | 5026 | 5EC4 | 26CE | 77FF | 260A | 77FF |
| 0000175620 | 9A08 | 5114 | 3649 | C483 | 4004 | 9A50 | AC87 | 394D |
| 0000175640 | C483 | 8906 | C646 | 5689 | 0BC8 | 74D0 | E903 | 000C |
| 0000175660 | 681E | 1CD4 | B69A | 37B3 | 833E | 04C4 | 068E | 7A5A |
| 0000175700 | 8326 | 803E | 003A | 0375 | 61E9 | 8300 | D87E | 75FE |
| 0000175720 | E903 | 0058 | E49A | 44F7 | 523E | FF50 | C876 | 76FF |
| 0000175740 | 9AC6 | F91E | 3B18 | C483 | 5004 | 76FF | FFC8 | C676 |
| 0000175760 | 681E | 1CE3 | 468D | 16E2 | 8D50 | F046 | 5016 | 468D |
| 0000176000 | 16D4 | 1E50 | 3C68 | 681D | 0409 | 36FF | 1562 | 36FF |
| 0000176020 | 1560 | 36FF | 1566 | 36FF | 1564 | 681E | 1CF1 | CA68 |
| 0000176040 | 683D | 3DCD | D09A | 003D | 8300 | 30C4 | 5EC4 | 26CE |
| 0000176060 | 77FF | 260A | 77FF | FF08 | C876 | 76FF | 9AC6 | 50B4 |
| 0000176100 | 3F53 | C483 | 8B08 | C646 | 568B | C4C8 | CA5E | 8926 |
| 0000176120 | 0247 | 8926 | 0457 | 468B | C4D2 | CA5E | 8926 | C407 |
| 0000176140 | CA5E | C02B | 8926 | 1047 | 8926 | 0E47 | 5EC4 | 2BCA |
| 0000176160 | 26C0 | 4789 | 2608 | 4789 | C406 | CA5E | C02B | 8926 |
| 0000176200 | 0C47 | 8926 | 0A47 | 6CA1 | 0B15 | 6A06 | 7515 | E903 |
| 0000176220 | 0012 | 468B | 8BCA | CC56 | 1EC4 | 156A | 8926 | 1247 |
| 0000176240 | 8926 | 1457 | 5EC4 | 2BCA | 26C0 | 4789 | 2614 | 4789 |
| 0000176260 | A112 | 156A | 168B | 156C | 5EC4 | 26CA | 4789 | 2616 |
| 0000176300 | 5789 | 8B18 | CA46 | 568B | A3CC | 156A | 1689 | 156C |
| 0000176320 | 5EC4 | 26CA | 478B | 2608 | 470B | 7406 | E903 | 0203 |
| 0000176340 | 5EC4 | 26CA | 478B | 260C | 470B | 740A | E903 | 01F3 |
| 0000176360 | C09A | 8730 | 893F | BE46 | 5689 | C4C0 | BE5E | C726 |
| 0000176400 | 0007 | C400 | 065E | 8B26 | 1247 | B0E9 | 1E00 | FA68 |
| 0000176420 | 1E1C | FC68 | FF1C | C876 | 76FF | 9AC6 | 4B84 | 3FBC |
| 0000176440 | C483 | 5008 | 2A9A | C556 | 833F | 06C4 | 5EC4 | 26CA |
| 0000176460 | 4789 | 2606 | 5789 | C408 | CA5E | 8B26 | 0647 | 8B26 |
| 0000176500 | 0857 | 4689 | 89C2 | C456 | 8BE9 | 1E00 | FE68 | 1E1C |
| 0000176520 | 0068 | FF1D | C876 | 76FF | 9AC6 | 4B84 | 3FFE | C483 |
| 0000176540 | 5008 | 2A9A | 5456 | 8340 | 06C4 | 5EC4 | 26CA | 4789 |
| 0000176560 | 2606 | 5789 | C408 | CA5E | 8B26 | 0647 | 8B26 | 0857 |
| 0000176600 | 4689 | 89C2 | C456 | 4DE9 | C700 | F646 | 1D02 | 5E8C |
| 0000176620 | 1EF8 | 0768 | FF1D | C876 | 76FF | 9AC6 | 4B84 | 4007 |
| 0000176640 | C483 | 5008 | 759A | 7830 | 8340 | 02C4 | 5EC4 | 26CA |
| 0000176660 | 4789 | 260A | 5789 | E90C | 001C | 19E9 | 2D00 | 0038 |
| 0000176700 | 0375 | 48E9 | 48FF | 0375 | 80E9 | 2DFF | 0003 | 0375 |
| 0000176720 | B6E9 | E9FF | 0000 | 468B | 0BC4 | C246 | 0374 | FFE9 |
| 0000176740 | C400 | CA5E | 8B26 | 0C47 | 0B26 | 0A47 | 0374 | EFE9 |
| 0000176760 | 9A00 | 30C0 | 4066 | C28E | D88B | 8326 | 173F | 0375 |
| 0000177000 | 12E9 | 9A00 | 30C0 | 3A68 | C28E | D88B | 8326 | 183F |
| 0000177020 | 0374 | 08E9 | 9A00 | 424E | 3BC1 | C3E9 | C400 | 0A5E |
| 0000177040 | C726 | 0107 | C400 | 065E | 8326 | 127F | 7538 | E903 |
| 0000177060 | 000D | 5EC4 | 2606 | 7F83 | 3912 | 0374 | 1BE9 | FF00 |
| 0000177100 | C876 | 76FF | FFC6 | F876 | 76FF | 1EF6 | 0968 | 9A1D |
| 0000177120 | B3B6 | 418C | C483 | E90C | 0086 | 068E | 7A5A | 8326 |
| 0000177140 | C03E | 0041 | 0375 | 09E9 | 8300 | D87E | 74FE | E903 |

THU MAR 14 17:52:34 1991 TSLINT.DLL PAGE 70, LINE 4072

| | | | | | | | | |
|---|---|---|---|---|---|---|---|---|
| 0000177160 | 000F | 068E | 7A5C | 8326 | D83E | 0041 | 0375 | 56E9 |
| 0000177200 | 2B00 | 89C0 | DC46 | 4689 | FFDA | E076 | 76FF | 8DDE |
| 0000177220 | DA46 | 5016 | 76FF | FFEE | FC76 | 76FF | 8DFA | E24E |
| 0000177240 | 5116 | 4E8D | 16F0 | 8D51 | D44E | 5116 | 681E | 1D3C |
| 0000177260 | 4368 | FF04 | 6236 | FF15 | 6036 | FF15 | 6636 | FF15 |
| 0000177300 | 6436 | 9A15 | 4227 | 0000 | C483 | 8B28 | DA46 | 568B |
| 0000177320 | E9DC | 010F | 09E9 | B800 | 0000 | 00BA | E900 | 0103 |
| 0000177340 | EDE9 | C4FD | CA5E | 8B26 | 1047 | 0B26 | 0E47 | 0375 |
| 0000177360 | 3EE9 | 6A00 | C400 | CA5E | FF26 | 1077 | FF26 | 0E77 |
| 0000177400 | 76FF | FFC4 | C276 | 109A | A057 | 833E | 0AC4 | 7440 |
| 0000177420 | E903 | 001D | 76FF | FFC8 | C676 | 5EC4 | 26CA | 77FF |
| 0000177440 | 2610 | 77FF | 1E0E | 2168 | 9A1D | B3B6 | 3E17 | C483 |
| 0000177460 | C40C | CE5E | F626 | 1447 | 7502 | E903 | 001B | 468B |
| 0000177500 | 8BCE | D056 | 068E | 7A68 | A326 | 0AA0 | 8926 | A216 |
| 0000177520 | 9A0A | 29E7 | 3F7E | 00E9 | 8E00 | 5A06 | 267A | 3E83 |
| 0000177540 | 3E23 | 7500 | E903 | 0009 | 7E83 | FED8 | 0374 | 0FE9 |
| 0000177560 | 8E00 | 5C06 | 267A | 3E83 | 3A98 | 7500 | E903 | 005A |
| 0000177600 | 468B | 8BCA | CC56 | 4689 | 89DA | DC56 | 76FF | FFE0 |
| 0000177620 | DE76 | 468D | 16DA | FF50 | EE76 | 76FF | FFFC | FA76 |
| 0000177640 | 4E8D | 16E2 | 8D51 | F04E | 5116 | 4E8D | 16D4 | 1E51 |
| 0000177660 | 3C68 | 681D | 044E | 36FF | 1562 | 36FF | 1560 | 36FF |
| 0000177700 | 1566 | 36FF | 1564 | E39A | 003A | 8300 | 28C4 | 468B |
| 0000177720 | 8BDA | DC56 | 0CE9 | E900 | 0009 | 468B | 8BCA | CC56 |
| 0000177740 | 00E9 | 5E00 | 835F | 02ED | E58B | 5D1F | CB4D | 581E |
| 0000177760 | 4590 | 8B55 | 1EEC | D88E | EC81 | 000A | 5657 | 6AA1 |
| 0000200000 | 8B15 | 6C16 | 8915 | FA46 | 5689 | E9FC | 0011 | 5EC4 |
| 0000200020 | 26FA | 478B | 2616 | 578B | 8918 | FA46 | 5689 | 8BFC |
| 0000200040 | FC46 | 460B | 75FA | E903 | 000F | 468B | 8BFA | FC56 |
| 0000200060 | 4689 | 89F6 | F856 | D5E9 | 8BFF | F646 | 568B | 89F8 |
| 0000200100 | FA46 | 5689 | E9FC | 0011 | 5EC4 | 26FA | 478B | 2612 |
| 0000200120 | 578B | 8914 | FA46 | 5689 | 8BFC | FC46 | 460B | 75FA |
| 0000200140 | E903 | 0096 | 5EC4 | 26FA | 478B | 2608 | 470B | 7506 |
| 0000200160 | E903 | 0083 | 5EC4 | 26FA | 07F6 | 7501 | E903 | 0077 |
| 0000200200 | 5EC4 | 26FA | 77FF | 2608 | 77FF | 9A06 | 57DE | 430C |
| 0000200220 | C483 | C404 | FA5E | 8926 | 0E47 | 8926 | 1057 | 5EC4 |
| 0000200240 | 26FA | 77FF | 2608 | 77FF | 9A06 | 30CC | 431C | C483 |
| 0000200260 | 3D04 | 0000 | C375 | 2EE9 | 9A00 | 30C0 | 4169 | C28E |
| 0000200300 | D88B | 8B26 | C11F | 02E3 | B7FF | 7826 | B7FF | 7824 |
| 0000200320 | 5EC4 | 26FA | 77FF | 2604 | 77FF | 1E02 | 4568 | 9A1D |
| 0000200340 | B24A | 436C | C483 | C40C | FA5E | C02B | 8926 | 0847 |
| 0000200360 | 8926 | 0647 | 03E9 | E900 | FF4E | 468B | 08FC | FA46 |
| 0000200400 | 0374 | 0CE9 | 1E00 | 6068 | 9A1D | B3B6 | 40B2 | C483 |
| 0000200420 | 5E04 | 835F | 02ED | E58B | 5D1F | CB4D | 581E | 4590 |
| 0000200440 | 8B55 | 1EEC | D88E | EC81 | 000C | 5657 | 5EC4 | 2606 |
| 0000200460 | 078B | 8B26 | 0257 | 068E | 7A90 | A326 | 0AB0 | 8926 |
| 0000200500 | B216 | 0B0A | 74D0 | E903 | 0010 | 068E | 7A64 | A126 |
| 0000200520 | 373A | 8B26 | 3C16 | E937 | 0039 | 068E | 7A90 | C426 |
| 0000200540 | B01E | 260A | 7F83 | 4E12 | 0374 | 10E9 | 8E00 | 9006 |
| 0000200560 | 267A | B0A1 | 260A | 168B | 0AB2 | 16E9 | 8E00 | 9006 |
| 0000200600 | 267A | 36FF | 0AB2 | FF26 | B036 | 9A0A | 499F | 4342 |
| 0000200620 | C483 | 8E04 | 9206 | 267A | 84A3 | 260A | 1689 | 0A86 |
| 0000200640 | FF26 | 8636 | 260A | 36FF | 0A84 | 149A | AC65 | 8344 |
| 0000200660 | 04C4 | 4689 | 89FA | FC56 | 6AA1 | 8B15 | 6C16 | 8915 |
| 0000200700 | F646 | 5689 | E9F8 | 0011 | 5EC4 | 26F6 | 478B | 2616 |
| 0000200720 | 578B | 8918 | F646 | 5689 | 8BF8 | F846 | 460B | 75F6 |
| 0000200740 | E903 | 0045 | 5EC4 | 26F6 | 5FC4 | 2602 | 078A | 5EC4 |
| 0000200760 | 26FA | 5FC4 | 2608 | 0738 | 0374 | 29E9 | C400 | FA5E |
| 0000201000 | FF26 | 0A77 | FF26 | 0877 | 5EC4 | 26F6 | 77FF | 2604 |
| 0000201020 | 77FF | 9A02 | 50EA | 44EE | C483 | 3D08 | 0000 | 0374 |

THU MAR 14 17:52:34 1991 TSLINT.DLL PAGE 71, LINE 4131

| | | | | | | | | |
|---|---|---|---|---|---|---|---|---|
| 0000201040 | 03E9 | E900 | 0003 | 9FE9 | C4FF | FA5E | F626 | 1447 |
| 0000201060 | 7502 | E903 | 001B | 468B | 8BFA | FC56 | 068E | 7A68 |
| 0000201100 | A326 | 0AA0 | 8926 | A216 | 9A0A | 29E7 | 44CF | 00E9 |
| 0000201120 | 8B00 | F846 | 460B | 74F6 | E903 | 001B | 36FF | 7A86 |
| 0000201140 | 36FF | 7A84 | 36FF | 7A82 | 36FF | 7A80 | B29A | E06D |
| 0000201160 | 8344 | 08C4 | 2EE9 | FF00 | F876 | 76FF | 9AF6 | 46CA |
| 0000201200 | 44FD | C483 | 8904 | F446 | 5E8D | 9AF4 | 99CD | 44F8 |
| 0000201220 | EC83 | 8B08 | 9ADC | 9B29 | 42EE | B29A | B46D | 8341 |
| 0000201240 | 08C4 | 00E9 | 5E00 | 835F | 02ED | E58B | 5D1F | CB4D |
| 0000201260 | 581E | 4590 | 8B55 | 1EEC | D88E | EC81 | 0056 | 5657 |
| 0000201300 | 46C7 | 83FA | 8C1D | FC5E | 46C7 | 01EE | 2B01 | 89C0 |
| 0000201320 | E046 | 4689 | 8EDE | 5A06 | 267A | 3E83 | 4648 | 7500 |
| 0000201340 | E903 | 001D | 36FF | 1566 | 36FF | 1564 | 468D | 16D6 |
| 0000201360 | 9A50 | 39C6 | 0000 | C483 | 3D08 | 0000 | 0374 | 0FE9 |
| 0000201400 | 8E00 | 5C06 | 267A | 3E83 | 4660 | 7500 | E903 | 003B |
| 0000201420 | 681E | 1D87 | 468D | 16E2 | 8D50 | D646 | 5016 | 468D |
| 0000201440 | 16F2 | 6850 | 0496 | 681E | 1D8C | 36FF | 1562 | 36FF |
| 0000201460 | 1560 | 36FF | 1566 | 36FF | 1564 | 0F9A | 003A | 8300 |
| 0000201500 | 1EC4 | 4689 | 89F2 | F456 | 08E9 | 2B00 | 89C0 | F446 |
| 0000201520 | 4689 | C7F2 | F646 | 0000 | 46C7 | 00F8 | A100 | 156A |
| 0000201540 | 168B | 156C | 4689 | 89D2 | D456 | 46C7 | 00F0 | E900 |
| 0000201560 | 0014 | 5EC4 | 26D2 | 478B | 2616 | 578B | 8918 | D246 |
| 0000201600 | 5689 | FFD4 | F046 | 468B | 0BD4 | D246 | 0375 | 18E9 |
| 0000201620 | 8B00 | D246 | 568B | 8BD4 | F076 | E6C1 | 8902 | AA42 |
| 0000201640 | 5289 | FFAC | F846 | C9E9 | C7FF | F046 | 0000 | 03E9 |
| 0000201660 | FF00 | F046 | 468B | 39F0 | F846 | 037F | 1AE9 | 8B00 |
| 0000201700 | F076 | E6C1 | FF02 | AC72 | 72FF | 9AAA | 46CA | 440D |
| 0000201720 | C483 | 8904 | F646 | D8E9 | 2BFF | A3C0 | 156C | 6AA3 |
| 0000201740 | 8E15 | 5A06 | 267A | 3E83 | 40C1 | 7500 | E903 | 0009 |
| 0000201760 | 7E83 | FEDA | 0374 | 0FE9 | 8E00 | 5C06 | 267A | 3E83 |
| 0000202000 | 40D9 | 7500 | E903 | 0051 | 468B | 89F6 | DC46 | 76FF |
| 0000202020 | FFE0 | DE76 | 468D | 16DC | FF50 | EE76 | 76FF | FFFC |
| 0000202040 | FA76 | 4E8D | 16E2 | 8D51 | F24E | 5116 | 4E8D | 16D6 |
| 0000202060 | 1E51 | 8C68 | 681D | 04AE | 36FF | 1562 | 36FF | 1560 |
| 0000202100 | 36FF | 1566 | 36FF | 1564 | 249A | 0041 | 8300 | 28C4 |
| 0000202120 | 468B | E9DC | 0009 | 06E9 | 8B00 | F646 | 00E9 | 5E00 |
| 0000202140 | 835F | 02ED | E58B | 5D1F | CB4D | 581E | 4590 | 8B55 |
| 0000202160 | 1EEC | D88E | EC81 | 0028 | 5657 | 46C7 | A1FA | 8C1D |
| 0000202200 | FC5E | 46C7 | 01F2 | 2B01 | 89C0 | E446 | 4689 | 8EE2 |
| 0000202220 | 5A06 | 267A | 3E83 | 453C | 7500 | E903 | 001D | 36FF |
| 0000202240 | 1566 | 36FF | 1564 | 468D | 16DA | 9A50 | 4552 | 0000 |
| 0000202260 | C483 | 3D08 | 0000 | 0374 | 0FE9 | 8E00 | 5C06 | 267A |
| 0000202300 | 3E83 | 4568 | 7500 | E903 | 003B | 681E | 1DA5 | 468D |
| 0000202320 | 16E6 | 8D50 | DA46 | 5016 | 468D | 16F4 | 6850 | 04BA |
| 0000202340 | 681E | 1DFA | 36FF | 1562 | 36FF | 1560 | 36FF | 1566 |
| 0000202360 | 36FF | 1564 | 9B9A | 0045 | 8300 | 1EC4 | 4689 | 89F4 |
| 0000202400 | F656 | 08E9 | 2B00 | 89C0 | F646 | 4689 | C4F4 | 065E |
| 0000202420 | 8B26 | 0847 | 0B26 | 0647 | 0375 | 19E9 | C400 | 065E |
| 0000202440 | FF26 | 0877 | FF26 | 0677 | CC9A | C830 | 8347 | 04C4 |
| 0000202460 | 4689 | E9F8 | 0026 | 5EC4 | 2606 | 478B | 260C | 470B |
| 0000202500 | 750A | E903 | 0016 | 5EC4 | 2606 | 77FF | 260C | 77FF |
| 0000202520 | 9A0A | 359D | 462E | C483 | 8904 | F846 | 7E83 | 00F8 |
| 0000202540 | 0375 | 32E9 | 9A00 | 30C0 | 4476 | C28E | D88B | 8B26 |
| 0000202560 | C11F | 02E3 | B7FF | 7826 | B7FF | 7824 | 5EC4 | 2606 |
| 0000202600 | 77FF | 2604 | 77FF | 1E02 | A968 | 1E1D | AE68 | 9A1D |
| 0000202620 | B24A | 43EE | C483 | C410 | 065E | 8B26 | 1447 | 0B26 |
| 0000202640 | 1247 | 0375 | 1DE9 | C400 | 065E | 8B26 | 1647 | 8B26 |
| 0000202660 | 1857 | 5EC4 | 2606 | 5FC4 | 2612 | 4789 | 2616 | 5789 |
| 0000202700 | E918 | 0012 | 5EC4 | 2606 | 478B | 2616 | 578B | A318 |

THU MAR 14 17:52:34 1991 TSLINT.DLL PAGE 72, LINE 4190

| | | | | | | | | |
|---|---|---|---|---|---|---|---|---|
| 0000202720 | 156A | 1689 | 156C | 5EC4 | 2606 | 77FF | 2604 | 77FF |
| 0000202740 | 9A02 | F91E | 487A | C483 | 8904 | D846 | 5EC4 | 2606 |
| 0000202760 | 77FF | 2604 | 77FF | 9A02 | AA42 | 47B4 | C483 | 8E04 |
| 0000203000 | 5A06 | 267A | 3E83 | 46F6 | 7500 | E903 | 005A | 7E83 |
| 0000203020 | FEDE | 0375 | 51E9 | 9A00 | F7E4 | 47F2 | 5052 | 76FF |
| 0000203040 | C4D8 | 065E | FF26 | 0477 | FF26 | 0277 | 681E | 1DCC |
| 0000203060 | 468D | 16E6 | 8D50 | F446 | 5016 | 468D | 16DA | 1E50 |
| 0000203100 | FA68 | 681D | 04D3 | 36FF | 1562 | 36FF | 1560 | 36FF |
| 0000203120 | 1566 | 36FF | 1564 | 681E | 1DDA | 7F68 | 683E | 3E82 |
| 0000203140 | 859A | 003E | 8300 | 30C4 | 76FF | FF08 | 0676 | 1E9A |
| 0000203160 | 02F9 | 8349 | 04C4 | 4689 | FFD8 | 0876 | 76FF | 9A06 |
| 0000203200 | AA42 | 485A | C483 | 8E04 | 5A06 | 267A | 3E83 | 4866 |
| 0000203220 | 7500 | E903 | 0055 | 7E83 | FEDE | 0375 | 4CE9 | 9A00 |
| 0000203240 | F7E4 | 4844 | 5052 | 76FF | FFD8 | 0876 | 76FF | 1E06 |
| 0000203260 | E368 | 8D1D | E646 | 5016 | 468D | 16F4 | 8D50 | DA46 |
| 0000203300 | 5016 | 681E | 1DFA | D468 | FF04 | 6236 | FF15 | 6036 |
| 0000203320 | FF15 | 6636 | FF15 | 6436 | 1E15 | F168 | 681D | 48BB |
| 0000203340 | BE68 | 9A48 | 48C1 | 0000 | C483 | 8E30 | 5A06 | 267A |
| 0000203360 | 3E83 | 48EE | 7500 | E903 | 0009 | 7E83 | FEDE | 0374 |
| 0000203400 | 0FE9 | 8E00 | 5C06 | 267A | 3E83 | 4722 | 7500 | E903 |
| 0000203420 | 0051 | 468B | 89F8 | E046 | 76FF | FFE4 | E276 | 468D |
| 0000203440 | 16E0 | FF50 | F276 | 76FF | FFFC | FA76 | 4E8D | 16E6 |
| 0000203460 | 8D51 | F44E | 5116 | 4E8D | 16DA | 1E51 | FA68 | 681D |
| 0000203500 | 04D5 | 36FF | 1562 | 36FF | 1560 | 36FF | 1566 | 36FF |
| 0000203520 | 1564 | A99A | 0046 | 8300 | 28C4 | 468B | E9E0 | 0009 |
| 0000203540 | 06E9 | 8B00 | F846 | 00E9 | 5E00 | 835F | 02ED | E58B |
| 0000203560 | 5D1F | CB4D | 581E | 4590 | 8B55 | 1EEC | D88E | EC81 |
| 0000203600 | 0008 | 5657 | 46C7 | 00FC | 1E00 | F468 | 9A70 | 386A |
| 0000203620 | 4A13 | C483 | 3D04 | 0000 | 0375 | 0FE9 | 1E00 | 0368 |
| 0000203640 | 9A1E | B24A | 4A27 | C483 | FF04 | FC46 | 681E | 7100 |
| 0000203660 | 6A9A | 8538 | 834A | 04C4 | 003D | 7500 | E903 | 000F |
| 0000203700 | 681E | 1E22 | 4A9A | BFB2 | 834A | D4C4 | 46FF | A1FC |
| 0000203720 | 156A | 168B | 156C | 4689 | 89F8 | FA56 | 11E9 | C400 |
| 0000203740 | F85E | 8B26 | 1647 | 8B26 | 1857 | 4689 | 89F8 | FA56 |
| 0000203760 | 468B | 0BFA | F846 | 0375 | 6FE9 | C400 | F85E | F626 |
| 0000204000 | 0807 | 0375 | 60E9 | C400 | F85E | 8B26 | 0847 | 0B26 |
| 0000204020 | 0647 | 0375 | 50E9 | C400 | F85E | FF26 | 0877 | FF26 |
| 0000204040 | 0677 | 6A9A | 9538 | 834A | 04C4 | 003D | 7500 | E903 |
| 0000204060 | 0035 | C09A | 8B30 | 8E47 | 8BC2 | 26D8 | 1F8B | E3C1 |
| 0000204100 | FF02 | 26B7 | FF78 | 24B7 | C478 | F85E | FF26 | 0477 |
| 0000204120 | FF26 | 0277 | 681E | 1E40 | 681E | 1E45 | 4A9A | D1B2 |
| 0000204140 | 8348 | 10C4 | 46FF | E9FC | FF75 | 468B | E9FC | 0000 |
| 0000204160 | 5F5E | ED83 | 8B02 | 1FE5 | 4D5D | 1ECB | 9058 | 5545 |
| 0000204200 | EC8B | 8E1E | 81D8 | 08EC | 5700 | C756 | FC46 | 0000 |
| 0000204220 | 6AA1 | 8B15 | 6C16 | 8915 | F846 | 5689 | E9FA | 0011 |
| 0000204240 | 5EC4 | 26F8 | 478B | 2616 | 578B | 8918 | F846 | 5689 |
| 0000204260 | 8BFA | FA46 | 460B | 75F8 | E903 | 0057 | 5EC4 | 26F8 |
| 0000204300 | 478B | 2608 | 470B | 7506 | E903 | 0016 | 76FF | FFFA |
| 0000204320 | F876 | CA9A | 6046 | 834B | 04C4 | 003D | 7400 | E903 |
| 0000204340 | 002B | 5EC4 | 26F8 | 478B | 260C | 470B | 750A | E903 |
| 0000204360 | 001E | 5EC4 | 26F8 | 77FF | 260C | 77FF | 9A0A | 359D |
| 0000204400 | 48E2 | C483 | 3D04 | 0000 | 0375 | 03E9 | FF00 | FC46 |
| 0000204420 | 8DE9 | 8BFF | FC46 | 00E9 | 5E00 | 835F | 02ED | E58B |
| 0000204440 | 5D1F | CB4D | 581E | 4590 | 8B55 | 1EEC | D88E | EC81 |
| 0000204460 | 000A | 5657 | 46C7 | FFF6 | C4FF | DA5E | 8A26 | 9807 |
| 0000204500 | 1BE9 | C700 | F846 | 0000 | 2EE9 | C700 | F846 | 0301 |
| 0000204520 | 26E9 | C700 | F846 | 0109 | 1EE9 | E900 | 001B | 612D |
| 0000204540 | 7500 | E903 | FFED | 112D | 7500 | E903 | FFD5 | 052D |
| 0000204560 | 7500 | E903 | FFD5 | 00E9 | 8E00 | 8806 | 267A | 3E83 |

THU MAR 14 17:52:34 1991 TSLINT.DLL PAGE 73, LINE 4249

| | | | | | | | | |
|---|---|---|---|---|---|---|---|---|
| 0000204600 | 3742 | 7500 | E903 | 0017 | B668 | FF01 | F876 | 76FF |
| 0000204620 | FF08 | 0676 | A79A | 1C48 | 834C | 08C4 | 63E9 | C401 |
| 0000204640 | 065E | 63A0 | 261E | 0738 | 0374 | 1CE9 | 6A00 | 1E05 |
| 0000204660 | 6968 | FF1E | 0876 | 76FF | 9A06 | 5156 | 4C38 | C483 |
| 0000204700 | 3D0A | 0000 | 0375 | 1AE9 | 6800 | 01B6 | 76FF | FFF8 |
| 0000204720 | 0876 | 76FF | 9A06 | 48A7 | 49F0 | C483 | E908 | 0122 |
| 0000204740 | 0FE9 | 8B00 | 0646 | 568B | 0508 | 0005 | 4689 | 89FA |
| 0000204760 | FC56 | 5EC4 | A0FA | 1E6F | 3826 | 7407 | E903 | 0023 |
| 0000205000 | 681E | 1E75 | 76FF | FFFC | FA76 | EA9A | 9E50 | 834C |
| 0000205020 | 08C4 | 003D | 7400 | E903 | 0009 | 00B8 | E900 | 00E2 |
| 0000205040 | DFE9 | C400 | FA5E | 7BA0 | 261E | 0738 | 0374 | 23E9 |
| 0000205060 | 1E00 | 8268 | FF1E | FC76 | 76FF | 9AFA | 50EA | 4CCF |
| 0000205100 | C483 | 3D08 | 0000 | 0374 | 09E9 | B800 | 0001 | B1E9 |
| 0000205120 | E900 | 00AE | 5EC4 | A0FA | 1E89 | 3826 | 7407 | E903 |
| 0000205140 | 0023 | 681E | 1E90 | 76FF | FFFC | FA76 | EA9A | 0250 |
| 0000205160 | 834D | 08C4 | 003D | 7400 | E903 | 0009 | 02B8 | E900 |
| 0000205200 | 0080 | 7DE9 | C400 | FA5E | 97A0 | 261E | 0738 | 0374 |
| 0000205220 | 58E9 | 6A00 | 1E03 | 9B68 | FF1E | FC76 | 76FF | 9AFA |
| 0000205240 | 5156 | 4D25 | C483 | 3D0A | 0000 | 0374 | 3CE9 | 8300 |
| 0000205260 | FA46 | 8D03 | F646 | 5016 | 681E | 1E9F | 76FF | FFFC |
| 0000205300 | FA76 | 269A | 5A5A | 834D | 0CC4 | 7448 | E903 | 0012 |
| 0000205320 | 7E83 | 00F6 | 037D | 09E9 | 8B00 | F646 | 23E9 | E900 |
| 0000205340 | 0006 | FFB8 | E9FF | 001A | 17E9 | 6800 | 01B6 | 76FF |
| 0000205360 | FFF8 | 0876 | 76FF | 9A06 | 48A7 | 4BF7 | C483 | E908 |
| 0000205400 | 0000 | 5F5E | ED83 | 8B02 | 1FE5 | 4D5D | 00CB | 581E |
| 0000205420 | 4590 | 8B55 | 1EEC | D88E | EC81 | 003C | 5657 | 46C7 |
| 0000205440 | AFFA | 8C1E | FC5E | 46C7 | 07E6 | 2B01 | 89C0 | D846 |
| 0000205460 | 4689 | 8ED6 | A206 | 267A | 3E83 | 4952 | 7500 | E903 |
| 0000205500 | 001D | 36FF | 1F32 | 36FF | 1F30 | 468D | 16CC | 9A50 |
| 0000205520 | 470C | 0000 | C483 | 3D08 | 0000 | 0374 | 0FE9 | 8E00 |
| 0000205540 | A406 | 267A | 3E83 | 4E3C | 7500 | E903 | 003A | 681E |
| 0000205560 | 1EB6 | 468D | 16DA | 8D50 | CC46 | 5016 | 468D | 16E8 |
| 0000205600 | 6A50 | 1E4F | 3468 | FF1F | 2E36 | FF1F | 2C36 | FF1F |
| 0000205620 | 3236 | FF1F | 3036 | 9A1F | 4755 | 0000 | C483 | 891E |
| 0000205640 | E846 | 5689 | E9EA | 0008 | C02B | 4689 | 89EA | E846 |
| 0000205660 | 5EC4 | 2606 | 7F83 | 2712 | 0375 | 81E9 | 8E01 | A206 |
| 0000205700 | 267A | 3E83 | 4D9A | 7500 | E903 | 0009 | 7E83 | FED0 |
| 0000205720 | 0374 | 0FE9 | 8E00 | A406 | 267A | 3E83 | 496A | 7500 |
| 0000205740 | E903 | 00D5 | 468B | 8B06 | 0856 | 068E | 7AA6 | A326 |
| 0000205760 | 0AB0 | 8926 | B216 | 0B0A | 74D0 | E903 | 0010 | 068E |
| 0000206000 | 7AA8 | A126 | 373A | 8B26 | 3C16 | E937 | 0039 | 068E |
| 0000206020 | 7AA6 | C426 | B01E | 260A | 7F83 | 4E12 | 0374 | 10E9 |
| 0000206040 | 8E00 | A606 | 267A | B0A1 | 260A | 168B | 0AB2 | 16E9 |
| 0000206060 | 8E00 | A606 | 267A | 36FF | 0AB2 | FF26 | B036 | 9A0A |
| 0000206100 | 499F | 4A04 | C483 | 8E04 | AA06 | 267A | 84A3 | 260A |
| 0000206120 | 1689 | 0A86 | FF26 | 8636 | 260A | 36FF | 0A84 | 149A |
| 0000206140 | 9665 | 834F | 04C4 | 4689 | 89D2 | D456 | 76FF | FFD8 |
| 0000206160 | D676 | 468D | 16D2 | FF50 | E676 | 76FF | FFFC | FA76 |
| 0000206200 | 4E8D | 16DA | 8D51 | E84E | 5116 | 4E8D | 16CC | 1E51 |
| 0000206220 | 3468 | 6A1F | FF57 | 2E36 | FF1F | 2C36 | FF1F | 3236 |
| 0000206240 | FF1F | 3036 | 9A1F | 50A7 | 0000 | C483 | 8B28 | D246 |
| 0000206260 | 568B | E9D4 | 05D4 | 85E9 | 8B00 | 0646 | 568B | 8E08 |
| 0000206300 | A606 | 267A | B0A3 | 260A | 1689 | 0AB2 | D00B | 0374 |
| 0000206320 | 10E9 | 8E00 | A806 | 267A | 3AA1 | 2637 | 168B | 373C |
| 0000206340 | 39E9 | 8E00 | A606 | 267A | 1EC4 | 0AB0 | 8326 | 127F |
| 0000206360 | 744E | E903 | 0010 | 068E | 7AA6 | A126 | 0AB0 | 8B26 |
| 0000206400 | B216 | E90A | 0016 | 068E | 7AA6 | FF26 | B236 | 260A |
| 0000206420 | 36FF | 0AB0 | 9F9A | 0049 | 8350 | 04C4 | 068E | 7AAA |
| 0000206440 | A326 | 0A84 | 8926 | 8616 | 260A | 36FF | 0A86 | FF26 |

THU MAR 14 17:52:34 1991 TSLINT.DLL PAGE 74, LINE 4308

| | | | | | | | | |
|---|---|---|---|---|---|---|---|---|
| 0000206460 | 8436 | 9A0A | 6514 | 501F | C483 | E904 | 054C | 5EC4 |
| 0000206500 | 2606 | 078B | 8B26 | 0257 | 068E | 7AA6 | A326 | 0AB0 |
| 0000206520 | 8926 | B216 | 0B0A | 74D0 | E903 | 0010 | 068E | 7AA8 |
| 0000206540 | A126 | 373A | 8B26 | 3C16 | E937 | 0039 | 068E | 7AA6 |
| 0000206560 | C426 | B01E | 260A | 7F83 | 4E12 | 0374 | 10E9 | 8E00 |
| 0000206600 | A606 | 267A | B0A1 | 260A | 168B | 0AB2 | 16E9 | 8E00 |
| 0000206620 | A606 | 267A | 36FF | 0AB2 | FF26 | B036 | 9A0A | 499F |
| 0000206640 | 4EA2 | C483 | 8E04 | AA06 | 267A | 84A3 | 260A | 1689 |
| 0000206660 | 0A86 | FF26 | 8636 | 260A | 36FF | 0A84 | 149A | 3565 |
| 0000206700 | 834B | 04C4 | 4689 | 89F0 | F256 | 5EC4 | 2606 | 478B |
| 0000206720 | 2606 | 470B | 7404 | E903 | 0089 | 068E | 7AA2 | 8326 |
| 0000206740 | 243E | 004E | 0375 | 09E9 | 8300 | D07E | 74FE | E903 |
| 0000206760 | 000F | 068E | 7AA4 | 8326 | C63E | 004D | 0375 | 59E9 |
| 0000207000 | 8B00 | F046 | 568B | 89F2 | D246 | 5689 | FFD4 | D876 |
| 0000207020 | 76FF | 8DD6 | D246 | 5016 | 76FF | FFE6 | FC76 | 76FF |
| 0000207040 | 8DFA | DA4E | 5116 | 4E8D | 16E8 | 8D51 | CC4E | 5116 |
| 0000207060 | 681E | 1F34 | 5A6A | 36FF | 1F2E | 36FF | 1F2C | 36FF |
| 0000207100 | 1F32 | 36FF | 1F30 | B39A | 0049 | 8300 | 28C4 | 468B |
| 0000207120 | 8BD2 | D456 | 33E9 | E904 | 0009 | 468B | 8BF0 | F256 |
| 0000207140 | 27E9 | 8E04 | AC06 | 267A | 1EC4 | 0A66 | C426 | 261F |
| 0000207160 | 478B | 890C | F846 | 068E | 7AAC | C426 | 661E | 260A |
| 0000207200 | 1FC4 | 8B26 | 0847 | 8B26 | 0A57 | 4689 | 89F4 | F656 |
| 0000207220 | 5EC4 | 26F0 | 478B | 030C | F846 | 4689 | 9ACA | E352 |
| 0000207240 | 4F77 | 8E50 | AE06 | 267A | 70A0 | 5026 | 468B | 40CA |
| 0000207260 | 9A50 | AC87 | 4EC1 | C483 | 8906 | EC46 | 5689 | 0BEE |
| 0000207300 | 74D0 | E903 | 000C | 681E | 1EBD | B69A | 4DB3 | 8351 |
| 0000207320 | 04C4 | 068E | 7AA2 | 8326 | 413E | 0050 | 0375 | 60E9 |
| 0000207340 | 8300 | D07E | 75FE | E903 | 0057 | E49A | 5AF7 | 5251 |
| 0000207360 | FF50 | EE76 | 76FF | 9AEC | F91E | 5100 | C483 | 5004 |
| 0000207400 | 76FF | FFEE | EC76 | 681E | 1ECC | 468D | 16DA | 8D50 |
| 0000207420 | E846 | 5016 | 468D | 16CC | 1E50 | 3468 | 6A1F | FF5E |
| 0000207440 | 2E36 | FF1F | 2C36 | FF1F | 3236 | FF1F | 3036 | 1E1F |
| 0000207460 | DA68 | 681E | 493E | 4168 | 9A49 | 4944 | 0000 | C483 |
| 0000207500 | C430 | F05E | FF26 | 0A77 | FF26 | 0877 | 76FF | FFEE |
| 0000207520 | EC76 | B49A | 6D50 | 834C | 08C4 | 5EC4 | 26F0 | 47F6 |
| 0000207540 | 0214 | 0375 | 1BE9 | 8B00 | F046 | 568B | 8EF2 | B006 |
| 0000207560 | 267A | A0A3 | 260A | 1689 | 0AA2 | E79A | 9329 | E952 |
| 0000207600 | 0000 | 5EC4 | 2606 | 478B | 2604 | 578B | 8906 | 0646 |
| 0000207620 | 5689 | 8B08 | 0846 | 460B | 7506 | E903 | 01C4 | 76FF |
| 0000207640 | FFF6 | F476 | 76FF | FFEE | EC76 | 6E9A | B550 | 8351 |
| 0000207660 | 08C4 | 5EC4 | 2606 | 078B | 8B26 | 0257 | 068E | 7AA6 |
| 0000207700 | A326 | 0AB0 | 8926 | B216 | 0B0A | 74D0 | E903 | 0010 |
| 0000207720 | 068E | 7AA8 | A126 | 373A | 8B26 | 3C16 | E937 | 0039 |
| 0000207740 | 068E | 7AA6 | C426 | B01E | 260A | 7F83 | 4E12 | 0374 |
| 0000207760 | 10E9 | 8E00 | A606 | 267A | B0A1 | 260A | 168B | 0AB2 |
| 0000210000 | 16E9 | 8E00 | A606 | 267A | 36FF | 0AB2 | FF26 | B036 |
| 0000210020 | 9A0A | 499F | 512D | C483 | 8E04 | AA06 | 267A | 84A3 |
| 0000210040 | 260A | 1689 | 0A86 | FF26 | 8636 | 260A | 36FF | 0A84 |
| 0000210060 | 149A | 1465 | 8351 | 04C4 | 4689 | 89F0 | F256 | 5EC4 |
| 0000210100 | 26F0 | 478B | 030C | F846 | 4601 | FFCA | EE76 | 76FF |
| 0000210120 | 9AEC | F91E | 52BF | C483 | 8904 | C446 | 529A | FAE3 |
| 0000210140 | 5052 | 068E | 7AAE | A026 | 2670 | 8B50 | CA46 | 5040 |
| 0000210160 | 468B | 8BEC | EE56 | 4689 | 89C6 | C856 | 5052 | 909A |
| 0000210200 | DDAF | 8351 | 0AC4 | 4689 | 89EC | EE56 | D00B | 0374 |
| 0000210220 | 0CE9 | 1E00 | E368 | 9A1E | B3B6 | 531A | C483 | 8E04 |
| 0000210240 | A206 | 267A | 3E83 | 5139 | 7500 | E903 | 005F | 7E83 |
| 0000210260 | FED0 | 0375 | 56E9 | 9A00 | F7E4 | 5274 | 5052 | 468B |
| 0000210300 | 40CA | FF50 | EE76 | 76FF | FFEC | C476 | 76FF | FFC8 |
| 0000210320 | C676 | 681E | 1EF2 | 468D | 16DA | 8D50 | E846 | 5016 |

THU MAR 14 17:52:34 1991 TSLINT.DLL PAGE 75, LINE 4367

| | | | | | | | | |
|---|---|---|---|---|---|---|---|---|
| 0000210340 | 468D | 16CC | 1E50 | 3468 | 6A1F | FF66 | 2E36 | FF1F |
| 0000210360 | 2C36 | FF1F | 3236 | FF1F | 3036 | 1E1F | 0B68 | 681F |
| 0000210400 | 5194 | 9768 | 9A51 | 519A | 0000 | C483 | C436 | F05E |
| 0000210420 | FF26 | 0A77 | FF26 | 0877 | 76FF | FFEE | EC76 | 6E9A |
| 0000210440 | 0D50 | 8352 | 08C4 | 5EC4 | 26F0 | 47F6 | 0214 | 0375 |
| 0000210460 | 1BE9 | 8B00 | F046 | 568B | 8EF2 | B006 | 267A | A0A3 |
| 0000210500 | 260A | 1689 | 0AA2 | E79A | D429 | E953 | 0000 | 5EC4 |
| 0000210520 | 2606 | 478B | 2604 | 578B | 8906 | 0646 | 5689 | E908 |
| 0000210540 | FE31 | 468B | 29F8 | CA46 | 76FF | FFCA | EE76 | 76FF |
| 0000210560 | 9AEC | 734F | 52E1 | C483 | 8906 | F046 | 5689 | FFF2 |
| 0000210600 | EE76 | 76FF | 9AEC | F91E | 5419 | C483 | 8904 | C446 |
| 0000210620 | 76FF | FFEE | EC76 | 429A | A9AA | 8353 | 04C4 | 068E |
| 0000210640 | 7AA2 | 8326 | 063E | 0053 | 0375 | 54E9 | 8300 | D07E |
| 0000210660 | 75FE | E903 | 004B | E49A | B4F7 | 5252 | FF50 | C476 |
| 0000210700 | 76FF | FFEE | EC76 | 681E | 1F14 | 468D | 16DA | 8D50 |
| 0000210720 | E846 | 5016 | 468D | 16CC | 1E50 | 3468 | 6A1F | FF6D |
| 0000210740 | 2E36 | FF1F | 2C36 | FF1F | 3236 | FF1F | 3036 | 1E1F |
| 0000210760 | 2268 | 681F | 5360 | 6368 | 9A53 | 5366 | 0000 | C483 |
| 0000211000 | 8E30 | A206 | 267A | 3E83 | 5405 | 7500 | E903 | 0009 |
| 0000211020 | 7E83 | FED0 | 0374 | 0FE9 | 8E00 | A406 | 267A | 3E83 |
| 0000211040 | 5059 | 7500 | E903 | 0059 | 468B | 8BF0 | F256 | 4689 |
| 0000211060 | 89D2 | D456 | 76FF | FFD8 | D676 | 468D | 16D2 | FF50 |
| 0000211100 | E676 | 76FF | FFFC | FA76 | 4E8D | 16DA | 8D51 | E84E |
| 0000211120 | 5116 | 4E8D | 16CC | 1E51 | 3468 | 6A1F | FF6E | 2E36 |
| 0000211140 | FF1F | 2C36 | FF1F | 3236 | FF1F | 3036 | 9A1F | 4F06 |
| 0000211160 | 0000 | C483 | 8B28 | D246 | 568B | E9D4 | 000C | 09E9 |
| 0000211200 | 8B00 | F046 | 568B | E9F2 | 0000 | 5F5E | ED83 | 8B02 |
| 0000211220 | 1FE5 | 4D5D | 1ECB | 9058 | 5545 | EC8B | 8E1E | 81D8 |
| 0000211240 | 0CEC | 5700 | C456 | 065E | 8B26 | D647 | 0B26 | 0447 |
| 0000211260 | 0374 | 03E9 | E900 | 00BC | 46C7 | 00FC | E900 | 0003 |
| 0000211300 | 46FF | 83FC | FC7E | 7C7F | E903 | 00A8 | 5EC4 | 2606 |
| 0000211320 | 5FC4 | 8B04 | FC76 | E6C1 | 2602 | 008B | 8B26 | 0250 |
| 0000211340 | 4689 | 89F8 | FA56 | 0CE9 | 8B00 | F446 | 568B | 89F6 |
| 0000211360 | F846 | 5689 | 8BFA | FA46 | 460B | 75F8 | E903 | 005B |
| 0000211400 | 5EC4 | 26F8 | 078B | 8B26 | 0257 | 4689 | 89F4 | F656 |
| 0000211420 | 5EC4 | 26F8 | 478B | 2604 | 578B | 8E06 | B006 | 267A |
| 0000211440 | A0A3 | 260A | 1689 | 0AA2 | E79A | A829 | C455 | F85E |
| 0000211460 | 8B26 | 0847 | 8B26 | 0A57 | 068E | 7AB0 | A326 | 0AA0 |
| 0000211500 | 8926 | A216 | 9A0A | 29E7 | 55B3 | 76FF | FFFA | F876 |
| 0000211520 | E29A | F9B4 | 8353 | 04C4 | 8EE9 | C4FF | 065E | C426 |
| 0000211540 | 045F | 768B | C1FC | 02E6 | C02B | 8926 | 0240 | 8926 |
| 0000211560 | E900 | FF4C | 5F5E | ED83 | 8B02 | 1FE5 | 4D5D | 1ECB |
| 0000211600 | 9058 | 5545 | EC8B | 8E1E | 81D8 | 00EC | 5700 | BE56 |
| 0000211620 | 0000 | 76FF | FF08 | 0676 | 149A | 8B65 | 8355 | 04C4 |
| 0000211640 | 4689 | 8906 | 0856 | 00BF | E900 | 0001 | C447 | 065E |
| 0000211660 | 3926 | 0C7F | 037F | 16E9 | C400 | 065E | C426 | 085F |
| 0000211700 | 8A26 | 9801 | CE8B | E1D1 | C103 | F08B | DDE9 | 6AFF |
| 0000211720 | 6A00 | 8B7F | C1C6 | 10F8 | C48A | C198 | 03F8 | 1F25 |
| 0000211740 | 8B00 | C1CE | 05E1 | C10B | 2599 | FFFF | E281 | 7FFF |
| 0000211760 | 5052 | 029A | 817C | 8B53 | 8BF0 | E9C6 | 0000 | 5F5E |
| 0000212000 | ED83 | 8B02 | 1FE5 | 4D5D | 1ECB | 9058 | 5545 | EC8B |
| 0000212020 | 8E1E | 81D8 | 06EC | 5700 | C456 | 065E | C426 | 045F |
| 0000212040 | 768B | C10E | 02E6 | 8B26 | 2600 | 508B | 8902 | FA46 |
| 0000212060 | 5689 | E9FC | 0010 | 5EC4 | 26FA | 078B | 8B26 | 0257 |
| 0000212100 | 4689 | 89FA | FC56 | 468B | 0BFC | FA46 | 0375 | 30E9 |
| 0000212120 | FF00 | 0C76 | 76FF | C40A | FA5E | FF26 | 0677 | FF26 |
| 0000212140 | 0477 | 509A | E884 | 8353 | 08C4 | 003D | 7500 | E903 |
| 0000212160 | 0003 | C1E9 | 8BFF | FA46 | 568B | E9FC | 000C | B5E9 |
| 0000212200 | B8FF | 0000 | 00BA | E900 | 0000 | 5F5E | ED83 | 8B02 |

THU MAR 14 17:52:34 1991 TSLINT.DLL PAGE 76, LINE 4426

| | | | | | | | | |
|---|---|---|---|---|---|---|---|---|
| 0000212220 | 1FE5 | 4D5D | 1ECB | 9058 | 5545 | EC8B | 8E1E | 81D8 |
| 0000212240 | 00EC | 5700 | C456 | 065E | 8326 | 127F | 7428 | E903 |
| 0000212260 | 0020 | 5EC4 | 2606 | 5F8B | C10C | 02E3 | 068E | 7AB2 |
| 0000212300 | C426 | 563E | 2608 | 018B | 8B26 | 0251 | 4689 | 8906 |
| 0000212320 | 0856 | 5EC4 | 2606 | 478B | 2606 | 470B | 7404 | E903 |
| 0000212340 | 0006 | 00B8 | E900 | 009F | 76FF | FF0C | 0A76 | 6E9A |
| 0000212360 | 654D | 8357 | 04C4 | 4689 | 890A | 0C56 | 76FF | FF0C |
| 0000212400 | 0A76 | DF9A | 7C55 | 8357 | 04C4 | F08B | FF56 | 0C76 |
| 0000212420 | 76FF | FF0A | 0876 | 76FF | 9A06 | 5669 | 57AB | C483 |
| 0000212440 | 0B0A | 74D0 | E903 | 0031 | 5EC4 | 260A | 47F6 | 0214 |
| 0000212460 | 0375 | 1BE9 | 8B00 | 0A46 | 568B | 8E0C | B006 | 267A |
| 0000212500 | A0A3 | 260A | 1689 | 0AA2 | E79A | DC29 | E957 | 0000 |
| 0000212520 | 00B8 | E900 | 0031 | 2EE9 | C400 | 0A5E | F626 | 1447 |
| 0000212540 | 7502 | E903 | 001B | 468B | 8B0A | 0C56 | 068E | 7AB0 |
| 0000212560 | A326 | 0AA0 | 8926 | A216 | 9A0A | 29E7 | 55FB | 00E9 |
| 0000212600 | B800 | 0001 | C3E9 | 5E00 | 835F | 02ED | E58B | 5D1F |
| 0000212620 | CB4D | 581E | 4590 | 8B55 | 1EEC | D88E | EC81 | 002A |
| 0000212640 | 5657 | 46C7 | 3FFA | 8C1F | FC5E | 46C7 | 07F4 | 2B01 |
| 0000212660 | 89C0 | E646 | 4689 | 8EE4 | A206 | 267A | 3E83 | 5900 |
| 0000212700 | 7500 | E903 | 001D | 36FF | 1F32 | 36FF | 1F30 | 468D |
| 0000212720 | 16DA | 9A50 | 4DB0 | 0000 | C483 | 3D08 | 0000 | 0374 |
| 0000212740 | 0FE9 | 8E00 | A406 | 267A | 3E83 | 5A15 | 7500 | E903 |
| 0000212760 | 003B | 681E | 1F47 | 468D | 16E8 | 8D50 | DA46 | 5016 |
| 0000213000 | 468D | 16F6 | 6850 | 00D7 | 681E | 1F76 | 36FF | 1F2E |
| 0000213020 | 36FF | 1F2C | 36FF | 1F32 | 36FF | 1F30 | F89A | 004D |
| 0000213040 | 8300 | 1EC4 | 4689 | 89F6 | F856 | 08E9 | 2B00 | 89C0 |
| 0000213060 | F846 | 4689 | BEF6 | 0000 | 76FF | FF0C | 0A76 | DF9A |
| 0000213100 | CD55 | 8358 | 04C4 | F08B | 5EC4 | 2606 | 478B | 2606 |
| 0000213120 | 470B | 7404 | E903 | 00F0 | 529A | F4E3 | 5058 | 068E |
| 0000213140 | 7AAE | A026 | 2670 | 6850 | 01FC | 879A | B8AC | 8359 |
| 0000213160 | D6C4 | 5EC4 | 2606 | 4789 | 2604 | 5789 | C406 | 065E |
| 0000213200 | 8B26 | 0647 | 0B26 | 0447 | 0374 | 0CE9 | 1E00 | 4F68 |
| 0000213220 | 9A1F | B3B6 | 5914 | C483 | 8E04 | A206 | 267A | 3E83 |
| 0000213240 | 59FD | 7500 | E903 | 006B | 7E83 | FEDE | 0375 | 62E9 |
| 0000213260 | 9A00 | F7E4 | 5926 | 5052 | 5EC4 | 2606 | 77FF | 2606 |
| 0000213300 | 77FF | 9A04 | F91E | 56C5 | C483 | 5004 | 5EC4 | 2606 |
| 0000213320 | 77FF | 2606 | 77FF | 1E04 | 5E68 | 8D1F | E846 | 5016 |
| 0000213340 | 468D | 16F6 | 8D50 | DA46 | 5016 | 681E | 1F76 | E168 |
| 0000213360 | FF00 | 2E36 | FF1F | 2C36 | FF1F | 3236 | FF1F | 3036 |
| 0000213400 | 1E1F | 6C68 | 681F | 5454 | 5768 | 9A54 | 545A | 0000 |
| 0000213420 | C483 | BF30 | 0000 | 01E9 | 4700 | FF83 | 7C7F | E903 |
| 0000213440 | 001A | C78B | E0C1 | C402 | 065E | C426 | 045F | D803 |
| 0000213460 | C02B | 8926 | 0247 | 8926 | E907 | FFDD | 5EC4 | 2606 |
| 0000213500 | 47C7 | 3E12 | E900 | 00DE | FF56 | 0C76 | 76FF | FF0A |
| 0000213520 | 0876 | 76FF | 9A06 | 5669 | 59F1 | C483 | 890A | D646 |
| 0000213540 | 5689 | 8BD8 | D846 | 460B | 75D6 | E903 | 00B8 | 5EC4 |
| 0000213560 | 260A | 47F6 | 0214 | 0375 | 1BE9 | 8B00 | 0A46 | 568B |
| 0000213600 | 8E0C | B006 | 267A | A0A3 | 260A | 1689 | 0AA2 | E79A |
| 0000213620 | 8B29 | E95A | 0000 | 068E | 7AA2 | 8326 | 083E | 005B |
| 0000213640 | 0375 | 09E9 | 8300 | DE7E | 74FE | E903 | 000F | 068E |
| 0000213660 | 7AA4 | 8326 | 203E | 005B | 0375 | 5DE9 | 8B00 | D646 |
| 0000213700 | 568B | 05D8 | 0008 | 4689 | 89E0 | E256 | 76FF | FFE6 |
| 0000213720 | E476 | 468D | 16E0 | FF50 | F476 | 76FF | FFFC | FA76 |
| 0000213740 | 4E8D | 16E8 | 8D51 | F64E | 5116 | 4E8D | 16DA | 1E51 |
| 0000213760 | 7668 | 681F | 00E9 | 36FF | 1F2E | 36FF | 1F2C | 36FF |
| 0000214000 | 1F32 | 36FF | 1F30 | 729A | 005B | 8300 | 28C4 | 468B |
| 0000214020 | 8BE0 | E256 | 1AE9 | E901 | 000C | 468B | 8BD6 | D856 |
| 0000214040 | 0805 | E900 | 010B | 506A | A69A | 9FB2 | 835A | 02C4 |
| 0000214060 | 4689 | 89D6 | D856 | 76FF | FF0C | 0A76 | 839A | 5169 |

THU MAR 14 17:52:34 1991 TSLINT.DLL PAGE 77, LINE 4485

| | | | | | | | | |
|---|---|---|---|---|---|---|---|---|
| 0000214100 | 8357 | 04C4 | 5EC4 | 26D6 | 4789 | 2604 | 5789 | 8E06 |
| 0000214120 | A806 | 267A | 3AA1 | 2637 | 168B | 373C | 5EC4 | 26D6 |
| 0000214140 | 4789 | 2608 | 5789 | 8B0A | C1C6 | 02E0 | 5EC4 | 2606 |
| 0000214160 | 5FC4 | 0304 | 26D8 | 078B | 8B26 | 0257 | 5EC4 | 26D6 |
| 0000214200 | 0789 | 8926 | 0257 | 468B | 8BD6 | D856 | CE8B | E1C1 |
| 0000214220 | C402 | 065E | C426 | 045F | D903 | 8926 | 2607 | 5789 |
| 0000214240 | 8E02 | A206 | 267A | 3E83 | 5468 | 7500 | E903 | 0009 |
| 0000214260 | 7E83 | FEDE | 0374 | 0FE9 | 8E00 | A406 | 267A | 3E83 |
| 0000214300 | 5480 | 7500 | E903 | 005D | 468B | 8BD6 | D856 | 0805 |
| 0000214320 | 8900 | E046 | 5689 | FFE2 | E676 | 76FF | 8DE4 | E046 |
| 0000214340 | 5016 | 76FF | FFF4 | FC76 | 76FF | 8DFA | E84E | 5116 |
| 0000214360 | 4E8D | 16F6 | 8D51 | DA4E | 5116 | 681E | 1F76 | F168 |
| 0000214400 | FF00 | 2E36 | FF1F | 2C36 | FF1F | 3236 | FF1F | 3036 |
| 0000214420 | 9A1F | 54CE | 0000 | C483 | 8B28 | E046 | 568B | E9E2 |
| 0000214440 | 000F | 0CE9 | 8B00 | D646 | 568B | 05D8 | 0008 | 00E9 |
| 0000214460 | 5E00 | 835F | 02ED | E58B | 5D1F | CB4D | 581E | 459C |
| 0000214500 | 8B55 | 1EEC | D88E | EC81 | 000E | 5657 | 00BE | C400 |
| 0000214520 | 065E | 8B26 | 0647 | 0B26 | 0447 | 0374 | 03E9 | E900 |
| 0000214540 | 0145 | 76FF | FF0C | 0A76 | 6E9A | DF4D | 835B | 04C4 |
| 0000214560 | 4689 | 89FA | FC56 | 76FF | FFFC | FA76 | DF9A | A155 |
| 0000214600 | 8358 | 04C4 | F08B | C02B | 4689 | 89F4 | F246 | FE8B |
| 0000214620 | E7C1 | C402 | 065E | C426 | 045F | 8B26 | 2601 | 518B |
| 0000214640 | 8902 | F646 | 5689 | E9F8 | 0016 | 5EC4 | 89F6 | F25E |
| 0000214660 | 468C | 26F4 | 078B | 8B26 | 0257 | 4689 | 89F6 | F856 |
| 0000214700 | 468B | 0BF8 | F646 | 0375 | 27E9 | FF00 | FC76 | 76FF |
| 0000214720 | C4FA | F65E | FF26 | 0677 | FF26 | 0477 | 509A | BB84 |
| 0000214740 | 8358 | 08C4 | 003D | 7400 | E903 | 0003 | 03E9 | E900 |
| 0000214760 | FFB8 | 5EC4 | 26FA | 47F6 | 0214 | 0375 | 1BE9 | 8B00 |
| 0000215000 | FA46 | 568B | 8EFC | B006 | 267A | A0A3 | 260A | 1689 |
| 0000215020 | 0AA2 | E79A | DA29 | E95C | 0000 | 468B | 0BF8 | F646 |
| 0000215040 | 0374 | 03E9 | E900 | 007F | 468B | 0BF4 | F246 | 0375 |
| 0000215060 | 17E9 | C400 | F65E | 8B26 | 2607 | 578B | C402 | F25E |
| 0000215100 | 8926 | 2607 | 5789 | E902 | 0015 | FE8B | E7C1 | C402 |
| 0000215120 | 065E | C426 | 045F | C02B | 8926 | 0241 | 8926 | C401 |
| 0000215140 | F65E | 8B26 | 0447 | 8B26 | 0657 | 068E | 7AB0 | A326 |
| 0000215160 | 0AA0 | 8926 | A216 | 9A0A | 29E7 | 5CF7 | 5EC4 | 26F6 |
| 0000215200 | 478B | 2608 | 578B | 8E0A | B006 | 267A | A0A3 | 260A |
| 0000215220 | 1689 | 0AA2 | E79A | 0229 | FF5D | F876 | 76FF | 9AF6 |
| 0000215240 | B4E2 | 5BCB | C483 | 5E04 | 835F | 02ED | E58B | 5D1F |
| 0000215260 | CB4D | 581E | 4590 | 8B55 | 1EEC | D88E | EC81 | 002A |
| 0000215300 | 5657 | 46C7 | 83FA | 8C1F | FC5E | 46C7 | 07F4 | 2B01 |
| 0000215320 | 89C0 | E246 | 4689 | 8EED | A206 | 267A | 3E83 | 5DCC |
| 0000215340 | 7500 | E903 | 001D | 36FF | 1F32 | 36FF | 1F30 | 468D |
| 0000215360 | 16D6 | 9A50 | 5834 | 0000 | C483 | 3D08 | 0000 | 0374 |
| 0000215400 | 0FE9 | 8E00 | A406 | 267A | 3E83 | 5DE4 | 7500 | E903 |
| 0000215420 | 003B | 681E | 1F93 | 468D | 16E4 | 8D50 | D646 | 5016 |
| 0000215440 | 468D | 16F6 | 6850 | 011A | 681E | 1FCA | 36FF | 1F2E |
| 0000215460 | 36FF | 1F2C | 36FF | 1F32 | 36FF | 1F30 | 7D9A | 0058 |
| 0000215500 | 8300 | 1EC4 | 4689 | 89F6 | F856 | 08E9 | 2B00 | 89C0 |
| 0000215520 | F846 | 4689 | C4F6 | 065E | 8B26 | 0647 | 0B26 | 0447 |
| 0000215540 | 0374 | 86E9 | 8E00 | A206 | 267A | 3E83 | 5E84 | 7500 |
| 0000215560 | E903 | 0009 | 7E83 | FEDA | 0374 | 0FE9 | 8E00 | A406 |
| 0000215600 | 267A | 3E83 | 5F43 | 7500 | E903 | 0056 | C02B | 4689 |
| 0000215620 | 89DE | DC46 | 76FF | FFE2 | E076 | 468D | 16DC | FF50 |
| 0000215640 | F476 | 76FF | FFFC | FA76 | 4E8D | 16E4 | 8D51 | F64E |
| 0000215660 | 5116 | 4E8D | 16D6 | 1E51 | CA68 | 681F | 011E | 36FF |
| 0000215700 | 1F2E | 36FF | 1F2C | 36FF | 1F32 | 36FF | 1F30 | 9A9A |
| 0000215720 | 005F | 8300 | 28C4 | 468B | 8BDC | DE56 | 7FE9 | E901 |
| 0000215740 | 0009 | 00B8 | BA00 | 0000 | 73E9 | 9A01 | E352 | 5E78 |

THU MAR 14 17:52:34 1991 TSLINT.DLL PAGE 78, LINE 4544

| | | | | | | | | |
|---|---|---|---|---|---|---|---|---|
| 0000215760 | 8E50 | AE06 | 267A | 70A0 | 5026 | 0E6A | 879A | 54AC |
| 0000216000 | 835F | 06C4 | 4689 | 89F0 | F256 | D00B | 0374 | 0CE9 |
| 0000216020 | 1E00 | A368 | 9A1F | B3B6 | 5E98 | C483 | 8E04 | A206 |
| 0000216040 | 267A | 3E83 | 5F2B | 7500 | E903 | 0061 | 7E83 | FEDA |
| 0000216060 | 0375 | 58E9 | 9A00 | F7E4 | 5EA5 | 5052 | 76FF | FFF2 |
| 0000216100 | F076 | 1E9A | 3FF9 | 835C | 04C4 | FF50 | F276 | 76FF |
| 0000216120 | 1EF0 | B268 | 8D1F | E446 | 5016 | 468D | 16F6 | 8D50 |
| 0000216140 | D646 | 5016 | 681E | 1FCA | 1F68 | FF01 | 2E36 | FF1F |
| 0000216160 | 2C36 | FF1F | 3236 | FF1F | 3036 | 1E1F | C068 | 681F |
| 0000216200 | 5966 | 6968 | 9A59 | 596C | 0000 | C483 | C430 | F05E |
| 0000216220 | C726 | 7F07 | C400 | 065E | 8B26 | 0447 | 8B26 | 0657 |
| 0000216240 | 5EC4 | 26F0 | 4789 | 2602 | 5789 | C404 | 065E | C426 |
| 0000216260 | 045F | 8B26 | 2607 | 578B | C402 | F05E | 8926 | 0647 |
| 0000216300 | 8926 | 0857 | 068E | 7AA2 | 8326 | 1E3E | 0058 | 0375 |
| 0000216320 | 09E9 | 8300 | DA7E | 74FE | E903 | 000F | 068E | 7AA4 |
| 0000216340 | 8326 | 4A3E | 0058 | 0375 | 62E9 | FF00 | F276 | 76FF |
| 0000216360 | 9AF0 | 5FC9 | 5FB6 | C483 | 8904 | DC46 | 5689 | FFDE |
| 0000216400 | E276 | 76FF | 8DE0 | DC46 | 5016 | 76FF | FFF4 | FC76 |
| 0000216420 | 76FF | 8DFA | E44E | 5116 | 4E8D | 16F6 | 8D51 | D64E |
| 0000216440 | 5116 | 681E | 1FCA | 2368 | FFD1 | 2E36 | FF1F | 2C36 |
| 0000216460 | FF1F | 3236 | FF1F | 3036 | 9A1F | 5A67 | 0000 | C483 |
| 0000216500 | 8B28 | DC46 | 568B | E9DE | 0014 | 11E9 | FF00 | F276 |
| 0000216520 | 76FF | 9AF0 | 5FC9 | 5C75 | C483 | E904 | 0000 | 5F5E |
| 0000216540 | ED83 | 8B02 | 1FE5 | 4D5D | 1ECB | 9058 | 5545 | EC8B |
| 0000216560 | 8E1E | 81D8 | 28EC | 5700 | C756 | FA46 | 1FD5 | 5E8C |
| 0000216600 | C7FC | F446 | 0107 | C02B | 4689 | 89E6 | E446 | 068E |
| 0000216620 | 7AA2 | 8326 | CB3E | 0060 | 0375 | 1DE9 | FF00 | 3236 |
| 0000216640 | FF1F | 3036 | 8D1F | DA46 | 5016 | 549A | 005D | 8300 |
| 0000216660 | 08C4 | 003D | 7400 | E903 | 000F | 068E | 7AA4 | 8326 |
| 0000216700 | E33E | 0060 | 0375 | 3BE9 | 1E00 | E568 | 8D1F | E846 |
| 0000216720 | 5016 | 468D | 16DA | 8D50 | F646 | 5016 | 2B68 | 1E01 |
| 0000216740 | 0C68 | FF20 | 2E36 | FF1F | 2C36 | FF1F | 3236 | FF1F |
| 0000216760 | 3036 | 9A1F | 5D9D | 0000 | C483 | 891E | F646 | 5689 |
| 0000217000 | E9F8 | 0008 | C02B | 4689 | 89F8 | F646 | 06E9 | C400 |
| 0000217020 | 065E | FF26 | C40F | 065E | 8326 | 003F | 0375 | F1E9 |
| 0000217040 | C400 | 065E | 8B26 | 0847 | 0B26 | 0647 | 0375 | C0E9 |
| 0000217060 | C400 | 065E | C426 | 065F | 8B26 | 0447 | 8B26 | 0657 |
| 0000217100 | 5EC4 | 2606 | 4789 | 260A | 5789 | C40C | 065E | C426 |
| 0000217120 | 065F | 8B26 | 2607 | 578B | C402 | 065E | 8926 | 0647 |
| 0000217140 | 8926 | 0857 | 068E | 7AA2 | 8326 | 3E3E | 005D | 0375 |
| 0000217160 | 09E9 | 8300 | DE7E | 74FE | E903 | 000F | 068E | 7AA4 |
| 0000217200 | 8326 | 6A3E | 005D | 0375 | 5AE9 | 8B00 | 0646 | 568B |
| 0000217220 | 8908 | E046 | 5689 | FFE2 | E676 | 76FF | 8DE4 | E046 |
| 0000217240 | 5016 | 76FF | FFF4 | FC76 | 76FF | 8DFA | E84E | 5116 |
| 0000217260 | 4E8D | 16F6 | 8D51 | DA4E | 5116 | 681E | 200C | 3168 |
| 0000217300 | FF01 | 2E36 | FF1F | 2C36 | FF1F | 3236 | FF1F | 3036 |
| 0000217320 | 9A1F | 5E2F | 0000 | C483 | 8B28 | E046 | 568B | E9E2 |
| 0000217340 | 0139 | 09E9 | 8B00 | 0646 | 568B | E908 | 012D | 30E9 |
| 0000217360 | C4FF | 065E | 8326 | 0247 | 2604 | 5FC4 | 2602 | 078B |
| 0000217400 | 8B26 | 0257 | 5EC4 | 2606 | 4789 | 2606 | 5789 | E908 |
| 0000217420 | FEFD | 76FF | FF08 | 0676 | 1E9A | ACF9 | 8361 | 04C4 |
| 0000217440 | 4689 | FFD8 | 0876 | 76FF | 9A06 | AA42 | 5E5F | C483 |
| 0000217460 | 8E04 | A206 | 267A | 3E83 | 5FF5 | 7500 | E903 | 0055 |
| 0000217500 | 7E83 | FEDE | 0375 | 4CE9 | 9A00 | F7E4 | 5E4E | 5052 |
| 0000217520 | 76FF | FFD8 | 0876 | 76FF | 1E06 | F568 | 8D1F | E846 |
| 0000217540 | 5016 | 468D | 16F6 | 8D50 | DA46 | 5016 | 681E | 200C |
| 0000217560 | 3568 | FF01 | 2E36 | FF1F | 2C36 | FF1F | 3236 | FF1F |
| 0000217600 | 3036 | 1E1F | 0368 | 6820 | 5EE0 | E368 | 9A5E | 5EE6 |
| 0000217620 | 0000 | C483 | 8E30 | A206 | 267A | 3E83 | 6198 | 7500 |

THU MAR 14 17:52:34 1991 TSLINT.DLL PAGE 79, LINE 4603

| | | | | | | | | |
|---|---|---|---|---|---|---|---|---|
| 0000217640 | E903 | 0009 | 7E83 | FEDE | 0374 | 0FE9 | 8E00 | A406 |
| 0000217660 | 267A | 3E83 | 6021 | 7500 | E903 | 0056 | C02B | 4689 |
| 0000217700 | 89E2 | E046 | 76FF | FFE6 | E476 | 468D | 16E0 | FF50 |
| 0000217720 | F476 | 76FF | FFFC | FA76 | 4E8D | 16E8 | 8D51 | F64E |
| 0000217740 | 5116 | 4E8D | 16DA | 1E51 | 0C68 | 6820 | 0136 | 36FF |
| 0000217760 | 1F2E | 36FF | 1F2C | 36FF | 1F32 | 36FF | 1F30 | 329A |
| 0000220000 | 0061 | 8300 | 28C4 | 468B | 8BE0 | E256 | 0CE9 | E900 |
| 0000220020 | 0009 | 00B8 | BA00 | 0000 | 00E9 | 5E00 | 835F | 02ED |
| 0000220040 | E58B | 5D1F | CB4D | 581E | 4590 | 8B55 | 1EEC | D88E |
| 0000220060 | EC81 | 0032 | 5657 | 46C7 | 39FA | 8C20 | FC5E | 46C7 |
| 0000220100 | 04F4 | 2B01 | 89C0 | E646 | 4689 | 8EE4 | B406 | 267A |
| 0000220120 | 3E83 | 61FC | 7500 | E903 | 001D | 36FF | 20F4 | 36FF |
| 0000220140 | 20F2 | 468D | 16D6 | 9A50 | 600B | 0000 | C483 | 3D08 |
| 0000220160 | 0000 | 0374 | 0FE9 | 8E00 | B606 | 267A | 3E83 | 6214 |
| 0000220200 | 7500 | E903 | 003A | 681E | 2040 | 468D | 16E8 | 8D50 |
| 0000220220 | D646 | 5016 | 468D | 16F6 | 6A50 | 1E4B | 1E68 | FF21 |
| 0000220240 | F036 | FF20 | EE36 | FF20 | F436 | FF20 | F236 | 9A20 |
| 0000220260 | 6054 | 0000 | C483 | 891E | F646 | 5689 | E9F8 | 0008 |
| 0000220300 | C02B | 4689 | 89F8 | F646 | 468B | 0B08 | 0646 | 0374 |
| 0000220320 | 12E9 | 1E00 | 4768 | 6A20 | 1E4F | 5768 | 9A20 | B3B6 |
| 0000220340 | 635F | C483 | C40A | 065E | 8326 | 127F | 754E | E903 |
| 0000220360 | 0012 | 681E | 2073 | 516A | 681E | 2083 | B69A | 7EB3 |
| 0000220400 | 8363 | 0AC4 | 5EC4 | 2606 | 7F80 | 0014 | 0374 | 12E9 |
| 0000220420 | 1E00 | 9F68 | 6A20 | 1E53 | AF68 | 9A20 | B3B6 | 617B |
| 0000220440 | C483 | C40A | 065E | F626 | 1447 | 7508 | E903 | 0021 |
| 0000220460 | 068E | 7AB8 | 468B | 8B06 | 0856 | 1E06 | B4BF | 8B6E |
| 0000220500 | 8EF0 | A5DA | A5A5 | 1FA5 | B807 | 6EB4 | C28C | 58E9 |
| 0000220520 | C401 | 065E | FF26 | 0A77 | FF26 | 0877 | 468D | 50CE |
| 0000220540 | 969A | 5551 | 1E56 | F08B | 1F16 | 7EC4 | A506 | A5A5 |
| 0000220560 | 1FA5 | 5EC4 | 2606 | 4F80 | 0814 | 068E | 7AB4 | 8326 |
| 0000220600 | 513E | 0064 | 0375 | 61E9 | 8300 | DA7E | 75FE | E903 |
| 0000220620 | 0058 | 5EC4 | 2606 | 77FF | 2606 | 77FF | 2604 | 77FF |
| 0000220640 | 2602 | 37FF | 5EC4 | 2606 | 77FF | 260A | 77FF | 1E08 |
| 0000220660 | CB68 | 8D20 | E846 | 5016 | 468D | 16F6 | 8D50 | D646 |
| 0000220700 | 5016 | 681E | 211E | 5A6A | 36FF | 20F0 | 36FF | 20EE |
| 0000220720 | 36FF | 20F4 | 36FF | 20F2 | 681E | 20E6 | E868 | 6861 |
| 0000220740 | 61EB | EE9A | 0061 | 8300 | 32C4 | 068E | 7AB4 | 8326 |
| 0000220760 | B23E | 0062 | 0375 | 09E9 | 8300 | DA7E | 74FE | E903 |
| 0000221000 | 000F | 068E | 7AB6 | 8326 | DE3E | 0062 | 0375 | 77E9 |
| 0000221020 | 8B00 | 0646 | 568B | 1E08 | 7E8D | 8BDC | 16F0 | 8E07 |
| 0000221040 | A5DA | A5A5 | 1FA5 | 76FF | FFE6 | E476 | 468D | 16DC |
| 0000221060 | FF50 | F476 | 76FF | FFFC | FA76 | 4E8D | 16E8 | 8D51 |
| 0000221100 | F64E | 5116 | 4E8D | 16D6 | 1E51 | 1E68 | 6A21 | FF56 |
| 0000221120 | F036 | FF20 | EE36 | FF20 | F436 | FF20 | F236 | 9A20 |
| 0000221140 | 625F | 0000 | C483 | 8E28 | B806 | 067A | BF1E | 6EB4 |
| 0000221160 | 768D | 8CDC | 8ED0 | A5D8 | A5A5 | 1FA5 | B807 | 6EB4 |
| 0000221200 | C28C | 24E9 | E900 | 0021 | 068E | 7AB8 | 468B | 8B06 |
| 0000221220 | 0856 | 1E06 | B4BF | 8B6E | 8EF0 | A5DA | A5A5 | 1FA5 |
| 0000221240 | B807 | 6EB4 | C28C | 00E9 | 5E00 | 835F | 02ED | E58B |
| 0000221260 | 5D1F | CB4D | 581E | 4590 | 8B55 | 1EEC | D88E | EC81 |
| 0000221300 | 00B4 | 5657 | 46C7 | 2DF8 | 8C21 | FA5E | 46C7 | 07EA |
| 0000221320 | 2B01 | 89C0 | DC46 | 4689 | 8EDA | B406 | 267A | 3E83 |
| 0000221340 | 63E1 | 7500 | E903 | 001D | 36FF | 20F4 | 36FF | 20F2 |
| 0000221360 | 468D | 16D0 | 9A50 | 62C8 | 0000 | C483 | 3D08 | 0000 |
| 0000221400 | 0374 | 0FE9 | 8E00 | B606 | 267A | 3E83 | 6469 | 7500 |
| 0000221420 | E903 | 003A | 681E | 2134 | 468D | 16DE | 8D50 | D046 |
| 0000221440 | 5016 | 468D | 16F0 | 6A50 | 1E63 | 4668 | FF22 | F036 |
| 0000221460 | FF20 | EE36 | FF20 | F436 | FF20 | F236 | 9A20 | 6310 |
| 0000221500 | 0000 | C483 | 891E | F046 | 5689 | E9F2 | 0008 | C02B |

THU MAR 14 17:52:34 1991 TSLINT.DLL PAGE 80, LINE 4662

| | | | | | | | | |
|---|---|---|---|---|---|---|---|---|
| 0000221520 | 4689 | 89F2 | F046 | 868D | FF50 | 4689 | 8CF4 | F656 |
| 0000221540 | 468B | 0B08 | 0646 | 0374 | 12E9 | 1E00 | 3B68 | 6A21 |
| 0000221560 | 1E6C | 4B68 | 9A21 | B3B6 | 65F7 | C483 | C40A | 065E |
| 0000221600 | 8326 | 127F | 754E | E903 | 0012 | 681E | 2167 | 6E6A |
| 0000221620 | 681E | 2177 | B69A | 2CB3 | 8366 | 0AC4 | 5EC4 | 2606 |
| 0000221640 | 47F6 | 1014 | 0375 | 09E9 | 8B00 | 0646 | 568B | E908 |
| 0000221660 | 0366 | 5EC4 | 2606 | 47F6 | 0814 | 0374 | 12E9 | 1E00 |
| 0000221700 | 9368 | 6A21 | 1E72 | A368 | 9A21 | B3B6 | 664B | C483 |
| 0000221720 | C40A | 065E | 8026 | 0E7F | 7500 | E903 | 0012 | 681E |
| 0000221740 | 21BF | 746A | 681E | 21CF | B69A | 40B3 | 8363 | 0AC4 |
| 0000221760 | 5EC4 | 2606 | 4F80 | 1014 | 068E | 7ABA | C426 | 801E |
| 0000222000 | 260A | 1FC4 | 8B26 | 0847 | 8B26 | 0A57 | 4689 | 89EC |
| 0000222020 | EE56 | 5EC4 | A0EC | 21EB | 3826 | 7407 | E903 | 00D7 |
| 0000222040 | 681E | 21F0 | 76FF | FFEE | EC76 | EA9A | A250 | 8366 |
| 0000222060 | 08C4 | 003D | 7400 | E903 | 00BD | 5EC4 | 8D06 | 9A1F |
| 0000222100 | 9935 | 66AC | 5EC4 | 8D06 | 9A1F | 9935 | 66B1 | F79A |
| 0000222120 | C29B | 8966 | 4E96 | 89FF | 4C86 | 8DFF | 4C9E | 9AFF |
| 0000222140 | 99C0 | 66C7 | 1D9A | D69F | 7466 | E903 | 0089 | 5EC4 |
| 0000222160 | 8D06 | 9A1F | 9935 | 66DB | F79A | 3A9B | 8967 | FC46 |
| 0000222200 | 0A3D | 7C00 | E903 | 0029 | 7E83 | 00FC | 037D | 20E9 |
| 0000222220 | 8B00 | FC5E | E3C1 | 8B02 | F687 | 8B20 | F897 | 8920 |
| 0000222240 | F446 | 5689 | C4F6 | 065E | C726 | 0C47 | 0001 | 43E9 |
| 0000222260 | C700 | EC46 | 21F5 | 5E8C | C4EE | 065E | FF26 | 0677 |
| 0000222300 | FF26 | 0477 | FF26 | 0277 | FF26 | FF37 | EE76 | 76FF |
| 0000222320 | FFEC | F676 | 76FF | 9AF4 | 59B2 | 6748 | C483 | FF10 |
| 0000222340 | F676 | 76FF | 9AF4 | 5114 | 6778 | C483 | C404 | 065E |
| 0000222360 | 8926 | 0C47 | 3BE9 | C400 | 065E | FF26 | 0677 | FF26 |
| 0000222400 | 0477 | FF26 | 0277 | FF26 | FF37 | EE76 | 76FF | FFEC |
| 0000222420 | F676 | 76FF | 9AF4 | 59B2 | 6786 | C483 | FF10 | F676 |
| 0000222440 | 76FF | 9AF4 | 5114 | 63C3 | C483 | C404 | 065E | 8926 |
| 0000222460 | 0C47 | 5EC4 | 2606 | 47C6 | 010E | 529A | D8E3 | 5065 |
| 0000222500 | 068E | 7ABC | A026 | 2670 | C450 | 065E | 8B26 | 0C47 |
| 0000222520 | 5040 | 879A | 8CAC | 8361 | 06C4 | 5EC4 | 2606 | 4789 |
| 0000222540 | 2608 | 5789 | C40A | 065E | 8B26 | 0A47 | 0B26 | 0847 |
| 0000222560 | 0374 | 0CE9 | 1E00 | FB68 | 9A21 | B3B6 | 67FC | C483 |
| 0000222600 | 8E04 | B406 | 267A | 3E83 | 6884 | 7500 | E903 | 006B |
| 0000222620 | 7E83 | FED4 | 0375 | 62E9 | 9A00 | F7E4 | 680E | 5052 |
| 0000222640 | 5EC4 | 2606 | 77FF | 260A | 77FF | 9A08 | F91E | 679D |
| 0000222660 | C483 | 5004 | 5EC4 | 2606 | 77FF | 260A | 77FF | 1E08 |
| 0000222700 | 0A68 | 8D22 | DE46 | 5016 | 468D | 16F0 | 8D50 | D046 |
| 0000222720 | 5016 | 681E | 2246 | 8868 | FF00 | F036 | FF20 | EE36 |
| 0000222740 | FF20 | F436 | FF20 | F236 | 1E20 | 1868 | 6822 | 68E1 |
| 0000222760 | E468 | 9A68 | 68E7 | 0000 | C483 | C430 | 065E | 8B26 |
| 0000223000 | 0C47 | 5040 | 76FF | FFF6 | F476 | 5EC4 | 2606 | 77FF |
| 0000223020 | 260A | 77FF | 9A08 | 662E | 668D | C483 | 8E0A | B406 |
| 0000223040 | 267A | 3E83 | 68F5 | 7500 | E903 | 0062 | 7E83 | FED4 |
| 0000223060 | 0375 | 59E9 | C400 | 065E | FF26 | 0A77 | FF26 | 0877 |
| 0000223100 | 5EC4 | 2606 | 77FF | 2606 | 77FF | 2604 | 77FF | 2602 |
| 0000223120 | 37FF | 681E | 2221 | 468D | 16DE | 8D50 | F046 | 5016 |
| 0000223140 | 468D | 16D0 | 1E50 | 4668 | 6822 | 008A | 36FF | 20F0 |
| 0000223160 | 36FF | 20EE | 36FF | 20F4 | 36FF | 20F2 | 681E | 223D |
| 0000223200 | 3D68 | 6864 | 6440 | 439A | 0064 | 8300 | 32C4 | 068E |
| 0000223220 | 7AB4 | 8326 | 403E | 0065 | 0375 | 09E9 | 8300 | D47E |
| 0000223240 | 74FE | E903 | 000F | 068E | 7AB6 | 8326 | 6C3E | 0065 |
| 0000223260 | 0375 | 5AE9 | 8B00 | 0646 | 568B | 8908 | D646 | 5689 |
| 0000223300 | FFD8 | DC76 | 76FF | 8DDA | D646 | 5016 | 76FF | FFEA |
| 0000223320 | FA76 | 76FF | 8DF8 | DE4E | 5116 | 4E8D | 16F0 | 8D51 |
| 0000223340 | D04E | 5116 | 681E | 2246 | 8B68 | FF00 | F036 | FF20 |
| 0000223360 | EE36 | FF20 | F436 | FF20 | F236 | 9A20 | 64C0 | 0000 |

THU MAR 14 17:52:34 1991 TSLINT.DLL PAGE 81, LINE 4721

| | | | | | | | | |
|---|---|---|---|---|---|---|---|---|
| 0000223400 | C483 | 8B28 | D646 | 568B | E9D8 | 000C | 09E9 | 8B00 |
| 0000223420 | 0646 | 568B | E908 | 0000 | 5F5E | ED83 | 8B02 | 1FE5 |
| 0000223440 | 4D5D | 1ECB | 9058 | 5545 | EC8B | 8E1E | 81D8 | 2AEC |
| 0000223460 | 5700 | C756 | FA46 | 2255 | 5E8C | C7FC | F446 | 0107 |
| 0000223500 | C02B | 4689 | 89E6 | E446 | 068E | 7AB4 | 8326 | E83E |
| 0000223520 | 0067 | 0375 | 1DE9 | FF00 | F436 | FF20 | F236 | 8D20 |
| 0000223540 | DA46 | 5016 | 569A | 0065 | 8300 | 08C4 | 003D | 7400 |
| 0000223560 | E903 | 000F | 068E | 7AB6 | 8326 | 0D3E | 0069 | 0375 |
| 0000223600 | 3BE9 | 1E00 | 5C68 | 8D22 | E846 | 5016 | 468D | 16DA |
| 0000223620 | 8D50 | F646 | 5016 | 9768 | 1E00 | 8A68 | FF22 | F036 |
| 0000223640 | FF20 | EE36 | FF20 | F436 | FF20 | F236 | 9A20 | 659E |
| 0000223660 | 0000 | C483 | 891E | F646 | 5689 | E9F8 | 0008 | C02B |
| 0000223700 | 4689 | 89F8 | F646 | 5EC4 | 2606 | 47F6 | 0214 | 0375 |
| 0000223720 | 9AE9 | C400 | 065E | 8026 | 1467 | C4FD | 065E | 8026 |
| 0000223740 | 144F | 8E01 | B406 | 267A | 3E83 | 6AF8 | 7500 | E903 |
| 0000223760 | 0009 | 7E83 | FEDE | 0374 | 0FE9 | 8E00 | B606 | 267A |
| 0000224000 | 3E83 | 6B10 | 7500 | E903 | 005A | 468B | 8B06 | 0856 |
| 0000224020 | 4689 | 89E0 | E256 | 76FF | FFE6 | E476 | 468D | 16E0 |
| 0000224040 | FF50 | F476 | 76FF | FFFC | FA76 | 4E8D | 16E8 | 8D51 |
| 0000224060 | F64E | 5116 | 4E8D | 16DA | 1E51 | 8A68 | 6822 | 009E |
| 0000224100 | 36FF | 20F0 | 36FF | 20EE | 36FF | 20F4 | 36FF | 20F2 |
| 0000224120 | 5F9A | 006B | 8300 | 28C4 | 468B | 8BE0 | E256 | 92E9 |
| 0000224140 | E902 | 0009 | 468B | 8B06 | 0856 | 86E9 | C402 | 065E |
| 0000224160 | 8A26 | 1447 | 1124 | 113C | 0374 | 9EE9 | C400 | 065E |
| 0000224200 | 8026 | 0E7F | 72FF | E903 | 0007 | 5EC4 | 2606 | 47FE |
| 0000224220 | 8E0E | B406 | 267A | 3E83 | 6C1F | 7500 | E903 | 0009 |
| 0000224240 | 7E83 | FEDE | 0374 | 0FE9 | 8E00 | B606 | 267A | 3E83 |
| 0000224260 | 6CE8 | 7500 | E903 | 005A | 468B | 8B06 | 0856 | 4689 |
| 0000224300 | 89E0 | E256 | 76FF | FFE6 | E476 | 468D | 16E0 | FF50 |
| 0000224320 | F476 | 76FF | FFFC | FA76 | 4E8D | 16E8 | 8D51 | F64E |
| 0000224340 | 5116 | 4E8D | 16DA | 1E51 | 8A68 | 6822 | 00A3 | 36FF |
| 0000224360 | 20F0 | 36FF | 20EE | 36FF | 20F4 | 36FF | 20F2 | 379A |
| 0000224400 | 006D | 8300 | 28C4 | 468B | 8BE0 | E256 | E4E9 | E901 |
| 0000224420 | 0009 | 468B | 8B06 | 0856 | D8E9 | 6A01 | 9A00 | B2A6 |
| 0000224440 | 6BEC | C483 | 8902 | D646 | 5689 | 8BD8 | 0646 | 568B |
| 0000224460 | 1E08 | F08B | DA8E | 7EC4 | B9D6 | 000B | A5F3 | C41F |
| 0000224500 | D65E | 8026 | 1467 | C4F9 | D65E | 8026 | 144F | C401 |
| 0000224520 | 065E | 8326 | 127F | 744E | E903 | 010D | 5EC4 | 2606 |
| 0000224540 | 47F6 | 1014 | 0375 | 00E9 | C401 | D65E | C626 | 0E47 |
| 0000224560 | 9A01 | E352 | 6C13 | 8E50 | BC06 | 267A | 70A0 | 5026 |
| 0000224600 | 5EC4 | 26D6 | 478B | 400C | 9A50 | AC87 | 67B5 | C483 |
| 0000224620 | C406 | D65E | 8926 | 0847 | 8926 | 0A57 | 5EC4 | 26D6 |
| 0000224640 | 478B | 260A | 470B | 7408 | E903 | 000C | 681E | 2263 |
| 0000224660 | B69A | 33B3 | 836C | 04C4 | 068E | 7AB4 | 8326 | D03E |
| 0000224700 | 006C | 0375 | 6BE9 | 8300 | DE7E | 75FE | E903 | 0062 |
| 0000224720 | E49A | 45F7 | 526C | C450 | D65E | FF26 | 0A77 | FF26 |
| 0000224740 | 0877 | 1E9A | DCF9 | 8367 | 04C4 | C450 | D65E | FF26 |
| 0000224760 | 0A77 | FF26 | 0877 | 681E | 2272 | 468D | 16E8 | 8D50 |
| 0000225000 | F646 | 5016 | 468D | 16DA | 1E50 | 8A68 | 6822 | 00AB |
| 0000225020 | 36FF | 20F0 | 36FF | 20EE | 36FF | 20F4 | 36FF | 20F2 |
| 0000225040 | 681E | 2280 | 4E68 | 6868 | 6851 | 549A | 0068 | 8300 |
| 0000225060 | 30C4 | 5EC4 | 26D6 | 77FF | C40C | 065E | FF26 | 0A77 |
| 0000225100 | FF26 | 0877 | 5EC4 | 26D6 | 77FF | 260A | 77FF | 9A08 |
| 0000225120 | 662E | 6878 | C483 | C40A | D65E | 8B26 | 0C77 | 5EC4 |
| 0000225140 | 26D6 | 5FC4 | 2608 | 00C6 | 8E00 | B406 | 267A | 3E83 |
| 0000225160 | 69AF | 7500 | E903 | 0009 | 7E83 | FEDE | 0374 | 0FE9 |
| 0000225200 | 8E00 | B606 | 267A | 3E83 | 69DB | 7500 | E903 | 005A |
| 0000225220 | 468B | 8BD6 | D856 | 4689 | 89E0 | E256 | 76FF | FFE6 |
| 0000225240 | E476 | 468D | 16E0 | FF50 | F476 | 76FF | FFFC | FA76 |

THU MAR 14 17:52:34 1991 TSLINT.DLL PAGE 82, LINE 4780

| | | | | | | | | |
|---|---|---|---|---|---|---|---|---|
| 0000225260 | 4E8D | 16E8 | 8D51 | F64E | 5116 | 4E8D | 16DA | 1E51 |
| 0000225300 | 8A68 | 6822 | 00AF | 36FF | 20F0 | 36FF | 20EE | 36FF |
| 0000225320 | 20F4 | 36FF | 20F2 | 5C9A | 0069 | 8300 | 28C4 | 468B |
| 0000225340 | 8BE0 | E256 | 0CE9 | E900 | 0009 | 468B | 8BD6 | D856 |
| 0000225360 | 00E9 | 5E00 | 835F | 02ED | E58B | 5D1F | CB4D | 581E |
| 0000225400 | 4590 | 8B55 | 1EEC | D88E | EC81 | 0006 | 5657 | 4E6A |
| 0000225420 | A69A | 80B2 | 836B | 02C4 | 4689 | 89FA | FC56 | 8D1E |
| 0000225440 | 0676 | D08C | D88E | 7EC4 | A5FA | A5A5 | 1FA5 | 5EC4 |
| 0000225460 | 26FA | 4F80 | 0814 | 5EC4 | 26FA | 47C6 | 000E | 468B |
| 0000225500 | 8BFA | FC56 | 00E9 | 5E00 | 835F | 02ED | E58B | 5D1F |
| 0000225520 | CB4D | 581E | 4590 | 8B55 | 1EEC | D88E | EC81 | 0006 |
| 0000225540 | 5657 | 76FF | FF0C | 0A76 | 76FF | FF08 | 0676 | 5E9A |
| 0000225560 | 736D | 836D | 08C4 | 4689 | 89FA | FC56 | 5EC4 | 26FA |
| 0000225600 | 4F80 | 0214 | 468B | 8BFA | FC56 | 00E9 | 5E00 | 835F |
| 0000225620 | 02ED | E58B | 5D1F | CB4D | 581E | 4590 | 8B55 | 1EEC |
| 0000225640 | D88E | EC81 | 0034 | 5657 | 46C7 | 92FA | 8C22 | FC5E |
| 0000225660 | 46C7 | 07F2 | 2B01 | 89C0 | E446 | 4689 | 8EE2 | B406 |
| 0000225700 | 267A | 3E83 | 6A4A | 7500 | E903 | 001D | 36FF | 20F4 |
| 0000225720 | 36FF | 20F2 | 468D | 16D8 | 9A50 | 69C5 | 0000 | C483 |
| 0000225740 | 3D08 | 0000 | 0374 | 0FE9 | 8E00 | B606 | 267A | 3E83 |
| 0000225760 | 6A62 | 7500 | E903 | 003B | 681E | 2299 | 468D | 16E6 |
| 0000226000 | 8D50 | D846 | 5016 | 468D | 16F6 | 6850 | 00DF | 681E |
| 0000226020 | 2360 | 36FF | 20F0 | 36FF | 20EE | 36FF | 20F4 | 36FF |
| 0000226040 | 20F2 | 0E9A | 006A | 8300 | 1EC4 | 4689 | 89F6 | F856 |
| 0000226060 | 08E9 | 2B00 | 89C0 | F846 | 4689 | 83F6 | 0A7E | 74FF |
| 0000226100 | E903 | 02A6 | 468B | 8B06 | 0856 | 4689 | 89CC | CE56 |
| 0000226120 | 4689 | 89D0 | D256 | 5EC4 | 26D0 | 3F80 | 7500 | E903 |
| 0000226140 | 0260 | 5EC4 | 26D0 | 3F80 | 7522 | E903 | 0254 | 5EC4 |
| 0000226160 | FFD0 | D046 | 8A26 | 9807 | F08B | C68B | 2EE9 | 1E02 |
| 0000226200 | A068 | 6822 | 00EF | 681E | 22B0 | B69A | 0CB3 | 836F |
| 0000226220 | 0AC4 | 5EC4 | 26D0 | 3F80 | 7400 | E903 | 0013 | 681E |
| 0000226240 | 22CC | F368 | 1E00 | DC68 | 9A22 | B3B6 | 6BD4 | C483 |
| 0000226260 | 8E0A | BE06 | 267A | 3E83 | 3854 | 7400 | E903 | 0003 |
| 0000226300 | D9E9 | C401 | D05E | 46FF | 26D0 | 078A | 8B98 | 8BF0 |
| 0000226320 | E9C6 | 014C | C5E9 | 8301 | 30EE | 46C7 | 01F4 | C400 |
| 0000226340 | D05E | 8026 | 003F | 0375 | 3EE9 | C400 | D05E | 8026 |
| 0000226360 | 303F | 037D | 32E9 | C400 | D05E | 8026 | 373F | 037E |
| 0000226400 | 26E9 | C400 | D05E | 46FF | 26D0 | 078A | 8D98 | FA4C |
| 0000226420 | E1C1 | 0303 | 8BC8 | FFF1 | F446 | 7E83 | 03F4 | 037D |
| 0000226440 | 03E9 | E900 | 0003 | B6E9 | E9FF | 0170 | 068E | 7AC0 |
| 0000226460 | 8326 | 423E | 0037 | 0375 | 06E9 | E900 | 00D2 | 03E9 |
| 0000226500 | BE00 | 0007 | 55E9 | BE01 | 0008 | 4FE9 | BE01 | 000C |
| 0000226520 | 49E9 | BE01 | 000A | 43E9 | BE01 | 000D | 3DE9 | BE01 |
| 0000226540 | 0009 | 37E9 | 8E01 | C006 | 267A | 3E83 | 3742 | 7500 |
| 0000226560 | E903 | 0006 | 99E9 | E900 | 0003 | 0BBE | E900 | 011C |
| 0000226600 | 068E | 7AC0 | 8326 | 423E | 0037 | 0375 | 06E9 | E900 |
| 0000226620 | 007E | 78E9 | BE00 | 0000 | 5EC4 | 26D0 | 3F80 | 7500 |
| 0000226640 | E903 | 0069 | 5EC4 | 26D0 | 078A | 8B98 | F6D8 | 4F87 |
| 0000226660 | 8075 | 0375 | 56E9 | C400 | D05E | 8A26 | 9807 | D88B |
| 0000226700 | 87F6 | 754F | 7504 | E903 | 000F | 5EC4 | 26D0 | 078A |
| 0000226720 | 2D98 | 0030 | F003 | 2EE9 | C400 | D05E | 8A26 | 9807 |
| 0000226740 | D88B | 87F6 | 754F | 7501 | E903 | 000F | 5EC4 | 26D0 |
| 0000226760 | 078A | 2D98 | 0037 | F003 | 0CE9 | C400 | D05E | 8A26 |
| 0000227000 | 9807 | 572D | 0300 | FFF0 | D046 | 8BE9 | E9FF | 008C |
| 0000227020 | 5EC4 | FFCC | CC46 | C626 | 5C07 | 7FE9 | E900 | 007C |
| 0000227040 | 623D | 7500 | E903 | FF1F | 037E | 36E9 | 3D00 | 0037 |
| 0000227060 | 037E | 1BE9 | 3D00 | 0030 | 037C | 9AE9 | 2DFE | 0022 |
| 0000227100 | 0375 | 8FE9 | 2DFE | 0005 | 0375 | 87E9 | E9FE | FFC0 |
| 0000227120 | 5C2D | 7500 | E903 | FE7C | 052D | 7500 | E903 | FECC |

THU MAR 14 17:52:34 1991 TSLINT.DLL PAGE 83, LINE 4839

| | | | | | | | | |
|---|---|---|---|---|---|---|---|---|
| 0000227140 | ADE9 | 3DFF | 0072 | 0375 | EEE9 | 7EFE | E903 | 0013 |
| 0000227160 | 662D | 7500 | E903 | FED5 | 082D | 7500 | E903 | FED3 |
| 0000227200 | 8DE9 | 2DFF | 0074 | 0375 | D4E9 | 48FE | 7548 | E903 |
| 0000227220 | FED3 | 4848 | 0375 | E7E9 | E9FE | FF74 | C68B | 5EC4 |
| 0000227240 | FFCC | CC46 | 8826 | E907 | 0015 | 12E9 | 0B00 | 75C0 |
| 0000227260 | E903 | FDCB | 5C2D | 7500 | E903 | FDD6 | DDE9 | E9FF |
| 0000227300 | FD94 | 5EC4 | 26D0 | 3F80 | 7400 | E903 | 0013 | 681E |
| 0000227320 | 22F8 | 4B68 | 1E01 | 0868 | 9A23 | B3B6 | 715D | C483 |
| 0000227340 | 8B0A | CC46 | 462B | 8906 | 0A46 | 4E6A | A69A | 71B2 |
| 0000227360 | 8371 | 02C4 | 4689 | 89D4 | D656 | 529A | 98E3 | 5071 |
| 0000227400 | 068E | 7ABC | A026 | 2670 | 8B50 | 0A46 | 5040 | 879A |
| 0000227420 | D1AC | 836D | 06C4 | 5EC4 | 26D4 | 4789 | 2608 | 5789 |
| 0000227440 | C40A | D45E | 8B26 | 0A47 | 0B26 | 0847 | 0374 | 0CE9 |
| 0000227460 | 1E00 | 2468 | 9A23 | B3B6 | 71B8 | C483 | 8E04 | B406 |
| 0000227500 | 267A | 3E83 | 725A | 7500 | E903 | 006B | 7E83 | FEDC |
| 0000227520 | 0375 | 62E9 | 9A00 | F7E4 | 71CA | 5052 | 5EC4 | 26D4 |
| 0000227540 | 77FF | 260A | 77FF | 9A08 | F91E | 6EED | C483 | 5004 |
| 0000227560 | 5EC4 | 26D4 | 77FF | 260A | 77FF | 1E08 | 3368 | 8D23 |
| 0000227600 | E646 | 5016 | 468D | 16F6 | 8D50 | D846 | 5016 | 681E |
| 0000227620 | 2360 | 4F68 | FF01 | F036 | FF20 | EE36 | FF20 | F436 |
| 0000227640 | FF20 | F236 | 1E20 | 4168 | 6823 | 72A5 | A868 | 9A72 |
| 0000227660 | 72AB | 0000 | C483 | 8B30 | 0A46 | 5EC4 | 26D4 | 4789 |
| 0000227700 | C40C | D45E | C626 | 0E47 | FF01 | 0A76 | 76FF | FF08 |
| 0000227720 | 0676 | 5EC4 | 26D4 | 77FF | 260A | 77FF | 9A08 | 662E |
| 0000227740 | 6CB2 | C483 | C40A | D45E | C426 | 085F | 7E8B | 260A |
| 0000227760 | 01C6 | 8E00 | B406 | 267A | 3E83 | 72C1 | 7500 | E903 |
| 0000230000 | 0050 | 7E83 | FEDC | 0375 | 47E9 | C400 | D45E | FF26 |
| 0000230020 | 0A77 | FF26 | 0877 | 681E | 234A | 468D | 16E6 | 8D50 |
| 0000230040 | F646 | 5016 | 468D | 16D8 | 1E50 | 6068 | 6823 | 0155 |
| 0000230060 | 36FF | 20F0 | 36FF | 20EE | 36FF | 20F4 | 36FF | 20F2 |
| 0000230100 | 681E | 2355 | 8568 | 686C | 6C88 | 8B9A | 006C | 8300 |
| 0000230120 | 2AC4 | 5EC4 | 26D4 | 47C6 | 1114 | 068E | 7AB4 | 8326 |
| 0000230140 | 243E | 006E | 0375 | 09E9 | 8300 | DC7E | 74FE | E903 |
| 0000230160 | 000F | 068E | 7AB6 | 8326 | 503E | 006E | 0375 | 5AE9 |
| 0000230200 | 8B00 | D446 | 568B | 89D6 | DE46 | 5689 | FFE0 | E476 |
| 0000230220 | 76FF | 8DE2 | DE46 | 5016 | 76FF | FFF2 | FC76 | 76FF |
| 0000230240 | 8DFA | E64E | 5116 | 4E8D | 16F6 | 8D51 | D84E | 5116 |
| 0000230260 | 681E | 2360 | 5968 | FF01 | F036 | FF20 | EE36 | FF20 |
| 0000230300 | F436 | FF20 | F236 | 9A20 | 6AB1 | 0000 | C483 | 8B28 |
| 0000230320 | DE46 | 568B | E9E0 | 000C | 09E9 | 8B00 | D446 | 568B |
| 0000230340 | E9D6 | 0000 | 5F5E | ED83 | 8B02 | 1FE5 | 4D5D | 1ECB |
| 0000230360 | 9058 | 5545 | EC8B | 8E1E | 81D8 | 06EC | 5700 | FF56 |
| 0000230400 | 0A76 | 76FF | FF08 | 0676 | F89A | 4F6D | 8371 | 06C4 |
| 0000230420 | 4689 | 89FA | FC56 | 5EC4 | 26FA | 4F80 | 0214 | 468B |
| 0000230440 | 8BFA | FC56 | 00E9 | 5E00 | 835F | 02ED | E58B | 5D1F |
| 0000230460 | CB4D | 581E | 4590 | 8B55 | 1EEC | D88E | EC81 | 0000 |
| 0000230500 | 5657 | 3E83 | 2382 | 7500 | E903 | 0003 | 5CE9 | 6800 |
| 0000230520 | 0100 | 006A | 681E | 7F28 | 8C9A | 4066 | 8372 | 08C4 |
| 0000230540 | 61BE | E900 | 0001 | 8346 | 7AFE | 037E | 08E9 | C600 |
| 0000230560 | 2884 | 017F | EFE9 | BEFF | 0041 | 01E9 | 4600 | FE83 |
| 0000230600 | 7E5A | E903 | 0008 | 84C6 | 7F28 | E901 | FFEF | 30BE |
| 0000230620 | E900 | 0001 | 8346 | 39FE | 037E | 08E9 | C600 | 2884 |
| 0000230640 | 017F | EFE9 | C7FF | 8206 | 0123 | 5E00 | 835F | 02ED |
| 0000230660 | E58B | 5D1F | CB4D | 581E | 4590 | 8B55 | 1EEC | D88E |
| 0000230700 | EC81 | 0004 | 5657 | 84A1 | 8923 | FC46 | 468B | A306 |
| 0000230720 | 2384 | 468B | E9FC | 0000 | 5F5E | ED83 | 8B02 | 1FE5 |
| 0000230740 | 4D5D | 1ECB | 9058 | 5545 | EC8B | 8E1E | 81D8 | BEEC |
| 0000230760 | 5700 | C756 | FA46 | 2386 | 5E8C | C7FC | 8C46 | 0107 |
| 0000231000 | C02B | 8689 | FF74 | 8689 | FF72 | 068E | 7AC2 | 8326 |

THU MAR 14 17:52:34 1991 TSLINT.DLL PAGE 84, LINE 4898

| | | | | | | | | |
|---|---|---|---|---|---|---|---|---|
| 0000231020 | A43E | 0071 | 0375 | 1EE9 | FF00 | 8036 | FF23 | 7E36 |
| 0000231040 | 8D23 | 6886 | 16FF | 9A50 | 6E3A | 0000 | C483 | 3D08 |
| 0000231060 | 0000 | 0374 | DFE9 | 8E00 | C406 | 267A | 3E83 | 72D9 |
| 0000231100 | 7500 | E903 | 003D | 681E | 238D | 868D | FF7A | 5016 |
| 0000231120 | 868D | FF68 | 5016 | 468D | 16EE | 6850 | 0116 | 681E |
| 0000231140 | 24E4 | 36FF | 237C | 36FF | 237A | 36FF | 2380 | 36FF |
| 0000231160 | 237E | 839A | 006E | 8300 | 1EC4 | 4689 | 89EE | F056 |
| 0000231200 | 08E9 | 2B00 | 89C0 | F046 | 4689 | C4EE | 0C5E | 8B26 |
| 0000231220 | 2607 | 578B | 8902 | 5286 | 89FF | 5496 | 8BFF | 0646 |
| 0000231240 | 568B | 8908 | 4E86 | 89FF | 5096 | 8BFF | 0646 | 568B |
| 0000231260 | 0308 | 0A46 | 4689 | 89E2 | E456 | 5EC4 | 260C | 478B |
| 0000231300 | 260C | 578B | 890E | 6286 | 89FF | 6496 | 2BFF | 89C0 |
| 0000231320 | 9046 | 4689 | 2B8E | 89C0 | E846 | 4689 | 2BE6 | 89C0 |
| 0000231340 | F446 | 4689 | 8BF2 | 5286 | 8BFF | 5496 | 89FF | 5E86 |
| 0000231360 | 89FF | 6096 | 8DFF | 9246 | 4689 | 8CEA | EC56 | 468D |
| 0000231400 | 89E2 | 7686 | 8CFF | 7896 | C7FF | 6686 | 01FF | C400 |
| 0000231420 | 0C5E | C626 | 1047 | 9A00 | 7392 | 736B | 5EC4 | 260C |
| 0000231440 | 7F83 | 0004 | 0374 | E6E9 | C401 | 0C5E | C726 | 0447 |
| 0000231460 | 001C | 5EC4 | 260C | 478B | 2602 | 070B | 0375 | E9E9 |
| 0000231500 | C400 | 0C5E | FF26 | 0277 | FF26 | 9A37 | F91E | 75CC |
| 0000231520 | C483 | 8904 | 5686 | C4FF | 0C5E | 8B26 | 2607 | 578B |
| 0000231540 | 8902 | 5886 | 57FF | 5A96 | 9AFF | E352 | 713C | 8E50 |
| 0000231560 | C606 | 267A | 70A0 | 5026 | 1C6A | 5EC4 | 260C | 77FF |
| 0000231600 | 2602 | 37FF | 909A | 7AAF | 8375 | DAC4 | 5EC4 | 260C |
| 0000231620 | 0789 | 8926 | 0257 | 5EC4 | 260C | 478B | 2602 | 070B |
| 0000231640 | 0374 | 0CE9 | 1E00 | 9468 | 9A23 | B3B6 | 762D | C483 |
| 0000231660 | 8E04 | C206 | 267A | 3E83 | 7471 | 7500 | E903 | 0067 |
| 0000231700 | BE83 | FF6C | 75FE | E903 | 005D | E49A | AEF7 | 5275 |
| 0000231720 | 6A50 | C41C | 0C5E | FF26 | 0277 | FF26 | FF37 | 56B6 |
| 0000231740 | FFFF | 5AB6 | FFFF | 58B6 | 1EFF | A368 | 8D23 | 7A86 |
| 0000231760 | 16FF | 8D50 | EE46 | 5016 | 868D | FF68 | 5016 | 681E |
| 0000232000 | 24E4 | 5D68 | FF01 | 7C36 | FF23 | 7A36 | FF23 | 8036 |
| 0000232020 | FF23 | 7E36 | 1E23 | BC68 | 6823 | 720A | 0D68 | 9A72 |
| 0000232040 | 7210 | 0000 | C483 | E936 | 00B9 | 529A | C3E3 | 5076 |
| 0000232060 | 068E | 7AC6 | A026 | 2670 | 6A50 | 9A1C | AC87 | 75E7 |
| 0000232100 | C483 | C406 | 0C5E | 8926 | 2607 | 5789 | C402 | 0C5E |
| 0000232120 | 8B26 | 0247 | 0B26 | 7407 | E903 | 000C | 681E | 23C5 |
| 0000232140 | B69A | E4B3 | 8376 | 04C4 | 068E | 7AC2 | 8326 | 183E |
| 0000232160 | 0076 | 0375 | 6CE9 | 8300 | 6CBE | FEFF | 0375 | 62E9 |
| 0000232200 | 9A00 | F7E4 | 76F5 | 5052 | 5EC4 | 260C | 77FF | 2602 |
| 0000232220 | 37FF | 1E9A | 0CF9 | 8376 | 04C4 | C450 | 0C5E | FF26 |
| 0000232240 | 0277 | FF26 | 1E37 | D468 | 8D23 | 7A86 | 16FF | 8D50 |
| 0000232260 | EE46 | 5016 | 868D | FF68 | 5016 | 681E | 24E4 | 6068 |
| 0000232300 | FF01 | 7C36 | FF23 | 7A36 | FF23 | 8036 | FF23 | 7E36 |
| 0000232320 | 1E23 | E268 | 6823 | 767A | 7D68 | 9A76 | 7680 | 0000 |
| 0000232340 | C483 | C430 | 0C5E | 8B26 | 0247 | 0B26 | 7407 | E903 |
| 0000232360 | 0003 | F7E9 | C411 | 0C5E | 8B26 | 2607 | 578B | 8902 |
| 0000232400 | 5286 | 89FF | 5496 | 89FF | 5E86 | 89FF | 6096 | 8BFF |
| 0000232420 | 4E86 | 8BFF | 5096 | 39FF | E246 | 0374 | 08E9 | 3900 |
| 0000232440 | E456 | 0375 | 40E9 | 8B11 | 5286 | C4FF | 0C5E | 2B26 |
| 0000232460 | C407 | 0C5E | 8B26 | 044F | E983 | 3B0A | 7FC1 | E903 |
| 0000232500 | 021B | 868B | FF52 | 5EC4 | 260C | 072B | 8689 | FF48 |
| 0000232520 | 868B | FF5E | 5EC4 | 260C | 072B | 8689 | FF4C | 468B |
| 0000232540 | 0BE8 | E646 | 0375 | 0DE9 | 8B00 | E646 | 5EC4 | 260C |
| 0000232560 | 072B | 8689 | FF56 | 468B | 0BF4 | F246 | 0375 | 0DE9 |
| 0000232600 | 8B00 | F246 | 5EC4 | 260C | 072B | 8689 | FF58 | 468B |
| 0000232620 | 0B90 | 8E46 | 0375 | 0DE9 | 8B00 | 8E46 | 5EC4 | 260C |
| 0000232640 | 072B | 8689 | FF4A | 5EC4 | 260C | 7F81 | 0004 | 7440 |
| 0000232660 | E903 | 0003 | 2DE9 | C411 | 0C5E | D126 | 0467 | 8126 |

THU MAR 14 17:52:34 1991 TSLINT.DLL PAGE 85, LINE 4957

| | | | | | | | | |
|---|---|---|---|---|---|---|---|---|
| 0000232700 | 047F | 4000 | 037F | 09E9 | C400 | 0C5E | C726 | 0447 |
| 0000232720 | 4000 | 5EC4 | 260C | 77FF | 2602 | 37FF | 1E9A | 5DF9 |
| 0000232740 | 8378 | 04C4 | 8689 | FF42 | 5EC4 | 260C | 078B | 8B26 |
| 0000232760 | 0257 | 8689 | FF44 | 9689 | FF46 | 529A | A2E3 | 5078 |
| 0000233000 | 068E | 7AC6 | A026 | 2670 | C450 | 0C5E | FF26 | 0477 |
| 0000233020 | 5EC4 | 260C | 77FF | 2602 | 37FF | 909A | 9EAF | 8376 |
| 0000233040 | 0AC4 | 5EC4 | 260C | 0789 | 8926 | 0257 | 5EC4 | 260C |
| 0000233060 | 478B | 2602 | 070B | 0374 | 0CE9 | 1E00 | EB68 | 9A23 |
| 0000233100 | B3B6 | 78C3 | C483 | 8E04 | C206 | 267A | 3E83 | 76CF |
| 0000233120 | 7500 | E903 | 006C | BE83 | FF6C | 75FE | E903 | 0062 |
| 0000233140 | E49A | 8DF7 | 5276 | C450 | 0C5E | FF26 | 0477 | 5EC4 |
| 0000233160 | 260C | 77FF | 2602 | 37FF | B6FF | FF42 | B6FF | FF46 |
| 0000233200 | B6FF | FF44 | 681E | 23FA | 868D | FF7A | 5016 | 468D |
| 0000233220 | 16EE | 8D50 | 6886 | 16FF | 1E50 | E468 | 6824 | 0169 |
| 0000233240 | 36FF | 237C | 36FF | 237A | 36FF | 2380 | 36FF | 237E |
| 0000233260 | 681E | 2413 | 3668 | 6877 | 7739 | 3C9A | 0077 | 8300 |
| 0000233300 | 36C4 | 5EC4 | 260C | 478B | 2602 | 070B | 0375 | 03E9 |
| 0000233320 | E900 | 1018 | 5EC4 | 260C | 078B | 8B26 | 0257 | 8603 |
| 0000233340 | FF48 | 8689 | FF52 | 9689 | FF54 | 468B | 0BE8 | E646 |
| 0000233360 | 0375 | 14E9 | C400 | 0C5E | 8B26 | 2607 | 578B | 0302 |
| 0000233400 | 5686 | 89FF | E646 | 5689 | 8BE8 | F446 | 460B | 75F2 |
| 0000233420 | E903 | 0014 | 5EC4 | 260C | 078B | 8B26 | 0257 | 8603 |
| 0000233440 | FF58 | 4689 | 89F2 | F456 | 5EC4 | 260C | 078B | 8B26 |
| 0000233460 | 0257 | 8603 | FF4C | 8689 | FF5E | 9689 | FF60 | 468B |
| 0000233500 | 0B90 | 8E46 | 0375 | 14E9 | C400 | 0C5E | 8B26 | 2607 |
| 0000233520 | 578B | 0302 | 4A86 | 89FF | 8E46 | 5689 | 8B90 | 4E86 |
| 0000233540 | 8BFF | 5096 | 39FF | E246 | 0374 | 0BE9 | 3900 | E456 |
| 0000233560 | 0374 | 03E9 | E900 | 0F5C | 9EC4 | FF4E | 86FF | FF4E |
| 0000233600 | 8A26 | 2A07 | 8BE4 | 8BF0 | 6486 | 0BFF | 6286 | 75FF |
| 0000233620 | E903 | 000B | 9EC4 | FF62 | 8A26 | 2A00 | 8BE4 | 8BF0 |
| 0000233640 | E9C6 | 0E52 | 06F6 | 2384 | 7508 | E903 | 005F | 06F6 |
| 0000233660 | 2384 | 7420 | E903 | 001B | 868B | FF4E | 968B | FF50 |
| 0000233700 | 4639 | 74E2 | E903 | 0008 | 5639 | 75E4 | E903 | 0003 |
| 0000233720 | 10E9 | 8B0D | E846 | 460B | 75E6 | E903 | 0018 | B6FF |
| 0000233740 | FF54 | B6FF | FF52 | 046A | 76FF | FFE8 | E676 | 5F9A |
| 0000233760 | 7D89 | 8378 | 0AC4 | C02B | 4689 | 89E8 | E646 | 9EC4 |
| 0000234000 | FF52 | 86FF | FF52 | C626 | 0307 | 57E9 | 8B0E | 4E86 |
| 0000234020 | 8BFF | 5096 | 39FF | E246 | 0374 | 08E9 | 3900 | E456 |
| 0000234040 | 0375 | CDE9 | C400 | 4E9E | 26FF | 3F80 | 750A | E903 |
| 0000234060 | 00C0 | 06F6 | 2384 | 7420 | E903 | 00B6 | 06F6 | 2384 |
| 0000234100 | 7501 | E903 | 001D | 9EC4 | FF4E | 8026 | 293F | 0374 |
| 0000234120 | 06E9 | B800 | 0001 | 03E9 | B800 | 0000 | 8689 | FF42 |
| 0000234140 | 2AE9 | C400 | 4E9E | 26FF | 3F80 | 745C | E903 | 0017 |
| 0000234160 | 9EC4 | FF4E | 8026 | 017F | 7429 | E903 | 0009 | 86C7 |
| 0000234200 | FF42 | 0001 | 06E9 | C700 | 4286 | 00FF | 8300 | 42BE |
| 0000234220 | 00FF | 0374 | 5BE9 | F600 | 8406 | 0223 | 0375 | 1DE9 |
| 0000234240 | C400 | 4E9E | 26FF | 3F80 | 747C | E903 | 0006 | 01D8 |
| 0000234260 | E900 | 0003 | 00B8 | 8900 | 4486 | E9FF | 002A | 9EC4 |
| 0000234300 | FF4E | 8026 | 5C3F | 0374 | 17E9 | C400 | 4E9E | 26FF |
| 0000234320 | 7F80 | 7C01 | 0374 | 09E9 | C700 | 4486 | 01FF | E900 |
| 0000234340 | 0006 | 86C7 | FF44 | 0000 | BE83 | FF44 | 7500 | E903 |
| 0000234360 | 000F | 9EC4 | FF52 | 86FF | FF52 | C626 | 0307 | 63E9 |
| 0000234400 | E90D | 0BDF | 468B | 0BF4 | F246 | 0375 | 1BE9 | C400 |
| 0000234420 | 4E9E | 26FF | 7F80 | 0AFE | 0375 | 0DE9 | F600 | 8406 |
| 0000234440 | 2023 | 0374 | 03E9 | E900 | 0BB9 | 06F6 | 2384 | 7508 |
| 0000234460 | E903 | 0045 | 468B | 8B06 | 0856 | 3B40 | 4E86 | 74FF |
| 0000234500 | E903 | 0009 | 963B | FF50 | 0375 | 0DE9 | F600 | 8406 |
| 0000234520 | 2023 | 0374 | 03E9 | E900 | 0B89 | 9EC4 | FF52 | 86FF |
| 0000234540 | FF52 | C626 | 0207 | 868B | FF52 | 968B | FF54 | 8689 |

THU MAR 14 17:52:34 1991 TSLINT.DLL PAGE 86, LINE 5016

| | | | | | | | | |
|---|---|---|---|---|---|---|---|---|
| 0000234560 | FF5E | 9689 | FF60 | 0CE9 | C400 | 529E | FFFF | 5286 |
| 0000234600 | 26FF | 07C6 | E902 | 0CDC | 06F6 | 2384 | 7504 | E903 |
| 0000234620 | 0003 | 4EE9 | 8B0B | F446 | 460B | 74F2 | E903 | 000D |
| 0000234640 | 06F6 | 2384 | 7420 | E903 | 0003 | 36E9 | C60B | 8646 |
| 0000234660 | C600 | 5C86 | 00FF | FE83 | 752B | E903 | 0005 | 01B0 |
| 0000234700 | 02E9 | B000 | 0800 | 8646 | FE83 | 753F | E903 | 0005 |
| 0000234720 | 01B0 | 02E9 | B000 | 0800 | 5C86 | 8BFF | 4E86 | 8BFF |
| 0000234740 | 5096 | 39FF | E246 | 0374 | 0BE9 | 3900 | E456 | 0374 |
| 0000234760 | 03E9 | E900 | 00F6 | 868B | FF4E | 968B | FF50 | 4639 |
| 0000235000 | 74E2 | E903 | 000B | 5639 | 74E4 | E903 | 0003 | C3E9 |
| 0000235020 | C40C | 4E9E | FFFF | 4E86 | 26FF | 078A | E42A | F08B |
| 0000235040 | 868B | FF64 | 860B | FF62 | 0375 | 0BE9 | C400 | 629E |
| 0000235060 | 26FF | 008A | E42A | F08B | FE83 | 742A | E903 | 0003 |
| 0000235100 | A6E9 | F600 | 8406 | 0423 | 0374 | 13E9 | 8300 | 2BFE |
| 0000235120 | 0375 | 08E9 | 8300 | 3FFE | 0374 | 03E9 | E900 | 0089 |
| 0000235140 | 06F6 | 2384 | 7504 | E903 | 0078 | FE83 | 745C | E903 |
| 0000235160 | 0070 | 868B | FF4E | 968B | FF50 | 4639 | 74E2 | E903 |
| 0000235200 | 000B | 5639 | 74E4 | E903 | 0003 | 47E9 | C40C | 4E9E |
| 0000235220 | FFFF | 4E86 | 26FF | 078A | E42A | 8689 | FF42 | 868B |
| 0000235240 | FF64 | 860B | FF62 | 0375 | 11E9 | C400 | 629E | 03FF |
| 0000235260 | 429E | 26FF | 078A | E42A | 8689 | FF42 | BE83 | FF42 |
| 0000235300 | 752B | E903 | 0015 | BE83 | FF42 | 753F | E903 | 000B |
| 0000235320 | 8EFF | FF4E | 8EFF | FF4E | 11E9 | 8B00 | 42B6 | E9FF |
| 0000235340 | 0007 | 8EFF | FF4E | 03E9 | E900 | FECA | 468B | 0BF4 |
| 0000235360 | F246 | 0374 | 03E9 | E900 | 0B6A | BE80 | FF5C | 7500 |
| 0000235400 | E903 | 0022 | 468B | 8BF2 | F456 | 032D | 5200 | 6A50 |
| 0000235420 | FF07 | 54B6 | FFFF | 52B6 | 9AFF | 895F | 7DA6 | C483 |
| 0000235440 | 830A | 5286 | 03FF | B6FF | FF54 | B6FF | FF52 | 868B |
| 0000235460 | FF52 | 968B | FF54 | 0305 | 5200 | FF50 | F476 | 76FF |
| 0000235500 | 6AF2 | 9A05 | 89A4 | 7DDF | C483 | 2B0E | 89C0 | 9046 |
| 0000235520 | 4689 | 838E | 5286 | 03FF | 7E80 | 0086 | 0374 | 28E9 |
| 0000235540 | FF00 | 54B6 | FFFF | 52B6 | 8BFF | F246 | 568B | 05F4 |
| 0000235560 | 0006 | 5052 | 76FF | FFF4 | F276 | 086A | A49A | 5189 |
| 0000235600 | 837A | 0EC4 | 8683 | FF52 | E903 | 0AD8 | 868B | FF52 |
| 0000235620 | 968B | FF54 | 4689 | 89F2 | F456 | 9EC4 | FF52 | 86FF |
| 0000235640 | FF52 | C626 | 0907 | BBE9 | 8B0A | 5286 | C4FF | 0C5E |
| 0000235660 | 2B26 | C407 | 0C5E | 8B26 | 044F | E983 | 3B23 | 7FC1 |
| 0000235700 | E903 | 021E | 868B | FF52 | 5EC4 | 260C | 072B | 8689 |
| 0000235720 | FF4C | 868B | FF5E | 5EC4 | 260C | 072B | 8689 | FF48 |
| 0000235740 | 468B | 0BE8 | E646 | 0375 | 0DE9 | 8B00 | E646 | 5EC4 |
| 0000235760 | 260C | 072B | 8689 | FF42 | 468B | 0BF4 | F246 | 0375 |
| 0000236000 | 0DE9 | 8B00 | F246 | 5EC4 | 260C | 072B | 8689 | FF44 |
| 0000236020 | 468B | 0B90 | 8E46 | 0375 | 0DE9 | 8B00 | 8E46 | 5EC4 |
| 0000236040 | 260C | 072B | 8689 | FF4A | 5EC4 | 260C | 7F81 | 0004 |
| 0000236060 | 7440 | E903 | 0003 | ABE9 | C40A | 0C5E | D126 | 0467 |
| 0000236100 | 8126 | 047F | 4000 | 037F | 09E9 | C400 | 0C5E | C726 |
| 0000236120 | 0447 | 4000 | 5EC4 | 260C | 77FF | 2602 | 37FF | 1E9A |
| 0000236140 | DFF9 | 837E | 04C4 | 8689 | FF56 | 5EC4 | 260C | 078B |
| 0000236160 | 8B26 | 0257 | 0689 | FF58 | 9689 | FF5A | 529A | 24E3 |
| 0000236200 | 507F | 068E | 7AC6 | A026 | 2670 | C450 | 0C5E | FF26 |
| 0000236220 | 0477 | 5EC4 | 260C | 77FF | 2602 | 37FF | 909A | 7CAF |
| 0000236240 | 837D | 0AC4 | 5EC4 | 260C | 0789 | 8926 | 0257 | 5EC4 |
| 0000236260 | 260C | 478B | 2602 | 070B | 0374 | 0CE9 | 1E00 | 1C68 |
| 0000236300 | 9A24 | B3B6 | 7F45 | C483 | 8E04 | C206 | 267A | 3E83 |
| 0000236320 | 78AE | 7500 | E903 | 006C | BE83 | FF6C | 75FE | E903 |
| 0000236340 | 0062 | E49A | 3FF7 | 5278 | C450 | 0C5E | FF26 | 0477 |
| 0000236360 | 5EC4 | 260C | 77FF | 2602 | 37FF | B6FF | FF56 | B6FF |
| 0000236400 | FF5A | B6FF | FF58 | 681E | 242B | 868D | FF7A | 5016 |
| 0000236420 | 468D | 16EE | 8D50 | 6886 | 16FF | 1E50 | E468 | 6824 |

THU MAR 14 17:52:34 1991 TSLINT.DLL PAGE 87, LINE 5075

| | | | | | | | | |
|---|---|---|---|---|---|---|---|---|
| 0000236440 | 01EE | 36FF | 237C | 36FF | 237A | 36FF | 2380 | 36FF |
| 0000236460 | 237E | 681E | 2444 | 1568 | 6879 | 7918 | 1B9A | 0079 |
| 0000236500 | 8300 | 36C4 | 5EC4 | 260C | 478B | 2602 | 070B | 0375 |
| 0000236520 | 03E9 | E900 | 0996 | 5EC4 | 260C | 078B | 8B26 | 0257 |
| 0000236540 | 8603 | FF4C | 8689 | FF52 | 9689 | FF54 | 468B | 0BE8 |
| 0000236560 | E646 | 0375 | 14E9 | C400 | 0C5E | 8B26 | 2607 | 578B |
| 0000236600 | 0302 | 4286 | 89FF | E646 | 5689 | 8BE8 | F446 | 460B |
| 0000236620 | 75F2 | E903 | 0014 | 5EC4 | 260C | 078B | 8B26 | 0257 |
| 0000236640 | 8603 | FF44 | 4689 | 89F2 | F456 | 5EC4 | 260C | 078B |
| 0000236660 | 8B26 | 0257 | 8603 | FF48 | 8689 | FF5E | 9689 | FF60 |
| 0000236700 | 468B | 0B90 | 8E46 | 0375 | 14E9 | C400 | 0C5E | 8B26 |
| 0000236720 | 2607 | 578B | 0302 | 4A86 | 89FF | 8E46 | 5689 | E990 |
| 0000236740 | FDC7 | 868B | FF52 | 968B | FF54 | 4689 | 89F2 | F456 |
| 0000236760 | 9EC4 | FF4E | 8026 | 5E3F | 0374 | 13E9 | C400 | 529E |
| 0000237000 | FFFF | 5286 | 26FF | 07C6 | FF0B | 4E86 | E9FF | 000C |
| 0000237020 | 9EC4 | FF52 | 86FF | FF52 | C626 | 0A07 | 868B | FF4E |
| 0000237040 | 968B | FF50 | 4689 | 89F6 | F856 | 9EC4 | FF52 | 86FF |
| 0000237060 | FF52 | C626 | 2007 | 206A | 006A | B6FF | FF54 | B6FF |
| 0000237100 | FF52 | 8C9A | BB66 | 8373 | 08C4 | 868B | FF4E | 968B |
| 0000237120 | FF50 | 4639 | 74E2 | E903 | 000B | 5639 | 74E4 | E903 |
| 0000237140 | 0003 | 6FE9 | C408 | 4E9E | FFFF | 4E86 | 26FF | 078A |
| 0000237160 | E42A | F08B | 868B | FF64 | 860B | FF62 | 0375 | 0BE9 |
| 0000237200 | C400 | 629E | 26FF | 008A | E42A | F08B | 06F6 | 2384 |
| 0000237220 | 7540 | E903 | 0073 | FE83 | 745C | E903 | 006B | 9EC4 |
| 0000237240 | FF4E | 8026 | 5D3F | 0374 | 5EE9 | 8B00 | 4E86 | 8BFF |
| 0000237260 | 5096 | 39FF | E246 | 0374 | 0BE9 | 3900 | E456 | 0374 |
| 0000237300 | 03E9 | E900 | 080E | 9EC4 | FF4E | 86FF | FF4E | 8A26 |
| 0000237320 | 2A07 | 8BE4 | 8BF8 | 6486 | 0BFF | 6286 | 75FF | E903 |
| 0000237340 | 000B | 9EC4 | FF62 | 8A26 | 2A01 | 8BE4 | 8BF8 | 80CF |
| 0000237360 | 07E1 | 01B0 | E0D2 | DF8B | EBC1 | 0303 | 529E | 8EFF |
| 0000237400 | 5486 | 26FF | 0708 | 41E9 | 83FF | 5DFE | 0374 | 1CE9 |
| 0000237420 | 8B00 | F646 | 568B | 40F8 | 863B | FF4E | 0374 | 09E9 |
| 0000237440 | 3B00 | 5096 | 75FF | E903 | 0003 | E2E9 | C400 | 4E9E |
| 0000237460 | 26FF | 3F80 | 742D | E903 | 00B9 | 9EC4 | FF4E | 8026 |
| 0000237500 | 017F | 755D | E903 | 00AB | 868B | FF4E | 968B | FF50 |
| 0000237520 | 4639 | 74E2 | E903 | 000B | 5639 | 74E4 | E903 | 0003 |
| 0000237540 | 71E9 | C407 | 4E9E | FFFF | 4E86 | 26FF | 078A | E42A |
| 0000237560 | F88B | 868B | FF64 | 860B | FF62 | 0375 | 0BE9 | C400 |
| 0000237600 | 629E | 26FF | 018A | E42A | F88B | 868B | FF4E | 968B |
| 0000237620 | FF50 | 4639 | 74E2 | E903 | 000B | 5639 | 74E4 | E903 |
| 0000237640 | 0003 | 2FE9 | C407 | 4E9E | FFFF | 4E86 | 26FF | 078A |
| 0000237660 | E42A | F88B | 868B | FF64 | 860B | FF62 | 0375 | 0BE9 |
| 0000237700 | C400 | 629E | 26FF | 018A | E42A | F88B | FE3B | 0373 |
| 0000237720 | 1DE9 | 8B00 | 80CE | 07E1 | 01B0 | E0D2 | DE8B | EBC1 |
| 0000237740 | 0303 | 529E | 8EFF | 5486 | 26FF | 0708 | E946 | FFDC |
| 0000237760 | 19E9 | 8B00 | 80CE | 07E1 | 01B0 | E0D2 | DE8B | EBC1 |
| 0000240000 | 0303 | 529E | 8EFF | 5486 | 26FF | 0708 | 3BE9 | C4FE |
| 0000240020 | 529E | 26FF | 7F80 | 00FF | 037F | 28E9 | C400 | 529E |
| 0000240040 | 26FF | 478A | 98FF | D88B | 9E03 | FF52 | 868E | FF54 |
| 0000240060 | 8026 | FF7F | 7400 | E903 | 000B | 9EC4 | FF52 | FE26 |
| 0000240100 | FF4F | CAE9 | C4FF | 529E | 26FF | 478A | 98FF | 8601 |
| 0000240120 | FF52 | 0FE9 | F606 | 8406 | 0123 | 0374 | 06E9 | E900 |
| 0000240140 | 0481 | 03E9 | E900 | 0090 | 06F6 | 2384 | 7401 | E903 |
| 0000240160 | 0006 | 6EE9 | E904 | 0003 | 4CE9 | F601 | 8406 | 1023 |
| 0000240200 | 0374 | 06E9 | E900 | 045B | 03E9 | E900 | 0214 | 06F6 |
| 0000240220 | 2384 | 7402 | E903 | 0006 | 48E9 | E904 | 0003 | 01E9 |
| 0000240240 | 8B02 | 4E86 | 8BFF | 5096 | 39FF | E246 | 0374 | 0BE9 |
| 0000240260 | 3900 | E456 | 0374 | 03E9 | E900 | 0600 | 868B | FF4E |
| 0000240300 | 968B | FF50 | 4639 | 74E2 | E903 | 000B | 5639 | 74E4 |

THU MAR 14 17:52:34 1991 TSLINT.DLL PAGE 88, LINE 5134

| | | | | | | | | |
|---|---|---|---|---|---|---|---|---|
| 0000240320 | E903 | 0003 | FDE9 | C405 | 4E9E | FFFF | 4E86 | 26FF |
| 0000240340 | 078A | E42A | F08B | C68B | 66E9 | F603 | 8406 | 0123 |
| 0000240360 | 0375 | 03E9 | E900 | 033B | 468B | 8BEA | EC56 | 8639 |
| 0000240400 | FF76 | 0374 | 0CE9 | 3900 | 7896 | 74FF | E903 | 0003 |
| 0000240420 | C9E9 | 8305 | 66BE | 0AFF | 037C | 1BE9 | C400 | 529E |
| 0000240440 | FFFF | 5286 | 26FF | 07C6 | 8A0C | 6686 | C4FF | 529E |
| 0000240460 | FFFF | 5286 | 26FF | 0788 | 868B | FF52 | 5EC4 | 260C |
| 0000240500 | 072B | 5EC4 | 83EA | EA46 | 2602 | 0789 | 468B | 0BE8 |
| 0000240520 | E646 | 0375 | 0DE9 | 8B00 | E646 | 5EC4 | 260C | 072B |
| 0000240540 | E940 | 0003 | 00B8 | C400 | EA5E | 4683 | 02EA | 8926 |
| 0000240560 | 8B07 | 6686 | FFFF | 6686 | C4FF | EA5E | 4683 | 02EA |
| 0000240600 | 8926 | 8B07 | 5E86 | C4FF | 0C5E | 2B26 | C407 | EA5E |
| 0000240620 | 4683 | 02EA | 8926 | 2B07 | 89C0 | E846 | 4689 | 2BE6 |
| 0000240640 | 89C0 | F446 | 4689 | 8BF2 | 5286 | 8BFF | 5496 | 89FF |
| 0000240660 | 5E86 | 89FF | 6096 | E9FF | 0326 | 06F6 | 2384 | 7501 |
| 0000240700 | E903 | 0003 | 6CE9 | 8D02 | 9246 | D18C | 463B | 74EA |
| 0000240720 | E903 | 000B | 4E3B | 74EC | E903 | 0003 | EDE9 | 8304 |
| 0000240740 | EA6E | C402 | EA5E | 8B26 | C407 | 0C5E | 0326 | 2607 |
| 0000240760 | 578B | 8902 | 5E86 | 89FF | 6096 | 8BFF | E846 | 460B |
| 0000241000 | 75E6 | E903 | 0018 | B6FF | FF54 | B6FF | FF52 | 046A |
| 0000241020 | 76FF | FFE8 | E676 | 5F9A | FF89 | 837E | 0AC4 | 5EC4 |
| 0000241040 | 26EA | 7F83 | 0AFE | 037C | 1EE9 | C400 | 529E | FFFF |
| 0000241060 | 5286 | 26FF | 07C6 | C40D | EA5E | 8A26 | FE47 | 9EC4 |
| 0000241100 | FF52 | 86FF | FF52 | 8826 | 8307 | EA6E | 2B04 | 89C0 |
| 0000241120 | E846 | 4689 | C4E6 | EA5E | 8326 | 003F | 0375 | 17E9 |
| 0000241140 | C400 | 0C5E | 8B26 | 2607 | 578B | C402 | EA5E | 0326 |
| 0000241160 | 4807 | 4689 | 89E6 | E856 | 6E83 | 02EA | 5EC4 | 26EA |
| 0000241200 | 078B | 5EC4 | 260C | 0703 | 8B26 | 0257 | 4689 | 89F2 |
| 0000241220 | F456 | 4BE9 | F602 | 8406 | 0223 | 0375 | 03E9 | E900 |
| 0000241240 | 0191 | B6FF | FF54 | B6FF | FF52 | 868B | FF52 | 968B |
| 0000241260 | FF54 | 0605 | 5200 | FF50 | 60B6 | FFFF | 5EB6 | 6AFF |
| 0000241300 | 9A05 | 89A4 | 8554 | C483 | 2B0E | 89C0 | 9046 | 4689 |
| 0000241320 | 838E | 5286 | 03FF | 468B | 0BE8 | E646 | 0375 | 18E9 |
| 0000241340 | FF00 | 54B6 | FFFF | 52B6 | 6AFF | FF04 | E876 | 76FF |
| 0000241360 | 9AE6 | 895F | 8479 | C483 | 8B0A | 5286 | 8BFF | 5496 |
| 0000241400 | 89FF | E646 | 5689 | 83E8 | 5286 | 03FF | C02B | 4689 |
| 0000241420 | 89F4 | F246 | 868B | FF52 | 968B | FF54 | 8689 | FF5E |
| 0000241440 | 9689 | FF60 | B9E9 | 8B01 | 5286 | 8BFF | 5496 | 89FF |
| 0000241460 | F246 | 5689 | C4F4 | 529E | FFFF | 5286 | 26FF | 07C6 |
| 0000241500 | E914 | 019C | 868B | FF52 | 968B | FF54 | 4689 | 89F2 |
| 0000241520 | F456 | 9EC4 | FF52 | 86FF | FF52 | C626 | 1507 | 7FE9 |
| 0000241540 | C401 | 529E | FFFF | 5286 | 26FF | 07C6 | E916 | 0170 |
| 0000241560 | 9EC4 | FF52 | 86FF | FF52 | C626 | 1707 | 61E9 | C401 |
| 0000241600 | 529E | FFFF | 5286 | 26FF | 07C6 | E918 | 0152 | 9EC4 |
| 0000241620 | FF52 | 86FF | FF52 | C626 | 1907 | 43E9 | C401 | 529E |
| 0000241640 | FFFF | 5286 | 26FF | 07C6 | E912 | 0134 | 9EC4 | FF52 |
| 0000241660 | 86FF | FF52 | C626 | 1307 | 25E9 | 8D01 | D07C | BE39 |
| 0000241700 | FF66 | 0376 | 03E9 | E900 | 0119 | 468B | 8BEA | EC56 |
| 0000241720 | 042D | 8900 | 8846 | 5689 | E98A | 0004 | 6E83 | 0888 |
| 0000241740 | 468D | 3992 | 8846 | 0377 | 11E9 | C400 | 885E | 3926 |
| 0000241760 | 743F | E903 | 0003 | EAE9 | E900 | FFE0 | 868B | FF52 |
| 0000242000 | 968B | FF54 | 4689 | 89F2 | F456 | 9EC4 | FF52 | 86FF |
| 0000242020 | FF52 | C626 | 0E07 | C78B | 9EC4 | FF52 | 86FF | FF52 |
| 0000242040 | 8826 | E907 | 00BA | 06F6 | 2384 | 7504 | E903 | 0003 |
| 0000242060 | 62E9 | 8BF5 | 6486 | 0BFF | 6286 | 75FF | E903 | 000B |
| 0000242100 | 9EC4 | FF62 | 8A26 | 2A00 | 8BE4 | E9F0 | 0095 | 8FE9 |
| 0000242120 | 3D00 | 003E | 0375 | 17E9 | 76FF | E903 | 003F | 272D |
| 0000242140 | 3D00 | 0015 | 0376 | CAE9 | D1FF | 93E0 | FF2E | D1A7 |
| 0000242160 | 0C86 | 4B86 | 1A83 | 9384 | 8686 | 9386 | 9386 | 9386 |

THU MAR 14 17:52:34 1991 TSLINT.DLL PAGE 89, LINE 5193

| | | | | | | | | |
|---|---|---|---|---|---|---|---|---|
| 0000242200 | 9386 | 9386 | 1B86 | 1B86 | 1B86 | 1B86 | 1B86 | 1B86 |
| 0000242220 | 1B86 | 1B86 | 1B86 | 9386 | 9386 | C186 | 3D85 | 0060 |
| 0000242240 | 0375 | F8E9 | 76FE | E903 | 001B | 3F2D | 7500 | E903 |
| 0000242260 | FF74 | 032D | 7500 | E903 | FED4 | 152D | 7500 | E903 |
| 0000242300 | FE82 | 6EE9 | 2DFF | 0062 | 0375 | B2E9 | 2DFE | 0015 |
| 0000242320 | 0375 | 52E9 | 2DFE | 0005 | 0375 | B8E9 | E9FD | FF53 |
| 0000242340 | 81E9 | 8B01 | 9046 | 460B | 758E | E903 | 00BE | 5EC4 |
| 0000242360 | 268E | 078A | 0398 | 8E46 | 568B | 4090 | 863B | FF52 |
| 0000242400 | 0374 | A7E9 | 3B00 | 5496 | 74FF | E903 | 009E | 5EC4 |
| 0000242420 | 268E | 3F80 | 757F | E903 | 0092 | 9EC4 | FF4E | 8026 |
| 0000242440 | 2A3F | 0375 | 85E9 | C400 | 4E9E | 26FF | 3F80 | 755E |
| 0000242460 | E903 | 0078 | 06F6 | 2384 | 7504 | E903 | 003B | 9EC4 |
| 0000242500 | FF4E | 8026 | 5C3F | 0374 | 25E9 | C400 | 4E9E | 26FF |
| 0000242520 | 7F80 | 2B01 | 0375 | 0EE9 | C400 | 4E9E | 26FF | 7F80 |
| 0000242540 | 3F01 | 0374 | 09E9 | C700 | 4286 | 01FF | E900 | 0006 |
| 0000242560 | 86C7 | FF42 | 0000 | 29E9 | C400 | 4E9E | 26FF | 3F80 |
| 0000242600 | 752B | E903 | 000D | 9EC4 | FF4E | 8026 | 3F3F | 0374 |
| 0000242620 | 09E9 | C700 | 4286 | 01FF | E900 | 0006 | 86C7 | FF42 |
| 0000242640 | 0000 | BE83 | FF42 | 7500 | E903 | 0034 | 868B | FF52 |
| 0000242660 | 968B | FF54 | 4689 | 89F2 | F456 | 9EC4 | FF52 | 86FF |
| 0000242700 | FF52 | C626 | 0107 | 868B | FF52 | 968B | FF54 | 4689 |
| 0000242720 | 898E | 9056 | 9EC4 | FF52 | 86FF | FF52 | C626 | 0007 |
| 0000242740 | C68B | 9EC4 | FF52 | 86FF | FF52 | 8826 | C407 | 8E5E |
| 0000242760 | FE26 | E907 | 006E | 2B3D | 7500 | E903 | F38A | 0376 |
| 0000243000 | 27E9 | 2D00 | 000A | 0375 | 70E9 | 2DFA | 001A | 0375 |
| 0000243020 | 91E9 | 2DF1 | 0004 | 0375 | 3AE9 | 48FA | 0375 | 47E9 |
| 0000243040 | 48FA | 0375 | 6EE9 | E9F3 | FEB9 | 5B3D | 7500 | E903 |
| 0000243060 | F577 | 0376 | 13E9 | 2D00 | 002E | 0375 | 4DE9 | 2DF5 |
| 0000243100 | 0011 | 0375 | 41E9 | E9F3 | FE99 | 5C2D | 7500 | E903 |
| 0000243120 | FA4F | 4848 | 0375 | ABE9 | 2DF2 | 001E | 0375 | 2DE9 |
| 0000243140 | E9FA | FE7F | A8E9 | 8BEE | E846 | 460B | 75E6 | E903 |
| 0000243160 | 0018 | B6FF | FF54 | B6FF | FF52 | 046A | 76FF | FFE8 |
| 0000243200 | E676 | 5F9A | 2489 | 8385 | 0AC4 | 468D | 8C92 | 3BD1 |
| 0000243220 | EA46 | 0374 | 08E9 | 3B00 | EC4E | 0375 | 03E9 | E900 |
| 0000243240 | 0022 | 868B | FF52 | 5EC4 | 260C | 072B | 5EC4 | 260C |
| 0000243260 | 4789 | B806 | 0000 | 00BA | E900 | 0038 | 4DB8 | 8C24 |
| 0000243300 | E9DA | 0030 | 68B8 | 8C24 | E9DA | 0028 | 75B8 | 8C24 |
| 0000243320 | E9DA | 0020 | 82B8 | 8C24 | E9DA | 0018 | A6B8 | 8C24 |
| 0000243340 | E9DA | 0010 | B7B8 | 8C24 | E9DA | 0008 | D2B8 | 8C24 |
| 0000243360 | E9DA | 0000 | 5F5E | ED83 | 8B02 | 1FE5 | 4D5D | 1ECB |
| 0000243400 | 9058 | 5545 | EC8B | 8E1E | 81D8 | 00EC | 5700 | 8A56 |
| 0000243420 | 0A46 | 5EC4 | 2606 | 0788 | 468A | 2A0C | 0646 | 032C |
| 0000243440 | 5EC4 | 2606 | 4788 | 8B01 | 0C46 | 462B | 2D06 | 0003 |
| 0000243460 | C48A | 5EC4 | 2606 | 4788 | 5E02 | 835F | 02ED | E58B |
| 0000243500 | 5D1F | CB4D | 581E | 4590 | 8B55 | 1EEC | D88E | EC81 |
| 0000243520 | 000A | 5657 | 468B | 8B10 | 1256 | 0305 | 8900 | FA46 |
| 0000243540 | 5689 | 8BFC | 1046 | 568B | 8912 | F646 | 5689 | 8BF8 |
| 0000243560 | 0846 | 568B | 390A | F646 | 0374 | 08E9 | 3900 | F856 |
| 0000243600 | 0375 | 15E9 | FF00 | F64E | 5EC4 | 26F6 | 078A | 4EFF |
| 0000243620 | C4FA | FA5E | 8826 | E907 | FFD5 | 76FF | FF0E | 0C76 |
| 0000243640 | 468A | 5006 | 76FF | FF0A | 0876 | 5F9A | E589 | 8388 |
| 0000243660 | 0AC4 | 5F5E | ED83 | 8B02 | 1FE5 | 4D5D | 1ECB | 9058 |
| 0000243700 | 5545 | EC8B | 8E1E | 81D8 | 84EC | 5701 | C756 | FA46 |
| 0000243720 | 24F7 | 5E8C | C7FC | B086 | 00FE | 2B00 | 89C0 | A086 |
| 0000243740 | 89FE | 9E86 | 8EFE | C206 | 267A | 3E83 | 7F30 | 7500 |
| 0000243760 | E903 | 001E | 36FF | 2380 | 36FF | 237E | 868D | FE96 |
| 0000244000 | 5016 | 889A | 0074 | 8300 | 08C4 | 003D | 7400 | E903 |
| 0000244020 | 000F | 068E | 7AC4 | 8326 | 9E3E | 0074 | 0375 | 3DE9 |
| 0000244040 | 1E00 | FB68 | 8D24 | A486 | 16FE | 8D50 | 9686 | 16FE |

THU MAR 14 17:52:34 1991 TSLINT.DLL PAGE 90, LINE 5252

| | | | | | | | | |
|---|---|---|---|---|---|---|---|---|
| 0000244060 | 8D50 | F646 | 5316 | 2D68 | 1E03 | 0068 | FF25 | 7C36 |
| 0000244100 | FF23 | 7A36 | FF23 | 8036 | FF23 | 7E36 | 9A23 | 74D3 |
| 0000244120 | 0000 | C483 | 891E | F646 | 5689 | E9F8 | 0008 | C02B |
| 0000244140 | 4689 | 89F8 | F646 | 5EC4 | 2606 | 078B | 8B26 | 0257 |
| 0000244160 | 8689 | FE8E | 9689 | FE90 | 5EC4 | 2606 | 478B | 8906 |
| 0000244200 | A286 | C4FE | 065E | 8B26 | 0847 | 8B26 | 0A57 | 8689 |
| 0000244220 | FE8A | 9689 | FE8C | 868B | FE8E | 968B | FE90 | 8689 |
| 0000244240 | FE86 | 9689 | FE88 | 868B | FE8E | 968B | FE90 | 8603 |
| 0000244260 | FEA2 | 8689 | FE82 | 9689 | FE84 | 5EC4 | 2606 | 478B |
| 0000244300 | 260C | 578B | 890E | 9286 | 89FE | 9496 | 8DFE | B286 |
| 0000244320 | 89FE | F246 | 568C | 68F4 | 0100 | 006A | B6FF | FE8C |
| 0000244340 | B6FF | FE8A | 8C9A | A566 | 8380 | 08C4 | 5EC4 | 2606 |
| 0000244360 | 47C6 | 0110 | 5EC4 | 2606 | 47C6 | 0011 | 868B | FE88 |
| 0000244400 | 860B | FE86 | 0375 | 00E9 | 8B04 | 8686 | 8BFE | 8896 |
| 0000244420 | 39FE | 8286 | 74FE | E903 | 0014 | 9639 | FE84 | 0374 |
| 0000244440 | 0BE9 | C400 | 065E | C626 | 1147 | E901 | 03DB | 9EC4 |
| 0000244460 | FE86 | 86FF | FE86 | 8A26 | 2A07 | E9E4 | 0353 | 868B |
| 0000244500 | FE94 | 860B | FE92 | 0375 | 1EE9 | C400 | 869E | 26FE |
| 0000244520 | 5F8A | 2A01 | C4FF | 92BE | 26FE | 198A | FF2A | BEC4 |
| 0000244540 | FE8A | C626 | 0101 | 12E9 | C400 | 869E | 26FE | 5F8A |
| 0000244560 | 2A01 | C4FF | 8ABE | 26FE | 01C6 | E901 | 0356 | 7BE9 |
| 0000244600 | 8BFF | 9486 | 0BFE | 9286 | 75FE | E903 | 0015 | 9EC4 |
| 0000244620 | FE92 | 8A26 | 0A5F | FF2A | BEC4 | FE8A | C626 | 0101 |
| 0000244640 | 09E9 | C400 | 8A9E | 26FE | 47C6 | 010A | 5EC4 | 2606 |
| 0000244660 | 7F80 | 0111 | 0375 | 08E9 | C400 | 065E | C626 | 1147 |
| 0000244700 | E902 | 0310 | 5EC4 | 2606 | 47C6 | 0111 | 9EC4 | FE86 |
| 0000244720 | 86FF | FE86 | 8B26 | 8137 | FFE6 | C400 | 869E | 26FE |
| 0000244740 | 278A | C02A | F003 | 448D | 8C01 | 01D9 | 8686 | 83FE |
| 0000244760 | 00FE | 037F | 03E9 | E900 | FF02 | 9EC4 | FE86 | 8026 |
| 0000245000 | 053F | 0375 | 03E9 | E900 | FEF2 | 86FF | FE86 | 9EC4 |
| 0000245020 | FE86 | 86FF | FE86 | 8B26 | 8137 | FFE6 | C400 | 869E |
| 0000245040 | 26FE | 278A | C02A | F003 | 448D | 8C01 | 01D9 | 8686 |
| 0000245060 | 8DFE | B286 | 8CFE | 3BD1 | F246 | 0374 | 08E9 | 3B00 |
| 0000245100 | F44E | 0375 | 20E9 | 8B00 | 8686 | 8BFE | 8896 | C4FE |
| 0000245120 | F25E | 3926 | 7407 | E903 | 000D | 3926 | 0257 | 0374 |
| 0000245140 | 04E9 | 8300 | F26E | E904 | FE92 | 9EC4 | FE86 | 86FF |
| 0000245160 | FE86 | 8B26 | 8137 | FFE6 | C400 | 869E | 26FE | 278A |
| 0000245200 | C02A | F003 | 86FF | FE86 | 868B | FE86 | 968B | FE88 |
| 0000245220 | C603 | 4683 | 04F2 | 5EC4 | 26F2 | 0789 | 8926 | 0257 |
| 0000245240 | 59E9 | FFFE | 8686 | E9FE | FE52 | 5EC4 | 2606 | 47C6 |
| 0000245260 | 0111 | 9EC4 | FE8A | C626 | 0A47 | BE01 | 0000 | 01E9 |
| 0000245300 | 4600 | FE81 | 0100 | 037C | 13E9 | 8300 | 0AFE | 0375 |
| 0000245320 | 08E9 | C400 | 8A9E | 26FE | 00C6 | E901 | FFE3 | 5EC4 |
| 0000245340 | 2606 | 7F80 | 0011 | 0375 | 03E9 | E900 | 021B | E3E9 |
| 0000245360 | BE01 | 0000 | 01E9 | 4600 | FE81 | 0100 | 037C | 15E9 |
| 0000245400 | 8000 | 28BC | 017F | 0374 | 08E9 | C400 | 8A9E | 26FE |
| 0000245420 | 00C6 | E901 | FFE1 | BBE9 | BE01 | 0000 | 01E9 | 4600 |
| 0000245440 | FE81 | 0100 | 037C | 15E9 | 8000 | 28BC | 017F | 0375 |
| 0000245460 | 08E9 | C400 | 8A9E | 26FE | 00C6 | E901 | FFE1 | 93E9 |
| 0000245500 | C401 | 869E | FFFE | 8686 | 26FE | 378B | E681 | 00FF |
| 0000245520 | E6C1 | 4E03 | 01E9 | 4E00 | FE83 | 7D00 | E903 | 0061 |
| 0000245540 | C68B | 3399 | 2BC2 | C1C2 | 03F8 | C233 | C22B | D88B |
| 0000245560 | BEC4 | FE86 | 8A26 | 2A01 | 8BE4 | 8BC8 | BAC6 | 0008 |
| 0000245600 | DA8B | F799 | 8BFB | 8BC1 | BACA | 0001 | E2D3 | C285 |
| 0000245620 | 0375 | 29E9 | 8B00 | 9486 | 0BFE | 9286 | 75FE | E903 |
| 0000245640 | 0014 | 9EC4 | FE92 | 8A26 | 2A18 | C4FF | 8ABE | 26FE |
| 0000245660 | 01C6 | E901 | 0008 | 9EC4 | FE8A | C626 | 0100 | 96E9 |
| 0000245700 | E9FF | 0110 | 9EC4 | FE86 | 8B26 | 8137 | FFE6 | C100 |
| 0000245720 | 03E6 | 01E9 | 4600 | FE81 | 0100 | 037C | 2CE9 | 8B00 |

THU MAR 14 17:52:34 1991 TSLINT.DLL PAGE 91, LINE 5311

| | | | | | | | | |
|---|---|---|---|---|---|---|---|---|
| 0000245740 | 9486 | 0BFE | 9286 | 75FE | E903 | 0014 | 9EC4 | FE92 |
| 0000245760 | 8A26 | 2A18 | C4FF | 8ABE | 26FE | 01C6 | E901 | 0008 |
| 0000246000 | 9EC4 | FE8A | C626 | 0100 | CAE9 | C4FF | 869E | FFFE |
| 0000246020 | 8686 | 26FE | 378B | E681 | 00FF | E6C1 | 4E03 | 01E9 |
| 0000246040 | 4E00 | FE83 | 7D00 | E903 | 0061 | C68B | 3399 | 2BC2 |
| 0000246060 | C1C2 | 03F8 | C233 | C22B | D88B | BEC4 | FE86 | 8A26 |
| 0000246100 | 2A01 | 8BE4 | 8BC8 | BAC6 | 0008 | DA8B | F799 | 8BFB |
| 0000246120 | 8BC1 | BACA | 0001 | E2D3 | C285 | 0374 | 29E9 | 8B00 |
| 0000246140 | 9486 | 0BFE | 9286 | 75FE | E903 | 0014 | 9EC4 | FE92 |
| 0000246160 | 8A26 | 2A18 | C4FF | 8ABE | 26FE | 01C6 | E901 | 0008 |
| 0000246200 | 9EC4 | FE8A | C626 | 0100 | 96E9 | E9FF | 0046 | 43E9 |
| 0000246220 | 4800 | 183D | 7600 | E903 | 003A | E0D1 | 2E93 | A7FF |
| 0000246240 | 8F02 | 8B9E | 8BDE | 8BE1 | 8C24 | 8CCA | 8C24 | 8C24 |
| 0000246260 | 8C24 | 8D1B | 8DA1 | 8E24 | 8D03 | 8D03 | 8D0A | 8BDE |
| 0000246300 | 8BDE | 8BDE | 8BDE | 8BDE | 8D51 | 8D79 | 8BDE | 8BDE |
| 0000246320 | 8BDE | 8BDE | 868D | FEB2 | D18C | 463B | 74F2 | E903 |
| 0000246340 | 0008 | 4E3B | 75F4 | E903 | 0019 | 5EC4 | 83F2 | F26E |
| 0000246360 | 2604 | 078B | 8B26 | 0257 | 8689 | FE86 | 9689 | FE88 |
| 0000246400 | 03E9 | E900 | 0003 | F3E9 | 5EFB | 835F | 02ED | E58B |
| 0000246420 | 5D1F | CB4D | 581E | 4590 | 8B55 | 1EEC | D88E | EC81 |
| 0000246440 | 0024 | 5657 | 46C7 | 13FA | 8C25 | FC5E | 46C7 | 01F4 |
| 0000246460 | 2B01 | 89C0 | E646 | 4689 | 8EE4 | C206 | 267A | 3E83 |
| 0000246500 | 8A4C | 7500 | E903 | 001D | 36FF | 2380 | 36FF | 237E |
| 0000246520 | 468D | 16DC | 9A50 | 8A63 | 0000 | C483 | 3D08 | 0000 |
| 0000246540 | 0374 | 0FE9 | 8E00 | C406 | 267A | 3E83 | 8A79 | 7500 |
| 0000246560 | E903 | 003B | 681E | 2517 | 468D | 16E8 | 8D50 | DC46 |
| 0000246600 | 5016 | 468D | 16F6 | 6850 | 03EA | 681E | 251C | 36FF |
| 0000246620 | 237C | 36FF | 237A | 36FF | 2380 | 36FF | 237E | AE9A |
| 0000246640 | 008A | 8300 | 1EC4 | 4689 | 89F6 | F856 | 08E9 | 2B00 |
| 0000246660 | 89C0 | F846 | 4689 | FFF6 | 0E76 | 76FF | FF16 | 1476 |
| 0000246700 | 76FF | FF12 | 1076 | 76FF | FF0E | 0C76 | 76FF | 6A0A |
| 0000246720 | 6A00 | 6A00 | FF00 | 0876 | 76FF | 9A06 | 9051 | 8A0D |
| 0000246740 | C483 | E91A | 0000 | 5F5E | ED83 | 8B02 | 1FE5 | 4D5D |
| 0000246760 | 1ECB | 9058 | 5545 | EC8B | 8E1E | 81D8 | 3AEC | 5700 |
| 0000247000 | 8B56 | 1876 | 46C7 | 26FA | 8C25 | FC5E | 46C7 | 01F0 |
| 0000247020 | 2B01 | 89C0 | E246 | 4689 | 8EE0 | C206 | 267A | 3E83 |
| 0000247040 | 8FA0 | 7500 | E903 | 001D | 36FF | 2380 | 36FF | 237E |
| 0000247060 | 468D | 16D8 | 9A50 | 8FB6 | 0000 | C483 | 3D08 | 0000 |
| 0000247100 | 0374 | 0FE9 | 8E00 | C406 | 267A | 3E83 | 8FCC | 7500 |
| 0000247120 | E903 | 003B | 681E | 252A | 468D | 16E4 | 8D50 | D846 |
| 0000247140 | 5016 | 468D | 16F2 | 6850 | 0407 | 681E | 252E | 36FF |
| 0000247160 | 237C | 36FF | 237A | 36FF | 2380 | 36FF | 237E | FF9A |
| 0000247200 | 008F | 8300 | 1EC4 | 4689 | 89F2 | F456 | 08E9 | 2B00 |
| 0000247220 | 89C0 | F446 | 4689 | C4F2 | 065E | 8B26 | 0847 | 8B26 |
| 0000247240 | 0A57 | 4689 | 89D4 | D656 | 5EC4 | 2606 | 478B | 260C |
| 0000247260 | 578B | 890E | D046 | 5689 | 8BD2 | 1446 | 4603 | 890E |
| 0000247300 | F646 | 468B | 0BD6 | D446 | 0375 | 1BE9 | C400 | 065E |
| 0000247320 | 8026 | 107F | 7400 | E903 | 000E | 76FF | FF08 | 0676 |
| 0000247340 | 1D9A | 3E8A | 8390 | 04C4 | 5EC4 | 2606 | 7F83 | 0006 |
| 0000247360 | 037F | 2CE9 | C400 | 065E | C426 | 261F | 3F80 | 7412 |
| 0000247400 | E903 | 001D | FE83 | 7F00 | E903 | 0015 | 7E83 | 0016 |
| 0000247420 | 037F | 09E9 | B800 | FFFF | 06E9 | E902 | 0003 | 01BE |
| 0000247440 | 8B00 | D646 | 460B | 75D4 | E903 | 0150 | 468B | 39F6 |
| 0000247460 | 1646 | 037C | 45E9 | C401 | 065E | 8026 | 117F | 7501 |
| 0000247500 | E903 | 0138 | FE83 | 7F00 | E903 | 00C6 | 00BF | 8900 |
| 0000247520 | CE76 | 468B | 3916 | 0E46 | 037F | 15E9 | 8B00 | 1646 |
| 0000247540 | C603 | 463B | 7D0E | E903 | 0008 | 7E8B | 2B16 | 0E7E |
| 0000247560 | FE03 | 468B | 3916 | 0E46 | 037E | 0CE9 | 8B00 | 1046 |
| 0000247600 | 568B | 2B12 | 0E46 | 06E9 | 8B00 | 0A46 | 568B | 890C |

THU MAR 14 17:52:34 1991 TSLINT.DLL PAGE 92, LINE 5370

| | | | | | | | | |
|---|---|---|---|---|---|---|---|---|
| 0000247620 | C646 | 5689 | 8BC8 | C646 | 568B | 03C8 | 1646 | 4689 |
| 0000247640 | 89CA | CC56 | 468B | 0BD2 | D046 | 0375 | 33E9 | 3B00 |
| 0000247660 | 7CFE | E903 | 0029 | 5EC4 | FFCA | CA46 | 8A26 | 2A1F |
| 0000247700 | 03FF | D05E | 468E | 26D2 | 1F8A | FF2A | 5E03 | 8ED4 |
| 0000247720 | D646 | 8026 | 003F | 0374 | 04E9 | 4E00 | D0E9 | E9FF |
| 0000247740 | 0025 | FE3B | 037C | 1EE9 | C400 | CA5E | 46FF | 26CA |
| 0000247760 | 1F8A | FF2A | 5E03 | 8ED4 | D646 | 8026 | 003F | 0374 |
| 0000250000 | 04E9 | 4E00 | DBE9 | 8BFF | CE46 | C62B | 4601 | E916 |
| 0000250020 | 006A | 468B | 3916 | 0E46 | 037E | 12E9 | C400 | 105E |
| 0000250040 | 5E2B | 8B0E | 167E | 8A26 | 8801 | C646 | 0CE9 | C400 |
| 0000250060 | 0A5E | 7E8B | 2616 | 018A | 4688 | 8BC6 | D246 | 460B |
| 0000250100 | 75D0 | E903 | 001B | 5E8A | 2AC6 | C4FF | D07E | 8A26 |
| 0000250120 | 2A19 | C4FF | D47E | 8026 | 0139 | C01B | D8F7 | 10E9 |
| 0000250140 | 8A00 | C65E | FF2A | 7EC4 | 26D4 | 3980 | 1B01 | F7C0 |
| 0000250160 | 3DD8 | 0000 | 0375 | 03E9 | E900 | 007E | FE83 | 7D00 |
| 0000250200 | E903 | 0029 | 468B | 39F6 | 1646 | 0374 | 1EE9 | 8B00 |
| 0000250220 | D646 | 460B | 75D4 | E903 | 0013 | 5EC4 | 2606 | 7F80 |
| 0000250240 | 0011 | 0374 | 06E9 | B800 | FFFF | 74E9 | FF00 | 1E76 |
| 0000250260 | 76FF | FF1C | 1A76 | 76FF | FF16 | 1476 | 76FF | FF12 |
| 0000250300 | 1076 | 76FF | FF0E | 0C76 | 76FF | FF0A | 0876 | 76FF |
| 0000250320 | 9A06 | 9466 | 9143 | C483 | 8918 | F846 | 7E83 | 00F8 |
| 0000250340 | 037D | 15E9 | 8300 | F87E | 74FE | E903 | 0006 | FEB8 |
| 0000250360 | E9FF | 002D | 468B | E916 | 0027 | FE83 | 7400 | E903 |
| 0000250400 | 0003 | 16E9 | 8300 | 00FE | 037F | 07E9 | 4E00 | 46FF |
| 0000250420 | E916 | 0004 | FF46 | 164E | 06E9 | B8FE | FFFF | 00E9 |
| 0000250440 | 5E00 | 835F | 02ED | E58B | 5D1F | CB4D | 581E | 4590 |
| 0000250460 | 8B55 | 1EEC | D88E | EC81 | 0024 | 5657 | 46C7 | 3AFA |
| 0000250500 | 8C25 | FC5E | 46C7 | 01F4 | 2B01 | 89C0 | E646 | 4689 |
| 0000250520 | 8EE4 | C206 | 267A | 3E83 | 9080 | 7500 | E903 | 001D |
| 0000250540 | 36FF | 2380 | 36FF | 237E | 468D | 16DC | 9A50 | 9096 |
| 0000250560 | 0000 | C483 | 3D08 | 0000 | 0374 | 0FE9 | 8E00 | C406 |
| 0000250600 | 267A | 3E83 | 90AC | 7500 | E903 | 003B | 681E | 253E |
| 0000250620 | 468D | 16E8 | 8D50 | DC46 | 5016 | 468D | 16F6 | 6850 |
| 0000250640 | 046C | 681E | 2542 | 36FF | 237C | 36FF | 237A | 36FF |
| 0000250660 | 2380 | 36FF | 237E | DF9A | 0090 | 8300 | 1EC4 | 4689 |
| 0000250700 | 89F6 | F856 | 08E9 | 2B00 | 89C0 | F846 | 4689 | FFF6 |
| 0000250720 | 0E76 | 76FF | FF14 | 1276 | 76FF | FF10 | 0E76 | 76FF |
| 0000250740 | FF0C | 0A76 | 006A | 006A | 006A | 76FF | FF08 | 0676 |
| 0000250760 | 669A | 3494 | 8393 | 18C4 | 00E9 | 5E00 | 835F | 02ED |
| 0000251000 | E58B | 5D1F | CB4D | 581E | 4590 | 8B55 | 1EEC | D88E |
| 0000251020 | EC81 | 0346 | 5657 | 46C7 | 4BFA | 8C25 | FC5E | 46C7 |
| 0000251040 | 01AA | 2B01 | 89C0 | 8E46 | 4689 | 8E8C | C206 | 267A |
| 0000251060 | 3E83 | 93B8 | 7500 | E903 | 001E | 36FF | 2380 | 36FF |
| 0000251100 | 237E | 868D | FF5C | 5016 | CE9A | 0093 | 8300 | 08C4 |
| 0000251120 | 003D | 7400 | E903 | 000F | 068E | 7AC4 | 8326 | E43E |
| 0000251140 | 0093 | 0375 | 3CE9 | 1E00 | 4F68 | 8D25 | 9E46 | 5016 |
| 0000251160 | 868D | FF5C | 5016 | 468D | 16E4 | 6850 | 0492 | 681E |
| 0000251200 | 2556 | 36FF | 237C | 36FF | 237A | 36FF | 2380 | 36FF |
| 0000251220 | 237E | 179A | 0094 | 8300 | 1EC4 | 4689 | 89E4 | E656 |
| 0000251240 | 08E9 | 2B00 | 89C0 | E646 | 4689 | C4E4 | 065E | 8B26 |
| 0000251260 | 2607 | 578B | 8902 | D486 | 89FC | D696 | C4FC | 065E |
| 0000251300 | 8B26 | 0647 | 8603 | FCD4 | 968B | FCD6 | 8689 | FCD0 |
| 0000251320 | 9689 | FCD2 | 5EC4 | 2606 | 478B | 260C | 578B | 890E |
| 0000251340 | 5886 | 89FF | 5A96 | 8DFF | D886 | 89FC | B446 | 568C |
| 0000251360 | 8BB6 | B446 | 568B | 89B6 | B846 | 5689 | 05BA | 0280 |
| 0000251400 | 4689 | 8990 | 9256 | 7E83 | 0014 | 0374 | 1FE9 | 8B00 |
| 0000251420 | 0A46 | 568B | 890C | 1046 | 5689 | 8B12 | 0E46 | 4689 |
| 0000251440 | 2B14 | 89C0 | 0C46 | 4689 | C70A | 0E46 | 0000 | 468B |
| 0000251460 | 8B0A | 0C56 | 4603 | 890E | B046 | 5689 | 8BB2 | 1046 |

THU MAR 14 17:52:34 1991 TSLINT.DLL PAGE 93, LINE 5429

| | | | | | | | | |
|---|---|---|---|---|---|---|---|---|
| 0000251500 | 568B | 0312 | 1446 | 4689 | 89AC | AE56 | 468B | 390E |
| 0000251520 | 1C46 | 037E | 1EE9 | 8B00 | 0A46 | 568B | 030C | 1C46 |
| 0000251540 | 4689 | 89F6 | F856 | 468B | 8B10 | 1256 | 4689 | 89E8 |
| 0000251560 | EA56 | 1EE9 | 8B00 | B046 | 568B | 89B2 | F646 | 5689 |
| 0000251600 | 8BF8 | 1046 | 568B | 2B12 | 0E46 | 4603 | 891C | E846 |
| 0000251620 | 5689 | BEEA | 0000 | 01E9 | 4600 | FE83 | 7C0A | E903 |
| 0000251640 | 0012 | FE8B | E7C1 | C702 | BC43 | FFFF | 43C7 | FFBE |
| 0000251660 | E9FF | FFE5 | 468B | 390E | 1646 | 037E | 22E9 | 8B00 |
| 0000251700 | 0A46 | 568B | 030C | 1646 | 8689 | FCCC | 9689 | FCCE |
| 0000251720 | 468B | 8BF6 | F856 | 8689 | FCC8 | 9689 | FCCA | 22E9 |
| 0000251740 | 8B00 | 1046 | 568B | 2B12 | 0E46 | 4603 | 8916 | CC86 |
| 0000251760 | 89FC | CE96 | 8BFC | E846 | 568B | 89EA | C886 | 89FC |
| 0000252000 | CA96 | 8BFC | D486 | 8BFC | D696 | 39FC | D086 | 74FC |
| 0000252020 | E903 | 014A | 9639 | FCD2 | 0374 | 41E9 | 8B01 | 1A46 |
| 0000252040 | 460B | 7518 | E903 | 00FE | 468B | C416 | 185E | 8926 |
| 0000252060 | 8B07 | F646 | 568B | 39F8 | C886 | 74FC | E903 | 001A |
| 0000252100 | 9639 | FCCA | 0374 | 11E9 | 8B00 | CC86 | 2BFC | 0A46 |
| 0000252120 | 5EC4 | 2618 | 4789 | E914 | 0011 | 868B | FCCC | 462B |
| 0000252140 | 0310 | 0E46 | 5EC4 | 2618 | 4789 | BE14 | 0001 | 01E9 |
| 0000252160 | 4600 | FE83 | 7C0A | E903 | 00AC | FE8B | E7C1 | 8302 |
| 0000252200 | BC7B | 74FF | E903 | 0025 | 7B83 | FFBE | 0374 | 1CE9 |
| 0000252220 | 8B00 | D1FE | C4E7 | 185E | C726 | FF01 | 8BFF | D1DE |
| 0000252240 | C4E3 | 187E | C726 | 1441 | FFFF | C4E9 | 80FF | 947A |
| 0000252260 | 7500 | E903 | 0019 | FE8B | E7C1 | 8B02 | 6483 | 2BFF |
| 0000252300 | 0A46 | FE8B | E7D1 | 5EC4 | 2618 | 0189 | 19E9 | 8B00 |
| 0000252320 | C1FE | D2E7 | 838B | FF64 | 462B | 0310 | 0E46 | FE8B |
| 0000252340 | E7D1 | 5EC4 | 2618 | 0189 | 7A80 | 00EC | 0375 | 19E9 |
| 0000252360 | 8B00 | C1FE | 02E7 | 438B | 2BBC | 0A46 | DE8B | E3Di |
| 0000252400 | 7EC4 | 2618 | 4189 | E914 | 0019 | FE8B | E7C1 | 8B02 |
| 0000252420 | BC43 | 462B | 0310 | 0E46 | DE8B | E3D1 | 7EC4 | 2618 |
| 0000252440 | 4189 | E914 | FF4B | 468B | 8BF6 | F856 | 8639 | FCC8 |
| 0000252460 | 0374 | 19E9 | 3900 | CA96 | 74FC | E903 | 0010 | 868B |
| 0000252500 | FCCC | 462B | 2B0A | 1646 | 98E9 | E90E | 0010 | 868B |
| 0000252520 | FCCC | 462B | 2B10 | 1646 | 4603 | E90E | 0E85 | 9EC4 |
| 0000252540 | FCD4 | 86FF | FCD4 | 8A26 | 2A07 | E9E4 | 0DA1 | 9EC4 |
| 0000252560 | FCD4 | 8B26 | 813F | FFE7 | C100 | 02E7 | 868B | FCCC |
| 0000252600 | 968B | FCCE | 8389 | FF64 | 9389 | FF66 | 468B | 8BF6 |
| 0000252620 | F856 | 8639 | FCC8 | 0374 | 0EE9 | 3900 | CA96 | 74FC |
| 0000252640 | E903 | 0005 | 01B0 | 02E9 | B000 | C400 | D49E | FFFC |
| 0000252660 | D486 | 26FC | 3F8B | E781 | 00FF | 4388 | E994 | 0D92 |
| 0000252700 | 9EC4 | FCD4 | 8B26 | 813F | FFE7 | C100 | 02E7 | 868B |
| 0000252720 | FCCC | 968B | FCCE | 4389 | 89BC | BE53 | 468B | 8BF6 |
| 0000252740 | F856 | 8639 | FCC8 | 0374 | 0EE9 | 3900 | CA96 | 74FC |
| 0000252760 | E903 | 0005 | 01B0 | 02E9 | B000 | C400 | D49E | FFFC |
| 0000253000 | D486 | 26FC | 3F8B | E781 | 00FF | 4388 | E9EC | 0D42 |
| 0000253020 | 9EC4 | FCD4 | 86FF | FCD4 | 8A26 | 2A07 | 89E4 | C486 |
| 0000253040 | 8BFC | C4BE | C1FC | 02E7 | 838B | FF64 | 938B | FF66 |
| 0000253060 | 8689 | FCC0 | 9689 | FCC2 | BE8B | FCC4 | 438A | 8BEC |
| 0000253100 | C4BE | 38FC | 9443 | 0374 | 10E9 | 8B00 | C4BE | C1FC |
| 0000253120 | 02E7 | 438B | 8BBC | BE53 | 06E9 | 8B00 | F646 | 568B |
| 0000253140 | 89F8 | BC86 | 89FC | BE96 | 8BFC | C086 | 8BFC | C296 |
| 0000253160 | 39FC | BC86 | 74FC | E903 | 006C | 9639 | FCBE | 0374 |
| 0000253200 | 63E9 | 8B00 | BC86 | 8BFC | BE96 | 39FC | E846 | 0374 |
| 0000253220 | 0BE9 | 3900 | EA56 | 0374 | 03E9 | E900 | 0048 | 868B |
| 0000253240 | FCBC | 968B | FCBE | BE8B | FCC4 | E7C1 | 3902 | BC43 |
| 0000253260 | 0374 | 0BE9 | 3900 | BE53 | 0374 | 03E9 | E900 | 0026 |
| 0000253300 | 468B | 8B10 | 1256 | 8689 | FCC0 | 9689 | FCC2 | BE8B |
| 0000253320 | FCC4 | E7C1 | 8B02 | BC43 | 538B | 89BE | BC86 | 89FC |
| 0000253340 | BE96 | E9FC | FF83 | 868B | FCC0 | 968B | FCC2 | 8639 |

THU MAR 14 17:52:34 1991 TSLINT.DLL PAGE 94, LINE 5488

| | | | | | | | | |
|---|---|---|---|---|---|---|---|---|
| 0000253360 | FCBC | 0374 | 0CE9 | 3900 | BE96 | 74FC | E903 | 0003 |
| 0000253400 | D3E9 | 8B00 | CC86 | 8BFC | CE96 | 39FC | C886 | 74FC |
| 0000253420 | E903 | 0043 | 9639 | FCCA | 0374 | 3AE9 | 8B00 | E846 |
| 0000253440 | 568B | 39EA | C886 | 74FC | E903 | 000C | 9639 | FCCA |
| 0000253460 | 0374 | 03E9 | E900 | 0C1D | 468B | 8B10 | 1256 | 8689 |
| 0000253500 | FCCC | 9689 | FCCE | 468B | 8BE8 | EA56 | 8689 | FCC8 |
| 0000253520 | 9689 | FCCA | ACE9 | 8BFF | C8B6 | 2BFC | CCB6 | 8BFC |
| 0000253540 | BC86 | 2BFC | C086 | 3BFC | 7CC6 | E903 | 0008 | B68B |
| 0000253560 | FCBC | B62B | FCC0 | 868B | FF5A | 860B | FF58 | 0375 |
| 0000253600 | 24E9 | FF00 | 5AB6 | FFFF | 58B6 | 56FF | B6FF | FCC2 |
| 0000253620 | B6FF | FCC0 | B6FF | FCCE | B6FF | FCCC | 4E9A | 53A6 |
| 0000253640 | 8394 | 0EC4 | 19E9 | 5600 | B6FF | FCC2 | B6FF | FCC0 |
| 0000253660 | B6FF | FCCE | B6FF | FCCC | D29A | 4765 | 838B | 0AC4 |
| 0000253700 | 003D | 7500 | E903 | 0003 | 8AE9 | 010B | CCB6 | 01FC |
| 0000253720 | C0B6 | E9FC | FE93 | 79E9 | 8B0B | CC86 | 8BFC | CE96 |
| 0000253740 | 39FC | C886 | 74FC | E903 | 0043 | 9639 | FCCA | 0374 |
| 0000253760 | 3AE9 | 8B00 | E846 | 568B | 39EA | C886 | 74FC | E903 |
| 0000254000 | 000C | 9639 | FCCA | 0374 | 03E9 | E900 | 0B47 | 468B |
| 0000254020 | 8B10 | 1256 | 8689 | FCCC | 9689 | FCCE | 468B | 8BE8 |
| 0000254040 | EA56 | 8689 | FCC8 | 9689 | FCCA | ACE9 | 8BFF | 5A86 |
| 0000254060 | 0BFF | 5886 | 75FF | E903 | 0019 | 9EC4 | FCCC | 86FF |
| 0000254100 | FCCC | 8A26 | 2A1F | C4FF | 58BE | 26FF | 018A | E42A |
| 0000254120 | 0DE9 | C400 | CC9E | FFFC | CC86 | 26FC | 078A | E42A |
| 0000254140 | 0A3D | 7400 | E903 | 0003 | EAE9 | E90A | 0AE4 | 86C7 |
| 0000254160 | FCBA | 0000 | 9EC4 | FCD4 | 8026 | FF7F | 740B | E903 |
| 0000254200 | 0006 | 86C7 | FCBA | 0001 | 868B | FCCC | 968B | FCCE |
| 0000254220 | 8639 | FCC8 | 0374 | 43E9 | 3900 | CA96 | 74FC | E903 |
| 0000254240 | 003A | 468B | 8BE8 | EA56 | 8639 | FCC8 | 0374 | 0CE9 |
| 0000254260 | 3900 | CA96 | 74FC | E903 | 0003 | 98E9 | 8B0A | 1046 |
| 0000254300 | 568B | 8912 | CC86 | 89FC | CE96 | 8BFC | E846 | 568B |
| 0000254320 | 89EA | C886 | 89FC | CA96 | E9FC | FFAC | 868B | FF5A |
| 0000254340 | 860B | FF58 | 0375 | 1BE9 | C400 | CC9E | 26FC | 1F8A |
| 0000254360 | FF2A | 9E03 | FF58 | 868E | FF5A | 8A26 | 2A07 | 8BE4 |
| 0000254400 | E9F8 | 000B | 9EC4 | FCCC | 8A26 | 2AD7 | 8BE4 | C4F8 |
| 0000254420 | D49E | 26FC | 078A | E42A | E0C1 | 3B03 | 7FC7 | E903 |
| 0000254440 | 0041 | C78B | 08B9 | 9900 | F9F7 | C78B | DA8B | 3399 |
| 0000254460 | 2BC2 | C1C2 | 03F8 | C233 | C22B | D38B | 9EC4 | FCD4 |
| 0000254500 | D803 | 8A26 | 0147 | E42A | CA8B | D1BA | D300 | 85E2 |
| 0000254520 | 75C2 | E903 | 000D | BE83 | FCBA | 1B01 | F7C0 | 89D8 |
| 0000254540 | BA86 | C4FC | D49E | 26FC | 078A | E42A | 0140 | D486 |
| 0000254560 | 83FC | BABE | 00FC | 0374 | 03E9 | E900 | 09D7 | 86FF |
| 0000254600 | FCCC | CDE9 | 8B09 | 0A46 | 568B | 390C | CC86 | 74FC |
| 0000254620 | E903 | 0009 | 9639 | FCCE | 0375 | 0EE9 | C400 | CC9E |
| 0000254640 | 26FC | 7F80 | 0AFF | 0374 | 03E9 | E900 | 09A4 | A4E9 |
| 0000254660 | 8B09 | AC46 | 568B | 39AE | CC86 | 74FC | E903 | 0009 |
| 0000254700 | 9639 | FCCE | 0375 | 63E9 | 8B00 | B046 | 568B | 39B2 |
| 0000254720 | CC86 | 74FC | E903 | 0030 | 9639 | FCCE | 0374 | 27E9 |
| 0000254740 | 8300 | 147E | 7500 | E903 | 000C | 5EC4 | 2610 | 3F80 |
| 0000254760 | 740A | E903 | 0009 | 86C7 | FCBA | 0001 | 06E9 | C700 |
| 0000255000 | BA86 | 00FC | E900 | 001A | 9EC4 | FCCC | 8026 | 0A3F |
| 0000255020 | 0374 | 06E9 | B800 | 0001 | 03E9 | B800 | 0000 | 8689 |
| 0000255040 | FCBA | BE83 | FCBA | 7500 | E903 | 0003 | 23E9 | E909 |
| 0000255060 | 0923 | 468B | 8BB8 | BA56 | 4639 | 7490 | E903 | 00A1 |
| 0000255100 | 5639 | 7492 | E903 | 0099 | 468B | 2B90 | B446 | F8C1 |
| 0000255120 | 8B02 | 540E | D125 | 3BE1 | 7FC1 | E903 | 0006 | FEB8 |
| 0000255140 | E9FF | 097F | 468B | 2B90 | B446 | FC25 | D17F | C1F8 |
| 0000255160 | 02E0 | 9A50 | BB6C | 99FF | C483 | 8902 | BC86 | 89FC |
| 0000255200 | BE96 | 8BFC | 9046 | 462B | 25B4 | FFFC | FF50 | B676 |
| 0000255220 | 76FF | FFB4 | BEB6 | FFFC | BCB6 | 9AFC | 662E | 9A1B |

THU MAR 14 17:52:34 1991 TSLINT.DLL PAGE 95, LINE 5547

| | | | | | | | | |
|---|---|---|---|---|---|---|---|---|
| 0000255240 | C483 | 8B0A | B846 | 462B | 25B4 | FFFC | 8603 | FCBC |
| 0000255260 | 968B | FCBE | 4689 | 89B8 | BA56 | 468B | 2B90 | B446 |
| 0000255300 | FC25 | D1FF | 03E0 | BC86 | 8BFC | BE96 | 89FC | 9046 |
| 0000255320 | 5689 | 8B92 | BC86 | 8BFC | BE96 | 89FC | B446 | 5689 |
| 0000255340 | C4B6 | D49E | FFFC | D486 | 26FC | 378B | E681 | 00FF |
| 0000255360 | 9EC4 | FCD4 | 8A26 | 2A27 | 03C0 | FFF0 | D486 | 8BFC |
| 0000255400 | D486 | 8BFC | D696 | 03FC | C4C6 | B85E | 4683 | 04B8 |
| 0000255420 | 8926 | 2607 | 5789 | 8B02 | CC86 | 8BFC | CE96 | C4FC |
| 0000255440 | B85E | 4683 | 04B8 | 8926 | 2607 | 5789 | E902 | 0822 |
| 0000255460 | 9EC4 | FCD4 | 86FF | FCD4 | 8B26 | 8137 | FFE6 | C400 |
| 0000255500 | D49E | 26FC | 278A | C02A | F003 | 86FF | FCD4 | 868B |
| 0000255520 | FCD4 | 968B | FCD6 | 8689 | FCBC | 9689 | FCBE | 868B |
| 0000255540 | FCD0 | 968B | FCD2 | 8639 | FCBC | 0374 | 09E9 | 3900 |
| 0000255560 | BE96 | 75FC | E903 | 0021 | 9EC4 | FCBC | 8026 | 0D3F |
| 0000255600 | 0375 | 0DE9 | C400 | BC9E | 26FC | 3F80 | 740C | E903 |
| 0000255620 | 0007 | 86FF | FCBC | C5E9 | 8BFF | D086 | 8BFC | D296 |
| 0000255640 | 39FC | BC86 | 74FC | E903 | 0015 | 9639 | FCBE | 0374 |
| 0000255660 | 0CE9 | C400 | D49E | 26FC | 47C6 | 06FD | 15E9 | C401 |
| 0000255700 | BC9E | 26FC | 3F80 | 7501 | E903 | 000D | 9EC4 | FCBC |
| 0000255720 | 8026 | 033F | 0374 | FBE9 | C400 | BC9E | 26FC | 3F80 |
| 0000255740 | 7403 | E903 | 0006 | 0ABF | E900 | 000C | 9EC4 | FCBC |
| 0000255760 | 8A26 | 0247 | E42A | F88B | 868B | FCD4 | 968B | FCD6 |
| 0000256000 | C603 | 8689 | FCC0 | 9689 | FCC2 | 9EC4 | FCC0 | 8026 |
| 0000256020 | 037F | 7401 | E903 | 001D | 9EC4 | FCC0 | 8A26 | 0547 |
| 0000256040 | E42A | C73B | 0375 | 0CE9 | C400 | D49E | 26FC | 47C6 |
| 0000256060 | 06FD | 9FE9 | C400 | C09E | 26FC | 7F80 | 0A03 | 0375 |
| 0000256100 | 0EE9 | C400 | C09E | 26FC | 7F80 | 0B03 | 0374 | 83E9 |
| 0000256120 | C400 | C09E | 26FC | 7F80 | 0B03 | 0374 | 06E9 | B800 |
| 0000256140 | 0001 | 03E9 | B800 | 0000 | 8689 | FCBA | 9EC4 | FCC0 |
| 0000256160 | 8A26 | 0447 | E42A | E0C1 | 3B03 | 7FC7 | E903 | 0041 |
| 0000256200 | C78B | 08B9 | 9900 | F9F7 | C78B | DA8B | 3399 | 2BC2 |
| 0000256220 | C1C2 | 03F8 | C233 | C22B | D38B | 9EC4 | FCC0 | D803 |
| 0000256240 | 8A26 | 0547 | E42A | CA8B | 01BA | D300 | 85E2 | 75C2 |
| 0000256260 | E903 | 000D | BE83 | FCBA | 1B01 | F7C0 | 89D8 | BA86 |
| 0000256300 | 83FC | BABE | 00FC | 0374 | 09E9 | C400 | D49E | 26FC |
| 0000256320 | 47C6 | 06FD | AE83 | FCD4 | C402 | D49E | 26FC | 7F80 |
| 0000256340 | 06FF | 0375 | 0CE9 | C400 | D49E | 26FC | 47C6 | 04FF |
| 0000256360 | 04E9 | 8300 | B86E | C408 | D49E | FFFC | D486 | 26FC |
| 0000256400 | 378B | E681 | 00FF | 9EC4 | FCD4 | 8A26 | 2A27 | 03C0 |
| 0000256420 | 8DF0 | 0144 | D98C | 8601 | FCD4 | 35E9 | 8B06 | B846 |
| 0000256440 | 568B | 39BA | 9046 | 0374 | 85E9 | 3900 | 9256 | 0374 |
| 0000256460 | 7DE9 | 8B00 | 9046 | 462B | 25B4 | 7FFC | F8D1 | E0C1 |
| 0000256500 | 5002 | 6C9A | D6BB | 839C | 02C4 | 8689 | FCBC | 9689 |
| 0000256520 | FCBE | 468B | 2B90 | B446 | FC25 | 50FF | 76FF | FFB6 |
| 0000256540 | B476 | B6FF | FCBE | B6FF | FCBC | 2E9A | FE66 | 839C |
| 0000256560 | 0AC4 | 468B | 2BB8 | B446 | FC25 | 03FF | BC86 | 8BFC |
| 0000256600 | BE96 | 89FC | B846 | 5689 | 8BBA | 9046 | 462B | 25B4 |
| 0000256620 | FFFC | E0D1 | 8603 | FCBC | 968B | FCBE | 4689 | 8990 |
| 0000256640 | 9256 | 868B | FCBC | 968B | FCBE | 4689 | 89B4 | B656 |
| 0000256660 | 5EC4 | 83B8 | B846 | 2B04 | 26C0 | 4789 | 2602 | 0789 |
| * | | | | | | | | |
| 0000256720 | 24E9 | 8BFF | 0A46 | 568B | 390C | CC86 | 74FC | E903 |
| 0000256740 | 0009 | 9639 | FCCE | 0375 | 39E9 | 8B00 | AC46 | 568B |
| 0000256760 | 39AE | CC86 | 74FC | E903 | 0009 | 9639 | FCCE | 0375 |
| 0000257000 | 21E9 | 8B00 | B046 | 568B | 39B2 | CC86 | 74FC | E903 |
| 0000257020 | 0015 | 9639 | FCCE | 0374 | 0CE9 | 8300 | 147E | 7400 |
| 0000257040 | E903 | 0003 | 2BE9 | 8B05 | B046 | 568B | 39B2 | CC86 |
| 0000257060 | 74FC | E903 | 0013 | 9639 | FCCE | 0374 | 0AE9 | C400 |
| 0000257100 | 105E | 8A26 | 9807 | 09E9 | C400 | CC9E | 26FC | 078A |

THU MAR 14 17:52:34 1991 TSLINT.DLL PAGE 96, LINE 5606

| | | | | | | | | |
|---|---|---|---|---|---|---|---|---|
| 0000257120 | E42A | 8689 | FCBA | 9E8B | FCBA | BF80 | 7F28 | 7401 |
| 0000257140 | E903 | 0006 | 01B8 | E900 | 0003 | 00B8 | C400 | CC9E |
| 0000257160 | 26FC | 5F8A | 2AFF | 89FF | BC86 | 80FC | 28BF | 017F |
| 0000257200 | 0374 | 06E9 | B800 | 0001 | 03E9 | B800 | 0000 | 863B |
| 0000257220 | FCBC | 0375 | 03E9 | E900 | 04B8 | B8E9 | 8B04 | 0A46 |
| 0000257240 | 568B | 390C | CC86 | 74FC | E903 | 0009 | 9639 | FCCE |
| 0000257260 | 0375 | 39E9 | 8B00 | AC46 | 568B | 39AE | CC86 | 74FC |
| 0000257300 | E903 | 0009 | 9639 | FCCE | 0375 | 21E9 | 8B00 | B046 |
| 0000257320 | 568B | 39B2 | CC86 | 74FC | E903 | 0015 | 9639 | FCCE |
| 0000257340 | 0374 | 0CE9 | 8300 | 147E | 7400 | E903 | 0003 | 64E9 |
| 0000257360 | 8B04 | B046 | 568B | 39B2 | CC86 | 74FC | E903 | 0013 |
| 0000257400 | 9639 | FCCE | 0374 | 0AE9 | C400 | 105E | 8A26 | 9807 |
| 0000257420 | 09E9 | C400 | CC9E | 26FC | 078A | E42A | 8689 | FCBA |
| 0000257440 | 9E8B | FCBA | BF80 | 7F28 | 7401 | E903 | 0006 | 01B8 |
| 0000257460 | E900 | 0003 | 00B8 | C400 | CC9E | 26FC | 5F8A | 2AFF |
| 0000257500 | 89FF | BC86 | 80FC | 28BF | 017F | 0374 | 06E9 | B800 |
| 0000257520 | 0001 | 03E9 | B800 | 0000 | 863B | FCBC | 0375 | 03E9 |
| 0000257540 | E900 | 03F1 | EBE9 | 8B03 | AC46 | 568B | 39AE | CC86 |
| 0000257560 | 74FC | E903 | 0009 | 9639 | FCCE | 0375 | 53E9 | 8B00 |
| 0000257600 | B046 | 568B | 39B2 | CC86 | 74FC | E903 | 0012 | 9639 |
| 0000257620 | FCCE | 0374 | 09E9 | 8300 | 147E | 7500 | E903 | 0032 |
| 0000257640 | 468B | 8BB0 | B256 | 8639 | FCCC | 0374 | 0FE9 | 3900 |
| 0000257660 | CE96 | 74FC | E903 | 0006 | 5EC4 | E910 | 00D4 | 9EC4 |
| 0000257700 | FCCC | 8A26 | 9807 | D88B | BF80 | 7F28 | 7501 | E903 |
| 0000257720 | 0003 | 80E9 | 8B03 | 0A46 | 568B | 390C | CC86 | 74FC |
| 0000257740 | E903 | 0009 | 9639 | FCCE | 0375 | 14E9 | C400 | CC9E |
| 0000257760 | 26FC | 5F8A | 2AFF | 80FF | 28BF | 017F | 0375 | 03E9 |
| 0000260000 | E900 | 034E | 4EE9 | 8B03 | 0A46 | 568B | 390C | CC86 |
| 0000260020 | 74FC | E903 | 0009 | 9639 | FCCE | 0375 | 14E9 | C400 |
| 0000260040 | CC9E | 26FC | 5F8A | 2AFF | 80FF | 28BF | 017F | 0375 |
| 0000260060 | 03E9 | E900 | 031F | 468B | 8BAC | AE56 | 8639 | FCCC |
| 0000260100 | 0374 | 09E9 | 3900 | CE96 | 75FC | E903 | 0058 | 468B |
| 0000260120 | 8BB0 | B256 | 8639 | FCCC | 0374 | 12E9 | 3900 | CE96 |
| 0000260140 | 74FC | E903 | 0009 | 7E83 | 0014 | 0375 | 37E9 | 8B00 |
| 0000260160 | B046 | 568B | 39B2 | CC86 | 74FC | E903 | 0015 | 9639 |
| 0000260200 | FCCE | 0374 | 0CE9 | C400 | 105E | 8A26 | 9807 | D88B |
| 0000260220 | 09E9 | C400 | CC9E | 26FC | 1F8A | FF2A | BF80 | 7F28 |
| 0000260240 | 7501 | E903 | 0003 | A9E9 | E902 | 02A9 | 868B | FCCC |
| 0000260260 | 968B | FCCE | 8639 | FCC8 | 0374 | 43E9 | 3900 | CA96 |
| 0000260300 | 74FC | E903 | 003A | 468B | 8BE8 | EA56 | 8639 | FCC8 |
| 0000260320 | 0374 | 0CE9 | 3900 | CA96 | 74FC | E903 | 0003 | 74E9 |
| 0000260340 | 8B02 | 1046 | 568B | 8912 | CC86 | 89FC | CE96 | 8BFC |
| 0000260360 | E846 | 568B | 89EA | C886 | 89FC | CA96 | E9FC | FFAC |
| 0000260400 | 9EC4 | FCCC | 86FF | FCCC | 8A26 | 2A1F | 80FF | 28BF |
| 0000260420 | 007F | 0374 | 03E9 | E900 | 023B | 35E9 | 8B02 | CC86 |
| 0000260440 | 8BFC | CE96 | 39FC | C886 | 74FC | E903 | 0043 | 9639 |
| 0000260460 | FCCA | 0374 | 3AE9 | 8B00 | E846 | 568B | 39EA | C886 |
| 0000260500 | 74FC | E903 | 000C | 9639 | FCCA | 0374 | 03E9 | E900 |
| 0000260520 | 0203 | 468B | 8B10 | 1256 | 8689 | FCCC | 9689 | FCCE |
| 0000260540 | 468B | 8BE8 | EA56 | 8689 | FCC8 | 9689 | FCCA | ACE9 |
| 0000260560 | C4FF | CC9E | FFFC | CC86 | 26FC | 1F8A | FF2A | BF80 |
| 0000260600 | 7F28 | 7500 | E903 | 0003 | CAE9 | E901 | 01C4 | 468B |
| 0000260620 | 8B0A | 0C56 | 8639 | FCCC | 0374 | 0CE9 | 3900 | CE96 |
| 0000260640 | 74FC | E903 | 0003 | A9E9 | E901 | 01A9 | 468B | 8BAC |
| 0000260660 | AE56 | 8639 | FCCC | 0374 | 09E9 | 3900 | CE96 | 75FC |
| 0000260700 | E903 | 0021 | 468B | 8BB0 | B256 | 8639 | FCCC | 0374 |
| 0000260720 | 15E9 | 3900 | CE96 | 74FC | E903 | 000C | 7E83 | 0014 |
| 0000260740 | 0374 | 03E9 | E900 | 016A | 6AE9 | C401 | D49E | FFFC |
| 0000260760 | D486 | 26FC | 378B | E681 | 00FF | 868B | FF5A | 860B |

THU MAR 14 17:52:34 1991 TSLINT.DLL PAGE 97, LINE 5665

| | | | | | | | | |
|---|---|---|---|---|---|---|---|---|
| 0000261000 | FF58 | 0375 | 87E9 | 8B00 | CC86 | 8BFC | CE96 | 39FC |
| 0000261020 | C886 | 74FC | E903 | 0043 | 9639 | FCCA | 0374 | 3AE9 |
| 0000261040 | 8B00 | E846 | 568B | 39EA | C886 | 74FC | E903 | 000C |
| 0000261060 | 9639 | FCCA | 0374 | 03E9 | E900 | 0119 | 468B | 8B10 |
| 0000261100 | 1256 | 8689 | FCCC | 9689 | FCCE | 468B | 8BE8 | EA56 |
| 0000261120 | 8689 | FCC8 | 9689 | FCCA | ACE9 | C4FF | D49E | FFFC |
| 0000261140 | D486 | 26FC | 078A | 9EC4 | FCCC | 86FF | FCCC | 8A26 |
| 0000261160 | 2A1F | C4FF | 58BE | 26FF | 0138 | 0375 | 03E9 | E900 |
| 0000261200 | 00D3 | 834E | 00FE | 0374 | 7CE9 | E9FF | 007B | 868B |
| 0000261220 | FCCC | 968B | FCCE | 8639 | FCC8 | 0374 | 43E9 | 3900 |
| 0000261240 | CA96 | 74FC | E903 | 003A | 468B | 8BE8 | EA56 | 8639 |
| 0000261260 | FCC8 | 0374 | 0CE9 | 3900 | CA96 | 74FC | E903 | 0003 |
| 0000261300 | 92E9 | 8B00 | 1046 | 568B | 8912 | CC86 | 89FC | CE96 |
| 0000261320 | 8BFC | E846 | 568B | 89EA | C886 | 89FC | CA96 | E9FC |
| 0000261340 | FFAC | 9EC4 | FCD4 | 86FF | FCD4 | 8A26 | C407 | CC9E |
| 0000261360 | FFFC | CC86 | 26FC | 0738 | 0375 | 03E9 | E900 | 0055 |
| 0000261400 | 834E | 00FE | 0374 | 85E9 | E9FF | 0046 | 43E9 | 4800 |
| 0000261420 | 183D | 7600 | E903 | 003A | E0D1 | 2E93 | A7FF | A580 |
| 0000261440 | A44B | 9BE5 | 9C11 | 9F57 | 9C92 | 9F53 | 9D90 | 9F7D |
| 0000261460 | 9A39 | 9ACE | 9ACE | 97CE | 9820 | 9870 | A5B2 | A5B2 |
| 0000261500 | A5B2 | A3EE | A40C | A30C | A37D | A1C7 | A267 | A033 |
| 0000261520 | A0FD | AEE9 | 8BF0 | B446 | 568B | 39B6 | B846 | 0374 |
| 0000261540 | 08E9 | 3900 | BA56 | 0375 | 6CE9 | C400 | B85E | 8B26 |
| 0000261560 | FA47 | 0B26 | F847 | 0374 | 07E9 | 8300 | B86E | E908 |
| 0000261600 | FFD3 | 6E83 | 04B8 | 5EC4 | 26B8 | 078B | 8B26 | 0257 |
| 0000261620 | 8689 | FCCC | 9689 | FCCE | 6E83 | 04B8 | 5EC4 | 26B8 |
| 0000261640 | 078B | 8B26 | 0257 | 8689 | FCD4 | 9689 | FCD6 | 468B |
| 0000261660 | 390A | CC86 | 73FC | E903 | 001A | 468B | 39B0 | CC86 |
| 0000261700 | 76FC | E903 | 000E | 468B | 8BF6 | F856 | 8689 | FCC8 |
| 0000261720 | 9689 | FCCA | 03E9 | E900 | 0003 | 26E9 | B8F0 | FFFF |
| 0000261740 | 00E9 | 5E00 | 835F | 02ED | E58B | 5D1F | CB4D | 581E |
| 0000261760 | 4590 | 8B55 | 1EEC | D88E | EC81 | 0012 | 5657 | 768B |
| 0000262000 | 8B0E | 0646 | 568B | 8908 | FA46 | 5689 | 8BFC | 0A46 |
| 0000262020 | 568B | 890C | F646 | 5689 | 83F8 | 00FE | 0375 | 31E9 |
| 0000262040 | C400 | FA5E | 46FF | 26FA | 1F8A | FF2A | 7EC4 | 2610 |
| 0000262060 | 018A | 5EC4 | FFF6 | F646 | 8A26 | 2A1F | C4FF | 107E |
| 0000262100 | 3826 | 7501 | E903 | 0006 | 01B8 | E900 | 000A | E94E |
| 0000262120 | FFC7 | 00B8 | E900 | 0000 | 5F5E | ED83 | 8B02 | 1FE5 |
| 0000262140 | 4D5D | 1ECB | 9058 | 5545 | EC8B | 8E1E | 81D8 | 26EC |
| 0000262160 | 5700 | C756 | FA46 | 2561 | 5E8C | C7FC | F446 | 0107 |
| 0000262200 | C02B | 4689 | 89E6 | E446 | 068E | 7AC2 | 8326 | DA3E |
| 0000262220 | 00A7 | 0375 | 1DE9 | FF00 | 8036 | FF23 | 7E36 | 8D23 |
| 0000262240 | DA46 | 5016 | A99A | 0094 | 8300 | 08C4 | 003D | 7400 |
| 0000262260 | E903 | 000F | 068E | 7AC4 | 8326 | BF3E | 0094 | 0375 |
| 0000262300 | 3BE9 | 1E00 | 6868 | 8D25 | E846 | 5016 | 468D | 16DA |
| 0000262320 | 8D50 | F646 | 5016 | A368 | 1E06 | FC68 | FF25 | 7C36 |
| 0000262340 | FF23 | 7A36 | FF23 | 8036 | FF23 | 7E36 | 9A23 | 94F3 |
| 0000262360 | 0000 | C483 | 891E | F646 | 5689 | E9F8 | 0008 | C02B |
| 0000262400 | 4689 | 89F8 | F646 | 468B | 0B08 | 0646 | 0374 | 1DE9 |
| 0000262420 | A100 | 802A | 060B | 8028 | 0374 | 08E9 | B800 | 256F |
| 0000262440 | DA8C | C1E9 | B801 | 0000 | 00BA | E900 | 01B8 | 2AA1 |
| 0000262460 | 0B80 | 2806 | 7480 | E903 | 0188 | 529A | CEE3 | 50A7 |
| 0000262500 | 068E | 7AC6 | A026 | 2670 | 6850 | 00C8 | 879A | 76AC |
| 0000262520 | 83A8 | 06C4 | 28A3 | 8980 | 2A16 | A180 | 802A | 060B |
| 0000262540 | 8028 | 0374 | 0CE9 | 1E00 | 8E68 | 9A25 | B3B6 | A7EE |
| 0000262560 | C483 | 8E04 | C206 | 267A | 3E83 | A8A1 | 7500 | E903 |
| 0000262600 | 0065 | 7E83 | FEDE | 0375 | 5CE9 | 9A00 | F7E4 | A7FD |
| 0000262620 | 5052 | 36FF | 802A | 36FF | 8028 | 1E9A | 64F9 | 83A8 |
| 0000262640 | 04C4 | FF50 | 2A36 | FF80 | 2836 | 1E80 | 9D68 | 8D25 |

THU MAR 14 17:52:34 1991 TSLINT.DLL PAGE 98, LINE 5724

| | | | | | | | | |
|---|---|---|---|---|---|---|---|---|
| 0000262660 | E846 | 5016 | 468D | 16F6 | 8D50 | DA46 | 5016 | 681E |
| 0000262700 | 25FC | AD68 | FF06 | 7C36 | FF23 | 7A36 | FF23 | 8036 |
| 0000262720 | FF23 | 7E36 | 1E23 | AB68 | 6825 | A901 | 0468 | 9AA9 |
| 0000262740 | A907 | 0000 | C483 | A130 | 802A | 060B | 8028 | 0374 |
| 0000262760 | 08E9 | B800 | 25B4 | DA8C | EBE9 | C700 | 2C06 | C880 |
| 0000263000 | 9A00 | E352 | A895 | 8E50 | C606 | 267A | 70A0 | 5026 |
| 0000263020 | 0068 | 9A01 | [illegible] | A93E | C483 | A306 | 8030 | 1689 |
| 0000263040 | 8032 | 32A1 | 0B80 | 3006 | 7480 | E903 | 000C | 681E |
| 0000263060 | 25C5 | B69A | B5B3 | 83A8 | 04C4 | 068E | 7AC2 | 8326 |
| 0000263100 | 923E | 0094 | 0375 | 65E9 | 8300 | DE7E | 75FE | E903 |
| 0000263120 | 005C | E49A | C4F7 | 52A8 | FF50 | 3236 | FF80 | 3036 |
| 0000263140 | 9A80 | F91E | 7EC1 | C483 | 5004 | 36FF | 8032 | 36FF |
| 0000263160 | 8030 | 681E | 25D4 | 468D | 16E8 | 8D50 | F646 | 5016 |
| 0000263200 | 468D | 16DA | 1E50 | FC68 | 6825 | 06B1 | 36FF | 237C |
| 0000263220 | 36FF | 237A | 36FF | 2380 | 36FF | 237E | 681E | 25E2 |
| 0000263240 | 9768 | 687F | 7F9A | 9D9A | 007F | 8300 | 30C4 | 32A1 |
| 0000263260 | 0B80 | 3006 | 7480 | E903 | 0008 | EBB8 | 8C25 | E9DA |
| 0000263300 | 0024 | 681E | 8028 | 76FF | FF08 | 0676 | 149A | CD51 |
| 0000263320 | 839F | 04C4 | FF50 | 0876 | 76FF | 9A06 | 7443 | 9FA5 |
| 0000263340 | C483 | E90A | 0000 | 5F5E | ED83 | 8B02 | 1FE5 | 4D5D |
| 0000263360 | 1ECB | 9058 | 5545 | EC8B | 8E1E | 81D8 | 26EC | 5700 |
| 0000263400 | C756 | FA46 | 2604 | 5E8C | C7FC | F446 | 0101 | C02B |
| 0000263420 | 4689 | 89E6 | E446 | 068E | 7AC2 | 8326 | EF3E | 00A6 |
| 0000263440 | 0375 | 1DE9 | FFD0 | 8036 | FF23 | 7E36 | 8D23 | DC46 |
| 0000263460 | 5016 | 059A | 00A7 | 8300 | 08C4 | 003D | 7400 | E903 |
| 0000263500 | 000F | 068E | 7AC4 | 8326 | 1B3E | 00A7 | 0375 | 3BE9 |
| 0000263520 | 1E00 | 0868 | 8D26 | E846 | 5016 | 468D | 16DC | 8D50 |
| 0000263540 | F646 | 5016 | BD68 | 1E06 | 0C68 | FF26 | 7C36 | FF23 |
| 0000263560 | 7A36 | FF23 | 8036 | FF23 | 7E36 | 9A23 | A74E | 0000 |
| 0000263600 | C483 | 891E | F646 | 5689 | E9F8 | 0008 | C02B | 4689 |
| 0000263620 | 89F8 | F646 | 76FF | FF08 | 0676 | 149A | 2F51 | 83A9 |
| 0000263640 | 04C4 | 4689 | 6ADA | 6A00 | FF00 | DA76 | 006A | 76FF |
| 0000263660 | FFDA | 0876 | 76FF | 1E06 | 2868 | 9A80 | 8F74 | A7AF |
| 0000263700 | C483 | 3D12 | 0000 | 037D | 06E9 | B800 | 0001 | 03E9 |
| 0000263720 | B800 | 0000 | 00E9 | 5E00 | 835F | 02ED | E58B | 5D1F |
| 0000263740 | CB4D | 581E | 4590 | 8B55 | 1EEC | D88E | EC81 | 0024 |
| 0000263760 | 5657 | 46C7 | 24FA | 8C26 | FC5E | 46C7 | 00F4 | 2B00 |
| 0000264000 | 89C0 | E646 | 4689 | 8EE4 | C806 | 267A | 3E83 | A97D |
| 0000264020 | 7500 | E903 | 001D | 36FF | 266E | 36FF | 266C | 468D |
| 0000264040 | 16DC | 9A50 | A993 | 0000 | C483 | 3D08 | 0000 | 0374 |
| 0000264060 | 0FE9 | 8E00 | CA06 | 267A | 3E83 | AB61 | 7500 | E903 |
| 0000264100 | 003A | 681E | 2628 | 468D | 16E8 | 8D50 | DC46 | 5016 |
| 0000264120 | 468D | 16F6 | 6A50 | 1E37 | 7268 | FF26 | 6A36 | FF26 |
| 0000264140 | 6836 | FF26 | 6E36 | FF26 | 6C36 | 9A26 | A9DC | 0000 |
| 0000264160 | C483 | 891E | F646 | 5689 | E9F8 | 0008 | C02B | 4689 |
| 0000264200 | 89F8 | F646 | 468B | 0B08 | 0646 | 0374 | B5E9 | 8E00 |
| 0000264220 | C806 | 267A | 3E83 | AB49 | 7500 | E903 | 0044 | 7E83 |
| 0000264240 | FEE0 | 0375 | 3BE9 | 1E00 | 2C68 | 8D26 | E846 | 5016 |
| 0000264260 | 468D | 16F6 | 8D50 | DC46 | 5016 | 681E | 2672 | 3A6A |
| 0000264300 | 36FF | 266A | 36FF | 2668 | 36FF | 266E | 36FF | 266C |
| 0000264320 | 681E | 2643 | FF68 | 68AB | AC02 | 059A | 00AC | 8300 |
| 0000264340 | 26C4 | 068E | 7AC8 | 8326 | AB3E | 00AB | 0375 | 09E9 |
| 0000264360 | 8300 | E07E | 74FE | E903 | 000F | 068E | 7ACA | 8326 |
| 0000264400 | 393E | 00AC | 0375 | 38E9 | 8D00 | E846 | 5016 | 468D |
| 0000264420 | 16F6 | 8D50 | DC46 | 5016 | 681E | 2672 | 3B6A | 36FF |
| 0000264440 | 266A | 36FF | 2668 | 36FF | 266E | 36FF | 266C | 679A |
| 0000264460 | 00AC | 8300 | 1AC4 | 46C7 | 00E2 | E900 | 00DE | 03E9 |
| 0000264500 | E900 | 00D8 | 068E | 7AC8 | 8326 | 213E | 00AC | 0375 |
| 0000264520 | 59E9 | 8300 | E07E | 75FE | E903 | 0050 | 76FF | FF08 |

THU MAR 14 17:52:34 1991 TSLINT.DLL PAGE 99, LINE 5783

| | | | | | | | | |
|---|---|---|---|---|---|---|---|---|
| 0000264540 | 0676 | 1E9A | 15F9 | 83AC | 04C4 | FF50 | 0876 | 76FF |
| 0000264560 | 1E06 | 4B68 | 8D26 | E846 | 5016 | 468D | 16F6 | 8D50 |
| 0000264600 | DC46 | 5016 | 681E | 2672 | 3E6A | 36FF | 266A | 36FF |
| 0000264620 | 2668 | 36FF | 266E | 36FF | 266C | 681E | 2661 | 3A68 |
| 0000264640 | 68A8 | A83D | 409A | 00A8 | 8300 | 2CC4 | 76FF | FF08 |
| 0000264660 | 0676 | EE9A | 9DEF | 83A7 | 04C4 | 068E | 7AC8 | 8326 |
| 0000264700 | 6E3E | 00AA | 0375 | 09E9 | 8300 | E07E | 74FE | E903 |
| 0000264720 | 000F | 068E | 7ACA | 8326 | A93E | 00A9 | 0375 | 38E9 |
| 0000264740 | 8D00 | E846 | 5016 | 468D | 16F6 | 8D50 | DC46 | 5016 |
| 0000264760 | 681E | 2672 | 406A | 36FF | 266A | 36FF | 2668 | 36FF |
| 0000265000 | 266E | 36FF | 266C | F19A | 002D | 8300 | 1AC4 | 46C7 |
| 0000265020 | 00E2 | E900 | 0006 | 03E9 | E900 | 0000 | 5F5E | ED83 |
| 0000265040 | 8B02 | 1FE5 | 4D5D | 1ECB | 9058 | 5545 | EC8B | 8E1E |
| 0000265060 | 81D8 | 2AEC | 5700 | C756 | F646 | 267A | 5E8C | C7F8 |
| 0000265100 | F046 | 0107 | C02B | 4689 | 89E2 | E046 | 068E | 7AC8 |
| 0000265120 | 8326 | 303E | 00AD | 0375 | 1DE9 | FF00 | 6E36 | FF26 |
| 0000265140 | 6C36 | 8D26 | D646 | 5016 | 849A | 00AA | 8300 | 08C4 |
| 0000265160 | 003D | 7400 | E903 | 000F | 068E | 7ACA | 8326 | 193E |
| 0000265200 | 00AE | 0375 | 3AE9 | 1E00 | 8168 | 8D26 | E446 | 5016 |
| 0000265220 | 468D | 16D6 | 8D50 | F246 | 5016 | 4E6A | 681E | 2702 |
| 0000265240 | 36FF | 266A | 36FF | 2668 | 36FF | 266E | 36FF | 266C |
| 0000265260 | CC9A | 00AA | 8300 | 1EC4 | 4689 | 89F2 | F456 | 08E9 |
| 0000265300 | 2B00 | 89C0 | F446 | 4689 | 8EF2 | C806 | 267A | 3E83 |
| 0000265320 | ADAE | 7500 | E903 | 0050 | 7E83 | FEDA | 0375 | 47E9 |
| 0000265340 | FF00 | 0A76 | 468A | 2A08 | 50E4 | 76FF | 1E06 | 8868 |
| 0000265360 | 8D26 | E446 | 5016 | 468D | 16F2 | 8D50 | D646 | 5016 |
| 0000265400 | 681E | 2702 | 526A | 36FF | 266A | 36FF | 2668 | 36FF |
| 0000265420 | 266E | 36FF | 266C | 681E | 26AD | ED68 | 68AD | ADF0 |
| 0000265440 | F39A | 00AD | 8300 | 2CC4 | 76FF | 8A0A | 0846 | FF50 |
| 0000265460 | 0676 | B29A | C5E4 | 83AB | 06C4 | 4689 | 89FA | FC56 |
| 0000265500 | D00B | 0374 | D8E9 | 8E00 | C806 | 267A | 3E83 | AE01 |
| 0000265520 | 7500 | E903 | 0044 | 7E83 | FEDA | 0375 | 3BE9 | 1E00 |
| 0000265540 | B468 | 8D26 | E446 | 5016 | 468D | 16F2 | 8D50 | D646 |
| 0000265560 | 5016 | 681E | 2702 | 556A | 36FF | 266A | 36FF | 2668 |
| 0000265600 | 36FF | 266E | 36FF | 266C | 681E | 26DD | 3568 | 68AB |
| 0000265620 | AB38 | 3B9A | 00AB | 8300 | 26C4 | 068E | 7AC8 | 8326 |
| 0000265640 | F63E | 00AA | 0375 | 09E9 | 8300 | DA7E | 74FE | E903 |
| 0000265660 | 000F | 068E | 7ACA | 8326 | 9A3E | 00AA | 0375 | 55E9 |
| 0000265700 | 2B00 | 89C0 | DE46 | 4689 | FFDC | E276 | 76FF | 8DE0 |
| 0000265720 | DC46 | 5016 | 76FF | FFF0 | F876 | 76FF | 8DF6 | E44E |
| 0000265740 | 5116 | 4E8D | 16F2 | 8D51 | D64E | 5116 | 681E | 2702 |
| 0000265760 | 566A | 36FF | 266A | 36FF | 2668 | 36FF | 266E | 36FF |
| 0000266000 | 266C | 289A | 0073 | 8300 | 28C4 | 468B | 8BDC | DE56 |
| 0000266020 | 12E9 | E901 | 0009 | 00B8 | BA00 | 0000 | 06E9 | 8E01 |
| 0000266040 | CC06 | 267A | 3E83 | AEAB | 7500 | E903 | 006E | 76FF |
| 0000266060 | FFFC | FA76 | 1E9A | 95F9 | 83AD | 04C4 | 463B | 7506 |
| 0000266100 | E903 | 0058 | 068E | 7ACC | 8326 | FF3E | 00FF | 0375 |
| 0000266120 | 49E9 | 1E00 | E568 | 8E26 | CE06 | 267A | 36FF | 0002 |
| 0000266140 | FF26 | FF36 | 8DFF | E446 | 5016 | 468D | 16F2 | 8D50 |
| 0000266160 | D646 | 5016 | 681E | 2702 | 586A | 36FF | 266A | 36FF |
| 0000266200 | 2668 | 36FF | 266E | 36FF | 266C | 681E | 26F8 | 7B68 |
| 0000266220 | 68AD | AD7E | FF9A | 00FF | 8300 | 2AC4 | 068E | 7AC8 |
| 0000266240 | 8326 | B33E | 00AC | 0375 | 09E9 | 8300 | DA7E | 74FE |
| 0000266260 | E903 | 000F | 068E | 7ACA | 8326 | DF3E | 00AC | 0375 |
| 0000266300 | 59E9 | 8B00 | FA46 | 568B | 89FC | DC46 | 5689 | FFDE |
| 0000266320 | E276 | 76FF | 8DE0 | DC46 | 5016 | 76FF | FFF0 | F876 |
| 0000266340 | 76FF | 8DF6 | E44E | 5116 | 4E8D | 16F2 | 8D51 | D64E |
| 0000266360 | 5116 | 681E | 2702 | 5A6A | 36FF | 266A | 36FF | 2668 |
| 0000266400 | 36FF | 266E | 36FF | 266C | 639A | 00AE | 8300 | 28C4 |

THU MAR 14 17:52:34 1991 TSLINT.DLL PAGE 100, LINE 5842

| | | | | | | | | |
|---|---|---|---|---|---|---|---|---|
| 0000266420 | 468B | 8BDC | DE56 | 0CE9 | E900 | 0009 | 468B | 8BFA |
| 0000266440 | FC56 | 00E9 | 5E00 | 835F | 02ED | E58B | 5D1F | CB4D |
| 0000266460 | 581E | 4590 | 8B55 | 1EEC | D88E | EC81 | 002A | 5657 |
| 0000266500 | 46C7 | 0CF6 | 8C27 | F85E | 46C7 | 07F0 | 2B01 | 89C0 |
| 0000266520 | E246 | 4689 | 8EE0 | C806 | 267A | 3E83 | B039 | 7500 |
| 0000266540 | E903 | 001D | 36FF | 266E | 36FF | 266C | 468D | 16D6 |
| 0000266560 | 9A50 | ACC9 | 0000 | C483 | 3D08 | 0000 | 0374 | 0FE9 |
| 0000266600 | 8E00 | CA06 | 267A | 3E83 | B12E | 7500 | E903 | 003A |
| 0000266620 | 681E | 2713 | 468D | 16E4 | 8D50 | D646 | 5016 | 468D |
| 0000266640 | 16F2 | 6A50 | 1E67 | 9A68 | FF27 | 6A36 | FF26 | 6836 |
| 0000266660 | FF26 | 6E36 | FF26 | 6C36 | 9A26 | AD11 | 0000 | C483 |
| 0000266700 | 891E | F246 | 5689 | E9F4 | 0008 | C02B | 4689 | 89F4 |
| 0000266720 | F246 | 068E | 7AC8 | 8326 | C33E | 00B0 | 0375 | 56E9 |
| 0000266740 | 8300 | DA7E | 75FE | E903 | 004D | 76FF | 8A0E | 0C46 |
| 0000266760 | E42A | FF50 | 0A76 | 76FF | FF08 | 0676 | 681E | 271A |
| 0000267000 | 468D | 16E4 | 8D50 | F246 | 5016 | 468D | 16D6 | 1E50 |
| 0000267020 | 9A68 | 6A27 | FF6B | 6A36 | FF26 | 6836 | FF26 | 6E36 |
| 0000267040 | FF26 | 6C36 | 1E26 | 4668 | 6827 | B102 | 0568 | 9AB1 |
| 0000267060 | B108 | 0000 | C483 | FF30 | 0E76 | 468A | 500C | 76FF |
| 0000267100 | FF0A | 0876 | 76FF | 9A06 | E9F9 | B1AC | C483 | 890A |
| 0000267120 | FA46 | 5689 | 0BFC | 74D0 | E903 | 00D8 | 068E | 7AC8 |
| 0000267140 | 8326 | 163E | 00B1 | 0375 | 44E9 | 8300 | DA7E | 75FE |
| 0000267160 | E903 | 003B | 681E | 274D | 468D | 16E4 | 8D50 | F246 |
| 0000267200 | 5016 | 468D | 16D6 | 1E50 | 9A68 | 6A27 | FF6E | 6A36 |
| 0000267220 | FF26 | 6836 | FF26 | 6E36 | FF26 | 6C36 | 1E26 | 7768 |
| 0000267240 | 6827 | B204 | 0768 | 9AB2 | AD81 | 0000 | C483 | 8E26 |
| 0000267260 | C806 | 267A | 3E83 | B218 | 7500 | E903 | 0009 | 7E83 |
| 0000267300 | FEDA | 0374 | 0FE9 | 8E00 | CA06 | 267A | 3E83 | B230 |
| 0000267320 | 7500 | E903 | 0055 | C02B | 4689 | 89DE | DC46 | 76FF |
| 0000267340 | FFE2 | E076 | 468D | 16DC | FF50 | F076 | 76FF | FFF8 |
| 0000267360 | F676 | 4E8D | 16E4 | 8D51 | F24E | 5116 | 4E8D | 16D6 |
| 0000267400 | 1E51 | 9A68 | 6A27 | FF6F | 6A36 | FF26 | 6836 | FF26 |
| 0000267420 | 6E36 | FF26 | 6C36 | 9A26 | B27E | 0000 | C483 | 8B28 |
| 0000267440 | DC46 | 568P | E9DE | 0112 | 09E9 | B800 | 0000 | 00BA |
| 0000267460 | E900 | 0106 | 068E | 7ACC | 8326 | C03E | 00B1 | 0375 |
| 0000267500 | 6EE9 | FF00 | FC76 | 76FF | 9AFA | F91E | AE97 | C483 |
| 0000267520 | 3B04 | 0A46 | 0375 | 58E9 | 8E00 | CC06 | 267A | 3E83 |
| 0000267540 | AE86 | 7500 | E903 | 0049 | 681E | 277D | 068E | 7ACE |
| 0000267560 | FF26 | 0236 | 2600 | 36FF | AEC3 | 468D | 16E4 | 8D50 |
| 0000267600 | F246 | 5016 | 468D | 16D6 | 1E50 | 9A68 | 6A27 | FF71 |
| 0000267620 | 6A36 | FF26 | 6836 | FF26 | 6E36 | FF26 | 6C36 | 1E26 |
| 0000267640 | 9068 | 6827 | AEEF | F268 | 9AAE | AEF5 | 0000 | C483 |
| 0000267660 | 8E2A | C806 | 267A | 3E83 | AF03 | 7500 | E903 | 0009 |
| 0000267700 | 7E83 | FEDA | 0374 | 0FE9 | 8E00 | CA06 | 267A | 3E83 |
| 0000267720 | AF1B | 7500 | E903 | 0059 | 468B | 8BFA | FC56 | 4689 |
| 0000267740 | 89DC | DE56 | 76FF | FFE2 | E076 | 468D | 16DC | FF50 |
| 0000267760 | F076 | 76FF | FFF8 | F676 | 4E8D | 16E4 | 8D51 | F24E |
| 0000270000 | 5116 | 4E8D | 16D6 | 1E51 | 9A68 | 6A27 | FF73 | 6A36 |
| 0000270020 | FF26 | 6836 | FF26 | 6E36 | FF26 | 6C36 | 9A26 | AF69 |
| 0000270040 | 0000 | C483 | 8B28 | DC46 | 568B | E9DE | 000C | 09E9 |
| 0000270060 | 8B00 | FA46 | 568B | E9FC | 0000 | 5F5E | ED83 | 8B02 |
| 0000270100 | 1FE5 | 4D5D | 00CB | 581E | 4590 | 8B55 | 1EEC | D88E |
| 0000270120 | EC81 | 002A | 5657 | 46C7 | B3FA | 8C27 | FC5E | 46C7 |
| 0000270140 | D7F4 | 2B01 | 89C0 | E646 | 4689 | 8EE4 | D006 | 267A |
| 0000270160 | 3E83 | AFBC | 7500 | E903 | 001D | 36FF | 280A | 36FF |
| 0000270200 | 2808 | 468D | 16DA | 9A50 | AFD2 | 0000 | C483 | 3D08 |
| 0000270220 | 0000 | 0374 | 0FE9 | 8E00 | D206 | 267A | 3E83 | AFE8 |
| 0000270240 | 7500 | E903 | 003A | 681E | 27BA | 468D | 16E8 | 8D50 |
| 0000270260 | DA46 | 5016 | 468D | 16F6 | 6A50 | 1E37 | 0C68 | FF28 |

THU MAR 14 17:52:34 1991 TSLINT.DLL PAGE 101, LINE 5901

```
0000270300   0636  FF28  0436  FF28  0A36  FF28  0836  9A28
0000270320   B01A  0000  C483  891E  F646  5689  E9F8  0008
0000270340   C02B  4689  89F8  F646  068E  7AD0  8326  D23E
0000270360   00B2  0375  44E9  8300  DE7E  75FE  E903  003B
0000270400   681E  27C1  468D  16E8  8D50  F646  5016  468D
0000270420   16DA  1E50  0C68  6A28  FF3B  0636  FF28  0436
0000270440   FF28  0A36  FF28  0836  1E28  D868  6827  B08A
0000270460   8D68  9AB0  B090  0000  C483  9A26  E352  B0AA
0000270500   8E50  D406  267A  70A0  5026  166A  879A  1EAC
0000270520   83AA  06C4  4689  89D6  D856  D00B  0374  0CE9
0000270540   1E00  DE68  9A27  B3B6  B3E8  C483  8E04  D006
0000270560   267A  3E83  B455  7500  E903  0060  7E83  FEDE
0000270600   0375  57E9  9A00  F7E4  B3F5  5052  76FF  FFD8
0000270620   D676  1E9A  9EF9  83B3  04C4  FF50  D876  76FF
0000270640   1ED6  ED68  8D27  E846  5016  468D  16F6  8D50
0000270660   DA46  5016  681E  280C  3C6A  36FF  2806  36FF
0000270700   2804  36FF  280A  36FF  2808  681E  27FB  8E68
0000270720   68B3  B391  949A  00B3  8300  30C4  468B  C406
0000270740   D65E  8926  1247  5EC4  26D6  47C6  0114  068E
0000270760   7AD0  8326  4F3E  00B3  0375  09E9  8300  DE7E
0000271000   74FE  E903  000F  068E  7AD2  8326  FE3E  00B2
0000271020   0375  59E9  8B00  D646  568B  89D8  E046  5689
0000271040   FFE2  E676  76FF  8DE4  E046  5016  76FF  FFF4
0000271060   FC76  76FF  8DFA  E84E  5116  4E8D  16F6  8D51
0000271100   DA4E  5116  681E  280C  3F6A  36FF  2806  36FF
0000271120   2804  36FF  280A  36FF  2808  789A  00B1  8300
0000271140   28C4  468B  8BE0  E256  0CE9  E900  0009  468B
0000271160   8BD6  D856  00E9  5E00  835F  02ED  E58B  5D1F
0000271200   CB4D  581E  4590  8B55  1EEC  D88E  EC81  0026
0000271220   5657  46C7  14FA  8C28  FC5E  46C7  00F4  2B00
0000271240   89C0  E646  4689  8EE4  D006  267A  3E83  B3D4
0000271260   7500  E903  001D  36FF  280A  36FF  2808  468D
0000271300   16DC  9A50  B2E8  0000  C483  3D08  0000  0374
0000271320   0FE9  8E00  D206  267A  3E83  B46D  7500  E903
0000271340   003A  681E  2818  468D  16E8  8D50  DC46  5016
0000271360   468D  16F6  6A50  1E48  3468  FF28  0636  FF28
0000271400   0436  FF28  0A36  FF28  0836  9A28  B330  0000
0000271420   C483  891E  F646  5689  E9F8  0008  C02B  4689
0000271440   89F8  F646  76FF  FF08  0676  1E9A  BEF9  83B5
0000271460   04C4  4689  FFDA  0876  76FF  9A06  AA42  B3AF
0000271500   C483  8E04  D006  267A  3E83  B50E  7500  E903
0000271520   0054  7E83  FEE0  0375  4BE9  9A00  F7E4  B3C8
0000271540   5052  76FF  FFDA  0876  76FF  1E06  1C68  8D28
0000271560   E846  5016  468D  16F6  8D50  DC46  5016  681E
0000271600   2834  4A6A  36FF  2806  36FF  2804  36FF  280A
0000271620   36FF  2808  681E  282A  2F68  63B4  B432  359A
0000271640   00B4  8300  30C4  068E  7AD0  8326  AA3E  00B5
0000271660   0375  09E9  8300  E07E  74FE  E903  000F  068E
0000271700   7AD2  8326  3A3E  00B5  0375  38E9  8D00  E846
0000271720   5016  468D  16F6  8D50  DC46  5016  681E  2834
0000271740   4B6A  36FF  2806  36FF  2804  36FF  280A  36FF
0000271760   2808  8F9A  00AB  8300  1AC4  46C7  00E2  E900
0000272000   0006  03E9  E900  0000  5F5E  ED83  8B02  1FE5
0000272020   4D5D  00CB  581E  4590  8B55  1EEC  D88E  EC81
0000272040   0000  5657  3E83  28DE  7400  E903  0013  468B
0000272060   C406  DA1E  2628  0789  C726  0247  0000  A5E9
0000272100   BF00  0001  468B  C406  DA1E  2628  0789  C726
0000272120   0247  0000  01BE  E900  0001  3946  E036  7F28
0000272140   E903  003D  C668  6841  4E6D  DE8B  E3C1  0302
```

THU MAR 14 17:52:34 1991 TSLINT.DLL PAGE 102, LINE 5960

| | | | | | | | | |
|---|---|---|---|---|---|---|---|---|
| 0000272160 | DA1E | 8E28 | DC06 | 2628 | 77FF | 26FE | 77FF | 9AFC |
| 0000272200 | 7AC4 | A9FD | 3905 | 8330 | 00D2 | DE8B | E3C1 | 0302 |
| 0000272220 | DA1E | 8E28 | DC06 | 2628 | 0789 | 8926 | 0257 | B9E9 |
| 0000272240 | A1FF | 28E2 | E0C1 | 0302 | DA06 | 8B28 | DC16 | A328 |
| 0000272260 | 28D2 | 1689 | 28D4 | DAA1 | 8B28 | DC16 | A328 | 28D6 |
| 0000272300 | 1689 | 28D8 | 00BE | E900 | 0001 | A146 | 28E0 | C88B |
| 0000272320 | E0C1 | 0302 | D1C1 | 3BE0 | 7FC6 | E903 | 0008 | 309A |
| 0000272340 | 9EBA | E9B5 | FFE4 | 5F5E | ED83 | 8B02 | 1FE5 | 4D5D |
| 0000272360 | 1ECB | 9058 | 5545 | EC8B | 8E1E | 81D8 | 06EC | 5700 |
| 0000272400 | A156 | 28DA | 168B | 28DC | 042D | 8900 | FA46 | 5689 |
| 0000272420 | 83FC | DE3E | 0028 | 0374 | 13E9 | A100 | 28DE | C499 |
| 0000272440 | DA1E | 2628 | 4789 | 26FC | 5789 | E9FE | 0022 | D6A1 |
| 0000272460 | 2B28 | DA06 | C128 | 02F8 | C88B | E0C1 | 0302 | 03C1 |
| 0000272500 | DE06 | 9928 | 1EC4 | 28DA | 8926 | FC47 | 8926 | FE57 |
| 0000272520 | 7E83 | 200C | 037C | 3AE9 | 8300 | 0C7E | 7C08 | E903 |
| 0000272540 | 001C | 76FF | 1E0C | E868 | 1E28 | 0068 | 9A71 | 3238 |
| 0000272560 | B6E2 | C483 | B8DA | 0000 | 00BA | E900 | 00FB | 06C7 |
| 0000272600 | 28DE | 0000 | 06C7 | 28E0 | 0000 | 06C7 | 28E2 | 0000 |
| 0000272620 | 6EE9 | 8300 | 0C7E | 7C40 | E903 | 0015 | 06C7 | 28DE |
| 0000272640 | 0001 | 06C7 | 28E0 | 0007 | 06C7 | 28E2 | 0003 | 50E9 |
| 0000272660 | 8100 | 0C7E | 0080 | 037C | 15E9 | C700 | DE06 | 0228 |
| 0000272700 | C700 | E006 | 0F28 | C700 | E206 | 0128 | E900 | 0031 |
| 0000272720 | 7E81 | 000C | 7C01 | E903 | 0015 | 06C7 | 28DE | 0003 |
| 0000272740 | 06C7 | 28E0 | 001F | 06C7 | 28E2 | 0003 | 12E9 | C700 |
| 0000272760 | DE06 | 0428 | C700 | E006 | 3F28 | C700 | E206 | 0128 |
| 0000273000 | 8B00 | 0846 | 568B | 050A | 0004 | DAA3 | 8928 | DC16 |
| 0000273020 | A128 | 28E0 | E0C1 | 0302 | DA06 | 8B28 | DC16 | A328 |
| 0000273040 | 28E4 | 1689 | 28E6 | 76FF | 9A06 | B674 | B741 | C483 |
| 0000273060 | 8302 | DE3E | 0028 | 0374 | 13E9 | A100 | 28DE | C499 |
| 0000273100 | DA1E | 2628 | 4789 | 26FC | 5789 | E9FE | 0022 | D6A1 |
| 0000273120 | 2B28 | DA06 | C128 | 02F8 | C88B | E0C1 | 0302 | 03C1 |
| 0000273140 | DE06 | 9928 | 1EC4 | 28DA | 8926 | FC47 | 8926 | FE57 |
| 0000273160 | 468B | 8BFA | FC56 | 00E9 | 5E00 | 835F | 02ED | E58B |
| 0000273200 | 5D1F | CB4D | 581E | 4590 | 8B55 | 1EEC | D88E | EC81 |
| 0000273220 | 000A | 5657 | 468B | 8B06 | 0856 | 4689 | 89F6 | F856 |
| 0000273240 | 006A | 056A | 5EC4 | 26F6 | 77FF | 2602 | 37FF | F69A |
| 0000273260 | 267A | 8BB9 | 6AF0 | 6A00 | C405 | F65E | FF26 | 0277 |
| 0000273300 | FF26 | 9A37 | 7A2A | B9A2 | F88B | DAA1 | 8B28 | DC16 |
| 0000273320 | 2D28 | 0004 | 4689 | 89FA | FC56 | 3E83 | 28DE | 7400 |
| 0000273340 | E903 | 0013 | DEA1 | 9928 | 1EC4 | 28DA | 8926 | FC47 |
| 0000273360 | 8926 | FE57 | 22E9 | A100 | 28D6 | 062B | 28DA | F8C1 |
| 0000273400 | 8B02 | C1C8 | 02E0 | C103 | 0603 | 28DE | C499 | DA1E |
| 0000273420 | 2628 | 4789 | 26FC | 5789 | 8BFE | E9C6 | 002C | 3689 |
| 0000273440 | 28DE | DE8B | 808B | 283E | E0A3 | 8B28 | 8BDE | 4880 |
| 0000273460 | A328 | 28E2 | 25E9 | 1E00 | 3068 | 1E29 | 0068 | 9A71 |
| 0000273500 | 3238 | B7D0 | C483 | E908 | 0012 | C00B | 037D | E6E9 |
| 0000273520 | 2DFF | 0004 | 037F | C5E9 | E9FF | FFDB | 468B | 8BF6 |
| 0000273540 | F856 | 0405 | A300 | 28DA | 1689 | 28DC | 3E83 | 28DE |
| 0000273560 | 7500 | E903 | 0031 | C78B | E0C1 | 0302 | DA06 | 8B28 |
| 0000273600 | DC16 | A328 | 28D6 | 1689 | 28D8 | E2A1 | 0328 | 99C7 |
| 0000273620 | 3EF7 | 28E0 | E2C1 | 0302 | DA16 | 8B28 | DC0E | 8928 |
| 0000273640 | D216 | 8928 | D40E | A128 | 28E0 | E0C1 | 0302 | DA06 |
| 0000273660 | 8B28 | DC16 | A328 | 28E4 | 1689 | 28E6 | 468B | 8BFA |
| 0000273700 | FC56 | 00E9 | 5E00 | 835F | 02ED | E58B | 5D1F | CB4D |
| 0000273720 | 581E | 4590 | 8B55 | 1EEC | D88E | EC81 | 0006 | 5657 |
| 0000273740 | 3E83 | 28DE | 7400 | E903 | 0042 | C668 | 68C1 | 4E6D |
| 0000273760 | 1EC4 | 28DA | FF26 | 0277 | FF26 | 9A37 | 7AC4 | B911 |
| 0000274000 | 3905 | 8330 | 00D2 | FF25 | 81FF | FFE2 | C47F | DA1E |
| 0000274020 | 2628 | 0789 | 8926 | 0257 | 1EC4 | 28DA | 8B26 | 2607 |

THU MAR 14 17:52:34 1991 TSLINT.DLL PAGE 103, LINE 6019

| | | | | | | | | |
|---|---|---|---|---|---|---|---|---|
| 0000274040 | 578B | 8902 | FA46 | 5689 | E9FC | 0078 | 1EC4 | 28D6 |
| 0000274060 | 8B26 | 2607 | 578B | C402 | D21E | 2628 | 0701 | 1126 |
| 0000274100 | 0257 | 1EC4 | 28D2 | 8B26 | 2607 | 578B | D102 | D1FA |
| 0000274120 | 25D8 | FFFF | E281 | 7FFF | 4689 | 89FA | FC56 | 0683 |
| 0000274140 | 28D2 | A104 | 28E4 | 0639 | 28D2 | 0373 | 16E9 | A100 |
| 0000274160 | 28DA | 168B | 28DC | D2A3 | 8928 | D416 | 8328 | D606 |
| 0000274200 | 0428 | 1FE9 | 8300 | D606 | 0428 | E4A1 | 3928 | D606 |
| 0000274220 | 7328 | E903 | 000E | DAA1 | 8B28 | DC16 | A328 | 28D6 |
| 0000274240 | 1689 | 28D8 | 468B | 8BFA | FC56 | 00E9 | 5E00 | 835F |
| 0000274260 | 02ED | E58B | 5D1F | CB4D | 581E | 4590 | 8B55 | 1EEC |
| 0000274300 | D88E | EC81 | 0004 | 5657 | 66A1 | 0B29 | 6406 | 7429 |
| 0000274320 | E903 | 0012 | 468D | A3FC | 2964 | 168C | 2966 | 189A |
| 0000274340 | 8CBB | E9B8 | 001B | 468D | 39FC | 6406 | 7229 | E903 |
| 0000274360 | 0009 | 06C7 | 803A | 0001 | 06E9 | C700 | 3A06 | FF80 |
| 0000274400 | 5EFF | 835F | 02ED | E58B | 5D1F | CB4D | 581E | 4590 |
| 0000274420 | 8B55 | 1EEC | D88E | EC81 | 0010 | 5657 | 468D | 89FC |
| 0000274440 | F846 | 568C | 83FA | 3A3E | 0080 | 0374 | 05E9 | 9A00 |
| 0000274460 | BB18 | BB41 | 68A1 | 8B29 | 6A16 | 8929 | F446 | 5689 |
| 0000274500 | 8BF6 | F646 | 460B | 75F4 | E903 | 0065 | 3E83 | 803A |
| 0000274520 | 7F00 | E903 | 000F | 5EC4 | 8BF4 | F846 | 3926 | 0447 |
| 0000274540 | 0376 | 19E9 | 8300 | 3A3E | 0080 | 037C | 3CE9 | C400 |
| 0000274560 | F45E | 468B | 26F8 | 4739 | 7204 | E903 | 002D | 5EC4 |
| 0000274600 | 26F4 | 078B | 8B26 | 0257 | 4689 | 89F0 | F256 | 76FF |
| 0000274620 | FFF6 | F476 | BA9A | 5E4D | 83BA | 04C4 | 468B | 8BF0 |
| 0000274640 | F256 | 4689 | 89F4 | F656 | 03E9 | E900 | 0003 | 90E9 |
| 0000274660 | 8BFF | F446 | 568B | A3F6 | 2968 | 1689 | 296A | 7E83 |
| 0000274700 | 0006 | 0374 | 09E9 | B800 | 0000 | 00BA | E900 | 0050 |
| 0000274720 | 468B | 0506 | 0008 | 9A50 | 4DB0 | BBF7 | C483 | 8902 |
| 0000274740 | F046 | 5689 | A1F2 | 2968 | 168B | 296A | 5EC4 | 26F0 |
| 0000274760 | 0789 | 8926 | 0257 | 468B | 8BF8 | FA56 | 5EC4 | 26F0 |
| 0000275000 | 4789 | 2604 | 5789 | 8B06 | F046 | 568B | A3F2 | 2968 |
| 0000275020 | 1689 | 296A | 468B | 8BF0 | F256 | 0805 | E900 | 0000 |
| 0000275040 | 5F5E | ED83 | 8B02 | 1FE5 | 4D5D | 00CB | 581E | 4590 |
| 0000275060 | 8B55 | 1EEC | D88E | EC81 | 0006 | 5657 | 5EC4 | 2606 |
| 0000275100 | 078B | 8B26 | 0257 | FF26 | 8B07 | 8ED8 | 26C2 | 078A |
| 0000275120 | 8B98 | 8BF0 | E9C6 | 013E | 068E | 7AD6 | 8326 | 423E |
| 0000275140 | 0037 | 0375 | 06E9 | E900 | 0124 | 06E9 | B800 | 0007 |
| 0000275160 | 8BE9 | B801 | 0008 | 85E9 | B801 | 000C | 7FE9 | B801 |
| 0000275200 | 000A | 79E9 | B801 | 000D | 73E9 | B801 | 0009 | 6DE9 |
| 0000275220 | 8E01 | D606 | 267A | 3E83 | 3742 | 7500 | E903 | 0006 |
| 0000275240 | EBE9 | E900 | 0006 | 0BB8 | E900 | 0152 | FEB8 | E9FF |
| 0000275260 | 014C | 5EC4 | 2606 | 0FFF | 00B8 | E900 | 0140 | 448D |
| 0000275300 | 89D0 | FC46 | 46C7 | 00FA | FF00 | FA46 | 7E83 | 03FA |
| 0000275320 | 037C | 40E9 | C400 | 065E | 8B26 | 2607 | 578B | 2602 |
| 0000275340 | 07FF | D88B | C28E | 8A26 | 9807 | F08B | FE83 | 7D30 |
| 0000275360 | E903 | 0015 | FE83 | 7E37 | E903 | 000D | 66C1 | 03FC |
| 0000275400 | 448D | 01D0 | FC46 | 09E9 | C400 | 065E | FF26 | E90F |
| 0000275420 | 0003 | B4E9 | 8BFF | FC46 | E3E9 | 8E00 | D606 | 267A |
| 0000275440 | 3E83 | 3742 | 7500 | E903 | 0003 | 61E9 | BF00 | 0000 |
| 0000275460 | 5EC4 | 2606 | 078B | 8B26 | 0257 | FF26 | 8B07 | 8ED8 |
| 0000275500 | 26C2 | 078A | 8B98 | F6F0 | 4F84 | 8075 | 0375 | 2CE9 |
| 0000275520 | F600 | 4F84 | 0475 | 0375 | 08E9 | 8D00 | D044 | F803 |
| 0000275540 | 17E9 | F600 | 4F84 | 0175 | 0375 | 08E9 | 8D00 | C944 |
| 0000275560 | F803 | 05E9 | 8D00 | A944 | F803 | 09E9 | C400 | 065E |
| 0000275600 | FF26 | E90F | 0003 | A7E9 | 8BFF | E9C7 | 0070 | C68B |
| 0000275620 | 6BE9 | E900 | 0068 | 663D | 7500 | E903 | FEDB | 037E |
| 0000275640 | 33E9 | 3D00 | 0037 | 037E | 1AE9 | 3D00 | 0030 | 037C |
| 0000275660 | 0BE9 | 0BFF | 75C0 | E903 | FEF8 | 0A2D | 7500 | E903 |
| 0000275700 | FEEA | C9E9 | 2DFF | 0061 | 0375 | 8BE9 | 48FE | 0375 |

THU MAR 14 17:52:34 1991 TSLINT.DLL PAGE 104, LINE 6078

| | | | | | | | | |
|---|---|---|---|---|---|---|---|---|
| 0000275720 | A0E9 | E9FE | FFB8 | 6E2D | 7500 | E903 | FEA1 | 042D |
| 0000275740 | 7500 | E903 | FE9F | 4848 | 0375 | 9EE9 | 48FE | 7548 |
| 0000275760 | E903 | FE9D | 4848 | 0375 | 20E9 | E9FF | FF90 | 5F5E |
| 0000276000 | ED83 | 8B02 | 1FE5 | 4D5D | 1ECB | 9058 | 5545 | EC8B |
| 0000276020 | 8E1E | 81D8 | 42EC | 5701 | C756 | F846 | 2E92 | 5E8C |
| 0000276040 | C7FA | E846 | 0102 | C02B | 4689 | 89D8 | D646 | 068E |
| 0000276060 | 7AD8 | 8326 | 0D3E | 00B6 | 0375 | 1DE9 | FF00 | 4636 |
| 0000276100 | FF2B | 4436 | 8D2B | CE46 | 5016 | 249A | 00B5 | 8300 |
| 0000276120 | 08C4 | 003D | 7400 | E903 | 000F | 068E | 7ADA | 8326 |
| 0000276140 | 253E | 00B6 | 0375 | 3BE9 | 1E00 | 9668 | 8D2E | DA46 |
| 0000276160 | 5016 | 468D | 16CE | 8D50 | F046 | 5016 | 3168 | 1E01 |
| 0000276200 | BE68 | FF31 | 4236 | FF2B | 4036 | FF2B | 4636 | FF2B |
| 0000276220 | 4436 | 9A2B | B56C | 0000 | C483 | 891E | F046 | 5689 |
| 0000276240 | E9F2 | 0008 | C02B | 4689 | 89F2 | F046 | 86C7 | FECC |
| 0000276260 | 0000 | 46C7 | 00F4 | 8300 | 483E | 002B | 0375 | 1AE9 |
| 0000276300 | C700 | 4806 | 002B | BB00 | 803C | 068E | 7ADC | 8926 |
| 0000276320 | A41E | 260A | 1E8C | 0AA6 | 07C6 | 8E00 | DC06 | 267A |
| 0000276340 | 1EC4 | 0AA4 | 8026 | 003F | 0374 | 15E9 | 8E04 | DE06 |
| 0000276360 | 267A | 36FF | 3858 | FF9A | 00FF | 6800 | 0200 | 681E |
| 0000276400 | 803C | 868D | FECE | 5016 | 3768 | 681E | 3844 | 068E |
| 0000276420 | 7AE0 | FF26 | 5E1E | 8908 | EE46 | 068E | 7AE2 | A126 |
| 0000276440 | 3844 | 068E | 7AE4 | A326 | 3846 | 068E | 7AD8 | 8326 |
| 0000276460 | E73E | 00BF | 0375 | 47E9 | 8300 | D27E | 75FE | E903 |
| 0000276500 | 003E | 068E | 7AE2 | FF26 | 4436 | 1E38 | 9A68 | 8D2E |
| 0000276520 | DA46 | 5016 | 468D | 16F0 | 8D50 | CE46 | 5016 | 681E |
| 0000276540 | 31BE | 5A68 | FF01 | 4236 | FF2B | 4036 | FF2B | 4636 |
| 0000276560 | FF2B | 4436 | 682B | 0101 | FF9A | 00FF | 8300 | 22C4 |
| 0000276600 | 068E | 7AD8 | 8326 | 473E | 00C0 | 0375 | 48E9 | 8300 |
| 0000276620 | D27E | 75FE | E903 | 003F | 76FF | 1EEE | A568 | 8D2E |
| 0000276640 | DA46 | 5016 | 468D | 16F0 | 8D50 | CE46 | 5016 | 681E |
| 0000276660 | 31BE | 5B68 | FF01 | 4236 | FF2B | 4036 | FF2B | 4636 |
| 0000276700 | FF2B | 4436 | 1E2B | C368 | 682E | C087 | 8A68 | 9AC0 |
| 0000276720 | C08D | 0000 | C483 | 8328 | EE7E | 74FF | E903 | 00D4 |
| 0000276740 | 068E | 7AD8 | 8326 | 9B3E | 00C0 | 0375 | 45E9 | 8300 |
| 0000276760 | D27E | 75FE | E903 | 003C | 681E | 2ECB | 468D | 16DA |
| 0000277000 | 8D50 | F046 | 5016 | 468D | 16CE | 1E50 | BE68 | 6831 |
| 0000277020 | 015E | 36FF | 2B42 | 36FF | 2B40 | 36FF | 2B46 | 36FF |
| 0000277040 | 2B44 | 681E | 2EE6 | 6468 | 68C1 | C167 | 6A9A | 00C1 |
| 0000277060 | 8300 | 26C4 | 068E | 7AD8 | 8326 | 243E | 00C1 | 0375 |
| 0000277100 | 09E9 | 8300 | D27E | 74FE | E903 | 000F | 068E | 7ADA |
| 0000277120 | 8326 | C13E | 00BE | 0375 | 50E9 | C700 | D446 | 0000 |
| 0000277140 | 76FF | FFD8 | D676 | 468D | 16D4 | FF50 | E876 | 76FF |
| 0000277160 | FFFA | F876 | 4E8D | 16DA | 8D51 | F04E | 5116 | 4E8D |
| 0000277200 | 16CE | 1E51 | BE68 | 6831 | 015F | 36FF | 2B42 | 36FF |
| 0000277220 | 2B40 | 36FF | 2B46 | 36FF | 2B44 | BB9A | 00B4 | 8300 |
| 0000277240 | 28C4 | 468B | E9D4 | 2A73 | 06E9 | B800 | 0000 | 6AE9 |
| 0000277260 | E92A | 024E | 7E83 | FEEE | 0374 | 67E9 | 8E00 | D806 |
| 0000277300 | 267A | 3E83 | BE95 | 7500 | E903 | 0045 | 7E83 | FED2 |
| 0000277320 | 0375 | 3CE9 | 1E00 | EF68 | 8D2E | DA46 | 5016 | 468D |
| 0000277340 | 16F0 | 8D50 | CE46 | 5016 | 681E | 31BE | 6268 | FF01 |
| 0000277360 | 4236 | FF2B | 4036 | FF2B | 4636 | FF2B | 4436 | 1E2B |
| 0000277400 | 1168 | 682F | B5F9 | FC68 | 9AB5 | B5FF | 0000 | C483 |
| 0000277420 | 8E26 | E606 | 267A | 06C7 | 3852 | 0001 | 7F9A | 8DAA |
| 0000277440 | E9B5 | 01DE | 7E83 | FCEE | 0374 | E4E9 | 8E00 | D806 |
| 0000277460 | 267A | 3E83 | BF91 | 7500 | E903 | 0045 | 7E83 | FED2 |
| 0000277500 | 0375 | 3CE9 | 1E00 | 1A68 | 8D2F | DA46 | 5016 | 468D |
| 0000277520 | 16F0 | 8D50 | CE46 | 5016 | 681E | 31BE | 6768 | FF01 |
| 0000277540 | 4236 | FF2B | 4036 | FF2B | 4636 | FF2B | 4436 | 1E2B |
| 0000277560 | 3968 | 682F | C02A | 2D68 | 9AC0 | C030 | 0000 | C483 |

THU MAR 14 17:52:34 1991 TSLINT.DLL PAGE 105, LINE 6137

| | | | | | | | | |
|---|---|---|---|---|---|---|---|---|
| 0000277600 | 9A26 | ED04 | BB92 | 068E | 7AE8 | C726 | 8606 | 530C |
| 0000277620 | 8E00 | D806 | 267A | 3E83 | C281 | 7500 | E903 | 0009 |
| 0000277640 | 7E83 | FED2 | 0374 | 0FE9 | 8E00 | DA06 | 267A | 3E83 |
| 0000277660 | C0B3 | 7500 | E903 | 0050 | 46C7 | 23D4 | FF01 | D876 |
| 0000277700 | 76FF | 8DD6 | D446 | 5016 | 76FF | FFE8 | FA76 | 76FF |
| 0000277720 | 8DF8 | DA4E | 5116 | 4E8D | 16F0 | 8D51 | CE4E | 5116 |
| 0000277740 | 681E | 31BE | 6A68 | FF01 | 4236 | FF2B | 4036 | FF2B |
| 0000277760 | 4636 | FF2B | 4436 | 9A2B | C0FB | 0000 | C483 | 8B28 |
| 0000300000 | D446 | 16E9 | E929 | 0006 | 23B8 | E901 | 290D | F1E9 |
| 0000300020 | 8300 | EE7E | 74FD | E903 | 00B7 | 068E | 7AD8 | 8326 |
| 0000300040 | D53E | 00C2 | 0375 | 45E9 | 8300 | D27E | 75FE | E903 |
| 0000300060 | 003C | 681E | 2F42 | 468D | 16DA | 8D50 | F046 | 5016 |
| 0000300100 | 468D | 16CE | 1E50 | BE68 | 6831 | 016E | 36FF | 2B42 |
| 0000300120 | 36FF | 2B40 | 36FF | 2B46 | 36FF | 2B44 | 681E | 2F62 |
| 0000300140 | 1568 | 68C3 | C318 | 1B9A | 00C3 | 8300 | 26C4 | 068E |
| 0000300160 | 7AD8 | 8326 | 943E | 00C1 | 0375 | 45E9 | 8300 | D27E |
| 0000300200 | 75FE | E903 | 003C | 681E | 2F68 | 468D | 16DA | 8D50 |
| 0000300220 | F046 | 5016 | 468D | 16CE | 1E50 | BE68 | 6831 | 016F |
| 0000300240 | 36FF | 2B42 | 36FF | 2B40 | 36FF | 2B46 | 36FF | 2B44 |
| 0000300260 | 681E | 2F8A | D468 | 68C1 | C1D7 | DA9A | 00C1 | 8300 |
| 0000300300 | 26C4 | 681E | 2F93 | 039A | 7FB1 | 83C1 | 04C4 | 31E9 |
| 0000300320 | B800 | 803C | 068E | 7AEA | A326 | 0C8E | 8C26 | 901E |
| 0000300340 | 8E0C | DC06 | 267A | A4A3 | 260A | 1E8C | 0AA6 | 868D |
| 0000300360 | FECE | 5016 | 6968 | 68BF | 3744 | B49A | 3A50 | 83BC |
| 0000300400 | 08C4 | 068E | 7AEC | 8326 | 5C3E | 000C | 0375 | 0CE9 |
| 0000300420 | 2601 | 06C7 | 0C5C | 0000 | 068E | 7ADC | A126 | 0AA4 |
| 0000300440 | 8B26 | A616 | 8E0A | EE06 | 267A | 34A3 | 2600 | 1689 |
| 0000300460 | 0036 | 068E | 7ADC | A126 | 0AA4 | 8B26 | A616 | 260A |
| 0000300500 | 06FF | 0AA4 | D88B | C28E | 8A26 | 9807 | F08B | FE83 |
| 0000300520 | 7500 | E903 | 00C7 | C68B | 9DE9 | 8E00 | DC06 | 267A |
| 0000300540 | A4A1 | 260A | 168B | 0AA6 | FF26 | A406 | 8B0A | 8ED8 |
| 0000300560 | 26C2 | 3F80 | 7400 | E903 | 0015 | 681E | 2FA7 | 409A |
| 0000300600 | 4AAD | 83C4 | 04C4 | 04B8 | E901 | 278F | 16E9 | 8E00 |
| 0000300620 | DC06 | 267A | 1EC4 | 0AA4 | 8026 | FF7F | 740A | E903 |
| 0000300640 | 0003 | 36E9 | E9FB | 0072 | 068E | 7ADC | FF26 | A40E |
| 0000300660 | 8E0A | EE06 | 267A | 34A1 | 2600 | 168B | 0036 | 068E |
| 0000300700 | 7AE8 | A326 | 0C86 | 8926 | 8816 | B80C | 0102 | 4AE9 |
| 0000300720 | 8E27 | E206 | 267A | 06FF | 3844 | 068E | 7ADC | FF26 |
| 0000300740 | A40E | 1E0A | C768 | 9A2F | AD40 | C329 | C483 | B804 |
| 0000300760 | 0104 | 26E9 | E927 | 0022 | C00B | 0375 | DBE9 | 2DFF |
| 0000301000 | 000A | 0375 | CAE9 | 2DFF | 0025 | 0375 | 99E9 | 2DFF |
| 0000301020 | 002D | 0375 | 44E9 | E9FF | 0000 | 15E9 | 8EFF | DC06 |
| 0000301040 | 267A | 1EC4 | 0AA4 | 8026 | 0A3F | 0374 | 15E9 | 8E00 |
| 0000301060 | DC06 | 267A | 06FF | 0AA4 | 068E | 7AE2 | FF26 | 4406 |
| 0000301100 | E938 | FA97 | 068E | 7ADC | C426 | A41E | 260A | 3F80 |
| 0000301120 | 7500 | E903 | 0030 | 068E | 7ADC | C426 | A41E | 260A |
| 0000301140 | 3F80 | 7520 | E903 | 0012 | 068E | 7ADC | C426 | A41E |
| 0000301160 | 260A | 3F80 | 7409 | E903 | 000C | 068E | 7ADC | FF26 |
| 0000301200 | A406 | E90A | FFBE | 068E | 7ADC | A126 | 0AA4 | 8B26 |
| 0000301220 | A616 | 8E0A | EE06 | 267A | 34A3 | 2600 | 1689 | 0036 |
| 0000301240 | 068E | 7ADC | A126 | 0AA4 | 8B26 | A616 | 260A | 06FF |
| 0000301260 | 0AA4 | D88B | C28E | 8A26 | 9807 | F08B | C68B | 59E9 |
| 0000301300 | 8E1F | D806 | 267A | 3E83 | C61C | 7500 | E903 | 0009 |
| 0000301320 | 7E83 | FED2 | 0374 | 0FE9 | 8E00 | DA06 | 267A | 3E83 |
| 0000301340 | C634 | 7500 | E903 | 0050 | 46C7 | 00D4 | FF00 | D876 |
| 0000301360 | 76FF | 8DD6 | D446 | 5016 | 76FF | FFE8 | FA76 | 76FF |
| 0000301400 | 8DF8 | DA4E | 5116 | 4E8D | 16F0 | 8D51 | CE4E | 5116 |
| 0000301420 | 681E | 31BE | AB68 | FF01 | 4236 | FF2B | 4036 | FF2B |
| 0000301440 | 4636 | FF2B | 4436 | 9A2B | C67A | 0000 | C483 | 8B28 |

THU MAR 14 17:52:34 1991 TSLINT.DLL PAGE 106, LINE 6196

| | | | | | | | | |
|---|---|---|---|---|---|---|---|---|
| 0000301460 | D446 | E6E9 | E925 | 0006 | 00B8 | E900 | 25DD | 068E |
| 0000301500 | 7AE2 | FF26 | 4406 | E938 | F991 | 068E | 7ADC | C426 |
| 0000301520 | A41E | 260A | 3F80 | 750A | E903 | 001E | 068E | 7ADC |
| 0000301540 | C426 | A41E | 260A | 3F80 | 7500 | E903 | 000C | 068E |
| 0000301560 | 7ADC | FF26 | A406 | E90A | FFD0 | 5EE9 | 8EF9 | DC06 |
| 0000301600 | 267A | 1EC4 | 0AA4 | 8026 | 0A3F | 0374 | 18E9 | 8E00 |
| 0000301620 | E206 | 267A | 06FF | 3844 | 068E | 7ADC | FF26 | A406 |
| 0000301640 | E90A | F937 | 03E9 | E900 | 1F60 | 068E | 7AE8 | C726 |
| 0000301660 | 8606 | 000C | 8E00 | D806 | 267A | 3E83 | C6A1 | 7500 |
| 0000301700 | E903 | 0009 | 7E83 | FED2 | 0374 | 0FE9 | 8E00 | DA06 |
| 0000301720 | 267A | 3E83 | C6B9 | 7500 | E903 | 004E | 7689 | FFD4 |
| 0000301740 | D876 | 76FF | 8DD6 | D446 | 5016 | 76FF | FFE8 | FA76 |
| 0000301760 | 76FF | 8DF8 | DA4E | 5116 | 4E8D | 16F0 | 8D51 | CE4E |
| 0000302000 | 5116 | 681E | 31BE | CC68 | FF01 | 4236 | FF2B | 4036 |
| 0000302020 | FF2B | 4636 | FF2B | 4436 | 9A2B | C6FF | 0000 | C483 |
| 0000302040 | 8B28 | D446 | F4E9 | E924 | 0005 | C68B | ECE9 | 8E24 |
| 0000302060 | E806 | 267A | 06C7 | 0C86 | 0000 | 068E | 7AD8 | 8326 |
| 0000302100 | 413E | 00C7 | 0375 | 09E9 | 8300 | D27E | 74FE | E903 |
| 0000302120 | 000F | 068E | 7ADA | 8326 | AD3E | 00C7 | 0375 | 4EE9 |
| 0000302140 | 8900 | D476 | 76FF | FFD8 | D676 | 468D | 16D4 | FF50 |
| 0000302160 | E876 | 76FF | FFFA | F876 | 4E8D | 16DA | 8D51 | FD4E |
| 0000302200 | 5116 | 4E8D | 16CE | 1E51 | BE68 | 6831 | 01D1 | 36FF |
| 0000302220 | 2B42 | 36FF | 2B40 | 36FF | 2B46 | 36FF | 2B44 | F59A |
| 0000302240 | 00C7 | 8300 | 28C4 | 468B | E9D4 | 246F | 05E9 | 8B00 |
| 0000302260 | E9C6 | 2467 | 068E | 7ADC | C426 | A41E | 260A | 3F80 |
| 0000302300 | 743D | E903 | 00E8 | 068E | 7AE8 | C726 | 8606 | 100C |
| 0000302320 | 8E00 | DC06 | 267A | 06FF | 0AA4 | 068E | 7AD8 | 8326 |
| 0000302340 | 953E | 00C7 | 0375 | 45E9 | 8300 | D27E | 75FE | E903 |
| 0000302360 | 003C | 681E | 2FDB | 468D | 16DA | 8D50 | F046 | 5016 |
| 0000302400 | 468D | 16CE | 1E50 | BE68 | 6831 | 01D7 | 36FF | 2B42 |
| 0000302420 | 36FF | 2B40 | 36FF | 2B46 | 36FF | 2B44 | 681E | 2FE4 |
| 0000302440 | C168 | 68C2 | C2C4 | C79A | 00C2 | 8300 | 26C4 | 068E |
| 0000302460 | 7AD8 | 8326 | 4F3E | 00C8 | 0375 | 09E9 | 8300 | D27E |
| 0000302500 | 74FE | E903 | 000F | 068E | 7ADA | 8326 | 103E | 00C2 |
| 0000302520 | 0375 | 50E9 | C700 | D446 | 0109 | 76FF | FFD8 | D676 |
| 0000302540 | 468D | 16D4 | FF50 | E876 | 76FF | FFFA | F876 | 4E8D |
| 0000302560 | 16DA | 8D51 | F04E | 5116 | 4E8D | 16CE | 1E51 | BE68 |
| 0000302600 | 6831 | 01D8 | 36FF | 2B42 | 36FF | 2B40 | 36FF | 2B46 |
| 0000302620 | 36FF | 2B44 | 589A | 00C2 | 8300 | 28C4 | 468B | E9D4 |
| 0000302640 | 2379 | 06E9 | B800 | 0109 | 70E9 | E923 | 019F | 068E |
| 0000302660 | 7ADC | C426 | A41E | 260A | 3F80 | 742A | E903 | 018D |
| 0000302700 | 068E | 7ADC | C426 | A41E | 260A | 7F80 | 3D01 | 0374 |
| 0000302720 | E9E9 | 8E00 | E806 | 267A | 06C7 | 0C86 | 004B | 068E |
| 0000302740 | 7ADC | 8326 | A406 | 020A | 068E | 7AD8 | 8326 | F83E |
| 0000302760 | 00C1 | 0375 | 45E9 | 8300 | D27E | 75FE | E903 | 003C |
| 0000303000 | 681E | 2FEA | 468D | 16DA | 8D50 | F046 | 5016 | 468D |
| 0000303020 | 16CE | 1E50 | BE68 | 6831 | 01DE | 36FF | 2B42 | 36FF |
| 0000303040 | 2B40 | 36FF | 2B46 | 36FF | 2B44 | 681E | 2FF3 | 9F68 |
| 0000303060 | 68CA | CAA2 | A59A | 00CA | 8300 | 26C4 | 068E | 7AD8 |
| 0000303100 | 8326 | 373E | 00C9 | 0375 | 09E9 | 8300 | D27E | 74FE |
| 0000303120 | E903 | 000F | 068E | 7ADA | 8326 | 4F3E | 00C9 | 0375 |
| 0000303140 | 50E9 | C700 | D446 | 0109 | 76FF | FFD8 | D676 | 468D |
| 0000303160 | 16D4 | FF50 | E876 | 76FF | FFFA | F876 | 4E8D | 16DA |
| 0000303200 | 8D51 | F04E | 5116 | 4E8D | 16CE | 1E51 | BE68 | 6831 |
| 0000303220 | 01DF | 36FF | 2B42 | 36FF | 2B40 | 36FF | 2B46 | 36FF |
| 0000303240 | 2B44 | 979A | 00C9 | 8300 | 28C4 | 468B | E9D4 | 226B |
| 0000303260 | 06E9 | B800 | 0109 | 62E9 | E922 | 0091 | 068E | 7AEB |
| 0000303300 | C726 | 8606 | 000C | 8E00 | DC06 | 267A | 06FF | 0AA4 |
| 0000303320 | 068E | 7AD8 | 8326 | BF3E | 00C9 | 0375 | 09E9 | 8300 |

THU MAR 14 17:52:34 1991 TSLINT.DLL PAGE 107, LINE 6255

| | | | | | | | | |
|---|---|---|---|---|---|---|---|---|
| 0000303340 | D27E | 74FE | E903 | 000F | 068E | 7ADA | 8326 | D73E |
| 0000303360 | 00C9 | 0375 | 50E9 | C700 | D446 | 005E | 76FF | FFD8 |
| 0000303400 | D676 | 468D | 16D4 | FF50 | E876 | 76FF | FFFA | F876 |
| 0000303420 | 4E8D | 16DA | 8D51 | F04E | 5116 | 4E8D | 16CE | 1E51 |
| 0000303440 | BE68 | 6831 | 01E3 | 36FF | 2B42 | 36FF | 2B40 | 36FF |
| 0000303460 | 2B46 | 36FF | 2B44 | 1D9A | 00CA | 8300 | 28C4 | 468B |
| 0000303500 | E9D4 | 21D7 | 06E9 | B800 | 005E | CEE9 | 8E21 | E806 |
| 0000303520 | 267A | 06C7 | 0C86 | 0000 | 068E | 7AD8 | 8326 | 5F3E |
| 0000303540 | 00CA | 0375 | 09E9 | 8300 | D27E | 74FE | E903 | 000F |
| 0000303560 | 068E | 7ADA | 8326 | CB3E | 00CA | 0375 | 4EE9 | 8900 |
| 0000303600 | D476 | 76FF | FFD8 | D676 | 468D | 16D4 | FF50 | E876 |
| 0000303620 | 76FF | FFFA | F876 | 4E8D | 16DA | 8D51 | F04E | 5116 |
| 0000303640 | 4E8D | 16CE | 1E51 | BE68 | 6831 | 01E7 | 36FF | 2B42 |
| 0000303660 | 36FF | 2B40 | 36FF | 2B46 | 36FF | 2B44 | 139A | 00CB |
| 0000303700 | 8300 | 28C4 | 468B | E9D4 | 2151 | 05E9 | 8B00 | E9C6 |
| 0000303720 | 2149 | 068E | 7ADC | C426 | A41E | 260A | 3F80 | 743D |
| 0000303740 | E903 | 00E5 | 068E | 7AE8 | C726 | 8606 | 110C | 8E00 |
| 0000303760 | DC06 | 267A | 06FF | 0AA4 | 068E | 7AD8 | 8326 | B33E |
| 0000304000 | 00CA | 0375 | 45E9 | 8300 | D27E | 75FE | E903 | 003C |
| 0000304020 | 681E | 2FF9 | 468D | 16DA | 8D50 | F046 | 5016 | 468D |
| 0000304040 | 16CE | 1E50 | BE68 | 6831 | 01ED | 36FF | 2B42 | 36FF |
| 0000304060 | 2B40 | 36FF | 2B46 | 36FF | 2B44 | 681E | 3002 | 8168 |
| 0000304100 | 68C7 | C784 | 879A | 00C7 | 8300 | 26C4 | 068E | 7AD8 |
| 0000304120 | 8326 | 3B3E | 00CB | 0375 | 09E9 | 8300 | D27E | 74FE |
| 0000304140 | E903 | 000F | 068E | 7ADA | 8326 | 533E | 00CB | 0375 |
| 0000304160 | 50E9 | C700 | D446 | 0109 | 76FF | FFD8 | D676 | 468D |
| 0000304200 | 16D4 | FF50 | E876 | 76FF | FFFA | F876 | 4E8D | 16DA |
| 0000304220 | 8D51 | F04E | 5116 | 4E8D | 16CE | 1E51 | BE68 | 6831 |
| 0000304240 | 01EE | 36FF | 2B42 | 36FF | 2B40 | 36FF | 2B46 | 36FF |
| 0000304260 | 2B44 | 999A | 00CB | 8300 | 28C4 | 468B | E9D4 | 205B |
| 0000304300 | 06E9 | B800 | 0109 | 52E9 | 8E20 | E806 | 267A | 06C7 |
| 0000304320 | 0C86 | 0000 | 068E | 7AD8 | 8326 | DB3E | 00CB | 0375 |
| 0000304340 | 09E9 | 8300 | D27E | 74FE | E903 | 000F | 068E | 7ADA |
| 0000304360 | 8326 | 403E | 00C5 | 0375 | 4EE9 | 8900 | D476 | 76FF |
| 0000304400 | FFD8 | D676 | 468D | 16D4 | FF50 | E876 | 76FF | FFFA |
| 0000304420 | F876 | 4E8D | 16DA | 8D51 | F04E | 5116 | 4E8D | 16CE |
| 0000304440 | 1E51 | BE68 | 6831 | 01F1 | 36FF | 2B42 | 36FF | 2B40 |
| 0000304460 | 36FF | 2B46 | 36FF | 2B44 | 889A | 00C5 | 8300 | 28C4 |
| 0000304500 | 468B | E9D4 | 1FD5 | 05E9 | 8B00 | E9C6 | 1FCD | 068E |
| 0000304520 | 7ADC | C426 | A41E | 260A | 3F80 | 743D | E903 | 00E5 |
| 0000304540 | 068E | 7AE8 | C726 | 8606 | 120C | 8E00 | DC06 | 267A |
| 0000304560 | 06FF | 0AA4 | 068E | 7AD8 | 8326 | 283E | 00C5 | 0375 |
| 0000304600 | 45E9 | 8300 | D27E | 75FE | E903 | 003C | 681E | 3008 |
| 0000304620 | 468D | 16DA | 8D50 | F046 | 5016 | 468D | 16CE | 1E50 |
| 0000304640 | BE68 | 6831 | 01F7 | 36FF | 2B42 | 36FF | 2B40 | 36FF |
| 0000304660 | 2B46 | 36FF | 2B44 | 681E | 3011 | 8F68 | 68C8 | C892 |
| 0000304700 | 959A | 00C8 | 8300 | 26C4 | 068E | 7AD8 | 8326 | B73E |
| 0000304720 | 00CC | 0375 | 09E9 | 8300 | D27E | 74FE | E903 | 000F |
| 0000304740 | 068E | 7ADA | 8326 | CF3E | 00CC | 0375 | 50E9 | C700 |
| 0000304760 | D446 | 0109 | 76FF | FFD8 | D676 | 468D | 16D4 | FF50 |
| 0000305000 | E876 | 76FF | FFFA | F876 | 4E8D | 16DA | 8D51 | F04E |
| 0000305020 | 5116 | 4E8D | 16CE | 1E51 | BE68 | 6831 | 01F8 | 36FF |
| 0000305040 | 2B42 | 36FF | 2B40 | 36FF | 2B46 | 36FF | 2B44 | 159A |
| 0000305060 | 00CD | 8300 | 28C4 | 468B | E9D4 | 1EDF | 06E9 | B800 |
| 0000305100 | 0109 | D6E9 | 8E1E | E806 | 267A | 06C7 | 0C86 | 0000 |
| 0000305120 | 068E | 7AD8 | 8326 | A33E | 00C8 | 0375 | 09E9 | 8300 |
| 0000305140 | D27E | 74FE | E903 | 000F | 068E | 7ADA | 8326 | BB3E |
| 0000305160 | 00C8 | 0375 | 4EE9 | 8900 | D476 | 76FF | FFD8 | D676 |
| 0000305200 | 468D | 16D4 | FF50 | E876 | 76FF | FFFA | F876 | 4E8D |

THU MAR 14 17:52:34 1991 TSLINT.DLL PAGE 108, LINE 6314

| | | | | | | | | |
|---|---|---|---|---|---|---|---|---|
| 0000305220 | 16DA | 8D51 | F04E | 5116 | 4E8D | 16CE | 1E51 | BE68 |
| 0000305240 | 6831 | 01FB | 36FF | 2B42 | 36FF | 2B40 | 36FF | 2B46 |
| 0000305260 | 36FF | 2B44 | 039A | 00C9 | 8300 | 28C4 | 468B | E9D4 |
| 0000305300 | 1E59 | 05E9 | 8B00 | E9C6 | 1E51 | 068E | 7ADC | C426 |
| 0000305320 | A41E | 260A | 3F80 | 743D | E903 | 00E5 | 068E | 7AE8 |
| 0000305340 | C726 | 8606 | 4B0C | 8E00 | DC06 | 267A | 06FF | 0AA4 |
| 0000305360 | 068E | 7AD8 | 8326 | AB3E | 00CD | 0375 | 45E9 | 8300 |
| 0000305400 | D27E | 75FE | E903 | 003C | 681E | 3017 | 468D | 16DA |
| 0000305420 | 8D50 | F046 | 5016 | 468D | 16CE | 1E50 | BE68 | 6831 |
| 0000305440 | 0201 | 36FF | 2B42 | 36FF | 2B40 | 36FF | 2B46 | 36FF |
| 0000305460 | 2B44 | 681E | 3020 | 1368 | 68CF | CF16 | 199A | 00CF |
| 0000305500 | 8300 | 26C4 | 068E | 7AD8 | 8326 | 333E | 00CE | 0375 |
| 0000305520 | 09E9 | 8300 | D27E | 74FE | E903 | 000F | 068E | 7ADA |
| 0000305540 | 8326 | 4B3E | 00CE | 0375 | 50E9 | C700 | D446 | 0109 |
| 0000305560 | 76FF | FFD8 | D676 | 468D | 16D4 | FF50 | E876 | 76FF |
| 0000305600 | FFFA | F876 | 4E8D | 16DA | 8D51 | F04E | 5116 | 4E8D |
| 0000305620 | 16CE | 1E51 | BE68 | 6831 | 0202 | 36FF | 2B42 | 36FF |
| 0000305640 | 2B40 | 36FF | 2B46 | 36FF | 2B44 | 919A | 00CE | 8300 |
| 0000305660 | 28C4 | 468B | E9D4 | 1D63 | 06E9 | B800 | 0109 | 5AE9 |
| 0000305700 | 8E1D | E806 | 267A | 06C7 | 0C86 | 0000 | 068E | 7AD8 |
| 0000305720 | 8326 | D33E | 00CE | 0375 | 09E9 | 8300 | D27E | 74FE |
| 0000305740 | E903 | 000F | 068E | 7ADA | 8326 | 3F3E | 00CF | 0375 |
| 0000305760 | 4EE9 | 8900 | D476 | 76FF | FFD8 | D676 | 468D | 16D4 |
| 0000306000 | FF50 | E876 | 76FF | FFFA | F876 | 4E8D | 16DA | 8D51 |
| 0000306020 | F04E | 5116 | 4E8D | 16CE | 1E51 | BE68 | 6831 | 0205 |
| 0000306040 | 36FF | 2B42 | 36FF | 2B40 | 36FF | 2B46 | 36FF | 2B44 |
| 0000306060 | 879A | 00CF | 8300 | 28C4 | 468B | E9D4 | 1CDD | 05E9 |
| 0000306100 | 8B00 | E9C6 | 1CD5 | 068E | 7ADC | C426 | A41E | 260A |
| 0000306120 | 3F80 | 743D | E903 | 00E5 | 068E | 7AE8 | C726 | 8606 |
| 0000306140 | 130C | 8E00 | DC06 | 267A | 06FF | 0AA4 | 068E | 7AD8 |
| 0000306160 | 8326 | 273E | 00CF | 0375 | 45E9 | 8300 | D27E | 75FE |
| 0000306200 | E903 | 003C | 681E | 3026 | 468D | 16DA | 8D50 | F046 |
| 0000306220 | 5016 | 468D | 16CE | 1E50 | BE68 | 6831 | 020B | 36FF |
| 0000306240 | 2B42 | 36FF | 2B40 | 36FF | 2B46 | 36FF | 2B44 | 681E |
| 0000306260 | 302F | 0A68 | 68D0 | D00D | 109A | 00D0 | 8300 | 26C4 |
| 0000306300 | 068E | 7AD8 | 8326 | CA3E | 00CF | 0375 | 09E9 | 8300 |
| 0000306320 | D27E | 74FE | E903 | 000F | 068E | 7ADA | 8326 | 363E |
| 0000306340 | 00D0 | 0375 | 50E9 | C700 | D446 | 0109 | 76FF | FFD8 |
| 0000306360 | D676 | 468D | 16D4 | FF50 | E876 | 76FF | FFFA | F876 |
| 0000306400 | 4E8D | 16DA | 8D51 | F04E | 5116 | 4E8D | 16CE | 1E51 |
| 0000306420 | BE68 | 6831 | 020C | 36FF | 2B42 | 36FF | 2B40 | 36FF |
| 0000306440 | 2B46 | 36FF | 2B44 | 7E9A | 00D0 | 8300 | 28C4 | 468B |
| 0000306460 | E9D4 | 1BE7 | 06E9 | B800 | 0109 | DEE9 | 8E1B | DC06 |
| 0000306500 | 267A | 1EC4 | 0AA4 | 8026 | 2B3F | 0374 | E5E9 | 8E00 |
| 0000306520 | E806 | 267A | 06C7 | 0C86 | 0000 | 068E | 7ADC | FF26 |
| 0000306540 | A406 | 8E0A | D806 | 267A | 3E83 | D01E | 7500 | E903 |
| 0000306560 | 0045 | 7E83 | FED2 | 0375 | 3CE9 | 1E00 | 3568 | 8D30 |
| 0000306600 | DA46 | 5016 | 468D | 16F0 | 8D50 | CE46 | 5016 | 681E |
| 0000306620 | 31BE | 1168 | FF02 | 4236 | FF2B | 4036 | FF2B | 4636 |
| 0000306640 | FF2B | 4436 | 1E2B | 3F68 | 6830 | CC1B | 1E68 | 9ACC |
| 0000306660 | CC21 | 0000 | C483 | 8E26 | D806 | 267A | 3E83 | D0A6 |
| 0000306700 | 7500 | E903 | 0009 | 7E83 | FED2 | 0374 | 0FE9 | 8E00 |
| 0000306720 | DA06 | 267A | 3E83 | D0BE | 7500 | E903 | 0050 | 46C7 |
| 0000306740 | 26D4 | FF01 | D876 | 76FF | 8DD6 | D446 | 5016 | 76FF |
| 0000306760 | FFE8 | FA76 | 76FF | 8DF8 | DA4E | 5116 | 4E8D | 16F0 |
| 0000307000 | 8D51 | CE4E | 5116 | 681E | 31BE | 1268 | FF02 | 4236 |
| 0000307020 | FF2B | 4036 | FF2B | 4636 | FF2B | 4436 | 9A2B | CC8F |
| 0000307040 | 0000 | C483 | 8B28 | D446 | F0E9 | E91A | 0006 | 26B8 |
| 0000307060 | E901 | 1AE7 | 068E | 7AE8 | C726 | 8606 | 000C | 8E00 |

THU MAR 14 17:52:34 1991 TSLINT.DLL PAGE 109, LINE 6373

| | | | | | | | | |
|---|---|---|---|---|---|---|---|---|
| 0000307100 | D806 | 267A | 3E83 | CC2F | 7500 | E903 | 0009 | 7E83 |
| 0000307120 | FED2 | 0374 | 0FE9 | 8E00 | DA06 | 267A | 3E83 | CC47 |
| 0000307140 | 7500 | E903 | 004E | 7689 | FFD4 | D876 | 76FF | 8DD6 |
| 0000307160 | D446 | 5016 | 76FF | FFE8 | FA76 | 76FF | 8DF8 | DA4E |
| 0000307200 | 5116 | 4E8D | 16F0 | 8D51 | CE4E | 5116 | 681E | 31BE |
| 0000307220 | 1568 | FF02 | 4236 | FF2B | 4036 | FF2B | 4636 | FF2B |
| 0000307240 | 4436 | 9A2B | D1FA | 0000 | C483 | 8B28 | D446 | 6AE9 |
| 0000307260 | E91A | 0005 | C68B | 62E9 | 8E1A | DC06 | 267A | 1EC4 |
| 0000307300 | 0AA4 | 8026 | 3D3F | 0374 | E5E9 | 8E00 | E806 | 267A |
| 0000307320 | 06C7 | 0C86 | 0018 | 068E | 7ADC | FF26 | A406 | 8E0A |
| 0000307340 | D806 | 267A | 3E83 | D19A | 7500 | E903 | 0045 | 7E83 |
| 0000307360 | FED2 | 0375 | 3CE9 | 1E00 | 4568 | 8D30 | DA46 | 5016 |
| 0000307400 | 468D | 16F0 | 8D50 | CE46 | 5016 | 681E | 31BE | 1B68 |
| 0000307420 | FF02 | 4236 | FF2B | 4036 | FF2B | 4636 | FF2B | 4436 |
| 0000307440 | 1E2B | 4B68 | 6830 | D27D | 8068 | 9AD2 | D283 | 0000 |
| 0000307460 | C483 | 8E26 | D806 | 267A | 3E83 | D23D | 7500 | E903 |
| 0000307500 | 0009 | 7E83 | FED2 | 0374 | 0FE9 | 8E00 | DA06 | 267A |
| 0000307520 | 3E83 | D2A9 | 7500 | E903 | 0050 | 46C7 | 07D4 | FF01 |
| 0000307540 | D876 | 76FF | 8DD6 | D446 | 5016 | 76FF | FFE8 | FA76 |
| 0000307560 | 76FF | 8DF8 | DA4E | 5116 | 4E8D | 16F0 | 8D51 | CE4E |
| 0000307600 | 5116 | 681E | 31BE | 1C68 | FF02 | 4236 | FF2B | 4036 |
| 0000307620 | FF2B | 4636 | FF2B | 4436 | 9A2B | D2F1 | 0000 | C483 |
| 0000307640 | 8B28 | D446 | 74E9 | E919 | 0006 | 07B8 | E901 | 196B |
| 0000307660 | 068E | 7ADC | C426 | A41E | 260A | 3F80 | 747E | E903 |
| 0000307700 | 00E5 | 068E | 7AE8 | C726 | 8606 | 1F0C | 8E00 | DC06 |
| 0000307720 | 267A | 06FF | 0AA4 | 068E | 7AD8 | 8326 | 913E | 00D2 |
| 0000307740 | 0375 | 45E9 | 8300 | D27E | 75FE | E903 | 003C | 681E |
| 0000307760 | 3051 | 468D | 16DA | 8D50 | F046 | 5016 | 468D | 16CE |
| 0000310000 | 1E50 | BE68 | 6831 | 0221 | 36FF | 2B42 | 36FF | 2B40 |
| 0000310020 | 36FF | 2B46 | 36FF | 2B44 | 681E | 3059 | F968 | 68D3 |
| 0000310040 | D3FC | FF9A | 00D3 | 8300 | 26C4 | 068E | 7AD8 | 8326 |
| 0000310060 | 193E | 00D3 | 0375 | 09E9 | 8300 | D27E | 74FE | E903 |
| 0000310100 | 000F | 068E | 7ADA | 8326 | 313E | 00D3 | 0375 | 50E9 |
| 0000310120 | C700 | D446 | 010A | 76FF | FFD8 | D676 | 468D | 16D4 |
| 0000310140 | FF50 | E876 | 76FF | FFFA | F876 | 4E8D | 16DA | 8D51 |
| 0000310160 | F04E | 5116 | 4E8D | 16CE | 1E51 | BE68 | 6831 | 0222 |
| 0000310200 | 36FF | 2B42 | 36FF | 2B40 | 36FF | 2B46 | 36FF | 2B44 |
| 0000310220 | 779A | 00D3 | 8300 | 28C4 | 468B | E9D4 | 187D | 06E9 |
| 0000310240 | B800 | 010A | 74E9 | 8E18 | E806 | 267A | 06C7 | 0C86 |
| 0000310260 | 0000 | 068E | 7AD8 | 8326 | B93E | 00D3 | 0375 | 09E9 |
| 0000310300 | 8300 | D27E | 74FE | E903 | 000F | 068E | 7ADA | 8326 |
| 0000310320 | 253E | 00D4 | 0375 | 4EE9 | 8900 | D476 | 76FF | FFD8 |
| 0000310340 | D676 | 468D | 16D4 | FF50 | E876 | 76FF | FFFA | F876 |
| 0000310360 | 4E8D | 16DA | 8D51 | F04E | 5116 | 4E8D | 16CE | 1E51 |
| 0000310400 | BE68 | 6831 | 0225 | 36FF | 2B42 | 36FF | 2B40 | 36FF |
| 0000310420 | 2B46 | 36FF | 2B44 | 6D9A | 00D4 | 8300 | 28C4 | 468B |
| 0000310440 | E9D4 | 17F7 | 05E9 | 8B00 | E9C6 | 17EF | 068E | 7ADC |
| 0000310460 | C426 | A41E | 260A | 3F80 | 743D | E903 | 00E5 | 068E |
| 0000310500 | 7AE8 | C726 | 8606 | 1B0C | 8E00 | DC06 | 267A | 06FF |
| 0000310520 | 0AA4 | 068E | 7AD8 | 8326 | 0D3E | 00D4 | 0375 | 45E9 |
| 0000310540 | 8300 | D27E | 75FE | E903 | 003C | 681E | 305F | 468D |
| 0000310560 | 16DA | 8D50 | F046 | 5016 | 468D | 16CE | 1E50 | BE68 |
| 0000310600 | 6831 | 022B | 36FF | 2B42 | 36FF | 2B40 | 36FF | 2B46 |
| 0000310620 | 36FF | 2B44 | 681E | 3065 | 9768 | 68CD | CD9A | 9D9A |
| 0000310640 | 00CD | 8300 | 26C4 | 068E | 7AD8 | 8326 | 573E | 00CD |
| 0000310660 | 0375 | 09E9 | 8300 | D27E | 74FE | E903 | 000F | 068E |
| 0000310700 | 7ADA | 8326 | C33E | 00CD | 0375 | 50E9 | C700 | D446 |
| 0000310720 | 0107 | 76FF | FFD8 | D676 | 468D | 16D4 | FF50 | E876 |
| 0000310740 | 76FF | FFFA | F876 | 4E8D | 16DA | 8D51 | F04E | 5116 |

THU MAR 14 17:52:34 1991 TSLINT.DLL PAGE 110, LINE 6432

| | | | | | | | | |
|---|---|---|---|---|---|---|---|---|
| 0000310760 | 4E8D | 16CE | 1E51 | BE68 | 6831 | 022C | 36FF | 2B42 |
| 0000311000 | 36FF | 2B40 | 36FF | 2B46 | 36FF | 2B44 | 0B9A | 00CE |
| 0000311020 | 8300 | 28C4 | 468B | E9D4 | 1701 | 06E9 | B800 | 0107 |
| 0000311040 | F8E9 | 8E16 | E806 | 267A | 06C7 | 0C86 | 0019 | C68B |
| 0000311060 | E8E9 | 8E16 | DC06 | 267A | 1EC4 | 0AA4 | 8026 | 3D3F |
| 0000311100 | 0374 | E5E9 | 8E00 | E806 | 267A | 06C7 | DC86 | 0017 |
| 0000311120 | 068E | 7ADC | FF26 | A406 | 8E0A | D806 | 267A | 3E83 |
| 0000311140 | D514 | 7500 | E903 | 0045 | 7E83 | FED2 | 0375 | 3CE9 |
| 0000311160 | 1E00 | 6B68 | 8D30 | DA46 | 5016 | 468D | 16F0 | 8D50 |
| 0000311200 | CE46 | 5016 | 681E | 31BE | 3568 | FF02 | 4236 | FF2B |
| 0000311220 | 4036 | FF2B | 4636 | FF2B | 4436 | 1E2B | 7168 | 6830 |
| 0000311240 | D5DC | DF68 | 9AD5 | D5E2 | 0000 | C483 | 8E26 | D806 |
| 0000311260 | 267A | 3E83 | D59C | 7500 | E903 | 0009 | 7E83 | FED2 |
| 0000311300 | 0374 | 0FE9 | 8E00 | DA06 | 267A | 3E83 | D608 | 7500 |
| 0000311320 | E903 | 0050 | 46C7 | 07D4 | FF01 | D876 | 76FF | 8DD6 |
| 0000311340 | D446 | 5016 | 76FF | FFE8 | FA76 | 76FF | 8DF8 | DA4E |
| 0000311360 | 5116 | 4E8D | 16F0 | 8D51 | CE4E | 5116 | 681E | 31BE |
| 0000311400 | 3668 | FF02 | 4236 | FF2B | 4036 | FF2B | 4636 | FF2B |
| 0000311420 | 4436 | 9A2B | D650 | 0000 | C483 | 8B28 | D446 | FAE9 |
| 0000311440 | E915 | 0006 | 07B8 | E901 | 15F1 | 068E | 7AE8 | C726 |
| 0000311460 | 8606 | 0F0C | 8E00 | D806 | 267A | 3E83 | D5F0 | 7500 |
| 0000311500 | E903 | 0045 | 7E83 | FED2 | 0375 | 3CE9 | 1E00 | 7768 |
| 0000311520 | 8D30 | DA46 | 5016 | 468D | 16F0 | 8D50 | CE46 | 5016 |
| 0000311540 | 681E | 31BE | 3968 | FF02 | 4236 | FF2B | 4036 | FF2B |
| 0000311560 | 4636 | FF2B | 4436 | 1E2B | 8068 | 6830 | D6D3 | D668 |
| 0000311600 | 9AD6 | D6D9 | 0000 | C483 | 8E26 | D806 | 267A | 3E83 |
| 0000311620 | D693 | 7500 | E903 | 0009 | 7E83 | FED2 | 0374 | 0FE9 |
| 0000311640 | 8E00 | DA06 | 267A | 3E83 | D6FF | 7500 | E903 | 0050 |
| 0000311660 | 46C7 | 09D4 | FF01 | D876 | 76FF | 8DD6 | D446 | 5016 |
| 0000311700 | 76FF | FFE8 | FA76 | 76FF | 8DF8 | DA4E | 5116 | 4E8D |
| 0000311720 | 16F0 | 8D51 | CE4E | 5116 | 681E | 31BE | 3A68 | FF02 |
| 0000311740 | 4236 | FF2B | 4036 | FF2B | 4636 | FF2B | 4436 | 9A2B |
| 0000311760 | D747 | 0000 | C483 | 8B28 | D446 | 1EE9 | E915 | 0006 |
| 0000312000 | 09B8 | E901 | 1515 | 068E | 7ADC | C426 | A41E | 260A |
| 0000312020 | 3F80 | 743D | E903 | 00E8 | 068E | 7AE8 | C726 | 8606 |
| 0000312040 | 1C0C | 8E00 | DC06 | 267A | 06FF | 0AA4 | 068E | 7AD8 |
| 0000312060 | 8326 | E73E | 00D6 | 0375 | 45E9 | 8300 | D27E | 75FE |
| 0000312100 | E903 | 003C | 681E | 3086 | 468D | 16DA | 8D50 | F046 |
| 0000312120 | 5016 | 468D | 16CE | 1E50 | BE68 | 6831 | 0240 | 36FF |
| 0000312140 | 2B42 | 36FF | 2B40 | 36FF | 2B46 | 36FF | 2B44 | 681E |
| 0000312160 | 308C | 8668 | 68D1 | D189 | 8C9A | 00D1 | 8300 | 26C4 |
| 0000312200 | 068E | 7AD8 | 8326 | 463E | 00D1 | 0375 | 09E9 | 8300 |
| 0000312220 | D27E | 74FE | E903 | 000F | 068E | 7ADA | 8326 | B23E |
| 0000312240 | 00D1 | 0375 | 50E9 | C700 | D446 | 0107 | 76FF | FFD8 |
| 0000312260 | D676 | 468D | 16D4 | FF50 | E876 | 76FF | FFFA | F876 |
| 0000312300 | 4E8D | 16DA | 8D51 | F04E | 5116 | 4E8D | 16CE | 1E51 |
| 0000312320 | BE68 | 6831 | 0241 | 36FF | 2B42 | 36FF | 2B40 | 36FF |
| 0000312340 | 2B46 | 36FF | 2B44 | 049A | 00D1 | 8300 | 28C4 | 468B |
| 0000312360 | E9D4 | 1427 | 06E9 | B800 | 0107 | 1EE9 | E914 | 00F7 |
| 0000312400 | 068E | 7ADC | C426 | A41E | 260A | 3F80 | 743E | E903 |
| 0000312420 | 00E5 | 068E | 7AE8 | C726 | 8606 | 390C | 8E00 | DC06 |
| 0000312440 | 267A | 06FF | 0AA4 | 068E | 7AD8 | 8326 | E13E | 00D7 |
| 0000312460 | 0375 | 45E9 | 8300 | D27E | 75FE | E903 | 003C | 681E |
| 0000312500 | 3092 | 468D | 16DA | 8D50 | F046 | 5016 | 468D | 16CE |
| 0000312520 | 1E50 | BE68 | 6831 | 0245 | 36FF | 2B42 | 36FF | 2B40 |
| 0000312540 | 36FF | 2B46 | 36FF | 2B44 | 681E | 309C | 2E68 | 68D9 |
| 0000312560 | D931 | 349A | 00D9 | 8300 | 26C4 | 068E | 7AD8 | 8326 |
| 0000312600 | 693E | 00D8 | 0375 | 09E9 | 8300 | D27E | 74FE | E903 |
| 0000312620 | 000F | 068E | 7ADA | 8326 | 813E | 00D8 | 0375 | 50E9 |

THU MAR 14 17:52:34 1991 TSLINT.DLL PAGE 111, LINE 6491

| | | | | | | | | |
|---|---|---|---|---|---|---|---|---|
| 0000312640 | C700 | D446 | 0108 | 76FF | FFD8 | D676 | 468D | 16D4 |
| 0000312660 | FF50 | E876 | 76FF | FFFA | F876 | 4E8D | 16DA | 8D51 |
| 0000312700 | F04E | 5116 | 4E8D | 16CE | 1E51 | BE68 | 6831 | 0246 |
| 0000312720 | 36FF | 2B42 | 36FF | 2B40 | 36FF | 2B46 | 36FF | 2B44 |
| 0000312740 | C79A | 00D8 | 8300 | 28C4 | 468B | E9D4 | 132D | 06E9 |
| 0000312760 | B800 | 0108 | 24E9 | 8E13 | E806 | 267A | 06C7 | 0C86 |
| 0000313000 | 001A | 068E | 7AD8 | 8326 | EE3E | 00D8 | 0375 | 09E9 |
| 0000313020 | 8300 | D27E | 74FE | E903 | 000F | 068E | 7ADA | 8326 |
| 0000313040 | 5A3E | 00D9 | 0375 | 4EE9 | 8900 | D476 | 76FF | FFD8 |
| 0000313060 | D676 | 468D | 16D4 | FF50 | E876 | 76FF | FFFA | F876 |
| 0000313100 | 4E8D | 16DA | 8D51 | F04E | 5116 | 4E8D | 16CE | 1E51 |
| 0000313120 | BE68 | 6831 | 0249 | 36FF | 2B42 | 36FF | 2B40 | 36FF |
| 0000313140 | 2B46 | 36FF | 2B44 | A29A | 00D9 | 8300 | 28C4 | 468B |
| 0000313160 | E9D4 | 12A7 | 05E9 | 8B00 | E9C6 | 129F | 068E | 7AE8 |
| 0000313200 | C726 | 8606 | 1E0C | 8E00 | D806 | 267A | 3E83 | D942 |
| 0000313220 | 7500 | E903 | 0045 | 7E83 | FED2 | 0375 | 3CE9 | 1E00 |
| 0000313240 | A268 | 8D30 | DA46 | 5016 | 468D | 16F0 | 8D50 | CE46 |
| 0000313260 | 5016 | 681E | 31BE | 4D68 | FF02 | 4236 | FF2B | 4036 |
| 0000313300 | FF2B | 4636 | FF2B | 4436 | 1E2B | AA68 | 6830 | DAF7 |
| 0000313320 | FA68 | 9ADA | DAFD | 0000 | C483 | 8E26 | D806 | 267A |
| 0000313340 | 3E83 | D9BF | 7500 | E903 | 0009 | 7E83 | FED2 | 0374 |
| 0000313360 | 0FE9 | 8E00 | DA06 | 267A | 3E83 | D9D7 | 7500 | E903 |
| 0000313400 | 0050 | 46C7 | 0AD4 | FF01 | D876 | 76FF | 8DD6 | D446 |
| 0000313420 | 5016 | 76FF | FFE8 | FA76 | 76FF | 8DF8 | DA4E | 5116 |
| 0000313440 | 4E8D | 16F0 | 8D51 | CE4E | 5116 | 681E | 31BE | 4E68 |
| 0000313460 | FF02 | 4236 | FF2B | 4036 | FF2B | 4636 | FF2B | 4436 |
| 0000313500 | 9A2B | DA1D | 0000 | C483 | 8B28 | D446 | CCE9 | E911 |
| 0000313520 | 0006 | 0AB8 | E901 | 11C3 | 068E | 7AD8 | 8326 | B73E |
| 0000313540 | 00DA | 0375 | 09E9 | 8300 | D27E | 74FE | E903 | 000F |
| 0000313560 | 068E | 7ADA | 8326 | 233E | 00DB | 0375 | 4EE9 | 8900 |
| 0000313600 | D476 | 76FF | FFD8 | D676 | 468D | 16D4 | FF50 | E876 |
| 0000313620 | 76FF | FFFA | F876 | 4E8D | 16DA | 8D51 | F04E | 5116 |
| 0000313640 | 4E8D | 16CE | 1E51 | BE68 | 6831 | 0251 | 36FF | 2B42 |
| 0000313660 | 36FF | 2B40 | 36FF | 2B46 | 36FF | 2B44 | 749A | 00D5 |
| 0000313700 | 8300 | 28C4 | 468B | E9D4 | 1151 | 05E9 | 8B00 | E9C6 |
| 0000313720 | 1149 | 068E | 7ADC | C426 | A41E | 260A | 3F80 | 7500 |
| 0000313740 | E903 | 015E | 068E | 7ADC | A126 | 0AA4 | 8B26 | A616 |
| 0000313760 | 260A | 06FF | 0AA4 | D88B | C28E | 8A26 | 9807 | 23E9 |
| 0000314000 | 8E01 | DC06 | 267A | A4A1 | 260A | 168B | 0AA6 | FF26 |
| 0000314020 | A406 | 8B0A | 8ED8 | 26C2 | 3F80 | 7500 | E903 | 0003 |
| 0000314040 | 1CE9 | 1E01 | B068 | 9A30 | AD40 | C3E1 | C483 | B804 |
| 0000314060 | 0104 | E6E9 | 8E10 | EE06 | 267A | 34A1 | 2600 | 168B |
| 0000314100 | 0036 | 8E40 | E806 | 267A | 86A3 | 260C | 1689 | 0C88 |
| 0000314120 | 068E | 7AD8 | 8326 | 0B3E | 00DB | 0375 | 45E9 | 8300 |
| 0000314140 | D27E | 75FE | E903 | 003C | 681E | 30C4 | 468D | 16DA |
| 0000314160 | 8D50 | F046 | 5016 | 468D | 16CE | 1E50 | BE68 | 6831 |
| 0000314200 | 0260 | 36FF | 2B42 | 36FF | 2B40 | 36FF | 2B46 | 36FF |
| 0000314220 | 2B44 | 681E | 30CB | 0068 | 68D5 | D503 | 069A | 00D5 |
| 0000314240 | 8300 | 26C4 | 068E | 7AD8 | 8326 | C03E | 00D4 | 0375 |
| 0000314260 | 09E9 | 8300 | D27E | 74FE | E903 | 000F | 068E | 7ADA |
| 0000314300 | 8326 | 2C3E | 00D5 | 0375 | 50E9 | C700 | D446 | 0103 |
| 0000314320 | 76FF | FFD8 | D676 | 468D | 16D4 | FF50 | E876 | 76FF |
| 0000314340 | FFFA | F876 | 4E8D | 16DA | 8D51 | F04E | 5116 | 4E8D |
| 0000314360 | 16CE | 1E51 | BE68 | 6831 | 0261 | 36FF | 2B42 | 36FF |
| 0000314400 | 2B40 | 36FF | 2B46 | 36FF | 2B44 | 899A | 00DC | 8300 |
| 0000314420 | 28C4 | 468B | E9D4 | 1003 | 06E9 | B800 | 0103 | FAE9 |
| 0000314440 | E90F | 001B | 0A2D | 7500 | E903 | FEF7 | 182D | 7500 |
| 0000314460 | E903 | FF01 | 3A2D | 7500 | E903 | FEC5 | 00E9 | E900 |
| 0000314500 | FE90 | 04B8 | E901 | 0FD3 | 068E | 7ADC | C426 | A41E |

THU MAR 14 17:52:34 1991 TSLINT.DLL PAGE 112, LINE 6550

| | | | | | | | | |
|---|---|---|---|---|---|---|---|---|
| 0000314520 | 260A | 3F80 | 743D | E903 | 00E5 | 068E | 7AE8 | C726 |
| 0000314540 | 8606 | 140C | 8E00 | DC06 | 267A | 06FF | 0AA4 | 068E |
| 0000314560 | 7AD8 | 8326 | 293E | 00DC | 0375 | 45E9 | 8300 | D27E |
| 0000314600 | 75FE | E903 | 003C | 681E | 30D1 | 468D | 16DA | 8D50 |
| 0000314620 | F046 | 5016 | 468D | 16CE | 1E50 | BE68 | 6831 | 026A |
| 0000314640 | 36FF | 2B42 | 36FF | 2B40 | 36FF | 2B46 | 36FF | 2B44 |
| 0000314660 | 681E | 30DA | 0C68 | 68DD | DD0F | 129A | 00DD | 8300 |
| 0000314700 | 26C4 | 068E | 7AD8 | 8326 | CC3E | 00DC | 0375 | 09E9 |
| 0000314720 | 8300 | D27E | 74FE | E903 | 000F | 068E | 7ADA | 8326 |
| 0000314740 | 383E | 00DD | 0375 | 50E9 | C700 | D446 | 0109 | 76FF |
| 0000314760 | FFD8 | D676 | 468D | 16D4 | FF50 | E876 | 76FF | FFFA |
| 0000315000 | F876 | 4E8D | 16DA | 8D51 | F04E | 5116 | 4E8D | 16CE |
| 0000315020 | 1E51 | BE68 | 6831 | 026B | 36FF | 2B42 | 36FF | 2B40 |
| 0000315040 | 36FF | 2B46 | 36FF | 2B44 | 809A | 00DD | 8300 | 28C4 |
| 0000315060 | 468B | E9D4 | 0EE5 | 06E9 | B800 | 0109 | DCE9 | 8E0E |
| 0000315100 | DC06 | 267A | 1EC4 | 0AA4 | 8026 | 2D3F | 0374 | E5E9 |
| 0000315120 | 8E00 | E806 | 267A | 06C7 | 0C86 | 0000 | 068E | 7ADC |
| 0000315140 | FF26 | A406 | 8E0A | D806 | 267A | 3E83 | DD20 | 7500 |
| 0000315160 | E903 | 0045 | 7E83 | FED2 | 0375 | 3CE9 | 1E00 | E068 |
| 0000315200 | 8D30 | DA46 | 5016 | 468D | 16F0 | 8D50 | CE46 | 5016 |
| 0000315220 | 681E | 31BE | 7068 | FF02 | 4236 | FF2B | 4036 | FF2B |
| 0000315240 | 4636 | FF2B | 4436 | 1E2B | EA68 | 6830 | D7CD | D068 |
| 0000315260 | 9AD7 | D7D3 | 0000 | C483 | 8E26 | D806 | 267A | 3E83 |
| 0000315300 | DE08 | 7500 | E903 | 0009 | 7E83 | FED2 | 0374 | 0FE9 |
| 0000315320 | 8E00 | DAD6 | 267A | 3E83 | DE20 | 7500 | E903 | 0050 |
| 0000315340 | 46C7 | 27D4 | FF01 | D876 | 76FF | 8DD6 | D446 | 5016 |
| 0000315360 | 76FF | FFE8 | FA76 | 76FF | 8DF8 | DA4E | 5116 | 4E8D |
| 0000315400 | 16F0 | 8D51 | CE4E | 5116 | 681E | 31BE | 7168 | FF02 |
| 0000315420 | 4236 | FF2B | 4036 | FF2B | 4636 | FF2B | 4436 | 9A2B |
| 0000315440 | DE66 | 0000 | C483 | 8B28 | D446 | EEE9 | E90D | 0006 |
| 0000315460 | 27B8 | E901 | 0DE5 | 068E | 7ADC | C426 | A41E | 260A |
| 0000315500 | 078A | 8B98 | F6D8 | 4F87 | 0475 | 0374 | 12E9 | 8E00 |
| 0000315520 | DC06 | 267A | 1EC4 | 0AA4 | 8026 | 2E3F | 0374 | 35E9 |
| 0000315540 | 8E00 | EA06 | 267A | 8EA1 | 400C | 068E | 7ADC | 3B26 |
| 0000315560 | A406 | 720A | E903 | 00A3 | C426 | A41E | 260A | 478A |
| 0000315600 | 98FE | 1E50 | F068 | 9A30 | 6466 | C35D | C483 | 0B06 |
| 0000315620 | 74D0 | E903 | 0085 | 068E | 7AE8 | C726 | 8606 | 000C |
| 0000315640 | 8E00 | D806 | 267A | 3E83 | D78D | 7500 | E903 | 0009 |
| 0000315660 | 7E83 | FED2 | 0374 | 0FE9 | 8E00 | DA06 | 267A | 3E83 |
| 0000315700 | D7F9 | 7500 | E903 | 004E | 7689 | FFD4 | D876 | 76FF |
| 0000315720 | 8DD6 | D446 | 5016 | 76FF | FFE8 | FA76 | 76FF | 8DF8 |
| 0000315740 | DA4E | 5116 | 4E8D | 16F0 | 8D51 | CE4E | 5116 | 681E |
| 0000315760 | 31BE | 8168 | FF02 | 4236 | FF2B | 4036 | FF2B | 4636 |
| 0000316000 | FF2B | 4436 | 9A2B | D841 | 0000 | C483 | 8B28 | D446 |
| 0000316020 | 08E9 | E90D | 0005 | C68B | 00E9 | 830D | 2DFE | 0374 |
| 0000316040 | 06E9 | BF00 | 0001 | 03E9 | BF00 | 0000 | 01E9 | 4700 |
| 0000316060 | 068E | 7AEE | C426 | 341E | 2600 | 018A | 8B98 | 83F0 |
| 0000316100 | 00FE | 0375 | 8CE9 | 8B00 | E9C6 | 0056 | 7E83 | 00F4 |
| 0000316120 | 0375 | 03E9 | E900 | 007B | 46FF | E9F4 | 0072 | BE83 |
| 0000316140 | FECC | 7500 | E903 | 0003 | 68E9 | FF00 | CC86 | 8EFE |
| 0000316160 | EE06 | 267A | 1EC4 | 0034 | 8026 | 0179 | 752D | E903 |
| 0000316200 | 0013 | 068E | 7AEE | C426 | 341E | 2600 | 7980 | 2B01 |
| 0000316220 | 0374 | 01E9 | 4700 | 37E9 | E900 | 0034 | 34E9 | E900 |
| 0000316240 | 002E | 393D | 7E00 | E903 | 0013 | 303D | 7C00 | E903 |
| 0000316260 | FFE7 | 2E2D | 7500 | E903 | FF92 | DFE9 | 2DFF | 0045 |
| 0000316300 | 0375 | 99E9 | 2DFF | 0020 | 0375 | 91E9 | E9FF | FFCC |
| 0000316320 | 5CE9 | 8EFF | EE06 | 267A | 34A1 | 2600 | 168B | 0036 |
| 0000316340 | C703 | 068E | 7ADC | A326 | 0AA4 | 8926 | A616 | 8E0A |
| 0000316360 | EE06 | 267A | 36FF | 0036 | FF26 | 3436 | 8D00 | C086 |

THU MAR 14 17:52:34 1991 TSLINT.DLL PAGE 113, LINE 6609

| | | | | | | | | |
|---|---|---|---|---|---|---|---|---|
| 0000316400 | 50FE | 969A | EA51 | 8EDD | E806 | 567A | 0657 | BF1E |
| 0000316420 | 0C86 | F08B | 1F16 | A5A5 | A5A5 | 071F | 5E5F | 068E |
| 0000316440 | 7AD8 | 8326 | F13E | 00DF | 0375 | 5DE9 | 8300 | D27E |
| 0000316460 | 75FE | E903 | 0054 | 068E | 7AE8 | FF26 | 8C36 | 260C |
| 0000316500 | 36FF | 0C8A | FF26 | 8836 | 260C | 36FF | 0C86 | 681E |
| 0000316520 | 30F5 | 468D | 16DA | 8D50 | F046 | 5016 | 468D | 16CE |
| 0000316540 | 1E50 | BE68 | 6831 | 02B7 | 36FF | 2B42 | 36FF | 2B40 |
| 0000316560 | 36FF | 2B46 | 36FF | 2B44 | 681E | 30FF | 3A68 | 68E1 |
| 0000316600 | E13D | 409A | 00E1 | 8300 | 2EC4 | 068E | 7AD8 | 8326 |
| 0000316620 | FA3E | 00E0 | 0375 | 09E9 | 8300 | D27E | 74FE | E903 |
| 0000316640 | 000F | 068E | 7ADA | 8326 | 663E | 00E1 | 0375 | 50E9 |
| 0000316660 | C700 | D446 | 0106 | 76FF | FFD8 | D676 | 468D | 16D4 |
| 0000316700 | FF50 | E876 | 76FF | FFFA | F876 | 4E8D | 16DA | 8D51 |
| 0000316720 | F04E | 5116 | 4E8D | 16CE | 1E51 | BE68 | 6831 | 02B8 |
| 0000316740 | 36FF | 2B42 | 36FF | 2B40 | 36FF | 2B46 | 36FF | 2B44 |
| 0000316760 | AE9A | 00E1 | 8300 | 28C4 | 468B | E9D4 | 0B1D | 06E9 |
| 0000317000 | B800 | 0106 | 14E9 | 8E0B | DC06 | 267A | 1EC4 | 0AA4 |
| 0000317020 | 8026 | 263F | 0374 | 4BE9 | 8E01 | E806 | 267A | 06C7 |
| 0000317040 | 0C86 | 0015 | 068E | 7ADC | FF26 | A406 | 260A | 1EC4 |
| 0000317060 | 0AA4 | 8A26 | 9807 | F08B | FE83 | 7500 | E903 | 0053 |
| 0000317100 | FE83 | 7423 | E903 | 0027 | 068E | 7ADC | FF26 | A406 |
| 0000317120 | 260A | 1EC4 | 0AA4 | 8A26 | 9807 | F08B | FE83 | 750A |
| 0000317140 | E903 | 000B | FE83 | 7500 | E903 | 0003 | D9E9 | 83FF |
| 0000317160 | 0AFE | 0374 | 0CE9 | 8E00 | E206 | 267A | 06FF | 3844 |
| 0000317200 | 0DE9 | F600 | 4F84 | 0875 | 0374 | 03E9 | E900 | 0003 |
| 0000317220 | 91E9 | 8EFF | D806 | 267A | 3E83 | E14E | 7500 | E903 |
| 0000317240 | 0045 | 7E83 | FED2 | 0375 | 3CE9 | 1E00 | 0568 | 8D31 |
| 0000317260 | DA46 | 5016 | 468D | 16F0 | 8D50 | CE46 | 5016 | 681E |
| 0000317300 | 31BE | C768 | FF02 | 4236 | FF2B | 4036 | FF2B | 4636 |
| 0000317320 | FF2B | 4436 | 1E2B | 0D68 | 6831 | E20B | 0E68 | 9AE2 |
| 0000317340 | E211 | 0000 | C483 | 8E26 | D806 | 267A | 3E83 | E1CB |
| 0000317360 | 7500 | E903 | 0009 | 7E83 | FED2 | 0374 | 0FE9 | 8E00 |
| 0000317400 | DA06 | 267A | 3E83 | E237 | 7500 | E903 | 0050 | 46C7 |
| 0000317420 | 24D4 | FF01 | D876 | 76FF | 8DD6 | D446 | 5016 | 76FF |
| 0000317440 | FFE8 | FA76 | 76FF | 8DF8 | DA4E | 51:6 | 4E8D | 16FD |
| 0000317460 | 8D51 | CE4E | 5116 | 681E | 31BE | C868 | FF02 | 4236 |
| 0000317500 | FF2B | 4036 | FF2B | 4636 | FF2B | 4436 | 9A2B | E27F |
| 0000317520 | 0000 | C483 | 8B28 | D446 | C0E9 | E909 | 0006 | 24B8 |
| 0000317540 | E901 | 09B7 | 068E | 7AD8 | 8326 | 1F3E | 00E2 | 0375 |
| 0000317560 | 45E9 | 8300 | D27E | 75FE | E903 | 003C | 681E | 3113 |
| 0000317600 | 468D | 16DA | 8D50 | F046 | 5016 | 468D | 16CE | 1E50 |
| 0000317620 | BE68 | 6831 | 02CA | 36FF | 2B42 | 36FF | 2B40 | 36FF |
| 0000317640 | 2B46 | 36FF | 2B44 | 681E | 3119 | 1568 | 68DC | DC18 |
| 0000317660 | 1B9A | 00DC | 8300 | 26C4 | 068E | 7AD8 | 8326 | D53E |
| 0000317700 | 00DB | 0375 | 09E9 | 8300 | D27E | 74FE | E903 | 000F |
| 0000317720 | 068E | 7ADA | 8326 | 413E | 00DC | 0375 | 50E9 | C700 |
| 0000317740 | D446 | 0104 | 76FF | FFD8 | D676 | 468D | 16D4 | FF50 |
| 0000317760 | E876 | 76FF | FFFA | F876 | 4E8D | 16DA | 8D51 | F04E |
| 0000320000 | 5116 | 4E8D | 16CE | 1E51 | BE68 | 6831 | 02CB | 36FF |
| 0000320020 | 2B42 | 36FF | 2B40 | 36FF | 2B46 | 36FF | 2B44 | 6B9A |
| 0000320040 | 00DB | 8300 | 28C4 | 468B | E9D4 | 08EF | 06E9 | B800 |
| 0000320060 | 0104 | E6E9 | 8E08 | DC06 | 267A | 1EC4 | 0AA4 | 8026 |
| 0000320100 | 7C3F | 0374 | 4BE9 | 8E01 | E806 | 267A | 06C7 | 0C86 |
| 0000320120 | 0016 | 068E | 7ADC | FF26 | A406 | 260A | 1EC4 | 0AA4 |
| 0000320140 | 8A26 | 9807 | F08B | FE83 | 7500 | E903 | 0053 | FE83 |
| 0000320160 | 7423 | E903 | 0027 | 068E | 7ADC | FF26 | A406 | 260A |
| 0000320200 | 1EC4 | 0AA4 | 8A26 | 9807 | F08B | FE83 | 750A | E903 |
| 0000320220 | 000B | FE83 | 7500 | E903 | 0003 | D9E9 | 83FF | 0AFE |
| 0000320240 | 0374 | 0CE9 | 8E00 | E206 | 267A | 06FF | 3844 | 0DE9 |

THU MAR 14 17:52:34 1991 TSLINT.DLL PAGE 114, LINE 6668

| | | | | | | | | |
|---|---|---|---|---|---|---|---|---|
| 0000320260 | F600 | 4F84 | 0875 | 0374 | 03E9 | E900 | 0003 | 91E9 |
| 0000320300 | 8EFF | D806 | 267A | 3E83 | E37C | 7500 | E903 | 0045 |
| 0000320320 | 7E83 | FED2 | 0375 | 3CE9 | 1E00 | 1F68 | 8D31 | DA46 |
| 0000320340 | 5016 | 468D | 16F0 | 8D50 | CE46 | 5016 | 681E | 31BE |
| 0000320360 | DA68 | FF02 | 4236 | FF2B | 4036 | FF2B | 4636 | FF2B |
| 0000320400 | 4436 | 1E2B | 2668 | 6831 | E5D0 | D368 | 9AE5 | E5D6 |
| 0000320420 | 0000 | C483 | 8E26 | D806 | 267A | 3E83 | E404 | 7500 |
| 0000320440 | E903 | 0009 | 7E83 | FED2 | 0374 | 0FE9 | 8E00 | DA06 |
| 0000320460 | 267A | 3E83 | E41C | 7500 | E903 | 0050 | 46C7 | 25D4 |
| 0000320500 | FF01 | D876 | 76FF | 8DD6 | D446 | 5016 | 76FF | FFE8 |
| 0000320520 | FA76 | 76FF | 8DF8 | DA4E | 5116 | 4E8D | 16F0 | 8D51 |
| 0000320540 | CE4E | 5116 | 681E | 31BE | DB68 | FF02 | 4236 | FF2B |
| 0000320560 | 4036 | FF2B | 4636 | FF2B | 4436 | 9A2B | E462 | 0000 |
| 0000320600 | C483 | 8B28 | D446 | 92E9 | E907 | 0006 | 25B8 | E901 |
| 0000320620 | 0789 | 068E | 7AE8 | C726 | 8606 | 000C | 8E00 | D806 |
| 0000320640 | 267A | 3E83 | E590 | 7500 | E903 | 0009 | 7E83 | FED2 |
| 0000320660 | 0374 | 0FE9 | 8E00 | DA06 | 267A | 3E83 | E5FC | 7500 |
| 0000320700 | E903 | 004E | 7689 | FFD4 | D876 | 76FF | 8DD6 | D446 |
| 0000320720 | 5016 | 76FF | FFE8 | FA76 | 76FF | 8DF8 | DA4E | 5116 |
| 0000320740 | 4E8D | 16F0 | 8D51 | CE4E | 5116 | 681E | 31BE | DE68 |
| 0000320760 | FF02 | 4236 | FF2B | 4036 | FF2B | 4636 | FF2B | 4436 |
| 0000321000 | 9A2B | E644 | 0000 | C483 | 8B28 | D446 | 0CE9 | E907 |
| 0000321020 | 0005 | C68B | 04E9 | E907 | 00F0 | 2F3D | 7500 | E903 |
| 0000321040 | E5B0 | 037E | 68E9 | 3D00 | 0025 | 0375 | 1FE9 | 7EE7 |
| 0000321060 | E903 | 0036 | 213D | 7500 | E903 | EC7D | 037E | 12E9 |
| 0000321100 | 0B00 | 75CD | E903 | E079 | 0A2D | 7500 | E903 | E0EE |
| 0000321120 | B7E9 | 2D00 | 0022 | 0375 | 77E9 | 48F5 | 0375 | E9E9 |
| 0000321140 | 48E0 | 0375 | 43E9 | E9E1 | 00A0 | 262D | 3D00 | 0008 |
| 0000321160 | 0376 | 95E9 | D100 | 93E0 | FF2E | DDA7 | 67E4 | 6AE0 |
| 0000321200 | 0AE5 | 0AC6 | 14C6 | A6C7 | 8FCE | A8C6 | 7BDB | 3DDE |
| 0000321220 | 005B | 0375 | 13E9 | 7EE1 | E903 | 0033 | 302D | 3D00 |
| 0000321240 | 000F | 0376 | 63E9 | D100 | 93E0 | FF2E | 0FA7 | 7BE5 |
| 0000321260 | 7BDE | 7BDE | 7BDE | 7BDE | 7BDE | 7BDE | 7BDE | 7BDE |
| 0000321300 | 7BDE | 0ADE | 0AC6 | 8CC6 | 93D3 | 66D4 | 0AD6 | 3DC6 |
| 0000321320 | 007B | 0375 | 58E9 | 7EE1 | E903 | 0017 | 5C2D | 7500 |
| 0000321340 | E903 | E099 | 7548 | E903 | E0C0 | 7548 | E903 | E7DA |
| 0000321360 | 17E9 | 2D00 | 007C | 0375 | 3AE9 | 48FD | 0375 | 57E9 |
| 0000321400 | 48F4 | 0375 | 75E9 | E9F3 | 0000 | FE83 | 755F | E903 |
| 0000321420 | 00E8 | 84F6 | 754F | 7403 | E903 | 00DE | 1E56 | 2C68 |
| 0000321440 | 9A31 | AD40 | E692 | C483 | 8E06 | D806 | 267A | 3E83 |
| 0000321460 | E5E4 | 7500 | E903 | 0045 | 7E83 | FED2 | 0375 | 3CE9 |
| 0000321500 | 1E00 | 4D68 | 8D31 | DA46 | 5016 | 468D | 16F0 | 8D50 |
| 0000321520 | CE46 | 5016 | 681E | 31BE | E368 | FF02 | 4236 | FF2B |
| 0000321540 | 4036 | FF2B | 4636 | FF2B | 4436 | 1E2B | 5368 | 6831 |
| 0000321560 | DFDD | E068 | 9ADF | DFE3 | 0000 | C483 | 8E26 | D806 |
| 0000321600 | 267A | 3E83 | DF85 | 7500 | E903 | 0009 | 7E83 | FED2 |
| 0000321620 | 0374 | 0FE9 | 8E00 | DA06 | 267A | 3E83 | E009 | 7500 |
| 0000321640 | E903 | 0050 | 46C7 | 04D4 | FF01 | D876 | 76FF | 8DD6 |
| 0000321660 | D446 | 5016 | 76FF | FFE8 | FA76 | 76FF | 8DF8 | DA4E |
| 0000321700 | 5116 | 4E8D | 16F0 | 8D51 | CE4E | 5116 | 681E | 31BE |
| 0000321720 | E468 | FF02 | 4236 | FF2B | 4036 | FF2B | 4636 | FF2B |
| 0000321740 | 4436 | 9A2B | E051 | 0000 | C483 | 8B28 | D446 | 2AE9 |
| 0000321760 | E905 | 0006 | 04B8 | E901 | 0521 | 00BF | E900 | 0001 |
| 0000322000 | 8E47 | EE06 | 267A | 1EC4 | 0034 | 8A26 | 9801 | D88B |
| 0000322020 | 87F6 | 754F | 7407 | E903 | 0012 | 068E | 7AEE | C426 |
| 0000322040 | 341E | 2600 | 3980 | 745F | E903 | 0003 | D1E9 | 9AFF |
| 0000322060 | E352 | DA8A | 8E50 | F006 | 267A | 70A0 | 5026 | 458D |
| 0000322100 | 5001 | 879A | E4AC | 83C1 | 06C4 | 4689 | 89EA | EC56 |
| 0000322120 | D00B | 0374 | 0CE9 | 1E00 | 5968 | 9A31 | B3B6 | E6DE |

THU MAR 14 17:52:34 1991 TSLINT.DLL PAGE 115, LINE 6727

| | | | | | | | | |
|---|---|---|---|---|---|---|---|---|
| 0000322140 | C483 | 8E04 | D806 | 267A | 3E83 | E328 | 7500 | E903 |
| 0000322160 | 0061 | 7E83 | FED2 | 0375 | 58E9 | 9A00 | F7E4 | E6EB |
| 0000322200 | 5052 | 76FF | FFEC | EA76 | 1E9A | 84F9 | 83E5 | 04C4 |
| 0000322220 | FF50 | EC76 | 76FF | 1EEA | 6868 | 8D31 | DA46 | 5016 |
| 0000322240 | 468D | 16F0 | 8D50 | CE46 | 5016 | 681E | 31BE | EC68 |
| 0000322260 | FF02 | 4236 | FF2B | 4036 | FF2B | 4636 | FF2B | 4436 |
| 0000322300 | 1E2B | 7668 | 6831 | E368 | 6B68 | 9AE3 | E36E | 0000 |
| 0000322320 | C483 | 5730 | 068E | 7AEE | FF26 | 3636 | 2600 | 36FF |
| 0000322340 | 0034 | 76FF | FFEC | EA76 | 2C9A | 6551 | 83DF | 0AC4 |
| 0000322360 | 5EC4 | 26EA | 01C6 | C700 | F646 | 000D | 46C7 | 3BFC |
| 0000322400 | 8B00 | F646 | 4639 | 7DFC | E903 | 0301 | 468B | 03FC |
| 0000322420 | F646 | 2B99 | D1C2 | 89F8 | E646 | 5E8B | 8BE6 | D1C3 |
| 0000322440 | 03E3 | D1D8 | 03E3 | D1D8 | C4E3 | 4A9F | 262B | 078A |
| 0000322460 | 8E98 | EE06 | 267A | 1EC4 | 0034 | C88B | 8A26 | 9807 |
| 0000322500 | C12B | 8689 | FEC8 | BE83 | FEC8 | 7500 | E903 | 0007 |
| 0000322520 | 868B | FEC8 | 25E9 | 8B00 | E65E | C38B | E3D1 | D803 |
| 0000322540 | E3D1 | D803 | E3D1 | B7FF | 2B4C | B7FF | 2B4A | 76FF |
| 0000322560 | FFEC | EA76 | EA9A | 4B50 | 83E7 | 08C4 | 8689 | FEBE |
| 0000322600 | BE83 | FEBE | 7C00 | E903 | 000A | 468B | 48E6 | 4689 |
| 0000322620 | E9FC | 0276 | BE83 | FEBE | 7F00 | E903 | 000A | 468B |
| 0000322640 | 40E6 | 4689 | E9F6 | 0262 | 068E | 7AD8 | 8326 | CA3E |
| 0000322660 | 00E6 | 0375 | 5CE9 | 8300 | D27E | 75FE | E903 | 0053 |
| 0000322700 | 5E8B | 8BE6 | D1C3 | 03E3 | D1D8 | 03E3 | D1D8 | FFE3 |
| 0000322720 | 4CB7 | FF2B | 4AB7 | 1E2B | 7F68 | 8D31 | DA46 | 5016 |
| 0000322740 | 468D | 16F0 | 8D50 | CE46 | 5016 | 681E | 31BE | 0268 |
| 0000322760 | FF03 | 4236 | FF2B | 4036 | FF2B | 4636 | FF2B | 4436 |
| 0000323000 | 1E2B | 8B68 | 6831 | E726 | 2968 | 9AE7 | E72C | 0000 |
| 0000323020 | C483 | 8E2A | EE06 | 267A | 34A1 | 2600 | 168B | 0036 |
| 0000323040 | C703 | 068E | 7ADC | A326 | 0AA4 | 8926 | A616 | 8E0A |
| 0000323060 | D606 | 267A | 3E83 | 3742 | 7500 | E903 | 00JC | 5E8B |
| 0000323100 | 8BE6 | D1C3 | 03E3 | D1D8 | 03E3 | D1D8 | 83E3 | 52BF |
| 0000323120 | 002B | 0375 | ^3E9 | E900 | 01B3 | 5E8B | 8BE6 | D1C3 |
| 0000323140 | 03E3 | D1D8 | 03E3 | D1D8 | 81E3 | 50BF | 282B | 7401 |
| 0000323160 | E903 | 00AD | 5E8B | 8BE6 | D1C3 | 03E3 | D1D8 | 03E3 |
| 0000323200 | D1D8 | 8BE3 | 4A87 | 8B2B | 4C97 | 8E2B | F206 | 267A |
| 0000323220 | 78A3 | 2600 | 1689 | 007A | 068E | 7AD8 | 8326 | D33E |
| 0000323240 | 00E9 | 0375 | 53E9 | 8300 | D27E | 75FE | E903 | 004A |
| 0000323260 | 068E | 7AF2 | FF26 | 7A36 | 2600 | 36FF | 0078 | 681E |
| 0000323300 | 3191 | 468D | 16DA | 8D50 | F046 | 5016 | 468D | 16CE |
| 0000323320 | 1E50 | BE68 | 6831 | 0308 | 36FF | 2B42 | 36FF | 2B40 |
| 0000323340 | 36FF | 2B46 | 36FF | 2B44 | 681E | 31A0 | 6668 | 68E8 |
| 0000323360 | E869 | 6C9A | 00E8 | 8300 | 2AC4 | 5E8B | 8BE6 | D1C3 |
| 0000323400 | 03E3 | D1D8 | 03E3 | D1D8 | 8BE3 | 5487 | 8B2B | 5697 |
| 0000323420 | 8E2B | E806 | 267A | 86A3 | 260C | 1689 | 0C88 | 1BE9 |
| 0000323440 | 8B00 | E65E | C38B | E3D1 | D803 | E3D1 | D803 | E3D1 |
| 0000323460 | 878B | 2B4E | 068E | 7AE8 | A326 | 0C86 | 5E8B | 8BE6 |
| 0000323500 | D1C3 | 03E3 | D1D8 | 03E3 | D1D8 | FFE3 | 4CB7 | FF2B |
| 0000323520 | 4AB7 | 1E2B | A668 | 9A31 | 50EA | E7D7 | C483 | 3D08 |
| 0000323540 | 0000 | 0374 | 05E9 | 9A00 | ED04 | E6A5 | 068E | 7AD8 |
| 0000323560 | 8326 | 0F3E | 00E8 | 0375 | 09E9 | 8300 | D27E | 74FE |
| 0000323600 | E903 | 000F | 068E | 7ADA | 8326 | 943E | 00E3 | 0375 |
| 0000323620 | 61E9 | 8B00 | E65E | C38B | E3D1 | D803 | E3D1 | D803 |
| 0000323640 | E3D1 | 878B | 2B50 | 4689 | FFD4 | D876 | 76FF | 8DD6 |
| 0000323660 | D446 | 5016 | 76FF | FFE8 | FA76 | 76FF | 8DF8 | DA4E |
| 0000323700 | 5116 | 4E8D | 16F0 | 8D51 | CE4E | 5116 | 681E | 31BE |
| 0000323720 | 1868 | FF03 | 4236 | FF2B | 4036 | FF2B | 4636 | FF2B |
| 0000323740 | 4436 | 9A2B | E3DC | 0000 | C483 | 8B28 | D446 | 2AE9 |
| 0000323760 | E901 | 0016 | 5E8B | 8BE6 | D1C3 | 03E3 | D1D8 | 03E3 |
| 0000324000 | D1D8 | 8BE3 | 5087 | E92B | 0111 | F4E9 | 8BFC | EA46 |

THU MAR 14 17:52:34 1991 TSLINT.DLL PAGE 116, LINE 6786

| | | | | | | | | |
|---|---|---|---|---|---|---|---|---|
| 0000324020 | 568B | 8EEC | E806 | 267A | 86A3 | 260C | 1689 | 0C88 |
| 0000324040 | 068E | 7AEE | A126 | 0034 | 8B26 | 3616 | 0300 | 8EC7 |
| 0000324060 | DC06 | 267A | A4A3 | 260A | 1689 | 0AA6 | 068E | 7AD8 |
| 0000324100 | 8326 | 053E | 00EB | 0375 | 53E9 | 8300 | D27E | 75FE |
| 0000324120 | E903 | 004A | 068E | 7AE8 | FF26 | 8836 | 260C | 36FF |
| 0000324140 | 0C86 | 681E | 31AF | 468D | 16DA | 8D50 | F046 | 5016 |
| 0000324160 | 468D | 16CE | 1E50 | BE68 | 6831 | 031F | 36FF | 2B42 |
| 0000324200 | 36FF | 2B40 | 36FF | 2B46 | 36FF | 2B44 | 681E | 31B8 |
| 0000324220 | 4D68 | 68E9 | E950 | 539A | 00E9 | 8300 | 2AC4 | 068E |
| 0000324240 | 7AD8 | 8326 | FF3E | 00E8 | 0375 | 09E9 | 8300 | D27E |
| 0000324260 | 74FE | E903 | 000F | 068E | 7ADA | 8326 | EB3E | 00E9 |
| 0000324300 | 0375 | 50E9 | C700 | D446 | 0101 | 76FF | FFD8 | D676 |
| 0000324320 | 468D | 16D4 | FF50 | E876 | 76FF | FFFA | F876 | 4E8D |
| 0000324340 | 16DA | 8D51 | F04E | 5116 | 4E8D | 16CE | 1E51 | BE68 |
| 0000324360 | 6831 | 0320 | 36FF | 2B42 | 36FF | 2B40 | 36FF | 2B46 |
| 0000324400 | 36FF | 2B44 | 449A | 00EA | 8300 | 28C4 | 468B | E9D4 |
| 0000324420 | 0009 | 06E9 | B800 | 0101 | 00E9 | 5E00 | 835F | 02ED |
| 0000324440 | E58B | 5D1F | CB4D | 581E | 4590 | 8B55 | 1EEC | D88E |
| 0000324460 | EC81 | 0024 | 5657 | 46C7 | CAFA | 8C31 | FC5E | 46C7 |
| 0000324500 | 00F4 | 2B00 | 89C0 | E646 | 4689 | 8EE4 | D806 | 267A |
| 0000324520 | 3E83 | EC30 | 7500 | E903 | 001D | 36FF | 2B46 | 36FF |
| 0000324540 | 2B44 | 468D | 16DC | 9A50 | BEAB | 0000 | C483 | 3D08 |
| 0000324560 | 0000 | 0374 | 0FE9 | 8E00 | DA06 | 267A | 3E83 | EB1D |
| 0000324600 | 7500 | E903 | 003B | 681E | 31CE | 468D | 16E8 | 8D50 |
| 0000324620 | DC46 | 5016 | 468D | 16F6 | 6850 | 033B | 681E | 3200 |
| 0000324640 | 36FF | 2B42 | 36FF | 2B40 | 36FF | 2B46 | 36FF | 2B44 |
| 0000324660 | F49A | 00BE | 8300 | 1EC4 | 4689 | 89F6 | F856 | 08E9 |
| 0000324700 | 2B00 | 89C0 | F846 | 4689 | 8EF6 | D806 | 267A | 3E83 |
| 0000324720 | EC9E | 7500 | E903 | 0045 | 7E83 | FEED | 0375 | 3CE9 |
| 0000324740 | 1E00 | D268 | 8D31 | E846 | 5016 | 468D | 16F6 | 8D50 |
| 0000324760 | DC46 | 5016 | 681E | 3200 | 3C68 | FF03 | 4236 | FF2B |
| 0000325000 | 4036 | FF2B | 4636 | FF2B | 4436 | 1E2B | E368 | 6831 |
| 0000325020 | ECEC | EF68 | 9AEC | ECF2 | 0000 | C483 | 8E26 | EE06 |
| 0000325040 | 267A | 34A1 | 2600 | 168B | 0036 | 068E | 7ADC | A326 |
| 0000325060 | 0AA4 | 8926 | A616 | 8E0A | D806 | 267A | 3E83 | EAA3 |
| 0000325100 | 7500 | E903 | 0053 | 7E83 | FEE0 | 0375 | 4AE9 | 8E00 |
| 0000325120 | DC06 | 267A | 36FF | 0AA6 | FF26 | A436 | 1E0A | E968 |
| 0000325140 | 8D31 | E846 | 5016 | 468D | 16F6 | 8D50 | DC46 | 5016 |
| 0000325160 | 681E | 3200 | 3E68 | FF03 | 4236 | FF2B | 4036 | FF2B |
| 0000325200 | 4636 | FF2B | 4436 | 1E2B | F968 | 6831 | EAF1 | F468 |
| 0000325220 | 9AEA | EAF7 | 0000 | C483 | 5E2A | 835F | 02ED | E58B |
| 0000325240 | 5D1F | CB4D | 581E | 4590 | 8B55 | 1EEC | D88E | EC81 |
| 0000325260 | 0024 | 5657 | 46C7 | 0FFA | 8C32 | FC5E | 46C7 | 00F4 |
| 0000325300 | 2B00 | 89C0 | E646 | 4689 | 8EE4 | D806 | 267A | 3E83 |
| 0000325320 | EDC2 | 7500 | E903 | 001D | 36FF | 2B46 | 36FF | 2B44 |
| 0000325340 | 468D | 16DC | 9A50 | EBC8 | 0000 | C483 | 3D08 | 0000 |
| 0000325360 | 0374 | 0FE9 | 8E00 | DA06 | 267A | 3E83 | EDDA | 7500 |
| 0000325400 | E903 | 003B | 681E | 3213 | 468D | 16E8 | 8D50 | DC46 |
| 0000325420 | 5016 | 468D | 16F6 | 6850 | 035A | 681E | 3218 | 36FF |
| 0000325440 | 2B42 | 36FF | 2B40 | 36FF | 2B46 | 36FF | 2B44 | 119A |
| 0000325460 | 00EC | 8300 | 1EC4 | 4689 | 89F6 | F856 | 08E9 | 2B00 |
| 0000325500 | 89C0 | F846 | 4689 | BBF6 | 803C | 068E | 7ADC | 8926 |
| 0000325520 | A41E | 260A | 1E8C | 0AA6 | 07C6 | 8E00 | D806 | 267A |
| 0000325540 | 3E83 | EBB2 | 7500 | E903 | 0009 | 7E83 | FEE0 | 0374 |
| 0000325560 | 0FE9 | 8E00 | DA06 | 267A | 3E83 | EBDE | 7500 | E903 |
| 0000325600 | 0039 | 468D | 16E8 | 8D50 | F646 | 5016 | 468D | 16DC |
| 0000325620 | 1E50 | 1868 | 6832 | 035C | 36FF | 2B42 | 36FF | 2B40 |
| 0000325640 | 36FF | 2B46 | 36FF | 2B44 | 539A | 00B6 | 8300 | 1AC4 |
| 0000325660 | 46C7 | 00E2 | E900 | 0006 | 03E9 | E900 | 0000 | 5F5E |

THU MAR 14 17:52:34 1991 TSLINT.DLL PAGE 117, LINE 6845

| | | | | | | | | |
|---|---|---|---|---|---|---|---|---|
| 0000325700 | ED83 | 8B02 | 1FE5 | 4D5D | 1ECB | 9058 | 5545 | EC8B |
| 0000325720 | 8E1E | 81D8 | 24EC | 5700 | C756 | FA46 | 3226 | 5E8C |
| 0000325740 | C7FC | F446 | 0000 | C02B | 4689 | 89E6 | E446 | 068E |
| 0000325760 | 7AD8 | 8326 | FE3E | 00EE | 0375 | 1DE9 | FF00 | 4636 |
| 0000326000 | FF2B | 4436 | 8D2B | DC46 | 5016 | 469A | 00ED | 8300 |
| 0000326020 | 08C4 | 003D | 7400 | E903 | 000F | 068E | 7ADA | 8326 |
| 0000326040 | 163E | 00EF | 0375 | 3BE9 | 1E00 | 2A68 | 8D32 | E846 |
| 0000326060 | 5016 | 468D | 16DC | 8D50 | F646 | 5016 | 7B68 | 1E03 |
| 0000326100 | 2E68 | FF32 | 4236 | FF2B | 4036 | FF2B | 4636 | FF2B |
| 0000326120 | 4436 | 9A2B | ED8F | 0000 | C483 | 891E | F646 | 5689 |
| 0000326140 | E9F8 | 0008 | C02B | 4689 | 89F8 | F646 | 068E | 7ADC |
| 0000326160 | FF26 | A636 | 260A | 36FF | 0AA4 | FF9A | 00FF | 3D00 |
| 0000326200 | 0000 | 0375 | 73E9 | 8E00 | E206 | 267A | 36FF | 3844 |
| 0000326220 | 006A | 679A | 00EF | 8E00 | D806 | 267A | 3E83 | EF72 |
| 0000326240 | 7500 | E903 | 0009 | 7E83 | FEE0 | 0374 | 0FE9 | 8E00 |
| 0000326260 | DA06 | 267A | 3E83 | EF8A | 7500 | E903 | 0039 | 468D |
| 0000326300 | 16E8 | 8D50 | F646 | 5016 | 468D | 16DC | 1E50 | 2E68 |
| 0000326320 | 6832 | 0382 | 36FF | 2B42 | 36FF | 2B40 | 36FF | 2B46 |
| 0000326340 | 36FF | 2B44 | B99A | 00EF | 8300 | 1AC4 | 46C7 | 00E2 |
| 0000326360 | E900 | 007A | 03E9 | E900 | 0074 | 068E | 7AE2 | A126 |
| 0000326400 | 3844 | 5040 | 006A | FF9A | 00FF | 8E00 | D806 | 267A |
| 0000326420 | 3E83 | ED30 | 7500 | E903 | 0009 | 7E83 | FEE0 | 0374 |
| 0000326440 | 0FE9 | 8E00 | DA06 | 267A | 3E83 | ED5C | 7500 | E903 |
| 0000326460 | 0039 | 468D | 16E8 | 8D50 | F646 | 5016 | 468D | 16DC |
| 0000326500 | 1E50 | 2E68 | 6832 | 0389 | 36FF | 2B42 | 36FF | 2B40 |
| 0000326520 | 36FF | 2B46 | 36FF | 2B44 | 099A | 00EE | 8300 | 1AC4 |
| 0000326540 | 46C7 | 00E2 | E900 | 0006 | 03E9 | E900 | 0000 | 5F5E |
| 0000326560 | ED83 | 8B02 | 1FE5 | 4D5D | 19CB | 0300 | 4502 | 03EF |
| 0000326600 | 6A00 | 0300 | 0A02 | 03B2 | EA00 | 0200 | 7400 | 013A |
| 0000326620 | 0000 | 0500 | 5502 | 03EE | 2500 | 0200 | CA00 | 02E9 |
| 0000326640 | 0000 | 0200 | BE00 | 03E6 | 0000 | 0200 | BA00 | 04E9 |
| 0000326660 | 0000 | 0300 | 7602 | 03EC | 7900 | 0500 | 8102 | 03EE |
| 0000326700 | 3300 | 0200 | C200 | 0812 | 0000 | 0500 | 7302 | 03EC |
| 0000326720 | 4100 | 0200 | 5500 | 09C3 | 0000 | 0300 | D902 | 03BF |
| 0000326740 | 9600 | 0500 | FA00 | 0212 | FC00 | 0501 | 9B02 | 03B1 |
| 0000326760 | DC00 | 0300 | DB01 | 06EE | 1100 | 0200 | 7002 | 03EC |
| 0000327000 | 4100 | 0300 | B402 | 03EE | 4B00 | 0300 | 6B02 | 03EE |
| 0000327020 | CD00 | 0300 | 5701 | 06BF | 3D00 | 0300 | 6502 | 03EB |
| 0000327040 | 5A00 | 0500 | D802 | 03B1 | 1700 | 0500 | BE06 | 03AE |
| 0000327060 | 1700 | 0500 | D306 | 03B1 | 1700 | 0300 | F301 | 06EE |
| 0000327100 | 4C00 | 0000 | 0000 | 0000 | 0000 | 0000 | 0000 | 0000 |
| 0000327120 | 581E | 4590 | 8B55 | 1EEC | D88E | EC81 | 0026 | 5657 |
| 0000327140 | 46C7 | 4EFA | 8C32 | FC5E | 46C7 | 00F2 | 2B00 | 89C0 |
| 0000327160 | E446 | 4689 | 8EE2 | F406 | 267A | 3E83 | FFFF | 7500 |
| 0000327200 | E903 | 001D | 36FF | 325C | 36FF | 325A | 468D | 16DA |
| 0000327220 | 9A50 | FFFF | 0000 | C483 | 3D08 | 0000 | 0374 | 0FE9 |
| 0000327240 | 8E00 | F606 | 267A | 3E83 | FFFF | 7500 | E903 | 003A |
| 0000327260 | 681E | 3252 | 468D | 16E6 | 8D50 | DA46 | 5016 | 468D |
| 0000327300 | 16F6 | 6A50 | 1E5E | 5E68 | FF32 | 5836 | FF32 | 5636 |
| 0000327320 | FF32 | 5C36 | FF32 | 5A36 | 9A32 | FFFF | 0000 | C483 |
| 0000327340 | 891E | F646 | 5689 | E9F8 | 0008 | C02B | 4689 | 89F8 |
| 0000327360 | F646 | 46C7 | 00F4 | E900 | 0003 | 46FF | 83F4 | F47E |
| 0000327400 | 7C65 | E903 | 0019 | 068E | 7AF8 | 5E8B | C1F4 | 02E3 |
| 0000327420 | C02B | 8926 | C687 | 260A | 8789 | 0AC4 | DBE9 | 8EFF |
| 0000327440 | FA06 | 267A | 06C7 | 0052 | 0000 | 068E | 7AF4 | 8326 |
| 0000327460 | 2C3E | 0000 | 0375 | 09E9 | 8300 | DE7E | 74FE | E903 |
| 0000327500 | 000F | 068E | 7AF6 | 8326 | 583E | 0000 | 0375 | 38E9 |
| 0000327520 | 8D00 | E646 | 5016 | 468D | 16F6 | 8D50 | DA46 | 5016 |
| 0000327540 | 681E | 325E | 36A | 36FF | 3258 | 36FF | 3256 | 36FF |

THU MAR 14 17:52:34 1991 TSLINT.DLL PAGE 118, LINE 6904

| | | | | | | | | |
|---|---|---|---|---|---|---|---|---|
| 0000327560 | 325C | 36FF | 325A | FF9A | 00FF | 8300 | 1AC4 | 46C7 |
| 0000327600 | 00E0 | E900 | 0006 | 03E9 | E900 | 0000 | 5F5E | ED83 |
| 0000327620 | 8B02 | 1FE5 | 4D5D | 1ECB | 9058 | 5545 | EC8B | 8E1E |
| 0000327640 | 81D8 | 30EC | 5700 | C756 | FA46 | 326C | 5E8C | C7FC |
| 0000327660 | F246 | 0107 | C02B | 4689 | 89E4 | E246 | 068E | 7AF4 |
| 0000327700 | 8326 | E13E | 0000 | 0375 | 1DE9 | FF00 | 5C36 | FF32 |
| 0000327720 | 5A36 | 8D32 | D846 | 5016 | 429A | 0000 | 8300 | 08C4 |
| 0000327740 | 003D | 7400 | E903 | 000F | 068E | 7AF6 | 8326 | F93E |
| 0000327760 | 0000 | 0375 | 3AE9 | 1E0D | 7368 | 8D32 | E646 | 5016 |
| 0000330000 | 468D | 16D8 | 8D50 | F446 | 5016 | 7A6A | 681E | 32C8 |
| 0000330020 | 36FF | 3258 | 36FF | 3256 | 36FF | 325C | 36FF | 325A |
| 0000330040 | 8A9A | 0000 | 8300 | 1EC4 | 4689 | 89F4 | F656 | 08E9 |
| 0000330060 | 2B00 | 89C0 | F646 | 4689 | 8EF4 | FC06 | 267A | 70A0 |
| 0000330100 | 2A26 | 89E4 | F846 | C626 | 7006 | 0226 | 00BE | 8B00 |
| 0000330120 | 0A46 | 568B | 890C | D046 | 5689 | C4D2 | D05E | 8A26 |
| 0000330140 | 9807 | D88B | 87F6 | 754F | 7407 | E903 | 000C | 5EC4 |
| 0000330160 | 26D0 | 3F80 | 745F | E903 | 0006 | 46FF | E9D0 | FFDB |
| 0000330200 | 768B | 2BD0 | 0A76 | 4F6A | A69A | BBB2 | 8302 | 02C4 |
| 0000330220 | 4689 | 89D4 | D656 | 656A | FF56 | 0C76 | 76FF | 9A0A |
| 0000330240 | 05A6 | 02A8 | C483 | 8B08 | 8BF8 | C1DF | 02E3 | 5E03 |
| 0000330260 | 8E06 | 0846 | 8B26 | 2607 | 578B | C402 | D45E | 8926 |
| 0000330300 | 2607 | 5789 | 8B02 | D446 | 568B | 8BD6 | C1DF | 02E3 |
| 0000330320 | 5E03 | 8E06 | 0846 | 8926 | 2607 | 5789 | C402 | D45E |
| 0000330340 | 8926 | 0877 | 468B | 8B0E | 1056 | 5EC4 | 26D4 | 4789 |
| 0000330360 | 260A | 5789 | 9A0C | E352 | 02E2 | 8E50 | FC06 | 267A |
| 0000330400 | 70A0 | 5026 | 448D | 5001 | 879A | FFAC | 83FF | 06C4 |
| 0000330420 | 5EC4 | 26D4 | 4789 | 2604 | 5789 | C406 | D45E | 8B26 |
| 0000330440 | 0647 | 0B26 | 0447 | 0374 | 0CE9 | 1E00 | 7A68 | 9A32 |
| 0000330460 | B3B6 | 0302 | C483 | 8E04 | F406 | 267A | 3E83 | 03A7 |
| 0000330500 | 7500 | E903 | 006B | 7E83 | FEDC | 0375 | 62E9 | 9A00 |
| 0000330520 | F7E4 | 0314 | 5052 | 5EC4 | 26D4 | 77FF | 2606 | 77FF |
| 0000330540 | 9A04 | F91E | FFFF | C483 | 5004 | 5EC4 | 26D4 | 77FF |
| 0000330560 | 2606 | 77FF | 1E04 | 8968 | 8D32 | E646 | 5016 | 468D |
| 0000330600 | 16F4 | 8D50 | D846 | 5016 | 681E | 32C8 | 8F68 | FF00 |
| 0000330620 | 5836 | FF32 | 5636 | FF32 | 5C36 | FF32 | 5A36 | 1E32 |
| 0000330640 | 9768 | 6832 | 03F4 | F768 | 9A03 | 03FA | 0000 | C483 |
| 0000330660 | 5630 | 76FF | FF0C | 0A76 | 5EC4 | 26D4 | 77FF | 2606 |
| 0000330700 | 77FF | 9A04 | 662E | FFFF | C483 | C40A | D45E | C426 |
| 0000330720 | 045F | C626 | 0000 | 5EC4 | 26D4 | 478B | 2604 | 578B |
| 0000330740 | C406 | D45E | C426 | 0A5F | 8926 | 0847 | 8926 | 0A57 |
| 0000330760 | 068E | 7AF4 | 8326 | 133E | 0004 | 0375 | 52E9 | 8300 |
| 0000331000 | DC7E | 75FE | E903 | 0049 | FF57 | 0876 | 76FF | FF06 |
| 0000331020 | 0C76 | 76FF | 1E0A | A068 | 8D32 | E646 | 5016 | 468D |
| 0000331040 | 16F4 | 8D50 | D846 | 5016 | 681E | 32C8 | 9468 | FF00 |
| 0000331060 | 5836 | FF32 | 5636 | FF32 | 5C36 | FF32 | 5A36 | 1E32 |
| 0000331100 | BF68 | 6832 | FFFF | FF68 | 9AFF | FFFF | 0000 | C483 |
| 0000331120 | 8A30 | F846 | 068E | 7AFC | A226 | 2670 | 068E | 7AF4 |
| 0000331140 | 8326 | 733E | 0001 | 0375 | 09E9 | 8300 | DC7E | 74FE |
| 0000331160 | E903 | 000F | 068E | 7AF6 | 8326 | 9F3E | 0001 | 0375 |
| 0000331200 | 5FE9 | C400 | D45E | 8B26 | 0A47 | 8B26 | 0C57 | 4689 |
| 0000331220 | 89DE | E056 | 76FF | FFE4 | E276 | 468D | 16DE | FF50 |
| 0000331240 | F276 | 76FF | FFFC | FA76 | 4E8D | 16E6 | 8D51 | F44E |
| 0000331260 | 5116 | 4E8D | 16D8 | 1E51 | C868 | 6832 | 0098 | 36FF |
| 0000331300 | 3258 | 36FF | 3256 | 36FF | 325C | 36FF | 325A | FF9A |
| 0000331320 | 00FF | 8300 | 28C4 | 468B | 8BDE | E056 | 11E9 | E900 |
| 0000331340 | 000E | 5EC4 | 26D4 | 478B | 260A | 578B | E90C | 0000 |
| 0000331360 | 5F5E | ED83 | 8B02 | 1FE5 | 4D5D | 1ECB | 9058 | 5545 |
| 0000331400 | EC8B | 8E1E | 81D8 | 0AEC | 5700 | 8B56 | 0A46 | 568B |
| 0000331420 | 890C | FA46 | 5689 | E9FC | 0003 | 46FF | C4FA | FA5E |

THU MAR 14 17:52:34 1991 TSLINT.DLL PAGE 119, LINE 6963

| | | | | | | | | |
|---|---|---|---|---|---|---|---|---|
| 0000331440 | 8A26 | 9807 | D88B | 87F6 | 754F | 7407 | E903 | 000C |
| 0000331460 | 5EC4 | 26FA | 3F80 | 745F | E903 | 0003 | DBE9 | 8BFF |
| 0000331500 | FA76 | 762B | 6A0A | 5665 | 76FF | FF0C | 0A76 | A69A |
| 0000331520 | 5205 | 8302 | 08C4 | D88B | E3C1 | C402 | 067E | 8B26 |
| 0000331540 | 2601 | 518B | 8902 | F646 | 5689 | 8BF8 | F846 | 460B |
| 0000331560 | 75F6 | E903 | 006C | 5EC4 | 26F6 | 7739 | 7408 | E903 |
| 0000331600 | 004D | FE83 | 7500 | E903 | 0045 | 5EC4 | 260A | 078A |
| 0000331620 | 5EC4 | 26F6 | 5FC4 | 2604 | 0738 | 0374 | 30E9 | 5600 |
| 0000331640 | 76FF | FF0C | 0A76 | 5EC4 | 26F6 | 77FF | 2606 | 77FF |
| 0000331660 | 9A04 | 5156 | 0376 | C483 | 3D0A | 0000 | 0374 | 0EE9 |
| 0000331700 | C400 | F65E | 8B26 | 0A47 | 8B26 | 0C57 | 1CE9 | C400 |
| 0000331720 | F65E | 8B26 | 2607 | 578B | 8902 | F646 | 5689 | E9F8 |
| 0000331740 | FF89 | 00B8 | BA00 | 0000 | 00E9 | 5E00 | 835F | 02ED |
| 0000331760 | E58B | 5D1F | CB4D | 581E | 4590 | 8B55 | 1EEC | D88E |
| 0000332000 | EC81 | 0004 | 5657 | 768B | BF0A | 0000 | C68B | 3D4E |
| 0000332020 | 0000 | 0375 | 15E9 | C400 | 065E | 46FF | 2606 | 078A |
| 0000332040 | 8B98 | D1CF | 03E1 | 8BC1 | E9F8 | FFE0 | 468B | 990C |
| 0000332060 | 5052 | C78B | 2599 | FFFF | E281 | 7FFF | 5052 | 029A |
| 0000332100 | 647C | 8B05 | 8BF8 | E9C7 | 0000 | 5F5E | ED83 | 8B02 |
| 0000332120 | 1FE5 | 4D5D | 1ECB | 9058 | 5545 | EC8B | 8E1E | 81D8 |
| 0000332140 | 30EC | 5700 | C756 | FA46 | 32D0 | 5E8C | C7FC | EA46 |
| 0000332160 | 0107 | C02B | 4689 | 89DC | DA46 | 068E | 7AF4 | 8326 |
| 0000332200 | EE3E | 0002 | 0375 | 1DE9 | FF00 | 5C36 | FF32 | 5A36 |
| 0000332220 | 8D32 | D046 | 5016 | 899A | 0001 | 8300 | 08C4 | 003D |
| 0000332240 | 7400 | E903 | 000F | 068E | 7AF6 | 8326 | 2B3E | 0004 |
| 0000332260 | 0375 | 3BE9 | 1E00 | D768 | 8D32 | DE46 | 5016 | 468D |
| 0000332300 | 16D0 | 8D50 | EC46 | 5016 | D668 | 1E00 | 0A68 | FF33 |
| 0000332320 | 5836 | FF32 | 5636 | FF32 | 5C36 | FF32 | 5A36 | 9A32 |
| 0000332340 | 01D1 | 0000 | C483 | 891E | EC46 | 5689 | E9EE | 0008 |
| 0000332360 | C02B | 4689 | 89EE | EC46 | 068E | 7AFC | A026 | 2670 |
| 0000332400 | 4688 | 26F8 | 06C6 | 2670 | C402 | 065E | FF26 | 0677 |
| 0000332420 | FF26 | 0477 | BF9A | D70B | 8306 | 04C4 | 006A | 76FF |
| 0000332440 | FF08 | 0676 | 0E9A | EF08 | 8306 | 06C4 | 5EC4 | 2606 |
| 0000332460 | 77FF | 2602 | 37FF | 2768 | 6807 | 0AC4 | AB9A | 0B04 |
| 0000332500 | 8307 | 08C4 | 4689 | 89F0 | F256 | 76FF | FF0C | 0A76 |
| 0000332520 | 436A | 76FF | FF08 | 0676 | B19A | 2F12 | 8307 | 0AC4 |
| 0000332540 | 4689 | 89F4 | F656 | 76FF | FFF6 | F476 | 5EC4 | 2606 |
| 0000332560 | 77FF | 2602 | 37FF | FF68 | 68FF | 0AC4 | 479A | 5001 |
| 0000332600 | 8307 | 0CC4 | 468B | 0BF2 | F046 | 0375 | 19E9 | C400 |
| 0000332620 | 065E | FF26 | 0277 | FF26 | 1E37 | DE68 | 9A32 | B103 |
| 0000332640 | 0769 | C483 | E908 | 0016 | 5EC4 | 2606 | 77FF | 2602 |
| 0000332660 | 37FF | 681E | 32F5 | 039A | 01B1 | 8305 | 08C4 | 468A |
| 0000332700 | 8EF8 | FC06 | 267A | 70A2 | 8E26 | F406 | 267A | 3E83 |
| 0000332720 | 0631 | 7500 | E903 | 0009 | 7E83 | FED4 | 0374 | 0FE9 |
| 0000332740 | 8E00 | F606 | 267A | 3E83 | 065D | 7500 | E903 | 005A |
| 0000332760 | 468B | 8BF4 | F656 | 4689 | 89D6 | D856 | 76FF | FFDC |
| 0000333000 | DA76 | 468D | 16D6 | FF50 | EA76 | 76FF | FFFC | FA76 |
| 0000333020 | 4E8D | 16DE | 8D51 | EC4E | 5116 | 4E8D | 16D0 | 1E51 |
| 0000333040 | 0A68 | 6833 | 00EE | 36FF | 3258 | 36FF | 3256 | 36FF |
| 0000333060 | 325C | 36FF | 325A | 7F9A | 0004 | 8300 | 28C4 | 468B |
| 0000333100 | 8BD6 | D856 | 0CE9 | E900 | 0009 | 468B | 8BF4 | F656 |
| 0000333120 | 00E9 | 5E00 | 835F | 02ED | E58B | 5D1F | CB4D | 581E |
| 0000333140 | 4590 | 8B55 | 1EEC | D88E | EC81 | 0036 | 5657 | 46C7 |
| 0000333160 | 17FA | 8C33 | FC5E | 46C7 | 00F0 | 2B00 | 89C0 | E246 |
| 0000333200 | 4689 | 8EE0 | F4D6 | 267A | 3E83 | 0780 | 7500 | E903 |
| 0000333220 | 001D | 36FF | 325C | 36FF | 325A | 468D | 16D8 | 9A50 |
| 0000333240 | 0647 | 0000 | C483 | 3D08 | 0000 | 0374 | 0FE9 | 8E00 |
| 0000333260 | F606 | 267A | 3E83 | 0798 | 7500 | E903 | 003B | 681E |
| 0000333300 | 331B | 468D | 16E4 | 8D50 | D846 | 5016 | 468D | 16F2 |

THU MAR 14 17:52:34 19?1 TSLINT.DLL PAGE 120, LINE 7022

| | | | | | | | | |
|---|---|---|---|---|---|---|---|---|
| 0000333320 | 6850 | 00FC | 681E | 334E | 36FF | 3258 | 36FF | 3256 |
| 0000333340 | 36FF | 325C | 36FF | 325A | 909A | 0006 | 8300 | 1EC4 |
| 0000333360 | 4689 | 89F2 | F456 | 08E9 | 2B00 | 89C0 | F446 | 4689 |
| 0000333400 | C4F2 | 065E | 8B26 | 2607 | 578B | 8902 | F646 | 5689 |
| 0000333420 | 8BF8 | F646 | 568B | 89F8 | D446 | 5689 | E9D6 | 0003 |
| 0000333440 | 46FF | C4D4 | D45E | 8A26 | 9807 | D88B | 87F6 | 754F |
| 0000333460 | 7407 | E903 | 000C | 5EC4 | 26D4 | 3F80 | 745F | E903 |
| 0000333500 | 0003 | DBE9 | 8BFF | D476 | 762B | 6AF6 | 5665 | 76FF |
| 0000333520 | FFF8 | F676 | A69A | C705 | 8306 | 08C4 | E0C1 | 0502 |
| 0000333540 | 0AC4 | 4689 | C7CC | CE46 | 06E7 | 5EC4 | 26CC | 078B |
| 0000333560 | 8B26 | 0257 | 4689 | 89D0 | D256 | 10E9 | C400 | D05E |
| 0000333600 | 8B26 | 2607 | 578B | 8902 | D046 | 5689 | 8BD2 | D246 |
| 0000333620 | 460B | 75D0 | E903 | 0209 | 5EC4 | 26D0 | 7739 | 7408 |
| 0000333640 | E903 | 01EE | FE83 | 7500 | E903 | 01E6 | 5EC4 | 26F6 |
| 0000333660 | 078A | 5EC4 | 26D0 | 5FC4 | 2604 | 0738 | 0374 | D1E9 |
| 0000333700 | 5601 | 76FF | FFF8 | F676 | 5EC4 | 26D0 | 77FF | 2606 |
| 0000333720 | 77FF | 9A04 | 5156 | 05F1 | C483 | 3D0A | 0000 | 0374 |
| 0000333740 | AFE9 | C401 | D05E | 8B26 | 2607 | 578B | C402 | CC5E |
| 0000333760 | 8926 | 2607 | 5789 | FF02 | D276 | 76FF | 9AD0 | B4E2 |
| 0000334000 | 023B | C483 | C404 | D05E | FF26 | 0677 | FF26 | 0477 |
| 0000334020 | 1E9A | F9F9 | 8309 | 04C4 | 4689 | C4CA | D05E | FF26 |
| 0000334040 | 0677 | FF26 | 0477 | 429A | B0AA | 83D9 | 04C4 | 068E |
| 0000334060 | 7AF4 | 8326 | 3A3E | 0008 | 0375 | 5AE9 | 8300 | DC7E |
| 0000334100 | 75FE | E903 | 0051 | E49A | 07F7 | 5209 | FF50 | CA76 |
| 0000334120 | 5EC4 | 26D0 | 77FF | 2606 | 77FF | 1E04 | 1F68 | 8D33 |
| 0000334140 | E446 | 5016 | 468D | 16F2 | 8D50 | D846 | 5016 | 681E |
| 0000334160 | 334E | 0D68 | FF01 | 5836 | FF32 | 5636 | FF32 | 5C36 |
| 0000334200 | FF32 | 5A36 | 1E32 | 2D68 | 6833 | 0354 | 5768 | 9A03 |
| 0000334220 | 035A | 0000 | C483 | 8330 | 0A7E | 7500 | E903 | 008F |
| 0000334240 | 5EC4 | 2606 | 77FF | 2602 | 37FF | 1E9A | 92F9 | 830A |
| 0000334260 | 04C4 | 4689 | C4CA | 065E | FF26 | 0277 | FF26 | 9A37 |
| 0000334300 | AA42 | 09D9 | C483 | 8E04 | F406 | 267A | 3E83 | 09E5 |
| 0000334320 | 7500 | E903 | 0059 | 7E83 | FEDC | 0375 | 50E9 | 9A00 |
| 0000334340 | F7E4 | 09C3 | 5052 | 76FF | C4CA | 065E | FF26 | 0277 |
| 0000334360 | FF26 | 1E37 | 3668 | 8D33 | E446 | 5016 | 468D | 16F2 |
| 0000334400 | 8D50 | D846 | 5016 | 681E | 334E | 0F68 | FF01 | 5836 |
| 0000334420 | FF32 | 5636 | FF32 | 5C36 | FF32 | 5A36 | 1E32 | 4468 |
| 0000334440 | 6833 | 0A3A | 3D68 | 9A0A | 0A40 | 0000 | C483 | 8E30 |
| 0000334460 | F406 | 267A | 3E83 | 0B58 | 7500 | E903 | 0009 | 7E83 |
| 0000334500 | FEDC | 0374 | 0FE9 | 8E00 | F606 | 267A | 3E83 | 0B70 |
| 0000334520 | 7500 | E903 | 0039 | 468D | 16E4 | 8D50 | F246 | 5016 |
| 0000334540 | 468D | 16D8 | 1E50 | 4E68 | 6833 | 0110 | 36FF | 3258 |
| 0000334560 | 36FF | 3256 | 36FF | 325C | 36FF | 325A | 9F9A | 000B |
| 0000334600 | 8300 | 1AC4 | 46C7 | 00DE | E900 | 0078 | 03E9 | E900 |
| 0000334620 | 0072 | 468B | 8BD0 | D256 | 4689 | 89CC | CE56 | DCE9 |
| 0000334640 | 8EFD | F406 | 267A | 3E83 | 0A7E | 7500 | E903 | 0009 |
| 0000334660 | 7E83 | FEDC | 0374 | 0FE9 | 8E00 | F606 | 267A | 3E83 |
| 0000334700 | 0866 | 7500 | E903 | 0039 | 468D | 16E4 | 8D50 | F246 |
| 0000334720 | 5016 | 468D | 16D8 | 1E50 | 4E68 | 6833 | 0114 | 36FF |
| 0000334740 | 3258 | 36FF | 3256 | 36FF | 325C | 36FF | 325A | 279A |
| 0000334760 | 0001 | 8300 | 1AC4 | 46C7 | 00DE | E900 | 0006 | 03E9 |
| 0000335000 | E900 | 0000 | 5F5E | ED83 | 8B02 | 1FE5 | 4D5D | 1ECB |
| 0000335020 | 9058 | 5545 | EC8B | 8E1E | 81D8 | 28EC | 5700 | C756 |
| 0000335040 | FA46 | 3356 | 5E8C | C7FC | F446 | 0000 | C02B | 4689 |
| 0000335060 | 89E6 | E446 | 068E | 7AF4 | 8326 | A73E | 000C | 0375 |
| 0000335100 | 1DE9 | FF00 | 5C36 | FF32 | 5A36 | 8D32 | DC46 | 5016 |
| 0000335120 | 509A | 0008 | 8300 | 08C4 | 003D | 7400 | E903 | 000F |
| 0000335140 | 068E | 7AF6 | 8326 | BF3E | 000C | 0375 | 3BE9 | 1E00 |
| 0000335160 | 5A68 | 8D33 | E846 | 5016 | 468D | 16DC | 8D50 | F646 |

THU MAR 14 17:52:34 1991 TSLINT.DLL PAGE 121, LINE 7081

| | | | | | | | | |
|---|---|---|---|---|---|---|---|---|
| 0000335200 | 5016 | 1C68 | 1E01 | 5E68 | FF33 | 5836 | FF32 | 5636 |
| 0000335220 | FF32 | 5C36 | FF32 | 5A36 | 9A32 | 0899 | 0000 | C483 |
| 0000335240 | 891E | F646 | 5689 | E9F8 | 0008 | C02B | 4689 | 89F8 |
| 0000335260 | F646 | 468B | 8B06 | 0856 | 4689 | 89D8 | DA56 | 11E9 |
| 0000335300 | C400 | D85E | 8B26 | 0447 | 8B26 | 0657 | 4689 | 89D8 |
| 0000335320 | DA56 | 468B | 0BDA | D846 | 0375 | 13E9 | 6A00 | FF01 |
| 0000335340 | DA76 | 76FF | 9AD8 | 080E | 0A5D | C483 | E906 | FFD1 |
| 0000335360 | 068E | 7AF4 | 8326 | E63E | 000A | 0375 | 09E9 | 8300 |
| 0000335400 | E07E | 74FE | E903 | 000F | 068E | 7AF6 | 8326 | FE3E |
| 0000335420 | 000A | 0375 | 39E9 | 8D00 | E846 | 5016 | 468D | 16F6 |
| 0000335440 | 8D50 | DC46 | 5016 | 681E | 335E | 2368 | FF01 | 5836 |
| 0000335460 | FF32 | 5636 | FF32 | 5C36 | FF32 | 5A36 | 9A32 | 0B2D |
| 0000335500 | 0000 | C483 | C71A | E246 | 0000 | 06E9 | E900 | 0003 |
| 0000335520 | 00E9 | 5E00 | 835F | 02ED | E58B | 5D1F | CB4D | 581E |
| 0000335540 | 4590 | 8B55 | 1EEC | D88E | EC81 | 002C | 5657 | 46C7 |
| 0000335560 | 69FA | 8C33 | FC5E | 46C7 | 07EE | 2B01 | 89C0 | E046 |
| 0000335600 | 4689 | 8EDE | F406 | 267A | 3E83 | 0E15 | 7500 | E903 |
| 0000335620 | 001D | 36FF | 325C | 36FF | 325A | 468D | 16D4 | 9A50 |
| 0000335640 | 0C01 | 0000 | C483 | 3D08 | 0000 | 0374 | 0FE9 | 8E00 |
| 0000335660 | F606 | 267A | 3E83 | 0E2D | 7500 | E903 | 003B | 681E |
| 0000335700 | 3370 | 468D | 16E2 | 8D50 | D446 | 5016 | 468D | 16F0 |
| 0000335720 | 6850 | 012F | 681E | 3378 | 36FF | 3258 | 36FF | 3256 |
| 0000335740 | 36FF | 325C | 36FF | 325A | 4A9A | 000C | 8300 | 1EC4 |
| 0000335760 | 4689 | 89F0 | F256 | 08E9 | 2B00 | 89C0 | F246 | 4689 |
| 0000336000 | 8EF0 | FC06 | 267A | 70A0 | 8826 | F846 | C626 | 7006 |
| 0000336020 | 0226 | 286A | A69A | 72B2 | 830A | 02C4 | 4689 | 89F4 |
| 0000336040 | F656 | 468B | 8B06 | 0856 | 5EC4 | 26F4 | 0789 | 8926 |
| 0000336060 | 0257 | 5EC4 | 2BF4 | 26C0 | 4789 | 2606 | 4789 | 8E04 |
| 0000336100 | FA06 | 267A | 52A1 | 2600 | 06FF | 0052 | 5EC4 | 26F4 |
| 0000336120 | 4789 | 8A0C | F846 | 068E | 7AFC | A226 | 2670 | 068E |
| 0000336140 | 7AF4 | 8326 | EB3E | 000B | 0375 | 09E9 | 8300 | D87E |
| 0000336160 | 74FE | E903 | 000F | 068E | 7AF6 | 8326 | 173E | 000C |
| 0000336200 | 0375 | 6EE9 | FF00 | F676 | 76FF | FFF4 | 0876 | 76FF |
| 0000336220 | 6806 | 0EB0 | C468 | 9A0A | 0147 | 0EB8 | C483 | 890C |
| 0000336240 | DA46 | 5689 | FFDC | E076 | 76FF | 8DDE | DA46 | 5016 |
| 0000336260 | 76FF | FFEE | FC76 | 76FF | 8DFA | E24E | 5116 | 4E8D |
| 0000336300 | 16F0 | 8D51 | D44E | 5116 | 681E | 3378 | 3D68 | FF01 |
| 0000336320 | 5836 | FF32 | 5636 | FF32 | 5C36 | FF32 | 5A36 | 9A32 |
| 0000336340 | 07E7 | 0000 | C483 | 8B28 | DA46 | 568B | E9DC | 0020 |
| 0000336360 | 1DE9 | FF00 | F676 | 76FF | FFF4 | 0876 | 76FF | 6806 |
| 0000336400 | 0918 | C468 | 9A0A | 0147 | 0C98 | C483 | E90C | 0000 |
| 0000336420 | 5F5E | ED83 | 8B02 | 1FE5 | 4D5D | 1ECB | 9058 | 5545 |
| 0000336440 | EC8B | 8E1E | 81D8 | 2CEC | 5700 | C756 | FA46 | 3383 |
| 0000336460 | 5E8C | C7FC | F246 | 0107 | C02B | 4689 | 89E4 | E246 |
| 0000336500 | 068E | 7AF4 | 8326 | 3A3E | 000D | 0375 | 1DE9 | FF00 |
| 0000336520 | 5C36 | FF32 | 5A36 | 8D32 | D846 | 5016 | 509A | 000D |
| 0000336540 | 8300 | 08C4 | 003D | 7400 | E903 | 000F | 068E | 7AF6 |
| 0000336560 | 8326 | 663E | 000D | 0375 | 3BE9 | 1E00 | 8A68 | 8D33 |
| 0000336600 | E646 | 5016 | 468D | 16D8 | 8D50 | F446 | 5016 | 4868 |
| 0000336620 | 1E01 | 9268 | FF33 | 5836 | FF32 | 5636 | FF32 | 5C36 |
| 0000336640 | FF32 | 5A36 | 9A32 | 0D99 | 0000 | C483 | 891E | F446 |
| 0000336660 | 5689 | E9F6 | 0008 | C02B | 4689 | 89F6 | F446 | 068E |
| 0000336700 | 7AFC | A026 | 2670 | 4688 | 26F8 | 06C6 | 2670 | FF02 |
| 0000336720 | 0876 | 76FF | 6806 | 0E42 | C468 | 9A0A | 04AB | 0E4A |
| 0000336740 | C483 | 8908 | D446 | 5689 | 0BD6 | 74D0 | E903 | 0038 |
| 0000336760 | 006A | 006A | 3D6A | 068E | 7AFE | FF26 | 3C36 | 2637 |
| 0000337000 | 36FF | 373A | B19A | CD12 | 830F | 0AC4 | 5052 | 76FF |
| 0000337020 | FF08 | 0676 | 8668 | 680F | 0AC4 | 479A | 8E01 | 830F |
| 0000337040 | 0CC4 | 4689 | 89D4 | D656 | 468A | 8EF8 | FC06 | 267A |

THU MAR 14 17:52:34 1991 TSLINT.DLL PAGE 122, LINE 7140

| | | | | | | | | |
|---|---|---|---|---|---|---|---|---|
| 0000337060 | 70A2 | 8E26 | F406 | 267A | 3E83 | 0EF7 | 7500 | E903 |
| 0000337100 | 0009 | 7E83 | FEDC | 0374 | 0FE9 | 8E00 | F606 | 267A |
| 0000337120 | 3E83 | 0F23 | 7500 | E903 | 005A | 468B | 8BD4 | D656 |
| 0000337140 | 4689 | 89DE | E056 | 76FF | FFE4 | E276 | 468D | 16DE |
| 0000337160 | FF50 | F276 | 76FF | FFFC | FA76 | 4E8D | 16E6 | 8D51 |
| 0000337200 | F44E | 5116 | 4E8D | 16D8 | 1E51 | 9268 | 6833 | 0153 |
| 0000337220 | 36FF | 3258 | 36FF | 3256 | 36FF | 325C | 36FF | 325A |
| 0000337240 | 909A | 000E | 8300 | 28C4 | 468B | 8BDE | E056 | 0CE9 |
| 0000337260 | E900 | 0009 | 468B | 8BD4 | D656 | 00E9 | 5E00 | 835F |
| 0000337300 | 02ED | E58B | 5D1F | CB4D | 581E | 4590 | 8B55 | 1EEC |
| 0000337320 | D88E | EC81 | 002A | 5657 | 46C7 | 9BFA | 8C33 | FC5E |
| 0000337340 | 46C7 | 07F4 | 2B01 | 89C0 | E646 | 4689 | 8EE4 | F406 |
| 0000337360 | 267A | 3E83 | 0FEA | 7500 | E903 | 001D | 36FF | 325C |
| 0000337400 | 36FF | 325A | 468D | 16DA | 9A50 | 0F0D | 0000 | C483 |
| 0000337420 | 3D08 | 0000 | 0374 | 0FE9 | 8E00 | F606 | 267A | 3E83 |
| 0000337440 | 1002 | 7500 | E903 | 003B | 681E | 33A2 | 468D | 16E8 |
| 0000337460 | 8D50 | DA46 | 5016 | 468D | 16F6 | 6850 | 0173 | 681E |
| 0000337500 | 33D0 | 36FF | 3258 | 36FF | 3256 | 36FF | 325C | 36FF |
| 0000337520 | 325A | 569A | 000F | 8300 | 1EC4 | 4689 | 89F6 | F856 |
| 0000337540 | 08E9 | 2B00 | 89C0 | F846 | 4689 | FFF6 | 0676 | A69A |
| 0000337560 | C7B2 | 830D | 02C4 | 4689 | 89D6 | D856 | 068E | 7B00 |
| 0000337600 | A126 | 3844 | 5EC4 | 26D6 | 4789 | 9A0C | E352 | 1184 |
| 0000337620 | 8E50 | FC06 | 267A | 70A0 | 5026 | 0468 | 6812 | 3744 |
| 0000337640 | 149A | 1751 | 8312 | 04C4 | 5040 | 879A | 21AC | 8311 |
| 0000337660 | 06C4 | 5EC4 | 26D6 | 4789 | 2608 | 5789 | C40A | D65E |
| 0000337700 | 8B26 | 0A47 | 0B26 | 0847 | 0374 | 0CE9 | 1E00 | A968 |
| 0000337720 | 9A33 | B3B6 | 11A4 | C483 | 8E04 | F406 | 267A | 3E83 |
| 0000337740 | 1223 | 7500 | E903 | 006B | 7E83 | FEDE | 0375 | 62E9 |
| 0000337760 | 9A00 | F7E4 | 11B6 | 5052 | 5EC4 | 26D6 | 77FF | 260A |
| 0000340000 | 77FF | 9A08 | F91E | 0FB7 | C483 | 5004 | 5EC4 | 26D6 |
| 0000340020 | 77FF | 260A | 77FF | 1E08 | B868 | 8D33 | E846 | 5016 |
| 0000340040 | 468D | 16F6 | 8D50 | DA46 | 5016 | 681E | 33D0 | 7968 |
| 0000340060 | FF01 | 5836 | FF32 | 5636 | FF32 | 5C36 | FF32 | 5A36 |
| 0000340100 | 1E32 | C668 | 6833 | 0AD2 | D568 | 9A0A | 0AD8 | 0000 |
| 0000340120 | C483 | 6830 | FFFF | 4468 | C437 | D65E | FF26 | 0A77 |
| 0000340140 | FF26 | 0877 | B49A | 8650 | 8309 | 08C4 | 068E | 7AF4 |
| 0000340160 | 8326 | A43E | 0010 | 0375 | 09E9 | 8300 | DE7E | 74FE |
| 0000340200 | E903 | 000F | 068E | 7AF6 | 8326 | D03E | 0010 | 0375 |
| 0000340220 | 5AE9 | 8B00 | D646 | 568B | 89D8 | E046 | 5689 | FFE2 |
| 0000340240 | E676 | 76FF | 8DE4 | E046 | 5016 | 76FF | FFF4 | FC76 |
| 0000340260 | 76FF | 8DFA | E84E | 5116 | 4E8D | 16F6 | 8D51 | DA4E |
| 0000340300 | 5116 | 681E | 33D0 | 7B68 | FF01 | 5836 | FF32 | 5636 |
| 0000340320 | FF32 | 5C36 | FF32 | 5A36 | 9A32 | 1051 | 0000 | C483 |
| 0000340340 | 8B28 | E046 | 568B | E9E2 | 000C | 09E9 | 8B00 | D646 |
| 0000340360 | 568B | E9D8 | 0000 | 5F5E | ED83 | 8B02 | 1FE5 | 4D5D |
| 0000340400 | 1ECB | 9058 | 5545 | EC8B | 8E1E | 81D8 | 2AEC | 5700 |
| 0000340420 | C756 | FA46 | 33DC | 5E8C | C7FC | F446 | 0107 | C02B |
| 0000340440 | 4689 | 89E6 | E446 | 068E | 7AF4 | 8326 | 8D3E | 0013 |
| 0000340460 | 0375 | 1DE9 | FF00 | 5C36 | FF32 | 5A36 | 8D32 | DA46 |
| 0000340500 | 5016 | BA9A | 0010 | 8300 | D8C4 | 003D | 7400 | E903 |
| 0000340520 | 000F | 068E | 7AF6 | 8326 | A53E | 0013 | 0375 | 3BE9 |
| 0000340540 | 1E00 | E368 | 8D33 | E846 | 5016 | 468D | 16DA | 8D50 |
| 0000340560 | F646 | 5016 | 8968 | 1E01 | EA68 | FF33 | 5836 | FF32 |
| 0000340600 | 5636 | FF32 | 5C36 | FF32 | 5A36 | 9A32 | 1103 | 0000 |
| 0000340620 | C483 | 891E | F646 | 5689 | E9F8 | 0008 | C02B | 4689 |
| 0000340640 | 89F8 | F646 | 76FF | 9A0A | 1078 | 113E | C483 | 8902 |
| 0000340660 | D646 | 5689 | 8BD8 | 0646 | 568B | C408 | D65E | 8926 |
| 0000340700 | 2607 | 5789 | 8B02 | 0C46 | 568B | C40E | D65E | 8926 |
| 0000340720 | 0447 | 8926 | 0657 | 068E | 7AF4 | 8326 | 903E | 0011 |

THU MAR 14 17:52:34 1991 TSLINT.DLL PAGE 123, LINE 7199

| | | | | | | | | |
|---|---|---|---|---|---|---|---|---|
| 0000340740 | 0375 | 09E9 | 8300 | DE7E | 74FE | E903 | 000F | 068E |
| 0000340760 | 7AF6 | 8326 | 3B3E | 0012 | 0375 | 5AE9 | 8B00 | D646 |
| 0000341000 | 568B | 89D8 | E046 | 5689 | FFE2 | E676 | 76FF | 8DE4 |
| 0000341020 | E046 | 5016 | 76FF | FFF4 | FC76 | 76FF | 8DFA | E84E |
| 0000341040 | 5116 | 4E8D | 16F6 | 8D51 | DA4E | 5116 | 681E | 33EA |
| 0000341060 | 9068 | FF01 | 5836 | FF32 | 5636 | FF32 | 5C36 | FF32 |
| 0000341100 | 5A36 | 9A32 | 128A | 0000 | C483 | 8B28 | E046 | 568B |
| 0000341120 | E9E2 | 000C | 09E9 | 8B00 | D646 | 568B | E9D8 | 0000 |
| 0000341140 | 5F5E | ED83 | 8B02 | 1FE5 | 4D5D | 1ECB | 9058 | 5545 |
| 0000341160 | EC8B | 8E1E | 81D8 | 2AEC | 5700 | C756 | FA46 | 33EF |
| 0000341200 | 5E8C | C7FC | F446 | 0107 | C02B | 4689 | 89E6 | E446 |
| 0000341220 | 068E | 7AF4 | 8326 | F73E | 0014 | 0375 | 1DE9 | FF00 |
| 0000341240 | 5C36 | FF32 | 5A36 | 8D32 | DA46 | 5016 | F39A | 0012 |
| 0000341260 | 8300 | 08C4 | 003D | 7400 | E903 | 000F | 068E | 7AF6 |
| 0000341300 | 8326 | 0F3E | 0015 | 0375 | 3BE9 | 1E00 | F668 | 8D33 |
| 0000341320 | E846 | 5016 | 468D | 16DA | 8D50 | F646 | 5016 | 9E68 |
| 0000341340 | 1E01 | FE68 | FF33 | 5836 | FF32 | 5636 | FF32 | 5C36 |
| 0000341360 | FF32 | 5A36 | 9A32 | 133C | 0000 | C483 | 891E | F646 |
| 0000341400 | 5689 | E9F8 | 0008 | C02B | 4689 | 89F8 | F646 | 76FF |
| 0000341420 | 9A0A | 1078 | 135A | C483 | 8902 | D646 | 5689 | 8BD8 |
| 0000341440 | 0646 | 568B | C408 | D65E | 8926 | 2607 | 5789 | 8B02 |
| 0000341460 | 0C46 | 568B | C40E | D65E | 8926 | 0447 | 8926 | 0657 |
| 0000341500 | 068E | 7AF4 | 8326 | DD3E | 0012 | 0375 | 09E9 | 8300 |
| 0000341520 | DE7E | 74FE | E903 | 000F | 068E | 7AF6 | 8326 | 093E |
| 0000341540 | 0013 | 0375 | 5AE9 | 8B00 | D646 | 568B | 89D8 | E046 |
| 0000341560 | 5689 | FFE2 | E676 | 76FF | 8DE4 | E046 | 5016 | 76FF |
| 0000341600 | FFF4 | FC76 | 76FF | 8DFA | E84E | 5116 | 4E8D | 16F6 |
| 0000341620 | 8D51 | DA4E | 5116 | 681E | 33FE | A668 | FF01 | 5836 |
| 0000341640 | FF32 | 5636 | FF32 | 5C36 | FF32 | 5A36 | 9A32 | 13F4 |
| 0000341660 | 0000 | C483 | 8B28 | E046 | 568B | E9E2 | 000C | 09E9 |
| 0000341700 | 8B00 | D646 | 568B | E9D8 | 0000 | 5F5E | ED83 | 8B02 |
| 0000341720 | 1FE5 | 4D5D | 1ECB | 9058 | 5545 | EC8B | 8E1E | 81D8 |
| 0000341740 | 2AEC | 5700 | C756 | FA46 | 3404 | 5E8C | C7FC | F446 |
| 0000341760 | 0107 | C02B | 4689 | 89E6 | E446 | 068E | 7AF4 | 8326 |
| 0000342000 | 583E | 0016 | 0375 | 1DE9 | FF00 | 5C36 | FF32 | 5A36 |
| 0000342020 | 8D32 | DA46 | 5016 | 5D9A | 0014 | 8300 | 08C4 | 003D |
| 0000342040 | 7400 | E903 | 000F | 068E | 7AF6 | 8326 | 703E | 0016 |
| 0000342060 | 0375 | 3BE9 | 1E00 | 0868 | 8D34 | E846 | 5016 | 468D |
| 0000342100 | 16DA | 8D50 | F646 | 5016 | B468 | 1E01 | 1268 | FF34 |
| 0000342120 | 5836 | FF32 | 5636 | FF32 | 5C36 | FF32 | 5A36 | 9A32 |
| 0000342140 | 14A6 | 0000 | C483 | 891E | F646 | 5689 | E9F8 | 0008 |
| 0000342160 | C02B | 4689 | 89F8 | F646 | 406A | A69A | 5DB2 | 8311 |
| 0000342200 | 02C4 | 4689 | 89D6 | D856 | 468B | 8B06 | 0856 | 5EC4 |
| 0000342220 | 26D6 | 0789 | 8926 | 0257 | 5EC4 | 26D6 | 47C7 | 0004 |
| 0000342240 | 8E00 | F406 | 267A | 3E83 | 1447 | 7500 | E903 | 0009 |
| 0000342260 | 7E83 | FEDE | 0374 | 0FE9 | 8E00 | F606 | 267A | 3E83 |
| 0000342300 | 1473 | 7500 | E903 | 005A | 468B | 8BD6 | D856 | 4689 |
| 0000342320 | 89E0 | E256 | 76FF | FFE6 | E476 | 468D | 16E0 | FF50 |
| 0000342340 | F476 | 76FF | FFFC | FA76 | 4E8D | 16E8 | 8D51 | F64E |
| 0000342360 | 5116 | 4E8D | 16DA | 1E51 | 1268 | 6834 | 01BC | 36FF |
| 0000342400 | 3258 | 36FF | 3256 | 36FF | 325C | 36FF | 325A | 5E9A |
| 0000342420 | 0015 | 8300 | 28C4 | 468B | 8BE0 | E256 | 0CE9 | E900 |
| 0000342440 | 0009 | 468B | 8BD6 | D856 | 00E9 | 5E00 | 835F | 02ED |
| 0000342460 | E58B | 5D1F | CB4D | 581E | 4590 | 8B55 | 1EEC | D88E |
| 0000342500 | EC81 | 002E | 5657 | 46C7 | 1EFA | 8C34 | FC5E | 46C7 |
| 0000342520 | 07F4 | 2B01 | 89C0 | E646 | 4689 | 8EE4 | F406 | 267A |
| 0000342540 | 3E83 | 17C2 | 7500 | E903 | 001D | 36FF | 325C | 36FF |
| 0000342560 | 325A | 468D | 16DA | 9A50 | 15C7 | 0000 | C483 | 3D08 |
| 0000342600 | 0000 | 0374 | 0FE9 | 8E00 | F606 | 267A | 3E83 | 189D |

THU MAR 14 17:52:34 1991 TSLINT.DLL PAGE 124, LINE 7258

| | | | | | | | | |
|---|---|---|---|---|---|---|---|---|
| 0000342620 | 7500 | E903 | 003B | 681E | 3425 | 468D | 16E8 | 8D50 |
| 0000342640 | DA46 | 5016 | 468D | 16F6 | 6850 | 01C7 | 681E | 3452 |
| 0000342660 | 36FF | 3258 | 36FF | 3256 | 36FF | 325C | 36FF | 325A |
| 0000342700 | 109A | 0016 | 8300 | 1EC4 | 4689 | 89F6 | F856 | 08E9 |
| 0000342720 | 2B00 | 89C0 | F846 | 4689 | 9AF6 | E352 | 17B6 | 8E50 |
| 0000342740 | FC06 | 267A | 70A0 | 5026 | 0C6A | 879A | 30AC | 8318 |
| 0000342760 | 06C4 | 4689 | 89D2 | D456 | D00B | 0374 | 0CE9 | 1E00 |
| 0000343000 | 2C68 | 9A34 | B3B6 | 17D6 | C483 | 8E04 | F406 | 267A |
| 0000343020 | 3E83 | 1885 | 7500 | E903 | 0061 | 7E83 | FEDE | 0375 |
| 0000343040 | 58E9 | 9A00 | F7E4 | 17E3 | 5052 | 76FF | FFD4 | D276 |
| 0000343060 | 1E9A | C4F9 | 8314 | 04C4 | FF50 | D476 | 76FF | 1ED2 |
| 0000343100 | 3B68 | 8D34 | E846 | 5016 | 468D | 16F6 | 8D50 | DA46 |
| 0000343120 | 5016 | 681E | 3452 | CC68 | FF01 | 5836 | FF32 | 5636 |
| 0000343140 | FF32 | 5C36 | FF32 | 5A36 | 1E32 | 4968 | 6834 | 11F6 |
| 0000343160 | F968 | 9A11 | 11FC | 0000 | C483 | 6A30 | 9A00 | B2A6 |
| 0000343200 | 162D | C483 | 8902 | D646 | 5689 | 8BD8 | 0646 | 568B |
| 0000343220 | C408 | D25E | 8926 | 2607 | 5789 | 8B02 | 0A46 | 568B |
| 0000343240 | C40C | D25E | 8926 | 0447 | 8926 | 0657 | 468B | 8B0E |
| 0000343260 | 1056 | 5EC4 | 26D2 | 4789 | 2608 | 5789 | 8B0A | D246 |
| 0000343300 | 568B | C4D4 | D65E | 8926 | 0447 | 8926 | 0657 | 068E |
| 0000343320 | 7AF4 | 8326 | B13E | 0015 | 0375 | 09E9 | 8300 | DE7E |
| 0000343340 | 74FE | E903 | 000F | 068E | 7AF6 | 8326 | DD3E | 0015 |
| 0000343360 | 0375 | 5AE9 | 8B00 | D646 | 568B | 89D8 | E046 | 5689 |
| 0000343400 | FFE2 | E676 | 76FF | 8DE4 | E046 | 5016 | 76FF | FFF4 |
| 0000343420 | FC76 | 76FF | 8DFA | E84E | 5116 | 4E8D | 16F6 | 8D51 |
| 0000343440 | DA4E | 5116 | 681E | 3452 | D268 | FF01 | 5836 | FF32 |
| 0000343460 | 5636 | FF32 | 5C36 | FF32 | 5A36 | 9A32 | 16BF | 0000 |
| 0000343500 | C483 | 8B28 | E046 | 568B | E9E2 | 000C | 09E9 | 8B00 |
| 0000343520 | D646 | 568B | E9D8 | 0000 | 5F5E | ED83 | 8B02 | 1FE5 |
| 0000343540 | 4D5D | 1ECB | 9058 | 5545 | EC8B | 8E1E | 81D8 | 2AEC |
| 0000343560 | 5700 | C756 | FA46 | 3460 | 5E8C | C7FC | F446 | 0107 |
| 0000343600 | C02B | 4689 | 89E6 | E446 | 068E | 7AF4 | 8326 | FE3E |
| 0000343620 | 0019 | 0375 | 1DE9 | FF00 | 5C36 | FF32 | 5A36 | 8D32 |
| 0000343640 | DA46 | 5016 | 289A | 0017 | 8300 | 08C4 | 003D | 7400 |
| 0000343660 | E903 | 000F | 068E | 7AF6 | 8326 | 163E | 001A | 0375 |
| 0000343700 | 3BE9 | 1E00 | 6768 | 8D34 | E846 | 5016 | 468D | 16DA |
| 0000343720 | 8D50 | F646 | 5016 | E068 | 1E01 | 6E68 | FF34 | 5836 |
| 0000343740 | FF32 | 5636 | FF32 | 5C36 | FF32 | 5A36 | 9A32 | 1771 |
| 0000343760 | 0000 | C483 | 891E | F646 | 5689 | E9F8 | 0008 | C02B |
| 0000344000 | 4689 | 89F8 | F646 | 468B | 8B06 | 0856 | 4689 | 89D6 |
| 0000344020 | D856 | 5EC4 | 2606 | 478B | 2606 | 470B | 7504 | E903 |
| 0000344040 | 0014 | 5EC4 | 2606 | 478B | 2604 | 578B | 8906 | 0646 |
| 0000344060 | 5689 | E908 | FFDC | 468B | 8B0A | 0C56 | 5EC4 | 2606 |
| 0000344100 | 4789 | 2604 | 5789 | 8E06 | F406 | 267A | 3E83 | 1712 |
| 0000344120 | 7500 | E903 | 0009 | 7E83 | FEDE | 0374 | 0FE9 | 8E00 |
| 0000344140 | F606 | 267A | 3E83 | 173E | 7500 | E903 | 005A | 468B |
| 0000344160 | 8BD6 | D856 | 4689 | 89E0 | E256 | 76FF | FFE6 | E476 |
| 0000344200 | 468D | 16E0 | FF50 | F476 | 76FF | FFFC | FA76 | 4E8D |
| 0000344220 | 16E8 | 8D51 | F64E | 5116 | 4E8D | 16DA | 1E51 | 6E68 |
| 0000344240 | 6834 | 01E8 | 36FF | 3258 | 36FF | 3256 | 36FF | 325C |
| 0000344260 | 36FF | 325A | EC9A | 0018 | 8300 | 28C4 | 468B | 8BE0 |
| 0000344300 | E256 | 0CE9 | E900 | 0009 | 468B | 8BD6 | D856 | 00E9 |
| 0000344320 | 5E00 | 835F | 02ED | E58B | 5D1F | CB4D | 581E | 4590 |
| 0000344340 | 8B55 | 1EEC | D88E | EC81 | 0026 | 5657 | 46C7 | 7BFA |
| 0000344360 | 8C34 | FC5E | 46C7 | 07F4 | 2B01 | 89C0 | E646 | 4689 |
| 0000344400 | 8EE4 | F406 | 267A | 3E83 | 1B36 | 7500 | E903 | 001D |
| 0000344420 | 36FF | 325C | 36FF | 325A | 468D | 16DA | 9A50 | 1955 |
| 0000344440 | 0000 | C483 | 3D08 | 0000 | 0374 | 0FE9 | 8E00 | F606 |
| 0000344460 | 267A | 3E83 | 1BB8 | 7500 | E903 | 003B | 681E | 3482 |

THU MAR 14 17:52:34 1991 TSLINT.DLL PAGE 125, LINE 7317

| | | | | | | | | |
|---|---|---|---|---|---|---|---|---|
| 0000344500 | 468D | 16E8 | 8D50 | DA46 | 5016 | 468D | 16F6 | 6850 |
| 0000344520 | 01FF | 681E | 34B2 | 36FF | 3258 | 36FF | 3256 | 36FF |
| 0000344540 | 325C | 36FF | 325A | 9E9A | 0019 | 8300 | 1EC4 | 4689 |
| 0000344560 | 89F6 | F856 | 08E9 | 2B00 | 89C0 | F846 | 4689 | 8EF6 |
| 0000344600 | F406 | 267A | 3E83 | 1BA0 | 7500 | E903 | 0051 | 7E83 |
| 0000344620 | FEDE | 0375 | 48E9 | FF00 | 0A76 | 068E | 7B00 | FF26 |
| 0000344640 | 4436 | 1E38 | 8968 | 8D34 | E846 | 5016 | 468D | 16F6 |
| 0000344660 | 8D50 | DA46 | 5016 | 681E | 34B2 | 0168 | FF02 | 5836 |
| 0000344700 | FF32 | 5636 | FF32 | 5C36 | FF32 | 5A36 | 1E32 | AA68 |
| 0000344720 | 6834 | 181E | 2168 | 9A18 | 1824 | 0000 | C483 | 8B2A |
| 0000344740 | 0A46 | 5EC4 | 2606 | 4789 | 8E0C | F406 | 267A | 3E83 |
| 0000344760 | 193F | 7500 | E903 | 0009 | 7E83 | FEDE | 0374 | DFE9 |
| 0000345000 | 8E00 | F606 | 267A | 3E83 | 196B | 7500 | E903 | 005A |
| 0000345020 | 468B | 8B06 | 0856 | 4689 | 89E0 | E256 | 76FF | FFE6 |
| 0000345040 | E476 | 468D | 16E0 | FF50 | F476 | 76FF | FFFC | FA76 |
| 0000345060 | 4E8D | 16E8 | 8D51 | F64E | 5116 | 4E8D | 16DA | 1E51 |
| 0000345100 | B268 | 6834 | 0203 | 36FF | 3258 | 36FF | 3256 | 36FF |
| 0000345120 | 325C | 36FF | 325A | 659A | 001A | 8300 | 28C4 | 468B |
| 0000345140 | 8BE0 | E256 | 0CE9 | E900 | 0009 | 468B | 8B06 | 0856 |
| 0000345160 | 00E9 | 5E00 | 835F | 02ED | E58B | 5D1F | CB4D | 581E |
| 0000345200 | 4590 | 8B55 | 1EEC | D88E | EC81 | 002E | 5657 | 46C7 |
| 0000345220 | D3FA | 8C34 | FC5E | 46C7 | 07EC | 2B01 | 89C0 | DE46 |
| 0000345240 | 4689 | 8EDC | 0206 | 267B | 3E83 | 1AB8 | 7500 | E903 |
| 0000345260 | 001D | 36FF | 358A | 36FF | 3588 | 468D | 16D2 | 9A50 |
| 0000345300 | 1ACE | 0000 | C483 | 3D08 | 0000 | 0374 | 0FE9 | 8E00 |
| 0000345320 | 0406 | 267B | 3E83 | 1AE4 | 7500 | E903 | 003A | 681E |
| 0000345340 | 34EE | 468D | 16E0 | 8D50 | D246 | 5016 | 468D | 16F2 |
| 0000345360 | 6A50 | 1E36 | 8C68 | FF35 | 8636 | FF35 | 8436 | FF35 |
| 0000345400 | 8A36 | FF35 | 8836 | 9A35 | 1B17 | 0000 | C483 | 891E |
| 0000345420 | F246 | 5689 | E9F4 | 0008 | C02B | 4689 | 89F4 | F246 |
| 0000345440 | 529A | 8CE3 | 5017 | 068E | 7B06 | A026 | 2670 | 6A50 |
| 0000345460 | 9A12 | AC87 | 1D97 | C483 | 8906 | F646 | 5689 | 0BF8 |
| 0000345500 | 74D0 | E903 | 000C | 681E | 3509 | B69A | 1DB3 | 831D |
| 0000345520 | 04C4 | 068E | 7B02 | 8326 | C83E | 001D | 0375 | 60E9 |
| 0000345540 | 8300 | D67E | 75FE | E903 | 0057 | E49A | 2AF7 | 521D |
| 0000345560 | FF50 | F876 | 76FF | 9AF6 | F91E | 1D86 | C483 | 5004 |
| 0000345600 | 76FF | FFF8 | F676 | 681E | 3518 | 468D | 16E0 | 8D50 |
| 0000345620 | F246 | 5016 | 468D | 16D2 | 1E50 | 8C68 | 6A35 | FF3A |
| 0000345640 | 8636 | FF35 | 8436 | FF35 | 8A36 | FF35 | 8836 | 1E35 |
| 0000345660 | 2668 | 6835 | 1E2B | 2E68 | 9A1E | 1E31 | 0000 | C483 |
| 0000345700 | 6A30 | 6A12 | FF00 | F876 | 76FF | 9AF6 | 668C | 1153 |
| 0000345720 | C483 | 9A08 | E352 | 1DBC | 8E50 | 0606 | 267B | 70A0 |
| 0000345740 | 5026 | 086A | 879A | 56AC | 831E | 06C4 | 5EC4 | 26F6 |
| 0000345760 | 0789 | 8926 | 0257 | 5EC4 | 26F6 | 478B | 2602 | 070B |
| 0000346000 | 0374 | 0CE9 | 1E00 | 2F68 | 9A35 | B3B6 | 1DDC | C483 |
| 0000346020 | 8E04 | 0206 | 267B | 3E83 | 1E89 | 7500 | E903 | 0068 |
| 0000346040 | 7E83 | FED6 | 0375 | 5FE9 | 9A00 | F7E4 | 1DED | 5052 |
| 0000346060 | 5EC4 | 26F6 | 77FF | 2602 | 37FF | 1E9A | 44F9 | 831E |
| 0000346100 | 04C4 | C450 | F65E | FF26 | 0277 | FF26 | 1E37 | 3E68 |
| 0000346120 | 8D35 | E046 | 5016 | 468D | 16F2 | 8D50 | D246 | 5016 |
| 0000346140 | 681E | 358C | 3C6A | 36FF | 3586 | 36FF | 3584 | 36FF |
| 0000346160 | 358A | 36FF | 3588 | 681E | 354C | EE68 | 681E | 1EF1 |
| 0000346200 | F49A | 001E | 8300 | 30C4 | 5EC4 | 26F6 | 47C7 | 0804 |
| 0000346220 | 9A00 | E352 | 1E7D | 8E50 | 0606 | 267B | 70A0 | 5026 |
| 0000346240 | 0068 | 9A01 | AC87 | 179D | C483 | C406 | F65E | 8926 |
| 0000346260 | 0847 | 8926 | 0A57 | 5EC4 | 26F6 | 478B | 260A | 470B |
| 0000346300 | 7408 | E903 | 000C | 681E | 3555 | B69A | 9DB3 | 831E |
| 0000346320 | 04C4 | 068E | 7B02 | 8326 | 5A3E | 001C | 0375 | 6AE9 |
| 0000346340 | 8300 | D67E | 75FE | E903 | 0061 | E49A | AFF7 | 521E |

THU MAR 14 17:52:34 1991 TSLINT.DLL PAGE 126, LINE 7376

| | | | | | | | | |
|---|---|---|---|---|---|---|---|---|
| 0000346360 | C450 | F65E | FF26 | 0A77 | FF26 | 0877 | 1E9A | D3F9 |
| 0000346400 | 831C | 04C4 | C450 | F65E | FF26 | 0A77 | FF26 | 0877 |
| 0000346420 | 681E | 3564 | 468D | 16E0 | 8D50 | F246 | 5016 | 468D |
| 0000346440 | 16D2 | 1E50 | 8C68 | 6A35 | FF3E | 8636 | FF35 | 8436 |
| 0000346460 | FF35 | 8A36 | FF35 | 8836 | 1E35 | 7268 | 6835 | 1B82 |
| 0000346500 | 8568 | 9A1B | 1B88 | 0000 | C483 | 8E30 | 0806 | 267B |
| 0000346520 | 3E83 | 3742 | 7400 | E903 | 001B | 7E83 | 000A | 0375 |
| 0000346540 | 12E9 | C400 | F65E | C726 | 0C47 | 3D12 | C726 | 0E47 |
| 0000346560 | 114B | 0DE9 | C400 | F65E | C02B | 8926 | 0E47 | 8926 |
| 0000346600 | 0C47 | 76FF | FFF8 | F676 | 5EC4 | 2606 | 77FF | C40C |
| 0000346620 | 065E | FF26 | 0A77 | FF26 | 0877 | 439A | E474 | 831C |
| 0000346640 | 0AC4 | 4689 | 89EE | F056 | D00B | 0375 | 1DE9 | C400 |
| 0000346660 | 065E | FF26 | 0A77 | FF26 | 0877 | 76FF | FFF0 | EE76 |
| 0000346700 | 681E | 357B | B69A | FDB3 | 831C | 0CC4 | 5EC4 | 2606 |
| 0000346720 | 47F6 | 0214 | 0375 | 1BE9 | 8B00 | 0646 | 568B | 8E08 |
| 0000346740 | 0A06 | 267B | A0A3 | 260A | 1689 | 0AA2 | E79A | 4D29 |
| 0000346760 | E91F | 0000 | 068E | 7B02 | 8326 | 093E | 001D | 0375 |
| 0000347000 | 09E9 | 8300 | D67E | 74FE | E903 | 000F | 068E | 7B04 |
| 0000347020 | 8326 | 863E | 001C | 0375 | 59E9 | 8B00 | F646 | 568B |
| 0000347040 | 89F8 | D846 | 5689 | FFDA | DE76 | 76FF | 8DDC | D846 |
| 0000347060 | 5016 | 76FF | FFEC | FC76 | 76FF | 8DFA | E04E | 5116 |
| 0000347100 | 4E8D | 16F2 | 8D51 | D24E | 5116 | 681E | 358C | 476A |
| 0000347120 | 36FF | 3586 | 36FF | 3584 | 36FF | 358A | 36FF | 3588 |
| 0000347140 | 079A | 001C | 8300 | 28C4 | 468B | 8BD8 | DA56 | 0CE9 |
| 0000347160 | E900 | 0009 | 468B | 8BF6 | F856 | 00E9 | 5E00 | 835F |
| 0000347200 | 02ED | E58B | 5D1F | CB4D | 581E | 4590 | 8B55 | 1EEC |
| 0000347220 | D88E | EC81 | 000C | 5657 | 468B | 8B06 | 0856 | 4689 |
| 0000347240 | 89FA | FC56 | 4689 | 89F6 | F856 | 03E9 | FF00 | FA46 |
| 0000347260 | 5EC4 | 26FA | 3F80 | 7500 | E903 | 0206 | 5EC4 | 26FA |
| 0000347300 | 3F80 | 745C | E903 | 01D6 | 46FF | C4FA | FA5E | 8A26 |
| 0000347320 | 9807 | F08B | C68B | 62E9 | 8E01 | 0806 | 267B | 3E83 |
| 0000347340 | 3742 | 7500 | E903 | 0006 | 35E9 | E901 | 000A | 5EC4 |
| 0000347360 | FFF6 | F646 | C626 | 0707 | A0E9 | C401 | F65E | 46FF |
| 0000347400 | 26F6 | 07C6 | E908 | 0193 | 5EC4 | FFF6 | F646 | C626 |
| 0000347420 | 0C07 | 86E9 | C401 | F65E | 46FF | 26F6 | 07C6 | E90A |
| 0000347440 | 0179 | 5EC4 | FFF6 | F646 | C626 | 0D07 | 6CE9 | C401 |
| 0000347460 | F65E | 46FF | 26F6 | 07C6 | E909 | 015F | 068E | 7B08 |
| 0000347500 | 8326 | 423E | 0037 | 0375 | 06E9 | E900 | 00D2 | 0AE9 |
| 0000347520 | C400 | F65E | 46FF | 26F6 | 07C6 | E90B | 013D | 068E |
| 0000347540 | 7B08 | 8326 | 423E | 0037 | 0375 | 06E9 | E900 | 00B0 |
| 0000347560 | 5BE9 | BF00 | 0000 | 46FF | C4FA | FA5E | 8A26 | 9807 |
| 0000347600 | F08B | FE83 | 7500 | E903 | 0039 | 84F6 | 754F | 7480 |
| 0000347620 | E903 | 0003 | 2CE9 | F600 | 4F84 | 0475 | 0375 | 08E9 |
| 0000347640 | 8D00 | D044 | F803 | 17E9 | F600 | 4F84 | 0175 | 0375 |
| 0000347660 | 08E9 | 8D00 | C944 | F803 | 05E9 | 8D00 | A944 | F803 |
| 0000347700 | B3E9 | 8BFF | C4C7 | F65E | 46FF | 26F6 | 0788 | CAE9 |
| 0000347720 | 8D00 | D07C | 46C7 | 00F4 | FF00 | F446 | 7E83 | 03F4 |
| 0000347740 | 037C | 2DE9 | FF00 | FA46 | 5EC4 | 26FA | 078A | 8B98 |
| 0000347760 | 83F0 | 30FE | 037D | 13E9 | 8300 | 37FE | 037E | 0BE9 |
| 0000350000 | C100 | 03E7 | 448D | 03D0 | E9F8 | 0003 | 03E9 | E900 |
| 0000350020 | FFC7 | C78B | 5EC4 | FFF6 | F646 | 8826 | E907 | 007B |
| 0000350040 | 5EC4 | FFF6 | F646 | C626 | 5C07 | C68B | 5EC4 | FFF6 |
| 0000350060 | F646 | 8826 | E907 | 0063 | 60E9 | 3D00 | 006E | 0375 |
| 0000350100 | D2E9 | 7EFE | E903 | 0033 | 613D | 7500 | E903 | FE89 |
| 0000350120 | 037E | 13E9 | 2D00 | 0030 | 037D | C3E9 | 2DFF | 0007 |
| 0000350140 | 037F | 6CE9 | E9FF | FFB8 | 622D | 7500 | E903 | FE8B |
| 0000350160 | 042D | 7500 | E903 | FE90 | A5E9 | 2DFF | 0072 | 0375 |
| 0000350200 | 9FE9 | 48FE | 7548 | E903 | FEA5 | 4848 | 0375 | ABE9 |
| 0000350220 | 48FE | 7548 | E903 | FEC6 | 85E9 | E9FF | 0021 | 5EC4 |

THU MAR 14 17:52:34 1991 TSLINT.DLL PAGE 127, LINE 7435

| | | | | | | | | |
|---|---|---|---|---|---|---|---|---|
| 0000350240 | 26FA | 3F80 | 742F | E903 | 0006 | 15E9 | E900 | 000F |
| 0000350260 | 5EC4 | 26FA | 078A | 5EC4 | FFF6 | F646 | 8826 | E907 |
| 0000350300 | FDEB | 76FF | 8B0A | F646 | 462B | 5006 | 76FF | FF08 |
| 0000350320 | 0676 | 4F9A | 9F73 | 831F | 06C4 | 5052 | 2E9A | 771C |
| 0000350340 | 831F | 06C4 | 00E9 | 5E00 | 835F | 02ED | E58B | 5D1F |
| 0000350360 | CB4D | 581E | 4590 | 8B55 | 1EEC | D88E | EC81 | 0024 |
| 0000350400 | 5657 | 46C7 | A8FA | 8C35 | FC5E | 46C7 | 00F4 | 2B00 |
| 0000350420 | 89C0 | E646 | 4689 | 8EE4 | 0C06 | 267B | 3E83 | 1FAB |
| 0000350440 | 7500 | E903 | 001D | 36FF | 370E | 36FF | 370C | 468D |
| 0000350460 | 16DC | 9A50 | 1C70 | 0000 | C483 | 3D08 | 0000 | 0374 |
| 0000350500 | 0FE9 | 8E00 | 0E06 | 267B | 3E83 | 1FC3 | 7500 | E903 |
| 0000350520 | 003A | 681E | 35AC | 468D | 16E8 | 8D50 | DC46 | 5016 |
| 0000350540 | 468D | 16F6 | 6A50 | 1E54 | 1068 | FF37 | 0A36 | FF37 |
| 0000350560 | 0836 | FF37 | 0E36 | FF37 | 0C36 | 9A37 | 1CB8 | 0000 |
| 0000350600 | C483 | 891E | F646 | 5689 | E9F8 | 0008 | C02B | 4689 |
| 0000350620 | 89F8 | F646 | 109A | 8545 | 8E22 | 0C06 | 267B | 3E83 |
| 0000350640 | 23A3 | 7500 | E903 | 0044 | 7E83 | FEE0 | 0375 | 3BE9 |
| 0000350660 | 1E00 | B068 | 8D35 | E846 | 5016 | 468D | 16F6 | 8D50 |
| 0000350700 | DC46 | 5016 | 681E | 3710 | 5F6A | 36FF | 370A | 36FF |
| 0000350720 | 3708 | 36FF | 370E | 36FF | 370C | 681E | 35DD | E268 |
| 0000350740 | 6823 | 23E5 | E89A | 0023 | 8300 | 26C4 | 068E | 7B0C |
| 0000350760 | 8326 | 023E | 0024 | 0375 | 44E9 | 8300 | E07E | 75FE |
| 0000351000 | E903 | 003B | 681E | 35E3 | 468D | 16E8 | 8D50 | F646 |
| 0000351020 | 5016 | 468D | 16DC | 1E50 | 1068 | 6A37 | FF60 | 0A36 |
| 0000351040 | FF37 | 0836 | FF37 | 0E36 | FF37 | 0C36 | 1E37 | 0868 |
| 0000351060 | 6836 | 2448 | 4B68 | 9A24 | 244E | 0000 | C483 | 6A26 |
| 0000351100 | 6AFF | 9A03 | F51B | 2416 | C483 | 8E04 | 0C06 | 267B |
| 0000351120 | 3E83 | 245C | 7500 | E903 | 004B | 7E83 | FEE0 | 0375 |
| 0000351140 | 42E9 | 9A00 | F7E4 | 228F | 5052 | 681E | 360E | 468D |
| 0000351160 | 16E8 | 8D50 | F646 | 5016 | 468D | 16DC | 1E50 | 1068 |
| 0000351200 | 6A37 | FF62 | 0A36 | FF37 | 0836 | FF37 | 0E36 | FF37 |
| 0000351220 | 0C36 | 1E37 | 2868 | 6836 | 249B | 9E68 | 9A24 | 24A1 |
| 0000351240 | 0000 | C483 | 8E2A | 0C06 | 267B | 3E83 | 22CE | 7500 |
| 0000351260 | E903 | 0044 | 7E83 | FEE0 | 0375 | 3BE9 | 1E00 | 2E68 |
| 0000351300 | 8D36 | E846 | 5016 | 468D | 16F6 | 8D50 | DC46 | 5016 |
| 0000351320 | 681E | 3710 | 636A | 36FF | 370A | 36FF | 3708 | 36FF |
| 0000351340 | 370E | 36FF | 370C | 681E | 365B | 6468 | 681D | 1D67 |
| 0000351360 | 6A9A | 001D | 8300 | 26C4 | 068E | 7B18 | C626 | 7006 |
| 0000351400 | 0226 | 636A | 169A | C574 | 8324 | 02C4 | 006A | 681E |
| 0000351420 | 3661 | F89A | 476D | 8323 | 06C4 | 068E | 7B1A | A326 |
| 0000351440 | 373A | 8926 | 3C16 | 2637 | 3AA1 | 2637 | 168B | 373C |
| 0000351460 | 8B06 | BEF8 | 7B10 | C28E | A5A5 | A5A5 | 2607 | 1EC4 |
| 0000351500 | 373A | C726 | 1247 | 004E | 068E | 7B1A | C426 | 3A1E |
| 0000351520 | 2637 | 47C6 | 1C14 | 068E | 7B1C | C726 | 4206 | 0137 |
| 0000351540 | 1E00 | 6268 | 9A36 | 530A | 1D7E | C483 | 0B04 | 75D0 |
| 0000351560 | E903 | 0006 | 01B8 | E900 | 0003 | 00B8 | 8E00 | 1E06 |
| 0000351600 | 267B | 56A3 | 8E38 | 0C06 | 267B | 3E83 | 2594 | 7500 |
| 0000351620 | E903 | 0044 | 7E83 | FEE0 | 0375 | 3BE9 | 1E00 | 6C68 |
| 0000351640 | 8D36 | E846 | 5016 | 468D | 16F6 | 8D50 | DC46 | 5016 |
| 0000351660 | 681E | 3710 | 756A | 36FF | 370A | 36FF | 3708 | 36FF |
| 0000351700 | 370E | 36FF | 370C | 681E | 3688 | D368 | 6825 | 25D6 |
| 0000351720 | D99A | 0025 | 8300 | 26C4 | 939A | 8EE2 | 8E26 | 0C06 |
| 0000351740 | 267B | 3E83 | 25E7 | 7500 | E903 | 0044 | 7E83 | FEE0 |
| 0000351760 | 0375 | 3BE9 | 1E00 | 9068 | 8D36 | E846 | 5016 | 468D |
| 0000352000 | 16F6 | 8D50 | DC46 | 5016 | 681E | 3710 | 776A | 36FF |
| 0000352020 | 370A | 36FF | 3708 | 36FF | 370E | 36FF | 370C | 681E |
| 0000352040 | 36B3 | 2668 | 6826 | 2629 | 2C9A | 0026 | 8300 | 26C4 |
| 0000352060 | 068E | 7B0C | 8326 | 3F3E | 0026 | 0375 | 44E9 | 8300 |
| 0000352100 | E07E | 75FE | E903 | 003B | 681E | 36BB | 468D | 16E8 |

THU MAR 14 17:52:34 1991 TSLINT.DLL PAGE 128, LINE 7494

| | | | | | | | | |
|---|---|---|---|---|---|---|---|---|
| 0000352120 | 8D50 | F646 | 5016 | 468D | 16DC | 1E50 | 1068 | 6A37 |
| 0000352140 | FF79 | 0A36 | FF37 | 0836 | FF37 | 0E36 | FF37 | 0C36 |
| 0000352160 | 1E37 | D868 | 6836 | 267E | 8168 | 9A26 | 2684 | 0000 |
| 0000352200 | C483 | 9A26 | ED04 | 2698 | 068E | 7B0C | 8326 | 503E |
| 0000352220 | 0023 | 0375 | 44E9 | 8300 | E07E | 75FE | E903 | 003B |
| 0000352240 | 681E | 36E0 | 468D | 16E8 | 8D50 | F646 | 5016 | 468D |
| 0000352260 | 16DC | 1E50 | 1068 | 6A37 | FF7B | 0A36 | FF37 | 0836 |
| 0000352300 | FF37 | 0E36 | FF37 | 0C36 | 1E37 | FF68 | 6836 | 238F |
| 0000352320 | 9268 | 9A23 | 2395 | 0000 | C483 | 9A26 | 0000 | 23F6 |
| 0000352340 | 009A | FF00 | 9AFF | 0000 | 24B7 | 068E | 7B20 | C726 |
| 0000352360 | 4406 | FF38 | 1EFF | 0768 | 6837 | 1F20 | 4468 | 9A37 |
| 0000352400 | 50B4 | 2518 | C483 | 8E08 | 2206 | 267B | 06C7 | 384C |
| 0000352420 | 0000 | 068E | 7B24 | C726 | 5006 | 0038 | 8E00 | 2606 |
| 0000352440 | 267B | 06C7 | 3852 | 0000 | 068E | 7B28 | C726 | E4D6 |
| 0000352460 | 0143 | 8E00 | 2A06 | 267B | 06C7 | 3858 | 0000 | 068E |
| 0000352500 | 7B2C | C726 | 5A06 | 0038 | 8E00 | 2E06 | 267B | 06C7 |
| 0000352520 | 385C | 0000 | 068E | 7B30 | C726 | 5E06 | 0038 | 8E00 |
| 0000352540 | 3206 | 2B7B | 26C0 | 74A3 | 260C | 72A3 | 8E0C | 1806 |
| 0000352560 | 267B | 06C6 | 2670 | 8E01 | 0C06 | 267B | 3E83 | 253C |
| 0000352600 | 7500 | E903 | 0009 | 7E83 | FEE0 | 0374 | 0FE9 | 8E00 |
| 0000352620 | 0E06 | 267B | 3E83 | 22FA | 7500 | E903 | 0039 | 468D |
| 0000352640 | 16E8 | 8D50 | F646 | 5016 | 468D | 16DC | 1E50 | 1068 |
| 0000352660 | 6837 | 009B | 36FF | 370A | 36FF | 3708 | 36FF | 370E |
| 0000352700 | 36FF | 370C | EE9A | 000C | 8300 | 1AC4 | 46C7 | 00E2 |
| 0000352720 | E900 | 0006 | 03E9 | E900 | 0000 | 5F5E | ED83 | 8B02 |
| 0000352740 | 1FE5 | 4D5D | 1ECB | 9058 | 5545 | EC8B | 8E1E | 81D8 |
| 0000352760 | 24EC | 5700 | C756 | FA46 | 371F | 5E8C | C7FC | F446 |
| 0000353000 | 0000 | C02B | 4689 | 89E6 | E446 | 068E | 7B0C | 8326 |
| 0000353020 | 2E3E | 0027 | 0375 | 1DE9 | FF00 | 0E36 | FF37 | 0C36 |
| 0000353040 | 8D37 | DC46 | 5016 | E49A | 0022 | 8300 | 08C4 | 003D |
| 0000353060 | 7400 | E903 | 000F | 068E | 7B0E | 8326 | 463E | 0027 |
| 0000353100 | 0375 | 3BE9 | 1E00 | 2368 | 8D37 | E846 | 5016 | 468D |
| 0000353120 | 16DC | 8D50 | F646 | 5016 | B368 | 1E00 | 2868 | FF37 |
| 0000353140 | 0A36 | FF37 | 0836 | FF37 | 0E36 | FF37 | 0C36 | 9A37 |
| 0000353160 | 232C | 0000 | C483 | 891E | F646 | 5689 | E9F8 | 0008 |
| 0000353200 | C02B | 4689 | 89F8 | F646 | 068E | 7B34 | FF26 | 8236 |
| 0000353220 | 2600 | 36FF | 0080 | FF9A | 00FF | 8E00 | 3606 | 267B |
| 0000353240 | 36FF | 0C70 | FF26 | 6E36 | 9A0C | FFFF | 0000 | 068E |
| 0000353260 | 7B0C | 8326 | C13E | 0027 | 0375 | 09E9 | 8300 | E07E |
| 0000353300 | 74FE | E903 | 000F | 068E | 7B0E | 8326 | ED3E | 0027 |
| 0000353320 | 0375 | 39E9 | 8D00 | E846 | 5016 | 468D | 16F6 | 8D50 |
| 0000353340 | DC46 | 5016 | 681E | 3728 | B868 | FF00 | 0A36 | FF37 |
| 0000353360 | 0836 | FF37 | 0E36 | FF37 | 0C36 | 9A37 | 2775 | 0000 |
| 0000353400 | C483 | C71A | E246 | 0000 | 06E9 | E900 | 0003 | 00E9 |
| 0000353420 | 5E00 | 835F | 02ED | E58B | 5D1F | CB4D | 581E | 4590 |
| 0000353440 | 8B55 | 1EEC | D88E | EC81 | 0026 | 5657 | B81E | 26AA |
| 0000353460 | D88E | 46C7 | 6FFA | 8C38 | FC5E | 46C7 | 01F4 | 2B01 |
| 0000353500 | 89C0 | E646 | 4689 | 8EE4 | 3806 | 267B | 3E83 | 2865 |
| 0000353520 | 7500 | E903 | 001D | 36FF | 389A | 36FF | 3898 | 468D |
| 0000353540 | 16DC | 9A50 | 27D7 | 0000 | C483 | 3D08 | 0000 | 0374 |
| 0000353560 | 0FE9 | 8E00 | 3A06 | 267B | 3E83 | 287D | 7500 | E903 |
| 0000353600 | 003A | 681E | 3876 | 468D | 16E8 | 8D50 | DC46 | 5016 |
| 0000353620 | 468D | 16F6 | 6A50 | 1E51 | A068 | FF38 | 9636 | FF38 |
| 0000353640 | 9436 | FF38 | 9A36 | FF38 | 9836 | 9A38 | 2820 | 0000 |
| 0000353660 | C483 | 891E | F646 | 5689 | E9F8 | 0008 | C02B | 4689 |
| 0000353700 | 89F8 | F646 | 9EA1 | 0B38 | 9C06 | 7538 | E903 | 0088 |
| 0000353720 | 36FF | 389E | 36FF | 389C | 1E9A | BEF9 | 8329 | 04C4 |
| 0000353740 | 4689 | FFDA | 9E36 | FF38 | 9C36 | 9A38 | AA42 | 2636 |
| 0000353760 | C483 | 8E04 | 3806 | 267B | 3E83 | 28FE | 7500 | E903 |

THU MAR 14 17:52:34 1991 TSLINT.DLL PAGE 129, LINE 7553

| | | | | | | | | |
|---|---|---|---|---|---|---|---|---|
| 0000354000 | 0056 | 7E83 | FEE0 | 0375 | 4DE9 | 9A00 | F7E4 | 258B |
| 0000354020 | 5052 | 76FF | FFDA | 9E36 | FF38 | 9C36 | 1E38 | 7D68 |
| 0000354040 | 8D38 | E846 | 5016 | 468D | 16F6 | 8D50 | DC46 | 5016 |
| 0000354060 | 681E | 38A0 | 546A | 36FF | 3896 | 36FF | 3894 | 36FF |
| 0000354100 | 389A | 36FF | 3898 | 681E | 388B | 7B68 | 6825 | 257E |
| 0000354120 | 819A | 0025 | 8300 | 30C4 | 0068 | 9AFA | 4DB0 | 2ABA |
| 0000354140 | C483 | A302 | 389C | 1689 | 389E | 9EA1 | 0B38 | 9C06 |
| 0000354160 | 7438 | E903 | 007C | 068E | 7B38 | 8326 | AA3E | 0029 |
| 0000354200 | 0375 | 09E9 | 8300 | E07E | 74FE | E903 | 000F | 068E |
| 0000354220 | 7B3A | 8326 | 2A3E | 0029 | 0375 | 4FE9 | C700 | E246 |
| 0000354240 | 0007 | 76FF | FFE6 | E476 | 468D | 16E2 | FF50 | F476 |
| 0000354260 | 76FF | FFFC | FA76 | 4E8D | 16E8 | 8D51 | F64E | 5116 |
| 0000354300 | 4E8D | 16DC | 1E51 | A068 | 6A38 | FF59 | 9636 | FF38 |
| 0000354320 | 9436 | FF38 | 9A36 | FF38 | 9836 | 9A38 | 2011 | 0000 |
| 0000354340 | C483 | 8B28 | E246 | 31E9 | E901 | 0006 | 07B8 | E900 |
| 0000354360 | 0128 | 006A | 006A | 0068 | FFFA | 9E36 | FF38 | 9C36 |
| 0000354400 | 6838 | 298B | FF68 | 9AFF | 54A2 | 26B2 | C483 | 8EDE |
| 0000354420 | 3C06 | 267B | 84A3 | 2600 | 3E83 | 0084 | 74FF | E903 |
| 0000354440 | 007C | 068E | 7B38 | 8326 | 553E | 002B | 0375 | 09E9 |
| 0000354460 | 8300 | E07E | 74FE | E903 | 000F | 068E | 7B3A | 8326 |
| 0000354500 | 6D3E | 002B | 0375 | 4FE9 | C700 | E246 | 0005 | 76FF |
| 0000354520 | FFE6 | E476 | 468D | 16E2 | FF50 | F476 | 76FF | FFFC |
| 0000354540 | FA76 | 4E8D | 16E8 | 8D51 | F64E | 5116 | 4E8D | 16DC |
| 0000354560 | 1E51 | A068 | 6A38 | FF5E | 9636 | FF38 | 9436 | FF38 |
| 0000354600 | 9A36 | FF38 | 9836 | 9A38 | 2BB4 | 0000 | C483 | 8B28 |
| 0000354620 | E246 | 85E9 | E900 | 0006 | 05B8 | E900 | 007C | 068E |
| 0000354640 | 7B38 | 8326 | 2D3E | 002A | 0375 | 09E9 | 8300 | E07E |
| 0000354660 | 74FE | E903 | 000F | 068E | 7B3A | 8326 | 453E | 002A |
| 0000354700 | 0375 | 4FE9 | C700 | E246 | 0000 | 76FF | FFE6 | E476 |
| 0000354720 | 468D | 16E2 | FF50 | F476 | 76FF | FFFC | FA76 | 4E8D |
| 0000354740 | 16E8 | 8D51 | F64E | 5116 | 4E8D | 16DC | 1E51 | A068 |
| 0000354760 | 6A38 | FF60 | 9636 | FF38 | 9436 | FF38 | 9A36 | FF38 |
| 0000355000 | 9836 | 9A38 | 2A8C | 0000 | C483 | 8B28 | E246 | 09E9 |
| 0000355020 | E900 | 0006 | 00B8 | E900 | 0000 | 5E1F | 835F | 02ED |
| 0000355040 | E58B | 5D1F | CB4D | 581E | 4590 | 8B55 | 1EEC | D88E |
| 0000355060 | EC81 | 0024 | 5657 | B81E | 28DE | D88E | 46C7 | AAFA |
| 0000355100 | 8C38 | FC5E | 46C7 | 00F4 | 2B00 | 89C0 | E646 | 4689 |
| 0000355120 | 8EE4 | 3806 | 267B | 3E83 | 2AD9 | 7500 | E903 | 001D |
| 0000355140 | 36FF | 389A | 36FF | 3898 | 468D | 16DC | 9A50 | 2914 |
| 0000355160 | 0000 | C483 | 3D08 | 0000 | 0374 | 0FE9 | 8E00 | 3A06 |
| 0000355200 | 267B | 3E83 | 2AF1 | 7500 | E903 | 003A | 681E | 38AE |
| 0000355220 | 468D | 16E8 | 8D50 | DC46 | 5016 | 468D | 16F6 | 6A50 |
| 0000355240 | 1E7F | B268 | FF38 | 9636 | FF38 | 9436 | FF38 | 9A36 |
| 0000355260 | FF38 | 9836 | 9A38 | 295C | 0000 | C483 | 891E | F646 |
| 0000355300 | 5689 | E9F8 | 0008 | C02B | 4689 | 89F8 | F646 | 468B |
| 0000355320 | 8B06 | 0856 | 068E | 7B3E | A326 | 085E | 8926 | 6016 |
| 0000355340 | 8E08 | 3806 | 267B | 3E83 | 2C08 | 7500 | E903 | 0009 |
| 0000355360 | 7E83 | FEE0 | 0374 | 0FE9 | 8E00 | 3A06 | 267B | 3E83 |
| 0000355400 | 2C34 | 7500 | E903 | 0039 | 468D | 16E8 | 8D50 | F646 |
| 0000355420 | 5016 | 468D | 16DC | 1E50 | B268 | 6838 | 0083 | 36FF |
| 0000355440 | 3896 | 36FF | 3894 | 36FF | 389A | 36FF | 3898 | AC9A |
| 0000355460 | 0028 | 8300 | 1AC4 | 46C7 | 00E2 | E900 | 0006 | 03E9 |
| 0000355500 | E900 | 0000 | 5E1F | 835F | 02ED | E58B | 5D1F | CA4D |
| 0000355520 | 0004 | 581E | 4590 | 8B55 | 1EEC | D88E | EC81 | 0058 |
| 0000355540 | 5657 | 46C7 | D5FA | 8C38 | FC5E | 46C7 | 01EC | 2B01 |
| 0000355560 | 89C0 | CC46 | 4689 | 8ECA | 4006 | 267B | 3E83 | 2C98 |
| 0000355600 | 7500 | E903 | 001D | 36FF | 3D0C | 36FF | 3D0A | 468D |
| 0000355620 | 16BE | 9A50 | 2C1E | 0000 | C483 | 3D08 | 0000 | 0374 |
| 0000355640 | 0FE9 | 8E00 | 4206 | 267B | 3E83 | 2DD7 | 7500 | E903 |

THU MAR 14 17:52:34 1991 TSLINT.DLL PAGE 130, LINE 7612

| | | | | | | | | |
|---|---|---|---|---|---|---|---|---|
| 0000355660 | 003B | 681E | 38D9 | 468D | 16CE | 8D50 | BE46 | 5016 |
| 0000355700 | 468D | 16F2 | 6850 | 00BA | 681E | 3E14 | 36FF | 3D08 |
| 0000355720 | 36FF | 3D06 | 36FF | 3D0C | 36FF | 3D0A | 669A | 002C |
| 0000355740 | 8300 | 1EC4 | 4689 | 89F2 | F456 | 08E9 | 2B00 | 89C0 |
| 0000355760 | F446 | 4689 | 2BF2 | 89C0 | F846 | 4689 | 8BF6 | 0846 |
| 0000356000 | 460B | 7406 | E903 | 007D | 068E | 7B40 | 8326 | 3C3E |
| 0000356020 | 002E | 0375 | 09E9 | 8300 | C27E | 74FE | E903 | 000F |
| 0000356040 | 068E | 7B42 | 8326 | B03E | 002C | 0375 | 50E9 | C700 |
| 0000356060 | C446 | 0001 | 76FF | FFCC | CA76 | 468D | 16C4 | FF50 |
| 0000356100 | EC76 | 76FF | FFFC | FA76 | 4E8D | 16CE | 8D51 | F24E |
| 0000356120 | 5116 | 4E8D | 16BE | 1E51 | 1468 | 683E | 00CD | 36FF |
| 0000356140 | 3D08 | 36FF | 3D06 | 36FF | 3D0C | 36FF | 3D0A | 389A |
| 0000356160 | 002B | 8300 | 28C4 | 468B | E9C4 | 1B68 | 06E9 | B800 |
| 0000356200 | 0001 | 5FE9 | 8E1B | 4006 | 267B | 3E83 | 2D2E | 7500 |
| 0000356220 | E903 | 0057 | 7E83 | FEC2 | 0375 | 4EE9 | 8D00 | CE46 |
| 0000356240 | 5016 | 468D | 16F2 | 8D50 | BE46 | 5016 | 681E | 3E14 |
| 0000356260 | D168 | FF00 | 0836 | FF3D | 0636 | FF3D | 0C36 | FF3D |
| 0000356300 | 0A36 | 1E3D | DD68 | 6838 | 29FB | FE68 | 9A29 | FFFF |
| 0000356320 | 0000 | C483 | 3D22 | 0000 | 0375 | 0EE9 | FF00 | 0876 |
| 0000356340 | 76FF | 9A06 | 8200 | 2693 | C483 | C404 | 065E | 8B26 |
| 0000356360 | 0C47 | 068E | 7B44 | A326 | 3846 | 068E | 7B40 | 8326 |
| 0000356400 | BF3E | 002D | 0375 | 47E9 | 8300 | C27E | 75FE | E903 |
| 0000356420 | 003E | 068E | 7B44 | FF26 | 4636 | 1E38 | E468 | 8D38 |
| 0000356440 | CE46 | 5016 | 468D | 16F2 | 8D50 | BE46 | 5016 | 681E |
| 0000356460 | 3E14 | D568 | FF00 | 0836 | FF3D | 0636 | FF3D | 0C36 |
| 0000356500 | FF3D | 0A36 | 683D | 0101 | FF9A | 00FF | 8300 | 22C4 |
| 0000356520 | 068E | 7B44 | A126 | 3846 | 5040 | FF9A | 00FF | C400 |
| 0000356540 | 065E | 8B26 | 0847 | 8B26 | 0A57 | 068E | 7B46 | A326 |
| 0000356560 | 3848 | 8926 | 4A16 | 8E38 | 4006 | 267B | 3E83 | 2FBB |
| 0000356600 | 7500 | E903 | 004C | 7E83 | FEC2 | 0375 | 43E9 | 8E00 |
| 0000356620 | 4606 | 267B | 36FF | 384A | FF26 | 4836 | 1E38 | EF68 |
| 0000356640 | 8D38 | CE46 | 5016 | 468D | 16F2 | 8D50 | BE46 | 5016 |
| 0000356660 | 681E | 3E14 | D768 | FF00 | 0836 | FF3D | 0636 | FF3D |
| 0000356700 | 0C36 | FF3D | 0A36 | 683D | 0106 | F99A | 002E | 8300 |
| 0000356720 | 24C4 | 3E83 | 3E12 | 7400 | E903 | 000E | 76FF | FF08 |
| 0000356740 | 0676 | 009A | C4A3 | 8330 | 04C4 | 3E83 | 3E12 | 7500 |
| 0000356760 | E903 | 0006 | 06C7 | 3E12 | 0000 | 5EC4 | 2606 | 478B |
| 0000357000 | E912 | 18EE | 068E | 7B40 | 8326 | 4A3E | 0030 | 0375 |
| 0000357020 | 45E9 | 8300 | C27E | 75FE | E903 | 003C | 681E | 38F6 |
| 0000357040 | 468D | 16CE | 8D50 | F246 | 5016 | 468D | 16BE | 1E50 |
| 0000357060 | 1468 | 683E | 00E0 | 36FF | 3D08 | 36FF | 3D06 | 36FF |
| 0000357100 | 3D0C | 36FF | 3D0A | 681E | 3905 | 8A68 | 6830 | 308D |
| 0000357120 | 909A | 003D | 8300 | 26C4 | 468B | 8B06 | 0856 | 4689 |
| 0000357140 | 89F6 | F856 | 11E9 | C400 | F65E | 8B26 | 0447 | 8B26 |
| 0000357160 | 0657 | 4689 | 89F6 | F856 | 468B | 0BF8 | F646 | 0375 |
| 0000357200 | 80E9 | C402 | F65E | 8B26 | 2607 | 578B | 8902 | 0646 |
| 0000357220 | 5689 | 8E08 | 4006 | 267B | 3E83 | 30D8 | 7500 | E903 |
| 0000357240 | 0045 | 7E83 | FEC2 | 0375 | 3CE9 | 1E00 | 0E68 | 8D39 |
| 0000357260 | CE46 | 5016 | 468D | 16F2 | 8D50 | BE46 | 5016 | 681E |
| 0000357300 | 3E14 | E568 | FF00 | 0836 | FF3D | 0636 | FF3D | 0C36 |
| 0000357320 | FF3D | 0A36 | 1E3D | 1D68 | 6839 | 3123 | 2668 | 9A31 |
| 0000357340 | 3129 | 0000 | C483 | 6826 | 0FC5 | 6A68 | 9A0A | 68D2 |
| 0000357360 | 2A0E | C483 | E904 | 01E4 | 5EC4 | 2606 | 478B | 2602 |
| 0000357400 | 070B | 0375 | 1AE9 | C400 | 065E | FF26 | 0277 | FF26 |
| 0000357420 | 9A37 | 7F20 | 2AB2 | C483 | 3D04 | 0000 | 0375 | BBE9 |
| 0000357440 | 8E00 | 4006 | 267B | 3E83 | 2EB1 | 7500 | E903 | 0050 |
| 0000357460 | 7E83 | FEC2 | 0375 | 47E9 | C400 | 065E | FF26 | 0677 |
| 0000357500 | FF26 | 0477 | 681E | 3926 | 468D | 16CE | 8D50 | F246 |
| 0000357520 | 5016 | 468D | 16BE | 1E50 | 1468 | 683E | 00EB | 36FF |

THU MAR 14 17:52:34 1991 TSLINT.DLL PAGE 131, LINE 7671

| | | | | | | | | |
|---|---|---|---|---|---|---|---|---|
| 0000357540 | 3D08 | 36FF | 3D06 | 36FF | 3D0C | 36FF | 3D0A | 681E |
| 0000357560 | 3933 | 7868 | 682E | 2E7B | 019A | 002A | 8300 | 2AC4 |
| 0000357600 | 5EC4 | 2606 | 478B | 2606 | 470B | 7404 | E903 | 0025 |
| 0000357620 | 46C7 | 31BA | 2B00 | 89C0 | AA46 | 4689 | 2BA8 | 89C0 |
| 0000357640 | AE46 | 4689 | 8DAC | A846 | 5016 | 5C9A | 9621 | 832E |
| 0000357660 | 04C4 | 27E9 | C400 | 065E | C426 | 045F | 8326 | 127F |
| 0000357700 | 7400 | E903 | 0003 | 13E9 | C400 | 065E | FF26 | 0677 |
| 0000357720 | FF26 | 0477 | 029A | A02D | 8333 | 04C4 | 13E9 | 8E01 |
| 0000357740 | 4006 | 267B | 3E83 | 3213 | 7500 | E903 | 0009 | 7E83 |
| 0000357760 | FEC2 | 0374 | 0FE9 | 8E00 | 4206 | 267B | 3E83 | 322B |
| 0000360000 | 7500 | E903 | 0050 | 46C7 | 01C4 | FF00 | CC76 | 76FF |
| 0000360020 | 8DCA | C446 | 5016 | 76FF | FFEC | FC76 | 76FF | 8DFA |
| 0000360040 | CE4E | 5116 | 4E8D | 16F2 | 8D51 | BE4E | 5116 | 681E |
| 0000360060 | 3E14 | 0868 | FF01 | 0836 | FF3D | 0636 | FF3D | 0C36 |
| 0000360100 | FF3D | 0A36 | 9A3D | 3273 | 0000 | C483 | 8B28 | C446 |
| 0000360120 | 91E9 | E917 | 0006 | 01B8 | E900 | 1788 | 068E | 7B40 |
| 0000360140 | 8326 | BD3E | 0032 | 0375 | 09E9 | 8300 | C27E | 74FE |
| 0000360160 | E903 | 000F | 068E | 7B42 | 8326 | 5A3E | 002D | 0375 |
| 0000360200 | 50E9 | C700 | C446 | 0000 | 76FF | FFCC | CA76 | 468D |
| 0000360220 | 16C4 | FF50 | EC76 | 76FF | FFFC | FA76 | 4E8D | 16CE |
| 0000360240 | 8D51 | F24E | 5116 | 4E8D | 16BE | 1E51 | 1468 | 683E |
| 0000360260 | 010A | 36FF | 3D08 | 36FF | 3D06 | 36FF | 3D0C | 36FF |
| 0000360300 | 3D0A | 1F9A | 002E | 8300 | 28C4 | 468B | E9C4 | 1714 |
| 0000360320 | 06E9 | B800 | 0000 | 0BE9 | E917 | 0016 | C00B | 0375 |
| 0000360340 | 15E9 | 48FE | 0375 | F6E9 | 48FE | 0375 | 6DE9 | E9FF |
| 0000360360 | 0000 | 468B | 0BF8 | F646 | 0374 | 03E9 | E900 | 0003 |
| 0000360400 | 64E9 | E9FD | 1661 | 068E | 7B40 | 8326 | 3C3E | 0033 |
| 0000360420 | 0375 | 45E9 | 8300 | C27E | 75FE | E903 | 003C | 681E |
| 0000360440 | 393C | 468D | 16CE | 8D50 | F246 | 5016 | 468D | 16BE |
| 0000360460 | 1E50 | 1468 | 683E | 0112 | 36FF | 3D08 | 36FF | 3D06 |
| 0000360500 | 36FF | 3D0C | 36FF | 3D0A | 681E | 394B | 8668 | 6835 |
| 0000360520 | 3389 | 8C9A | 0033 | 8300 | 26C4 | 468B | 8B06 | 0856 |
| 0000360540 | 4689 | 89F6 | F856 | 11E9 | C400 | F65E | 8B26 | 0447 |
| 0000360560 | 8B26 | 0657 | 4689 | 89F6 | F856 | 468B | 0BF8 | F646 |
| 0000360600 | 0375 | 73E9 | 8E00 | 4006 | 267B | 3E83 | 33B2 | 7500 |
| 0000360620 | E903 | 004F | 7E83 | FEC2 | 0375 | 46E9 | C400 | F65E |
| 0000360640 | FF26 | 0277 | FF26 | 1E37 | 5468 | 8D39 | CE46 | 5016 |
| 0000360660 | 468D | 16F2 | 8D50 | BE46 | 5016 | 681E | 3E14 | 1468 |
| 0000360700 | FF01 | 0836 | FF3D | 0636 | FF3D | 0C36 | FF3D | 0A36 |
| 0000360720 | 1E3D | 6268 | 6839 | 33FC | FF68 | 9A33 | 3402 | 0000 |
| 0000360740 | C483 | C42A | F65E | FF26 | 0277 | FF26 | 9A37 | 2D02 |
| 0000360760 | 3416 | C483 | E904 | FF71 | 6CE9 | 8E15 | 4006 | 267B |
| 0000361000 | 3E83 | 342A | 7500 | E903 | 004F | 7E83 | FEC2 | 0375 |
| 0000361020 | 46E9 | C400 | C35E | FF26 | 0277 | FF26 | 1E37 | 6B68 |
| 0000361040 | 8D39 | CE46 | 5016 | 468D | 16F2 | 8D50 | BE46 | 5016 |
| 0000361060 | 681E | 3E14 | 1A68 | FF01 | 0836 | FF3D | 0636 | FF3D |
| 0000361100 | 0C36 | FF3D | 0A36 | 1E3D | 7868 | 6839 | 3478 | 7B68 |
| 0000361120 | 9A34 | 347E | 0000 | C483 | C42A | 065E | FF26 | 0277 |
| 0000361140 | FF26 | 9A37 | 7F20 | 3496 | C483 | 3D04 | 0000 | 0375 |
| 0000361160 | 7BE9 | 8E00 | 4006 | 267B | 3E83 | 34A5 | 7500 | E903 |
| 0000361200 | 0053 | 7E83 | FEC2 | 0375 | 4AE9 | C400 | 065E | C426 |
| 0000361220 | 045F | FF26 | 0277 | FF26 | 1E37 | 8168 | 8D39 | CE46 |
| 0000361240 | 5016 | 468D | 16F2 | 8D50 | BE46 | 5016 | 681E | 3E14 |
| 0000361260 | 1C68 | FF01 | 0836 | FF3D | 0636 | FF3D | 0C36 | FF3D |
| 0000361300 | 0A36 | 1E3D | 8968 | 6839 | 34F4 | F768 | 9A34 | 34FA |
| 0000361320 | 0000 | C483 | C42A | 065E | C426 | 045F | FF26 | 0277 |
| 0000361340 | FF26 | 9A37 | 2D02 | 3513 | C483 | E904 | 007A | 068E |
| 0000361360 | 7B40 | 8326 | 2E3E | 002F | 0375 | 54E9 | 8300 | C27E |
| 0000361400 | 75FE | E903 | 004B | 5EC4 | 2606 | 5FC4 | 2604 | 77FF |

THU MAR 14 17:52:34 1991 TSLINT.DLL PAGE 132, LINE 7730

| | | | | | | | | |
|---|---|---|---|---|---|---|---|---|
| 0000361420 | 2606 | 77FF | 1E04 | 9268 | 8D39 | CE46 | 5016 | 468D |
| 0000361440 | 16F2 | 8D50 | BE46 | 5016 | 681E | 3E14 | 1F68 | FF01 |
| 0000361460 | 0836 | FF3D | 0636 | FF3D | 0C36 | FF3D | 0A36 | 1E3D |
| 0000361500 | 9B68 | 6839 | 2FFB | FE68 | 9A2F | 3001 | 0000 | C483 |
| 0000361520 | C42A | 065E | C426 | 045F | FF26 | 0677 | FF26 | 0477 |
| 0000361540 | 029A | 952D | 832F | 04C4 | FCE9 | 6A13 | 6812 | 3098 |
| 0000361560 | 6668 | 8D00 | DA46 | 5016 | 2E9A | A066 | 8330 | 0AC4 |
| 0000361600 | 068E | 7B48 | FF26 | 5E06 | 8E38 | 4006 | 267B | 3E83 |
| 0000361620 | 35C9 | 7500 | E903 | 004F | 7E83 | FEC2 | 0375 | 46E9 |
| 0000361640 | C400 | 065E | FF26 | 0277 | FF26 | 1E37 | A468 | 8D39 |
| 0000361660 | CE46 | 5016 | 468D | 16F2 | 8D50 | BE46 | 5016 | 681E |
| 0000361700 | 3E14 | 2768 | FF01 | 0836 | FF3D | 0636 | FF3D | 0C36 |
| 0000361720 | FF3D | 0A36 | 1E3D | AD68 | 6839 | 3614 | 1768 | 9A36 |
| 0000361740 | 361A | 0000 | C483 | C42A | 065E | FF26 | 0277 | FF26 |
| 0000361760 | 9A37 | 7F20 | 362F | C483 | 3D04 | 0000 | 0375 | 70E9 |
| 0000362000 | 6801 | 3642 | 6668 | 9A00 | 68D2 | 364A | C483 | E904 |
| 0000362020 | 0129 | 068E | 7B40 | 8326 | 5F3E | 0036 | 0375 | 50E9 |
| 0000362040 | 8300 | C27E | 75FE | E903 | 0047 | 5EC4 | 2606 | 77FF |
| 0000362060 | 2606 | 77FF | 1E04 | B668 | 8D39 | CE46 | 5016 | 468D |
| 0000362100 | 16F2 | 8D50 | BE46 | 5016 | 681E | 3E14 | 2B68 | FF01 |
| 0000362120 | 0836 | FF3D | 0636 | FF3D | 0C36 | FF3D | 0A36 | 1E3D |
| 0000362140 | BC68 | 6839 | 37C3 | C668 | 9A37 | 37C9 | 0000 | C483 |
| 0000362160 | C42A | 065E | FF26 | 0677 | FF26 | 0477 | 029A | E32D |
| 0000362200 | 8336 | 04C4 | CAE9 | E900 | 00C7 | 126A | 468D | 16DA |
| 0000362220 | 6850 | 3729 | 6668 | 9A00 | 662E | 3731 | C483 | 8E0A |
| 0000362240 | 4806 | 267B | 0EFF | 385E | 068E | 7B40 | 8326 | 783E |
| 0000362260 | 0037 | 0375 | 09E9 | 8300 | C27E | 74FE | E903 | 000F |
| 0000362300 | 068E | 7B42 | 8326 | 263E | 0038 | 0375 | 50E9 | C700 |
| 0000362320 | C446 | 0001 | 76FF | FFCC | CA76 | 468D | 16C4 | FF50 |
| 0000362340 | EC76 | 76FF | FFFC | FA76 | 4E8D | 16CE | 8D51 | F24E |
| 0000362360 | 5116 | 4E8D | 16BE | 1E51 | 1468 | 683E | 0132 | 36FF |
| 0000362400 | 3D08 | 36FF | 3D06 | 36FF | 3D0C | 36FF | 3D0A | 6E9A |
| 0000362420 | 0038 | 8300 | 28C4 | 468B | E9C4 | 12C8 | 06E9 | B800 |
| 0000362440 | 0001 | BFE9 | 1E12 | C568 | 6839 | 0134 | 681E | 39D5 |
| 0000362460 | B69A | 19B3 | 8337 | 0AC4 | 16E9 | 0B00 | 75C0 | E903 |
| 0000362500 | FED0 | 7548 | E903 | FF3F | 7548 | E903 | FF3C | D4E9 |
| 0000362520 | C4FF | 065E | 8B26 | 0C47 | 068E | 7B44 | A326 | 3846 |
| 0000362540 | 76FF | FF08 | 0676 | 009A | DEA3 | 8337 | 04C4 | 76E9 |
| 0000362560 | 6AFE | 8D12 | DA46 | 5016 | 4568 | 6837 | 0066 | 2E9A |
| 0000362600 | 5266 | 8337 | 0AC4 | 068E | 7B48 | FF26 | 5E0E | E938 |
| 0000362620 | 11D5 | 126A | 6168 | 6837 | 0066 | 468D | 16DA | 9A50 |
| 0000362640 | 662E | 3769 | C483 | 8E0A | 4806 | 267B | 06FF | 385E |
| 0000362660 | F168 | 6837 | 0066 | D29A | F968 | 8337 | 04C4 | 29E9 |
| 0000362700 | 8E01 | 4006 | 267B | 3E83 | 380E | 7500 | E903 | 0050 |
| 0000362720 | 7E83 | FEC2 | 0375 | 47E9 | C400 | 065E | FF26 | 0677 |
| 0000362740 | FF26 | 0477 | 681E | 39F1 | 468D | 16CE | 8D50 | F246 |
| 0000362760 | 5016 | 468D | 16BE | 1E50 | 1468 | 683E | 0141 | 36FF |
| 0000363000 | 3D08 | 36FF | 3D06 | 36FF | 3D0C | 36FF | 3D0A | 681E |
| 0000363020 | 39F7 | FD68 | 6832 | 3300 | 039A | 0033 | 8300 | 2AC4 |
| 0000363040 | 5EC4 | 2606 | 77FF | 2606 | 77FF | 9A04 | 2D02 | 3892 |
| 0000363060 | C483 | E904 | 00CA | C7E9 | 6A00 | 8D12 | DA46 | 5016 |
| 0000363100 | 1E68 | 6835 | 0066 | 2E9A | 2B66 | 8335 | 0AC4 | 068E |
| 0000363120 | 7B48 | FF26 | 5E0E | 8E38 | 4006 | 267B | 3E83 | 38B7 |
| 0000363140 | 7500 | E903 | 0009 | 7E83 | FEC2 | 0374 | 0FE9 | 8E00 |
| 0000363160 | 4206 | 267B | 3E83 | 31AE | 7500 | E903 | 0050 | 46C7 |
| 0000363200 | 01C4 | FF00 | CC76 | 76FF | 8DCA | C446 | 5016 | 76FF |
| 0000363220 | FFEC | FC76 | 76FF | 8DFA | CE4E | 5116 | 4E8D | 16F2 |
| 0000363240 | 8D51 | BE4E | 5116 | 681E | 3E14 | 4868 | FF01 | 0836 |
| 0000363260 | FF3D | 0636 | FF3D | 0C36 | FF3D | 0A36 | 9A3D | 31F6 |

THU MAR 14 17:52:34 1991 TSLINT.DLL PAGE 133, LINE 7789

| | | | | | | | | |
|---|---|---|---|---|---|---|---|---|
| 0000363300 | 0000 | C483 | 8B28 | C446 | 19E9 | E911 | 0006 | 01B8 |
| 0000363320 | E900 | 1110 | 681E | 3A00 | 4A68 | 1E01 | 1068 | 9A3A |
| 0000363340 | B3B6 | 3187 | C483 | E90A | 0016 | C00B | 0375 | D0E9 |
| 0000363360 | 48FE | 0375 | 3FE9 | 48FF | 0375 | 3CE9 | E9FF | FFD4 |
| 0000363400 | 068E | 7B40 | 8326 | 963E | 0031 | 0375 | 4FE9 | 8300 |
| 0000363420 | C27E | 75FE | E903 | 0046 | 5EC4 | 2606 | 77FF | 2602 |
| 0000363440 | 37FF | 681E | 3A2C | 468D | 16CE | 8D50 | F246 | 5016 |
| 0000363460 | 468D | 16BE | 1E50 | 1468 | 683E | 014C | 36FF | 3D08 |
| 0000363500 | 36FF | 3D06 | 36FF | 3D0C | 36FF | 3D0A | 681E | 3A35 |
| 0000363520 | C968 | 6839 | 39CC | CF9A | 0039 | 8300 | 2AC4 | 5EC4 |
| 0000363540 | 2606 | 478B | 8E0E | 4406 | 267B | 46A3 | 6A38 | 6A00 |
| 0000363560 | 9A00 | A300 | 3936 | C483 | C404 | 065E | FF26 | 0277 |
| 0000363600 | FF26 | 9A37 | 7F20 | 39EB | C483 | 3D04 | 0000 | 0374 |
| 0000363620 | 1DE9 | 6AFE | 8D12 | DA46 | 5016 | 6768 | 6839 | 0066 |
| 0000363640 | 2E9A | 7466 | 8339 | 0AC4 | 068E | 7B48 | FF26 | 5E0E |
| 0000363660 | E938 | 0FB3 | 126A | 6868 | 683A | 0066 | 468D | 16DA |
| 0000363700 | 9A50 | 662E | 3A70 | C483 | 8E0A | 4806 | 267B | 06FF |
| 0000363720 | 385E | 068E | 7B40 | 8326 | F73E | 0039 | 0375 | 45E9 |
| 0000363740 | 8300 | C27E | 75FE | E903 | 003C | 681E | 3A3E | 468D |
| 0000363760 | 16CE | 8D50 | F246 | 5016 | 468D | 16BE | 1E50 | 1468 |
| 0000364000 | 683E | 0156 | 36FF | 3D08 | 36FF | 3D06 | 36FF | 3D0C |
| 0000364020 | 36FF | 3D0A | 681E | 3A5F | 3768 | 683A | 3A3A | 3D9A |
| 0000364040 | 003A | 8300 | 26C4 | 5EC4 | 2606 | 5FC4 | 2604 | 5FC4 |
| 0000364060 | 2604 | 77FF | 2602 | 37FF | 029A | 5A2D | 833A | 04C4 |
| 0000364100 | 068E | 7B40 | 8326 | 7F3E | 003A | 0375 | 45E9 | 8300 |
| 0000364120 | C27E | 75FE | E903 | 003C | 681E | 3A68 | 468D | 16CE |
| 0000364140 | 8D50 | F246 | 5016 | 468D | 16BE | 1E50 | 1468 | 683E |
| 0000364160 | 0159 | 36FF | 3D08 | 36FF | 3D06 | 36FF | 3D0C | 36FF |
| 0000364200 | 3D0A | 681E | 3A7B | BF68 | 683A | 3AC2 | C59A | 003A |
| 0000364220 | 8300 | 26C4 | 5EC4 | 2606 | 5FC4 | 2604 | 5FC4 | 2604 |
| 0000364240 | 77FF | 2606 | 77FF | 9A04 | 7F20 | 3AD9 | C483 | 3D04 |
| 0000364260 | 0000 | 0375 | 24E9 | 6802 | 3BAC | 6668 | 9A00 | 68D2 |
| 0000364300 | 3BB4 | C483 | E904 | 01DD | 068E | 7B40 | 8326 | E53E |
| 0000364320 | 003A | 0375 | 45E9 | 8300 | C27E | 75FE | E903 | 003C |
| 0000364340 | 681E | 3A84 | 468D | 16CE | 8D50 | F246 | 5016 | 468D |
| 0000364360 | 16BE | 1E50 | 1468 | 683E | 015D | 36FF | 3D08 | 36FF |
| 0000364400 | 3D06 | 36FF | 3D0C | 36FF | 3D0A | 681E | 3AA1 | 2568 |
| 0000364420 | 683B | 3B28 | 2B9A | 003B | 8300 | 26C4 | 5EC4 | 2606 |
| 0000364440 | 77FF | 2602 | 37FF | 029A | 482D | 833B | 04C4 | 068E |
| 0000364460 | 7B40 | 8326 | 573E | 003B | 0375 | 45E9 | 8300 | C27E |
| 0000364500 | 75FE | E903 | 003C | 681E | 3AAA | 468D | 16CE | 8D50 |
| 0000364520 | F246 | 5016 | 468D | 16BE | 1E50 | 1468 | 683E | 0161 |
| 0000364540 | 36FF | 3D08 | 36FF | 3D06 | 36FF | 3D0C | 36FF | 3D0A |
| 0000364560 | 681E | 3AC6 | 9768 | 683B | 3B9A | 9D9A | 003B | 8300 |
| 0000364600 | 26C4 | 5EC4 | 2606 | 5FC4 | 2604 | 5FC4 | 2604 | 77FF |
| 0000364620 | 260A | 77FF | 9A08 | 2D02 | 3C4D | C483 | E904 | 011B |
| 0000364640 | 068E | 7B40 | 8326 | C93E | 003B | 0375 | 45E9 | 8300 |
| 0000364660 | C27F | 75FE | E903 | 003C | 681E | 3ACF | 468D | 16CE |
| 0000364700 | 8D50 | F246 | 5016 | 468D | 16BE | 1E50 | 1468 | 683E |
| 0000364720 | 0165 | 36FF | 3D08 | 36FF | 3D06 | 36FF | 3D0C | 36FF |
| 0000364740 | 3D0A | 681E | 3AEB | 8A68 | 6835 | 358D | 909A | 0035 |
| 0000364760 | 8300 | 26C4 | 126A | 468D | 16DA | 6850 | 35B2 | 6668 |
| 0000365000 | 9A00 | 662E | 35BA | C483 | 8E0A | 4806 | 267B | 0EFF |
| 0000365020 | 385E | 068E | 7B40 | 8326 | 403E | 0035 | 0375 | 09E9 |
| 0000365040 | 8300 | C27E | 74FE | E903 | 000F | 068E | 7B42 | 8326 |
| 0000365060 | 773E | 0036 | 0375 | 50E9 | C700 | C446 | 0001 | 76FF |
| 0000365100 | FFCC | CA76 | 468D | 16C4 | FF50 | EC76 | 76FF | FFFC |
| 0000365120 | FA76 | 4E8D | 16CE | 8D51 | F24E | 5116 | 4E8D | 16BE |
| 0000365140 | 1E51 | 1468 | 683E | 0167 | 36FF | 3D08 | 36FF | 3D06 |

THU MAR 14 17:52:34 1991 TSLINT.DLL PAGE 134, LINE 7848

| | | | | | | | | |
|---|---|---|---|---|---|---|---|---|
| 0000365160 | 36FF | 3D0C | 36FF | 3D0A | BF9A | 0036 | 8300 | 28C4 |
| 0000365200 | 468B | E9C4 | 0D5E | 06E9 | B800 | 0001 | 55E9 | 1E0D |
| 0000365220 | F468 | 683A | 0169 | 681E | 3B04 | B69A | 83B3 | 833C |
| 0000365240 | 0AC4 | 16E9 | 0B00 | 75C0 | E903 | FE1C | 7548 | E903 |
| 0000365260 | FE7C | 7548 | E903 | FEE8 | D4E9 | C4FF | 065E | 8B26 |
| 0000365300 | 0C47 | 068E | 7B44 | A326 | 3846 | 76FF | FF08 | 0676 |
| 0000365320 | 009A | A4A3 | 8335 | 04C4 | B9E9 | 6AFD | 8D12 | DA46 |
| 0000365340 | 5016 | 4B68 | 6839 | 0066 | 2E9A | 5366 | 8339 | 0AC4 |
| 0000365360 | 068E | 7B48 | FF26 | 5E0E | E938 | 0C6B | 126A | 9368 |
| 0000365400 | 683C | 0066 | 468D | 16DA | 9A50 | 662E | 3C9B | C483 |
| 0000365420 | 8E0A | 4806 | 267B | D6FF | 385E | 068E | 7B40 | 8326 |
| 0000365440 | 893E | 0039 | 0375 | 57E9 | 8300 | C27E | 75FE | E903 |
| 0000365460 | 004E | 5EC4 | 2606 | 5FC4 | 2604 | 5FC4 | 2604 | 77FF |
| 0000365500 | 2602 | 37FF | 681E | 3B20 | 468D | 16CE | 8D50 | F246 |
| 0000365520 | 5016 | 468D | 16BE | 1E50 | 1468 | 683E | 0174 | 36FF |
| 0000365540 | 3D08 | 36FF | 3D06 | 36FF | 3D0C | 36FF | 3D0A | 681E |
| 0000365560 | 3B2C | 0168 | 6839 | 3904 | 079A | 0039 | 8300 | 2AC4 |
| 0000365600 | 016A | 5EC4 | 2606 | 5FC4 | 2604 | 5FC4 | 2604 | 77FF |
| 0000365620 | 2602 | 37FF | DB9A | 9E25 | 8329 | 06C4 | 4689 | 89EE |
| 0000365640 | F056 | 5EC4 | 2606 | 5FC4 | 2604 | 5FC4 | 2604 | 478B |
| 0000365660 | 2608 | 578B | 890A | F646 | 5689 | C4F8 | 065E | C426 |
| 0000365700 | 045F | C426 | 045F | C426 | 085F | 8326 | 127F | 7428 |
| 0000365720 | E903 | 002C | 5EC4 | 2606 | 5FC4 | 2604 | 5FC4 | 2604 |
| 0000365740 | 5FC4 | 2608 | 5F8B | C10C | 02E3 | 068E | 7B4A | C426 |
| 0000365760 | 5636 | 2608 | 008B | 8B26 | 0250 | 4689 | 89F6 | F856 |
| 0000366000 | 76FF | FFF8 | F676 | 129A | D05D | 833D | 04C4 | 4689 |
| 0000366020 | 89C6 | C856 | 14E9 | FF00 | C876 | 76FF | 9AC6 | 5FC9 |
| 0000366040 | 3D47 | C483 | 8904 | C646 | 5689 | 8BC8 | C846 | 460B |
| 0000366060 | 75C6 | E903 | 022B | 5EC4 | 26EE | 078B | 8B26 | 0257 |
| 0000366100 | 068E | 7B4C | A326 | 0AA0 | 8926 | A216 | 9A0A | 29E7 |
| 0000366120 | 3E10 | 5EC4 | 26C6 | 77FF | 260C | 77FF | 9A0A | 6983 |
| 0000366140 | 3DB9 | C483 | C404 | EE5E | 8926 | 2607 | 5789 | 8E02 |
| 0000366160 | 4E06 | 267B | 3E83 | 0AC2 | 7400 | E903 | 002C | 068E |
| 0000366200 | 7B50 | C426 | 761E | 260C | 1FC4 | FF26 | 0C77 | 068E |
| 0000366220 | 7B50 | C426 | 761E | 260C | 1FC4 | FF26 | 0A77 | FF26 |
| 0000366240 | 0877 | C19A | 0011 | 833E | 06C4 | 068E | 7B40 | 8326 |
| 0000366260 | D03E | 003E | 0375 | 4FE9 | 8300 | C27E | 75FE | E903 |
| 0000366300 | 0046 | 5EC4 | 26EE | 77FF | 2602 | 37FF | 681E | 3B35 |
| 0000366320 | 468D | 16CE | 8D50 | F246 | 5016 | 468D | 16BE | 1E50 |
| 0000366340 | 1468 | 683E | 0180 | 36FF | 3D08 | 36FF | 3D06 | 36FF |
| 0000366360 | 3D0C | 36FF | 3D0A | 681E | 3B44 | 1A68 | 683F | 3F1D |
| 0000366400 | 209A | 003F | 8300 | 2AC4 | 4468 | 683F | 0066 | D29A |
| 0000366420 | 4C68 | 833F | 04C4 | 2FE9 | 8E01 | 4006 | 267B | 3E83 |
| 0000366440 | 3F6C | 7500 | E903 | 004F | 7E83 | FEC2 | 0375 | 46E9 |
| 0000366460 | C400 | 065E | FF26 | 0277 | FF26 | 1E37 | 4D68 | 8D3B |
| 0000366500 | CE46 | 5016 | 468D | 16F2 | 8D50 | BE46 | 5016 | 681E |
| 0000366520 | 3E14 | 8368 | FF01 | 0836 | FF3D | 0636 | FF3D | 0C36 |
| 0000366540 | FF3D | 0A36 | 1E3D | 5868 | 683B | 4084 | 8768 | 9A40 |
| 0000366560 | 408A | 0000 | C483 | C42A | 065E | FF26 | 0277 | FF26 |
| 0000366600 | 9A37 | 2D02 | 3FF0 | C483 | E904 | 00D2 | 126A | 468D |
| 0000366620 | 16DA | 6850 | 4024 | 6668 | 9A00 | 662E | 402C | C483 |
| 0000366640 | 8E0A | 4806 | 267B | 0EFF | 385E | 068E | 7B4E | C726 |
| 0000366660 | C206 | FF0A | 8EFF | 4006 | 267B | 3E83 | 4044 | 7500 |
| 0000366700 | E903 | 0009 | 7E83 | FEC2 | 0374 | 0FE9 | 8E00 | 4206 |
| 0000366720 | 267B | 3E83 | 3BE1 | 7500 | E903 | 0050 | 46C7 | 01C4 |
| 0000366740 | FF00 | CC76 | 76FF | 8DCA | C446 | 5016 | 76FF | FFEC |
| 0000366760 | FC76 | 76FF | 8DFA | CE4E | 5116 | 4E8D | 16F2 | 8D51 |
| 0000367000 | BE4E | 5116 | 681E | 3E14 | 8B68 | FF01 | 0836 | FF3D |
| 0000367020 | 0636 | FF3D | 0C36 | FF3D | 0A36 | 9A3D | 3C29 | 0000 |

THU MAR 14 17:52:34 1991 TSLINT.DLL PAGE 135, LINE 7907

| | | | | | | | | |
|---|---|---|---|---|---|---|---|---|
| 0000367040 | C483 | 8B28 | C446 | BBE9 | E909 | 0006 | 01B8 | E900 |
| 0000367060 | 09B2 | 681E | 3B61 | 8D68 | 1E01 | 7168 | 9A3B | B3B6 |
| 0000367100 | 40A7 | C483 | E90A | 0016 | C00B | 0375 | CAE9 | 48FE |
| 0000367120 | 0375 | 34E9 | 48FF | 0375 | 31E9 | E9FF | FFD4 | B6E9 |
| 0000367140 | 8EFD | 4E06 | 267B | 06C7 | 0AC2 | FFFF | 126A | 468D |
| 0000367160 | 16DA | 6850 | 4103 | 6668 | 9A00 | 662E | 410B | C483 |
| 0000367200 | 8E0A | 4806 | 267B | 0EFF | 385E | DAE9 | 8E08 | 4006 |
| 0000367220 | 267B | 3E83 | 40B3 | 7500 | E903 | 0045 | 7E83 | FEC2 |
| 0000367240 | 0375 | 3CE9 | 1E00 | 8D68 | 8D3B | CE46 | 5016 | 468D |
| 0000367260 | 16F2 | 8D50 | BE46 | 5016 | 681E | 3E14 | 9568 | FF01 |
| 0000367300 | 0836 | FF3D | 0636 | FF3D | 0C36 | FF3D | 0A36 | 1E3D |
| 0000367320 | 9368 | 683B | 40F3 | F668 | 9A40 | 40F9 | 0000 | C483 |
| 0000367340 | 8E26 | 4806 | 267B | 3E83 | 385E | 7400 | E903 | 000C |
| 0000367360 | 681E | 3B9C | 409A | 39AD | 8341 | 04C4 | 068E | 7B40 |
| 0000367400 | 8326 | 583E | 0041 | 0375 | 45E9 | 8300 | C27E | 75FE |
| 0000367420 | E903 | 003C | 681E | 3BAD | 468D | 16CE | 8D50 | F246 |
| 0000367440 | 5016 | 468D | 16BE | 1E50 | 1468 | 683E | 0198 | 36FF |
| 0000367460 | 3D08 | 36FF | 3D06 | 36FF | 3D0C | 36FF | 3D0A | 681E |
| 0000367500 | 3BC4 | 9E68 | 6841 | 41A1 | A49A | 0041 | 8300 | 26C4 |
| 0000367520 | 026A | 4168 | 6841 | 0066 | FC9A | 4968 | 8341 | 06C4 |
| 0000367540 | 04E9 | 6A08 | 6A00 | 1E00 | CA68 | 9A3B | 9252 | 41B4 |
| 0000367560 | C483 | 8E08 | 4806 | 267B | 3E83 | 385E | 7400 | E903 |
| 0000367600 | 000C | 681E | 3BD3 | 409A | 24AD | 8339 | 04C4 | 016A |
| 0000367620 | AF68 | 683C | 0066 | FC9A | BC68 | 833C | 06C4 | C6E9 |
| 0000367640 | 8E07 | 4006 | 267B | 3E83 | 41C3 | 7500 | E903 | 004B |
| 0000367660 | 7E83 | FEC2 | 0375 | 42E9 | FF00 | 0876 | 76FF | 1E06 |
| 0000367700 | E768 | 8D3B | CE46 | 5016 | 468D | 16F2 | 8D50 | BE46 |
| 0000367720 | 5016 | 681E | 3E14 | A468 | FF01 | 0836 | FF3D | 0636 |
| 0000367740 | FF3D | 0C36 | FF3D | 0A36 | 1E3D | F068 | 683B | 3D23 |
| 0000367760 | 2668 | 9A3D | 3D29 | 0000 | C483 | FF2A | 0876 | 76FF |
| 0000370000 | 9A06 | 215C | 315D | C483 | E904 | 075B | 068E | 7B40 |
| 0000370020 | 8326 | D13E | 003C | 0375 | 45E9 | 8300 | C27E | 75FE |
| 0000370040 | E903 | 003C | 681E | 3BF9 | 468D | 16CE | 8D50 | F246 |
| 0000370060 | 5016 | 468D | 16BE | 1E50 | 1468 | 683E | 01A9 | 36FF |
| 0000370100 | 3D08 | 36FF | 3D06 | 36FF | 3D0C | 36FF | 3D0A | 681E |
| 0000370120 | 3C03 | 7D68 | 6842 | 4280 | 839A | 0042 | 8300 | 26C4 |
| 0000370140 | 5EC4 | 2606 | 77FF | 2602 | 37FF | 5EC4 | 2606 | 77FF |
| 0000370160 | 2606 | 77FF | 9A04 | C068 | 3F34 | C483 | E908 | 06E7 |
| 0000370200 | 068E | 7B40 | 8326 | A23E | 0042 | 0375 | 4BE9 | 8300 |
| 0000370220 | C27E | 75FE | E903 | 0042 | 76FF | FF08 | 0676 | 681E |
| 0000370240 | 3C0C | 468D | 16CE | 8D50 | F246 | 5016 | 468D | 16BE |
| 0000370260 | 1E50 | 1468 | 683E | 01AF | 36FF | 3D08 | 36FF | 3D06 |
| 0000370300 | 36FF | 3D0C | 36FF | 3D0A | 681E | 3C16 | E268 | 6842 |
| 0000370320 | 42E5 | E89A | 0042 | 8300 | 2AC4 | 76FF | FF08 | 0676 |
| 0000370340 | 1D9A | 1E06 | 8341 | 04C4 | 7CE9 | 8E06 | 4006 | 267B |
| 0000370360 | 3E83 | 4309 | 7500 | E903 | 0045 | 7E83 | FEC2 | 0375 |
| 0000370400 | 3CE9 | 1E00 | 1F68 | 8D3C | CE46 | 5016 | 468D | 16F2 |
| 0000370420 | 8D50 | BE46 | 5016 | 681E | 3E14 | B468 | FF01 | 0836 |
| 0000370440 | FF3D | 0636 | FF3D | 0C36 | FF3D | 0A36 | 1E3D | 2468 |
| 0000370460 | 683C | 4349 | 4C68 | 9A43 | 434F | 0000 | C483 | 6A26 |
| 0000370500 | 6801 | 3EB9 | 6A68 | 9A0A | 68FC | 3EC1 | C483 | E906 |
| 0000370520 | 0615 | 068E | 7B40 | 8326 | 613E | 003E | 0375 | 45E9 |
| 0000370540 | 8300 | C27E | 75FE | E903 | 003C | 681E | 3C2D | 468D |
| 0000370560 | 16CE | 8D50 | F246 | 5016 | 468D | 16BE | 1E50 | 1468 |
| 0000370600 | 683E | 01C0 | 36FF | 3D08 | 36FF | 3D06 | 36FF | 3D0C |
| 0000370620 | 36FF | 3D0A | 681E | 3C32 | AB68 | 683E | 3EAE | B19A |
| 0000370640 | 003E | 8300 | 26C4 | 06C7 | 3D0E | 0001 | 468B | 0B08 |
| 0000370660 | 0646 | 0375 | 99E9 | C400 | 065E | 8B26 | 2607 | 578B |
| 0000370700 | 8E02 | 5206 | 267B | B0A3 | 260A | 1689 | 0AB2 | D00B |

THU MAR 14 17:52:34 1991 TSLINT.DLL PAGE 136, LINE 7966

| | | | | | | | | |
|---|---|---|---|---|---|---|---|---|
| 0000370720 | 0374 | 10E9 | 8E00 | 5406 | 267B | 3AA1 | 2637 | 168B |
| 0000370740 | 373C | 39E9 | 8E00 | 5206 | 267B | 1EC4 | 0AB0 | 8326 |
| 0000370760 | 127F | 744E | E903 | 0010 | 068E | 7B52 | A126 | 0AB0 |
| 0000371000 | 8B26 | B216 | E90A | 0016 | 068E | 7B52 | FF26 | B236 |
| 0000371020 | 260A | 36FF | 0AB0 | 9F9A | 2849 | 8342 | 04C4 | 068E |
| 0000371040 | 7B56 | A326 | 0A84 | 8926 | 8616 | 260A | 36FF | 0A86 |
| 0000371060 | FF26 | 8436 | 9A0A | 6286 | 443E | C483 | 8E04 | 8BC2 |
| 0000371100 | 8DD8 | 9A1F | 9935 | 43FB | F79A | 519B | A344 | 3D10 |
| 0000371120 | 068E | 7B56 | A126 | 0A86 | 0B26 | 8406 | 750A | E903 |
| 0000371140 | 0034 | C426 | 841E | 260A | 47F6 | 0214 | 0375 | 22E9 |
| 0000371160 | 8E00 | 5606 | 267B | 84A1 | 260A | 168B | 0A86 | 068E |
| 0000371200 | 7B4C | A326 | 0AA0 | 8926 | A216 | 9A0A | 29E7 | 452E |
| 0000371220 | 00E9 | E900 | 0000 | 026A | F268 | 6842 | 0A6A | FC9A |
| 0000371240 | FA68 | 8342 | 06C4 | BEE9 | 8E04 | 4006 | 267B | 3E83 |
| 0000371260 | 4237 | 7500 | E903 | 0045 | 7E83 | FEC2 | 0375 | 3CE9 |
| 0000371300 | 1E00 | 3B68 | 8D3C | CE46 | 5016 | 468D | 16F2 | 8D50 |
| 0000371320 | BE46 | 5016 | 681E | 3E14 | C968 | FF01 | 0836 | FF3D |
| 0000371340 | 0636 | FF3D | 0C36 | FF3D | 0A36 | 1E3D | 4268 | 683C |
| 0000371360 | 4203 | 0668 | 9A42 | 4209 | 0000 | C483 | C426 | 065E |
| 0000371400 | 8B26 | 2607 | 578B | 8E02 | 5206 | 267B | B0A3 | 260A |
| 0000371420 | 1689 | 0AB2 | D00B | 0374 | 10E9 | 8E00 | 5406 | 267B |
| 0000371440 | 3AA1 | 2637 | 168B | 373C | 39E9 | 8E00 | 5206 | 267B |
| 0000371460 | 1EC4 | 0AB0 | 8326 | 127F | 744E | E903 | 0010 | 068E |
| 0000371500 | 7B52 | A126 | 0AB0 | 8B26 | B216 | E90A | 0016 | 068E |
| 0000371520 | 7B52 | FF26 | B236 | 260A | 36FF | 0AB0 | 9F9A | C949 |
| 0000371540 | 8343 | 04C4 | 068E | 7B56 | A326 | 0A84 | 8926 | 8616 |
| 0000371560 | 260A | 36FF | 0A86 | FF26 | 8436 | 9A0A | 6983 | 3E55 |
| 0000371600 | C483 | 8E04 | 5806 | 267B | 5EA3 | 260C | 1689 | 0C60 |
| 0000371620 | C426 | 5E1E | 260C | 4F80 | 0214 | 068E | 7B5A | 8326 |
| 0000371640 | 5C3E | 0038 | 0374 | 0CE9 | 1E00 | 4B68 | 9A3C | AD40 |
| 0000371660 | 4682 | C483 | 8E04 | 4006 | 267B | 3E83 | 45D3 | 7500 |
| 0000371700 | E903 | 0045 | 7E83 | FEC2 | 0375 | 3CE9 | 1E00 | 7368 |
| 0000371720 | 8D3C | CE46 | 5016 | 468D | 16F2 | 8D50 | BE46 | 5016 |
| 0000371740 | 681E | 3E14 | CE68 | FF01 | 0836 | FF3D | 0636 | FF3D |
| 0000371760 | 0C36 | FF3D | 0A36 | 1E3D | 8A68 | 683C | 4613 | 1668 |
| 0000372000 | 9A46 | 4619 | 0000 | C483 | 6A26 | 6803 | 4449 | 5468 |
| 0000372020 | 9A00 | 68FC | 43F6 | C483 | E906 | 034B | 068E | 7B40 |
| 0000372040 | 8326 | 603E | 0044 | 0375 | 45E9 | 8300 | C27E | 75FE |
| 0000372060 | E903 | 003C | 681E | 3C90 | 468D | 16CE | 8D50 | F246 |
| 0000372100 | 5016 | 468D | 16BE | 1E50 | 1468 | 683E | 01D4 | 36FF |
| 0000372120 | 3D08 | 36FF | 3D06 | 36FF | 3D0C | 36FF | 3D0A | 681E |
| 0000372140 | 3C9A | A068 | 6844 | 44A3 | A69A | 0044 | 8300 | 26C4 |
| 0000372160 | 5EC4 | 2606 | 078B | 8B26 | 0257 | 068E | 7B52 | A326 |
| 0000372200 | 0AB0 | 8926 | B216 | 0B0A | 74D0 | E903 | 0010 | 068E |
| 0000372220 | 7B54 | A126 | 373A | 8B26 | 3C16 | E937 | 0039 | 068E |
| 0000372240 | 7B52 | C426 | B01E | 260A | 7F83 | 4E12 | 0374 | 10E9 |
| 0000372260 | 8E00 | 5206 | 267B | B0A1 | 260A | 168B | 0AB2 | 16E9 |
| 0000372300 | 8E00 | 5206 | 267B | 36FF | 0AB2 | FF26 | B036 | 9A0A |
| 0000372320 | 499F | 450F | C483 | 8E04 | 5606 | 267B | 84A3 | 260A |
| 0000372340 | 1689 | 0A86 | FF26 | 8636 | 260A | 36FF | 0A84 | 839A |
| 0000372360 | E869 | 8343 | 04C4 | 068E | 7B58 | A326 | 0C5E | 8926 |
| 0000372400 | 6016 | 260C | 1EC4 | 0C5E | 8026 | 144F | 8E02 | 5C06 |
| 0000372420 | 267B | 3E83 | 3858 | 7400 | E903 | 0060 | 681E | 3CA3 |
| 0000372440 | 409A | 48AD | 8348 | 04C4 | 068E | 7B40 | 8326 | 463E |
| 0000372460 | 0047 | 0375 | 45E9 | 8300 | C27E | 75FE | E903 | 003C |
| 0000372500 | 681E | 3CC7 | 468D | 16CE | 8D50 | F246 | 5016 | 468D |
| 0000372520 | 16BE | 1E50 | 1468 | 683E | 01D9 | 36FF | 3D08 | 36FF |
| 0000372540 | 3D06 | 36FF | 3D0C | 36FF | 3D0A | 681E | 3CDE | 8668 |
| 0000372560 | 6847 | 4789 | 8C9A | 0047 | 8300 | 26C4 | 036A | BC68 |

THU MAR 14 17:52:34 1991 TSLINT.DLL PAGE 137, LINE 8025

| | | | | | | | | |
|---|---|---|---|---|---|---|---|---|
| 0000372600 | 6845 | 0A88 | FC9A | C468 | 8345 | 06C4 | D8E9 | 8E01 |
| 0000372620 | 4006 | 267B | 3E83 | 479D | 7500 | E903 | 0045 | 7E83 |
| 0000372640 | FEC2 | 0375 | 3CE9 | 1E00 | E468 | 8D3C | CE46 | 5016 |
| 0000372660 | 468D | 16F2 | 8D50 | BE46 | 5016 | 681E | 3E14 | E068 |
| 0000372700 | FF01 | 0836 | FF3D | 0636 | FF3D | 0C36 | FF3D | 0A36 |
| 0000372720 | 1E3D | F268 | 683C | 47DD | E068 | 9A47 | 47E3 | 0000 |
| 0000372740 | C483 | E926 | 0181 | 068E | 7B40 | 8326 | 1E3E | 0049 |
| 0000372760 | 0375 | 45E9 | 8300 | C27E | 75FE | E903 | 003C | 681E |
| 0000373000 | 3CFB | 468D | 16CE | 8D50 | F246 | 5016 | 468D | 16BE |
| 0000373020 | 1E50 | 1468 | 683E | 01E8 | 36FF | 3D08 | 36FF | 3D06 |
| 0000373040 | 36FF | 3D0C | 36FF | 3D0A | 681E | 3CFD | AC68 | 6845 |
| 0000373060 | 45AF | B29A | 0045 | 8300 | 26C4 | 468B | 8B06 | 0856 |
| 0000373100 | 068E | 7B52 | A326 | 0AB0 | 8926 | B216 | 0B0A | 74D0 |
| 0000373120 | E903 | 0010 | 068E | 7B54 | A126 | 373A | 8B26 | 3C16 |
| 0000373140 | E937 | 0039 | 068E | 7B52 | C426 | B01E | 260A | 7F83 |
| 0000373160 | 4E12 | 0374 | 10E9 | 8E00 | 5206 | 267B | B0A1 | 260A |
| 0000373200 | 168B | 0AB2 | 16E9 | 8E00 | 5206 | 267B | 36FF | 0AB2 |
| 0000373220 | FF26 | B036 | 9A0A | 499F | 4560 | C483 | 8E04 | 5606 |
| 0000373240 | 267B | 84A3 | 260A | 1689 | 0A86 | A126 | 0A86 | 0B26 |
| 0000373260 | 8406 | 750A | E903 | 0034 | C426 | 841E | 260A | 47F6 |
| 0000373300 | 0214 | 0375 | 22E9 | 8E00 | 5606 | 267B | 84A1 | 260A |
| 0000373320 | 168B | 0A86 | 068E | 7B4C | A326 | 0AA0 | 8926 | A216 |
| 0000373340 | 9A0A | 29E7 | 45A1 | 00E9 | E900 | 0000 | 78E9 | E900 |
| 0000373360 | 0075 | 232D | 3D00 | 0030 | 0376 | E9E9 | D1FE | 93E0 |
| 0000373400 | FF2E | B5A7 | B448 | 432F | B630 | 9632 | 9647 | 9647 |
| 0000373420 | 9647 | 9647 | AB47 | 1B33 | 6435 | AC39 | 3D3C | 1340 |
| 0000373440 | 5141 | 3041 | 9B42 | 0242 | 4243 | 5937 | 9644 | 9647 |
| 0000373460 | 9647 | 9647 | 9647 | 9647 | 9647 | 9647 | 9647 | 9647 |
| 0000373500 | 9647 | 9647 | 3F47 | 9647 | 9647 | 9647 | 9647 | 9647 |
| 0000373520 | 9647 | 9647 | 9647 | 9647 | 9647 | 9647 | 9647 | 9647 |
| 0000373540 | 9647 | BC47 | CC41 | 8E45 | 4006 | 267B | 3E83 | 456C |
| 0000373560 | 7500 | E903 | 0009 | 7E83 | FEC2 | 0374 | 0FE9 | 8E00 |
| 0000373600 | 4206 | 267B | 3E83 | 3F84 | 7500 | E903 | 0050 | 46C7 |
| 0000373620 | 01C4 | FF00 | CC76 | 76FF | 8DCA | C446 | 5016 | 76FF |
| 0000373640 | FFEC | FC76 | 76FF | 8DFA | CE4E | 5116 | 4E8D | 16F2 |
| 0000373660 | 8D51 | BE4E | 5116 | 681E | 3E14 | EE68 | FF01 | 0836 |
| 0000373700 | FF3D | 0636 | FF3D | 0C36 | FF3D | 0A36 | 9A3D | 3FCC |
| 0000373720 | 0000 | C483 | 8B28 | C446 | 09E9 | E900 | 0006 | 01B8 |
| 0000373740 | E900 | 0000 | 5F5E | ED83 | 8B02 | 1FE5 | 4D5D | 1ECB |
| 0000373760 | 9058 | 5545 | EC8B | 8E1E | 81D8 | 5CEC | 5700 | C756 |
| 0000374000 | FA46 | 3E20 | 5E8C | C7FC | D246 | 0107 | C02B | 4689 |
| 0000374020 | 89BC | BA46 | 068E | 7B40 | 8326 | 873E | 004A | 0375 |
| 0000374040 | 1DE9 | FF00 | 0C36 | FF3D | 0A36 | 8D3D | B046 | 5016 |
| 0000374060 | 449A | 002D | 8300 | 08C4 | 003D | 7400 | E903 | 000F |
| 0000374100 | 068E | 7B42 | 8326 | F93E | 004A | 0375 | 3BE9 | 1E00 |
| 0000374120 | 2768 | 8D3E | BE46 | 5016 | 468D | 16B0 | 8D50 | EA46 |
| 0000374140 | 5016 | 0768 | 1E02 | 5468 | FF41 | 0836 | FF3D | 0636 |
| 0000374160 | FF3D | 0C36 | FF3D | 0A36 | 9A3D | 2D8D | 0000 | C483 |
| 0000374200 | 891E | EA46 | 5689 | E9EC | 0008 | C02B | 4689 | 89EC |
| 0000374220 | EA46 | 5EC4 | 2606 | 7F83 | 3D12 | 0375 | 18E9 | C400 |
| 0000374240 | 065E | 8B26 | 0847 | 8B26 | 0A57 | 068E | 7B46 | A326 |
| 0000374260 | 3848 | 8926 | 4A16 | C438 | 065E | 8B26 | 0C47 | 068E |
| 0000374300 | 7B44 | A326 | 3846 | 5EC4 | 2606 | 478B | E912 | 1925 |
| 0000374320 | 068E | 7B40 | 8326 | E13E | 004A | 0375 | 4BE9 | 8300 |
| 0000374340 | B47E | 75FE | E903 | 0042 | 76FF | FF08 | 0676 | 681E |
| 0000374360 | 3E2E | 468D | 16BE | 8D50 | EA46 | 5016 | 468D | 16B0 |
| 0000374400 | 1E50 | 5468 | 6841 | 0216 | 36FF | 3D08 | 36FF | 3D06 |
| 0000374420 | 36FF | 3D0C | 36FF | 3D0A | 681E | 3E35 | 5D68 | 684C |
| 0000374440 | 4C60 | 639A | 004C | 8300 | 2AC4 | 068E | 7B40 | 8326 |

THU MAR 14 17:52:34 1991 TSLINT.DLL PAGE 138, LINE 8084

| | | | | | | | | |
|---|---|---|---|---|---|---|---|---|
| 0000374460 | 173E | 004C | 0375 | 09E9 | 8300 | B47E | 74FE | E903 |
| 0000374500 | 000F | 068E | 7B42 | 8326 | 893E | 004C | 0375 | B0E9 |
| 0000374520 | C400 | 065E | FF26 | 0277 | FF26 | 9A37 | 7F20 | 4B29 |
| 0000374540 | C483 | 3D04 | 0000 | 0375 | 23E9 | C400 | 065E | FF26 |
| 0000374560 | 0677 | FF26 | 0477 | 209A | BE7F | 834B | 04C4 | 003D |
| 0000374600 | 7500 | E903 | 0008 | 46C7 | 01AC | E900 | 0005 | 46C7 |
| 0000374620 | 00AC | 8D00 | AC5E | CD9A | 5399 | 834B | 08EC | DC8B |
| 0000374640 | 299A | F99B | 9A4B | 6DB2 | 4C08 | C483 | 8908 | B646 |
| 0000374660 | 5689 | FFB8 | BC76 | 76FF | 8DBA | B646 | 5016 | 76FF |
| 0000374700 | FFD2 | FC76 | 76FF | 8DFA | BE4E | 5116 | 4E8D | 16EA |
| 0000374720 | 8D51 | B04E | 5116 | 681E | 4154 | 1868 | FF02 | 0836 |
| 0000374740 | FF3D | 0636 | FF3D | 0C36 | FF3D | 0A36 | 9A3D | 4D2E |
| 0000374760 | 0000 | C483 | 8B28 | B646 | 568B | E9B8 | 3009 | 5FE9 |
| 0000375000 | C400 | 065E | FF26 | 0277 | FF26 | 9A37 | 7F20 | 4BD9 |
| 0000375020 | C483 | 3D04 | 0000 | 0375 | 23E9 | C400 | 065E | FF26 |
| 0000375040 | 0677 | FF26 | 0477 | 209A | 9E7F | 834C | 04C4 | 003D |
| 0000375060 | 7500 | E903 | 0008 | 46C7 | 01AC | E900 | 0005 | 46C7 |
| 0000375100 | 00AC | 8D00 | AC5E | CD9A | 0399 | 834C | 08EC | DC8B |
| 0000375120 | 299A | D99B | 9A4C | 6DB2 | 4CE8 | C483 | E908 | 2FA7 |
| 0000375140 | 068E | 7B40 | 8326 | 713E | 004C | 0375 | 4BE9 | 8300 |
| 0000375160 | B47E | 75FE | E903 | 0042 | 76FF | FF08 | 0676 | 681E |
| 0000375200 | 3E3E | 468D | 16BE | 8D50 | EA46 | 5016 | 468D | 16B0 |
| 0000375220 | 1E50 | 5468 | 6841 | 021B | 36FF | 3D08 | 36FF | 3D06 |
| 0000375240 | 36FF | 3D0C | 36FF | 3D0A | 681E | 3E44 | 1F68 | 6847 |
| 0000375260 | 4722 | 259A | 0047 | 8300 | 2AC4 | 068E | 7B40 | 8326 |
| 0000375300 | DF3E | 0046 | 0375 | 09E9 | 8300 | B47E | 74FE | E903 |
| 0000375320 | 000F | 068E | 7B42 | 8326 | 363E | 0049 | 0375 | B0E9 |
| 0000375340 | C400 | 065E | FF26 | 0277 | FF26 | 9A37 | 7F20 | 4CB9 |
| 0000375360 | C483 | 3D04 | 0000 | 0374 | 1BE9 | C400 | 065E | FF26 |
| 0000375400 | 0677 | FF26 | 0477 | 209A | 4E7F | 834D | 04C4 | 003D |
| 0000375420 | 7500 | E903 | 0008 | 46C7 | 01AC | E900 | 0005 | 46C7 |
| 0000375440 | 00AC | 8D00 | AC5E | CD9A | E399 | 834C | 08EC | DC8B |
| 0000375460 | 299A | 379B | 9A47 | 6DB2 | 4894 | C483 | 8908 | B646 |
| 0000375500 | 5689 | FFB8 | BC76 | 76FF | 8DBA | B646 | 5016 | 76FF |
| 0000375520 | FFD2 | FC76 | 76FF | 8DFA | BE4E | 5116 | 4E8D | 16EA |
| 0000375540 | 8D51 | B04E | 5116 | 681E | 4154 | 1D68 | FF02 | 0836 |
| 0000375560 | FF3D | 0636 | FF3D | 0C36 | FF3D | 0A36 | 9A3D | 497E |
| 0000375600 | 0000 | C483 | 8B28 | B646 | 568B | E9B8 | 2E79 | 5FE9 |
| 0000375620 | C400 | 065E | FF26 | 0277 | FF26 | 9A37 | 7F20 | 46D3 |
| 0000375640 | C483 | 3D04 | 0000 | 0374 | 1BE9 | C400 | 065E | FF26 |
| 0000375660 | 0677 | FF26 | 0477 | 209A | 2E7F | 834E | 04C4 | 003D |
| 0000375700 | 7500 | E903 | 0008 | 46C7 | 01AC | E900 | 0005 | 46C7 |
| 0000375720 | 00AC | 8D00 | AC5E | CD9A | 9399 | 834D | 08EC | DC8B |
| 0000375740 | 299A | 439B | 9A4E | 6DB2 | 4E52 | C483 | E908 | 2E17 |
| 0000375760 | 068E | 7B40 | 8326 | 013E | 004E | 0375 | 4BE9 | 8300 |
| 0000376000 | B47E | 75FE | E903 | 0042 | 76FF | FF08 | 0676 | 681E |
| 0000376020 | 3E4D | 468D | 16BE | 8D50 | EA46 | 5016 | 468D | 16B0 |
| 0000376040 | 1E50 | 5468 | 6841 | 0220 | 36FF | 3D08 | 36FF | 3D06 |
| 0000376060 | 36FF | 3D0C | 36FF | 3D0A | 681E | 3E54 | 3168 | 684F |
| 0000376100 | 4F34 | 379A | 004F | 8300 | 2AC4 | 068E | 7B40 | 8326 |
| 0000376120 | EB3E | 004E | 0375 | 09E9 | 8300 | B47E | 74FE | E903 |
| 0000376140 | 000F | 068E | 7B42 | 8326 | 5D3E | 004F | 0375 | 8AE9 |
| 0000376160 | C400 | 065E | FF26 | 0277 | FF26 | 9A37 | 7F20 | 4EB8 |
| 0000376200 | C483 | 3D04 | 0001 | C01B | D8F7 | 4689 | 8DAC | AC5E |
| 0000376220 | CD9A | 4D99 | 834E | 08EC | DC8B | 299A | CD9B | 9A4E |
| 0000376240 | 6DB2 | 4EDC | C483 | 8908 | B646 | 5689 | FFB8 | BC76 |
| 0000376260 | 76FF | 8DBA | B646 | 5016 | 76FF | FFD2 | FC76 | 76FF |
| 0000376300 | 8DFA | BE4E | 5116 | 4E8D | 16EA | 8D51 | B04E | 5116 |
| 0000376320 | 681E | 4154 | 2168 | FF02 | 0836 | FF3D | 0636 | FF3D |

THU MAR 14 17:52:34 1991 TSLINT.DLL PAGE 139, LINE 8143

| | | | | | | | | |
|---|---|---|---|---|---|---|---|---|
| 0000376340 | 0C36 | FF3D | 0A36 | 9A3D | 4FBA | 0000 | C483 | 8B28 |
| 0000376360 | B646 | 568B | E9B8 | 2D0F | 39E9 | C400 | 065E | FF26 |
| 0000376400 | 0277 | FF26 | 9A37 | 7F20 | 4B0E | C483 | 3D04 | 0001 |
| 0000376420 | C01B | D8F7 | 4689 | 8DAC | AC5E | CD9A | D799 | 834E |
| 0000376440 | 08EC | DC8B | 299A | 499B | 9A4B | 6DB2 | 506E | C483 |
| 0000376460 | E908 | 2CD3 | 068E | 7B40 | 8326 | 453E | 004F | 0375 |
| 0000376500 | 4BE9 | 8300 | B47E | 75FE | E903 | 0042 | 76FF | FF08 |
| 0000376520 | 0676 | 681E | 3E5D | 468D | 16BE | 8D50 | EA46 | 5016 |
| 0000376540 | 468D | 16B0 | 1E50 | 5468 | 6841 | 0225 | 36FF | 3D08 |
| 0000376560 | 36FF | 3D06 | 36FF | 3D0C | 36FF | 3D0A | 681E | 3E68 |
| 0000376600 | 3168 | 6850 | 5034 | 379A | 0050 | 8300 | 2AC4 | 068E |
| 0000376620 | 7B40 | 8326 | EB3E | 004F | 0375 | 09E9 | 8300 | B47E |
| 0000376640 | 74FE | E903 | 000F | 068E | 7B42 | 8326 | 5D3E | 0050 |
| 0000376660 | 0375 | 68E9 | C400 | 065E | FF26 | 0277 | FF26 | C437 |
| 0000376700 | 065E | FF26 | 045F | C483 | 8904 | B646 | 5689 | FFB8 |
| 0000376720 | BC76 | 76FF | 8DBA | B646 | 5016 | 76FF | FFD2 | FC76 |
| 0000376740 | 76FF | 8DFA | BE4E | 5116 | 4E8D | 16EA | 8D51 | B04E |
| 0000376760 | 5116 | 681E | 4154 | 2668 | FF02 | 0836 | FF3D | 0636 |
| 0000377000 | FF3D | 0C36 | FF3D | 0A36 | 9A3D | 50B4 | 0000 | C483 |
| 0000377020 | 8B28 | B646 | 568B | E9B8 | 2BED | 17E9 | C400 | 065E |
| 0000377040 | FF26 | 0277 | FF26 | C437 | 065E | FF26 | 045F | C483 |
| 0000377060 | E904 | 2BD3 | 068E | 7B40 | 8326 | 453E | 0050 | 0375 |
| 0000377100 | 4BE9 | 8300 | B47E | 75FE | E903 | 0042 | 76FF | FF08 |
| 0000377120 | 0676 | 681E | 3E71 | 468D | 16BE | 8D50 | EA46 | 5016 |
| 0000377140 | 468D | 16B0 | 1E50 | 5468 | 6841 | 0229 | 36FF | 3D08 |
| 0000377160 | 36FF | 3D06 | 36FF | 3D0C | 36FF | 3D0A | 681E | 3E7C |
| 0000377200 | CD68 | 684A | 4AD0 | D39A | 004A | 8300 | 2AC4 | 068E |
| 0000377220 | 7B40 | 8326 | DF3E | 0050 | 0375 | 09E9 | 8300 | B47E |
| 0000377240 | 74FE | E903 | 000F | 068E | 7B42 | 8326 | F73E | 0049 |
| 0000377260 | 0375 | 62E9 | FF00 | 0876 | 76FF | 9A06 | 1F53 | 50D0 |
| 0000377300 | C483 | 8904 | B646 | 5689 | FFB8 | BC76 | 76FF | 8DBA |
| 0000377320 | B646 | 5016 | 76FF | FFD2 | FC76 | 76FF | 8DFA | BE4E |
| 0000377340 | 5116 | 4E8D | 16EA | 8D51 | B04E | 5116 | 681E | 4154 |
| 0000377360 | 2A68 | FF02 | 0836 | FF3D | 0636 | FF3D | 0C36 | FF3D |
| 0000377400 | 0A36 | 9A3D | 4B9E | 0000 | C483 | 8B28 | B646 | 568B |
| 0000377420 | E9B8 | 2AF3 | 11E9 | FF00 | 0876 | 76FF | 9A06 | 1F53 |
| 0000377440 | 4B58 | C483 | E904 | 2ADF | 068E | 7B40 | 8326 | CB3E |
| 0000377460 | 0049 | 0375 | 4BE9 | 8300 | B47E | 75FE | E903 | 0042 |
| 0000377500 | 76FF | FF08 | 0676 | 681E | 3E85 | 468D | 16BE | 8D50 |
| 0000377520 | EA46 | 5016 | 468D | 16B0 | 1E50 | 5468 | 6841 | 022D |
| 0000377540 | 36FF | 3D08 | 36FF | 3D06 | 36FF | 3D0C | 36FF | 3D0A |
| 0000377560 | 681E | 3E91 | 7168 | 6852 | 5274 | 779A | 0052 | 8300 |
| 0000377600 | 2AC4 | 068E | 7B40 | 8326 | 2B3E | 0052 | 0375 | 09E9 |
| 0000377620 | 8300 | B47E | 74FE | E903 | 000F | 068E | 7B42 | 8326 |
| 0000377640 | 9D3E | 0052 | 0375 | 8EE9 | C400 | 065E | FF26 | 0677 |
| 0000377660 | FF26 | 0477 | 5EC4 | 2606 | 77FF | 2602 | 37FF | F59A |
| 0000377700 | 8E56 | 8351 | 08C4 | 4689 | 8DAC | AC5E | CD9A | 8999 |
| 0000377720 | 8351 | 08EC | DC8B | 299A | 0D9B | 9A52 | 6DB2 | 51FF |
| 0000377740 | C483 | 8908 | B646 | 5689 | FFB8 | BC76 | 76FF | 8DBA |
| 0000377760 | B646 | 5016 | 76FF | FFD2 | FC76 | 76FF | 8DFA | BE4E |
| 0000400000 | 5116 | 4E8D | 16EA | 8D51 | B04E | 5116 | 681E | 4154 |
| 0000400020 | 2E68 | FF02 | 0836 | FF3D | 0636 | FF3D | 0C36 | FF3D |
| 0000400040 | 0A36 | 9A3D | 52F4 | 0000 | C483 | 8B28 | B646 | 568B |
| 0000400060 | E9B8 | 29D3 | 3DE9 | C400 | 065E | FF26 | 0677 | FF26 |
| 0000400100 | 0477 | 5EC4 | 2606 | 77FF | 2602 | 37FF | F59A | 1C56 |
| 0000400120 | 8352 | 08C4 | 4689 | 8DAC | AC5E | CD9A | 1799 | 8352 |
| 0000400140 | 08EC | DC8B | 299A | 899B | 9A4D | 6DB2 | 4D98 | C483 |
| 0000400160 | E908 | 2993 | 068E | 7B40 | 8326 | 853E | 0052 | 0375 |
| 0000400200 | 4BE9 | 8300 | B47E | 75FE | E903 | 0042 | 76FF | FF08 |

THU MAR 14 17:52:34 1991 TSLINT.DLL PAGE 140, LINE 8202

| | | | | | | | | |
|---|---|---|---|---|---|---|---|---|
| 0000400220 | 0676 | 681E | 3E9A | 468D | 16BE | 8D50 | EA46 | 5016 |
| 0000400240 | 468D | 16B0 | 1E50 | 5468 | 6841 | 0231 | 36FF | 3D08 |
| 0000400260 | 36FF | 3D06 | 36FF | 3D0C | 36FF | 3D0A | 681E | 3EA3 |
| 0000400300 | ED68 | 684D | 4DF0 | F39A | 004D | 8300 | 2AC4 | 068E |
| 0000400320 | 7B40 | 8326 | A73E | 004D | 0375 | 09E9 | 8300 | B47E |
| 0000400340 | 74FE | E903 | 000F | 068E | 7B42 | 8326 | 193E | 004E |
| 0000400360 | 0375 | 62E9 | FF00 | 0876 | 76FF | 9A06 | 7469 | 5310 |
| 0000400400 | C483 | 8904 | B646 | 5689 | FFB8 | BC76 | 76FF | 8DBA |
| 0000400420 | B646 | 5016 | 76FF | FFD2 | FC76 | 76FF | 8DFA | BE4E |
| 0000400440 | 5116 | 4E8D | 16EA | 8D51 | B04E | 5116 | 681E | 4154 |
| 0000400460 | 3268 | FF02 | 0836 | FF3D | D636 | FF3D | 0C36 | FF3D |
| 0000400500 | 0A36 | 9A3D | 4E98 | 0000 | C483 | 8B28 | B646 | 568B |
| 0000400520 | E9B8 | 28B3 | 11E9 | FF00 | 0876 | 76FF | 9A06 | 7469 |
| 0000400540 | 4293 | C483 | E904 | 289F | 068E | 7B40 | 8326 | 793E |
| 0000400560 | 0053 | 0375 | 4BE9 | 8300 | B47E | 75FE | E903 | 0042 |
| 0000400600 | 76FF | FF08 | 0676 | 681E | 3EAC | 468D | 16BE | 8D50 |
| 0000400620 | EA46 | 5016 | 468D | 16B0 | 1E50 | 5468 | 6841 | 0236 |
| 0000400640 | 36FF | 3D08 | 36FF | 3D06 | 36FF | 3D0C | 36FF | 3D0A |
| 0000400660 | 681E | 3EB3 | 5968 | 6854 | 545C | 5F9A | 0054 | 8300 |
| 0000400700 | 2AC4 | 068E | 7B40 | 8326 | 133E | 0054 | 0375 | 09E9 |
| 0000400720 | 8300 | B47E | 74FE | E903 | 000F | 068E | 7B42 | 8326 |
| 0000400740 | 853E | 0054 | 0375 | 62E9 | FF00 | 0876 | 76FF | 9A06 |
| 0000400760 | 77FF | 5404 | C483 | 8904 | B646 | 5689 | FFB8 | BC76 |
| 0000401000 | 76FF | 8DBA | B646 | 5016 | 76FF | FFD2 | FC76 | 76FF |
| 0000401020 | 8DFA | BE4E | 5116 | 4E8D | 16EA | 8D51 | B04E | 5116 |
| 0000401040 | 681E | 4154 | 3768 | FF02 | 0836 | FF3D | 0636 | FF3D |
| 0000401060 | 0C36 | FF3D | 0A36 | 9A3D | 54EB | 0000 | C483 | 8B28 |
| 0000401100 | B646 | 568B | E9B8 | 27BF | 11E9 | FF00 | 0876 | 76FF |
| 0000401120 | 9A06 | 77FF | 54A5 | C483 | E904 | 27AB | 068E | 7B40 |
| 0000401140 | 8326 | 6D3E | 0054 | 0375 | 4BE9 | 8300 | B47E | 75FE |
| 0000401160 | E903 | 0042 | 76FF | FF08 | 0676 | 681E | 3EBC | 468D |
| 0000401200 | 16BE | 8D50 | EA46 | 5016 | 468D | 16B0 | 1E50 | 5468 |
| 0000401220 | 6841 | 023A | 36FF | 3D08 | 36FF | 3D06 | 36FF | 3D0C |
| 0000401240 | 36FF | 3D0A | 681E | 3EC9 | 6B68 | 6855 | 556E | 719A |
| 0000401260 | 0055 | 8300 | 2AC4 | 068E | 7B40 | 8326 | 253E | 0055 |
| 0000401300 | 0375 | 09E9 | 8300 | B47E | 74FE | E903 | 000F | 068E |
| 0000401320 | 7B42 | 8326 | B43E | 0055 | 0375 | 71E9 | C400 | 065E |
| 0000401340 | FF26 | 0277 | FF26 | C437 | 065E | FF26 | 0677 | FF26 |
| 0000401360 | 0477 | 7A9A | 166B | 8355 | 08C4 | 4689 | 89B6 | B856 |
| 0000401400 | 76FF | FFBC | BA76 | 468D | 16B6 | FF50 | D276 | 76FF |
| 0000401420 | FFFC | FA76 | 4E8D | 16BE | 8D51 | EA4E | 5116 | 4E8D |
| 0000401440 | 16B0 | 1E51 | 5468 | 6841 | 023B | 36FF | 3D08 | 36FF |
| 0000401460 | 3D06 | 36FF | 3D0C | 36FF | 3D0A | 0A9A | 0056 | 8300 |
| 0000401500 | 28C4 | 468B | 8BB6 | B856 | BCE9 | E926 | 0020 | 5EC4 |
| 0000401520 | 2606 | 77FF | 2602 | 37FF | 5EC4 | 2606 | 77FF | 2606 |
| 0000401540 | 77FF | 9A04 | 6B7A | 52AE | C483 | E908 | 2699 | 068E |
| 0000401560 | 7B40 | 8326 | 9C3E | 0055 | 0375 | 4BE9 | 8300 | B47E |
| 0000401600 | 75FE | E903 | 0042 | 76FF | FF08 | 0676 | 681E | 3ED2 |
| 0000401620 | 468D | 16BE | 8D50 | EA46 | 5016 | 468D | 16B0 | 1E50 |
| 0000401640 | 5468 | 6841 | 0240 | 36FF | 3D08 | 36FF | 3D06 | 36FF |
| 0000401660 | 3D0C | 36FF | 3D0A | 681E | 3EDC | 7A68 | 6856 | 567D |
| 0000401700 | 809A | 0056 | 8300 | 2AC4 | 5EC4 | 2606 | 77FF | 2606 |
| 0000401720 | 77FF | C404 | 065E | FF26 | 0277 | FF26 | 9A37 | 5B9C |
| 0000401740 | 5692 | C483 | 8E08 | 4006 | 267B | 3E83 | 5634 | 7500 |
| 0000401760 | E903 | 0009 | 7E83 | FEB4 | 0374 | 0FE9 | 8E00 | 4206 |
| 0000402000 | 267B | 3E83 | 5151 | 7500 | E903 | 0061 | 068E | 7B54 |
| 0000402020 | A126 | 373A | 8B26 | 3C16 | 8937 | B646 | 5689 | FFB8 |
| 0000402040 | BC76 | 76FF | 8DBA | B646 | 5016 | 76FF | FFD2 | FC76 |
| 0000402060 | 76FF | 8DFA | BE4E | 5116 | 4E8D | 16EA | 8D51 | B04E |

THU MAR 14 17:52:34 1991 TSLINT.DLL PAGE 141, LINE 8261

| | | | | | | | | |
|---|---|---|---|---|---|---|---|---|
| 0000402100 | 5116 | 681E | 4154 | 4268 | FF02 | 0836 | FF3D | 0636 |
| 0000402120 | FF3D | 0C36 | FF3D | 0A36 | 9A3D | 51D4 | 0000 | C483 |
| 0000402140 | 8B28 | B646 | 568B | E9B8 | 259D | 10E9 | 8E00 | 5406 |
| 0000402160 | 267B | 3AA1 | 2637 | 168B | 373C | 8AE9 | 8E25 | 4006 |
| 0000402200 | 267B | 3E83 | 56BD | 7500 | E903 | 004B | 7E83 | FEB4 |
| 0000402220 | 0375 | 42E9 | FF00 | 0876 | 76FF | 1E06 | E568 | 8D3E |
| 0000402240 | BE46 | 5016 | 468D | 16EA | 8D50 | B046 | 5016 | 681E |
| 0000402260 | 4154 | 4B68 | FF02 | 0836 | FF3D | 0636 | FF3D | 0C36 |
| 0000402300 | FF3D | 0A36 | 1E3D | F568 | 683E | 5125 | 2868 | 9A51 |
| 0000402320 | 512B | 0000 | C483 | 6A2A | FF00 | 0876 | 76FF | 9A06 |
| 0000402340 | 25DB | 5171 | C483 | 8906 | DE46 | 5689 | 8EE0 | 4E06 |
| 0000402360 | 267B | 06C7 | 0AC2 | FFFF | 068E | 7B4C | C02B | A326 |
| 0000402400 | 0AA2 | A326 | 0AA0 | 068E | 7B40 | 8326 | 393E | 0051 |
| 0000402420 | 0375 | 09E9 | 8300 | B47E | 74FE | E903 | 000F | 068E |
| 0000402440 | 7B42 | 8326 | A53E | 0058 | 0375 | 5EE9 | C400 | DE5E |
| 0000402460 | 8B26 | 2607 | 578B | 8902 | B646 | 5689 | FFB8 | BC76 |
| 0000402500 | 76FF | 8DBA | B646 | 5016 | 76FF | FFD2 | FC76 | 76FF |
| 0000402520 | 8DFA | BE4E | 5116 | 4E8D | 16EA | 8D51 | B04E | 5116 |
| 0000402540 | 681E | 4154 | 4F68 | FF02 | 0836 | FF3D | 0636 | FF3D |
| 0000402560 | 0C36 | FF3D | 0A36 | 9A3D | 5902 | 0000 | C483 | 8B28 |
| 0000402600 | B646 | 568B | E9B8 | 247F | 0DE9 | C400 | DE5E | 8B26 |
| 0000402620 | 2607 | 578B | E902 | 246F | 068E | 7B40 | 8326 | 8D3E |
| 0000402640 | 0058 | 0375 | 4BE9 | 8300 | B47E | 75FE | E903 | 0042 |
| 0000402660 | 76FF | FF08 | 0676 | 681E | 3EFE | 468D | 16BE | 8D50 |
| 0000402700 | EA46 | 5016 | 468D | 16B0 | 1E50 | 5468 | 6841 | 0252 |
| 0000402720 | 36FF | 3D08 | 36FF | 3D06 | 36FF | 3D0C | 36FF | 3D0A |
| 0000402740 | 681E | 3F08 | 7968 | 6859 | 597C | 7F9A | 0059 | 8300 |
| 0000402760 | 2AC4 | 5EC4 | 2606 | 078B | 8B26 | 0257 | 068E | 7B52 |
| 0000403000 | A326 | 0AB0 | 8926 | B216 | 0B0A | 74D0 | E903 | 0010 |
| 0000403020 | 068E | 7B54 | A126 | 373A | 8B26 | 3C16 | E937 | 0039 |
| 0000403040 | 068E | 7B52 | C426 | B01E | 260A | 7F83 | 4E12 | 0374 |
| 0000403060 | 10E9 | 8E00 | 5206 | 267B | B0A1 | 260A | 168B | 0AB2 |
| 0000403100 | 16E9 | 8E00 | 5206 | 267B | 36FF | 0AB2 | FF26 | B036 |
| 0000403120 | 9A0A | 499F | 5993 | C483 | 8E04 | 5606 | 267B | 84A3 |
| 0000403140 | 260A | 1689 | 0A86 | FF26 | 8636 | 260A | 36FF | 0A84 |
| 0000403160 | 869A | 7E62 | 8358 | 04C4 | C28E | D88B | 1F8D | 359A |
| 0000403200 | 3699 | 9A58 | 9C92 | 583E | 5E8D | 9AD6 | 9B29 | 517F |
| 0000403220 | 068E | 7B56 | A126 | 0A86 | 0B26 | 8406 | 750A | E903 |
| 0000403240 | 0034 | C426 | 841E | 260A | 47F6 | 0214 | 0375 | 22E9 |
| 0000403260 | 8E00 | 5606 | 267B | 84A1 | 260A | 168B | 0A86 | 068E |
| 0000403300 | 7B4C | A326 | 0AA0 | 8926 | A216 | 9A0A | 29E7 | 58BC |
| 0000403320 | 00E9 | E900 | 0000 | 068E | 7B40 | 8326 | 333E | 0059 |
| 0000403340 | 0375 | 09E9 | 8300 | B47E | 74FE | E903 | 000F | 068E |
| 0000403360 | 7B42 | 8326 | 213E | 005A | 0375 | 68E9 | FF00 | DC76 |
| 0000403400 | 76FF | FFDA | D876 | 76FF | 9AD6 | 6DB2 | 5924 | C483 |
| 0000403420 | 8908 | B646 | 5689 | FFB8 | BC76 | 76FF | 8DBA | B646 |
| 0000403440 | 5016 | 76FF | FFD2 | FC76 | 76FF | 8DFA | BE4E | 5116 |
| 0000403460 | 4E8D | 16EA | 8D51 | B04E | 5116 | 681E | 4154 | 5568 |
| 0000403500 | FF02 | 0836 | FF3D | 0636 | FF3D | 0C36 | FF3D | 0A36 |
| 0000403520 | 9A3D | 53E8 | 0000 | C483 | 8B28 | B646 | 568B | E9B8 |
| 0000403540 | 22A5 | 17E9 | FF00 | DC76 | 76FF | FFDA | D876 | 76FF |
| 0000403560 | 9AD6 | 6DB2 | 5590 | C483 | E908 | 228B | 068E | 7B40 |
| 0000403600 | 8326 | A73E | 0059 | 0375 | 4BE9 | 8300 | B47E | 75FE |
| 0000403620 | E903 | 0042 | 76FF | FF08 | 0676 | 681E | 3F11 | 468D |
| 0000403640 | 16BE | 8D50 | EA46 | 5016 | 468D | 16B0 | 1E50 | 5468 |
| 0000403660 | 6841 | 0258 | 36FF | 3D08 | 36FF | 3D06 | 36FF | 3D0C |
| 0000403700 | 36FF | 3D0A | 681E | 3F17 | F568 | 6859 | 59F8 | FB9A |
| 0000403720 | 0059 | 8300 | 2AC4 | 5EC4 | 2606 | 77FF | 2602 | 37FF |
| 0000403740 | 209A | 697F | 834D | 04C4 | 003D | 7500 | E903 | 01E2 |

THU MAR 14 17:52:34 1991 TSLINT.DLL PAGE 142, LINE 8320

| | | | | | | | | |
|---|---|---|---|---|---|---|---|---|
| 0000403760 | 068E | 7B40 | 8326 | 093E | 005A | 0375 | 53E9 | 8300 |
| 0000404000 | B47E | 75FE | E903 | 004A | 5EC4 | 2606 | 5FC4 | 2604 |
| 0000404020 | 77FF | 2602 | 37FF | 681E | 3F20 | 468D | 16BE | 8D50 |
| 0000404040 | EA46 | 5016 | 468D | 16B0 | 1E50 | 5468 | 6841 | 025A |
| 0000404060 | 36FF | 3D08 | 36FF | 3D06 | 36FF | 3D0C | 36FF | 3D0A |
| 0000404100 | 681E | 3F28 | 6568 | 6853 | 5368 | 6B9A | 0053 | 8300 |
| 0000404120 | 2AC4 | 068E | 7B40 | 8326 | 1F3E | 0053 | 0375 | 09E9 |
| 0000404140 | 8300 | B47E | 74FE | E903 | 000F | 068E | 7B42 | 8326 |
| 0000404160 | 913E | 0053 | 0375 | D5E9 | C400 | 065E | C426 | 045F |
| 0000404200 | 8B26 | 2607 | 578B | 8E02 | 5206 | 267B | B0A3 | 260A |
| 0000404220 | 1689 | 0AB2 | D00B | 0374 | 10E9 | 8E00 | 5406 | 267B |
| 0000404240 | 3AA1 | 2637 | 168B | 373C | 39E9 | 8E00 | 5206 | 267B |
| 0000404260 | 1EC4 | 0AB0 | 8326 | 127F | 744E | E903 | 0010 | 068E |
| 0000404300 | 7B52 | A126 | 0AB0 | 8B26 | B216 | E90A | 0016 | 068E |
| 0000404320 | 7B52 | FF26 | B236 | 260A | 36FF | 0AB0 | 9F9A | 6449 |
| 0000404340 | 835B | 04C4 | 068E | 7B56 | A326 | 0A84 | 8926 | 8616 |
| 0000404360 | 260A | 84A1 | 260A | 168B | 0A86 | 4689 | 89B6 | B856 |
| 0000404400 | 76FF | FFBC | BA76 | 468D | 16B6 | FF50 | D276 | 76FF |
| 0000404420 | FFFC | FA76 | 4E8D | 16BE | 8D51 | EA4E | 5116 | 4E8D |
| 0000404440 | 16B0 | 1E51 | 5468 | 6841 | 025B | 36FF | 3D08 | 36FF |
| 0000404460 | 3D06 | 36FF | 3D0C | 36FF | 3D0A | CF9A | 005C | 8300 |
| 0000404500 | 28C4 | 468B | 8BB6 | B856 | BCE9 | E920 | 0084 | 5EC4 |
| 0000404520 | 2606 | 5FC4 | 2604 | 078B | 8B26 | 0257 | 068E | 7B52 |
| 0000404540 | A326 | 0AB0 | 8926 | B216 | 0B0A | 74D0 | E903 | 0010 |
| 0000404560 | 068E | 7B54 | A126 | 373A | 8B26 | 3C16 | E937 | 0039 |
| 0000404600 | 068E | 7B52 | C426 | B01E | 260A | 7F83 | 4E12 | 0374 |
| 0000404620 | 10E9 | 8E00 | 5206 | 267B | B0A1 | 260A | 168B | 0AB2 |
| 0000404640 | 16E9 | 8E00 | 5206 | 267B | 36FF | 0AB2 | FF26 | B036 |
| 0000404660 | 9A0A | 499F | 5C73 | C483 | 8E04 | 5606 | 267B | 84A3 |
| 0000404700 | 260A | 1689 | 0A86 | A126 | 0A84 | 8B26 | 8616 | E90A |
| 0000404720 | 2035 | 068E | 7B40 | 8326 | EC3E | 005B | 0375 | 54E9 |
| 0000404740 | 8300 | B47E | 75FE | E903 | 004B | 5EC4 | 2606 | 5FC4 |
| 0000404760 | 2604 | 77FF | 2606 | 77FF | 1E04 | 3168 | 8D3F | BE46 |
| 0000405000 | 5016 | 468D | 16EA | 8D50 | B046 | 5016 | 681E | 4154 |
| 0000405020 | 5D68 | FF02 | 0836 | FF3D | 0636 | FF3D | 0C36 | FF3D |
| 0000405040 | 0A36 | 1E3D | 3A68 | 683F | 5DB4 | B76B | 9A5D | 5DBA |
| 0000405060 | 0000 | C483 | 8E2A | 4006 | 267B | 3E83 | 5D6E | 7500 |
| 0000405100 | E903 | 0009 | 7E83 | FEB4 | 0374 | 0FE9 | 8E00 | 4206 |
| 0000405120 | 267B | 3E83 | 56D5 | 7500 | E903 | 00D6 | 5EC4 | 2606 |
| 0000405140 | 5FC4 | 2604 | 478B | 2604 | 578B | 8E06 | 5206 | 267B |
| 0000405160 | B0A3 | 260A | 1689 | 0AB2 | D00B | 0374 | 10E9 | 8E00 |
| 0000405200 | 5406 | 267B | 3AA1 | 2637 | 168B | 373C | 39E9 | 8E00 |
| 0000405220 | 5206 | 267B | 1EC4 | 0AB0 | 8326 | 127F | 744E | E903 |
| 0000405240 | 0010 | 068E | 7B52 | A126 | 0AB0 | 8B26 | B216 | E90A |
| 0000405260 | 0016 | 068E | 7B52 | FF26 | B236 | 260A | 36FF | 0AB0 |
| 0000405300 | 9F9A | 4949 | 835D | 04C4 | 068E | 7B56 | A326 | 0A84 |
| 0000405320 | 8926 | 8616 | 260A | 84A1 | 260A | 168B | 0A86 | 4689 |
| 0000405340 | 89B6 | B856 | 76FF | FFBC | BA76 | 468D | 16B6 | FF50 |
| 0000405360 | D276 | 76FF | FFFC | FA76 | 4E8D | 16BE | 8D51 | EA4E |
| 0000405400 | 5116 | 4E8D | 16B0 | 1E51 | 5468 | 6841 | 025E | 36FF |
| 0000405420 | 3D08 | 36FF | 3D06 | 36FF | 3D0C | 36FF | 3D0A | 289A |
| 0000405440 | 0057 | 8300 | 28C4 | 468B | 8BB6 | B856 | D8E9 | E91E |
| 0000405460 | 0085 | 5EC4 | 2606 | 5FC4 | 2604 | 478B | 2604 | 578B |
| 0000405500 | 8E06 | 5206 | 267B | B0A3 | 260A | 1689 | 0AB2 | D00B |
| 0000405520 | 0374 | 10E9 | 8E00 | 5406 | 267B | 3AA1 | 2637 | 168B |
| 0000405540 | 373C | 39E9 | 8E00 | 5206 | 267B | 1EC4 | 0AB0 | 8326 |
| 0000405560 | 127F | 744E | E903 | 0010 | 068E | 7B52 | A126 | 0AB0 |
| 0000405600 | 8B26 | B216 | E90A | 0016 | 068E | 7B52 | FF26 | B236 |
| 0000405620 | 260A | 36FF | 0AB0 | 9F9A | 0449 | 8358 | 04C4 | 068E |

THU MAR 14 17:52:34 1991 TSLINT.DLL PAGE 143, LINE 8379

| | | | | | | | | |
|---|---|---|---|---|---|---|---|---|
| 0000405640 | 7B56 | A326 | 0A84 | 8926 | 8616 | 260A | 84A1 | 260A |
| 0000405660 | 168B | 0A86 | 50E9 | 8E1E | 4006 | 267B | 3E83 | 574F |
| 0000405700 | 7500 | E903 | 004B | 7E83 | FEB4 | 0375 | 42E9 | FF00 |
| 0000405720 | 0876 | 76FF | 1E06 | 4368 | 8D3F | BE46 | 5016 | 468D |
| 0000405740 | 16EA | 8D50 | B046 | 5016 | 681E | 4154 | 6268 | FF02 |
| 0000405760 | 0836 | FF3D | 0636 | FF3D | 0C36 | FF3D | 0A36 | 1E3D |
| 0000406000 | 5768 | 683F | 5795 | 9868 | 9A57 | 579B | 0000 | C483 |
| 0000406020 | C42A | 065E | 8B26 | 2607 | 578B | 8E02 | 5206 | 267B |
| 0000406040 | B0A3 | 260A | 1689 | 0AB2 | D00B | 0374 | 10E9 | 8E00 |
| 0000406060 | 5406 | 267B | 3AA1 | 2637 | 168B | 373C | 39E9 | 8E00 |
| 0000406100 | 5206 | 267B | 1EC4 | 0AB0 | 8326 | 127F | 744E | E903 |
| 0000406120 | 0010 | 068E | 7B52 | A126 | 0AB0 | 8B26 | B216 | E90A |
| 0000406140 | 0016 | 068E | 7B52 | FF26 | B236 | 260A | 36FF | 0AB0 |
| 0000406160 | 9F9A | 8F49 | 835A | 04C4 | 068E | 7B56 | A326 | 0A84 |
| 0000406200 | 8926 | 8616 | 260A | 36FF | 0A86 | FF26 | 8436 | 9A0A |
| 0000406220 | 6514 | 5823 | C483 | 8904 | E646 | 5689 | C4E8 | 065E |
| 0000406240 | C426 | 045F | 8326 | 127F | 744C | E903 | 0111 | 5EC4 |
| 0000406260 | 2606 | 5FC4 | 2604 | 478B | 2604 | 578B | 8906 | F646 |
| 0000406300 | 5689 | 8EF8 | 6606 | 267B | 3E83 | 3742 | 7400 | E903 |
| 0000406320 | 00EA | 1E8D | 7B5E | 319A | 3199 | 8E58 | 6806 | 267B |
| 0000406340 | 1EC4 | 0C66 | C426 | 8D1F | 9A1F | 9935 | 5EA1 | 1D9A |
| 0000406360 | D19F | 755E | E903 | 0006 | 01B8 | E900 | 0003 | 00B8 |
| 0000406400 | C400 | 065E | C426 | 045F | 8026 | 107F | 1B01 | 41C9 |
| 0000406420 | C133 | 003D | 7500 | E903 | 00A2 | 1E8D | 7B5E | 319A |
| 0000406440 | E499 | 8E5E | 6806 | 267B | 1EC4 | 0C66 | C426 | 8D1F |
| 0000406460 | 9A1F | 9935 | 5EE9 | 1D9A | 3B9F | 755F | E903 | 0006 |
| 0000406500 | 01B8 | E900 | 0003 | 00B8 | 5000 | 5EC4 | 2606 | 5FC4 |
| 0000406520 | 2604 | 77FF | 2602 | 37FF | 389A | D220 | 835F | 06C4 |
| 0000406540 | 5EC4 | 2606 | 5FC4 | 2604 | 4789 | 2604 | 5789 | C406 |
| 0000406560 | 065E | C426 | 045F | 8B26 | 0447 | 8B26 | 0657 | 4689 |
| 0000406600 | 89F6 | F856 | 1E8D | 7B5E | 319A | 4E99 | 8E5F | 6806 |
| 0000406620 | 267B | 1EC4 | 0C66 | C426 | 8D1F | 9A1F | 9935 | 5F53 |
| 0000406640 | 1D9A | EB9F | 755F | E903 | 0005 | 01B0 | 02E9 | B000 |
| 0000406660 | C400 | 065E | C426 | 045F | 8826 | 1047 | E9E9 | C400 |
| 0000406700 | 065E | 8B26 | 0447 | 8B26 | 0657 | 068E | 7B52 | A326 |
| 0000406720 | 0AB0 | 8926 | B216 | 0B0A | 74D0 | E903 | 0010 | 068E |
| 0000406740 | 7B54 | A126 | 373A | 8B26 | 3C16 | E937 | 0039 | 068E |
| 0000406760 | 7B52 | C426 | B01E | 260A | 7F83 | 4E12 | 0374 | 10E9 |
| 0000407000 | 8E00 | 5206 | 267B | B0A1 | 260A | 168B | 0AB2 | 16E9 |
| 0000407020 | 8E00 | 5206 | 267B | 36FF | 0AB2 | FF26 | B036 | 9A0A |
| 0000407040 | 499F | 602F | C483 | 8E04 | 5606 | 267B | 84A3 | 260A |
| 0000407060 | 1689 | 0A86 | 1E8D | 7B5E | 319A | FE99 | 8E5F | 6806 |
| 0000407100 | 267B | 1EC4 | 0C66 | C426 | 8D1F | 9A1F | 9935 | 6003 |
| 0000407120 | 1D9A | E79F | 7560 | E903 | 0006 | 01B8 | E900 | 0003 |
| 0000407140 | 00B8 | 5000 | 068E | 7B56 | FF26 | 8636 | 260A | 36FF |
| 0000407160 | 0A84 | 149A | 8065 | 8360 | 04C4 | 5052 | 2E9A | 531C |
| 0000407200 | 8360 | 06C4 | 4689 | 89F6 | F856 | 468B | 0BF8 | F646 |
| 0000407220 | 0374 | 13E9 | 1E00 | 6068 | 683F | 0272 | 681E | 3F70 |
| 0000407240 | B69A | 16B3 | 8361 | 0AC4 | 006A | 006A | 5EC4 | 26E6 |
| 0000407260 | 77FF | 6A0C | C400 | E65E | FF26 | 0C77 | 5EC4 | 26E6 |
| 0000407300 | 77FF | 260A | 77FF | FF08 | F876 | 76FF | 9AF6 | 8F74 |
| 0000407320 | 60DC | C483 | 8912 | D446 | 7E83 | FFD4 | 0374 | 06E9 |
| 0000407340 | B800 | 0001 | 03E9 | B800 | 0000 | 5EC4 | 8906 | AC46 |
| 0000407360 | 8326 | 127F | 741E | E903 | 0006 | 01B8 | E900 | 0003 |
| 0000407400 | 00B8 | 3300 | AC46 | 4689 | C4D4 | E65E | F626 | 1447 |
| 0000407420 | 7502 | E903 | 001B | 468B | 8BE6 | E856 | 068E | 7B4C |
| 0000407440 | A326 | 0AA0 | 8926 | A216 | 9A0A | 29E7 | 60F6 | 00E9 |
| 0000407460 | 8D00 | D45E | CD9A | F199 | 8360 | D8EC | DC8B | 299A |
| 0000407500 | 899B | 9A5E | 6DB2 | 6208 | C483 | E908 | 1AB9 | 681E |

THU MAR 14 17:52:34 1991 TSLINT.DLL PAGE 144, LINE 8438

| | | | | | | | | |
|---|---|---|---|---|---|---|---|---|
| 0000407520 | 3F8C | 5EC4 | 2606 | 1FC4 | FF26 | 0277 | FF26 | 1E37 |
| 0000407540 | B068 | 9A3F | B3B6 | 61D8 | C483 | 8E0C | 4006 | 267B |
| 0000407560 | 3E83 | 5B89 | 7500 | E903 | 004B | 7E83 | FEB4 | 0375 |
| 0000407600 | 42E9 | FF00 | 0876 | 76FF | 1E06 | E768 | 8D3F | BE46 |
| 0000407620 | 5016 | 468D | 16EA | 8D50 | B046 | 5016 | 681E | 4154 |
| 0000407640 | 8168 | FF02 | 0836 | FF3D | 0636 | FF3D | 0C36 | FF3D |
| 0000407660 | 0A36 | 1E3D | F168 | 683F | 5BD8 | DB68 | 9A5B | 5BDE |
| 0000407700 | 0000 | C483 | C42A | 065E | 8B26 | 0447 | 8B26 | 0657 |
| 0000407720 | 068E | 7B52 | A326 | 0AB0 | 8926 | B216 | 0B0A | 74D0 |
| 0000407740 | E903 | 0010 | 068E | 7B54 | A126 | 373A | 8B26 | 3C16 |
| 0000407760 | E937 | 0039 | 068E | 7B52 | C426 | B01E | 260A | 7F83 |
| 0000410000 | 4E12 | 0374 | 10E9 | 8E00 | 5206 | 267B | B0A1 | 260A |
| 0000410020 | 168B | 0AB2 | 16E9 | 8E00 | 5206 | 267B | 36FF | 0AB2 |
| 0000410040 | FF26 | B036 | 9A0A | 499F | 5E23 | C483 | 8E04 | 5606 |
| 0000410060 | 267B | 84A3 | 260A | 1689 | 0A86 | A126 | 0A84 | 8B26 |
| 0000410100 | 8616 | 890A | F246 | 5689 | 6AF4 | C401 | 065E | FF26 |
| 0000410120 | 0277 | FF26 | 9A37 | 25DB | 621C | C483 | 8906 | DE46 |
| 0000410140 | 5689 | FFE0 | F476 | 76FF | 9AF2 | 6983 | 622E | C483 |
| 0000410160 | C404 | DE5E | 8926 | 2607 | 5789 | 9A02 | 29E7 | 5E42 |
| 0000410200 | 068E | 7B4E | 8326 | C23E | 000A | 0374 | 2CE9 | 8E00 |
| 0000410220 | 5006 | 267B | 1EC4 | 0C76 | C426 | 261F | 77FF | 8E0C |
| 0000410240 | 5006 | 267B | 1EC4 | 0C76 | C426 | 261F | 77FF | 260A |
| 0000410260 | 77FF | 9A08 | 11C1 | 6025 | C483 | 8E06 | 4E06 | 267B |
| 0000410300 | 06C7 | 0AC2 | FFFF | 068E | 7B40 | 8326 | 0F3E | 0063 |
| 0000410320 | 0375 | 09E9 | 8300 | B47E | 74FE | E903 | 000F | 068E |
| 0000410340 | 7B42 | 8326 | 273E | 0063 | 0375 | 5EE9 | C400 | DE5E |
| 0000410360 | 8B26 | 2607 | 578B | 8902 | B646 | 5689 | FFB8 | BC76 |
| 0000410400 | 76FF | 8DBA | B646 | 5016 | 76FF | FFD2 | FC76 | 76FF |
| 0000410420 | 8DFA | BE4E | 5116 | 4E8D | 16EA | 8D51 | B04E | 5116 |
| 0000410440 | 681E | 4154 | 8968 | FF02 | 0836 | FF3D | 0636 | FF3D |
| 0000410460 | 0C36 | FF3D | 0A36 | 9A3D | 637E | 0000 | C483 | 8B28 |
| 0000410500 | B646 | 568B | E9B8 | 18BF | 0DE9 | C400 | DE5E | 8B26 |
| 0000410520 | 2607 | 578B | E902 | 18AF | 068E | 7B40 | 8326 | 223E |
| 0000410540 | 0061 | 0375 | 09E9 | 8300 | B47E | 74FE | E903 | 000F |
| 0000410560 | 068E | 7B42 | 8326 | 043E | 005C | 0375 | 62E9 | FF00 |
| 0000410600 | 0876 | 76FF | 9A06 | 8788 | 639A | C483 | 8904 | B646 |
| 0000410620 | 5689 | FFB8 | BC76 | 76FF | 8DBA | B646 | 5016 | 76FF |
| 0000410640 | FFD2 | FC76 | 76FF | 8DFA | BE4E | 5116 | 4EBD | 16EA |
| 0000410660 | 8D51 | B04E | 5116 | 681E | 4154 | 9668 | FF02 | 0836 |
| 0000410700 | FF3D | 0636 | FF3D | 0C36 | FF3D | 0A36 | 9A3D | 5AEB |
| 0000410720 | 0000 | C483 | 8B28 | B646 | 568B | E9B8 | 1829 | 11E9 |
| 0000410740 | FF00 | 0876 | 76FF | 9A06 | 8788 | 64A4 | C483 | E904 |
| 0000410760 | 1815 | 9DE9 | 2D00 | 0007 | 443D | 7600 | E903 | 0092 |
| 0000411000 | E0D1 | 2E93 | A7FF | 63B8 | 562D | 6442 | 6308 | 6308 |
| 0000411020 | 6308 | 6308 | 5748 | 562D | 611B | 6308 | 6308 | 6308 |
| 0000411040 | 6308 | 6308 | 4A80 | 4C10 | 6442 | 6442 | 6442 | 6442 |
| 0000411060 | 6442 | 6442 | 4DA0 | 5D67 | 5D67 | 6442 | 6442 | 6442 |
| 0000411100 | 6442 | 6442 | 6442 | 6442 | 6442 | 562D | 6442 | 6442 |
| 0000411120 | 6442 | 6442 | 6442 | 6442 | 6442 | 6442 | 6442 | 6442 |
| 0000411140 | 6442 | 6442 | 6442 | 6442 | 551E | 6442 | 6442 | 6442 |
| 0000411160 | 6442 | 6442 | 562D | 562D | 4EE4 | 6442 | 50D8 | 6442 |
| 0000411200 | 60FE | 540C | 4FE4 | 5318 | 5318 | 5224 | 592C | 6442 |
| 0000411220 | 6308 | 5EC4 | 2606 | 078B | 8B26 | 0257 | 068E | 7B52 |
| 0000411240 | A326 | 0AB0 | 8926 | B216 | 0B0A | 74D0 | E903 | 0010 |
| 0000411260 | 068E | 7B54 | A126 | 373A | BB26 | 3C16 | E937 | 0039 |
| 0000411300 | 068E | 7B52 | C426 | B01E | 260A | 7F83 | 4E12 | 0374 |
| 0000411320 | 10E9 | 8E00 | 5206 | 267B | B0A1 | 260A | 168B | 0AB2 |
| 0000411340 | 16E9 | 8E00 | 5206 | 267B | 36FF | 0AB2 | FF26 | B036 |
| 0000411360 | 9A0A | 499F | 6528 | C483 | 8E04 | 5606 | 267B | 84A3 |

THU MAR 14 17:52:34 1991 TSLINT.DLL PAGE 145, LINE 8497

| | | | | | | | | |
|---|---|---|---|---|---|---|---|---|
| 0000411400 | 260A | 1689 | 0A86 | A126 | 0A84 | 8B26 | 8616 | 890A |
| 0000411420 | E646 | 5689 | C4E8 | 065E | 8B26 | 0447 | 8B26 | 0657 |
| 0000411440 | 068E | 7B52 | A326 | 0AB0 | 8926 | B216 | 0B0A | 74D0 |
| 0000411460 | E903 | 0010 | 068E | 7B54 | A126 | 373A | 8B26 | 3C16 |
| 0000411500 | E937 | 0039 | 068E | 7B52 | C426 | B01E | 260A | 7F83 |
| 0000411520 | 4E12 | 0374 | 10E9 | 8E00 | 5206 | 267B | B0A1 | 260A |
| 0000411540 | 168B | 0AB2 | 16E9 | 8E00 | 5206 | 267B | 36FF | 0AB2 |
| 0000411560 | FF26 | B036 | 9A0A | 499F | 5F0B | C483 | 8E04 | 5606 |
| 0000411600 | 267B | 84A3 | 260A | 1689 | 0A86 | A126 | 0A84 | 8B26 |
| 0000411620 | 8616 | 890A | E246 | 5689 | C4E4 | 065E | 8B26 | 1247 |
| 0000411640 | 6AE9 | 8E0A | 4006 | 267B | 3E83 | 627D | 7500 | E903 |
| 0000411660 | 004B | 7E83 | FEB4 | 0375 | 42E9 | FF00 | 0876 | 76FF |
| 0000411700 | 1E06 | FA68 | 8D3F | BE46 | 5016 | 468D | 16EA | 8D50 |
| 0000411720 | B046 | 5016 | 681E | 4154 | A368 | FF02 | 0836 | FF3D |
| 0000411740 | 0636 | FF3D | 0C36 | FF3D | 0A36 | 1E3D | 0468 | 6840 |
| 0000411760 | 6168 | 6B68 | 9A61 | 616E | 0000 | C483 | FF2A | E876 |
| 0000412000 | 76FF | 9AE6 | 6514 | 65CA | C483 | 8904 | E646 | 5689 |
| 0000412020 | FFE8 | E476 | 76FF | 9AE2 | 6514 | 65DA | C483 | 8904 |
| 0000412040 | E246 | 5689 | 6AE4 | 9A4E | B2A6 | 6266 | C483 | 8902 |
| 0000412060 | F246 | 5689 | C4F4 | F25E | C626 | 1447 | C412 | E25E |
| 0000412100 | 8B26 | 0C47 | 5EC4 | 26E6 | 4703 | C40C | F25E | 8926 |
| 0000412120 | 0C47 | 5EC4 | 26F2 | 47C6 | 010E | 529A | 38E3 | 5063 |
| 0000412140 | 068E | 7B6A | A026 | 2670 | C450 | F25E | 8B26 | 0C47 |
| 0000412160 | 5040 | 879A | 53AC | 8367 | 06C4 | 5EC4 | 26F2 | 4789 |
| 0000412200 | 2608 | 5789 | C40A | F25E | 8B26 | 0A47 | 0B26 | 0847 |
| 0000412220 | 0374 | 0CE9 | 1E00 | 0D68 | 9A40 | B3B6 | 666C | C483 |
| 0000412240 | 8E04 | 4006 | 267B | 3E83 | 6787 | 7500 | E903 | 006B |
| 0000412260 | 7E83 | FEB4 | 0375 | 62E9 | 9A00 | F7E4 | 667E | 5052 |
| 0000412300 | 5EC4 | 26F2 | 77FF | 260A | 77FF | 9A08 | F91E | 6819 |
| 0000412320 | C483 | 5004 | 5EC4 | 26F2 | 77FF | 260A | 77FF | 1E08 |
| 0000412340 | 1C68 | 8D40 | BE46 | 5016 | 468D | 16EA | 8D50 | B046 |
| 0000412360 | 5016 | 681E | 4154 | AB68 | FF02 | 0836 | FF3D | 0636 |
| 0000412400 | FF3D | 0C36 | FF3D | 0A36 | 1E3D | 2A68 | 6840 | 68C8 |
| 0000412420 | CB68 | 9A68 | 68CE | 0000 | C483 | C430 | E65E | FF26 |
| 0000412440 | 0C77 | 5EC4 | 26E6 | 77FF | 260A | 77FF | C408 | F25E |
| 0000412460 | FF26 | 0A77 | FF26 | 0877 | 2E9A | 1966 | 8367 | 0AC4 |
| 0000412500 | 5EC4 | 26E2 | 77FF | C40C | E25E | FF26 | 0A77 | FF26 |
| 0000412520 | 0877 | 5EC4 | 26F2 | 478B | 2608 | 578B | C40A | E65E |
| 0000412540 | 0326 | 0C47 | 5052 | 2E9A | 0D66 | 8369 | 0AC4 | 5EC4 |
| 0000412560 | 26F2 | 778B | C40C | F25E | C426 | 085F | C626 | 0000 |
| 0000412600 | 5EC4 | 26E6 | 47F6 | 0214 | 0375 | 1BE9 | 8B00 | E646 |
| 0000412620 | 568B | 8EE8 | 4C06 | 267B | A0A3 | 260A | 1689 | 0AA2 |
| 0000412640 | E79A | 7B29 | E967 | 0000 | 5EC4 | 26E2 | 47F6 | 0214 |
| 0000412660 | 0375 | 1BE9 | 8B00 | E246 | 568B | 8EE4 | 4C06 | 267B |
| 0000412700 | A0A3 | 260A | 1689 | 0AA2 | E79A | 4429 | E968 | 0000 |
| 0000412720 | 068E | 7B40 | 8326 | 823E | 0068 | 0375 | 09E9 | 8300 |
| 0000412740 | B47E | 74FE | E903 | 000F | 068E | 7B42 | 8326 | F43E |
| 0000412760 | 0068 | 0375 | 5AE9 | 8B00 | F246 | 568B | 89F4 | B646 |
| 0000413000 | 5689 | FFB8 | BC76 | 76FF | 8DBA | B646 | 5016 | 76FF |
| 0000413020 | FFD2 | FC76 | 76FF | 8DFA | BE4E | 5116 | 4E8D | 16EA |
| 0000413040 | 8D51 | B04E | 5116 | 681E | 4154 | B168 | FF02 | 0836 |
| 0000413060 | FF3D | 0636 | FF3D | 0C36 | FF3D | 0A36 | 9A3D | 6962 |
| 0000413100 | 0000 | C483 | 8B28 | B646 | 568B | E9B8 | 13B9 | 09E9 |
| 0000413120 | 8B00 | F246 | 568B | E9F4 | 13AD | 76FF | FFE4 | E276 |
| 0000413140 | 76FF | FFE8 | E676 | 509A | 0D84 | 8366 | 08C4 | 4689 |
| 0000413160 | C4AE | E65E | F626 | 1447 | 7502 | E903 | 001B | 468B |
| 0000413200 | 8BE6 | E856 | 068E | 7B4C | A326 | 0AA0 | 8926 | A216 |
| 0000413220 | 9A0A | 29E7 | 686C | 00E9 | C400 | E25E | F626 | 1447 |
| 0000413240 | 7502 | E903 | 001B | 468B | 8BE2 | E456 | 068E | 7B4C |

THU MAR 14 17:52:34 1991 TSLINT.DLL PAGE 146, LINE 8556

| | | | | | | | | |
|---|---|---|---|---|---|---|---|---|
| 0000413260 | A326 | 0AAD | 8926 | A216 | 9A0A | 29E7 | 691C | 00E9 |
| 0000413300 | C400 | 065E | 8B26 | 1247 | 1DE9 | 8E07 | 4006 | 267B |
| 0000413320 | 3E83 | 68DC | 7500 | E903 | 004B | 7E83 | FEB4 | 0375 |
| 0000413340 | 42E9 | FF00 | 0876 | 76FF | 1E06 | 3368 | 8D40 | BE46 |
| 0000413360 | 5016 | 468D | 16EA | 8D50 | B046 | 5016 | 681E | 4154 |
| 0000413400 | BE68 | FF02 | 0836 | FF3D | 0636 | FF3D | 0C36 | FF3D |
| 0000413420 | 0A36 | 1E3D | 3C68 | 6840 | 65A0 | A368 | 9A65 | 65A6 |
| 0000413440 | 0000 | C483 | 8E2A | 4006 | 267B | 3E83 | 69A4 | 7500 |
| 0000413460 | E903 | 0009 | 7E83 | FEB4 | 0374 | 0FE9 | 8E00 | 4206 |
| 0000413500 | 267B | 3E83 | 6295 | 7500 | E903 | 0079 | 7E83 | 01AE |
| 0000413520 | C01B | D8F7 | 4689 | 8DAC | AC5E | CD9A | 1799 | 8369 |
| 0000413540 | 08EC | DC8B | 299A | 869B | 9A69 | 6DB2 | 6995 | C483 |
| 0000413560 | 8908 | B646. | 5689 | FFB8 | BC76 | 76FF | 8DBA | B646 |
| 0000413600 | 5016 | 76FF | FFD2 | FC76 | 76FF | 8DFA | BE4E | 5116 |
| 0000413620 | 4E8D | 16EA | 8D51 | B04E | 5116 | 681E | 4154 | BF68 |
| 0000413640 | FF02 | 0836 | FF3D | 0636 | FF3D | 0C36 | FF3D | 0A36 |
| 0000413660 | 9A3D | 62E8 | 0000 | C483 | 8B28 | B646 | 568B | E9B8 |
| 0000413700 | 1245 | 28E9 | 8300 | AE7E | 1B01 | F7C0 | 89D8 | AC46 |
| 0000413720 | 5E8D | 9AAC | 99CD | 6990 | EC83 | 8B08 | 9ADC | 9B29 |
| 0000413740 | 5E9C | B29A | B66D | 8365 | 08C4 | 1AE9 | 8E12 | 4006 |
| 0000413760 | 267B | 3E83 | 655A | 7500 | E903 | 004B | 7E83 | FEB4 |
| 0000414000 | 0375 | 42E9 | FF00 | 0876 | 76FF | 1E06 | 4568 | 8D40 |
| 0000414020 | BE46 | 5016 | 468D | 16EA | 8D50 | B046 | 5016 | 681E |
| 0000414040 | 4154 | C168 | FF02 | 0836 | FF3D | 0636 | FF3D | 0C36 |
| 0000414060 | FF3D | 0A36 | 1E3D | 5268 | 6840 | 6B0A | 0D68 | 9A6B |
| 0000414100 | 6B10 | 0000 | C483 | 8E2A | 4006 | 267B | 3E83 | 6AC4 |
| 0000414120 | 7500 | E903 | 0009 | 7E83 | FEB4 | 0374 | 0FE9 | 8E00 |
| 0000414140 | 4206 | 267B | 3E83 | 6B36 | 7500 | E903 | 0078 | 7E83 |
| 0000414160 | 01AE | C01B | 8940 | AC46 | 5E8D | 9AAC | 99CD | 6A38 |
| 0000414200 | EC83 | 8B08 | 9ADC | 9B29 | 6AA6 | B29A | B56D | 836A |
| 0000414220 | 08C4 | 4689 | 89B6 | B856 | 76FF | FFBC | BA76 | 468D |
| 0000414240 | 16B6 | FF50 | D276 | 76FF | FFFC | FA76 | 4E8D | 16BE |
| 0000414260 | 8D51 | EA4E | 5116 | 4E8D | 16B0 | 1E51 | 5468 | 6841 |
| 0000414300 | 02C2 | 36FF | 3D08 | 36FF | 3D06 | 36FF | 3D0C | 36FF |
| 0000414320 | 3D0A | AE9A | 006B | 8300 | 28C4 | 468B | 8BB6 | B856 |
| 0000414340 | 24E9 | E911 | 0027 | 7E83 | 01AE | C01B | 8940 | AC46 |
| 0000414360 | 5E8D | 9AAC | 99CD | 6AB0 | EC83 | 8B08 | 9ADC | 9B29 |
| 0000414400 | 6B59 | B29A | 686D | 836B | 08C4 | FAE9 | 8E10 | 4006 |
| 0000414420 | 267B | 3E83 | 6B1E | 7500 | E903 | 004B | 7E83 | FEB4 |
| 0000414440 | 0375 | 42E9 | FF00 | 0876 | 76FF | 1E06 | 5B68 | 8D40 |
| 0000414460 | BE46 | 5016 | 468D | 16EA | 8D50 | B046 | 5016 | 681E |
| 0000414500 | 4154 | C468 | FF02 | 0836 | FF3D | 0636 | FF3D | 0C36 |
| 0000414520 | FF3D | 0A36 | 1E3D | 6868 | 6840 | 6C40 | 4368 | 9A6C |
| 0000414540 | 6C46 | 0000 | C483 | 8E2A | 4006 | 267B | 3E83 | 6BFA |
| 0000414560 | 7500 | E903 | 0009 | 7E83 | FEB4 | 0374 | 0FE9 | 8E00 |
| 0000414600 | 4206 | 267B | 3E83 | 6C6C | 7500 | E903 | 0083 | 7E83 |
| 0000414620 | 00AE | 037C | 06E9 | B800 | 0001 | 03E9 | B800 | 0000 |
| 0000414640 | 4689 | 8DAC | AC5E | CD9A | 6399 | 836B | 08EC | DC8B |
| 0000414660 | 299A | DC9B | 9A6B | 6DB2 | 6BEB | C483 | 8908 | B646 |
| 0000414700 | 5689 | FFB8 | BC76 | 76FF | 8DBA | B646 | 5016 | 76FF |
| 0000414720 | FFD2 | FC76 | 76FF | 8DFA | BE4E | 5116 | 4E8D | 16EA |
| 0000414740 | 8D51 | B04E | 5116 | 681E | 4154 | C568 | FF02 | 0836 |
| 0000414760 | FF3D | 0636 | FF3D | 0C36 | FF3D | 0A36 | 9A3D | 6CE4 |
| 0000415000 | 0000 | C483 | 8B28 | B646 | 568B | E9B8 | 0FF9 | 32E9 |
| 0000415020 | 8300 | AE7E | 7C00 | E903 | 0006 | 01B8 | E900 | 0003 |
| 0000415040 | 00B8 | 8900 | AC46 | 5E8D | 9AAC | 99CD | 6BE6 | EC83 |
| 0000415060 | 8B08 | 9ADC | 9B29 | 6C8F | B29A | 9E6D | 836C | 08C4 |
| 0000415100 | C4E9 | 8E0F | 4006 | 267B | 3E83 | 6C54 | 7500 | E903 |
| 0000415120 | 004B | 7E83 | FEB4 | 0375 | 42E9 | FF00 | 0876 | 76FF |

THU MAR 14 17:52:34 1991 TSLINT.DLL PAGE 147, LINE 8615

| | | | | | | | | |
|---|---|---|---|---|---|---|---|---|
| 0000415140 | 1E06 | 7168 | 8D40 | BE46 | 5016 | 468D | 16EA | 8D50 |
| 0000415160 | B046 | 5016 | 681E | 4154 | C768 | FF02 | 0836 | FF3D |
| 0000415200 | 0636 | FF3D | 0C36 | FF3D | 0A36 | 1E3D | 8168 | 6840 |
| 0000415220 | 66BE | C168 | 9A66 | 66C4 | 0000 | C483 | 8E2A | 4006 |
| 0000415240 | 267B | 3E83 | 6D30 | 7500 | E903 | 0009 | 7E83 | FEB4 |
| 0000415260 | 0374 | 0FE9 | 8E00 | 4206 | 267B | 3E83 | 679F | 7500 |
| 0000415300 | E903 | 0083 | 7E83 | 00AE | 037F | 06E9 | B800 | 0001 |
| 0000415320 | 03E9 | B800 | 0000 | 4689 | 8DAC | AC5E | CD9A | 9999 |
| 0000415340 | 836C | 08EC | DC8B | 299A | 129B | 9A6D | 6DB2 | 6D21 |
| 0000415360 | C483 | 8908 | B646 | 5689 | FFB8 | BC76 | 76FF | 8DBA |
| 0000415400 | B646 | 5016 | 76FF | FFD2 | FC76 | 76FF | 8DFA | BE4E |
| 0000415420 | 5116 | 4E8D | 16EA | 8D51 | B04E | 5116 | 681E | 4154 |
| 0000415440 | C868 | FF02 | 0836 | FF3D | 0636 | FF3D | 0C36 | FF3D |
| 0000415460 | 0A36 | 9A3D | 67EE | 0000 | C483 | 8B28 | B646 | 568B |
| 0000415500 | E9B8 | 0EC3 | 32E9 | 8300 | AE7E | 7F00 | E903 | 0006 |
| 0000415520 | 01B8 | E900 | 0003 | 00B8 | 8900 | AC46 | 5E8D | 9AAC |
| 0000415540 | 99CD | 6D1C | EC83 | 8B08 | 9ADC | 9B29 | 66EB | B29A |
| 0000415560 | 256D | 8366 | 08C4 | 8EE9 | 8E0E | 4006 | 267B | 3E83 |
| 0000415600 | 6658 | 7500 | E903 | 004B | 7E83 | FEB4 | 0375 | 42E9 |
| 0000415620 | FF00 | 0876 | 76FF | 1E06 | 8A68 | 8D40 | BE46 | 5016 |
| 0000415640 | 468D | 16EA | 8D50 | B046 | 5016 | 681E | 4154 | CA68 |
| 0000415660 | FF02 | 0836 | FF3D | 0636 | FF3D | 0C36 | FF3D | 0A36 |
| 0000415700 | 1E3D | 9D68 | 6840 | 6EAC | AF68 | 9A6E | 6EB2 | 0000 |
| 0000415720 | C483 | 8E2A | 4006 | 267B | 3E83 | 6E66 | 7500 | E903 |
| 0000415740 | 0009 | 7E83 | FEB4 | 0374 | 0FE9 | 8E00 | 4206 | 267B |
| 0000415760 | 3E83 | 6ED8 | 7500 | E903 | 0083 | 7E83 | 00AE | 037E |
| 0000416000 | 06E9 | B800 | 0001 | 03E9 | B800 | 0000 | 4689 | 8DAC |
| 0000416020 | AC5E | CD9A | CF99 | 836D | 08EC | DC8B | 299A | 489B |
| 0000416040 | 9A6E | 6DB2 | 6E57 | C483 | 8908 | B646 | 5689 | FFB8 |
| 0000416060 | BC76 | 76FF | 8DBA | B646 | 5016 | 76FF | FFD2 | FC76 |
| 0000416100 | 76FF | 8DFA | BE4E | 5116 | 4E8D | 16EA | 8D51 | B04E |
| 0000416120 | 5116 | 681E | 4154 | CB68 | FF02 | 0836 | FF3D | 0636 |
| 0000416140 | FF3D | 0C36 | FF3D | 0A36 | 9A3D | 6F50 | 0000 | C483 |
| 0000416160 | 8B28 | B646 | 568B | E9B8 | 0D8D | 32E9 | 8300 | AE7E |
| 0000416200 | 7E00 | E903 | 0006 | 01B8 | E900 | 0003 | 00B8 | 8900 |
| 0000416220 | AC46 | 5E8D | 9AAC | 99CD | 6E52 | EC83 | 8B08 | 9ADC |
| 0000416240 | 9B29 | 6EFB | B29A | 0A6D | 836F | 08C4 | 58E9 | 8E0D |
| 0000416260 | 4006 | 267B | 3E83 | 6EC0 | 7500 | E903 | 004B | 7E83 |
| 0000416300 | FEB4 | 0375 | 42E9 | FF00 | 0876 | 76FF | 1E06 | A668 |
| 0000416320 | 8D40 | BE46 | 5016 | 468D | 16EA | 8D50 | B046 | 5016 |
| 0000416340 | 681E | 4154 | CD68 | FF02 | 0836 | FF3D | 0636 | FF3D |
| 0000416360 | 0C36 | FF3D | 0A36 | 1E3D | BC68 | 6840 | 704B | 4E68 |
| 0000416400 | 9A70 | 7051 | 0000 | C483 | 8E2A | 4006 | 267B | 3E83 |
| 0000416420 | 7005 | 7500 | E903 | 0009 | 7E83 | FEB4 | 0374 | 0FE9 |
| 0000416440 | 8E00 | 4206 | 267B | 3E83 | 7103 | 7500 | E903 | 0083 |
| 0000416460 | 7E83 | 00AE | 037D | 06E9 | B800 | 0001 | 03E9 | B800 |
| 0000416500 | 0000 | 4689 | 8DAC | AC5E | CD9A | 0599 | 836F | 08EC |
| 0000416520 | DC8B | 299A | 7E9B | 9A6F | 6DB2 | 6F8D | C483 | 8908 |
| 0000416540 | B646 | 5689 | FFB8 | BC76 | 76FF | 8DBA | B646 | 5016 |
| 0000416560 | 76FF | FFD2 | FC76 | 76FF | 8DFA | BE4E | 5116 | 4E8D |
| 0000416600 | 16EA | 8D51 | B04E | 5116 | 681E | 4154 | CE68 | FF02 |
| 0000416620 | 0836 | FF3D | 0636 | FF3D | 0C36 | FF3D | 0A36 | 9A3D |
| 0000416640 | 6A83 | 0000 | C483 | 8B28 | B646 | 568B | E9B8 | 0C57 |
| 0000416660 | 32E9 | 8300 | AE7E | 7D00 | E903 | 0006 | 01B8 | E900 |
| 0000416700 | 0003 | 00B8 | 8900 | AC46 | 5E8D | 9AAC | 99CD | 6F88 |
| 0000416720 | EC83 | 8B08 | 9ADC | 9B29 | 7083 | B29A | E16D | 836F |
| 0000416740 | 08C4 | 22E9 | E90C | 001F | 172D | 3D00 | 0005 | 0376 |
| 0000416760 | 14E9 | D100 | 93E0 | FF2E | ABA7 | 7B6F | 9D68 | BD69 |
| 0000417000 | F36A | 296B | 5F6D | E96E | 001E | 1BE9 | 2D00 | 0008 |

THU MAR 14 17:52:34 1991 TSLINT.DLL PAGE 148, LINE 8674

| | | | | | | | | |
|---|---|---|---|---|---|---|---|---|
| 0000417020 | 0375 | 8EE9 | 2DF5 | 000F | 037D | 0BE9 | 2D00 | 0005 |
| 0000417040 | 037F | 35E9 | E9F8 | 000D | 76FF | FFE8 | E676 | 869A |
| 0000417060 | EF62 | 836F | 04C4 | 76FF | FFE4 | E276 | 869A | B762 |
| 0000417100 | 8370 | 04C4 | 5EC4 | 2606 | 478B | E912 | 0AFE | 068E |
| 0000417120 | 7B40 | 8326 | EB3E | 0070 | 0375 | 4BE9 | 8300 | B47E |
| 0000417140 | 75FE | E903 | 0042 | 76FF | FF08 | 0676 | 681E | 40C5 |
| 0000417160 | 468D | 16BE | 8D50 | EA46 | 5016 | 468D | 16B0 | 1E50 |
| 0000417200 | 5468 | 6841 | 02D8 | 36FF | 3D08 | 36FF | 3D06 | 36FF |
| 0000417220 | 3D0C | 36FF | 3D0A | 681E | 40D1 | EA6B | 6869 | 69ED |
| 0000417240 | F09A | 0069 | 8300 | 2AC4 | 5EC4 | 26E6 | 77FF | 2606 |
| 0000417260 | 77FF | 2604 | 77FF | 2602 | 37FF | 5EC4 | 26E2 | 77FF |
| 0000417300 | 2606 | 77FF | 2604 | 77FF | 2602 | 37FF | 468D | 50A4 |
| 0000417320 | 689A | 2EA2 | 1E6A | 7E8D | 8BD6 | 16F0 | 1607 | A51F |
| 0000417340 | A5A5 | 1FA5 | 5EC4 | 26E6 | 47F6 | 0214 | 0375 | 1BE9 |
| 0000417360 | 8B00 | E646 | 568B | 8EE8 | 4C06 | 267B | A0A3 | 260A |
| 0000417400 | 1689 | 0AA2 | E79A | DF29 | E970 | 0000 | 5EC4 | 26E2 |
| 0000417420 | 47F6 | 0214 | 0375 | 1BE9 | 8B00 | E246 | 568B | 8EE4 |
| 0000417440 | 4C06 | 267B | A0A3 | 260A | 1689 | 0AA2 | E79A | 1A29 |
| 0000417460 | E971 | 0000 | 068E | 7B40 | 8326 | FE3E | 0069 | 0375 |
| 0000417500 | 09E9 | 8300 | B47E | 74FE | E903 | 000F | 068E | 7B42 |
| 0000417520 | 8326 | 163E | 006A | 0375 | 68E9 | FF00 | DC76 | 76FF |
| 0000417540 | FFDA | D876 | 76FF | 9AD6 | 6DB2 | 6A3D | C483 | 8908 |
| 0000417560 | B646 | 5689 | FFB8 | BC76 | 76FF | 8DBA | B646 | 5016 |
| 0000417600 | 76FF | FFD2 | FC76 | 76FF | 8DFA | BE4E | 5116 | 4E8D |
| 0000417620 | 16EA | 8D51 | B04E | 5116 | 681E | 4154 | DC68 | FF02 |
| 0000417640 | 0836 | FF3D | 0636 | FF3D | 0C36 | FF3D | 0A36 | 9A3D |
| 0000417660 | 72CC | 0000 | C483 | 8B28 | B646 | 568B | E9B8 | 0A47 |
| 0000417700 | 17E9 | FF00 | DC76 | 76FF | FFDA | D876 | 76FF | 9AD6 |
| 0000417720 | 6DB2 | 7223 | C483 | E908 | 0A2D | 068E | 7B40 | 8326 |
| 0000417740 | 573E | 0072 | 0375 | 4BE9 | 8300 | B47E | 75FE | E903 |
| 0000417760 | 0042 | 76FF | FF08 | 0676 | 681E | 40DA | 468D | 16BE |
| 0000420000 | 8D50 | EA46 | 5016 | 468D | 16B0 | 1E50 | 5468 | 6841 |
| 0000420020 | 02DF | 36FF | 3D08 | 36FF | 3D06 | 36FF | 3D0C | 36FF |
| 0000420040 | 3D0A | 681E | 40E2 | 4368 | 6873 | 7346 | 499A | 0073 |
| 0000420060 | 8300 | 2AC4 | 5EC4 | 8DE6 | 9A1F | 9935 | 71F6 | 5EC4 |
| 0000420100 | 8DE2 | 9A1F | 9E59 | 71FE | 5E8D | 9AD6 | 9B29 | 7393 |
| 0000420120 | 5EC4 | 26E6 | 47F6 | 0214 | 0375 | 1BE9 | 8B00 | E646 |
| 0000420140 | 568B | 8EE8 | 4C06 | 267B | A0A3 | 260A | 1689 | 0AA2 |
| 0000420160 | E79A | 4B29 | E972 | 0000 | 5EC4 | 26E2 | 47F6 | 0214 |
| 0000420200 | 0375 | 1BE9 | 8B00 | E246 | 568B | 8EE4 | 4C06 | 267B |
| 0000420220 | A0A3 | 260A | 1689 | 0AA2 | E79A | 8629 | E972 | 0000 |
| 0000420240 | 068E | 7B40 | 8326 | FD3E | 0072 | 0375 | 09E9 | 8300 |
| 0000420260 | B47E | 74FE | E903 | 000F | 068E | 7B42 | 8326 | EF3E |
| 0000420300 | 0073 | 0375 | 68E9 | FF00 | DC76 | 76FF | FFDA | D876 |
| 0000420320 | 76FF | 9AD6 | 6DB2 | 72EE | C483 | 8908 | B646 | 5689 |
| 0000420340 | FFB8 | BC76 | 76FF | 8DBA | B646 | 5016 | 76FF | FFD2 |
| 0000420360 | FC76 | 76FF | 8DFA | BE4E | 5116 | 4E8D | 16EA | 8D51 |
| 0000420400 | B04E | 5116 | 681E | 4154 | E368 | FF02 | 0836 | FF3D |
| 0000420420 | 0636 | FF3D | 0C36 | FF3D | 0A36 | 9A3D | 7450 | 0000 |
| 0000420440 | C483 | 8B28 | B646 | 568B | E9B8 | 08DB | 17E9 | FF00 |
| 0000420460 | DC76 | 76FF | FFDA | D876 | 76FF | 9AD6 | 6DB2 | 7388 |
| 0000420500 | C483 | E908 | 08C1 | 068E | 7B40 | 8326 | D73E | 0073 |
| 0000420520 | 0375 | 4BE9 | 8300 | B47E | 75FE | E903 | 0042 | 76FF |
| 0000420540 | FF08 | 0676 | 681E | 40EB | 468D | 16BE | 8D50 | EA46 |
| 0000420560 | 5016 | 468D | 16B0 | 1E50 | 5468 | 6841 | 02E6 | 36FF |
| 0000420600 | 3D08 | 36FF | 3D06 | 36FF | 3D0C | 36FF | 3D0A | 681E |
| 0000420620 | 40F5 | 7668 | 686D | 6D79 | 7C9A | 006D | 8300 | 2AC4 |
| 0000420640 | 468B | 8BE2 | E456 | 8D1E | D67E | F08B | 0716 | DA8E |
| 0000420660 | A5A5 | A5A5 | C41F | E25E | F626 | 1447 | 7502 | E903 |

THU MAR 14 17:52:34 1991 TSLINT.DLL PAGE 149, LINE 8733

| | | | | | | | | |
|---|---|---|---|---|---|---|---|---|
| 0000420700 | 001B | 468B | 8BE2 | E456 | 068E | 7B4C | A326 | 0AA0 |
| 0000420720 | 8926 | A216 | 9A0A | 29E7 | 73CB | 00E9 | 8D00 | D65E |
| 0000420740 | 2B9A | 9C99 | 8D73 | 5E1E | 9A7B | 9931 | 73A1 | 1D9A |
| 0000420760 | C59F | 746D | E903 | 00D9 | 5EC4 | 26E6 | 47F6 | 0214 |
| 0000421000 | 0375 | 1BE9 | 8B00 | E646 | 568B | 8EE8 | 4C06 | 267B |
| 0000421020 | A0A3 | 260A | 1689 | 0AA2 | E79A | 0A29 | E974 | 0000 |
| 0000421040 | 068E | 7B40 | 8326 | 8A3E | 006D | 0375 | 09E9 | 8300 |
| 0000421060 | B47E | 74FE | E903 | 000F | 068E | 7B42 | 8326 | A23E |
| 0000421100 | 006D | 0375 | 6CE9 | FF00 | 6436 | FF7B | 6236 | FF7B |
| 0000421120 | 6036 | FF7B | 5E36 | 9A7B | 6DB2 | 7476 | C483 | 8908 |
| 0000421140 | B646 | 5689 | FFB8 | BC76 | 76FF | 8DBA | B646 | 5016 |
| 0000421160 | 76FF | FFD2 | FC76 | 76FF | 8DFA | BE4E | 5116 | 4E8D |
| 0000421200 | 16EA | 8D51 | B04E | 5116 | 681E | 4154 | EB68 | FF02 |
| 0000421220 | 0836 | FF3D | 0636 | FF3D | 0C36 | FF3D | 0A36 | 9A3D |
| 0000421240 | 6E1A | 0000 | C483 | 8B28 | B646 | 568B | E9B8 | 0757 |
| 0000421260 | 1BE9 | FF00 | 6436 | FF7B | 6236 | FF7B | 6036 | FF7B |
| 0000421300 | 5E36 | 9A7B | 6DB2 | 6DD4 | C483 | E908 | 0739 | E8E9 |
| 0000421320 | C400 | E65E | 1F8D | 359A | 9199 | 8D74 | D65E | 719A |
| 0000421340 | 999E | 8D74 | D65E | 299A | 069B | C476 | E65E | F626 |
| 0000421360 | 1447 | 7502 | E903 | 001B | 468B | 8BE6 | E856 | 068E |
| 0000421400 | 7B4C | A326 | 0AA0 | 8926 | A216 | 9A0A | 29E7 | 74F9 |
| 0000421420 | 00E9 | 8E00 | 4006 | 267B | 3E83 | 7570 | 7500 | E903 |
| 0000421440 | 0009 | 7E83 | FEB4 | 0374 | 0FE9 | 8E00 | 4206 | 267B |
| 0000421460 | 3E83 | 7662 | 7500 | E903 | 0068 | 76FF | FFDC | DA76 |
| 0000421500 | 76FF | FFD8 | D676 | B29A | 616D | 8375 | 08C4 | 4689 |
| 0000421520 | 89B6 | B856 | 76FF | FFBC | BA76 | 468D | 16B6 | FF50 |
| 0000421540 | D276 | 76FF | FFFC | FA76 | 4E8D | 16BE | 8D51 | EA4E |
| 0000421560 | 5116 | 4E8D | 16B0 | 1E51 | 5468 | 6841 | 02EF | 36FF |
| 0000421600 | 3D08 | 36FF | 3D06 | 36FF | 3D0C | 36FF | 3D0A | C39A |
| 0000421620 | 0076 | 8300 | 28C4 | 468B | 8BB6 | B856 | 68E9 | E906 |
| 0000421640 | 0017 | 76FF | FFDC | DA76 | 76FF | FFD8 | D676 | B29A |
| 0000421660 | FB6D | 8375 | 08C4 | 4EE9 | 8E06 | 4006 | 267B | 3E83 |
| 0000421700 | 764A | 7500 | E903 | 004B | 7E83 | FEB4 | 0375 | 42E9 |
| 0000421720 | FF00 | 0876 | 76FF | 1E06 | FE68 | 8D40 | BE46 | 5016 |
| 0000421740 | 468D | 16EA | 8D50 | B046 | 5016 | 681E | 4154 | F368 |
| 0000421760 | FF02 | 0836 | FF3D | 0636 | FF3D | 0C36 | FF3D | 0A36 |
| 0000422000 | 1E3D | 0968 | 6841 | 71D7 | DA68 | 9A71 | 71DD | 0000 |
| 0000422020 | C483 | 8B2A | E246 | 568B | 1EE4 | 7E8D | 8BD6 | 16F0 |
| 0000422040 | 8E07 | A5DA | A5A5 | 1FA5 | 5EC4 | 26E2 | 47F6 | 0214 |
| 0000422060 | 0375 | 1BE9 | 8B00 | E246 | 568B | 8EE4 | 4C06 | 267B |
| 0000422100 | A0A3 | 260A | 1689 | 0AA2 | E79A | 3E29 | E976 | 0000 |
| 0000422120 | 5E8D | 9AD6 | 992B | 760F | 1E8D | 7B5E | 319A | 1499 |
| 0000422140 | 9A76 | 9F1D | 76F9 | 0374 | D6E9 | C400 | E65E | F626 |
| 0000422160 | 1447 | 7502 | E903 | 001B | 468B | 8BE6 | E856 | 068E |
| 0000422200 | 7B4C | A326 | 0AA0 | 8926 | A216 | 9A0A | 29E7 | 767D |
| 0000422220 | 00E9 | 8E00 | 4006 | 267B | 3E83 | 776F | 7500 | E903 |
| 0000422240 | 0009 | 7E83 | FEB4 | 0374 | 0FE9 | 8E00 | 4206 | 267B |
| 0000422260 | 3E83 | 7787 | 7500 | E903 | 006C | 36FF | 7B64 | 36FF |
| 0000422300 | 7B62 | 36FF | 7B60 | 36FF | 7B5E | B29A | E96D | 8376 |
| 0000422320 | 08C4 | 4689 | 89B6 | B856 | 76FF | FFBC | BA76 | 468D |
| 0000422340 | 16B6 | FF50 | D276 | 76FF | FFFC | FA76 | 4E8D | 16BE |
| 0000422360 | 8D51 | EA4E | 5116 | 4E8D | 16B0 | 1E51 | 5468 | 6841 |
| 0000422400 | 02F8 | 36FF | 3D08 | 36FF | 3D06 | 36FF | 3D0C | 36FF |
| 0000422420 | 3D0A | E49A | 0077 | 8300 | 28C4 | 468B | 8BB6 | B856 |
| 0000422440 | E4E9 | E904 | 001B | 36FF | 7B64 | 36FF | 7B62 | 36FF |
| 0000422460 | 7B60 | 36FF | 7B5E | B29A | 636D | 8377 | 08C4 | C6E9 |
| 0000422500 | C404 | E65E | 1F8D | 359A | 0199 | 8D77 | D65E | 719A |
| 0000422520 | 069E | 9A77 | 9BF7 | 7714 | 4689 | 89EE | F056 | 5E8D |
| 0000422540 | 9AEE | 99C0 | 771C | 5E8D | 9AD6 | 9E49 | 7724 | 5E8D |

THU MAR 14 17:52:34 1991 TSLINT.DLL PAGE 150, LINE 8792

| | | | | | | | | |
|---|---|---|---|---|---|---|---|---|
| 0000422560 | 9ACA | 9B29 | 772E | 5EC4 | 8DE6 | 9A1F | 9935 | 7736 |
| 0000422600 | 5E8D | 9ACA | 9DF7 | 773E | 5E8D | 9AD6 | 9B29 | 71EC |
| 0000422620 | 5EC4 | 26E6 | 47F6 | 0214 | 0375 | 1BE9 | 8B00 | E646 |
| 0000422640 | 568B | 8EE8 | 4C06 | 267B | A0A3 | 260A | 1689 | 0AA2 |
| 0000422660 | E79A | 9E29 | E977 | 0000 | 068E | 7B40 | 8326 | 153E |
| 0000422700 | 0078 | 0375 | 09E9 | 8300 | B47E | 74FE | E903 | 000F |
| 0000422720 | 068E | 7B42 | 8326 | 6F3E | 0072 | 0375 | 68E9 | FF00 |
| 0000422740 | DC76 | 76FF | FFDA | D876 | 76FF | 9AD6 | 6DB2 | 7806 |
| 0000422760 | C483 | 890B | B646 | 5689 | FFB8 | BC76 | 76FF | 8DBA |
| 0000423000 | B646 | 5016 | 76FF | FFD2 | FC76 | 76FF | 8DFA | BE4E |
| 0000423020 | 5116 | 4E8D | 16EA | 8D51 | B04E | 5116 | 681E | 4154 |
| 0000423040 | FE68 | FF02 | 0836 | FF3D | 0636 | FF3D | 0C36 | FF3D |
| 0000423060 | 0A36 | 9A3D | 7160 | 0000 | C483 | 8B28 | B646 | 568B |
| 0000423100 | E9B8 | 03C3 | 17E9 | FF00 | DC76 | 76FF | FFDA | D876 |
| 0000423120 | 76FF | 9AD6 | 6DB2 | 7182 | C483 | E908 | 03A9 | 068E |
| 0000423140 | 7B40 | 8326 | 913E | 0071 | 0375 | 4BE9 | 8300 | B47E |
| 0000423160 | 75FE | E903 | 0042 | 76FF | FF08 | 0676 | 681E | 4112 |
| 0000423200 | 468D | 16BE | 8D50 | EA46 | 5016 | 468D | 16B0 | 1E50 |
| 0000423220 | 5468 | 6841 | 0301 | 36FF | 3D08 | 36FF | 3D06 | 36FF |
| 0000423240 | 3D0C | 36FF | 3D0A | 681E | 411A | C768 | 6879 | 79CA |
| 0000423260 | CD9A | 0079 | 8300 | 2AC4 | 5EC4 | 8DE6 | 9A1F | 9935 |
| 0000423300 | 787A | 5EC4 | 8DE2 | 9A1F | 9ED1 | 7882 | 5E8D | 9AD6 |
| 0000423320 | 9B29 | 79DC | 5EC4 | 26E6 | 47F6 | 0214 | 0375 | 1BE9 |
| 0000423340 | 8B00 | E646 | 568B | 8EE8 | 4C06 | 267B | A0A3 | 260A |
| 0000423360 | 1689 | 0AA2 | E79A | CF29 | E978 | 0000 | 5EC4 | 26E2 |
| 0000423400 | 47F6 | 0214 | 0375 | 1BE9 | 8B00 | E246 | 568B | 8EE4 |
| 0000423420 | 4C06 | 267B | A0A3 | 260A | 1689 | 0AA2 | E79A | 0A29 |
| 0000423440 | E979 | 0000 | 068E | 7B40 | 8326 | 813E | 0079 | 0375 |
| 0000423460 | 09E9 | 8300 | B47E | 74FE | E903 | 000F | 068E | 7B42 |
| 0000423500 | 8326 | 5F3E | 007A | 0375 | 68E9 | FF00 | DC76 | 76FF |
| 0000423520 | FFDA | D876 | 76FF | 9AD6 | 6DB2 | 7972 | C483 | 8908 |
| 0000423540 | B646 | 5689 | FFB8 | BC76 | 76FF | 8DBA | B646 | 5016 |
| 0000423560 | 76FF | FFD2 | FC76 | 76FF | 8DFA | BE4E | 5116 | 4E8D |
| 0000423600 | 16EA | 8D51 | B04E | 5116 | 681E | 4154 | 0568 | FF03 |
| 0000423620 | 0836 | FF3D | 0636 | FF3D | 0C36 | FF3D | 0A36 | 9A3D |
| 0000423640 | 7ABC | 0000 | C483 | 8B28 | B646 | 568B | E9B8 | 0257 |
| 0000423660 | 17E9 | FF00 | DC76 | 76FF | FFDA | D876 | 76FF | 9AD6 |
| 0000423700 | 6DB2 | 7A13 | C483 | E908 | 023D | 068E | 7B40 | 8326 |
| 0000423720 | 473E | 007A | 0375 | 4BE9 | 8300 | B47E | 75FE | E903 |
| 0000423740 | 0042 | 76FF | FF08 | 0676 | 681E | 4123 | 468D | 16BE |
| 0000423760 | 8D50 | EA46 | 5016 | 468D | 16B0 | 1E50 | 5468 | 6841 |
| 0000424000 | 0308 | 36FF | 3D08 | 36FF | 3D06 | 36FF | 3D0C | 36FF |
| 0000424020 | 3D0A | 681E | 412C | B668 | 6875 | 75B9 | BC9A | 0075 |
| 0000424040 | 8300 | 2AC4 | 5EC4 | 8DE6 | 9A1F | 9935 | 79E6 | 5EC4 |
| 0000424060 | 8DE2 | 9A1F | 9E07 | 79EE | 5E8D | 9AD6 | 9B29 | 7489 |
| 0000424100 | 5EC4 | 26E6 | 47F6 | 0214 | 0375 | 1BE9 | 8B00 | E646 |
| 0000424120 | 568B | 8EE8 | 4C06 | 267B | A0A3 | 260A | 1689 | 0AA2 |
| 0000424140 | E79A | 3B29 | E97A | 0000 | 5EC4 | 26E2 | 47F6 | 0214 |
| 0000424160 | 0375 | 1BE9 | 8B00 | E246 | 568B | 8EE4 | 4C06 | 267B |
| 0000424200 | A0A3 | 260A | 1689 | 0AA2 | E79A | 7629 | E97A | 0000 |
| 0000424220 | 068E | 7B40 | 8326 | 383E | 007B | 0375 | 09E9 | 8300 |
| 0000424240 | B47E | 74FE | E903 | 000F | 068E | 7B42 | 8326 | 503E |
| 0000424260 | 007B | 0375 | 68E9 | FF00 | DC76 | 76FF | FFDA | D876 |
| 0000424300 | 76FF | 9AD6 | 6DB2 | 7ADE | C483 | 8908 | B646 | 5689 |
| 0000424320 | FFB8 | BC76 | 76FF | 8DBA | B646 | 5016 | 76FF | FFD2 |
| 0000424340 | FC76 | 76FF | 8DFA | BE4E | 5116 | 4E8D | 16EA | 8D51 |
| 0000424360 | B04E | 5116 | 681E | 4154 | 0C68 | FF03 | 0836 | FF3D |
| 0000424400 | 0636 | FF3D | 0C36 | FF3D | 0A36 | 9A3D | 7B9B | 0000 |
| 0000424420 | C483 | 8B28 | B646 | 568B | E9B8 | 00EB | 17E9 | FF00 |

THU MAR 14 17:52:34 1991 TSLINT.DLL PAGE 151, LINE 8851

| | | | | | | | | |
|---|---|---|---|---|---|---|---|---|
| 0000424440 | DC76 | 76FF | FFDA | D876 | 76FF | 9AD6 | 6DB2 | 74BE |
| 0000424460 | C483 | E908 | 00D1 | 5EC4 | 2606 | 77FF | 1E12 | 3568 |
| 0000424500 | 9A41 | B3B6 | 664C | C483 | E906 | 0035 | 033D | 7500 |
| 0000424520 | E903 | FA65 | 037E | 0FE9 | 4800 | 0375 | 7BE9 | 48F6 |
| 0000424540 | 0375 | E1E9 | E9F7 | FFCE | 042D | 7500 | E903 | FCEE |
| 0000424560 | 7548 | E903 | FE54 | 452D | 7500 | E903 | F4D0 | B5E9 |
| 0000424600 | 8EFF | 4006 | 267B | 3E83 | 74CA | 7500 | E903 | 0009 |
| 0000424620 | 7E83 | FEB4 | 0374 | 0FE9 | 8E00 | 4206 | 267B | 3E83 |
| 0000424640 | 74E2 | 7500 | E903 | 0056 | C02B | 4689 | 89B8 | B646 |
| 0000424660 | 76FF | FFBC | BA76 | 468D | 16B6 | FF50 | D276 | 76FF |
| 0000424700 | FFFC | FA76 | 4E8D | 16BE | 8D51 | EA4E | 5116 | 4E8D |
| 0000424720 | 16B0 | 1E51 | 5468 | 6841 | 0311 | 36FF | 3D08 | 36FF |
| 0000424740 | 3D06 | 36FF | 3D0C | 36FF | 3D0A | 3F9A | 0075 | 8300 |
| 0000424760 | 28C4 | 468B | 8BB6 | B856 | 0CE9 | E900 | 0009 | 00B8 |
| 0000425000 | BA00 | 0000 | 00E9 | 5E00 | 835F | 02ED | E58B | 5D1F |
| 0000425020 | CB4D | 581E | 4590 | 8B55 | 1EEC | D88E | EC81 | 002A |
| 0000425040 | 5657 | 46C7 | 60FA | 8C41 | FC5E | 46C7 | 00F4 | 2B00 |
| 0000425060 | 89C0 | E646 | 4689 | 8EE4 | 4006 | 267B | 3E83 | 7CE6 |
| 0000425100 | 7500 | E903 | 001D | 36FF | 3D0C | 36FF | 3D0A | 468D |
| 0000425120 | 16DC | 9A50 | 49E1 | 0000 | C483 | 3D08 | 0000 | 0374 |
| 0000425140 | 0FE9 | 8E00 | 4206 | 267B | 3E83 | 7CFE | 7500 | E903 |
| 0000425160 | 003B | 681E | 4164 | 468D | 16E8 | 8D50 | DC46 | 5016 |
| 0000425200 | 468D | 16F6 | 6850 | 032D | 681E | 41AC | 36FF | 3D08 |
| 0000425220 | 36FF | 3D06 | 36FF | 3D0C | 36FF | 3D0A | 2A9A | 004A |
| 0000425240 | 8300 | 1EC4 | 4689 | 89F6 | F856 | 08E9 | 2B00 | 89C0 |
| 0000425260 | F846 | 4689 | C4F6 | 065E | 8B26 | 2607 | 578B | 8902 |
| 0000425300 | D846 | 5689 | C4DA | D85E | 8326 | 127F | 754E | E903 |
| 0000425320 | 0013 | 681E | 4168 | 3368 | 1E03 | 7868 | 9A41 | B3B6 |
| 0000425340 | 7AF4 | C483 | 8B0A | D846 | 568B | 8EDA | 5406 | 267B |
| 0000425360 | 0639 | 373A | 0374 | 99E9 | 2600 | 1639 | 373C | 0374 |
| 0000425400 | 8FE9 | FF00 | 1076 | 76FF | FF0E | 0C76 | 76FF | 9A0A |
| 0000425420 | 6D5E | 7D5E | C483 | C408 | 065E | 8926 | 2607 | 5789 |
| 0000425440 | 8E02 | 4C06 | 2B7B | 26C0 | A2A3 | 260A | A0A3 | 8E0A |
| 0000425460 | 4006 | 267B | 3E83 | 7D74 | 7500 | E903 | 0009 | 7E83 |
| 0000425500 | FEE0 | 0374 | 0FE9 | 8E00 | 4206 | 267B | 3E83 | 7D8C |
| 0000425520 | 7500 | E903 | 0039 | 468D | 16E8 | 8D50 | F646 | 5016 |
| 0000425540 | 468D | 16DC | 1E50 | AC68 | 6841 | 0338 | 36FF | 3D08 |
| 0000425560 | 36FF | 3D06 | 36FF | 3D0C | 36FF | 3D0A | BB9A | 007D |
| 0000425600 | 8300 | 1AC4 | 46C7 | 00E2 | E900 | 01D9 | 03E9 | E900 |
| 0000425620 | 01D3 | 5EC4 | 26D8 | 7F80 | 010E | 0377 | 81E9 | FF00 |
| 0000425640 | 1076 | 76FF | FF0E | 0C76 | 76FF | 9A0A | 6D5E | 78A7 |
| 0000425660 | C483 | C408 | 065E | 8926 | 2607 | 5789 | 8E02 | 4006 |
| 0000425700 | 267B | 3E83 | 78DB | 7500 | E903 | 0009 | 7E83 | FEE0 |
| 0000425720 | 0374 | 0FE9 | 8E00 | 4206 | 267B | 3E83 | 78F3 | 7500 |
| 0000425740 | E903 | 0039 | 468D | 16E8 | 8D50 | F646 | 5016 | 468D |
| 0000425760 | 16DC | 1E50 | AC68 | 6841 | 033C | 36FF | 3D08 | 36FF |
| 0000426000 | 3D06 | 36FF | 3D0C | 36FF | 3D0A | DF9A | 002C | 8300 |
| 0000426020 | 1AC4 | 46C7 | 00E2 | E900 | 014B | 03E9 | E900 | 0145 |
| 0000426040 | 5EC4 | 26D8 | 47F6 | 1014 | 0375 | 9FE9 | C400 | D85E |
| 0000426060 | F626 | 1447 | 7503 | E903 | 0092 | 5EC4 | 26D8 | 77FF |
| 0000426100 | 260A | 77FF | 9A08 | F91E | 7E2E | C483 | 8904 | D646 |
| 0000426120 | 5EC4 | 26D8 | 77FF | 260A | 77FF | 9A08 | AA42 | 7CC2 |
| 0000426140 | C483 | 8E04 | 4006 | 267B | 3E83 | 7BEE | 7500 | E903 |
| 0000426160 | 005A | 7E83 | FEE0 | 0375 | 51E9 | 9A00 | F7E4 | 7C90 |
| 0000426200 | 5052 | 76FF | C4D6 | D85E | FF26 | 0A77 | FF26 | 0877 |
| 0000426220 | 681E | 4194 | 468D | 16E8 | 8D50 | F646 | 5016 | 468D |
| 0000426240 | 16DC | 1E50 | AC68 | 6841 | 033F | 36FF | 3D08 | 36FF |
| 0000426260 | 3D06 | 36FF | 3D0C | 36FF | 3D0A | 681E | 41A2 | 5B68 |
| 0000426300 | 6878 | 785E | 619A | 0078 | 8300 | 30C4 | 8D1E | 0A76 |

THU MAR 14 17:52:34 1991 TSLINT.DLL PAGE 152, LINE 8910

| | | | | | | | | |
|---|---|---|---|---|---|---|---|---|
| 0000426320 | D08C | D88E | 7EC4 | A5D8 | A5A5 | 1FA5 | 5EC4 | 26D8 |
| 0000426340 | 4F80 | 0814 | 5EC4 | 26D8 | 6780 | EF14 | 5EC4 | 26D8 |
| 0000426360 | 47C6 | 000E | 068E | 7B4C | C02B | A326 | 0AA2 | A326 |
| 0000426400 | 0AA0 | 068E | 7B40 | 8326 | 1A3E | 007E | 0375 | 09E9 |
| 0000426420 | 8300 | E07E | 74FE | E903 | 000F | 068E | 7B42 | 8326 |
| 0000426440 | 1A3E | 007C | 0375 | 39E9 | 8D00 | E846 | 5016 | 468D |
| 0000426460 | 16F6 | 8D50 | DC46 | 5016 | 681E | 41AC | 4568 | FF03 |
| 0000426500 | 0836 | FF3D | 0636 | FF3D | 0C36 | FF3D | 0A36 | 9A3D |
| 0000426520 | 7D2D | 0000 | C483 | C71A | E246 | 0000 | 06E9 | E900 |
| 0000426540 | 0003 | 00E9 | 5E00 | 835F | 02ED | E58B | 5D1F | CB4D |
| 0000426560 | 581E | 4590 | 8B55 | 1EEC | D88E | EC81 | 002A | 5657 |
| 0000426600 | 46C7 | BAFA | 8C41 | FC5E | 46C7 | 01F0 | 2B01 | 89C0 |
| 0000426620 | E046 | 4689 | 8EDE | 4006 | 267B | 3E83 | 7EB9 | 7500 |
| 0000426640 | E903 | 001D | 36FF | 3D0C | 36FF | 3D0A | 468D | 16D6 |
| 0000426660 | 9A50 | 7C04 | 0000 | C483 | 3D08 | 0000 | 0374 | 0FE9 |
| 0000426700 | 8E00 | 4206 | 267B | 3E83 | 7ED1 | 7500 | E903 | 003B |
| 0000426720 | 681E | 41BE | 468D | 16E4 | 8D50 | D646 | 5016 | 468D |
| 0000426740 | 16F6 | 6850 | 0353 | 681E | 41C2 | 36FF | 3D08 | 36FF |
| 0000426760 | 3D06 | 36FF | 3D0C | 36FF | 3D0A | 4D9A | 007C | 8300 |
| 0000427000 | 1EC4 | 4689 | 89F6 | F856 | 08E9 | 2B00 | 89C0 | F846 |
| 0000427020 | 4689 | 8BF6 | 0846 | 460B | 7406 | E903 | 007D | 068E |
| 0000427040 | 7B40 | 8326 | 893E | 0080 | 0375 | 09E9 | 8300 | DA7E |
| 0000427060 | 74FE | E903 | 000F | 068E | 7B42 | 8326 | A13E | 0080 |
| 0000427100 | 0375 | 50E9 | C700 | DC46 | 0001 | 76FF | FFE0 | DE76 |
| 0000427120 | 468D | 16DC | FF50 | F076 | 76FF | FFFC | FA76 | 4E8D |
| 0000427140 | 16E4 | 8D51 | F64E | 5116 | 4E8D | 16D6 | 1E51 | C268 |
| 0000427160 | 6841 | 0359 | 36FF | 3D08 | 36FF | 3D06 | 36FF | 3D0C |
| 0000427200 | 36FF | 3D0A | E99A | 0080 | 8300 | 28C4 | 468B | E9DC |
| 0000427220 | 02D9 | 06E9 | B800 | 0001 | D0E9 | C402 | 065E | 8326 |
| 0000427240 | 127F | 7440 | E903 | 0157 | 5EC4 | 2606 | 7F83 | 0004 |
| 0000427260 | 0374 | A6E9 | C400 | 065E | C426 | 261F | 77FF | 2602 |
| 0000427300 | 37FF | 209A | 1C7F | 8381 | 04C4 | 003D | 7400 | E903 |
| 0000427320 | 0080 | 068E | 7B40 | 8326 | 393E | 0081 | 0375 | 09E9 |
| 0000427340 | 8300 | DA7E | 74FE | E903 | 000F | 068E | 7B42 | 8326 |
| 0000427360 | 513E | 0081 | 0375 | 50E9 | C700 | DC46 | 0000 | 76FF |
| 0000427400 | FFE0 | DE76 | 468D | 16DC | FF50 | F076 | 76FF | FFFC |
| 0000427420 | FA76 | 4E8D | 16E4 | 8D51 | F64E | 5116 | 4E8D | 16D6 |
| 0000427440 | 1E51 | C268 | 6841 | 036B | 36FF | 3D08 | 36FF | 3D06 |
| 0000427460 | 36FF | 3D0C | 36FF | 3D0A | 999A | 0081 | 8300 | 28C4 |
| 0000427500 | 468B | E9DC | 0225 | 06E9 | B800 | 0000 | 1CE9 | E902 |
| 0000427520 | 0009 | 5EC4 | 2606 | 47C7 | 0104 | C400 | 065E | C426 |
| 0000427540 | 261F | 77FF | 2606 | 77FF | 9A04 | 7F20 | 820D | C483 |
| 0000427560 | 3D04 | 0000 | 0375 | 09E9 | C400 | 065E | C726 | 0447 |
| 0000427600 | 0000 | 068E | 7B40 | 8326 | A43E | 0082 | 0375 | 09E9 |
| 0000427620 | 8300 | DA7E | 74FE | E903 | 000F | 068E | 7B42 | 8326 |
| 0000427640 | BC3E | 0082 | 0375 | 50E9 | C700 | DC46 | 0001 | 76FF |
| 0000427660 | FFE0 | DE76 | 468D | 16DC | FF50 | F076 | 76FF | FFFC |
| 0000427700 | FA76 | 4E8D | 16E4 | 8D51 | F64E | 5116 | 4E8D | 16D6 |
| 0000427720 | 1E51 | C268 | 6841 | 0371 | 36FF | 3D08 | 36FF | 3D06 |
| 0000427740 | 36FF | 3D0C | 36FF | 3D0A | 059A | 0083 | 8300 | 28C4 |
| 0000427760 | 468B | E9DC | 0175 | 06E9 | B800 | 0001 | 6CE9 | 8B01 |
| 0000430000 | 0646 | 568B | 8E08 | 5206 | 267B | B0A3 | 260A | 1689 |
| 0000430020 | 0AB2 | D00B | 0374 | 10E9 | 8E00 | 5406 | 267B | 3AA1 |
| 0000430040 | 2637 | 168B | 373C | 39E9 | 8E00 | 5206 | 267B | 1EC4 |
| 0000430060 | 0AB0 | 8326 | 127F | 744E | E903 | 0010 | 068E | 7B52 |
| 0000430100 | A126 | 0AB0 | 8B26 | B216 | E90A | 0016 | 068E | 7B52 |
| 0000430120 | FF26 | B236 | 260A | 36FF | 0AB0 | 9F9A | F849 | 837D |
| 0000430140 | 04C4 | 068E | 7B56 | A326 | 0A84 | 8926 | 8616 | 260A |
| 0000430160 | 84A1 | 260A | 168B | 0A86 | 4689 | 89F2 | F456 | 5EC4 |

THU MAR 14 17:52:34 1991 TSLINT.DLL PAGE 153, LINE 8969

| | | | | | | | | |
|---|---|---|---|---|---|---|---|---|
| 0000430200 | 26F2 | 47F6 | 1014 | 0375 | 11E9 | C400 | F25E | 8326 |
| 0000430220 | 0C7F | 1B01 | 40C0 | 4689 | E9E2 | 0029 | 1E8D | 7B5E |
| 0000430240 | 319A | 5D99 | C482 | F25E | 1F8D | 359A | 6299 | 9A82 |
| 0000430260 | 9F1D | 7870 | 0375 | 06E9 | B800 | 0001 | 03E9 | B800 |
| 0000430300 | 0000 | 4689 | C4E2 | F25E | F626 | 1447 | 7502 | E903 |
| 0000430320 | 001B | 468B | 8BF2 | F456 | 068E | 7B4C | A326 | 0AA0 |
| 0000430340 | 8926 | A216 | 9A0A | 29E7 | 7E0E | 00E9 | 8E00 | 4006 |
| 0000430360 | 267B | 3E83 | 7F4C | 7500 | E903 | 0009 | 7E83 | FEDA |
| 0000430400 | 0374 | 0FE9 | 8E00 | 4206 | 267B | 3E83 | 7F78 | 7500 |
| 0000430420 | E903 | 0051 | 468B | 89E2 | DC46 | 76FF | FFE0 | DE76 |
| 0000430440 | 468D | 16DC | FF50 | F076 | 76FF | FFFC | FA76 | 4E8D |
| 0000430460 | 16E4 | 8D51 | F64E | 5116 | 4E8D | 16D6 | 1E51 | C26B |
| 0000430500 | 6841 | 037F | 36FF | 3D08 | 36FF | 3D06 | 36FF | 3D0C |
| 0000430520 | 36FF | 3D0A | 509A | 0079 | 8300 | 28C4 | 468B | E9DC |
| 0000430540 | 0009 | 06E9 | 8B00 | E246 | 00E9 | 5E00 | 835F | 02ED |
| 0000430560 | E58B | 5D1F | CB4D | 581E | 4590 | 8B55 | 1EEC | D88E |
| 0000430600 | EC81 | 0000 | 5657 | 5EC4 | 2606 | 3F80 | 7400 | E903 |
| 0000430620 | 0006 | 00B8 | E900 | 00FD | 5EC4 | 2606 | 3F80 | 742D |
| 0000430640 | E903 | 0003 | 46FF | C406 | 065E | 8026 | 003F | 0374 |
| 0000430660 | 06E9 | B800 | 0000 | DCE9 | C400 | 065E | 8026 | 2E3F |
| 0000430700 | 0375 | 19E9 | C400 | 065E | 8A26 | 9807 | D88B | 87F6 |
| 0000430720 | 754F | 7404 | E903 | 0006 | 00B8 | E900 | 00B7 | 5EC4 |
| 0000430740 | 2606 | 078A | 8B98 | F6D8 | 4F87 | 0475 | 0375 | 06E9 |
| 0000430760 | FF00 | 0646 | E7E9 | C4FF | 065E | 8026 | 2E3F | 0374 |
| 0000431000 | 1CE9 | FF00 | 0646 | 5EC4 | 2606 | 078A | 8B98 | F6D8 |
| 0000431020 | 4F87 | 0475 | 0375 | 06E9 | FF00 | 0646 | E7E9 | C4FF |
| 0000431040 | 065E | 8026 | 653F | 0375 | 0CE9 | C400 | 065E | 8026 |
| 0000431060 | 453F | 0374 | 50E9 | FF00 | 0646 | 5EC4 | 2606 | 3F80 |
| 0000431100 | 752B | E903 | 000C | 5EC4 | 2606 | 3F80 | 742D | E903 |
| 0000431120 | 0003 | 46FF | C406 | 065E | 8A26 | 9807 | D88B | 87F6 |
| 0000431140 | 754F | 7404 | E903 | 0006 | 00B8 | E900 | 0027 | 5EC4 |
| 0000431160 | 2606 | 078A | 8B98 | F6D8 | 4F87 | 0475 | 0375 | 06E9 |
| 0000431200 | FF00 | 0646 | E7E9 | C4FF | 065E | 8026 | 013F | C01B |
| 0000431220 | D8F7 | 00E9 | 5E00 | 835F | 02ED | E58B | 5D1F | CB4D |
| 0000431240 | 581E | 4590 | 0355 | 1EEC | D88E | EC81 | 0010 | 5657 |
| 0000431260 | 468B | 8B06 | 0856 | 4639 | 740A | E903 | 000E | 5639 |
| 0000431300 | 740C | E903 | 0006 | 00B8 | E900 | 0301 | 5EC4 | 2606 |
| 0000431320 | 47F6 | 0814 | 0375 | D4E9 | C400 | 0A5E | F626 | 1447 |
| 0000431340 | 7508 | E903 | 001F | 5EC4 | 8D06 | 9A1F | 9935 | 84A8 |
| 0000431360 | 5EC4 | 8D0A | 9A1F | 9E07 | 84B0 | 5E8D | 9AF2 | 9B29 |
| 0000431400 | 84E7 | 60E9 | C400 | 0A5E | FF26 | 0A77 | FF26 | 0877 |
| 0000431420 | 269A | 7583 | 8380 | 04C4 | 003D | 7500 | E903 | 002E |
| 0000431440 | 76FF | FF0C | 0A76 | 869A | 9862 | 8382 | 04C4 | C28E |
| 0000431460 | D88B | 1F8D | 359A | F199 | C484 | 065E | 1F8D | 309A |
| 0000431500 | F99E | 8D84 | F25E | 299A | 539B | E982 | 0017 | 76FF |
| 0000431520 | FF08 | 0676 | 149A | 8E65 | 8385 | 04C4 | 4689 | 8906 |
| 0000431540 | 0856 | C0E9 | 8D01 | F25E | 2B9A | 2499 | 8D85 | 5E1E |
| 0000431560 | 9A7B | 9931 | 8529 | 1D9A | 3C9F | 7485 | E903 | 0006 |
| 0000431600 | 00B8 | E900 | 0247 | 5E8D | 9AF2 | 992B | 8545 | 1E8D |
| 0000431620 | 7B5E | 319A | 4A99 | 9A85 | 9F1D | 859C | 0372 | 06E9 |
| 0000431640 | B800 | 0001 | 26E9 | B802 | FFFF | 20E9 | C402 | 0A5E |
| 0000431660 | F626 | 1447 | 7508 | E903 | 00A8 | 5EC4 | 2606 | 77FF |
| 0000431700 | 260A | 77FF | 9A08 | 8326 | 8620 | C483 | 3D04 | 0000 |
| 0000431720 | 0375 | 2EE9 | FF00 | 0876 | 76FF | 9A06 | 6286 | 85BC |
| 0000431740 | C483 | 8E04 | 8BC2 | 8DD8 | 9A1F | 9935 | 85A6 | 5EC4 |
| 0000431760 | 8D0A | 9A1F | 9E07 | 85AE | 5E8D | 9AF2 | 9B29 | 85D0 |
| 0000432000 | 17E9 | FF00 | 0C76 | 76FF | 9A0A | 6514 | 8651 | C483 |
| 0000432020 | 8904 | 0A46 | 5689 | E90C | 010B | 5E8D | 9AF2 | 992B |
| 0000432040 | 85D9 | 1E8D | 7B5E | 319A | DE99 | 9A85 | 9F1D | 85F1 |

THU MAR 14 17:52:34 1991 TSLINT.DLL PAGE 154, LINE 9028

| | | | | | | | | |
|---|---|---|---|---|---|---|---|---|
| 0000432060 | 0374 | 06E9 | B800 | 0000 | 92E9 | 8D01 | F25E | 2B9A |
| 0000432100 | FA99 | 8D85 | 5E1E | 9A7B | 9931 | 85FF | 1D9A | 7C9F |
| 0000432120 | 7286 | E903 | 0006 | 01B8 | E900 | 0171 | FFB8 | E9FF |
| 0000432140 | 016B | 5EC4 | 2606 | 77FF | 260A | 77FF | 9A08 | 8326 |
| 0000432160 | 863B | C483 | 3D04 | 0000 | 0375 | A8E9 | C400 | 0A5E |
| 0000432200 | FF26 | 0A77 | FF26 | 0877 | 269A | C383 | 8384 | 04C4 |
| 0000432220 | 003D | 7500 | E903 | 008D | 76FF | FF08 | 0676 | 869A |
| 0000432240 | 6E62 | 8386 | 04C4 | 8D1E | F27E | F08B | 0716 | DA8E |
| 0000432260 | A5A5 | A5A5 | FF1F | 0C76 | 76FF | 9A0A | 6286 | 84D9 |
| 0000432300 | C483 | 8E04 | 8BC2 | 8DD8 | 9A1F | 9935 | 8685 | 5E8D |
| 0000432320 | 53F2 | 209A | 8B9E | 5B86 | 299A | 939B | 8D86 | F25E |
| 0000432340 | 2B9A | 9C99 | 8D86 | 5E1E | 9A7B | 9931 | 86A1 | 1D9A |
| 0000432360 | B49F | 7486 | E903 | 0006 | 00B8 | E900 | 00CF | 5E8D |
| 0000432400 | 9AF2 | 992B | 86BD | 1E8D | 7B5E | 319A | C299 | 9A86 |
| 0000432420 | 9F1D | 849E | 0372 | 06E9 | B800 | 0001 | AEE9 | B800 |
| 0000432440 | FFFF | A8E9 | C400 | 065E | 8B26 | 0C47 | 4689 | C4FC |
| 0000432460 | 0A5E | 8B26 | 0C47 | 4689 | 83FA | FC7E | 7400 | E903 |
| 0000432500 | 001B | 7E83 | 00FA | 0374 | 09E9 | B800 | 0000 | 7CE9 |
| 0000432520 | E900 | 0006 | FFB8 | E9FF | 0073 | 0FE9 | 8300 | FA7E |
| 0000432540 | 7400 | E903 | 0006 | 01B8 | E900 | 0061 | 468B | 3BFA |
| 0000432560 | FC46 | 037F | 03E9 | 8B00 | FC46 | C450 | 0A5E | FF26 |
| 0000432600 | 0A77 | FF26 | 0877 | 5EC4 | 2606 | 77FF | 260A | 77FF |
| 0000432620 | 9A08 | 65D2 | 851B | C483 | 890A | F046 | 7E83 | 00F0 |
| 0000432640 | 0374 | 22E9 | 8B00 | FC46 | 4639 | 75FA | E903 | 0017 |
| 0000432660 | 468B | 39FC | FA46 | 037E | 06E9 | B800 | 0001 | 03E9 |
| 0000432700 | B800 | FFFF | 06E9 | 8B00 | F046 | 00E9 | 5E0D | 835F |
| 0000432720 | 02ED | E58B | 5D1F | CB4D | 581E | 4590 | 8B55 | 1EEC |
| 0000432740 | D88E | EC81 | 0056 | 5657 | 46C7 | D1FA | 8C41 | FC5E |
| 0000432760 | 46C7 | 07D4 | 2B01 | 89C0 | C646 | 4689 | 8EC4 | 4006 |
| 0000433000 | 267B | 3E83 | 8877 | 7500 | E903 | 001D | 36FF | 3D0C |
| 0000433020 | 36FF | 3D0A | 468D | 16BA | 9A50 | 7F62 | 0000 | C483 |
| 0000433040 | 3D08 | 0000 | 0374 | 0FE9 | 8E00 | 4206 | 267B | 3E83 |
| 0000433060 | 7FED | 7500 | E903 | 003B | 681E | 41D8 | 468D | 16C8 |
| 0000433100 | 8D50 | BA46 | 5016 | 468D | 16F2 | 6850 | 0442 | 681E |
| 0000433120 | 4294 | 36FF | 3D08 | 36FF | 3D06 | 36FF | 3D0C | 36FF |
| 0000433140 | 3D0A | AB9A | 007F | 8300 | 1EC4 | 4689 | 89F2 | F456 |
| 0000433160 | 08E9 | 2B00 | 89C0 | F446 | 4689 | 6AF2 | C401 | 065E |
| 0000433200 | FF26 | 0277 | FF26 | 9A37 | 25DB | 8852 | C483 | 8906 |
| 0000433220 | D646 | 5689 | C4D8 | D65E | FF26 | 0277 | FF26 | 9A37 |
| 0000433240 | 6286 | 8507 | C483 | 1E04 | 7E8D | 8BB2 | 16F0 | 8E07 |
| 0000433260 | A5DA | A5A5 | 1FA5 | 5EC4 | 2606 | 478B | E912 | 01F5 |
| 0000433300 | 068E | 7B40 | 8326 | D53E | 007F | 0375 | 4BE9 | 8300 |
| 0000433320 | BE7E | 75FE | E903 | 0042 | 76FF | FF08 | 0676 | 681E |
| 0000433340 | 41DF | 468D | 16C8 | 8D50 | F246 | 5016 | 468D | 16BA |
| 0000433360 | 1E50 | 9468 | 6842 | 044F | 36FF | 3D08 | 36FF | 3D06 |
| 0000433400 | 36FF | 3D0C | 36FF | 3D0A | 681E | 41E6 | 6F68 | 687E |
| 0000433420 | 7E72 | 759A | 007E | 8300 | 2AC4 | 5EC4 | 2606 | 7F83 |
| 0000433440 | 0912 | 0374 | 0CE9 | 8D00 | 6C1E | 9A7B | 9931 | 88EA |
| 0000433460 | 09E9 | 8D00 | 741E | 9A7B | 9931 | 88F2 | 5E8D | 9AB2 |
| 0000433500 | 9EC1 | 88FC | EC83 | 8B08 | 9ADC | 9B29 | 8744 | 76FF |
| 0000433520 | FFD8 | D676 | C29A | 787B | 8385 | 0CC4 | E79A | 4729 |
| 0000433540 | 8E89 | 4E06 | 267B | 3E83 | 0AC2 | 7400 | E903 | 002C |
| 0000433560 | 068E | 7B50 | C426 | 761E | 260C | 1FC4 | FF26 | 0C77 |
| 0000433600 | 068E | 7B50 | C426 | 761E | 260C | 1FC4 | FF26 | 0A77 |
| 0000433620 | FF26 | 0877 | C19A | 3A11 | 8388 | 06C4 | 068E | 7B4E |
| 0000433640 | C726 | C206 | FF0A | C4FF | D65E | 8B26 | 2607 | 578B |
| 0000433660 | E902 | 068E | 068E | 7B40 | 8326 | 6F3E | 008B | 0375 |
| 0000433700 | 4BE9 | 8300 | BE7E | 75FE | E903 | 0042 | 76FF | FF08 |
| 0000433720 | 0676 | 681E | 41EF | 468D | 16C8 | 8D50 | F246 | 5016 |

THU MAR 14 17:52:34 1991 TSLINT.DLL PAGE 155, LINE 9087

| | | | | | | | | |
|---|---|---|---|---|---|---|---|---|
| 0000433740 | 468D | 16BA | 1E50 | 9468 | 6842 | 045A | 36FF | 3D08 |
| 0000433760 | 36FF | 3D06 | 36FF | 3D0C | 36FF | 3D0A | 681E | 41F6 |
| 0000434000 | B568 | 688B | 8BB8 | BB9A | 008B | 8300 | 2AC4 | 5EC4 |
| 0000434020 | 2606 | 7F83 | 0B12 | 0374 | 0CE9 | 8D00 | 6C1E | 9A7B |
| 0000434040 | 9931 | 89DE | 09E9 | 8D00 | 741E | 9A7B | 9931 | 89E6 |
| 0000434060 | 5E8D | 9AB2 | 9EC1 | 89F0 | EC83 | 8B08 | 9ADC | 9B29 |
| 0000434100 | 8BE1 | 76FF | FFD8 | D676 | C29A | E57B | 838A | 0CC4 |
| 0000434120 | E79A | 3B29 | 8E8A | 4E06 | 267B | 3E83 | 0AC2 | 7400 |
| 0000434140 | E903 | 002C | 068E | 7B50 | C426 | 761E | 260C | 1FC4 |
| 0000434160 | FF26 | 0C77 | 068E | 7B50 | C426 | 761E | 260C | 1FC4 |
| 0000434200 | FF26 | 0A77 | FF26 | 0877 | C19A | 5A11 | 838A | 06C4 |
| 0000434220 | 068E | 7B4E | C726 | C206 | FF0A | FFFF | B876 | 76FF |
| 0000434240 | FFB6 | B476 | 76FF | 9AB2 | 6DB2 | 8B04 | C483 | E908 |
| 0000434260 | 0590 | 1DE9 | 2D00 | 0009 | 037D | 15E9 | 4800 | 037F |
| 0000434300 | FDE9 | 48FD | 037D | 09E9 | 4800 | 037F | E5E9 | E9FE |
| 0000434320 | 0000 | 5EC4 | 2606 | 478B | 2604 | 578B | 8E06 | 5206 |
| 0000434340 | 267B | B0A3 | 260A | 1689 | 0AB2 | D00B | 0374 | 10E9 |
| 0000434360 | 8E00 | 5406 | 267B | 3AA1 | 2637 | 168B | 373C | 39E9 |
| 0000434400 | 8E00 | 5206 | 267B | 1EC4 | 0AB0 | 8326 | 127F | 744E |
| 0000434420 | E903 | 0010 | 068E | 7B52 | A126 | 0AB0 | 8B26 | B216 |
| 0000434440 | E90A | 0016 | 068E | 7B52 | FF26 | B236 | 260A | 36FF |
| 0000434460 | 0AB0 | 9F9A | FD49 | 838B | 04C4 | 068E | 7B56 | A326 |
| 0000434500 | 0A84 | 8926 | 8616 | 260A | 36FF | 0A86 | FF26 | 8436 |
| 0000434520 | 9A0A | 6286 | 8B56 | C483 | 1E04 | 7E8D | 8BE2 | 16F0 |
| 0000434540 | 8E07 | A5DA | A5A5 | 1FA5 | 068E | 7B56 | A126 | 0A86 |
| 0000434560 | 0B26 | 8406 | 750A | E903 | 0034 | C426 | 841E | 260A |
| 0000434600 | 47F6 | 0214 | 0375 | 22E9 | 8E00 | 5606 | 267B | 84A1 |
| 0000434620 | 260A | 168B | 0A86 | 068E | 7B4C | A326 | 0AA0 | 8926 |
| 0000434640 | A216 | 9A0A | 29E7 | 890F | 00E9 | E900 | 0000 | 5EC4 |
| 0000434660 | 2606 | 478B | E912 | 0376 | 068E | 7B40 | 8326 | 0C3E |
| 0000434700 | 008C | 0375 | 4BE9 | 8300 | BE7E | 75FE | E903 | 0042 |
| 0000434720 | 76FF | FF08 | 0676 | 681E | 41FF | 468D | 16C8 | 8D50 |
| 0000434740 | F246 | 5016 | 468D | 16BA | 1E50 | 9468 | 6842 | 0468 |
| 0000434760 | 36FF | 3D08 | 36FF | 3D06 | 36FF | 3D0C | 36FF | 3D0A |
| 0000435000 | 681E | 420D | 5268 | 688C | 8C55 | 589A | 008C | 8300 |
| 0000435020 | 2AC4 | 76FF | FFB8 | B676 | 76FF | FFB4 | B276 | 76FF |
| 0000435040 | FFE8 | E676 | 76FF | FFE4 | E276 | 468D | 50AA | 689A |
| 0000435060 | 65A2 | 8B8C | 36D8 | 77FF | 3606 | 77FF | 3604 | 77FF |
| 0000435100 | 3602 | 37FF | 76FF | FFD8 | D676 | C29A | 827B | 838C |
| 0000435120 | 0CC4 | 10E9 | 8E03 | 4006 | 267B | 3E83 | 8C91 | 7500 |
| 0000435140 | E903 | 004B | 7E83 | FEBE | 0375 | 42E9 | FF00 | 0876 |
| 0000435160 | 76FF | 1E06 | 1668 | 8D42 | C846 | 5016 | 468D | 16F2 |
| 0000435200 | 8D50 | BA46 | 5016 | 681E | 4294 | 6D68 | FF04 | 0836 |
| 0000435220 | FF3D | 0636 | FF3D | 0C36 | FF3D | 0A36 | 1E3D | 2668 |
| 0000435240 | 6842 | 8CD7 | DA68 | 9A8C | 8CDD | 0000 | C483 | 8D2A |
| 0000435260 | B25E | 2B9A | 6D99 | 8D8C | E25E | 499A | 779E | 838C |
| 0000435300 | 08EC | DC8B | 299A | EA9B | FF8C | D876 | 76FF | 9AD6 |
| 0000435320 | 7BC2 | 8D07 | C483 | E90C | 028B | 068E | 7B40 | 8326 |
| 0000435340 | B43E | 0087 | 0375 | 4BE9 | 8300 | BE7E | 75FE | E903 |
| 0000435360 | 0042 | 76FF | FF08 | 0676 | 681E | 422F | 468D | 16C8 |
| 0000435400 | 8D50 | F246 | 5016 | 468D | 16BA | 1E50 | 9468 | 6842 |
| 0000435420 | 0472 | 36FF | 3D08 | 36FF | 3D06 | 36FF | 3D0C | 36FF |
| 0000435440 | 3D0A | 681E | 4242 | BD68 | 6888 | 88C0 | C39A | 0088 |
| 0000435460 | 8300 | 2AC4 | 5E8D | 9AB2 | 992B | 8CF2 | 5E8D | 9AE2 |
| 0000435500 | 9E71 | 8CFC | EC83 | 8B08 | 9ADC | 9B29 | 88DE | 76FF |
| 0000435520 | FFD8 | D676 | C29A | 077B | 8389 | 0CC4 | 06E9 | 8E02 |
| 0000435540 | 4006 | 267B | 3E83 | 8DD8 | 7500 | E903 | 004B | 7E83 |
| 0000435560 | FEBE | 0375 | 42E9 | FF00 | 0876 | 76FF | 1E06 | 4B68 |
| 0000435600 | 8D42 | C846 | 5016 | 468D | 16F2 | 8D50 | BA46 | 5016 |

THU MAR 14 17:52:34 1991 TSLINT.DLL PAGE 156, LINE 9146

| | | | | | | | | |
|---|---|---|---|---|---|---|---|---|
| 0000435620 | 681E | 4294 | 7768 | FF04 | 0836 | FF3D | 0636 | FF3D |
| 0000435640 | 0C36 | FF3D | 0A36 | 1E3D | 5968 | 6842 | 8E1E | 2168 |
| 0000435660 | 9A8E | 8E24 | 000D | C483 | 8D2A | B25E | 2B9A | 7799 |
| 0000435700 | 8D8D | E25E | 719A | 7C9E | 9A8D | 9BF7 | 8D8A | 4689 |
| 0000435720 | 89F6 | F856 | 5E8D | 9AF6 | 99C0 | 8D92 | 5E8D | 9AE2 |
| 0000435740 | 9E49 | 8D9A | 5E8D | 9AEA | 9B29 | 8DA2 | 5E8D | 9AB2 |
| 0000435760 | 992B | 8DAA | 5E8D | 9AEA | 9DF7 | 8DB2 | 5E8D | 9ADA |
| 0000436000 | 9B29 | 8E31 | 76FF | FFE0 | DE76 | 76FF | FFDC | DA76 |
| 0000436020 | 76FF | FFD8 | D676 | C29A | 4E7B | 838E | 0CC4 | 44E9 |
| 0000436040 | 8E01 | 4006 | 267B | 3E83 | 8E5D | 7500 | E903 | 004B |
| 0000436060 | 7E83 | FEBE | 0375 | 42E9 | FF00 | 0876 | 76FF | 1E06 |
| 0000436100 | 6268 | 8D42 | C846 | 5016 | 468D | 16F2 | 8D50 | BA46 |
| 0000436120 | 5016 | 681E | 4294 | 7F68 | FF04 | 0836 | FF3D | 0636 |
| 0000436140 | FF3D | 0C36 | FF3D | 0A36 | 1E3D | 7168 | 6842 | 8EA3 |
| 0000436160 | A668 | 9A8E | 8EA9 | 000D | C483 | 8D2A | B25E | 2B9A |
| 0000436200 | 3999 | 8D8E | E25E | C19A | 439E | 838E | 08EC | DC8B |
| 0000436220 | 299A | B69B | FF8E | D876 | 76FF | 9AD6 | 7BC2 | 8ED3 |
| 0000436240 | C483 | E90C | 00BF | 068E | 7B40 | 8326 | 673E | 008F |
| 0000436260 | 0375 | 4BE9 | 8300 | BE7E | 75FE | E903 | 0042 | 76FF |
| 0000436300 | FF08 | 0676 | 681E | 427A | 468D | 16C8 | 8D50 | F246 |
| 0000436320 | 5016 | 468D | 16BA | 1E50 | 9468 | 6842 | 0484 | 36FF |
| 0000436340 | 3D08 | 36FF | 3D06 | 36FF | 3D0C | 36FF | 3D0A | 681E |
| 0000436360 | 428A | B168 | 6889 | 89B4 | B79A | 0089 | 8300 | 2AC4 |
| 0000436400 | 5E8D | 9AB2 | 992B | 8EBE | 5E8D | 9AE2 | 9DF7 | 8EC8 |
| 0000436420 | EC83 | 8B08 | 9ADC | 9B29 | 89D2 | 76FF | FFD8 | D676 |
| 0000436440 | C29A | FB7B | 8389 | 0CC4 | 3AE9 | E900 | 0037 | 123D |
| 0000436460 | 7500 | E903 | FE29 | 037E | 11E9 | 2D00 | 0010 | 0375 |
| 0000436500 | 12E9 | 48FD | 0375 | 91E9 | E9FD | 0019 | 132D | 7500 |
| 0000436520 | E903 | FECD | 7548 | E903 | FF4C | 372D | 7500 | E903 |
| 0000436540 | FC56 | 00E9 | 9A00 | 29E7 | 8F50 | 068E | 7B4E | 8326 |
| 0000436560 | C23E | 000A | 0374 | 2CE9 | 8E00 | 5006 | 267B | 1EC4 |
| 0000436600 | 0C76 | C426 | 261F | 77FF | 8E0C | 5006 | 267B | 1EC4 |
| 0000436620 | 0C76 | C426 | 261F | 77FF | 260A | 77FF | 9A08 | 11C1 |
| 0000436640 | 8A03 | C483 | 8E06 | 4E06 | 267B | 06C7 | 0AC2 | FFFF |
| 0000436660 | 068E | 7B40 | 8326 | 6B3E | 0089 | 0375 | 09E9 | 8300 |
| 0000436700 | BE7E | 74FE | E903 | 000F | 068E | 7B42 | 8326 | E03E |
| 0000436720 | 0087 | 0375 | 5EE9 | C400 | D65E | 8B26 | 2607 | 578B |
| 0000436740 | 8902 | C046 | 5689 | FFC2 | C676 | 76FF | 8DC4 | C046 |
| 0000436760 | 5016 | 76FF | FFD4 | FC76 | 76FF | 8DFA | C84E | 5116 |
| 0000437000 | 4E8D | 16F2 | 8D51 | BA4E | 5116 | 681E | 4294 | 8C68 |
| 0000437020 | FF04 | 0836 | FF3D | 0636 | FF3D | 0C36 | FF3D | 0A36 |
| 0000437040 | 9A3D | 8035 | 0000 | C483 | 8B28 | C046 | 568B | E9C2 |
| 0000437060 | 0010 | 0DE9 | C400 | D65E | 8B26 | 2607 | 578B | E902 |
| 0000437100 | 0000 | 5F5E | ED83 | 8B02 | 1FE5 | 4D5D | 1ECB | 9058 |
| 0000437120 | 5545 | EC8B | 8E1E | 81D8 | 26EC | 5700 | C756 | FA46 |
| 0000437140 | 429E | 5E8C | C7FC | F246 | 0101 | C02B | 4689 | 89E4 |
| 0000437160 | E246 | 068E | 7B40 | 8326 | AF3E | 0090 | 0375 | 1DE9 |
| 0000437200 | FF00 | 0C36 | FF3D | 0A36 | 8D3D | DA46 | 5016 | CA9A |
| 0000437220 | 0087 | 8300 | 08C4 | 003D | 7400 | E903 | 000F | 068E |
| 0000437240 | 7B42 | 8326 | 2C3E | 0091 | 0375 | 3BE9 | 1E00 | A268 |
| 0000437260 | 8D42 | E646 | 5016 | 468D | 16DA | 8D50 | F646 | 5016 |
| 0000437300 | B168 | 1E04 | AA68 | FF42 | 0836 | FF3D | 0636 | FF3D |
| 0000437320 | 0C36 | FF3D | 0A36 | 9A3D | 8813 | 0000 | C483 | 891E |
| 0000437340 | F646 | 5689 | E9F8 | 0008 | C02B | 4689 | 89F8 | F646 |
| 0000437360 | 009A | 6F00 | 898D | F446 | 068E | 7B40 | 8326 | 143E |
| 0000437400 | 0091 | 0375 | 41E9 | 8300 | DE7E | 75FE | E903 | 0038 |
| 0000437420 | 76FF | 1EF4 | A668 | 8D42 | E646 | 5016 | 468D | 16F6 |
| 0000437440 | 8D50 | DA46 | 5016 | 681E | 42AA | B468 | FF04 | 0836 |
| 0000437460 | FF3D | 0636 | FF3D | 0C36 | FF3D | 0A36 | 683D | 0101 |

THU MAR 14 17:52:34 1991 TSLINT.DLL PAGE 157, LINE 9205

| | | | | | | | | |
|---|---|---|---|---|---|---|---|---|
| 0000437500 | 7B9A | 002F | 8300 | 22C4 | 7E83 | 00F4 | 0374 | 8CE9 |
| 0000437520 | C400 | 065E | C02B | 8926 | 0247 | 8926 | 8E07 | 4006 |
| 0000437540 | 267B | 3E83 | 8D16 | 7500 | E903 | 0009 | 7E83 | FEDE |
| 0000437560 | 0374 | 0FE9 | 8E00 | 4206 | 267B | 3E83 | 8F7F | 7500 |
| 0000437600 | E903 | 0050 | 46C7 | 00E0 | FF00 | E476 | 76FF | 8DE2 |
| 0000437620 | E046 | 5016 | 76FF | FFF2 | FC76 | 76FF | 8DFA | E64E |
| 0000437640 | 5116 | 4E8D | 16F6 | 8D51 | DA4E | 5116 | 681E | 42AA |
| 0000437660 | B768 | FF04 | 0836 | FF3D | 0636 | FF3D | 0C36 | FF3D |
| 0000437700 | 0A36 | 9A3D | 8FD2 | 0000 | C483 | 8B28 | E046 | A0E9 |
| 0000437720 | E900 | 0006 | 00B8 | E900 | 0097 | 94E9 | 8E00 | 7C06 |
| 0000437740 | 267B | 72A1 | 260C | 168B | 0C74 | 5EC4 | 2606 | 0789 |
| 0000437760 | 8926 | 0257 | 068E | 7B40 | 8326 | 293E | 0090 | 0375 |
| 0000440000 | 09E9 | 8300 | DE7E | 74FE | E903 | 000F | 068E | 7B42 |
| 0000440020 | 8326 | 553E | 0090 | 0375 | 50E9 | C700 | E046 | 0001 |
| 0000440040 | 76FF | FFE4 | E276 | 468D | 16E0 | FF50 | F276 | 76FF |
| 0000440060 | FFFC | FA76 | 4E8D | 16E6 | 8D51 | F64E | 5116 | 4E8D |
| 0000440100 | 16DA | 1E51 | AA68 | 6842 | 04BB | 36FF | 3D08 | 36FF |
| 0000440120 | 3D06 | 36FF | 3D0C | 36FF | 3D0A | 749A | 0091 | 8300 |
| 0000440140 | 28C4 | 468B | E9E0 | 0009 | 06E9 | B800 | 0001 | 00E9 |
| 0000440160 | 5E00 | 835F | 02ED | E58B | 5D1F | CB4D | 581E | 4590 |
| 0000440200 | 8B55 | 1EEC | D88E | EC81 | 0024 | 5657 | 46C7 | B2FA |
| 0000440220 | 8C42 | FC5E | 46C7 | 00F4 | 2B00 | 89C0 | E646 | 4689 |
| 0000440240 | 8EE4 | 4006 | 267B | 3E83 | 91AB | 7500 | E903 | 001D |
| 0000440260 | 36FF | 3D0C | 36FF | 3D0A | 468D | 16DC | 9A50 | 903F |
| 0000440300 | 0000 | C483 | 3D08 | 0000 | 0374 | 0FE9 | 8E00 | 4206 |
| 0000440320 | 267B | 3E83 | 91C3 | 7500 | E903 | 003B | 681E | 42B6 |
| 0000440340 | 468D | 16E8 | 8D50 | DC46 | 5016 | 468D | 16F6 | 6850 |
| 0000440360 | 04D9 | 681E | 42E8 | 36FF | 3D08 | 36FF | 3D06 | 36FF |
| 0000440400 | 3D0C | 36FF | 3D0A | 889A | 0090 | 8300 | 1EC4 | 4689 |
| 0000440420 | 89F6 | F856 | 08E9 | 2B00 | 89C0 | F846 | 4689 | 8EF6 |
| 0000440440 | 4006 | 267B | 3E83 | 9258 | 7400 | E903 | 000F | 068E |
| 0000440460 | 7B42 | 8326 | 843E | 0092 | 0375 | 0CE9 | 1E00 | BA68 |
| 0000440500 | 9A42 | FFFF | 0000 | C483 | 6A04 | 9A00 | FFFF | 0000 |
| 0000440520 | 068E | 7B7E | A326 | 0C6E | 8926 | 7016 | 260C | 36FF |
| 0000440540 | 0C70 | FF26 | 6E36 | 6A0C | 9A00 | FFFF | 0000 | 068E |
| 0000440560 | 7B80 | A326 | 0080 | 8926 | 8216 | 6800 | 472F | 0468 |
| 0000440600 | 9A00 | 68D2 | 90A3 | C483 | 3D04 | 0006 | 0374 | 54E9 |
| 0000440620 | 8E00 | 4006 | 267B | 3E83 | 93A6 | 7500 | E903 | 0045 |
| 0000440640 | 7E83 | FEE0 | 0375 | 3CE9 | 1E00 | C168 | 8D42 | E846 |
| 0000440660 | 5016 | 468D | 16F6 | 8D50 | DC46 | 5016 | 681E | 42E8 |
| 0000440700 | E268 | FF04 | 0836 | FF3D | 0636 | FF3D | 0C36 | FF3D |
| 0000440720 | 0A36 | 1E3D | DF68 | 6842 | 8D5C | 5F68 | 9A8D | 8D62 |
| 0000440740 | 0000 | C483 | 9A26 | 22A2 | 939D | 0D9A | C994 | 8E8D |
| 0000440760 | 4006 | 267B | 3E83 | 92D6 | 7500 | E903 | 0009 | 7E83 |
| 0000441000 | FEE0 | 0374 | 0FE9 | 8E00 | 4206 | 267B | 3E83 | 92E5 |
| 0000441020 | 7500 | E903 | 0039 | 468D | 16E8 | 8D50 | F646 | 5016 |
| 0000441040 | 468D | 16DC | 1E50 | E868 | 6842 | 04E8 | 36FF | 3D08 |
| 0000441060 | 36FF | 3D06 | 36FF | 3D0C | 36FF | 3D0A | 009A | 007F |
| 0000441100 | 8300 | 1AC4 | 46C7 | 00E2 | E900 | 0006 | 03E9 | E900 |
| 0000441120 | 0000 | 5F5E | ED83 | 8B02 | 1FE5 | 4D5D | 1ECB | 9058 |
| 0000441140 | 5545 | EC8B | 8E1E | 81D8 | 3AEC | 5700 | C756 | FA46 |
| 0000441160 | 42F8 | 5E8C | C7FC | DE46 | 0000 | C02B | 4689 | 89D0 |
| 0000441200 | CE46 | 068E | 7B40 | 8326 | 483E | 0093 | 0375 | 1DE9 |
| 0000441220 | FF00 | 0C36 | FF3D | 0A36 | 8D3D | C646 | 5016 | 6E9A |
| 0000441240 | 0092 | 8300 | 08C4 | 003D | 7400 | E903 | 000F | 068E |
| 0000441260 | 7B42 | 8326 | BE3E | 0093 | 0375 | 3BE9 | 1E00 | FC68 |
| 0000441300 | 8D42 | D246 | 5016 | 468D | 16C6 | 8D50 | F246 | 5016 |
| 0000441320 | F768 | 1E04 | 9068 | FF43 | 0836 | FF3D | 0636 | FF3D |
| 0000441340 | 0C36 | FF3D | 0A36 | 9A3D | 92B7 | 0000 | C483 | 891E |

THU MAR 14 17:52:34 1991 TSLINT.DLL PAGE 158, LINE 9264

| | | | | | | | | |
|---|---|---|---|---|---|---|---|---|
| 0000441360 | F246 | 5685 | E9F4 | 0008 | C02B | 4689 | 89F4 | F246 |
| 0000441400 | 126A | 2C68 | 6893 | 0A88 | 468D | 16E0 | 9A50 | 662E |
| 0000441420 | 9334 | C483 | 8E0A | 8206 | 267B | 06FF | 385A | 049A |
| 0000441440 | 18ED | 688F | 955C | 8868 | 9A0A | 68D2 | 9564 | C483 |
| 0000441460 | E904 | 010B | 21E9 | 8E01 | 4006 | 267B | 3E83 | 9589 |
| 0000441500 | 7500 | E903 | 0045 | 7E83 | FECA | 0375 | 3CE9 | 1E00 |
| 0000441520 | 0068 | 8D43 | D246 | 5016 | 468D | 16F2 | 8D50 | C646 |
| 0000441540 | 5016 | 681E | 4390 | 0568 | FF05 | 0836 | FF3D | 0636 |
| 0000441560 | FF3D | 0C36 | FF3D | 0A36 | 1E3D | 1B68 | 6843 | 95C9 |
| 0000441600 | CC68 | 9A95 | 95CF | 0000 | C483 | 8E26 | 4806 | 267B |
| 0000441620 | 06C7 | 385E | 0000 | 068E | 7B5A | C726 | 5C06 | 0038 |
| 0000441640 | E900 | 00B4 | 126A | 468D | 16E0 | 6850 | 9575 | 8868 |
| 0000441660 | 9A0A | 662E | 957D | C483 | 8E0A | 8206 | 267B | 0EFF |
| 0000441700 | 385A | 036A | 4668 | 6897 | 0038 | FC9A | 4E68 | 8397 |
| 0000441720 | 06C4 | 068E | 7B40 | 8326 | 403E | 0096 | 0375 | 45E9 |
| 0000441740 | 8300 | CA7E | 75FE | E903 | 003C | 681E | 4323 | 468D |
| 0000441760 | 16D2 | 8D50 | F246 | 5016 | 468D | 16C6 | 1E50 | 9068 |
| 0000442000 | 6843 | 050D | 36FF | 3D08 | 36FF | 3D06 | 36FF | 3D0C |
| 0000442020 | 36FF | 3D0A | 681E | 4330 | 8068 | 6896 | 9683 | 869A |
| 0000442040 | 0096 | 8300 | 26C4 | 681E | 4336 | 0E68 | 1E05 | 4668 |
| 0000442060 | 9A43 | B3B6 | 960B | C483 | E90A | 001C | 19E9 | 0B00 |
| 0000442100 | 75C0 | E903 | FEEE | 032D | 7500 | E903 | FF56 | 4848 |
| 0000442120 | 0375 | E2E9 | E9FE | FF7A | DC9A | 299C | C796 | 1206 |
| 0000442140 | 003E | 8E00 | 4C06 | 2B7B | 26CD | A2A3 | 260A | A0A3 |
| 0000442160 | 8D0A | F646 | 5016 | FD9A | 0D8F | 8397 | 04C4 | 003D |
| 0000442200 | 7400 | E903 | 0003 | 00E9 | 8E01 | 4006 | 267B | 3E83 |
| 0000442220 | 9694 | 7500 | E903 | 0045 | 7E83 | FECA | 0375 | 3CE9 |
| 0000442240 | 1E00 | 6268 | 8D43 | D246 | 5016 | 468D | 16F2 | 8D50 |
| 0000442260 | C646 | 5016 | 681E | 4390 | 1A68 | FF05 | 0836 | FF3D |
| 0000442300 | 0636 | FF3D | 0C36 | FF3D | 0A36 | 1E3D | 7E68 | 6843 |
| 0000442320 | 96D0 | D368 | 9A96 | 938E | 0000 | C483 | 8E26 | 4006 |
| 0000442340 | 267B | 3E83 | 9763 | 7500 | E903 | 0057 | 7E83 | FECA |
| 0000442360 | 0375 | 4EE9 | 8D00 | D246 | 5016 | 468D | 16F2 | 8D50 |
| 0000442400 | C646 | 5016 | 681E | 4390 | 1D68 | FF05 | 0836 | FF3D |
| 0000442420 | 0636 | FF3D | 0C36 | FF3D | 0A36 | 1E3D | 8768 | 6843 |
| 0000442440 | 9388 | 8B68 | 9A93 | 2E7E | 0000 | C483 | 3D22 | 0000 |
| 0000442460 | 0375 | 0EE9 | FF00 | F876 | 76FF | 9AF6 | 8200 | 53A2 |
| 0000442500 | C483 | C704 | 1206 | 013E | 9A00 | 9713 | 0000 | 9A50 |
| 0000442520 | FFFF | 0000 | 76FF | FFF8 | F676 | 029A | 312D | 8397 |
| 0000442540 | 04C4 | FF9A | 00FF | 5000 | FF9A | 00FF | 9A00 | FFFF |
| 0000442560 | 0000 | 068E | 7B44 | A326 | 3846 | 006A | 006A | 009A |
| 0000442600 | 3CA3 | 8397 | 04C4 | D4E9 | 9AFE | 2795 | 9398 | 126A |
| 0000442620 | 468D | 16E0 | 6850 | 94B3 | 8868 | 9A0A | 662E | 94C0 |
| 0000442640 | C483 | 8E0A | 8206 | 267B | 0EFF | 385A | 068E | 7B40 |
| 0000442660 | 8326 | 393E | 0094 | 0375 | 09E9 | 8300 | CA7E | 74FE |
| 0000442700 | E903 | 000F | 068E | 7B42 | 8326 | 653E | 0094 | 0375 |
| 0000442720 | 39E9 | 8D00 | D246 | 5016 | 468D | 16F2 | 8D50 | C646 |
| 0000442740 | 5016 | 681E | 4390 | 3E68 | FF05 | 0836 | FF3D | 0636 |
| 0000442760 | FF3D | 0C36 | FF3D | 0A36 | 9A3D | 93ED | 0000 | C483 |
| 0000443000 | C71A | CC46 | 0000 | 06E9 | E900 | 0003 | 00E9 | 5E00 |
| 0000443020 | 835F | 02ED | E58B | 5D1F | CB4D | 581E | 4590 | 8B55 |
| 0000443040 | IEEC | D88E | EC81 | 0026 | 5657 | B81E | 2BE8 | D88E |
| 0000443060 | 46C7 | AFFA | 8C43 | FC5E | 46C7 | 01F4 | 2B01 | 89C0 |
| 0000443100 | E646 | 4689 | 8EE4 | 8406 | 267B | 3E83 | 94EE | 7500 |
| 0000443120 | E903 | 001D | 36FF | 43E2 | 36FF | 43E0 | 468D | 16DC |
| 0000443140 | 9A50 | 944F | 0000 | C483 | 3D08 | 0000 | 0374 | 0FE9 |
| 0000443160 | 8E00 | 8606 | 267B | 3E83 | 977B | 7500 | E903 | 003A |
| 0000443200 | 681E | 43B6 | 468D | 16E8 | 8D50 | DC46 | 5016 | 468D |
| 0000443220 | 16F6 | 6A50 | 1E66 | E868 | FF43 | DE36 | FF43 | DC36 |

THU MAR 14 17:52:34 1991 TSLINT.DLL PAGE 159, LINE 9323

| | | | | | | | | |
|---|---|---|---|---|---|---|---|---|
| 0000443240 | FF43 | E236 | FF43 | E036 | 9A43 | 9498 | 0000 | C483 |
| 0000443260 | 891E | F646 | 5689 | E9F8 | 0008 | C02B | 4689 | 89F8 |
| 0000443300 | F646 | 468B | 8E06 | 8806 | 267B | 9EA3 | 8E0A | 8406 |
| 0000443320 | 267B | 3E83 | 97FC | 7500 | E903 | 0044 | 7E83 | FEE0 |
| 0000443340 | 0375 | 3BE9 | 1E00 | BD68 | 8D43 | E846 | 5016 | 468D |
| 0000443360 | 16F6 | 8D50 | DC46 | 5016 | 681E | 43E8 | 696A | 36FF |
| 0000443400 | 43DE | 36FF | 43DC | 36FF | 43E2 | 36FF | 43E0 | 681E |
| 0000443420 | 43D4 | 2E68 | 6895 | 9531 | 349A | 0095 | 8300 | 26C4 |
| 0000443440 | 068E | 7B8A | FF26 | 8436 | 9A00 | FFFF | 0000 | 4689 |
| 0000443460 | 3DDA | 0000 | 0375 | 00E9 | 8E00 | 8406 | 267B | 3E83 |
| 0000443500 | 9884 | 7500 | E903 | 0009 | 7E83 | FEE0 | 0374 | 0FE9 |
| 0000443520 | 8E00 | 8606 | 267B | 3E83 | 9828 | 7500 | E903 | 004F |
| 0000443540 | 46C7 | 00E2 | FF00 | E676 | 76FF | 8DE4 | E246 | 5016 |
| 0000443560 | 76FF | FFF4 | FC76 | 76FF | 8DFA | E84E | 5116 | 4E8D |
| 0000443600 | 16F6 | 8D51 | DC4E | 5116 | 681E | 43E8 | 6E6A | 36FF |
| 0000443620 | 43DE | 36FF | 43DC | 36FF | 43E2 | 36FF | 43E0 | 0B9A |
| 0000443640 | 0092 | 8300 | 28C4 | 468B | E9E2 | 0009 | 06E9 | B800 |
| 0000443660 | 0000 | 00E9 | 1F00 | 5F5E | ED83 | 8B02 | 1FE5 | 4D5D |
| 0000443700 | 02CA | 1E00 | 9058 | 5545 | EC8B | 8E1E | 81D8 | 24EC |
| 0000443720 | 5700 | 1E56 | DCB8 | 8E97 | C7D8 | FA46 | 43F2 | 5E8C |
| 0000443740 | C7FC | F446 | 0000 | C02B | 4689 | 89E6 | E446 | 068E |
| 0000443760 | 7B84 | 8326 | F03E | 0098 | 0375 | 1DE9 | FF00 | E236 |
| 0000444000 | FF43 | E036 | 8D43 | DC46 | 5016 | 129A | 0098 | 8300 |
| 0000444020 | 08C4 | 003D | 7400 | E903 | 000F | 068E | 7B86 | 8326 |
| 0000444040 | 083E | 0099 | 0375 | 3BE9 | 1E00 | F668 | 8D43 | E846 |
| 0000444060 | 5016 | 468D | 16DC | 8D50 | F646 | 5016 | 8368 | 1E00 |
| 0000444100 | FA68 | FF43 | DE36 | FF43 | DC36 | FF43 | E236 | FF43 |
| 0000444120 | E036 | 9A43 | 985A | 0000 | C483 | 891E | F646 | 5689 |
| 0000444140 | E9F8 | 0008 | C02B | 4689 | 89F8 | F646 | 068E | 7B8C |
| 0000444160 | C726 | 4C06 | 0138 | 8E00 | 8406 | 267B | 3E83 | 99A5 |
| 0000444200 | 7500 | E903 | 0009 | 7E83 | FEE0 | 0374 | 0FE9 | 8E00 |
| 0000444220 | 8606 | 267B | 3E83 | 99D1 | 7500 | E903 | 0039 | 468D |
| 0000444240 | 16E8 | 8D50 | F646 | 5016 | 468D | 16DC | 1E50 | FA68 |
| 0000444260 | 6843 | 0087 | 36FF | 43DE | 36FF | 43DC | 36FF | 43E2 |
| 0000444300 | 36FF | 43E0 | AA9A | 0097 | 8300 | 1AC4 | 46C7 | 00E2 |
| 0000444320 | E900 | 0006 | 03E9 | E900 | 0000 | 5E1F | 835F | 02ED |
| 0000444340 | E58B | 5D1F | CB4D | 581E | 4590 | 8B55 | 1EEC | D88E |
| 0000444360 | EC81 | 0024 | 5657 | B81E | 9985 | D88E | 46C7 | 04FA |
| 0000444400 | 8C44 | FC5E | 46C7 | 00F4 | 2B00 | 89C0 | E646 | 4689 |
| 0000444420 | 8EE4 | 8406 | 267B | 3E83 | 9A2E | 7500 | E903 | 001D |
| 0000444440 | 36FF | 43E2 | 36FF | 43E0 | 468D | 16DC | 9A50 | 99BB |
| 0000444460 | 0000 | C483 | 3D08 | 0000 | 0374 | 0FE9 | 8E00 | 8606 |
| 0000444500 | 267B | 3E83 | 9A46 | 7500 | E903 | 003B | 681E | 4408 |
| 0000444520 | 468D | 16E8 | 8D50 | DC46 | 5016 | 468D | 16F6 | 6850 |
| 0000444540 | 009D | 681E | 440C | 36FF | 43DE | 36FF | 43DC | 36FF |
| 0000444560 | 43E2 | 36FF | 43E0 | 049A | 009A | 8300 | 1EC4 | 4689 |
| 0000444600 | 89F6 | F856 | 08E9 | 2B00 | 89C0 | F846 | 4689 | 8EF6 |
| 0000444620 | 8E06 | 267B | 06C7 | 3850 | 0001 | 939A | E4E2 | 8E95 |
| 0000444640 | 8406 | 267B | 3E83 | 9AC8 | 7500 | E903 | 0009 | 7E83 |
| 0000444660 | FEE0 | 0374 | 0FE9 | 8E00 | 8606 | 267B | 3E83 | 9AF4 |
| 0000444700 | 7500 | E903 | 0039 | 468D | 16E8 | 8D50 | F646 | 5016 |
| 0000444720 | 468D | 16DC | 1E50 | 0C68 | 6844 | 00A3 | 36FF | 43DE |
| 0000444740 | 36FF | 43DC | 36FF | 43E2 | 36FF | 43E0 | 759A | 009A |
| 0000444760 | 8300 | 1AC4 | 46C7 | 00E2 | E900 | 0006 | 03E9 | E900 |
| 0000445000 | 0000 | 5E1F | 835F | 02ED | E58B | 5D1F | CB4D | 581E |
| 0000445020 | 4590 | 8B55 | 1EEC | D88E | EC81 | 0024 | 5657 | B81E |
| 0000445040 | 9AA8 | D88E | 46C7 | 16FA | 8C44 | FC5E | 46C7 | 00F4 |
| 0000445060 | 2B00 | 89C0 | E646 | 4689 | 8EE4 | 8406 | 267B | 3E83 |
| 0000445100 | 9C74 | 7500 | E903 | 001D | 36FF | 43E2 | 36FF | 43E0 |

THU MAR 14 17:52:34 1991 TSLINT.DLL PAGE 160, LINE 9382

| | | | | | | | | |
|---|---|---|---|---|---|---|---|---|
| 0000445120 | 468D | 16DC | 9A50 | 9ADE | 0000 | C483 | 3D08 | 0000 |
| 0000445140 | 0374 | 0FE9 | 8E00 | 8606 | 267B | 3E83 | 9C8C | 7500 |
| 0000445160 | E903 | 003B | 681E | 441A | 468D | 16E8 | 8D50 | DC46 |
| 0000445200 | 5016 | 468D | 16F6 | 6850 | 00B8 | 681E | 441E | 36FF |
| 0000445220 | 43DE | 36FF | 43DC | 36FF | 43E2 | 36FF | 43E0 | 279A |
| 0000445240 | 009B | 8300 | 1EC4 | 4689 | 89F6 | F856 | 08E9 | 2B00 |
| 0000445260 | 89C0 | F846 | 4689 | C7F6 | E406 | 0143 | 8E00 | 8406 |
| 0000445300 | 267B | 3E83 | 9B56 | 7500 | E903 | 0009 | 7E83 | FEE0 |
| 0000445320 | 0374 | 0FE9 | 8E00 | 8606 | 267B | 3E83 | 9B6E | 7500 |
| 0000445340 | E903 | 0039 | 468D | 16E8 | 8D50 | F646 | 5016 | 468D |
| 0000445360 | 16DC | 1E50 | 1E68 | 6844 | 00BA | 36FF | 43DE | 36FF |
| 0000445400 | 43DC | 36FF | 43E2 | 36FF | 43E0 | 9D9A | 009B | 8300 |
| 0000445420 | 1AC4 | 46C7 | 00E2 | E900 | 0006 | 03E9 | E900 | 0000 |
| 0000445440 | 5E1F | 835F | 02ED | E58B | 5D1F | CB4D | 581E | 459C |
| 0000445460 | 8B55 | 1EEC | D88E | EC81 | 0024 | 5657 | 46C7 | 2FFA |
| 0000445500 | 8C44 | FC5E | 46C7 | 01F4 | 2B01 | 89C0 | E646 | 4689 |
| 0000445520 | 8EE4 | 8406 | 267B | 3E83 | 9BF0 | 7500 | E903 | 001D |
| 0000445540 | 36FF | 43E2 | 36FF | 43E0 | 468D | 16DC | 9A50 | 9C06 |
| 0000445560 | 0000 | C483 | 3D08 | 0000 | 0374 | 0FE9 | 8E00 | 8606 |
| 0000445600 | 267B | 3E83 | 9C1C | 7500 | E903 | 003B | 681E | 4436 |
| 0000445620 | 468D | 16E8 | 8D50 | DC46 | 5016 | 468D | 16F6 | 6850 |
| 0000445640 | 00E2 | 681E | 44F2 | 36FF | 43DE | 36FF | 43DC | 36FF |
| 0000445660 | 43E2 | 36FF | 43E0 | 4F9A | 009C | 8300 | 1EC4 | 4689 |
| 0000445700 | 89F6 | F856 | 08E9 | 2B00 | 89C0 | F846 | 4689 | 83F6 |
| 0000445720 | 023E | 0045 | 0375 | 5CE9 | 8E01 | 9006 | 267B | 3E83 |
| 0000445740 | 9DAE | 7500 | E903 | 0068 | 068E | 7B5E | 8326 | 503E |
| 0000445760 | 0038 | 0375 | 59E9 | 8E00 | 9006 | 267B | 3E83 | FFFF |
| 0000446000 | 7500 | E903 | 004A | 681E | 443D | 068E | 7B92 | FF26 |
| 0000446020 | 0236 | 2600 | 36FF | 9E3D | 468D | 16E8 | 8D50 | F646 |
| 0000446040 | 5016 | 468D | 16DC | 1E50 | F268 | 6844 | 00EB | 36FF |
| 0000446060 | 43DE | 36FF | 43DC | 36FF | 43E2 | 36FF | 43E0 | 681E |
| 0000446100 | 4453 | 6A68 | 689E | 9E6D | 709A | 009E | 8300 | 2AC4 |
| 0000446120 | 068E | 7B90 | 8326 | 253E | 009E | 0375 | 68E9 | 8E00 |
| 0000446140 | 8C06 | 267B | 3E83 | 384C | 7500 | E903 | 0059 | 068E |
| 0000446160 | 7B90 | 8326 | 7E3E | 009E | 0375 | 4AE9 | 1E00 | 5C68 |
| 0000446200 | 8E44 | 9206 | 267B | 36FF | 0002 | FF26 | AB36 | 8D9E |
| 0000446220 | E846 | 5016 | 468D | 16F6 | 8D50 | DC46 | 5016 | 681E |
| 0000446240 | 44F2 | EC68 | FF00 | DE36 | FF43 | DC36 | FF43 | E236 |
| 0000446260 | FF43 | E036 | 1E43 | 7068 | 6844 | 9ED8 | DB68 | 9A9E |
| 0000446300 | 9EDE | 0000 | C483 | 8E2A | 9006 | 267B | 3E83 | 9E93 |
| 0000446320 | 7500 | E903 | 005F | 3E83 | 43E4 | 7501 | E903 | 0055 |
| 0000446340 | 8326 | 903E | 009D | 0375 | 4AE9 | 1E00 | 7968 | 8E44 |
| 0000446360 | 9206 | 267B | 36FF | 0002 | FF26 | FF36 | 8DFF | E846 |
| 0000446400 | 5016 | 468D | 16F6 | 8D50 | DC46 | 5016 | 681E | 44F2 |
| 0000446420 | ED68 | FF00 | DE36 | FF43 | DC36 | FF43 | E236 | FF43 |
| 0000446440 | E036 | 1E43 | 8B68 | 6844 | 98C3 | C668 | 9A98 | FFFF |
| 0000446460 | 0000 | C483 | 8E2A | 8E06 | 267B | 3E83 | 3850 | 7500 |
| 0000446500 | E903 | 000A | DB9A | FCAB | 9A9E | AAB5 | 9B4D | 068E |
| 0000446520 | 7B8C | 8326 | 4C3E | 0038 | 0375 | 40E9 | 8E00 | 9406 |
| 0000446540 | 267B | 3E83 | 3852 | 7500 | E903 | 000A | C726 | 5206 |
| 0000446560 | 0038 | E900 | 001D | DB9A | 46AB | 9A9F | FFFF | 0000 |
| 0000446600 | 6A50 | 9A00 | FFFF | 0000 | FA9A | 0096 | 5000 | 199A |
| 0000446620 | 0097 | 9A00 | AA07 | 9F4B | E69A | 9AA8 | 83A0 | 023E |
| 0000446640 | 0045 | 0375 | 89E9 | C700 | 0206 | 0045 | C700 | E406 |
| 0000446660 | 0043 | 8E00 | 8406 | 267B | 3E83 | 9FF1 | 7500 | E903 |
| 0000446700 | 0009 | 7E83 | FEE0 | 0374 | 0FE9 | 8E00 | 8606 | 267B |
| 0000446720 | 3E83 | A009 | 7500 | E903 | 0050 | 46C7 | 00E2 | FF00 |
| 0000446740 | E676 | 76FF | 8DE4 | E246 | 5016 | 76FF | FFF4 | FC76 |
| 0000446760 | 76FF | 8DFA | E84E | 5116 | 4E8D | 16F6 | 8D51 | DC4E |

THU MAR 14 17:52:34 1991 TSLINT.DLL PAGE 161, LINE 9441

| | | | | | | | | |
|---|---|---|---|---|---|---|---|---|
| 0000447000 | 5116 | 681E | 44F2 | 1B68 | FF01 | DE36 | FF43 | DC36 |
| 0000447020 | FF43 | E236 | FF43 | E036 | 9A43 | A051 | 0000 | C483 |
| 0000447040 | 8B28 | E246 | 1EE9 | E903 | 0006 | 00B8 | E900 | 0315 |
| 0000447060 | 3E83 | 43E4 | 7400 | E903 | 007D | 068E | 7B84 | 8326 |
| 0000447100 | 083E | 009D | 0375 | 09E9 | 8300 | E07E | 74FE | E903 |
| 0000447120 | 000F | 068E | 7B86 | 8326 | 343E | 009D | 0375 | 50E9 |
| 0000447140 | C700 | E246 | 0000 | 76FF | FFE6 | E476 | 468D | 16E2 |
| 0000447160 | FF50 | F476 | 76FF | FFFC | FA76 | 4E8D | 16E8 | 8D51 |
| 0000447200 | F64E | 5116 | 4E8D | 16DC | 1E51 | F268 | 6844 | 0123 |
| 0000447220 | 36FF | 43DE | 36FF | 43DC | 36FF | 43E2 | 36FF | 43E0 |
| 0000447240 | 4F9A | 0099 | 8300 | 28C4 | 468B | E9E2 | D297 | 06E9 |
| 0000447260 | B800 | 0000 | 8EE9 | C702 | E406 | 0043 | 8E00 | 8C06 |
| 0000447300 | 267B | 06C7 | 384C | 0000 | 068E | 7B88 | C726 | 9E06 |
| 0000447320 | FF0A | 83FF | E63E | 0343 | 0375 | 0AE9 | 8300 | E63E |
| 0000447340 | 0243 | 0374 | 05E9 | 9A00 | ABDB | 9EF7 | 068E | 7B84 |
| 0000447360 | 8326 | 0D3E | 00AI | 0375 | 45E9 | 8300 | E07E | 75FE |
| 0000447400 | E903 | 003C | 681E | 4494 | 468D | 16E8 | 8D50 | F646 |
| 0000447420 | 5016 | 468D | 16DC | 1E50 | F268 | 6844 | 0142 | 36FF |
| 0000447440 | 43DE | 36FF | 43DC | 36FF | 43E2 | 36FF | 43E0 | 681E |
| 0000447460 | 44AD | CA68 | 68A1 | A1CD | D09A | 00AI | 8300 | 26C4 |
| 0000447500 | 068E | 7B8A | FF26 | 8436 | 9A00 | FFFF | 0000 | 003D |
| 0000447520 | 7500 | E903 | 007D | 068E | 7B84 | 8326 | 8A3E | 00A1 |
| 0000447540 | 0375 | 09E9 | 8300 | E07E | 74FE | E903 | 000F | 068E |
| 0000447560 | 7B86 | 8326 | 823E | 009F | 0375 | 50E9 | C700 | E246 |
| 0000447600 | 0005 | 76FF | FFE6 | E476 | 468D | 16E2 | FF50 | F476 |
| 0000447620 | 76FF | FFFC | FA76 | 4E8D | 16E8 | 8D51 | F64E | 5116 |
| 0000447640 | 4E8D | 16DC | 1E51 | F268 | 6844 | 0144 | 36FF | 43DE |
| 0000447660 | 36FF | 43DC | 36FF | 43E2 | 36FF | 43E0 | CA9A | 009F |
| 0000447700 | 8300 | 28C4 | 468B | E9E2 | 017B | 06E9 | B800 | 0005 |
| 0000447720 | 72E9 | 8E01 | 8406 | 267B | 3E83 | 9F6A | 7500 | E903 |
| 0000447740 | 0045 | 7E83 | FEE0 | 0375 | 3CE9 | 1E00 | B568 | 8D44 |
| 0000447760 | E846 | 5016 | 468D | 16F6 | 8D50 | DC46 | 5016 | 681E |
| 0000450000 | 44F2 | 4768 | FF01 | DE36 | FF43 | DC36 | FF43 | E236 |
| 0000450020 | FF43 | E036 | 1E43 | CC68 | 6844 | 9DF3 | F668 | 9A9D |
| 0000450040 | 98C9 | 0000 | C483 | 8E26 | 8E06 | 267B | 3E83 | 3850 |
| 0000450060 | 7500 | E903 | 0018 | 06C7 | 4502 | 0001 | 139A | 00A2 |
| 0000450100 | 5000 | 006A | 349A | 009F | 9A00 | AAB5 | A210 | 068E |
| 0000450120 | 7B8C | 8326 | 4C3E | 0038 | 0375 | 6BE9 | 9A00 | AA43 |
| 0000450140 | 9F29 | 2C9A | 009F | 8E00 | 9606 | 267B | 46A3 | 8E38 |
| 0000450160 | 8406 | 267B | 3E83 | A27F | 7500 | E903 | 0045 | 7E83 |
| 0000450200 | FEE0 | 0375 | [illegible] | 1E00 | D468 | 8D44 | E846 | 5016 |
| 0000450220 | 468D | 16F6 | 8D50 | DC46 | 5016 | 681E | 44F2 | 6568 |
| 0000450240 | FF01 | DE36 | FF43 | DC36 | FF43 | E236 | FF43 | E036 |
| 0000450260 | 1E43 | EA68 | 6844 | A0E3 | E668 | 9AA0 | A0E9 | 0000 |
| 0000450300 | C483 | 9A26 | A8E6 | A1FC | 068E | 7B84 | 8326 | A33E |
| 0000450320 | 00A0 | 0375 | 09E9 | 8300 | E07E | 74FE | E903 | 000F |
| 0000450340 | 068E | 7B86 | 8326 | 253E | 00A1 | 0375 | 50E9 | C700 |
| 0000450360 | E246 | 0000 | 76FF | FFE6 | E476 | 468D | 16E2 | FF50 |
| 0000450400 | F476 | 76FF | FFFC | FA76 | 4E8D | 16E8 | 8D51 | F64E |
| 0000450420 | 5116 | 4E8D | 16DC | 1E51 | F268 | 6844 | 0168 | 36FF |
| 0000450440 | 43DE | 36FF | 43DC | 36FF | 43E2 | 36FF | 43E0 | 6D9A |
| 0000450460 | 00A1 | 8300 | 28C4 | 468B | E9E2 | 0009 | 06E9 | B800 |
| 0000450500 | 0000 | 00E9 | 5E00 | 835F | 02ED | E58B | 5D1F | CB4D |
| 0000450520 | 581E | 4590 | 8B55 | 1EEC | D88E | EC81 | 0024 | 5657 |
| 0000450540 | 46C7 | 04FA | 8C45 | FC5E | 46C7 | 00F4 | 2B00 | 89C0 |
| 0000450560 | E646 | 4689 | 8EE4 | 8406 | 267B | 3E83 | A3D8 | 7500 |
| 0000450600 | E903 | 001D | 36FF | 43E2 | 36FF | 43E0 | 468D | 16DC |
| 0000450620 | 9A50 | 9D1E | 0000 | C483 | 3D08 | 0000 | 0374 | 0FE9 |
| 0000450640 | 8E00 | 8606 | 267B | 3E83 | A459 | 7500 | E903 | 003B |

THU MAR 14 17:52:34 1991 TSLINT.DLL PAGE 162, LINE 9500

| | | | | | | | | |
|---|---|---|---|---|---|---|---|---|
| 0000450660 | 681E | 4508 | 468D | 16E8 | 8D50 | DC46 | 5016 | 468D |
| 0000450700 | 16F6 | 6850 | 0182 | 681E | 4568 | 36FF | 43DE | 36FF |
| 0000450720 | 43DC | 36FF | 43E2 | 36FF | 43E0 | 679A | 009D | 8300 |
| 0000450740 | 1EC4 | 4689 | 89F6 | F856 | 08E9 | 2B00 | 89C0 | F846 |
| 0000450760 | 4689 | 8EF6 | 8E06 | 267B | 3E83 | 3850 | 7500 | E903 |
| 0000451000 | 0005 | DC9A | CF9C | 8EA3 | 8C06 | 267B | 3E83 | 384C |
| 0000451020 | 7500 | E903 | 005F | 06C7 | 43E6 | 0001 | DC9A | 389C |
| 0000451040 | 8EA4 | 8406 | 267B | 3E83 | A441 | 7500 | E903 | 0045 |
| 0000451060 | 7E83 | FEE0 | 0375 | 3CE9 | 1E00 | 0C68 | 8D45 | E846 |
| 0000451100 | 5016 | 468D | 16F6 | 8D50 | DC46 | 5016 | 681E | 4568 |
| 0000451120 | 8F68 | FF01 | DE36 | FF43 | DC36 | FF43 | E236 | FF43 |
| 0000451140 | E036 | 1E43 | 3368 | 6845 | A4FA | FD68 | 9AA4 | A500 |
| 0000451160 | 0000 | C483 | 8326 | E43E | 0043 | 0375 | 6EE9 | C700 |
| 0000451200 | E606 | 0243 | 9A00 | 9CDC | A4A6 | 068E | 7B84 | 8326 |
| 0000451220 | BA3E | 00A4 | 0375 | 09E9 | 8300 | E07E | 74FE | E903 |
| 0000451240 | 000F | 068E | 7B86 | 8326 | 373E | 00A5 | 0375 | 39E9 |
| 0000451260 | 8D00 | E846 | 5016 | 468D | 16F6 | 8D50 | DC46 | 5016 |
| 0000451300 | 681E | 4568 | 9468 | FF01 | DE36 | FF43 | DC36 | FF43 |
| 0000451320 | E236 | FF43 | E036 | 9A43 | A566 | 0000 | C483 | C71A |
| 0000451340 | E246 | 0000 | E4E9 | E900 | 0003 | DEE9 | FF00 | 0876 |
| 0000451360 | 76FF | 9A06 | A586 | A516 | C483 | 3D04 | 0000 | 0375 |
| 0000451400 | 65E9 | 8E00 | 8406 | 267B | 3E83 | A51F | 7500 | E903 |
| 0000451420 | 0045 | 7E83 | FEE0 | 0375 | 3CE9 | 1E00 | 3968 | 8D45 |
| 0000451440 | E846 | 5016 | 468D | 16F6 | 8D50 | DC46 | 5016 | 681E |
| 0000451460 | 4568 | 9768 | FF01 | DE36 | FF43 | DC36 | FF43 | E236 |
| 0000451500 | FF43 | E036 | 1E43 | 5F68 | 6845 | A266 | 6968 | 9AA2 |
| 0000451520 | A26C | 0000 | C483 | C726 | E406 | 0143 | C700 | E606 |
| 0000451540 | 0343 | 9A00 | 9CDC | A276 | 068E | 7B84 | 8326 | 263E |
| 0000451560 | 00A2 | 0375 | 09E9 | 8300 | E07E | 74FE | E903 | 000F |
| 0000451600 | 068E | 7B86 | 8326 | 973E | 00A2 | 0375 | 39E9 | 8D00 |
| 0000451620 | E846 | 5016 | 468D | 16F6 | 8D50 | DC46 | 5016 | 681E |
| 0000451640 | 4568 | 9D68 | FF01 | DE36 | FF43 | DC36 | FF43 | E236 |
| 0000451660 | FF43 | E036 | 9A43 | 9CBB | 0000 | C483 | C71A | E246 |
| 0000451700 | 0000 | 06E9 | E900 | 0003 | 00E9 | 5E00 | 835F | 02ED |
| 0000451720 | E58B | 5D1F | CB4D | 581E | 4590 | 8B55 | 1EEC | D88E |
| 0000451740 | EC81 | 0024 | 5657 | 46C7 | 78FA | 8C45 | FC5E | 46C7 |
| 0000451760 | 0DF4 | 2B01 | 89C0 | E646 | 4689 | 8EE4 | 8406 | 267B |
| 0000452000 | 3E83 | A645 | 7500 | E903 | 001D | 36FF | 43E2 | 36FF |
| 0000452020 | 43E0 | 468D | 16DC | 9A50 | A342 | 0000 | C483 | 3D08 |
| 0000452040 | 0000 | 0374 | 0FE9 | 8E00 | 8606 | 267B | 3E83 | A65D |
| 0000452060 | 7500 | E903 | 003B | 681E | 457D | 468D | 16E8 | 8D50 |
| 0000452100 | DC46 | 5016 | 468D | 16F6 | 6850 | 01AA | 681E | 45A6 |
| 0000452120 | 36FF | 43DE | 36FF | 43DC | 36FF | 43E2 | 36FF | 43E0 |
| 0000452140 | 8B9A | 00A3 | 8300 | 1EC4 | 4689 | 89F6 | F856 | 08E9 |
| 0000452160 | 2B00 | 89C0 | F846 | 4689 | 8BF6 | 0846 | 460B | 7506 |
| 0000452200 | E903 | 0095 | 5EC4 | 2606 | 478B | E912 | 008D | 068E |
| 0000452220 | 7B84 | 8326 | DF3E | 00A6 | 0375 | 09E9 | 8300 | E07E |
| 0000452240 | 74FE | E903 | 000F | 068E | 7B86 | 8326 | 693E | 00A7 |
| 0000452260 | 0375 | 50E9 | C700 | E246 | 0000 | 76FF | FFE6 | E476 |
| 0000452300 | 468D | 16E2 | FF50 | F476 | 76FF | FFFC | FA76 | 4E8D |
| 0000452320 | 16E8 | 8D51 | F64E | 5116 | 4E8D | 16DC | 1E51 | A668 |
| 0000452340 | 6845 | 01B3 | 36FF | 43DE | 36FF | 43DC | 36FF | 43E2 |
| 0000452360 | 36FF | 43E0 | B19A | 00A7 | 8300 | 28C4 | 468B | E9E2 |
| 0000452400 | 0229 | 06E9 | B800 | 0000 | 20E9 | E902 | 000B | 252D |
| 0000452420 | 7500 | E903 | FF78 | 00E9 | 8E00 | 8806 | 267B | 3E83 |
| 0000452440 | 0A9E | 7403 | E903 | 00EF | 068E | 7B84 | 8326 | 513E |
| 0000452460 | 00A7 | 0375 | 4EE9 | 8300 | E07E | 75FE | E903 | 0045 |
| 0000452500 | 068E | 7B96 | FF26 | 4636 | 1E38 | 8268 | 8D45 | E846 |
| 0000452520 | 5016 | 468D | 16F6 | 8D50 | DC46 | 5016 | 681E | 45A6 |

THU MAR 14 17:52:34 1991 TSLINT.DLL PAGE 163, LINE 9559

| | | | | | | | | |
|---|---|---|---|---|---|---|---|---|
| 0000452540 | BC68 | FF01 | DE36 | FF43 | DC36 | FF43 | E236 | FF43 |
| 0000452560 | E036 | 1E43 | 9E68 | 6845 | A418 | 1B68 | 9AA4 | A41E |
| 0000452600 | 0000 | C483 | 8E28 | 9606 | 267B | 36FF | 3846 | FF9A |
| 0000452620 | 00FF | 6A00 | 9A01 | FFFF | 0000 | 068E | 7B84 | 8326 |
| 0000452640 | E83E | 00A7 | 0375 | 09E9 | 8300 | E07E | 74FE | E903 |
| 0000452660 | 000F | 068E | 7B86 | 8326 | 003E | 00A8 | 0375 | 50E9 |
| 0000452700 | C700 | E246 | 0000 | 76FF | FFE6 | E476 | 468D | 16E2 |
| 0000452720 | FF50 | F476 | 76FF | FFFC | FA76 | 4E8D | 16E8 | 8D51 |
| 0000452740 | F64E | 5116 | 4E8D | 16DC | 1E51 | A668 | 6845 | 01C0 |
| 0000452760 | 36FF | 43DE | 36FF | 43DC | 36FF | 43E2 | 36FF | 43E0 |
| 0000453000 | 489A | 00A8 | 8300 | 28C4 | 468B | E9E2 | 011D | 06E9 |
| 0000453020 | B800 | 0000 | 14E9 | 8E01 | 8806 | 267B | 3E83 | 0A9E |
| 0000453040 | 7501 | E903 | 0088 | 8326 | 9E3E | 020A | 0375 | 7DE9 |
| 0000453060 | 8E00 | 8406 | 267B | 3E83 | A865 | 7500 | E903 | 0009 |
| 0000453100 | 7E83 | FEE0 | 0374 | 0FE9 | 8E00 | 8606 | 267B | 3E83 |
| 0000453120 | A87D | 7500 | E903 | 0050 | 46C7 | 00E2 | FF00 | E676 |
| 0000453140 | 76FF | 8DE4 | E246 | 5016 | 76FF | FFF4 | FC76 | 76FF |
| 0000453160 | 8DFA | E84E | 5116 | 4E8D | 16F6 | 8D51 | DC4E | 5116 |
| 0000453200 | 681E | 45A6 | C568 | FF01 | DE36 | FF43 | DC36 | FF43 |
| 0000453220 | E236 | FF43 | E036 | 9A43 | A8C5 | 0000 | C483 | 8B28 |
| 0000453240 | E246 | 86E9 | E900 | 0006 | 00B8 | E900 | 007D | 068E |
| 0000453260 | 7B84 | 8326 | 2C3E | 00A3 | 0375 | 09E9 | 8300 | E07E |
| 0000453300 | 74FE | E903 | 000F | 068E | 7B86 | 8326 | 583E | 00A3 |
| 0000453320 | 0375 | 50E9 | C700 | E246 | 0001 | 76FF | FFE6 | E476 |
| 0000453340 | 468D | 16E2 | FF50 | F476 | 76FF | FFFC | FA76 | 4E8D |
| 0000453360 | 16E8 | 8D51 | F64E | 5116 | 4E8D | 16DC | 1E51 | A668 |
| 0000453400 | 6845 | 01C7 | 36FF | 43DE | 36FF | 43DC | 36FF | 43E2 |
| 0000453420 | 36FF | 43E0 | DF9A | 00A2 | 8300 | 28C4 | 468B | E9E2 |
| 0000453440 | 0009 | 06E9 | B800 | 0001 | 00E9 | 5E00 | 835F | 02ED |
| 0000453460 | E58B | 5D1F | CB4D | 581E | 4590 | 8B55 | 1EEC | D88E |
| 0000453500 | EC81 | 0024 | 5657 | 46C7 | B5FA | 8C45 | FC5E | 46C7 |
| 0000453520 | 00F4 | 2B00 | 89C0 | E646 | 4689 | 8EE4 | 8406 | 267B |
| 0000453540 | 3E83 | A5B2 | 7500 | E903 | 001D | 36FF | 43E2 | 36FF |
| 0000453560 | 43E0 | 468D | 16DC | 9A50 | A5C8 | 0000 | C483 | 3D08 |
| 0000453600 | 0000 | 0374 | 0FE9 | 8E00 | 8606 | 267B | 3E83 | A5DE |
| 0000453620 | 7500 | E903 | 003B | 681E | 45B9 | 468D | 16E8 | 8D50 |
| 0000453640 | DC46 | 5016 | 468D | 16F6 | 6850 | 01E0 | 681E | 45BE |
| 0000453660 | 36FF | 43DE | 36FF | 43DC | 36FF | 43E2 | 36FF | 43E0 |
| 0000453700 | 119A | 00A6 | 8300 | 1EC4 | 4689 | 89F6 | F856 | 08E9 |
| 0000453720 | 2B00 | 89C0 | F846 | 4689 | 6AF6 | 6805 | 94D4 | 8868 |
| 0000453740 | 9A0A | 68FC | 94DC | C483 | 8E06 | 8406 | 267B | 3E83 |
| 0000453760 | A912 | 7500 | E903 | 0009 | 7E83 | FEE0 | 0374 | DFE9 |
| 0000454000 | 8E00 | 8606 | 267B | 3E83 | A93E | 7500 | E903 | 0039 |
| 0000454020 | 468D | 16E8 | 8D50 | F646 | 5016 | 468D | 16DC | 1E50 |
| 0000454040 | BE68 | 6845 | 01E4 | 36FF | 43DE | 36FF | 43DC | 36FF |
| 0000454060 | 43E2 | 36FF | 43E0 | 889A | 00A4 | 8300 | 1AC4 | 46C7 |
| 0000454100 | 00E2 | E900 | 0006 | 03E9 | E900 | 0000 | 5F5E | ED83 |
| 0000454120 | 8B02 | 1FE5 | 4D5D | 1ECB | 9058 | 5545 | EC8B | 8E1E |
| 0000454140 | 81D8 | 00EC | 5700 | C756 | E406 | 0143 | 8E00 | 8C06 |
| 0000454160 | 267B | 06C7 | 384C | 0000 | 068E | 7B8E | C726 | 5006 |
| 0000454200 | 0038 | 9A00 | ED04 | 94D1 | 5F5E | ED83 | 8B02 | 1FE5 |
| 0000454220 | 4D5D | 1ECB | 9058 | 5545 | EC8B | 8E1E | 81D8 | 00EC |
| 0000454240 | 5700 | 8E56 | 8C06 | 267B | 06C7 | 384C | 0000 | 068E |
| 0000454260 | 7B8E | C726 | 5006 | 0038 | C700 | E406 | 0043 | 9A00 |
| 0000454300 | ED04 | AA36 | 5F5E | ED83 | 8B02 | 1FE5 | 4D5D | 1ECB |
| 0000454320 | 9058 | 5545 | EC8B | 8E1E | 81D8 | 00EC | 5700 | 9A56 |
| 0000454340 | 9973 | A3B5 | 06C7 | 43E6 | 0001 | 068E | 7B98 | C726 |
| 0000454360 | 5406 | 0138 | 9A00 | 9CDC | AA92 | 5F5E | ED83 | 8B02 |
| 0000454400 | 1FE5 | 4D5D | 1ECB | 9058 | 5545 | EC8B | 8E1E | 81D8 |

THU MAR 14 17:52:34 1991 TSLINT.DLL PAGE 164, LINE 9618

| | | | | | | | | |
|---|---|---|---|---|---|---|---|---|
| 0000454420 | 24EC | 5700 | C756 | FA46 | 45CA | 5E8C | C7FC | F446 |
| 0000454440 | 0000 | C02B | 4689 | 89E6 | E446 | 068E | 7B84 | 8326 |
| 0000454460 | 743E | 00AB | 0375 | 1DE9 | FF00 | E236 | FF43 | E036 |
| 0000454500 | 8D43 | DC46 | 5016 | 289A | 00A9 | 8300 | 08C4 | 003D |
| 0000454520 | 7400 | E903 | 000F | 068E | 7B86 | 8326 | 8C3E | 00AB |
| 0000454540 | 0375 | 3BE9 | 1E00 | CE68 | 8D45 | E846 | 5016 | 468D |
| 0000454560 | 16DC | 8D50 | F646 | 5016 | 6268 | 1E02 | D268 | FF45 |
| 0000454600 | DE36 | FF43 | DC36 | FF43 | E236 | FF43 | E036 | 9A43 |
| 0000454620 | A971 | 0000 | C483 | 891E | F646 | 5689 | E9F8 | 0008 |
| 0000454640 | C02B | 4689 | 89F8 | F646 | FF9A | 00FF | 6A00 | 6806 |
| 0000454660 | A98C | 0468 | 9A00 | 68FC | A994 | C483 | 8E06 | 8406 |
| 0000454700 | 267B | 3E83 | A9A0 | 7500 | E903 | 0009 | 7E83 | FEE0 |
| 0000454720 | 0374 | 0FE9 | 8E00 | 8606 | 267B | 3E83 | A9B8 | 7500 |
| 0000454740 | E903 | 0039 | 468D | 16E8 | 8D50 | F646 | 5016 | 468D |
| 0000454760 | 16DC | 1E50 | D268 | 6845 | D269 | 36FF | 43DE | 36FF |
| 0000455000 | 43DC | 36FF | 43E2 | 36FF | 43E0 | E79A | 00A9 | 8300 |
| 0000455020 | 1AC4 | 46C7 | 00E2 | E900 | 0006 | 03E9 | E900 | 0000 |
| 0000455040 | 5F5E | ED83 | 8B02 | 1FE5 | 4D5D | 1ECB | 9058 | 5545 |
| 0000455060 | EC8B | 8E1E | 81D8 | 24EC | 5700 | C756 | FA46 | 45EA |
| 0000455100 | 5E8C | C7FC | F446 | 0000 | C02B | 4689 | 89E6 | E446 |
| 0000455120 | 068E | 7B84 | 8326 | D93E | 00AC | 0375 | 1DE9 | FF00 |
| 0000455140 | E236 | FF43 | E036 | 8D43 | DC46 | 5016 | F79A | 00AA |
| 0000455160 | 8300 | 08C4 | 003D | 7400 | E903 | 000F | 068E | 7B86 |
| 0000455200 | 8326 | F13E | 00AC | 0375 | 3BE9 | 1E00 | EE68 | 8D45 |
| 0000455220 | E846 | 5016 | 468D | 16DC | 8D50 | F646 | 5016 | 8868 |
| 0000455240 | 1E02 | F268 | FF45 | DE36 | FF43 | DC36 | FF43 | E236 |
| 0000455260 | FF43 | E036 | 9A43 | AB40 | 0000 | C483 | 891E | F646 |
| 0000455300 | 5689 | E9F8 | 0008 | C02B | 4689 | 89F8 | F646 | FF9A |
| 0000455320 | 00FF | 9A00 | FFFF | 0000 | 7548 | E903 | 0012 | 016A |
| 0000455340 | FF9A | 00FF | 9A00 | 9F39 | 0000 | 9A50 | FFFF | 0000 |
| 0000455360 | 068E | 7B8E | 8326 | 503E | 0038 | 0375 | 0EE9 | 9A00 |
| 0000455400 | 971E | 0000 | 9A50 | ACC7 | 0000 | 0EE9 | 8E00 | 9606 |
| 0000455420 | 267B | 36FF | 3846 | 3F9A | 00A7 | 6A00 | 9A01 | A746 |
| 0000455440 | 0000 | 068E | 7B84 | 8326 | E13E | 00AA | 0375 | 09E9 |
| 0000455460 | 8300 | E07E | 74FE | E903 | 000F | 068E | 7B86 | 8326 |
| 0000455500 | 0D3E | 00AB | 0375 | 39E9 | 8D00 | E846 | 5016 | 468D |
| 0000455520 | 16F6 | 8D50 | DC46 | 5016 | 681E | 45F2 | 9568 | FF02 |
| 0000455540 | DE36 | FF43 | DC36 | FF43 | E236 | FF43 | E036 | 9A43 |
| 0000455560 | ABBB | 0000 | C483 | C71A | E246 | 0000 | 06E9 | E900 |
| 0000455600 | 0003 | 00E9 | 5E00 | 835F | 02ED | E58B | 5D1F | CB4D |
| 0000455620 | 581E | 4590 | 8B55 | 1EEC | D88E | EC81 | 0130 | 5657 |
| 0000455640 | 46C7 | 15FA | 8C46 | FC5E | 86C7 | FEF0 | 0000 | C02B |
| 0000455660 | 8689 | FEE2 | 8689 | FEE0 | 068E | 7B9A | 8326 | 073E |
| 0000455700 | 00AC | 0375 | 1EE9 | FF00 | 4236 | FF46 | 4036 | 8D46 |
| 0000455720 | D886 | 16FE | 9A50 | AC1D | 0000 | C483 | 3D08 | 0000 |
| 0000455740 | 0374 | 0FE9 | 8E00 | 9C06 | 267B | 3E83 | AC33 | 7500 |
| 0000455760 | E903 | 003F | 681E | 4619 | 868D | FEE4 | 5016 | 868D |
| 0000456000 | FED8 | 5016 | 868D | FEF2 | 5016 | 546A | 681E | 4646 |
| 0000456020 | 36FF | 463E | 36FF | 463C | 36FF | 4642 | 36FF | 464D |
| 0000456040 | 669A | 00AC | 8300 | 1EC4 | 8689 | FEF2 | 9689 | FEF4 |
| 0000456060 | 0AE9 | 2B00 | 89C0 | F486 | 89FE | F286 | FFFE | 4406 |
| 0000456100 | 8D46 | 0A46 | 4689 | 8CF6 | F856 | 76FF | FFF8 | F676 |
| 0000456120 | 76FF | FF08 | 0676 | 868D | FEF6 | 5016 | 829A | 685A |
| 0000456140 | 83AB | 0CC4 | C02B | 4689 | 89F8 | F646 | 068E | 7B9E |
| 0000456160 | A126 | DAA6 | 0B26 | A406 | 740A | E903 | 0020 | 86C7 |
| 0000456200 | FED0 | 461D | 9E8C | FED2 | 868B | FED0 | 968B | FED2 |
| 0000456220 | 0D05 | 8900 | D486 | 89FE | D696 | E9FE | 00E9 | 068E |
| 0000456240 | 7B9E | C426 | A41E | 260A | 3F80 | 740A | E903 | 002E |
| 0000456260 | 068E | 7B9E | A126 | 0AA4 | 8B26 | A616 | 8E0A | A006 |

THU MAR 14 17:52:34 1991 TSLINT.DLL PAGE 165, LINE 9677

| | | | | | | | | |
|---|---|---|---|---|---|---|---|---|
| 0000456300 | 267B | 0639 | 0C8E | 0374 | 0AE9 | 2600 | 1639 | 0C90 |
| 0000456320 | 0375 | 09E9 | 8E00 | 9E06 | 267B | 0EFF | 0AA4 | 068E |
| 0000456340 | 7B9E | A126 | 0AA4 | 8B26 | A616 | 890A | D086 | 89FE |
| 0000456360 | D296 | E9FE | 0004 | 8EFF | FED0 | 868B | FED0 | 968B |
| 0000456400 | FED2 | 068E | 7BA0 | 3926 | 8E06 | 740C | E903 | 000A |
| 0000456420 | 3926 | 9016 | 750C | E903 | 0010 | 9EC4 | FED0 | 8026 |
| 0000456440 | 0A3F | 0375 | 03E9 | E900 | FFCC | 068E | 7B9E | A126 |
| 0000456460 | 0AA4 | 8B26 | A616 | 890A | D486 | 89FE | D696 | E9FE |
| 0000456500 | 0004 | 86FF | FED4 | 9EC4 | FED4 | 8026 | 003F | 0375 |
| 0000456520 | 10E9 | C400 | D49E | 26FE | 3F80 | 750A | E903 | 0003 |
| 0000456540 | DFE9 | 8BFF | D086 | 8BFE | D296 | 8EFE | A006 | 267B |
| 0000456560 | 0639 | 0C8E | 0374 | 0AE9 | 2600 | 1639 | 0C90 | 0375 |
| 0000456600 | 04E9 | FF00 | D086 | FFFE | D2B6 | FFFE | D0B6 | 8BFE |
| 0000456620 | D486 | 2BFE | D086 | 50FE | 868D | FEF6 | 5016 | 068E |
| 0000456640 | 7BA2 | FF26 | 4436 | 6838 | 9BD0 | 4468 | 1E37 | 2B68 |
| 0000456660 | 9A46 | B1D3 | AF6C | C483 | 9A14 | AA7F | AAA8 | 068E |
| 0000456700 | 7B9A | 8326 | 6F3E | 00AD | 0375 | 0AE9 | 8300 | DCBE |
| 0000456720 | FEFE | 0374 | 0FE9 | 8E00 | 9C06 | 267B | 3E83 | AD9C |
| 0000456740 | 7500 | E903 | 003C | 868D | FEE4 | 5016 | 868D | FEF2 |
| 0000456760 | 5016 | 868D | FED8 | 5016 | 681E | 4646 | 726A | 36FF |
| 0000457000 | 463E | 36FF | 463C | 36FF | 4642 | 36FF | 4640 | 209A |
| 0000457020 | 00AD | 8300 | 1AC4 | 86C7 | FEDE | 0000 | 06E9 | E900 |
| 0000457040 | 0003 | 00E9 | 5E00 | 835F | 02ED | E58B | 5D1F | CB4D |
| 0000457060 | 581E | 4590 | 8B55 | 1EEC | D88E | EC81 | 0024 | 5657 |
| 0000457100 | 46C7 | 50FA | 8C46 | FC5E | 46C7 | 00F4 | 2B00 | 89C0 |
| 0000457120 | E646 | 4689 | 8EE4 | 9A06 | 267B | 3E83 | B09C | 7500 |
| 0000457140 | E903 | 001D | 36FF | 4642 | 36FF | 4640 | 468D | 16DC |
| 0000457160 | 9A50 | AD86 | 0000 | C483 | 3D08 | 0000 | 0374 | 0FE9 |
| 0000457200 | 8E00 | 9C06 | 267B | 3E83 | B0B4 | 7500 | E903 | 003B |
| 0000457220 | 681E | 4654 | 468D | 16E8 | 8D50 | DC46 | 5016 | 468D |
| 0000457240 | 16F6 | 6850 | 0086 | 681E | 4658 | 36FF | 463E | 36FF |
| 0000457260 | 463C | 36FF | 4642 | 36FF | 4640 | D19A | 00AD | 8300 |
| 0000457300 | 1EC4 | 4689 | 89F6 | F856 | 08E9 | 2B00 | 89C0 | F846 |
| 0000457320 | 4689 | FFF6 | 0676 | FF9A | 00FF | 5200 | 9A50 | AD40 |
| 0000457340 | AF64 | C483 | 8E04 | 9A06 | 267B | 3E83 | AF75 | 7500 |
| 0000457360 | E903 | 0009 | 7E83 | FEE0 | 0374 | 0FE9 | 8E00 | 9C06 |
| 0000457400 | 267B | 3E83 | AF8E | 7500 | E903 | 0039 | 468D | 16E8 |
| 0000457420 | 8D50 | F646 | 5016 | 468D | 16DC | 1E50 | 5868 | 6846 |
| 0000457440 | 008A | 36FF | 463E | 36FF | 463C | 36FF | 4642 | 36FF |
| 0000457460 | 4640 | BF9A | 00AF | 8300 | 1AC4 | 46C7 | 00E2 | E900 |
| 0000457500 | 0006 | 03E9 | E900 | 0000 | 5F5E | ED83 | 8B02 | 1FE5 |
| 0000457520 | 4D5D | 1ECB | 9058 | 5545 | EC8B | 8E1E | 81D8 | 28EC |
| 0000457540 | 5701 | C756 | FA46 | 4667 | 5E8C | C7FC | F046 | 0000 |
| 0000457560 | C02B | 4689 | 89E2 | E046 | 068E | 7B9A | 8326 | E33E |
| 0000457600 | 00B1 | 0375 | 1DE9 | FF00 | 4236 | FF46 | 4036 | 8D46 |
| 0000457620 | D846 | 5016 | 229A | 00B0 | 8300 | 08C4 | 003D | 7400 |
| 0000457640 | E903 | 000F | 068E | 7B9C | 8326 | FB3E | 00B1 | 0375 |
| 0000457660 | 3BE9 | 1E00 | 6B68 | 8D46 | E446 | 5016 | 468D | 16D8 |
| 0000457700 | 8D50 | F246 | 5016 | 9168 | 1ED0 | 7068 | FF46 | 3E36 |
| 0000457720 | FF46 | 3C36 | FF46 | 4236 | FF46 | 4036 | 9A46 | B06B |
| 0000457740 | 0000 | C483 | 891E | F246 | 5689 | E9F4 | 0008 | C02B |
| 0000457760 | 4689 | 89F4 | F246 | 468D | 890A | F646 | 568C | FFF8 |
| 0000460000 | F876 | 76FF | FFF6 | 0876 | 76FF | 8D06 | D886 | 16FE |
| 0000460020 | 9A50 | 5A82 | AE0F | C483 | 2B0C | 89C0 | F846 | 4689 |
| 0000460040 | 8DF6 | D886 | 16FE | 9A50 | FFFF | 0000 | 068E | 7B9A |
| 0000460060 | 8326 | 0C3E | 00B0 | 0375 | 09E9 | 8300 | DC7E | 74FE |
| 0000460100 | E903 | 000F | 068E | 7B9C | 8326 | 383E | 00B0 | 0375 |
| 0000460120 | 39E9 | 8D00 | E446 | 5016 | 468D | 16F2 | 8D50 | D846 |
| 0000460140 | 5016 | 681E | 4670 | 9968 | FF00 | 3E36 | FF46 | 3C36 |

THU MAR 14 17:52:34 1991 TSLINT.DLL PAGE 166, LINE 9736

| | | | | | | | | |
|---|---|---|---|---|---|---|---|---|
| 0000460160 | FF46 | 4236 | FF46 | 4036 | 9A46 | B0E3 | 0000 | C483 |
| 0000460200 | C71A | DE46 | 0000 | 06E9 | E900 | 0003 | 00E9 | 5E00 |
| 0000460220 | 835F | 02ED | E58B | 5D1F | CB4D | 581E | 4590 | 8B55 |
| 0000460240 | 1EEC | D88E | EC81 | 0228 | 5657 | 46C7 | 78FA | 8C46 |
| 0000460260 | FC5E | 86C7 | FEF0 | 0000 | C02B | 8689 | FEE2 | 8689 |
| 0000460300 | FEE0 | 068E | 7B9A | 8326 | 4B3E | 00B3 | 0375 | 1EE9 |
| 0000460320 | FF00 | 4236 | FF46 | 4036 | 8D46 | D886 | 16FE | 9A50 |
| 0000460340 | B145 | 0000 | C483 | 3D08 | 0000 | 0374 | 0FE9 | 8E00 |
| 0000460360 | 9C06 | 267B | 3E83 | B364 | 7500 | E903 | 003D | 681E |
| 0000460400 | 467C | 868D | FEE4 | 5016 | 868D | FED8 | 5016 | 468D |
| 0000460420 | 16F2 | 6850 | 009F | 681E | 468C | 36FF | 463E | 36FF |
| 0000460440 | 463C | 36FF | 4642 | 36FF | 4640 | 8E9A | 00B1 | 8300 |
| 0000460460 | 1EC4 | 4689 | 89F2 | F456 | 08E9 | 2B00 | 89C0 | F446 |
| 0000460500 | 4689 | 8DF2 | 0A46 | 4689 | 8CF6 | F856 | 76FF | FFF8 |
| 0000460520 | F676 | 76FF | FF08 | 0676 | 868D | FDD8 | 5016 | 829A |
| 0000460540 | 315A | 83B3 | 0CC4 | C02B | 4689 | 89F8 | F646 | 868D |
| 0000460560 | FDD8 | 5016 | 681E | 4680 | 868D | FEF2 | 5016 | B29A |
| 0000460600 | C459 | 83B1 | 0CC4 | 868D | FEF2 | 5016 | 039A | 90B1 |
| 0000460620 | 83B0 | 04C4 | 068E | 7B9A | 8326 | 2F3E | 00B1 | 0375 |
| 0000460640 | 0AE9 | 8300 | DCBE | FEFE | 0374 | 0FE9 | 8E00 | 9C06 |
| 0000460660 | 267B | 3E83 | B15B | 7500 | E903 | 003C | 868D | FEE4 |
| 0000460700 | 5016 | 468D | 16F2 | 8D50 | D886 | 16FE | 1E50 | 8C68 |
| 0000460720 | 6846 | 00A8 | 36FF | 463E | 36FF | 463C | 36FF | 4642 |
| 0000460740 | 36FF | 4640 | 2A9A | 00B2 | 8300 | 1AC4 | 86C7 | FEDE |
| 0000460760 | 0000 | 06E9 | E900 | 0003 | 00E9 | 5E00 | 835F | 02ED |
| 0000461000 | E58B | 5D1F | CB4D | 581E | 4590 | 8B55 | 1EEC | D88E |
| 0000461020 | EC81 | 0228 | 5657 | 46C7 | 94FA | 8C46 | FC5E | 46C7 |
| 0000461040 | 00F0 | 2B00 | 89C0 | E246 | 4689 | 8EE0 | 9A06 | 267B |
| 0000461060 | 3E83 | B279 | 7500 | E903 | 001E | 36FF | 4642 | 36FF |
| 0000461100 | 4640 | 868D | FED8 | 5016 | 909A | 00B2 | 8300 | 08C4 |
| 0000461120 | 003D | 7400 | E903 | 000F | 068E | 7B9C | 8326 | A63E |
| 0000461140 | 00B2 | 0375 | 3CE9 | 1E00 | 9868 | 8D46 | E446 | 5016 |
| 0000461160 | 868D | FED8 | 5016 | 468D | 16F2 | 6850 | 00B0 | 681E |
| 0000461200 | 46A8 | 36FF | 463E | 36FF | 463C | 36FF | 4642 | 36FF |
| 0000461220 | 4640 | DB9A | 00B2 | 8300 | 1EC4 | 4689 | 89F2 | F456 |
| 0000461240 | 08E9 | 2B00 | 89C0 | F446 | 4689 | 8DF2 | 0A46 | 4689 |
| 0000461260 | 8CF6 | F856 | 76FF | FFF8 | F676 | 76FF | FF08 | 0676 |
| 0000461300 | 868D | FDD8 | 5016 | 829A | 995A | 83B4 | 0CC4 | C02B |
| 0000461320 | 4689 | 89F8 | F646 | 868D | FDD8 | 5016 | 681E | 469C |
| 0000461340 | 868D | FEE0 | 5016 | B29A | 1159 | 83B3 | 0CC4 | 868D |
| 0000461360 | FEE0 | 5016 | 039A | AFB1 | 83B4 | 04C4 | 7F9A | 3FAA |
| 0000461400 | 8EB3 | 9A06 | 267B | 3E83 | B3E2 | 7500 | E903 | 000A |
| 0000461420 | BE83 | FEDC | 74FE | E903 | 000F | 068E | 7B9C | 8326 |
| 0000461440 | 0F3E | 00B4 | 0375 | 3BE9 | 8D00 | E446 | 5016 | 468D |
| 0000461460 | 16F2 | 8D50 | D886 | 16FE | 1E50 | A868 | 6846 | 00B9 |
| 0000461500 | 36FF | 463E | 36FF | 463C | 36FF | 4642 | 36FF | 4640 |
| 0000461520 | 959A | 00B3 | 8300 | 1AC4 | 86C7 | FEDE | 0000 | 06E9 |
| 0000461540 | E900 | 0003 | 00E9 | 5E00 | 835F | 02ED | E58B | 5D1F |
| 0000461560 | CB4D | 581E | 4590 | 8B55 | 1EEC | D88E | EC81 | 0024 |
| 0000461600 | 5657 | 46C7 | AEFA | 8C46 | FC5E | 46C7 | 01F4 | 2B01 |
| 0000461620 | 89C0 | E646 | 4689 | 8EE4 | 9A06 | 267B | 3E83 | B5CC |
| 0000461640 | 7500 | E903 | 001D | 36FF | 4642 | 36FF | 4640 | 468D |
| 0000461660 | 16DC | 9A50 | B3F9 | 0000 | C483 | 3D08 | 0000 | 0374 |
| 0000461700 | 0FE9 | 8E00 | 9C06 | 267B | 3E83 | B5E4 | 7500 | E903 |
| 0000461720 | 003B | 681E | 46B2 | 468D | 16E8 | 8D50 | DC46 | 5016 |
| 0000461740 | 468D | 16F6 | 6850 | 00C5 | 681E | 46B6 | 36FF | 463E |
| 0000461760 | 36FF | 463C | 36FF | 4642 | 36FF | 4640 | 439A | 00B4 |
| 0000462000 | 8300 | 1EC4 | 4689 | 89F6 | F856 | 08E9 | 2B00 | 89C0 |
| 0000462020 | F846 | 4689 | 8EF6 | 9A06 | 267B | 3E83 | B4B8 | 7500 |

THU MAR 14 17:52:34 1991 TSLINT.DLL PAGE 167, LINE 9795

| | | | | | | | | |
|---|---|---|---|---|---|---|---|---|
| 0000462040 | E903 | 0009 | 7E83 | FEE0 | 0374 | 0FE9 | 8E00 | 9C06 |
| 0000462060 | 267B | 3E83 | B4D1 | 7500 | E903 | 0050 | 46C7 | 01E2 |
| 0000462100 | FF00 | E676 | 76FF | 8DE4 | E246 | 5016 | 76FF | FFF4 |
| 0000462120 | FC76 | 76FF | 8DFA | E84E | 5116 | 4E8D | 16F6 | 8D51 |
| 0000462140 | DC4E | 5116 | 681E | 46B6 | C668 | FF00 | 3E36 | FF46 |
| 0000462160 | 3C36 | FF46 | 4236 | FF46 | 4036 | 9A46 | A6A5 | 0000 |
| 0000462200 | C483 | 8B28 | E246 | 09E9 | E900 | 0006 | 01B8 | E900 |
| 0000462220 | 0000 | 5F5E | ED83 | 8B02 | 1FE5 | 4D5D | 00CB | 581E |
| 0000462240 | 4590 | 8B55 | 1EEC | D88E | EC81 | 0034 | 5657 | 46C7 |
| 0000462260 | D3FA | 8C46 | FC5E | 46C7 | 01F0 | 2B01 | 89C0 | E246 |
| 0000462300 | 4689 | 8EE0 | A406 | 267B | 3E83 | B54E | 7500 | E903 |
| 0000462320 | 001D | 36FF | 46FE | 36FF | 46FC | 468D | 16D2 | 9A50 |
| 0000462340 | B564 | 0000 | C483 | 3D08 | 0000 | 0374 | 0FE9 | 8E00 |
| 0000462360 | A606 | 267B | 3E83 | B789 | 7500 | E903 | 003A | 681E |
| 0000462400 | 46DA | 468D | 16E4 | 8D50 | D246 | 5016 | 468D | 16F2 |
| 0000462420 | 6A50 | 1E4B | 0068 | FF47 | FA36 | FF46 | F836 | FF46 |
| 0000462440 | FE36 | FF46 | FC36 | 9A46 | B5AD | 0000 | C483 | 891E |
| 0000462460 | F246 | 5689 | E9F4 | 0008 | C02B | 4689 | 89F4 | F246 |
| 0000462500 | 068E | 7BA4 | 8326 | 713E | 00B7 | 0375 | 4AE9 | 8300 |
| 0000462520 | D67E | 75FE | E903 | 0041 | 76FF | FF08 | 0676 | 681E |
| 0000462540 | 46E1 | 468D | 16E4 | 8D50 | F246 | 5016 | 468D | 16D2 |
| 0000462560 | 1E50 | 0068 | 6A47 | FF52 | FA36 | FF46 | F836 | FF46 |
| 0000462600 | FE36 | FF46 | FC36 | 1E46 | F168 | 6846 | A728 | 2B68 |
| 0000462620 | 9AA7 | A72E | 0000 | C483 | FF2A | 0876 | 76FF | 8D06 |
| 0000462640 | DC46 | 5016 | FF9A | 00FF | 8900 | DA46 | 013D | 1B00 |
| 0000462660 | 40C0 | 003D | 7500 | E903 | 007D | 068E | 7BA4 | 8326 |
| 0000462700 | 0F3E | 00B8 | 0375 | 09E9 | 8300 | D67E | 74FE | E903 |
| 0000462720 | 000F | 068E | 7BA6 | 8326 | 273E | 00B8 | 0375 | 50E9 |
| 0000462740 | 8B00 | DA46 | 4689 | FFD8 | E276 | 76FF | 8DE0 | D846 |
| 0000462760 | 5016 | 76FF | FFF0 | FC76 | 76FF | 8DFA | E44E | 5116 |
| 0000463000 | 4E8D | 16F2 | 8D51 | D24E | 5116 | 681E | 4700 | 556A |
| 0000463020 | 36FF | 46FA | 36FF | 46F8 | 36FF | 46FE | 36FF | 46FC |
| 0000463040 | 6F9A | 00B8 | 8300 | 28C4 | 468B | E9D8 | 02FC | 06E9 |
| 0000463060 | 8B00 | DA46 | F3E9 | FF02 | DE76 | 76FF | 8DDC | F646 |
| 0000463100 | 5016 | FF9A | 00FF | 8900 | DA46 | 013D | 1B00 | 40C0 |
| 0000463120 | 003D | 7500 | E903 | 007D | 068E | 7BA4 | 8326 | E93E |
| 0000463140 | 00B8 | 0375 | 09E9 | 8300 | D67E | 74FE | E903 | 000F |
| 0000463160 | 068E | 7BA6 | 8326 | 013E | 00B9 | 0375 | 50E9 | 8B00 |
| 0000463200 | DA46 | 4689 | FFD8 | E276 | 76FF | 8DE0 | D846 | 5016 |
| 0000463220 | 76FF | FFF0 | FC76 | 76FF | 8DFA | E44E | 5116 | 4E8D |
| 0000463240 | 16F2 | 8D51 | D24E | 5116 | 681E | 4700 | 5B6A | 36FF |
| 0000463260 | 46FA | 36FF | 46F8 | 36FF | 46FE | 36FF | 46FC | 499A |
| 0000463300 | 00B9 | 8300 | 28C4 | 468B | E9D8 | 025E | 06E9 | 8B00 |
| 0000463320 | DA46 | 55E9 | 6A02 | 6A00 | 6A07 | FF01 | F876 | 76FF |
| 0000463340 | 9AF6 | B98D | 0000 | 5052 | FF9A | 00FF | 5000 | 006A |
| 0000463360 | 006A | FF9A | 00FF | 8900 | DA46 | 013D | 1B00 | 40C0 |
| 0000463400 | 003D | 7500 | E903 | 0000 | 76FF | FFDE | DC76 | 76FF |
| 0000463420 | FFF8 | F676 | 006A | 76FF | FF0C | 0A76 | FF9A | 00FF |
| 0000463440 | 8900 | DA46 | 013D | 1B00 | 40C0 | 003D | 7500 | E903 |
| 0000463460 | 007D | 068E | 7BA4 | 8326 | C03E | 00B9 | 0375 | 09E9 |
| 0000463500 | 8300 | D67E | 74FE | E903 | 000F | 068E | 7BA6 | 8326 |
| 0000463520 | D83E | 00B9 | 0375 | 50E9 | 8B00 | DA46 | 4689 | FFD8 |
| 0000463540 | E276 | 76FF | 8DE0 | D846 | 5016 | 76FF | FFF0 | FC76 |
| 0000463560 | 76FF | 8DFA | E44E | 5116 | 4E8D | 16F2 | 8D51 | D24E |
| 0000463600 | 5116 | 681E | 4700 | 6A6A | 36FF | 46FA | 36FF | 46F8 |
| 0000463620 | 36FF | 46FE | 36FF | 46FC | 209A | 00BA | 8300 | 28C4 |
| 0000463640 | 468B | E9D8 | 0184 | 06E9 | 8B00 | DA46 | 7BE9 | FF01 |
| 0000463660 | DE76 | 76FF | FFDC | F876 | 76FF | 9AF6 | BAE5 | B9B1 |
| 0000463700 | C483 | 8908 | D046 | 003D | 7500 | E903 | 00B8 | 76FF |

THU MAR 14 17:52:34 1991 TSLINT.DLL PAGE 168, LINE 9854

| | | | | | | | | |
|---|---|---|---|---|---|---|---|---|
| 0000463720 | FFF8 | F676 | FF9A | 00FF | 8900 | DA46 | A89A | 00B9 |
| 0000463740 | 5200 | FF50 | 0C76 | 76FF | 9A0A | FFFF | 0000 | 4689 |
| 0000463760 | FFDA | DE76 | 76FF | 9ADC | FFFF | 0000 | 5052 | E59A |
| 0000464000 | A7BA | 83B4 | 08C4 | 4689 | 8EDA | A406 | 267B | 3E83 |
| 0000464020 | B67A | 7500 | E903 | 0009 | 7E83 | FED6 | 0374 | 0FE9 |
| 0000464040 | 8E00 | A606 | 267B | 3E83 | B57A | 7500 | E903 | 0050 |
| 0000464060 | 468B | 89D0 | D846 | 76FF | FFE2 | E076 | 468D | 16D8 |
| 0000464100 | FF50 | F076 | 76FF | FFFC | FA76 | 4E8D | 16E4 | 8D51 |
| 0000464120 | F24E | 5116 | 4E8D | 16D2 | 1E51 | 0068 | 6A47 | FF71 |
| 0000464140 | FA36 | FF46 | F836 | FF46 | FE36 | FF46 | FC36 | 9A46 |
| 0000464160 | B62C | 0000 | C483 | 8B28 | D846 | ADE9 | E900 | 0006 |
| 0000464200 | 468B | E9D0 | 00A4 | FF9A | 00FF | 8900 | CC46 | 5689 |
| 0000464220 | C4CE | 0A5E | C426 | 261F | 878B | 0100 | 8B26 | 0297 |
| 0000464240 | C401 | CC5E | 8926 | 2C87 | 2601 | 9789 | 012E | 068E |
| 0000464260 | 7BA4 | 8326 | F73E | 00B6 | 0375 | 09E9 | 8300 | D67E |
| 0000464300 | 74FE | E903 | 000F | 068E | 7BA6 | 8326 | A63E | 00B6 |
| 0000464320 | 0375 | 4FE9 | C700 | D846 | 0000 | 76FF | FFE2 | E076 |
| 0000464340 | 468D | 16D8 | FF50 | F076 | 76FF | FFFC | FA76 | 4E8D |
| 0000464360 | 16E4 | 8D51 | F24E | 5116 | 4E8D | 16D2 | 1E51 | 0068 |
| 0000464400 | 6A47 | FF77 | FA36 | FF46 | F836 | FF46 | FE36 | FF46 |
| 0000464420 | FC36 | 9A46 | B7D1 | 0000 | C483 | 8B28 | D846 | 09E9 |
| 0000464440 | E900 | 0006 | 00B8 | E900 | 0000 | 5F5E | ED83 | 8B02 |
| 0000464460 | 1FE5 | 4D5D | 1ECB | 9058 | 5545 | EC8B | 8E1E | 81D8 |
| 0000464500 | 28EC | 570D | C756 | FA46 | 470D | 5E8C | C7FC | F246 |
| 0000464520 | 0101 | C02B | 4689 | 89E4 | E246 | 068E | 7BA4 | 8326 |
| 0000464540 | CB3E | 00BB | 0375 | 1DE9 | FF00 | FE36 | FF46 | FC36 |
| 0000464560 | 8D46 | D846 | 5016 | 909A | 00B6 | 8300 | 08C4 | 003D |
| 0000464600 | 7400 | E903 | 000F | 068E | 7BA6 | 8326 | E33E | 00BB |
| 0000464620 | 0375 | 3BE9 | 1E00 | 1468 | 8D47 | E646 | 5016 | 468D |
| 0000464640 | 16D8 | 8D50 | F646 | 5016 | 9568 | 1E00 | 1C68 | FF47 |
| 0000464660 | FA36 | FF46 | F836 | FF46 | FE36 | FF46 | FC36 | 9A46 |
| 0000464700 | B6D8 | 0000 | C483 | 891E | F646 | 5689 | E9F8 | 0008 |
| 0000464720 | C02B | 4689 | 89F8 | F646 | 76FF | FF08 | 0676 | 76FF |
| 0000464740 | FF0C | 0A76 | 468D | 16F4 | 9A50 | FFFF | 0000 | 4689 |
| 0000464760 | 83E0 | E07E | 7411 | E903 | 000B | 76FF | 9AF4 | BC59 |
| 0000465000 | 0000 | A8E9 | 8300 | E07E | 1B01 | 40C0 | 003D | 7500 |
| 0000465020 | E903 | 0081 | 068E | 7BA4 | 8326 | 643E | 00BC | 0375 |
| 0000465040 | 09E9 | 8300 | DC7E | 74FE | E903 | 000F | 068E | 7BA6 |
| 0000465060 | 8326 | 7C3E | 00BC | 0375 | 51E9 | 8B00 | E046 | 4689 |
| 0000465100 | FFDE | E476 | 76FF | 8DE2 | DE46 | 5016 | 76FF | FFF2 |
| 0000465120 | FC76 | 76FF | 8DFA | E64E | 5116 | 4E8D | 16F6 | 8D51 |
| 0000465140 | D84E | 5116 | 681E | 471C | A568 | FF00 | FA36 | FF46 |
| 0000465160 | F836 | FF46 | FE36 | FF46 | FC36 | 9A46 | BCC4 | 0000 |
| 0000465200 | C483 | 8B28 | DE46 | A1E9 | E900 | 0006 | 468B | E9E0 |
| 0000465220 | 0098 | 18E9 | FF00 | F476 | FF9A | 00FF | FF00 | F476 |
| 0000465240 | FF9A | 00FF | FF00 | F476 | 9C9A | 00AC | 8E00 | A406 |
| 0000465260 | 267B | 3E83 | BA65 | 7500 | E903 | 0009 | 7E83 | FEDC |
| 0000465300 | 0374 | 0FE9 | 8E00 | A606 | 267B | 3E83 | BA7D | 7500 |
| 0000465320 | E903 | 0050 | 46C7 | 00DE | FF00 | E476 | 76FF | 8DE2 |
| 0000465340 | DE46 | 5016 | 76FF | FFF2 | FC76 | 76FF | 8DFA | E64E |
| 0000465360 | 5116 | 4E8D | 16F6 | 8D51 | D84E | 5116 | 681E | 471C |
| 0000465400 | AD68 | FF00 | FA36 | FF46 | F836 | FF46 | FE36 | FF46 |
| 0000465420 | FC36 | 9A46 | BAC4 | 0000 | C483 | 8B28 | DE46 | 09E9 |
| 0000465440 | E900 | 0006 | 00B8 | E900 | 0000 | 5F5E | ED83 | 8B02 |
| 0000465460 | 1FE5 | 4D5D | 1ECB | 9058 | 5545 | EC8B | 8E1E | 81D8 |
| 0000465500 | 00EC | 5700 | C456 | 065E | C426 | 069F | 2601 | 878B |
| 0000465520 | 0120 | 00E9 | 5E00 | 835F | 02ED | E58B | 5D1F | CB4D |
| 0000465540 | 581E | 4590 | 8B55 | 1EEC | D88E | EC81 | 0000 | 5657 |
| 0000465560 | 466B | 220A | 5EC4 | 2606 | 9FC4 | 0106 | 0326 | 2287 |

THU MAR 14 17:52:34 1991 TSLINT.DLL PAGE 169, LINE 9913

| | | | | | | | | |
|---|---|---|---|---|---|---|---|---|
| 0000465600 | 2601 | 978B | 0124 | 00E9 | 5E00 | 835F | 02ED | E58B |
| 0000465620 | 5D1F | CB4D | 581E | 4590 | 8B55 | 1EEC | D88E | EC81 |
| 0000465640 | 002E | 5657 | 46C7 | 2BFA | 8C47 | FC5E | 46C7 | 01F4 |
| 0000465660 | 2B01 | 89C0 | E246 | 4689 | 8EE0 | A406 | 267B | 3E83 |
| 0000465700 | BDEE | 7500 | E903 | 001D | 36FF | 46FE | 36FF | 46FC |
| 0000465720 | 468D | 16D6 | 9A50 | BB27 | 0000 | C483 | 3D08 | 0000 |
| 0000465740 | 0374 | 0FE9 | 8E00 | A606 | 267B | 3E83 | BEB6 | 7500 |
| 0000465760 | E903 | 003B | 681E | 4732 | 468D | 16E8 | 8D50 | D646 |
| 0000466000 | 5016 | 468D | 16F6 | 6850 | 0100 | 681E | 4752 | 36FF |
| 0000466020 | 46FA | 36FF | 46F8 | 36FF | 46FE | 36FF | 46FC | 709A |
| 0000466040 | 00BB | 8300 | 1EC4 | 4689 | 89F6 | F856 | 08E9 | 2B00 |
| 0000466060 | 89C0 | F846 | 4689 | 8EF6 | A406 | 267B | 3E83 | BE9E |
| 0000466100 | 7500 | E903 | 004B | 7E83 | FEDA | 0375 | 42E9 | FF00 |
| 0000466120 | 0876 | 76FF | 1E06 | 3968 | 8D47 | E846 | 5016 | 468D |
| 0000466140 | 16F6 | 8D50 | D646 | 5016 | 681E | 4752 | 0468 | FF01 |
| 0000466160 | FA36 | FF46 | F836 | FF46 | FE36 | FF46 | FC36 | 1E46 |
| 0000466200 | 4B68 | 6847 | B73C | 3F68 | 9AB7 | B742 | 0000 | C483 |
| 0000466220 | 6A2A | 6A00 | 6A0B | FF01 | 0876 | 76FF | 9A06 | B892 |
| 0000466240 | 0000 | 5052 | 999A | 00B8 | 5000 | 006A | 006A | A39A |
| 0000466260 | 00B8 | 8900 | DE46 | 013D | 1B00 | 40C0 | 003D | 7500 |
| 0000466300 | E903 | 0000 | 006A | 006A | 76FF | FF08 | 0676 | E59A |
| 0000466320 | 6EBA | 83B9 | 08C4 | 4689 | 3DDE | 0001 | C01B | 3D40 |
| 0000466340 | 0000 | 0375 | 7EE9 | 8E00 | A406 | 267B | 3E83 | BF43 |
| 0000466360 | 7500 | E903 | 0009 | 7E83 | FEDA | 0374 | 0FE9 | 8E00 |
| 0000466400 | A606 | 267B | 3E83 | BF5B | 7500 | E903 | 0051 | 468B |
| 0000466420 | 89DE | DC46 | 76FF | FFE2 | E076 | 468D | 16DC | FF50 |
| 0000466440 | F476 | 76FF | FFFC | FA76 | 4E8D | 16E8 | 8D51 | F64E |
| 0000466460 | 5116 | 4E8D | 16D6 | 1E51 | 5268 | 6847 | 010E | 36FF |
| 0000466500 | 46FA | 36FF | 46F8 | 36FF | 46FE | 36FF | 46FC | A49A |
| 0000466520 | 00BF | 8300 | 28C4 | 468B | E9DC | 0150 | 06E9 | 8B00 |
| 0000466540 | DE46 | 47E9 | 6A01 | 6A00 | FF00 | 0876 | 76FF | 6A06 |
| 0000466560 | 8D00 | E446 | 5016 | CD9A | 00B8 | 8900 | DE46 | 013D |
| 0000466600 | 1B00 | 40C0 | 003D | 7500 | E903 | 007E | 068E | 7BA4 |
| 0000466620 | 8326 | E63E | 00BF | 0375 | 09E9 | 8300 | DA7E | 74FE |
| 0000466640 | E903 | 000F | 068E | 7BA6 | 8326 | FE3E | 00BF | 0375 |
| 0000466660 | 51E9 | 8B00 | DE46 | 4689 | FFDC | E276 | 76FF | 8DE0 |
| 0000466700 | DC46 | 5016 | 76FF | FFF4 | FC76 | 76FF | 8DFA | E84E |
| 0000466720 | 5116 | 4E8D | 16F6 | 8D51 | D64E | 5116 | 681E | 4752 |
| 0000466740 | 1668 | FF01 | FA36 | FF46 | F836 | FF46 | FE36 | FF46 |
| 0000466760 | FC36 | 9A46 | C046 | 0000 | C483 | 8B28 | DC46 | ABE9 |
| 0000467000 | E900 | 0006 | 468B | E9DE | 00A2 | 379A | 00BA | 8900 |
| 0000467020 | D246 | 5689 | C4D4 | E45E | 8B26 | 0087 | 2601 | 978B |
| 0000467040 | 0102 | 5EC4 | 26D2 | 8789 | 012C | 8926 | 2E97 | 8E01 |
| 0000467060 | A406 | 267B | 3E83 | BB11 | 7500 | E903 | 0009 | 7E83 |
| 0000467100 | FEDA | 0374 | 0FE9 | 8E00 | A606 | 267B | 3E83 | BB3D |
| 0000467120 | 7500 | E903 | 0050 | 46C7 | 00DC | FF00 | E276 | 76FF |
| 0000467140 | 8DE0 | DC46 | 5016 | 76FF | FFF4 | FC76 | 76FF | 8DFA |
| 0000467160 | E84E | 5116 | 4E8D | 16F6 | 8D51 | D64E | 5116 | 681E |
| 0000467200 | 4752 | 1A68 | FF01 | FA36 | FF46 | F836 | FF46 | FE36 |
| 0000467220 | FF46 | FC36 | 9A46 | BC2C | 0000 | C483 | 8B28 | DC46 |
| 0000467240 | 09E9 | E900 | 0006 | 00B8 | E900 | 0000 | 5F5E | ED83 |
| 0000467260 | 8B02 | 1FE5 | 4D5D | 00CB | 581E | 4590 | 8B55 | 1EEC |
| 0000467300 | D88E | EC81 | 00B2 | 5657 | 46C7 | 72E4 | 8C47 | E65E |
| 0000467320 | 46C7 | 07AE | 2B01 | 89C0 | 8A46 | 4689 | 8E88 | A806 |
| 0000467340 | 267B | 3E83 | BD70 | 7500 | E903 | 001E | 36FF | 4A04 |
| 0000467360 | 36FF | 4A02 | 868D | FF68 | 5016 | 869A | 00BD | 8300 |
| 0000467400 | 08C4 | 003D | 7400 | E903 | 000F | 068E | 7BAA | 8326 |
| 0000467420 | 9C3E | 00BD | 0375 | 3BE9 | 1E00 | 7968 | 8D47 | 9046 |
| 0000467440 | 5016 | 868D | FF68 | 5016 | 468D | 16D8 | 6A50 | 1E50 |

THU MAR 14 17:52:34 1991 TSLINT.DLL PAGE 170, LINE 9972

| | | | | | | | | |
|---|---|---|---|---|---|---|---|---|
| 0000467460 | 0668 | FF4A | 0036 | FF4A | FE36 | FF49 | 0436 | FF4A |
| 0000467500 | 0236 | 9A4A | BDCF | 0000 | C483 | 891E | D846 | 5689 |
| 0000467520 | E9DA | 0008 | C02B | 4689 | 89DA | D846 | C02B | 4689 |
| 0000467540 | 89FC | FA46 | 46C7 | 00CC | 8E00 | A806 | 267B | 3E83 |
| 0000467560 | C180 | 7500 | E903 | 0051 | BE83 | FF6C | 75FE | E903 |
| 0000467600 | 0047 | 5EC4 | 2606 | 77FF | 260A | 77FF | 1E08 | 8068 |
| 0000467620 | 8D47 | 9046 | 5016 | 468D | 16D8 | 8D50 | 6886 | 16FF |
| 0000467640 | 1E50 | 0668 | 6A4A | FF69 | 0036 | FF4A | FE36 | FF49 |
| 0000467660 | 0436 | FF4A | 0236 | 1E4A | 9068 | 6847 | C1C1 | C468 |
| 0000467700 | 9AC1 | C1C7 | 0000 | C483 | 8E2A | A806 | 267B | 3E83 |
| 0000467720 | C094 | 7500 | E903 | 0046 | BE83 | FF6C | 75FE | E903 |
| 0000467740 | 003C | 681E | 4798 | 468D | 1690 | 8D50 | D846 | 5016 |
| 0000467760 | 868D | FF68 | 5016 | 681E | 4A06 | 6F6A | 36FF | 4A00 |
| 0000470000 | 36FF | 49FE | 36FF | 4A04 | 36FF | 4A02 | 681E | 47AA |
| 0000470020 | 3468 | 68BE | BE37 | 3A9A | 00BE | 8300 | 26C4 | 068E |
| 0000470040 | 7BAC | A126 | 3846 | 4689 | 8EC8 | AE06 | 267B | 48A1 |
| 0000470060 | 2638 | 168B | 384A | 8689 | FF5C | 9689 | FF5E | ED9A |
| 0000470100 | 00A1 | 8900 | CA46 | FF9A | 00FF | 8900 | 6086 | 9AFF |
| 0000470120 | ACB0 | 0000 | 4689 | 9AD4 | C211 | 0000 | 8689 | FF62 |
| 0000470140 | 969A | 00AC | 5000 | 468D | 16E2 | 9A50 | FFFF | 0000 |
| 0000470160 | 4689 | 8ED6 | B006 | 267B | 3E83 | C23E | 7500 | E903 |
| 0000470200 | 005E | 7E83 | FFD6 | 0374 | 55E9 | 2600 | 3E83 | 9E07 |
| 0000470220 | 7500 | E903 | 004A | 681E | 47B2 | 068E | 7BB2 | FF26 |
| 0000470240 | 0236 | 2600 | 36FF | C2CF | 468D | 1690 | 8D50 | D846 |
| 0000470260 | 5016 | 868D | FF68 | 5016 | 681E | 4A06 | 7A6A | 36FF |
| 0000470300 | 4A00 | 36FF | 49FE | 36FF | 4A04 | 36FF | 4A02 | 681E |
| 0000470320 | 47BB | FC68 | 68C2 | C2FF | 029A | 00C3 | 8300 | 2AC4 |
| 0000470340 | B6FF | FF62 | 009A | 0097 | 8900 | D646 | 068E | 7BB0 |
| 0000470360 | 8326 | B73E | 00C2 | 0375 | 5EE9 | 8300 | D67E | 74FF |
| 0000470400 | E903 | 0055 | 8326 | 2A3E | 00C2 | 0375 | 4AE9 | 1E00 |
| 0000470420 | C468 | 8E47 | B206 | 267B | 36FF | 0002 | FF26 | C636 |
| 0000470440 | 8D9D | 9046 | 5016 | 468D | 16D8 | 8D50 | 6886 | 16FF |
| 0000470460 | 1E50 | 0668 | 6A4A | FF7C | 0036 | FF4A | FE36 | FF49 |
| 0000470500 | 0436 | FF4A | 0236 | 1E4A | CD68 | 6847 | C366 | 6968 |
| 0000470520 | 9AC3 | 9DF9 | 0000 | C483 | 8E2A | A806 | 267B | 3E83 |
| 0000470540 | C37A | 7500 | E903 | 005B | BE83 | FF6C | 75FE | E903 |
| 0000470560 | 0051 | 76FF | FFE2 | D476 | 76FF | FFCA | C876 | B6FF |
| 0000470600 | FF5E | B6FF | FF5C | 681E | 47D6 | 468D | 1690 | 8D50 |
| 0000470620 | D846 | 5016 | 868D | FF68 | 5016 | 681E | 4A06 | 8068 |
| 0000470640 | FF00 | 0036 | FF4A | FE36 | FF49 | 0436 | FF4A | 0236 |
| 0000470660 | 1E4A | 1A68 | 6848 | C3BC | BF68 | 9AC3 | C3C2 | 0000 |
| 0000470700 | C483 | 8E32 | A806 | 267B | 3E83 | C120 | 7500 | E903 |
| 0000470720 | 0047 | BE83 | FF6C | 75FE | E903 | 003D | 681E | 4822 |
| 0000470740 | 468D | 1690 | 8D50 | D846 | 5016 | 868D | FF68 | 5016 |
| 0000470760 | 681E | 4A06 | 8268 | FF00 | 0036 | FF4A | FE36 | FF49 |
| 0000471000 | 0436 | FF4A | 0236 | 1E4A | 3268 | 6848 | C16C | 6F68 |
| 0000471020 | 9AC1 | C172 | 0000 | C483 | 8E26 | B406 | 267B | 3E83 |
| 0000471040 | 0A9E | 7401 | E903 | 0007 | 006A | 919A | 00AC | 8D00 |
| 0000471060 | 8C46 | 5016 | 5EC4 | 2606 | 77FF | 260A | 77FF | 9A08 |
| 0000471100 | B64E | C40E | C483 | 8908 | DC46 | 013D | 1B00 | 40C0 |
| 0000471120 | 003D | 7500 | E903 | 000B | 76FF | 9ADC | AFE0 | C41C |
| 0000471140 | C483 | FF02 | 8E76 | 76FF | 9A8C | BCE5 | C4DC | C483 |
| 0000471160 | 8904 | B246 | 068E | 7BA8 | 8326 | 843E | 00C4 | 0375 |
| 0000471200 | 4AE9 | 8300 | 6CBE | FEFF | 0375 | 40E9 | FF00 | B276 |
| 0000471220 | 681E | 483A | 468D | 1690 | 8D50 | D846 | 5016 | 868D |
| 0000471240 | FF68 | 5016 | 681E | 4A06 | 8F68 | FF00 | 0036 | FF4A |
| 0000471260 | FE36 | FF49 | 0436 | FF4A | 0236 | 1E4A | 5E68 | 6848 |
| 0000471300 | C4C6 | C968 | 9AC4 | C4CC | 0000 | C483 | 8E28 | A806 |
| 0000471320 | 267B | 3E83 | C4FF | 7500 | E903 | 0047 | BE83 | FF6C |

THU MAR 14 17:52:34 1991 TSLINT.DLL PAGE 171, LINE 10031

| | | | | | | | | |
|---|---|---|---|---|---|---|---|---|
| 0000471340 | 75FE | E903 | 003D | 681E | 4866 | 468D | 1690 | 8D50 |
| 0000471360 | D846 | 5016 | 868D | FF68 | 5016 | 68:E | 4A06 | 9168 |
| 0000471400 | FF00 | 0036 | FF4A | FE36 | FF49 | 0436 | FF4A | 0236 |
| 0000471420 | 1E4A | 9568 | 6848 | C541 | 4468 | 9AC5 | C547 | 0000 |
| 0000471440 | C483 | FF26 | 8E76 | 76FF | 9A8C | D00B | C551 | C483 |
| 0000471460 | 8904 | 8446 | 5689 | 2B86 | 89C0 | FC46 | 4689 | 83FA |
| 0000471500 | B27E | 7F00 | E903 | 00FF | 068E | 7BA8 | 8326 | 103E |
| 0000471520 | 00C3 | 0375 | 47E9 | 8300 | 6CBE | FEFF | 0375 | 3DE9 |
| 0000471540 | 1E00 | 9D68 | 8D48 | 9046 | 5016 | 468D | 16D8 | 8D50 |
| 0000471560 | 6886 | 16FF | 1E50 | 0668 | 684A | 0096 | 36FF | 4A00 |
| 0000471600 | 36FF | 49FE | 36FF | 4A04 | 36FF | 4A02 | 681E | 48BC |
| 0000471620 | 8368 | 68C2 | C286 | 6C9A | 00C3 | 8300 | 26C4 | 529A |
| 0000471640 | 81E3 | 50BE | 068E | 7BB6 | A026 | 2670 | 8B50 | B246 |
| 0000471660 | E0C1 | 5002 | 879A | CAAC | 83C6 | 06C4 | 4689 | 89FA |
| 0000471700 | FC56 | D00B | 0374 | 0CE9 | 1E00 | C468 | 9A48 | B3B6 |
| 0000471720 | C5A1 | C483 | 8E04 | A806 | 267B | 3E83 | C5FE | 7500 |
| 0000471740 | E903 | 0063 | BE83 | FF6C | 75FE | E903 | 0059 | E49A |
| 0000471760 | AEF7 | 52C5 | FF50 | FC76 | 76FF | 9AFA | F91E | C672 |
| 0000472000 | C483 | 5004 | 76FF | FFFC | FA76 | 681E | 48D3 | 468D |
| 0000472020 | 1690 | 8D50 | D846 | 5016 | 868D | FF68 | 5016 | 681E |
| 0000472040 | 4A06 | 9768 | FF00 | 0036 | FF4A | FE36 | FF49 | 0436 |
| 0000472060 | FF4A | 0236 | 1E4A | E168 | 6848 | C640 | 4368 | 9AC6 |
| 0000472100 | C646 | 0000 | C483 | 8E30 | A806 | 267B | 3E83 | C6EC |
| 0000472120 | 7500 | E903 | 0047 | BE83 | FF6C | 75FE | E903 | 003D |
| 0000472140 | 681E | 48EA | 468D | 1690 | 8D50 | D846 | 5016 | 868D |
| 0000472160 | FF68 | 5016 | 681E | 4A06 | 9A68 | FF00 | 0036 | FF4A |
| 0000472200 | FE36 | FF49 | 0436 | FF4A | 0236 | 1E4A | 0968 | 6849 |
| 0000472220 | C731 | 3468 | 9AC7 | C737 | 0000 | C483 | 8B26 | FA46 |
| 0000472240 | 568B | 89FC | DE46 | 5689 | C4E0 | 065E | FF26 | 0A77 |
| 0000472260 | FF26 | 0877 | 76FF | FFC8 | 5EB6 | FFFF | 5CB6 | 9AFF |
| 0000472300 | D4F6 | C3F2 | C483 | 8B0A | 0A46 | 568B | 890C | 5486 |
| 0000472320 | 89FF | 5696 | E9FF | 0014 | 9EC4 | FF54 | 8B26 | 0447 |
| 0000472340 | 8B26 | 0657 | 8689 | FF54 | 9689 | FF56 | 7E83 | 00B2 |
| 0000472360 | 037F | 36E9 | 8B02 | 5686 | 0BFF | 5486 | 75FF | E903 |
| 0000472400 | 0229 | 9EC4 | FF54 | 8B26 | 2607 | 578B | 8902 | 5886 |
| 0000472420 | 89FF | 5A96 | 6AFF | 9A3D | B2A6 | AA72 | C483 | 8902 |
| 0000472440 | 5086 | 89FF | 5296 | C4FF | 589E | 26FF | 7F83 | 2812 |
| 0000472460 | 0374 | 7CE9 | 8E00 | A806 | 267B | 3E83 | C42B | 7500 |
| 0000472500 | E903 | 004A | BE83 | FF6C | 75FE | E903 | 0040 | 76FF |
| 0000472520 | 1EB2 | 1168 | 8D49 | 9046 | 5016 | 468D | 16D8 | 8D50 |
| 0000472540 | 6886 | 16FF | 1E50 | 0668 | 684A | 00A7 | 36FF | 4A00 |
| 0000472560 | 36FF | 49FE | 36FF | 4A04 | 36FF | 4A02 | 681E | 492D |
| 0000472600 | 7068 | 68C4 | C473 | 769A | 00C4 | 8300 | 28C4 | 9EC4 |
| 0000472620 | FF58 | 8B26 | 0C5F | E3C1 | 8E02 | B806 | 267B | 36C4 |
| 0000472640 | 0856 | 8B26 | 2600 | 508B | 8902 | 5886 | 89FF | 5A96 |
| 0000472660 | C4FF | 589E | 26FF | 7F83 | 3E12 | 0374 | 26E9 | 8B00 |
| 0000472700 | 5886 | 8BFF | 5A96 | 1EFF | F08B | DA8E | BEC4 | FF50 |
| 0000472720 | 0BB9 | F300 | 1FA5 | 681E | 4935 | 3F9A | 80D6 | 83C5 |
| 0000472740 | 04C4 | 2AE9 | 8E01 | A806 | 267B | 3E83 | C58C | 7500 |
| 0000472760 | E903 | 004A | BE83 | FF6C | 75FE | E903 | 0040 | 76FF |
| 0000473000 | 1EB2 | 3B68 | 8D49 | 9046 | 5016 | 468D | 16D8 | 8D50 |
| 0000473020 | 6886 | 16FF | 1E50 | 0668 | 684A | 00AF | 36FF | 4A00 |
| 0000473040 | 36FF | 49FE | 36FF | 4A04 | 36FF | 4A02 | 681E | 4952 |
| 0000473060 | EA68 | 68C5 | C5ED | F09A | 00C5 | 8300 | 28C4 | 868B |
| 0000473100 | FF58 | 968B | FF5A | 068E | 7BBA | A326 | 0AB0 | 8926 |
| 0000473120 | B216 | 0B0A | 74D0 | E903 | 0010 | 068E | 7BBC | A126 |
| 0000473140 | 373A | 8B26 | 3C16 | E937 | 0039 | 068E | 7BBA | C426 |
| 0000473160 | B01E | 260A | 7F83 | 4E12 | 0374 | 10E9 | 8E00 | BA06 |
| 0000473200 | 267B | B0A1 | 260A | 168B | 0AB2 | 16E9 | 8E00 | BA06 |

THU MAR 14 17:52:34 1991 TSLINT.DLL PAGE 172, LINE 10090

| | | | | | | | | |
|---|---|---|---|---|---|---|---|---|
| 0000473220 | 267B | 36FF | 0AB2 | FF26 | B036 | 9A0A | 499F | C78D |
| 0000473240 | C483 | 8E04 | BE06 | 267B | 84A3 | 260A | 1689 | 0A86 |
| 0000473260 | FF26 | 8636 | 260A | 36FF | 0A84 | 839A | 8569 | 83C8 |
| 0000473300 | 04C4 | 8689 | FF64 | 9689 | FF66 | B6FF | FF66 | B6FF |
| 0000473320 | FF64 | 149A | 6765 | 83C5 | 04C4 | C28E | D88B | FF26 |
| 0000473340 | 0A77 | FF26 | 0877 | 3F9A | 4ED6 | 83C8 | 04C4 | 868B |
| 0000473360 | FF64 | 968B | FF66 | 9EC4 | FF50 | 8926 | 2607 | 5789 |
| 0000473400 | C402 | 509E | 2BFF | 26C0 | 4789 | 2606 | 4789 | 8B04 |
| 0000473420 | 5086 | 8BFF | 5296 | C4FF | DE5E | 4683 | 04DE | 8926 |
| 0000473440 | 2607 | 5789 | FF02 | B24E | ADE9 | 8BFD | 5686 | 0BFF |
| 0000473460 | 5486 | 75FF | E903 | 0017 | 5EC4 | 2606 | 77FF | 260A |
| 0000473500 | 77FF | 1E08 | 5A68 | 9A49 | B24A | C914 | C483 | 8B08 |
| 0000473520 | B246 | 4EFF | 3DB2 | 0000 | 037F | 5DE9 | 1E00 | 7B68 |
| 0000473540 | 9A49 | D63F | C96D | C483 | 6A04 | 9A3D | B2A6 | C86D |
| 0000473560 | C483 | 8902 | 5086 | 89FF | 5296 | 8EFF | BC06 | 267B |
| 0000473600 | 3AA1 | 2637 | 168B | 373C | 9EC4 | FF50 | 8926 | 2607 |
| 0000473620 | 5789 | C402 | 509E | 2BFF | 26C0 | 4789 | 2606 | 4789 |
| 0000473640 | 8B04 | 5086 | 8BFF | 5296 | C4FF | DE5E | 4683 | 04DE |
| 0000473660 | 8926 | 2607 | 5789 | E902 | FF95 | CA9A | 99D7 | 8BC8 |
| 0000473700 | FA46 | 568B | 89FC | DE46 | 5689 | 8EE0 | B806 | 267B |
| 0000473720 | 56A1 | 2608 | 168B | 0858 | 4689 | 89FA | FC56 | 468B |
| 0000473740 | 8BDE | E056 | A326 | 0856 | 8926 | 5816 | 6A08 | 6812 |
| 0000473760 | AB60 | 3868 | 8D00 | E846 | 5016 | 2E9A | 7966 | 83B4 |
| 0000474000 | 0AC4 | 068E | 7BC0 | FF26 | 5806 | 6A38 | 6812 | C9A0 |
| 0000474020 | 5468 | 8D00 | 7286 | 16FF | 9A50 | 662E | C9AD | C483 |
| 0000474040 | 8E0A | C206 | 267B | 5CA1 | 8938 | B046 | 126A | BE68 |
| 0000474060 | 68C9 | 0A88 | 468D | 16B4 | 9A50 | 662E | C9CC | C483 |
| 0000474100 | 8E0A | C406 | 267B | 5AA1 | 8938 | CE46 | 126A | DF68 |
| 0000474120 | 68C9 | 0066 | 468D | 169C | 9A50 | 662E | C9EC | C483 |
| 0000474140 | 8E0A | C606 | 267B | 5EA1 | 8938 | C646 | C726 | 5E06 |
| 000047416D | 0038 | 8E00 | C806 | 267B | 5EA1 | 260C | 168B | 0C60 |
| 0000474200 | 4689 | 89D0 | D256 | 006A | 006A | F59A | 00A1 | 9A00 |
| 0000474220 | FFFF | 0000 | 068E | 7BB4 | 8326 | 9E3E | 030A | 0374 |
| 0000474240 | 1FE9 | 9A00 | C200 | 0000 | 9A50 | ACB6 | 0000 | 016A |
| 0000474260 | CE9A | 00AC | 6A00 | 6800 | D2EE | FF9A | 00FF | E900 |
| 0000474300 | 005C | 068E | 7BB4 | 8326 | 9E3E | 020A | 0374 | 1BE9 |
| 0000474320 | 8E00 | CA06 | 267B | 06C7 | 43E4 | 0001 | 549A | 00CA |
| 0000474340 | 8E00 | AC06 | 267B | 46A3 | E938 | 0032 | 068E | 7BB4 |
| 0000474360 | 8326 | 9E3E | 010A | 0374 | 0FE9 | 2600 | 06C7 | 0A9E |
| 0000474400 | 0000 | 46C7 | 01CC | E900 | 0014 | 068E | 7BCC | 8326 |
| 0000474420 | 503E | 0038 | 0374 | 05E9 | 9A00 | AA43 | CB3D | 6B68 |
| 0000474440 | 68CB | 0038 | D29A | 7368 | 83CB | 04C4 | 003D | 7400 |
| 0000474460 | E903 | 005B | 068E | 7BA8 | 8326 | 173E | 00CC | 0375 |
| 0000474500 | 47E9 | 8300 | 6CBE | FEFF | 0375 | 3DE9 | 1E00 | 7D68 |
| 0000474520 | 8D49 | 9046 | 5016 | 468D | 16D8 | 8D50 | 6886 | 16FF |
| 0000474540 | 1E50 | 0668 | 684A | 00F3 | 36FF | 4A00 | 36FF | 49FE |
| 0000474560 | 36FF | 4A04 | 36FF | 4A02 | 681E | 4993 | 5968 | 68CC |
| 0000474600 | CC5C | 5F9A | 00CC | 8300 | 26C4 | 0D9A | FA94 | 8EC8 |
| 0000474620 | C806 | 267B | 5EA1 | 260C | 168B | 0C60 | 8689 | FF50 |
| 0000474640 | 9689 | FF52 | 468B | 8BD0 | D256 | A326 | 0C5E | 8926 |
| 0000474660 | 6016 | 6A0C | 8D12 | E846 | 5016 | 8A68 | 68CB | 0038 |
| 0000474700 | 2E9A | 9266 | 83CB | 0AC4 | 068E | 7BC0 | FF26 | 580E |
| 0000474720 | 6A38 | 8D12 | 7286 | 16FF | 6850 | CBAA | 5468 | 9A00 |
| 0000474740 | 662E | CBB2 | C483 | 8B0A | B046 | 068E | 7BC2 | A326 |
| 0000474760 | 385C | 126A | 468D | 16B4 | 6850 | CBCA | 8868 | 9A0A |
| 0000475000 | 662E | CBD2 | C483 | 8B0A | CE46 | 068E | 7BC4 | A326 |
| 0000475020 | 385A | 126A | 468D | 169C | 6850 | C9FF | 6668 | 9A00 |
| 0000475040 | 662E | CA0C | C483 | 8B0A | C646 | 068E | 7BC6 | A326 |
| 0000475060 | 385E | 068E | 7BB8 | A126 | 0856 | 8B26 | 5816 | 8908 |

THU MAR 14 17:52:34 1991 TSLINT.DLL PAGE 173, LINE 10149

| | | | | | | | | |
|---|---|---|---|---|---|---|---|---|
| 0000475100 | DE46 | 5689 | 8BE0 | FA46 | 568B | 26FC | 56A3 | 2608 |
| 0000475120 | 1689 | 0858 | 468B | 8BDE | E056 | 4689 | 89FA | FC56 |
| 0000475140 | 068E | 7BA8 | 8326 | 9C3E | 00C7 | 0375 | 47E9 | 8300 |
| 0000475160 | 6CBE | FEFF | 0375 | 3DE9 | 1E00 | 9C68 | 8D49 | 9046 |
| 0000475200 | 5016 | 468D | 16D8 | 8D50 | 6886 | 16FF | 1E50 | 0668 |
| 0000475220 | 684A | 010B | 36FF | 4A00 | 36FF | 49FE | 36FF | 4A04 |
| 0000475240 | 36FF | 4A02 | 681E | 49C4 | E168 | 68C7 | C7E4 | E79A |
| 0000475260 | 00C7 | 8300 | 26C4 | 76FF | FF86 | 8476 | BF9A | 140B |
| 0000475300 | 83CD | 04C4 | 868B | FF5C | 968B | FF5E | 068E | 7BAE |
| 0000475320 | A326 | 3848 | 8926 | 4A16 | 8B38 | C846 | 068E | 7BAC |
| 0000475340 | A326 | 3846 | 089A | 00C2 | 5000 | 3F9A | 009F | 8EU0 |
| 0000475360 | A806 | 267B | 3E83 | CAEB | 7500 | E903 | 0055 | BE83 |
| 0000475400 | FF6C | 75FE | E903 | 004B | 068E | 7BAE | FF26 | 4A36 |
| 0000475420 | 2638 | 36FF | 3848 | 681E | 49CC | 468D | 1690 | 8D50 |
| 0000475440 | D846 | 5016 | 868D | FF68 | 5016 | 681E | 4A06 | 1368 |
| 0000475460 | FF01 | 0036 | FF4A | FE36 | FF49 | 0436 | FF4A | 0236 |
| 0000475500 | 1E4A | DE68 | 6849 | CB2D | 3068 | 9ACB | CB33 | 0000 |
| 0000475520 | C483 | 8E2A | AE06 | 267B | 36FF | 384A | FF26 | 4836 |
| 0000475540 | 9A38 | BD44 | CD30 | C483 | 8904 | DC46 | 013D | 1B00 |
| 0000475560 | 40C0 | 003D | 7500 | E903 | 000B | 76FF | 9ADC | AFE0 |
| 0000475600 | CD83 | C483 | 8302 | CC7E | 7500 | E903 | 0021 | 468B |
| 0000475620 | 40CA | 068E | 7BAC | A326 | 3846 | 068E | 7BB4 | C726 |
| 0000475640 | 9E06 | 010A | 6A00 | 9A01 | C3DB | 0000 | 11E9 | FF00 |
| 0000475660 | CA76 | 5A9A | 00CA | FF00 | 60B6 | 9AFF | CA61 | 0000 |
| 0000475700 | 76FF | 6AD4 | 9A00 | CA3B | 0000 | 76FF | FF8E | 8C76 |
| 0000475720 | E59A | CCBC | 83CA | 04C4 | 4689 | 8BB2 | 0A46 | 568B |
| 0000475740 | 890C | 5486 | 89FF | 5696 | E9FF | 0014 | 9EC4 | FF54 |
| 0000475760 | 8B26 | 0447 | 8B26 | 0657 | 8689 | FF54 | 9689 | FF56 |
| 0000476000 | 468B | FFB2 | B24E | 003D | 7F00 | E903 | D0A4 | 868B |
| 0000476020 | FF56 | 860B | FF54 | 0375 | 97E9 | C400 | 549E | 26FF |
| 0000476040 | 078B | 8B26 | 0257 | 8689 | FF58 | 9689 | FF5A | 5EC4 |
| 0000476060 | 83DE | DE46 | 2604 | 078B | 8B26 | 0257 | 8689 | FF64 |
| 0000476100 | 9689 | FF66 | 9EC4 | FF58 | 8326 | 127F | 743D | E903 |
| 0000476120 | 0030 | 9EC4 | FF64 | 8326 | 127F | 743E | E903 | 0022 |
| 0000476140 | 9EC4 | FF64 | 8B26 | 0447 | 8B26 | 0657 | 9EC4 | FF58 |
| 0000476160 | 8926 | 0447 | 8926 | 0657 | 9EC4 | FF58 | C726 | 1247 |
| 0000476200 | 003E | 9EC4 | FF64 | 8B26 | 2607 | 578B | 8E02 | CE06 |
| 0000476220 | 267B | A0A3 | 260A | 1689 | 0AA2 | E79A | 5A29 | FFCE |
| 0000476240 | 66B6 | FFFF | 64B6 | 9AFF | B4E2 | CEA1 | C483 | E904 |
| 0000476260 | FF3A | 468B | FFB2 | B24E | 003D | 7F00 | E903 | 0046 |
| 0000476300 | 5EC4 | 83DE | DE46 | 2604 | 078B | 8B26 | 0257 | 8689 |
| 0000476320 | FF64 | 9689 | FF66 | 9EC4 | FF64 | 8B26 | 2607 | 578B |
| 0000476340 | 8E02 | CE06 | 267B | A0A3 | 260A | 1689 | 0AA2 | E79A |
| 0000476360 | AE29 | FFCE | 66B6 | FFFF | 64B6 | 9AFF | B4E2 | C91E |
| 0000476400 | C483 | E904 | FFAC | 468B | 0BFC | FA46 | 0375 | 87E9 |
| 0000476420 | FF00 | FC76 | 76FF | 9AFA | F91E | CEFD | C483 | 8904 |
| 0000476440 | 4E86 | FFFF | FC76 | 76FF | 9AFA | AA42 | CE4D | C483 |
| 0000476460 | 8E04 | A806 | 267B | 3E83 | CCA6 | 7500 | E903 | 0058 |
| 0000476500 | BE83 | FF6C | 75FE | E903 | 004E | E49A | 6FF7 | 52CC |
| 0000476520 | FF50 | 4EB6 | FFFF | FC76 | 76FF | 1EFA | E668 | 8D49 |
| 0000476540 | 9046 | 5016 | 468D | 16D8 | 8D50 | 6886 | 16FF | 1E50 |
| 0000476560 | 0668 | 684A | 0143 | 36FF | 4A00 | 36FF | 49FE | 36FF |
| 0000476600 | 4A04 | 36FF | 4A02 | 681E | 49F4 | F668 | 68CC | CCF9 |
| 0000476620 | FC9A | 00CC | 8300 | 30C4 | 7E83 | 00E2 | 0375 | 0CE9 |
| 0000476640 | FF00 | 62B6 | 9AFF | C295 | 0000 | 09E9 | FF00 | 62B6 |
| 0000476660 | 9AFF | CC9B | 0000 | CD9A | CADD | 8ECE | A806 | 267B |
| 0000476700 | 3E83 | CEE8 | 7500 | E903 | 000A | BE83 | FF6C | 74FE |
| 0000476720 | E903 | 000F | 068E | 7BAA | 8326 | C13E | 00C0 | 0375 |
| 0000476740 | 62E9 | 8B00 | 5086 | 8BFF | 5296 | 89FF | 6E86 | 89FF |

THU MAR 14 17:52:34 1991 TSLINT.DLL PAGE 174, LINE 10208

| | | | | | | | | |
|---|---|---|---|---|---|---|---|---|
| 0000476760 | 7096 | FFFF | 8A76 | 76FF | 8D88 | 6E86 | 16FF | FF50 |
| 0000477000 | AE76 | 76FF | FFE6 | E476 | 4E8D | 1690 | 8D51 | D84E |
| 0000477020 | 5116 | 8E8D | FF68 | 5116 | 681E | 4A06 | 4F68 | FF01 |
| 0000477040 | 0036 | FF4A | FE36 | FF49 | 0436 | FF4A | 0236 | 9A4A |
| 0000477060 | BEFF | 0000 | C483 | 8B28 | 6E86 | 8BFF | 7096 | E9FF |
| 0000477100 | 000E | 0BE9 | 8B00 | 5086 | 8BFF | 5296 | E9FF | 0000 |
| 0000477120 | 5F5E | ED83 | 8B02 | 1FE5 | 4D5D | 1ECB | 9058 | 5545 |
| 0000477140 | EC8B | 8E1E | 81D8 | 36EC | 5700 | C756 | F646 | 4A10 |
| 0000477160 | 5E8C | C7F8 | EA46 | 0107 | C02B | 4689 | 89DC | DA46 |
| 0000477200 | 068E | 7BA8 | 8326 | CE3E | 00D0 | 0375 | 1DE9 | FF00 |
| 0000477220 | 0436 | FF4A | 0236 | 8D4A | CC46 | 5016 | AB9A | 00C0 |
| 0000477240 | 8300 | 08C4 | 003D | 7400 | E903 | 000F | 068E | 7BAA |
| 0000477260 | 8326 | E63E | U0D0 | 0375 | 3BE9 | 1E00 | 1768 | 8D4A |
| 0000477300 | DE46 | 5016 | 468D | 16CC | 8D50 | EE46 | 5016 | 7868 |
| 0000477320 | 1E01 | 1E68 | FF4A | 0036 | FF4A | FE36 | FF49 | 0436 |
| 0000477340 | FF4A | 0236 | 9A4A | C0F4 | 0000 | C483 | 891E | EE46 |
| 0000477360 | 5689 | E9F0 | 0008 | C02B | 4689 | 89F0 | EE46 | 76FF |
| 0000477400 | FF08 | 0676 | E59A | 69BC | 83CF | 04C4 | 4689 | 3DCA |
| 0000477420 | 0000 | 0374 | 86E9 | 8E00 | A806 | 267B | 3E83 | CF72 |
| 0000477440 | 7500 | E903 | 0009 | 7E83 | FED0 | 0374 | 0FE9 | 8E00 |
| 0000477460 | AA06 | 267B | 3E83 | CF8B | 7500 | E903 | 0056 | C02B |
| 0000477500 | 4689 | 89D4 | D246 | 76FF | FFDC | DA76 | 468D | 16D2 |
| 0000477520 | FF50 | EA76 | 76FF | FFF8 | F676 | 4E8D | 16DE | 8D51 |
| 0000477540 | EE4E | 5116 | 4E8D | 16CC | 1E51 | 1E68 | 684A | 017E |
| 0000477560 | 36FF | 4A00 | 36FF | 49FE | 36FF | 4A04 | 36FF | 4A02 |
| 0000477600 | E09A | 00CF | 8300 | 28C4 | 468B | 8BD2 | D456 | 0AE9 |
| 0000477620 | E901 | 0009 | 00B8 | BA00 | 0000 | FEE9 | 8E00 | D006 |
| 0000477640 | 267B | 06C7 | 0052 | 0000 | 006A | 76FF | FF08 | 0676 |
| 0000477660 | 569A | 96D2 | 83D1 | 06C4 | 4689 | 89FA | FC56 | 4689 |
| 0000477700 | 89D6 | D856 | 46C7 | 01EC | E900 | 0003 | 46FF | 8BEC |
| 0000477720 | CA46 | 4639 | 7CEC | E903 | 0037 | 76FF | FFEC | 0876 |
| 0000477740 | 76FF | 9A06 | D256 | D0B7 | C483 | 8906 | F246 | 5689 |
| 0000477760 | 8BF4 | F246 | 568B | C4F4 | FA5E | 8926 | 0447 | 8926 |
| 0000500000 | 0657 | 468B | 8BF2 | F456 | 4689 | 89FA | FC56 | BBE9 |
| 0000500020 | 8EFF | A806 | 267B | 3E83 | D037 | 7500 | E903 | 0009 |
| 0000500040 | 7E83 | FED0 | 0374 | 0FE9 | 8E00 | AA06 | 267B | 3E83 |
| 0000500060 | D063 | 7500 | E903 | 005A | 468B | 8BD6 | D856 | 4689 |
| 0000500100 | 89D2 | D456 | 76FF | FFDC | DA76 | 468D | 16D2 | FF50 |
| 0000500120 | EA76 | 76FF | FFF8 | F676 | 4E8D | 16DE | 8D51 | EE4E |
| 0000500140 | 5116 | 4E8D | 16CC | 1E51 | 1E68 | 684A | 0189 | 36FF |
| 0000500160 | 4A00 | 36FF | 49FE | 36FF | 4A04 | 36FF | 4A02 | 319A |
| 0000500200 | 00D1 | 8300 | 28C4 | 468B | 8BD2 | D456 | 0CE9 | E900 |
| 0000500220 | 0009 | 468B | 8BD6 | D856 | 00E9 | 5E00 | 835F | 02ED |
| 0000500240 | E58B | 5D1F | CB4D | 581E | 4590 | 8B55 | 1EEC | D88E |
| 0000500260 | EC81 | 0032 | 5657 | 46C7 | 37FA | 8C4A | FC5E | 46C7 |
| 0000500300 | 07E8 | 2B01 | 89C0 | DA46 | 4689 | 8ED8 | A806 | 267B |
| 0000500320 | 3E83 | D317 | 7500 | E903 | 001D | 36FF | 4A04 | 36FF |
| 0000500340 | 4A02 | 468D | 16CE | 9A50 | D04D | 0000 | C483 | 3D08 |
| 0000500360 | 0000 | 0374 | 0FE9 | 8E00 | AA06 | 267B | 3E83 | D464 |
| 0000500400 | 7500 | E903 | 003B | 681E | 4A3E | 468D | 16DC | 8D50 |
| 0000500420 | CE46 | 5016 | 468D | 16EA | 6850 | 019A | 681E | 4A84 |
| 0000500440 | 36FF | 4A00 | 36FF | 49FE | 36FF | 4A04 | 36FF | 4A02 |
| 0000500460 | 969A | 00D0 | 8300 | 1EC4 | 4689 | 89EA | EC56 | 08E9 |
| 0000500500 | 2B00 | 89C0 | EC46 | 4689 | FFEA | 0A76 | 76FF | FF08 |
| 0000500520 | 0676 | 109A | 70BD | 83D3 | 06C4 | 4689 | 89EE | F056 |
| 0000500540 | 068E | 7BA8 | 8326 | B43E | 00D3 | 0375 | 4EE9 | 8300 |
| 0000500560 | D27E | 75FE | E903 | 0045 | 76FF | FFF0 | EE76 | 76FF |
| 0000500600 | 1E0A | 4568 | 8D4A | DC46 | 5016 | 468D | 16EA | 8D50 |
| 0000500620 | CE46 | 5016 | 681E | 4A84 | 9F68 | FF01 | 0036 | FF4A |

THU MAR 14 17:52:34 1991 TSLINT.DLL PAGE 175, LINE 10267

| | | | | | | | | |
|---|---|---|---|---|---|---|---|---|
| 0000500640 | FE36 | FF49 | 0436 | FF4A | 0236 | 1E4A | 5668 | 684A |
| 0000500660 | D410 | 1368 | 9AD4 | D416 | 0000 | C483 | 9A2C | E352 |
| 0000500700 | D3A8 | 8E50 | B606 | 267B | 70A0 | 5026 | 76FF | FFF0 |
| 0000500720 | EE76 | 149A | 2C51 | 83D4 | 04C4 | 5040 | 879A | DCAC |
| 0000500740 | 83CE | 06C4 | 4689 | 89F6 | F856 | D00B | 0374 | 0CE9 |
| 0000500760 | 1E00 | 5E68 | 9A4A | B3B6 | D3C8 | C483 | 8E04 | A806 |
| 0000501000 | 267B | 3E83 | D44C | 7500 | E903 | 0061 | 7E83 | FED2 |
| 0000501020 | 0375 | 58E9 | 9A00 | F7E4 | D3D5 | 5052 | 76FF | FFF8 |
| 0000501040 | F676 | 1E9A | 3AF9 | 83D4 | 04C4 | FF50 | F876 | 76FF |
| 0000501060 | 1EF6 | 6D68 | 8D4A | DC46 | 5016 | 468D | 16EA | 8D50 |
| 0000501100 | CE46 | 5016 | 681E | 4A84 | A068 | FF01 | 0036 | FF4A |
| 0000501120 | FE36 | FF49 | 0436 | FF4A | 0236 | 1E4A | 7B68 | 684A |
| 0000501140 | CF3B | 3E68 | 9ACF | CF41 | 0000 | C483 | FF30 | F076 |
| 0000501160 | 76FF | FFEE | F876 | 76FF | 9AF6 | 50B4 | CAD7 | C483 |
| 0000501200 | FF08 | F876 | 76FF | 9AF6 | 0D0E | D163 | C483 | 8904 |
| 0000501220 | F246 | 5689 | 8EF4 | A806 | 267B | 3E83 | D1C8 | 7500 |
| 0000501240 | E903 | 0009 | 7E83 | FED2 | 0374 | 0FE9 | 8E00 | AA06 |
| 0000501260 | 267B | 3E83 | D1E0 | 7500 | E903 | 005A | 468B | 8BF2 |
| 0000501300 | F456 | 4689 | 89D4 | D656 | 76FF | FFDA | D876 | 468D |
| 0000501320 | 16D4 | FF50 | E876 | 76FF | FFFC | FA76 | 4E8D | 16DC |
| 0000501340 | 8D51 | EA4E | 5116 | 4E8D | 16CE | 1E51 | 8468 | 684A |
| 0000501360 | 01A3 | 36FF | 4A00 | 36FF | 49FE | 36FF | 4A04 | 36FF |
| 0000501400 | 4A02 | 2F9A | 00D2 | 8300 | 28C4 | 468B | 8BD4 | D656 |
| 0000501420 | 0CE9 | E900 | 0009 | 468B | 8BF2 | F456 | 00E9 | 5E00 |
| 0000501440 | 835F | 02ED | E58B | 5D1F | CB4D | 581E | 4590 | 8B55 |
| 0000501460 | 1EEC | D88E | EC81 | 0000 | 5657 | 5F5E | ED83 | 8B02 |
| 0000501500 | 1FE5 | 4D5D | 00CB | 581E | 4590 | 8B55 | 1EEC | D88E |
| 0000501520 | EC81 | 0024 | 5657 | 46C7 | A4FA | 8C4A | FC5E | 46C7 |
| 0000501540 | 00F4 | 2B00 | 89C0 | E646 | 4689 | 8EE4 | D206 | 267B |
| 0000501560 | 3E83 | D282 | 7500 | E903 | 001D | 36FF | 4AB4 | 36FF |
| 0000501600 | 4AB2 | 468D | 16DC | 9A50 | D298 | 0000 | C483 | 3D08 |
| 0000501620 | 0000 | 0374 | 0FE9 | 8E00 | D406 | 267B | 3E83 | D5F1 |
| 0000501640 | 7500 | E903 | 003A | 681E | 4AA8 | 468D | 16E8 | 8D50 |
| 0000501660 | DC46 | 5016 | 468D | 16F6 | 6A50 | 1E59 | 8268 | FF4B |
| 0000501700 | B036 | FF4A | AE36 | FF4A | B436 | FF4A | B236 | 9A4A |
| 0000501720 | D2E1 | 0000 | C483 | 891E | F646 | 5689 | E9F8 | 0008 |
| 0000501740 | C02B | 4689 | 89F8 | F646 | 76FF | FF08 | 0676 | 681E |
| 0000501760 | 4AB6 | B49A | BD50 | 83D5 | 08C4 | 468B | A30A | 4AE8 |
| 0000502000 | 76FF | FF0E | 0C76 | 681E | 4B4E | B49A | CD50 | 83D5 |
| 0000502020 | 08C4 | 681E | 4AAC | 681E | 4AEA | B49A | 8550 | 83D3 |
| 0000502040 | 08C4 | 068E | 7BD2 | 8326 | 223E | 00D5 | 0375 | 09E9 |
| 0000502060 | 8300 | E07E | 74FE | E903 | 000F | 068E | 7BD4 | 8326 |
| 0000502100 | AE3E | 00D2 | 0375 | 38E9 | 8D00 | E846 | 5016 | 468D |
| 0000502120 | 16F6 | 8D50 | DC46 | 5016 | 681E | 4B82 | 636A | 36FF |
| 0000502140 | 4AB0 | 36FF | 4AAE | 36FF | 4AB4 | 36FF | 4AB2 | 019A |
| 0000502160 | 00B5 | 8300 | 1AC4 | 46C7 | 00E2 | E900 | 0006 | 03E9 |
| 0000502200 | E900 | 0000 | 5F5E | ED83 | 8B02 | 1FE5 | 4D5D | 1ECB |
| 0000502220 | 9058 | 5545 | EC8B | 8E1E | 81D8 | 24EC | 5700 | C756 |
| 0000502240 | FA46 | 4B91 | 5E8C | C7FC | F446 | 0000 | C02B | 4689 |
| 0000502260 | 89E6 | E446 | 068E | 7BD2 | 8326 | E83E | 00D6 | 0375 |
| 0000502300 | 1DE9 | FF00 | B436 | FF4A | B236 | 8D4A | DC46 | 5016 |
| 0000502320 | 389A | 00D5 | 8300 | 08C4 | 003D | 7400 | E903 | 000F |
| 0000502340 | 068E | 7BD4 | 8326 | 7B3E | 00D7 | 0375 | 3AE9 | 1E00 |
| 0000502360 | 9568 | 8D4B | E846 | 5016 | 468D | 16DC | 8D50 | F646 |
| 0000502400 | 5016 | 7D6A | 681E | 4BB2 | 36FF | 4AB0 | 36FF | 4AAE |
| 0000502420 | 36FF | 4AB4 | 36FF | 4AB2 | 809A | 00D5 | 8300 | 1EC4 |
| 0000502440 | 4689 | 89F6 | F856 | 08E9 | 2B00 | 89C0 | F846 | 4689 |
| 0000502460 | 8EF6 | D206 | 267B | 3E83 | D763 | 7500 | E903 | 004A |
| 0000502500 | 7E83 | FEE0 | 0375 | 41E9 | FF00 | 0876 | 76FF | 1E06 |

THU MAR 14 17:52:34 1991 TSLINT.DLL PAGE 176, LINE 10326

| | | | | | | | | |
|---|---|---|---|---|---|---|---|---|
| 0000502520 | 9968 | 8D4B | E846 | 5016 | 468D | 16F6 | 8D50 | DC46 |
| 0000502540 | 5016 | 681E | 4BB2 | 7E6A | 36FF | 4AB0 | 36FF | 4AAE |
| 0000502560 | 36FF | 4AB4 | 36FF | 4AB2 | 681E | 4BA6 | 6068 | 68D3 |
| 0000502600 | D363 | 669A | 00D3 | 8300 | 2AC4 | 76FF | FF08 | 0676 |
| 0000502620 | 681E | 4AEA | 6E9A | 5750 | 83D7 | 08C4 | 681E | 4BAE |
| 0000502640 | 681E | 4AEA | 6E9A | A550 | 83D5 | 08C4 | 068E | 7BD2 |
| 0000502660 | 8326 | D93E | 00D5 | 0375 | D9E9 | 8300 | E07E | 74FE |
| 0000502700 | E903 | 000F | 068E | 7BD4 | 8326 | 4E3E | 00D5 | 0375 |
| 0000502720 | 39E9 | 8D00 | E846 | 5016 | 468D | 16F6 | 8D50 | DC46 |
| 0000502740 | 5016 | 681E | 4BB2 | 8368 | FF00 | B036 | FF4A | AE36 |
| 0000502760 | FF4A | B436 | FF4A | B236 | 9A4A | D61F | 0000 | C483 |
| 0000503000 | C71A | E246 | 0000 | 06E9 | E900 | 0003 | 00E9 | 5E00 |
| 0000503020 | 835F | 02ED | E58B | 5D1F | CB4D | 581E | 4590 | 8B55 |
| 0000503040 | 1EEC | D88E | EC81 | 0028 | 5657 | 46C7 | C5FA | 8C4B |
| 0000503060 | FC5E | 46C7 | 00F0 | 2B00 | 89C0 | E246 | 4689 | 8EE0 |
| 0000503100 | D206 | 267B | 3E83 | D66B | 7500 | E903 | 001D | 36FF |
| 0000503120 | 4AB4 | 36FF | 4AB2 | 468D | 16D8 | 9A50 | D681 | 0000 |
| 0000503140 | C483 | 3D08 | 0000 | 0374 | 0FE9 | 8E00 | D406 | 267B |
| 0000503160 | 3E83 | D697 | 7500 | E903 | 003B | 681E | 4BC9 | 468D |
| 0000503200 | 16E4 | 8D50 | D846 | 5016 | 468D | 16F2 | 6850 | 009F |
| 0000503220 | 681E | 4C04 | 36FF | 4AB0 | 36FF | 4AAE | 36FF | 4AB4 |
| 0000503240 | 36FF | 4AB2 | C99A | 00D6 | 8300 | 1EC4 | 4689 | 89F2 |
| 0000503260 | F456 | 08E9 | 2B00 | 89C0 | F446 | 4689 | 1EF2 | CD68 |
| 0000503300 | 1E4B | EA68 | 9A4A | 50EA | D890 | C483 | 3D08 | 0000 |
| 0000503320 | 0374 | 13E9 | 1E00 | CF68 | 1E4B | EA68 | 9A4A | 506E |
| 0000503340 | D8A1 | C483 | E908 | 009F | 2C6A | 681E | 4AEA | DA9A |
| 0000503360 | 4764 | 83D7 | 06C4 | 4689 | 89F6 | F856 | 068E | 7BD6 |
| 0000503400 | 8326 | C93E | 00D8 | 0375 | 60E9 | 8B00 | F846 | 460B |
| 0000503420 | 74F6 | E903 | 0055 | 8326 | A33E | 00C2 | 0375 | 4AE9 |
| 0000503440 | 1E00 | D268 | 8E4B | D806 | 267B | 36FF | 0002 | FF26 |
| 0000503460 | 5636 | 8DC2 | E446 | 5016 | 468D | 16F2 | 8D50 | D846 |
| 0000503500 | 5016 | 681E | 4C04 | A968 | FF00 | B036 | FF4A | AE36 |
| 0000503520 | FF4A | B436 | FF4A | B236 | 1E4A | E368 | 684B | D98A |
| 0000503540 | 8D68 | 9AD9 | C289 | 0000 | C483 | 8B2A | F846 | 460B |
| 0000503560 | 75F6 | E903 | 0011 | 5EC4 | FFF6 | F646 | C626 | 2907 |
| 0000503600 | 5EC4 | 26F6 | 07C6 | 8E00 | D206 | 267B | 3E83 | D9B6 |
| 0000503620 | 7500 | E903 | 0051 | 7E83 | FEDC | 0375 | 48E9 | 1E00 |
| 0000503640 | EA68 | FF4A | E836 | 1E4A | B668 | 1E4A | EC68 | 8D4B |
| 0000503660 | E446 | 5016 | 468D | 16F2 | 8D50 | D846 | 5016 | 681E |
| 0000503700 | 4C04 | B266 | FF00 | B036 | FF4A | AE36 | FF4A | B436 |
| 0000503720 | FF4A | B236 | 1E4A | FC68 | 684B | D72D | 3068 | 9AD7 |
| 0000503740 | D733 | 0000 | C483 | 1E30 | EA68 | 1E4A | 4E68 | FF4B |
| 0000503760 | E836 | 1E4A | B668 | 9A4A | DA1D | D305 | C483 | 8E0E |
| 0000504000 | D206 | 267B | 3E83 | D7F6 | 7500 | E903 | 0009 | 7E83 |
| 0000504020 | FEDC | 0374 | 0FE9 | 8E00 | D406 | 267B | 3E83 | D822 |
| 0000504040 | 7500 | E903 | 0039 | 468D | 16E4 | 8D50 | F246 | 5016 |
| 0000504060 | 468D | 16D8 | 1E50 | 0468 | 684C | 00B6 | 36FF | 4AB0 |
| 0000504100 | 36FF | 4AAE | 36FF | 4AB4 | 36FF | 4AB2 | AA9A | 00D7 |
| 0000504120 | 8300 | 1AC4 | 46C7 | 00DE | E900 | 0006 | 03E9 | E900 |
| 0000504140 | 0000 | 5F5E | ED83 | 8B02 | 1FE5 | 4D5D | 1ECB | 9058 |
| 0000504160 | 5545 | EC8B | 8E1E | 81D8 | 26EC | 5700 | C756 | FA46 |
| 0000504200 | 4C11 | 5E8C | C7FC | F246 | 0101 | C02B | 4689 | 89E4 |
| 0000504220 | E246 | 068E | 7BD2 | 8326 | D63E | 00DA | 0375 | 1DE9 |
| 0000504240 | FFD0 | B436 | FF4A | B236 | 8D4A | DA46 | 5016 | 0C9A |
| 0000504260 | 00D8 | 8300 | 08C4 | 003D | 7400 | E903 | 000F | 068E |
| 0000504300 | 7BD4 | 8326 | 423E | 00DB | 0375 | 3BE9 | 1E00 | 1568 |
| 0000504320 | 8D4C | E646 | 5016 | 468D | 16DA | 8D50 | F646 | 5016 |
| 0000504340 | D268 | 1E00 | A268 | FF4C | B036 | FF4A | AE36 | FF4A |
| 0000504360 | B436 | FF4A | B236 | 9A4A | D855 | 0000 | C483 | 891E |

THU MAR 14 17:52:34 1991 TSLINT.DLL PAGE 177, LINE 10385

| | | | | | | | | |
|---|---|---|---|---|---|---|---|---|
| 0000504400 | F646 | 5689 | E9F8 | 0008 | C02B | 4689 | 89F8 | F646 |
| 0000504420 | 46C7 | 00F4 | 8300 | 803E | 634B | 037D | D1E9 | 8E00 |
| 0000504440 | D206 | 267B | 3E83 | DB2A | 7500 | E903 | 0045 | 7E83 |
| 0000504460 | FEDE | 0375 | 3CE9 | 1E00 | 1968 | 8D4C | E646 | 5016 |
| 0000504500 | 468D | 16F6 | 8D50 | DA46 | 5016 | 681E | 4CA2 | D668 |
| 0000504520 | FF00 | B036 | FF4A | AE36 | FF4A | B436 | FF4A | B236 |
| 0000504540 | 1E4A | 3468 | 684C | DC6F | 7268 | 9ADC | DD31 | 0000 |
| 0000504560 | C483 | 8E26 | D206 | 267B | 3E83 | DCD2 | 7500 | E903 |
| 0000504600 | 0009 | 7E83 | FEDE | 0374 | 0FE9 | 8E00 | D406 | 267B |
| 0000504620 | 3E83 | DD64 | 7500 | E903 | 0050 | 46C7 | FFE0 | FFFF |
| 0000504640 | E476 | 76FF | 8DE2 | E046 | 5016 | 76FF | FFF2 | FC76 |
| 0000504660 | 76FF | 8DFA | E64E | 5116 | 4E8D | 16F6 | 8D51 | DA4E |
| 0000504700 | 5116 | 681E | 4CA2 | D768 | FF00 | B036 | FF4A | AE36 |
| 0000504720 | FF4A | B436 | FF4A | B236 | 9A4A | DDAC | 0000 | C483 |
| 0000504740 | 8B28 | E046 | 2BE9 | E902 | 0006 | FFB8 | E9FF | 0222 |
| 0000504760 | 3E83 | 4B80 | 7400 | E903 | 0049 | 46C7 | 01F4 | FF00 |
| 0000505000 | 0876 | 76FF | 6906 | 8006 | CA4B | 0500 | 823C | 501E |
| 0000505020 | B49A | E750 | 83DB | 08C4 | 468B | 690A | 801E | CA4B |
| 0000505040 | 8900 | 6E87 | 1E82 | 3A68 | 694C | 8006 | CA4B | 0500 |
| 0000505060 | 82A2 | 501E | B49A | 1650 | 83DC | 08C4 | 06FF | 4B80 |
| 0000505100 | 96E9 | 8E00 | D606 | 267B | 3E83 | DC2A | 7500 | E903 |
| 0000505120 | 007A | 0669 | 4B80 | 00CA | 3C05 | 1E82 | FF50 | 0876 |
| 0000505140 | 76FF | 9A06 | 50EA | DC9D | C483 | 3D08 | 0000 | 0375 |
| 0000505160 | 59E9 | 8E00 | D606 | 267B | 3E83 | D8B3 | 7500 | E903 |
| 0000505200 | 004A | 681E | 4C3E | 068E | 7BD8 | FF26 | 0236 | 2600 |
| 0000505220 | 36FF | D8E1 | 468D | 16E6 | 8D50 | F646 | 5016 | 468D |
| 0000505240 | 16DA | 1E50 | A268 | 684C | 00E4 | 36FF | 4AB0 | 36FF |
| 0000505260 | 4AAE | 36FF | 4AB4 | 36FF | 4AB2 | 681E | 4C6D | 2B68 |
| 0000505300 | 68DD | DD2E | 149A | 00D9 | 8300 | 2AC4 | 468B | 690A |
| 0000505320 | 801E | CA4B | 8900 | 6E87 | FF82 | 0E76 | 76FF | 690C |
| 0000505340 | 8006 | CA4B | 0500 | 823C | 501E | B49A | C250 | 83DC |
| 0000505360 | 08C4 | 1E69 | 4B80 | 00CA | 87C7 | 826E | 0000 | 76FF |
| 0000505400 | FF12 | 1076 | 0669 | 4B80 | 00CA | A205 | 1E82 | 9A50 |
| 0000505420 | 50B4 | D878 | C483 | FF08 | 8006 | 8E4B | D206 | 267B |
| 0000505440 | 3E83 | DD4C | 7500 | E903 | 005E | 7E83 | FEDE | 0375 |
| 0000505460 | 55E9 | FF00 | 1276 | 76FF | FF10 | 0E76 | 76FF | FF0C |
| 0000505500 | 0A76 | 76FF | FF08 | 0676 | 36FF | 4B80 | 681E | 4C76 |
| 0000505520 | 468D | 16E6 | 8D50 | F646 | 5016 | 468D | 16DA | 1E50 |
| 0000505540 | A268 | 684C | 00F0 | 36FF | 4AB0 | 36FF | 4AAE | 36FF |
| 0000505560 | 4AB4 | 36FF | 4AB2 | 681E | 4C99 | 0E68 | 68D9 | D911 |
| 0000505600 | 909A | 00D9 | 8300 | 36C4 | 36FF | 4B80 | 681E | 823C |
| 0000505620 | FF9A | 00FF | 8E00 | D206 | 267B | 3E83 | D93E | 7500 |
| 0000505640 | E903 | 0009 | 7E83 | FEDE | 0374 | 0FE9 | 8E00 | D406 |
| 0000505660 | 267B | 3E83 | D9CE | 7500 | E903 | 0050 | 46C7 | 00E0 |
| 0000505700 | FF00 | E476 | 76FF | 8DE2 | E046 | 5016 | 76FF | FFF2 |
| 0000505720 | FC76 | 76FF | 8DFA | E64E | 5116 | 4E8D | 16F6 | 8D51 |
| 0000505740 | DA4E | 5116 | 681E | 4CA2 | F768 | FF00 | B036 | FF4A |
| 0000505760 | AE36 | FF4A | B436 | FF4A | B236 | 9A4A | D4B3 | 0000 |
| 0000506000 | C483 | 8B28 | E046 | 09E9 | E900 | 0006 | 00B8 | E900 |
| 0000506020 | 0000 | 5F5E | ED83 | 8B02 | 1FE5 | 4D5D | 1ECB | 9058 |
| 0000506040 | 5545 | EC8B | 8E1E | 81D8 | 24EC | 5700 | C756 | FA46 |
| 0000506060 | 4CB0 | 5E8C | C7FC | F446 | 0101 | C02B | 4689 | 89E6 |
| 0000506100 | E446 | 068E | [illegible] | 8326 | 813E | 00DE | 0375 | 1DE9 |
| 0000506120 | FF00 | B436 | FF4A | B236 | 8D4A | DC46 | 5016 | 5F9A |
| 0000506140 | 00DA | 8300 | 08C4 | 003D | 7400 | E903 | 000F | 068E |
| 0000506160 | 7BD4 | 8326 | ED3E | 00DE | 0375 | 3BE9 | 1E00 | B468 |
| 0000506200 | 8D4C | E846 | 5016 | 468D | 16DC | 8D50 | F646 | 5016 |
| 0000506220 | 1268 | 1E01 | 0468 | FF4D | B036 | FF4A | AE36 | FF4A |
| 0000506240 | B436 | FF4A | B236 | 9A4A | DAA8 | 0000 | C483 | 891E |

THU MAR 14 17:52:34 1991 TSLINT.DLL PAGE 178, LINE 10444

| | | | | | | | | |
|---|---|---|---|---|---|---|---|---|
| 0000506260 | F646 | 5689 | E9F8 | 0008 | C02B | 4689 | 89F8 | F646 |
| 0000506300 | 3E83 | 4B80 | 7E00 | E903 | 00D1 | 068E | 7BD2 | 8326 |
| 0000506320 | D53E | 00DE | 0375 | 45E9 | 8300 | E07E | 75FE | E903 |
| 0000506340 | 003C | 681E | 4CB8 | 468D | 16E8 | 8D50 | F646 | 5016 |
| 0000506360 | 468D | 16DC | 1E50 | 0468 | 684D | 0115 | 36FF | 4AB0 |
| 0000506400 | 36FF | 4AAE | 36FF | 4AB4 | 36FF | 4AB2 | 681E | 4CD3 |
| 0000506420 | D568 | 68DF | DFD8 | DB9A | 00DF | 8300 | 26C4 | 068E |
| 0000506440 | 7BD2 | 8326 | 663E | 00DF | 0375 | 09E9 | 8300 | E07E |
| 0000506460 | 74FE | E903 | 000F | 068E | 7BD4 | 8326 | 0E3E | 00E0 |
| 0000506500 | 0375 | 50E9 | C700 | E246 | FFFF | 76FF | FFE6 | E476 |
| 0000506520 | 468D | 16E2 | FF50 | F476 | 76FF | FFFC | FA76 | 4E8D |
| 0000506540 | 16E8 | 8D51 | F64E | 5116 | 4E8D | 16DC | 1E51 | 0468 |
| 0000506560 | 684D | 0116 | 36FF | 4AB0 | 36FF | 4AAE | 36FF | 4AB4 |
| 0000506600 | 36FF | 4AB2 | 569A | 00E0 | 8300 | 28C4 | 468B | E9E2 |
| 0000506620 | 012A | 06E9 | B600 | FFFF | 21E9 | FF01 | 800E | 834B |
| 0000506640 | 803E | 014B | 0374 | 06E9 | C700 | 8006 | 004B | 8E00 |
| 0000506660 | D206 | 267B | 3E83 | DFF6 | 7500 | E903 | 0074 | 7E83 |
| 0000506700 | FEE0 | 0375 | 6BE9 | 6900 | 8006 | CA4B | 0500 | 82A2 |
| 0000506720 | 501E | 0669 | 4B80 | 00CA | 7005 | 1E82 | 6950 | 801E |
| 0000506740 | CA4B | FF00 | 6EB7 | 6982 | 8006 | CA4B | 0500 | 823C |
| 0000506760 | 501E | 36FF | 4B80 | 681E | 4CD9 | 468D | 16E8 | 8D50 |
| 0000507000 | F646 | 5016 | 468D | 16DC | 1E50 | 0468 | 684D | 0123 |
| 0000507020 | 36FF | 4AB0 | 36FF | 4AAE | 36FF | 4AB4 | 36FF | 4AB2 |
| 0000507040 | 681E | 4CFB | 1668 | 68DB | DB19 | 1C9A | 00DB | 8300 |
| 0000507060 | 36C4 | 36FF | 4B80 | 681E | 823C | 419A | 00DD | 8E00 |
| 0000507100 | D206 | 267B | 3E83 | DA49 | 7500 | E903 | 0009 | 7E83 |
| 0000507120 | FEED | 0374 | 0FE9 | 8E00 | D406 | 267B | 3E83 | DA75 |
| 0000507140 | 7500 | E903 | 0050 | 46C7 | 00E2 | FF00 | E676 | 76FF |
| 0000507160 | 8DE4 | E246 | 5016 | 76FF | FFF4 | FC76 | 76FF | 8DFA |
| 0000507200 | E84E | 5116 | 4E8D | 16F6 | 8D51 | DC4E | 5116 | 681E |
| 0000507220 | 4D04 | 2A68 | FF01 | B036 | FF4A | AE36 | FF4A | B436 |
| 0000507240 | FF4A | B236 | 9A4A | DB8A | 0000 | C483 | 8B28 | E246 |
| 0000507260 | 09E9 | E900 | 0006 | 00B8 | E900 | 0000 | 5F5E | ED83 |
| 0000507300 | 8B02 | 1FE5 | 4D5D | 1ECB | 9058 | 5545 | EC8B | 8E1E |
| 0000507320 | 81D8 | 24EC | 5700 | 1E56 | 58B8 | 8EAF | C7D8 | FA46 |
| 0000507340 | 4D11 | 5E8C | C7FC | F446 | 0101 | C02B | 4689 | 89E6 |
| 0000507360 | E446 | 068E | 7BD2 | 8326 | 313E | 00E1 | 0375 | 1DE9 |
| 0000507400 | FF00 | B436 | FF4A | B236 | 8D4A | DC46 | 5016 | 0F9A |
| 0000507420 | 00DE | 8300 | 08C4 | 003D | 7400 | E903 | 000F | 068E |
| 0000507440 | 7BD4 | 8326 | 9D3E | 00E1 | 0375 | 3BE9 | 1E00 | 1568 |
| 0000507460 | 8D4D | E846 | 5016 | 468D | 16DC | 8D50 | F646 | 5016 |
| 0000507500 | 4868 | 1E01 | 3268 | FF4D | B036 | FF4A | AE36 | FF4A |
| 0000507520 | B436 | FF4A | B236 | 9A4A | DE58 | 0000 | C483 | 891E |
| 0000507540 | F646 | 5689 | E9F8 | 0008 | C02B | 4689 | 89F8 | F646 |
| 0000507560 | 3E83 | 4B80 | 7400 | E903 | 00D1 | 068E | 7BD2 | 8326 |
| 0000507600 | 853E | 00E1 | 0375 | 45E9 | 8300 | E07E | 75FE | E903 |
| 0000507620 | 003C | 681E | 4D19 | 468D | 16E8 | 8D50 | F646 | 5016 |
| 0000507640 | 468D | 16DC | 1E50 | 3268 | 684D | 014B | 36FF | 4AB0 |
| 0000507660 | 36FF | 4AAE | 36FF | 4AB4 | 36FF | 4AB2 | 681E | 4D2A |
| 0000507700 | C168 | 68DE | DEC4 | C79A | 00DE | 8300 | 26C4 | 068E |
| 0000507720 | 7BD2 | 8326 | 0E3E | 00E2 | 0375 | 09E9 | 8300 | E07E |
| 0000507740 | 74FE | E903 | 000F | 068E | 7BD4 | 8326 | 263E | 00E2 |
| 0000507760 | 0375 | 50E9 | C700 | E246 | 0000 | 76FF | FFE6 | E476 |
| 0000510000 | 468D | 16E2 | FF50 | F476 | 76FF | FFFC | FA76 | 4E8D |
| 0000510020 | 16E8 | 8D51 | F64E | 5116 | 4E8D | 16DC | 1E51 | 3268 |
| 0000510040 | 684D | 014C | 36FF | 4AB0 | 36FF | 4AAE | 36FF | 4AB4 |
| 0000510060 | 36FF | 4AB2 | 6F9A | 00E2 | 8300 | 28C4 | 468B | E9E2 |
| 0000510100 | 0093 | 06E9 | B800 | 0000 | 8AE9 | C400 | 065E | C726 |
| 0000510120 | 3C07 | 2682 | 5F8C | 8E02 | D206 | 267B | 3E83 | DDF9 |

THU MAR 14 17:52:34 1991 TSLINT.DLL PAGE 179, LINE 10503

| | | | | | | | | |
|---|---|---|---|---|---|---|---|---|
| 0000510140 | 7500 | E903 | 0009 | 7E83 | FEE0 | 0374 | 0FE9 | 8E00 |
| 0000510160 | D406 | 267B | 3E83 | DE25 | 7500 | E903 | 0051 | 80A1 |
| 0000510200 | 894B | E246 | 76FF | FFE6 | E476 | 468D | 16E2 | FF50 |
| 0000510220 | F476 | 76FF | FFFC | FA76 | 4E8D | 16E8 | 8D51 | F64E |
| 0000510240 | 5116 | 4E8D | 16DC | 1E51 | 3268 | 684D | 0150 | 36FF |
| 0000510260 | 4AB0 | 36FF | 4AAE | 36FF | 4AB4 | 36FF | 4AB2 | 359A |
| 0000510300 | 00DF | 8300 | 28C4 | 468B | E9E2 | 0009 | 06E9 | A100 |
| 0000510320 | 4B80 | 00E9 | 1F00 | 5F5E | ED83 | 8B02 | 1FE5 | 4D5D |
| 0000510340 | 04CA | 1E00 | 9058 | 5545 | EC8B | 8E1E | 81D8 | 24EC |
| 0000510360 | 5700 | C756 | FA46 | 4D45 | 5E8C | C7FC | F446 | 0000 |
| 0000510400 | C02B | 4689 | 89E6 | E446 | 068E | 7BD2 | 8326 | A93E |
| 0000510420 | 00E0 | 0375 | 1DE9 | FF00 | B436 | FF4A | B236 | 8D4A |
| 0000510440 | DC46 | 5016 | BF9A | 00E0 | 8300 | 08C4 | 003D | 7400 |
| 0000510460 | E903 | 000F | 068E | 7BD4 | 8326 | D53E | 00E0 | 0375 |
| 0000510500 | 3BE9 | 1E00 | 4968 | 8D4D | E846 | 5016 | 468D | 16DC |
| 0000510520 | 8D50 | F646 | 5016 | 6668 | 1E01 | 4E68 | FF4D | B036 |
| 0000510540 | FF4A | AE36 | FF4A | B436 | FF4A | B236 | 9A4A | E108 |
| 0000510560 | 0000 | C483 | 891E | F646 | 5689 | E9F8 | 0008 | C02B |
| 0000510600 | 4689 | 89F8 | F646 | 06C7 | 4B80 | 0000 | 006A | 006A |
| 0000510620 | 006A | EB9A | 00DF | 5E00 | 835F | 02ED | E58B | 5D1F |
| 0000510640 | CB4D | 581E | 4590 | 8B55 | 1EEC | D88E | EC81 | 0000 |
| 0000510660 | 5657 | 80A1 | E94B | 0000 | 5F5E | ED83 | 8B02 | 1FE5 |
| 0000510700 | 4D5D | 00CB | 581E | 4590 | 8B55 | 1EEC | D88E | EC81 |
| 0000510720 | 0024 | 5657 | 46C7 | 71FA | 8C4D | FC5E | 46C7 | 00F4 |
| 0000510740 | 2B00 | 89C0 | E646 | 4689 | 8EE4 | DA06 | 267B | 3E83 |
| 0000510760 | E2BF | 7500 | E903 | 001D | 36FF | 4D80 | 36FF | 4D7E |
| 0000511000 | 468D | 16DC | 9A50 | E2D5 | 0000 | C483 | 3D08 | 0000 |
| 0000511020 | 0374 | 0FE9 | 8E00 | DC06 | 267B | 3E83 | E464 | 7500 |
| 0000511040 | E903 | 003A | 681E | 4D75 | 468D | 16E8 | 8D50 | DC46 |
| 0000511060 | 5016 | 468D | 16F6 | 6A50 | 1E71 | 8A68 | FF4D | 7C36 |
| 0000511100 | FF4D | 7A36 | FF4D | 8036 | FF4D | 7E36 | 9A4D | E31E |
| 0000511120 | 0000 | C483 | 891E | F646 | 5689 | E9F8 | 0008 | C02B |
| 0000511140 | 4689 | 89F8 | F646 | 06C7 | 4D82 | D124 | 1E8C | 4D84 |
| 0000511160 | 82A1 | 8B4D | 8416 | C44D | 821E | 264D | 4789 | 2604 |
| 0000511200 | 5789 | A106 | 4D82 | 168B | 4D84 | 1EC4 | 4D82 | 8926 |
| 0000511220 | 2607 | 5789 | 8E02 | DA06 | 267B | 3E83 | E3A0 | 7500 |
| 0000511240 | E903 | 0009 | 7E83 | FEE0 | 0374 | 0FE9 | 8E00 | DC06 |
| 0000511260 | 267B | 3E83 | E2EB | 7500 | E903 | 0038 | 468D | 16E8 |
| 0000511300 | 8D50 | F646 | 5016 | 468D | 16DC | 1E50 | 8A68 | 6A4D |
| 0000511320 | FF78 | 7C36 | FF4D | 7A36 | FF4D | 8036 | FF4D | 7E36 |
| 0000511340 | 9A4D | D9FD | 0000 | C483 | C71A | E246 | 0000 | 06E9 |
| 0000511360 | E900 | 0003 | 00E9 | 5E00 | 835F | 02ED | E58B | 5D1F |
| 0000511400 | CB4D | 581E | 4590 | 8B55 | 1EEC | D88E | EC81 | 002A |
| 0000511420 | 5657 | 46C7 | 94F6 | 8C4D | F85E | 46C7 | 07F0 | 2B01 |
| 0000511440 | 89C0 | E246 | 4689 | 8EE0 | DA06 | 267B | 3E83 | E576 |
| 0000511460 | 7500 | E903 | 001D | 36FF | 4D80 | 36FF | 4D7E | 468D |
| 0000511500 | 16D6 | 9A50 | E3B6 | 0000 | C483 | 3D08 | 0000 | 0374 |
| 0000511520 | 0FE9 | 8E00 | DC06 | 267B | 3E83 | E5E5 | 7500 | E903 |
| 0000511540 | 003B | 681E | 4D9B | 468D | 16E4 | 8D50 | D646 | 5016 |
| 0000511560 | 468D | 16F2 | 6850 | 0095 | 681E | 4E32 | 36FF | 4D7C |
| 0000511600 | 36FF | 4D7A | 36FF | 4D80 | 36FF | 4D7E | FE9A | 00E3 |
| 0000511620 | 8300 | 1EC4 | 4689 | 89F2 | F456 | 08E9 | 2B00 | 89C0 |
| 0000511640 | F446 | 4689 | A1F2 | 4D84 | 060B | 4D82 | 0374 | 05E9 |
| 0000511660 | 9A00 | E374 | D9AA | 7E83 | 000A | 037C | DDE9 | 8E00 |
| 0000511700 | DA06 | 267B | 3E83 | E5CD | 7500 | E903 | 0048 | 7E83 |
| 0000511720 | FEDA | 0375 | 3FE9 | FF00 | 0A76 | 681E | 4DA2 | 468D |
| 0000511740 | 16E4 | 8D50 | F246 | 5016 | 468D | 16D6 | 1E50 | 3268 |
| 0000511760 | 684E | 009D | 36FF | 4D7C | 36FF | 4D7A | 36FF | 4D80 |
| 0000512000 | 36FF | 4D7E | 681E | 4DB4 | 9F68 | 68E6 | E6A2 | A59A |

THU MAR 14 17:52:34 1991 TSLINT.DLL PAGE 180, LINE 10562

| | | | | | | | | |
|---|---|---|---|---|---|---|---|---|
| 0000512020 | 00E6 | 8300 | 28C4 | 068E | 7BDA | 8326 | 5C3E | 00E6 |
| 0000512040 | 0375 | 09E9 | 8300 | DA7E | 74FE | E903 | 000F | 068E |
| 0000512060 | 7BDC | 8326 | CB3E | 00E6 | 0375 | 56E9 | 2B00 | 89C0 |
| 0000512100 | DE46 | 4689 | FFDC | E276 | 76FF | 8DE0 | DC46 | 5016 |
| 0000512120 | 76FF | FFF0 | F876 | 76FF | 8DF6 | E44E | 5116 | 4E8D |
| 0000512140 | 16F2 | 8D51 | D64E | 5116 | 681E | 4E32 | 9E68 | FF00 |
| 0000512160 | 7C36 | FF4D | 7A36 | FF4D | 8036 | FF4D | 7E36 | 9A4D |
| 0000512200 | E716 | 0000 | C483 | 8B28 | DC46 | 568B | E9DE | 03AE |
| 0000512220 | 09E9 | B800 | 0000 | 00BA | E900 | 03A2 | 7E83 | 0006 |
| 0000512240 | 0376 | DDE9 | 8E00 | DA06 | 267B | 3E83 | E6B3 | 7500 |
| 0000512260 | E903 | 0048 | 7E83 | FEDA | 0375 | 3FE9 | FF00 | 0676 |
| 0000512300 | 681E | 4DBA | 468D | 16E4 | 8D50 | F246 | 5016 | 468D |
| 0000512320 | 16D6 | 1E50 | 3268 | 684E | 00A1 | 36FF | 4D7C | 36FF |
| 0000512340 | 4D7A | 36FF | 4D80 | 36FF | 4D7E | 681E | 4DCC | 8568 |
| 0000512360 | 68E7 | E788 | 8B9A | 00E7 | 8300 | 28C4 | 068E | 7BDA |
| 0000512400 | 8326 | 393E | 00E7 | 0375 | 09E9 | 8300 | DA7E | 74FE |
| 0000512420 | E903 | 000F | 068E | 7BDC | 8326 | 213E | 00E8 | 0375 |
| 0000512440 | 56E9 | 2B00 | 89C0 | DE46 | 4689 | FFDC | E276 | 76FF |
| 0000512460 | 8DE0 | DC46 | 5016 | 76FF | FFF0 | F876 | 76FF | 8DF6 |
| 0000512500 | E44E | 5116 | 4E8D | 16F2 | 8D51 | D64E | 5116 | 681E |
| 0000512520 | 4E32 | A268 | FF00 | 7C36 | FF4D | 7A36 | FF4D | 8036 |
| 0000512540 | FF4D | 7E36 | 9A4D | E86C | 0000 | C483 | 8B28 | DC46 |
| 0000512560 | 568B | E9DE | 02C8 | 09E9 | B800 | 0000 | 00BA | E900 |
| 0000512600 | 02BC | 068E | 7BDA | 8326 | B53E | 00E7 | 0375 | 51E9 |
| 0000512620 | 8300 | DA7E | 75FE | E903 | 0048 | 76FF | 8A0A | 0846 |
| 0000512640 | E42A | FF50 | 0676 | 681E | 4DD2 | 468D | 16E4 | 8D50 |
| 0000512660 | F246 | 5016 | 468D | 16D6 | 1E50 | 3268 | 684E | 00A6 |
| 0000512700 | 36FF | 4D7C | 36FF | 4D7A | 36FF | 4D80 | 36FF | 4D7E |
| 0000512720 | 681E | 4E02 | F568 | 68E7 | E7F8 | FB9A | 00E7 | 8300 |
| 0000512740 | 2CC4 | 468B | D506 | 0010 | 9A50 | 4DB0 | DBC3 | C483 |
| 0000512760 | 8902 | FA46 | 5689 | 0BFC | 74D0 | E903 | 00DA | 068E |
| 0000513000 | 7BDA | 8326 | 093E | 00E8 | 0375 | 45E9 | 8300 | DA7E |
| 0000513020 | 75FE | E903 | 003C | 681E | 4E08 | 468D | 16E4 | 8D50 |
| 0000513040 | F246 | 5016 | 468D | 16D6 | 1E50 | 3268 | 684E | 00A9 |
| 0000513060 | 36FF | 4D7C | 36FF | 4D7A | 36FF | 4D80 | 36FF | 4D7E |
| 0000513100 | 681E | 4E22 | 7168 | 68E1 | E174 | 779A | 00E1 | 8300 |
| 0000513120 | 26C4 | 068E | 7BDA | 8326 | 4C3E | 00E4 | 0375 | 09E9 |
| 0000513140 | 8300 | DA7E | 74FE | E903 | 000F | 068E | 7BDC | 8326 |
| 0000513160 | CC3E | 00E3 | 0375 | 56E9 | 2B00 | 89C0 | DE46 | 4689 |
| 0000513200 | FFDC | E276 | 76FF | 8DE0 | DC46 | 5016 | 76FF | FFF0 |
| 0000513220 | F876 | 76FF | 8DF6 | E44E | 5116 | 4E8D | 16F2 | 8D51 |
| 0000513240 | D64E | 5116 | 681E | 4E32 | AA68 | FF00 | 7C36 | FF4D |
| 0000513260 | 7A36 | FF4D | 8036 | FF4D | 7E36 | 9A4D | E1E5 | 0000 |
| 0000513300 | C483 | 8B28 | DC46 | 568B | E9DE | 0172 | 09E9 | B800 |
| 0000513320 | 0000 | 00BA | E900 | 0166 | 5EC4 | 26FA | 47C6 | 070E |
| 0000513340 | 468B | C406 | FA5E | 8926 | 0847 | 468A | C408 | FA5E |
| 0000513360 | 8826 | 0A47 | 468B | C40A | FA5E | 8926 | 0C47 | 1EC4 |
| 0000513400 | 4D82 | 8B26 | 0447 | 8B26 | 0657 | 5EC4 | 26FA | 4789 |
| 0000513420 | 2604 | 5789 | A106 | 4D82 | 168B | 4D84 | 5EC4 | 26FA |
| 0000513440 | 0789 | 8926 | 0257 | 468B | 8BFA | FC56 | 5EC4 | 26FA |
| 0000513460 | 5FC4 | 2604 | 0789 | 8926 | 0257 | 468B | 8BFA | FC56 |
| 0000513500 | 1EC4 | 4D82 | 8926 | 0447 | 8926 | 0657 | 463B | 2B06 |
| 0000513520 | 01D2 | 8606 | 114D | 8816 | 8E4D | DA06 | 267B | 3E83 |
| 0000513540 | E965 | 7500 | E903 | 0046 | 7E83 | FEDA | 0375 | 3DE9 |
| 0000513560 | FF00 | 8836 | FF4D | 8636 | 1E4D | 2A68 | 8D4E | E446 |
| 0000513600 | 5016 | 468D | 16F2 | 8D50 | D646 | 5016 | 681E | 4E32 |
| 0000513620 | B668 | FF00 | 7C36 | FF4D | 7A36 | FF4D | 8036 | FF4D |
| 0000513640 | 7E36 | 684D | 010A | F19A | 0090 | 8300 | 24C4 | 068E |
| 0000513660 | 7BDA | 8326 | DE3E | 00E4 | 0375 | 09E9 | 8300 | DA7E |

THU MAR 14 17:52:34 1991 TSLINT.DLL PAGE 181, LINE 10621

| | | | | | | | | |
|---|---|---|---|---|---|---|---|---|
| 0000513700 | 74FE | E903 | 000F | 068E | 7BDC | 8326 | 0A3E | 00E5 |
| 0000513720 | 0375 | 5DE9 | 8B00 | FA46 | 568B | 05FC | 0010 | 4689 |
| 0000513740 | 89DC | DE56 | 76FF | FFE2 | E076 | 468D | 16DC | FF50 |
| 0000513760 | F076 | 76FF | FFF8 | F676 | 4E8D | 16E4 | 8D51 | F24E |
| 0000514000 | 5116 | 4E8D | 15D6 | 1E51 | 3268 | 684E | 00B8 | 36FF |
| 0000514020 | 4D7C | 36FF | 4D7A | 36FF | 4D80 | 36FF | 4D7E | 309A |
| 0000514040 | 00E6 | 8300 | 28C4 | 468B | 8BDC | DE56 | 0FE9 | E900 |
| 0000514060 | 000C | 468B | 8BFA | FC56 | 1005 | E900 | 0000 | 5F5E |
| 0000514100 | ED83 | 8B02 | 1FE5 | 4D5D | 1ECB | 9058 | 5545 | EC8B |
| 0000514120 | 8E1E | 81D8 | 2CEC | 5700 | C756 | FA46 | 4E3B | 5E8C |
| 0000514140 | C7FC | F046 | 0107 | C02B | 4689 | 89E0 | DE46 | 068E |
| 0000514160 | 7BDA | 8326 | BD3E | 00EA | 0375 | 1DE9 | FF00 | 8036 |
| 0000514200 | FF4D | 7E36 | 8D4D | D446 | 5016 | F49A | 00E4 | 8300 |
| 0000514220 | 08C4 | 003D | 7400 | E903 | 000F | 068E | 7BDC | 8326 |
| 0000514240 | 2C3E | 00EB | 0375 | 3BE9 | 1E00 | 4268 | 8D4E | E246 |
| 0000514260 | 5016 | 468D | 16D4 | 8D50 | F246 | 5016 | D968 | 1E00 |
| 0000514300 | 0268 | FF4F | 7C36 | FF4D | 7A36 | FF4D | 8036 | FF4D |
| 0000514320 | 7E36 | 9A4D | E53D | 0000 | C483 | 891E | F246 | 5689 |
| 0000514340 | E9F4 | 0008 | C02B | 4689 | 89F4 | F246 | 84A1 | 0B4D |
| 0000514360 | 8206 | 744D | E903 | 0005 | 749A | D2E3 | 83EB | 0E7E |
| 0000514400 | 7C00 | E903 | 00DD | 068E | 7BDA | 8326 | 143E | 00EB |
| 0000514420 | 0375 | 48E9 | 8300 | D87E | 75FE | E903 | 003F | 76FF |
| 0000514440 | 1E0E | 4968 | 8D4E | E246 | 5016 | 468D | 16F2 | 8D50 |
| 0000514460 | D446 | 5016 | 681E | 4F02 | E268 | FF00 | 7C36 | FF4D |
| 0000514500 | 7A36 | FF4D | 8036 | FF4D | 7E36 | 1E4D | 5B68 | 684E |
| 0000514520 | ECA9 | AC68 | 9AEC | ECAF | 0000 | C483 | 8E28 | DA06 |
| 0000514540 | 267B | 3E83 | EBA5 | 7500 | E903 | 0009 | 7E83 | FED8 |
| 0000514560 | 0374 | 0FE9 | 8E00 | DC06 | 267B | 3E83 | EBBD | 7500 |
| 0000514600 | E903 | 0056 | C02B | 4689 | 89DC | DA46 | 76FF | FFE0 |
| 0000514620 | DE76 | 468D | 16DA | FF50 | F076 | 76FF | FFFC | FA76 |
| 0000514640 | 4E8D | 16E2 | 8D51 | F24E | 5116 | 4E8D | 16D4 | 1E51 |
| 0000514660 | 0268 | 684F | 00E3 | 36FF | 4D7C | 36FF | 4D7A | 36FF |
| 0000514700 | 4D80 | 36FF | 4D7E | 189A | 00EC | 8300 | 28C4 | 468B |
| 0000514720 | 8BDA | DC56 | 5CE9 | E904 | 0009 | 00B8 | BA00 | 0000 |
| 0000514740 | 50E9 | 8B04 | 0846 | 460B | 7406 | E903 | 00A2 | 068E |
| 0000514760 | 7BDA | 8326 | 633E | 00EC | 0375 | 09E9 | 8300 | D87E |
| 0000515000 | 74FE | E903 | 000F | 068E | 7BDC | 8326 | D53E | 00EC |
| 0000515020 | 0375 | 66E9 | FF00 | 0E76 | 468A | 500C | 76FF | 9A0A |
| 0000515040 | E4B2 | EC38 | C483 | 8906 | DA46 | 5689 | FFDC | E076 |
| 0000515060 | 76FF | 8DDE | DA46 | 5016 | 76FF | FFF0 | FC76 | 76FF |
| 0000515100 | 8DFA | E24E | 5116 | 4E8D | 16F2 | 8D51 | D44E | 5116 |
| 0000515120 | 681E | 4F02 | E768 | FF00 | 7C36 | FF4D | 7A36 | FF4D |
| 0000515140 | 8036 | FF4D | 7E36 | 9A4D | ED20 | 0000 | C483 | 8B28 |
| 0000515160 | DA46 | 568B | E9DC | 03BB | 15E9 | FF00 | 0E76 | 468A |
| 0000515200 | 500C | 76FF | 9A0A | E4B2 | E564 | C483 | E906 | 03A3 |
| 0000515220 | 468B | 8B06 | 0856 | 102D | 8900 | F646 | 5689 | C4F8 |
| 0000515240 | F65E | 8026 | 0E7F | 7507 | E903 | 00E0 | 068E | 7BDA |
| 0000515260 | 8326 | BD3E | 00EC | 0375 | 4BE9 | 8300 | D87E | 75FE |
| 0000515300 | E903 | 0042 | 76FF | FF08 | 0676 | 681E | 4E61 | 468D |
| 0000515320 | 16E2 | 8D50 | F246 | 5016 | 468D | 16D4 | 1E50 | 0268 |
| 0000515340 | 684F | 00ED | 36FF | 4D7C | 36FF | 4D7A | 36FF | 4D80 |
| 0000515360 | 36FF | 4D7E | 681E | 4E86 | 9F68 | 68ED | EDA2 | A59A |
| 0000515400 | 00ED | 8300 | 2AC4 | 068E | 7BDA | 8326 | 4D3E | 00ED |
| 0000515420 | 0375 | 09E9 | 8300 | D87E | 74FE | E903 | 000F | 068E |
| 0000515440 | 7BDC | 8326 | 7D3E | 00E9 | 0375 | 56E9 | 2B00 | 89C0 |
| 0000515460 | DC46 | 4689 | FFDA | E076 | 76FF | 8DDE | DA46 | 5016 |
| 0000515500 | 76FF | FFF0 | FC76 | 76FF | 8DFA | E24E | 5116 | 4E8D |
| 0000515520 | 16F2 | 8D51 | D44E | 5116 | 681E | 4F02 | EE68 | FF00 |
| 0000515540 | 7C36 | FF4D | 7A36 | FF4D | 8036 | FF4D | 7E36 | 9A4D |

THU MAR 14 17:52:34 1991 TSLINT.DLL PAGE 182, LINE 10680

| | | | | | | | | |
|---|---|---|---|---|---|---|---|---|
| 0000515560 | E9CF | 0000 | C483 | 8B28 | DA46 | 568B | E9DC | 02B3 |
| 0000515600 | 09E9 | B800 | 0000 | 00BA | E900 | 02A7 | 5EC4 | 26F6 |
| 0000515620 | 478B | 8908 | EE46 | 068E | 7BDA | 8326 | 103E | 00E9 |
| 0000515640 | 0375 | 57E9 | 8300 | D87E | 75FE | E903 | 004E | 468A |
| 0000515660 | 2A0C | 50E4 | 76FF | FF0A | EE76 | 76FF | FF08 | 0675 |
| 0000515700 | 681E | 4E8E | 468D | 16E2 | 8D50 | F246 | 5016 | 468D |
| 0000515720 | 16D4 | 1E50 | 0268 | 684F | 00F3 | 36FF | 4D7C | 36FF |
| 0000515740 | 4D7A | 36FF | 4D80 | 36FF | 4D7E | 681E | 4EC5 | B968 |
| 0000515760 | 68E5 | E5BC | BF9A | 00E5 | 8300 | 30C4 | 468B | 050A |
| 0000516000 | 0010 | FF50 | F876 | 76FF | 9AF6 | 5BA4 | E79C | C483 |
| 0000516020 | 8906 | F646 | 5689 | 0BF8 | 74D0 | E903 | 00DA | 068E |
| 0000516040 | 7BDA | 8326 | 293E | 00EE | 0375 | 45E9 | 8300 | D87E |
| 0000516060 | 75FE | E903 | 003C | 681E | 4ECB | 468D | 16E2 | 8D50 |
| 0000516100 | F246 | 5016 | 468D | 16D4 | 1E50 | 0268 | 684F | 00F6 |
| 0000516120 | 36FF | 4D7C | 36FF | 4D7A | 36FF | 4D80 | 36FF | 4D7E |
| 0000516140 | 681E | 4EF2 | 0068 | 68EB | EB03 | 069A | 00EB | 8300 |
| 0000516160 | 26C4 | 068E | 7BDA | 8326 | 253E | 00EA | 0375 | 09E9 |
| 0000516200 | 8300 | D87E | 74FE | E903 | 000F | 068E | 7BDC | 8326 |
| 0000516220 | 513E | 00EA | 0375 | 56E9 | 2B00 | 89C0 | DC46 | 4689 |
| 0000516240 | FFDA | E076 | 76FF | 8DDE | DA46 | 5016 | 76FF | FFF0 |
| 0000516260 | FC76 | 76FF | 8DFA | E24E | 5116 | 4E8D | 16F2 | 8D51 |
| 0000516300 | D44E | 5116 | 681E | 4F02 | F768 | FF00 | 7C36 | FF4D |
| 0000516320 | 7A36 | FF4D | 8036 | FF4D | 7E36 | 9A4D | EB77 | 0000 |
| 0000516340 | C483 | 8B28 | DA46 | 568B | E9DC | 0147 | 09E9 | B800 |
| 0000516360 | 0000 | 00BA | E900 | 013B | 468B | 8BF6 | F856 | 5EC4 |
| 0000516400 | 26F6 | 1FC4 | 8926 | 0447 | 8926 | 0657 | 468B | 8BF6 |
| 0000516420 | F856 | 5EC4 | 26F6 | 5FC4 | 2604 | 0789 | 8926 | 0257 |
| 0000516440 | 468A | C40C | F65E | 8B26 | 0A47 | 468B | C40E | F65E |
| 0000516460 | 8926 | 0C47 | 468B | C40A | F65E | 8926 | 0847 | 468B |
| 0000516500 | 2B0A | EE46 | D22B | 0601 | 4D86 | 1611 | 4D88 | 068E |
| 0000516520 | 7BDA | 8326 | 5A3E | 00EF | 0375 | 46E9 | 8300 | D87E |
| 0000516540 | 75FE | E903 | 003D | 36FF | 4D88 | 36FF | 4D86 | 681E |
| 0000516560 | 4EFA | 468D | 16E2 | 8D50 | F246 | 5016 | 468D | 16D4 |
| 0000516600 | 1E50 | 0268 | 684F | 0103 | 36FF | 4D7C | 36FF | 4D7A |
| 0000516620 | 36FF | 4D80 | 36FF | 4D7E | 0A68 | 9A01 | E957 | 0000 |
| 0000516640 | C483 | 8E24 | DA06 | 267B | 3E83 | EDD5 | 7500 | E903 |
| 0000516660 | 0009 | 7E83 | FED8 | 0374 | 0FE9 | 8E00 | DC06 | 267B |
| 0000516700 | 3E83 | EE41 | 7500 | E903 | 005D | 468B | 8BF6 | F856 |
| 0000516720 | 1005 | 8900 | DA46 | 5689 | FFDC | E076 | 76FF | 8DDE |
| 0000516740 | DA46 | 5016 | 76FF | FFF0 | FC76 | 76FF | 8DFA | E24E |
| 0000516760 | 5116 | 4E8D | 16F2 | 8D51 | D44E | 5116 | 681E | 4F02 |
| 0000517000 | 0668 | FF01 | 7C36 | FF4D | 7A36 | FF4D | 8036 | FF4D |
| 0000517020 | 7E36 | 9A4D | EE8C | 0000 | C483 | 8B28 | DA46 | 568B |
| 0000517040 | E9DC | 000F | 0CE9 | 8B00 | F646 | 568B | 05F8 | 0010 |
| 0000517060 | 00E9 | 5E00 | 835F | 02ED | E58B | 5D1F | CB4D | 581E |
| 0000517100 | 4590 | 8B55 | 1EEC | D88E | EC81 | 002A | 5657 | 46C7 |
| 0000517120 | 0DFA | 8C4F | FC5E | 46C7 | 00F0 | 2B00 | 89C0 | E046 |
| 0000517140 | 4689 | 8EDE | DA06 | 267B | 3E83 | F0A3 | 7500 | E903 |
| 0000517160 | 001D | 36FF | 4D80 | 36FF | 4D7E | 468D | 16D6 | 9A50 |
| 0000517200 | EA3B | 0000 | C483 | 3D08 | 0000 | 0374 | 0FE9 | 8E00 |
| 0000517220 | DC06 | 267B | 3E83 | F10F | 7500 | E903 | 003B | 681E |
| 0000517240 | 4F11 | 468D | 16E4 | 8D50 | D646 | 5016 | 468D | 16F2 |
| 0000517260 | 6850 | 0122 | 681E | 4FCA | 36FF | 4D7C | 36FF | 4D7A |
| 0000517300 | 36FF | 4D80 | 36FF | 4D7E | 849A | 00EA | 8300 | 1EC4 |
| 0000517320 | 4689 | 89F2 | F456 | 08E9 | 2B00 | 89C0 | F446 | 4689 |
| 0000517340 | 8BF2 | 0846 | 460B | 7406 | E903 | 00B7 | 068E | 7BDA |
| 0000517360 | 8326 | F73E | 00F0 | 0375 | 45E9 | 8300 | DA7E | 75FE |
| 0000517400 | E903 | 003C | 681E | 4F15 | 468D | 16E4 | 8D50 | F246 |
| 0000517420 | 5016 | 468D | 16D6 | 1E50 | CA68 | 684F | 0127 | 36FF |

THU MAR 14 17:52:34 1991 TSLINT.DLL PAGE 183, LINE 10739

| | | | | | | | | |
|---|---|---|---|---|---|---|---|---|
| 0000517440 | 4D7C | 36FF | 4D7A | 36FF | 4D80 | 36FF | 4D7E | 681E |
| 0000517460 | 4F2C | A068 | 68F1 | F1A3 | A69A | 00F1 | 8300 | 26C4 |
| 0000517500 | 068E | 7BDA | 8326 | 5A3E | 00F1 | 0375 | 09E9 | 8300 |
| 0000517520 | DA7E | 74FE | E903 | 000F | 068E | 7BDC | 8326 | 423E |
| 0000517540 | 00F2 | 0375 | 39E9 | 8D00 | E446 | 5016 | 468D | 16F2 |
| 0000517560 | 8D50 | D646 | 5016 | 681E | 4FCA | 2868 | FF01 | 7C36 |
| 0000517600 | FF4D | 7A36 | FF4D | 8036 | FF4D | 7E36 | 9A4D | F271 |
| 0000517620 | 0000 | C483 | C71A | DC46 | 0000 | C3E9 | E903 | 0003 |
| 0000517640 | BDE9 | 8E03 | DA06 | 267B | 3E83 | FID0 | 7500 | E903 |
| 0000517660 | 004B | 7E83 | FEDA | 0375 | 42E9 | FF00 | 0876 | 76FF |
| 0000517700 | 1E06 | 3468 | 8D4F | E446 | 5016 | 468D | 16F2 | 8D50 |
| 0000517720 | D646 | 5016 | 681E | 4FCA | 2B68 | FF01 | 7C36 | FF4D |
| 0000517740 | 7A36 | FF4D | 8036 | FF4D | 7E36 | 1E4D | 4568 | 684F |
| 0000517760 | F216 | 1968 | 9AF2 | F21C | 0000 | C483 | 8B2A | 0646 |
| 0000520000 | 568B | 2D08 | 0010 | 4689 | 89F6 | F856 | 5EC4 | 26F6 |
| 0000520020 | 7F80 | 070E | 0375 | BDE9 | 8E00 | DA06 | 267B | 3E83 |
| 0000520040 | F22A | 7500 | E903 | 004B | 7E83 | FEDA | 0375 | 42E9 |
| 0000520060 | FF00 | 0876 | 76FF | 1E06 | 4B68 | 8D4F | E446 | 5016 |
| 0000520100 | 468D | 16F2 | 8D50 | D646 | 5016 | 681E | 4FCA | 3068 |
| 0000520120 | FF01 | 7C36 | FF4D | 7A36 | FF4D | 8036 | FF4D | 7E36 |
| 0000520140 | 1E4D | 6D68 | 684F | F2ED | F068 | 9AF2 | F2F3 | 0000 |
| 0000520160 | C483 | 8E2A | DA06 | 267B | 3E83 | F2A7 | 7500 | E903 |
| 0000520200 | 0009 | 7E83 | FEDA | 0374 | 0FE9 | 8E00 | DC06 | 267B |
| 0000520220 | 3E83 | F319 | 7500 | E903 | 0039 | 468D | 16E4 | 8D50 |
| 0000520240 | F246 | 5016 | 468D | 16D6 | 1E50 | CA68 | 684F | 0131 |
| 0000520260 | 36FF | 4D7C | 36FF | 4D7A | 36FF | 4D80 | 36FF | 4D7E |
| 0000520300 | 489A | 00F3 | 8300 | 1AC4 | 46C7 | 00DC | E900 | 0290 |
| 0000520320 | 03E9 | E900 | 028A | 5EC4 | 26F6 | 7F83 | 0008 | 0375 |
| 0000520340 | 0DE9 | C400 | F65E | 8326 | 0C7F | 74FF | E903 | 00BD |
| 0000520360 | 068E | 7BDA | 8326 | 013E | 00F3 | 0375 | 4BE9 | 8300 |
| 0000520400 | DA7E | 75FE | E903 | 0042 | 76FF | FF08 | 0676 | 681E |
| 0000520420 | 4F73 | 468D | 15E4 | 8D50 | F246 | 5016 | 468D | 16D6 |
| 0000520440 | 1E50 | CA68 | 684F | 0134 | 36FF | 4D7C | 36FF | 4D7A |
| 0000520460 | 36FF | 4D80 | 36FF | 4D7E | 681E | 4F9F | AA68 | 68F3 |
| 0000520500 | F3AD | 1B9A | 00EE | 8300 | 2AC4 | 068E | 7BDA | 8326 |
| 0000520520 | 6E3E | 00F3 | 0375 | 09E9 | 8300 | DA7E | 74FE | E903 |
| 0000520540 | 000F | 068E | 7BDC | 8326 | 723E | 00EF | 0375 | 39E9 |
| 0000520560 | 8D00 | E446 | 5016 | 468D | 16F2 | 8D50 | D646 | 5016 |
| 0000520600 | 681E | 4FCA | 3568 | FF01 | 7C36 | FF4D | 7A36 | FF4D |
| 0000520620 | 8036 | FF4D | 7E36 | 9A4D | E492 | 0000 | C483 | C71A |
| 0000520640 | DC46 | 0000 | B9E9 | E901 | 0003 | B3E9 | C401 | F65E |
| 0000520660 | 8B26 | 0847 | 4689 | 8EE2 | DA06 | 267B | 3E83 | EF05 |
| 0000520700 | 7500 | E903 | 0068 | 7E83 | FEDA | 0375 | 5FE9 | 8D00 |
| 0000520720 | E446 | 5016 | 468D | 16F2 | 8D50 | D646 | 5016 | 681E |
| 0000520740 | 4FCA | 3D68 | FF01 | 7C36 | FF4D | 7A36 | FF4D | 8036 |
| 0000520760 | FF4D | 7E36 | 1E4D | A568 | 684F | EE15 | 1868 | 9AEE |
| 0000521000 | 96D6 | 0000 | C483 | 3D22 | 0000 | 0375 | 1FE9 | 1E00 |
| 0000521020 | AF68 | 9A4F | FFFF | 0000 | C483 | FF04 | E276 | 006A |
| 0000521040 | 76FF | FF08 | 0676 | 8C9A | 4666 | 83F4 | 08C4 | 5EC4 |
| 0000521060 | 26F6 | 478B | 2604 | 578B | C406 | F65E | C426 | 261F |
| 0000521100 | 4789 | 2604 | 5789 | A106 | 4D82 | 168B | 4D84 | 5EC4 |
| 0000521120 | 26F6 | 4739 | 7404 | E903 | 0009 | 3926 | 0657 | 0375 |
| 0000521140 | 18E9 | C400 | F65E | 8B26 | 2607 | 578B | C402 | F65E |
| 0000521160 | C426 | 045F | 8926 | 2607 | 5789 | C402 | F65E | C726 |
| 0000521200 | 0847 | 0000 | 5EC4 | 26F6 | 47C7 | FF0C | FFFF | F876 |
| 0000521220 | 76FF | 9AF6 | 4DBA | EDBC | C483 | 8B04 | E246 | D22B |
| 0000521240 | 0629 | 4D86 | 1619 | 4D88 | 068E | 7BDA | 8326 | B43E |
| 0000521260 | 00F4 | 0375 | 46E9 | 8300 | DA7E | 75FE | E903 | 003D |
| 0000521300 | 36FF | 4D88 | 36FF | 4D86 | 681E | 4FC2 | 468D | 16E4 |

THU MAR 14 17:52:34 1991 TSLINT.DLL PAGE 184, LINE 10798

| | | | | | | | | |
|---|---|---|---|---|---|---|---|---|
| 0000521320 | 8D50 | F246 | 5016 | 468D | 16D6 | 1E50 | CA68 | 684F |
| 0000521340 | 0148 | 36FF | 4D7C | 36FF | 4D7A | 36FF | 4D80 | 36FF |
| 0000521360 | 4D7E | 0A68 | 9A01 | EF4C | 0000 | C483 | 8E24 | DA06 |
| 0000521400 | 267B | 3E83 | F01A | 7500 | E903 | 0009 | 7E83 | FEDA |
| 0000521420 | 0374 | 0FE9 | 8E00 | DC06 | 267B | 3E83 | F046 | 7500 |
| 0000521440 | E903 | 0039 | 468D | 16E4 | 8D50 | F246 | 5016 | 468D |
| 0000521460 | 16D6 | 1E50 | CA68 | 684F | 014B | 36FF | 4D7C | 36FF |
| 0000521500 | 4D7A | 36FF | 4D80 | 36FF | 4D7E | 3E9A | 00F1 | 8300 |
| 0000521520 | 1AC4 | 46C7 | 00DC | E900 | 0006 | 03E9 | E900 | 0000 |
| 0000521540 | 5F5E | ED83 | 8B02 | 1FE5 | 4D5D | 1ECB | 9058 | 5545 |
| 0000521560 | EC8B | 8E1E | 81D8 | 2CEC | 5700 | C756 | F646 | 4FD2 |
| 0000521600 | 5E8C | C7F8 | EC46 | 0000 | C02B | 4689 | 89DE | DC46 |
| 0000521620 | 068E | 7BDA | 8326 | C53E | 00F5 | 0375 | 1DE9 | FF00 |
| 0000521640 | 8036 | FF4D | 7E36 | 8D4D | D446 | 5016 | 309A | 00F0 |
| 0000521660 | 8300 | 08C4 | 003D | 7400 | E903 | 000F | 068E | 7BDC |
| 0000521700 | 8326 | 9A3E | 00F6 | 0375 | 3BE9 | 1E00 | D668 | 8D4F |
| 0000521720 | E046 | 5016 | 468D | 16D4 | 8D50 | EE46 | 5016 | 6668 |
| 0000521740 | 1E01 | 2268 | FF50 | 7C36 | FF4D | 7A36 | FF4D | 8036 |
| 0000521760 | FF4D | 7E36 | 9A4D | F079 | 0000 | C483 | 891E | EE46 |
| 0000522000 | 5689 | E9F0 | 0008 | C02B | 4689 | 89F0 | EE46 | 068E |
| 0000522020 | 7BDA | 8326 | 2E3E | 00F6 | 0375 | 4EE9 | 8300 | D87E |
| 0000522040 | 75FE | E903 | 0045 | 76FF | 8A08 | 0646 | E42A | 1E50 |
| 0000522060 | DA68 | 8D4F | ED46 | 5016 | 468D | 16EE | 8D50 | D446 |
| 0000522100 | 5016 | 681E | 5022 | 6A68 | FF01 | 7C36 | FF4D | 7A36 |
| 0000522120 | FF4D | 8036 | FF4D | 7E36 | 1E4D | 0668 | 6850 | F66E |
| 0000522140 | 7168 | 9AF6 | F674 | 0000 | C483 | A12A | 4D84 | 060B |
| 0000522160 | 4D82 | 0374 | B7E9 | 8E00 | DA06 | 267B | 3E83 | F682 |
| 0000522200 | 7500 | E903 | 0045 | 7E83 | FED8 | 0375 | 3CE9 | 1E00 |
| 0000522220 | 0C68 | 8D50 | E046 | 5016 | 468D | 16EE | 8D50 | D446 |
| 0000522240 | 5016 | 681E | 5022 | 6D68 | FF01 | 7C36 | FF4D | 7A36 |
| 0000522260 | FF4D | 8036 | FF4D | 7E36 | 1E4D | 1C68 | 6850 | F0E3 |
| 0000522300 | E668 | 9AF0 | F0E9 | 0000 | C483 | 8E26 | DA06 | 267B |
| 0000522320 | 3E83 | F77D | 7500 | E903 | 0009 | 7E83 | FED8 | 0374 |
| 0000522340 | 0FE9 | 8E00 | DC06 | 267B | 3E83 | F795 | 7500 | E903 |
| 0000522360 | 0039 | 468D | 16E0 | 8D50 | EE46 | 5016 | 468D | 16D4 |
| 0000522400 | 1E50 | 2268 | 6850 | D16E | 36FF | 4D7C | 36FF | 4D7A |
| 0000522420 | 36FF | 4D80 | 36FF | 4D7E | C49A | 00F7 | 8300 | 1AC4 |
| 0000522440 | 46C7 | 00DA | E900 | D101 | 03E9 | E900 | 00FB | 1EC4 |
| 0000522460 | 4D82 | 8B26 | 0447 | 8B26 | 0657 | 4689 | 89FA | FC56 |
| 0000522500 | 468B | 8BFA | FC56 | 0639 | 4D82 | 0374 | 09E9 | 3900 |
| 0000522520 | 8416 | 754D | E903 | 006E | 5EC4 | 8AFA | 0646 | 8426 |
| 0000522540 | 0A47 | 0375 | 4BE9 | 8300 | 087E | 75FF | E903 | 000F |
| 0000522560 | 5EC4 | 8BFA | 0846 | 3926 | 0C47 | 0374 | 33E9 | C400 |
| 0000522600 | FA5E | 8B26 | 0447 | 8B26 | 0657 | 4689 | 89F2 | F456 |
| 0000522620 | 468B | 8BFA | FC56 | 1005 | 5200 | 9A50 | EFEE | EAAB |
| 0000522640 | C483 | 8B04 | F246 | 568B | 89F4 | FA46 | 5689 | E9FC |
| 0000522660 | 0011 | 5EC4 | 26FA | 478B | 2604 | 578B | 8906 | FA46 |
| 0000522700 | 5689 | E9FC | FF7A | 068E | 7BDA | 8326 | 5F3E | 00F4 |
| 0000522720 | 0375 | 09E9 | 8300 | D87E | 74FE | E903 | 000F | 068E |
| 0000522740 | 7BDC | 8326 | CC3E | 00F4 | 0375 | 39E9 | 8D00 | E046 |
| 0000522760 | 5016 | 468D | 16EE | 8D50 | D446 | 5016 | 681E | 5022 |
| 0000523000 | 7968 | FF01 | 7C36 | FF4D | 7A36 | FF4D | 8036 | FF4D |
| 0000523020 | 7E36 | 9A4D | F4FB | 0000 | C483 | C71A | DA46 | 0000 |
| 0000523040 | 06E9 | E900 | 0003 | 00E9 | 5E00 | 835F | 02ED | E58B |
| 0000523060 | 5D1F | CB4D | 581E | 4590 | 8B55 | 1EEC | D88E | EC81 |
| 0000523100 | 002A | 5657 | 46C7 | 35FA | 8C50 | FC5E | 46C7 | 0AF4 |
| 0000523120 | 2B01 | 89C0 | E246 | 4689 | 8EE0 | DA06 | 267B | 3E03 |
| 0000523140 | F88E | 7500 | E903 | 001D | 36FF | 4D80 | 36FF | 4D7E |
| 0000523160 | 468D | 16D6 | 9A50 | F55D | 0000 | C483 | 3D08 | 0000 |

THU MAR 14 17:52:34 1991 TSLINT.DLL PAGE 185, LINE 10857

| | | | | | | | | |
|---|---|---|---|---|---|---|---|---|
| 0000523200 | 0374 | 0FE9 | 8E00 | DC06 | 267B | 3E83 | F8A6 | 7500 |
| 0000523220 | E903 | 003B | 681E | 5043 | 468D | 16E8 | 8D50 | D646 |
| 0000523240 | 5016 | 468D | 16F6 | 6850 | 0198 | 681E | 5052 | 36FF |
| 0000523260 | 4D7C | 36FF | 4D7A | 36FF | 4D80 | 36FF | 4D7E | A69A |
| 0000523300 | 00F5 | 8300 | 1EC4 | 4689 | 89F6 | F856 | 08E9 | 2B00 |
| 0000523320 | 89C0 | F846 | 4689 | 8EF6 | DA06 | 267B | 3E83 | F547 |
| 0000523340 | 7500 | E903 | 0009 | 7E83 | FEDA | 0374 | 0FE9 | 8E00 |
| 0000523360 | DC06 | 267B | 3E83 | F573 | 7500 | E903 | 005B | 86A1 |
| 0000523400 | 8B4D | 8816 | 894D | DC46 | 5689 | FFDE | E276 | 76FF |
| 0000523420 | 8DE0 | DC46 | 5016 | 76FF | FFF4 | FC76 | 76FF | 8DFA |
| 0000523440 | E84E | 5116 | 4E8D | 16F6 | 8D51 | D64E | 5116 | 681E |
| 0000523460 | 5052 | 9F68 | FF01 | 7C36 | FF4D | 7A36 | FF4D | 8036 |
| 0000523500 | FF4D | 7E36 | 9A4D | EFC4 | 0000 | C483 | 8B28 | DC46 |
| 0000523520 | 568B | E9DE | 000D | 0AE9 | A100 | 4D86 | 168B | 4D88 |
| 0000523540 | 00E9 | 5E00 | 835F | 02ED | E58B | 5D1F | CB4D | 581E |
| 0000523560 | 4590 | 8B55 | 1EEC | D88E | EC81 | 0028 | 5657 | 46C7 |
| 0000523600 | 5DFA | 8C50 | FC5E | 46C7 | 09F0 | 2B01 | 89C0 | E246 |
| 0000523620 | 4689 | 8EED | DA06 | 267B | 3E83 | F9D3 | 7500 | E903 |
| 0000523640 | 001D | 36FF | 4D80 | 36FF | 4D7E | 468D | 16D8 | 9A50 |
| 0000523660 | F826 | 0000 | C483 | 3D08 | 0000 | 0374 | 0FE9 | 8E00 |
| 0000523700 | DC06 | 267B | 3E83 | F9EB | 7500 | E903 | 003B | 681E |
| 0000523720 | 5064 | 468D | 16E4 | 8D50 | D846 | 5016 | 468D | 16F2 |
| 0000523740 | 6850 | 01B6 | 681E | 506C | 36FF | 4D7C | 36FF | 4D7A |
| 0000523760 | 36FF | 4D80 | 36FF | 4D7E | 6F9A | 00F8 | 8300 | 1EC4 |
| 0000524000 | 4689 | 89F2 | F456 | 08E9 | 2B00 | 89C0 | F446 | 4689 |
| 0000524020 | 8BF2 | 0846 | 460B | 7406 | E903 | 007D | 068E | 7BDA |
| 0000524040 | 8326 | 5F3E | 00FA | 0375 | 09E9 | 8300 | DC7E | 74FE |
| 0000524060 | E903 | 000F | 068E | 7BDC | 8326 | 773E | 00FA | 0375 |
| 0000524100 | 50E9 | C700 | DE46 | 0000 | 76FF | FFE2 | E076 | 468D |
| 0000524120 | 16DE | FF50 | F076 | 76FF | FFFC | FA76 | 4E8D | 16E4 |
| 0000524140 | 8D51 | F24E | 5116 | 4E8D | 16D8 | 1E51 | 6C68 | 6850 |
| 0000524160 | 01BA | 36FF | 4D7C | 36FF | 4D7A | 36FF | 4D80 | 36FF |
| 0000524200 | 4D7E | C49A | 00FA | 8300 | 28C4 | 468B | E9DE | 009E |
| 0000524220 | 06E9 | B800 | 0000 | 95E9 | 8B00 | 0646 | 568B | 2D08 |
| 0000524240 | 0010 | 4689 | 89F6 | F856 | 068E | 7BDA | 8326 | 103E |
| 0000524260 | 00F8 | 0375 | 09E9 | 8300 | DC7E | 74FE | E903 | 000F |
| 0000524300 | 068E | 7BDC | 8326 | 3C3E | 00F8 | 0375 | 55E9 | C400 |
| 0000524320 | F65E | 8B26 | 0847 | 4689 | FFDE | E276 | 76FF | 8DE0 |
| 0000524340 | DE46 | 5016 | 76FF | FFF0 | FC76 | 76FF | 8DFA | E44E |
| 0000524360 | 5116 | 4E8D | 16F2 | 8D51 | D84E | 5116 | 681E | 506C |
| 0000524400 | BE68 | FF01 | 7C36 | FF4D | 7A36 | FF4D | 8036 | FF4D |
| 0000524420 | 7E36 | 9A4D | F8F6 | 0000 | C483 | 8B28 | DE46 | 0DE9 |
| 0000524440 | E900 | 000A | 5EC4 | 26F6 | 478B | E908 | 0000 | 5F5E |
| 0000524460 | ED83 | 8B02 | 1FE5 | 4D5D | 1ECB | 9058 | 5545 | EC8B |
| 0000524500 | 8E1E | 81D8 | 2EEC | 5700 | C756 | F646 | 5074 | 5E8C |
| 0000524520 | C7F8 | F046 | 010A | C02B | 4689 | 89DE | DC46 | 068E |
| 0000524540 | 7BDA | 8326 | 9F3E | 00FB | 0375 | 1DE9 | FF00 | 8036 |
| 0000524560 | FF4D | 7E36 | 8D4D | D246 | 5016 | 609A | 00F9 | 8300 |
| 0000524600 | 08C4 | 003D | 7400 | E903 | 000F | 068E | 7BDC | 8326 |
| 0000524620 | B73E | 00FB | 0375 | 3BE9 | 1E00 | 8268 | 8D50 | E446 |
| 0000524640 | 5016 | 468D | 16D2 | 8D50 | F246 | 5016 | CA68 | 1E01 |
| 0000524660 | 9068 | FF50 | 7C36 | FF4D | 7A36 | FF4D | 8036 | FF4D |
| 0000524700 | 7E36 | 9A4D | F9A9 | 0000 | C483 | 891E | F246 | 5689 |
| 0000524720 | E9F4 | 0008 | C02B | 4689 | 89F4 | F246 | 84A1 | 0B4D |
| 0000524740 | 8206 | 744D | E903 | 0086 | 068E | 7BDA | 8326 | 7D3E |
| 0000524760 | 00FC | 0375 | 09E9 | 8300 | D67E | 74FE | E903 | 000F |
| 0000525000 | 068E | 7BDC | 8326 | 953E | 00FC | 0375 | 56E9 | 2B00 |
| 0000525020 | 89C0 | DA46 | 4689 | FFD8 | DE76 | 76FF | 8DDC | D846 |
| 0000525040 | 5016 | 76FF | FFF0 | F876 | 76FF | 8DF6 | E44E | 5116 |

THU MAR 14 17:52:34 1991 TSLINT.DLL PAGE 186, LINE 10916

| | | | | | | | | |
|---|---|---|---|---|---|---|---|---|
| 0000525060 | 4E8D | 16F2 | 8D51 | D24E | 5116 | 681E | 509D | CF68 |
| 0000525100 | FF01 | 7C36 | FF4D | 7A36 | FF4D | 8036 | FF4D | 7E36 |
| 0000525120 | 9A4D | FCE4 | 0000 | C483 | 8B28 | D846 | 568B | E9DA |
| 0000525140 | 00EE | 09E9 | B800 | 0000 | 00BA | E900 | 00E2 | C02B |
| 0000525160 | 4689 | 89E2 | E046 | 1EC4 | 4D82 | 8B26 | 0447 | 8B26 |
| 0000525200 | 0657 | 4689 | 89FA | FC56 | 11E9 | C400 | FA5E | 8B26 |
| 0000525220 | 0447 | 8B26 | 0657 | 4689 | 89FA | FC56 | 468B | 8BFA |
| 0000525240 | FC56 | 0639 | 4D82 | 0374 | 09E9 | 3900 | 8416 | 754D |
| 0000525260 | E903 | 0012 | 5EC4 | 26FA | 478B | 2B08 | 01D2 | E046 |
| 0000525300 | 5611 | E9E2 | FFC5 | 068E | 7BDA | 8326 | 4A3E | 00F9 |
| 0000525320 | 0375 | 09E9 | 8300 | D67E | 74FE | E903 | 000F | 068E |
| 0000525340 | 7BDC | 8326 | 763E | 00F9 | 0375 | 5AE9 | 8B00 | E046 |
| 0000525360 | 568B | 89E2 | D846 | 5689 | FFDA | DE76 | 76FF | 8DDC |
| 0000525400 | D846 | 5016 | 76FF | FFF0 | F876 | 76FF | 8DF6 | E44E |
| 0000525420 | 5116 | 4E8D | 16F2 | 8D51 | D24E | 5116 | 681E | 5090 |
| 0000525440 | D568 | FF01 | 7C36 | FF4D | 7A36 | FF4D | 8036 | FF4D |
| 0000525460 | 7E36 | 9A4D | FA33 | 0000 | C483 | 8B28 | D846 | 568B |
| 0000525500 | E9DA | 000C | 09E9 | 8B00 | E046 | 568B | E9E2 | 0000 |
| 0000525520 | 5F5E | ED83 | 8B02 | 1FE5 | 4D5D | 45CB | 0300 | C902 |
| 0000525540 | 03F6 | 6A00 | 0300 | 7502 | 03DC | EA00 | 0200 | EE00 |
| 0000525560 | 0196 | 0000 | 0500 | 1502 | 03FB | 2500 | 0300 | FC01 |
| 0000525600 | 0292 | F600 | 0300 | 5A01 | 0228 | F700 | 0200 | 8F00 |
| 0000525620 | 02D3 | 0000 | 0200 | 4E00 | 03F7 | 0000 | 0500 | B500 |
| 0000525640 | 032A | 2C00 | 0292 | D900 | 04F3 | 0000 | 0300 | 1402 |
| 0000525660 | 03F6 | 7900 | 0500 | 4102 | 03FB | 3300 | 0200 | CF00 |
| 0000525700 | 08CA | 0000 | 0300 | B002 | 03F3 | 8800 | 0500 | 1102 |
| 0000525720 | 03F6 | 4100 | 0300 | DA01 | 0198 | 1A00 | 0300 | FA01 |
| 0000525740 | 01A0 | 1B00 | 0200 | 8900 | 09E0 | 0000 | 0300 | 6B01 |
| 0000525760 | 01CA | 2000 | 0300 | 4E01 | 05BE | 0100 | 0300 | A602 |
| 0000526000 | 03F4 | 9600 | 0300 | 9A01 | 05B9 | 0700 | 0300 | 5601 |
| 0000526020 | 06CF | 0100 | 0300 | 6201 | 06CF | 0700 | 0500 | FA02 |
| 0000526040 | 03DB | DC00 | 0300 | 6C01 | 06CD | 0E00 | 0300 | 5101 |
| 0000526060 | 06BC | 0F00 | 0300 | 8501 | 05B9 | 1800 | 0300 | 5501 |
| 0000526100 | 05BE | 1C00 | 0300 | 7F01 | 08AC | 0800 | 0300 | 5F01 |
| 0000526120 | 09BE | 0100 | 0300 | C402 | 03F3 | B100 | 0300 | 0B01 |
| 0000526140 | 052F | 2200 | 0300 | 1A01 | 0293 | 3A00 | 0300 | 4701 |
| 0000526160 | 0228 | 3B00 | 0300 | 2701 | 05BF | 2400 | 0200 | 0E02 |
| 0000526200 | 03F6 | 4100 | 0300 | BB01 | 05BF | 2500 | 0300 | 4301 |
| 0000526220 | 08E3 | 0F00 | 0300 | 4901 | 06BC | 2000 | 0300 | D801 |
| 0000526240 | 07B1 | 1900 | 0300 | 8401 | 06AC | 2200 | 0300 | F202 |
| 0000526260 | 0392 | BC00 | 0300 | 8D01 | 06CA | 2600 | 0300 | 8701 |
| 0000526300 | 07B0 | 1E00 | 0300 | F701 | 06C1 | 2700 | 0300 | 1C01 |
| 0000526320 | 06C2 | 2A00 | 0300 | 9A01 | 06BB | 2D00 | 0300 | EF01 |
| 0000526340 | 06C1 | 3100 | 0300 | 7402 | 03FB | 4B00 | 0300 | 5801 |
| 0000526360 | 06CD | 3300 | 0300 | 2B02 | 03FB | CD00 | 0300 | 0202 |
| 0000526400 | 03FC | 5A00 | 0300 | 5901 | 06AB | 4300 | 0300 | 5501 |
| 0000526420 | 04B7 | 5300 | 0300 | 9501 | 06CC | 4500 | 0500 | 4202 |
| 0000526440 | 03DC | 1700 | 0500 | A606 | 039E | 1700 | 0500 | 3806 |
| 0000526460 | 039E | 1700 | 0500 | C106 | 039D | 1700 | 0500 | CA06 |
| 0000526500 | 03C2 | 1700 | 0500 | 5106 | 03C2 | 1700 | 0500 | DC06 |
| 0000526520 | 03D8 | 1700 | 0500 | 3D06 | 03DC | 1700 | 0300 | F301 |
| 0000526540 | 04B7 | 5800 | 0300 | AE01 | 06BB | 4A00 | 0300 | 6301 |
| 0000526560 | 06CD | 4B00 | 0300 | 7601 | 06CD | 4C00 | 0300 | 4001 |
| 0000526600 | 06CA | 4D00 | 0000 | 0000 | 0000 | 0000 | 0000 | 0000 |
| 0000526620 | 581E | 4590 | 8B55 | 1EEC | D88E | EC81 | 01D0 | 5657 |
| 0000526640 | 46C7 | AAFA | 8C50 | FC5E | 86C7 | FE58 | 0101 | C02B |
| 0000526660 | 8689 | FE48 | 8689 | FE46 | 068E | 7BDE | 8326 | FF3E |
| 0000526700 | 00FF | 0375 | 1EE9 | FF00 | E036 | FF54 | DE36 | 8D54 |
| 0000526720 | 3A86 | 16FE | 9A50 | FFFF | 0000 | C483 | 3D08 | 0000 |

THU MAR 14 17:52:34 1991 TSLINT.DLL PAGE 187, LINE 10975

| | | | | | | | | |
|---|---|---|---|---|---|---|---|---|
| 0000526740 | 0374 | 0FE9 | 8E00 | E006 | 267B | 3E83 | FFFF | 7500 |
| 0000526760 | E903 | 003D | 681E | 50AE | 868D | FE4A | 5016 | 868D |
| 0000527000 | FE3A | 5016 | 468D | 16F2 | 6850 | 04F9 | 681E | 6E70 |
| 0000527020 | 36FF | 54DC | 36FF | 54DA | 36FF | 54E0 | 36FF | 54DE |
| 0000527040 | FF9A | 00FF | 8300 | 1EC4 | 4689 | 89F2 | F456 | 08E9 |
| 0000527060 | 2B00 | 89C0 | F446 | 4689 | C7F2 | F646 | 0000 | 06C7 |
| 0000527100 | 6E6E | FFFF | 06C7 | 6E68 | 0000 | 06C7 | 6E6A | 0000 |
| 0000527120 | 868D | FE5C | 4689 | 8CEE | F056 | 86C7 | FE5A | 0C8E |
| 0000527140 | 86C7 | FE5C | FFFF | 4683 | 02EE | 468B | 8DEE | EE4E |
| 0000527160 | C12B | FE25 | 3DFF | 0000 | 037F | 12E9 | 1E00 | B268 |
| 0000527200 | 9A50 | B522 | FFFF | C483 | B804 | 0001 | BFE9 | 8B2A |
| 0000527220 | F646 | 5EC4 | 26EE | 0789 | 8683 | FE5A | B808 | 00D4 |
| 0000527240 | BE1E | 0AA8 | D88E | BEC4 | FE5A | A5A5 | A5A5 | 8B1F |
| 0000527260 | F65E | E3D1 | 878B | 6492 | 8689 | FE36 | BE81 | FE36 |
| 0000527300 | FC18 | 037E | 03E9 | E900 | 0090 | 3E83 | 6E6E | 7C00 |
| 0000527320 | E903 | 0018 | 699A | FFBE | A3FF | 6E6E | 3E83 | 6E6E |
| 0000527340 | 7C00 | E903 | 0006 | 06C7 | 6E6E | 0000 | 6EA1 | 016E |
| 0000527360 | 3686 | 83FE | 36BE | 00FE | 037D | 0BE9 | 8100 | 36BE |
| 0000527400 | 98FE | 7D07 | E903 | 0003 | 4FE9 | 8B00 | 369E | D1FE |
| 0000527420 | 8BE3 | 629F | 8955 | 369E | D1FE | A1E3 | 6E6E | 8739 |
| 0000527440 | 69BC | 0374 | 33E9 | C700 | 6E06 | FF6E | 8EFF | E206 |
| 0000527460 | B87B | 010E | BF1E | 0AA8 | 86BE | 8E0C | A5D8 | A5A5 |
| 0000527500 | 1FA5 | 868B | FE36 | 4689 | 83F6 | 6A3E | 006E | 037F |
| 0000527520 | 04E9 | FF00 | 6A0E | E96E | FF0C | 5E8B | D1F6 | 8BE3 |
| 0000527540 | 1287 | 896C | 3686 | 3DFE | FFFE | 0374 | D6E9 | 8301 |
| 0000527560 | 6E3E | 006E | 037C | 18E9 | 9A00 | BE69 | 0147 | 6EA3 |
| 0000527600 | 836E | 6E3E | 006E | 037C | 06E9 | C700 | 6E06 | 006E |
| 0000527620 | 8E00 | E406 | 267B | 06C7 | 0C92 | 54E8 | 8C26 | 941E |
| 0000527640 | E90C | 000A | 068E | 7BE4 | 8326 | 9206 | 040C | 068E |
| 0000527660 | 7BE4 | C426 | 921E | 260C | 3F83 | 74FF | E903 | 0015 |
| 0000527700 | 068E | 7BE4 | C426 | 921E | 8B0C | F646 | 3926 | 0247 |
| 0000527720 | 0375 | 03E9 | E900 | FFCC | 068E | 7BE4 | 8326 | 9206 |
| 0000527740 | 040C | C426 | 921E | 260C | 3F83 | 7D00 | E903 | 001A |
| 0000527760 | 068E | 7BE4 | C426 | 921E | A10C | 6E6E | 3926 | 7407 |
| 0000530000 | E903 | 0003 | 03E9 | E900 | FFCE | 068E | 7BE4 | C426 |
| 0000530020 | 921E | 260C | 478B | 8902 | 3686 | 3DFE | 0000 | 037C |
| 0000530040 | 22E9 | 8301 | E63E | 0054 | 0375 | 12E9 | 1E01 | D168 |
| 0000530060 | 8E50 | E606 | 267B | 36FF | 004C | FF26 | 4A36 | 9A00 |
| 0000530100 | 3220 | FFFF | C483 | 8E08 | E806 | 267B | 4EA3 | 2600 |
| 0000530120 | 1689 | 0050 | A126 | 0050 | 0B26 | 4E06 | 7400 | E903 |
| 0000530140 | 0024 | 068E | 7BE6 | FF26 | 4C36 | 2600 | 36FF | 004A |
| 0000530160 | 681E | 50D3 | 681E | 7100 | 389A | B232 | 8302 | 0CC4 |
| 0000530200 | 00B8 | E900 | 28C8 | 6CA1 | 486E | 8689 | FE34 | 04E9 |
| 0000530220 | FF00 | 348E | 83FE | 34BE | 00FE | 037D | 8AE9 | 8E00 |
| 0000530240 | EA06 | 8B7B | 349E | D1FE | 26E3 | 9F8B | 0086 | E3D1 |
| 0000530260 | 068E | 7BEC | 8B26 | BC87 | 890A | 3286 | 1EFE | EA68 |
| 0000530300 | 8B50 | 3286 | D1FE | 05E0 | 0016 | 5C68 | 5003 | EA9A |
| 0000530320 | 7450 | 8303 | 08C4 | 003D | 7500 | E903 | 002E | 868B |
| 0000530340 | FE32 | 86FF | FE32 | E0D1 | 1605 | 6800 | 01A2 | 1E50 |
| 0000530360 | EF68 | 8E50 | E806 | 267B | 36FF | 0050 | FF26 | 4E36 |
| 0000530400 | 9A00 | 3238 | 0391 | C483 | E90C | FFB1 | 681E | 50F3 |
| 0000530420 | 068E | 7BE8 | FF26 | 5036 | 2600 | 36FF | 004E | 389A |
| 0000530440 | AA32 | 8303 | 08C4 | 68E9 | 8EFF | E806 | 267B | 36FF |
| 0000530460 | 0050 | FF26 | 4E36 | 9A00 | 30CC | 02EB | C483 | B804 |
| 0000530500 | 0000 | 09E9 | 8328 | 36BE | 00FE | 0374 | EAE9 | A101 |
| 0000530520 | 6E6A | C8E9 | 1E01 | F568 | 9A50 | B522 | 00F4 | C483 |
| 0000530540 | FF04 | 6806 | C76E | 6A06 | 036E | 8D00 | 5E86 | 39FE |
| 0000530560 | EE46 | 0373 | 6BE9 | C400 | EE5E | 8B26 | D11F | 8BE3 |
| 0000530600 | 9287 | 0564 | 0100 | 8689 | FE36 | BE83 | FE36 | 7D00 |

THU MAR 14 17:52:34 15,1 TSLINT.DLL PAGE 188, LINE 11034

| | | | | | | | | |
|---|---|---|---|---|---|---|---|---|
| 0000530620 | E903 | 0032 | BE81 | FE36 | 0798 | 037C | 27E9 | 8B00 |
| 0000530640 | 369E | D1FE | 8BE3 | 629F | D155 | 81E3 | BCBF | 0069 |
| 0000530660 | 7401 | E903 | 0010 | 9E8B | FE36 | E3D1 | 878B | 5562 |
| 0000530700 | 4689 | E9F6 | FCA0 | 5EC4 | 26EE | 1F8B | E3D1 | 878B |
| 0000530720 | 6492 | 8689 | FE36 | 6E83 | 02EE | AE83 | FE5A | E908 |
| 0000530740 | FF89 | 3E83 | 54E6 | 7500 | E903 | 0112 | 681E | 5102 |
| 0000530760 | 068E | 7BE6 | FF26 | 4C36 | 2600 | 36FF | 004A | 209A |
| 0000531000 | AA32 | 8304 | 08C4 | 068E | 7BE8 | A326 | 004E | 8926 |
| 0000531020 | 5016 | 2600 | 50A1 | 2600 | 060B | 004E | 0374 | 24E9 |
| 0000531040 | 8E00 | E606 | 267B | 36FF | 004C | FF26 | 4A36 | 1E00 |
| 0000531060 | 0468 | 1E51 | 0068 | 9A71 | 3238 | 0500 | C483 | B80C |
| 0000531100 | 0001 | 09E9 | C727 | 3086 | 01FE | E900 | 0004 | 86FF |
| 0000531120 | FE30 | 6CA1 | 396E | 3086 | 7CFE | E903 | 008A | 068E |
| 0000531140 | 7BEA | 9E8B | FE30 | E3D1 | 8B26 | 869F | D100 | 8EE3 |
| 0000531160 | EC06 | 267B | 878B | 0ABC | 8689 | FE32 | 681E | 511B |
| 0000531200 | 868B | FE32 | E0D1 | 1605 | 6800 | 051B | 9A50 | 50EA |
| 0000531220 | 0533 | C483 | 3D08 | 0000 | 0375 | 2EE9 | 8B00 | 3286 |
| 0000531240 | FFFE | 3286 | D1FE | 05E0 | 0016 | 3B68 | 5003 | 681E |
| 0000531260 | 5120 | 068E | 7BE8 | FF26 | 5036 | 2600 | 36FF | 004E |
| 0000531300 | 389A | 5032 | 8305 | 0CC4 | B1E9 | 1EFF | 2468 | 8E51 |
| 0000531320 | E806 | 267B | 36FF | 0050 | FF26 | 4E36 | 9A00 | 3238 |
| 0000531340 | 0569 | C483 | E908 | FF66 | 068E | 7BE8 | FF26 | 5036 |
| 0000531360 | 2600 | 36FF | 004E | CC9A | 4130 | 8303 | 04C4 | 01B8 |
| 0000531400 | E900 | 264A | 3E83 | 6E6E | 7400 | E903 | 0003 | D1E9 |
| 0000531420 | C7FE | 6E06 | FF6E | E9FF | FB95 | 1CE9 | 0B00 | 75C0 |
| 0000531440 | E903 | FE31 | 7D48 | E903 | 000F | 7F48 | E903 | FE35 |
| 0000531460 | 7548 | E903 | FFCE | 00E9 | 8300 | E63E | 0054 | 0375 |
| 0000531500 | 22E9 | 8100 | 6C3E | E86E | 7C03 | E903 | 0017 | 868B |
| 0000531520 | FE36 | 068E | 7BEA | 1E8B | 6E6C | E3D1 | 8926 | 8687 |
| 0000531540 | FF00 | 6C06 | 8B6E | 369E | D1FE | 8BE3 | 8087 | D168 |
| 0000531560 | 29E0 | EE46 | 868B | FE5A | 968B | FE5C | 8689 | FE42 |
| 0000531600 | 9689 | FE44 | 9E8B | FE36 | E3D1 | 878B | 6880 | E0C1 |
| 0000531620 | 2903 | 5A86 | 8EFE | E206 | 8B7B | 5A86 | 8BFE | 5C96 |
| 0000531640 | 05FE | 0008 | BF1E | 0AA8 | F08B | DA8E | A5A5 | A5A5 |
| 0000531660 | 8B1F | 3686 | 89FE | 3886 | 8BFE | 369E | D1FE | 8BE3 |
| 0000531700 | 4487 | 8967 | 3686 | 8BFE | 369E | D1FE | 8BE3 | E887 |
| 0000531720 | C466 | EE5E | 0326 | 4007 | 8689 | FE56 | BE81 | FE56 |
| 0000531740 | 0798 | 037C | 1FE9 | 8B00 | 569E | D1FE | 8BE3 | 629F |
| 0000531760 | 8955 | F65E | E3D1 | 878B | 69BC | 8603 | FE36 | 003D |
| 0000532000 | 7500 | E903 | 0013 | 9E8B | FE36 | E3D1 | 9F8B | 66E8 |
| 0000532020 | E3D1 | 878B | 5562 | 4689 | 8BF6 | 3886 | E9FE | 23E0 |
| 0000532040 | 28E9 | C725 | 6A06 | 006E | C400 | 429E | 26FE | 078B |
| 0000532060 | 8B26 | 0257 | 068E | 7BEE | A326 | 0C72 | 8926 | 7416 |
| 0000532100 | 830C | E23E | 0054 | 0375 | 05E9 | 9A00 | EB86 | 06C3 |
| 0000532120 | 299A | E9EE | B806 | 0001 | F3E9 | E924 | 24ED | 9EC4 |
| 0000532140 | FE42 | 8B26 | 2607 | 578B | 8E02 | EE06 | 267B | 72A3 |
| 0000532160 | 260C | 1689 | 0C74 | 299A | ECEE | B801 | 0001 | CDE9 |
| 0000532200 | E924 | 24C7 | 9EC4 | FE42 | FF26 | 0277 | FF26 | C437 |
| 0000532220 | 429E | 26FE | 77FF | 26FA | 77FF | 9AF8 | 0605 | 03CC |
| 0000532240 | C483 | 8E08 | E206 | 267B | A8A3 | 260A | 1689 | 0AAA |
| 0000532260 | 06C7 | 6E6A | 0000 | 06C7 | 54E2 | 0000 | 8CE9 | C424 |
| 0000532300 | 429E | 26FE | 078B | 8B26 | 0257 | 068E | 7BE2 | A326 |
| 0000532320 | 0AA8 | 8926 | AA16 | E90A | 2471 | 068E | 7BF0 | C726 |
| 0000532340 | 5206 | 0000 | E900 | 2463 | 9EC4 | FE42 | FF26 | FA77 |
| 0000532360 | FF26 | F877 | 9EC4 | FE42 | FF26 | EA77 | FF26 | E877 |
| 0000532400 | 0E9A | 7D0D | 8307 | 04C4 | 5052 | 139A | 0E19 | 8307 |
| 0000532420 | 08C4 | 068E | 7BE2 | A326 | 0AA8 | 8926 | AA16 | E90A |
| 0000532440 | 2429 | 681E | 5126 | 409A | 0FAD | 8308 | 04C4 | 1AE9 |
| 0000532460 | C424 | 429E | 26FE | 478B | 26F8 | 578B | 8EFA | E206 |

THU MAR 14 17:52:34 1991 TSLINT.DLL PAGE 189, LINE 11093

| | | | | | | | | |
|---|---|---|---|---|---|---|---|---|
| 0000532500 | 267B | A8A3 | 260A | 1689 | 0AAA | FEE9 | C423 | 429E |
| 0000532520 | 26FE | 078B | 8B26 | 0257 | 068E | 7BE2 | A326 | 0AA8 |
| 0000532540 | 8926 | AA16 | E90A | 23E3 | 9EC4 | FE42 | 8B26 | 2607 |
| 0000532560 | 578B | 8E02 | E206 | 267B | A8A3 | 260A | 1689 | 0AAA |
| 0000532600 | C8E9 | C423 | 429E | 26FE | 77FF | 2602 | 37FF | 156A |
| 0000532620 | 9EC4 | FE42 | FF26 | F277 | FF26 | F077 | B19A | 4012 |
| 0000532640 | 8308 | 0AC4 | 068E | 7BE2 | A326 | 0AA8 | 8926 | AA16 |
| 0000532660 | E90A | 2397 | 9EC4 | FE42 | FF26 | 0277 | FF26 | 6A37 |
| 0000532700 | C416 | 429E | 26FE | 77FF | 26F2 | 77FF | 9AF0 | 12B1 |
| 0000532720 | 0869 | C483 | 8E0A | E206 | 267B | A8A3 | 260A | 1689 |
| 0000532740 | 0AAA | 66E9 | 6A23 | 6A00 | 6A00 | C41D | 429E | 26FE |
| 0000532760 | 77FF | 2602 | 37FF | B19A | D112 | 8308 | 0AC4 | 068E |
| 0000533000 | 7BE2 | A326 | 0AA8 | 8926 | AA16 | E90A | 233D | 9EC4 |
| 0000533020 | FE42 | 8B26 | F847 | 8B26 | FA57 | 068E | 7BE2 | A326 |
| 0000533040 | 0AA8 | 8926 | AA16 | E90A | 2321 | 9EC4 | FE42 | 8B26 |
| 0000533060 | 2607 | 578B | 8E02 | E206 | 267B | A8A3 | 260A | 1689 |
| 0000533100 | 0AAA | 06E9 | C423 | 429E | 26FE | 77FF | 2602 | 37FF |
| 0000533120 | 066A | 9EC4 | FE42 | FF26 | F277 | FF26 | F077 | B19A |
| 0000533140 | DB12 | 8308 | 0AC4 | 5052 | 859A | 7315 | 8307 | 04C4 |
| 0000533160 | 068E | 7BE2 | A326 | 0AA8 | 8926 | AA16 | E90A | 22CB |
| 0000533200 | 9EC4 | FE42 | FF26 | 0277 | FF26 | 6A37 | 6A1E | 6A00 |
| 0000533220 | 6A00 | FF0E | F836 | FF7B | F636 | FF7B | F436 | FF7B |
| 0000533240 | F236 | 9A7B | 6D5E | 06BE | C483 | 5208 | 9A50 | 12B1 |
| 0000533260 | 092A | C483 | 520A | 9A50 | 12B1 | 0799 | C483 | 8E0A |
| 0000533300 | E206 | 267B | A8A3 | 260A | 1689 | 0AAA | 7CE9 | 8E22 |
| 0000533320 | FA06 | 267B | 06FF | 0C5C | 70E9 | 8E22 | FA06 | 267B |
| 0000533340 | 06C7 | 0C5C | 0000 | 006A | 9EC4 | FE42 | FF26 | FA77 |
| 0000533360 | FF26 | F877 | 389A | 7720 | 8309 | 06C4 | 5052 | 4C6A |
| 0000533400 | 006A | 006A | B19A | 9612 | 8309 | 0AC4 | 068E | 7BE2 |
| 0000533420 | A326 | 0AA8 | 8926 | AA16 | 260A | 1EC4 | 0AA8 | C626 |
| 0000533440 | 1047 | 9A00 | E352 | 0920 | 8E50 | FC06 | 267B | 70A0 |
| 0000533460 | 5026 | 9EC4 | FE42 | FF26 | FA77 | FF26 | F877 | 149A |
| 0000533500 | 9751 | 830A | 04C4 | 5040 | 879A | 16AC | 8309 | 06C4 |
| 0000533520 | 068E | 7BE2 | C426 | A81E | 260A | 0789 | 8926 | 0257 |
| 0000533540 | 068E | 7BE2 | C426 | A81E | 260A | 478B | 2602 | 070B |
| 0000533560 | 0374 | 0CE9 | 1E00 | 4368 | 9A51 | B3B6 | 0A0D | C483 |
| 0000533600 | 8E04 | DE06 | 267B | 3E83 | 002F | 7500 | E903 | 0078 |
| 0000533620 | BE83 | FE3E | 75FE | E903 | 006E | E49A | 24F7 | 520A |
| 0000533640 | 8E50 | E206 | 267B | 1EC4 | 0AA8 | FF26 | 0277 | FF26 |
| 0000533660 | 9A37 | F91E | 0AAC | C483 | 5004 | 068E | 7BE2 | C426 |
| 0000533700 | A81E | 260A | 77FF | 2602 | 37FF | 681E | 5152 | 868D |
| 0000533720 | FE4A | 5016 | 468D | 16F2 | 8D50 | 3A86 | 16FE | 1E50 |
| 0000533740 | 7068 | 686E | 00D0 | 36FF | 54DC | 36FF | 54DA | 36FF |
| 0000533760 | 54E0 | 36FF | 54DE | 681E | 5160 | FF68 | 68FF | FFFF |
| 0000534000 | FF9A | 00FF | 8300 | 30C4 | 9EC4 | FE42 | FF26 | FA77 |
| 0000534020 | FF26 | F877 | 068E | 7BE2 | C426 | A81E | 260A | 77FF |
| 0000534040 | 2602 | 37FF | B49A | 7150 | 8304 | 08C4 | 1CE9 | 6A21 |
| 0000534060 | 6A00 | 6A00 | 6A00 | 6A00 | 9A00 | 12B1 | 0B1F | C483 |
| 0000534100 | 8E0A | E206 | 267B | A8A3 | 260A | 1689 | 0AAA | FAE9 |
| 0000534120 | C420 | 429E | 26FE | 478B | 26F0 | 578B | 8EF2 | E206 |
| 0000534140 | 267B | A8A3 | 260A | 1689 | 0AAA | DEE9 | C420 | 429E |
| 0000534160 | 26FE | 078B | 8B26 | 0257 | 068E | 7BE2 | A326 | 0AA8 |
| 0000534200 | 8926 | AA16 | E90A | 20C3 | 9EC4 | FE42 | C426 | F85F |
| 0000534220 | 8326 | 127F | 7525 | E903 | 0026 | 006A | 006A | 256A |
| 0000534240 | 9EC4 | FE42 | FF26 | FA77 | FF26 | F877 | B19A | 4412 |
| 0000534260 | 830B | 0AC4 | 9EC4 | FE42 | 8926 | F847 | 8926 | FA57 |
| 0000534300 | 006A | 006A | 256A | 9EC4 | FE42 | FF26 | 0277 | FF26 |
| 0000534320 | 9A37 | 12B1 | 0B5A | C483 | 520A | C450 | 429E | 26FE |
| 0000534340 | 77FF | 26FA | 77FF | 9AF8 | 1913 | 0967 | C483 | 8E08 |

THU MAR 14 17:52:34 1991 TSLINT.DLL PAGE 190, LINE 11152

| | | | | | | | | |
|---|---|---|---|---|---|---|---|---|
| 0000534360 | E206 | 267B | A8A3 | 260A | 1689 | 0AAA | 06C7 | 6E6A |
| 0000534400 | 0000 | 46E9 | 8E20 | E206 | 267B | 06C7 | 0AA8 | 0000 |
| 0000534420 | 38E9 | C420 | 429E | 26FE | 078B | 8B26 | 0257 | 068E |
| 0000534440 | 7BE2 | A326 | 0AA8 | 8926 | AA16 | E90A | 201D | 068E |
| 0000534460 | 7BFE | A126 | 3844 | 068E | 7BE2 | A326 | 0AA8 | 0AE9 |
| 0000534500 | C420 | 429E | 26FE | 078B | 8B26 | 0257 | 068E | 7BE2 |
| 0000534520 | A326 | 0AA8 | 8926 | AA16 | C70A | E206 | 0054 | 8E00 |
| 0000534540 | DE06 | 267B | 3E83 | 0C4E | 7500 | E903 | 0048 | BE83 |
| 0000534560 | FE3E | 75FE | E903 | 003E | 681E | 5169 | 868D | FE4A |
| 0000534600 | 5016 | 468D | 16F2 | 8D50 | 3A86 | 16FE | 1E50 | 7068 |
| 0000534620 | 686E | 0101 | 36FF | 54DC | 36FF | 54DA | 36FF | 54E0 |
| 0000534640 | 36FF | 54DE | 681E | 5181 | 9168 | 680C | 0C94 | 979A |
| 0000534660 | 000C | 8300 | 26C4 | 92E9 | C41F | 429E | 26FE | 078B |
| 0000534700 | 8B26 | 0257 | 068E | 7BE2 | A326 | 0AA8 | 8926 | AA16 |
| 0000534720 | C70A | E206 | 0054 | 8E00 | DE06 | 267B | 3E83 | 0CC0 |
| 0000534740 | 7500 | E903 | 0048 | BE83 | FE3E | 75FE | E903 | 003E |
| 0000534760 | 681E | 5188 | 868D | FE4A | 5016 | 468D | 16F2 | 8D50 |
| 0000535000 | 3A86 | 16FE | 1E50 | 7068 | 686E | 0106 | 36FF | 54DC |
| 0000535020 | 36FF | 54DA | 36FF | 54E0 | 36FF | 54DE | 681E | 519D |
| 0000535040 | 0368 | 680D | 0D06 | 099A | 000D | 8300 | 26C4 | 1AE9 |
| 0000535060 | C41F | 429E | 26FE | 078B | 8B26 | 0257 | 068E | 7BE2 |
| 0000535100 | A326 | 0AA8 | 8926 | AA16 | 8E0A | DE06 | 267B | 3E83 |
| 0000535120 | 0D38 | 7500 | E903 | 0048 | BE83 | FE3E | 75FE | E903 |
| 0000535140 | 003E | 681E | 51A4 | 868D | FE4A | 5016 | 468D | 16F2 |
| 0000535160 | 8D50 | 3A86 | 16FE | 1E50 | 7068 | 686E | 010B | 36FF |
| 0000535200 | 54DC | 36FF | 54DA | 36FF | 54E0 | 36FF | 54DE | 681E |
| 0000535220 | 51B9 | 7B68 | 680D | 0D7E | 819A | 000D | 8300 | 26C4 |
| 0000535240 | A8E9 | C41E | 429E | 26FE | 078B | 8B26 | 0257 | 068E |
| 0000535260 | 7BE2 | A326 | 0AA8 | 8926 | AA16 | C70A | E206 | 0054 |
| 0000535300 | 8E00 | DE06 | 267B | 3E83 | 0E16 | 7500 | E903 | 0048 |
| 0000535320 | BE83 | FE3E | 75FE | E903 | 003E | 681E | 51C0 | 868D |
| 0000535340 | FE4A | 5016 | 468D | 16F2 | 8D50 | 3A86 | 16FE | 1E50 |
| 0000535360 | 7068 | 686E | 010E | 36FF | 54DC | 36FF | 54DA | 36FF |
| 0000535400 | 54E0 | 36FF | 54DE | 681E | 51D7 | 5968 | 680E | 0E5C |
| 0000535420 | 5F9A | 000E | 8300 | 26C4 | 30E9 | C41E | 429E | 26FE |
| 0000535440 | 078B | 8B26 | 0257 | 068E | 7BE2 | A326 | 0AA8 | 8926 |
| 0000535460 | AA16 | C70A | E206 | 0054 | E900 | 1E0F | 9EC4 | FE42 |
| 0000535500 | 8B26 | 2607 | 578B | 8E02 | E206 | 267B | A8A3 | 260A |
| 0000535520 | 1689 | 0AAA | 06C7 | 54E2 | 0000 | EEE9 | C41D | 429E |
| 0000535540 | 26FE | 77FF | 26F2 | 77FF | 6AF0 | C437 | 429E | 26FE |
| 0000535560 | 77FF | 26E2 | 77FF | 9AE0 | 0ECB | 0DF4 | C483 | 5204 |
| 0000535600 | 9A50 | 12B1 | 09EC | C483 | 8E0A | E206 | 267B | A8A3 |
| 0000535620 | 260A | 1689 | 0AAA | 06C7 | 54E2 | 0000 | ACE9 | 8E1D |
| 0000535640 | DE06 | 267B | 3E83 | 09F8 | 7500 | E903 | 0048 | BE83 |
| 0000535660 | FE3E | 75FE | E903 | 003E | 681E | 51DE | 868D | FE4A |
| 0000535700 | 5016 | 468D | 16F2 | 8D50 | 3A86 | 16FE | 1E50 | 7068 |
| 0000535720 | 686E | 0116 | 36FF | 54DC | 36FF | 54DA | 36FF | 54E0 |
| 0000535740 | 36FF | 54DE | 681E | 51FA | 6B68 | 680A | 0A6E | 719A |
| 0000535760 | 000A | 8300 | 26C4 | 9EC4 | FE42 | 8B26 | 2607 | 578B |
| 0000536000 | 8E02 | E206 | 267B | A8A3 | 260A | 1689 | 0AAA | 06C7 |
| 0000536020 | 54E2 | 0000 | 34E9 | 8E1D | DE06 | 267B | 3E83 | 0FDB |
| 0000536040 | 7500 | E903 | 0048 | BE83 | FE3E | 75FE | E903 | 003E |
| 0000536060 | 681E | 5201 | 868D | FE4A | 5016 | 468D | 16F2 | 8D50 |
| 0000536100 | 3A86 | 16FE | 1E50 | 7068 | 686E | 011A | 36FF | 54DC |
| 0000536120 | 36FF | 54DA | 36FF | 54E0 | 36FF | 54DE | 681E | 520F |
| 0000536140 | 1E68 | 6810 | 1021 | 249A | 0010 | 8300 | 26C4 | 06C7 |
| 0000536160 | 6E6A | 0000 | 06C7 | 54E2 | 0000 | 068E | 7BE2 | C02B |
| 0000536200 | A326 | 0AAA | A326 | 0AA8 | 681E | 5216 | 409A | 43AD |
| 0000536220 | 830F | 04C4 | B4E9 | C41C | 429E | 26FE | 77FF | 26E2 |

THU MAR 14 17:52:34 1991 TSLINT.DLL PAGE 191, LINE 11211

| | | | | | | | | |
|---|---|---|---|---|---|---|---|---|
| 0000536240 | 77FF | 9AED | 5114 | 09B1 | C483 | 5004 | 9EC4 | FE42 |
| 0000536260 | FF26 | E277 | FF26 | E077 | F89A | 886D | 830F | 06C4 |
| 0000536300 | 5052 | 526A | 9EC4 | FE42 | FF26 | F277 | FF26 | F077 |
| 0000536320 | B19A | 6212 | 830F | 0AC4 | 34A3 | 89D1 | 3616 | C4D1 |
| 0000536340 | 429E | 26FE | 77FF | FFD8 | 3636 | FFD1 | 3436 | 9AD1 |
| 0000536360 | 1A8C | 0FA0 | C483 | 8E06 | E206 | 267B | A8A3 | 260A |
| 0000536400 | 1689 | 0AAA | 44E9 | 6A1C | C4FF | 429E | 26FE | 77FF |
| 0000536420 | 26E2 | 77FF | 9AE0 | 6DF8 | 09BB | C483 | 5206 | 6A50 |
| 0000536440 | C452 | 429E | 26FE | 77FF | 26F2 | 77FF | 9AF0 | 12B1 |
| 0000536460 | 0FBF | C483 | A30A | D134 | 1689 | D136 | 9EC4 | FE42 |
| 0000536500 | FF26 | D877 | 36FF | D136 | 36FF | D134 | 8C9A | 561A |
| 0000536520 | 8311 | 06C4 | 068E | 7BE2 | A326 | 0AA8 | 8926 | AA16 |
| 0000536540 | E90A | 1BE7 | 068E | 7BDE | 8326 | 433E | 0010 | 0375 |
| 0000536560 | 48E9 | 8300 | 3EBE | FEFE | 0375 | 3EE9 | 1E00 | 2368 |
| 0000536600 | 8D52 | 4A86 | 16FE | 8D50 | F246 | 5016 | 868D | FE3A |
| 0000536620 | 5016 | 681E | 6E70 | 3468 | FF01 | DC36 | FF54 | DA36 |
| 0000536640 | FF54 | E036 | FF54 | DE36 | 1E54 | 3A68 | 6852 | 1086 |
| 0000536660 | 8968 | 9A10 | 108C | 0000 | C483 | 8E26 | E206 | 2B7B |
| 0000536700 | 26C0 | AAA3 | 260A | A8A3 | E90A | 1B7F | 068E | 7BDE |
| 0000536720 | 8326 | CF3E | 0010 | 0375 | 48E9 | 8300 | 3EBE | FEFE |
| 0000536740 | 0375 | 3EE9 | 1E00 | 4168 | 8D52 | 4A86 | 16FE | 8D50 |
| 0000536760 | F246 | 5016 | 868D | FE3A | 5016 | 681E | 6E70 | 3868 |
| 0000537000 | FF01 | DC36 | FF54 | DA36 | FF54 | E036 | FF54 | DE36 |
| 0000537020 | 1E54 | 5C68 | 6852 | 1112 | 1568 | 9A11 | 1118 | 0000 |
| 0000537040 | C483 | C426 | 429E | 26FE | 478B | 26F8 | 578B | 8EFA |
| 0000537060 | E206 | 267B | A8A3 | 260A | 1689 | 0AAA | 0CE9 | C41B |
| 0000537100 | 429E | 26FE | 478B | 26F8 | 578B | 8EFA | E206 | 267B |
| 0000537120 | A8A3 | 260A | 1689 | 0AAA | 068E | 7BDE | 8326 | D63E |
| 0000537140 | 000B | 0375 | 48E9 | 8300 | 3EBE | FEFE | 0375 | 3EE9 |
| 0000537160 | 1E00 | 6368 | 8D52 | 4A86 | 16FE | 8D50 | F246 | 5016 |
| 0000537200 | 868D | FE3A | 5016 | 681E | 6E70 | 3F68 | FF01 | DC36 |
| 0000537220 | FF54 | DA36 | FF54 | E036 | FF54 | DE36 | 1E54 | 8268 |
| 0000537240 | 6852 | 0C19 | 1C68 | 9A0C | 0C1F | 0000 | C483 | E926 |
| 0000537260 | 1A99 | 068E | 7BE2 | C02B | A326 | 0AAA | A326 | 0AA8 |
| 0000537300 | 88E9 | C41A | 429E | 26FE | 77FF | 26FA | 77FF | C4F8 |
| 0000537320 | 429E | 26FE | 77FF | C4D0 | 429E | 26FE | 77FF | 26EA |
| 0000537340 | 77FF | 9AE8 | 12B1 | 1175 | C483 | A30A | D134 | 1689 |
| 0000537360 | D136 | 9EC4 | FE42 | FF26 | D877 | 36FF | D136 | 36FF |
| 0000537400 | D134 | 8C9A | AD1A | 8311 | 06C4 | 068E | 7BE2 | A326 |
| 0000537420 | 0AA8 | 8926 | AA16 | E90A | 1A31 | 9EC4 | FE42 | FF26 |
| 0000537440 | FA77 | FF26 | F877 | 9EC4 | FE42 | FF26 | E077 | 9EC4 |
| 0000537460 | FE42 | FF26 | F277 | FF26 | F077 | B19A | CC12 | 8311 |
| 0000537500 | 0AC4 | 34A3 | 89D1 | 3616 | C4D1 | 429E | 26FE | 77FF |
| 0000537520 | FFE8 | 3636 | FFD1 | 3436 | 9AD1 | 1A8C | 121A | C483 |
| 0000537540 | 8E06 | E206 | 267B | A8A3 | 260A | 1689 | 0AAA | DAE9 |
| 0000537560 | C419 | 429E | 26FE | 078B | 068E | 7BE2 | A326 | 0AA8 |
| 0000537600 | C8E9 | C419 | 429E | 26FE | 078B | 068E | 7BE2 | A326 |
| 0000537620 | 0AA8 | B6E9 | 6A19 | 6A00 | 6A00 | C434 | 429E | 26FE |
| 0000537640 | 77FF | 26FA | 77FF | 9AF8 | 12B1 | 0DEA | C483 | 8E0A |
| 0000537660 | E206 | 267B | A8A3 | 260A | 1689 | 0AAA | 8CE9 | 6A19 |
| 0000537700 | 6A00 | 6A00 | 6A34 | 6A00 | 9A00 | 12B1 | 1266 | C483 |
| 0000537720 | 8E0A | E206 | 267B | A8A3 | 260A | 1689 | 0AAA | 6AE9 |
| 0000537740 | 6A19 | 6A00 | 6A00 | C436 | 429E | 26FE | 77FF | 26FA |
| 0000537760 | 77FF | 9AF8 | 12B1 | 1288 | C483 | 8E0A | E206 | 267B |
| 0000540000 | A8A3 | 260A | 1689 | 0AAA | 40E9 | 6A19 | 6A00 | 6A00 |
| 0000540020 | 6A53 | 6A00 | 9A00 | 12B1 | 12AA | C483 | 8E0A | E206 |
| 0000540040 | 267B | A8A3 | 260A | 1689 | 0AAA | 1EE9 | 6A19 | 6A00 |
| 0000540060 | 6A00 | 6A36 | 6A00 | 9A00 | 12B1 | 12CC | C483 | 8E0A |
| 0000540100 | E206 | 267B | A8A3 | 260A | 1689 | 0AAA | FCE9 | 6A18 |

THU MAR 14 17:52:34 1991 TSLINT.DLL PAGE 192, LINE 11270

| | | | | | | | | |
|---|---|---|---|---|---|---|---|---|
| 0000540120 | 6A00 | 6A00 | 6A2F | 6A00 | 9A00 | 12B1 | 12EE | C483 |
| 0000540140 | 8E0A | E206 | 267B | A8A3 | 260A | 1689 | 0AAA | DAE9 |
| 0000540160 | 6A18 | 6A00 | 6A00 | 6A30 | 6A00 | 9A00 | 12B1 | 1374 |
| 0000540200 | C483 | 8E0A | E206 | 267B | A8A3 | 260A | 1689 | 0AAA |
| 0000540220 | B8E9 | 8E18 | DE06 | 267B | 3E83 | 13C7 | 7500 | E903 |
| 0000540240 | 0048 | BE83 | FE3E | 75FE | E903 | 003E | 681E | 5289 |
| 0000540260 | 868D | FE4A | 5016 | 468D | 16F2 | 8D50 | 3A86 | 16FE |
| 0000540300 | 1E50 | 7068 | 686E | 016E | 36FF | 54DC | 36FF | 54DA |
| 0000540320 | 36FF | 54E0 | 36FF | 54DE | 681E | 52AE | 0A68 | 6814 |
| 0000540340 | 140D | 109A | 0014 | 8300 | 26C4 | 06C7 | 54E2 | 0001 |
| 0000540360 | 006A | 006A | 266A | 9EC4 | FE42 | FF26 | 0277 | FF26 |
| 0000540400 | 9A37 | 12B1 | 138C | C483 | 520A | 6A50 | C42B | 429E |
| 0000540420 | 26FE | 77FF | 26F2 | 77FF | 9AF0 | 12B1 | 13AB | C483 |
| 0000540440 | A30A | D134 | 1689 | D136 | 9EC4 | FE42 | FF26 | E077 |
| 0000540460 | 36FF | D136 | 36FF | D134 | 8C9A | 331A | 8314 | 06C4 |
| 0000540500 | 068E | 7BE2 | A326 | 0AA8 | 8926 | AA16 | E90A | 17FB |
| 0000540520 | 068E | 7BDE | 8326 | 8C3E | 0014 | 0375 | 48E9 | 8300 |
| 0000540540 | 3EBE | FEFE | 0375 | 3EE9 | 1E00 | B568 | 8D52 | 4A86 |
| 0000540560 | 16FE | 8D50 | F246 | 5016 | 868D | FE3A | 5016 | 681E |
| 0000540600 | 6E70 | 7668 | FF01 | DC36 | FF54 | DA36 | FF54 | E036 |
| 0000540620 | FF54 | DE36 | 1E54 | E468 | 6852 | 14CF | D268 | 9A14 |
| 0000540640 | 14D5 | 0000 | C483 | C426 | 429E | 26FE | 77FF | 2602 |
| 0000540660 | 37FF | 266A | 9EC4 | FE42 | FF26 | F277 | FF26 | F077 |
| 0000540700 | B19A | 4B12 | 8314 | 0AC4 | 5052 | 2B6A | 9EC4 | FE42 |
| 0000540720 | FF26 | E277 | FF26 | E077 | B19A | 6A12 | 8314 | 0AC4 |
| 0000540740 | 34A3 | 89D1 | 3616 | C4D1 | 429E | 26FE | 77FF | FFD0 |
| 0000540760 | 3636 | FFD1 | 3436 | 9AD1 | 1A8C | 14F8 | C483 | 8E06 |
| 0000541000 | E206 | 267B | A8A3 | 260A | 1689 | 0AAA | 06C7 | 54E2 |
| 0000541020 | 0000 | 36E9 | 8E17 | DE06 | 267B | 3E83 | 0E8E | 7500 |
| 0000541040 | E903 | 0048 | BE83 | FE3E | 75FE | E903 | 003E | 681E |
| 0000541060 | 52EB | 868D | FE4A | 5016 | 468D | 16F2 | 8D50 | 3A86 |
| 0000541100 | 16FE | 1E50 | 7068 | 686E | 0183 | 36FF | 54DC | 36FF |
| 0000541120 | 54DA | 36FF | 54E0 | 36FF | 54DE | 681E | 5309 | D168 |
| 0000541140 | 680E | 0ED4 | D79A | 000E | 8300 | 26C4 | 9EC4 | FE42 |
| 0000541160 | FF26 | 0277 | FF26 | 6A37 | C42C | 429E | 26FE | 77FF |
| 0000541200 | 26F2 | 77FF | 9AF0 | 12B1 | 1517 | C483 | A30A | D134 |
| 0000541220 | 1689 | D136 | 9EC4 | FE42 | FF26 | E077 | 36FF | D136 |
| 0000541240 | 36FF | D134 | 8C9A | 411A | 8315 | 06C4 | 068E | 7BE2 |
| 0000541260 | A326 | 0AA8 | 8926 | AA16 | E90A | 168F | 068E | 7BE2 |
| 0000541300 | C02B | A326 | 0AAA | A326 | 0AA8 | 681E | 5310 | 409A |
| 0000541320 | FFAD | 830E | 04C4 | 72E9 | C416 | 429E | 26FE | 77FF |
| 0000541340 | 26D2 | 77FF | 6AD0 | C435 | 429E | 26FE | 77FF | 26F2 |
| 0000541360 | 77FF | 9AF0 | 12B1 | 1585 | C483 | A30A | D134 | 1689 |
| 0000541400 | D136 | 9EC4 | FE42 | FF26 | C877 | 36FF | D136 | 36FF |
| 0000541420 | D134 | 8C9A | C71A | 8315 | 06C4 | 34A3 | 89D1 | 3616 |
| 0000541440 | C4D1 | 429E | 26FE | 478B | C4E0 | 341E | 26D1 | 4789 |
| 0000541460 | A10E | D134 | 168B | D136 | 068E | 7BE2 | A326 | 0AA8 |
| 0000541500 | 8926 | AA16 | E90A | 1603 | 9EC4 | FE42 | FF26 | F277 |
| 0000541520 | FF26 | F077 | CB9A | E10E | 8315 | 04C4 | 5052 | 006A |
| 0000541540 | 006A | 9EC4 | FE42 | FF26 | E277 | FF26 | E077 | CB9A |
| 0000541560 | EB0E | 8315 | 04C4 | 5052 | E69A | 0216 | 8316 | 0CC4 |
| 0000541600 | 5052 | 2E6A | 9EC4 | FE42 | FF26 | 0277 | FF26 | 9A37 |
| 0000541620 | 12B1 | 1621 | C483 | A30A | D134 | 1689 | D136 | 9EC4 |
| 0000541640 | FE42 | FF26 | D077 | 36FF | D136 | 36FF | D134 | 8C9A |
| 0000541660 | 5D1A | 8316 | 06C4 | 068E | 7BE2 | A326 | 0AA8 | 8926 |
| 0000541700 | AA16 | E90A | 1585 | 9EC4 | FE42 | FF26 | F277 | FF26 |
| 0000541720 | F077 | 9EC4 | FE42 | FF26 | E277 | FF26 | E077 | 9EC4 |
| 0000541740 | FE42 | FF26 | D277 | FF26 | D077 | E69A | 7416 | 8316 |
| 0000541760 | 0CC4 | 5052 | 2D6A | 9EC4 | FE42 | FF26 | 0277 | FF26 |

THU MAR 14 17:52:34 1991 TSLINT.DLL PAGE 193, LINE 11329

| | | | | | | | | |
|---|---|---|---|---|---|---|---|---|
| 0000542000 | 9A37 | 12B1 | 1693 | C483 | A30A | D134 | 1689 | D136 |
| 0000542020 | 9EC4 | FE42 | FF26 | C077 | 36FF | D136 | 36FF | D134 |
| 0000542040 | 8C9A | C71A | 8316 | 06C4 | 068E | 7BE2 | A326 | 0AA8 |
| 0000542060 | 8926 | AA16 | E90A | 1513 | 006A | 006A | 9EC4 | FE42 |
| 0000542100 | FF26 | EA77 | FF26 | E877 | 9EC4 | FE42 | FF26 | DA77 |
| 0000542120 | FF26 | D877 | E69A | DE16 | 8316 | 0CC4 | 5052 | 2D6A |
| 0000542140 | 9EC4 | FE42 | FF26 | 0277 | FF26 | 9A37 | 12B1 | 16FD |
| 0000542160 | C483 | A30A | D134 | 1689 | D136 | 9EC4 | FE42 | FF26 |
| 0000542200 | C877 | 36FF | D136 | 36FF | D134 | 8C9A | 311A | 8317 |
| 0000542220 | 06C4 | 068E | 7BE2 | A326 | 0AA8 | 8926 | AA16 | E90A |
| 0000542240 | 14A9 | 9EC4 | FE42 | FF26 | F277 | FF26 | F077 | 006A |
| 0000542260 | 006A | 9EC4 | FE42 | FF26 | DA77 | FF26 | D877 | E69A |
| 0000542300 | 4816 | 8317 | 0CC4 | 5052 | 2D6A | 9EC4 | FE42 | FF26 |
| 0000542320 | 0277 | FF26 | 9A37 | 12B1 | 1767 | C483 | A30A | D134 |
| 0000542340 | 1689 | D136 | 9EC4 | FE42 | FF26 | C877 | 36FF | D136 |
| 0000542360 | 36FF | D134 | 8C9A | 931A | 8317 | 06C4 | 068E | 7BE2 |
| 0000542400 | A326 | 0AA8 | 8926 | AA16 | E90A | 143F | 006A | 006A |
| 0000542420 | 006A | 006A | 9EC4 | FE42 | FF26 | E277 | FF26 | E077 |
| 0000542440 | E69A | AA16 | 8317 | 0CC4 | 5052 | 2D6A | 9EC4 | FE42 |
| 0000542460 | FF26 | 0277 | FF26 | 9A37 | 12B1 | 17C9 | C483 | A30A |
| 0000542500 | D134 | 1689 | D136 | 9EC4 | FE42 | FF26 | D077 | 36FF |
| 0000542520 | D136 | 36FF | D134 | 8C9A | FD1A | 8317 | 06C4 | 068E |
| 0000542540 | 7BE2 | A326 | 0AA8 | 8926 | AA16 | E90A | 13DD | 9EC4 |
| 0000542560 | FE42 | FF26 | F277 | FF26 | F077 | 9EC4 | FE42 | FF26 |
| 0000542600 | E277 | FF26 | E077 | 006A | 006A | E69A | 1416 | 8318 |
| 0000542620 | 0CC4 | 5052 | 2D6A | 9EC4 | FE42 | FF26 | 0277 | FF26 |
| 0000542640 | 9A37 | 12B1 | 1833 | C483 | A30A | D134 | 1689 | D136 |
| 0000542660 | 9EC4 | FE42 | FF26 | C877 | 36FF | D136 | 36FF | D134 |
| 0000542700 | 8C9A | 5F1A | 8318 | 06C4 | 068E | 7BE2 | A326 | 0AA8 |
| 0000542720 | 8926 | AA16 | E90A | 1373 | 006A | 006A | 9EC4 | FE42 |
| 0000542740 | FF26 | EA77 | FF26 | E877 | 006A | 006A | E69A | 7616 |
| 0000542760 | 8318 | 0CC4 | 5052 | 2D6A | 9EC4 | FE42 | FF26 | 0277 |
| 0000543000 | FF26 | 9A37 | 12B1 | 1895 | C483 | A30A | D134 | 1689 |
| 0000543020 | D136 | 9EC4 | FE42 | FF26 | D077 | 36FF | D136 | 36FF |
| 0000543040 | D134 | 8C9A | C11A | 8318 | 06C4 | 068E | 7BE2 | A326 |
| 0000543060 | 0AA8 | 8926 | AA16 | E90A | 1311 | 9EC4 | FE42 | FF26 |
| 0000543100 | F277 | FF26 | F077 | 006A | 006A | 006A | 006A | E69A |
| 0000543120 | D816 | 8318 | 0CC4 | 5052 | 2D6A | 9EC4 | FE42 | FF26 |
| 0000543140 | 0277 | FF26 | 9A37 | 12B1 | 18F7 | C483 | A30A | D134 |
| 0000543160 | 1689 | D136 | 9EC4 | FE42 | FF26 | D077 | 36FF | D136 |
| 0000543200 | 36FF | D134 | 8C9A | 3C1A | 8312 | 06C4 | 068E | 7BE2 |
| 0000543220 | A326 | 0AA8 | 8926 | AA16 | E90A | 12AF | 006A | 006A |
| 0000543240 | 006A | 006A | 006A | 006A | E69A | 3216 | 8319 | 0CC4 |
| 0000543260 | 5052 | 2D6A | 9EC4 | FE42 | FF26 | 0277 | FF26 | 9A37 |
| 0000543300 | 12B1 | 1951 | C483 | A30A | D134 | 1689 | D136 | 9EC4 |
| 0000543320 | FE42 | FF26 | D877 | 36FF | D136 | 36FF | D134 | 8C9A |
| 0000543340 | 7B1A | 8319 | 06C4 | 068E | 7BE2 | A326 | 0AA8 | 8926 |
| 0000543360 | AA16 | E90A | 1255 | 068E | 7BE2 | C02B | A326 | 0AAA |
| 0000543400 | A326 | 0AA8 | 681E | 532E | 409A | A8AD | 8319 | 04C4 |
| 0000543420 | 38E9 | 8E12 | E206 | 2B7B | 26C0 | AAA3 | 260A | A8A3 |
| 0000543440 | E90A | 1227 | 006A | 006A | 3C6A | 9EC4 | FE42 | FF26 |
| 0000543460 | 0277 | FF26 | 9A37 | 12B1 | 19E2 | C483 | 8E0A | E206 |
| 0000543500 | 267B | A8A3 | 260A | 1689 | 0AAA | FEE9 | 8E11 | E206 |
| 0000543520 | 2B7B | 26C0 | AAA3 | 260A | A8A3 | E90A | 11ED | 006A |
| 0000543540 | 006A | 386A | 9EC4 | FE42 | FF26 | 0277 | FF26 | 9A37 |
| 0000543560 | 12B1 | 1A0B | C483 | 8E0A | E206 | 267B | A8A3 | 260A |
| 0000543600 | 1689 | 0AAA | C4E9 | 6A11 | 6A00 | 6A00 | C439 | 429E |
| 0000543620 | 26FE | 77FF | 2602 | 37FF | B19A | 3412 | 831A | 0AC4 |
| 0000543640 | 068E | 7BE2 | A326 | 0AA8 | 8926 | AA16 | E90A | 119B |

THU MAR 14 17:52:34 1991 TSLINT.DLL PAGE 194, LINE 11388

| | | | | | | | | |
|---|---|---|---|---|---|---|---|---|
| 0000543660 | 006A | 006A | 3A6A | 9EC4 | FE42 | FF26 | 0277 | FF26 |
| 0000543700 | 9A37 | 12B1 | 1AE5 | C483 | 8E0A | E2D6 | 267B | A8A3 |
| 0000543720 | 260A | 1689 | 0AAA | 72E9 | 8E11 | E206 | 2B7B | 26C0 |
| 0000543740 | AAA3 | 260A | A8A3 | E90A | 1161 | 9EC4 | FE42 | 8B26 |
| 0000543760 | 2607 | 578B | 8E02 | E206 | 267B | A8A3 | 260A | 1689 |
| 0000544000 | 0AAA | 46E9 | 8E11 | DE06 | 267B | 3E83 | 1B01 | 7500 |
| 0000544020 | E903 | 0053 | BE83 | FE3E | 75FE | E903 | 0049 | 9EC4 |
| 0000544040 | FE42 | FF26 | 0277 | FF26 | 1E37 | 4468 | 8D53 | 4A86 |
| 0000544060 | 16FE | 8D50 | F246 | 5016 | 868D | FE3A | 5016 | 681E |
| 0000544100 | 6E70 | E568 | FF01 | DC36 | FF54 | DA36 | FF54 | E036 |
| 0000544120 | FF54 | DE36 | 1E54 | 5C68 | 6853 | 1B4F | 5268 | 9A1B |
| 0000544140 | 1B55 | 0000 | C483 | C42A | 429E | 26FE | 77FF | 2602 |
| 0000544160 | 37FF | 0E9A | 6A0D | 831B | 04C4 | 068E | 7BE2 | A326 |
| 0000544200 | 0AA8 | 8926 | AA16 | E90A | 10C1 | 068E | 7BDE | 8326 |
| 0000544220 | 0A3E | 0013 | 0375 | 53E9 | 8300 | 3EBE | FEFE | 0375 |
| 0000544240 | 49E9 | C400 | 429E | 26FE | 77FF | 2602 | 37FF | 681E |
| 0000544260 | 5363 | 868D | FE4A | 5016 | 468D | 16F2 | 8D50 | 3A86 |
| 0000544300 | 16FE | 1E50 | 7068 | 686E | 01E9 | 36FF | 54DC | 36FF |
| 0000544320 | 54DA | 36FF | 54E0 | 36FF | 54DE | 681E | 5388 | 4D68 |
| 0000544340 | 6813 | 1350 | 539A | 0013 | 8300 | 2AC4 | 9EC4 | FE42 |
| 0000544360 | FF26 | 0277 | FF26 | 9A37 | 0D0E | 1B80 | C483 | 5204 |
| 0000544400 | C450 | 429E | 26FE | 77FF | 26F2 | 77FF | 9AF0 | 1913 |
| 0000544420 | 1BB0 | C483 | 8E08 | E206 | 267B | A8A3 | 260A | 1689 |
| 0000544440 | 0AAA | 06C7 | 6E6A | 0000 | 20E9 | 8E10 | E206 | 2B7B |
| 0000544460 | 26C0 | AAA3 | 260A | A8A3 | 1E0A | 8F68 | 9A53 | AD40 |
| 0000544500 | 1566 | C483 | E904 | 1003 | 068E | 7BE2 | C02B | A326 |
| 0000544520 | 0AAA | A326 | 0AA8 | 681E | 53A7 | 409A | EAAD | 831B |
| 0000544540 | 04C4 | E6E9 | 8E0F | E206 | 2B7B | 26C0 | AAA3 | 260A |
| 0000544560 | A8A3 | 1E0A | BF68 | 9A53 | AD40 | 1C32 | C483 | E904 |
| 0000544600 | 0FC9 | 068E | 7BE2 | C02B | A326 | 0AAA | A326 | 0AA8 |
| 0000544620 | B8E9 | C40F | 429E | 26FE | 078B | 8B26 | 0257 | 068E |
| 0000544640 | 7BE2 | A326 | 0AA8 | 8926 | AA16 | E90A | 0F9D | 006A |
| 0000544660 | 006A | 276A | 9EC4 | FE42 | FF26 | 0277 | FF26 | 9A37 |
| 0000544700 | 12B1 | 1C5B | C483 | 8E0A | E206 | 267B | A8A3 | 260A |
| 0000544720 | 1689 | 0AAA | 74E9 | 6A0F | 6A00 | 6A00 | C427 | 429E |
| 0000544740 | 26FE | 77FF | 2602 | 37FF | B19A | 7112 | 831C | 0AC4 |
| 0000544760 | 5052 | 9EC4 | FE42 | FF26 | F277 | FF26 | F077 | 139A |
| 0000545000 | A119 | 831C | 08C4 | 068E | 7BE2 | A326 | 0AA8 | 8926 |
| 0000545020 | AA16 | C70A | 6A06 | 006E | E900 | 0F2F | 068E | 7BE2 |
| 0000545040 | C02B | A326 | 0AAA | A326 | 0AA8 | 681E | 53D7 | 409A |
| 0000545060 | BEAD | 831C | 04C4 | 12E9 | 8E0F | E206 | 2B7B | 26C0 |
| 0000545100 | AAA3 | 260A | A8A3 | 1E0A | F068 | 9A53 | AD40 | 1CDB |
| 0000545120 | C483 | E904 | 0EF5 | 068E | 7BE2 | C02B | A326 | 0AAA |
| 0000545140 | A326 | 0AA8 | 681E | 5409 | 409A | 23AD | 831D | 04C4 |
| 0000545160 | D8E9 | 8E0E | E206 | 2B7B | 26C0 | AAA3 | 260A | A8A3 |
| 0000545200 | E90A | DEC7 | 9EC4 | FE42 | 8B26 | 2607 | 578B | 8E02 |
| 0000545220 | E206 | 267B | A8A3 | 260A | 1689 | 0AAA | ACE9 | 6A0E |
| 0000545240 | 6A00 | 6A00 | C427 | 429E | 26FE | 77FF | 2602 | 37FF |
| 0000545260 | B19A | 4C12 | 831D | 0AC4 | 068E | 7BE2 | A326 | 0AA8 |
| 0000545300 | 8926 | AA16 | E90A | 0E83 | 006A | 006A | 276A | 9EC4 |
| 0000545320 | FE42 | FF26 | 0277 | FF26 | 9A37 | 12B1 | 1D62 | C483 |
| 0000545340 | 520A | C450 | 429E | 26FE | 77FF | 26F2 | 77FF | 9AF0 |
| 0000545360 | 1913 | 1D92 | C483 | 8E08 | E206 | 267B | A8A3 | 260A |
| 0000545400 | 1689 | 0AAA | 06C7 | 6E6A | 0000 | 3EE9 | 8E0E | E206 |
| 0000545420 | 2B7B | 26C0 | AAA3 | 260A | A8A3 | 1E0A | 1D68 | 9A54 |
| 0000545440 | AD40 | 1DAF | C483 | E904 | 0E21 | 068E | 7BE2 | C02B |
| 0000545460 | A326 | 0AAA | A326 | 0AA8 | 681E | 5436 | 409A | CCAD |
| 0000545500 | 831D | 04C4 | 04E9 | 8E0E | E206 | 2B7B | 26C0 | AAA3 |
| 0000545520 | 260A | A8A3 | 1E0A | 4F68 | 9A54 | AD40 | 1E4D | C483 |

THU MAR 14 17:52:34 1991 TSLINT.DLL PAGE 195, LINE 11447

| | | | | | | | | |
|---|---|---|---|---|---|---|---|---|
| 0000545540 | E904 | 0DE7 | 068E | 7BDE | 8326 | 393E | 001F | 0375 |
| 0000545560 | 48E9 | 8300 | 3EBE | FEFE | 0375 | 3EE9 | 1E00 | 6368 |
| 0000545600 | 8D54 | 4A86 | 16FE | 8D50 | F246 | 5016 | 868D | FE3A |
| 0000545620 | 5016 | 681E | 6E70 | 3868 | FF02 | DC36 | FF54 | DA36 |
| 0000545640 | FF54 | E036 | FF54 | DE36 | 1E54 | 8068 | 6854 | 1ACA |
| 0000545660 | CD68 | 9A1A | 1AD0 | 0000 | C483 | C426 | 429E | 26FE |
| 0000545700 | 77FF | 2602 | 37FF | 9EC4 | FE42 | FF26 | F877 | 9EC4 |
| 0000545720 | FE42 | FF26 | F277 | FF26 | F077 | B19A | 7E12 | 831E |
| 0000545740 | 0AC4 | 068E | 7BE2 | A326 | 0AA8 | 8926 | AA16 | E90A |
| 0000545760 | 0D59 | 9EC4 | FE42 | FF26 | EA77 | FF26 | E877 | 416A |
| 0000546000 | 9EC4 | FE42 | 8B26 | F847 | 5299 | 9A50 | 0ECB | 1E88 |
| 0000546020 | C483 | 5204 | 9A50 | 12B1 | 1EB2 | C483 | 8E0A | E206 |
| 0000546040 | 267B | A8A3 | 260A | 1689 | 0AAA | 1EE9 | 6A0D | 6A00 |
| 0000546060 | 6A00 | C43B | 429E | 26FE | 77FF | 26EA | 77FF | 9AE8 |
| 0000546100 | 12B1 | 1EC9 | C483 | 520A | 6A50 | C445 | 429E | 26FE |
| 0000546120 | 77FF | 2602 | 37FF | B19A | EC12 | 831E | 0AC4 | 34A3 |
| 0000546140 | 89D1 | 3616 | C4D1 | 429E | 26FE | 5FC4 | 26E8 | 77FF |
| 0000546160 | FF0C | 3636 | FFD1 | 3436 | 9AD1 | 1A8C | IFID | C483 |
| 0000546200 | 8E06 | E206 | 267B | A8A3 | 260A | 1689 | 0AAA | BAE9 |
| 0000546220 | C40C | 429E | 26FE | 77FF | 2602 | 37FF | 456A | 9EC4 |
| 0000546240 | FE42 | FF26 | FA77 | FF26 | F877 | B19A | 1B12 | 8319 |
| 0000546260 | 0AC4 | 068E | 7BE2 | A326 | 0AA8 | 8926 | AA16 | E90A |
| 0000546300 | 0C89 | 068E | 7BDE | 8326 | 7C3E | 001A | 0375 | 48E9 |
| 0000546320 | 8300 | 3EBE | FEFE | 0375 | 3EE9 | 1E00 | 8768 | 8D54 |
| 0000546340 | 4A86 | 16FE | 8D50 | F246 | 5016 | 868D | FE3A | 5016 |
| 0000546360 | 681E | 6E70 | 4B68 | FF02 | DC36 | FF54 | DA36 | FF54 |
| 0000546400 | E036 | FF54 | DE36 | 1E54 | 9A68 | 6854 | 2027 | 2A68 |
| 0000546420 | 9A20 | 202D | 0000 | C483 | C426 | 429E | 26FE | 77FF |
| 0000546440 | 2602 | 37FF | 156A | 9EC4 | FE42 | FF26 | F277 | FF26 |
| 0000546460 | F077 | B19A | C812 | 831F | 0AC4 | 34A3 | 89D1 | 3616 |
| 0000546500 | C4D1 | 429E | 26FE | 5FC4 | 26F0 | 77FF | FF0C | 3636 |
| 0000546520 | FFD1 | 3436 | 9AD1 | 1A8C | 2050 | C483 | 8E06 | E206 |
| 0000546540 | 267B | A8A3 | 260A | 1689 | 0AAA | DEE9 | 8E0B | DE06 |
| 0000546560 | 267B | 3E83 | 1DDB | 7500 | E903 | 0048 | BE83 | FE3E |
| 0000546600 | 75FE | E903 | 003E | 681E | 54A1 | 868D | FE4A | 5016 |
| 0000546620 | 468D | 16F2 | 8D50 | 3A86 | 16FE | 1E50 | 7068 | 686E |
| 0000546640 | 0250 | 36FF | 54DC | 36FF | 54DA | 36FF | 54E0 | 36FF |
| 0000546660 | 54DE | 681E | 54B3 | 1E68 | 681E | 1E21 | 249A | 001E |
| 0000546700 | 8300 | 26C4 | 9EC4 | FE42 | FF26 | 0277 | FF26 | 6A37 |
| 0000546720 | C416 | 429E | 26FE | 77FF | 26F2 | 77FF | 9AF0 | 12B1 |
| 0000546740 | 1BCD | C483 | A30A | D134 | 1689 | D136 | 9EC4 | FE42 |
| 0000546760 | C426 | F05F | FF26 | 0C77 | 36FF | D136 | 36FF | D134 |
| 0000547000 | 8C9A | AA1A | 8320 | 06C4 | 068E | 7BE2 | A326 | 0AA8 |
| 0000547020 | 8926 | AA16 | E90A | 0B33 | 9EC4 | FE42 | FF26 | 0277 |
| 0000547040 | FF26 | C437 | 429E | 26FE | 77FF | C4F8 | 429E | 26FE |
| 0000547060 | 77FF | 26F2 | 77FF | 9AF0 | 12B1 | 20E1 | C483 | 8E0A |
| 0000547100 | E206 | 267B | A8A3 | 260A | 1689 | 0AAA | FCE9 | C40A |
| 0000547120 | 429E | 26FE | 77FF | 2602 | 37FF | 9EC4 | FE42 | FF26 |
| 0000547140 | F877 | 9EC4 | FE42 | FF26 | F277 | FF26 | F077 | B19A |
| 0000547160 | 1212 | 8321 | 0AC4 | 068E | 7BE2 | A326 | 0AA8 | 8926 |
| 0000547200 | AA16 | E90A | 0AC5 | 9EC4 | FE42 | FF26 | F277 | FF26 |
| 0000547220 | F077 | 416A | 9EC4 | FE42 | FF26 | 0277 | FF26 | 9A37 |
| 0000547240 | 0ECB | 211C | C483 | 5204 | 9A50 | 12B1 | 2153 | C483 |
| 0000547260 | 8E0A | E206 | 267B | A8A3 | 260A | 1689 | 0AAA | 8AE9 |
| 0000547300 | C40A | 429E | 26FE | 77FF | 2602 | 37FF | 9EC4 | FE42 |
| 0000547320 | FF26 | F877 | 9EC4 | FE42 | FF26 | F277 | FF26 | F077 |
| 0000547340 | B19A | DB12 | 8321 | 0AC4 | 068E | 7BE2 | A326 | 0AA8 |
| 0000547360 | 8926 | AA16 | E90A | 0A53 | 068E | 7BDE | 8326 | E43E |
| 0000547400 | 001F | 0375 | 48E9 | 8300 | 3EBE | FEFE | 0375 | 3EE9 |

THU MAR 14 17:52:34 1991 TSLINT.DLL PAGE 196, LINE 11506

| | | | | | | | | |
|---|---|---|---|---|---|---|---|---|
| 0000547420 | 1E00 | BA68 | 8D54 | 4A86 | 16FE | 8D50 | F246 | 5016 |
| 0000547440 | 868D | FE3A | 5016 | 681E | 6E70 | 5D68 | FF02 | DC36 |
| 0000547460 | FF54 | DA36 | FF54 | E036 | FF54 | DE36 | 1E54 | CD68 |
| 0000547500 | 6854 | 1F7C | 7F68 | 9A1F | 1F82 | 0000 | C483 | C426 |
| 0000547520 | 429E | 26FE | 77FF | 2602 | 37FF | 196A | 9EC4 | FE42 |
| 0000547540 | FF26 | F277 | FF26 | F077 | B19A | FE12 | 8321 | 0AC4 |
| 0000547560 | 34A3 | 89D1 | 3616 | C4D1 | 429E | 26FE | 5FC4 | 26F0 |
| 0000547600 | 77FF | FF0C | 3636 | FFD1 | 3436 | 9AD1 | 1A8C | 222F |
| 0000547620 | C483 | 8E06 | E206 | 267B | A8A3 | 260A | 1689 | 0AAA |
| 0000547640 | A8E9 | C409 | 429E | 26FE | 77FF | 2602 | 37FF | 1A6A |
| 0000547660 | 9EC4 | FE42 | FF26 | F277 | FF26 | F077 | B19A | 6012 |
| 0000547700 | 8322 | 0AC4 | 068E | 7BE2 | A326 | 0AA8 | 8926 | AA16 |
| 0000547720 | E90A | 0977 | 9EC4 | FE42 | FF26 | 0277 | FF26 | 6A37 |
| 0000547740 | C426 | 429E | 26FE | 77FF | 26F2 | 77FF | 9AF0 | 12B1 |
| 0000547760 | 2278 | C483 | 520A | 6A50 | C449 | 429E | 26FE | 77FF |
| 0000550000 | 26E2 | 77FF | 9AE0 | 12B1 | 22A9 | C483 | 8E0A | E206 |
| 0000550020 | 267B | A8A3 | 260A | 1689 | 0AAA | 2EE9 | C409 | 429E |
| 0000550040 | 26FE | 77FF | 2602 | 37FF | 086A | 9EC4 | FE42 | FF26 |
| 0000550060 | FA77 | FF26 | F877 | B19A | FB12 | 8322 | 0AC4 | 068E |
| 0000550100 | 7BE2 | A326 | 0AA8 | 8926 | AA16 | E90A | 08FD | 9EC4 |
| 0000550120 | FE42 | 8B26 | 2607 | 578B | 8E02 | E206 | 267B | A8A3 |
| 0000550140 | 260A | 1689 | 0AAA | E2E9 | C408 | 429E | 26FE | 77FF |
| 0000550160 | 2602 | 37FF | 9EC4 | FE42 | FF26 | F877 | 9EC4 | FE42 |
| 0000550200 | FF26 | F277 | FF26 | F077 | B19A | 2C12 | 8323 | 0AC4 |
| 0000550220 | 068E | 7BE2 | A326 | 0AA8 | 8926 | AA16 | E90A | 08AB |
| 0000550240 | 9EC4 | FE42 | FF26 | 0277 | FF26 | 6A37 | C415 | 429E |
| 0000550260 | 26FE | 77FF | 26F2 | 77FF | 9AF0 | 12B1 | 235D | C483 |
| 0000550300 | 8E0A | E206 | 267B | A8A3 | 260A | 1689 | 0AAA | 7AE9 |
| 0000550320 | C408 | 429E | 26FE | 77FF | 2602 | 37FF | 166A | 9EC4 |
| 0000550340 | FE42 | FF26 | F277 | FF26 | F077 | B19A | 8E12 | 8323 |
| 0000550360 | 0AC4 | 068E | 7BE2 | A326 | 0AA8 | 8926 | AA16 | E90A |
| 0000550400 | 0849 | 9EC4 | FE42 | FF26 | 0277 | FF26 | 6A37 | C445 |
| 0000550420 | 429E | 26FE | 77FF | 26FA | 77FF | 9AF8 | 12B1 | 23C5 |
| 0000550440 | C483 | 8E0A | E206 | 267B | A8A3 | 260A | 1689 | 0AAA |
| 0000550460 | 18E9 | C408 | 429E | 26FE | 77FF | 2602 | 37FF | 9EC4 |
| 0000550500 | FE42 | FF26 | F877 | 9EC4 | FE42 | FF26 | F277 | FF26 |
| 0000550520 | F077 | B19A | FC12 | 8323 | 0AC4 | 068E | 7BE2 | A326 |
| 0000550540 | 0AA8 | 8926 | AA16 | E90A | 07E1 | 9EC4 | FE42 | FF26 |
| 0000550560 | 0277 | FF26 | C437 | 429E | 26FE | 77FF | C4F8 | 429E |
| 0000550600 | 26FE | 77FF | 26F2 | 77FF | 9AF0 | 12B1 | 1FA5 | C483 |
| 0000550620 | 8E0A | E206 | 267B | A8A3 | 260A | 1689 | 0AAA | AAE9 |
| 0000550640 | C407 | 429E | 26FE | 77FF | 26F2 | 77FF | 6AF0 | C441 |
| 0000550660 | 429E | 26FE | 77FF | 2602 | 37FF | CB9A | 370E | 8324 |
| 0000550700 | 04C4 | 5052 | B19A | 6E12 | 8324 | 0AC4 | 068E | 7BE2 |
| 0000550720 | A326 | 0AA8 | 8926 | AA16 | E90A | 076F | 9EC4 | FE42 |
| 0000550740 | FF26 | 0277 | FF26 | C437 | 429E | 26FE | 77FF | C4F8 |
| 0000550760 | 429E | 26FE | 77FF | 26F2 | 77FF | 9AF0 | 12B1 | 249F |
| 0000551000 | C483 | 8E0A | E206 | 267B | A8A3 | 260A | 1689 | 0AAA |
| 0000551020 | 38E9 | C407 | 429E | 26FE | 77FF | 2602 | 37FF | 266A |
| 0000551040 | 9EC4 | FE42 | FF26 | F277 | FF26 | F077 | B19A | B712 |
| 0000551060 | 8324 | 0AC4 | 5052 | 496A | 9EC4 | FE42 | FF26 | E277 |
| 0000551100 | FF26 | E077 | B19A | E812 | 8324 | 0AC4 | 068E | 7BE2 |
| 0000551120 | A326 | 0AA8 | 8926 | AA16 | E90A | 06EF | 9EC4 | FE42 |
| 0000551140 | FF26 | 0277 | FF26 | 6A37 | C408 | 429E | 26FE | 77FF |
| 0000551160 | 26FA | 77FF | 9AF8 | 12B1 | 2073 | C483 | 8E0A | E206 |
| 0000551200 | 267B | A8A3 | 260A | 1689 | 0AAA | BEE9 | C406 | 429E |
| 0000551220 | 26FE | 078B | 8B26 | 0257 | 068E | 7BE2 | A326 | 0AA8 |
| 0000551240 | 8926 | AA16 | E90A | 06A3 | 681E | 54D4 | 068E | 7C00 |
| 0000551260 | FF26 | 7A36 | 2600 | 36FF | 0078 | EA9A | 1650 | 830F |

THU MAR 14 17:52:34 1991 TSLINT.DLL PAGE 197, LINE 11565

| | | | | | | | | |
|---|---|---|---|---|---|---|---|---|
| 0000551300 | 08C4 | 003D | 7400 | E903 | 000B | 068E | 7C02 | C726 |
| 0000551320 | 5406 | 0038 | 8E00 | E206 | 2B7B | 26C0 | AAA3 | 260A |
| 0000551340 | A8A3 | E90A | 0665 | 006A | 006A | 1D6A | 9EC4 | FE42 |
| 0000551360 | FF26 | 0277 | FF26 | 9A37 | 12B1 | 25B8 | C483 | 8E0A |
| 0000551400 | E206 | 267B | A8A3 | 260A | 1689 | 0AAA | 3CE9 | C406 |
| 0000551420 | 429E | 26FE | 478B | 26F8 | 578B | 8EFA | E206 | 267B |
| 0000551440 | A8A3 | 260A | 1689 | 0AAA | 20E9 | C406 | 429E | 26FE |
| 0000551460 | 77FF | 26E2 | 77FF | 6AE0 | C43F | 429E | 26FE | 77FF |
| 0000551500 | 26FA | 77FF | 9AF8 | 141B | 25ED | C483 | 8E0A | E206 |
| 0000551520 | 267B | A8A3 | 260A | 1689 | 0AAA | 068E | 7C02 | C726 |
| 0000551540 | 5406 | 0138 | E900 | 05E3 | 9EC4 | FE42 | FF26 | FA77 |
| 0000551560 | FF26 | F877 | 3F6A | 006A | 006A | 1B9A | 2514 | 8326 |
| 0000551600 | 0AC4 | 068E | 7BE2 | A326 | 0AA8 | 8926 | AA16 | E90A |
| 0000551620 | 05B9 | 9EC4 | FE42 | FF26 | EA77 | FF26 | E877 | 9EC4 |
| 0000551640 | FE42 | FF26 | D877 | 9EC4 | FE42 | FF26 | FA77 | FF26 |
| 0000551660 | F877 | B19A | 5D12 | 8326 | 0AC4 | 068E | 7BE2 | A326 |
| 0000551700 | 0AA8 | 8926 | AA16 | E90A | 0581 | 9EC4 | FE42 | FF26 |
| 0000551720 | EA77 | FF26 | E877 | 9EC4 | FE42 | FF26 | D877 | 9EC4 |
| 0000551740 | FE42 | FF26 | FA77 | FF26 | F877 | B19A | 9512 | 8326 |
| 0000551760 | 0AC4 | 068E | 7BE2 | A326 | 0AA8 | 8926 | AA16 | E90A |
| 0000552000 | 0549 | 9EC4 | FE42 | FF26 | FA77 | FF26 | F877 | 9EC4 |
| 0000552020 | FE42 | FF26 | D877 | 9EC4 | FE42 | FF26 | EA77 | FF26 |
| 0000552040 | E877 | B19A | CD12 | 8326 | 0AC4 | 068E | 7BE2 | A326 |
| 0000552060 | 0AA8 | 8926 | AA16 | E90A | 0511 | 9EC4 | FE42 | FF26 |
| 0000552100 | FA77 | FF26 | F877 | 9EC4 | FE42 | FF26 | D877 | 9EC4 |
| 0000552120 | FE42 | FF26 | EA77 | FF26 | E877 | B19A | 1E12 | 8327 |
| 0000552140 | 0AC4 | 068E | 7BE2 | A326 | 0AA8 | 8926 | AA16 | E90A |
| 0000552160 | 04D9 | 9EC4 | FE42 | FF26 | EA77 | FF26 | E877 | 149A |
| 0000552200 | 2D51 | 8325 | 04C4 | C450 | 429E | 26FE | 77FF | 26EA |
| 0000552220 | 77FF | 9AE8 | 6DF8 | 280A | C483 | 5206 | 6A50 | C444 |
| 0000552240 | 429E | 26FE | 77FF | 26FA | 77FF | 9AF8 | 12B1 | 2747 |
| 0000552260 | C483 | 8E0A | E206 | 267B | A8A3 | 260A | 1689 | 0AAA |
| 0000552300 | 88E9 | 6A04 | 6A00 | 6A00 | C409 | 429E | 26FE | 77FF |
| 0000552320 | 2602 | 37FF | B19A | 7012 | 8327 | 0AC4 | 068E | 7BE2 |
| 0000552340 | A326 | 0AA8 | 8926 | AA16 | E90A | 045F | 006A | 006A |
| 0000552360 | 0A6A | 9EC4 | FE42 | FF26 | 0277 | FF26 | 9A37 | 12B1 |
| 0000552400 | 279A | C483 | 8E0A | E206 | 267B | A8A3 | 260A | 1689 |
| 0000552420 | 0AAA | 36E9 | 6A04 | 6A00 | 6A00 | C40B | 429E | 26FE |
| 0000552440 | 77FF | 26FA | 77FF | 9AF8 | 12B1 | 27C4 | C483 | 8E0A |
| 0000552460 | E206 | 267B | A8A3 | 260A | 1689 | 0AAA | 0CE9 | 6A04 |
| 0000552500 | 6A00 | 6A00 | C40C | 429E | 26FE | 77FF | 26FA | 77FF |
| 0000552520 | 9AF8 | 12B1 | 2860 | C483 | 8E0A | E206 | 267B | A8A3 |
| 0000552540 | 260A | 1689 | 0AAA | E2E9 | C403 | 429E | 26FE | 078B |
| 0000552560 | 8B26 | 0257 | 068E | 7BE2 | A326 | 0AA8 | 8926 | AA16 |
| 0000552600 | E90A | 03C7 | 9EC4 | FE42 | FF26 | 0677 | FF26 | 0477 |
| 0000552620 | FF26 | 0277 | FF26 | 9A37 | 6D5E | 282F | C483 | 8E08 |
| 0000552640 | E206 | 267B | A8A3 | 260A | 1689 | 0AAA | 9CE9 | 6A03 |
| 0000552660 | C4FF | 429E | 26FE | 77FF | 2602 | 37FF | F89A | 2B6D |
| 0000552700 | 830F | 06C4 | 068E | 7BE2 | A326 | 0AA8 | 8926 | AA16 |
| 0000552720 | E90A | 0377 | 9EC4 | FE42 | FF26 | 0277 | FF26 | 6A37 |
| 0000552740 | C44A | 429E | 26FE | 77FF | 26F2 | 77FF | 9AF0 | 12B1 |
| 0000552760 | 2891 | C483 | 8E0A | E206 | 267B | A8A3 | 260A | 1689 |
| 0000553000 | 0AAA | 46E9 | C403 | 429E | 26FE | 77FF | 2602 | 37FF |
| 0000553020 | 016A | 9EC4 | FE42 | FF26 | F277 | FF26 | F077 | B19A |
| 0000553040 | C212 | 8328 | 0AC4 | 068E | 7BE2 | A326 | 0AA8 | 8926 |
| 0000553060 | AA16 | E90A | 0315 | 9EC4 | FE42 | FF26 | 0277 | FF26 |
| 0000553100 | 6A37 | C402 | 429E | 26FE | 77FF | 26F2 | 77FF | 9AF0 |
| 0000553120 | 12B1 | 242D | C483 | 8E0A | E206 | 267B | A8A3 | 260A |
| 0000553140 | 1689 | 0AAA | E4E9 | C402 | 429E | 26FE | 77FF | 2602 |

THU MAR 14 17:52:34 1991 TSLINT.DLL PAGE 198, LINE 11624

| | | | | | | | | |
|---|---|---|---|---|---|---|---|---|
| 0000553160 | 37FF | 036A | 9EC4 | FE42 | FF26 | F277 | FF26 | F077 |
| 0000553200 | B19A | 2412 | 8329 | 0AC4 | 068E | 7BE2 | A326 | 0AA8 |
| 0000553220 | 8926 | AA16 | E90A | 02B3 | 9EC4 | FE42 | FF26 | 0277 |
| 0000553240 | FF26 | 6A37 | C404 | 429E | 26FE | 77FF | 26F2 | 77FF |
| 0000553260 | 9AF0 | 12B1 | 2955 | C483 | 8E0A | E206 | 267B | A8A3 |
| 0000553300 | 260A | 1689 | 0AAA | 82E9 | C402 | 429E | 26FE | 77FF |
| 0000553320 | 2602 | 37FF | 056A | 9EC4 | FE42 | FF26 | F277 | FF26 |
| 0000553340 | F077 | B19A | 7E12 | 8329 | 0AC4 | 068E | 7BE2 | A326 |
| 0000553360 | 0AA8 | 8926 | AA16 | E90A | 0251 | 006A | 006A | 0D6A |
| 0000553400 | 9EC4 | FE42 | FF26 | 0277 | FF26 | 9A37 | 12B1 | 29E8 |
| 0000553420 | C483 | 8E0A | E206 | 267B | A8A3 | 260A | 1689 | 0AAA |
| 0000553440 | 28E9 | C402 | 429E | 26FE | 078B | 8B26 | 0257 | 068E |
| 0000553460 | 7BE2 | A326 | 0AA8 | 8926 | AA16 | E90A | 020D | 068E |
| 0000553500 | 7BE2 | C02B | A326 | 0AAA | A326 | 0AA8 | FCE9 | C401 |
| 0000553520 | 429E | 26FE | 078B | 8B26 | 0257 | 068E | 7BE2 | A326 |
| 0000553540 | 0AA8 | 8926 | AA16 | E90A | 01E1 | 9EC4 | FE42 | FF26 |
| 0000553560 | 0277 | FF26 | 9A37 | 0ECB | 2A1A | C483 | 8E04 | E206 |
| 0000553600 | 267B | A8A3 | 260A | 1689 | 0AAA | BEE9 | C401 | 429E |
| 0000553620 | 26FE | 77FF | 26FA | 77FF | 6AF8 | C407 | 429E | 26FE |
| 0000553640 | 77FF | 26EA | 77FF | 9AE8 | 0ECB | 2A24 | C483 | 5204 |
| 0000553660 | 9A50 | 12B1 | 256A | C483 | 8E0A | E206 | 267B | A8A3 |
| 0000553700 | 260A | 1689 | 0AAA | 82E9 | C701 | 6A06 | 006E | E900 |
| 0000553720 | 0179 | 00B8 | 8E00 | E206 | 267B | A8A3 | A30A | 6E6A |
| 0000553740 | 68E9 | C701 | 6A06 | 006E | E900 | 015F | 00B8 | 8E00 |
| 0000553760 | E206 | 267B | A8A3 | A30A | 6E6A | 4EE9 | E901 | 014B |
| 0000554000 | 3D48 | 009C | 0376 | 42E9 | D101 | 93E0 | FF2E | 81A7 |
| 0000554020 | 902A | 9306 | CE06 | F406 | 2F06 | 4A07 | 5807 | 9207 |
| 0000554040 | A107 | BD07 | D807 | F307 | 2407 | 5508 | 7E08 | 9A08 |
| 0000554060 | B508 | F008 | 3F08 | 4B09 | 9F09 | C10A | DD0A | F80A |
| 0000554100 | 750A | 830B | 9E0B | B10B | 290B | A10C | 130C | 8B0D |
| 0000554120 | AC0D | CD0D | 0F0D | 870E | 070E | 770F | D40F | 3C0F |
| 0000554140 | AF10 | 2210 | 3311 | 8A11 | E111 | F311 | 0511 | 2F12 |
| 0000554160 | 5112 | 7B12 | 9D12 | BF12 | E112 | 0312 | C013 | 8513 |
| 0000554200 | 2C14 | 4915 | B815 | 3615 | A816 | 1216 | 7C17 | DE17 |
| 0000554220 | 4817 | AA18 | 0C18 | 6619 | 8319 | 9419 | BD19 | CE19 |
| 0000554240 | F719 | 2019 | 491A | 5A1A | 751A | FA1A | 9B1A | B81B |
| 0000554260 | D51B | F21B | 031B | 1E1C | 471C | 8C1C | A91C | C61C |
| 0000554300 | E31C | F41C | 0F1C | 381D | 7D1D | 9A1D | B71D | D41D |
| 0000554320 | 621D | 9D1E | 011E | 321F | DD1F | 881F | BF20 | F620 |
| 0000554340 | 3120 | 6821 | 1321 | 4422 | 8D22 | BE22 | D922 | 1022 |
| 0000554360 | 4123 | 7223 | A323 | DA23 | 1123 | 4C24 | 8324 | CC24 |
| 0000554400 | FD24 | 1824 | 5625 | 7F25 | 9B25 | D825 | 0225 | 3A26 |
| 0000554420 | 7226 | AA26 | E226 | 3326 | 5C27 | 8527 | AF27 | D927 |
| 0000554440 | F427 | 1F27 | 4428 | 7528 | A628 | D728 | 0828 | 3929 |
| 0000554460 | 6A29 | 9329 | AE29 | BF29 | DA29 | FD29 | BB29 | 392B |
| 0000554500 | 422A | BB2A | BB2B | 532B | 5C2A | E92A | D518 | 5F5E |
| 0000554520 | ED83 | 8B02 | 1FE5 | 4D5D | 00CB | 0000 | 0000 | 0000 |
| 0000554540 | 0000 | 0000 | 0000 | 0000 | 0000 | 8B55 | 1EEC | 8068 |
| 0000554560 | 1E6E | 8468 | 9A6E | FFFF | 0000 | 068E | 6E80 | A126 |
| 0000554600 | 0015 | C0A3 | BB6E | 6E8A | 1F8C | 85BE | 83D1 | FEE6 |
| 0000554620 | 1E56 | FF9A | 00FF | 0B00 | 74C0 | 3304 | EBC0 | 893A |
| 0000554640 | 0477 | 894E | 8836 | 836E | 03EE | 04C7 | 0001 | 7789 |
| 0000554660 | 8906 | 0877 | C683 | C702 | FE04 | 89FF | 0A77 | 681E |
| 0000554700 | 6E7E | 681E | 6E7C | FF9A | 00FF | E800 | 0020 | 9E9A |
| 0000554720 | F12E | E826 | 0066 | 01B8 | 5D00 | 50CB | 5C9A | 412E |
| 0000554740 | 9A2C | 2FD6 | 2C4F | FF68 | 9A00 | 2D65 | 2C54 | BB1E |
| 0000554760 | 000D | FF33 | 068E | 6E7E | FFB9 | 267F | 3D80 | 7500 |
| 0000555000 | 4701 | 8026 | 003D | 3174 | 9EBE | 8B6E | 8BD1 | F3CB |
| 0000555020 | 8BA6 | 74CA | 3308 | F2C0 | 74AE | EBE7 | 061C | 071E |

THU MAR 14 17:52:34 1991 TSLINT.DLL PAGE 199, LINE 11683

| | | | | | | | | |
|---|---|---|---|---|---|---|---|---|
| 0000555040 | F78B | BF1F | 6EC5 | 2CAC | 7241 | C00E | 04E0 | AC92 |
| 0000555060 | 412C | 0572 | C20A | EBAA | 1FED | 00C3 | 02BB | 5200 |
| 0000555100 | D48B | A780 | 6EC5 | 50B7 | C48B | 1653 | 1650 | 9A52 |
| 0000555120 | FFFF | 0000 | C00B | 7558 | B110 | 3C40 | 7401 | 3C06 |
| 0000555140 | 7502 | B106 | 0808 | C58F | 4B6E | D679 | E85A | 0026 |
| 0000555160 | C0BE | BF79 | 79C0 | 5FE8 | BE01 | 79C0 | C8BF | E879 |
| 0000555200 | 0156 | C8B8 | 3D79 | 79CC | 0B74 | 016A | 680E | 2D37 |
| 0000555220 | FF9A | 00FF | C300 | 0E8B | 79B6 | 2AE3 | 06C4 | 79B8 |
| 0000555240 | C28C | DB33 | IEFF | 79B4 | 0373 | 61E9 | 8E01 | 8406 |
| 0000555260 | 266E | 1E8B | 0006 | 754B | C40D | BC06 | 8C79 | BBC2 |
| 0000555300 | 0003 | 1EFF | 79B4 | B8C3 | FFFF | D88E | D5A1 | 0B70 |
| 0000555320 | 75C0 | 0E10 | 50A1 | 0B76 | 75C0 | E805 | 001F | 03EB |
| 0000555340 | 24E8 | 6A00 | 6A03 | 6A00 | 9A00 | 2D01 | 0000 | 8B55 |
| 0000555360 | 33EC | EBC9 | 551A | EC8B | 01B9 | EB00 | 5512 | EC8B |
| 0000555400 | 5756 | 00B9 | EB01 | 5508 | EC8B | 5756 | 01B9 | E801 |
| 0000555420 | 004B | 0A51 | 75C9 | BE12 | D178 | 78BF | E8D1 | 00B8 |
| 0000555440 | C8BE | BF79 | 79CC | AFE8 | BE00 | 79CC | CCBF | E879 |
| 0000555460 | 00A6 | CCBE | BF79 | 79CC | 9DE8 | E800 | 008C | 0A58 |
| 0000555500 | 75E4 | C713 | D506 | 0170 | B800 | 0001 | 8A50 | 0646 |
| 0000555520 | 9A50 | FFFF | 0000 | 4EE8 | 5F00 | 5D5E | 55CB | EC8B |
| 0000555540 | 0D6A | 63E8 | 8326 | 02C4 | 068E | 6E84 | 8B26 | 061E |
| 0000555560 | 4B00 | 168B | 70D7 | FA83 | 75FF | 8904 | D71E | 3970 |
| 0000555600 | D71E | 9F70 | 0D6A | 69E8 | 8326 | 02C4 | 749E | 6A0A |
| 0000555620 | E80E | 2614 | C483 | EB02 | 3BC7 | 74D3 | 6A08 | E80E |
| 0000555640 | 2626 | C483 | 5D02 | 55C3 | EC8B | 0D6A | 19E8 | 8326 |
| 0000555660 | 02C4 | 06C7 | 70D7 | FFFF | 0D6A | 35E8 | 8326 | 02C4 |
| 0000555700 | 0E6A | 2DE8 | 8326 | 02C4 | C35D | 0E8B | 79B6 | 07E3 |
| 0000555720 | 02BB | FF00 | B41E | C379 | F73B | 0E73 | EF83 | 8B04 |
| 0000555740 | 0B05 | 0245 | F274 | IDFF | EEEB | 00C3 | 8B55 | B8EC |
| 0000555760 | 00FC | 0E50 | 6FE8 | 8301 | DC3E | 0070 | 0474 | IEFF |
| 0000556000 | 70DA | FFB8 | 5000 | E80E | 015C | E58B | CB5D | 02B8 |
| 0000556020 | E900 | FDC7 | 5A59 | DC8B | D82B | 0B72 | FB81 | 0200 |
| 0000556040 | 0572 | E38B | 5152 | 52CB | 3351 | E9C0 | FDAD | 14C8 |
| 0000556060 | 0000 | 5657 | FF2B | F78B | 3639 | 6E7E | 0375 | F0E9 |
| 0000556100 | A100 | 6E7E | C92B | 4E89 | 89F4 | F646 | 4E89 | 89F8 |
| 0000556120 | FA46 | 0C6A | 76FF | FFFA | F876 | 681E | 6E9E | 569A |
| 0000556140 | 1251 | 832F | 0AC4 | C00B | 1A74 | 8146 | FFFE | 767F |
| 0000556160 | E903 | 00BD | 5EC4 | FFF8 | F846 | 8026 | 003F | EA75 |
| 0000556200 | EB47 | 900D | 5EC4 | FFF8 | F846 | 8026 | 003F | F475 |
| 0000556220 | 5E8B | 26F8 | 3F80 | 7500 | 8DB9 | 0145 | 6A50 | 9A04 |
| 0000556240 | 5C76 | 2F21 | C483 | 8904 | F046 | 5689 | 56F2 | B09A |
| 0000556260 | 574D | 832F | 02C4 | 4689 | 89FC | FE56 | 468B | 0BF2 |
| 0000556300 | F046 | 6D74 | C28B | 460B | 74FC | 8B66 | F046 | 568B |
| 0000556320 | A3F2 | 70CE | 1689 | 70CD | 0C6A | 76FF | FFF6 | F476 |
| 0000556340 | 681E | 6E9E | 569A | 5C51 | 832C | 0AC4 | C00B | 2C74 |
| 0000556360 | 468B | 8BFC | FE56 | 5EC4 | 83F0 | F046 | 2604 | 0789 |
| 0000556400 | 8926 | 0257 | 5EC4 | FFF4 | F446 | 8A26 | C407 | FC5E |
| 0000556420 | 46FF | 26FC | 0788 | C00A | 0E74 | E8EB | 5EC4 | FFF4 |
| 0000556440 | F446 | 8026 | 003F | F475 | 5EC4 | 26F4 | 3F80 | 7500 |
| 0000556460 | 5EA7 | C95F | 90CB | 8B55 | 56EC | B857 | 2D38 | D88E |
| 0000556500 | C08E | 568B | BE06 | 7C16 | 3BAD | 74C2 | 4010 | 7496 |
| 0000556520 | 970C | C033 | FFB9 | F2FF | 8BAE | EBF7 | 96EB | 5E5F |
| 0000556540 | E58B | CA5D | 0002 | 8B55 | 57EC | 76FF | 0E06 | C5E8 |
| 0000556560 | 0BFF | 74C0 | 921F | FA8B | C033 | FFB9 | F2FF | F7AE |
| 0000556600 | 49D1 | 8B50 | BBC4 | 0002 | 1E53 | 5152 | 5016 | FF9A |
| 0000556620 | 00FF | 5B00 | 8B5F | 5DE5 | 02CA | 0000 | 1601 | 0202 |
| 0000556640 | 0203 | 1804 | 0D05 | 0906 | 0C07 | 0C08 | 0C09 | 070A |
| 0000556660 | 080B | 160C | 160D | 020F | 0D10 | 1211 | 0212 | 0235 |
| 0000556700 | 0D41 | 0243 | 0D52 | 0D53 | 0D57 | 0B59 | 0D6C | 206D |

THU MAR 14 17:52:34 1991 TSLINT.DLL PAGE 200, LINE 11742

| | | | | | | | | |
|---|---|---|---|---|---|---|---|---|
| 0000556720 | 1C70 | 0972 | 1606 | 0A80 | 0A81 | 0982 | 0D84 | 0BA4 |
| 0000556740 | 02CE | 0BD7 | 0D00 | 1608 | 8B52 | E8D8 | 2552 | 8E93 |
| 0000556760 | 5AC2 | 8926 | 0247 | 8926 | B817 | FFFF | 8B99 | 5DE5 |
| 0000557000 | E8CB | 0008 | FFB8 | 99FF | E58B | CB5D | D88B | 2FE8 |
| 0000557020 | 9325 | C28E | 8926 | 0247 | BB53 | 300C | 24B9 | 0A00 |
| 0000557040 | 75E4 | 2E1B | 073A | 1674 | 4343 | F7E2 | 133C | 0472 |
| 0000557060 | 243C | 0A76 | 3C43 | 72BC | 3C04 | 76CA | 4301 | 8A2E |
| 0000557100 | 0147 | 5B98 | 8926 | C307 | 8B55 | BBEC | 0002 | 05EB |
| 0000557120 | 8B55 | 33EC | E8DB | 24E8 | C303 | CB5D | 04C8 | 0000 |
| 0000557140 | 46C7 | FFFC | C4FF | 065E | F626 | 0A47 | 7440 | 2607 |
| 0000557160 | 47C6 | 000A | 2CEB | C38B | E82D | B970 | 000C | F799 |
| 0000557200 | 89F9 | FE46 | E850 | 22F0 | C483 | FF02 | 0876 | 76FF |
| 0000557220 | 9A06 | 3118 | 3132 | C483 | 8904 | FC46 | 76FF | E8FE |
| 0000557240 | 22E2 | 468B | C9FC | 90CB | 10C8 | 0000 | 5657 | FFBF |
| 0000557260 | 8BFF | 0676 | 44F6 | 830A | 0375 | 97E9 | 1E00 | 9A56 |
| 0000557300 | 38B0 | 3157 | C483 | 8B04 | 8BF8 | 81DE | E8EB | 8B70 |
| 0000557320 | CC87 | 8972 | FA46 | 561E | E9E8 | 8304 | 04C4 | 448A |
| 0000557340 | 2A0B | 50E4 | DE9A | 7247 | 8331 | 02C4 | C00B | 617C |
| 0000557360 | 7E83 | 00FA | 5E74 | 681E | 70E2 | 468D | 16F0 | 9A50 |
| 0000557400 | 50B4 | 3192 | C483 | 8D08 | F246 | 4689 | 8CFC | FE56 |
| 0000557420 | 7E80 | 5CF0 | 1474 | 681E | 70E4 | 468D | 16F0 | 9A50 |
| 0000557440 | 506E | 31AB | C483 | EB08 | 9004 | 4EFF | 6AFC | FF0A |
| 0000557460 | FE76 | 76FF | FFFC | FA76 | 4C9A | B852 | 8331 | 08C4 |
| 0000557500 | 468D | 16F0 | 9A50 | 7964 | 2ED1 | C483 | 0B04 | 74C0 |
| 0000557520 | BF03 | FFFF | 44C6 | 000A | C78B | 5F5E | CBC9 | 08C8 |
| 0000557540 | 0000 | BC9A | FC46 | 8931 | FC46 | 5689 | 0BFE | 75D0 |
| 0000557560 | 2B05 | 99C0 | 37EB | 76FF | 50FE | 76FF | FF0E | 0C76 |
| 0000557600 | 76FF | FF0A | 0876 | 76FF | 9A06 | 36B8 | 3234 | C483 |
| 0000557620 | 890E | F846 | 5689 | 8BFA | FC46 | E82D | B970 | 000C |
| 0000557640 | F799 | 50F9 | DDE8 | 8B21 | F846 | 568B | C9FA | 90CB |
| 0000557660 | 8B55 | 6AEC | FF40 | 0C76 | 76FF | FF0A | 0876 | 76FF |
| 0000557700 | 9A06 | 31CE | 3104 | CBC9 | 08C8 | 0000 | 5657 | 768B |
| 0000557720 | 8B06 | 2DC6 | 70E8 | 0CB9 | 9900 | F9F7 | 4689 | 50FA |
| 0000557740 | 95E8 | 8321 | 02C4 | 561E | 4FE8 | 8305 | 04C4 | F88B |
| 0000557760 | 468D | 160E | FF50 | 0C76 | 76FF | 1E0A | 9A56 | 41D2 |
| 0000560000 | 31D5 | C483 | 890C | F846 | 561E | E857 | 05A4 | C483 |
| 0000560020 | FF06 | FA76 | 6DE8 | 8321 | 02C4 | 468B | 5EF8 | C95F |
| 0000560040 | 90CB | 8B55 | 8BEC | 0E46 | E82D | 9970 | 0CB9 | F700 |
| 0000560060 | 50F1 | 43E8 | 8321 | 02C4 | FF50 | 1076 | 76FF | FF0E |
| 0000560100 | 0C76 | 76FF | FF0A | 0876 | 76FF | 0E06 | 0DE8 | 8300 |
| 0000560120 | 0CC4 | 535B | 2DE8 | 8321 | 02C4 | CB5D | 8B55 | 83EC |
| 0000560140 | 04EC | 5756 | 468B | F70A | 0C66 | C88B | CA0B | 6174 |
| 0000560160 | 4689 | 89FC | FE56 | 5EC4 | 8B06 | 0E76 | D20B | 1F75 |
| 0000560200 | FF3D | 74FF | 8B1A | 03CB | 72C8 | 5014 | 5253 | C88B |
| 0000560220 | 6AEB | 8B00 | 5AC8 | 585B | C12B | DA83 | EB00 | 833C |
| 0000560240 | 01FB | 0577 | 00B9 | EB80 | 8B04 | F7CB | 51D9 | 5350 |
| 0000560260 | E852 | 0049 | C88B | 5B5A | 5F58 | C12B | DA83 | 3B00 |
| 0000560300 | 72CF | 0318 | 73D9 | 8C0C | 81C1 | FFC1 | 8EFF | EBC1 |
| 0000560320 | EB02 | 8B24 | 0BC8 | 75CA | EBA3 | 8B00 | 0BC8 | 74CA |
| 0000560340 | 8B13 | FC4E | C82B | C18B | 4E8B | 1BFE | 8BCA | F7D1 |
| 0000560360 | 0A76 | 03EB | 468B | 5F0C | 8B5E | 5DE5 | 55CB | EC8B |
| 0000560400 | EC83 | 8904 | FE4E | C8BF | 8B72 | 2DC6 | 70E8 | F803 |
| 0000560420 | 44F6 | 0C0A | 0575 | 05F6 | 7401 | 8B05 | 0245 | 03EB |
| 0000560440 | 00B8 | 8902 | FC46 | 44F6 | 080A | 0575 | 05F6 | 7401 |
| 0000560460 | 8B36 | 0444 | C00B | 2F74 | C13B | 0276 | C18B | 5350 |
| 0000560500 | 0651 | 0650 | FF53 | 0274 | 34FF | E30E | 3270 | C483 |
| 0000560520 | 070A | 5B59 | 2358 | 29C8 | 0444 | D803 | 0401 | 00EB |
| 0000560540 | C90B | C275 | 83E9 | 3B00 | FC4E | 5072 | 44F6 | 080A |
| 0000560560 | 0575 | 05F6 | 7401 | 5313 | 0651 | 561E | E80E | 04C0 |

THU MAR 14 17:52:34 1991 TSLINT.DLL PAGE 201, LINE 11801

| | | | | | | | | |
|---|---|---|---|---|---|---|---|---|
| 0000560600 | C483 | 0704 | 5B59 | C00B | 6075 | D233 | C18B | 76F7 |
| 0000560620 | 8BFC | 2BC1 | 50C2 | 5153 | 5006 | 5306 | C033 | 448A |
| 0000560640 | 500B | E80E | 17C6 | C483 | 0708 | 5B59 | 3D5A | FFFF |
| 0000560660 | 3474 | C82B | C23B | 2E75 | D803 | A4EB | C033 | 8A26 |
| 0000560700 | 5307 | 0651 | 561E | 0E50 | 13E8 | 8301 | 06C4 | 5907 |
| 0000560720 | 3D5B | FFFF | 1474 | 4943 | 458B | 0B02 | 75C0 | 4001 |
| 0000560740 | 4689 | E9FC | FF7A | 4C80 | 200A | 468B | 2BFE | 8BC1 |
| 0000560760 | 5DE5 | 00C3 | 08C8 | 0000 | B857 | 0001 | E850 | 1F78 |
| 0000561000 | C483 | 1E02 | F468 | E870 | 0330 | C483 | 8B04 | 8DF8 |
| 0000561020 | 0A46 | 5016 | 76FF | FF08 | 0676 | 681E | 70F4 | D29A |
| 0000561040 | 7041 | 8332 | 0CC4 | 4689 | 1EF8 | F468 | 5770 | 81E8 |
| 0000561060 | 8303 | 06C4 | 016A | 4BE8 | 831F | 02C4 | 468B | 5FF8 |
| 0000561100 | CBC9 | 8B55 | 56EC | 8B57 | 0676 | 448A | A80A | 7483 |
| 0000561120 | A85F | 7540 | A85B | 7502 | 0C48 | 8801 | 0A44 | FE8B |
| 0000561140 | EF81 | 70E8 | C781 | 72C8 | 0CA8 | 0D75 | 05F6 | 7501 |
| 0000561160 | 1E08 | E856 | 0186 | C483 | 8B04 | 0644 | 0489 | 75FF |
| 0000561200 | FF02 | 0874 | 3350 | 8ADB | 0B5C | 0E53 | 75E8 | 8315 |
| 0000561220 | 08C4 | C00B | 1174 | FF3D | 75FF | 801A | 0A4C | EB20 |
| 0000561240 | 800A | 0A4C | EB20 | 8009 | 0A4C | C710 | 0444 | 0000 |
| 0000561260 | FFB8 | EBFF | 8A25 | C5BF | 806E | 82E7 | FF80 | 7582 |
| 0000561300 | 8A0B | 0A7C | C7F6 | 7582 | 8003 | 200D | 8948 | 0444 |
| 0000561320 | 1CC4 | C033 | 8A26 | 4307 | 1C89 | 5E5F | CB5D | 8B55 |
| 0000561340 | 56EC | 8B57 | 0876 | 448A | A80A | 7482 | A864 | 7540 |
| 0000561360 | C760 | 0444 | 0000 | 01A8 | 0B74 | 10A8 | 5374 | 4C8B |
| 0000561400 | 8906 | 240C | 0CFE | 2402 | 88EF | 0A44 | FE8B | EF81 |
| 0000561420 | 70E8 | C781 | 72C8 | DB33 | 5C8A | A80B | 7508 | A84B |
| 0000561440 | 7504 | F618 | 0105 | 4275 | FE81 | 70F4 | 0674 | FE81 |
| 0000561460 | 7100 | 2675 | 87F6 | 6EC5 | 7440 | B91F | 0001 | 1651 |
| 0000561500 | 7E8D | 5706 | 0E53 | 23E8 | 8316 | 08C4 | 01B9 | EB00 |
| 0000561520 | B846 | FFFF | 4C80 | 200A | 65EB | 1E53 | E856 | 009C |
| 0000561540 | C483 | 5B04 | 44F6 | 080A | D174 | 0C8B | 548B | 2B06 |
| 0000561560 | 42CA | 1489 | 558B | 4A02 | 5489 | E304 | 5125 | FF51 |
| 0000561600 | 0874 | 74FF | 5306 | E80E | 15E2 | C483 | 5908 | 7CC4 |
| 0000561620 | 8B06 | 0656 | 8826 | 3B15 | 75C1 | 33B6 | 8AC0 | 0646 |
| 0000561640 | 1DEB | C033 | 87F6 | 6EC5 | 7420 | B9E3 | 0002 | 5051 |
| 0000561660 | 5350 | E80E | 1202 | C483 | 3308 | 8BC0 | EBC8 | 5FCF |
| 0000561700 | 5D5E | 00CB | 8B55 | 56EC | 768B | 8A04 | 0A44 | 83A8 |
| 0000561720 | 2674 | 08A8 | 2274 | 74FF | FF08 | 0674 | BA9A | 914D |
| 0000561740 | 8334 | 04C4 | 6480 | F70A | C033 | 4489 | 8906 | 0844 |
| 0000561760 | 0489 | 4489 | 8902 | 0444 | 5D5E | 00C3 | 8B55 | 56EC |
| 0000562000 | 768B | B804 | 0200 | 9A50 | 4DB0 | 364F | 8B59 | 81DE |
| 0000562020 | E8EB | 8170 | C8C3 | 0B72 | 74D2 | 800B | 0A4C | C708 |
| 0000562040 | 0247 | 0200 | 0EEB | 4C80 | 040A | 47C7 | 0102 | 8C00 |
| 0000562060 | 8DDA | 0147 | 5489 | 8902 | 8904 | 0854 | 4489 | C706 |
| 0000562100 | 0444 | 0000 | 5D5E | 00C3 | 08C8 | 0000 | 5657 | 5EC4 |
| 0000562120 | 260A | 078A | 3D98 | 0077 | 4874 | 0877 | 612C | 4C74 |
| 0000562140 | 112C | 0674 | C02B | E999 | 00CC | F62B | 46C6 | 01FC |
| 0000562160 | 46C7 | 01FE | FF00 | 0A46 | 5EC4 | 260A | 3F80 | 7400 |
| 0000562200 | 835B | FE7E | 7400 | 2655 | 078A | 3D98 | 0074 | 3474 |
| 0000562220 | 0877 | 2B2C | 1C74 | 372C | 3674 | 46C7 | 00FE | EB00 |
| 0000562240 | 90D4 | 01BE | C603 | FC46 | EB02 | 90C5 | 09BE | EB01 |
| 0000562260 | 90F4 | C6F7 | 0002 | E275 | CE83 | 8302 | FEE6 | 46C6 |
| 0000562300 | 80FC | B1EB | C6F7 | C000 | D075 | CE81 | 4000 | A5EB |
| 0000562320 | C6F7 | C000 | C475 | CE81 | 8000 | 99EB | A468 | FF01 |
| 0000562340 | 0E76 | FF56 | 0876 | 76FF | 9A06 | 4896 | 367A | C483 |
| 0000562360 | 890A | FA46 | C00B | 037D | 69E9 | FFFF | E606 | 8B70 |
| 0000562400 | 107E | C78B | E82D | 0570 | 72C8 | 4689 | 8AF8 | FC46 |
| 0000562420 | 4588 | 8B0A | F85E | 07C6 | 2B00 | 89C0 | 0445 | 4789 |
| 0000562440 | 8904 | 0245 | 0589 | 4589 | 8908 | 0645 | 468A | 88FA |

THU MAR 14 17:52:34 1991 TSLINT.DLL PAGE 202, LINE 11860

| | | | | | | | | |
|---|---|---|---|---|---|---|---|---|
| 0000562460 | 0B45 | C78B | DA8C | 5F5E | CBC9 | 8B55 | 56EC | 8B57 |
| 0000562500 | 0476 | ACBB | 8174 | F4FE | 7470 | BB09 | 74B0 | FE81 |
| 0000562520 | 7100 | 5875 | FE8B | EF81 | 70E8 | C781 | 72C8 | 44F6 |
| 0000562540 | 0C0A | 4875 | 05F6 | 7501 | 8B43 | 8B07 | 0257 | C88B |
| 0000562560 | CA0B | 2174 | 4489 | 8906 | 0854 | 0489 | 5489 | C702 |
| 0000562600 | 0444 | 0200 | 45C7 | 0002 | 8002 | 0A4C | C602 | 1105 |
| 0000562620 | 01B8 | EB00 | 5319 | 00B8 | 5002 | B09A | 5C4D | 5B37 |
| 0000562640 | 0B5B | 74D2 | 8907 | 8907 | 0257 | C8EB | C033 | 5E5F |
| 0000562660 | C35D | 8B55 | 56EC | 8B57 | 0676 | FE8B | EF81 | 70E8 |
| 0000562700 | C781 | 72C8 | 05F6 | 7410 | 332D | 8ADB | 0B5C | 87F6 |
| 0000562720 | 6EC5 | 7440 | 1E21 | 0E56 | 65E8 | 8300 | 04C4 | 7E83 |
| 0000562740 | 0004 | 1274 | C033 | 0588 | 4589 | 8902 | 8904 | 0244 |
| 0000562760 | 4489 | 8906 | 0844 | 5E5F | C35D | 04C8 | 0000 | 468B |
| 0000563000 | 0B08 | 0646 | 0875 | 006A | A7E8 | EB00 | 9031 | 468B |
| 0000563020 | 2D06 | 70E8 | 0CB9 | 9900 | F9F7 | 4689 | 50FC | 57E8 |
| 0000563040 | 831B | 02C4 | 76FF | FF08 | 0676 | B09A | F438 | 8338 |
| 0000563060 | 04C4 | 4689 | FFFE | FC76 | 49E8 | 8B1B | FE46 | CBC9 |
| 0000563100 | 02C8 | 0000 | 5657 | FF2B | 768B | 8A06 | 0A44 | C88B |
| 0000563120 | 0324 | 023C | 3F75 | C1F6 | 7508 | 8B0D | 81DE | E8EB |
| 0000563140 | F670 | C887 | 0172 | 2D74 | 048B | 442B | 8906 | FE46 |
| 0000563160 | C00B | 217E | FF50 | 0874 | 74FF | 8A06 | 0B4C | ED2A |
| 0000563200 | 9A51 | 4BDC | 3971 | C483 | 3908 | FE46 | 0774 | 4C80 |
| 0000563220 | 200A | FFBF | 8BFF | 0644 | 548B | 8908 | 8904 | 0254 |
| 0000563240 | 44C7 | 0004 | 8B00 | 5EC7 | C95F | 90CB | 016A | 01E8 |
| 0000563260 | CB00 | 04C8 | 0000 | 5657 | E8BE | 2B70 | 89FF | FE7E |
| 0000563300 | 026A | 03E8 | 831B | 02C4 | 11EB | 46C7 | FFFE | FFFF |
| 0000563320 | FC76 | AFE8 | 831A | 02C4 | C683 | 390C | A836 | 7274 |
| 0000563340 | 8B2B | 2DC6 | 70E8 | 0CB9 | 9900 | F9F7 | 4689 | 50FC |
| 0000563360 | 85E8 | 831A | 02C4 | 44F6 | 830A | D374 | 561E | B09A |
| 0000563400 | 0D38 | 8338 | 04C4 | 7440 | 47C1 | C3EB | 026A | E1E8 |
| 0000563420 | 831A | 02C4 | 7E83 | 0104 | 0475 | C78B | 03EB | 468B |
| 0000563440 | 5EFE | C95F | 02C2 | 9000 | 8B55 | B8EC | 01B4 | 849A |
| 0000563460 | 522E | 573B | C656 | B846 | 2B00 | 89C0 | E846 | 4689 |
| 0000563500 | C4C6 | 0A5E | 8026 | 003F | 0375 | 5FE9 | 2607 | 1F8A |
| 0000563520 | FF2A | 87F6 | 754F | 7408 | FF2D | E84E | 468D | 16E8 |
| 0000563540 | FF50 | 0876 | 76FF | E806 | 07C6 | FF50 | 0876 | 76FF |
| 0000563560 | E806 | 07A0 | 46FF | C40A | 0A5E | 8A26 | 2A1F | F6FF |
| 0000563600 | 4F87 | 0875 | EE75 | 5E8B | 260A | 3F80 | 7425 | E903 |
| 0000563620 | 06F2 | 46C6 | 00C0 | C02A | 4688 | 88FC | B646 | 4688 |
| 0000563640 | 88F2 | F646 | 4688 | 88EE | 5286 | 2BFE | 89C0 | EA46 |
| 0000563660 | 4689 | 89BA | FE46 | 4689 | 89C4 | C246 | 68EB | 9090 |
| 0000563700 | 46FF | C40A | DA5E | 8A26 | 2A07 | 8BE4 | F6F8 | 4F85 |
| 0000563720 | 0475 | 1A74 | 46FF | 8BBA | FE46 | C88B | E0C1 | 0302 |
| 0000563740 | D1C1 | 03E0 | 2DC7 | 0030 | 4689 | EBFE | 9039 | 6C3D |
| 0000563760 | 7400 | 771C | 3C2D | 744C | 7F13 | 2C1F | 742A | 2C15 |
| 0000564000 | 741C | EB23 | 901D | 46FE | EBFC | 901B | 46FE | FEF6 |
| 0000564020 | F646 | 12EB | 46FE | EBEE | 900D | 4E2C | 0874 | 1A2C |
| 0000564040 | E474 | 86FE | FE52 | BE80 | FE52 | 7400 | 8093 | EE7E |
| 0000564060 | 7500 | C414 | 0E5E | 4683 | 040E | 8B26 | 2607 | 578B |
| 0000564100 | 8902 | F846 | 5689 | C6FA | 5286 | 00FE | 5EC4 | 260A |
| 0000564120 | 078A | 200C | E42A | F88B | FF83 | 746E | 8329 | 63FF |
| 0000564140 | 1674 | FF83 | 747B | 8D11 | E846 | 5016 | 76FF | FF08 |
| 0000564160 | 0676 | BBE8 | EB06 | 900D | 46FF | FFE8 | 0876 | 76FF |
| 0000564200 | E806 | 0662 | F08B | 7E83 | 00BA | 0974 | 7E83 | 00FE |
| 0000564220 | 0375 | 83E9 | 8B05 | E9C7 | 05A0 | 7E83 | 00BA | 0675 |
| 0000564240 | 46FF | FFBA | FE46 | 46C7 | BABC | 8C74 | BE5E | 23EB |
| 0000564260 | 46C7 | B4BC | EB74 | 90F4 | 46FF | C40A | 0A5E | 5E89 |
| 0000564300 | 8CBC | BE46 | 8026 | 5E3F | 0C75 | 478D | 8901 | BC46 |
| 0000564320 | 468C | FEBE | B64E | 206A | 006A | 468D | 16C8 | 9A50 |

THU MAR 14 17:52:34 1991 TSLINT.DLL PAGE 203, LINE 11919

| | | | | | | | | |
|---|---|---|---|---|---|---|---|---|
| 0000564340 | 668C | 389D | C483 | 8308 | 7BFF | 0374 | A9E9 | C400 |
| 0000564360 | BC5E | 8026 | 5D3F | 0374 | 9DE9 | C600 | C046 | FF5D |
| 0000564400 | BC46 | 46C6 | 20D3 | 8FE9 | 9000 | 8A26 | 8807 | F446 |
| 0000564420 | 46FF | 3CBC | 752D | 800F | C07E | 7400 | 8B09 | BC5E |
| 0000564440 | 8026 | 5D3F | 1E75 | 5E8A | 88F4 | C05E | 01B0 | CB8A |
| 0000564460 | E180 | C007 | 03EB | FF2A | 568D | 03C8 | D2DA | 36E0 |
| 0000564500 | 0708 | 54EB | 46FF | 26BC | 078A | 4688 | 3AF4 | C046 |
| 0000564520 | 0676 | 4688 | EBF0 | 900D | 468A | 88C0 | F046 | 468A |
| 0000564540 | 88F4 | C046 | 468A | 88C0 | F446 | 1CEB | 5E8A | B0F4 |
| 0000564560 | 8A01 | 80CB | 07E1 | EBC0 | 2A03 | 8DFF | C856 | DA03 |
| 0000564600 | E0D2 | 0836 | FE07 | F446 | 468A | 98F0 | 4E8A | 2AF4 |
| 0000564620 | 3BED | 7DC1 | 88D7 | C06E | 5EC4 | 26BC | 3F80 | 745D |
| 0000564640 | E903 | FF66 | 8026 | 003F | 0375 | FFE9 | 8304 | 7BFF |
| 0000564660 | 0A75 | C38B | C28C | 4689 | 890A | 0C56 | 468B | 8BF8 |
| 0000564700 | FA56 | 8689 | FE54 | 9689 | FE56 | 7E83 | 00BA | 0A74 |
| 0000564720 | 468B | FFFE | FE4E | C00B | 4E74 | FE83 | 74FF | 8B49 |
| 0000564740 | C1DE | 03FB | 468D | 03C8 | 36D8 | 078A | 4632 | 98B6 |
| 0000564760 | 01BA | 8B00 | 8BCE | 80D9 | 07E1 | E2D3 | C285 | 2874 |
| 0000565000 | 7E80 | 00EE | 0E75 | C68B | 5EC4 | FFF8 | F846 | 8826 |
| 0000565020 | EB07 | 9005 | 86FF | FE54 | 46FF | FFE8 | 0876 | 76FF |
| 0000565040 | E806 | 04C2 | F08B | A2EB | 4EFF | 56E8 | 76FF | FF08 |
| 0000565060 | 0676 | DFE8 | 8B04 | F846 | 568B | 39FA | 5486 | 75FE |
| 0000565100 | 3909 | 5696 | 75FE | E903 | 0462 | 7E80 | 00EE | 0374 |
| 0000565120 | 29E9 | FF04 | C646 | FF83 | 7563 | E903 | 041E | C28E |
| 0000565140 | D88B | C626 | 0007 | 13E9 | 9004 | 64BF | 8300 | 2DFE |
| 0000565160 | 0675 | 46FE | EBF2 | 9006 | FE83 | 752B | FF1F | FE4E |
| 0000565200 | 0C75 | 7E83 | 00BA | 0674 | 86FE | FE52 | 0EEB | 46FF |
| 0000565220 | FFE8 | 0876 | 76FF | E806 | 044C | F08B | FE83 | 7430 |
| 0000565240 | E903 | 0155 | 46FF | FFE8 | 0876 | 76FF | E806 | 0436 |
| 0000565260 | F08B | 783C | 0474 | 583C | 1475 | 46FF | FFE8 | 0876 |
| 0000565300 | 76FF | E806 | 0420 | F08B | 78BF | E900 | 012B | 46FF |
| 0000565320 | 83EA | 78FF | 0674 | 6FBF | E900 | 011D | 4EFF | 56E8 |
| 0000565340 | 76FF | FF08 | 0676 | 2BE8 | BE04 | 0030 | 0AE9 | 9001 |
| 0000565360 | 7E80 | 00FC | 0675 | 46FE | BFF6 | 0046 | FE83 | 752D |
| 0000565400 | FE05 | F246 | 08EB | FE83 | 742B | E903 | 00EB | 4EFF |
| 0000565420 | 74FE | E903 | 0095 | 7E83 | 00BA | 0375 | 8CE9 | FE00 |
| 0000565440 | 5286 | E9FE | 00D3 | FF83 | 7478 | 830D | 70FF | 0874 |
| 0000565460 | FF83 | 7446 | E903 | 0084 | 84F6 | 754F | 7480 | 6A15 |
| 0000565500 | 8D04 | C246 | 5016 | E89A | 4779 | 563E | 79E8 | 8B03 |
| 0000565520 | EBF0 | 9036 | FF83 | 7546 | 832C | EA7E | 7400 | 8326 |
| 0000565540 | 3AFE | 1C75 | 468B | 89C2 | EC46 | C02B | 4689 | 89C4 |
| 0000565560 | C246 | 46C7 | FFEA | BFFF | 0070 | 30BE | EB00 | 900A |
| 0000565600 | 46C7 | 00EA | FE00 | 5286 | 80FE | 52BE | 00FE | 5C75 |
| 0000565620 | 46FF | 8DEA | D044 | 0199 | C246 | 5611 | 83C4 | BA7E |
| 0000565640 | 7400 | FF08 | FE4E | 0375 | 74E9 | FFFF | E846 | 76FF |
| 0000565660 | FF08 | 0676 | 2FE8 | 8B03 | EBF0 | 903E | 84F6 | 754F |
| 0000565700 | 7404 | 83C2 | 6FFF | 1475 | FE83 | 7D38 | 6AB8 | 8D03 |
| 0000565720 | C246 | 5016 | E89A | 5879 | EB3E | 90AE | 006A | 0A6A |
| 0000565740 | 468D | 16C2 | 9A50 | 79A4 | 39A1 | 9DEB | 4EFF | 56E8 |
| 0000565760 | 76FF | FF08 | 0676 | 1BE8 | 8003 | 52BE | 00FE | 0375 |
| 0000566000 | 23E9 | 83FF | 70FF | 0F75 | 7E80 | 00F6 | 0974 | 468B |
| 0000566020 | 8BEC | C24E | 4689 | 80C4 | F27E | 7400 | F70A | C25E |
| 0000566040 | 5683 | 00C4 | 5EF7 | 83C4 | 46FF | 0575 | 46C7 | 00EA |
| 0000566060 | 8300 | EA7E | 7500 | E903 | 0272 | 7E80 | 00EE | 0374 |
| 0000566100 | 39E9 | FF02 | C646 | 7E80 | 00F6 | 1474 | 468B | 8BC2 |
| 0000566120 | C456 | 5EC4 | 26F8 | 0789 | 8926 | 0257 | 1DE9 | 9002 |
| 0000566140 | 468B | C4C2 | F85E | 8926 | E907 | 0210 | 468B | 99E8 |
| 0000566160 | 4689 | 89C2 | C456 | CEEB | 868D | FE58 | 4689 | 8CBC |
| 0000566200 | BE56 | FE83 | 752D | 8B13 | 36D8 | 07C6 | 8D2D | 5986 |

THU MAR 14 17:52:34 1991 TSLINT.DLL PAGE 204, LINE 11978

| | | | | | | | | |
|---|---|---|---|---|---|---|---|---|
| 0000566220 | 89FE | BC46 | 568C | EBBE | 9006 | FE83 | 752B | FF11 |
| 0000566240 | FE4E | 46FF | FFE8 | 0876 | 76FF | E806 | 0238 | F08B |
| 0000566260 | 7E83 | 00BA | 0774 | 7E81 | 5DFE | 7E01 | C72D | FE46 |
| 0000566300 | 015D | 26EB | 468B | FFFE | FE4E | C00B | 2374 | 46FF |
| 0000566320 | 8BEA | C4C6 | BC5E | 46FF | 26BC | 0788 | 46FF | FFE8 |
| 0000566340 | 0876 | 76FF | E806 | 01FE | F08B | 84F6 | 754F | 7504 |
| 0000566360 | 83D3 | 2EFE | 4375 | 468B | FFFE | FE4E | C00B | 3974 |
| 0000566400 | 5EC4 | FFBC | BC46 | C626 | 2E07 | 18EB | 468B | FFFE |
| 0000566420 | FE4E | C00B | 2374 | 46FF | 8BEA | C4C6 | BC5E | 46FF |
| 0000566440 | 26BC | 0788 | 46FF | FFE8 | 0876 | 76FF | E806 | 01B6 |
| 0000566460 | F08B | 84F6 | 754F | 7504 | 83D3 | EA7E | 7500 | E903 |
| 0000566500 | 0081 | C68B | 653C | 0474 | 453C | 7775 | 468B | FFFE |
| 0000566520 | FE4E | C00B | 6D74 | 5EC4 | FFBC | BC46 | C626 | 6507 |
| 0000566540 | 46FF | FFE8 | 0876 | 76FF | E806 | 017A | F08B | FE83 |
| 0000566560 | 752D | C40F | BC5E | 46FF | 26BC | 07C6 | EB2D | 9008 |
| 0000566600 | 9090 | FE83 | 752B | 8B35 | FE46 | 4EFF | 0BFE | 75C0 |
| 0000566620 | FF1D | FE46 | 26EB | 468B | FFFE | FE4E | C00B | 2374 |
| 0000566640 | 46FF | 8BEA | C4C6 | BC5E | 46FF | 26BC | 0788 | 46FF |
| 0000566660 | FFE8 | 0876 | 76FF | E806 | 012C | F08B | 84F6 | 754F |
| 0000566700 | 7504 | FFD3 | E84E | FF56 | 0876 | 76FF | E806 | 0144 |
| 0000566720 | 7E83 | 00EA | 0375 | D3E9 | 8000 | EE7E | 7400 | E903 |
| 0000566740 | 009A | 46FF | C4C6 | BC5E | C626 | 0007 | 868D | FE58 |
| 0000566760 | 5016 | 76FF | FFFA | F876 | 468A | 98F6 | 8E50 | 0406 |
| 0000567000 | 267C | 1EFF | 7538 | C483 | EB0A | 9071 | 5EC4 | 260A |
| 0000567020 | 078A | E42A | C63B | 1274 | 4EFF | 56E8 | 76FF | FF08 |
| 0000567040 | 0676 | EFE8 | E900 | 0084 | 9090 | 4EFE | 80B8 | EE7E |
| 0000567060 | 7500 | 8349 | 0E6E | EB04 | 9043 | 632D | 3D00 | 0018 |
| 0000567100 | CA77 | E0D1 | 2E93 | A7FF | 40BA | 3B0A | 3D6C | 3EE8 |
| 0000567120 | 3EE8 | 3EE8 | 407C | 3CDA | 407C | 407C | 407C | 407C |
| 0000567140 | 3EDC | 3D6C | 3D60 | 407C | 407C | 3B20 | 407C | 3D6C |
| 0000567160 | 407C | 407C | 3CDD | 407C | 407C | 3B28 | 46FE | FFB8 |
| 0000567200 | 0A46 | 20EB | 46FF | FFE8 | 0876 | 76FF | E806 | 0056 |
| 0000567220 | F08B | 5EC4 | FF0A | 0A46 | 8A26 | 2A07 | 3BE4 | 74F0 |
| 0000567240 | E903 | FF74 | FE83 | 74FF | E903 | F895 | FE83 | 75FF |
| 0000567260 | 830C | C67E | 7500 | 8006 | B87E | 7400 | 8B05 | C646 |
| 0000567300 | 02EB | C68B | 5F5E | CBC9 | 8B55 | 8BEC | 045E | 87F6 |
| 0000567320 | 754F | 7404 | 8B05 | EBC3 | 9008 | C38B | DF24 | 072D |
| 0000567340 | C900 | 02C2 | 9000 | 04C8 | 0000 | 5EC4 | 2604 | 4FFF |
| 0000567360 | 7804 | 2615 | 078B | 8B26 | 0257 | FF[illegible]6 | 8B07 | 8ED8 |
| 0000567400 | 26C2 | 078A | E42A | 07EB | 5306 | B29A | 9934 | C941 |
| 0000567420 | 04C2 | 9000 | 8B55 | 83EC | 087E | 74FF | FF0E | 0676 |
| 0000567440 | 76FF | FF04 | 0876 | 749A | B947 | C93D | 06C2 | 9000 |
| 0000567460 | 8B55 | 56EC | 5EC4 | 2608 | 07FF | 76FF | FF06 | 0476 |
| 0000567500 | A3E8 | 8BFF | F6F0 | 4F84 | 0875 | E875 | C95E | 08C2 |
| 0000567520 | 9000 | 422A | 4235 | 424B | 427F | 42AB | 42B3 | 42DC |
| 0000567540 | 430E | 8B55 | B8EC | 0171 | E80E | ECA8 | 5756 | C033 |
| 0000567560 | 4689 | 88F8 | FB46 | 76C4 | 260A | 89AC | 0A76 | 4688 |
| 0000567600 | 0AFE | 74C0 | 8306 | F87E | 7D00 | 8B06 | F846 | B5E9 |
| 0000567620 | BB04 | 74BC | 202C | 583C | 0577 | 24D7 | EB0F | B002 |
| 0000567640 | B100 | D203 | 02E0 | FB46 | FED7 | D2C1 | 88E8 | FB46 |
| 0000567660 | 8B98 | D1D8 | 2EE3 | A7FF | 41C2 | 568A | B9FE | 0001 |
| 0000567700 | 36E8 | EB04 | 33B1 | 89C0 | F046 | 4689 | 89F6 | EE46 |
| 0000567720 | 46C7 | 20FC | 4800 | 4689 | EBF4 | 8A9B | FE46 | 2D3C |
| 0000567740 | 0675 | 4E80 | 04FC | 8EEB | 2B3C | 0675 | 4E80 | 01FC |
| 0000567760 | 84EB | 203C | 0775 | 4E80 | 02FC | 79E9 | 3CFF | 7523 |
| 0000570000 | 8007 | FC4E | E980 | FF6E | 4E80 | 08FC | 67E9 | 8AFF |
| 0000570020 | FE4E | F980 | 752A | E80F | 035C | C00B | 1779 | D8F7 |
| 0000570040 | 4E80 | 04FC | 0FEB | E980 | 3230 | 8BED | F646 | 0ABB |
| 0000570060 | F700 | 03E3 | 89C1 | F646 | 3BE9 | C7FF | F446 | 0000 |

THU MAR 14 17:52:34 1991 TSLINT.DLL PAGE 205, LINE 12037

| | | | | | | | | |
|---|---|---|---|---|---|---|---|---|
| 0000570100 | 33E9 | 8AFF | FE4E | F980 | 752A | E80C | 0328 | C00B |
| 0000570120 | 1479 | FFB8 | EBFF | 800F | 30E9 | ED32 | 468B | BBF4 |
| 0000570140 | 000A | E3F7 | C103 | 4689 | E9F4 | FF0A | 468A | 3CFE |
| 0000570160 | 756C | 8006 | FC4E | EB10 | 3C22 | 7546 | 8006 | FC4E |
| 0000570200 | EB20 | 3C18 | 754E | 8006 | FD4E | EB10 | 3C0E | 754C |
| 0000570220 | 8006 | FD4E | EB04 | 8004 | FD4E | E908 | FED8 | 468A |
| 0000570240 | 3CFE | 7564 | E903 | 0194 | 693C | 0375 | 8DE9 | 3C01 |
| 0000570260 | 7575 | E903 | 018A | 583C | 0375 | 89E9 | 3C01 | 7578 |
| 0000570300 | E903 | 0188 | 6F3C | 0375 | A2E9 | 3C01 | 7463 | 3C1A |
| 0000570320 | 7473 | 3C27 | 746E | 3C51 | 7470 | 3C60 | 7445 | 3C07 |
| 0000570340 | 7447 | E903 | 00BB | B5E9 | E800 | 028A | BE8D | FE8F |
| 0000570360 | 0716 | 4FAA | 01B9 | E900 | 01F1 | 90E8 | 0B02 | 75FF |
| 0000570400 | 8C12 | 0BC0 | 75C0 | 1E0C | BF07 | 7515 | 0E8B | 751B |
| 0000570420 | D8E9 | 5701 | 4E8B | E3F4 | 3207 | F2C0 | 75AE | 4F01 |
| 0000570440 | 2B59 | 87F9 | E9CF | 01C3 | 62E8 | 8B02 | F846 | F6AB |
| 0000570460 | FC46 | 7410 | 3303 | ABC0 | 3BE9 | F6FE | FC46 | 7530 |
| 0000570500 | E805 | 0232 | 39EB | 36E8 | F602 | FD46 | 7518 | C630 |
| 0000570520 | FF46 | B907 | 0010 | 0716 | 3352 | 8DD2 | 97BE | BEFE |
| 0000570540 | 0004 | B0E8 | B902 | 0010 | BE8D | FE92 | 3358 | BED2 |
| 0000570560 | 0004 | A0E8 | C602 | 9386 | 3AFE | 09B9 | EB00 | C618 |
| 0000570600 | FF46 | B907 | 0010 | 0716 | D233 | BE8D | FE92 | 04BE |
| 0000570620 | E800 | 0281 | 04B9 | 8D00 | 8FBE | E9FE | 014D | 46FF |
| 0000570640 | 80EE | FC4E | 0A40 | FE46 | 200C | 8B98 | 83F0 | F47E |
| 0000570660 | 7F00 | 7413 | C707 | F446 | 0006 | 0AEB | 673D | 7500 |
| 0000570700 | C705 | F446 | 0001 | BE8D | FE8F | 76FF | FFEE | F476 |
| 0000570720 | 1656 | FF57 | 1076 | 76FF | F60E | FD46 | 7404 | FF0A |
| 0000570740 | 441E | 8375 | 0E46 | EB0A | FF08 | 301E | 8375 | 0E46 |
| 0000570760 | 8308 | 0EC4 | 46F6 | 80FC | 0F74 | 7E83 | 00F4 | 0975 |
| 0000571000 | 5716 | 1EFF | 753C | C483 | 8304 | 67FE | 1075 | 46F7 |
| 0000571020 | 80FC | 7500 | 1609 | FF57 | 341E | 8375 | 04C4 | 0716 |
| 0000571040 | 8026 | 2D3D | 0575 | 8047 | FD4E | B901 | FFFF | B057 |
| 0000571060 | F200 | 4FAE | 2B59 | 87F9 | E9CF | 00AF | 4E80 | 40FC |
| 0000571100 | 46C6 | 0AFA | 35EB | 46C6 | 07FF | 04EB | 46C6 | 27FF |
| 0000571120 | 46F6 | 80FC | 1174 | 46C7 | 02F0 | C600 | F246 | B230 |
| 0000571140 | 0251 | FF56 | 5688 | C6F3 | FA46 | EB10 | F60E | FC46 |
| 0000571160 | 7480 | 8004 | FD4E | C602 | FA46 | F608 | FC46 | 7410 |
| 0000571200 | E805 | 00FB | 0EEB | EDE8 | F600 | FC46 | 7440 | 9903 |
| 0000571220 | 02EB | D233 | 46F6 | 40FC | 0F74 | D20B | 0B7D | 4E80 |
| 0000571240 | 01FD | D8F7 | D283 | F700 | 83DA | F47E | 7D00 | C707 |
| 0000571260 | F446 | 0001 | 04EB | 6680 | F7FC | D88B | DA0B | 0575 |
| 0000571300 | 46C7 | 00F0 | 8D00 | EB7E | 0716 | 4E8A | 32FA | 8BED |
| 0000571320 | F476 | 40E8 | F601 | FD46 | 7402 | E30E | 2606 | 3D80 |
| 0000571340 | 7430 | 4F06 | C626 | 3005 | EB41 | F600 | FC46 | 7440 |
| 0000571360 | F631 | FD46 | 7401 | C60B | F246 | C72D | F046 | 0001 |
| 0000571400 | 20EB | 46F6 | 01FC | 0B74 | 46C6 | 2BF2 | 46C7 | 01F0 |
| 0000571420 | EB00 | F60F | FC46 | 7402 | C609 | F246 | C720 | F046 |
| 0000571440 | 0001 | 468B | 2BF6 | 2BC1 | F046 | 027D | C033 | 5706 |
| 0000571460 | F651 | FC46 | 750C | 8B07 | B2C8 | E820 | 00BB | 1650 |
| 0000571500 | 8D07 | F27E | 4E8B | E8F0 | 0091 | F658 | FC46 | 7408 |
| 0000571520 | F60D | FC46 | 7504 | 8B07 | B2C8 | E830 | 009B | 5F59 |
| 0000571540 | 5007 | 76E8 | 5800 | 46F6 | 04FC | 0774 | C88B | 20B2 |
| 0000571560 | 86E8 | E900 | FC00 | 76C4 | 260E | 89AD | 0E76 | C4C3 |
| 0000571600 | 0E76 | AD26 | D08B | AD26 | 8992 | 0E76 | F6C3 | FC46 |
| 0000571620 | 7420 | E808 | FFE9 | C28E | F88B | E8C3 | FFD8 | F88B |
| 0000571640 | C00B | 0375 | C08E | 1EC3 | C307 | 0698 | C457 | 065E |
| 0000571660 | FF26 | 044F | 1078 | 8B26 | 263F | 07FF | 8E26 | 0247 |
| 0000571700 | 33AA | 5FC0 | C307 | 5251 | 5306 | 0E50 | 0FE8 | 83EF |
| 0000571720 | 06C4 | 595A | FF3D | 75FF | EBE8 | E3E8 | 8B1B | 01F7 |
| 0000571740 | F84E | 3357 | 26FF | E8AC | FFC0 | F80B | F7E2 | FF0B |

THU MAR 14 17:52:34 1991 TSLINT.DLL PAGE 206, LINE 12096

| | | | | | | | | |
|---|---|---|---|---|---|---|---|---|
| 0000571760 | 745F | C705 | F846 | FFFF | E3C3 | 0119 | F84E | 3357 |
| 0000572000 | 8AFF | E8C2 | FFA4 | F80B | F7E2 | FF0B | 745F | C705 |
| 0000572020 | F846 | FFFF | FDC3 | 9357 | F60B | 0A7F | DB0B | 0675 |
| 0000572040 | D20B | 0275 | 1AEB | 3392 | F7D2 | 93F1 | F1F7 | 8792 |
| 0000572060 | 04D3 | 3C30 | 7639 | 0203 | FF46 | 8BAA | 4EC2 | D8EB |
| 0000572100 | 2B59 | 47CF | C3FC | 5E5F | E58B | CB5D | 06C8 | 0000 |
| 0000572120 | BE56 | 70E8 | C02B | 4689 | 89FC | FA46 | 026A | 67E8 |
| 0000572140 | 830D | 02C4 | 0CEB | 76FF | E8FE | 0D18 | C483 | 8302 |
| 0000572160 | 0CC6 | 3639 | 74A8 | 3B72 | C68B | E82D | B970 | 000C |
| 0000572200 | F799 | 89F9 | FE46 | E850 | 0CEE | C483 | F602 | 0A44 |
| 0000572220 | 7583 | C7D3 | 0444 | 0000 | 44C6 | 000A | C02B | 4489 |
| 0000572240 | 8908 | 0644 | 4489 | 8902 | C604 | 0B44 | 89FF | FA76 |
| 0000572260 | 5E8C | 6AFC | E802 | 0D3A | C483 | 8B02 | FA46 | 568B |
| 0000572300 | 5EFC | CBC9 | 04C8 | 0000 | 8B56 | 0676 | 468B | 2D08 |
| 0000572320 | 70E8 | 0CB9 | 9900 | F9F7 | 4689 | 50FE | 99E8 | 830C |
| 0000572340 | 02C4 | 76FF | FF0A | 0876 | 9A56 | 4774 | 417D | C483 |
| 0000572360 | 8906 | FC46 | 76FF | E8FE | 0C8A | C483 | 8B02 | FC46 |
| 0000572400 | C95E | 90CB | 8B55 | 57EC | 8B56 | 0676 | 7E8B | 8308 |
| 0000572420 | FFFE | 1274 | 45F6 | 010A | 1275 | 45F6 | 800A | 0674 |
| 0000572440 | 45F6 | 020A | 0674 | FFB8 | EBFF | 903E | 458B | 0B08 |
| 0000572460 | 0645 | 0875 | 571E | C3E8 | 83EE | 04C4 | 058B | 558B |
| 0000572500 | 3902 | 0645 | 0D75 | 5539 | 7508 | 8308 | 047D | 7500 |
| 0000572520 | FFD5 | FF05 | 0445 | C68B | 0DFF | 1DC4 | 8826 | 8007 |
| 0000572540 | 0A65 | 80EF | 0A4D | 2A01 | 5EE4 | C95F | 90CB | 8B55 |
| 0000572560 | 8BEC | 065E | 1E3B | 6EC3 | 1272 | 09BA | 3300 | E9C0 |
| 0000572600 | E866 | E853 | 0C16 | C483 | E902 | E875 | E853 | 0C00 |
| 0000572620 | C483 | 5302 | FF9A | 00FF | 8500 | 75C0 | C6E5 | C587 |
| 0000572640 | 006E | E853 | 0BF6 | C483 | 8B02 | 5DE5 | 00CB | 8B55 |
| 0000572660 | 83EC | 02EC | C033 | 09EB | 8B55 | 83EC | 02EC | FFB8 |
| 0000572700 | 89FF | FE46 | 5E8B | 3B06 | C31E | 726E | BA19 | 0009 |
| 0000572720 | C033 | 13E9 | 8BE8 | FE4E | C90B | 0774 | E853 | 0BBC |
| 0000572740 | C483 | E902 | E81B | C00B | 0774 | E853 | 0BA2 | C483 |
| 0000572760 | 8302 | 04EC | CC8B | FF53 | 0A76 | 76FF | FF08 | 0C76 |
| 0000573000 | 5116 | FF9A | 00FF | 5900 | 855A | 75C0 | 80C8 | C5A7 |
| 0000573020 | FD6E | 468B | 0BFE | 74C0 | 5307 | 7FE8 | 830B | 02C4 |
| 0000573040 | 8B91 | 5DE5 | 00CB | 8B55 | 83EC | 0EEC | 7E8A | 8B0C |
| 0000573060 | 0E46 | 4689 | EB0C | 5508 | EC8B | EC83 | B70E | FF40 |
| 0000573100 | 0876 | 76FF | 1606 | 568D | 52FE | 8D16 | F856 | 3352 |
| 0000573120 | 52D2 | 8B52 | 0C4E | 99E8 | 8B01 | 0A46 | 00A9 | 7401 |
| 0000573140 | 8008 | 10CA | 00A9 | 7504 | A92A | 0200 | 2274 | CA80 |
| 0000573160 | 5002 | 468D | FFFE | 0876 | 76FF | 1606 | 3350 | 50C0 |
| 0000573200 | 9A50 | FFFF | 0000 | C085 | 7558 | 8B08 | FE4E | 03EB |
| 0000573220 | CA80 | 5101 | 2552 | 0003 | C70A | 3350 | 50C0 | 9A50 |
| 0000573240 | FFFF | 0000 | C00B | 1674 | 6E3D | 7500 | F60E | F0C2 |
| 0000573260 | 02BA | 7400 | BA03 | 0011 | 2DE9 | E9E7 | 009D | 468B |
| 0000573300 | 3BFE | C306 | 726E | 500D | 059A | 0048 | BA00 | 0018 |
| 0000573320 | C033 | E4EB | E850 | 0AB8 | C483 | 8B02 | 50D0 | 8D16 |
| 0000573340 | F45E | 1653 | 468D | 50F8 | C09A | 002C | 0B00 | 75C0 |
| 0000573360 | 8B61 | 0A46 | C933 | 00A9 | 7580 | A90E | 4000 | 0775 |
| 0000573400 | 06F6 | 751F | 7580 | B102 | 8880 | F24E | 468A | 3CF4 |
| 0000573420 | 7501 | C607 | F446 | E940 | 008F | 023C | 0775 | 46C6 |
| 0000573440 | 08F4 | 84E9 | 3200 | 88C0 | F446 | C90A | F474 | 46F7 |
| 0000573460 | 020A | 7400 | 5274 | FFB9 | 51FF | B951 | 0002 | 1651 |
| 0000573500 | 468D | 50FA | 739A | 0048 | 0B00 | 74C0 | 3D15 | 0083 |
| 0000573520 | 0C74 | 76FF | E8FE | 0A44 | C483 | E902 | E6A3 | C033 |
| 0000573540 | 47EB | 1652 | 468D | 50F6 | 01B8 | 5000 | 8D16 | F846 |
| 0000573560 | 9A50 | FFFF | 0000 | C00B | 1B75 | 4639 | 74F8 | 802A |
| 0000573600 | F67E | 751A | 5210 | 76FF | FFFC | FA76 | FF9A | 00FF |
| 0000573620 | 0B00 | 75C0 | 52BD | C033 | 5050 | 1650 | 468D | 50FA |

THU MAR 14 17:52:34 1991 TSLINT.DLL PAGE 207, LINE 12155

| | | | | | | | | |
|---|---|---|---|---|---|---|---|---|
| 0000573640 | B59A | 0049 | 0B00 | 75C0 | 8AA9 | F44E | C1F6 | 7548 |
| 0000573660 | FF28 | 0876 | 76FF | 1606 | 468D | 50F8 | C033 | 5050 |
| 0000573700 | F29A | 0048 | F700 | F846 | 0001 | 0374 | C980 | F710 |
| 0000573720 | 0A46 | 0008 | 0374 | C980 | 0A20 | F24E | C980 | 8B01 |
| 0000573740 | 8BC2 | 88D8 | C58F | 536E | B1E8 | 8309 | 02C4 | E58B |
| 0000573760 | CB5D | BEA1 | F76E | 23D0 | 33C1 | A8C9 | 7580 | 8003 |
| 0000574000 | 01C9 | 00C3 | 8B55 | 83EC | 08EC | C033 | 5E8B | 3B06 |
| 0000574020 | C31E | 736E | 534D | 77E8 | 8309 | 02C4 | 4E8B | E30C |
| 0000574040 | F647 | C587 | 026E | 4075 | 3357 | 8BD2 | 0C4E | 7EC4 |
| 0000574060 | F608 | C587 | 086E | 1074 | 878A | 6FC5 | 0A3C | 0874 |
| 0000574100 | 42AA | C649 | C587 | 0A6F | 0653 | 5157 | 468D | 16FA |
| 0000574120 | 9A50 | 49E2 | 0000 | 0B5F | 74C0 | 530F | 3DE8 | 8309 |
| 0000574140 | 02C4 | 09BA | E900 | E580 | 4AEB | 468B | 03FA | F6C2 |
| 0000574160 | C587 | 806E | 3E74 | A780 | 6EC5 | 56FB | 1E57 | C507 |
| 0000574200 | 0876 | FE8B | C88B | 28E3 | 0DB4 | 3C80 | 750A | 2606 |
| 0000574220 | 8F80 | 6EC5 | AC04 | C43A | 2574 | 1A3C | 0875 | 8026 |
| 0000574240 | C58F | 026E | 05EB | 0588 | E247 | 8BEA | 2BC7 | 0846 |
| 0000574260 | 1F06 | 5E5F | E853 | 08E4 | C483 | 8B02 | 5DE5 | 83CB |
| 0000574300 | 01F9 | 0774 | 3C80 | 740A | EBE0 | 26DB | 87F6 | 6EC5 |
| 0000574320 | 7440 | 0B2B | 75DB | 5323 | 468D | 16F9 | 5150 | 468D |
| 0000574340 | 16FA | 9A50 | 4AC2 | 0000 | C085 | 0E74 | 1F06 | 5E5F |
| 0000574360 | E853 | 08A8 | C483 | E902 | E507 | 0AB0 | A8EB | 46C6 |
| 0000574400 | 00F9 | 8D53 | F946 | 5016 | 8D51 | FA46 | 5016 | 549A |
| 0000574420 | 004B | 0B00 | 75C0 | F7D5 | FA46 | FFFF | 3674 | 7E83 |
| 0000574440 | 010C | 3574 | F626 | C587 | 086E | 1C75 | B853 | FFFF |
| 0000574460 | 5050 | D8F7 | 8D50 | FC46 | 5016 | 119A | 004A | 8000 |
| 0000574500 | F97E | 750A | E90F | FF61 | 468A | 26F9 | 8788 | 6FC5 |
| 0000574520 | 0A3C | 0274 | 0DB0 | 4DE9 | 80FF | F97E | 750A | EBC5 |
| 0000574540 | 0099 | 8B55 | 83EC | 0EEC | C033 | 09EB | 8B55 | 83EC |
| 0000574560 | 0EEC | FFB8 | 89FF | F246 | 5E8B | 3B06 | C31E | 726E |
| 0000574600 | BA08 | 0009 | C033 | 5FE9 | 0BE4 | 74C0 | 5307 | FFE8 |
| 0000574620 | 8307 | 02C4 | 87F6 | 6EC5 | 7420 | 5312 | C933 | 5151 |
| 0000574640 | 4141 | 8D51 | F446 | 5016 | AB9A | 004B | F600 | C587 |
| 0000574660 | 806E | 6674 | 5E8C | 8EFA | 0A46 | 56C5 | 3308 | 89C0 |
| 0000574700 | FE46 | 4689 | FCFC | 5657 | FA8B | F28B | 6689 | 8BF8 |
| 0000574720 | 0C4E | 28E3 | 0AB0 | AEF2 | 3B75 | EC83 | 8B02 | BADC |
| 0000574740 | 0080 | E22B | D48B | FA8B | 0716 | 4E8B | AC0C | 0A3C |
| 0000574760 | 0D74 | FB3B | 1A74 | E2AA | E8F4 | 0038 | AFE9 | B000 |
| 0000575000 | 3B0D | 75FB | E803 | 002C | B0AA | FF0A | FC46 | E2EB |
| 0000575020 | 21E8 | EB00 | 5EE1 | 8E5F | FA5E | C8E9 | 8B00 | F246 |
| 0000575040 | C00B | 0974 | 76FF | E806 | 0772 | C483 | B802 | FFFC |
| 0000575060 | E80E | E1E0 | 5350 | 1E51 | 1F06 | CF8B | CA2B | 21E3 |
| 0000575100 | 8B51 | 065E | 1E53 | 5152 | 468D | 16F4 | 9A50 | 2FFF |
| 0000575120 | 0000 | 0B59 | 75C0 | 8B11 | F45E | 5E01 | 3BFE | 72D9 |
| 0000575140 | 1F07 | 5B59 | 8B58 | C3FA | 831F | 08C4 | 7E83 | 00FE |
| 0000575160 | 3C75 | C00B | 1874 | 6D3D | 7400 | 3D0D | 0001 | 09BA |
| 0000575200 | 7500 | BA08 | 001C | 03EB | 20BA | F900 | 26EB | 5E8E |
| 0000575220 | F6FA | C587 | 406E | 0E74 | 5E8E | 8B0A | 085E | 3F80 |
| 0000575240 | 751A | F803 | 0EEB | 1CBA | 3300 | F9C0 | 06EB | 468B |
| 0000575260 | 2BFE | FC46 | 668B | 5EF8 | 8E5F | FA5E | 1472 | 5E8B |
| 0000575300 | 0BF2 | 74DB | FF09 | 0676 | D1E8 | 8306 | 02C4 | E58B |
| 0000575320 | CB5D | 5E8B | 0BF2 | 74DB | FF09 | 0676 | BDE8 | 8306 |
| 0000575340 | 02C4 | 03E9 | 8BE3 | 0C4E | C90B | 0475 | C18B | CEEB |
| 0000575360 | C51E | 0856 | 1E53 | 5152 | 468D | 16F4 | 9A50 | 4CBE |
| 0000575400 | 0000 | 071E | 0B1F | 74C0 | 3D17 | 006D | 0D74 | 013D |
| 0000575420 | BA00 | 0009 | BC75 | 1CBA | EB00 | BAB7 | 0020 | B2EB |
| 0000575440 | 468B | 0BF4 | 75C0 | F697 | C587 | 406E | 0A74 | DA8B |
| 0000575460 | 8026 | 1A3F | 0275 | 86EB | 1CBA | 3300 | EBC0 | 0093 |
| 0000575500 | D7EA | 5C4D | EA47 | 4DF6 | 4DB3 | C4EA | B84D | EA4D |

THU MAR 14 17:52:34 1991 TSLINT.DLL PAGE 208, LINE 12214

| | | | | | | | | |
|---|---|---|---|---|---|---|---|---|
| 0000575520 | 4DC4 | 4DBD | 8B55 | 56EC | 76C4 | 8C06 | E3C1 | 2605 |
| 0000575540 | 4C80 | 01FE | 5D5E | 55CB | EC8B | 096A | 59E8 | 8306 |
| 0000575560 | 02C4 | 76FF | 0E06 | 0DE8 | 5B00 | 096A | 73E8 | 8306 |
| 0000575600 | 02C4 | E58B | CB5D | 8B55 | 56EC | 8B57 | 064E | F983 |
| 0000575620 | 77E8 | 1E69 | 22A1 | 0B75 | 74C0 | BF48 | 4EDE | 368B |
| 0000575640 | 752A | 1EC5 | 7524 | 561E | FF57 | 5FD7 | 735E | 8C2B |
| 0000575660 | C5DA | 0C5F | D63B | EF75 | 1F58 | C41E | 2436 | 2675 |
| 0000575700 | 748B | C512 | 201E | 8C75 | 3BDA | 75D0 | 1FD9 | 811E |
| 0000575720 | 5AFF | 744F | BF0E | 4F5A | C4EB | 815E | DEFF | 744E |
| 0000575740 | EB0F | 070A | BF06 | 7520 | E1E8 | 7201 | E80E | 007E |
| 0000575760 | 891F | 2616 | 8975 | 241E | EB75 | 1F04 | C033 | 5F99 |
| 0000576000 | 5D5E | 00CB | 5706 | F88B | FB03 | 7F89 | 4F04 | 2D4F |
| 0000576020 | 0016 | 778D | C714 | FE05 | 89FF | 0A7F | 8948 | 8C04 |
| 0000576040 | 8B1F | 8CC6 | 8EDA | 8DC2 | 067F | ABFC | 47AB | 3347 |
| 0000576060 | ABC0 | ABAB | 5FAB | C307 | 8B26 | 0245 | C00B | 0975 |
| 0000576100 | 8C26 | 025D | 8926 | EB1D | 0614 | C426 | 0875 | 8C26 |
| 0000576120 | 0E5C | 8926 | 0C5C | 478C | 8912 | 1077 | 2607 | 5D8C |
| 0000576140 | 260A | 5D89 | 2608 | 5D8C | 2606 | 5D89 | C304 | 8041 |
| 0000576160 | FEE1 | FC53 | 778B | 8B08 | 0A5F | FF33 | 23EB | C38B |
| 0000576200 | A85B | 7501 | 5342 | 778B | 8B06 | 085F | DE3B | 3674 |
| 0000576220 | 334B | EBFF | 900C | 548D | 3BFE | 73D3 | 03E1 | 72F0 |
| 0000576240 | AD23 | 01A8 | F074 | FE8B | 3B48 | 73C1 | 0323 | 72F0 |
| 0000576260 | 8B13 | ADD0 | 01A8 | DE74 | C203 | 0205 | 8B00 | 89F7 |
| 0000576300 | FE44 | E4EB | C08B | 8B5B | 0647 | 4789 | F908 | 19EB |
| 0000576320 | 895B | FE4C | 0974 | F903 | C12B | 8948 | 2B05 | 03F9 |
| 0000576340 | 89F9 | 087F | C68B | DA8C | C3F8 | 5751 | 47F6 | 0102 |
| 0000576360 | 6674 | B7E8 | 8B00 | 8BFE | A804 | 7401 | 2B03 | 49C8 |
| 0000576400 | 4141 | 778B | 0B04 | 74F6 | 034F | 73CE | 3309 | BAC0 |
| 0000576420 | FFF0 | 33E3 | 42EB | ACB8 | 8E2F | 26C0 | 2EA1 | 3D75 |
| 0000576440 | 2000 | 1674 | 00BA | 3B80 | 72D0 | D106 | 75EA | EBF8 |
| 0000576460 | 8322 | 08FA | 1D72 | E2D1 | C28B | 8B48 | 03D0 | 73C1 |
| 0000576500 | 3302 | F7C0 | 23D2 | 52C2 | 2EE8 | 5A00 | 0D73 | FA83 |
| 0000576520 | 74F0 | B805 | 0010 | E2EB | EBF9 | 8B1B | 2BD0 | 0457 |
| 0000576540 | 4789 | 8904 | 087F | 778B | 4A0A | 1489 | 0342 | C7F2 |
| 0000576560 | FE04 | 89FF | 0A77 | 595F | 8BC3 | F6D0 | 0247 | 7404 |
| 0000576600 | 4A0F | 778B | 4E04 | D63B | 0572 | 5739 | 73FE | 4218 |
| 0000576620 | 1E50 | 039A | 002C | 0B00 | 75C0 | 8B0F | F6C2 | 0247 |
| 0000576640 | 7404 | 4A04 | 5789 | F8FE | 01EB | C3F9 | 8B57 | 0877 |
| 0000576660 | 773B | 750A | 8B03 | 0677 | 3DAD | FFFE | 0874 | FE8B |
| 0000576700 | FE24 | F003 | F2EB | 4F4F | F78B | C35F | D18B | C283 |
| 0000576720 | 8027 | F0E2 | 8B50 | 52C4 | 5016 | C033 | 9A50 | FFFF |
| 0000576740 | 0000 | 0B1F | 75C0 | 3314 | 26DB | 458B | 890C | 0247 |
| 0000576760 | C28B | 0FE8 | E8FE | FE40 | EBF8 | F901 | 00C3 | 8B55 |
| 0000577000 | 8BEC | 8BD7 | 1EDE | 7EC4 | 3306 | B9C0 | FFFF | AEF2 |
| 0000577020 | 758D | C4FF | 0A7E | FFB9 | F2FF | F7AE | 2BD1 | 8CF9 |
| 0000577040 | 8EC0 | 8ED8 | 0846 | FE87 | 468B | F706 | 01C6 | 7400 |
| 0000577060 | A402 | D149 | F3E9 | 13A5 | F3C9 | 8BA4 | 8BF3 | 1FFA |
| 0000577100 | C28C | CB5D | 8B55 | 8BEC | 8BD7 | 1EDE | 76C5 | 8B0A |
| 0000577120 | 8CFE | 8ED8 | 33C0 | B9C0 | FFFF | AEF2 | D1F7 | 7EC4 |
| 0000577140 | 8B06 | A8C7 | 7401 | A402 | D149 | F3E9 | 13A5 | F3Cy |
| 0000577160 | 8BA4 | 8BF3 | 1FFA | C28C | CB5D | 8B55 | 8BEC | 8BD7 |
| 0000577200 | 1EDE | 76C5 | C406 | 0A7E | C033 | FFB9 | F2FF | F7AE |
| 0000577220 | 2BD1 | F3F9 | 74A6 | 1B05 | 1DC0 | FFFF | 8B1F | 8BF3 |
| 0000577240 | 5DFA | 00CB | 8B55 | 8BEC | C4D7 | 067E | C033 | FFB9 |
| 0000577260 | F2FF | F7AE | 49D1 | 8B91 | 5DFA | 00CB | 8B55 | 57EC |
| 0000577300 | 1E56 | 7EC4 | C506 | 0A76 | DF8B | 4E8B | E30E | AC0C |
| 0000577320 | C00A | 0374 | E2AA | 32F8 | F3C0 | 8BAA | 8CC3 | 1FC2 |
| 0000577340 | 5F5E | E58B | CB5D | 8B55 | 57EC | 1E56 | 4E8B | E30E |
| 0000577360 | 8B27 | C4D9 | 067E | F78B | C033 | AEF2 | D9F7 | CB03 |

THU MAR 14 17:52:34 1991 TSLINT.DLL PAGE 209, LINE 12273

| | | | | | | | | |
|---|---|---|---|---|---|---|---|---|
| 0000577400 | FE8B | 76C5 | F30A | 8AA6 | FF44 | C933 | 3A26 | FF45 |
| 0000577420 | 0477 | 0474 | 4949 | D1F7 | C18B | 5E1F | 8B5F | 5DE5 |
| 0000577440 | 00CB | 61E9 | 0000 | 12C8 | 0000 | 5657 | 03EB | 46FF |
| 0000577460 | C408 | 085E | 8A26 | 9807 | D88B | 87F6 | 754F | 7508 |
| 0000577500 | 6AED | 6A00 | 0600 | 76FF | 9A08 | 5114 | 51CF | C483 |
| 0000577520 | 5004 | 76FF | FF0A | 0876 | 468D | 50F0 | 539A | C2A3 |
| 0000577540 | 834D | 0CC4 | 0805 | 8B00 | 065E | FB8B | F08B | 0716 |
| 0000577560 | 8E1E | A5DA | A5A5 | 1FA5 | 5E89 | 8BEE | 8CC3 | 5ED2 |
| 0000577600 | C95F | 06CA | 9000 | 8B55 | 57EC | 1E56 | 76C5 | 3306 |
| 0000577620 | 99C0 | DB33 | 3CAC | 7420 | 3CFB | 7409 | 50F7 | 2D3C |
| 0000577640 | 0474 | 2B3C | 0175 | 3CAC | 7739 | 2C1F | 7230 | D11B |
| 0000577660 | D1E3 | 8BD2 | 8BCB | D1FA | D1E3 | D1D2 | D1E3 | 03D2 |
| 0000577700 | 13D9 | 03D7 | 83D8 | 00D2 | DCEB | 3C58 | 932D | 0775 |
| 0000577720 | D8F7 | D283 | F700 | 1FDA | 5F5E | CB5D | 8B55 | 56EC |
| 0000577740 | B357 | 8B01 | 0C4E | 468B | 3306 | 83D2 | 0AF9 | 0175 |
| 0000577760 | 1E99 | 7EC5 | E908 | 1479 | 08C8 | 0000 | 5EC4 | 260C |
| 0000600000 | 478B | 2606 | 578B | 8908 | F846 | 5689 | C4FA | 065E |
| 0000600020 | C626 | 3007 | 478D | 8901 | FC46 | 468C | EBFE | 9026 |
| 0000600040 | 5EC4 | 26F8 | 3F80 | 7400 | 260F | 078A | 5EC4 | 26FC |
| 0000600060 | 0788 | 46FF | EBF8 | 9008 | 5EC4 | 26FC | 07C6 | FF30 |
| 0000600100 | FC46 | 4EFF | 830A | 0A7E | 7F00 | C4D5 | FC5E | C626 |
| 0000600120 | 0007 | 7E83 | 000A | 1F7C | 5EC4 | 26F8 | 3F80 | 7C35 |
| 0000600140 | EB16 | 9005 | C626 | 3007 | 4EFF | C4FC | FC5E | 8026 |
| 0000600160 | 393F | F074 | FE26 | C407 | 065E | 8026 | 313F | 0A75 |
| 0000600200 | 5EC4 | 260C | 47FF | EB02 | 900F | C38B | C28C | 5240 |
| 0000600220 | 5250 | 9A53 | 50B4 | 51BC | CBC9 | 04C8 | 0000 | A156 |
| 0000600240 | 70CB | 168B | 70CD | 4689 | 89FC | FE56 | DC6A | 17E8 |
| 0000600260 | 8301 | 02C4 | 468B | 0BFE | FC46 | 7674 | 468B | 0B08 |
| 0000600300 | 0646 | 6E74 | 76FF | FF08 | 0676 | 149A | 5A51 | 8353 |
| 0000600320 | 04C4 | F08B | 5EC4 | 26FC | 478B | 2602 | 070B | 5274 |
| 0000600340 | FF26 | 0277 | FF26 | 9A37 | 5114 | 537B | C483 | 3B04 |
| 0000600360 | 7EC6 | C439 | FC5E | C426 | 261F | 3880 | 753D | 562D |
| 0000600400 | 76FF | FF08 | 0676 | 5306 | 569A | 0651 | 8353 | 0AC4 |
| 0000600420 | C00B | 1875 | 0C6A | D9E8 | 8300 | 02C4 | 5EC4 | 26FC |
| 0000600440 | 078B | 8B26 | 0257 | C603 | EB40 | 9012 | 4683 | 04FC |
| 0000600460 | A2EB | 0C6A | BBE8 | 8300 | 02C4 | C02B | 5E99 | CBC9 |
| 0000600500 | 8B55 | 33EC | 8BC0 | 065E | 1E3B | 6EC3 | 0873 | 87F6 |
| 0000600520 | 6EC5 | 7440 | 4001 | CB5D | 8B55 | 53EC | 8B51 | 0646 |
| 0000600540 | 568B | 8B08 | 0C5E | FFB9 | D3FF | D3EA | 2BEB | 0A46 |
| 0000600560 | D31B | 5B59 | CA5D | 0008 | 8B55 | 50EC | 468B | 0504 |
| 0000600600 | 0014 | 4BEB | 8B55 | 50EC | 468B | 0504 | 0014 | 69EB |
| 0000600620 | 8B55 | 50EC | 468B | 0504 | 0114 | 33EB | 8B55 | 50EC |
| 0000600640 | 468B | 0504 | 0114 | 51EB | 8B55 | 50EC | 468B | C104 |
| 0000600660 | 02E0 | FF68 | 50FF | FF6A | FF6A | FF9A | 00FF | 0B00 |
| 0000600700 | 75C0 | 5829 | E58B | C35D | 8B55 | 50EC | 468B | FF04 |
| 0000600720 | 5006 | C176 | 02E0 | 2368 | 5054 | FF6A | FF6A | FF9A |
| 0000600740 | 00FF | 0B00 | 75C0 | 5805 | E58B | C35D | 11B8 | E900 |
| 0000600760 | D7E9 | 8B55 | 50EC | 468B | C104 | 02E0 | 4768 | 5054 |
| 0000601000 | FF9A | 00FF | 0B00 | 75C0 | FFE3 | 500E | 5876 | E58B |
| 0000601020 | C35D | 8B55 | FFEC | 0676 | ADE8 | 83FF | 02C4 | E58B |
| 0000601040 | CB5D | 8B55 | FFEC | 0676 | C7E8 | 83FF | 02C4 | E58B |
| 0000601060 | CB5D | 8B55 | 1EEC | 8B07 | 0E4E | C90B | 3174 | C1F6 |
| 0000601100 | 7501 | 8B2C | 0C56 | 468B | 8B0A | 0BD8 | 75DA | 5112 |
| 0000601120 | B09A | 3D4D | 5953 | D88B | DA0B | 1374 | D88B | EB43 |
| 0000601140 | 0B0A | 74D2 | A80A | 7501 | 8B06 | 03D8 | 73C1 | BA08 |
| 0000601160 | 0016 | C033 | 71E9 | 6ADB | 8BFF | 52CC | 5653 | 0E57 |
| 0000601200 | 2768 | 1655 | 5251 | 8B50 | 084E | 568B | 8B06 | 1276 |
| 0000601220 | 7E8B | 9A10 | FFFF | 0000 | 5E5F | C00B | 1374 | F65B |
| 0000601240 | 01C3 | 0A74 | 534B | BA9A | C34D | 8354 | 04C4 | 50E9 |

THU MAR 14 17:52:34 1991 TSLINT.DLL PAGE 210, LINE 12332

| | | | | | | | | |
|---|---|---|---|---|---|---|---|---|
| 0000601260 | 83DB | 04C4 | 5D58 | 56CB | 0E57 | 8368 | 5155 | E852 |
| 0000601300 | 007E | 8E93 | 26C2 | 578B | 0B22 | 74D2 | 5015 | 0653 |
| 0000601320 | 2652 | 77FF | 9A20 | 4DBA | 5519 | C483 | 0704 | 585B |
| 0000601340 | D233 | 8926 | 2617 | 5789 | 2602 | 5789 | 2608 | 5789 |
| 0000601360 | 260A | 5789 | 2620 | 5789 | A822 | 7401 | 4809 | 8C26 |
| 0000601400 | 2257 | 8926 | 2047 | 0005 | 2602 | 4789 | 3304 | E8ED |
| 0000601420 | D784 | 55CB | EC8B | B1E8 | E8D8 | 0024 | D88B | C28E |
| 0000601440 | C033 | 8926 | 2607 | 4789 | 2602 | 4789 | 2608 | 4789 |
| 0000601460 | 260A | 47C7 | 0004 | 6A02 | 6A00 | 9A00 | 2DC2 | 0000 |
| 0000601500 | 068E | 6E84 | A126 | 0006 | 3B48 | 5206 | 7776 | C107 |
| 0000601520 | 06E0 | FFBA | C3FF | 5357 | 6A51 | E80F | FE6A | C483 |
| 0000601540 | 3B02 | 5206 | 7676 | 8B40 | 05D8 | 0004 | FC25 | 8BFF |
| 0000601560 | C1C8 | 06E0 | C3BA | 5055 | 9A52 | 5003 | 0000 | C00B |
| 0000601600 | 3275 | 8B49 | 87F9 | 523E | 2B76 | 51CF | C147 | 06E7 |
| 0000601620 | E1C1 | 5705 | C28E | ABF3 | 595F | C726 | 0445 | 0200 |
| 0000601640 | C783 | E240 | 8BF5 | 6AC3 | E80F | FE46 | C483 | 5902 |
| 0000601660 | 5F5B | 9BEB | 10B8 | E900 | D621 | 0AC8 | 0000 | 7E83 |
| 0000601700 | 0006 | 097C | 468B | 3906 | C306 | 7F6E | 2B07 | 99C0 |
| 0000601720 | CAE9 | 9000 | BC9A | 4846 | 8955 | F646 | 5689 | 0BF8 |
| 0000601740 | 74D0 | 2DEA | 70E8 | 0CB9 | 9900 | F9F7 | 4689 | C4FA |
| 0000601760 | 085E | 8A26 | 9807 | 773D | 7400 | 7753 | 2C08 | 7461 |
| 0000602000 | 2C4D | 7411 | 2B0B | 89C0 | F846 | 4689 | E9F6 | 0081 |
| 0000602020 | 5EC4 | 26F6 | 47C6 | 010A | 46C7 | 01FC | C700 | FE46 |
| 0000602040 | 0000 | 46FF | C408 | 085E | 8026 | 003F | 4C74 | 7E83 |
| 0000602060 | 00FC | 4674 | 8A26 | 9807 | 743D | 7400 | 772F | 2C08 |
| 0000602100 | 742B | 2C15 | 7437 | C725 | FC46 | 0000 | D4EB | 5EC4 |
| 0000602120 | 26F6 | 47C6 | 020A | C0EB | 5EC4 | 26F6 | 478A | 98DA |
| 0000602140 | 803D | 7400 | 26E2 | 47C6 | 800A | B6EB | 7E83 | 00FE |
| 0000602160 | D575 | 46C7 | 01FE | EB00 | 90A9 | 06FF | 70E6 | 468A |
| 0000602200 | C406 | F65E | 8826 | 0B47 | EB81 | 70E8 | 87C6 | 72C8 |
| 0000602220 | FF00 | FA76 | EDE8 | 8BFC | F646 | 568B | C9F8 | 90CB |
| 0000602240 | 04C8 | 0000 | 468B | 2D06 | 70E8 | 0CB9 | 9900 | F9F7 |
| 0000602260 | 4689 | 50FE | C1E8 | 83FC | 02C4 | 76FF | FF0E | 0C76 |
| 0000602300 | 76FF | FF0A | 0876 | 76FF | 9A06 | 5750 | 576D | C483 |
| 0000602320 | 890A | FC46 | 76FF | E8FE | FCAA | 468B | C9FC | 90CB |
| 0000602340 | 04C8 | 0000 | 8B56 | 0676 | 44F6 | 830A | 0C74 | 7E83 |
| 0000602360 | 020E | 067F | 7E83 | 000E | 167D | C09A | 8F30 | 8957 |
| 0000602400 | FC46 | 5689 | C4FE | FC5E | C726 | 1607 | EB00 | 9054 |
| 0000602420 | 6480 | EF0A | 7E83 | 010E | 1575 | 561E | 1A9A | A458 |
| 0000602440 | 8357 | 04C4 | 4601 | 110A | 0C56 | 46C7 | 000E | 1E00 |
| 0000602460 | 9A56 | 38B0 | 57C5 | C483 | F604 | 0A44 | 7480 | 8004 |
| 0000602500 | 0A64 | FFFC | 0E76 | 76FF | FF0C | 0A76 | 448A | 2A0B |
| 0000602520 | 50E4 | 289A | 4748 | 8356 | 08C4 | FF3D | 75FF | 3B09 |
| 0000602540 | 75D0 | B805 | FFFF | 02EB | C02B | C95E | 90CB | 06C8 |
| 0000602560 | 0000 | 468B | 2D06 | 70E8 | 0CB9 | 9900 | F9F7 | 4689 |
| 0000602600 | 50FE | F3E8 | 83FB | 02C4 | 76FF | FF08 | 0676 | 1A9A |
| 0000602620 | 4A58 | 8358 | 04C4 | 4689 | 89FA | FC56 | 76FF | E8FE |
| 0000602640 | FBE2 | 468B | 8BFA | FC56 | CBC9 | 18C8 | 0000 | 8B56 |
| 0000602660 | 0676 | C68B | E82D | 0570 | 72C8 | 4689 | 8AF0 | 0B44 |
| 0000602700 | E42A | 4689 | 83F4 | 047C | 7D00 | C705 | 0444 | 0000 |
| 0000602720 | 016A | 006A | 006A | 9A50 | 4828 | 58D9 | C483 | 8908 |
| 0000602740 | FC46 | 5689 | 0BFE | 7DD2 | B807 | FFFF | E999 | 014F |
| 0000602760 | 44F6 | 080A | 1E75 | 5E8B | F6F0 | 0107 | 1675 | 448B |
| 0000603000 | 9904 | C88B | DA8B | 468B | 8BFC | FE56 | C12B | D31B |
| 0000603020 | 2CE9 | 9001 | 048B | 442B | 8906 | F646 | 44F6 | 030A |
| 0000603040 | 3E74 | 5E8B | F6F4 | C587 | 806E | 2474 | 448B | 8B06 |
| 0000603060 | 0854 | 4689 | 89EC | EE56 | 0FEB | 5EC4 | 26EC | 3F80 |
| 0000603100 | 750A | FF03 | F646 | 46FF | 8BEC | 3904 | EC46 | EA72 |
| 0000603120 | 468B | 0BFE | FC46 | 2475 | 468B | 2BF6 | E9D2 | 00DF |

THU MAR 14 17:52:34 1991 TSLINT.DLL PAGE 211, LINE 12391

| | | | | | | | | |
|---|---|---|---|---|---|---|---|---|
| 0000603140 | 44F6 | 800A | EA75 | C09A | 2330 | 8959 | E846 | 5689 |
| 0000603160 | C4EA | E85E | C726 | 1607 | E900 | FF6D | 44F6 | 010A |
| 0000603200 | 0375 | AEE9 | 8300 | 047C | 7500 | C709 | F646 | 0000 |
| 0000603220 | A0E9 | 9000 | 048B | 442B | 0306 | 0444 | 4689 | 8BF2 |
| 0000603240 | F45E | 87F6 | 6EC5 | 7480 | 6A7F | 6A02 | 6A00 | 5300 |
| 0000603260 | 289A | 7C48 | 8359 | 08C4 | 463B | 75FC | 3B41 | FE56 |
| 0000603300 | 3C75 | 468B | 03F2 | 0644 | 4689 | 8BF8 | 0644 | 548B |
| 0000603320 | 8908 | EC46 | 5689 | EBEE | 9010 | 5EC4 | 26EC | 3F80 |
| 0000603340 | 750A | FF03 | F246 | 46FF | 8BEC | F846 | 4639 | 72EC |
| 0000603360 | 8BE9 | F05E | 07F6 | 7420 | FF2F | F246 | 2AEB | 006A |
| 0000603400 | 76FF | FFFE | FC76 | 76FF | 9AF4 | 4828 | 573C | C483 |
| 0000603420 | 8B08 | F05E | 478B | 8902 | F246 | 5E8B | F6F4 | C587 |
| 0000603440 | 046E | 0474 | 8940 | F246 | 468B | 2BF2 | 29D2 | FC46 |
| 0000603460 | 5619 | 8BFE | FC46 | 568B | 03FE | F646 | D283 | 5E00 |
| 0000603500 | CBC9 | 04C8 | 0000 | 5657 | 126A | 7BE8 | 83FA | 02C4 |
| 0000603520 | 06C6 | D142 | 8B42 | 0646 | 568B | A308 | D13E | 1689 |
| 0000603540 | D140 | 38BE | 89D1 | 8904 | 0254 | 06C7 | D13C | 7FFF |
| 0000603560 | 468D | 160E | FF50 | 0C76 | 76FF | 1E0A | 9A56 | 41D2 |
| 0000603600 | 5A13 | C483 | 8B0C | FFF8 | 3C0E | 78D1 | C40F | 381E |
| 0000603620 | FFD1 | 3806 | 26D1 | 07C6 | EB00 | 900D | 561E | 006A |
| 0000603640 | 4E9A | 0135 | 8358 | 06C4 | 126A | 45E8 | 83FA | 02C4 |
| 0000603660 | C78B | 5F5E | CBC9 | 04C8 | 0000 | 5657 | 116A | 07E8 |
| 0000603700 | 83FA | 02C4 | 06C6 | D14E | 8B49 | 0646 | 568B | A308 |
| 0000603720 | D14A | 1689 | D14C | 44BE | 89D1 | 8904 | 0254 | 5052 |
| 0000603740 | 149A | 6D51 | 835A | 04C4 | 48A3 | 8DD1 | 0E46 | 5016 |
| 0000603760 | 76FF | FF0C | 0A76 | 681E | D144 | 989A | F039 | 8359 |
| 0000604000 | 0CC4 | F88B | 116A | E9E8 | 83F9 | 02C4 | C78B | 5F5E |
| 0000604020 | CBC9 | 8B55 | 57EC | 6A56 | E813 | F9AC | C483 | C602 |
| 0000604040 | 5A06 | 42D1 | 468B | 8B06 | 0856 | 56A3 | 89D1 | 5816 |
| 0000604060 | BED1 | D150 | 0489 | 5489 | C702 | 5406 | FFD1 | FF7F |
| 0000604100 | 1076 | 76FF | FF0E | 0C76 | 76FF | 1E0A | 9A56 | 41D2 |
| 0000604120 | 5AE3 | C483 | 8B0C | FFF8 | 540E | 78D1 | C40F | 501E |
| 0000604140 | FFD1 | 5006 | 26D1 | 07C6 | EB00 | 900D | 561E | 006A |
| 0000604160 | 4E9A | 5335 | 835A | 06C4 | 136A | 75E8 | 83F9 | 02C4 |
| 0000604200 | C78B | 5F5E | CBC9 | 8B55 | 6AEC | E809 | F93A | C483 |
| 0000604220 | FF02 | 0A76 | 76FF | FF08 | 0676 | E80E | 000F | C483 |
| 0000604240 | 6A06 | E809 | F94C | C483 | 8B02 | 5DE5 | 55CB | EC8B |
| 0000604260 | 5756 | 8B1E | 0656 | F28B | 468B | 8B08 | 0A4E | D00B |
| 0000604300 | 5374 | 59E3 | DF8C | 20BB | 5175 | 67E8 | 5901 | 5B72 |
| 0000604320 | 74FF | 51FE | 67E8 | 5900 | 0B72 | C68B | DA8C | 6480 |
| 0000604340 | FEFE | EB59 | 1E49 | 8E53 | 51DF | E80E | F298 | 5B59 |
| 0000604360 | 591F | E180 | 57FE | F88B | C20B | 7458 | 8E2B | FCC2 |
| 0000604400 | 5706 | 561E | E9D1 | A5F3 | D88E | E80E | F246 | C483 |
| 0000604420 | 5804 | EB5A | 5119 | E80E | F26C | EB59 | 5011 | 0E56 |
| 0000604440 | 31E8 | 83F2 | 04C4 | 03EB | 13E8 | 3300 | 99C0 | 5F1F |
| 0000604460 | 5D5E | 00CB | F6EA | C05A | EA5A | 5B1D | 5BA7 | 8B55 |
| 0000604500 | 83EC | 02EC | 5756 | C7FC | FE46 | 0000 | 7441 | 8005 |
| 0000604520 | FEE1 | 01EB | 4E49 | 8B4E | ADFE | 2450 | 89FE | 8B05 |
| 0000604540 | 3BD0 | 73D1 | 0368 | 72F0 | AD5A | 01A8 | 0874 | D003 |
| 0000604560 | 8942 | 4815 | EBEB | FE3D | 75FF | F641 | 0247 | 7401 |
| 0000604600 | 8D3B | 0445 | C103 | 0773 | 46C7 | 01FE | 2B00 | FFC8 |
| 0000604620 | 3B05 | 087F | 0373 | 7F89 | 5208 | E856 | F34C | 5A5E |
| 0000604640 | 1173 | 46C7 | 01FE | 8300 | 10F9 | 1072 | E9D1 | D183 |
| 0000604660 | EB00 | FFE6 | 8D0D | 0275 | C28B | A5EB | 01B8 | 4E00 |
| 0000604700 | EB4E | 5A23 | EBF9 | 4639 | 0346 | EBF1 | 8B19 | FE46 |
| 0000604720 | F78B | F374 | C00B | 0E75 | 0D89 | 4646 | F103 | E372 |
| 0000604740 | D12B | 894A | 4A14 | 9159 | 0125 | 8300 | FE25 | 0509 |
| 0000604760 | 578B | 3B08 | 73FA | 3B07 | 76F2 | 8903 | 087F | D9F7 |
| 0000605000 | 5E5F | E58B | C35D | 8B55 | 57EC | 468B | F706 | 0866 |

THU MAR 14 17:52:34 1991 TSLINT.DLL PAGE 212, LINE 12450

| | | | | | | | | |
|---|---|---|---|---|---|---|---|---|
| 0000605020 | 0573 | C033 | EB99 | 501A | B09A | AC4D | 595B | D88B |
| 0000605040 | DA0B | 0D74 | 8B50 | 8EF8 | 33C2 | 41C0 | E9D1 | ABF3 |
| 0000605060 | 5F58 | CB5D | 473B | 7506 | C505 | 045F | 19EB | 531E |
| 0000605100 | 1FC5 | 08EB | 1F5B | EBF9 | C50F | 0C5F | D98C | F4E3 |
| 0000605120 | C13B | F575 | C483 | F804 | 00C3 | 8B55 | 56EC | 768B |
| 0000605140 | 8B04 | B9C6 | 000A | F799 | 04F9 | C430 | 065E | 46FF |
| 0000605160 | 2606 | 0788 | C68B | F799 | 80F9 | 30C2 | 5E8B | FF06 |
| 0000605200 | 0646 | 8826 | 8B17 | 0646 | C28C | C95E | 06C2 | 9000 |
| 0000605220 | 12C8 | 0000 | E856 | F8A8 | C28E | D88B | 5E89 | 8CF2 |
| 0000605240 | F446 | 8B26 | 1A47 | 0B26 | 1847 | 2E75 | 1A6A | B09A |
| 0000605260 | 8B4D | 835C | 02C4 | 5EC4 | 26F2 | 4789 | 2618 | 5789 |
| 0000605300 | 8B1A | 26C2 | 470B | 7518 | C70B | EE46 | D15C | 5E8C |
| 0000605320 | EBF0 | 9015 | 8B26 | 1847 | 08EB | 8B26 | 1847 | 8B26 |
| 0000605340 | 1A57 | 4689 | 89EE | F056 | 468B | 8BEE | F056 | 4689 |
| 0000605360 | 89F6 | F856 | 5EC4 | 2606 | 478B | 8B0C | D1C8 | 03E0 |
| 0000605400 | 89C1 | FA46 | 8B26 | 0847 | C88B | E0D1 | C103 | 4689 |
| 0000605420 | C7FC | FE46 | 0000 | 768B | 8BFE | FA5E | 808A | 76B4 |
| 0000605440 | 5EC4 | 26EE | 0788 | 5E8B | 8AFC | CA80 | 8B76 | EE5E |
| 0000605460 | 8826 | 0447 | 46FF | FFFE | EE46 | 7E83 | 03FE | D67C |
| 0000605500 | 5E8B | 83EE | EE46 | 2604 | 07C6 | 8B20 | EE5E | 46FF |
| 0000605520 | 26EE | 07C6 | 0620 | 76FF | C4EE | 065E | FF26 | 0677 |
| 0000605540 | F7E8 | 8EFE | 8BC2 | 26D8 | 07C6 | 8D20 | 0147 | 5006 |
| 0000605560 | 5EC4 | 2606 | 77FF | E804 | FEE0 | C28E | D88B | C626 |
| 0000605600 | 3A07 | 478D | 0601 | C450 | 065E | FF26 | 0277 | C9E8 |
| 0000605620 | 8EFE | 8BC2 | 26D8 | 07C6 | 8D3A | 0147 | 5006 | 5EC4 |
| 0000605640 | 2606 | 37FF | B3E8 | 8EFE | 8BC2 | 26D8 | 07C6 | 8D20 |
| 0000605660 | 0147 | 5006 | 5EC4 | 2606 | 478B | B90A | 0064 | D80B |
| 0000605700 | F799 | 05F9 | 0013 | 8B50 | E8F3 | FE8E | 5052 | 64B9 |
| 0000605720 | 8B00 | 99C6 | F9F7 | E852 | FE80 | C28E | D88B | C626 |
| 0000605740 | 0A07 | 8943 | EE5E | 468C | 26F0 | 07C6 | 8B00 | F646 |
| 0000605760 | 568B | 5EF8 | CBC9 | 04C8 | 0000 | 76FF | FF08 | 0676 |
| 0000606000 | DA9A | 8660 | 835E | 04C4 | 5689 | 0BFE | 74D0 | FF0F |
| 0000606020 | FE76 | 9A50 | 5D00 | 5D21 | C483 | EB04 | 9004 | C02B |
| 0000606040 | C999 | 90CB | 14C8 | 0000 | 5657 | 5EC4 | 2606 | 7F81 |
| 0000606060 | CE02 | 7712 | 720F | 2607 | 3F81 | A600 | 0673 | C02B |
| 0000606100 | E999 | 0222 | F9E8 | 8EF6 | 8BC2 | 89D8 | F45E | 468C |
| 0000606120 | 26F6 | 478B | 261E | 470B | 751C | 6A2D | 9A12 | 4DB0 |
| 0000606140 | 5F19 | C483 | C402 | F45E | 8926 | 1C47 | 8926 | 1E57 |
| 0000606160 | C28B | 0B26 | 1C47 | 0A75 | 46C7 | 88F8 | 8C76 | FA5E |
| 0000606200 | 14EB | 8B26 | 1C47 | 08EB | 8B26 | 1C47 | 8B26 | 1E57 |
| 0000606220 | 4689 | 89F8 | FA56 | E168 | 6801 | 3380 | 5EC4 | 2606 |
| 0000606240 | 77FF | 2602 | 37FF | 029A | 377C | 6A5F | 68FE | AE80 |
| 0000606260 | E168 | 6801 | 3380 | 5EC4 | 2606 | 77FF | 2602 | 37FF |
| 0000606300 | F08B | FA8B | A29A | 5D7B | C45F | F85E | 8926 | 0A47 |
| 0000606320 | 9940 | C233 | C22B | F8C1 | 3302 | 2BC2 | 8BC2 | 8BCE |
| 0000606340 | 6AF0 | 5600 | 4E89 | 89EC | EE7E | C49A | FD7A | 035F |
| 0000606360 | EC46 | D713 | 4689 | 89FC | FE56 | 468E | 83FA | FE7E |
| 0000606400 | 7D00 | 812D | FC46 | 3380 | 5681 | E1FE | 8B01 | F85E |
| 0000606420 | 8B26 | 0A47 | B940 | 0004 | F799 | 0BF9 | 75D2 | 810A |
| 0000606440 | FC46 | 5180 | 5683 | 01FE | 264E | 4FFF | EB0A | 90CE |
| 0000606460 | 5EC4 | 26F8 | 4781 | B20A | 2607 | 478B | B90A | 0004 |
| 0000606500 | D88B | F799 | 0BF9 | 75D2 | 8B25 | B9C3 | 0064 | F799 |
| 0000606520 | 0BF9 | 75D2 | 8B11 | F85E | 8B26 | 0A47 | 90B9 | 9901 |
| 0000606540 | F9F7 | D20B | 0875 | 46C7 | 54F0 | EB76 | 9006 | 46C7 |
| 0000606560 | 6EF0 | 8C76 | F25E | 5E8B | 26F8 | 6F81 | 6C0A | 6A07 |
| 0000606600 | 6801 | 5180 | 76FF | FFFE | FC76 | 2A9A | 137A | C460 |
| 0000606620 | F85E | 8926 | 0E47 | 016A | 8068 | 8D51 | FC46 | 5016 |
| 0000606640 | C69A | 6F79 | C460 | F85E | C726 | 0847 | 0001 | 07EB |
| 0000606660 | 5EC4 | 26F8 | 47FF | C408 | F85E | 8B26 | 0E47 | 8B26 |

THU MAR 14 17:52:34 1991 TSLINT.DLL PAGE 213, LINE 12509

| | | | | | | | | |
|---|---|---|---|---|---|---|---|---|
| 0000606700 | 085F | E3D1 | 7EC4 | 26F0 | 0139 | E47C | 5EC4 | 26F8 |
| 0000606720 | 4FFF | 2608 | 5F8B | C408 | F87E | 8B26 | 0E45 | E3D1 |
| 0000606740 | 7EC4 | 8BF0 | 26C8 | 012B | 5EC4 | 26F8 | 4789 | 6A06 |
| 0000606760 | 6800 | 0E10 | 76FF | FFFE | FC76 | F98B | 2A9A | 897A |
| 0000607000 | C460 | F85E | 8926 | 0447 | 006A | 3C6A | 006A | 1068 |
| 0000607020 | 8D0E | FC46 | 5016 | C69A | 9679 | 5260 | 8950 | EC46 |
| 0000607040 | 5689 | 9AEE | 7A2A | 60AC | 5EC4 | 26F8 | 4789 | 6A02 |
| 0000607060 | 6A00 | FF3C | EE76 | 76FF | 9AEC | 7AF6 | 5E73 | 5EC4 |
| 0000607100 | 26F8 | 0789 | 6926 | 0A47 | 016D | C703 | C603 | CA2D |
| 0000607120 | B963 | 0007 | D22B | F1F7 | 8926 | 0C57 | C726 | 1047 |
| 0000607140 | 0000 | C38B | C28C | 5F5E | CBC9 | 08C8 | 0000 | A89A |
| 0000607160 | 0361 | C461 | 065E | 8B26 | 2607 | 578B | 2B02 | A606 |
| 0000607200 | 1B76 | A816 | 8976 | FC46 | 5689 | 8DFE | FC46 | 5016 |
| 0000607220 | 949A | 265E | 8361 | 04C4 | 4689 | 89F8 | FA56 | D00B |
| 0000607240 | 0675 | C02B | EB99 | 9044 | 3E83 | 76AA | 7400 | FF36 |
| 0000607260 | FA76 | 9A50 | 62A2 | 6140 | C483 | 0B04 | 74C0 | 8126 |
| 0000607300 | FC46 | 0E10 | 5683 | 00FE | 468D | 16FC | 9A50 | 5E94 |
| 0000607320 | 5ED0 | C483 | 8E04 | 8BC2 | 89D8 | F85E | 468C | 26FA |
| 0000607340 | 47C7 | 0110 | 8B00 | F846 | 568B | C9FA | 90CB | 8B55 |
| 0000607360 | 83EC | 0CEC | 468D | 16F4 | 9A50 | FFFF | 0000 | 00B4 |
| 0000607400 | 468A | 50F6 | 468A | 50F5 | 468A | 50F4 | 468A | 50F8 |
| 0000607420 | 468A | 50F9 | 468B | 2DFA | 07BC | 9A50 | 6370 | 60E1 |
| 0000607440 | C483 | 830C | 087E | 7400 | C40A | 065E | 8926 | 0257 |
| 0000607460 | 8926 | 8B07 | 5DE5 | 00CB | 0B6A | 8BE8 | 83F2 | 02C4 |
| 0000607500 | 3E83 | D176 | 7500 | E807 | 0022 | 06FF | D176 | 0B6A |
| 0000607520 | 9FE8 | 83F2 | 02C4 | 90CB | 0B6A | 6BE8 | 83F2 | 02C4 |
| 0000607540 | 09E8 | 6A00 | E80B | F28A | C483 | CB02 | 04C8 | 0000 |
| 0000607560 | 1E56 | 9A68 | 9A76 | 530A | 6215 | C483 | 8904 | FC46 |
| 0000607600 | 5689 | 0BFE | 75D0 | E903 | 00A4 | 5EC4 | 26FC | 3F80 |
| 0000607620 | 7500 | E903 | 0098 | 036A | 5006 | 36FF | 76AE | 36FF |
| 0000607640 | 76AC | 2C9A | 2C51 | 8362 | 0AC4 | 006A | 1068 | 830E |
| 0000607660 | FC46 | FF03 | FE76 | 76FF | 9AFC | 5192 | 6236 | C483 |
| 0000607700 | 5204 | 9A50 | 7AC4 | 6281 | A6A3 | 8976 | A816 | 2B76 |
| 0000607720 | 8EF6 | FE46 | 5E8B | 26FC | 3880 | 7400 | 261A | 008A |
| 0000607740 | C88B | 8B98 | F6D8 | 4F87 | 0475 | 0575 | F980 | 752D |
| 0000607760 | 4606 | FE83 | 7C03 | 8BDD | FC5E | 8026 | 0038 | 1874 |
| 0000610000 | 036A | DE03 | 5306 | 36FF | 76B2 | 36FF | 76B0 | 2C9A |
| 0000610020 | 8E51 | 8361 | 0AC4 | 08EB | 1EC4 | 76B0 | C626 | 0007 |
| 0000610040 | 1EC4 | 76B0 | 8026 | 013F | C01B | A340 | 76AA | C95E |
| 0000610060 | 90C3 | 04C8 | 0000 | C456 | 065E | 8326 | 087F | 7D03 |
| 0000610100 | E903 | 00B6 | 8326 | 087F | 7E09 | E903 | 00AC | 8326 |
| 0000610120 | 087F | 7E03 | 260A | 7F83 | 0908 | 037D | 81E9 | 2600 |
| 0000610140 | 778B | 810A | 6CC6 | 8107 | C2FE | 7E07 | 2617 | 7F83 |
| 0000610160 | 0308 | 1075 | 8B26 | 085F | E3D1 | 878B | 766E | 0705 |
| 0000610200 | EB00 | 900B | 8B26 | 085F | E3D1 | 878B | 7670 | 4689 |
| 0000610220 | F7FC | 03C6 | 7500 | FF03 | FC46 | 5E8B | 2606 | 778B |
| 0000610240 | 830A | 46EE | 448D | 9901 | C233 | C22B | F8C1 | 3302 |
| 0000610260 | 2BC2 | 69C2 | 6DCE | 0301 | 03C1 | FC46 | 0405 | B900 |
| 0000610300 | 0007 | F799 | 2BF9 | FC56 | DAF7 | 8326 | 087F | 7503 |
| 0000610320 | 2615 | 573B | 7C0E | 7509 | 2621 | 7F83 | 0204 | 1A7C |
| 0000610340 | 01B8 | EB00 | 9017 | 5EC4 | 8B06 | 26C2 | 4739 | 7C0E |
| 0000610360 | 75EF | 2607 | 7F83 | 0104 | E67C | C02B | C95E | 90CB |
| 0000610400 | 16C8 | 0000 | 5657 | 768B | 6A06 | 6801 | 5180 | 448D |
| 0000610420 | 9903 | C233 | C22B | F8C1 | 3302 | 2BC2 | 99C2 | 5052 |
| 0000610440 | C49A | C27A | 8963 | EA46 | 5689 | 8BEC | 085E | E3D1 |
| 0000610460 | BF8B | 766C | C68B | 04B9 | 9900 | F9F7 | D20B | 0775 |
| 0000610500 | 7E83 | 0208 | 017E | 8B47 | 0A46 | C703 | 4689 | 9AFC |
| 0000610520 | 61A8 | 63E5 | 006A | 3C6A | 006A | 3C6A | 006A | 186A |
| 0000610540 | C669 | 016D | 4603 | 030A | 99C7 | 4405 | 830E | 00D2 |

THU MAR 14 17:52:34 1991 TSLINT.DLL PAGE 214, LINE 12568

| | | | | | | | | |
|---|---|---|---|---|---|---|---|---|
| 0000610560 | 5052 | C49A | F87A | 8B63 | 8BC8 | 0C46 | DA8B | 0399 |
| 0000610600 | 13C1 | 52D3 | 9A50 | 7AC4 | 640B | C88B | 468B | 8B0E |
| 0000610620 | 99DA | C103 | D313 | 5052 | C49A | 497A | 8B64 | 8BC8 |
| 0000610640 | 1046 | DA8B | 0399 | 13C1 | 03D3 | A606 | 1376 | A816 |
| 0000610660 | 0176 | EA46 | 5611 | 8DEC | 5044 | 4689 | 8BF8 | 0846 |
| 0000610700 | 8948 | F646 | 468B | 890C | F246 | 3E83 | 76AA | 7400 |
| 0000610720 | 8D1A | EE46 | 5016 | A29A | E862 | 8361 | 04C4 | C00B |
| 0000610740 | 0974 | 6E81 | 10EA | 830E | EC5E | 8B00 | EA46 | 568B |
| 0000610760 | 5EEC | C95F | 90CB | 8B55 | 57EC | 7EC4 | 8B06 | 33DF |
| 0000611000 | B9C0 | FFFF | AEF2 | F741 | 8AD9 | 0A46 | FB8B | AEF2 |
| 0000611020 | 264F | 0538 | 0474 | FF33 | C78E | C78B | C28C | 8B5F |
| 0000611040 | 5DE5 | 00CB | 8B55 | 8BEC | 1ED6 | 76C5 | C40A | 065E |
| 0000611060 | FFB0 | C00A | 2D74 | 26AC | 278A | 3A43 | 74E0 | 2CF3 |
| 0000611100 | 3C41 | 1A1A | 80C9 | 20E1 | C102 | 4104 | E086 | 412C |
| 0000611120 | 1A3C | C91A | E180 | 0220 | 04C1 | 3A41 | 74C4 | 1AD3 |
| 0000611140 | 1CC0 | 98FF | 8B1F | 5DF2 | 00CB | 8B55 | 57EC | 7EC4 |
| 0000611160 | 3306 | B9C0 | FFFF | AEF2 | F741 | 4FD9 | 468A | FD0A |
| 0000611200 | AEF2 | 2647 | 0538 | 0674 | C033 | D08B | 04EB | C78B |
| 0000611220 | C28C | 5FFC | E58B | CB5D | 8B55 | 8BEC | 0E4E | 571E |
| 0000611240 | 0B56 | 75C9 | E903 | 00AF | 76C5 | C40A | 067E | 561E |
| 0000611260 | 5706 | C89A | 9353 | 8B63 | 0E4E | D20B | 5778 | C12B |
| 0000611300 | DA83 | 7300 | 4950 | F103 | 0773 | D88C | 3B05 | 8E33 |
| 0000611320 | 03D8 | 73F9 | 8C07 | 05C0 | 653D | C08E | 8B41 | 48C1 |
| 0000611340 | C72B | DB1B | C323 | C703 | C62B | DB1B | C323 | C603 |
| 0000611360 | 9140 | C12B | F3FD | FCA4 | E391 | 835C | FFFE | 0775 |
| 0000611400 | D88C | 482D | 8E65 | 83D8 | FFFF | D175 | C08C | 732D |
| 0000611420 | 8E65 | EBC0 | 8BC8 | 48C1 | D78B | D2F7 | C22B | DB1B |
| 0000611440 | C323 | C203 | D68B | D2F7 | C22B | DB1B | C323 | C203 |
| 0000611460 | 9140 | C12B | E9D1 | A5F3 | C913 | A4F3 | E391 | 0B18 |
| 0000611500 | 75F6 | 8C07 | 05D8 | 657F | D88E | FF0B | C775 | C08C |
| 0000611520 | B605 | 8E65 | EBC0 | 8BBE | 0646 | 568B | 5E08 | 1F5F |
| 0000611540 | CB5D | 8B55 | 33EC | 8BC0 | 0E4E | 4FE3 | 571E | C556 |
| 0000611560 | 0676 | 7EC4 | 8B0A | 48C1 | D78B | D2F7 | C22B | DB1B |
| 0000611600 | C323 | C203 | D68B | D2F7 | C22B | DB1B | C323 | C203 |
| 0000611620 | 9140 | C12B | A6F3 | 1B75 | E391 | 0B1D | 75F6 | 8C07 |
| 0000611640 | 05D8 | 65C1 | D88E | FF0B | CB75 | C08C | 1205 | 8E66 |
| 0000611660 | EBC0 | 1BC2 | 1DC0 | FFFF | 5F5E | 5D1F | 00CB | 8B55 |
| 0000611700 | 8BEC | 0E4E | 571E | E356 | C548 | 0A76 | 7EC4 | 8B06 |
| 0000611720 | 48C1 | D78B | D2F7 | C22B | DB1B | C323 | C203 | D68B |
| 0000611740 | D2F7 | C22B | DB1B | C323 | C203 | 9140 | C12B | E9D1 |
| 0000611760 | A5F3 | C913 | A4F3 | E391 | 0B18 | 75F6 | 8C07 | 05D8 |
| 0000612000 | 661D | D88F | FF0B | C775 | C08C | 7005 | 8E66 | EBC0 |
| 0000612020 | 8BBE | 0646 | 568B | 5E08 | 1F5F | CB5D | 8B55 | 8BEC |
| 0000612040 | 0C4E | 38E3 | C457 | 067E | D78B | DAF7 | 0C74 | D12B |
| 0000612060 | DB1B | D323 | D103 | D187 | D12B | 468B | 8A0A | D1E0 |
| 0000612100 | F3E9 | 13AB | F3C9 | 87AA | E3D1 | 8C10 | 81C3 | 7BC3 |
| 0000612120 | 8E66 | D1C3 | F3E9 | 13AB | F3C9 | 5FAA | 468B | 8B06 |
| 0000612140 | 0856 | CB5D | 4E8B | 8B0E | 0646 | 568B | 1E08 | 7EC5 |
| 0000612160 | 570A | 071E | 93FC | C00A | 1374 | F983 | 750A | 0B0E |
| 0000612200 | 79D2 | B00A | AA2D | DBF7 | D283 | F700 | 8BDA | 92F7 |
| 0000612220 | D233 | C00B | 0274 | F1F7 | F793 | 92F1 | D387 | 3004 |
| 0000612240 | 393C | 0276 | 2704 | 8BAA | 0BC2 | 75C3 | 88E2 | 4F05 |
| 0000612260 | 86AC | 8805 | FF44 | 448D | 3B01 | 72C7 | 8CF2 | 58DA |
| 0000612300 | 5F1F | 8B5E | 5DE5 | 00CB | 36C8 | 0000 | 468D | 50DC |
| 0000612320 | 468D | 50F6 | 76FF | FF0C | 0A76 | 76FF | FF08 | 0676 |
| 0000612340 | E49A | 8CA3 | 8367 | 0CC4 | C28E | D88B | 5E89 | 8CD8 |
| 0000612360 | DA46 | 8B26 | 0247 | 8948 | D646 | FF3D | 7CFF | 8B08 |
| 0000612400 | 0E4E | 3B49 | 7EC1 | 6A1D | 8B00 | DE46 | 5048 | 76FF |
| 0000612420 | FF12 | 1076 | 468D | 1606 | 9A50 | A6B6 | 67AA | C483 |

THU MAR 14 17:52:34 1991 TSLINT.DLL PAGE 215, LINE 12627

| | | | | | | | | |
|---|---|---|---|---|---|---|---|---|
| 0000612440 | EB0C | 901C | 468B | 260E | 472B | 5002 | 76FF | FF12 |
| 0000612460 | 1076 | 468D | 1606 | 9A50 | A85C | 6525 | C483 | 890A |
| 0000612500 | D246 | 5689 | 89D4 | F246 | 5689 | EBF4 | 900A | 8026 |
| 0000612520 | 2E3F | 0C74 | 46FF | C4D2 | D25E | 8026 | 003F | EE75 |
| 0000612540 | 46FF | 26D2 | 3F80 | 7400 | EB47 | 900A | 8026 | 653F |
| 0000612560 | 0C74 | 46FF | 8BD2 | D25E | 8026 | 003F | EE75 | C38B |
| 0000612600 | C28C | 4EFF | 89D2 | CE46 | 5689 | EBD0 | 9004 | 4EFF |
| 0000612620 | 8BD2 | D25E | 8026 | 303F | F474 | 5EC4 | FFCE | CE46 |
| 0000612640 | 8A26 | FF07 | D246 | 5EC4 | 26D2 | 0788 | C00A | EA75 |
| 0000612660 | 468B | 8BF2 | F456 | CBC9 | 04C8 | 0000 | 468B | 8B04 |
| 0000612700 | 0656 | 4689 | 89FC | FE56 | 4EFF | 740C | EB79 | 9044 |
| 0000612720 | 8026 | 3B3F | 6774 | 8026 | 223F | 2274 | 8A26 | C407 |
| 0000612740 | 085E | 8826 | FF07 | 0446 | 46FF | FF08 | 0C4E | 2375 |
| 0000612760 | 468B | 8B04 | 0656 | 4689 | 89FC | FE56 | 48EB | 46FF |
| 0000613000 | C404 | 045E | 8026 | 003F | 1475 | 8026 | 003F | 0374 |
| 0000613020 | 46FF | C404 | 045E | 8026 | 003F | B475 | 1FEB | 8026 |
| 0000613040 | 223F | E674 | 8A26 | C407 | 085E | 8826 | FF07 | 0446 |
| 0000613060 | 46FF | FF08 | 0C4E | C975 | B6EB | 46FF | 8B04 | 045E |
| 0000613100 | 8026 | 3B3F | F474 | 5EC4 | 2608 | 07C6 | 8B00 | 0446 |
| 0000613120 | 568B | 3906 | FC46 | 0875 | 5639 | 75FE | 2B03 | 99C0 |
| 0000613140 | C3C9 | C58B | EC8B | DA8C | 5EC5 | 8904 | 8907 | 027F |
| 0000613160 | 7789 | 8904 | 0667 | 4E8B | 8900 | 084F | 4E8B | 8902 |
| 0000613200 | 0A4F | 5789 | 8E0C | 8BDA | 33E8 | CBC0 | EC8B | 468B |
| 0000613220 | 0B08 | 75C0 | 4001 | 5EC5 | 8B04 | 027F | 778B | 8B04 |
| 0000613240 | 0667 | EC8B | 4F8B | 8908 | 004E | 4F8B | 890A | 024E |
| 0000613260 | 2F8B | 5F8E | CB0C | 078A | E42A | 578D | 5301 | DC8B |
| 0000613300 | 02B9 | 5100 | 521E | 1650 | 9A53 | 4D6E | 0000 | CB5B |
| 0000613320 | 08C8 | 0000 | 6A56 | FF00 | 0876 | 76FF | 9A06 | 7550 |
| 0000613340 | 6965 | C483 | 0B06 | 75C0 | 6841 | 0104 | 76FF | FF10 |
| 0000613360 | 0E76 | 2A9A | 7D78 | 8369 | 06C4 | 5EC4 | 260E | 7F80 |
| 0000613400 | 0003 | 0E74 | 681E | 78BE | 5306 | 6E9A | 9150 | 8369 |
| 0000613420 | 08C4 | 76FF | FF08 | 0676 | 76FF | FF10 | 0E76 | 6E9A |
| 0000613440 | A350 | 8369 | 08C4 | B0E9 | 9000 | 76FF | FF0C | 0A76 |
| 0000613460 | 0A9A | E153 | 8369 | 04C4 | 4689 | 89FC | FE56 | D00B |
| 0000613500 | 0375 | 8DE9 | 6A00 | FF00 | 1076 | 76FF | FF0E | FE76 |
| 0000613520 | 76FF | E8FC | FE62 | C483 | 890A | FC46 | 5689 | 0BFE |
| 0000613540 | 74D0 | C46F | 0E5E | 8026 | 003F | 6674 | 5306 | 149A |
| 0000613560 | 2351 | 836A | 04C4 | 5EC4 | 030E | 89D8 | F85E | 468C |
| 0000613600 | 26FA | 478A | 98FF | F08B | FE83 | 742F | 8317 | 5CFE |
| 0000613620 | 1274 | FE83 | 743A | 260D | 07C6 | 8D5C | 0147 | 4689 |
| 0000613640 | 8CF8 | FA46 | 76FF | FF08 | 0676 | 76FF | FFFA | F876 |
| 0000613660 | B49A | 3350 | 836A | 08C4 | 006A | 76FF | FF10 | 0E76 |
| 0000613700 | 509A | 5375 | 8367 | 06C4 | C00B | 0374 | 76E9 | EBFF |
| 0000613720 | 9008 | 5EC4 | 260E | 07C6 | 5E00 | CBC9 | 14C8 | 0000 |
| 0000613740 | 5657 | 468B | 0B0C | 0A46 | 0D75 | CBA1 | 8B70 | CD16 |
| 0000613760 | 8970 | 0A46 | 5689 | 8B0C | 0646 | 568B | 8908 | F446 |
| 0000614000 | 5689 | BEF6 | 0002 | 16EB | 4683 | 04F4 | FF26 | 0277 |
| 0000614020 | FF26 | 9A37 | 5114 | 6AB1 | C483 | 4004 | F003 | 5EC4 |
| 0000614040 | 26F4 | 478B | 2602 | 070B | 0674 | FE81 | 7FFF | D876 |
| 0000614060 | 468B | 0B1C | 1A46 | 2274 | 76FF | FF1C | 1A76 | 149A |
| 0000614100 | C151 | 836A | 04C4 | 76FF | FF20 | 1E76 | F88B | 149A |
| 0000614120 | E251 | 836A | 04C4 | F803 | F703 | 7689 | 81FC | FFFE |
| 0000614140 | 727F | C41D | 125E | C02B | 8926 | 0247 | 8926 | 9A07 |
| 0000614160 | 30C0 | 6AF4 | 4689 | 89F0 | F256 | 5EC4 | E9F0 | 0110 |
| 0000614200 | 9A56 | 4DB0 | 6B16 | C483 | C402 | 0E5E | 8926 | 2607 |
| 0000614220 | 5789 | 0B02 | 75D0 | C433 | 125E | C02B | 8926 | 0247 |
| 0000614240 | 8926 | 9A07 | 30C0 | 6B29 | 4689 | 89EC | EE56 | 5EC4 |
| 0000614260 | 26EC | 07C7 | 000C | B89A | 5A30 | 8E6B | 8BC2 | 26D8 |
| 0000614300 | 07C7 | 0008 | FFB8 | E9FF | 0347 | 468B | 8B0A | 0C56 |

THU MAR 14 17:52:34 1991 TSLINT.DLL PAGE 216, LINE 12686

| | | | | | | | | |
|---|---|---|---|---|---|---|---|---|
| 0000614320 | 4689 | 89F4 | F656 | 02BE | EB00 | 9017 | 4683 | 04F4 |
| 0000614340 | FF26 | 0277 | FF26 | 9A37 | 5114 | 6BB8 | C483 | 4004 |
| 0000614360 | F003 | 5EC4 | 26F4 | 478B | 2602 | 070B | 0674 | FE81 |
| 0000614400 | 7FFF | D876 | 3E83 | 78C4 | 7400 | A11F | 6EC3 | 4689 |
| 0000614420 | EBFE | 9004 | 4EFF | 83FE | FE7E | 7400 | 8B12 | FE5E |
| 0000614440 | BF80 | 6EC4 | 7500 | EB08 | 90EB | 46C7 | 00FE | 8300 |
| 0000614460 | FE7E | 7400 | 8B0A | FE46 | 0705 | D100 | 03E0 | FFF0 |
| 0000614500 | 1876 | 76FF | 9A16 | 5114 | 6BE1 | C483 | 2B04 | 03D2 |
| 0000614520 | FC46 | D213 | C603 | D283 | 0B00 | 7CD2 | 7F49 | 3D05 |
| 0000614540 | 7FFE | 4276 | 5EC4 | 260E | 77FF | 2602 | 37FF | BA9A |
| 0000614560 | F54D | 836B | 04C4 | 5EC4 | 2B0E | 26C0 | 4789 | 2602 |
| 0000614600 | 0789 | C09A | 0830 | 896C | EC46 | 5689 | C4EE | EC5E |
| 0000614620 | C726 | 0707 | 9A00 | 30B8 | 6C1A | C28E | D88B | C726 |
| 0000614640 | 0A07 | E900 | FF1E | 9A56 | 4DB0 | 6C3A | C483 | C402 |
| 0000614660 | 125E | 8926 | 2607 | 5789 | 0B02 | 75D0 | C419 | 0E5E |
| 0000614700 | FF26 | 0277 | FF26 | 9A37 | 4DBA | 6C75 | C483 | C404 |
| 0000614720 | 0E5E | C5E9 | 90FE | 5EC4 | 260E | 078B | 8B26 | 0257 |
| 0000614740 | 4689 | 89F8 | FA56 | 4E8B | 8B06 | 085E | 4E89 | 89F4 |
| 0000614760 | F65E | 7E8B | 0B1C | 1A7E | 7874 | 76FF | FF1C | 1A76 |
| 0000615000 | 5052 | B49A | 8750 | 836C | 08C4 | 681E | 78C0 | 76FF |
| 0000615020 | FF1C | 1A76 | 149A | 9D51 | 836C | 04C4 | 4E8B | 8BF8 |
| 0000615040 | FA56 | C803 | 8941 | F84E | 5152 | B49A | B150 | 836C |
| 0000615060 | 08C4 | 76FF | FF2D | 1E76 | 76FF | FFFA | F876 | 6E9A |
| 0000615100 | BF50 | 836C | 08C4 | 76FF | FF20 | 1E76 | 149A | 0251 |
| 0000615120 | 836D | 04C4 | D88B | 5E03 | 8EF8 | FA46 | 5E89 | 26F8 |
| 0000615140 | 47C6 | 20FF | 468B | 8BF4 | F656 | 0405 | 8900 | F446 |
| 0000615160 | 4BEB | 5EC4 | 26F4 | 478B | 2602 | 070B | 0675 | 46FF |
| 0000615200 | EBF8 | 903A | FF26 | 0277 | FF26 | 5237 | 76FF | 9AF8 |
| 0000615220 | 50B4 | 6D24 | C483 | 8B08 | F446 | 568B | 89F6 | EC46 |
| 0000615240 | 5689 | 83EE | F446 | C404 | EC5E | FF26 | 0277 | FF26 |
| 0000615260 | 9A37 | 5114 | 6D49 | C483 | 4004 | 4601 | C4F8 | F45E |
| 0000615300 | 8B26 | 0247 | 0B26 | 7407 | 264D | 77FF | 2602 | 37FF |
| 0000615320 | 76FF | FFFA | F876 | B49A | 6B50 | 836D | 08C4 | 468B |
| 0000615340 | 8BF4 | F656 | 4689 | 89EC | EE56 | 4683 | 04F4 | 5EC4 |
| 0000615360 | 26EC | 77FF | 2602 | 37FF | 149A | E551 | 836D | 04C4 |
| 0000615400 | 4601 | C4F8 | F85E | C626 | 2007 | 478D | 8901 | F846 |
| 0000615420 | 468C | EBFA | 90A8 | C02A | 5EC4 | 26F8 | 4788 | 26FF |
| 0000615440 | 0788 | 5EC4 | 2612 | 078B | 8B26 | 0257 | 4689 | 89F8 |
| 0000615460 | FA56 | 5EC4 | 890A | F45E | 468C | 26F6 | 4F8B | 2602 |
| 0000615500 | 0F0B | 1575 | 7E83 | 00FE | 0F75 | C28E | D88B | C626 |
| 0000615520 | 0007 | 8940 | F846 | 5689 | C4FA | F45E | 8B26 | 0247 |
| 0000615540 | 0B26 | 7407 | 263D | 77FF | 2602 | 37FF | 76FF | FFFA |
| 0000615560 | F876 | B49A | 5050 | 8369 | 08C4 | 468B | 8BF4 | F656 |
| 0000615600 | 4689 | 89EC | EE56 | 4683 | 04F4 | 5EC4 | 26EC | 77FF |
| 0000615620 | 2602 | 37FF | 149A | 2551 | 836E | 04C4 | 0140 | F846 |
| 0000615640 | B7EB | 7E83 | 00FE | 6074 | 681E | 6E9E | 76FF | FFFA |
| 0000615660 | F876 | B49A | 3150 | 836E | 08C4 | 681E | 6E9E | 149A |
| 0000615700 | 8651 | 836A | 04C4 | 4601 | 2BF8 | EBF6 | 9027 | 848A |
| 0000615720 | 6EC5 | C88B | F8C0 | 2404 | 040F | C441 | F85E | 46FF |
| 0000615740 | 26F8 | 0788 | E180 | 800F | 41C1 | 5EC4 | FFF8 | F846 |
| 0000615760 | 8826 | 460F | 468B | FFFE | FE4E | C00B | D075 | 5EC4 |
| 0000616000 | FFF8 | F846 | C626 | 0007 | 5EC4 | 26F8 | 07C6 | 2B00 |
| 0000616020 | 5EC0 | C95F | 90CB | 8B55 | 83EC | 04EC | 468B | 3306 |
| 0000616040 | 3DD2 | 0000 | 2074 | 3D42 | 0002 | 1A74 | 033D | 7400 |
| 0000616060 | 4215 | 013D | 7400 | 8B0F | 3DD0 | 0004 | 0874 | 16BA |
| 0000616100 | 3300 | E9C0 | C1A2 | C033 | 5050 | 5250 | 76FF | FF0E |
| 0000616120 | 0C76 | 76FF | FF12 | 1076 | 468D | 16FC | FF50 | 0A76 |
| 0000616140 | 76FF | C708 | D306 | 0170 | 9A00 | FFFF | 0000 | 06C7 |
| 0000616160 | 70D3 | 0000 | C00B | 0374 | 86E9 | 83C1 | 067E | 7502 |

THU MAR 14 17:52:34 1991 TSLINT.DLL PAGE 217, LINE 12745

| | | | | | | | | |
|---|---|---|---|---|---|---|---|---|
| 0000616200 | 5005 | E80E | BE6F | 468B | 83FC | 067E | 7500 | 8A05 |
| 0000616220 | 8AE0 | FE46 | E58B | CB5D | 581E | 4590 | 8B55 | 1EEC |
| 0000616240 | D88E | 1AB8 | 9A00 | 2E84 | 6F3B | 46C7 | 00F8 | 8300 |
| 0000616260 | 147E | 7400 | E903 | 00AC | 468B | 8808 | 0A56 | 4689 |
| 0000616300 | 89EC | EE56 | 681E | 78C8 | 0A9A | 7053 | 836F | 04C4 |
| 0000616320 | 4689 | 8908 | 0A56 | 4689 | 89FA | FC56 | D00B | 0374 |
| 0000616340 | 89E9 | 8000 | C23E | 006E | 0874 | 46C7 | D008 | EB78 |
| 0000616360 | 9006 | 46C7 | D808 | 8C78 | 0A5E | 0468 | 9A01 | 4DB0 |
| 0000616400 | 6F9A | C483 | 8902 | FA46 | 5689 | 0BFC | 75D0 | B807 |
| 0000616420 | FFFF | DDE9 | 9000 | 46FF | FFF8 | FC76 | 1E50 | E468 |
| 0000616440 | FF78 | 0A76 | 76FF | 9A08 | 6940 | 6FAD | C483 | C40C |
| 0000616460 | FA5E | 8026 | 003F | 2075 | 5306 | BA9A | B54D | 836F |
| 0000616500 | 04C4 | C09A | 0730 | 8970 | E646 | 5689 | C4E8 | E65E |
| 0000616520 | C726 | 0807 | EB00 | 90B8 | C38B | C28C | 4689 | 8908 |
| 0000616540 | 0A56 | 08EB | C02B | 4689 | 89FC | FA46 | 76FF | FFEE |
| 0000616560 | EC76 | 76FF | FFFC | FA76 | 76FF | FF0A | 0876 | 468D |
| 0000616600 | 16F4 | 8D50 | F046 | 5016 | 76FF | FF12 | 1076 | 76FF |
| 0000616620 | FF0E | 0C76 | 4C9A | 2A6A | 8370 | 1CC4 | 7540 | E903 |
| 0000616640 | FF6D | 76FF | FFF6 | F476 | 76FF | FFF2 | F076 | 76FF |
| 0000616660 | FF0A | 0876 | 76FF | 9A06 | 6E86 | 7041 | C483 | 890E |
| 0000616700 | EA46 | 7E83 | 00F8 | 0E74 | 76FF | FFFC | FA76 | BA9A |
| 0000616720 | 4F4D | 8370 | 04C4 | 76FF | FFF2 | F076 | BA9A | 5D4D |
| 0000616740 | 8370 | 04C4 | 76FF | FFF6 | F476 | BA9A | 7A4D | 8B70 |
| 0000616760 | EA46 | 4D4D | E58B | 5D1F | CB4D | 581E | 4590 | 8B55 |
| 0000617000 | 1EEC | D88E | 16B8 | 9A00 | 2E84 | 70A1 | 3E80 | 6EC2 |
| 0000617020 | 7400 | B805 | 78F3 | 03EB | F8B8 | A378 | 7900 | 5C6A |
| 0000617040 | 468B | 8B08 | 0A56 | 4689 | 89EA | EC56 | 5052 | DA9A |
| 0000617060 | B764 | 8370 | 06C4 | 4689 | 89EE | F056 | 2F6A | 76FF |
| 0000617100 | FFEC | EA76 | DA9A | DC64 | 8370 | 06C4 | 4689 | 89FA |
| 0000617120 | FC56 | D00B | 7E75 | 468B | 0BF0 | EE46 | 0374 | 8FE9 |
| 0000617140 | 6A00 | FF3A | EC76 | 76FF | 9AEA | 6466 | 70F4 | C483 |
| 0000617160 | 8906 | EE46 | 5689 | 0BF0 | 75D0 | FF75 | EC76 | 76FF |
| 0000617200 | 9AEA | 5114 | 7100 | C483 | 0504 | 0003 | 9A50 | 4DB0 |
| 0000617220 | 7121 | C483 | 8902 | EA46 | 5689 | 0BEC | 75D0 | B807 |
| 0000617240 | FFFF | 7EE9 | 9001 | 681E | 78FD | 76FF | 50EC | B49A |
| 0000617260 | 3550 | 8371 | 08C4 | 76FF | FF0A | 0876 | 76FF | FFEC |
| 0000617300 | EA76 | 6E9A | 6B50 | 8371 | 08C4 | 468B | 8BEA | EC56 |
| 0000617320 | 4040 | 16EB | 468B | 0BF0 | EE46 | 0874 | 468B | 39EE |
| 0000617340 | FA46 | 0C76 | 468B | 8BFA | FC56 | 4689 | 89EE | F056 |
| 0000617360 | 2E6A | 76FF | FFF0 | EE76 | DA9A | 8664 | 8371 | 06C4 |
| 0000617400 | 4689 | 89F6 | F856 | D00B | 3674 | FF1E | 0036 | FF79 |
| 0000617420 | F876 | 9A50 | 6494 | 71A4 | C483 | 5008 | 76FF | FF12 |
| 0000617440 | 1076 | 76FF | FF0E | 0C76 | 76FF | FFEC | EA76 | 76FF |
| 0000617460 | 9A06 | 6F08 | 71B9 | C483 | 8910 | F446 | C6E9 | 9000 |
| 0000617500 | 76FF | FFEC | EA76 | 149A | C551 | 8371 | 04C4 | 0505 |
| 0000617520 | 5000 | B09A | E44D | 8371 | 02C4 | 4689 | 89EE | F056 |
| 0000617540 | D00B | 0375 | 38E9 | FFFF | EC76 | 76FF | FFEA | F076 |
| 0000617560 | 9A50 | 5034 | 71F2 | C483 | FF08 | EC76 | 76FF | 9AEA |
| 0000617600 | 5114 | 722C | C483 | 0304 | EE46 | 568B | 89F0 | F646 |
| 0000617620 | 5689 | C7F8 | F446 | FFFF | 46C7 | 02F2 | EB00 | 9004 |
| 0000617640 | 4EFF | 83F2 | F27E | 7C00 | 8B4E | F25E | E3D1 | FF1E |
| 0000617660 | 00B7 | FF79 | F876 | 76FF | 9AF6 | 50B4 | 723C | C483 |
| 0000617700 | 6A08 | FF00 | F076 | 76FF | 9AEE | 7550 | 725F | C483 |
| 0000617720 | 4006 | CC74 | 76FF | FFF2 | 1276 | 76FF | FF10 | 0E76 |
| 0000617740 | 76FF | FF0C | F076 | 76FF | FFEE | 0676 | 089A | 706F |
| 0000617760 | 8372 | 10C4 | 4689 | FFF4 | F076 | 76FF | 9AEE | 4DBA |
| 0000620000 | 728E | C483 | 8B04 | 0846 | 568B | 390A | EA46 | 0575 |
| 0000620020 | 5639 | 74EC | FF0B | EC76 | 76FF | 9AEA | 4DBA | 6E07 |
| 0000620040 | 468B | 4DF4 | 8B4D | 1FE5 | 4D5D | 90CB | 581E | 4590 |

THU MAR 14 17:52:34 1991 TSLINT.DLL PAGE 218, LINE 12804

| | | | | | | | | |
|---|---|---|---|---|---|---|---|---|
| 0000620060 | 8B55 | 1EEC | D88E | EC83 | 5610 | C02B | 4689 | 89F2 |
| 0000620100 | F046 | 76FF | FF12 | 1076 | 76FF | FF0E | 0C76 | 76FF |
| 0000620120 | FF0A | 0876 | 76FF | 9A06 | 706A | 72DB | C483 | 890E |
| 0000620140 | FC46 | 7440 | E903 | 0170 | C09A | F530 | 8E72 | 8BC2 |
| 0000620160 | 26D8 | 3F83 | 7402 | E903 | 015E | 2F6A | 76FF | FF0A |
| 0000620200 | 0876 | 669A | 0C64 | 8373 | 06C4 | D00B | 0374 | 47E9 |
| 0000620220 | 6A01 | FF5C | 0A76 | 76FF | 9A08 | 6466 | 7332 | C483 |
| 0000620240 | 0B06 | 74D0 | E903 | 0130 | 5EC4 | 2608 | 3F80 | 7400 |
| 0000620260 | 260A | 7F80 | 3A01 | 0375 | 1DE9 | 1E01 | 0668 | 9A79 |
| 0000620300 | 530A | 734A | C483 | 8904 | F446 | 5689 | 0BF6 | 75D0 |
| 0000620320 | E903 | 0104 | 0468 | 9A01 | 4DB0 | 738F | C483 | 8902 |
| 0000620340 | F046 | 5689 | 0BF2 | 75D0 | E903 | 00EC | 0368 | FF01 |
| 0000620360 | F276 | 76FF | FFF0 | F676 | 76FF | E8F4 | F4BA | C483 |
| 0000620400 | 890A | F446 | 5689 | 0BF6 | 75D0 | E903 | 00CA | 5EC4 |
| 0000620420 | 26F0 | 3F80 | 7500 | E903 | 00BE | 5306 | 149A | B151 |
| 0000620440 | 8373 | 04C4 | 5EC4 | 03F0 | 4BD8 | 8026 | 5C3F | 1674 |
| 0000620460 | 8026 | 2F3F | 1074 | 681E | 790B | FF06 | F076 | 6E9A |
| 0000620500 | BF50 | 8373 | 08C4 | 76FF | FF0A | 0876 | 149A | CF51 |
| 0000620520 | 8373 | 04C4 | 76FF | FFF2 | F076 | F08B | 149A | EB51 |
| 0000620540 | 8373 | 04C4 | F003 | FE81 | 0104 | 6C73 | 76FF | FF0A |
| 0000620560 | 0876 | 76FF | FFF2 | F076 | 6E9A | 0850 | 8374 | 08C4 |
| 0000620600 | 76FF | FF12 | 1076 | 76FF | FF0E | 0C76 | 76FF | FFF2 |
| 0000620620 | F076 | 76FF | 9A06 | 706A | 7416 | C483 | 890E | FC46 |
| 0000620640 | 7540 | 9A35 | 30C0 | 7459 | C28E | D86B | 8326 | 023F |
| 0000620660 | 0375 | 37E9 | C4FF | F05E | 8026 | 5C3F | 0674 | 8026 |
| 0000620700 | 2F3F | 1475 | 8026 | 017F | 755C | E903 | FF1E | 8026 |
| 0000620720 | 017F | 752F | E903 | FF14 | 468B | 0BF2 | F046 | 0E74 |
| 0000620740 | 76FF | FFF2 | F076 | BA9A | 184D | 836F | 04C4 | 468B |
| 0000620760 | 5EFC | 4D4D | E58B | 5D1F | CB4D | 581E | 4590 | 8B55 |
| 0000621000 | 1EEC | D88E | EC83 | 1E18 | 0E68 | 9A79 | 530A | 749A |
| 0000621020 | C483 | 8904 | EE46 | 5689 | 8BF0 | 0846 | 460B | 7506 |
| 0000621040 | 6A1F | 5200 | 76FF | 9AEE | 7550 | 74EC | C483 | 0B06 |
| 0000621060 | 75C0 | B807 | 0001 | 9FE9 | 9000 | C02B | 99E9 | 9000 |
| 0000621100 | 46C7 | 16F2 | 8C79 | F45E | 468B | 8B06 | 0856 | 4689 |
| 0000621120 | 89F6 | F856 | C02B | 4689 | 89FC | FA46 | 468B | 0BF0 |
| 0000621140 | EE46 | 4674 | 36FF | 70CD | 36FF | 70CB | 468D | 16EE |
| 0000621160 | FF50 | F076 | 76FF | 6AEE | 9A00 | 706A | 74FA | C483 |
| 0000621200 | 890E | EC46 | 7540 | 9A1E | 30C0 | 7509 | C28E | D88B |
| 0000621220 | 8326 | 023F | 1474 | C09A | 4630 | 8E75 | 8BC2 | 26D8 |
| 0000621240 | 3F83 | 740D | 8B05 | EC46 | 2EEB | 3E80 | 6EC2 | 7400 |
| 0000621260 | C707 | EE46 | 7919 | 05EB | 46C7 | 21EE | 8C79 | F05E |
| 0000621300 | 36FF | 70CD | 36FF | 70CB | 468D | 16EE | 1E50 | 76FF |
| 0000621320 | 6AEE | 9A00 | 729C | 72CA | 4D4D | E58B | 5D1F | CB4D |
| 0000621340 | 8B55 | 83EC | 02EC | 76FF | FF08 | 0676 | 8D16 | FE46 |
| 0000621360 | 3350 | 50C0 | 9A50 | 4A31 | 0000 | C00B | 1675 | 46F6 |
| 0000621400 | 020A | 1374 | 46F7 | 01FE | 7400 | BA0C | 000D | 05B8 |
| 0000621420 | E900 | BAD4 | EAE9 | 8BBA | 5DE5 | 00CB | EC83 | 8B06 |
| 0000621440 | 16C4 | 4050 | 1640 | 9A50 | FFFF | 0000 | 8358 | 04C4 |
| 0000621460 | 55CB | EC8B | 76FF | 9A06 | FFFF | 0000 | C00B | FFB8 |
| 0000621500 | 75FF | 4001 | CB5D | 24C8 | 0000 | 8B56 | 0676 | 46C7 |
| 0000621520 | 00E0 | 0B00 | 7CF6 | 3906 | C336 | 7F6E | 9A19 | 30C0 |
| 0000621540 | 7604 | 4689 | 89DC | DE56 | 5EC4 | 26DC | 07C7 | 0009 |
| 0000621560 | FFB8 | E9FF | 0241 | E856 | DE16 | C483 | 5602 | 468D |
| 0000621600 | 16E2 | 8D50 | E446 | 5016 | 599A | 0049 | 0B00 | 74C0 |
| 0000621620 | 9A1B | 30C0 | 7692 | 4689 | 89DC | DE56 | 5EC4 | 26DC |
| 0000621640 | 07C7 | 0009 | 46C7 | FFE0 | E9FF | 0201 | C02B | 5EC4 |
| 0000621660 | 2608 | 4789 | 260A | 4789 | 2608 | 4789 | 2604 | 4789 |
| 0000621700 | 2602 | 47C7 | 0106 | 8A00 | C584 | 246E | 3C10 | 1B01 |
| 0000621720 | 25C0 | 0092 | 2405 | 2601 | 4789 | 5604 | 016A | 468D |

THU MAR 14 17:52:34 1991 TSLINT.DLL PAGE 219, LINE 12863

| | | | | | | | | |
|---|---|---|---|---|---|---|---|---|
| 0000621740 | 16E6 | 6A50 | 9A16 | FFFF | 0000 | 468A | 25F0 | 001F |
| 0000621760 | E0D1 | 8B50 | F046 | E025 | C107 | 05E8 | 8A50 | F146 |
| 0000622000 | E8C0 | 2A03 | 50E4 | 468A | 25EE | 001F | 8B50 | EE46 |
| 0000622020 | E025 | C101 | 05E8 | 8A50 | EF46 | E8D0 | E42A | 9A50 |
| 0000622040 | 6370 | 76E6 | C483 | C40C | 085E | 8926 | 1647 | 8926 |
| 0000622060 | 1857 | 7E83 | 00EA | 0675 | 7E83 | 00EC | 4274 | 468A |
| 0000622100 | 25EC | 001F | E0D1 | 8B50 | EC46 | E025 | C107 | 05E8 |
| 0000622120 | 8A50 | ED46 | E3C0 | 2A03 | 50E4 | 468A | 25EA | 001F |
| 0000622140 | 8B50 | EA46 | E025 | C101 | 05E8 | 8A50 | EB46 | E8D0 |
| 0000622160 | E42A | 9A50 | 6370 | 7747 | C483 | C40C | 085E | 0BEB |
| 0000622200 | 5EC4 | 2608 | 478B | 2616 | 578B | 2618 | 4789 | 2612 |
| 0000622220 | 5789 | 8314 | E67E | 7500 | 8306 | E87E | 7400 | 8A43 |
| 0000622240 | E846 | 1F25 | D100 | 50E0 | 468B | 25E8 | 07E0 | E8C1 |
| 0000622260 | 5005 | 468A | C0E9 | 03E8 | E42A | 8A50 | E646 | 1F25 |
| 0000622300 | 5000 | 468B | 25E6 | 01E0 | E8C1 | 5005 | 468A | D0E7 |
| 0000622320 | 2AE8 | 50E4 | 709A | 9D63 | 8377 | 0CC4 | 5EC4 | EB08 |
| 0000622340 | 900C | 5EC4 | 2608 | 478B | 2616 | 578B | 2618 | 4789 |
| 0000622360 | 261A | 5789 | 8A1C | F046 | 1F25 | D100 | 50E0 | 468B |
| 0000622400 | 25F0 | 07E0 | E8C1 | 5005 | 468A | C0F1 | 03E8 | E42A |
| 0000622420 | 8A50 | EE46 | 1F25 | 5000 | 468B | 25EE | 01E0 | E8C1 |
| 0000622440 | 5005 | 468A | D0EF | 2AE8 | 50E4 | 709A | D663 | 8377 |
| 0000622460 | 0CC4 | 5EC4 | 2608 | 4789 | 2616 | 5789 | F618 | E246 |
| 0000622500 | 74FF | 2B19 | 26C0 | 4789 | 2610 | 4789 | 260E | 4F80 |
| 0000622520 | 2005 | 8926 | 2637 | 7789 | EB0C | 9052 | 016A | 006A |
| 0000622540 | 006A | 9A56 | 481E | 77EB | C483 | 8908 | FC46 | 5689 |
| 0000622560 | 6AFE | 6A02 | 6A00 | 5600 | 1E9A | 0748 | 8378 | 08C4 |
| 0000622600 | 5EC4 | 2608 | 4789 | 260E | 5789 | 6A10 | FF00 | FE76 |
| 0000622620 | 76FF | 56FC | 1E9A | 7E48 | 8374 | 08C4 | 5EC4 | 2608 |
| 0000622640 | 4F80 | 8005 | C02B | 8926 | 2607 | 4789 | 560C | EBE8 |
| 0000622660 | 83DB | 02C4 | 468B | 5EE0 | C8C9 | 8B55 | FFEC | 0A76 |
| 0000622700 | 76FF | FF08 | 0676 | 006A | 409A | 5678 | C978 | 90CB |
| 0000622720 | 12C8 | 0000 | 8B56 | 0C76 | 46C7 | 01FA | 8300 | 067E |
| 0000622740 | 7500 | 9A08 | 758C | 788D | 4689 | FF06 | 0676 | 468D |
| 0000622760 | 16FC | 8D50 | FA46 | 5016 | 239A | 0079 | 8B00 | 0846 |
| 0000623000 | 568B | 890A | F646 | 5689 | 0BF8 | 75D0 | 8B52 | FA46 |
| 0000623020 | 0305 | 3B00 | 7EC6 | 8B02 | 56F0 | B09A | 9F4D | 8378 |
| 0000623040 | 02C4 | 4689 | 89F6 | F856 | D00B | 2A75 | C09A | B230 |
| 0000623060 | 8978 | F246 | 5689 | C4F4 | F25E | C726 | 0C07 | 9A00 |
| 0000623100 | 30B8 | 78FE | C28E | D88B | C726 | 0807 | 8B00 | F646 |
| 0000623120 | 568B | E9F8 | 009B | 568B | 89F8 | 0846 | 5689 | 8A0A |
| 0000623140 | 0646 | 4004 | 5EC4 | FFF6 | F646 | 8826 | C407 | F65E |
| 0000623160 | 46FF | 26F6 | 07C6 | C43A | F65E | 46FF | 26F6 | 07C6 |
| 0000623200 | 8B5C | FA46 | 0305 | 3B00 | 76C6 | 9A19 | 30C0 | 7931 |
| 0000623220 | 4689 | 89EE | F056 | 5EC4 | 26EE | 07C7 | 0022 | C02B |
| 0000623240 | EB99 | 904E | 76FF | FF06 | F876 | 76FF | 8DF6 | FA46 |
| 0000623260 | 5016 | FF9A | 00FF | 8900 | FE46 | C00B | 2A74 | C09A |
| 0000623300 | 4430 | 8979 | EE46 | 5689 | C4F0 | EE5E | C726 | 0D07 |
| 0000623320 | 9A00 | 30B8 | 75D0 | 4689 | 89F2 | F456 | 468B | C4FE |
| 0000623340 | F25E | 8926 | EB07 | 90B7 | 468B | 8BF6 | F856 | 032D |
| 0000623360 | 5E00 | CBC9 | 8B55 | FFEC | 0876 | 76FF | 3306 | 50C0 |
| 0000623400 | 9A50 | FFFF | 0000 | C085 | 0374 | F4E9 | 8BB6 | 5DE5 |
| 0000623420 | 00CB | 8B55 | 1EEC | C553 | 065E | 76FF | FF0C | 0A76 |
| 0000623440 | 77FF | FF02 | 0E37 | 91E8 | 8900 | 0257 | 0789 | 1F5B |
| 0000623460 | CA5D | 0008 | 8B55 | 1EEC | C553 | 065E | 76FF | FF0C |
| 0000623500 | 0A76 | 77FF | FF02 | 0E37 | 09E8 | 8901 | 8907 | 0257 |
| 0000623520 | 1F5B | CA5D | 0008 | 8B55 | 1EEC | C553 | 065E | 76FF |
| 0000623540 | FF0C | 0A76 | 77FF | FF02 | 0E37 | 19E8 | 8901 | 0257 |
| 0000623560 | 0789 | 1F5B | CA5D | 0008 | 8B55 | 1EEC | C553 | 065E |
| 0000623600 | 078B | 578B | 8B02 | 0A4E | E80E | 019A | 0789 | 5789 |

THU MAR 14 17:52:34 1991 TSLINT.DLL PAGE 220, LINE 12922

| | | | | | | | | |
|---|---|---|---|---|---|---|---|---|
| 0000623620 | 5B02 | 5D1F | 06CA | 0000 | 8B55 | 1EEC | C553 | 065E |
| 0000623640 | 76FF | FF0C | 0A76 | 77FF | FF02 | 0E37 | 83E8 | 8901 |
| 0000623660 | 0257 | 0789 | 1F5B | CA5D | 0008 | 8B55 | 57EC | 5356 |
| 0000623700 | FF33 | 468B | 0B08 | 7DC0 | 4711 | 568B | F706 | F7D8 |
| 0000623720 | 1DDA | 0000 | 4689 | 8908 | 0656 | 468B | 0B0C | 7DC0 |
| 0000623740 | 4711 | 568B | F70A | F7D8 | 1DDA | 0000 | 4689 | 890C |
| 0000623760 | 0A56 | C00B | 1575 | 4E8B | 8B0A | 0846 | D233 | F1F7 |
| 0000624000 | D88B | 468B | F706 | 8BF1 | EBD3 | 8B38 | 8BD8 | 0A4E |
| 0000624020 | 568B | 8B08 | 0646 | EBD1 | D9D1 | EAD1 | D8D1 | DB0B |
| 0000624040 | F475 | F1F7 | F08B | 66F7 | 910C | 468B | F70A | 03E6 |
| 0000624060 | 72D1 | 3B0C | 0856 | 0777 | 0672 | 463B | 7606 | 4E01 |
| 0000624100 | D233 | 4F96 | 0775 | DAF7 | D8F7 | DA83 | 5B00 | 5F5E |
| 0000624120 | CA5D | 0008 | 8B55 | 8BEC | 0846 | 4E8B | 0B0C | 8BC8 |
| 0000624140 | 0A4E | 0975 | 468B | F706 | 5DE1 | 08CA | 5300 | E1F7 |
| 0000624160 | D88B | 468B | F706 | 0C66 | D803 | 468B | F706 | 03E1 |
| 0000624200 | 5BD3 | CA5D | 0008 | 8B55 | 53EC | 3357 | 8BFF | 0846 |
| 0000624220 | C00B | 117D | 8B47 | 0656 | D8F7 | DAF7 | 001D | 8900 |
| 0000624240 | 0846 | 5689 | 8B06 | 0C46 | C00B | 107D | 568B | F70A |
| 0000624260 | F7D8 | 1DDA | 0000 | 4689 | 890C | 0A56 | C00B | 1875 |
| 0000624300 | 4E8B | 8B0A | 0846 | D233 | F1F7 | 468B | F706 | 8BF1 |
| 0000624320 | 33C2 | 4FD2 | 4379 | 48EB | D88B | 4E8B | 8B0A | 0856 |
| 0000624340 | 468B | D106 | D1EB | D1D9 | D1EA | 0BD8 | 75DB | F7F4 |
| 0000624360 | 8BF1 | F7C8 | 0C66 | F791 | 0A66 | D103 | 0C72 | 563B |
| 0000624400 | 7708 | 7207 | 3B0B | 0646 | 0676 | 462B | 1B0A | 0C56 |
| 0000624420 | 462B | 1B06 | 0856 | 794F | F707 | F7DA | 83D8 | 00DA |
| 0000624440 | 5B5F | CA5D | 0008 | ED32 | 06E3 | E0D1 | D2D1 | FAE2 |
| 0000624460 | 00CB | 8B55 | 53EC | 8B56 | 0C46 | C00B | 1575 | 4E8B |
| 0000624500 | 8B0A | 0846 | D233 | F1F7 | D88B | 468B | F706 | 8BF1 |
| 0000624520 | EBD3 | 8B38 | 8BC8 | 0A5E | 568B | 8B08 | 0646 | E9D1 |
| 0000624540 | DBD1 | EAD1 | D8D1 | C90B | F475 | F3F7 | F08B | 66F7 |
| 0000624560 | 910C | 468B | F70A | 03E6 | 72D1 | 3B0C | 0856 | 0777 |
| 0000624600 | 0672 | 463B | 7606 | 4E01 | D233 | 5E96 | 5D5B | 08CA |
| 0000624620 | 0000 | 8B55 | 53EC | 468B | 0B0C | 75C0 | 8B15 | 0A4E |
| 0000624640 | 468B | 3308 | F7D2 | 8BF1 | 0646 | F1F7 | C28B | D233 |
| 0000624660 | 45EB | C88B | 5E8B | 8B0A | 0856 | 468B | D106 | D1E9 |
| 0000624700 | D1DB | D1EA | 0BD8 | 75C9 | F7F4 | 8BF3 | F7C8 | 0C66 |
| 0000624720 | F791 | 0A66 | D103 | 0C72 | 563B | 7708 | 7207 | 3B0B |
| 0000624740 | 0646 | 0676 | 462B | 1B0A | 0C56 | 462B | 1B06 | 0856 |
| 0000624760 | DAF7 | D8F7 | DA83 | 5B00 | CA5D | 0008 | 831E | 03FB |
| 0000625000 | 1677 | 0D74 | 05E8 | 8E1C | C7D8 | 8606 | 1601 | EB00 |
| 0000625020 | A307 | 792E | 1689 | 7930 | 1FF8 | A1CB | 0186 | 162D |
| 0000625040 | B300 | F60C | CBF3 | F38B | 08BF | 8C00 | 8CC0 | 8ED9 |
| 0000625060 | 8EC1 | FCD8 | A5A5 | D98E | 08BE | C300 | F38B | 08BF |
| 0000625100 | 8C00 | 8CC0 | 8ED9 | 8EC1 | FCD8 | A5A5 | A5A5 | D98E |
| 0000625120 | 08BE | C300 | 758B | 89FC | FC7D | 45C6 | 07FE | 03EB |
| 0000625140 | 758B | FCFC | C033 | 0C8B | 548B | F702 | 80C2 | 747F |
| 0000625160 | 8925 | D105 | D1FA | D1D9 | D1D8 | D1FA | D1D9 | D1D8 |
| 0000625200 | D1FA | D1D9 | 89D8 | 0245 | 4D89 | 8004 | 8FE6 | C281 |
| 0000625220 | 3800 | 5589 | C306 | 0589 | 4589 | 8902 | 0445 | 4589 |
| 0000625240 | C306 | 3E8B | 0186 | 8BFC | 8B0C | 0254 | C033 | C2F7 |
| 0000625260 | 7F80 | 2974 | FAD1 | D9D1 | D8D1 | FAD1 | D9D1 | D8D1 |
| 0000625300 | FAD1 | D9D1 | D8D1 | E680 | 818F | 00C2 | C738 | 0005 |
| 0000625320 | 8900 | 0245 | 4D89 | 8904 | 0655 | F78B | 8BC3 | 8AC8 |
| 0000625340 | EBD0 | 8BEA | 863E | FC01 | 8BAD | ADC8 | C80A | D48A |
| 0000625360 | 8AAD | 8AF0 | ADDC | F88A | E2D1 | D3D1 | E2D1 | D3D1 |
| 0000625400 | E2D1 | D3D1 | CD0A | 0374 | CA80 | B101 | 0A80 | 8AF9 |
| 0000625420 | 22EC | 25E9 | 7FF0 | E03D | 7747 | 2D3D | 3800 | 3B72 |
| 0000625440 | E0D1 | E0D1 | E0D1 | D13A | 0777 | 1572 | C6F6 | 7401 |
| 0000625460 | 8010 | 01C6 | D383 | 7300 | 0508 | 0080 | 803D | 747F |

THU MAR 14 17:52:34 1991 TSLINT.DLL PAGE 221, LINE 12981

| | | | | | | | | |
|---|---|---|---|---|---|---|---|---|
| 0000625500 | 0B17 | 74C0 | 8016 | 7FE7 | C70A | E50A | 4589 | 8A02 |
| 0000625520 | 8AE3 | 89C6 | 8B05 | C3F7 | 47E9 | 3322 | 89C0 | 8905 |
| 0000625540 | 0245 | F78B | 33C3 | 8BD2 | 8BDA | 8BD0 | EBC3 | 8B1D |
| 0000625560 | 33D0 | 0BDB | 79D2 | F715 | EBDA | 8B11 | 8BDA | 8BD0 |
| 0000625600 | 0BC3 | 79C0 | F707 | F7DB | 83DA | 00DB | C48A | 8024 |
| 0000625620 | 9EB4 | 75E9 | 3304 | 8BD2 | 8BDA | 8BC8 | EBC3 | 8B1D |
| 0000625640 | 33C8 | 0BDB | 79C9 | F715 | EBD9 | 8B11 | 8BDA | 8BC8 |
| 0000625660 | 0BC3 | 79C0 | F707 | F7DB | 83D9 | 00DB | C48A | 8024 |
| 0000625700 | FF33 | D233 | 60BD | E985 | 07B6 | 3AE8 | EB00 | E80D |
| 0000625720 | 002B | 08EB | 35E8 | EB00 | E803 | 0026 | C0D1 | D283 |
| 0000625740 | 7500 | D167 | C3C8 | 9CE8 | EB00 | E80D | 003E | 08EB |
| 0000625760 | 5DE8 | EB00 | E803 | 0039 | D20B | 4E75 | E8C3 | 002C |
| 0000626000 | 0DEB | 2CE8 | EB00 | E808 | 007B | 03EB | 41E8 | 3300 |
| 0000626020 | 0BC9 | 79FF | F70D | F7D1 | F7D2 | F5D8 | D283 | 8300 |
| 0000626040 | 00D1 | C2D1 | D183 | 7500 | D121 | C3CA | 56E8 | EB00 |
| 0000626060 | E803 | 001C | DB33 | 01B5 | E822 | CD0A | F980 | F581 |
| 0000626100 | DB13 | C313 | D283 | 7200 | C301 | 55E9 | E921 | 00A4 |
| 0000626120 | 92AD | D60A | 93AD | 91AD | 91AD | EE83 | 8B08 | B6F9 |
| 0000626140 | 220F | 80F1 | 10CE | E580 | D17F | D1E9 | D1E9 | D1E9 |
| 0000626160 | 0BE9 | 74C9 | 81D8 | FEE9 | 7203 | 8378 | 20F9 | CA7F |
| 0000626200 | E983 | EB25 | 332F | 8AD2 | ACDA | F88A | 8AAD | ACC8 |
| 0000626220 | C186 | EE83 | 8A04 | 8BE9 | 83F9 | 7FE1 | E4D0 | D1D0 |
| 0000626240 | D0F9 | 0BDC | 74C9 | 804D | 7EE9 | 4772 | F983 | 7F20 |
| 0000626260 | 8399 | 20E9 | D9F7 | F980 | 7C08 | 801A | 01FA | D0F5 |
| 0000626300 | 80D2 | 01E2 | D30A | DF8A | F88A | C48A | E68A | F632 |
| 0000626320 | E980 | EB08 | E3E1 | 8015 | 01FA | 01B2 | DA80 | D000 |
| 0000626340 | D1EE | D1D8 | D0DB | 80DA | 00D2 | F3E2 | CA8A | D08B |
| 0000626360 | C38B | F9C3 | 00B1 | D180 | 3300 | 8BC0 | C3D0 | A1E9 |
| 0000626400 | E820 | 0068 | 07B0 | 31E8 | 8B01 | 8636 | 0301 | 067C |
| 0000626420 | EF83 | 8B10 | 80D7 | 7FE6 | FA81 | 7FF0 | E073 | 7C89 |
| 0000626440 | 8B06 | C3FE | 7BE9 | E820 | 0087 | 03B0 | 0BE8 | 8B01 |
| 0000626460 | 8636 | 0301 | 027C | EF81 | 0080 | D78B | E680 | 817F |
| 0000626500 | 80FA | 737F | 89DF | 027C | FE8B | E8C3 | 001E | 368B |
| 0000626520 | 0186 | EF83 | 0110 | 067C | FE8B | E8C3 | 0053 | 368B |
| 0000626540 | 0186 | EF81 | 0080 | 7C01 | 8B02 | C3FE | 8BFC | 863E |
| 0000626560 | 8C01 | 8CC0 | 8ED9 | A5C1 | A5A5 | 8EA5 | 8BC0 | 8636 |
| 0000626600 | BA01 | 0010 | 4C8B | 8B06 | 83F9 | 0FE1 | CA0A | 4C89 |
| 0000626620 | 8306 | F0E7 | CF8B | E580 | B87F | 0035 | E9D1 | E9D1 |
| 0000626640 | E9D1 | E9D1 | E981 | 0433 | 047D | D9F7 | 3FEB | 82E9 |
| 0000626660 | FC00 | 3E8B | 0186 | C08C | D98C | C18E | A5A5 | C08E |
| 0000626700 | 368B | 0186 | 80BA | 8B00 | 024C | F98B | E183 | 0A7F |
| 0000626720 | 89CA | 024C | E783 | 8B80 | 80CF | 7FE5 | 18B8 | D100 |
| 0000626740 | 8AE1 | 32CD | 81ED | 96E9 | 7D00 | F748 | 3BD9 | 8BC8 |
| 0000626760 | 7CEF | 8114 | 00E7 | 0B80 | 3BFA | 74C8 | 8B0A | 8BC8 |
| 0000627000 | 81EF | 00E5 | 2B80 | 33EA | 80D2 | 08F9 | 147C | FA80 |
| 0000627020 | F501 | 00B2 | D280 | 0A00 | C614 | 0004 | E980 | 4608 |
| 0000627040 | E7EB | 348A | 0CE3 | 88BB | 8A01 | D7C1 | EE8A | E822 |
| 0000627060 | 2C88 | 33C3 | 8BC9 | 8AD1 | C334 | 01BB | 8A00 | 8AEF |
| 0000627100 | E3E1 | D106 | D0EA | E2D7 | 0AFA | 22D7 | 0ADE | 80D3 |
| 0000627120 | 81FA | 01B2 | DA80 | 7400 | 8B02 | 8AFD | D3CC | 8BE2 |
| 0000627140 | 860E | 9801 | C803 | CE2B | F202 | 348B | 06E3 | 8046 |
| 0000627160 | 0014 | FAE2 | 00C3 | C3F7 | 7F80 | 4C74 | D3D1 | C3F5 |
| 0000627200 | 2DE9 | 801F | 7FCC | E4D0 | 8BC3 | 0244 | 8B26 | 025D |
| 0000627220 | 80A9 | 747F | F7E1 | A9D0 | 7F80 | D0F7 | E274 | D3F7 |
| 0000627240 | C3F7 | 7F80 | D3F7 | D874 | EC8A | EF32 | D578 | E3D1 |
| 0000627260 | E0D1 | 0B73 | 8793 | 8CF7 | 8CC2 | 8ED9 | 8EC1 | 3BDA |
| 0000627300 | 75C3 | 8B05 | 2604 | 053B | F7C3 | F0C3 | 747F | D15E |
| 0000627320 | F5D3 | E9C3 | 1EDA | CC80 | D07F | C3E4 | 448B | 2606 |
| 0000627340 | 5D8B | A906 | 7FF0 | E174 | D0F7 | F0A9 | F77F | 74D0 |

THU MAR 14 17:52:34 1991 TSLINT.DLL PAGE 222, LINE 13040

| | | | | | | | | |
|---|---|---|---|---|---|---|---|---|
| 0000627360 | F7E2 | F7D3 | F0C3 | F77F | 74D3 | 8AD8 | 32EC | 78EF |
| 0000627400 | D1D5 | D1E3 | 73E0 | 930B | F787 | C28C | D98C | C18E |
| 0000627420 | DA8E | C33B | 1775 | 448B | 2604 | 453B | 7504 | 8B0E |
| 0000627440 | 0244 | 3B26 | 0245 | 0575 | 048B | 3B26 | C305 | F787 |
| 0000627460 | 458B | 8002 | 80F4 | 03EB | 458B | 8B02 | 015D | 358A |
| 0000627500 | 00B2 | CF80 | 8B80 | 024C | 7C8B | 8BFF | 0174 | E781 |
| 0000627520 | FF00 | CE81 | 8000 | C1D1 | C0D1 | ED0A | 6574 | E40A |
| 0000627540 | 5B74 | EC3A | 0573 | F387 | FA87 | 2A91 | F6E5 | 80DC |
| 0000627560 | 18FC | 4977 | C9D0 | E8D0 | D9D0 | 8A91 | B5CD | E300 |
| 0000627600 | 8055 | 0EF9 | 127C | D20B | 0374 | CB80 | 8B01 | 33D3 |
| 0000627620 | 80DB | 10E9 | 1D72 | 3E74 | F980 | 7E05 | 0A2B | 74D2 |
| 0000627640 | 8003 | 01CE | D68A | F38A | DF8A | FD8A | E980 | 7708 |
| 0000627660 | 7417 | D123 | D1E2 | FED3 | 75C1 | EBF8 | 8B19 | 8BDE |
| 0000627700 | 8BD7 | D0C1 | E9E8 | 0097 | C2F6 | 743F | 8003 | 20CA |
| 0000627720 | EBD1 | DAD1 | FAE2 | C2F6 | 743F | 8003 | 20CA | E0D0 |
| 0000627740 | 1470 | D703 | DE13 | 5073 | DBD1 | DAD1 | C4FE | FC80 |
| 0000627760 | 75FF | E945 | 1DAC | FA2B | F31B | D78B | DE8B | 0A73 |
| 0000630000 | D3F7 | DAF7 | 83F5 | 00D3 | D0F6 | DB0B | 0B75 | EC80 |
| 0000630020 | 7610 | 876A | 0BDA | 74DB | 0A64 | 75FF | 800F | 08EC |
| 0000630040 | 5B76 | FB8A | DE8A | F28A | D232 | FF0A | 0A78 | CCFE |
| 0000630060 | 4B74 | E2D1 | D3D1 | F671 | 3E80 | 0190 | 7400 | E903 |
| 0000630100 | 017C | FA80 | 7780 | 7207 | F614 | 01C6 | 0F74 | C680 |
| 0000630120 | 8301 | 00D3 | 0773 | C4FE | FC80 | 74FF | D03A | D1E0 |
| 0000630140 | A9D8 | 7F80 | 1774 | 8024 | E780 | 0A7F | 8BC7 | 863E |
| 0000630160 | 8901 | 0245 | E38A | C68A | 0589 | F78B | 80C3 | 903E |
| 0000630200 | 0001 | 0374 | 7EE9 | 3301 | 8BC0 | 863E | 8901 | 0245 |
| 0000630220 | 0589 | F78B | 79C3 | E9E6 | 1D08 | ADFC | 348B | D196 |
| 0000630240 | D0E0 | 0AD8 | 74E4 | 8BD6 | D24D | E1D1 | D9D0 | ED0A |
| 0000630260 | CB74 | 3D8B | D88B | C132 | EC80 | 8080 | 7FED | E502 |
| 0000630300 | D370 | C480 | 8080 | FFFC | CD74 | 3250 | 8AFF | 80EF |
| 0000630320 | 80CB | C980 | 8B80 | 8BEB | F7C6 | 8BE7 | 0BDA | 9FC0 |
| 0000630340 | 8B50 | F7C5 | 03E7 | 83D8 | 00D2 | FA8B | C18B | E6F7 |
| 0000630360 | D803 | FA13 | 9E58 | 0374 | CB80 | 8B01 | F6C5 | 03E1 |
| 0000630400 | 8BC7 | 93D3 | 0A58 | 78FF | D10B | D1E2 | 0AD3 | 75E4 |
| 0000630420 | E90A | FF69 | C4FE | FC80 | 74FF | E9AD | FF1A | F787 |
| 0000630440 | 4D8B | D102 | D0E1 | 8BD9 | 0244 | E0D1 | D8D0 | ED0A |
| 0000630460 | 5C74 | E40A | DB74 | C132 | EC80 | 8081 | 7FED | E52A |
| 0000630500 | 0371 | 7BE9 | 80FF | 80C4 | FC80 | 75FF | E903 | FF78 |
| 0000630520 | 5D8B | 8A01 | 322D | 80C9 | 80CF | 3E80 | 0190 | 7400 |
| 0000630540 | D108 | D1EB | 02D9 | 903E | 5001 | 548B | 8A01 | 3224 |
| 0000630560 | 80C0 | 80CE | EAD1 | D8D1 | 1AE8 | 8B00 | E8EE | 0011 |
| 0000630600 | C20B | D68B | 0374 | CA80 | 8B01 | E9DD | FF76 | 18E9 |
| 0000630620 | 3B1C | 73D3 | F71D | 96F3 | C033 | 15E3 | FA8B | C68B |
| 0000630640 | E1F7 | D8F7 | FA1B | D78B | 0773 | 034E | 13C1 | 73D3 |
| 0000630660 | C3F9 | FFBE | 2BFF | 03C1 | 8BD0 | 73C1 | C3ED | 06C6 |
| 0000630700 | 0190 | 8A00 | 922E | 0A01 | 74ED | 8007 | 0EED | EC3A |
| 0000630720 | 3C77 | E40A | 3874 | 36FF | 0186 | 06C7 | 0186 | 0193 |
| 0000630740 | 5350 | 3352 | 32D2 | E8DB | FE4E | 5B5A | C758 | 8606 |
| 0000630760 | 9701 | 5001 | 5253 | FF32 | 0FE8 | 5AFE | 585B | 068F |
| 0000631000 | 0186 | 33E9 | 33FE | 33C0 | 33DB | A2D2 | 0190 | 36FF |
| 0000631020 | 0186 | 06C7 | 0186 | 0197 | 5350 | E852 | FE1A | C033 |
| 0000631040 | 93A3 | A301 | 0195 | D3EB | F787 | 6D8B | 8106 | 00F5 |
| 0000631060 | EB80 | 8B1D | 8BF7 | 863E | A501 | A5A5 | 80AD | 7FE4 |
| 0000631100 | E680 | 0A80 | ABE6 | 368B | 0186 | FE8B | 8BC3 | 066D |
| 0000631120 | 8BFC | 0644 | E5D1 | DED0 | E0D1 | DAD0 | E025 | 74FF |
| 0000631140 | 83D2 | E0E5 | E83B | 0977 | F787 | 8695 | 0BD6 | 74C0 |
| 0000631160 | 2BC2 | F7C5 | 3DD8 | 06A0 | B977 | E6D0 | DDD1 | E2D0 |
| 0000631200 | DDD1 | D157 | D1C0 | D1C0 | 86C0 | 8BE0 | ACF8 | E08A |
| 0000631220 | C032 | AD92 | AD91 | AD93 | E480 | 800F | 10CC | FF0B |

THU MAR 14 17:52:34 1991 TSLINT.DLL PAGE 223, LINE 13099

| | | | | | | | | |
|---|---|---|---|---|---|---|---|---|
| 0000631240 | 6374 | FF83 | 7C0E | 0B18 | 74D2 | 8003 | 01C9 | D18B |
| 0000631260 | CB8B | D88B | C033 | EF83 | 7710 | 74E7 | 7248 | 8323 |
| 0000631300 | 06FF | 2B7C | D20A | 0374 | CE80 | 8A01 | 8AD6 | 8AF1 |
| 0000631320 | 8ACD | 8AEB | 8ADF | 8AF8 | 32C4 | 83E4 | 08EF | 0F77 |
| 0000631340 | 2374 | E2D1 | D1D1 | D3D1 | D0D1 | 7547 | EBF5 | 8716 |
| 0000631360 | F6CF | 3FC2 | 0374 | CA8D | D120 | D1E8 | D1DB | D1DF |
| 0000631400 | E2DA | 87F6 | 5ECF | F697 | 3FC2 | 0374 | CA80 | D120 |
| 0000631420 | 70E5 | D13B | D0E5 | 02D8 | 1334 | 014C | 5C13 | 5003 |
| 0000631440 | 509F | 748B | 8105 | FFE6 | 810F | 00CE | 5810 | 589E |
| 0000631460 | FE13 | C7F7 | 2000 | 1374 | DFD1 | DBD1 | D9D1 | DAD1 |
| 0000631500 | C583 | 8320 | E0FD | 0375 | 57E9 | E91A | 0087 | E5D1 |
| 0000631520 | D8D0 | D0F6 | 342A | 4C1B | 1B01 | 035C | 748B | 9F05 |
| 0000631540 | E681 | 0FFF | CE81 | 1000 | 1B9E | 73FE | 3313 | F6F6 |
| 0000631560 | F7D0 | F7D7 | F7D3 | F7D1 | F5DA | CE13 | DE13 | FE13 |
| 0000631600 | BEFC | 0004 | FF0B | 1875 | C7F6 | 75E0 | 8113 | 00ED |
| 0000631620 | 7602 | 4E40 | 3D74 | FB8B | D98B | CA8B | D233 | E4EB |
| 0000631640 | C7F7 | 1FE0 | 1875 | ED81 | 0100 | 2776 | 8A97 | 8AE0 |
| 0000631660 | 8AC7 | 8AFB | 8ADD | 8AE9 | 8ACE | B2F2 | 9700 | C7F7 |
| 0000631700 | 1000 | 1175 | ED83 | 7420 | D170 | D1E2 | D1D1 | D1D3 |
| 0000631720 | EBD7 | EBEB | FC64 | 3E80 | 01A8 | 7400 | E903 | 0385 |
| 0000631740 | FA80 | 7780 | 7207 | F61F | 01C6 | 1A74 | C680 | 8301 |
| 0000631760 | 00D1 | D383 | 8300 | 00D7 | C7F7 | 2000 | 0874 | C583 |
| 0000632000 | 8320 | E0FD | 3074 | F78B | 3E8B | 0186 | DE87 | 8024 |
| 0000632020 | E780 | D10F | 74ED | 8622 | 32E0 | 0BC0 | 0AC5 | 89C7 |
| 0000632040 | 0645 | 5D88 | 8A05 | AAC6 | C18B | 8BAB | ABC6 | EF83 |
| 0000632060 | 8B05 | C3F7 | 0379 | 69E9 | FC19 | 3E80 | 01A8 | 7400 |
| 0000632100 | E903 | 0377 | C033 | 3E8B | 0186 | F78B | ABAB | ABAB |
| 0000632120 | FE8B | FCC3 | 448B | 8B06 | 25D0 | 7FF0 | DB74 | 4D8B |
| 0000632140 | 3306 | 81D1 | F0E1 | 747F | D1D0 | D1E0 | 2DE1 | 8000 |
| 0000632160 | E981 | 7FE0 | C103 | BC70 | 0005 | 3D80 | FFE0 | B674 |
| 0000632200 | E6D0 | D8D1 | E850 | 0181 | 0374 | CA80 | 5D01 | E5D1 |
| 0000632220 | D8D0 | C7F7 | 1000 | 0E75 | E2D1 | D1D1 | D3D1 | D7D1 |
| 0000632240 | ED0B | 0A75 | 93EB | C583 | 8320 | E0FD | 8874 | 24E9 |
| 0000632260 | E9FF | 18F5 | F787 | 8BFC | 064D | D18B | E181 | 7FF0 |
| 0000632300 | EF74 | 448B | 3306 | 25D0 | 7FF0 | 9B74 | E0D1 | E1D1 |
| 0000632320 | 202D | 8180 | E0E9 | 2B7F | 70C1 | 059B | 8000 | E03D |
| 0000632340 | 74FF | D09B | D1E6 | 50D8 | 8AAC | 32E8 | ADC9 | AD93 |
| 0000632360 | AD92 | E480 | 800F | 10CC | 5092 | F78B | C683 | BF05 |
| 0000632400 | 01A6 | ADFD | E430 | 800F | 10CC | A5AB | 46A5 | A447 |
| 0000632420 | C6FC | 0005 | 3E80 | 01A8 | 7400 | FD1F | A6BF | 8B01 |
| 0000632440 | ADF7 | E88B | E8D1 | 2602 | 01A8 | D1AB | ADED | D8D1 |
| 0000632460 | ADAB | D8D1 | ADAB | D8D1 | FCAB | D158 | D1EA | D1D8 |
| 0000632500 | D1DB | E8D9 | 003F | E857 | 003B | E857 | 0037 | E857 |
| 0000632520 | 0033 | C30B | C10B | C20B | D78B | 5B59 | 745F | 8003 |
| 0000632540 | 01CA | C2F6 | 7407 | 8003 | 08CA | EFD1 | DBD1 | D9D1 |
| 0000632560 | DAD1 | EFD1 | DBD1 | D9D1 | DAD1 | EFD1 | DBD1 | D9D1 |
| 0000632600 | DAD1 | 08E9 | 8BFF | A636 | 3301 | 3BFF | 73D6 | 0B5C |
| 0000632620 | 75D2 | 3B04 | 77F0 | F73B | 52F6 | 3397 | 8BED | A1F5 |
| 0000632640 | 01A0 | C00B | 0474 | E7F7 | F28B | A150 | 01A2 | C00B |
| 0000632660 | 0674 | E7F7 | F003 | EA13 | A4A1 | 0B01 | 74C0 | F708 |
| 0000632700 | 03E7 | 83E8 | 00D2 | 5A92 | DAF7 | CE1B | DD1B | 1B5D |
| 0000632720 | 95E8 | 9192 | 7393 | 4F13 | 0E03 | 01A0 | 1E13 | 01A2 |
| 0000632740 | 0613 | 01A4 | 1613 | 01A6 | ED73 | 4FC3 | 0E2B | 01A0 |
| 0000632760 | 1E1B | 01A2 | 061B | 01A4 | 0E03 | 01A2 | 1E13 | 01A4 |
| 0000633000 | C213 | 168B | 01A0 | EBF5 | 8AC9 | 0644 | E432 | 0F24 |
| 0000633020 | 100C | 9CA3 | 8A01 | 0645 | 0F24 | 100C | 9EA3 | 3301 |
| 0000633040 | 8BDB | 8BEB | E30C | 911A | 0D8B | 08E3 | E1F7 | E88B |
| 0000633060 | CA8B | 048B | 558B | 0B02 | 74D2 | F706 | 03E2 | 13C8 |
| 0000633100 | 55DA | ED33 | 448B | 0B02 | 74C0 | 8B0E | 0B15 | 74D2 |

THU MAR 14 17:52:34 1991 TSLINT.DLL PAGE 224, LINE 13158

| | | | | | | | | |
|---|---|---|---|---|---|---|---|---|
| 0000633120 | F708 | 03E2 | 13C8 | D1DA | 58D5 | C10B | 8B50 | 0244 |
| 0000633140 | C00B | 0D74 | 558B | 0B02 | 74D2 | F706 | 03E2 | 13D8 |
| 0000633160 | 33EA | 8BC9 | 0B04 | 74C0 | 8B0F | 0455 | D20B | 0874 |
| 0000633200 | E2F7 | D803 | EA13 | D1D1 | 448B | 0B04 | 74C0 | 8B0F |
| 0000633220 | 0B15 | 74D2 | F709 | 03E2 | 13D8 | 83EA | 00D1 | 0B58 |
| 0000633240 | 50C3 | 048B | C00B | 0874 | 26F7 | 019E | E803 | CA13 |
| 0000633260 | 058B | C00B | 0874 | 26F7 | 019C | E803 | CA13 | DB33 |
| 0000633300 | 448B | 0B02 | 74C0 | 8B0F | 0455 | D20B | 0874 | E2F7 |
| 0000633320 | E803 | CA13 | D3D1 | 448B | 0B04 | 74C0 | 8B10 | 0255 |
| 0000633340 | D20B | 0974 | E2F7 | E803 | CA13 | D383 | 5500 | ED33 |
| 0000633360 | 458B | 0B02 | 74C0 | F708 | 9C26 | 0301 | 13C8 | 8BDA |
| 0000633400 | 0244 | C00B | 0874 | 26F7 | 019E | C803 | DA13 | 448B |
| 0000633420 | 0B04 | 74C0 | 8B1A | 0455 | D20B | 0B74 | E2F7 | C803 |
| 0000633440 | DA13 | D5D1 | 448B | F704 | 9E26 | 0301 | 13D8 | 8BEA |
| 0000633460 | 0445 | C00B | 0874 | 26F7 | 019C | D803 | EA13 | 9CA0 |
| 0000633500 | F601 | 9E26 | 0301 | 97C5 | D15A | D1E2 | D1D1 | D1D3 |
| 0000633520 | D1D7 | D1E2 | D1D1 | D1D3 | D1D7 | D1E2 | D1D1 | D1D3 |
| 0000633540 | 5ED7 | F60B | C6C3 | A806 | 0001 | 368B | 01A9 | F60B |
| 0000633560 | 0874 | EE81 | 04C0 | F53B | 5077 | ED0B | 4C74 | 36FF |
| 0000633600 | 0186 | 06C7 | 0186 | 01AB | 5150 | 5352 | 5755 | DB33 |
| 0000633620 | C933 | D233 | 3EE8 | 5FFC | 5B5D | 595A | C758 | 8606 |
| 0000633640 | B301 | 5001 | 5251 | 5553 | 3357 | E8FF | FBD2 | 5D5F |
| 0000633660 | 5A5B | 5859 | 068F | 0186 | 1AE9 | 33FC | 33C0 | 33C9 |
| 0000633700 | 33D2 | 33DB | 33ED | A2FF | 01A8 | 36FF | 0186 | D6C7 |
| 0000633720 | 0186 | 01B3 | 5150 | 5352 | 5755 | F8E8 | BFFB | 01AB |
| 0000633740 | C033 | ABAB | ABAB | C6EB | 01B8 | F905 | 8BC3 | 8636 |
| 0000633760 | 8B01 | 33FE | B9C0 | 0004 | ABF3 | FE8B | C3F8 | BFFC |
| 0000634000 | 01D4 | 448B | 8AD6 | A9F8 | 7FF0 | E174 | F025 | 78FF |
| 0000634020 | 2DD7 | 3FE0 | 5C8A | 8B05 | 034C | 548B | 5601 | E2D1 |
| 0000634040 | D1D1 | D3D1 | E2D1 | D1D1 | D3D1 | E2D1 | D1D1 | D3D1 |
| 0000634060 | CF80 | A880 | 7410 | 0509 | 0010 | EBD1 | D9D1 | DAD1 |
| 0000634100 | F8D1 | E005 | 893F | 0645 | FB83 | 72FE | F903 | 36EB |
| 0000634120 | B852 | AFB1 | E3F7 | D8BD | 0357 | 73EA | BD03 | FFFF |
| 0000634140 | D38B | C033 | F5F7 | E803 | DDD1 | D38B | C13B | F5F7 |
| 0000634160 | 13F9 | D1E8 | 8BDD | 8BD3 | F7C1 | 8BF5 | 58F0 | F5F7 |
| 0000634200 | DD8B | C88B | DE03 | C033 | E1D1 | D3D1 | D0D1 | E1D1 |
| 0000634220 | D3D1 | D0D1 | E1D1 | D3D1 | D0D1 | E1D1 | D3D1 | D0D1 |
| 0000634240 | 4508 | 8906 | 045D | 4D89 | C702 | 00D5 | 5E00 | E857 |
| 0000634260 | FC04 | E85F | F997 | 6D83 | 1006 | C3F8 | 368B | D186 |
| 0000634300 | D4BF | E901 | F987 | 368B | 0186 | D4BF | E901 | F95A |
| 0000634320 | 368B | 0186 | D4BF | E901 | FB79 | 368B | 0186 | D4BF |
| 0000634340 | E901 | FBD2 | 3E8B | 0186 | D4BE | E901 | F93C | 3E8B |
| 0000634360 | 0186 | D4BE | E901 | FBBE | 5750 | C033 | 8BFC | 863E |
| 0000634400 | AB01 | ABAB | 5FAB | C358 | 3E8B | 0186 | F73B | 0875 |
| 0000634420 | BEC3 | 01D4 | 3E8B | 0186 | A5A5 | A5A5 | 368B | 0186 |
| 0000634440 | 8BC3 | 8636 | BF01 | 01D4 | A5A5 | A5A5 | EE83 | C308 |
| 0000634460 | DCBF | A501 | A5A5 | 83A5 | 08EE | BEC3 | 01D4 | 04EB |
| 0000634500 | 368B | 0186 | FF58 | 0674 | 74FF | FF04 | 0274 | 34FF |
| 0000634520 | E0FF | D4BE | EB01 | 8B04 | 8636 | 5801 | 048F | 448F |
| 0000634540 | 8F02 | 0444 | 448F | FF06 | 8BE0 | 8636 | BF01 | 01D4 |
| 0000634560 | A5A5 | A5A5 | F38B | 91AD | C90B | 0579 | ED32 | EB51 |
| 0000634600 | 8B17 | 863E | A501 | A5A5 | E3A5 | 511C | 8B56 | 8636 |
| 0000634620 | BF01 | 01D4 | BCE8 | 5EFA | 8B56 | 863E | E801 | F8AD |
| 0000634640 | 595E | C683 | E208 | 8BE4 | 863E | 8B01 | C3F7 | 448B |
| 0000634660 | 8A06 | 25E8 | 7FF0 | 2B74 | C02D | 3D3F | 037D | 2377 |
| 0000634700 | 04B1 | E8D3 | C88A | E180 | 4107 | E8D0 | E8D0 | E8D0 |
| 0000634720 | 8B98 | F7D8 | 80DB | 10CD | 6C86 | 8A06 | 0640 | E0D2 |
| 0000634740 | 6C88 | C306 | 5351 | E4BF | A501 | A5A5 | 83A5 | 08EE |
| 0000634760 | FE8B | 5EE8 | BFFA | 01EC | A5A5 | A5A5 | EE83 | 5B08 |

THU MAR 14 17:52:34 1991 TSLINT.DLL PAGE 225, LINE 13217

| | | | | | | | | |
|---|---|---|---|---|---|---|---|---|
| 0000635000 | 66E8 | 5BFF | DB0B | 1174 | F4BF | A501 | A5A5 | BEA5 |
| 0000635020 | 01EC | F3E8 | E8FE | FF51 | C3F9 | C7E8 | 73FF | BE06 |
| 0000635040 | 01F4 | 91E8 | BFFA | 01EC | 28E9 | E8FA | FFEC | E4BF |
| 0000635060 | E901 | FA1F | E851 | FEF8 | FB8B | 16E8 | E8FA | FEA8 |
| 0000635100 | E2E8 | 5FFE | DCBE | E801 | FA09 | D4BE | E901 | F7DA |
| 0000635120 | 13E8 | 7200 | BF0F | 021D | F8E8 | C3F9 | 02B8 | EB03 |
| 0000635140 | B803 | 0301 | C3F9 | 8BFC | 863E | A501 | A5A5 | 8BAD |
| 0000635160 | 83D8 | F0E3 | E674 | E978 | 368B | 0186 | 0F25 | 0D80 |
| 0000635200 | 3FE0 | 93AB | E02D | B13F | D304 | 50F8 | 0DBF | E802 |
| 0000635220 | F44A | 368B | 0186 | 10B1 | 0973 | 4858 | 8350 | 0644 |
| 0000635240 | B110 | 5B08 | E851 | FE7D | E893 | F0F3 | 95E8 | BFFE |
| 0000635260 | 022D | 9EE8 | BFF9 | 02A5 | A5A5 | A5A5 | 98E8 | BFFE |
| 0000635300 | 0225 | 8EE8 | 8BF9 | 0644 | F025 | D17F | A3E0 | 01A9 |
| 0000635320 | 9DBF | A502 | A5A5 | BEA5 | 01D4 | C4BF | E801 | F74A |
| 0000635340 | A258 | 01A8 | F7E8 | BBFD | 0235 | 4FB9 | E802 | FF3B |
| 0000635360 | B3BF | E801 | F757 | A5BF | E802 | F751 | A5BF | A502 |
| 0000635400 | A5A5 | BEA5 | 029D | ABBF | E801 | F741 | 9DBF | A502 |
| 0000635420 | A5A5 | BEA5 | 029D | A5BF | E802 | F731 | E8C3 | 0264 |
| 0000635440 | 448B | 2506 | 7FF0 | 903D | 733C | E903 | 0228 | CFE8 |
| 0000635460 | 5001 | BCBF | E801 | F715 | 4058 | 04B1 | E0D3 | 4401 |
| 0000635500 | F806 | E9C3 | 0210 | 3E80 | 027A | 7500 | 0B11 | 78C0 |
| 0000635520 | 7408 | E903 | 020A | FDE9 | B801 | 0702 | C3F9 | C00B |
| 0000635540 | 0578 | 0374 | F9E9 | B801 | 0701 | C3F9 | 458B | A906 |
| 0000635560 | 7FF0 | 1274 | 448B | 0A06 | 79E4 | A90B | 7FF0 | 0674 |
| 0000635600 | 74EB | 01B0 | 02EB | C032 | 7AA2 | 8B02 | 0645 | 4C8B |
| 0000635620 | F706 | F0C1 | 747F | A9AF | 7FF0 | A774 | DF8B | 6ABF |
| 0000635640 | A502 | A5A5 | 8BA5 | BFF3 | 0272 | A5A5 | A5A5 | F38B |
| 0000635660 | 98E8 | BFF1 | 0272 | 23E8 | 75F3 | BE45 | 0272 | 3E80 |
| 0000635700 | 027A | 7500 | 8B0E | 0644 | E480 | 3D7F | 4030 | 0377 |
| 0000635720 | C2E9 | F600 | 7106 | 8002 | 2679 | 448B | 2506 | 7FF0 |
| 0000635740 | 303D | 7743 | E811 | FDC6 | 1173 | 0EE8 | B000 | 7207 |
| 0000635760 | 8009 | 074C | C380 | 01B8 | F906 | 80C3 | 7126 | 7F02 |
| 0000636000 | 06F6 | 0271 | 7880 | BEEF | 026A | 59E8 | C6FE | A806 |
| 0000636020 | 0101 | 06C7 | 01A9 | 0000 | 72BE | BF02 | 029D | 32E8 |
| 0000636040 | BEF8 | 0272 | A5BF | E802 | F829 | B3BF | E801 | F61D |
| 0000636060 | B3BF | A501 | A5A5 | BEA5 | 01AB | B3BF | E801 | F60D |
| 0000636100 | 41E8 | BF01 | 027B | 0AE8 | E8F8 | EF8D | E850 | 00F1 |
| 0000636120 | B3BF | E801 | F5F7 | E858 | 00B7 | D4E9 | 32FE | 50ED |
| 0000636140 | E851 | EF33 | 0859 | 076C | 72BF | A502 | A5A5 | 58A5 |
| 0000636160 | 06F6 | 0271 | 7980 | D189 | E9E8 | FF6C | 80B5 | DFEB |
| 0000636200 | 6ABF | A502 | A5A5 | 0BA5 | 79D2 | F734 | F7D2 | F5D8 |
| 0000636220 | D283 | EB00 | E80C | EF58 | D233 | 06F6 | 0279 | 7980 |
| 0000636240 | F71E | 7006 | F002 | 757F | E903 | FEBB | D20B | CC75 |
| 0000636260 | 013D | 7700 | BEC7 | 01C4 | 6ABF | E802 | F7F8 | 0BC3 |
| 0000636300 | 75D2 | 3D9A | 0010 | 9577 | C4BE | E801 | FC3A | EAD1 |
| 0000636320 | D8D1 | 0A73 | 5250 | 6ABF | E802 | F777 | 585A | C88B |
| 0000636340 | CA0B | 1B74 | 5250 | 57E8 | BEFC | 026A | FE8B | 62E8 |
| 0000636360 | BFF7 | 026A | A5A5 | A5A5 | 5CE8 | 5AFC | EB58 | C3CF |
| 0000636400 | 22E8 | BFFC | 02AE | 4AE8 | 56F7 | CCE8 | 5EEE | 36E8 |
| 0000636420 | 5000 | DEBB | B902 | 02F8 | C9E8 | E8FC | FC12 | E4BE |
| 0000636440 | BF01 | 01F4 | 2CE8 | BFF7 | 01F4 | A5A5 | A5A5 | EE83 |
| 0000636460 | 8B08 | BEFE | 01DC | F1E8 | BEF4 | 01F4 | 77E8 | 58F7 |
| 0000636500 | BEC3 | 01AB | DEE8 | 50FB | 54E8 | BBEE | 02CE | D6B9 |
| 0000636520 | E802 | FCED | C358 | C4BE | E801 | FBAC | FE8B | C3F8 |
| 0000636540 | 95E8 | 8BFB | 8636 | EB01 | E8F3 | FFEA | 7480 | 8007 |
| 0000636560 | 58C3 | 03B8 | F902 | B8C3 | 8FE1 | 0EEB | C6B8 | BB8F |
| 0000636600 | 8FD9 | 06EB | D0BB | B88F | 8FE2 | 5350 | BF56 | 02BE |
| 0000636620 | 49E8 | 5EF1 | 0E77 | BF56 | 02C6 | 3FE8 | 5EF1 | 0972 |
| 0000636640 | C483 | C304 | 585B | FF5B | 5BE0 | 5858 | E3FF | 448B |

THU MAR 14 17:52:34 1991 TSLINT.DLL PAGE 226, LINE 13276

| | | | | | | | | |
|---|---|---|---|---|---|---|---|---|
| 0000636660 | 8006 | 7FE4 | A03D | 7341 | E81C | FB88 | 4EE8 | E800 |
| 0000636700 | FB63 | 92E8 | E8FB | FB73 | 368B | 0186 | 25E8 | E800 |
| 0000636720 | FB80 | E1E9 | B8F6 | 0405 | C3F9 | D1E8 | 72FF | 8B14 |
| 0000636740 | 0644 | F0A9 | 747F | BE08 | 01C4 | C9E8 | F8F6 | B8C3 |
| 0000636760 | 0802 | C3F9 | 448B | 2506 | 7FF0 | 403D | 773E | BE0A |
| 0000637000 | 01C4 | 03E8 | 8BFB | F8FE | B0C3 | EB01 | 8B10 | 0644 |
| 0000637020 | F025 | 3D7F | 3E40 | EA76 | 448A | 2407 | FC80 | 12A2 |
| 0000637040 | E803 | FAE4 | 6480 | 7F07 | 7C81 | A006 | 7341 | E8A6 |
| 0000637060 | FAF3 | 13BF | E803 | F61B | 06F6 | 0312 | 7401 | F614 |
| 0000637100 | 0744 | 7980 | BF08 | 01BC | DFE8 | EBF3 | BF06 | 01BC |
| 0000637120 | FAE8 | E8F3 | EEAB | 55E8 | 73FB | 8005 | 1236 | 8003 |
| 0000637140 | 06F6 | 0312 | 7401 | BF06 | 01BC | BDE8 | BBF3 | 031B |
| 0000637160 | 23B9 | E803 | FBBE | 2BBB | 3303 | E8C9 | FBAD | E4BF |
| 0000637200 | E801 | F3C9 | 12A0 | 2403 | 3080 | 0744 | FCC3 | 448A |
| 0000637220 | 2407 | A280 | 0370 | 6FE8 | 80FA | 0764 | B07F | 8100 |
| 0000637240 | 067C | 3FF0 | 0C72 | C4BE | 8B01 | 863E | E801 | F606 |
| 0000637260 | 10B0 | 6EA2 | BF03 | 0381 | 21E8 | 76F0 | E826 | FA61 |
| 0000637300 | 79BF | E803 | F58D | C4BF | E801 | F35E | F1E8 | E8F9 |
| 0000637320 | FA5E | 71BE | E803 | F9E8 | DCBE | E801 | F5D8 | 0680 |
| 0000637340 | 036E | 8B08 | 8636 | 8B01 | 0644 | F025 | 3D7F | 3E40 |
| 0000637360 | 0F72 | B9BB | B903 | 03DB | 30E8 | BFFB | 01E4 | 4CE8 |
| 0000637400 | 83F3 | 6E3E | 1003 | 0472 | 7480 | 8007 | 99BF | 0303 |
| 0000637420 | 6E3E | E803 | F337 | 06F6 | 0370 | 7480 | 8004 | 0774 |
| 0000637440 | C380 | 5858 | 01B8 | F900 | F9C3 | 01EB | 9FF8 | 3B50 |
| 0000637460 | 8636 | 7501 | BF0A | 0008 | A5A5 | A5A5 | 08BE | 5600 |
| 0000637500 | FE8B | C4BE | E801 | F2E2 | DAE8 | 5EF9 | BF56 | 01C4 |
| 0000637520 | FAE8 | E8F2 | F97E | 44F6 | 8007 | C675 | 9FE8 | 5EF8 |
| 0000637540 | 9E58 | 0273 | F787 | 5C8B | F706 | F0C3 | 757F | 8003 |
| 0000637560 | 7FE7 | E780 | 8880 | FF3E | 8B03 | 0645 | 2688 | 03FE |
| 0000637600 | F0A9 | 747F | E81E | F52E | 02E8 | 80FF | 0764 | F67F |
| 0000637620 | FE06 | 8003 | 0674 | 08BE | E804 | F28E | FFA0 | 0803 |
| 0000637640 | 0744 | F7C3 | 0644 | 7FF0 | 1074 | 00BE | E804 | F958 |
| 0000637660 | 1E8A | 03FF | 5C08 | 8B07 | C3FE | 01B8 | F901 | 53C3 |
| 0000637700 | 8A56 | 0964 | 8A2E | 0947 | 8025 | 3A80 | 75C4 | 8316 |
| 0000637720 | 0AC6 | C383 | B90A | 0005 | EE83 | 8302 | 02EB | 048B |
| 0000637740 | 3B2E | E107 | 5EF3 | C35B | AD56 | AD95 | AD92 | AD93 |
| 0000637760 | FF33 | 05B9 | D100 | D1E8 | D1DB | D1DA | D1DD | E2DF |
| 0000640000 | D1F4 | D1E3 | 3DD0 | 0001 | D1F5 | 2DDB | 03FE | 895E |
| 0000640020 | 893C | 026C | 5489 | 8904 | 065C | 4489 | C308 | FC66 |
| 0000640040 | FFFF | FFFF | FFFF | 0000 | CCCD | CCCC | CCCC | CCCC |
| 0000640060 | FFFD | 1CBE | C604 | 0104 | 44C6 | 3001 | C033 | D08B |
| 0000640100 | 5B40 | 1F07 | 1EC3 | C3E8 | 8E05 | 50C0 | BFFC | 0410 |
| 0000640120 | B957 | 0004 | A5F3 | 8E5E | 8BD8 | 064C | 6480 | 7F07 |
| 0000640140 | 20B3 | C1F7 | 7FF0 | 0674 | C90B | 0279 | 2DB3 | E853 |
| 0000640160 | FF76 | FF33 | 17BE | AC04 | 80A8 | B674 | F88A | 05AD |
| 0000640200 | 3FFE | C88B | 10BA | F74D | 91E2 | 4DB0 | E4F6 | C803 |
| 0000640220 | D713 | 9AB0 | E7F6 | C803 | FA13 | E981 | 12F4 | DF81 |
| 0000640240 | 1343 | F757 | BEDF | 0410 | 3DE8 | BB05 | 928E | 0EE8 |
| 0000640260 | 5FFF | 0972 | 5747 | 98BB | E892 | 03C6 | 575F | 97AD |
| 0000640300 | 95AD | 92AD | 93AD | 91AD | D9F7 | F78B | C033 | 0CE3 |
| 0000640320 | EBD1 | DAD1 | DDD1 | DED1 | DCD0 | F4E2 | C480 | 8156 |
| 0000640340 | 9AD6 | 1303 | 13E9 | 13D1 | BFD9 | 041D | 10B9 | 3200 |
| 0000640360 | 51CD | 5253 | 5655 | D050 | D1E4 | D1D6 | D1D5 | D1D2 |
| 0000640400 | D0D3 | D0D0 | D1E4 | D1D6 | D1D5 | D1D2 | D0D3 | 59D0 |
| 0000640420 | E502 | 1359 | 59F1 | E913 | 1359 | 59D1 | D913 | 0014 |
| 0000640440 | E4D0 | D6D1 | D5D1 | D2D1 | D3D1 | D0D0 | 3004 | 59AA |
| 0000640460 | BDE2 | 494F | 30B0 | F3FD | FCAE | C183 | BE12 | 041C |
| 0000640500 | 0C88 | 01B8 | 5A00 | 075B | C31F | 8058 | 30C9 | C980 |
| 0000640520 | 8B40 | 33D7 | 8BFF | E8EF | 019F | DB33 | C6E9 | 8900 |

THU MAR 14 17:52:34 1991 TSLINT.DLL PAGE 227, LINE 13335

| | | | | | | | | |
|---|---|---|---|---|---|---|---|---|
| 0000640540 | 3C1E | 3304 | E8DB | 0226 | E172 | F88B | 1FE8 | 7202 |
| 0000640560 | 50E0 | C78B | 26F7 | 043C | F88B | EA8B | C38B | 2EF7 |
| 0000640600 | 043C | D20B | C475 | C503 | D88B | BE72 | 0358 | 83F8 |
| 0000640620 | 00D3 | D873 | B5EB | 5350 | 5251 | 6FE8 | 8E04 | 8ED8 |
| 0000640640 | 5AC0 | 5B59 | FC58 | 3E89 | 0432 | CE03 | 0E89 | 0434 |
| 0000640660 | 3EA3 | 8904 | 4016 | 3304 | A3C0 | 0438 | 36A3 | A304 |
| 0000640700 | 043A | 5A91 | 5858 | 2EA2 | 5804 | 2FA2 | 5204 | ADE8 |
| 0000640720 | 7501 | 8003 | 80CD | DB0B | 8575 | E7E8 | 3300 | E8DB |
| 0000640740 | 01FD | 4174 | 3C4E | 7444 | 3C1C | 7445 | 8012 | 2F3E |
| 0000640760 | 0004 | 3174 | 2B3C | 0674 | 2D3C | 0274 | 2775 | 814E |
| 0000641000 | 02C9 | EB04 | 8003 | 0EC9 | 06C7 | 043E | 0000 | E846 |
| 0000641020 | 016C | 509F | 8BE8 | F600 | 02C5 | 0375 | C980 | 5840 |
| 0000641040 | 759E | F702 | 8BDB | 3E3E | 0B04 | 75FF | F706 | 72C1 |
| 0000641060 | 7418 | 8003 | [illegible] | FB03 | 3E03 | 043A | C5F6 | 7510 |
| 0000641100 | 2B04 | 403E | 8104 | 90FF | 7F01 | 5650 | BE51 | 0446 |
| 0000641120 | 95E8 | 8B03 | 323E | C604 | 5006 | 0004 | ADE8 | 5901 |
| 0000641140 | 755E | A138 | 0442 | 1E8B | 0444 | C5F6 | 7480 | F713 |
| 0000641160 | F7D3 | F5D8 | D383 | F700 | 0645 | 7FF0 | 0474 | 4D80 |
| 0000641200 | 8007 | 3E83 | 0438 | 7607 | 8003 | 08C9 | 2E8A | 0450 |
| 0000641220 | 3E83 | 0438 | 7500 | 8003 | 02CD | 80C3 | 01C9 | BBC3 |
| 0000641240 | 3FFF | 06C6 | 043C | E80A | 00E4 | 1772 | FB81 | 0CCC |
| 0000641260 | ED77 | CD80 | D102 | 03E3 | D1C3 | D1E3 | 03E3 | 78D8 |
| 0000641300 | EBDE | C3DF | FF33 | EF8B | DF8B | D78B | D6E8 | 7200 |
| 0000641320 | 5028 | 8AE8 | 5800 | D003 | D383 | 8300 | 00D5 | D783 |
| 0000641340 | 8100 | 99FF | 7219 | E8E5 | 00BB | 0D72 | C00A | 0374 |
| 0000641360 | CA80 | FF01 | 3A06 | EB04 | 8BEE | 0BC7 | 0BC5 | 3A06 |
| 0000641400 | 7504 | F616 | 80C7 | 1774 | C5F6 | 7480 | 810F | 00FB |
| 0000641420 | 7580 | 0B09 | 75D2 | EB05 | 8006 | 10C9 | C980 | 8920 |
| 0000641440 | 4216 | 8904 | 441E | 8B04 | 0BC7 | 0BC5 | 0BC3 | 74C2 |
| 0000641460 | 811C | 99FF | 7319 | E809 | 0025 | 0EFF | 043A | F1EB |
| 0000641500 | 40B8 | 0B00 | 78FF | 4806 | 2AE8 | EB00 | 56F6 | F78B |
| 0000641520 | 46BF | 9204 | 93AB | 95AB | 96AB | 92AB | 5EAB | 57C3 |
| 0000641540 | 5355 | C28B | 0EE8 | E800 | 000B | D003 | 1358 | 58D8 |
| 0000641560 | E813 | 1358 | D1F8 | D1E2 | D1D3 | D1D5 | C3D7 | 5EE8 |
| 0000641600 | 7400 | 3C08 | 742D | 3C06 | 752B | 4601 | C34E | 4EE8 |
| 0000641620 | 7400 | 2C4A | 7230 | 3C45 | 7E09 | 2C02 | 3A07 | 3C06 |
| 0000641640 | 7D04 | EB39 | E81D | 0037 | 3374 | 2E3C | 2074 | 302C |
| 0000641660 | 2A72 | 093C | 2677 | C5F6 | 7410 | FFDE | 3A0E | 8004 |
| 0000641700 | 08CD | 06FF | 0438 | E432 | 80C3 | 20CD | F4EB | C5F6 |
| 0000641720 | 7510 | FF09 | 3606 | 8004 | 10CD | C9EB | F94E | 3BC3 |
| 0000641740 | 3436 | 7304 | 3624 | 80AC | 2E3E | 0004 | 1074 | 203C |
| 0000641760 | ED74 | 093C | E974 | 0A3C | E574 | 0D3C | E174 | 613C |
| 0000642000 | 0672 | 7A3C | 0277 | 5F24 | 32C3 | C3C0 | AD57 | AD92 |
| 0000642020 | AD91 | AD95 | F88B | C50B | C10B | C20B | 4974 | 05AD |
| 0000642040 | 03FE | 3E78 | E7D1 | E8D1 | DFD1 | 05BB | D100 | D1E2 |
| 0000642060 | D1D1 | D1D5 | D1D7 | D0D0 | FED7 | 75CB | 43F0 | D922 |
| 0000642100 | D30A | F633 | FA81 | 8001 | 13F5 | 13CE | 13EE | 13FE |
| 0000642120 | 80C6 | 00D7 | F0A9 | 74FF | 3D0E | 7FF0 | 80F5 | 00D7 |
| 0000642140 | 0FEB | 0E80 | 0450 | 3301 | 8BC0 | 8BD8 | 8BC8 | 8BE8 |
| 0000642160 | 8BF8 | 5FF7 | 0D89 | 6D89 | 8902 | 0475 | 4589 | 0A06 |
| 0000642200 | C3FF | 52BD | B904 | 0008 | FD8B | C033 | ABF3 | 8B2E |
| 0000642220 | 0847 | 4401 | BF08 | 0007 | 04B8 | 2B00 | 22C7 | 2AE0 |
| 0000642240 | 2AC4 | F6C4 | 04D8 | 9804 | C88B | 5653 | D92B | DF2B |
| 0000642260 | C383 | 0308 | 2BF1 | 83F7 | 06C6 | 048B | F72E | 3E27 |
| 0000642300 | 4601 | 3E00 | 5611 | 3E02 | 5683 | 0004 | EE83 | 8302 |
| 0000642320 | 02C3 | E6E2 | 5B5E | C583 | 4F02 | BC75 | ED83 | 870E |
| 0000642340 | ADF5 | AD91 | C80B | 0BAD | 0AC8 | ADCD | 0A92 | ADD1 |
| 0000642360 | AD97 | AD91 | AD93 | F58B | C00B | 0D78 | 4CFF | D108 |
| 0000642400 | D1E2 | D1D7 | D1D1 | D1D3 | BDD0 | 0001 | EF23 | D50B |

THU MAR 14 17:52:34 1991 TSLINT.DLL PAGE 228, LINE 13394

| | | | | | | | | |
|---|---|---|---|---|---|---|---|---|
| 0000642420 | ED33 | FA81 | 8001 | 13F5 | 13FD | 13CD | 13DD | D1C5 |
| 0000642440 | 01D5 | 086C | CDD1 | C50B | 3C89 | 4C89 | 8902 | 045C |
| 0000642460 | 4489 | C306 | 0000 | 0000 | 0000 | A000 | 0004 | 0000 |
| 0000642500 | 0000 | 0000 | C800 | 0007 | 0000 | 0000 | 0000 | 9C40 |
| 0000642520 | 000E | 0000 | 0000 | 2000 | BEBC | 001B | 0000 | 0400 |
| 0000642540 | C9BF | 8E1B | 0036 | B59E | 2B70 | ADA8 | 9DC5 | 006B |
| 0000642560 | A6D5 | FFCF | 1F49 | C278 | 00D5 | 8CE0 | 80E9 | 47C9 |
| 0000642600 | 93BA | 01AA | DE8E | 9DF9 | EBFB | AA7E | 0353 | CCCD |
| 0000642620 | CCCC | CCCC | CCCC | FFFD | D70A | 70A3 | 0A3D | A3D7 |
| 0000642640 | FFFA | 652C | E219 | 1758 | D1B7 | FFF3 | CEFD | 8461 |
| 0000642660 | 7711 | ABCC | FFE6 | E15B | C44D | 94BE | E695 | FFCB |
| 0000642700 | 94BA | 4539 | 1EAD | CFB1 | FF96 | E9A5 | A539 | EA27 |
| 0000642720 | A87F | FF2C | E4A1 | 64BC | 467C | DDD0 | FE57 | 193A |
| 0000642740 | 637A | 4325 | C031 | FCAE | A4BB | 0B97 | 79FF | BB05 |
| 0000642760 | 97FE | DFF7 | EB83 | 830A | 0AC3 | FF0B | 0D74 | EFD1 |
| 0000643000 | F573 | 5753 | 7BE8 | 5FFE | EB5B | C3EC | 02C8 | 0000 |
| 0000643020 | 061E | 87B8 | 8E4F | E8D8 | BD26 | C28E | D88B | 8B26 |
| 0000643040 | 0647 | C00B | 3275 | B668 | 1604 | 468D | 50FE | 006A |
| 0000643060 | 4E9A | 0050 | 0B00 | 75C0 | 8B23 | FE46 | 8926 | 0647 |
| 0000643100 | 561E | 8E57 | 33C0 | B8FF | FFFF | D88E | F633 | B6B9 |
| 0000643120 | F304 | 8CA4 | 5FC0 | 1F5E | 1F07 | C3C9 | 46C7 | 00FE |
| 0000643140 | EB00 | 00F5 | 5756 | D88C | C08E | 32BE | BF79 | 7530 |
| 0000643160 | 0AB9 | F300 | 5FA5 | CB5E | D08C | C08E | 04EB | D88C |
| 0000643200 | C08E | 531E | 85E8 | 5BFF | D88E | 5756 | F38B | 1E8B |
| 0000643220 | 0186 | C383 | 8B0C | 8CFB | 8CC0 | 8ED9 | 8EC1 | FCD8 |
| 0000643240 | A5A5 | D98E | F38B | FB81 | 0172 | 4374 | 1E89 | 0186 |
| 0000643260 | 7789 | C6FC | F547 | 5F03 | 1F5E | 8CCB | 8ED0 | EBC0 |
| 0000643300 | 8C04 | 8ED8 | 1EC0 | E853 | FF42 | 8E5B | 56D8 | 8B57 |
| 0000643320 | 8BF3 | 861E | 8301 | 0CC3 | FB8B | C08C | D98C | C18E |
| 0000643340 | D88E | A5FC | A5A5 | 8EA5 | 8BD9 | 81F3 | 72FB | 7401 |
| 0000643360 | 890F | 861E | C601 | FE47 | 8907 | FC77 | 5E5F | CB1F |
| 0000643400 | B4E9 | 1E06 | E853 | FF04 | 8E5B | 56D8 | 8C57 | EBD0 |
| 0000643420 | 1E0E | 1E07 | E853 | FEF4 | 8E5B | 56D8 | 8C57 | 8CC0 |
| 0000643440 | 8ED9 | 8EC1 | FCD8 | F38B | 1E8B | 0186 | C383 | 8B0C |
| 0000643460 | ADFB | 4588 | A5FE | 3CA5 | 7403 | A502 | 81A5 | 72FB |
| 0000643500 | 7401 | 89BD | 861E | 8901 | FC5F | D98E | 5E5F | CB1F |
| 0000643520 | D08C | C08E | 8B26 | 2607 | 578B | EB02 | 8C14 | 8ED0 |
| 0000643540 | 26C0 | 078B | EB99 | 8B0A | 8B07 | 0257 | 03EB | 078B |
| 0000643560 | 1E99 | 5250 | E853 | FE94 | 8E5B | 5AD8 | 5658 | 8B57 |
| 0000643600 | 8BDA | 8AD0 | 24C7 | 7980 | F707 | F7DB | 83DA | 00DB |
| 0000643620 | 3E8B | 0186 | C783 | 810C | 72FF | 7401 | 891D | 863E |
| 0000643640 | 8901 | FC7D | D98C | C18E | FF80 | 7500 | C610 | FE45 |
| 0000643660 | B403 | E89E | E854 | 5E5F | CB1F | 43E9 | C6FF | FE45 |
| 0000643700 | 5507 | 60BD | 8B87 | 33CB | 8BDB | E8FB | EBB2 | 5F5D |
| 0000643720 | 1F5E | 1ECB | E853 | FE34 | 8E5B | 56D8 | 8C57 | 8ED8 |
| 0000643740 | 8BC0 | 863E | 8B01 | FC75 | 458A | 83FE | 0CC7 | FF81 |
| 0000643760 | 0172 | A774 | 3E89 | 0186 | 7D89 | 88FC | FE45 | A5FC |
| 0000644000 | 3CA5 | 7403 | A502 | 5FA5 | 1F5E | 1ECB | E853 | FDFC |
| 0000644020 | 8E5B | 56D8 | 8B57 | 863E | 8301 | 0CC7 | FF81 | 0172 |
| 0000644040 | 9874 | 3E89 | 0186 | 7D89 | C6FC | FE45 | 8C03 | 8ED8 |
| 0000644060 | 33C0 | FCC0 | ABAB | 5E5F | CB1F | D08C | 02EB | D88C |
| 0000644100 | C08E | 531E | C5E8 | 5BFD | D88E | 5756 | FB8B | 8BFC |
| 0000644120 | 861E | 8301 | 8606 | 0C01 | 19EB | D08C | 02EB | D88C |
| 0000644140 | C08E | 531E | A5E8 | 5BFD | D88E | 5756 | FB8B | 8BFC |
| 0000644160 | 861E | 8001 | FE7F | 7503 | 8B0E | FC77 | A5A5 | 2E83 |
| 0000644200 | 0186 | 5F0C | 1F5E | 55CB | 2689 | 0482 | 778B | 57FC |
| 0000644220 | 50E8 | 5FE2 | DE8B | EB5D | 8CE3 | EBD0 | 8C02 | 8ED8 |
| 0000644240 | 1EC0 | E853 | FD66 | 8E5B | 56D8 | 8B57 | FCFB | 1E8B |
| 0000644260 | 0186 | 0683 | 0186 | EB0C | 8C19 | EBD0 | 8C02 | 8ED8 |

THU MAR 14 17:52:34 1991 TSLINT.DLL PAGE 229, LINE 13453

| | | | | | | | | |
|---|---|---|---|---|---|---|---|---|
| 0000644300 | 1EC0 | E853 | FD46 | 8E5B | 56D8 | 8B57 | FCFB | 1E8B |
| 0000644320 | 0186 | 7F80 | 07FE | 1075 | 778B | A5FC | A5A5 | 83A5 |
| 0000644340 | 862E | 0C01 | 5E5F | CB1F | DF87 | 67E8 | 8BE1 | 87F7 |
| 0000644360 | EBDF | 8CE8 | EBD0 | 8C02 | 8ED8 | 1EC0 | E853 | FD0C |
| 0000644400 | 8E5B | 56D8 | 8B57 | 8BFB | 861E | 8301 | 8606 | 0C01 |
| 0000644420 | 18EB | D08C | 02EB | D88C | C08E | 531E | EDE8 | 5BFC |
| 0000644440 | D88E | 5756 | FB8B | 1E8B | 0186 | F38B | 478A | 83FE |
| 0000644460 | 862E | 0C01 | ABFC | A5A5 | 033C | 0274 | A5A5 | 5E5F |
| 0000644500 | CB1F | 3FB8 | BA7E | 7E49 | 4BEB | 6DB8 | BA7E | 7E72 |
| 0000644520 | 43EB | 439A | 3B9C | 9F78 | 2688 | 0480 | D4B8 | BA9B |
| 0000644540 | 9BD9 | 31EB | C5E8 | EBE2 | E80D | E2C5 | 08EB | 14E8 |
| 0000644560 | EBE3 | E803 | E2DA | 8A50 | 8026 | 9E04 | 7358 | F707 |
| 0000644600 | 83D8 | 00D2 | DAF7 | 9AC3 | 9C43 | 9BC5 | 8A9F | B8FC |
| 0000644620 | 9BDE | E3BA | 1E9B | 5350 | 5251 | E853 | FC6E | 8E5B |
| 0000644640 | 5AD8 | 5B59 | 5658 | 8857 | 803E | 5504 | 2689 | 0482 |
| 0000644660 | 5153 | 368B | 0186 | EE83 | 890C | 8636 | 8001 | 0A7C |
| 0000644700 | 8B03 | 0874 | 0475 | D0FF | 02EB | D2FF | 5B59 | 5F5D |
| 0000644720 | 1F5E | 1ECB | E853 | FC34 | 8E5B | 57D8 | 3E8B | 0186 |
| 0000644740 | 5D8A | 32FE | F6FF | 7F01 | 1475 | FB80 | 7403 | F609 |
| 0000644760 | FF41 | 75F0 | 5F09 | CB1F | 41F6 | 80FF | F774 | 01F6 |
| 0000645000 | 5F80 | 751F | 0B03 | CBE4 | CBF9 | 531E | FDE8 | 5BFB |
| 0000645020 | D88E | 8B57 | 863E | 8A01 | FE5D | FF32 | 2180 | 5F7F |
| 0000645040 | CB1F | 531E | E5E8 | 5BFB | D88E | 5756 | 3E8B | 0186 |
| 0000645060 | 5D8A | 8BFE | FC75 | F73B | 0975 | FF32 | 3180 | 5F80 |
| 0000645100 | 1F5E | 89CB | FC7D | D98C | C18E | A5FC | FB80 | 7503 |
| 0000645120 | AD09 | F480 | AB80 | 5E5F | CB1F | A5A5 | 80AD | 80F4 |
| 0000645140 | 5FAB | 1F5E | 1ECB | E853 | FBA2 | 8E5B | 56D8 | 8C57 |
| 0000645160 | 8ED0 | EBC0 | 1E0A | E853 | FB92 | 8E5B | 56D8 | E857 |
| 0000645200 | DFA4 | 04EB | 071E | EDEB | 08B8 | E900 | 00C7 | 531E |
| 0000645220 | 79E8 | 5BFB | D88E | 5756 | D08C | C08E | 0AEB | 531E |
| 0000645240 | 69E8 | 5BFB | D88E | 5756 | 7BE8 | EBDF | 1E04 | EB07 |
| 0000645260 | B8ED | 0004 | 9EE9 | 1E00 | E853 | FB50 | 8E5B | 56D8 |
| 0000645300 | 8C57 | 8ED0 | EBC0 | 1E0A | E853 | FB40 | 8E5B | 56D8 |
| 0000645320 | E857 | DF52 | 04EB | 071E | EDEB | 0CB8 | EB00 | 1E76 |
| 0000645340 | E853 | FB28 | 8E5B | 56D8 | 8C57 | 8ED0 | EBC0 | 1E0A |
| 0000645360 | E853 | FB18 | 8E5B | 56D8 | E857 | DF2A | 04EB | 071E |
| 0000645400 | EDEB | 14B8 | EB00 | 1E4E | E853 | FB00 | 8E5B | 56D8 |
| 0000645420 | 8C57 | 8ED0 | EBC0 | 1E0A | E853 | FAF0 | 8E5B | 56D8 |
| 0000645440 | E857 | DF02 | 04EB | 071E | EDEB | 10B8 | EB00 | 1E26 |
| 0000645460 | E853 | FAD8 | 8E5B | 56D8 | 8C57 | 8ED0 | EBC0 | 1E0A |
| 0000645500 | E853 | FACE | 8E5B | 56D8 | E857 | DEDA | 04EB | 071E |
| 0000645520 | EDEB | 00B8 | 8B00 | 8BD8 | 863E | 8C01 | 8ED9 | 80C1 |
| 0000645540 | FE7D | 7407 | 8711 | FC7D | 8955 | 8226 | FF04 | 6497 |
| 0000645560 | 5D04 | 5E5F | CB1F | C383 | BF02 | 0008 | E4E8 | 8BDE |
| 0000645600 | 8BF7 | 863E | EB01 | 1EDE | E853 | FA80 | 8E5B | 56D8 |
| 0000645620 | 8C57 | 8ED0 | EBC0 | 1E0A | E853 | FA70 | 8E5B | 56D8 |
| 0000645640 | E857 | DE98 | 04EB | 071E | EDEB | 0AB8 | E900 | 00C7 |
| 0000645660 | 531E | 57E8 | 5BFA | D88E | 5756 | D08C | C08E | 0AEB |
| 0000645700 | 531E | 47E8 | 5BFA | D88E | 5756 | 6FE8 | EBDE | 1E04 |
| 0000645720 | EB07 | B8ED | 0006 | 9EE9 | 1E00 | E853 | FA2E | 8E5B |
| 0000645740 | 56D8 | 8C57 | 8ED0 | EBC0 | 1E0A | E853 | FA1E | 8E5B |
| 0000645760 | 56D8 | E857 | DE46 | 04EB | 071E | EDEB | 0EB8 | EB00 |
| 0000646000 | 1E76 | E853 | FA06 | 8E5B | 56D8 | 8C57 | 8ED0 | EBC0 |
| 0000646020 | 1E0A | E853 | F9F6 | 8E5B | 56D8 | E857 | DE1E | 04EB |
| 0000646040 | 071E | EDEB | 16B8 | EB00 | 1E4E | E853 | F9DE | 8E5B |
| 0000646060 | 56D8 | 8C57 | 8ED0 | EBC0 | 1E0A | E853 | F9CE | 8E5B |
| 0000646100 | 56D8 | E857 | DDF6 | 04EB | 071E | EDEB | 12B8 | EB00 |
| 0000646120 | 1E26 | E853 | F9B6 | 8E5B | 56D8 | 8C57 | 8ED0 | EBC0 |
| 0000646140 | 1E0A | E853 | F9A6 | 8E5B | 56D8 | E857 | DDCE | 04EB |

THU MAR 14 17:52:34 1991 TSLINT.DLL PAGE 230, LINE 13512

| | | | | | | | | |
|---|---|---|---|---|---|---|---|---|
| 0000646160 | 071E | EDEB | 02B8 | 8B00 | 8BD8 | 863E | 8C01 | 8ED9 |
| 0000646200 | 80C1 | FE7D | 7407 | 5605 | C9E8 | 5EDD | D6E9 | BBFE |
| 0000646220 | 0004 | 21EB | 08BB | EB00 | BB1C | 000C | 17EB | 10BB |
| 0000646240 | EB00 | BB12 | 0014 | 0DEB | 00BB | EB00 | BB08 | 001C |
| 0000646260 | 03EB | 18BB | 1E00 | E853 | F952 | 8E5B | 56D8 | 8B57 |
| 0000646300 | 863E | 8001 | FE7D | 7407 | 803A | F27D | 7407 | 832C |
| 0000646320 | 0CEF | 3E89 | 0186 | D88C | C08E | 758B | 89FC | FC7D |
| 0000646340 | 7D8B | 8308 | 1CFB | 3073 | FB83 | 7318 | 5540 | 2689 |
| 0000646360 | 0482 | 97FF | 0464 | 5F5D | 1F5E | 83CB | 02C3 | 53E8 |
| 0000646400 | EBDD | 83CC | 02C3 | 7D80 | 07F2 | C374 | EF83 | 890C |
| 0000646420 | 863E | E801 | DD3E | BEEB | F787 | 2E83 | 0186 | 550C |
| 0000646440 | 2689 | 0482 | 97FF | D460 | 5F5D | 1F5E | 83CB | 862E |
| 0000646460 | 0C01 | 8955 | 8226 | FF04 | 6497 | 5D04 | 259F | 4100 |
| 0000646500 | E8D1 | E4D0 | E00A | 5E5F | 9E1F | D0CB | D0E3 | 8AE3 |
| 0000646520 | D0FB | 02E7 | 32DF | EBFF | BB03 | 000C | 531E | ABE8 |
| 0000646540 | 5BF8 | D88E | 5756 | D88C | C08E | 8BFC | 8636 | 4E01 |
| 0000646560 | 8B4E | 2BFE | B9FB | 0005 | 87AD | 8905 | FE44 | 1D8B |
| 0000646600 | 4747 | F4E2 | 5E5F | CB1F | 5756 | E81E | F87E | D88E |
| 0000646620 | 3E8B | 0186 | 7D80 | 07FE | 0374 | B7E8 | 1FDC | 5E5F |
| 0000646640 | 00CB | 3068 | B034 | EB84 | 6813 | 3330 | 83B0 | 0CEB |
| 0000646660 | 3068 | B031 | EB81 | 6805 | 3031 | 8AB0 | 681E | 9883 |
| 0000646700 | 831F | 303E | 0079 | 0674 | 1EFF | 792E | C31F | 459A |
| 0000646720 | FAA0 | 1F9B | 55C3 | EC8B | EC83 | 1E02 | 2EBB | 8EA0 |
| 0000646740 | 8BDB | 085E | 1E89 | 794A | 8C3C | 0675 | 06C7 | 794A |
| 0000646760 | 3231 | E42A | 4689 | 9AFE | 2E5C | A041 | 46BB | 9A79 |
| 0000647000 | 6926 | A06A | FDB8 | 5000 | D69A | 722F | 8BA0 | FE46 |
| 0000647020 | E405 | 50FF | D69A | 7B2F | FFA0 | FE76 | 5E9A | 872D |
| 0000647040 | 1FA0 | E58B | CB5D | 8B55 | 56EC | 1E57 | 53FC | E852 |
| 0000647060 | F7DA | C08E | 5B5A | 1F16 | 768D | BF08 | 0492 | A5A5 |
| 0000647100 | A5A5 | 768D | BF10 | 048A | A5A5 | A5A5 | 54E8 | 0600 |
| 0000647120 | BE1F | 049A | 0716 | 7E8B | 8B06 | A5C7 | A5A5 | 8CA5 |
| 0000647140 | 1FD2 | 5E5F | E58B | CA5D | 0012 | 8B55 | 56EC | 1E57 |
| 0000647160 | 5253 | 97E8 | 8EF7 | 5AC0 | BF5B | 048A | 1F16 | 768D |
| 0000647200 | A508 | A5A5 | E8A5 | 001B | 1F06 | 9ABE | 1604 | 8B07 |
| 0000647220 | 067E | C78B | A5A5 | A5A5 | D28C | 5F1F | 8B5E | 5DE5 |
| 0000647240 | 0ACA | BE00 | 048A | 92BF | 0604 | FF1F | 8636 | C701 |
| 0000647260 | 8606 | 9A01 | 5304 | FF55 | 5DD2 | 8F5B | 8606 | B901 |
| 0000647300 | AD4D | D98E | 0172 | 33C3 | 8AC9 | 26C8 | 1E89 | D486 |
| 0000647320 | 8C26 | 881E | 2604 | 06C6 | 04A2 | 3D00 | 0302 | 0675 |
| 0000647340 | C626 | A206 | 0104 | 9ABF | 8004 | 03FC | 1274 | D73C |
| 0000647360 | 0C74 | 033C | 1974 | C033 | ABAB | ABAB | 18EB | 03B1 |
| 0000647400 | 4CBE | A579 | A5A5 | 26A5 | 0E80 | 04A1 | EB80 | BE07 |
| 0000647420 | 794C | A5A5 | A5A5 | 8926 | 840E | 8B04 | 06F1 | B806 |
| 0000647440 | 0484 | 9A50 | AA62 | A08F | C483 | 0704 | C00B | 9675 |
| 0000647460 | 21B0 | 8026 | A23E | 0004 | 0875 | 8326 | 843E | 0304 |
| 0000647500 | 0272 | 22B0 | 0698 | 9A50 | 30C0 | A196 | D88B | C28E |
| 0000647520 | 8F26 | 0707 | E6D1 | B48B | 7954 | F60B | 1974 | 8B26 |
| 0000647540 | 861E | 4B04 | 269A | BA69 | BBA1 | 7962 | 269A | D769 |
| 0000647560 | 56A1 | D69A | DF2F | C3A1 | 8B55 | 83EC | 0CEC | 5E89 |
| 0000647600 | 89F6 | F456 | EC83 | 8B10 | 9ADC | 9B29 | A1E5 | DC8B |
| 0000647620 | C383 | 9A08 | 9B29 | A1FC | 468D | 50F8 | 5E8B | 8BF6 |
| 0000647640 | F456 | 969A | 06A0 | 8BA2 | 8ED8 | 9AC2 | 9935 | A215 |
| 0000647660 | E58B | CB5D | 8B55 | 83EC | 0CEC | 5E89 | 89F6 | F456 |
| 0000647700 | EC83 | 8B08 | 9ADC | 9B29 | A21E | 468D | 50F8 | 5E8B |
| 0000647720 | 8BF6 | F456 | DA9A | 38A0 | 8BA2 | 8ED8 | 9AC2 | 9935 |
| 0000647740 | A247 | E58B | CB5D | 67BB | BA79 | 8A6E | 7BE9 | BBFE |
| 0000647760 | 7967 | 6EBA | E98A | FFBC | 6DBB | BA79 | 8DF2 | 25E9 |
| 0000650000 | BBFE | 796D | F2BA | E98D | FF6E | 72BB | BA79 | 8CD6 |
| 0000650020 | 57E9 | BBFE | 7972 | D6BA | E98C | FF98 | 77BB | BA79 |

THU MAR 14 17:52:34 1991 TSLINT.DLL PAGE 231, LINE 13571

| | | | | | | | | |
|---|---|---|---|---|---|---|---|---|
| 0000650040 | 8CC0 | 45E9 | BBFE | 7977 | C0BA | E98C | FF86 | 7EBB |
| 0000650060 | BA79 | 8D8D | 33E9 | BBFE | 797E | 8DBA | E98D | FF74 |
| 0000650100 | 83BB | BA79 | 907D | 21E9 | BBFE | 7983 | 7DBA | E990 |
| 0000650120 | FF62 | 88BB | BA79 | 9064 | 0FE9 | BBFE | 7988 | 64BA |
| 0000650140 | E990 | FF50 | 8DBB | BA79 | 901E | FDE9 | BBFD | 798D |
| 0000650160 | 1EBA | E990 | FF3E | 93BB | BA79 | 919C | EBE9 | BBFD |
| 0000650200 | 7993 | 9CBA | E991 | FF2C | 99BB | BA79 | 9199 | D9E9 |
| 0000650220 | BBFD | 7999 | 99BA | E991 | FF1A | 9FBB | BA79 | 90FD |
| 0000650240 | C7E9 | BBFD | 799F | FDBA | E990 | FF08 | A5BB | BA79 |
| 0000650260 | 91D6 | 71E9 | BBFD | 79A5 | D6BA | E991 | FEBA | 8B55 |
| 0000650300 | 83EC | 64EC | 5756 | 331E | 8BDB | 1056 | 01B8 | E800 |
| 0000650320 | 002B | 763B | 730C | 8005 | 40C9 | 0D89 | 5F1F | 8B5E |
| 0000650340 | 5DE5 | 55CB | EC8B | EC83 | 5664 | 1E57 | C033 | D233 |
| 0000650360 | 5E8B | E810 | 0007 | 5F1F | 8B5E | 5DE5 | FCCB | 5055 |
| 0000650400 | 006A | 006A | D08C | C08E | D88E | 4E8B | 830C | 64F9 |
| 0000650420 | 0676 | 40B1 | F633 | 26EB | 76C5 | 8D08 | 9C7E | A4F3 |
| 0000650440 | D88E | 4E8B | 8D0C | 9C76 | 7689 | 8B08 | 0E46 | 4E01 |
| 0000650460 | BF08 | 04A4 | 5FE8 | 5DF0 | 762B | 0308 | 0C76 | 7E8B |
| 0000650500 | 3606 | 0D89 | 8936 | 0275 | 8936 | 0445 | 8936 | 065D |
| 0000650520 | A4BE | 8B04 | 3604 | 4589 | 8B08 | 0244 | 8936 | 0A45 |
| 0000650540 | 448B | 3604 | 4589 | 8B0C | 0644 | 8936 | 0E45 | C78B |
| 0000650560 | D28C | 00C3 | 8B55 | 56EC | 1E57 | 1F16 | 768D | 5506 |
| 0000650600 | C2E8 | 5DEE | 8B1F | 26C8 | 98AC | FE8B | F803 | C626 |
| 0000650620 | 0005 | 7E8B | 320E | 36FF | 1D89 | 8936 | 0255 | 8936 |
| 0000650640 | 044D | 8936 | 0675 | 8C36 | 0845 | D28C | C78B | 5E5F |
| 0000650660 | E58B | CB5D | 8B55 | 83EC | 0AEC | 5EC4 | 2606 | 078A |
| 0000650700 | 8B98 | F6D8 | 4F87 | 0175 | 0674 | 478D | EB20 | 9008 |
| 0000650720 | 5E8B | 2606 | 078A | 3D98 | 0065 | 1374 | 46FF | C406 |
| 0000650740 | 065E | 8A26 | 9807 | D88B | 87F6 | 754F | 7504 | C4ED |
| 0000650760 | 065E | 8A26 | 8807 | FE46 | C626 | 2E07 | 46FF | C406 |
| 0000651000 | 065E | 8A26 | 8807 | FC46 | 468A | 26FE | 0788 | 468A |
| 0000651020 | 88FC | FE46 | 5EC4 | FF06 | 0646 | 8026 | 003F | DF75 |
| 0000651040 | E58B | CB5D | 8B55 | 83EC | 08EC | 09EB | 8026 | 2E3F |
| 0000651060 | 0C74 | 46FF | C406 | 065E | 8026 | 003F | EE75 | 46FF |
| 0000651100 | 2606 | 3F80 | 7400 | EB56 | 9010 | 8026 | 653F | 1274 |
| 0000651120 | 8026 | 453F | 0C74 | 46FF | 8B06 | 065E | 8026 | 003F |
| 0000651140 | E875 | C38B | C28C | 4EFF | 8906 | FC46 | 5689 | EBFE |
| 0000651160 | 9004 | 4EFF | 8B06 | 065E | 8026 | 303F | F474 | 8026 |
| 0000651200 | 2E3F | 0375 | 4EFF | C406 | FC5E | 46FF | 26FC | 078A |
| 0000651220 | 46FF | C406 | 065E | 8826 | 0A07 | 75C0 | 8BEA | 5DE5 |
| 0000651240 | 90CB | 8B55 | 8DEC | 061E | 9A7C | 9931 | A524 | 5EC4 |
| 0000651260 | 9A06 | 9935 | A529 | 1D9A | 559F | 72A5 | B807 | 0001 |
| 0000651300 | E58B | CB5D | C02B | E58B | CB5D | 8B55 | 83EC | 10EC |
| 0000651320 | 5657 | 7E83 | 0006 | 2274 | 76FF | FF0E | 0C76 | 468D |
| 0000651340 | 50F8 | 969A | 7751 | 8BA5 | 1EF0 | 1F16 | 7EC4 | A508 |
| 0000651360 | A5A5 | 1FA5 | 5F5E | E58B | CB5D | 76FF | FF0E | 0C76 |
| 0000651400 | 468D | 50F0 | 969A | 7E51 | 8BA5 | 9AD8 | 992B | A586 |
| 0000651420 | 5EC4 | 9A08 | 9AD2 | A626 | 5F5E | E58B | CB5D | 8B55 |
| 0000651440 | 83EC | 06EC | 5657 | 5EC4 | 2612 | 478B | 4802 | 7E80 |
| 0000651460 | 0016 | 2E74 | 8326 | 2D3F | 0675 | 01B8 | EB00 | 9003 |
| 0000651500 | C02B | 4603 | 8B0A | 0C56 | 4689 | 89FA | FC56 | 5052 |
| 0000651520 | 7E83 | 000E | 067E | 01B8 | EB00 | 9003 | C02B | E850 |
| 0000651540 | 045C | 468B | 8B0A | 0C56 | 4689 | 89FA | FC56 | 5EC4 |
| 0000651560 | 2612 | 3F83 | 752D | 8E0C | 8BC2 | 26D8 | 07C6 | 402D |
| 0000651600 | 4689 | 83FA | 0E7E | 7E00 | C412 | FA5E | 8A26 | 0147 |
| 0000651620 | 8826 | 4307 | 5E89 | 26FA | 07C6 | B82E | 79AC | 501E |
| 0000651640 | 7E80 | 0116 | C01B | D8F7 | 4603 | 8BFA | FC56 | 4603 |
| 0000651660 | 520E | 9A50 | 50B4 | A6D9 | C483 | 8908 | FA46 | 5689 |
| 0000651700 | 83FC | 107E | 7400 | C407 | FA5E | C626 | 4507 | 46FF |

THU MAR 14 17:52:34 1991 TSLINT.DLL PAGE 232, LINE 13630

| | | | | | | | | |
|---|---|---|---|---|---|---|---|---|
| 0000651720 | C4FA | 125E | C426 | 067F | 8026 | 303D | 5C74 | 468E |
| 0000651740 | 2614 | 778B | 4E02 | 0D79 | C68B | D8F7 | F08B | 5EC4 |
| 0000651760 | 26FA | 07C6 | FF2D | FA46 | FE83 | 7C64 | 8B15 | B9C6 |
| 0000652000 | 0064 | F799 | C4F9 | FA5E | 0026 | 8B07 | 99C6 | F9F7 |
| 0000652020 | F28B | 46FF | 83FA | 0AFE | 157C | C68B | 0AB9 | 9900 |
| 0000652040 | F9F7 | 5EC4 | 26FA | 0700 | C68B | F799 | 8BF9 | 8BF2 |
| 0000652060 | FFC6 | FA46 | 5EC4 | 26FA | 0700 | 468B | 8B0A | 0C56 |
| 0000652100 | 5F5E | E58B | CB5D | 8B55 | 83EC | 28EC | 468D | 50EA |
| 0000652120 | 468D | 50DC | 5EC4 | 2606 | 77FF | 26D6 | 77FF | 2604 |
| 0000652140 | 77FF | 2602 | 37FF | E49A | 26A3 | 83A7 | 0CC4 | 468D |
| 0000652160 | 89DC | E646 | 568C | 16E8 | 8B50 | 0E4E | 5141 | 7E83 |
| 0000652200 | 000E | 067E | 01B8 | EB00 | 9003 | C02B | 5EC4 | 89E6 |
| 0000652220 | DA46 | 2650 | 078B | 4689 | 58D8 | 8326 | 2D3F | 0675 |
| 0000652240 | 01B8 | EB00 | 9003 | C02B | 4603 | 03DA | 0A46 | 568B |
| 0000652260 | 520C | 9A50 | 5268 | A84B | C483 | 2A0A | 50C0 | 76FF |
| 0000652300 | FFE8 | E676 | 76FF | FF10 | 0E76 | 76FF | FF0C | 0A76 |
| 0000652320 | 76FF | FF08 | 0676 | E80E | FE44 | 468B | 8B0A | 0C56 |
| 0000652340 | E58B | CB5D | 8B55 | 83EC | 0CEC | C456 | 105E | 8B26 |
| 0000652360 | 0247 | 8948 | FE46 | 7E80 | 0014 | 3474 | 8326 | 2D3F |
| 0000652400 | 0675 | 01B8 | EB00 | 9003 | C02B | 4603 | 8B0A | 0C56 |
| 0000652420 | 4689 | 89F4 | F656 | 4E8B | 390E | FE4E | 1275 | C28E |
| 0000652440 | D88B | 768B | 26FE | 00C6 | 0330 | 43DE | C626 | 0007 |
| 0000652460 | 468B | 8B0A | 0C56 | 4689 | 89F4 | F656 | 5EC4 | 2610 |
| 0000652500 | 3F83 | 752D | 8E0C | 8BC2 | 26D8 | 07C6 | 402D | 4689 |
| 0000652520 | C4F4 | 105E | 8326 | 027F | 7F00 | FF19 | F676 | 76FF |
| 0000652540 | B8F4 | 0001 | E850 | 0256 | 5EC4 | 26F4 | 07C6 | FF30 |
| 0000652560 | F446 | 07EB | 8B26 | 0247 | 4601 | 83F4 | 0E7E | 7E00 |
| 0000652600 | FF5F | F676 | 76FF | B8F4 | 0001 | E850 | 0230 | 5EC4 |
| 0000652620 | 26F4 | 07C6 | FF2E | F446 | 5EC4 | 2610 | 7F83 | 0002 |
| 0000652640 | 3E7D | 7E80 | 0014 | 0874 | 8B26 | 0247 | D8F7 | 0EEB |
| 0000652660 | 8B26 | 0247 | D8F7 | 463B | 7E0E | 8B03 | 0E46 | 4689 |
| 0000652700 | FF0E | F676 | 76FF | 50F4 | F3E8 | FF01 | 0E76 | 30B8 |
| 0000652720 | 5000 | 76FF | FFF6 | F476 | 8C9A | 7F66 | 83A8 | 08C4 |
| 0000652740 | 468B | 8B0A | 0C56 | 8B5E | 5DE5 | 90CB | 8B55 | 83EC |
| 0000652760 | 26EC | 468D | 50EA | 468D | 50DC | 5EC4 | 2606 | 77FF |
| 0000653000 | 2606 | 77FF | 2604 | 77FF | 2602 | 37FF | E49A | B9A3 |
| 0000653020 | 83A8 | 0CC4 | 468D | 89DC | E646 | 568C | 16E8 | 8B50 |
| 0000653040 | DE4E | 4E03 | 510E | D88B | 3650 | 078B | 4689 | 58DA |
| 0000653060 | 8336 | 2D3F | 0675 | 01B8 | EB00 | 9003 | C02B | 4603 |
| 0000653100 | 8B0A | 0C56 | 5052 | 689A | 5052 | 83A2 | 0AC4 | C02A |
| 0000653120 | FF50 | E876 | 76FF | FFE6 | 0E76 | 76FF | FF0C | 0A76 |
| 0000653140 | 76FF | FF08 | 0676 | E80E | FE7A | 468B | 8B0A | 0C56 |
| 0000653160 | E58B | CB5D | 8B55 | 83EC | 32EC | 468D | 50E4 | 468D |
| 0000653200 | 50D8 | 5EC4 | 2606 | 77FF | 2606 | 77FF | 2604 | 77FF |
| 0000653220 | 2602 | 37FF | E49A | 41A3 | 83A9 | 0CC4 | 468B | 48DA |
| 0000653240 | 4689 | 8DE2 | D846 | 4689 | 8CD4 | D656 | 5016 | 76FF |
| 0000653260 | 8B0E | 36D8 | 3F83 | 752D | B805 | 0001 | 02EB | C02B |
| 0000653300 | 4603 | 8B0A | 0C56 | 4689 | 89FC | FE56 | 5052 | 689A |
| 0000653320 | 4052 | 83AA | 0AC4 | 468B | 48DA | 4689 | 3BD2 | E246 |
| 0000653340 | 047E | 01B0 | 02EB | C02A | 4688 | 8BFA | D246 | 4689 |
| 0000653360 | 3DE2 | FFFC | 057C | 463B | 7C0E | B027 | 5001 | 76FF |
| 0000653400 | FFD6 | D476 | 76FF | FF10 | 0E76 | 76FF | FF0C | 0A76 |
| 0000653420 | 76FF | FF08 | 0676 | E80E | FC04 | C483 | 8B12 | 5DE5 |
| 0000653440 | 90CB | 7E80 | 00FA | 1474 | 5EC4 | FFFC | FC46 | 8026 |
| 0000653460 | 003F | F475 | 5E8B | 26FC | 47C6 | 00FE | 01B0 | FF50 |
| 0000653500 | D676 | 76FF | FFD4 | 0E76 | 76FF | FF0C | 0A76 | 76FF |
| 0000653520 | FF08 | 0676 | E80E | FD8C | E58B | CB5D | 8B55 | 83EC |
| 0000653540 | 0E7E | 7465 | 8306 | 0E7E | 7545 | FF1D | 1276 | 76FF |
| 0000653560 | FF10 | 0C76 | 76FF | FF0A | 0876 | 76FF | 0E06 | C5E8 |

```
THU MAR 14 17:52:34 1991  TSLINT.DLL  PAGE 233, LINE 13689

0000653600  8BFC  8BE5  5DE5  90CB  7E83  660E  1675  76FF
0000653620  FF10  0C76  76FF  FF0A  0876  76FF  0E06  4BE8
0000653640  EBFE  90DE  76FF  FF12  1076  76FF  FF0C  0A76
0000653660  76FF  FF08  0676  E80E  FEBA  E58B  CB5D  8B55
0000653700  83EC  047E  7400  FF25  0876  76FF  9A06  5114
0000653720  AA5A  E58B  5040  76FF  FF08  0676  468B  8B06
0000653740  0856  4603  5204  9A50  6508  A51C  E58B  C25D
0000653760  0006  8B55  33EC  8BC0  5DE5  C6CB  5406  0179
0000654000  00CB  8B55  56EC  1E57  01E8  8EEE  32D8  E8C0
0000654020  0043  0716  7E8B  A506  A5A5  8CA5  8BD2  0646
0000654040  5F1F  8B5E  5DE5  0ACA  5500  EC8B  5756  E81E
0000654060  EDDA  D88E  80B0  1CE8  8000  0736  8000  0716
0000654100  7E8B  A506  A5A5  8CA5  8BD2  0646  5F1F  8B5E
0000654120  5DE5  0ACA  FC00  071E  768D  BF08  0000  A536
0000654140  A536  A536  A536  4530  36FF  4430  FFFF  8636
0000654160  BE01  0000  3689  0186  E855  D4CF  44F6  8007
0000654200  1B79  555D  7E8D  1608  1E07  4FE8  58D6  D88E
0000654220  C08E  00BE  7400  BF06  04AE  8DE8  5DD9  068F
0000654240  0186  2AC3  0500  6F02  0321  2500  0200  0600
0000654260  0227  0000  0200  F300  0328  0000  0300  AC01
0000654300  0155  0500  0300  5A01  012D  0700  0200  0700
0000654320  04A9  0000  0300  E601  012B  0800  0300  B802
0000654340  0321  7900  0300  7F01  014B  8900  0300  3A01
0000654360  0169  8A00  0500  5C02  0300  3300  0300  4F01
0000654400  0154  8C00  0200  E500  0555  0000  0300  7101
0000654420  0154  8D00  0300  2B01  0154  8E00  0200  6D00
0000654440  0654  0000  0300  DA01  016E  9000  0300  0401
0000654460  0155  9100  0200  B800  0798  0000  0200  FA00
0000654500  0804  0000  0500  B502  0321  4100  0200  3000
0000654520  09A1  0000  0500  D701  0153  8700  0500  BF01
0000654540  0166  8800  0300  6A01  0161  2100  0300  A101
0000654560  0198  2200  0300  EA01  0155  2600  0300  1901
0000654600  014C  3A00  0300  3901  0149  3B00  0300  7201
0000654620  0179  3C00  0300  FD01  0149  4400  0200  B202
0000654640  0321  4100  0300  1001  0149  4600  0300  6901
0000654660  0178  4700  0300  9801  0175  4800  0300  5601
0000654700  0176  4A00  0300  6601  0175  4B00  0300  F901
0000654720  0175  4D00  0300  A801  0175  5100  0300  9102
0000654740  0300  4B00  0300  3701  012C  5B00  0300  4602
0000654760  0300  CD00  0000  0000  0000  0000  0000  0000
0000655000  0000  0000  0200  0000  0000  0000  0000  0000
0000655020  0000  0000  0000  0000  0000  0000  0000  0000
*
0000655100  0000  0000  0200  0000  0000  0000  0000  0000
0000655120  0000  0000  0000  0000  0000  0000  0000  0000
*
0000655200  0000  0000  0200  0000  0000  0000  0000  0000
0000655220  0000  0000  0000  0000  0000  0000  0000  0000
*
0000655300  0000  0000  0200  0000  0000  0000  0000  0000
0000655320  0000  0000  0000  0000  0000  0000  0000  0000
*
0000656120  0000  0000  0000  0016  FEFF  F8FC  E0FD  80C0
0000656140  0000  0000  0000  0000  0000  0000  0000  0000
*
0000656220  0000  3FE0  0000  0000  0000  3FFD  0000  0000
0000656240  0000  4000  0000  0000  0000  0000  0000  0000
0000656260  0000  0000  0000  0000  0000  0000  0000  0000
*
```

THU MAR 14 17:52:34 1991 TSLINT.DLL PAGE 234, LINE 13748

```
0000656320  0000  0000  0000  0000  0000  0000  CD00  7F3B
0000656340  9E66  E6A0  EF3F  FA39  42FE  E62E  0E3F  26E5
0000656360  7B15  DBCB  003F  0000  0000  E630  A83F  610C
0000656400  105C  2BD0  02BF  2900  56BD  15B3  E944  EDBF
0000656420  16AF  4A20  3062  9A40  B3B5  FF12  5007  03C0
0000656440  0F80  67CE  804B  41D5  7EC0  1526  83FA  7380
0000656460  7740  0D90  FE9C  880B  00C0  0000  0000  0000
0000656500  0000  0000  0000  0000  0000  FE00  2B82  4765
0000656520  F715  003F  0000  0000  0000  0000  0000  0000
0000656540  0000  0000  0000  0000  0000  0000  0000  0000
0000656560  0000  0000  0000  0000  0000  0000  0000  82FE
0000656600  652B  1547  3FF7  3BCD  667F  A09E  3FE6  39EE
0000656620  FEFA  2E42  4086  BCD1  DD7A  232B  C086  0000
0000656640  0000  3000  3FE6  0CA8  5C61  D010  BF2B  0002
0000656660  DC1C  6F58  52A4  3EF1  F6E0  6FB3  70E4  3F7C
0000656700  0000  0000  0000  3FD0  0002  3809  6FDE  3F99
0000656720  3F40  51B3  7142  718E  3FAC  0000  0000  0000
0000656740  3FE0  8300  C9C8  306D  D45F  003F  0000  F800
0000656760  D921  C540  C234  2168  DAA2  073E  9500  93DF
0000657000  FF69  E880  9C3C  0849  20DC  6AE4  30BD  6AD4
0000657020  3C68  E612  AB3D  5DC0  454B  5AE6  63BE  24F0
0000657040  E3A5  C71D  1A3E  013E  A01A  2A01  B0BF  1110
0000657060  1111  8111  553F  5555  5555  C555  00BF  0000
0000657100  AA00  584C  7AE8  FBB6  553F  B099  F5D0  E76C
0000657120  563F  9ECD  145E  D126  183F  442D  FB54  F921
0000657140  183F  442D  FB54  0921  0040  0000  0000  0000
0000657160  6600  2D73  5238  E0C1  183F  442D  FB54  F921
0000657200  663F  2D73  5238  F0C1  033F  BD00  B187  7AD9
0000657220  EACD  63BF  8D6A  3F5C  20FD  CBC0  E2BC  7FB9
0000657240  3481  E2C0  061C  A651  2B60  04C0  1080  4AC7
0000657260  49E1  2E0C  D740  0DA3  0A32  4DCA  A540  0B6D
0000657300  1204  558A  A940  C495  7CBC  4488  0040  0000
0000657320  2D18  5444  21FB  3FF9  2D18  5444  21FB  4009
0000657340  0000  0000  0000  0000  0000  0000  0000  0000
*
0000657460  0000  0000  81A8  84BD  81A0  849A  819E  8498
0000657500  830A  86C3  8390  8726  838E  8724  80F9  814C
0000657520  0000  0000  0000  0000  0000  0000  0000  0000
*
0000657600  0000  0000  3FF0  0000  0000  0000  0000  0000
0000657620  0000  0000  0000  0000  534D  5220  6E75  542D
0000657640  6D69  2065  694C  7262  7261  2079  202D  6F43
0000657660  7970  6972  6867  2074  6328  2029  3931  3039
0000657700  202C  694D  7263  736F  666F  2074  6F43  7072
0000657720  0018  7761  336B  632E  7400  6C73  702E  2000
0000657740  4600  0053  464E  0A00  5200  0053  524E  4600
0000657760  524E  2D00  4600  4C49  4E45  4D41  0045  0020
0000660000  464F  0053  000A  524F  0053  2E25  6736  4F00
0000660020  4D46  0054  4C52  4E45  5447  0048  5352  4154
0000660040  5452  1C00  5300  4255  4553  0050  4749  4F4E
0000660060  4552  4143  4553  4500  564E  5249  4E4F  0000
0000660100  0042  00B6  0049  7A18  0001  0000  6573  6F63
0000660120  646E  6120  6772  6D75  6E65  2074  666F  7320
0000660140  6C70  7469  6920  2073  6F6E  2074  2061  6176
0000660160  6972  6261  656C  2500  3000  3000  3000  2A00
0000660200  2A2E  0066  662A  2A00  2A2E  0065  652A  0000
0000660220  3130  3332  3534  3736  3938  6261  6463  6665
0000660240  0000  0020  7354  206C  6E49  6574  7072  6572
0000660260  6574  0072  696C  656E  2520  2C64  2520  3A73
```

THU MAR 14 17:52:34 1991 TSLINT.DLL PAGE 235, LINE 13807

| | | | | | | | | |
|---|---|---|---|---|---|---|---|---|
| 0000660300 | 4920 | 746E | 7265 | 616E | 206C | 7265 | 6F72 | 0072 |
| 0000660320 | 6E69 | 0074 | 6E69 | 0074 | 5F62 | 6564 | 7562 | 0067 |
| 0000660340 | 7325 | 000A | 7270 | 6E69 | 5F74 | 6973 | 706D | 656C |
| 0000660360 | 0000 | 0001 | 0000 | 5241 | 5647 | 4100 | 4752 | 0043 |
| 0000660400 | 4F4E | 4544 | 2A20 | 4E00 | 444F | 2045 | 002A | 7974 |
| 0000660420 | 6570 | 2028 | 2029 | 202D | 6E49 | 6176 | 696C | 2064 |
| 0000660440 | 756E | 626D | 7265 | 6F20 | 2066 | 7261 | 7567 | 656D |
| 0000660460 | 746E | 0073 | 7974 | 6570 | 2028 | 2029 | 202D | 6E49 |
| 0000660500 | 6176 | 696C | 2064 | 756E | 626D | 7265 | 6F20 | 2066 |
| 0000660520 | 7261 | 7567 | 656D | 746E | 0073 | 0073 | 006D | 7374 |
| 0000660540 | 5F6C | 7974 | 6570 | 2528 | 2C73 | 2520 | 2964 | 6200 |
| 0000660560 | 645F | 6265 | 6775 | 0000 | 6F64 | 745F | 7079 | 0065 |
| 0000660600 | 4F4E | 4544 | 2A20 | 4E00 | 444F | 2045 | 002A | 746D |
| 0000660620 | 7079 | 2865 | 2920 | 2D20 | 4920 | 766E | 6C61 | 6469 |
| 0000660640 | 6E20 | 6D75 | 6562 | 2072 | 666F | 6120 | 6772 | 6D75 |
| 0000660660 | 6E65 | 7374 | 6D00 | 7974 | 6570 | 2028 | 2029 | 202D |
| 0000660700 | 6E49 | 6176 | 696C | 2064 | 756E | 626D | 7265 | 6F20 |
| 0000660720 | 2066 | 7261 | 7567 | 656D | 746E | 0073 | 0073 | 006D |
| 0000660740 | 7374 | 5F6C | 746D | 7079 | 2865 | 7325 | 202C | 6425 |
| 0000660760 | 0029 | 5F62 | 6564 | 7562 | 0067 | 6F64 | 6D5F | 7974 |
| 0000661000 | 6570 | 4E00 | 444F | 2045 | 002A | 4F4E | 4544 | 2A20 |
| 0000661020 | 6400 | 5F6F | 6F6D | 6576 | 6C5F | 636F | 7461 | 726F |
| 0000661040 | 745F | 6172 | 6B63 | 2028 | 2029 | 202D | 6E49 | 6176 |
| 0000661060 | 696C | 2064 | 756E | 626D | 7265 | 6F20 | 2066 | 7261 |
| 0000661100 | 7567 | 656D | 746E | 0073 | 6F64 | 6D5F | 766F | 5F65 |
| 0000661120 | 6F6C | 6163 | 6F74 | 5F72 | 7274 | 6361 | 286B | 2920 |
| 0000661140 | 2D20 | 4920 | 766E | 6C61 | 6469 | 6E20 | 6D75 | 6562 |
| 0000661160 | 2072 | 666F | 6120 | 6772 | 6D75 | 6E65 | 7374 | 7400 |
| 0000661200 | 6C73 | 6D5F | 766F | 5F65 | 6F6C | 6163 | 6F74 | 5F72 |
| 0000661220 | 7274 | 6361 | 286B | 6425 | 0029 | 5F62 | 6564 | 7562 |
| 0000661240 | 0067 | 6F64 | 6D5F | 766F | 5F65 | 6F6C | 6163 | 6F74 |
| 0000661260 | 5F72 | 7274 | 6361 | 006B | 4F4E | 4544 | 2A20 | 4E00 |
| 0000661300 | 444F | 2045 | 002A | 6F6D | 6576 | 6C5F | 636F | 7461 |
| 0000661320 | 726F | 615F | 7362 | 2028 | 2029 | 202D | 6E49 | 6176 |
| 0000661340 | 696C | 2064 | 756E | 626D | 7265 | 6F20 | 2066 | 7261 |
| 0000661360 | 7567 | 656D | 746E | 0073 | 6F6D | 6576 | 6C5F | 636F |
| 0000661400 | 7461 | 726F | 615F | 7362 | 2028 | 2029 | 202D | 6E49 |
| 0000661420 | 6176 | 696C | 2064 | 756E | 626D | 7265 | 6F20 | 2066 |
| 0000661440 | 7261 | 7567 | 656D | 746E | 0073 | 7374 | 5F6C | 6F6D |
| 0000661460 | 6576 | 6C5F | 636F | 7461 | 726F | 615F | 7362 | 2528 |
| 0000661500 | 2C64 | 2520 | 2C64 | 2520 | 2C64 | 2520 | 2964 | 6200 |
| 0000661520 | 645F | 6265 | 6775 | 0000 | 6F64 | 6D5F | 766F | 5F65 |
| 0000661540 | 6F6C | 6163 | 6F74 | 5F72 | 6261 | 0073 | 4F4E | 4544 |
| 0000661560 | 2A20 | 4E00 | 444F | 2045 | 002A | 6F6D | 6576 | 6C5F |
| 0000661600 | 636F | 7461 | 726F | 725F | 6C65 | 2028 | 2029 | 202D |
| 0000661620 | 6E49 | 6176 | 696C | 2064 | 756E | 626D | 7265 | 6F20 |
| 0000661640 | 2066 | 7261 | 7567 | 656D | 746E | 0073 | 6F6D | 6576 |
| 0000661660 | 6C5F | 636F | 7461 | 726F | 725F | 6C65 | 2028 | 2029 |
| 0000661700 | 202D | 6E49 | 6176 | 696C | 2064 | 756E | 626D | 7265 |
| 0000661720 | 6F20 | 2066 | 7261 | 7567 | 656D | 746E | 0073 | 7374 |
| 0000661740 | 5F6C | 6F6D | 6576 | 6C5F | 636F | 7461 | 726F | 725F |
| 0000661760 | 6C65 | 2528 | 2C64 | 2520 | 2C64 | 2520 | 2C64 | 2520 |
| 0000662000 | 2964 | 6200 | 645F | 6265 | 6775 | 0000 | 6F64 | 6D5F |
| 0000662020 | 766F | 5F65 | 6F6C | 6163 | 6F74 | 5F72 | 6572 | 006C |
| 0000662040 | 4F4E | 4544 | 2A20 | 4E00 | 444F | 2045 | 002A | 6F6D |
| 0000662060 | 6576 | 6D5F | 756F | 6573 | 615F | 7362 | 2028 | 2029 |
| 0000662100 | 202D | 6E49 | 6176 | 696C | 2064 | 756E | 626D | 7265 |
| 0000662120 | 6F20 | 2066 | 7261 | 7567 | 656D | 746E | 0073 | 6F6D |
| 0000662140 | 6576 | 6D5F | 756F | 6573 | 615F | 7362 | 2028 | 2029 |

THU MAR 14 17:52:34 1991 TSLINT.DLL PAGE 236, LINE 13866

| | | | | | | | | |
|---|---|---|---|---|---|---|---|---|
| 0000662160 | 202D | 6E49 | 6176 | 696C | 2064 | 756E | 626D | 7265 |
| 0000662200 | 6F20 | 2066 | 7261 | 7567 | 656D | 746E | 0073 | 7374 |
| 0000662220 | 5F6C | 6F6D | 6576 | 6D5F | 756F | 6573 | 615F | 7362 |
| 0000662240 | 2528 | 2C64 | 2520 | 2C64 | 2520 | 2C64 | 2520 | 2964 |
| 0000662260 | 6200 | 645F | 6265 | 6775 | 0000 | 6F64 | 6D5F | 5F76 |
| 0000662300 | 6F6D | 7375 | 5F65 | 6261 | 0073 | 4F4E | 4544 | 2A20 |
| 0000662320 | 4E00 | 444F | 2045 | 002A | 6F6D | 6576 | 6D5F | 756F |
| 0000662340 | 6573 | 725F | 6C65 | 2028 | 2029 | 202D | 6E49 | 6176 |
| 0000662360 | 696C | 2064 | 756E | 626D | 7265 | 6F20 | 2066 | 7261 |
| 0000662400 | 7567 | 656D | 746E | 0073 | 6F6D | 6576 | 6D5F | 756F |
| 0000662420 | 6573 | 725F | 6C65 | 2028 | 2029 | 202D | 6E49 | 6176 |
| 0000662440 | 696C | 2064 | 756E | 626D | 7265 | 6F20 | 2066 | 7261 |
| 0000662460 | 7567 | 656D | 746E | 0073 | 7374 | 5F6C | 6F6D | 6576 |
| 0000662500 | 6D5F | 756F | 6573 | 725F | 6C65 | 2528 | 2C64 | 2520 |
| 0000662520 | 2C64 | 2520 | 2C64 | 2520 | 2964 | 6200 | 645F | 6265 |
| 0000662540 | 6775 | 0000 | 6F64 | 6D5F | 5F76 | 6F6D | 7375 | 5F65 |
| 0000662560 | 6572 | 006C | 694D | 6D73 | 7461 | 6863 | 6920 | 206E |
| 0000662600 | 6373 | 6572 | 6E65 | 2520 | 0073 | 4F4E | 4544 | 2A20 |
| 0000662620 | 4E00 | 444F | 2045 | 002A | 6863 | 6365 | 5F6B | 6373 |
| 0000662640 | 6572 | 6E65 | 2028 | 2029 | 202D | 6E49 | 6176 | 696C |
| 0000662660 | 2064 | 756E | 626D | 7265 | 6F20 | 2066 | 7261 | 7567 |
| 0000662700 | 656D | 746E | 0073 | 6863 | 6365 | 5F6B | 6373 | 6572 |
| 0000662720 | 6E65 | 2028 | 2029 | 202D | 6E49 | 6176 | 696C | 2064 |
| 0000662740 | 756E | 626D | 7265 | 6F20 | 2066 | 7261 | 7567 | 656D |
| 0000662760 | 746E | 0073 | 7374 | 5F6C | 6863 | 6365 | 5F6B | 6373 |
| 0000663000 | 6572 | 6E65 | 2528 | 2C73 | 2520 | 2C64 | 2520 | 2964 |
| 0000663020 | 6200 | 645F | 6265 | 6775 | 0000 | 6F64 | 635F | 6568 |
| 0000663040 | 6B63 | 735F | 7263 | 6565 | 006E | 4F4E | 4544 | 2A20 |
| 0000663060 | 4E00 | 444F | 2045 | 002A | 6863 | 6365 | 5F6B | 6973 |
| 0000663100 | 2867 | 2920 | 2D20 | 4920 | 766E | 6C61 | 6469 | 6E20 |
| 0000663120 | 6D75 | 6562 | 2072 | 666F | 6120 | 6772 | 6D75 | 6E65 |
| 0000663140 | 7374 | 6300 | 6568 | 6B63 | 735F | 6769 | 2028 | 2029 |
| 0000663160 | 202D | 6E49 | 6176 | 696C | 2064 | 756E | 626D | 7265 |
| 0000663200 | 6F20 | 2066 | 7261 | 7567 | 656D | 746E | 0073 | 7374 |
| 0000663220 | 5F6C | 6863 | 6365 | 5F6B | 6973 | 2867 | 7325 | 202C |
| 0000663240 | 6425 | 202C | 6425 | 0029 | 5F62 | 6564 | 7562 | 0067 |
| 0000663260 | 6F64 | 635F | 6568 | 6B63 | 735F | 6769 | 4E00 | 444F |
| 0000663300 | 2045 | 002A | 4F4E | 4544 | 2A20 | 7300 | 7465 | 665F |
| 0000663320 | 6C69 | 6574 | 2072 | 2028 | 2029 | 202D | 6E49 | 6176 |
| 0000663340 | 696C | 2064 | 756E | 626D | 7265 | 6F20 | 2066 | 7261 |
| 0000663360 | 7567 | 656D | 746E | 0073 | 6573 | 5F74 | 6966 | 746C |
| 0000663400 | 7265 | 2820 | 2920 | 2D20 | 4920 | 766E | 6C61 | 6469 |
| 0000663420 | 6E20 | 6D75 | 6562 | 2072 | 666F | 6120 | 6772 | 6D75 |
| 0000663440 | 6E65 | 7374 | 7400 | 6C73 | 735F | 7465 | 665F | 6C69 |
| 0000663460 | 6574 | 2872 | 7325 | 0029 | 5F62 | 6564 | 7562 | 0067 |
| 0000663500 | 6F64 | 735F | 7465 | 665F | 6C69 | 6574 | 0072 | 4F4E |
| 0000663520 | 4544 | 2A20 | 4E00 | 444F | 2045 | 002A | 6572 | 6573 |
| 0000663540 | 5F74 | 6966 | 746C | 7265 | 2820 | 2920 | 2D20 | 4920 |
| 0000663560 | 766E | 6C61 | 6469 | 6E20 | 6D75 | 6562 | 2072 | 666F |
| 0000663600 | 6120 | 6772 | 6D75 | 6E65 | 7374 | 7200 | 7365 | 7465 |
| 0000663620 | 665F | 6C69 | 6574 | 2072 | 2028 | 2029 | 202D | 6E49 |
| 0000663640 | 6176 | 696C | 2064 | 756E | 626D | 7265 | 6F20 | 2066 |
| 0000663660 | 7261 | 7567 | 656D | 746E | 0073 | 7374 | 5F6C | 6572 |
| 0000663700 | 6573 | 5F74 | 6966 | 746C | 7265 | 2528 | 2973 | 6200 |
| 0000663720 | 645F | 6265 | 6775 | 0000 | 6F64 | 725F | 7365 | 7465 |
| 0000663740 | 665F | 6C69 | 6574 | 0072 | 4F4E | 4544 | 2A20 | 4E00 |
| 0000663760 | 444F | 2045 | 002A | 6573 | 5F74 | 7865 | 6563 | 7470 |
| 0000664000 | 6F69 | 206E | 2028 | 2029 | 202D | 6E49 | 6176 | 696C |
| 0000664020 | 2064 | 756E | 626D | 7265 | 6F20 | 2066 | 7261 | 7567 |

THU MAR 14 17:52:34 1991 TSLINT.DLL PAGE 237, LINE 13925

| | | | | | | | | |
|---|---|---|---|---|---|---|---|---|
| 0000664040 | 656D | 746E | 0073 | 6573 | 5F74 | 7865 | 6563 | 7470 |
| 0000664060 | 6F69 | 206E | 2028 | 2029 | 202D | 6E49 | 6176 | 696C |
| 0000664100 | 2064 | 756E | 626D | 7265 | 6F20 | 2066 | 7261 | 7567 |
| 0000664120 | 656D | 746E | 0073 | 7374 | 5F6C | 6573 | 5F74 | 7865 |
| 0000664140 | 6563 | 7470 | 6F69 | 286E | 7325 | 2520 | 2973 | 6200 |
| 0000664160 | 645F | 6265 | 6775 | 0000 | 6F64 | 735F | 7465 | 655F |
| 0000664200 | 6378 | 7065 | 6974 | 6E6F | 4E00 | 444F | 2045 | 002A |
| 0000664220 | 4F4E | 4544 | 2A20 | 7200 | 7365 | 7465 | 655F | 6378 |
| 0000664240 | 7065 | 6974 | 6E6F | 2820 | 2920 | 2D20 | 4920 | 766E |
| 0000664260 | 6C61 | 6469 | 6E20 | 6D75 | 6562 | 2072 | 666F | 6120 |
| 0000664300 | 6772 | 6D75 | 6E65 | 7374 | 7200 | 7365 | 7465 | 655F |
| 0000664320 | 6378 | 7065 | 6974 | 6E6F | 2820 | 2920 | 2D20 | 4920 |
| 0000664340 | 766E | 6C61 | 6469 | 6E20 | 6D75 | 6562 | 2072 | 666F |
| 0000664360 | 6120 | 6772 | 6D75 | 6E65 | 7374 | 7400 | 6C73 | 725F |
| 0000664400 | 7365 | 7465 | 655F | 6378 | 7065 | 6974 | 6E6F | 2528 |
| 0000664420 | 2973 | 6200 | 645F | 6265 | 6775 | 0000 | 6F64 | 725F |
| 0000664440 | 7365 | 7465 | 655F | 6378 | 7065 | 6974 | 6E6F | 4E00 |
| 0000664460 | 444F | 2045 | 002A | 4F4E | 4544 | 2A20 | 7400 | 6365 |
| 0000664500 | 2068 | 2028 | 2029 | 202D | 6E49 | 6176 | 696C | 2064 |
| 0000664520 | 756E | 626D | 7265 | 6F20 | 2066 | 7261 | 7567 | 656D |
| 0000664540 | 746E | 0073 | 6574 | 6863 | 2820 | 2920 | 2D20 | 4920 |
| 0000664560 | 766E | 6C61 | 6469 | 6E20 | 6D75 | 6562 | 2072 | 666F |
| 0000664600 | 6120 | 6772 | 6D75 | 6E65 | 7374 | 7400 | 6365 | 2068 |
| 0000664620 | 2528 | 2964 | 6200 | 645F | 6265 | 6775 | 0000 | 7374 |
| 0000664640 | 5F6C | 6574 | 6863 | 4E00 | 444F | 2045 | 002A | 4F4E |
| 0000664660 | 4544 | 2A20 | 5000 | 7561 | 6573 | 5000 | 7561 | 6573 |
| 0000664700 | 2820 | 7325 | 0029 | 5F62 | 6564 | 7562 | 0067 | 7374 |
| 0000664720 | 5F6C | 6170 | 7375 | 0065 | 4F4E | 4544 | 2A20 | 4E00 |
| 0000664740 | 444F | 2045 | 002A | 6177 | 7469 | 2820 | 2920 | 2D20 |
| 0000664760 | 4920 | 766E | 6C61 | 6469 | 6E20 | 6D75 | 6562 | 2072 |
| 0000665000 | 666F | 6120 | 6772 | 6D75 | 6E65 | 7374 | 7700 | 6961 |
| 0000665020 | 2074 | 2028 | 2029 | 202D | 6E49 | 6176 | 696C | 2064 |
| 0000665040 | 756E | 626D | 7265 | 6F20 | 2066 | 7261 | 7567 | 656D |
| 0000665060 | 746E | 0073 | 6157 | 7469 | 2820 | 6C25 | 2975 | 6200 |
| 0000665100 | 645F | 6265 | 6775 | 0000 | 7374 | 5F6C | 6177 | 7469 |
| 0000665120 | 4E00 | 444F | 2045 | 002A | 4F4E | 4544 | 2A20 | 4200 |
| 0000665140 | 7069 | 4420 | 6265 | 6775 | 6567 | 2072 | 7262 | 6165 |
| 0000665160 | 706B | 696F | 746E | 0000 | 6F64 | 625F | 7069 | 7062 |
| 0000665200 | 4E00 | 444F | 2045 | 002A | 4F4E | 4544 | 2A20 | 7400 |
| 0000665220 | 6C73 | 655F | 7272 | 726F | 7220 | 7465 | 7275 | 656E |
| 0000665240 | 2064 | 0021 | 5F62 | 7562 | 0067 | 7374 | 5F6C | 7572 |
| 0000665260 | 746E | 6D69 | 5F65 | 7265 | 6F72 | 0072 | 7761 | 346B |
| 0000665300 | 632E | 7400 | 6C73 | 702E | 4E00 | 444F | 2045 | 002A |
| 0000665320 | 4F4E | 4544 | 2A20 | 5500 | 646E | 6665 | 6E69 | 6465 |
| 0000665340 | 6620 | 6E75 | 7463 | 6F69 | 206E | 6163 | 6C6C | 6465 |
| 0000665360 | 203A | 7325 | 6600 | 6E75 | 7463 | 6F69 | 206E | 7325 |
| 0000665400 | 6320 | 6C61 | 656C | 0A64 | 6200 | 695F | 746E | 7265 |
| 0000665420 | 0070 | 6F63 | 6E75 | 0074 | 6C41 | 6F6C | 6163 | 6974 |
| 0000665440 | 676E | 6C20 | 636F | 6C61 | 735F | 6174 | 6B63 | 6200 |
| 0000665460 | 695F | 746E | 7265 | 0070 | 6F4E | 6D20 | 726F | 2065 |
| 0000665500 | 656D | 6F6D | 7972 | 6D00 | 2520 | 2070 | 7525 | 5B20 |
| 0000665520 | 6C25 | 5D75 | 6200 | 6D5F | 6D65 | 6572 | 0070 | 7566 |
| 0000665540 | 636E | 6974 | 6E6F | 2520 | 3A73 | 7420 | 6F6F | 6D20 |
| 0000665560 | 6E61 | 2079 | 7261 | 7567 | 656D | 746E | 0073 | 2066 |
| 0000665600 | 7025 | 2520 | 2075 | 255B | 756C | 005D | 5F62 | 656D |
| 0000665620 | 726D | 7065 | 0000 | 0B2C | 0C0C | DB33 | 7A4E | 7566 |
| 0000665640 | 636E | 635F | 6C61 | 006C | 7354 | 206C | 6E49 | 6574 |
| 0000665660 | 7072 | 6572 | 6574 | 0072 | 696C | 656E | 2520 | 2C64 |
| 0000665700 | 2520 | 3A73 | 4920 | 746E | 7265 | 616E | 206C | 7265 |

THU MAR 14 17:52:34 1991 TSLINT.DLL PAGE 238, LINE 13984

| | | | | | | | | |
|---|---|---|---|---|---|---|---|---|
| 0000665720 | 6F72 | 0072 | 4F4E | 4544 | 2A20 | 4E00 | 444F | 2045 |
| 0000665740 | 002A | 7354 | 206C | 6E49 | 6574 | 7072 | 6572 | 6574 |
| 0000665760 | 0072 | 696C | 656E | 2520 | 2C64 | 2520 | 3A73 | 4920 |
| 0000666000 | 746E | 7265 | 616E | 206C | 7265 | 6F72 | 0072 | 6F4E |
| 0000666020 | 6D20 | 726F | 2065 | 656D | 6F6D | 7972 | 6D00 | 2520 |
| 0000666040 | 2070 | 7525 | 5B20 | 6C25 | 5D75 | 6200 | 6D5F | 6D65 |
| 0000666060 | 6572 | 0070 | 2066 | 7025 | 2520 | 2075 | 255B | 756C |
| 0000666100 | 005D | 5F62 | 656D | 726D | 7065 | 000D | 6F64 | 735F |
| 0000666120 | 6275 | 0000 | 7761 | 366B | 632E | 7400 | 6C73 | 702E |
| 0000666140 | 4900 | 6C6C | 6765 | 6C61 | 4E20 | 646F | 0065 | 6954 |
| 0000666160 | 656D | 0073 | 6944 | 6976 | 6564 | 4D00 | 646F | 5000 |
| 0000666200 | 756C | 0073 | 694D | 756E | 0073 | 6F43 | 646E | 702D |
| 0000666220 | 6961 | 0072 | 7553 | 7362 | 7263 | 7069 | 0074 | 6F43 |
| 0000666240 | 636E | 7461 | 2B00 | 502B | 6572 | 2D00 | 502D | 6572 |
| 0000666260 | 5000 | 736F | 2B74 | 002B | 6F50 | 7473 | 2D2D | 5500 |
| 0000666300 | 696D | 756E | 0073 | 6946 | 6C65 | 0064 | 7341 | 6973 |
| 0000666320 | 6E67 | 2A00 | 003D | 3D2F | 2500 | 003D | 3D2B | 2D00 |
| 0000666340 | 003D | 6E41 | 0064 | 724F | 4500 | 7571 | 6C61 | 2100 |
| 0000666360 | 003D | 654C | 7373 | 4700 | 6572 | 7461 | 7265 | 3C00 |
| 0000666400 | 003D | 3D3E | 4E00 | 746F | 4D00 | 7461 | 6863 | 4E00 |
| 0000666420 | 6D6F | 7461 | 6863 | 5300 | 7274 | 6E69 | 0067 | 6D54 |
| 0000666440 | 5370 | 7274 | 6E69 | 0067 | 754E | 626D | 7265 | 5200 |
| 0000666460 | 6C75 | 5F65 | 696C | 7473 | 5200 | 6C75 | 5F65 | 6F6E |
| 0000666500 | 6564 | 5300 | 6174 | 6574 | 6C5F | 7369 | 0074 | 6649 |
| 0000666520 | 625F | 6172 | 636E | 6568 | 0073 | 7845 | 5F70 | 696C |
| 0000666540 | 7473 | 5000 | 7261 | 6D61 | 6C5F | 7369 | 0074 | 4542 |
| 0000666560 | 4947 | 004E | 4E45 | 0044 | 4649 | 5700 | 4948 | 454C |
| 0000666600 | 4600 | 524F | 6100 | 7272 | 7961 | 6F66 | 0072 | 5242 |
| 0000666620 | 4145 | 004B | 4F43 | 544E | 4E49 | 4555 | 5000 | 4952 |
| 0000666640 | 544E | 5000 | 4952 | 544E | 0046 | 656E | 7478 | 6500 |
| 0000666660 | 6978 | 0074 | 4F44 | 5200 | 5445 | 5255 | 004E | 4544 |
| 0000666700 | 454C | 4554 | 7200 | 6465 | 7269 | 6365 | 0074 | 7041 |
| 0000666720 | 6570 | 646E | 7000 | 7069 | 0065 | 6950 | 6570 | 6920 |
| 0000666740 | 006E | 6572 | 6964 | 6572 | 7463 | 6920 | 706E | 7475 |
| 0000666760 | 7600 | 7261 | 6169 | 6C62 | 0065 | 6156 | 7272 | 7961 |
| 0000667000 | 6200 | 6975 | 746C | 6E69 | 4C00 | 6E69 | 2D65 | 6172 |
| 0000667020 | 676E | 0065 | 6E49 | 415F | 7272 | 7961 | 4600 | 4E55 |
| 0000667040 | 5443 | 4F49 | 004E | 7566 | 636E | 6974 | 6E6F | 6420 |
| 0000667060 | 6665 | 6600 | 6E75 | 7463 | 6F69 | 206E | 6163 | 6C6C |
| 0000667100 | 6C00 | 636F | 6C61 | 7620 | 7261 | 6169 | 6C62 | 0065 |
| 0000667120 | 6567 | 6C74 | 6E69 | 0065 | 7573 | 0062 | 7367 | 6275 |
| 0000667140 | 6D00 | 7461 | 6863 | 3F00 | 003A | 005E | 3D5E | 2F00 |
| 0000667160 | 6572 | 6567 | 7078 | 002F | 7453 | 5F72 | 756E | 006D |
| 0000667200 | 7E7E | 2100 | 7E7E | 6900 | 746E | 6900 | 746E | 0000 |
| 0000667220 | 0CC4 | 0F06 | 0CCB | 0F0E | 0000 | 0000 | 0CD1 | 0F12 |
| 0000667240 | 0CDE | 0F16 | 0CE4 | 0F1A | 0CEB | 0F1E | 0CEF | 0F22 |
| 0000667260 | 0CF4 | 0F26 | 0CFA | 0F2A | 0D04 | 0F2E | 0D0E | 0F32 |
| 0000667300 | 0D15 | 0F36 | 0D1B | 0F3A | 0D21 | 0F3E | 0D28 | 0F42 |
| 0000667320 | 0D2F | 0F46 | 0D36 | 0F4A | 0D3C | 0F4E | 0D43 | 0F52 |
| 0000667340 | 0D46 | 0F56 | 0D49 | 0F5A | 0D4C | 0F5E | 0D4F | 0F62 |
| 0000667360 | 0D52 | 0F66 | 0D56 | 0F6A | 0D59 | 0F6E | 0D5F | 0F72 |
| 0000667400 | 0D62 | 0F76 | 0D67 | 0F7A | 0D6F | 0F7E | 0D72 | 0F82 |
| 0000667420 | 0D75 | 0F86 | 0D79 | 0F8A | 0D7F | 0F8E | 0D87 | 0F92 |
| 0000667440 | 0D8E | 0F96 | 0D98 | 0F9A | 0D9F | 0F9E | 0DA9 | 0FA2 |
| 0000667460 | 0DB3 | 0FA6 | 0DBE | 0FAA | 0DCA | 0FAE | 0DD3 | 0FB2 |
| 0000667500 | 0DDE | 0FB6 | 0DE4 | 0FBA | 0DE8 | 0FBE | 0DEB | 0FC2 |
| 0000667520 | 0DF1 | 0FC6 | 0DF5 | 0FCA | 0DFE | 0FCE | 0E04 | 0FD2 |
| 0000667540 | 0E0D | 0FD6 | 0E13 | 0FDA | 0E1A | 0FDE | 0E1F | 0FE2 |
| 0000667560 | 0E24 | 0FE6 | 0E27 | 0FEA | 0E2E | 0FEE | 0E35 | 0FF2 |

THU MAR 14 17:52:34 1991 TSLINT.DLL PAGE 239, LINE 14043

| | | | | | | | | |
|---|---|---|---|---|---|---|---|---|
| 0000667600 | 0E3E | 0FF6 | 0E45 | 0FFA | 0E4A | 0FFE | 0E52 | 1002 |
| 0000667620 | 0E61 | 1006 | 0E6A | 100A | 0E71 | 100E | 0E79 | 1012 |
| 0000667640 | 0E84 | 1016 | 0E8D | 101A | 0E96 | 101E | 0EA3 | 1022 |
| 0000667660 | 0EB1 | 1026 | 0EC0 | 102A | 0EC8 | 102E | 0ECC | 1032 |
| 0000667700 | 0ED1 | 1036 | 0ED7 | 103A | 0EDA | 103E | 0EDC | 1042 |
| 0000667720 | 0EDF | 1046 | 0EE8 | 104A | 0EF0 | 104E | 0EF3 | 7A58 |
| 0000667740 | 7470 | 6572 | 0065 | 6E69 | 0074 | 6E69 | 0074 | 554E |
| 0000667760 | 4C4C | 000A | 5F62 | 7274 | 6565 | 2800 | 7830 | 7825 |
| 0000670000 | 5420 | 7079 | 2065 | 6425 | 0A5D | 6200 | 745F | 6572 |
| 0000670020 | 0065 | 2800 | 6425 | 2529 | 732A | 6200 | 745F | 6572 |
| 0000670040 | 0065 | 2528 | 2070 | 6156 | 756C | 2065 | 6200 | 745F |
| 0000670060 | 6572 | 0065 | 7473 | 3A72 | 2220 | 2E25 | 732A | 2022 |
| 0000670100 | 6200 | 745F | 6572 | 0065 | 756E | 3A6D | 2520 | 0067 |
| 0000670120 | 5F62 | 7274 | 6565 | 2900 | 000A | 5F62 | 7274 | 6565 |
| 0000670140 | 2800 | 7025 | 4120 | 7272 | 7961 | 0A29 | 6200 | 745F |
| 0000670160 | 6572 | 0065 | 6909 | 646E | 7865 | 203A | 6200 | 745F |
| 0000670200 | 6572 | 0065 | 7609 | 6C61 | 6575 | 203A | 6200 | 745F |
| 0000670220 | 6572 | 0065 | 000A | 5F62 | 7274 | 6565 | 2800 | 7025 |
| 0000670240 | 4C20 | 636F | 6C61 | 7620 | 7261 | 6169 | 6C62 | 2065 |
| 0000670260 | 7325 | 0A29 | 6200 | 745F | 6572 | 0065 | 7025 | 3D20 |
| 0000670300 | 6C20 | 6665 | 3C74 | 2D2D | 6200 | 745F | 6572 | 0065 |
| 0000670320 | 2528 | 2070 | 7325 | 252E | 2964 | 6200 | 745F | 6572 |
| 0000670340 | 0065 | 2D2D | 723E | 6769 | 7468 | 3D20 | 2520 | 0070 |
| 0000670360 | 5F62 | 7274 | 6565 | 0A00 | 6200 | 745F | 6572 | 0065 |
| 0000670400 | 7542 | 6C69 | 6974 | 3A6E | 2520 | 0A64 | 6200 | 745F |
| 0000670420 | 6572 | 0065 | 2528 | 3A73 | 0A29 | 6200 | 745F | 6572 |
| 0000670440 | 0065 | 6F6C | 706F | 6E69 | 3A67 | 000A | 5F62 | 7274 |
| 0000670460 | 6565 | 6400 | 696F | 676E | 0A3A | 6200 | 745F | 6572 |
| 0000670500 | 0065 | 7270 | 6E69 | 5F74 | 6170 | 7372 | 5F65 | 7274 |
| 0000670520 | 6565 | 6900 | 746E | 6900 | 746E | 5600 | 7261 | 3A73 |
| 0000670540 | 000A | 5F62 | 6564 | 7562 | 0067 | 760A | 7261 | 6169 |
| 0000670560 | 6C62 | 7365 | 255B | 5D64 | 0A3A | 000A | 5F62 | 6564 |
| 0000670600 | 7562 | 0067 | 7562 | 6B63 | 7465 | 255B | 5D64 | 3D20 |
| 0000670620 | 2520 | 2873 | 6425 | 0A29 | 000A | 5F62 | 6564 | 7562 |
| 0000670640 | 0067 | 6E45 | 0A64 | 6200 | 645F | 6265 | 6775 | 0000 |
| 0000670660 | 7564 | 706D | 765F | 7261 | 0073 | 7325 | 303A | 2578 |
| 0000670700 | 0A78 | 6900 | 746E | 6900 | 746E | 2500 | 0067 | 5F62 |
| 0000670720 | 7274 | 6565 | 2200 | 2E25 | 732A | 0022 | 5F62 | 7274 |
| 0000670740 | 6565 | 2A00 | 2F00 | 2500 | 2B00 | 2D00 | 5E00 | 2000 |
| 0000670760 | 3D00 | 2A00 | 003D | 3D2F | 2500 | 003D | 3D2B | 2D00 |
| 0000671000 | 003D | 3D5E | 2600 | 0026 | 7C7C | 3D00 | 003D | 3D21 |
| 0000671020 | 3C00 | 3E00 | 3C00 | 003D | 3D3E | 2500 | 0073 | 5F62 |
| 0000671040 | 7274 | 6565 | 2100 | 0000 | 2824 | 2900 | 0000 | 2B2B |
| 0000671060 | 0000 | 2D2D | 2B00 | 002B | 2D00 | 002D | 6200 | 745F |
| 0000671100 | 6572 | 0065 | 5F62 | 7274 | 6565 | 2C00 | 6200 | 745F |
| 0000671120 | 6572 | 0065 | 2E25 | 732A | 6200 | 745F | 6572 | 0065 |
| 0000671140 | 005B | 5F62 | 7274 | 6565 | 5D00 | 6200 | 745F | 6572 |
| 0000671160 | 0065 | 6F73 | 656D | 625F | 6975 | 746C | 6E69 | 0028 |
| 0000671200 | 5F62 | 7274 | 6565 | 2900 | 6200 | 745F | 6572 | 0065 |
| 0000671220 | 0A7B | 6200 | 745F | 6572 | 0065 | 2020 | 6200 | 745F |
| 0000671240 | 6572 | 0065 | 2020 | 6200 | 745F | 6572 | 0065 | 2020 |
| 0000671260 | 6200 | 745F | 6572 | 0065 | 0A7D | 6200 | 745F | 6572 |
| 0000671300 | 0065 | 2020 | 6200 | 745F | 6572 | 0065 | 6669 | 0028 |
| 0000671320 | 5F62 | 7274 | 6565 | 2900 | 0020 | 5F62 | 7274 | 6565 |
| 0000671340 | 7B00 | 000A | 5F62 | 7274 | 6565 | 2000 | 0020 | 5F62 |
| 0000671360 | 7274 | 6565 | 2000 | 0020 | 5F62 | 7274 | 6565 | 7D00 |
| 0000671400 | 6520 | 736C | 2065 | 6200 | 745F | 6572 | 0065 | 0A7D |
| 0000671420 | 6200 | 745F | 6572 | 0065 | 2020 | 6200 | 745F | 6572 |
| 0000671440 | 0065 | 6C65 | 6573 | 0020 | 5F62 | 7274 | 6565 | 7700 |

THU MAR 14 17:52:34 1991 TSLINT.DLL PAGE 240, LINE 14102

| | | | | | | | | |
|---|---|---|---|---|---|---|---|---|
| 0000671460 | 6968 | 656C | 0028 | 5F62 | 7274 | 6565 | 2900 | 0020 |
| 0000671500 | 5F62 | 7274 | 6565 | 6400 | 206F | 6200 | 745F | 6572 |
| 0000671520 | 0065 | 6877 | 6C69 | 2865 | 6200 | 745F | 6572 | 0065 |
| 0000671540 | 2029 | 6200 | 745F | 6572 | 0065 | 6F66 | 2872 | 6200 |
| 0000671560 | 745F | 6572 | 0065 | 003B | 5F62 | 7274 | 6565 | 3B00 |
| 0000671600 | 6200 | 745F | 6572 | 0065 | 2029 | 6200 | 745F | 6572 |
| 0000671620 | 0065 | 6F66 | 2872 | 6200 | 745F | 6572 | 0065 | 6920 |
| 0000671640 | 206E | 6200 | 745F | 6572 | 0065 | 2029 | 6200 | 745F |
| 0000671660 | 6572 | 0065 | 7270 | 6E69 | 6674 | 0028 | 5F62 | 7274 |
| 0000671700 | 6565 | 2900 | 6200 | 745F | 6572 | 0065 | 7270 | 6E69 |
| 0000671720 | 2874 | 6200 | 745F | 6572 | 0065 | 0029 | 5F62 | 7274 |
| 0000671740 | 6565 | 6E00 | 7865 | 0074 | 5F62 | 7274 | 6565 | 6200 |
| 0000671760 | 6572 | 6B61 | 6200 | 745F | 6572 | 0065 | 6564 | 656C |
| 0000672000 | 6574 | 0020 | 5F62 | 7274 | 6565 | 6600 | 6E75 | 7463 |
| 0000672020 | 6F69 | 206E | 7325 | 2820 | 6200 | 745F | 6572 | 0065 |
| 0000672040 | 0A29 | 6200 | 745F | 6572 | 0065 | 7325 | 6200 | 745F |
| 0000672060 | 6572 | 0065 | 202C | 6200 | 745F | 6572 | 0065 | 0000 |
| 0000672100 | 7270 | 6E69 | 5F74 | 5F61 | 6F6E | 6564 | 6900 | 746E |
| 0000672120 | 6900 | 746E | 3B00 | 000A | 5F62 | 7274 | 6565 | 0000 |
| 0000672140 | 7270 | 6E69 | 5F74 | 616D | 6279 | 5F65 | 6573 | 696D |
| 0000672160 | 6900 | 746E | 6900 | 746E | 7B00 | 000A | 5F62 | 7274 |
| 0000672200 | 6565 | 2000 | 0020 | 5F62 | 7274 | 6565 | 2000 | 0020 |
| 0000672220 | 5F62 | 7274 | 6565 | 7D00 | 000A | 5F62 | 7274 | 6565 |
| 0000672240 | 0000 | 6564 | 6C61 | 775F | 7469 | 5F68 | 7563 | 6C72 |
| 0000672260 | 0073 | 7761 | 376B | 632E | 7400 | 6C73 | 702E | 2000 |
| 0000672300 | 6900 | 746E | 6900 | 746E | 4E00 | 206F | 6F6D | 6572 |
| 0000672320 | 6D20 | 6D65 | 726F | 0079 | 206D | 7025 | 2520 | 2075 |
| 0000672340 | 255B | 756C | 005D | 5F62 | 656D | 726D | 7065 | 0000 |
| 0000672360 | 1522 | 1566 | 1529 | 7AA0 | 0001 | 0000 | 0000 | 0000 |
| 0000672400 | 0000 | 0000 | 0000 | 0000 | 0000 | 152F | 1562 | 6E69 |
| 0000672420 | 7469 | 665F | 6569 | 646C | 0073 | 6E69 | 0074 | 6E69 |
| 0000672440 | 0074 | 6F4E | 6D20 | 726F | 2065 | 656D | 6F6D | 7972 |
| 0000672460 | 7200 | 2520 | 2870 | 7525 | 2029 | 3E2D | 2520 | 2870 |
| 0000672500 | 7525 | 2029 | 255B | 756C | 005D | 5F62 | 656D | 726D |
| 0000672520 | 7065 | 0000 | 6573 | 5F74 | 6966 | 6C65 | 7364 | 0000 |
| 0000672540 | 0000 | 6E69 | 0074 | 6E69 | 0074 | 6F4E | 6D20 | 726F |
| 0000672560 | 2065 | 656D | 6F6D | 7972 | 6D00 | 2520 | 2070 | 7525 |
| 0000672600 | 5B20 | 6C25 | 5D75 | 6200 | 6D5F | 6D65 | 6572 | 0070 |
| 0000672620 | 0000 | 6572 | 7562 | 6C69 | 5F64 | 6572 | 6F63 | 6472 |
| 0000672640 | 6900 | 746E | 6900 | 746E | 4E00 | 206F | 6F6D | 6572 |
| 0000672660 | 6D20 | 6D65 | 726F | 0079 | 2072 | 7025 | 2528 | 2975 |
| 0000672700 | 2D20 | 203E | 7025 | 2528 | 2975 | 5B20 | 6C25 | 5D75 |
| 0000672720 | 6200 | 6D5F | 6D65 | 6572 | 0070 | 6572 | 6F63 | 6472 |
| 0000672740 | 6E20 | 746F | 7420 | 7265 | 696D | 616E | 6574 | 0064 |
| 0000672760 | 6F4E | 6D20 | 726F | 2065 | 656D | 6F6D | 7972 | 7200 |
| 0000673000 | 2520 | 2870 | 7525 | 2029 | 3E2D | 2520 | 2870 | 7525 |
| 0000673020 | 2029 | 255B | 756C | 005D | 5F62 | 656D | 726D | 7065 |
| 0000673040 | 7200 | 6365 | 726F | 2064 | 6F6E | 2074 | 6574 | 6D72 |
| 0000673060 | 6E69 | 7461 | 6465 | 4E00 | 206F | 6F6D | 6572 | 6D20 |
| 0000673100 | 6D65 | 726F | 0079 | 2072 | 7025 | 2528 | 2975 | 2D20 |
| 0000673120 | 203E | 7025 | 2528 | 2975 | 5B20 | 6C25 | 5D75 | 6200 |
| 0000673140 | 6D5F | 6D65 | 6572 | 0070 | 6567 | 5F74 | 5F61 | 6572 |
| 0000673160 | 6F63 | 6472 | 6900 | 746E | 6900 | 746E | 6600 | 2520 |
| 0000673200 | 2070 | 7525 | 5B20 | 6C25 | 5D75 | 6200 | 6D5F | 6D65 |
| 0000673220 | 6572 | 0070 | 2066 | 7025 | 2520 | 2075 | 255B | 756C |
| 0000673240 | 005D | 5F62 | 656D | 726D | 7065 | 6600 | 2520 | 2070 |
| 0000673260 | 7525 | 5B20 | 6C25 | 5D75 | 6200 | 6D5F | 6D65 | 6572 |
| 0000673300 | 0070 | 2066 | 7025 | 2520 | 2075 | 255B | 756C | 005D |
| 0000673320 | 5F62 | 656D | 726D | 7065 | 4E00 | 206F | 6F6D | 6572 |

THU MAR 14 17:52:34 1991 TSLINT.DLL PAGE 241, LINE 14161

| | | | | | | | | |
|---|---|---|---|---|---|---|---|---|
| 0000673340 | 6D20 | 6D65 | 726F | 0079 | 206D | 7025 | 2520 | 2075 |
| 0000673360 | 255B | 756C | 005D | 5F62 | 656D | 726D | 7065 | 4E00 |
| 0000673400 | 206F | 6F6D | 6572 | 6D20 | 6D65 | 726F | 0079 | 206D |
| 0000673420 | 7025 | 2520 | 2075 | 255B | 756C | 005D | 5F62 | 656D |
| 0000673440 | 726D | 7065 | 4E00 | 206F | 6F6D | 6572 | 6D20 | 6D65 |
| 0000673460 | 726F | 0079 | 206D | 7025 | 2520 | 2075 | 255B | 756C |
| 0000673500 | 005D | 5F62 | 656D | 726D | 7065 | 4E00 | 206F | 6F6D |
| 0000673520 | 6572 | 6D20 | 6D65 | 726F | 0079 | 206D | 7025 | 2520 |
| 0000673540 | 2075 | 255B | 756C | 005D | 5F62 | 656D | 726D | 7065 |
| 0000673560 | 6900 | 6C6C | 6765 | 6C61 | 7220 | 6765 | 6C75 | 7261 |
| 0000673600 | 6520 | 7078 | 6572 | 7373 | 6F69 | 206E | 6F66 | 2072 |
| 0000673620 | 5346 | 203A | 2560 | 2773 | 0000 | 6572 | 735F | 6C70 |
| 0000673640 | 7469 | 0000 | 0000 | 0000 | 4F4E | 4544 | 2A20 | 4E00 |
| 0000673660 | 444F | 2045 | 002A | 2066 | 7025 | 2520 | 2075 | 255B |
| 0000673700 | 756C | 005D | 5F62 | 656D | 726D | 7065 | 0000 | 6F64 |
| 0000673720 | 675F | 7465 | 696C | 656E | 5400 | 6C73 | 4920 | 746E |
| 0000673740 | 7265 | 7270 | 7465 | 7265 | 6C00 | 6E69 | 2065 | 6425 |
| 0000673760 | 202C | 7325 | 203A | 6E49 | 6574 | 6E72 | 6C61 | 6520 |
| 0000674000 | 7272 | 726F | 5400 | 6C73 | 4920 | 746E | 7265 | 7270 |
| 0000674020 | 7465 | 7265 | 6C00 | 6E69 | 2065 | 6425 | 202C | 7325 |
| 0000674040 | 203A | 6E49 | 6574 | 6E72 | 6C61 | 6520 | 7272 | 726F |
| 0000674060 | 5400 | 6C73 | 4920 | 746E | 7265 | 7270 | 7465 | 7265 |
| 0000674100 | 6C00 | 6E69 | 2065 | 6425 | 202C | 7325 | 203A | 6E49 |
| 0000674120 | 6574 | 6E72 | 6C61 | 6520 | 7272 | 726F | 5400 | 6C73 |
| 0000674140 | 4920 | 746E | 7265 | 7270 | 7465 | 7265 | 6C00 | 6E69 |
| 0000674160 | 2065 | 6425 | 202C | 7325 | 203A | 6E49 | 6574 | 6E72 |
| 0000674200 | 6C61 | 6520 | 7272 | 726F | 5400 | 6C73 | 4920 | 746E |
| 0000674220 | 7265 | 7270 | 7465 | 7265 | 6C00 | 6E69 | 2065 | 6425 |
| 0000674240 | 202C | 7325 | 203A | 6E49 | 6574 | 6E72 | 6C61 | 6520 |
| 0000674260 | 7272 | 726F | 6100 | 7474 | 6D65 | 7470 | 7420 | 206F |
| 0000674300 | 6361 | 6563 | 7373 | 6620 | 6569 | 646C | 2520 | 0064 |
| 0000674320 | 7354 | 206C | 6E49 | 6574 | 7072 | 6572 | 6574 | 0072 |
| 0000674340 | 696C | 656E | 2520 | 2C64 | 2520 | 3A73 | 4920 | 746E |
| 0000674360 | 7265 | 616E | 206C | 7265 | 6F72 | 0072 | 7354 | 206C |
| 0000674400 | 6E49 | 6574 | 7072 | 6572 | 6574 | 0072 | 696C | 656E |
| 0000674420 | 2520 | 2C64 | 2520 | 3A73 | 4920 | 746E | 7265 | 616E |
| 0000674440 | 206C | 7265 | 6F72 | 0072 | 2560 | 2773 | 6920 | 2073 |
| 0000674460 | 2061 | 7566 | 636E | 6974 | 6E6F | 202C | 7361 | 6973 |
| 0000674500 | 6E67 | 656D | 746E | 6920 | 2073 | 6F6E | 2074 | 6C61 |
| 0000674520 | 6F6C | 6577 | 0064 | 6E69 | 0074 | 6E69 | 0074 | 7354 |
| 0000674540 | 206C | 6E49 | 6574 | 7072 | 6572 | 6574 | 0072 | 696C |
| 0000674560 | 656E | 2520 | 2C64 | 2520 | 3A73 | 4920 | 746E | 7265 |
| 0000674600 | 616E | 206C | 7265 | 6F72 | 0072 | 7354 | 206C | 6E49 |
| 0000674620 | 6574 | 7072 | 6572 | 6574 | 0072 | 696C | 656E | 2520 |
| 0000674640 | 2C64 | 2520 | 3A73 | 4920 | 746E | 7265 | 616E | 206C |
| 0000674660 | 7265 | 6F72 | 0072 | 2066 | 7025 | 2520 | 2075 | 255B |
| 0000674700 | 756C | 005D | 5F62 | 656D | 726D | 7065 | 0000 | 6F64 |
| 0000674720 | 645F | 7265 | 6665 | 2D00 | 2D00 | 6300 | 6E61 | 6F6E |
| 0000674740 | 2074 | 706F | 6E65 | 6620 | 6C69 | 2065 | 2560 | 2773 |
| 0000674760 | 6620 | 726F | 7220 | 6165 | 6964 | 676E | 2820 | 7325 |
| 0000675000 | 0029 | 0001 | 0000 | 0000 | 0000 | 4F49 | 5542 | 2046 |
| 0000675020 | 002A | 4F49 | 5542 | 2046 | 002A | 6F4E | 6D20 | 726F |
| 0000675040 | 2065 | 656D | 6F6D | 7972 | 6D00 | 2520 | 2070 | 7525 |
| 0000675060 | 5B20 | 6C25 | 5D75 | 6200 | 6D5F | 6D65 | 6572 | 0070 |
| 0000675100 | 6163 | 276E | 2074 | 7473 | 7461 | 6620 | 2064 | 6425 |
| 0000675120 | 4E00 | 206F | 6F6D | 6572 | 6D20 | 6D65 | 726F | 0079 |
| 0000675140 | 206D | 7025 | 2520 | 2075 | 255B | 756C | 005D | 5F62 |
| 0000675160 | 656D | 726D | 7065 | 4E00 | 206F | 6F6D | 6572 | 6D20 |
| 0000675200 | 6D65 | 726F | 0079 | 206D | 7025 | 2520 | 2075 | 255B |

THU MAR 14 17:52:34 1991 TSLINT.DLL PAGE 242, LINE 14220

| | | | | | | | | |
|---|---|---|---|---|---|---|---|---|
| 0000675220 | 756C | 005D | 5F62 | 656D | 726D | 7065 | 0000 | 6F69 |
| 0000675240 | 5F70 | 6C61 | 6F6C | 0063 | 6E69 | 0074 | 6E69 | 0074 |
| 0000675260 | 6C63 | 736F | 2065 | 666F | 6620 | 2064 | 6425 | 6620 |
| 0000675300 | 6961 | 656C | 0064 | 2066 | 7025 | 2520 | 2075 | 255B |
| 0000675320 | 756C | 005D | 5F62 | 656D | 726D | 7065 | 6600 | 2520 |
| 0000675340 | 2070 | 7525 | 5B20 | 6C25 | 5D75 | 6200 | 6D5F | 6D65 |
| 0000675360 | 6572 | 0070 | 2066 | 7025 | 2520 | 2075 | 255B | 756C |
| 0000675400 | 005D | 5F62 | 656D | 726D | 7065 | 0000 | 6F69 | 5F70 |
| 0000675420 | 6C63 | 736F | 0065 | 7473 | 7572 | 7463 | 7220 | 6465 |
| 0000675440 | 7269 | 6365 | 2074 | 002A | 7473 | 7572 | 7463 | 7220 |
| 0000675460 | 6465 | 7269 | 6365 | 2074 | 002A | 6F74 | 2500 | 3A73 |
| 0000675500 | 5020 | 7069 | 7365 | 6E20 | 746F | 7320 | 7075 | 7270 |
| 0000675520 | 6574 | 0A64 | 5200 | 6465 | 7269 | 6365 | 6974 | 6E6F |
| 0000675540 | 6920 | 746E | 206F | 6970 | 6570 | 2073 | 7369 | 6E20 |
| 0000675560 | 746F | 7320 | 7075 | 6F70 | 7472 | 6465 | 6900 | 766E |
| 0000675600 | 6C61 | 6469 | 7420 | 6572 | 2065 | 7974 | 6570 | 2520 |
| 0000675620 | 2064 | 6E69 | 7220 | 6465 | 7269 | 6365 | 2874 | 0A29 |
| 0000675640 | 4300 | 6E61 | 7427 | 7220 | 6465 | 7269 | 6365 | 2074 |
| 0000675660 | 7325 | 2720 | 7325 | 2E27 | 6F54 | 206F | 616D | 796E |
| 0000675700 | 7020 | 7069 | 7365 | 662F | 6C69 | 7365 | 6F20 | 6570 |
| 0000675720 | 206E | 6F66 | 2072 | 6572 | 6964 | 6572 | 7463 | 6F69 |
| 0000675740 | 2E6E | 550A | 6573 | 2720 | 6C63 | 736F | 2865 | 663C |
| 0000675760 | 616E | 656D | 293E | 273B | 7420 | 206F | 6C63 | 736F |
| 0000676000 | 2065 | 6E6F | 2065 | 6572 | 6964 | 6572 | 7463 | 6F69 |
| 0000676020 | 2E6E | 4F20 | 2072 | 6863 | 6F6F | 6573 | 4120 | 4F42 |
| 0000676040 | 5452 | 7420 | 206F | 6C63 | 736F | 2065 | 6C61 | 206C |
| 0000676060 | 6572 | 6964 | 6572 | 7463 | 6F69 | 736E | 002E | 6F4E |
| 0000676100 | 6D20 | 726F | 2065 | 656D | 6F6D | 7972 | 6D00 | 2520 |
| 0000676120 | 2070 | 7525 | 5B20 | 6C25 | 5D75 | 6200 | 6D5F | 6D65 |
| 0000676140 | 6572 | 0070 | 6F4E | 6D20 | 726F | 2065 | 656D | 6F6D |
| 0000676160 | 7972 | 6D00 | 2520 | 2070 | 7525 | 5B20 | 6C25 | 5D75 |
| 0000676200 | 6200 | 6D5F | 6D65 | 6572 | 0070 | 0077 | 0077 | 0061 |
| 0000676220 | 0061 | 7266 | 6D6F | 7200 | 6300 | 6E61 | 7427 | 7220 |
| 0000676240 | 6465 | 7269 | 6365 | 2074 | 7325 | 6020 | 7325 | 0A27 |
| 0000676260 | 6300 | 6E61 | 7427 | 7320 | 6565 | 206B | 6F74 | 2520 |
| 0000676300 | .646C | 6F20 | 206E | 2560 | 2773 | 000A | 6572 | 6964 |
| 0000676320 | 6572 | 7463 | 6300 | 6F6C | 6573 | 6F20 | 2066 | 2522 |
| 0000676340 | 2273 | 6620 | 6961 | 656C | 2064 | 2528 | 2973 | 002E |
| 0000676360 | 6F74 | 206F | 616D | 796E | 7020 | 7069 | 7365 | 6F20 |
| 0000676400 | 2072 | 6E69 | 7570 | 2074 | 6966 | 656C | 2073 | 706F |
| 0000676420 | 6E65 | 6900 | 746E | 6900 | 746E | 0000 | 6C63 | 736F |
| 0000676440 | 5F65 | 6C61 | 5F6C | 706F | 6E65 | 665F | 6C69 | 7365 |
| 0000676460 | 6900 | 746E | 6900 | 746E | 6600 | 6C69 | 0065 | 7325 |
| 0000676500 | 6320 | 6F6C | 6573 | 6F20 | 2066 | 2522 | 2273 | 6620 |
| 0000676520 | 6961 | 656C | 2064 | 2528 | 2973 | 002E | 2066 | 7025 |
| 0000676540 | 2520 | 2075 | 255B | 756C | 005D | 5F62 | 656D | 726D |
| 0000676560 | 7065 | 6600 | 2520 | 2070 | 7525 | 5B20 | 6C25 | 5D75 |
| 0000676600 | 6200 | 6D5F | 6D65 | 6572 | 0070 | 6C63 | 736F | 5F65 |
| 0000676620 | 7066 | 6500 | 7272 | 726F | 7720 | 6972 | 6974 | 676E |
| 0000676640 | 7320 | 6174 | 646E | 7261 | 2064 | 756F | 7074 | 7475 |
| 0000676660 | 002E | 7265 | 6F72 | 2072 | 7277 | 7469 | 6E69 | 2067 |
| 0000676700 | 7473 | 6E61 | 6164 | 6472 | 6520 | 7272 | 726F | 002E |
| 0000676720 | 6966 | 656C | 2500 | 2073 | 6C66 | 7375 | 2068 | 666F |
| 0000676740 | 2220 | 7325 | 2022 | 6166 | 6C69 | 6465 | 2820 | 7325 |
| 0000676760 | 2E29 | 2F00 | 6564 | 2F76 | 2F00 | 6564 | 2F76 | 7300 |
| 0000677000 | 6474 | 6E69 | 7300 | 6474 | 6E69 | 7300 | 6474 | 756F |
| 0000677020 | 0074 | 7473 | 6F64 | 7475 | 7300 | 6474 | 7265 | 0072 |
| 0000677040 | 7473 | 6564 | 7272 | 6600 | 2F64 | 6600 | 2F64 | 2500 |
| 0000677060 | 0064 | 7761 | 386B | 632E | 7400 | 6C73 | 702E | 4E00 |

THU MAR 14 17:52:34 1991 TSLINT.DLL PAGE 243, LINE 14279

| | | | | | | | | |
|---|---|---|---|---|---|---|---|---|
| 0000677100 | 444F | 2045 | 002A | 4F4E | 4544 | 2A20 | 4E00 | 206F |
| 0000677120 | 6F6D | 6572 | 6D20 | 6D65 | 726F | 0079 | 206D | 7025 |
| 0000677140 | 2520 | 2075 | 255B | 756C | 005D | 5F62 | 656D | 726D |
| 0000677160 | 7065 | 4E00 | 206F | 6F6D | 6572 | 6D20 | 6D65 | 726F |
| 0000677200 | 0079 | 2072 | 7025 | 2528 | 2975 | 2D20 | 203E | 7025 |
| 0000677220 | 2528 | 2975 | 5B20 | 6C25 | 5D75 | 6200 | 6D5F | 6D65 |
| 0000677240 | 6572 | 0070 | 2066 | 7025 | 2520 | 2075 | 255B | 756C |
| 0000677260 | 005D | 5F62 | 656D | 726D | 7065 | 0000 | 1EA2 | 1F32 |
| 0000677300 | 1EA9 | 7AAE | 6F63 | 636E | 7461 | 655F | 7078 | 4E00 |
| 0000677320 | 444F | 2045 | 2A2A | 4E00 | 444F | 2045 | 2A2A | 4E00 |
| 0000677340 | 206F | 6F6D | 6572 | 6D20 | 6D65 | 726F | 0079 | 206D |
| 0000677360 | 7025 | 2520 | 2075 | 255B | 756C | 005D | 5F62 | 656D |
| 0000677400 | 726D | 7065 | 0000 | 7361 | 6F73 | 5F63 | 6F6C | 6B6F |
| 0000677420 | 7075 | 7300 | 7274 | 6375 | 2074 | 6573 | 7261 | 6863 |
| 0000677440 | 2A20 | 7300 | 7274 | 6375 | 2074 | 6573 | 7261 | 6863 |
| 0000677460 | 2A20 | 4E00 | 206F | 6F6D | 6572 | 6D20 | 6D65 | 726F |
| 0000677500 | 0079 | 206D | 7025 | 2520 | 2075 | 255B | 756C | 005D |
| 0000677520 | 5F62 | 656D | 726D | 7065 | 0000 | 7361 | 6F73 | 5F63 |
| 0000677540 | 6373 | 6E61 | 7300 | 7274 | 6375 | 2074 | 6573 | 7261 |
| 0000677560 | 6863 | 2A20 | 7300 | 7274 | 6375 | 2074 | 6573 | 7261 |
| 0000677600 | 6863 | 2A20 | 6600 | 2520 | 2070 | 7525 | 5B20 | 6C25 |
| 0000677620 | 5D75 | 6200 | 6D5F | 6D65 | 6572 | 0070 | 7361 | 6F73 |
| 0000677640 | 5F63 | 656E | 7478 | 0000 | 7761 | 396B | 632E | 7400 |
| 0000677660 | 6C73 | 702E | 3000 | 3100 | 3200 | 3300 | 3400 | 3500 |
| 0000677700 | 3600 | 3700 | 3800 | 3900 | 6400 | 756F | 6C62 | 0065 |
| 0000677720 | 6F64 | 6275 | 656C | 5400 | 6C73 | 4920 | 746E | 7265 |
| 0000677740 | 7270 | 7465 | 7265 | 6C00 | 6E69 | 2065 | 6425 | 202C |
| 0000677760 | 7325 | 203A | 6E49 | 6574 | 6E72 | 6C61 | 6520 | 7272 |
| 0000700000 | 726F | 5400 | 6C73 | 4920 | 746E | 7265 | 7270 | 7465 |
| 0000700020 | 7265 | 6C00 | 6E69 | 2065 | 6425 | 202C | 7325 | 203A |
| 0000700040 | 6E49 | 6574 | 6E72 | 6C61 | 6520 | 7272 | 726F | 5400 |
| 0000700060 | 6C73 | 4920 | 746E | 7265 | 7270 | 7465 | 7265 | 6C00 |
| 0000700100 | 6E69 | 2065 | 6425 | 202C | 7325 | 203A | 6E49 | 6574 |
| 0000700120 | 6E72 | 6C61 | 6520 | 7272 | 726F | 7300 | 7274 | 6E69 |
| 0000700140 | 2067 | 7369 | 2520 | 3A73 | 6E20 | 6D75 | 6562 | 2072 |
| 0000700160 | 7369 | 2520 | 0067 | 5F62 | 6564 | 7562 | 0067 | 2018 |
| 0000700200 | 20F4 | 201F | 20F8 | 2025 | 20FC | 2027 | 2100 | 2029 |
| 0000700220 | 2104 | 202B | 2108 | 202D | 210C | 202F | 2110 | 2031 |
| 0000700240 | 2114 | 2033 | 2118 | 2035 | 211C | 2037 | 7AC0 | 5F72 |
| 0000700260 | 6F66 | 6372 | 5F65 | 756E | 626D | 7265 | 4E00 | 444F |
| 0000700300 | 2045 | 002A | 4F4E | 4544 | 2A20 | 5400 | 6C73 | 4920 |
| 0000700320 | 746E | 7265 | 7270 | 7465 | 7265 | 6C00 | 6E69 | 2065 |
| 0000700340 | 6425 | 202C | 7325 | 203A | 6E49 | 6574 | 6E72 | 6C61 |
| 0000700360 | 6520 | 7272 | 726F | 5400 | 6C73 | 4920 | 746E | 7265 |
| 0000700400 | 7270 | 7465 | 7265 | 6C00 | 6E69 | 2065 | 6425 | 202C |
| 0000700420 | 7325 | 203A | 6E49 | 6574 | 6E72 | 6C61 | 6520 | 7272 |
| 0000700440 | 726F | 5400 | 6C73 | 4920 | 746E | 7265 | 7270 | 7465 |
| 0000700460 | 7265 | 6C00 | 6E69 | 2065 | 6425 | 202C | 7325 | 203A |
| 0000700500 | 6E49 | 6574 | 6E72 | 6C61 | 6520 | 7272 | 726F | 5400 |
| 0000700520 | 6C73 | 4920 | 746E | 7265 | 7270 | 7465 | 7265 | 6C00 |
| 0000700540 | 6E69 | 2065 | 6425 | 202C | 7325 | 203A | 6E49 | 6574 |
| 0000700560 | 6E72 | 6C61 | 6520 | 7272 | 726F | 2500 | 362E | 0067 |
| 0000700600 | 2E25 | 6736 | 2500 | 312E | 6731 | 4E00 | 206F | 6F6D |
| 0000700620 | 6572 | 6D20 | 6D65 | 726F | 0079 | 206D | 7025 | 2520 |
| 0000700640 | 2075 | 255B | 756C | 005D | 5F62 | 656D | 726D | 7065 |
| 0000700660 | 6E00 | 6D75 | 6562 | 2072 | 7369 | 203A | 6725 | 202C |
| 0000700700 | 7473 | 6972 | 676E | 6920 | 2073 | 7325 | 6200 | 645F |
| 0000700720 | 6265 | 6775 | 0000 | 5F72 | 6F66 | 6372 | 5F65 | 7473 |
| 0000700740 | 6972 | 676E | 4E00 | 444F | 2045 | 002A | 4F4E | 4544 |

THU MAR 14 17:52:34 1991 TSLINT.DLL PAGE 244, LINE 14338

| | | | | | | | | |
|---|---|---|---|---|---|---|---|---|
| 0000700760 | 2A20 | 4E00 | 206F | 6F6D | 6572 | 6D20 | 6D65 | 726F |
| 0000701000 | 0079 | 206D | 7025 | 2520 | 2075 | 255B | 756C | 005D |
| 0000701020 | 5F62 | 656D | 726D | 7065 | 0000 | 7564 | 6E70 | 646F |
| 0000701040 | 0065 | 4F4E | 4544 | 2A20 | 4E00 | 444F | 2045 | 002A |
| 0000701060 | 7354 | 206C | 6E49 | 6574 | 7072 | 6572 | 6574 | 0072 |
| 0000701100 | 696C | 656E | 2520 | 2C64 | 2520 | 3A73 | 4920 | 746E |
| 0000701120 | 7265 | 616E | 206C | 7265 | 6F72 | 0072 | 7354 | 206C |
| 0000701140 | 6E49 | 6574 | 7072 | 6572 | 6574 | 0072 | 696C | 656E |
| 0000701160 | 2520 | 2C64 | 2520 | 3A73 | 4920 | 746E | 7265 | 616E |
| 0000701200 | 206C | 7265 | 6F72 | 0072 | 7354 | 206C | 6E49 | 6574 |
| 0000701220 | 7072 | 6572 | 6574 | 0072 | 696C | 656E | 2520 | 2C64 |
| 0000701240 | 2520 | 3A73 | 4920 | 746E | 7265 | 616E | 206C | 7265 |
| 0000701260 | 6F72 | 0072 | 6F4E | 6D20 | 726F | 2065 | 656D | 6F6D |
| 0000701300 | 7972 | 6D00 | 2520 | 2070 | 7525 | 5B20 | 6C25 | 5D75 |
| 0000701320 | 6200 | 6D5F | 6D65 | 6572 | 0070 | 7453 | 6972 | 676E |
| 0000701340 | 203A | 7325 | 6200 | 735F | 7274 | 6E69 | 7367 | 0000 |
| 0000701360 | 616D | 656B | 735F | 7274 | 6E69 | 0067 | 6572 | 6567 |
| 0000701400 | 2E78 | 0063 | 7374 | 2E6C | 0070 | 236C | 2380 | 2374 |
| 0000701420 | 7AC6 | 0000 | 0000 | 6863 | 7261 | 2A20 | 6300 | 6168 |
| 0000701440 | 2072 | 002A | 6F4E | 6D20 | 726F | 2065 | 656D | 6F6D |
| 0000701460 | 7972 | 7200 | 2520 | 2870 | 7525 | 2029 | 3E2D | 2520 |
| 0000701500 | 2870 | 7525 | 2029 | 255B | 756C | 005D | 5F62 | 656D |
| 0000701520 | 726D | 7065 | 4E00 | 206F | 6F6D | 6572 | 6D20 | 6D65 |
| 0000701540 | 726F | 0079 | 206D | 7025 | 2520 | 2075 | 255B | 756C |
| 0000701560 | 005D | 5F62 | 656D | 726D | 7065 | 4E00 | 206F | 6F6D |
| 0000701600 | 6572 | 6D20 | 6D65 | 726F | 0079 | 2072 | 7025 | 2528 |
| 0000701620 | 2975 | 2D20 | 203E | 7025 | 2528 | 2975 | 5B20 | 6C25 |
| 0000701640 | 5D75 | 6200 | 6D5F | 6D65 | 6572 | 0070 | 6F4E | 6D20 |
| 0000701660 | 726F | 2065 | 656D | 6F6D | 7972 | 7200 | 2520 | 2870 |
| 0000701700 | 7525 | 2029 | 3E2D | 2520 | 2870 | 7525 | 2029 | 255B |
| 0000701720 | 756C | 005D | 5F62 | 656D | 726D | 7065 | 4900 | 766E |
| 0000701740 | 6C61 | 6469 | 7220 | 6765 | 6C75 | 7261 | 6520 | 7078 |
| 0000701760 | 6572 | 7373 | 6F69 | 006E | 6E55 | 616D | 6374 | 6568 |
| 0000702000 | 2064 | 285C | 5500 | 6D6E | 7461 | 6863 | 6465 | 5C20 |
| 0000702020 | 0029 | 7250 | 6D65 | 7461 | 7275 | 2065 | 6E65 | 2064 |
| 0000702040 | 666F | 722D | 6765 | 6C75 | 7261 | 6520 | 7078 | 6572 |
| 0000702060 | 7373 | 6F69 | 006E | 654E | 7473 | 6E69 | 2067 | 6F74 |
| 0000702100 | 206F | 6564 | 7065 | 5200 | 6765 | 6C75 | 7261 | 6520 |
| 0000702120 | 7078 | 6572 | 7373 | 6F69 | 206E | 6F74 | 206F | 6962 |
| 0000702140 | 0067 | 654D | 6F6D | 7972 | 6520 | 6878 | 7561 | 7473 |
| 0000702160 | 6465 | 0000 | 6572 | 635F | 6D6F | 6970 | 656C | 705F |
| 0000702200 | 7461 | 6574 | 6E72 | 6900 | 746E | 6900 | 746E | 0000 |
| 0000702220 | 6572 | 635F | 6D6F | 6970 | 656C | 665F | 7361 | 6D74 |
| 0000702240 | 7061 | 6900 | 746E | 6900 | 746E | 0000 | 6572 | 735F |
| 0000702260 | 6165 | 6372 | 0068 | 6E69 | 0074 | 6E69 | 0074 | 6572 |
| 0000702300 | 735F | 6165 | 6372 | 5F68 | 0032 | 6E69 | 0074 | 6E69 |
| 0000702320 | 0074 | 6572 | 6D5F | 7461 | 6863 | 6900 | 746E | 6900 |
| 0000702340 | 746E | 0000 | 07D0 | 6572 | 6D5F | 7461 | 6863 | 325F |
| 0000702360 | 6300 | 6168 | 2072 | 002A | 6863 | 7261 | 2A20 | 4E00 |
| 0000702400 | 206F | 7270 | 7665 | 6F69 | 7375 | 7220 | 6765 | 6C75 |
| 0000702420 | 7261 | 6520 | 7078 | 6572 | 7373 | 6F69 | 006E | 6F4E |
| 0000702440 | 6D20 | 726F | 2065 | 656D | 6F6D | 7972 | 6D00 | 2520 |
| 0000702460 | 2070 | 7525 | 5B20 | 6C25 | 5D75 | 6200 | 6D5F | 6D65 |
| 0000702500 | 6572 | 0070 | 654D | 6F6D | 7972 | 6520 | 6878 | 7561 |
| 0000702520 | 7473 | 6465 | 4E00 | 206F | 6F6D | 6572 | 6D20 | 6D65 |
| 0000702540 | 726F | 0079 | 206D | 7025 | 2520 | 2075 | 255B | 756C |
| 0000702560 | 005D | 5F62 | 656D | 726D | 7065 | 4D00 | 6D65 | 726F |
| 0000702600 | 2079 | 7865 | 6168 | 7375 | 6574 | 0064 | 6572 | 635F |
| 0000702620 | 6D6F | 0070 | 6E69 | 0074 | 6E69 | 0074 | 6572 | 655F |

THU MAR 14 17:52:34 1991 TSLINT.DLL PAGE 245, LINE 14397

| | | | | | | | | |
|---|---|---|---|---|---|---|---|---|
| 0000702640 | 6578 | 0063 | 6F64 | 665F | 6572 | 2E65 | 0063 | 7374 |
| 0000702660 | 2E6C | 0070 | 6E69 | 0074 | 6E69 | 0074 | 6F64 | 665F |
| 0000702700 | 6572 | 2065 | 202D | 754E | 6C6C | 7020 | 696F | 746E |
| 0000702720 | 7265 | 6200 | 655F | 7272 | 726F | 6600 | 6572 | 2065 |
| 0000702740 | 255B | 5D70 | 2C20 | 7320 | 7A69 | 2065 | 203D | 7525 |
| 0000702760 | 6200 | 615F | 6772 | 0073 | 2614 | 266E | 261E | 237C |
| 0000703000 | 0001 | 6F64 | 665F | 6572 | 0065 | 6F76 | 6469 | 2A20 |
| 0000703020 | 7600 | 696F | 2064 | 002A | 6F64 | 6D5F | 6C61 | 6F6C |
| 0000703040 | 2063 | 7525 | 6220 | 7479 | 7365 | 202C | 7974 | 6570 |
| 0000703060 | 2520 | 2064 | 656C | 6576 | 206C | 6425 | 6200 | 615F |
| 0000703100 | 6772 | 0073 | 2A2A | 2A2A | 2A2A | 2A2A | 202A | 6C68 |
| 0000703120 | 6D5F | 6C61 | 6F6C | 2063 | 6166 | 6C69 | 6465 | 2120 |
| 0000703140 | 2A20 | 2A2A | 2A2A | 2A2A | 2A2A | 2A2A | 6200 | 655F |
| 0000703160 | 7272 | 726F | 6800 | 5F6C | 6973 | 657A | 7028 | 2029 |
| 0000703200 | 3D3D | 7320 | 7A69 | 0065 | 5F62 | 7361 | 6573 | 7472 |
| 0000703220 | 0000 | 6F64 | 6D5F | 6C61 | 6F6C | 0063 | 6F76 | 6469 |
| 0000703240 | 2A20 | 7600 | 696F | 2064 | 002A | 6F64 | 725F | 6165 |
| 0000703260 | 6C6C | 636F | 2820 | 7025 | 202C | 6973 | 657A | 2520 |
| 0000703300 | 2C75 | 7420 | 7079 | 2065 | 6425 | 202C | 656C | 6576 |
| 0000703320 | 206C | 6425 | 0029 | 5F62 | 7261 | 7367 | 2A00 | 2A2A |
| 0000703340 | 2A2A | 2A2A | 2A2A | 6820 | 5F6C | 6572 | 6C61 | 6F6C |
| 0000703360 | 2063 | 6166 | 6C69 | 6465 | 2120 | 2A20 | 2A2A | 2A2A |
| 0000703400 | 2A2A | 2A2A | 2A2A | 6200 | 6D5F | 6D65 | 6800 | 5F6C |
| 0000703420 | 6973 | 657A | 7028 | 2029 | 3D3D | 7320 | 7A69 | 0065 |
| 0000703440 | 5F62 | 7361 | 6573 | 7472 | 0000 | 6F64 | 725F | 6165 |
| 0000703460 | 6C6C | 636F | 0000 | 7761 | 616B | 632E | 7400 | 6C73 |
| 0000703500 | 702E | 4E00 | 444F | 2045 | 002A | 4F4E | 4544 | 2A20 |
| 0000703520 | 4100 | 6C6C | 636F | 7461 | 6E69 | 2067 | 656E | 2077 |
| 0000703540 | 6F6E | 6564 | 2E2E | 002E | 5F62 | 656D | 006D | 6F4E |
| 0000703560 | 6D20 | 726F | 2065 | 656D | 6F6D | 7972 | 6D00 | 2520 |
| 0000703600 | 2070 | 7525 | 5B20 | 6C25 | 5D75 | 6200 | 6D5F | 6D65 |
| 0000703620 | 6572 | 0070 | 27A6 | 280A | 27AD | 7AD4 | 656E | 6E77 |
| 0000703640 | 646F | 0065 | 6E69 | 0074 | 6E69 | 0074 | 2066 | 7025 |
| 0000703660 | 2520 | 2075 | 255B | 756C | 005D | 5F62 | 656D | 726D |
| 0000703700 | 7065 | 0000 | 7266 | 6565 | 6F6E | 6564 | 0000 | 0000 |
| 0000703720 | 0007 | 000F | 001F | 003F | 0000 | 0003 | 0001 | 0003 |
| 0000703740 | 0001 | 0003 | 0000 | 9039 | 9A31 | C024 | 32D9 | 3182 |
| 0000703760 | 9B66 | F342 | 5DA1 | 81E0 | DE3B | 6FB5 | DF0A | BC02 |
| 0000704000 | F103 | 40FB | 48F3 | E56B | 7449 | DBB0 | BEB1 | 5918 |
| 0000704020 | AB5C | 54FD | 9465 | 680F | 8C2E | 799F | EB3D | E0B7 |
| 0000704040 | B11E | 6B86 | 2D43 | 2E2A | DA67 | CA88 | 1588 | 735D |
| 0000704060 | E369 | 35F7 | 904F | 8FD6 | D715 | F051 | 6FA6 | 6B96 |
| 0000704100 | 616E | EFDC | AC94 | 3F93 | 3641 | C298 | C622 | 2AB8 |
| 0000704120 | F5A4 | D77B | 8A88 | 9D0E | F5AD | 220B | 8999 | 47B9 |
| 0000704140 | 27FB | 2862 | 28D8 | 2856 | 28DC | 2856 | 28E6 | 0003 |
| 0000704160 | 001F | 0003 | 28D2 | 2806 | 6E69 | 7469 | 7473 | 7461 |
| 0000704200 | 3A65 | 6E20 | 746F | 6520 | 6F6E | 6775 | 2068 | 7473 |
| 0000704220 | 7461 | 2065 | 2528 | 2064 | 7962 | 6574 | 2973 | 7720 |
| 0000704240 | 7469 | 2068 | 6877 | 6369 | 2068 | 6F74 | 6420 | 206F |
| 0000704260 | 616A | 6B63 | 203B | 6769 | 6F6E | 6572 | 2E64 | 000A |
| 0000704300 | 6573 | 7374 | 6174 | 6574 | 203A | 7473 | 7461 | 2065 |
| 0000704320 | 6E69 | 6F66 | 6820 | 7361 | 6220 | 6565 | 206E | 756D |
| 0000704340 | 676E | 6465 | 203B | 6F6E | 2074 | 6863 | 6E61 | 6567 |
| 0000704360 | 2E64 | 000A | 0000 | 0000 | 0000 | 0000 | 7374 | 656C |
| 0000704400 | 2E78 | 0063 | 7374 | 2E6C | 0070 | 7461 | 6E61 | 0032 |
| 0000704420 | 6962 | 6270 | 706B | 0074 | 7262 | 6165 | 006B | 6163 |
| 0000704440 | 6C6C | 6300 | 6568 | 6B63 | 735F | 7263 | 6565 | 006E |
| 0000704460 | 6863 | 6365 | 5F6B | 6973 | 0067 | 6C63 | 736F | 0065 |
| 0000704500 | 6F63 | 746E | 6E69 | 6575 | 6300 | 736F | 6400 | 6C65 |

THU MAR 14 17:52:34 1991 TSLINT.DLL PAGE 246, LINE 14456

| | | | | | | | | |
|---|---|---|---|---|---|---|---|---|
| 0000704520 | 7465 | 0065 | 6F64 | 6500 | 736C | 0065 | 7865 | 0070 |
| 0000704540 | 6F66 | 0072 | 7566 | 636E | 6600 | 6E75 | 7463 | 6F69 |
| 0000704560 | 006E | 6567 | 5F74 | 6974 | 656D | 6700 | 7465 | 785F |
| 0000704600 | 6700 | 7465 | 795F | 6700 | 7465 | 696C | 656E | 6700 |
| 0000704620 | 7573 | 0062 | 6669 | 6900 | 006E | 6E69 | 6564 | 0078 |
| 0000704640 | 6E69 | 0074 | 656C | 676E | 6874 | 6C00 | 676F | 6D00 |
| 0000704660 | 7461 | 6863 | 6D00 | 766F | 5F65 | 6F6C | 6163 | 6F74 |
| 0000704700 | 5F72 | 6261 | 0073 | 6F6D | 6576 | 6C5F | 636F | 7461 |
| 0000704720 | 726F | 725F | 6C65 | 6D00 | 766F | 5F65 | 6F6C | 6163 |
| 0000704740 | 6F74 | 5F72 | 7274 | 6361 | 006B | 6F6D | 6576 | 6D5F |
| 0000704760 | 756F | 6573 | 615F | 7362 | 6D00 | 766F | 5F65 | 6F6D |
| 0000705000 | 7375 | 5F65 | 6572 | 006C | 746D | 7079 | 0065 | 6170 |
| 0000705020 | 7375 | 0065 | 7270 | 6E69 | 0074 | 7270 | 6E69 | 6674 |
| 0000705040 | 7000 | 7672 | 7261 | 0073 | 6172 | 646E | 7200 | 7365 |
| 0000705060 | 7465 | 655F | 6378 | 7065 | 6974 | 6E6F | 7200 | 7365 |
| 0000705100 | 7465 | 665F | 6C69 | 6574 | 0072 | 6572 | 7574 | 6E72 |
| 0000705120 | 7300 | 7465 | 655F | 6378 | 7065 | 6974 | 6E6F | 7300 |
| 0000705140 | 7465 | 665F | 6C69 | 6574 | 0072 | 6973 | 006E | 7073 |
| 0000705160 | 696C | 0074 | 7073 | 6972 | 746E | 0066 | 7173 | 7472 |
| 0000705200 | 7300 | 6172 | 646E | 7300 | 6275 | 7300 | 6275 | 7473 |
| 0000705220 | 0072 | 7973 | 7473 | 6D65 | 7400 | 6365 | 0068 | 6974 |
| 0000705240 | 656D | 735F | 7274 | 7400 | 6C6F | 776F | 7265 | 7400 |
| 0000705260 | 756F | 7070 | 7265 | 7400 | 6572 | 7574 | 6E72 | 7400 |
| 0000705300 | 7079 | 0065 | 6177 | 7469 | 7700 | 6968 | 656C | 0000 |
| 0000705320 | 296C | 2B46 | 2974 | 2B4C | 0001 | 297A | 2B5A | 003F |
| 0000705340 | 0128 | 0000 | 308C | 2B64 | 2980 | 2B68 | 003F | 0128 |
| 0000705360 | 0000 | 6836 | 2B8E | 2988 | 2B76 | 002F | 0117 | 0000 |
| 0000705400 | 0000 | 0000 | 298E | 2B84 | 0051 | 0122 | 0000 | 0000 |
| 0000705420 | 0000 | 2993 | 2B92 | 003F | 0128 | 0000 | 4E4F | 2B9C |
| 0000705440 | 29A0 | 2BA0 | 003F | 0128 | 0000 | 5187 | 2BC6 | 29AA |
| 0000705460 | 2BAE | 003F | 0128 | 0000 | 437C | FFFF | 29B0 | 2BBC |
| 0000705500 | 0030 | 0118 | 0000 | 0000 | 0000 | 29B9 | 2BCA | 003F |
| 0000705520 | 0128 | 0000 | 3199 | 2BFE | 29BD | 2BD8 | 0037 | 0112 |
| 0000705540 | 0000 | 0000 | 0000 | 29C4 | 2BE6 | 0035 | 0115 | 0000 |
| 0000705560 | 0000 | 0000 | 29C7 | 2BF4 | 0000 | 0110 | 0000 | 0000 |
| 0000705600 | 0000 | 29CC | 2C02 | 003F | 0128 | 0000 | 0377 | 2C36 |
| 0000705620 | 29D0 | 2C10 | 002D | 0116 | 0000 | 0000 | 0000 | 29D4 |
| 0000705640 | 2C1E | 0042 | 011D | 0000 | 0000 | 0000 | 29D9 | 2C2C |
| 0000705660 | 0042 | 011D | 0000 | 0000 | 0000 | 29E2 | 2C3A | 003F |
| 0000705700 | 0128 | 0000 | 6746 | 2C44 | 29EB | 2C48 | 003F | 0128 |
| 0000705720 | 0000 | 4D20 | 2C52 | 29F1 | 2C56 | 003F | 0128 | 0000 |
| 0000705740 | 4D60 | 2C98 | 29F7 | 2C64 | 0045 | 011E | 0000 | 0000 |
| 0000705760 | 0000 | 29FF | 2C72 | 0047 | 011F | 0000 | 0000 | 0000 |
| 0000706000 | 2A04 | 2C80 | 002B | 010F | 0000 | 0000 | 0000 | 2A07 |
| 0000706020 | 2C8E | 0000 | 0121 | 0000 | 0000 | 0000 | 2A0A | 2C9C |
| 0000706040 | 003F | 0128 | 0000 | 03EB | 2CA6 | 2A10 | 2CAA | 003F |
| 0000706060 | 0128 | 0000 | 04D8 | 2CB4 | 2A14 | 2CB8 | 003F | 0128 |
| 0000706100 | 0000 | 054C | 2CC2 | 2A1B | 2CC6 | 003F | 0128 | 0000 |
| 0000706120 | 05A9 | 2CDE | 2A1F | 2CD4 | 0048 | 0120 | 0000 | 0000 |
| 0000706140 | 0000 | 2A25 | 2CE2 | 003F | 0128 | 0000 | 3F58 | 2CEC |
| 0000706160 | 2A36 | 2CF0 | 003F | 0128 | 0000 | 42CA | 2CFA | 2A47 |
| 0000706200 | 2CFE | 003F | 0128 | 0000 | 3CA0 | 2D08 | 2A5A | 2D0C |
| 0000706220 | 003F | 0128 | 0000 | 463C | 2D16 | 2A69 | 2D1A | 003F |
| 0000706240 | 0128 | 0000 | 49AE | 2D24 | 2A78 | 2D28 | 003F | 0128 |
| 0000706260 | 0000 | 38F4 | 2D32 | 2A7E | 2D36 | 003F | 0128 | 0000 |
| 0000706300 | 6299 | 2D5C | 2A84 | 2D44 | 0031 | 0119 | 0000 | 0000 |
| 0000706320 | 0000 | 2A8A | 2D52 | 0032 | 011A | 0000 | 0000 | 0000 |
| 0000706340 | 2A91 | 2D60 | 003F | 0128 | 0000 | B8F6 | 2D6A | 2A98 |
| 0000706360 | 2D6E | 003F | 0128 | 0000 | 320D | 2D78 | 2A9D | 2D7C |

THU MAR 14 17:52:34 1991 TSLINT.DLL PAGE 247, LINE 14515

| | | | | | | | | |
|---|---|---|---|---|---|---|---|---|
| 0000706400 | 003F | 0128 | 0000 | 5D30 | 2D86 | 2AAD | 2D8A | 003F |
| 0000706420 | 0128 | 0000 | 577F | 2DA2 | 2ABA | 2D98 | 0036 | 0111 |
| 0000706440 | 0000 | 0000 | 0000 | 2AC1 | 2DA6 | 003F | 0128 | 0000 |
| 0000706460 | 5A3F | 2DB0 | 2ACF | 2DB4 | 003F | 0128 | 0000 | 54BF |
| 0000706500 | 2DBE | 2ADA | 2DC2 | 003F | 0128 | 0000 | 3125 | 2DCC |
| 0000706520 | 2ADE | 2DD0 | 003F | 0128 | 0000 | 0712 | 2DDA | 2AE4 |
| 0000706540 | 2DDE | 003F | 0128 | 0000 | 085B | 2DE8 | 2AEC | 2DEC |
| 0000706560 | 003F | 0128 | 0000 | 1F61 | 2DF6 | 2AF1 | 2DFA | 003F |
| 0000706600 | 0128 | 0000 | 3284 | 2E12 | 2AF7 | 2E08 | 0046 | 011F |
| 0000706620 | 0000 | 0000 | 0000 | 2AFB | 2E16 | 003F | 0128 | 0000 |
| 0000706640 | 1FD5 | 2E20 | 2B02 | 2E24 | 003F | 0128 | 0000 | 20DF |
| 0000706660 | 2E2E | 2B09 | 2E32 | 003F | 0128 | 0000 | 5FF0 | 2E3C |
| 0000706700 | 2B0E | 2E40 | 003F | 0128 | 0000 | 6790 | 2E4A | 2B17 |
| 0000706720 | 2E4E | 003F | 0128 | 0001 | 2366 | 2E58 | 2B1F | 2E5C |
| 0000706740 | 003F | 0128 | 0001 | 243E | 2E74 | 2B27 | 2E6A | 0053 |
| 0000706760 | 0123 | 0000 | 0000 | 0000 | 2B2F | 2E78 | 003F | 0128 |
| 0000707000 | 0000 | 3548 | 2E82 | 2B34 | 2E86 | 003F | 0128 | 0000 |
| 0000707020 | 64A5 | FFFF | 2B39 | 7AF0 | 002C | 0114 | 0000 | 0000 |
| 0000707040 | 0000 | 6E69 | 0074 | 6E69 | 0074 | 7374 | 5F6C | 696C |
| 0000707060 | 656E | 6F6E | 7200 | 7465 | 7275 | 206E | 6F63 | 6564 |
| 0000707100 | 6620 | 6F72 | 206D | 6567 | 6C74 | 6E69 | 2065 | 203D |
| 0000707120 | 6425 | 6200 | 645F | 6265 | 6775 | 2A00 | 2A2A | 2A2A |
| 0000707140 | 202A | 6E45 | 2D64 | 664F | 462D | 6C69 | 2065 | 2A2A |
| 0000707160 | 2A2A | 2A2A | 002A | 5F62 | 6564 | 7562 | 3167 | 2000 |
| 0000707200 | 2A2A | 2A2A | 2A2A | 4120 | 6F62 | 7472 | 6420 | 7275 |
| 0000707220 | 6E69 | 2067 | 6E69 | 7570 | 2074 | 2A2A | 2A2A | 2A2A |
| 0000707240 | 6200 | 645F | 6265 | 6775 | 0031 | 2A2A | 2A2A | 2A2A |
| 0000707260 | 4520 | 646E | 6F20 | 2066 | 6574 | 7473 | 6320 | 7361 |
| 0000707300 | 2065 | 2A2A | 2A2A | 2A2A | 6200 | 645F | 6265 | 6775 |
| 0000707320 | 0031 | 7250 | 626F | 656C | 206D | 6977 | 6874 | 6D20 |
| 0000707340 | 6465 | 7469 | 7720 | 6961 | 2074 | 6F68 | 6B6F | 2120 |
| 0000707360 | 0020 | 5F62 | 7562 | 0067 | 2A2A | 2A2A | 2A2A | 4520 |
| 0000707400 | 646E | 6F20 | 2066 | 6574 | 7473 | 7220 | 6165 | 6863 |
| 0000707420 | 6465 | 2A20 | 2A2A | 2A2A | 002A | 5F62 | 6564 | 7562 |
| 0000707440 | 3167 | 4500 | 646E | 6F20 | 2066 | 6574 | 7473 | 7220 |
| 0000707460 | 6165 | 6863 | 6465 | 7500 | 746E | 7265 | 696D | 616E |
| 0000707500 | 6574 | 2064 | 6572 | 6567 | 7078 | 6520 | 646E | 2073 |
| 0000707520 | 6977 | 6874 | 5C20 | 7500 | 746E | 7265 | 696D | 616E |
| 0000707540 | 6574 | 2064 | 6572 | 6567 | 7078 | 4100 | 5353 | 4749 |
| 0000707560 | 4F4E | 0050 | 5F62 | 656C | 0078 | 5341 | 4953 | 4E47 |
| 0000707600 | 504F | 6200 | 6C5F | 7865 | 4100 | 5353 | 4749 | 4F4E |
| 0000707620 | 0050 | 5F62 | 656C | 0078 | 5341 | 4953 | 4E47 | 504F |
| 0000707640 | 6200 | 6C5F | 7865 | 4100 | 5353 | 4749 | 4F4E | 0050 |
| 0000707660 | 5F62 | 656C | 0078 | 5341 | 4953 | 4E47 | 504F | 6200 |
| 0000707700 | 6C5F | 7865 | 4900 | 434E | 4552 | 454D | 544E | 6200 |
| 0000707720 | 6C5F | 7865 | 5200 | 4C45 | 504F | 6200 | 6C5F | 7865 |
| 0000707740 | 4D00 | 5441 | 4843 | 504F | 6200 | 6C5F | 7865 | 5200 |
| 0000707760 | 4C45 | 504F | 6200 | 6C5F | 7865 | 5200 | 4C45 | 504F |
| 0000710000 | 6200 | 6C5F | 7865 | 4100 | 5353 | 4749 | 4F4E | 0050 |
| 0000710020 | 5F62 | 656C | 0078 | 4552 | 4F4C | 0050 | 5F62 | 656C |
| 0000710040 | 0078 | 5041 | 4550 | 444E | 4F5F | 0050 | 5F62 | 656C |
| 0000710060 | 0078 | 414D | 4354 | 4F48 | 0050 | 5F62 | 656C | 0078 |
| 0000710100 | 6E75 | 6574 | 6D72 | 6E69 | 7461 | 6465 | 732D | 7274 |
| 0000710120 | 6E69 | 0067 | 5453 | 4952 | 474E | 6200 | 6C5F | 7865 |
| 0000710140 | 4100 | 5353 | 4749 | 4F4E | 0050 | 5F62 | 656C | 0078 |
| 0000710160 | 4544 | 5243 | 4D45 | 4E45 | 0054 | 5F62 | 656C | 0078 |
| 0000710200 | 0920 | 0A2C | 4E00 | 4D55 | 4542 | 2052 | 6625 | 6200 |
| 0000710220 | 6C5F | 7865 | 4C00 | 5845 | 415F | 444E | 6200 | 6C5F |
| 0000710240 | 7865 | 4500 | 5252 | 524F | 6200 | 6C5F | 7865 | 4C00 |

THU MAR 14 17:52:34 1991 TSLINT.DLL PAGE 248, LINE 14574

| | | | | | | | | |
|---|---|---|---|---|---|---|---|---|
| 0000710260 | 5845 | 4F5F | 0052 | 5F62 | 656C | 0078 | 6E49 | 6176 |
| 0000710300 | 696C | 2064 | 6863 | 7261 | 2720 | 6325 | 2027 | 6E69 |
| 0000710320 | 6520 | 7078 | 6572 | 7373 | 6F69 | 0A6E | 4500 | 5252 |
| 0000710340 | 524F | 6200 | 6C5F | 7865 | 4E00 | 206F | 6F6D | 6572 |
| 0000710360 | 6D20 | 6D65 | 726F | 0079 | 206D | 7025 | 2520 | 2075 |
| 0000710400 | 255B | 756C | 005D | 5F62 | 656D | 726D | 7065 | 4B00 |
| 0000710420 | 5945 | 4F57 | 4452 | 203A | 7325 | 6200 | 6C5F | 7865 |
| 0000710440 | 4C00 | 5845 | 425F | 4955 | 544C | 4E49 | 2520 | 0073 |
| 0000710460 | 5F62 | 656C | 0078 | 6374 | 6572 | 7574 | 6E72 | 4E00 |
| 0000710500 | 4D41 | 3A45 | 2520 | 0073 | 5F62 | 656C | 0078 | 7374 |
| 0000710520 | 5F6C | 7979 | 656C | 0078 | 0000 | 6E69 | 0074 | 6E69 |
| 0000710540 | 0074 | 7550 | 6873 | 6E69 | 2067 | 6162 | 6B63 | 2E20 |
| 0000710560 | 2E2E | 6200 | 6C5F | 7865 | 6E00 | 776F | 6C20 | 7865 |
| 0000710600 | 7470 | 2072 | 203D | 7325 | 6200 | 6C5F | 7865 | 0000 |
| 0000710620 | 656C | 6578 | 5F72 | 7570 | 6873 | 6162 | 6B63 | 6900 |
| 0000710640 | 746E | 6900 | 746E | 0000 | 7374 | 5F6C | 656C | 5F78 |
| 0000710660 | 6C63 | 6165 | 0072 | 6E69 | 0074 | 6E69 | 0074 | 7374 |
| 0000710700 | 656C | 5F78 | 6F6C | 6B6F | 6861 | 6165 | 0064 | 7374 |
| 0000710720 | 686C | 7361 | 2E68 | 0063 | 7374 | 2E6C | 0070 | 6E69 |
| 0000710740 | 0074 | 6E69 | 0074 | 323E | 325C | 3248 | 7B00 | 7374 |
| 0000710760 | 5F6C | 6168 | 6873 | 695F | 696E | 0074 | 4F4E | 4544 |
| 0000711000 | 2A20 | 4E00 | 444F | 2045 | 002A | 6F4E | 6D20 | 726F |
| 0000711020 | 2065 | 656D | 6F6D | 7972 | 6D00 | 2520 | 2070 | 7525 |
| 0000711040 | 5B20 | 6C25 | 5D75 | 6200 | 6D5F | 6D65 | 6572 | 0070 |
| 0000711060 | 6E49 | 7473 | 6C61 | 656C | 3A64 | 2520 | 2073 | 6E69 |
| 0000711100 | 7420 | 6261 | 656C | 2520 | 5B70 | 6425 | 0A5D | 6200 |
| 0000711120 | 645F | 6265 | 6775 | 0000 | 6E69 | 7473 | 6C61 | 006C |
| 0000711140 | 4F4E | 4544 | 2A20 | 4E00 | 444F | 2045 | 002A | 7566 |
| 0000711160 | 636E | 6974 | 6E6F | 2520 | 2073 | 6572 | 6F63 | 706D |
| 0000711200 | 6C69 | 6465 | 6600 | 6E75 | 7463 | 6F69 | 206E | 7325 |
| 0000711220 | 6320 | 6D6F | 6970 | 656C | 0064 | 7566 | 636E | 695F |
| 0000711240 | 736E | 6174 | 6C6C | 6900 | 746E | 6900 | 746E | 6600 |
| 0000711260 | 2520 | 2070 | 7525 | 5B20 | 6C25 | 5D75 | 6200 | 6D5F |
| 0000711300 | 6D65 | 6572 | 0070 | 2066 | 7025 | 2520 | 2075 | 255B |
| 0000711320 | 756C | 005D | 5F62 | 656D | 726D | 7065 | 0000 | 6F70 |
| 0000711340 | 5F70 | 6176 | 0072 | 6E69 | 0074 | 6E69 | 0074 | 6F70 |
| 0000711360 | 5F70 | 6170 | 6172 | 736D | 4E00 | 444F | 2045 | 002A |
| 0000711400 | 4F4E | 4544 | 2A20 | 0000 | 616D | 656B | 705F | 7261 |
| 0000711420 | 6D61 | 4E00 | 444F | 2045 | 002A | 4F4E | 4544 | 2A20 |
| 0000711440 | 0000 | 6176 | 6972 | 6261 | 656C | 4E00 | 444F | 2045 |
| 0000711460 | 002A | 4F4E | 4544 | 2A20 | 4E00 | 206F | 6F6D | 6572 |
| 0000711500 | 6D20 | 6D65 | 726F | 0079 | 206D | 7025 | 2520 | 2075 |
| 0000711520 | 255B | 756C | 005D | 5F62 | 656D | 726D | 7065 | 0000 |
| 0000711540 | 6F6E | 6564 | 635F | 6D6F | 6F6D | 006E | 4F4E | 4544 |
| 0000711560 | 2A20 | 4E00 | 444F | 2045 | 002A | 6F6E | 6564 | 4E00 |
| 0000711600 | 444F | 2045 | 002A | 4F4E | 4544 | 2A20 | 0000 | 6E73 |
| 0000711620 | 646F | 0065 | 4F4E | 4544 | 2A20 | 4E00 | 444F | 2045 |
| 0000711640 | 002A | 6B6D | 6172 | 676E | 6E65 | 646F | 0065 | 4F4E |
| 0000711660 | 4544 | 2A20 | 4E00 | 444F | 2045 | 002A | 6F4E | 6D20 |
| 0000711700 | 726F | 2065 | 656D | 6F6D | 7972 | 6D00 | 2520 | 2070 |
| 0000711720 | 7525 | 5B20 | 6C25 | 5D75 | 6200 | 6D5F | 6D65 | 6572 |
| 0000711740 | 0070 | 616D | 656B | 665F | 726F | 6C5F | 6F6F | 0070 |
| 0000711760 | 4F4E | 4544 | 2A20 | 4E00 | 444F | 2045 | 002A | 7061 |
| 0000712000 | 6570 | 646E | 725F | 6769 | 7468 | 4E00 | 444F | 2045 |
| 0000712020 | 002A | 4F4E | 4544 | 2A20 | 7400 | 6C73 | 6C5F | 6E69 |
| 0000712040 | 6E65 | 206F | 203D | 6425 | 202C | 6966 | 7578 | 2070 |
| 0000712060 | 696C | 656E | 3D20 | 2520 | 0064 | 5F62 | 6564 | 7562 |
| 0000712100 | 0067 | 7374 | 5F6C | 696C | 656E | 665F | 7869 | 7075 |
| 0000712120 | 0000 | 6F63 | 726D | 6567 | 7078 | 632E | 7400 | 6C73 |

THU MAR 14 17:52:34 1991 TSLINT.DLL PAGE 249, LINE 14633

```
0000712140  702E  7300  7274  6375  2074  6572  705F  7461
0000712160  6574  6E72  625F  6675  6566  2072  002A  7473
0000712200  7572  7463  7220  5F65  6170  7474  7265  5F6E
0000712220  7562  6666  7265  2A20  4E00  206F  6F6D  6572
0000712240  6D20  6D65  726F  0079  206D  7025  2520  2075
0000712260  255B  756C  005D  5F62  656D  726D  7065  4E00
0000712300  206F  6F6D  6572  6D20  6D65  726F  0079  206D
0000712320  7025  2520  2075  255B  756C  005D  5F62  656D
0000712340  726D  7065  4E00  206F  6F6D  6572  6D20  6D65
0000712360  726F  0079  206D  7025  2520  2075  255B  756C
0000712400  005D  5F62  656D  726D  7065  2500  3A73  2F20
0000712420  7325  002F  34C2  358A  34CD  7B08  616D  656B
0000712440  725F  6567  7078  0000  7374  696C  696E  2E74
0000712460  0063  7374  2E6C  0070  6E69  0074  6E69  0074
0000712500  2A2A  2A2A  2A2A  2A2A  2A2A  202A  6147  6272
0000712520  6761  2065  6F63  6C6C  6365  6974  6E6F  2A20
0000712540  2A2A  2A2A  2A2A  2A2A  2A2A  2A2A  6200  6D5F
0000712560  6D65  4300  6C6F  656C  7463  6E69  2067  7974
0000712600  6570  4120  4C4C  202C  7266  6D6F  6120  6C6C
0000712620  6C20  7665  6C65  0073  5F62  656D  006D  7354
0000712640  206C  654D  6F6D  7972  7320  7A69  2065  6F6E
0000712660  2077  203D  6C25  0075  5F62  656D  006D  2A2A
0000712700  2A2A  2A2A  2A2A  4720  7261  6162  6567  6320
0000712720  6C6F  656C  7463  6F69  206E  6E45  6564  2064
0000712740  2A2A  2A2A  2A2A  2A2A  2A2A  6200  6D5F  6D65
0000712760  0000  5354  4E4C  534F  4E45  0044  6E49  7469
0000713000  6169  696C  697A  676E  7420  6568  6320  6C61
0000713020  206C  6863  6961  006E  5F62  6564  7562  0067
0000713040  6E49  7469  6169  696C  697A  676E  7420  6C73
0000713060  6D20  6D65  726F  2079  616D  616E  6567  2E72
0000713100  2E2E  6200  645F  6265  6775  4900  696E  6974
0000713120  6C61  7A69  6E69  2067  656C  2078  7562  6666
0000713140  7265  2073  2E2E  002E  5F62  6564  7562  0067
0000713160  6E49  7469  6169  696C  697A  676E  7320  6D79
0000713200  6F62  206C  6174  6C62  7365  2E20  2E2E  6200
0000713220  645F  6265  6775  0000  3598  370E  35A2  7B30
0000713240  7374  5F6C  6E69  7469  6169  696C  657A  6900
0000713260  746E  6900  746E  0000  7374  5F6C  6574  6D72
0000713300  6E69  7461  0065  7374  006C  0000  0000  3736
0000713320  370A  0000  0000  0000  0000  0000  0000  0000
0000713340  0000  0000  0000  0000  0000  0000  0000  0000
*
0000713720  0000  0000  0001  FFFF  0000  0000  0000  0000
0000713740  0000  0000  0001  0000  0000  0000  0000  0000
0000713760  7374  706C  6275  632E  7400  6C73  702E  4700
0000714000  455F  5F57  0054  5F47  5745  545F  6600  2520
0000714020  2070  7525  5B20  6C25  5D75  6200  6D5F  6D65
0000714040  6572  0070  3860  389A  3869  3740  0000  0000
0000714060  7374  5F6C  7473  7261  0074  6E69  0074  6E69
0000714100  0074  7374  5F6C  6573  5F74  6E69  7570  5F74
0000714120  7566  636E  0000  7374  696C  746E  632E  7400
0000714140  6C73  702E  6900  746E  6900  746E  6200  745F
0000714160  6572  0065  6F73  7275  6563  696C  656E  7300
0000714200  756F  6372  0065  6F4E  6564  725F  6C75  5F65
0000714220  696C  7473  6200  695F  746E  7265  0070  6F4E
0000714240  6564  725F  6C75  5F65  6F6E  6564  6200  695F
0000714260  746E  7265  0070  6F46  6E75  2064  2061  7572
0000714300  656C  6200  695F  746E  7265  0070  6F4E  6564
0000714320  735F  6D74  5F74  696C  7473  6200  695F  746E
```

THU MAR 14 17:52:34 1991 TSLINT.DLL PAGE 250, LINE 14692

| | | | | | | | | |
|---|---|---|---|---|---|---|---|---|
| 0000714340 | 7265 | 0070 | 7453 | 7461 | 6D65 | 6E65 | 7374 | 2520 |
| 0000714360 | 0070 | 5F62 | 6E69 | 6574 | 7072 | 4E00 | 646F | 5F65 |
| 0000714400 | 5F4B | 6669 | 2520 | 0070 | 5F62 | 6E69 | 6574 | 7072 |
| 0000714420 | 5400 | 7572 | 2065 | 7025 | 6200 | 695F | 746E | 7265 |
| 0000714440 | 0070 | 6146 | 736C | 2065 | 7025 | 6200 | 695F | 746E |
| 0000714460 | 7265 | 0070 | 4857 | 4C49 | 2045 | 7025 | 6200 | 695F |
| 0000714500 | 746E | 7265 | 0070 | 4F44 | 2520 | 0070 | 5F62 | 6E69 |
| 0000714520 | 6574 | 7072 | 5400 | 6C73 | 4920 | 746E | 7265 | 7270 |
| 0000714540 | 7465 | 7265 | 6C00 | 6E69 | 2065 | 6425 | 202C | 7325 |
| 0000714560 | 203A | 6E49 | 6574 | 6E72 | 6C61 | 6520 | 7272 | 726F |
| 0000714600 | 4400 | 204F | 7025 | 6200 | 695F | 746E | 7265 | 0070 |
| 0000714620 | 7354 | 206C | 6E49 | 6574 | 7072 | 6572 | 6574 | 0072 |
| 0000714640 | 696C | 656E | 2520 | 2C64 | 2520 | 3A73 | 4920 | 746E |
| 0000714660 | 7265 | 616E | 206C | 7265 | 6F72 | 0072 | 4857 | 4C49 |
| 0000714700 | 2045 | 7025 | 6200 | 695F | 746E | 7265 | 0070 | 6E69 |
| 0000714720 | 6574 | 7072 | 6572 | 6974 | 676E | 4620 | 524F | 7320 |
| 0000714740 | 6174 | 7472 | 6320 | 6E6F | 6964 | 6974 | 6E6F | 6200 |
| 0000714760 | 695F | 746E | 7265 | 0070 | 6E45 | 6574 | 2072 | 6874 |
| 0000715000 | 2065 | 4F46 | 2052 | 6F6C | 706F | 6200 | 695F | 746E |
| 0000715020 | 7265 | 0070 | 6E49 | 6574 | 7072 | 6572 | 6974 | 676E |
| 0000715040 | 6C20 | 6F6F | 2070 | 7473 | 7461 | 6D65 | 6E65 | 7374 |
| 0000715060 | 6200 | 695F | 746E | 7265 | 0070 | 6E49 | 6574 | 7072 |
| 0000715100 | 6572 | 6974 | 676E | 6C20 | 6F6F | 2070 | 6E69 | 7263 |
| 0000715120 | 6D65 | 6E65 | 0074 | 5F62 | 6E69 | 6574 | 7072 | 4200 |
| 0000715140 | 6572 | 6B61 | 7320 | 6174 | 6574 | 656D | 746E | 5420 |
| 0000715160 | 4741 | 7220 | 6165 | 6863 | 6465 | 6200 | 695F | 746E |
| 0000715200 | 7265 | 0070 | 7354 | 206C | 6E49 | 6574 | 7072 | 6572 |
| 0000715220 | 6574 | 0072 | 696C | 656E | 2520 | 2C64 | 2520 | 3A73 |
| 0000715240 | 4920 | 746E | 7265 | 616E | 206C | 7265 | 6F72 | 0072 |
| 0000715260 | 4641 | 524F | 562E | 5241 | 2520 | 0070 | 5F62 | 6E69 |
| 0000715300 | 6574 | 7072 | 4100 | 4F46 | 2E52 | 454E | 5458 | 5349 |
| 0000715320 | 2520 | 0070 | 5F62 | 6E69 | 6574 | 7072 | 4100 | 4F46 |
| 0000715340 | 2E52 | 4F44 | 2520 | 0070 | 5F62 | 6E69 | 6574 | 7072 |
| 0000715360 | 5400 | 6C73 | 4920 | 746E | 7265 | 7270 | 7465 | 7265 |
| 0000715400 | 6C00 | 6E69 | 2065 | 6425 | 202C | 7325 | 203A | 6E49 |
| 0000715420 | 6574 | 6E72 | 6C61 | 6520 | 7272 | 726F | 4200 | 4552 |
| 0000715440 | 4B41 | 6200 | 695F | 746E | 7265 | 0070 | 6E55 | 7865 |
| 0000715460 | 6570 | 7463 | 6465 | 6220 | 6572 | 6B61 | 7400 | 6C73 |
| 0000715500 | 655F | 7272 | 726F | 7220 | 7465 | 7275 | 656E | 2064 |
| 0000715520 | 2121 | 0021 | 5F62 | 7562 | 0067 | 4F43 | 544E | 4E49 |
| 0000715540 | 4555 | 5500 | 656E | 7078 | 6365 | 6574 | 2064 | 6F63 |
| 0000715560 | 746E | 6E69 | 6575 | 5000 | 4952 | 544E | 2520 | 0070 |
| 0000715600 | 5F62 | 6E69 | 6574 | 7072 | 7400 | 7365 | 2074 | 6163 |
| 0000715620 | 6C6C | 6200 | 695F | 746E | 7265 | 0070 | 5250 | 4E49 |
| 0000715640 | 4654 | 2520 | 0070 | 5F62 | 6E69 | 6574 | 7072 | 4E00 |
| 0000715660 | 5845 | 0054 | 5F62 | 6E69 | 6574 | 7072 | 4500 | 4958 |
| 0000715700 | 0054 | 5F62 | 6E69 | 6574 | 7072 | 5200 | 5445 | 5255 |
| 0000715720 | 004E | 5F62 | 6E69 | 6574 | 7072 | 4300 | 6E61 | 6F6E |
| 0000715740 | 2074 | 6572 | 7574 | 6E72 | 6620 | 6F72 | 206D | 6E61 |
| 0000715760 | 7520 | 636E | 6C61 | 656C | 2064 | 7566 | 636E | 6974 |
| 0000716000 | 6E6F | 7400 | 6C73 | 655F | 7272 | 726F | 7220 | 7465 |
| 0000716020 | 7275 | 656E | 2064 | 2121 | 0021 | 5F62 | 7562 | 0067 |
| 0000716040 | 4354 | 5220 | 5445 | 5255 | 004E | 5F62 | 6E69 | 6574 |
| 0000716060 | 7072 | 4300 | 6E61 | 6F6E | 2074 | 6572 | 7574 | 6E72 |
| 0000716100 | 6620 | 6F72 | 206D | 6E61 | 7520 | 636E | 6C61 | 656C |
| 0000716120 | 2064 | 6574 | 7473 | 7400 | 6C73 | 655F | 7272 | 726F |
| 0000716140 | 7220 | 7465 | 7275 | 656E | 2064 | 2121 | 0021 | 5F62 |
| 0000716160 | 7562 | 0067 | 7546 | 636E | 6420 | 6665 | 6E20 | 646F |
| 0000716200 | 0065 | 5F62 | 6E69 | 6574 | 7072 | 4500 | 6200 | 695F |

THU MAR 14 17:52:34 1991 TSLINT.DLL PAGE 251, LINE 14751

| | | | | | | | | |
|---|---|---|---|---|---|---|---|---|
| 0000716220 | 746E | 7265 | 0070 | 38C6 | 3D0C | 38CF | 7B82 | 0000 |
| 0000716240 | 0000 | 0100 | 0302 | 0504 | 0706 | 0908 | 0B0A | 0D0C |
| 0000716260 | 0F0E | 1110 | 1312 | 1514 | 1716 | 1918 | 1B1A | 1D1C |
| 0000716300 | 1F1E | 2120 | 2322 | 2524 | 2726 | 2928 | 2B2A | 2D2C |
| 0000716320 | 2F2E | 3130 | 3332 | 3534 | 3736 | 3938 | 3B3A | 3D3C |
| 0000716340 | 3F3E | 6140 | 6362 | 6564 | 6766 | 6968 | 6B6A | 6D6C |
| 0000716360 | 6F6E | 7170 | 7372 | 7574 | 7776 | 7978 | 5B7A | 5D5C |
| 0000716400 | 5F5E | 6160 | 6362 | 6564 | 6766 | 6968 | 6B6A | 6D6C |
| 0000716420 | 6F6E | 7170 | 7372 | 7574 | 7776 | 7978 | 7B7A | 7D7C |
| 0000716440 | 7F7E | 8180 | 8382 | 8584 | 8786 | 8988 | 8B8A | 8D8C |
| 0000716460 | 8F8E | 9190 | 9392 | 9594 | 9796 | 9998 | 9B9A | 9D9C |
| 0000716500 | 9F9E | A1A0 | A3A2 | A5A4 | A7A6 | A9A8 | ABAA | ADAC |
| 0000716520 | AFAE | B1B0 | B3B2 | B5B4 | B7B6 | B9B8 | BBBA | BDBC |
| 0000716540 | BFBE | C1C0 | C3C2 | C5C4 | C7C6 | C9C8 | CBCA | CDCC |
| 0000716560 | CFCE | D1D0 | D3D2 | D5D4 | D7D6 | D9D8 | DBDA | DDDC |
| 0000716600 | DFDE | E1E0 | E3E2 | E5E4 | E7E6 | E9E8 | EBEA | EDEC |
| 0000716620 | EFEE | F1F0 | F3F2 | F5F4 | F7F6 | F9F8 | FBFA | FDFC |
| 0000716640 | FFFE | 0000 | 6E69 | 6574 | 7072 | 6572 | 0074 | 0001 |
| 0000716660 | 4F4E | 4544 | 2A20 | 4E00 | 444F | 2045 | 002A | 4E41 |
| 0000716700 | 2044 | 7025 | 6200 | 695F | 746E | 7265 | 0070 | 524F |
| 0000716720 | 2520 | 0070 | 5F62 | 6E69 | 6574 | 7072 | 4E00 | 544F |
| 0000716740 | 2520 | 0070 | 5F62 | 6E69 | 6574 | 7072 | 6200 | 6975 |
| 0000716760 | 746C | 6E69 | 2520 | 0070 | 5F62 | 6E69 | 6574 | 7072 |
| 0000717000 | 4700 | 5445 | 494C | 454E | 2520 | 0070 | 5F62 | 6E69 |
| 0000717020 | 6574 | 7072 | 4900 | 5F4E | 5241 | 4152 | 2059 | 7025 |
| 0000717040 | 6200 | 695F | 746E | 7265 | 0070 | 414D | 4354 | 2048 |
| 0000717060 | 7025 | 6200 | 695F | 746E | 7265 | 0070 | 5553 | 2042 |
| 0000717100 | 7025 | 6200 | 695F | 746E | 7265 | 0070 | 7566 | 636E |
| 0000717120 | 635F | 6C61 | 206C | 7025 | 6200 | 695F | 746E | 7265 |
| 0000717140 | 0070 | 4544 | 454C | 4554 | 2520 | 0070 | 5F62 | 6E69 |
| 0000717160 | 6574 | 7072 | 7600 | 7261 | 745F | 7079 | 2065 | 6572 |
| 0000717200 | 2066 | 7025 | 6200 | 695F | 746E | 7265 | 0070 | 4D55 |
| 0000717220 | 4E49 | 5355 | 2520 | 0070 | 5F62 | 6E69 | 6574 | 7072 |
| 0000717240 | 3F00 | 203A | 7025 | 6200 | 695F | 746E | 7265 | 0070 |
| 0000717260 | 7254 | 6575 | 2520 | 0070 | 5F62 | 6E69 | 6574 | 7072 |
| 0000717300 | 4600 | 6C61 | 6573 | 2520 | 0070 | 5F62 | 6E69 | 6574 |
| 0000717320 | 7072 | 4100 | 5353 | 4749 | 5F4E | 6E5B | 5D6F | 616D |
| 0000717340 | 6374 | 2068 | 7025 | 6200 | 695F | 746E | 7265 | 0070 |
| 0000717360 | 7354 | 206C | 6E49 | 6574 | 7072 | 6572 | 6574 | 0072 |
| 0000717400 | 696C | 656E | 2520 | 2C64 | 2520 | 3A73 | 4920 | 746E |
| 0000717420 | 7265 | 616E | 206C | 7265 | 6F72 | 0072 | 726F | 7520 |
| 0000717440 | 6573 | 2064 | 6E69 | 6F20 | 6874 | 7265 | 6520 | 7078 |
| 0000717460 | 6572 | 7373 | 6F69 | 206E | 6F63 | 746E | 7865 | 0074 |
| 0000717500 | 7566 | 636E | 6974 | 6E6F | 6020 | 7325 | 2027 | 6163 |
| 0000717520 | 6C6C | 6465 | 7720 | 7469 | 2068 | 7073 | 6361 | 2065 |
| 0000717540 | 6562 | 7774 | 6565 | 206E | 616E | 656D | 6120 | 646E |
| 0000717560 | 2820 | 0A2C | 7325 | 4100 | 5353 | 4749 | 204E | 7025 |
| 0000717600 | 6200 | 695F | 746E | 7265 | 0070 | 4F43 | 434E | 5441 |
| 0000717620 | 2520 | 0070 | 5F62 | 6E69 | 6574 | 7072 | 4E00 | 206F |
| 0000717640 | 6F6D | 6572 | 6D20 | 6D65 | 726F | 0079 | 206D | 7025 |
| 0000717660 | 2520 | 2075 | 255B | 756C | 005D | 5F62 | 656D | 726D |
| 0000717700 | 7065 | 4500 | 5551 | 4C41 | 2520 | 0070 | 5F62 | 6E69 |
| 0000717720 | 6574 | 7072 | 4E00 | 544F | 455F | 5551 | 4C41 | 2520 |
| 0000717740 | 0070 | 5F62 | 6E69 | 6574 | 7072 | 4C00 | 5345 | 5F53 |
| 0000717760 | 4854 | 4E41 | 2520 | 0070 | 5F62 | 6E69 | 6574 | 7072 |
| 0000720000 | 4700 | 4552 | 5441 | 5245 | 545F | 4148 | 204E | 7025 |
| 0000720020 | 6200 | 695F | 746E | 7265 | 0070 | 454C | 5353 | 545F |
| 0000720040 | 4148 | 5F4E | 5145 | 4155 | 204C | 7025 | 6200 | 695F |
| 0000720060 | 746E | 7265 | 0070 | 5247 | 4145 | 4554 | 5F52 | 4854 |

THU MAR 14 17:52:34 1991 TSLINT.DLL PAGE 252, LINE 14810

| | | | | | | | | |
|---|---|---|---|---|---|---|---|---|
| 0000720100 | 4E41 | 455F | 5551 | 4C41 | 2520 | 0070 | 5F62 | 6E69 |
| 0000720120 | 6574 | 7072 | 4500 | 5058 | 4E4F | 4E45 | 2054 | 7025 |
| 0000720140 | 6200 | 695F | 746E | 7265 | 0070 | 554D | 544C | 2520 |
| 0000720160 | 0070 | 5F62 | 6E69 | 6574 | 7072 | 4400 | 5649 | 4449 |
| 0000720200 | 2045 | 7025 | 6200 | 695F | 746E | 7265 | 0070 | 4F4D |
| 0000720220 | 5544 | 554C | 2053 | 7025 | 6200 | 695F | 746E | 7265 |
| 0000720240 | 0070 | 4C50 | 5355 | 2520 | 0070 | 5F62 | 6E69 | 6574 |
| 0000720260 | 7072 | 4D00 | 4E49 | 5355 | 2520 | 0070 | 5F62 | 6E69 |
| 0000720300 | 6574 | 7072 | 6900 | 6C6C | 6765 | 6C61 | 7420 | 7079 |
| 0000720320 | 2065 | 2528 | 2964 | 6920 | 206E | 7274 | 6565 | 655F |
| 0000720340 | 6176 | 006C | 5F72 | 7274 | 6565 | 655F | 6176 | 006C |
| 0000720360 | 6E69 | 0074 | 6E69 | 0074 | 7354 | 206C | 6E49 | 6574 |
| 0000720400 | 7072 | 6572 | 6574 | 0072 | 696C | 656E | 2520 | 2C64 |
| 0000720420 | 2520 | 3A73 | 4920 | 746E | 7265 | 616E | 206C | 7265 |
| 0000720440 | 6F72 | 0072 | 2066 | 7025 | 2520 | 2075 | 255B | 756C |
| 0000720460 | 005D | 5F62 | 656D | 726D | 7065 | 0000 | 7361 | 6973 |
| 0000720500 | 6E67 | 6E5F | 6D75 | 6562 | 0072 | 6E69 | 0074 | 6E69 |
| 0000720520 | 0074 | 7665 | 6C61 | 635F | 6E6F | 6964 | 6974 | 6E6F |
| 0000720540 | 4E00 | 444F | 2045 | 002A | 4F4E | 4544 | 2A20 | 2B00 |
| 0000720560 | 582D | 2520 | 0070 | 5F62 | 6E69 | 6574 | 7072 | 5800 |
| 0000720600 | 2520 | 2B70 | 002D | 5F62 | 6E69 | 6574 | 7072 | 4100 |
| 0000720620 | 5353 | 4749 | 5F4E | 7865 | 2070 | 7025 | 6200 | 695F |
| 0000720640 | 746E | 7265 | 0070 | 5341 | 4953 | 4E47 | 745F | 6D69 |
| 0000720660 | 7365 | 2520 | 0070 | 5F62 | 6E69 | 6574 | 7072 | 4100 |
| 0000720700 | 5353 | 4749 | 5F4E | 7571 | 746F | 6569 | 746E | 2520 |
| 0000720720 | 0070 | 5F62 | 6E69 | 6574 | 7072 | 4100 | 5353 | 4749 |
| 0000720740 | 5F4E | 6F6D | 2064 | 7025 | 6200 | 695F | 746E | 7265 |
| 0000720760 | 0070 | 5341 | 4953 | 4E47 | 705F | 756C | 2073 | 7025 |
| 0000721000 | 6200 | 695F | 746E | 7265 | 0070 | 5341 | 4953 | 4E47 |
| 0000721020 | 6D5F | 6E69 | 7375 | 2520 | 0070 | 5F62 | 6E69 | 6574 |
| 0000721040 | 7072 | 0000 | 706F | 615F | 7373 | 6769 | 006E | 6E69 |
| 0000721060 | 0074 | 6E69 | 0074 | 7079 | 0000 | 6F63 | 706D | 6C69 |
| 0000721100 | 0065 | 6E69 | 0074 | 6E69 | 0074 | 7374 | 696C | 746E |
| 0000721120 | 5200 | 7365 | 6174 | 7472 | 6E69 | 2067 | 7374 | 206C |
| 0000721140 | 6E69 | 6574 | 7072 | 6572 | 6574 | 2E72 | 2E2E | 6200 |
| 0000721160 | 645F | 6265 | 6775 | 0000 | 7374 | 5F6C | 6E69 | 6574 |
| 0000721200 | 7072 | 6572 | 6574 | 0072 | 6E69 | 0074 | 6E69 | 0074 |
| 0000721220 | 6F4C | 676E | 756A | 706D | 6120 | 6F62 | 7472 | 7420 |
| 0000721240 | 6761 | 7220 | 6165 | 6863 | 6465 | 6200 | 645F | 6265 |
| 0000721260 | 6775 | 4900 | 6C6C | 6765 | 6C61 | 6320 | 7361 | 0065 |
| 0000721300 | 5F62 | 7562 | 0067 | 7354 | 206C | 6E49 | 6574 | 7072 |
| 0000721320 | 6572 | 6574 | 0072 | 696C | 656E | 2520 | 2C64 | 2520 |
| 0000721340 | 3A73 | 4920 | 746E | 7265 | 616E | 206C | 7265 | 6F72 |
| 0000721360 | 0072 | 6F63 | 706D | 6C69 | 2065 | 6572 | 7574 | 6E72 |
| 0000721400 | 6465 | 203A | 7470 | 6920 | 2073 | 2E2E | 002E | 5F62 |
| 0000721420 | 6E69 | 6574 | 7072 | 6200 | 695F | 746E | 7265 | 0070 |
| 0000721440 | 7374 | 5F6C | 616D | 6E69 | 6C5F | 6F6F | 0070 | 6564 |
| 0000721460 | 7562 | 6767 | 7265 | 632E | 7400 | 6C73 | 702E | 4700 |
| 0000721500 | 455F | 5F57 | 0054 | 5F47 | 5745 | 545F | 5200 | 7365 |
| 0000721520 | 6D75 | 6E69 | 2067 | 5354 | 204C | 6874 | 6572 | 6461 |
| 0000721540 | 2E2E | 002E | 5F62 | 6564 | 7562 | 0067 | 439E | 43E2 |
| 0000721560 | 43A9 | 7B98 | 0000 | 0001 | 7374 | 5F6C | 6F67 | 6D63 |
| 0000721600 | 0064 | 6E69 | 0074 | 6E69 | 0074 | 7374 | 5F6C | 6261 |
| 0000721620 | 726F | 0074 | 6E69 | 0074 | 6E69 | 0074 | 7374 | 5F6C |
| 0000721640 | 6261 | 726F | 0074 | 6E69 | 0074 | 6E69 | 0074 | 7374 |
| 0000721660 | 5F6C | 7573 | 7073 | 6E65 | 5F64 | 7865 | 6365 | 4700 |
| 0000721700 | 455F | 5F57 | 0054 | 5F47 | 5745 | 545F | 7400 | 6C73 |
| 0000721720 | 725F | 7365 | 6174 | 7472 | 665F | 616C | 2067 | 3D3D |
| 0000721740 | 3020 | 6200 | 615F | 7373 | 7265 | 0074 | 7374 | 5F6C |

THU MAR 14 17:52:34 1991 TSLINT.DLL PAGE 253, LINE 14869

| | | | | | | | | |
|---|---|---|---|---|---|---|---|---|
| 0000721760 | 6261 | 726F | 5F74 | 6C66 | 6761 | 3D20 | 203D | 0030 |
| 0000722000 | 5F62 | 7361 | 6573 | 7472 | 7300 | 7375 | 6570 | 646E |
| 0000722020 | 665F | 616C | 2067 | 3D3D | 3120 | 6200 | 615F | 7373 |
| 0000722040 | 7265 | 0074 | 7553 | 7073 | 6E65 | 6964 | 676E | 7420 |
| 0000722060 | 6C73 | 7420 | 7268 | 6165 | 2E64 | 2E2E | 6200 | 645F |
| 0000722100 | 6265 | 6775 | 7400 | 6C73 | 7420 | 7268 | 6165 | 2064 |
| 0000722120 | 6572 | 7573 | 656D | 2064 | 2E2E | 002E | 5F62 | 6564 |
| 0000722140 | 7562 | 0067 | 6F4C | 676E | 756A | 706D | 6120 | 6F62 |
| 0000722160 | 7472 | 6E69 | 2067 | 2E2E | 002E | 5F62 | 6564 | 7562 |
| 0000722200 | 0067 | 7374 | 5F6C | 6863 | 6365 | 5F6B | 7473 | 7461 |
| 0000722220 | 0065 | 0000 | 6E69 | 0074 | 6E69 | 0074 | 7374 | 5F6C |
| 0000722240 | 6863 | 6365 | 5F6B | 7473 | 7461 | 2065 | 6572 | 7574 |
| 0000722260 | 6E72 | 6465 | 6120 | 7466 | 7265 | 6120 | 6F62 | 7472 |
| 0000722300 | 2120 | 6200 | 625F | 6775 | 5300 | 6574 | 2070 | 6E65 |
| 0000722320 | 6564 | 2064 | 202D | 6163 | 6C6C | 6E69 | 2067 | 6863 |
| 0000722340 | 6365 | 5F6B | 7473 | 7461 | 2065 | 2E2E | 202E | 6200 |
| 0000722360 | 645F | 6265 | 6775 | 0000 | 7374 | 5F6C | 6863 | 6365 |
| 0000722400 | 5F6B | 6564 | 7562 | 0067 | 4F42 | 4C4F | 4200 | 4F4F |
| 0000722420 | 004C | 6E41 | 6D69 | 7461 | 2065 | 3E2D | 7320 | 7465 |
| 0000722440 | 6974 | 676E | 6520 | 206D | 6F74 | 2520 | 0064 | 5F62 |
| 0000722460 | 6564 | 7562 | 0067 | 7374 | 5F6C | 7473 | 7065 | 625F |
| 0000722500 | 6572 | 6B61 | 6900 | 746E | 6900 | 746E | 0000 | 7374 |
| 0000722520 | 5F6C | 6F6C | 676E | 6D6A | 0070 | 6E69 | 0074 | 6E69 |
| 0000722540 | 0074 | 7374 | 5F6C | 6572 | 7473 | 7261 | 5F74 | 6E69 |
| 0000722560 | 6574 | 7072 | 6572 | 6574 | 0072 | 6E69 | 0074 | 6E69 |
| 0000722600 | 0074 | 7374 | 5F6C | 6168 | 646E | 656C | 645F | 7369 |
| 0000722620 | 6C70 | 7961 | 0000 | 7374 | 656C | 7272 | 632E | 7400 |
| 0000722640 | 6C73 | 702E | 6900 | 746E | 6900 | 746E | 2800 | 4E45 |
| 0000722660 | 2044 | 464F | 4620 | 4C49 | 2945 | 2500 | 2073 | 2528 |
| 0000722700 | 2964 | 0A3A | 7325 | 250A | 2A2E | 0073 | 4606 | 4642 |
| 0000722720 | 460F | 7BA2 | 0000 | 7374 | 5F6C | 7265 | 6F72 | 0072 |
| 0000722740 | 6E69 | 0074 | 6E69 | 0074 | 7374 | 5F6C | 7265 | 6F72 |
| 0000722760 | 5F72 | 6F63 | 6564 | 6900 | 746E | 6900 | 746E | 0000 |
| 0000723000 | 7374 | 5F6C | 736D | 0067 | 6E69 | 0074 | 6E69 | 0074 |
| 0000723020 | 6157 | 6E72 | 6E69 | 3A67 | 2520 | 0073 | 6177 | 6E72 |
| 0000723040 | 6E69 | 0067 | 6E69 | 0074 | 6E69 | 0074 | 6157 | 6E72 |
| 0000723060 | 6E69 | 3A67 | 2520 | 0073 | 6166 | 6174 | 006C | 6E69 |
| 0000723100 | 0074 | 6E69 | 0074 | 7374 | 5F6C | 7979 | 7265 | 6F72 |
| 0000723120 | 0072 | 7374 | 5F74 | 6163 | 6C6C | 632E | 7400 | 6C73 |
| 0000723140 | 702E | 4700 | 455F | 5F57 | 0054 | 5F47 | 5745 | 545F |
| 0000723160 | 4700 | 7465 | 6974 | 676E | 7420 | 7365 | 2074 | 7325 |
| 0000723200 | 6200 | 615F | 6772 | 0073 | 46C2 | 46FE | 46CD | 463E |
| 0000723220 | 7374 | 5F6C | 6567 | 5F74 | 6574 | 7473 | 4700 | 455F |
| 0000723240 | 5F57 | 0054 | 5F47 | 5745 | 545F | 0000 | 7374 | 5F6C |
| 0000723260 | 6567 | 5F74 | 7562 | 6666 | 7265 | 4700 | 455F | 5F57 |
| 0000723300 | 0054 | 5F47 | 5745 | 545F | 5200 | 7365 | 6F74 | 6972 |
| 0000723320 | 676E | 7420 | 7365 | 2074 | 7325 | 6200 | 615F | 6772 |
| 0000723340 | 0073 | 7374 | 5F6C | 6572 | 7473 | 726F | 5F65 | 6574 |
| 0000723360 | 7473 | 0000 | 7374 | 746C | 2E63 | 0063 | 7374 | 2E6C |
| 0000723400 | 0070 | 4F4E | 4544 | 2A20 | 4E00 | 444F | 2045 | 002A |
| 0000723420 | 6574 | 7473 | 2520 | 2073 | 6163 | 6C6C | 6465 | 000A |
| 0000723440 | 5F62 | 6564 | 7562 | 0067 | 6173 | 6976 | 676E | 6320 |
| 0000723460 | 6E6F | 6574 | 7478 | 2E2E | 002E | 5F62 | 6564 | 7562 |
| 0000723500 | 0067 | 6372 | 2120 | 203D | 312D | 6200 | 615F | 7373 |
| 0000723520 | 7265 | 0074 | 6372 | 2120 | 203D | 312D | 6200 | 615F |
| 0000723540 | 7373 | 7265 | 0074 | 6F43 | 746E | 7865 | 3A74 | 5320 |
| 0000723560 | 756F | 6372 | 2065 | 203D | 7325 | 202C | 6F73 | 7275 |
| 0000723600 | 6563 | 696C | 656E | 3D20 | 2520 | 2C64 | 6520 | 206D |
| 0000723620 | 203D | 6425 | 202C | 6D63 | 3D20 | 2520 | 2C64 | 6C20 |

THU MAR 14 17:52:34 1991 TSLINT.DLL PAGE 254, LINE 14928

```
0000723640  636F  206B  203D  2520  0064  5F62  6564  7562
0000723660  0067  6547  7474  6E69  2067  6574  7473  2E2E
0000723700  002E  5F62  6564  7562  0067  754E  626D  7265
0000723720  6F20  2066  6170  6172  656D  6574  7372  6920
0000723740  3A73  6320  756F  746E  3D20  2520  0064  5F62
0000723760  6564  7562  0067  6544  6C63  7261  6E69  2067
0000724000  6574  7473  7020  7261  6D61  7465  7265  2073
0000724020  6E69  7420  6568  6820  7361  2068  6174  6C62
0000724040  2E65  2E2E  6200  645F  6265  6775  4100  6C6C
0000724060  636F  7461  6E69  2067  6574  7473  6C20  636F
0000724100  6C61  7320  6174  6B63  2E2E  002E  5F62  6564
0000724120  7562  0067  6F4E  6D20  726F  2065  656D  6F6D
0000724140  7972  6D00  2520  2070  7525  5B20  6C25  5D75
0000724160  6200  6D5F  6D65  6572  0070  7550  6873  6E69
0000724200  2067  7261  7367  6F20  206E  6F6C  6163  206C
0000724220  7473  6361  2E6B  2E2E  6200  645F  6265  6775
0000724240  4300  756F  746E  3D20  2520  2C64  4E20  646F
0000724260  5F65  6170  6172  5F6D  696C  7473  6200  645F
0000724300  6265  6775  4100  7272  7961  4300  756F  746E
0000724320  3D20  2520  2C64  4F20  6874  7265  6E20  646F
0000724340  0065  5F62  6564  7562  0067  6574  7473  6320
0000724360  7361  2065  7325  203A  6F74  206F  616D  796E
0000724400  6120  6772  6D75  6E65  7374  2E00  6300  6C61
0000724420  696C  676E  7420  6568  6D20  6961  206E  6F6C
0000724440  706F  6200  695F  746E  7265  0070  6F50  6970
0000724460  676E  7420  6568  7020  7261  6D61  7465  7265
0000724500  2073  666F  7420  6568  6820  7361  7468  6261
0000724520  2E2E  002E  5F62  6564  7562  0067  6552  7473
0000724540  726F  6E69  2067  6574  7473  2520  0073  5F62
0000724560  6564  7562  0067  2066  7025  2520  2075  255B
0000724600  756C  005D  5F62  656D  726D  7065  0000  4764
0000724620  4A04  476C  7BCC  6574  7473  635F  6C61  006C
0000724640  4F4E  4544  2A20  4E00  444F  2045  002A  7374
0000724660  5F6C  616D  656B  745F  7365  5F74  6170  6172
0000724700  5F6D  696C  7473  4E00  444F  2045  002A  4F4E
0000724720  4544  2A20  7000  7261  6D61  2320  6425  6920
0000724740  3A73  2520  0073  5F62  6564  7562  0067  6F4E
0000724760  6D20  726F  2065  656D  6F6D  7972  6D00  2520
0000725000  2070  7525  5B20  6C25  5D75  6200  6D5F  6D65
0000725020  6572  0070  7374  5F6C  616D  656B  705F  7261
0000725040  6D61  0000  7374  636C  6C61  2E6C  0063  7374
0000725060  2E6C  0070  6E69  0074  6E69  0074  0028  4A94
0000725100  4AB4  4A9E  4A00  003F  0000  0000  0000  0000
0000725120  0000  0000  0000  0000  0000  0000  0000  0000
*
0000725160  0000  0000  0000  0000  FFFF  003F  0000  0000
0000725200  0000  0000  0000  0000  0000  0000  0000  0000
*
0000725320  0000  0000  0000  0000  0000  0000  0000  003F
0000725340  0000  0000  0000  0000  0000  0000  0000  0000
*
0000725420  0000  7374  5F6C  6163  6C6C  735F  6174  7472
0000725440  6900  746E  6900  746E  4100  6464  7020  7261
0000725460  6D61  2520  0073  5F62  6163  6C6C  0073  202C
0000725500  0000  7374  5F6C  6163  6C6C  615F  6464  705F
0000725520  7261  6D61  6900  746E  6900  746E  2800  2000
0000725540  0029  2074  3D21  2820  7628  696F  2064  292A
0000725560  2930  6200  615F  7373  7265  0074  6143  6C6C
0000725600  3D20  2520  2073  6425  2520  0073  5F62  6163
```

THU MAR 14 17:52:34 1991 TSLINT.DLL PAGE 255, LINE 14987

| | | | | | | | | |
|---|---|---|---|---|---|---|---|---|
| 0000725620 | 6C6C | 0073 | 7374 | 5F6C | 6163 | 6C6C | 655F | 646E |
| 0000725640 | 6900 | 746E | 6900 | 746E | 7400 | 6C73 | 7320 | 6174 |
| 0000725660 | 6B63 | 6320 | 6C61 | 206C | 766F | 7265 | 6C66 | 776F |
| 0000725700 | 2120 | 0021 | 5F62 | 7562 | 0067 | 2028 | 0029 | 7473 |
| 0000725720 | 6372 | 706D | 6628 | 6C69 | 2C65 | 6320 | 6C61 | 5F6C |
| 0000725740 | 7473 | 6361 | 5B6B | 7473 | 6361 | 5F6B | 6973 | 657A |
| 0000725760 | 2E5D | 6966 | 656C | 2029 | 3D3D | 3020 | 6200 | 615F |
| 0000726000 | 7373 | 7265 | 0074 | 7550 | 6873 | 203A | 6143 | 6C6C |
| 0000726020 | 7473 | 6361 | 5B6B | 6425 | 205D | 203D | 257B | 2073 |
| 0000726040 | 6425 | 2520 | 2573 | 7D73 | 6200 | 635F | 6C61 | 736C |
| 0000726060 | 0000 | 7374 | 5F6C | 6163 | 6C6C | 705F | 7375 | 0068 |
| 0000726100 | 6E69 | 0074 | 6E69 | 0074 | 7374 | 206C | 7473 | 6361 |
| 0000726120 | 206B | 6163 | 6C6C | 7520 | 646E | 6665 | 6F6C | 2077 |
| 0000726140 | 2121 | 6200 | 625F | 6775 | 5000 | 706F | 203A | 6143 |
| 0000726160 | 6C6C | 7473 | 6361 | 5B6B | 6425 | 205D | 203D | 257B |
| 0000726200 | 2073 | 6425 | 2520 | 2573 | 7D73 | 6200 | 635F | 6C61 |
| 0000726220 | 736C | 0000 | 7374 | 5F6C | 6163 | 6C6C | 705F | 706F |
| 0000726240 | 6900 | 746E | 6900 | 746E | 4500 | 706D | 7974 | 6320 |
| 0000726260 | 6C61 | 206C | 6863 | 6961 | 006E | 5F62 | 6163 | 6C6C |
| 0000726300 | 0073 | 7374 | 5F6C | 6567 | 5F74 | 6163 | 6C6C | 635F |
| 0000726320 | 6168 | 6E69 | 6900 | 746E | 6900 | 746E | 0000 | 7374 |
| 0000726340 | 5F6C | 6163 | 6C6C | 725F | 7365 | 6174 | 7472 | 0000 |
| 0000726360 | 6C68 | 656D | 6D6D | 7267 | 632E | 7400 | 6C73 | 702E |
| 0000726400 | 6900 | 746E | 6900 | 746E | 0000 | 4D60 | 4D80 | 4D6B |
| 0000726420 | 4AB0 | 0000 | 0000 | 0000 | 0000 | 6C68 | 635F | 6572 |
| 0000726440 | 7461 | 0065 | 6F76 | 6469 | 2A20 | 7600 | 696F | 2064 |
| 0000726460 | 002A | 654E | 6167 | 6974 | 6576 | 6C20 | 7665 | 6C65 |
| 0000726500 | 2520 | 0064 | 5F62 | 7562 | 0067 | 6E69 | 6176 | 696C |
| 0000726520 | 2064 | 6973 | 657A | 3D20 | 2520 | 0064 | 5F62 | 7562 |
| 0000726540 | 0067 | 6C68 | 615F | 6C6C | 636F | 203A | 6C41 | 6F6C |
| 0000726560 | 6163 | 6974 | 676E | 2520 | 2064 | 7962 | 6574 | 2073 |
| 0000726600 | 7974 | 6570 | 2520 | 2C64 | 6C20 | 7665 | 6C65 | 2520 |
| 0000726620 | 0064 | 5F62 | 656D | 006D | 654D | 6F6D | 7972 | 6120 |
| 0000726640 | 6C6C | 636F | 7461 | 6F69 | 206E | 6166 | 6C69 | 7275 |
| 0000726660 | 0065 | 5F62 | 7265 | 6F72 | 0072 | 656D | 736D | 7A69 |
| 0000726700 | 0065 | 6C68 | 615F | 6C6C | 636F | 7600 | 696F | 2064 |
| 0000726720 | 002A | 6F76 | 6469 | 2A20 | 4E00 | 6765 | 7461 | 7669 |
| 0000726740 | 2065 | 656C | 6576 | 206C | 6425 | 6200 | 625F | 6775 |
| 0000726760 | 6800 | 5F6C | 6572 | 6C61 | 6F6C | 3A63 | 6920 | 766E |
| 0000727000 | 6C61 | 6469 | 7020 | 696F | 746E | 7265 | 2520 | 2070 |
| 0000727020 | 6967 | 6576 | 006E | 5F62 | 7265 | 6F72 | 0072 | 6C68 |
| 0000727040 | 725F | 6165 | 6C6C | 636F | 203A | 6552 | 6C6C | 636F |
| 0000727060 | 7461 | 6E69 | 2067 | 7025 | 6620 | 6F72 | 206D | 6425 |
| 0000727100 | 7420 | 206F | 6425 | 6220 | 7479 | 7365 | 7420 | 7079 |
| 0000727120 | 2065 | 6425 | 6200 | 6D5F | 6D65 | 2A00 | 2A2A | 2A2A |
| 0000727140 | 2A2A | 2A2A | 7220 | 6165 | 6C6C | 636F | 6620 | 6961 |
| 0000727160 | 656C | 2064 | 2021 | 2A2A | 2A2A | 2A2A | 2A2A | 2A2A |
| 0000727200 | 002A | 5F62 | 7265 | 6F72 | 0072 | 656D | 736D | 7A69 |
| 0000727220 | 0065 | 6C68 | 725F | 6165 | 6C6C | 636F | 6900 | 746E |
| 0000727240 | 6900 | 746E | 6800 | 5F6C | 7266 | 6565 | 2D20 | 4E20 |
| 0000727260 | 4C55 | 204C | 6F70 | 6E69 | 6574 | 0072 | 5F62 | 7265 |
| 0000727300 | 6F72 | 0072 | 6C68 | 665F | 6572 | 3A65 | 6620 | 6572 |
| 0000727320 | 2065 | 7025 | 6200 | 6D5F | 6D65 | 6800 | 5F6C | 7266 |
| 0000727340 | 6565 | 203A | 6E69 | 6176 | 696C | 2064 | 6F70 | 6E69 |
| 0000727360 | 6574 | 2072 | 7025 | 6720 | 7669 | 6E65 | 6200 | 625F |
| 0000727400 | 6775 | 2A00 | 2A2A | 2A2A | 6820 | 5F6C | 7266 | 6565 |
| 0000727420 | 203A | 6E69 | 6176 | 696C | 2064 | 726F | 6120 | 726C |
| 0000727440 | 6165 | 7964 | 6620 | 6572 | 6465 | 203A | 7025 | 6200 |
| 0000727460 | 625F | 6775 | 6200 | 6D5F | 6D65 | 657A | 6F72 | 5A00 |

THU MAR 14 17:52:34 1991 TSLINT.DLL PAGE 256, LINE 15046

| | | | | | | | | |
|---|---|---|---|---|---|---|---|---|
| 0000727500 | 7265 | 206F | 7266 | 6565 | 2064 | 656D | 6F6D | 7972 |
| 0000727520 | 000A | 656D | 736D | 7A69 | 0065 | 6C68 | 665F | 6572 |
| 0000727540 | 0065 | 6E69 | 0074 | 6E69 | 0074 | 6C68 | 635F | 6C6F |
| 0000727560 | 656C | 7463 | 675F | 7261 | 6162 | 6567 | 203A | 7974 |
| 0000727600 | 6570 | 6920 | 2073 | 6425 | 202C | 656C | 6576 | 206C |
| 0000727620 | 7369 | 2520 | 0064 | 5F62 | 656D | 006D | 6F4E | 6874 |
| 0000727640 | 6E69 | 2067 | 6F74 | 6620 | 6572 | 0065 | 5F62 | 656D |
| 0000727660 | 006D | 6C68 | 635F | 6C6F | 656C | 7463 | 675F | 7261 |
| 0000727700 | 6162 | 6567 | 7500 | 736E | 6769 | 656E | 2064 | 6F6C |
| 0000727720 | 676E | 7500 | 736E | 6769 | 656E | 2064 | 6F6C | 676E |
| 0000727740 | 0000 | 6C68 | 6D5F | 6D65 | 6973 | 657A | 7300 | 7A69 |
| 0000727760 | 5F65 | 0074 | 6973 | 657A | 745F | 0000 | 6C68 | 735F |
| 0000730000 | 7A69 | 0065 | 6E75 | 6973 | 6E67 | 6465 | 6C20 | 6E6F |
| 0000730020 | 0067 | 6E75 | 6973 | 6E67 | 6465 | 6C20 | 6E6F | 0067 |
| 0000730040 | 6C68 | 635F | 6C61 | 5F63 | 6973 | 657A | 0000 | 7761 |
| 0000730060 | 2E6B | 0079 | 7374 | 2E6C | 0070 | 6E69 | 0074 | 6E69 |
| 0000730100 | 0074 | 6370 | 6179 | 6363 | 6920 | 746E | 7265 | 616E |
| 0000730120 | 206C | 7473 | 6361 | 206B | 766F | 7265 | 6C66 | 776F |
| 0000730140 | 7700 | 4300 | 6E61 | 7427 | 6F20 | 6570 | 206E | 2074 |
| 0000730160 | 6966 | 656C | 203A | 7325 | 000A | 4524 | 504F | 2500 |
| 0000730200 | 2073 | 0A00 | 7300 | 6E79 | 6174 | 2078 | 7265 | 6F72 |
| 0000730220 | 0072 | 0077 | 6143 | 276E | 2074 | 706F | 6E65 | 7420 |
| 0000730240 | 6620 | 6C69 | 3A65 | 2520 | 0A73 | 2400 | 4F45 | 0050 |
| 0000730260 | 7325 | 0020 | 000A | 7245 | 6F72 | 2072 | 6E69 | 6620 |
| 0000730300 | 6E75 | 7463 | 6F69 | 206E | 6564 | 6966 | 696E | 6974 |
| 0000730320 | 6E6F | 4E00 | 206F | 6F6D | 6572 | 6D20 | 6D65 | 726F |
| 0000730340 | 0079 | 206D | 7025 | 2520 | 2075 | 255B | 756C | 005D |
| 0000730360 | 5F62 | 656D | 726D | 7065 | 7300 | 6D74 | 2074 | 3E2D |
| 0000730400 | 6520 | 7078 | 6572 | 7373 | 6F69 | 5F6E | 7473 | 746D |
| 0000730420 | 6200 | 795F | 6361 | 0063 | 7473 | 746D | 2D20 | 203E |
| 0000730440 | 6F63 | 706D | 6E75 | 5F64 | 7473 | 746D | 6200 | 795F |
| 0000730460 | 6361 | 0063 | 7473 | 746D | 2D20 | 203E | 6669 | 735F |
| 0000730500 | 6174 | 6574 | 656D | 746E | 6200 | 795F | 6361 | 0063 |
| 0000730520 | 7473 | 746D | 2D20 | 203E | 7469 | 7265 | 7461 | 6F69 |
| 0000730540 | 5F6E | 7473 | 746D | 6200 | 795F | 6361 | 0063 | 7473 |
| 0000730560 | 746D | 2D20 | 203E | 6574 | 7473 | 6320 | 6C61 | 206C |
| 0000730600 | 7473 | 7461 | 6D65 | 6E65 | 0074 | 5F62 | 6179 | 6363 |
| 0000730620 | 7300 | 6D74 | 2074 | 3E2D | 6520 | 7272 | 726F | 6200 |
| 0000730640 | 795F | 6361 | 0063 | 7953 | 746E | 7861 | 6520 | 7272 |
| 0000730660 | 726F | 6500 | 7078 | 6572 | 7373 | 6F69 | 5F6E | 7473 |
| 0000730700 | 746D | 2D20 | 203E | 3B27 | 0027 | 5F62 | 6179 | 6363 |
| 0000730720 | 6500 | 7078 | 6572 | 7373 | 6F69 | 5F6E | 7473 | 746D |
| 0000730740 | 2D20 | 203E | 7865 | 2070 | 3B27 | 0027 | 5F62 | 6179 |
| 0000730760 | 6363 | 6300 | 6D6F | 7570 | 646E | 735F | 6D74 | 2074 |
| 0000731000 | 3E2D | 7B20 | 7320 | 6174 | 6574 | 656D | 746E | 2073 |
| 0000731020 | 007D | 5F62 | 6179 | 6363 | 6900 | 5F66 | 7473 | 7461 |
| 0000731040 | 6D65 | 6E65 | 2074 | 3E2D | 4920 | 2046 | 6173 | 6576 |
| 0000731060 | 2820 | 6520 | 7078 | 2920 | 7320 | 6D74 | 0074 | 5F62 |
| 0000731100 | 6179 | 6363 | 6900 | 5F66 | 7473 | 7461 | 6D65 | 6E65 |
| 0000731120 | 2074 | 3E2D | 4920 | 2046 | 6173 | 6576 | 2820 | 6520 |
| 0000731140 | 7078 | 2920 | 7320 | 6D74 | 2074 | 4C45 | 4553 | 7320 |
| 0000731160 | 6D74 | 0074 | 5F62 | 6179 | 6363 | 6900 | 6574 | 6172 |
| 0000731200 | 6974 | 6E6F | 735F | 6D74 | 2074 | 3E2D | 5720 | 4948 |
| 0000731220 | 454C | 2820 | 2965 | 7320 | 6200 | 795F | 6361 | 0063 |
| 0000731240 | 6C49 | 656C | 6167 | 206C | 6877 | 6C69 | 2065 | 6F6C |
| 0000731260 | 706F | 6520 | 7078 | 6572 | 7373 | 6F69 | 006E | 6C49 |
| 0000731300 | 656C | 6167 | 206C | 6F66 | 2072 | 7473 | 7461 | 6D65 |
| 0000731320 | 6E65 | 0074 | 6170 | 6172 | 5F6D | 696C | 7473 | 2D20 |
| 0000731340 | 203E | 414E | 454D | 2820 | 7325 | 0029 | 5F62 | 6179 |

THU MAR 14 17:52:34 1991 TSLINT.DLL PAGE 257, LINE 15105

| | | | | | | | | |
|---|---|---|---|---|---|---|---|---|
| 0000731360 | 6363 | 7000 | 7261 | 6D61 | 6C5F | 7369 | 2074 | 3E2D |
| 0000731400 | 7020 | 7261 | 6D61 | 6C5F | 7369 | 2074 | 202C | 414E |
| 0000731420 | 454D | 282D | 7325 | 0029 | 5F62 | 6179 | 6363 | 4500 |
| 0000731440 | 7272 | 726F | 6920 | 206E | 6170 | 6172 | 656D | 6574 |
| 0000731460 | 2072 | 696C | 7473 | 4500 | 7272 | 726F | 6920 | 206E |
| 0000731500 | 6170 | 6172 | 656D | 6574 | 2072 | 696C | 7473 | 4500 |
| 0000731520 | 7272 | 726F | 6920 | 206E | 6170 | 6172 | 656D | 6574 |
| 0000731540 | 2072 | 696C | 7473 | 4500 | 7272 | 726F | 6920 | 206E |
| 0000731560 | 7865 | 7270 | 7365 | 6973 | 6E6F | 6C20 | 7369 | 0074 |
| 0000731600 | 7245 | 6F72 | 2072 | 6E69 | 6520 | 7078 | 6572 | 7373 |
| 0000731620 | 6F69 | 206E | 696C | 7473 | 4500 | 7272 | 726F | 6920 |
| 0000731640 | 206E | 7865 | 7270 | 7365 | 6973 | 6E6F | 4500 | 7272 |
| 0000731660 | 726F | 6920 | 206E | 7865 | 7270 | 7365 | 6973 | 6E6F |
| 0000731700 | 6C20 | 7369 | 0074 | 7245 | 6F72 | 2072 | 6E69 | 6520 |
| 0000731720 | 7078 | 6572 | 7373 | 6F69 | 206E | 696C | 7473 | 4500 |
| 0000731740 | 7272 | 726F | 6920 | 206E | 7865 | 7270 | 7365 | 6973 |
| 0000731760 | 6E6F | 6500 | 7078 | 2D20 | 203E | 6176 | 6972 | 6261 |
| 0000732000 | 656C | 4120 | 5353 | 4749 | 4F4E | 2050 | 7865 | 0070 |
| 0000732020 | 5F62 | 6179 | 6363 | 6500 | 7078 | 2D20 | 203E | 7865 |
| 0000732040 | 2070 | 4E41 | 2044 | 7865 | 0070 | 5F62 | 6179 | 6363 |
| 0000732060 | 6500 | 7078 | 2D20 | 203E | 7865 | 2070 | 524F | 6520 |
| 0000732100 | 7078 | 6200 | 795F | 6361 | 0063 | 7865 | 2070 | 3E2D |
| 0000732120 | 6520 | 7078 | 2720 | 273C | 6520 | 7078 | 6200 | 795F |
| 0000732140 | 6361 | 0063 | 7974 | 6570 | 0000 | 509E | 54E0 | 50A4 |
| 0000732160 | 7C02 | 0000 | FFFF | 0000 | FFFF | 0001 | 0000 | FFFF |
| 0000732200 | FFFE | 0000 | FFFF | 0073 | 010A | 0000 | FFFE | 0067 |
| 0000732220 | FFFF | 0076 | 0107 | 0000 | 003C | 0000 | 003E | 0000 |
| 0000732240 | 007C | 0000 | FFFE | 0069 | FFFF | 0077 | 0107 | 0000 |
| 0000732260 | 003C | 0000 | 003E | 0000 | 007C | 0000 | FFFE | 006A |
| 0000732300 | FFFF | 0078 | 0107 | 0000 | 003C | 0000 | 003E | 0000 |
| 0000732320 | 007C | 0000 | FFFE | 006B | FFFF | 00E6 | 010A | 0000 |
| 0000732340 | FFFE | 0074 | FFFF | 00E8 | 0107 | 0000 | FFFE | 0076 |
| 0000732360 | 0000 | 003F | 00C0 | 0011 | 0051 | 0052 | 0026 | 00C6 |
| 0000732400 | 0050 | 005F | 006F | 00AD | 010C | 0062 | 00D3 | 008A |
| 0000732420 | 002F | 008B | 002E | 0090 | 0011 | 00B4 | 010B | 010A |
| 0000732440 | 0026 | 0048 | 004A | 0091 | 00D2 | 00D1 | 0090 | 0051 |
| 0000732460 | 0052 | 0054 | 002F | 00FC | 002E | 0051 | 0052 | 0090 |
| 0000732500 | 0090 | 00EE | 00E7 | 0090 | 0058 | 0075 | 006E | 0032 |
| 0000732520 | 0090 | 0034 | 00B3 | 0011 | 0093 | 0022 | 0056 | 0059 |
| 0000732540 | 005F | 0070 | 0071 | 0073 | 0060 | 0076 | 0077 | 0078 |
| 0000732560 | 0079 | 008D | 0011 | 0060 | 00CE | 0026 | 006C | 0094 |
| 0000732600 | 0011 | 0041 | 0125 | 00F8 | 001F | 0119 | 0118 | 002F |
| 0000732620 | 0026 | 002E | 008C | 00B6 | 0116 | 00F4 | 00DD | 0062 |
| 0000732640 | 00C9 | 004D | 002F | 0072 | 002E | 004C | 0040 | 0010 |
| 0000732660 | 0090 | 009D | 009D | 0091 | 009F | 00FB | 00C3 | 00A2 |
| 0000732700 | 00A3 | 00C2 | 00A6 | 0060 | 00AD | 0011 | 009D | 0026 |
| 0000732720 | 007F | 007D | 007C | 0066 | 0065 | FFFF | 001F | 0124 |
| 0000732740 | FFFF | 002F | 0012 | 002E | 0026 | 0044 | 00AA | 00AB |
| 0000732760 | 0031 | 00AF | 00A8 | 001F | 0054 | 0033 | 002F | 005C |
| 0000733000 | 002E | 0010 | 007B | 006D | 005A | 001C | 00CF | 00C4 |
| 0000733020 | 006B | 005B | 0045 | 0046 | 0047 | FFFF | 000A | 0009 |
| 0000733040 | 0006 | 0026 | 004E | 004F | 000D | 0026 | 000B | 0022 |
| 0000733060 | 001F | 0043 | 009D | 002F | 001F | 002E | 00A7 | 002F |
| 0000733100 | 0007 | 002E | 0008 | 00D4 | 0004 | 0083 | 0084 | 00D0 |
| 0000733120 | FFFF | 005C | 00DA | 0010 | FFFF | 00A4 | 005A | 005D |
| 0000733140 | 003C | 005E | 003D | 005B | FFFF | 0064 | 0001 | 00C1 |
| 0000733160 | 0059 | 00A1 | 0003 | 0030 | 009D | 009D | 00B7 | 0005 |
| 0000733200 | 0000 | 0022 | 0000 | 0000 | 0000 | 009D | 009D | 00F3 |
| 0000733220 | 0000 | 0000 | 0026 | 0000 | 0000 | 0000 | 0000 | 0011 |

THU MAR 14 17:52:34 1991 TSLINT.DLL PAGE 258, LINE 15164

| | | | | | | | | |
|---|---|---|---|---|---|---|---|---|
| 0000733240 | 0011 | 001F | 0091 | 00FD | 002F | 0100 | 002E | 00B5 |
| 0000733260 | 0000 | 0000 | 0000 | 00CB | 00CC | 00CD | 0025 | 008E |
| 0000733300 | 002D | 0000 | 0059 | 0000 | 00BD | 003C | 0000 | 003D |
| 0000733320 | 003E | 0000 | 008E | 0022 | 0000 | 0000 | 00EB | 0000 |
| 0000733340 | 0036 | 0000 | 0000 | 008E | 00F7 | 010D | 0026 | 008E |
| 0000733360 | 0110 | 0112 | 00D8 | 0011 | 00B8 | 001F | 00BC | 009B |
| 0000733400 | 002F | 0000 | 002E | 002A | 002B | 0000 | 0011 | 0102 |
| 0000733420 | 0011 | 011D | 00F6 | 0011 | 0000 | 0011 | 0011 | 00E5 |
| 0000733440 | 010F | 003C | 0000 | 003D | 003E | 002A | 002B | 0000 |
| 0000733460 | 0011 | 0011 | 0000 | 0011 | 000E | 0025 | 0000 | 002D |
| 0000733500 | 0011 | 00F2 | 002C | 00D7 | 0000 | 0036 | 0000 | 0000 |
| 0000733520 | 0025 | 0000 | 002D | 0013 | 0000 | 0018 | 000C | 0000 |
| 0000733540 | 0014 | 0015 | 0016 | 001A | 001B | 0023 | 0024 | 0000 |
| 0000733560 | 0017 | 0000 | 0020 | 0028 | 0029 | 0000 | 001D | 0019 |
| 0000733600 | 0000 | 009C | 002A | 002B | 0027 | 0000 | 000E | 0025 |
| 0000733620 | 00BC | 002D | 0000 | 0000 | 002C | 002A | 002B | 0000 |
| 0000733640 | 0000 | 0036 | 0000 | 0000 | 0025 | 0013 | 002D | 0018 |
| 0000733660 | 000C | 0000 | 0014 | 0015 | 0016 | 001A | 001B | 0023 |
| 0000733700 | 0024 | 0053 | 0017 | 000F | 0020 | 0028 | 0029 | 0000 |
| 0000733720 | 001D | 0019 | 0000 | 0000 | 002A | 002B | 0027 | 0000 |
| 0000733740 | 000E | 0025 | 0000 | 002D | 003A | 0025 | 002C | 002D |
| 0000733760 | 0000 | 002A | 002B | 003B | 0000 | 0000 | 0000 | 0013 |
| 0000734000 | 0000 | 0018 | 000C | 0000 | 0014 | 0015 | 0016 | 001A |
| 0000734020 | 001B | 0023 | 0024 | 0000 | 0017 | 0000 | 0020 | 0028 |
| 0000734040 | 0029 | 0000 | 001D | 0019 | 0000 | 003A | 002A | 002B |
| 0000734060 | 0027 | 0000 | 002A | 002B | 0026 | 0000 | 0000 | 0000 |
| 0000734100 | 00CA | 0000 | 009E | 001F | 0000 | 0000 | 002F | 0000 |
| 0000734120 | 002E | 0000 | 0025 | 0000 | 002D | 0000 | 00A5 | 002C |
| 0000734140 | 003B | 0000 | 0000 | 0039 | 0000 | 0000 | 00FF | 003C |
| 0000734160 | 0000 | 003D | 003E | 0000 | 00BF | 0000 | 0000 | 0000 |
| 0000734200 | 0000 | 0000 | 00EC | 00ED | 00B2 | 0000 | 0000 | 0020 |
| 0000734220 | 0028 | 0029 | 003A | 0026 | 0000 | 0037 | 0038 | 002A |
| 0000734240 | 002B | 0027 | 001F | 0000 | 0000 | 002F | 0025 | 002E |
| 0000734260 | 002D | 0000 | 0000 | 002C | 003B | 0000 | 0000 | 0039 |
| 0000734300 | 0000 | 0000 | 0000 | 0000 | 0000 | 00D9 | 003C | 0000 |
| 0000734320 | 003D | 003E | 0000 | 0000 | 0000 | 0000 | 0000 | 0000 |
| 0000734340 | 0000 | 0000 | 0000 | 0020 | 0028 | 0029 | 003A | 0036 |
| 0000734360 | 0026 | 0037 | 0038 | 002A | 002B | 0027 | 0000 | 001F |
| 0000734400 | 0000 | 0000 | 002F | 0090 | 002E | 0026 | 0000 | 0000 |
| 0000734420 | 0000 | 0000 | 0000 | 0085 | 001F | 00F0 | 00F1 | 002F |
| 0000734440 | 0000 | 002E | 0000 | 003C | 0000 | 003D | 003E | 0000 |
| 0000734460 | 0000 | 0000 | 0000 | 0000 | 0000 | 0000 | 00A9 | 0000 |
| 0000734500 | 003C | 0000 | 003D | 003E | 0000 | 0000 | 0036 | 0000 |
| 0000734520 | 0000 | 0000 | 0000 | 0000 | 0000 | 0026 | 0000 | 0000 |
| 0000734540 | 0000 | 0000 | 0000 | 0000 | 001F | 0000 | 0000 | 002F |
| 0000734560 | 0000 | 002E | 0026 | 0000 | 0000 | 0000 | 0000 | 0000 |
| 0000734600 | 0000 | 001F | 0000 | 0000 | 002F | 0000 | 002E | 0081 |
| 0000734620 | 003C | 0000 | 003D | 003E | 0000 | 0000 | 0000 | 0000 |
| 0000734640 | 0000 | 0000 | 0000 | 0036 | 0080 | 003C | 0000 | 003D |
| 0000734660 | 003E | 0000 | 0000 | 0000 | 0000 | 0000 | 0000 | 0000 |
| 0000734700 | 0036 | 0000 | 0000 | 0000 | 0000 | 0000 | 0000 | 0000 |
| 0000734720 | 0000 | 0026 | 0000 | 0000 | 0000 | 0000 | 0000 | 0000 |
| 0000734740 | 001F | 0000 | 0000 | 002F | 00E1 | 002E | 00E3 | 00E4 |
| 0000734760 | 00E6 | 0000 | 00E8 | 00E9 | 0025 | 00EA | 002D | 0000 |
| 0000735000 | 0000 | 002C | 003B | 0035 | 003C | 0039 | 003D | 003E |
| 0000735020 | 0036 | 0000 | 0000 | 0000 | 0000 | 0000 | 0000 | 0000 |
| 0000735040 | 0000 | 0000 | 0000 | 0000 | 0000 | 0036 | 0000 | 0000 |
| 0000735060 | 0000 | 0020 | 0028 | 0029 | 003A | 0000 | 0026 | 0037 |
| 0000735100 | 0038 | 002A | 002B | 0027 | 0000 | 001F | 0000 | 0000 |

THU MAR 14 17:52:34 1991 TSLINT.DLL PAGE 259, LINE 15223

| | | | | | | | | |
|---|---|---|---|---|---|---|---|---|
| 0000735120 | 002F | 0000 | 002E | 0025 | 0000 | 002D | 0000 | 0000 |
| 0000735140 | 002C | 003B | 0000 | 0000 | 0039 | 0000 | 0000 | 0000 |
| 0000735160 | 0000 | 003C | 0000 | 003D | 003E | 0000 | 0000 | 0000 |
| 0000735200 | 0117 | 0000 | 0000 | 0000 | 0036 | 0000 | 0000 | 0000 |
| 0000735220 | 0020 | 0028 | 0029 | 003A | 0000 | 0000 | 0037 | 0038 |
| 0000735240 | 002A | 002B | 0027 | 0000 | 0000 | 0000 | 0000 | 0000 |
| 0000735260 | 0025 | 0000 | 002D | 0000 | 0000 | 002C | 003B | 0000 |
| 0000735300 | 0000 | 0039 | 0000 | 0000 | 0000 | 0025 | 0000 | 002D |
| 0000735320 | 0000 | 0000 | 002C | 003B | 0000 | 0000 | 0039 | 0000 |
| 0000735340 | 0000 | 0000 | 0000 | 0000 | 0000 | 0020 | 0028 | 0029 |
| 0000735360 | 003A | 0036 | 0000 | 0037 | 0038 | 002A | 002B | 0027 |
| 0000735400 | 0000 | 0000 | 0020 | 0028 | 0029 | 003A | 0000 | 0000 |
| 0000735420 | 0037 | 0038 | 002A | 002B | 0027 | 0025 | 0000 | 002D |
| 0000735440 | 0000 | 0000 | 002C | 003B | 0000 | 0000 | 0039 | 0000 |
| 0000735460 | 0000 | 0000 | 0025 | 0000 | 002D | 0000 | 0000 | 002C |
| 0000735500 | 003B | 0000 | 0000 | 0039 | 0000 | 0000 | 0000 | 0000 |
| 0000735520 | 0000 | 0000 | 0020 | 0028 | 0029 | 003A | 0000 | 0000 |
| 0000735540 | 0037 | 0038 | 002A | 002B | 0027 | 0000 | 0000 | 0020 |
| 0000735560 | 0028 | 0029 | 003A | 0000 | 0000 | 0037 | 0038 | 002A |
| 0000735600 | 002B | 0027 | 0000 | 0000 | 0000 | 0000 | 0000 | 0000 |
| 0000735620 | 0000 | 0025 | 0000 | 002D | 0026 | 0000 | 002C | 003B |
| 0000735640 | 0000 | 0000 | 0039 | 0062 | 0000 | 0000 | 002F | 0000 |
| 0000735660 | 002E | 0000 | 001E | 0000 | 0000 | 0000 | 0000 | 0000 |
| 0000735700 | 0000 | 0000 | 0000 | 0000 | 0000 | 0103 | 0020 | 0028 |
| 0000735720 | 0029 | 003A | 00BE | 0000 | 0037 | 0038 | 002A | 002B |
| 0000735740 | 0027 | 0000 | 0000 | 0000 | 0000 | 0000 | 0000 | 0000 |
| 0000735760 | 0000 | 0000 | 0000 | 0057 | 0000 | 0000 | 0025 | 0000 |
| 0000736000 | 002D | 0063 | 0000 | 002C | 003B | 0067 | 0068 | 0039 |
| 0000736020 | 0000 | 0063 | 0063 | 0026 | 0000 | 0000 | 0000 | 0000 |
| 0000736040 | 0000 | 0000 | 001F | 0000 | 0000 | 002F | 0000 | 002E |
| 0000736060 | 0000 | 0000 | 0000 | 0020 | 0028 | 0029 | 003A | 0000 |
| 0000736100 | 0000 | 0037 | 0038 | 002A | 002B | 0027 | 003C | 0000 |
| 0000736120 | 003D | 0087 | 0000 | 0000 | 0000 | 0000 | 0000 | 0000 |
| 0000736140 | 0000 | 0000 | 0000 | 0026 | 0063 | 0063 | 0063 | 0063 |
| 0000736160 | 0063 | 0063 | 0062 | 0000 | 0000 | 002F | 0000 | 002E |
| 0000736200 | 0000 | 0026 | 0000 | 0000 | 0000 | 0000 | 0000 | 0000 |
| 0000736220 | 001F | 0000 | 0057 | 002F | 0000 | 002E | 0000 | 0000 |
| 0000736240 | 0000 | 00BE | 0000 | 0000 | 0000 | 0000 | 0000 | 0000 |
| 0000736260 | 0000 | 0000 | 0000 | 0000 | 003C | 0000 | 003D | 0000 |
| 0000736300 | 0087 | 0000 | 0000 | 0057 | 0000 | 0000 | 0036 | 0000 |
| 0000736320 | 0000 | 0026 | 0000 | 0000 | 0000 | 0000 | 0000 | 0063 |
| 0000736340 | 0062 | 0000 | 0000 | 002F | 0026 | 002E | 0000 | 0000 |
| 0000736360 | 0000 | 0000 | 0000 | 0062 | 0000 | 0000 | 002F | 0000 |
| 0000736400 | 002E | 0000 | 0000 | 0000 | 0000 | 0000 | 0000 | 0000 |
| 0000736420 | 0000 | 0000 | 0000 | 0000 | 0000 | 0000 | 0000 | 0063 |
| 0000736440 | 0063 | 0063 | 0087 | 0000 | 0087 | 0087 | 0087 | 0000 |
| 0000736460 | 0087 | 0087 | 0087 | 0087 | 0036 | 0026 | 0000 | 0000 |
| 0000736500 | 0000 | 0000 | 0000 | 0000 | 001F | 0000 | 0000 | 002F |
| 0000736520 | 0000 | 002E | 0000 | 0000 | 0025 | 0000 | 002D | 0000 |
| 0000736540 | 0000 | 002C | 00BD | 0000 | 0000 | 00BB | 0042 | 00B0 |
| 0000736560 | 0002 | 0000 | 0000 | 0000 | 0087 | 0000 | 0087 | 0087 |
| 0000736600 | 0000 | 0087 | 0000 | 0087 | 0087 | 0087 | 0000 | 0000 |
| 0000736620 | 0000 | 0088 | 0028 | 0029 | 00BC | 0000 | 0000 | 00B9 |
| 0000736640 | 00BA | 002A | 002B | 0027 | 0000 | 0000 | 0000 | 0000 |
| 0000736660 | 0000 | 0000 | 0000 | 0000 | 0026 | 0000 | 0087 | 0000 |
| 0000736700 | 0000 | 000D | 0000 | 001F | 0091 | 0000 | 002F | 0000 |
| 0000736720 | 002E | 0000 | 0000 | 0025 | 0000 | 002D | 0000 | 0000 |
| 0000736740 | 002C | 003B | 0087 | 0000 | 0039 | 0000 | 0000 | 007A |
| 0000736760 | 0000 | 0000 | 0000 | 0000 | 0000 | 007E | 0000 | 0000 |

THU MAR 14 17:52:34 1991 TSLINT.DLL PAGE 260, LINE 15282

| | | | | | | | | |
|---|---|---|---|---|---|---|---|---|
| 0000737000 | 0000 | 0000 | 0000 | 0000 | 0000 | 0000 | 0000 | 0000 |
| 0000737020 | 0020 | 0028 | 0029 | 003A | 0000 | 0000 | 0037 | 0000 |
| 0000737040 | 002A | 002B | 0027 | 0025 | 0000 | 002D | 0000 | 0000 |
| 0000737060 | 002C | 00BD | 0000 | 0000 | 00BB | 0000 | 0000 | 0000 |
| 0000737100 | 0000 | 0025 | 007A | 002D | 0000 | 0000 | 002C | 003B |
| 0000737120 | 0000 | 0000 | 0039 | 0000 | 0000 | 0000 | 0000 | 0000 |
| 0000737140 | 0088 | 0028 | 0029 | 00BC | 0021 | 0000 | 00B9 | 00BA |
| 0000737160 | 002A | 002B | 0027 | 0000 | 0000 | 0000 | 0020 | 0028 |
| 0000737200 | 0029 | 003A | 0000 | 0000 | 0000 | 0000 | 002A | 002B |
| 0000737220 | 0027 | 0025 | 0000 | 002D | 0000 | 0000 | 002C | 00BD |
| 0000737240 | 0000 | 0000 | 00BB | 0000 | 0025 | 0026 | 002D | 0000 |
| 0000737260 | 0000 | 002C | 00BD | 0061 | 001F | 00BB | 0000 | 002F |
| 0000737300 | 0000 | 002E | 0000 | 0069 | 006A | 0000 | 0088 | 0028 |
| 0000737320 | 0029 | 00BC | 0000 | 0000 | 00B9 | 0000 | 002A | 002B |
| 0000737340 | 0027 | 0088 | 0028 | 0029 | 00BC | 0000 | 0000 | 0000 |
| 0000737360 | 0000 | 002A | 002B | 0027 | 00B1 | 00AE | 0026 | 002D |
| 0000737400 | 0000 | 0000 | 002C | 0089 | 0000 | 001F | 0000 | 0000 |
| 0000737420 | 002F | 0000 | 002E | 0000 | 00F9 | 00FA | 0095 | 0096 |
| 0000737440 | 0097 | 0098 | 0099 | 009A | 0000 | 0000 | 0000 | 0000 |
| 0000737460 | 00FE | 0000 | 0020 | 0028 | 0029 | 0000 | 0000 | 0000 |
| 0000737500 | 0000 | 0000 | 002A | 002B | 0027 | 0000 | 0026 | 0000 |
| 0000737520 | 0000 | 0000 | 0000 | 0000 | 0000 | 001F | 0000 | 0000 |
| 0000737540 | 002F | 0000 | 002E | 0000 | 0074 | 0000 | 0026 | 0000 |
| 0000737560 | 0115 | 0000 | 0089 | 0000 | 0025 | 0062 | 002D | 0000 |
| 0000737600 | 002F | 002C | 002E | 011A | 0074 | 011C | 0000 | 0000 |
| 0000737620 | 0120 | 00C7 | 0122 | 0123 | 0000 | 0000 | 0000 | 0000 |
| 0000737640 | 0000 | 0000 | 0000 | 0000 | 0000 | 0127 | 0128 | 0000 |
| 0000737660 | 0129 | 0020 | 0028 | 0029 | 0000 | 012A | 0000 | 0000 |
| 0000737700 | 0000 | 002A | 002B | 0027 | 0000 | 0000 | 0000 | 0000 |
| 0000737720 | 0000 | 00DE | 00DF | 00E0 | 0089 | 0000 | 0089 | 0089 |
| 0000737740 | 0089 | 0026 | 0089 | 0089 | 0089 | 0089 | 0000 | 0000 |
| 0000737760 | 0062 | 0000 | 0000 | 002F | 0026 | 002E | 0000 | 0000 |
| 0000740000 | 0026 | 0000 | 0000 | 001F | 0000 | 0000 | 002F | 001F |
| 0000740020 | 002E | 0000 | 002F | 0000 | 002E | 0000 | 0000 | 0000 |
| 0000740040 | 0000 | 0000 | 0000 | 0000 | 0000 | 0000 | 0089 | 0000 |
| 0000740060 | 0089 | 0089 | 00DB | 0089 | 0000 | 0089 | 0089 | 0089 |
| 0000740100 | 0000 | 0000 | 0000 | 0000 | 0000 | 0000 | 0000 | 0000 |
| 0000740120 | 0000 | 0000 | 0000 | 0000 | 0000 | 0000 | 0000 | 0026 |
| 0000740140 | 0000 | 0000 | 0000 | 0000 | 0055 | 0025 | 001F | 002D |
| 0000740160 | 0089 | 002F | 002C | 002E | 0026 | 0000 | 0000 | 0000 |
| 0000740200 | 0000 | 0000 | 0000 | 0082 | 0000 | 0000 | 002F | 0000 |
| 0000740220 | 002E | 0000 | 0000 | 0000 | 0089 | 0000 | 0000 | 0000 |
| 0000740240 | 0000 | 0000 | 0020 | 0028 | 0029 | 0000 | 0000 | 0000 |
| 0000740260 | 0000 | 0000 | 002A | 002B | 0027 | 0000 | 0025 | 0000 |
| 0000740300 | 002D | 0000 | 0000 | 002C | 0026 | 0000 | 0000 | 0000 |
| 0000740320 | 0026 | 0000 | 0000 | 001F | 0000 | 0000 | 002F | 001F |
| 0000740340 | 002E | 0000 | 002F | 0000 | 002E | 0000 | 0000 | 0000 |
| 0000740360 | 0000 | 0000 | 0000 | 0020 | 0028 | 0029 | 004B | 0000 |
| 0000740400 | 0000 | 0000 | 0049 | 002A | 002B | 0027 | 0025 | 0000 |
| 0000740420 | 002D | 0000 | 0000 | 002C | 0000 | 0000 | 0000 | 0000 |
| 0000740440 | 0026 | 0000 | 0000 | 0000 | 0000 | 0000 | 0025 | 0062 |
| 0000740460 | 002D | 0000 | 002F | 002C | 002E | 0000 | 0000 | 0000 |
| 0000740500 | 0000 | 0000 | 0000 | 0020 | 0028 | 0029 | 0000 | 0000 |
| 0000740520 | 0000 | 0000 | 0000 | 002A | 002B | 0027 | 0000 | 0000 |
| 0000740540 | 0000 | 0000 | 0000 | 0088 | 0028 | 0029 | 0000 | 0000 |
| 0000740560 | 0026 | 0000 | 0000 | 002A | 002B | 0027 | 0000 | 001F |
| 0000740600 | 0000 | 0000 | 002F | 0000 | 002E | 0000 | 0000 | 0000 |
| 0000740620 | 0000 | 0000 | 0000 | 0000 | 0000 | 0000 | 0000 | 0000 |
| 0000740640 | 00E2 | 0025 | 0000 | 002D | 0000 | 0092 | 002C | 0000 |

THU MAR 14 17:52:34 1991 TSLINT.DLL PAGE 261, LINE 15341

| | | | | | | | | |
|---|---|---|---|---|---|---|---|---|
| 0000740660 | 0000 | 0000 | 0000 | 00C5 | 0025 | 0000 | 002D | 0000 |
| 0000740700 | 0025 | 002C | 002D | 0000 | 0000 | 002C | 0000 | 0000 |
| 0000740720 | 0000 | 0000 | 0000 | 0000 | 0000 | 0000 | 0088 | 0028 |
| 0000740740 | 0029 | 0000 | 0000 | 0000 | 0000 | 0000 | 002A | 002B |
| 0000740760 | 0027 | 0020 | 0028 | 0029 | 0000 | 0020 | 0028 | 0029 |
| 0000741000 | 0000 | 002A | 002B | 0027 | 0000 | 002A | 002B | 0027 |
| 0000741020 | 0000 | 0026 | 0000 | 0000 | 0000 | 0000 | 00AC | 0025 |
| 0000741040 | 0062 | 002D | 0000 | 002F | 002C | 002E | 0000 | 0000 |
| 0000741060 | 0000 | 0000 | 0000 | 0086 | 0025 | 0000 | 002D | 0000 |
| 0000741100 | 0000 | 002C | 0000 | 0000 | 0000 | 0000 | 0000 | 0000 |
| 0000741120 | 0000 | 008F | 0000 | 0000 | 0020 | 0028 | 0029 | 0000 |
| 0000741140 | 0000 | 0000 | 0000 | 0000 | 002A | 002B | 0027 | 0000 |
| 0000741160 | 0000 | 0088 | 0028 | 0029 | 0000 | 0000 | 0000 | 0000 |
| 0000741200 | 0000 | 002A | 002B | 0027 | 0025 | 0000 | 002D | 0000 |
| 0000741220 | 0025 | 002C | 002D | 0000 | 0000 | 002C | 0000 | 0000 |
| 0000741240 | 0000 | 0000 | 0000 | 0000 | 0000 | 0000 | 0000 | 0000 |
| * | | | | | | | | |
| 0000741300 | 0000 | 0020 | 0028 | 0029 | 0000 | 0020 | 0028 | 0029 |
| 0000741320 | 0000 | 002A | 002B | 0027 | 0000 | 002A | 002B | 0027 |
| 0000741340 | 0025 | 00C8 | 002D | 0000 | 0000 | 002C | 0000 | 0000 |
| 0000741360 | 0000 | 0000 | 0000 | 0000 | 0000 | 0000 | 0000 | 0000 |
| 0000741400 | 00D5 | 00D6 | 0000 | 0000 | 0000 | 0000 | 0000 | 0000 |
| 0000741420 | 00DC | 0000 | 0000 | 0000 | 0000 | 0088 | 0028 | 0029 |
| 0000741440 | 0000 | 0000 | 0000 | 0000 | 0000 | 002A | 002B | 0027 |
| 0000741460 | 0025 | 0000 | 002D | 0000 | 0000 | 002C | 0000 | 0000 |
| 0000741500 | 00EF | 0000 | 0000 | 0000 | 0000 | 00F5 | 0000 | 0000 |
| 0000741520 | 0000 | 0000 | 0000 | 0000 | 0000 | 0000 | 0000 | 0000 |
| 0000741540 | 0000 | 0101 | 0000 | 0000 | 0000 | 0020 | 0028 | 0029 |
| 0000741560 | 0000 | 0000 | 0000 | 0000 | 0000 | 002A | 002B | 0027 |
| 0000741600 | 0000 | 0000 | 0104 | 0105 | 0000 | 0000 | 0106 | 0107 |
| 0000741620 | 0108 | 0109 | 0000 | 0000 | 0000 | 0000 | 0000 | 0000 |
| 0000741640 | 0000 | 0000 | 010E | 0000 | 0111 | 0113 | 0114 | 0000 |
| 0000741660 | 0000 | 0000 | 0000 | 0000 | 0000 | 0000 | 0000 | 0000 |
| 0000741700 | 0000 | 0000 | 0000 | 011B | 0000 | 011E | 011F | 0000 |
| 0000741720 | 0121 | 0025 | 0000 | 002D | 0000 | 0000 | 002C | 0000 |
| 0000741740 | 0000 | 0000 | 0000 | 0126 | 0000 | 0000 | 0000 | 0000 |
| 0000741760 | 0000 | 0000 | 0000 | 0000 | 0000 | 0000 | 0000 | 0000 |
| 0000742000 | 0000 | 0000 | 0000 | 0000 | 0000 | 0000 | 0000 | 0000 |
| 0000742020 | 0029 | 0000 | 0000 | 0000 | 0000 | 0000 | 002A | 0028 |
| 0000742040 | 0027 | FC18 | 004D | FC18 | FC18 | FC18 | FFB9 | 002B |
| 0000742060 | FC18 | FC18 | FC18 | FC18 | FC18 | FF2D | FC18 | FC18 |
| 0000742100 | FF30 | FC18 | 024F | 0023 | FC18 | FC18 | FC18 | FC18 |
| 0000742120 | 05CE | 05CA | FC18 | 0021 | 001D | FC18 | FC18 | FC18 |
| 0000742140 | 04BB | FF2A | 008B | FC18 | FC18 | FC18 | 000F | FEFE |
| 0000742160 | FC18 | 004B | 004A | FF2A | FF2A | FC18 | FC18 | 066F |
| 0000742200 | 066F | FC18 | 0077 | FFEA | FF2C | FC18 | FC18 | 066F |
| 0000742220 | 061E | 061E | 050C | FF2B | 061E | 061E | 061E | FEEB |
| 0000742240 | FFF6 | 0023 | FC18 | FC18 | FC18 | 0049 | 0048 | 061E |
| 0000742260 | 0047 | 0220 | FC18 | 0213 | FC18 | FC18 | FC18 | 0077 |
| 0000742300 | FF0D | 061E | FC18 | FC18 | FFF1 | 00B0 | FC18 | 05A2 |
| 0000742320 | FC18 | FFE7 | 066F | 066F | 066F | 066F | 066F | 000A |
| 0000742340 | 04BB | 04BB | FFD8 | 061E | FEDD | 0043 | 050C | 066F |
| 0000742360 | FC18 | FC18 | FFD8 | FFD8 | 0023 | 04BB | 0041 | 061E |
| 0000742400 | FF2A | 03A7 | 0371 | FC18 | 007B | FC18 | FC18 | FC18 |
| 0000742420 | 005A | 005A | 01EB | FC18 | FC18 | 061E | 0595 | 005A |
| 0000742440 | 0403 | FC18 | FC18 | 04BB | FFD6 | 0003 | 0399 | FEF6 |
| 0000742460 | FEF8 | FF2A | 008B | 0040 | 003D | 0284 | 0562 | FC18 |
| 0000742500 | FEE5 | FC18 | FC18 | FC18 | FC18 | 066F | FFD8 | FC18 |
| 0000742520 | FFD8 | FFD8 | 0061 | 0061 | 0039 | FFFE | 0284 | FFD8 |

THU MAR 14 17:52:34 1991 TSLINT.DLL PAGE 262, LINE 15400

| | | | | | | | | |
|---|---|---|---|---|---|---|---|---|
| 0000742540 | 00B0 | 04BB | 0033 | 01DE | 01DE | FC18 | FFE6 | FF1B |
| 0000742560 | FC18 | FF0B | 061E | 00B0 | 00B0 | FC18 | FC18 | FFE0 |
| 0000742600 | 01B1 | 0566 | FC18 | FFF1 | 001A | 066F | 066F | 066F |
| 0000742620 | 0557 | FC18 | 05F6 | 05F6 | 051C | FF28 | 05F6 | 05F6 |
| 0000742640 | FFF6 | 05F6 | 000A | 04BB | 04BB | 0284 | FC18 | FF27 |
| 0000742660 | 008B | FC18 | FC18 | 0039 | 04BB | 04BB | 050C | 0019 |
| 0000742700 | 0039 | FFFB | FC18 | FC18 | 001B | 0284 | 0077 | 0077 |
| 0000742720 | 003C | FF21 | 04E4 | 0182 | 0442 | FFD6 | FC18 | 008B |
| 0000742740 | 008B | 008B | 0399 | FC18 | 03DA | 03CF | FC18 | FFE4 |
| 0000742760 | FC18 | 002E | 0332 | 0399 | FC18 | 0039 | 0039 | FC18 |
| 0000743000 | FC18 | FFF1 | FFF1 | 0039 | 00B0 | FC18 | FC18 | FF15 |
| 0000743020 | FC18 | FC18 | FEFB | FC18 | 061E | 0039 | 00DC | 0442 |
| 0000743040 | 0442 | 00B0 | 0077 | 0018 | 05F6 | 0012 | 0011 | FC18 |
| 0000743060 | FC18 | FC18 | FC18 | FC18 | FC18 | 0077 | 00B0 | 0077 |
| 0000743100 | 0442 | 00B0 | 0077 | 00B0 | 0077 | 0077 | FC18 | FC18 |
| 0000743120 | 0399 | FC18 | FC18 | FC18 | 000E | FC18 | 00B0 | 0077 |
| 0000743140 | 0077 | FC18 | 0077 | FC18 | FC18 | FC18 | FC18 | 0077 |
| 0000743160 | FC18 | FC18 | FC18 | FC18 | 0000 | 00C6 | 00C2 | 00C1 |
| 0000743200 | 01C3 | 0000 | 00BD | 04BB | 00BC | 00BB | 00B3 | 00AF |
| 0000743220 | 0361 | 00AE | 00AD | 00AC | 0148 | 0106 | 005D | 043D |
| 0000743240 | 00AB | 00A9 | 00A7 | 009D | 009B | 0097 | 0096 | 0095 |
| 0000743260 | 0035 | 005A | 0094 | 008D | 0033 | 0031 | 065C | 0040 |
| 0000743300 | 008C | 008A | 007C | 0084 | 0079 | 0048 | 0081 | 0077 |
| 0000743320 | 0076 | 0074 | 0000 | 0006 | 0006 | 0006 | 0003 | 0025 |
| 0000743340 | 0027 | 0001 | 0001 | 0002 | 0009 | 0009 | 0009 | 0009 |
| 0000743360 | 0009 | 0009 | 000A | 000A | 001E | 002A | 001D | 000B |
| 0000743400 | 000B | 0012 | 0012 | 002C | 0013 | 0026 | 0014 | 0014 |
| 0000743420 | 0014 | 0014 | 0014 | 0014 | 0014 | 0014 | 0014 | 0018 |
| 0000743440 | 0018 | 0019 | 0019 | 0016 | 0016 | 0017 | 0017 | 0024 |
| 0000743460 | 0024 | 001B | 001B | 001B | 001B | 001B | 001B | 001B |
| 0000743500 | 0015 | 0015 | 001A | 001A | 001A | 001A | 001A | 001A |
| 0000743520 | 001A | 001A | 001A | 001A | 001A | 001A | 001A | 0020 |
| 0000743540 | 0020 | 0021 | 0021 | 0021 | 0021 | 001F | 001F | 000D |
| 0000743560 | 000D | 000D | 000D | 000D | 000F | 000F | 000E | 000E |
| 0000743600 | 000E | 000E | 000E | 0011 | 0011 | 0010 | 0010 | 0010 |
| 0000743620 | 0010 | 0010 | 0005 | 0005 | 0005 | 0005 | 0005 | 0005 |
| 0000743640 | 0005 | 0005 | 0005 | 0005 | 0005 | 0005 | 0005 | 0005 |
| 0000743660 | 0005 | 0004 | 0004 | 0004 | 0004 | 0004 | 0004 | 0004 |
| 0000743700 | 0004 | 0004 | 0004 | 0004 | 0008 | 0007 | 0007 | 0007 |
| 0000743720 | 0007 | 0007 | 0007 | 0007 | 0007 | 0007 | 0007 | 0007 |
| * | | | | | | | | |
| 0000743760 | 0007 | 0007 | 0007 | 0007 | 0007 | 001C | 001C | 000C |
| 0000744000 | 000C | 0028 | 0029 | 0022 | 002B | 002B | 002D | 0023 |
| 0000744020 | 0000 | 0000 | 0002 | 0002 | 0002 | 0001 | 0000 | 0006 |
| 0000744040 | 0002 | 0003 | 0001 | 0001 | 0003 | 0003 | 0002 | 0003 |
| 0000744060 | 0001 | 0003 | 0001 | 0000 | 0004 | 0003 | 0004 | 0001 |
| 0000744100 | 0002 | 0001 | 0001 | 0000 | 0001 | 0001 | 0001 | 0001 |
| 0000744120 | 0001 | 0001 | 0006 | 0001 | 0001 | 0007 | 0007 | 0001 |
| 0000744140 | 0002 | 0003 | 0002 | 0007 | 0005 | 0001 | 0001 | 0003 |
| 0000744160 | 0002 | 0003 | 0001 | 0002 | 0002 | 0002 | 0006 | 0008 |
| 0000744200 | 0006 | 0004 | 0009 | 0008 | 000A | 0009 | 0009 | 0008 |
| 0000744220 | 0009 | 0008 | 0008 | 0007 | 0004 | 0000 | 0002 | 0000 |
| 0000744240 | 0002 | 0002 | 0002 | 0000 | 0001 | 0001 | 0003 | 0001 |
| 0000744260 | 0002 | 0003 | 0000 | 0001 | 0001 | 0003 | 0001 | 0002 |
| 0000744300 | 0003 | 0000 | 0001 | 0001 | 0003 | 0001 | 0002 | 0003 |
| 0000744320 | 0003 | 0005 | 0004 | 0003 | 0003 | 0003 | 0003 | 0003 |
| 0000744340 | 0003 | 0003 | 0003 | 0003 | 0005 | 0002 | 0001 | 0003 |
| 0000744360 | 0003 | 0003 | 0003 | 0003 | 0003 | 0003 | 0003 | 0005 |
| 0000744400 | 0002 | 0001 | 0000 | 0002 | 0003 | 0005 | 0002 | 0006 |

THU MAR 14 17:52:34 1991 TSLINT.DLL PAGE 263, LINE 15459

| | | | | | | | | |
|---|---|---|---|---|---|---|---|---|
| 0000744420 | 0006 | 0006 | 0006 | 0004 | 0002 | 0002 | 0002 | 0002 |
| 0000744440 | 0001 | 0001 | 0001 | 0003 | 0003 | 0003 | 0003 | 0003 |
| 0000744460 | 0003 | 0002 | 0002 | 0000 | 0001 | 0001 | 0004 | 0001 |
| 0000744500 | 0001 | 0001 | 0000 | 0001 | 0001 | 0001 | FC18 | FFFA |
| 0000744520 | FFED | FFFD | FFEC | FFFF | FFE7 | FFEA | FFEB | FFE6 |
| 0000744540 | FFE5 | FFE9 | 0112 | FFE8 | 0100 | 011D | 003B | FFFB |
| 0000744560 | FFD8 | 010F | 0114 | 0115 | 0116 | 011C | 0111 | 0123 |
| 0000744600 | 0117 | 0118 | FFDC | 0122 | FFF4 | 0028 | 011E | FFF9 |
| 0000744620 | 007B | 0119 | 011A | 0101 | 0021 | 0128 | 011F | 0120 |
| 0000744640 | 0126 | 0127 | 0106 | 0103 | 002D | 002B | FFFE | FFD8 |
| 0000744660 | 0101 | FFD9 | 0100 | 003B | 007C | 0124 | 0125 | 010A |
| 0000744700 | 0121 | 0107 | 003C | 003E | 003F | FFFB | FFEE | FFD7 |
| 0000744720 | FFED | 007D | FFDA | FFDA | FFDA | FFDA | FFFB | 003B |
| 0000744740 | FFFB | 003B | 003B | 003B | FFDA | FFDA | 0109 | 0126 |
| 0000744760 | 0127 | FFF0 | FFFB | 0100 | FFE4 | FFF4 | 0101 | 005E |
| 0000745000 | 002A | 002F | 0025 | 002B | 002D | 0028 | 005B | FFF9 |
| 0000745020 | 0028 | FFF4 | FFF8 | 0028 | 0028 | FFF4 | FFF4 | FFF9 |
| 0000745040 | FFF9 | FFEE | 005B | FFDB | 0101 | 011E | FFFB | FFFB |
| 0000745060 | FFE3 | FFFB | 002F | 0101 | FFFB | FFFB | FFFB | FFFB |
| 0000745100 | FFED | FFD7 | 0028 | 0028 | FFED | 0028 | 003B | 003B |
| 0000745120 | 0028 | FFF1 | FFF2 | FFFC | 0100 | FFF4 | 011E | FFF9 |
| 0000745140 | 0101 | 0103 | FFFB | FFDD | 0100 | FFDE | 002C | 0029 |
| 0000745160 | FFDE | FFE0 | 003C | FFF9 | FFF9 | FFF9 | FFF9 | FFF9 |
| 0000745200 | FFF9 | FFEF | FFF0 | FFFB | FFF0 | FFFB | 0028 | FFE3 |
| 0000745220 | FFFB | FFFB | FFD7 | FFF0 | 0028 | FFE4 | FFD6 | 003A |
| 0000745240 | FFFB | FFFB | 0100 | 0114 | 0101 | FFFB | 003B | 0100 |
| 0000745260 | FFF0 | FFDF | 003E | 0108 | 007C | FFDD | 0100 | 0124 |
| 0000745300 | 0125 | 010A | 0121 | 0107 | 003F | FFFC | 0109 | FFE4 |
| 0000745320 | 0028 | 0028 | FFFB | 0100 | 0121 | FFF9 | FFDE | 005D |
| 0000745340 | FFEF | FFDD | FFDD | FFDD | 005D | FFE1 | FFF3 | 0101 |
| 0000745360 | 0100 | 0102 | FFFB | FFDE | FFDE | FFDA | 0121 | 003B |
| 0000745400 | FFFB | 003B | FFDE | 003B | FFF9 | FFF9 | FFF9 | FFFC |
| 0000745420 | 0100 | FFFC | FFFC | FFE3 | FFFC | 0101 | FFFC | FFFC |
| 0000745440 | FFFC | FFE0 | FFEF | FFEF | 0101 | FFDE | FFF0 | FFF0 |
| 0000745460 | FFE3 | FFFB | 003B | FFDE | FFDD | 0100 | 002F | FFED |
| 0000745500 | FFED | 0028 | 0101 | FFFB | 003B | 003B | FFFB | FFDE |
| 0000745520 | FFDF | 003A | FFDE | FFDE | FFDE | FFDE | FFDE | FFDE |
| 0000745540 | 0101 | 0100 | 0110 | FFFB | FFDE | 003B | FFFB | FFDE |
| 0000745560 | FFFB | FFDE | FFDE | FFED | 003B | FFFC | 003B | 003B |
| 0000745600 | FFED | FFDE | FFED | FFFB | FFDE | FFDE | FFED | FFDE |
| 0000745620 | FFED | FFED | FFD4 | 003B | FFDE | FFED | FFED | FFED |
| 0000745640 | FFED | 0001 | FFFE | 0002 | 0003 | 001A | 0000 | 001C |
| 0000745660 | 001D | 001E | 001F | 0020 | 0021 | 0000 | 0023 | 0024 |
| 0000745700 | 0006 | 0027 | 0000 | 0000 | 001B | 001B | 001B | 001B |
| 0000745720 | 0000 | 0000 | 0032 | 0000 | 0000 | 001B | 001B | 0088 |
| 0000745740 | 0000 | 0093 | 006E | 0097 | 002D | 002E | 0095 | 0000 |
| 0000745760 | 007A | 0000 | 0000 | 0000 | 0000 | 0089 | 008A | 0000 |
| 0000746000 | 0000 | 0004 | 0000 | 0000 | 0000 | 0008 | 0028 | 0000 |
| 0000746020 | 0000 | 0000 | 0000 | 0000 | 0000 | 0000 | 0000 | 0000 |
| 0000746040 | 006D | 0000 | 002A | 0017 | 0098 | 0000 | 0000 | 0000 |
| 0000746060 | 0000 | 0000 | 0030 | 0000 | 0033 | 0034 | 0035 | 0052 |
| 0000746100 | 0000 | 0000 | 0086 | 0087 | 0000 | 005B | 005D | 0045 |
| 0000746120 | 0094 | 0095 | 0000 | 0000 | 0000 | 0000 | 0000 | 0000 |
| 0000746140 | 0059 | 0000 | 007B | 0000 | 0088 | 007E | 0000 | 0000 |
| 0000746160 | 0084 | 0085 | 0091 | 0092 | 0000 | 0000 | 0000 | 0005 |
| 0000746200 | 0093 | 0064 | 0065 | 0066 | FFFE | 0013 | 0068 | FFFE |
| 0000746220 | FFFE | FFFE | 0000 | 0018 | 0029 | 0000 | 0000 | 0000 |
| 0000746240 | 0000 | 002F | 0031 | 0000 | 0047 | 0053 | 0054 | 0056 |
| 0000746260 | 0088 | 0093 | 0079 | 0000 | 0000 | 0060 | 0000 | 005E |

```
THU MAR 14 17:52:34 1991  TSLINT.DLL  PAGE 264, LINE 15518

0000746300  0000  009D  0099  007C  0063  0000  008B  008C
0000746320  008D  008E  008F  0090  0000  005A  005B  0000
0000746340  0000  0059  0000  0000  0000  0009  0000  004B
0000746360  0062  0000  0000  0000  0000  0039  001B  0095
0000746400  0000  0000  0044  0000  0000  0000  0000  0000
0000746420  0000  0057  0000  0000  0000  0000  0000  0000
0000746440  0078  0000  0045  0059  0059  005C  005F  0000
0000746460  0046  0083  0096  0000  0000  0000  0000  0000
0000746500  0000  004C  004D  004F  0000  006C  0000  0000
0000746520  0000  0000  0000  0000  0000  0047  002C  0048
0000746540  0049  004A  0055  0058  0070  0071  0073  FFFE
0000746560  0075  FFFE  0000  006F  0072  0000  0000  0061
0000746600  007D  0000  0000  0000  0000  0022  0007  0000
0000746620  0050  0014  0036  0038  0000  0000  0000  0000
0000746640  0000  0000  0000  0000  0000  0000  0000  007F
0000746660  0080  0081  0082  004E  0051  0000  0000  0000
0000746700  0000  0000  0000  0000  0000  0000  0043  002B
0000746720  0077  0025  0026  0037  0000  003B  0000  0000
0000746740  0000  003F  0000  0041  0042  003A  0019  0000
0000746760  003D  003E  0040  003C  0000  0000  0000  FFFF
0000747000  7374  5F6C  7979  6170  7372  0065  0000  0000
0000747020  0000  0006  0000  D180  D17F  0000  0005  0000
0000747040  0000  0000  0000  0000  0000  0000  0000  435F
0000747060  465F  4C49  5F45  4E49  4F46  003D  0001  FFFF
0000747100  0000  0000  0000  0000  0000  0000  0000  0000
0000747120  0000  0001  8101  8181  0000  0000  0000  0000
0000747140  0000  0000  0000  0000  0000  0000  0000  0000
*
0000747520  0000  0000  0A00  0A0A  0A0A  0A0A  0A0A  0A0A
0000747540  0A0A  0A0A  0A0A  0A0A  0A0A  0A0A  0A0A  0A0A
*
0000750120  0A0A  0A0A  000A  0000  0000  0000  0000  0000
0000750140  0000  0000  0000  FF00  00FF  0000  0000  FFFF
0000750160  FFFF  005C  005C  0000  0862  70F0  0000  0862
0000750200  7C00  0001  0000  0000  0000  0000  0000  0102
0000750220  0000  0000  0000  0000  0000  0202  0000  0000
0000750240  0000  0000  0000  0000  0000  0000  0000  0000
*
0000751120  0000  0000  0000  0000  0001  0200  0000  0000
0000751140  0000  0000  0000  0000  0000  0000  0000  0000
*
0000752060  0000  0000  0000  0000  72BC  54DC  0000  0000
0000752100  0000  0000  0920  0D2D  005D  005D  0006  0600
0000752120  0100  0000  0010  0603  0600  1002  4504  4545
0000752140  0505  0505  3505  0030  0050  0000  2000  3020
0000752160  5850  0807  3000  3030  5057  0007  2000  0020
0000752200  0000  0000  6008  6060  6060  0060  7000  7870
0000752220  7878  0878  0807  0000  0007  0808  0008  0800
0000752240  0800  0000  2808  756E  6C6C  0629  0000  0000
0000752260  0000  0000  0000  0000  0000  0000  0003  2000
0000752300  2E7E  79CA  2E7E  7532  2E7E  7536  2E7E  753A
0000752320  2E7E  753E  2E7E  7542  0000  0000  0101  2000
0000752340  2020  2020  2020  2020  2828  2828  2028  2020
0000752360  2020  2020  2020  2020  2020  2020  2020  4820
0000752400  1010  1010  1010  1010  1010  1010  1010  8410
0000752420  8484  8484  8484  8484  1084  1010  1010  1010
0000752440  8181  8181  8181  0101  0101  0101  0101  0101
0000752460  0101  0101  0101  0101  0101  1010  1010  1010
0000752500  8282  8282  8282  0202  0202  0202  0202  0202
```

THU MAR 14 17:52:34 1991 TSLINT.DLL PAGE 265, LINE 15577

| | | | | | | | | |
|---|---|---|---|---|---|---|---|---|
| 0000752520 | 0202 | 0202 | 0202 | 0202 | 0202 | 1010 | 1010 | 0020 |
| 0000752540 | 0000 | 0000 | 0000 | 0000 | 0000 | 0000 | 0000 | 0000 |
| * | | | | | | | | |
| 0000752740 | 0000 | 0003 | FFFF | 001E | 003B | 005A | 0078 | 0097 |
| 0000752760 | 00B5 | 00D4 | 00F3 | 0111 | 0130 | 014E | 016D | FFFF |
| 0000753000 | 001E | 003A | 0059 | 0077 | 0096 | 00B4 | 00D3 | 00F2 |
| 0000753020 | 0110 | 012F | 014D | 016C | 0000 | 0000 | 0000 | 0000 |
| 0000753040 | 0000 | 0000 | 0000 | 0000 | 0000 | 5A54 | 0000 | 5350 |
| 0000753060 | 0054 | 4450 | 0054 | 7080 | 0000 | 0001 | 769E | 76B2 |
| 0000753100 | 76A2 | 7C04 | 7553 | 4D6E | 6E6F | 7554 | 5765 | 6465 |
| 0000753120 | 6854 | 4675 | 6972 | 6153 | 0074 | 614A | 466E | 6265 |
| 0000753140 | 614D | 4172 | 7270 | 614D | 4A79 | 6E75 | 754A | 416C |
| 0000753160 | 6775 | 6553 | 4F70 | 7463 | 6F4E | 4476 | 6365 | 0000 |
| 0000753200 | 7245 | 6F72 | 2072 | 0030 | 4E00 | 206F | 7573 | 6863 |
| 0000753220 | 6620 | 6C69 | 2065 | 726F | 6420 | 7269 | 6365 | 6F74 |
| 0000753240 | 7972 | 0000 | 0000 | 4100 | 6772 | 6C20 | 7369 | 2074 |
| 0000753260 | 6F74 | 206F | 6F6C | 676E | 4500 | 6578 | 2063 | 6F66 |
| 0000753300 | 6D72 | 7461 | 6520 | 7272 | 726F | 4200 | 6461 | 6620 |
| 0000753320 | 6C69 | 2065 | 756E | 626D | 7265 | 0000 | 4E00 | 746F |
| 0000753340 | 6520 | 6F6E | 6775 | 2068 | 6F63 | 6572 | 5000 | 7265 |
| 0000753360 | 696D | 7373 | 6F69 | 206E | 6564 | 696E | 6465 | 0000 |
| 0000753400 | 0000 | 6946 | 656C | 6520 | 6978 | 7473 | 0073 | 7243 |
| 0000753420 | 736F | 2D73 | 6564 | 6976 | 6563 | 6C20 | 6E69 | 006B |
| 0000753440 | 0000 | 4900 | 766E | 6C61 | 6469 | 6120 | 6772 | 6D75 |
| 0000753460 | 6E65 | 0074 | 5400 | 6F6F | 6D20 | 6E61 | 2079 | 706F |
| 0000753500 | 6E65 | 6620 | 6C69 | 7365 | 0000 | 0000 | 6F4E | 7320 |
| 0000753520 | 6170 | 6563 | 6C20 | 6665 | 2074 | 6E6F | 6420 | 7665 |
| 0000753540 | 6369 | 0065 | 0000 | 0000 | 614D | 6874 | 6120 | 6772 |
| 0000753560 | 6D75 | 6E65 | 0074 | 6552 | 7573 | 746C | 7420 | 6F6F |
| 0000753600 | 6C20 | 7261 | 6567 | 0000 | 6552 | 6F73 | 7275 | 6563 |
| 0000753620 | 6420 | 6165 | 6C64 | 636F | 206B | 6F77 | 6C75 | 2064 |
| 0000753640 | 636F | 7563 | 0072 | 6E55 | 6E6B | 776F | 206E | 7265 |
| 0000753660 | 6F72 | 0072 | 76F0 | 782A | 76F8 | 782E | 76F9 | 7832 |
| 0000753700 | 7713 | 7836 | 7714 | 783A | 7715 | 783E | 7716 | 7842 |
| 0000753720 | 7717 | 7846 | 7729 | 784A | 773B | 784E | 774B | 7852 |
| 0000753740 | 774C | 7856 | 774D | 785A | 775D | 785E | 776F | 7862 |
| 0000753760 | 7770 | 7866 | 7771 | 786A | 7772 | 786E | 777E | 7872 |
| 0000754000 | 7790 | 7876 | 7791 | 787A | 7792 | 787E | 7793 | 7882 |
| 0000754020 | 77A4 | 7886 | 77A5 | 788A | 77B9 | 788E | 77BA | 7892 |
| 0000754040 | 77BB | 7896 | 77BC | 789A | 77D4 | 789E | 77D5 | 78A2 |
| 0000754060 | 77D6 | 78A6 | 77D7 | 78AA | 77D8 | 78AE | 77E6 | 78B2 |
| 0000754100 | 77F7 | 78B6 | 77F8 | 78BA | 7816 | 76AE | 0025 | 005C |
| 0000754120 | 632F | 0020 | 0000 | 0002 | 4F43 | 534D | 4550 | 0043 |
| 0000754140 | 6D63 | 2E64 | 7865 | 0065 | 6F63 | 6D6D | 6E61 | 2E64 |
| 0000754160 | 6F63 | 006D | 4150 | 4854 | 2E00 | 7865 | 0065 | 632E |
| 0000754200 | 6D6F | 2E00 | 6D63 | 0064 | 622E | 7461 | 2E00 | 005C |
| 0000754220 | 0000 | 78E9 | 78EE | 4150 | 4854 | 5C00 | 0000 | 4F43 |
| 0000754240 | 534D | 4553 | 0043 | 632F | 6300 | 646D | 652E | 6578 |
| 0000754260 | 6300 | 6D6F | 616D | 646E | 632E | 6D6F | 0000 | 0000 |
| 0000754300 | 0000 | A9CC | 79BE | A494 | 7934 | A53A | 7938 | A424 |
| 0000754320 | 793C | A512 | 7940 | 4D05 | 3136 | 7878 | FFFF | FFFF |
| 0000754340 | FFFF | 7FEF | 0000 | 0078 | 0079 | 0000 | 0000 | 007A |
| 0000754360 | 0000 | 3A02 | 0020 | 5304 | 5251 | 0054 | 5003 | 574F |
| 0000754400 | 0300 | 4F4C | 0047 | 4C05 | 474F | 3031 | 0300 | 5845 |
| 0000754420 | 0050 | 5303 | 4E49 | 0300 | 4F43 | 0053 | 5403 | 4E41 |
| 0000754440 | 0000 | 4104 | 4953 | 004E | 4104 | 4F43 | 0053 | 4104 |
| 0000754460 | 4154 | 004E | 4105 | 4154 | 324E | 0000 | 2B65 | 3030 |
| 0000754500 | 0030 | 0000 | 7C6C | 7546 | 0000 | 0000 | A045 | 79B6 |
| 0000754520 | 98D4 | 7944 | AA6B | 79C2 | 391C | FFFF | 0000 | 0000 |

THU MAR 14 17:52:34 1991 TSLINT.DLL PAGE 266, LINE 15636

| | | | | | | | | |
|---|---|---|---|---|---|---|---|---|
| 0000754540 | 0000 | BFF0 | 0000 | 0000 | 0000 | 0000 | FFFF | 79DC |
| 0000754560 | 79DE | 79E0 | 79E2 | 79E4 | 79E6 | 79E8 | 79EA | 79EC |
| 0000754600 | 79EE | 79F0 | 79F2 | FFFF | 79F4 | 79F6 | 79F8 | 79FA |
| 0000754620 | 79FC | 7A00 | 7A02 | FFFF | FFFF | 7A04 | 0000 | 0020 |
| 0000754640 | 0000 | 3E00 | 7A0A | 7A14 | 79FE | 7A06 | 7A08 | 00B2 |
| 0000754660 | 7A16 | 7A20 | 7A1E | 7A22 | 7A24 | 7A28 | 7A2A | 7A2C |
| 0000754700 | 7A26 | 7A30 | 0000 | 0000 | 0000 | 0000 | 7A2E | 7A32 |
| 0000754720 | 7A3E | 0000 | 0000 | 0000 | BFF0 | 7A40 | 7A4A | 7A3C |
| 0000754740 | 7A4C | 7A1A | 7A1C | 7A50 | 0C08 | 7A52 | 7A54 | 0F02 |
| 0000754760 | 7A56 | 7A60 | 7A5E | 7A62 | 7A66 | 0000 | 0000 | 0000 |
| 0000755000 | 3FF0 | 7A68 | 7A72 | 0000 | 0000 | 0000 | BFF0 | 7A74 |
| 0000755020 | 0000 | 0000 | 0000 | 0000 | 7A64 | 7A7E | 7A8A | 7A8C |
| 0000755040 | 7A8E | 7A90 | 7A92 | 7A94 | 7A96 | 7A88 | 7A98 | 7A9C |
| 0000755060 | 7A9A | 7A5A | 7A5C | 7A9E | 157C | 7AA6 | 7AAA | 7AA8 |
| 0000755100 | 7AAC | 7AB0 | 7AA2 | 7AA4 | 1F2E | 7AB2 | 7AB8 | 7ABC |
| 0000755120 | 7ABE | 7AB4 | 7AB6 | 20F0 | 7AC2 | 7AC4 | FFFF | FFFF |
| 0000755140 | 7AC8 | 7ACA | 266A | 28D4 | 7AD0 | 7AD2 | 7ABA | 7ADo |
| 0000755160 | 7ADC | 7ADE | 7AE2 | 7AE4 | 7AE0 | 7AE8 | 7AEA | 7AEC |
| 0000755200 | 7AE6 | 7AEE | 7AD8 | 7ADA | 7AF2 | 7AF8 | 2B42 | 7AFC |
| 0000755220 | 7AFE | 7AF4 | 7AF6 | 3258 | 7B06 | 7AFA | 7B02 | 7B04 |
| 0000755240 | 0000 | 0000 | 0000 | 0000 | 3586 | 7B18 | 7B1A | 7B1C |
| 0000755260 | 7B1E | 7B20 | 7B22 | 7B24 | 7B26 | 7B28 | 7B2A | 7B2C |
| 0000755300 | 7B2E | 7B0A | 7B32 | 7B34 | 7B0C | 7B0E | 7B36 | 7B3C |
| 0000755320 | 7B38 | 7B3A | 3896 | 7B44 | 7B46 | 7B3E | 7B4A | 7B4C |
| 0000755340 | 7B4E | 7B50 | 7B48 | 7B52 | 7B56 | 7B54 | 7B5A | 0000 |
| 0000755360 | 0000 | 0000 | 0000 | 7B5C | 7B58 | 7B66 | 0000 | 0000 |
| 0000755400 | 0000 | 3FF0 | 0000 | 0000 | 0000 | BFF0 | 7B68 | 7B7C |
| 0000755420 | 7B7E | 7B6A | 7B40 | 7B42 | 7B80 | 7B88 | 3D08 | 7B8C |
| 0000755440 | 7ACC | 7ACE | 7B8E | 7B94 | 7B96 | 7B84 | 7B86 | 7B8A |
| 0000755460 | 7B9E | 43DE | 739A | 7B9C | 7BA4 | 7BA6 | 46FA | 7BAC |
| 0000755500 | 7B90 | 7B92 | 7BA0 | 7BAE | 7BB4 | 7BB8 | 7BB6 | 7BBA |
| 0000755520 | 7BBC | 7BC0 | 7BC2 | 7BC4 | 7BBE | 7BC6 | 7BCA | 7BC8 |
| 0000755540 | 7BCE | 7BA8 | 7BAA | 7BB0 | 7BB2 | 7BD2 | 7BD4 | 7BDA |
| 0000755560 | 7BDC | 7BD0 | 7BE2 | 7BE4 | 7BE6 | 7BE8 | 7BEA | 7BEC |
| 0000755600 | 7BEE | 0000 | 0000 | 0000 | 0000 | 7BF0 | 4D7C | 7BFC |
| 0000755620 | 7BFA | 7BFE | 74AA | 0000 | 0000 | 0000 | 0000 | 3C3C |
| 0000755640 | 4D4E | 4753 | 3E3E | 0000 | 3652 | 3030 | 0D30 | 2D0A |
| 0000755660 | 7320 | 6174 | 6B63 | 6F20 | 6576 | 6672 | 6F6C | 0D77 |
| 0000755700 | 000A | 0003 | 3652 | 3030 | 0D33 | 2D0A | 6920 | 746E |
| 0000755720 | 6765 | 7265 | 6420 | 7669 | 6469 | 2065 | 7962 | 3020 |
| 0000755740 | 0A0D | 0800 | 5200 | 3036 | 3830 | 0A0D | 202D | 6F6E |
| 0000755760 | 2074 | 6E65 | 756F | 6867 | 7320 | 6170 | 6563 | 6620 |
| 0000756000 | 726F | 6120 | 6772 | 6D75 | 6E65 | 7374 | 0A0D | 0900 |
| 0000756020 | 5200 | 3036 | 3930 | 0A0D | 202D | 6F6E | 2074 | 6E65 |
| 0000756040 | 756F | 6867 | 7320 | 6170 | 6563 | 6620 | 726F | 6520 |
| 0000756060 | 766E | 7269 | 6E6F | 656D | 746E | 0A0D | FC00 | 0D00 |
| 0000756100 | 000A | 00FF | 7572 | 2D6E | 6974 | 656D | 6520 | 7272 |
| 0000756120 | 726F | 0020 | 0002 | 3652 | 3030 | 0D32 | 2D0A | 6620 |
| 0000756140 | 6F6C | 7461 | 6E69 | 2D67 | 6F70 | 6E69 | 2074 | 7573 |
| 0000756160 | 7070 | 726F | 2074 | 6F6E | 2074 | 6F6C | 6461 | 6465 |
| 0000756200 | 0A0D | 1100 | 5200 | 3036 | 3731 | 0A0D | 202D | 6E75 |
| 0000756220 | 7865 | 6570 | 7463 | 6465 | 6D20 | 6C75 | 6974 | 6874 |
| 0000756240 | 6572 | 6461 | 6C20 | 636F | 206B | 7265 | 6F72 | 0D72 |
| 0000756260 | 000A | 0010 | 3652 | 3130 | 0D36 | 2D0A | 6E20 | 746F |
| 0000756300 | 6520 | 6F6E | 6775 | 2068 | 7073 | 6361 | 2065 | 6F66 |
| 0000756320 | 2072 | 6874 | 6572 | 6461 | 6420 | 7461 | 0D61 | 000A |
| 0000756340 | 00FD | 203A | 414D | 4854 | 0A0D | 202D | 6C66 | 616F |
| 0000756360 | 6974 | 676E | 702D | 696F | 746E | 6520 | 7272 | 726F |
| 0000756400 | 203A | 6500 | 6900 | 766E | 6C61 | 6469 | 0A0D | 6700 |

THU MAR 14 17:52:34 1991 TSLINT.DLL PAGE 267, LINE 15695

| | | | | | | | | |
|---|---|---|---|---|---|---|---|---|
| 0000756420 | 6400 | 7669 | 6469 | 2065 | 7962 | 3020 | 0A0D | 6800 |
| 0000756440 | 6F00 | 6576 | 6672 | 6F6C | 0D77 | 000A | 006E | 7473 |
| 0000756460 | 6361 | 206B | 766F | 7265 | 6C66 | 776F | 0A0D | 7000 |
| 0000756500 | 6500 | 7078 | 696C | 6963 | 6C74 | 2079 | 6567 | 656E |
| 0000756520 | 6172 | 6574 | 0D64 | 000A | 0078 | 4F44 | 414D | 4E49 |
| 0000756540 | 6520 | 7272 | 726F | 0A0D | 7900 | 5300 | 4E49 | 2047 |
| 0000756560 | 7265 | 6F72 | 0D72 | 000A | 007A | 4C54 | 534F | 2053 |
| 0000756600 | 7265 | 6F72 | 0D72 | 000A | 0000 | 0000 | 0000 | 0000 |
| 0000756620 | 0000 | 0000 | 0000 | 0000 | 0000 | 0000 | 0000 | 0000 |
| 0000756640 | 0000 | 0000 | 0000 | 0000 | 0000 | 0000 | 0000 | FF00 |
| 0000756660 | 0009 | 0002 | 2B56 | 0001 | 0000 | 0002 | 2BAA | 0002 |
| 0000756700 | 0000 | 0002 | 79C6 | 0004 | 0000 | 0002 | 70EA | 0008 |
| 0000756720 | 0000 | 0202 | 7BD8 | 0003 | 0017 | 0002 | 7826 | 0009 |
| 0000756740 | 0000 | 0202 | 7BDE | 0003 | 0025 | 0202 | 7BE0 | 0003 |
| 0000756760 | 0033 | 0202 | 7BD6 | 0003 | 00DC | 424E | 3230 | E2B1 |
| 0000757000 | 0002 | 0001 | 0000 | 6B79 | 0000 | 0000 | 0001 | 2E0F |
| 0000757020 | 5C2E | 626F | 5C6A | 7761 | 336B | 6F2E | 6A62 | 0001 |
| 0000757040 | 6B7A | 1685 | 0000 | 0000 | 0001 | 2E0F | 5C2E | 626F |
| 0000757060 | 5C6A | 7761 | 346B | 6F2E | 6A62 | 0001 | 8200 | 3751 |
| 0000757100 | 0000 | 0000 | 0001 | 2E0F | 5C2E | 626F | 5C6A | 7761 |
| 0000757120 | 366B | 6F2E | 6A62 | 0002 | 0000 | 4D6D | 0000 | 0000 |
| 0000757140 | 0001 | 2E0F | 5C2E | 626F | 5C6A | 7761 | 376B | 6F2E |
| 0000757160 | 6A62 | 0002 | 4D6E | 1518 | 0000 | 0000 | 0001 | 2E0F |
| 0000757200 | 5C2E | 626F | 5C6A | 7761 | 386B | 6F2E | 6A62 | 0002 |
| 0000757220 | 6286 | 110C | 0000 | 0000 | 0001 | 2E0F | 5C2E | 626F |
| 0000757240 | 5C6A | 7761 | 396B | 6F2E | 6A62 | 0002 | 7392 | 36B0 |
| 0000757260 | 0000 | 0000 | 0001 | 2E10 | 5C2E | 626F | 5C6A | 6572 |
| 0000757300 | 6567 | 2E78 | 626F | 026A | 4200 | 63AA | 0008 | 0000 |
| 0000757320 | 0100 | 1200 | 2E2E | 6F5C | 6A62 | 645C | 5F6F | 7266 |
| 0000757340 | 6565 | 6F2E | 6A62 | 0002 | B2A6 | 03CD | 0000 | 0000 |
| 0000757360 | 0001 | 2E0F | 5C2E | 626F | 5C6A | 7761 | 616B | 6F2E |
| 0000757400 | 6A62 | 0002 | B674 | 04A4 | 0000 | 0000 | 0001 | 2E11 |
| 0000757420 | 5C2E | 626F | 5C6A | 6172 | 646E | 6D6F | 6F2E | 6A62 |
| 0000757440 | 0002 | BB18 | 0173 | 0000 | 0000 | 0001 | 2E11 | 5C2E |
| 0000757460 | 626F | 5C6A | 6C61 | 6F6C | 6163 | 6F2E | 6A62 | 0002 |
| 0000757500 | BC8C | 334D | 0000 | 0000 | 0001 | 2E10 | 5C2E | 626F |
| 0000757520 | 5C6A | 7374 | 656C | 2E78 | 626F | 036A | 0000 | 2E00 |
| 0000757540 | 001C | 0000 | 0100 | 1200 | 2E2E | 6F5C | 6A62 | 745C |
| 0000757560 | 6C73 | 6168 | 6873 | 6F2E | 6A62 | 0003 | 1C2E | 0674 |
| 0000757600 | 0000 | 0000 | 0001 | 2E13 | 5C2E | 626F | 5C6A | 6F63 |
| 0000757620 | 726D | 6567 | 7078 | 6F2E | 6A62 | 0003 | 22A2 | 062A |
| 0000757640 | 0000 | 0000 | 0001 | 2E12 | 5C2E | 626F | 5C6A | 7374 |
| 0000757660 | 696C | 696E | 2E74 | 626F | 006A | 0000 | 0000 | 0000 |
| 0000757700 | 0000 | 000G | 1200 | 2E2E | 6F5C | 6A62 | 745C | 6C73 |
| 0000757720 | 6C67 | 626F | 6F2E | 6A62 | 0003 | 28CC | 0436 | 0000 |
| 0000757740 | 0000 | 0001 | 2E11 | 5C2E | 626F | 5C6A | 7374 | 706C |
| 0000757760 | 6275 | 6F2E | 6A62 | 0003 | 2D02 | 6AC8 | 0000 | 0000 |
| 0000760000 | 0001 | 2E11 | 5C2E | 626F | 5C6A | 7374 | 696C | 746E |
| 0000760020 | 6F2E | 6A62 | 0003 | 97CA | 1576 | 0000 | 0000 | 0001 |
| 0000760040 | 2E13 | 5C2E | 626F | 5C6A | 6564 | 7562 | 6767 | 7265 |
| 0000760060 | 6F2E | 6A62 | 0003 | AD40 | 090D | 0000 | 0000 | 0001 |
| 0000760100 | 2E11 | 5C2E | 626F | 5C6A | 7374 | 656C | 7272 | 6F2E |
| 0000760120 | 6A62 | 0003 | B64E | 0A19 | 0000 | 0000 | 0001 | 2E13 |
| 0000760140 | 5C2E | 626F | 5C6A | 7374 | 5F74 | 6163 | 6C6C | 6F2E |
| 0000760160 | 6A62 | 0003 | C068 | 148D | 0000 | 0000 | 0001 | 2E10 |
| 0000760200 | 5C2E | 626F | 5C6A | 7374 | 746C | 2E63 | 626F | 036A |
| 0000760220 | F600 | 7DD4 | 000E | 0000 | 0100 | 1200 | 2E2E | 6F5C |
| 0000760240 | 6A62 | 745C | 6C73 | 6163 | 6C6C | 6F2E | 6A62 | 0003 |
| 0000760260 | E374 | 1997 | 0000 | 0000 | 0001 | 2E13 | 5C2E | 626F |

THU MAR 14 17:52:34 1991 TSLINT.DLL PAGE 268, LINE 15754

| | | | | | | | | |
|---|---|---|---|---|---|---|---|---|
| 0000760300 | 5C6A | 6C68 | 656D | 6D6D | 7267 | 6F2E | 6A62 | 0004 |
| 0000760320 | 0000 | 2BC9 | 0000 | 0000 | 0001 | 2E0E | 5C2E | 626F |
| 0000760340 | 5C6A | 7761 | 2E6B | 626F | 046A | DA00 | D12B | 0000 |
| 0000760360 | 0100 | 0100 | 0B00 | 6C64 | 5C6C | 7363 | 2E75 | 7361 |
| 0000760400 | 046D | AC00 | AF2C | 0001 | 0100 | 0100 | 0E00 | 6C64 |
| 0000760420 | 5C6C | 7363 | 6475 | 7461 | 612E | 6D73 | 0004 | 2E5C |
| 0000760440 | 0022 | 0000 | 0001 | 0001 | 6F0F | 3273 | 635C | 7472 |
| 0000760460 | 6D30 | 6773 | 612E | 6D73 | 0004 | 2E7E | 0006 | 0000 |
| 0000760500 | 0001 | 0001 | 630A | 7472 | 6630 | 2E70 | 7361 | 046D |
| 0000760520 | 8400 | 1A2E | 0000 | 0100 | 0100 | 0A00 | 6863 | 736B |
| 0000760540 | 6B74 | 612E | 6D73 | 0004 | 2E9E | 0108 | 0000 | 0001 |
| 0000760560 | 0001 | 640D | 6C6C | 735C | 7465 | 6E65 | 7076 | 632E |
| 0000760600 | 0004 | 2FA6 | 0065 | 0000 | 0001 | 0001 | 6F0F | 3273 |
| 0000760620 | 6E5C | 736D | 6867 | 7264 | 612E | 6D73 | 0004 | 300C |
| 0000760640 | 00C0 | 0000 | 0001 | 0001 | 6F0E | 3273 | 645C | 736F |
| 0000760660 | 6572 | 2E74 | 7361 | 046D | CC00 | 0230 | 0001 | 0100 |
| 0000760700 | 0100 | 0800 | 6366 | 6F6C | 6573 | 632E | 0004 | 31CE |
| 0000760720 | 006A | 0000 | 0001 | 0001 | 6607 | 706F | 6E65 | 632E |
| 0000760740 | 0004 | 3238 | 005A | 0000 | 0001 | 0001 | 6609 | 7270 |
| 0000760760 | 6E69 | 6674 | 632E | 0004 | 3292 | 01D1 | 0000 | 0001 |
| 0000761000 | 0001 | 660A | 7277 | 7469 | 2E65 | 7361 | 046D | 6400 |
| 0000761020 | 4E34 | 0000 | 0100 | 0100 | 0800 | 7270 | 6E69 | 6674 |
| 0000761040 | 632E | 0000 | 0000 | 0000 | 0000 | 0001 | 0000 | 5F0B |
| 0000761060 | 6663 | 756C | 6873 | 612E | 6D73 | 0000 | 0000 | 0000 |
| 0000761100 | 0000 | 0001 | 0000 | 5F07 | 6966 | 656C | 632E | 0004 |
| 0000761120 | 34B2 | 009C | 0000 | 0001 | 0001 | 5F0B | 6966 | 626C |
| 0000761140 | 6675 | 612E | 6D73 | 0004 | 354E | 00E5 | 0000 | 0001 |
| 0000761160 | 0001 | 5F0B | 6C66 | 6273 | 6675 | 612E | 6D73 | 0004 |
| 0000761200 | 3634 | 0037 | 0000 | 0001 | 0001 | 5F0C | 7266 | 6565 |
| 0000761220 | 7562 | 2E66 | 7361 | 046D | 6C00 | 4B36 | 0000 | 0100 |
| 0000761240 | 0100 | 0B00 | 675F | 7465 | 7562 | 2E66 | 7361 | 046D |
| 0000761260 | B800 | F236 | 0000 | 0100 | 0100 | 0700 | 6F5F | 6570 |
| 0000761300 | 2E6E | 0463 | AA00 | C037 | 0000 | 0100 | 0100 | 0B00 |
| 0000761320 | 735F | 7466 | 7562 | 2E66 | 7361 | 046D | 6A00 | 2E38 |
| 0000761340 | 0001 | 0100 | 0100 | 0800 | 6666 | 756C | 6873 | 632E |
| 0000761360 | 0004 | 3998 | 082A | 0000 | 0001 | 0001 | 6907 | 706E |
| 0000761400 | 7475 | 632E | 0004 | 41C2 | 04FA | 0000 | 0001 | 0001 |
| 0000761420 | 6F0A | 7475 | 7570 | 2E74 | 7361 | 046D | BC00 | 7846 |
| 0000761440 | 0000 | 0100 | 0100 | 0800 | 7473 | 6572 | 6D61 | 632E |
| 0000761460 | 0004 | 4734 | 00AA | 0000 | 0001 | 0001 | 7508 | 676E |
| 0000761500 | 7465 | 2E63 | 0463 | DE00 | 3F47 | 0000 | 0100 | 0100 |
| 0000761520 | 0D00 | 736F | 5C32 | 6C63 | 736F | 2E65 | 7361 | 046D |
| 0000761540 | 1E00 | 7748 | 0000 | 0100 | 0100 | 0D00 | 736F | 5C32 |
| 0000761560 | 736C | 6565 | 2E6B | 7361 | 046D | 9600 | DD48 | 0001 |
| 0000761600 | 0100 | 0100 | 0C00 | 736F | 5C32 | 706F | 6E65 | 612E |
| 0000761620 | 6D73 | 0004 | 4A74 | 015D | 0000 | 0001 | 0001 | 6F0C |
| 0000761640 | 3273 | 725C | 6165 | 2E64 | 7361 | 046D | D200 | DD4B |
| 0000761660 | 0001 | 0100 | 0100 | 0900 | 7277 | 7469 | 2E65 | 7361 |
| 0000761700 | 006D | 0000 | 0000 | 0000 | 0100 | 0000 | 0B00 | 7874 |
| 0000761720 | 6D74 | 646F | 2E65 | 7361 | 046D | B000 | 0A4D | 0000 |
| 0000761740 | 0100 | 0100 | 0A00 | 616D | 6C6C | 636F | 612E | 6D73 |
| 0000761760 | 0004 | 4DBA | 000A | 0000 | 0001 | 0001 | 6608 | 6572 |
| 0000762000 | 2E65 | 7361 | 046D | C400 | AF4D | 0000 | 0100 | 0100 |
| 0000762020 | 0B00 | 6D66 | 6C61 | 6F6C | 2E63 | 7361 | 006D | 0000 |
| 0000762040 | 0000 | 0000 | 0100 | 0000 | 0900 | 6466 | 7461 | 2E61 |
| 0000762060 | 7361 | 046D | 7400 | 344E | 0000 | 0100 | 0100 | 0B00 |
| 0000762100 | 6E69 | 7469 | 6573 | 2E67 | 7361 | 046D | A800 | 364E |
| 0000762120 | 0000 | 0100 | 0100 | 0B00 | 696C | 6B6E | 6573 | 2E67 |
| 0000762140 | 7361 | 046D | DE00 | 7C4E | 0000 | 0100 | 0100 | 0C00 |

THU MAR 14 17:52:34 1991 TSLINT.DLL PAGE 269, LINE 15813

| | | | | | | | | |
|---|---|---|---|---|---|---|---|---|
| 0000762160 | 6573 | 7261 | 6863 | 6773 | 612E | 6D73 | 0004 | 4F5A |
| 0000762200 | 00E2 | 0000 | 0001 | 0001 | 670B | 6F72 | 7377 | 6765 |
| 0000762220 | 612E | 6D73 | 0004 | 503C | 0031 | 0000 | 0001 | 0001 |
| 0000762240 | 6E0A | 7765 | 6573 | 2E67 | 7361 | 046D | 6E00 | 4650 |
| 0000762260 | 0000 | 0100 | 0100 | 0A00 | 7473 | 6372 | 7461 | 612E |
| 0000762300 | 6D73 | 0004 | 50B4 | 0036 | 0000 | 0001 | 0001 | 730A |
| 0000762320 | 7274 | 7063 | 2E79 | 7361 | 046D | EA00 | 2950 | 0000 |
| 0000762340 | 0100 | 0100 | 0A00 | 7473 | 6372 | 706D | 612E | 6D73 |
| 0000762360 | 0004 | 5114 | 0017 | 0000 | 0001 | 0001 | 730A | 7274 |
| 0000762400 | 656C | 2E6E | 7361 | 046D | 2C00 | 2A51 | 0000 | 0100 |
| 0000762420 | 0100 | 0B00 | 7473 | 6E72 | 7063 | 2E79 | 7361 | 046D |
| 0000762440 | 5600 | 3B51 | 0000 | 0100 | 0100 | 0B00 | 7473 | 6E72 |
| 0000762460 | 6D63 | 2E70 | 7361 | 046D | 9200 | 0351 | 0000 | 0100 |
| 0000762500 | 0100 | 0800 | 7461 | 6C6F | 612E | 6D73 | 0004 | 5196 |
| 0000762520 | 0060 | 0000 | 0001 | 0001 | 6106 | 6F74 | 2E66 | 0463 |
| 0000762540 | F600 | 5651 | 0000 | 0100 | 0100 | 0800 | 7461 | 786F |
| 0000762560 | 612E | 6D73 | 0004 | 524C | 001C | 0000 | 0001 | 0001 |
| 0000762600 | 6908 | 6F74 | 2E61 | 7361 | 046D | 6800 | A252 | 0000 |
| 0000762620 | 0100 | 0100 | 0A00 | 665F | 7470 | 736F | 7274 | 632E |
| 0000762640 | 0000 | 0000 | 0000 | 0000 | 0001 | 0000 | 630C | 696D |
| 0000762660 | 6373 | 6164 | 2E74 | 7361 | 006D | 0000 | 0000 | 0000 |
| 0000762700 | 0100 | 0000 | 0900 | 7463 | 7079 | 2E65 | 7361 | 046D |
| 0000762720 | 0A00 | A653 | 0000 | 0100 | 0100 | 0800 | 6567 | 6574 |
| 0000762740 | 766E | 632E | 0004 | 53B0 | 0018 | 0000 | 0001 | 0001 |
| 0000762760 | 690A | 6173 | 7474 | 2E79 | 7361 | 046D | C800 | 2053 |
| 0000763000 | 0000 | 0100 | 0100 | 0D00 | 736F | 5C32 | 6468 | 6669 |
| 0000763020 | 2E66 | 7361 | 046D | E800 | BA53 | 0000 | 0100 | 0100 |
| 0000763040 | 0D00 | 736F | 5C32 | 6C6D | 636F | 2E6B | 7361 | 046D |
| 0000763060 | A200 | 0E54 | 0001 | 0100 | 0100 | 0E00 | 6C64 | 5C6C |
| 0000763100 | 6874 | 6572 | 6461 | 612E | 6D73 | 0004 | 55B0 | 007A |
| 0000763120 | 0000 | 0001 | 0001 | 6410 | 6C6C | 745C | 6469 | 6174 |
| 0000763140 | 6C62 | 2E65 | 7361 | 046D | 2A00 | E656 | 0000 | 0100 |
| 0000763160 | 0100 | 0800 | 6466 | 706F | 6E65 | 632E | 0004 | 5710 |
| 0000763200 | 00CE | 0000 | 0001 | 0001 | 6607 | 6573 | 6B65 | 632E |
| 0000763220 | 0004 | 57DE | 01D4 | 0000 | 0001 | 0001 | 6607 | 6574 |
| 0000763240 | 6C6C | 632E | 0004 | 59B2 | 0074 | 0000 | 0001 | 0001 |
| 0000763260 | 7309 | 7270 | 6E69 | 6674 | 632E | 0004 | 5A26 | 005C |
| 0000763300 | 0000 | 0001 | 0001 | 7308 | 6373 | 6E61 | 2E66 | 0463 |
| 0000763320 | 8200 | 745A | 0000 | 0100 | 0100 | 0A00 | 7376 | 7270 |
| 0000763340 | 6E69 | 6674 | 632E | 0004 | 5AF6 | 00AD | 0000 | 0001 |
| 0000763360 | 0001 | 660C | 6572 | 6C61 | 6F6C | 2E63 | 7361 | 046D |
| 0000763400 | A400 | 0A5B | 0000 | 0100 | 0100 | 0B00 | 6572 | 6C61 |
| 0000763420 | 6F6C | 2E63 | 7361 | 046D | AE00 | C85B | 0000 | 0100 |
| 0000763440 | 0100 | 0A00 | 6572 | 6973 | 657A | 612E | 6D73 | 0004 |
| 0000763460 | 5C76 | 002E | 0000 | 0001 | 0001 | 630A | 6C61 | 6F6C |
| 0000763500 | 2E63 | 7361 | 046D | A400 | 255C | 0000 | 0100 | 0100 |
| 0000763520 | 0B00 | 6966 | 646E | 6573 | 2E67 | 7361 | 046D | CA00 |
| 0000763540 | 9C5C | 0001 | 0100 | 0100 | 0900 | 7361 | 7463 | 6D69 |
| 0000763560 | 2E65 | 0463 | 6600 | 2E5E | 0000 | 0100 | 0100 | 0700 |
| 0000763600 | 7463 | 6D69 | 2E65 | 0063 | 0000 | 0000 | 0000 | 0100 |
| 0000763620 | 0000 | 0600 | 6164 | 7379 | 632E | 0004 | 5E94 | 0246 |
| 0000763640 | 0000 | 0001 | 0001 | 6708 | 746D | 6D69 | 2E65 | 0463 |
| 0000763660 | DA00 | 8460 | 0000 | 0100 | 0100 | 0A00 | 6F6C | 6163 |
| 0000763700 | 746C | 6D69 | 632E | 0004 | 615E | 0049 | 0000 | 0001 |
| 0000763720 | 0001 | 6F0C | 3273 | 745C | 6D69 | 2E65 | 7361 | 046D |
| 0000763740 | A800 | C861 | 0001 | 0100 | 0100 | 0700 | 7A74 | 6573 |
| 0000763760 | 2E74 | 0063 | 0000 | 0000 | 0000 | 0100 | 0000 | 09C5 |
| 0000764000 | 6974 | 656D | 6573 | 2E74 | 0463 | 7000 | F663 | 0000 |
| 0000764020 | 0100 | 0100 | 0A00 | 7464 | 786F | 6974 | 656D | 632E |

THU MAR 14 17:52:34 1991 TSLINT.DLL PAGE 270, LINE 15872

| | | | | | | | | |
|---|---|---|---|---|---|---|---|---|
| 0000764040 | 0004 | 6466 | 002D | 0000 | 0001 | 0001 | 730A | 7274 |
| 0000764060 | 6863 | 2E72 | 7361 | 046D | 9400 | 4564 | 0000 | 0100 |
| 0000764100 | 0100 | 0B00 | 7473 | 6972 | 6D63 | 2E70 | 7361 | 046D |
| 0000764120 | DA00 | 2E64 | 0000 | 0100 | 0100 | 0B00 | 7473 | 7272 |
| 0000764140 | 6863 | 2E72 | 7361 | 046D | 0800 | CA65 | 0000 | 0100 |
| 0000764160 | 0100 | 0B00 | 6D68 | 6D65 | 7063 | 2E79 | 7361 | 046D |
| 0000764200 | D200 | 5B65 | 0000 | 0100 | 0100 | 0B00 | 6D68 | 6D65 |
| 0000764220 | 6D63 | 2E70 | 7361 | 046D | 2E00 | 5E66 | 0000 | 0100 |
| 0000764240 | 0100 | 0B00 | 6D68 | 6D65 | 7063 | 2E79 | 7361 | 046D |
| 0000764260 | 8C00 | 4866 | 0000 | 0100 | 0100 | 0B00 | 6D68 | 6D65 |
| 0000764300 | 6573 | 2E74 | 7361 | 046D | D400 | 6366 | 0000 | 0100 |
| 0000764320 | 0100 | 0800 | 7478 | 616F | 612E | 6D73 | 0004 | 6738 |
| 0000764340 | 00F0 | 0000 | 0001 | 0001 | 6706 | 7663 | 2E74 | 0463 |
| 0000764360 | 2800 | AA68 | 0000 | 0100 | 0100 | 0900 | 6567 | 7074 |
| 0000764400 | 7461 | 2E68 | 0463 | D200 | 5468 | 0000 | 0100 | 0100 |
| 0000764420 | 0A00 | 6573 | 6A74 | 706D | 612E | 6D73 | 0000 | 0000 |
| 0000764440 | 0000 | 0000 | 0001 | 0000 | 7308 | 7379 | 7265 | 2E72 |
| 0000764460 | 0463 | 2600 | 1A69 | 0000 | 0100 | 0100 | 0F00 | 736F |
| 0000764500 | 5C32 | 7277 | 3274 | 7265 | 2E72 | 7361 | 046D | 4000 |
| 0000764520 | 0C69 | 0001 | 0100 | 0100 | 0A00 | 6573 | 7261 | 6863 |
| 0000764540 | 6E65 | 632E | 0004 | 6A4C | 043A | 0000 | 0001 | 0001 |
| 0000764560 | 6F0D | 3273 | 635C | 6E65 | 6176 | 6772 | 632E | 0000 |
| 0000764600 | 0000 | 0000 | 0000 | 0001 | 0000 | 630A | 6966 | 666E |
| 0000764620 | 2E6F | 7361 | 046D | 8600 | 826E | 0000 | 0100 | 0100 |
| 0000764640 | 0F00 | 736F | 5C32 | 6F64 | 7073 | 7761 | 2E6E | 7361 |
| 0000764660 | 046D | 0800 | 946F | 0003 | 0100 | 0100 | 0D00 | 736F |
| 0000764700 | 5C32 | 7073 | 7761 | 766E | 2E65 | 0463 | 9C00 | CE72 |
| 0000764720 | 0001 | 0100 | 0100 | 0A00 | 7073 | 7761 | 766E | 6570 |
| 0000764740 | 632E | 0004 | 746A | 00E6 | 0000 | 0001 | 0001 | 7308 |
| 0000764760 | 7379 | 6574 | 2E6D | 0463 | 5000 | 3B75 | 0000 | 0100 |
| 0000765000 | 0100 | 0E00 | 736F | 5C32 | 6361 | 6563 | 7373 | 612E |
| 0000765020 | 6D73 | 0004 | 758C | 002A | 0000 | 0001 | 0001 | 6F0D |
| 0000765040 | 3273 | 645C | 6972 | 6576 | 612E | 6D73 | 0004 | 75B6 |
| 0000765060 | 0274 | 0000 | 0001 | 0001 | 6F0B | 3273 | 665C | 7473 |
| 0000765100 | 7461 | 632E | 0004 | 782A | 013A | 0000 | 0001 | 0001 |
| 0000765120 | 6F0C | 3273 | 675C | 7465 | 7763 | 2E64 | 0463 | 6400 |
| 0000765140 | 1D79 | 0000 | 0100 | 0100 | 0E00 | 736F | 5C32 | 6E75 |
| 0000765160 | 696C | 6B6E | 612E | 6D73 | 0004 | 7982 | 0022 | 0000 |
| 0000765200 | 0001 | 0001 | 6109 | 646C | 7669 | 612E | 6D73 | 0004 |
| 0000765220 | 79A4 | 0022 | 0000 | 0001 | 0001 | 6109 | 6D6C | 6C75 |
| 0000765240 | 612E | 6D73 | 0004 | 79C6 | 0022 | 0000 | 0001 | 0001 |
| 0000765260 | 6109 | 726C | 6D65 | 612E | 6D73 | 0004 | 79E8 | 001F |
| 0000765300 | 0000 | 0001 | 0001 | 6109 | 736C | 6C68 | 612E | 6D73 |
| 0000765320 | 0004 | 7A08 | 0022 | 0000 | 0001 | 0001 | 610A | 6C75 |
| 0000765340 | 6964 | 2E76 | 7361 | 046D | 2A00 | 9A7A | 0000 | 0100 |
| 0000765360 | 0100 | 0800 | 646C | 7669 | 612E | 6D73 | 0004 | 7AC4 |
| 0000765400 | 0032 | 0000 | 0001 | 0001 | 6C08 | 756D | 2E6C | 7361 |
| 0000765420 | 046D | F600 | A07A | 0000 | 0100 | 0100 | 0800 | 726C |
| 0000765440 | 6D65 | 612E | 6D73 | 0004 | 7B96 | 000B | 0000 | 0001 |
| 0000765460 | 0001 | 6C08 | 6873 | 2E6C | 7361 | 046D | A200 | 5F7B |
| 0000765500 | 0000 | 0100 | 0100 | 0900 | 6C75 | 6964 | 2E76 | 7361 |
| 0000765520 | 046D | 0200 | 6A7C | 0000 | 0100 | 0100 | 0900 | 6C75 |
| 0000765540 | 6572 | 2E6D | 7361 | 046D | 6C00 | A67C | 0000 | 0100 |
| 0000765560 | 0100 | 1600 | 6D5C | 7472 | 635C | 6D6F | 6F6D | 5C6E |
| 0000765600 | 666D | 6163 | 6C6C | 612E | 6D73 | 0004 | 7D12 | 03D3 |
| 0000765620 | 0000 | 0001 | 0001 | 5C16 | 726D | 5C74 | 6F63 | 6D6D |
| 0000765640 | 6E6F | 695C | 6378 | 6E6F | 2E76 | 5341 | 044D | E600 |
| 0000765660 | B880 | 0000 | 0100 | 0100 | 1600 | 6D5C | 7472 | 635C |
| 0000765700 | 6D6F | 6F6D | 5C6E | 7869 | 6F63 | 706D | 412E | 4D53 |

THU MAR 14 17:52:34 1991 TSLINT.DLL PAGE 271, LINE 15931

| | | | | | | | | |
|---|---|---|---|---|---|---|---|---|
| 0000765720 | 0004 | 819E | 02FA | 0000 | 0001 | 0001 | 5C16 | 726D |
| 0000765740 | 5C74 | 6F63 | 6D6D | 6E6F | 625C | 6D34 | 7461 | 2E68 |
| 0000765760 | 5341 | 044D | 9800 | C084 | 0005 | 0100 | 0100 | 1600 |
| 0000766000 | 6D5C | 7472 | 635C | 6D6F | 6F6D | 5C6E | 3862 | 616D |
| 0000766020 | 6874 | 412E | 4D53 | 0004 | 8A58 | 00D4 | 0000 | 0001 |
| 0000766040 | 0001 | 5C15 | 726D | 5C74 | 6F63 | 6D6D | 6E6F | 625C |
| 0000766060 | 7378 | 7271 | 612E | 6D73 | 0004 | 8B2C | 0128 | 0000 |
| 0000766100 | 0001 | 0001 | 5C16 | 726D | 5C74 | 6F63 | 6D6D | 6E6F |
| 0000766120 | 785C | 6878 | 6C65 | 2E70 | 7361 | 046D | 5400 | 6C8C |
| 0000766140 | 0000 | 0100 | 0100 | 1600 | 6D5C | 7472 | 635C | 6D6F |
| 0000766160 | 6F6D | 5C6E | 7878 | 6F63 | 6D6D | 612E | 6D73 | 0004 |
| 0000766200 | 8CC0 | 00F3 | 0000 | 0001 | 0001 | 5C16 | 726D | 5C74 |
| 0000766220 | 6F63 | 6D6D | 6E6F | 785C | 7478 | 6172 | 2E6E | 7361 |
| 0000766240 | 046D | B300 | BD8D | 0001 | 0100 | 0100 | 1600 | 6D5C |
| 0000766260 | 7472 | 635C | 6D6F | 6F6D | 5C6E | 7878 | 6F70 | 7277 |
| 0000766300 | 612E | 6D73 | 0004 | 8F70 | 00AE | 0000 | 0001 | 0001 |
| 0000766320 | 5C17 | 726D | 5C74 | 6F63 | 6D6D | 6E6F | 785C | 7478 |
| 0000766340 | 6872 | 706C | 612E | 6D73 | 0004 | 901E | 00DF | 0000 |
| 0000766360 | 0001 | 0001 | 5C16 | 726D | 5C74 | 6F63 | 6D6D | 6E6F |
| 0000766400 | 785C | 7478 | 6972 | 2E67 | 7361 | 046D | FD00 | 9590 |
| 0000766420 | 0000 | 0100 | 0100 | 1700 | 6D5C | 7472 | 635C | 6D6F |
| 0000766440 | 6F6D | 5C6E | 7878 | 7274 | 6769 | 2E61 | 7361 | 046D |
| 0000766460 | 9200 | 9D91 | 0000 | 0100 | 0100 | 1800 | 6D5C | 7472 |
| 0000766500 | 635C | 6D6F | 6F6D | 5C6E | 7878 | 7274 | 6769 | 3261 |
| 0000766520 | 612E | 6D73 | 0004 | 922F | 018B | 0000 | 0001 | 0001 |
| 0000766540 | 5C17 | 726D | 5C74 | 6F63 | 6D6D | 6E6F | 6D5C | 3869 |
| 0000766560 | 6F66 | 7475 | 612E | 6D73 | 0004 | 93BA | 0338 | 0000 |
| 0000766600 | 0001 | 0001 | 5C16 | 726D | 5C74 | 6F63 | 6D6D | 6E6F |
| 0000766620 | 6D5C | 3869 | 6966 | 2E6E | 7361 | 046D | F200 | 8A96 |
| 0000766640 | 0001 | 0100 | 0100 | 1700 | 6D5C | 7472 | 635C | 6D6F |
| 0000766660 | 6F6D | 5C6E | 696D | 7438 | 756D | 2E6C | 7361 | 046D |
| 0000766700 | 7C00 | 5798 | 0000 | 0100 | 0100 | 1100 | 6D5C | 7472 |
| 0000766720 | 635C | 6D5C | 6D61 | 7470 | 2E64 | 7361 | 046D | D400 |
| 0000766740 | 1498 | 0000 | 0100 | 0100 | 1200 | 6D5C | 7472 | 635C |
| 0000766760 | 665C | 746C | 7375 | 6465 | 412E | 4D53 | 0004 | 98E8 |
| 0000767000 | 0729 | 0000 | 0001 | 0001 | 5C11 | 726D | 5C74 | 5C63 |
| 0000767020 | 636D | 6163 | 6C6C | 612E | 6D73 | 0004 | A012 | 0084 |
| 0000767040 | 0000 | 0001 | 0001 | 5C12 | 726D | 5C74 | 5C63 | 636D |
| 0000767060 | 6163 | 6C6C | 2E65 | 7361 | 006D | 0000 | 0000 | 0000 |
| 0000767100 | 0100 | 0000 | 0F00 | 6D5C | 7472 | 635C | 685C | 6775 |
| 0000767120 | 2E65 | 5341 | 044D | 9600 | C0A0 | 0001 | 0100 | 0100 |
| 0000767140 | 1100 | 6D5C | 7472 | 635C | 6D5C | 6463 | 7369 | 2E70 |
| 0000767160 | 7361 | 046D | 5600 | 12A2 | 0000 | 0100 | 0100 | 1000 |
| 0000767200 | 6D5C | 7472 | 635C | 635C | 7173 | 7472 | 412E | 4D53 |
| 0000767220 | 0004 | A268 | 0048 | 0000 | 0001 | 0001 | 5C10 | 726D |
| 0000767240 | 5C74 | 5C63 | 7463 | 6172 | 2E6E | 5341 | 044D | B000 |
| 0000767260 | 36A2 | 0000 | 0100 | 0100 | 1000 | 6D5C | 7472 | 635C |
| 0000767300 | 635C | 7274 | 6769 | 412E | 4D53 | 0004 | A2E6 | 0048 |
| 0000767320 | 0000 | 0001 | 0001 | 5C11 | 726D | 5C74 | 5C63 | 7463 |
| 0000767340 | 6972 | 6167 | 412E | 4D53 | 0004 | A32E | 00B5 | 0000 |
| 0000767360 | 0001 | 0001 | 5C10 | 726D | 5C74 | 5C63 | 636D | 6966 |
| 0000767400 | 2E6E | 7361 | 046D | E400 | 40A3 | 0000 | 0100 | 0100 |
| 0000767420 | 1100 | 6D5C | 7472 | 635C | 6D5C | 6663 | 756F | 2E74 |
| 0000767440 | 7361 | 046D | 2400 | 3EA4 | 0006 | 0100 | 0100 | 0C00 |
| 0000767460 | 6D5C | 7472 | 635C | 635C | 7476 | 632E | 0004 | AA62 |
| 0000767500 | 000F | 0000 | 0001 | 0001 | 5C12 | 726D | 5C74 | 5C63 |
| 0000767520 | 616D | 6874 | 7265 | 2E72 | 5341 | 044D | 7200 | A1AA |
| 0000767540 | 0000 | 0100 | 0100 | 1200 | 6D5C | 7472 | 635C | 665C |
| 0000767560 | 726C | 6563 | 6C69 | 412E | 4D53 | 0C62 | 0008 | 05A9 |

THU MAR 14 17:52:34 1991 TSLINT.DLL PAGE 272, LINE 15990

| | | | | | | | | |
|---|---|---|---|---|---|---|---|---|
| 0000767600 | 5F08 | 5346 | 6E5F | 646F | 9A65 | 080A | A900 | 0805 |
| 0000767620 | 4E5F | 5F46 | 6F6E | 6564 | 0000 | 0008 | 05A9 | 5F08 |
| 0000767640 | 5352 | 6E5F | 646F | 8265 | 080C | A900 | 0805 | 4E5F |
| 0000767660 | 5F52 | 6F6E | 6564 | 007C | 0008 | 05A9 | 5F0E | 4946 |
| 0000767700 | 454C | 414E | 454D | 6E5F | 646F | 5865 | 080C | A900 |
| 0000767720 | 0905 | 4F5F | 5346 | 6E5F | 646F | 3065 | 0800 | A900 |
| 0000767740 | 0905 | 4F5F | 5352 | 6E5F | 646F | 8065 | 080A | A900 |
| 0000767760 | 0A05 | 4F5F | 4D46 | 5F54 | 6F6E | 6564 | 0C6A | 0008 |
| 0000770000 | 05A9 | 5F09 | ^546 | 5F52 | 6F6E | 6564 | 0A62 | 0008 |
| 0000770020 | 05A9 | 5F0D | 4C52 | 4E45 | 5447 | 5F48 | 6F6E | 6564 |
| 0000770040 | 0AB4 | 0008 | 05A9 | 5F0C | 5352 | 4154 | 5452 | 6E5F |
| 0000770060 | 646F | 6665 | 080A | A900 | 0C05 | 535F | 4255 | 4553 |
| 0000770100 | 5F50 | 6F6E | 6564 | 085A | 0008 | 05A9 | 5F0D | 4E45 |
| 0000770120 | 4956 | 4F52 | 5F4E | 6F6E | 6564 | 0C66 | 0008 | 05A9 |
| 0000770140 | 5F10 | 4749 | 4F4E | 4552 | 4143 | 4553 | 6E5F | 646F |
| 0000770160 | 7C65 | 080A | A900 | 0A05 | 415F | 4752 | 5F43 | 6F6E |
| 0000770200 | 6564 | 0AB8 | 0008 | 05A9 | 5F0A | 5241 | 5647 | 6E5F |
| 0000770220 | 646F | 7765 | 0103 | 5800 | 0706 | 645F | 5F6F | 7865 |
| 0000770240 | 7F70 | 0157 | CC00 | 1006 | 645F | 5F6F | 6572 | 6573 |
| 0000770260 | 5F74 | 6966 | 746C | 7265 | 03EB | 0001 | 065A | 5F09 |
| 0000770300 | 6F64 | 695F | 646E | 7865 | 5A3F | 0001 | 06D0 | 5F11 |
| 0000770320 | 6F64 | 735F | 7465 | 655F | 6378 | 7065 | 6974 | 6E6F |
| 0000770340 | 04D8 | 0001 | 065C | 5F07 | 6F64 | 695F | 746E | 5D30 |
| 0000770360 | 0001 | 06D3 | 5F13 | 6F64 | 725F | 7365 | 7465 | 655F |
| 0000770400 | 6378 | 7065 | 6974 | 6E6F | 054C | 0001 | 065E | 5F0A |
| 0000770420 | 6F64 | 6C5F | 6E65 | 7467 | F068 | 015F | D700 | 0806 |
| 0000770440 | 645F | 5F6F | 6574 | 6863 | 05A9 | 0001 | 0660 | 5F07 |
| 0000770460 | 6F64 | 6C5F | 676F | 6299 | 0001 | 06DA | 5F09 | 6F64 |
| 0000770500 | 705F | 7561 | 6573 | 061D | 0001 | 0662 | 5F0A | 6F64 |
| 0000770520 | 705F | 6972 | 746E | A566 | 0164 | DD00 | 0806 | 645F |
| 0000770540 | 5F6F | 6177 | 7469 | 0712 | 0001 | 0666 | 5F09 | 6F64 |
| 0000770560 | 735F | 6C70 | 7469 | 6746 | 0001 | 06DF | 5F0C | 6F64 |
| 0000770600 | 675F | 7465 | 745F | 6D69 | 5B65 | 0108 | 6900 | 0B06 |
| 0000770620 | 645F | 5F6F | 7073 | 6972 | 746E | 9066 | 0167 | E100 |
| 0000770640 | 0C06 | 645F | 5F6F | 6974 | 656D | 735F | 7274 | 1F61 |
| 0000770660 | 0001 | 066F | 5F08 | 6F64 | 735F | 7271 | 3674 | 0168 |
| 0000770700 | E300 | 0B06 | 645F | 5F6F | 6962 | 6270 | 706B | D574 |
| 0000770720 | 011F | 7100 | 0A06 | 645F | 5F6F | 7573 | 7362 | 7274 |
| 0000770740 | 4DA0 | 0001 | 06BB | 5419 | 4C53 | 535F | 5445 | 505F |
| 0000770760 | 5541 | 4553 | 4F5F | 5F4E | 494D | 4D53 | 5441 | 4843 |
| 0000771000 | 69A0 | 0001 | 06E5 | 5F12 | 7374 | 5F6C | 7572 | 746E |
| 0000771020 | 6D69 | 5F65 | 7265 | 6F72 | DF72 | 0120 | 7300 | 0A06 |
| 0000771040 | 645F | 5F6F | 7973 | 7473 | 6D65 | 215C | 0001 | 0675 |
| 0000771060 | 5F09 | 6F64 | 705F | 6972 | 746E | 2366 | 0001 | 0679 |
| 0000771100 | 5F0B | 6F64 | 745F | 6C6F | 776F | 7265 | 243E | 0001 |
| 0000771120 | 067B | 5F0B | 6F64 | 745F | 756F | 7070 | 7265 | 2EF2 |
| 0000771140 | 0001 | 0687 | 5F0D | 7270 | 6E69 | 5F74 | 6973 | 706D |
| 0000771160 | 656C | 308C | 0001 | 068B | 5F09 | 6F64 | 615F | 6174 |
| 0000771200 | 326E | 3125 | 0001 | 068D | 5F07 | 6F64 | 735F | 6E69 |
| 0000771220 | 3199 | 0001 | 068F | 5F07 | 6F64 | 635F | 736F | 320D |
| 0000771240 | 0001 | 0691 | 5F08 | 6F64 | 725F | 6E61 | 8464 | 0132 |
| 0000771260 | 9300 | 0906 | 645F | 5F6F | 7273 | 6E61 | 4864 | 0135 |
| 0000771300 | 9900 | 0806 | 645F | 5F6F | 7974 | 6570 | 38F4 | 0001 |
| 0000771320 | 069D | 5F09 | 6F64 | 6D5F | 7974 | 6570 | 3CA0 | 0001 |
| 0000771340 | 06A2 | 5F16 | 6F64 | 6D5F | 766F | 5F65 | 6F6C | 6163 |
| 0000771360 | 6F74 | 5F72 | 7274 | 6361 | 586B | 013F | A800 | 1406 |
| 0000771400 | 645F | 5F6F | 6F6D | 6576 | 6C5F | 636F | 7461 | 726F |
| 0000771420 | 615F | 7362 | 42CA | 0001 | 06AE | 5F14 | 6F64 | 6D5F |
| 0000771440 | 766F | 5F65 | 6F6C | 6163 | 6F74 | 5F72 | 6572 | 3C6C |

THU MAR 14 17:52:34 1991 TSLINT.DLL PAGE 273, LINE 16049

| | | | | | | | | |
|---|---|---|---|---|---|---|---|---|
| 0000771460 | 0146 | B000 | 1206 | 645F | 5F6F | 6F6D | 6576 | 6D5F |
| 0000771500 | 756F | 6573 | 615F | 7362 | 49AE | 0001 | 06B5 | 5F12 |
| 0000771520 | 6F64 | 6D5F | 766F | 5F65 | 6F6D | 7375 | 5F65 | 6572 |
| 0000771540 | 206C | 014D | B700 | 0906 | 645F | 5F6F | 6567 | 5F74 |
| 0000771560 | 6078 | 014D | B900 | 0906 | 645F | 5F6F | 6567 | 5F74 |
| 0000771600 | 4F79 | 014E | BF00 | 1006 | 645F | 5F6F | 6863 | 6365 |
| 0000771620 | 5F6B | 6373 | 6572 | 6E65 | 0000 | 0001 | 064C | 5F0A |
| 0000771640 | 6E69 | 7469 | 765F | 7261 | 9373 | 0102 | 5400 | 0706 |
| 0000771660 | 675F | 7465 | 665F | 8773 | 0151 | C300 | 0D06 | 645F |
| 0000771700 | 5F6F | 6863 | 6365 | 5F6B | 6973 | F067 | 0102 | 5600 |
| 0000771720 | 0706 | 735F | 7465 | 665F | BF73 | 0154 | C600 | 0E06 |
| 0000771740 | 645F | 5F6F | 6573 | 5F74 | 6966 | 746C | 7265 | 0856 |
| 0000771760 | 0008 | 04A0 | 5F0A | 7473 | 6361 | 5F6B | 7470 | 7A72 |
| 0000772000 | 016B | 5E00 | 0A05 | 665F | 6E75 | 5F63 | 6163 | 6C6C |
| 0000772020 | 7469 | 0001 | 056A | 5F09 | 6F64 | 6D5F | 7461 | 6863 |
| 0000772040 | 77FF | 0001 | 056E | 5F07 | 6F64 | 735F | 6275 | 0F0B |
| 0000772060 | 0009 | 0081 | 5F0A | 6564 | 7562 | 6767 | 6E69 | 0C67 |
| 0000772100 | 090F | 2F00 | 0705 | 6E5F | 616E | 656D | 0073 | 0182 |
| 0000772120 | 3100 | 0605 | 705F | 7274 | 6565 | 831D | 0001 | 0534 |
| 0000772140 | 5F03 | 7470 | 8338 | 0001 | 0536 | 5F11 | 7270 | 6E69 |
| 0000772160 | 5F74 | 6170 | 7372 | 5F65 | 7274 | 6565 | 8F7A | 0001 |
| 0000772200 | 053C | 5F0A | 7564 | 706D | 765F | 7261 | 8C73 | 0192 |
| 0000772220 | 4500 | 0D05 | 705F | 6972 | 746E | 615F | 6E5F | 646F |
| 0000772240 | 5265 | 0192 | 4300 | 0C05 | 705F | 6972 | 746E | 645F |
| 0000772260 | 6265 | 6775 | B468 | 0001 | 0547 | 5F11 | 7270 | 6E69 |
| 0000772300 | 5F74 | 616D | 6279 | 5F65 | 6573 | 696D | B60E | 0001 |
| 0000772320 | 0549 | 5F10 | 6564 | 6C61 | 775F | 7469 | 5F68 | 7563 |
| 0000772340 | 6C72 | AE73 | 0914 | 8100 | 0700 | 695F | 646E | 6E65 |
| 0000772360 | F674 | 01B8 | 4B00 | 0A05 | 645F | 5F6F | 7270 | 6176 |
| 0000772400 | 7372 | B926 | 0001 | 054C | 5F06 | 6F64 | 625F | C270 |
| 0000772420 | 080A | 8100 | 0A00 | 665F | 6569 | 646C | 6E5F | 6D75 |
| 0000772440 | 0C76 | 0008 | 04F0 | 5F0B | 6966 | 6C65 | 7364 | 615F |
| 0000772460 | 7272 | 001A | 0008 | 04E3 | 5F06 | 6F6E | 6564 | A030 |
| 0000772500 | 080A | E700 | 0604 | 645F | 7265 | 6665 | 1568 | 0009 |
| 0000772520 | 0081 | 5F0C | 6F6E | 6564 | 5F30 | 6176 | 696C | 0064 |
| 0000772540 | 0200 | 8500 | 0C05 | 695F | 696E | 5F74 | 6966 | 6C65 |
| 0000772560 | 7364 | 11C1 | 0002 | 059A | 5F0B | 6573 | 5F74 | 6572 |
| 0000772600 | 6F63 | 6472 | 12CF | 0002 | 059C | 5F0A | 6567 | 5F74 |
| 0000772620 | 6966 | 6C65 | AC64 | 0214 | 9E00 | 0D05 | 705F | 7261 |
| 0000772640 | 6573 | 665F | 6569 | 646C | 5373 | 021F | A400 | 0B05 |
| 0000772660 | 645F | 5F6F | 6567 | 6C74 | 6E69 | DB65 | 0225 | A600 |
| 0000772700 | 0805 | 675F | 7465 | 6C5F | 7368 | 29E7 | 0002 | 05AB |
| 0000772720 | 5F09 | 6F64 | 645F | 7265 | 6665 | 354D | 0002 | 05B4 |
| 0000772740 | 5F09 | 6F64 | 695F | 706E | 7475 | 3984 | 0002 | 05BB |
| 0000772760 | 5F09 | 6572 | 6964 | 6572 | 7463 | 437C | 0002 | 05C5 |
| 0000773000 | 5F09 | 6F64 | 635F | 6F6C | 6573 | 4510 | 0002 | 05C6 |
| 0000773020 | 5F15 | 6C63 | 736F | 5F65 | 6C61 | 5F6C | 706F | 6E65 |
| 0000773040 | 665F | 6C69 | 7365 | 49D4 | 0002 | 05CD | 5F09 | 6C66 |
| 0000773060 | 7375 | 5F68 | 6F69 | 4ADB | 0002 | 05CF | 5F09 | 6C63 |
| 0000773100 | 736F | 5F65 | 6F69 | 4B84 | 0002 | 05D1 | 5F08 | 6564 |
| 0000773120 | 6F76 | 6570 | 6E6E | 024D | 5300 | 0B05 | 635F | 6E6F |
| 0000773140 | 6163 | 5F74 | 7865 | F570 | 0254 | 5C00 | 0C05 | 615F |
| 0000773160 | 7373 | 636F | 635F | 656C | 7261 | 56F5 | 0002 | 0562 |
| 0000773200 | 5F09 | 6E69 | 615F | 7272 | 7961 | 57F2 | 0002 | 0564 |
| 0000773220 | 5F0D | 7361 | 6F73 | 5F63 | 6F6C | 6B6F | 7075 | 5B9C |
| 0000773240 | 0002 | 0568 | 5F0A | 6F64 | 645F | 6C65 | 7465 | 1265 |
| 0000773260 | 025D | 6A00 | 0B05 | 615F | 7373 | 636F | 735F | 6163 |
| 0000773300 | C96E | 025F | 6D00 | 0B05 | 615F | 7373 | 636F | 6E5F |
| 0000773320 | 7865 | 8674 | 0262 | 3D00 | DF05 | 725F | 665F | 726F |

THU MAR 14 17:52:34 1991 TSLINT.DLL PAGE 274, LINE 16108

| | | | | | | | | |
|---|---|---|---|---|---|---|---|---|
| 0000773340 | 6563 | 6E5F | 6D75 | 6562 | 1472 | 0265 | 4600 | 0F05 |
| 0000773360 | 725F | 665F | 726F | 6563 | 735F | 7274 | 6E69 | 8367 |
| 0000773400 | 0269 | 4C00 | 0805 | 645F | 7075 | 6F6E | 6564 | 6D5E |
| 0000773420 | 0002 | 054F | 5F0C | 616D | 656B | 6E5F | 6D75 | 6562 |
| 0000773440 | B272 | 026D | 5100 | 0B05 | 745F | 706D | 6E5F | 6D75 |
| 0000773460 | 6562 | F872 | 026D | 5300 | 0C05 | 6D5F | 6B61 | 5F65 |
| 0000773500 | 7473 | 6972 | 676E | 734F | 0002 | 0558 | 5F0B | 6D74 |
| 0000773520 | 5F70 | 7473 | 6972 | 676E | 7443 | 0002 | 0540 | 5F13 |
| 0000773540 | 6572 | 635F | 6D6F | 6970 | 656C | 705F | 7461 | 6574 |
| 0000773560 | 6E72 | 8A1D | 0002 | 0553 | 5F13 | 6572 | 635F | 6D6F |
| 0000773600 | 6970 | 656C | 665F | 7361 | 6D74 | 7061 | 8F74 | 0002 |
| 0000773620 | 0558 | 5F0A | 6572 | 735F | 6165 | 6372 | 5168 | 0290 |
| 0000773640 | 5C00 | 0C05 | 725F | 5F65 | 6573 | 7261 | 6863 | 325F |
| 0000773660 | 938C | 0002 | 055F | 5F09 | 6572 | 6D5F | 7461 | 6863 |
| 0000773700 | 9466 | 0002 | 0562 | 5F0B | 6572 | 6D5F | 7461 | 6863 |
| 0000773720 | 325F | A6C3 | 0002 | 056B | 5F08 | 6572 | 635F | 6D6F |
| 0000773740 | 5170 | 02A9 | 6F00 | 0805 | 725F | 5F65 | 7865 | 6365 |
| 0000773760 | 2554 | 0009 | 0081 | 5F10 | 6572 | 6D5F | 7861 | 665F |
| 0000774000 | 6961 | 756C | 6572 | 1673 | 0274 | 3E00 | 0E05 | 725F |
| 0000774020 | 5F65 | 6573 | 5F74 | 7973 | 746E | 7861 | AC87 | 0002 |
| 0000774040 | 04D4 | 5F0A | 6F64 | 6D5F | 6C61 | 6F6C | 9063 | 02AF |
| 0000774060 | DB00 | 0B04 | 645F | 5F6F | 6572 | 6C61 | 6F6C | 7063 |
| 0000774100 | 0926 | 8400 | 0C00 | 745F | 6C73 | 6D5F | 6D65 | 7974 |
| 0000774120 | 6570 | AA42 | 0002 | 04C9 | 5F08 | 6F64 | 665F | 6572 |
| 0000774140 | A665 | 02B2 | 1400 | 0805 | 6E5F | 7765 | 6F6E | 6564 |
| 0000774160 | B4E2 | 0002 | 051D | 5F09 | 7266 | 6565 | 6F6E | 6564 |
| 0000774200 | B674 | 0002 | 04A6 | 5F08 | 7273 | 6E61 | 6F64 | 516D |
| 0000774220 | 02B7 | A800 | 0A04 | 695F | 696E | 7374 | 6174 | 6574 |
| 0000774240 | BBE4 | 0002 | 04AB | 5F09 | 6573 | 7374 | 6174 | 6574 |
| 0000774260 | BA30 | 0002 | 04AD | 5F07 | 6172 | 646E | 6D6F | BB6C |
| 0000774300 | 0002 | 0269 | 5F07 | 6C61 | 6F6C | 6163 | 0C5C | 0008 |
| 0000774320 | 0081 | 5F0C | 6177 | 746E | 725F | 6765 | 7865 | A470 |
| 0000774340 | 080A | C000 | 0700 | 6C5F | 7865 | 7470 | 8E72 | 080C |
| 0000774360 | C000 | 0D00 | 6C5F | 7865 | 7470 | 5F72 | 6562 | 6967 |
| 0000774400 | 346E | 0800 | C000 | 0D00 | 6C5F | 7365 | 745F | 6B6F |
| 0000774420 | 7473 | 7261 | 7374 | 0800 | C000 | 0C00 | 6C5F | 7865 |
| 0000774440 | 625F | 6975 | 746C | 6E69 | 2B48 | 0009 | 0081 | 5F0D |
| 0000774460 | 7374 | 5F6C | 656E | 5F77 | 6966 | 656C | BE69 | 0002 |
| 0000774500 | 05AD | 5F0A | 7374 | 5F6C | 7979 | 656C | 8678 | 02EB |
| 0000774520 | B800 | 0F05 | 6C5F | 7865 | 7265 | 705F | 7375 | 6268 |
| 0000774540 | 6361 | 046B | 02ED | BA00 | 0E05 | 745F | 6C73 | 6C5F |
| 0000774560 | 7865 | 635F | 656C | 7261 | EE29 | 0002 | 05BC | 5F10 |
| 0000774600 | 7374 | 656C | 5F78 | 6F6C | 6B6F | 6861 | 6165 | 5264 |
| 0000774620 | 0800 | 8100 | 0E00 | 705F | 7261 | 6D61 | 635F | 756F |
| 0000774640 | 746E | 7265 | 0AC4 | 0008 | 0533 | 5F0A | 6176 | 6972 |
| 0000774660 | 6261 | 656C | 0073 | 0300 | 4A00 | 0E05 | 745F | 6C73 |
| 0000774700 | 685F | 7361 | 5F68 | 6E69 | 7469 | 0147 | 0003 | 0550 |
| 0000774720 | 5F08 | 6E69 | 7473 | 6C61 | AB6C | 0304 | 5800 | 0705 |
| 0000774740 | 6C5F | 6F6F | 756B | 0570 | 0306 | 5C00 | 0D05 | 665F |
| 0000774760 | 6E75 | 5F63 | 6E69 | 7473 | 6C61 | BF6C | 030B | 6300 |
| 0000775000 | 0B05 | 705F | 706F | 705F | 7261 | 6D61 | 0E73 | 030D |
| 0000775020 | 6700 | 0B05 | 6D5F | 6B61 | 5F65 | 6170 | 6172 | CB6D |
| 0000775040 | 030E | 6900 | 0905 | 765F | 7261 | 6169 | 6C62 | 7865 |
| 0000775060 | 0310 | 6C00 | 0C05 | 6E5F | 646F | 5F65 | 6F63 | 6D6D |
| 0000775100 | 6E6F | 12B1 | 0003 | 056F | 5F05 | 6F6E | 6564 | 141B |
| 0000775120 | 0003 | 0573 | 5F06 | 6E73 | 646F | 8565 | 0315 | 7600 |
| 0000775140 | 0C05 | 6D5F | 726B | 6E61 | 6567 | 6F6E | 6564 | 16E6 |
| 0000775160 | 0003 | 0578 | 5F0E | 616D | 656B | 665F | 726F | 6C5F |
| 0000775200 | 6F6F | 1370 | 0319 | 7A00 | 0D05 | 615F | 7070 | 6E65 |

THU MAR 14 17:52:34 1991 TSLINT.DLL PAGE 275, LINE 16167

| | | | | | | | | |
|---|---|---|---|---|---|---|---|---|
| 0000775220 | 5F64 | 6972 | 6867 | 8C74 | 031A | 7C00 | 0F05 | 745F |
| 0000775240 | 6C73 | 6C5F | 6E69 | 5F65 | 6966 | 7578 | 2E70 | 031C |
| 0000775260 | 2400 | 0C05 | 6D5F | 6B61 | 5F65 | 6572 | 6567 | 7078 |
| 0000775300 | 2038 | 0003 | 052C | 5F0C | 6B6D | 725F | 5F65 | 6170 |
| 0000775320 | 7372 | A265 | 0322 | 5B00 | 0F05 | 745F | 6C73 | 695F |
| 0000775340 | 696E | 6974 | 6C61 | 7A69 | 9565 | 0327 | 6900 | 0E05 |
| 0000775360 | 745F | 6C73 | 745F | 7265 | 696D | 616E | 6574 | 085E |
| 0000775400 | 0008 | 0426 | 5F0C | 7374 | 5F6C | 6567 | 6C74 | 6E69 |
| 0000775420 | 8465 | 0800 | 8500 | 0800 | 745F | 6C73 | 745F | 6469 |
| 0000775440 | 0C72 | 0008 | 0488 | 5F11 | 7865 | 7270 | 7365 | 6973 |
| 0000775460 | 6E6F | 765F | 6C61 | 6575 | 0038 | 0008 | 0500 | 5F09 |
| 0000775500 | 6574 | 7473 | 745F | 6761 | 0A88 | 0008 | 0500 | 5F0A |
| 0000775520 | 6261 | 726F | 5F74 | 6174 | 0467 | 0800 | 0000 | 0C05 |
| 0000775540 | 725F | 7365 | 6174 | 7472 | 745F | 6761 | 0054 | 0008 |
| 0000775560 | 0500 | 5F09 | 7566 | 636E | 745F | 6761 | 0066 | 0008 |
| 0000775600 | 0500 | 5F09 | 6F6C | 706F | 745F | 6761 | 0A6A | 0008 |
| 0000775620 | 0500 | 5F09 | 7572 | 656C | 745F | 6761 | 0C6E | 0008 |
| 0000775640 | 00C0 | 5F08 | 7374 | 5F6C | 6168 | 8062 | 0800 | C000 |
| 0000775660 | 0800 | 745F | 6C73 | 685F | 716D | 373A | 0009 | 0488 |
| 0000775700 | 5F0D | 6E4E | 6C75 | 5F6C | 7473 | 6972 | 676E | 373E |
| 0000775720 | 0009 | 00C0 | 5F07 | 796D | 616E | 656D | 3742 | 0009 |
| 0000775740 | 0081 | 5F07 | 7473 | 6972 | 7463 | 3744 | 0009 | 04FF |
| 0000775760 | 5F0D | 7374 | 5F6C | 7563 | 7272 | 6966 | 656C | 3844 |
| 0000776000 | 0009 | 0081 | 5F0B | 7374 | 5F6C | 696C | 656E | 6F6E |
| 0000776020 | 3846 | 0009 | 0081 | 5F0B | 6F73 | 7275 | 6563 | 696C |
| 0000776040 | 656E | 3848 | 0009 | 00C0 | 5F07 | 6F73 | 7275 | 6563 |
| 0000776060 | 384C | 0009 | 0085 | 5F0F | 7374 | 5F6C | 6261 | 726F |
| 0000776100 | 5F74 | 6C66 | 6761 | 384E | 0009 | 0085 | 5F11 | 7374 |
| 0000776120 | 5F6C | 7573 | 7073 | 6E65 | 5F64 | 6C66 | 6761 | 3850 |
| 0000776140 | 0009 | 0085 | 5F11 | 7374 | 5F6C | 6572 | 7473 | 7261 |
| 0000776160 | 5F74 | 6C66 | 6761 | 3852 | 0009 | 0085 | 5F12 | 7374 |
| 0000776200 | 5F6C | 6E69 | 7570 | 5F74 | 6261 | 726F | 6574 | 5464 |
| 0000776220 | 0938 | 8500 | 1700 | 745F | 6C73 | 735F | 7274 | 6E69 |
| 0000776240 | 5F67 | 7274 | 6E61 | 6C73 | 7461 | 6F69 | 566E | 0938 |
| 0000776260 | 8100 | 0F00 | 745F | 6C73 | 735F | 6174 | 646E | 6C61 |
| 0000776300 | 6E6F | 5865 | 0938 | 8100 | 0F00 | 745F | 7365 | 5F7⁄ |
| 0000776320 | 6174 | 5F67 | 6176 | 696C | 5A64 | 0938 | 8100 | 1000 |
| 0000776340 | 615F | 6F62 | 7472 | 745F | 6761 | 765F | 6C61 | 6469 |
| 0000776360 | 385C | 0009 | 0081 | 5F0F | 7566 | 636E | 745F | 6761 |
| 0000776400 | 765F | 6C61 | 6469 | 385E | 0009 | 0081 | 5F0F | 6F6C |
| 0000776420 | 706F | 745F | 6761 | 765F | 6C61 | 6469 | 2BD6 | 0003 |
| 0000776440 | 0566 | 7412 | 6C73 | 735F | 7465 | 695F | 706E | 7475 |
| 0000776460 | 665F | 6E75 | CC63 | 0328 | 5F00 | 0905 | 7374 | 5F6C |
| 0000776500 | 7473 | 7261 | B074 | 080A | 8200 | 0306 | 5F5F | 8474 |
| 0000776520 | 080A | 8200 | 0806 | 5F5F | 6572 | 7573 | 746C | 0C7A |
| 0000776540 | 0008 | 0089 | 5F0A | 6D5F | 6373 | 3135 | 7562 | C067 |
| 0000776560 | 080A | 8100 | 0A00 | 735F | 6F74 | 5F70 | 6C66 | 6761 |
| 0000776600 | 0C5E | 0008 | 0682 | 5F09 | 6572 | 5F74 | 6F6E | 6564 |
| 0000776620 | 3D12 | 0009 | 05B2 | 5F0A | 6163 | 6573 | 6174 | 6C62 |
| 0000776640 | 0E65 | 093L | 8100 | 0800 | 655F | 6978 | 6974 | 676E |
| 0000776660 | 3D10 | 0009 | 0081 | 5F09 | 7865 | 7469 | 765F | 6C61 |
| 0000776700 | 2D02 | 0003 | 070E | 5F0A | 6E69 | 6574 | 7072 | 6572 |
| 0000776720 | 9F74 | 0349 | 2700 | 0C07 | 725F | 745F | 6572 | 5F65 |
| 0000776740 | 7665 | 6C61 | 7BC2 | 0003 | 072C | 5F0E | 7361 | 6973 |
| 0000776760 | 6E67 | 6E5F | 6D75 | 6562 | 2672 | 0383 | 3200 | 0C07 |
| 0000777000 | 695F | 5F73 | 5F61 | 756E | 626D | 7265 | 8450 | 0003 |
| 0000777020 | 0734 | 5F0A | 6D63 | 5F70 | 6F6E | 6564 | FD73 | 038F |
| 0000777040 | 3800 | 0C07 | 745F | 6C73 | 635F | 6D6F | 6970 | 656C |
| 0000777060 | 922C | 0003 | 073B | 5F10 | 7374 | 5F6C | 6E69 | 6574 |

THU MAR 14 17:52:34 1991 TSLINT.DLL PAGE 276, LINE 16226

| | | | | | | | | |
|---|---|---|---|---|---|---|---|---|
| 0000777100 | 7072 | 6572 | 6574 | 0D72 | 0394 | 3E00 | 0E07 | 745F |
| 0000777120 | 6C73 | 6D5F | 6961 | 5F6E | 6F6C | 706F | 0A9E | 0008 |
| 0000777140 | 0081 | 5F0A | 7563 | 5F72 | 6F67 | 6D63 | E464 | 0943 |
| 0000777160 | 8100 | 0D00 | 735F | 7375 | 6570 | 646E | 665F | 616C |
| 0000777200 | DC67 | 039C | 9B00 | 1006 | 745F | 6C73 | 635F | 6568 |
| 0000777220 | 6B63 | 735F | 6174 | 6574 | A300 | 0003 | 06A4 | 5F10 |
| 0000777240 | 7374 | 5F6C | 6863 | 6365 | 5F6B | 6564 | 7562 | E667 |
| 0000777260 | 03A8 | AD00 | 0C06 | 745F | 6C73 | 6C5F | 6E6F | 6A67 |
| 0000777300 | 706D | AA07 | 0003 | 06AF | 5F11 | 7374 | 5F6C | 6F6E |
| 0000777320 | 6D72 | 6C61 | 735F | 6174 | 6574 | AA43 | 0003 | 06B0 |
| 0000777340 | 5F0E | 7374 | 5F6C | 7572 | 5F6E | 7473 | 7461 | 7F65 |
| 0000777360 | 03AA | B100 | 0D06 | 745F | 6C73 | 6A5F | 6D75 | 6270 |
| 0000777400 | 6361 | B56B | 03AA | B200 | 1806 | 745F | 6C73 | 725F |
| 0000777420 | 7365 | 6174 | 7472 | 695F | 746E | 7265 | 7270 | 7465 |
| 0000777440 | 7265 | ABDB | 0003 | 06B5 | 5F13 | 7374 | 5F6C | 6168 |
| 0000777460 | 646E | 656C | 645F | 7369 | 6C70 | 7961 | 97CA | 0003 |
| 0000777500 | 068E | 5409 | 4C53 | 475F | 434F | 444D | 9973 | 0003 |
| 0000777520 | 0695 | 5409 | 4C53 | 415F | 4F42 | 5452 | 9A96 | 0003 |
| 0000777540 | 0697 | 540B | 4C53 | 525F | 5345 | 4154 | 5452 | 9BBE |
| 0000777560 | 0003 | 0698 | 5410 | 4C53 | 535F | 5355 | 4550 | 444E |
| 0000777600 | 455F | 4558 | 4043 | 03AD | AE00 | 0A05 | 745F | 6C73 |
| 0000777620 | 655F | 7272 | 726F | AFE0 | 0003 | 05B6 | 5F0F | 7374 |
| 0000777640 | 5F6C | 7265 | 6F72 | 5F72 | 6F63 | 6564 | B103 | 0003 |
| 0000777660 | 05BA | 5F08 | 7374 | 5F6C | 736D | 4A67 | 03B2 | BE00 |
| 0000777700 | 0805 | 775F | 7261 | 696E | 676E | B3B6 | 0003 | 05C1 |
| 0000777720 | 5F06 | 6166 | 6174 | 226C | 03B5 | C400 | 0C05 | 745F |
| 0000777740 | 6C73 | 795F | 6579 | 7272 | 726F | BD44 | 0003 | 0494 |
| 0000777760 | 5F11 | 7374 | 5F6C | 6572 | 7473 | 726F | 5F65 | 6574 |
| 0001000000 | 7473 | B64E | 0003 | 0483 | 5F0D | 7374 | 5F6C | 6567 |
| 0001000020 | 5F74 | 6574 | 7473 | BCE5 | 0003 | 0490 | 5F12 | 7374 |
| 0001000040 | 5F6C | 6567 | 5F74 | 6170 | 6172 | 5F6D | 6E63 | 1D74 |
| 0001000060 | 03BD | 9200 | 1304 | 745F | 6C73 | 675F | 7465 | 705F |
| 0001000100 | 7261 | 6D61 | 6E5F | 6D61 | 6865 | 03C0 | C800 | 0A05 |
| 0001000120 | 745F | 7365 | 5F74 | 6163 | 6C6C | D00B | 0003 | 05DD |
| 0001000140 | 5F19 | 7374 | 5F6C | 616D | 656B | 745F | 7365 | 5F74 |
| 0001000160 | 6170 | 6172 | 5F6D | 696C | 7473 | D4DA | 0003 | 05E4 |
| 0001000200 | 5F15 | 7374 | 5F6C | 7270 | 6E69 | 5F74 | 6170 | 6172 |
| 0001000220 | 5F6D | 696C | 7473 | E077 | 0003 | 0567 | 5412 | 4C53 |
| 0001000240 | 475F | 5445 | 435F | 4C41 | 5F4C | 4843 | 4941 | F64E |
| 0001000260 | 03D4 | 4D00 | 0F05 | 745F | 6C73 | 635F | 6C61 | 5F6C |
| 0001000300 | 7473 | 7261 | 3F74 | 03D6 | 5300 | 1305 | 745F | 6C73 |
| 0001000320 | 635F | 6C61 | 5F6C | 6461 | 5F64 | 6170 | 6172 | CA6D |
| 0001000340 | 03D7 | 5900 | 0D05 | 745F | 6C73 | 635F | 6C61 | 5F6C |
| 0001000360 | 6E65 | 1D64 | 03DA | 5E00 | 0E05 | 745F | 6C73 | 635F |
| 0001000400 | 6C61 | 5F6C | 7570 | 6873 | DDCD | 0003 | 0564 | 5F0D |
| 0001000420 | 7374 | 5F6C | 6163 | 6C6C | 705F | 706F | E293 | 0003 |
| 0001000440 | 0568 | 5F11 | 7374 | 5F6C | 6163 | 6C6C | 725F | 7365 |
| 0001000460 | 6174 | 7472 | E352 | 0003 | 056A | 5F0F | 7374 | 5F6C |
| 0001000500 | 6163 | 6C6C | 645F | 7065 | 6874 | E9F9 | 0003 | 03CB |
| 0001000520 | 5F0B | 6C68 | 725F | 6165 | 6C6C | 636F | EFEE | 0003 |
| 0001000540 | 03D1 | 5F08 | 6C68 | 665F | 6572 | 1B65 | 03F5 | D900 |
| 0001000560 | 1303 | 685F | 5F6C | 6F63 | 6C6C | 6365 | 5F74 | 6167 |
| 0001000600 | 6272 | 6761 | E465 | 03F7 | DC00 | 0B03 | 685F | 5F6C |
| 0001000620 | 656D | 736D | 7A69 | 1E65 | 03F9 | DF00 | 0803 | 685F |
| 0001000640 | 5F6C | 6973 | 657A | FAE9 | 0003 | 03E0 | 5F0D | 6C68 |
| 0001000660 | 635F | 6C61 | 5F63 | 6973 | 657A | E4B2 | 0003 | 03C2 |
| 0001000700 | 5F09 | 6C68 | 615F | 6C6C | 636F | 0016 | 0008 | 055A |
| 0001000720 | 5F08 | 7673 | 6E64 | 6D61 | 9273 | 080C | C100 | 0500 |
| 0001000740 | 795F | 7879 | 9669 | 080C | 6200 | 0805 | 745F | 6C73 |

THU MAR 14 17:52:34 1991 TSLINT.DLL PAGE 277, LINE 16285

| | | | | | | | | |
|---|---|---|---|---|---|---|---|---|
| 0001000760 | 795F | 7679 | 0086 | 0008 | 0563 | 5F07 | 6572 | 7364 |
| 0001001000 | 7165 | 0C86 | 0008 | 0556 | 5F07 | 7979 | 766C | 6C61 |
| 0001001020 | 0AA8 | 0008 | 0556 | 5F06 | 7979 | 6176 | 4E6C | 0800 |
| 0001001040 | 2000 | 0904 | 795F | 7479 | 6966 | 656C | 4A70 | 0800 |
| 0001001060 | C000 | 0900 | 795F | 7479 | 6966 | 656C | BC6E | 080A |
| 0001001100 | 5900 | 0705 | 735F | 6476 | 7270 | E864 | 0954 | 5D00 |
| 0001001120 | 0B05 | 745F | 6C73 | 795F | 6579 | 6378 | 6261 | 0955 |
| 0001001140 | 5E00 | 0A05 | 745F | 6C73 | 795F | 6179 | 7463 | 6492 |
| 0001001160 | 0009 | 055F | 5F0B | 7374 | 5F6C | 7979 | 6170 | 7463 |
| 0001001200 | 66E8 | 0009 | 0560 | 5F0A | 7374 | 5F6C | 7979 | 6770 |
| 0001001220 | 446F | 0967 | 6100 | 0905 | 745F | 6C73 | 795F | 7279 |
| 0001001240 | 8031 | 0968 | 6100 | 0905 | 745F | 6C73 | 795F | 7279 |
| 0001001260 | BC32 | 0969 | 5F00 | 0A05 | 745F | 6C73 | 795F | 6379 |
| 0001001300 | 6B68 | 6C12 | 0009 | 055F | 5F0A | 7374 | 5F6C | 7979 |
| 0001001320 | 6564 | 6866 | 096E | 8100 | 0E00 | 705F | 7463 | 6C73 |
| 0001001340 | 795F | 6579 | 7272 | 7463 | 6E6A | 0009 | 0081 | 5F0E |
| 0001001360 | 6370 | 7374 | 5F6C | 7979 | 7265 | 6672 | 6C6C | 096E |
| 0001001400 | 8100 | 0D00 | 745F | 6C73 | 795F | 7279 | 6465 | 6E63 |
| 0001001420 | 6E74 | 096E | 8100 | 0E00 | 705F | 7463 | 6C73 | 795F |
| 0001001440 | 7479 | 6B6F | 6E65 | 0000 | 0004 | 0564 | 5F0C | 7374 |
| 0001001460 | 5F6C | 7979 | 6170 | 7372 | E665 | 0954 | 8100 | 0C00 |
| 0001001500 | 745F | 6C73 | 795F | 7479 | 6C66 | 6761 | 7E20 | 0009 |
| 0001001520 | 0000 | 5F06 | 6465 | 7461 | 8061 | 09D1 | 0000 | 0400 |
| 0001001540 | 655F | 646E | 2BDA | 0004 | 0000 | 4306 | 495F | 494E |
| 0001001560 | 8A54 | 096E | 0000 | 0C00 | 5F5F | 686E | 6165 | 5F70 |
| 0001001600 | 6564 | 6373 | D180 | 0009 | 0000 | 5F0C | 7473 | 6361 |
| 0001001620 | 626B | 746F | 6F74 | B06D | 096E | 0000 | 0C00 | 5F5F |
| 0001001640 | 615F | 4244 | 7773 | 6670 | 676C | 6E7C | 0009 | 0000 |
| 0001001660 | 5F08 | 615F | 6D63 | 6C64 | AE6E | 096E | 0000 | 0800 |
| 0001001700 | 5F5F | 7361 | 6765 | 6968 | 6EAC | 0009 | 0000 | 5F08 |
| 0001001720 | 615F | 6573 | 6C67 | B86F | 096E | 0000 | 0800 | 5F5F |
| 0001001740 | 7361 | 7A69 | 7364 | 6E86 | 0009 | 0000 | 5F08 | 615F |
| 0001001760 | 6F74 | 7370 | 9E70 | 096E | 0000 | 0900 | 5F5F | 6361 |
| 0001002000 | 6966 | 666E | D66F | 00D6 | 0100 | 0900 | 5F5F | 4461 |
| 0001002020 | 7542 | 6573 | 7E64 | 096E | 0000 | 0900 | 5F5F | 6561 |
| 0001002040 | 766E | 6573 | 8267 | 096E | 0000 | 0A00 | 5F5F | 6874 |
| 0001002060 | 6572 | 6461 | 6469 | 6E80 | 0009 | 0000 | 5F0A | 675F |
| 0001002100 | 6E69 | 6F66 | 6573 | D667 | 00D6 | 0100 | 0A00 | 5F5F |
| 0001002120 | 4461 | 6442 | 736F | 7077 | 6E84 | 0009 | 0000 | 5F0A |
| 0001002140 | 6C5F | 6E69 | 6F66 | 6573 | 7667 | 0098 | 0100 | 0A00 |
| 0001002160 | 5F5F | 6361 | 7472 | 7375 | 6465 | 6EB2 | 0009 | 0000 |
| 0001002200 | 5F0B | 5F5F | 4461 | 7242 | 6574 | 7272 | 2C4B | 0004 |
| 0001002220 | 0000 | 5F0B | 615F | 736D | 5F67 | 7865 | 7469 | 6EC0 |
| 0001002240 | 0009 | 0000 | 5F0B | 6F5F | 7673 | 7265 | 6973 | 6E6F |
| 0001002260 | 2D65 | 0004 | 0000 | 5F06 | 655F | 6978 | 1774 | 042E |
| 0001002300 | 0000 | 0C00 | 5F5F | 6E75 | 6F6C | 6B63 | 7865 | 7469 |
| 0001002320 | 70D3 | 0009 | 0000 | 5F07 | 635F | 6968 | 646C | 6EC3 |
| 0001002340 | 0009 | 0000 | 5F07 | 6E5F | 6966 | 656C | 2CAC | 0004 |
| 0001002360 | 0000 | 5F07 | 635F | 6E69 | 7469 | 70C5 | 0009 | 0000 |
| 0001002400 | 5F07 | 5F5F | 7261 | 6367 | 2D6D | 0004 | 0000 | 5F07 |
| 0001002420 | 635F | 7865 | 7469 | 6EC0 | 0009 | 0000 | 5F0D | 645F |
| 0001002440 | 736F | 6576 | 6D72 | 6A61 | 726F | 70C7 | 0009 | 0000 |
| 0001002460 | 5F07 | 5F5F | 7261 | 7667 | 6EC1 | 0009 | 0000 | 5F0D |
| 0001002500 | 645F | 736F | 6576 | 6D72 | 6E69 | 726F | 6FC5 | 0009 |
| 0001002520 | 0000 | 5F08 | 705F | 7069 | 6365 | CB68 | 0970 | 0000 |
| 0001002540 | 0800 | 655F | 766E | 7269 | 6E6F | 6EC5 | 0009 | 0000 |
| 0001002560 | 5F08 | 6F5F | 6673 | 6C69 | C265 | 096E | 0000 | 0800 |
| 0001002600 | 5F5F | 736F | 6F6D | 6564 | 2D06 | 0004 | 0000 | 5F08 |
| 0001002620 | 695F | 696E | 6674 | B470 | 0979 | 0000 | 0800 | 5F5F |

THU MAR 14 17:52:34 1991 TSLINT.DLL PAGE 278, LINE 16344

| | | | | | | | | |
|---|---|---|---|---|---|---|---|---|
| 0001002640 | 7066 | 6E69 | 7469 | 2E3A | 0004 | 0000 | 5F08 | 745F |
| 0001002660 | 7265 | 666D | CF70 | 0970 | 0000 | 0800 | 5F5F | 6770 |
| 0001002700 | 706D | 7274 | 2D77 | 0004 | 0000 | 5F08 | 635F | 655F |
| 0001002720 | 6978 | C274 | 096E | 0000 | 0900 | 5F5F | 6F64 | 6D73 |
| 0001002740 | 646F | C065 | 096E | 0000 | 0900 | 5F5F | 736F | 616D |
| 0001002760 | 6F6A | C172 | 096E | 0000 | 0900 | 5F5F | 736F | 696D |
| 0001003000 | 6F6E | D572 | 0970 | 0000 | 0A00 | 5F5F | 7865 | 7469 |
| 0001003020 | 6F64 | 656E | 2DCD | 0004 | 0000 | 5F0A | 6C5F | 636F |
| 0001003040 | 656B | 6978 | BE74 | 096E | 0000 | 0A00 | 5F5F | 6D75 |
| 0001003060 | 7361 | 766B | 6C61 | 2E3A | 0004 | 0000 | 5F0A | 635F |
| 0001003100 | 6574 | 6D72 | 7573 | D762 | 0970 | 0000 | 0A00 | 5F5F |
| 0001003120 | 7865 | 7469 | 745F | 6469 | 6EB4 | 0009 | 0000 | 5F05 |
| 0001003140 | 665F | 6361 | 2D5E | 0004 | 0000 | 5F05 | 7865 | 7469 |
| 0001003160 | 2E5C | 0004 | 0000 | 5F0E | 465F | 5F46 | 534D | 4247 |
| 0001003200 | 4E41 | 454E | DA52 | 0970 | 000D | 0900 | 5F5F | 6461 |
| 0001003220 | 6762 | 736D | 7667 | 0098 | 0100 | 0900 | 5F5F | 6361 |
| 0001003240 | 7472 | 736D | 7E67 | 042E | 0000 | 0800 | 5F5F | 7066 |
| 0001003260 | 7274 | 7061 | 70DE | 0009 | 0000 | 5FUC | 615F | 6C61 |
| 0001003300 | 7374 | 6B74 | 766F | 8472 | 042E | 0000 | 0800 | 5F5F |
| 0001003320 | 6863 | 736B | 6B74 | 2E84 | 0004 | 0000 | 5F0A | 615F |
| 0001003340 | 6346 | 6B68 | 7473 | 9E6B | 042E | 0000 | 0900 | 5F5F |
| 0001003360 | 6573 | 6574 | 766E | A670 | 042F | 0000 | 0B00 | 5F5F |
| 0001003400 | 4D4E | 4753 | 545F | 5845 | D654 | 042F | 0000 | 0C00 |
| 0001003420 | 5F5F | 4D4E | 4753 | 575F | 4952 | 4554 | 30B8 | 0004 |
| 0001003440 | 0000 | 5F0B | 5F5F | 6F64 | 6573 | 7272 | 6F6E | 30C0 |
| 0001003460 | 0004 | 0000 | 5F07 | 655F | 7272 | 6F6E | 3071 | 0004 |
| 0001003500 | 0000 | 5F08 | 645F | 736F | 6572 | 5874 | 0430 | 0000 |
| 0001003520 | 0900 | 5F5F | 6F64 | 7273 | 7465 | 1866 | 0431 | 0000 |
| 0001003540 | 0B00 | 5F5F | 6366 | 6F6C | 6573 | 6C5F | CC6B | 0430 |
| 0001003560 | 0000 | 0700 | 665F | 6C63 | 736F | CE65 | 0431 | 0000 |
| 0001003600 | 0800 | 5F5F | 7366 | 706F | 6E65 | 3220 | 0004 | 0000 |
| 0001003620 | 5F06 | 6F66 | 6570 | 386E | 0432 | 0000 | 0800 | 665F |
| 0001003640 | 7270 | 6E69 | 6674 | 3292 | 0004 | 0000 | 5F07 | 7766 |
| 0001003660 | 6972 | 6574 | 32CC | 0004 | 0000 | 5F0B | 665F | 7277 |
| 0001003700 | 7469 | 5F65 | 6B6C | 3464 | 0004 | 0000 | 5F07 | 7270 |
| 0001003720 | 6E69 | 6674 | 70E6 | 0009 | 0000 | 5F08 | 635F | 6C66 |
| 0001003740 | 7375 | 6268 | 0808 | 0000 | 0700 | 5F5F | 7562 | 6966 |
| 0001003760 | E86E | 0970 | 000D | 0500 | 5F5F | 6F69 | C862 | 0972 |
| 0001004000 | 0000 | 0600 | 5F5F | 6F69 | 3262 | 74A8 | 0009 | 0000 |
| 0001004020 | 5F09 | 6C5F | 7361 | 6974 | 626F | 34B2 | 0004 | 0000 |
| 0001004040 | 5F08 | 665F | 6C69 | 7562 | 4E66 | 0435 | 0000 | 0800 |
| 0001004060 | 5F5F | 6C66 | 6273 | 6675 | 3634 | 0004 | 0000 | 5F09 |
| 0001004100 | 665F | 6572 | 6265 | 6675 | 366C | 0004 | 0000 | 5F08 |
| 0001004120 | 675F | 7465 | 7562 | B866 | 0436 | 0000 | 0A00 | 5F5F |
| 0001004140 | 706F | 6E65 | 6966 | 656C | 3822 | 0004 | 0000 | 5F07 |
| 0001004160 | 665F | 6274 | 6675 | 37AA | 0004 | 0000 | 5F07 | 735F |
| 0001004200 | 6274 | 6675 | 38B0 | 0004 | 0000 | 5F0B | 665F | 6C66 |
| 0001004220 | 7375 | 5F68 | 6B6C | 386A | 0004 | 0000 | 5F07 | 6666 |
| 0001004240 | 756C | 6873 | 391C | 0004 | 0000 | 5F09 | 6C66 | 7375 |
| 0001004260 | 6168 | 6C6C | 3998 | 0004 | 0000 | 5F07 | 695F | 706E |
| 0001004300 | 7475 | 41D2 | 0004 | 0000 | 5F08 | 6F5F | 7475 | 7570 |
| 0001004320 | BC74 | 0446 | 0000 | 0B00 | 5F5F | 6567 | 7374 | 7274 |
| 0001004340 | 6165 | 346D | 0447 | 0000 | 0700 | 755F | 676E | 7465 |
| 0001004360 | 7463 | 0447 | 000D | 0B0D | 5F5F | 6E75 | 6567 | 6374 |
| 0001004400 | 6C5F | DE6B | 0447 | 000D | 0600 | 635F | 6F6C | 6573 |
| 0001004420 | 4828 | 0004 | 0000 | 5F06 | 736C | 6565 | 1E6B | 0448 |
| 0001004440 | 0000 | 0A00 | 5F5F | 736C | 6565 | 5F6B | 6B6C | 4896 |
| 0001004460 | 0004 | 0000 | 5F06 | 6F73 | 6570 | A76E | 0448 | 0000 |
| 0001004500 | 0500 | 6F5F | 6570 | 626E | 044A | 0000 | 1100 | 5F5F |

THU MAR 14 17:52:34 1991 TSLINT.DLL PAGE 279, LINE 16403

| | | | | | | | | |
|---|---|---|---|---|---|---|---|---|
| 0001004520 | 5863 | 4E45 | 5849 | 6F74 | 4F44 | 6D53 | 646F | 7465 |
| 0001004540 | 044A | 000C | 0500 | 725F | 6165 | DC64 | 044B | 0000 |
| 0001004560 | 0600 | 775F | 6972 | 6574 | 4BD2 | 0004 | 0000 | 5F0A |
| 0001004600 | 775F | 6972 | 6574 | 6C5F | 1E6B | 0975 | 0000 | 0700 |
| 0001004620 | 5F5F | 6D66 | 646F | 1E65 | 0975 | 0000 | 0800 | 5F5F |
| 0001004640 | 6F69 | 6F6D | 6564 | 4DB0 | 0004 | 0000 | 5F07 | 616D |
| 0001004660 | 6C6C | 636F | 4DB5 | 0004 | 0000 | 5F0A | 616D | 6C6C |
| 0001004700 | 636F | 6C5F | BF6B | 044D | 0000 | 0800 | 665F | 6572 |
| 0001004720 | 5F65 | 6B6C | 4DBA | 0004 | 0000 | 5F05 | 7266 | 6565 |
| 0001004740 | 4DF6 | 0004 | 0000 | 5F0C | 665F | 616D | 6C6C | 636F |
| 0001004760 | 6C5F | C46B | 044D | 0000 | 0700 | 5F5F | 6666 | 6572 |
| 0001005000 | D765 | 044D | 0000 | 0900 | 5F5F | 6D66 | 6C61 | 6F6C |
| 0001005020 | C463 | 044D | 0000 | 0A00 | 5F5F | 6666 | 6572 | 5F65 |
| 0001005040 | 6B6C | 7520 | 0009 | 0000 | 5F07 | 665F | 6568 | 7061 |
| 0001005060 | 4E74 | 0004 | 0000 | 5F09 | 695F | 696E | 7374 | 6765 |
| 0001005100 | 4EA8 | 0004 | 0000 | 5F09 | 6C5F | 6E69 | 736B | 6765 |
| 0001005120 | 4EDE | 0004 | 0000 | 5F0B | 735F | 6165 | 6372 | 7368 |
| 0001005140 | 6765 | 4FE9 | 0004 | 0000 | 5F08 | 695F | 636E | 6573 |
| 0001005160 | 5A67 | 044F | 0000 | 0900 | 5F5F | 7267 | 776F | 6573 |
| 0001005200 | 1C67 | 0450 | 0000 | 0A00 | 5F5F | 6966 | 646E | 616C |
| 0001005220 | 7473 | 752E | 0009 | 0000 | 5F0A | 615F | 626D | 6B6C |
| 0001005240 | 6973 | 3C7A | 0450 | 0000 | 0800 | 5F5F | 656E | 7377 |
| 0001005260 | 6765 | 506E | 0004 | 0000 | 5F07 | 7473 | 6372 | 7461 |
| 0001005300 | 50B4 | 0004 | 0000 | 5F07 | 7473 | 6372 | 7970 | 50EA |
| 0001005320 | 0004 | 0000 | 5F07 | 7473 | 6372 | 706D | 5114 | 0004 |
| 0001005340 | 0000 | 5F07 | 7473 | 6C72 | 6E65 | 512C | 0004 | 0000 |
| 0001005360 | 5F08 | 7473 | 6E72 | 7063 | 5679 | 0451 | 0000 | 0800 |
| 0001005400 | 735F | 7274 | 636E | 706D | 5192 | 0004 | 0000 | 5F05 |
| 0001005420 | 7461 | 6C6F | 5196 | 0004 | 0000 | 4104 | 4F54 | F646 |
| 0001005440 | 0451 | 0000 | 0700 | 5F5F | 6163 | 6F74 | 4C78 | 0452 |
| 0001005460 | 0000 | 0500 | 695F | 6F74 | 6861 | 0452 | 0000 | 0900 |
| 0001005500 | 5F5F | 7066 | 6F74 | 7473 | 3072 | 0975 | 0000 | 0D00 |
| 0001005520 | 5F5F | 6663 | 746C | 7663 | 5F74 | 6174 | 4C62 | 0975 |
| 0001005540 | 0000 | 0800 | 5F5F | 7361 | 7A69 | 4365 | 754D | 0009 |
| 0001005560 | 0000 | 5F08 | 615F | 6973 | 657A | 4A44 | 0975 | 0000 |
| 0001005600 | 0B00 | 5F5F | 6973 | 6967 | 746E | 666F | 4866 | 0975 |
| 0001005620 | 0000 | 0B00 | 5F5F | 6973 | 6967 | 746E | 6573 | 4E67 |
| 0001005640 | 0975 | 0000 | 0700 | 5F5F | 7463 | 7079 | 4E65 | 0975 |
| 0001005660 | 0000 | 0800 | 5F5F | 7463 | 7079 | 5F65 | 530A | 0004 |
| 0001005700 | 0000 | 5F07 | 6567 | 6574 | 766E | 53B0 | 0004 | 0000 |
| 0001005720 | 5F07 | 7369 | 7461 | 7974 | 53C8 | 0004 | 0000 | 5F0A |
| 0001005740 | 615F | 6146 | 6468 | 6669 | 3866 | 0454 | 0000 | 0600 |
| 0001005760 | 5F5F | 6F6C | 6B63 | 5482 | 0004 | 0000 | 5F07 | 6C5F |
| 0001006000 | 636F | 666B | 540C | 0004 | 0000 | 5F0D | 755F | 6C6E |
| 0001006020 | 636F | 5F6B | 6966 | 656C | 53E8 | 0004 | 0000 | 5F0D |
| 0001006040 | 6C5F | 636F | 5F6B | 7473 | 6572 | 6D61 | 5462 | 0004 |
| 0001006060 | 0000 | 5F08 | 755F | 6C6E | 636F | 506B | 0976 | 0000 |
| 0001006100 | 0900 | 5F5F | 6F6C | 6B63 | 6E63 | 9274 | 0454 | 0000 |
| 0001006120 | 0900 | 5F5F | 6E75 | 6F6C | 6B63 | F466 | 0453 | 0000 |
| 0001006140 | 0F00 | 5F5F | 6E75 | 6F6C | 6B63 | 735F | 7274 | 6165 |
| 0001006160 | 186D | 0454 | 0000 | 0A00 | 5F5F | 6177 | 7469 | 6F6C |
| 0001006200 | 6B63 | 5400 | 0004 | 0000 | 5F0B | 6C5F | 636F | 5F6B |
| 0001006220 | 6966 | 656C | 54A2 | 0004 | 0000 | 5F0D | 625F | 6765 |
| 0001006240 | 6E69 | 6874 | 6572 | 6461 | 5583 | 0004 | 0000 | 5F0B |
| 0001006260 | 655F | 646E | 6874 | 6572 | 6461 | 55B0 | 0004 | 0000 |
| 0001006300 | 5F0B | 675F | 7465 | 6974 | 7464 | 6261 | 7652 | 0009 |
| 0001006320 | 0000 | 5F0B | 745F | 6469 | 6174 | 6D62 | 7861 | 562A |
| 0001006340 | 0004 | 0000 | 5F07 | 6466 | 706F | 6E65 | 5710 | 0004 |
| 0001006360 | 0000 | 5F06 | 7366 | 6565 | 506B | 0457 | 0000 | 0A00 |

THU MAR 14 17:52:34 1991 TSLINT.DLL PAGE 280, LINE 16462

| | | | | | | | | |
|---|---|---|---|---|---|---|---|---|
| 0001006400 | 5F5F | 7366 | 6565 | 5F6B | 6B6C | 57DE | 0004 | 0000 |
| 0001006420 | 5F06 | 7466 | 6C65 | 1A6C | 0458 | 0000 | 0A00 | 5F5F |
| 0001006440 | 7466 | 6C65 | 5F6C | 6B6C | 59B2 | 0004 | 0000 | 5F08 |
| 0001006460 | 7073 | 6972 | 746E | 2666 | 045A | 0000 | 0700 | 735F |
| 0001006500 | 6373 | 6E61 | 8266 | 045A | 0000 | 0900 | 765F | 7073 |
| 0001006520 | 6972 | 746E | 1D66 | 045B | 0000 | 0D00 | 5F5F | 7266 |
| 0001006540 | 6165 | 6C6C | 636F | 6C5F | F66B | 045A | 0000 | 0A00 |
| 0001006560 | 5F5F | 7266 | 6165 | 6C6C | 636F | 5BA4 | 0004 | 0000 |
| 0001006600 | 5F08 | 6572 | 6C61 | 6F6C | A963 | 045B | 0000 | 0B00 |
| 0001006620 | 725F | 6165 | 6C6C | 636F | 6C5F | AE6B | 045B | 0000 |
| 0001006640 | 0800 | 5F5F | 6572 | 6973 | 657A | 5C76 | 0004 | 0000 |
| 0001006660 | 5F07 | 6163 | 6C6C | 636F | 5CA4 | 0004 | 0000 | 5F09 |
| 0001006700 | 665F | 6E69 | 7364 | 6765 | 5D00 | 0004 | 0000 | 5F08 |
| 0001006720 | 7361 | 7463 | 6D69 | 6665 | 045E | 0000 | 0600 | 635F |
| 0001006740 | 6974 | 656D | 756E | 0009 | 0000 | 5F06 | 645F | 7961 |
| 0001006760 | 5473 | 0976 | 0000 | 0800 | 5F5F | 706C | 6164 | 7379 |
| 0001007000 | 5E94 | 0004 | 0000 | 5F07 | 6D67 | 6974 | 656D | 60DA |
| 0001007020 | 0004 | 0000 | 5F0A | 6F6C | 6163 | 746C | 6D69 | 5E65 |
| 0001007040 | 0461 | 0000 | 0500 | 745F | 6D69 | C865 | 0461 | 0000 |
| 0001007060 | 0600 | 745F | 737A | 7465 | 62A2 | 0004 | 0000 | 5F09 |
| 0001007100 | 695F | 6973 | 646E | 7473 | 61A8 | 0004 | 0000 | 5F08 |
| 0001007120 | 5F5F | 7A74 | 6573 | AA74 | 0976 | 0000 | 0900 | 645F |
| 0001007140 | 7961 | 696C | 6867 | A674 | 0976 | 0000 | 0900 | 745F |
| 0001007160 | 6D69 | 7A65 | 6E6F | AC65 | 0976 | 0000 | 0700 | 745F |
| 0001007200 | 6E7A | 6D61 | B465 | 0976 | 0000 | 0900 | 5F5F | 645F |
| 0001007220 | 616E | 656D | CA73 | 0976 | 0000 | 0900 | 5F5F | 6D5F |
| 0001007240 | 616E | 656D | 7073 | 0463 | 0000 | 0A00 | 5F5F | 7464 |
| 0001007260 | 786F | 6974 | 656D | 6466 | 0004 | 0000 | 5F07 | 7473 |
| 0001007300 | 6372 | 7268 | 6494 | 0004 | 0000 | 5F08 | 7473 | 6972 |
| 0001007320 | 6D63 | 9470 | 0464 | 0000 | 0800 | 735F | 7274 | 6D63 |
| 0001007340 | 6970 | 64DA | 0004 | 0000 | 5F08 | 7473 | 7272 | 6863 |
| 0001007360 | 0872 | 0465 | 0000 | 0800 | 6D5F | 6D65 | 6F6D | 6576 |
| 0001007400 | 65D2 | 0004 | 0000 | 5F07 | 656D | 636D | 706D | 662E |
| 0001007420 | 0004 | 0000 | 5F07 | 656D | 636D | 7970 | 668C | 0004 |
| 0001007440 | 0000 | 5F07 | 656D | 736D | 7465 | 66E1 | 0004 | 0000 |
| 0001007460 | 5F07 | 635F | 7478 | 616F | 66D4 | 0004 | 0000 | 5F0A |
| 0001007500 | 635F | 746C | 616F | 7573 | 3862 | 0467 | 0000 | 0500 |
| 0001007520 | 675F | 7663 | 2874 | 0468 | 0000 | 0900 | 5F5F | 6567 |
| 0001007540 | 7074 | 7461 | D268 | 0468 | 0000 | 0700 | 735F | 7465 |
| 0001007560 | 6D6A | FC70 | 0468 | 0000 | 0800 | 6C5F | 6E6F | 6A67 |
| 0001007600 | 706D | 78BC | 0009 | 0000 | 5F09 | 7973 | 5F73 | 656E |
| 0001007620 | 7272 | 7824 | 0009 | 0000 | 5F0C | 7973 | 5F73 | 7265 |
| 0001007640 | 6C72 | 7369 | 2674 | 0469 | 0000 | 0900 | 5F5F | 7277 |
| 0001007660 | 3274 | 7265 | 4072 | 0469 | 0000 | 0B00 | 5F5F | 6573 |
| 0001007700 | 7261 | 6863 | 6E65 | 4C76 | 046A | 0000 | 0900 | 5F5F |
| 0001007720 | 6563 | 766E | 7261 | C467 | 0978 | 0000 | 0A00 | 5F5F |
| 0001007740 | 6966 | 656C | 6E69 | 6F66 | 78C6 | 0009 | 0000 | 5F0B |
| 0001007760 | 705F | 6F5F | 6576 | 6C72 | 7961 | 6E86 | 0004 | 0000 |
| 0001010000 | 5F09 | 645F | 736F | 6170 | 6E77 | 706A | 0004 | 0000 |
| 0001010020 | 5F08 | 7073 | 7761 | 766E | 9C65 | 0472 | 0000 | 0900 |
| 0001010040 | 735F | 6170 | 6E77 | 7076 | 6A65 | 0474 | 0000 | 0700 |
| 0001010060 | 735F | 7379 | 6574 | 506D | 0475 | 0000 | 0700 | 615F |
| 0001010100 | 6363 | 7365 | A173 | 0475 | 0000 | 0900 | 5F5F | 6863 |
| 0001010120 | 7264 | 7669 | 8C65 | 0475 | 0000 | 0A00 | 5F5F | 6567 |
| 0001010140 | 6474 | 6972 | 6576 | 75B6 | 0004 | 0000 | 5F06 | 7366 |
| 0001010160 | 6174 | 4074 | 0478 | 0000 | 0900 | 5F5F | 6567 | 6474 |
| 0001010200 | 7763 | 2A64 | 0478 | 0000 | 0700 | 675F | 7465 | 7763 |
| 0001010220 | 6464 | 0479 | 0000 | 0700 | 725F | 6D65 | 766F | 6465 |
| 0001010240 | 0479 | 0000 | 0700 | 755F | 6C6E | 6E69 | 826B | 0479 |

THU MAR 14 17:52:34 1991 TSLINT.DLL PAGE 281, LINE 16521

| | | | | | | | | |
|---|---|---|---|---|---|---|---|---|
| 0001010260 | 0000 | 0A00 | 5F5F | 4661 | 6146 | 646C | 7669 | 79A4 |
| 0001010300 | 0004 | 0000 | 5F0A | 615F | 4646 | 6C61 | 756D | A46C |
| 0001010320 | 0479 | 0000 | 0B00 | 5F5F | 4661 | 6146 | 6C75 | 756D |
| 0001010340 | C66C | 0479 | 0000 | 0A00 | 5F5F | 4661 | 6146 | 726C |
| 0001010360 | 6D65 | 79E8 | 0004 | 0000 | 5F0A | 615F | 4646 | 6C61 |
| 0001010400 | 6873 | 086C | 047A | 0000 | 0B00 | 5F5F | 4661 | 6146 |
| 0001010420 | 6C75 | 6964 | 2A76 | 047A | 0000 | 0800 | 5F5F | 4661 |
| 0001010440 | 646C | 7669 | 7AC4 | 0004 | 0000 | 5F08 | 615F | 6C46 |
| 0001010460 | 756D | C46C | 047A | 0000 | 0900 | 5F5F | 4661 | 6C75 |
| 0001010500 | 756D | F66C | 047A | 0000 | 0800 | 5F5F | 4661 | 726C |
| 0001010520 | 6D65 | 7B96 | 0004 | 0000 | 5F08 | 615F | 6C46 | 6873 |
| 0001010540 | A26C | 047B | 0000 | 0900 | 5F5F | 4661 | 6C75 | 6964 |
| 0001010560 | 0276 | 047C | 0000 | 0900 | 5F5F | 4661 | 6C75 | 6572 |
| 0001010600 | 8B6D | 047C | 0000 | 0C00 | 5F5F | 5046 | 754E | 536D |
| 0001010620 | 6174 | 6B63 | 0000 | 0007 | 0000 | 5F07 | 505F | 6654 |
| 0001010640 | 6361 | 0008 | 0007 | 0000 | 5F07 | 665F | 7463 | 706D |
| 0001010660 | 7CAC | 0004 | 0000 | 5F0D | 645F | 6F6D | 7476 | 706D |
| 0001010700 | 7365 | 7862 | 7CAE | 0004 | 0000 | 5F0D | 645F | 6F6D |
| 0001010720 | 7476 | 706D | 7365 | 6973 | 7C96 | 0004 | 0000 | 5F0D |
| 0001010740 | 735F | 6F6D | 7476 | 706D | 7365 | 7862 | 7C98 | 0004 |
| 0001010760 | 0000 | 5F0D | 735F | 6F6D | 7476 | 706D | 7365 | 6973 |
| 0001011000 | 7C6C | 0004 | 0000 | 5F08 | 665F | 6D70 | 7461 | C468 |
| 0001011020 | 047C | 0000 | 0900 | 5F5F | 6364 | 7476 | 7473 | 8630 |
| 0001011040 | 0701 | 0000 | 0A00 | 6924 | 5F34 | 6572 | 7573 | 746C |
| 0001011060 | 0172 | 0007 | 0000 | 5F09 | 665F | 7463 | 706F | 7473 |
| 0001011100 | 0186 | 0007 | 0000 | 240A | 3869 | 725F | 7365 | 6C75 |
| 0001011120 | D074 | 047C | 0000 | 0A00 | 5F5F | 6364 | 7476 | 7473 |
| 0001011140 | 6130 | 792E | 0009 | 0000 | 5F0A | 665F | 7370 | 6769 |
| 0001011160 | 6461 | D372 | 047C | 0000 | 0A00 | 5F5F | 6364 | 7476 |
| 0001011200 | 6964 | 6973 | 7E5B | 0004 | 0000 | 240C | 3469 | 745F |
| 0001011220 | 5F6F | 6977 | 6E72 | 4964 | 047E | 0000 | 0C00 | 6924 |
| 0001011240 | 5F38 | 6F74 | 735F | 7269 | 646E | 7E65 | 0004 | 0000 |
| 0001011260 | 240C | 3869 | 745F | 5F6F | 6977 | 6E72 | CB64 | 047F |
| 0001011300 | 0000 | 0700 | 6924 | 5F34 | 6966 | BB78 | 047F | 0000 |
| 0001011320 | 0700 | 6924 | 5F38 | 6966 | 7778 | 047E | 0000 | 0800 |
| 0001011340 | 6924 | 5F34 | 6F74 | 6C5F | 7E7C | 0004 | 0000 | 2408 |
| 0001011360 | 3869 | 745F | 5F6F | F56C | 047E | 0000 | 0800 | 6924 |
| 0001011400 | 5F34 | 6F74 | 715F | 7E3A | 0004 | 0000 | 2408 | 3469 |
| 0001011420 | 745F | 5F6F | C073 | 047E | 0000 | 0800 | 6924 | 5F38 |
| 0001011440 | 6F74 | 715F | 7E56 | 0004 | 0000 | 2408 | 3469 | 745F |
| 0001011460 | 5F6F | 4477 | 047E | 0000 | 0800 | 6924 | 5F38 | 6F74 |
| 0001011500 | 735F | 7E60 | 0004 | 0000 | 2408 | 3869 | 745F | 5F6F |
| 0001011520 | 9777 | 047F | 0000 | 0A00 | 6924 | 5F34 | 6966 | 7278 |
| 0001011540 | 646E | 7F71 | 0004 | 0000 | 240A | 3869 | 665F | 7869 |
| 0001011560 | 6E72 | 5364 | 047D | 0000 | 0500 | 6924 | 5F34 | 1238 |
| 0001011600 | 047D | 0000 | 0500 | 6924 | 5F38 | EB34 | 047D | 0000 |
| 0001011620 | 0500 | 6924 | 5F34 | 1B6C | 047E | 0000 | 0500 | 6924 |
| 0001011640 | 5F38 | 976C | 047F | 0000 | 0B00 | 6924 | 5F34 | 6966 |
| 0001011660 | 6978 | 6E72 | D764 | 047D | 0000 | 0500 | 6924 | 5F34 |
| 0001011700 | DF71 | 047D | 0000 | 0500 | 6924 | 5F34 | 7173 | 047F |
| 0001011720 | 0000 | 0B00 | 6924 | 5F38 | 6966 | 6978 | 6E72 | 0764 |
| 0001011740 | 047E | 0000 | 0500 | 6924 | 5F38 | 0F71 | 047E | 0000 |
| 0001011760 | 0500 | 6924 | 5F38 | D573 | 047D | 0000 | 0500 | 6924 |
| 0001012000 | 5F34 | 0577 | 047E | 0000 | 0500 | 6924 | 5F38 | 6D77 |
| 0001012020 | 047E | 0000 | 0B00 | 6924 | 5F34 | 6F74 | 6C5F | 6E72 |
| 0001012040 | 7264 | 047E | 0000 | 0B00 | 6924 | 5F38 | 6F74 | 6C5F |
| 0001012060 | 6E72 | 9C64 | 047E | 0000 | 0B00 | 6924 | 5F34 | 6F74 |
| 0001012100 | 715F | 6E72 | 3F64 | 047E | 0000 | 0BC0 | 6924 | 5F34 |
| 0001012120 | 6F74 | 735F | 6E72 | A164 | 047E | 0000 | 0B00 | 6924 |

THU MAR 14 17:52:34 1991 TSLINT.DLL PAGE 282, LINE 16580

| | | | | | | | | |
|---|---|---|---|---|---|---|---|---|
| 0001012140 | 5F38 | 6F74 | 715F | 6E72 | 5B64 | 047E | 0000 | 0B00 |
| 0001012160 | 6924 | 5F34 | 6F74 | 775F | 6E72 | 4964 | 047E | 0000 |
| 0001012200 | 0B00 | 6924 | 5F38 | 6F74 | 735F | 6E72 | 6564 | 047E |
| 0001012220 | 0000 | 0B00 | 6924 | 5F38 | 6F74 | 775F | 6E72 | 6D64 |
| 0001012240 | 047E | 0000 | 0C00 | 6924 | 5F34 | 6F74 | 6C5F | 7269 |
| 0001012260 | 646E | 7E72 | 0004 | 0000 | 240C | 3869 | 745F | 5F6F |
| 0001012300 | 696C | 6E72 | 9C64 | 047E | 0000 | 0C00 | 6924 | 5F34 |
| 0001012320 | 6F74 | 715F | 7269 | 646E | 7E3F | 0004 | 0000 | 240C |
| 0001012340 | 3469 | 745F | 5F6F | 6973 | 6E72 | A164 | 047E | 0000 |
| 0001012360 | 0C00 | 6924 | 5F38 | 6F74 | 715F | 7269 | 646E | 80F9 |
| 0001012400 | 0004 | 0000 | 2407 | 3469 | 635F | 706D | 814C | 0004 |
| 0001012420 | 0000 | 2407 | 3869 | 635F | 706D | 81A8 | 0004 | 0000 |
| 0001012440 | 2407 | 3469 | 615F | 6464 | 8390 | 0004 | 0000 | 2407 |
| 0001012460 | 3469 | 645F | 7669 | 81A0 | 0004 | 0000 | 2407 | 3469 |
| 0001012500 | 735F | 6275 | 830A | 0004 | 0000 | 2407 | 3469 | 6D5F |
| 0001012520 | 6C75 | 0191 | 0007 | 0000 | 240D | 3469 | 725F | 756F |
| 0001012540 | 646E | 655F | 7078 | 827A | 0004 | 0000 | 2408 | 3469 |
| 0001012560 | 6E5F | 726F | 906D | 0701 | 0000 | 0E00 | 6924 | 5F34 |
| 0001012600 | 6F72 | 6E75 | 5F64 | 6C66 | 6761 | 0193 | 0007 | 0000 |
| 0001012620 | 2409 | 3469 | 615F | 5F63 | 6968 | 0197 | 0007 | 0000 |
| 0001012640 | 2409 | 3469 | 615F | 5F63 | 6F6C | 82A8 | 0004 | 0000 |
| 0001012660 | 2409 | 3469 | 725F | 756F | 646E | 838E | 0004 | 0000 |
| 0001012700 | 240A | 3469 | 645F | 7669 | 6572 | 9E76 | 0481 | 0000 |
| 0001012720 | 0A00 | 6924 | 5F34 | 7573 | 7262 | 7665 | 84BD | 0004 |
| 0001012740 | 0000 | 2407 | 3869 | 615F | 6464 | 8726 | 0004 | 0000 |
| 0001012760 | 2407 | 3869 | 645F | 7669 | 849A | 0004 | 0000 | 2407 |
| 0001013000 | 3869 | 735F | 6275 | 86C3 | 0004 | 0000 | 2407 | 3869 |
| 0001013020 | 6D5F | 6C75 | 01A9 | 0007 | 0000 | 240D | 3869 | 725F |
| 0001013040 | 756F | 646E | 655F | 7078 | 85F0 | 0004 | 0000 | 2408 |
| 0001013060 | 3869 | 6E5F | 726F | A86D | 0701 | 0000 | 0E00 | 6924 |
| 0001013100 | 5F38 | 6F72 | 6E75 | 5F64 | 6C66 | 6761 | 01AB | 0007 |
| 0001013120 | 0000 | 2409 | 3869 | 615F | 5F63 | 6968 | 01B3 | 0007 |
| 0001013140 | 0000 | 2409 | 3869 | 615F | 5F63 | 6F6C | 8645 | 0004 |
| 0001013160 | 0000 | 2409 | 3869 | 725F | 756F | 646E | 8724 | 0004 |
| 0001013200 | 0000 | 240A | 3869 | 645F | 7669 | 6572 | 9876 | 0484 |
| 0001013220 | 0000 | 0A00 | 6924 | 5F38 | 7573 | 7262 | 7665 | 8A6E |
| 0001013240 | 0004 | 0000 | 2407 | 3869 | 735F | 7271 | 01D4 | 0007 |
| 0001013260 | 0000 | 2407 | 3869 | 615F | 6772 | 01C4 | 0007 | 0000 |
| 0001013300 | 2407 | 3869 | 6F5F | 656E | 8B91 | 0004 | 0000 | 240D |
| 0001013320 | 3869 | 6D5F | 766F | 7261 | 5F67 | 6361 | 8B81 | 0004 |
| 0001013340 | 0000 | 240D | 3869 | 6D5F | 766F | 6361 | 615F | 6772 |
| 0001013360 | 01CC | 0007 | 0300 | 2407 | 3869 | 745F | 6F77 | 8B2C |
| 0001013400 | 0004 | 0000 | 2408 | 3869 | 615F | 6464 | BC66 | 0701 |
| 0001013420 | 0000 | 0800 | 6924 | 5F38 | 6168 | 666C | 8B4A | 0004 |
| 0001013440 | 0000 | 2408 | 3869 | 645F | 7669 | 1E66 | 048C | 0000 |
| 0001013460 | 0800 | 6924 | 5F38 | 7665 | 6E65 | 8B36 | 0004 | 0000 |
| 0001013500 | 2408 | 3869 | 735F | 6275 | 4066 | 048B | 0000 | 0800 |
| 0001013520 | 6924 | 5F38 | 756D | 666C | 8B5E | 0004 | 0000 | 2408 |
| 0001013540 | 3869 | 645F | 7669 | DC72 | 0701 | 0000 | 0800 | 6924 |
| 0001013560 | 5F38 | 6574 | 706D | 8B54 | 0004 | 0000 | 2408 | 3869 |
| 0001013600 | 735F | 6275 | D972 | 048B | 0000 | 0800 | 6924 | 5F38 |
| 0001013620 | 6F70 | 796C | 8BB0 | 0004 | 0000 | 2409 | 3869 | 705F |
| 0001013640 | 6873 | 6361 | 8BC7 | 0004 | 0000 | 2409 | 3869 | 705F |
| 0001013660 | 706F | 6361 | 8B78 | 0004 | 0000 | 2409 | 3869 | 6D5F |
| 0001013700 | 766F | 6361 | 8BB4 | 0004 | 0000 | 2409 | 3869 | 705F |
| 0001013720 | 6873 | 6973 | 8BCB | 0004 | 0000 | 2409 | 3869 | 705F |
| 0001013740 | 706F | 6973 | 8B30 | 0004 | 0000 | 240A | 3869 | 615F |
| 0001013760 | 6464 | 7366 | 6269 | 048B | 0000 | 0A00 | 6924 | 5F38 |
| 0001014000 | 6964 | 7276 | 6964 | 8BAB | 0004 | 0000 | 240A | 3869 |

THU MAR 14 17:52:34 1991 TSLINT.DLL PAGE 283, LINE 16639

| | | | | | | | | |
|---|---|---|---|---|---|---|---|---|
| 0001014020 | 705F | 6873 | 7261 | 4E67 | 048B | 0000 | 0A00 | 6924 |
| 0001014040 | 5F38 | 6964 | 6676 | 6973 | 8BC2 | 0004 | 0000 | 240A |
| 0001014060 | 3869 | 705F | 706F | 7261 | 5867 | 048B | 0000 | 0A00 |
| 0001014100 | 6924 | 5F38 | 7573 | 7262 | 6964 | 8B95 | 0004 | 0000 |
| 0001014120 | 240A | 3869 | 6D5F | 766F | 7261 | 3A67 | 048B | 0000 |
| 0001014140 | 0A00 | 6924 | 5F38 | 7573 | 6662 | 6973 | 8B44 | 0004 |
| 0001014160 | 0000 | 240A | 3869 | 6D5F | 6C75 | 7366 | 6869 | 048B |
| 0001014200 | 0000 | 0B00 | 6924 | 5F38 | 6C63 | 6165 | 6172 | A063 |
| 0001014220 | 048B | 0000 | 0B00 | 6924 | 5F38 | 6F6D | 7476 | 6D65 |
| 0001014240 | 5470 | 048C | 0000 | 0700 | 6924 | 5F38 | 5F70 | F471 |
| 0001014260 | 0701 | 0000 | 0700 | 6924 | 5F38 | 7A70 | 8A7A | 048C |
| 0001014300 | 0000 | 0900 | 6924 | 5F38 | 327A | 5F70 | 9B71 | 048C |
| 0001014320 | 0000 | 0900 | 6924 | 5F38 | 337A | 5F70 | A471 | 048C |
| 0001014340 | 0000 | 0A00 | 6924 | 5F38 | 6572 | 7564 | 6563 | 01E4 |
| 0001014360 | 0007 | 0000 | 2405 | 3869 | 7A5F | 01EC | 0007 | 0000 |
| 0001014400 | 2406 | 3869 | 7A5F | D67A | 048C | 0000 | 0700 | 6924 |
| 0001014420 | 5F38 | 6F6C | C067 | 048C | 0000 | 0700 | 6924 | 5F38 |
| 0001014440 | 676C | 8D74 | 048D | 0000 | 0700 | 6924 | 5F38 | 7865 |
| 0001014460 | A170 | 048D | 0000 | 0D00 | 6924 | 5F38 | 7865 | 6170 |
| 0001014500 | 6A64 | 7375 | F074 | 048E | 0000 | 0C00 | 6924 | 5F38 |
| 0001014520 | 6670 | 705F | 7277 | 6C5F | 8DF6 | 0004 | 0000 | 2407 |
| 0001014540 | 3869 | 705F | 7277 | 8DF2 | 0004 | 0000 | 2409 | 3869 |
| 0001014560 | 635F | 705F | 7277 | 8EF0 | 0004 | 0000 | 2409 | 3869 |
| 0001014600 | 705F | 7277 | 6C5F | 8DDC | 0004 | 0000 | 240A | 3869 |
| 0001014620 | 705F | 5F66 | 7770 | EC72 | 048F | 0000 | 0D00 | 6924 |
| 0001014640 | 5F38 | 7865 | 6870 | 6172 | 676E | 7065 | 048F | 0000 |
| 0001014660 | 0900 | 6924 | 5F38 | 7865 | 6D70 | FA31 | 048F | 0000 |
| 0001014700 | 0900 | 6924 | 5F38 | 6172 | 676E | 8165 | 048F | 0000 |
| 0001014720 | 1000 | 6924 | 5F38 | 7865 | 6D70 | 7231 | 6465 | 6375 |
| 0001014740 | 6465 | 8FC6 | 0004 | 0000 | 240A | 3869 | 725F | 7465 |
| 0001014760 | 6E6F | 9D65 | 0702 | 0000 | 0A00 | 6924 | 5F38 | 6F6C |
| 0001015000 | 5F67 | 6968 | 02A5 | 0007 | 0000 | 240A | 3869 | 6C5F |
| 0001015020 | 676F | 6C5F | B16F | 048F | 0000 | 1100 | 6924 | 5F38 |
| 0001015040 | 6E6C | 6572 | 7564 | 6563 | 6361 | 685F | E769 | 048F |
| 0001015060 | 0000 | 1100 | 6924 | 5F38 | 766F | 7265 | 6C66 | 776F |
| 0001015100 | 6172 | 676E | D065 | 048F | 0000 | 0B00 | 6924 | 5F38 |
| 0001015120 | 6572 | 7A74 | 7265 | B76F | 048F | 0000 | 0C00 | 6924 |
| 0001015140 | 5F38 | 6E6C | 6572 | 7564 | 6563 | 8FF4 | 0004 | 0000 |
| 0001015160 | 240C | 3869 | 655F | 7078 | 6172 | 676E | 1E65 | 0490 |
| 0001015200 | 0000 | 0700 | 6924 | 5F38 | 6174 | 646E | 0490 | 0000 |
| 0001015220 | 0700 | 6924 | 5F38 | 6F63 | 4A73 | 0490 | 0000 | 0700 |
| 0001015240 | 6924 | 5F38 | 7463 | 7D6E | 0490 | 0000 | 0700 | 692‘ |
| 0001015260 | 5F38 | 6973 | FD6E | 0490 | 0000 | 0700 | 6924 | 5F38 |
| 0001015300 | 7461 | D66E | 0491 | 0000 | 0700 | 6924 | 5F38 | 7461 |
| 0001015320 | 9932 | 0491 | 0000 | 0700 | 6924 | 5F38 | 6361 | 9C73 |
| 0001015340 | 0491 | 0000 | 0700 | 6924 | 5F38 | 7361 | B56E | 0492 |
| 0001015360 | 0000 | 0A00 | 6924 | 5F38 | 756F | 7074 | 7475 | 042E |
| 0001015400 | 0007 | 0000 | 240C | 3869 | 695F | 706E | 7475 | 775F |
| 0001015420 | 0673 | 0494 | 0000 | 0900 | 6924 | 5F38 | 6E69 | 7570 |
| 0001015440 | 2F74 | 0704 | 0000 | 1000 | 6924 | 5F38 | 6D69 | 6C70 |
| 0001015460 | 6369 | 7469 | 655F | 7078 | 96F2 | 0004 | 0000 | 2408 |
| 0001015500 | 3869 | 745F | 756D | 586C | 0498 | 0000 | 0A00 | 6924 |
| 0001015520 | 5F38 | 7074 | 7277 | 3031 | 987C | 0004 | 0000 | 5F0F |
| 0001015540 | 475F | 7465 | 6C41 | 6D74 | 7461 | 5068 | 4454 | 9876 |
| 0001015560 | 0000 | 0001 | 5F09 | 665F | 746C | 7375 | 6465 | 9F18 |
| 0001015600 | 0004 | 0006 | 5F06 | 665F | 6461 | 3564 | 0499 | 0000 |
| 0001015620 | 0600 | 5F5F | 6C65 | 6464 | 9931 | 0004 | 0000 | 5F06 |
| 0001015640 | 665F | 646C | 7A64 | 049C | 0000 | 0600 | 5F5F | 6166 |
| 0001015660 | 7362 | 99C4 | 0004 | 0000 | 5F06 | 655F | 646C | D76C |

THU MAR 14 17:52:34 1991 TSLINT.DLL PAGE 284, LINE 16698

| | | | | | | | | |
|---|---|---|---|---|---|---|---|---|
| 0001015700 | 0499 | 0000 | 0600 | 5F5F | 6C66 | 6C64 | 9C92 | 0004 |
| 0001015720 | 0000 | 5F06 | 665F | 6863 | 2273 | 049F | 0000 | 0600 |
| 0001015740 | 5F5F | 6366 | 706D | 992B | 0004 | 0000 | 5F06 | 735F |
| 0001015760 | 646C | F264 | 0498 | 0000 | 0600 | 5F5F | 6C65 | 7364 |
| 0001016000 | 9FC9 | 0004 | 0000 | 5F06 | 665F | 6378 | 0E68 | 049F |
| 0001016020 | 0000 | 0600 | 5F5F | 6466 | 7669 | 98EE | 0004 | 0000 |
| 0001016040 | 5F06 | 665F | 646C | 8173 | 0499 | 0000 | 0600 | 5F5F |
| 0001016060 | 6C66 | 7464 | 99D1 | 0004 | 0000 | 5F06 | 655F | 646C |
| 0001016100 | DE77 | 0499 | 0000 | 0600 | 5F5F | 6C66 | 7764 | 9A43 |
| 0001016120 | 0004 | 0000 | 5F06 | 665F | 7564 | C070 | 0499 | 0000 |
| 0001016140 | 0600 | 5F5F | 6C73 | 6C64 | 9EFF | 0004 | 0000 | 5F06 |
| 0001016160 | 665F | 7573 | 1162 | 049B | 0000 | 0600 | 5F5F | 7365 |
| 0001016200 | 6474 | 9A7B | 0004 | 0000 | 5F06 | 665F | 646C | F87A |
| 0001016220 | 049F | 0000 | 0600 | 5F5F | 6364 | 7476 | 980D | 0004 |
| 0001016240 | 0000 | 5F06 | 665F | 7473 | 0964 | 049F | 0000 | 0600 |
| 0001016260 | 5F5F | 6D66 | 6C75 | 9BF7 | 0004 | 0000 | 5F06 | 665F |
| 0001016300 | 6F74 | E86C | 0498 | 0000 | 0600 | 5F5F | 6C73 | 7364 |
| 0001016320 | 9973 | 0004 | 0000 | 5F06 | 735F | 646C | CD74 | 0499 |
| 0001016340 | 0000 | 0600 | 5F5F | 6C73 | 7764 | 9B09 | 0004 | 0000 |
| 0001016360 | 5F06 | 735F | 7473 | B264 | 049A | 0000 | 0600 | 5F5F |
| 0001016400 | 7365 | 7374 | 9AAE | 0004 | 0000 | 5F06 | 665F | 7473 |
| 0001016420 | 4373 | 049C | 0000 | 0600 | 5F5F | 7466 | 7473 | 9B67 |
| 0001016440 | 0004 | 0000 | 5F06 | 665F | 7473 | AA74 | 049A | 0000 |
| 0001016460 | 0600 | 5F5F | 7373 | 7374 | 9B63 | 0004 | 0000 | 5F06 |
| 0001016500 | 735F | 7473 | D174 | 049E | 0000 | 0700 | 5F5F | 6165 |
| 0001016520 | 6464 | E064 | 049E | 0000 | 0700 | 5F5F | 6166 | 6464 |
| 0001016540 | C164 | 049E | 0000 | 0700 | 5F5F | 6173 | 6464 | AF64 |
| 0001016560 | 049D | 0000 | 0700 | 5F5F | 6165 | 6464 | BE73 | 049D |
| 0001016600 | 0000 | 0700 | 5F5F | 6166 | 6464 | 8173 | 049E | 0000 |
| 0001016620 | 0700 | 5F5F | 6465 | 7669 | 9064 | 049E | 0000 | 0700 |
| 0001016640 | 5F5F | 6466 | 7669 | 9F64 | 049D | 0000 | 0700 | 5F5F |
| 0001016660 | 6173 | 6464 | 0773 | 049E | 0000 | 0700 | 5F5F | 7365 |
| 0001016700 | 6275 | 1664 | 049E | 0000 | 0700 | 5F5F | 7366 | 6275 |
| 0001016720 | 5964 | 049E | 0000 | 0700 | 5F5F | 6D65 | 6C75 | 6864 |
| 0001016740 | 049E | 0000 | 0700 | 5F5F | 6D66 | 6C75 | BB64 | 049F |
| 0001016760 | 0000 | 0700 | 5F5F | 7866 | 6863 | 7171 | 049E | 0000 |
| 0001017000 | 0700 | 5F5F | 6473 | 7669 | 1364 | 049F | 0000 | 070D |
| 0001017020 | 5F5F | 6466 | 7669 | 5F72 | 049D | 0000 | 0700 | 5F5F |
| 0001017040 | 6465 | 7669 | 6E73 | 049D | 0000 | 0700 | 5F5F | 6466 |
| 0001017060 | 7669 | 3173 | 049B | 0000 | 0700 | 5F5F | 7365 | 6474 |
| 0001017100 | F770 | 049D | 0000 | 0700 | 5F5F | 7373 | 6275 | 2D64 |
| 0001017120 | 049B | 0000 | 0700 | 5F5F | 7366 | 6474 | 0470 | 049F |
| 0001017140 | 0000 | 0700 | 5F5F | 7366 | 6275 | E572 | 049C | 0000 |
| 0001017160 | 0700 | 5F5F | 7365 | 6275 | F473 | 049C | 0000 | 0700 |
| 0001017200 | 5F5F | 7366 | 6275 | 4973 | 049E | 0000 | 0700 | 5F5F |
| 0001017220 | 6D73 | 6C75 | 3764 | 049D | 0000 | 0700 | 5F5F | 6D65 |
| 0001017240 | 6C75 | 4673 | 049D | 0000 | 0700 | 5F5F | 6D66 | 6C75 |
| 0001017260 | 4F73 | 049D | 0000 | 0700 | 5F5F | 6473 | 7669 | 2973 |
| 0001017300 | 049B | 0000 | 0700 | 5F5F | 7373 | 6474 | D270 | 049A |
| 0001017320 | 0000 | 0700 | 5F5F | 7365 | 7374 | D570 | 049C | 0000 |
| 0001017340 | 0700 | 5F5F | 7373 | 6275 | CE73 | 049A | 0000 | 0700 |
| 0001017360 | 5F5F | 7366 | 7374 | 8670 | 049B | 0000 | 0700 | 5F5F |
| 0001017400 | 7366 | 7474 | 2770 | 049D | 0000 | 0700 | 5F5F | 6D73 |
| 0001017420 | 6C75 | 1873 | 049F | 0000 | 0800 | 5F5F | 4661 | 6166 |
| 0001017440 | 6464 | 9ACA | 0004 | 0000 | 5F07 | 735F | 7473 | 7073 |
| 0001017460 | 9B82 | 0004 | 0000 | 5F07 | 735F | 7473 | 7074 | 9935 |
| 0001017500 | 0004 | 0000 | 5F08 | 615F | 6546 | 646C | 3164 | 0499 |
| 0001017520 | 0000 | 0800 | 5F5F | 4661 | 6C66 | 6464 | 9C7A | 0004 |
| 0001017540 | 0000 | 5F08 | 615F | 6646 | 6261 | C473 | 0499 | 0000 |

THU MAR 14 17:52:34 1991 TSLINT.DLL PAGE 285, LINE 16757

| | | | | | | | | |
|---|---|---|---|---|---|---|---|---|
| 0001017560 | 0800 | 5F5F | 4661 | 6C65 | 6C64 | 99D7 | 0004 | 0000 |
| 0001017600 | 5F08 | 615F | 6646 | 646C | 926C | 049C | 0000 | 0800 |
| 0001017620 | 5F5F | 4661 | 6366 | 7368 | 9F22 | 0004 | 0000 | 5F08 |
| 0001017640 | 615F | 6646 | 6D63 | 2B70 | 0499 | 0000 | 0800 | 5F5F |
| 0001017660 | 4661 | 6C73 | 6464 | 98F2 | 0004 | 0000 | 5F08 | 615F |
| 0001017700 | 6546 | 646C | C973 | 049F | 0000 | 0800 | 5F5F | 4661 |
| 0001017720 | 7866 | 6863 | 9F0E | 0004 | 0000 | 5F08 | 615F | 6646 |
| 0001017740 | 6964 | EE76 | 0498 | 0000 | 0800 | 5F5F | 4661 | 6C66 |
| 0001017760 | 7364 | 9981 | 0004 | 0000 | 5F08 | 615F | 6646 | 646C |
| 0001020000 | D174 | 0499 | 0000 | 0800 | 5F5F | 4661 | 6C65 | 7764 |
| 0001020020 | 99DE | 0004 | 0000 | 5F08 | 615F | 6646 | 646C | 4377 |
| 0001020040 | 049A | 0000 | 0800 | 5F5F | 4661 | 6466 | 7075 | 99C0 |
| 0001020060 | 0004 | 0000 | 5F08 | 615F | 7346 | 646C | FF6C | 049E |
| 0001020100 | 0000 | 0800 | 5F5F | 4661 | 7366 | 6275 | 9B11 | 0004 |
| 0001020120 | 0000 | 5F08 | 615F | 6546 | 7473 | 7B64 | 049A | 0000 |
| 0001020140 | 0800 | 5F5F | 4661 | 6C66 | 7A64 | 9FF8 | 0004 | 0000 |
| 0001020160 | 5F08 | 615F | 6446 | 7663 | 0D74 | 049B | 0000 | 0800 |
| 0001020200 | 5F5F | 4661 | 7366 | 6474 | 9F09 | 0004 | 0000 | 5F08 |
| 0001020220 | 615F | 6646 | 756D | F76C | 049B | 0000 | 0800 | 5F5F |
| 0001020240 | 4661 | 7466 | 6C6F | 98E8 | 0004 | 0000 | 5F08 | 615F |
| 0001020260 | 7346 | 646C | A973 | 049E | 0000 | 0800 | 5F5F | 6465 |
| 0001020300 | 7669 | 7264 | 9973 | 0004 | 0000 | 5F08 | 615F | 7346 |
| 0001020320 | 646C | B874 | 049E | 0000 | 0800 | 5F5F | 6466 | 7669 |
| 0001020340 | 7264 | 99CD | 0004 | 0000 | 5F08 | 615F | 7346 | 646C |
| 0001020360 | 1D77 | 049F | 0000 | 0800 | 5F5F | 6366 | 6D6F | 7070 |
| 0001020400 | 9E30 | 0004 | 0000 | 5F08 | 655F | 7573 | 6462 | 0972 |
| 0001020420 | 049B | 0000 | 0800 | 5F5F | 4661 | 7373 | 6474 | 9E3F |
| 0001020440 | 0004 | 0000 | 5F08 | 665F | 7573 | 6462 | B272 | 049A |
| 0001020460 | 0000 | 0800 | 5F5F | 4661 | 7365 | 7374 | 9AAE | 0004 |
| 0001020500 | 0000 | 5F08 | 615F | 6646 | 7473 | 4373 | 049C | 0000 |
| 0001020520 | 0800 | 5F5F | 4661 | 7466 | 7473 | 9B67 | 0004 | 0000 |
| 0001020540 | 5F08 | 615F | 6646 | 7473 | 9974 | 049E | 0000 | 0800 |
| 0001020560 | 5F5F | 6473 | 7669 | 7264 | 9D87 | 0004 | 0000 | 5F08 |
| 0001020600 | 655F | 6964 | 7376 | 9672 | 049D | 0000 | 0800 | 5F5F |
| 0001020620 | 6466 | 7669 | 7273 | 9E20 | 0004 | 0000 | 5F08 | 735F |
| 0001020640 | 7573 | 6462 | 0E72 | 049D | 0000 | 0800 | 5F5F | 7365 |
| 0001020660 | 6275 | 7273 | 9AAA | 0004 | 0000 | 5F08 | 615F | 7346 |
| 0001020700 | 7473 | 1D73 | 049D | 0000 | 0800 | 5F5F | 7366 | 6275 |
| 0001020720 | 7273 | 9B63 | 0004 | 0000 | 5F08 | 615F | 7346 | 7473 |
| 0001020740 | D174 | 049E | 0000 | 0900 | 5F5F | 4661 | 6165 | 6464 |
| 0001020760 | E064 | 049E | 0000 | 0900 | 5F5F | 4661 | 6166 | 6464 |
| 0001021000 | 7764 | 049D | 0000 | 0800 | 5F5F | 6473 | 7669 | 7273 |
| 0001021020 | 9CFE | 0004 | 0000 | 5F08 | 735F | 7573 | 7362 | C172 |
| 0001021040 | 049E | 0000 | 0900 | 5F5F | 4661 | 6173 | 6464 | AF64 |
| 0001021060 | 049D | 0000 | 0900 | 5F5F | 4661 | 6165 | 6464 | BE73 |
| 0001021100 | 049D | 0000 | 0900 | 5F5F | 4661 | 6166 | 6464 | 8173 |
| 0001021120 | 049E | 0000 | 0900 | 5F5F | 4661 | 6465 | 7669 | 9064 |
| 0001021140 | 049E | 0000 | 0900 | 5F5F | 4661 | 6466 | 7669 | 9F64 |
| 0001021160 | 049D | 0000 | 0900 | 5F5F | 4661 | 6173 | 6464 | 0773 |
| 0001021200 | 049E | 0000 | 0900 | 5F5F | 4661 | 7365 | 6275 | 1664 |
| 0001021220 | 049E | 0000 | 0900 | 5F5F | 4661 | 7366 | 6275 | 5964 |
| 0001021240 | 049E | 0000 | 0900 | 5F5F | 4661 | 6D65 | 6C75 | 6864 |
| 0001021260 | 049E | 0000 | 0900 | 5F5F | 4661 | 6D66 | 6C75 | BB64 |
| 0001021300 | 049F | 0000 | 0900 | 5F5F | 4661 | 7866 | 6863 | 7171 |
| 0001021320 | 049E | 0000 | 0900 | 5F5F | 4661 | 6473 | 7669 | 1364 |
| 0001021340 | 049F | 0000 | 0900 | 5F5F | 4661 | 6466 | 7669 | 5F72 |
| 0001021360 | 049D | 0000 | 0900 | 5F5F | 4661 | 6465 | 7669 | 6E73 |
| 0001021400 | 049D | 0000 | 0900 | 5F5F | 4661 | 6466 | 7669 | 3173 |
| 0001021420 | 049B | 0000 | 0900 | 5F5F | 4661 | 7365 | 6474 | F770 |

THU MAR 14 17:52:34 1991 TSLINT.DLL PAGE 286, LINE 16816

| | | | | | | | | |
|---|---|---|---|---|---|---|---|---|
| 0001021440 | 049D | 0000 | 0900 | 5F5F | 4661 | 7373 | 6275 | 2D64 |
| 0001021460 | 049B | 0000 | 0900 | 5F5F | 4661 | 7366 | 6474 | 0470 |
| 0001021500 | 049F | 0000 | 0900 | 5F5F | 4661 | 7366 | 6275 | E572 |
| 0001021520 | 049C | 0000 | 0900 | 5F5F | 4661 | 7365 | 6275 | F473 |
| 0001021540 | 049C | 0000 | 0900 | 5F5F | 4661 | 7366 | 6275 | 4973 |
| 0001021560 | 049E | 0000 | 0900 | 5F5F | 4661 | 6D73 | 6C75 | 3764 |
| 0001021600 | 049D | 0000 | 0900 | 5F5F | 4661 | 6D65 | 6C75 | 4673 |
| 0001021620 | 049D | 0000 | 0900 | 5F5F | 4661 | 6D66 | 6C75 | 4F73 |
| 0001021640 | 049D | 0000 | 0900 | 5F5F | 4661 | 6473 | 7669 | 2973 |
| 0001021660 | 049B | 0000 | 0900 | 5F5F | 4661 | 7373 | 6474 | D270 |
| 0001021700 | 049A | 0000 | 0900 | 5F5F | 4661 | 7365 | 7374 | D570 |
| 0001021720 | 049C | 0000 | 0900 | 5F5F | 4661 | 7373 | 6275 | CE73 |
| 0001021740 | 049A | 0000 | 0900 | 5F5F | 4661 | 7366 | 7374 | 8670 |
| 0001021760 | 049B | 0000 | 0900 | 5F5F | 4661 | 7366 | 7474 | 2770 |
| 0001022000 | 049D | 0000 | 0900 | 5F5F | 4661 | 6D73 | 6C75 | CA73 |
| 0001022020 | 049A | 0000 | 0900 | 5F5F | 4661 | 7373 | 7374 | 8270 |
| 0001022040 | 049B | 0000 | 0900 | 5F5F | 4661 | 7373 | 7474 | A970 |
| 0001022060 | 049E | 0000 | 0A00 | 5F5F | 4661 | 6465 | 7669 | 7264 |
| 0001022100 | 9EB8 | 0004 | 0000 | 5F0A | 615F | 6646 | 6964 | 6476 |
| 0001022120 | 1D72 | 049F | 0000 | 0A00 | 5F5F | 4661 | 6366 | 6D6F |
| 0001022140 | 7070 | 9E30 | 0004 | 0000 | 5F0A | 615F | 6546 | 7573 |
| 0001022160 | 6462 | 3F72 | 049E | 0000 | 0A00 | 5F5F | 4661 | 7366 |
| 0001022200 | 6275 | 7264 | 9E99 | 0004 | 0000 | 5F0A | 615F | 7346 |
| 0001022220 | 6964 | 6476 | 8772 | 049D | 0000 | 0A00 | 5F5F | 4661 |
| 0001022240 | 6465 | 7669 | 7273 | 9D96 | 0004 | 0000 | 5F0A | 615F |
| 0001022260 | 6646 | 6964 | 7376 | 2072 | 049E | 0000 | 0A00 | 5F5F |
| 0001022300 | 4661 | 7373 | 6275 | 7264 | 9D0E | 0004 | 0000 | 5F0A |
| 0001022320 | 615F | 6546 | 7573 | 7362 | 1D72 | 049D | 0000 | 0A00 |
| 0001022340 | 5F5F | 4661 | 7366 | 6275 | 7273 | 9D77 | 0004 | 0000 |
| 0001022360 | 5F0A | 615F | 7346 | 6964 | 7376 | FE72 | 049C | 0000 |
| 0001022400 | 0A00 | 5F5F | 4661 | 7373 | 6275 | 7273 | 99E0 | 0004 |
| 0001022420 | 0000 | 4206 | 4624 | 4C49 | 6432 | 0704 | 0000 | 0500 |
| 0001022440 | 704F | 6154 | B262 | 049B | 0000 | 0600 | 2442 | 4946 |
| 0001022460 | 3253 | 99E1 | 0004 | 0000 | 4206 | 4624 | 4C49 | 1D44 |
| 0001022500 | 049F | 0000 | 0600 | 2442 | 4346 | 504D | 9BBA | 0004 |
| 0001022520 | 0000 | 4206 | 4624 | 5349 | C254 | 049B | 0000 | 0600 |
| 0001022540 | 2442 | 5546 | 5453 | 0482 | 0007 | 0000 | 5F06 | 665F |
| 0001022560 | 7363 | 1270 | 04A0 | 0000 | 0A00 | 6924 | 5F34 | 7265 |
| 0001022600 | 6972 | 666E | A012 | 0004 | 0000 | 240A | 3869 | 655F |
| 0001022620 | 7272 | 6E69 | 1966 | 04A0 | 0000 | 0B00 | 6924 | 5F34 |
| 0001022640 | 7265 | 6472 | 7669 | 1930 | 04A0 | 0000 | 0B00 | 6924 |
| 0001022660 | 5F38 | 7265 | 6472 | 7669 | 4530 | 04A0 | 0000 | 0A00 |
| 0001022700 | 5F5F | 7066 | 6973 | 6E67 | 6C61 | A012 | 0004 | 0000 |
| 0001022720 | 240B | 3469 | 655F | 7272 | 696D | 666E | A012 | 0004 |
| 0001022740 | 0000 | 240B | 3469 | 655F | 7272 | 6970 | 666E | A012 |
| 0001022760 | 0004 | 0000 | 240B | 3869 | 655F | 7272 | 696D | 666E |
| 0001023000 | A012 | 0004 | 0000 | 240B | 3869 | 655F | 7272 | 6970 |
| 0001023020 | 666E | A027 | 0004 | 0000 | 240C | 3869 | 655F | 7272 |
| 0001023040 | 7473 | 6361 | 206B | 04A0 | 0000 | 0C00 | 6924 | 5F34 |
| 0001023060 | 7265 | 6972 | 766E | 646C | A020 | 0004 | 0000 | 240C |
| 0001023100 | 3869 | 655F | 7272 | 6E69 | 6C76 | 5464 | 0979 | 0000 |
| 0001023120 | 0E00 | 5F5F | 616D | 6874 | 7265 | 5F72 | 6C66 | 6761 |
| 0001023140 | 794C | 0009 | 0000 | 5F05 | 5548 | 4547 | A0DA | 0004 |
| 0001023160 | 0000 | 5F0C | 635F | 7274 | 6E61 | 6964 | 7073 | 9631 |
| 0001023200 | 04A0 | 0000 | 0C00 | 5F5F | 7463 | 6172 | 646E | 7369 |
| 0001023220 | 3270 | A224 | 0004 | 0000 | 5F0E | 635F | 6E69 | 7274 |
| 0001023240 | 6E69 | 6964 | 7073 | E831 | 04A1 | 0000 | 0E00 | 5F5F |
| 0001023260 | 6963 | 746E | 6972 | 646E | 7369 | 3270 | A256 | 0004 |
| 0001023300 | 0000 | 5304 | 5251 | 5F54 | 04A2 | 0000 | 0A00 | 5F5F |

THU MAR 14 17:52:34 1991 TSLINT.DLL PAGE 287, LINE 16875

| | | | | | | | | |
|---|---|---|---|---|---|---|---|---|
| 0001023320 | 4661 | 4943 | 7173 | 7472 | A27A | 0004 | 0000 | 4C03 |
| 0001023340 | 474F | A29E | 0004 | 0000 | 4503 | 5058 | A283 | 0004 |
| 0001023360 | 0000 | 5F09 | 615F | 4346 | 6C49 | 676F | A268 | 0004 |
| 0001023400 | 0000 | 5003 | 574F | A2A7 | 0004 | 0000 | 5F09 | 615F |
| 0001023420 | 4346 | 6549 | 7078 | A271 | 0004 | 0000 | 5F09 | 615F |
| 0001023440 | 4346 | 7049 | 776F | A28C | 0004 | 0000 | 4C05 | 474F |
| 0001023460 | 3031 | A295 | 0004 | 0000 | 5F0B | 615F | 4346 | 6C49 |
| 0001023500 | 676F | 3031 | A2D4 | 0004 | 0000 | 5403 | 4E41 | A2C2 |
| 0001023520 | 0004 | 0000 | 4303 | 534F | A2B0 | 0004 | 0000 | 5303 |
| 0001023540 | 4E49 | A2DD | 0004 | 0000 | 5F09 | 615F | 4346 | 7449 |
| 0001023560 | 6E61 | A2CB | 0004 | 0000 | 5F09 | 615F | 4346 | 6349 |
| 0001023600 | 736F | A2B9 | 0004 | 0000 | 5F09 | 615F | 4346 | 7349 |
| 0001023620 | 6E69 | A30A | 0004 | 0000 | 4104 | 4154 | F84E | 04A2 |
| 0001023640 | 0000 | 0400 | 4341 | 534F | A2E6 | 0004 | 0000 | 4104 |
| 0001023660 | 4953 | 134E | 04A3 | 0000 | 0A00 | 5F5F | 4661 | 4943 |
| 0001023700 | 7461 | 6E61 | A301 | 0004 | 0000 | 5F0A | 615F | 4346 |
| 0001023720 | 6149 | 6F63 | EF73 | 04A2 | 0000 | 0A00 | 5F5F | 4661 |
| 0001023740 | 4943 | 7361 | 6E69 | A31C | 0004 | 0000 | 4105 | 4154 |
| 0001023760 | 324E | A325 | 0004 | 0000 | 5F0B | 615F | 4346 | 6149 |
| 0001024000 | 6174 | 326E | A353 | 0004 | 0000 | 5F08 | 665F | 746C |
| 0001024020 | 6E69 | 2E32 | 04A3 | 0000 | 0900 | 5F5F | 6C66 | 6974 |
| 0001024040 | 666E | E432 | 04A3 | 0000 | 0900 | 5F5F | 6C66 | 6F74 |
| 0001024060 | 7475 | 2432 | 04A4 | 0000 | 0B00 | 5F5F | 6F66 | 6372 |
| 0001024100 | 6564 | 7063 | 9474 | 04A4 | 0000 | 0B00 | 5F5F | 7263 |
| 0001024120 | 706F | 657A | 6F72 | 1273 | 04A5 | 0000 | 0A00 | 5F5F |
| 0001024140 | 6F70 | 6973 | 6974 | 6576 | A53A | 0004 | 0000 | 5F09 |
| 0001024160 | 665F | 7361 | 6973 | 6E67 | A6B6 | 0004 | 0000 | 5F07 |
| 0001024200 | 635F | 7466 | 656F | A85C | 0004 | 0000 | 5F07 | 635F |
| 0001024220 | 7466 | 666F | A8E4 | 0004 | 0000 | 5F07 | 635F | 7466 |
| 0001024240 | 676F | A9CC | 0004 | 0000 | 5F09 | 635F | 6C66 | 6374 |
| 0001024260 | 7476 | AA62 | 0004 | 0000 | 5F08 | 616D | 6874 | 7265 |
| 0001024300 | 9972 | 04AA | 0000 | 0400 | 4543 | 4C49 | AA72 | 0004 |
| 0001024320 | 0000 | 4605 | 4F4C | 524F | 0A01 | 7500 | 8380 | 0081 |
| 0001024340 | 0064 | 0183 | 0102 | 0001 | 0180 | 0001 | 0180 | 0001 |
| 0001024360 | 0180 | 0001 | 0180 | 0001 | 0180 | 0001 | 0180 | 0001 |
| * | | | | | | | | |
| 0001024560 | 0180 | 0001 | 0180 | 0001 | 0180 | 0001 | 0180 | 0005 |
| 0001024600 | 6878 | 8083 | 0100 | 0001 | 0180 | 0001 | 0180 | 0001 |
| 0001024620 | 0180 | 0001 | 0180 | 0001 | 0180 | 0001 | 0180 | 0001 |
| * | | | | | | | | |
| 0001027200 | 0180 | 0001 | 0180 | 0007 | 737A | C083 | 8200 | 0100 |
| 0001027220 | 0001 | 0180 | 0001 | 0180 | 0001 | 0180 | 0001 | 0180 |
| * | | | | | | | | |
| 0001027500 | 0001 | 0180 | 0001 | 0180 | 0007 | 737A | 9883 | 8203 |
| 0001027520 | 0100 | 000A | 8075 | 8183 | 6400 | 8300 | 0201 | 0101 |
| 0001027540 | 8000 | 0101 | 8000 | 0101 | 8000 | 0101 | 8000 | 0101 |
| * | | | | | | | | |
| 0001031300 | 8000 | 1601 | 7900 | 0330 | 7383 | 8304 | 0474 | 0A82 |
| 0001031320 | 7528 | 746E | 6761 | 6567 | 2964 | 0169 | 000A | 837F |
| 0001031340 | 0081 | 8183 | 8300 | 0081 | 1C01 | 7F00 | 0682 | 6170 |
| 0001031360 | 6B63 | 685F | 8200 | 6606 | 6C69 | 5F65 | 0268 | 0682 |
| 0001031400 | 7566 | 636E | 685F | 0104 | 0001 | 0180 | 0001 | 0180 |
| 0001031420 | 0001 | 0180 | 0001 | 0180 | 0001 | 0180 | 0001 | 0180 |
| * | | | | | | | | |
| 0001031620 | 0005 | 3878 | 8083 | 0100 | 0005 | 3078 | 8083 | 0100 |
| 0001031640 | 0001 | 0180 | 0001 | 0180 | 0001 | 0180 | 0001 | 0180 |
| 0001031660 | 0007 | 8578 | 0800 | 8083 | 0100 | 0001 | 0180 | 0001 |
| 0001031700 | 0180 | 0001 | 0180 | 0001 | 0180 | 0001 | 0180 | 0001 |
| * | | | | | | | | |

```
THU MAR 14 17:52:34 1991   TSLINT.DLL   PAGE 288, LINE 16934

0001032640   0180  0001  0180  0001  0180  0001  0180  0012
0001032660   6079  8305  051C  1D83  8205  5F06  6F69  7562
0001032700   6966  1001  7F00  C083  8300  0081  C083  8300
0001032720   0080  8083  0100  0027  827F  5F04  7470  0072
0001032740   0482  635F  746E  8204  5F05  6162  6573  8206
0001032760   5F05  6C66  6761  820A  5F05  6966  656C  010B
0001033000   0005  0078  1B83  0105  0007  737A  1B83  8205
0001033020   0100  0001  0180  0001  0180  0001  0180  0001
0001033040   0180  0001  0180  0001  0180  0001  0180  0001
*
0001033340   0180  0005  0078  8483  0100  0001  0180  0001
0001033360   0180  0001  0180  0001  0180  0001  0180  0001
*
0001033740   0180  0001  0180  0001  0180  001F  8579  0090
0001033760   8307  0596  9783  8205  7211  5F65  6170  7474
0001034000   7265  5F6E  7562  6666  7265  0169  0016  837F
0001034020   00C0  8183  8300  0081  C083  8300  00C0  8083
0001034040   8300  0080  5401  7F00  0682  7562  6666  7265
0001034060   8200  6109  6C6C  636F  7461  6465  8204  7504
0001034100   6573  0664  0782  6166  7473  616D  0870  0982
0001034120   7274  6E61  [illegible]  7461  0C65  1082  6166  7473
0001034140   616D  5F70  6361  7563  6172  6574  8210  630B
0001034160   6E61  625F  5F65  756E  6C6C  0111  0001  0180
0001034200   0001  0180  0001  0180  0001  0180  0001  0180
*
0001034260   0016  8579  00B0  8303  05C2  C383  8205  6508
0001034300   7078  6E5F  646F  6965  1801  7900  9085  0400
0001034320   C083  8305  05C1  0A82  7528  746E  6761  6567
0001034340   2964  0169  0018  8579  0090  8306  05B5  B683
0001034360   8205  280A  6E75  6174  6767  6465  6929  1601
0001034400   7900  0420  AA83  8305  05AB  0A82  7528  746E
0001034420   6761  6567  2964  0169  0007  737A  A583  8205
0001034440   0100  000D  837F  05A9  C083  8300  00C0  A983
0001034460   0105  0029  827F  6C04  7470  0072  0A82  6170
0001034500   6172  5F6D  616E  656D  8200  7206  7465  7865
0001034520   0074  0882  656E  7478  6F6E  6564  0100  0016
0001034540   2079  8306  05B3  B483  8205  280A  6E75  6174
0001034560   6767  6465  6929  0701  7A00  8373  05AE  0082
0001034600   0A01  7500  8380  05A9  0064  0183  0102  0007
0001034620   737A  9583  8205  0100  001B  6079  8303  05C4
0001034640   C583  8205  660F  726F  6C5F  6F6F  5F70  6568
0001034660   6461  7265  0169  0007  737A  B083  8205  0100
0001034700   0007  737A  A983  8205  0100  0013  837F  05A9
0001034720   AD83  8305  05AF  B183  8305  05B2  8183  0100
0001034740   0028  827F  7204  7470  0072  0482  7070  7274
0001034760   8200  7004  6572  0067  0282  6468  8200  6102
0001035000   0076  0582  5F72  6E65  0074  1301  7F00  A883
0001035020   8305  05AC  C083  8300  0081  8183  8300  0084
0001035040   2B01  7F00  0182  006C  0182  0472  0482  616E
0001035060   656D  8208  6E06  6D75  6562  0C72  0682  5F73
0001035100   696C  656E  820E  7206  6365  7361  1065  1801
0001035120   7900  8085  0400  B883  8305  05B9  0A82  7528
0001035140   746E  6761  6567  2964  0169  000D  837F  0089
0001035160   C083  8300  0081  8483  0100  001D  827F  6606
0001035200   746C  756E  006D  0282  7073  8208  7304  656C
0001035220   0C6E  0482  7273  6665  010E  0016  7079  8304
0001035240   05BB  BC83  8205  280A  6E75  6174  6767  6465
0001035260   6929  0D01  7F00  A983  8305  00C0  8183  8300
0001035300   05A9  2001  7F00  0482  656E  7478  8200  6E04
```

```
THU MAR 14 17:52:34 1991  TSLINT.DLL  PAGE 289, LINE 16993

0001035320  6D61  0465  0682  656C  676E  6874  8208  7605
0001035340  6C61  6575  010A  0016  6079  8303  05BE  BF83
0001035360  8205  280A  6E75  6174  6767  6465  6929  0A01
0001035400  7F00  A983  8305  05A9  A983  0105  0017  827F
0001035420  6E04  7865  0074  0482  616E  656D  8204  7605
0001035440  6C61  6575  0108  000D  837F  05A7  B783  8305
0001035460  05BA  BD83  0105  001E  827F  6E05  646F  7065
0001035500  8200  7603  6C61  8200  6804  7361  0068  0582
0001035520  6861  7361  0068  0A01  7F00  A683  8305  0081
0001035540  8483  0100  0016  827F  7303  6275  8200  7404
0001035560  7079  1265  0582  6C66  6761  1473  0A01  7F00
0001035600  A983  8305  05A9  A983  0105  0016  827F  6904
0001035620  696E  0074  0482  6F63  646E  8204  6904  636E
0001035640  0872  0101  8000  0101  8000  0101  8000  0101
0001035660  8000  0101  8000  0101  8000  0101  8000  0101
*
0001035740  8000  0701  7A00  8373  05A5  0082  0101  8000
0001035760  0101  8000  0101  8000  0101  8000  0101  8000
*
0001036400  0101  8000  0101  8000  0101  8000  0701  7800
0001036420  2085  8303  0080  0101  8000  0101  8000  0101
0001036440  8000  0101  8000  0101  8000  0101  8000  0101
*
0001036500  8000  0701  7800  A085  830C  05A9  0101  8000
0001036520  0101  8000  0101  8000  0101  8000  0101  8000
*
0001036620  0101  8000  0101  8000  0101  8000  0A01  7500
0001036640  8380  0081  0264  4183  0106  0007  837F  05A9
0001036660  B283  0105  000A  8075  8183  6400  8303  0643
0001036700  0A01  7F00  A983  8305  05B2  B283  0105  000A
0001036720  8075  8183  6400  8304  0645  0D01  7F00  A983
0001036740  8305  05B2  B283  8305  05B2  0101  8000  0101
0001036760  8000  0A01  7500  8380  05D6  0264  4983  0106
0001037000  0007  837F  00C0  A983  0105  0001  0180  0001
0001037020  0180  000A  8075  0083  6402  8300  0201  0501
0001037040  7800  8318  0080  0501  7800  8310  0080  0501
0001037060  7800  8320  0080  0501  7800  8348  0080  0501
0001037100  7800  8328  0080  0501  7800  8340  0080  0501
0001037120  7800  8358  0080  0A01  7500  8380  00C0  0064
0001037140  0183  0102  0004  837F  00C0  0A01  7500  8380
0001037160  0200  0164  5583  0106  0004  837F  05A9  0A01
0001037200  7500  8380  05D6  0164  5783  0106  0004  837F
0001037220  05A9  0A01  7500  8380  05D6  0164  5983  0106
0001037240  0004  837F  05A9  0A01  7500  8380  05D6  0164
0001037260  5B83  0106  0004  837F  05A9  0A01  7500  8380
0001037300  05D6  0164  5D83  0106  0004  837F  05A9  0A01
0001037320  7500  8380  05D6  0164  5F83  0106  0004  837F
0001037340  05A9  0A01  7500  8380  0200  0164  6183  0106
0001037360  000D  837F  0081  C083  8300  0081  A983  0105
0001037400  000A  8075  0083  6402  8304  0663  0401  7F00
0001037420  A983  0105  000A  8075  D683  6405  8301  0665
0001037440  0701  7800  5885  8301  0080  0401  7F00  A983
0001037460  0105  000A  8075  D683  6405  8301  0668  0701
0001037500  7800  8885  8300  0080  0701  7800  8885  8300
0001037520  0080  0501  7800  8310  0080  0701  7800  F085
0001037540  8300  0080  0401  7F00  A983  0105  000A  8075
0001037560  D683  6405  8301  066E  0401  7F00  A983  0105
0001037600  000A  8075  D683  6405  8301  0670  0401  7F00
0001037620  A983  0105  000A  8075  D683  6405  8301  0672
```

THU MAR 14 17:52:34 1991 TSLINT.DLL PAGE 290, LINE 17052

| | | | | | | | | |
|---|---|---|---|---|---|---|---|---|
| 0001037640 | 0401 | 7F00 | A983 | 0105 | 000A | 8075 | 0083 | 6402 |
| 0001037660 | 8301 | 0674 | 0701 | 7800 | E085 | 8300 | 0080 | 0701 |
| 0001037700 | 7800 | 8085 | 8300 | 0080 | 0401 | 7F00 | A983 | 0105 |
| 0001037720 | 000A | 8075 | D683 | 6405 | 8301 | 0678 | 0401 | 7F00 |
| 0001037740 | A983 | 0105 | 000A | 8075 | D683 | 6405 | 8301 | 067A |
| 0001037760 | 0701 | 7F00 | A983 | 8305 | 05B2 | 0A01 | 7500 | 8380 |
| 0001040000 | 0081 | 0264 | 7C83 | 0106 | 000A | 837F | 05A9 | B283 |
| 0001040020 | 8305 | 05B2 | 0A01 | 7500 | 8380 | 0081 | 0364 | 7E83 |
| 0001040040 | 0106 | 000D | 837F | 05A9 | B283 | 8305 | 05B2 | B283 |
| 0001040060 | 0105 | 000A | 8075 | 8183 | 6400 | 8304 | 0680 | 1001 |
| 0001040100 | 7F00 | A983 | 8305 | 05B2 | B283 | 8305 | 05B2 | B283 |
| 0001040120 | 0105 | 000A | 8075 | 8183 | 6400 | 8305 | 0682 | 0D01 |
| 0001040140 | 7F00 | A983 | 8305 | 05B2 | B283 | 8305 | 05B2 | 0A01 |
| 0001040160 | 7500 | 8380 | 0081 | 0464 | 8483 | 0106 | 0007 | 837F |
| 0001040200 | 05A9 | 1F83 | 0105 | 000A | 8075 | 0083 | 6402 | 8302 |
| 0001040220 | 0686 | 0101 | 8000 | 0501 | 7800 | 8360 | 0082 | 0401 |
| 0001040240 | 7F00 | A983 | 0105 | 000A | 8075 | D683 | 6405 | 8301 |
| 0001040260 | 068A | 0401 | 7F00 | A983 | 0105 | 000A | 8075 | D683 |
| 0001040300 | 6405 | 8301 | 068C | 0401 | 7F00 | A983 | 0105 | 000A |
| 0001040320 | 8075 | D683 | 6405 | 8301 | 068E | 0401 | 7F00 | A983 |
| 0001040340 | 0105 | 000A | 8075 | D683 | 6405 | 8301 | 0690 | 0401 |
| 0001040360 | 7F00 | A983 | 0105 | 000A | 8075 | D683 | 6405 | 8301 |
| 0001040400 | 0692 | 0701 | 7F00 | C083 | 8300 | 05A9 | 0A01 | 7500 |
| 0001040420 | 8380 | 05D6 | 0264 | 9483 | 0106 | 000D | 837F | 0081 |
| 0001040440 | 8183 | 8300 | 00C0 | 6883 | 0103 | 000A | 8075 | 0083 |
| 0001040460 | 6402 | 8304 | 0696 | 0401 | 7F00 | A983 | 0105 | 000A |
| 0001040500 | 8075 | D683 | 6405 | 8301 | 0698 | 0501 | 7800 | 8340 |
| 0001040520 | 0080 | 0701 | 7800 | 3085 | 8301 | 0080 | 0401 | 7F00 |
| 0001040540 | A983 | 0105 | 000A | 8075 | D683 | 6405 | 8301 | 069C |
| 0001040560 | 0501 | 7800 | 8348 | 0080 | 0701 | 7800 | 3885 | 8301 |
| 0001040600 | 0080 | 0701 | 7800 | 9085 | 8300 | 0080 | 0401 | 7F00 |
| 0001040620 | A983 | 0105 | 000A | 8075 | D683 | 6405 | 8301 | 06A1 |
| 0001040640 | 0701 | 7800 | B085 | 8300 | 0080 | 0701 | 7800 | B085 |
| 0001040660 | 8300 | 0080 | 0701 | 7800 | B885 | 8301 | 0080 | 0701 |
| 0001040700 | 7800 | D885 | 8300 | 0080 | 0401 | 7F00 | A983 | 0105 |
| 0001040720 | 000A | 8075 | D683 | 6405 | 8301 | 06A7 | 0101 | 8000 |
| 0001040740 | 0701 | 7800 | A085 | 8300 | 0080 | 0701 | 7800 | 9085 |
| 0001040760 | 8301 | 0080 | 0701 | 7800 | 2885 | 8301 | 0080 | 0401 |
| 0001041000 | 7F00 | A983 | 0105 | 000A | 8075 | D683 | 6405 | 8301 |
| 0001041020 | 06AD | 0401 | 7F00 | A983 | 0105 | 000A | 8075 | D683 |
| 0001041040 | 6405 | 8301 | 06AF | 0701 | 7800 | 8085 | 8300 | 0080 |
| 0001041060 | 0701 | 7800 | 8085 | 8301 | 0080 | 0701 | 7800 | 1885 |
| 0001041100 | 8301 | 0080 | 0401 | 7F00 | A983 | 0105 | 000A | 8075 |
| 0001041120 | D683 | 6405 | 8301 | 06B4 | 0401 | 7F00 | A983 | 0105 |
| 0001041140 | 000A | 8075 | D683 | 6405 | 8301 | 06B6 | 0401 | 7F00 |
| 0001041160 | A983 | 0105 | 000A | 8075 | D683 | 6405 | 8301 | 06B8 |
| 0001041200 | 0401 | 7F00 | 8583 | 0100 | 000A | 8075 | 0083 | 7302 |
| 0001041220 | 8301 | 06BA | 0401 | 7F00 | C083 | 0100 | 000A | 8075 |
| 0001041240 | 0083 | 6402 | 8301 | 06BC | 0401 | 7F00 | A983 | 0105 |
| 0001041260 | 000A | 8075 | D683 | 6405 | 8301 | 06BE | 0701 | 7800 |
| 0001041300 | 7085 | 8301 | 0080 | 0701 | 7800 | E885 | 8300 | 0080 |
| 0001041320 | 0401 | 7F00 | A983 | 0105 | 000A | 8075 | D683 | 6405 |
| 0001041340 | 8301 | 06C2 | 0701 | 7800 | D085 | 8300 | 0080 | 0401 |
| 0001041360 | 7F00 | A983 | 0105 | 000A | 8075 | D683 | 6405 | 8301 |
| 0001041400 | 06C5 | 0101 | 8000 | 0501 | 7800 | 8370 | 0080 | 0701 |
| 0001041420 | 7800 | 6885 | 8301 | 0080 | 0701 | 7800 | 9885 | 8300 |
| 0001041440 | 0080 | 0401 | 7F00 | A983 | 0105 | 000A | 8075 | D683 |
| 0001041460 | 6405 | 8301 | 06CB | 0701 | 7800 | 7885 | 8301 | 0080 |
| 0001041500 | 0701 | 7800 | A885 | 8300 | 0080 | 0401 | 7F00 | A983 |

```
THU MAR 14 17:52:34 1991  TSLINT.DLL  PAGE 291, LINE 17111

0001041520  0105  000A  8075  D683  6405  8301  06CF  0701
0001041540  7800  C885  8300  0080  0401  7F00  A983  0105
0001041560  000A  8075  D683  6405  8301  06D2  0701  7800
0001041600  9885  8300  0080  0701  7800  C085  8300  0080
0001041620  0401  7F00  A983  0105  000A  8075  D683  6405
0001041640  8301  06D6  0501  7800  8350  0080  0401  7F00
0001041660  A983  0105  000A  8075  D683  6405  8301  06D9
0001041700  0501  7800  8350  0080  0401  7F00  A983  0105
0001041720  000A  8075  D683  6405  8301  06DC  0401  7F00
0001041740  A983  0105  000A  8075  D683  6405  8301  06DE
0001041760  0401  7F00  A983  0105  000A  8075  D683  6405
0001042000  8301  06E0  0401  7F00  A983  0105  000A  8075
0001042020  D683  6405  8301  06E2  0401  7F00  C083  0100
0001042040  000A  8075  D683  6405  8301  06E4  0701  7800
0001042060  9085  8300  0080  0101  8000  0101  8000  0701
0001042100  7A00  8373  0203  0082  0A01  7500  8380  0081
0001042120  0064  0183  0102  0001  0180  0001  0180  0001
0001042140  0180  0001  0180  0001  0180  0001  0180  0001
*
0001047120  0180  001F  8579  0090  8307  0484  8583  8204
0001047140  7211  5F65  6170  7474  7265  5F6E  7562  6666
0001047160  7265  0169  0016  837F  00C0  8183  8300  0081
0001047200  C083  8300  00C0  8083  8300  0080  5401  7F00
0001047220  0682  7562  6666  7265  8200  6109  6C6C  636F
0001047240  7461  6465  8204  7504  6573  0664  0782  6166
0001047260  7473  616D  0870  0982  7274  6E61  6C73  7461
0001047300  0C65  1082  6166  7473  616D  5F70  6361  7563
0001047320  6172  6574  8210  630B  6E61  625F  5F65  756E
0001047340  6C6C  0111  001A  8579  0140  8302  0488  8983
0001047360  8204  720C  5F65  6572  6967  7473  7265  6973
0001047400  0701  7800  A085  8300  0081  0701  7F00  8783
0001047420  8304  0487  0F01  7F00  0582  7473  7261  0074
0001047440  0382  6E65  1464  0101  8000  0101  8000  0101
0001047460  8000  0101  8000  0101  8000  0101  8000  0101
0001047500  8000  0101  8000  0101  8000  1601  7900  B085
0001047520  0300  B083  8304  04B1  0882  7865  5F70  6F6E
0001047540  6564  0169  0018  8579  0090  8304  04AE  AF83
0001047560  8204  280A  6E75  6174  6767  6465  6929  1801
0001047600  7900  9085  0600  A383  8304  04A4  0A82  752B
0001047620  746E  6761  6567  2964  0169  0016  2079  8304
0001047640  0498  9983  8204  280A  6E75  6174  6767  6465
0001047660  6929  0701  7A00  8373  0493  0082  0D01  7F00
0001047700  9783  8304  00C0  C083  8300  0497  2901  7F00
0001047720  0482  706C  7274  8200  700A  7261  6D61  6E5F
0001047740  6D61  0065  0682  6572  6574  7478  8200  6E08
0001047760  7865  6E74  646F  0065  1601  7900  0620  A183
0001050000  8304  04A2  0A82  7528  746E  6761  6567  2964
0001050020  0169  0007  737A  9C83  8204  0100  000A  8075
0001050040  9783  6404  8300  0201  0701  7A00  8373  0483
0001050060  0082  1B01  7900  0360  B283  8304  04B3  0F82
0001050100  6F66  5F72  6F6C  706F  685F  6165  6564  6972
0001050120  0701  7A00  8373  049E  0082  0701  7A00  8373
0001050140  0497  0082  1301  7F00  9783  8304  049B  9D83
0001050160  8304  049F  A083  8304  0081  2801  7F00  0482
0001050200  7072  7274  8200  7004  7470  0072  0482  7270
0001050220  6765  8200  6802  0064  0282  7661  8200  7205
0001050240  655F  746E  0100  0013  837F  0496  9A83  8304
0001050260  00C0  8183  8300  0081  8483  0100  002B  827F
0001050300  6C01  8200  7201  8204  6E04  6D61  0865  0682
```

THU MAR 14 17:52:34 1991 TSLINT.DLL PAGE 292, LINE 17170

```
0001050320  756E  626D  7265  820C  7306  6C5F  6E69  0E65
0001050340  0682  6572  6163  6573  0110  0018  8579  0080
0001050360  8304  04A6  A783  8204  280A  6E75  6174  6767
0001050400  6465  6929  0D01  7F00  8983  8300  00C0  8183
0001050420  8300  0084  1D01  7F00  0682  6C66  6E74  6D75
0001050440  8200  7302  0870  0482  6C73  6E65  820C  7304
0001050460  6572  0E66  1601  7900  0470  A983  8304  04AA
0001050500  0A82  7528  746E  6761  6567  2964  0169  000D
0001050520  837F  0497  C083  8300  0081  9783  0104  0020
0001050540  827F  6E04  7865  0074  0482  616E  656D  8204
0001050560  6C06  6E65  7467  0868  0582  6176  756C  0A65
0001050600  1601  7900  0360  AC83  8304  04AD  0A82  7528
0001050620  746E  6761  6567  2964  0169  000A  837F  0497
0001050640  9783  8304  0497  1701  7F00  0482  656E  7478
0001050660  8200  6E04  6D61  0465  0582  6176  756C  0865
0001050700  0D01  7F00  9583  8304  04A5  A883  8304  04AB
0001050720  1E01  7F00  0582  6F6E  6564  0070  0382  6176
0001050740  006C  0482  6168  6873  8200  6105  6168  6873
0001050760  0100  000A  837F  0494  8183  8300  0084  1601
0001051000  7F00  0382  7573  0062  0482  7974  6570  8212
0001051020  6605  616C  7367  0114  000A  837F  0497  9783
0001051040  8304  0497  1601  7F00  0482  6E69  7469  8200
0001051060  6304  6E6F  0464  0482  6E69  7263  0108  0001
0001051100  0180  0001  0180  0001  0180  0001  0180  0001
*
0001051160  0180  0001  0180  0001  0180  0001  0180  0007
0001051200  737A  9383  8204  0100  0001  0180  0001  0180
0001051220  0001  0180  0001  0180  0001  0180  0001  0180
*
0001051640  0001  0180  0001  0180  0001  0180  0016  3079
0001051660  8303  050F  1083  8205  280A  6E75  6174  6767
0001051700  6465  6929  0A01  7F00  8183  8300  0081  8183
0001051720  0100  001C  827F  7006  6361  5F6B  0068  0682
0001051740  6966  656C  685F  8202  6606  6E75  5F63  0468
0001051760  0101  8000  0101  8000  0101  8000  0101  8000
*
0001052160  0501  7800  8338  0080  0501  7800  8330  0080
0001052200  0101  8000  0101  8000  0101  8000  0101  8000
*
0001052360  0701  7800  9085  8300  0081  0701  7800  A085
0001052400  830C  0497  0101  8000  0101  8000  0101  8000
0001052420  0101  8000  0101  8000  0101  8000  0101  8000
*
0001052460  0101  8000  0701  7F00  9783  8304  0497  0A01
0001052500  7500  8380  04C4  0264  5D83  0105  0001  0180
0001052520  0005  5078  8083  0100  0005  6078  8283  0100
0001052540  0007  8578  00F0  8083  0100  0005  4878  8083
0001052560  0100  0007  8578  00A0  8083  0100  0007  8578
0001052600  00B8  8083  0100  0005  7878  8083  0100  0005
0001052620  7078  8083  0100  0007  8578  0100  8083  0100
0001052640  0004  837F  0497  0A01  7500  8380  04C4  0164
0001052660  6983  0105  0007  8578  00E0  8083  0100  0007
0001052700  8578  0080  8083  0100  0004  837F  0497  0A01
0001052720  7500  8380  04C4  0164  6D83  0105  0005  3878
0001052740  8083  0100  000A  8075  8183  6400  8300  0201
0001052760  0101  8000  0701  7A00  8373  0203  0082  0A01
0001053000  7500  8380  0081  0064  0183  0102  0001  0180
0001053020  0001  0180  0001  0180  0001  0180  0001  0180
*
```

```
THU MAR 14 17:52:34 1991  TSLINT.DLL  PAGE 293, LINE 17229

0001054000  0001  0180  0001  0180  0001  0180  0005  6878
0001054020  8083  0100  0001  0180  0001  0180  0001  0180
0001054040  0001  0180  0001  0180  0001  0180  0001  0180
*
0001057600  0001  0180  001F  8579  0090  8307  0462  6383
0001057620  8204  7211  5F65  6170  7474  7265  5F6E  7562
0001057640  6666  7265  0169  0016  837F  00C0  8183  8300
0001057660  0081  C083  8300  00C0  8083  8300  0080  5401
0001057700  7F00  0682  7562  6666  7265  8200  6109  6C6C
0001057720  636F  7461  6465  8204  7504  6573  0664  0782
0001057740  6166  7473  616D  0870  0982  7274  6E61  6C73
0001057760  7461  0C65  1082  6166  7473  616D  5F70  6361
0001060000  7563  6172  6574  8210  630B  6E61  625F  5F65
0001060020  756E  6C6C  0111  0001  0180  0001  0180  0001
0001060040  0180  0001  0180  0001  0180  0001  0180  0001
*
0001060100  0180  0001  0180  0001  0180  0016  8579  00B0
0001060120  8303  048E  8F83  8204  6508  7078  6E5F  646F
0001060140  6965  1801  7900  9085  0400  8C83  8304  048D
0001060160  0A82  7528  746E  6761  6567  2964  0169  0018
0001060200  8579  0090  8306  0481  8283  8204  280A  6E75
0001060220  6174  6767  6465  6929  1601  7900  0420  7683
0001060240  8304  0477  0A82  7528  746E  6761  6567  2964
0001060260  0169  0007  737A  7183  8204  0100  000D  837F
0001060300  0475  C083  8300  00C0  7583  0104  0029  827F
0001060320  6C04  7470  0072  0A82  6170  6172  5F6D  616E
0001060340  656D  8200  7206  7465  7865  0074  0882  656E
0001060360  7478  6F6E  6564  0100  0016  2079  8306  047F
0001060400  8083  8204  280A  6E75  6174  6767  6465  6929
0001060420  0701  7A00  8373  047A  0082  0A01  7500  8380
0001060440  0475  0064  0183  0102  0007  737A  6183  8204
0001060460  0100  001B  6079  8303  0490  9183  8204  660F
0001060500  726F  6C5F  6F6F  5F70  6568  6461  7265  0169
0001060520  0007  737A  7C83  8204  0100  0007  737A  7583
0001060540  8204  0100  0013  837F  0475  7983  8304  047B
0001060560  7D83  8304  047E  8183  0100  0028  827F  7204
0001060600  7470  0072  0482  7070  7274  8200  7004  6572
0001060620  0067  0282  6468  8200  6102  0076  0582  5F72
0001060640  6E65  0074  1301  7F00  7483  8304  0478  C083
0001060660  8300  0081  8183  8300  0084  2B01  7F00  0182
0001060700  006C  0182  0472  0482  616E  656D  8208  6E06
0001060720  6D75  6562  0C72  0682  5F73  696C  656E  820E
0001060740  7206  6365  7361  1065  1801  7900  8085  0400
0001060760  8483  8304  0485  0A82  7528  746E  6761  6567
0001061000  2964  0169  000D  837F  0089  C083  8300  0081
0001061020  8483  0100  001D  827F  6606  746C  756E  006D
0001061040  0282  7073  8208  7304  656C  0C6E  0482  7273
0001061060  6665  010E  0016  7079  8304  0487  8883  8204
0001061100  280A  6E75  6174  6767  6465  6929  0D01  7F00
0001061120  7583  8304  00C0  8183  8300  0475  2001  7F00
0001061140  0482  656E  7478  8200  6E04  6D61  0465  0682
0001061160  656C  676E  6874  8208  7605  6C61  6575  010A
0001061200  0016  6079  8303  048A  8B83  8204  280A  6E75
0001061220  6174  6767  6465  6929  0A01  7F00  7583  8304
0001061240  0475  7583  0104  0017  827F  6E04  7865  0074
0001061260  0482  616E  656D  8204  7605  6C61  6575  0108
0001061300  000D  837F  0473  8383  8304  0486  8983  0104
0001061320  001E  827F  6E05  646F  7065  8200  7603  6C61
0001061340  8200  6804  7361  0068  0582  6861  7361  0068
```

```
THU MAR 14 17:52:34 1991  TSLINT.DLL  PAGE 294, LINE 17288

0001061360  0A01  7F00  7283  8304  0081  8483  0100  0016
0001061400  827F  7303  6275  8200  7404  7079  1265  0582
0001061420  6C66  6761  1473  0A01  7F00  7583  8304  0475
0001061440  7583  0104  0016  827F  6904  696E  0074  0482
0001061460  6F63  646E  8204  6904  636E  0872  1201  7900
0001061500  0470  9383  8304  0494  0682  6573  7261  6863
0001061520  0169  000D  837F  0081  7E83  8304  0475  7583
0001061540  0104  0027  827F  6E07  6D75  656C  7466  8200
0001061560  6107  7272  705F  7274  8202  6206  6375  656B
0001061600  0674  0682  6572  7674  6C61  010A  0001  0180
0001061620  0001  0180  0001  0180  0001  0180  0001  0180
*
0001061700  0007  737A  7183  8204  0100  0001  0180  0001
0001061720  0180  0001  0180  0001  0180  0001  0180  0001
*
0001062120  0180  0001  0180  0007  737A  9283  8204  0100
0001062140  0001  0180  0001  0180  0001  0180  0001  0180
*
0001062360  0001  0180  0016  3079  8303  04ED  EE83  8204
0001062400  280A  6E75  6174  6767  6465  6929  0A01  7F00
0001062420  8183  8300  0081  8183  0100  001C  827F  7006
0001062440  6361  5F6B  0068  0682  6966  656C  685F  8202
0001062460  6606  6E75  5F63  0468  0101  8000  0101  8000
0001062500  0101  8000  0101  8000  0101  8000  0101  8000
*
0001062660  0101  8000  0101  8000  0501  7800  8338  0080
0001062700  0501  7800  8330  0080  0701  7800  A085  830C
0001062720  0475  0101  8000  0101  8000  0101  8000  0101
0001062740  8000  0101  8000  0101  8000  0101  8000  0101
*
0001063020  8000  0101  8000  0501  7800  8368  0080  0501
0001063040  7800  8320  0080  0501  7800  8328  0080  0501
0001063060  7800  8350  0080  0501  7800  8318  0080  0501
0001063100  7800  8340  0080  0501  7800  8358  0080  0501
0001063120  7800  8360  0080  0501  7800  8348  0080  0501
0001063140  7800  8378  0080  0501  7800  8370  0080  0501
0001063160  7800  8310  0080  0701  7800  2085  830A  00C0
0001063200  0401  7F00  7583  0104  000A  8075  0083  6402
0001063220  8301  0530  0501  7800  8330  0080  0501  7800
0001063240  8360  0082  0A01  7500  8380  0200  0064  0183
0001063260  0102  0004  837F  0475  0A01  7500  8380  0200
0001063300  0164  3583  0105  0001  0180  0007  8578  0088
0001063320  8083  0100  0007  8578  0080  8083  0100  0005
0001063340  0878  8083  0100  0007  8578  00C0  8083  0100
0001063360  000A  8075  0083  6402  8300  0201  0501  7800
0001063400  8350  0080  0701  7800  9085  8300  0080  0701
0001063420  7800  B085  8300  0080  0101  8000  0101  8000
0001063440  0701  7F00  C083  8300  0081  0A01  7500  8380
0001063460  0200  0264  4283  0105  0004  837F  0475  0A01
0001063500  7500  8380  0200  0164  4483  0105  0004  837F
0001063520  0475  0A01  7500  8380  0200  0164  4683  0105
0001063540  0004  837F  0475  0A01  7500  8380  0200  0164
0001063560  4883  0105  0007  8578  0080  8083  0100  000A
0001063600  8075  A283  6404  8300  0201  0A01  7500  8380
0001063620  04A2  0064  0183  0102  000A  8075  8183  6400
0001063640  8300  0201  0101  8000  0701  7A00  8373  0203
0001063660  0082  0A01  7500  8380  0081  0064  0183  0102
0001063700  0001  0180  0001  0180  0001  0180  0001  0180
*
```

```
THU MAR 14 17:52:34 1991  TSLINT.DLL  PAGE 295, LINE 17347

0001063740  0005  0078  C083  0100  0001  0180  0001  0180
0001063760  0001  0180  0007  737A  C083  8200  0100  0001
0001064000  0180  0001  0180  0001  0180  0001  0180  0001
*
0001064340  0180  0001  0180  0001  0180  000A  8075  8183
0001064360  6400  8300  0201  0101  8000  0101  8000  0101
0001064400  8000  0101  8000  0101  8000  0101  8000  0101
*
0001064720  8000  0101  8000  1201  7900  0560  8683  8302
0001064740  0287  0682  695F  626F  6675  0169  0010  837F
0001064760  00C0  8183  8300  00C0  8083  8300  0080  2701
0001065000  7F00  0482  705F  7274  8200  5F04  6E63  0474
0001065020  0582  625F  7361  0665  0582  665F  616C  0A67
0001065040  0582  665F  6C69  0B65  0501  7800  8300  0285
0001065060  0701  7A00  8373  0285  0082  0101  8000  0101
0001065100  8000  0101  8000  0101  8000  0101  8000  0101
*
0001065540  8000  1601  7900  0330  D583  8302  02D6  0A82
0001065560  7528  746E  6761  6567  2964  0169  000A  837F
0001065600  0081  8183  8300  0081  1C01  7F00  0682  6170
0001065620  6B63  685F  8200  6606  6C69  5F65  0268  0682
0001065640  7566  636E  685F  0104  0001  0180  0001  0180
0001065660  0001  0180  0001  0180  0001  0180  0001  0180
*
0001066000  0001  0180  0007  737A  EF83  8202  0100  000A
0001066020  8075  0083  6402  8300  0201  0101  8000  0101
0001066040  8000  0101  8000  0101  8000  0101  8000  0101
0001066060  8000  0101  8000  0101  8000  0101  8000  0501
0001066100  7800  8338  0080  0501  7800  8330  0080  0101
0001066120  8000  0101  8000  0101  8000  0101  8000  0101
*
0001066340  8000  0501  7800  8368  0080  0101  8000  0101
0001066360  8000  0101  8000  0101  8000  0101  8000  0501
0001066400  7800  8308  0080  0101  8000  0101  8000  0101
0001066420  8000  0101  8000  0101  8000  0101  8000  0101
*
0001066660  8000  0101  8000  0101  8000  0501  7800  8360
0001066700  0080  0101  8000  0101  8000  0101  8000  0101
0001066720  8000  0101  8000  0101  8000  0101  8000  0101
*
0001071300  8000  0101  8000  0101  8000  0101  8000  1201
0001071320  7900  F085  0B00  9983  8304  049A  0482  7473
0001071340  7461  0169  0022  837F  0081  8583  8300  0085
0001071360  8183  8300  0081  8183  8300  0081  8283  8300
0001071400  0082  8283  8300  0082  6F01  7F00  0682  7473
0001071420  645F  7665  8200  7306  5F74  6E69  026F  0782
0001071440  7473  6D5F  646F  0465  0882  7473  6E5F  696C
0001071460  6B6E  8206  7306  5F74  6975  0864  0682  7473
0001071500  675F  6469  820A  7307  5F74  6472  7665  820C
0001071520  7307  5F74  6973  657A  820E  7308  5F74  7461
0001071540  6D69  1265  0882  7473  6D5F  6974  656D  8216
0001071560  7308  5F74  7463  6D69  1A65  0101  8000  0101
0001071600  8000  0101  8000  0101  8000  0101  8000  0101
*
0001072120  8000  0101  8000  0101  8000  1F01  7900  9085
0001072140  0700  D483  8304  04D5  1182  6572  705F  7461
0001072160  6574  6E72  625F  6675  6566  6972  1601  7F00
0001072200  C083  8300  0081  8183  8300  00C0  C083  8300
0001072220  0080  8083  0100  0054  827F  6206  6675  6566
```

```
THU MAR 14 17:52:34 1991  TSLINT.DLL  PAGE 296, LINE 17406

0001072240   0072  0982  6C61  6F6C  6163  6574  0464  0482
0001072260   7375  6465  8206  6607  7361  6D74  7061  8208
0001072300   7409  6172  736E  616C  6574  820C  6610  7361
0001072320   6D74  7061  615F  6363  7275  7461  1065  0B82
0001072340   6163  5F6E  6562  6E5F  6C75  116C  1A01  7900
0001072360   4085  0201  D883  8304  04D9  0C82  6572  725F
0001072400   6765  7369  6574  7372  0169  0007  8578  00A0
0001072420   8183  0100  0007  837F  04D7  D783  0104  000F
0001072440   827F  7305  6174  7472  8200  6503  646E  0114
0001072460   0001  0180  0001  0180  0001  0180  0001  0180
*
0001072520   0001  0180  0016  8579  00B0  8303  0500  0183
0001072540   8205  6508  7078  6E5F  646F  6965  1801  7900
0001072560   9085  0400  FE83  8304  04FF  0A82  7528  746E
0001072600   6761  6567  2964  0169  0018  8579  0090  8306
0001072620   04F3  F483  8204  280A  6E75  6174  6767  6465
0001072640   6929  1601  7900  0420  E883  8304  04E9  0A82
0001072660   7528  746E  6761  6567  2964  0169  0007  737A
0001072700   E383  8204  0100  000D  837F  04E7  C083  8300
0001072720   00C0  E783  0104  0029  827F  6C04  7470  0072
0001072740   0A82  6170  6172  5F6D  616E  656D  8200  7206
0001072760   7465  7865  0074  0882  656E  7478  6F6E  6564
0001073000   0100  0016  2079  8306  04F1  F283  8204  280A
0001073020   6E75  6174  6767  6465  6929  0701  7A00  8373
0001073040   04EC  0082  0A01  7500  8380  04E7  0064  0183
0001073060   0102  0007  737A  D383  8204  0100  001B  6079
0001073100   8303  0502  C383  8205  660F  726F  6C5F  6F6F
0001073120   5F70  6568  6461  7265  0169  0007  737A  EE83
0001073140   8204  0100  0007  737A  E783  8204  0100  0013
0001073160   837F  04E7  EB83  8304  04ED  EF83  8304  04F0
0001073200   8183  0100  0028  827F  7204  7470  0072  0482
0001073220   7070  7274  8200  7004  6572  0067  0282  6468
0001073240   8200  6102  0076  0582  5F72  6E65  0074  1301
0001073260   7F00  E683  8304  04EA  C083  8300  0081  8183
0001073300   8300  0084  2B01  7F00  0182  006C  0182  0472
0001073320   0482  616E  656D  8208  6E06  6D75  6562  0C72
0001073340   0682  5F73  696C  656E  820E  7206  6365  7361
0001073360   1065  1801  7900  8085  0400  F683  8304  04F7
0001073400   0A82  7528  746E  6761  6567  2964  0169  00UD
0001073420   837F  0089  C083  8300  0081  8483  0100  001D
0001073440   827F  6606  746C  756E  006D  0282  7073  8208
0001073460   7304  656C  0C6E  0482  7273  6665  010E  0016
0001073500   7079  8304  04F9  FA83  8204  280A  6E75  6174
0001073520   6767  6465  6929  0D01  7F00  E783  8304  00C0
0001073540   8183  8300  04E7  2001  7F00  0482  656E  7478
0001073560   8200  6E04  6D61  0465  0682  656C  676E  6874
0001073600   8208  7605  6C61  6575  010A  0016  6079  8303
0001073620   04FC  FD83  8204  280A  6E75  6174  6767  6465
0001073640   6929  0A01  7F00  E783  8304  04E7  E783  0104
0001073660   0017  827F  6E04  7865  0074  0482  616E  656D
0001073700   8204  7605  6C61  6575  0108  000D  837F  04E5
0001073720   F583  8304  04F8  FB83  0104  001E  827F  6E05
0001073740   646F  7065  8200  7603  6C61  8200  6804  7361
0001073760   0068  0582  6861  7361  0068  0A01  7F00  E483
0001074000   8304  0081  8483  0100  0016  827F  7303  6275
0001074020   8200  7404  7079  1265  0582  6C66  6761  1473
0001074040   0A01  7F00  E783  8304  04E7  E783  0104  0016
0001074060   827F  6904  696E  0074  0482  6F63  646E  8204
0001074100   6904  636E  0872  0101  8000  0101  8000  0101
```

```
THU MAR 14 17:52:34 1991  TSLINT.DLL  PAGE 297, LINE 17465

0001074120  8000  1301  7900  A085  0700  0883  8305  0509
0001074140  0582  6F69  7562  6966  1601  7F00  8183  8300
0001074160  00C0  C083  8300  0081  8183  8300  00C0  8183
0001074200  0100  0031  827F  6602  0064  0382  7562  0266
0001074220  0382  666F  0666  0482  6973  657A  820A  6303
0001074240  746E  820C  7306  6365  7562  0E66  0682  6573
0001074260  7363  7A69  0112  0016  8579  00D0  8307  050D
0001074300  0E83  8205  7208  6465  7269  6365  6974  0701
0001074320  7A00  8373  0507  0082  0701  7A00  8373  050A
0001074340  0082  1601  7F00  8183  8300  00C0  8983  8302
0001074360  050B  8283  8300  050C  0C83  0105  0032  827F
0001074400  6604  616C  0067  0582  6176  756C  0265  0282
0001074420  7066  8206  6903  706F  820A  6F06  6666  6573
0001074440  0E74  0482  7270  7665  8212  6E04  7865  1674
0001074460  0501  7800  8300  0080  0101  8000  0101  8000
0001074500  0101  8000  0101  8000  0701  7A00  8373  04E3
0001074520  0082  0101  8000  0101  8000  0101  8000  0101
0001074540  8000  0101  6000  0101  8000  0101  8000  0101
*
0001074600  8000  0101  8000  0701  7A00  8373  0514  0082
0001074620  0101  8000  0101  8000  0101  8000  0101  8000
0001074640  0101  8000  0101  8000  0701  7A00  8373  050A
0001074660  0082  0101  8000  0101  8000  0101  8000  0101
0001074700  8000  0101  8000  0101  8000  0101  8000  0101
*
0001075020  8000  0101  8000  0701  7A00  8373  04D6  0082
0001075040  0101  8000  0101  8000  0101  8000  0101  8000
*
0001075320  0101  8000  0101  8000  0101  8000  0501  7800
0001075340  8308  0080  0501  7800  8310  0080  0101  8000
0001075360  0101  8000  0101  8000  0101  8000  0101  8000
0001075400  0101  8000  0A01  7500  8380  0081  0464  7C83
0001075420  0105  000D  837F  00C0  8183  8300  00C0  4383
0001075440  0105  000A  8075  7E83  6405  8300  0201  0701
0001075460  7A00  8373  0507  0082  0A01  7500  8380  057E
0001075500  0164  8083  0105  0004  837F  0081  0A01  7500
0001075520  8380  0200  0164  8283  0105  0004  837F  050B
0001075540  0A01  7500  8380  0081  0164  8483  0105  0004
0001075560  837F  050C  0A01  7500  8380  0200  0064  0183
0001075600  0102  0001  0180  0005  2078  8083  0100  0005
0001075620  6078  8283  0100  0005  7878  8083  0100  0005
0001075640  4878  8083  0100  0005  7078  8083  0100  000D
0001075660  837F  0081  C083  8300  0081  E783  0104  000A
0001075700  8075  0083  6402  8304  058C  0101  8000  0501
0001075720  7800  8358  0080  0701  7800  C885  8300  0080
0001075740  0A01  7500  8380  0200  0064  0183  0102  0005
0001075760  7878  8083  0100  0007  837F  0210  0B83  0105
0001076000  000A  8075  8183  6400  8302  0593  0101  8000
0001076020  0701  7800  B085  8300  0080  0401  7F00  0B83
0001076040  0105  000A  8075  8183  6400  8301  0597  0701
0001076060  7F00  C083  8300  0081  0A01  7500  8380  0200
0001076100  0264  9983  0105  0007  837F  0081  8183  0100
0001076120  000A  8075  2283  6405  8302  059B  1301  7F00
0001076140  8183  8300  0210  8183  8300  00C0  EE83  8302
0001076160  04E7  0A01  7500  8380  0081  0664  9D83  0105
0001076200  000D  837F  00C0  8183  8300  00C0  4383  0105
0001076220  000A  8075  8183  6400  8304  059F  0501  7800
0001076240  8348  0080  0701  7800  4085  8301  0080  0401
0001076260  7F00  E783  0104  000A  8075  1483  6405  8301
```

THU MAR 14 17:52:34 1991 TSLINT.DLL PAGE 298, LINE 17524

```
0001076300   05A3  0701  7F00  E783  8304  0081  0A01  7500
0001076320   8380  0522  0264  A583  0105  0007  8578  00E0
0001076340   8083  0100  0007  8578  0080  8083  0100  0007
0001076360   8578  00D8  8083  0100  0007  8578  0170  8083
0001076400   0100  000A  8075  0083  6402  8300  0201  0A01
0001076420   7500  8380  057E  0064  0183  0102  0007  8578
0001076440   0138  8083  0100  0004  837F  0081  0A01  7500
0001076460   8380  057E  0164  AE83  0105  0001  0180  0005
0001076500   5078  8083  0100  0005  4078  8083  0100  0007
0001076520   8578  0088  8083  0100  000A  8075  0083  6402
0001076540   8300  0201  0401  7F00  0B83  0105  000A  8075
0001076560   8183  6400  8301  05B5  0401  7F00  0B83  0105
0001076600   000A  8075  0083  6402  8301  05B7  0A01  7500
0001076620   8380  0081  0064  0183  0102  0007  837F  04E7
0001076640   C183  0100  000A  8075  2983  6405  8302  05BA
0001076660   0701  7800  9085  8300  0080  0501  7800  8318
0001076700   0080  0701  7800  C085  8300  0080  0701  7800
0001076720   2085  8301  0080  0701  7800  E885  8304  0080
0001076740   0501  7800  8328  0080  0A01  7500  8380  0200
0001076760   0064  0183  0102  0007  8578  0118  8083  0100
0001077000   0004  837F  04E7  0A01  7500  8380  0514  0164
0001077020   C483  0105  000A  8075  8183  6400  8300  0201
0001077040   0101  8000  0701  7800  A885  8300  0080  0701
0001077060   7800  4085  8301  050C  0401  7F00  0C83  0105
0001077100   000A  8075  8183  6400  8301  05CA  0701  7800
0001077120   F085  8300  0080  0A01  7500  8380  0081  0064
0001077140   0183  0102  0007  8578  00F8  8083  0100  000A
0001077160   8075  8183  6400  8300  0201  0701  7F00  C083
0001077200   8300  00C0  0A01  7500  8380  0081  0264  D083
0001077220   0105  000A  8075  8183  6400  8300  0201  0101
0001077240   8000  0101  8000  0101  8000  0101  8000  0101
*
0001077500   8000  0101  8000  0101  8000  0701  7A00  8373
0001077520   022D  0082  0A01  7500  8380  0081  0064  0183
0001077540   0102  0001  0180  0001  0180  0001  0180  0001
0001077560   0180  0001  0180  0001  0180  0001  0180  0001
*
0001100260   0180  0001  0180  0001  0180  0001  0180  0016
0001100300   3079  8303  0286  8783  8202  280A  6E75  6174
0001100320   6767  6465  6929  0A01  7F00  8183  8300  0081
0001100340   8183  0100  001C  827F  7006  6361  5F6B  0068
0001100360   0682  6966  656C  685F  8202  6606  6E75  5F63
0001100400   0468  0101  8000  0101  8000  0101  8000  0101
0001100420   8000  0101  8000  0101  8000  0101  8000  0101
*
0001100600   8000  0101  8000  0101  8000  0501  7800  8338
0001100620   0080  0501  7800  8330  0080  0101  8000  0101
0001100640   8000  0101  8000  0101  8000  0101  8000  0101
*
0001101040   8000  0101  8000  0101  8000  0101  8000  0501
0001101060   7800  8368  0080  0101  8000  0101  8000  0101
0001101100   8000  0101  8000  0101  8000  0101  8000  0101
*
0001104740   8000  1F01  7300  9085  0700  BE83  8304  04BF
0001104760   1182  6572  705F  7461  6574  6E72  625F  6675
0001105000   6566  6972  1601  7F00  C083  8300  0081  8183
0001105020   8300  00CD  C083  8300  0080  8083  0100  0054
0001105040   827F  6206  6675  6566  0072  0982  6C61  6F6C
0001105060   6163  6574  0464  0482  7375  6465  8206  6607
```

THU MAR 14 17:52:34 1991 TSLINT.DLL PAGE 299, LINE 17583

| | | | | | | | | |
|---|---|---|---|---|---|---|---|---|
| 0001105100 | 7361 | 6D74 | 7061 | 8208 | 7409 | 6172 | 736E | 616C |
| 0001105120 | 6574 | 820C | 6610 | 7361 | 6D74 | 7061 | 615F | 6363 |
| 0001105140 | 7275 | 7461 | 1065 | 0B82 | 6163 | 5F6E | 6562 | 6E5F |
| 0001105160 | 6C75 | 116C | 0101 | 8000 | 0101 | 8000 | 0101 | 8000 |
| 0001105200 | 0101 | 8000 | 0101 | 8000 | 0101 | 8000 | 0101 | 8000 |
| * | | | | | | | | |
| 0001105240 | 0101 | 8000 | 0101 | 8000 | 1601 | 7900 | B085 | 0300 |
| 0001105260 | EA83 | 8304 | 04EB | 0882 | 7865 | 5F70 | 6F6E | 6564 |
| 0001105300 | 0169 | 0018 | 8579 | 0090 | 8304 | 04E8 | E983 | 8204 |
| 0001105320 | 280A | 6E75 | 6174 | 6767 | 6465 | 6929 | 1801 | 7900 |
| 0001105340 | 9085 | 0600 | DD83 | 8304 | 04DE | 0A82 | 7528 | 746E |
| 0001105360 | 6761 | 6567 | 2964 | 0169 | 0016 | 2079 | 8304 | 04D2 |
| 0001105400 | D383 | 8204 | 280A | 6E75 | 6174 | 6767 | 6465 | 6929 |
| 0001105420 | 0701 | 7A00 | 8373 | 04CD | 0082 | 0D01 | 7F00 | D183 |
| 0001105440 | 8304 | 00C0 | C083 | 8300 | 04D1 | 2901 | 7F00 | 0482 |
| 0001105460 | 706C | 7274 | 8200 | 700A | 7261 | 6D61 | 6E5F | 6D61 |
| 0001105500 | 0065 | 0682 | 6572 | 6574 | 7478 | 8200 | 6E08 | 7865 |
| 0001105520 | 6E74 | 646F | 0065 | 1601 | 7900 | 0620 | DB83 | 8304 |
| 0001105540 | 04DC | 0A82 | 7528 | 746E | 6761 | 6567 | 2964 | 0169 |
| 0001105560 | 0007 | 737A | D683 | 8204 | 0100 | 000A | 8075 | D183 |
| 0001105600 | 6404 | 8300 | 0201 | 0701 | 7A00 | 8373 | 04BD | 0082 |
| 0001105620 | 1B01 | 7900 | 0360 | EC83 | 8304 | 04ED | 0F82 | 6F66 |
| 0001105640 | 5F72 | 6F6C | 706F | 685F | 6165 | 6564 | 6972 | 0701 |
| 0001105660 | 7A00 | 8373 | 04D8 | 0082 | 0701 | 7A00 | 8373 | 04D1 |
| 0001105700 | 0082 | 1301 | 7F00 | D183 | 8304 | 04D5 | D783 | 8304 |
| 0001105720 | 04D9 | DA83 | 8304 | 0081 | 2801 | 7F00 | 0482 | 7072 |
| 0001105740 | 7274 | 8200 | 7004 | 7470 | 0072 | 0482 | 7270 | 6765 |
| 0001105760 | 8200 | 6802 | 0064 | 0282 | 7661 | 8200 | 7205 | 655F |
| 0001106000 | 746E | 0100 | 0013 | 837F | 04D0 | D483 | 8304 | 00C0 |
| 0001106020 | 8183 | 8300 | 0081 | 8483 | 0100 | 002B | 827F | 6C01 |
| 0001106040 | 8200 | 7201 | 8204 | 6E04 | 6D61 | 0865 | 0682 | 756E |
| 0001106060 | 626D | 7265 | 820C | 7306 | 6C5F | 6E69 | 0E65 | 0682 |
| 0001106100 | 6572 | 6163 | 6573 | 0110 | 0018 | 8579 | 0080 | 8304 |
| 0001106120 | 04E0 | E183 | 8204 | 280A | 6E75 | 6174 | 6767 | 6465 |
| 0001106140 | 6929 | 0D01 | 7F00 | 8983 | 8300 | 00C0 | 8183 | 8300 |
| 0001106160 | 0084 | 1D01 | 7F00 | 0682 | 6C66 | 6E74 | 6D75 | 8200 |
| 0001106200 | 7302 | 0870 | 0482 | 6C73 | 6E65 | 820C | 7304 | 6572 |
| 0001106220 | 0E66 | 1601 | 7900 | 0470 | E383 | 8304 | 04E4 | 0A82 |
| 0001106240 | 7528 | 746E | 6761 | 6567 | 2964 | 0169 | 000D | 837F |
| 0001106260 | 04D1 | C083 | 8300 | 0081 | D183 | 0104 | 0020 | 827F |
| 0001106300 | 6E04 | 7865 | 0074 | 0482 | 616E | 656D | 8204 | 6C06 |
| 0001106320 | 6E65 | 7467 | 0868 | 0582 | 6176 | 756C | 0A65 | 1601 |
| 0001106340 | 7900 | 0360 | E683 | 8304 | 04E7 | 0A82 | 7528 | 746E |
| 0001106360 | 6761 | 6567 | 2964 | 0169 | 000A | 837F | 04D1 | D183 |
| 0001106400 | 8304 | 04D1 | 1701 | 7F00 | 0482 | 656E | 7478 | 8200 |
| 0001106420 | 6E04 | 6D61 | 0465 | 0582 | 6176 | 756C | 0865 | 0D01 |
| 0001106440 | 7F00 | CF83 | 8304 | 04DF | E283 | 8304 | 04E5 | 1E01 |
| 0001106460 | 7F00 | 0582 | 6F6E | 6564 | 0070 | 0382 | 6176 | 006C |
| 0001106500 | 0482 | 6168 | 6873 | 8200 | 6105 | 6168 | 6873 | 0100 |
| 0001106520 | 000A | 837F | 04CE | 8183 | 8300 | 0084 | 1601 | 7F00 |
| 0001106540 | 0382 | 7573 | 0062 | 0482 | 7974 | 6570 | 8212 | 6605 |
| 0001106560 | 616C | 7367 | 0114 | 000A | 837F | 04D1 | D183 | 8304 |
| 0001106600 | 04D1 | 1601 | 7F00 | 0482 | 6E69 | 7469 | 8200 | 6304 |
| 0001106620 | 6E6F | 0464 | 0482 | 6E69 | 7263 | 0108 | 0012 | 7079 |
| 0001106640 | 8304 | 04EF | F083 | 8204 | 7306 | 6165 | 6372 | 6968 |
| 0001106660 | 0D01 | 7F00 | 8183 | 8300 | 04DA | D183 | 8304 | 04D1 |
| 0001106700 | 2701 | 7F00 | 0782 | 756E | 6C6D | 6665 | 0074 | 0782 |
| 0001106720 | 7261 | 5F72 | 7470 | 0272 | 0682 | 7562 | 6B63 | 7465 |
| 0001106740 | 8206 | 7206 | 7465 | 6176 | 0A6C | 0101 | 8000 | 0101 |

```
THU MAR 14 17:52:34 1991  TSLINT.DLL  PAGE 300, LINE 17642

0001106760  8000  0101  8000  0101  8000  0101  8000  0101
*
0001107020  8000  0101  8000  0101  8000  0101  8000  0701
0001107040  7A00  8373  04CD  0082  0101  8000  0101  8000
0001107060  0101  8000  0101  8000  0101  8000  0101  8000
*
0001107120  0101  8000  0101  8000  0101  8000  0701  7A00
0001107140  8373  04FE  0082  0101  8000  0101  8000  0101
0001107160  8000  0101  8000  0101  8000  0101  8000  0101
*
0001107240  8000  0101  8000  0101  8000  0701  7A00  8373
0001107260  04EE  0082  0101  8000  0701  7A00  8373  04EE
0001107300  0082  0101  8000  0101  8000  0101  8000  0101
0001107320  8000  0101  8000  0101  8000  0101  8000  0101
*
0001107600  8000  0101  8000  0401  7F00  D183  0104  000A
0001107620  8075  FE83  6404  8301  0552  0101  8000  0501
0001107640  7800  8358  0080  0501  7800  8360  0082  0501
0001107660  7800  8378  0080  0501  7800  8348  0080  0501
0001107700  7800  8370  0080  0701  7800  C885  8300  0080
0001107720  0401  7F00  D183  0104  000A  8075  0083  6402
0001107740  8301  055B  0401  7F00  D183  0104  000A  8075
0001107760  8183  6400  8301  055D  0A01  7F00  D183  8304
0001110000  04D1  8183  0100  000A  8075  FE83  6404  8303
0001110020  055F  0701  7F00  D183  8304  04D1  0A01  7500
0001110040  8380  0081  0264  6183  0105  0007  837F  04D1
0001110060  D183  0104  000A  8075  0C83  6405  8302  0563
0001110100  0101  8000  0501  7800  8340  0080  0701  7F00
0001110120  D183  8304  04D1  0A01  7500  8380  0200  0264
0001110140  6783  0105  0004  837F  04D1  0A01  7500  8380
0001110160  051E  0164  6983  0105  0007  8578  0080  8083
0001110200  0100  0004  837F  0520  0A01  7500  8380  051E
0001110220  0164  6C83  0105  0001  0180  0001  0180  0007
0001110240  737A  0383  8202  0100  000A  8075  8183  6400
0001110260  8300  0201  0101  8000  0101  8000  0101  8000
0001110300  0101  8000  0101  8000  0101  8000  0101  8000
*
0001112020  0101  8000  0101  8000  0101  8000  0501  7800
0001112040  8360  0080  0101  8000  0101  8000  0101  8000
0001112060  0101  8000  0101  8000  0101  8000  0101  8000
*
0001114660  0501  7800  8300  0084  0101  8000  0101  8000
0001114700  0101  8000  0101  8000  0101  8000  0101  8000
*
0001115260  0101  8000  0101  8000  1F01  7900  9085  0700
0001115300  8483  8304  0485  1182  6572  705F  7461  6574
0001115320  6E72  625F  6675  6566  6972  1601  7F00  C083
0001115340  8300  0081  8183  8300  00C0  C083  8300  0080
0001115360  8083  0100  0054  827F  6206  6675  6566  0072
0001115400  0982  6C61  6F6C  6163  6574  0464  0482  7375
0001115420  6465  8206  6607  7361  6D74  7061  8208  7409
0001115440  6172  736E  616C  6574  820C  6610  7361  6D74
0001115460  7061  615F  6363  7275  7461  1065  0B82  6163
0001115500  5F6E  6562  6E5F  6C75  116C  0101  8000  0101
0001115520  8000  0101  8000  0101  8000  0101  8000  0101
*
0001115560  8000  0101  8000  0101  8000  0101  8000  1601
0001115600  7900  B085  0300  B083  8304  04B1  0882  7865
0001115620  5F70  6F6E  6564  0169  0018  8579  0090  8304
```

```
THU MAR 14 17:52:34 1991  TSLINT.DLL  PAGE 301, LINE 17701

0001115640  04AE  AF83  8204  280A  6E75  6174  6767  6465
0001115660  6929  1801  7900  9085  0600  A383  8304  04A4
0001115700  0A82  7528  746E  6761  6567  2964  0169  0016
0001115720  2079  8304  0498  9983  8204  280A  6E75  6174
0001115740  6767  6465  6929  0701  7A00  8373  0493  0082
0001115760  0D01  7F00  9783  8304  00C0  C083  8300  0497
0001116000  2901  7F00  0482  706C  7274  8200  700A  7261
0001116020  6D61  6E5F  6D61  0065  0682  6572  6574  7478
0001116040  8200  6E08  7865  6E74  646F  0065  1601  7900
0001116060  0620  A183  8304  04A2  0A82  7528  746E  6761
0001116100  6567  2964  0169  0007  737A  9C83  8204  0100
0001116120  000A  8075  9783  6404  8300  0201  0701  7A00
0001116140  8373  0483  0082  1B01  7900  0360  B283  8304
0001116160  04B3  0F82  6F66  5F72  6F6C  706F  685F  6165
0001116200  6564  6972  0701  7A00  8373  049E  0082  0701
0001116220  7A00  8373  0497  0082  1301  7F00  9783  8304
0001116240  049B  9D83  8304  049F  A083  8304  0081  2801
0001116260  7F00  0482  7072  7274  8200  7004  7470  0072
0001116300  0482  7270  6765  8200  6802  0064  0282  7661
0001116320  8200  7205  655F  746E  0100  0013  837F  0496
0001116340  9A83  8304  00C0  8183  8300  0081  8483  0100
0001116360  002B  827F  6C01  8200  7201  8204  6E04  6D61
0001116400  0865  0682  756E  626D  7265  820C  7306  6C5F
0001116420  6E69  0E65  0682  6572  6163  6573  0110  0018
0001116440  8579  0080  8304  04A6  A783  8204  280A  6E75
0001116460  6174  6767  6465  6929  0D01  7F00  8983  8300
0001116500  00C0  8183  8300  0084  1D01  7F00  0682  6C66
0001116520  6E74  6D75  8200  7302  0870  0482  6C73  6E65
0001116540  820C  7304  6572  0E66  1601  7900  0470  A983
0001116560  8304  04AA  0A82  7528  746E  6761  6567  2964
0001116600  0169  000D  837F  0497  C083  8300  0081  9783
0001116620  0104  0020  827F  6E04  7865  0074  0482  616E
0001116640  656D  8204  6C06  6E65  7467  0868  0582  6176
0001116660  756C  0A65  1601  7900  0360  AC83  8304  04AD
0001116700  0A82  7528  746E  6761  6567  2964  0169  000A
0001116720  837F  0497  9783  8304  0497  1701  7F00  0482
0001116740  656E  7478  8200  6E04  6D61  0465  0582  6176
0001116760  756C  0865  0D01  7F00  9583  8304  04A5  A883
0001117000  8304  04AB  1E01  7F00  0582  6F6E  6564  0070
0001117020  0382  6176  006C  0482  6168  6873  8200  6105
0001117040  6168  6873  0100  000A  837F  0494  8183  8300
0001117060  0084  1601  7F00  0382  7573  0062  0482  7974
0001117100  6570  8212  6605  616C  7367  0114  000A  837F
0001117120  0497  9783  8304  0497  1601  7F00  0482  6E69
0001117140  7469  8200  6304  6E6F  0464  0482  6E69  7263
0001117160  0108  0001  0180  0001  0180  0001  0180  0001
0001117200  0180  0001  0180  0001  0180  0001  0180  0001
*
0C01117260  0180  0007  737A  9383  8204  0100  0001  0180
0001117300  0001  0180  0001  0180  0001  0180  0001  0180
*
0001117760  0001  0180  0001  0180  0016  3079  8303  0515
0001120000  1683  8205  280A  6E75  6174  6767  6465  6929
0001120020  0A01  7F00  8183  8300  0081  8183  0100  001C
0001120040  827F  7006  6361  5F6B  0068  0682  6966  656C
0001120060  685F  8202  6606  6E75  5F63  0468  0101  8000
0001120100  0101  8000  0101  8000  0101  8000  0101  8000
*
0001120260  0101  8000  0101  8000  0101  8000  0501  7800
```

```
THU MAR 14 17:52:34 1991  TSLINT.DLL  PAGE 302, LINE 17760

0001120300  8338  0080  0501  7800  8330  0080  0101  8000
0001120320  0501  7800  8310  0080  0701  7800  4085  8301
0001120340  00C0  0401  7F00  9783  0104  000A  8075  8983
0001120360  6400  8301  053C  0501  7800  8378  0080  0501
0001120400  7800  8378  0080  0501  7800  8360  0082  0701
0001120420  7800  E085  8300  0080  0701  7800  8085  8300
0001120440  0080  0501  7800  8340  0080  0701  7800  D885
0001120460  8300  0080  0401  7F00  9783  0104  000A  8075
0001120500  C483  6404  8301  0545  0701  7800  0085  8304
0001120520  0080  0501  7800  8328  0080  0501  7800  8348
0001120540  0080  0501  7800  8370  0080  0401  7F00  9783
0001120560  0104  000A  8075  C483  6404  8301  054B  0501
0001120600  7800  8340  0080  0401  7F00  8983  0100  000A
0001120620  8075  C483  6404  8301  054E  0401  7F00  8983
0001120640  0100  000A  8075  C483  6404  8301  0550  0701
0001120660  7F00  C083  8300  0081  0A01  7500  8380  04C4
0001120700  0264  5283  0105  0001  0180  0005  5078  8083
0001120720  0100  0005  5878  8083  0100  0007  837F  00C0
0001120740  8183  0100  000A  8075  C483  6404  8302  0557
0001120760  0A01  7500  8380  0081  0064  0183  0102  0001
0001121000  0180  0007  737A  0383  8202  0100  000A  8075
0001121020  8183  6400  8300  0201  0101  8000  0101  8000
0001121040  0101  8000  0101  8000  0101  8000  0101  8000
*
0001122600  0501  7800  8360  0080  0101  8000  0101  8000
0001122620  0101  8000  0101  8000  0101  8000  0101  8000
*
0001125060  1601  7900  0330  0A83  8304  040B  0A82  7528
0001125100  746E  6761  6567  2964  0169  000A  837F  0081
0001125120  8183  8300  0081  1C01  7F00  0682  6170  6B63
0001125140  685F  8200  6606  6C69  5F65  0268  0682  7566
0001125160  636E  685F  0104  0001  0180  0001  0180  0001
0001125200  0180  0001  0180  0001  0180  0001  0180  0001
*
0001125360  0180  0001  0180  0001  0180  0001  0180  0005
0001125400  4078  8083  0100  0005  3078  8083  0100  0001
0001125420  0180  0001  0180  0001  0180  0001  0180  0001
*
0001126360  0180  0001  0180  001F  8579  0090  8307  04AB
0001126400  AC83  8204  7211  5F65  6170  7474  7265  5F6E
0001126420  7562  6666  7265  0169  0016  837F  00C0  8183
0001126440  8300  0081  C083  8300  00C0  8083  8300  0080
0001126460  5401  7F00  0682  7562  6666  7265  8200  6109
0001126500  6C6C  636F  7461  6465  8204  7504  6573  0664
0001126520  0782  6166  7473  616D  0870  0982  7274  6E61
0001126540  6C73  7461  0C65  1082  6166  7473  616D  5F70
0001126560  6361  7563  6172  6574  8210  630B  6E61  625F
0001126600  5F65  756E  6C6C  0111  001A  8579  0140  8302
0001126620  04AF  B083  8204  720C  5F65  6572  6967  7473
0001126640  7265  6973  0701  7800  A085  8300  0081  0701
0001126660  7F00  AE83  8304  04AE  0F01  7F00  0582  7473
0001126700  7261  0074  0382  6E65  1464  0101  8000  0101
0001126720  8000  0101  8000  0101  8000  0101  8000  0101
*
0001127020  8000  0101  8000  0701  7A00  8373  04AA  0082
0001127040  0101  8000  0101  8000  0101  8000  0101  8000
*
0001127560  0101  8000  0701  7A00  8373  04AD  0082  0101
0001127600  8000  0101  8000  0101  8000  0101  8000  0101
```

```
THU MAR 14 17:52:34 1991  TSLINT.DLL  PAGE 303, LINE 17819

*
0001127740  8000  0101  8000  0A01  7500  8380  0200  0364
0001127760  3683  0105  000A  837F  00C0  8083  8300  00C0
0001130000  0A01  7500  8380  0200  0464  3883  0105  000D
0001130020  837F  0080  C083  8300  00C0  C083  0100  000A
0001130040  8075  8183  6400  8304  053A  0D01  7F00  C483
0001130060  8300  00C4  8183  8300  00C4  0701  7800  0085
0001130100  8308  0080  0A01  7500  8380  0200  0064  0183
0001130120  0102  0004  837F  0081  0A01  7500  8380  0081
0001130140  0164  3D83  0105  000A  837F  00C0  8183  8300
0001130160  04C4  0A01  7500  8380  00C0  0364  3F83  0105
0001130200  0001  0180  0007  8578  0098  8083  0100  0005
0001130220  3878  8083  0100  0005  6078  8283  0100  0007
0001130240  8578  0280  8183  0100  0005  7878  8083  0100
0001130260  0005  4878  8083  0100  0007  8578  00C8  8083
0001130300  0100  0005  7078  8083  0100  0007  8578  00D8
0001130320  8083  0100  0005  6878  8083  0100  0007  8578
0001130340  0120  8083  0100  0007  8578  0038  8083  0100
0001130360  000A  837F  00C0  8083  8300  00C0  0A01  7500
0001130400  8380  0206  0364  4E83  0105  000D  837F  0080
0001130420  C083  8300  00C0  C083  0100  000A  8075  0083
0001130440  6402  8304  0550  0401  7F00  C483  0104  000A
0001130460  8075  0083  6402  8301  0552  0501  7800  8320
0001130500  0080  0701  7800  0085  830A  00C4  0701  7A00
0001130520  8373  00C4  0082  1301  7F00  C483  8304  00C0
0001130540  8183  8300  0081  8183  8300  051A  0A01  7500
0001130560  8380  0081  0664  5783  0105  0001  0180  0005
0001130600  5078  8083  0100  001C  837F  04C4  C083  8300
0001130620  0081  C083  8300  0081  8183  8300  0081  1A83
0001130640  8305  0081  0A01  7500  8380  0081  0964  5B83
0001130660  0105  0001  0180  0010  837F  04C4  C083  8300
0001130700  0081  8183  8300  051A  0A01  7500  8380  0081
0001130720  0564  5E83  0105  0005  4878  8083  0100  0019
0001130740  837F  04C4  C083  8300  0081  C083  8300  0081
0001130760  8183  8300  051A  8183  0100  000A  8075  8183
0001131000  6400  8308  0561  0101  8000  0501  7800  8358
0001131020  0080  0701  7800  0085  8314  00C4  0701  7800
0001131040  4085  8301  00C4  0501  7800  8350  0084  0D01
0001131060  7F00  C483  8300  00C4  8183  8300  00C4  0A01
0001131100  7500  8380  0081  0464  6883  0105  0004  837F
0001131120  00C0  0A01  7500  8380  00C0  0164  6A83  0105
0001131140  0005  4078  8083  0100  0007  8578  00F8  8083
0001131160  0100  0004  837F  00C0  0A01  7500  8380  0081
0001131200  0164  6E83  0105  000A  8075  8183  6400  8300
0001131220  0201  0101  8000  0101  8000  0101  8000  0101
0001131240  8000  0101  8000  0101  8000  0101  8000  0101
*
0001134240  8000  0101  8000  1601  7900  0330  8783  8303
0001134260  0388  0A82  7528  746E  6761  6567  2964  0169
0001134300  000A  837F  0081  8183  8300  0081  1C01  7F00
0001134320  0682  6170  6B63  685F  8200  6606  6C69  5F65
0001134340  0268  0682  7566  636E  685F  0104  0001  0180
0001134360  0001  0180  0001  0180  0001  0180  0001  0180
*
0001134560  0001  0180  0005  5078  8083  0100  0005  3078
0001134600  8083  0100  0001  0180  0001  0180  0001  0180
0001134620  0001  0180  0001  0180  0001  0180  0001  0180
*
0001136760  0004  837F  00C0  0A01  7500  8380  0200  0164
```

THU MAR 14 17:52:34 1991 TSLINT.DLL PAGE 304, LINE 17878

```
0001137000  C883  0104  0005  4078  8083  0100  0005  4078
0001137020  8083  0100  0005  2078  8083  0100  0007  737A
0001137040  CE83  8204  0100  000A  8075  8183  6400  8300
0001137060  0201  0501  7800  8360  0082  0701  7800  B885
0001137100  8300  0080  0501  7800  8338  0080  0701  7800
0001137120  B085  8300  0080  0A01  7F00  8583  8300  0084
0001137140  8183  0100  000A  8075  C083  6400  8303  04D3
0001137160  0501  7800  8350  0080  0701  7800  2885  8301
0001137200  0080  0701  7800  4885  8301  0080  0501  7800
0001137220  8348  0080  0701  7800  9885  8300  0080  0D01
0001137240  7F00  C083  8300  0085  8483  8300  0081  0A01
0001137260  7500  8380  00C0  0464  DA83  0104  0001  0180
0001137300  0005  5878  8083  0100  0007  8578  0160  8083
0001137320  0100  0007  8578  0150  8083  0100  000A  8075
0001137340  8183  6400  8300  0201  0101  8000  0701  7A00
0001137360  8373  0203  0082  0A01  7500  8380  0081  0064
0001137400  0183  0102  0001  0180  0001  0180  0001  0180
0001137420  0001  0180  0001  0180  0001  0180  0001  0180
*
0001143200  0016  3079  8303  03E4  E583  8203  280A  6E75
0001143220  6174  6767  6465  6929  0A01  7F00  8183  8300
0001143240  0081  8183  0100  001C  827F  7006  6361  5F6B
0001143260  0068  0682  6966  656C  685F  8202  6606  6E75
0001143300  5F63  0468  0101  8000  0101  8000  0101  8000
0001143320  0101  8000  0101  8000  0101  8000  0101  8000
*
0001143500  0101  8000  0101  8000  0101  8000  0501  7800
0001143520  8338  0080  0501  7800  8330  0080  0101  8000
0001143540  0101  8000  0101  8000  0101  8000  0101  8000
*
0001144520  0101  8000  1F01  7900  9085  0700  8983  8304
0001144540  048A  1182  6572  705F  7461  6574  6E72  625F
0001144560  6675  6566  6972  1601  7F00  C083  8300  0081
0001144600  8183  8300  00C0  C083  8300  0080  8083  0100
0001144620  0054  827F  6206  6675  6566  0072  0982  6C61
0001144640  6F6C  6163  6574  0464  0482  7375  6465  8206
0001144660  6607  7361  6D74  7061  8208  7409  6172  736E
0001144700  616C  6574  820C  6610  7361  6D74  7061  615F
0001144720  6363  7275  7461  1065  0B82  6163  5F6E  6562
0001144740  6E5F  6C75  116C  0101  8000  0101  8000  0101
0001144760  8000  0101  8000  0101  8000  0101  8000  0101
*
0001145020  8000  0101  8000  0101  8000  1601  7900  B085
0001145040  0300  B583  8304  04B6  0882  7865  5F70  6F6E
0001145060  6564  0169  0018  8579  0090  8304  04B3  B483
0001145100  8204  280A  6E75  6174  6767  6465  6929  1801
0001145120  7900  9085  0600  A883  8304  04A9  0A82  7528
0001145140  746E  6761  6567  2964  0169  0016  2079  8304
0001145160  049D  9E83  8204  280A  6E75  6174  6767  6465
0001145200  6929  0701  7A00  8373  0498  0082  0D01  7F00
0001145220  9C83  8304  00C0  C083  8300  049C  2901  7F00
0001145240  0482  706C  7274  8200  700A  7261  6D61  6E5F
0001145260  6D61  0065  0682  6572  6574  7478  8200  6E08
0001145300  7865  6E74  646F  0065  1601  7900  0620  A683
0001145320  8304  04A7  0A82  7528  746E  6761  6567  2964
0001145340  0169  0007  737A  A183  8204  0100  000A  8075
0001145360  9C83  6404  8300  0201  0701  7A00  8373  0488
0001145400  0082  1B01  7900  0360  B783  8304  04B8  0F82
0001145420  6F66  5F72  6F6C  706F  685F  6165  6564  6972
```

```
THU MAR 14 17:52:34 1991  TSLINT.DLL  PAGE 305, LINE 17937

0001145440  0701  7A00  8373  04A3  0082  0701  7A00  8373
0001145460  049C  0082  1301  7F00  9C83  8304  04A0  A283
0001145500  8304  04A4  A583  8304  0081  2801  7F00  0482
0001145520  7072  7274  8200  7004  7470  0072  0482  7270
0001145540  6765  8200  6802  0064  0282  7661  8200  7205
0001145560  655F  746E  0100  0013  837F  049B  9F83  8304
0001145600  00C0  8183  8300  0081  8483  0100  002B  827F
0001145620  6C01  8200  7201  8204  6E04  6D61  0865  0682
0001145640  756E  626D  7265  820C  7306  6C5F  6E69  0E65
0001145660  0682  6572  6163  6573  0110  0018  8579  0080
0001145700  8304  04AB  AC83  8204  280A  6E75  6174  6767
0001145720  6465  6929  0D01  7F00  8983  8300  00C0  8183
0001145740  83G0  0084  1D01  7F00  0682  6C66  6E74  6D75
0001145760  8200  7302  0870  0482  6C73  6E65  820C  7304
0001146000  6572  0E66  1601  7900  0470  AE83  8304  04AF
0001146020  0A82  7528  746E  6761  6567  2964  0169  000D
0001146040  837F  049C  C083  8300  0081  9C83  0104  0020
0001146060  827F  6E04  7865  0074  0482  616E  656D  8204
0001146100  6C06  6E65  7467  0868  0582  6176  756C  0A65
0001146120  1601  7900  0360  B183  8304  04B2  0A82  7528
0001146140  746E  6761  6567  2964  0169  000A  837F  049C
0001146160  9C83  8304  049C  1701  7F00  0482  656E  7478
0001146200  8200  6E04  6D61  0465  0582  6176  756C  0865
0001146220  0D01  7F00  9A83  8304  04AA  AD83  8304  04B0
0001146240  1E01  7F00  0582  6F6E  6564  0070  0382  6176
0001146260  006C  0482  6168  6873  8200  6105  6168  6873
0001146300  0100  000A  837F  0499  8183  8300  0084  1601
0001146320  7F00  0382  7573  0062  0482  7974  6570  8212
0001146340  6605  616C  7367  0114  000A  837F  049C  9C83
0001146360  8304  049C  1601  7F00  0482  6E69  7469  8200
0001146400  6304  6E6F  0464  0482  6E69  7263  0108  0001
0001146420  0180  0001  0180  0001  0180  0001  0180  0001
*
0001146500  0180  0001  0180  0001  0180  0001  0180  0007
0001146520  737A  9883  8204  0100  0001  0180  0001  0180
0001146540  0001  0180  0001  0180  0001  0180  0001  0180
*
0001147160  0001  0180  0001  0180  0001  0180  0004  837F
0001147200  0081  0A01  7500  8380  04C9  0164  1383  0105
0001147220  0001  0180  0005  4078  8083  0100  0005  6078
0001147240  8283  0100  0007  8578  0088  8083  0100  0005
0001147260  7878  8083  0100  0005  4878  8083  0100  0005
0001147300  7078  8083  0100  0004  837F  049C  0A01  7500
0001147320  8380  0200  0164  1C83  0105  0005  4878  8083
0001147340  0100  0005  2078  8083  0100  000A  8075  8183
0001147360  6400  8300  0201  0101  8000  1201  7900  0560
0001147400  0383  8302  0204  0682  695F  626F  6675  0169
0001147420  0010  837F  00C0  8183  8300  00C0  8083  8300
0001147440  0080  2701  7F00  0482  705F  7274  8200  5F04
0001147460  6E63  0474  0582  625F  7361  0665  0582  665F
0001147500  616C  0A67  0582  665F  6C69  0B65  0501  7800
0001147520  8300  0202  0101  8000  0101  8000  0101  8000
0001147540  0101  8000  0101  8000  0101  8000  0101  8000
*
0001154700  0101  8000  0101  8000  0501  7800  8350  0081
0001154720  0701  7800  0085  8304  0082  0401  7F00  8583
0001154740  0100  000A  8075  0083  6402  8301  04A5  0A01
0001154760  7F00  8583  8300  00C0  8183  0100  000A  8075
0001155000  C083  6400  8303  04A7  0701  7800  4085  8302
```

```
THU MAR 14 17:52:34 1991  TSLINT.DLL  PAGE 306, LINE 17996

0001155020  0080  0401  7F00  C083  0100  000A  8075  C083
0001155040  6400  8301  04AA  0701  7800  A085  8301  0080
0001155060  0A01  7500  8380  0082  0064  0183  0102  000A
0001155100  8075  8183  6400  8300  0201  0101  8000  0101
0001155120  8000  0101  8000  0101  8000  0101  8000  0101
*
0001155700  8000  0A01  7500  8380  0200  0064  0183  0102
0001155720  000F  4079  8302  0266  6783  8202  6803  7264
0001155740  0169  0005  4078  8083  0100  0016  4079  8302
0001155760  0264  6583  8202  280A  6E75  6174  6767  6465
0001156000  6929  0701  7A00  8373  0260  0082  0701  7F00
0001156020  6383  8302  00C0  0F01  7F00  0482  656E  7478
0001156040  8200  6404  6565  0470  0701  7F00  6183  8302
0001156060  0262  0D01  7F00  0582  6C61  6769  006E  0182
0001156100  0068  0401  7F00  8583  0100  000A  8075  C083
0001156120  6400  8301  0268  0A01  7500  8380  0081  0064
0001156140  0183  0102  0001  0180  0007  737A  0383  8202
0001156160  0100  000A  8075  8183  6400  8300  0201  0101
0001156200  8000  0101  8000  0101  8000  0101  8000  0101
*
0001156240  8000  0101  8000  0101  8000  0101  8000  0701
0001156260  7A00  8373  00C0  0082  0101  8000  0101  8000
0001156300  0101  8000  0101  8000  0101  8000  0101  8000
*
0001157540  0101  8000  0101  8000  0101  8000  1601  7900
0001157560  0330  BF83  8302  02C0  0A82  7528  746E  6761
0001157600  6567  2964  0169  000A  837F  0081  8183  8300
0001157620  0081  1C01  7F00  0682  6170  6B63  685F  8200
0001157640  6606  6C69  5F65  0268  0682  7566  636E  685F
0001157660  0104  0001  0180  0001  0180  0001  0180  0001
0001157700  0180  0001  0180  0001  0180  0001  0180  0001
*
0001160060  0180  0001  0180  0001  0180  0005  4078  8083
0001160100  0100  0005  3078  8083  0100  0001  0180  0001
0001160120  0180  0001  0180  0001  0180  0001  0180  0001
*
0001163520  0180  0001  0180  0007  737A  A983  8204  0100
0001163540  000A  8075  8183  7300  8300  0201  0101  8000
0001163560  0101  8000  0101  8000  0101  8000  0101  8000
0001163600  0101  8000  0101  8000  0101  8000  0501  7800
0001163620  8300  0084  0101  8000  0101  8000  0101  8000
0001163640  0101  8000  0101  8000  0101  8000  0101  8000
*
0001164220  0101  8000  1F01  7900  9085  0700  F483  8304
0001164240  04F5  1182  6572  705F  7461  6574  6E72  625F
0001164260  6675  6566  6972  1601  7F00  C083  8300  0081
0001164300  8183  8300  00C0  C083  8300  0080  8083  0100
0001164320  0054  827F  6206  6675  6566  0072  0982  6C61
0001164340  6F6C  6163  6574  0464  0482  7375  6465  8206
0001164360  6607  7361  6D74  7061  8208  7409  6172  736E
0001164400  616C  6574  820C  6610  7361  6D74  7061  615F
0001164420  6363  7275  7461  1065  0882  6163  5F6E  6562
0001164440  6E5F  6C75  116C  0101  8000  0101  8000  0101
0001164460  8000  0101  8000  0101  8000  0101  8000  0101
*
0001164520  8000  0101  8000  0101  8000  1601  7900  B085
0001164540  0300  2083  8305  0521  0882  7865  5F70  6F6E
0001164560  6564  0169  0018  8579  0090  8304  051E  1F83
0001164600  8205  280A  6E75  6174  6767  6465  6929  1801
```

```
THU MAR 14 17:52:34 1991  TSLINT.DLL  PAGE 307, LINE 18055

0001164620  7900  9085  0600  1383  8305  0514  0A82  7528
0001164640  746E  6761  6567  2964  0169  0016  2079  8304
0001164660  0508  0983  8205  280A  6E75  6174  6767  6465
0001164700  6929  0701  7A00  8373  0503  0082  0D01  7F00
0001164720  0783  8305  00C0  C083  8300  0507  2901  7F00
0001164740  0482  706C  7274  8200  700A  7261  6D61  6E5F
0001164760  6D61  0065  0682  6572  6574  7478  8200  6E08
0001165000  7865  6E74  646F  0065  1601  7900  0620  1183
0001165020  8305  0512  0A82  7528  746E  6761  6567  2964
0001165040  0169  0007  737A  0C83  8205  0100  000A  8075
0001165060  0783  6405  8300  0201  0701  7A00  8373  04F3
0001165100  0082  1B01  7900  0360  2283  8305  0523  0F82
0001165120  6F66  5F72  6F6C  706F  685F  6165  6564  6972
0001165140  0701  7A00  8373  050E  0082  0701  7A00  8373
0001165160  0507  0082  1301  7F00  0783  8305  050B  0D83
0001165200  8305  050F  1083  8305  0081  2801  7F00  0482
0001165220  7072  7274  8200  7004  7470  0072  0482  7270
0001165240  6765  8200  6802  0064  0282  7661  8200  7205
0001165260  655F  746E  0100  0013  837F  0506  0A83  8305
0001165300  00C0  8183  8300  0081  8483  0100  002B  827F
0001165320  6C01  8200  7201  8204  6E04  6D61  0865  0682
0001165340  756E  626D  7265  820C  7306  6C5F  6E69  0E65
0001165360  0682  6572  6163  6573  0110  0018  8579  0080
0001165400  8304  0516  1783  8205  280A  6E75  6174  6767
0001165420  6465  6929  0D01  7F00  8983  8300  00C0  8183
0001165440  8300  0084  1D01  7F00  0682  6C66  6E74  6D75
0001165460  8200  7302  0870  0482  6C73  6E65  820C  7304
0001165500  6572  0E66  1601  7900  0470  1983  8305  051A
0001165520  0A82  7528  746E  6761  6567  2964  0169  000D
0001165540  837F  0507  C083  8300  0081  0783  0105  0020
0001165560  827F  6E04  7865  0074  0482  616E  656D  8204
0001165600  6C06  6E65  7467  0868  0582  6176  756C  0A65
0001165620  1601  7900  0360  1C83  8305  051D  0A82  7528
0001165640  746E  6761  6567  2964  0169  000A  837F  0507
0001165660  0783  8305  0507  1701  7F00  0482  656E  7478
0001165700  8200  6E04  6D61  0465  0582  6176  756C  0865
0001165720  0D01  7F00  0583  8305  0515  1883  8305  051B
0001165740  1E01  7F00  0582  6F6E  6564  0070  0382  6176
0001165760  006C  0482  6168  6873  8200  6105  6168  6873
0001166000  0100  000A  837F  0504  8183  8300  0084  1601
0001166020  7F00  0382  7573  0062  0482  7974  6570  8212
0001166040  6605  616C  7367  0114  000A  837F  0507  0783
0001166060  8305  0507  1601  7F00  0482  6E69  7469  8200
0001166100  6304  6E6F  0464  0482  6E69  7263  0108  0001
0001166120  0180  0001  0180  0001  0180  0001  0180  0001
*
0001166640  0180  0001  0180  0001  0180  0001  0180  0016
0001166660  4079  8307  057D  7E83  8205  280A  6E75  6174
0001166700  6767  6465  6929  1601  7F00  8183  8300  0082
0001166720  8983  8300  0507  8183  8300  00C0  0B83  0105
0001166740  003E  827F  6904  6176  006C  0482  766C  6C61
0001166760  8200  6604  6176  006C  0782  6F6E  6564  6176
0001167000  006C  0B82  6F6E  6564  7974  6570  6176  006C
0001167020  0482  7673  6C61  8200  7006  7274  6176  006C
0001167040  0101  8000  0101  8000  0101  8000  0101  8000
*
0001167100  0101  8000  0101  8000  0101  8000  0701  7800
0001167120  0085  8308  0080  0101  8000  0101  8000  0101
0001167140  8000  0101  8000  0101  8000  0101  8000  0101
```

```
THU MAR 14 17:52:34 1991  TSLINT.DLL  PAGE 308, LINE 18114

0001167160  8000  0101  8000  0101  8000  0701  7800  0085
0001167200  8310  0080  1101  7900  0570  9683  8305  0597
0001167220  0582  6F74  656B  696E  1001  7F00  C083  8300
0001167240  0081  8183  8300  0081  0B83  0105  002D  827F
0001167260  6F08  6570  6172  6F74  0072  0582  6176  756C
0001167300  0465  0582  6C63  7361  0673  0882  6F6E  7473
0001167320  6972  7463  8208  7003  7274  010A  0001  0180
0001167340  0005  2878  8083  0100  0005  6878  8083  0100
0001167360  0005  5078  8083  0100  0005  4878  8083  0100
0001167400  0005  2078  8083  0100  0005  3878  8083  0100
0001167420  0005  1878  8083  0100  0007  8578  0088  8083
0001167440  0100  0007  8578  0098  8083  0100  0005  7878
0001167460  8083  0100  0007  8578  0080  8083  0100  0005
0001167500  7078  8083  0100  0005  5878  8083  0100  0007
0001167520  8578  1A40  9583  0105  0001  0180  0001  0180
0001167540  0001  0180  0001  0180  0004  837F  0210  0A01
0001167560  7500  8380  0081  0164  AB83  0105  000A  8075
0001167600  8183  6400  8300  0201  0501  7800  8350  0080
0001167620  0501  7800  8360  0082  0701  7800  F085  8300
0001167640  0080  0701  7800  D885  8300  0080  0701  7800
0001167660  1085  8301  0080  0701  7800  F885  8300  0080
0001167700  0701  7800  0085  8301  0080  0701  7800  A085
0001167720  8300  0080  0701  7800  0885  8301  0080  0501
0001167740  7800  8360  0080  0A01  7500  8380  0200  0064
0001167760  0183  0102  0005  7878  8083  0100  000A  8075
0001170000  0083  6402  8300  0201  0501  7800  8370  0080
0001170020  0A01  7500  8380  0200  0064  0183  0102  0007
0001170040  8578  0080  8083  0100  000A  8075  8183  6400
0001170060  8300  0201  0101  8000  0701  7A00  8373  0203
0001170100  0082  0A01  7500  8380  0081  0064  0183  0102
0001170120  0001  0180  0001  0180  0001  0180  0001  0180
*
0001171340  0001  0180  0001  0180  0005  6878  8083  0100
0001171360  0001  0180  0001  0180  0001  0180  0001  0180
*
0001171660  0001  0180  0001  0180  0001  0180  0005  6078
0001171700  8083  0100  0001  0180  0001  0180  0001  0180
0001171720  0001  0180  0001  0180  0001  0180  0001  0180
*
0001173560  0001  0180  0001  0180  0016  3079  8303  03CD
0001173600  CE83  8203  280A  6E75  6174  6767  6465  6929
0001173620  0A01  7F00  8183  8300  0081  8183  0100  001C
0001173640  827F  7006  6361  5F6B  0068  0682  6966  656C
0001173660  685F  8202  6606  6E75  5F63  0468  0101  8000
0001173700  0101  8000  0101  8000  0101  8000  0101  8000
*
0001174100  0101  8000  0501  7800  8350  0080  0501  7800
0001174120  8330  0080  0101  8000  0101  8000  0101  8000
0001174140  0101  8000  0101  8000  0101  8000  0101  8000
*
0001175040  0101  8000  0101  8000  0101  8000  0501  7800
0001175060  8300  0084  0101  8000  0101  8000  0101  8000
0001175100  0101  8000  0101  8000  0101  8000  0101  8000
*
0001175460  0101  8000  1F01  7900  9085  0700  AB83  8304
0001175500  04AC  1182  6572  705F  7461  6574  6E72  625F
0001175520  6675  6566  6972  1601  7F00  C083  8300  0081
0001175540  8183  8300  00C0  C083  8300  0080  8083  0100
0001175560  0054  827F  6206  6675  6566  0072  0982  6C61
```

THU MAR 14 17:52:34 1991 TSLINT.DLL PAGE 309, LINE 18173

```
0001175600  6F6C  6163  6574  0464  0482  7375  6465  8206
0001175620  6607  7361  6D74  7061  8208  7409  6172  736E
0001175640  616C  6574  820C  6610  7361  6D74  7061  615F
0001175660  6363  7275  7461  1065  0B82  6163  5F6E  6562
0001175700  6E5F  6C75  116C  0101  8000  0101  8000  0101
0001175720  8000  0101  8000  0101  8000  0101  8000  0101
*
0001175760  8000  0101  8000  0101  8000  1601  7900  B085
0001176000  0300  D783  8304  04D8  0882  7865  5F70  6F6E
0001176020  6564  0169  0018  8579  0090  8304  04D5  D683
0001176040  8204  280A  6E75  6174  6767  6465  6929  1801
0001176060  7900  9085  0600  CA83  8304  04CB  0A82  7528
0001176100  746E  6761  6567  2964  0169  0016  2079  8304
0001176120  04BF  C083  8204  280A  6E75  6174  6767  6465
0001176140  6929  0701  7A00  8373  04BA  0082  0D01  7F00
0001176160  BE83  8304  00C0  C083  8300  04BE  2901  7F00
0001176200  0482  706C  7274  8200  700A  7261  6D61  6E5F
0001176220  6D61  0065  0682  6572  6574  7478  8200  6E08
0001176240  7865  6E74  646F  0065  1601  7900  0620  C883
0001176260  8304  04C9  0A82  7528  746E  6761  6567  2964
0001176300  0169  0007  737A  C383  8204  0100  000A  8075
0001176320  BE83  6404  8300  0201  0701  7A00  8373  04AA
0001176340  0082  1B01  7900  0360  D983  8304  04DA  0F82
0001176360  6F66  5F72  6F6C  706F  685F  6165  6564  6972
0001176400  0701  7A00  8373  04C5  0082  0701  7A00  8373
0001176420  04BE  0082  1301  7F00  BE83  8304  04C2  C483
0001176440  8304  04C6  C783  8304  0081  2801  7F00  0482
0001176460  7072  7274  8200  7004  7470  0072  0482  7270
0001176500  6765  8200  6802  0064  0282  7661  8200  7205
0001176520  655F  746E  0100  0013  837F  04BD  C183  8304
0001176540  00C0  8183  8300  0081  8483  0100  002B  827F
0001176560  6C01  8200  7201  8204  6E04  6D61  0865  0682
0001176600  756E  626D  7265  820C  7306  6C5F  6E69  0E65
0001176620  0682  6572  6163  6573  0110  0018  8579  0080
0001176640  8304  04CD  CE83  8204  280A  6E75  6174  6767
0001176660  6465  6929  0D01  7F00  8983  8300  00C0  8183
0001176700  8300  0084  1D01  7F00  0682  6C66  6E74  6D75
0001176720  8200  7302  0870  0482  6C73  6E65  820C  7304
0001176740  6572  0E66  1601  7900  0470  D083  8304  04D1
0001176760  0A82  7528  746E  6761  6567  2964  0169  000D
0001177000  837F  04BE  C083  8300  0081  BE83  0104  0020
0001177020  827F  6E04  7865  0074  0482  616E  656D  8204
0001177040  6C06  6E65  7467  0868  0582  6176  756C  0A65
0001177060  1601  7900  0360  D383  8304  04D4  0A82  7528
0001177100  746E  6761  6567  2964  0169  000A  837F  04BE
0001177120  BE83  8304  04BE  1701  7F00  0482  656E  7478
0001177140  8200  6E04  6D61  0465  0582  6176  756C  0865
0001177160  0D01  7F00  BC83  8304  04CC  CF83  8304  04D2
0001177200  1E01  7F00  0582  6F6E  6564  0070  0382  6176
0001177220  006C  0482  6168  6873  8200  6105  6168  6873
0001177240  0100  000A  837F  04BB  8183  8300  0084  1601
0001177260  7F00  0382  7573  0062  0482  7974  6570  8212
0001177300  6605  616C  7367  0114  000A  837F  04BE  BE83
0001177320  8304  04BE  1601  7F00  0482  6E69  7469  8200
0001177340  6304  6E6F  0464  0482  6E69  7263  0108  0001
0001177360  0180  0001  0180  0001  0180  0001  0180  0001
*
0001177440  0180  0001  0180  0001  0180  0001  0180  0007
0001177460  737A  BA83  8204  0100  0001  0180  0001  0180
```

```
THU MAR 14 17:52:34 1991  TSLINT.DLL  PAGE 310, LINE 18232

0001177500  0001  0180  0001  0180  0001  0180  0001  0180
*
0001200120  0001  0180  0007  8578  0CA0  BE83  0104  0001
0001200140  0180  0001  0180  0001  0180  0001  0180  0001
*
0001200220  0180  0001  0180  0007  8578  0800  8083  0100
0001200240  0001  0180  0001  0180  0001  0180  000A  8075
0001200260  8183  6400  8303  0547  0A01  7F00  C083  8300
0001200300  0081  8183  0100  000A  8075  0083  6402  8302
0001200320  0549  0701  7F00  BE83  8304  0081  0A01  7500
0001200340  8380  0200  0064  0183  0102  0305  7078  8083
0001200360  0100  0005  7078  8083  0100  0005  2078  8083
0001200400  0100  0005  6078  8283  0100  000A  837F  04C7
0001200420  C083  8300  04BE  0A01  7500  8380  04EB  0364
0001200440  4F83  0105  0005  4078  8083  0100  0005  4078
0001200460  8083  0100  0005  3878  8083  0100  0005  7878
0001200500  8083  0100  0005  4878  8083  0100  0007  8578
0001200520  00F8  8083  0100  0007  837F  04C7  C083  0100
0001200540  000A  8075  EB83  6404  8302  0557  0A01  7F00
0001200560  C083  8300  0081  8183  0100  000A  8075  8183
0001200600  6400  8303  0559  0701  7F00  BE83  8304  04BE
0001200620  0A01  7500  8380  04EB  0264  5B83  0105  0001
0001200640  0180  0007  8578  00B8  8083  0100  0007  8578
0001200660  00A8  8083  0100  0007  837F  04BE  8183  0100
0001200700  000A  8075  0083  6402  8302  0560  0401  7F00
0001200720  BE83  0104  000A  8075  0083  6402  8301  0562
0001200740  0101  8000  0501  7800  8358  0080  0401  7F00
0001200760  C083  0100  000A  8075  EB83  6404  8301  0566
0001201000  0401  7F00  C083  0100  000A  8075  EB83  6404
0001201020  8301  0568  0501  7800  8348  0080  0401  7F00
0001201040  8183  0100  000A  8075  EB83  6404  8301  056B
0001201060  0101  8000  0A01  7F00  BE83  8304  0081  BE83
0001201100  0104  000A  8075  EB83  6404  8303  056E  0101
0001201120  8000  0501  7800  8328  0080  0A01  7F00  BE83
0001201140  8304  0081  C283  0104  000A  8075  EB83  6404
0001201160  8303  0572  0501  7800  8330  0080  0401  7F00
0001201200  BE83  0104  000A  8075  EB83  6404  8301  0575
0001201220  0A01  7F00  BE83  8304  04BE  BE83  0104  000A
0001201240  8075  EB83  6404  8303  0577  0701  7F00  BE83
0001201260  8304  04BE  0A01  7500  8380  04EB  0264  7983
0001201300  0105  0007  837F  04BE  8183  0100  000A  8075
0001201320  EB83  6404  8302  057B  0501  7800  8378  0080
0001201340  0701  7800  0885  8301  0080  0101  8000  0101
0001201360  8000  0701  7A00  8373  0203  0082  0A01  7500
0001201400  8380  0081  0064  0183  0102  0001  0180  0001
0001201420  0180  0001  0180  0001  0180  0001  0180  0001
*
0001205260  0180  0001  0180  0016  3079  8303  03F0  F183
0001205300  8203  280A  6E75  6174  6767  6465  6929  0A01
0001205320  7F00  8183  8300  0081  8183  0100  001C  827F
0001205340  7006  6361  5F6B  0068  0682  6966  656C  685F
0001205360  8202  6606  6E75  5F63  0468  0101  8000  0101
0001205400  8000  0101  8000  0101  8000  0101  8000  0101
*
0001205600  8000  0501  7800  8358  0080  0501  7800  8330
0001205620  0080  0101  8000  0101  8000  0101  8000  0101
0001205640  8000  0101  8000  0101  8000  0101  8000  0101
*
0001206200  8000  0101  8000  0501  7800  8300  0084  0101
```

THU MAR 14 17:52:34 1991 TSLINT.DLL PAGE 311, LINE 18291

```
0001206220  8000  0101  8000  0101  8000  0101  8000  0101
*
0001206600  8000  0101  8000  0101  8000  0101  8000  1F01
0001206620  7900  9085  0700  9583  8304  0496  1182  6572
0001206640  705F  7461  6574  6E72  625F  6675  6566  6972
0001206660  1601  7F00  C083  8300  0081  8183  8300  00C0
0001206700  C083  8300  0080  8083  0100  0054  827F  6206
0001206720  6675  6566  0072  0982  6C61  6F6C  6163  6574
0001206740  0464  0482  7375  6465  8206  6607  7361  6D74
0001206760  7061  8208  7409  6172  736E  616C  6574  820C
0001207000  6610  7361  6D74  7061  615F  6363  7275  7461
0001207020  1065  0B82  6163  5F6E  6562  6E5F  6C75  116C
0001207040  0101  8000  0101  8000  0101  8000  0101  8000
*
0001207120  0101  8000  1601  7900  B085  0300  C183  8304
0001207140  04C2  0882  7865  5F70  6F6E  6564  0169  0018
0001207160  8579  0090  8304  04BF  C083  8204  280A  6E75
0001207200  6174  6767  6465  6929  1801  7900  9085  0600
0001207220  B483  8304  0485  0A82  7528  746E  6761  6567
0001207240  2964  0169  0016  2079  8304  04A9  AA83  8204
0001207260  280A  6E75  6174  6767  6465  6929  0701  7A00
0001207300  8373  04A4  0082  0D01  7F00  A883  8304  00C0
0001207320  C083  8300  04A8  2901  7F00  0482  706C  7274
0001207340  8200  700A  7261  6D61  6E5F  6D61  0065  0682
0001207360  6572  6574  7478  8200  6E08  7865  6E74  646F
0001207400  0065  1601  7900  0620  B283  8304  04B3  0A82
0001207420  7528  746E  6761  6567  2964  0169  0007  737A
0001207440  AD83  8204  0100  000A  8075  A883  6404  8300
0001207460  0201  0701  7A00  8373  0494  0082  1B01  7900
0001207500  0360  C383  8304  04C4  0F82  6F66  5F72  6F6C
0001207520  706F  685F  6165  6564  6972  0701  7A00  8373
0001207540  04AF  0082  0701  7A00  8373  04A8  0082  1301
0001207560  7F00  A883  8304  04AC  AE83  8304  04B0  B183
0001207600  8304  0081  2801  7F00  0482  7072  7274  8200
0001207620  7004  7470  0072  0482  7270  6765  8200  6802
0001207640  0064  0282  7661  8200  7205  655F  746E  0100
0001207660  0013  837F  04A7  AB83  8304  00C0  8183  8300
0001207700  0081  8483  0100  002B  827F  6C01  8200  7201
0001207720  8204  6E04  6D61  0865  0682  756E  626D  7265
0001207740  820C  7306  6C5F  6E69  0E65  0682  6572  6163
0001207760  6573  0110  0018  8579  0080  8304  04B7  B883
0001210000  8204  280A  6E75  6174  6767  6465  6929  0D01
0001210020  7F00  8983  8300  00C0  8183  8300  0084  1D01
0001210040  7F00  0682  6C66  6E74  6D75  8200  7302  0870
0001210060  0482  6C73  6E65  820C  7304  6572  0E66  1601
0001210100  7900  0470  BA83  8304  04BB  0A82  7528  746E
0001210120  6761  6567  2964  0169  000D  837F  04A8  C083
0001210140  8300  0081  A883  0104  0020  827F  6E04  7865
0001210160  0074  0482  616E  656D  8204  6C06  6E65  7467
0001210200  0868  0582  6176  756C  0A65  1601  7900  0360
0001210220  BD83  8304  04BE  0A82  7528  746E  6761  6567
0001210240  2964  0169  000A  837F  04A8  A883  8304  04A8
0001210260  1701  7F00  0482  656E  7478  8200  6E04  6D61
0001210300  0465  0582  6176  756C  0865  0D01  7F00  A683
0001210320  8304  04B6  B983  8304  04BC  1E01  7F00  0582
0001210340  6F6E  6564  0070  0382  6176  006C  0482  6168
0001210360  6873  8200  6105  6168  6873  0100  000A  837F
0001210400  04A5  8183  8300  0084  1601  7F00  0382  7573
0001210420  0062  0482  7974  6570  8212  6605  616C  7367
```

```
THU MAR 14 17:52:34 1991  TSLINT.DLL  PAGE 312, LINE 18350

0001210440  0114  000A  837F  04A8  A883  8304  04A8  1601
0001210460  7F00  0482  6E69  7469  8200  6304  6E6F  0464
0001210500  0482  6E69  7263  0108  0001  0180  0001  0180
0001210520  0001  0180  0001  0180  0001  0180  0001  0180
*
0001210560  0001  0180  0005  0078  8083  0100  0001  0180
0001210600  0001  0180  0001  0180  0001  0180  0001  0180
*
0001211200  0001  0180  0001  0180  0001  0180  0007  737A
0001211220  9483  8204  0100  0001  0180  0001  0180  0001
0001211240  0180  0001  0180  0001  0180  0001  0180  0001
*
0001211300  0160  0001  0180  0001  0180  0007  837F  04A8
0001211320  8183  0100  000A  8075  1583  6405  8302  0523
0001211340  0501  7800  8358  0080  0701  7800  D885  8300
0001211360  0080  0501  7800  8360  0082  0501  7800  8378
0001211400  0080  0501  7800  8348  0080  0501  7800  8370
0001211420  0080  0701  7F00  C083  8300  0081  0A01  7500
0001211440  8380  0515  0264  2B83  0105  000A  8075  8183
0001211460  6400  8300  0201  0101  8000  0701  7A00  8373
0001211500  0203  0082  0A01  7500  8380  0081  0064  0183
0001211520  0102  0001  0180  0001  0180  0001  0180  0001
0001211540  0180  0001  0180  0001  0180  0001  0180  0001
*
0001215160  0180  0016  3079  8303  03CD  CE83  8203  280A
0001215200  6E75  6174  6767  6465  6929  0A01  7F00  8183
0001215220  8300  0081  8183  0100  001C  827F  7006  6361
0001215240  5F6B  0068  0682  6966  656C  685F  8202  6606
0001215260  6E75  5F63  0468  0101  8000  0101  8000  0101
0001215300  8000  0101  8000  0101  8000  0101  8000  0101
*
0001215460  8000  0101  8000  0101  8000  0101  8000  0501
0001215500  7800  8350  0080  0501  7800  8330  0080  0101
0001215520  8000  0101  8000  0101  8000  0101  8000  0101
*
0001217160  8000  0101  8000  1F01  7900  9085  0700  BE83
0001217200  8304  04BF  1182  6572  705F  7461  6574  6E72
0001217220  625F  6675  6566  6972  1601  7F00  C083  8300
0001217240  0081  8183  8300  00C0  C083  8300  0080  8083
0001217260  0100  0054  827F  6206  6675  6566  0072  0982
0001217300  6C61  6F6C  6163  6574  0464  0482  7375  6465
0001217320  8206  6607  7361  6D74  7061  8208  7409  6172
0001217340  736E  616C  6574  820C  6610  7361  6D74  7061
0001217360  615F  6363  7275  7461  1065  0B82  6163  5F6E
0001217400  6562  6E5F  6C75  116C  0101  8000  0101  8000
0001217420  0101  8000  0101  8000  0101  8000  0101  8000
*
0001217460  0101  8000  0101  8000  0101  8000  1601  7900
0001217500  B085  0300  EA83  8304  04EB  0882  7865  5F70
0001217520  6F6E  6564  0169  0018  8579  0090  8304  04E8
0001217540  E983  8204  280A  6E75  6174  6767  6465  6929
0001217560  1801  7900  9085  0600  DD83  8304  04DE  0A82
0001217600  7528  746E  6761  6567  2964  0169  0016  2079
0001217620  8304  04D2  D383  8204  280A  6E75  6174  6767
0001217640  6465  6929  0701  7A00  8373  04CD  0082  0D01
0001217660  7F00  D183  8304  00CD  C083  8300  04D1  2901
0001217700  7F00  0482  706C  7274  8200  700A  7261  6D61
0001217720  6E5F  6D61  0065  0682  6572  6574  7478  8200
0001217740  6E08  7865  6E74  646F  0065  1601  7900  0620
```

```
THU MAR 14 17:52:34 1991  TSLINT.DLL  PAGE 313, LINE 18409

0001217760  DB83  8304  04DC  0A82  7528  746E  6761  6567
0001220000  2964  0169  0007  737A  D683  8204  0100  000A
0001220020  8075  D183  6404  8300  0201  0701  7A00  8373
0001220040  04BD  0082  1B01  7900  0360  EC83  8304  04ED
0001220060  0F82  6F66  5F72  6F6C  706F  685F  6165  6564
0001220100  6972  0701  7A00  8373  04D8  0082  0701  7A00
0001220120  8373  04D1  0082  1301  7F00  D183  8304  04D5
0001220140  D783  8304  04D9  DA83  8304  0081  2801  7F00
0001220160  0482  7072  7274  8200  7004  7470  0072  0482
0001220200  7270  6765  8200  6802  0064  0282  7661  8200
0001220220  7205  655F  746E  0100  0013  837F  04D0  D483
0001220240  8304  00C0  8183  8300  0081  8483  0100  002B
0001220260  827F  6CD1  8200  7201  8204  6E04  6D61  0865
0001220300  0682  756E  626D  7265  820C  7306  6C5F  6E69
0001220320  0E65  0682  6572  6163  6573  0110  0018  8579
0001220340  0080  8304  04E0  E183  8204  280A  6E75  6174
0001220360  6767  6465  6929  0D01  7F00  8983  8300  00C0
0001220400  8183  8300  0084  1D01  7F00  0682  6C66  6E74
0001220420  6D75  8200  7302  0870  0482  6C73  6E65  820C
0001220440  7304  6572  0E66  1601  7900  0470  E383  8304
0001220460  04E4  0A82  7528  746E  6761  6567  2964  0169
0001220500  000D  837F  04D1  C083  8300  0081  D183  0104
0001220520  0020  827F  6E04  7865  0074  0482  616E  656D
0001220540  8204  6C06  6E65  7467  0868  0582  6176  756C
0001220560  0A65  1601  7900  0360  E683  8304  04E7  0A82
0001220600  7528  746E  6761  6567  2964  0169  000A  837F
0001220620  04D1  D183  8304  04D1  1701  7F00  0482  656E
0001220640  7478  8200  6E04  6D61  0465  0582  6176  756C
0001220660  0865  0D01  7F00  CF83  8304  04DF  E283  8304
0001220700  04E5  1E01  7F00  0582  6F6E  6564  0070  0382
0001220720  6176  006C  0482  6168  6873  8200  6105  6168
0001220740  6873  0100  000A  837F  04CE  8183  8300  0084
0001220760  1601  7F00  0382  7573  0062  0482  7974  6570
0001221000  8212  6605  616C  7367  0114  000A  837F  04D1
0001221020  D183  8304  04D1  1601  7F00  0482  6E69  7469
0001221040  8200  6304  6E6F  0464  0482  6E69  7263  0108
0001221060  0001  0180  0001  0180  0001  0180  0001  0180
*
0001221640  0001  0180  0001  0180  0007  8578  0800  8083
0001221660  0100  0001  0180  0001  0180  0001  0180  0001
0001221700  0180  0001  0180  0001  0180  0001  0180  0001
*
0001221740  0180  0001  0180  0001  0180  000A  8075  0083
0001221760  6402  8300  0201  0101  8000  0501  7800  8378
0001222000  0080  0501  7800  8320  0080  0501  7800  8360
0001222020  0082  0701  7800  6885  8301  0080  0701  7800
0001222040  2885  8301  0080  0701  7800  D085  8300  0080
0001222060  0501  7800  8308  0080  0501  7800  8340  0080
0001222100  0701  7800  E085  8300  0080  0701  7800  1885
0001222120  8301  0080  0701  7800  E885  8300  0080  0701
0001222140  7800  F885  8300  0080  0A01  7500  8380  0200
0001222160  0064  0183  0102  0001  0180  0005  7078  8083
0001222200  0100  0001  0180  0001  0180  0001  0180  0001
0001222220  0180  0001  0180  0001  0180  0001  0180  0001
*
0001226420  0180  0001  0180  0001  0180  0007  737A  2783
0001226440  8204  0100  000A  8075  8183  7300  8300  0201
0001226460  0101  8000  0101  8000  0101  8000  0101  8000
*
```

THU MAR 14 17:52:34 1991 TSLINT.DLL PAGE 314, LINE 18468

```
0001227140  1F01  7900  9085  0700  7583  8304  0476  1182
0001227160  6572  705F  7461  6574  6E72  625F  6675  6566
0001227200  6972  1601  7F00  C083  8300  0081  8183  8300
0001227220  00C0  C083  8300  0080  8083  0100  0054  827F
0001227240  6206  6675  6566  0072  0982  6C61  6F6C  6163
0001227260  6574  0464  0482  7375  6465  8206  6607  7361
0001227300  6D74  7061  8208  7409  6172  736E  616C  6574
0001227320  820C  6610  7361  6D74  7061  615F  6363  7275
0001227340  7461  1065  0B82  6163  5F6E  6562  6E5F  6C75
0001227360  116C  0101  8000  0101  8000  0101  8000  0101
0001227400  8000  0101  8000  0101  8000  0101  8000  0101
*
0001227440  8000  0101  8000  1601  7900  B085  0300  A183
0001227460  8304  04A2  0882  7865  5F70  6F6E  6564  0169
0001227500  0018  8579  0090  8304  049F  A083  8204  280A
0001227520  6E75  6174  6767  6465  6929  1801  7900  9085
0001227540  0600  9483  8304  0495  0A82  7528  746E  6761
0001227560  6567  2964  0169  0016  2079  8304  0489  8A83
0001227600  8204  280A  6E75  6174  6767  6465  6929  0701
0001227620  7A00  8373  0484  0082  0D01  7F00  8883  8304
0001227640  00C0  C083  8300  0488  2901  7F00  0482  706C
0001227660  7274  8200  700A  7261  6D61  6E5F  6D61  0065
0001227700  0682  6572  6574  7478  8200  6E08  7865  6E74
0001227720  646F  0065  1601  7900  0620  9283  8304  0493
0001227740  0A82  7528  746E  6761  6567  2964  0169  0007
0001227760  737A  8D83  8204  0100  000A  8075  8883  6404
0001230000  8300  0201  0701  7A00  8373  0474  0082  1B01
0001230020  7900  0360  A383  8304  04A4  0F82  6F66  5F72
0001230040  6F6C  706F  685F  6165  6564  6972  0701  7A00
0001230060  8373  048F  0082  0701  7A00  8373  0488  0082
0001230100  1301  7F00  8883  8304  048C  8E83  8304  0490
0001230120  9183  8304  0081  2801  7F00  0482  7072  7274
0001230140  8200  7004  7470  0072  0482  7270  6765  8200
0001230160  6802  0064  0282  7661  8200  7205  655F  746E
0001230200  0100  0013  837F  0487  8B83  8304  00C0  8183
0001230220  8300  0081  8483  0100  002B  827F  6C01  8200
0001230240  7201  8204  6E04  6D61  0865  0682  756E  626D
0001230260  7265  820C  7306  6C5F  6E69  0E65  0682  6572
0001230300  6163  6573  0110  0018  8579  0080  8304  0497
0001230320  9883  8204  280A  6E75  6174  6767  6465  6929
0001230340  0D01  7F00  8983  8300  00C0  8183  8300  0084
0001230360  1D01  7F00  0682  6C66  6E74  6D75  8200  7302
0001230400  0870  0482  6C73  6E65  820C  7304  6572  0E66
0001230420  1601  7900  0470  9A83  8304  049B  0A82  7528
0001230440  746E  6761  6567  2964  0169  000D  837F  0488
0001230460  C083  8300  0081  8883  0104  0020  827F  6E04
0001230500  7865  0074  0482  616E  656D  8204  6C06  6E65
0001230520  7467  0868  0582  6176  756C  0A65  1601  7900
0001230540  0360  9D83  8304  049E  0A82  7528  746E  6761
0001230560  6567  2964  0169  000A  837F  0488  8883  8304
0001230600  0488  1701  7F00  0482  656E  7478  8200  6E04
0001230620  6D61  0465  0582  6176  756C  0865  0D01  7F00
0001230640  8683  8304  0496  9983  8304  049C  1E01  7F00
0001230660  0582  6F6E  6564  0070  0382  6176  006C  0482
0001230700  6168  6873  8200  6105  6168  6873  0100  000A
0001230720  837F  0485  8183  8300  0084  1601  7F00  0382
0001230740  7573  0062  0482  7974  6570  8212  6605  616C
0001230760  7367  0114  000A  837F  0488  8883  8304  0488
0001231000  1601  7F00  0482  6E69  7469  8200  6304  6E6F
```

THU MAR 14 17:52:34 1991 TSLINT.DLL PAGE 315, LINE 18527

```
0001231020  0464 0482 6E69 7263 0108 0001 0180 0001
0001231040  0180 0001 0180 0001 0180 0001 0180 0001
*
0001231600  0180 0007 8578 0800 8083 0100 0007 8578
0001231620  0090 8183 0100 0005 2078 8083 0100 000A
0001231640  8075 8183 6400 8300 0201 0101 8000 0101
0001231660  8000 0101 8000 0101 8000 0101 8000 0101
*
0001234520  8000 0101 8000 0101 8000 0701 7A00 8373
0001234540  036E 0082 0A01 7500 8380 0081 0064 0183
0001234560  0102 0001 0180 0001 0180 0001 0180 0001
0001234600  0180 0001 0180 0001 0180 0001 0180 0001
*
0001235440  0180 0001 0180 0001 0180 0016 3079 8303
0001235460  03DE DF83 8203 280A 6E75 6174 6767 6465
0001235500  6929 0A01 7F00 8183 8300 0081 8183 0100
0001235520  001C 827F 7006 6361 5F6B 0068 0682 6966
0001235540  656C 685F 8202 6606 6E75 5F63 0468 0101
0001235560  8000 0101 8000 0101 8000 0101 8000 0101
*
0001235760  8000 0101 8000 0501 7800 8348 0080 0501
0001236000  7800 8330 0080 0101 8000 0101 8000 0101
0001236020  8000 0101 8000 0101 8000 0101 8000 0101
*
0001240420  8000 0101 8000 0101 8000 0101 8000 0701
0001240440  7A00 8373 054B 0082 0A01 7500 8380 0081
0001240460  0073 0183 0102 0001 0180 0001 0180 0001
0001240500  0180 0001 0180 0001 0180 0001 0180 0001
*
0001240600  0180 000A 8075 8183 7300 8300 0201 0101
0001240620  8000 0501 7800 8350 0080 0501 7800 8338
0001240640  0080 0501 7800 8360 0082 0501 7800 8370
0001240660  0080 0401 7F00 4A83 0105 000A 8075 0083
0001240700  7302 8301 0565 0101 8000 0701 7800 9885
0001240720  8300 0080 0501 7800 8320 0080 0A01 7500
0001240740  8380 0081 0064 0183 0102 0001 0180 0007
0001240760  737A 0383 8202 0100 000A 8075 8183 6400
0001241000  8300 0201 0101 8000 0101 8000 0101 8000
0001241020  0101 8000 0101 8000 0101 8000 0101 8000
*
0001243060  0101 8000 0501 7800 8360 0080 0101 8000
0001243100  0101 8000 0101 8000 0101 8000 0101 8000
*
0001250300  0701 7800 0085 8308 0080 0101 8000 0101
0001250320  8000 0101 8000 0101 8000 0101 8000 0101
*
0001250460  8000 1601 7900 0330 CE83 8305 05CF 0A82
0001250500  7528 746E 6761 6567 2964 0169 000A 837F
0001250520  0081 8183 8300 0081 1C01 7F00 0682 6170
0001250540  6B63 685F 8200 6606 6C69 5F65 0268 0682
0001250560  7566 636E 685F 0104 0001 0180 0001 0180
0001250600  0001 0180 0001 0180 0001 0180 0001 0180
*
0001251000  0005 4878 8083 0100 0005 3078 8083 0100
0001251020  0001 0180 0001 0180 0001 0180 0001 0180
*
0001251360  0001 0180 0005 0078 8483 0100 0001 0180
0001251400  0001 0180 0001 0180 0001 0180 0001 0180
*
```

THU MAR 14 17:52:34 1991 TSLINT.DLL PAGE 316, LINE 18586

| | | | | | | | | |
|---|---|---|---|---|---|---|---|---|
| 0001251760 | 0001 | 0180 | 0001 | 0180 | 0001 | 0180 | 001F | 8579 |
| 0001252000 | 0090 | 8307 | 066F | 7083 | 8206 | 7211 | 5F65 | 6170 |
| 0001252020 | 7474 | 7265 | 5F6E | 7562 | 6666 | 7265 | 0169 | 0016 |
| 0001252040 | 837F | 00CD | 8183 | 8300 | 0081 | C083 | 8300 | 00C0 |
| 0001252060 | 8083 | 8300 | 0080 | 5401 | 7F00 | 0682 | 7562 | 6666 |
| 0001252100 | 7265 | 8200 | 6109 | 6C6C | 636F | 7461 | 6465 | 8204 |
| 0001252120 | 7504 | 6573 | 0664 | 0782 | 6166 | 7473 | 616D | 0870 |
| 0001252140 | 0982 | 7274 | 6E61 | 6C73 | 7461 | 0C65 | 1082 | 6166 |
| 0001252160 | 7473 | 616D | 5F70 | 6361 | 7563 | 6172 | 6574 | 8210 |
| 0001252200 | 630B | 6E61 | 625F | 5F65 | 756E | 6C6C | 0111 | 0001 |
| 0001252220 | 0180 | 0001 | 0180 | 0001 | 0180 | 0001 | 0180 | 0001 |
| * | | | | | | | | |
| 0001252300 | 0180 | 0016 | 8579 | 00B0 | 8303 | 069B | 9C83 | 8206 |
| 0001252320 | 6508 | 7078 | 6E5F | 646F | 6965 | 1801 | 7900 | 9085 |
| 0001252340 | 0400 | 9983 | 8306 | 069A | 0A82 | 7528 | 746E | 6761 |
| 0001252360 | 6567 | 2964 | 0169 | 0018 | 8579 | 0090 | 8306 | 068E |
| 0001252400 | 8F83 | 8206 | 280A | 6E75 | 6174 | 6767 | 6465 | 6929 |
| 0001252420 | 1601 | 7900 | 0420 | 8383 | 8306 | 0684 | 0A82 | 7528 |
| 0001252440 | 746E | 6761 | 6567 | 2964 | 0169 | 0007 | 737A | 7E83 |
| 0001252460 | 8206 | 0100 | 000D | 837F | 0682 | C083 | 8300 | 00C0 |
| 0001252500 | 8283 | 0106 | 0029 | 827F | 6C04 | 7470 | 0072 | 0A82 |
| 0001252520 | 6170 | 6172 | 5F6D | 616E | 656D | 8200 | 7206 | 7465 |
| 0001252540 | 7865 | 0074 | 0882 | 656E | 7478 | 6F6E | 6564 | 0100 |
| 0001252560 | 0016 | 2079 | 8306 | 068C | 8D83 | 8206 | 280A | 6E75 |
| 0001252600 | 6174 | 6767 | 6465 | 6929 | 0701 | 7A00 | 8373 | 0687 |
| 0001252620 | 0082 | 0A01 | 7500 | 8380 | 0682 | 0064 | 0183 | 0102 |
| 0001252640 | 0007 | 737A | 6E83 | 8206 | 0100 | 001B | 6079 | 8303 |
| 0001252660 | 069D | 9E83 | 8206 | 660F | 726F | 6C5F | 6F6F | 5F70 |
| 0001252700 | 6568 | 6461 | 7265 | 0169 | 0007 | 737A | 8983 | 8206 |
| 0001252720 | 0100 | 0007 | 737A | 8283 | 8206 | 0100 | 0013 | 837F |
| 0001252740 | 0682 | 8683 | 8306 | 0688 | 8A83 | 8306 | 068B | 8183 |
| 0001252760 | 0100 | 0028 | 827F | 7204 | 7470 | 0072 | 0482 | 7070 |
| 0001253000 | 7274 | 8200 | 7004 | 6572 | 0067 | 0282 | 6468 | 8200 |
| 0001253020 | 6102 | 0076 | 0582 | 5F72 | 6E65 | 0074 | 1301 | 7F00 |
| 0001253040 | 8183 | 8306 | 0685 | C083 | 8300 | 0081 | 8183 | 8300 |
| 0001253060 | 0084 | 2B01 | 7F00 | 0182 | 006C | 0182 | 0472 | 0482 |
| 0001253100 | 616E | 656D | 8208 | 6E06 | 6D75 | 6562 | 0C72 | 0682 |
| 0001253120 | 5F73 | 696C | 656E | 820E | 7206 | 6365 | 7361 | 1065 |
| 0001253140 | 1801 | 7900 | 8085 | 0400 | 9183 | 8306 | 0692 | 0A82 |
| 0001253160 | 7528 | 746E | 6761 | 6567 | 2964 | 0169 | 000D | 837F |
| 0001253200 | 0089 | C083 | 8300 | 0081 | 8483 | 0100 | 001D | 827F |
| 0001253220 | 6606 | 746C | 756E | 006D | 0282 | 7073 | 8208 | 7304 |
| 0001253240 | 656C | 0C6E | 0482 | 7273 | 6665 | 010E | 0016 | 7079 |
| 0001253260 | 8304 | 0694 | 9583 | 8206 | 280A | 6E75 | 6174 | 6767 |
| 0001253300 | 6465 | 6929 | 0D01 | 7F00 | 8283 | 8306 | 00C0 | 8183 |
| 0001253320 | 8300 | 0682 | 2001 | 7F00 | 0482 | 656E | 7478 | 8200 |
| 0001253340 | 6E04 | 6D61 | 0465 | 0682 | 656C | 676E | 6874 | 8208 |
| 0001253360 | 7605 | 6C61 | 6575 | 010A | 0016 | 6079 | 8303 | 0697 |
| 0001253400 | 9883 | 8206 | 280A | 6E75 | 6174 | 6767 | 6465 | 6929 |
| 0001253420 | 0A01 | 7F00 | 8283 | 8306 | 0682 | 8283 | 0106 | 0017 |
| 0001253440 | 827F | 6E04 | 7865 | 0074 | 0482 | 616E | 656D | 8204 |
| 0001253460 | 7605 | 6C61 | 6575 | 0108 | 000D | 837F | 0680 | 9083 |
| 0001253500 | 8306 | 0693 | 9683 | 0106 | 001E | 827F | 6E05 | 646F |
| 0001253520 | 7065 | 8200 | 7603 | 6C61 | 8200 | 6804 | 7361 | 0068 |
| 0001253540 | 0582 | 6861 | 7361 | 0068 | 0A01 | 7F00 | 7F83 | 8306 |
| 0001253560 | 0081 | 8483 | 0100 | 0016 | 827F | 7303 | 6275 | 8200 |
| 0001253600 | 7404 | 7079 | 1265 | 0582 | 6C66 | 6761 | 1473 | 0A01 |
| 0001253620 | 7F00 | 8283 | 8306 | 0682 | 8283 | 0106 | 0016 | 827F |
| 0001253640 | 6904 | 696E | 0074 | 0482 | 6F63 | 646E | 8204 | 6904 |

```
THU MAR 14 17:52:34 1991  TSLINT.DLL  PAGE 317, LINE 18645

0001253660  636E  0872  1201  7900  0470  A083  8306  06A1
0001253700  0682  6573  7261  6863  0169  000D  837F  0081
0001253720  8B83  8306  0682  8283  0106  0027  827F  6E07
0001253740  6D75  656C  7466  8200  6107  7272  705F  7274
0001253760  8202  6206  6375  656B  0674  0682  6572  7674
0001254000  6C61  010A  0001  0180  0001  0180  0001  0180
0001254020  0001  0180  0001  0180  0001  0180  0001  0180
*
0001254060  0001  0180  0001  0180  0007  737A  7E83  8206
0001254100  0100  0001  0180  0001  0180  0001  0180  0001
0001254120  0180  0001  0180  0001  0180  0001  0180  0001
*
0001254300  0180  0001  0180  0007  737A  9F83  8206  0100
0001254320  0001  0180  0001  0180  0001  0180  0001  0180
*
0001254620  0007  8578  0090  8183  0100  0001  0180  0001
0001254640  0180  0001  0180  0001  0180  0001  0180  0001
*
0001254700  0180  0004  837F  0682  0A01  7500  8380  0081
0001254720  0164  0D83  0107  0005  5078  8083  0100  0005
0001254740  5078  8083  0100  0005  2078  8083  0100  0005
0001254760  6078  8283  0100  0005  3878  8083  0100  0005
0001255000  5878  8083  0100  0005  7878  8083  0100  0005
0001255020  6878  8083  0100  0005  7078  8083  0100  0005
0001255040  4078  8083  0100  0007  8578  00E0  8083  0100
0001255060  0007  8578  0080  8083  0100  0007  8578  0108
0001255100  8083  0100  0007  8578  0098  8083  0100  0007
0001255120  8578  00E8  8083  0100  0005  6078  8083  0100
0001255140  0007  8578  0088  8083  0100  0007  8578  00B8
0001255160  8083  0100  0007  8578  00A0  8083  0100  0005
0001255200  2878  8083  0100  0007  8578  0140  8083  0100
0001255220  0007  8578  0120  8083  0100  0005  1078  8083
0001255240  0100  0004  837F  0682  0A01  7500  8380  06AF
0001255260  0164  2683  0107  0007  8578  01D8  8083  0100
0001255300  0007  8578  00B0  8083  0100  0007  8578  00F8
0001255320  8083  0100  0007  837F  068B  8983  0100  000A
0001255340  8075  0083  6402  8302  072B  0501  7800  8370
0001255360  0080  0401  7F00  8283  0106  000A  8075  8183
0001255400  6400  8301  072E  0501  7800  8378  0080  0401
0001255420  7F00  C083  0100  000A  8075  8183  6400  8301
0001255440  0731  0701  7F00  8283  8306  0682  0A01  7500
0001255460  8380  0081  0264  3383  0107  0004  837F  0682
0001255500  0A01  7500  8380  06AF  0164  3583  0107  0004
0001255520  837F  068B  0A01  7500  8380  0081  0164  3783
0001255540  0107  0005  4078  8083  0100  0005  1878  8083
0001255560  0100  000A  8075  0083  6402  8300  0201  0701
0001255600  7800  8085  8300  0080  0701  7800  F085  8300
0001255620  0080  0A01  7500  8380  0200  0064  0183  0102
0001255640  0007  8578  00D8  8083  0100  000A  8075  8183
0001255660  6400  8300  0201  0101  8000  1601  7900  0330
0001255700  0383  8302  0204  0A82  7528  746E  6761  6567
0001255720  2964  0169  000A  837F  0081  8183  8300  0081
0001255740  1C01  7F00  0682  6170  6B63  685F  8200  6606
0001255760  6C69  5F65  0268  0682  7566  636E  685F  0104
0001256000  0001  0180  0001  0180  0001  0180  0001  0180
*
0001256200  0001  0180  0001  0180  0001  0180  0005  5878
0001256220  8083  0100  0005  3078  8083  0100  0001  0180
0001256240  0001  0180  0001  0180  0001  0180  0001  0180
```

```
THU MAR 14 17:52:34 1991  TSLINT.DLL  PAGE 318, LINE 18704

*
0001257220  0001  0180  0001  0180  0001  0180  0005  6078
0001257240  8083  0100  0001  0180  0001  0180  0001  0180
0001257260  0001  0180  0001  0180  0001  0180  0001  0180
*
0001261100  0001  0180  0001  0180  0007  737A  9583  8203
0001261120  0100  000A  8075  8183  6400  8300  0201  0101
0001261140  8000  0101  8000  0101  8000  0101  8000  0101
*
0001265760  8000  1F01  7900  9085  0700  FC83  8305  05FD
0001266000  1182  6572  705F  7461  6574  6E72  625F  6675
0001266020  6566  6972  1601  7F00  C083  8300  0081  8183
0001266040  8300  00C0  C083  8300  0080  8083  0100  0054
0001266060  827F  6206  6675  6566  0072  0982  6C61  6F6C
0001266100  6163  6574  0464  0482  7375  6465  8206  6607
0001266120  7361  6D74  7061  8208  7409  6172  736E  616C
0001266140  6574  820C  6610  7361  6D74  7061  615F  6363
0001266160  7275  7461  1J65  0B82  6163  5F6E  6562  6E5F
0001266200  6C75  116C  0101  8000  0101  8000  0101  8000
0001266220  0101  8000  0101  8000  0101  8000  0101  8000
*
0001266260  0101  8000  0101  8000  1601  7900  B085  0300
0001266300  2883  8306  0629  0882  7865  5F70  6F6E  6564
0001266320  0169  0018  8579  0090  8304  0626  2783  8206
0001266340  280A  6E75  6174  6767  6465  6929  1801  7900
0001266360  9085  0600  1B83  8306  061C  0A82  7528  746E
0001266400  6761  6567  2964  0169  0016  2079  8304  0610
0001266420  1183  8206  280A  6E75  6174  6767  6465  6929
0001266440  0701  7A00  8373  060B  0082  0D01  7F00  0F83
0001266460  8306  00C0  C083  8300  060F  2901  7F00  0482
0001266500  706C  7274  8200  700A  7261  6D61  6E5F  6D61
0001266520  0065  0682  6572  6574  7478  8200  6E08  7865
0001266540  6E74  646F  0065  1601  7900  0620  1983  8306
0001266560  061A  0A82  7528  746E  6761  6567  2964  0169
0001266600  0007  737A  1483  8206  0100  000A  8075  0F83
0001266620  6406  8300  0201  0701  7A00  8373  05FB  0082
0001266640  1B01  7900  0360  2A83  8306  062B  0F82  6F66
0001266660  5F72  6F6C  706F  685F  6165  6564  6972  0701
0001266700  7A00  8373  0616  0082  0701  7A00  8373  060F
0001266720  0082  1301  7F00  0F83  8306  0613  1583  8306
0001266740  0617  1883  8306  0081  2801  7F00  0482  7072
0001266760  7274  8200  7004  7470  0072  0482  7270  6765
0001267000  8200  6802  0064  0282  7661  8200  7205  655F
0001267020  746E  0100  0013  837F  060E  1283  8306  00C0
0001267040  8183  8300  0081  8483  0100  002B  827F  6C01
0001267060  8200  7201  8204  6E04  6D61  0865  0682  756E
0001267100  626D  7265  820C  7306  6C5F  6E69  0E65  0682
0001267120  6572  6163  6573  0110  0018  8579  0080  8304
0001267140  061E  1F83  8206  280A  6E75  6174  6767  6465
0001267160  6929  0D01  7F00  8983  8300  00C0  8183  8300
0001267200  0084  1D01  7F00  0682  6C66  6E74  6D75  8200
0001267220  7302  0870  0482  6C73  6E65  820C  7304  6572
0001267240  0E66  1601  7900  0470  2183  8306  0622  0A82
0001267260  752B  746E  6761  6567  2964  0169  000D  837F
0001267300  060F  C083  8300  0081  0F83  0106  0020  827F
0001267320  6E04  7865  0074  0482  616E  656D  8204  6C06
0001267340  6E65  7467  0868  0582  6176  756C  0A65  1601
0001267360  7900  0360  2483  8306  0625  0A82  7528  746E
0001267400  6761  6567  2964  0169  000A  837F  060F  0F83
```

```
THU MAR 14 17:52:34 1991  TSLINT.DLL  PAGE 319, LINE 18763

0001267420  8306  060F  1701  7F00  0482  656E  7478  8200
0001267440  6E04  6D61  0465  0582  6176  756C  0865  0D01
0001267460  7F00  0D83  8306  061D  2083  8306  0623  1E01
0001267500  7F00  0582  6F6E  6564  0070  0382  6176  006C
0001267520  0482  6168  6873  8200  6105  6168  6873  0100
0001267540  000A  837F  060C  8183  8300  0084  1601  7F00
0001267560  0382  7573  0062  0482  7974  6570  8212  6605
0001267600  616C  7367  0114  000A  837F  060F  0F83  8306
0001267620  060F  1601  7F00  0482  6E69  7469  8200  6304
0001267640  6E6F  0464  0482  6E69  7263  0108  0001  0180
0001267660  0001  0180  0001  0180  0001  0180  0001  0180
*
0001270400  0001  0180  0001  0180  0001  0180  0007  8578
0001270420  0090  8183  0100  0001  0180  0001  0180  0001
0001270440  0180  0001  0180  0001  0180  0001  0180  000A
0001270460  8075  8583  6400  8301  068C  0401  7F00  0F83
0001270500  0106  0004  837F  0081  0A01  7500  8380  0081
0001270520  0173  8D83  0106  0001  0180  0005  5078  8083
0001270540  0100  0005  3878  8083  0100  0005  6078  8283
0001270560  0100  0005  4078  8083  0100  0007  8578  00B8
0001270600  8083  0100  000A  8075  0083  7302  8300  0201
0001270620  0501  7800  8320  0080  0A01  7500  8380  0200
0001270640  0073  0183  0102  000A  8075  0083  7302  8300
0001270660  0201  0101  8000  0701  7800  8885  8300  0080
0001270700  0A01  7500  8380  0081  0064  0183  0102  0001
0001270720  0180  0007  8578  0080  8083  0100  0005  4878
0001270740  8083  0100  0007  8578  00B0  8083  0100  0007
0001270760  8578  00A0  8083  0100  0007  8578  0090  8083
0001271000  0100  0007  8578  00C8  8083  0100  0004  837F
0001271020  060F  0A01  7500  8380  0200  0164  A383  0106
0001271040  0007  8578  0138  8083  0100  0007  8578  0130
0001271060  8083  0100  0004  837F  060F  0A01  7500  8380
0001271100  0085  0164  A783  0106  0001  0180  0005  7878
0001271120  8083  0100  0005  2878  8083  0100  0007  8578
0001271140  00E0  8083  0100  000A  8075  0083  6402  8300
0001271160  0201  0101  8000  0A01  7500  8380  0200  0064
0001271200  0183  0102  000A  8075  0083  6402  8300  0201
0001271220  0A01  7500  8380  0200  0064  0183  0102  000A
0001271240  8075  0083  6402  8300  0201  0101  8000  0701
0001271260  7800  C085  8300  0080  0A01  7500  8380  0200
0001271300  0064  0183  0102  0001  0180  0007  8578  0098
0001271320  8083  0100  000A  8075  8183  6400  8300  0201
0001271340  0101  8000  0701  7A00  8373  0203  0082  0A01
0001271360  7500  8380  0081  0064  0183  0102  0001  0180
0001271400  0001  0180  0001  0180  0001  0180  0001  0180
*
0001272740  0001  0180  0016  3079  8303  02BF  C083  8202
0001272760  280A  6E75  6174  6767  6465  6929  0A01  7F00
0001273000  8183  8300  0081  8183  0100  001C  827F  7006
0001273020  6361  5F6B  0068  0682  6966  656C  685F  8202
0001273040  6606  6E75  5F63  0468  0101  8000  0101  8000
0001273060  0101  8000  0101  8000  0101  8000  0101  8000
*
0001273260  0501  7800  8348  0080  0501  7800  8330  0080
0001273300  0101  8000  0101  8000  0101  8000  0101  8000
*
0001274040  0101  8000  0501  7800  8360  0080  0101  8000
0001274060  0101  8000  0101  8000  0101  8000  0101  8000
*
```

```
THU MAR 14 17:52:34 1991  TSLINT.DLL  PAGE 320, LINE 18822

0001300620  0101  8000  0701  7800  0085  8308  0080  0101
0001300640  8000  0101  8000  0101  8000  0101  8000  0101
*
0001300740  8000  0101  8000  0101  8000  0701  7F00  C083
0001300760  8300  0000  0A01  7500  8380  0200  0264  AD83
0001301000  0105  0001  0180  0005  5078  8083  0100  0005
0001301020  2078  8083  0100  0005  6078  8283  0100  0005
0001301040  7078  8083  0100  0007  8578  0088  8083  0100
0001301060  0004  837F  0081  0A01  7500  8380  0200  0164
0001301100  B583  0105  0001  0180  0005  7878  8083  0100
0001301120  0007  837F  00C0  0083  0100  000A  8075  0083
0001301140  6402  8302  05B9  0101  8000  0501  7800  8340
0001301160  0080  0701  7F00  C083  8300  0000  0A01  7500
0001301200  8380  0200  0264  BD83  0105  0005  6078  8083
0001301220  0100  0007  837F  00C0  0083  0100  000A  8075
0001301240  0083  6402  8302  05C0  0501  7800  8330  0080
0001301260  0401  7F00  C083  0100  000A  8075  8183  6400
0001301300  8301  05C3  0101  8000  0101  8000  0101  8000
0001301320  0101  8000  0101  8000  0101  8000  0101  8000
*
0001301540  0501  7800  8368  0080  0101  8000  0101  8000
0001301560  0101  8000  0101  8000  0701  7800  0085  8301
0001301600  0080  0101  8000  0101  8000  0101  8000  0101
0001301620  8000  0101  8000  0101  8000  0101  8000  0101
*
0001303000  8000  0701  7A00  8373  00C0  0082  0101  8000
0001303020  0101  8000  0101  8000  0101  8000  0101  8000
*
0001304660  0101  8000  1801  7900  1085  0201  B983  8303
0001304700  03BA  0A82  7528  746E  6761  6567  2964  0169
0001304720  0007  837F  022C  8183  0100  000F  827F  6E04
0001304740  6D61  0065  0482  7974  6570  0120  0018  8579
0001304760  0930  830D  03BE  BF83  8203  280A  6E75  6174
0001305000  6767  6465  6929  0701  7800  2085  8303  0080
0001305020  0701  7A00  8373  03B8  0082  2801  7F00  2C83
0001305040  8302  0081  2C83  8302  0082  BC83  8303  03BC
0001305060  C083  8300  00C0  C083  8300  00C0  8183  8300
0001305100  0085  BD83  0103  00A1  827F  6E04  6D61  0065
0001305120  0482  7974  6570  8220  6106  7475  6F68  2272
0001305140  0482  6164  6574  8242  6608  6E75  7463  6F69
0001305160  466E  0882  7073  6365  725F  6665  AA85  8200
0001305200  640B  7365  7263  7069  6974  6E6F  0E85  8201
0001305220  6307  6D6F  656D  746E  1285  8201  6610  746C
0001305240  5F72  6573  7261  6863  705F  7461  8568  0116
0001305260  0E82  6374  635F  6165  6372  5F68  6170  6874
0001305300  1A85  8201  6405  6D75  796D  1E85  8201  7009
0001305320  7261  6D61  635F  746E  2085  8201  7009  7261
0001305340  6D61  6C5F  7473  2285  0101  0001  0180  0001
0001305360  0180  0001  0180  0001  0180  0001  0180  0001
0001305400  0180  0007  737A  BB83  8203  0100  0001  0180
0001305420  0001  0180  0001  0180  0001  0180  0001  0180
0001305440  0001  0180  0001  0180  0001  0180  0016  3079
0001305460  8303  03D0  D183  8203  280A  6E75  6174  6767
0001305500  6465  6929  0A01  7F00  8183  8300  0081  8183
0001305520  0100  001C  827F  7006  6361  5F6B  0068  0682
0001305540  6966  656C  685F  8202  6606  6E75  5F63  0468
0001305560  0101  8000  0101  8000  0101  8000  0101  8000
*
0001305760  0101  8000  0101  8000  0501  7800  8358  0080
```

```
THU MAR 14 17:52:34 1991  TSLINT.DLL  PAGE 321, LINE 18881

0001306000  0501  7800  8330  0080  0101  8000  0101  8000
0001306020  0101  8000  0101  8000  0101  8000  0101  8000
*
0001306460  0101  8000  0101  8000  0101  8000  0701  7800
0001306500  0085  8308  0080  0101  8000  0101  8000  0101
0001306520  8000  0101  8000  0101  8000  0101  8000  0101
*
0001306640  8000  0101  8000  1801  7900  8085  0708  5D83
0001306660  8304  045E  0A82  7528  746E  6761  6567  2964
0001306700  0169  0016  837F  0443  8283  8300  0081  C683
0001306720  8303  0085  8583  8300  0081  4F01  7F00  0482
0001306740  616E  656D  8200  6405  5F62  6469  0085  8201
0001306760  750C  6173  6567  735F  6174  7574  8573  0104
0001307000  0682  6568  6461  7265  0685  8201  7509  6573
0001307020  5F72  706F  6E65  0A85  8201  6C06  616F  6564
0001307040  8564  010C  0382  726C  8575  010E  0101  8000
0001307060  0701  7A00  8373  045C  0082  0101  8000  0101
0001307100  8000  0101  8000  0101  8000  0101  8000  0101
*
0001307260  8000  0101  8000  0A01  7500  8380  0081  0264
0001307300  8183  0104  0007  837F  00C0  8683  0100  0007
0001307320  837F  00C0  CD83  0102  000A  8075  8183  6400
0001307340  8302  0482  0101  8000  0101  8000  0501  7800
0001307360  8338  0080  0701  7A00  8373  0488  0082  0A01
0001307400  7500  8380  0081  0064  0183  0102  0005  6078
0001307420  8283  0100  0007  8578  0080  8083  0100  0007
0001307440  837F  00C0  8683  0100  000A  8075  8183  6400
0001307460  8302  048B  0101  8000  0501  7800  8378  0080
0001307500  0401  7F00  C083  0100  000A  8075  8583  6400
0001307520  8301  048F  0701  7F00  C083  8300  0085  0A01
0001307540  7500  8380  00C0  0264  9183  0104  0004  837F
0001307560  00C0  0A01  7500  8380  0081  0164  9383  0104
0001307600  0001  0180  0007  8578  0088  8083  0100  0007
0001307620  8578  0090  8083  0100  000A  8075  8183  6400
0001307640  8300  0201  0101  8000  0101  8000  0101  8000
0001307660  0101  8000  0101  8000  0101  8000  0101  8000
*
0001312520  0101  8000  0701  7A00  8373  036E  0082  0A01
0001312540  7500  8380  0081  0064  0183  0102  0001  0180
0001312560  0001  0180  0001  0180  0001  0180  0001  0180
*
0001315620  001F  8579  0090  8307  04F9  FA83  8204  7211
0001315640  5F65  6170  7474  7265  5F6E  7562  6666  7265
0001315660  0169  0016  837F  00C0  8183  8300  0081  C083
0001315700  8300  00C0  8083  8300  0080  5401  7F00  0682
0001315720  7562  6666  7265  8200  6109  6C6C  636F  7461
0001315740  6465  8204  7504  6573  0664  0782  6166  7473
0001315760  616D  0870  0982  7274  6E61  6C73  7461  0C65
0001316000  1082  6166  7473  616D  5F70  6361  7563  6172
0001316020  6574  8210  630B  6E61  625F  5F65  756E  6C6C
0001316040  0111  0001  0180  0001  0180  0001  0180  0001
0001316060  0180  0001  0180  0001  0180  0001  0180  0001
*
0001316120  0180  0001  0180  0016  8579  00B0  8303  0525
0001316140  2683  8205  6508  7078  6E5F  646F  6965  1801
0001316160  7900  9085  0400  2383  8305  0524  0A82  7528
0001316200  746E  6761  6567  2964  0169  0018  8579  0090
0001316220  8306  0518  1983  8205  280A  6E75  6174  6767
0001316240  6465  6929  1601  7900  0420  0D83  8305  050E
```

THU MAR 14 17:52:34 1991 TSLINT.DLL PAGE 322, LINE 18940

```
0001316260  0A82  7528  746E  6761  6567  2964  0169  0007
0001316300  737A  0883  8205  0100  000D  837F  050C  C083
0001316320  8300  00C0  0C83  0105  0029  827F  6C04  7470
0001316340  0072  0A82  6170  6172  5F6D  616E  656D  8200
0001316360  7206  7465  7865  0074  0882  656E  7478  6F6E
0001316400  6564  0100  0016  2079  8306  0516  1783  8205
0001316420  280A  6E75  6174  6767  6465  6929  0701  7A00
0001316440  8373  0511  0082  0A01  7500  8380  050C  0064
0001316460  0183  0102  0007  737A  F883  8204  0100  001B
0001316500  6079  8303  0527  2883  8205  660F  726F  6C5F
0001316520  6F6F  5F70  6568  6461  7265  0169  0007  737A
0001316540  1383  8205  0100  0007  737A  0C83  8205  0100
0001316560  0013  837F  050C  1083  8305  0512  1483  8305
0001316600  0515  8183  0100  0028  827F  7204  7470  0072
0001316620  0482  7070  7274  8200  7004  6572  0067  0282
0001316640  6468  8200  6102  0076  0582  5F72  6E65  0074
0001316660  1301  7F00  0B83  8305  050F  C083  8300  0081
0001316700  8183  8300  0084  2B01  7F00  0182  006C  0182
0001316720  0472  0482  616E  656D  8208  6E06  6D75  6562
0001316740  0C72  0682  5F73  696C  656E  820E  7206  6365
0001316760  7361  1065  1801  7900  8085  0400  1B83  8305
0001317000  051C  0A82  7528  746E  6761  6567  2964  0169
0001317020  000D  837F  0089  C083  8300  0081  8483  0100
0001317040  001D  827F  6606  746C  756E  006D  0282  7073
0001317060  8208  7304  656C  0C6E  0482  7273  6665  010E
0001317100  0016  7079  8304  051E  1F83  8205  280A  6E75
0001317120  6174  6767  6465  6929  0D01  7F00  0C83  8305
0001317140  00C0  8183  8300  050C  2001  7F00  0482  656E
0001317160  7478  8200  6E04  6D61  0465  0682  656C  676E
0001317200  6874  8208  7605  6C61  6575  010A  0016  6079
0001317220  8303  0521  2283  8205  280A  6E75  6174  6767
0001317240  6465  6929  0A01  7F00  0C83  8305  050C  0C83
0001317260  0105  0017  827F  6E04  7865  0074  0482  616E
0001317300  656D  8204  7605  6C61  6575  0108  000D  837F
0001317320  050A  1A83  8305  051D  2083  0105  001E  827F
0001317340  6E05  646F  7065  8200  7603  6C61  8200  6804
0001317360  7361  0068  0582  6861  7361  0068  0A01  7F00
0001317400  0983  8305  0081  8483  0100  0016  827F  7303
0001317420  6275  8200  7404  7079  1265  0582  6C66  6761
0001317440  1473  0A01  7F00  0C83  8305  050C  0C83  0105
0001317460  0016  827F  6904  696E  0074  0482  6F63  646E
0001317500  8204  6904  636E  0872  0101  8000  0101  8000
0001317520  0101  8000  0101  8000  0101  8000  0101  8000
*
0001317600  0101  8000  0101  8000  0701  7A00  8373  0508
0001317620  0082  0101  8000  0101  8000  0101  8000  0101
0001317640  8000  0101  8000  0101  8000  0101  8000  0101
*
0001320300  8000  0701  7800  9085  8300  0081  0101  8000
0001320320  0101  8000  0101  8000  0101  8000  0101  8000
*
0001320460  1601  7900  0330  A183  8305  05A2  0A82  7528
0001320500  746E  6761  6567  2964  0169  000A  837F  0081
0001320520  8183  8300  0081  1C01  7F00  0682  6170  6B63
0001320540  685F  8200  6606  6C69  5F65  0268  0682  7566
0001320560  636E  685F  0104  0001  0180  0001  0180  0001
0001320600  0180  0001  0180  0001  0180  0001  0180  0001
*
0001320760  0180  0001  0180  0005  4078  8083  0100  0005
```

THU MAR 14 17:52:34 1991 TSLINT.DLL PAGE 323, LINE 18999

```
0001321000  3078  8083  0100  000A  8075  3983  6405  8302
0001321020  05C6  0701  7F00  C083  8300  0081  0701  7F00
0001321040  0C83  8305  050C  0A01  7500  8380  0539  0264
0001321060  C783  0105  0001  0180  0005  5078  8083  0100
0001321100  0005  3878  8083  0100  0005  6078  8283  0100
0001321120  0007  8578  0080  8083  0100  0007  8578  0090
0001321140  8083  0100  0005  4878  8083  0100  0007  8578
0001321160  0220  8083  0100  0007  8578  0120  8083  0100
0001321200  0007  8578  0178  8083  0100  0007  8578  00F8
0001321220  8083  0100  0005  7878  8083  0100  0005  7078
0001321240  8083  0100  0007  8578  00E0  8083  0100  0007
0001321260  8578  00B8  8083  0100  0007  8578  0108  8083
0001321300  0100  0005  1078  8083  0100  0007  8578  00B0
0001321320  8083  0100  0007  8578  0140  8083  0100  0004
0001321340  837F  00C0  0A01  7500  8380  0539  0164  DC83
0001321360  0105  0001  0180  0007  8578  00C8  8083  0100
0001321400  0007  837F  00C0  8183  0100  000A  8075  3983
0001321420  6405  8302  05E0  0501  7800  8378  0080  0701
0001321440  7800  8885  8300  0080  0A01  7500  8380  0200
0001321460  0064  0183  0102  000A  8075  8183  6400  8300
0001321500  0201  0101  8000  0101  8000  0101  8000  0101
0001321520  8000  0101  8000  0101  8000  0101  8000  0101
*
0001322120  8000  0101  8000  0701  7A00  8373  0247  0082
0001322140  0A01  7500  8380  0081  0064  0183  0102  0001
0001322160  0180  0001  0180  0001  0180  0001  0180  0001
*
0001323100  0180  0001  0180  0016  3079  8303  02BF  C083
0001323120  8202  280A  6E75  6174  6767  6465  6929  0A01
0001323140  7F00  8183  8300  0081  8183  0100  001C  827F
0001323160  7006  6361  5F6B  0068  0682  6966  656C  685F
0001323200  8202  6606  6E75  5F63  0468  0101  8000  0101
0001323220  8000  0101  8000  0101  8000  0101  8000  0101
*
0001323420  8000  0501  7800  8350  0080  0501  7800  8330
0001323440  0080  0101  8000  0101  8000  0101  8000  0101
0001323460  8000  0101  8000  0101  8000  0101  8000  0101
*
0001323660  8000  0101  8000  0501  7800  8368  0080  0101
0001323700  8000  0101  8000  0101  8000  0101  8000  0101
*
0001326460  8000  0101  8000  1601  7900  5085  0406  6C83
0001326500  8304  046D  0882  7374  5F6C  6163  6C6C  0169
0001326520  0007  8578  0190  8083  0100  0007  8578  0320
0001326540  8083  0100  000D  837F  046A  8183  8300  046A
0001326560  6B83  0104  0022  827F  6604  6C69  0065  0482
0001326600  696C  656E  8232  6306  6C61  656C  3465  0782
0001326620  6163  6C6C  7473  6672  0101  8000  0101  8000
0001326640  0101  8000  0101  8000  0101  8000  0101  8000
0001326660  0101  8000  0101  8000  0701  7A00  8373  0477
0001326700  0082  0701  7A00  8373  0469  0082  0101  8000
0001326720  0101  8000  0101  8000  0101  8000  0101  8000
*
0001330420  0101  8000  0501  7800  8310  0080  0901  7800
0001330440  4086  0277  8300  0469  0A01  7F00  C083  8300
0001330460  0081  C083  0100  000A  8075  0083  6402  8303
0001330500  054C  0101  8000  0501  7800  8378  0080  0501
0001330520  7800  8320  0080  0501  7800  8360  0082  0401
0001330540  7F00  C083  0100  000A  8075  0083  6402  8301
```

```
THU MAR 14 17:52:34 1991  TSLINT.DLL  PAGE 324, LINE 19058

0001330560  0552  0101  8000  0701  7800  9885  8300  0080
0001330600  0501  7800  8340  0080  0501  7800  8368  0080
0001330620  0501  7800  8318  0080  0A01  7500  8380  0200
0001330640  0064  0183  0102  0005  4878  8083  0100  0007
0001330660  8578  0088  8083  0100  0007  8578  0080  8083
0001330700  0100  000D  837F  00C0  8183  8300  00C0  C083
0001330720  0100  000A  8075  8183  6400  8304  055D  0101
0001330740  8000  0501  7800  8370  0080  0701  7800  D885
0001330760  8300  0080  0701  7800  7885  8301  0080  0701
0001331000  7800  1885  8301  0080  0A01  7500  8380  0081
0001331020  0064  0183  0102  0007  8578  0110  8083  0100
0001331040  0004  837F  0476  0A01  7500  8380  0081  0173
0001331060  6683  0105  000A  8075  0083  6402  8300  0201
0001331100  0701  7800  8885  8300  0080  0A01  7500  8380
0001331120  0081  0064  0183  0102  000A  8075  8183  6400
0001331140  8300  0201  0101  8000  0101  8000  0101  8000
0001331160  0101  8000  0101  8000  0101  8000  0101  8000
*
0001331740  0101  8000  0101  8000  0101  8000  0501  7800
0001331760  8368  0080  0101  8000  0101  8000  0101  8000
0001332000  0101  8000  0101  8000  0101  8000  0101  8000
*
0001334160  0101  8000  0101  8000  0101  8000  1601  7900
0001334200  0330  8783  8303  0388  0A82  7528  746E  6761
0001334220  6567  2964  0169  000A  837F  0081  8183  8300
0001334240  0081  1C01  7F00  0682  6170  6B63  685F  8200
0001334260  6606  6C69  5F65  0268  0682  7566  636E  685F
0001334300  0104  0001  0180  0001  0180  0001  0180  0001
0001334320  018D  0001  0180  0001  0180  0001  0180  0001
*
0001334500  0180  0001  0180  0001  0180  0005  5878  8083
0001334520  0100  0005  3078  8083  0100  0001  0180  0001
0001334540  0180  0001  0180  0001  0180  0001  0180  0001
0001334560  0180  0001  0180  0014  8579  0080  8306  03B6
0001334600  B783  8203  6806  6165  6564  6972  0701  7A00
0001334620  8373  03B4  0082  1301  7F00  B583  8303  03B5
0001334640  8583  8300  0084  8183  8300  0084  2D01  7F00
0001334660  0482  7270  7665  8200  6E04  7865  0474  0482
0001334700  6973  657A  8208  7404  7079  0A65  0582  656C
0001334720  6576  0C6C  0582  616D  6967  0E63  0101  8000
0001334740  0A01  7500  8380  0200  0064  0183  0102  0001
0001334760  0180  0005  5078  8083  0100  0005  5078  8083
0001335000  0100  0005  2078  8083  0100  0007  737A  BF83
0001335020  8203  0100  000A  8075  8183  6400  8300  0201
0001335040  0501  7800  8360  0082  0A01  7F00  8583  8300
0001335060  0084  8183  0100  000A  8075  C083  6400  8303
0001335100  03C1  0101  8000  0501  7800  8348  0080  0501
0001335120  7800  8338  0080  0701  7800  9085  8300  0080
0001335140  0701  7800  8085  8301  0080  0501  7800  8340
0001335160  0080  0701  7800  D085  8300  0080  0D01  7F00
0001335200  C083  8300  0085  8483  8300  0081  0A01  7500
0001335220  8380  00C0  0464  CA83  0103  0005  5878  8083
0001335240  0100  0007  8578  0128  8083  0100  0007  8578
0001335260  01B8  8083  0100  0007  8578  0138  8083  0100
0001335300  0004  837F  00C0  0A01  7500  8380  0200  0164
0001335320  D083  0103  0005  4078  8083  0100  0007  8578
0001335340  00B8  8083  0100  0007  8578  0088  8083  0100
0001335360  0007  8578  0110  8083  0100  0007  8578  0160
0001335400  8083  0100  0007  8578  0098  8083  0100  0007
```

```
THU MAR 14 17:52:34 1991  TSLINT.DLL  PAGE 325, LINE 19117

0001335420  837F 0084 8183 0100 000A 8075 0083 6402
0001335440  8302 03D8 0701 7800 9885 8300 0080 0701
0001335460  7800 8085 8300 0080 0A01 7500 8380 0086
0001335500  0064 0183 0102 0005 7078 8083 0100 0004
0001335520  837F 00C0 0A01 7500 8380 0085 0164 DE83
0001335540  0103 000A 8075 8683 6400 8300 0201 0101
0001335560  8000 0101 8000 0701 7A00 8373 0203 0082
0001335600  0A01 7500 8380 0081 0064 0183 0102 0001
0001335620  0180 0001 0180 0001 0180 0001 0180 0001
*
0001337360  0180 0001 0180 0005 6078 8083 0100 0001
0001337400  0180 0001 0180 0001 0180 0001 0180 0001
*
0001341760  0180 0012 6079 8305 041D 1E83 8204 5F06
0001342000  6F69 7562 6966 1001 7F00 C083 8300 0081
0001342020  C083 8300 0080 8083 0100 0027 827F 5F04
0001342040  7470 0072 0482 635F 746E 8204 5F05 6162
0001342060  6573 8206 5F05 6C66 6761 820A 5F05 6966
0001342100  656C 010B 0005 0078 1C83 0104 0007 737A
0001342120  1C83 8204 0100 0001 0180 0001 0180 0001
0001342140  0180 0001 0180 0001 0180 0001 0180 0001
*
0001343040  0180 0001 0180 0001 0180 001F 8579 0090
0001343060  8307 0497 9883 8204 7211 5F65 6170 7474
0001343100  7265 5F6E 7562 6666 7265 0169 0016 837F
0001343120  00C0 8183 8300 0081 C083 8300 00C0 8083
0001343140  8300 0080 5401 7F00 0682 7562 6666 7265
0001343160  8200 6109 6C6C 636F 7461 6465 8204 7504
0001343200  6573 0664 0782 6166 7473 616D 0870 0982
0001343220  7274 6E61 6C73 7461 0C65 1082 6166 7473
0001343240  616D 5F70 6361 7563 6172 6574 8210 630B
0001343260  6E61 625F 5F65 756E 6C6C 0111 0001 0180
0001343300  0001 0180 0001 0180 0001 0180 0001 0180
*
0001343360  0016 8579 00B0 8303 04C3 C483 8204 6508
0001343400  7078 6E5F 646F 6965 1801 7900 9085 0400
0001343420  C183 8304 04C2 0A82 7528 746E 6761 6567
0001343440  2964 0169 0018 8579 0090 8306 04B6 B783
0001343460  8204 280A 6E75 6174 6767 6465 6929 1601
0001343500  7900 0420 AB83 8304 04AC 0A82 7528 746E
0001343520  6761 6567 2964 0169 0007 737A A683 8204
0001343540  0100 000D 837F 04AA C083 8300 00C0 AA83
0001343560  0104 0029 827F 6C04 7470 0072 0A82 6170
0001343600  6172 5F6D 616E 656D 8200 7206 7465 7865
0001343620  0074 0882 656E 7478 6F6E 6564 0100 0016
0001343640  2079 8306 04B4 B583 8204 280A 6E75 6174
0001343660  6767 6465 6929 0701 7A00 8373 04AF 0082
0001343700  0A01 7500 8380 04AA 0064 0183 0102 0007
0001343720  737A 9683 8204 0100 001B 6079 8303 04C5
0001343740  C683 8204 660F 726F 6C5F 6F6F 5F70 6568
0001343760  6461 7265 0169 0007 737A B183 8204 0100
0001344000  0007 737A AA83 8204 0100 0013 837F 04AA
0001344020  AE83 8304 04B0 B283 8304 04B3 8183 0100
0001344040  0028 827F 7204 7470 0072 0482 7070 7274
0001344060  8200 7004 6572 0067 0282 6468 8200 6102
0001344100  0076 0582 5F72 6E65 0074 1301 7F00 A983
0001344120  8304 04AD C083 8300 0081 8183 8300 0084
0001344140  2B01 7F00 0182 006C 0182 0472 0482 616E
0001344160  656D 8208 6E06 6D75 6562 0C72 0682 5F73
```

```
THU MAR 14 17:52:34 1991  TSLINT.DLL  PAGE 326, LINE 19176

0001344200  696C 656E 820E 7206 6365 7361 1065 1801
0001344220  7900 8085 0400 B983 8304 04BA 0A82 7528
0001344240  746E 6761 6567 2964 0169 000D 837F 0089
0001344260  C083 8300 0081 8483 0100 001D 827F 6606
0001344300  746C 756E 006D 0282 7073 8208 7304 656C
0001344320  0C6E 0482 7273 6665 010E 0016 7079 8304
0001344340  04BC BD83 8204 280A 6E75 6174 6767 6465
0001344360  6929 0D01 7F00 AA83 8304 00C0 8183 8300
0001344400  04AA 2001 7F00 0482 656E 7478 8200 6E04
0001344420  6D61 0465 0682 656C 676E 6874 8208 7605
0001344440  6C61 6575 010A 0016 6079 8303 04BF C083
0001344460  8204 280A 6E75 6174 6767 6465 6929 0A01
0001344500  7F60 AA83 8304 04AA AA83 0104 0017 827F
0001344520  6E04 7865 0074 0482 616E 656D 8204 7605
0001344540  6C61 6575 0108 000D 837F 04A8 B883 8304
0001344560  04BB BE83 0104 001E 827F 6E05 646F 7065
0001344600  8200 7603 6C61 8200 6804 7361 0068 0582
0001344620  6861 7361 0068 0A01 7F00 A783 8304 0081
0001344640  8483 0100 0016 827F 7303 6275 8200 7404
0001344660  7079 1265 0582 6C66 6761 1473 0A01 7F00
0001344700  AA83 8304 04AA AA83 0104 0016 827F 6904
0001344720  696E 0074 0482 6F63 646E 8204 6904 636E
0001344740  0872 0101 8000 0101 8000 0101 8000 0101
0001344760  8000 0101 8000 0101 8000 0101 8000 0101
*
0001345600  8000 0101 8000 0101 8000 0101 8000 1601
0001345620  7900 0330 3383 8305 0534 0A82 7528 746E
0001345640  6761 6567 2964 0169 000A 837F 0081 8183
0001345660  8300 0081 1C01 7F00 0682 6170 6B63 685F
0001345700  8200 6606 6C69 5F65 0268 0682 7566 636E
0001345720  685F 0104 0001 0180 0001 0180 0001 0180
0001345740  0001 0180 0001 0180 0001 0180 0001 0180
*
0001346120  0001 0180 0005 3078 8083 0100 0016 4079
0001346140  8307 0557 5883 8205 280A 6E75 6174 6767
0001346160  6465 6929 1601 7F00 8183 8300 0082 8983
0001346200  8300 04AA 8183 8300 00C0 AE83 0104 003E
0001346220  827F 6904 6176 006C 0482 766C 6C61 8200
0001346240  6604 6176 006C 0782 6F6E 6564 6176 006C
0001346260  0B82 6F6E 6564 7974 6570 6176 006C 0482
0001346300  7673 6C61 8200 7006 7274 6176 006C 0501
0001346320  7800 8320 0081 0501 7800 8320 055B 0501
0001346340  7800 8310 0080 0101 8000 0701 7800 D085
0001346360  8303 0081 0701 7800 8085 8379 0081 0701
0001346400  7800 B085 8312 0081 0701 7800 E085 8302
0001346420  0081 0701 7800 E085 8309 0081 0701 7800
0001346440  0085 8332 0556 0701 7800 8085 833E 0081
0001346460  0A01 7500 8380 0081 0064 0183 0102 0001
0001346500  0180 0005 2078 8083 0100 0005 6078 8283
0001346520  0100 0007 8578 0C80 8183 0100 0007 737A
0001346540  5683 8205 0100 0007 8578 00F8 8083 0100
0001346560  0005 1078 8083 0100 0007 8578 00B8 8083
0001346600  0100 0005 2878 8083 0100 0005 6878 8083
0001346620  0100 0007 8578 00E8 8083 0100 0005 7878
0001346640  8083 0100 0005 4878 8083 0100 0005 7078
0001346660  8083 0100 0005 3878 8083 0100 0007 8578
0001346700  00C0 8083 0100 0007 8578 00A8 8083 0100
0001346720  0007 8578 00E0 8083 0100 0007 8578 00D8
0001346740  8083 0100 0007 8578 0128 8083 0100 0007
```

THU MAR 14 17:52:34 1991 TSLINT.DLL PAGE 327, LINE 19235

| | | | | | | | | |
|---|---|---|---|---|---|---|---|---|
| 0001346760 | 8578 | 0178 | 8083 | 0100 | 0007 | 8578 | 00F0 | 8083 |
| 0001347000 | 0100 | 0007 | 8578 | 00B0 | 8083 | 0100 | 0007 | 8578 |
| 0001347020 | 00C8 | 8083 | 0100 | 0007 | 8578 | 00A0 | 8083 | 0100 |
| 0001347040 | 0007 | 8578 | 0098 | 8083 | 0100 | 0007 | 8578 | 0090 |
| 0001347060 | 8083 | 0500 | 0111 | 0000 | 1800 | 0001 | 4C00 | 9306 |
| 0001347100 | 1002 | 8800 | 0002 | 0400 | 6909 | 696E | 5F74 | 6176 |
| 0001347120 | 7372 | 0201 | 0115 | 0293 | 0654 | 005D | 0010 | 0052 |
| 0001347140 | 0000 | 0604 | 6567 | 5F74 | 7366 | 0409 | FFFA | 05A9 |
| 0001347160 | 7403 | 706D | 0201 | 0115 | 02F0 | 0656 | 0087 | 0010 |
| 0001347200 | 007C | 0000 | 0604 | 6573 | 5F74 | 7366 | 0409 | 0006 |
| 0001347220 | 00C0 | 7303 | 7274 | 0409 | FFFA | 05B2 | 7403 | 706D |
| 0001347240 | 0201 | 0115 | 0377 | 0658 | 0074 | 0010 | 0069 | 0000 |
| 0001347260 | 0604 | 6F64 | 655F | 7078 | 040A | 0006 | 05A9 | 7404 |
| 0001347300 | 6572 | 0965 | FA04 | A9FF | 0305 | 6D74 | 0170 | 1702 |
| 0001347320 | EB01 | 5A03 | ED06 | 1000 | E200 | 0000 | 0400 | 6408 |
| 0001347340 | 5F6F | 6E69 | 6564 | 0A78 | 0604 | A900 | 0405 | 7274 |
| 0001347360 | 6565 | 0408 | FFFA | 05A9 | 7302 | 0831 | F604 | A9FF |
| 0001347400 | 0205 | 3273 | 0408 | FFF2 | 00C0 | 7002 | 0831 | EE04 |
| 0001347420 | C0FF | 0200 | 3270 | 0D07 | 0081 | 020E | 316C | 0D07 |
| 0001347440 | 0081 | 020F | 326C | 0201 | 0115 | 04D8 | 065C | 0074 |
| 0001347460 | 0010 | 0069 | 0000 | 0604 | 6F64 | 695F | 746E | 040A |
| 0001347500 | 0006 | 05A9 | 7404 | 6572 | 0965 | FA04 | A9FF | 0305 |
| 0001347520 | 6D74 | 0170 | 1802 | 4C01 | 5E05 | 5D06 | 1000 | 5200 |
| 0001347540 | 0000 | 0400 | 6409 | 5F6F | 656C | 676E | 6874 | 040A |
| 0001347560 | 0006 | 05A9 | 7404 | 6572 | 0965 | FA04 | A9FF | 0305 |
| 0001347600 | 6D74 | 0170 | 1502 | A901 | 6005 | 7406 | 1000 | 6900 |
| 0001347620 | 0000 | 0400 | 6406 | 5F6F | 6F6C | 0A67 | 0604 | A900 |
| 0001347640 | 0405 | 7274 | 6565 | 0409 | FFFA | 05A9 | 7403 | 706D |
| 0001347660 | 0201 | 0118 | 061D | 0662 | 008F | 0010 | 0084 | 0000 |
| 0001347700 | 0904 | 6F64 | 705F | 6972 | 746E | 0A66 | 0604 | A900 |
| 0001347720 | 0405 | 7274 | 6565 | 0408 | FFF8 | 051F | 6602 | 0C70 |
| 0001347740 | FC04 | 81FF | 0600 | 7265 | 6672 | 676C | 0201 | 011A |
| 0001347760 | 06AC | 0664 | 0066 | 0010 | 005B | 0000 | 0B04 | 6573 |
| 0001350000 | 5F74 | 6C65 | 6D65 | 6E65 | 0974 | 0604 | 8100 | 0300 |
| 0001350020 | 756E | 076D | 0804 | C000 | 0100 | 0973 | 0C04 | 8100 |
| 0001350040 | 0300 | 656C | 076E | 0E04 | A900 | 0105 | 016E | 1702 |
| 0001350060 | 1201 | 6607 | 4906 | 1001 | 3E00 | 0001 | 0400 | 6408 |
| 0001350100 | 5F6F | 7073 | 696C | 0A74 | 0604 | A900 | 0405 | 7274 |
| 0001350120 | 6565 | 0408 | FFF6 | 05A9 | 7402 | 0831 | F204 | A9FF |
| 0001350140 | 0205 | 3274 | 0408 | FFEE | 05A9 | 7402 | 0C33 | E604 |
| 0001350160 | C0FF | 0600 | 7073 | 696C | 6374 | 0407 | FFFA | 00C0 |
| 0001350200 | 7301 | 0407 | FFEA | 05A9 | 6E01 | 0201 | 0119 | 085B |
| 0001350220 | 0669 | 1706 | 0010 | 16FB | 0000 | 0A04 | 6F64 | 735F |
| 0001350240 | 7270 | 6E69 | 6674 | 040A | 0006 | 05A9 | 7404 | 6572 |
| 0001350260 | 0865 | C804 | C0FF | 0200 | 3073 | 0408 | FFBC | 00C0 |
| 0001350300 | 7302 | 0831 | 8604 | 81FF | 0200 | 306E | 040A | FF94 |
| 0001350320 | 05A9 | 7304 | 6D66 | 0974 | 9804 | A9FF | 0305 | 7261 |
| 0001350340 | 0A67 | 8004 | A9FF | 0405 | 6163 | 6772 | 0408 | FF88 |
| 0001350360 | 0082 | 6602 | 0A77 | 9C04 | 82FF | 0400 | 7270 | 6365 |
| 0001350400 | 0408 | FFB6 | 0082 | 6C02 | 096A | D804 | 82FF | 0300 |
| 0001350420 | 6C61 | 0974 | D404 | 82FF | 0300 | 6962 | 0967 | A004 |
| 0001350440 | C2FF | 0300 | 7563 | 0972 | DC04 | C2FF | 0300 | 6D74 |
| 0001350460 | 0970 | CC04 | 82FF | 0300 | 6176 | 0A6C | AC04 | 86FF |
| 0001350500 | 0400 | 7675 | 6C61 | 0409 | FFB0 | 0081 | 7303 | 6E67 |
| 0001350520 | 040A | FF92 | 0081 | 6204 | 7361 | 0B65 | E004 | 6DFF |
| 0001350540 | 0506 | 7063 | 7562 | 0A66 | A404 | C0FF | 0400 | 6563 |
| 0001350560 | 646E | 0408 | FFD0 | 00C0 | 6302 | 0A70 | B204 | C0FF |
| 0001350600 | 0400 | 6966 | 6C6C | 040C | FFC0 | 0089 | 7406 | 706D |
| 0001350620 | 6176 | 0C6C | A804 | C0FF | 0600 | 7270 | 735F | 7274 |

THU MAR 14 17:52:34 1991 TSLINT.DLL PAGE 328, LINE 19294

| | | | | | | | | |
|---|---|---|---|---|---|---|---|---|
| 0001350640 | 040A | FF8C | 00CD | 6F04 | 7562 | 0A66 | BA04 | 81FF |
| 0001350660 | 0400 | 736F | 7A69 | 040A | FF90 | 0081 | 6F04 | 7266 |
| 0001350700 | 0A65 | 8404 | 81FF | 0400 | 6C6F | 6E65 | 050D | 0100 |
| 0001350720 | 0009 | 066B | 6305 | 6268 | 6675 | 050A | 0112 | 0009 |
| 0001350740 | 066C | 7302 | 0570 | 2600 | 4009 | 0900 | 7A04 | C0FF |
| 0001350760 | 0300 | 6D74 | 0170 | 0A02 | EC0B | 0009 | 7205 | 7465 |
| 0001351000 | 7972 | 0005 | 0A05 | 0040 | 0409 | FF7A | 00C0 | 7403 |
| 0001351020 | 706D | 0201 | 0B10 | 0D48 | 0B00 | 6F64 | 7270 | 735F |
| 0001351040 | 7274 | 6E69 | 0567 | 9200 | 400D | 0900 | 7A04 | C0FF |
| 0001351060 | 0300 | 6D74 | 0170 | 0502 | 1000 | 400E | 0900 | 7A04 |
| 0001351100 | C0FF | 0300 | 6D74 | 0170 | 0502 | B700 | 400E | 0900 |
| 0001351120 | 7A04 | C0FF | 0300 | 6D74 | 0170 | 0502 | 5D00 | 4010 |
| 0001351140 | 0900 | 7A04 | C0FF | 0300 | 6D74 | 0170 | 0502 | F500 |
| 0001351160 | 4010 | 0900 | 7A04 | C0FF | 0300 | 6D74 | 0170 | 0502 |
| 0001351200 | 7500 | 4011 | 0900 | 7A04 | C0FF | 0300 | 6D74 | 0170 |
| 0001351220 | 0502 | 1C00 | 4012 | 0900 | 7A04 | C0FF | 0300 | 6D74 |
| 0001351240 | 0170 | 1002 | AF0B | 0012 | 700B | 5F72 | 6E75 | 6973 |
| 0001351260 | 6E67 | 6465 | 0005 | 13AB | 0040 | 0409 | FF7A | 00C0 |
| 0001351300 | 7403 | 706D | 0201 | 0005 | 142B | 0040 | 0409 | FF7A |
| 0001351320 | 00C0 | 7403 | 706D | 0201 | 0005 | 14D2 | 0040 | 0409 |
| 0001351340 | FF7A | 00C0 | 7403 | 706D | 0201 | 0005 | 164E | 0040 |
| 0001351360 | 0409 | FF7A | 00C0 | 7403 | 706D | 0201 | 0005 | 170F |
| 0001351400 | 0040 | 0409 | FF7A | 00C0 | 7403 | 706D | 0201 | 0005 |
| 0001351420 | 177C | 0040 | 0409 | FF7A | 00C0 | 7403 | 706D | 0201 |
| 0001351440 | 0005 | 180A | 0040 | 0409 | FF76 | 00C0 | 7403 | 706D |
| 0001351460 | 0201 | 0005 | 189B | 0040 | 0409 | FF76 | 00C0 | 7403 |
| 0001351500 | 706D | 0201 | 0005 | 1916 | 0040 | 0409 | FF76 | 00C0 |
| 0001351520 | 7403 | 706D | 0201 | 0005 | 19C5 | 0040 | 0409 | FF7A |
| 0001351540 | 00C0 | 7403 | 706D | 0201 | 0005 | 1AC3 | 0040 | 0409 |
| 0001351560 | FF76 | 00C0 | 7403 | 706D | 0201 | 0005 | 1CB6 | 0040 |
| 0001351600 | 0409 | FF76 | 00C0 | 7403 | 706D | 0201 | 0B09 | 1E1E |
| 0001351620 | 0400 | 6F6C | 6573 | 0005 | 1ED0 | 0040 | 0409 | FF76 |
| 0001351640 | 00C0 | 7403 | 706D | 0201 | 0201 | 0116 | 1F61 | 066F |
| 0001351660 | 0074 | 0010 | 0069 | 0000 | 0704 | 6F64 | 735F | 7271 |
| 0001351700 | 0A74 | 0604 | A900 | 0405 | 7274 | 6565 | 0409 | FFFA |
| 0001351720 | 05A9 | 7403 | 706D | 0201 | 0118 | 1FD5 | 0671 | 010A |
| 0001351740 | 0010 | 00FF | 0000 | 0904 | 6F64 | 735F | 6275 | 7473 |
| 0001351760 | 0A72 | 0604 | A900 | 0405 | 7274 | 6565 | 0408 | FFFA |
| 0001352000 | 05A9 | 7402 | 0831 | F604 | A9FF | 0205 | 3274 | 0408 |
| 0001352020 | FFF2 | 05A9 | 7402 | 0933 | 810D | 0E00 | 6904 | 646E |
| 0001352040 | 0B78 | 810D | 0F00 | 6C06 | 6E65 | 7467 | 0168 | 1802 |
| 0001352060 | DF01 | 7320 | 7D06 | 1000 | 7200 | 0000 | 0400 | 6409 |
| 0001352100 | 5F6F | 7973 | 7473 | 6D65 | 040A | 0006 | 05A9 | 7404 |
| 0001352120 | 6572 | 0965 | FA04 | A9FF | 0305 | 6D74 | 0970 | F804 |
| 0001352140 | 81FF | 0300 | 6572 | 0174 | 1702 | 5C01 | 7521 | 0A06 |
| 0001352160 | 1002 | FF00 | 0001 | 0400 | 6408 | 5F6F | 7270 | 6E69 |
| 0001352200 | 0A74 | 0604 | A900 | 0405 | 7274 | 6565 | 0408 | FFF8 |
| 0001352220 | 051F | 6602 | 0C70 | FC04 | 81FF | 0600 | 7265 | 6672 |
| 0001352240 | 676C | 0201 | 0119 | 2366 | 0679 | 00D8 | 0010 | 00CD |
| 0001352260 | 0000 | 0A04 | 6F64 | 745F | 6C6F | 776F | 7265 | 040A |
| 0001352300 | 0006 | 05A9 | ,404 | 6572 | 0965 | EE04 | C0FF | 0300 |
| 0001352320 | 7063 | 0832 | FA04 | A9FF | 0205 | 3174 | 0408 | FFF6 |
| 0001352340 | 05A9 | 7402 | 0832 | F204 | C0FF | 0200 | 7063 | 0201 |
| 0001352360 | 0119 | 243E | 067B | 00CB | 0010 | 00C0 | 0000 | 0A04 |
| 0001352400 | 6F64 | 745F | 756F | 7070 | 7265 | 040A | 0006 | 05A9 |
| 0001352420 | 7404 | 6572 | 0865 | FA04 | A9FF | 0205 | 3174 | 0408 |
| 0001352440 | FFF6 | 05A9 | 7402 | 0832 | F204 | C0FF | 0200 | 7063 |
| 0001352460 | 0201 | 0116 | 2509 | 067D | 00FC | 0010 | 00F1 | 0000 |
| 0001352500 | 0704 | 6567 | 5F74 | 6E6F | 0A65 | 0604 | A900 | 0405 |

THU MAR 14 17:52:34 1991 TSLINT.DLL PAGE 329, LINE 19353

| | | | | | | | | |
|---|---|---|---|---|---|---|---|---|
| 0001352520 | 7274 | 6565 | 0409 | 000A | 05B2 | 7203 | 7365 | 0201 |
| 0001352540 | 0116 | 2605 | 067F | 01AA | 0010 | 019F | 0000 | 0704 |
| 0001352560 | 6567 | 5F74 | 7774 | 0A6F | 0604 | A900 | 0405 | 7274 |
| 0001352600 | 6565 | 040A | 000A | 05B2 | 7204 | 7365 | 0A31 | 0E04 |
| 0001352620 | B200 | 0405 | 6572 | 3273 | 0201 | 0118 | 27AF | 0681 |
| 0001352640 | 0258 | 0010 | 024D | 0000 | 0904 | 6567 | 5F74 | 6874 |
| 0001352660 | 6572 | 0A65 | 0604 | A900 | 0405 | 7274 | 6565 | 040A |
| 0001352700 | 000A | 05B2 | 7204 | 7365 | 0A31 | 0E04 | B200 | 0405 |
| 0001352720 | 6572 | 3273 | 040A | 0012 | 05B2 | 7204 | 7365 | 0133 |
| 0001352740 | 1702 | 0701 | 832A | 0606 | 1003 | FB00 | 0002 | 0400 |
| 0001352760 | 6708 | 7465 | 665F | 756F | 0A72 | 0604 | A900 | 0405 |
| 0001353000 | 7274 | 6565 | 040A | 000A | 05B2 | 7204 | 7365 | 0A31 |
| 0001353020 | 0E04 | B200 | 0405 | 6572 | 3273 | 040A | 0012 | 05B2 |
| 0001353040 | 7204 | 7365 | 0A33 | 1604 | B200 | 0405 | 6572 | 3473 |
| 0001353060 | 0201 | 011A | 2D0D | 0685 | 01E5 | 0010 | 01DA | 0000 |
| 0001353100 | 0B04 | 5F61 | 6567 | 5F74 | 6874 | 6572 | 0A65 | 0604 |
| 0001353120 | A900 | 0405 | 7274 | 6565 | 040A | 000A | 05B2 | 7204 |
| 0001353140 | 7365 | 0A31 | 0E04 | B200 | 0405 | 6572 | 3273 | 040A |
| 0001353160 | 0012 | 05B2 | 7204 | 7365 | 0133 | 1B02 | F201 | 872E |
| 0001353200 | 9A06 | 1001 | 8F00 | 0001 | 0400 | 700C | 6972 | 746E |
| 0001353220 | 735F | 6D69 | 6C70 | 0A65 | 0604 | A900 | 0405 | 7274 |
| 0001353240 | 6565 | 0408 | 000A | 051F | 6602 | 0C70 | FA04 | C0FF |
| 0001353260 | 0600 | 5F5F | 7974 | 6570 | 040F | FFF4 | 0085 | 5F09 |
| 0001353300 | 625F | 5F78 | 7974 | 6570 | 040D | FFE4 | 0397 | 5F07 |
| 0001353320 | 705F | 6972 | 746E | 040B | FFDC | 0472 | 5F05 | 6C5F |
| 0001353340 | 6C76 | 040D | FFE8 | 0689 | 5F07 | 635F | 6F6C | 6B63 |
| 0001353360 | 040D | FFF6 | 00CD | 5F07 | 735F | 6174 | 6B63 | 040E |
| 0001353400 | FFE2 | 0081 | 5F08 | 725F | 7465 | 6176 | 0E6C | 5405 |
| 0001353420 | 0901 | 2700 | 0602 | 5F5F | 7566 | 636E | 0005 | 301B |
| 0001353440 | 003E | 0409 | FF78 | 061F | 6203 | 6675 | 0201 | 0201 |
| 0001353460 | 0117 | 308C | 068B | 0099 | 0010 | 008E | 0000 | 0804 |
| 0001353500 | 6F64 | 615F | 6174 | 326E | 040A | 0006 | 05A9 | 7404 |
| 0001353520 | 6572 | 0865 | FA04 | A9FF | 0205 | 3174 | 0408 | FFF6 |
| 0001353540 | 05A9 | 7402 | 0132 | 1502 | 2501 | 8D31 | 7406 | 1000 |
| 0001353560 | 6900 | 0000 | 0400 | 6406 | 5F6F | 6973 | 0A6E | 0604 |
| 0001353600 | A900 | 0405 | 7274 | 6565 | 0409 | FFFA | 05A9 | 7403 |
| 0001353620 | 706D | 0201 | 0115 | 3199 | 068F | 0074 | 0010 | 0069 |
| 0001353640 | 0000 | 0604 | 6F64 | 635F | 736F | 040A | 0006 | 05A9 |
| 0001353660 | 7404 | 6572 | 0965 | FA04 | A9FF | 0305 | 6D74 | 0170 |
| 0001353700 | 1602 | 0D01 | 9132 | 7706 | 1000 | 6C00 | 0000 | 0400 |
| 0001353720 | 6407 | 5F6F | 6172 | 646E | 040A | 0006 | 05A9 | 7404 |
| 0001353740 | 6572 | 0165 | 1702 | 8401 | 9332 | E606 | 1000 | DB00 |
| 0001353760 | 0000 | 0400 | 6408 | 5F6F | 7273 | 6E61 | 0A64 | 0604 |
| 0001354000 | A900 | 0405 | 7274 | 6565 | 0409 | FFFA | 05A9 | 7403 |
| 0001354020 | 706D | 0409 | FFF6 | 0082 | 7203 | 7465 | 0511 | 0162 |
| 0001354040 | 0009 | 0082 | 7309 | 7661 | 5F65 | 6573 | 6465 | 0201 |
| 0001354060 | 0116 | 336A | 0695 | 0075 | 0010 | 006A | 0000 | 0704 |
| 0001354100 | 7073 | 5F63 | 6176 | 0A72 | 0604 | C000 | 0400 | 616E |
| 0001354120 | 656D | 040B | 000A | 05A9 | 7605 | 6C61 | 6575 | 0407 |
| 0001354140 | FFFA | 05A9 | 7201 | 0201 | 0118 | 33DF | 0697 | 0169 |
| 0001354160 | 0010 | 015E | 0000 | 0904 | 6E69 | 7469 | 615F | 6772 |
| 0001354200 | 0B73 | 0604 | 8100 | 0500 | 7261 | 6367 | 0A30 | 0804 |
| 0001354220 | 8100 | 0400 | 7261 | 6367 | 040B | 000A | 00C0 | 6105 |
| 0001354240 | 6772 | 3076 | 040A | 000E | 0368 | 6104 | 6772 | 0776 |
| 0001354260 | F804 | 81FF | 0100 | 0769 | F604 | 81FF | 0100 | 0A6A |
| 0001354300 | FA04 | B2FF | 0405 | 7061 | 7274 | 0201 | 0116 | 3548 |
| 0001354320 | 0699 | 03AC | 0010 | 03A1 | 0000 | 0704 | 6F64 | 745F |
| 0001354340 | 7079 | 0A65 | 0604 | A900 | 0405 | 7274 | 6565 | 040C |
| 0001354360 | FFFA | 00C0 | 5F06 | 745F | 7079 | 0F65 | E604 | 85FF |

THU MAR 14 17:52:34 1991 TSLINT.DLL PAGE 330, LINE 19412

| | | | | | | | | |
|---|---|---|---|---|---|---|---|---|
| 0001354400 | 0900 | 5F5F | 7862 | 745F | 7079 | 0D65 | D604 | 97FF |
| 0001354420 | 0703 | 5F5F | 7270 | 6E69 | 0B74 | CC04 | 72FF | 0504 |
| 0001354440 | 5F5F | 766C | 0D6C | DA04 | 89FF | 0706 | 5F5F | 6C63 |
| 0001354460 | 636F | 0D6B | F004 | C0FF | 0700 | 5F5F | 7473 | 6361 |
| 0001354500 | 0E6B | D204 | A9FF | 0805 | 5F5F | 6572 | 7674 | 6C61 |
| 0001354520 | 0408 | FFEC | 05A9 | 7402 | 0831 | E804 | A9FF | 0205 |
| 0001354540 | 3274 | 0407 | FFF6 | 00C0 | 7301 | 0407 | FFCA | 0081 |
| 0001354560 | 6D01 | 0408 | FFC8 | 0081 | 6E02 | 0C70 | F404 | 81FF |
| 0001354600 | 0600 | 7473 | 7461 | 7375 | 050E | 01E8 | 0009 | 069A |
| 0001354620 | 5F06 | 665F | 6E75 | 0163 | 1702 | F401 | 9D38 | AC06 |
| 0001354640 | 1003 | A100 | 0003 | 0400 | 6408 | 5F6F | 746D | 7079 |
| 0001354660 | 0A65 | 0604 | A900 | 0405 | 7274 | 6565 | 040C | FFFA |
| 0001354700 | 00C0 | 5F06 | 745F | 7079 | 0F65 | E604 | 85FF | 0900 |
| 0001354720 | 5F5F | 7862 | 745F | 7079 | 0D65 | D604 | 97FF | 0703 |
| 0001354740 | 5F5F | 7270 | 6E69 | 0B74 | CC04 | 72FF | 0504 | 5F5F |
| 0001354760 | 766C | 0D6C | DA04 | 89FF | 0706 | 5F5F | 6C63 | 636F |
| 0001355000 | 0D6B | F004 | C0FF | 0700 | 5F5F | 7473 | 6361 | 0E6B |
| 0001355020 | D204 | A9FF | 0805 | 5F5F | 6572 | 7674 | 6C61 | 0408 |
| 0001355040 | FFEC | 05A9 | 7402 | 0831 | E804 | A9FF | 0205 | 3274 |
| 0001355060 | 0407 | FFF6 | 00C0 | 7301 | 0407 | FFCA | 0081 | 6D01 |
| 0001355100 | 0408 | FFC8 | 0081 | 6E02 | 0C70 | F404 | 81FF | 0600 |
| 0001355120 | 7473 | 7461 | 7375 | 050E | 026A | 0009 | 069E | 5F06 |
| 0001355140 | 665F | 6E75 | 0163 | 2402 | A001 | A23C | B806 | 1002 |
| 0001355160 | AD00 | 0002 | 0400 | 6415 | 5F6F | 6F6D | 6576 | 6C5F |
| 0001355200 | 636F | 7461 | 726F | 745F | 6172 | 6B63 | 040A | 0006 |
| 0001355220 | 05A9 | 7404 | 6572 | 0C65 | FA04 | C0FF | 0600 | 5F5F |
| 0001355240 | 7974 | 6570 | 040F | FFEE | 0085 | 5F09 | 625F | 5F78 |
| 0001355260 | 7974 | 6570 | 040D | FFDE | 0397 | 5F07 | 705F | 6972 |
| 0001355300 | 746E | 040B | FFD4 | 0472 | 5F05 | 6C5F | 6C76 | 040D |
| 0001355320 | FFE2 | 0689 | 5F07 | 635F | 6F6C | 6B63 | 040D | FFF4 |
| 0001355340 | 00C0 | 5F07 | 735F | 6174 | 6B63 | 040E | FFDA | 05A9 |
| 0001355360 | 5F08 | 725F | 7465 | 6176 | 086C | F004 | A9FF | 0205 |
| 0001355400 | 3174 | 0408 | FFD2 | 0081 | 6D02 | 0C31 | F804 | 81FF |
| 0001355420 | 0600 | 7473 | 7461 | 7375 | 050E | 0312 | 0009 | 06A4 |
| 0001355440 | 5F06 | 665F | 6E75 | 0163 | 2202 | 5801 | A83F | 7206 |
| 0001355460 | 1003 | 6700 | 0003 | 0400 | 6413 | 5F6F | 6F6D | 6576 |
| 0001355500 | 6C5F | 636F | 7461 | 726F | 615F | 7362 | 040A | 0006 |
| 0001355520 | 05A9 | 7404 | 6572 | 0C65 | F204 | 81FF | 0600 | 7473 |
| 0001355540 | 7461 | 7375 | 040C | FFF8 | 00C0 | 5F06 | 745F | 7079 |
| 0001355560 | 0F65 | DC04 | 85FF | 0900 | 5F5F | 7862 | 745F | 7079 |
| 0001355600 | 0D65 | CC04 | 97FF | 0703 | 5F5F | 7270 | 6E69 | 0B74 |
| 0001355620 | C204 | 72FF | 0504 | 5F5F | 766C | 0D6C | D004 | 89FF |
| 0001355640 | 0706 | 5F5F | 6C63 | 636F | 0D6B | EE04 | C0FF | 0700 |
| 0001355660 | 5F5F | 7473 | 6361 | 0E6B | C804 | A9FF | 0805 | 5F5F |
| 0001355700 | 6572 | 7674 | 6C61 | 0408 | FFEA | 05A9 | 7402 | 0831 |
| 0001355720 | E604 | A9FF | 0205 | 3274 | 0408 | FFE2 | 05A9 | 7402 |
| 0001355740 | 0833 | DE04 | A9FF | 0205 | 3474 | 0408 | FFBE | 0081 |
| 0001355760 | 6E02 | 0870 | C004 | 81FF | 0200 | 316D | 0408 | FFBC |
| 0001356000 | 0081 | 6D02 | 0832 | FC04 | 81FF | 0200 | 336D | 0408 |
| 0001356020 | FFF4 | 0082 | 6D02 | 0E34 | C805 | 0903 | AAD0 | 0606 |
| 0001356040 | 5F5F | 7566 | 636E | 0201 | 0122 | 42CA | 06AE | 0372 |
| 0001356060 | 0010 | 0367 | 0000 | 1304 | 6F64 | 6D5F | 766F | 5F65 |
| 0001356100 | 6F6C | 6163 | 6F74 | 5F72 | 6572 | 0A6C | 0604 | A900 |
| 0001356120 | 0405 | 7274 | 6565 | 040C | FFF8 | 00C0 | 5F06 | 745F |
| 0001356140 | 7079 | 0F65 | DC04 | 85FF | 0900 | 5F5F | 7862 | 745F |
| 0001356160 | 7079 | 0D65 | CC04 | 97FF | 0703 | 5F5F | 7270 | 6E69 |
| 0001356200 | 0B74 | C204 | 72FF | 0504 | 5F5F | 766C | 0D6C | D004 |
| 0001356220 | 89FF | 0706 | 5F5F | 6C63 | 636F | 0D6B | EE04 | C0FF |
| 0001356240 | 0700 | 5F5F | 7473 | 6361 | 0E6B | C804 | A9FF | 0805 |

THU MAR 14 17:52:34 1991 TSLINT.DLL PAGE 331, LINE 19471

| | | | | | | | | |
|---|---|---|---|---|---|---|---|---|
| 0001356260 | 5F5F | 6572 | 7674 | 6C61 | 0408 | FFEA | 05A9 | 7402 |
| 0001356300 | 0831 | E604 | A9FF | 0205 | 3274 | 0408 | FFE2 | 05A9 |
| 0001356320 | 7402 | 0833 | DE04 | A9FF | 0205 | 3474 | 0408 | FFBE |
| 0001356340 | 0081 | 6E02 | 0870 | C004 | 81FF | 0200 | 316D | 0408 |
| 0001356360 | FFBC | 0081 | 6D02 | 0832 | FC04 | 81FF | 0200 | 336D |
| 0001356400 | 0408 | FFF4 | 0082 | 6D02 | 0C34 | F204 | 81FF | 0600 |
| 0001356420 | 7473 | 7461 | 7375 | 050E | 047C | 0009 | 06AA | 5F06 |
| 0001356440 | 665F | 6E75 | 0163 | 2002 | 3C01 | B046 | 7206 | 1003 |
| 0001356460 | 6700 | 0003 | 0400 | 6411 | 5F6F | 6F6D | 6576 | 6D5F |
| 0001356500 | 756F | 6573 | 615F | 7362 | 040A | 0006 | 05A9 | 7404 |
| 0001356520 | 6572 | 0C65 | F804 | C0FF | 0600 | 5F5F | 7974 | 6570 |
| 0001356540 | 040F | FFDC | 0085 | 5F09 | 625F | 5F78 | 7974 | 6570 |
| 0001356560 | 040D | FFCC | 0397 | 5F07 | 705F | 6972 | 746E | 040B |
| 0001356600 | FFC2 | 0472 | 5F05 | 6C5F | 6C76 | 040D | FFD0 | 0689 |
| 0001356620 | 5F07 | 635F | 6F6C | 6B63 | 040D | FFEE | 00C0 | 5F07 |
| 0001356640 | 735F | 6174 | 6B63 | 040E | FFC8 | 05A9 | 5F08 | 725F |
| 0001356660 | 7465 | 6176 | 086C | EA04 | A9FF | 0205 | 3174 | 0408 |
| 0001356700 | FFE6 | 05A9 | 7402 | 0832 | E204 | A9FF | 0205 | 3374 |
| 0001356720 | 0408 | FFDE | 05A9 | 7402 | 0834 | BE04 | 81FF | 0200 |
| 0001356740 | 706E | 0408 | FFC0 | 0081 | 6D02 | 0831 | BC04 | 81FF |
| 0001356760 | 0200 | 326D | 0408 | FFFC | 0081 | 6D02 | 0833 | F404 |
| 0001357000 | 82FF | 0200 | 346D | 040C | FFF2 | 0081 | 7306 | 6174 |
| 0001357020 | 7574 | 0E73 | 2A05 | 0905 | B100 | 0606 | 5F5F | 7566 |
| 0001357040 | 636E | 0201 | 0120 | 49AE | 06B5 | 0372 | 0010 | 0367 |
| 0001357060 | 0000 | 1104 | 6F64 | 6D5F | 766F | 5F65 | 6F6D | 7375 |
| 0001357100 | 5F65 | 6572 | 0A6C | 0604 | A900 | 0405 | 7274 | 6565 |
| 0001357120 | 0408 | FFE2 | 05A9 | 7402 | 0833 | DE04 | A9FF | 0205 |
| 0001357140 | 3474 | 0408 | FFBE | 0081 | 6E02 | 0870 | C004 | 81FF |
| 0001357160 | 0200 | 316D | 0408 | FFBC | 0081 | 6D02 | 0832 | FC04 |
| 0001357200 | 81FF | 0200 | 336D | 0408 | FFF4 | 0082 | 6D02 | 0C34 |
| 0001357220 | F204 | 81FF | 0600 | 7473 | 7461 | 7375 | 040C | FFF8 |
| 0001357240 | 00C0 | 5F06 | 745F | 7079 | 0F65 | DC04 | 85FF | 0900 |
| 0001357260 | 5F5F | 7862 | 745F | 7079 | 0D65 | CC04 | 97FF | 0703 |
| 0001357300 | 5F5F | 7270 | 6E69 | 0B74 | C204 | 72FF | 0504 | 5F5F |
| 0001357320 | 766C | 0D6C | D004 | 89FF | 0706 | 5F5F | 6C63 | 636F |
| 0001357340 | 0D6B | EE04 | C0FF | 0700 | 5F5F | 7473 | 6361 | 0E6B |
| 0001357360 | C804 | A9FF | 0805 | 5F5F | 6572 | 7674 | 6C61 | 0408 |
| 0001357400 | FFEA | 05A9 | 7402 | 0831 | E604 | A9FF | 0205 | 3274 |
| 0001357420 | 050E | 05D4 | 0009 | 06B1 | 5F06 | 665F | 6E75 | 0163 |
| 0001357440 | 1702 | 2001 | B74D | 4006 | 1000 | 3500 | 0000 | 0400 |
| 0001357460 | 6408 | 5F6F | 6567 | 5F74 | 0A78 | 0604 | A900 | 0405 |
| 0001357500 | 7274 | 6565 | 0201 | 0117 | 4D60 | 06B9 | 0040 | 0010 |
| 0001357520 | 0035 | 0000 | 0804 | 6F64 | 675F | 7465 | 795F | 040A |
| 0001357540 | 0006 | 05A9 | 7404 | 6572 | 0165 | 2802 | A001 | BB4D |
| 0001357560 | 2A06 | 1600 | 1C00 | 0000 | 0400 | 7419 | 6C73 | 735F |
| 0001357600 | 7465 | 705F | 7561 | 6573 | 6F5F | 5F6E | 696D | 6D73 |
| 0001357620 | 7461 | 6863 | 040A | 0006 | 0085 | 6604 | 616C | 0167 |
| 0001357640 | 2302 | CA01 | BD4D | 8506 | 1000 | 7A00 | 0000 | 0400 |
| 0001357660 | 6314 | 6568 | 6B63 | 6D5F | 7369 | 616D | 6374 | 5F68 |
| 0001357700 | 6170 | 7375 | 0C65 | 0604 | C000 | 0600 | 6373 | 6572 |
| 0001357720 | 6E65 | 0408 | FFDE | 066D | 7302 | 0C74 | FC04 | 81FF |
| 0001357740 | 0600 | 7473 | 7461 | 7375 | 0201 | 011E | 4E4F | 06BF |
| 0001357760 | 0338 | 0010 | 032D | 0000 | 0F04 | 6F64 | 635F | 6568 |
| 0001360000 | 6B63 | 735F | 7263 | 6565 | 0A6E | 0604 | A900 | 0405 |
| 0001360020 | 7274 | 6565 | 0408 | FFEC | 05A9 | 7402 | 0831 | E804 |
| 0001360040 | A9FF | 0205 | 3274 | 0408 | FFE4 | 05A9 | 7402 | 0833 |
| 0001360060 | C604 | 81FF | 0200 | 706E | 0408 | FFC4 | 0081 | 6D02 |
| 0001360100 | 0832 | FC04 | 81FF | 0200 | 336D | 0407 | FFF4 | 00C0 |
| 0001360120 | 7301 | 040C | FFF8 | 00C0 | 5F06 | 745F | 7079 | 0F65 |

THU MAR 14 17:52:34 1991 TSLINT.DLL PAGE 332, LINE 19530

| | | | | | | | | |
|---|---|---|---|---|---|---|---|---|
| 0001360140 | E204 | 85FF | 0900 | 5F5F | 7862 | 745F | 7079 | 0D65 |
| 0001360160 | D204 | 97FF | 0703 | 5F5F | 7270 | 6E69 | 0B74 | C804 |
| 0001360200 | 72FF | 0504 | 5F5F | 766C | 0D6C | D604 | 89FF | 0706 |
| 0001360220 | 5F5F | 6C63 | 636F | 0D6B | F004 | C0FF | 0700 | 5F5F |
| 0001360240 | 7473 | 6361 | 0E6B | CE04 | A9FF | 0805 | 5F5F | 6572 |
| 0001360260 | 7674 | 6C61 | 050E | 068A | 0009 | 06B1 | 5F06 | 665F |
| 0001360300 | 6E75 | 0163 | 1B02 | 8701 | C351 | 3806 | 1003 | 2D00 |
| 0001360320 | 0003 | 0400 | 640C | 5F6F | 6863 | 6365 | 5F6B | 6973 |
| 0001360340 | 0A67 | 0604 | A900 | 0405 | 7274 | 6565 | 040C | FFF8 |
| 0001360360 | 00C0 | 5F06 | 745F | 7079 | 0F65 | E204 | 85FF | 0900 |
| 0001360400 | 5F5F | 7862 | 745F | 7079 | 0D65 | D204 | 97FF | 0703 |
| 0001360420 | 5F5F | 7270 | 6E69 | 0B74 | C804 | 72FF | 0504 | 5F5F |
| 0001360440 | 766C | 0D6C | D604 | 89FF | 0706 | 5F5F | 6C63 | 636F |
| 0001360460 | 0D6B | F004 | C0FF | 0700 | 5F5F | 7473 | 6361 | 0E6B |
| 0001360500 | CE04 | A9FF | 0805 | 5F5F | 6572 | 7674 | 6C61 | 0408 |
| 0001360520 | FFEC | 05A9 | 7402 | 0831 | E804 | A9FF | 0205 | 3274 |
| 0001360540 | 0408 | FFE4 | 05A9 | 7402 | 0833 | C604 | 81FF | 0200 |
| 0001360560 | 706E | 0408 | FFC4 | 0081 | 6D02 | 0832 | FC04 | 81FF |
| 0001360600 | 0200 | 336D | 0407 | FFF4 | 00C0 | 7301 | 050E | 0720 |
| 0001360620 | 0009 | 0227 | 5F06 | 665F | 6E75 | 0163 | 1C02 | BF01 |
| 0001360640 | C654 | C006 | 1002 | B500 | 0002 | 0400 | 640D | 5F6F |
| 0001360660 | 6573 | 5F74 | 6966 | 746C | 7265 | 040A | 0006 | 05A9 |
| 0001360700 | 7404 | 6572 | 0C65 | FA04 | C0FF | 0600 | 5F5F | 7974 |
| 0001360720 | 6570 | 040F | FFEA | 0085 | 5F09 | 625F | 5F78 | 7974 |
| 0001360740 | 6570 | 040D | FFDA | 0397 | 5F07 | 705F | 6972 | 746E |
| 0001360760 | 040B | FFD0 | 0472 | 5F05 | 6C5F | 6C76 | 040D | FFDE |
| 0001361000 | 0689 | 5F07 | 635F | 6F6C | 6B63 | 040D | FFF0 | 00C0 |
| 0001361020 | 5F07 | 735F | 6174 | 6B63 | 040E | FFD6 | 05A9 | 5F08 |
| 0001361040 | 725F | 7465 | 6176 | 086C | EC04 | A9FF | 0205 | 3174 |
| 0001361060 | 0408 | FFCE | 0081 | 6E02 | 0770 | F604 | C0FF | 0100 |
| 0001361100 | 0C73 | F404 | 81FF | 0600 | 7473 | 7461 | 7375 | 050E |
| 0001361120 | 07B0 | 0009 | 06C8 | 5F06 | 665F | 6E75 | 0163 | 1E02 |
| 0001361140 | 7F01 | CC57 | C006 | 1002 | B500 | 0002 | 0400 | 640F |
| 0001361160 | 5F6F | 6572 | 6573 | 5F74 | 6966 | 746C | 7265 | 040A |
| 0001361200 | 0006 | 05A9 | 7404 | 6572 | 0C65 | FA04 | C0FF | 0600 |
| 0001361220 | 5F5F | 7974 | 6570 | 040F | FFEA | 0085 | 5F09 | 625F |
| 0001361240 | 5F78 | 7974 | 6570 | 040D | FFDA | 0397 | 5F07 | 705F |
| 0001361260 | 6972 | 746E | 040B | FFD0 | 0472 | 5F05 | 6C5F | 6C76 |
| 0001361300 | 040D | FFDE | 0689 | 5F07 | 635F | 6F6C | 6B63 | 040D |
| 0001361320 | FFF0 | 00C0 | 5F07 | 735F | 6174 | 6B63 | 040E | FFD6 |
| 0001361340 | 05A9 | 5F08 | 725F | 7465 | 6176 | 086C | EC04 | A9FF |
| 0001361360 | 0205 | 3174 | 0408 | FFCE | 0081 | 6E02 | 0770 | F604 |
| 0001361400 | C0FF | 0100 | 0C73 | F404 | 81FF | 0600 | 7473 | 7461 |
| 0001361420 | 7375 | 050E | 0848 | 0009 | 06B1 | 5F06 | 665F | 6E75 |
| 0001361440 | 0163 | 1F02 | 3F01 | D05A | F106 | 1002 | E600 | 0002 |
| 0001361460 | 0400 | 6410 | 5F6F | 6573 | 5F74 | 7865 | 6563 | 7470 |
| 0001361500 | 6F69 | 0A6E | 0604 | A900 | 0405 | 7274 | 6565 | 040C |
| 0001361520 | FFFA | 00C0 | 5F06 | 745F | 7079 | 0F65 | E204 | 85FF |
| 0001361540 | 0900 | 5F5F | 7862 | 745F | 7079 | 0D65 | D204 | 97FF |
| 0001361560 | 0703 | 5F5F | 7270 | 6E69 | 0B74 | C804 | 72FF | 0504 |
| 0001361600 | 5F5F | 766C | 0D6C | D604 | 89FF | 0706 | 5F5F | 6C63 |
| 0001361620 | 636F | 0D6B | F004 | C0FF | 0700 | 5F5F | 7473 | 6361 |
| 0001361640 | 0E6B | CE04 | A9FF | 0805 | 5F5F | 6572 | 7674 | 6C61 |
| 0001361660 | 0408 | FFE8 | 05A9 | 7402 | 0831 | E404 | A9FF | 0205 |
| 0001361700 | 3274 | 0408 | FFC6 | 0081 | 6E02 | 0870 | F404 | C0FF |
| 0001361720 | 0200 | 3173 | 0408 | FFEC | 00C0 | 7302 | 0C32 | F804 |
| 0001361740 | 81FF | 0600 | 7473 | 7461 | 7375 | 050E | 08E8 | 0009 |
| 0001361760 | 066B | 5F06 | 665F | 6E75 | 0163 | 2102 | 3001 | D35D |
| 0001362000 | C006 | 1002 | B500 | 0002 | 0400 | 6412 | 5F6F | 6572 |

THU MAR 14 17:52:34 1991 TSLINT.DLL PAGE 333, LINE 19589

| | | | | | | | | |
|---|---|---|---|---|---|---|---|---|
| 0001362020 | 6573 | 5F74 | 7865 | 6563 | 7470 | 6F69 | 0A6E | 0604 |
| 0001362040 | A900 | 0405 | 7274 | 6565 | 040D | FFDA | 0397 | 5F07 |
| 0001362060 | 705F | 6972 | 746E | 040B | FFD0 | 0472 | 5F05 | 6C5F |
| 0001362100 | 6C76 | 040D | FFDE | 0689 | 5F07 | 635F | 6F6C | 6B63 |
| 0001362120 | 040D | FFF0 | 00C0 | 5F07 | 735F | 6174 | 6B63 | 040E |
| 0001362140 | FFD6 | 05A9 | 5F08 | 725F | 7465 | 6176 | 086C | EC04 |
| 0001362160 | A9FF | 0205 | 3174 | 0408 | FFCE | 0081 | 6E02 | 0770 |
| 0001362200 | F604 | C0FF | 0100 | 0C73 | F404 | 81FF | 0600 | 7473 |
| 0001362220 | 7461 | 7375 | 040C | FFFA | 00C0 | 5F06 | 745F | 7079 |
| 0001362240 | 0F65 | EA04 | 85FF | 0900 | 5F5F | 7862 | 745F | 7079 |
| 0001362260 | 0E65 | 8C05 | 0909 | D400 | 0606 | 5F5F | 7566 | 636E |
| 0001362300 | 0201 | 0116 | 5FF0 | 06D7 | 02A9 | 0010 | 029E | 0000 |
| 0001362320 | 0704 | 6F64 | 745F | 6365 | 0A68 | 0604 | A900 | 0405 |
| 0001362340 | 7274 | 6565 | 040C | FFFA | 00C0 | 5F06 | 745F | 7079 |
| 0001362360 | 0F65 | EE04 | 85FF | 0900 | 5F5F | 7862 | 745F | 7079 |
| 0001362400 | 0D65 | DE04 | 97FF | 0703 | 5F5F | 7270 | 6E69 | 0B74 |
| 0001362420 | D404 | 72FF | 0504 | 5F5F | 766C | 0D6C | E204 | 89FF |
| 0001362440 | 0706 | 5F5F | 6C63 | 636F | 0D6B | F404 | C0FF | 0700 |
| 0001362460 | 5F5F | 7473 | 6361 | 0E6B | DA04 | A9FF | 0805 | 5F5F |
| 0001362500 | 6572 | 7674 | 6C61 | 0407 | FFD2 | 0081 | 6E01 | 0408 |
| 0001362520 | FFF0 | 05A9 | 7402 | 0C31 | F804 | 81FF | 0600 | 7473 |
| 0001362540 | 7461 | 7375 | 050E | 0A0E | 0009 | 069E | 5F06 | 665F |
| 0001362560 | 6E75 | 0163 | 1702 | 9901 | DA62 | 0C06 | 1002 | 0100 |
| 0001362600 | 0002 | 0400 | 6408 | 5F6F | 6170 | 7375 | 0A65 | 0604 |
| 0001362620 | A900 | 0405 | 7274 | 6565 | 040C | FFFA | 00C0 | 5F06 |
| 0001362640 | 745F | 7079 | 0F65 | EC04 | 85FF | 0900 | 5F5F | 7862 |
| 0001362660 | 745F | 7079 | 0D65 | DC04 | 97FF | 0703 | 5F5F | 7270 |
| 0001362700 | 6E69 | 0B74 | D204 | 72FF | 0504 | 5F5F | 766C | 0D6C |
| 0001362720 | E004 | 89FF | 0706 | 5F5F | 6C63 | 636F | 0D6B | F604 |
| 0001362740 | C0FF | 0700 | 5F5F | 7473 | 6361 | 0E6B | D804 | A9FF |
| 0001362760 | 0805 | 5F5F | 6572 | 7674 | 6C61 | 0409 | FFEE | 00C0 |
| 0001363000 | 6D03 | 6773 | 0408 | FFF2 | 05A9 | 7402 | 0E31 | 3E05 |
| 0001363020 | 090A | DB00 | 0606 | 5F5F | 7566 | 636E | 0201 | 0116 |
| 0001363040 | 64A5 | 06DD | 02A1 | 0010 | 0296 | 0000 | 0704 | 6F64 |
| 0001363060 | 775F | 6961 | 0A74 | 0604 | A900 | 0405 | 7274 | 6565 |
| 0001363100 | 040C | FFFA | 00C0 | 5F06 | 745F | 7079 | 0F65 | F004 |
| 0001363120 | 85FF | 0900 | 5F5F | 7862 | 745F | 7079 | 0D65 | E004 |
| 0001363140 | 97FF | 0703 | 5F5F | 7270 | 6E69 | 0B74 | D604 | 72FF |
| 0001363160 | 0504 | 5F5F | 766C | 0D6C | E404 | 89FF | 0706 | 5F5F |
| 0001363200 | 6C63 | 636F | 0D6B | F604 | C0FF | 0700 | 5F5F | 7473 |
| 0001363220 | 6361 | 0E6B | DC04 | A9FF | 0805 | 5F5F | 6572 | 7674 |
| 0001363240 | 6C61 | 040A | FFD2 | 0086 | 7404 | 6D69 | 0865 | F204 |
| 0001363260 | A9FF | 0205 | 3174 | 050E | 0AB8 | 0009 | 069E | 5F06 |
| 0001363300 | 665F | 6E75 | 0163 | 1A02 | 4601 | DF67 | 4A06 | 1000 |
| 0001363320 | 3F00 | 0000 | 0400 | 640B | 5F6F | 6567 | 5F74 | 6974 |
| 0001363340 | 656D | 040A | 0006 | 05A9 | 7404 | 6572 | 0165 | 1A02 |
| 0001363360 | 9001 | E167 | A606 | 1000 | 9B00 | 0000 | 0400 | 640B |
| 0001363400 | 5F6F | 6974 | 656D | 735F | 7274 | 040A | 0006 | 05A9 |
| 0001363420 | 7404 | 6572 | 0965 | FA04 | A9FF | 0305 | 6D74 | 0770 |
| 0001363440 | F204 | 82FF | 0100 | 0774 | F604 | C0FF | 0100 | 0173 |
| 0001363460 | 1902 | 3601 | E368 | 6A06 | 1001 | 5F00 | 0001 | 0400 |
| 0001363500 | 640A | 5F6F | 6962 | 6270 | 706B | 0A74 | 0604 | A900 |
| 0001363520 | 0405 | 7274 | 6565 | 040C | FFFA | 00C0 | 5F06 | 745F |
| 0001363540 | 7079 | 0F65 | F404 | 85FF | 0900 | 5F5F | 7862 | 745F |
| 0001363560 | 7079 | 0D65 | E404 | 97FF | 0703 | 5F5F | 7270 | 6E69 |
| 0001363600 | 0B74 | DA04 | 72FF | 0504 | 5F5F | 766C | 0D6C | E804 |
| 0001363620 | 89FF | 0706 | 5F5F | 6C63 | 636F | 0D6B | F604 | C0FF |
| 0001363640 | 0700 | 5F5F | 7473 | 6361 | 0E6B | E004 | A9FF | 0805 |
| 0001363660 | 5F5F | 6572 | 7674 | 6C61 | 050E | 0AE8 | 0009 | 069E |

THU MAR 14 17:52:34 1991 TSLINT.DLL PAGE 334, LINE 19648

| | | | | | | | | |
|---|---|---|---|---|---|---|---|---|
| 0001363700 | 5F06 | 665F | 6E75 | 0163 | 2002 | A001 | E569 | D906 |
| 0001363720 | 1001 | CE00 | 0001 | 0400 | 7411 | 6C73 | 725F | 6E75 |
| 0001363740 | 6974 | 656D | 655F | 7272 | 726F | 0407 | 0006 | 00C0 |
| 0001363760 | 7301 | 040C | FFFA | 00C0 | 5F06 | 745F | 7079 | 0F65 |
| 0001364000 | F204 | 85FF | 0900 | 5F5F | 7862 | 745F | 7079 | 0D65 |
| 0001364020 | E204 | 97FF | 0703 | 5F5F | 7270 | 6E69 | 0B74 | D804 |
| 0001364040 | 72FF | 0504 | 5F5F | 766C | 0D6C | E604 | 89FF | 0706 |
| 0001364060 | 5F5F | 6C63 | 636F | 0D6B | F404 | C0FF | 0700 | 5F5F |
| 0001364100 | 7473 | 6361 | 0E6B | DE04 | A9FF | 0805 | 5F5F | 6572 |
| 0001364120 | 7674 | 6C61 | 040C | FFF8 | 0081 | 7306 | 6174 | 7574 |
| 0001364140 | 0E73 | 1A05 | 090B | E600 | 0606 | 5F5F | 7566 | 636E |
| 0001364160 | 0201 | 0511 | 00B8 | 0009 | 0081 | 6609 | 7269 | 7473 |
| 0001364200 | 6172 | 646E | 0519 | 00BA | 0009 | 0085 | 7011 | 7561 |
| 0001364220 | 6573 | 6F5F | 5F6E | 696D | 6D73 | 7461 | 6863 | 050D |
| 0001364240 | 7E20 | 0009 | 049D | 7305 | 6174 | 6574 | 0D05 | 0000 |
| 0001364260 | 001A | 0511 | 0856 | 0008 | 05B2 | 7309 | 6174 | 6B63 |
| 0001364300 | 705F | 7274 | 0514 | 373A | 0009 | 05A9 | 4E0C | 756E |
| 0001364320 | 6C6C | 735F | 7274 | 6E69 | 0E67 | 4205 | 0937 | 8100 |
| 0001364340 | 0600 | 7473 | 6972 | 7463 | 050F | 00B0 | 0009 | 00C0 |
| 0001364360 | 4207 | 785F | 6946 | 656C | 0516 | 3856 | 0009 | 0081 |
| 0001364400 | 740E | 6C73 | 735F | 6174 | 646E | 6C61 | 6E6F | 0F65 |
| 0001364420 | B405 | 0900 | C000 | 0700 | 5F42 | 5078 | 6361 | 0A6B |
| 0001364440 | B005 | 080A | A900 | 0205 | 745F | 050F | 0A84 | 0008 |
| 0001364460 | 05A9 | 5F07 | 6572 | 7573 | 746C | 0512 | 0C76 | 0008 |
| 0001364500 | 05B2 | 660A | 6569 | 646C | 5F73 | 7261 | 0F72 | 6205 |
| 0001364520 | 080C | A900 | 0705 | 5346 | 6E5F | 646F | 0F65 | 9A05 |
| 0001364540 | 080A | A900 | 0705 | 464E | 6E5F | 646F | 0E65 | 4E05 |
| 0001364560 | 0975 | 5400 | 0605 | 635F | 7974 | 6570 | 0513 | 1568 |
| 0001364600 | 0009 | 0081 | 6E0B | 646F | 3065 | 765F | 6C61 | 6469 |
| 0001364620 | 050F | 000C | 0008 | 05A9 | 5207 | 5F53 | 6F6E | 6564 |
| 0001364640 | 050D | 0AA0 | 0008 | 05A9 | 6405 | 7265 | 6665 | 050F |
| 0001364660 | 0C82 | 0008 | 05A9 | 4E07 | 5F52 | 6F6E | 6564 | 0515 |
| 0001364700 | 007C | 0008 | 05A9 | 460D | 4C49 | 4E45 | 4D41 | 5F45 |
| 0001364720 | 6F6E | 6564 | 0510 | 0C58 | 0008 | 05A9 | 4F08 | 5346 |
| 0001364740 | 6E5F | 646F | 1465 | 0005 | 0000 | 8100 | 0C00 | 7842 |
| 0001364760 | 445F | 6265 | 6775 | 6F4D | 6564 | 0510 | 0030 | 0008 |
| 0001365000 | 05A9 | 4F08 | 5352 | 6E5F | 646F | 1465 | 0005 | 0000 |
| 0001365020 | 8100 | 0C00 | 7842 | 545F | 6D69 | 7365 | 6F4D | 6564 |
| 0001365040 | 0511 | 0A80 | 0008 | 05A9 | 4F09 | 4D46 | 5F54 | 6F6E |
| 0001365060 | 6564 | 050C | 70E8 | 0009 | 051E | 5F04 | 6F69 | 1062 |
| 0001365100 | 6A05 | 080C | A900 | 0805 | 4E46 | 5F52 | 6F6E | 6564 |
| 0001365120 | 0510 | 0000 | 0000 | 0081 | 4208 | 5F78 | 5F42 | 6973 |
| 0001365140 | 1467 | 6205 | 080A | A900 | 0C05 | 4C52 | 4E45 | 5447 |
| 0001365160 | 5F48 | 6F6E | 6564 | 0513 | 0AB4 | 0008 | 05A9 | 520B |
| 0001365200 | 5453 | 5241 | 5F54 | 6F6E | 6564 | 0513 | 0A66 | 0008 |
| 0001365220 | 05A9 | 530B | 4255 | 4553 | 5F50 | 6F6E | 6564 | 0514 |
| 0001365240 | 085A | 0008 | 05A9 | 450C | 564E | 5249 | 4E4F | 6E5F |
| 0001365260 | 646F | 1765 | 6605 | 080C | A900 | 0F05 | 4749 | 4F4E |
| 0001365300 | 4552 | 4143 | 4553 | 6E5F | 646F | 1165 | 7C05 | 080A |
| 0001365320 | A900 | 0905 | 5241 | 4347 | 6E5F | 646F | 1165 | B805 |
| 0001365340 | 080A | A900 | 0905 | 5241 | 5647 | 6E5F | 646F | 1165 |
| 0001365360 | C405 | 080A | 2B00 | 0906 | 6176 | 6972 | 6261 | 656C |
| 0001365400 | 0573 | 0111 | 0000 | 1800 | 7A01 | 5E6B | EF05 | 1008 |
| 0001365420 | E400 | 0008 | 0400 | 6609 | 6E75 | 5F63 | 6163 | 6C6C |
| 0001365440 | 040A | 0006 | 0497 | 6E04 | 6D61 | 0E65 | 0A04 | 9700 |
| 0001365460 | 0804 | 7261 | 5F67 | 696C | 7473 | 040C | FFE4 | 00C0 |
| 0001365500 | 5F06 | 745F | 7079 | 0F65 | BA04 | 85FF | 0900 | 5F5F |
| 0001365520 | 7862 | 745F | 7079 | 0D65 | 9804 | 02FF | 0702 | 5F5F |
| 0001365540 | 7270 | 6E69 | 0B74 | 7C04 | 0EFF | 0505 | 5F5F | 766C |

THU MAR 14 17:52:34 1991 TSLINT.DLL PAGE 335, LINE 19707

| | | | | | | | | |
|---|---|---|---|---|---|---|---|---|
| 0001365560 | 0D6C | 9C04 | 61FF | 0705 | 5F5F | 6C63 | 636F | 0D6B |
| 0001365600 | DC04 | C0FF | 0700 | 5F5F | 7473 | 6361 | 0E6B | 8204 |
| 0001365620 | 97FF | 0804 | 5F5F | 6572 | 7674 | 6C61 | 0409 | FF72 |
| 0001365640 | 0497 | 6103 | 6772 | 040A | FF6E | 0497 | 6104 | 6772 |
| 0001365660 | 0770 | 6A04 | 97FF | 0104 | 0772 | 7604 | 97FF | 0104 |
| 0001365700 | 076E | D204 | 97FF | 0104 | 1466 | 8604 | 4FFF | 0E05 |
| 0001365720 | 7566 | 636E | 745F | 6761 | 735F | 6174 | 6B63 | 0414 |
| 0001365740 | FFA8 | 054F | 6C0E | 6F6F | 5F70 | 6174 | 5F67 | 7473 |
| 0001365760 | 6361 | 156B | BE04 | 4FFF | 0F05 | 6261 | 726F | 5F74 |
| 0001366000 | 6174 | 5F67 | 7473 | 6361 | 146B | E804 | 4FFF | 0E05 |
| 0001366020 | 6574 | 7473 | 745F | 6761 | 735F | 6174 | 6B63 | 0415 |
| 0001366040 | FFD0 | 0081 | 6C0F | 6F6F | 5F70 | 6173 | 6576 | 765F |
| 0001366060 | 6C61 | 6469 | 0416 | FFD6 | 0081 | 6110 | 6F62 | 7472 |
| 0001366100 | 735F | 7661 | 5F65 | 6176 | 696C | 1564 | 7A04 | 81FF |
| 0001366120 | 0F00 | 6574 | 7473 | 735F | 7661 | 5F65 | 6176 | 696C |
| 0001366140 | 1464 | D804 | 97FF | 0E04 | 6572 | 5F74 | 6F6E | 6564 |
| 0001366160 | 735F | 6174 | 6B63 | 0411 | FFFA | 04A0 | 6C0B | 636F |
| 0001366200 | 6C61 | 735F | 6174 | 6B63 | 0408 | FFE0 | 04A0 | 7302 |
| 0001366220 | 0B70 | BC04 | 81FF | 0500 | 6F63 | 6E75 | 0E74 | 0E05 |
| 0001366240 | 090C | 6000 | 0605 | 5F5F | 7566 | 636E | 0005 | 7349 |
| 0001366260 | 0086 | 040A | FF68 | 0085 | 5F04 | 735F | 017A | 0102 |
| 0001366300 | 1702 | 6901 | 6A74 | 9605 | 1003 | 8B00 | 0003 | 0400 |
| 0001366320 | 6408 | 5F6F | 616D | 6374 | 0A68 | 0604 | 9700 | 0404 |
| 0001366340 | 7274 | 6565 | 0408 | FFF4 | 0497 | 7402 | 0C31 | FC04 |
| 0001366360 | 81FF | 0600 | 7372 | 6174 | 7472 | 040C | FFCC | 0486 |
| 0001366400 | 7206 | 7265 | 6765 | 0873 | F804 | 9DFF | 0204 | 7072 |
| 0001366420 | 0201 | 0115 | 77FF | 056E | 0A00 | 0010 | 09F5 | 0000 |
| 0001366440 | 0604 | 6F64 | 735F | 6275 | 040A | 0006 | 0497 | 7404 |
| 0001366460 | 6572 | 0F65 | 9C04 | 85FF | 0900 | 6173 | 6576 | 6C66 |
| 0001366500 | 6761 | 0973 | F204 | 97FF | 0304 | 6D74 | 0970 | D804 |
| 0001366520 | A0FF | 0304 | 686C | 0D73 | F604 | C0FF | 0700 | 616C |
| 0001366540 | 7473 | 7562 | 0C66 | FA04 | C0FF | 0600 | 5F5F | 7974 |
| 0001366560 | 6570 | 040F | FFAE | 0085 | 5F09 | 625F | 5F78 | 7974 |
| 0001366600 | 6570 | 040D | FF9E | 0202 | 5F07 | 705F | 6972 | 746E |
| 0001366620 | 040B | FF92 | 050E | 5F05 | 6C5F | 6C76 | 040D | FFA2 |
| 0001366640 | 0561 | 5F07 | 635F | 6F6C | 6B63 | 040D | FFDE | 00C0 |
| 0001366660 | 5F07 | 735F | 6174 | 6B63 | 040E | FF98 | 0497 | 5F08 |
| 0001366700 | 725F | 7465 | 6176 | 086C | 810D | 0E00 | 6C03 | 6E65 |
| 0001366720 | 040A | FF88 | 00C0 | 7304 | 6163 | 086E | 8404 | C0FF |
| 0001366740 | 0200 | 7062 | 0408 | FF80 | 00C0 | 6302 | 1270 | E604 |
| 0001366760 | 81FF | 0C00 | 6573 | 7261 | 6863 | 735F | 6174 | 7472 |
| 0001367000 | 0412 | FF8C | 0081 | 6D0C | 7461 | 6863 | 6C5F | 6E65 |
| 0001367020 | 7467 | 0D68 | DC04 | 81FF | 0700 | 616D | 6374 | 6568 |
| 0001367040 | 0973 | 8E04 | C0FF | 0300 | 7562 | 0C66 | F004 | 81FF |
| 0001367060 | 0600 | 6C67 | 626F | 6C61 | 0408 | FFEC | 049D | 7202 |
| 0001367100 | 0770 | E804 | 97FF | 0104 | 0773 | E204 | 97FF | 0104 |
| 0001367120 | 0C74 | B004 | 86FF | 0604 | 6572 | 6572 | 7367 | 050E |
| 0001367140 | 0CBC | 0009 | 056F | 5F06 | 665F | 6E75 | 0563 | 0200 |
| 0001367160 | 8580 | 0A00 | 7E04 | 85FF | 0400 | 5F5F | 7A73 | 0201 |
| 0001367200 | 0201 | 0514 | 0A62 | 0008 | 0497 | 520C | 454C | 474E |
| 0001367220 | 4854 | 6E5F | 646F | 1365 | B405 | D80A | 9700 | 0B04 |
| 0001367240 | 5352 | 4154 | 5452 | 6E5F | 646F | 1765 | 6605 | 080C |
| 0001367260 | 9700 | 0F04 | 4749 | 4F4E | 4552 | 4143 | 4553 | 6E5F |
| 0001367300 | 646F | 0F65 | 0605 | 090C | C000 | 0700 | 5F42 | 4678 |
| 0001367320 | 6C69 | 1465 | 3A05 | 0937 | 9700 | DC04 | 6E4E | 6C75 |
| 0001367340 | 5F6C | 7473 | 6972 | 676E | 0D05 | 0000 | 001A | 050E |
| 0001367360 | 3742 | 0009 | 0081 | 7306 | 7274 | 6369 | 0F74 | 0A05 |
| 0001367400 | 090C | C000 | 0700 | 5F42 | 5078 | 6361 | 106B | 3805 |
| 0001367420 | 0800 | 4F00 | 0805 | 6574 | 7473 | 745F | 6761 | 0514 |

THU MAR 14 17:52:34 1991 TSLINT.DLL PAGE 336, LINE 19766

```
0001367440  0000  0000  0081  420C  5F78  6544  7562  4D67
0001367460  646F  1665  5805  0938  8100  0E00  6574  7473
0001367500  745F  6761  765F  6C61  6469  0514  0000  0000
0001367520  0081  420C  5F78  6954  656D  4D73  646F  1165
0001367540  8805  080A  4F00  0905  6261  726F  5F74  6174
0001367560  1067  0005  0000  8100  0800  7842  425F  735F
0001367600  6769  0517  385A  0009  0081  610F  6F62  7472
0001367620  745F  6761  765F  6C61  6469  0510  0054  0008
0001367640  054F  6608  6E75  5F63  6174  1667  5C05  0938
0001367660  8100  0E00  7566  636E  745F  6761  765F  6C61
0001367700  6469  0510  0066  0008  054F  6C08  6F6F  5F70
0001367720  6174  1667  5E05  0938  8100  0E00  6F6C  706F
0001367740  745F  6761  765F  6C61  6469  0511  0856  0008
0001367760  04A0  7309  6174  6B63  705F  7274  0511  0AC4
0001370000  0008  0550  7609  7261  6169  6C62  7365  0510
0001370020  0C5E  0008  0497  7208  7465  6E5F  646F  1365
0001370040  7005  0926  8400  0B00  7374  5F6C  656D  746D
0001370060  7079  0A65  B005  080A  9700  0204  745F  050F
0001370100  0A84  0008  0497  5F07  6572  7573  746C  0511
0001370120  0AC2  0008  0081  6609  6569  646C  6E5F  6D75
0001370140  0512  0C76  0008  04A0  660A  6569  646C  5F73
0001370160  7261  1372  6805  0915  8100  0B00  6F6E  6564
0001370200  5F30  6176  696C  0D64  A005  080A  9700  0504
0001370220  6564  6572  0566  0111  0000  1400  0001  3182
0001370240  1D05  1001  1200  0001  0400  7005  7274  6565
0001370260  0407  0006  0475  6E01  040C  FFFA  00C0  5F06
0001370300  745F  7079  0F65  F404  85FF  0900  5F5F  7862
0001370320  745F  7079  0D65  E404  02FF  0702  5F5F  7270
0001370340  6E69  0B74  DC04  ECFF  0504  5F5F  766C  0D6C
0001370360  E804  33FF  0705  5F5F  6C63  636F  0D6B  F604
0001370400  C0FF  0700  5F5F  7473  6361  0E6B  E204  81FF
0001370420  0800  5F5F  6572  7674  6C61  050E  1050  0009
0001370440  0532  5F06  665F  6E75  0163  1102  1D01  3483
0001370460  1B05  1000  1000  0000  0400  7002  0174  1F02
0001370500  3801  3683  4205  100C  3700  000C  0400  7010
0001370520  6972  746E  705F  7261  6573  745F  6572  0965
0001370540  0604  7500  0304  7470  0B72  DC04  ECFF  0504
0001370560  5F5F  766C  0D6C  E804  33FF  0705  5F5F  6C63
0001370600  636F  0D6B  F604  C0FF  0700  5F5F  7473  6361
0001370620  0E6B  E204  81FF  0800  5F5F  6572  7674  6C61
0001370640  040C  FFFA  00CD  5F06  745F  7079  0F65  F404
0001370660  85FF  0900  5F5F  7862  745F  7079  0D65  E404
0001370700  02FF  0702  5F5F  7270  6E69  0E74  B205  0911
0001370720  3800  0605  5F5F  7566  636E  0005  87DC  0231
0001370740  0407  FFD8  04C6  6C01  0201  0201  0118  8F7A
0001370760  053C  02D8  001D  02CD  0000  0904  7564  706D
0001371000  765F  7261  0C73  FA04  C0FF  0600  5F5F  7974
0001371020  6570  040F  FFF4  0085  5F09  625F  5F78  7974
0001371040  6570  040D  FFE4  0202  5F07  705F  6972  746E
0001371060  040B  FFDC  04EC  5F05  6C5F  6C76  040D  FFE8
0001371100  0533  5F07  635F  6F6C  6B63  040D  FFF6  00C0
0001371120  5F07  735F  6174  6B63  040E  FFE2  0081  5F08
0001371140  725F  7465  6176  066C  810D  0E00  6E01  0D09
0001371160  0081  040F  6E62  6D75  0409  FFD8  0475  6203
0001371200  6375  050E  1220  0009  053D  5F06  665F  6E75
0001371220  0163  1A02  5201  4392  3A05  1000  2F00  0000
0001371240  0400  700E  6972  746E  645F  6265  6775  0409
0001371260  0006  00C0  7303  7274  0407  000A  0081  6E01
0001371300  0201  011B  928C  0545  21DC  0010  21D1  0000
```

THU MAR 14 17:52:34 1991 TSLINT.DLL PAGE 337, LINE 19825

| | | | | | | | | |
|---|---|---|---|---|---|---|---|---|
| 0001371320 | 0C04 | 7270 | 6E69 | 5F74 | 5F61 | 6F6E | 6564 | 0409 |
| 0001371340 | 0006 | 0475 | 7003 | 7274 | 040D | FFF2 | 00C0 | 5F07 |
| 0001371360 | 735F | 6174 | 6B63 | 040E | FFD2 | 0081 | 5F08 | 725F |
| 0001371400 | 7465 | 6176 | 086C | F604 | 75FF | 0204 | 3170 | 0409 |
| 0001371420 | FFEE | 00C0 | 7303 | 7274 | 040A | FFD8 | 00C0 | 7304 |
| 0001371440 | 7274 | 0732 | CA04 | 81FF | 0100 | 096E | E804 | 75FF |
| 0001371460 | 0304 | 7562 | 0C63 | FA04 | C0FF | 0600 | 5F5F | 7974 |
| 0001371500 | 6570 | 040F | FFEC | 0085 | 5F09 | 625F | 5F78 | 7974 |
| 0001371520 | 6570 | 040D | FFD4 | 0202 | 5F07 | 705F | 6972 | 746E |
| 0001371540 | 040B | FFCC | 04EC | 5F05 | 6C5F | 6C76 | 040D | FFDC |
| 0001371560 | 0533 | 5F07 | 635F | 6F6C | 6B63 | 050E | 14B0 | 0009 |
| 0001371600 | 0284 | 5F06 | 665F | 6E75 | 0D63 | D80B | 0095 | 7008 |
| 0001371620 | 5F72 | 7774 | 6F6F | 0D70 | 2C0B | 0097 | 7008 | 5F72 |
| 0001371640 | 6E6F | 6F65 | 0170 | 1F02 | 6801 | 47B4 | A605 | 1001 |
| 0001371660 | 9B00 | 0001 | 0400 | 7010 | 6972 | 746E | 6D5F | 7961 |
| 0001371700 | 6562 | 735F | 6D65 | 0969 | 0604 | 7500 | 0304 | 7470 |
| 0001371720 | 0C72 | FA04 | C0FF | 0600 | 5F5F | 7974 | 6570 | 040F |
| 0001371740 | FFF4 | 0085 | 5F09 | 625F | 5F78 | 7974 | 6570 | 040D |
| 0001371760 | FFE4 | 0202 | 5F07 | 705F | 6972 | 746E | 040B | FFDC |
| 0001372000 | 04EC | 5F05 | 6C5F | 6C76 | 040D | FFE8 | 0533 | 5F07 |
| 0001372020 | 635F | 6F6C | 6B63 | 040D | FFF6 | 00C0 | 5F07 | 735F |
| 0001372040 | 6174 | 6B63 | 040E | FFE2 | 0081 | 5F08 | 725F | 7465 |
| 0001372060 | 6176 | 0E6C | D005 | 0914 | 3800 | 0605 | 5F5F | 7566 |
| 0001372100 | 636E | 0201 | 011E | B60E | 0549 | 02E8 | 0010 | 02DD |
| 0001372120 | 0000 | 0F04 | 6564 | 6C61 | 775F | 7469 | 5F68 | 7563 |
| 0001372140 | 6C72 | 0973 | 0604 | 7500 | 0304 | 7470 | 0C72 | FA04 |
| 0001372160 | C0FF | 0600 | 5F5F | 7974 | 6570 | 040F | FFF4 | 0085 |
| 0001372200 | 5F09 | 625F | 5F78 | 7974 | 6570 | 040D | FFE4 | 0202 |
| 0001372220 | 5F07 | 705F | 6972 | 746E | 040B | FFDC | 04EC | 5F05 |
| 0001372240 | 6C5F | 6C76 | 040D | FFE8 | 0533 | 5F07 | 635F | 6F6C |
| 0001372260 | 6B63 | 040D | FFF6 | 00C0 | 5F07 | 735F | 6174 | 6B63 |
| 0001372300 | 040E | FFE2 | 0081 | 5F08 | 725F | 7465 | 6176 | 076C |
| 0001372320 | DA04 | 81FF | 0100 | 0E6E | 1205 | 0915 | 4A00 | 0605 |
| 0001372340 | 5F5F | 7566 | 636E | 0201 | 0118 | B8F6 | 054B | 0030 |
| 0001372360 | 0010 | 0025 | 0000 | 0904 | 6F64 | 705F | 7672 | 7261 |
| 0001372400 | 0173 | 1402 | 2601 | 4CB9 | 2B05 | 1000 | 2000 | 0000 |
| 0001372420 | 0400 | 6405 | 5F6F | 7062 | 0201 | 0D05 | 0000 | 001A |
| 0001372440 | 050F | 0F00 | 0009 | 00C0 | 4207 | 785F | 6946 | 656C |
| 0001372460 | 050F | 0F04 | 0009 | 00C0 | 4207 | 785F | 6150 | 6B63 |
| 0001372500 | 0511 | 0AC4 | 0008 | 0511 | 7609 | 7261 | 6169 | 6C62 |
| 0001372520 | 7365 | 0511 | 0F08 | 0009 | 0081 | 6409 | 6265 | 6775 |
| 0001372540 | 6967 | 676E | 050D | 0F0A | 0009 | 0081 | 6405 | 7065 |
| 0001372560 | 6874 | 050E | 0F0C | 0009 | 052F | 6E06 | 616E | 656D |
| 0001372600 | 1473 | 0005 | 0000 | 8100 | 0C00 | 7842 | 445F | 6265 |
| 0001372620 | 6775 | 6F4D | 6564 | 0514 | 0000 | 0000 | 0081 | 420C |
| 0001372640 | 5F78 | 6954 | 656D | 4D73 | 646F | 1065 | 0005 | 0000 |
| 0001372660 | 8100 | 0800 | 7842 | 425F | 735F | 6769 | 0514 | 373A |
| 0001372700 | 0009 | 0475 | 4E0C | 756E | 6C6C | 735F | 7274 | 6E69 |
| 0001372720 | 0E67 | AE05 | 0914 | 8100 | 0600 | 6E69 | 6564 | 746E |
| 0001372740 | 1105 | 0002 | 0000 | 011A | 0000 | 0585 | 01FC | 0010 |
| 0001372760 | 01F1 | 0000 | 0B04 | 6E69 | 7469 | 665F | 6569 | 646C |
| 0001373000 | 0C73 | FA04 | C0FF | 0600 | 5F5F | 7974 | 6570 | 040F |
| 0001373020 | FFF4 | 0085 | 5F09 | 625F | 5F78 | 7974 | 6570 | 040D |
| 0001373040 | FFE4 | 0202 | 5F07 | 705F | 6972 | 746E | 040B | FFDC |
| 0001373060 | 02D4 | 5F05 | 6C5F | 6C76 | 040D | FFE8 | 0588 | 5F07 |
| 0001373100 | 635F | 6F6C | 6B63 | 040D | FFF6 | 00C0 | 5F07 | 735F |
| 0001373120 | 6174 | 6B63 | 040E | FFE2 | 0081 | 5F08 | 725F | 7465 |
| 0001373140 | 6176 | 0E6C | 7E05 | 0915 | 5400 | 0603 | 5F5F | 7566 |
| 0001373160 | 636E | 0201 | 0118 | 01FC | 058D | 0230 | 0010 | 0225 |

THU MAR 14 17:52:34 1991 TSLINT.DLL PAGE 338, LINE 19884

| | | | | | | | | |
|---|---|---|---|---|---|---|---|---|
| 0001373200 | 0000 | 0904 | 6573 | 5F74 | 6966 | 6C65 | 0964 | 0604 |
| 0001373220 | 8100 | 0300 | 756E | 096D | 0804 | C000 | 0300 | 7473 |
| 0001373240 | 0972 | 0C04 | 8100 | 0300 | 656C | 0B6E | 0E04 | E700 |
| 0001373260 | 0504 | 7564 | 6D6D | 0C79 | FA04 | C0FF | 0600 | 5F5F |
| 0001373300 | 7974 | 6570 | 040F | FFF2 | 0085 | 5F09 | 625F | 5F78 |
| 0001373320 | 7974 | 6570 | 040D | FFE2 | 0202 | 5F07 | 705F | 6972 |
| 0001373340 | 746E | 040B | FFDA | 02D4 | 5F05 | 6C5F | 6C76 | 040D |
| 0001373360 | FFE6 | 0588 | 5F07 | 635F | 6F6C | 6B63 | 040D | FFF4 |
| 0001373400 | 00C0 | 5F07 | 735F | 6174 | 6B63 | 040E | FFE0 | 0081 |
| 0001373420 | 5F08 | 725F | 7465 | 6176 | 076C | D604 | E7FF | 0104 |
| 0001373440 | 076E | F804 | 81FF | 0100 | 0E74 | C405 | 0915 | 8F00 |
| 0001373460 | 0605 | 5F5F | 7566 | 636E | 0515 | 15D0 | 00D9 | 0081 |
| 0001373500 | 6E0D | 5F66 | 6968 | 6867 | 775F | 7461 | 7265 | 0005 |
| 0001373520 | 02AA | 00FA | 040F | FFD0 | 0085 | 5F09 | 6F5F | 646C |
| 0001373540 | 6973 | 657A | 040E | FFD2 | 00C0 | 5F08 | 6F5F | 646C |
| 0001373560 | 6176 | 0172 | 0102 | 1D02 | 2C01 | 9104 | 8A05 | 1003 |
| 0001373600 | 7F00 | 0003 | 0400 | 720E | 6265 | 6975 | 646C | 725F |
| 0001373620 | 6365 | 726F | 0E64 | DA04 | 81FF | 0800 | 5F5F | 6572 |
| 0001373640 | 7674 | 6C61 | 0D09 | 0081 | 040E | 6C74 | 6E65 | 0409 |
| 0001373660 | FFD0 | 04E7 | 7403 | 706D | 0409 | FFEE | 04E7 | 6F03 |
| 0001373700 | 7366 | 0409 | FFF6 | 00C0 | 6F03 | 7370 | 040A | FFCC |
| 0001373720 | 00C0 | 6304 | 706F | 0973 | C804 | F0FF | 0304 | 7470 |
| 0001373740 | 0A72 | C404 | F0FF | 0404 | 616D | 7078 | 040C | FFFA |
| 0001373760 | 00C0 | 5F06 | 745F | 7079 | 0F65 | EC04 | 85FF | 0900 |
| 0001374000 | 5F5F | 7862 | 745F | 7079 | 0D65 | DC04 | 02FF | 0702 |
| 0001374020 | 5F5F | 7270 | 6E69 | 0B74 | D404 | D4FF | 0502 | 5F5F |
| 0001374040 | 766C | 0D6C | E004 | 88FF | 0705 | 5F5F | 6C63 | 636F |
| 0001374060 | 0D6B | F204 | C0FF | 0700 | 5F5F | 7473 | 6361 | 0E6B |
| 0001374100 | 0205 | 0916 | 9200 | 0605 | 5F5F | 7566 | 636E | 0201 |
| 0001374120 | 011B | 07B6 | 0594 | 0925 | 0010 | 091A | 0000 | 0C04 |
| 0001374140 | 6567 | 5F74 | 5F61 | 6572 | 6F63 | 6472 | 0409 | 0006 |
| 0001374160 | 0210 | 7203 | 7365 | 0409 | 000A | 050B | 6903 | 706F |
| 0001374200 | 040C | FFFA | 00C0 | 5F06 | 745F | 7079 | 0F65 | F004 |
| 0001374220 | 85FF | 0900 | 5F5F | 7862 | 745F | 7079 | 0D65 | E004 |
| 0001374240 | 02FF | 0702 | 5F5F | 7270 | 6E69 | 0B74 | D804 | D4FF |
| 0001374260 | 0502 | 5F5F | 766C | 0D6C | E404 | 88FF | 0705 | 5F5F |
| 0001374300 | 6C63 | 636F | 0D6B | F204 | C0FF | 0700 | 5F5F | 7473 |
| 0001374320 | 6361 | 0E6B | DE04 | 81FF | 0800 | 5F5F | 6572 | 7674 |
| 0001374340 | 6C61 | 040E | FFCE | 00C0 | 6508 | 646E | 645F | 7461 |
| 0001374360 | 0D61 | CA04 | C0FF | 0700 | 6E65 | 5F64 | 7562 | 0B66 |
| 0001374400 | D404 | C0FF | 0500 | 7473 | 7261 | 0874 | C604 | C0FF |
| 0001374420 | 0200 | 7062 | 040A | FFF6 | 00C0 | 6C04 | 7361 | 0974 |
| 0001374440 | D204 | 81FF | 0300 | 656C | 086E | C404 | 80FF | 0200 |
| 0001374460 | 7372 | 050E | 16D8 | 0009 | 0320 | 5F06 | 665F | 6E75 |
| 0001374500 | 0563 | 1300 | FB0A | 0F00 | BE04 | 85FF | 0900 | 5F5F |
| 0001374520 | 6C6F | 7364 | 7A69 | 0E65 | C004 | C0FF | 0800 | 5F5F |
| 0001374540 | 6C6F | 7664 | 7261 | 0201 | 0005 | 0CFB | 00FB | 040F |
| 0001374560 | FFBE | 0085 | 5F09 | 6F5F | 646C | 6973 | 657A | 040E |
| 0001374600 | FFC0 | 00C0 | 5F08 | 6F5F | 646C | 6176 | 0172 | 0502 |
| 0001374620 | 8700 | FB0F | 0F00 | BE04 | 85FF | 0900 | 5F5F | 6C6F |
| 0001374640 | 7364 | 7A69 | 0E65 | C004 | C0FF | 0800 | 5F5F | 6C6F |
| 0001374660 | 7664 | 7261 | 0201 | 0201 | 0114 | 10DB | 0598 | 00E6 |
| 0001374700 | 0010 | 00DB | 0000 | 0504 | 6E69 | 6572 | 0963 | 0604 |
| 0001374720 | 0B00 | 0305 | 6F69 | 0970 | FC04 | 81FF | 0300 | 6E63 |
| 0001374740 | 0C74 | FA04 | 81FF | 0600 | 6572 | 7674 | 6C61 | 0201 |
| 0001374760 | 0119 | 11C1 | 059A | 010E | 0010 | 0103 | 0000 | 0A04 |
| 0001375000 | 6573 | 5F74 | 6572 | 6F63 | 6472 | 0409 | 0006 | 00C0 |
| 0001375020 | 6203 | 6675 | 0409 | 000A | 0081 | 6303 | 746E | 0D06 |
| 0001375040 | 0081 | 010E | 0169 | 1802 | CF01 | 9C12 | DD05 | 1001 |

THU MAR 14 17:52:34 1991 TSLINT.DLL PAGE 339, LINE 19943

| | | | | | | | | |
|---|---|---|---|---|---|---|---|---|
| 0001375060 | D200 | 0001 | 0400 | 6709 | 7465 | 665F | 6569 | 646C |
| 0001375100 | 0409 | 0006 | 0081 | 6E03 | 6D75 | 040C | 0008 | 0081 |
| 0001375120 | 6106 | 7373 | 6769 | 076E | FC04 | 81FF | 0100 | 016E |
| 0001375140 | 1B02 | AC01 | 9E14 | 9505 | 1002 | 8A00 | 0002 | 0400 |
| 0001375160 | 700C | 7261 | 6573 | 665F | 6569 | 646C | 0B73 | 0604 |
| 0001375200 | 8100 | 0500 | 7075 | 745F | 096F | 0804 | 1000 | 0302 |
| 0001375220 | 7562 | 0966 | 0C04 | 8100 | 0300 | 656C | 086E | 0E04 |
| 0001375240 | C000 | 0200 | 7366 | 0409 | 0012 | 02EE | 7303 | 7465 |
| 0001375260 | 0407 | 0016 | 04E7 | 6E01 | 0407 | FFFA | 00C0 | 7301 |
| 0001375300 | 0408 | FFF4 | 00C0 | 6605 | 6569 | 646C | 040A | FFF0 |
| 0001375320 | 00C0 | 7304 | 6163 | 096E | EC04 | C0FF | 0300 | 6E65 |
| 0001375340 | 0864 | F804 | 81FF | 0200 | 464E | 0005 | 1509 | 00B8 |
| 0001375360 | 040C | FFC4 | 04D6 | 7206 | 7265 | 6765 | 0173 | 0102 |
| 0001375400 | 1702 | 4101 | A017 | 1205 | 1008 | 0700 | 0008 | 0400 |
| 0001375420 | 7208 | 5F65 | 7073 | 696C | 0974 | 0604 | C000 | 0300 |
| 0001375440 | 7562 | 0966 | 0A04 | 8100 | 0300 | 656C | 086E | 0C04 |
| 0001375460 | C000 | 0200 | 7366 | 040C | 0010 | 0543 | 7206 | 7265 |
| 0001375500 | 6765 | 0D73 | E404 | 02FF | 0702 | 5F5F | 7270 | 6E69 |
| 0001375520 | 0B74 | DC04 | D4FF | 0502 | 5F5F | 766C | 0D6C | E804 |
| 0001375540 | 88FF | 0705 | 5F5F | 6C63 | 636F | 0D6B | F604 | C0FF |
| 0001375560 | 0700 | 5F5F | 7473 | 6361 | 0E6B | E204 | 81FF | 0800 |
| 0001375600 | 5F5F | 6572 | 7674 | 6C61 | 040C | FFFA | 00C0 | 5F06 |
| 0001375620 | 745F | 7079 | 0F65 | F404 | 85FF | D900 | 5F5F | 7862 |
| 0001375640 | 745F | 7079 | 0A65 | 2405 | 097F | ED00 | 0204 | 7072 |
| 0001375660 | 050F | 1814 | 0009 | 00C0 | 6C07 | 7361 | 5F74 | 7366 |
| 0001375700 | 050E | 180A | 0009 | 05A1 | 5F06 | 665F | 6E75 | 0563 |
| 0001375720 | 9400 | 9218 | 0A00 | DA04 | 85FF | 0400 | 5F5F | 7A73 |
| 0001375740 | 0201 | 0005 | 1926 | 0095 | 040A | FFDA | 0085 | 5F04 |
| 0001375760 | 735F | 017A | 0502 | BB00 | 8919 | 0A00 | DA04 | 85FF |
| 0001376000 | 0400 | 5F5F | 7A73 | 0201 | 0005 | 1A44 | 0089 | 040A |
| 0001376020 | FFDA | 0085 | 5F04 | 735F | 017A | 0102 | 1902 | 5301 |
| 0001376040 | A41F | 8805 | 1006 | 7D00 | 0006 | 0400 | 640A | 5F6F |
| 0001376060 | 6567 | 6C74 | 6E69 | 0A65 | 0604 | E700 | 0404 | 7274 |
| 0001376100 | 6565 | 040F | FFEA | 0085 | 5F09 | 625F | 5F78 | 7974 |
| 0001376120 | 6570 | 040D | FFDA | 0202 | 5F07 | 705F | 6972 | 746E |
| 0001376140 | 040B | FFD0 | 02D4 | 5F05 | 6C5F | 6C76 | 040D | FFDE |
| 0001376160 | 0588 | 5F07 | 635F | 6F6C | 6B63 | 04DD | FFF6 | 00C0 |
| 0001376200 | 5F07 | 735F | 6174 | 6B63 | 040E | FFD6 | 04E7 | 5F08 |
| 0001376220 | 725F | 7465 | 6176 | 096C | EC04 | 0BFF | 0305 | 6F69 |
| 0001376240 | 0970 | F404 | 81FF | 0300 | 6E63 | 0974 | F004 | F0FF |
| 0001376260 | 0304 | 686C | 1173 | CE04 | 81FF | 0B00 | 6572 | 6964 |
| 0001376300 | 5F72 | 7265 | 6F72 | 0C72 | FA04 | C0FF | 0600 | 5F5F |
| 0001376320 | 7974 | 6570 | 050E | 183E | 0009 | 058F | 5F06 | 665F |
| 0001376340 | 6E75 | 0563 | AB00 | 7122 | 0702 | CA04 | C0FF | 0100 |
| 0001376360 | 0773 | C804 | 81FF | 0100 | 056E | 7900 | 8323 | 0A00 |
| 0001376400 | C604 | 85FF | 0400 | 5F5F | 7A73 | 0201 | 0201 | 0201 |
| 0001376420 | 0116 | 25DB | 05A6 | 040C | 0010 | 0401 | 0000 | 0704 |
| 0001376440 | 6567 | 5F74 | 686C | 0973 | 0604 | E700 | 0304 | 7470 |
| 0001376460 | 0C72 | 0A04 | 8100 | 0600 | 7361 | 6973 | 6E67 | 040A |
| 0001376500 | FFF6 | 04F0 | 6104 | 7470 | 0772 | FA04 | E7FF | 0104 |
| 0001376520 | 016E | 1702 | E701 | AB29 | 2A05 | 1004 | 1F00 | 0004 |
| 0001376540 | 0400 | 6408 | 5F6F | 6564 | 6572 | 0C66 | FA04 | C0FF |
| 0001376560 | 0600 | 5F5F | 7974 | 6570 | 040F | FFF4 | 0085 | 5F09 |
| 0001376600 | 625F | 5F78 | 7974 | 6570 | 040D | FFE4 | 0202 | 5F07 |
| 0001376620 | 705F | 6972 | 746E | 040B | FFDC | 02D4 | 5F05 | 6C5F |
| 0001376640 | 6C76 | 040D | FFE8 | 0588 | 5F07 | 635F | 6F6C | 6B63 |
| 0001376660 | 040D | FFF6 | 00C0 | 5F07 | 735F | 6174 | 6B63 | 040E |
| 0001376700 | FFE2 | 0081 | 5F08 | 725F | 7465 | 6176 | 0E6C | 3E05 |
| 0001376720 | 091A | A100 | 0605 | 5F5F | 7566 | 636E | 0005 | 2CDB |

THU MAR 14 17:52:34 1991 TSLINT.DLL PAGE 340, LINE 20002

| | | | | | | | | |
|---|---|---|---|---|---|---|---|---|
| 0001376740 | 00A4 | 040A | FFDA | 0085 | 5F04 | 735F | 017A | 0102 |
| 0001376760 | 1702 | 1101 | AC2E | 6405 | 1002 | 5900 | 0002 | 0400 |
| 0001377000 | 6E08 | 7865 | 6674 | 6C69 | 0965 | F404 | C0FF | 0300 |
| 0001377020 | 7261 | 0867 | FA04 | C0FF | 0200 | 7063 | 0408 | FFF8 |
| 0001377040 | 0081 | 6602 | 0964 | 7205 | 091A | 8100 | 0100 | 0D69 |
| 0001377060 | 7405 | 091A | 8100 | 0500 | 6966 | 656C | 0F73 | 7605 |
| 0001377100 | 091A | 0B00 | 0705 | 7563 | 6672 | 6C69 | 0165 | 1802 |
| 0001377120 | 7501 | AF30 | D805 | 1004 | CD00 | 0004 | 0400 | 6909 |
| 0001377140 | 706F | 615F | [illegible] | 636F | 0408 | 0006 | 0081 | 6602 |
| 0001377160 | 0B64 | B804 | D4FF | 0502 | 5F5F | 766C | 0D6C | C604 |
| 0001377200 | 88FF | 0705 | 5F5F | 6C63 | 636F | 0D6B | F604 | C0FF |
| 0001377220 | 0700 | 5F5F | 7473 | 6361 | 0E6B | BE04 | 0BFF | 0805 |
| 0001377240 | 5F5F | 6572 | 7674 | 6C61 | 0409 | FFF2 | 050B | 6903 |
| 0001377260 | 706F | 0409 | FFD4 | 0498 | 7303 | 6274 | 040C | FFFA |
| 0001377300 | 00C0 | 5F06 | 745F | 7079 | 0F65 | D204 | 85FF | 0900 |
| 0001377320 | 5F5F | 7862 | 745F | 7079 | 0D65 | C204 | 02FF | 0702 |
| 0001377340 | 5F5F | 7270 | 6E69 | 0E74 | 0E05 | 091B | B100 | 0605 |
| 0001377360 | 5F5F | 7566 | 636E | 0201 | 0117 | 354D | 05B4 | 0050 |
| 0001377400 | 0010 | 0045 | 0000 | 0804 | 6F64 | 695F | 706E | 7475 |
| 0001377420 | 0409 | FFFA | 050B | 6903 | 706F | 0201 | 0118 | 359D |
| 0001377440 | 05B6 | 0317 | 0010 | 030C | 0000 | 0904 | 6F69 | 5F70 |
| 0001377460 | 6C63 | 736F | 0965 | 0604 | 0B00 | 0305 | 6F69 | 0C70 |
| 0001377500 | FA04 | C0FF | 0600 | 5F5F | 7974 | 6570 | 040F | FFF4 |
| 0001377520 | 0085 | 5F09 | 625F | 5F78 | 7974 | 6570 | 040D | FFE2 |
| 0001377540 | 0202 | 5F07 | 705F | 6972 | 746E | 040B | FFDA | 02D4 |
| 0001377560 | 5F05 | 6C5F | 6C76 | 040D | FFE8 | 0588 | 5F07 | 635F |
| 0001377600 | 6F6C | 6B63 | 040D | FFF6 | 00C0 | 5F07 | 735F | 6174 |
| 0001377620 | 6B63 | 040E | FFE0 | 0081 | 5F08 | 725F | 7465 | 6176 |
| 0001377640 | 096C | E604 | 81FF | 0300 | 6572 | 0E74 | 7C05 | 091B |
| 0001377660 | B100 | 0605 | 5F5F | 7566 | 636E | 0005 | 3666 | 0092 |
| 0001377700 | 040A | FFD8 | 0085 | 5F04 | 735F | 017A | 0502 | F800 |
| 0001377720 | 9236 | 0A00 | D804 | 85FF | 0400 | 5F5F | 7A73 | 0201 |
| 0001377740 | 0005 | 378A | 0083 | 040A | FFD8 | 0085 | 5F04 | 735F |
| 0001377760 | 017A | 0102 | 1602 | B401 | B838 | 7605 | 1000 | 6B00 |
| 0001400000 | 0000 | 0400 | 6407 | 5F6F | 6966 | 656C | 0409 | 0006 |
| 0001400020 | 050B | 6903 | 706F | 0201 | 0115 | 392A | 05B9 | 005A |
| 0001400040 | 0010 | 004F | 0000 | 0604 | 6567 | 5F74 | 7372 | 0409 |
| 0001400060 | FFFA | 04E7 | 7403 | 706D | 0201 | 0117 | 3984 | 05BB |
| 0001400100 | 08CA | 0010 | 08BF | 0000 | 0804 | 6572 | 6964 | 6572 |
| 0001400120 | 7463 | 040A | 0006 | 04E7 | 7404 | 6572 | 0C65 | 0A04 |
| 0001400140 | C100 | 0600 | 7265 | 6672 | 676C | 040C | FFFA | 00C0 |
| 0001400160 | 5F06 | 745F | 7079 | 0F65 | EE04 | 85FF | 0900 | 5F5F |
| 0001400200 | 7862 | 745F | 7079 | 0D65 | DE04 | 02FF | 0702 | 5F5F |
| 0001400220 | 7270 | 6E69 | 0B74 | D404 | D4FF | 0502 | 5F5F | 766C |
| 0001400240 | 0D6C | E204 | 88FF | 0705 | 5F5F | 6C63 | 636F | 0D6B |
| 0001400260 | F004 | C0FF | 0700 | 5F5F | 7473 | 6361 | 0E6B | DA04 |
| 0001400300 | 0CFF | 0805 | 5F5F | 6572 | 7674 | 6C61 | 0409 | FFCE |
| 0001400320 | 04E7 | 7403 | 706D | 0408 | FFCA | 050C | 7202 | 0970 |
| 0001400340 | C604 | C0FF | 0300 | 7473 | 0872 | C204 | 89FF | 0202 |
| 0001400360 | 7066 | 040B | FFD2 | 0081 | 7405 | 6C66 | 6761 | 0410 |
| 0001400400 | FFF4 | 0081 | 660A | 6C69 | 7365 | 6F5F | 6570 | 0F6E |
| 0001400420 | F604 | C0FF | 0900 | 6964 | 6572 | 7463 | 6F69 | 0E6E |
| 0001400440 | 3C05 | 091D | A100 | 0605 | 5F5F | 7566 | 636E | 0201 |
| 0001400460 | 0118 | 424E | 05C2 | 012E | 0010 | 0123 | 0000 | 0904 |
| 0001400500 | 6C63 | 736F | 5F65 | 6E6F | 0865 | FA04 | 0CFF | 0205 |
| 0001400520 | 7072 | 040C | FFF6 | 050C | 7206 | 6C70 | 7361 | 0174 |
| 0001400540 | 1702 | 7C01 | C543 | 9405 | 1001 | 8900 | 0001 | 0400 |
| 0001400560 | 6408 | 5F6F | 6C63 | 736F | 0A65 | 0604 | E700 | 0404 |
| 0001400600 | 7274 | 6565 | 0409 | FFFA | 04E7 | 7403 | 706D | 0408 |

THU MAR 14 17:52:34 1991 TSLINT.DLL PAGE 341, LINE 20061

| | | | | | | | | |
|---|---|---|---|---|---|---|---|---|
| 0001400620 | FFF6 | 050C | 7202 | 0170 | 2302 | 1001 | C645 | BA05 |
| 0001400640 | 1001 | AF00 | 0001 | 0400 | 6314 | 6F6C | 6573 | 615F |
| 0001400660 | 6C6C | 6F5F | 6570 | 5F6E | 6966 | 656C | 0C73 | FA04 |
| 0001400700 | C0FF | 0600 | 5F5F | 7974 | 6570 | 040F | FFEE | 0085 |
| 0001400720 | 5F09 | 625F | 5F78 | 7974 | 6570 | 040D | FFDE | 0202 |
| 0001400740 | 5F07 | 705F | 6972 | 746E | 040B | FFD6 | 02D4 | 5F05 |
| 0001400760 | 6C5F | 6C76 | 040D | FFE2 | 0588 | 5F07 | 635F | 6F6C |
| 0001401000 | 6B63 | 040D | FFF2 | 00C0 | 5F07 | 735F | 6174 | 6B63 |
| 0001401020 | 040E | FFDC | 0081 | 5F08 | 725F | 7465 | 6176 | 0C6C |
| 0001401040 | F604 | 81FF | 0600 | 7473 | 7461 | 7375 | 0408 | FFD2 |
| 0001401060 | 050C | 7202 | 0E70 | AA04 | C9FF | 0805 | 7072 | 6576 |
| 0001401100 | 7463 | 726F | 0407 | FFF0 | 0081 | 6901 | 040F | FFF8 |
| 0001401120 | 0081 | 6609 | 6C69 | 7365 | 6E5F | 6D75 | 050E | 1D8C |
| 0001401140 | 0009 | 05C8 | 5F06 | 665F | 6E75 | 0163 | 1702 | CA01 |
| 0001401160 | CB46 | 0A05 | 1003 | FF00 | 0002 | 0400 | 6308 | 6F6C |
| 0001401200 | 6573 | 665F | 0870 | 0604 | 0C00 | 0205 | 7072 | 040C |
| 0001401220 | FFFA | 00C0 | 5F06 | 745F | 7079 | 0F65 | F204 | 85FF |
| 0001401240 | 0900 | 5F5F | 7862 | 745F | 7079 | 0D65 | E204 | 02FF |
| 0001401260 | 0702 | 5F5F | 7270 | 6E69 | 0B74 | DA04 | D4FF | 0502 |
| 0001401300 | 5F5F | 766C | 0D6C | E604 | 88FF | 0705 | 5F5F | 6C63 |
| 0001401320 | 636F | 0D6B | F404 | C0FF | 0700 | 5F5F | 7473 | 6361 |
| 0001401340 | 0E6B | E004 | 81FF | 0800 | 5F5F | 6572 | 7674 | 6C61 |
| 0001401360 | 040C | FFF8 | 0081 | 7306 | 6174 | 7574 | 0E73 | FA05 |
| 0001401400 | 091D | A100 | 0605 | 5F5F | 7566 | 636E | 0005 | 4836 |
| 0001401420 | 0092 | 040A | FFD8 | 0085 | 5F04 | 735F | 017A | 0502 |
| 0001401440 | C800 | 8348 | 0A00 | D804 | 85FF | 0400 | 5F5F | 7A73 |
| 0001401460 | 0201 | 0201 | 0117 | 49D4 | 05CD | 0107 | 0010 | 00FC |
| 0001401500 | 0000 | 0804 | 6C66 | 7375 | 5F68 | 6F69 | 0408 | FFF8 |
| 0001401520 | 050C | 7202 | 0C70 | FC04 | 81FF | 0600 | 7473 | 7461 |
| 0001401540 | 7375 | 0201 | 0117 | 4ADB | 05CF | 00A9 | 0010 | 009E |
| 0001401560 | 0000 | 0804 | 6C63 | 736F | 5F65 | 6F69 | 0408 | FFF8 |
| 0001401600 | 050C | 7202 | 0C70 | FC04 | 81FF | 0600 | 7473 | 7461 |
| 0001401620 | 7375 | 0201 | 0116 | 4B84 | 05D1 | 01E9 | 0010 | 01DE |
| 0001401640 | 0000 | 0704 | 6564 | 6F76 | 6570 | 0A6E | 0604 | C000 |
| 0001401660 | 0400 | 616E | 656D | 040A | 000A | 00C0 | 6D04 | 646F |
| 0001401700 | 0865 | FA04 | C0FF | 0200 | 7063 | 040A | FFF8 | 0081 |
| 0001401720 | 6604 | 616C | 0C67 | F604 | 81FF | 0600 | 706F | 6E65 |
| 0001401740 | 6466 | 0201 | 0511 | 0856 | 0008 | 04F0 | 7309 | 6174 |
| 0001401760 | 6B63 | 705F | 7274 | 0D05 | 0000 | 001A | 0518 | 0C72 |
| 0001402000 | 0008 | 04E7 | 6510 | 7078 | 6572 | 7373 | 6F69 | 5F6E |
| 0001402020 | 6176 | 756C | 0A65 | B005 | 080A | E700 | 0204 | 745F |
| 0001402040 | 0513 | 2670 | 0009 | 0084 | 740B | 6C73 | 6D5F | 6D65 |
| 0001402060 | 7974 | 6570 | 050F | 0A84 | 0008 | 04E7 | 5F07 | 6572 |
| 0001402100 | 7573 | 746C | 0511 | 3D12 | 0009 | 050F | 6309 | 7361 |
| 0001402120 | 7465 | 6261 | 656C | 0511 | 0AC2 | 0008 | 0081 | 6609 |
| 0001402140 | 6569 | 646C | 6E5F | 6D75 | 050F | 3D0E | 0009 | 0081 |
| 0001402160 | 6507 | 6978 | 6974 | 676E | 0512 | 0C76 | 0008 | 04F0 |
| 0001402200 | 660A | 6569 | 646C | 5F73 | 7261 | 0F72 | 9A05 | 080A |
| 0001402220 | E700 | 0704 | 464E | 6E5F | 646F | 0D65 | 1A05 | 0800 |
| 0001402240 | E300 | 0504 | 6F6E | 6564 | 0F30 | 0005 | 0800 | E700 |
| 0001402260 | 0704 | 5352 | 6E5F | 646F | 1365 | 6805 | 0915 | 8100 |
| 0001402300 | 0B00 | 6F6E | 6564 | 5F30 | 6176 | 696C | 0F64 | 8205 |
| 0001402320 | 080C | E700 | 0704 | 524E | 6E5F | 646F | 0D65 | A005 |
| 0001402340 | 080A | E700 | 0504 | 6564 | 6572 | 1566 | 7C05 | 0800 |
| 0001402360 | E700 | 0D04 | 4946 | 454C | 414E | 454D | 6E5F | 646F |
| 0001402400 | 1065 | 5805 | 080C | E700 | 0804 | 464F | 5F53 | 6F6E |
| 0001402420 | 6564 | 0510 | 0C6A | 0008 | 04E7 | 4608 | 524E | 6E5F |
| 0001402440 | 646F | 1065 | 6A05 | 0915 | 0C00 | 0805 | 6572 | 5F64 |
| 0001402460 | 6568 | 6461 | 0518 | 156E | 0009 | 0081 | 6710 | 7465 |

THU MAR 14 17:52:34 1991 TSLINT.DLL PAGE 342, LINE 20120

| | | | | | | | | |
|---|---|---|---|---|---|---|---|---|
| 0001402500 | 696C | 656E | 725F | 6465 | 7269 | 6365 | 1074 | 7005 |
| 0001402520 | 0915 | C000 | 0800 | 696C | 656E | 625F | 6675 | 0512 |
| 0001402540 | 1574 | 0009 | 0081 | 6C0A | 6E69 | 5F65 | 6C61 | 6F6C |
| 0001402560 | 1463 | 2005 | 097F | C000 | 0C00 | 6170 | 7372 | 5F65 |
| 0001402600 | 7865 | 6574 | 746E | 0517 | 0C66 | 0008 | 04E7 | 490F |
| 0001402620 | 4E47 | 524F | 4345 | 5341 | 5F45 | 6F6E | 6564 | 0518 |
| 0001402640 | 1576 | 0009 | 0081 | 7010 | 7261 | 6573 | 685F | 6769 |
| 0001402660 | 5F68 | 6177 | 6574 | 1172 | 7C05 | 080A | E700 | 0904 |
| 0001402700 | 5241 | 4347 | 6E5F | 646F | 0F65 | 7805 | 0915 | 2600 |
| 0001402720 | 0703 | 5F66 | 6D65 | 7470 | 1179 | B805 | 080A | E700 |
| 0001402740 | 0904 | 5241 | 5647 | 6E5F | 646F | 0F65 | 7A05 | 0915 |
| 0001402760 | C000 | 0700 | 6173 | 6576 | 665F | 0C73 | E805 | 0970 |
| 0001403000 | 8800 | 0402 | 695F | 626F | 0513 | 7824 | 0009 | 020C |
| 0001403020 | 730B | 7379 | 655F | 7272 | 696C | 7473 | 050F | 1560 |
| 0001403040 | 0009 | 00C0 | 4207 | 785F | 6946 | 656C | 050F | 1564 |
| 0001403060 | 0009 | 00C0 | 4207 | 785F | 6150 | 6B63 | 0514 | 373A |
| 0001403100 | 0009 | 04E7 | 4E0C | 756E | 6C6C | 735F | 7274 | 6E69 |
| 0001403120 | 0E67 | 3E05 | 0937 | C000 | 0600 | 796D | 616E | 656D |
| 0001403140 | 0514 | 0000 | 0000 | 0081 | 420C | 5F78 | 6544 | 7562 |
| 0001403160 | 4D67 | 646F | 0E65 | 4205 | 0937 | 8100 | 0600 | 7473 |
| 0001403200 | 6972 | 7463 | 0514 | 0000 | 0000 | 0081 | 420C | 5F78 |
| 0001403220 | 6954 | 656D | 4D73 | 646F | 1065 | 0005 | 0000 | 8100 |
| 0001403240 | 0800 | 7842 | 425F | 735F | 6769 | 1105 | 0002 | 0000 |
| 0001403260 | 0119 | 4D6E | 0553 | 0787 | 0010 | 077C | 0000 | 0A04 |
| 0001403300 | 6F63 | 636E | 7461 | 655F | 7078 | 040A | 0006 | 04D1 |
| 0001403320 | 7404 | 6572 | 0C65 | FA04 | C0FF | 0600 | 5F5F | 7974 |
| 0001403340 | 6570 | 040F | FFE6 | 0085 | 5F09 | 625F | 5F78 | 7974 |
| 0001403360 | 6570 | 040D | FFD6 | 022C | 5F07 | 705F | 6972 | 746E |
| 0001403400 | 040B | FFCC | 0285 | 5F05 | 6C5F | 6C76 | 040D | FFDA |
| 0001403420 | 0556 | 5F07 | 635F | 6F6C | 6B63 | 040D | FFE8 | 00C0 |
| 0001403440 | 5F07 | 735F | 6174 | 6B63 | 040E | FFD2 | 04D1 | 5F08 |
| 0001403460 | 725F | 7465 | 6176 | 076C | F004 | D1FF | 0104 | 0772 |
| 0001403500 | EC04 | C0FF | 0100 | 0973 | CA04 | 85FF | 0300 | 656C |
| 0001403520 | 0F6E | F804 | 81FF | 0900 | 7573 | 7362 | 7065 | 656C |
| 0001403540 | 0C6E | F404 | C0FF | 0600 | 7573 | 7362 | 7065 | 050E |
| 0001403560 | 1F34 | 0009 | 6555 | 5F06 | 665F | 6E75 | 0563 | AB00 |
| 0001403600 | C252 | 0F00 | C404 | 85FF | 0900 | 5F5F | 6C6F | 7364 |
| 0001403620 | 7A69 | 0E65 | C604 | C0FF | 0800 | 5F5F | 6C6F | 7664 |
| 0001403640 | 7261 | 0201 | 0005 | 53DF | 0082 | 040A | FFC4 | 0085 |
| 0001403660 | 5F04 | 735F | 017A | 0102 | 1A02 | F501 | 5C54 | EA05 |
| 0001403700 | 1000 | DF00 | 0000 | 0400 | 610B | 7373 | 636F | 635F |
| 0001403720 | 656C | 7261 | 040C | 0006 | 04D1 | 7306 | 6D79 | 6F62 |
| 0001403740 | 076C | FC04 | 81FF | 0100 | 0C69 | F804 | D1FF | 0604 |
| 0001403760 | 7562 | 6B63 | 7465 | 040A | FFF4 | 04D1 | 6E04 | 7865 |
| 0001404000 | 0174 | 1802 | DF01 | 5E55 | 8A05 | 1000 | 7F00 | 0000 |
| 0001404020 | 0400 | 6809 | 7361 | 5F68 | 6163 | 636C | 040A | 0006 |
| 0001404040 | 04D1 | 7304 | 6275 | 0A73 | 810D | 0E00 | 6805 | 7361 |
| 0001404060 | 3168 | 0D06 | 0081 | 010F | 0169 | 1902 | 6901 | 6056 |
| 0001404100 | 8C05 | 1000 | 8100 | 0000 | 0400 | 610A | 7373 | 636F |
| 0001404120 | 665F | 6E69 | 0C64 | 0604 | D100 | 0604 | 7973 | 626D |
| 0001404140 | 6C6F | 040A | 000A | 04D1 | 7304 | 6275 | 0B73 | 0E04 |
| 0001404160 | 8100 | 0500 | 6168 | 6873 | 0C31 | FA04 | D1FF | 0604 |
| 0001404200 | 7562 | 6B63 | 7465 | 0201 | 0117 | 56F5 | 0562 | 00FD |
| 0001404220 | 0010 | 00F2 | 0000 | 0804 | 6E69 | 615F | 7272 | 7961 |
| 0001404240 | 040C | 0006 | 04D1 | 7306 | 6D79 | 6F62 | 0A6C | 0A04 |
| 0001404260 | D100 | 0404 | 7573 | 7362 | 0D0A | 0081 | 050E | 6168 |
| 0001404300 | 6873 | 0131 | 1B02 | F201 | 6457 | AA05 | 1003 | 9F00 |
| 0001404320 | 0003 | 0400 | 61DC | 7373 | 636F | 6C5F | 6F6F | 756B |
| 0001404340 | 0C70 | 0604 | D100 | 0604 | 7973 | 626D | 6C6F | 040A |

THU MAR 14 17:52:34 1991 TSLINT.DLL PAGE 343, LINE 20179

| | | | | | | | | |
|---|---|---|---|---|---|---|---|---|
| 0001404360 | 000A | 04D1 | 7304 | 6275 | 0C73 | FA04 | C0FF | 0600 |
| 0001404400 | 5F5F | 7974 | 6570 | 040F | FFF4 | 0085 | 5F09 | 625F |
| 0001404420 | 5F78 | 7974 | 6570 | 040D | FFE4 | 022C | 5F07 | 705F |
| 0001404440 | 6972 | 746E | 040B | FFDA | 0285 | 5F05 | 6C5F | 6C76 |
| 0001404460 | 040D | FFE8 | 0556 | 5F07 | 635F | 6F6C | 6B63 | 040D |
| 0001404500 | FFF6 | 00C0 | 5F07 | 735F | 6174 | 6B63 | 040E | FFE0 |
| 0001404520 | 04DA | 5F08 | 725F | 7465 | 6176 | 0A6C | 810D | 0E00 |
| 0001404540 | 6805 | 7361 | 3168 | 0D06 | 0081 | 010F | 0C69 | D604 |
| 0001404560 | D1FF | 0604 | 7562 | 6B63 | 7465 | 050E | 1F76 | 0009 |
| 0001404600 | 02D1 | 5F06 | 665F | 6E75 | 0163 | 1802 | 9C01 | 685B |
| 0001404620 | 7605 | 1001 | 6B00 | 0001 | 0400 | 6409 | 5F6F | 6564 |
| 0001404640 | 656C | 6574 | 040C | 0006 | 04D1 | 7306 | 6D79 | 6F62 |
| 0001404660 | 0A6C | 0A04 | D100 | 0404 | 7274 | 6565 | 0D0A | 0081 |
| 0001404700 | 050E | 6168 | 6873 | 0C31 | F604 | D1FF | 0604 | 7562 |
| 0001404720 | 6B63 | 7465 | 040A | FFF2 | 04D1 | 6C04 | 7361 | 0A74 |
| 0001404740 | FA04 | D1FF | 0404 | 7573 | 7362 | 0201 | 0119 | 5D12 |
| 0001404760 | 056A | 02B7 | 0010 | 02AC | 0000 | 0A04 | 7361 | 6F73 |
| 0001405000 | 5F63 | 6373 | 6E61 | 040C | 0006 | 04D1 | 7306 | 6D79 |
| 0001405020 | 6F62 | 0C6C | FA04 | C0FF | 0600 | 5F5F | 7974 | 6570 |
| 0001405040 | 040F | FFF4 | 0085 | 5F09 | 625F | 5F78 | 7974 | 6570 |
| 0001405060 | 040D | FFE0 | 022C | 5F07 | 705F | 6972 | 746E | 040B |
| 0001405100 | FFD6 | 0285 | 5F05 | 6C5F | 6C76 | 040D | FFE4 | 0556 |
| 0001405120 | 5F07 | 635F | 6F6C | 6B63 | 040D | FFF6 | 00C0 | 5F07 |
| 0001405140 | 735F | 6174 | 6B63 | 040E | FFDC | 0520 | 5F08 | 725F |
| 0001405160 | 7465 | 6176 | 0C6C | F004 | 20FF | 0605 | 6F6C | 6B6F |
| 0001405200 | 7461 | 050E | 1FCA | 0009 | 0555 | 5F06 | 665F | 6E75 |
| 0001405220 | 0163 | 1902 | C901 | 6D5F | BD05 | 1002 | B200 | 0002 |
| 0001405240 | 0400 | 610A | 7373 | 636F | 6E5F | 7865 | 0C74 | 0604 |
| 0001405260 | 2000 | 0605 | 6F6C | 6B6F | 7461 | 040C | FFFA | 00C0 |
| 0001405300 | 5F06 | 745F | 7079 | 0F65 | F404 | 85FF | 0900 | 5F5F |
| 0001405320 | 7862 | 745F | 7079 | 0D65 | E404 | 2CFF | 0702 | 5F5F |
| 0001405340 | 7270 | 6E69 | 0B74 | DA04 | 85FF | 0502 | 5F5F | 766C |
| 0001405360 | 0D6C | E804 | 56FF | 0705 | 5F5F | 6C63 | 636F | 0D6B |
| 0001405400 | F604 | C0FF | 0700 | 5F5F | 7473 | 6361 | 0E6B | E004 |
| 0001405420 | 20FF | 0805 | 5F5F | 6572 | 7674 | 6C61 | 050E | 200C |
| 0001405440 | 0009 | 0555 | 5F06 | 665F | 6E75 | 0563 | 7200 | 8361 |
| 0001405460 | 0A00 | D804 | 85FF | 0400 | 5F5F | 7A73 | 0201 | 0201 |
| 0001405500 | 050F | 0A84 | 0008 | 04D1 | 5F07 | 6572 | 7573 | 746C |
| 0001405520 | 050D | 0AA0 | 0008 | 04D1 | 6405 | 7265 | 6665 | 0514 |
| 0001405540 | 373A | 0009 | 04D1 | 4E0C | 756E | 6C6C | 735F | 7274 |
| 0001405560 | 6E69 | 0567 | 000D | 1A00 | 1300 | 6605 | 080A | D100 |
| 0001405600 | 0B04 | 5553 | 5342 | 5045 | 6E5F | 646F | 0F65 | 2C05 |
| 0001405620 | 091F | C000 | 0700 | 5F42 | 4678 | 6C69 | 0F65 | 3005 |
| 0001405640 | 091F | C000 | 0700 | 5F42 | 5078 | 6361 | 146B | 0005 |
| 0001405660 | 0000 | 8100 | 0C00 | 7842 | 445F | 6265 | 6775 | 6F4D |
| 0001405700 | 6564 | 0511 | 0856 | 0008 | 04DA | 7309 | 6174 | 6B63 |
| 0001405720 | 705F | 7274 | 0514 | 0000 | 0000 | 0081 | 420C | 5F78 |
| 0001405740 | 6954 | 656D | 4D73 | 646F | 1065 | 0005 | 0000 | 8100 |
| 0001405760 | 0800 | 7842 | 725F | 735F | 6769 | 0513 | 2670 | 0009 |
| 0001406000 | 0084 | 740B | 6C73 | 6D5F | 6D65 | 7974 | 6570 | 050A |
| 0001406020 | 0AB0 | 0008 | 04D1 | 5F02 | 0574 | 0211 | 0000 | 1D00 |
| 0001406040 | 8601 | 3D62 | 8E05 | 1002 | 8300 | 0002 | 0400 | 720E |
| 0001406060 | 665F | 726F | 6563 | 6E5F | 6D75 | 6562 | 0772 | 0604 |
| 0001406100 | 9700 | 0104 | 0F6E | F404 | 85FF | 0900 | 5F5F | 7862 |
| 0001406120 | 745F | 7079 | 0D65 | E404 | 02FF | 0702 | 5F5F | 7270 |
| 0001406140 | 6E69 | 0B74 | D604 | 14FF | 0505 | 5F5F | 766C | 0D6C |
| 0001406160 | E804 | 40FF | 0705 | 5F5F | 6C63 | 636F | 0D6B | F604 |
| 0001406200 | C0FF | 0700 | 5F5F | 7473 | 6361 | 0E6B | DC04 | 89FF |
| 0001406220 | 0800 | 5F5F | 6572 | 7674 | 6C61 | 040C | FFFA | 00C0 |

THU MAR 14 17:52:34 1991 TSLINT.DLL PAGE 344, LINE 20238

| | | | | | | | | |
|---|---|---|---|---|---|---|---|---|
| 0001406240 | 5F06 | 745F | 7079 | 0E65 | 1E05 | 0921 | 3F00 | 0605 |
| 0001406260 | 5F5F | 7566 | 636E | 0201 | 011D | 6514 | 0546 | 046F |
| 0001406300 | 0010 | 0464 | 0000 | 0E04 | 5F72 | 6F66 | 6372 | 5F65 |
| 0001406320 | 7473 | 6972 | 676E | 0407 | 0006 | 0497 | 7301 | 040C |
| 0001406340 | FFF8 | 00C0 | 5F06 | 745F | 7079 | 0F65 | EA04 | 85FF |
| 0001406360 | 0900 | 5F5F | 7862 | 745F | 7079 | 0D65 | DA04 | 02FF |
| 0001406400 | 0702 | 5F5F | 7270 | 6E69 | 0B74 | D004 | 14FF | 0505 |
| 0001406420 | 5F5F | 766C | 0D6C | DE04 | 40FF | 0705 | 5F5F | 6C63 |
| 0001406440 | 636F | 0D6B | F004 | C0FF | 0700 | 5F5F | 7473 | 6361 |
| 0001406460 | 0E6B | D604 | 97FF | 0804 | 5F5F | 6572 | 7674 | 6C61 |
| 0001406500 | 0409 | FF50 | 0547 | 6203 | 6675 | 0409 | FFEC | 00C0 |
| 0001406520 | 6603 | 746D | 0409 | FFFC | 0081 | 6E03 | 6D75 | 0408 |
| 0001406540 | FFF4 | 00C0 | 7302 | 0E70 | 4605 | 0922 | 3F00 | 0605 |
| 0001406560 | 5F5F | 7566 | 636E | 0201 | 0116 | 6983 | 054C | 03DB |
| 0001406600 | 0010 | 03D0 | 0000 | 0704 | 7564 | 6E70 | 646F | 0765 |
| 0001406620 | 0604 | 9700 | 0104 | 0C6E | FA04 | C0FF | 0600 | 5F5F |
| 0001406640 | 7974 | 6570 | 040F | FFF4 | 0085 | 5F09 | 625F | 5F78 |
| 0001406660 | 7974 | 6570 | 040D | FFE4 | 0202 | 5F07 | 705F | 6972 |
| 0001406700 | 746E | 040B | FFDA | 0514 | 5F05 | 6C5F | 6C76 | 040D |
| 0001406720 | FFE8 | 0540 | 5F07 | 635F | 6F6C | 6B63 | 040D | FFF6 |
| 0001406740 | 00C0 | 5F07 | 735F | 6174 | 6B63 | 040E | FFE0 | 0497 |
| 0001406760 | 5F08 | 725F | 7465 | 6176 | 076C | D604 | 97FF | 0104 |
| 0001407000 | 0E72 | 8A05 | 0922 | 4D00 | 0605 | 5F5F | 7566 | 636E |
| 0001407020 | 0201 | 011A | 6D5E | 054F | 0054 | 0010 | 0049 | 0000 |
| 0001407040 | 0B04 | 616D | 656B | 6E5F | 6D75 | 6562 | 0772 | 0604 |
| 0001407060 | 8900 | 0100 | 0778 | FA04 | 97FF | 0104 | 0172 | 1902 |
| 0001407100 | B201 | 516D | 4605 | 1000 | 3B00 | 0000 | 0400 | 740A |
| 0001407120 | 706D | 6E5F | 6D75 | 6562 | 0772 | 0604 | 8900 | 0100 |
| 0001407140 | 0778 | FA04 | 97FF | 0104 | 0172 | 1A02 | F801 | 536D |
| 0001407160 | 5705 | 1005 | 4C00 | 0005 | 0400 | 6D0B | 6B61 | 5F65 |
| 0001407200 | 7473 | 6972 | 676E | 0407 | 0006 | 00C0 | 7301 | 0409 |
| 0001407220 | 000A | 0081 | 6C03 | 6E65 | 040C | FFFA | 00C0 | 5F06 |
| 0001407240 | 745F | 7079 | 0F65 | F204 | 85FF | 0900 | 5F5F | 7862 |
| 0001407260 | 745F | 7079 | 0D65 | E204 | 02FF | 0702 | 5F5F | 7270 |
| 0001407300 | 6E69 | 0B74 | D804 | 14FF | 0505 | 5F5F | 766C | 0D6C |
| 0001407320 | E604 | 40FF | 0705 | 5F5F | 6C63 | 636F | 0D6B | F604 |
| 0001407340 | C0FF | 0700 | 5F5F | 7473 | 6361 | 0E6B | DE04 | 97FF |
| 0001407360 | 0804 | 5F5F | 6572 | 7674 | 6C61 | 0407 | FFD4 | 0497 |
| 0001407400 | 7201 | 0408 | FFD0 | 00C0 | 7002 | 0866 | CC04 | C0FF |
| 0001407420 | 0200 | 7470 | 0D06 | 0081 | 010E | 0B63 | F404 | 81FF |
| 0001407440 | 0500 | 6F63 | 6E75 | 0E74 | 6005 | 0923 | DE00 | 0602 |
| 0001407460 | 5F5F | 7566 | 636E | 0B08 | 7070 | 0300 | 6564 | 0C66 |
| 0001407500 | FC0B | 0070 | 6E07 | 746F | 6172 | 736E | 0201 | 0119 |
| 0001407520 | 734F | 0558 | 0043 | 0010 | 0038 | 0000 | 0A04 | 6D74 |
| 0001407540 | 5F70 | 7473 | 6972 | 676E | 0407 | 0006 | 00C0 | 7301 |
| 0001407560 | 0409 | 000A | 0081 | 6C03 | 6E65 | 0407 | FFFA | 0497 |
| 0001407600 | 7201 | 0201 | 0510 | 0000 | 0000 | 0081 | 4208 | 5F78 |
| 0001407620 | 5F42 | 6973 | 0567 | 000D | 1A00 | 0E00 | 4205 | 0937 |
| 0001407640 | 8100 | 0600 | 7473 | 6972 | 7463 | 051E | 3854 | 0009 |
| 0001407660 | 0085 | 7416 | 6C73 | 735F | 7274 | 6E69 | 5F67 | 7274 |
| 0001407700 | 6E61 | 6C73 | 7461 | 6F69 | 0C6E | B405 | 096E | 0000 |
| 0001407720 | 0400 | 665F | 6361 | 050F | 20EE | 0009 | 00C0 | 4207 |
| 0001407740 | 785F | 6946 | 656C | 050F | 20F2 | 0009 | 00C0 | 4207 |
| 0001407760 | 785F | 6150 | 6B63 | 050E | 20F6 | 0009 | 053B | 7606 |
| 0001410000 | 6C61 | 6575 | 1373 | 7005 | 0926 | 8400 | 0B00 | 7374 |
| 0001410020 | 5F6C | 656D | 746D | 7079 | 0E65 | 4E05 | 0975 | 4200 |
| 0001410040 | 0604 | 635F | 7974 | 6570 | 0514 | 0000 | 0000 | 0081 |
| 0001410060 | 420C | 5F78 | 6544 | 7562 | 4D67 | 646F | 1165 | 8005 |
| 0001410100 | 080A | 9700 | 0904 | 464F | 544D | 6E5F | 646F | 1465 |

THU MAR 14 17:52:34 1991 TSLINT.DLL PAGE 345, LINE 20297

| | | | | | | | | |
|---|---|---|---|---|---|---|---|---|
| 0001410120 | 0005 | 0000 | 8100 | 0C00 | 7842 | 545F | 6D69 | 7365 |
| 0001410140 | 6F4D | 6564 | 1105 | 0002 | 0000 | 011F | 7392 | 053C |
| 0001410160 | 0084 | 0010 | 0079 | 0000 | 1004 | 6E69 | 7469 | 735F |
| 0001410200 | 6E79 | 6174 | 5F78 | 6E6F | 6563 | 0D06 | 0081 | 010E |
| 0001410220 | 0C63 | 8205 | 0923 | 8100 | 0400 | 6F64 | 656E | 0201 |
| 0001410240 | 011C | 7416 | 053E | 002D | 0010 | 0022 | 0000 | 0D04 |
| 0001410260 | 6572 | 735F | 7465 | 735F | 6E79 | 6174 | 0C78 | 0604 |
| 0001410300 | 8100 | 0600 | 7973 | 746E | 7861 | 0409 | FFFC | 0081 |
| 0001410320 | 7203 | 7465 | 0201 | 0121 | 7443 | 0540 | 151C | 0010 |
| 0001410340 | 1511 | 0000 | 1204 | 6572 | 635F | 6D6F | 6970 | 656C |
| 0001410360 | 705F | 7461 | 6574 | 6E72 | 040D | 0006 | 00C0 | 7007 |
| 0001410400 | 7461 | 6574 | 6E72 | 040A | 000A | 0081 | 7304 | 7A69 |
| 0001410420 | 0A65 | 0C04 | C400 | 0404 | 7562 | 7066 | 040D | FF7A |
| 0001410440 | 0544 | 5F07 | 635F | 6F6C | 6B63 | 040D | FFEE | 00C0 |
| 0001410460 | 5F07 | 735F | 6174 | 6B63 | 040E | FF6E | 00C0 | 5F08 |
| 0001410500 | 725F | 7465 | 6176 | 076C | 5204 | C0FF | 0100 | 0762 |
| 0001410520 | 4E04 | C0FF | 0100 | 0A70 | E204 | C0FF | 0400 | 6570 |
| 0001410540 | 646E | 0D06 | 0085 | 010E | 0763 | 850D | 0F00 | 6302 |
| 0001410560 | 0831 | F604 | C0FF | 0200 | 3170 | 040F | FF62 | 00C4 |
| 0001410600 | 7409 | 6172 | 736E | 616C | 6574 | 0413 | FF8E | 00C0 |
| 0001410620 | 700D | 6E65 | 6964 | 676E | 655F | 6178 | 7463 | 0410 |
| 0001410640 | FFE6 | 00C0 | 660A | 7869 | 7075 | 6A5F | 6D75 | 0F70 |
| 0001410660 | F204 | C0FF | 0900 | 616C | 7473 | 7473 | 7261 | 1374 |
| 0001410700 | 8604 | 80FF | 0D00 | 657A | 6F72 | 745F | 6D69 | 7365 |
| 0001410720 | 6F5F | 136B | 5C04 | 80FF | 0D00 | 616D | 796E | 745F |
| 0001410740 | 6D69 | 7365 | 6F5F | 0C6B | 5E04 | C0FF | 0600 | 6562 |
| 0001410760 | 6167 | 746C | 040C | FF92 | 0545 | 7306 | 6174 | 6B63 |
| 0001411000 | 0C62 | EA04 | C1FF | 0600 | 7473 | 6361 | 706B | 040C |
| 0001411020 | FF76 | 00C1 | 7306 | 6174 | 6B63 | 0C65 | 8804 | C1FF |
| 0001411040 | 0600 | 7473 | 6361 | 746B | 040C | FF66 | 0081 | 7206 |
| 0001411060 | 6765 | 756E | 0C6D | FA04 | C0FF | 0600 | 5F5F | 7974 |
| 0001411100 | 6570 | 040F | FF8C | 0085 | 5F09 | 625F | 5F78 | 7974 |
| 0001411120 | 6570 | 040D | FF72 | 0202 | 5F07 | 705F | 6972 | 746E |
| 0001411140 | 040B | FF68 | 0409 | 5F05 | 6C5F | 6C76 | 050E | 24E4 |
| 0001411160 | 0009 | 0542 | 5F06 | 665F | 6E75 | 0563 | A100 | E675 |
| 0001411200 | 0F00 | 5604 | 85FF | 0900 | 5F5F | 6C6F | 7364 | 7A69 |
| 0001411220 | 0E65 | 5804 | C0FF | 0800 | 5F5F | 6C6F | 7664 | 7261 |
| 0001411240 | 0201 | 0005 | 77A2 | 021B | 040B | FF48 | 0085 | 6205 |
| 0001411260 | 6F5F | 6666 | 040B | FF56 | 0085 | 6605 | 6F5F | 6666 |
| 0001411300 | 040B | FF58 | 0085 | 6C05 | 6F5F | 6666 | 040B | FF4A |
| 0001411320 | 0085 | 7005 | 6F5F | 6666 | 040D | FF4C | 0085 | 6207 |
| 0001411340 | 6765 | 6F5F | 6666 | 0005 | 7832 | 00F0 | 040F | FF42 |
| 0001411360 | 0085 | 5F09 | 6F5F | 646C | 6973 | 657A | 040E | FF44 |
| 0001411400 | 00C0 | 5F08 | 6F5F | 646C | 6176 | 0172 | 0102 | 1002 |
| 0001411420 | F50B | 007B | 680B | 6E61 | 6C64 | 5F65 | 6C70 | 7375 |
| 0001411440 | 0005 | 7CD2 | 006D | 0408 | FF42 | 0081 | 6302 | 0131 |
| 0001411460 | 0502 | 2400 | 1B7E | 0B02 | 4C04 | 85FF | 0500 | 5F62 |
| 0001411500 | 666F | 0B66 | 4204 | 85FF | 0500 | 5F66 | 666F | 0B66 |
| 0001411520 | 4404 | 85FF | 0500 | 5F6C | 666F | 0B66 | 4A04 | 85FF |
| 0001411540 | 0500 | 5F70 | 666F | 0D66 | 4804 | 85FF | 0700 | 6562 |
| 0001411560 | 5F67 | 666F | 0566 | B400 | F07E | 0F00 | 5604 | 85FF |
| 0001411600 | 0900 | 5F5F | 6C6F | 7364 | 7A69 | 0E65 | 5804 | C0FF |
| 0001411620 | 0800 | 5F5F | 6C6F | 7664 | 7261 | 0201 | 0201 | 0B10 |
| 0001411640 | 8358 | 0B00 | 6168 | 646E | 656C | 6F5F | 6570 | 116E |
| 0001411660 | 270B | 0084 | 680C | 6E61 | 6C64 | 5F65 | 6C63 | 736F |
| 0001411700 | 0F65 | 020B | 0085 | 680A | 6E61 | 6C64 | 5F65 | 6162 |
| 0001411720 | 1272 | 930B | 0086 | 6E0D | 726F | 616D | 5F6C | 6162 |
| 0001411740 | 6B63 | 6C73 | 0B10 | 8743 | 0B00 | 6F6E | 6D72 | 6C61 |
| 0001411760 | 635F | 6168 | 1472 | 1C0B | 0089 | 690F | 766E | 6C61 |

THU MAR 14 17:52:34 1991 TSLINT.DLL PAGE 346, LINE 20356

| | | | | | | | | |
|---|---|---|---|---|---|---|---|---|
| 0001412000 | 6469 | 705F | 7461 | 6574 | 6E72 | 0B13 | 8924 | 0E00 |
| 0001412020 | 6E75 | 616D | 6374 | 6568 | 5F64 | 706F | 6E65 | 0B14 |
| 0001412040 | 892C | 0F00 | 6E75 | 616D | 6374 | 6568 | 5F64 | 6C63 |
| 0001412060 | 736F | 1365 | 340B | 0089 | 650E | 646E | 6F5F | 5F66 |
| 0001412100 | 6170 | 7474 | 7265 | 156E | 3C0B | 0089 | 6E10 | 7365 |
| 0001412120 | 6974 | 676E | 745F | 6F6F | 645F | 6565 | 0C70 | 440B |
| 0001412140 | 0089 | 7407 | 6F6F | 625F | 6769 | 0B15 | 894C | 1000 |
| 0001412160 | 656D | 6F6D | 7972 | 655F | 6878 | 7561 | 7473 | 6465 |
| 0001412200 | 0201 | 0119 | 895F | 054F | 0045 | 0010 | 003A | 0000 |
| 0001412220 | 0A04 | 7473 | 726F | 5F65 | 756A | 706D | 040A | 0006 |
| 0001412240 | 00C0 | 6604 | 6F72 | 0C6D | 0A04 | 8000 | 0600 | 706F |
| 0001412260 | 6F63 | 6564 | 0408 | 000C | 00C0 | 7402 | 016F | 1A02 |
| 0001412300 | A401 | 5189 | 7905 | 1000 | 6E00 | 0000 | 0400 | 690B |
| 0001412320 | 736E | 7265 | 5F74 | 756A | 706D | 0408 | 0006 | 0080 |
| 0001412340 | 6F02 | 0A70 | 0804 | C000 | 0400 | 7266 | 6D6F | 0408 |
| 0001412360 | 000C | 00C0 | 7402 | 116F | 1004 | C000 | 0B00 | 7563 |
| 0001412400 | 7272 | 6E65 | 5F74 | 6E65 | 0964 | FA04 | C0FF | 0300 |
| 0001412420 | 7470 | 0B6F | F604 | C0FF | 0500 | 6670 | 6F72 | 016D |
| 0001412440 | 2102 | 1D01 | 538A | 5705 | 1005 | 4C00 | 0005 | 0400 |
| 0001412460 | 7212 | 5F65 | 6F63 | 706D | 6C69 | 5F65 | 6166 | 7473 |
| 0001412500 | 616D | 0A70 | 0604 | C400 | 0404 | 7562 | 7066 | 040D |
| 0001412520 | FE8A | 00C0 | 6607 | 7361 | 6D74 | 7061 | 0407 | FE86 |
| 0001412540 | 00C4 | 7001 | 040A | FE82 | 00C4 | 7004 | 6E65 | 0664 |
| 0001412560 | 810D | 0E00 | 6A01 | 0407 | FE80 | 0081 | 6B01 | 040F |
| 0001412600 | FE92 | 00C4 | 7409 | 6172 | 736E | 616C | 6574 | 040C |
| 0001412620 | FEB2 | 0555 | 7306 | 6174 | 6B63 | 0C62 | F204 | 56FF |
| 0001412640 | 0605 | 7473 | 6361 | 706B | 040C | FFFA | 00C0 | 5F06 |
| 0001412660 | 745F | 7079 | 0F65 | B004 | 85FE | 0900 | 5F5F | 7862 |
| 0001412700 | 745F | 7079 | 0D65 | 9E04 | 02FE | 0702 | 5F5F | 7270 |
| 0001412720 | 6E69 | 0B74 | 9604 | 09FE | 0504 | 5F5F | 766C | 0D6C |
| 0001412740 | A404 | 44FE | 0705 | 5F5F | 6C63 | 636F | 0D6B | F604 |
| 0001412760 | C0FF | 0700 | 5F5F | 7473 | 6361 | 0E6B | 9C04 | 81FE |
| 0001413000 | 0800 | 5F5F | 6572 | 7674 | 6C61 | 040D | FE8E | 00C4 |
| 0001413020 | 7007 | 7461 | 6574 | 6E72 | 040A | FEA2 | 0081 | 7304 |
| 0001413040 | 7A69 | 0E65 | 0005 | 0925 | 4200 | 0605 | 5F5F | 7566 |
| 0001413060 | 636E | 0201 | 0118 | 8F74 | 0558 | 00DD | 0010 | 00D2 |
| 0001413100 | 0000 | 0904 | 6572 | 735F | 6165 | 6372 | 0B68 | 0604 |
| 0001413120 | C400 | 0504 | 6270 | 6675 | 0C70 | 0A04 | C000 | 0600 |
| 0001413140 | 7473 | 6972 | 676E | 040A | 000E | 0081 | 7304 | 7A69 |
| 0001413160 | 0E65 | 1004 | 8100 | 0800 | 7473 | 7261 | 7074 | 736F |
| 0001413200 | 040B | 0012 | 0081 | 7205 | 6E61 | 6567 | 040A | 0014 |
| 0001413220 | 051A | 7204 | 6765 | 0C73 | FA04 | C0FF | 0600 | 5F5F |
| 0001413240 | 7974 | 6570 | 040F | FFF4 | 0085 | 5F09 | 625F | 5F78 |
| 0001413260 | 7974 | 6570 | 040D | FFE4 | 0202 | 5F07 | 705F | 6972 |
| 0001413300 | 746E | 040B | FFDC | 0409 | 5F05 | 6C5F | 6C76 | 040D |
| 0001413320 | FFE8 | 0544 | 5F07 | 635F | 6F6C | 6B63 | 040D | FFF6 |
| 0001413340 | 00C0 | 5F07 | 735F | 6174 | 6B63 | 040E | FFE2 | 0081 |
| 0001413360 | 5F08 | 725F | 7465 | 6176 | 0E6C | 1C05 | 0925 | 5A00 |
| 0001413400 | 0605 | 5F5F | 7566 | 636E | 0201 | 011A | 9051 | 055C |
| 0001413420 | 033B | 0013 | 0330 | 0000 | 0B04 | 6572 | 735F | 6165 |
| 0001413440 | 6372 | 5F68 | 0B32 | 0604 | C400 | 0504 | 6270 | 6675 |
| 0001413460 | 0D70 | 0A04 | C000 | 0700 | 7473 | 6972 | 676E | 0B31 |
| 0001413500 | 0E04 | 8100 | 0500 | 6973 | 657A | 0D31 | 1004 | C000 |
| 0001413520 | 0700 | 7473 | 6972 | 676E | 0B32 | 1404 | 8100 | 0500 |
| 0001413540 | 6973 | 657A | 0E32 | 1604 | 8100 | 0800 | 7473 | 7261 |
| 0001413560 | 7074 | 736F | 040B | 0018 | 0081 | 7205 | 6E61 | 6567 |
| 0001413600 | 040A | 001A | 051A | 7204 | 6765 | 0B73 | 1E04 | 8100 |
| 0001413620 | 0500 | 736D | 6F74 | 0C70 | FA04 | C0FF | 0600 | 5F5F |
| 0001413640 | 7974 | 6570 | 040F | FFF0 | 0085 | 5F09 | 625F | 5F78 |

THU MAR 14 17:52:34 1991 TSLINT.DLL PAGE 347, LINE 20415

| | | | | | | | | |
|---|---|---|---|---|---|---|---|---|
| 0001413660 | 7974 | 6570 | 040D | FFE0 | 0202 | 5F07 | 705F | 6972 |
| 0001413700 | 746E | 040B | FFD8 | 0409 | 5F05 | 6C5F | 6C76 | 040D |
| 0001413720 | FFE4 | 0544 | 5F07 | 635F | 6F6C | 6B63 | 040D | FFF2 |
| 0001413740 | 00C0 | 5F07 | 735F | 6174 | 6B63 | 040E | FFDE | 0081 |
| 0001413760 | 5F08 | 725F | 7465 | 6176 | 0D6C | D404 | C0FF | 0700 |
| 0001414000 | 6166 | 7473 | 616D | 0F70 | D004 | C4FF | 0900 | 7274 |
| 0001414020 | 6E61 | 6C73 | 7461 | 0B65 | F604 | 81FF | 0500 | 6F74 |
| 0001414040 | 6174 | 096C | F804 | 81FF | 0300 | 6176 | 0A6C | 810D |
| 0001414060 | 0E00 | 7205 | 6E61 | 6567 | 050E | 252E | 0009 | 02DE |
| 0001414100 | 5F06 | 665F | 6E75 | 0563 | AC00 | C391 | 0800 | 810D |
| 0001414120 | 0F00 | 6C03 | 6D69 | 0407 | FFCA | 00C4 | 7001 | 040C |
| 0001414140 | FFCE | 0081 | 6906 | 6172 | 676E | 0165 | 0502 | 7200 |
| 0001414160 | 6A92 | 0700 | C604 | 84FF | 0100 | 0163 | 0C02 | 5A0B |
| 0001414200 | 0093 | 6107 | 7664 | 6E61 | 6563 | 0201 | 0117 | 938C |
| 0001414220 | 055F | 00DA | 0010 | 00CF | 0000 | 0804 | 6572 | 6D5F |
| 0001414240 | 7461 | 6863 | 040B | 0006 | 04C4 | 7005 | 7562 | 7066 |
| 0001414260 | 040C | 000A | 00C0 | 7306 | 7274 | 6E69 | 0A67 | 0E04 |
| 0001414300 | 8100 | 0400 | 6973 | 657A | 0409 | 0010 | 0081 | 7003 |
| 0001414320 | 736F | 040A | 0012 | 051A | 7204 | 6765 | 0C73 | FA04 |
| 0001414340 | C0FF | 0600 | 5F5F | 7974 | 6570 | 040F | FFF4 | 0085 |
| 0001414360 | 5F09 | 625F | 5F78 | 7974 | 6570 | 040D | FFE4 | 0202 |
| 0001414400 | 5F07 | 705F | 6972 | 746E | 040B | FFDC | 0409 | 5F05 |
| 0001414420 | 6C5F | 6C76 | 040D | FFE8 | 0544 | 5F07 | 635F | 6F6C |
| 0001414440 | 6B63 | 040D | FFF6 | 00C0 | 5F07 | 735F | 6174 | 6B63 |
| 0001414460 | 040E | FFE2 | 0081 | 5F08 | 725F | 7465 | 6176 | 0E6C |
| 0001414500 | 4205 | 0925 | 6000 | 0605 | 5F5F | 7566 | 636E | 0201 |
| 0001414520 | 0119 | 9466 | 0562 | 11E8 | 0010 | 11DD | 0000 | 0A04 |
| 0001414540 | 6572 | 6D5F | 7461 | 6863 | 325F | 040B | 0006 | 04C4 |
| 0001414560 | 7005 | 7562 | 7066 | 040D | 000A | 00C0 | 7307 | 7274 |
| 0001414600 | 6E69 | 3167 | 040B | 000E | 0081 | 7305 | 7A69 | 3165 |
| 0001414620 | 040D | 0010 | 00C0 | 7307 | 7274 | 6E69 | 3267 | 040B |
| 0001414640 | 0014 | 0081 | 7305 | 7A69 | 3265 | 0409 | 0016 | 0081 |
| 0001414660 | 7003 | 736F | 040A | 0018 | 051A | 7204 | 6765 | 0B73 |
| 0001414700 | 1C04 | 8100 | 0500 | 736D | 6F74 | 0E70 | 6404 | 66FF |
| 0001414720 | 0805 | 6572 | 7367 | 6174 | 7472 | 040C | FFBC | 0566 |
| 0001414740 | 7206 | 6765 | 6E65 | 1364 | 9404 | 67FF | 0D05 | 6572 |
| 0001414760 | 7367 | 6174 | 7472 | 735F | 6765 | 1131 | EC04 | 67FF |
| 0001415000 | 0B05 | 6572 | 6567 | 646E | 735F | 6765 | 0C31 | FA04 |
| 0001415020 | C0FF | 0600 | 5F5F | 7974 | 6570 | 040F | FFAA | 0085 |
| 0001415040 | 5F09 | 625F | 5F78 | 7974 | 6570 | 040D | FF8C | 0202 |
| 0001415060 | 5F07 | 705F | 6972 | 746E | 040B | FF5C | 0409 | 5F05 |
| 0001415100 | 6C5F | 6C76 | 040D | FF9E | 0544 | 5F07 | 635F | 6F6C |
| 0001415120 | 6B63 | 040D | FFE4 | 00C0 | 5F07 | 735F | 6174 | 6B63 |
| 0001415140 | 040E | FF62 | 0081 | 5F08 | 725F | 7465 | 6176 | 076C |
| 0001415160 | D404 | C4FC | 0100 | 0A70 | D004 | C4FC | 0400 | 6570 |
| 0001415200 | 646E | 040A | FFB0 | 00C4 | 6504 | 646E | 0A31 | AC04 |
| 0001415220 | C4FF | 0400 | 6E65 | 3264 | 0411 | FFF6 | 00C4 | 650B |
| 0001415240 | 646E | 6D5F | 7461 | 6863 | 315F | 0411 | FFE8 | 00C4 |
| 0001415260 | 650B | 646E | 6D5F | 7461 | 6863 | 325F | 0407 | FCCC |
| 0001415300 | 00C4 | 6401 | 040A | FCC8 | 00C4 | 6404 | 6E65 | 0964 |
| 0001415320 | 810D | 0E00 | 6D04 | 6E63 | 0F74 | 5804 | C4FF | 0900 |
| 0001415340 | 7274 | 6E61 | 6C73 | 7461 | 1365 | D8U4 | 65FC | 0D05 |
| 0001415360 | 6E69 | 7469 | 6169 | 5F6C | 7473 | 6361 | 0C6B | B404 |
| 0001415400 | 56FF | 0605 | 7473 | 6361 | 626B | 040C | FFB8 | 0556 |
| 0001415420 | 7306 | 6174 | 6B63 | 0C70 | 9004 | 56FF | 0605 | 7473 |
| 0001415440 | 6361 | 656B | 050E | 2556 | 0009 | 0564 | 5F06 | 665F |
| 0001415460 | 6E75 | 0563 | 7000 | C698 | 0B01 | C404 | 81FC | 0500 |
| 0001415500 | 6572 | 6E67 | 086F | C004 | C4FC | 0200 | 3264 | 040B |
| 0001415520 | FCBC | 00C4 | 6405 | 6E65 | 3264 | 0201 | 0005 | 9ACE |

THU MAR 14 17:52:34 1991 TSLINT.DLL PAGE 348, LINE 20474

| | | | | | | | | |
|---|---|---|---|---|---|---|---|---|
| 0001415540 | 0117 | 0409 | FCBA | 0081 | 6E03 | 746F | 0D06 | 0081 |
| 0001415560 | 010F | 0163 | 0502 | A800 | 999C | 0C00 | BC04 | 56FC |
| 0001415600 | 0605 | 7473 | 6361 | 786B | 0201 | 0005 | 9DAE | 0186 |
| 0001415620 | 0408 | FCBC | 00C4 | 7002 | 0532 | 3900 | FB9E | 0600 |
| 0001415640 | 810D | 0F00 | 6301 | 0408 | FCC0 | 00C4 | 7002 | 0531 |
| 0001415660 | B100 | 839E | 0900 | BA04 | 81FC | 0300 | 6F6E | 0174 |
| 0001415700 | 0102 | 0102 | 0F02 | 570B | 009F | 6E0A | 666F | 6E69 |
| 0001415720 | 6C61 | 7A69 | 0565 | 9300 | 7D9F | 0C00 | BC04 | 56FC |
| 0001415740 | 0605 | 7473 | 6361 | 786B | 0201 | 0B09 | A5B5 | 0400 |
| 0001415760 | 6166 | 6C69 | 0201 | 011D | A64E | 0569 | 0075 | 0013 |
| 0001416000 | 006A | 0000 | 0E04 | 6362 | 706D | 745F | 6172 | 736E |
| 0001416020 | 616C | 6574 | 0408 | 0006 | 00C4 | 7302 | 0831 | 0A04 |
| 0001416040 | C400 | 0200 | 3273 | 0409 | 000E | 0081 | 6C03 | 6E65 |
| 0001416060 | 040F | 0010 | 00C4 | 7409 | 6172 | 736E | 616C | 6574 |
| 0001416100 | 0408 | FFFA | 00C4 | 7002 | 0831 | F604 | C4FF | 0200 |
| 0001416120 | 3270 | 0D08 | 0081 | 030E | 656C | 016E | 1602 | C301 |
| 0001416140 | 6BA6 | 8E05 | 1002 | 8300 | [illegible] | 0400 | 7207 | 5F65 |
| 0001416160 | 6F63 | 706D | 0407 | 0006 | 00C0 | 7301 | 040E | FFE0 |
| 0001416200 | 00C0 | 5F08 | 725F | 7465 | 6176 | 0C6C | FA04 | C0FF |
| 0001416220 | 0600 | 5F5F | 7974 | 6570 | 040F | FFF4 | 0085 | 5F09 |
| 0001416240 | 625F | 5F78 | 7974 | 6570 | 040D | FFE4 | 0202 | 5F07 |
| 0001416260 | 705F | 6972 | 746E | 040B | FFDA | 0409 | 5F05 | 6C5F |
| 0001416300 | 6C76 | 040D | FFE8 | 0544 | 5F07 | 635F | 6F6C | 6B63 |
| 0001416320 | 040D | FFF6 | 00C0 | 5F07 | 735F | 6174 | 6B63 | 050E |
| 0001416340 | 25FC | 0009 | 056C | 5F06 | 665F | 6E75 | 0163 | 1602 |
| 0001416360 | 5101 | 6FA9 | F105 | 1000 | E600 | 0000 | 0400 | 7207 |
| 0001416400 | 5F65 | 7865 | 6365 | 0407 | 0006 | 00C0 | 7301 | 040C |
| 0001416420 | FFFA | 00C0 | 5F06 | 745F | 7079 | 0F65 | F404 | 85FF |
| 0001416440 | 0900 | 5F5F | 7862 | 745F | 7079 | 0D65 | E404 | 02FF |
| 0001416460 | 0702 | 5F5F | 7270 | 6E69 | 0B74 | DC04 | 09FF | 0504 |
| 0001416500 | 5F5F | 766C | 0D6C | E804 | 44FF | 0705 | 5F5F | 6C63 |
| 0001416520 | 636F | 0D6B | F604 | C0FF | 0700 | 5F5F | 7473 | 6361 |
| 0001416540 | 0E6B | E204 | 81FF | 0800 | 5F5F | 6572 | 7674 | 6C61 |
| 0001416560 | 0409 | FFDA | 0081 | 6C03 | 6E65 | 05CE | 260C | 0009 |
| 0001416600 | 056C | 5F06 | 665F | 6E75 | 0163 | 1402 | 0005 | 0000 |
| 0001416620 | 8100 | 0C00 | 7842 | 445F | 6265 | 6775 | 6F4D | 6564 |
| 0001416640 | 0514 | 0000 | 0000 | 0081 | 420C | 5F78 | 6954 | 656D |
| 0001416660 | 4D73 | 646F | 1065 | 0005 | 0000 | 8100 | 0800 | 7842 |
| 0001416700 | 425F | 735F | 6769 | 0D05 | 0000 | 001A | 0517 | 2554 |
| 0001416720 | 0009 | 0081 | 720F | 5F65 | 616D | 5F78 | 6166 | 6C69 |
| 0001416740 | 7275 | 7365 | 0517 | 7F28 | 0009 | 053B | 720F | 5F65 |
| 0001416760 | 7973 | 746E | 7861 | 745F | 6261 | 656C | 0513 | 2670 |
| 0001417000 | 0009 | 0084 | 740B | 6C73 | 6D5F | 6D65 | 7974 | 6570 |
| 0001417020 | 050F | 237A | 0009 | 00C0 | 4207 | 785F | 6946 | 656C |
| 0001417040 | 0516 | 2384 | 0009 | 0081 | 6F0E | 7362 | 7563 | 6572 |
| 0001417060 | 735F | 6E79 | 6174 | 0F78 | 7E05 | 0923 | C000 | 0700 |
| 0001417100 | 5F42 | 5078 | 6361 | 136B | 2805 | 0980 | AA00 | 0B04 |
| 0001417120 | 6572 | 635F | 6D6F | 5F70 | 7562 | 0566 | 0211 | 0000 |
| 0001417140 | 1600 | 4201 | C9AA | 4504 | 1002 | 3A00 | 0002 | 0400 |
| 0001417160 | 6407 | 5F6F | 7266 | 6565 | 0407 | 0006 | 00C0 | 7301 |
| 0001417200 | 040C | FFFA | 00C0 | 5F06 | 745F | 7079 | 0F65 | F404 |
| 0001417220 | 85FF | 0900 | 5F5F | 7862 | 745F | 7079 | 0D65 | E404 |
| 0001417240 | CDFF | 0704 | 5F5F | 7270 | 6E69 | 0B74 | DC04 | 86FF |
| 0001417260 | 0503 | 5F5F | 766C | 0D6C | E804 | CFFF | 0704 | 5F5F |
| 0001417300 | 6C63 | 636F | 0D6B | F604 | C0FF | 0700 | 5F5F | 7473 |
| 0001417320 | 6361 | 0E6B | E204 | 81FF | 0800 | 5F5F | 6572 | 7674 |
| 0001417340 | 6C61 | 050E | 2672 | 0009 | 04CB | 5F06 | 665F | 6E75 |
| 0001417360 | 0163 | 1802 | 8701 | D4AC | 0904 | 1003 | FE00 | 0002 |
| 0001417400 | 0400 | 6409 | 5F6F | 616D | 6C6C | 636F | 040A | 0006 |

THU MAR 14 17:52:34 1991 TSLINT.DLL PAGE 349, LINE 20533

| | | | | | | | | |
|---|---|---|---|---|---|---|---|---|
| 0001417420 | 0085 | 7304 | 7A69 | 0A65 | 0804 | 8400 | 0400 | 7974 |
| 0001417440 | 6570 | 040B | 000A | 0081 | 6C05 | 7665 | 6C65 | 040B |
| 0001417460 | FFD6 | 0386 | 5F05 | 6C5F | 6C76 | 040D | FFE4 | 04CF |
| 0001417500 | 5F07 | 635F | 6F6C | 6B63 | 040D | FFF2 | 00C0 | 5F07 |
| 0001417520 | 735F | 6174 | 6B63 | 040E | FFDC | 00C0 | 5F08 | 725F |
| 0001417540 | 7465 | 6176 | 076C | FA04 | C0FF | 0100 | 0C70 | F604 |
| 0001417560 | C0FF | 0600 | 5F5F | 7974 | 6570 | 040F | FFF0 | 0085 |
| 0001417600 | 5F09 | 625F | 5F78 | 7974 | 6570 | 040D | FFE0 | 04CD |
| 0001417620 | 5F07 | 705F | 6972 | 746E | 050E | 2702 | 0009 | 04D5 |
| 0001417640 | 5F06 | 665F | 6E75 | 0163 | 1902 | 9001 | DBAF | 1504 |
| 0001417660 | 1003 | 0A00 | 0003 | 0400 | 640A | 5F6F | 6572 | 6C61 |
| 0001417700 | 6F6C | 0B63 | 0604 | C000 | 0500 | 6C62 | 636F | 0A6B |
| 0001417720 | 0A04 | 8500 | 0400 | 6973 | 657A | 040A | 000C | 0084 |
| 0001417740 | 7404 | 7079 | 0B65 | 0E04 | 8100 | 0500 | 656C | 6576 |
| 0001417760 | 0C6C | F604 | C0FF | 0600 | 5F5F | 7974 | 6570 | 040F |
| 0001420000 | FFF0 | 0085 | 5F09 | 625F | 5F78 | 7974 | 6570 | 040D |
| 0001420020 | FFE0 | 04CD | 5F07 | 705F | 6972 | 746E | 040B | FFD6 |
| 0001420040 | 0386 | 5F05 | 6C5F | 6C76 | 040D | FFE4 | 04CF | 5F07 |
| 0001420060 | 635F | 6F6C | 6B63 | 040D | FFF2 | 00C0 | 5F07 | 735F |
| 0001420100 | 6174 | 6B63 | 040E | FFDC | 00C0 | 5F08 | 725F | 7465 |
| 0001420120 | 6176 | 076C | FA04 | C0FF | 0100 | 0E70 | 9A05 | 0927 |
| 0001420140 | DD00 | 0604 | 5F5F | 7566 | 636E | 0201 | 0514 | 0000 |
| 0001420160 | 0000 | 00C0 | 420C | 5F78 | 7361 | 6573 | 7472 | 736D |
| 0001420200 | 1467 | 0005 | 0000 | 8100 | 0C00 | 7842 | 445F | 6265 |
| 0001420220 | 6775 | 6F4D | 6564 | 0514 | 0000 | 0000 | 0081 | 420C |
| 0001420240 | 5F78 | 6954 | 656D | 4D73 | 646F | 1465 | 0005 | 0000 |
| 0001420260 | 8100 | 0C00 | 7842 | 455F | 7272 | 726F | 6F4D | 6564 |
| 0001420300 | 0D05 | 0000 | 001A | 0510 | 0000 | 0000 | 0081 | 4208 |
| 0001420320 | 5F78 | 5F42 | 6973 | 0F67 | 6805 | 0926 | C000 | 0700 |
| 0001420340 | 5F42 | 4678 | 6C69 | 0F65 | 6C05 | 0926 | C000 | 0700 |
| 0001420360 | 5F42 | 5078 | 6361 | 136B | 7005 | 0926 | 8400 | 0B00 |
| 0001420400 | 7374 | 5F6C | 656D | 746D | 7079 | 0565 | 0211 | 0000 |
| 0001420420 | 1600 | A601 | 14B2 | 3C05 | 1002 | 3100 | 0002 | 0400 |
| 0001420440 | 6E07 | 7765 | 6F6E | 6564 | 0408 | 0006 | 0081 | 7402 |
| 0001420460 | 0C79 | FA04 | C0FF | 0600 | 5F5F | 7974 | 6570 | 040F |
| 0001420500 | FFF4 | 0085 | 5F09 | 625F | 5F78 | 7974 | 6570 | 040D |
| 0001420520 | FFE4 | 0202 | 5F07 | 705F | 6972 | 746E | 040B | FFDA |
| 0001420540 | 03E3 | 5F05 | 6C5F | 6C76 | 040D | FFE8 | 0517 | 5F07 |
| 0001420560 | 635F | 6F6C | 6B63 | 040D | FFF6 | 00C0 | 5F07 | 735F |
| 0001420600 | 6174 | 6B63 | 040E | FFE0 | 049C | 5F08 | 725F | 7465 |
| 0001420620 | 6176 | 086C | D604 | 9CFF | 0204 | 706E | 050E | 280C |
| 0001420640 | 0009 | 0516 | 5F06 | 665F | 6E75 | 0163 | 1702 | E201 |
| 0001420660 | 1DB4 | 9105 | 1001 | 8600 | 0001 | 0400 | 6608 | 6572 |
| 0001420700 | 6E65 | 646F | 0865 | 0604 | 9C00 | 0204 | 706E | 040C |
| 0001420720 | FFFA | 00C0 | 5F06 | 745F | 7079 | 0F65 | F404 | 85FF |
| 0001420740 | 0900 | 5F5F | 7862 | 745F | 7079 | 0D65 | E404 | 02FF |
| 0001420760 | 0702 | 5F5F | 7270 | 6E69 | 0B74 | DC04 | E3FF | 0503 |
| 0001421000 | 5F5F | 766C | 0D6C | E804 | 17FF | 0705 | 5F5F | 6C63 |
| 0001421020 | 636F | 0D6B | F604 | C0FF | 0700 | 5F5F | 7473 | 6361 |
| 0001421040 | 0E6B | E204 | 81FF | 0800 | 5F5F | 6572 | 7674 | 6C61 |
| 0001421060 | 050E | 2834 | 0009 | 051E | 5F06 | 665F | 6E75 | 0563 |
| 0001421100 | 8400 | 82B5 | 0A00 | DA04 | 85FF | 0400 | 5F5F | 7A73 |
| 0001421120 | 0201 | 0201 | 0514 | 0000 | 0000 | 0081 | 420C | 5F78 |
| 0001421140 | 6544 | 7562 | 4D67 | 646F | 1465 | 0005 | 0000 | 8100 |
| 0001421160 | 0C00 | 7842 | 545F | 6D69 | 7365 | 6F4D | 6564 | 0510 |
| 0001421200 | 0000 | 0000 | 0081 | 4208 | 5F78 | 5F42 | 6973 | 0567 |
| 0001421220 | 000D | 1A00 | 0F00 | 0405 | 0928 | C000 | 0700 | 5F42 |
| 0001421240 | 4678 | 6C69 | 1365 | 7005 | 0926 | 8400 | 0B00 | 7374 |
| 0001421260 | 5F6C | 656D | 746D | 7079 | 0F65 | 0805 | 0928 | C000 |

THU MAR 14 17:52:34 1991 TSLINT.DLL PAGE 350, LINE 20592

| | | | | | | | | |
|---|---|---|---|---|---|---|---|---|
| 0001421300 | 0700 | 5F42 | 5078 | 6361 | 056B | 0211 | 0000 | 1600 |
| 0001421320 | 7401 | A6B6 | DD04 | 1000 | D200 | 0000 | 0400 | 7307 |
| 0001421340 | 6172 | 646E | 6D6F | 0407 | 0006 | 0085 | 7801 | 0D06 |
| 0001421360 | 0081 | 010E | 0669 | 810D | 0F00 | 6AD1 | 0201 | 0118 |
| 0001421400 | B751 | 04A8 | 0193 | 0010 | 0188 | 0000 | 0904 | 6E69 |
| 0001421420 | 7469 | 7473 | 7461 | 0A65 | 0604 | 8500 | 0400 | 6573 |
| 0001421440 | 6465 | 040F | 0008 | 00C0 | 6109 | 6772 | 735F | 6174 |
| 0001421460 | 6574 | 0407 | 000C | 0081 | 6E01 | 040C | FFFA | 00C0 |
| 0001421500 | 6F06 | 7473 | 7461 | 0165 | 1702 | E401 | ABB8 | 4C04 |
| 0001421520 | 1001 | 4100 | 0001 | 0400 | 7308 | 7465 | 7473 | 7461 |
| 0001421540 | 0F65 | 0604 | C000 | 0900 | 7261 | 5F67 | 7473 | 7461 |
| 0001421560 | 0F65 | F604 | C2FF | 0900 | 656E | 5F77 | 7473 | 7461 |
| 0001421600 | 0965 | 810D | 0E00 | 7404 | 7079 | 0965 | 810D | 0F00 |
| 0001421620 | 7204 | 6165 | 0C72 | FA04 | C0FF | 0600 | 736F | 6174 |
| 0001421640 | 6574 | 0201 | 0115 | BA30 | 04AD | 00E8 | 0010 | 00DD |
| 0001421660 | 0000 | 0604 | 6172 | 646E | 6D6F | 0407 | FFFA | 0082 |
| 0001421700 | 6901 | 0201 | 0D05 | 0000 | 001A | 050F | 283E | 0009 |
| 0001421720 | 04A3 | 6407 | 6765 | 6572 | 7365 | 050C | 2848 | 0009 |
| 0001421740 | 04A3 | 7304 | 7065 | 0F73 | 5205 | 0928 | A400 | 0704 |
| 0001421760 | 6172 | 646E | 6274 | 0C6C | D205 | 0928 | C200 | 0400 |
| 0001422000 | 7066 | 7274 | 050C | 28D6 | 0009 | 00C2 | 7204 | 7470 |
| 0001422020 | 0D72 | DA05 | 0928 | C200 | 0500 | 7473 | 7461 | 1165 |
| 0001422040 | DE05 | 0928 | 8100 | 0900 | 6172 | 646E | 745F | 7079 |
| 0001422060 | 1065 | E005 | 0928 | 8100 | 0800 | 6172 | 646E | 645F |
| 0001422100 | 6765 | 0510 | 28E2 | 0009 | 0081 | 7208 | 6E61 | 5F64 |
| 0001422120 | 6573 | 0F70 | E405 | 0928 | C200 | 0700 | 6E65 | 5F64 |
| 0001422140 | 7470 | 0C72 | E805 | 0970 | 0500 | 0402 | 695F | 626F |
| 0001422160 | 1105 | 0002 | 0000 | 0123 | BB18 | 025F | 0054 | 0010 |
| 0001422200 | 0049 | 0000 | 1404 | 6966 | 646E | 735F | 6174 | 6B63 |
| 0001422220 | 645F | 7269 | 6365 | 6974 | 6E6F | 040B | FFFC | 0080 |
| 0001422240 | 6405 | 6D75 | 796D | 050C | 2964 | 0009 | 00C0 | 6104 |
| 0001422260 | 6464 | 0172 | 1502 | 6C01 | 69BB | 1F02 | 1001 | 1400 |
| 0001422300 | 0001 | 0400 | 6106 | 6C6C | 636F | 0A61 | 0604 | 8500 |
| 0001422320 | 0400 | 6973 | 657A | 040B | FFFC | 0080 | 7005 | 6F72 |
| 0001422340 | 6562 | 040B | FFF8 | 00C0 | 6405 | 7065 | 6874 | 0005 |
| 0001422360 | BB94 | 008A | 0408 | FFF4 | 0263 | 6802 | 0570 | DE00 |
| 0001422400 | 2ABB | 0800 | F004 | 63FF | 0202 | 706E | 0201 | 0201 |
| 0001422420 | 0005 | BC30 | 0050 | 0409 | FFF0 | 00C0 | 6E03 | 7765 |
| 0001422440 | 0201 | 0201 | 0D05 | 0000 | 001A | 0511 | 803A | 0009 |
| 0001422460 | 0081 | 7309 | 6174 | 6B63 | 645F | 7269 | 051A | 2968 |
| 0001422500 | 0009 | 0263 | 6C12 | 7361 | 5F74 | 6C61 | 6F6C | 6163 |
| 0001422520 | 685F | 6165 | 6564 | 0572 | 0211 | 0000 | 1B00 | 8C01 |
| 0001422540 | ACBC | DD05 | 1001 | D200 | 0001 | 0400 | 700C | 7261 |
| 0001422560 | 6573 | 655F | 6373 | 7061 | 1065 | 0604 | 1000 | 0A02 |
| 0001422600 | 7473 | 6972 | 676E | 705F | 7274 | 0D06 | 0081 | 010E |
| 0001422620 | 0663 | 810D | 0F00 | 6901 | 0005 | BD1E | 005D | 0407 |
| 0001422640 | FFFC | 0081 | 6901 | 040B | FFFA | 0081 | 6305 | 756F |
| 0001422660 | 746E | 0201 | 0B08 | BDEE | 0300 | 6564 | 0166 | 1802 |
| 0001422700 | 6901 | ADBE | 1D05 | 102D | 1200 | 002D | 0400 | 7409 |
| 0001422720 | 6C73 | 795F | 6C79 | 7865 | 040C | FFF8 | 00C0 | 5F06 |
| 0001422740 | 745F | 7079 | 0F65 | E804 | 85FF | 0900 | 5F5F | 7862 |
| 0001422760 | 745F | 7079 | 0D65 | D604 | 02FF | 0702 | 5F5F | 7270 |
| 0001423000 | 6E69 | 0B74 | CE04 | BEFF | 0502 | 5F5F | 766C | 0D6C |
| 0001423020 | DA04 | AFFF | 0705 | 5F5F | 6C63 | 636F | 0D6B | F004 |
| 0001423040 | C0FF | 0700 | 5F5F | 7473 | 6361 | 0E6B | D404 | 81FF |
| 0001423060 | 0800 | 5F5F | 6572 | 7674 | 6C61 | 0D06 | 0081 | 010E |
| 0001423100 | 0C63 | 810D | 0F00 | 6E07 | 6D61 | 6C65 | 6E65 | 040C |
| 0001423120 | FFEA | 00C0 | 7406 | 6B6F | 656B | 0C79 | CC04 | 81FE |
| 0001423140 | 0600 | 6573 | 6E65 | 655F | 0410 | FFF4 | 0081 | 730A |

THU MAR 14 17:52:34 1991 TSLINT.DLL PAGE 351, LINE 20651

| | | | | | | | | |
|---|---|---|---|---|---|---|---|---|
| 0001423160 | 6565 | 5F6E | 6F70 | 6E69 | 0874 | EE04 | 81FF | 0200 |
| 0001423200 | 6372 | 040D | FECE | 058A | 6207 | 6675 | 616E | 656D |
| 0001423220 | 0409 | FFF6 | 0081 | 6C03 | 776F | 0409 | FFE6 | 0081 |
| 0001423240 | 6D03 | 6469 | 040A | FFFC | 0081 | 6804 | 6769 | 0E68 |
| 0001423260 | BE05 | 0931 | AE00 | 0605 | 5F5F | 7566 | 636E | 0513 |
| 0001423300 | 31C8 | 0009 | 0081 | 640B | 6469 | 6E5F | 7765 | 696C |
| 0001423320 | 656E | 0B0A | BF3B | 0500 | 6572 | 7274 | 0F79 | 330B |
| 0001423340 | 00DF | 670A | 746F | 6E5F | 6D75 | 6562 | 0572 | 6C00 |
| 0001423360 | FEE7 | 0702 | BE04 | 81FE | 0100 | 0769 | C804 | 81FE |
| 0001423400 | 0100 | 0C63 | 7A0B | 00E7 | 6307 | 6D6F | 6170 | 6572 |
| 0001423420 | 0201 | 0201 | 011D | EB86 | 05B8 | 017E | 0010 | 0173 |
| 0001423440 | 0000 | 0E04 | 656C | 6578 | 5F72 | 7570 | 6873 | 6162 |
| 0001423460 | 6B63 | 040C | FFFA | 00C0 | 5F06 | 745F | 7079 | 0F65 |
| 0001423500 | F404 | 85FF | 0900 | 5F5F | 7862 | 745F | 7079 | 0D65 |
| 0001423520 | E404 | 02FF | 0702 | 5F5F | 7270 | 6E69 | 0B74 | DC04 |
| 0001423540 | BEFF | 0502 | 5F5F | 766C | 0D6C | E804 | AFFF | 0705 |
| 0001423560 | 5F5F | 6C63 | 636F | 0D6B | F604 | C0FF | 0700 | 5F5F |
| 0001423600 | 7473 | 6361 | 0E6B | E204 | 81FF | 0800 | 5F5F | 6572 |
| 0001423620 | 7674 | 6C61 | 050E | 3200 | 0009 | 05B9 | 5F06 | 665F |
| 0001423640 | 6E75 | 0163 | 1C02 | 0401 | BAED | 2505 | 1001 | 1A00 |
| 0001423660 | 0001 | 0400 | 740D | 6C73 | 6C5F | 7865 | 635F | 656C |
| 0001423700 | 7261 | 040C | FFFA | 00C0 | 5F06 | 745F | 7079 | 0F65 |
| 0001423720 | F404 | 85FF | 0900 | 5F5F | 7862 | 745F | 7079 | 0D65 |
| 0001423740 | E404 | 02FF | 0702 | 5F5F | 7270 | 6E69 | 0B74 | DC04 |
| 0001423760 | BEFF | 0502 | 5F5F | 766C | 0D6C | E804 | AFFF | 0705 |
| 0001424000 | 5F5F | 6C63 | 636F | 0D6B | F604 | C0FF | 0700 | 5F5F |
| 0001424020 | 7473 | 6361 | 0E6B | E204 | 81FF | 0800 | 5F5F | 6572 |
| 0001424040 | 7674 | 6C61 | 050E | 3218 | 0009 | 05BB | 5F06 | 665F |
| 0001424060 | 6E75 | 0163 | 1E02 | 2901 | BCEE | B005 | 1001 | A500 |
| 0001424100 | 0001 | 0400 | 740F | 6C73 | 7865 | 6C5F | 6F6F | 616B |
| 0001424120 | 6568 | 6461 | 040C | FFFA | 00C0 | 5F06 | 745F | 7079 |
| 0001424140 | 0F65 | F404 | 85FF | 0900 | 5F5F | 7862 | 745F | 7079 |
| 0001424160 | 0D65 | E404 | 02FF | 0702 | 5F5F | 7270 | 6E69 | 0B74 |
| 0001424200 | DC04 | BEFF | 0502 | 5F5F | 766C | 0D6C | E804 | AFFF |
| 0001424220 | 0705 | 5F5F | 6C63 | 636F | 0D6B | F604 | C0FF | 0700 |
| 0001424240 | 5F5F | 7473 | 6361 | 0E6B | E204 | 81FF | 0800 | 5F5F |
| 0001424260 | 6572 | 7674 | 6C61 | 050E | 322E | 0009 | 05BD | 5F06 |
| 0001424300 | 665F | 6E75 | 0163 | 0502 | 000D | 1A00 | 1300 | 5C05 |
| 0001424320 | 080C | 8100 | 0B00 | 6177 | 746E | 725F | 6765 | 7865 |
| 0001424340 | 1470 | 4805 | 092B | 8100 | 0C00 | 7374 | 5F6C | 656E |
| 0001424360 | 5F77 | 6966 | 656C | 050E | 0AA4 | 0008 | 00C0 | 6C06 |
| 0001424400 | 7865 | 7470 | 1472 | 8E05 | 080C | C000 | 0C00 | 656C |
| 0001424420 | 7078 | 7274 | 625F | 6765 | 6E69 | 0514 | 0034 | 0008 |
| 0001424440 | 00C0 | 6C0C | 7865 | 745F | 6B6F | 7473 | 7261 | 1374 |
| 0001424460 | 7805 | 0800 | C000 | 0B00 | 656C | 5F78 | 7562 | 6C69 |
| 0001424500 | 6974 | 0F6E | 4005 | 092B | C000 | 0700 | 5F42 | 4678 |
| 0001424520 | 6C69 | 0F65 | 4405 | 092B | C000 | 0700 | 5F42 | 5078 |
| 0001424540 | 6361 | 0E6B | 4205 | 0937 | 8100 | 0600 | 7473 | 6972 |
| 0001424560 | 7463 | 0515 | 085E | 0008 | 04A8 | 740B | 6C73 | 675F |
| 0001424600 | 7465 | 696C | 656E | 0514 | 3744 | 0009 | 058A | 740C |
| 0001424620 | 6C73 | 635F | 7275 | 6672 | 6C69 | 1265 | 4405 | 0938 |
| 0001424640 | 8100 | 0A00 | 7374 | 5F6C | 696C | 656E | 6F6E | 0512 |
| 0001424660 | 3846 | 0009 | 0081 | 730A | 756F | 6372 | 6C65 | 6E69 |
| 0001424700 | 1365 | 7005 | 0926 | 8400 | 0B00 | 7374 | 5F6C | 656D |
| 0001424720 | 746D | 7079 | 0C65 | 3C05 | 0980 | 9400 | 0405 | 6263 |
| 0001424740 | 6675 | 0510 | 2B4A | 0009 | 05A6 | 7408 | 6B6F | 6E65 |
| 0001424760 | 6174 | 0E62 | 4E05 | 0975 | B200 | 0604 | 635F | 7974 |
| 0001425000 | 6570 | 0519 | 3852 | 0009 | 0085 | 7411 | 6C73 | 695F |
| 0001425020 | 706E | 7475 | 615F | 6F62 | 7472 | 6465 | 0514 | 0000 |

THU MAR 14 17:52:34 1991 TSLINT.DLL PAGE 352, LINE 20710

| | | | | | | | | |
|---|---|---|---|---|---|---|---|---|
| 0001425040 | 0000 | 0081 | 420C | 5F78 | 6544 | 7562 | 4D67 | 646F |
| 0001425060 | 1465 | 0005 | 0000 | 8100 | 0C00 | 7842 | 545F | 6D69 |
| 0001425100 | 7365 | 6F4D | 6564 | 0516 | 3858 | 0009 | 0081 | 740E |
| 0001425120 | 7365 | 5F74 | 6174 | 5F67 | 6176 | 696C | 1064 | 0005 |
| 0001425140 | 0000 | 8100 | 0800 | 7842 | 425F | 735F | 6769 | 050E |
| 0001425160 | 0C86 | 0008 | 057C | 7906 | 6C79 | 6176 | 056C | 0311 |
| 0001425200 | 0000 | 1C00 | 0001 | 4A00 | 4705 | 1001 | 3C00 | 0001 |
| 0001425220 | 0400 | 740D | 6C73 | 685F | 7361 | 5F68 | 6E69 | 7469 |
| 0001425240 | 040C | FFFA | 00C0 | 5F06 | 745F | 7079 | 0F65 | F204 |
| 0001425260 | 85FF | 0900 | 5F5F | 7862 | 745F | 7079 | 0D65 | E204 |
| 0001425300 | 02FF | 0702 | 5F5F | 7270 | 6E69 | 0B74 | DA04 | CCFF |
| 0001425320 | 0503 | 5F5F | 766C | 0D6C | E604 | 4EFF | 0705 | 5F5F |
| 0001425340 | 6C63 | 636F | 0D6B | F604 | C0FF | 0700 | 5F5F | 7473 |
| 0001425360 | 6361 | 0E6B | E004 | 81FF | 0800 | 5F5F | 6572 | 7674 |
| 0001425400 | 6C61 | 0407 | FFF4 | 0081 | 6901 | 050E | 325E | 0009 |
| 0001425420 | 054C | 5F06 | 665F | 6E75 | 0163 | 1602 | 4701 | 5001 |
| 0001425440 | 6405 | 1003 | 5900 | 0003 | 0400 | 6907 | 736E | 6174 |
| 0001425460 | 6C6C | 040B | 0006 | 04C7 | 7405 | 6261 | 656C | 040A |
| 0001425500 | 000A | 00C0 | 6E04 | 6D61 | 0B65 | 0E04 | BE00 | 0504 |
| 0001425520 | 6176 | 756C | 0C65 | FA04 | C0FF | 0600 | 5F5F | 7974 |
| 0001425540 | 6570 | 040F | FFF2 | 0085 | 5F09 | 625F | 5F78 | 7974 |
| 0001425560 | 6570 | [illegible] | [illegible] | [illegible] | 5F07 | 705F | 6972 | 746E |
| 0001425600 | [illegible] | [illegible] | [illegible] | [illegible] | [illegible] | 6C76 | 040D | FFE6 |
| 0001425620 | [illegible] | [illegible] | [illegible] | [illegible] | [illegible] | 040D | FFF4 | 00C0 |
| 0001425640 | [illegible] | [illegible] | [illegible] | [illegible] | [illegible] | FFDE | 04BE | 5F08 |
| 0001425660 | [illegible] | [illegible] | [illegible] | [illegible] | [illegible] | [illegible] | 0204 | 7068 |
| 0001425700 | [illegible] | [illegible] | [illegible] | [illegible] | [illegible] | 810D | 0F00 | 6206 |
| 0001425720 | [illegible] | [illegible] | [illegible] | [illegible] | [illegible] | 0100 | 0D70 | F804 |
| 0001425740 | [illegible] | [illegible] | [illegible] | [illegible] | 7079 | 0E65 | C805 | 0932 |
| 0001425760 | [illegible] | [illegible] | [illegible] | [illegible] | [illegible] | 0201 | 0115 | 04AB |
| 0001426000 | [illegible] | [illegible] | [illegible] | [illegible] | [illegible] | 0604 | 6F6C | 6B6F |
| 0001426020 | 7075 | 040B | 0006 | 04C7 | 7405 | 6261 | 656C | 040A |
| 0001426040 | 000A | 00C0 | 6E04 | 6D61 | 0865 | FA04 | C0FF | 0200 |
| 0001426060 | 7062 | 040C | FFF6 | 04BE | [illegible] | 6375 | 656B | 0874 |
| 0001426100 | 810D | 0E00 | 6C03 | [illegible] | [illegible] | 0114 | 05A6 | 055A |
| 0001426120 | 005F | 0013 | 0054 | [illegible] | [illegible] | 6168 | 6873 | 0A66 |
| 0001426140 | 0604 | C000 | 0400 | [illegible] | [illegible] | 0409 | 000A | 0081 |
| 0001426160 | 6C03 | 6E65 | 040E | [illegible] | [illegible] | 6808 | 7361 | 7368 |
| 0001426200 | 7A69 | 0665 | 810D | [illegible] | [illegible] | 0D08 | 0081 | 030E |
| 0001426220 | 656C | 016E | 1B02 | [illegible] | [illegible] | 0905 | 1002 | FE00 |
| 0001426240 | 0001 | 0400 | 660C | 6E75 | 5F63 | 6E69 | 7473 | 6C61 |
| 0001426260 | 0C6C | 0604 | BE00 | 0604 | 6170 | 6172 | 736D | 0409 |
| 0001426300 | 000A | 04BE | 6403 | 6665 | 040C | FFFA | 00C0 | 5F06 |
| 0001426320 | 745F | 7079 | 0F65 | EA04 | 85FF | 0900 | 5F5F | 7862 |
| 0001426340 | 745F | 7079 | 0D65 | DA04 | 02FF | 0702 | 5F5F | 7270 |
| 0001426360 | 6E69 | 0B74 | D004 | CCFF | 0503 | 5F5F | 766C | 0D6C |
| 0001426400 | DE04 | 4EFF | 0705 | 5F5F | 6C63 | 636F | 0D6B | EC04 |
| 0001426420 | C0FF | 0700 | 5F5F | 7473 | 6361 | 0E6B | D604 | BEFF |
| 0001426440 | 0804 | 5F5F | 6572 | 7674 | 6C61 | 0407 | FFF0 | 04BE |
| 0001426460 | 7201 | 0407 | FFF4 | 04BE | 7101 | 040D | FFF8 | 0084 |
| 0001426500 | 6D07 | 6D65 | 7974 | 6570 | 050E | 330A | 0009 | 02AA |
| 0001426520 | 5F06 | 665F | 6E75 | 0163 | 1602 | 0E01 | 6108 | B105 |
| 0001426540 | 1003 | A600 | 0003 | 0400 | 7007 | 706F | 765F | 7261 |
| 0001426560 | 0408 | 0006 | 04BE | 6E02 | 0C70 | 0A04 | 8100 | 0600 |
| 0001426600 | 7266 | 6565 | 7469 | 040C | FFFA | 00C0 | 5F06 | 745F |
| 0001426620 | 7079 | 0F65 | F004 | 85FF | 0900 | 5F5F | 7862 | 745F |
| 0001426640 | 7079 | 0D65 | E004 | 02FF | 0702 | 5F5F | 7270 | 6E69 |
| 0001426660 | 0B74 | D804 | CCFF | 0503 | 5F5F | 766C | 0D6C | E404 |
| 0001426700 | 4EFF | 0705 | 5F5F | 6C63 | 636F | 0D6B | F204 | C0FF |

THU MAR 14 17:52:34 1991 TSLINT.DLL PAGE 353, LINE 20769

| | | | | | | | | |
|---|---|---|---|---|---|---|---|---|
| 0001426720 | 0700 | 5F5F | 7473 | 6361 | 0E6B | DE04 | 81FF | 0800 |
| 0001426740 | 5F5F | 6572 | 7674 | 6C61 | 0408 | FFD4 | 00C0 | 6202 |
| 0001426760 | 0C70 | D004 | BEFF | 0604 | 7562 | 6B63 | 7465 | 040A |
| 0001427000 | FFCC | 04C7 | 7304 | 7661 | 0865 | 810D | 0E00 | 6C03 |
| 0001427020 | 6E65 | 040A | FFF6 | 00C0 | 6E04 | 6D61 | 0E65 | 4E05 |
| 0001427040 | 0933 | 5200 | 0605 | 5F5F | 7566 | 636E | 0005 | 09B5 |
| 0001427060 | 0092 | 040A | FFCA | 0085 | 5F04 | 735F | 017A | 0502 |
| 0001427100 | 5000 | 8F0A | 0A00 | CA04 | 85FF | 0400 | 5F5F | 7A73 |
| 0001427120 | 0201 | 0201 | 0119 | 0BBF | 0563 | 014F | 0010 | 0144 |
| 0001427140 | 0000 | 0A04 | 6F70 | 5F70 | 6170 | 6172 | 736D | 040C |
| 0001427160 | 0006 | 04BE | 7006 | 7261 | 6D61 | 0C73 | FA04 | C0FF |
| 0001427200 | 0600 | 5F5F | 7974 | 6570 | 040F | FFF4 | 0085 | 5F09 |
| 0001427220 | 625F | 5F78 | 7974 | 6570 | 040D | FFE4 | 0202 | 5F07 |
| 0001427240 | 705F | 6972 | 746E | 040B | FFDC | 03CC | 5F05 | 6C5F |
| 0001427260 | 6C76 | 040D | FFE8 | 054E | 5F07 | 635F | 6F6C | 6B63 |
| 0001427300 | 040D | FFF6 | 00C0 | 5F07 | 735F | 6174 | 6B63 | 040E |
| 0001427320 | FFE2 | 0081 | 5F08 | 725F | 7465 | 6176 | 086C | D804 |
| 0001427340 | BEFF | 0204 | 706E | 050E | 335E | 0009 | 0565 | 5F06 |
| 0001427360 | 665F | 6E75 | 0163 | 1902 | 0E01 | 670D | BD05 | 1001 |
| 0001427400 | B200 | 0001 | 0400 | 6D0A | 6B61 | 5F65 | 6170 | 6172 |
| 0001427420 | 0A6D | 0604 | C000 | 0400 | 616E | 656D | 040C | FFFA |
| 0001427440 | 00C0 | 5F06 | 745F | 7079 | 0F65 | EE04 | 85FF | 0900 |
| 0001427460 | 5F5F | 7862 | 745F | 7079 | 0D65 | DE04 | 02FF | 0702 |
| 0001427500 | 5F5F | 7270 | 6E69 | 0B74 | D404 | CCFF | 0503 | 5F5F |
| 0001427520 | 766C | 0D6C | E204 | 4EFF | 0705 | 5F5F | 6C63 | 636F |
| 0001427540 | 0D6B | F004 | C0FF | 0700 | 5F5F | 7473 | 6361 | 0E6B |
| 0001427560 | DA04 | BEFF | 0804 | 5F5F | 6572 | 7674 | 6C61 | 0407 |
| 0001427600 | FFF4 | 04BE | 7201 | 040D | FFF8 | 0084 | 6D07 | 6D65 |
| 0001427620 | 7974 | 6570 | 050E | 3378 | 0009 | 0565 | 5F06 | 665F |
| 0001427640 | 6E75 | 0163 | 1702 | CB01 | 690E | AD05 | 1001 | A200 |
| 0001427660 | 0001 | 0400 | 7608 | 7261 | 6169 | 6C62 | 0A65 | 0604 |
| 0001427700 | C000 | 0400 | 616E | 656D | 040E | FFDE | 04BE | 5F08 |
| 0001427720 | 725F | 7465 | 6176 | 0D6C | F804 | 84FF | 0700 | 656D |
| 0001427740 | 746D | 7079 | 0765 | D404 | BEFF | 0104 | 0C72 | FA04 |
| 0001427760 | C0FF | 0600 | 5F5F | 7974 | 6570 | 040F | FFF2 | 0085 |
| 0001430000 | 5F09 | 625F | 5F78 | 7974 | 6570 | 040D | FFE2 | 0202 |
| 0001430020 | 5F07 | 705F | 6972 | 746E | 040B | FFD8 | 03CC | 5F05 |
| 0001430040 | 6C5F | 6C76 | 040D | FFE6 | 054E | 5F07 | 635F | 6F6C |
| 0001430060 | 6B63 | 040D | FFF4 | 00C0 | 5F07 | 735F | 6174 | 6B63 |
| 0001430100 | 050E | 3392 | 0009 | 056A | 5F06 | 665F | 6E75 | 0163 |
| 0001430120 | 1A02 | 7801 | 6C10 | 3905 | 1002 | 2E00 | 0002 | 0400 |
| 0001430140 | 6E0B | 646F | 5F65 | 6F63 | 6D6D | 6E6F | 0408 | 0006 |
| 0001430160 | 0081 | 6F02 | 0C70 | FA04 | C0FF | 0600 | 5F5F | 7974 |
| 0001430200 | 6570 | 040F | FFF4 | 0085 | 5F09 | 625F | 5F78 | 7974 |
| 0001430220 | 6570 | 040D | FFE4 | 0202 | 5F07 | 705F | 6972 | 746E |
| 0001430240 | 040B | FFDA | 03CC | 5F05 | 6C5F | 6C76 | 040D | FFE8 |
| 0001430260 | 054E | 5F07 | 635F | 6F6C | 6B63 | 040D | FFF6 | 00C0 |
| 0001430300 | 5F07 | 735F | 6174 | 6B63 | 040E | FFE0 | 04BE | 5F08 |
| 0001430320 | 725F | 7465 | 6176 | 076C | D604 | BEFF | 0104 | 0E72 |
| 0001430340 | D005 | 0933 | DE00 | 0602 | 5F5F | 7566 | 636E | 0201 |
| 0001430360 | 0113 | 12B1 | 056F | 016A | 0010 | 015F | 0000 | 0404 |
| 0001430400 | 6F6E | 6564 | 040A | 0006 | 04BE | 6C04 | 6665 | 0874 |
| 0001430420 | 0A04 | 8100 | 0200 | 706F | 040B | 000C | 04BE | 7205 |
| 0001430440 | 6769 | 7468 | 040C | FFFA | 00C0 | 5F06 | 745F | 7079 |
| 0001430460 | 0F65 | F404 | 85FF | 0900 | 5F5F | 7862 | 745F | 7079 |
| 0001430500 | 0D65 | E404 | 02FF | 0702 | 5F5F | 7270 | 6E69 | 0B74 |
| 0001430520 | DA04 | CCFF | 0503 | 5F5F | 766C | 0D6C | E804 | 4EFF |
| 0001430540 | 0705 | 5F5F | 6C63 | 636F | 0D6B | F604 | C0FF | 0700 |
| 0001430560 | 5F5F | 7473 | 6361 | 0E6B | E004 | BEFF | 0804 | 5F5F |

THU MAR 14 17:52:34 1991 TSLINT.DLL PAGE 354, LINE 20828

| | | | | | | | | |
|---|---|---|---|---|---|---|---|---|
| 0001430600 | 6572 | 7674 | 6C61 | 0407 | FFD6 | 04BE | 7201 | 050E |
| 0001430620 | 33EA | 0009 | 0571 | 5F06 | 665F | 6E75 | 0163 | 1402 |
| 0001430640 | 1B01 | 7314 | 6A05 | 1001 | 5F00 | 0001 | 0400 | 7305 |
| 0001430660 | 6F6E | 6564 | 040A | 0006 | 04BE | 7304 | 6275 | 086E |
| 0001430700 | 0A04 | 8100 | 0200 | 706F | 040B | 000C | 04C2 | 7005 |
| 0001430720 | 6F72 | 7063 | 040F | FFF4 | 0085 | 5F09 | 625F | 5F78 |
| 0001430740 | 7974 | 6570 | 040D | FFE4 | 0202 | 5F07 | 705F | 6972 |
| 0001430760 | 746E | 040B | FFDA | 03CC | 5F05 | 6C5F | 6C76 | 040D |
| 0001431000 | FFE8 | 054E | 5F07 | 635F | 6F6C | 6B63 | 040D | FFF6 |
| 0001431020 | 00C0 | 5F07 | 735F | 6174 | 6B63 | 040E | FFE0 | 04BE |
| 0001431040 | 5F08 | 725F | 7465 | 6176 | 076C | D604 | BEFF | 0104 |
| 0001431060 | 0C72 | FA04 | C0FF | 0600 | 5F5F | 7974 | 6570 | 050E |
| 0001431100 | 33FE | 0009 | 0574 | 5F06 | 665F | 6E75 | 0163 | 1A02 |
| 0001431120 | 8501 | 7615 | 6105 | 1001 | 5600 | 0001 | 0400 | 6D0B |
| 0001431140 | 726B | 6E61 | 6567 | 6F6E | 6564 | 040B | 0006 | 04BE |
| 0001431160 | 6305 | 6170 | 7269 | 040C | FFFA | 00C0 | 5F06 | 745F |
| 0001431200 | 7079 | 0F65 | F404 | 85FF | 0900 | 5F5F | 7862 | 745F |
| 0001431220 | 7079 | 0D65 | E404 | 02FF | 0702 | 5F5F | 7270 | 6E69 |
| 0001431240 | 0B74 | DA04 | CCFF | 0503 | 5F5F | 766C | 0D6C | E804 |
| 0001431260 | 4EFF | 0705 | 5F5F | 6C63 | 636F | 0D6B | F604 | C0FF |
| 0001431300 | 0700 | 5F5F | 7473 | 6361 | 0E6B | E004 | BEFF | 0804 |
| 0001431320 | 5F5F | 6572 | 7674 | 6C61 | 0407 | FFD6 | 04BE | 7201 |
| 0001431340 | 050E | 3412 | 0009 | 02DE | 5F06 | 665F | 6E75 | 0163 |
| 0001431360 | 1C02 | E601 | 7816 | 2D05 | 1002 | 2200 | 0002 | 0400 |
| 0001431400 | 6D0D | 6B61 | 5F65 | 6F66 | 5F72 | 6F6C | 706F | 040A |
| 0001431420 | 0006 | 04BE | 6904 | 696E | 0A74 | 0A04 | BE00 | 0404 |
| 0001431440 | 6F63 | 646E | 040A | 000E | 04BE | 6904 | 636E | 0C72 |
| 0001431460 | FA04 | C0FF | 0600 | 5F5F | 7974 | 6570 | 040F | FFF4 |
| 0001431500 | 0085 | 5F09 | 625F | 5F78 | 7974 | 6570 | 040D | FFE4 |
| 0001431520 | 0202 | 5F07 | 705F | 6972 | 746E | 040B | FFDA | 03CC |
| 0001431540 | 5F05 | 6C5F | 6C76 | 040D | FFE8 | 054E | 5F07 | 635F |
| 0001431560 | 6F6C | 6B63 | 040D | FFF6 | 00C0 | 5F07 | 735F | 6174 |
| 0001431600 | 6B63 | 040E | FFE0 | 04BE | 5F08 | 725F | 7465 | 6176 |
| 0001431620 | 076C | D204 | C6FF | 0104 | 0772 | D604 | BEFF | 0104 |
| 0001431640 | 0E6E | 5205 | 0934 | 4C00 | 0605 | 5F5F | 7566 | 636E |
| 0001431660 | 0201 | 011B | 1913 | 057A | 0179 | 0010 | 016E | 0000 |
| 0001431700 | 0C04 | 7061 | 6570 | 646E | 725F | 6769 | 7468 | 040A |
| 0001431720 | 0006 | 04BE | 6C04 | 7369 | 0974 | 0A04 | BE00 | 0304 |
| 0001431740 | 656E | 0C77 | FA04 | C0FF | 0600 | 5F5F | 7974 | 6570 |
| 0001431760 | 040F | FFF4 | 0085 | 5F09 | 625F | 5F78 | 7974 | 6570 |
| 0001432000 | 040D | FFE4 | 0202 | 5F07 | 705F | 6972 | 746E | 040B |
| 0001432020 | FFDA | 03CC | 5F05 | 6C5F | 6C76 | 040D | FFE8 | 054E |
| 0001432040 | 5F07 | 635F | 6F6C | 6B63 | 040D | FFF6 | 00C0 | 5F07 |
| 0001432060 | 735F | 6174 | 6B63 | 040E | FFE0 | 04BE | 5F08 | 725F |
| 0001432100 | 7465 | 6176 | 0D6C | D604 | BEFF | 0704 | 6C6F | 6C64 |
| 0001432120 | 7369 | 0E74 | 6E05 | 0934 | AA00 | 0602 | 5F5F | 7566 |
| 0001432140 | 636E | 0201 | 011D | 1A8C | 057C | 01A2 | 0010 | 0197 |
| 0001432160 | 0000 | 0E04 | 7374 | 5F6C | 696C | 656E | 665F | 7869 |
| 0001432200 | 7075 | 040A | 0006 | 04BE | 7404 | 6572 | 0A65 | 0A04 |
| 0001432220 | 8100 | 0400 | 696C | 656E | 040C | FFFA | 00C0 | 5F06 |
| 0001432240 | 745F | 7079 | 0F65 | F404 | 85FF | 0900 | 5F5F | 7862 |
| 0001432260 | 745F | 7079 | 0D65 | E404 | 02FF | 0702 | 5F5F | 7270 |
| 0001432300 | 6E69 | 0B74 | DA04 | CCFF | 0503 | 5F5F | 766C | 0D6C |
| 0001432320 | E804 | 4EFF | 0705 | 5F5F | 6C63 | 636F | 0D6B | F604 |
| 0001432340 | C0FF | 0700 | 5F5F | 7473 | 6361 | 0E6B | E004 | BEFF |
| 0001432360 | 0804 | 5F5F | 6572 | 7674 | 6C61 | 050E | 34B2 | 0009 |
| 0001432400 | 057D | 5F06 | 665F | 6E75 | 0163 | 1402 | 4405 | 0937 |
| 0001432420 | 4200 | 0C05 | 7374 | 5F6C | 7563 | 7272 | 6966 | 656C |
| 0001432440 | 0512 | 3844 | 0009 | 0081 | 740A | 6C73 | 6C5F | 6E69 |

THU MAR 14 17:52:34 1991 TSLINT.DLL PAGE 355, LINE 20887

| | | | | | | | | |
|---|---|---|---|---|---|---|---|---|
| 0001432460 | 6E65 | 056F | 000D | 1A00 | 1500 | 5205 | 0800 | 8100 |
| 0001432500 | 0D00 | 6170 | 6172 | 5F6D | 6F63 | 6E75 | 6574 | 1172 |
| 0001432520 | C405 | 080A | 3300 | 0905 | 6176 | 6972 | 6261 | 656C |
| 0001432540 | 1473 | 0005 | 0000 | 8100 | 0C00 | 7842 | 445F | 6265 |
| 0001432560 | 6775 | 6F4D | 6564 | 0514 | 0000 | 0000 | 0081 | 420C |
| 0001432600 | 5F78 | 6954 | 656D | 4D73 | 646F | 1065 | 0005 | 0000 |
| 0001432620 | 8100 | 0800 | 7842 | 425F | 735F | 6769 | 0513 | 2670 |
| 0001432640 | 0009 | 0084 | 740B | 6C73 | 6D5F | 6D65 | 7974 | 6570 |
| 0001432660 | 050E | 754E | 0009 | 0469 | 5F06 | 7463 | 7079 | 1465 |
| 0001432700 | 3A05 | 0937 | BE00 | 0C04 | 6E4E | 6C75 | 5F6C | 7473 |
| 0001432720 | 6972 | 676E | 050F | 3256 | 0009 | 00C0 | 4207 | 785F |
| 0001432740 | 6946 | 656C | 050F | 325A | 0009 | 00C0 | 4207 | 785F |
| 0001432760 | 6150 | 6B63 | 1105 | 0003 | 0000 | 011A | 1C2E | 0524 |
| 0001433000 | 040A | 0010 | 03FF | 0000 | 0B04 | 616D | 656B | 725F |
| 0001433020 | 6765 | 7865 | 0770 | 0604 | A800 | 0104 | 1073 | 0A04 |
| 0001433040 | 8100 | 0A00 | 6769 | 6F6E | 6572 | 6163 | 6573 | 040C |
| 0001433060 | FFFA | 00C0 | 5F06 | 745F | 7079 | 0F65 | EC04 | 85FF |
| 0001433100 | 0900 | 5F5F | 7862 | 745F | 7079 | 0D65 | DC04 | 02FF |
| 0001433120 | 0702 | 5F5F | 7270 | 6E69 | 0B74 | D204 | EFFF | 0503 |
| 0001433140 | 5F5F | 766C | 0D6C | E004 | 27FF | 0705 | 5F5F | 6C63 |
| 0001433160 | 636F | 0D6B | F204 | C0FF | 0700 | 5F5F | 7473 | 6361 |
| 0001433200 | 0E6B | D804 | AEFF | 0804 | 5F5F | 6572 | 7674 | 6C61 |
| 0001433220 | 0408 | FFF6 | 04AE | 7202 | 0970 | EE04 | C0FF | 0300 |
| 0001433240 | 7265 | 0E72 | 8C05 | 0935 | 2500 | 0605 | 5F5F | 7566 |
| 0001433260 | 636E | 0201 | 011A | 2038 | 052C | 026A | 0010 | 025F |
| 0001433300 | 0000 | 0B04 | 6B6D | 725F | 5F65 | 6170 | 7372 | 0765 |
| 0001433320 | 0604 | C000 | 0100 | 1073 | 0A04 | 8100 | 0A00 | 6769 |
| 0001433340 | 6F6E | 6572 | 6163 | 6573 | D409 | FFFA | 00C0 | 7303 |
| 0001433360 | 6372 | 040A | FFF6 | 00C0 | 6404 | 7365 | 0674 | 810D |
| 0001433400 | 0E00 | 6301 | 0005 | 2123 | 005B | 0D06 | 0081 | 010F |
| 0001433420 | 0169 | 0502 | 8100 | 4C21 | 0600 | 810D | 0F00 | 6901 |
| 0001433440 | 040B | FFF4 | 0081 | 6305 | 756F | 746E | 0201 | 0B08 |
| 0001433460 | 21D0 | 0300 | 6564 | 0166 | 1102 | 1205 | 093D | D000 |
| 0001433500 | 0904 | 6163 | 6573 | 6174 | 6C62 | 0D65 | A005 | 08CA |
| 0001433520 | A800 | 0504 | 6564 | 6572 | 0566 | 000D | 1A00 | 1400 |
| 0001433540 | 0005 | 0000 | 8100 | 0C00 | 7842 | 445F | 6265 | 6775 |
| 0001433560 | 6F4D | 6564 | 0514 | 0000 | 0000 | 0081 | 420C | 5F78 |
| 0001433600 | 6954 | 656D | 4D73 | 646F | 1065 | 0005 | 0000 | 8100 |
| 0001433620 | 0800 | 7842 | 425F | 735F | 6769 | 050E | 3742 | 0009 |
| 0001433640 | 0081 | 7306 | 7274 | 6369 | 0F74 | 8405 | 0935 | C000 |
| 0001433660 | 0700 | 5F42 | 4678 | 6C69 | 0E65 | 4E05 | 0975 | 5300 |
| 0001433700 | 0604 | 635F | 7974 | 6570 | 0513 | 2670 | 0009 | 0084 |
| 0001433720 | 740B | 6C73 | 6D5F | 6D65 | 7974 | 657D | 050F | 3588 |
| 0001433740 | 0009 | 00C0 | 4207 | 785F | 6150 | 6B63 | 1105 | 0003 |
| 0001433760 | 0000 | 011D | 22A2 | 055B | 04F3 | 0010 | 04E8 | 0000 |
| 0001434000 | 0E04 | 7374 | 5F6C | 6E69 | 7469 | 6169 | 696C | 657A |
| 0001434020 | 040C | FFFA | 00C0 | 5F06 | 745F | 7079 | 0F65 | F404 |
| 0001434040 | 85FF | 0900 | 5F5F | 7862 | 745F | 7079 | 0D65 | E404 |
| 0001434060 | 02FF | 0702 | 5F5F | 7270 | 6E69 | 0B74 | DC04 | CCFF |
| 0001434100 | 0503 | 5F5F | 766C | 0D6C | E804 | 5FFF | 0705 | 5F5F |
| 0001434120 | 6C63 | 636F | 0D6B | F604 | C0FF | 0700 | 5F5F | 7473 |
| 0001434140 | 6361 | 0E6B | E204 | 81FF | 0800 | 5F5F | 6572 | 7674 |
| 0001434160 | 6C61 | 050E | 3710 | 0009 | 055D | 5F06 | 665F | 6E75 |
| 0001434200 | 0163 | 1C02 | 9501 | 6927 | 3705 | 1001 | 2C00 | 0001 |
| 0001434220 | 0400 | 740D | 6C73 | 745F | 7265 | 696D | 616E | 6574 |
| 0001434240 | 040C | FFFA | 00C0 | 5F06 | 745F | 7079 | 0F65 | F404 |
| 0001434260 | 85FF | 0900 | 5F5F | 7862 | 745F | 7079 | 0D65 | E404 |
| 0001434300 | 02FF | 0702 | 5F5F | 7270 | 6E69 | 0B74 | DC04 | CCFF |
| 0001434320 | 0503 | 5F5F | 766C | 0D6C | E804 | 5FFF | 0705 | 5F5F |

BEST AVAILABLE COPY

THU MAR 14 17:52:34 1991 TSLINT.DLL PAGE 356, LINE 20946

| | | | | | | | | |
|---|---|---|---|---|---|---|---|---|
| 0001434340 | 6C63 | 636F | 0D6B | F604 | C0FF | 0700 | 5F5F | 7473 |
| 0001434360 | 6361 | 0E6B | E204 | 81FF | 0800 | 5F5F | 6572 | 7674 |
| 0001434400 | 6C61 | 050E | 3728 | 0009 | 056B | 5F06 | 665F | 6E75 |
| 0001434420 | 0163 | 1202 | 4405 | 0938 | 8100 | 0A00 | 7374 | 5F6C |
| 0001434440 | 696C | 656E | 6F6E | 0516 | 384C | 0009 | 0085 | 740E |
| 0001434460 | 6C73 | 615F | 6F62 | 7472 | 665F | 616C | 1867 | 5005 |
| 0001434500 | 0938 | 8500 | 1000 | 7374 | 5F6C | 6572 | 7473 | 7261 |
| 0001434520 | 5F74 | 6C66 | 6761 | 0D05 | 0000 | 001A | 0519 | 3852 |
| 0001434540 | 0009 | 0085 | 7411 | 6C73 | 695F | 706E | 7475 | 615F |
| 0001434560 | 6F62 | 7472 | 6465 | 0518 | 0C72 | 0008 | 04D1 | 6510 |
| 0001434600 | 7078 | 6572 | 7373 | 6F69 | 5F6E | 6176 | 756C | 1665 |
| 0001434620 | 5605 | 0938 | 8100 | 0E00 | 7374 | 5F6C | 7473 | 6E61 |
| 0001434640 | 6164 | 6F6C | 656E | 0516 | 3858 | 0009 | 0081 | 740E |
| 0001434660 | 7365 | 5F74 | 6174 | 5F67 | 6176 | 696C | 1464 | 0005 |
| 0001434700 | 0000 | 8100 | 0C00 | 7842 | 445F | 6265 | 6775 | 6F4D |
| 0001434720 | 6564 | 0517 | 385A | 0009 | 0081 | 610F | 6F62 | 7472 |
| 0001434740 | 745F | 6761 | 765F | 6C61 | 6469 | 0514 | 0000 | 0000 |
| 0001434760 | 0081 | 420C | 5F78 | 6954 | 656D | 4D73 | 646F | 1065 |
| 0001435000 | 0005 | 0000 | 8100 | 0800 | 7842 | 425F | 735F | 6769 |
| 0001435020 | 0516 | 385C | 0009 | 0081 | 660E | 6E75 | 5F63 | 6174 |
| 0001435040 | 5F67 | 6176 | 696C | 1664 | 5E05 | 0938 | 8100 | 0E00 |
| 0001435060 | 6F6C | 706F | 745F | 6761 | 765F | 6C61 | 6469 | 050F |
| 0001435100 | 0C6E | 0008 | 00C0 | 7407 | 6C73 | 685F | 6261 | 050F |
| 0001435120 | 0080 | 0008 | 00C0 | 7407 | 6C73 | 685F | 716D | 0514 |
| 0001435140 | 43E4 | 0009 | 0031 | 730C | 7375 | 6570 | 646E | 665F |
| 0001435160 | 616C | 1467 | [illegible] | 0937 | D100 | 0C04 | 6E4E | 6C75 |
| 0001435200 | 5F6C | [illegible] | [illegible] | [illegible] | 050F | 3708 | 0009 | 00C0 |
| 0001435220 | [illegible] | [illegible] | [illegible] | [illegible] | 050E | 3742 | 0009 | 0081 |
| 0001435240 | [illegible] | [illegible] | [illegible] | [illegible] | 0C05 | 0937 | C000 | 0700 |
| 0001435260 | [illegible] | [illegible] | [illegible] | [illegible] | [illegible] | 0926 | 8400 | 0800 |
| 0001435300 | [illegible] | [illegible] | [illegible] | [illegible] | [illegible] | 1465 | 4405 | 0937 |
| 0001435320 | [illegible] | [illegible] | [illegible] | [illegible] | [illegible] | 7272 | 6966 | 656C |
| 0001435340 | [illegible] | [illegible] | 001A | 0519 | 373A | 0009 | 0488 | 4E0C |
| 0001435360 | [illegible] | [illegible] | 735F | 7274 | 6E69 | 0E67 | 3E05 | 0937 |
| 0001435400 | C000 | 0600 | 796D | 616E | 656D | 050E | 3742 | 0009 |
| 0001435420 | 0081 | 7306 | 7274 | 6369 | 1374 | 5E05 | 0808 | 2600 |
| 0001435440 | 0B04 | 7374 | 5F6C | 6567 | 6C74 | 6E69 | 1465 | 4405 |
| 0001435460 | 0937 | FF00 | 0C04 | 7374 | 5F6C | 7563 | 7272 | 6966 |
| 0001435500 | 656C | 0512 | 3844 | 0009 | 0081 | 740A | 6C73 | 6C5F |
| 0001435520 | 6E69 | 6E65 | 126F | 4605 | 0938 | 8100 | 0A00 | 6F73 |
| 0001435540 | 7275 | 6563 | 696C | 656E | [illegible] | 3848 | 0009 | 00C0 |
| 0001435560 | 7306 | 756F | 6372 | 0F65 | [illegible] | 0800 | 8500 | 0700 |
| 0001435600 | 7374 | 5F6C | 6974 | 1664 | [illegible] | 0938 | 8500 | 0E00 |
| 0001435620 | 7374 | 5F6C | 6261 | 726F | 5F74 | 6C66 | 6761 | 0518 |
| 0001435640 | 384E | 0009 | 0085 | 7410 | 6C73 | 735F | 7375 | 6570 |
| 0001435660 | 646E | 665F | 616C | 1867 | 5005 | 0938 | 8500 | 1000 |
| 0001435700 | 7374 | 5F6C | 6572 | 7473 | 7261 | 5F74 | 6C66 | 6761 |
| 0001435720 | 0519 | 3852 | 0009 | 0085 | 7411 | 6C73 | 695F | 706E |
| 0001435740 | 7475 | 615F | 6F62 | 7472 | 6465 | 051E | 3854 | 0009 |
| 0001435760 | 0085 | 7416 | 6C73 | 735F | 7274 | 6E69 | 5F67 | 7274 |
| 0001436000 | 6E61 | 6C73 | 7461 | 6F69 | 186E | 7205 | 080C | 8800 |
| 0001436020 | 1004 | 7865 | 7270 | 7365 | 6973 | 6E6F | 765F | 6C61 |
| 0001436040 | 6575 | 0516 | 3856 | 0009 | 0081 | 740E | 6C73 | 735F |
| 0001436060 | 6174 | 646E | 6C61 | 6E6F | 1065 | 3805 | 0800 | 0000 |
| 0001436100 | 0805 | 6574 | 7473 | 745F | 6761 | 0516 | 3858 | 0009 |
| 0001436120 | 0081 | 740E | 7365 | 5F74 | 6174 | 5F67 | 6176 | 696C |
| 0001436140 | 1164 | 8805 | 080A | 0000 | 0905 | 6261 | 726F | 5F74 |
| 0001436160 | 6174 | 1767 | 5A05 | 0938 | 8100 | 0F00 | 6261 | 726F |
| 0001436200 | 5F74 | 6174 | 5F67 | 6176 | 696C | 1364 | 0405 | 0800 |

THU MAR 14 17:52:34 1991 TSLINT.DLL PAGE 357, LINE 21005

| | | | | | | | | |
|---|---|---|---|---|---|---|---|---|
| 0001436220 | 0000 | 0B05 | 6572 | 7473 | 7261 | 5F74 | 6174 | 1067 |
| 0001436240 | 5405 | 0800 | 0000 | 0805 | 7566 | 636E | 745F | 6761 |
| 0001436260 | 0516 | 385C | 0009 | 0081 | 660E | 6E75 | 5F63 | 6174 |
| 0001436300 | 5F67 | 6176 | 696C | 1064 | 6605 | 0800 | 0000 | 0805 |
| 0001436320 | 6F6C | 706F | 745F | 6761 | 0516 | 385E | 0009 | 0081 |
| 0001436340 | 6C0E | 6F6F | 5F70 | 6174 | 5F67 | 6176 | 696C | 1064 |
| 0001436360 | 6A05 | 080A | 0000 | 0805 | 7572 | 656C | 745F | 6761 |
| 0001436400 | 050F | 0C6E | 0008 | 00C0 | 7407 | 6C73 | 685F | 6261 |
| 0001436420 | 050F | 0080 | 0008 | 00C0 | 7407 | 6C73 | 685F | 716D |
| 0001436440 | 1105 | 0003 | 0000 | 0118 | 28CC | 055F | 030A | 0016 |
| 0001436460 | 02FE | 0000 | 0904 | 7374 | 5F6C | 7473 | 7261 | 0C74 |
| 0001436500 | FA04 | C0FF | 0600 | 5F5F | 7974 | 6570 | 040F | FFF4 |
| 0001436520 | 0085 | 5F09 | 625F | 5F78 | 7974 | 6570 | 040D | FFE4 |
| 0001436540 | 036D | 5F07 | 705F | 6972 | 746E | 040B | FFDC | 03DD |
| 0001436560 | 5F05 | 6C5F | 6C76 | 040D | FFE8 | 0563 | 5F07 | 635F |
| 0001436600 | 6F6C | 6B63 | 040D | FFF6 | 00C0 | 5F07 | 735F | 6174 |
| 0001436620 | 6B63 | 040E | FFE2 | 0081 | 5F08 | 725F | 7465 | 6176 |
| 0001436640 | 0E6C | A005 | 0938 | 6100 | 0605 | 5F5F | 7566 | 636E |
| 0001436660 | 00G5 | 2980 | 0088 | 040A | FFDA | 0085 | 5F04 | 735F |
| 0001436700 | 017A | 0102 | 2102 | D601 | 662B | 2C05 | 1601 | 1E00 |
| 0001436720 | 0001 | 0400 | 7412 | 6C73 | 735F | 7465 | 695F | 706E |
| 0001436740 | 7475 | 665F | 6E75 | 0A63 | 0604 | 4A00 | 0405 | 7566 |
| 0001436760 | 636E | 040C | FFFA | 00C0 | 5F06 | 745F | 7079 | 0F65 |
| 0001437000 | F404 | 85FF | 0900 | 5F5F | 7862 | 745F | 7079 | 0D65 |
| 0001437020 | E404 | 6DFF | 0703 | 5F5F | 7270 | 6E69 | 0B74 | DC04 |
| 0001437040 | DDFF | 0503 | 5F5F | 766C | 0D6C | E804 | 63FF | 0705 |
| 0001437060 | 5F5F | 6C63 | 636F | 0D6B | F604 | C0FF | 0700 | 5F5F |
| 0001437100 | 7473 | 6361 | 0E6B | E204 | 81FF | 0800 | 5F5F | 6572 |
| 0001437120 | 7674 | 6C61 | 050E | 38B2 | 0009 | 0568 | 5F06 | 665F |
| 0001437140 | 6E75 | 0163 | 0502 | 000D | 1A00 | 1100 | 9C05 | 0938 |
| 0001437160 | C400 | 0900 | 7374 | 5F6C | 7473 | 6361 | 136B | 5E05 |
| 0001437200 | 0808 | 4A00 | 0B05 | 7374 | 5F6C | 6567 | 6C74 | 6E69 |
| 0001437220 | 0F65 | 8405 | 0800 | 8500 | 0700 | 7374 | 5F6C | 6974 |
| 0001437240 | 0F64 | 9405 | 0938 | C000 | 0700 | 5F42 | 4678 | 6C69 |
| 0001437260 | 0F65 | 9805 | 0938 | C000 | 0700 | 5F42 | 5078 | 6361 |
| 0001437300 | 146B | 0005 | 0000 | 8100 | 0C00 | 7842 | 445F | 6265 |
| 0001437320 | 6775 | 6F4D | 6564 | 0514 | 0000 | 0000 | 0081 | 420C |
| 0001437340 | 5F78 | 6954 | 656D | 4D73 | 646F | 1065 | 0005 | 0000 |
| 0001437360 | 8100 | 0800 | 7842 | 425F | 735F | 6769 | 1105 | 0003 |
| 0001437400 | 0000 | 0118 | 2D02 | 070E | 1C9D | 0010 | 1C92 | 0000 |
| 0001437420 | 0904 | 6E69 | 6574 | 7072 | 6572 | 0A74 | 0604 | 8200 |
| 0001437440 | 0406 | 7274 | 6565 | 040C | FFFA | 00C0 | 5F06 | 745F |
| 0001437460 | 7079 | 0F65 | EC04 | 85FF | 0900 | 5F5F | 7862 | 745F |
| 0001437500 | 7079 | 0D65 | CA04 | 02FF | 0702 | 5F5F | 7270 | 6E69 |
| 0001437520 | 0B74 | BE04 | CDFF | 0505 | 5F5F | 766C | 0D6C | CE04 |
| 0001437540 | 12FF | 0707 | 5F5F | 6C63 | 636F | 0D6B | F204 | C0FF |
| 0001437560 | 0700 | 5F5F | 7473 | 6361 | 0E6B | C404 | 81FF | 0800 |
| 0001437600 | 5F5F | 6572 | 7674 | 6C61 | 0407 | FFF6 | 0682 | 7401 |
| 0001437620 | 0414 | FFDA | 0702 | 6C0E | 6F6F | 5F70 | 6174 | 5F67 |
| 0001437640 | 7473 | 6361 | 096B | EE04 | 8BFF | 0306 | 686C | 0773 |
| 0001437660 | C604 | D1FF | 0106 | 0E6C | 1405 | 093E | 100D | 0607 |
| 0001437700 | 5F5F | 7566 | 636E | 050D | 3E1E | 0009 | 0081 | 6605 |
| 0001437720 | 7269 | 7473 | 0005 | 3140 | 0022 | 040F | FFA8 | 067E |
| 0001437740 | 7009 | 6972 | 746E | 6F6E | 6564 | 0201 | 0201 | 011A |
| 0001437760 | 499F | 0727 | 3223 | 0010 | 3218 | 0000 | 0B04 | 5F72 |
| 0001440000 | 7274 | 6565 | 655F | 6176 | 0A6C | 0604 | 8200 | 0406 |
| 0001440020 | 7274 | 6565 | 040F | FFD2 | 0085 | 5F09 | 625F | 5F78 |
| 0001440040 | 7974 | 6570 | 040D | FFBA | 0202 | 5F07 | 705F | 6972 |
| 0001440060 | 746E | 040B | FFB0 | 05CD | 5F05 | 6C5F | 6C76 | 040D |

THU MAR 14 17:52:34 1991 TSLINT.DLL PAGE 358, LINE 21064

| | | | | | | | | |
|---|---|---|---|---|---|---|---|---|
| 0001440100 | FFBE | 0712 | 5F07 | 635F | 6F6C | 6B63 | 040D | FFEA |
| 0001440120 | 00C0 | 5F07 | 735F | 6174 | 6B63 | 040E | FFB6 | 0682 |
| 0001440140 | 5F08 | 725F | 7465 | 6176 | 076C | F204 | 82FF | 0106 |
| 0001440160 | 0872 | E604 | 82FF | 0206 | 3174 | 0408 | FFE2 | 0682 |
| 0001440200 | 7402 | 0732 | D404 | 81FF | 0100 | 0969 | DE04 | 8BFF |
| 0001440220 | 0306 | 686C | 0873 | AE04 | 81FF | 0200 | 6964 | 0407 |
| 0001440240 | FFD6 | 0089 | 7801 | 0408 | FFCA | 0089 | 7802 | 0832 |
| 0001440260 | EE04 | 82FF | 0200 | 786C | 0408 | FFF6 | 0688 | 7202 |
| 0001440300 | 0C70 | FA04 | C0FF | 0600 | 5F5F | 7974 | 6570 | 050E |
| 0001440320 | 4154 | 0009 | 0310 | 5F06 | 665F | 6E75 | 0163 | 1C02 |
| 0001440340 | C201 | 2C7B | 5E07 | 1003 | 5300 | 0003 | 0400 | 610D |
| 0001440360 | 7373 | 6769 | 5F6E | 756E | 626D | 7265 | 0409 | 0006 |
| 0001440400 | 068B | 7003 | 7274 | 040B | 000A | 0089 | 7605 | 6C61 |
| 0001440420 | 6575 | 040D | FFE4 | 0202 | 5F07 | 705F | 6972 | 746E |
| 0001440440 | 040B | FFDC | 05CD | 5F05 | 6C5F | 6C76 | 040D | FFE8 |
| 0001440460 | 0712 | 5F07 | 635F | 6F6C | 6B63 | 040D | FFF6 | 00C0 |
| 0001440500 | 5F07 | 735F | 6174 | 6B63 | 040E | FFE2 | 0081 | 5F08 |
| 0001440520 | 725F | 7465 | 6176 | 076C | D804 | 82FF | 0106 | 0C6E |
| 0001440540 | FA04 | C0FF | 0600 | 5F5F | 7974 | 6570 | 040F | FFF4 |
| 0001440560 | 0085 | 5F09 | 625F | 5F78 | 7974 | 6570 | 050E | 41AC |
| 0001440600 | 0009 | 072D | 5F06 | 665F | 6E75 | 0563 | EA00 | 927D |
| 0001440620 | 0A00 | D604 | 85FF | 0400 | 5F5F | 7A73 | 0201 | 0201 |
| 0001440640 | 011D | 7F20 | 072F | 0406 | 0010 | 03FB | 0000 | 0E04 |
| 0001440660 | 7665 | 6C61 | 635F | 6E6F | 6964 | 6974 | 6E6F | 040A |
| 0001440700 | 0006 | 0682 | 7404 | 6572 | 0C65 | FA04 | C0FF | 0600 |
| 0001440720 | 5F5F | 7974 | 6570 | 040F | FFF0 | 0085 | 5F09 | 625F |
| 0001440740 | 5F78 | 7974 | 6570 | 040D | FFDE | 0202 | 5F07 | 705F |
| 0001440760 | 6972 | 746E | 040B | FFD6 | 05CD | 5F05 | 6C5F | 6C76 |
| 0001441000 | 040D | FFE4 | 0712 | 5F07 | 635F | 6F6C | 6B63 | 040D |
| 0001441020 | FFF6 | 00C0 | 5F07 | 735F | 6174 | 6B63 | 040E | FFDC |
| 0001441040 | 0081 | 5F08 | 725F | 7465 | 6176 | 086C | F204 | 82FF |
| 0001441060 | 0206 | 3174 | 0409 | FFE2 | 0081 | 7203 | 7465 | 050E |
| 0001441100 | 41C2 | 0009 | 0730 | 5F06 | 665F | 6E75 | 0163 | 1A02 |
| 0001441120 | 2601 | 3283 | ≥A07 | 1001 | 1F00 | 0001 | 0400 | 690B |
| 0001441140 | 5F73 | 5F61 | 756E | 626D | 7265 | 0409 | 0006 | 00C0 |
| 0001441160 | 7303 | 7274 | 0201 | 0118 | 8450 | 0734 | 0338 | 0010 |
| 0001441200 | 032D | 0000 | 0904 | 6D63 | 5F70 | 6F6E | 6564 | 0873 |
| 0001441220 | 0604 | 8200 | 0206 | 3174 | 0408 | 000A | 0682 | 7402 |
| 0001441240 | 0732 | F204 | 89FF | 0100 | 0964 | F004 | 81FF | 0300 |
| 0001441260 | 6572 | 0A74 | FC04 | 81FF | 0400 | 656C | 316E | 040A |
| 0001441300 | FFFA | 0081 | 6C04 | 6E65 | 0C32 | D50B | 0086 | 7307 |
| 0001441320 | 7274 | 6E69 | 7367 | 0201 | 0118 | 8788 | 0736 | 0875 |
| 0001441340 | 0010 | 086A | 0000 | 0904 | 706F | 615F | 7373 | 6769 |
| 0001441360 | 0A6E | 0604 | 8200 | 0406 | 7274 | 6565 | 040C | FFFA |
| 0001441400 | 00C0 | 5F06 | 745F | 7079 | 0F65 | D404 | 85FF | 0900 |
| 0001441420 | 5F5F | 7862 | 745F | 7079 | 0D65 | C404 | 02FF | 0702 |
| 0001441440 | 5F5F | 7270 | 6E69 | 0B74 | BA04 | CDFF | 0505 | 5F5F |
| 0001441460 | 766C | 0D6C | C804 | 12FF | 0707 | 5F5F | 6C63 | 636F |
| 0001441500 | 0D6B | F204 | C0FF | 0700 | 5F5F | 7473 | 6361 | 0E6B |
| 0001441520 | C004 | 82FF | 0806 | 5F5F | 6572 | 7674 | 6C61 | 040A |
| 0001441540 | FFE2 | 0089 | 7204 | 6176 | 0A6C | B204 | 89FF | 0400 |
| 0001441560 | 766C | 6C61 | 0409 | FFD6 | 068B | 6C03 | 7368 | 0408 |
| 0001441600 | FFEA | 0089 | 7402 | 0831 | DA04 | 89FF | 0200 | 3274 |
| 0001441620 | 040B | FFF6 | 0082 | 6C05 | 6574 | 706D | 050E | 4294 |
| 0001441640 | 0009 | 0710 | 5F06 | 665F | 6E75 | 0163 | 1A02 | FD01 |
| 0001441660 | 388F | 2F07 | 1002 | 2400 | 0002 | 0400 | 740B | 6C73 |
| 0001441700 | 635F | 6D6F | 6970 | 656C | 0407 | 0006 | 068B | 7401 |
| 0001441720 | 040C | FFFA | 00C0 | 5F06 | 745F | 7079 | 0F65 | F204 |
| 0001441740 | 85FF | 0900 | 5F5F | 7862 | 745F | 7079 | 0D65 | E204 |

THU MAR 14 17:52:34 1991 TSLINT.DLL PAGE 359, LINE 21123

| | | | | | | | | |
|---|---|---|---|---|---|---|---|---|
| 0001441760 | 02FF | 0702 | 5F5F | 7270 | 6E69 | 0B74 | DA04 | CDFF |
| 0001442000 | 0505 | 5F5F | 766C | 0D6C | E604 | 12FF | 0707 | 5F5F |
| 0001442020 | 6C63 | 636F | 0D6B | F604 | C0FF | 0700 | 5F5F | 7473 |
| 0001442040 | 6361 | 0E6B | E004 | 81FF | 0800 | 5F5F | 6572 | 7674 |
| 0001442060 | 6C61 | 0408 | FFF4 | 0081 | 7902 | 0E70 | AA05 | 0942 |
| 0001442100 | 3900 | 0607 | 5F5F | 7566 | 636E | 0201 | 011E | 922C |
| 0001442120 | 073B | 01E1 | 0010 | 01D6 | 0000 | 0F04 | 7374 | 5F6C |
| 0001442140 | 6E69 | 6574 | 7072 | 6572 | 6574 | 0C72 | FA04 | C0FF |
| 0001442160 | 0600 | 5F5F | 7974 | 6570 | 040F | FFF4 | 0085 | 5F09 |
| 0001442200 | 625F | 5F78 | 7974 | 6570 | 040D | FFE4 | 0202 | 5F07 |
| 0001442220 | 705F | 6972 | 746E | 040B | FFDC | 05CD | 5F05 | 6C5F |
| 0001442240 | 6C76 | 040D | FFE8 | 0712 | 5F07 | 635F | 6F6C | 6B63 |
| 0001442260 | 040D | FFF6 | 00C0 | 5F07 | 735F | 6174 | 6B63 | 040E |
| 0001442300 | FFE2 | 0081 | 5F08 | 725F | 7465 | 6176 | 0E6C | E805 |
| 0001442320 | 0942 | 3C00 | 0607 | 5F5F | 7566 | 636E | 0201 | 011C |
| 0001442340 | 940D | 073E | 03BD | 0010 | 03B2 | 0000 | 0D04 | 7374 |
| 0001442360 | 5F6C | 616D | 6E69 | 6C5F | 6F6F | 0C70 | FA04 | C0FF |
| 0001442400 | 0600 | 5F5F | 7974 | 6570 | 040F | FFDE | 0085 | 5F09 |
| 0001442420 | 625F | 5F78 | 7974 | 6570 | 040D | FFCE | 0202 | 5F07 |
| 0001442440 | 705F | 6972 | 746E | 040B | FFC6 | 05CD | 5F05 | 6C5F |
| 0001442460 | 6C76 | 040D | FFD2 | 0712 | 5F07 | 635F | 6F6C | 6B63 |
| 0001442500 | 040D | FFF2 | 00C0 | 5F07 | 735F | 6174 | 6B63 | 040E |
| 0001442520 | FFCC | 0081 | 5F08 | 725F | 7465 | 6176 | 076C | F604 |
| 0001442540 | 82FF | 0106 | 1574 | E004 | 02FF | 0F07 | 6261 | 726F |
| 0001442560 | 5F74 | 6174 | 5F67 | 7473 | 6361 | 0E6B | 9005 | 0943 |
| 0001442600 | 2D00 | 0607 | 5F5F | 7566 | 636E | 0201 | 0510 | 0038 |
| 0001442620 | 0008 | 0702 | 7408 | 7365 | 5F74 | 6174 | 1667 | 5805 |
| 0001442640 | 0938 | 8100 | 0E00 | 6574 | 7473 | 745F | 6761 | 765F |
| 0001442660 | 6C61 | 6469 | 0511 | 0A88 | 0008 | 0702 | 6109 | 6F62 |
| 0001442700 | 7472 | 745F | 6761 | 0517 | 385A | 0009 | 0081 | 610F |
| 0001442720 | 6F62 | 7472 | 745F | 6761 | 765F | 6C61 | 6469 | 0513 |
| 0001442740 | 0004 | 0008 | 0702 | 720B | 7365 | 6174 | 7472 | 745F |
| 0001442760 | 6761 | 0513 | 2670 | 0009 | 0084 | 740B | 6C73 | 6D5F |
| 0001443000 | 6D65 | 7974 | 6570 | 050A | 0AB0 | 0008 | 0682 | 5F02 |
| 0001443020 | 0F74 | 8405 | 080A | 8200 | 0706 | 725F | 7365 | 6C75 |
| 0001443040 | 1074 | 5405 | 0800 | 0200 | 0807 | 7566 | 636E | 745F |
| 0001443060 | 6761 | 0516 | 385C | 0009 | 0081 | 660E | 6E75 | 5F63 |
| 0001443100 | 6174 | 5F67 | 6176 | 696C | 1164 | 1205 | 093D | B200 |
| 0001443120 | 0905 | 6163 | 6573 | 6174 | 6C62 | 1165 | C205 | 080A |
| 0001443140 | 8100 | 0900 | 6966 | 6C65 | 5F64 | 756E | 056D | 000D |
| 0001443160 | 1A00 | 0F00 | 0605 | 093D | C000 | 0700 | 5F42 | 4678 |
| 0001443200 | 6C69 | 1065 | 6605 | 0800 | 0200 | 0807 | 6F6C | 706F |
| 0001443220 | 745F | 6761 | 0512 | 0C76 | 0008 | 068B | 660A | 6569 |
| 0001443240 | 646C | 5F73 | 7261 | 0E72 | 4E05 | 0975 | 2D00 | 0606 |
| 0001443260 | 635F | 7974 | 6570 | 0516 | 385E | 0009 | 0081 | 6C0E |
| 0001443300 | 6F6F | 5F70 | 6174 | 5F67 | 6176 | 696C | 0F64 | 0A05 |
| 0001443320 | 093D | C000 | ^700 | 5F42 | 5078 | 6361 | 116B | 7A05 |
| 0001443340 | 080C | 8900 | 0900 | 6D5F | 6373 | 3135 | 7562 | 1067 |
| 0001443360 | 6A05 | 080A | 0200 | 0807 | 7572 | 656C | 745F | 6761 |
| 0001443400 | 050F | 0C6E | 0008 | 00C0 | 7407 | 6C73 | 685F | 6261 |
| 0001443420 | 050D | 0AA0 | 0008 | 0682 | 6405 | 7265 | 6665 | 0510 |
| 0001443440 | 3E12 | 0009 | 0081 | 6E08 | 7765 | 735F | 6D74 | 0F74 |
| 0001443460 | 8005 | 0800 | C000 | 0700 | 7374 | 5F6C | 6D68 | 0F71 |
| 0001443500 | 0E05 | 093D | 8100 | 0700 | 7865 | 7469 | 6E69 | 1067 |
| 0001443520 | 1005 | 093D | 8100 | 0800 | 7865 | 7469 | 765F | 6C61 |
| 0001443540 | 0511 | 0AC0 | 0008 | 0081 | 7309 | 6F74 | 5F70 | 6C66 |
| 0001443560 | 6761 | 0510 | 0C5E | 0008 | 0682 | 7208 | 7465 | 6E5F |
| 0001443600 | 646F | 1765 | 6605 | 080C | 8200 | 0F06 | 4749 | 4F4E |
| 0001443620 | 4552 | 4143 | 4553 | 6E5F | 646F | 1465 | 0005 | 0000 |

BEST AVAILABLE COPY

THU MAR 14 17:52:34 1991 TSLINT.DLL PAGE 360, LINE 21182

| | | | | | | | | |
|---|---|---|---|---|---|---|---|---|
| 0001443640 | 8100 | 0C00 | 7842 | 445F | 6265 | 6775 | 6F4D | 6564 |
| 0001443660 | 0514 | 0000 | 0000 | 0081 | 420C | 5F78 | 6954 | 656D |
| 0001443700 | 4D73 | 646F | 1065 | 0005 | 0000 | 8100 | 0800 | 7842 |
| 0001443720 | 425F | 735F | 6769 | 0514 | 373A | 0009 | 0682 | 4E0C |
| 0001443740 | 756E | 6C6C | 735F | 7274 | 6E69 | 1167 | 5605 | 0808 |
| 0001443760 | 8B00 | 0906 | 7473 | 6361 | 5F6B | 7470 | 0E72 | 4205 |
| 0001444000 | 0937 | 8100 | 0600 | 7473 | 6972 | 7463 | 0512 | 3846 |
| 0001444020 | 0009 | 0081 | 730A | 756F | 6372 | 6C65 | 6E69 | 0E65 |
| 0001444040 | 4805 | 0938 | C000 | 0600 | 6F73 | 7275 | 6563 | 0518 |
| 0001444060 | 0C72 | 0008 | 0682 | 6510 | 7078 | 6572 | 7373 | 6F69 |
| 0001444100 | 5F6E | 6176 | 756C | 0565 | 0311 | 0000 | 1800 | CA01 |
| 0001444120 | 8E97 | A906 | 1601 | 9B00 | 0001 | 0400 | 7409 | 6C73 |
| 0001444140 | 675F | 636F | 646D | 040B | 0006 | 0081 | 6705 | 636F |
| 0001444160 | 646D | 040A | FFDA | 0085 | 7304 | 6174 | 0C74 | FA04 |
| 0001444200 | C0FF | 0600 | 5F5F | 7974 | 6570 | 040F | FFF4 | 0085 |
| 0001444220 | 5F09 | 625F | 5F78 | 7974 | 6570 | 040D | FFE4 | 0394 |
| 0001444240 | 5F07 | 705F | 6972 | 746E | 040B | FFDC | 0202 | 5F05 |
| 0001444260 | 6C5F | 6C76 | 040D | FFE8 | 0692 | 5F07 | 635F | 6F6C |
| 0001444300 | 6B63 | 040D | FFF6 | 00C0 | 5F07 | 735F | 6174 | 6B63 |
| 0001444320 | 040E | FFE2 | 0081 | 5FDB | 725F | 7465 | 6176 | 0E6C |
| 0001444340 | E805 | 0943 | 9000 | 0606 | 5F5F | 7566 | 636E | 0201 |
| 0001444360 | 0118 | 9973 | 0695 | 0123 | 0016 | 0117 | 0000 | 0904 |
| 0001444400 | 7374 | 5F6C | 6261 | 726F | 0F74 | F404 | 85FF | 0900 |
| 0001444420 | 5F5F | 7862 | [illegible] | [illegible] | 0D65 | E404 | 94FF | 0703 |
| 0001444440 | 5F5F | 7270 | [illegible] | [illegible] | [illegible] | 02FF | 0502 | 5F5F |
| 0001444460 | 766C | [illegible] | [illegible] | [illegible] | 0706 | 5F5F | 6C63 | 636F |
| 0001444500 | 0D6B | [illegible] | [illegible] | [illegible] | 5F5F | 7473 | 6361 | 0E6B |
| 0001444520 | [illegible] | [illegible] | [illegible] | [illegible] | [illegible] | 7674 | 6C61 | 040C |
| 0001444540 | FFFA | [illegible] | [illegible] | [illegible] | [illegible] | 0E65 | FA05 | 0943 |
| 0001444560 | [illegible] | [illegible] | [illegible] | [illegible] | [illegible] | 0201 | 011A | 9A96 |
| 0001444600 | [illegible] | [illegible] | [illegible] | [illegible] | [illegible] | 0B04 | 7374 | 5F6C |
| 0001444620 | [illegible] | [illegible] | [illegible] | [illegible] | [illegible] | C0FF | 0600 | 5F5F |
| 0001444640 | 7974 | [illegible] | [illegible] | [illegible] | [illegible] | 5F09 | 625F | 5F78 |
| 0001444660 | [illegible] | [illegible] | [illegible] | [illegible] | [illegible] | [illegible] | 705F | 6972 |
| 0001444700 | 746E | [illegible] | FFDC | 0202 | 5F05 | 6C5F | 6C76 | 040D |
| 0001444720 | FFE8 | 0692 | 5F07 | 635F | 6F6C | 6B63 | 040D | FFF6 |
| 0001444740 | 00C0 | 5F07 | 735F | 6174 | 6B63 | 040E | FFE2 | 0081 |
| 0001444760 | 5F08 | 725F | 7465 | 6176 | 0E6C | 0C05 | 0944 | 9000 |
| 0001445000 | 0606 | 5F5F | 7566 | 636E | 0201 | 011F | [illegible] | 0698 |
| 0001445020 | 011E | 0016 | 0112 | 0000 | 1004 | 7374 | [illegible] | 7573 |
| 0001445040 | 7073 | 6E65 | 5F64 | 7865 | 6365 | 040C | [illegible] | 00C0 |
| 0001445060 | 5F06 | 745F | 7079 | 0F65 | F404 | 85FF | [illegible] | 5F5F |
| 0001445100 | 7862 | 745F | 7079 | 0D65 | E404 | 94FF | 0703 | 5F5F |
| 0001445120 | 7270 | 6E69 | 0B74 | DC04 | 02FF | 0502 | 5F5F | 766C |
| 0001445140 | 0D6C | E804 | 92FF | 0706 | 5F5F | 6C63 | 636F | 0D6B |
| 0001445160 | F604 | C0FF | 0700 | 5F5F | 7473 | 6361 | 0E6B | E204 |
| 0001445200 | 81FF | 0800 | 5F5F | 6572 | 7674 | 6C61 | 050E | 441F |
| 0001445220 | 0009 | 069A | 5F06 | 665F | 6E75 | 0163 | 1E02 | DC01 |
| 0001445240 | 9B9C | 2406 | 1006 | 1900 | 0006 | 0400 | 740F | 6C73 |
| 0001445260 | 635F | 6568 | 6B63 | 735F | 6174 | 6574 | 040C | FFFA |
| 0001445300 | 00C0 | 5F06 | 745F | 7079 | 0F65 | F404 | 85FF | 0900 |
| 0001445320 | 5F5F | 7862 | 745F | 7079 | 0D65 | E404 | 94FF | 0703 |
| 0001445340 | 5F5F | 7270 | 6E69 | 0B74 | DC04 | 02FF | 0502 | 5F5F |
| 0001445360 | 766C | 0D6C | E804 | 92FF | 0706 | 5F5F | 6C63 | 636F |
| 0001445400 | 0D6B | F604 | C0FF | 0700 | 5F5F | 7473 | 6361 | 0E6B |
| 0001445420 | E204 | 81FF | 0800 | 5F5F | 6572 | 7674 | 6C61 | 050E |
| 0001445440 | 44F2 | 0009 | 069D | 5F06 | 665F | 6E75 | 1963 | 0205 |
| 0001445460 | 0945 | 8100 | 1100 | 6261 | 726F | 5F74 | 6877 | 6C69 |
| 0001445500 | 5F65 | 6C73 | 6565 | 0170 | 1E02 | 0001 | A4A3 | 8606 |

THU MAR 14 17:52:34 1991 TSLINT.DLL PAGE 361, LINE 21241

| | | | | | | | | |
|---|---|---|---|---|---|---|---|---|
| 0001445520 | 1002 | 7B00 | 0002 | 0400 | 740F | 6C73 | 635F | 6568 |
| 0001445540 | 6B63 | 645F | 6265 | 6775 | 040A | 0006 | 060F | 7404 |
| 0001445560 | 6572 | 0F65 | F404 | 85FF | 0900 | 5F5F | 7862 | 745F |
| 0001445600 | 7079 | 0D65 | E404 | 94FF | 0703 | 5F5F | 7270 | 6E69 |
| 0001445620 | 0B74 | DC04 | 02FF | 0502 | 5F5F | 766C | 0D6C | E804 |
| 0001445640 | 92FF | 0706 | 5F5F | 6C63 | 636F | 0D6B | F604 | C0FF |
| 0001445660 | 0700 | 5F5F | 7473 | 6361 | 0E6B | E204 | 81FF | 0800 |
| 0001445700 | 5F5F | 6572 | 7674 | 6C61 | 040C | FFFA | 00C0 | 5F06 |
| 0001445720 | 745F | 7079 | 0E65 | 6805 | 0945 | 9D00 | 0606 | 5F5F |
| 0001445740 | 7566 | 636E | 0201 | 011D | A586 | 06A8 | 0360 | 0010 |
| 0001445760 | 0355 | 0000 | 0E04 | 7374 | 5F6C | 7473 | 7065 | 625F |
| 0001446000 | [illegible] | 6B61 | 040A | 0006 | 060F | 7404 | 6572 | 0C65 |
| 0001446020 | FA04 | C0FF | 0600 | 5F5F | 7974 | 6570 | 040F | FFF4 |
| 0001446040 | 0085 | 5F09 | 625F | 5F78 | 7974 | 6570 | 040D | FFE4 |
| 0001446060 | 0394 | 5F07 | 705F | 6972 | 746E | 040B | FFDC | 0202 |
| 0001446100 | 5F05 | 6C5F | 6C76 | 040D | FFE8 | 0692 | 5F07 | 635F |
| 0001446120 | 6F6C | 6B63 | 040D | FFF6 | 00C0 | 5F07 | 735F | 6174 |
| 0001446140 | 6B63 | 040E | FFE2 | 0085 | 5F08 | 725F | 7465 | 6176 |
| 0001446160 | 0E6C | A605 | 0945 | AA00 | 0606 | 5F5F | 7566 | 636E |
| 0001446200 | 0201 | 011A | A8E6 | 06AD | 0121 | 0010 | 0116 | 0000 |
| 0001446220 | 0B04 | 7374 | 5F6C | 6F6C | 676E | 6D6A | 0C70 | FA04 |
| 0001446240 | C0FF | 0600 | 5F5F | 7974 | 6570 | 040F | FFF4 | 0085 |
| 0001446260 | 5F09 | 625F | 5F78 | 7974 | 6570 | 040D | FFE4 | 0394 |
| 0001446300 | 5F07 | 705F | 6972 | 746E | 040B | FFDC | 0202 | 5F05 |
| 0001446320 | 6C5F | 6C76 | 040D | FFE8 | 0692 | 5F07 | 635F | 6F6C |
| 0001446340 | 6B63 | 040D | FFF6 | 00C0 | 5F07 | 735F | 6174 | 6B63 |
| 0001446360 | 040E | FFE2 | 0081 | 5F08 | 725F | 7465 | 6176 | 0E6C |
| 0001446400 | BE05 | 0945 | AA00 | 0602 | 5F5F | 7566 | 636E | 0201 |
| 0001446420 | 011F | AA07 | 06AF | 003C | 0010 | 0031 | 0000 | 1004 |
| 0001446440 | 7374 | 5F6C | 6F6E | 6D72 | 6C61 | 735F | 6174 | 6574 |
| 0001446460 | 0201 | 011C | AA43 | 06B0 | 003C | 0010 | 0031 | 0000 |
| 0001446500 | 0D04 | 7374 | 5F6C | 7572 | 5F6E | 7473 | 7461 | 0165 |
| 0001446520 | 1B02 | 7F01 | B1AA | 3606 | 1000 | 2B00 | 0000 | 0400 |
| 0001446540 | 740C | 6C73 | 6A5F | 6D75 | 6270 | 6361 | 016B | 2602 |
| 0001446560 | B501 | B2AA | 2606 | 1001 | 1B00 | 0001 | 0400 | 7417 |
| 0001446600 | 6C73 | 725F | 7365 | 6174 | 7472 | 695F | 746E | 7265 |
| 0001446620 | 7270 | 7465 | 7265 | 040C | FFFA | 00C0 | 5F06 | 745F |
| 0001446640 | 7079 | 0F65 | F404 | 85FF | 0900 | 5F5F | 7862 | 745F |
| 0001446660 | 7079 | 0D65 | E404 | 94FF | 0703 | 5F5F | 7270 | 6E69 |
| 0001446700 | 0B74 | DC04 | 02FF | 0502 | 5F5F | 766C | 0D6C | E804 |
| 0001446720 | 92FF | 0706 | 5F5F | 6C63 | 636F | 0D6B | F604 | C0FF |
| 0001446740 | 0700 | 5F5F | 7473 | 6361 | 0E6B | E204 | 81FF | 0800 |
| 0001446760 | 5F5F | 6572 | 7674 | 6C61 | 050E | 45D2 | 0009 | 06B4 |
| 0001447000 | 5F06 | 665F | 6E75 | 0163 | 2102 | DB01 | B5AB | 6506 |
| 0001447020 | 1001 | 5A00 | 0001 | 0400 | 7412 | 6C73 | 685F | 6E61 |
| 0001447040 | 6C64 | 5F65 | 6964 | 7073 | 616C | 0D79 | E804 | 92FF |
| 0001447060 | 0706 | 5F5F | 6C63 | 636F | 0D6B | F604 | C0FF | 0700 |
| 0001447100 | 5F5F | 7473 | 6361 | 0E6B | E204 | 81FF | 0800 | 5F5F |
| 0001447120 | 6572 | 7674 | 6C61 | 040C | FFFA | 00C0 | 5F06 | 745F |
| 0001447140 | 7079 | 0F65 | F404 | 85FF | 0900 | 5F5F | 7862 | 745F |
| 0001447160 | 7079 | 0D65 | E404 | 94FF | 0703 | 5F5F | 7270 | 6E69 |
| 0001447200 | 0B74 | DC04 | 02FF | 0502 | 5F5F | 766C | 0E6C | F205 |
| 0001447220 | 0945 | B700 | 0606 | 5F5F | 7566 | 636E | 0201 | 0511 |
| 0001447240 | 0A9E | 0008 | 0081 | 6309 | 7275 | 675F | 636F | 646D |
| 0001447260 | 0514 | 43E4 | 0009 | 0081 | 730C | 7375 | 6570 | 646E |
| 0001447300 | 665F | 616C | 0567 | 000D | 1A00 | 1200 | 4605 | 0938 |
| 0001447320 | 8100 | 0A00 | 6F73 | 7275 | 6563 | 696C | 656E | 050F |
| 0001447340 | 43DC | 0009 | 00C0 | 4207 | 785F | 6946 | 656C | 050F |
| 0001447360 | 43E0 | 0009 | 00C0 | 4207 | 785F | 6150 | 6B63 | 050F |

THU MAR 14 17:52:34 1991 TSLINT.DLL PAGE 362, LINE 21300

| | | | | | | | | |
|---|---|---|---|---|---|---|---|---|
| 0001447400 | 0084 | 0008 | 0085 | 7407 | 6C73 | 745F | 6469 | 0516 |
| 0001447420 | 384C | 0009 | 0085 | 740E | 6C73 | 615F | 6F62 | 7472 |
| 0001447440 | 665F | 616C | 1867 | 5005 | 0938 | 8500 | 1000 | 7374 |
| 0001447460 | 5F6C | 6572 | 7473 | 7261 | 5F74 | 6C66 | 6761 | 0519 |
| 0001447500 | 3852 | 0009 | 0085 | 7411 | 6C73 | 695F | 706E | 7475 |
| 0001447520 | 615F | 6F62 | 7472 | 6465 | 051E | 3854 | 0009 | 0085 |
| 0001447540 | 7416 | 6C73 | 735F | 7274 | 6E69 | 5F67 | 7274 | 6E61 |
| 0001447560 | 6C73 | 7461 | 6F69 | 116E | E605 | 0943 | 8100 | 0900 |
| 0001447600 | 7374 | 5F6C | 7473 | 7461 | 1165 | 8805 | 080A | 8400 |
| 0001447620 | 0906 | 6261 | 726F | 5F74 | 6174 | 1467 | 0005 | 0000 |
| 0001447640 | C000 | 0C00 | 7842 | 615F | 7373 | 7265 | 6D74 | 6773 |
| 0001447660 | 0513 | 0004 | 0008 | 0684 | 720B | 7365 | 6174 | 7472 |
| 0001447700 | 745F | 6761 | 0514 | 0000 | 0000 | 0081 | 420C | 5F78 |
| 0001447720 | 6544 | 7562 | 4D67 | 646F | 1465 | 0005 | 0000 | 8100 |
| 0001447740 | 0C00 | 7842 | 545F | 6D69 | 7365 | 6F4D | 6564 | 0514 |
| 0001447760 | 0000 | 0000 | 0081 | 420C | 5F78 | 7245 | 6F72 | 4D72 |
| 0001450000 | 646F | 1065 | 0005 | 0000 | 8100 | 0800 | 7842 | 425F |
| 0001450020 | 735F | 6769 | 1105 | 0003 | 0000 | 0118 | AD40 | 05AE |
| 0001450040 | 02A0 | 0010 | 0295 | 0000 | 0904 | 7374 | 5F6C | 7265 |
| 0001450060 | 6F72 | 0972 | 0604 | C000 | 0300 | 6D66 | 0C74 | FA04 |
| 0001450100 | C0FF | 0600 | 5F5F | 7974 | 6570 | 040F | FEF0 | 0085 |
| 0001450120 | 5F09 | 625F | 5F78 | 7974 | 6570 | 040D | FEE0 | 0202 |
| 0001450140 | 5F07 | 705F | 6972 | 746E | 040B | FED8 | 02BE | 5F05 |
| 0001450160 | 6C5F | 6C76 | 040D | FEE4 | 05B2 | 5F07 | 635F | 6F6C |
| 0001450200 | 6B63 | 040D | FEF2 | 00C0 | 5F07 | 735F | 6174 | 6B63 |
| 0001450220 | 040E | FEDE | 0081 | 5F08 | 725F | 7465 | 6176 | 086C |
| 0001450240 | F604 | C0FF | 0200 | 7061 | 0409 | FED4 | 00C0 | 7003 |
| 0001450260 | 7274 | 0409 | FED0 | 00C0 | 6203 | 6765 | 040C | FEF6 |
| 0001450300 | 0599 | 6D06 | 6773 | 7562 | 0E66 | 4605 | 0946 | B000 |
| 0001450320 | 0605 | 5F5F | 7566 | 636E | 0201 | 011D | AFE0 | 05B6 |
| 0001450340 | 0123 | 0010 | 0118 | 0000 | 0E04 | 7374 | 5F6C | 7265 |
| 0001450360 | 6F72 | 5F72 | 6F63 | 6564 | 040C | 0006 | 0081 | 7306 |
| 0001450400 | 6174 | 7574 | 0C73 | FA04 | C0FF | 0600 | 5F5F | 7974 |
| 0001450420 | 6570 | 040F | FFF4 | 0085 | 5F09 | 625F | 5F78 | 7974 |
| 0001450440 | 6570 | 040D | FFE4 | 0202 | 5F07 | 705F | 6972 | 746E |
| 0001450460 | 040B | FFDC | 02BE | 5F05 | 6C5F | 6C76 | 040D | FFE8 |
| 0001450500 | 05B2 | 5F07 | 635F | 6F6C | 6B63 | 040D | FFF6 | 00C0 |
| 0001450520 | 5F07 | 735F | 6174 | 6B63 | 040E | FFE2 | 0081 | 5F08 |
| 0001450540 | 725F | 7465 | 6176 | 0E6C | 5805 | 0946 | B800 | 0605 |
| 0001450560 | 5F5F | 7566 | 636E | 0201 | 0116 | B103 | 05BA | 0147 |
| 0001450600 | 0010 | 013C | 0000 | 0704 | 7374 | 5F6C | 736D | 0967 |
| 0001450620 | 0604 | C000 | 0300 | 6D66 | 0C74 | FA04 | C0FF | 0600 |
| 0001450640 | 5F5F | 7974 | 6570 | 040F | FFF0 | 0085 | 5F09 | 625F |
| 0001450660 | 5F78 | 7974 | 6570 | 040D | FFE0 | 0202 | 5F07 | 705F |
| 0001450700 | 6972 | 746E | 040B | FFD8 | 02BE | 5F05 | 6C5F | 6C76 |
| 0001450720 | 040D | FFE4 | 05B2 | 5F07 | 635F | 6F6C | 6B63 | 040D |
| 0001450740 | FFF2 | 00C0 | 5F07 | 735F | 6174 | 6B63 | 040E | FFDE |
| 0001450760 | 0081 | 5F08 | 725F | 7465 | 6176 | 086C | F604 | C0FF |
| 0001451000 | 0200 | 7061 | 0409 | FED8 | 0599 | 6203 | 6675 | 050E |
| 0001451020 | 4670 | 0009 | 05BC | 5F06 | 665F | 6E75 | 0163 | 1602 |
| 0001451040 | 4A01 | BEB2 | 6C05 | 1001 | 6100 | 0001 | 0400 | 7707 |
| 0001451060 | 7261 | 696E | 676E | 0409 | 0006 | 00C0 | 6603 | 746D |
| 0001451100 | 040C | FFFA | 00C0 | 5F06 | 745F | 7079 | 0F65 | F004 |
| 0001451120 | 85FE | 0900 | 5F5F | 7862 | 745F | 7079 | 0D65 | E004 |
| 0001451140 | 02FE | 0702 | 5F5F | 7270 | 6E69 | 0B74 | D804 | BEFE |
| 0001451160 | 0502 | 5F5F | 766C | 0D6C | E404 | B2FE | 0705 | 5F5F |
| 0001451200 | 6C63 | 636F | 0D6B | F204 | C0FF | 0700 | 5F5F | 7473 |
| 0001451220 | 6361 | 0E6B | DE04 | 81FE | 0800 | 5F5F | 6572 | 7674 |
| 0001451240 | 6C61 | 0408 | FFF6 | 00C0 | 6102 | 0970 | D804 | 99FD |

THU MAR 14 17:52:34 1991 TSLINT.DLL PAGE 363, LINE 21359

| | | | | | | | | |
|---|---|---|---|---|---|---|---|---|
| 0001451260 | 0305 | 7562 | 0A66 | F204 | 99FE | 0405 | 6177 | 6E72 |
| 0001451300 | 050E | 468C | 0009 | 05BC | 5F06 | 665F | 6E75 | 0163 |
| 0001451320 | 1402 | B601 | C1B3 | 6C05 | 1001 | 6100 | 0001 | 0400 |
| 0001451340 | 6605 | 7461 | 6C61 | 0409 | 0006 | 00C0 | 6603 | 746D |
| 0001451360 | 040C | FFFA | 00C0 | 5F06 | 745F | 7079 | 0F65 | F004 |
| 0001451400 | 85FF | 0900 | 5F5F | 7862 | 745F | 7079 | 0D65 | E004 |
| 0001451420 | 02FF | 0702 | 5F5F | 7270 | 6E69 | 0B74 | D804 | BEFE |
| 0001451440 | 0502 | 5F5F | 766C | 0D6C | E404 | B2FF | 0705 | 5F5F |
| 0001451460 | 6C63 | 636F | 0D6B | F204 | C0FF | 0700 | 5F5F | 7473 |
| 0001451500 | 6361 | 0E6B | DE04 | 81FE | 0800 | 5F5F | 6572 | 7674 |
| 0001451520 | 6C61 | 0408 | FFF6 | 00C0 | 6102 | 0970 | D804 | 99FD |
| 0001451540 | 0305 | 7562 | 0A66 | E004 | 99FE | 0405 | 656D | 6773 |
| 0001451560 | 050E | 46A8 | 0009 | 05C2 | 5F06 | 665F | 6E75 | 0163 |
| 0001451600 | 1A02 | 2201 | C4B5 | 2B05 | 1001 | 2000 | 0001 | 0400 |
| 0001451620 | 740B | 6C73 | 795F | 6579 | 7272 | 726F | 0407 | 0006 |
| 0001451640 | 00C0 | 7301 | 040C | FFFA | 00C0 | 5F06 | 745F | 7079 |
| 0001451660 | 0F65 | F404 | 85FF | 0900 | 5F5F | 7862 | 745F | 7079 |
| 0001451700 | 0D65 | E404 | 02FF | 0702 | 5F5F | 7270 | 6E69 | 0B74 |
| 0001451720 | DC04 | BEFF | 0502 | 5F5F | 766C | 0D6C | E804 | B2FF |
| 0001451740 | 0705 | 5F5F | 6C63 | 636F | 0D6B | F604 | C0FF | 0700 |
| 0001451760 | 5F5F | 7473 | 6361 | 0E6B | E204 | 81FF | 0800 | 5F5F |
| 0001452000 | 6572 | 7674 | 6C61 | 050E | 46B6 | 0009 | 033E | 5F06 |
| 0001452020 | 665F | 6E75 | 0163 | 0502 | 000D | 1A00 | 0E00 | A405 |
| 0001452040 | 080A | C000 | 0600 | 656C | 7078 | 7274 | 0514 | 0C8E |
| 0001452060 | 0008 | 00C0 | 6C0C | 7865 | 7470 | 5F72 | 6562 | 6967 |
| 0001452100 | 0F6E | 3C05 | 0946 | C000 | 0700 | 5F42 | 4678 | 6C69 |
| 0001452120 | 0F65 | 4005 | 0946 | C000 | 0700 | 5F42 | 5078 | 6361 |
| 0001452140 | 146B | 4405 | 0937 | 9900 | 0C05 | 7374 | 5F6C | 7563 |
| 0001452160 | 7272 | 6966 | 656C | 0512 | 3844 | 0009 | 0081 | 740A |
| 0001452200 | 6C73 | 6C5F | 6E69 | 6E65 | 106F | 4405 | 0946 | 8100 |
| 0001452220 | 0800 | 7265 | 6372 | 756F | 746E | 0514 | 0000 | 0000 |
| 0001452240 | 0081 | 420C | 5F78 | 6544 | 7562 | 4D67 | 646F | 1465 |
| 0001452260 | 0005 | 0000 | 8100 | 0C00 | 7842 | 545F | 6D69 | 7365 |
| 0001452300 | 6F4D | 6564 | 1105 | 0003 | 0000 | 011B | B64E | 0483 |
| 0001452320 | 0497 | 0010 | 048C | 0000 | 0C04 | 7374 | 5F6C | 6567 |
| 0001452340 | 5F74 | 6574 | 7473 | 040F | 0006 | 00C0 | 7409 | 7365 |
| 0001452360 | 5F74 | 616E | 656D | 0411 | 000A | 02CD | 740B | 7365 |
| 0001452400 | 5F74 | 6168 | 646E | 656C | 040C | FFFA | 00C0 | 5F06 |
| 0001452420 | 745F | 7079 | 0F65 | F004 | 85FF | 0900 | 5F5F | 7862 |
| 0001452440 | 745F | 7079 | 0D65 | E004 | 87FF | 0704 | 5F5F | 7270 |
| 0001452460 | 6E69 | 0B74 | D204 | CFFF | 0503 | 5F5F | 766C | 0D6C |
| 0001452500 | E404 | 89FF | 0704 | 5F5F | 6C63 | 636F | 0D6B | F204 |
| 0001452520 | C0FF | 0700 | 5F5F | 7473 | 6361 | 0E6B | D804 | 81FF |
| 0001452540 | 0800 | 5F5F | 6572 | 7674 | 6C61 | 040A | FFDA | 0081 |
| 0001452560 | 7304 | 6174 | 0B74 | D004 | 81FF | 0500 | 7473 | 7461 |
| 0001452600 | 0D31 | DC04 | 86FF | 0700 | 6574 | 7473 | 695F | 0F64 |
| 0001452620 | F604 | C0FF | 0900 | 7566 | 6C6C | 6E5F | 6D61 | 0E65 |
| 0001452640 | 0005 | 0947 | 2700 | 0602 | 5F5F | 7566 | 636E | 0201 |
| 0001452660 | 011D | BAE5 | 048C | 0200 | 0010 | 01F5 | 0000 | 0E04 |
| 0001452700 | 7374 | 5F6C | 6567 | 5F74 | 7562 | 6666 | 7265 | 040F |
| 0001452720 | 0006 | 00C0 | 7409 | 7365 | 5F74 | 616E | 656D | 040D |
| 0001452740 | 000A | 0086 | 7407 | 7365 | 5F74 | 6469 | 040C | FFFA |
| 0001452760 | 00C0 | 5F06 | 745F | 7079 | 0F65 | F204 | 85FF | 0900 |
| 0001453000 | 5F5F | 7862 | 745F | 7079 | 0D65 | E204 | 87FF | 0704 |
| 0001453020 | 5F5F | 7270 | 6E69 | 0B74 | D804 | CFFF | 0503 | 5F5F |
| 0001453040 | 766C | 0D6C | E604 | 89FF | 0704 | 5F5F | 6C63 | 636F |
| 0001453060 | 0D6B | F604 | C0FF | 0700 | 5F5F | 7473 | 6361 | 0E6B |
| 0001453100 | DE04 | 81FF | 0800 | 5F5F | 6572 | 7674 | 6C61 | 040A |
| 0001453120 | FFE0 | 0081 | 7304 | 6174 | 0C74 | F404 | 85FF | 0600 |

BEST AVAILABLE COPY

THU MAR 14 17:52:34 1991 TSLINT.DLL PAGE 364, LINE 21418

| | | | | | | | | |
|---|---|---|---|---|---|---|---|---|
| 0001453140 | 7562 | 5F66 | 6F6E | 050E | 471C | 0009 | 048E | 5F06 |
| 0001453160 | 665F | 6E75 | 0163 | 2002 | E501 | 90BC | 2B04 | 1000 |
| 0001453200 | 2000 | 0000 | 0400 | 7411 | 6C73 | 675F | 7465 | 705F |
| 0001453220 | 7261 | 6D61 | 635F | 746E | 0411 | 0006 | 00C0 | 740B |
| 0001453240 | 7365 | 5F74 | 6168 | 646E | 656C | 0201 | 0121 | BD10 |
| 0001453260 | 0492 | 0034 | 0010 | 0029 | 0000 | 1204 | 7374 | 5F6C |
| 0001453300 | 6567 | 5F74 | 6170 | 6172 | 5F6D | 616E | 656D | 0411 |
| 0001453320 | 0006 | 00C0 | 740B | 7365 | 5F74 | 6168 | 646E | 656C |
| 0001453340 | 0407 | 000A | 0085 | 6E01 | 0201 | 011F | BD44 | 0494 |
| 0001453360 | 0323 | 0010 | 0318 | 0000 | 1004 | 7374 | 5F6C | 6572 |
| 0001453400 | 7473 | 726F | 5F65 | 6574 | 7473 | 040F | 0006 | 00C0 |
| 0001453420 | 7409 | 7365 | 5F74 | 616E | 656D | 040C | FFFA | 00C0 |
| 0001453440 | 5F06 | 745F | 7079 | 0F65 | F404 | 85FF | 0900 | 5F5F |
| 0001453460 | 7862 | 745F | 7079 | 0D65 | E004 | 87FF | 0704 | 5F5F |
| 0001453500 | 7270 | 6E69 | 0B74 | D604 | CFFF | 0503 | 5F5F | 766C |
| 0001453520 | 0D6C | E804 | 89FF | 0704 | 5F5F | 6C63 | 636F | 0D6B |
| 0001453540 | F604 | C0FF | 0700 | 5F5F | 7473 | 6361 | 0E6B | DC04 |
| 0001453560 | 81FF | 0800 | 5F5F | 6572 | 7674 | 6C61 | 040A | FFE4 |
| 0001453600 | 0460 | 6104 | 7474 | 0A72 | DE04 | 81FF | 0400 | 7473 |
| 0001453620 | 7461 | 050E | 4752 | 0009 | 0496 | 5F06 | 665F | 6E75 |
| 0001453640 | 0163 | 0502 | 000D | 1A00 | 0F00 | F805 | 0946 | C000 |
| 0001453660 | 0700 | 5F42 | 4678 | 6C69 | 0F65 | FC05 | 0946 | C000 |
| 0001453700 | 0700 | 5F42 | [illegible] | [illegible] | 146B | 0005 | 0000 | 8100 |
| 0001453720 | 0C00 | 7842 | [illegible] | [illegible] | 4775 | 6F4D | 6564 | 0514 |
| 0001453740 | 0000 | 0000 | [illegible] | [illegible] | 5F78 | 6954 | 656D | 4D73 |
| 0001453760 | 646F | [illegible] | [illegible] | [illegible] | [illegible] | 0800 | 7842 | 425F |
| 0001454000 | 735F | [illegible] | [illegible] | [illegible] | [illegible] | 0118 | C068 | 05C8 |
| 0001454020 | 0FA3 | [illegible] | [illegible] | [illegible] | [illegible] | 6574 | 7473 | 635F |
| 0001454040 | 6C61 | [illegible] | [illegible] | [illegible] | [illegible] | 616E | 656D | 040E |
| 0001454060 | [illegible] | [illegible] | [illegible] | [illegible] | [illegible] | 7369 | 1474 | 7204 |
| 0001454100 | [illegible] | [illegible] | [illegible] | [illegible] | [illegible] | 6761 | 735F | 6174 |
| 0001454120 | [illegible] | [illegible] | [illegible] | [illegible] | [illegible] | 6F6F | 5F70 | 6173 |
| 0001454140 | [illegible] | [illegible] | [illegible] | [illegible] | [illegible] | FFCE | 0081 | 6110 |
| 0001454160 | [illegible] | [illegible] | [illegible] | [illegible] | [illegible] | 6176 | 696C | 1564 |
| 0001454200 | B004 | [illegible] | [illegible] | 7566 | 636E | 735F | 7661 | 5F65 |
| 0001454220 | 6176 | [illegible] | 1464 | D004 | DCFF | 0ED5 | 6572 | 5F74 |
| 0001454240 | 6F6E | 6564 | 735F | 6174 | 6B63 | 0411 | FFFA | 0515 |
| 0001454260 | 6C0B | 636F | 6C61 | [illegible] | 6174 | 6B63 | 0408 | FFDE |
| 0001454300 | 0515 | 7302 | 0B70 | [illegible] | 81FF | 0500 | 6F63 | 6E75 |
| 0001454320 | 1574 | C804 | 81FF | [illegible] | 6173 | 6576 | 735F | 756F |
| 0001454340 | 6372 | 6C65 | 6E69 | [illegible] | 5C04 | C0FF | 0B00 | 6173 |
| 0001454360 | 6576 | 735F | 756F | [illegible] | 1265 | 6004 | 81FF | 0C00 |
| 0001454400 | 6173 | 6576 | 655F | [illegible] | 6964 | 7073 | 0412 | FFCA |
| 0001454420 | 0081 | 730C | 7661 | 5F65 | 6D65 | 6C5F | 6E69 | 1265 |
| 0001454440 | D404 | 81FF | 0C00 | 6173 | 6576 | 635F | 5F6D | 696C |
| 0001454460 | 656E | 0414 | FFE2 | 0081 | 730E | 7661 | 5F65 | 6F6C |
| 0001454500 | 6B63 | 735F | 6174 | 1074 | 6204 | 81FF | 0A00 | 6163 |
| 0001454520 | 6C6C | 7265 | 625F | 6675 | 040F | FFCC | 0081 | 7309 |
| 0001454540 | 6574 | 5F70 | 766F | 7265 | 040C | FFDC | 0081 | 7306 |
| 0001454560 | 6174 | 7574 | 0873 | D604 | 81FF | 0200 | 6372 | 0411 |
| 0001454600 | FF8C | 00C0 | 740B | 7365 | 5F74 | 6168 | 646E | 656C |
| 0001454620 | 040B | FF84 | 050C | 7005 | 696C | 7473 | 040C | FFE4 |
| 0001454640 | 00C0 | 5F06 | 745F | 7079 | 0F65 | AE04 | 85FF | 0900 |
| 0001454660 | 5F5F | 7862 | 745F | 7079 | 0D65 | 8804 | 6DFF | 0703 |
| 0001454700 | 5F5F | 7270 | 6E69 | 0B74 | 6804 | A0FF | 0505 | 5F5F |
| 0001454720 | 766C | 0D6C | 9004 | CCFF | 0705 | 5F5F | 6C63 | 636F |
| 0001454740 | 0D6B | D804 | C0FF | 0700 | 5F5F | 7473 | 6361 | 0E6B |
| 0001454760 | 6E04 | 0CFF | 0805 | 5F5F | 6572 | 7674 | 6C61 | 0409 |
| 0001455000 | FF58 | 050C | 6103 | 6772 | 040A | FF54 | 050C | 6104 |

THU MAR 14 17:52:34 1991 TSLINT.DLL PAGE 365, LINE 21477

| | | | | | | | | |
|---|---|---|---|---|---|---|---|---|
| 0001455020 | 6772 | 0770 | 5004 | 0CFF | 0105 | 0772 | 6404 | 0CFF |
| 0001455040 | 0105 | 146E | E804 | 86FF | 0E05 | 6574 | 7473 | 745F |
| 0001455060 | 6761 | 735F | 6174 | 6B63 | 0414 | FF9C | 0586 | 6C0E |
| 0001455100 | 6F6F | 5F70 | 6174 | 5F67 | 7473 | 6361 | 156B | B404 |
| 0001455120 | 86FF | 0F05 | 6261 | 726F | 5F74 | 6174 | 5F67 | 7473 |
| 0001455140 | 6361 | 0E6B | 0605 | 094A | CA00 | 0605 | 5F5F | 7566 |
| 0001455160 | 636E | 0005 | CEC1 | 0087 | 040A | FF4E | 0085 | 5F04 |
| 0001455200 | 735F | 017A | 0102 | 2702 | 0B01 | DDD0 | 4B05 | 1002 |
| 0001455220 | 4000 | 0002 | 0400 | 7418 | 6C73 | 6D5F | 6B61 | 5F65 |
| 0001455240 | 6574 | 7473 | 705F | 7261 | 6D61 | 6C5F | 7369 | 0874 |
| 0001455260 | 0604 | C000 | 0200 | 6874 | 040D | FFDE | 05CC | 5F07 |
| 0001455300 | 635F | 6F6C | 6B63 | 040D | FFEE | 00C0 | 5F07 | 735F |
| 0001455320 | 6174 | 6B63 | 040E | FFD2 | 050C | 5F08 | 725F | 7465 |
| 0001455340 | 6176 | 086C | CA04 | 85FF | 0200 | 706E | 0407 | FFEC |
| 0001455360 | 0081 | 6901 | 0407 | FFFA | 050C | 7001 | 0407 | FFF2 |
| 0001455400 | 050C | 7101 | 040A | FFD6 | 050C | 6C04 | 7369 | 0C74 |
| 0001455420 | F604 | C0FF | 0600 | 5F5F | 7974 | 6570 | 040F | FFEA |
| 0001455440 | 0085 | 5F09 | 625F | 5F78 | 7974 | 6570 | 040D | FFDA |
| 0001455460 | 036D | 5F07 | 705F | 6972 | 746E | 040B | FFCC | 05A0 |
| 0001455500 | 5F05 | 6C5F | 6C76 | 050E | 4A1E | 0009 | 05DF | 5F06 |
| 0001455520 | 665F | 6E75 | 0163 | 1D02 | 5601 | E1D2 | 8405 | 1002 |
| 0001455540 | 7900 | 0002 | 0400 | 740E | 6C73 | 6D5F | 6B61 | 5F65 |
| 0001455560 | 6170 | 6172 | 086D | 0604 | C000 | 0200 | 6874 | 0407 |
| 0001455600 | 000A | 0081 | 6901 | 040C | FFFA | 00C0 | 5F06 | 745F |
| 0001455620 | 7079 | 0F65 | E804 | 85FF | 0900 | 5F5F | 7862 | 745F |
| 0001455640 | 7079 | 0D65 | D804 | 6DFF | 0703 | 5F5F | 7270 | 6E69 |
| 0001455660 | 0B74 | CE04 | [illegible] | 0505 | 5F5F | 766C | 0D6C | DC04 |
| 0001455700 | CCFF | 0705 | 5F5F | 6C63 | 636F | 0D6B | EA04 | C0FF |
| 0001455720 | 0700 | 5F5F | 7473 | 6361 | 0E6B | D404 | 0CFF | 0805 |
| 0001455740 | 5F5F | 6572 | 7674 | 6C61 | 0407 | FFEE | 00C0 | 7401 |
| 0001455760 | 040B | FFF6 | 00C0 | 7005 | 616E | 656D | 0407 | FFF2 |
| 0001456000 | 050C | 7201 | 050E | 4A84 | 0009 | 05E2 | 5F06 | 665F |
| 0001456020 | 6E75 | 0163 | 2302 | DA01 | E4D4 | 1B05 | 1000 | 1000 |
| 0001456040 | 0000 | 0400 | 7414 | 6C73 | 705F | 6972 | 746E | 705F |
| 0001456060 | 7261 | 6D61 | 6C5F | 7369 | 0174 | 1002 | 3805 | 0800 |
| 0001456100 | 8600 | 0805 | 6574 | 7473 | 745F | 6761 | 0516 | 3858 |
| 0001456120 | 0009 | 0081 | 740E | 7365 | 5F74 | 6174 | 5F67 | 6176 |
| 0001456140 | 696C | 1164 | 8805 | 080A | 8600 | 0905 | 6261 | 726F |
| 0001456160 | 5F74 | 6174 | 1767 | 5A05 | 0938 | 8100 | 0F00 | 6261 |
| 0001456200 | 726F | 5F74 | 6174 | 5F67 | 6176 | 696C | 0564 | 000D |
| 0001456220 | 1A00 | 1000 | 5405 | 0800 | 8600 | 0805 | 7566 | 636E |
| 0001456240 | 745F | 6761 | 0516 | 385C | 0009 | 0081 | 660E | 6E75 |
| 0001456260 | 5F63 | 6174 | 5F67 | 6176 | 696C | 1064 | 6605 | 0800 |
| 0001456300 | 8600 | 0805 | 6F6C | 706F | 745F | 6761 | 0516 | 385E |
| 0001456320 | 0009 | 0081 | 6C0E | 6F6F | 5F70 | 6174 | 5F67 | 6176 |
| 0001456340 | 696C | 1364 | 7005 | 0926 | 8400 | 0B00 | 7374 | 5F6C |
| 0001456360 | 656D | 746D | 7079 | 0A65 | B005 | 080A | 0C00 | 0205 |
| 0001456400 | 745F | 050F | 0A84 | 0008 | 050C | 5F07 | 6572 | 7573 |
| 0001456420 | 746C | 050D | 0AA0 | 0008 | 050C | 6405 | 7265 | 6665 |
| 0001456440 | 0510 | 0C5E | 0008 | 050C | 7208 | 7465 | 6E5F | 646F |
| 0001456460 | 0F65 | FE05 | 0949 | C000 | 0700 | 5F42 | 4678 | 6C69 |
| 0001456500 | 0F65 | 0205 | 094A | C000 | 0700 | 5F42 | 5078 | 6361 |
| 0001456520 | 146B | 0005 | 0000 | C000 | 0C00 | 7842 | 615F | 7373 |
| 0001456540 | 7265 | 6D74 | 6773 | 0511 | 0A9E | 0008 | 0081 | 6309 |
| 0001456560 | 7275 | 675F | 636F | 646D | 0514 | 373A | 0009 | 050C |
| 0001456600 | 4E0C | 756E | 6C6C | 735F | 7274 | 6E69 | 1467 | E405 |
| 0001456620 | 0943 | 8100 | 0C00 | 7573 | 7073 | 6E65 | 5F64 | 6C66 |
| 0001456640 | 6761 | 0514 | 0000 | 0000 | 0081 | 420C | 5F78 | 6544 |
| 0001456660 | 7562 | 4D67 | 646F | 1465 | 0005 | 0000 | 8100 | 0C00 |

THU MAR 14 17:52:34 1991 TSLINT.DLL PAGE 366, LINE 21536

| | | | | | | | | |
|---|---|---|---|---|---|---|---|---|
| 0001456700 | 7842 | 545F | 6D69 | 7365 | 6F4D | 6564 | 0514 | 0000 |
| 0001456720 | 0000 | 0081 | 420C | 5F78 | 7245 | 6F72 | 4D72 | 646F |
| 0001456740 | 1065 | 0005 | 0000 | 8100 | 0800 | 7842 | 425F | 735F |
| 0001456760 | 6769 | 0511 | 0856 | 0008 | 0515 | 7309 | 6174 | 6B63 |
| 0001457000 | 705F | 7274 | 0512 | 3846 | 0009 | 0081 | 730A | 756F |
| 0001457020 | 6372 | 6C65 | 6E69 | 0E65 | 4805 | 0938 | C000 | 0600 |
| 0001457040 | 6F73 | 7275 | 6563 | 0515 | 0052 | 0008 | 0081 | 700D |
| 0001457060 | 7261 | 6D61 | 635F | 756F | 746E | 7265 | 0518 | 3850 |
| 0001457100 | 0009 | 0085 | 7410 | 6C73 | 725F | 7365 | 6174 | 7472 |
| 0001457120 | 665F | 616C | 0567 | 0311 | 0000 | 1D00 | F601 | 4DD4 |
| 0001457140 | 4905 | 1001 | 3E00 | 0001 | 0400 | 740E | 6C73 | 635F |
| 0001457160 | 6C61 | 5F6C | 7473 | 7261 | 0A74 | 0604 | C000 | 0400 |
| 0001457200 | 6966 | 656C | 040A | 000A | 0081 | 6C04 | 6E69 | 1165 |
| 0001457220 | 0C04 | C000 | 0B00 | 6163 | 6C6C | 6465 | 745F | 7365 |
| 0001457240 | 0C74 | FA04 | C0FF | 0600 | 5F5F | 7974 | 6570 | 040F |
| 0001457260 | FFF4 | 0085 | 5F09 | 625F | 5F78 | 7974 | 6570 | 040D |
| 0001457300 | FFE4 | 0246 | 5F07 | 705F | 6972 | 746E | 040B | FFDC |
| 0001457320 | 02BE | 5F05 | 6C5F | 6C76 | 040D | FFE8 | 0551 | 5F07 |
| 0001457340 | 635F | 6F6C | 6B63 | 040D | FFF6 | 00C0 | 5F07 | 735F |
| 0001457360 | 6174 | 6B63 | 040E | FFE2 | 0081 | 5F08 | 725F | 7465 |
| 0001457400 | 6176 | 0E6C | 8205 | 094B | 4F00 | 0605 | 5F5F | 7566 |
| 0001457420 | 636E | 0201 | 0121 | D63F | 0553 | 018B | 0010 | 0180 |
| 0001457440 | 0000 | 1204 | 7374 | 5F6C | 6163 | 6C6C | 615F | 6464 |
| 0001457460 | 705F | 7261 | 6D61 | 0407 | 0006 | 00C0 | 7001 | 040C |
| 0001457500 | FFFA | 00C0 | 5F06 | 745F | 7079 | 0F65 | F404 | 85FF |
| 0001457520 | 0900 | 5F5F | 7862 | 745F | 7079 | 0D65 | E404 | 46FF |
| 0001457540 | 0702 | 5F5F | 7270 | 6E69 | 0B74 | DC04 | BEFF | 0502 |
| 0001457560 | 5F5F | 766C | 0D6C | E804 | 51FF | 0705 | 5F5F | 6C63 |
| 0001457600 | 636F | 0D6B | F604 | C0FF | 0700 | 5F5F | 7473 | 6361 |
| 0001457620 | 0E6B | E204 | 81FF | 0800 | 5F5F | 6572 | 7674 | 6C61 |
| 0001457640 | 050E | 4BB2 | 0009 | 0555 | 5F06 | 665F | 6E75 | 0163 |
| 0001457660 | 1B02 | CA01 | 59D7 | 5305 | 1002 | 4800 | 0002 | 0400 |
| 0001457700 | 740C | 6C73 | 635F | 6C61 | 5F6C | 6E65 | 0C64 | FA04 |
| 0001457720 | C0FF | 0600 | 5F5F | 7974 | 6570 | 040F | FFF0 | 0085 |
| 0001457740 | 5F09 | 625F | 5F78 | 7974 | 6570 | 040D | FFE0 | 0246 |
| 0001457760 | 5F07 | 705F | 6972 | 746E | 040B | FFD8 | 02BE | 5F05 |
| 0001460000 | 6C5F | 6C76 | 040D | FFE4 | 0551 | 5F07 | 635F | 6F6C |
| 0001460020 | 6B63 | 040D | FFF2 | 00C0 | 5F07 | 735F | 6174 | 6B63 |
| 0001460040 | 040E | FFDE | 0081 | 5F08 | 725F | 7465 | 6176 | 076C |
| 0001460060 | F604 | C0FF | ^100 | 0E74 | 0405 | 094C | 0A00 | 0603 |
| 0001460100 | 5F5F | 7566 | 636E | 0201 | 011C | DA1D | 055E | 03B0 |
| 0001460120 | 0010 | 03A5 | 0000 | 0D04 | 7374 | 5F6C | 6163 | 6C6C |
| 0001460140 | 705F | 7375 | 0A68 | 0604 | C000 | 0400 | 6966 | 656C |
| 0001460160 | 040A | 000A | 0081 | 6C04 | 6E69 | 0C65 | 0C04 | C000 |
| 0001460200 | 0600 | 6163 | 6C6C | 6565 | 040D | 0010 | 00C0 | 6307 |
| 0001460220 | 6C61 | 736C | 7274 | 040C | FFFA | 00C0 | 5F06 | 745F |
| 0001460240 | 7079 | 0F65 | F204 | 85FF | 0900 | 5F5F | 7862 | 745F |
| 0001460260 | 7079 | 0D65 | E204 | 46FF | 0702 | 5F5F | 7270 | 6E69 |
| 0001460300 | 0B74 | DA04 | BEFF | 0502 | 5F5F | 766C | 0D6C | E604 |
| 0001460320 | 51FF | 0705 | 5F5F | 6C63 | 636F | 0D6B | F604 | C0FF |
| 0001460340 | 0700 | 5F5F | 7473 | 6361 | 0E6B | E004 | 81FF | 0800 |
| 0001460360 | 5F5F | 6572 | 7674 | 6C61 | 040B | FFF4 | 0081 | 6605 |
| 0001460400 | 7269 | 7473 | 050E | 4CA2 | 0009 | 0560 | 5F06 | 665F |
| 0001460420 | 6E75 | 0163 | 1B02 | CD01 | 64DD | AA05 | 1002 | 9F00 |
| 0001460440 | 0002 | 0400 | 740C | 6C73 | 635F | 6C61 | 5F6C | 6F70 |
| 0001460460 | 0C70 | FA04 | C0FF | 0600 | 5F5F | 7974 | 6570 | 040F |
| 0001460500 | FFF4 | 0085 | 5F09 | 625F | 5F78 | 7974 | 6570 | 040D |
| 0001460520 | FFE4 | 0246 | 5F07 | 705F | 6972 | 746E | 040B | FFDC |
| 0001460540 | 02BE | 5F05 | 6C5F | 6C76 | 040D | FFE8 | 0551 | 5F07 |

THU MAR 14 17:52:34 1991 TSLINT.DLL PAGE 367, LINE 21595

| | | | | | | | | |
|---|---|---|---|---|---|---|---|---|
| 0001460560 | 635F | 6F6C | 6B63 | 040D | FFF6 | 00C0 | 5F07 | 735F |
| 0001460600 | 6174 | 6B63 | 040E | FFE2 | 0081 | 5F08 | 725F | 7465 |
| 0001460620 | 6176 | 0E6C | 0405 | 094D | 0A00 | 0603 | 5F5F | 7566 |
| 0001460640 | 636E | 0201 | 0121 | E077 | 0567 | 021C | 0016 | 020E |
| 0001460660 | 0000 | 1204 | 7374 | 5F6C | 6567 | 5F74 | 6163 | 6C6C |
| 0001460700 | 635F | 6168 | 6E69 | 040B | 0006 | 0476 | 6305 | 6168 |
| 0001460720 | 6E69 | 040C | FFFA | 00C0 | 5F06 | 745F | 7079 | 0F65 |
| 0001460740 | F404 | 85FF | 0900 | 5F5F | 7862 | 745F | 7079 | 0D65 |
| 0001460760 | E404 | 46FF | 0702 | 5F5F | 7270 | 6E69 | 0B74 | DC04 |
| 0001461000 | BEFF | 0502 | 5F5F | 766C | 0D6C | E804 | 51FF | 0705 |
| 0001461020 | 5F5F | 6C63 | 636F | 0D6B | F604 | C0FF | 0700 | 5F5F |
| 0001461040 | 7473 | 6361 | 0E6B | E204 | 81FF | 0800 | 5F5F | 6572 |
| 0001461060 | 7674 | 6C61 | 050E | 4D32 | 0009 | 0555 | 5F06 | 665F |
| 0001461100 | 6E75 | 0163 | 1F02 | 9301 | 68E2 | BF05 | 1000 | B400 |
| 0001461120 | 0000 | 0400 | 7410 | 6C73 | 635F | 6C61 | 5F6C | 6572 |
| 0001461140 | 7473 | 7261 | 0C74 | FA04 | C0FF | 0600 | 5F5F | 7974 |
| 0001461160 | 6570 | 040F | FFF4 | 0085 | 5F09 | 625F | 5F78 | 7974 |
| 0001461200 | 6570 | 040D | FFE4 | 0246 | 5F07 | 705F | 6972 | 746E |
| 0001461220 | 040B | FFDC | 02BE | 5F05 | 6C5F | 6C76 | 040D | FFE8 |
| 0001461240 | 0551 | 5F07 | 635F | 6F6C | 6B63 | 040D | FFF6 | 00C0 |
| 0001461260 | 5F07 | 735F | 6174 | 6B63 | 040E | FFE2 | 0081 | 5F08 |
| 0001461300 | 725F | 7465 | 6176 | 0E6C | 4E05 | 094D | 6900 | 0605 |
| 0001461320 | 5F5F | 7566 | 636E | 0201 | 011D | E352 | 056A | 0021 |
| 0001461340 | 0010 | 0016 | 0000 | 0E04 | 7374 | 5F6C | 6163 | 6C6C |
| 0001461360 | 645F | 7065 | 6874 | 0201 | 0D05 | 0000 | 001A | 050F |
| 0001461400 | 4AAE | 0009 | 00C0 | 4207 | 785F | 6946 | 656C | 050F |
| 0001461420 | 4AB2 | 0009 | 00C0 | 4207 | 785F | 6150 | 6B63 | 0514 |
| 0001461440 | 0000 | 0000 | 00C0 | 420C | 5F78 | 7361 | 6573 | 7472 |
| 0001461460 | 736D | 1467 | 0005 | 0000 | 8100 | 0C00 | 7842 | 445F |
| 0001461500 | 6265 | 6775 | 6F4D | 6564 | 0511 | 4AB6 | 0009 | 046A |
| 0001461520 | 6309 | 6C61 | 5F6C | 6966 | 656C | 0514 | 0000 | 0000 |
| 0001461540 | 0081 | 420C | 5F78 | 6954 | 656D | 4D73 | 646F | 1465 |
| 0001461560 | 0005 | 0000 | 8100 | 0C00 | 7842 | 455F | 7272 | 726F |
| 0001461600 | 6F4D | 6564 | 0511 | 4AE8 | 0009 | 0081 | 6309 | 6C61 |
| 0001461620 | 5F6C | 696C | 656E | 0510 | 0000 | 0000 | 0081 | 4208 |
| 0001461640 | 5F78 | 5F42 | 6973 | 1367 | EA05 | 094A | 6B00 | 0B04 |
| 0001461660 | 6163 | 6C6C | 735F | 7274 | 6E69 | 0E67 | 4E05 | 094B |
| 0001461700 | 6A00 | 0604 | 6163 | 6C6C | 6565 | 0512 | 823C | 0009 |
| 0001461720 | 054B | 630A | 6C61 | 5F6C | 7473 | 6361 | 126B | 8005 |
| 0001461740 | 094B | 8100 | 0A00 | 7473 | 6361 | 5F6B | 6973 | 657A |
| 0001461760 | 1105 | 0003 | 0000 | 0118 | E374 | 03B9 | 013E | 0010 |
| 0001462000 | 0133 | 0000 | 0904 | 6C68 | 635F | 6572 | 7461 | 0C65 |
| 0001462020 | FA04 | C0FF | 0600 | 5F5F | 7974 | 6570 | 040F | FFF4 |
| 0001462040 | 0085 | 5F09 | 625F | 5F78 | 7974 | 6570 | 040D | FFE4 |
| 0001462060 | 03BE | 5F07 | 705F | 6972 | 746E | 040B | FFDC | 0386 |
| 0001462100 | 5F05 | 6C5F | 6C76 | 040D | FFE8 | 03C0 | 5F07 | 635F |
| 0001462120 | 6F6C | 6B63 | 040D | FFF6 | 00C0 | 5F07 | 735F | 6174 |
| 0001462140 | 6B63 | 040E | FFE2 | 0081 | 5F08 | 725F | 7465 | 6176 |
| 0001462160 | 0E6C | 8A05 | 094D | BC00 | 0603 | 5F5F | 7566 | 636E |
| 0001462200 | 0201 | 0117 | E4B2 | 03C2 | 0547 | 0010 | 053C | 0000 |
| 0001462220 | 0804 | 6C68 | 615F | 6C6C | 636F | 040A | 0006 | 0085 |
| 0001462240 | 7304 | 7A69 | 0A65 | 0804 | 8400 | 0400 | 7974 | 6570 |
| 0001462260 | 040B | 000A | 0081 | 6C05 | 7665 | 6C65 | 040C | FFF6 |
| 0001462300 | 00C0 | 5F06 | 745F | 7079 | 0F65 | F004 | 85FF | 0900 |
| 0001462320 | 5F5F | 7862 | 745F | 7079 | 0D65 | E004 | BEFF | 0703 |
| 0001462340 | 5F5F | 7270 | 6E69 | 0B74 | D604 | 86FF | 0503 | 5F5F |
| 0001462360 | 766C | 0D6C | E404 | C0FF | 0703 | 5F5F | 6C63 | 636F |
| 0001462400 | 0D6B | F204 | C0FF | 0700 | 5F5F | 7473 | 6361 | 0E6B |
| 0001462420 | DC04 | C0FF | 0800 | 5F5F | 6572 | 7674 | 6C61 | 0407 |

THU MAR 14 17:52:34 1991 TSLINT.DLL PAGE 368, LINE 21654

| | | | | | | | | |
|---|---|---|---|---|---|---|---|---|
| 0001462440 | FFFA | 03B5 | 7001 | 050E | 4E32 | 0009 | 03C4 | 5F06 |
| 0001462460 | 665F | 6E75 | 0163 | 1902 | F901 | CBE9 | F503 | 1005 |
| 0001462500 | EA00 | 0005 | 0400 | 680A | 5F6C | 6572 | 6C61 | 6F6C |
| 0001462520 | 0763 | 0604 | C000 | 0100 | 0A70 | 0A04 | 8500 | 0400 |
| 0001462540 | 6973 | 657A | 040A | 000C | 0084 | 7404 | 7079 | 0B65 |
| 0001462560 | 0E04 | 8100 | 0500 | 656C | 6576 | 0C6C | FA04 | C0FF |
| 0001462600 | 0600 | 5F5F | 7974 | 6570 | 040F | FFF0 | 0085 | 5F09 |
| 0001462620 | 625F | 5F78 | 7974 | 6570 | 040D | FFDE | 03BE | 5F07 |
| 0001462640 | 705F | 6972 | 746E | 040B | FFD4 | 0386 | 5F05 | 6C5F |
| 0001462660 | 6C76 | 040D | FFE2 | 03C0 | 5F07 | 635F | 6F6C | 6B63 |
| 0001462700 | 040D | FFF2 | 00C0 | 5F07 | 735F | 6174 | 6B63 | 040E |
| 0001462720 | FFDA | 00C0 | 5F08 | 725F | 7465 | 6176 | 076C | F604 |
| 0001462740 | B5FF | 0103 | 0D71 | EE04 | 85FF | 0700 | 6C6F | 7364 |
| 0001462760 | 7A69 | 0E65 | 0205 | 094F | CC00 | 0603 | 5F5F | 7566 |
| 0001463000 | 636E | 0201 | 0116 | EFEE | 03D1 | 052D | 0010 | 0522 |
| 0001463020 | 0000 | 0704 | 6C68 | 665F | 6572 | 0765 | 0604 | C000 |
| 0001463040 | 0100 | 0C70 | FA04 | C0FF | 0600 | 5F5F | 7974 | 6570 |
| 0001463060 | 040F | FFF0 | 0085 | 5F09 | 625F | 5F78 | 7974 | 6570 |
| 0001463100 | 040D | FFDE | 03BE | 5F07 | 705F | 6972 | 746E | 040B |
| 0001463120 | FFD6 | 0386 | 5F05 | 6C5F | 6C76 | 040D | FFE4 | 03C0 |
| 0001463140 | 5F07 | 635F | 6F6C | 6B63 | 040D | FFF2 | 00C0 | 5F07 |
| 0001463160 | 735F | 6174 | 6B63 | 040E | FFDC | 0081 | 5F08 | 725F |
| 0001463200 | 7465 | 6176 | 076C | F604 | B5FF | 0103 | 0A71 | E204 |
| 0001463220 | 85FF | 0400 | 6973 | 657A | 050E | 4FCA | 0009 | 03D2 |
| 0001463240 | 5F06 | 665F | 6E75 | 0163 | 2102 | 1B01 | D9F5 | C903 |
| 0001463260 | 1002 | BE00 | 0002 | 0400 | 6812 | 5F6C | 6F63 | 6C6C |
| 0001463300 | 6365 | 5F74 | 6167 | 6272 | 6761 | 0A65 | 0604 | 8400 |
| 0001463320 | 0400 | 7974 | 6570 | 040B | 0008 | 0081 | 6C05 | 7665 |
| 0001463340 | 6C65 | 040C | FFF6 | 00C0 | 5F06 | 745F | 7079 | 0F65 |
| 0001463360 | EC04 | 85FF | 0900 | 5F5F | 7862 | 745F | 7079 | 0D65 |
| 0001463400 | DC04 | BEFF | 0703 | 5F5F | 7270 | 6E69 | 0B74 | D404 |
| 0001463420 | 86FF | 0503 | 5F5F | 766C | 0D6C | E004 | C0FF | 0703 |
| 0001463440 | 5F5F | 6C63 | 636F | 0D6B | EE04 | C0FF | 0700 | 5F5F |
| 0001463460 | 7473 | 6361 | 0E6B | DA04 | 81FF | 0800 | 5F5F | 6572 |
| 0001463500 | 7674 | 6C61 | 0407 | FFFA | 03B5 | 7001 | 0407 | FFF2 |
| 0001463520 | 03B5 | 7101 | 050E | 5022 | 0009 | 03DA | 5F06 | 665F |
| 0001463540 | 6E75 | 0163 | 1902 | E401 | DCF7 | 3A03 | 1001 | 2F00 |
| 0001463560 | 0001 | 0400 | 680A | 5F6C | 656D | 736D | 7A69 | 0C65 |
| 0001463600 | FA04 | C0FF | 0600 | 5F5F | 7974 | 6570 | 040F | FFF4 |
| 0001463620 | 0085 | 5F09 | 625F | 5F78 | 7974 | 6570 | 040D | FFE0 |
| 0001463640 | 03BE | 5F07 | 705F | 6972 | 746E | 040B | FFD6 | 0386 |
| 0001463660 | 5F05 | 6C5F | 6C76 | 040D | FFE8 | 03C0 | 5F07 | 635F |
| 0001463700 | 6F6C | 6B63 | 040D | FFF6 | 00C0 | 5F07 | 735F | 6174 |
| 0001463720 | 6B63 | 040E | FFDC | 0086 | 5F08 | 725F | 7465 | 6176 |
| 0001463740 | 0A6C | E404 | 86FF | 0400 | 6973 | 657A | 050E | 5052 |
| 0001463760 | 0009 | 03CC | 5F06 | 665F | 6E75 | 0163 | 1602 | 1E01 |
| 0001464000 | DFF9 | CB03 | 1001 | C000 | 0001 | 0400 | 6807 | 5F6C |
| 0001464020 | 6973 | 657A | 0407 | 0006 | 00C0 | 7001 | 040C | FFFA |
| 0001464040 | 00C0 | 5F06 | 745F | 7079 | 0F65 | F004 | 85FF | 0900 |
| 0001464060 | 5F5F | 7862 | 745F | 7079 | 0D65 | E004 | BEFF | 0703 |
| 0001464100 | 5F5F | 7270 | 6E69 | 0B74 | D804 | 86FF | 0503 | 5F5F |
| 0001464120 | 766C | 0D6C | E404 | C0FF | 0703 | 5F5F | 6C63 | 636F |
| 0001464140 | 0D6B | F204 | C0FF | 0700 | 5F5F | 7473 | 6361 | 0E6B |
| 0001464160 | DE04 | 85FF | 0800 | 5F5F | 6572 | 7674 | 6C61 | 0407 |
| 0001464200 | FFF6 | 03B5 | 7101 | 050E | 506C | 0009 | 03D2 | 5F06 |
| 0001464220 | 665F | 6E75 | 0163 | 1B02 | E901 | E0FA | 2203 | 1002 |
| 0001464240 | 1700 | 0002 | 0400 | 680C | 5F6C | 6163 | 636C | 735F |
| 0001464260 | 7A69 | 0C65 | F604 | C0FF | 0600 | 5F5F | 7974 | 6570 |
| 0001464300 | 040F | FFF0 | 0085 | 5F09 | 625F | 5F78 | 7974 | 6570 |

THU MAR 14 17:52:34 1991 TSLINT.DLL PAGE 369, LINE 21713

| | | | | | | | | |
|---|---|---|---|---|---|---|---|---|
| 0001464320 | 040D | FFDC | 03BE | 5F07 | 705F | 6972 | 746E | 040B |
| 0001464340 | FFD2 | 0386 | 5F05 | 6C5F | 6C76 | 040D | FFE4 | 03C0 |
| 0001464360 | 5F07 | 635F | 6F6C | 6B63 | 040D | FFF2 | 00C0 | 5F07 |
| 0001464400 | 735F | 6174 | 6B63 | 040E | FFD8 | 0086 | 5F08 | 725F |
| 0001464420 | 7465 | 6176 | 076C | FA04 | B5FF | 0103 | 0A70 | E004 |
| 0001464440 | 86FF | 0400 | 6973 | 657A | 050E | 5090 | 0009 | 0263 |
| 0001464460 | 5F06 | 665F | 6E75 | 0163 | 1402 | 0005 | 0000 | 8100 |
| 0001464500 | 0C00 | 7842 | 445F | 6265 | 6775 | 6F4D | 6564 | 0514 |
| 0001464520 | 0000 | 0000 | 0081 | 420C | 5F78 | 6954 | 656D | 4D73 |
| 0001464540 | 646F | 0565 | 000D | 1A00 | 1000 | 0005 | 0000 | 8100 |
| 0001464560 | 0800 | 7842 | 425F | 735F | 6769 | 050C | D124 | 0009 |
| 0001464600 | 03B4 | 6204 | 7361 | 0C65 | 8205 | 094D | B500 | 0403 |
| 0001464620 | 696C | 7473 | 050F | 4D86 | 0009 | 0086 | 6D07 | 6D65 |
| 0001464640 | 6973 | 657A | 050F | 4D7A | 0009 | 00C0 | 4207 | 785F |
| 0001464660 | 6946 | 656C | 050F | 4D7E | 0009 | 00C0 | 4207 | 785F |
| 0001464700 | 6150 | 6B63 | 1105 | 0004 | 0000 | 011A | 0000 | 0564 |
| 0001464720 | 2BC9 | 0010 | 2BBE | 0000 | 0B04 | 7374 | 5F6C | 7979 |
| 0001464740 | 6170 | 7372 | 0C65 | FA04 | C0FF | 0600 | 5F5F | 7974 |
| 0001464760 | 6570 | 040F | FE58 | 0085 | 5F09 | 625F | 5F78 | 7974 |
| 0001465000 | 6570 | 040D | FE46 | 0202 | 5F07 | 705F | 6972 | 746E |
| 0001465020 | 040B | FE3A | 0532 | 5F05 | 6C5F | 6C76 | 040D | FE4A |
| 0001465040 | 0567 | 5F07 | 635F | 6F6C | 6B63 | 040D | FFF2 | 00C0 |
| 0001465060 | 5F07 | 735F | 6174 | 6B63 | 040E | FE40 | 0081 | 5F08 |
| 0001465100 | 725F | 7465 | 6176 | 106C | 5E04 | 68FE | 0A05 | 7473 |
| 0001465120 | 7461 | 7365 | 6174 | 6B63 | 0407 | FE56 | 0081 | 6A0I |
| 0001465140 | 0407 | FE38 | 0081 | 6D01 | 040B | FE42 | 0569 | 7905 |
| 0001465160 | 7079 | 7476 | 040E | FFF6 | 0081 | 7408 | 706D | 7473 |
| 0001465200 | 7461 | 0E65 | F804 | 81FF | 0800 | 6D74 | 7470 | 6B6F |
| 0001465220 | 6E65 | 040A | FFEE | 00C1 | 7904 | 7079 | 0773 | 3604 |
| 0001465240 | 81FE | 0100 | 0A6E | 5A04 | 69FE | 0405 | 7979 | 7670 |
| 0001465260 | 050E | 6E70 | 0009 | 02DE | 5F06 | 665F | 6E75 | 0C63 |
| 0001465300 | D60B | 0000 | 6507 | 736E | 6174 | 6B63 | 0B0D | 011F |
| 0001465320 | 0800 | 656E | 7377 | 6174 | 6574 | 0B0F | 0ICA | 0A00 |
| 0001465340 | 6564 | 6166 | 6C75 | 6174 | 7463 | 0005 | 029D | 0112 |
| 0001465360 | 0408 | FE34 | 0081 | 7402 | 0869 | 3204 | 81FE | 0200 |
| 0001465400 | 6A74 | 0201 | 0B0D | 03D1 | 0800 | 7979 | 7265 | 6C72 |
| 0001465420 | 6261 | 0B0C | 0452 | 0700 | 7979 | 6261 | 726F | 0574 |
| 0001465440 | 5C00 | 1204 | 0801 | 3004 | 81FE | 0200 | 6974 | 0408 |
| 0001465460 | FE32 | 0081 | 7402 | 016A | 0102 | 0F02 | 1605 | 0800 |
| 0001465500 | 5A00 | 0705 | 7673 | 6E64 | 6D6I | 1273 | E805 | 0954 |
| 0001465520 | 5D00 | 0A05 | 7374 | 5F6C | 7979 | 7865 | 6163 | 0514 |
| 0001465540 | 0000 | 0000 | 0081 | 420C | 5F78 | 6544 | 7562 | 4D67 |
| 0001465560 | 646F | 1465 | 0005 | 0000 | 8100 | 0C00 | 7842 | 545F |
| 0001465600 | 6D69 | 7365 | 6F4D | 6564 | 0511 | 5562 | 0009 | 055E |
| 0001465620 | 7409 | 6C73 | 795F | 6179 | 7463 | 0512 | 6492 | 0009 |
| 0001465640 | 055F | 740A | 6C73 | 795F | 7079 | 6361 | 1074 | 0005 |
| 0001465660 | 0000 | 8100 | 0800 | 7842 | 425F | 735F | 6769 | 0511 |
| 0001465700 | 66E8 | 0009 | 0560 | 7409 | 6C73 | 795F | 7079 | 6F67 |
| 0001465720 | 0510 | 6744 | 0009 | 0561 | 7408 | 6C73 | 795F | 7279 |
| 0001465740 | 1331 | 7005 | 0926 | 8400 | 0B00 | 7374 | 5F6C | 656D |
| 0001465760 | 746D | 7079 | 1065 | 8005 | 0968 | 6100 | 0805 | 7374 |
| 0001466000 | 5F6C | 7979 | 3272 | 0D05 | 0000 | 001A | 0511 | 69BC |
| 0001466020 | 0009 | 055F | 7409 | 6C73 | 795F | 6379 | 6B68 | 0511 |
| 0001466040 | 6C12 | 0009 | 055F | 7409 | 6C73 | 795F | 6479 | 6665 |
| 0001466060 | 050C | 0C92 | 0008 | 00CI | 7904 | 7879 | 0F69 | 9605 |
| 0001466100 | 080C | 6200 | 0705 | 7374 | 5F6C | 7979 | 1576 | 6805 |
| 0001466120 | 096E | 8100 | 0D00 | 6370 | 7374 | 5F6C | 7979 | 7265 |
| 0001466140 | 6372 | 1574 | 6A05 | 096E | 8100 | 0D00 | 6370 | 7374 |
| 0001466160 | 5F6C | 7979 | 7265 | 6672 | 0E6C | 8605 | 0800 | 6300 |

THU MAR 14 17:52:34 1991 TSLINT.DLL PAGE 370, LINE 21772

| | | | | | | | | |
|---|---|---|---|---|---|---|---|---|
| 0001466200 | 0605 | 6572 | 7364 | 7165 | 0514 | 6E6C | 0009 | 0081 |
| 0001466220 | 740C | 6C73 | 795F | 7279 | 6465 | 6E63 | 1574 | 6E05 |
| 0001466240 | 096E | 8100 | 0D00 | 6370 | 7374 | 5F6C | 7979 | 6F74 |
| 0001466260 | 656B | 0C6E | E805 | 0970 | 1F00 | 0404 | 695F | 626F |
| 0001466300 | 0513 | 0C5C | 0008 | 0081 | 770B | 6E61 | 5F74 | 6572 |
| 0001466320 | 6567 | 7078 | 0512 | 3844 | 0009 | 0081 | 740A | 6C73 |
| 0001466340 | 6C5F | 6E69 | 6E65 | 136F | 7805 | 0800 | C000 | 0B00 |
| 0001466360 | 656C | 5F78 | 7562 | 6C69 | 6974 | 156E | 5205 | 0800 |
| 0001466400 | 8100 | 0D00 | 6170 | 6172 | 5F6D | 6F63 | 6E75 | 6574 |
| 0001466420 | 1E72 | 5405 | 0938 | 8500 | 1600 | 7374 | 5F6C | 7473 |
| 0001466440 | 6972 | 676E | 745F | 6172 | 736E | 616C | 6974 | 6E6F |
| 0001466460 | 0518 | 0C72 | 0008 | 04AA | 6510 | 7078 | 6572 | 7373 |
| 0001466500 | 6F69 | 5F6E | 6176 | 756C | 0F65 | DA05 | 0954 | C000 |
| 0001466520 | 0700 | 5F42 | 4678 | 6C69 | 0F65 | DE05 | 0954 | C000 |
| 0001466540 | 0700 | 5F42 | 5078 | 6361 | 146B | E205 | 0954 | 8100 |
| 0001466560 | 0C00 | 656C | 5F78 | 7570 | 6873 | 6162 | 6B63 | 0512 |
| 0001466600 | 54E4 | 0009 | 0081 | 730A | 6174 | 7472 | 6C5F | 6E69 |
| 0001466620 | 0965 | 3405 | 09D1 | AA00 | 0104 | 0E72 | 8605 | 080C |
| 0001466640 | 5600 | 0605 | 7979 | 766C | 6C61 | 050D | 0AA8 | 0008 |
| 0001466660 | 0556 | 7905 | 7679 | 6C61 | 0510 | 004E | 0008 | 0420 |
| 0001466700 | 7908 | 7479 | 6966 | 656C | 1070 | 4A05 | 0800 | C000 |
| 0001466720 | 0800 | 7979 | 6674 | 6C69 | 6E65 | 0513 | 54E6 | 0009 |
| 0001466740 | 0081 | 740B | 6C73 | 795F | 7479 | 6C66 | 6761 | 050E |
| 0001466760 | 0ABC | 0008 | 0559 | 7306 | 6476 | 7270 | 0664 | 7761 |
| 0001467000 | 336B | 632E | 0001 | 0308 | 0098 | 0000 | 00A2 | 0010 |
| 0001467020 | 00A3 | 0039 | 00A4 | 006C | 00A5 | 0095 | 00A6 | 00C8 |
| 0001467040 | 00A7 | 00FB | 00A8 | 0124 | 00A9 | 014D | 00AA | 0176 |
| 0001467060 | 00AB | 019F | 00AC | 01D2 | 00AD | 0205 | 00AE | 022E |
| 0001467100 | 00B0 | 0261 | 00C6 | 028B | 00E1 | 0293 | 00E4 | 02A3 |
| 0001467120 | 00E5 | 02C1 | 00E6 | 02CE | 00E7 | 02D7 | 00E8 | 02E5 |
| 0001467140 | 00EE | 02F0 | 00F1 | 0300 | 00F7 | 031E | 00F8 | 0346 |
| 0001467160 | 00F9 | 034D | 00FA | 0367 | 00FB | 036C | 0102 | 0377 |
| 0001467200 | 0105 | 0387 | 0106 | 039A | 0107 | 03E0 | 010D | 03EB |
| 0001467220 | 0112 | 03FB | 0113 | 0413 | 0114 | 0424 | 0115 | 0435 |
| 0001467240 | 0116 | 043C | 0117 | 0443 | 0118 | 044B | 0119 | 0481 |
| 0001467260 | 011A | 04AB | 011B | 04AC | 011C | 04AF | 011D | 04B2 |
| 0001467300 | 011E | 04CD | 0125 | 04D8 | 0128 | 04E8 | 0129 | 04FB |
| 0001467320 | 012A | 0541 | 0130 | 054C | 0133 | 055C | 0134 | 056F |
| 0001467340 | 0135 | 059E | 013B | 05A9 | 013E | 05B9 | 013F | 05CC |
| 0001467360 | 0140 | 0612 | 0147 | 061D | 0148 | 062D | 0149 | 0635 |
| 0001467400 | 014B | 063A | 014C | 064A | 014D | 0674 | 014E | 067F |
| 0001467420 | 014F | 06A1 | 0158 | 06AC | 0159 | 06BC | 015A | 0707 |
| 0001467440 | 0160 | 0712 | 0166 | 0722 | 0167 | 0747 | 0168 | 0752 |
| 0001467460 | 0169 | 0755 | 016B | 0775 | 016C | 0781 | 016D | 078E |
| 0001467500 | 016E | 07AE | 016F | 07C8 | 0170 | 07D4 | 0172 | 07E2 |
| 0001467520 | 0174 | 07F6 | 0176 | 0807 | 0177 | 0850 | 0184 | 085B |
| 0001467540 | 01B8 | 086B | 01C0 | 0874 | 01C1 | 0884 | 01C2 | 0889 |
| 0001467560 | 01C3 | 088F | 01C4 | 0894 | 01C5 | 08A7 | 01C6 | 08BB |
| 0001467600 | 01C7 | 08CC | 01C8 | 08FB | 01C9 | 0907 | 01CA | 090A |
| 0001467620 | 01CC | 090D | 01CD | 0998 | 01CE | 09A4 | 01CF | 09AD |
| 0001467640 | 01D0 | 09B5 | 01D1 | 09BD | 01D2 | 09D5 | 01D3 | 09DD |
| 0001467660 | 01D4 | 09E9 | 01D7 | 09EC | 01D8 | 09EF | 01DA | 09FC |
| 0001467700 | 01DB | 0A64 | 01DC | 0A70 | 01DF | 0A73 | 01E0 | 0A93 |
| 0001467720 | 01E1 | 0A96 | 01E2 | 0A9F | 01E3 | 0AB5 | 01ED | 0ABD |
| 0001467740 | 01EE | 0AC8 | 01EF | 0ACB | 01F0 | 0AE1 | 01F1 | 0B02 |
| 0001467760 | 01F2 | 0B05 | 01F3 | 0B42 | 01F4 | 0B45 | 01F6 | 0B48 |
| 0001470000 | 01F7 | 0B68 | 01F8 | 0B6B | 01F9 | 0B73 | 01FB | 0B76 |
| 0001470020 | 01FC | 0B7F | 01FD | 0B95 | 01FE | 0B98 | 01FF | 0BA1 |
| 0001470040 | 0201 | 0BA4 | 0202 | 0BAF | 0203 | 0BB2 | 0204 | 0BBA |

THU MAR 14 17:52:34 1991 TSLINT.DLL PAGE 371, LINE 21831

| | | | | | | | | |
|---|---|---|---|---|---|---|---|---|
| 0001470060 | 0206 | 0BBD | 0207 | 0BC8 | 0208 | 0BCB | 0209 | 0BD3 |
| 0001470100 | 020B | 0BD6 | 020C | 0C1B | 020D | 0C28 | 020E | 0C3D |
| 0001470120 | 020F | 0C43 | 0210 | 0C4D | 0211 | 0C56 | 0213 | 0C59 |
| 0001470140 | 0214 | 0C64 | 0215 | 0C6E | 0216 | 0C8E | 0217 | 0C9C |
| 0001470160 | 0218 | 0CA5 | 021A | 0CA8 | 021B | 0CED | 021C | 0D01 |
| 0001470200 | 021D | 0D29 | 021E | 0D37 | 0221 | 0D48 | 0222 | 0D6E |
| 0001470220 | 0223 | 0D89 | 0224 | 0DF1 | 0225 | 0DF9 | 0227 | 0DFC |
| 0001470240 | 0228 | 0E78 | 0229 | 0E93 | 022A | 0EAE | 022B | 0F16 |
| 0001470260 | 022C | 0F1E | 022E | 0F21 | 022F | 0F2D | 0231 | 0F30 |
| 0001470300 | 0232 | 0F75 | 0233 | 0F99 | 0234 | 0FA2 | 0235 | 0FA7 |
| 0001470320 | 0236 | 0FB1 | 0237 | 0FB4 | 0239 | 0FB9 | 023A | 0FD3 |
| 0001470340 | 023B | 0FE1 | 023C | 0FEC | 023D | 0FF5 | 023E | 0FFF |
| 0001470360 | 023F | 100D | 0240 | 1033 | 0241 | 1054 | 0242 | 10BE |
| 0001470400 | 0243 | 10C1 | 0244 | 10C9 | 0246 | 10D1 | 0247 | 10EC |
| 0001470420 | 0248 | 1156 | 0249 | 115E | 024B | 1161 | 024C | 11DD |
| 0001470440 | 024D | 11F8 | 024E | 1213 | 024F | 127D | 0250 | 1285 |
| 0001470460 | 0252 | 1288 | 0253 | 1294 | 0255 | 1297 | 0256 | 129C |
| 0001470500 | 0258 | 129F | 0259 | 12A4 | 025B | 12A7 | 025C | 12AC |
| 0001470520 | 025E | 12AF | 025F | 12F4 | 0261 | 1318 | 0262 | 1338 |
| 0001470540 | 0263 | 1348 | 0264 | 1353 | 0265 | 1361 | 0266 | 1387 |
| 0001470560 | 0267 | 13A2 | 0268 | 140C | 0269 | 1414 | 026B | 1417 |
| 0001470600 | 026C | 1493 | 026D | 14AE | 026E | 14C9 | 026F | 1533 |
| 0001470620 | 0270 | 153B | 0272 | 153E | 0273 | 154A | 0275 | 154D |
| 0001470640 | 0276 | 1592 | 0277 | 15AF | 0278 | 15BA | 0279 | 15C4 |
| 0001470660 | 027A | 15E0 | 027B | 15F5 | 027C | 15FE | 027D | 1624 |
| 0001470700 | 027E | 1645 | 027F | 16AF | 0280 | 16B2 | 0282 | 16BA |
| 0001470720 | 0283 | 16DB | 0284 | 16E3 | 0285 | 1706 | 0286 | 1770 |
| 0001470740 | 0287 | 1773 | 0288 | 17DB | 0289 | 17DE | 028A | 1801 |
| 0001470760 | 028B | 186E | 028D | 1871 | 028E | 1892 | 028F | 18FA |
| 0001471000 | 0292 | 1902 | 0293 | 197E | 0294 | 1999 | 0295 | 19BC |
| 0001471020 | 0296 | 1A29 | 0297 | 1A35 | 0299 | 1A38 | 029A | 1A7D |
| 0001471040 | 029B | 1A9A | 029D | 1B03 | 029E | 1B0C | 029F | 1B16 |
| 0001471060 | 02A0 | 1B21 | 02A1 | 1B2B | 02A2 | 1B40 | 02A3 | 1B4A |
| 0001471100 | 02A4 | 1B53 | 02A5 | 1B69 | 02A6 | 1B7B | 02A7 | 1BA5 |
| 0001471120 | 02A8 | 1BA8 | 02A9 | 1BBA | 02AB | 1BE1 | 02AC | 1BF0 |
| 0001471140 | 02AD | 1C06 | 02AE | 1C1C | 02AF | 1C28 | 02B1 | 1C2B |
| 0001471160 | 02B2 | 1C70 | 02B3 | 1C8D | 02B4 | 1CF6 | 02B5 | 1CFF |
| 0001471200 | 02B6 | 1D09 | 02B7 | 1D14 | 02B8 | 1D1E | 02B9 | 1D33 |
| 0001471220 | 02BA | 1D3D | 02BB | 1D46 | 02BC | 1D5C | 02BD | 1D6E |
| 0001471240 | 02BE | 1D98 | 02BF | 1D9B | 02C0 | 1DAD | 02C2 | 1DD4 |
| 0001471260 | 02C3 | 1DE3 | 02C4 | 1DF9 | 02C5 | 1E0F | 02C6 | 1E1B |
| 0001471300 | 02CA | 1E1E | 02CB | 1E21 | 02CC | 1EB4 | 02CD | 1EB7 |
| 0001471320 | 02CE | 1F42 | 02CF | 1F56 | 02D5 | 1F61 | 02D8 | 1F71 |
| 0001471340 | 02D9 | 1F84 | 02DA | 1FCA | 02E0 | 1FD5 | 02E4 | 1FE5 |
| 0001471360 | 02E5 | 1FE8 | 02E6 | 200D | 02E7 | 202D | 02E8 | 204E |
| 0001471400 | 02E9 | 2062 | 02EA | 206A | 02EB | 2071 | 02EC | 2079 |
| 0001471420 | 02ED | 207C | 02EE | 2090 | 02EF | 20A0 | 02F0 | 20B0 |
| 0001471440 | 02F1 | 20B9 | 02F2 | 20D4 | 02F8 | 20DF | 02FC | 20EF |
| 0001471460 | 02FD | 20F4 | 02FE | 2107 | 02FF | 212C | 0300 | 2134 |
| 0001471500 | 0301 | 2151 | 030C | 215C | 030D | 216C | 030E | 2174 |
| 0001471520 | 0311 | 2179 | 0312 | 2189 | 0313 | 21B3 | 0314 | 21BE |
| 0001471540 | 0316 | 21C1 | 0317 | 21D1 | 0318 | 21DC | 031B | 221B |
| 0001471560 | 031C | 2228 | 031D | 2235 | 031E | 2248 | 031F | 225C |
| 0001471600 | 0320 | 225F | 0321 | 226A | 0322 | 2300 | 0323 | 2311 |
| 0001471620 | 0324 | 231C | 0325 | 233A | 0327 | 233D | 0328 | 235B |
| 0001471640 | 032E | 2366 | 0332 | 2376 | 0333 | 2389 | 0334 | 239D |
| 0001471660 | 0335 | 23BD | 0336 | 23F7 | 0337 | 240A | 0338 | 2427 |
| 0001471700 | 0339 | 2433 | 033F | 243E | 0343 | 244E | 0344 | 2461 |
| 0001471720 | 0345 | 2475 | 0346 | 2495 | 0347 | 24C2 | 0348 | 24D5 |

THU MAR 14 17:52:34 1991 TSLINT.DLL PAGE 372, LINE 21890

| | | | | | | | | |
|---|---|---|---|---|---|---|---|---|
| 0001471740 | 0349 | 24F2 | 034A | 24FE | 0357 | 2509 | 0358 | 2519 |
| 0001471760 | 0359 | 2524 | 035A | 2567 | 035C | 256D | 035D | 25F4 |
| 0001472000 | 035E | 25FA | 0366 | 2605 | 0367 | 2615 | 0368 | 2620 |
| 0001472020 | 0369 | 2663 | 036B | 2669 | 036C | 26F0 | 036D | 2700 |
| 0001472040 | 036E | 2706 | 036F | 2717 | 0370 | 279E | 0371 | 27A4 |
| 0001472060 | 037A | 27AF | 037B | 27BF | 037C | 27CA | 037D | 280D |
| 0001472100 | 037F | 2813 | 0380 | 289A | 0381 | 28AA | 0382 | 28B0 |
| 0001472120 | 0383 | 28C1 | 0384 | 2948 | 0385 | 2958 | 0386 | 295E |
| 0001472140 | 0387 | 296F | 0388 | 29F6 | 0389 | 29FC | 0396 | 2A07 |
| 0001472160 | 0397 | 2A17 | 0398 | 2A22 | 0399 | 2A65 | 039B | 2A6B |
| 0001472200 | 039C | 2AF2 | 039D | 2B02 | 039E | 2B08 | 039F | 2B19 |
| 0001472220 | 03A0 | 2BA0 | 03A1 | 2BB0 | 03A2 | 2BB6 | 03A3 | 2BC7 |
| 0001472240 | 03A4 | 2C4E | 03A5 | 2C5E | 03A6 | 2C64 | 03A7 | 2C75 |
| 0001472260 | 03A8 | 2CFC | 03A9 | 2D02 | 03B3 | 2D0D | 03B4 | 2D1D |
| 0001472300 | 03B5 | 2D28 | 03B6 | 2D6B | 03B8 | 2D71 | 03B9 | 2DF8 |
| 0001472320 | 03BA | 2E08 | 03BB | 2E0E | 03BC | 2E1F | 03BD | 2E33 |
| 0001472340 | 03BE | 2E43 | 03BF | 2E49 | 03C0 | 2E5A | 03C1 | 2EE1 |
| 0001472360 | 03C2 | 2EE7 | 03CC | 2EF2 | 03CD | 2F02 | 03CF | 2F95 |
| 0001472400 | 03D3 | 2FC3 | 03DA | 3059 | 03DB | 3081 | 03E1 | 308C |
| 0001472420 | 03E4 | 309C | U3E5 | 30B4 | 03E7 | 30C2 | 03E8 | 311A |
| 0001472440 | 03EE | 3125 | 03F1 | 3135 | 03F2 | 3148 | 03F3 | 318E |
| 0001472460 | 03F9 | 3199 | 03FC | 31A9 | 03FD | 31BC | 03FE | 3202 |
| 0001472500 | 0404 | 320D | 0405 | 321D | 0406 | 3227 | 0407 | 3238 |
| 0001472520 | 0408 | 3242 | 040B | 3248 | 040C | 3279 | 0412 | 3284 |
| 0001472540 | 0415 | 3294 | 0420 | 32A1 | 0421 | 32AB | 0422 | 32BC |
| 0001472560 | 0423 | 32BF | 0425 | 32CB | 0426 | 32D6 | 0427 | 32F5 |
| 0001472600 | 0428 | 32F8 | 0429 | 330B | 042C | 333C | 042D | 3342 |
| 0001472620 | 042E | 335F | 0437 | 336A | 043A | 337A | 043B | 339B |
| 0001472640 | 043C | 33CB | 043D | 33D4 | 044A | 33DF | 044E | 33EF |
| 0001472660 | 044F | 3416 | 0450 | 344C | 0451 | 3473 | 0452 | 348F |
| 0001472700 | 0453 | 34C7 | 0454 | 3502 | 0455 | 3505 | 0456 | 3508 |
| 0001472720 | 0457 | 353D | 0460 | 3548 | 0461 | 3558 | 0468 | 35EB |
| 0001472740 | 0469 | 3615 | 046A | 36AB | 046B | 36BF | 046C | 36D0 |
| 0001472760 | 046D | 37A3 | 046E | 3800 | 046F | 380F | 0470 | 3820 |
| 0001473000 | 0471 | 3830 | 0473 | 383B | 0474 | 38E9 | 047C | 38F4 |
| 0001473020 | 047D | 3904 | 0483 | 3997 | 0484 | 39C1 | 0485 | 3A57 |
| 0001473040 | 0486 | 3A6B | 0487 | 3A7C | 0488 | 3B4F | 0489 | 3BAC |
| 0001473060 | 048A | 3BBB | 048B | 3BCC | 048C | 3BDC | 048E | 3BE7 |
| 0001473100 | 048F | 3C95 | 049A | 3CA0 | 049B | 3CB0 | 04A1 | 3D43 |
| 0001473120 | 04A2 | 3D5C | 04A3 | 3DE3 | 04A4 | 3DF2 | 04A5 | 3E13 |
| 0001473140 | 04A6 | 3E6A | 04A7 | 3E79 | 04A8 | 3E84 | 04A9 | 3E94 |
| 0001473160 | 04AB | 3E9F | 04AC | 3F4D | 04B4 | 3F58 | 04B5 | 3F68 |
| 0001473200 | 04BB | 3FFB | 04BC | 4020 | 04BD | 4032 | 04BE | 40B9 |
| 0001473220 | 04BF | 40C8 | 04C0 | 40E9 | 04C1 | 410A | 04C2 | 413A |
| 0001473240 | 04C3 | 4170 | 04C4 | 41D3 | 04C5 | 41E2 | 04C6 | 41F6 |
| 0001473260 | 04C7 | 4206 | 04C8 | 4211 | 04C9 | 42BF | 04D3 | 42CA |
| 0001473300 | 04D4 | 42DA | 04DA | 436D | 04DB | 4392 | 04DC | 43A4 |
| 0001473320 | 04DD | 442B | 04DE | 443A | 04DF | 445B | 04E0 | 447C |
| 0001473340 | 04E1 | 44AC | 04E2 | 44E2 | 04E3 | 4545 | 04E4 | 4554 |
| 0001473360 | 04E5 | 4568 | 04E6 | 4578 | 04E7 | 4583 | 04E8 | 4631 |
| 0001473400 | 04F2 | 463C | 04F3 | 464C | 04F9 | 46DF | 04FA | 4704 |
| 0001473420 | 04FB | 4716 | 04FC | 479D | 04FD | 47AC | 04FE | 47CD |
| 0001473440 | 04FF | 47EE | 0500 | 481E | 0501 | 4854 | 0502 | 48B7 |
| 0001473460 | 0503 | 48C6 | 0504 | 48DA | 0505 | 48EA | 0506 | 48F5 |
| 0001473500 | 0507 | 49A3 | 0511 | 49AE | 0512 | 49BE | 0519 | 4A51 |
| 0001473520 | 051A | 4A76 | 051B | 4A88 | 051C | 4B0F | 051D | 4B1E |
| 0001473540 | 051E | 4B3F | 051F | 4B60 | 0520 | 4B90 | 0522 | 4BC6 |
| 0001473560 | 0523 | 4C29 | 0524 | 4C38 | 0525 | 4C4C | 0526 | 4C5C |
| 0001473600 | 0527 | 4C67 | 0528 | 4D15 | 052E | 4D20 | 052F | 4D30 |

THU MAR 14 17:52:34 1991 TSLINT.DLL PAGE 373, LINE 21949

| | | | | | | | | |
|---|---|---|---|---|---|---|---|---|
| 0001473620 | 0530 | 4D55 | 0536 | 4D60 | 0537 | 4D70 | 0538 | 4D95 |
| 0001473640 | 054C | 4DA0 | 054D | 4DB6 | 054E | 4DBC | 055B | 4DCA |
| 0001473660 | 055F | 4DDA | 0561 | 4DE2 | 0563 | 4DE8 | 0565 | 4DEB |
| 0001473700 | 0566 | 4DF5 | 0567 | 4E0C | 0568 | 4E16 | 0569 | 4E1B |
| 0001473720 | 056A | 4E1E | 056B | 4E21 | 056D | 4E24 | 056E | 4E2F |
| 0001473740 | 0572 | 4E44 | 0581 | 4E4F | 0582 | 4E5F | 0588 | 4EF2 |
| 0001473760 | 0589 | 4F12 | 058A | 4F24 | 058B | 4FAB | 058C | 4FBA |
| 0001474000 | 058D | 4FDA | 058E | 500A | 058F | 503A | 0590 | 509A |
| 0001474020 | 0591 | 50A9 | 0593 | 50C0 | 0595 | 50CE | 0596 | 517C |
| 0001474040 | 059E | 5187 | 059F | 5197 | 05A5 | 522A | 05A6 | 524A |
| 0001474060 | 05A7 | 525C | 05A8 | 52E3 | 05A9 | 52F2 | 05AA | 5312 |
| 0001474100 | 05AB | 5342 | 05AC | 5372 | 05AD | 53D2 | 05AE | 53E1 |
| 0001474120 | 05B0 | 53F8 | 05B2 | 5406 | 05B3 | 54B4 | 05BC | 54BF |
| 0001474140 | 05BD | 54CF | 05C4 | 5562 | 05C5 | 5578 | 05C6 | 5581 |
| 0001474160 | 05C7 | 5608 | 05C8 | 5617 | 05C9 | 5637 | 05CA | 5691 |
| 0001474200 | 05CB | 56A0 | 05CC | 56AB | 05CD | 56BB | 05CE | 56C6 |
| 0001474220 | 05CF | 5774 | 05D8 | 577F | 05D9 | 578F | 05E0 | 5822 |
| 0001474240 | 05E1 | 5838 | 05E2 | 5841 | 05E3 | 58C8 | 05E4 | 58D7 |
| 0001474260 | 05E5 | 58F7 | 05E6 | 5951 | 05E7 | 5960 | 05E8 | 596B |
| 0001474300 | 05E9 | 597B | 05EA | 5986 | 05EB | 5A34 | 05F3 | 5A3F |
| 0001474320 | 05F4 | 5A4F | 05FB | 5AE2 | 05FC | 5AFD | 05FD | 5B06 |
| 0001474340 | 05FE | 5B8D | 05FF | 5B9C | 0600 | 5BBC | 0601 | 5BDC |
| 0001474360 | 0602 | 5C3C | 0603 | 5C4B | 0604 | 5C5C | 0605 | 5C6C |
| 0001474400 | 0606 | 5C77 | 0607 | 5D25 | 0610 | 5D30 | 0611 | 5D40 |
| 0001474420 | 0618 | 5DD3 | 0619 | 5DE9 | 061A | 5DF2 | 061B | 5E79 |
| 0001474440 | 061C | 5E88 | 061D | 5EA8 | 061E | 5F02 | 061F | 5F11 |
| 0001474460 | 0620 | 5F1C | 0621 | 5F2C | 0622 | 5F37 | 0623 | 5FE5 |
| 0001474500 | 062C | 5FF0 | 062D | 6000 | 0632 | 6093 | 0633 | 60AC |
| 0001474520 | 0634 | 6133 | 0635 | 6142 | 0636 | 6163 | 0637 | 61BA |
| 0001474540 | 0638 | 61C5 | 0639 | 61D5 | 063A | 61E0 | 063B | 628E |
| 0001474560 | 0642 | 6299 | 0643 | 62A9 | 0647 | 633C | 0648 | 6357 |
| 0001474600 | 0649 | 635F | 064A | 6382 | 064B | 63DC | 064C | 63E7 |
| 0001474620 | 064D | 63EC | 064E | 649A | 0655 | 64A5 | 0656 | 64B5 |
| 0001474640 | 065A | 6548 | 065B | 6561 | 065C | 65E8 | 065D | 65F7 |
| 0001474660 | 065E | 661C | 065F | 6676 | 0660 | 668D | 0661 | 673B |
| 0001474700 | 0667 | 6746 | 0668 | 6756 | 0669 | 6785 | 0670 | 6790 |
| 0001474720 | 0675 | 67A0 | 0676 | 67AB | 0677 | 67BD | 0678 | 67C0 |
| 0001474740 | 0679 | 67D3 | 067B | 67F7 | 067C | 680A | 067D | 682B |
| 0001474760 | 0685 | 6836 | 0686 | 6846 | 0687 | 68D9 | 0688 | 68E2 |
| 0001475000 | 0689 | 68E7 | 068A | 6995 | 0691 | 69A0 | 0692 | 69B0 |
| 0001475020 | 0698 | 6A43 | 0699 | 6A51 | 069A | 6AA5 | 069B | 6AB5 |
| 0001475040 | 069C | 6AC0 | 069D | 6B6E | 6106 | 6B77 | 2E34 | 0163 |
| 0001475060 | B800 | 3D00 | 7A00 | 3E6B | 8A00 | 456B | 1E00 | 4D6C |
| 0001475100 | 2600 | 4E6C | 4500 | 4F6C | 5D00 | 516C | 7400 | 566C |
| 0001475120 | D300 | 586C | 3000 | 5A6D | 8400 | 5B6D | 8D00 | 5D6D |
| 0001475140 | 3400 | 626E | 4000 | 636E | 7B00 | 646E | 8E00 | 686E |
| 0001475160 | A000 | 696E | AE00 | 6A6E | D100 | 6B6E | DF00 | 6C6E |
| 0001475200 | F600 | 6D6E | F900 | 6E6E | 8500 | 6F6F | 9800 | 716F |
| 0001475220 | A600 | 726F | BC00 | 736F | BF00 | 746F | C200 | 776F |
| 0001475240 | CF00 | 7B6F | E600 | 7C6F | F400 | 7D6F | 0600 | 7E70 |
| 0001475260 | 1E00 | 7F70 | 2C00 | 8070 | 4200 | 8670 | 4500 | 8770 |
| 0001475300 | 5100 | 8870 | 6400 | 8970 | 7300 | 8C70 | 9100 | 8D70 |
| 0001475320 | A600 | 8E70 | B200 | 8F70 | C700 | 9070 | D200 | 9170 |
| 0001475340 | E700 | 9270 | F200 | 9470 | F900 | 9570 | 0C00 | 9671 |
| 0001475360 | 2200 | 9771 | 3500 | 9871 | 4A00 | 9971 | 5900 | 9C71 |
| 0001475400 | 7700 | 9D71 | 8C00 | 9E71 | 9800 | 9F71 | AD00 | A071 |
| 0001475420 | B800 | A171 | CD00 | A371 | D800 | A471 | EB00 | A571 |
| 0001475440 | FA00 | AD71 | 0600 | AE72 | 1300 | AF72 | 5300 | B072 |
| 0001475460 | 6600 | B172 | 7C00 | B272 | 9800 | B372 | B000 | B572 |

THU MAR 14 17:52:34 1991 TSLINT.DLL PAGE 374, LINE 22008

| | | | | | | | | |
|---|---|---|---|---|---|---|---|---|
| 0001475500 | BA00 | B672 | D200 | B772 | D700 | B872 | E700 | B972 |
| 0001475520 | EA00 | BA72 | F800 | BB72 | 0E00 | BC73 | 2600 | BD73 |
| 0001475540 | 2B00 | BE73 | 3B00 | BF73 | 3E00 | C073 | 4900 | C273 |
| 0001475560 | CF00 | C373 | 5E00 | C974 | 6900 | CF74 | 7900 | D074 |
| 0001475600 | 0500 | D175 | 1600 | D375 | 2B00 | D775 | 8200 | D875 |
| 0001475620 | EC00 | DA75 | 2400 | DC76 | 2700 | DD76 | F200 | DE76 |
| 0001475640 | FD00 | E076 | 1000 | E177 | 4100 | E277 | 6900 | E377 |
| 0001475660 | 7200 | E677 | 7500 | E777 | 9900 | EC77 | 9C00 | ED77 |
| 0001475700 | A100 | EF77 | BC00 | F077 | D700 | F177 | F400 | F777 |
| 0001475720 | FF00 | F877 | 0F00 | FD78 | A200 | FF78 | A700 | 0B78 |
| 0001475740 | AC01 | 0D78 | C501 | 0E78 | D601 | 1078 | EB01 | 1478 |
| 0001475760 | 4201 | 1579 | AC01 | 1779 | E401 | 1979 | E701 | 1A79 |
| 0001476000 | B201 | 1B7A | BD01 | 1D7A | D001 | 1E7A | E001 | 1F7A |
| 0001476020 | 6C01 | 207B | 7D01 | 217B | 8B01 | 227B | 9601 | 237B |
| 0001476040 | A101 | 247B | E001 | 257B | F301 | 267B | FE01 | 277B |
| 0001476060 | 1101 | 287C | 1401 | 297C | 2401 | 2A7C | 3A01 | 2F7C |
| 0001476100 | C201 | 307C | DC01 | 317C | E801 | 327C | F001 | 337C |
| 0001476120 | 0401 | 347D | 0E01 | 357D | 1301 | 367D | 1F01 | 377D |
| 0001476140 | 2A01 | 397D | 3A01 | 3D7D | 4B01 | 3E7D | 8F01 | 3F7D |
| 0001476160 | 9201 | 457D | 9501 | 467D | 9E01 | 477D | A801 | 487D |
| 0001476200 | D501 | 497D | E101 | 4A7D | E401 | 4B7D | 0001 | 4C7E |
| 0001476220 | 0301 | 4D7E | 0401 | 4E7E | 0701 | 4F7E | 0B01 | 507E |
| 0001476240 | AF01 | 567E | BB01 | 577E | E401 | 587E | F601 | 597E |
| 0001476260 | 2301 | 5A7F | 2F01 | 5B7F | 5B01 | 5C7F | 6D01 | 5D7F |
| 0001476300 | 8901 | 5E7F | 8C01 | 5F7F | 9B01 | 607F | 9E01 | 617F |
| 0001476320 | B001 | 627F | B901 | 637F | E901 | 647F | FB01 | 657F |
| 0001476340 | 0201 | 6680 | 8701 | 6780 | 9801 | 6880 | A401 | 6980 |
| 0001476360 | AB01 | 6B80 | C301 | 6C80 | EB01 | 6D80 | F401 | 6E80 |
| 0001476400 | 0301 | 6F81 | 2F01 | 7181 | 3701 | 7281 | 4201 | 7381 |
| 0001476420 | F401 | 0681 | 7761 | 366B | 632E | 0001 | 014B | 0063 |
| 0001476440 | 8200 | 0064 | 8210 | 0065 | 82A2 | 0066 | 82B0 | 0067 |
| 0001476460 | 8312 | 006D | 831D | 0077 | 832D | 007F | 8338 | 0080 |
| 0001476500 | 8348 | 0082 | 83DB | 0083 | 83E6 | 0084 | 843A | 0086 |
| 0001476520 | 849D | 0087 | 84B7 | 0088 | 8518 | 008A | 857B | 008B |
| 0001476540 | 85DB | 008F | 85E5 | 0091 | 863F | 0092 | 864C | 0093 |
| 0001476560 | 86B2 | 0094 | 86BF | 0095 | 8725 | 0096 | 8779 | 009C |
| 0001476600 | 87DC | 009D | 8836 | 009E | 886C | 009F | 88C0 | 00A0 |
| 0001476620 | 88D3 | 00A1 | 8927 | 00A2 | 8953 | 00A3 | 89A7 | 00A4 |
| 0001476640 | 89AA | 00A8 | 8A0D | 00A9 | 8A71 | 00AA | 8A81 | 00AB |
| 0001476660 | 8A94 | 00AC | 8AF7 | 00AD | 8B15 | 00AF | 8B24 | 00B2 |
| 0001476700 | 8B82 | 00B3 | 8BF5 | 00B5 | 8C05 | 00B6 | 8C64 | 00B7 |
| 0001476720 | 8CB8 | 00B8 | 8CBC | 00B9 | 8CCB | 00BA | 8CDD | 00BE |
| 0001476740 | 8CE7 | 00C0 | 8CEA | 00C1 | 8D49 | 00C4 | 8D4C | 00C5 |
| 0001476760 | 8DB2 | 00C6 | 8DCC | 00C7 | 8E20 | 00C8 | 8E3B | 00C9 |
| 0001477000 | 8E8F | 00CA | 8EAA | 00CC | 8EAD | 00CD | 8EBD | 00CE |
| 0001477020 | 8ED0 | 00CF | 8ED3 | 00D0 | 8F08 | 00D1 | 8F0C | 00D2 |
| 0001477040 | 8F6F | 00DL | 8F7A | 00DE | 8F8A | 00E6 | 901D | 00E7 |
| 0001477060 | 9071 | 00E8 | 9080 | 00E9 | 90D5 | 00EA | 90D8 | 00EB |
| 0001477100 | 910F | 00EC | 9110 | 00EE | 9177 | 00EF | 918A | 00F0 |
| 0001477120 | 918D | 00F1 | 9190 | 00F2 | 91E4 | 00F3 | 9247 | 0106 |
| 0001477140 | 9252 | 0108 | 9262 | 0109 | 926C | 010A | 9281 | 0112 |
| 0001477160 | 928C | 0113 | 929C | 011A | 932F | 011B | 933A | 011C |
| 0001477200 | 939D | 011E | 93A7 | 011F | 93B4 | 0122 | 941A | 0123 |
| 0001477220 | 941D | 0124 | 9483 | 0126 | 94E6 | 0127 | 94EE | 0129 |
| 0001477240 | 94F1 | 012A | 94F9 | 012C | 94FC | 012D | 9504 | 012F |
| 0001477260 | 9507 | 0130 | 950F | 0132 | 9512 | 0133 | 951A | 0135 |
| 0001477300 | 951D | 0136 | 9525 | 0138 | 9528 | 0139 | 9530 | 013B |
| 0001477320 | 9533 | 013C | 953B | 013E | 953E | 013F | 9546 | 0141 |
| 0001477340 | 9549 | 0142 | 9551 | 0144 | 9554 | 0145 | 955C | 0147 |

THU MAR 14 17:52:34 1991 TSLINT.DLL PAGE 375, LINE 22067

| | | | | | | | | |
|---|---|---|---|---|---|---|---|---|
| 0001477360 | 955F | 0148 | 9567 | 014A | 956A | 014B | 9572 | 014D |
| 0001477400 | 9575 | 014E | 957D | 0150 | 9580 | 0151 | 9588 | 0153 |
| 0001477420 | 958B | 0154 | 9593 | 0156 | 9596 | 0157 | 959E | 0159 |
| 0001477440 | 95A1 | 015A | 95A9 | 015C | 95AC | 015D | 95B4 | 015F |
| 0001477460 | 95B7 | 0160 | 95BF | 0162 | 95C2 | 0163 | 95CA | 0165 |
| 0001477500 | 95CD | 0166 | 95D5 | 0169 | 95D8 | 016A | 95EA | 016B |
| 0001477520 | 9644 | 016C | 9657 | 016F | 96BA | 0170 | 96C2 | 0171 |
| 0001477540 | 96CA | 0173 | 96CD | 0174 | 96D5 | 0175 | 96DD | 0177 |
| 0001477560 | 96E0 | 0178 | 96E8 | 0179 | 96F0 | 017B | 96F3 | 017C |
| 0001477600 | 96FB | 017D | 9703 | 017F | 9706 | 0180 | 970E | 0181 |
| 0001477620 | 9716 | 0183 | 9719 | 0184 | 9721 | 0185 | 9729 | 0187 |
| 0001477640 | 972C | 0188 | 9782 | 0189 | 9794 | 018A | 97EA | 018D |
| 0001477660 | 984D | 018E | 985F | 018F | 986F | 0190 | 98C3 | 0192 |
| 0001477700 | 98D6 | 0195 | 9939 | 0196 | 994D | 0197 | 9985 | 0198 |
| 0001477720 | 99A0 | 0199 | 9A06 | 019A | 9A0B | 019C | 9A0E | 019D |
| 0001477740 | 9A11 | 019E | 9A14 | 01A0 | 9A77 | 01A1 | 9A89 | 01A2 |
| 0001477760 | 9ADD | 01A3 | 9AF0 | 01A4 | 9B44 | 01A6 | 9BA7 | 01A7 |
| 0001500000 | 9BFB | 01A8 | 9C0D | 01A9 | 9C61 | 01AC | 9CC4 | 01AD |
| 0001500020 | 9D18 | 01AE | 9D1C | 01AF | 9D31 | 01B0 | 9D88 | 01B1 |
| 0001500040 | 9D93 | 01B2 | 9DA5 | 01B3 | 9DB5 | 01B4 | 9DCA | 01B5 |
| 0001500060 | 9E21 | 01B6 | 9E32 | 01B7 | 9E35 | 01B8 | 9E39 | 01B9 |
| 0001500100 | 9E4E | 01BA | 9EA5 | 01BB | 9EF9 | 01BC | 9F0E | 01BD |
| 0001500120 | 9F65 | 01C0 | 9FC8 | 01C1 | A01C | 01C2 | A02E | 01C3 |
| 0001500140 | A082 | 01C4 | A093 | 01C5 | A0A3 | 01C6 | A0F7 | 01C7 |
| 0001500160 | A0FB | 01C8 | A12A | 01C9 | A13F | 01CA | A196 | 01CB |
| 0001500200 | A1A8 | 01CC | A1AB | 01CD | A1AF | 01CE | A1C4 | 01CF |
| 0001500220 | A21B | 01D0 | A22B | 01D1 | A27F | 01D2 | A282 | 01D3 |
| 0001500240 | A2D6 | 01D5 | A339 | 01D6 | A33C | 01D7 | A34E | 01D8 |
| 0001500260 | A35E | 01D9 | A373 | 01DA | A3CA | 01DB | A41E | 01DC |
| 0001500300 | A421 | 01DE | A484 | 01DF | A494 | 01E0 | A4F7 | 01E1 |
| 0001500320 | A50A | 01E4 | A56D | 01E5 | A5C1 | 01E6 | A5D3 | 01E7 |
| 0001500340 | A627 | 01E8 | A63A | 01EB | A69D | 01EC | A6F1 | 01ED |
| 0001500360 | A704 | 01EE | A758 | 01EF | A76A | 01F0 | A7BE | 01F3 |
| 0001500400 | A821 | 01F4 | A875 | 01F5 | A88F | 01F6 | A8E3 | 01F7 |
| 0001500420 | A8FE | 01F8 | A952 | 01F9 | A96D | 01FA | A9C1 | 01FB |
| 0001500440 | A9D3 | 01FD | AA36 | 01FE | AA8A | 01FF | AAA4 | 0200 |
| 0001500460 | AAF8 | 0201 | AB13 | 0202 | AB67 | 0203 | AB79 | 0206 |
| 0001500500 | ABDC | 0207 | AC30 | 0208 | AC42 | 0209 | AC96 | 020B |
| 0001500520 | ACF9 | 020C | AD4D | 020D | AD5F | 020E | ADB3 | 0210 |
| 0001500540 | AE16 | 0211 | AE6A | 0213 | AECD | 0214 | AF21 | 0216 |
| 0001500560 | AF84 | 0217 | AFD8 | 0218 | AFEA | 021A | B04D | 021B |
| 0001500600 | B0AE | 021C | B0C1 | 021D | B0D7 | 021E | B12B | 021F |
| 0001500620 | B13E | 0221 | B1A1 | 0222 | B1FF | 0223 | B20F | 0224 |
| 0001500640 | B263 | 0226 | B276 | 0228 | B2D9 | 0229 | B2E7 | 022A |
| 0001500660 | B34A | 022B | B3FA | 022C | B45D | 0232 | B468 | 0233 |
| 0001500700 | B478 | 0234 | B50B | 0235 | B519 | 023A | B523 | 023C |
| 0001500720 | B526 | 023D | B57A | 023E | B57D | 023F | B5A0 | 0240 |
| 0001500740 | B603 | 0246 | B60E | 0247 | B61E | 024A | B6B1 | 024B |
| 0001500760 | B6BE | 024C | B712 | 024D | B716 | 024E | B721 | 024F |
| 0001501000 | B736 | 0250 | B78D | 0251 | B79F | 0252 | B7B0 | 0253 |
| 0001501020 | B7B3 | 0254 | B7B7 | 0255 | B7CC | 0256 | B823 | 0257 |
| 0001501040 | B877 | 0258 | B87A | 025A | B888 | 025B | B8EB | 0261 |
| 0001501060 | B8F6 | 0262 | B906 | 0263 | B90B | 0264 | B91B | 026A |
| 0001501100 | B926 | 026B | B936 | 026C | B946 | 6106 | 6B77 | 2E37 |
| 0001501120 | 0263 | 4A00 | 9C02 | 0000 | 9D00 | 1000 | 9E00 | A300 |
| 0001501140 | 9F00 | 6300 | A001 | 6E00 | A101 | 7400 | A201 | 7A00 |
| 0001501160 | A301 | 8E00 | A401 | F100 | B301 | FC00 | B401 | 0C00 |
| 0001501200 | B902 | 9F00 | BA02 | AA00 | BB02 | A400 | BE03 | AA00 |
| 0001501220 | BF03 | C200 | C003 | E800 | C103 | FF00 | C203 | 1B00 |

THU MAR 14 17:52:34 1991 TSLINT.DLL PAGE 376, LINE 22126

| | | | | | | | | |
|---|---|---|---|---|---|---|---|---|
| 0001501240 | C304 | 2100 | CA04 | 2C00 | CB04 | 3C00 | D404 | CF00 |
| 0001501260 | D504 | D700 | D604 | DA00 | D704 | F800 | D804 | 1400 |
| 0001501300 | D905 | 2500 | DA05 | 3D00 | DB05 | 4400 | DC05 | 5C00 |
| 0001501320 | DD05 | 6800 | DE05 | 6C00 | DF05 | 6F00 | E005 | 7A00 |
| 0001501340 | E105 | 9300 | E205 | 3700 | E306 | 4300 | E406 | 6B00 |
| 0001501360 | E506 | 8300 | E606 | A300 | E706 | AD00 | E806 | C300 |
| 0001501400 | E906 | E300 | EB06 | ED00 | EC06 | F000 | ED06 | F300 |
| 0001501420 | EE06 | FB00 | EF06 | 1000 | F007 | 2D00 | F107 | 3200 |
| 0001501440 | F207 | 4800 | F307 | AB00 | 1007 | B601 | 1107 | C601 |
| 0001501460 | 1907 | 5901 | 1B08 | 6101 | 1C08 | 7901 | 1D08 | 8801 |
| 0001501500 | 1E08 | AF01 | 1F08 | BC01 | 2008 | 4801 | 2109 | 6001 |
| 0001501520 | 2309 | 7601 | 2409 | 8D01 | 2509 | A501 | 2609 | AE01 |
| 0001501540 | 2709 | E201 | 2809 | FB01 | 2A09 | B901 | 2B0B | CF01 |
| 0001501560 | 2D0B | 3301 | 2E0C | 3601 | 2F0C | 6501 | 300C | 6801 |
| 0001501600 | 310C | 9301 | 320C | 9F01 | 330C | A201 | 340C | A501 |
| 0001501620 | 350C | B901 | 360C | BC01 | 370C | CD01 | 380C | E301 |
| 0001501640 | 3A0C | A101 | 3B0E | B701 | 3D0E | 1B01 | 3E0F | 1E01 |
| 0001501660 | 3F0F | 2F01 | 400F | 3B01 | 420F | 3E01 | 440F | 5001 |
| 0001501700 | 450F | 6B01 | 460F | 7801 | 470F | 8701 | 480F | 8201 |
| 0001501720 | 4910 | 8501 | 4A10 | A101 | 4C10 | B001 | 4D10 | B701 |
| 0001501740 | 4E10 | C701 | 4F10 | D001 | 5910 | DB01 | 5B10 | EB01 |
| 0001501760 | 5E10 | F001 | 6210 | 0501 | 6311 | 0E01 | 6411 | 1301 |
| 0001502000 | 6511 | 1801 | 6611 | 1B01 | 6811 | 2501 | 6A11 | 6101 |
| 0001502020 | 6D11 | 9D01 | 6F11 | B001 | 7011 | B601 | 7B11 | C101 |
| 0001502040 | 7E11 | D101 | 7F11 | F701 | 8011 | 0701 | 8112 | 2901 |
| 0001502060 | 8212 | 2E01 | 8312 | 3101 | 8412 | 3701 | 8512 | 3D01 |
| 0001502100 | 8612 | 5501 | 8712 | 7201 | 8812 | 7701 | 8912 | 8301 |
| 0001502120 | 8A12 | 8E01 | 8B12 | 9D01 | 8C12 | A401 | 8D12 | AA01 |
| 0001502140 | 8E12 | B001 | 9012 | C401 | 9712 | CF01 | 9E12 | DF01 |
| 0001502160 | A212 | F201 | A312 | 2801 | A413 | 5001 | A513 | 5501 |
| 0001502200 | A713 | 6501 | A813 | 7701 | A913 | 7D01 | AA13 | 8801 |
| 0001502220 | AB13 | 9F01 | AC13 | B201 | B313 | CD01 | B413 | 1601 |
| 0001502240 | B514 | 2001 | B614 | 2601 | BA14 | 3101 | BF14 | 4601 |
| 0001502260 | C014 | 4F01 | CA14 | 5501 | CB14 | 6201 | CD14 | 8A01 |
| 0001502300 | CE14 | A101 | DC14 | AC01 | DD14 | BC01 | E014 | CC01 |
| 0001502320 | E114 | DB01 | E314 | E101 | E414 | EB01 | E514 | F001 |
| 0001502340 | E814 | 0901 | EA15 | 1501 | EB15 | 4601 | EC15 | 6101 |
| 0001502360 | ED15 | 6701 | EE15 | 6A01 | EF15 | 8001 | F015 | 9F01 |
| 0001502400 | F215 | AB01 | F315 | BB01 | F515 | C101 | FA15 | E901 |
| 0001502420 | FB15 | F501 | FC15 | 1801 | FD16 | 1E01 | FE16 | 2901 |
| 0001502440 | 0016 | 2C02 | 0116 | 3802 | 0216 | 4402 | 0316 | 6702 |
| 0001502460 | 0416 | 6D02 | 0516 | 7002 | 0616 | 8C02 | 0716 | 9202 |
| 0001502500 | 0816 | BA02 | 0916 | D902 | 0C16 | E502 | 0D16 | 0402 |
| 0001502520 | 0E17 | 1A02 | 0F17 | 1D02 | 1017 | 2002 | 1117 | 3002 |
| 0001502540 | 1217 | 3602 | 1B17 | 4102 | 1C17 | 5102 | 2417 | E402 |
| 0001502560 | 2717 | 9402 | 2818 | 2602 | 2919 | BB02 | 2A19 | 4402 |
| 0001502600 | 2B1A | CD02 | 2D1A | D502 | 2E1A | E102 | 2F1A | 8D02 |
| 0001502620 | 301B | A102 | 311B | 5B02 | 321C | 6502 | 331C | 2402 |
| 0001502640 | 341D | DE02 | 351D | F402 | 361D | 2902 | 371E | 3902 |
| 0001502660 | 381E | 3C02 | 391E | 4A02 | 3A1E | 7602 | 3C1E | 8802 |
| 0001502700 | 3D1E | 4802 | 811F | 5302 | 821F | 6302 | 871F | F602 |
| 0001502720 | 891F | FB02 | 8A1F | 0B02 | 8B20 | 1602 | 8C20 | 2102 |
| 0001502740 | 8E20 | CF02 | 8F20 | DF02 | 9020 | 0902 | 9121 | 1D02 |
| 0001502760 | 9221 | CB02 | 9421 | CF02 | 9521 | DE02 | 9621 | F402 |
| 0001503000 | 9721 | FA02 | 9921 | A802 | 9A22 | AB02 | 9B22 | B302 |
| 0001503020 | 9D22 | B802 | A122 | D202 | A322 | E802 | A522 | F202 |
| 0001503040 | A722 | 2E02 | A923 | 6A02 | AA23 | 7302 | AB23 | 7902 |
| 0001503060 | AC23 | FC02 | AE23 | AA02 | B024 | D102 | B224 | D602 |
| 0001503100 | B324 | E502 | B424 | 1102 | B625 | 1C02 | B725 | 2202 |

THU MAR 14 17:52:34 1991 TSLINT.DLL PAGE 377, LINE 22185

| | | | | | | | | |
|---|---|---|---|---|---|---|---|---|
| 0001503120 | B825 | D002 | C525 | DB02 | CA25 | EB02 | CB25 | F602 |
| 0001503140 | CD25 | 0902 | CE26 | 1702 | CF26 | 2202 | D226 | 2C02 |
| 0001503160 | D326 | 6602 | D426 | 7402 | D626 | 8B02 | D726 | 9A02 |
| 0001503200 | D826 | AD02 | D926 | C002 | DB26 | D302 | DE26 | DC02 |
| 0001503220 | E026 | FC02 | E126 | 1302 | E227 | 2202 | E327 | 3502 |
| 0001503240 | E427 | 4802 | E527 | 5B02 | E727 | 6902 | EA27 | 7202 |
| 0001503260 | EB27 | 1002 | EC28 | 5602 | ED28 | 6502 | EE28 | 7602 |
| 0001503300 | EF28 | 9002 | F028 | A702 | F328 | B002 | F428 | C002 |
| 0001503320 | F528 | CD02 | F628 | ED02 | F728 | 1602 | F929 | 2D02 |
| 0001503340 | FA29 | 3C02 | FB29 | 4F02 | FC29 | 6202 | FE29 | 7502 |
| 0001503360 | 0129 | 7E03 | 0229 | 9703 | 0329 | D303 | 0429 | DC03 |
| 0001503400 | 0A29 | E703 | 0B29 | F703 | 0D29 | 8A03 | 0E2A | 9C03 |
| 0001503420 | 0F2A | FF03 | 102A | 2403 | 112B | 2E03 | 142B | 9103 |
| 0001503440 | 152B | A403 | 172B | B703 | 192B | DD03 | 1A2B | F003 |
| 0001503460 | 1C2B | 0303 | 1D2C | 1603 | 1E2C | 3CU3 | 1F2C | 4903 |
| 0001503500 | 202C | 5C03 | 212C | 6A03 | 222C | 7803 | 242C | DB03 |
| 0001503520 | 262C | 7F03 | 282D | 9503 | 292D | A303 | 2A2D | 0603 |
| 0001503540 | 302E | 1103 | 362E | 2103 | 382E | 2603 | 392E | 4003 |
| 0001503560 | 3A2E | 4A03 | 3B2E | 7203 | 3C2E | BA03 | 3D2E | C603 |
| 0001503600 | 3E2E | C903 | 3F2E | DF03 | 402E | EA03 | 412E | F403 |
| 0001503620 | 422E | 2F03 | 432F | 3903 | 442F | 3C03 | 452F | 4C03 |
| 0001503640 | 462F | 6803 | 472F | 6D03 | 482F | 7003 | 492F | 8303 |
| 0001503660 | 4B2F | 8C03 | 4E2F | B503 | 4F2F | D203 | 512F | D703 |
| 0001503700 | 522F | 0403 | 5330 | 1F03 | 5430 | 2303 | 5630 | 2603 |
| 0001503720 | 5730 | 2903 | 5830 | 3303 | 5C30 | 3703 | 5E30 | 3C03 |
| 0001503740 | 5F30 | 4503 | 6030 | 4E03 | 6130 | 6A03 | 6730 | 7503 |
| 0001503760 | 6830 | 8503 | 7930 | 1803 | 7A31 | 2103 | 7B31 | A703 |
| 0001504000 | 7C31 | 4903 | 7D32 | 5C03 | 7E32 | 6503 | 7F32 | 7E03 |
| 0001504020 | 8032 | 8D03 | 8132 | B103 | 8232 | BA03 | 8432 | BD03 |
| 0001504040 | 8532 | E603 | 8632 | F903 | 8732 | 0203 | 8833 | C103 |
| 0001504060 | 8933 | D703 | 8A33 | E003 | 8B33 | F903 | 8C33 | B803 |
| 0001504100 | 8D34 | 4203 | 9335 | 4D03 | 9735 | 5D03 | 9835 | 6F03 |
| 0001504120 | 9935 | 7D03 | 9A35 | 8C03 | 9B35 | 8F03 | 9C35 | 9203 |
| 0001504140 | A235 | 9D03 | A335 | AD03 | A735 | 4003 | A836 | 5103 |
| 0001504160 | A936 | 5A03 | AA36 | 6603 | AB36 | F803 | AC36 | 8A03 |
| 0001504200 | AD37 | 0D03 | AE38 | A903 | B438 | B403 | B638 | C403 |
| 0001504220 | B738 | DA03 | B838 | 0E03 | B939 | 1103 | BA39 | 1F03 |
| 0001504240 | C039 | 2A03 | C339 | 3A03 | C439 | 5803 | C539 | 6503 |
| 0001504260 | C639 | 6B03 | C739 | 7903 | D039 | 8403 | D139 | 9403 |
| 0001504300 | D839 | 2703 | D93A | 2C03 | DB3A | 3403 | DC3A | 3903 |
| 0001504320 | DE3A | 4303 | E03A | 4803 | E13A | 4C03 | ED3A | 4F03 |
| 0001504340 | EE3A | 6D03 | F03A | 7903 | F13A | FF03 | F43A | 0203 |
| 0001504360 | F53B | 0703 | F73B | 0A03 | F83B | 1D03 | F93B | 2003 |
| 0001504400 | FA3B | 4003 | FB3B | CC03 | FC3B | DD03 | FD3B | 0E03 |
| 0001504420 | FE3C | 5203 | FF3C | 5503 | 003C | 5804 | 013C | 5B04 |
| 0001504440 | 023C | 6604 | 033C | 6F04 | 043C | 8704 | 053C | AF04 |
| 0001504460 | 073C | 3504 | 093D | D704 | 0A3D | 8C04 | 0B3E | A504 |
| 0001504500 | 0C3E | B604 | 0D3E | BF04 | 0E3E | CC04 | 0F3E | D904 |
| 0001504520 | 113E | E604 | 123E | F204 | 133E | 0404 | 143F | 1104 |
| 0001504540 | 153F | 2304 | 173F | 3004 | 183F | 5004 | 193F | 6304 |
| 0001504560 | 1B3F | 6D04 | 1C3F | A804 | 1E3F | AB04 | 1F3F | E604 |
| 0001504600 | 2B3F | E904 | 2C3F | F104 | 2D3F | 1704 | 2E40 | 1A04 |
| 0001504620 | 2F40 | 3604 | 3140 | 5104 | 3240 | 7504 | 3340 | 7A04 |
| 0001504640 | 3D40 | 7D04 | 3F40 | 8504 | 4140 | 9F04 | 4240 | B704 |
| 0001504660 | 4340 | BA04 | 4640 | 4004 | 4741 | 4304 | 4841 | 5304 |
| 0001504700 | 4941 | 7404 | 4D41 | 9104 | 4E41 | B904 | 4F41 | 4304 |
| 0001504720 | 5742 | 4E04 | 5C42 | 5E04 | 5D42 | 8A04 | 5F42 | 9904 |
| 0001504740 | 6042 | C404 | 6142 | E004 | 6242 | FE04 | 6442 | 1904 |
| 0001504760 | 6543 | 4704 | 6643 | 5404 | 6843 | 5704 | 6A43 | 6504 |

THU MAR 14 17:52:34 1991 TSLINT.DLL PAGE 378, LINE 22244

| | | | | | | | | |
|---|---|---|---|---|---|---|---|---|
| 0001505000 | 6B43 | 7104 | 7143 | 7C04 | 7543 | 8C04 | 7643 | 1804 |
| 0001505020 | 7744 | 4404 | 7844 | 8304 | 7944 | 8604 | 7A44 | 8904 |
| 0001505040 | 7B44 | B104 | 7C44 | BC04 | 7D44 | D704 | 7E44 | 0504 |
| 0001505060 | 9545 | 1004 | 9645 | 2004 | 9845 | B304 | 9D45 | B804 |
| 0001505100 | A045 | BD04 | A145 | F104 | A245 | 0304 | A346 | 0604 |
| 0001505120 | A646 | 0904 | A746 | 1F04 | A846 | 3604 | AB46 | 3904 |
| 0001505140 | AE46 | 4104 | B046 | BF04 | B946 | CA04 | BA46 | DA04 |
| 0001505160 | C246 | 6D04 | C347 | 7D04 | C447 | 9304 | C547 | A604 |
| 0001505200 | C847 | BC04 | CE47 | C504 | CF47 | F704 | D047 | 0704 |
| 0001505220 | D148 | 2104 | D248 | 2404 | D348 | 3604 | D448 | C804 |
| 0001505240 | D548 | 4B04 | D649 | C904 | DD49 | D404 | DF49 | E404 |
| 0001505260 | E149 | E904 | E249 | FD04 | E349 | 0904 | E54A | 0C04 |
| 0001505300 | E64A | 2004 | E74A | 2C04 | E94A | 2F04 | EB4A | 5B04 |
| 0001505320 | EC4A | 7704 | F14A | 9204 | F24A | C404 | F44A | C704 |
| 0001505340 | F54A | D004 | FB4A | DB04 | FD4A | EB04 | FF4A | F004 |
| 0001505360 | 004A | 1C05 | 014B | 6D05 | 024B | 7005 | 034B | 7905 |
| 0001505400 | 0B4B | 8405 | 0C4B | 9405 | 114B | 9905 | 124B | A305 |
| 0001505420 | 134B | A805 | 154B | AB05 | 164B | B005 | 184B | B305 |
| 0001505440 | 194B | B805 | 1A4B | BB05 | 1F4B | D905 | 204B | E805 |
| 0001505460 | 224B | FF05 | 234B | 2905 | 244C | 4005 | 254C | 4305 |
| 0001505500 | 284C | 5205 | 294C | 7A05 | 2A4C | 8005 | 2B4C | AB05 |
| 0001505520 | 2C4C | B105 | 2D4C | DC05 | 2E4C | E205 | 2F4C | 0F05 |
| 0001505540 | 304D | 1305 | 324D | 3905 | 334D | 3F05 | 344D | 4205 |
| 0001505560 | 354D | 4805 | 364D | 4B05 | 384D | 6205 | 064D | 7761 |
| 0001505600 | 386B | 632E | 0002 | 008C | 004E | 4D6E | 004F | 4D7E |
| 0001505620 | 0056 | 4E10 | 0057 | 4E1D | 0058 | 4F9E | 0059 | 502A |
| 0001505640 | 005A | 503A | 005B | 50C3 | 005C | 50D6 | 005D | 50F0 |
| 0001505660 | 005E | 50FD | 005F | 51A1 | 0060 | 51BA | 0061 | 51E2 |
| 0001505700 | 0062 | 51F3 | 0063 | 51FE | 0064 | 5212 | 0065 | 529E |
| 0001505720 | 0066 | 52AB | 0067 | 536D | 0068 | 5386 | 0069 | 53AE |
| 0001505740 | 006A | 53BF | 006B | 53C2 | 006C | 53C8 | 006D | 53DF |
| 0001505760 | 006E | 5461 | 006F | 54EA | 0076 | 54F5 | 007A | 5505 |
| 0001506000 | 007B | 5515 | 007C | 5518 | 007D | 552C | 007E | 5560 |
| 0001506020 | 007F | 5570 | 0080 | 5588 | 0081 | 558D | 0082 | 55A5 |
| 0001506040 | 0083 | 55AA | 0084 | 55B8 | 0085 | 55BB | 0086 | 55D1 |
| 0001506060 | 0087 | 55D4 | 0091 | 55DF | 0092 | 55EF | 0094 | 55F2 |
| 0001506100 | 0095 | 5606 | 0096 | 5619 | 0098 | 562F | 0099 | 5659 |
| 0001506120 | 009A | 565E | 00A5 | 5669 | 00A8 | 5679 | 00A9 | 56B1 |
| 0001506140 | 00AA | 56D2 | 00AB | 56D5 | 00AC | 56DE | 00AD | 56E1 |
| 0001506160 | 00AE | 56EA | 00B8 | 56F5 | 00BB | 5705 | 00BC | 5712 |
| 0001506200 | 00BD | 5732 | 00BE | 5742 | 00BF | 5748 | 00C0 | 575C |
| 0001506220 | 00C1 | 576C | 00C2 | 5788 | 00C3 | 57B0 | 00C4 | 57B6 |
| 0001506240 | 00C5 | 57B9 | 00C6 | 57E1 | 00C8 | 57E7 | 00D6 | 57F2 |
| 0001506260 | 00D7 | 5802 | 00D9 | 5895 | 00DC | 5898 | 00DE | 58A8 |
| 0001506300 | 00E0 | 58B8 | 00E2 | 5973 | 00E3 | 5982 | 00E4 | 599C |
| 0001506320 | 00E5 | 59A5 | 00E6 | 59A8 | 00E7 | 59C3 | 00E8 | 59CE |
| 0001506340 | 00E9 | 59F6 | 00EC | 5A86 | 00ED | 5A96 | 00EE | 5AAF |
| 0001506360 | 00EF | 5AC7 | 00F0 | 5AE6 | 00F1 | 5B01 | 00F2 | 5B91 |
| 0001506400 | 00F9 | 5B9C | 00FA | 5BAC | 00FE | 5BAF | 00FF | 5BBF |
| 0001506420 | 0100 | 5BC2 | 0101 | 5BD6 | 0103 | 5BE6 | 0104 | 5BEE |
| 0001506440 | 0105 | 5C2B | 0106 | 5C4C | 0107 | 5C4F | 0108 | 5C7A |
| 0001506460 | 0109 | 5C85 | 010A | 5C88 | 010B | 5C93 | 010C | 5CA7 |
| 0001506500 | 010D | 5CAA | 010E | 5CBF | 010F | 5CD7 | 0110 | 5CDC |
| 0001506520 | 0111 | 5CF4 | 0112 | 5CF9 | 0113 | 5D07 | 0119 | 5D12 |
| 0001506540 | 011A | 5D22 | 011D | 5DB5 | 011E | 5DC5 | 011F | 5E4B |
| 0001506560 | 0120 | 5EED | 0121 | 5EF5 | 0122 | 5F0B | 0123 | 5F24 |
| 0001506600 | 0124 | 5FBE | 012A | 5FC9 | 012B | 5FD9 | 012D | 606C |
| 0001506620 | 012E | 6081 | 012F | 6091 | 0130 | 60AB | 0131 | 60C4 |
| 0001506640 | 0132 | 614E | 0133 | 6151 | 0134 | 616F | 0135 | 6172 |

THU MAR 14 17:52:34 1991 TSLINT.DLL PAGE 379, LINE 22303

| | | | | | | | | |
|---|---|---|---|---|---|---|---|---|
| 0001506660 | 0136 | 61F5 | 0137 | 627B | 6106 | 6B77 | 2E39 | 0263 |
| 0001506700 | A100 | 4A00 | 8600 | 4B62 | 9600 | 4E62 | 2800 | 4F63 |
| 0001506720 | 3300 | 5063 | 4500 | 5163 | 5200 | 5263 | 6400 | 5363 |
| 0001506740 | 7100 | 5463 | 8300 | 5563 | 9000 | 5863 | B100 | 5963 |
| 0001506760 | D200 | 5A63 | DA00 | 5B63 | 4A00 | 5C64 | 0900 | 6265 |
| 0001507000 | 1400 | 6365 | 2400 | 6865 | B600 | 6B65 | C000 | 6C65 |
| 0001507020 | CB00 | 6D65 | DD00 | 6E65 | EA00 | 6F65 | FC00 | 7065 |
| 0001507040 | 0900 | 7166 | 1200 | 7266 | 1F00 | 7366 | 3100 | 7466 |
| 0001507060 | 3E00 | 7666 | 5000 | 7866 | 5800 | 7966 | 7200 | 7B66 |
| 0001507100 | CE00 | 7C66 | F100 | 7D66 | 0500 | 7E67 | 0E00 | 7F67 |
| 0001507120 | 1100 | 8067 | 1900 | 8167 | 3F00 | 8367 | 5400 | 8467 |
| 0001507140 | 5700 | 8567 | 7D00 | 8767 | 9200 | 8867 | 9A00 | 8967 |
| 0001507160 | 5B00 | 8A68 | 7D00 | 8B68 | EE00 | 8C68 | 7800 | 9669 |
| 0001507200 | 8300 | 9769 | 9300 | 9B69 | 2600 | 9C6A | 3300 | 9D6A |
| 0001507220 | 3B00 | 9E6A | 4300 | A06A | CD00 | A16A | DD00 | A26A |
| 0001507240 | EA00 | A36A | F100 | A56A | 7B00 | A66B | 8B00 | A76B |
| 0001507260 | 9F00 | A86B | A700 | A96B | AF00 | AA6B | C900 | AB6B |
| 0001507300 | D100 | AC6B | 9200 | AD6C | B700 | AF6C | C900 | B06C |
| 0001507320 | 5300 | B86D | 5E00 | BB6D | 6E00 | BC6D | 7E00 | BD6D |
| 0001507340 | 8E00 | BE6D | 9600 | BF6D | 9E00 | C06D | A700 | CA6D |
| 0001507360 | B200 | CD6D | C200 | CE6D | DC00 | CF6D | E400 | D06D |
| 0001507400 | ED00 | DE6D | F800 | DF6D | 0800 | EA6E | 9B00 | EB6E |
| 0001507420 | A400 | EC6E | CE00 | ED6E | DA00 | EF6E | DF00 | F26E |
| 0001507440 | F200 | F36E | FE00 | F66E | 1100 | F76F | 2000 | F96F |
| 0001507460 | 2300 | FA6F | 2F00 | FE6F | 3400 | 0B6F | 3701 | 0C6F |
| 0001507500 | 3A01 | 0D6F | 3F01 | 0E6F | 6301 | 0F6F | 7701 | 106F |
| 0001507520 | 8301 | 116F | 8601 | 126F | 8901 | 146F | 8C01 | 156F |
| 0001507540 | 9B01 | 166F | 9E01 | 176F | A101 | 186F | A401 | 1A6F |
| 0001507560 | A701 | 1B6F | AA01 | 1D6F | AD01 | 1E6F | B001 | 206F |
| 0001507600 | B301 | 216F | B601 | 236F | B901 | 246F | BC01 | 266F |
| 0001507620 | BF01 | 276F | C201 | 296F | C501 | 2A6F | D401 | 2B6F |
| 0001507640 | D701 | 2C6F | DA01 | 2D6F | DD01 | 2F6F | E001 | 306F |
| 0001507660 | EF01 | 316F | F201 | 326F | F501 | 336F | F801 | 346F |
| 0001507700 | 1701 | 3570 | 2A01 | 3670 | 3601 | 3770 | 4C01 | 3870 |
| 0001507720 | 5801 | 3970 | 5B01 | 3A70 | 6701 | 3B70 | 6A01 | 3D70 |
| 0001507740 | 6D01 | 4070 | 7001 | 4170 | 7A01 | 4270 | 7D01 | 4670 |
| 0001507760 | FC01 | 4770 | 0701 | 4871 | 0A01 | 4971 | 1F01 | 4A71 |
| 0001510000 | 2201 | 4B71 | 2E01 | 4C71 | 4101 | 4E71 | 4A01 | 4F71 |
| 0001510020 | 5A01 | 5071 | 1701 | 5172 | 2101 | 5272 | 2901 | 5372 |
| 0001510040 | 4501 | 5572 | 5301 | 5772 | B201 | 5972 | BA01 | 5A72 |
| 0001510060 | 4401 | 6373 | 4F01 | 6673 | 5F01 | 6773 | 7601 | 6873 |
| 0001510100 | 7E01 | 6973 | 8701 | 0773 | 6572 | 6567 | 2E78 | 0263 |
| 0001510120 | 8900 | 7702 | 9200 | 7B73 | A200 | 7C73 | AC00 | 7E73 |
| 0001510140 | AF00 | 8073 | C000 | 8173 | CF00 | 8373 | D700 | 8473 |
| 0001510160 | E600 | 8673 | EE00 | 8773 | FD00 | 8973 | 0500 | 8A74 |
| 0001510200 | 0B00 | B274 | 1600 | B574 | 2600 | B674 | 2C00 | B774 |
| 0001510220 | 3200 | B874 | 3800 | 1574 | 4301 | 1674 | 5301 | 1774 |
| 0001510240 | EB01 | 1874 | FD01 | 1974 | 0B01 | 1C75 | 1A01 | 2275 |
| 0001510260 | 2D01 | 2975 | 3501 | 2E75 | 3D01 | 3A75 | 4501 | 4475 |
| 0001510300 | 5501 | 4575 | 5E01 | 4B75 | 6901 | 4D75 | 6F01 | 5475 |
| 0001510320 | 7701 | 5875 | 7C01 | 5A75 | 8901 | 5B75 | 9201 | 5D75 |
| 0001510340 | A101 | 5E75 | 8701 | 6076 | 8A01 | 6176 | 4301 | 6277 |
| 0001510360 | 5501 | 6577 | 6F01 | 6777 | 8701 | 6977 | A201 | 6B77 |
| 0001510400 | BD01 | 6D79 | FF01 | 7079 | 0401 | 727A | 0E01 | 737A |
| 0001510420 | 3001 | 757A | 3301 | 767A | 3E01 | 777A | 5601 | 787A |
| 0001510440 | 5E01 | 797A | 6A01 | 857A | 6D01 | 877A | 5201 | 887B |
| 0001510460 | 5E01 | 8A7B | 6101 | 907B | 6401 | 917B | 8701 | 927B |
| 0001510500 | 8A01 | 957B | 9401 | 967B | B701 | 977B | BA01 | 987B |
| 0001510520 | C601 | 9A7B | D601 | 9B7B | D901 | 9C7B | E501 | A07B |

THU MAR 14 17:52:34 1991 TSLINT.DLL PAGE 380, LINE 22362

| | | | | | | | | |
|---|---|---|---|---|---|---|---|---|
| 0001510540 | E801 | A17B | F201 | A57B | F501 | A67B | 0A01 | A97C |
| 0001510560 | 0D01 | AA7C | 1101 | AD7C | 1601 | AE7C | 2801 | AF7C |
| 0001510600 | 3B01 | B07C | 5301 | B17C | 5601 | B27C | 9801 | B47C |
| 0001510620 | A001 | B57C | A301 | B77C | BD01 | B87C | C001 | BB7C |
| 0001510640 | D201 | BC7C | 1C01 | BE7D | 3001 | BF7D | 3401 | C07D |
| 0001510660 | 3801 | C27D | 3B01 | C47D | 3F01 | C67D | 4201 | C77D |
| 0001510700 | 4601 | C97D | 4901 | CD7D | 4C01 | CE7D | 5701 | D27D |
| 0001510720 | 5A01 | D67D | 6401 | D77D | 8101 | D97D | 8601 | DA7D |
| 0001510740 | AB01 | DB7D | B301 | DC7D | B801 | E07D | C101 | E17D |
| 0001510760 | E401 | E37D | E901 | E67D | EC01 | E77D | FA01 | E87D |
| 0001511000 | 0601 | EC7E | 0901 | EE7E | 2401 | F07E | 4201 | F180 |
| 0001511020 | 50C1 | F280 | 5D01 | F380 | 6D01 | F480 | 7001 | F58C |
| 0001511040 | 7C01 | F780 | 8A01 | F980 | 9601 | FD80 | AA01 | 0180 |
| 0001511060 | EC02 | 0380 | 0B02 | 0481 | 4D02 | 0581 | 6602 | 0881 |
| 0001511100 | 6902 | 0981 | 8D02 | 0B81 | A802 | 0C81 | EA02 | 0D81 |
| 0001511120 | 2C02 | 0E82 | 3302 | 1082 | 5002 | 1282 | 5302 | 1482 |
| 0001511140 | 6C02 | 1782 | 6F02 | 1882 | 9A02 | 1982 | A502 | 1A82 |
| 0001511160 | B202 | 1D82 | B502 | 1E82 | BF02 | 1F82 | C202 | 2082 |
| 0001511200 | C502 | 2382 | C802 | 2482 | D202 | 2582 | D502 | 2682 |
| 0001511220 | D802 | 2982 | DB02 | 2A82 | E502 | 2B82 | E802 | 2C82 |
| 0001511240 | EB02 | 2F82 | EE02 | 3082 | F802 | 3182 | FB02 | 3282 |
| 0001511260 | FE02 | 3582 | 0102 | 3683 | 1C02 | 3783 | 4602 | 3A83 |
| 0001511300 | 4B02 | 3B83 | 5502 | 3D83 | 5802 | 3E83 | 7302 | 4083 |
| 0001511320 | 7D02 | 4183 | 8902 | 4383 | 9802 | 4483 | AC02 | 4583 |
| 0001511340 | D102 | 4683 | F302 | 4783 | F702 | 4883 | FF02 | 4983 |
| 0001511360 | 0702 | 4A84 | 1702 | 4D84 | 1A02 | 4E84 | 2402 | 5084 |
| 0001511400 | 2702 | 5184 | 3F02 | 5284 | 5B02 | 5384 | 6602 | 5484 |
| 0001511420 | 7E02 | 5684 | 8B02 | 5784 | 9702 | 5984 | A902 | 5A84 |
| 0001511440 | AD02 | 5B84 | B502 | 5C84 | C102 | 5D84 | D802 | 5E84 |
| 0001511460 | F202 | 6184 | F502 | 6284 | FF02 | 6484 | 0202 | 6585 |
| 0001511500 | 2902 | 6685 | 3102 | 6785 | 3602 | 6885 | 4102 | 6985 |
| 0001511520 | 5902 | 6A85 | 6702 | 6B85 | 6C02 | 6C85 | 7402 | 6D85 |
| 0001511540 | 8402 | 8485 | 8702 | 8585 | 9502 | 8685 | A102 | 8985 |
| 0001511560 | A402 | 8A85 | B202 | 8B85 | BE02 | 8E85 | C102 | 8F85 |
| 0001511600 | CD02 | 9285 | D002 | 9385 | DC02 | 9685 | DF02 | 9785 |
| 0001511620 | EB02 | 9A85 | EE02 | 9B85 | FA02 | 9E85 | FD02 | 9F85 |
| 0001511640 | 0902 | A286 | 0C02 | A386 | 1802 | AE86 | 1B02 | AF86 |
| 0001511660 | 1E02 | B086 | 2702 | B186 | 2A02 | B286 | 4B02 | B386 |
| 0001511700 | 5602 | B486 | 5902 | B586 | 6A02 | B686 | 7602 | B786 |
| 0001511720 | 8302 | BB86 | 8602 | BC86 | 9002 | C386 | 9302 | C486 |
| 0001511740 | AB02 | C586 | AE02 | C686 | 4002 | CE87 | 4302 | D087 |
| 0001511760 | 0C02 | D188 | 1A02 | D288 | 2602 | D388 | 3402 | D588 |
| 0001512000 | 4002 | D688 | 4D02 | D788 | 5302 | D888 | C402 | DA88 |
| 0001512020 | C702 | DB88 | D202 | DD88 | EA02 | DF88 | 0202 | E089 |
| 0001512040 | 1302 | E389 | 1C02 | E689 | 2402 | E989 | 2C02 | EC89 |
| 0001512060 | 3402 | EF89 | 3C02 | F289 | 4402 | F589 | 4C02 | F689 |
| 0001512100 | 5402 | 0189 | 5F03 | 0289 | 6F03 | 0389 | 7803 | 0489 |
| 0001512120 | 8703 | 0589 | 9903 | 1589 | A403 | 1689 | B403 | 1789 |
| 0001512140 | C303 | 1889 | CF03 | 1989 | E503 | 1A89 | FA03 | 1B89 |
| 0001512160 | 1203 | 2C8A | 1D03 | 2D8A | 2D03 | 2F8A | C603 | 308A |
| 0001512200 | D803 | 318A | E303 | 328A | F603 | 338A | 0603 | 358B |
| 0001512220 | 1A03 | 388B | 2D03 | 3A8B | 3703 | 3B8B | 4C03 | 3C8B |
| 0001512240 | 5403 | 3E8B | 5C03 | 408B | 6903 | 428B | 8303 | 438B |
| 0001512260 | 8B03 | 488B | 8E03 | 4C8B | 9E03 | 4D8B | AB03 | 4E8B |
| 0001512300 | C603 | 4F8B | C903 | 508B | DB03 | 5C8B | DE03 | 5F8B |
| 0001512320 | E103 | 608B | EE03 | 618B | 0003 | 628C | 0303 | 638C |
| 0001512340 | 0C03 | 648C | 1903 | 658C | 2103 | 6B8C | 2403 | 6C8C |
| 0001512360 | 2C03 | 6D8C | 3B03 | 6E8C | 4603 | 6F8C | 4F03 | 708C |
| 0001512400 | 5703 | 778C | 5A03 | 788C | 6703 | 798C | 6A03 | 7A8C |

THU MAR 14 17:52:34 1991 TSLINT.DLL PAGE 381, LINE 22421

| | | | | | | | | |
|---|---|---|---|---|---|---|---|---|
| 0001512420 | 6E03 | 7B8C | 7D03 | 7C8C | 8803 | 7D8C | 9103 | 7E8C |
| 0001512440 | C303 | 7F8C | C703 | 828C | CA03 | 838C | D903 | 848C |
| 0001512460 | E403 | 858C | E803 | 868C | 0003 | 8A8D | 0303 | 8B8D |
| 0001512500 | 0703 | 8E8D | 0A03 | 8F8D | 1203 | 918D | 1B03 | 928D |
| 0001512520 | 2B03 | 938D | 3303 | 948D | 3B03 | 958D | 4B03 | 988D |
| 0001512540 | 4E03 | 9B8D | 5103 | 9C8D | 6103 | 9D8D | 6B03 | 9E8D |
| 0001512560 | 7303 | A18D | 7903 | A28D | 8903 | A38D | 9303 | A48D |
| 0001512600 | 9B03 | B78D | A103 | B88D | C003 | BA8D | F503 | BB8D |
| 0001512620 | 0203 | BC8E | 1303 | BD8E | 1603 | BF8E | 1E03 | C38E |
| 0001512640 | 2403 | C48E | 3F03 | C58E | 4C03 | C68E | 5D03 | C78E |
| 0001512660 | 6003 | C98E | 6B03 | CA8E | 8A03 | CC8E | BF03 | CD8E |
| 0001512700 | CC03 | CE8E | DD03 | CF8E | E003 | D18E | E803 | D28E |
| 0001512720 | EE03 | D78E | 3403 | D88F | 4A03 | D98F | 6003 | DA8F |
| 0001512740 | 6303 | DB8F | 6603 | DC8F | 6903 | E98F | 7403 | EA8F |
| 0001512760 | 8403 | EB8F | 1703 | EC90 | 4603 | 0690 | 5104 | 0790 |
| 0001513000 | 6404 | 0990 | F704 | 0A90 | 0804 | 0B91 | 1904 | 0F91 |
| 0001513020 | 2204 | 1091 | 3A04 | 1591 | 4804 | 1791 | 6C04 | 1891 |
| 0001513040 | 7504 | 1991 | 7B04 | 1A91 | 7E04 | 2591 | 8104 | 2791 |
| 0001513060 | A404 | 2991 | AC04 | 2B91 | AF04 | 2C91 | B204 | 2D91 |
| 0001513100 | CA04 | 3091 | D204 | 3291 | 0404 | 3492 | 0F04 | 3592 |
| 0001513120 | 3B04 | 3792 | 3F04 | 3992 | 4204 | 3A92 | 6304 | 3C92 |
| 0001513140 | 6704 | 3E92 | 6F04 | 4192 | 7204 | 4292 | 7D04 | 4392 |
| 0001513160 | 8C04 | 4492 | 8F04 | 4692 | 9B04 | 4792 | D904 | 4C92 |
| 0001513200 | DC04 | 4D92 | 0704 | 4F93 | 0D04 | 5093 | 3C04 | 5293 |
| 0001513220 | 4504 | 5393 | 4E04 | 5493 | 5404 | 5C93 | 5A04 | 5D93 |
| 0001513240 | 6504 | 5E93 | 7804 | 5F93 | 7B04 | 6093 | 8104 | 6B93 |
| 0001513260 | 8C04 | 6C93 | 9C04 | 6D93 | 2F04 | 6E94 | 5B04 | 9194 |
| 0001513300 | 6604 | 9294 | 7604 | 9494 | 0B04 | 9595 | 1D04 | 9E95 |
| 0001513320 | 3404 | A995 | 4704 | AA95 | 5104 | BD95 | 6604 | BF95 |
| 0001513340 | 6F04 | C095 | 7B04 | C195 | 8104 | C295 | 8904 | C495 |
| 0001513360 | 8E04 | C595 | 9D04 | C895 | AC04 | CA95 | B704 | CB95 |
| 0001513400 | C604 | CD95 | D204 | CF95 | D504 | D095 | E104 | D695 |
| 0001513420 | F304 | D795 | 0204 | E196 | 1404 | E296 | 1F04 | E396 |
| 0001513440 | 3E04 | E496 | 4104 | F396 | 6304 | F796 | 7D04 | F996 |
| 0001513460 | 8804 | FA96 | 9104 | FB96 | A904 | FC96 | B704 | FD96 |
| 0001513500 | BA04 | FE96 | CB04 | 0096 | DA05 | 0296 | F105 | 0396 |
| 0001513520 | FD05 | 0496 | 0A05 | 0697 | 0D05 | 0797 | 1605 | 0897 |
| 0001513540 | 2C05 | 0997 | 2F05 | 0A97 | 4805 | 0B97 | 5105 | 0C97 |
| 0001513560 | 6705 | 0D97 | 5A05 | 0E97 | 8305 | 1097 | 8605 | 1197 |
| 0001513600 | 9E05 | 1297 | AB05 | 1397 | AE05 | 1A97 | BE05 | 2597 |
| 0001513620 | CE05 | 2697 | EC05 | 2797 | 1D05 | 2A98 | 2005 | 2B98 |
| 0001513640 | 3C05 | 2C98 | 6D05 | 3098 | 7005 | 3398 | 8105 | 3598 |
| 0001513660 | 9805 | 3998 | C905 | 3B98 | E305 | 3C98 | FE05 | 3D98 |
| 0001513700 | 2005 | 3E99 | 4305 | 4099 | 4605 | 4399 | 6305 | 4699 |
| 0001513720 | B705 | 4799 | BF05 | 4899 | CE05 | 4A99 | D605 | 4B99 |
| 0001513740 | 2805 | 4C9A | 2B05 | 4D9A | 3305 | 4F9A | 3605 | 539A |
| 0001513760 | 3905 | 559A | 8D05 | 569A | C805 | 579A | CB05 | 5D9A |
| 0001514000 | CE05 | 5F9A | D405 | 609A | E205 | 639A | E805 | 659A |
| 0001514020 | 3C05 | 669B | 4905 | 679B | 6105 | 689B | 6405 | 6B9B |
| 0001514040 | 6F05 | 6C9B | B605 | 6E9B | C305 | 709B | D105 | 719B |
| 0001514060 | DE05 | 729B | E205 | 769B | E505 | 779B | 0B05 | 789C |
| 0001514100 | 0E05 | 7C9C | 1105 | 7D9C | 8C05 | 7E9C | 8F05 | 909C |
| 0001514120 | 9205 | 939C | A805 | 949C | BE05 | 969C | C405 | 979C |
| 0001514140 | E305 | 989C | 0305 | 999D | 1A05 | 9A9D | 3305 | 9C9D |
| 0001514160 | 4105 | 9D9D | 5005 | 9E9D | 5B05 | 9F9D | 5F05 | A09D |
| 0001514200 | 7705 | A19D | 8D05 | A79D | 9005 | A89D | 9F05 | A99D |
| 0001514220 | AA05 | AB9D | AE05 | B19D | BE05 | B29D | F205 | B39D |
| 0001514240 | F905 | B49D | 1305 | B59E | 1C05 | B69E | 1F05 | B89E |
| 0001514260 | 3905 | B99E | 5805 | BC9E | 6A05 | BD9E | 8905 | BE9E |

THU MAR 14 17:52:34 1991 TSLINT.DLL PAGE 382, LINE 22480

| | | | | | | | | |
|---|---|---|---|---|---|---|---|---|
| 0001514300 | 9205 | BF9E | 9505 | C19E | B105 | C39E | CC05 | C49E |
| 0001514320 | 1405 | C79F | 2105 | C89F | 2B05 | CC9F | 3405 | CD9F |
| 0001514340 | 3905 | CF9F | 4705 | D09F | 5005 | D89F | 5305 | DC9F |
| 0001514360 | 5705 | DD9F | 6605 | DE9F | 7105 | DF9F | 7A05 | E29F |
| 0001514400 | 7D05 | E69F | 9305 | E79F | B205 | E89F | D205 | E99F |
| 0001514420 | E905 | EA9F | 0205 | ECA0 | 1005 | EDA0 | 2005 | EEA0 |
| 0001514440 | 3005 | F3A0 | 3305 | F4A0 | 8405 | F6A0 | 8705 | F7A0 |
| 0001514460 | F705 | F8A0 | FA05 | FDA0 | FD05 | FEA0 | 4E05 | 00A1 |
| 0001514500 | 5106 | 01A1 | C106 | 02A1 | C406 | 07A1 | C706 | 08A1 |
| 0001514520 | 3206 | 0AA2 | 3506 | 0BA2 | 6106 | 0CA2 | 6406 | 10A2 |
| 0001514540 | 6706 | 11A2 | 9306 | 14A2 | 9606 | 15A2 | 0606 | 16A3 |
| 0001514560 | 0906 | 45A3 | 0C06 | 46A3 | 6006 | 47A3 | 7A06 | 4AA3 |
| 0001514600 | 7D06 | 4BA3 | D106 | 4CA3 | EB06 | 50A3 | EE06 | 51A3 |
| 0001514620 | 0606 | 52A4 | 0906 | 55A4 | 0C06 | 56A4 | 4506 | 57A4 |
| 0001514640 | 4806 | 5CA4 | 4B06 | 5DA4 | 5A06 | 61A4 | 6706 | 62A4 |
| 0001514660 | BB06 | 64A4 | E206 | 66A4 | EB06 | 6AA4 | EE06 | 6BA4 |
| 0001514700 | 4206 | 6DA5 | 6006 | 6FA5 | 6906 | 70A5 | 6C06 | 71A5 |
| 0001514720 | B206 | 75A5 | B506 | 78A5 | CB06 | 7AA5 | DB06 | 7BA5 |
| 0001514740 | DF06 | 7DA5 | E206 | 7EA5 | F806 | 7FA5 | 0E06 | 80A6 |
| 0001514760 | 2606 | 82A6 | 3406 | 83A6 | 3A06 | 84A6 | 3D06 | 85A6 |
| 0001515000 | 4306 | 8EA6 | 4E06 | 8FA6 | 6106 | 90A6 | 7906 | 92A6 |
| 0001515020 | 8106 | 93A6 | AE06 | 94A6 | AF06 | 95A6 | B206 | 96A6 |
| 0001515040 | B806 | A2A6 | C306 | A3A6 | D306 | A4A6 | 6606 | A6A7 |
| 0001515060 | 7106 | A7A7 | 7D06 | A8A7 | 8506 | ABA7 | 8E06 | ADA7 |
| 0001515100 | 9A06 | AEA7 | 4706 | AFA8 | 5306 | B0A8 | 5B06 | B1A8 |
| 0001515120 | 6106 | B2A8 | 0E06 | B3A9 | 1A06 | B5A9 | 2206 | B6A9 |
| 0001515140 | 4606 | BCA9 | 5106 | BDA9 | 6106 | BEA9 | F406 | BFA9 |
| 0001515160 | 0506 | C0AA | 3706 | 09AA | 6F64 | 665F | 6572 | 2E65 |
| 0001515200 | 0263 | 1B00 | 3600 | 4200 | 37AA | 5200 | 39AA | E400 |
| 0001515220 | 3AAA | EF00 | 3BAA | 4200 | 3EAB | A400 | 3FAB | 0C00 |
| 0001515240 | 40AC | 1A00 | 41AC | 7C00 | 4DAC | 8700 | 4EAC | 9700 |
| 0001515260 | 51AC | 2900 | 54AD | 8800 | 55AD | A700 | 56AD | FA00 |
| 0001515300 | 58AD | 7F00 | 5AAE | FC00 | 5BAE | 8500 | 66AF | 9000 |
| 0001515320 | 67AF | A000 | 6AAF | 3200 | 6DB0 | 9700 | 6EB0 | BC00 |
| 0001515340 | 6FB0 | 0F00 | 71B1 | 9400 | 73B1 | 1100 | 74B2 | 9A00 |
| 0001515360 | 06B2 | 7761 | 616B | 632E | 0002 | 000D | 0036 | B2A6 |
| 0001515400 | 0037 | B2B6 | 003B | B348 | 003C | B39B | 003D | B43C |
| 0001515420 | 003E | B446 | 003F | B44E | 0040 | B4D7 | 0047 | B4E2 |
| 0001515440 | 0048 | B4F2 | 004A | B584 | 004B | B606 | 004C | B6E5 |
| 0001515460 | 7208 | 6E61 | 6F64 | 2E6D | 0263 | 5400 | CF00 | 7400 |
| 0001515500 | D2B6 | 8400 | D3B6 | 8E00 | D5B6 | 9E00 | D6B6 | A100 |
| 0001515520 | D7B6 | A400 | D8B6 | B400 | D9B6 | C400 | DAB6 | FE00 |
| 0001515540 | DBB6 | 0100 | DCB7 | 1600 | DDB7 | 2400 | DFB7 | 4600 |
| 0001515560 | F9B7 | 5100 | FAB7 | 6100 | FCB7 | 7100 | FDB7 | 8B00 |
| 0001515600 | FEB7 | B000 | FFB7 | B900 | 00B7 | C201 | 01B7 | D501 |
| 0001515620 | 03B7 | DE01 | 04B7 | E401 | 05B7 | EA01 | 07B7 | F001 |
| 0001515640 | 08B7 | F301 | 09B7 | FC01 | 0AB7 | 0201 | 0BB8 | 0801 |
| 0001515660 | 0DB8 | 0E01 | 0EB8 | 1101 | 0FB8 | 1B01 | 10B8 | 2101 |
| 0001515700 | 11B8 | 2701 | 13B8 | 2D01 | 14B8 | 3001 | 15B8 | 3A01 |
| 0001515720 | 16B8 | 4001 | 17B8 | 4601 | 19B8 | 4C01 | 1AB8 | 4F01 |
| 0001515740 | 1BB8 | 5501 | 1CB8 | 5B01 | 21B8 | 6101 | 22B8 | 7101 |
| 0001515760 | 23B8 | 8601 | 24B8 | 9101 | 25B8 | AB01 | 26B8 | D001 |
| 0001516000 | 27B8 | D901 | 3BB8 | E401 | 3CB8 | F401 | 3DB8 | 0001 |
| 0001516020 | 3EB9 | 1501 | 3FB9 | 2A01 | 41B9 | 3A01 | 42B9 | 5401 |
| 0001516040 | 43B9 | 7901 | 49B9 | 7E01 | 4AB9 | 8201 | 4BB9 | 8B01 |
| 0001516060 | 4CB9 | 9401 | 4FB9 | 9701 | 50B9 | A701 | 51B9 | BC01 |
| 0001516100 | 52B9 | CC01 | 53B9 | D601 | 54B9 | EA01 | 56B9 | 0701 |
| 0001516120 | 57BA | 1C01 | 58BA | 2501 | 6FBA | 3001 | 72BA | 4001 |
| 0001516140 | 73BA | 4A01 | 75BA | 8901 | 76BA | 8C01 | 77BA | A201 |

THU MAR 14 17:52:34 1991 TSLINT.DLL PAGE 383, LINE 22539

| | | | | | | | | |
|---|---|---|---|---|---|---|---|---|
| 0001516160 | 78BA | BE01 | 79BA | CF01 | 7ABA | DD01 | 7CBA | E201 |
| 0001516200 | 7DBA | E501 | 80BA | 0401 | 81BB | 0D01 | 08BB | 6C61 |
| 0001516220 | 6F6C | 6163 | 632E | 0002 | 001E | 005B | BB18 | 0060 |
| 0001516240 | BB28 | 0062 | BB34 | 0064 | BB3E | 0066 | BB43 | 0067 |
| 0001516260 | BB46 | 0068 | BB52 | 0069 | BB58 | 006A | BB5B | 006B |
| 0001516300 | BB61 | 0095 | BB6C | 0097 | BB7C | 009A | BB85 | 009B |
| 0001516320 | BB8F | 00A4 | BB94 | 00A6 | BBAC | 00A8 | BBDE | 00AA |
| 0001516340 | BBEE | 00AC | BBFC | 00AE | BC08 | 00AF | BC0B | 00B1 |
| 0001516360 | BC11 | 00B4 | BC1E | 00B5 | BC27 | 00BA | BC30 | 00BD |
| 0001516400 | BC45 | 00BE | BC56 | 00C0 | BC67 | 00C4 | BC74 | 00C6 |
| 0001516420 | BC80 | 7407 | 6C73 | 7865 | 632E | 0002 | 0164 | 00C7 |
| 0001516440 | BC8C | 00C8 | BC9C | 00CB | BCB3 | 00CD | BCB8 | 00CE |
| 0001516460 | BCC7 | 00CF | BCCA | 00D0 | BCCD | 00D2 | BCD3 | 00D4 |
| 0001516500 | BCD9 | 00D6 | BCDF | 00D8 | BCE5 | 00DA | BCEB | 00DC |
| 0001516520 | BCF1 | 00DD | BD00 | 00DE | BD03 | 00DF | BD06 | 00E1 |
| 0001516540 | BD0C | 00E3 | BD12 | 00E4 | BD18 | 00EE | BD1E | 00EF |
| 0001516560 | BD24 | 00F1 | BD29 | 00F2 | BD35 | 00F3 | BD5C | 00F4 |
| 0001516600 | BD60 | 00F5 | BD66 | 00F6 | BD69 | 00F7 | BD6F | 00F9 |
| 0001516620 | BD72 | 00FA | BD75 | 00FD | BD7B | 00FE | BD8A | 0100 |
| 0001516640 | BD8D | 0102 | BD90 | 0103 | BDB1 | 0104 | BDBB | 0105 |
| 0001516660 | BDC0 | 0106 | BDCD | 0107 | BDD2 | 0108 | BDD5 | 0109 |
| 0001516700 | BDDA | 010A | BDDD | 010B | BDE3 | 010D | BDE6 | 010E |
| 0001516720 | BDE9 | 0111 | BDEE | 0112 | BDF3 | 0113 | BE5E | 0130 |
| 0001516740 | BE69 | 0131 | BE79 | 013A | BF0C | 013B | BF12 | 0147 |
| 0001516760 | BF17 | 0148 | BF21 | 0149 | BF27 | 014D | BF3B | 0152 |
| 0001517000 | BF4D | 0154 | BF5B | 0159 | BF7A | 015A | BF8A | 015B |
| 0001517020 | BFE0 | 015D | C037 | 015E | C040 | 015F | C094 | 0161 |
| 0001517040 | C111 | 0162 | C11D | 0163 | C171 | 0164 | C17C | 0166 |
| 0001517060 | C181 | 0167 | C18D | 0168 | C1E1 | 0169 | C1E6 | 016A |
| 0001517100 | C1F1 | 016C | C26E | 016E | C27A | 016F | C2CE | 0170 |
| 0001517120 | C322 | 0173 | C32E | 0174 | C331 | 0175 | C34E | 0178 |
| 0001517140 | C362 | 0179 | C371 | 0183 | C378 | 0184 | C392 | 0185 |
| 0001517160 | C3B6 | 0187 | C3BB | 0188 | C3DA | 0189 | C3E6 | 018A |
| 0001517200 | C3EC | 018B | C402 | 018C | C405 | 018E | C408 | 018F |
| 0001517220 | C411 | 0190 | C42B | 0192 | C431 | 0194 | C43A | 0195 |
| 0001517240 | C443 | 0196 | C44F | 0197 | C455 | 0198 | C47A | 019C |
| 0001517260 | C47D | 019D | C48F | 019E | C498 | 019F | C4A1 | 01A3 |
| 0001517300 | C4A4 | 01A4 | C4DA | 01A5 | C4E3 | 01A7 | C4E6 | 01A9 |
| 0001517320 | C500 | 01AB | C521 | 01AE | C59E | 01AF | C5A7 | 01B2 |
| 0001517340 | C5AA | 01B3 | C5CE | 01B4 | C5DA | 01B8 | C5DD | 01B9 |
| 0001517360 | C5EF | 01BA | C5F8 | 01BB | C601 | 01BC | C604 | 01BD |
| 0001517400 | C607 | 01CB | C60A | 01CC | C615 | 01D0 | C68F | 01D1 |
| 0001517420 | C69A | 01D4 | C714 | 01D5 | C726 | 01D6 | C731 | 01D7 |
| 0001517440 | C73A | 01D8 | C78E | 01D9 | C80B | 01DB | C820 | 01DC |
| 0001517460 | C833 | 01DD | C83E | 01DE | C848 | 01DF | C89C | 01E0 |
| 0001517500 | C919 | 01E1 | C91C | 01E2 | C927 | 01E3 | C930 | 01E6 |
| 0001517520 | C9AD | 01E7 | C9B8 | 01EA | CA32 | 01EB | CA44 | 01EC |
| 0001517540 | CA4F | 01ED | CA58 | 01EE | CAAC | 01F0 | CB29 | 01F1 |
| 0001517560 | CB34 | 01F4 | CBAE | 01F5 | CBC0 | 01F6 | CBCB | 01F7 |
| 0001517600 | CBD4 | 01F8 | CC28 | 01FA | CCA5 | 01FB | CCB0 | 01FE |
| 0001517620 | CD2A | 01FF | CD3C | 0200 | CD47 | 0201 | CD50 | 0202 |
| 0001517640 | CDA4 | 0204 | CE21 | 0205 | CE2C | 0208 | CEA6 | 0209 |
| 0001517660 | CEB8 | 020A | CEC3 | 020B | CECC | 020C | CF20 | 020E |
| 0001517700 | CF9D | 020F | CFAF | 0210 | CFBA | 0211 | CFC3 | 0212 |
| 0001517720 | D017 | 0214 | D094 | 0215 | D09F | 0218 | D119 | 0219 |
| 0001517740 | D12B | 021A | D136 | 021B | D13F | 021C | D193 | 021E |
| 0001517760 | D210 | 021F | D222 | 0220 | D22D | 0221 | D236 | 0222 |
| 0001520000 | D28A | 0224 | D307 | 0225 | D312 | 0228 | D38C | 0229 |
| 0001520020 | D39E | 022A | D3A9 | 022B | D3B2 | 022C | D406 | 022E |

THU MAR 14 17:52:34 1991 TSLINT.DLL PAGE 384, LINE 22598

| | | | | | | | | |
|---|---|---|---|---|---|---|---|---|
| 0001520040 | D483 | 022F | D48E | 0232 | D493 | 0233 | D4A5 | 0234 |
| 0001520060 | D4B0 | 0235 | D4B9 | 0236 | D50D | 0238 | D58A | 0239 |
| 0001520100 | D595 | 023A | D5E9 | 023D | D666 | 023E | D678 | 023F |
| 0001520120 | D683 | 0240 | D68C | 0241 | D6E0 | 0242 | D75D | 0243 |
| 0001520140 | D772 | 0244 | D77D | 0245 | D786 | 0246 | D7DA | 0248 |
| 0001520160 | D857 | 0249 | D862 | 024C | D8DC | 024D | D8E7 | 024E |
| 0001520200 | D93B | 0251 | D9B8 | 0254 | DA32 | 0255 | DA44 | 0257 |
| 0001520220 | DA61 | 0258 | DA80 | 025B | DA83 | 025C | DA8F | 025F |
| 0001520240 | DA95 | 0260 | DAB0 | 0261 | DB04 | 0262 | DB81 | 0263 |
| 0001520260 | DB9F | 0264 | DBA2 | 0267 | DBA8 | 0268 | DBBA | 0269 |
| 0001520300 | DBC5 | 026A | DBCE | 026B | DC22 | 026D | DC9F | 026E |
| 0001520320 | DCB1 | 026F | DCBC | 0270 | DCC5 | 0271 | DD19 | 027A |
| 0001520340 | DD96 | 0280 | DDF6 | 0281 | DE01 | 0290 | DE7B | 0291 |
| 0001520360 | DE83 | 0292 | DE86 | 0293 | DE89 | 0294 | DE8C | 0295 |
| 0001520400 | DEA7 | 0297 | DEAC | 0298 | DEB5 | 0299 | DEB8 | 029A |
| 0001520420 | DEBB | 029D | DEBE | 029E | DEC8 | 029F | DECB | 02A1 |
| 0001520440 | DECF | 02A2 | DEF5 | 02A3 | DEF6 | 02AE | DEF9 | 02B0 |
| 0001520460 | DEFC | 02B1 | DEFF | 02B2 | DF30 | 02B5 | DF33 | 02B6 |
| 0001520500 | DF4F | 02B7 | DF7E | 02B8 | DFEA | 02BB | E067 | 02BC |
| 0001520520 | E079 | 02BD | E084 | 02BE | E0A0 | 02C0 | E0A8 | 02C1 |
| 0001520540 | E0CC | 02C2 | E0CF | 02C3 | E0D7 | 02C4 | E0E0 | 02C5 |
| 0001520560 | E0ED | 02C6 | E0F0 | 02C7 | E0F3 | 02C8 | E147 | 02CA |
| 0001520600 | E1C4 | 02CB | E218 | 02CE | E295 | 02CF | E2A7 | 02D0 |
| 0001520620 | E2B2 | 02D1 | E2CE | 02D3 | E2D6 | 02D4 | E2FA | 02D5 |
| 0001520640 | E2FD | 02D6 | E305 | 02D7 | E30E | 02D8 | E31B | 02D9 |
| 0001520660 | E31E | 02DA | E321 | 02DB | E375 | 02DD | E3F2 | 02DE |
| 0001520700 | E3FD | 02DF | E477 | 02E1 | E56A | 02E2 | E57C | 02E3 |
| 0001520720 | E589 | 02E4 | E5DD | 02E8 | E65A | 02E9 | E68C | 02EC |
| 0001520740 | E68F | 02ED | E733 | 02EE | E750 | 02F1 | E757 | 02F2 |
| 0001520760 | E75C | 02F3 | E761 | 02F6 | E76C | 02F9 | E77A | 02FA |
| 0001521000 | E7A6 | 02FC | E7E0 | 02FD | E7EA | 02FE | E7F1 | 02FF |
| 0001521020 | E7FE | 0300 | E805 | 0302 | E808 | 0303 | E873 | 0304 |
| 0001521040 | E88F | 0305 | E8B7 | 0306 | E8BA | 0307 | E8D4 | 0308 |
| 0001521060 | E8F8 | 0309 | E95A | 030C | E97E | 030D | E981 | 0314 |
| 0001521100 | E99C | 0315 | E9C7 | 0318 | E9CC | 031A | EA6A | 031D |
| 0001521120 | EA6D | 031E | EA80 | 031F | EA9C | 0320 | EAFE | 0321 |
| 0001521140 | EB7B | 033A | EB86 | 033B | EB96 | 033C | EC29 | 033D |
| 0001521160 | EC7D | 033E | EC97 | 033F | ECF9 | 0359 | ED04 | 035A |
| 0001521200 | ED14 | 035B | EDA7 | 035C | EDBB | 035D | EE1E | 037A |
| 0001521220 | EE29 | 037B | EE39 | 0380 | EECC | 0381 | EEE7 | 0382 |
| 0001521240 | EEF7 | 0388 | EF5A | 0389 | EF6B | 038A | EFCE | 7409 |
| 0001521260 | 6C73 | 6168 | 6873 | 632E | 0003 | 00A2 | 005D | 0000 |
| 0001521300 | 005E | 0010 | 0061 | 00A2 | 0062 | 00B6 | 0064 | 00CF |
| 0001521320 | 0066 | 00DA | 0068 | 013C | 0079 | 0147 | 007A | 0157 |
| 0001521340 | 007F | 01E9 | 0081 | 01F6 | 0083 | 01FC | 0084 | 01FF |
| 0001521360 | 0085 | 020B | 0086 | 022A | 0087 | 0230 | 0089 | 0236 |
| 0001521400 | 008A | 0246 | 008B | 0259 | 008C | 0275 | 008D | 028D |
| 0001521420 | 008E | 0294 | 008F | 02A5 | 0090 | 0361 | 0091 | 037B |
| 0001521440 | 0092 | 0386 | 0094 | 03A0 | 0096 | 0401 | 0098 | 040C |
| 0001521460 | 0099 | 04A0 | 00A4 | 04AB | 00A9 | 04BB | 00AA | 04EC |
| 0001521500 | 00AB | 04EF | 00AC | 04F5 | 00AD | 051B | 00AE | 0526 |
| 0001521520 | 00AF | 0571 | 00B0 | 057F | 00B1 | 058F | 00B2 | 0592 |
| 0001521540 | 00B3 | 059B | 00C1 | 05A6 | 00C2 | 05B9 | 00C4 | 05BC |
| 0001521560 | 00C5 | 05C7 | 00C7 | 05DC | 00C8 | 05F5 | 00C9 | 05FA |
| 0001521600 | 00D5 | 0605 | 00D6 | 0615 | 00D9 | 06A8 | 00DB | 06B3 |
| 0001521620 | 00DF | 06B9 | 00E0 | 06CC | 00E1 | 06DC | 00E6 | 06FA |
| 0001521640 | 00E7 | 0716 | 00E9 | 0734 | 00EA | 073F | 00EB | 0755 |
| 0001521660 | 00ED | 076E | 00EE | 0779 | 00EF | 0803 | 00FB | 080E |
| 0001521700 | 00FC | 081E | 0103 | 08B1 | 0104 | 08C1 | 0105 | 08F2 |

THU MAR 14 17:52:34 1991 TSLINT.DLL PAGE 385, LINE 22657

| | | | | | | | | |
|---|---|---|---|---|---|---|---|---|
| 0001521720 | 0106 | 08F5 | 0107 | 08FB | 0108 | 091A | 0109 | 0948 |
| 0001521740 | 010A | 0993 | 010B | 09A7 | 010D | 09B5 | 010E | 0A47 |
| 0001521760 | 010F | 0A50 | 0110 | 0ADF | 0112 | 0B42 | 0113 | 0B4E |
| 0001522000 | 0114 | 0B51 | 0115 | 0BB4 | 011B | 0BBF | 011C | 0BCF |
| 0001522020 | 0120 | 0C62 | 0121 | 0C8D | 0123 | 0CA0 | 0124 | 0D03 |
| 0001522040 | 012E | 0D0E | 012F | 0D1E | 0132 | 0DB1 | 0134 | 0DBC |
| 0001522060 | 0136 | 0DC2 | 0137 | 0DD2 | 0138 | 0DE2 | 0139 | 0DEF |
| 0001522100 | 013B | 0E03 | 013D | 0E0E | 013E | 0EC0 | 0147 | 0ECB |
| 0001522120 | 0148 | 0EDB | 0149 | 0F6E | 014C | 0F79 | 014E | 0F7F |
| 0001522140 | 0150 | 0FA0 | 0152 | 0FD8 | 0153 | 0FE3 | 0154 | 106D |
| 0001522160 | 0172 | 1078 | 0173 | 1088 | 0177 | 111B | 0178 | 112C |
| 0001522200 | 0179 | 113B | 017A | 1203 | 017B | 121C | 017C | 12A6 |
| 0001522220 | 0188 | 12B1 | 0189 | 12C1 | 018D | 1354 | 018E | 1365 |
| 0001522240 | 018F | 1375 | 0190 | 1386 | 0191 | 1410 | 019D | 141B |
| 0001522260 | 019E | 142B | 01A2 | 14BE | 01A3 | 14CF | 01A4 | 14DF |
| 0001522300 | 01A6 | 14F0 | 01A7 | 157A | 01B3 | 1585 | 01B4 | 1595 |
| 0001522320 | 01B8 | 1628 | 01B9 | 1638 | 01BA | 1648 | 01BC | 1651 |
| 0001522340 | 01BD | 16DB | 01C6 | 16E6 | 01C7 | 16F6 | 01CC | 1789 |
| 0001522360 | 01CD | 182B | 01CE | 183B | 01CF | 184B | 01D0 | 185C |
| 0001522400 | 01D1 | 186D | 01D2 | 187E | 01D3 | 1908 | 01DF | 1913 |
| 0001522420 | 01E0 | 1923 | 01E4 | 19B6 | 01E5 | 19C2 | 01E6 | 19D2 |
| 0001522440 | 01E7 | 19E6 | 01E8 | 19F7 | 01E9 | 1A81 | 01FE | 1A8C |
| 0001522460 | 01FF | 1A9C | 0201 | 1B2F | 0202 | 1B8F | 0203 | 1B99 |
| 0001522500 | 0204 | 1C23 | 630A | 6D6F | 6772 | 7865 | 2E70 | 0363 |
| 0001522520 | 4F00 | 3500 | 2E00 | 361C | 3E00 | 3A1C | D000 | 3B1C |
| 0001522540 | 7100 | 3C1D | 8300 | 3D1D | 3800 | 3E1E | 4100 | 401E |
| 0001522560 | FB00 | 411E | 1300 | 421F | 2200 | 431F | 2500 | 441F |
| 0001522600 | 3200 | 451F | 5F00 | 461F | 7C00 | 471F | A400 | 481F |
| 0001522620 | 2D00 | 5120 | 3800 | 5520 | 4800 | 5620 | 6C00 | 5720 |
| 0001522640 | 7800 | 5820 | 8400 | 5A20 | 8900 | 5B20 | 9800 | 5C20 |
| 0001522660 | 9B00 | 5D20 | 9E00 | 5E20 | A800 | 6020 | AB00 | 6120 |
| 0001522700 | B500 | 6320 | B800 | 6420 | C200 | 6620 | C500 | 6720 |
| 0001522720 | CF00 | 6920 | D200 | 6A20 | DC00 | 6C20 | DF00 | 6D20 |
| 0001522740 | E900 | 6F20 | EC00 | 7020 | FB00 | 7120 | FE00 | 7220 |
| 0001522760 | 0100 | 7321 | 0B00 | 7521 | 0E00 | 7621 | 1D00 | 7721 |
| 0001523000 | 2000 | 7821 | 2300 | 7A21 | 2600 | 7B21 | 3A00 | 7C21 |
| 0001523020 | 4400 | 7D21 | 4700 | 7E21 | 5100 | 7F21 | 5600 | 8021 |
| 0001523040 | 6300 | 8121 | 6800 | 8221 | 6B00 | 8321 | 7000 | 8421 |
| 0001523060 | 7300 | 8621 | 7E00 | 9021 | 8100 | 9121 | 8400 | 9321 |
| 0001523100 | 8900 | 9421 | 9500 | 9521 | B100 | 9621 | B400 | 9721 |
| 0001523120 | B900 | 9821 | BC00 | 9921 | BF00 | 9A21 | C200 | 9C21 |
| 0001523140 | CD00 | 9F21 | D000 | A021 | DA00 | A121 | E500 | A221 |
| 0001523160 | E800 | A321 | 4B00 | A422 | 5A00 | A522 | 5D00 | A622 |
| 0001523200 | 6000 | A722 | 6F00 | A822 | 7200 | A922 | 9700 | 0922 |
| 0001523220 | 7374 | 696C | 696E | 2E74 | 0363 | 2D00 | 5300 | A200 |
| 0001523240 | 5422 | B200 | 5A22 | 4400 | 5F23 | 4900 | 6023 | 9C00 |
| 0001523260 | 6123 | EF00 | 6223 | FB00 | 6323 | 5500 | 6624 | A800 |
| 0001523300 | 6924 | B200 | 6D24 | BC00 | 6E24 | D700 | 6F24 | ED00 |
| 0001523320 | 7024 | F800 | 7124 | 0600 | 7325 | 1100 | 7525 | 3500 |
| 0001523340 | 7625 | 8800 | 7725 | 8D00 | 7925 | E000 | 7A25 | 3300 |
| 0001523360 | 7B26 | 3800 | 7C26 | 8B00 | 7D26 | 9000 | 7E26 | 9500 |
| 0001523400 | 7F26 | 9A00 | 8026 | A500 | 8226 | B700 | 8326 | C200 |
| 0001523420 | 8426 | CD00 | 8526 | D800 | 8826 | E300 | 8926 | EE00 |
| 0001523440 | 8A26 | F900 | 8B26 | 0400 | 8D27 | 0F00 | 8F27 | 1D00 |
| 0001523460 | 9B27 | 2700 | 9C27 | 8A00 | B227 | 9500 | B327 | A500 |
| 0001523500 | B527 | 3800 | B628 | 4B00 | B828 | 5E00 | B928 | C100 |
| 0001523520 | 0828 | 7374 | 706C | 6275 | 632E | 0003 | 0010 | 0050 |
| 0001523540 | 28CC | 0051 | 28E2 | 0053 | 2974 | 0054 | 2980 | 0056 |
| 0001523560 | 2A08 | 0058 | 2A1A | 0059 | 2A26 | 005D | 2AA2 | 005E |

THU MAR 14 17:52:34 1991 TSLINT.DLL PAGE 386, LINE 22716

| | | | | | | | | |
|---|---|---|---|---|---|---|---|---|
| 0001523600 | 2AD2 | 0060 | 2B4E | 0062 | 2BCA | 007E | 2BD6 | 007F |
| 0001523620 | 2BEC | 0081 | 2C7E | 0083 | 2C91 | 0084 | 2CF4 | 7408 |
| 0001523640 | 6C73 | 6E69 | 2E74 | 0363 | 3100 | B902 | 0200 | BA2D |
| 0001523660 | 1200 | BD2D | A500 | CC2D | AD00 | CD2D | B800 | CF2D |
| 0001523700 | 3500 | D52E | 9B00 | D62E | 0000 | D72F | 0F00 | D92F |
| 0001523720 | 8200 | DA2F | 8C00 | DB2F | 9A00 | DC2F | A400 | DE2F |
| 0001523740 | AA00 | E02F | B400 | E12F | 0800 | E230 | 3300 | E530 |
| 0001523760 | 4300 | E630 | 9700 | EA30 | A800 | EB30 | D100 | EC30 |
| 0001524000 | 3000 | F431 | 4000 | F531 | 4500 | F631 | 4D00 | F731 |
| 0001524020 | 5500 | F831 | 6200 | 0331 | 7601 | 0431 | 7901 | 0631 |
| 0001524040 | 8C01 | 0831 | 8F01 | 0A31 | 0C01 | 0B32 | 8901 | 0C32 |
| 0001524060 | A201 | 0D32 | AD01 | 0E32 | B001 | 0F32 | B301 | 1232 |
| 0001524100 | B601 | 1332 | 0A01 | 1433 | 3501 | 1533 | 9301 | 1633 |
| 0001524120 | A501 | 1733 | A801 | 1A33 | AB01 | 1B33 | 0901 | 1C34 |
| 0001524140 | 2301 | 1D34 | 8501 | 1E34 | 9B01 | 1F34 | 9E01 | 2034 |
| 0001524160 | 0101 | 2235 | 1801 | 2535 | 1B01 | 2735 | 3901 | 2835 |
| 0001524200 | 9701 | 2935 | B101 | 2B35 | C201 | 2C35 | 2101 | 2D36 |
| 0001524220 | 3401 | 2F36 | 3701 | 3136 | 3A01 | 3236 | 5801 | 3436 |
| 0001524240 | D501 | 3536 | E801 | 3636 | 0101 | 3737 | 1E01 | 3837 |
| 0001524260 | 2101 | 3937 | 3F01 | 3C37 | 4201 | 3F37 | 6001 | 4137 |
| 0001524300 | 7101 | 4237 | D001 | 4337 | E301 | 4537 | E601 | 4737 |
| 0001524320 | E901 | 4837 | 0701 | 4A38 | 8401 | 4B38 | 9701 | 4C38 |
| 0001524340 | B001 | 4D38 | 0E01 | 4E39 | 1D01 | 4F39 | 2901 | 5039 |
| 0001524360 | 4301 | 5139 | 6101 | 5439 | 6401 | 5639 | 8201 | 5739 |
| 0001524400 | D601 | 5939 | F001 | 5A39 | 4401 | 5B3A | 6701 | 5D3A |
| 0001524420 | 7801 | 5E3A | CC01 | 613A | DE01 | 623A | 3201 | 633B |
| 0001524440 | 4D01 | 653B | 5001 | 663B | A401 | 673B | C201 | 693B |
| 0001524460 | 3F01 | 6A3C | 5201 | 6B3C | 6B01 | 6C3C | 8801 | 6D3C |
| 0001524500 | 8B01 | 6E3C | A901 | 733C | AC01 | 743C | CA01 | 753C |
| 0001524520 | 3001 | 763D | 5201 | 773D | 6B01 | 783D | 8401 | 793D |
| 0001524540 | B001 | 7A3D | E601 | 7B3D | FD01 | 7C3D | 0201 | 7D3E |
| 0001524560 | 1F01 | 7F3E | 2E01 | 803E | 5A01 | 813E | B801 | 833E |
| 0001524600 | C901 | 843E | 2701 | 863F | 3901 | 893F | 3C01 | 8A3F |
| 0001524620 | 5A01 | 8B3F | 6501 | 8D3F | E201 | 8E3F | F501 | 8F3F |
| 0001524640 | 0E01 | 9040 | 1101 | 9140 | 1C01 | 9240 | 3A01 | 9540 |
| 0001524660 | 3D01 | 9640 | 9101 | 9740 | A001 | 9840 | AC01 | 9940 |
| 0001524700 | 0001 | 9A41 | 1001 | 9D41 | 1301 | 9E41 | 2301 | 9F41 |
| 0001524720 | 3201 | A041 | 3E01 | A141 | 4E01 | A441 | 5101 | A541 |
| 0001524740 | AB01 | A641 | B901 | A941 | BC01 | AA41 | 1001 | AB42 |
| 0001524760 | 2D01 | AF42 | 3001 | B042 | 8A01 | B142 | 9801 | B442 |
| 0001525000 | 9B01 | B542 | EF01 | B642 | FF01 | C042 | 0201 | C143 |
| 0001525020 | 5601 | C243 | 5C01 | C343 | 6701 | C443 | 0001 | C544 |
| 0001525040 | 4601 | C644 | 5601 | C944 | 5901 | CA44 | AD01 | CB44 |
| 0001525060 | 4001 | CC45 | 4A01 | CD45 | 5901 | CE45 | 6501 | CF45 |
| 0001525100 | B901 | D045 | C901 | D445 | CC01 | D545 | 2001 | D646 |
| 0001525120 | B301 | D746 | BD01 | D846 | CC01 | D946 | D801 | DB46 |
| 0001525140 | 2C01 | DC47 | 3C01 | E047 | 3F01 | E147 | 9301 | E847 |
| 0001525160 | 9601 | E947 | EA01 | EA47 | 5A01 | EB48 | 9C01 | EC48 |
| 0001525200 | 9F01 | EE48 | 1701 | EF49 | 9401 | 0649 | 9F02 | 0749 |
| 0001525220 | AF02 | 1149 | 4202 | 124A | 4F02 | 134A | 6702 | 144A |
| 0001525240 | 7602 | 164A | 8002 | 174A | DA02 | 184A | B102 | 1B4B |
| 0001525260 | 1002 | 1C4C | 6A02 | 1D4C | 4102 | 204D | A002 | 214D |
| 0001525300 | FA02 | 254D | E402 | 264E | 3E02 | 294F | E402 | 2A4F |
| 0001525320 | 3E02 | 2D50 | D802 | 2E50 | 3202 | 3151 | 2402 | 3252 |
| 0001525340 | 7E02 | 3652 | 1802 | 3753 | 7202 | 3A53 | 0C02 | 3B54 |
| 0001525360 | 6602 | 4054 | 1E02 | 4155 | 7802 | 4255 | 9502 | 4B55 |
| 0001525400 | 2D02 | 4C56 | 8702 | 4D56 | 9D02 | 4E56 | A802 | 4F56 |
| 0001525420 | B602 | 5256 | 4802 | 5357 | A202 | 5457 | 4002 | 5558 |
| 0001525440 | 8602 | 5858 | 2C02 | 5959 | 8602 | 5A59 | A002 | 5B59 |

THU MAR 14 17:52:34 1991 TSLINT.DLL PAGE 387, LINE 22775

| | | | | | | | | |
|---|---|---|---|---|---|---|---|---|
| 0001525460 | 0202 | 5D5A | 8202 | 5E5B | E502 | 625B | 6702 | 635D |
| 0001525500 | C102 | 645D | 4D02 | 655E | 5E02 | 675E | 7302 | 6B5E |
| 0001525520 | CA02 | 6C5E | 3402 | 6E5F | 6C02 | 705F | 6F02 | 715F |
| 0001525540 | 3A02 | 7260 | 4502 | 7560 | 5802 | 7660 | 8802 | 7760 |
| 0001525560 | B902 | 7860 | E102 | 7D60 | FE02 | 8160 | 1B02 | 8261 |
| 0001525600 | 7502 | 8361 | F902 | 8461 | 1302 | 8562 | 2B02 | 8662 |
| 0001525620 | 3002 | 8762 | 3F02 | 8862 | 6B02 | 8962 | 7602 | 9662 |
| 0001525640 | 0802 | 9763 | A202 | 9E63 | 4202 | 9F64 | C502 | A164 |
| 0001525660 | 4902 | A365 | 5302 | A465 | AD02 | A565 | C102 | A765 |
| 0001525700 | D502 | A865 | E502 | A965 | ED02 | AA65 | 0202 | AB65 |
| 0001525720 | 0A02 | AC66 | CB02 | AD66 | F002 | AE66 | 1E02 | AF67 |
| 0001525740 | 30G2 | B067 | 5802 | B167 | 8002 | B967 | 0A02 | BA68 |
| 0001525760 | 2102 | BB68 | 4902 | BC68 | 7102 | BE68 | 7B02 | BF68 |
| 0001526000 | D502 | C168 | 9D02 | C269 | F702 | C469 | BD02 | C56A |
| 0001526020 | 1702 | C76B | F302 | C86B | 4D02 | CA6C | 2902 | CB6D |
| 0001526040 | 8302 | CD6D | 5F02 | CE6E | B902 | CF6E | 9502 | D06F |
| 0001526060 | B702 | D16F | BA02 | D36F | D802 | D46F | E602 | D66F |
| 0001526100 | F402 | D86F | FE02 | D96F | 5802 | DA70 | 9402 | DB70 |
| 0001526120 | BC02 | DC70 | E402 | DF70 | 8A02 | E071 | E402 | E171 |
| 0001526140 | 0002 | E272 | 2802 | E372 | 5002 | E672 | F602 | E772 |
| 0001526160 | 5002 | E873 | 6502 | E973 | 8D02 | EA73 | A802 | EB73 |
| 0001526200 | D002 | EC73 | 7E02 | ED74 | 8102 | EE74 | 9B02 | EF74 |
| 0001526220 | C302 | F374 | 6902 | F475 | C302 | F575 | D802 | F675 |
| 0001526240 | 0002 | F776 | 1B02 | F876 | 4302 | FA76 | F102 | FB76 |
| 0001526260 | 0E02 | FC77 | 2602 | FD77 | 4002 | FE77 | 6802 | 0177 |
| 0001526300 | 0E03 | 0278 | 6803 | 0378 | 8403 | 0478 | AC03 | 0578 |
| 0001526320 | D403 | 0878 | 7A03 | 0979 | D403 | 0A79 | F003 | 0B79 |
| 0001526340 | 1803 | 0C7A | 4003 | 0F7A | E603 | 107A | F903 | 117A |
| 0001526360 | 3103 | 127B | B703 | 2C7B | C203 | 2D7B | D203 | 2F7B |
| 0001526400 | 6503 | 327C | 7503 | 337C | 8203 | 357C | 9503 | 367C |
| 0001526420 | B303 | 377C | D103 | 387C | DF03 | 3A7C | 4203 | 3B7D |
| 0001526440 | 4F03 | 3C7D | 6D03 | 3E7D | D003 | 3F7D | EA03 | 407D |
| 0001526460 | 7C03 | 417E | 8C03 | 427E | 9403 | 437E | 9C03 | 447E |
| 0001526500 | A403 | 457E | B203 | 467E | 1503 | 527F | 2003 | 537F |
| 0001526520 | 3003 | 587F | C303 | 597F | CE03 | 5B7F | 4B03 | 6980 |
| 0001526540 | 5803 | 6A80 | 6503 | 6B80 | 8203 | 6C80 | FF03 | 6D80 |
| 0001526560 | 0203 | 6F81 | 0B03 | 7081 | 2903 | 7181 | 3203 | 7981 |
| 0001526600 | AF03 | 7A81 | 2E03 | 7B82 | 3B03 | 7C82 | 4903 | 7D82 |
| 0001526620 | 4C03 | 7E82 | 7503 | 7F82 | 9D03 | 8082 | 1B03 | 9D83 |
| 0001526640 | 2603 | 9E83 | 3603 | 9F83 | 4203 | A183 | 4803 | A283 |
| 0001526660 | 5403 | A383 | 5703 | A483 | 6303 | A683 | 6903 | A783 |
| 0001526700 | 8803 | A883 | 8E03 | A983 | A103 | AA83 | A703 | AB83 |
| 0001526720 | B303 | AC83 | B603 | AD83 | C903 | B283 | CF03 | B383 |
| 0001526740 | E703 | B483 | EA03 | B583 | 0203 | B684 | 0503 | B784 |
| 0001526760 | 1803 | B884 | 1E03 | B984 | 3103 | C084 | 3703 | C184 |
| 0001527000 | 4503 | DE84 | 5003 | E384 | 6003 | E484 | 7603 | E584 |
| 0001527020 | 7C03 | E684 | 8903 | E784 | 9603 | E884 | B203 | E984 |
| 0001527040 | D003 | EA84 | FB03 | EB84 | FE03 | EC84 | 1203 | EE85 |
| 0001527060 | 1503 | EF85 | 3003 | F085 | 3603 | F185 | 5103 | F285 |
| 0001527100 | 5703 | F485 | 5D03 | F585 | 6A03 | F685 | 8503 | F785 |
| 0001527120 | B003 | F885 | B303 | F985 | C703 | FB85 | CA03 | FC85 |
| 0001527140 | E503 | FD85 | EB03 | FE85 | 0603 | FF86 | 0C03 | 0186 |
| 0001527160 | 1204 | 0686 | 4804 | 0786 | 6504 | 0886 | 8D04 | 0986 |
| 0001527200 | A804 | 0A86 | AE04 | 0B86 | C904 | 0C86 | CF04 | 1086 |
| 0001527220 | D504 | 1186 | DF04 | 1286 | E904 | 1386 | F204 | 1486 |
| 0001527240 | FB04 | 1586 | 0104 | 1687 | 0404 | 1787 | 0A04 | 1887 |
| 0001527260 | 1604 | 1987 | 1C04 | 1A87 | 4C04 | 1B87 | 6004 | 1C87 |
| 0001527300 | 7704 | 1D87 | 7D04 | 4187 | 8804 | 4287 | 9804 | 4987 |
| 0001527320 | 2B04 | 4A88 | 4504 | 4C88 | 6604 | 4F88 | 7004 | 5188 |

THU MAR 14 17:52:34 1991 TSLINT.DLL PAGE 388, LINE 22834

| | | | | | | | | |
|---|---|---|---|---|---|---|---|---|
| 0001527340 | CA04 | 5288 | 0C04 | 5389 | 1104 | 5489 | 2004 | 5589 |
| 0001527360 | 4C04 | 5689 | 5704 | 5A89 | 6404 | 5C89 | BE04 | 5D89 |
| 0001527400 | 0004 | 5E8A | 0504 | 5F8A | 1404 | 608A | 4004 | 618A |
| 0001527420 | 4B04 | 628A | 6204 | 648A | 8204 | 658A | 1804 | 668B |
| 0001527440 | 5E04 | 688B | 6804 | 698B | C204 | 6A8B | 0204 | 6D8C |
| 0001527460 | 0504 | 6E8C | 5F04 | 6F8C | 8704 | 728C | 8A04 | 738C |
| 0001527500 | E404 | 748C | 0C04 | 778D | 0F04 | 788D | 6904 | 798D |
| 0001527520 | 8404 | 7A8D | 9C04 | 7B8D | B404 | 7C8D | CE04 | 7F8D |
| 0001527540 | D104 | 808D | 2B04 | 818E | 5304 | 848E | 5604 | 858E |
| 0001527560 | B004 | 868E | D804 | 878E | DB04 | 888E | 1504 | 898F |
| 0001527600 | 1A04 | 8A8F | 2904 | 8B8F | 5504 | 8C8F | 6004 | 8D8F |
| 0001527620 | F204 | B08F | FD04 | B18F | 0D04 | B490 | A004 | B590 |
| 0001527640 | F804 | B690 | 0104 | B791 | 0D04 | B991 | 8A04 | BA91 |
| 0001527660 | 8D04 | BB91 | A404 | BD91 | 2104 | D892 | 2C04 | D992 |
| 0001527700 | 3C04 | DB92 | CF04 | DD92 | F904 | DE92 | 0D04 | E193 |
| 0001527720 | 2B04 | E293 | 4104 | E593 | 9504 | E693 | 9A04 | E893 |
| 0001527740 | 9F04 | E993 | 0204 | F694 | 0D04 | F794 | 1D04 | FC94 |
| 0001527760 | B004 | FF94 | CE04 | 0194 | D305 | 0394 | E405 | 0594 |
| 0001530000 | E705 | 0694 | 3B05 | 0795 | 4605 | 0895 | 5105 | 0A95 |
| 0001530020 | 5405 | 0B95 | 7205 | 0D95 | 8205 | 0E95 | D605 | 0F95 |
| 0001530040 | E905 | 1095 | EC05 | 1395 | 0805 | 1696 | 0D05 | 1796 |
| 0001530060 | 1305 | 1896 | 2105 | 1996 | 3605 | 1A96 | 3905 | 1B96 |
| 0001530100 | 8D05 | 1F96 | F305 | 2296 | F905 | 2396 | D405 | 2697 |
| 0001530120 | 1205 | 3597 | 1D05 | 3697 | 2A05 | 3797 | 3605 | 3997 |
| 0001530140 | 3905 | 3C97 | 3E05 | 3E97 | 5C05 | 3F97 | BF05 | 0A97 |
| 0001530160 | 6564 | 7562 | 6767 | 7265 | 632E | 0003 | 008E | 0063 |
| 0001530200 | 97CA | 0066 | 97E0 | 0068 | 9872 | 0069 | 987D | 006B |
| 0001530220 | 98D0 | 006E | 98E9 | 0070 | 9965 | 0082 | 9973 | 0083 |
| 0001530240 | 9989 | 0085 | 9A1C | 0087 | 9A27 | 0088 | 9A8A | 009C |
| 0001530260 | 9A96 | 009D | 9AAC | 009F | 9B3F | 00A1 | 9B4A | 00A3 |
| 0001530300 | 9B4F | 00A4 | 9BB2 | 00B7 | 9BBE | 00B8 | 9BD4 | 00B9 |
| 0001530320 | 9C67 | 00BA | 9C6D | 00BB | 9CD0 | 00E1 | 9CDC | 00E2 |
| 0001530340 | 9CEC | 00EA | 9D7F | 00EB | 9D89 | 00EC | 9E00 | 00ED |
| 0001530360 | 9E77 | 00F1 | 9EE5 | 00F2 | 9EF4 | 00F3 | 9EF9 | 0102 |
| 0001530400 | 9EFE | 0104 | 9F0D | 0105 | 9F1C | 0106 | 9F23 | 0107 |
| 0001530420 | 9F26 | 0108 | 9F2B | 010E | 9F38 | 0110 | 9F43 | 0111 |
| 0001530440 | 9F48 | 0118 | 9F4D | 0119 | 9F57 | 011A | 9F5D | 011B |
| 0001530460 | 9F63 | 0122 | 9FE0 | 0123 | 9FEA | 0131 | A067 | 0132 |
| 0001530500 | A06D | 0133 | A078 | 0136 | A083 | 0137 | A097 | 0142 |
| 0001530520 | A09C | 0143 | A0F0 | 0144 | A106 | 0147 | A183 | 0159 |
| 0001530540 | A1D7 | 015A | A1E6 | 015B | A1EC | 015C | A1F9 | 0161 |
| 0001530560 | A1FE | 0162 | A20D | 0164 | A212 | 0165 | A21F | 0166 |
| 0001530600 | A273 | 0168 | A278 | 0169 | A2F5 | 0180 | A300 | 0182 |
| 0001530620 | A310 | 0185 | A3A3 | 0186 | A3B2 | 018C | A3B7 | 018D |
| 0001530640 | A3C6 | 018E | A3CC | 018F | A3D1 | 0191 | A425 | 0192 |
| 0001530660 | A42F | 0193 | A435 | 0194 | A43A | 0196 | A49D | 0197 |
| 0001530700 | A4B3 | 0198 | A507 | 0199 | A50D | 019A | A513 | 019D |
| 0001530720 | A518 | 019E | A57B | 01A9 | A586 | 01AA | A596 | 01AF |
| 0001530740 | A629 | 01B0 | A634 | 01B3 | A63E | 01B4 | A6BB | 01BB |
| 0001530760 | A6C9 | 01BC | A6D8 | 01BD | A735 | 01BE | A743 | 01C0 |
| 0001531000 | A74A | 01C4 | A7C7 | 01C5 | A7E1 | 01C7 | A85E | 01C8 |
| 0001531020 | A8DB | 01DF | A8E6 | 01E0 | A8F6 | 01E2 | A989 | 01E4 |
| 0001531040 | A999 | 01E5 | A9FC | 01FB | AA07 | 01FD | AA17 | 01FE |
| 0001531060 | AA1D | 01FF | AA28 | 0200 | AA33 | 0201 | AA38 | 021B |
| 0001531100 | AA43 | 021D | AA53 | 021E | AA5E | 021F | AA69 | 0220 |
| 0001531120 | AA6F | 0221 | AA74 | 023B | AA7F | 023C | AA8F | 023D |
| 0001531140 | AA94 | 0241 | AA9A | 0242 | AAA5 | 0243 | AAAA | 0261 |
| 0001531160 | AAB5 | 0262 | AAC5 | 0265 | AB58 | 0267 | AB5D | 0269 |
| 0001531200 | AB6D | 026B | ABD0 | 0287 | ABDB | 0288 | ABEB | 028A |

THU MAR 14 17:52:34 1991 TSLINT.DLL PAGE 389, LINE 22893

| | | | | | | | | |
|---|---|---|---|---|---|---|---|---|
| 0001531220 | AC7E | 028C | AC83 | 028D | AC8E | 028E | AC95 | 0290 |
| 0001531240 | ACA0 | 0291 | ACAF | 0292 | ACBA | 0293 | ACCB | 0295 |
| 0001531260 | ACD2 | 0296 | AD35 | 7408 | 6C73 | 7265 | 2E72 | 0363 |
| 0001531300 | 3A00 | 5300 | 4000 | 54AD | 5000 | 59AD | ED00 | 5AAD |
| 0001531320 | F100 | 5BAD | FA00 | 5CAD | 1400 | 5FAE | 1C00 | 60AE |
| 0001531340 | 2E00 | 61AE | 3800 | 62AE | 4B00 | 63AE | 4E00 | 64AE |
| 0001531360 | 8500 | 65AE | 8E00 | 66AE | D700 | 68AE | DA00 | 69AE |
| 0001531400 | 1000 | 6AAF | 1300 | 6BAF | 3300 | 6EAF | 3700 | 70AF |
| 0001531420 | 6900 | 72AF | 6E00 | 73AF | D500 | 85AF | E000 | 86AF |
| 0001531440 | F000 | 88AF | 8300 | 8AB0 | 9500 | 8BB0 | F800 | 90B0 |
| 0001531460 | 0300 | 91B1 | 1300 | 95B1 | A600 | 96B1 | AF00 | 97B1 |
| 0001531500 | C900 | 98B1 | D100 | 99B1 | DC00 | 9AB1 | 3F00 | 9EB2 |
| 0001531520 | 4A00 | 9FB2 | 5A00 | A2B2 | F300 | A3B2 | FC00 | A4B2 |
| 0001531540 | 1600 | A5B3 | 1E00 | A6B3 | 3600 | A8B3 | 4400 | A9B3 |
| 0001531560 | AB00 | AFB3 | B600 | B0B3 | C600 | B3B3 | 5B00 | B4B4 |
| 0001531600 | 6400 | B5B4 | 7E00 | B6B4 | 8600 | B7B4 | 9E00 | B8B4 |
| 0001531620 | AC00 | B9B4 | B100 | BAB4 | 1700 | C4B5 | 2200 | C5B5 |
| 0001531640 | 3200 | C6B5 | C500 | C7B5 | 4200 | 0AB6 | 7374 | 5F74 |
| 0001531660 | 6163 | 6C6C | 632E | 0003 | 0031 | 004A | B64E | 004B |
| 0001531700 | B65E | 0052 | B6F0 | 0054 | B749 | 0055 | B76A | 005A |
| 0001531720 | B7E7 | 005B | B808 | 005D | B885 | 0068 | B8B8 | 006A |
| 0001531740 | B8E2 | 006C | B95F | 006D | B97E | 006E | B98C | 0070 |
| 0001531760 | B9A1 | 0071 | B9B9 | 0075 | BA36 | 0077 | BA5E | 0078 |
| 0001532000 | BADA | 0094 | BAE5 | 0095 | BAF5 | 009E | BB88 | 00A1 |
| 0001532020 | BBA1 | 00A2 | BBAA | 00A3 | BBB2 | 00A4 | BBB5 | 00A5 |
| 0001532040 | BBC4 | 00A6 | BC42 | 00A8 | BC45 | 00A9 | BC4D | 00AA |
| 0001532060 | BC55 | 00AD | BC5D | 00AE | BCDA | 00C6 | BCE5 | 00C7 |
| 0001532100 | BCF5 | 00C8 | BD05 | 00E1 | BD10 | 00E2 | BD20 | 00E3 |
| 0001532120 | BD39 | 00FF | BD44 | 0100 | BD54 | 0104 | BDE7 | 0106 |
| 0001532140 | BE41 | 010D | BE74 | 010E | BE97 | 0114 | BF15 | 0116 |
| 0001532160 | BF3C | 0118 | BFBA | 011A | BFDF | 011B | C05C | 7407 |
| 0001532200 | 6C73 | 6374 | 632E | 0003 | 00A8 | 004F | C068 | 0050 |
| 0001532220 | C078 | 0058 | C10C | 0063 | C114 | 0069 | C119 | 006F |
| 0001532240 | C179 | 0071 | C1CE | 0072 | C1D9 | 0073 | C1EE | 0074 |
| 0001532260 | C1F6 | 0075 | C1FF | 0076 | C207 | 0079 | C210 | 007A |
| 0001532300 | C223 | 007B | C290 | 007C | C29C | 007E | C309 | 0082 |
| 0001532320 | C373 | 0085 | C3C9 | 0086 | C3D8 | 0088 | C3DF | 0089 |
| 0001532340 | C408 | 008E | C413 | 008F | C424 | 0091 | C47D | 0092 |
| 0001532360 | C4D3 | 0094 | C4E7 | 0095 | C4EF | 0096 | C4F8 | 0097 |
| 0001532400 | C54E | 009A | C5F7 | 009B | C64D | 009E | C659 | 00A0 |
| 0001532420 | C677 | 00A1 | C6B2 | 00A2 | C6C5 | 00A6 | C6D7 | 00A7 |
| 0001532440 | C6E5 | 00A8 | C73E | 00AA | C761 | 00AB | C76F | 00AC |
| 0001532460 | C786 | 00AE | C792 | 00AF | C795 | 00B0 | C7EE | 00B1 |
| 0001532500 | C87A | 00B2 | C89E | 00B3 | C8B1 | 00B5 | C8BF | 00B6 |
| 0001532520 | C8D5 | 00B7 | C8D8 | 00B8 | C8DB | 00BB | C8E8 | 00C0 |
| 0001532540 | C8FF | 00C2 | C90D | 00C3 | C919 | 00C4 | C92B | 00C5 |
| 0001532560 | C943 | 00C6 | C951 | 00C7 | C967 | 00C9 | C96A | 00CB |
| 0001532600 | C96F | 00CC | C97B | 00CD | C98E | 00D0 | C99D | 00D3 |
| 0001532620 | C9BB | 00D4 | C9D1 | 00D5 | C9DC | 00D6 | C9F1 | 00D7 |
| 0001532640 | C9FC | 00D8 | CA11 | 00D9 | CA1C | 00DB | CA23 | 00DD |
| 0001532660 | CA36 | 00DE | CA3F | 00E0 | CA44 | 00E1 | CA53 | 00E2 |
| 0001532700 | CA5E | 00E3 | CA65 | 00E4 | CA6F | 00E5 | CA81 | 00E6 |
| 0001532720 | CA8C | 00E7 | CA99 | 00E8 | CAAB | 00E9 | CAB2 | 00EA |
| 0001532740 | CAB7 | 00EB | CABA | 00EC | CAC9 | 00F2 | CACE | 00F3 |
| 0001532760 | CAE4 | 00F4 | CB3A | 00FA | CB3F | 00FB | CB54 | 00FC |
| 0001533000 | CB63 | 00FF | CB81 | 0100 | CB97 | 0101 | CBA2 | 0102 |
| 0001533020 | CBB7 | 0103 | CBC2 | 0104 | CBD7 | 0107 | CBE2 | 0108 |
| 0001533040 | CBF5 | 0109 | CC04 | 010B | CC10 | 010C | CC66 | 010E |
| 0001533060 | CC74 | 010F | CC89 | 0112 | CC94 | 0113 | CC9F | 0114 |

THU MAR 14 17:52:34 1991 TSLINT.DLL PAGE 390, LINE 22952

| | | | | | | | | |
|---|---|---|---|---|---|---|---|---|
| 0001533100 | CD03 | 0115 | CD2A | 011D | CD35 | 011E | CD3E | 011F |
| 0001533120 | CD4A | 0120 | CD55 | 0121 | CD5C | 0122 | CD5F | 0123 |
| 0001533140 | CD67 | 0126 | CD70 | 0130 | CD7A | 0131 | CD8B | 0132 |
| 0001533160 | CDCB | 0133 | CDDE | 0134 | CDF4 | 0135 | CE10 | 0136 |
| 0001533200 | CE28 | 0138 | CE32 | 0139 | CE4A | 013A | CE4F | 013B |
| 0001533220 | CE5F | 013C | CE62 | 013D | CE70 | 013E | CE86 | 013F |
| 0001533240 | CE9E | 0140 | CEA3 | 0141 | CEB3 | 0142 | CEB6 | 0143 |
| 0001533260 | CEC1 | 0148 | CF48 | 0149 | CF51 | 014A | CF5A | 014D |
| 0001533300 | CF66 | 014F | CF6B | 0150 | D000 | 0177 | D00B | 0178 |
| 0001533320 | D01B | 017D | D0AE | 017E | D0C7 | 0180 | D14D | 0182 |
| 0001533340 | D158 | 0184 | D174 | 0185 | D18A | 0186 | D1A1 | 0187 |
| 0001533360 | D1B2 | 0188 | D1BE | 0189 | D1C1 | 018A | D24B | 0199 |
| 0001533400 | D256 | 019A | D266 | 019E | D2F9 | 019F | D310 | 01A0 |
| 0001533420 | D36D | 01A1 | D41D | 01A2 | D431 | 01A3 | D445 | 01A4 |
| 0001533440 | D4CF | 01BA | D4DA | 01BB | D4EA | 7409 | 6C73 | 6163 |
| 0001533460 | 6C6C | 632E | 0003 | 0050 | 0058 | D4F6 | 0059 | D506 |
| 0001533500 | 005B | D598 | 005C | D5AA | 005D | D5B0 | 005F | D5C2 |
| 0001533520 | 0063 | D5D2 | 0064 | D634 | 007C | D63F | 007D | D64F |
| 0001533540 | 007E | D6E1 | 0080 | D73A | 0081 | D74C | 0083 | D75C |
| 0001533560 | 0085 | D7BF | 009E | D7CA | 009F | D7DA | 00A3 | D86D |
| 0001533600 | 00A4 | D885 | 00A6 | D895 | 00A8 | D898 | 00A9 | D8AC |
| 0001533620 | 00AB | D91B | 00AC | D926 | 00AD | D930 | 00B2 | D937 |
| 0001533640 | 00B4 | D997 | 00B6 | D9AF | 00B8 | DA12 | 00D1 | DA1D |
| 0001533660 | 00D2 | DA2D | 00D3 | DAC0 | 00D5 | DAC5 | 00D6 | DACF |
| 0001533700 | 00D7 | DB23 | 00DA | DBA0 | 00DB | DBAA | 00DD | DBAF |
| 0001533720 | 00DE | DBC8 | 00DF | DBD5 | 00E0 | DBEC | 00E2 | DBFD |
| 0001533740 | 00E4 | DBF3 | 00E5 | DC7C | 00E9 | DC89 | 00EA | DCA2 |
| 0001533760 | 00EB | DCAE | 00ED | DCC7 | 00EF | DCCB | 00F5 | DD38 |
| 0001534000 | 00F7 | DD45 | 00F8 | DDC2 | 0111 | DDCD | 0112 | DDDD |
| 0001534020 | 0114 | DE70 | 0115 | DE7A | 0116 | DECE | 0119 | DF4B |
| 0001534040 | 011A | DF4F | 011B | DF59 | 011D | DF5F | 0128 | DFE2 |
| 0001534060 | 012A | DFEF | 012B | E06C | 0147 | E077 | 0148 | E08D |
| 0001534100 | 014A | E120 | 014B | E12A | 014C | E17E | 014F | E1FB |
| 0001534120 | 0150 | E207 | 0152 | E285 | 0165 | E293 | 0166 | E2A3 |
| 0001534140 | 0168 | E336 | 016A | E33C | 016C | E347 | 0180 | E352 |
| 0001534160 | 0181 | E362 | 0182 | E368 | 680A | 6D6C | 6D65 | 676D |
| 0001534200 | 2E72 | 0363 | 7700 | 7000 | 7400 | 71E3 | 8400 | 74E3 |
| 0001534220 | 1600 | 75E4 | 2000 | 76E4 | 3300 | 78E4 | 4500 | 79E4 |
| 0001534240 | A700 | 94E4 | B200 | 95E4 | C200 | 99E4 | 5500 | 9AE5 |
| 0001534260 | 6100 | 9CE5 | 6600 | 9DE5 | 6F00 | 9EE5 | C600 | A0E5 |
| 0001534300 | 4C00 | A1E6 | 5500 | A2E6 | AC00 | A5E6 | 3200 | A8E7 |
| 0001534320 | 9200 | A9E7 | AE00 | AAE7 | 0200 | ACE8 | 8800 | ADE8 |
| 0001534340 | 9000 | AEE8 | 9A00 | AFE8 | A400 | B0E8 | AE00 | B1E8 |
| 0001534360 | C500 | B2E8 | D600 | B3E8 | EA00 | B5E8 | FC00 | B6E8 |
| 0001534400 | 0900 | B8E9 | 5E00 | B9E9 | EE00 | D8E9 | F900 | D9E9 |
| 0001534420 | 0900 | DEEA | 9C00 | DFEA | A800 | E1EA | AD00 | E2EA |
| 0001534440 | B600 | E3EA | 0D00 | E6EB | 9300 | E7EB | 9E00 | EBEB |
| 0001534460 | 4000 | ECEC | 4F00 | EDEC | 5C00 | EEEC | B600 | F0EC |
| 0001534500 | 3C00 | F2ED | 4600 | F5ED | AC00 | F6ED | CE00 | F7ED |
| 0001534520 | 2200 | FDEE | A800 | FEEE | BC00 | FFEE | D000 | 00EE |
| 0001534540 | DA01 | 01EE | E401 | 03EE | EE01 | 06EE | 5301 | 07EF |
| 0001534560 | E301 | 21EF | EE01 | 22EF | FE01 | 26EF | 9101 | 27F0 |
| 0001534600 | 9C01 | 28F0 | F001 | 2BF0 | 5301 | 2EF1 | AD01 | 2FF1 |
| 0001534620 | BC01 | 30F1 | C901 | 31F1 | 2301 | 33F2 | 8601 | 34F2 |
| 0001534640 | A001 | 35F2 | FA01 | 38F2 | 5D01 | 3AF3 | 6701 | 3FF3 |
| 0001534660 | DE01 | 40F3 | F701 | 41F3 | 1301 | 43F4 | 2B01 | 44F4 |
| 0001534700 | 3401 | 45F4 | 3D01 | 48F4 | 4B01 | 4BF4 | AD01 | 4DF4 |
| 0001534720 | 1001 | 65F5 | 1B01 | 66F5 | 2B01 | 69F5 | BE01 | 6CF5 |
| 0001534740 | 1B01 | 6DF6 | 2701 | 6EF6 | 7B01 | 71F6 | DE01 | 72F6 |

THU MAR 14 17:52:34 1991 TSLINT.DLL PAGE 391, LINE 23011

| | | | | | | | | |
|---|---|---|---|---|---|---|---|---|
| 0001534760 | F001 | 73F6 | 0801 | 74F7 | 2F01 | 75F7 | 4001 | 76F7 |
| 0001535000 | 5301 | 77F7 | 5F01 | 78F7 | 6201 | 79F7 | 7601 | 7AF7 |
| 0001535020 | D901 | 97F7 | E401 | 98F7 | F401 | 9FF7 | 8701 | A0F8 |
| 0001535040 | 1301 | B5F9 | 1E01 | B6F9 | 2E01 | B9F9 | C101 | BAF9 |
| 0001535060 | CC01 | BCF9 | 4901 | BEFA | 5801 | BFFA | DE01 | C9FA |
| 0001535100 | E901 | CAFA | F901 | CEFA | 8C01 | CFFB | 9801 | D1FB |
| 0001535120 | 1E01 | D2FC | 2601 | D3FC | 6401 | D5FC | 7601 | D6FC |
| 0001535140 | 0001 | 05FD | 7761 | 2E6B | 0479 | 7900 | F801 | 0004 |
| 0001535160 | F900 | 1004 | 0100 | A905 | 0200 | AE05 | 0600 | B405 |
| 0001535200 | 0700 | BA05 | 0800 | C005 | 0900 | CA05 | 1000 | D605 |
| 0001535220 | 1100 | ED05 | 1200 | F905 | 1400 | FF05 | 1500 | 0805 |
| 0001535240 | 1601 | 0D05 | 1A01 | 1F05 | 1B01 | 2C05 | 1E01 | 3A05 |
| 0001535260 | 1F01 | 5C05 | 2201 | 7B05 | 2601 | 9705 | 2701 | 9D05 |
| 0001535300 | 2801 | B205 | 2901 | B905 | 2A01 | C705 | 3101 | CA05 |
| 0001535320 | 3201 | DF05 | 3301 | 0105 | 3402 | 4805 | 3502 | 7705 |
| 0001535340 | 3602 | 9305 | 3802 | 9D05 | 3902 | C405 | 3A02 | D205 |
| 0001535360 | 3B02 | F005 | 3C02 | F605 | 3D02 | 0F05 | 3E03 | 2D05 |
| 0001535400 | 3F03 | 4E05 | 4003 | 7C05 | 4103 | 9605 | 4203 | 9905 |
| 0001535420 | 4403 | AF05 | 4903 | B505 | 4A03 | BF05 | 4C03 | C505 |
| 0001535440 | 4E03 | D105 | 5103 | D505 | 5303 | DB05 | 5403 | E705 |
| 0001535460 | 5503 | FA05 | 5603 | 2605 | 5704 | 3305 | 5904 | 3605 |
| 0001535500 | 6004 | 4605 | 6104 | 4A05 | 6204 | 4F05 | 6604 | 5205 |
| 0001535520 | 6804 | 5C05 | 6904 | 8305 | 6A04 | 9105 | 6B04 | AF05 |
| 0001535540 | 6C04 | B505 | 6D04 | CE05 | 6E04 | EC05 | 6F04 | 0D05 |
| 0001535560 | 7005 | 3B05 | 7105 | 5505 | 7205 | 5805 | 7405 | 6E05 |
| 0001535600 | 7B05 | 7405 | 7C05 | 8105 | 7D05 | 8705 | 8505 | A905 |
| 0001535620 | 8605 | D505 | 8705 | E405 | 8805 | F405 | 8905 | 0505 |
| 0001535640 | 8A06 | 2105 | 8C06 | 2905 | 8D06 | 3705 | 8E06 | 4C05 |
| 0001535660 | 8F06 | 8905 | 7106 | 9000 | 7306 | 9300 | 7406 | 9900 |
| 0001535700 | 7506 | B100 | 7606 | BB00 | 7706 | C000 | 7806 | C500 |
| 0001535720 | 7906 | CB00 | 7B06 | CE00 | 7C06 | E600 | 7D06 | EB00 |
| 0001535740 | 7E06 | F100 | 8506 | F400 | 8606 | 2000 | 8707 | 2600 |
| 0001535760 | 8807 | 2C00 | 8D07 | 2F00 | 9307 | 4A00 | 9407 | 5500 |
| 0001536000 | 9707 | 5800 | 9807 | 8F00 | 9B07 | 9200 | 9C07 | 9E00 |
| 0001536020 | A107 | A100 | A707 | BD00 | A907 | D800 | AB07 | F300 |
| 0001536040 | AD07 | 2400 | AF08 | 5500 | B108 | 7E00 | B608 | 9A00 |
| 0001536060 | B808 | B500 | C008 | F000 | C108 | 3C00 | CA09 | 3F00 |
| 0001536100 | CD09 | 4B00 | CE09 | 5600 | CF09 | 8900 | D009 | 9300 |
| 0001536120 | D109 | 7800 | D20A | 9C00 | D90A | 9F00 | DA0A | BE00 |
| 0001536140 | DC0A | C100 | E10A | DD00 | E40A | F800 | E50A | 0A00 |
| 0001536160 | E70B | 3000 | E80B | 6C00 | E90B | 7200 | EE0B | 7500 |
| 0001536200 | F40B | 8300 | F80B | 9E00 | FA0B | AE00 | 000B | B101 |
| 0001536220 | 010B | CF01 | D20B | 2601 | 050C | 2901 | 060C | 4701 |
| 0001536240 | 070C | 9E01 | 0A0C | A101 | 0B0C | B901 | 0C0C | 1001 |
| 0001536260 | 0D0D | 1301 | 0E0D | 3101 | 0F0D | 8B01 | 100D | AC01 |
| 0001536300 | 120D | CD01 | 130D | 0601 | 140E | 0C01 | 160E | 0F01 |
| 0001536320 | 170E | 6601 | 180E | 7E01 | 190E | 8401 | 1A0E | 8701 |
| 0001536340 | 1B0E | DE01 | 1C0E | E401 | 1D0E | EA01 | 1E0E | F801 |
| 0001536360 | 1F0E | 0401 | 270F | 0701 | 280F | 4F01 | 290F | 7401 |
| 0001536400 | 2D0F | 7701 | 2E0F | AC01 | 2F0F | D101 | 340F | D401 |
| 0001536420 | 350F | 2B01 | 3610 | 3901 | 3810 | 3C01 | 3910 | 9301 |
| 0001536440 | 3F10 | AF01 | 4110 | 2201 | 4811 | 3301 | 4911 | 6201 |
| 0001536460 | 4A11 | 8701 | 4D11 | 8A01 | 4E11 | B901 | 4F11 | DE01 |
| 0001536500 | 5411 | E101 | 5611 | F301 | 5C11 | 0501 | 5E12 | 2F01 |
| 0001536520 | 6012 | 5101 | 6212 | 7B01 | 6412 | 9D01 | 6612 | BF01 |
| 0001536540 | 6812 | E101 | 6E12 | 0301 | 6F13 | 5A01 | 7113 | 6001 |
| 0001536560 | 7213 | 9801 | 7313 | BD01 | 7613 | C001 | 7813 | 1701 |
| 0001536600 | 7914 | 5701 | 7B14 | 7C01 | 7C14 | 8201 | 8314 | 8501 |
| 0001536620 | 8414 | DC01 | 8514 | 0401 | 8615 | 2901 | 8815 | 2C01 |

THU MAR 14 17:52:34 1991 TSLINT.DLL PAGE 392, LINE 23070

| | | | | | | | | |
|---|---|---|---|---|---|---|---|---|
| 0001536640 | 8915 | 3A01 | 8A15 | 4601 | 8D15 | 4901 | 8E15 | 7201 |
| 0001536660 | 8F15 | 9101 | 9015 | A101 | 9115 | B501 | 9615 | B801 |
| 0001536700 | 9715 | 0E01 | 9816 | 3301 | 9B16 | 3601 | 9C16 | 8001 |
| 0001536720 | 9D16 | A501 | A016 | A801 | A116 | EA01 | A216 | 0F01 |
| 0001536740 | A517 | 1201 | A617 | 5401 | A717 | 7901 | AB17 | 7C01 |
| 0001536760 | AC17 | B601 | AD17 | DB01 | B017 | DE01 | B117 | 2001 |
| 0001537000 | B218 | 4501 | B518 | 4801 | B618 | 8201 | B718 | A701 |
| 0001537020 | BB18 | AA01 | BC18 | E401 | BD18 | 0901 | C019 | 0C01 |
| 0001537040 | C119 | 3E01 | C219 | 6301 | C419 | 6601 | C519 | 7401 |
| 0001537060 | C619 | 8001 | CC19 | 8301 | CE19 | 9401 | D319 | BD01 |
| 0001537100 | D519 | CE01 | D719 | F701 | D919 | 2001 | DE1A | 4901 |
| 0001537120 | E01A | 5A01 | E51A | 7501 | E61A | D701 | E71A | F701 |
| 0001537140 | E91A | FA01 | EA1A | 5C01 | EB1B | 9801 | ED1B | 9B01 |
| 0001537160 | EE1B | A901 | EF1B | B501 | F11B | B801 | F21B | C601 |
| 0001537200 | F31B | D201 | F51B | D501 | F61B | E301 | F71B | EF01 |
| 0001537220 | FC1B | F201 | FE1B | 0301 | 031C | 1E02 | 071C | 4702 |
| 0001537240 | 081C | 8302 | 091C | 8902 | 0B1C | 8C02 | 0C1C | 9A02 |
| 0001537260 | 0D1C | A602 | 0F1C | A902 | 101C | B702 | 111C | C302 |
| 0001537300 | 131C | C602 | 141C | D402 | 151C | E002 | 1A1C | E302 |
| 0001537320 | 1C1C | F402 | 211C | 0F02 | 251D | 3802 | 261D | 7402 |
| 0001537340 | 271D | 7A02 | 291D | 7D02 | 2A1D | 8B02 | 2B1D | 9702 |
| 0001537360 | 2D1D | 9A02 | 2E1D | A802 | 2F1D | B402 | 311D | B702 |
| 0001537400 | 321D | C502 | 331D | D102 | 381D | D402 | 391D | 2B02 |
| 0001537420 | 3A1E | 5F02 | 3C1E | 6202 | 3D1E | 9A02 | 411E | 9D02 |
| 0001537440 | 431E | D502 | 441E | FE02 | 471E | 0102 | 491F | 2F02 |
| 0001537460 | 4B1F | 3202 | 4C1F | 8902 | 4D1F | B102 | 4E1F | DA02 |
| 0001537500 | 501F | DD02 | 511F | 3402 | 5220 | 5C02 | 5320 | 8502 |
| 0001537520 | 5520 | 8802 | 5720 | BF02 | 5920 | F602 | 5B20 | 3102 |
| 0001537540 | 5D21 | 6802 | 5E21 | BF02 | 5F21 | E702 | 6021 | 1002 |
| 0001537560 | 6222 | 1302 | 6422 | 4402 | 6622 | 8D02 | 6822 | BE02 |
| 0001537600 | 6D22 | D902 | 6F22 | 1002 | 7123 | 4102 | 7423 | 7202 |
| 0001537620 | 7523 | A002 | 7723 | A302 | 7923 | DA02 | 7B23 | 1102 |
| 0001537640 | 7D24 | 4C02 | 7F24 | 8302 | 8124 | CC02 | 8324 | FD02 |
| 0001537660 | 8824 | 1802 | 8925 | 3A02 | 8A25 | 4502 | 8B25 | 5302 |
| 0001537700 | 8F25 | 5602 | 9125 | 7F02 | 9325 | 9B02 | 9525 | D802 |
| 0001537720 | 9725 | 0202 | 9926 | 3A02 | 9B26 | 7202 | 9D26 | AA02 |
| 0001537740 | A026 | E202 | A126 | 3002 | A327 | 3302 | A527 | 5C02 |
| 0001537760 | A727 | 8502 | A827 | AC02 | AA27 | AF02 | AC27 | D902 |
| 0001540000 | AE27 | F402 | B027 | 1F02 | B428 | 4402 | B628 | 7502 |
| 0001540020 | B828 | A602 | BA28 | D702 | BC28 | 0802 | BE29 | 3902 |
| 0001540040 | C029 | 6A02 | C229 | 9302 | C729 | AE02 | C929 | BF02 |
| 0001540060 | CE29 | DA02 | D029 | FD02 | D829 | 3902 | DC2A | 4202 |
| 0001540100 | E52A | 5302 | E82A | 5C02 | E92A | BB02 | EA2B | BE02 |
| 0001540120 | 002B | 6C0C | 696C | 6362 | 6C64 | 2E6C | 696C | 0762 |
| 0001540140 | 736F | 2E32 | 696C | 0A62 | 626C | 7069 | 746D | 6C2E |
| 0001540160 | 6269 | 6409 | 5F62 | 6970 | 6C2E | 6269 | 740A | 6C73 |
| 0001540200 | 695F | 2E66 | 696C | 0962 | 656D | 6964 | 2E74 | 696C |
| 0001540220 | 0662 | 6975 | 6C2E | 6269 | 740B | 7365 | 7774 | 6E69 |
| 0001540240 | 6C2E | 6269 | 7006 | 2E72 | 696C | A562 | 0101 | 0101 |
| 0001540260 | 0800 | 0000 | 1C00 | 0200 | 0101 | 8000 | 0011 | 7400 |
| 0001540300 | 0304 | 0101 | DE00 | 004A | 5E00 | 041B | 0101 | 3900 |
| 0001540320 | 01F0 | CE00 | 091C | 0101 | 0300 | 0290 | 2B00 | 010C |
| 0001540340 | 0201 | 2400 | 0000 | 1C00 | 0200 | 0201 | F400 | 0015 |
| 0001540360 | 4000 | 0300 | 0201 | 3C00 | 0066 | AD00 | 0411 | 0201 |
| 0001540400 | 0700 | 020D | 9400 | 0905 | 0201 | 2E00 | 029C | EB00 |
| 0001540420 | 0102 | 0301 | 4000 | 0000 | 1C00 | 0200 | 0301 | 3400 |
| 0001540440 | 0016 | E100 | 0300 | 0301 | E900 | 0077 | B400 | 0411 |
| 0001540460 | 0301 | 9B00 | 0212 | 4B00 | 0905 | 0301 | 1900 | 029F |
| 0001540500 | 3700 | 0105 | 0401 | 5C00 | 0000 | 1C00 | 0200 | 0401 |

THU MAR 14 17:52:34 1991 TSLINT.DLL PAGE 393, LINE 23129

| | | | | | | | | |
|---|---|---|---|---|---|---|---|---|
| 0001540520 | 1500 | 0017 | 4600 | 0301 | 0401 | 9D00 | 0089 | FA00 |
| 0001540540 | 0416 | 0401 | E600 | 0217 | CA00 | 0910 | 0401 | 5000 |
| 0001540560 | 02A4 | 3300 | 0109 | 0501 | 7800 | 0000 | 1C00 | 0200 |
| 0001540600 | 0501 | 5B00 | 0018 | 7E00 | 0300 | 0501 | 9700 | 00A0 |
| 0001540620 | 0400 | 0412 | 0501 | B000 | 0228 | 6F00 | 0905 | 0501 |
| 0001540640 | 8300 | 02AD | 3B00 | 0102 | 0601 | 9400 | 0000 | 1C00 |
| 0001540660 | 0200 | 0601 | D900 | 0018 | 8500 | 0300 | 0601 | 9B00 |
| 0001540700 | 00B2 | 5B00 | 0411 | 0601 | 1F00 | 022E | 4B00 | 0904 |
| 0001540720 | 0601 | BE00 | 02AF | 8F00 | 0102 | 0701 | B000 | 0000 |
| 0001540740 | 1D00 | 0200 | 0701 | 5E00 | 0019 | C400 | 0300 | 0701 |
| 0001540760 | F600 | 00C3 | 9500 | 0410 | 0701 | 6A00 | 0232 | F700 |
| 0001541000 | 090D | 0701 | 4D00 | 02B2 | 3000 | 010A | 0801 | CD00 |
| 0001541020 | 0000 | 1F00 | 0200 | 0801 | 2200 | 001A | 4500 | 0300 |
| 0001541040 | 0801 | 8B00 | 00D4 | 5600 | 040C | 0801 | 6100 | 0240 |
| 0001541060 | B000 | 0902 | 0801 | 7D00 | 02BC | 7A00 | 0100 | 0901 |
| 0001541100 | EC00 | 0000 | 1C00 | 0200 | 0901 | 6700 | 001A | 1F00 |
| 0001541120 | 0300 | 0901 | E100 | 00E0 | 0E00 | 0410 | 0901 | 1100 |
| 0001541140 | 0243 | BE00 | 0901 | 0901 | F700 | 02BC | 3F00 | 0100 |
| 0001541160 | 0A01 | 0800 | 0001 | 1E00 | 0200 | 0A01 | 8600 | 001A |
| 0001541200 | 3E00 | 0300 | 0A01 | EF00 | 00F0 | 5400 | 040B | 0A01 |
| 0001541220 | CF00 | 0244 | A700 | 0901 | 0A01 | 3600 | 02BD | 5D00 |
| 0001541240 | 0101 | 0B01 | 2600 | 0001 | 1E00 | 0200 | 0B01 | C400 |
| 0001541260 | 001A | 0E00 | 0300 | 0B01 | 4300 | 00FC | 1900 | 0402 |
| 0001541300 | 0B01 | 7600 | 0246 | E700 | 0900 | 0B01 | 9300 | 02BE |
| 0001541320 | 8500 | 0100 | 0C01 | 4400 | 0001 | 1D00 | 0200 | 0C01 |
| 0001541340 | D200 | 001A | C300 | 0300 | 0C01 | 5C00 | 00FE | D100 |
| 0001541360 | 0413 | 0C01 | 5D00 | 0247 | 2600 | 0905 | 0C01 | 1800 |
| 0001541400 | 02BF | 9C00 | 0105 | 0D01 | 6100 | 0001 | 1F00 | 0200 |
| 0001541420 | 0D01 | 9500 | 001B | 1E00 | 0301 | 0D01 | 2D00 | 0112 |
| 0001541440 | C300 | 0412 | 0D01 | 8300 | 024C | 7700 | 090B | 0D01 |
| 0001541460 | B400 | 02C4 | 9600 | 0102 | 0E01 | 8000 | 0001 | 2000 |
| 0001541500 | 0200 | 0E01 | B300 | 001C | 2600 | 0300 | 0E01 | F000 |
| 0001541520 | 0124 | 3F00 | 0410 | 0E01 | FA00 | 0257 | F800 | 0901 |
| 0001541540 | 0E01 | 4A00 | 02C7 | 4B00 | 0101 | 0F01 | A000 | 0001 |
| 0001541560 | 1F00 | 0200 | 0F01 | D900 | 001C | 2B00 | 0300 | 0F01 |
| 0001541600 | 2F00 | 0135 | 5800 | 0411 | 0F01 | F200 | 0259 | F400 |
| 0001541620 | 0902 | 0F01 | 9500 | 02C8 | C200 | 0100 | 1001 | BF00 |
| 0001541640 | 0001 | 1F00 | 0200 | 1001 | 0400 | 001D | 1E00 | 0302 |
| 0001541660 | 1001 | 8700 | 0146 | 1C00 | 040F | 1001 | E600 | 025C |
| 0001541700 | 4000 | 0102 | 1101 | DE00 | 0001 | 1E00 | 0200 | 1101 |
| 0001541720 | 2200 | 001F | 2900 | 0300 | 1101 | A300 | 0155 | 3F00 |
| 0001541740 | 040E | 1101 | 2600 | 025F | DC00 | 0901 | 1101 | 5700 |
| 0001541760 | 02C9 | 4D00 | 0100 | 1201 | FC00 | 0001 | 1E00 | 0200 |
| 0001542000 | 1201 | 4B00 | 001F | 1700 | 0301 | 1201 | E200 | 0163 |
| 0001542020 | CD00 | 0419 | 1201 | 0200 | 0261 | 4B00 | 0909 | 1201 |
| 0001542040 | A400 | 02C9 | D100 | 0108 | 1301 | 1A00 | 0002 | 2000 |
| 0001542060 | 0200 | 1301 | 6200 | 0020 | 2900 | 0301 | 1301 | AF00 |
| 0001542100 | 017D | 2A00 | 0417 | 1301 | 4D00 | 026A | CD00 | 0907 |
| 0001542120 | 1301 | 7500 | 02D2 | 4700 | 0102 | 1401 | 3A00 | 0002 |
| 0001542140 | 1E00 | 0200 | 1401 | 8B00 | 0021 | 6500 | 0300 | 1401 |
| 0001542160 | D900 | 0194 | F100 | 040F | 1401 | 1A00 | 0272 | B000 |
| 0001542200 | 0904 | 1401 | BC00 | 02D4 | F500 | 0100 | 1501 | 5800 |
| 0001542220 | 0002 | 2000 | 0200 | 1501 | F000 | 0021 | 5F00 | 0300 |
| 0001542240 | 1501 | CA00 | 01A4 | D300 | 040C | 1501 | CA00 | 0276 |
| 0001542260 | 4000 | 0903 | 1501 | B100 | 02D5 | D300 | 0100 | 1601 |
| 0001542300 | 7800 | 0002 | 1D00 | 0200 | 1601 | 4F00 | 0022 | 4D00 |
| 0001542320 | 0300 | 1601 | 9D00 | 01B1 | 9E00 | 0413 | 1601 | 0A00 |
| 0001542340 | 027A | 5100 | 0906 | 1601 | 8400 | 02D6 | AC00 | 0102 |
| 0001542360 | 1701 | 9500 | 0002 | 1F00 | 0200 | 1701 | 9C00 | 0022 |

THU MAR 14 17:52:34 1991 TSLINT.DLL PAGE 394, LINE 23188

| | | | | | | | | |
|---|---|---|---|---|---|---|---|---|
| 0001542400 | B400 | 0300 | 1701 | 3B00 | 01C5 | 2200 | 040F | 1701 |
| 0001542420 | 5B00 | 0280 | 9B00 | 0905 | 1701 | 3000 | 02D9 | 4E00 |
| 0001542440 | 0101 | 1801 | B400 | 0002 | 2000 | 0200 | 1801 | 5000 |
| 0001542460 | 0023 | 8000 | 0300 | 1801 | 5D00 | 01D4 | 1700 | 0409 |
| 0001542500 | 1801 | F600 | 0285 | D400 | 0905 | 1801 | 7E00 | 02DA |
| 0001542520 | EB00 | 0101 | 1901 | D400 | 0002 | 1B00 | 0200 | 1901 |
| 0001542540 | D000 | 0023 | 8200 | 0301 | 1901 | 7400 | 01DD | C500 |
| 0001542560 | 0412 | 1901 | CA00 | 028B | 3900 | 0904 | 1901 | 6900 |
| 0001542600 | 02DC | EE00 | 0105 | 1A01 | EF00 | 0002 | 1800 | 0200 |
| 0001542620 | 1A01 | 5200 | 0025 | 5200 | 0101 | 1B01 | 0700 | 0003 |
| 0001542640 | 1B00 | 020C | 1801 | A400 | 0026 | D200 | 0101 | 1C01 |
| 0001542660 | 2200 | 0003 | 1C00 | 0200 | 1C01 | 7600 | 0028 | 3500 |
| 0001542700 | 0100 | 1D01 | 3E00 | 0003 | 1700 | 0200 | 1D01 | AB00 |
| 0001542720 | 0028 | 0F00 | 0100 | 1E01 | 5500 | 0003 | 1700 | 0200 |
| 0001542740 | 1E01 | BA00 | 0028 | 3300 | 0100 | 1F01 | 6C00 | 0003 |
| 0001542760 | 1A00 | 0200 | 1F01 | ED00 | 0028 | 1000 | 0100 | 2001 |
| 0001543000 | 8600 | 0003 | 1C00 | 0200 | 2001 | FD00 | 0028 | 2500 |
| 0001543020 | 0100 | 2101 | A200 | 0003 | 1B00 | 0200 | 2101 | 2200 |
| 0001543040 | 0029 | 3F00 | 0100 | 2201 | BD00 | 0003 | 1500 | 0200 |
| 0001543060 | 2201 | 6100 | 0029 | 2000 | 0100 | 2301 | D200 | 0003 |
| 0001543100 | 1400 | 0200 | 2301 | 8100 | 0029 | 1C00 | 0100 | 2401 |
| 0001543120 | E600 | 0003 | 1600 | 0200 | 2401 | 9D00 | 0029 | 0F00 |
| 0001543140 | 0100 | 2501 | FC00 | 0003 | 1700 | 0200 | 2501 | AC00 |
| 0001543160 | 0029 | 2000 | 0100 | 2601 | 1300 | 0004 | 1500 | 0200 |
| 0001543200 | 2601 | CC00 | 0029 | 0E00 | 0100 | 2701 | 2800 | 0004 |
| 0001543220 | 1800 | 0200 | 2701 | DA00 | 0029 | 0F00 | 0100 | 2801 |
| 0001543240 | 4000 | 0004 | 1400 | 0200 | 2801 | E900 | 0029 | 3700 |
| 0001543260 | 0100 | 2901 | 5400 | 0004 | 1800 | 0200 | 2901 | 2000 |
| 0001543300 | 002A | 0F00 | 0100 | 2A01 | 6C00 | 0004 | 1800 | 0200 |
| 0001543320 | 2A01 | 2F00 | 002A | 0F00 | 0100 | 2B01 | 8400 | 0004 |
| 0001543340 | 1900 | 0200 | 2B01 | 3E00 | 002A | 1000 | 0100 | 2C01 |
| 0001543360 | 9D00 | 0004 | 1800 | 0200 | 2C01 | 4E00 | 002A | 0F00 |
| 0001543400 | 0100 | 2D01 | B500 | 0004 | 1400 | 0200 | 2D01 | 5D00 |
| 0001543420 | 002A | 1100 | 0100 | 2E01 | C900 | 0004 | 1800 | 0200 |
| 0001543440 | 2E01 | 6E00 | 002A | 1C00 | 0100 | 2F01 | E100 | 0004 |
| 0001543460 | 1500 | 0200 | 2F01 | 8A00 | 002A | 3000 | 0100 | 3001 |
| 0001543500 | F600 | 0004 | 1400 | 0200 | 3001 | BA00 | 002A | 0E00 |
| 0001543520 | 0100 | 3101 | 0A00 | 0005 | 1700 | 0200 | 3101 | C800 |
| 0001543540 | 002A | 0F00 | 0100 | 3201 | 2100 | 0005 | 1500 | 0200 |
| 0001543560 | 3201 | D700 | 002A | 1200 | 0100 | 3301 | 3600 | 0005 |
| 0001543600 | 1500 | 0200 | 3301 | E900 | 002A | 2000 | 0100 | 3401 |
| 0001543620 | 4B00 | 0005 | 1A00 | 0200 | 3401 | 0900 | 002B | 0D00 |
| 0001543640 | 0100 | 3501 | 6500 | 0005 | 1A00 | 0200 | 3501 | 1600 |
| 0001543660 | 002B | 1E00 | 0100 | 3601 | 7F00 | 0005 | 1900 | 0200 |
| 0001543700 | 3601 | 3400 | 002B | 3100 | 0100 | 3701 | 9800 | 0005 |
| 0001543720 | 1900 | 0200 | 3701 | 6500 | 002B | 0C00 | 0100 | 3801 |
| 0001543740 | B100 | 0005 | 1600 | 0200 | 3801 | 7100 | 002B | 1E00 |
| 0001543760 | 0100 | 3901 | C700 | 0005 | 1800 | 0200 | 3901 | 8F00 |
| 0001544000 | 002B | 1D00 | 0100 | 3A01 | DF00 | 0005 | 1700 | 0200 |
| 0001544020 | 3A01 | AC00 | 002B | 1F00 | 0100 | 3B01 | F600 | 0005 |
| 0001544040 | 1500 | 0200 | 3B01 | CB00 | 002B | 1B00 | 0100 | 3C01 |
| 0001544060 | 0B00 | 0006 | 1800 | 0200 | 3C01 | E600 | 002B | 4200 |
| 0001544100 | 0100 | 3D01 | 2300 | 0006 | 1600 | 0200 | 3D01 | 2800 |
| 0001544120 | 002C | 0E00 | 0100 | 3E01 | 3900 | 0006 | 1800 | 0200 |
| 0001544140 | 3E01 | 3600 | 002C | 1000 | 0100 | 3F01 | 5100 | 0006 |
| 0001544160 | 1800 | 0200 | 3F01 | 4600 | 002C | 1000 | 0100 | 4001 |
| 0001544200 | 6900 | 0006 | 1900 | 0200 | 4001 | 5600 | 002C | 1200 |
| 0001544220 | 0100 | 4101 | 8200 | 0006 | 1800 | 0200 | 4101 | 6800 |
| 0001544240 | 002C | 4100 | 0100 | 4201 | 9A00 | 0006 | 1700 | 0200 |

THU MAR 14 17:52:34 1991 TSLINT.DLL PAGE 395, LINE 23247

| | | | | | | | | |
|---|---|---|---|---|---|---|---|---|
| 0001544260 | 4201 | A900 | 002C | 0F00 | 0100 | 4301 | B100 | 0006 |
| 0001544300 | 1700 | 0200 | 4301 | B800 | 002C | 0E00 | 0100 | 4401 |
| 0001544320 | C800 | 0006 | 1700 | 0200 | 4401 | C600 | 002C | 0E00 |
| 0001544340 | 0100 | 4501 | DF00 | 0006 | 1700 | 0200 | 4501 | D400 |
| 0001544360 | 002C | 0E00 | 0100 | 4601 | F600 | 0006 | 1700 | 0200 |
| 0001544400 | 4601 | E200 | 002C | 0E00 | 0100 | 4701 | 0D00 | 0007 |
| 0001544420 | 1800 | 0200 | 4701 | F000 | 002C | 0F00 | 0100 | 4801 |
| 0001544440 | 2500 | 0007 | 1800 | 0200 | 4801 | FF00 | 002C | 0F00 |
| 0001544460 | 0100 | 4901 | 3D00 | 0007 | 1500 | 0200 | 4901 | 0E00 |
| 0001544500 | 002D | 0C00 | 0100 | 4A01 | 5200 | 0007 | 1300 | 0200 |
| 0001544520 | 4A01 | 1A00 | 002D | 0B00 | 0100 | 4B01 | 6500 | 0007 |
| 0001544540 | 1500 | 0200 | 4B01 | 2500 | 002D | 0E00 | 0100 | 4C01 |
| 0001544560 | 7A00 | 0007 | 1500 | 0200 | 4C01 | 3300 | 002D | 0C00 |
| 0001544600 | 0100 | 4D01 | 8F00 | 0007 | 1700 | 0200 | 4D01 | 3F00 |
| 0001544620 | 002D | 1000 | 0100 | 4E01 | A600 | 0007 | 1900 | 0200 |
| 0001544640 | 4E01 | 4F00 | 002D | 5600 | 0100 | 4F01 | BF00 | 0007 |
| 0001544660 | 1600 | 0200 | 4F01 | A500 | 002D | 1D00 | 0100 | 5001 |
| 0001544700 | D500 | 0007 | 1500 | 0200 | 5001 | C200 | 002D | 0E00 |
| 0001544720 | 0100 | 5101 | EA00 | 0007 | 1700 | 0200 | 5101 | D000 |
| 0001544740 | 002D | 0E00 | 0100 | 5201 | 0100 | 0008 | 1A00 | 0200 |
| 0001544760 | 5201 | DE00 | 002D | 1100 | 0100 | 5501 | 1B00 | 0008 |
| 0001545000 | 1A00 | 0200 | 5501 | EF00 | 002D | AB00 | 0100 | 5601 |
| 0001545020 | 3500 | 0008 | 1B00 | 0200 | 5601 | 9A00 | 002E | 2600 |
| 0001545040 | 0100 | 5701 | F000 | 0008 | 1D00 | 0200 | 5701 | C000 |
| 0001545060 | 002E | 2400 | 0100 | 5801 | 6D00 | 0008 | 1500 | 0200 |
| 0001545100 | 5801 | E400 | 002E | 0E00 | 0100 | 5901 | 8200 | 0008 |
| 0001545120 | 1400 | 0200 | 5901 | F200 | 002E | 1E00 | 0100 | 5A01 |
| 0001545140 | 9600 | 0008 | 1400 | 0200 | 5A01 | 1000 | 002F | 1E00 |
| 0001545160 | 0100 | 5B01 | AA00 | 0008 | 1600 | 0200 | 5B01 | 2E00 |
| 0001545200 | 002F | 0F00 | 0100 | 5C01 | C000 | 0008 | 1500 | 0200 |
| 0001545220 | 5C01 | 3D00 | 002F | 0E00 | 0100 | 5D01 | D500 | 0008 |
| 0001545240 | 1700 | 0200 | 5D01 | 4B00 | 002F | 1000 | 0100 | 5E01 |
| 0001545260 | EC00 | 0008 | 1900 | 0200 | 5E01 | 5B00 | 002F | 2500 |
| 0001545300 | 0100 | 5F01 | 0500 | 0009 | 1800 | 0200 | 5F01 | 8000 |
| 0001545320 | 002F | 2100 | 0100 | 6001 | 1D00 | 0009 | 1700 | 0200 |
| 0001545340 | 6001 | A100 | 002F | 0F00 | 0100 | 6101 | 3400 | 0009 |
| 0001545360 | 1700 | 0200 | 6101 | B000 | 002F | 0E00 | 0100 | 6201 |
| 0001545400 | 4B00 | 0009 | 1800 | 0200 | 6201 | BE00 | 002F | 1000 |
| 0001545420 | 0100 | 6301 | 6300 | 0009 | 1600 | 0200 | 6301 | CE00 |
| 0001545440 | 002F | 0F00 | 0100 | 6401 | 7900 | 0009 | 1400 | 0200 |
| 0001545460 | 6401 | DD00 | 002F | 0D00 | 0100 | 6501 | 8D00 | 0009 |
| 0001545500 | 1300 | 0200 | 6501 | EA00 | 002F | 1C00 | 0100 | 6601 |
| 0001545520 | A000 | 0009 | 1500 | 0200 | 6601 | 0600 | 0030 | 0E00 |
| 0001545540 | 0100 | 6701 | B500 | 0009 | 1700 | 0200 | 6701 | 1400 |
| 0001545560 | 0030 | 1100 | 0100 | 6801 | CC00 | 0009 | 1900 | 0200 |
| 0001545600 | 6801 | 2500 | 0030 | 0C00 | 0100 | 6901 | E500 | 0009 |
| 0001545620 | 1400 | 0200 | 6901 | 3100 | 0030 | 2C00 | 0100 | 6A01 |
| 0001545640 | F900 | 0009 | 1600 | 0200 | 6A01 | 5D00 | 0030 | 4E00 |
| 0001545660 | 0100 | 6B01 | 0F00 | 000A | 1700 | 0200 | 6B01 | AB00 |
| 0001545700 | 0030 | 1100 | 0100 | 6C01 | 2600 | 000A | 1700 | 0200 |
| 0001545720 | 6C01 | BC00 | 0030 | 0E00 | 0100 | 6D01 | 3D00 | 000A |
| 0001545740 | 1800 | 0200 | 6D01 | CA00 | 0030 | 1E00 | 0100 | 6E01 |
| 0001545760 | 5500 | 000A | 1800 | 0200 | 6E01 | E800 | 0030 | 0F00 |
| 0001546000 | 0100 | 6F01 | 6D00 | 000A | 1800 | 0200 | 6F01 | F700 |
| 0001546020 | 0030 | 0F00 | 0100 | 7001 | 8500 | 000A | 1800 | 0200 |
| 0001546040 | 7001 | 0600 | 0031 | 0E00 | 0100 | 7101 | 9D00 | 000A |
| 0001546060 | 1800 | 0200 | 7101 | 1400 | 0031 | 0E00 | 0100 | 7201 |
| 0001546100 | B500 | 000A | 1800 | 0200 | 7201 | 2200 | 0031 | 0E00 |
| 0001546120 | 0100 | 7301 | CD00 | 000A | 1500 | 0200 | 7301 | 3000 |

THU MAR 14 17:52:34 1991 TSLINT.DLL PAGE 396, LINE 23306

| | | | | | | | | |
|---|---|---|---|---|---|---|---|---|
| 0001546140 | 0031 | 1F00 | 0100 | 7401 | E200 | 000A | 1300 | 0200 |
| 0001546160 | 7401 | 4F00 | 0031 | 0C00 | 0100 | 7501 | F500 | 000A |
| 0001546200 | 1600 | 0200 | 7501 | 5B00 | 0031 | 1000 | 0100 | 7601 |
| 0001546220 | 0B00 | 000B | 1700 | 0200 | 7601 | 6B00 | 0031 | 1D00 |
| 0001546240 | 0100 | 7701 | 2200 | 000B | 1500 | 0200 | 7701 | 8800 |
| 0001546260 | 0031 | 2300 | 0100 | 7801 | 3700 | 000B | 1C00 | 0200 |
| 0001546300 | 7801 | AB00 | 0031 | 1000 | 0100 | 7901 | 5300 | 000B |
| 0001546320 | 1700 | 0200 | 7901 | BB00 | 0031 | 1200 | 0100 | 7A01 |
| 0001546340 | 6A00 | 000B | 1A00 | 0200 | 7A01 | CD00 | 0031 | 1000 |
| 0001546360 | 0100 | 7B01 | 8400 | 000B | 1700 | 0200 | 7B01 | DD00 |
| 0001546400 | 0031 | 1100 | 0100 | 7C01 | 9B00 | 000B | 1C00 | 0200 |
| 0001546420 | 7C01 | EE00 | 0031 | 2200 | 0100 | 7D01 | B700 | 000B |
| 0001546440 | 1A00 | 0200 | 7D01 | 1000 | 0032 | 0F00 | 0100 | 7E01 |
| 0001546460 | D100 | 000B | 1700 | 0200 | 7E01 | 1F00 | 0032 | 1000 |
| 0001546500 | 0100 | 7F01 | E800 | 000B | 1500 | 0200 | 7F01 | 2F00 |
| 0001546520 | 0032 | 0E00 | 0100 | 8001 | FD00 | 000B | 1B00 | 0200 |
| 0001546540 | 8001 | 3D00 | 0032 | 0E00 | 0100 | 8101 | 1800 | 000C |
| 0001546560 | 1A00 | 0200 | 8101 | 4B00 | 0032 | 2100 | 0100 | 8201 |
| 0001546600 | 3200 | 000C | 1800 | 0200 | 8201 | 6C00 | 0032 | 0D00 |
| 0001546620 | 0100 | 8301 | 4A00 | 000C | 1900 | 0200 | 8301 | 7900 |
| 0001546640 | 0032 | 1E00 | 0100 | 8401 | 6300 | 000C | 1B00 | 0200 |
| 0001546660 | 8401 | 9700 | 0032 | 1C00 | 0100 | 8501 | 7E00 | 000C |
| 0001546700 | 1600 | 0200 | 8501 | B300 | 0032 | 1100 | 0100 | 8601 |
| 0001546720 | 9400 | 000C | 1600 | 0200 | 8601 | C400 | 0032 | 2300 |
| 0001546740 | 0100 | 8701 | AA00 | 000C | 1600 | 0200 | 8701 | E700 |
| 0001546760 | 0032 | 1100 | 0100 | 8801 | C000 | 000C | 1600 | 0200 |
| 0001547000 | 8801 | F800 | 0032 | 1100 | 0100 | 8901 | D600 | 000C |
| 0001547020 | 1700 | 0200 | 8901 | 0900 | 0033 | 1200 | 0100 | 8A01 |
| 0001547040 | ED00 | 000C | 1500 | 0200 | 8A01 | 1B00 | 0033 | 0F00 |
| 0001547060 | 0100 | 8B01 | 0200 | 000D | 1500 | 0200 | 8B01 | 2A00 |
| 0001547100 | 0033 | 1F00 | 0100 | 8C01 | 1700 | 000D | 1500 | 0200 |
| 0001547120 | 8C01 | 4900 | 0033 | 0F00 | 0100 | 8D01 | 2C00 | 000D |
| 0001547140 | 1500 | 0200 | 8D01 | 5800 | 0033 | 0F00 | 0100 | 8E01 |
| 0001547160 | 4100 | 000D | 1600 | 0200 | 8E01 | 6700 | 0033 | 1000 |
| 0001547200 | 0100 | 8F01 | 5700 | 000D | 1600 | 0200 | 8F01 | 7700 |
| 0001547220 | 0033 | 1000 | 0100 | 9001 | 6D00 | 000D | 2300 | 0200 |
| 0001547240 | 9001 | 8700 | 0033 | 0300 | 0101 | 9101 | 9000 | 000D |
| 0001547260 | 2300 | 020C | 9101 | 8A00 | 0034 | 7A00 | 0102 | 9201 |
| 0001547300 | B300 | 000D | 2300 | 0200 | 9201 | D400 | 0037 | 1C00 |
| 0001547320 | 0100 | 9301 | D600 | 000D | 2300 | 0200 | 9301 | 2000 |
| 0001547340 | 0037 | C200 | 0100 | 9401 | F900 | 000D | 2300 | 0200 |
| 0001547360 | 9401 | E200 | 0037 | C200 | 0100 | 9501 | 1C00 | 000E |
| 0001547400 | 2200 | 0200 | 9501 | A400 | 0038 | 0E00 | 0100 | 9601 |
| 0001547420 | 3E00 | 000E | 2300 | 0200 | 9601 | B200 | 0038 | F500 |
| 0001547440 | 0101 | 9701 | 6100 | 000E | 2300 | 0200 | 9701 | A700 |
| 0001547460 | 003A | 6600 | 0100 | 9801 | 8400 | 000E | 2300 | 0200 |
| 0001547500 | 9801 | 0D00 | 003B | 3E00 | 0100 | 9901 | A700 | 000E |
| 0001547520 | 2300 | 0200 | 9901 | 4B00 | 003B | 5200 | 0100 | 9A01 |
| 0001547540 | CA00 | 000E | 2400 | 0200 | 9A01 | 9D00 | 003B | E600 |
| 0001547560 | 0100 | 9B01 | EE00 | 000E | 2300 | 0200 | 9B01 | 8300 |
| 0001547600 | 003C | 3800 | 0100 | 9C01 | 1100 | 000F | 2400 | 0200 |
| 0001547620 | 9C01 | BB00 | 003C | 0E00 | 0100 | 9D01 | 3500 | 000F |
| 0001547640 | 2500 | 0200 | 9D01 | C900 | 003C | 2A00 | 0100 | 9E01 |
| 0001547660 | 5A00 | 000F | 2400 | 0200 | 9E01 | F300 | 003C | 1100 |
| 0001547700 | 0100 | 9F01 | 7E00 | 000F | 2300 | 0200 | 9F01 | 0400 |
| 0001547720 | 003D | 3A00 | 0100 | A001 | A100 | 000F | 2400 | 0200 |
| 0001547740 | A001 | 3E00 | 003D | 2000 | 0100 | A101 | C500 | 000F |
| 0001547760 | 1E00 | 0200 | A101 | 5E00 | 003D | 1600 | 0100 | A201 |
| 0001550000 | E300 | 000F | 1F00 | 0200 | A201 | 7400 | 003D | 1000 |

THU MAR 14 17:52:34 1991  TSLINT.DLL  PAGE 397, LINE 23365

| | | | | | | | | |
|---|---|---|---|---|---|---|---|---|
| 0001550020 | 0100 | A301 | 0200 | 0010 | 1E00 | 0200 | A301 | 8400 |
| 0001550040 | 003D | E800 | 0109 | A401 | 2000 | 0010 | 1F00 | 0200 |
| 0001550060 | A401 | 6C00 | 0047 | E500 | 0100 | A501 | 3F00 | 0010 |
| 0001550100 | 1C00 | 0200 | A501 | 5100 | 0048 | 2100 | 0100 | A601 |
| 0001550120 | 5B00 | 0010 | 1E00 | 0200 | A601 | 7200 | 0048 | 5000 |
| 0001550140 | 0100 | A701 | 7900 | 0010 | 1D00 | 0200 | A701 | C200 |
| 0001550160 | 0048 | 1C00 | 0100 | A801 | 9600 | 0010 | 1D00 | 0200 |
| 0001550200 | A801 | DE00 | 0048 | 6C00 | 0100 | A901 | B300 | 0010 |
| 0001550220 | 1D00 | 0200 | A901 | 4A00 | 0049 | 4E00 | 0100 | AA01 |
| 0001550240 | D000 | 0010 | 1E00 | 0200 | AA01 | 9800 | 0049 | 7200 |
| 0001550260 | 0100 | AB01 | EE00 | 0010 | 1D00 | 0200 | AB01 | 0A00 |
| 0001550300 | 004A | 1F00 | 0100 | AC01 | 0B00 | 0011 | 1E00 | 0200 |
| 0001550320 | AC01 | 2900 | 004A | 1000 | 0100 | AD01 | 2900 | 0011 |
| 0001550340 | 1900 | 0200 | AD01 | 3900 | 004A | 7F00 | 0100 | AE01 |
| 0001550360 | 4200 | 0011 | 1F00 | 0200 | AE01 | B800 | 004A | 0F00 |
| 0001550400 | 0100 | AF01 | 6100 | 0011 | 1F00 | 0200 | AF01 | C700 |
| 0001550420 | 004A | 1700 | 0600 | 0001 | 5700 | 02E2 | 5A00 | 4E00 |
| 0001550440 | 3042 | 2D32 | 02F3 | 0000 | | | | |
| 0001550447 | | | | | | | | |

THU MAR 14 17:54:16 1991 TW.DLL PAGE 1, LINE 1

| | | | | | | | | |
|---|---|---|---|---|---|---|---|---|
| 0000000000 | 5A4D | 010F | 0001 | 0000 | 0004 | 0000 | FFFF | 0000 |
| 0000000020 | 00B6 | 0000 | 0000 | 0000 | 0040 | 0000 | 0000 | 0000 |
| 0000000040 | 0000 | 0000 | 0000 | 0000 | 0000 | 0000 | 0000 | 0000 |
| 0000000060 | 0000 | 0000 | 0000 | 0000 | 0000 | 0000 | 0080 | 0000 |
| 0000000100 | 1F0E | 0EBA | B400 | CD09 | B821 | 4C01 | 21CD | 6854 |
| 0000000120 | 7369 | 7020 | 6F72 | 7267 | 6D61 | 6320 | 6E61 | 6F6E |
| 0000000140 | 2074 | 7572 | 206E | 6E69 | 4420 | 534F | 6D20 | 646F |
| 0000000160 | 2E65 | 0D0D | 240A | 0000 | 0000 | 0000 | 0000 | 0000 |
| 0000000200 | 454E | 0A05 | 00F6 | 0002 | 8ACC | 9356 | 8001 | 0001 |
| 0000000220 | 0000 | 0000 | 0000 | 0000 | 0000 | 0000 | 000F | 0000 |
| 0000000240 | 003F | 0040 | 00B8 | 00F0 | 00F6 | 00F6 | 0178 | 0000 |
| 0000000260 | 0000 | 0004 | 000E | 0001 | 0000 | 0000 | 0000 | 0000 |
| 0000000300 | 0000 | 0000 | 0C21 | 0002 | 001C | 0120 | 1CB1 | 0120 |
| 0000000320 | 002E | 036D | 1CB1 | 036D | 0065 | 003A | 0CB1 | 003A |
| 0000000340 | 0069 | 000B | 1CB1 | 000B | 006A | 00DC | 1CB1 | 00DC |
| 0000000360 | 0078 | 017A | 1CB1 | 017A | 009D | 0316 | 1CB1 | 0316 |
| 0000000400 | 00C2 | 0333 | 1CB1 | 0333 | 00F6 | 0386 | 1CB1 | 0386 |
| 0000000420 | 012F | 0162 | 1CB1 | 0162 | 0146 | 0332 | 1CB1 | 0332 |
| 0000000440 | 017A | 00B5 | 1CB1 | 00B5 | 0186 | 0126 | 1CB1 | 0126 |
| 0000000460 | 0199 | 0330 | 1CB1 | 0330 | 0001 | 0001 | 0003 | 0001 |
| 0000000500 | 0008 | 0001 | 000B | 0001 | 0004 | 03E7 | 0004 | 04B0 |
| 0000000520 | 0004 | 044C | 0004 | 0514 | 0004 | 06A4 | 0004 | 0708 |
| 0000000540 | 0004 | 076C | 0004 | 03E8 | 0004 | 0578 | 0004 | 05DC |
| 0000000560 | 5402 | 0057 | 0000 | 0000 | 543B | 7365 | 2074 | 6957 |
| 0000000600 | 646E | 776F | 7220 | 7365 | 756F | 6372 | 2065 | 696C |
| 0000000620 | 7262 | 7261 | 2079 | 4328 | 2029 | 654D | 6372 | 7275 |
| 0000000640 | 2079 | 6E49 | 6574 | 4172 | 7463 | 7669 | 2C65 | 3120 |
| 0000000660 | 3939 | 2030 | 0000 | 0000 | 0000 | 0000 | 0000 | 0000 |
| 0000000700 | 4349 | 0120 | 0000 | 0010 | 0010 | 0020 | 0000 | 000C |
| 0000000720 | 0000 | 0020 | 0040 | 0001 | 0001 | 0000 | FF00 | FFFF |
| 0000000740 | 0000 | 0000 | 0000 | 0000 | FF3F | F8FF | CD39 | F89F |
| 0000000760 | CD39 | F89F | C839 | F09F | C239 | E01F | C739 | C01F |
| 0000001000 | C739 | 801F | CF39 | 089F | 5F20 | 18DE | F03F | 387C |
| 0000001020 | C23F | 7818 | 1F3F | F8C0 | 7F3E | F8F1 | FF3E | F8FB |
| 0000001040 | FF3C | F8F9 | FF3D | F8FD | FF39 | F8FC | FF39 | F8FC |
| 0000001060 | FF3B | F8FE | FF39 | F8FC | FF39 | F8FC | FF3D | F8FD |
| 0000001100 | FF3C | F8F9 | FF3E | F8FB | 7F3E | F8F3 | 1F3F | F8C7 |
| 0000001120 | C23F | F81F | F03F | F87F | FF3F | F8FF | 0000 | 0000 |
| 0000001140 | 0000 | 0F00 | 0000 | 0300 | 0000 | 0300 | 0000 | 0500 |
| 0000001160 | 0000 | 0000 | 0000 | 0000 | 0000 | 0100 | 0000 | 0300 |
| 0000001200 | 0000 | 0700 | 0000 | 0700 | 0000 | 0300 | 0000 | 0300 |
| 0000001220 | 0000 | 0300 | 0000 | 0300 | 0000 | 0300 | 2000 | 0320 |
| 0000001240 | 2700 | 0320 | 2E00 | 03A0 | 1F00 | 0340 | 9F00 | 0348 |
| 0000001260 | 7F00 | 0370 | 1F00 | 0340 | 7F00 | 03F0 | 0E00 | 0380 |
| 0000001300 | 0700 | 0300 | 0200 | 0300 | 0500 | 0300 | 0000 | 0300 |
| 0000001320 | 0000 | 0300 | 0000 | 0300 | 0080 | 0300 | 0080 | 0300 |
| 0000001340 | 036D | 0000 | 0352 | 0004 | 0007 | 0010 | 4000 | 0064 |
| 0000001360 | 467E | 6C69 | 0065 | 00E5 | 0000 | 0352 | 0004 | 000D |
| 0000001400 | 0001 | 0000 | 0065 | 4E7E | 7765 | 2E2E | 002E | 0001 |
| 0000001420 | 0000 | 0066 | 4F7E | 6570 | 2E6E | 2E2E | 1000 | 0000 |
| 0000001440 | EE40 | 7E02 | 6950 | 6B63 | 2300 | 0000 | 5200 | 0403 |
| 0000001460 | 0100 | 0100 | 0000 | EF00 | 5402 | 7365 | 2074 | 696C |
| 0000001500 | 7473 | 6920 | 2073 | 6D65 | 7470 | 0079 | 0001 | 0000 |
| 0000001520 | 0067 | 704F | 6E65 | 7E20 | 6548 | 6461 | 7265 | 0100 |
| 0000001540 | 0000 | 6900 | 7E00 | 6C43 | 736F | 0065 | 0001 | 0000 |
| 0000001560 | 0068 | 537E | 7661 | 0065 | 0001 | 0000 | 0259 | 7543 |
| 0000001600 | 7272 | 6E65 | 2074 | 467E | 6C6F | 6564 | 2E72 | 2E2E |
| 0000001620 | 0400 | 0000 | FF40 | 01FF | 0000 | 6B00 | 7E00 | 6D49 |
| 0000001640 | 6F70 | 7472 | 2E2E | 002E | 0001 | 0000 | 006A | 457E |

THU MAR 14 17:54:16 1991 TW.DLL PAGE 2, LINE 60

| | | | | | | | | |
|---|---|---|---|---|---|---|---|---|
| 0000001660 | 7078 | 726F | 2E74 | 2E2E | 0400 | 0000 | FF40 | 40FF |
| 0000001700 | 0000 | 0400 | 4580 | 787E | 7469 | 0100 | 0000 | 6C00 |
| 0000001720 | 4100 | 627E | 756F | 2E74 | 2E2E | 1000 | 0000 | DC40 |
| 0000001740 | 7E05 | 6445 | 7469 | 5100 | 0000 | 5200 | 0403 | 0300 |
| 0000001760 | 0100 | 0000 | DD00 | 7E05 | 7543 | 0974 | 6853 | 6669 |
| 0000002000 | 2074 | 202B | 6544 | 006C | 0001 | 0000 | 05DF | 7E43 |
| 0000002020 | 706F | 0979 | 7443 | 6C72 | 2B20 | 4920 | 736E | 0100 |
| 0000002040 | 0000 | DE00 | 7E05 | 6150 | 7473 | 0965 | 6853 | 6669 |
| 0000002060 | 2074 | 202B | 6E49 | 0073 | 0010 | 4000 | 012C | 437E |
| 0000002100 | 6572 | 7461 | 0065 | 006D | 0000 | 0352 | 0004 | 0006 |
| 0000002120 | 0001 | 0000 | 012D | 527E | 6365 | 726F | 0964 | 3246 |
| 0000002140 | 0100 | 0000 | 3300 | 7E01 | 6953 | 6E67 | 7461 | 7275 |
| 0000002160 | 0065 | 0001 | 2000 | 0132 | 4B7E | 7965 | 4520 | 6964 |
| 0000002200 | 6974 | 676E | 0400 | 0000 | FF40 | 01FF | 0000 | 2E00 |
| 0000002220 | 7E01 | 6843 | 6365 | 206B | 6353 | 6572 | 6E65 | 0100 |
| 0000002240 | 0020 | 2F00 | 7E01 | 614D | 6B72 | 4C20 | 636F | 7461 |
| 0000002260 | 726F | 1000 | 0000 | 9040 | 7E01 | 6552 | 6C70 | 7961 |
| 0000002300 | DB00 | 0000 | 5200 | 0403 | 0C00 | 0100 | 0000 | 9100 |
| 0000002320 | 7E01 | 6556 | 6972 | 7966 | 0100 | 0000 | 9A00 | 7E01 |
| 0000002340 | 6146 | 7473 | 5220 | 7065 | 616C | 0079 | 0004 | 4000 |
| 0000002360 | FFFF | 0001 | 0000 | 0192 | 527E | 6E75 | 0100 | 0000 |
| 0000002400 | 9900 | 4101 | 696E | 6D7E | 7461 | 0965 | 3546 | 0100 |
| 0000002420 | 2000 | 9300 | 7E01 | 7453 | 7065 | 4609 | 0038 | 0001 |
| 0000002440 | 0020 | 0194 | 7453 | 7065 | 7E20 | 6E49 | 6F74 | 4609 |
| 0000002460 | 0037 | 0001 | 0000 | 0195 | 507E | 7561 | 6573 | 0100 |
| 0000002500 | 0000 | 9600 | 7E01 | 6241 | 726F | 0074 | 0004 | 4000 |
| 0000002520 | FFFF | 0010 | 4000 | 028A | 437E | 6C61 | 736C | 2100 |
| 0000002540 | 0000 | 5200 | 0403 | 0100 | 0100 | 0000 | 8B00 | 4302 |
| 0000002560 | 6C61 | 206C | 6863 | 6961 | 206E | 6D65 | 7470 | 0079 |
| 0000002600 | 0001 | 0000 | 0197 | 427E | 6572 | 6B61 | 6F20 | 206E |
| 0000002620 | 694D | 6D73 | 7461 | 6863 | 4609 | 0039 | 0010 | 4000 |
| 0000002640 | 01F4 | 557E | 6974 | 696C | 6974 | 7365 | 8300 | 0000 |
| 0000002660 | 5200 | 0403 | 0700 | 0100 | 0000 | F500 | 7E01 | 6944 |
| 0000002700 | 7073 | 616C | 2E79 | 2E2E | 0100 | 0000 | F600 | 7E01 |
| 0000002720 | 6552 | 6F70 | 7472 | 2E73 | 2E2E | 0100 | 0000 | F700 |
| 0000002740 | 7E01 | 6946 | 746C | 7265 | 2E73 | 2E2E | 0100 | 0000 |
| 0000002760 | FA00 | 7E01 | 654C | 7261 | 206E | 6F50 | 6E69 | 6574 |
| 0000003000 | 2E72 | 2E2E | 0400 | 0000 | FF40 | 01FF | 0000 | F900 |
| 0000003020 | 7E01 | 6353 | 6C61 | 2065 | 7546 | 636E | 6974 | 6E6F |
| 0000003040 | 0100 | 0000 | 5B00 | 7E02 | 6C43 | 6165 | 756E | 0070 |
| 0000003060 | 0001 | 0000 | 02BC | 427E | 7079 | 7361 | 0073 | 0280 |
| 0000003100 | 0000 | 03EB | 3146 | 7E3D | 6548 | 706C | 0000 | 0000 |
| 0000003120 | 0009 | 0352 | 0002 | 0021 | 012D | 0002 | 0024 | 0199 |
| 0000003140 | 0002 | 0026 | 0194 | 0002 | 0027 | 0193 | 0002 | 0028 |
| 0000003160 | 0197 | 000A | 001B | 05DD | 000A | 001A | 05DE | 0012 |
| 0000003200 | 001A | 05DF | 0011 | 0043 | 0196 | 0000 | 0000 | 0000 |
| 0000003220 | 454E | 5F57 | 4554 | 5453 | 482E | 0000 | 0000 | 0000 |
| 0000003240 | 00DC | 0000 | 0352 | 000E | 0001 | FFFF | 0000 | 0000 |
| 0000003260 | 0003 | 0000 | 0001 | 000B | 0086 | 0090 | 9400 | 0009 |
| 0000003300 | 0029 | 00AE | 0037 | 03E7 | FFFF | 0092 | 0000 | 0000 |
| 0000003320 | 0000 | 0005 | 001B | 0096 | 0001 | 8001 | 0006 | 0024 |
| 0000003340 | 0077 | 000A | FFFF | FFFF | FFFF | 0000 | 0000 | 0000 |
| 0000003360 | 0005 | 0026 | 00B2 | 0001 | 8001 | 0007 | 0018 | 00A4 |
| 0000003400 | 000A | FFFF | FFFF | FFFF | 0000 | 0000 | 0000 | 0003 |
| 0000003420 | 0002 | 00D9 | 0400 | 8002 | 0043 | 0006 | 0026 | 000C |
| 0000003440 | 0001 | FFFF | FFFF | 6554 | 7473 | 6E69 | 2067 | 3231 |
| 0000003460 | 0033 | 0001 | 0000 | 6554 | 7473 | 6E69 | 2067 | 3231 |
| 0000003500 | 2C33 | 7620 | 7265 | 6973 | 6E6F | 3020 | 312E | 2D31 |
| 0000003520 | 0031 | 4328 | 2029 | 6F43 | 7970 | 6972 | 6867 | 2074 |

THU MAR 14 17:54:16 1991 TW.DLL PAGE 3, LINE 119

| | | | | | | | | |
|---|---|---|---|---|---|---|---|---|
| 0000003540 | 654D | 6372 | 7275 | 2079 | 6E49 | 6574 | 6172 | 7463 |
| 0000003560 | 7669 | 2065 | 3931 | 3039 | 4F00 | 004B | 0000 | 0000 |
| 0000003600 | 017A | 0000 | 0352 | 000E | 0001 | FFFF | 0000 | 0000 |
| 0000003620 | 0009 | 0000 | 0001 | 0000 | 013A | 0090 | 9400 | 0008 |
| 0000003640 | 0011 | 00D6 | 0069 | 04B0 | FFFF | 013B | 0000 | 0000 |
| 0000003660 | 0000 | 0005 | 0000 | 013F | 0001 | 8001 | 0013 | 0058 |
| 0000003700 | 00BC | 0008 | 04B1 | FFFF | FFFF | 0000 | 0000 | 0000 |
| 0000003720 | 0006 | 0000 | 0140 | 0008 | 8002 | 0013 | 004B | 00BC |
| 0000003740 | 0008 | 04B2 | FFFF | FFFF | 0000 | 0000 | 0000 | 0003 |
| 0000003760 | 0005 | 0141 | 0004 | 8002 | 00A5 | 003A | 0020 | 000A |
| 0000004000 | 04B3 | FFFF | FFFF | 0000 | 0000 | 0000 | 0003 | 0005 |
| 0000004020 | 0147 | 0004 | 8002 | 00A5 | 002B | 0020 | 000A | 04B4 |
| 0000004040 | FFFF | FFFF | 0000 | 0000 | 0000 | 0003 | 0006 | 014D |
| 0000004060 | 0004 | 8002 | 00A5 | 001C | 0029 | 000A | 04B5 | FFFF |
| 0000004100 | FFFF | 0000 | 0000 | 0000 | 0003 | 0007 | 0154 | 0004 |
| 0000004120 | 8002 | 00A7 | 000D | 002C | 000A | 04B6 | FFFF | FFFF |
| 0000004140 | 0000 | 0000 | 0000 | 0003 | 0013 | 015C | 0002 | 8002 |
| 0000004160 | 0015 | 0035 | 0062 | 000A | 04B7 | FFFF | FFFF | 0000 |
| 0000004200 | 0000 | 0000 | 0003 | 0002 | 0170 | 0400 | 8002 | 001B |
| 0000004220 | 000D | 0026 | 000C | 0001 | FFFF | FFFF | 0000 | 0000 |
| 0000004240 | 0000 | 0003 | 0006 | 0173 | 0000 | 8002 | 0052 | 000D |
| 0000004260 | 0026 | 000C | 0002 | FFFF | FFFF | 0300 | 0000 | 0000 |
| 0000004300 | 7E00 | 694C | 656E | 7E00 | 6554 | 7473 | 7E00 | 6E49 |
| 0000004320 | 7570 | 0074 | 537E | 7263 | 6565 | 006E | 437E | 6D6F |
| 0000004340 | 6170 | 6972 | 6F73 | 206E | 6166 | 6C69 | 7275 | 0065 |
| 0000004360 | 4B4F | 4300 | 6E61 | 6563 | 006C | 0000 | 0000 | 0000 |
| 0000004400 | 0316 | 0000 | 0352 | 000E | 0001 | FFFF | 0000 | 0000 |
| 0000004420 | 0015 | 0000 | 0001 | 0000 | 02A2 | 0090 | 9400 | 0005 |
| 0000004440 | 000F | 012C | 00A5 | 044C | FFFF | 02A3 | 0000 | 0000 |
| 0000004460 | 0000 | 0005 | 0000 | 02A7 | 0001 | 8001 | 000A | 0091 |
| 0000004500 | 003C | 0008 | 044D | FFFF | FFFF | 0000 | 0000 | 0000 |
| 0000004520 | 0006 | 0000 | 02A8 | 0008 | 8002 | 0046 | 0091 | 00D2 |
| 0000004540 | 0008 | 044E | FFFF | FFFF | 0000 | 0000 | 0000 | 0005 |
| 0000004560 | 0000 | 02A9 | 0001 | 8001 | 000A | 0082 | 003C | 0008 |
| 0000004600 | 044F | FFFF | FFFF | 0000 | 0000 | 0000 | 0006 | 0000 |
| 0000004620 | 02AA | 0008 | 8002 | 0046 | 0082 | 00D2 | 0008 | 0450 |
| 0000004640 | FFFF | FFFF | 0000 | 0000 | 0000 | 0005 | 0000 | 02AB |
| 0000004660 | 0001 | 8001 | 0014 | 006E | 003C | 0008 | 0451 | FFFF |
| 0000004700 | FFFF | 0000 | 0000 | 0000 | 0006 | 0000 | 02AC | 0008 |
| 0000004720 | 8002 | 005A | 006E | 00BE | 0008 | 0452 | FFFF | FFFF |
| 0000004740 | 0000 | 0000 | 0000 | 0005 | 0009 | 02AD | 0002 | 8001 |
| 0000004760 | 000F | 0037 | 0064 | 0028 | FFFF | FFFF | FFFF | 0000 |
| 0000005000 | 0000 | 0000 | 0003 | 0004 | 02B7 | 0004 | 8000 | 0014 |
| 0000005020 | 004B | 001E | 000A | 0455 | FFFF | FFFF | 0000 | 0000 |
| 0000005040 | 0000 | 0003 | 0006 | 02BC | 0004 | 8000 | 0014 | 003C |
| 0000005060 | 0032 | 000A | 0454 | FFFF | FFFF | 0000 | 0000 | 0000 |
| 0000005100 | 0005 | 0004 | 02C3 | 0002 | 8001 | 000F | 0005 | 0064 |
| 0000005120 | 002D | FFFF | FFFF | FFFF | 0000 | 0000 | 0000 | 0003 |
| 0000005140 | 0006 | 02C8 | 0000 | 8002 | 0014 | 0019 | 0020 | 000A |
| 0000005160 | 0456 | FFFF | FFFF | 0000 | 0000 | 0000 | 0003 | 0005 |
| 0000005200 | 02CF | 0000 | 8000 | 0014 | 000A | 0020 | 000A | 0457 |
| 0000005220 | FFFF | FFFF | 0000 | 0000 | 0000 | 0003 | 0005 | 02D5 |
| 0000005240 | 0000 | 8000 | 0046 | 0019 | 0020 | 000A | 0458 | FFFF |
| 0000005260 | FFFF | 0000 | 0000 | 0000 | 0003 | 0005 | 02DB | 0000 |
| 0000005300 | 8000 | 0046 | 000A | 0020 | 000A | 0459 | FFFF | FFFF |
| 0000005320 | 0000 | 0000 | 0000 | 0005 | 0004 | 02E1 | 0002 | 8001 |
| 0000005340 | 008C | 0023 | 0050 | 003C | FFFF | FFFF | FFFF | 0000 |
| 0000005360 | 0000 | 0000 | 0003 | 0009 | 02E6 | 0004 | 8002 | 0091 |
| 0000005400 | 0046 | 003C | 000A | 045A | FFFF | FFFF | 0000 | 0000 |

THU MAR 14 17:54:16 1991 TW.DLL PAGE 4, LINE 178

| | | | | | | | | |
|---|---|---|---|---|---|---|---|---|
| 0000005420 | 0000 | 0003 | 0007 | 02F0 | 0004 | 8000 | 0091 | 0037 |
| 0000005440 | 0032 | 000A | 045B | FFFF | FFFF | 0000 | 0000 | 0000 |
| 0000005460 | 0003 | 000B | 02F8 | 0004 | 8000 | 0091 | 0028 | 0046 |
| 0000005500 | 000A | 045C | FFFF | FFFF | 0000 | 0000 | 0000 | 0003 |
| 0000005520 | 0007 | 0304 | 0000 | 8001 | 0082 | 000A | 0028 | 000C |
| 0000005540 | 045D | FFFF | FFFF | 0000 | 0000 | 0000 | 0003 | 0002 |
| 0000005560 | 030C | 0400 | 8001 | 00BE | 000A | 0028 | 000C | 0001 |
| 0000005600 | FFFF | FFFF | 0000 | 0000 | 0000 | 0003 | 0006 | 030F |
| 0000005620 | 0000 | 8000 | 00F0 | 000A | 0028 | 000C | 0002 | FFFF |
| 0000005640 | FFFF | 0300 | 0000 | 0000 | 0000 | 0000 | 5300 | 6C65 |
| 0000005660 | 6365 | 6974 | 6E6F | 4100 | 6C7E | 006C | 7E4C | 636F |
| 0000005700 | 6C61 | 4C00 | 7369 | 0074 | 467E | 7269 | 7473 | 4C00 |
| 0000005720 | 7E61 | 7473 | 7E00 | 7250 | 7665 | 7E00 | 654E | 7478 |
| 0000005740 | 5400 | 7079 | 0065 | 457E | 7078 | 6365 | 6574 | 0064 |
| 0000005760 | 417E | 7463 | 6175 | 006C | 447E | 6669 | 6566 | 6572 |
| 0000006000 | 636E | 0065 | 557E | 6470 | 7461 | 0065 | 4B4F | 4300 |
| 0000006020 | 6E61 | 6563 | 006C | 0000 | 0000 | 0000 | 0000 | 0000 |
| 0000006040 | 0333 | 0000 | 0352 | 000E | 0001 | FFFF | 0000 | 0000 |
| 0000006060 | 0015 | 0000 | 0001 | 0000 | 02A2 | 0090 | 9400 | 0005 |
| 0000006100 | 000F | 011D | 0082 | 0514 | FFFF | 02A3 | 0000 | 0000 |
| 0000006120 | 0000 | 0005 | 0000 | 02A7 | 0001 | 8001 | 000A | 005F |
| 0000006140 | 001E | 0008 | 0516 | FFFF | FFFF | 0000 | 0000 | 0000 |
| 0000006160 | 0006 | 0000 | 02A8 | 000C | 8002 | 002D | 005F | 0091 |
| 0000006200 | 0008 | 0517 | FFFF | FFFF | 0000 | 0000 | 0000 | 0003 |
| 0000006220 | 0009 | 02A9 | 0001 | 8002 | 0028 | 004B | 0037 | 000A |
| 0000006240 | 0518 | FFFF | FFFF | 0000 | 0000 | 0000 | 0003 | 0009 |
| 0000006260 | 02B3 | 0004 | 8000 | 00D2 | 0064 | 0037 | 000A | 0521 |
| 0000006300 | FFFF | FFFF | 0000 | 0000 | 0000 | 0003 | 0009 | 02BD |
| 0000006320 | 0004 | 8000 | 00D2 | 005A | 0037 | 000A | 0522 | FFFF |
| 0000006340 | FFFF | 0000 | 0000 | 0000 | 0005 | 0004 | 02C7 | 0002 |
| 0000006360 | 8001 | 000A | 001E | 0064 | 002D | FFFF | FFFF | FFFF |
| 0000006400 | 0000 | 0000 | 0000 | 0003 | 0006 | 02CC | 0000 | 8002 |
| 0000006420 | 000F | 0032 | 0020 | 000A | 0519 | FFFF | FFFF | 0000 |
| 0000006440 | 0000 | 0000 | 0003 | 0005 | 02D3 | 0000 | 8000 | 000F |
| 0000006460 | 0023 | 0020 | 000A | 051A | FFFF | FFFF | 0000 | 0000 |
| 0000006500 | 0000 | 0003 | 0005 | 02D9 | 0000 | 8000 | 0046 | 0032 |
| 0000006520 | 0020 | 000A | 051C | FFFF | FFFF | 0000 | 0000 | 0000 |
| 0000006540 | 0003 | 0005 | 02DF | 0000 | 8000 | 0046 | 0023 | 0020 |
| 0000006560 | 000A | 051B | FFFF | FFFF | 0000 | 0000 | 0000 | 0005 |
| 0000006600 | 000A | 02E5 | 0002 | 8001 | 0078 | 002D | 009B | 0028 |
| 0000006620 | FFFF | FFFF | FFFF | 0000 | 0000 | 0000 | 0005 | 0000 |
| 0000006640 | 02F0 | 0001 | 8000 | 007D | 0041 | 008C | 0008 | 051D |
| 0000006660 | FFFF | FFFF | 0000 | 0000 | 0000 | 0005 | 0000 | 02F1 |
| 0000006700 | 0001 | 8000 | 007D | 0032 | 008C | 0008 | 051E | FFFF |
| 0000006720 | FFFF | 0000 | 0000 | 0000 | 0003 | 0004 | 02F2 | 0002 |
| 0000006740 | 8000 | 0078 | 001E | 0028 | 000A | 051F | FFFF | FFFF |
| 0000006760 | 0000 | 0000 | 0000 | 0003 | 000E | 02F7 | 0002 | 8000 |
| 0000007000 | 00B4 | 001E | 0046 | 000A | 0520 | FFFF | FFFF | 0000 |
| 0000007020 | 0000 | 0000 | 0003 | 0004 | 0306 | 0000 | 8003 | 000A |
| 0000007040 | 000A | 0028 | 000C | 0523 | FFFF | FFFF | 0000 | 0000 |
| 0000007060 | 0000 | 0003 | 0005 | 030B | 0000 | 8000 | 0037 | 000A |
| 0000007100 | 0028 | 000C | 0524 | FFFF | FFFF | 0000 | 0000 | 0000 |
| 0000007120 | 0003 | 0007 | 0311 | 0000 | 8000 | 0064 | 000A | 0028 |
| 0000007140 | 000C | 0525 | FFFF | FFFF | 0000 | 0000 | 0000 | 0003 |
| 0000007160 | 0003 | 0319 | 0400 | 8003 | 00B4 | 000A | 0028 | 000C |
| 0000007200 | 0001 | FFFF | FFFF | 0000 | 0000 | 0000 | 0003 | 0006 |
| 0000007220 | 031D | 0000 | 8000 | 00E6 | 000A | 0028 | 000C | 0002 |
| 0000007240 | FFFF | FFFF | 0000 | 0000 | 0000 | 0003 | 000E | 0324 |
| 0000007260 | 0002 | 8002 | 006E | 0073 | 0050 | 000A | 0515 | FFFF |

THU MAR 14 17:54:16 1991 TW.DLL PAGE 5, LINE 237

| | | | | | | | | |
|---|---|---|---|---|---|---|---|---|
| 0000007300 | FFFF | 0300 | 0000 | 0000 | 4400 | 7369 | 6C70 | 7961 |
| 0000007320 | 6465 | 7E00 | 6E49 | 6C63 | 6475 | 6465 | 4500 | 787E |
| 0000007340 | 6C63 | 6475 | 6465 | 4C00 | 7369 | 0074 | 467E | 7269 |
| 0000007360 | 7473 | 7E00 | 614C | 7473 | 7E00 | 725D | 7665 | 7E00 |
| 0000007400 | 654E | 7478 | 4100 | 7474 | 6972 | 7562 | 6574 | 0073 |
| 0000007420 | 0000 | 614D | 6B73 | 4100 | 7463 | 7669 | 2065 | 6946 |
| 0000007440 | 746C | 7265 | 0073 | 4E7E | 7765 | 7E00 | 6153 | 6576 |
| 0000007460 | 4400 | 6C65 | 7E65 | 6574 | 7E00 | 6B4F | 4300 | 6E61 |
| 0000007500 | 6563 | 006C | 6C47 | 626F | 6C61 | 4C20 | 6269 | 6172 |
| 0000007520 | 7972 | 0000 | 0000 | 0000 | 0000 | 0000 | 0000 | 0000 |
| 0000007540 | 0386 | 0000 | 0352 | 000E | 0001 | FFFF | 0000 | 0000 |
| 0000007560 | 0018 | 0000 | 0001 | 0000 | 02FC | 0090 | 9400 | 0005 |
| 0000007600 | 000F | 0190 | 00A0 | 06A4 | FFFF | 02FD | 0000 | 0000 |
| 0000007620 | 0000 | 0005 | 0000 | 0301 | 0001 | 8001 | 000A | 0082 |
| 0000007640 | 0104 | 0008 | 06A5 | FFFF | FFFF | 0000 | 0000 | 0000 |
| 0000007660 | 0006 | 0000 | 0302 | 0008 | 8002 | 0046 | 0082 | 00C8 |
| 0000007700 | 0008 | 06A6 | FFFF | FFFF | 0000 | 0000 | 0000 | 0005 |
| 0000007720 | 0000 | 0303 | 0001 | 8000 | 001E | 006E | 00C8 | 0008 |
| 0000007740 | 06A7 | FFFF | FFFF | 0000 | 0000 | 0000 | 0005 | 000F |
| 0000007760 | 0304 | 0002 | 8001 | 0014 | 001E | 009B | 0046 | FFFF |
| 0000010000 | FFFF | FFFF | 0000 | 0000 | 0000 | 0005 | 000B | 0314 |
| 0000010020 | 0002 | 8000 | 001E | 0041 | 008C | 0019 | FFFF | FFFF |
| 0000010040 | FFFF | 0000 | 0000 | 0000 | 0005 | 0001 | 0320 | 0001 |
| 0000010060 | 8000 | 0023 | 0046 | 000A | 0008 | FFFF | FFFF | FFFF |
| 0000010100 | 0000 | 0000 | 0000 | 0006 | 0000 | 0322 | 0008 | 8002 |
| 0000010120 | 0032 | 0046 | 0028 | 0008 | 06AA | FFFF | FFFF | 0000 |
| 0000010140 | 0000 | 0000 | 0005 | 0001 | 0323 | 0001 | 8000 | 0064 |
| 0000010160 | 0046 | 000A | 0008 | FFFF | FFFF | FFFF | 0000 | 0000 |
| 0000010200 | 0000 | 0006 | 0000 | 0325 | 0008 | 8002 | 0073 | 0046 |
| 0000010220 | 0028 | 0008 | 06AB | FFFF | FFFF | 0000 | 0000 | 0000 |
| 0000010240 | 0005 | 0009 | 0326 | 0002 | 8000 | 001E | 0023 | 008C |
| 0000010260 | 0019 | FFFF | FFFF | FFFF | 0000 | 0000 | 0000 | 0005 |
| 0000010300 | 0001 | 0330 | 0001 | 8000 | 0023 | 0028 | 000A | 0008 |
| 0000010320 | FFFF | FFFF | FFFF | 0000 | 0000 | 0000 | 0006 | 0000 |
| 0000010340 | 0332 | 0008 | 8002 | 0032 | 0028 | 0028 | 0008 | 06AC |
| 0000010360 | FFFF | FFFF | 0000 | 0000 | 0000 | 0005 | 0001 | 0333 |
| 0000010400 | 0001 | 8000 | 0064 | 0028 | 000A | 0008 | FFFF | FFFF |
| 0000010420 | FFFF | 0000 | 0000 | 0000 | 0006 | 0000 | 0335 | 0008 |
| 0000010440 | 8002 | 0073 | 0028 | 0028 | 0008 | 06AD | FFFF | FFFF |
| 0000010460 | 0000 | 0000 | 0000 | 0005 | 0004 | 0336 | 0002 | 8001 |
| 0000010500 | 00BE | 0032 | 0050 | 002D | FFFF | FFFF | FFFF | 0000 |
| 0000010520 | 0000 | 0000 | 0003 | 0009 | 033B | 0004 | 8000 | 00C8 |
| 0000010540 | 0046 | 0037 | 000A | 06A8 | FFFF | FFFF | 0000 | 0000 |
| 0000010560 | 0000 | 0003 | 0009 | 0345 | 0004 | 8000 | 00C8 | 0037 |
| 0000010600 | 0037 | 000A | 06A9 | FFFF | FFFF | 0000 | 0000 | 0000 |
| 0000010620 | 0003 | 0003 | 034F | 0002 | 8000 | 0163 | 0032 | 001E |
| 0000010640 | 000A | 06B1 | FFFF | FFFF | 0000 | 0000 | 0000 | 0005 |
| 0000010660 | 0011 | 0353 | 0002 | 8001 | 002D | 0005 | 005F | 0019 |
| 0000010700 | FFFF | FFFF | FFFF | 0000 | 0000 | 0000 | 0003 | 0007 |
| 0000010720 | 0365 | 0000 | 8002 | 0032 | 000A | 0028 | 000C | 06AE |
| 0000010740 | FFFF | FFFF | 0000 | 0000 | 0000 | 0003 | 0005 | 036D |
| 0000010760 | 0000 | 8000 | 0096 | 000A | 0028 | 000C | 06AF | FFFF |
| 0000011000 | FFFF | 0000 | 0000 | 0000 | 0003 | 0007 | 0373 | 0000 |
| 0000011020 | 8000 | 00C8 | 000A | 0028 | 000C | 06B0 | FFFF | FFFF |
| 0000011040 | 0000 | 0000 | 0000 | 0003 | 0003 | 037B | 0400 | 8003 |
| 0000011060 | 012C | 000A | 0028 | 000C | 0001 | FFFF | FFFF | 0000 |
| 0000011100 | 0000 | 0000 | 0003 | 0006 | 037F | 0000 | 8000 | 015E |
| 0000011120 | 000A | 0028 | 000C | 0002 | FFFF | FFFF | 0300 | 0000 |
| 0000011140 | 0000 | 0000 | 6946 | 746C | 7265 | 4C20 | 636F | 7461 |

THU MAR 14 17:54:16 1991 TW.DLL PAGE 6, LINE 296

| | | | | | | | | |
|---|---|---|---|---|---|---|---|---|
| 0000011160 | 6F69 | 006E | 6F42 | 7474 | 6D6F | 4C2D | 6665 | 0074 |
| 0000011200 | 0058 | 5900 | 0000 | 6F54 | 2D70 | 6952 | 6867 | 0074 |
| 0000011220 | 0058 | 5900 | 0000 | 7954 | 6570 | 7E00 | 6E49 | 6C63 |
| 0000011240 | 6475 | 6465 | 4500 | 787E | 6C63 | 6475 | 6465 | 4F00 |
| 0000011260 | 6666 | 4600 | 6C69 | 6574 | 2072 | 6544 | 6966 | 696E |
| 0000011300 | 6974 | 6E6F | 7E00 | 7243 | 6165 | 6574 | 7E00 | 6153 |
| 0000011320 | 6576 | 4400 | 6C65 | 7E65 | 6574 | 7E00 | 6B4F | 4300 |
| 0000011340 | 6E61 | 6563 | 006C | 0000 | 0000 | 0000 | 0000 | 0000 |
| 0000011360 | 0162 | 0000 | 0352 | 000E | 0001 | FFFF | 0000 | 0000 |
| 0000011400 | 0009 | 0000 | 0001 | 0000 | 013A | 0090 | 9400 | 0005 |
| 0000011420 | 000F | 0118 | 006E | 0708 | FFFF | 013B | 0000 | 0000 |
| 0000011440 | 0000 | 0005 | 0000 | 013F | 0001 | 8001 | 000A | 005A |
| 0000011460 | 0028 | 0008 | 0709 | FFFF | FFFF | 0000 | 0000 | 0000 |
| 0000011500 | 0006 | 0000 | 0140 | 0008 | 8002 | 0032 | 005A | 00D2 |
| 0000011520 | 0008 | 070A | FFFF | FFFF | 0000 | 0000 | 0000 | 0005 |
| 0000011540 | 0000 | 0141 | 0001 | 8001 | 000A | 0046 | 003C | 0008 |
| 0000011560 | 070B | FFFF | FFFF | 0000 | 0000 | 0000 | 0006 | 0000 |
| 0000011600 | 0142 | 0008 | 8002 | 0046 | 0046 | 00BE | 0008 | 070C |
| 0000011620 | FFFF | FFFF | 0000 | 0000 | 0000 | 0005 | 0004 | 0143 |
| 0000011640 | 0002 | 8001 | 001E | 000A | 004B | 0028 | FFFF | FFFF |
| 0000011660 | FFFF | 0000 | 0000 | 0000 | 0003 | 0005 | 0148 | 0004 |
| 0000011700 | 8000 | 0023 | 001E | 0041 | 000A | 0713 | FFFF | FFFF |
| 0000011720 | 0000 | 0000 | 0000 | 0003 | 0009 | 014E | 0004 | 8000 |
| 0000011740 | 0023 | 000F | 0041 | 000A | 0715 | FFFF | FFFF | 0000 |
| 0000011760 | 0000 | 0000 | 0003 | 0002 | 0158 | 0400 | 8001 | 0096 |
| 0000012000 | 000A | 0028 | 000C | 0001 | FFFF | FFFF | 0000 | 0000 |
| 0000012020 | 0000 | 0003 | 0006 | 015B | 0000 | 8000 | 00D2 | 000A |
| 0000012040 | 0028 | 000C | 0002 | FFFF | FFFF | 0300 | 0000 | 0000 |
| 0000012060 | 0000 | 5400 | 7079 | 0065 | 467E | 6C75 | 006C | 4D7E |
| 0000012100 | 7369 | 616D | 4374 | 0068 | 4B4F | 4300 | 6E61 | 6563 |
| 0000012120 | 006C | 0000 | 0000 | 0000 | 0000 | 0000 | 0000 | 0000 |
| 0000012140 | 0332 | 0000 | 0352 | 000E | 0001 | FFFF | 0000 | 0000 |
| 0000012160 | 0015 | 0000 | 0001 | 0000 | 02A2 | 0090 | 9400 | 0005 |
| 0000012200 | 000F | 011D | 009B | 076C | FFFF | 02A3 | 0000 | 0000 |
| 0000012220 | 0000 | 0005 | 0000 | 02A7 | 0001 | 8001 | 000A | 0087 |
| 0000012240 | 003C | 0008 | 076D | FFFF | FFFF | 0000 | 0000 | 0000 |
| 0000012260 | 0006 | 0000 | 02A8 | 000C | 8002 | 004B | 0087 | 0091 |
| 0000012300 | 0008 | 076E | FFFF | FFFF | 0000 | 0000 | 0000 | 0005 |
| 0000012320 | 0005 | 02A9 | 0002 | 8001 | 0014 | 003C | 003C | 003C |
| 0000012340 | FFFF | FFFF | FFFF | 0000 | 0000 | 0000 | 0003 | 0007 |
| 0000012360 | 02AF | 0004 | 8002 | 0019 | 0064 | 0032 | 000A | 076F |
| 0000012400 | FFFF | FFFF | 0000 | 0000 | 0000 | 0003 | 0005 | 02B7 |
| 0000012420 | 0004 | 8000 | 0019 | 0055 | 0032 | 000A | 0770 | FFFF |
| 0000012440 | FFFF | 0000 | 0000 | 0000 | 0003 | 0006 | 02BD | 0004 |
| 0000012460 | 8000 | 0019 | 0046 | 0032 | 000A | 0771 | FFFF | FFFF |
| 0000012500 | 0000 | 0000 | 0000 | 0005 | 0005 | 02C4 | 0002 | 8001 |
| 0000012520 | 0064 | 003C | 003C | 003C | FFFF | FFFF | FFFF | 0000 |
| 0000012540 | 0000 | 0000 | 0003 | 0008 | 02CA | 0004 | 8002 | 0069 |
| 0000012560 | 0064 | 0032 | 000A | 0772 | FFFF | FFFF | 0000 | 0000 |
| 0000012600 | 0000 | 0003 | 0004 | 02D3 | 0004 | 8000 | 0069 | 0055 |
| 0000012620 | 0032 | 000A | 0773 | FFFF | FFFF | 0000 | 0000 | 0000 |
| 0000012640 | 0003 | 0006 | 02D8 | 0004 | 8000 | 0069 | 0046 | 0032 |
| 0000012660 | 000A | 0774 | FFFF | FFFF | 0000 | 0000 | 0000 | 0005 |
| 0000012700 | 0005 | 02DF | 0002 | 8001 | 00B4 | 003C | 0046 | 003C |
| 0000012720 | FFFF | FFFF | FFFF | 0000 | 0000 | 0000 | 0003 | 0007 |
| 0000012740 | 02E5 | 0000 | 8002 | 00B9 | 0064 | 003C | 000A | 077F |
| 0000012760 | FFFF | FFFF | 0000 | 0000 | 0000 | 0003 | 000A | 02ED |
| 0000013000 | 0000 | 8000 | 00B9 | 0055 | 003C | 000A | 0776 | FFFF |
| 0000013020 | FFFF | 0000 | 0000 | 0000 | 0003 | 000B | 02F8 | 0000 |

THU MAR 14 17:54:16 1991 TW.DLL PAGE 7, LINE 355

| | | | | | | | | |
|---|---|---|---|---|---|---|---|---|
| 0000013040 | 8000 | 00B9 | 0046 | 003C | 000A | 0777 | FFFF | FFFF |
| 0000013060 | 0000 | 0000 | 0000 | 0005 | 0008 | 0304 | 0002 | 8001 |
| 0000013100 | 0014 | 001E | 00DC | 0014 | FFFF | FFFF | FFFF | 0000 |
| 0000013120 | 0000 | 0000 | 0005 | 0000 | 030D | 0001 | 8000 | 0019 |
| 0000013140 | 0020 | 00D2 | 0008 | 0778 | FFFF | FFFF | 0000 | 0000 |
| 0000013160 | 0000 | 0003 | 0008 | 030E | 0000 | 8003 | 000A | 000A |
| 0000013200 | 0028 | 000C | 0779 | FFFF | FFFF | 0000 | 0000 | 0000 |
| 0000013220 | 0003 | 0005 | 0317 | 0000 | 8000 | 0037 | 000A | 0028 |
| 0000013240 | 000C | 077A | FFFF | FFFF | 0000 | 0000 | 0000 | 0003 |
| 0000013260 | 0006 | 031D | 0000 | 8000 | 0064 | 000A | 0028 | 000C |
| 0000013300 | 077B | FFFF | FFFF | 0000 | 0000 | 0000 | 0003 | 0005 |
| 0000013320 | 0324 | 0000 | 8000 | 0091 | 000A | 0028 | 000C | 077C |
| 0000013340 | FFFF | FFFF | 0000 | 0000 | 0000 | 0003 | 0007 | 032A |
| 0000013360 | 0000 | 8000 | 00DC | 000A | 0028 | 000C | 0002 | FFFF |
| 0000013400 | FFFF | 0300 | 0000 | 0000 | 4300 | 616C | 7373 | 7E00 |
| 0000013420 | 7953 | 7473 | 6D65 | 7E00 | 6157 | 7469 | 7E00 | 744F |
| 0000013440 | 6568 | 0072 | 7453 | 6C79 | 0065 | 4F7E | 6576 | 6C72 |
| 0000013460 | 7961 | 7E00 | 4F58 | 0052 | 4D7E | 7869 | 6465 | 4C00 |
| 0000013500 | 6165 | 6E72 | 7E00 | 6153 | 706D | 656C | 7E00 | 7453 |
| 0000013520 | 7461 | 6369 | 4820 | 0050 | 447E | 6E79 | 6D61 | 6369 |
| 0000013540 | 4820 | 0050 | 654D | 7373 | 6761 | 7365 | 0000 | 447E |
| 0000013560 | 7369 | 6C70 | 7961 | 7E00 | 6153 | 6576 | 4400 | 6C65 |
| 0000013600 | 7465 | 0065 | 6241 | 726F | 0074 | 437E | 6E61 | 6563 |
| 0000013620 | 006C | 0000 | 0000 | 0000 | 0000 | 0000 | 0000 | 0000 |
| 0000013640 | 00B5 | 0000 | 0352 | 000E | 0001 | FFFF | 0000 | 0000 |
| 0000013660 | 0004 | 0000 | 0001 | 0000 | 00A4 | 0090 | 9400 | 000F |
| 0000013700 | 002D | 00B4 | 003C | 03E8 | FFFF | 00A5 | 0000 | 0000 |
| 0000013720 | 0000 | 0005 | 0000 | 00A9 | 0001 | 8001 | 000A | 002D |
| 0000013740 | 00A0 | 0008 | 03E9 | FFFF | FFFF | 0000 | 0000 | 0000 |
| 0000013760 | 0006 | 0000 | 00AA | 000C | 8002 | 000A | 0019 | 00A0 |
| 0000014000 | 0008 | 03EA | FFFF | FFFF | 0000 | 0000 | 0000 | 0003 |
| 0000014020 | 0002 | 00AB | 0400 | 8002 | 0028 | 0002 | 0026 | 000C |
| 0000014040 | 0001 | FFFF | FFFF | 0000 | 0000 | 0000 | 0003 | 0006 |
| 0000014060 | 00AE | 0000 | 8002 | 0064 | 0002 | 0026 | 000C | 0002 |
| 0000014100 | FFFF | FFFF | 0100 | 0000 | 0000 | 4F00 | 004B | 6143 |
| 0000014120 | 636E | 6C65 | 0000 | 0000 | 0000 | 0000 | 0000 | 0000 |
| 0000014140 | 0126 | 0000 | 0352 | 000E | 0001 | FFFF | 0000 | 0000 |
| 0000014160 | 0006 | 0000 | 0001 | 0008 | 00E0 | 0090 | 9400 | 000F |
| 0000014200 | 001F | 00B4 | 004C | 0578 | FFFF | 00E9 | 0000 | 0000 |
| 0000014220 | 0000 | 0005 | 0014 | 00ED | 0001 | 8000 | 000B | 003F |
| 0000014240 | 00A0 | 0008 | 0000 | FFFF | FFFF | 0000 | 0000 | 0000 |
| 0000014260 | 0006 | 0000 | 0102 | 000C | 8002 | 000B | 0031 | 00A0 |
| 0000014300 | 0008 | 057C | FFFF | FFFF | 0000 | 0000 | 0000 | 0003 |
| 0000014320 | 0009 | 0103 | 0004 | 8003 | 0028 | 001E | 0039 | 000A |
| 0000014340 | 0579 | FFFF | FFFF | 0000 | 0000 | 0000 | 0003 | 000E |
| 0000014360 | 010D | 0004 | 8002 | 0028 | 0016 | 004E | 000A | 057A |
| 0000014400 | FFFF | FFFF | 0000 | 0000 | 0000 | 0003 | 0002 | 011C |
| 0000014420 | 0400 | 8003 | 001E | 0005 | 0026 | 000C | 0001 | FFFF |
| 0000014440 | FFFF | 0000 | 0000 | 0000 | 0003 | 0006 | 011F | 0000 |
| 0000014460 | 8002 | 005A | 0005 | 0026 | 000C | 0002 | FFFF | FFFF |
| 0000014500 | 654E | 2077 | 6554 | 7473 | 0100 | 0000 | 4500 | 746E |
| 0000014520 | 7265 | 6E20 | 7765 | 7420 | 7365 | 2074 | 616E | 656D |
| 0000014540 | 003A | 5400 | 7365 | 2074 | 6143 | 6573 | 5400 | 7365 |
| 0000014560 | 2074 | 7250 | 636F | 6465 | 7275 | 0065 | 4B4F | 4300 |
| 0000014600 | 6E61 | 6563 | 006C | 0000 | 0000 | 0000 | 0000 | 0090 |
| 0000014620 | 0330 | 0000 | 0352 | 000E | 0001 | FFFF | 0000 | 0000 |
| 0000014640 | 0015 | 0000 | 0001 | 000B | 02A2 | 0890 | 9400 | 0019 |
| 0000014660 | 001D | 017A | 00AD | 05DC | FFFF | 02AE | 0000 | 0000 |
| 0000014700 | 0000 | 0005 | 000A | 02B2 | 0002 | 8001 | 000F | 006C |

THU MAR 14 17:54:16 1991 TW.DLL PAGE 8, LINE 414

| | | | | | | | | |
|---|---|---|---|---|---|---|---|---|
| 0000014720 | 00C0 | 003C | FFFF | FFFF | FFFF | 0000 | 0000 | 0000 |
| 0000014740 | 0007 | 0000 | 02BD | 0000 | 8000 | 0015 | 007D | 0080 |
| 0000014760 | 0020 | 0102 | FFFF | FFFF | 0000 | 0000 | 0000 | 0006 |
| 0000015000 | 0000 | 02BE | 0008 | 8002 | 0017 | 0071 | 0072 | 0008 |
| 0000015020 | 0103 | FFFF | FFFF | 0000 | 0000 | 0000 | 0003 | 0007 |
| 0000015040 | 02BF | 0000 | 8002 | 009F | 0091 | 0026 | 000C | 0104 |
| 0000015060 | FFFF | FFFF | 0000 | 0000 | 0000 | 0003 | 0007 | 02C7 |
| 0000015100 | 0000 | 8000 | 00A1 | 0073 | 0026 | 000C | 0106 | FFFF |
| 0000015120 | FFFF | 0000 | 0000 | 0000 | 0003 | 0007 | 02CF | 0000 |
| 0000015140 | 8000 | 00A1 | 0082 | 0026 | 000C | 0105 | FFFF | FFFF |
| 0000015160 | 0000 | 0000 | 0000 | 0005 | 0008 | 02D7 | 0001 | 8001 |
| 0000015200 | 00D9 | 008C | 0023 | 0008 | FFFF | FFFF | FFFF | 0000 |
| 0000015220 | 0000 | 0000 | 0006 | 0000 | 02E0 | 000C | 8002 | 0101 |
| 0000015240 | 008C | 0067 | 0008 | 010B | FFFF | FFFF | 0000 | 0000 |
| 0000015260 | 0000 | 0005 | 0006 | 02E1 | 0001 | 8000 | 00D9 | 007D |
| 0000015300 | 001E | 0008 | FFFF | FFFF | FFFF | 0000 | 0000 | 0000 |
| 0000015320 | 0006 | 0000 | 02EB | 000C | 8000 | 00F7 | 007D | 0071 |
| 0000015340 | 0008 | 010C | FFFF | FFFF | 0000 | 0000 | 0000 | 0005 |
| 0000015360 | 000E | 02E9 | 0001 | 8000 | 0014 | 005F | 003F | 0008 |
| 0000015400 | FFFF | FFFF | FFFF | 0000 | 0000 | 0000 | 0006 | 0000 |
| 0000015420 | 02F8 | 000C | 8002 | 005A | 005F | 010E | 0008 | 010D |
| 0000015440 | FFFF | FFFF | 0000 | 0000 | 0000 | 0005 | 001B | 02F9 |
| 0000015460 | 0001 | 8000 | 0014 | 0050 | 007D | 0008 | FFFF | FFFF |
| 0000015500 | FFFF | 0000 | 0000 | 0000 | 0006 | 0000 | 0315 | 000C |
| 0000015520 | 8002 | 0091 | 0050 | 00D7 | 0008 | 010E | FFFF | FFFF |
| 0000015540 | 0000 | 0000 | 0000 | 0005 | 000B | 0316 | 0002 | 8001 |
| 0000015560 | 0017 | 0014 | 0153 | 0037 | FFFF | FFFF | FFFF | 0000 |
| 0000015600 | 0000 | 0000 | 0006 | 0000 | 0322 | 0008 | 8002 | 0019 |
| 0000015620 | 0032 | 014F | 0008 | 0107 | FFFF | FFFF | 0000 | 0000 |
| 0000015640 | 0000 | 0006 | 0000 | 0323 | 0008 | 8002 | 0019 | 0028 |
| 0000015660 | 014F | 0008 | 0108 | FFFF | FFFF | 0000 | 0000 | 0000 |
| 0000015700 | 0006 | 0000 | 0324 | 0008 | 8002 | 0019 | 001E | 014F |
| 0000015720 | 0008 | 0109 | FFFF | FFFF | 0000 | 0000 | 0000 | 0006 |
| 0000015740 | 0000 | 0325 | 0008 | 8002 | 0019 | 0014 | 014F | 0008 |
| 0000015760 | 010A | FFFF | FFFF | 0000 | 0000 | 0000 | 0003 | 0002 |
| 0000016000 | 0326 | 0400 | 8002 | 0090 | 0002 | 0026 | 000C | 0001 |
| 0000016020 | FFFF | FFFF | 0000 | 0000 | 0000 | 0003 | 0006 | 0329 |
| 0000016040 | 0000 | 8000 | 00C9 | 0002 | 0026 | 000C | 0002 | FFFF |
| 0000016060 | FFFF | 6554 | 7473 | 4820 | 6165 | 6564 | 0072 | 0033 |
| 0000016100 | 0000 | 6150 | 6172 | 656D | 6574 | 7372 | 0000 | 7E00 |
| 0000016120 | 6E49 | 6573 | 7472 | 7E00 | 6544 | 656C | 6574 | 7E00 |
| 0000016140 | 7055 | 6164 | 6574 | 4100 | 7475 | 6F68 | 3A72 | 0020 |
| 0000016160 | 4400 | 7461 | 3A65 | 0020 | 5300 | 5455 | 6620 | 6E75 |
| 0000016200 | 7463 | 6F69 | 3A6E | 0020 | 4600 | 6E75 | 7463 | 6F69 |
| 0000016220 | 616E | 206C | 7053 | 6365 | 5420 | 6172 | 6563 | 6162 |
| 0000016240 | 6B63 | 203A | 0000 | 6544 | 6373 | 6972 | 7470 | 6F69 |
| 0000016260 | 006E | 0000 | 0000 | 4B4F | 4300 | 6E61 | 6563 | 006C |
| 0000016300 | 424E | 3230 | 0070 | 0000 | 0000 | 0000 | 0000 | 0000 |
| 0000016320 | 0000 | 0000 | 5C26 | 3174 | 3332 | 615C | 7070 | 745C |
| 0000016340 | 5C6D | 6574 | 7473 | 6977 | 5C6E | 626F | 5F6A | 7372 |
| 0000016360 | 5C63 | 7774 | 6C64 | 2E6C | 626F | 006A | 0100 | 8100 |
| 0000016400 | 0500 | 735F | 6174 | 056D | 000D | 1A00 | 0C00 | 0005 |
| 0000016420 | 0100 | 8100 | 0400 | 7473 | 6D61 | 0C00 | 6C6C | 6269 |
| 0000016440 | 6463 | 6C6C | 6C2E | 6269 | 6F07 | 3273 | 6C2E | 6269 |
| 0000016460 | 0004 | 0101 | 0001 | 0008 | 0000 | 0033 | 0102 | 0001 |
| 0000016500 | 003B | 0000 | 000C | 0104 | 0001 | 0047 | 0000 | 0013 |
| 0000016520 | 0106 | 0000 | 005A | 0000 | 0016 | 424E | 3230 | 00A2 |
| 0000016540 | 0000 | | | | | | | |
| 0000016542 | | | | | | | | |

THU MAR 14 17:54:36 1991 UI.DLL PAGE 1, LINE 1

| | | | | | | | | |
|---|---|---|---|---|---|---|---|---|
| 0000000000 | 5A4D | 017B | 002F | 0000 | 0004 | 0000 | FFFF | 0000 |
| 0000000020 | 00B6 | 0000 | 0000 | 0000 | 0040 | 0000 | 0000 | 0000 |
| 0000000040 | 0000 | 0000 | 0000 | 0000 | 0000 | 0000 | 0000 | 0000 |
| 0000000060 | 0000 | 0000 | 0000 | 0000 | 0000 | 0000 | 0080 | 0000 |
| 0000000100 | 1F0E | 0EBA | B400 | CD09 | B821 | 4C01 | 21CD | 6854 |
| 0000000120 | 7369 | 7020 | 6F72 | 7267 | 6D61 | 6320 | 6E61 | 6F6E |
| 0000000140 | 2074 | 7572 | 206E | 6E69 | 4420 | 534F | 6D20 | 646F |
| 0000000160 | 2E65 | 0D0D | 240A | 0000 | 0000 | 0000 | 0000 | 0000 |
| 0000000200 | 454E | 0A05 | 0341 | 0070 | 8DB8 | 4D68 | 8006 | 0006 |
| 0000000220 | 0000 | 0000 | 18AC | 0001 | 0000 | 0000 | 0006 | 0005 |
| 0000000240 | 0039 | 0040 | 0070 | 0070 | 02A1 | 02AB | 0431 | 0000 |
| 0000000260 | 0000 | 0004 | 0000 | 0001 | 0000 | 0000 | 0000 | 0000 |
| 0000000300 | 0047 | 2C54 | 0D00 | 2C54 | 0323 | 002A | 0D00 | 002C |
| 0000000320 | 0327 | 00C6 | 0C01 | 0100 | 0000 | 0000 | 0C01 | 0850 |
| 0000000340 | 0000 | 0000 | 0C01 | 0204 | 0334 | 2A11 | 0D01 | 2A60 |
| 0000000360 | 5502 | 0049 | 0800 | 5F55 | 4946 | 494E | 4853 | 0001 |
| 0000000400 | 5509 | 455F | 5252 | 4D5F | 4753 | 0002 | 5510 | 505F |
| 0000000420 | 4552 | 4150 | 4552 | 495F | 5F48 | 534D | 0347 | 0D00 |
| 0000000440 | 5F55 | 4547 | 5F54 | 5754 | 485F | 4E57 | 0444 | 0900 |
| 0000000460 | 5F55 | 4547 | 5F54 | 534D | 0547 | 0600 | 5F55 | 4F46 |
| 0000000500 | 4D52 | 0006 | 550E | 575F | 4E49 | 445F | 5349 | 5F50 |
| 0000000520 | 5245 | 0752 | 0A00 | 5F55 | 4944 | 5053 | 455F | 5252 |
| 0000000540 | 0008 | 550D | 535F | 5445 | 545F | 5F57 | 4D48 | 444F |
| 0000000560 | 0009 | 550C | 535F | 5445 | 495F | 5F48 | 534D | 0A47 |
| 0000000600 | 0600 | 5F55 | 4E49 | 5449 | 000B | 5509 | 445F | 5349 |
| 0000000620 | 5F50 | 424D | 000C | 5514 | 505F | 4552 | 4150 | 4552 |
| 0000000640 | 495F | 5F48 | 534D | 5F47 | 4150 | 0D52 | 1000 | 5F55 |
| 0000000660 | 4553 | 5F54 | 4F4C | 4143 | 5F4C | 5748 | 444E | 000E |
| 0000000700 | 5506 | 4C5F | 5349 | 0F54 | 0B00 | 5F55 | 5254 | 4E41 |
| 0000000720 | 5F53 | 534D | 1047 | 0D00 | 5F55 | 4553 | 5F54 | 5754 |
| 0000000740 | 485F | 4E57 | 1144 | 0A00 | 5F55 | 4F50 | 5453 | 4D5F |
| 0000000760 | 4753 | 0012 | 5513 | 575F | 4E49 | 4D5F | 5345 | 4153 |
| 0000001000 | 4547 | 535F | 5954 | 454C | 0013 | 550C | 535F | 5445 |
| 0000001020 | 435F | 4E4F | 4946 | 1447 | 0F00 | 5F55 | 454D | 5353 |
| 0000001040 | 4741 | 5F45 | 5453 | 4C59 | 1545 | 0F00 | 5F55 | 4547 |
| 0000001060 | 5F54 | 4157 | 5449 | 495F | 4F43 | 164E | 0A00 | 5F55 |
| 0000001100 | 4157 | 5449 | 4D5F | 4753 | 0017 | 550D | 575F | 4E49 |
| 0000001120 | 4D5F | 5345 | 4153 | 4547 | 0018 | 5509 | 4D5F | 5345 |
| 0000001140 | 4153 | 4547 | 0019 | 5514 | 505F | 4552 | 4150 | 4552 |
| 0000001160 | 495F | 5F48 | 534D | 5F47 | 5542 | 1A46 | 1100 | 5F55 |
| 0000001200 | 4547 | 5F54 | 5551 | 5545 | 5F45 | 5453 | 5441 | 1B45 |
| 0000001220 | 0D00 | 5F55 | 4547 | 5F54 | 5754 | 485F | 4F4D | 1C44 |
| 0000001240 | 0900 | 5F55 | 4547 | 5F54 | 4148 | 1D42 | 0D00 | 5F55 |
| 0000001260 | 4547 | 5F54 | 5245 | 5F52 | 5453 | 1E52 | 0F00 | 5F55 |
| 0000001300 | 4553 | 5F54 | 4157 | 5449 | 495F | 4F43 | 1F4E | 0600 |
| 0000001320 | 5F55 | 5246 | 4545 | 0020 | 550E | 475F | 5445 | 4E5F |
| 0000001340 | 5845 | 5F54 | 534D | 2147 | 1400 | 5F55 | 5250 | 5045 |
| 0000001360 | 5241 | 5F45 | 4849 | 4D5F | 4753 | 535F | 5254 | 0022 |
| 0000001400 | 550A | 535F | 5445 | 485F | 4E57 | 2344 | 1000 | 5F55 |
| 0000001420 | 4944 | 5053 | 4C5F | 434F | 4C41 | 455F | 5252 | 0024 |
| 0000001440 | 0100 | 0A00 | 0E00 | 1400 | 9000 | 0000 | 4408 | 534F |
| 0000001460 | 4143 | 4C4C | 0353 | 534D | 0547 | 4D50 | 4957 | 064E |
| 0000001500 | 626C | 7069 | 746D | 5F0D | 5842 | 445F | 4245 | 4755 |
| 0000001520 | 4F4D | 4544 | 5F0D | 5842 | 545F | 4D49 | 5345 | 4F4D |
| 0000001540 | 4544 | 5F09 | 5842 | 425F | 535F | 4749 | 5F0E | 5842 |
| 0000001560 | 445F | 4245 | 4755 | 4E45 | 4554 | 0F52 | 425F | 5F58 |
| 0000001600 | 4544 | 5542 | 5247 | 5445 | 5255 | 0E4E | 425F | 5F59 |
| 0000001620 | 4544 | 5542 | 5047 | 4952 | 544E | 5F11 | 5842 | 445F |
| 0000001640 | 4245 | 4755 | 4156 | 4952 | 4241 | 454C | 5F0E | 5842 |

THU MAR 14 17:54:36 1991 UI.DLL PAGE 2, LINE 60

| | | | | | | | | |
|---|---|---|---|---|---|---|---|---|
| 0000001660 | 505F | 4341 | 464B | 4C49 | 4554 | 0552 | 4244 | 505F |
| 0000001700 | 2449 | 0101 | 03C9 | A001 | 0116 | 072B | 7901 | 0103 |
| 0000001720 | 0489 | BB01 | 0111 | 15F6 | 3201 | 0116 | 02D2 | 5E01 |
| 0000001740 | 0109 | 0000 | 6001 | 0110 | 0995 | 1901 | 0112 | 118C |
| 0000001760 | CF01 | 0106 | 0345 | DE01 | 0104 | 124D | FB01 | 0101 |
| 0000002000 | 1389 | 7301 | 0118 | 0645 | 4B01 | 0113 | 13C9 | DD01 |
| 0000002020 | 010B | 0684 | FF01 | 0102 | 0055 | 0301 | 0114 | 16D8 |
| 0000002040 | 2E01 | 0110 | 0411 | DC01 | 010D | 11E5 | 6901 | 0016 |
| 0000002060 | 3500 | 7355 | 7265 | 4920 | 746E | 7265 | 6166 | 6563 |
| 0000002100 | 6C20 | 6269 | 6172 | 7972 | 2820 | 2943 | 4D20 | 7265 |
| 0000002120 | 7563 | 7972 | 4920 | 746E | 7265 | 6341 | 6974 | 6576 |
| 0000002140 | 202C | 3931 | 3039 | 0020 | 0000 | 0000 | 0000 | 0000 |
| 0000002160 | 581E | 4590 | 8B55 | 1EEC | D88E | EC81 | 0000 | 5657 |
| 0000002200 | B81E | FFFF | D88E | 006A | FF9A | 00FF | 8E00 | C606 |
| 0000002220 | 2628 | 00A3 | 2602 | 1689 | 0202 | FF26 | 0236 | 2602 |
| 0000002240 | 36FF | 0200 | E868 | 9A03 | FFFF | 0000 | 12A3 | 892A |
| 0000002260 | 1416 | B82A | 0000 | 00E9 | 1F00 | 5F5E | ED83 | 8B02 |
| 0000002300 | 1FE5 | 4D5D | 1ECB | 9058 | 5545 | EC8B | 8E1E | 81D8 |
| 0000002320 | 24EC | 5700 | 1E56 | 12B8 | 8E00 | C7D8 | FA46 | 2088 |
| 0000002340 | 5E8C | C7FC | F446 | 0101 | C02B | 4689 | 89E6 | E446 |
| 0000002360 | 068E | 28C8 | 8326 | FF3E | 00FF | 0375 | 1DE9 | FF00 |
| 0000002400 | 3836 | FF1D | 3636 | 8D1D | DC46 | 5016 | FF9A | 00FF |
| 0000002420 | 8300 | 08C4 | 003D | 7400 | E903 | 000F | 068E | 28CA |
| 0000002440 | 8326 | 8F3E | 0001 | 0375 | 3BE9 | 1E00 | 8F68 | 8D20 |
| 0000002460 | E846 | 5016 | 468D | 16DC | 8D50 | F646 | 5016 | 8368 |
| 0000002500 | 1E00 | 9C68 | FF20 | 3436 | FF1D | 3236 | FF1D | 3836 |
| 0000002520 | FF1D | 3636 | 9A1D | FFFF | 0000 | C483 | 891E | F646 |
| 0000002540 | 5689 | E9F8 | 0008 | C02B | 4689 | 89F8 | F646 | 068E |
| 0000002560 | 28C6 | A126 | 0200 | 8B26 | 0216 | C402 | 065E | 8926 |
| 0000002600 | 2607 | 5789 | 8E02 | C806 | 2628 | 3E83 | 0177 | 7500 |
| 0000002620 | E903 | 004C | 7E83 | FEE0 | 0375 | 43E9 | 8E00 | C606 |
| 0000002640 | 2628 | 36FF | 0202 | FF26 | 0036 | 1E02 | 9668 | 8D20 |
| 0000002660 | E846 | 5016 | 468D | 16F6 | 8D50 | DC46 | 5016 | 681E |
| 0000002700 | 209C | 8568 | FF00 | 3436 | FF1D | 3236 | FF1D | 3836 |
| 0000002720 | FF1D | 3636 | 681D | 010A | FF9A | 00FF | 8300 | 24C4 |
| 0000002740 | 068E | 28C8 | 8326 | 873E | 0000 | 0375 | 09E9 | 8300 |
| 0000002760 | E07E | 74FE | E903 | 000F | 068E | 28CA | 8326 | FF3E |
| 0000003000 | 00FF | 0375 | 50E9 | C700 | E246 | 0000 | 76FF | FFE6 |
| 0000003020 | E476 | 468D | 16E2 | FF50 | F476 | 76FF | FFFC | FA76 |
| 0000003040 | 4E8D | 16E8 | 8D51 | F64E | 5116 | 4E8D | 16DC | 1E51 |
| 0000003060 | 9C68 | 6820 | 0086 | 36FF | 1D34 | 36FF | 1D32 | 36FF |
| 0000003100 | 1D38 | 36FF | 1D36 | FF9A | 00FF | 8300 | 28C4 | 468B |
| 0000003120 | E9E2 | 0009 | 06E9 | B800 | 0000 | 00E9 | 1F00 | 5F5E |
| 0000003140 | ED83 | 8B02 | 1FE5 | 4D5D | 04CA | 1E00 | 9058 | 5545 |
| 0000003160 | EC8B | 8E1E | 81D8 | 0CEC | 5701 | 1E56 | 67B8 | 8E00 |
| 0000003200 | C4D8 | 0E5E | 8B26 | 2607 | 578B | 8902 | F686 | 89FE |
| 0000003220 | F896 | FFFE | 1476 | 76FF | 8D12 | F686 | 16FE | 6A50 |
| 0000003240 | 8D00 | FA8E | 16FE | 8D51 | F496 | 16FE | 9A52 | FFFF |
| 0000003260 | 0000 | 4689 | 8BFA | F686 | 8BFE | F896 | C4FE | 0E5E |
| 0000003300 | 8926 | 2607 | 5789 | 8B02 | 0C46 | 460B | 750A | E903 |
| 0000003320 | 0014 | 868D | FEFA | 5016 | 76FF | FF0C | 0A76 | 0C9A |
| 0000003340 | FF2A | 83FF | 08C4 | 468B | 0B08 | 0646 | 0375 | 0AE9 |
| 0000003360 | 8B00 | F486 | C4FE | 065E | 8926 | 8307 | FA7E | 7400 |
| 0000003400 | E903 | 001B | B6FF | FEF8 | B6FF | FEF6 | 036A | 681E |
| 0000003420 | 20A6 | 468D | 16FC | 9A50 | FFFF | 0000 | 4689 | 83FA |
| 0000003440 | FA7E | 7400 | E903 | 0006 | 468B | A3FC | 2084 | 468B |
| 0000003460 | E9FA | 0000 | 5E1F | 835F | 02ED | E58B | 5D1F | CA4D |
| 0000003500 | 0010 | 581E | 4590 | 8B55 | 1EEC | D88E | EC81 | 0000 |
| 0000003520 | 5657 | B81E | 020D | D88E | 468B | A306 | 2076 | 00E9 |

THU MAR 14 17:54:36 1991 UI.DLL PAGE 3, LINE 119

| | | | | | | | | |
|---|---|---|---|---|---|---|---|---|
| 0000003540 | 1F00 | 5F5E | ED83 | 8B02 | 1FE5 | 4D5D | 02CA | 1E00 |
| 0000003560 | 9058 | 5545 | EC8B | 8E1E | 81D8 | 00EC | 5700 | 1E56 |
| 0000003600 | E4B8 | 8E02 | 83D8 | 763E | 0020 | 0375 | 12E9 | A100 |
| 0000003620 | 2076 | 5EC4 | 2606 | 0789 | 00B8 | E900 | 0009 | 06E9 |
| 0000003640 | B800 | 0001 | 00E9 | 1F00 | 5F5E | ED83 | 8B02 | 1FE5 |
| 0000003660 | 4D5D | 04CA | 1E00 | 9058 | 5545 | EC8B | 8E1E | 81D8 |
| 0000003700 | 00EC | 5700 | 1E56 | 11B8 | 8E03 | 8BD8 | 0646 | 568B |
| 0000003720 | A308 | 2078 | 1689 | 207A | 00E9 | 1F00 | 5F5E | ED83 |
| 0000003740 | 8B02 | 1FE5 | 4D5D | 04CA | 1E00 | 9058 | 5545 | EC8B |
| 0000003760 | 8E1E | 81D8 | 00EC | 5700 | 1E56 | 57B8 | 8E03 | A1D8 |
| 0000004000 | 207A | 060B | 2078 | 0375 | 1AE9 | A100 | 2078 | 168B |
| 0000004020 | 207A | 5EC4 | 2606 | 0789 | 8926 | 0257 | 00B8 | E900 |
| 0000004040 | 0009 | 06E9 | B800 | 0001 | 00E9 | 1F00 | 5F5E | ED83 |
| 0000004060 | 8B02 | 1FE5 | 4D5D | 04CA | 1E00 | 9058 | 5545 | EC8B |
| 0000004100 | 8E1E | 81D8 | 00EC | 5700 | 1E56 | 8BB8 | 8E03 | FFD8 |
| 0000004120 | 1436 | FF2A | 1236 | 9A2A | FFFF | 0000 | 068E | 28C6 |
| 0000004140 | FF26 | 0236 | 2602 | 36FF | 0200 | FF9A | 00FF | B800 |
| 0000004160 | 0000 | 00E9 | 1F00 | 5F5E | ED83 | 8B02 | 1FE5 | 4D5D |
| 0000004200 | 1ECB | 9058 | 5545 | EC8B | 8E1E | 81D8 | 06EC | 5700 |
| 0000004220 | 1E56 | DBB8 | 8E03 | 6AD8 | 6A00 | 9A01 | FFFF | 0000 |
| 0000004240 | 4689 | 89FA | FC56 | 468B | 0BFC | FA46 | 0374 | 09E9 |
| 0000004260 | B800 | 03FC | 34E9 | E900 | 002B | 068E | 28C6 | FF26 |
| 0000004300 | 0236 | 2602 | 36FF | 0200 | 681E | 2A1A | 006A | 006A |
| 0000004320 | 006A | 006A | FF9A | 00FF | C400 | 065E | C726 | 1A07 |
| 0000004340 | 262A | 5F8C | B802 | 0000 | 00E9 | 1F00 | 5F5E | ED83 |
| 0000004360 | 8B02 | 1FE5 | 4D5D | 04CA | 1E00 | 9058 | 5545 | EC8B |
| 0000004400 | 8E1E | 81D8 | 00EC | 5700 | 1E56 | 23B8 | 8E04 | 8ED8 |
| 0000004420 | C606 | 2628 | 36FF | 0202 | FF26 | 0036 | 1E02 | 1A68 |
| 0000004440 | 6A2A | 6A00 | 6A00 | 6A00 | 9A00 | 0465 | 0000 | 5EC4 |
| 0000004460 | 2606 | 07C7 | 2A1A | 8C26 | 025F | 00B8 | E900 | 0000 |
| 0000004500 | 5E1F | 835F | 02ED | E58B | 5D1F | CA4D | 0004 | 581E |
| 0000004520 | 4590 | 8B55 | 1EEC | D88E | EC81 | 0028 | 5657 | B81E |
| 0000004540 | 049B | D88E | 46C7 | BAFA | 8C20 | FC5E | 46C7 | 01F2 |
| 0000004560 | 2B01 | 89C0 | E246 | 4689 | 8EE0 | C806 | 2628 | 3E83 |
| 0000004600 | 05C0 | 7500 | E903 | 001D | 36FF | 1D38 | 36FF | 1D36 |
| 0000004620 | 468D | 16D8 | 9A50 | 009D | 0000 | C483 | 3D08 | 0000 |
| 0000004640 | 0374 | 0FE9 | 8E00 | CA06 | 2628 | 3E83 | 05D8 | 7500 |
| 0000004660 | E903 | 003B | 681E | 20C1 | 468D | 16E6 | 8D50 | D846 |
| 0000004700 | 5016 | 468D | 16F6 | 6850 | 018F | 681E | 20C8 | 36FF |
| 0000004720 | 1D34 | 36FF | 1D32 | 36FF | 1D38 | 36FF | 1D36 | E69A |
| 0000004740 | 0000 | 8300 | 1EC4 | 4689 | 89F6 | F856 | 08E9 | 2B00 |
| 0000004760 | 89C0 | F846 | 4689 | C7F6 | F446 | 0000 | 36FF | 2A14 |
| 0000005000 | 36FF | 2A12 | 76FF | FF0E | 0C76 | 76FF | FF0A | 0876 |
| 0000005020 | 76FF | 9A06 | FFFF | 0000 | 4689 | 83E4 | E47E | 7400 |
| 0000005040 | E903 | 0005 | 46C7 | 05F4 | 8E00 | C806 | 2628 | 3E83 |
| 0000005060 | 011C | 7500 | E903 | 0009 | 7E83 | FEDC | 0374 | 0FE9 |
| 0000005100 | 8E00 | CA06 | 2628 | 3E83 | 00B3 | 7500 | E903 | 0051 |
| 0000005120 | 468B | 89F4 | DE46 | 76FF | FFE2 | E076 | 468D | 16DE |
| 0000005140 | FF50 | F276 | 76FF | FFFC | FA76 | 4E8D | 16E6 | 8D51 |
| 0000005160 | F64E | 5116 | 4E8D | 16D8 | 1E51 | C868 | 6820 | 019C |
| 0000005200 | 36FF | 1D34 | 36FF | 1D32 | 36FF | 1D38 | 36FF | 1D36 |
| 0000005220 | D79A | 0001 | 8300 | 28C4 | 468B | E9DE | 0009 | 06E9 |
| 0000005240 | 8B00 | F446 | 00E9 | 1F00 | 5F5E | ED83 | 8B02 | 1FE5 |
| 0000005260 | 4D5D | 0ACA | 1E00 | 9058 | 5545 | EC8B | 8E1E | 81D8 |
| 0000005300 | 00EC | 5700 | 1E56 | F0B8 | 8E04 | 8ED8 | C606 | 2628 |
| 0000005320 | 36FF | 0202 | FF26 | 0036 | 6A02 | 6A00 | 9A00 | FFFF |
| 0000005340 | 0000 | 00B8 | E900 | 0000 | 5E1F | 835F | 02ED | E58B |
| 0000005360 | 5D1F | CB4D | 581E | 4590 | 8B55 | 1EEC | D88E | EC81 |
| 0000005400 | 0006 | 5657 | B81E | 0657 | D88E | 006A | 016A | 2C9A |

THU MAR 14 17:54:36 1991 UI.DLL PAGE 4, LINE 178

| | | | | | | | | |
|---|---|---|---|---|---|---|---|---|
| 0000005420 | 0004 | 8900 | FA46 | 5689 | 8BFC | FC46 | 460B | 74FA |
| 0000005440 | E903 | 0009 | FCB8 | E903 | 0009 | 06E9 | B800 | 0000 |
| 0000005460 | 00E9 | 1F00 | 5F5E | ED83 | 8B02 | 1FE5 | 4D5D | 1ECB |
| 0000005500 | 9058 | 5545 | EC8B | 8E1E | 81D8 | 00EC | 5700 | 1E56 |
| 0000005520 | 96B8 | 8E06 | 2BD8 | A3C0 | 2A18 | 16A3 | 8E2A | C606 |
| 0000005540 | 2628 | 36FF | 0202 | FF26 | 0036 | FF02 | 0C76 | 76FF |
| 0000005560 | 9ADA | FFFF | 0000 | 16A1 | 8B2A | 1816 | C42A | 065E |
| 0000005600 | 8926 | 2607 | 5789 | B802 | 0000 | 00E9 | 1F00 | 5F5E |
| 0000005620 | ED83 | 8B02 | 1FE5 | 4D5D | 08CA | 1E00 | 9058 | 5545 |
| 0000005640 | EC8B | 8E1E | 81D8 | 24EC | 5700 | 1E56 | E1B8 | 8E06 |
| 0000005660 | C7D8 | FA46 | 20D3 | 5E8C | C7FC | F446 | 0101 | C02B |
| 0000005700 | 4689 | 89E6 | E446 | 068E | 28C8 | 8326 | F83E | 0007 |
| 0000005720 | 0375 | 1DE9 | FF00 | 3836 | FF1D | 3636 | 8D1D | DC46 |
| 0000005740 | 5016 | 269A | 0005 | 8300 | 08C4 | 003D | 7400 | E903 |
| 0000005760 | 000F | 068E | 28CA | 8326 | 103E | 0008 | 0375 | 3BE9 |
| 0000006000 | 1E00 | DA68 | 8D20 | E846 | 5016 | 468D | 16DC | 8D50 |
| 0000006020 | F646 | 5016 | FC68 | 1E01 | EA68 | FF20 | 3436 | FF1D |
| 0000006040 | 3236 | FF1D | 3836 | FF1D | 3636 | 9A1D | 056F | 0000 |
| 0000006060 | C483 | 891E | F646 | 5689 | E9F8 | 0008 | C02B | 4689 |
| 0000006100 | 89F8 | F646 | 126A | 4E9A | 7127 | 8302 | 02C4 | 16A3 |
| 0000006120 | 892A | 1816 | A12A | 2A18 | 060B | 2A16 | 0374 | 7DE9 |
| 0000006140 | 8E00 | C806 | 2628 | 3E83 | 0880 | 7500 | E903 | 0009 |
| 0000006160 | 7E83 | FEE0 | 0374 | 0FE9 | 8E00 | CA06 | 2628 | 3E83 |
| 0000006200 | 08F2 | 7500 | E903 | 0050 | 46C7 | 07E2 | FF00 | E676 |
| 0000006220 | 76FF | 8DE4 | E246 | 5016 | 76FF | FFF4 | FC76 | 76FF |
| 0000006240 | 8DFA | E84E | 5116 | 4E8D | 16F6 | 8D51 | DC4E | 5116 |
| 0000006260 | 681E | 20EA | FF68 | FF01 | 3436 | FF1D | 3236 | FF1D |
| 0000006300 | 3836 | FF1D | 3636 | 9A1D | 093A | 0000 | C483 | 8B28 |
| 0000006320 | E246 | EBE9 | E900 | 0006 | 07B8 | E900 | 00E2 | 468B |
| 0000006340 | C406 | 161E | 262A | 4789 | 8E0C | C806 | 2628 | 3E83 |
| 0000006360 | 08DA | 7500 | E903 | 0041 | 7E83 | FEE0 | 0375 | 38E9 |
| 0000006400 | FF00 | 0676 | 681E | 20E1 | 468D | 16E8 | 8D50 | F646 |
| 0000006420 | 5016 | 468D | 16DC | 1E50 | EA68 | 6820 | 0200 | 36FF |
| 0000006440 | 1D34 | 36FF | 1D32 | 36FF | 1D38 | 36FF | 1D36 | 0968 |
| 0000006460 | 9A01 | 0169 | 0000 | C483 | C422 | 161E | 262A | 47C7 |
| 0000006500 | 0010 | 8E00 | C806 | 2628 | 3E83 | 0510 | 7500 | E903 |
| 0000006520 | 0009 | 7E83 | FEE0 | 0374 | 0FE9 | 8E00 | CA06 | 2628 |
| 0000006540 | 3E83 | 053C | 7500 | E903 | 0050 | 46C7 | 00E2 | FF00 |
| 0000006560 | E676 | 76FF | 8DE4 | E246 | 5016 | 76FF | FFF4 | FC76 |
| 0000006600 | 76FF | 8DFA | E84E | 5116 | 4E8D | 16F6 | 8D51 | DC4E |
| 0000006620 | 5116 | 681E | 20EA | 0268 | FF02 | 3436 | FF1D | 3236 |
| 0000006640 | FF1D | 3836 | FF1D | 3636 | 9A1D | 0621 | 0000 | C483 |
| 0000006660 | 8B28 | E246 | 09E9 | E900 | 0006 | 00B8 | E900 | 0000 |
| 0000006700 | 5E1F | 835F | 02ED | E58B | 5D1F | CA4D | 0002 | 581E |
| 0000006720 | 4590 | 8B55 | 1EEC | D88E | EC81 | 0000 | 5657 | B81E |
| 0000006740 | 073D | D88E | 468B | 8B06 | 0856 | 16A3 | 892A | 1816 |
| 0000006760 | B82A | 0000 | 00E9 | 1F00 | 5F5E | ED83 | 8B02 | 1FE5 |
| 0000007000 | 4D5D | 04CA | 1E00 | 9058 | 5545 | EC8B | 8E1E | 81D8 |
| 0000007020 | 24EC | 5700 | 1E56 | 70B8 | 8E09 | C7D8 | FA46 | 20FB |
| 0000007040 | 5E8C | C7FC | F446 | 0101 | C02B | 4689 | 89E6 | E446 |
| 0000007060 | 068E | 28C8 | 8326 | 5D3E | 0007 | 0375 | 1DE9 | FF00 |
| 0000007100 | 3836 | FF1D | 3636 | 8D1D | DC46 | 5016 | 739A | 0007 |
| 0000007120 | 8300 | 08C4 | 003D | 7400 | E9D3 | 000F | 068E | 28CA |
| 0000007140 | 8326 | 893E | 0007 | 0375 | 3BE9 | 1E00 | 0268 | 8D21 |
| 0000007160 | E846 | 5016 | 468D | 16DC | 8D50 | F646 | 5016 | 2D68 |
| 0000007200 | 1E02 | 2A68 | FF21 | 3436 | FF1D | 3236 | FF1D | 3836 |
| 0000007220 | FF1D | 3636 | 9A1D | 07BC | 000D | C483 | 891E | F646 |
| 0000007240 | 5689 | E9F8 | 0008 | C02B | 4689 | 89F8 | F646 | 068E |
| 0000007260 | 28C8 | 8326 | BC3E | 000A | 0375 | 4BE9 | 8300 | E07E |

THU MAR 14 17:54:36 1991 UI.DLL PAGE 5, LINE 237

| | | | | | | | | |
|---|---|---|---|---|---|---|---|---|
| 0000007300 | 75FE | E903 | 0042 | 76FF | FF06 | 0876 | 681E | 2109 |
| 0000007320 | 468D | 16E8 | 8D50 | F646 | 5016 | 468D | 16DC | 1E50 |
| 0000007340 | 2A68 | 6821 | 022F | 36FF | 1D34 | 36FF | 1D32 | 36FF |
| 0000007360 | 1D38 | 36FF | 1D36 | 681E | 2122 | FF68 | 68FF | FFFF |
| 0000007400 | FF9A | 00FF | 8300 | 2AC4 | 186A | 4E9A | D927 | 8307 |
| 0000007420 | 02C4 | 16A3 | 892A | 1816 | A12A | 2A18 | 060B | 2A16 |
| 0000007440 | 0374 | 7DE9 | 8E00 | C806 | 2628 | 3E83 | 0B59 | 7500 |
| 0000007460 | E903 | 0009 | 7E83 | FEE0 | 0374 | 0FE9 | 8E00 | CA06 |
| 0000007500 | 2628 | 3E83 | 0B71 | 7500 | E903 | 0050 | 46C7 | 07E? |
| 0000007520 | FF00 | E676 | 76FF | 8DE4 | E246 | 5016 | 76FF | FFF4 |
| 0000007540 | FC76 | 76FF | 8DFA | E84E | 5116 | 4E8D | 16F6 | 8D51 |
| 0000007560 | DC4E | 5116 | 681E | 212A | 3268 | FF02 | 3436 | FF1D |
| 0000007600 | 3236 | FF1D | 3836 | FF1D | 3636 | 9A1D | 0BB9 | 0000 |
| 0000007620 | C483 | 8B28 | E246 | A6E9 | E900 | 0006 | 07B8 | E900 |
| 0000007640 | 009D | 468B | C408 | 161E | 262A | 4789 | C40C | 161E |
| 0000007660 | 262A | 47C7 | 0110 | 8B00 | 0646 | 1EC4 | 2A16 | 8926 |
| 0000007700 | 1447 | 068E | 28C8 | 8326 | C73E | 0009 | 0375 | 09E9 |
| 0000007720 | 8300 | E07E | 74FE | E903 | 000F | 068E | 28CA | 8326 |
| 0000007740 | F33E | 0009 | 0375 | 50E9 | C700 | E246 | 0000 | 76FF |
| 0000007760 | FFE6 | E476 | 468D | 16E2 | FF50 | F476 | 76FF | FFFC |
| 0000010000 | FA76 | 4E8D | 16E8 | 8D51 | F64E | 5116 | 4E8D | 16DC |
| 0000010020 | 1E51 | 2A68 | 6821 | 0236 | 36FF | 1D34 | 36FF | 1D32 |
| 0000010040 | 36FF | 1D38 | 36FF | 1D36 | 589A | 0008 | 8300 | 28C4 |
| 0000010060 | 468B | E9E2 | 0009 | 06E9 | B800 | 0000 | 00E9 | 1F00 |
| 0000010100 | 5F5E | ED83 | 8B02 | 1FE5 | 4D5D | 04CA | 1E00 | 9058 |
| 0000010120 | 5545 | EC8B | 8E1E | 81D8 | 24EC | 5700 | 1E56 | A7B8 |
| 0000010140 | 8E09 | C7D8 | FA46 | 213F | 5E8C | C7FC | F446 | 0101 |
| 0000010160 | C02B | 4689 | 89E6 | E446 | 068E | 28C8 | 8326 | AA3E |
| 0000010200 | 000C | 0375 | 1DE9 | FF00 | 3836 | FF1D | 3636 | 8D1D |
| 0000010220 | DC46 | 5016 | DD9A | 0009 | 8300 | 08C4 | 003D | 7400 |
| 0000010240 | E903 | 000F | 068E | 28CA | 8326 | C23E | 000C | 0375 |
| 0000010260 | 3BE9 | 1E00 | 4668 | 8D21 | E846 | 5016 | 468D | 16DC |
| 0000010300 | 8D50 | F646 | 5016 | 4C68 | 1E02 | 4E68 | FF21 | 3436 |
| 0000010320 | FF1D | 3236 | FF1D | 3836 | FF1D | 3636 | 9A1D | 0A26 |
| 0000010340 | 0000 | C483 | 891E | F646 | 5689 | E9F8 | 0008 | C02B |
| 0000010360 | 4689 | 89F8 | F646 | 186A | 4E9A | 9D27 | 830A | 02C4 |
| 0000010400 | 16A3 | 892A | 1816 | A12A | 2A18 | 060B | 2A16 | 0374 |
| 0000010420 | 7DE9 | 8E00 | C806 | 2628 | 3E83 | 0D58 | 7500 | E903 |
| 0000010440 | 0009 | 7E83 | FEE0 | 0374 | 0FE9 | 8E00 | CA06 | 2628 |
| 0000010460 | 3E83 | 0D70 | 7500 | E903 | 0050 | 46C7 | 07E2 | FF00 |
| 0000010500 | E676 | 76FF | 8DE4 | E246 | 5016 | 76FF | FFF4 | FC76 |
| 0000010520 | 76FF | 8DFA | E84E | 5116 | 4E8D | 16F6 | 8D51 | DC4E |
| 0000010540 | 5116 | 681E | 214E | 4F68 | FF02 | 3436 | FF1D | 3236 |
| 0000010560 | FF1D | 3836 | FF1D | 3636 | 9A1D | 0DB8 | 0000 | C483 |
| 0000010600 | 8B28 | E246 | B7E9 | E900 | 0006 | 07B8 | E900 | 00AE |
| 0000010620 | 468B | C40A | 161E | 262A | 4789 | C40C | 161E | 262A |
| 0000010640 | 47C7 | 0110 | C400 | 161E | 262A | 47C7 | 0912 | 8B00 |
| 0000010660 | 0646 | 568B | C408 | 161E | 262A | 4789 | 2614 | 5789 |
| 0000010700 | 8E16 | C806 | 2628 | 3E83 | 0A45 | 7500 | E903 | 0009 |
| 0000010720 | 7E83 | FEE0 | 0374 | 0FE9 | 8E00 | CAD6 | 2628 | 3E83 |
| 0000010740 | 0AD4 | 7500 | E903 | 0050 | 46C7 | 00E2 | FF00 | E676 |
| 0000010760 | 76FF | 8DE4 | E246 | 5016 | 76FF | FFF4 | FC76 | 76FF |
| 0000011000 | 8DFA | E84E | 5116 | 4E8D | 16F6 | 8D51 | DC4E | 5116 |
| 0000011020 | 681E | 214E | 5468 | FF02 | 3436 | FF1D | 3236 | FF1D |
| 0000011040 | 3836 | FF1D | 3636 | 9A1D | 0B1C | 0000 | C483 | 8B28 |
| 0000011060 | E246 | 09E9 | E900 | 0006 | 00B8 | E900 | 0000 | 5E1F |
| 0000011100 | 835F | 02ED | E58B | 5D1F | CA4D | 0006 | 581E | 4590 |
| 0000011120 | 8B55 | 1EEC | D88E | EC81 | 0024 | 5657 | B81E | 0BEF |
| 0000011140 | D88E | 46C7 | 63FA | 8C21 | FC5E | 46C7 | 01F4 | 2B01 |

THU MAR 14 17:54:36 1991 UI.DLL PAGE 6, LINE 296

| | | | | | | | | |
|---|---|---|---|---|---|---|---|---|
| 0000011160 | 89C0 | E646 | 4689 | 8EE4 | C806 | 2628 | 3E83 | 0E8C |
| 0000011200 | 7500 | E903 | 001D | 36FF | 1D38 | 36FF | 1D36 | 468D |
| 0000011220 | 16DC | 9A50 | 0C25 | 0000 | C483 | 3D08 | 0000 | 0374 |
| 0000011240 | 0FE9 | 8E00 | CA06 | 2628 | 3E83 | 0F1E | 7500 | E903 |
| 0000011260 | 003B | 681E | 216A | 468D | 16E8 | 8D50 | DC46 | 5016 |
| 0000011300 | 468D | 16F6 | 6850 | 026B | 681E | 2192 | 36FF | 1D34 |
| 0000011320 | 36FF | 1D32 | 36FF | 1D38 | 36FF | 1D36 | 6E9A | 000C |
| 0000011340 | 8300 | 1EC4 | 4689 | 89F6 | F856 | 08E9 | 2B00 | 89C0 |
| 0000011360 | F846 | 4689 | 8EF6 | C806 | 2628 | 3E83 | 0F06 | 7500 |
| 0000011400 | E903 | 004E | 7E83 | FEE0 | 0375 | 45E9 | FF00 | 0876 |
| 0000011420 | 76FF | FF06 | 0A76 | 681E | 2171 | 468D | 16E8 | 8D50 |
| 0000011440 | F646 | 5016 | 468D | 16DC | 1E50 | 9268 | 6821 | 026D |
| 0000011460 | 36FF | 1D34 | 36FF | 1D32 | 36FF | 1D38 | 36FF | 1D36 |
| 0000011500 | 681E | 218A | 8B68 | 680A | 0A8E | 919A | 000A | 8300 |
| 0000011520 | 2CC4 | 186A | 4E9A | 8B27 | 830C | 02C4 | 16A3 | 892A |
| 0000011540 | 1816 | A12A | 2A18 | 060B | 2A16 | 0374 | 7DE9 | 8E00 |
| 0000011560 | C806 | 2628 | 3E83 | 0FAA | 7500 | E903 | 0009 | 7E83 |
| 0000011600 | FEE0 | 0374 | 0FE9 | 8E00 | CA06 | 2628 | 3E83 | 0FC2 |
| 0000011620 | 7500 | E903 | 0050 | 46C7 | 07E2 | FF00 | E676 | 76FF |
| 0000011640 | 8DE4 | E246 | 5016 | 76FF | FFF4 | FC76 | 76FF | 8DFA |
| 0000011660 | E84E | 5116 | 4E8D | 16F6 | 8D51 | DC4E | 5116 | 681E |
| 0000011700 | 2192 | 7068 | FF02 | 3436 | FF1D | 3236 | FF1D | 3836 |
| 0000011720 | FF1D | 3636 | 9A1D | 100A | 0000 | C483 | 8B28 | E246 |
| 0000011740 | ADE9 | E900 | 0006 | 07B8 | E900 | 00A4 | 468B | C40A |
| 0000011760 | 161E | 262A | 4789 | C40C | 161E | 262A | 47C7 | 0110 |
| 0000012000 | 8B00 | 0646 | 568B | C408 | 161E | 262A | 4789 | 2614 |
| 0000012020 | 5789 | 8E16 | C806 | 2628 | 3E83 | 0C0F | 7500 | E903 |
| 0000012040 | 0009 | 7E83 | FEE0 | 0374 | 0FE9 | 8E00 | CA06 | 2628 |
| 0000012060 | 3E83 | 0C3B | 7500 | E903 | 0050 | 46C7 | 00E2 | FF00 |
| 0000012100 | E676 | 76FF | 8DE4 | E246 | 5016 | 76FF | FFF4 | FC76 |
| 0000012120 | 76FF | 8DFA | E84E | 5116 | 4E8D | 16F6 | 8D51 | DC4E |
| 0000012140 | 5116 | 681E | 2192 | 7468 | FF02 | 3436 | FF1D | 3236 |
| 0000012160 | FF1D | 3836 | FF1D | 3636 | 9A1D | 0D0A | 0000 | C483 |
| 0000012200 | 8B28 | E246 | 09E9 | E900 | 0006 | 00B8 | E900 | 0000 |
| 0000012220 | 5E1F | 835F | 02ED | E58B | 5D1F | CA4D | 0006 | 581E |
| 0000012240 | 4590 | 8B55 | '5EC | D88E | EC81 | 0000 | 5657 | B81E |
| 0000012260 | 0DEE | D88E | 76FF | FF08 | 0676 | 589A | E727 | 830E |
| 0000012300 | 04C4 | 5E1F | 835F | 02ED | E58B | 5D1F | CA4D | 0004 |
| 0000012320 | 581E | 4590 | 8B55 | 1EEC | D88E | EC81 | 023A | 5657 |
| 0000012340 | B81E | 1040 | D88E | 76FF | 9A14 | 110A | 1096 | C483 |
| 0000012360 | 8902 | C846 | 76FF | FF12 | 1076 | 681E | 21A7 | 468D |
| 0000012400 | 16CC | 9A50 | 2BB2 | 104D | C483 | FF0C | 0A76 | 76FF |
| 0000012420 | FF08 | 0C76 | 868D | FDC6 | 5016 | 0068 | FF02 | 0E76 |
| 0000012440 | 4E8D | 16CC | 8D51 | CA4E | 5116 | 109A | FF00 | 89FF |
| 0000012460 | C646 | 768B | C6CA | C782 | 00FD | 006A | 016A | 36FF |
| 0000012500 | 207E | 36FF | 207C | 868D | FDC6 | 5016 | 681E | 21AF |
| 0000012520 | 006A | 76FF | 9AC8 | FFFF | 0000 | 4689 | 83C6 | 067E |
| 0000012540 | 7500 | E903 | 0000 | 468B | E9C6 | 0000 | 5E1F | 835F |
| 0000012560 | 02ED | E58B | 5D1F | CA4D | 0010 | 581E | 4590 | 8B55 |
| 0000012600 | 1EEC | D88E | EC81 | 0000 | 5657 | 468B | E906 | 003F |
| 0000012620 | 21B8 | E920 | 005B | 21B8 | E920 | 0055 | 21B8 | E920 |
| 0000012640 | 004F | 21B8 | E920 | 0049 | 21B8 | E920 | 0043 | 21B8 |
| 0000012660 | E920 | 003D | 21B8 | E920 | 0037 | 21B8 | E920 | 0031 |
| 0000012700 | 21B8 | E920 | 002B | 30B8 | E900 | 0025 | 22E9 | 3D00 |
| 0000012720 | 0008 | 0376 | EFE9 | D1FF | 93E0 | FF2E | 6FA7 | 2011 |
| 0000012740 | 2611 | 2C11 | 3211 | 3811 | 3E11 | 4411 | 4A11 | 5011 |
| 0000012760 | 5E11 | 835F | 02ED | E58B | 5D1F | CB4D | 581E | 4590 |
| 0000013000 | 8B55 | 1EEC | D88E | EC81 | 0004 | 5657 | B81E | 1072 |
| 0000013020 | D88E | 46C7 | 00FC | 8B00 | FC46 | 00E9 | 1F00 | 5F5E |

THU MAR 14 17:54:36 1991 UI.DLL PAGE 7, LINE 355

| | | | | | | | | |
|---|---|---|---|---|---|---|---|---|
| 0000013040 | ED83 | 8B02 | 1FE5 | 4D5D | 0CCA | 1E00 | 9058 | 5545 |
| 0000013060 | EC8B | 8E1E | 81D8 | 00EC | 5700 | 1E56 | 9EB8 | 8E11 |
| 0000013100 | B8D8 | 0000 | 00E9 | 1F00 | 5F5E | ED83 | 8B02 | 1FE5 |
| 0000013120 | 4D5D | 06CA | 1E00 | 9058 | 5545 | EC8B | 8E1E | 81D8 |
| 0000013140 | 00EC | 5700 | 1E56 | CDB8 | 8E11 | 8BD8 | 0646 | 568B |
| 0000013160 | A308 | 207C | 1689 | 207E | 00E9 | 1F00 | 5F5E | ED83 |
| 0000013200 | 8B02 | 1FE5 | 4D5D | 04CA | 1E00 | 9058 | 5545 | EC8B |
| 0000013220 | 8E1E | 81D8 | 00EC | 5700 | 1E56 | F7B8 | 8E11 | 8BD8 |
| 0000013240 | 0646 | 568B | A308 | 2080 | 1689 | 2082 | 00E9 | 1F00 |
| 0000013260 | 5F5E | ED83 | 8B02 | 1FE5 | 4D5D | 04CA | 1E00 | 9058 |
| 0000013300 | 5545 | EC8B | 8E1E | 81D8 | 04EC | 5700 | 1E56 | 2BB8 |
| 0000013320 | 8E12 | FFD8 | 0676 | 76FF | FF0A | 0876 | 76FF | FF0E |
| 0000013340 | 0C76 | 919A | 7C12 | 8310 | 0AC4 | 4689 | 8BFC | FC46 |
| 0000013360 | 00E9 | 1F00 | 5F5E | ED83 | 8B02 | 1FE5 | 4D5D | 0ACA |
| 0000013400 | 1E00 | 9058 | 5545 | EC8B | 8E1E | 81D8 | 1AEC | 5700 |
| 0000013420 | 6A56 | 6A00 | 8D01 | EE46 | 5016 | 0C6A | FF9A | 00FF |
| 0000013440 | 8900 | E646 | 7E83 | 00E6 | 0374 | 28E9 | 6A00 | 9A00 |
| 0000013460 | 0019 | 0000 | 4689 | 89FA | FC56 | 068E | 28C6 | FF26 |
| 0000013500 | 0236 | 2602 | 36FF | 0200 | 006A | 389A | 0000 | 8900 |
| 0000013520 | E846 | 5689 | 83EA | 843E | 0020 | 0375 | 0BE9 | 6A00 |
| 0000013540 | 6A00 | 6A01 | 9A02 | FFFF | 0000 | 006A | 016A | 76FF |
| 0000013560 | FFD8 | 0676 | 76FF | FF0C | 0A76 | 681E | 21BB | 006A |
| 0000013600 | 76FF | 9A0E | 10E6 | 0000 | 4689 | 83EC | E67E | 7400 |
| 0000013620 | E903 | 0016 | 76FF | FFEA | E876 | E89A | 0003 | FF00 |
| 0000013640 | FC76 | 76FF | 9AFA | 03FB | 0000 | 468B | E9EC | 0000 |
| 0000013660 | 5F5E | ED83 | 8B02 | 1FE5 | 4D5D | 1ECB | 9058 | 5545 |
| 0000013700 | EC8B | 8E1E | 81D8 | 00EC | 5700 | 1E56 | 5FB8 | 8E12 |
| 0000013720 | 68D8 | 4020 | 76FF | FF08 | 0676 | 76FF | FF0C | 0A76 |
| 0000013740 | 919A | 7512 | 8312 | 0AC4 | 00E9 | 1F00 | 5F5E | ED83 |
| 0000013760 | 8B02 | 1FE5 | 4D5D | 08CA | 1E00 | 9058 | 5545 | EC8B |
| 0000014000 | 8E1E | 81D8 | 00EC | 5700 | 1E56 | 5DB8 | 8E13 | FFD8 |
| 0000014020 | 0676 | 76FF | FF0A | 0876 | 36FF | 207E | 36FF | 207C |
| 0000014040 | 919A | 7312 | 8313 | 0AC4 | 00E9 | 1F00 | 5F5E | ED83 |
| 0000014060 | 8B02 | 1FE5 | 4D5D | 06CA | 1E00 | 9058 | 5545 | EC8B |
| 0000014100 | 8E1E | 81D8 | 00EC | 5700 | 1E56 | 9BB8 | 8E13 | FFD8 |
| 0000014120 | 7E36 | FF20 | 7C36 | FF20 | 0876 | 76FF | 9A06 | 134B |
| 0000014140 | 13B3 | 00E9 | 1F00 | 5F5E | ED83 | 8B02 | 1FE5 | 4D5D |
| 0000014160 | 04CA | 1E00 | 9058 | 5545 | EC8B | 8E1E | 81D8 | 00EC |
| 0000014200 | 5700 | 1E56 | DBB8 | 8E13 | 83D8 | 067E | 7D00 | E903 |
| 0000014220 | 001D | 7E83 | 6306 | 037C | 14E9 | 8B00 | 065E | E3C1 |
| 0000014240 | 8B02 | 3A87 | 8B1D | 3C97 | E91D | 01AC | A9E9 | 8101 |
| 0000014260 | 067E | 00C8 | 037D | 1EE9 | 8100 | 067E | 012B | 037C |
| 0000014300 | 14E9 | 8B00 | 065E | E3C1 | 8B02 | B687 | 8B1A | B897 |
| 0000014320 | E91A | 0184 | 81E9 | 8301 | 067E | 7D64 | E903 | 001D |
| 0000014340 | 7E83 | 6906 | 037C | 14E9 | 8B00 | 065E | E3C1 | 8B02 |
| 0000014360 | 9A87 | 8B1C | 9C97 | E91C | 015E | 5BE9 | 8101 | 067E |
| 0000014400 | 0190 | 037D | 1EE9 | 8100 | 067E | 01C2 | 037C | 14E9 |
| 0000014420 | 8B00 | 065E | E3C1 | 8B02 | FE87 | 8B17 | 0097 | E918 |
| 0000014440 | 0136 | 33E9 | 8101 | 067E | 0320 | 037D | 1EE9 | 8100 |
| 0000014460 | 067E | 0383 | 037C | 14E9 | 8B00 | 065E | E3C1 | 8B02 |
| 0000014500 | 8687 | 8B12 | 8897 | E912 | 010E | 0BE9 | 8101 | 067E |
| 0000014520 | 0384 | 037D | 1EE9 | 8100 | 067E | 03B5 | 037C | 14E9 |
| 0000014540 | 8B00 | 065E | E3C1 | 8B02 | 0287 | 8B11 | 0497 | E911 |
| 0000014560 | 00E6 | E3E9 | 8100 | 067E | 03E8 | 037D | 1EE9 | 8100 |
| 0000014600 | 067E | 0419 | 037C | 14E9 | 8B00 | 065E | E3C1 | 8B02 |
| 0000014620 | 7687 | 8B0F | 7897 | E90F | 00BE | BBE9 | 8100 | 067E |
| 0000014640 | 041A | 037D | 1EE9 | 8100 | 067E | 044B | 037C | 14E9 |
| 0000014660 | 8B00 | 065E | E3C1 | 8B02 | 0287 | 8B0F | 0497 | E90F |
| 0000014700 | 0096 | 93E9 | 8100 | 067E | 044C | 037D | 1EE9 | 8100 |

THU MAR 14 17:54:36 1991 UI.DLL PAGE 8, LINE 414

| | | | | | | | | |
|---|---|---|---|---|---|---|---|---|
| 0000014720 | 067E | 047D | 037C | 14E9 | 8B00 | 065E | E3C1 | 8B02 |
| 0000014740 | 8E87 | 8B0E | 9097 | E90E | 006E | 6BE9 | 8100 | 067E |
| 0000014760 | 047E | 037D | 1EE9 | 8100 | 067E | 04AF | 037C | 14E9 |
| 0000015000 | 8B00 | 065E | E3C1 | 8B02 | 1E87 | 8B0E | 2097 | E90E |
| 0000015020 | 0046 | 43E9 | 8100 | 067E | 04B0 | 037D | 1EE9 | 8100 |
| 0000015040 | 067E | 04E1 | 037C | 14E9 | 8B00 | 065E | E3C1 | 8B02 |
| 0000015060 | 8287 | 8B0D | 8497 | E90D | 001E | 1BE9 | FF00 | 0676 |
| 0000015100 | 681E | 21C7 | 681E | 2A34 | B29A | F02B | 8313 | 0AC4 |
| 0000015120 | 34B8 | 8C2A | E9DA | 0000 | 5E1F | 835F | 02ED | E58B |
| 0000015140 | 5D1F | CA4D | 0002 | 581E | 4590 | 8B55 | 1EEC | D88E |
| 0000015160 | EC81 | 0000 | 5657 | B81E | 1415 | D88E | 76FF | FF0A |
| 0000015200 | 0876 | 76FF | 9A06 | 1403 | 161F | 5052 | 4B9A | DB13 |
| 0000015220 | E915 | 0000 | 5E1F | 835F | 02ED | E58B | 5D1F | CA4D |
| 0000015240 | 0006 | 581E | 4590 | 8B55 | 1EEC | D88E | EC81 | 0000 |
| 0000015260 | 5657 | B81E | 1608 | D88E | 36FF | 207E | 36FF | 207C |
| 0000015300 | 76FF | 9A06 | 15F6 | 1618 | 00E9 | 1F00 | 5F5E | ED83 |
| 0000015320 | 8B02 | 1FE5 | 4D5D | 02CA | 1E00 | 9058 | 5545 | EC8B |
| 0000015340 | 8E1E | 81D8 | 00EC | 5700 | 1E56 | 44B8 | 8E16 | FFD8 |
| 0000015360 | 8236 | FF20 | 8036 | FF20 | 0676 | F69A | 5615 | E916 |
| 0000015400 | 0000 | 5E1F | 835F | 02ED | E58B | 5D1F | CA4D | 0002 |
| 0000015420 | 581E | 4590 | 8B55 | 1EEC | D88E | EC81 | 0000 | 5657 |
| 0000015440 | B81E | 167B | D88E | 76FF | FF0C | 0A76 | 76FF | FF08 |
| 0000015460 | 0676 | 4B9A | 8D13 | E916 | 0000 | 5E1F | 835F | 02ED |
| 0000015500 | E58B | 5D1F | CA4D | 0008 | 581E | 4590 | 8B55 | 1EEC |
| 0000015520 | D88E | EC81 | 0028 | 5657 | B81E | 16B2 | D88E | 46C7 |
| 0000015540 | D5F8 | 8C21 | FA5E | 46C7 | 01F0 | 2B01 | 89C0 | E246 |
| 0000015560 | 4689 | 8EE0 | C806 | 2628 | 3E83 | 17EE | 7500 | E903 |
| 0000015600 | 001D | 36FF | 1D38 | 36FF | 1D36 | 468D | 16D8 | 9A50 |
| 0000015620 | 0E24 | 0000 | C483 | 3D08 | 0000 | 0374 | 0FE9 | 8E00 |
| 0000015640 | CA06 | 2628 | 3E83 | 1806 | 7500 | E903 | 003B | 681E |
| 0000015660 | 21DC | 468D | 16E4 | 8D50 | D846 | 5016 | 468D | 16F4 |
| 0000015700 | 6850 | 04DE | 681E | 21E4 | 36FF | 1D34 | 36FF | 1D32 |
| 0000015720 | 36FF | 1D38 | 36FF | 1D36 | 6D9A | 000E | 8300 | 1EC4 |
| 0000015740 | 4689 | 89F4 | F656 | 08E9 | 2B00 | 89C0 | F646 | 4689 |
| 0000015760 | C7F4 | F246 | 0000 | 006A | 016A | 006A | 016A | 7E83 |
| 0000016000 | 0106 | C01B | FE25 | 05FF | 0003 | 6A50 | 9A00 | FFFF |
| 0000016020 | 0000 | 5052 | FF9A | 00FF | 8900 | FC46 | 7E83 | 00FC |
| 0000016040 | 0375 | 1EE9 | 6A00 | 6A00 | 6A01 | 9A30 | FFFF | 0000 |
| 0000016060 | D00B | 0374 | 0CE9 | 6A00 | 6A00 | FF01 | 0676 | FF9A |
| 0000016100 | 00FF | 8300 | FC7E | 7400 | E903 | 0005 | 46C7 | 05F2 |
| 0000016120 | 8B00 | 0646 | 86A3 | 8E20 | C806 | 2628 | 3E83 | 0E0E |
| 0000016140 | 7500 | E903 | 0009 | 7E83 | FEDC | 0374 | 0FE9 | 8E00 |
| 0000016160 | CA06 | 2628 | 3E83 | 0E3A | 7500 | E903 | 0051 | 468B |
| 0000016200 | 89F2 | DE46 | 76FF | FFE2 | E076 | 468D | 16DE | FF50 |
| 0000016220 | F076 | 76FF | FFFA | F876 | 4E8D | 16E4 | 8D51 | F44E |
| 0000016240 | 5116 | 4E8D | 16D8 | 1E51 | E468 | 6821 | 04F3 | 36FF |
| 0000016260 | 1D34 | 36FF | 1D32 | 36FF | 1D38 | 36FF | 1D36 | 669A |
| 0000016300 | 000F | 8300 | 28C4 | 468B | E9DE | 0009 | 06E9 | 8B00 |
| 0000016320 | F246 | 00E9 | 1F00 | 5F5E | ED83 | 8B02 | 1FE5 | 4D5D |
| 0000016340 | 02CA | 1E00 | 9058 | 5545 | EC8B | 8E1E | 81D8 | 00EC |
| 0000016360 | 5700 | 1E56 | EAB8 | 8E16 | A1D8 | 2086 | 00E9 | 1F00 |
| 0000016400 | 5F5E | ED83 | 8B02 | 1FE5 | 4D5D | 00CB | 0000 | 0000 |
| 0000016420 | 0000 | 0000 | 0000 | 0000 | 0000 | 0000 | 8B55 | 1EEC |
| 0000016440 | F868 | 1E21 | FC68 | 9A21 | FFFF | 0000 | 068E | 21F8 |
| 0000016460 | A126 | 0015 | 38A3 | BB22 | 2202 | 1F8C | 65BE | 832A |
| 0000016500 | FEE6 | 1E56 | FF9A | 00FF | 0B00 | 74C0 | 3304 | EBC0 |
| 0000016520 | 893A | 0477 | 894E | 0036 | 8322 | 03EE | 04C7 | 0001 |
| 0000016540 | 7789 | 8906 | 0877 | C683 | C702 | FE04 | 89FF | 0A77 |
| 0000016560 | 681E | 21F6 | 681E | 21F4 | FF9A | 00FF | E800 | 0020 |

THU MAR 14 17:54:36 1991 UI.DLL PAGE 9, LINE 473

| | | | | | | | | |
|---|---|---|---|---|---|---|---|---|
| 0000016600 | 709A | C51B | E816 | 0066 | 01B8 | 5D00 | 50CB | 2E9A |
| 0000016620 | 131B | 9A19 | 1CA8 | 1921 | FF68 | 9A00 | 1A37 | 1926 |
| 0000016640 | BB1E | 000D | FF33 | 068E | 21F6 | FFB9 | 267F | 3D80 |
| 0000016660 | 7500 | 4701 | 8026 | 003D | 3174 | 16BE | 8B22 | 8BD1 |
| 0000016700 | F3CB | 8BA6 | 74CA | 3308 | F2C0 | 74AE | EBE7 | 061C |
| 0000016720 | 071E | F78B | BF1F | 223D | 2CAC | 7241 | C00E | 04E0 |
| 0000016740 | AC92 | 412C | 0572 | C20A | EBAA | 1FED | 00C3 | 02BB |
| 0000016760 | 5200 | D48B | A780 | 223D | 50B7 | C48B | 1653 | 1650 |
| 0000017000 | 9A52 | FFFF | 0000 | C00B | 7558 | B110 | 3C40 | 7401 |
| 0000017020 | 3C06 | 7502 | B106 | 0808 | 3D8F | 4B22 | D679 | E85A |
| 0000017040 | 0026 | C2BE | BF28 | 28C2 | 5FE8 | BE01 | 28C2 | C2BF |
| 0000017060 | E828 | 0156 | C2B8 | 3D28 | 28C6 | 0B74 | 016A | 680E |
| 0000017100 | 1A09 | FF9A | 00FF | C300 | 0E8B | 28B8 | 2AE3 | 06C4 |
| 0000017120 | 28BA | C28C | DB33 | 1EFF | 28B6 | 0373 | 61E9 | 8E01 |
| 0000017140 | FC06 | 2621 | 1E8B | 0006 | 754B | C40D | BE06 | 8C28 |
| 0000017160 | BBC2 | 0003 | 1EFF | 28B6 | B8C3 | 1885 | D88E | 4DA1 |
| 0000017200 | 0B24 | 75C0 | 0E10 | B0A1 | 0B28 | 75C0 | E805 | 001F |
| 0000017220 | 03EB | 24E8 | 6A00 | 6A03 | 6A00 | 9A00 | 19D3 | 0000 |
| 0000017240 | 8B55 | 33EC | EBC9 | 551A | EC8B | 01B9 | EB00 | 5512 |
| 0000017260 | EC8B | 5756 | 00B9 | EB01 | 5508 | EC8B | 5756 | 01B9 |
| 0000017300 | E801 | 004B | 0A51 | 75C9 | BE12 | 2A5E | 5EBF | E82A |
| 0000017320 | 00B8 | C2BE | BF28 | 28C6 | AFE8 | BE00 | 28C6 | C6BF |
| 0000017340 | E828 | 00A6 | C6BE | BF28 | 28C6 | 9DE8 | E800 | 008C |
| 0000017360 | 0A58 | 75E4 | C713 | 4D06 | 0124 | B800 | 0001 | 8A50 |
| 0000017400 | 0646 | 9A50 | FFFF | 0000 | 4EE8 | 5F00 | 5D5E | 55CB |
| 0000017420 | EC8B | 0D6A | 27E8 | 8310 | 02C4 | 068E | 21FC | 8B26 |
| 0000017440 | 061E | 4B00 | 168B | 244F | FA83 | 75FF | 8904 | 4F1E |
| 0000017460 | 3924 | 4F1E | 9F24 | 0D6A | 2DE8 | 8310 | 02C4 | 749E |
| 0000017500 | 6A0A | E80E | 0FD8 | C483 | EB02 | 3BC7 | 74D3 | 6A08 |
| 0000017520 | E80E | 0FEA | C483 | 5D02 | 55C3 | EC8B | 0D6A | DDE8 |
| 0000017540 | 830F | 02C4 | 06C7 | 244F | FFFF | 0D6A | F9E8 | 830F |
| 0000017560 | 02C4 | 0E6A | F1E8 | 830F | 02C4 | C35D | 0E8B | 28B8 |
| 0000017600 | 07E3 | 02BB | FF00 | B61E | C328 | F73B | 0E73 | EF83 |
| 0000017620 | 8B04 | 0B05 | 0245 | F274 | 1DFF | EEEB | 00C3 | 8B55 |
| 0000017640 | B8EC | 00FC | 0E50 | 6FE8 | 8301 | 543E | 0024 | 0474 |
| 0000017660 | 1EFF | 2452 | FFB8 | 5000 | E80E | 015C | E58B | CB5D |
| 0000017700 | 02B8 | E900 | FDC7 | 5A59 | DC8B | D82B | 0B72 | FB81 |
| 0000017720 | 0200 | 0572 | E38B | 5152 | 52CB | 3351 | E9C0 | FDAD |
| 0000017740 | 14C8 | 0000 | 5657 | FF2B | F78B | 3639 | 21F6 | 0375 |
| 0000017760 | F0E9 | A100 | 21F6 | C92B | 4E89 | 89F4 | F646 | 4E89 |
| 0000020000 | 89F8 | FA46 | 0C6A | 76FF | FFFA | F876 | 681E | 2216 |
| 0000020020 | 429A | E42A | 831B | 0AC4 | C00B | 1A74 | 8146 | FFFE |
| 0000020040 | 767F | E903 | 00BD | 5EC4 | FFF8 | F846 | 8026 | 003F |
| 0000020060 | EA75 | EB47 | 900D | 5EC4 | FFF8 | F846 | 8026 | 003F |
| 0000020100 | F475 | 5E8B | 26F8 | 3F80 | 7500 | 8DB9 | 0145 | 6A50 |
| 0000020120 | 9A04 | 2C26 | 1BF3 | C483 | 8904 | F046 | 5689 | 56F2 |
| 0000020140 | 4E9A | 2927 | 831C | 02C4 | 4689 | 89FC | FE56 | 468B |
| 0000020160 | 0BF2 | F046 | 6D74 | C28B | 460B | 74FC | 8B66 | F046 |
| 0000020200 | 568B | A3F2 | 2443 | 1689 | 2445 | 0C6A | 76FF | FFF6 |
| 0000020220 | F476 | 681E | 2216 | 429A | 2E2A | 8319 | 0AC4 | C00B |
| 0000020240 | 2C74 | 468B | 8BFC | FE56 | 5EC4 | 83F0 | F046 | 2604 |
| 0000020260 | 0789 | 8926 | 0257 | 5EC4 | FFF4 | F446 | 8A26 | C407 |
| 0000020300 | FC5E | 46FF | 26FC | 0788 | C00A | 0E74 | E8EB | 5EC4 |
| 0000020320 | FFF4 | F446 | 8026 | 003F | F475 | 5EC4 | 26F4 | 3F80 |
| 0000020340 | 7500 | 5EA7 | C95F | 90CB | 8B55 | 56EC | B857 | 1A0A |
| 0000020360 | D88E | C08E | 568B | BE06 | 28D4 | 3BAD | 74C2 | 4010 |
| 0000020400 | 7496 | 970C | C033 | FFB9 | F2FF | 8BAE | EBF7 | 96EB |
| 0000020420 | 5E5F | E58B | CA5D | 0002 | 8B55 | 57EC | 76FF | 0E06 |
| 0000020440 | C5E8 | 0BFF | 74C0 | 921F | FA8B | C033 | FFB9 | F2FF |

THU MAR 14 17:54:36 1991 UI.DLL PAGE 10, LINE 532

| | | | | | | | | |
|---|---|---|---|---|---|---|---|---|
| 0000020460 | F7AE | 49D1 | 8B50 | BBC4 | 0002 | 1E53 | 5152 | 5016 |
| 0000020500 | FF9A | 00FF | 5B00 | 8B5F | 5DE5 | 02CA | 0000 | 1601 |
| 0000020520 | 0202 | 0203 | 1804 | 0D05 | 0906 | 0C07 | 0C08 | 0C09 |
| 0000020540 | 070A | 080B | 160C | 160D | 020F | 0D10 | 1211 | 0212 |
| 0000020560 | 0235 | 0D41 | 0243 | 0D52 | 0D53 | 0D57 | 0B59 | 0D6C |
| 0000020600 | 206D | 1C70 | 0972 | 1606 | 0A80 | 0A81 | 0982 | 0D84 |
| 0000020620 | 0BA4 | 02CE | 0BD7 | 0D00 | 1608 | 8B52 | E8D8 | 0E08 |
| 0000020640 | 8E93 | 5AC2 | 8926 | 0247 | 8926 | B817 | FFFF | 8B99 |
| 0000020660 | 5DE5 | E8CB | 0008 | FFB8 | 99FF | E58B | CB5D | D88B |
| 0000020700 | E5E8 | 930D | C28E | 8926 | 0247 | BB53 | 1CDE | 24B9 |
| 0000020720 | 0A00 | 75E4 | 2E1B | 073A | 1674 | 4343 | F7E2 | 133C |
| 0000020740 | 0472 | 243C | 0A76 | 3C43 | 72BC | 3C04 | 76CA | 4301 |
| 0000020760 | 8A2E | 0147 | 5B98 | 8926 | C307 | 8B55 | BBEC | 0002 |
| 0000021000 | 05EB | 8B55 | 33EC | E8DB | 0D9E | C303 | CB5D | 8B55 |
| 0000021020 | 56EC | 8B57 | 0876 | 448A | A80A | 7482 | A864 | 7540 |
| 0000021040 | C760 | 0444 | 0000 | 01A8 | 0B74 | 10A8 | 5374 | 4C8B |
| 0000021060 | 8906 | 240C | 0CFE | 2402 | 88EF | 0A44 | FE8B | EF81 |
| 0000021100 | 245C | C781 | 263C | DB33 | 5C8A | A80B | 7508 | A84B |
| 0000021120 | 7504 | F618 | 0105 | 4275 | FE81 | 2468 | 0674 | FE81 |
| 0000021140 | 2474 | 2675 | 87F6 | 223D | 7440 | B91F | 0001 | 1651 |
| 0000021160 | 7E8D | 5706 | 0E53 | 71E8 | 8307 | 08C4 | 01B9 | EB00 |
| 0000021200 | B846 | FFFF | 4C80 | 200A | 65EB | 1E53 | E856 | 0064 |
| 0000021220 | C483 | 5B04 | 44F6 | 080A | D174 | 0C8B | 548B | 2B06 |
| 0000021240 | 42CA | 1489 | 558B | 4A02 | 5489 | E304 | 5125 | FF51 |
| 0000021260 | 0874 | 74FF | 5306 | E80E | 0730 | C483 | 5908 | 7CC4 |
| 0000021300 | 8B06 | 0656 | 8826 | 3B15 | 75C1 | 33B6 | 8AC0 | 0646 |
| 0000021320 | 1DEB | C033 | 87F6 | 223D | 7420 | B9E3 | 0002 | 5051 |
| 0000021340 | 5350 | E80E | 068C | C483 | 3308 | 8BC0 | EBC8 | 5FCF |
| 0000021360 | 5D5E | 00CB | 8B55 | 56EC | 768B | B804 | 0200 | 9A50 |
| 0000021400 | 274E | 1BA3 | 8B59 | 81DE | 5CEB | 8124 | 3CC3 | 0B26 |
| 0000021420 | 74D2 | 800B | 0A4C | C708 | 0247 | 0200 | 0EEB | 4C80 |
| 0000021440 | 040A | 47C7 | 0102 | 8C00 | 8DDA | 0147 | 5489 | 8902 |
| 0000021460 | 8904 | 0854 | 4489 | C706 | 0444 | 0000 | 5D5E | 00C3 |
| 0000021500 | 04C8 | 0000 | 468B | 0B08 | 0646 | 0875 | 006A | A7E8 |
| 0000021520 | EB00 | 9031 | 468B | 2D06 | 245C | 0CB9 | 9900 | F9F7 |
| 0000021540 | 4689 | 50FC | 87E8 | 830B | 02C4 | 76FF | FF08 | 0676 |
| 0000021560 | 169A | 5A1F | 831F | 04C4 | 4689 | FFFE | FC76 | 79E8 |
| 0000021600 | 8B0B | FE46 | CBC9 | 02C8 | 0000 | 5657 | FF2B | 768B |
| 0000021620 | 8A06 | 0A44 | C88B | 0324 | 023C | 3F75 | C1F6 | 7508 |
| 0000021640 | 8B0D | 81DE | 5CEB | F624 | 3C87 | 0126 | 2D74 | 048B |
| 0000021660 | 442B | 8906 | FE46 | C00B | 217E | FF50 | 0874 | 74FF |
| 0000021700 | 8A06 | 0B4C | ED2A | 9A51 | 257A | 1FD7 | C483 | 3908 |
| 0000021720 | FE46 | 0774 | 4C80 | 200A | FFBF | 8BFF | 0644 | 548B |
| 0000021740 | 8908 | 8904 | 0254 | 44C7 | 0004 | 8B00 | 5EC7 | C95F |
| 0000021760 | 90CB | 016A | 01E8 | CB00 | 04C8 | 0000 | 5657 | 5CBE |
| 0000022000 | 2B24 | 89FF | FE7E | 026A | 33E8 | 830B | 02C4 | 11EB |
| 0000022020 | 46C7 | FFFE | FFFF | FC76 | DFE8 | 830A | 02C4 | C683 |
| 0000022040 | 390C | 1C36 | 7228 | 8B2B | 2DC6 | 245C | 0CB9 | 9900 |
| 0000022060 | F9F7 | 4689 | 50FC | B5E8 | 830A | 02C4 | 44F6 | 830A |
| 0000022100 | D374 | 561E | 169A | 921F | 831E | 04C4 | 7440 | 47C1 |
| 0000022120 | C3EB | 026A | 11E8 | 830B | 02C4 | 7E83 | 0104 | 0475 |
| 0000022140 | C78B | 03EB | 468B | 5EFE | C95F | 02C2 | 9000 | 2066 |
| 0000022160 | 2071 | 2087 | 20BB | 20E7 | 20EF | 2118 | 214A | 8B55 |
| 0000022200 | B8EC | 0171 | E80E | FB3E | 5756 | C033 | 4689 | 88F8 |
| 0000022220 | FB46 | 76C4 | 260A | 89AC | 0A76 | 4688 | 0AFE | 74C0 |
| 0000022240 | 8306 | F87E | 7D00 | 8B06 | F846 | B5E9 | BB04 | 2820 |
| 0000022260 | 202C | 583C | 0577 | 24D7 | EB0F | B002 | B100 | D203 |
| 0000022300 | 02E0 | FB46 | FED7 | D2C1 | 88E8 | FB46 | 8B98 | D1D8 |
| 0000022320 | 2EE3 | A7FF | 1FFE | 568A | B9FE | 0001 | 36E8 | EB04 |

THU MAR 14 17:54:36 1991 UI.DLL PAGE 11, LINE 591

| | | | | | | | | |
|---|---|---|---|---|---|---|---|---|
| 0000022340 | 33B1 | 89C0 | F046 | 4689 | 89F6 | EE46 | 46C7 | 20FC |
| 0000022360 | 4800 | 4689 | EBF4 | 8A9B | FE46 | 2D3C | 0675 | 4E80 |
| 0000022400 | 04FC | 8EEB | 2B3C | 0675 | 4E80 | 01FC | 84EB | 203C |
| 0000022420 | 0775 | 4E80 | 02FC | 79E9 | 3CFF | 7523 | 8007 | FC4E |
| 0000022440 | E980 | FF6E | 4E80 | 08FC | 67E9 | 8AFF | FE4E | F980 |
| 0000022460 | 752A | E80F | 035C | C00B | 1779 | D8F7 | 4E80 | 04FC |
| 0000022500 | 0FEB | E980 | 3230 | 8BED | F646 | 0ABB | F700 | 03E3 |
| 0000022520 | 89C1 | F646 | 3BE9 | C7FF | F446 | 0000 | 33E9 | 8AFF |
| 0000022540 | FE4E | F980 | 752A | E80C | 0328 | C00B | 1479 | FFB8 |
| 0000022560 | EBFF | 800F | 30E9 | ED32 | 468B | BBF4 | 000A | E3F7 |
| 0000022600 | C103 | 4689 | E9F4 | FF0A | 468A | 3CFE | 756C | 8006 |
| 0000022620 | FC4E | EB10 | 3C22 | 7546 | 8006 | FC4E | EB20 | 3C18 |
| 0000022640 | 754E | 8006 | FD4E | EB10 | 3C0E | 754C | 8006 | FD4E |
| 0000022660 | EB04 | 8004 | FD4E | E908 | FED8 | 468A | 3CFE | 7564 |
| 0000022700 | E903 | 0194 | 693C | 0375 | 8DE9 | 3C01 | 7575 | E903 |
| 0000022720 | 018A | 583C | 0375 | 89E9 | 3C01 | 7578 | E903 | 0188 |
| 0000022740 | 6F3C | 0375 | A2E9 | 3C01 | 7463 | 3C1A | 7473 | 3C27 |
| 0000022760 | 746E | 3C51 | 7470 | 3C60 | 7445 | 3C07 | 7447 | E903 |
| 0000023000 | 00BB | B5E9 | E800 | 028A | BE8D | FE8F | 0716 | 4FAA |
| 0000023020 | 01B9 | E900 | 01F1 | 90E8 | 0B02 | 75FF | 8C12 | 0BC0 |
| 0000023040 | 75C0 | 1E0C | BF07 | 2879 | 0E8B | 287F | D8E9 | 5701 |
| 0000023060 | 4E8B | E3F4 | 3207 | F2C0 | 75AE | 4F01 | 2B59 | 87F9 |
| 0000023100 | E9CF | 01C3 | 62E8 | 8B02 | F846 | F6AB | FC46 | 7410 |
| 0000023120 | 3303 | ABC0 | 3BE9 | F6FE | FC46 | 7530 | E805 | 0232 |
| 0000023140 | 39EB | 36E8 | F602 | FD46 | 7518 | C630 | FF46 | B907 |
| 0000023160 | 0010 | 0716 | 3352 | 8DD2 | 97BE | BEFE | 0004 | B0E8 |
| 0000023200 | B902 | 0010 | BE8D | FE92 | 3358 | BED2 | 0004 | A0E8 |
| 0000023220 | C602 | 9386 | 3AFE | 09B9 | EB0D | C618 | FF46 | B907 |
| 0000023240 | 0010 | 0716 | D233 | BE8D | FE92 | 04BE | E800 | 0281 |
| 0000023260 | 04B9 | 8D00 | 8FBE | E9FE | 014D | 46FF | 80EE | FC4E |
| 0000023300 | 8A40 | FE46 | 200C | 8B98 | 83F0 | F47E | 7F00 | 7413 |
| 0000023320 | C707 | F446 | 0006 | 0AEB | 673D | 7500 | C705 | F446 |
| 0000023340 | 0001 | BE8D | FE8F | 76FF | FFEE | F476 | 1656 | FF57 |
| 0000023360 | 1076 | 76FF | F60E | FD46 | 7404 | FF0A | A61E | 8328 |
| 0000023400 | 0E46 | EB0A | FF08 | 921E | 8328 | 0E46 | 8308 | 0EC4 |
| 0000023420 | 46F6 | 80FC | 0F74 | 7E83 | 00F4 | 0975 | 5716 | 1EFF |
| 0000023440 | 289E | C483 | 8304 | 67FE | 1075 | 46F7 | 80FC | 7500 |
| 0000023460 | 1609 | FF57 | 961E | 8328 | 04C4 | 0716 | 8026 | 2D3D |
| 0000023500 | 0575 | 8047 | FD4E | B901 | FFFF | B057 | F200 | 4FAE |
| 0000023520 | 2B59 | 87F9 | E9CF | 00AF | 4E80 | 40FC | 46C6 | 0AFA |
| 0000023540 | 35EB | 46C6 | 07FF | 04EB | 46C6 | 27FF | 46F6 | 80FC |
| 0000023560 | 1174 | 46C7 | 02F0 | C600 | F246 | B230 | 0251 | FF56 |
| 0000023600 | 5688 | C6F3 | FA46 | EB10 | F60E | FC46 | 7480 | 8004 |
| 0000023620 | FD4E | C602 | FA46 | F608 | FC46 | 7410 | E805 | 00FB |
| 0000023640 | 0EEB | EDE8 | F600 | FC46 | 7440 | 9903 | 02EB | D233 |
| 0000023660 | 46F6 | 40FC | 0F74 | D20B | 0B7D | 4E80 | 01FD | D8F7 |
| 0000023700 | D283 | F700 | 83DA | F47E | 7D00 | C707 | F446 | 0001 |
| 0000023720 | 04EB | 6680 | F7FC | D88B | DA0B | 0575 | 46C7 | 00F0 |
| 0000023740 | 8D00 | EB7E | 0716 | 4E8A | 32FA | 8BED | F476 | 40E8 |
| 0000023760 | F601 | FD46 | 7402 | E30E | 2606 | 3D80 | 7430 | 4F06 |
| 0000024000 | C626 | 3005 | EB41 | F600 | FC46 | 7440 | F631 | FD46 |
| 0000024020 | 7401 | C60B | F246 | C72D | F046 | 0001 | 20EB | 46F6 |
| 0000024040 | 01FC | 0B74 | 46C6 | 2BF2 | 46C7 | 01F0 | EB00 | F60F |
| 0000024060 | FC46 | 7402 | C609 | F246 | C720 | F046 | 0001 | 468B |
| 0000024100 | 2BF6 | 2BC1 | F046 | 027D | C033 | 5706 | F651 | FC46 |
| 0000024120 | 750C | 8B07 | B2C8 | E820 | 00BB | 1650 | 8D07 | F27E |
| 0000024140 | 4E8B | E8F0 | 0091 | F658 | FC46 | 7408 | F60D | FC46 |
| 0000024160 | 7504 | 8B07 | B2C8 | E830 | 009B | 5F59 | 5007 | 76E8 |
| 0000024200 | 5800 | 46F6 | 04FC | 0774 | C88B | 20B2 | 86E8 | E900 |

THU MAR 14 17:54:36 1991 UI.DLL PAGE 12, LINE 650

| | | | | | | | | |
|---|---|---|---|---|---|---|---|---|
| 0000024220 | FC00 | 76C4 | 260E | 89AD | 0E76 | C4C3 | 0E76 | AD26 |
| 0000024240 | D08B | AD26 | 8992 | 0E76 | F6C3 | FC46 | 7420 | E806 |
| 0000024260 | FFE9 | C28E | F88B | E8C3 | FFD8 | F88B | C00B | 0375 |
| 0000024300 | C08E | 1EC3 | C307 | 0698 | C457 | 065E | FF26 | 044F |
| 0000024320 | 1078 | 8B26 | 263F | 07FF | 8E26 | 0247 | 33AA | 5FC0 |
| 0000024340 | C307 | 5251 | 5306 | 0E50 | 23E8 | 83F9 | 06C4 | 595A |
| 0000024360 | FF3D | 75FF | EBE8 | E3E8 | 8B1B | 01F7 | F84E | 3357 |
| 0000024400 | 26FF | E8AC | FFC0 | F80B | F7E2 | FF0B | 745F | C705 |
| 0000024420 | F846 | FFFF | E3C3 | 0119 | F84E | 3357 | 8AFF | E8C2 |
| 0000024440 | FFA4 | F80B | F7E2 | FF0B | 745F | C705 | F846 | FFFF |
| 0000024460 | FDC3 | 9357 | F60B | 0A7F | DB0B | 0675 | D20B | 0275 |
| 0000024500 | 1AEB | 3392 | F7D2 | 93F1 | F1F7 | 8792 | 04D3 | 3C30 |
| 0000024520 | 7639 | 0203 | FF46 | 8BAA | 4EC2 | D8EB | 2B59 | 47CF |
| 0000024540 | C3FC | 5E5F | E58B | CB5D | 8B55 | 83EC | 02EC | C033 |
| 0000024560 | 09EB | 8B55 | 83EC | 02EC | FFB8 | 89FF | FE46 | 5E8B |
| 0000024600 | 3B06 | 3B1E | 7222 | BA19 | 0009 | C033 | 0BE9 | 8BF8 |
| 0000024620 | FE4E | C90B | 0774 | E853 | 0578 | C483 | E902 | F813 |
| 0000024640 | C00B | 0774 | E853 | 055E | C483 | 8302 | 04EC | CC8B |
| 0000024660 | FF53 | 0A76 | 76FF | FF08 | 0C76 | 5116 | FF9A | 00FF |
| 0000024700 | 5900 | 855A | 75C0 | 80C8 | 3DA7 | FD22 | 468B | 0BFE |
| 0000024720 | 74C0 | 5307 | 3BE8 | 8305 | 02C4 | 8B91 | 5DE5 | 00CB |
| 0000024740 | 8B55 | 83EC | 0EEC | C033 | 09EB | 8B55 | 83EC | 0EEC |
| 0000024760 | FFB8 | 89FF | F246 | 5E8B | 3B06 | 3B1E | 7222 | BA08 |
| 0000025000 | 0009 | C033 | 93E9 | 0BF7 | 74C0 | 5307 | F7E8 | 8304 |
| 0000025020 | 02C4 | 87F6 | 223D | 7420 | 5312 | C933 | 5151 | 4141 |
| 0000025040 | 8D51 | F446 | 5016 | 4D9A | 0025 | F600 | 3D87 | 8022 |
| 0000025060 | 6674 | 5E8C | 8EFA | 0A46 | 56C5 | 3308 | 89C0 | FE46 |
| 0000025100 | 4689 | FCFC | 5657 | FA8B | F28B | 6689 | 8BF8 | 0C4E |
| 0000025120 | 28E3 | 0AB0 | AEF2 | 3B75 | EC83 | 8B02 | BADC | 0080 |
| 0000025140 | E22B | D48B | FA8B | 0716 | 4E8B | AC0C | 0A3C | 0D74 |
| 0000025160 | FB3B | 1A74 | E2AA | E8F4 | 0038 | AFE9 | B000 | 3B0D |
| 0000025200 | 75FB | E803 | 002C | B0AA | FF0A | FC46 | E2EB | 21E8 |
| 0000025220 | EB00 | 5EE1 | 8E5F | FA5E | C8E9 | 8B00 | F246 | C00B |
| 0000025240 | 0974 | 76FF | E806 | 046A | C483 | B802 | FFFC | E80E |
| 0000025260 | F514 | 5350 | 1E51 | 1F06 | CF8B | CA2B | 21E3 | 8B51 |
| 0000025300 | 065E | 1E53 | 5152 | 468D | 16F4 | 9A50 | 1CD1 | 0000 |
| 0000025320 | 0B59 | 75C0 | 8B11 | F45E | 5E01 | 3BFE | 72D9 | 1F07 |
| 0000025340 | 5B59 | 8B58 | C3FA | 831F | 08C4 | 7E83 | 00FE | 3C75 |
| 0000025360 | C00B | 1874 | 6D3D | 7400 | 3D0D | 0001 | 09BA | 7500 |
| 0000025400 | BA08 | 001C | 03EB | 20BA | F900 | 26EB | 5E8E | F6FA |
| 0000025420 | 3D87 | 4022 | 0E74 | 5E8E | 8B0A | 085E | 3F80 | 751A |
| 0000025440 | F803 | 0EEB | 1CBA | 3300 | F9C0 | 06EB | 468B | 2BFE |
| 0000025460 | FC46 | 668B | 5EF8 | 8E5F | FA5E | 1472 | 5E8B | 0BF2 |
| 0000025500 | 74DB | FF09 | 0676 | C9E8 | 8303 | 02C4 | E58B | CB5D |
| 0000025520 | 5E8B | 0BF2 | 74DB | FF09 | 0676 | B5E8 | 8303 | 02C4 |
| 0000025540 | 37E9 | 8BF6 | 0C4E | C90B | 0475 | C18B | CEEB | C51E |
| 0000025560 | 0856 | 1E53 | 5152 | 468D | 16F4 | 9A50 | 265C | 0000 |
| 0000025600 | 071E | 0B1F | 74C0 | 3D17 | 006D | 0D74 | 013D | BA00 |
| 0000025620 | 0009 | BC75 | 1CBA | EB00 | BAB7 | 0020 | B2EB | 468B |
| 0000025640 | 0BF4 | 75C0 | F697 | 3D87 | 4022 | 0A74 | DA8B | 8026 |
| 0000025660 | 1A3F | 0275 | 86EB | 1CBA | 3300 | EBC0 | 0093 | 75EA |
| 0000025700 | 0327 | EA1F | 2794 | 2751 | 62EA | 5627 | EA27 | 2762 |
| 0000025720 | 275B | 8B55 | 56EC | 76C4 | 8C06 | E3C1 | 2605 | 4C80 |
| 0000025740 | 01FE | 5D5E | 55CB | EC8B | 096A | 51E8 | 8303 | 02C4 |
| 0000025760 | 76FF | 0E06 | 0DE8 | 5B00 | 096A | 6BE8 | 8303 | 02C4 |
| 0000026000 | E58B | CB5D | 8B55 | 56EC | 8B57 | 064E | F983 | 77E8 |
| 0000026020 | 1E69 | 84A1 | 0B28 | 74C0 | BF48 | 287C | 368B | 288C |
| 0000026040 | 1EC5 | 2886 | 561E | FF57 | 5FD7 | 735E | 8C2B | C5DA |
| 0000026060 | 0C5F | D63B | EF75 | 1F58 | C41E | 8636 | 2628 | 748B |

THU MAR 14 17:54:36 1991 UI.DLL PAGE 13, LINE 709

| | | | | | | | | |
|---|---|---|---|---|---|---|---|---|
| 0000026100 | C512 | 821E | 8C28 | 3BDA | 75D0 | 1FD9 | 811E | F8FF |
| 0000026120 | 7428 | BF0E | 28F8 | C4EB | 815E | 7CFF | 7428 | EB0F |
| 0000026140 | 070A | BF06 | 2882 | E1E8 | 7201 | E80E | 007E | 891F |
| 0000026160 | 8816 | 8928 | 861E | EB28 | 1F04 | C033 | 5F99 | 5D5E |
| 0000026200 | 00CB | 5706 | F88B | FB03 | 7F89 | 4F04 | 2D4F | 0016 |
| 0000026220 | 778D | C714 | FE05 | 89FF | 0A7F | 8948 | 8C04 | 8B1F |
| 0000026240 | 8CC6 | 8EDA | 8DC2 | 067F | ABFC | 47AB | 3347 | ABC0 |
| 0000026260 | ABAB | 5FAB | C307 | 8B26 | 0245 | C00B | 0975 | 8C26 |
| 0000026300 | 025D | 8926 | EB1D | 0614 | C426 | 0875 | 8C26 | 0E5C |
| 0000026320 | 8926 | 0C5C | 478C | 8912 | 1077 | 2607 | 5D8C | 260A |
| 0000026340 | 5D89 | 2608 | 5D8C | 2606 | 5D89 | C304 | 8041 | FEE1 |
| 0000026360 | FC53 | 778B | 8B08 | 0A5F | FF33 | 23EB | C38B | A85B |
| 0000026400 | 7501 | 5342 | 778B | 8B06 | 085F | DE3B | 3674 | 334B |
| 0000026420 | EBFF | 900C | 548D | 3BFE | 73D3 | 03E1 | 72F0 | AD23 |
| 0000026440 | 01A8 | F074 | FE8B | 3B48 | 73C1 | 0323 | 72F0 | 8B13 |
| 0000026460 | ADD0 | 01A8 | DE74 | C203 | 0205 | 8B00 | 89F7 | FE44 |
| 0000026500 | E4EB | C08B | 8B5B | 0647 | 4789 | F908 | 19EB | 895B |
| 0000026520 | FE4C | 0974 | F903 | C12B | 8948 | 2B05 | 03F9 | 89F9 |
| 0000026540 | 087F | C68B | DA8C | C3F8 | 5751 | 47F6 | 0102 | 6674 |
| 0000026560 | B7E8 | 8B00 | 8BFE | A804 | 7401 | 2B03 | 49C8 | 4141 |
| 0000026600 | 778B | 0B04 | 74F6 | 034F | 73CE | 3309 | BAC0 | FFF0 |
| 0000026620 | 33E3 | 42EB | 7EB8 | 8E1C | 26C0 | 90A1 | 3D28 | 2000 |
| 0000026640 | 1674 | 00BA | 3B80 | 72D0 | D106 | 75EA | EBF8 | 8322 |
| 0000026660 | 08FA | 1D72 | E2D1 | C28B | 8B48 | 03D0 | 73C1 | 3302 |
| 0000026700 | F7C0 | 23D2 | 52C2 | 2EE8 | 5A00 | 0D73 | FA83 | 74F0 |
| 0000026720 | B805 | 0010 | E2EB | EBF9 | 8B1B | 2BD0 | 0457 | 4789 |
| 0000026740 | 8904 | 087F | 778B | 4A0A | 1489 | 0342 | C7F2 | FE04 |
| 0000026760 | 89FF | 0A77 | 595F | 8BC3 | F6D0 | 0247 | 7404 | 4A0F |
| 0000027000 | 778B | 4E04 | D63B | 0572 | 5739 | 73FE | 4218 | 1E50 |
| 0000027020 | D59A | 0018 | 0B00 | 75C0 | 8B0F | F6C2 | 0247 | 7404 |
| 0000027040 | 4A04 | 5789 | F8FE | 01EB | C3F9 | 8B57 | 0877 | 773B |
| 0000027060 | 750A | 8B03 | 0677 | 3DAD | FFFE | 0874 | FE8B | FE24 |
| 0000027100 | F003 | F2EB | 4F4F | F78B | C35F | D18B | C283 | 8027 |
| 0000027120 | F0E2 | 8B50 | 52C4 | 5016 | C033 | 9A50 | FFFF | 000D |
| 0000027140 | 0B1F | 75C0 | 3314 | 26DB | 458B | 890C | 0247 | C28B |
| 0000027160 | 0FE8 | E8FE | FE40 | EBF8 | F901 | 00C3 | 8B55 | 8BEC |
| 0000027200 | 8BD7 | 1EDE | 76C5 | 8B0A | 8CFE | 8ED8 | 33C0 | B9C0 |
| 0000027220 | FFFF | AEF2 | D1F7 | 7EC4 | 8B06 | A8C7 | 7401 | A402 |
| 0000027240 | D149 | F3E9 | 13A5 | F3C9 | 8BA4 | 8BF3 | 1FFA | C28C |
| 0000027260 | CB5D | 8B55 | 57EC | 1E56 | 4E8B | E30E | 8B27 | C4D9 |
| 0000027300 | 067E | F78B | C033 | AEF2 | D9F7 | CB03 | FE8B | 76C5 |
| 0000027320 | F30A | 8AA6 | FF44 | C933 | 3A26 | FF45 | 0477 | 0474 |
| 0000027340 | 4949 | D1F7 | C18B | 5E1F | 8B5F | 5DE5 | 00CB | 8B55 |
| 0000027360 | 50EC | 468B | 0504 | 0014 | 4BEB | 8B55 | 50EC | 468B |
| 0000027400 | 0504 | 0014 | 69EB | 8B55 | 50EC | 468B | 0504 | 0114 |
| 0000027420 | 33EB | 8B55 | 50EC | 468B | 0504 | 0114 | 51EB | 8B55 |
| 0000027440 | 50EC | 468B | C104 | 02E0 | FF68 | 50FF | FF6A | FF6A |
| 0000027460 | FF9A | 00FF | 0B00 | 75C0 | 5829 | E58B | C35D | 8B55 |
| 0000027500 | 50EC | 468B | FF04 | B006 | C128 | 02E0 | B968 | 502A |
| 0000027520 | FF6A | FF6A | FF9A | 00FF | 0B00 | 75C0 | 5805 | E58B |
| 0000027540 | C35D | 11B8 | E900 | EE25 | 8B55 | 50EC | 468B | C104 |
| 0000027560 | 02E0 | DD68 | 502A | FF9A | 00FF | 0B00 | 75C0 | FFE3 |
| 0000027600 | B00E | 5828 | E58B | C35D | 8B55 | FFEC | 0676 | ADE8 |
| 0000027620 | 83FF | 02C4 | E58B | CB5D | 8B55 | FFEC | 0676 | C7E8 |
| 0000027640 | 83FF | 02C4 | E58B | CB5D | 068E | 21FC | A126 | 0006 |
| 0000027660 | 3B48 | B206 | 7728 | C107 | 06E0 | FFBA | C3FF | 5357 |
| 0000027700 | 6A51 | E80F | FF78 | C483 | 3B02 | B206 | 7628 | 8B40 |
| 0000027720 | 05D8 | 0004 | FC25 | 8BFF | C1C8 | 06E0 | 4BBA | 502B |
| 0000027740 | 9A52 | 29A1 | 0000 | C00B | 3275 | 8B49 | 87F9 | B23E |

THU MAR 14 17:54:36 1991 UI.DLL PAGE 14, LINE 768

```
0000027760  2B28  51CF  C147  06E7  E1C1  5705  C28E  ABF3
0000030000  595F  C726  0445  0200  C783  E240  8BF5  6AC3
0000030020  E80F  FF54  C483  5902  5F5B  9BEB  10B8  E900
0000030040  ED6B  04C8  0000  5657  126A  11E8  83FF  02C4
0000030060  06C6  2A5C  8B42  0646  568B  A308  2A58  1689
0000030100  2A5A  52BE  892A  8904  0254  06C7  2A56  7FFF
0000030120  468D  160E  FF50  0C76  76FF  1E0A  9A56  200E
0000030140  2C13  C483  8B0C  FFF8  560E  782A  C40F  521E
0000030160  FF2A  5206  262A  07C6  EB00  900D  561E  006A
0000030200  9E9A  601D  8327  06C4  126A  DBE8  83FE  02C4
0000030220  C78B  5F5E  CBC9  8B55  57EC  468B  F706  0866
0000030240  0573  C033  EB99  501A  4E9A  F027  592B  D88B
0000030260  DA0B  0D74  8B50  8EF8  33C2  41C0  E9D1  ABF3
0000030300  5F58  CB5D  002C  0203  0EDB  0004  0060  0002
0000030320  2C3B  0001  0000  0002  10BD  0002  0000  0002
0000030340  2B6D  0003  0000  0103  1A94  0001  0005  0103
0000030360  12C0  0003  00F6  0203  08C2  0004  006F  0103
0000030400  1336  0003  00F7  0103  1A2C  0001  0007  0103
0000030420  18B8  0001  0008  0002  2B03  0004  0000  0103
0000030440  270C  0001  008A  0103  2AE5  0001  008C  0103
0000030460  2B07  0001  008D  0103  2AC1  0001  008E  0002
0000030500  2925  0006  0000  0205  170A  0004  001B  0203
0000030520  1720  0004  0081  0103  12F6  0003  008A  0103
0000030540  1314  0003  008B  0205  1736  0004  0029  0103
0000030560  29EC  0001  0022  0103  17BC  0003  0095  0103
0000030600  2B72  0001  0026  0205  0ED8  0004  0037  0103
0000030620  12AD  0003  011F  0103  25B7  0001  003A  0202
0000030640  0ED5  0004  0037  0103  023E  0005  0026  0103
0000030660  12DB  0003  003A  0103  132B  0003  003B  0103
0000030700  02A8  0005  002C  0103  069F  0003  003C  0103
0000030720  1992  0001  004D  0103  04BA  0003  0041  0103
0000030740  066E  0003  0043  0103  0702  0003  0044  0103
0000030760  05A4  0003  0046  0203  1769  0004  0041  0103
0000031000  1909  0001  005B  0203  184F  0004  0050  0103
0000031020  179E  0003  005B  0103  17A5  0003  005C  0103
0000031040  17CF  0003  005E  0000  0000  0000  0000  0000
0000031060  4DFF  4D4B  4753  4553  0047  0001  0000  002A
0000031100  C033  0E50  8B55  87EC  0646  4687  8702  0846
0000031120  4689  5D04  FFEA  00FF  FF00  0001  0103  0025
0000031140  0002  0002  0000  0000  0000  0000  0000  0000
0000031160  0000  0000  0200  0000  0000  0000  0000  0000
0000031200  0000  0000  0000  0000  0000  0000  0000  0000
*
0000031260  0000  0000  0200  0000  0000  0000  0000  0000
0000031300  0000  0000  0000  0000  0000  0000  0000  0000
*
0000031360  0000  0000  0200  0000  0000  0000  0000  0000
0000031400  0000  0000  0000  0000  0000  0000  0000  0000
*
0000031460  0000  0000  0200  0000  0000  0000  0000  0000
0000031500  0000  0000  0000  0000  534D  5220  6E75  542D
0000031520  6D69  2065  694C  7262  7261  2079  202D  6F43
0000031540  7970  6972  6867  2074  6328  2029  3931  3039
0000031560  202C  694D  7263  736F  666F  2074  6F43  7072
0000031600  0018  6975  632E  7500  2E69  0070  6F4E  6974
0000031620  6563  203A  704F  7265  7461  6F69  206E  6F63
0000031640  706D  656C  6574  2064  7573  6363  7365  6673
0000031660  6C75  796C  002E  6E49  6574  6E72  6C61  4520
0000031700  7272  726F  002E  7245  6F72  3A72  4F20  6570
```

THU MAR 14 17:54:36 1991 UI.DLL PAGE 15, LINE 827

| | | | | | | | | |
|---|---|---|---|---|---|---|---|---|
| 0000031720 | 6172 | 6974 | 6E6F | 7720 | 7361 | 6120 | 6F62 | 7472 |
| 0000031740 | 6465 | 6220 | 2079 | 6874 | 2065 | 7973 | 7473 | 6D65 |
| 0000031760 | 002E | 7245 | 6F72 | 3A72 | 4F20 | 6570 | 6172 | 6974 |
| 0000032000 | 6E6F | 7720 | 7361 | 6120 | 6F62 | 7472 | 6465 | 6220 |
| 0000032020 | 2079 | 6874 | 2065 | 7375 | 7265 | 002E | 7245 | 6F72 |
| 0000032040 | 3A72 | 4F20 | 6570 | 6172 | 6974 | 6E6F | 7720 | 7361 |
| 0000032060 | 6320 | 6E61 | 6563 | 6C6C | 6465 | 6220 | 2079 | 6874 |
| 0000032100 | 2065 | 7375 | 7265 | 002E | 7245 | 6F72 | 3A72 | 4520 |
| 0000032120 | 7272 | 726F | 6F20 | 6363 | 7275 | 6572 | 2064 | 7564 |
| 0000032140 | 6972 | 676E | 6120 | 6320 | 6C61 | 206C | 6F74 | 6120 |
| 0000032160 | 7320 | 7379 | 6574 | 206D | 6573 | 7672 | 6369 | 2E65 |
| 0000032200 | 4500 | 7272 | 726F | 203A | 7245 | 6F72 | 2072 | 636F |
| 0000032220 | 7563 | 7272 | 6465 | 6420 | 7275 | 6E69 | 2067 | 2061 |
| 0000032240 | 6163 | 6C6C | 7420 | 206F | 2061 | 7973 | 7473 | 6D65 |
| 0000032260 | 6620 | 6E75 | 7463 | 6F69 | 2E6E | 4500 | 7272 | 726F |
| 0000032300 | 203A | 654D | 6F6D | 7972 | 6120 | 6C6C | 636F | 7461 |
| 0000032320 | 6F69 | 206E | 6166 | 6C69 | 6465 | 002E | 7245 | 6F72 |
| 0000032340 | 3A72 | 4320 | 6E61 | 6F6E | 2074 | 706F | 6E65 | 6620 |
| 0000032360 | 6C69 | 2E65 | 4500 | 7272 | 726F | 203A | 6143 | 6E6E |
| 0000032400 | 746F | 6320 | 6F6C | 6573 | 6620 | 6C69 | 2E65 | 4500 |
| 0000032420 | 7272 | 726F | 203A | 6143 | 6E6E | 746F | 6420 | 6C65 |
| 0000032440 | 7465 | 2065 | 6966 | 656C | 002E | 7245 | 6F72 | 3A72 |
| 0000032460 | 4620 | 6961 | 656C | 2064 | 6F74 | 7720 | 6972 | 6574 |
| 0000032500 | 7420 | 206F | 2061 | 6964 | 6B73 | 6620 | 6C69 | 2E65 |
| 0000032520 | 4500 | 7272 | 726F | 203A | 6146 | 6C69 | 6465 | 7420 |
| 0000032540 | 206F | 6572 | 6461 | 6620 | 6F72 | 206D | 2061 | 6964 |
| 0000032560 | 6B73 | 6620 | 6C69 | 2E65 | 4500 | 7272 | 726F | 203A |
| 0000032600 | 2F49 | 204F | 706F | 7265 | 7461 | 6F69 | 206E | 6166 |
| 0000032620 | 6C69 | 7275 | 2E65 | 4500 | 7272 | 726F | 203A | 6944 |
| 0000032640 | 6B73 | 6920 | 2073 | 7566 | 6C6C | 002E | 7245 | 6F72 |
| 0000032660 | 3A72 | 4F20 | 6A62 | 6365 | 2074 | 6F64 | 7365 | 6E20 |
| 0000032700 | 746F | 6520 | 6978 | 7473 | 002E | 7245 | 6F72 | 3A72 |
| 0000032720 | 4F20 | 6A62 | 6365 | 2074 | 7369 | 6E20 | 746F | 6620 |
| 0000032740 | 756F | 646E | 002E | 7245 | 6F72 | 3A72 | 4F20 | 6A62 |
| 0000032760 | 6365 | 2074 | 6C61 | 6572 | 6461 | 2079 | 7865 | 7369 |
| 0000033000 | 7374 | 002E | 7245 | 6F72 | 3A72 | 4F20 | 6A62 | 6365 |
| 0000033020 | 2074 | 7369 | 6120 | 726C | 6165 | 7964 | 6620 | 756F |
| 0000033040 | 646E | 002E | 7245 | 6F72 | 3A72 | 4920 | 6C6C | 6765 |
| 0000033060 | 6C61 | 7020 | 7261 | 6D61 | 7465 | 7265 | 002E | 7245 |
| 0000033100 | 6F72 | 3A72 | 5220 | 7165 | 6975 | 6572 | 2064 | 6170 |
| 0000033120 | 6172 | 656D | 6574 | 2072 | 7369 | 6D20 | 7369 | 6973 |
| 0000033140 | 676E | 002E | 7245 | 6F72 | 3A72 | 5020 | 7261 | 6D61 |
| 0000033160 | 7465 | 7265 | 7320 | 6F68 | 6C75 | 2064 | 6562 | 6E20 |
| 0000033200 | 6E6F | 6E2D | 6765 | 7461 | 7669 | 2E65 | 4500 | 7272 |
| 0000033220 | 726F | 203A | 6150 | 6172 | 656D | 6574 | 2072 | 6873 |
| 0000033240 | 756F | 646C | 6220 | 2065 | 6F6E | 2D6E | 6F70 | 6973 |
| 0000033260 | 6974 | 6576 | 002E | 7245 | 6F72 | 3A72 | 5020 | 7261 |
| 0000033300 | 6D61 | 7465 | 7265 | 6920 | 2073 | 554E | 4C4C | 002E |
| 0000033320 | 7245 | 6F72 | 2072 | 6928 | 746E | 7265 | 616E | 296C |
| 0000033340 | 203A | 6E55 | 6E6B | 776F | 206E | 706F | 635F | 646F |
| 0000033360 | 2E65 | 4500 | 7272 | 726F | 203A | 6146 | 6C69 | 6465 |
| 0000033400 | 7420 | 206F | 616D | 656B | 6120 | 7020 | 7069 | 2E65 |
| 0000033420 | 4500 | 7272 | 726F | 203A | 6146 | 6C69 | 6465 | 7420 |
| 0000033440 | 206F | 706F | 6E65 | 6120 | 7020 | 7069 | 2E65 | 4500 |
| 0000033460 | 7272 | 726F | 203A | 6146 | 6C69 | 6465 | 7420 | 206F |
| 0000033500 | 6C63 | 736F | 2065 | 2061 | 6970 | 6570 | 002E | 7245 |
| 0000033520 | 6F72 | 3A72 | 4620 | 6961 | 656C | 2064 | 6F74 | 6320 |
| 0000033540 | 6E6F | 656E | 7463 | 7420 | 206F | 2061 | 6970 | 6570 |
| 0000033560 | 002E | 7245 | 6F72 | 3A72 | 4620 | 6961 | 656C | 2064 |

THU MAR 14 17:54:36 1991 UI.DLL PAGE 16, LINE 886

| | | | | | | | | |
|---|---|---|---|---|---|---|---|---|
| 0000033600 | 6F74 | 6420 | 7369 | 6F63 | 6E6E | 6365 | 2074 | 2061 |
| 0000033620 | 6970 | 6570 | 002E | 7245 | 6F72 | 3A72 | 4620 | 6961 |
| 0000033640 | 656C | 2064 | 6F74 | 7320 | 6174 | 7472 | 6120 | 7420 |
| 0000033660 | 7268 | 6165 | 2E64 | 4500 | 7272 | 726F | 203A | 2041 |
| 0000033700 | 6974 | 656D | 6F2D | 7475 | 6920 | 206E | 7473 | 7261 |
| 0000033720 | 6974 | 676E | 6120 | 7420 | 7268 | 6165 | 2064 | 7865 |
| 0000033740 | 6970 | 6572 | 2E64 | 5700 | 7261 | 696E | 676E | 2820 |
| 0000033760 | 6E69 | 6574 | 6E72 | 6C61 | 3A29 | 4720 | 6E65 | 7265 |
| 0000034000 | 6C61 | 7720 | 7261 | 696E | 676E | 002E | 6157 | 6E72 |
| 0000034020 | 6E69 | 3A67 | 4520 | 646E | 6F20 | 2066 | 6966 | 656C |
| 0000034040 | 7720 | 7361 | 6420 | 7465 | 6365 | 6574 | 2E64 | 5700 |
| 0000034060 | 7261 | 696E | 676E | 203A | 6C49 | 656C | 6167 | 206C |
| 0000034100 | 6170 | 6172 | 656D | 6574 | 2E72 | 5700 | 7261 | 696E |
| 0000034120 | 676E | 203A | 6C49 | 656C | 6167 | 206C | 6F66 | 6D72 |
| 0000034140 | 7461 | 002E | 6157 | 6E72 | 6E69 | 3A67 | 4420 | 7075 |
| 0000034160 | 696C | 6163 | 6574 | 6520 | 746E | 7972 | 002E | 6157 |
| 0000034200 | 6E72 | 6E69 | 3A67 | 4F20 | 6A62 | 6365 | 2074 | 6C61 |
| 0000034220 | 6572 | 6461 | 2079 | 7865 | 7369 | 7374 | 002E | 7245 |
| 0000034240 | 6F72 | 2072 | 6928 | 746E | 7265 | 616E | 296C | 203A |
| 0000034260 | 614C | 7473 | 4720 | 4E45 | 6520 | 7272 | 726F | 6320 |
| 0000034300 | 646F | 2E65 | 4500 | 7272 | 726F | 203A | 6547 | 656E |
| 0000034320 | 6172 | 206C | 2F49 | 204F | 7245 | 6F72 | 2E72 | 4500 |
| 0000034340 | 7272 | 726F | 203A | 6554 | 6863 | 696E | 6163 | 206C |
| 0000034360 | 7665 | 6E65 | 2074 | 6177 | 2073 | 6F6E | 2074 | 6F66 |
| 0000034400 | 6E75 | 2E64 | 4500 | 7272 | 726F | 203A | 6F4C | 6163 |
| 0000034420 | 6F74 | 2072 | 6177 | 2073 | 6F6C | 7473 | 002E | 7245 |
| 0000034440 | 6F72 | 3A72 | 4920 | 6C6C | 6765 | 6C61 | 7020 | 696F |
| 0000034460 | 746E | 6E69 | 2067 | 6564 | 6976 | 6563 | 002E | 7245 |
| 0000034500 | 6F72 | 3A72 | 5420 | 6172 | 6B63 | 7720 | 7361 | 6E20 |
| 0000034520 | 746F | 6620 | 756F | 646E | 002E | 7245 | 6F72 | 3A72 |
| 0000034540 | 5320 | 7263 | 6565 | 206E | 7369 | 7520 | 736E | 6174 |
| 0000034560 | 6C62 | 2E65 | 4500 | 7272 | 726F | 203A | 6353 | 6572 |
| 0000034600 | 6E65 | 7720 | 7361 | 6E20 | 746F | 6620 | 756F | 646E |
| 0000034620 | 002E | 7245 | 6F72 | 3A72 | 4620 | 6C69 | 6574 | 2072 |
| 0000034640 | 6177 | 2073 | 6F6E | 2074 | 6F66 | 6E75 | 2E64 | 4500 |
| 0000034660 | 7272 | 726F | 203A | 4F4E | 2054 | 4944 | 5053 | 4D20 |
| 0000034700 | 5341 | 204B | 4F4D | 4544 | 002E | 7245 | 6F72 | 3A72 |
| 0000034720 | 4320 | 5652 | 6920 | 2073 | 7562 | 7973 | 7020 | 6F72 |
| 0000034740 | 6563 | 7373 | 6E69 | 2067 | 6E61 | 746F | 6568 | 2072 |
| 0000034760 | 6F63 | 6D6D | 6E61 | 2E64 | 5720 | 6961 | 2074 | 726F |
| 0000035000 | 7320 | 6C65 | 6365 | 2074 | 6241 | 726F | 2074 | 7266 |
| 0000035020 | 6D6F | 7420 | 6568 | 5220 | 7065 | 616C | 2079 | 656D |
| 0000035040 | 756E | 002E | 7245 | 6F72 | 3A72 | 4320 | 6D6F | 616D |
| 0000035060 | 646E | 7720 | 7361 | 6120 | 6F62 | 7472 | 6465 | 002E |
| 0000035100 | 7245 | 6F72 | 3A72 | 4920 | 6C6C | 6765 | 6C61 | 6F20 |
| 0000035120 | 6370 | 646F | 2E65 | 4500 | 7272 | 726F | 203A | 6353 |
| 0000035140 | 6572 | 6E65 | 6D20 | 7369 | 616D | 6374 | 2E68 | 4500 |
| 0000035160 | 7272 | 726F | 203A | 4F4D | 2044 | 4954 | 494D | 474E |
| 0000035200 | 002E | 7245 | 6F72 | 3A72 | 4120 | 4444 | 5420 | 4345 |
| 0000035220 | 2E48 | 4500 | 7272 | 726F | 203A | 4544 | 454C | 4554 |
| 0000035240 | 5420 | 4345 | 2E48 | 4500 | 7272 | 726F | 203A | 554D |
| 0000035260 | 544C | 2049 | 4F43 | 4544 | 002E | 7245 | 6F72 | 3A72 |
| 0000035300 | 4820 | 7261 | 7764 | 7261 | 2065 | 6361 | 6563 | 656C |
| 0000035320 | 6172 | 6F74 | 2072 | 7369 | 6E20 | 746F | 7220 | 7365 |
| 0000035340 | 6F70 | 646E | 6E69 | 2E67 | 4500 | 7272 | 726F | 203A |
| 0000035360 | 7845 | 6570 | 7463 | 6465 | 7720 | 6E69 | 6F64 | 2077 |
| 0000035400 | 6973 | 657A | 6420 | 206F | 6F6E | 2074 | 616D | 6374 |
| 0000035420 | 2068 | 6874 | 2065 | 6361 | 7574 | 6C61 | 6F20 | 656E |
| 0000035440 | 002E | 7245 | 6F72 | 3A72 | 4920 | 746E | 7265 | 616E |

THU MAR 14 17:54:36 1991 UI.DLL PAGE 17, LINE 945

| | | | | | | | | |
|---|---|---|---|---|---|---|---|---|
| 0000035460 | 206C | 7265 | 6F72 | 2072 | 6928 | 616D | 6567 | 7420 |
| 0000035500 | 7079 | 2965 | 002E | 7245 | 6F72 | 2072 | 636F | 7563 |
| 0000035520 | 6572 | 2064 | 7564 | 6972 | 676E | 7320 | 6769 | 616E |
| 0000035540 | 7574 | 6572 | 6420 | 7369 | 6C70 | 7961 | 002E | 7245 |
| 0000035560 | 6F72 | 2072 | 6928 | 746E | 7265 | 616E | 296C | 203A |
| 0000035600 | 5246 | 4D41 | 2045 | 6966 | 7372 | 2074 | 7265 | 6F72 |
| 0000035620 | 2E72 | 4500 | 7272 | 726F | 203A | 6C49 | 656C | 6167 |
| 0000035640 | 206C | 626F | 656A | 7463 | 7420 | 7079 | 2065 | 6F66 |
| 0000035660 | 2072 | 6874 | 7369 | 6F20 | 6570 | 6172 | 6974 | 6E6F |
| 0000035700 | 002E | 7245 | 6F72 | 3A72 | 5420 | 6568 | 6E20 | 6D61 |
| 0000035720 | 2065 | 7073 | 6365 | 6669 | 6569 | 2073 | 6F62 | 6874 |
| 0000035740 | 6920 | 616D | 6567 | 6120 | 646E | 6620 | 6C69 | 6574 |
| 0000035760 | 2E72 | 5320 | 6C65 | 6365 | 2074 | 6874 | 2065 | 626F |
| 0000036000 | 656A | 7463 | 7420 | 206F | 6562 | 6420 | 6C65 | 7465 |
| 0000036020 | 6465 | 002E | 7245 | 6F72 | 3A72 | 4620 | 6961 | 656C |
| 0000036040 | 2064 | 6F74 | 6320 | 6F6C | 6573 | 4320 | 5652 | 002E |
| 0000036060 | 7245 | 6F72 | 3A72 | 4620 | 6961 | 656C | 2064 | 6F74 |
| 0000036100 | 6320 | 6F6C | 6573 | 5420 | 2E4D | 4500 | 7272 | 726F |
| 0000036120 | 203A | 4946 | 5352 | 2054 | 5245 | 2E52 | 4500 | 7272 |
| 0000036140 | 726F | 203A | 4553 | 5652 | 5245 | 4420 | 574F | 2E4E |
| 0000036160 | 4500 | 7272 | 726F | 203A | 4F4C | 4441 | 5320 | 5245 |
| 0000036200 | 4556 | 2E52 | 4500 | 7272 | 726F | 203A | 4E55 | 4F4C |
| 0000036220 | 4441 | 5320 | 5245 | 4556 | 2E52 | 4500 | 7272 | 726F |
| 0000036240 | 203A | 4553 | 5353 | 4F49 | 204E | 4E4F | 002E | 7245 |
| 0000036260 | 6F72 | 3A72 | 5320 | 5345 | 4953 | 4E4F | 4F20 | 4646 |
| 0000036300 | 002E | 7245 | 6F72 | 3A72 | 5420 | 6572 | 2065 | 7264 |
| 0000036320 | 7669 | 2065 | 7369 | 6920 | 766E | 6C61 | 6469 | 002E |
| 0000036340 | 7245 | 6F72 | 3A72 | 4920 | 564E | 4C41 | 4449 | 4C20 |
| 0000036360 | 4249 | 002E | 7245 | 6F72 | 3A72 | 4620 | 6C6F | 6564 |
| 0000036400 | 2072 | 6564 | 7470 | 2068 | 616D | 2079 | 6F6E | 2074 |
| 0000036420 | 7865 | 6563 | 6465 | 7420 | 7268 | 6565 | 6C20 | 7665 |
| 0000036440 | 6C65 | 2E73 | 4500 | 7272 | 726F | 203A | 4552 | 4553 |
| 0000036460 | 5652 | 4445 | 3920 | 002E | 7245 | 6F72 | 3A72 | 5420 |
| 0000036500 | 7365 | 2074 | 6F64 | 7365 | 6E20 | 746F | 6520 | 6978 |
| 0000036520 | 7473 | 002E | 7245 | 6F72 | 3A72 | 5420 | 7365 | 2074 |
| 0000036540 | 7369 | 6E20 | 746F | 6F20 | 6570 | 656E | 2E64 | 4500 |
| 0000036560 | 7272 | 726F | 203A | 5354 | 2054 | 504F | 4E45 | 4D20 |
| 0000036600 | 444F | 2E45 | 4500 | 7272 | 726F | 203A | 4453 | 2042 |
| 0000036620 | 4F4E | 2054 | 5845 | 5349 | 2E54 | 4500 | 7272 | 726F |
| 0000036640 | 203A | 4453 | 2042 | 4F4C | 4441 | 4445 | 002E | 7245 |
| 0000036660 | 6F72 | 3A72 | 5320 | 4244 | 4E20 | 544F | 4C20 | 414F |
| 0000036700 | 4544 | 2E44 | 4500 | 7272 | 726F | 203A | 6E55 | 6E6B |
| 0000036720 | 776F | 206E | 6F63 | 746E | 7865 | 2074 | 6F66 | 646C |
| 0000036740 | 7265 | 002E | 7245 | 6F72 | 3A72 | 4220 | 6361 | 676B |
| 0000036760 | 6F72 | 6E75 | 2064 | 7265 | 6F72 | 2E72 | 4500 | 7272 |
| 0000037000 | 726F | 203A | 4552 | 4553 | 5652 | 4445 | 3120 | 2E38 |
| 0000037020 | 4500 | 7272 | 726F | 203A | 4552 | 4553 | 5652 | 4445 |
| 0000037040 | 3120 | 2E39 | 4500 | 7272 | 726F | 203A | 6550 | 6D72 |
| 0000037060 | 7369 | 6973 | 6E6F | 6420 | 6E65 | 6569 | 2E64 | 2820 |
| 0000037100 | 624F | 656A | 7463 | 6920 | 2073 | 7270 | 626F | 6261 |
| 0000037120 | 796C | 6C20 | 636F | 656B | 2064 | 7962 | 6120 | 6F6E |
| 0000037140 | 6874 | 7265 | 7020 | 6F72 | 6563 | 7373 | 292E | 4500 |
| 0000037160 | 7272 | 726F | 203A | 624F | 656A | 7463 | 6920 | 2073 |
| 0000037200 | 6F6C | 6B63 | 6465 | 002E | 7245 | 6F72 | 3A72 | 4F20 |
| 0000037220 | 4550 | 204E | 4F4D | 4544 | 4520 | 5252 | 524F | 002E |
| 0000037240 | 7245 | 6F72 | 3A72 | 4F20 | 6A62 | 6365 | 2074 | 7369 |
| 0000037260 | 6920 | 206E | 7375 | 2E65 | 4500 | 7272 | 726F | 203A |
| 0000037300 | 4F43 | 464E | 494C | 5443 | 4520 | 5252 | 524F | 002E |
| 0000037320 | 7245 | 6F72 | 3A72 | 4920 | 636E | 6D6F | 6C70 | 7465 |

THU MAR 14 17:54:36 1991 UI.DLL PAGE 18, LINE 1004

| | | | | | | | | |
|---|---|---|---|---|---|---|---|---|
| 0000037340 | 2065 | 6341 | 6563 | 7373 | 2D20 | 5020 | 656C | 7361 |
| 0000037360 | 2065 | 7375 | 2065 | 6552 | 6F63 | 6576 | 7972 | 6620 |
| 0000037400 | 726F | 7420 | 6968 | 2073 | 6574 | 7473 | 4500 | 7272 |
| 0000037420 | 726F | 203A | 624F | 656A | 7463 | 6120 | 726C | 6165 |
| 0000037440 | 7964 | 6520 | 6978 | 7473 | 2E73 | 4500 | 7272 | 726F |
| 0000037460 | 203A | 624F | 656A | 7463 | 6420 | 656F | 2073 | 6F6E |
| 0000037500 | 2074 | 7865 | 7369 | 2E74 | 4500 | 7272 | 726F | 203A |
| 0000037520 | 424F | 204A | 4449 | 002E | 7245 | 6F72 | 3A72 | 4F20 |
| 0000037540 | 6A62 | 6365 | 2074 | 7974 | 6570 | 6920 | 2073 | 6F6E |
| 0000037560 | 2074 | 6176 | 696C | 2064 | 6F66 | 2072 | 6874 | 7369 |
| 0000037600 | 6F20 | 6570 | 6172 | 6974 | 6E6F | 002E | 7245 | 6F72 |
| 0000037620 | 3A72 | 5220 | 6F6F | 2074 | 626F | 656A | 7463 | 6920 |
| 0000037640 | 2073 | 6F6E | 2074 | 6176 | 696C | 2064 | 6F66 | 2072 |
| 0000037660 | 6874 | 7369 | 6F20 | 6570 | 6172 | 6974 | 6E6F | 002E |
| 0000037700 | 7245 | 6F72 | 3A72 | 4F20 | 6A62 | 6365 | 2074 | 7369 |
| 0000037720 | 6C20 | 636F | 656B | 2E64 | 4500 | 7272 | 726F | 203A |
| 0000037740 | 624F | 656A | 7463 | 6420 | 7461 | 2061 | 7369 | 6420 |
| 0000037760 | 6D61 | 6761 | 6465 | 202E | 7254 | 2079 | 6F74 | 7520 |
| 0000040000 | 6573 | 7420 | 6568 | 5220 | 6365 | 766F | 7265 | 6F20 |
| 0000040020 | 7470 | 6F69 | 2E6E | 4500 | 7272 | 726F | 203A | 6150 |
| 0000040040 | 6874 | 616E | 656D | 6920 | 2073 | 6C69 | 656C | 6167 |
| 0000040060 | 206C | 726F | 7520 | 6B6E | 6F6E | 6E77 | 002E | 7245 |
| 0000040100 | 6F72 | 3A72 | 4920 | 564E | 4C41 | 4449 | 4E20 | 4D41 |
| 0000040120 | 2E45 | 4500 | 7272 | 726F | 203A | 6150 | 6874 | 616E |
| 0000040140 | 656D | 6920 | 2073 | 6C69 | 656C | 6167 | 206C | 726F |
| 0000040160 | 7520 | 6B6E | 6F6E | 6E77 | 002E | 7245 | 6F72 | 3A72 |
| 0000040200 | 5220 | 5345 | 5245 | 4556 | 2044 | 3633 | 002E | 7245 |
| 0000040220 | 6F72 | 3A72 | 5220 | 5345 | 5245 | 4556 | 2044 | 3733 |
| 0000040240 | 002E | 7245 | 6F72 | 3A72 | 5220 | 5345 | 5245 | 4556 |
| 0000040260 | 2044 | 3833 | 002E | 7245 | 6F72 | 3A72 | 5020 | 5441 |
| 0000040300 | 2048 | 4F4E | 2054 | 4F46 | 4E55 | 2E44 | 4500 | 7272 |
| 0000040320 | 726F | 203A | 4946 | 454C | 4520 | 4958 | 5453 | 2E53 |
| 0000040340 | 4500 | 7272 | 726F | 203A | 4946 | 454C | 5620 | 5245 |
| 0000040360 | 4953 | 4E4F | 002E | 7245 | 6F72 | 3A72 | 5020 | 7968 |
| 0000040400 | 6973 | 6163 | 206C | 6964 | 6572 | 7463 | 726F | 2079 |
| 0000040420 | 6C61 | 6572 | 6461 | 2079 | 7865 | 7369 | 7374 | 002E |
| 0000040440 | 7245 | 6F72 | 3A72 | 5220 | 5345 | 5245 | 4556 | 2044 |
| 0000040460 | 3334 | 002E | 7245 | 6F72 | 3A72 | 4520 | 444E | 4F20 |
| 0000040500 | 2046 | 494C | 5453 | 002E | 7245 | 6F72 | 3A72 | 4920 |
| 0000040520 | 4C4C | 4745 | 4C41 | 5320 | 524F | 2054 | 524F | 4544 |
| 0000040540 | 2E52 | 4500 | 7272 | 726F | 203A | 4C43 | 4145 | 204E |
| 0000040560 | 4146 | 4C49 | 4445 | 002E | 7245 | 6F72 | 3A72 | 5320 |
| 0000040600 | 6E79 | 6174 | 2078 | 7265 | 6F72 | 2072 | 6177 | 2073 |
| 0000040620 | 6F66 | 6E75 | 2064 | 6E69 | 7420 | 6568 | 4320 | 6E6F |
| 0000040640 | 6966 | 7567 | 6172 | 6974 | 6E6F | 2820 | 726F | 5420 |
| 0000040660 | 7365 | 2074 | 6548 | 6461 | 7265 | 2029 | 6966 | 656C |
| 0000040700 | 002E | 7245 | 6F72 | 3A72 | 4320 | 6E6F | 6966 | 7567 |
| 0000040720 | 6172 | 6974 | 6E6F | 6E20 | 7365 | 6974 | 676E | 6920 |
| 0000040740 | 2073 | 6F74 | 206F | 6564 | 7065 | 002E | 7245 | 6F72 |
| 0000040760 | 3A72 | 5220 | 4345 | 564F | 5245 | 4620 | 4941 | 454C |
| 0000041000 | 2E44 | 5400 | 6568 | 6720 | 7669 | 6E65 | 6E20 | 6D61 |
| 0000041020 | 2065 | 7369 | 7420 | 6F6F | 6C20 | 6E6F | 2E67 | 5400 |
| 0000041040 | 6568 | 6572 | 6920 | 2073 | 6F6E | 7320 | 6375 | 2068 |
| 0000041060 | 656B | 2E79 | 5300 | 6E79 | 6174 | 2078 | 7265 | 6F72 |
| 0000041100 | 2E72 | 5400 | 6568 | 6572 | 6120 | 6572 | 7420 | 6F6F |
| 0000041120 | 6D20 | 6E61 | 2079 | 706F | 6E65 | 6220 | 6675 | 6566 |
| 0000041140 | 7372 | 202E | 6C50 | 6165 | 6573 | 6320 | 6F6C | 6573 |
| 0000041160 | 7320 | 6D6F | 2065 | 6574 | 7473 | 2E73 | 4500 | 7272 |
| 0000041200 | 726F | 2820 | 6E69 | 6574 | 6E72 | 6C61 | 3A29 | 4920 |

THU MAR 14 17:54:36 1991 UI.DLL PAGE 19, LINE 1063

| | | | | | | | | |
|---|---|---|---|---|---|---|---|---|
| 0000041220 | 4350 | 6D20 | 6365 | 6168 | 696E | 6D73 | 6920 | 2073 |
| 0000041240 | 6F6E | 2074 | 6E69 | 7469 | 6169 | 696C | 657A | 2E64 |
| 0000041260 | 4500 | 7272 | 726F | 203A | 6E49 | 6574 | 7072 | 6F72 |
| 0000041300 | 6563 | 7373 | 6320 | 6D6F | 756D | 696E | 6163 | 6974 |
| 0000041320 | 6E6F | 6620 | 6961 | 656C | 2E64 | 4500 | 7272 | 726F |
| 0000041340 | 203A | 6143 | 6E6E | 746F | 6320 | 6D6F | 756D | 696E |
| 0000041360 | 6163 | 6574 | 6420 | 6575 | 7420 | 206F | 6361 | 6974 |
| 0000041400 | 6576 | 692C | 746E | 7265 | 7270 | 636F | 7365 | 2073 |
| 0000041420 | 6F63 | 6D6D | 6E75 | 6369 | 7461 | 6F69 | 2E6E | 4500 |
| 0000041440 | 7272 | 726F | 203A | 5243 | 2056 | 6F6D | 7564 | 656C |
| 0000041460 | 6E20 | 746F | 6620 | 6E75 | 7463 | 6F69 | 696E | 676E |
| 0000041500 | 202E | 7254 | 2079 | 6F74 | 7220 | 6C65 | 616F | 2064 |
| 0000041520 | 6874 | 2065 | 7061 | 6C70 | 6369 | 7461 | 6F69 | 2E6E |
| 0000041540 | 4500 | 7272 | 726F | 2820 | 6E69 | 6574 | 6E72 | 6C61 |
| 0000041560 | 3A29 | 4120 | 6F62 | 7472 | 7720 | 7361 | 7320 | 6E65 |
| 0000041600 | 2074 | 6E6F | 4920 | 4350 | 002E | 7245 | 6F72 | 2072 |
| 0000041620 | 6928 | 746E | 7265 | 616E | 296C | 203A | 5049 | 2043 |
| 0000041640 | 6177 | 2073 | 6574 | 6D72 | 6E69 | 7461 | 6465 | 002E |
| 0000041660 | 7245 | 6F72 | 2072 | 6928 | 746E | 7265 | 616E | 296C |
| 0000041700 | 203A | 6143 | 6E6E | 746F | 6320 | 6D6F | 756D | 696E |
| 0000041720 | 6163 | 6574 | 2820 | 6F6E | 7020 | 7069 | 2965 | 002E |
| 0000041740 | 7245 | 6F72 | 2072 | 6928 | 746E | 7265 | 616E | 296C |
| 0000041760 | 203A | 6143 | 6E6E | 746F | 6320 | 6D6F | 756D | 696E |
| 0000042000 | 6163 | 6574 | 2820 | 6F6E | 6D20 | 646F | 6C75 | 2965 |
| 0000042020 | 002E | 7245 | 6F72 | 2072 | 6928 | 746E | 7265 | 616E |
| 0000042040 | 296C | 203A | 6143 | 6E6E | 746F | 6320 | 6D6F | 756D |
| 0000042060 | 696E | 6163 | 6574 | 2820 | 6F6E | 5020 | 4449 | 2E29 |
| 0000042100 | 4500 | 7272 | 726F | 2820 | 6E69 | 6574 | 6E72 | 6C61 |
| 0000042120 | 3A29 | 4320 | 6E61 | 6F6E | 2074 | 6F63 | 6D6D | 6E75 |
| 0000042140 | 6369 | 7461 | 2065 | 6E28 | 206F | 4954 | 2944 | 002E |
| 0000042160 | 7245 | 6F72 | 2072 | 6928 | 746E | 7265 | 616E | 296C |
| 0000042200 | 203A | 6143 | 6E6E | 746F | 6320 | 6D6F | 756D | 696E |
| 0000042220 | 6163 | 6574 | 2820 | 6F6E | 7320 | 6D65 | 7061 | 6F68 |
| 0000042240 | 6572 | 2E29 | 4500 | 7272 | 726F | 203A | 6143 | 6E6E |
| 0000042260 | 746F | 6320 | 6D6F | 756D | 696E | 6163 | 6574 | 6220 |
| 0000042300 | 6365 | 7561 | 6573 | 7420 | 6F6F | 6D20 | 6E61 | 2079 |
| 0000042320 | 6970 | 6570 | 2073 | 7261 | 2065 | 706F | 6E65 | 6465 |
| 0000042340 | 002E | 7245 | 6F72 | 3A72 | 5420 | 7261 | 6567 | 2074 |
| 0000042360 | 6F6D | 7564 | 656C | 7220 | 6A65 | 6365 | 6574 | 2064 |
| 0000042400 | 6F63 | 6D6D | 6E75 | 6369 | 7461 | 6F69 | 206E | 6572 |
| 0000042420 | 7571 | 7365 | 2E74 | 4500 | 7272 | 726F | 2820 | 6E69 |
| 0000042440 | 6574 | 6E72 | 6C61 | 3A29 | 4420 | 6D75 | 796D | 7220 |
| 0000042460 | 7365 | 6F70 | 736E | 2E65 | 4500 | 7272 | 726F | 203A |
| 0000042500 | 2041 | 6974 | 656D | 6F2D | 7475 | 6820 | 7361 | 6520 |
| 0000042520 | 7078 | 7269 | 6465 | 002E | 7245 | 6F72 | 3A72 | 4120 |
| 0000042540 | 206E | 7265 | 6F72 | 2072 | 6177 | 2073 | 6564 | 6574 |
| 0000042560 | 7463 | 6465 | 6920 | 206E | 2061 | 7274 | 6E61 | 6C73 |
| 0000042600 | 7461 | 6F69 | 206E | 7566 | 636E | 6974 | 6E6F | 002E |
| 0000042620 | 7245 | 6F72 | 2072 | 6928 | 746E | 7265 | 616E | 296C |
| 0000042640 | 203A | 654D | 7373 | 6761 | 2065 | 6177 | 2073 | 6F6C |
| 0000042660 | 7473 | 2820 | 6F63 | 7970 | 6F20 | 2066 | 656D | 7373 |
| 0000042700 | 6761 | 2065 | 6C62 | 636F | 206B | 6166 | 6C69 | 6465 |
| 0000042720 | 2E29 | 4500 | 7272 | 726F | 203A | 654D | 7373 | 6761 |
| 0000042740 | 2065 | 6F6C | 7473 | 2820 | 7571 | 7565 | 2065 | 7369 |
| 0000042760 | 6620 | 6C75 | 296C | 002E | 6157 | 6E72 | 6E69 | 2067 |
| 0000043000 | 6928 | 746E | 7265 | 616E | 296C | 203A | 6F4E | 6D20 |
| 0000043020 | 7365 | 6173 | 6567 | 2073 | 6128 | 6C6C | 7120 | 6575 |
| 0000043040 | 6575 | 2073 | 7261 | 2065 | 6D65 | 7470 | 2979 | 002E |
| 0000043060 | 6157 | 6E72 | 6E69 | 2067 | 6928 | 746E | 7265 | 616E |

THU MAR 14 17:54:36 1991 UI.DLL PAGE 20, LINE 1122

| | | | | | | | | |
|---|---|---|---|---|---|---|---|---|
| 0000043100 | 296C | 203A | 6F4E | 6D20 | 7365 | 6173 | 6567 | 2073 |
| 0000043120 | 7261 | 2065 | 7661 | 6961 | 616C | 6C62 | 2065 | 7128 |
| 0000043140 | 6575 | 6575 | 6920 | 2073 | 6D65 | 7470 | 2979 | 002E |
| 0000043160 | 7245 | 6F72 | 2072 | 6928 | 746E | 7265 | 616E | 296C |
| 0000043200 | 203A | 614C | 7473 | 4920 | 2048 | 7265 | 6F72 | 2072 |
| 0000043220 | 6F63 | 6564 | 002E | 7245 | 6F72 | 3A72 | 4320 | 6E61 |
| 0000043240 | 6F6E | 2074 | 6964 | 7073 | 616C | 2079 | 4427 | 7369 |
| 0000043260 | 6C70 | 7961 | 2027 | 6F66 | 6D72 | 002E | 7245 | 6F72 |
| 0000043300 | 3A72 | 4320 | 6E61 | 6F6E | 2074 | 6964 | 7073 | 616C |
| 0000043320 | 2079 | 6373 | 6572 | 6E65 | 002E | 7245 | 6F72 | 3A72 |
| 0000043340 | 4320 | 6E61 | 6F6E | 2074 | 6C63 | 6165 | 2072 | 6964 |
| 0000043360 | 7073 | 616C | 2E79 | 4500 | 7272 | 726F | 203A | 6143 |
| 0000043400 | 6E6E | 746F | 7520 | 6470 | 7461 | 2065 | 6D69 | 6761 |
| 0000043420 | 2E65 | 4500 | 7272 | 726F | 203A | 6F4E | 7320 | 7263 |
| 0000043440 | 6565 | 736E | 6120 | 6572 | 6620 | 756F | 646E | 002E |
| 0000043460 | 7245 | 6F72 | 3A72 | 4E20 | 206F | 6574 | 7473 | 6E20 |
| 0000043500 | 6D61 | 2065 | 7369 | 7320 | 6570 | 6963 | 6966 | 6465 |
| 0000043520 | 002E | 7245 | 6F72 | 3A72 | 5420 | 7365 | 2074 | 7369 |
| 0000043540 | 6E20 | 746F | 6620 | 756F | 646E | 002E | 7245 | 6F72 |
| 0000043560 | 3A72 | 4E20 | 206F | 6574 | 7473 | 722D | 7365 | 6C75 |
| 0000043600 | 7374 | 6E20 | 6D61 | 2065 | 7369 | 7320 | 6570 | 6963 |
| 0000043620 | 6966 | 6465 | 002E | 7245 | 6F72 | 3A72 | 5420 | 7365 |
| 0000043640 | 2074 | 6552 | 7573 | 746C | 2073 | 616E | 656D | 6920 |
| 0000043660 | 2073 | 6C69 | 656C | 6167 | 2E6C | 4500 | 7272 | 726F |
| 0000043700 | 203A | 6554 | 7473 | 5220 | 7365 | 6C75 | 7374 | 6920 |
| 0000043720 | 2073 | 6F6E | 2074 | 6F66 | 6E75 | 2E64 | 4500 | 7272 |
| 0000043740 | 726F | 203A | 694D | 6D73 | 7461 | 6863 | 7365 | 6120 |
| 0000043760 | 6572 | 6120 | 6176 | 6C69 | 6261 | 656C | 6620 | 726F |
| 0000044000 | 5420 | 7365 | 2074 | 6552 | 7573 | 746C | 2073 | 6E6F |
| 0000044020 | 796C | 002E | 7245 | 6F72 | 3A72 | 5420 | 7365 | 2074 |
| 0000044040 | 6552 | 7573 | 746C | 2073 | 6572 | 6F70 | 7472 | 6920 |
| 0000044060 | 2073 | 6F6E | 2074 | 6F66 | 6E75 | 2E64 | 4500 | 7272 |
| 0000044100 | 726F | 203A | 6554 | 7473 | 5020 | 6F72 | 6563 | 7564 |
| 0000044120 | 6572 | 7220 | 7065 | 726F | 2074 | 7369 | 6E20 | 746F |
| 0000044140 | 6620 | 756F | 646E | 002E | 7245 | 6F72 | 3A72 | 4E20 |
| 0000044160 | 206F | 6373 | 6572 | 6E65 | 6E20 | 6D61 | 2065 | 7369 |
| 0000044200 | 7320 | 6570 | 6963 | 6966 | 6465 | 002E | 7245 | 6F72 |
| 0000044220 | 3A72 | 5320 | 7263 | 6565 | 206E | 7369 | 6E20 | 746F |
| 0000044240 | 6620 | 756F | 646E | 002E | 7245 | 6F72 | 3A72 | 4D20 |
| 0000044260 | 7369 | 616D | 6374 | 2068 | 6373 | 6572 | 6E65 | 6920 |
| 0000044300 | 2073 | 6F6E | 2074 | 6F66 | 6E75 | 2E64 | 4500 | 7272 |
| 0000044320 | 726F | 203A | 6F4E | 6D20 | 7369 | 616D | 6374 | 2068 |
| 0000044340 | 6373 | 6572 | 6E65 | 6520 | 6978 | 7473 | 2E73 | 4500 |
| 0000044360 | 7272 | 726F | 203A | 6353 | 6572 | 6E65 | 6920 | 2073 |
| 0000044400 | 6874 | 2065 | 6966 | 7372 | 2074 | 6E6F | 2E65 | 4500 |
| 0000044420 | 7272 | 726F | 203A | 6353 | 6572 | 6E65 | 6920 | 2073 |
| 0000044440 | 6874 | 2065 | 616C | 7473 | 6F20 | 656E | 002E | 6157 |
| 0000044460 | 6E72 | 6E69 | 3A67 | 5420 | 6D69 | 2065 | 666F | 6D20 |
| 0000044500 | 7369 | 616D | 6374 | 2068 | 6D69 | 6761 | 2065 | 7369 |
| 0000044520 | 6520 | 7261 | 696C | 7265 | 7420 | 6168 | 206E | 7865 |
| 0000044540 | 6570 | 7463 | 6465 | 2820 | 7865 | 6570 | 7463 | 6465 |
| 0000044560 | 6920 | 616D | 6567 | 7720 | 7361 | 7020 | 6F72 | 6162 |
| 0000044600 | 6C62 | 2079 | 7075 | 6164 | 6574 | 2964 | 002E | 7245 |
| 0000044620 | 6F72 | 2072 | 6928 | 746E | 7265 | 616E | 296C | 203A |
| 0000044640 | 614C | 7473 | 5220 | 2056 | 7265 | 6F72 | 2072 | 6F63 |
| 0000044660 | 6564 | 002E | 7245 | 6F72 | 3A72 | 4320 | 6E61 | 6F6E |
| 0000044700 | 2074 | 6964 | 7073 | 616C | 2079 | 4627 | 6C69 | 6574 |
| 0000044720 | 7372 | 2027 | 6F66 | 6D72 | 002E | 7245 | 6F72 | 3A72 |
| 0000044740 | 4320 | 6E61 | 6F6E | 2074 | 6964 | 7073 | 616C | 2079 |

THU MAR 14 17:54:36 1991 UI.DLL PAGE 21, LINE 1181

| | | | | | | | | |
|---|---|---|---|---|---|---|---|---|
| 0000044760 | 6966 | 746C | 7265 | 002E | 7245 | 6F72 | 3A72 | 4320 |
| 0000045000 | 6E61 | 6F6E | 2074 | 6C63 | 6165 | 2072 | 6964 | 7073 |
| 0000045020 | 616C | 2E79 | 4500 | 7272 | 726F | 203A | 6143 | 6E6E |
| 0000045040 | 746F | 6F20 | 6570 | 206E | 6C67 | 626F | 6C61 | 6C20 |
| 0000045060 | 6269 | 6172 | 7972 | 002E | 7245 | 6F72 | 3A72 | 4320 |
| 0000045100 | 6E61 | 6F6E | 2074 | 706F | 6E65 | 7420 | 7365 | 2E74 |
| 0000045120 | 4500 | 7272 | 726F | 203A | 6143 | 6E6E | 746F | 7320 |
| 0000045140 | 7661 | 2065 | 6966 | 746C | 7265 | 6920 | 206E | 6874 |
| 0000045160 | 2065 | 6164 | 6174 | 6220 | 7361 | 2E65 | 4500 | 7272 |
| 0000045200 | 726F | 203A | 6143 | 6E6E | 746F | 7220 | 6D65 | 766F |
| 0000045220 | 2065 | 6966 | 746C | 7265 | 6620 | 6F72 | 206D | 6874 |
| 0000045240 | 2065 | 6164 | 6174 | 6220 | 7361 | 2E65 | 4500 | 7272 |
| 0000045260 | 726F | 203A | 6F4E | 7420 | 7365 | 2074 | 7369 | 6F20 |
| 0000045300 | 6570 | 656E | 2E64 | 4500 | 7272 | 726F | 203A | 6F4E |
| 0000045320 | 6620 | 6C69 | 6574 | 7372 | 6120 | 6572 | 6620 | 756F |
| 0000045340 | 646E | 002E | 7245 | 6F72 | 3A72 | 5420 | 6F6F | 6D20 |
| 0000045360 | 6E61 | 2079 | 6966 | 746C | 7265 | 2073 | 6C61 | 6572 |
| 0000045400 | 6461 | 2079 | 6964 | 7073 | 616C | 6579 | 2E64 | 4500 |
| 0000045420 | 7272 | 726F | 203A | 6F4E | 6E20 | 6D61 | 2065 | 7369 |
| 0000045440 | 7320 | 6570 | 6963 | 6966 | 6465 | 002E | 7245 | 6F72 |
| 0000045460 | 3A72 | 4620 | 6C69 | 6574 | 2072 | 7369 | 7420 | 6568 |
| 0000045500 | 6620 | 7269 | 7473 | 6F20 | 656E | 002E | 7245 | 6F72 |
| 0000045520 | 3A72 | 4620 | 6C69 | 6574 | 2072 | 7369 | 7420 | 6568 |
| 0000045540 | 6C20 | 7361 | 2074 | 6E6F | 2E65 | 4500 | 7272 | 726F |
| 0000045560 | 203A | 6946 | 746C | 7265 | 6920 | 2073 | 6964 | 7073 |
| 0000045600 | 616C | 6579 | 2E64 | 4520 | 6172 | 6573 | 6920 | 2074 |
| 0000045620 | 6966 | 7372 | 2E74 | 4500 | 7272 | 726F | 203A | 6143 |
| 0000045640 | 6E6E | 746F | 6320 | 6572 | 7461 | 2065 | 6966 | 746C |
| 0000045660 | 7265 | 002E | 7245 | 6F72 | 3A72 | 4320 | 6E61 | 6F6E |
| 0000045700 | 2074 | 6261 | 726F | 2074 | 706F | 7265 | 7461 | 6F69 |
| 0000045720 | 2E6E | 4500 | 7272 | 726F | 203A | 6143 | 6E6E | 746F |
| 0000045740 | 6D20 | 7361 | 206B | 6874 | 2065 | 4F41 | 2E49 | 4500 |
| 0000045760 | 7272 | 726F | 203A | 6143 | 6E6E | 746F | 7520 | 6D6E |
| 0000046000 | 7361 | 206B | 6874 | 2065 | 4F41 | 2E49 | 4500 | 7272 |
| 0000046020 | 726F | 203A | 6143 | 6E6E | 746F | 6420 | 7369 | 6C70 |
| 0000046040 | 7961 | 7420 | 6568 | 4120 | 494F | 002E | 7245 | 6F72 |
| 0000046060 | 3A72 | 4109 | 494F | 6920 | 2073 | 6C61 | 6572 | 6461 |
| 0000046100 | 2079 | 6964 | 7073 | 616C | 6579 | 2E64 | 4500 | 7272 |
| 0000046120 | 726F | 203A | 6143 | 6E6E | 746F | 6520 | 6172 | 6573 |
| 0000046140 | 7420 | 6568 | 4120 | 494F | 002E | 7245 | 6F72 | 2072 |
| 0000046160 | 6928 | 746E | 7265 | 616E | 296C | 203A | 614C | 7473 |
| 0000046200 | 4620 | 204C | 7265 | 6F72 | 2072 | 6F63 | 6564 | 002E |
| 0000046220 | 7245 | 6F72 | 3A72 | 4320 | 6E61 | 6F6E | 2074 | 6964 |
| 0000046240 | 7073 | 616C | 2079 | 5227 | 7065 | 726F | 7374 | 2027 |
| 0000046260 | 6F66 | 6D72 | 002E | 7245 | 6F72 | 3A72 | 5420 | 6F6F |
| 0000046300 | 6D20 | 6E61 | 2079 | 6572 | 6F70 | 7472 | 2073 | 7261 |
| 0000046320 | 2065 | 706F | 6E65 | 6465 | 202E | 654E | 2077 | 6572 |
| 0000046340 | 6F70 | 7472 | 7720 | 6C69 | 206C | 6F6E | 2074 | 6562 |
| 0000046360 | 7020 | 6F72 | 7564 | 6563 | 2E64 | 4500 | 7272 | 726F |
| 0000046400 | 203A | 6F4E | 7420 | 7365 | 2074 | 616E | 656D | 6920 |
| 0000046420 | 2073 | 7073 | 6365 | 6669 | 6569 | 2E64 | 4500 | 7272 |
| 0000046440 | 726F | 203A | 6854 | 2065 | 7073 | 6365 | 6669 | 6569 |
| 0000046460 | 2064 | 616E | 656D | 6920 | 2073 | 656E | 7469 | 6568 |
| 0000046500 | 2072 | 2061 | 6554 | 7473 | 5020 | 6F72 | 6563 | 7564 |
| 0000046520 | 6572 | 6E20 | 726F | 5420 | 7365 | 2074 | 6552 | 7573 |
| 0000046540 | 746C | 2E73 | 4500 | 7272 | 726F | 203A | 6554 | 7473 |
| 0000046560 | 5020 | 6F72 | 6563 | 7564 | 6572 | 6920 | 2073 | 6F6E |
| 0000046600 | 2074 | 6F66 | 6E75 | 2E64 | 4500 | 7272 | 726F | 203A |
| 0000046620 | 6554 | 7473 | 5220 | 7365 | 6C75 | 7374 | 6920 | 2073 |

THU MAR 14 17:54:36 1991 UI.DLL PAGE 22, LINE 1240

| | | | | | | | | |
|---|---|---|---|---|---|---|---|---|
| 0000046640 | 6F6E | 2074 | 6F66 | 6E75 | 2E64 | 4500 | 7272 | 726F |
| 0000046660 | 203A | 6552 | 6F70 | 7472 | 6920 | 2073 | 6F6E | 2074 |
| 0000046700 | 6F66 | 6E75 | 2E64 | 4500 | 7272 | 726F | 203A | 6E4F |
| 0000046720 | 796C | 7420 | 6568 | 4520 | 6578 | 7563 | 6974 | 6E6F |
| 0000046740 | 5220 | 7065 | 726F | 2074 | 7369 | 6120 | 6176 | 6C69 |
| 0000046760 | 6261 | 656C | 6620 | 726F | 6120 | 5420 | 7365 | 2074 |
| 0000047000 | 7250 | 636F | 6465 | 7275 | 2E65 | 4500 | 7272 | 726F |
| 0000047020 | 2820 | 6E69 | 6574 | 6E72 | 6C61 | 3A29 | 4320 | 6972 |
| 0000047040 | 6974 | 6163 | 206C | 6573 | 6D67 | 6E65 | 2074 | 6974 |
| 0000047060 | 656D | 756F | 2E74 | 4500 | 7272 | 726F | 203A | 6143 |
| 0000047100 | 6E6E | 746F | 6F20 | 6570 | 206E | 756F | 7074 | 7475 |
| 0000047120 | 6620 | 6C69 | 2065 | 6928 | 6C6C | 6765 | 6C61 | 6E20 |
| 0000047140 | 6D61 | 2065 | 726F | 7020 | 7265 | 696D | 7373 | 6F69 |
| 0000047160 | 206E | 7270 | 626F | 656C | 736D | 0029 | 7245 | 6F72 |
| 0000047200 | 2072 | 6928 | 746E | 7265 | 616E | 296C | 203A | 614C |
| 0000047220 | 7473 | 5020 | 2052 | 7265 | 6F72 | 2072 | 6F63 | 6564 |
| 0000047240 | 002E | 7245 | 6F72 | 3A72 | 4320 | 6E61 | 6F6E | 2074 |
| 0000047260 | 6964 | 7073 | 616C | 2079 | 4C27 | 6165 | 6E72 | 5020 |
| 0000047300 | 696F | 746E | 7265 | 2027 | 6F66 | 6D72 | 4500 | 7272 |
| 0000047320 | 726F | 203A | 6143 | 6E6E | 746F | 6420 | 7369 | 6C70 |
| 0000047340 | 7961 | 7020 | 696F | 746E | 7265 | 002E | 7245 | 6F72 |
| 0000047360 | 3A72 | 4320 | 6E61 | 6F6E | 2074 | 6C63 | 6165 | 2072 |
| 0000047400 | 5553 | 2054 | 6964 | 7073 | 616C | 2E79 | 4500 | 7272 |
| 0000047420 | 726F | 203A | 6143 | 6E6E | 746F | 6F20 | 6570 | 206E |
| 0000047440 | 6F70 | 6E69 | 6574 | 7372 | 6C20 | 6269 | 6172 | 7972 |
| 0000047460 | 002E | 7245 | 6F72 | 3A72 | 4E20 | 206F | 656C | 7261 |
| 0000047500 | 206E | 6573 | 7373 | 6F69 | 206E | 7369 | 6920 | 206E |
| 0000047520 | 7270 | 676F | 6572 | 7373 | 002E | 7245 | 6F72 | 3A72 |
| 0000047540 | 4E20 | 206F | 6F70 | 6E69 | 6574 | 2072 | 616E | 656D |
| 0000047560 | 6920 | 2073 | 7073 | 6365 | 6669 | 6569 | 2E64 | 4500 |
| 0000047600 | 7272 | 726F | 203A | 6143 | 6E6E | 746F | 6320 | 6572 |
| 0000047620 | 7461 | 2065 | 656E | 2077 | 6F70 | 6E69 | 6574 | 2E72 |
| 0000047640 | 4500 | 7272 | 726F | 203A | 6143 | 6E6E | 746F | 7320 |
| 0000047660 | 7661 | 2065 | 6F70 | 6E69 | 6574 | 2E72 | 4500 | 7272 |
| 0000047700 | 726F | 203A | 6143 | 6E6E | 746F | 6420 | 6C65 | 7465 |
| 0000047720 | 2065 | 6F70 | 6E69 | 6574 | 2E72 | 4500 | 7272 | 726F |
| 0000047740 | 203A | 6143 | 6E6E | 746F | 6120 | 6F62 | 7472 | 7420 |
| 0000047760 | 6568 | 6F20 | 6570 | 6172 | 6974 | 6E6F | 002E | 7245 |
| 0000050000 | 6F72 | 3A72 | 4920 | 6C6C | 6765 | 6C61 | 7220 | 7165 |
| 0000050020 | 6575 | 7473 | 6620 | 726F | 6120 | 6E20 | 7765 | 7020 |
| 0000050040 | 696F | 746E | 7265 | 002E | 7245 | 6F72 | 3A72 | 5020 |
| 0000050060 | 696F | 746E | 7265 | 7320 | 6F68 | 6C75 | 2064 | 6562 |
| 0000050100 | 6420 | 7369 | 6C70 | 7961 | 6465 | 002E | 7245 | 6F72 |
| 0000050120 | 2072 | 6928 | 746E | 7265 | 616E | 296C | 203A | 614C |
| 0000050140 | 7473 | 4C20 | 2049 | 7265 | 6F72 | 2072 | 6F63 | 6564 |
| 0000050160 | 002E | 0042 | 1D38 | 0047 | 1D3C | 004C | 1D40 | 0076 |
| 0000050200 | 1D44 | 0086 | 1D48 | 00B2 | 1D4C | 00DC | 1D50 | 0108 |
| 0000050220 | 1D54 | 0141 | 1D58 | 017B | 1D5C | 019C | 1D60 | 01B5 |
| 0000050240 | 1D64 | 01CF | 1D68 | 01EA | 1D6C | 0211 | 1D70 | 0239 |
| 0000050260 | 1D74 | 0257 | 1D78 | 026C | 1D7C | 028A | 1D80 | 02A6 |
| 0000050300 | 1D84 | 02C4 | 1D88 | 02E4 | 1D8C | 02FE | 1D90 | 0324 |
| 0000050320 | 1D94 | 034D | 1D98 | 0376 | 1D9C | 0390 | 1DA0 | 03B3 |
| 0000050340 | 1DA4 | 03D1 | 1DA8 | 03EF | 1DAC | 040E | 1DB0 | 0432 |
| 0000050360 | 1DB4 | 0456 | 1DB8 | 0477 | 1DBC | 04A7 | 1DC0 | 04CC |
| 0000050400 | 1DC4 | 04EF | 1DC8 | 050B | 1DCC | 0524 | 1DD0 | 053E |
| 0000050420 | 1DD4 | 055E | 1DD8 | 0585 | 1DDC | 059F | 1DE0 | 05C5 |
| 0000050440 | 1DE4 | 05DE | 1DE8 | 05FE | 1DEC | 061A | 1DF0 | 0635 |
| 0000050460 | 1DF4 | 0652 | 1DF8 | 066F | 1DFC | 068A | 1E00 | 06E4 |
| 0000050500 | 1E04 | 0700 | 1E08 | 0717 | 1E0C | 072F | 1E10 | 0742 |

THU MAR 14 17:54:36 1991 UI.DLL PAGE 23, LINE 1299

| | | | | | | | | |
|---|---|---|---|---|---|---|---|---|
| 0000050520 | 1E14 | 0753 | 1E18 | 0767 | 1E1C | 077A | 1E20 | 07A9 |
| 0000050540 | 1E24 | 07E2 | 1E28 | 0806 | 1E2C | 082E | 1E30 | 0853 |
| 0000050560 | 1E34 | 0882 | 1E38 | 08D4 | 1E3C | 08F0 | 1E40 | 090B |
| 0000050600 | 1E44 | 091D | 1E48 | 0931 | 1E4C | 0945 | 1E50 | 095B |
| 0000050620 | 1E54 | 096E | 1E58 | 0982 | 1E5C | 09A0 | 1E60 | 09B4 |
| 0000050640 | 1E64 | 09E5 | 1E68 | 09F8 | 1E6C | 0A14 | 1E70 | 0A2F |
| 0000050660 | 1E74 | 0A45 | 1E78 | 0A5B | 1E7C | 0A6E | 1E80 | 0A85 |
| 0000050700 | 1E84 | 0AA4 | 1E88 | 0ABD | 1E8C | 0AD1 | 1E90 | 0AE5 |
| 0000050720 | 1E94 | 0B2F | 1E98 | 0B48 | 1E9C | 0B60 | 1EA0 | 0B79 |
| 0000050740 | 1EA4 | 0B90 | 1EA8 | 0BCD | 1EAC | 0BEB | 1EB0 | 0C09 |
| 0000050760 | 1EB4 | 0C18 | 1EB8 | 0C4C | 1EBC | 0C80 | 1EC0 | 0C99 |
| 0000051000 | 1EC4 | 0CD7 | 1EC8 | 0CFE | 1ECC | 0D13 | 1ED0 | 0D3A |
| 0000051020 | 1ED4 | 0D4E | 1ED8 | 0D62 | 1EDC | 0D76 | 1EE0 | 0D8D |
| 0000051040 | 1EE4 | 0DA1 | 1EE8 | 0DB6 | 1EEC | 0DE0 | 1EF0 | 0DF4 |
| 0000051060 | 1EF4 | 0E08 | 1EF8 | 0E23 | 1EFC | 0E38 | 1F00 | 0E82 |
| 0000051100 | 1F04 | 0EAC | 1F08 | 0EC3 | 1F0C | 0EDF | 1F10 | 0EF5 |
| 0000051120 | 1F14 | 0F03 | 1F18 | 0F3D | 1F1C | 0F71 | 1F20 | 0F9B |
| 0000051140 | 1F24 | 0FDF | 1F28 | 1021 | 1F2C | 104A | 1F30 | 1070 |
| 0000051160 | 1F34 | 10A0 | 1F38 | 10D2 | 1F3C | 1101 | 1F40 | 1130 |
| 0000051200 | 1F44 | 1165 | 1F48 | 11A2 | 1F4C | 11D7 | 1F50 | 11F9 |
| 0000051220 | 1F54 | 1218 | 1F58 | 1250 | 1F5C | 1293 | 1F60 | 12B8 |
| 0000051240 | 1F64 | 12F0 | 1F68 | 1330 | 1F6C | 1356 | 1F70 | 137C |
| 0000051260 | 1F74 | 139A | 1F78 | 13B7 | 1F7C | 13D3 | 1F80 | 13F0 |
| 0000051300 | 1F84 | 1412 | FFFF | 142C | 1F8C | 1456 | 1F90 | 147B |
| 0000051320 | 1F94 | 149D | 1F98 | 14D4 | 1F9C | 14FD | 1FA0 | 1528 |
| 0000051340 | 1FA4 | 154C | 1FA8 | 1568 | 1FAC | 158D | 1FB0 | 15AF |
| 0000051360 | 1FB4 | 15CF | 1FB8 | 15EE | 1FBC | 164E | 1FC0 | 1674 |
| 0000051400 | 1FC4 | 169A | 1FC8 | 16B8 | 1FCC | 16D5 | 1FD0 | 16F8 |
| 0000051420 | 1FD4 | 1711 | 1FD8 | 173D | 1FDC | 176D | 1FE0 | 1787 |
| 0000051440 | 1FE4 | 17A4 | 1FE8 | 17CF | 1FEC | 17EC | 1FF0 | 180C |
| 0000051460 | 1FF4 | 182B | 1FF8 | 1857 | 1FFC | 1874 | 2000 | 1893 |
| 0000051500 | 2004 | 18AF | 2008 | 18CD | 200C | 18EC | 2010 | 190D |
| 0000051520 | 2014 | 192A | 2018 | 1950 | 201C | 1976 | 2020 | 19BB |
| 0000051540 | 2024 | 19DD | 2028 | 1A25 | 202C | 1A49 | 2030 | 1A6B |
| 0000051560 | 2034 | 1A87 | 2038 | 1ACB | 203C | 1AF7 | 2040 | 1B3C |
| 0000051600 | 2044 | 1B62 | 2048 | 1B8D | 204C | 1BAC | 2050 | 1BCD |
| 0000051620 | 2054 | 1BF2 | 2058 | 1C1A | 205C | 1C3F | 2060 | 1C61 |
| 0000051640 | 2064 | 1C7D | 2068 | 1C9B | 206C | 1CBE | 2070 | 1CE8 |
| 0000051660 | 2074 | 1D0C | 1D34 | 0000 | 0001 | 0000 | 0001 | 0000 |
| 0000051700 | 0001 | 0000 | 0001 | 0000 | 5F47 | 5745 | 545F | 4700 |
| 0000051720 | 455F | 5F57 | 0054 | 6168 | 5F62 | 0073 | 5F75 | 6567 |
| 0000051740 | 5F74 | 6168 | 0062 | 3154 | 3332 | 4D5F | 4753 | 415F |
| 0000051760 | 414C | 4D52 | 425F | 4C45 | 004C | 5F47 | 5745 | 545F |
| 0000052000 | 4700 | 455F | 5F57 | 0054 | 5F75 | 6F70 | 7473 | 6D5F |
| 0000052020 | 6773 | 4700 | 455F | 5F57 | 0054 | 5F47 | 5745 | 545F |
| 0000052040 | 6F00 | 5F70 | 6F63 | 6564 | 0000 | 5F75 | 7270 | 7065 |
| 0000052060 | 7261 | 5F65 | 6869 | 6D5F | 6773 | 4700 | 455F | 5F57 |
| 0000052100 | 0054 | 5F47 | 5745 | 545F | 6F00 | 5F70 | 6F63 | 6564 |
| 0000052120 | 3D20 | 2520 | 2C64 | 7020 | 7261 | 6D61 | 3D20 | 2520 |
| 0000052140 | 0064 | 5F62 | 7261 | 7367 | 0000 | 5F75 | 7270 | 7065 |
| 0000052160 | 7261 | 5F65 | 6869 | 6D5F | 6773 | 705F | 7261 | 4700 |
| 0000052200 | 455F | 5F57 | 0054 | 5F47 | 5745 | 545F | 0000 | 5F75 |
| 0000052220 | 7270 | 7065 | 7261 | 5F65 | 6869 | 6D5F | 6773 | 625F |
| 0000052240 | 6675 | 4700 | 455F | 5F57 | 0054 | 5F47 | 5745 | 545F |
| 0000052260 | 6F00 | 5F70 | 6F63 | 6564 | 3D20 | 2520 | 2C64 | 7020 |
| 0000052300 | 7261 | 6D61 | 3D20 | 2520 | 0073 | 5F62 | 7261 | 7367 |
| 0000052320 | 0000 | 5F75 | 7270 | 7065 | 7261 | 5F65 | 6869 | 6D5F |
| 0000052340 | 6773 | 735F | 7274 | 2500 | 7333 | 6D2E | 6773 | 5400 |
| 0000052360 | 7365 | 6974 | 676E | 3120 | 3332 | 5400 | 7365 | 6974 |

THU MAR 14 17:54:36 1991 UI.DLL PAGE 24, LINE 1358

```
0000052400  676E  3120  3332  4500  7272  726F  6320  646F
0000052420  2065  6425  4700  455F  5F57  0054  5F47  5745
0000052440  545F  0000  5F75  6573  5F74  6177  7469  695F
0000052460  6F63  006E  0000  0000  0000  0006  0000  2A60
0000052500  2A5F  0000  0005  0000  0000  0000  0000  0000
0000052520  0000  0000  0000  435F  465F  4C49  5F45  4E49
0000052540  4F46  003D  0001  FFFF  0000  0000  0000  0000
0000052560  0000  0000  0000  0000  0000  0001  8101  8181
0000052600  0000  0000  0000  0000  0000  0000  0000  0000
*
0000053160  0000  0000  0000  0000  0000  0000  0A00  0A0A
0000053200  0A0A  0A0A  0A0A  0A0A  0A0A  0A0A  0A0A  0A0A
*
0000053560  0A0A  0A0A  0A0A  0A0A  0A0A  0A0A  000A  0000
0000053600  0000  0000  0000  0000  0000  0000  0000  FF00
0000053620  00FF  0000  0000  FFFF  FFFF  0000  0000  2464
0000053640  0000  0000  28C6  0001  0000  0000  0000  0000
0000053660  0000  0102  0000  0000  0000  0000  0000  0202
0000053700  0000  0000  0000  0000  0000  0000  0000  0000
*
0000054560  0000  0000  0000  0000  0000  0000  0001  0200
0000054600  0000  0000  0000  0000  0000  0000  0000  0000
*
0000055520  0000  0000  0000  0000  0000  0000  2630  1F88
0000055540  0006  0600  0100  0000  0010  0603  0600  1002
0000055560  4504  4545  0505  0505  3505  0030  0050  0000
0000055600  2000  3020  5850  0807  3000  3030  5057  0007
0000055620  2000  0020  0000  0000  6008  6060  6060  0060
0000055640  7000  7870  7878  0878  0807  0000  0007  0808
0000055660  0008  0800  0800  0000  2808  756E  6C6C  0629
0000055700  0000  0000  0000  0000  0000  0000  0000  0003
0000055720  2000  1B50  28C4  1B50  2894  1B50  2898  1B50
0000055740  289C  1B50  28A0  1B50  28A4  0000  0000  0101
0000055760  0000  0003  0000  0000  0000  0000  0000  0000
0000056000  0000  1F82  FFFF  FFFF  FFFF  FFFF  3C3C  4D4E
0000056020  4753  3E3E  0000  3652  3030  0D30  2D0A  7320
0000056040  6174  6B63  6F20  6576  6672  6F6C  0D77  000A
0000056060  0003  3652  3030  0D33  2D0A  6920  746E  6765
0000056100  7265  6420  7669  6469  2065  7962  3020  0A0D
0000056120  0800  5200  3036  3830  0A0D  202D  6F6E  2074
0000056140  6E65  756F  6867  7320  6170  6563  6620  726F
0000056160  6120  6772  6D75  6E65  7374  0A0D  0900  5200
0000056200  3036  3930  0A0D  202D  6F6E  2074  6E65  756F
0000056220  6867  7320  6170  6563  6620  726F  6520  766E
0000056240  7269  6E6F  656D  746E  0A0D  FC00  0D00  000A
0000056260  00FF  7572  2D6E  6974  656D  6520  7272  726F
0000056300  0020  0002  3652  3030  0D32  2D0A  6620  6F6C
0000056320  7461  6E69  2D67  6F70  6E69  2074  7573  7070
0000056340  726F  2074  6F6E  2074  6F6C  6461  6465  0A0D
0000056360  1100  5200  3036  3731  0A0D  202D  6E75  7865
0000056400  6570  7463  6465  6D20  6C75  6974  6874  6572
0000056420  6461  6C20  636F  206B  7265  6F72  0D72  000A
0000056440  0010  3652  3130  0D36  2D0A  6E20  746F  6520
0000056460  6F6E  6775  2068  7073  6361  2065  6F66  2072
0000056500  6874  6572  6461  6420  7461  0D61  000A  FFFF
0000056520  05FF  0200  A800  0128  0000  0200  5E00  0524
0000056540  0000  0200  1E00  0628  0000  0200  C802  0428
0000056560  1B00  0200  CA02  0428  2900  4E00  3042  C532
0000056600  003C  0100  0000  9B00  0018  0000  0100  1700
```

THU MAR 14 17:54:36 1991 UI.DLL PAGE 25, LINE 1417

| | | | | | | | | |
|---|---|---|---|---|---|---|---|---|
| 0000056620 | 745C | 3231 | 5C33 | 7061 | 5C70 | 6975 | 6F5C | 6A62 |
| 0000056640 | 755C | 2E69 | 626F | 016A | AC00 | D118 | 0000 | 0100 |
| 0000056660 | 0100 | 0B00 | 6C64 | 5C6C | 7363 | 2E75 | 7361 | 016D |
| 0000056700 | 7E00 | AF19 | 0001 | 0100 | 0100 | 0E00 | 6C64 | 5C6C |
| 0000056720 | 7363 | 6475 | 7461 | 612E | 6D73 | 0001 | 1B2E | 0022 |
| 0000056740 | 0000 | 0001 | 0001 | 6F0F | 3273 | 635C | 7472 | 6D30 |
| 0000056760 | 6773 | 612E | 6D73 | 0001 | 1B50 | 0006 | 0000 | 0001 |
| 0000057000 | 0001 | 630A | 7472 | 6630 | 2E70 | 7361 | 016D | 5600 |
| 0000057020 | 1A1B | 0000 | 0100 | 0100 | 0A00 | 6863 | 736B | 6B74 |
| 0000057040 | 612E | 6D73 | 0001 | 1B70 | 0108 | 0000 | 0001 | 0001 |
| 0000057060 | 640D | 6C6C | 735C | 7465 | 6E65 | 7076 | 632E | 0001 |
| 0000057100 | 1C78 | 0065 | 0000 | 0001 | 0001 | 6F0F | 3273 | 6E5C |
| 0000057120 | 736D | 6867 | 7264 | 612E | 6D73 | 0001 | 1CDE | 00C0 |
| 0000057140 | 0000 | 0001 | 0001 | 6F0E | 3273 | 645C | 736F | 6572 |
| 0000057160 | 2E74 | 7361 | 006D | 0000 | 0000 | 0000 | 0100 | 0000 |
| 0000057200 | 0B00 | 635F | 6C66 | 7375 | 2E68 | 7361 | 006D | 0000 |
| 0000057220 | 0000 | 0000 | 0100 | 0000 | 0700 | 665F | 6C69 | 2E65 |
| 0000057240 | 0163 | 9E00 | E51D | 0000 | 0100 | 0100 | 0B00 | 665F |
| 0000057260 | 736C | 7562 | 2E66 | 7361 | 016D | 8400 | 4B1E | 0000 |
| 0000057300 | 0100 | 0100 | 0B00 | 675F | 7465 | 7562 | 2E66 | 7361 |
| 0000057320 | 016D | D000 | 2E1E | 0001 | D100 | 0100 | 0800 | 6666 |
| 0000057340 | 756C | 6873 | 632E | 0001 | 1FFE | 04FA | 0000 | 0001 |
| 0000057360 | 0001 | 6F0A | 7475 | 7570 | 2E74 | 7361 | 016D | F800 |
| 0000057400 | 7724 | 0000 | 0100 | 0100 | 0D00 | 736F | 5C32 | 736C |
| 0000057420 | 6565 | 2E6B | 7361 | 016D | 7000 | DD25 | 0001 | 0100 |
| 0000057440 | 0100 | 0900 | 7277 | 7469 | 2E65 | 7361 | 016D | 4E00 |
| 0000057460 | 0A27 | 0000 | 0100 | 0100 | 0A00 | 616D | 6C6C | 636F |
| 0000057500 | 612E | 6D73 | 0001 | 2758 | 000A | 0000 | 0001 | 0001 |
| 0000057520 | 6608 | 6572 | 2E65 | 7361 | 016D | 6200 | AF27 | 0000 |
| 0000057540 | 0100 | 0100 | 0B00 | 6D66 | 6C61 | 6F6C | 2E63 | 7361 |
| 0000057560 | 006D | 0000 | 0000 | 0000 | 0100 | 0000 | 0900 | 6466 |
| 0000057600 | 7461 | 2E61 | 7361 | 016D | 1200 | 3428 | 0000 | 0100 |
| 0000057620 | 0100 | 0B00 | 6E69 | 7469 | 6573 | 2E67 | 7361 | 016D |
| 0000057640 | 4600 | 3628 | 0000 | 0100 | 0100 | 0B00 | 696C | 6B6E |
| 0000057660 | 6573 | 2E67 | 7361 | 016D | 7C00 | 7C28 | 0000 | 0100 |
| 0000057700 | 0100 | 0C00 | 6573 | 7261 | 6863 | 6773 | 612E | 6D73 |
| 0000057720 | 0001 | 28F8 | 00E2 | 0000 | 0001 | 0001 | 670B | 6F72 |
| 0000057740 | 7377 | 6765 | 612E | 6D73 | 0001 | 29DA | 0031 | 0000 |
| 0000057760 | 0001 | 0001 | 6E0A | 7765 | 6573 | 2E67 | 7361 | 016D |
| 0000060000 | 0C00 | 362A | 0000 | 0100 | 0100 | 0A00 | 7473 | 6372 |
| 0000060020 | 7970 | 612E | 6D73 | 0001 | 2A42 | 003B | 0000 | 0001 |
| 0000060040 | 0001 | 730B | 7274 | 636E | 706D | 612E | 6D73 | 0000 |
| 0000060060 | 0000 | 0000 | 0000 | 0001 | 0000 | 630C | 696D | 6373 |
| 0000060100 | 6164 | 2E74 | 7361 | 016D | 7E00 | BA2A | 0000 | 0100 |
| 0000060120 | 0100 | 0D00 | 736F | 5C32 | 6C6D | 636F | 2E6B | 7361 |
| 0000060140 | 016D | 3800 | 7A2B | 0000 | 0100 | 0100 | 1000 | 6C64 |
| 0000060160 | 5C6C | 6974 | 7464 | 6261 | 656C | 612E | 6D73 | 0001 |
| 0000060200 | 2BB2 | 0074 | 0000 | 0001 | 0001 | 7309 | 7270 | 6E69 |
| 0000060220 | 6674 | 632E | 0001 | 2C26 | 002E | 0000 | 0001 | 0001 |
| 0000060240 | 630A | 6C61 | 6F6C | 2E63 | 7361 | 026D | 0000 | 2C00 |
| 0000060260 | 0000 | 0200 | 0100 | 0600 | 736D | 7367 | 6765 | 0200 |
| 0000060300 | 0005 | 00C0 | 5F06 | 6168 | 5F62 | D673 | 061D | 6D00 |
| 0000060320 | 0C06 | 635F | 7672 | 655F | 7272 | 735F | 7274 | 1060 |
| 0000060340 | 0001 | 0732 | 5509 | 445F | 5349 | 5F50 | 424D | 1FBE |
| 0000060360 | 0006 | 0687 | 5F0B | 6C66 | 655F | 7272 | 735F | 7274 |
| 0000060400 | 118C | 0001 | 0739 | 5506 | 4C5F | 5349 | BB54 | 0111 |
| 0000060420 | 3B00 | 0607 | 5F55 | 4F46 | 4D52 | 11E5 | 0001 | 073D |
| 0000060440 | 550A | 535F | 5445 | 485F | 4E57 | 1944 | 0112 | 3F00 |
| 0000060460 | 1007 | 5F55 | 4553 | 5F54 | 4F4C | 4143 | 5F4C | 5748 |

THU MAR 14 17:54:36 1991 UI.DLL PAGE 26, LINE 1476

| | | | | | | | | |
|---|---|---|---|---|---|---|---|---|
| 0000060500 | 444E | 0000 | 0001 | 06FF | 5506 | 495F | 494E | 0654 |
| 0000060520 | 061F | 7A00 | 0C06 | 745F | 6C73 | 655F | 7272 | 735F |
| 0000060540 | 7274 | 0055 | 0001 | 0701 | 5509 | 475F | 5445 | 485F |
| 0000060560 | 4241 | 124D | 0001 | 0741 | 5513 | 575F | 4E49 | 4D5F |
| 0000060600 | 5345 | 4153 | 4547 | 535F | 5954 | 454C | 1F12 | 0006 |
| 0000060620 | 067B | 5F0E | 656D | 6964 | 5F74 | 7265 | 5F72 | 7473 |
| 0000060640 | 4B72 | 0113 | 4500 | 0D07 | 5F55 | 4957 | 5F4E | 454D |
| 0000060660 | 5353 | 4741 | FB45 | 0101 | 0B00 | 0C07 | 5F55 | 4553 |
| 0000060700 | 5F54 | 4F43 | 464E | 4749 | 1F16 | 0006 | 066D | 5F0B |
| 0000060720 | 6869 | 655F | 7272 | 735F | 7274 | 1E2A | 0006 | 066F |
| 0000060740 | 5F0C | 7364 | 5F6B | 7265 | 5F72 | 7473 | D272 | 0102 |
| 0000060760 | 0E00 | 0D07 | 5F55 | 4553 | 5F54 | 5754 | 485F | 4F4D |
| 0000061000 | 8944 | 0113 | 4700 | 0F07 | 5F55 | 454D | 5353 | 4741 |
| 0000061020 | 5F45 | 5453 | 4C59 | 1645 | 0620 | 8A00 | 0B06 | 705F |
| 0000061040 | 5F72 | 7265 | 5F72 | 7473 | 3A72 | 061D | 6400 | 0A06 |
| 0000061060 | 675F | 655F | 7272 | 735F | 7274 | 02FF | 0001 | 0710 |
| 0000061100 | 550D | 475F | 5445 | 545F | 5F57 | 4D48 | 444F | 13C9 |
| 0000061120 | 0001 | 0749 | 5509 | 4D5F | 5345 | 4153 | 4547 | 0345 |
| 0000061140 | 0001 | 0712 | 550D | 535F | 5445 | 545F | 5F57 | 5748 |
| 0000061160 | 444E | 1403 | 0001 | 074B | 550D | 475F | 5445 | 455F |
| 0000061200 | 5252 | 535F | 5254 | 1E3E | 0006 | 0678 | 5F0B | 6264 |
| 0000061220 | 655F | 7272 | 735F | 7274 | 0379 | 0001 | 0714 | 550D |
| 0000061240 | 475F | 5445 | 545F | 5F57 | 5748 | 444E | 03C9 | 0001 |
| 0000061260 | 0715 | 5508 | 465F | 4E49 | 5349 | F648 | 0115 | 4E00 |
| 0000061300 | 0E07 | 5F55 | 4957 | 5F4E | 4944 | 5053 | 455F | 5252 |
| 0000061320 | 0411 | 0001 | 0717 | 550E | 475F | 5445 | 4E5F | 5845 |
| 0000061340 | 5F54 | 534D | 3247 | 0116 | 5000 | 0A07 | 5F55 | 4944 |
| 0000061360 | 5053 | 455F | 5252 | 0489 | 0001 | 0719 | 5509 | 475F |
| 0000061400 | 5445 | 4D5F | 4753 | 1669 | 0001 | 0752 | 5510 | 445F |
| 0000061420 | 5349 | 5F50 | 4F4C | 4143 | 5F4C | 5245 | 4252 | 0620 |
| 0000061440 | 8B00 | 0B06 | 6C5F | 5F69 | 7265 | 5F72 | 7473 | A072 |
| 0000061460 | 0116 | 5400 | 0907 | 5F55 | 5245 | 5F52 | 534D | DE47 |
| 0000061500 | 0104 | 1B00 | 0A07 | 5F55 | 4F50 | 5453 | 4D5F | 4753 |
| 0000061520 | 0645 | 0001 | 071E | 550A | 575F | 4941 | 5F54 | 534D |
| 0000061540 | D847 | 0116 | 5600 | 0F07 | 5F55 | 4553 | 5F54 | 4157 |
| 0000061560 | 5449 | 495F | 4F43 | 844E | 0106 | 1F00 | 1107 | 5F55 |
| 0000061600 | 4547 | 5F54 | 5551 | 5545 | 5F45 | 5453 | 5441 | 7345 |
| 0000061620 | 0118 | 5800 | 0F07 | 5F55 | 4547 | 5F54 | 4157 | 5449 |
| 0000061640 | 495F | 4F43 | CF4E | 0106 | 2100 | 0B07 | 5F55 | 5254 |
| 0000061660 | 4E41 | 5F53 | 534D | 6A47 | 061F | 6D00 | 0B06 | 725F |
| 0000061700 | 5F76 | 7265 | 5F72 | 7473 | 2B72 | 0107 | 2300 | 1007 |
| 0000061720 | 5F55 | 5250 | 5045 | 5241 | 5F45 | 4849 | 4D5F | 4753 |
| 0000061740 | 095E | 0001 | 0727 | 550C | 535F | 5445 | 495F | 5F48 |
| 0000061760 | 534D | 9547 | 0109 | 2900 | 1407 | 5F55 | 5250 | 5045 |
| 0000062000 | 5241 | 5F45 | 4849 | 4D5F | 4753 | 505F | 5241 | 0BDD |
| 0000062020 | 0001 | 072C | 5514 | 505F | 4552 | 4150 | 4552 | 495F |
| 0000062040 | 5F48 | 534D | 5F47 | 5542 | DC46 | 010D | 2E00 | 1407 |
| 0000062060 | 5F55 | 5250 | 5045 | 5241 | 5F45 | 4849 | 4D5F | 4753 |
| 0000062100 | 535F | 5254 | 102E | 0001 | 0730 | 5506 | 465F | 4552 |
| 0000062120 | 1245 | 062A | 0000 | 0600 | 655F | 6164 | 6174 | 2A60 |
| 0000062140 | 0006 | 0000 | 5F04 | 6E65 | AC64 | 0118 | 0000 | 0600 |
| 0000062160 | 5F43 | 4E49 | 5449 | 2202 | 0006 | 0000 | 5F0C | 6E5F |
| 0000062200 | 6568 | 7061 | 645F | 7365 | 6063 | 062A | 0000 | 0C00 |
| 0000062220 | 735F | 6174 | 6B63 | 6F62 | 7474 | 6D6F | 2228 | 0006 |
| 0000062240 | 0000 | 5F0C | 5F5F | 4461 | 7342 | 7077 | 6C66 | F467 |
| 0000062260 | 0621 | 0000 | 0800 | 5F5F | 6361 | 646D | 6E6C | 2226 |
| 0000062300 | 0006 | 0000 | 5F08 | 615F | 6573 | 6867 | 2469 | 0622 |
| 0000062320 | 0000 | 0800 | 5F5F | 7361 | 6765 | 6F6C | 2200 | 0006 |
| 0000062340 | 0000 | 5F08 | 615F | 6973 | 647A | FE73 | 0621 | 0000 |

THU MAR 14 17:54:36 1991 UI.DLL PAGE 27, LINE 1535

| | | | | | | | | |
|---|---|---|---|---|---|---|---|---|
| 0000062360 | 0800 | 5F5F | 7461 | 706F | 7073 | 2216 | 0006 | 0000 |
| 0000062400 | 5F09 | 615F | 6663 | 6E69 | 6F66 | D6D6 | 0000 | 0001 |
| 0000062420 | 5F09 | 615F | 4244 | 7375 | 6465 | 21F6 | 0006 | 0000 |
| 0000062440 | 5F09 | 615F | 6E65 | 7376 | 6765 | 21FA | 0006 | 0000 |
| 0000062460 | 5F0A | 745F | 7268 | 6165 | 6964 | F864 | 0621 | 0000 |
| 0000062500 | 0A00 | 5F5F | 6967 | 666E | 736F | 6765 | D6D6 | 0000 |
| 0000062520 | 0001 | 5F0A | 615F | 4244 | 6F64 | 7773 | FC70 | 0621 |
| 0000062540 | 0000 | 0A00 | 5F5F | 696C | 666E | 736F | 6765 | 9876 |
| 0000062560 | 0000 | 0001 | 5F0A | 615F | 7263 | 7574 | 6573 | 2A64 |
| 0000062600 | 0622 | 0000 | 0B00 | 5F5F | 615F | 4244 | 7472 | 7265 |
| 0000062620 | 1D72 | 0119 | 0000 | 0B00 | 5F5F | 6D61 | 6773 | 655F |
| 0000062640 | 6978 | 3874 | 0622 | 0000 | 0B00 | 5F5F | 736F | 6576 |
| 0000062660 | 7372 | 6F69 | 376E | 011A | 0000 | 0600 | 5F5F | 7865 |
| 0000062700 | 7469 | 1AE9 | 00D1 | 0000 | 5F0C | 755F | 6C6E | 636F |
| 0000062720 | 656B | 6978 | 4B74 | 0624 | 0000 | 0700 | 5F5F | 6863 |
| 0000062740 | 6C69 | 3B64 | 0622 | 0000 | 0700 | 5F5F | 666E | 6C69 |
| 0000062760 | 7E65 | 0119 | 0000 | 0700 | 5F5F | 6963 | 696E | 3D74 |
| 0000063000 | 0624 | 0000 | 0700 | 5F5F | 615F | 6772 | 3F63 | 011A |
| 0000063020 | 0000 | 0700 | 5F5F | 6563 | 6978 | 3874 | 0622 | 0000 |
| 0000063040 | 0D00 | 5F5F | 6F64 | 7673 | 7265 | 616D | 6F6A | 3F72 |
| 0000063060 | 0624 | 0000 | 0700 | 5F5F | 615F | 6772 | 3976 | 0622 |
| 0000063100 | 0000 | 0D00 | 5F5F | 6F64 | 7673 | 7265 | 696D | 6F6E |
| 0000063120 | 3D72 | 0623 | 0000 | 080D | 5F5F | 6970 | 6570 | 6863 |
| 0000063140 | 2443 | 0006 | 0000 | 5F08 | 6E65 | 6976 | 6F72 | 3D6E |
| 0000063160 | 0622 | 0000 | 0800 | 5F5F | 736F | 6966 | 656C | 223A |
| 0000063200 | 0006 | 0000 | 5F08 | 6F5F | 6D73 | 646F | D865 | 0119 |
| 0000063220 | 0000 | 0800 | 5F5F | 6E69 | 7469 | 7066 | 28B6 | 0006 |
| 0000063240 | 0000 | 5F08 | 665F | 6970 | 696E | 0C74 | 011B | 0000 |
| 0000063260 | 0800 | 5F5F | 6574 | 6D72 | 7066 | 2447 | 0006 | 0000 |
| 0000063300 | 5F08 | 705F | 6D67 | 7470 | 4972 | 011A | 0000 | 0800 |
| 0000063320 | 5F5F | 5F63 | 7865 | 7469 | 223A | 0006 | 0000 | 5F09 |
| 0000063340 | 645F | 736F | 6F6D | 6564 | 2238 | 0006 | 0000 | 5F09 |
| 0000063360 | 6F5F | 6D73 | 6A61 | 726F | 2239 | 0006 | 0000 | 5F09 |
| 0000063400 | 6F5F | 6D73 | 6E69 | 726F | 244D | 0006 | 0000 | 5F0A |
| 0000063420 | 655F | 6978 | 6474 | 6E6F | 9F65 | 011A | 0000 | 0A00 |
| 0000063440 | 5F5F | 6F6C | 6B63 | 7865 | 7469 | 2236 | 0006 | 0000 |
| 0000063460 | 5F0A | 755F | 616D | 6B73 | 6176 | 0C6C | 011B | 0000 |
| 0000063500 | 0A00 | 5F5F | 7463 | 7265 | 736D | 6275 | 244F | 0006 |
| 0000063520 | 0000 | 5F0A | 655F | 6978 | 5F74 | 6974 | 2C64 | 0622 |
| 0000063540 | 0000 | 0500 | 5F5F | 6166 | 3063 | 011A | 0000 | 0500 |
| 0000063560 | 655F | 6978 | 2E74 | 011B | 0000 | 0E00 | 5F5F | 4646 |
| 0000063600 | 4D5F | 4753 | 4142 | 4E4E | 5245 | 2452 | 0006 | 0000 |
| 0000063620 | 5F09 | 615F | 6264 | 6D67 | 6773 | 9876 | 0000 | 0001 |
| 0000063640 | 5F09 | 615F | 7263 | 6D74 | 6773 | 1B50 | 0001 | 0000 |
| 0000063660 | 5F08 | 665F | 7470 | 6172 | 5670 | 0624 | 0000 | 0C00 |
| 0000063700 | 5F5F | 6161 | 746C | 7473 | 6F6B | 7276 | 1B56 | 0001 |
| 0000063720 | 0000 | 5F08 | 635F | 6B68 | 7473 | 566B | 011B | 0000 |
| 0000063740 | 0A00 | 5F5F | 4661 | 6863 | 736B | 6B74 | 1B70 | 0001 |
| 0000063760 | 0000 | 5F09 | 735F | 7465 | 6E65 | 7076 | 1C78 | 0001 |
| 0000064000 | 0000 | 5F0B | 4E5F | 534D | 5F47 | 4554 | 5458 | 1CA8 |
| 0000064020 | 0001 | 0000 | 5F0C | 4E5F | 534D | 5F47 | 5257 | 5449 |
| 0000064040 | 8A45 | 011D | 0000 | 0B00 | 5F5F | 645F | 736F | 7265 |
| 0000064060 | 6E72 | 926F | 011D | 0000 | 0700 | 5F5F | 7265 | 6E72 |
| 0000064100 | 436F | 011D | 0000 | 0800 | 5F5F | 6F64 | 7273 | 7465 |
| 0000064120 | 1D2A | 0001 | 0000 | 5F09 | 645F | 736F | 6572 | 6674 |
| 0000064140 | 245A | 0006 | 0000 | 5F08 | 635F | 6C66 | 7375 | 0068 |
| 0000064160 | 0500 | 0000 | 0700 | 5F5F | 7562 | 6966 | 5C6E | 0624 |
| 0000064200 | 0000 | 0500 | 5F5F | 6F69 | 3C62 | 0626 | 0000 | 0600 |
| 0000064220 | 5F5F | 6F69 | 3262 | 281C | 0006 | 0000 | 5F09 | 6C5F |

THU MAR 14 17:54:36 1991 UI.DLL PAGE 28, LINE 1594

| | | | | | | | | |
|---|---|---|---|---|---|---|---|---|
| 0000064240 | 7361 | 6974 | 626F | 1D9E | 0001 | 0000 | 5F08 | 665F |
| 0000064260 | 736C | 7562 | 8466 | 011E | 0000 | 0800 | 5F5F | 6567 |
| 0000064300 | 6274 | 6675 | 1F16 | 0001 | 0000 | 5F0B | 665F | 6C66 |
| 0000064320 | 7375 | 5F68 | 6B6C | 1ED0 | 0001 | 0000 | 5F07 | 6666 |
| 0000064340 | 756C | 6873 | 1F82 | 0001 | 0000 | 5F09 | 6C66 | 7375 |
| 0000064360 | 6168 | 6C6C | 200E | 0001 | 0000 | 5F08 | 6F5F | 7475 |
| 0000064400 | 7570 | 0274 | 0125 | 0000 | 0600 | 6C5F | 6573 | 6B65 |
| 0000064420 | 24F8 | 0001 | 0000 | 5F0A | 6C5F | 6573 | 6B65 | 6C5F |
| 0000064440 | 7A6B | 0125 | 0000 | 0600 | 775F | 6972 | 6574 | 2570 |
| 0000064460 | 0001 | 0000 | 5F0A | 775F | 6972 | 6574 | 6C5F | 4E6B |
| 0000064500 | 0127 | 0000 | 0700 | 6D5F | 6C61 | 6F6C | 5363 | 0127 |
| 0000064520 | 0000 | 0A00 | 6D5F | 6C61 | 6F6C | 5F63 | 6B6C | 275D |
| 0000064540 | 0001 | 0000 | 5F08 | 7266 | 6565 | 6C5F | 586B | 0127 |
| 0000064560 | 0000 | 0500 | 665F | 6572 | 9465 | 0127 | 0000 | 0C00 |
| 0000064600 | 5F5F | 6D66 | 6C61 | 6F6C | 5F63 | 6B6C | 2762 | 0001 |
| 0000064620 | 0000 | 5F07 | 665F | 7266 | 6565 | 2775 | 0001 | 0000 |
| 0000064640 | 5F09 | 665F | 616D | 6C6C | 636F | 2762 | 0001 | 0000 |
| 0000064660 | 5F0A | 665F | 7266 | 6565 | 6C5F | 826B | 0628 | 0000 |
| 0000064700 | 0700 | 5F5F | 6866 | 6165 | 1270 | 0128 | 0000 | 0900 |
| 0000064720 | 5F5F | 6E69 | 7469 | 6573 | 4667 | 0128 | 0000 | 0900 |
| 0000064740 | 5F5F | 696C | 6B6E | 6573 | 7C67 | 0128 | 0000 | 0B00 |
| 0000064760 | 5F5F | 6573 | 7261 | 6863 | 6573 | 8767 | 0129 | 0000 |
| 0000065000 | 0800 | 5F5F | 6E69 | 7363 | 6765 | 28F8 | 0001 | 0000 |
| 0000065020 | 5F09 | 675F | 6F72 | 7377 | 6765 | 29BA | 0001 | 0000 |
| 0000065040 | 5F0A | 665F | 6E69 | 6C64 | 7361 | 9074 | 0628 | 0000 |
| 0000065060 | 0A00 | 5F5F | 6D61 | 6C62 | 736B | 7A69 | 29DA | 0001 |
| 0000065100 | 0000 | 5F08 | 665F | 7765 | 6573 | 0C67 | 012A | 0000 |
| 0000065120 | 0700 | 735F | 7274 | 7063 | 4279 | 012A | 0000 | 0800 |
| 0000065140 | 735F | 7274 | 636E | 706D | 2892 | 0006 | 0000 | 5F0D |
| 0000065160 | 635F | 6C66 | 6374 | 7476 | 745F | 6261 | 28AE | 0006 |
| 0000065200 | 0000 | 5F08 | 615F | 6973 | 657A | AF43 | 0628 | 0000 |
| 0000065220 | 0800 | 5F5F | 7361 | 7A69 | 4465 | 28AC | 0006 | 0000 |
| 0000065240 | 5F0B | 735F | 6769 | 6E69 | 6F74 | 6666 | 28AA | 0006 |
| 0000065260 | 0000 | 5F0B | 735F | 6769 | 6E69 | 7374 | 6765 | 2ACE |
| 0000065300 | 0001 | 0000 | 5F06 | 6C5F | 636F | 186B | 012B | 0000 |
| 0000065320 | 0700 | 5F5F | 6F6C | 6B63 | A266 | 012A | 0000 | 0D00 |
| 0000065340 | 5F5F | 6E75 | 6F6C | 6B63 | 665F | 6C69 | 7E65 | 012A |
| 0000065360 | 0000 | 0D00 | 5F5F | 6F6C | 6B63 | 735F | 7274 | 6165 |
| 0000065400 | F86D | 012A | 0000 | 0800 | 5F5F | 6E75 | 6F6C | 6B63 |
| 0000065420 | 28B0 | 0006 | 0000 | 5F09 | 6C5F | 636F | 636B | 746E |
| 0000065440 | 2B28 | 0001 | 0000 | 5F09 | 755F | 6C6E | 636F | 666B |
| 0000065460 | 2A8A | 0001 | 0000 | 5F0F | 755F | 6C6E | 636F | 5F6B |
| 0000065500 | 7473 | 6572 | 6D61 | 2AAE | 0001 | 0000 | 5F0A | 775F |
| 0000065520 | 6961 | 6C74 | 636F | 966B | 012A | 0000 | 0B00 | 5F5F |
| 0000065540 | 6F6C | 6B63 | 665F | 6C69 | 3865 | 012B | 0000 | 0B00 |
| 0000065560 | 5F5F | 6567 | 7474 | 6469 | 6174 | B262 | 0628 | 0000 |
| 0000065600 | 0B00 | 5F5F | 6974 | 7464 | 6261 | 616D | B278 | 012B |
| 0000065620 | 0000 | 0800 | 735F | 7270 | 6E69 | 6674 | 2C26 | 0001 |
| 0000065640 | 0000 | 5F07 | 6163 | 6C6C | 636F | 0010 | 0002 | 0000 |
| 0000065660 | 440D | 534F | 4547 | 4D54 | 5345 | 4153 | 4547 | 002A |
| 0000065700 | 0002 | 0000 | 4D0A | 4753 | 4553 | 4447 | 5441 | 0141 |
| 0000065720 | 000A | 8075 | 8183 | 6400 | 8300 | 0201 | 0101 | 8000 |
| 0000065740 | 1601 | 7900 | 0330 | 0383 | 8302 | 0204 | 0A82 | 7528 |
| 0000065760 | 746E | 6761 | 6567 | 2964 | 0169 | 000A | 837F | 0081 |
| 0000066000 | 8183 | 8300 | 0081 | 1C01 | 7F00 | 0682 | 6170 | 6B63 |
| 0000066020 | 685F | 8200 | 6606 | 6C69 | 5F65 | 0268 | 0682 | 7566 |
| 0000066040 | 636E | 685F | 0104 | 0007 | 737A | C083 | 8200 | 0100 |
| 0000066060 | 0001 | 0180 | 0001 | 0180 | 0001 | 0180 | 0001 | 0180 |

*

THU MAR 14 17:54:36 1991 UI.DLL PAGE 29, LINE 1653

```
0000066260  0001  0180  0001  0180  0005  2878  8083  0100
0000066300  0001  0180  0001  0180  0001  0180  0001  0180
0000066320  0001  0180  0001  0180  0013  4079  8302  0230
0000066340  3183  8202  5F07  4F50  4E49  4C54  0169  0007
0000066360  837F  0082  8283  0100  0009  827F  7801  8200
0000066400  7901  0104  0001  0180  0001  0180  0001  0180
0000066420  0001  0180  0001  0180  0001  0180  0001  0180
*
0000070020  0001  0180  0001  0180  0007  737A  C083  8200
0000070040  0100  0001  0180  0001  0180  0001  0180  0001
0000070060  0180  0001  0180  0001  0180  0001  0180  0001
*
0000070260  0180  0007  737A  1D83  8203  0100  000A  8075
0000070300  8183  7300  8300  0201  0101  8000  0101  8000
0000070320  0101  8000  0101  8000  0101  8000  0101  8000
*
0000072200  1301  7900  D085  0600  0D83  8304  040E  0582
0000072220  515F  534D  6947  1301  7F00  C083  8300  0085
0000072240  C083  8300  00C0  8683  8300  022F  2701  7F00
0000072260  0482  7768  646E  8200  6D03  6773  8204  6D03
0000072300  3170  8206  6D03  3270  820A  7404  6D69  0E65
0000072320  0382  7470  126C  0101  8000  0101  8000  0101
0000072340  8000  0101  8000  1301  7900  0560  1483  8304
0000072360  0415  0782  4D5F  4951  464E  694F  1001  7F00
0000072400  8583  8300  0085  8583  8300  0085  C083  0100
0000072420  0026  827F  6302  0062  0382  6970  0264  0382
0000072440  6974  0464  0582  6D63  6773  0673  0982  527C
0000072460  7365  7265  6576  0864  0101  8000  0101  8000
0000072500  0101  8000  0101  8000  0701  7A00  8373  040C
0000072520  0082  0101  8000  0101  8000  0101  8000  0101
0000072540  8000  0101  8000  0101  8000  0101  8000  0101
*
0000077020  8000  0101  8000  0101  8000  0101  8000  0701
0000077040  7800  5085  8301  0080  0701  7800  8085  8300
0000077060  0080  0701  7800  6085  8301  0080  0701  7800
0000077100  C885  8301  0080  0701  7800  D085  8301  0080
0000077120  0701  7800  0885  8301  0080  0701  7800  C885
0000077140  8300  0080  0701  7800  D085  8300  0080  0701
0000077160  7800  D885  8300  0080  0701  7800  3885  8301
0000077200  0080  0701  7800  4085  8301  0080  0701  7800
0000077220  F085  8306  0080  0701  7800  A885  8300  0080
0000077240  0701  7800  E085  8300  0080  0701  7800  0085
0000077260  8301  0080  0701  7800  3085  8301  0080  0701
0000077300  7800  4885  8301  0080  0701  7800  1885  8301
0000077320  0080  0701  7800  F885  8300  0080  0701  7800
0000077340  2085  8301  0080  0701  7800  8085  8301  0080
0000077360  0701  7800  2885  8301  0080  0701  7800  E085
0000077400  8304  00C0  0701  7800  E885  8300  0080  0701
0000077420  7800  D085  8302  0080  0701  7800  B885  8300
0000077440  0080  0701  7800  C085  8300  0080  0701  7800
0000077460  9885  8300  0080  0701  7800  8885  8300  0080
0000077500  0701  7800  A085  8300  0080  0701  7800  7885
0000077520  8301  0080  0701  7800  A085  8302  00C0  0701
0000077540  7800  9085  8302  0080  0701  7800  A085  8300
0000077560  00C0  0701  7800  9085  8300  0080  0701  7800
0000077600  B085  8300  0080  0701  7800  8885  8301  0080
0000077620  0701  7800  5085  8302  0080  0701  7800  E885
0000077640  8301  0080  0501  7800  8378  0080  0701  7800
0000077660  A085  8301  0080  0701  7800  F085  8301  0080
```

THU MAR 14 17:54:36 1991 UI.DLL PAGE 30, LINE 1712

| | | | | | | | | |
|---|---|---|---|---|---|---|---|---|
| 0000077700 | 0701 | 7800 | 4085 | 8306 | 00C0 | 0501 | 7800 | 8370 |
| 0000077720 | 0080 | 0501 | 7800 | 8360 | 00C0 | 0501 | 7800 | 8320 |
| 0000077740 | 00C0 | 0701 | 7800 | 2085 | 8302 | 0080 | 0701 | 7800 |
| 0000077760 | 1085 | 8302 | 0080 | 0701 | 7800 | 9085 | 8301 | 0080 |
| 0000100000 | 0701 | 7800 | A885 | 8301 | 0080 | 0701 | 7800 | 1085 |
| 0000100020 | 8301 | 0080 | 0701 | 7800 | C085 | 8301 | 0080 | 0701 |
| 0000100040 | 7800 | 1885 | 8302 | 0080 | 0701 | 7800 | 0085 | 8302 |
| 0000100060 | 0080 | 0701 | 7800 | B885 | 8301 | 0080 | 0701 | 7800 |
| 0000100100 | 5885 | 8301 | 0080 | 0701 | 7800 | 0085 | 8303 | 0080 |
| 0000100120 | 0701 | 7800 | C085 | 8302 | 00C0 | 0701 | 7800 | 2885 |
| 0000100140 | 8302 | 0080 | 0701 | 7800 | 4085 | 8302 | 0080 | 0701 |
| 0000100160 | 7800 | 6085 | 8301 | 00C0 | 0701 | 7800 | A085 | 8301 |
| 0000100200 | 00C0 | 0101 | 8000 | 0101 | 8000 | 1B01 | 7900 | 0920 |
| 0000100220 | 8F83 | 8306 | 0690 | 0F82 | 5F69 | 5F75 | 736D | 5F67 |
| 0000100240 | 6170 | 6172 | 5F6D | 6974 | 1C01 | 7F00 | 8183 | 8300 |
| 0000100260 | 0085 | 8283 | 8300 | 0086 | 8883 | 8300 | 0080 | 8483 |
| 0000100300 | 8300 | 00C0 | C083 | 0100 | 006A | 827F | 6909 | 755F |
| 0000100320 | 735F | 6F68 | 7472 | 8200 | 690A | 755F | 755F | 6873 |
| 0000100340 | 726F | 0074 | 0882 | 5F69 | 5F75 | 6F6C | 676E | 8200 |
| 0000100360 | 6909 | 755F | 755F | 6F6C | 676E | 8200 | 6909 | 755F |
| 0000100400 | 665F | 6F6C | 7461 | 8200 | 6908 | 755F | 635F | 6168 |
| 0000100420 | 0072 | 0982 | 5F69 | 5F75 | 6375 | 6168 | 0072 | 0782 |
| 0000100440 | 5F69 | 5F75 | 7473 | 0072 | 0982 | 5F69 | 5F75 | 6C62 |
| 0000100460 | 636F | 006B | 1901 | 7900 | 0230 | 9283 | 8306 | 0693 |
| 0000100500 | 0D82 | 5F69 | 736D | 5F67 | 6170 | 6172 | 5F6D | 6974 |
| 0000100520 | 0701 | 7F00 | 8583 | 8300 | 068E | 1001 | 7F00 | 0482 |
| 0000100540 | 7974 | 6570 | 8200 | 7605 | 6C61 | 6575 | 0102 | 0001 |
| 0000100560 | 0180 | 001C | 8579 | 0090 | 8309 | 0696 | 9783 | 8206 |
| 0000100600 | 690E | 6D5F | 6773 | 685F | 6165 | 6564 | 5F72 | 6974 |
| 0000100620 | 1C01 | 7F00 | 8183 | 8300 | 0081 | 8583 | 8300 | 0085 |
| 0000100640 | 8483 | 8300 | 0085 | 8583 | 8300 | 0081 | 8583 | 0100 |
| 0000100660 | 0047 | 827F | 7104 | 695F | 0064 | 0682 | 6F73 | 7275 |
| 0000100700 | 6563 | 8202 | 7003 | 6469 | 8204 | 7403 | 6469 | 8206 |
| 0000100720 | 7204 | 7365 | 0870 | 0882 | 6572 | 7073 | 745F | 6469 |
| 0000100740 | 820A | 6F07 | 5F70 | 6F63 | 6564 | 820C | 7404 | 7079 |
| 0000100760 | 0E65 | 0482 | 6973 | 657A | 0110 | 0015 | 8579 | 00C0 |
| 0000101000 | 8302 | 069A | 9B83 | 8206 | 6907 | 6D5F | 6773 | 745F |
| 0000101020 | 0169 | 0005 | 3078 | 9183 | 0106 | 0007 | 837F | 0695 |
| 0000101040 | 9983 | 0106 | 0017 | 827F | 6806 | 6165 | 6564 | 0072 |
| 0000101060 | 0A82 | 6170 | 6172 | 5F6D | 696C | 7473 | 0112 | 0001 |
| 0000101100 | 0180 | 0001 | 0180 | 0007 | 737A | 9F83 | 8206 | 0100 |
| 0000101120 | 0007 | 737A | 9883 | 8206 | 0100 | 0001 | 0180 | 0001 |
| 0000101140 | 0180 | 0001 | 0180 | 0001 | 0180 | 0001 | 0180 | 0001 |
| * | | | | | | | | |
| 0000101300 | 0180 | 0001 | 0180 | 0001 | 0180 | 0001 | 0180 | 0013 |
| 0000101320 | 8579 | 0090 | 8307 | 06BE | BF83 | 8206 | 6505 | 746E |
| 0000101340 | 7972 | 0169 | 0016 | 837F | 0085 | C083 | 8300 | 0081 |
| 0000101360 | 0183 | 8300 | 0081 | 8183 | 8300 | 031C | 3C01 | 7F00 |
| 0000101400 | 0282 | 6469 | 8200 | 6404 | 7461 | 0261 | 0682 | 656C |
| 0000101420 | 676E | 6874 | 8206 | 7404 | 7079 | 0865 | 0382 | 696D |
| 0000101440 | 0A6E | 0382 | 616D | 0C78 | 1082 | 6E65 | 7274 | 5F79 |
| 0000101460 | 6176 | 696C | 6164 | 6974 | 6E6F | 010E | 0010 | 5079 |
| 0000101500 | 8303 | 06C3 | C483 | 8206 | 6604 | 726F | 696D | 0701 |
| 0000101520 | 7A00 | 8373 | 06C2 | 0082 | 0701 | 7A00 | 8373 | 06BD |
| 0000101540 | 0082 | 0A01 | 7F00 | 8183 | 8300 | 06C1 | 1C83 | 0103 |
| 0000101560 | 0028 | 827F | 6104 | 6772 | 0063 | 0B82 | 6E65 | 7274 |
| 0000101600 | 5F79 | 7261 | 6172 | 0279 | 0F82 | 6F66 | 6D72 | 765F |
| 0000101620 | 6C61 | 6469 | 7461 | 6F69 | 066E | 0101 | 8000 | 0101 |
| 0000101640 | 8000 | 0101 | 8000 | 0101 | 8000 | 0101 | 8000 | 0101 |

```
THU MAR 14 17:54:36 1991  UI.DLL  PAGE 31, LINE 1771

0000101660  8000  0101  8000  0101  8000  0701  7A00  8373
0000101700  041A  0082  0101  8000  0101  8000  0101  8000
0000101720  0101  8000  0101  8000  0101  8000  0101  8000
*
0000102000  0101  8000  0701  7A00  8373  06C0  0082  0101
0000102020  8000  0101  8000  0101  8000  0101  8000  0101
*
0000102160  8000  0101  8000  0101  8000  0101  8000  0A01
0000102200  7500  8380  0085  0164  FC83  0106  0004  837F
0000102220  0081  0A01  7500  8380  0081  0364  FE83  0106
0000102240  000A  837F  00C0  C083  8300  0085  0A01  7500
0000102260  8380  0081  0073  0183  0102  0004  837F  02F7
0000102300  0A01  7500  8380  0081  0173  0083  0107  0001
0000102320  0180  0001  0180  0005  5078  8083  0100  0005
0000102340  3878  8083  0100  0007  737A  0783  8207  0100
0000102360  000A  8075  8183  6400  8300  0201  0501  7800
0000102400  8360  0082  0501  7800  8330  0080  0D01  7F00
0000102420  C083  8300  00C6  C083  8300  00C5  0A01  7500
0000102440  8380  0081  0473  0A83  0107  0007  8578  0800
0000102460  8083  0100  0004  837F  0085  0A01  7500  8380
0000102500  0200  0173  0D83  0107  0004  837F  00C5  0A01
0000102520  7500  8380  0081  0173  0F83  0107  0004  837F
0000102540  00C0  0A01  7500  8380  0200  0173  1183  0107
0000102560  0004  837F  02F7  0A01  7500  8380  0081  0173
0000102600  1383  0107  000A  8075  8183  7300  8300  0201
0000102620  0401  7F00  CD83  0106  000A  8075  8183  7300
0000102640  8301  0716  0401  7F00  CD83  0106  000A  8075
0000102660  8183  7300  8301  0718  0A01  7F00  8583  8300
0000102700  00C0  C083  0100  000A  8075  8183  7300  8303
0000102720  071A  0101  8000  0501  7800  8358  0080  0A01
0000102740  7500  8380  0081  0073  0183  0102  000A  8075
0000102760  8183  7300  8300  0201  0701  7F00  1A83  8304
0000103000  069E  0A01  7500  8380  0081  0273  2083  0107
0000103020  0004  837F  0085  0A01  7500  8380  0081  0173
0000103040  2283  0107  0007  8578  0088  8083  0100  0005
0000103060  4078  8083  0100  0004  837F  069F  0A01  7500
0000103100  8380  0081  0173  2683  0107  0007  837F  0085
0000103120  8583  0100  000A  8075  8183  7300  8302  0728
0000103140  0701  7800  A885  8300  0080  0701  7F00  8583
0000103160  8300  00C0  0A01  7500  8380  0081  0273  2B83
0000103200  0107  0007  837F  0085  C083  0100  000A  8075
0000103220  8183  7300  8302  072D  0401  7F00  C083  0100
0000103240  000A  8075  0083  7302  8301  072F  1301  7F00
0000103260  8183  8300  00C0  8183  8300  0081  0583  8302
0000103300  0081  0A01  7500  8380  0081  0673  3183  0107
0000103320  0007  8578  1000  8083  0100  0007  8578  0190
0000103340  8083  0100  0005  6078  8083  0100  0004  837F
0000103360  0081  0A01  7500  8380  0085  0164  3683  0107
0000103400  0010  837F  0081  8183  8300  0081  8183  8300
0000103420  0205  0A01  7500  8380  0081  0573  3883  0107
0000103440  0007  837F  0081  DE83  0106  000A  8075  8183
0000103460  7300  8302  073A  0401  7F00  C083  0100  000A
0000103500  8075  0083  7302  8301  073C  0401  7F00  C083
0000103520  0100  000A  8075  0083  7302  8301  073E  0AC1
0000103540  7F00  C083  8300  00C0  8583  0100  000A  8075
0000103560  8183  7300  8303  0740  0A01  7F00  C083  8300
0000103600  00C0  8583  0100  000A  8075  8183  6400  8303
0000103620  0742  0701  7F00  C083  8300  00C0  0A01  7500
0000103640  8380  0081  0273  4483  0107  0007  837F  00C0
```

THU MAR 14 17:54:36 1991 UI.DLL PAGE 32, LINE 1830

| | | | | | | | | |
|---|---|---|---|---|---|---|---|---|
| 0000103660 | 8583 | 0100 | 000A | 8075 | 8183 | 7300 | 8302 | 0746 |
| 0000103700 | 0401 | 7F00 | C083 | 0100 | 000A | 8075 | 8183 | 7300 |
| 0000103720 | 8301 | 0748 | 0401 | 7F00 | 8183 | 0100 | 000A | 8075 |
| 0000103740 | C083 | 7300 | 8301 | 074A | 0701 | 7800 | F085 | 8300 |
| 0000103760 | 0080 | 0701 | 7F00 | C083 | 8300 | 0081 | 0A01 | 7500 |
| 0000104000 | 8380 | 0081 | 0273 | 4D83 | 0107 | 0004 | 837F | 0081 |
| 0000104020 | 0A01 | 7500 | 8380 | 0081 | 0173 | 4F83 | 0107 | 0004 |
| 0000104040 | 837F | 0081 | 0A01 | 7500 | 8380 | 0081 | 0173 | 5183 |
| 0000104060 | 0107 | 0007 | 837F | 00C0 | C083 | 0100 | 000A | 8075 |
| 0000104100 | 8183 | 7300 | 8302 | 0753 | 0401 | 7F00 | 8583 | 0100 |
| 0000104120 | 000A | 8075 | 8183 | 7300 | 8301 | 0755 | 0701 | 7800 |
| 0000104140 | 8085 | 8300 | 0080 | 0A01 | 7500 | 8380 | 0085 | 0073 |
| 0000104160 | 0183 | 0502 | 0111 | 0000 | 1500 | 0001 | FF00 | 5506 |
| 0000104200 | 1600 | 4900 | 0000 | 0400 | 7506 | 695F | 696E | 0174 |
| 0000104220 | 1802 | 5501 | 0100 | A607 | 1601 | 9800 | 0001 | 0400 |
| 0000104240 | 7509 | 675F | 7465 | 685F | 6261 | 040A | 0006 | 02F7 |
| 0000104260 | 7004 | 6168 | 0C62 | FA04 | C0FF | 0600 | 5F5F | 7974 |
| 0000104300 | 6570 | 040F | FFF4 | 0085 | 5F09 | 625F | 5F78 | 7974 |
| 0000104320 | 6570 | 040D | FFE4 | 0706 | 5F07 | 705F | 6972 | 746E |
| 0000104340 | 040B | FFDC | 0202 | 5F05 | 6C5F | 6C76 | 040D | FFE8 |
| 0000104360 | 0708 | 5F07 | 635F | 6F6C | 6B63 | 040D | FFF6 | 00C0 |
| 0000104400 | 5F07 | 735F | 6174 | 6B63 | 040E | FFE2 | 0081 | 5F08 |
| 0000104420 | 725F | 7465 | 6176 | 0E6C | 9C05 | 0620 | 0400 | 0607 |
| 0000104440 | 5F5F | 7566 | 636E | 0201 | 011B | 01FB | 070B | 00D7 |
| 0000104460 | 0016 | 00C9 | 0000 | 0C04 | 5F75 | 6573 | 5F74 | 6F63 |
| 0000104500 | 666E | 6769 | 0415 | 0012 | 00C0 | 630F | 6766 | 665F |
| 0000104520 | 6C69 | 5F65 | 616E | 656D | 705F | 0412 | 000E | 00C6 |
| 0000104540 | 630C | 6766 | 6F5F | 6A62 | 695F | 5F64 | 1C70 | 0A04 |
| 0000104560 | C000 | 0A00 | 7265 | 5F72 | 6170 | 6874 | 705F | 0413 |
| 0000104600 | 0006 | 00C5 | 650D | 7272 | 6C5F | 6E69 | 5F65 | 6F6E |
| 0000104620 | 705F | 040D | FFFC | 0085 | 6107 | 616C | 6D72 | 665F |
| 0000104640 | 0408 | FFFA | 0081 | 7202 | 1063 | F604 | 86FE | 0A00 |
| 0000104660 | 6663 | 5F67 | 626F | 5F6A | 6469 | 040E | FEFA | 070C |
| 0000104700 | 6508 | 7272 | 705F | 7461 | 1168 | F404 | 85FE | 0B00 |
| 0000104720 | 7265 | 5F72 | 696C | 656E | 6E5F | 016F | 1C02 | D201 |
| 0000104740 | 0E02 | 2D07 | 1600 | 1F00 | 0000 | 0400 | 750D | 735F |
| 0000104760 | 7465 | 745F | 5F77 | 6D68 | 646F | 040A | 0006 | 0085 |
| 0000105000 | 6804 | 6F6D | 0164 | 1C02 | FF01 | 1002 | 4607 | 1600 |
| 0000105020 | 3800 | 0000 | 0400 | 750D | 675F | 7465 | 745F | 5F77 |
| 0000105040 | 6D68 | 646F | 040B | 0006 | 00C5 | 7005 | 6D68 | 646F |
| 0000105060 | 0201 | 011C | 0345 | 0712 | 0034 | 0016 | 0026 | 0000 |
| 0000105100 | 0D04 | 5F75 | 6573 | 5F74 | 7774 | 685F | 6E77 | 0A64 |
| 0000105120 | 0604 | C000 | 0400 | 7768 | 646E | 0201 | 011C | 0379 |
| 0000105140 | 0714 | 0050 | 0016 | 0042 | 0000 | 0D04 | 5F75 | 6567 |
| 0000105160 | 5F74 | 7774 | 685F | 6E77 | 0B64 | 0604 | F700 | 0502 |
| 0000105200 | 6870 | 6E77 | 0164 | 1702 | C901 | 1503 | 4807 | 1600 |
| 0000105220 | 3C00 | 0000 | 0400 | 7508 | 665F | 6E69 | 7369 | 0168 |
| 0000105240 | 1D02 | 1101 | 1704 | 7807 | 1600 | 6A00 | 0000 | 0400 |
| 0000105260 | 750E | 675F | 7465 | 6E5F | 7865 | 5F74 | 736D | 0D67 |
| 0000105300 | 0604 | CD00 | 0706 | 5F69 | 7170 | 736D | 0C67 | FA04 |
| 0000105320 | 86FF | 0600 | 7473 | 7461 | 7375 | 0201 | 0118 | 0489 |
| 0000105340 | 0719 | 0055 | 0016 | 0047 | 0000 | 0904 | 5F75 | 6567 |
| 0000105360 | 5F74 | 736D | 0D67 | 0604 | CD00 | 0706 | 5F69 | 7170 |
| 0000105400 | 736D | 0167 | 1902 | DE01 | 1B04 | 6707 | 1601 | 5900 |
| 0000105420 | 0001 | 0400 | 750A | 705F | 736F | 5F74 | 736D | 0967 |
| 0000105440 | 0E04 | 8500 | 0300 | 6D63 | 0964 | 0A04 | C000 | 0300 |
| 0000105460 | 706D | 0931 | 0604 | C000 | 0300 | 706D | 0C32 | FA04 |
| 0000105500 | C0FF | 0600 | 5F5F | 7974 | 6570 | 040F | FFF2 | 0085 |
| 0000105520 | 5F09 | 625F | 5F78 | 7974 | 6570 | 040D | FFE0 | 0706 |

THU MAR 14 17:54:36 1991 UI.DLL PAGE 33, LINE 1889

| | | | | | | | | |
|---|---|---|---|---|---|---|---|---|
| 0000105540 | 5F07 | 705F | 6972 | 746E | 040B | FFD8 | 0202 | 5F05 |
| 0000105560 | 6C5F | 6C76 | 040D | FFE6 | 0708 | 5F07 | 635F | 6F6C |
| 0000105600 | 6B63 | 040D | FFF6 | 00C0 | 5F07 | 735F | 6174 | 6B63 |
| 0000105620 | 040E | FFDE | 0081 | 5F08 | 725F | 7465 | 6176 | 096C |
| 0000105640 | E404 | 85FF | 0300 | 7266 | 0863 | F404 | 81FF | 0200 |
| 0000105660 | 6372 | 050E | 20C8 | 0006 | 071D | 5F06 | 665F | 6E75 |
| 0000105700 | 0163 | 1902 | 4501 | 1E06 | 3F07 | 1600 | 3300 | 0000 |
| 0000105720 | 0400 | 750A | 775F | 6961 | 5F74 | 736D | 0167 | 2002 |
| 0000105740 | 8401 | 1F06 | 4B07 | 1600 | 3F00 | 0000 | 0400 | 7511 |
| 0000105760 | 675F | 7465 | 715F | 6575 | 6575 | 735F | 6174 | 6574 |
| 0000106000 | 040C | FFFA | 0086 | 7306 | 6174 | 7574 | 0173 | 1A02 |
| 0000106020 | CF01 | 2106 | 5C07 | 1600 | 4E00 | 0000 | 0400 | 750B |
| 0000106040 | 745F | 6172 | 736E | 6D5F | 6773 | 040B | 000A | 041A |
| 0000106060 | 7005 | 6D71 | 6773 | 040F | 0006 | 069E | 6909 | 6D5F |
| 0000106100 | 6773 | 705F | 7274 | 0201 | 011F | 072B | 0723 | 0233 |
| 0000106120 | 0016 | 0225 | 0000 | 1004 | 5F75 | 7270 | 7065 | 7261 |
| 0000106140 | 5F65 | 6869 | 6D5F | 6773 | 040D | 0006 | 0085 | 6F07 |
| 0000106160 | 5F70 | 6F63 | 6564 | 040F | FFF4 | 0085 | 5F09 | 625F |
| 0000106200 | 5F78 | 7974 | 6570 | 040D | FFE4 | 0706 | 5F07 | 705F |
| 0000106220 | 6972 | 746E | 040B | FFDC | 0202 | 5F05 | 6C5F | 6C76 |
| 0000106240 | 040D | FFE8 | 0708 | 5F07 | 635F | 6F6C | 6B63 | 040D |
| 0000106260 | FFF6 | 00C0 | 5F07 | 735F | 6174 | 6B63 | 040E | FFE2 |
| 0000106300 | 0081 | 5F08 | 725F | 7465 | 6176 | 0C6C | FA04 | C0FF |
| 0000106320 | 0600 | 5F5F | 7974 | 6570 | 050E | 20EA | 0006 | 0724 |
| 0000106340 | 5F06 | 665F | 6E75 | 0163 | 1B02 | 5E01 | 2709 | 3707 |
| 0000106360 | 1600 | 2900 | 0000 | 0400 | 750C | 735F | 7465 | 695F |
| 0000106400 | 5F6B | 736D | 1267 | 0604 | 9F00 | 0C06 | 7865 | 6574 |
| 0000106420 | 6E72 | 6C61 | 6D5F | 6773 | 0201 | 0123 | 0995 | 0729 |
| 0000106440 | 0248 | 0016 | 023A | 0000 | 1404 | 5F75 | 7270 | 7065 |
| 0000106460 | 7261 | 5F65 | 6869 | 6D5F | 6773 | 705F | 7261 | 040D |
| 0000106500 | 0008 | 0085 | 6F07 | 5F70 | 6F63 | 6564 | 040B | 0006 |
| 0000106520 | 0085 | 7005 | 7261 | 6D61 | 040C | FFFA | 00C0 | 5F06 |
| 0000106540 | 745F | 7079 | 0F65 | F404 | 85FF | 0900 | 5F5F | 7862 |
| 0000106560 | 745F | 7079 | 0D65 | E404 | 06FF | 0707 | 5F5F | 7270 |
| 0000106600 | 6E69 | 0B74 | DC04 | 02FF | 0502 | 5F5F | 766C | 0D6C |
| 0000106620 | E804 | 08FF | 0707 | 5F5F | 6C63 | 636F | 0D6B | F604 |
| 0000106640 | C0FF | 0700 | 5F5F | 7473 | 6361 | 0E6B | E204 | 81FF |
| 0000106660 | 0800 | 5F5F | 6572 | 7674 | 6C61 | 050E | 212A | 0006 |
| 0000106700 | 072A | 5F06 | 665F | 6E75 | 0163 | 2302 | DD01 | 2C0B |
| 0000106720 | FF07 | 1601 | F100 | 0001 | 0400 | 7514 | 705F | 6572 |
| 0000106740 | 6170 | 6572 | 695F | 5F68 | 736D | 5F67 | 7562 | 0D66 |
| 0000106760 | 0A04 | 8500 | 0700 | 706F | 635F | 646F | 0B65 | 0604 |
| 0000107000 | C000 | 0500 | 6170 | 6172 | 0D6D | E404 | 06FF | 0707 |
| 0000107020 | 5F5F | 7270 | 6E69 | 0B74 | DC04 | 02FF | 0502 | 5F5F |
| 0000107040 | 766C | 0D6C | E804 | 08FF | 0707 | 5F5F | 6C63 | 636F |
| 0000107060 | 0D6B | F604 | C0FF | 0700 | 5F5F | 7473 | 6361 | 0E6B |
| 0000107100 | E204 | 81FF | 0800 | 5F5F | 6572 | 7674 | 6C61 | 040C |
| 0000107120 | FFFA | 00C0 | 5F06 | 745F | 7079 | 0F65 | F404 | 85FF |
| 0000107140 | 0900 | 5F5F | 7862 | 745F | 7079 | 0E65 | 4E05 | 0621 |
| 0000107160 | 2A00 | 0607 | 5F5F | 7566 | 636E | 0201 | 0123 | 0DDC |
| 0000107200 | 072E | 0252 | 0016 | 0244 | 0000 | 1404 | 5F75 | 7270 |
| 0000107220 | 7065 | 7261 | 5F65 | 6869 | 6D5F | 6773 | 735F | 7274 |
| 0000107240 | 040D | 000A | 0085 | 6F07 | 5F70 | 6F63 | 6564 | 040B |
| 0000107260 | 0006 | 00C0 | 7005 | 7261 | 6D61 | 040C | FFFA | 00C0 |
| 0000107300 | 5F06 | 745F | 7079 | 0F65 | F404 | 85FF | 0900 | 5F5F |
| 0000107320 | 7862 | 745F | 7079 | 0D65 | E404 | 06FF | 0707 | 5F5F |
| 0000107340 | 7270 | 6E69 | 0B74 | DC04 | 02FF | 0502 | 5F5F | 766C |
| 0000107360 | 0D6C | E804 | 08FF | 0707 | 5F5F | 6C63 | 636F | 0D6B |
| 0000107400 | F604 | C0FF | 0700 | 5F5F | 7473 | 6361 | 0E6B | E204 |

THU MAR 14 17:54:36 1991 UI.DLL PAGE 34, LINE 1948

| | | | | | | | | |
|---|---|---|---|---|---|---|---|---|
| 0000107420 | 81FF | 0800 | 5F5F | 6572 | 7674 | 6C61 | 050E | 2192 |
| 0000107440 | 0006 | 072A | 5F06 | 665F | 6E75 | 0163 | 1502 | 2E01 |
| 0000107460 | 3010 | 3207 | 1600 | 2400 | 0000 | 0400 | 7506 | 665F |
| 0000107500 | 6572 | 0765 | 0604 | C000 | 0100 | 0170 | 1802 | 6001 |
| 0000107520 | 3210 | AA07 | 1600 | 9C00 | 0000 | 0400 | 7509 | 645F |
| 0000107540 | 7369 | 5F70 | 626D | 040D | 0014 | 0081 | 6D07 | 5F62 |
| 0000107560 | 7974 | 6570 | 040C | 0010 | 00C0 | 6D06 | 646F | 6C75 |
| 0000107600 | 0B65 | 0E04 | 8100 | 0500 | 736D | 6E67 | 0B6F | 0C04 |
| 0000107620 | 8100 | 0500 | 7261 | 6E67 | 0A6F | 0804 | 0500 | 0402 |
| 0000107640 | 7261 | 7667 | 040E | 0006 | 0081 | 6C08 | 676F | 665F |
| 0000107660 | 616C | 0D67 | C804 | 85FF | 0700 | 626D | 665F | 616C |
| 0000107700 | 0967 | C604 | 85FF | 0300 | 6572 | 0973 | C604 | 33FD |
| 0000107720 | 0307 | 7562 | 0E66 | CC04 | 34FF | 0807 | 6966 | 656C |
| 0000107740 | 616E | 656D | 040D | FFCA | 0085 | 6D07 | 6773 | 6C5F |
| 0000107760 | 6E65 | 0201 | 011E | 110A | 0737 | 0082 | 0010 | 0077 |
| 0000110000 | 0000 | 0F04 | 626D | 665F | 616C | 5F67 | 6F72 | 7475 |
| 0000110020 | 6E69 | 0D65 | 0604 | 8100 | 0700 | 626D | 745F | 7079 |
| 0000110040 | 0165 | 1502 | 8C01 | 3911 | 2F07 | 1600 | 2100 | 0000 |
| 0000110060 | 0400 | 7506 | 6C5F | 7369 | 0874 | 1004 | 8100 | 0200 |
| 0000110100 | 6469 | 040C | 000E | 0081 | 6106 | 7463 | 6F69 | 0F6E |
| 0000110120 | 0C04 | 8100 | 0900 | 7573 | 6162 | 7463 | 6F69 | 0B6E |
| 0000110140 | 0A04 | 8100 | 0500 | 7261 | 6E67 | 0A6F | 0604 | 0500 |
| 0000110160 | 0402 | 7261 | 7667 | 0407 | FFFC | 0081 | 6901 | 0201 |
| 0000110200 | 0115 | 11BB | 073B | 002A | 0016 | 001C | 0000 | 0604 |
| 0000110220 | 5F75 | 6F66 | 6D72 | 0408 | 000A | 0081 | 6902 | 0E64 |
| 0000110240 | 0604 | DE00 | 0806 | 6F66 | 6D72 | 705F | 7274 | 0201 |
| 0000110260 | 0119 | 11E5 | 073D | 0034 | 0016 | 0026 | 0000 | 0A04 |
| 0000110300 | 5F75 | 6573 | 5F74 | 7768 | 646E | 040A | 0006 | 00C0 |
| 0000110320 | 6804 | 6E77 | 0164 | 1F02 | 1901 | 3F12 | 3407 | 1600 |
| 0000110340 | 2600 | 0000 | 0400 | 7510 | 735F | 7465 | 6C5F | 636F |
| 0000110360 | 6C61 | 685F | 6E77 | 0A64 | 0604 | C000 | 0400 | 7768 |
| 0000110400 | 646E | 0201 | 0122 | 124D | 0741 | 0044 | 0016 | 0036 |
| 0000110420 | 0000 | 1304 | 5F75 | 6977 | 5F6E | 656D | 7373 | 6761 |
| 0000110440 | 5F65 | 7473 | 6C79 | 0A65 | 0C04 | C000 | 0400 | 7768 |
| 0000110460 | 646E | 0409 | 0008 | 00C0 | 7303 | 7274 | 040B | 0006 |
| 0000110500 | 0085 | 7305 | 7974 | 656C | 0408 | FFFC | 0081 | 7202 |
| 0000110520 | 0163 | 2302 | 9101 | 4312 | BA07 | 1000 | AF00 | 0000 |
| 0000110540 | 0400 | 7514 | 5F75 | 6977 | 5F6E | 656D | 7373 | 6761 |
| 0000110560 | 5F65 | 7473 | 6C79 | 0A65 | 0604 | C000 | 0400 | 7768 |
| 0000110600 | 646E | 0409 | 000A | 00C0 | 7303 | 7274 | 040B | 000E |
| 0000110620 | 0085 | 7305 | 7974 | 656C | 0409 | FFEC | 0081 | 7203 |
| 0000110640 | 7365 | 0409 | FFEE | 0413 | 6D03 | 6971 | 040C | FFE6 |
| 0000110660 | 0085 | 7106 | 7865 | 7369 | 0E74 | FA04 | C0FF | 0800 |
| 0000110700 | 6574 | 706D | 685F | 6261 | 040E | FFE8 | 00C0 | 7408 |
| 0000110720 | 6D65 | 5F70 | 6D68 | 0171 | 1C02 | 4B01 | 4513 | 3E07 |
| 0000110740 | 1600 | 3000 | 0000 | 0400 | 750D | 775F | 6E69 | 6D5F |
| 0000110760 | 7365 | 6173 | 6567 | 040A | 000A | 00C0 | 6804 | 6E77 |
| 0000111000 | 0964 | 0604 | C000 | 0300 | 7473 | 0172 | 1E02 | 8901 |
| 0000111020 | 4713 | 4007 | 1600 | 3200 | 0000 | 0400 | 750F | 6D5F |
| 0000111040 | 7365 | 6173 | 6567 | 735F | 7974 | 656C | 0409 | 0008 |
| 0000111060 | 00C0 | 7303 | 7274 | 040B | 0006 | 0085 | 7305 | 7974 |
| 0000111100 | 656C | 0201 | 0118 | 13C9 | 0749 | 003A | 0016 | 002C |
| 0000111120 | 0000 | 0904 | 5F75 | 656D | 7373 | 6761 | 0965 | 0604 |
| 0000111140 | C000 | 0300 | 7473 | 0172 | 1C02 | 0301 | 4B14 | F307 |
| 0000111160 | 1601 | E500 | 0001 | 0400 | 750D | 675F | 7465 | 655F |
| 0000111200 | 7272 | 735F | 7274 | 0409 | 0006 | 0081 | 6503 | 7272 |
| 0000111220 | 050A | 2A34 | 0006 | 074C | 7302 | 0174 | 1D02 | F601 |
| 0000111240 | 4E15 | 3C07 | 1600 | 2E00 | 0000 | 0400 | 750E | 775F |
| 0000111260 | 6E69 | 645F | 7369 | 5F70 | 7265 | 0A72 | 0804 | C000 |

THU MAR 14 17:54:36 1991 UI.DLL PAGE 35, LINE 2007

| | | | | | | | | |
|---|---|---|---|---|---|---|---|---|
| 0000111300 | 0400 | 7768 | 646E | 0409 | 0006 | 0081 | 6503 | 7272 |
| 0000111320 | 0201 | 0119 | 1632 | 0750 | 0037 | 0016 | 0029 | 0000 |
| 0000111340 | 0A04 | 5F75 | 6964 | 7073 | 655F | 7272 | 040C | 0006 |
| 0000111360 | 0081 | 7306 | 6174 | 7574 | 0173 | 1F02 | 6901 | 5216 |
| 0000111400 | 3707 | 1600 | 2900 | 0000 | 0400 | 7510 | 645F | 7369 |
| 0000111420 | 5F70 | 6F6C | 6163 | 5F6C | 7265 | 0C72 | 0604 | 8100 |
| 0000111440 | 0600 | 7473 | 7461 | 7375 | 0201 | 0118 | 16A0 | 0754 |
| 0000111460 | 0038 | 0016 | 002A | 0000 | 0904 | 5F75 | 7265 | 5F72 |
| 0000111500 | 736D | 0A67 | 0A04 | C000 | 0400 | 7768 | 646E | 0409 |
| 0000111520 | 0006 | 00C0 | 7303 | 7274 | 0201 | 011E | 16D8 | 0756 |
| 0000111540 | 019B | 0016 | 018D | 0000 | 0F04 | 5F75 | 6573 | 5F74 |
| 0000111560 | 6177 | 7469 | 695F | 6F63 | 0B6E | 0604 | 8500 | 0500 |
| 0000111600 | 6573 | 5F74 | 0C66 | F804 | C0FF | 0600 | 5F5F | 7974 |
| 0000111620 | 6570 | 040F | FFF0 | 0085 | 5F09 | 625F | 5F78 | 7974 |
| 0000111640 | 6570 | 040D | FFE0 | 0706 | 5F07 | 705F | 6972 | 746E |
| 0000111660 | 040B | FFD8 | 0202 | 5F05 | 6C5F | 6C76 | 040D | FFE4 |
| 0000111700 | 0708 | 5F07 | 635F | 6F6C | 6B63 | 040D | FFF4 | 00C0 |
| 0000111720 | 5F07 | 735F | 6174 | 6B63 | 040E | FFDE | 0081 | 5F08 |
| 0000111740 | 725F | 7465 | 6176 | 0B6C | FC04 | 85FF | 0500 | 7266 |
| 0000111760 | 5F63 | 0866 | F204 | 81FF | 0200 | 6372 | 050E | 21E4 |
| 0000112000 | 0006 | 0757 | 5F06 | 665F | 6E75 | 0163 | 1E02 | 7301 |
| 0000112020 | 5818 | 2807 | 1600 | 1C00 | 0000 | 0400 | 750F | 675F |
| 0000112040 | 7465 | 775F | 6961 | 5F74 | 6369 | 6E6F | 0201 | 0513 |
| 0000112060 | 1DD6 | 0006 | 066D | 630B | 7672 | 655F | 7272 | 735F |
| 0000112100 | 7274 | 0512 | 1FBE | 0006 | 0687 | 660A | 5F6C | 7265 |
| 0000112120 | 5F72 | 7473 | 0572 | 000D | 1A00 | 0D00 | 0005 | 0502 |
| 0000112140 | C000 | 0500 | 6168 | 5F62 | 1373 | 0605 | 061F | 7A00 |
| 0000112160 | 0B06 | 7374 | 5F6C | 7265 | 5F72 | 7473 | 0D72 | 1205 |
| 0000112200 | 062A | C000 | 0500 | 6D68 | 5F71 | 1173 | 7605 | 0620 |
| 0000112220 | 8500 | 0900 | 7774 | 685F | 6F6D | 5F64 | 1173 | 7805 |
| 0000112240 | 0620 | C000 | 0900 | 7774 | 685F | 6E77 | 5F64 | 1573 |
| 0000112260 | 1205 | 061F | 7B00 | 0D06 | 656D | 6964 | 5F74 | 7265 |
| 0000112300 | 5F72 | 7473 | 0E72 | 7C05 | 0620 | C000 | 0600 | 7768 |
| 0000112320 | 646E | 735F | 051B | 2080 | 0006 | 00C0 | 7513 | 5F69 |
| 0000112340 | 7768 | 646E | 6C5F | 636F | 6C61 | 655F | 7272 | 735F |
| 0000112360 | 0512 | 1F16 | 0006 | 066D | 690A | 5F68 | 7265 | 5F72 |
| 0000112400 | 7473 | 0E72 | 1A05 | 062A | 0C00 | 0604 | 6D71 | 6773 |
| 0000112420 | 735F | 0513 | 1E2A | 0006 | 066F | 640B | 6B73 | 655F |
| 0000112440 | 7272 | 735F | 7274 | 0514 | 2A16 | 0006 | 069F | 690C |
| 0000112460 | 5F68 | 736D | 5F67 | 7470 | 5F72 | 0F73 | 3205 | 061D |
| 0000112500 | C000 | 0700 | 5F42 | 4678 | 6C69 | 1165 | 8405 | 0620 |
| 0000112520 | 8500 | 0900 | 6C61 | 7261 | 5F6D | 5F66 | 1273 | 1605 |
| 0000112540 | 0620 | 8A00 | 0A06 | 7270 | 655F | 7272 | 735F | 7274 |
| 0000112560 | 0511 | 2086 | 0006 | 0085 | 7709 | 6961 | 5F74 | 6369 |
| 0000112600 | 6E6F | 0511 | 1D3A | 0006 | 0664 | 6709 | 655F | 7272 |
| 0000112620 | 735F | 7274 | 050F | 1D36 | 0006 | 00C0 | 4207 | 785F |
| 0000112640 | 6150 | 6B63 | 0512 | 1E3E | 0006 | 0678 | 640A | 5F62 |
| 0000112660 | 7265 | 5F72 | 7473 | 1272 | 4205 | 0620 | 8B00 | 0A06 |
| 0000112700 | 696C | 655F | 7272 | 735F | 7274 | 0514 | 0000 | 0000 |
| 0000112720 | 0081 | 420C | 5F78 | 6544 | 7562 | 4D67 | 646F | 1465 |
| 0000112740 | 0005 | 0000 | 8100 | 0C00 | 7842 | 545F | 6D69 | 7365 |
| 0000112760 | 6F4D | 6564 | 0510 | 0000 | 0000 | 0081 | 4208 | 5F78 |
| 0000113000 | 5F42 | 6973 | 1267 | 6A05 | 061F | 6D00 | 0A06 | 7672 |
| 0000113020 | 655F | 7272 | 735F | 7274 | 7504 | 2E69 | 0163 | FD00 |
| 0000113040 | 6600 | 0000 | 6900 | 1600 | 6A00 | 2A00 | 6C00 | 4300 |
| 0000113060 | 6E00 | 4900 | 8200 | 5500 | 8300 | 6B00 | 8500 | FE00 |
| 0000113100 | 8600 | 7000 | 8701 | ED00 | 9F01 | FB00 | A901 | 1100 |
| 0000113120 | AC02 | 2300 | AE02 | 4500 | B002 | 5700 | B102 | 6200 |
| 0000113140 | B302 | 7600 | B402 | 8100 | B602 | 8B00 | B902 | 9400 |

THU MAR 14 17:54:36 1991 UI.DLL PAGE 36, LINE 2066

| | | | | | | | | |
|---|---|---|---|---|---|---|---|---|
| 0000113160 | BB02 | AF00 | BC02 | B800 | BE02 | BE00 | C002 | C400 |
| 0000113200 | D402 | D200 | D502 | E800 | D702 | EE00 | D902 | F100 |
| 0000113220 | EB02 | FF00 | EC02 | 1500 | ED03 | 1F00 | EE03 | 2800 |
| 0000113240 | F003 | 2E00 | F103 | 3100 | F303 | 3700 | 0703 | 4501 |
| 0000113260 | 0803 | 5B01 | 0A03 | 6801 | 0C03 | 6B01 | 1E03 | 7901 |
| 0000113300 | 1F03 | 8F01 | 2003 | 9B01 | 2103 | AC01 | 2303 | B201 |
| 0000113320 | 2403 | B501 | 2603 | BB01 | 3A03 | C901 | 3B03 | DF01 |
| 0000113340 | 3C03 | EC01 | 3D03 | FF01 | 3E03 | 0501 | 5204 | 1101 |
| 0000113360 | 5504 | 2701 | 5604 | 3601 | 5704 | 4101 | 5804 | 4701 |
| 0000113400 | 5A04 | 4A01 | 5B04 | 6901 | 5D04 | 7501 | 5F04 | 7B01 |
| 0000113420 | 7104 | 8901 | 7504 | 9F01 | 7604 | BE01 | 7804 | CA01 |
| 0000113440 | 7A04 | D001 | 8E04 | DE01 | 8F04 | F401 | 9304 | 8701 |
| 0000113460 | 9705 | 8C01 | 9905 | AB01 | 9A05 | B401 | 9C05 | B901 |
| 0000113500 | 9D05 | 3701 | AF06 | 4501 | B106 | 5B01 | B206 | 7201 |
| 0000113520 | B406 | 7801 | C606 | 8401 | C906 | 9A01 | CB06 | A901 |
| 0000113540 | CC06 | B401 | CD06 | BA01 | CE06 | BD01 | CF06 | C301 |
| 0000113560 | E306 | CF01 | E406 | E501 | E506 | ED01 | E606 | 0601 |
| 0000113600 | E707 | 1701 | E907 | 1D01 | FB07 | 2B01 | FC07 | 4101 |
| 0000113620 | FE07 | D401 | FF07 | F101 | 0007 | 6E02 | 0108 | C902 |
| 0000113640 | 0208 | D302 | 0408 | 5002 | 1609 | 5E02 | 1709 | 7402 |
| 0000113660 | 1809 | 8102 | 1909 | 8702 | 2C09 | 9502 | 2D09 | AB02 |
| 0000113700 | 2F09 | 3E02 | 310A | 9802 | 320A | B502 | 330A | 3202 |
| 0000113720 | 340B | 3D02 | 350B | 4702 | 360B | 5202 | 380B | CF02 |
| 0000113740 | 4B0B | DD02 | 4C0B | F302 | 4E0B | 8602 | 4F0C | A302 |
| 0000113760 | 500C | 2002 | 510D | 2B02 | 520D | 3502 | 530D | 3F02 |
| 0000114000 | 540D | 5102 | 560D | CE02 | 6A0D | DC02 | 6B0D | F202 |
| 0000114020 | 6D0D | 8502 | 6F0E | E202 | 700E | FF02 | 710E | 7C02 |
| 0000114040 | 720F | 8702 | 730F | 9102 | 740F | A302 | 760F | 2002 |
| 0000114060 | 8B10 | 2E02 | 8C10 | 4402 | 8D10 | 5202 | A910 | 6002 |
| 0000114100 | B010 | 7602 | B110 | 8402 | B310 | 9B02 | B410 | C202 |
| 0000114120 | BA10 | CA02 | BB10 | ED02 | C110 | F602 | C310 | FC02 |
| 0000114140 | CD10 | 0A02 | CE11 | 1A02 | CF11 | 2002 | D011 | 2602 |
| 0000114160 | D111 | 2C02 | D211 | 3202 | D311 | 3802 | D411 | 3E02 |
| 0000114200 | D511 | 4402 | D611 | 4A02 | D711 | 5002 | D811 | 5602 |
| 0000114220 | D911 | 5C02 | DA11 | 8102 | F911 | 8C02 | FA11 | A202 |
| 0000114240 | FB11 | A702 | FC11 | AD02 | 1A11 | BB03 | 1B11 | D103 |
| 0000114260 | 1C11 | D703 | 5111 | E503 | 5211 | FB03 | 5311 | 0803 |
| 0000114300 | 5412 | 0B03 | 6812 | 1903 | 6912 | 2F03 | 6A12 | 3C03 |
| 0000114320 | 6B12 | 3F03 | 8012 | 4D03 | 8412 | 6303 | 8612 | 7D03 |
| 0000114340 | 8712 | 8303 | 9412 | 9103 | A012 | A103 | A112 | B403 |
| 0000114360 | A212 | BD03 | A312 | CA03 | A512 | E503 | A612 | EF03 |
| 0000114400 | AD12 | FA03 | B012 | 1B03 | B113 | 2403 | B213 | 2F03 |
| 0000114420 | B413 | 3A03 | B513 | 4003 | C913 | 4B03 | CB13 | 6103 |
| 0000114440 | CC13 | 7B03 | DF13 | 8903 | E013 | 9F03 | E113 | BB03 |
| 0000114460 | F513 | C903 | F613 | DF03 | F713 | F503 | 0A13 | 0304 |
| 0000114500 | 0D14 | 1904 | 0E14 | 2B04 | 1014 | 3C04 | 1114 | 5304 |
| 0000114520 | 1314 | 6404 | 1414 | 7904 | 1614 | 8A04 | 1714 | A104 |
| 0000114540 | 1914 | B204 | 1A14 | C904 | 1C14 | DA04 | 1D14 | F104 |
| 0000114560 | 1F14 | 0204 | 2015 | 1904 | 2215 | 2A04 | 2315 | 4104 |
| 0000114600 | 2515 | 5204 | 2615 | 6904 | 2815 | 7A04 | 2915 | 9104 |
| 0000114620 | 2B15 | A204 | 2C15 | B904 | 2E15 | CA04 | 2F15 | CD04 |
| 0000114640 | 3015 | E004 | 3215 | E804 | 4515 | F604 | 4615 | 0C04 |
| 0000114660 | 4716 | 2404 | 5B16 | 3204 | 5C16 | 4804 | 5D16 | 5B04 |
| 0000114700 | 7216 | 6904 | 7316 | 7F04 | 7416 | 9204 | 8A16 | A004 |
| 0000114720 | 8B16 | B604 | A916 | CA04 | DD16 | D804 | DE16 | EE04 |
| 0000114740 | E216 | 8104 | E917 | 8604 | EB17 | AC04 | EC17 | B504 |
| 0000114760 | ED17 | C704 | EF17 | D304 | F017 | DC04 | F217 | E104 |
| 0000115000 | F317 | E704 | F417 | 6504 | 0618 | 7305 | 0718 | 8905 |
| 0000115020 | 0818 | 8F05 | 0018 | 6C0C | 696C | 6362 | 6C64 | 2E6C |

THU MAR 14 17:54:36 1991 UI.DLL PAGE 37, LINE 2125

| | | | | | | | | |
|---|---|---|---|---|---|---|---|---|
| 0000115040 | 696C | 0762 | 736F | 2E32 | 696C | 0A62 | 626C | 7069 |
| 0000115060 | 746D | 6C2E | 6269 | 6409 | 5F62 | 6970 | 6C2E | 6269 |
| 0000115100 | 0048 | 0101 | 0001 | 0008 | 0000 | 0024 | 0102 | 0001 |
| 0000115120 | 0343 | 0000 | 0393 | 0103 | 0001 | 0E54 | 0000 | 1CA4 |
| 0000115140 | 0104 | 0001 | 2AF8 | 0000 | 0DA5 | 0109 | 0001 | 389D |
| 0000115160 | 0000 | 03FD | 0101 | 0002 | 002C | 0000 | 0018 | 0102 |
| 0000115200 | 0002 | 06D6 | 0000 | 0152 | 0101 | 0003 | 0044 | 0000 |
| 0000115220 | 001B | 0102 | 0003 | 0828 | 0000 | 01D2 | 0101 | 0004 |
| 0000115240 | 005F | 0000 | 001C | 0102 | 0004 | 09FA | 0000 | 0035 |
| 0000115260 | 0101 | 0005 | 007B | 0000 | 0017 | 0102 | 0005 | 0A2F |
| 0000115300 | 0000 | 000F | 0101 | 0006 | 0092 | 0000 | 0017 | 0102 |
| 0000115320 | 0006 | 0A3E | 0000 | 0033 | 0101 | 0007 | 00A9 | 0000 |
| 0000115340 | 001A | 0102 | 0007 | 0A71 | 0000 | 0010 | 0101 | 0008 |
| 0000115360 | 00C3 | 0000 | 001C | 0102 | 0008 | 0A81 | 0000 | 0025 |
| 0000115400 | 0101 | 0009 | 00DF | 0000 | 001B | 0102 | 0009 | 0AA6 |
| 0000115420 | 0000 | 003F | 0101 | 000A | 00FA | 0000 | 0018 | 0102 |
| 0000115440 | 000A | 0AE5 | 0000 | 000F | 0101 | 000B | 0112 | 0000 |
| 0000115460 | 0014 | 0102 | 000B | 0AF4 | 0000 | 0037 | 0101 | 000C |
| 0000115500 | 0126 | 0000 | 0018 | 0102 | 000C | 0B2B | 0000 | 000F |
| 0000115520 | 0101 | 000D | 013E | 0000 | 0018 | 0102 | 000D | 0B3A |
| 0000115540 | 0000 | 000F | 0101 | 000E | 0156 | 0000 | 0015 | 0102 |
| 0000115560 | 000E | 0B49 | 0000 | 0030 | 0101 | 000F | 016B | 0000 |
| 0000115600 | 0017 | 0102 | 000F | 0B79 | 0000 | 000F | 0101 | 0010 |
| 0000115620 | 0182 | 0000 | 001A | 0102 | 0010 | 0B88 | 0000 | 001E |
| 0000115640 | 0101 | 0011 | 019C | 0000 | 0016 | 0102 | 0011 | 0BA6 |
| 0000115660 | 0000 | 001E | 0101 | 0012 | 01B2 | 0000 | 0017 | 0102 |
| 0000115700 | 0012 | 0BC4 | 0000 | 001F | 0101 | 0013 | 01C9 | 0000 |
| 0000115720 | 0015 | 0102 | 0013 | 0BE3 | 0000 | 001B | 0101 | 0014 |
| 0000115740 | 01DE | 0000 | 0018 | 0102 | 0014 | 0BFE | 0000 | 0042 |
| 0000115760 | 0101 | 0015 | 01F6 | 0000 | 0016 | 0102 | 0015 | 0C40 |
| 0000116000 | 0000 | 000E | 0101 | 0016 | 020C | 0000 | 0018 | 0102 |
| 0000116020 | 0016 | 0C4E | 0000 | 0010 | 0101 | 0017 | 0224 | 0000 |
| 0000116040 | 0018 | 0102 | 0017 | 0C5E | 0000 | 0010 | 0101 | 0018 |
| 0000116060 | 023C | 0000 | 0019 | 0102 | 0018 | 0C6E | 0000 | 0012 |
| 0000116100 | 0101 | 0019 | 0255 | 0000 | 0018 | 0102 | 0019 | 0C80 |
| 0000116120 | 0000 | 0041 | 0101 | 001A | 026D | 0000 | 0017 | 0102 |
| 0000116140 | 001A | 0CC1 | 0000 | 000F | 0101 | 001B | 0284 | 0000 |
| 0000116160 | 0017 | 0102 | 001B | 0CD0 | 0000 | 000E | 0101 | 001C |
| 0000116200 | 029B | 0000 | 0018 | 0102 | 001C | 0CDE | 0000 | 000F |
| 0000116220 | 0101 | 001D | 02B3 | 0000 | 0019 | 0102 | 001D | 0CED |
| 0000116240 | 0000 | 0056 | 0101 | 001E | 02CC | 0000 | 001A | 0102 |
| 0000116260 | 001E | 0D43 | 0000 | 00AB | 0101 | 001F | 02E6 | 0000 |
| 0000116300 | 001D | 0102 | 001F | 0DEE | 0000 | 0024 | 0101 | 0020 |
| 0000116320 | 0303 | 0000 | 0016 | 0102 | 0020 | 0E12 | 0000 | 000F |
| 0000116340 | 0101 | 0021 | 0319 | 0000 | 0017 | 0102 | 0021 | 0E21 |
| 0000116360 | 0000 | 000E | 0101 | 0033 | 0330 | 0000 | 0013 | 0102 |
| 0000116400 | 0033 | 0E2F | 0000 | 0025 | 0106 | 0000 | 3C9A | 0000 |
| 0000116420 | 002B | 424E | 3230 | 3F9F | 0000 | | | |
| 0000116432 | | | | | | | | |

1

ANNEX F

Pseudo Code Document.

Mouse Algorithm

GP : Graphic Processor
SUT: System Under Test

```
Do_track :
{
    Do_init_track;
    while (move_mouse_events) {          /* Do in parallel */
        Do_GP_track_application;         /* on GP */
        Do_track_events;                 /* on the host */
    }
    Do_end_track;
}
```

<u>Host Program:</u>

```
Do_init_track:
{
    if (not mouse position known)
        Get_locator_position;
    reset search area;
    run (Do_GP_track_application);
}

Get_locator_position:
{
    run (Do_GP_track_application);
    set search area to middle of screen;
    download search area to GP;
    Locator_active_search;
}
```

```
Locator_active_search;
{
    for (direction=down, right, up ,left) {
        activate GP in track mode;
        move locator on SUT in direction;
        set event_flag;                 /* flag between host and GP */
        wait until GP goes back to idle mode;    /* process finished */
        move locator on SUT back to initialize position;
        activate GP in active search mode;
        wait until GP goes back to idle mode;
                                        /* search process finished */

        if (locator found) {
            read locator position from GP;
            return (success);
        }
    }
}

Do_track_events:
{
    switch (event_type) {
        timing :   Do_timing_event;
        move:      Do_move_event;
    }
}

Do_timing_event:
{
    if (recording)
        measure the time between events;
    else
        wait time between events;
}
```

```
Do_move_event:
{
    if (recording) {
        get event from mouse device;
        store in data base;
    }
    else
        get event from data base;
    Move_mouse;
}

Move_mouse:
{
    if (event given in pixels)
        Move_pixels(event);        /* pixels = picture elements */
    else
        Move_mickey(event);        /* mickey = mouse device units */
}

Move_mickey (event):
{
    wait till previous events processed;
    send event to SUT;
    convert move event to pixels;        /*scale function of mickey is given*/
    calculate expected locator position on screen;
    Update_search_area;
    if (GP in idle mode) {
        activate GP in track mode;
        send search area and set event_flag to GP;
    }
}
```

```
Move_pixels (event):
{
     clip movement to window;
     convert from pixels to mickey and break down the move event to N
     small steps if necessary;
     for (i=0, i<number_of_steps,i++) {
          send events to SUT;
          calculate expected locator position;
          update_search_area;
          if (GP in idle mode) {
               activate GP in track mode;
               send search area and set event_flag to GP;
          }
     }
}

Update_search_area:
{
/*
 idea is that if a certain event occurs say dx positive the search border is
updated in the following way: the search area is related to the end point of
the current track so if dx is the only  lost event the icon should be dx
pixels to the left of the estimated point at the worst case. So all positive
events are accumulated to the worst case left border etc.

Afterwards when these border are used in the graphic processor (the
borders are downloaded along with the estimated mouse position to the
graphic processor.), each of them is multiplied by a factor between 0 and
1 which reflects what is the percentage of the lost events on the average.
for example if left border = 100 and the constant is .25 this means that
the icon should not be more then 25 pixels to the left of the estimated
icon position in the vast majority of the tracks.
*/
     if(dx is positive or zero)
          left border = left border + dx ;
     if(dx is negative)
          right border = right border - dx ;
     if(dy is positive or zero)
          upper border = upper border + dy ;
     if(dy is negative)
          lower border = lower border - dy ;
 }
```

5

```
Do_end_track:
{
     wait for GP idle mode;
     set search area to expected locator position;
     Locator_passive_search;
     if (locator not found)
           Locator_active_search;
     if (locator found)
           end point = locator position;
     else
           end point = init point;        /* current track is canceled */
     if (recording) {
           delta track = end point - init point;
           store delta track in data base;
     }
     else {        /* replay */
           get delta track from data base;
           if ((end point - init point) != delta track) {
                 correction event = delta track - (end point - init point);
                 Move_pixels(correction event);
           }
}

Locator_passive_search:
{
     send search area to GP;
     activate GP in endpoint mode;
     wait until GP goes back to idle mode; /* search process finished */
     if (locator found)
           read locator position from GP;
}
```

Graphic Processor Program:

```
Do_GP_track_application:
{
      initialize application variables;
      video in --> previous buffer;
      video in --> current buffer;
      while (TRUE) {
            switch (track mode) {
                  IDLE:                 Do_GP_idle_mode;
                  ENDPOINT:             Do_GP_endpoint_mode;
                  ACTIVE_SEARCH:        Do_GP_active_search_mode;
                  TRACK:                Do_GP_track_mode;
            }
      }
}

Do_GP_idle_mode:
{
      while (in idle mode) ;
            Do_double_buffer;
}

Do_double_buffer:
{
      video in --> current buffer;
      if (current buffer != previous buffer)
            exchange current buffer and previous buffer;
}

Do_GP_endpoint_mode:
{
      while (not time out) {          /* waiting for change time out */
            if (screen changed) {
                  wait for screen stability or time out;
                                      /* waiting for stability time out */
                  break;
            }
      }
      freeze current and previous buffers;
      Do_endpoint;
      Do_double_buffer ;
}
```

7

```
Do_endpoint:
{
      Do_passive_search_in_place;
      if (icon not found in place) {
            Compute_search_mask;
            Generate_rect_list (endpoint rect list);
            merge rect list = merge (endpoint rect list, track rect list);
            Do_sort_rect_list (merge rect list);
            if (merge rect list not empty)
                  Do_passive_search_in_rect (merge rect list);
      }
      change to idle mode;
      clear track rect list;
}

Compute_search_mask:
{
      divide search area parameters by a constant;
}
Generate_rect _list (rect_list):
{
      divide screen to strips;
      find strips with changes by comparing error count value in the start
      of the strip with the error count value in the end of the strip;
      for (each strip with changes) {
            divide to rectangles;
            find rectangles with changes by comparing sum of error count
            values on the right border of each rectangle with the sum of
            error count values on the left border of the rectangle;
      }
}

Do_GP_active_search_mode:
{
      while (not time out) {          /* waiting for change time out */
            if (screen changed) {
                  wait for screen stability or time out;
                                      /* waiting for stability time out */
                  break;
            }
      }
      freeze current and previous buffers;
      Do_active_endpoint;
      Do_double_buffer ;
}
```

8

```
Do_active_endpoint:
{
      Compute_search_mask;
      Generate_rect_list (endpoint rect list);
      merge rect list = merge (endpoint rect list, track rect list);
      Do_sort_rect_list (merge rect list);
      if (merge rect list not empty)
            Do_passive_search_in_rect (merge rect list);
      change to idle mode;
      clear track rect list;
}

Do_sort_rect_list (rect list):
{
      for each rectangle in list:
            Compute the distance of the center of rectangle from the
            expected position of the locator;
      sort the rect list by the computed distance ;
}

Do_GP_track_mode:
{
      while (screen not change AND not time out) {/* wait*/};
      if (time out)
            change to idle mode;
      else if ((number of different pixels < THRESHOLD)
                                  AND (event_flag is set)) {
            Do_GP_track;
            change to idle mode;
      }
      else {
           Do_double_buffer ;
            change to idle mode;
      }
}

Do_GP_track:
{
      compute_search_mask;
      Generate_rect_list (track rect list);
      Do_sort_rect_list (track rect list);
}
```

9

```
Do_passive_search_in_rect (rect list):
{
     for (N most common icons in icon list) {
          for (K first rectangles in sorted rect list) {
                                    /* N,K are software constants */
               Reduce_rect_area (current rectangle)
               for (all locations inside reduced rect area) {
                    if (Shape_correlate(current location,current icon)
                                                            == success) {
                         move current icon to top of icon list;
                         write found location of mouse pointer;
                         return (success);
                    }
               }
          }
     }
     for (rest of icons in icon list) {
          for (all rectangles in rect list) {
               /* area of rectangle is already reduced */
               for (all locations inside reduced rect area) {
                    if (shape_correlate(current location,current icon)
                                                            == success) {
                         move current icon to top of icon list;
                         write found location of mouse pointer;
                         return (success);
                    }
               }
          }
     }
     return (fail);
}
```

10

```
Do_passive_search_in_place:
{
      for (all icons in icon list) {
            for 9 locations around the estimated place {
                                                /* including the point */
                  if (Shape_correlate(current location,current icon)
                                                                  == success) {
                        move current icon to top of icon list;
                        if (not the estimated place)
                              update new mouse location;
                        return (success);
                  }
            }
      }
      return (fail);
}
```

```
Shape_correlate (current location, current icon):
{
     for (all internal pixels of the icon) {
          compute offset of current pixel from current icon location;
          /* hot point of current icon is put on the current location,
          effective address of the current pixel is computed by adding
          to current location address the pixel offset which is given as
          part of the icons data structure (icon data structure is created
          in the learn icon module and downloaded to GP when system
          initialized */
          get pixel value from screen;
          if (screen pixel value != icon pixel value)
               return (fail);
     }
     if (number of internal pixels > internal threshold)
                                                  /* software constant */
          return (success);
     for (all external pixels of the icon) {
          get from screen nearest pixel not in icon;
          if (nearest pixel value != icon pixel value) { /* diff point */
               if (screen pixel value == icon pixel value) {
                    increment accept counter;
                    if (accept counter + internal points >
                                                  75% of icon pixels)
                         return (success);
               }
               else  /* screen pixel value != icon pixel value */
                    return (fail);
          }
          else {     /* not diff point */
               increment errors counter;
               if (errors counter > 25% of icon pixels)
                    return (fail);
          }
     }
     return (fail);
}
```

```
Reduce_rect_area()
{
      set first_line to  the first line in rectangle with changes ;
      set last_line to the last line in rectangle with changes ;
      divide the area from first_line to last_line into 4 vertical strips ;
      accumulate error counter values along the borders of the strips ;
      /* 5 sums are the result of this step: sum(1) - sum(5) */
      for(i=1 ; i < 5 ; i++){
              if (sum(i+1) - sum(i)  equal 0)
                      set a strip flag to clean ;
      }
      find the first non clean strip from the left;
      save its first column as left_border ;
      find the first non clean strip from the right ;
      save its last column as right_border ;

      update first_line,last_line,left_border,right_border to the rectangle
data structure ;
}
```

13
Icon Learn Algorithm

```
/* The following is operated for any icon shape to be learned */

Do_learn_icon:
{
     Do_get_sample (icon_btmp, icon_diff);
     Do_process_sample (icon_btmp, icon_diff, icon_points);
}

Do_get_sample (icon_btmp, icon_diff):
{
     /* This is a user interface procedure. The user's actions are
            described in the body of the text.
     */
}

Do_process_sample(icon_btmp, icon_points):
{
     if (not new icon)
            Do_merge_icon_data(sample , reference_sample) ;
     Do_generate_corr_points(reference_sample, corr_point_list) ;
     if (it is a sample from screen border){
            set border_type to either X_border,Y_border, or corner ;
            Do_locate_hot_point(border_type,
                              sample,reference_sample, hot_point);
     Move_to_new_border(reference_sample, corr_point_list);
     Do_optimize_data(corr_point_list, icon_points);
}

Do_merge_icon_data:
{
     /* reference sample is bitmap + diff bitmap */
     /* sample is bitmap + diff bitmap */
     max_match = 0 ;
     for each of the two samples find the upper left change point ;
     for(horizontal shift of +/- 8 pixels around the first change point){
            for(vertical shift of +/- 8 pixels around the first change point){
                   sample is layered over the reference sample;
                   current_match =
                        count number of points which match on the
                                        diff bitmaps and on the bitmap ;
                   max_match = max ( max_match , current_match);
```

```
            update current shift for achieving max_match ;
        }
    }

    lay sample bitmaps on ref bitmaps with the shift which yields
    max_match ;
    for( each point on bitmaps) {
        If a point is 1 on sample's diff bitmap and 0 on ref diff bitmap
            add this point to ref diff bitmap, and update new pixel value
            from sample bitmap to ref bitmap ;
        If a point is 1 on both sample and ref diff bitmaps, and pixel
            values differ on bitmaps, return an error which cancels the
            sample ;
        If a point is 0 on sample's diff bitmap and 1 on ref diff bitmap,
            no updates is needed.
    }
}

Do_generate_corr_points(reference_sample, corr_point_list):
{
    /* reference sample is bitmap + diff bitmap */
    for (each of the horizontal lines in icon's bitmap) {
        find segments of icon body within the line by
            identification of pairs of icon edge points by
                        using icon diff bitmap;
        /* an edge point is a pixel which is preceded or followed
           by a background pixel this is signified by a 1 preceded or
           followed by 0 on the diff bitmap. A pair of edge points
           encloses a sequence of consecutive 1's on the diff bitmap.
        */

    for (all segments of icon body) {
        detect pairs of consecutive pixels which
            differ in pixel value within a segment ;
        store detected points along with the
                    edge points in corr_points_list ;
        }
    }
}
```

```
Do_locate_hot_point(border_type,sample, reference_sample,hot_point)
{
    /* reference sample is bitmap + diff bitmap */
    /* sample is bitmap + diff bitmap */
    max_match = 0 ;
    for each of the two samples find the upper left change point ;
    for(horizontal shift of +/- 8 pixels around the first change point){
        for(vertical shift of +/- 8 pixels around the first change point){
            sample is layered over the reference sample;
            current_match =
                count number of points which match on the
                                    diff bitmaps and on the bitmap ;
            max_match = max ( max_match , current_match);
            update current shift for achieving max_match ;
        }
    }
    lay sample bitmaps on ref bitmaps with the shift which yields
    max_match ;
    if (border_type == X_border)
        set hot_point X coordinate to X of shift ;
    if ( border_type == Y_border)
        set hot_point Y coordinate to Y of shift ;
    if ( border_type == corner) {
        set hot_point X coordinate to X of shift ;
        set hot_point Y coordinate to Y of shift ;
    }
}

Move_to_new_border(sample, corr_point_list):
{
    /* reference sample is bitmap + diff bitmap */
    reduce the rectangle that enclose the icon to minimum;
    identify new borders of enclosing rectangle ;
    for(all points in corr_point_list)
    {
        update address of point to be relative to upper left
                                    point of enclosing rectangle ;
    }
}
```

```
Do_optimize_data(corr_point_list, optimized_point_list):
{
      divide the icon's bitmap into 4 equal squares;
      partition corr_point_list into 4 sub groups, each group with
                                          points which belongs to one rectangle;
      for (each non empty sub group) {
            /* process squares clockwise direction */
            choose a point with the least distance to square's center;
            create a node in a quad tree whose root is the bitmap ;
            store point in the quad tree structure node;
            store rest of sub group and associated square in node ;
            Do the above steps recursively on rest of the points
                  which belong to the associated square ;
      }
      collect points from tree nodes in breath first fashion into
      optimized_point_list (inner change points take precidence over edge
      points);
}

/* The following is used to download icon data into graphic
      processor
*/

Download_to_GP:
{
      while (icon_list_not_empty) {
            allocate data storage on graphic processor ;
            if (first icon)
                  create head of double linked list ;
            else {
                  /* create item in double linked list */
                  store pointer to current icon data structure
                        in previous icon data structure ;
                  store pointer to previous icon data structure
                        in current icon data structure ;
            }
            copy current icon data structure into GP memory ;
      }
}
```

We claim:

1. A system for tracking and replicating the operation of a cursor manipulation device in a computer system, the computer system comprising a monitor and a cursor manipulation device having an icon representing the location of a cursor on the monitor, the system for tracking and replicating comprising:

recording means for capturing a plurality of data points transmitted by said cursor manipulation device and a first multiplicity of events on said monitor, said datapoints and said events on said monitor occurring while said icon travels between a first location and a second location on said monitor, said recording means also being operative to identify said first and second locations; and means for replicating the movement of the icon including:

means for replaying said data points;

means for identifying a third location of the icon on the screen as a result of the replay of said data points; and means for causing said icon to move from said third location to said second location, if said third location is not generally identical to said second location.

2. A system for tracking and replicating the operation of a cursor manipulation device in a computer system, the computer system comprising a monitor and a cursor manipulation device having an icon representing the location of a cursor on the monitor, the system for tracking and replicating comprising:

capture means for capturing a plurality of data points transmitted by said cursor manipulation device and a first multiplicity of events on said monitor, said datapoints and said events on said monitor occurring while said icon travels between a first location and a second location on said monitor;

identification means, utilizing said first multiplicity of events, for identifying at least said first and second locations;

replaying means for replaying said captured data points to cause said icon to travel between said first and a third location and for capturing a second multiplicity of events on said monitor; and feedback means for causing said icon to travel between said third location and said second location.

3. A system for tracking the operation of a cursor manipulation device in a computer system, the computer system comprising a monitor and a cursor manipulation device having an icon representing the location of a cursor on said monitor, the system for tracking comprising:

capture means for capturing a plurality of data points transmitted by said cursor manipulation device and a first multiplicity of events on said monitor, said datapoints and said events on said monitor occurring while said icon travels between a first location and a second location on said monitor; and identification means, utilizing said first multiplicity of events, for identifying at least said first and second locations.

4. A system according to claim 1 and wherein said cursor manipulation device is a relative movement device.

5. A system according to claim 1 and wherein said cursor manipulation device is an absolute pointing device.

6. A system according to claim 2 and wherein said cursor manipulation device is an absolute pointing device.

7. A system according to claim 3 and wherein said cursor manipulation device is an absolute pointing device.

8. A system according to claim 1 and wherein said means for identifying utilizes an estimated location of said icon and an output to said screen.

9. A system according to claim 8 and wherein said means for identifying include means for preparing to identify operative while said icon travels between said first location to said second location and means for performing the identification operative once said icon arrives at said second location.

10. A system according to claim 1 and wherein said first and second locations are track terminators.

11. A system according to claim 8 and wherein said means for identifying includes means for actively searching said output to said screen.

12. A system according to claim 2 and wherein said feedback means include means for providing artificial cursor manipulation data points corresponding to the distance between said second and third locations.

13. A system according to claim 1 and also comprising means for learning shape characteristics of an icon.

14. A system according to claim 2 and also comprising means for learning shape characteristics of an icon.

15. A system according to claim 3 and also comprising means for learning shape characteristics of an icon.

16. A system according to claim 13 and also comprising means for identifying the location of a hotpoint of said icon.

17. A system according to claim 14 and also comprising means for identifying the location of a hotpoint of said icon.

18. A system according to claim 15 and also comprising means for identifying the location of a hotpoint of said icon.

19. A method for tracking and replicating the operation of a cursor manipulation device in a computer system, the computer system comprising a monitor and a cursor manipulation device having an icon representing the location of a cursor on the monitor, the method comprising the steps of:

capturing a plurality of data points transmitted by said cursor manipulation device and a first multiplicity of events on said monitor, said datapoints and said events on said monitor occurring while said icon travels between a first location and a second location on said monitor, identifying said first and second locations; and replicating the movement of the icon including the steps of:

replaying said data points;

identifying a third location of the icon on the screen as a result of the replay of said data points; and causing said icon to move from said third location to said second location, if said third location is not generally identical to said second location.

20. A method for tracking and replicating the operation of a cursor manipulation device in a computer system, the computer system comprising a monitor and a cursor manipulation device having an icon representing the location of a cursor on the monitor, the method for tracking and replicating comprising the steps of:

capturing a plurality of data points transmitted by said cursor manipulation device and a first multiplicity of events on said monitor, said datapoints and said events on said monitor occurring while said icon travels between a first location and a second location on said monitor;

identifying at least said first and second locations by utilizing said first multiplicity of events;

replaying said captured data points to cause said icon to travel between said first and a third location;

capturing a second multiplicity of events on said monitor;

artificially causing said icon to travel between said third location and said second location.

21. A method for tracking the operation of a cursor manipulation device in a computer system, the computer system comprising a monitor and a cursor manipulation device having an icon representing the location of a cursor on said monitor, the method for tracking comprising the steps of:

capturing a plurality of data points transmitted by said cursor manipulation device and a first multiplicity of events on said monitor, said datapoints and said events on said monitor occurring while said icon travels between a first location and a second location on said monitor; and identifying at least said first and second locations by utilizing said first multiplicity of events.

22. A method according to claim 19 and wherein said step of identifying utilizes an estimated location of said icon and an output to said screen.

23. A method according to claim 19 and wherein said step of identifying includes the step of preparing to identify operative while said icon travels between said first location to said second location and the step of performing the identification operative once said icon arrives at said second location.

24. A method according to claim 19 and wherein said first and second locations are track terminators.

25. A method according to claim 22 and wherein said step of identifying includes the step of actively searching said output to said screen.

26. A method according to claim 20 and wherein said step of artificially causing includes the step of providing artificial cursor manipulation data points corresponding to the distance between said second and third locations.

27. A method according to claim 19 and also comprising the step of learning shape characteristics of an icon.

28. A method according to claim 20 and also comprising the step of learning shape characteristics of an icon.

29. A method according to claim 21 and also comprising the step of learning shape characteristics of an icon.

30. A method according to claim 27 and also comprising the step of identifying the location of a hotpoint of said icon.

31. A method according to claim 28 and also comprising the step of identifying the location of a hotpoint of said icon.

32. A method according to claim 29 and also comprising the step of identifying the location of a hotpoint of said icon.

* * * * *